US005146591A

United States Patent [19]

Bachman et al.

[11] Patent Number: 5,146,591

[45] Date of Patent: Sep. 8, 1992

[54] DYNAMIC INFORMATION MANAGEMENT SYSTEM UTILIZING ENTITY-RELATIONSHIP INFORMATION MODEL IN WHICH THE ATTRIBUTE IS INDEPENDENT OF AN ENTITY

[75] Inventors: Charles W. Bachman, Lexington; John J. Cimral, Framingham, both of Mass.; Christopher P. Gane, New York, N.Y.; David A. Krieger, Cambridge, Mass.; John T. Mirco, Waltham, Mass.; Igor Abramovich, Medford, Mass.

[73] Assignee: Bachman Information Systems, Inc., Burlington, Mass.

[21] Appl. No.: 516,822

[22] Filed: Apr. 27, 1990

[51] Int. Cl.[5] .......... G06F 15/40

[52] U.S. Cl. .......... 395/600; 395/700; 364/DIG. 1; 364/DIG. 2:274.1; 364/274.4; 364/276.1; 364/282.1; 364/286.3; 364/974; 364/974.5

[58] Field of Search ... 364/200 MS File, 900 MS File, 364/191-192, 578, 401; 395/600, 700

[56] References Cited

U.S. PATENT DOCUMENTS

| | | | |
|---|---|---|---|
| 4,631,664 | 12/1986 | Bachman | 364/200 |
| 4,774,661 | 9/1988 | Kumpatl | 364/200 |
| 4,815,029 | 3/1989 | Barker et al. | 364/900 |
| 4,841,441 | 6/1989 | Nixon et al. | 364/401 |
| 4,894,771 | 1/1990 | Kunil et al. | 364/200 |
| 4,899,290 | 2/1990 | Hartzband | 364/200 |
| 4,901,221 | 2/1990 | Kodosky et al. | 364/200 |
| 4,956,773 | 9/1990 | Saito et al. | 364/200 |
| 5,010,478 | 4/1991 | Deran | 364/200 |
| 5,019,961 | 5/1991 | Addesso et al. | 364/192 |

OTHER PUBLICATIONS

A. J. Symonds, "Auxiliary-Storage Associative Data Structure", IBM System Journal Nos. 3 & 4, 1968, pp. 229-245.

Andrew Topper, "Building Up to IEW/WS", PC Tech Journal, Sep. 1988, pp. 110-123.

Carma McClure, "The CASE for Structured Development", PC Tech Journal, Aug. 1988, pp. 51-67.

Andrew Topper, "Excelling with CASE", PC Tech Journal, Aug. 1988, pp. 71-79.

Toby J. Teorey et al., "ER Model Clustering as an Aid for User Communication and Documentation in Database Design", Communications of the ACM, vol. 32, No. 8, Aug. 1989, pp. 975-987.

Rudy Hirschheim and Heinz K. Klein, "Four Paradigms of Information Systems Development", Communications of the ACM, vol. 32, No. 10, Oct. 1989, pp. 1199-1216.

Sidney C. Bailin, "An Object-Oriented Requirements Specification Method", Communications of the ACM, vol. 32, No. 5, May 1989, pp. 608-623.

Pose Overview, POSE, Picture Oriented Software Engineering Computer System Advisers, Inc. 1990.

Susan Janus, "POSE Explores the CASE Frontier", PC Week Journal, vol 6, No. 22, Jun. 5, 1989, p. 89(2).

James Martin, *Data-Base Organization*", 2nd Ed., chapter 3, pp. 22-30 (1977).

Chris C...e, "Computer-Aided Software Engineering: The Methodologies, the Products, the Future", Rapid System Development Inc., (1988), pp. i thru 9-12, BAC-1, BAC-2, IEW-1, IEW-2, EXL-1 1 thru EXL-10.1.

*Primary Examiner*—Thomas C. Lee
*Assistant Examiner*—Mehmet Geckil
*Attorney, Agent, or Firm*—Lahive & Cockfield

[57] ABSTRACT

A computer system for dynamically modeling information systems of organizations. The system includes a plurality of editors which enable a user to interact with the system. Included in the system is an information modeler, an information flow modeler, and a logic modeler for creating, analyzing and modifying design data associated with each modeler. Each of the modelers are dynamically interlinked, such that a change to one design data set will affect a corresponding change in other design data sets. The system includes graphic representations associated with each of the modelers to enable a user to interact with the system. The objects of each of the graphic representations may also be dynamically linked, such that a change in one representation affects a substantially immediate change in other representations.

89 Claims, 37 Drawing Sheets

DYNAMIC INFORMATION MANAGEMENT SYSTEM UTILIZING ENTITY-RELATIONSHIP INFORMATION MODEL IN WHICH THE ATTRIBUTE IS INDEPENDENT OF AN ENTITY

BACKGROUND

This invention is directed to a computer system for dynamically modeling information systems of organizations.

Early computer information processing systems stored, retrieved, and modified data contained in files specifically created for each information processing application. Knowledge relating to the structure and content of each data file was coded directly into each application program. When a need later developed to use the data within the data file for additional purposes, the user often created other primarily redundant data files, writing a specific application program to interact with each of these files. Subsequent changes in the content of any data file frequently mandated modification of related data files. If the user wished to avoid creating redundant data files, those modifications necessitated by additional demands were made to the original data file. Again, application programs were written to perform new tasks on the modified file.

However, the data file modifications sometimes hampered operation of earlier application programs, thus requiring their modification. As a consequence, computer installations involved in data processing faced the recurrent task of choosing between data file redundancy and repeated software modifications.

With the advent of so-called data base management systems, many of the problems encountered in the early information processing systems were alleviated. In addition to removing the need for the application program to address the intricacies of data file manipulation, data base management systems promoted efficient design, enhanced file maintenance and modification, eliminated data file redundancy, and provided substantial documentation regarding data file structure.

With the shift to data base management systems, the concept of dual data representation fully emerged. The first level of data representation, the physical representation, relates to the manner in which individual data records are stored and how their inter-relationships are depicted. The second level of data representation, the logical representation, describes the data base users' view of the data. The physical representation of the data is generally of no concern to the data base user. Rather, the task of manipulating individual data storage areas is left to the data base management system.

Data variables are named storage structures which may be used to store information, and which are basic features of information systems. These variables are capable of being assigned a value, holding that value as long as the data variable survives, and returning that value one or more times upon request. The current value of a data variable essentially remains unchanged until some explicit action is taken to change the content of the variable. These data variables have a number of applications, such as being the attributes of entities, being independent global attributes, being variables of processes, and being variables of operating systems, the values of which are available to all processes. While data variables are capable of storing various types of information, each is generally specialized to handle one type of data, such as character strings, integers, or real numbers.

Of concern to the data base user, however, is the logical representation of the data, since the users' ability to store, retrieve, and modify aggregations of data items, data records, and data relationships is dependent upon the form in which the data base management system presents data to the user.

Information management systems handle complex environments often consisting of hundreds of elements and relationships, permitting users to manipulate and employ data in ways not always anticipated by systems designers. Representation of such elements and relationships to a user presents a unique set of problems not encountered, and certainly not resolved by present data base management systems. Instead of being organized into application-oriented files, which are always addressed in the same way, as in data base systems, the information is organized so that it can be addressed in a variety of different ways, and can be used to answer a diversity of queries. All the interesting facts about entities are stored together rather than merely those facts needed for one application. As pointed out by J. Martin, TM Computer Data-Base Organization", 2d ed., chapter 3, pp. 24–25 (1977), this "reservoir" concept of information systems is much easier to conceive than to implement. It is a complex and lengthy operation to build up such data bases, and it is expensive to search sufficiently quickly to give real-time answers to unanticipated queries.

The use of diagrams and windows is one way to depict the intricate relationships among entities, attributes, and other data elements in a complex information model. A variety of "windows" have been used in application programs to facilitate user interaction with a computer system. Windows have been used to show a user a "menu" of selection of operations which may be performed. Windows have also been used for displaying error messages. However, windows are not anticipatory, i.e. are not able to provide a tailored selection of options available to a user at a particular point in time or text.

The management of information has evolved into the field of Computer Aided Systems Engineering (CASE). As described by C. Gane, "Computer-Aided Software Engineering: The Methodologies, the products, the Future" (1988), some of the common characteristics among CASE products are that they internally build a design database "at a higher level than code statements or physical data element definitions," and that they "typically hold[s] information about the data to be stored in the system, the business logic of the processes to be implemented, their physical layout of screens and reports, and other requirements/design information."

There are several such CASE products presently available. Two such products are EXCELERATOR, from Index Technology, Cambridge, Mass., and IEW, from Knowledgeware, Inc., Atlanta, Ga. EXCELERATOR enables an operator to work with data flow diagrams and data model diagrams, structure diagrams. An operator may also modify, delete, copy, rename, list or add a diagram. Diagram objects may be user defined, and are stored in a dictionary.

In a similar manner, IEW enables a user to work with, and create or change objects on diagrams, which affects an encyclopedia but not existing displays or screens. In addition, IEW can model relationships, entities and attributes together, or entities alone, but does not model attributes alone. It is often useful to manipulate attributes independent of entities to which they may later be tied.

Since one of the attractions of CASE for managing information systems is the availability of graphical tools for analysis, it would be important for a user to be able to graphically work in "real-time", i.e. the ability to make changes to diagram objects, and see a corresponding change to corresponding diagrams on existing screens. Such dynamic linking of objects and diagrams would then become an important aspect of an effective information management system utilizing CASE technology.

Accordingly, it is an object of the present invention to provide an improved information management system.

Another object is to provide an information management system which dynamically links the information contained within the system in display format.

It is another object to provide a dynamic information management system which enables a user to define objects such as entities, attributes, and relationships, which are dynamically linked such that a change in one object affects another object, and which enables manipulation of attributes alone.

It is another object to provide an information management system which enables a user to interact with a plurality of modelers to create information models, information flow models, and logical relationship models, and to thus generate dynamically linked displays therefrom.

It is another object to provide a method for controlling information system of organizations through a plurality of modelers.

Other objects, features and advantages of the invention will be apparent from the following description of the preferred embodiments thereof, and from the claims.

SUMMARY OF THE INVENTION

Briefly, the present invention is a computer system for dynamically modeling information systems of organizations. The system includes a plurality of editors, or modelers, which enable a user to interact with the system. The interaction may occur via text, tree diagram, or other graphical representation. Such representations also enable the user to dynamically interact with the system.

The system may include at least one information modeler, which provides a dynamic environment for the user to create, analyze, and modify Information Model (IM) models contain IM design data. The IM design data may be representative of entities, attributes, relationships, entity methods, partnership sets, and combinations thereof, each of which may be effected by externally applied signals.

The system may also include at least one process modeler, providing a dynamic environment for the user to create, analyze, and modify Information Flow Model (IFM) models containing IFM design data. The IFM design data is representative of processes, information stores, information flows, messages, sources and/or destinations. In general, the IFM design data, specifically information flow contents, correspond to IM design data entities. The IFM modeler and the IM modeler can be dynamically linked, such that a change in one design data set will affect a corresponding change in the other design data set.

The system may also include a logic modeler, which provides a dynamic environment for the user to create, analyze, and modify logical operations to be performed on the IM design data and the IFM design data. The logic modeler displays the system in text, tree diagram, or other graphical representations. The resulting display may be dynamic, enabling the user to affect IM and IFM design data, as well as the operations to be performed on that design data.

The system can also include a function modeler, which enables a user to generate a function decomposition diagram, displaying the processes of IFM design data and any related subprocesses. The subprocesses may be displayed in a hierarchical fashion, and the user may dynamically manipulate the objects contained within the decomposition diagram.

Representation of the system may be in the form of a node and pin notation, where nodes define text fields which contain statements and design data. Attached to the nodes may be pins, which identify locations where modifications may be specified for the operation associated with a particular node.

Representation of the system interfaces with the user may be established via a series of windows. These windows may include: an options facility, for displaying and selective interaction with the editors; a feedback window, for selectively displaying messages from the editors to the user; and a diagram window, for displaying representations of the system, or aspects of the system, for user interaction therewith. The system may also include syntactic and/or semantic checks of the input from the user. Errors may generate flag signals, which would appear in any of the windows.

In addition to the function modeler, a user may also "explode" a process from an information flow diagram to its corresponding subprocesses. This creates high-level processes and primitive processes. A high-level process is one which has one or more corresponding subprocesses, whereas a primitive process is one which has no corresponding subprocesses. The logic modeler may be accessed to generate a diagram from each primitive process.

In addition, the resulting exploded process may simultaneously be displayed with the information flow diagram from which it is derived. In a similar fashion, subprocesses may be "hidden" within a process on an information flow diagram or Process Description Language (PDL) display, creating high-level processes from groups of primitive processes.

BRIEF DESCRIPTION OF THE DRAWINGS

FIGS. 1-1 through 1-24 collectively show a detailed entity-relationship diagram of the embodiment of FIG. 1.

FIG. 2 is a diagrammatic representation of display windows and facilities of the invention of FIG. 1.

FIG. 3 is a diagrammatic representation of an Entity-Relationship (E-R) diagram display which may be generated through an IM modeler of the invention of FIG. 1.

FIG. 5 is a diagrammatic representation of an IFM diagram display of the invention of FIG. 1.

FIG. 7 is a diagrammatic representation of an Function Decomposition (FD) diagram display of the invention of FIG. 1.

FIG. 8 is a diagrammatic representation of a PDL diagram display of the invention of FIG. 1.

FIG. 9 is a diagrammatic representation of a PDL diagram displayed in a diagram window of the invention of FIG. 1.

FIG. 10 is a diagrammatic representation of an options window of the invention of FIG. 1.

Like reference characters in the respective drawn figures indicate corresponding parts.

DESCRIPTION OF THE PREFERRED EMBODIMENT

Figure 1:
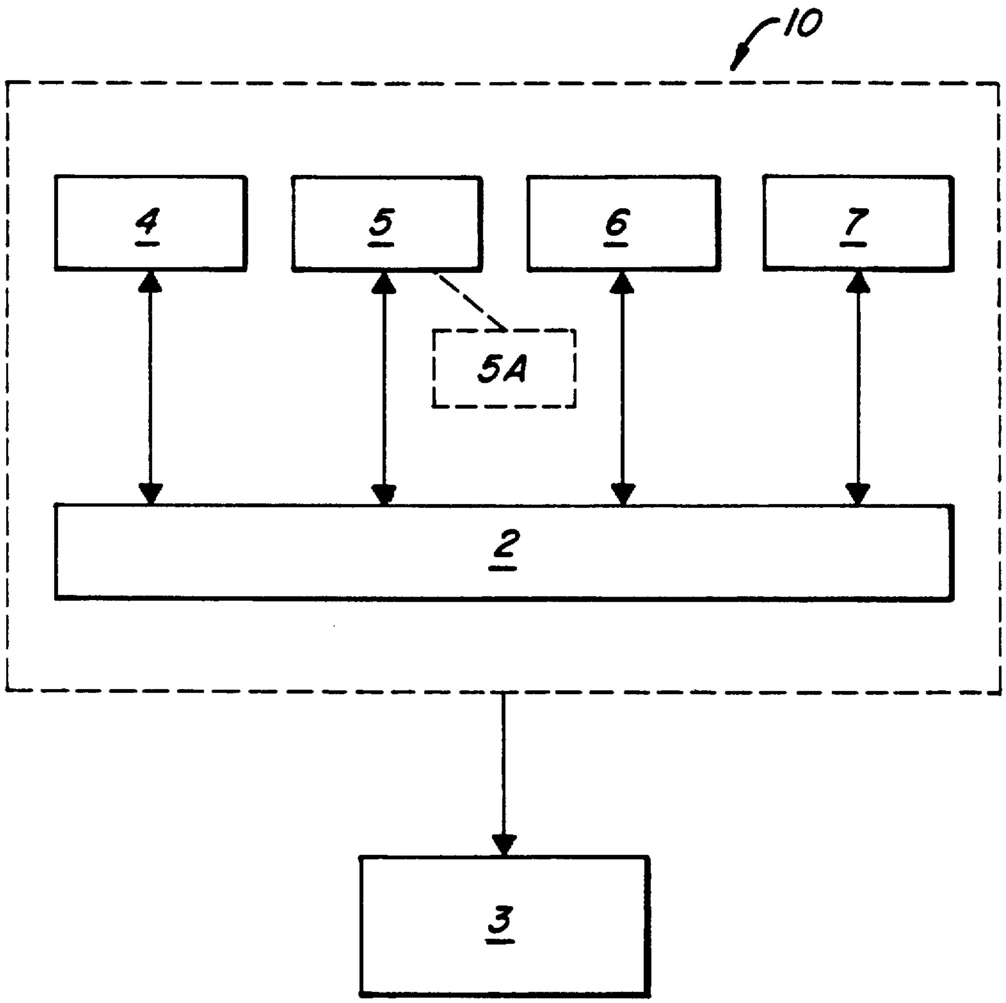
FIG. 1 is a flow diagram of an embodiment of the invention.
Figure 1A:
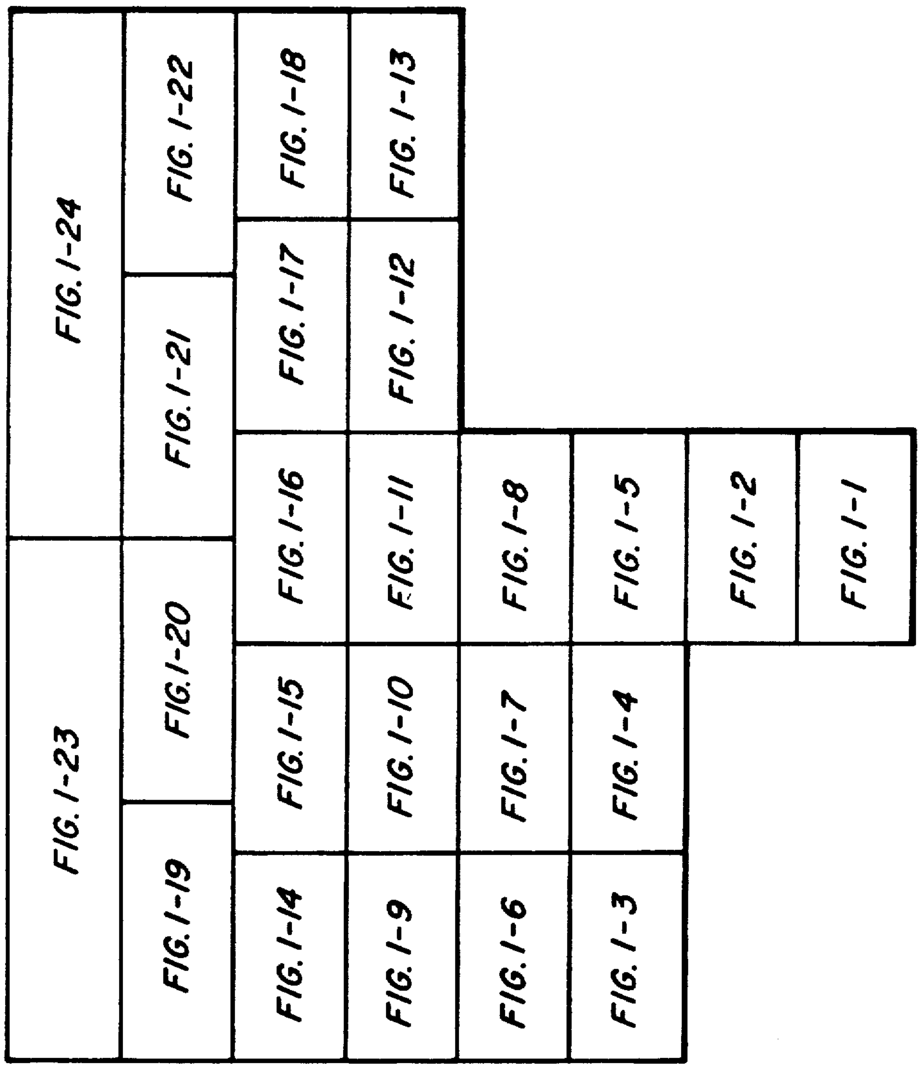
FIG. 1A shows a diagram designating the relative position of each of FIGS. 1-1 through 1-24.
Figure 1:
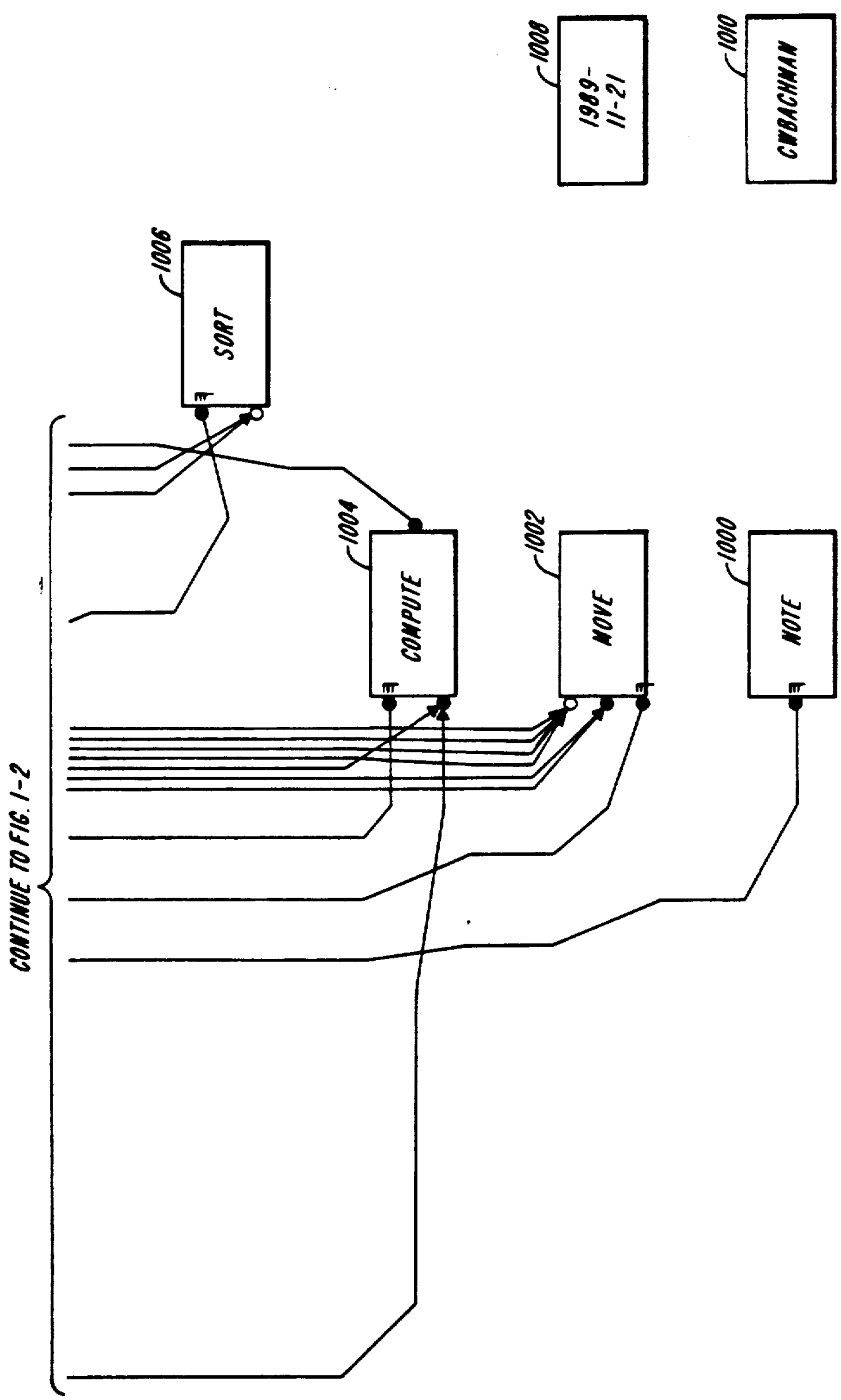

In the preferred embodiment of the invention disclosed herein, a system 10 operates using a programmed IBM-compatible 80386 Personal computer, having an OS/2 operating system. Other computer hardware and operating systems, such as UNIX or DOS, may be used, with some modifications to the software. Although the preferred embodiment uses C as its programming language, other programming languages may be used to implement the present invention.

The system 10 assists data analysts and systems analysts in building models of information systems of organizations. These models, or files, can be stored in a database and shared among analysts. In its preferred embodiment, shown in FIG. 1, the system 10 consists of four modelers, or editors, which can be used to build models, each of which gives a different perspective of the same design.

The system 10 further includes a controller 2 and a display 3. The four modelers include: the information modeler 4; the process modeler 5; the logic modeler 6; and the function modeler 7. Each of these modelers generate corresponding models or diagrams, having design data which may be created, analyzed, and modified by a user. These models and diagrams are referred to as the information model (IM), the information flow model (IFM), the Process Description Language (PDL) diagram, and the functional decomposition (FD) diagram, respectively. Each of these models and diagrams may be dynamically linked in the manner described in further detail below.

FIGS. 1-1 through 1-24 collectively show a detailed entity-relationship diagram of the preferred embodiment of the invention. FIG. IA shows a diagram designating the relative position of each of FIGS. 1-1 through 1-24 to form a composite, complete entity-relationship diagram of the preferred embodiment.

The following TABLE 1 identifies, in column I, elements of the system shown in FIGS. 1-1 through 1-24. TABLE 1, column II, identifies corresponding names for certain of the elements of column I which are used in the description below.

TABLE 1

LEGEND FOR FIGURES 1-1 THROUGH 1-24

| Column I | Column II |
|---|---|
| ABORT | abort |
| ABORT-CLOCK | |
| ALLOW-EXPRESSION | |
| ALLOWABLE-VALUE | allowable value |
| ANY SELECTION | |
| APPL-ATTRIBUTE | |
| APPL-ENTITY | |
| APPL-P-SET | |
| APPL-PARTNERSHIP | |
| APPL-STRUCTURE | information structure |
| ARGUMENT | |
| ATTRIBUTE | attributes |
| BEGIN | |
| BETWEEN | |
| BLOCK | |
| CALLED-PROCEDURE | |
| CHAR-STRING | |
| CHOOSE | case |
| CHOOSE-BLOCK | |
| CLOCK | |
| COMMIT | commit |
| COMPUTE | |
| CONSTANT | |
| CONTINUE | |
| CYCLE | |
| DELETE | delete |
| DESTINATION | destination |
| DIMENSION | dimension |
| DISJOIN | |
| DO | do |
| DOMAIN | domain |
| ELEM-ATTRIBUTE | |
| ELEM-DOMAIN | |
| ELEM-VALUE | |
| ELSE | |
| ELSEIF | |
| END | |
| ENTERPRISE | |
| ENTITY | entities |
| ENTITY-SET | entity-set |
| ERROR | |
| EVENT-OBJECT | event |
| EXIT | exit |
| EXPRESSION | |
| EXT-CALLED-PROCEDURE | |
| FIRST | |
| FLOW-ATTRIBUTE | flow-attribute |
| FLOW-ENTITY | flow-entity |
| FLOW-MODEL | |
| FLOW-P-SET | flow-partnership set |
| FLOW-PARTNERSHIP | flow-partnership |
| FLOW-STRUCTURE | message<br>information flow<br>contents |
| FOR-EACH | foreach<br>loop |
| FOR-EACH-BLOCK | |
| FOR-EACH-TYPE | |
| GLOB-PROCEDURE | |
| GROUP-ATTRIBUTE | |
| GROUP-DOMAIN | |
| GROUP-VALUE | |
| IF | if |
| IF-BLOCK | |
| IM-CONDITION | |
| IM-PROCEDURE | methods |
| IM-PROCEDURE | entity methods |
| IM-PROCEDURE | attribute methods |
| IM-PROCEDURE | partnership-set methods |
| IMAGE | |
| IML | |
| IML-BLOCK | |
| INFO-BASE | |
| INFO-FLOW | |
| INFO-MODEL | information model |
| INFO-STORE | information-store |
| INST-APPL-ATTRIBUTE | |

TABLE 1-continued

LEGEND FOR FIGURES 1-1 THROUGH 1-24

| Column I | Column II |
|---|---|
| INST-ELEM-ATTRIBUTE | |
| INST-GROUP-ATTRIBUTE | |
| INST-SUB-ATTRIBUTE | |
| INST-TOP-ATTRIBUTE | |
| INT-CALLED-PROCEDURE | |
| INT-PROCESS | high-level process |
| IS-ATTRIBUTE | |
| IS-ENTITY | |
| IS-OBJECT | |
| IS-PARTNERSHIP | |
| IS-P-SET | |
| IS-STRUCTURE | |
| JOIN | |
| KEY | key |
| LAST | |
| LEAVE | skip |
| LEAVE-PROCEDURE | |
| LITERAL | |
| MAP | |
| MODIFY | update |
| MOVE | |
| NLS-CHARACTER | |
| NONE | |
| NOTE | |
| NUMBER | |
| ONE | |
| OPERATOR | |
| OTHER-ATTRIBUTE | |
| OTHER-ENTITY | |
| OTHER-P-SET | |
| OTHER-PARTNERSHIP | |
| OTHER-STRUCTURE | |
| P-SET | partnership-sets |
| PARAMETER | |
| PARTNERSHIP | relationships |
| PERSON | |
| PL-ATTRIBUTE | |
| PL-ENTITY | |
| PL-P-SET | |
| PL-PARTNERSHIP | |
| PL-STRUCTURE | |
| PREDICATE | |
| PROC-BLOCK | |
| PROC-PROCEDURE | |
| PROCESS | processes |
| | process local store |
| RECEIVE | receive |
| | resume |
| RETURN | return |
| ROLLBACK | |
| SELECT | retrieve |
| SELECTION | |
| SEND | send |
| | signal |
| SORT | |
| SOUND | |
| SOURCE | source |
| STATE | |
| STATEMENT | |
| STOP | |
| STORE | create |
| STORE | insert |
| SUB-ATTRIBUTE | |
| SUB-VALUE | |
| TERM-PROCESS | primitive process |
| TEXT | |
| THEN | |
| TOP-ATTRIBUTE | |
| TOP-VALUE | |
| TRANSACTION | |
| TRANSITION | |
| VALUE | |
| VARIABLE | |
| VIEW-ATTRIBUTE | |
| VIEW-ENTITY | |
| VIEW-P-SET | |
| VIEW-PARTNERSHIP | |
| VUEW-STRUCTURE | information flow |
| | contents |
| WHEN | when |

The primary interface between a user and the system of the invention is through a series of interactive graphics windows presented to the user in the display 3. The windows display text, tree structure diagrams, or other graphical representations of each of the modelers. As shown in FIG. 2, when a user accesses either the information modeler or process modeler, three windows will generally appear: an options facility 20; a feedback window 22; and, a diagram window 24.

The options facility 20 consists of a hierarchy of items which enable the user to perform actions on a specified model. By activating an element displayed in the facility, for example by placing and activating a cursor over the element, a selected model may be activated or deactivated. This facility may also display selections not presently available to the user at that time.

The feedback window 22 displays messages informing the user of one or more of the following: when an action has taken place; what step to take next; any mistakes or errors which may occur; when the user is entering or exiting a modeler or mode.

The diagram window 24 displays diagrams generated by each of the modelers. This window 24 generally includes the capability to scroll in any direction to view a diagram which is too large to fit in the window 24. Once a diagram is displayed in the diagram window 24, a user may edit the diagram, or create a new diagram. This window 24 also provides a dynamic environment for user interaction to the modelers.

Additional windows may be added or included in the present system. For example, pop-up windows (not shown), context menus 26, and icons (not shown) may appear at various times and at various locations on the CRT of a computer. Pop-up windows may be used to control user interactions with the system. Sometimes a pop-up window may be used to provide choices, or warn of a problem. Context menus may be included to enable the user to perform actions within a specific context, or model. An item in a context menu may function in the same manner as the corresponding item in an options facility, but may occur at different times or locations than the options facility. Icons may appear at various locations on the CRT, for example in the lower left corner when a model is initially opened, or as a reminder that other modelers and models are available.

Diagrams and forms of the system are tools used for defining and manipulating objects of the overall business information system model. Once an object is created using any of the modelers, or editors, of the system, it exists in the system and can be displayed graphically in any applicable diagram, or textually in a form. When an object is manipulated, the new information about the object is accessible from any applicable diagram or form, which provide different ways of accessing the same model objects by offering different perspectives of the same system.

An additional editor, the options modeler 5A, is available from the logic modeler 5. The options modeler is a language sensitive editor which prompts the user with grammatical options which may be inserted at any selected location. The modeler 5A defines what can be selected by the user and inserted into a PDL statement, which is further described below. The modeler 5A presents the options to a user in an options window, and shows only the next available syntactic phrase or term. Thus, at any point, the option modeler provides only syntactically valid options.

It is also possible to display subprocesses for a process contained in an information flow model concurrently with an information flow diagram in the diagram window. In the preferred embodiment, while an activated information flow model (IFM) diagram is displayed in the diagram window, a user may selectively display subprocesses to specified process within that IFM diagram. This "process explosion" is described in further detail in the section labelled "Process Modeler" below.

Since the four models are essentially views of the same information system design, an operation applied to one model using a particular modeler has an immediate effect on another model. This may be accomplished by maintaining logical relationships between the models, thus keeping the representation of design data consistent with the underlying design. It is important, therefore, that a change to a model or diagram in one modeler is reflected in other models and diagrams. For example, if a process is deleted through the function modeler, the deletion is automatically and immediately reflected in the IFM diagram. By way of further example, if a process having associated information flows is created through the process modeler, the information flow model objects, or IFM design data, are reflected in an activated PDL diagram. This change may occur substantially immediately, i.e. without any additional user input.

The preferred embodiment is a system designed for interaction with a human user. However, the system may also be incorporated into a larger system whereby the "user" becomes a generic "operator", such as another computer. The operator may include magnetic tape devices, which download information into the present system. Any other technology which permits transfer of design data, or information, such as laser disc memory devices, may be used. The operator may also be an artificial intelligence device which not only provides design data input, but is capable of dynamically interacting with the present system.

Information Modeler

An information model describes the objects that are used within the system. The information modeler 4 of the present system invention includes an editor for creating, analyzing, and modifying entity relationship data models, referred to below as information model (IM), and for generating entity-relationship (E-R) diagrams which describe relationships between entities. An exemplary E-R diagram is shown in FIG. 3. The information modeler consists of IM design data, or IM objects, which may include entities, attributes, attribute methods, relationships, entity methods, keys, domains, dimensions, allowable values, and partnership sets. The modeler 4 also enables the operator to import existing information models created on other systems, or in other environments, into the present system 10.

As used in the field of the invention, the term "entity" is generally defined as an item about which information is being stored. An entity may be a tangible object, such as an employee or a part, or may be an intangible concept, such as a job title or an event. The term "attribute" is generally defined as properties of entities. For example, for an entity "customer", attributes may include address, company affiliation, or salary. A "relationship" describes the correlation among entities, or among attributes. Alternately, attributes may be "free" attributes. Free attributes are attributes not associated with an entity. For example, an attribute may be used to hold constants, or contents of flows that go between processes. A free attribute may later become associated with an entity, or may remain independent.

"Partnership sets" are described in detail in U.S. Pat. No. 4,631,664 (Bachman, Dec. 23, 1986). In the present system, partnership sets are used both for storing and manipulating information. Thus, using the information modeler 4, a user may define objects within the system as partnership sets. Internal to the system, partnership sets are established to provide the medium through which design data is accessed and exchanged among the modelers of the present system.

An "entity method" is a PDL procedure (defined below) attached to an entity in an E-R diagram rather than to a process in the IFM diagram. Each entity method defines a generic operation to be performed on all occurrences of the entity, similar to methods in object-oriented programming. The use of entity methods protects applications from changes made in the design data model. Similar to an entity method, an "attribute method" is a PDL procedure associated with an attribute.

A typical use for an entity method might be to specify a referential integrity rule required by a user's business. For example, a company may have a rule that requires the "last-customer-number" attribute to be incremented by one each time a new customer is created, and the assignment of that number to the new customer. The traditional "process-centered" approach would force all developers of applications to include the code for this operation each time an application creates a new customer. However, a "create-customer" entity method may be created to handle this operation. Then, whenever an application creates a new customer, the developer calls the "create-customer" entity method which insures that the "last-customer-number" attribute is incremented by one and assigned to the new customer.

A "derived attribute" is an attribute having a value which is calculated each time it is used in a procedure. The value is not stored in the database, but is recalculated when it is used. For example, for a transaction-based system, a user might create a derived attribute, called "total-tax", that calculates the total sales tax for each sales transaction. A PDL statement is then used to create a derivation rule, which sets the derived attribute "total-tax" equal to 5% of the value of the stored attribute "subtotal-taxable." Once a derived attribute is created, it can be used in the same manner as any other attribute derived in an E-R diagram.

A key is one or more entity components that uniquely identifies an occurrence of an entity. For example, every house has a unique address and every employee has a unique employee identification number. In the preferred embodiment of the system, unique keys may represent one or more attributes, partnership sets, or a combination of both attributes and partnership sets. Keys may be primary, alternate, or foreign. A primary key represents a combination of attributes and/or partnership sets that uniquely identify each occurrence of an entity. For example, "Emp-Address" attribute of an Employee entity.

Any key other than a primary key is an alternate key, which may later become a primary key. For example, a customer can be uniquely identified by a customer identification number, or by a name and address combination. A user can choose either identification form as the primary key for the Customer entity. The other key is then an alternate key.

Foreign keys represent attributes and/or partnership sets used to establish a recursive relationship or a relationship with another entity or partnership set. Attributes within the entity may correspond to some or all of the attributes in the primary key of a partner entity. That is, a foreign key is a primary key in one entity that acts as a unique identifier in a partner entity, a partner entity essentially being referenced by the primary key in the other entity.

To create a new information model, the user selectively interacts with the options facility 20 to the information modeler 4 to indicate that a new file is being created. The options facility 20 may include various forms of information display, such as a palette, a dialog box, or context menus, depending upon the type of information to be displayed and/or ergonomic criteria. The new information model (IM) is named, and identified as to type of model. In the preferred embodiment, a diagram is generated in the diagram window 24. An operator may then create an IM by creating and placing IM design data, or objects, in the IM diagram. The IM design data may include entities, with associated attributes, relationships, text blocks, and entity methods. In the preferred embodiment, IM design data may include at least the following objects and combinations: attributes; attribute methods; entities; entity methods; partnership sets; partnership set methods; entities and relationships; entities and attributes; and entities, relationships, and partnership sets.

Figure 3:
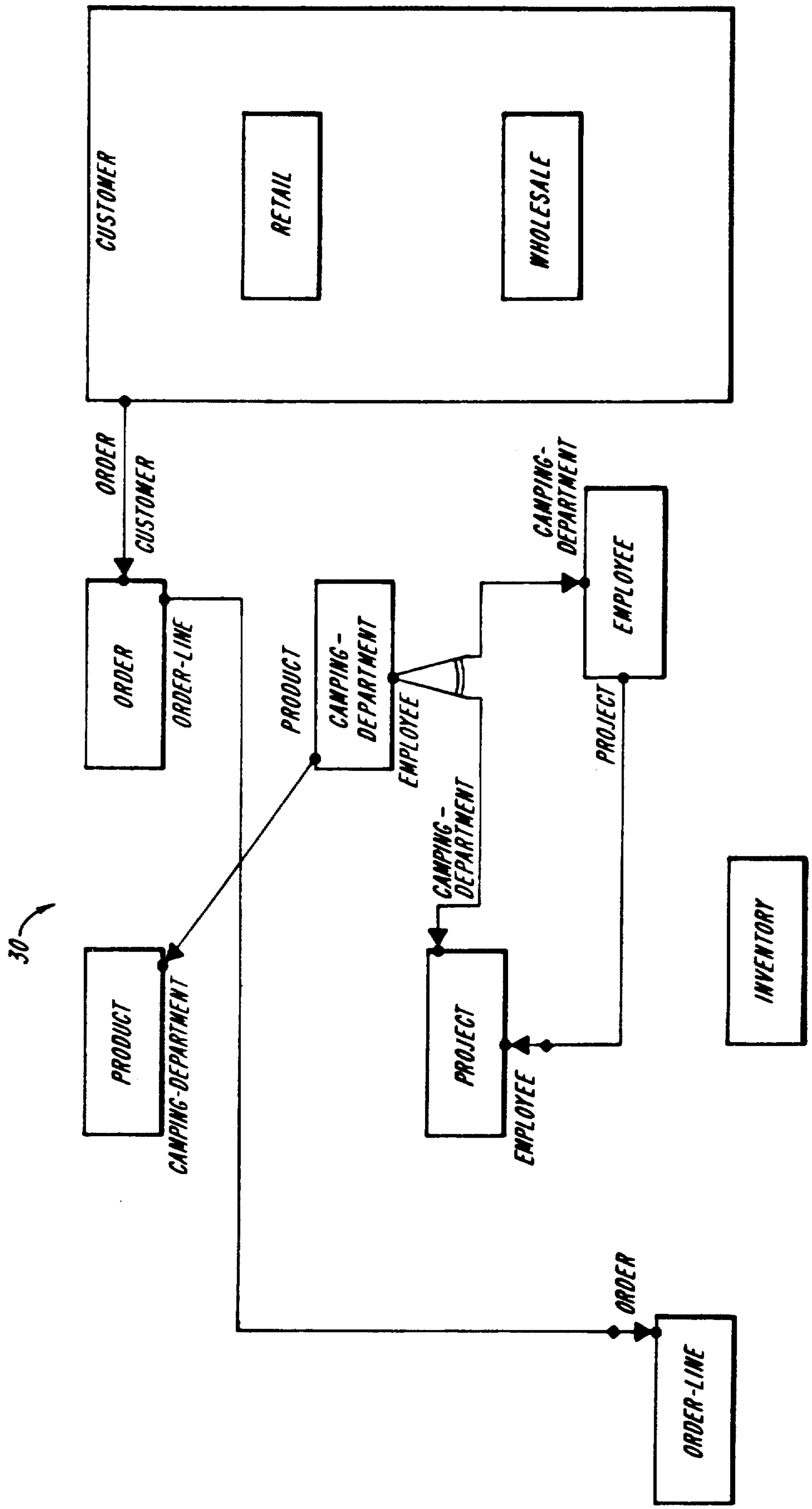
Figure 3A:
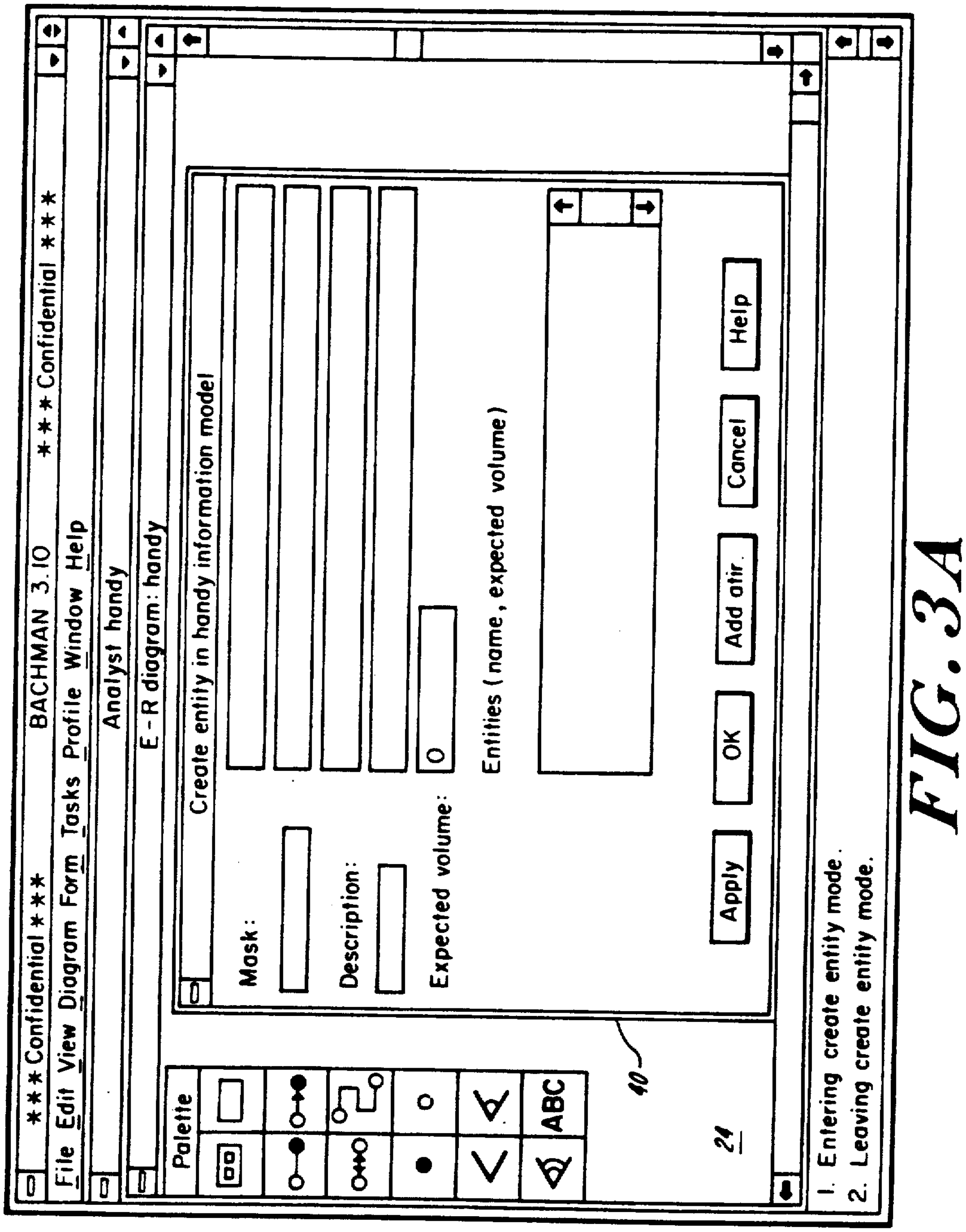
FIG. 3A is a diagrammatic representation of a "create" form which may be accessed through an IM modeler of the invention of FIG. 1.

To create one or more entities, an operator selects an element in the context menu 26 corresponding to "create". A "create" form 40, shown in FIG. 3A, is then displayed in the diagram window 24. The operator then describes the entity by entering the following information: entity name; description; name of parent entity; and expected volume. This information is then stored, and selectively displayed upon later recall by either the operator or one of the modelers.

Attributes may be created in a manner similar to entities, and are described by the following information entered by an operator: attribute name; description; expected length; domain; data type. Data type of an attribute generally may include integers, strings, and the like. Domains may be used to define useful, recurring data types. For example, "date" is a domain, made up of separate pieces of data, each of which may be defined as subdomains. Attributes may only be assigned superior domains as data types. A domain can consist of one or more pieces of data. In the present system, deleting a domain does not delete attributes with that data type, but does leave attributes without data types. Dimension allows a user to group domains which are comparable in value. For example, a value space may have one or more representations such as U.S. format (e.g., Nov. 2, 1990), or European format (e.g., Nov. 2, 1990). By making a dimension "date", all attributes having "date" data type, regardless of format, will be shown.

In the preferred system, attributes may be created independent of entities. Using the partnership set protocols described in U.S. Pat. No. 4,631,664, relationships may be one-to-one, one-to-many, or many-to-many, depending upon the type and complexity of the system or model created.

Figure 4A:
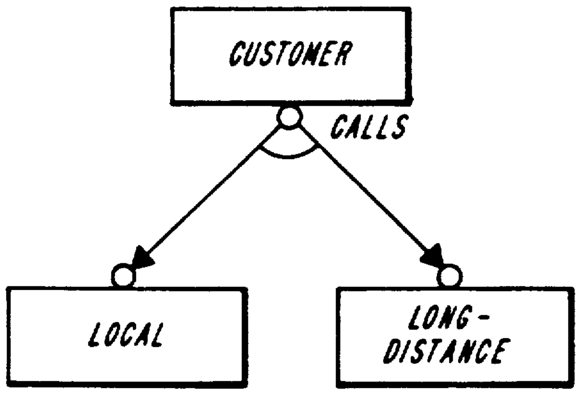
FIG. 4A is a diagrammatic representation of a network diagram display of the invention of FIG. 1.
Figure 4B:
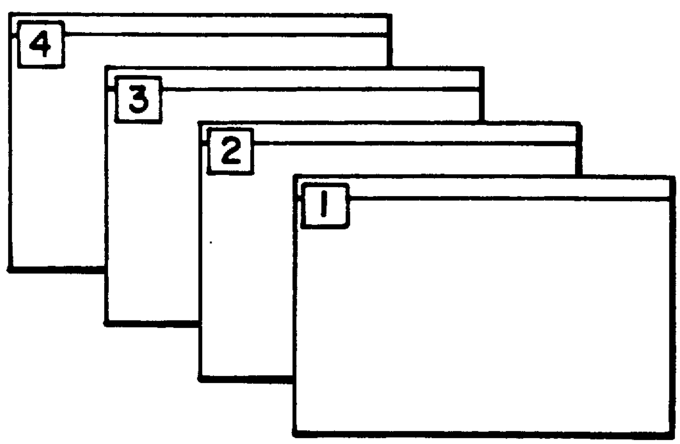
FIG. 4B is a diagrammatic representation of multi-layered overlapping boxes display of the invention of FIG. 1.
Figure 5:
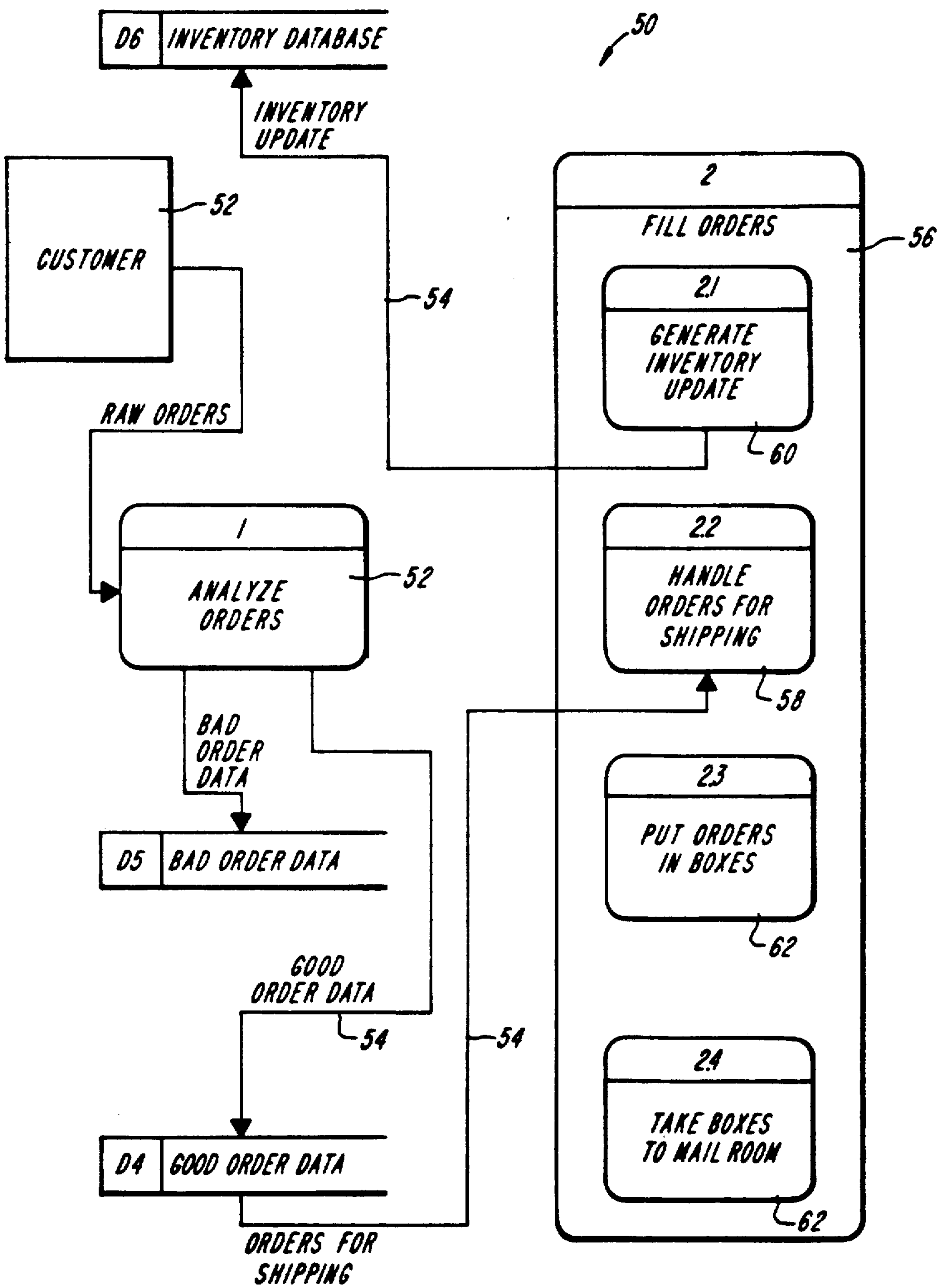

Once an IM is created, it may be displayed as an IM diagram, as either network diagrams or multi-layered overlapping boxes, shown in FIGS. 4A and 4B. Other graphical representations may be used, such as text or tree structure diagrams (not shown). Each design data, or object, of the diagram, or text, may be dynamically activated by the user to modify, analyze, or create the associated IM. Thus, the information modeler 4 may be accessed by the operator by means of the diagram window 24. In a similar manner, the IM diagram 30 may be manipulated as to size or object location. In the preferred embodiment, a pointing device, such as a mouse, is used in conjunction with the system 10 to manipulate a pointing icon in the related windows. Thus, the pointing icon may be used to expand or contract the size of the diagram, the size of the design data associated with the diagram, and placement of the design data in relation to the diagram.

Process Modeler

The process modeler 5 of the preferred embodiment is an editor used to define an information flow model (IFM). An IFM describes a function that occurs within the system. The process modeler 5 enables an operator to define the processes, information stores, information flows, messages, and sources/destinations of the system. The information store of a process modeler 4 corresponds to design data elements in an IM. The information flow of a process modeler represents the flow of design data elements which are usually defined in an IM. Therefore, in the preferred system 10, the IM is generally established before the related IFM. The IM to which an IFM is attached can be empty; that is, it does not have to contain entities, attributes, or other elements. Thus, an operator may begin modeling a system with an IFM diagram, generated through the process modeler to describe relationships between objects in a process model. An exemplary IFM diagram 50 is shown in FIG. 5.

A new IFM can be created through the process modeler 5 in the same manner that a new IM can be generated through the information modeler 4, as discussed above. Generally, creating a new IFM requires operator input of the following: a model name; identification of an associated information model; target database in which the IFM will be stored; and model type. An IFM diagram may be associated with the process modeler 5 such that a user may dynamically interact with the diagram in creating, analyzing and modifying an IFM.

Once an IFM diagram is generated, after the above-mentioned information is entered by the user, IFM design data, or IFM objects, may be selectively placed on the IFM diagram. The IFM design data includes processes, information flows, messages, sources/destinations, process local stores, events, flow-partnership, flow-partnership set, flow-entity, flow-attribute, and information stores. After one or more IFM design data are created by the operator, information flow can be added between them. Duplicate names for design data or flows are generally not accepted within an IFM.

In the preferred embodiment, an information flow may be added to the model once at least two processes, or a process and an information store, or a source/destination object are present. Generally, data cannot flow between two information stores, or between two source/destination objects without an intervening process.

Therefore, the preferred system accesses information flows created between two processes, between a process and a source/destination, or between a process and an information store. The contents of an information flow are generally referred to as messages, which may consist of design data.

Information stores may be created to contain one or more entities, and may be included in the process model. There is an association between information stores and entities, which may be graphically represented in E-R diagrams. An entity may exist in one or many information stores. Therefore, the IFM diagram, IM diagram, and associated process model and information model forms are linked by the association of the information store and the entity. Forms, like diagrams of the preferred system, may be used as tools for defining and manipulating all objects of the system. Diagrams and forms provide graphical and textual ways of accessing the same objects of the system.

In the preferred embodiment, Events are the ones that control flow design data in the IFM diagram. Examples of Events include Clock/Calendar Events, User Events, Database Events, and Flow Events. A Clock/-Calendar Event may indicate that a process is to execute at a specified time. For example, a user might specify a process to run every day at 2:00 pm. User Events generally correspond to a user demand, for example, an explicit "run this process". A Database Event may be a mechanism that initiates the execution of a process based on the changing of an information store value. For example, if a customer goes from having good credit to having bad credit, this might trigger the "send threatening letter" process. A process triggered by a Flow Event begins execution upon the arrival of the flow structure. Flow Events must correspond to a flow going to that process, or a triggering flow.

While Events generally appear in IFM diagrams, there may be corresponding clauses in other modelers of the system. For example, in the preferred embodiment, a Triggered-When clause in the logic modeler corresponds to the IFM diagram Event for that process. Further, in the preferred embodiment, every completely specified primitive process (described further in the "Function Modeler" section, below) must have a triggering Event associated with it. This Event is what actuates the process, forcing it to begin "executing" its business logic.

Source/destination objects may be defined to direct information in an IFM. In the preferred system, these objects may be included in the IFM diagram to indicate the source or destination of IFM design data of that diagram.

The size of an IFM diagram 50 may be changed, enlarged or diminished, to accommodate the viewing needs of a user. In the preferred embodiment, a user can generate an expanded view of a selected process or design data element. The size of the IFM diagram 50 may also be changed to accomodate an overlapping, or superimposed exploded process or function decomposition diagram (described below). In addition, the layout of the IFM diagram 50 may be modified by moving IFM design data, for example, boxes and graphical representations (arrows) of information flows 54 connecting the boxes, as shown in FIG. 5.

Once a process is created it may be divided into lower-level processes or subprocesses. Dividing a high-level process into two or more subprocesses is referred to as "explosion". In the preferred embodiment, the process to be exploded must have at least one information flow attached to it, either incoming or outgoing. In other forms, such a restriction is not necessary. When a process is exploded, the number of subprocesses generated and named by the system for the exploded process equals the number of flows coming into and out of the process.

In one embodiment, a subprocess 58 related to an incoming flow has the word "handle" as a prefix to its name; a subprocess 60 related to an outgoing flow has the word "generate" in its name. Subprocesses 62 may exist within a process 56 which have neither incoming nor outgoing flow associated therewith. For example, as shown in FIG. 5, a process "fill orders" may be divided into subprocesses "generate inventory update", "handle orders for shipping", "put orders in boxes", and "take boxes to mail room".

Thus, an IFM diagram may contain both high-level processes 56 and primitive processes 62. High-level processes 56 are those processes having subprocesses associated therewith. Primitive processes 62 are those processes having no subprocesses. Once a process is exploded, the subprocesses may be displayed through a functional decomposition diagram 80, (defined below), or superimposed over a segment of the IFM diagram.

In the preferred embodiment, a user can simultaneously and concurrently view an IFM diagram 50 and an exploded process 56 in the same diagram window 24. For example, a user may use a pointing device to point to an icon representative of a high-level process 56 in an IFM diagram 50, and display the "explosion", or subprocesses, of that process, while maintaining the other processes on the display screen. A user may also display or hide the subprocesses in a corner window, leaving the IFM diagram intact. Subsequent changes to an IFM object or process in either window would be reflected in the other window. Conversely, the subprocesses can be hidden in the high-level process using process "implosion", resulting in a display of only the high-level process.

Figure 6A:
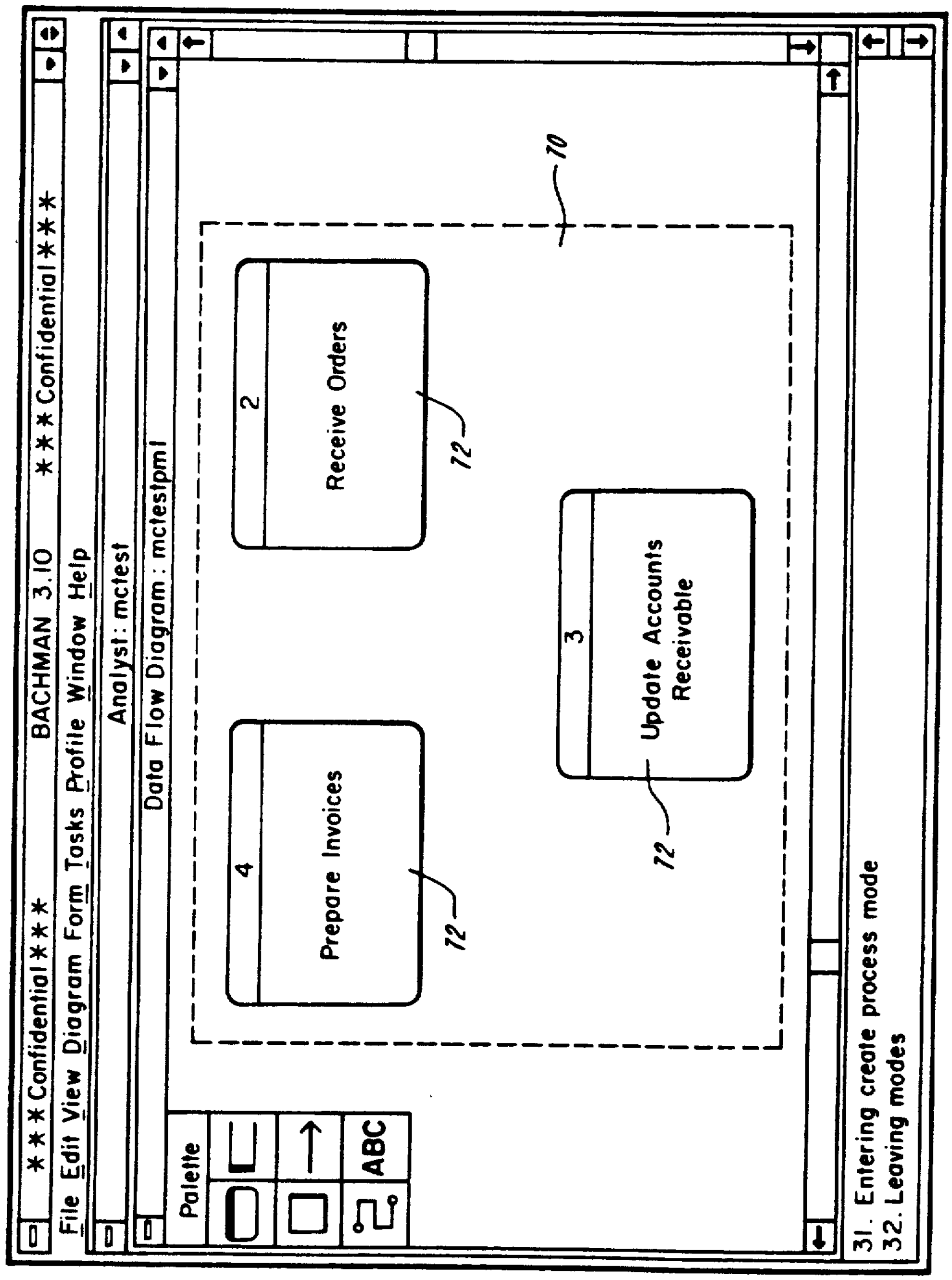
FIG. 6A is a diagrammatic representation of an IFM diagram display of the invention of FIG. 1 having exploded processes, prior to creating a new process boundary.
Figure 6B:
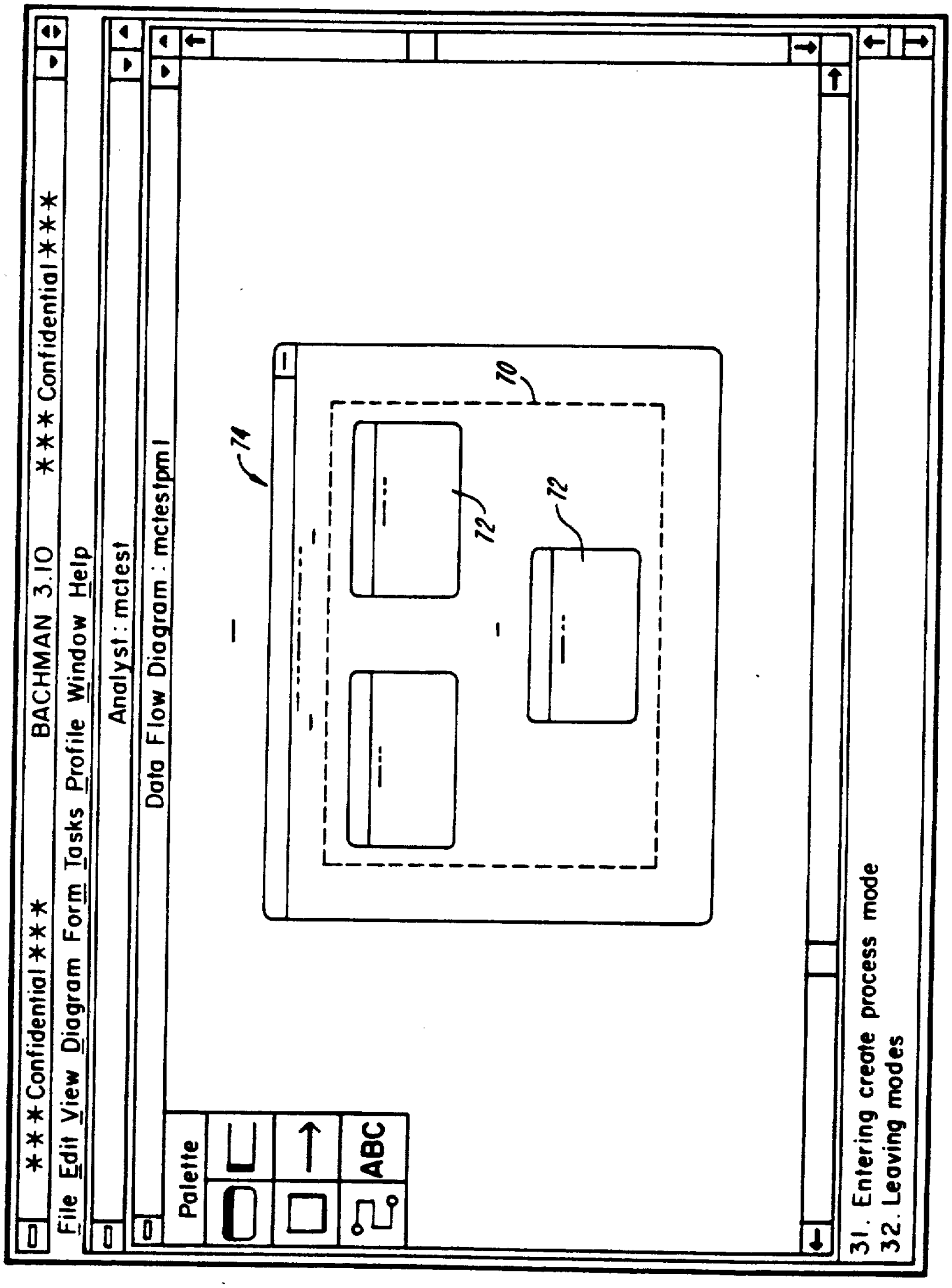
FIG. 6B is a diagrammatic representation of an IFM diagram display of the invention of FIG. 1 having a new process incorporating subprocesses.
Figure 7:
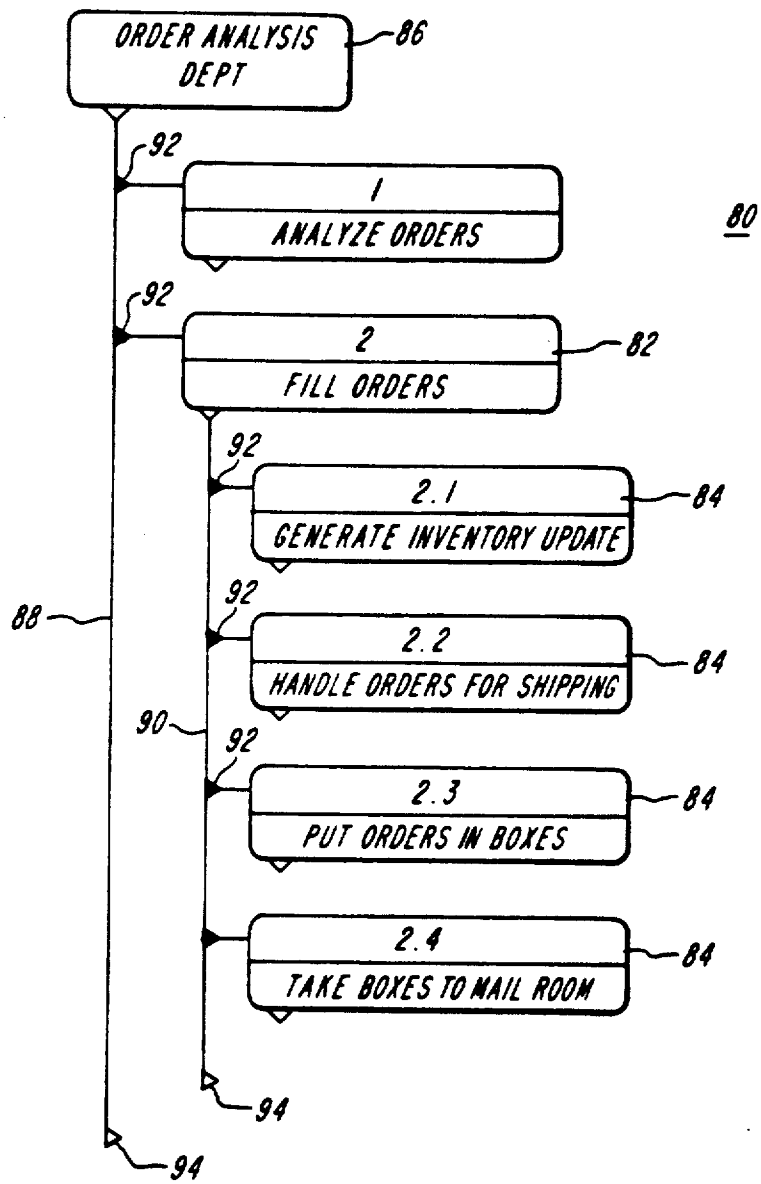
Figure 8:
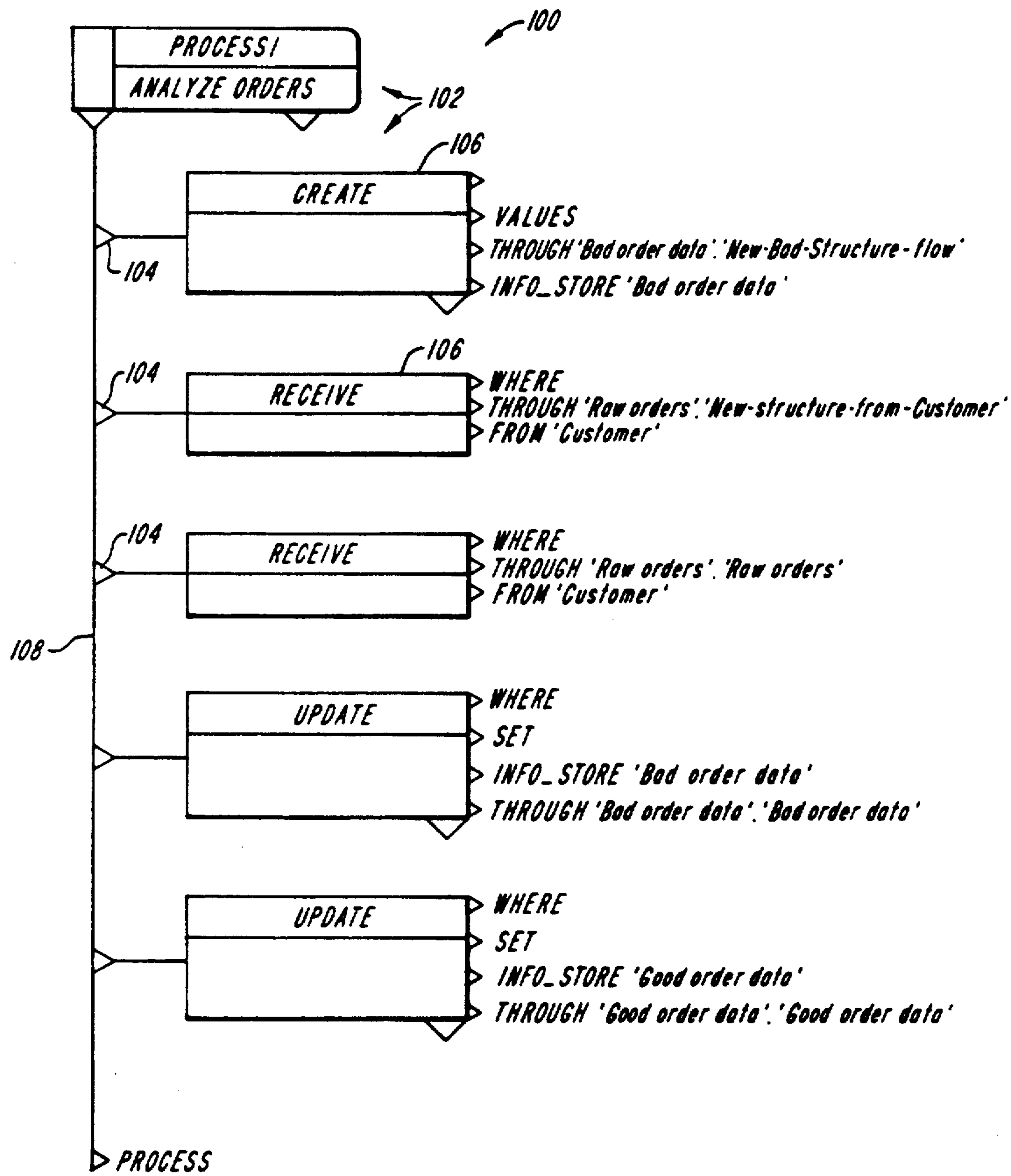
Figure 9:
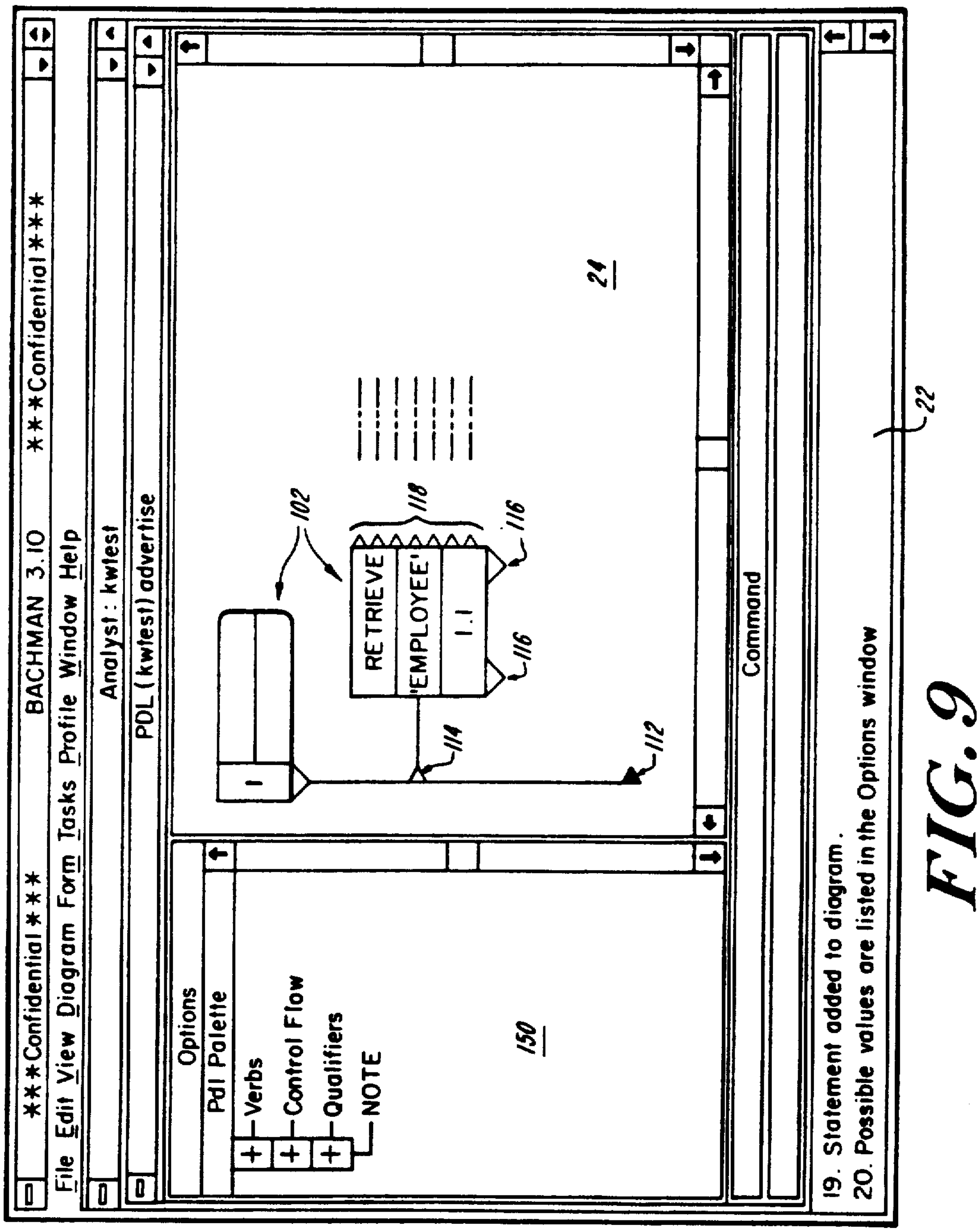
Figure 10:
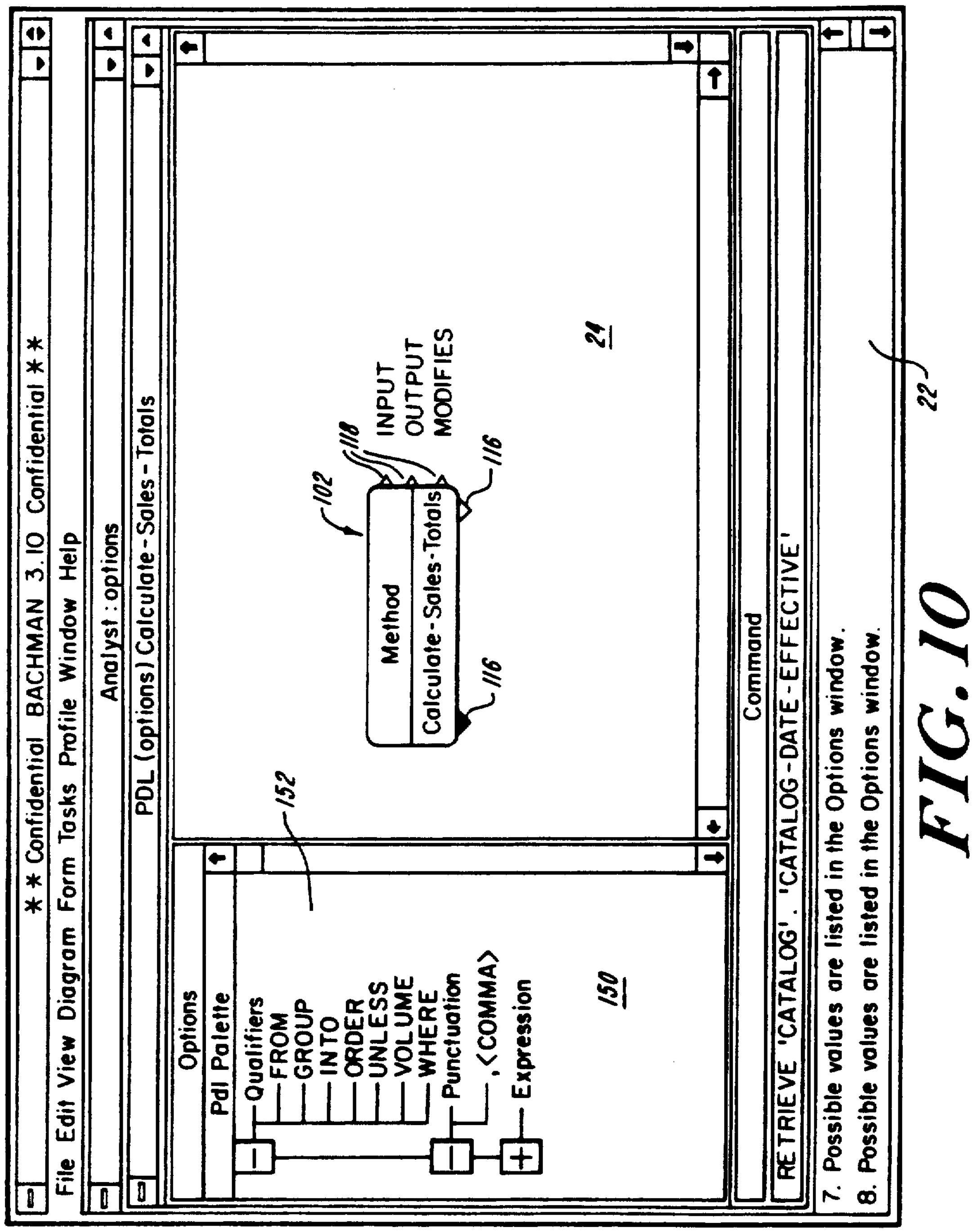
Figures 1, 6:
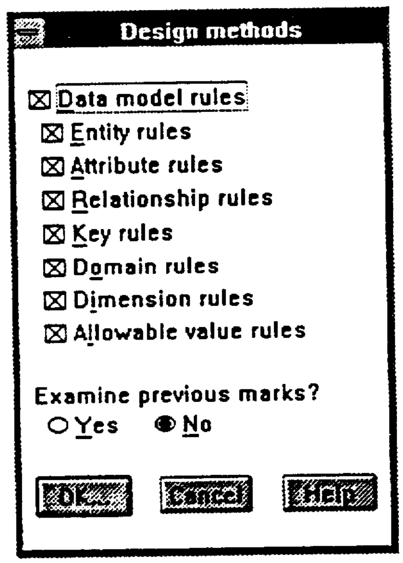
Figures 2, 6:
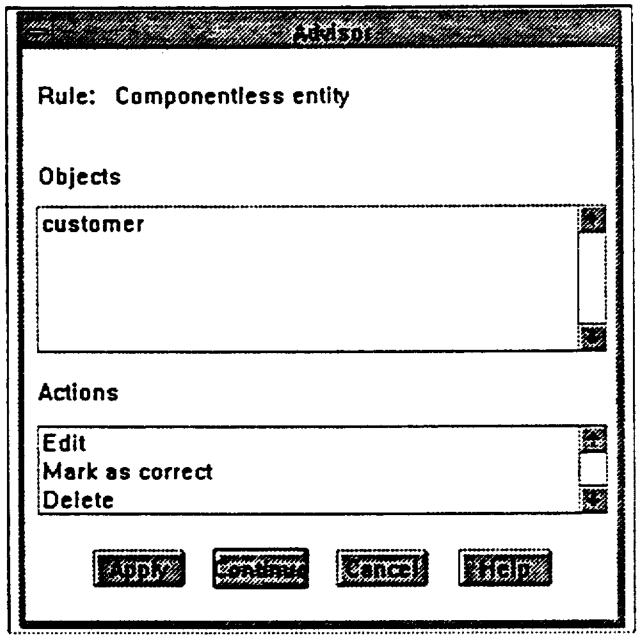
Figures 3, 6:
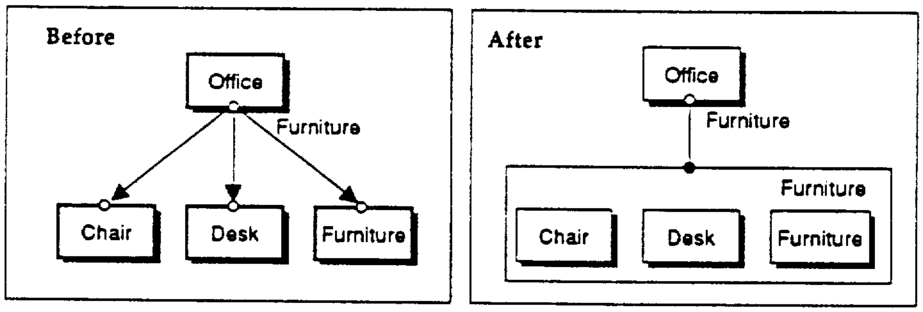
Figures 1, 3:
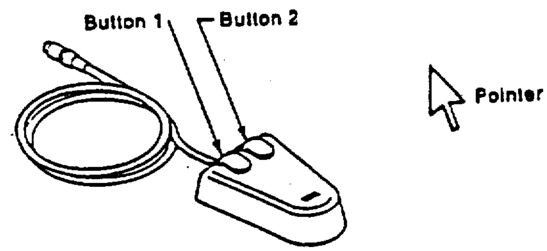
Figures 2, 3:
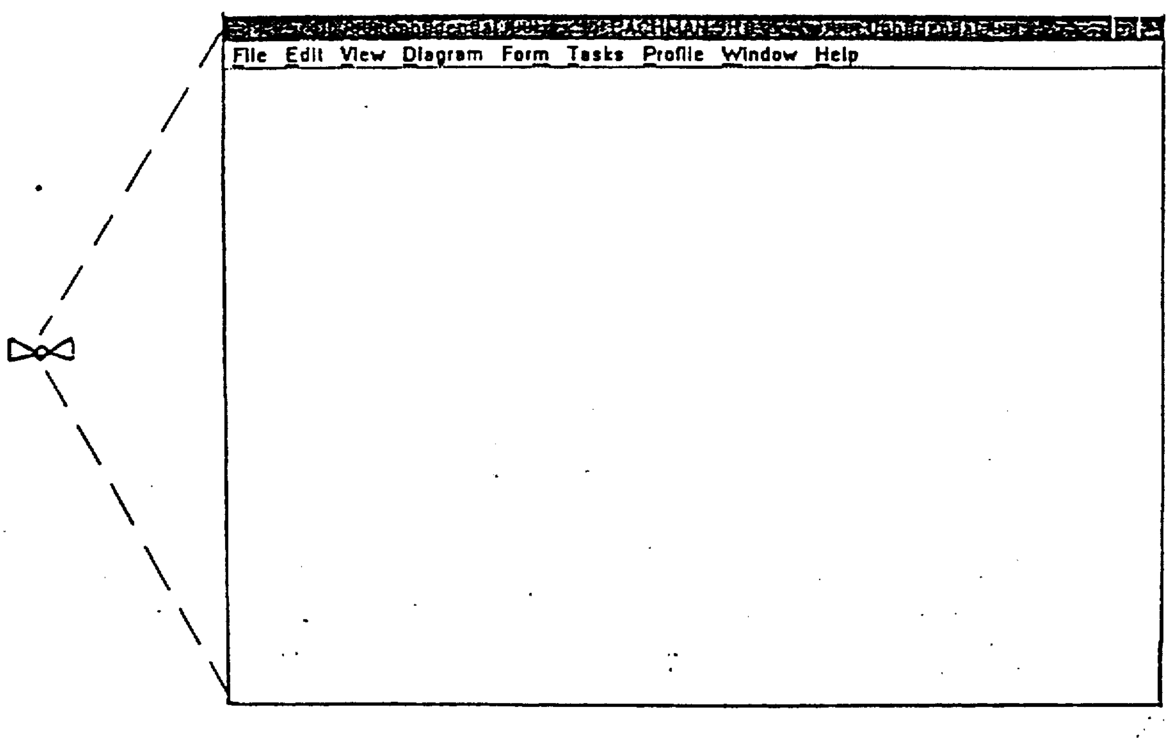
Figure 3:
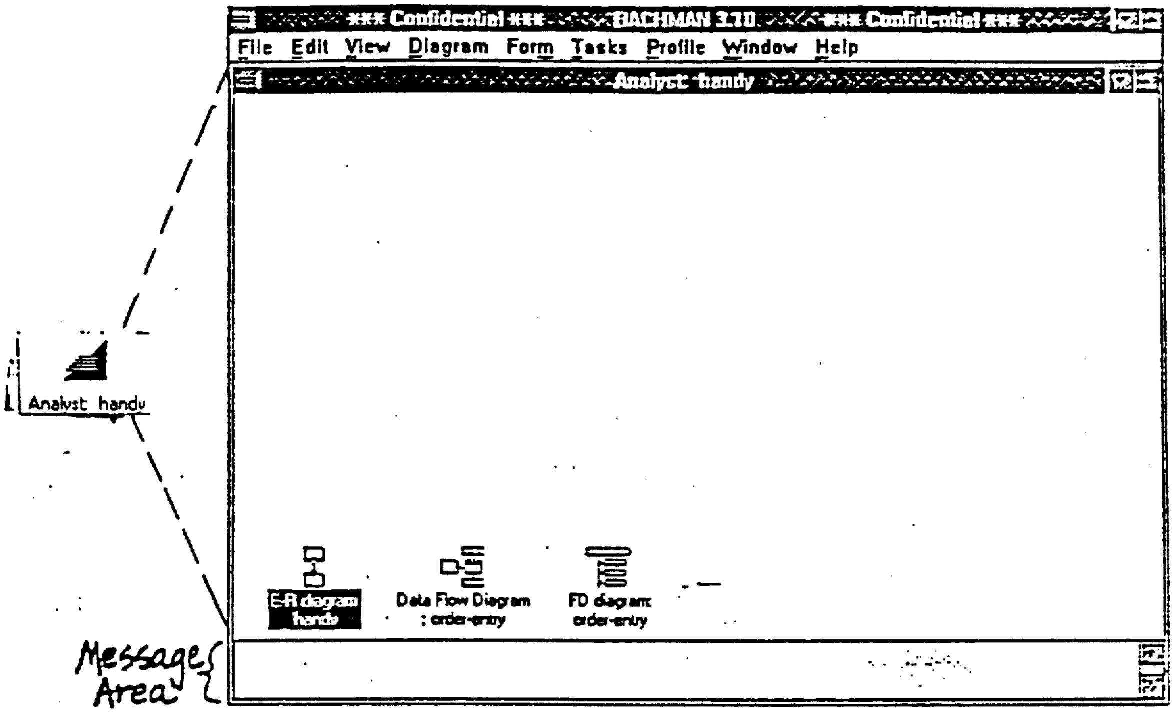
Figures 3, 4:
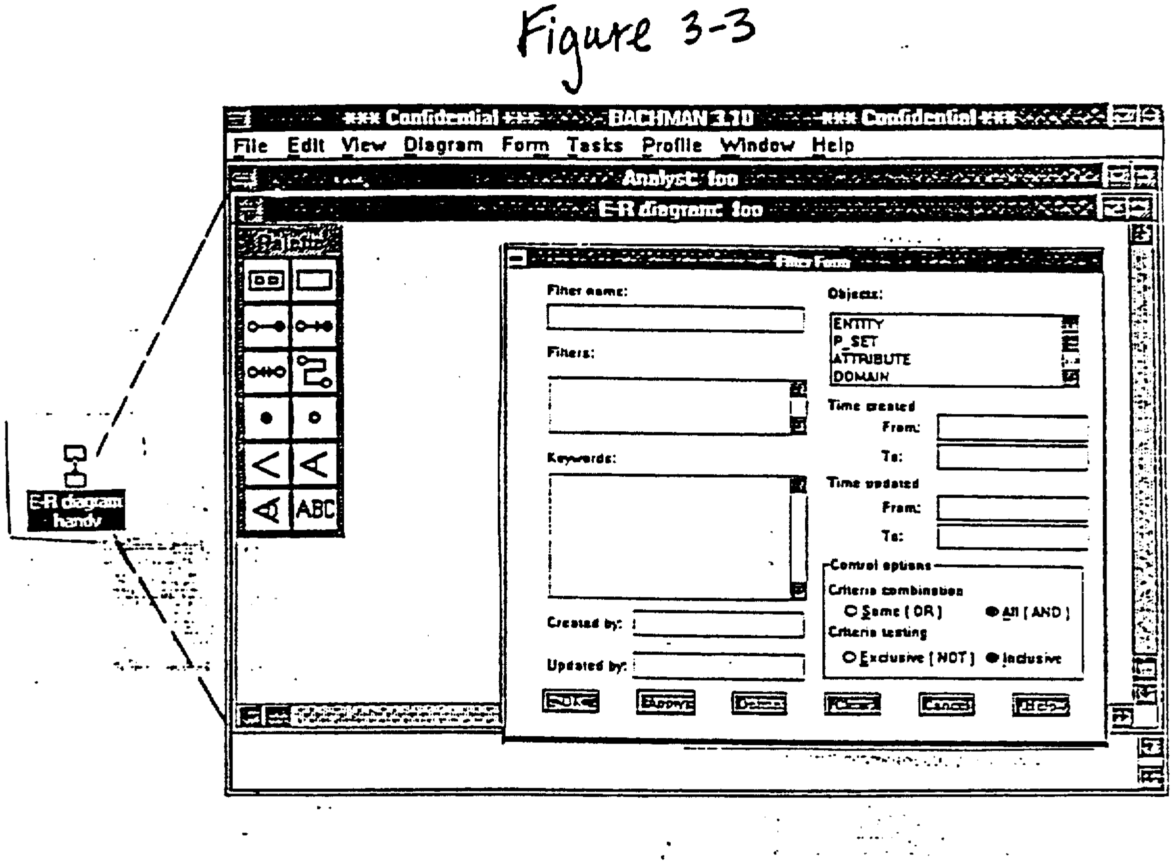
Figures 3, 4, 5:
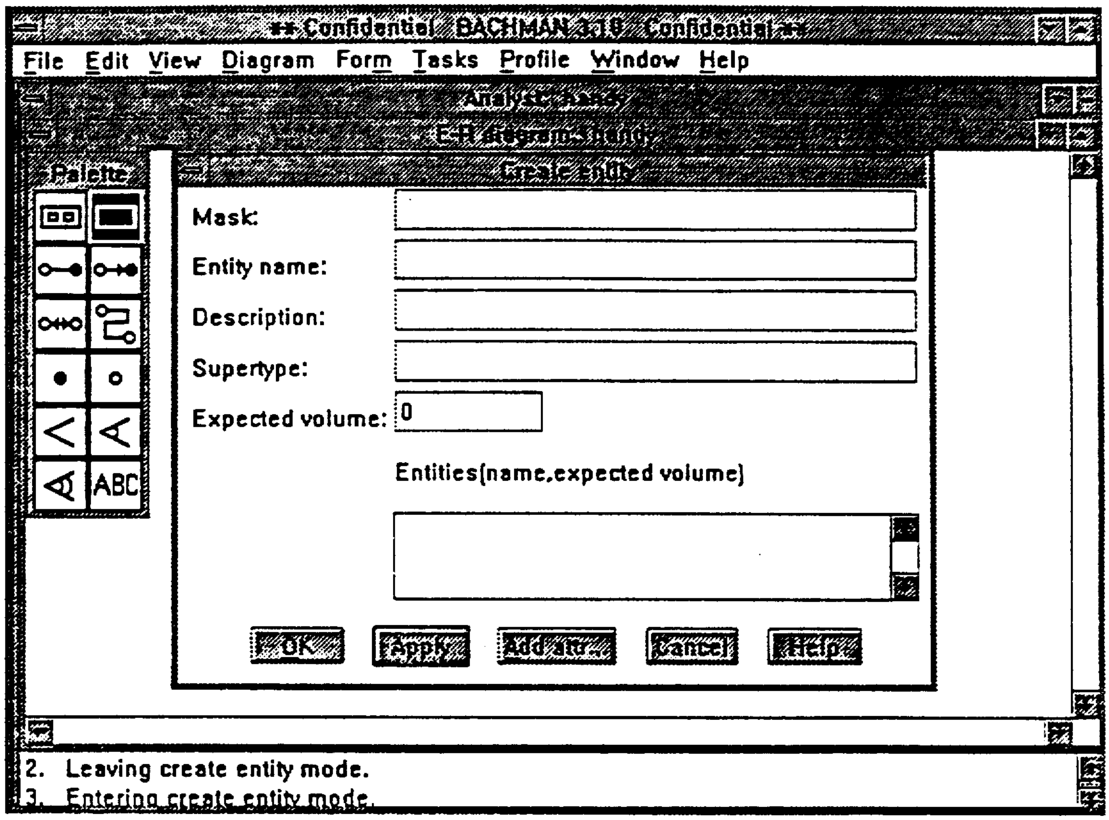
Figures 3, 4, 5, 6:
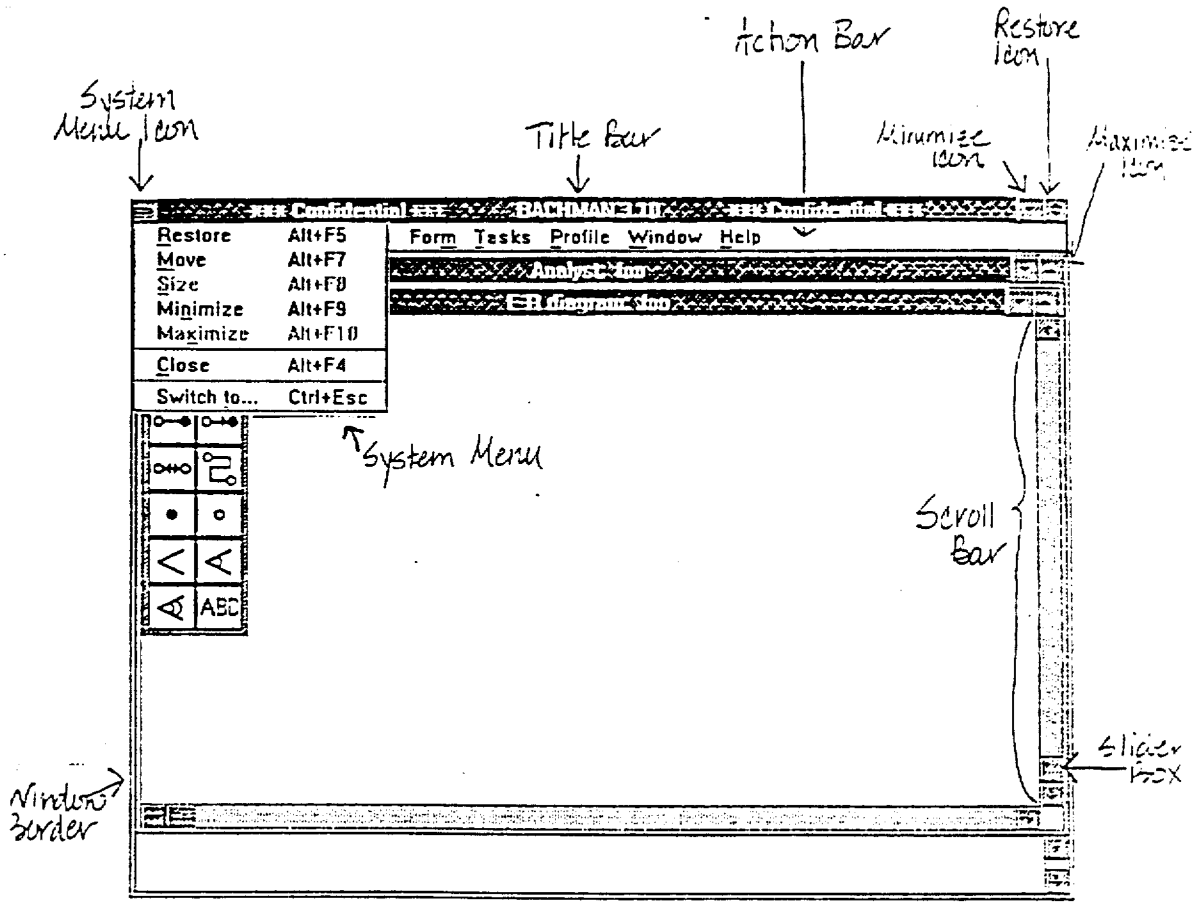
Figures 3, 4, 5, 6, 7:
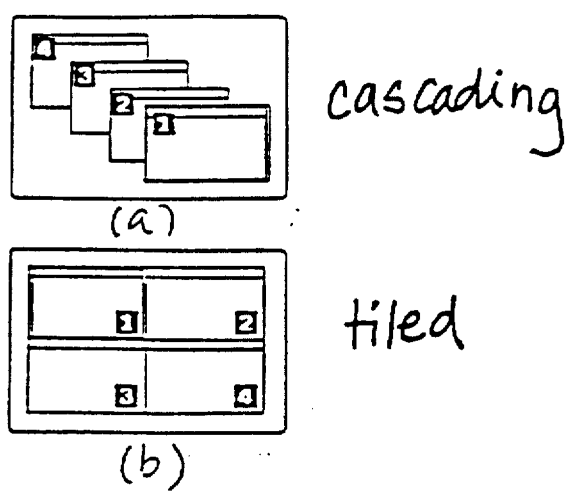
Figures 3, 4, 5, 6, 7, 8:
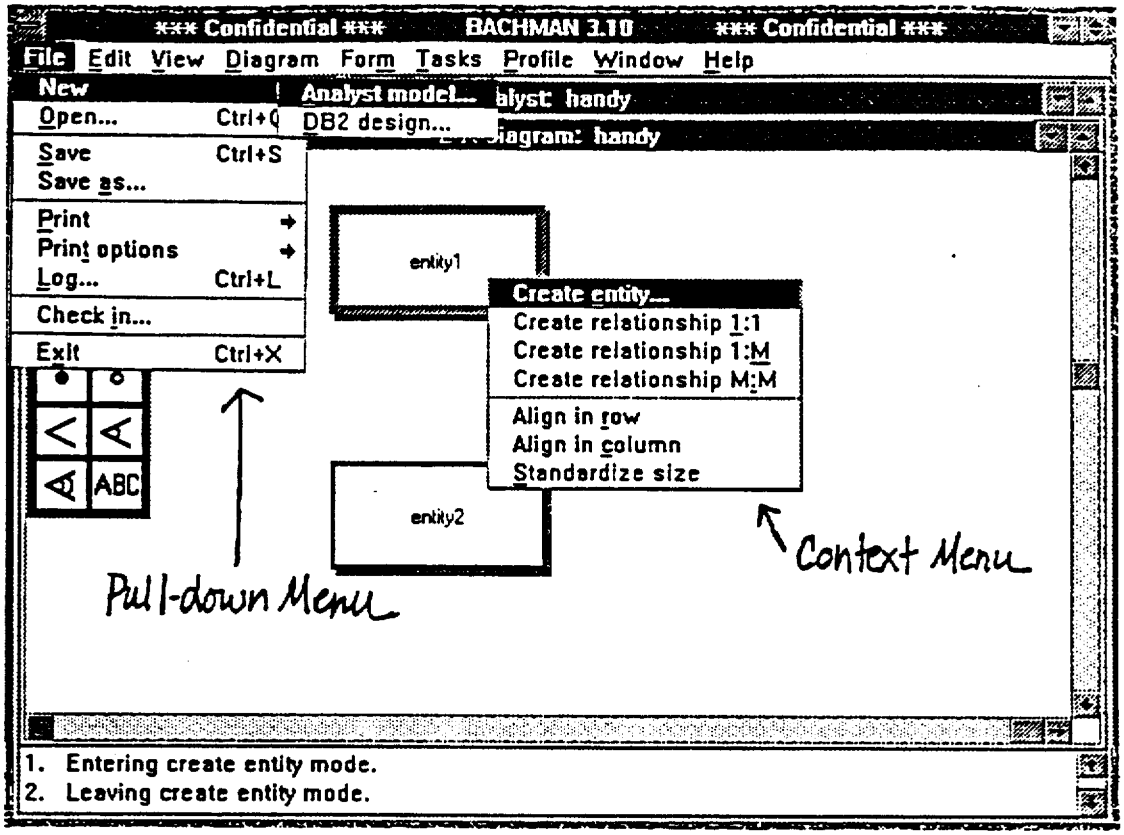
Figures 3, 4, 5, 6, 7, 8, 9:
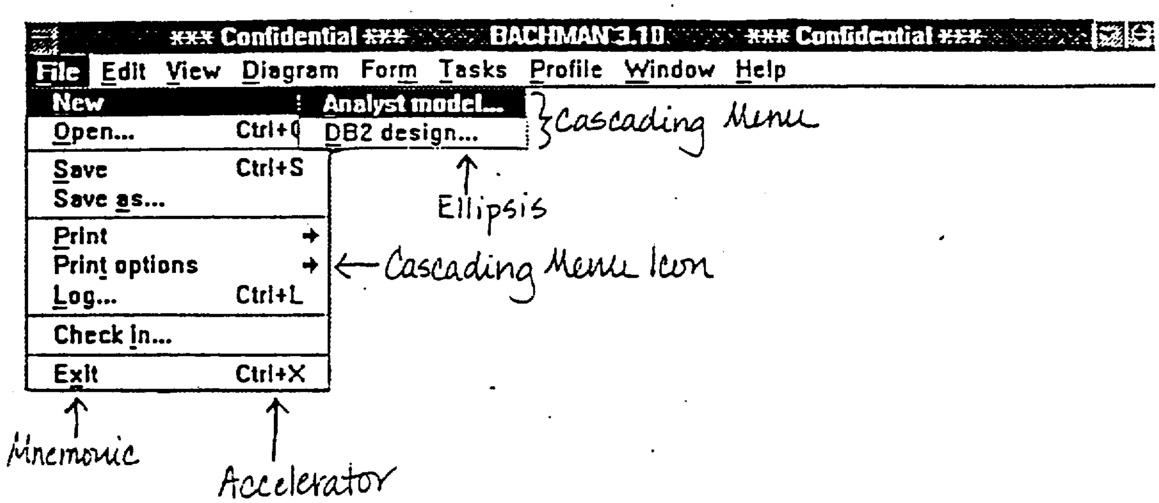
Figures 3, 4, 5, 6, 7, 8, 9, 10:
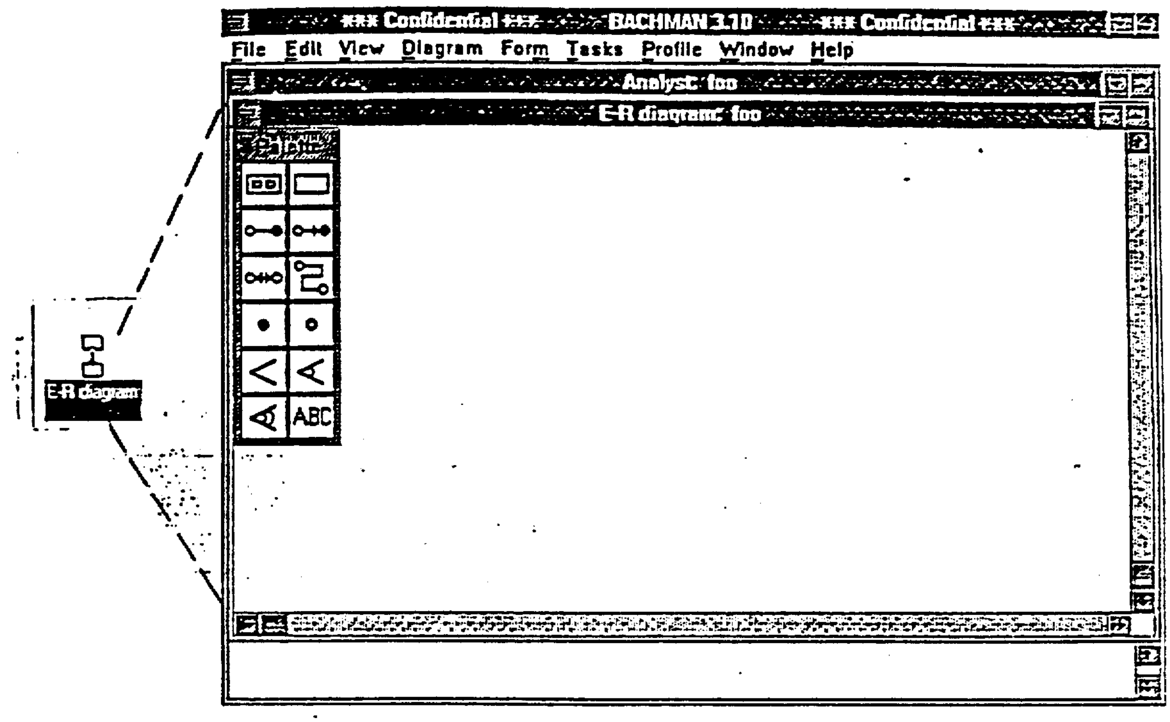
Figures 3, 4, 5, 6, 7, 8, 9, 10, 11:
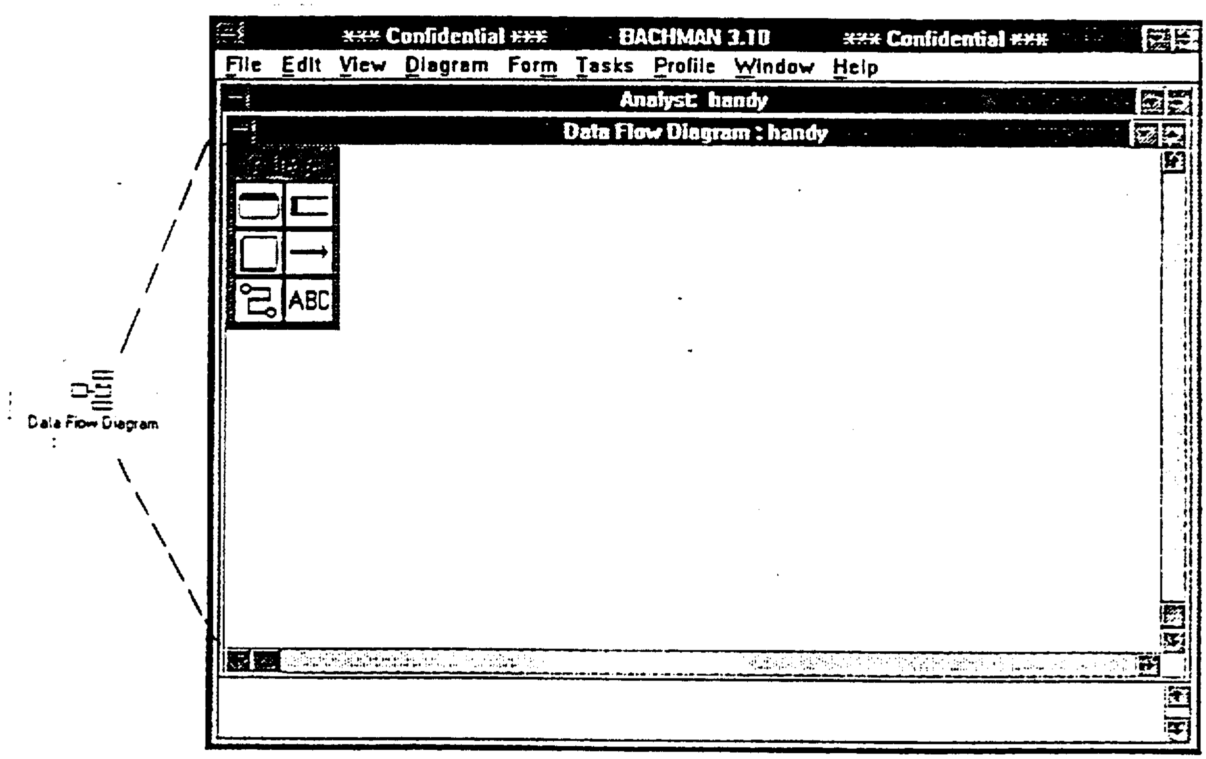
Figures 3, 4, 5, 6, 7, 8, 9, 10, 11, 12:
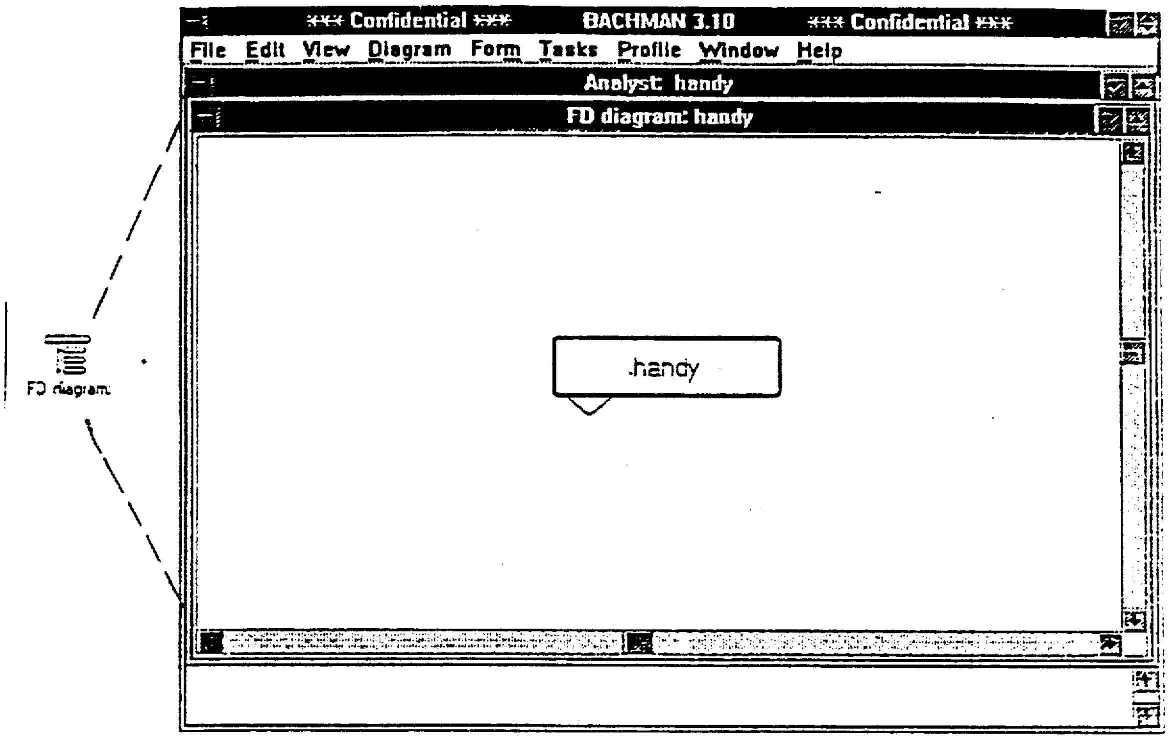
Figures 3, 4, 5, 6, 7, 8, 9, 10, 11, 12, 13:
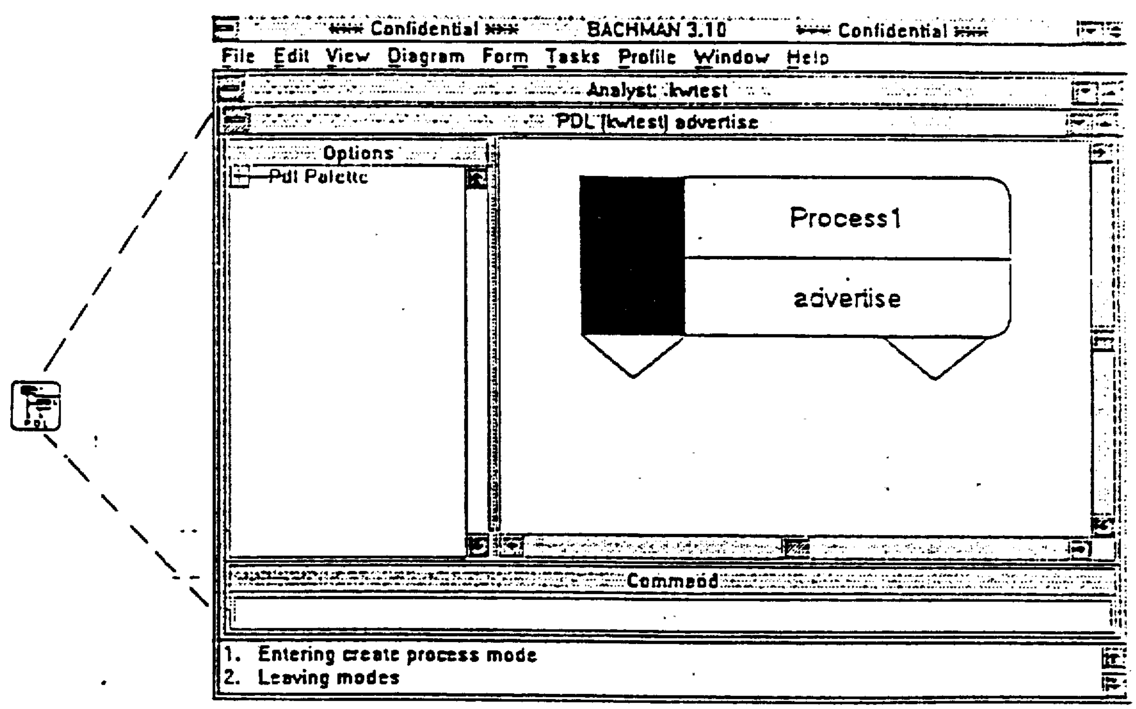
Figures 3, 4, 5, 6, 7, 8, 9, 10, 11, 12, 13, 14:
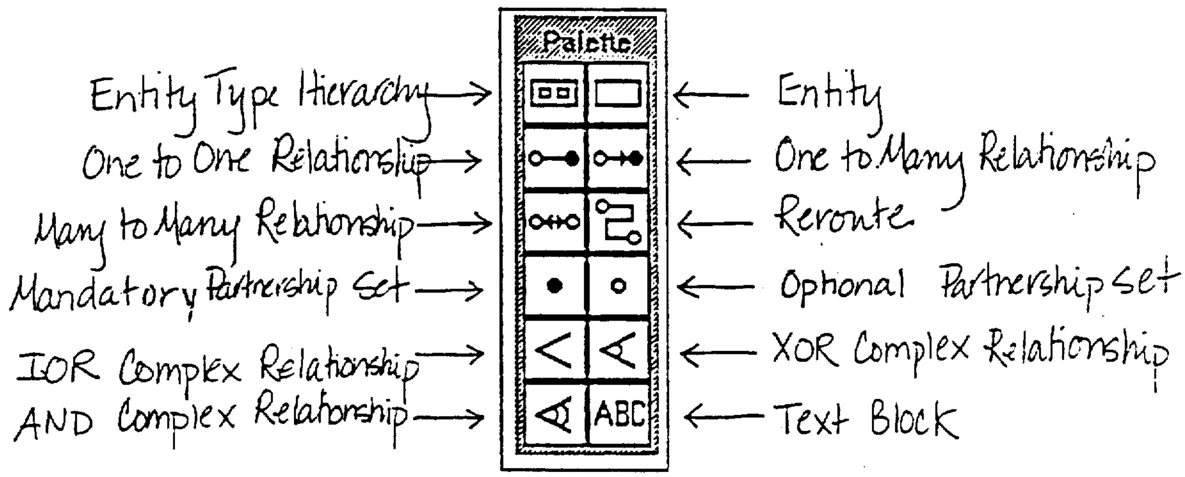
Figures 3, 4, 5, 6, 7, 8, 9, 10, 11, 12, 13, 14, 15:
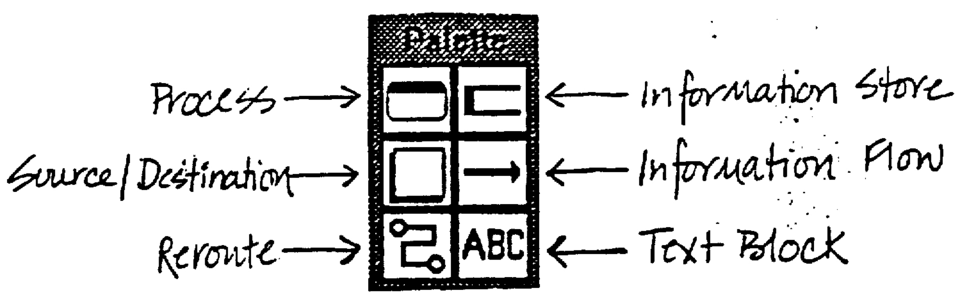
Figures 3, 4, 5, 6, 7, 8, 9, 10, 11, 12, 13, 14, 15, 16:
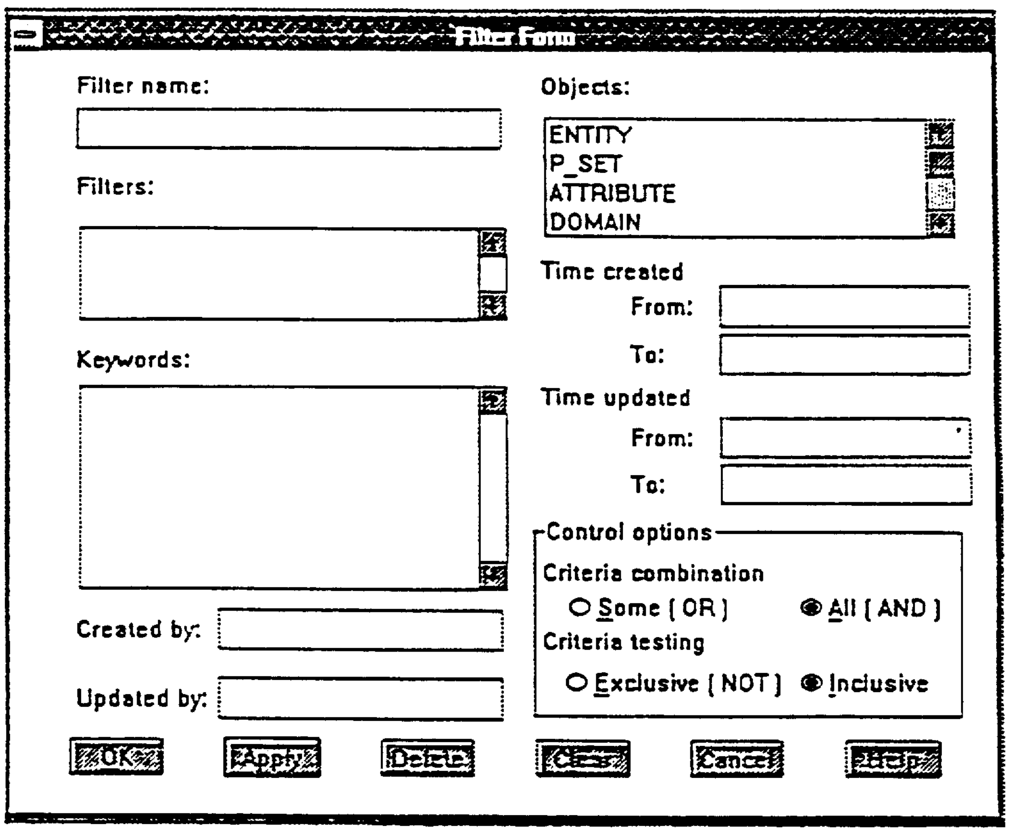
Figures 3, 4, 5, 6, 7, 8, 9, 10, 11, 12, 13, 14, 15, 16, 17:
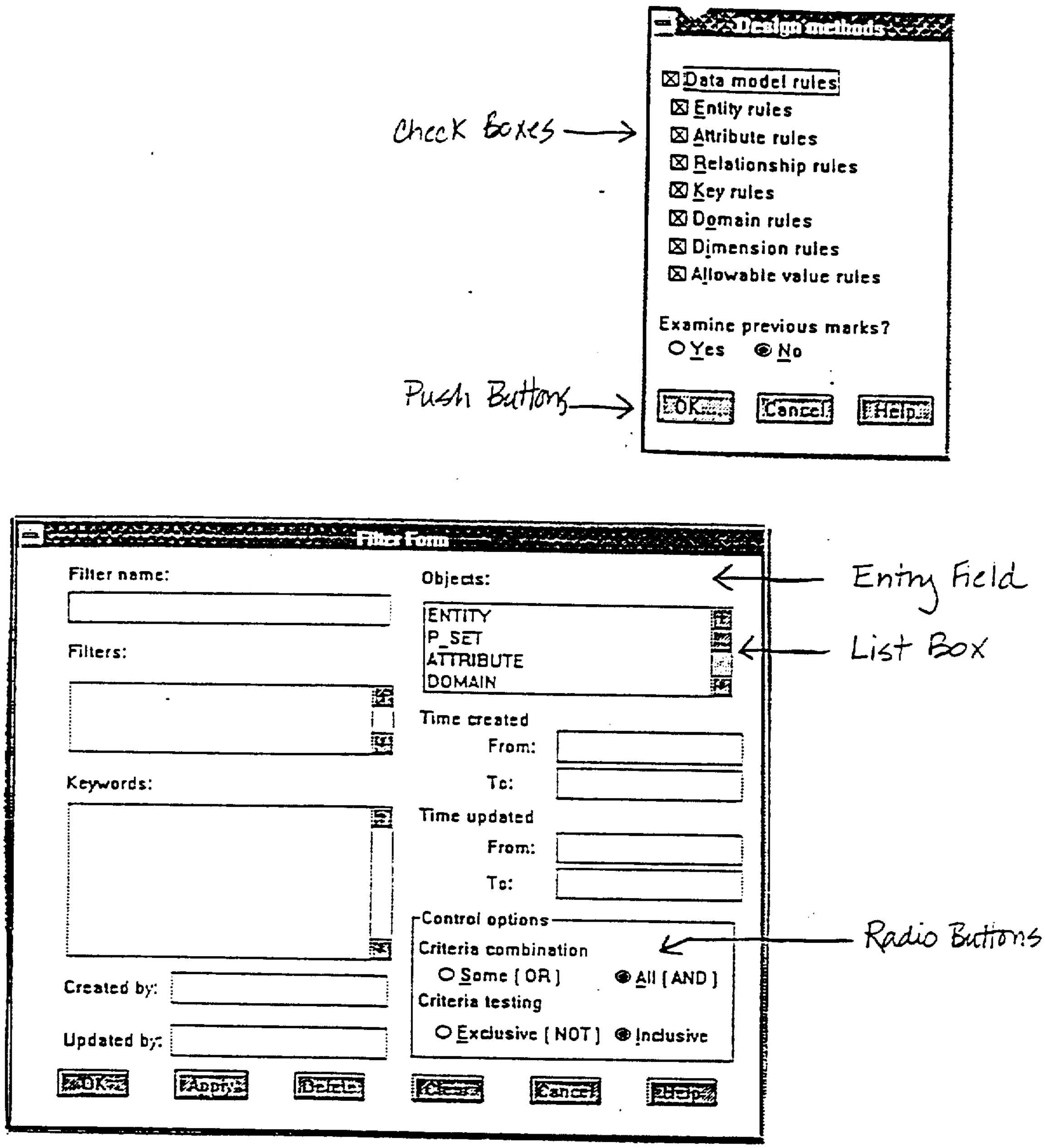
Figures 1, 4:
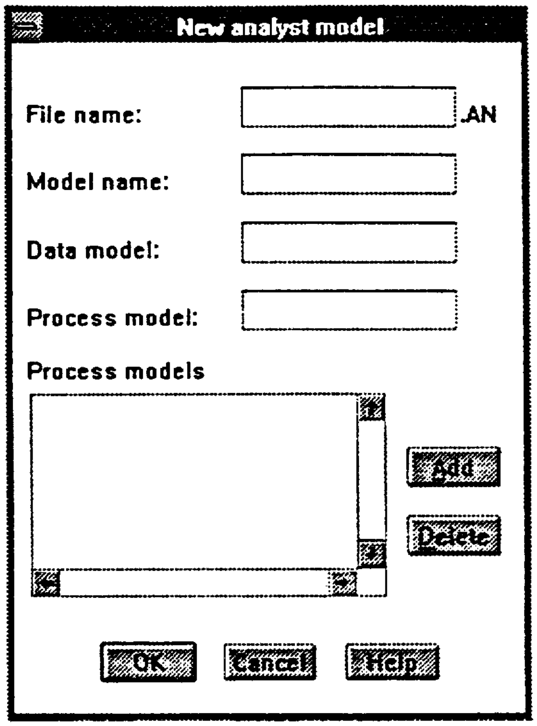
Figures 2, 4:
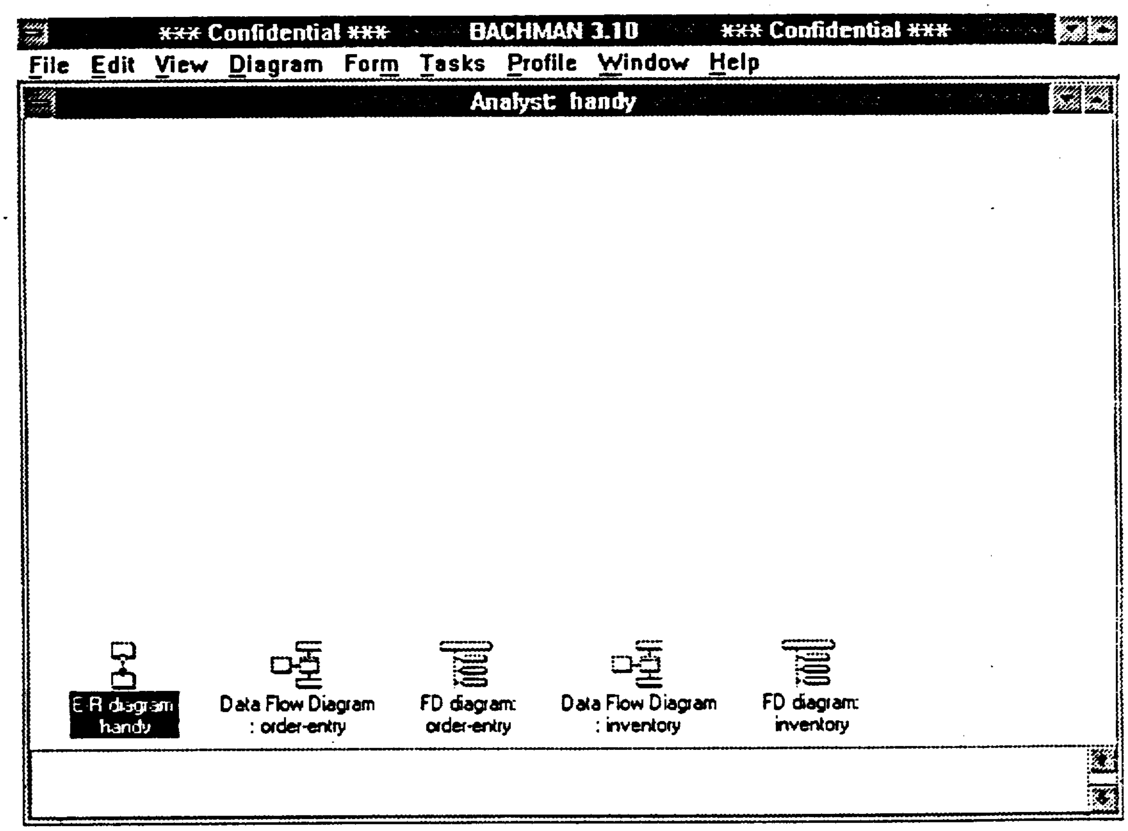
Figures 3, 4:
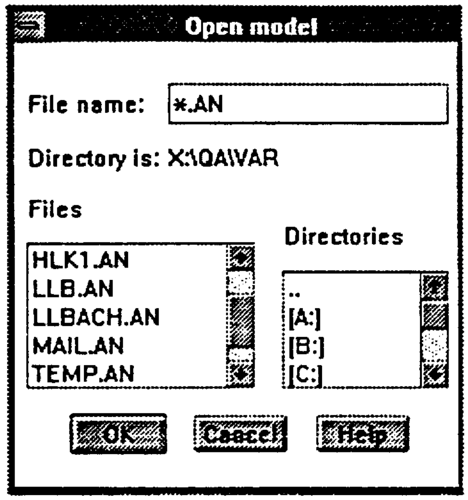
Figure 4:
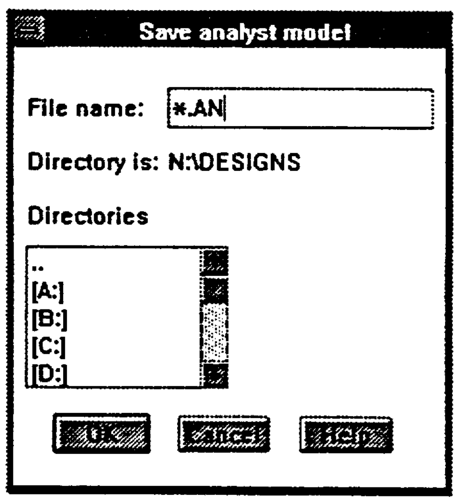
Figures 4, 5:
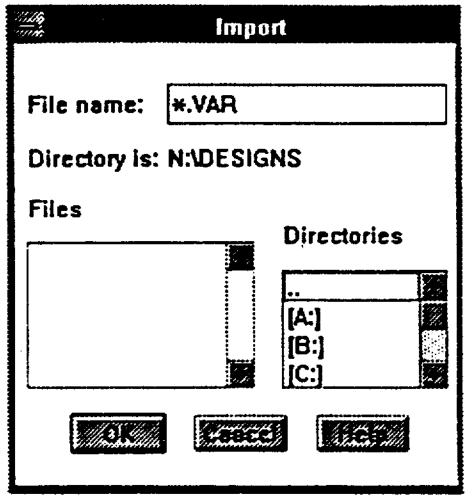
Figures 4, 5, 6:
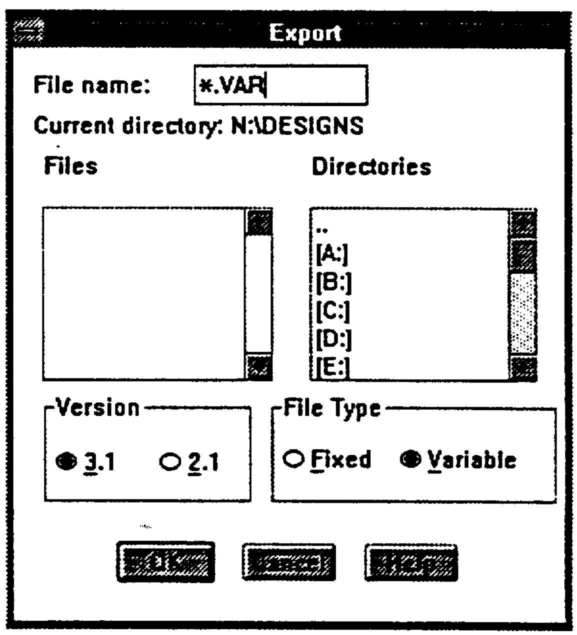
Figures 4, 5, 6, 7, 8:
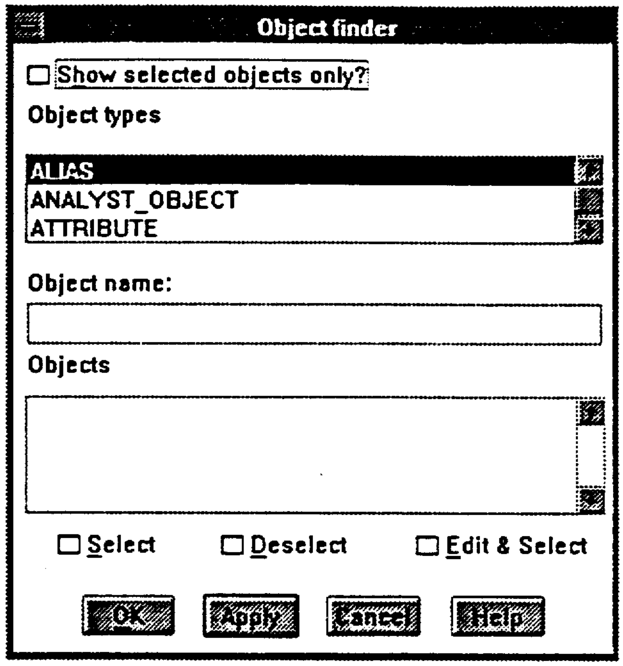
Figures 4, 5, 6, 7, 8, 9:
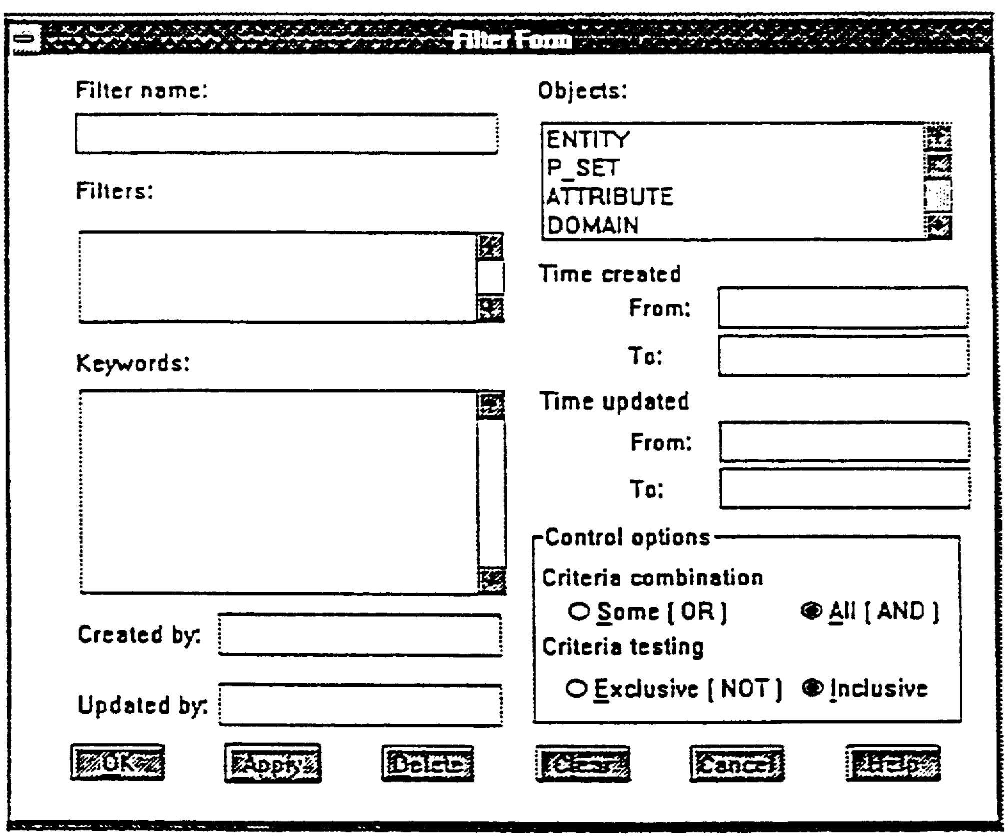
Figures 4, 5, 6, 7, 8, 9, 10, 11, 12:
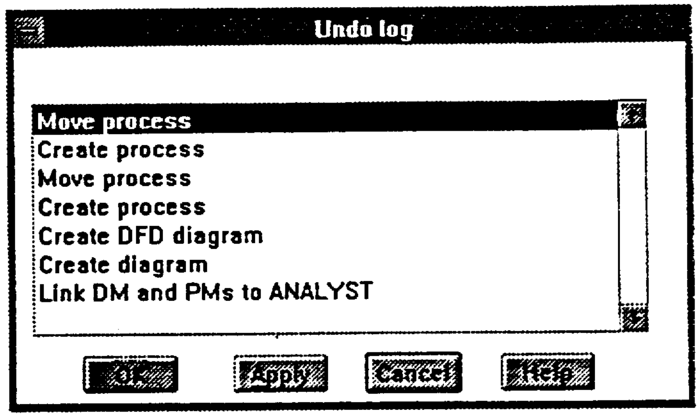
Figures 1, 4, 5, 6, 7, 8, 9, 10, 11, 12, 13, 14, 15, 16, 17, 18, 19, 20:
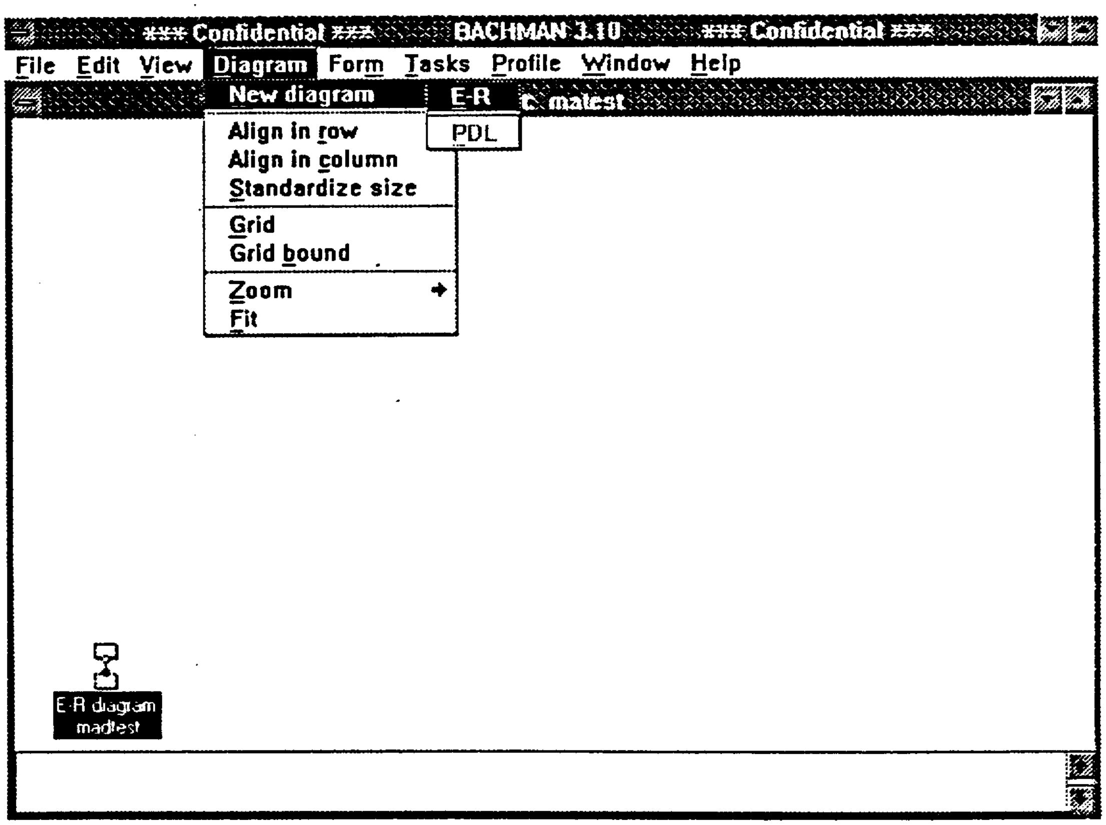
Figure 5:
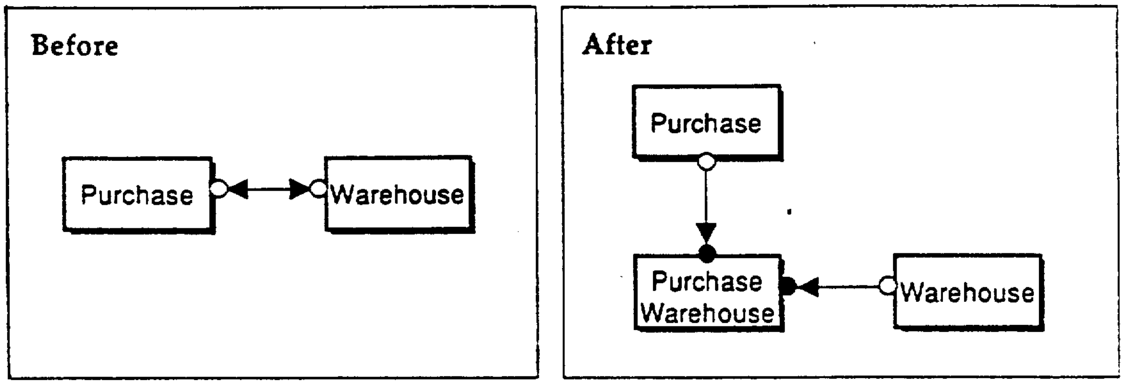
Figures 5, 6:
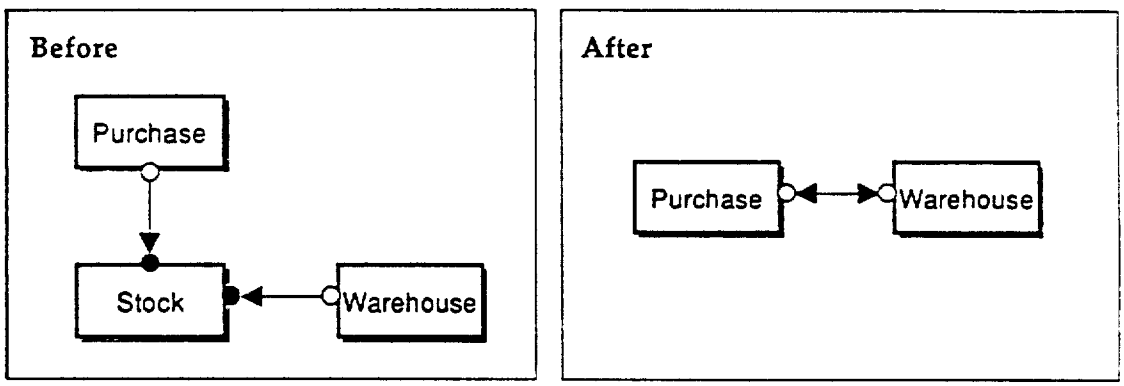
Figures 5, 6, 7:
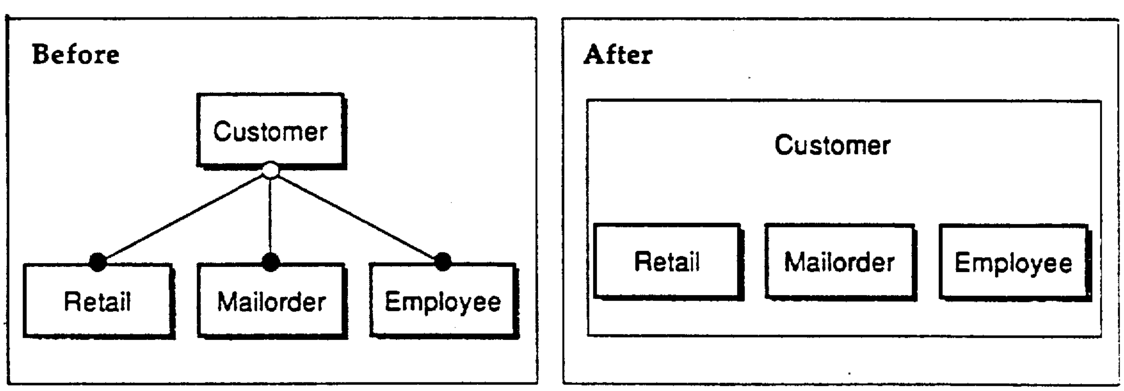
Figures 5, 6, 7, 8:
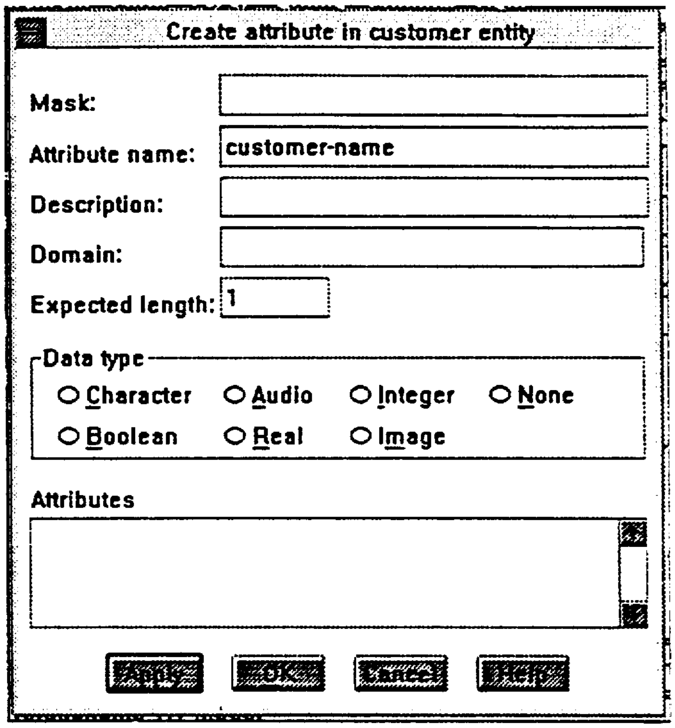
Figures 5, 6, 7, 8, 9:
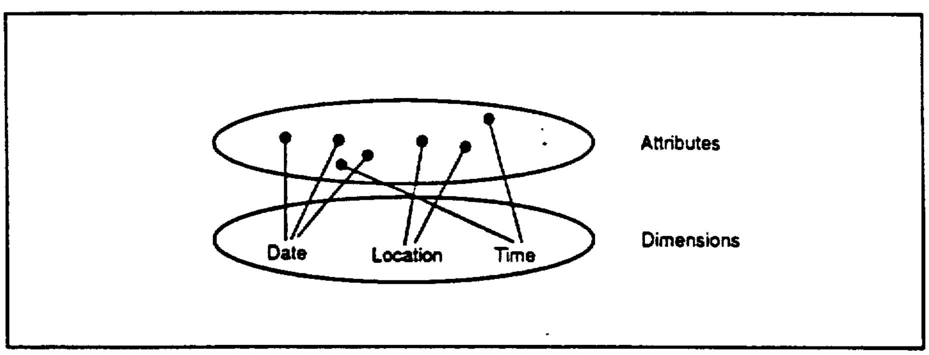
Figures 5, 6, 7, 8, 9, 10:
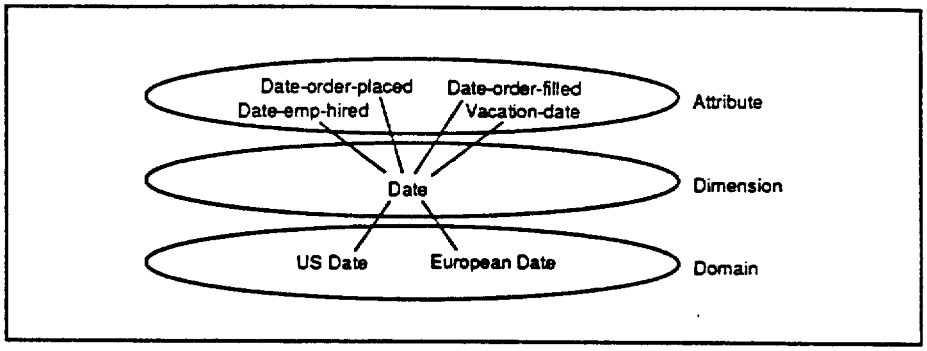
Figures 5, 6, 7, 8, 9, 10, 11:
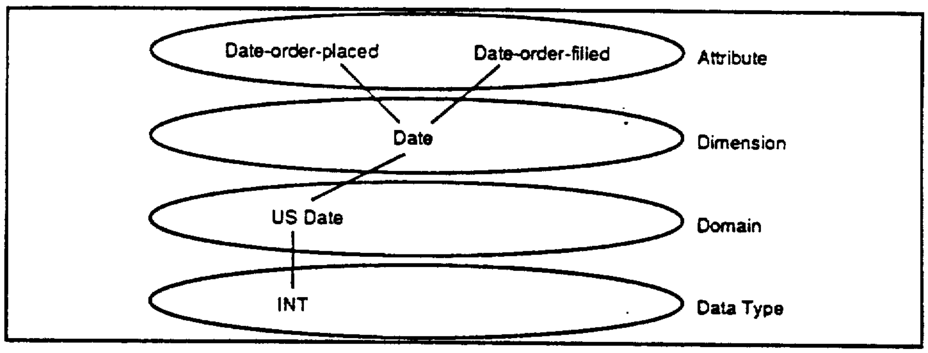
Figures 5, 6, 7, 8, 9, 10, 11, 12:
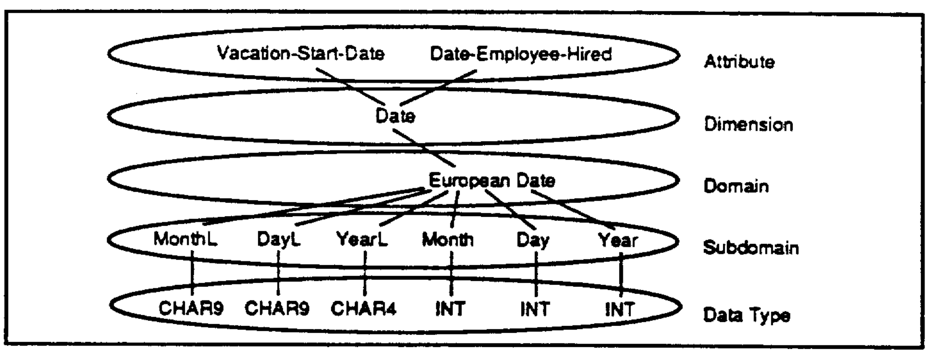
Figures 5, 6, 7, 8, 9, 10, 11, 12, 13:
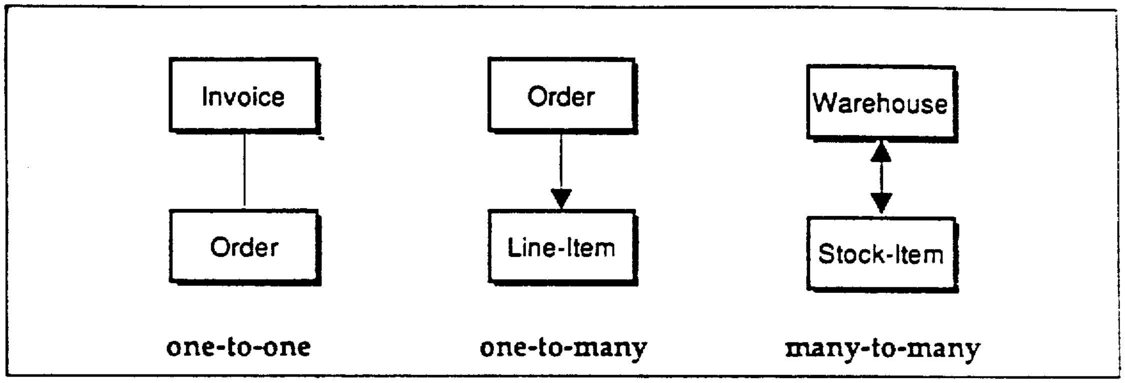
Figures 5, 6, 7, 8, 9, 10, 11, 12, 13, 14:
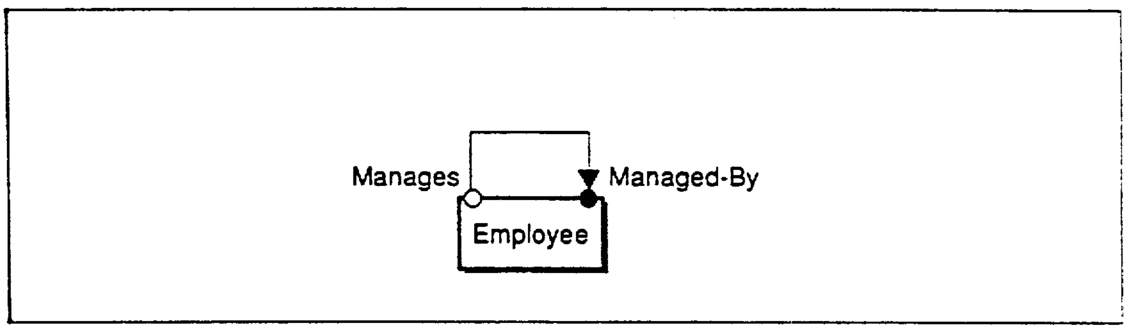
Figures 5, 6, 7, 8, 9, 10, 11, 12, 13, 14, 15:
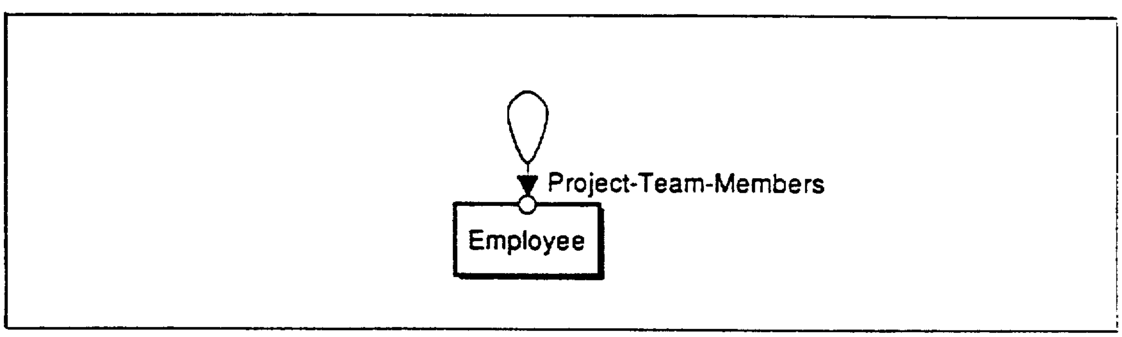
Figures 5, 6, 7, 8, 9, 10, 11, 12, 13, 14, 15, 16:
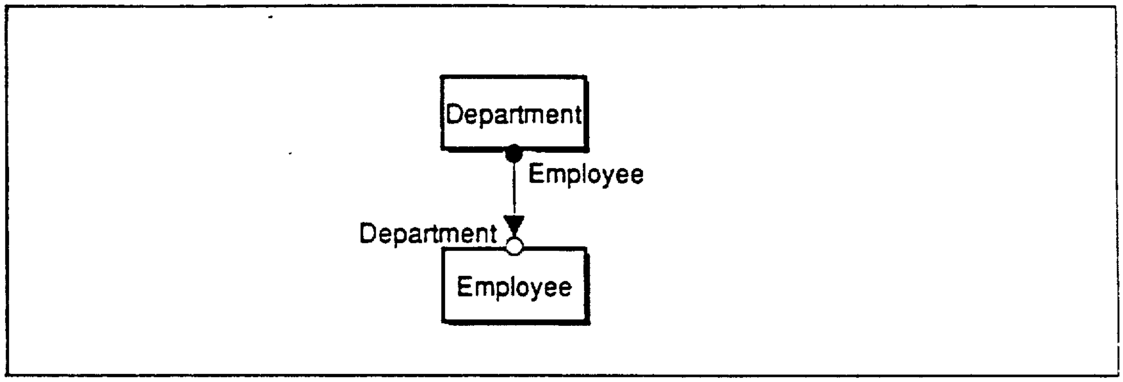
Figures 5, 6, 7, 8, 9, 10, 11, 12, 13, 14, 15, 16, 17:
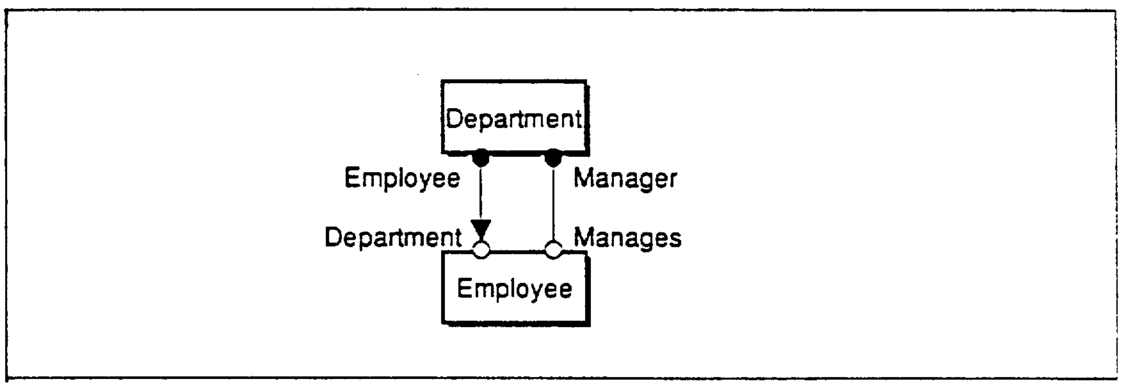
Figures 5, 6, 7, 8, 9, 10, 11, 12, 13, 14, 15, 16, 17, 18:
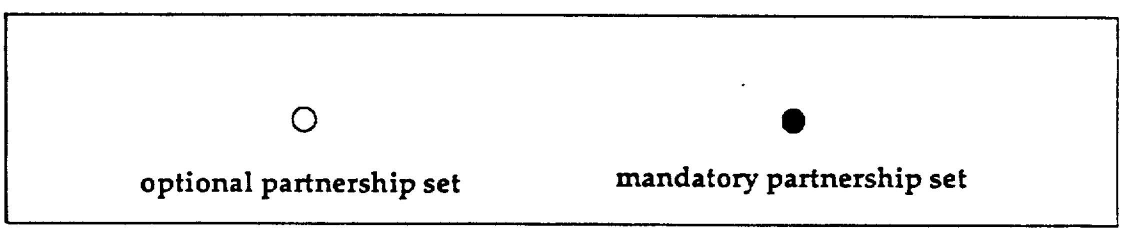
Figures 5, 6, 7, 8, 9, 10, 11, 12, 13, 14, 15, 16, 17, 18, 19:
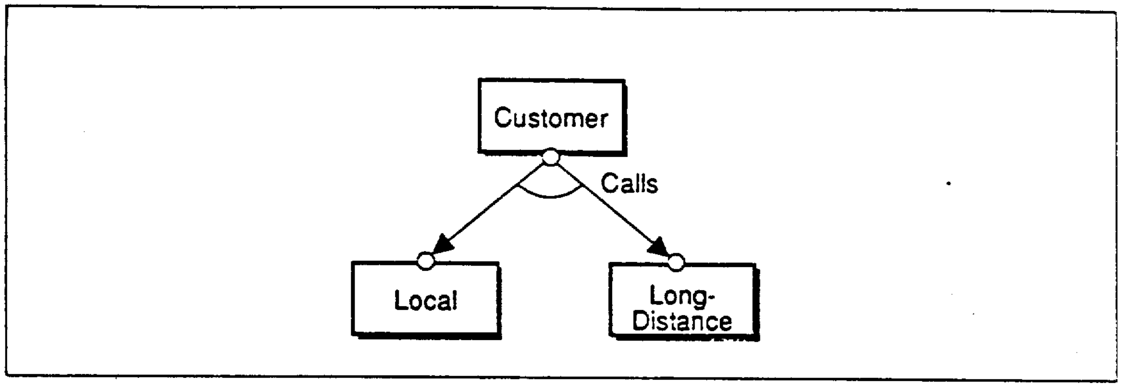
Figures 5, 6, 7, 8, 9, 10, 11, 12, 13, 14, 15, 16, 17, 18, 19, 20:
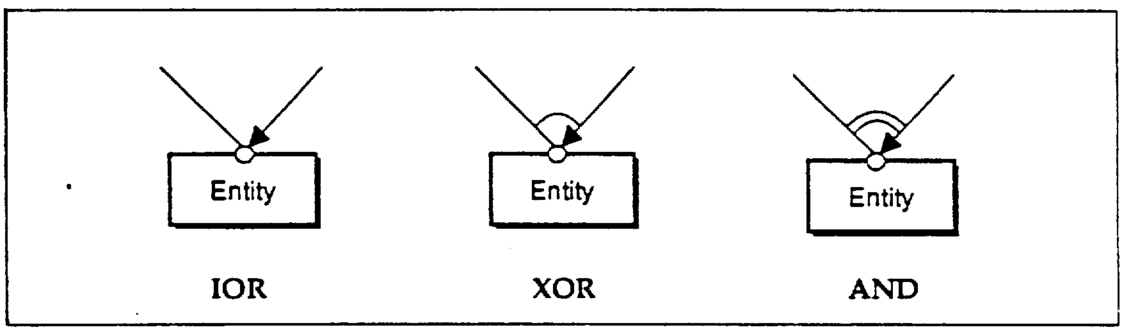
Figures 5, 6, 7, 8, 9, 10, 11, 12, 13, 14, 15, 16, 17, 18, 19, 20, 21:
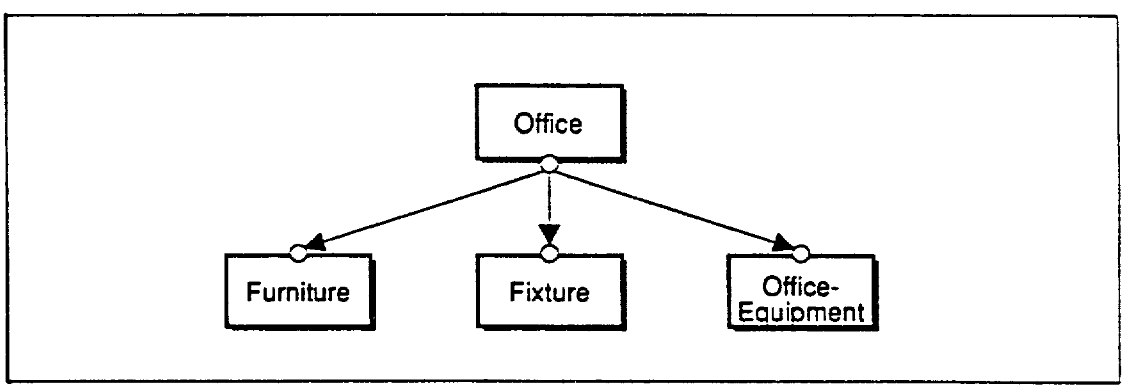
Figures 5, 6, 7, 8, 9, 10, 11, 12, 13, 14, 15, 16, 17, 18, 19, 20, 21, 22:
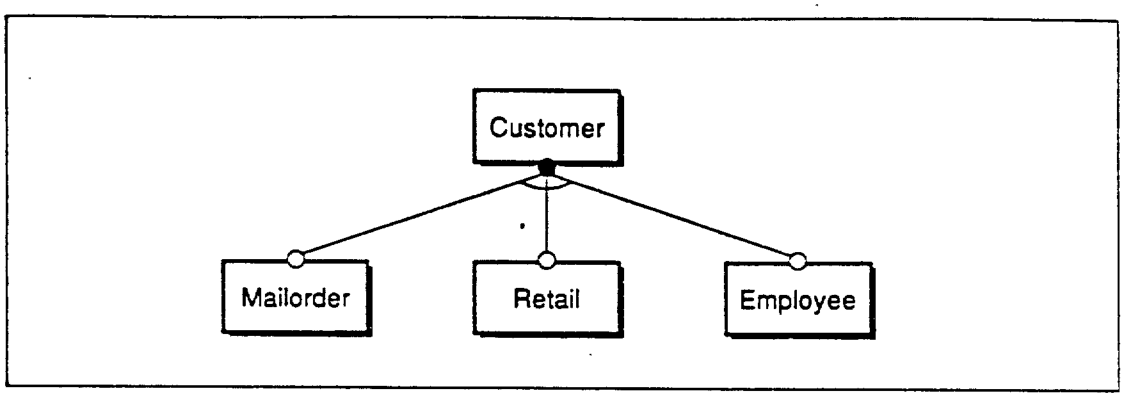
Figures 5, 6, 7, 8, 9, 10, 11, 12, 13, 14, 15, 16, 17, 18, 19, 20, 21, 22, 23:
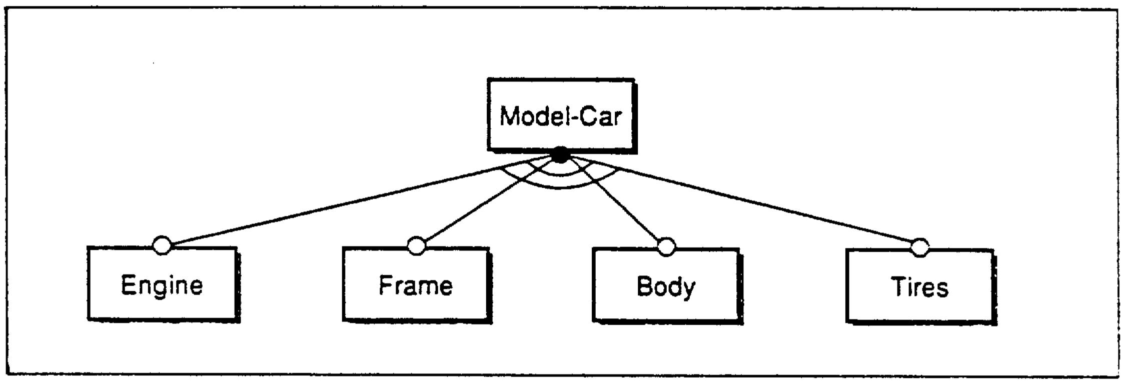
Figures 5, 6, 7, 8, 9, 10, 11, 12, 13, 14, 15, 16, 17, 18, 19, 20, 21, 22, 23, 24:
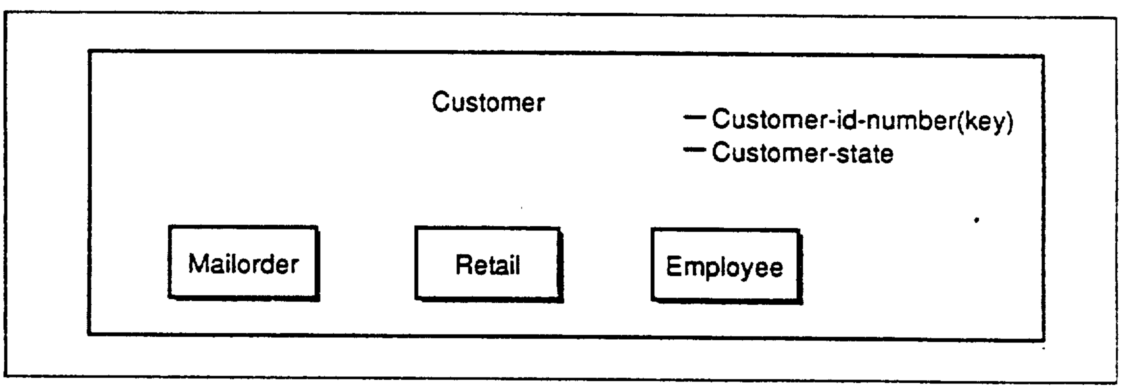
Figures 5, 6, 7, 8, 9, 10, 11, 12, 13, 14, 15, 16, 17, 18, 19, 20, 21, 22, 23, 24, 25:
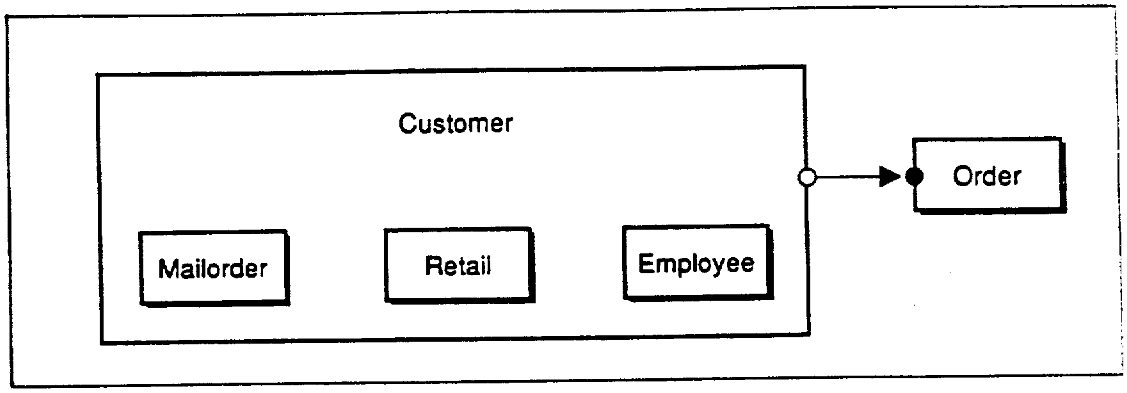
Figures 5, 6, 7, 8, 9, 10, 11, 12, 13, 14, 15, 16, 17, 18, 19, 20, 21, 22, 23, 24, 25, 26:
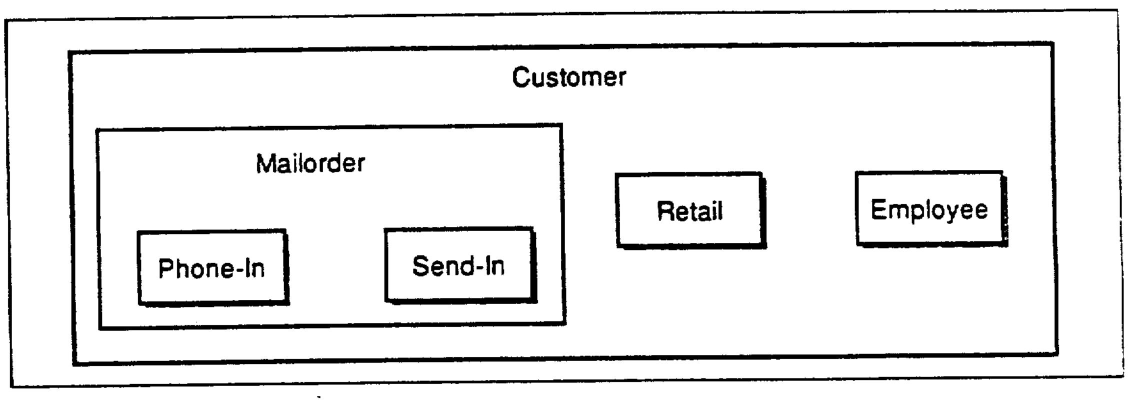
Figures 5, 6, 7, 8, 9, 10, 11, 12, 13, 14, 15, 16, 17, 18, 19, 20, 21, 22, 23, 24, 25, 26, 27:
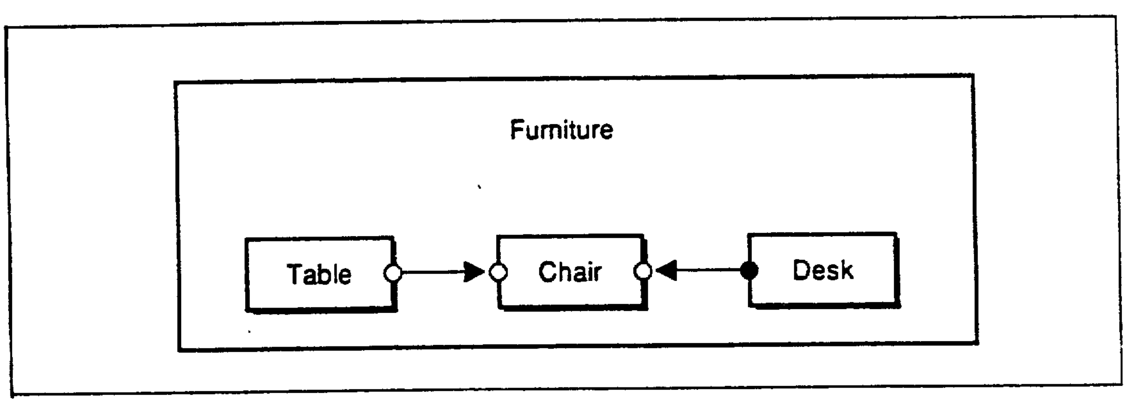
Figures 5, 6, 7, 8, 9, 10, 11, 12, 13, 14, 15, 16, 17, 18, 19, 20, 21, 22, 23, 24, 25, 26, 27, 28:
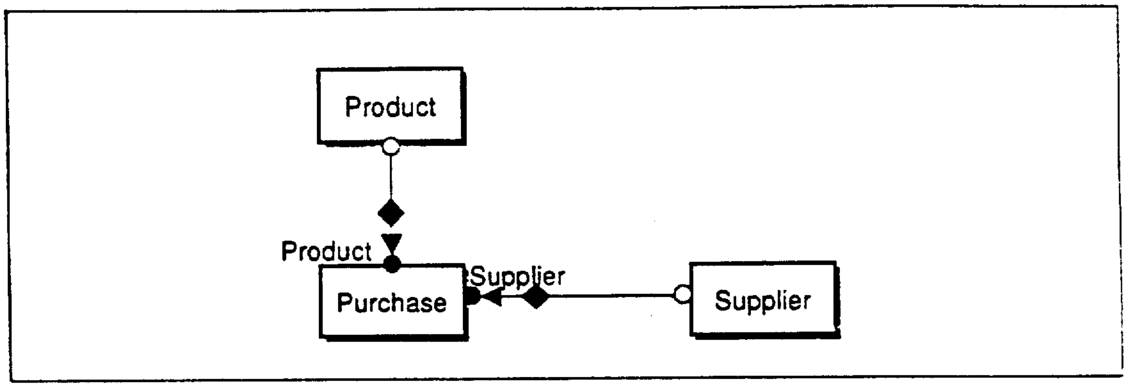
Figures 5, 6, 7, 8, 9, 10, 11, 12, 13, 14, 15, 16, 17, 18, 19, 20, 21, 22, 23, 24, 25, 26, 27, 28, 29:
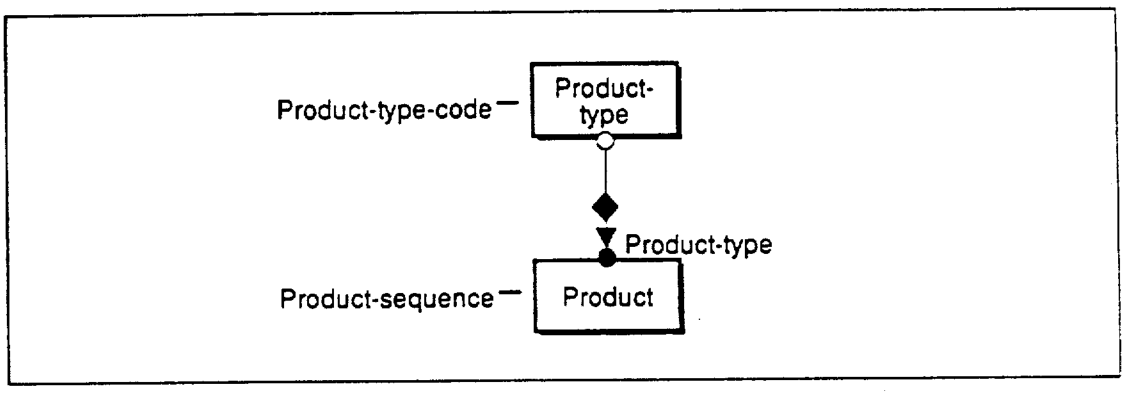
Figures 5, 6, 7, 8, 9, 10, 11, 12, 13, 14, 15, 16, 17, 18, 19, 20, 21, 22, 23, 24, 25, 26, 27, 28, 29, 30:
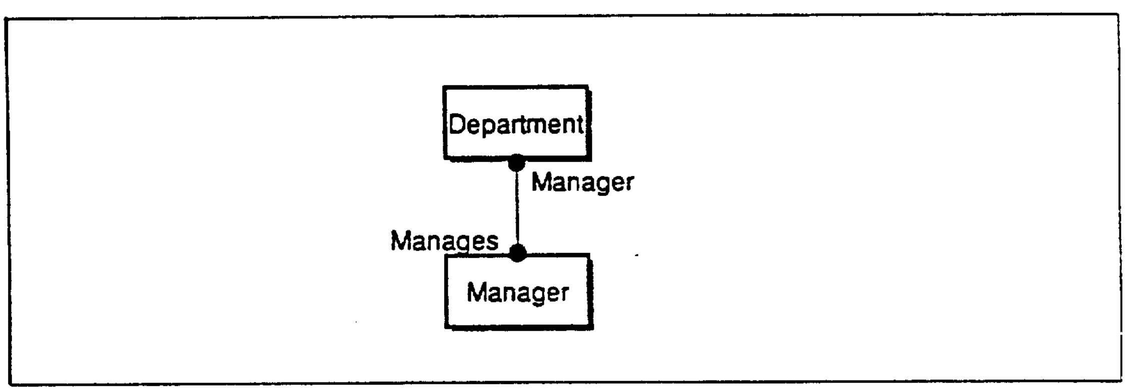
Figures 5, 6, 7, 8, 9, 10, 11, 12, 13, 14, 15, 16, 17, 18, 19, 20, 21, 22, 23, 24, 25, 26, 27, 28, 29, 30, 31:
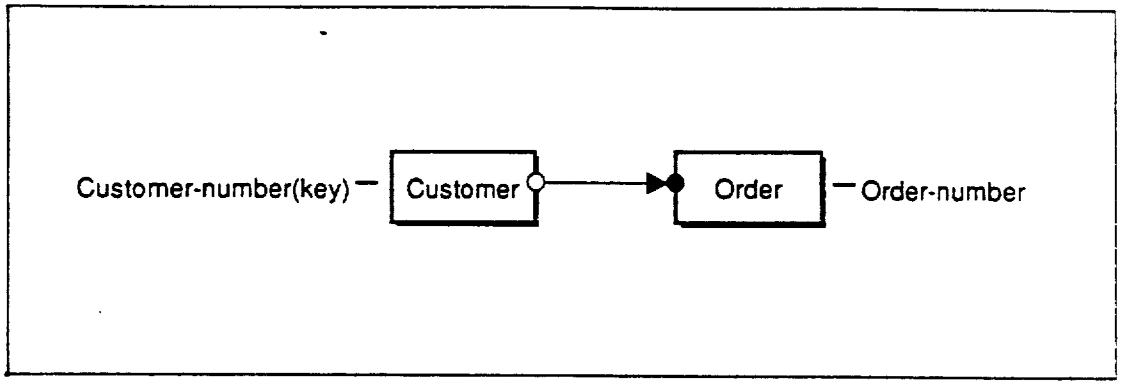
Figures 1, 7:
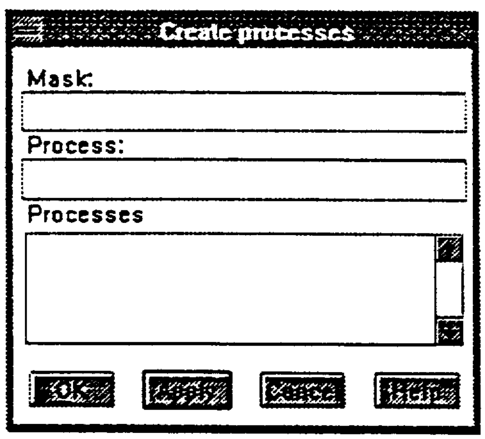
Figures 2, 7:
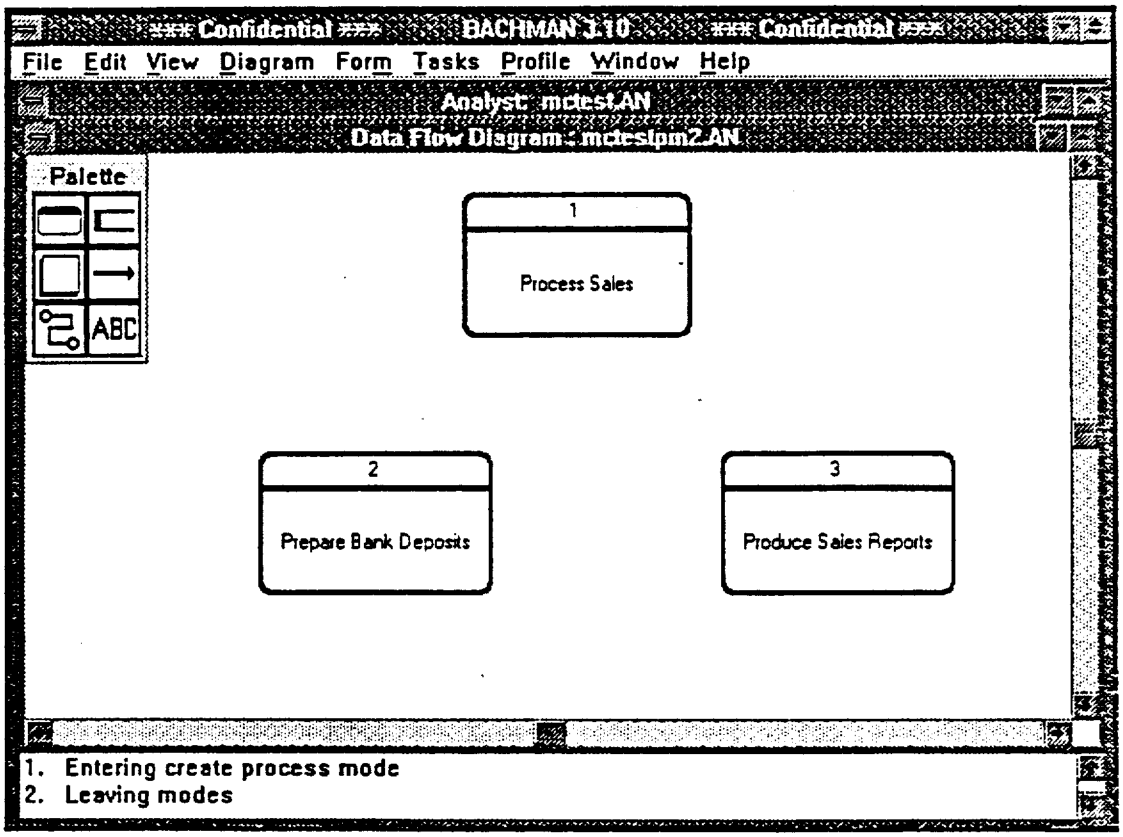
Figures 3, 7:
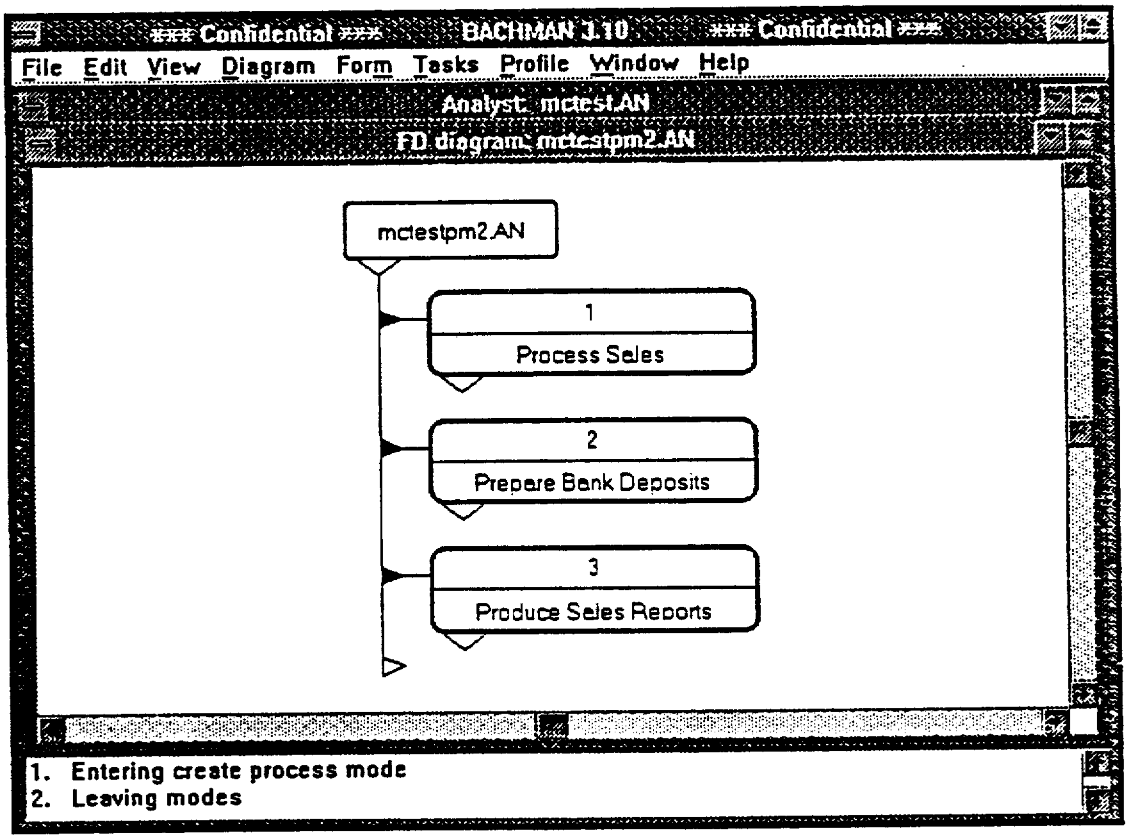
Figures 4, 7:
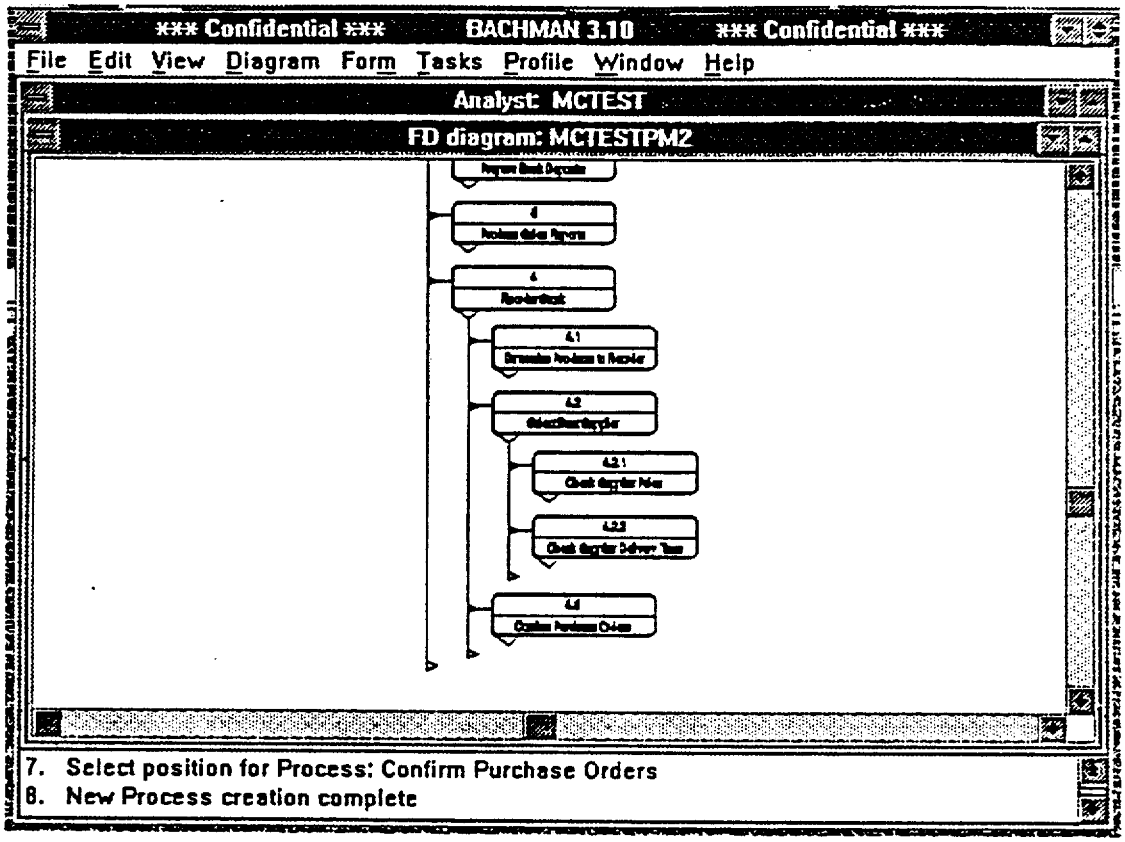
Figures 5A, 7:
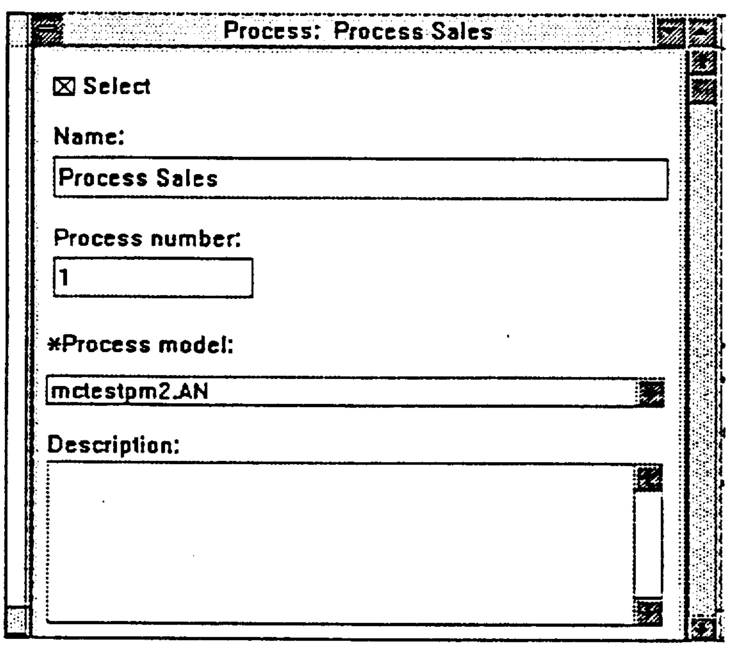
Figures 5B, 7:
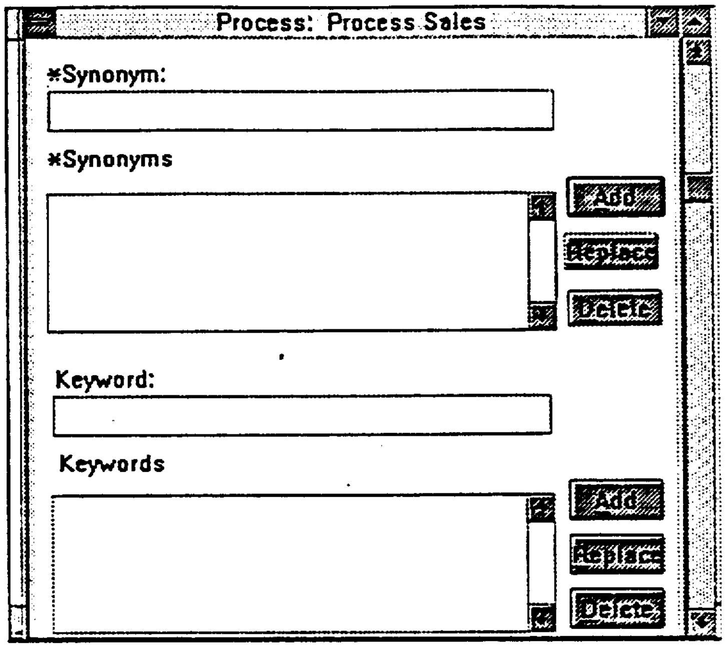
Figures 5C, 7:
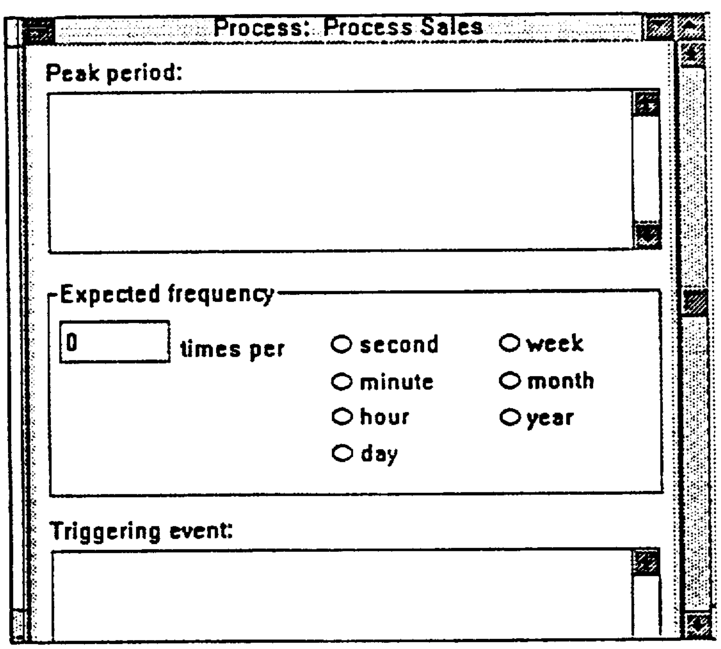
Figures 5D, 7:
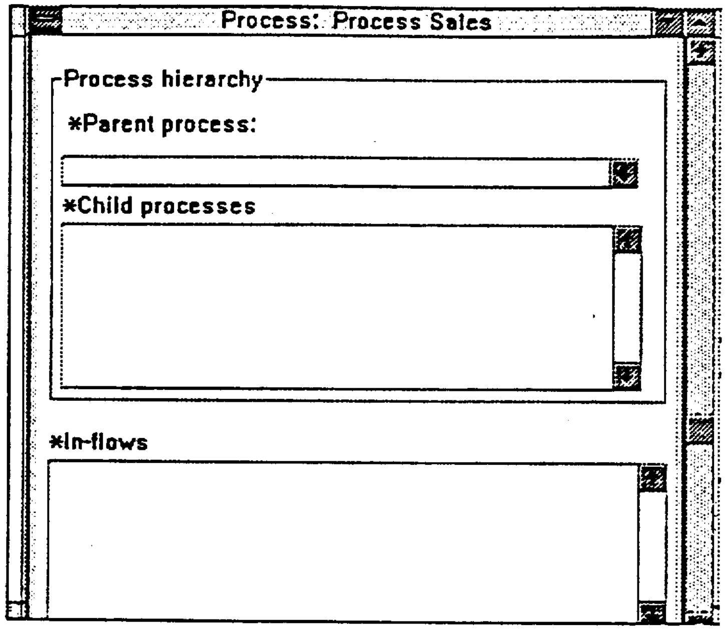
Figures 5E, 7:
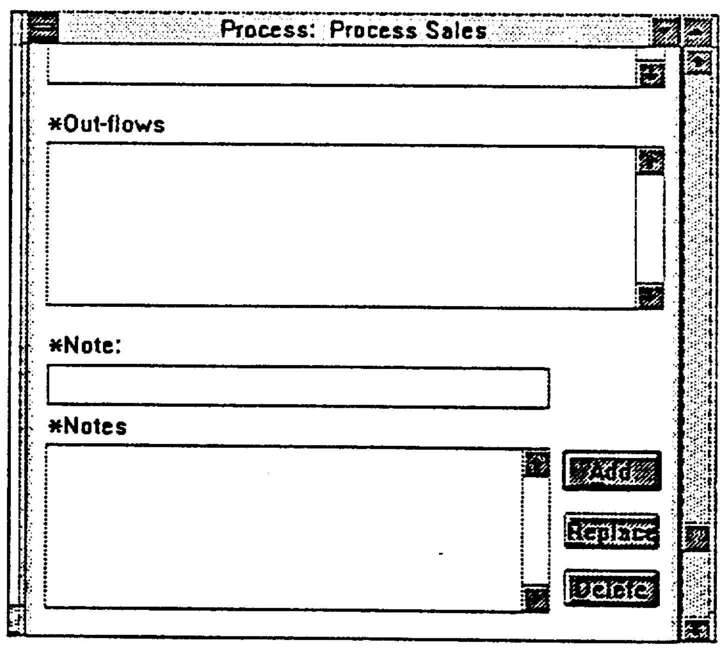
Figures 5F, 7:
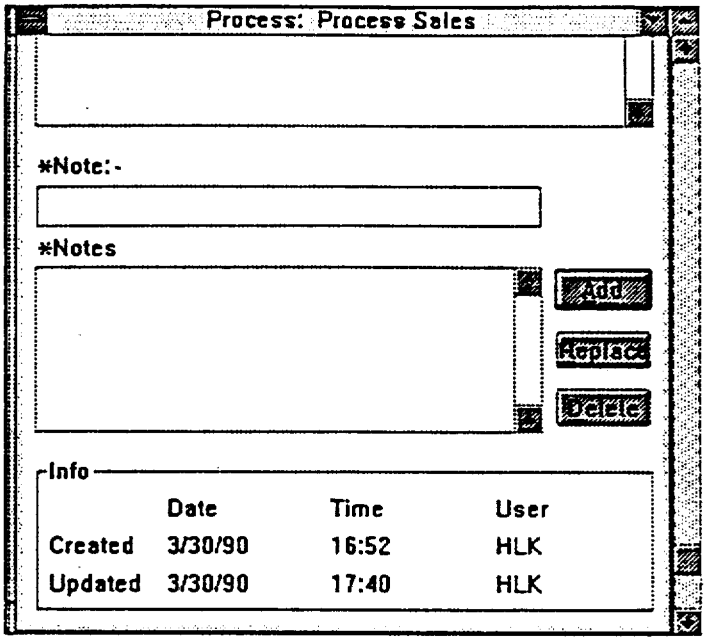
Figures 6, 7:
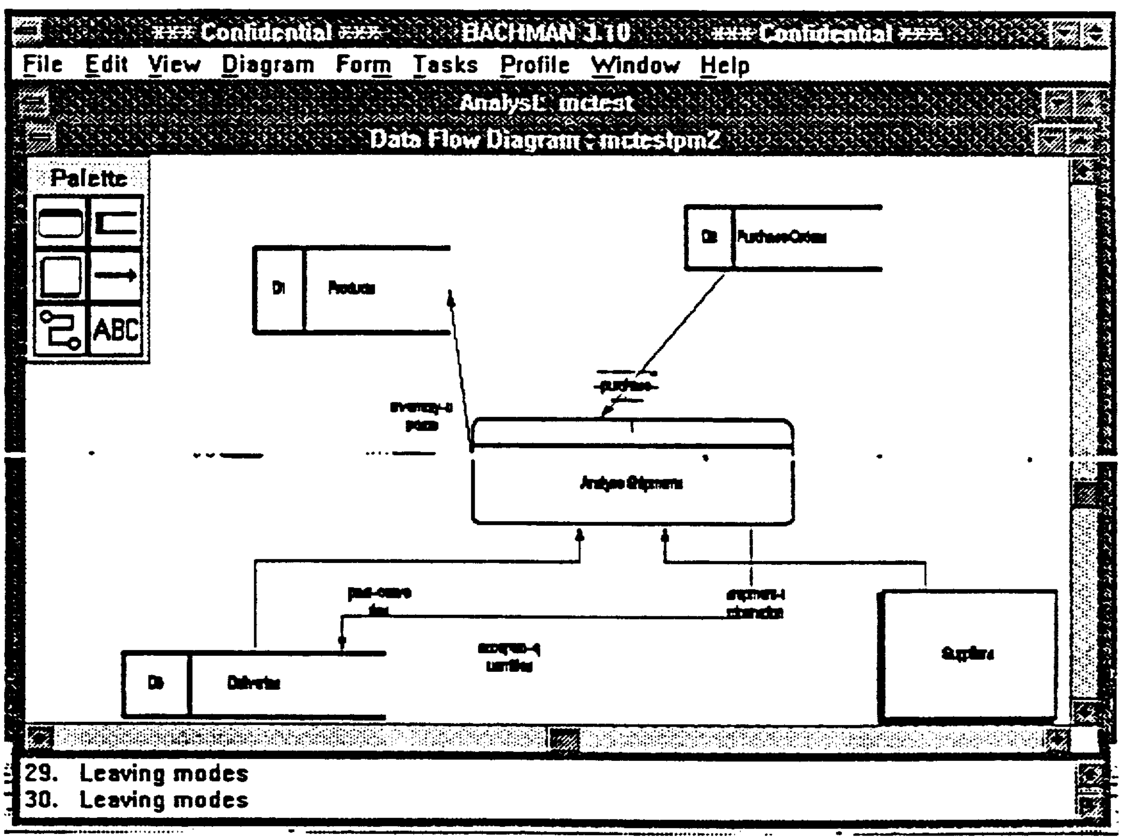
Figure 7:
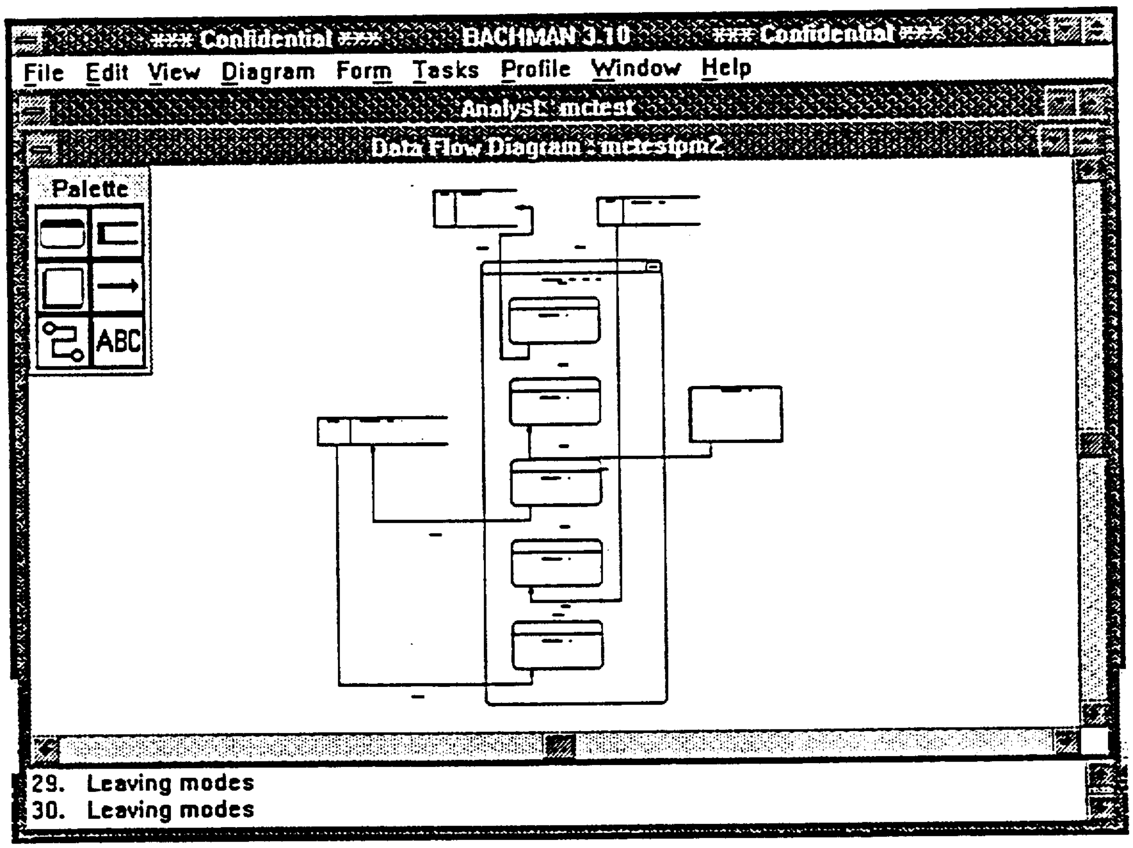
Figures 7, 8:
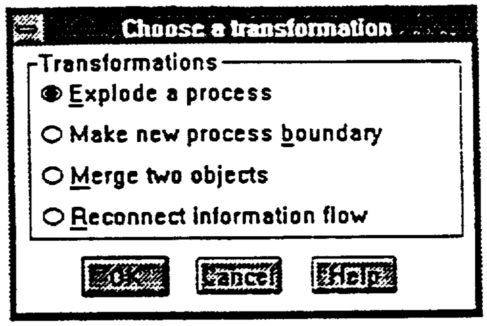
Figures 7, 8, 9, 9A:
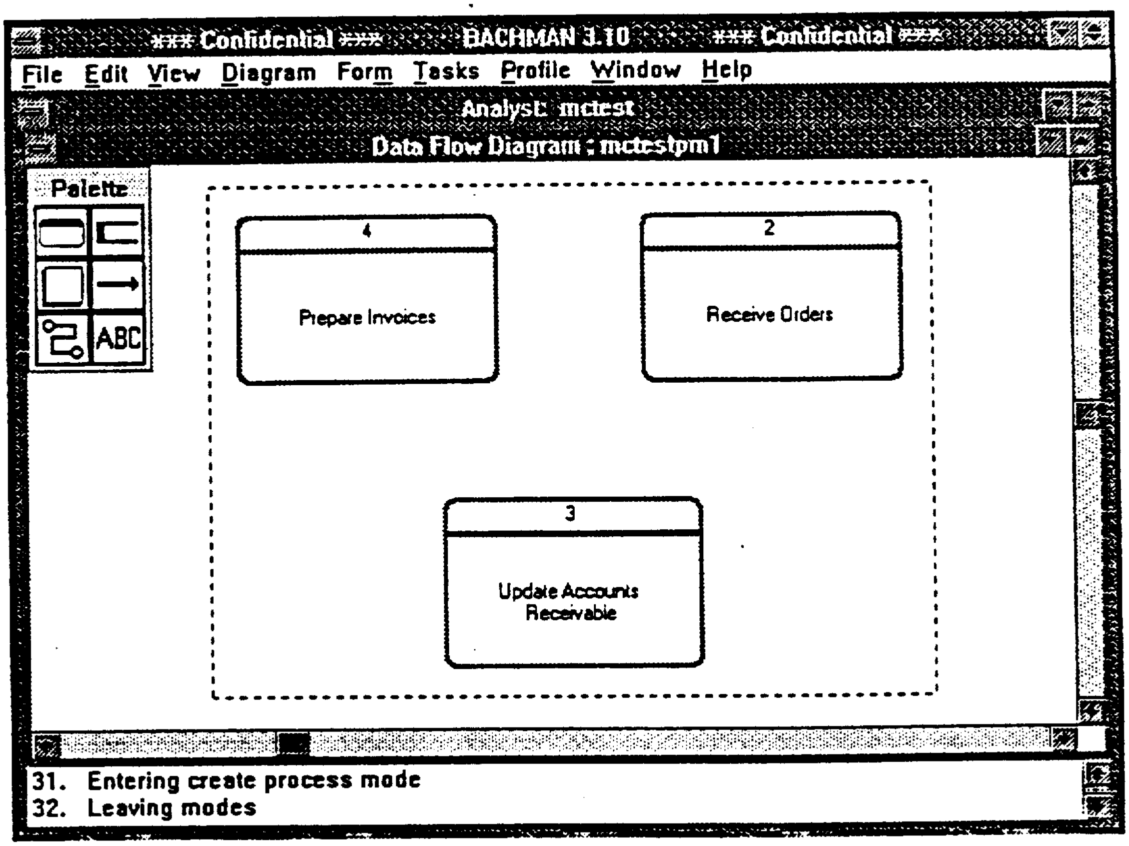
Figures 7, 8, 9, 9B:
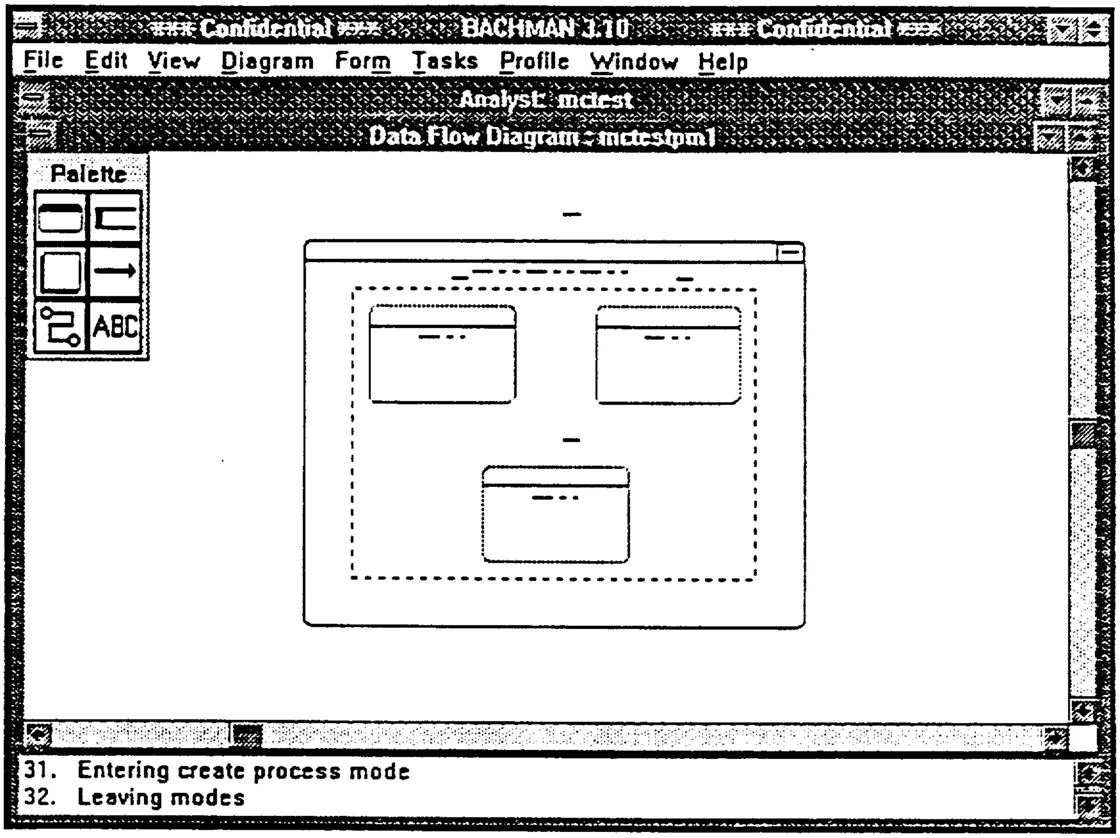
Figures 7, 8, 9, 10, 10A:
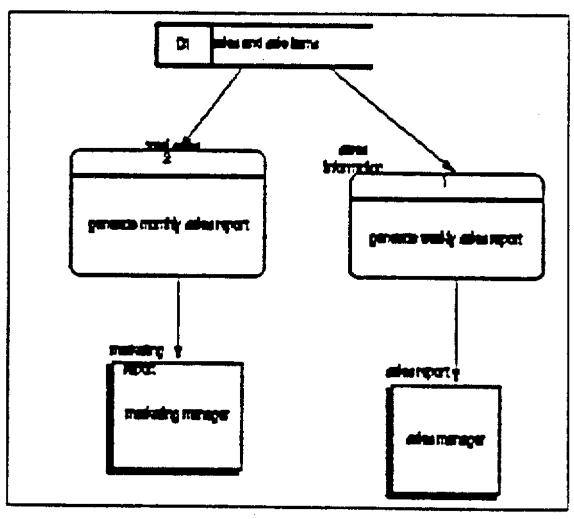
Figures 7, 8, 9, 10, 10B:
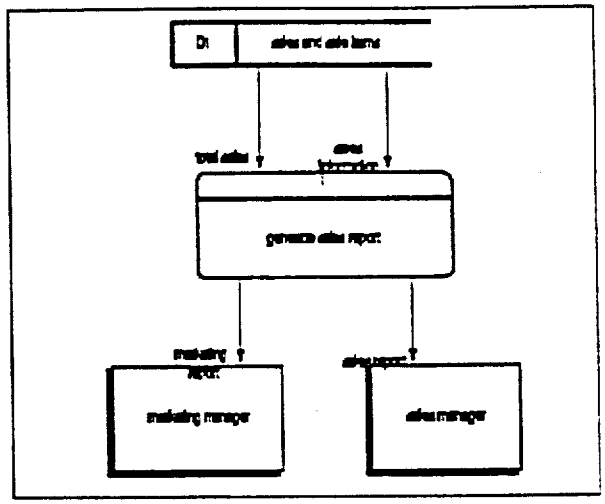
Figures 7, 8, 9, 10, 11:
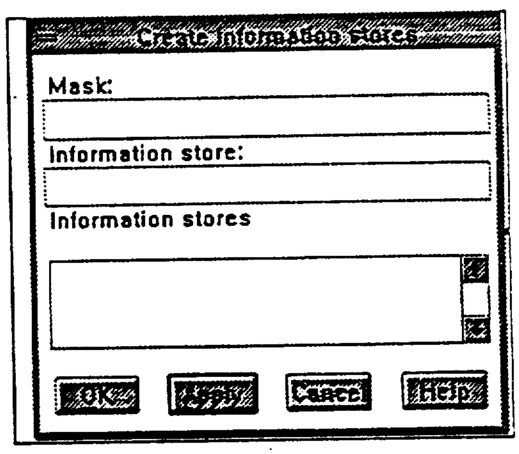
Figures 7, 8, 9, 10, 11, 12:
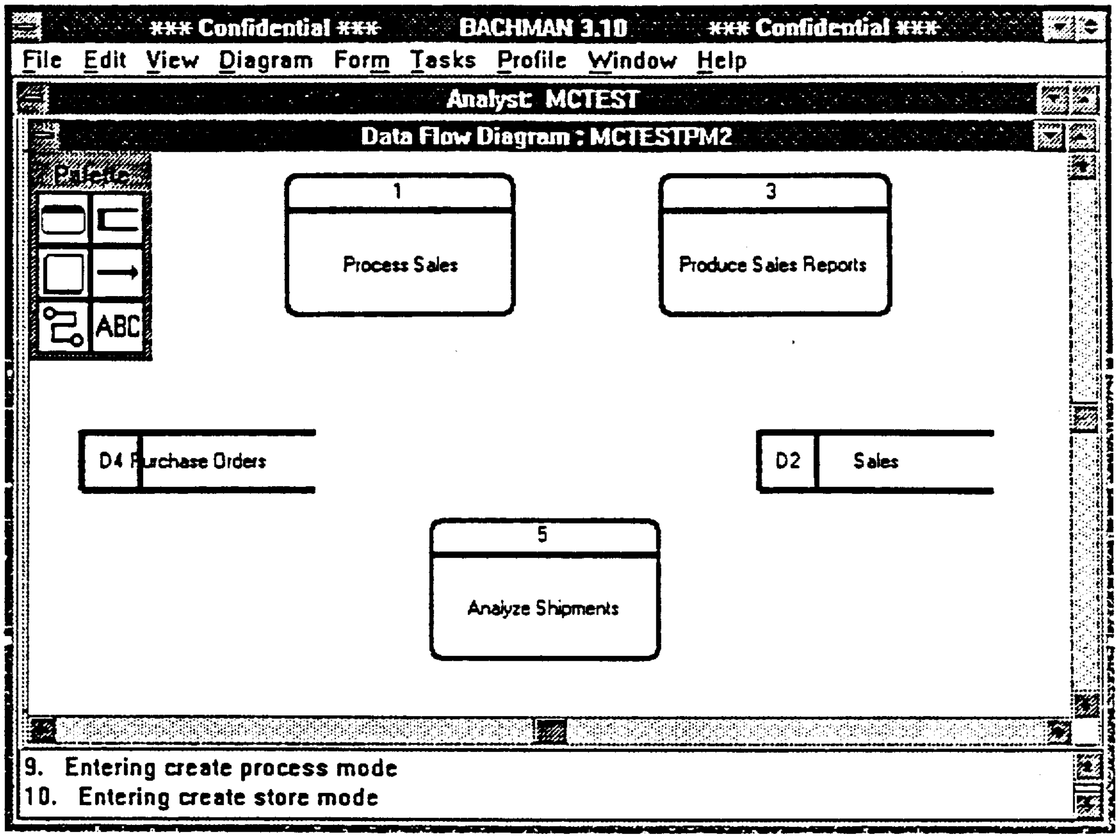
Figures 7, 8, 9, 10, 11, 12, 13, 13A:
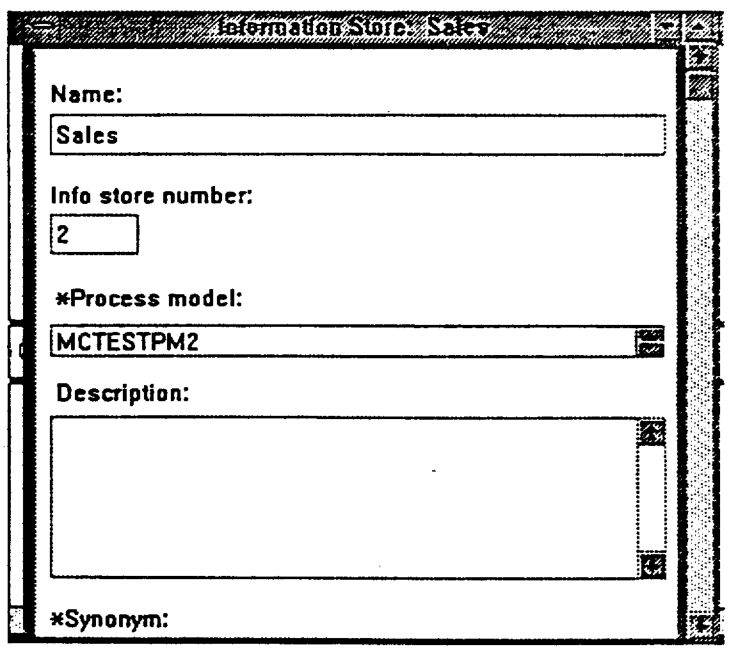
Figures 7, 8, 9, 10, 11, 12, 13, 13B:
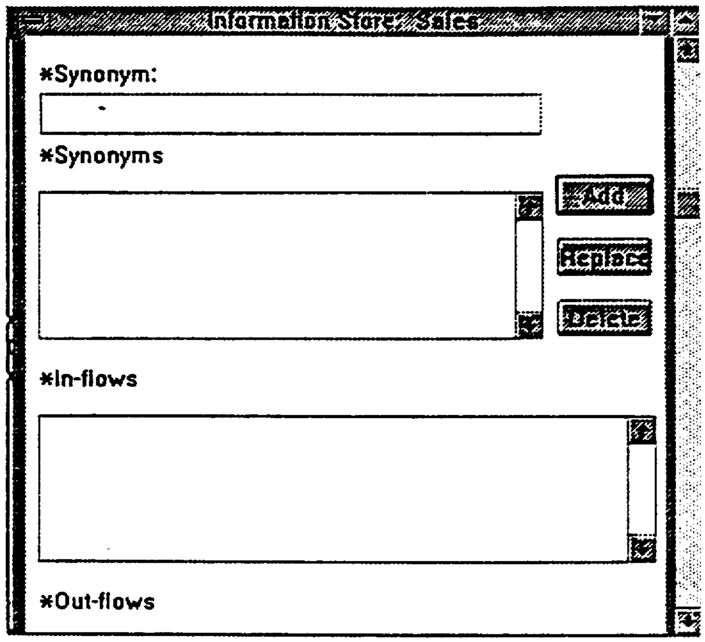
Figures 7, 8, 9, 10, 11, 12, 13, 13C:
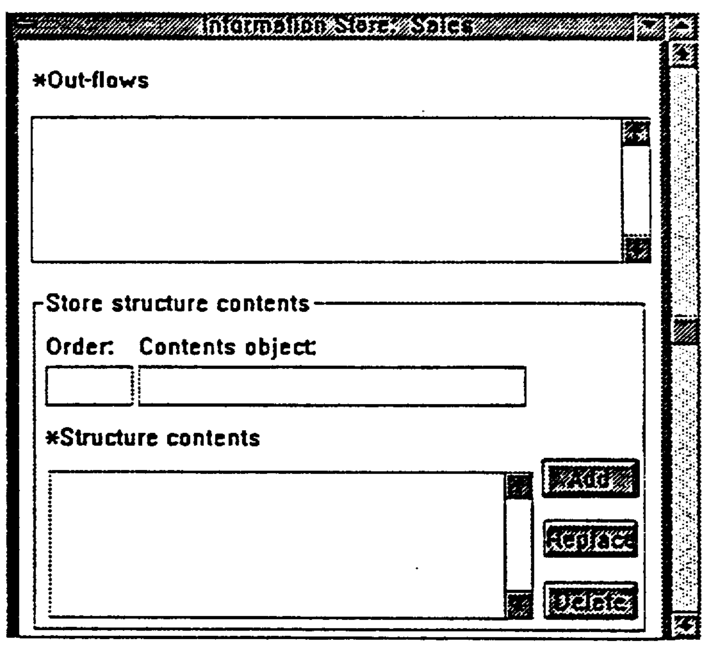
Figures 7, 8, 9, 10, 11, 12, 13, 13D:
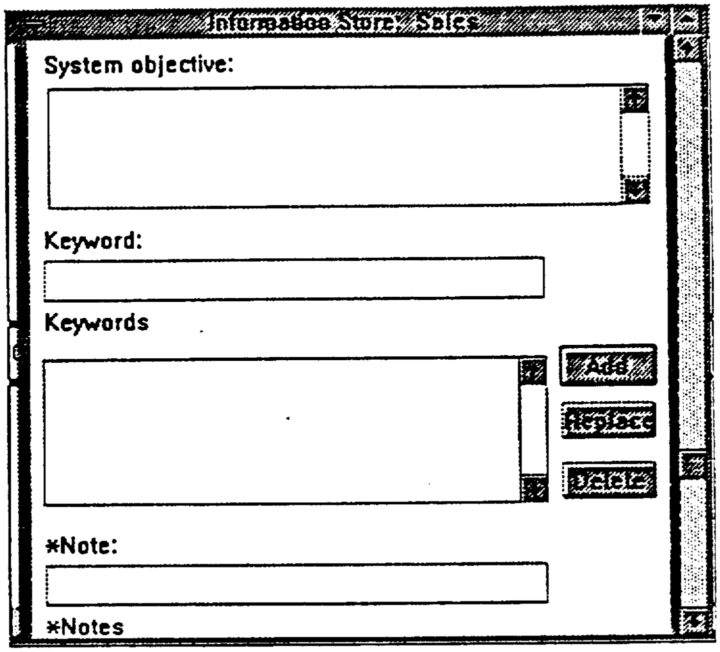
Figures 7, 8, 9, 10, 11, 12, 13, 13E:
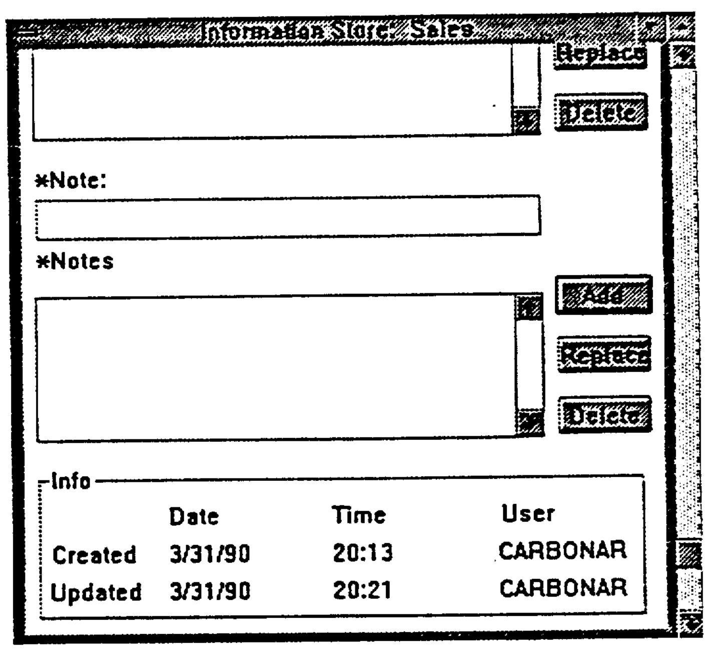
Figures 7, 8, 9, 10, 11, 12, 13, 14, 14A:
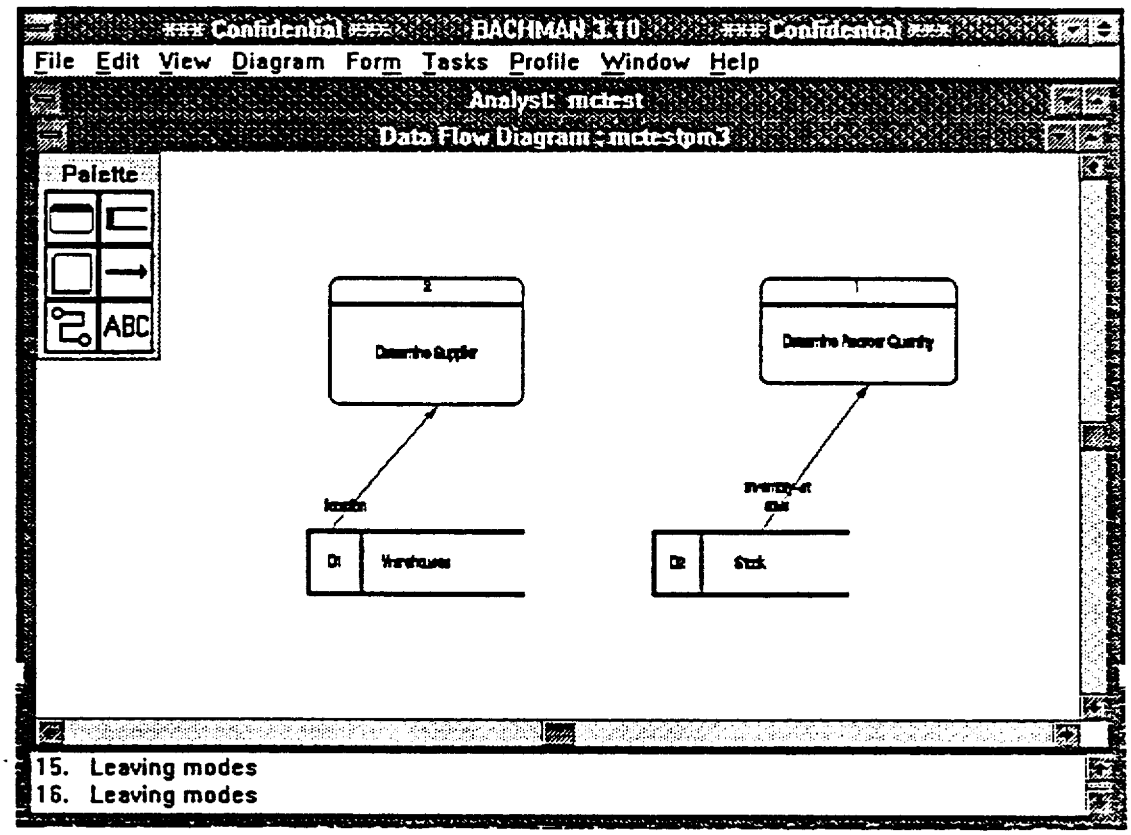
Figures 7, 8, 9, 10, 11, 12, 13, 14, 14B:
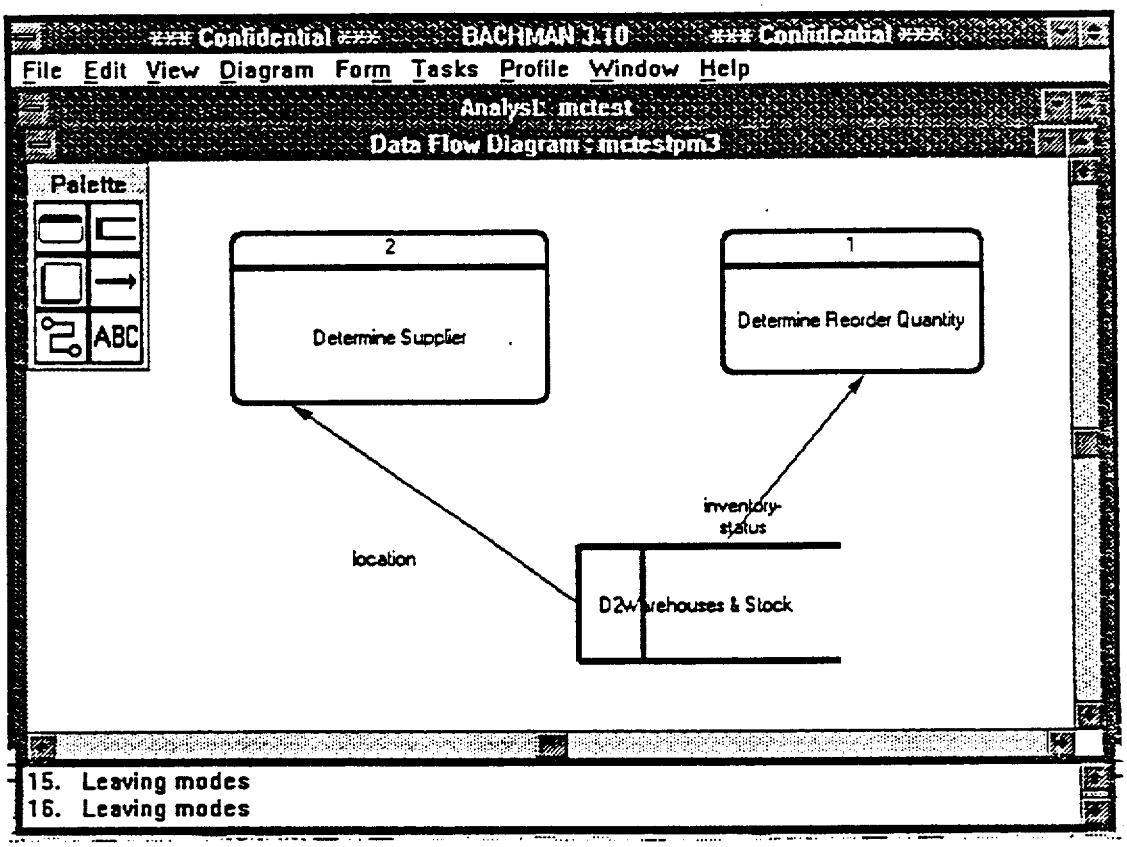
Figures 7, 8, 9, 10, 11, 12, 13, 14, 14C:
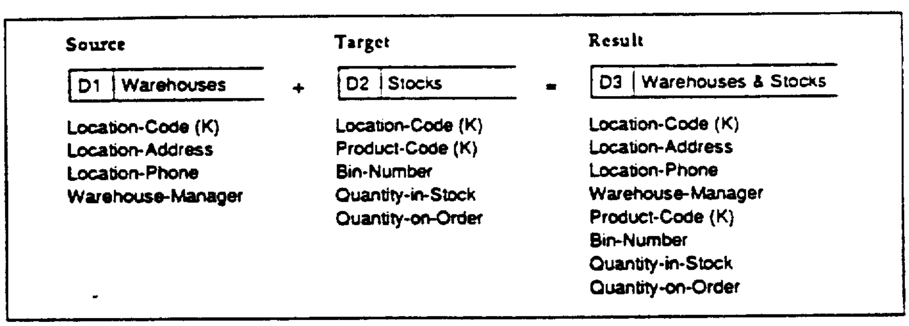
Figures 7, 8, 9, 10, 11, 12, 13, 14, 15:
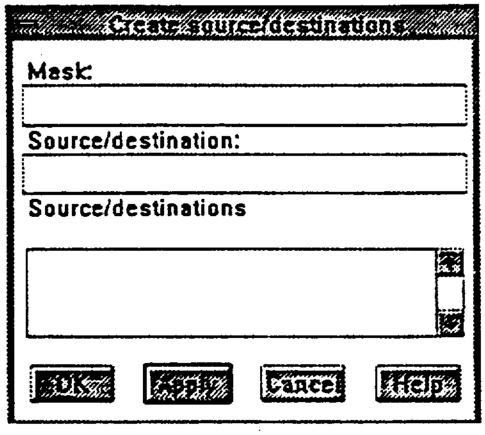
Figures 7, 8, 9, 10, 11, 12, 13, 14, 15, 16:
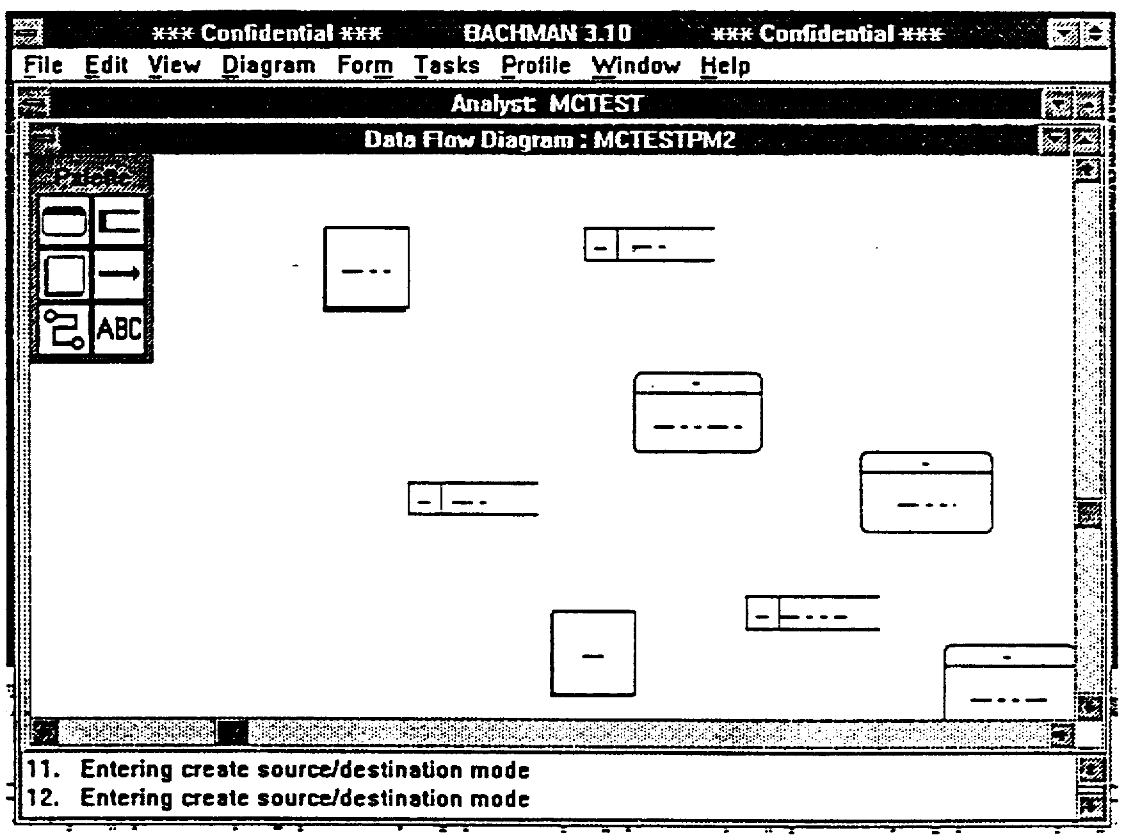
Figures 7, 8, 9, 10, 11, 12, 13, 14, 15, 16, 17, 17A:
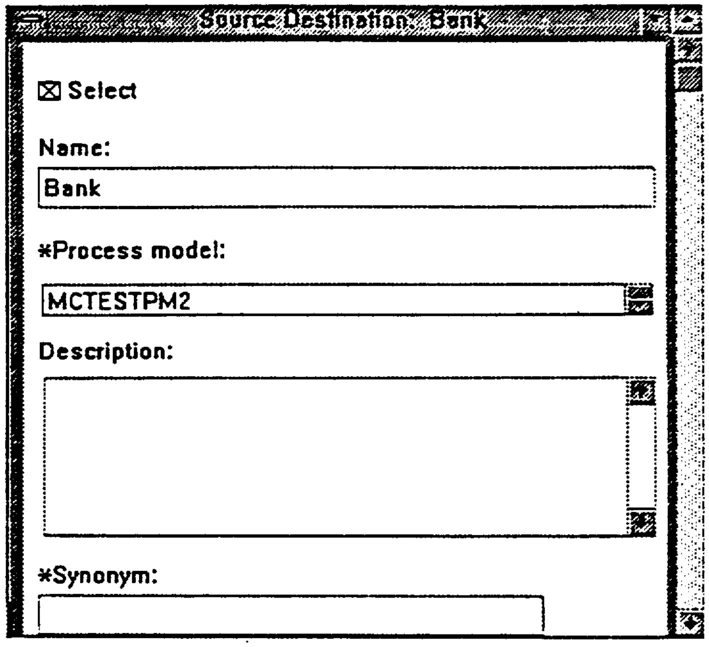
Figures 7, 8, 9, 10, 11, 12, 13, 14, 15, 16, 17, 17B:
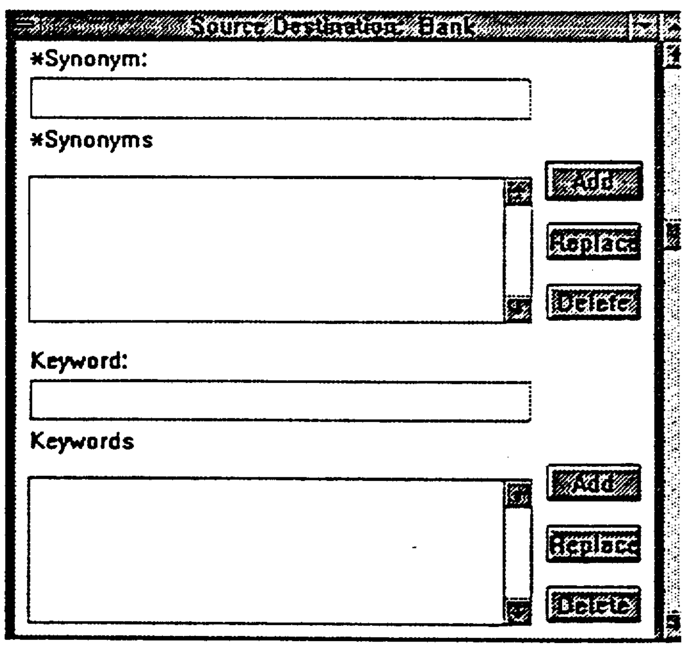
Figures 7, 8, 9, 10, 11, 12, 13, 14, 15, 16, 17, 17C:
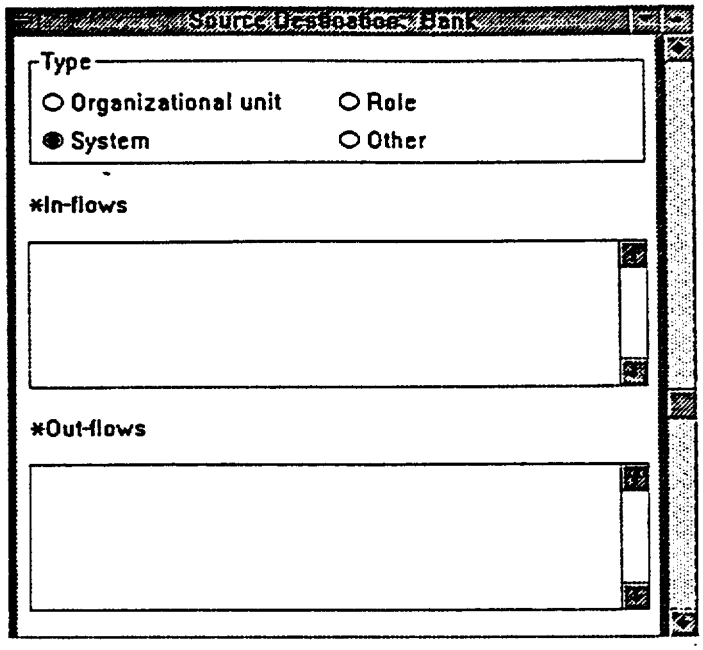
Figures 7, 8, 9, 10, 11, 12, 13, 14, 15, 16, 17, 17D:
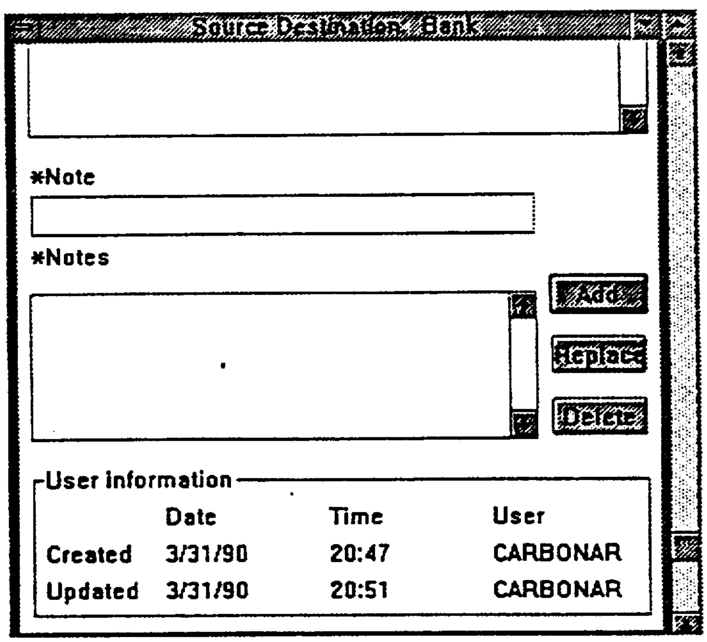
Figures 7, 8, 9, 10, 11, 12, 13, 14, 15, 16, 17, 18, 18A:
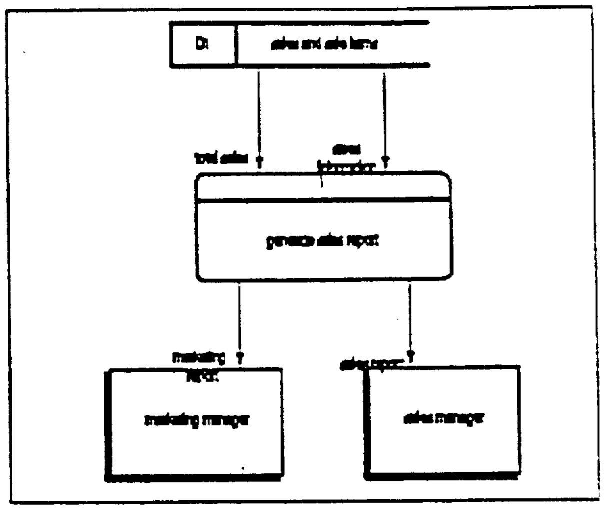
Figures 7, 8, 9, 10, 11, 12, 13, 14, 15, 16, 17, 18, 18B:
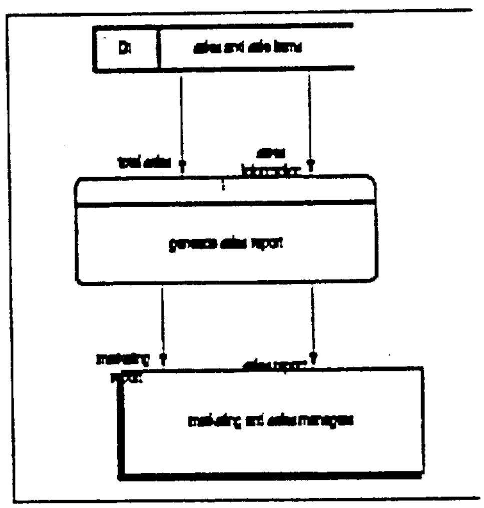
Figures 7, 8, 9, 10, 11, 12, 13, 14, 15, 16, 17, 18, 19:
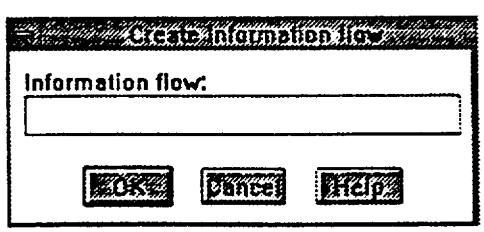
Figures 7, 8, 9, 10, 11, 12, 13, 14, 15, 16, 17, 18, 19, 20:
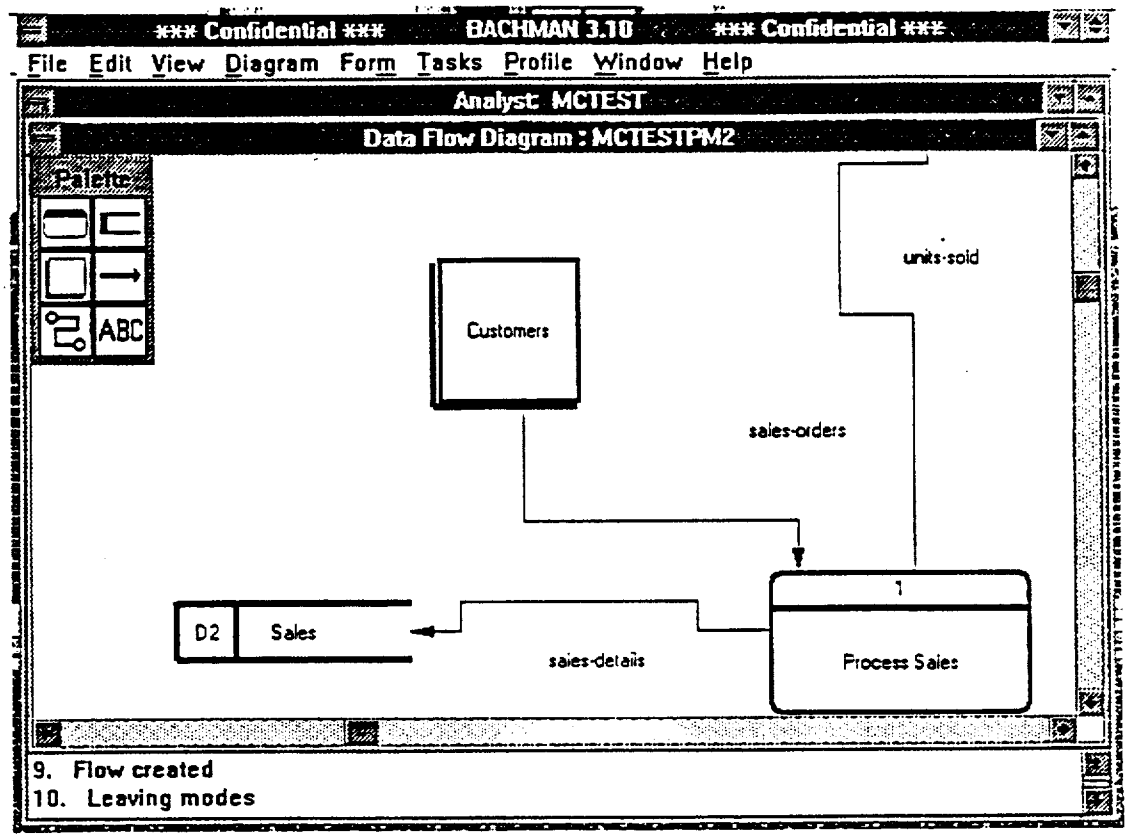
Figures 7, 8, 9, 10, 11, 12, 13, 14, 15, 16, 17, 18, 19, 20, 21, 21A:
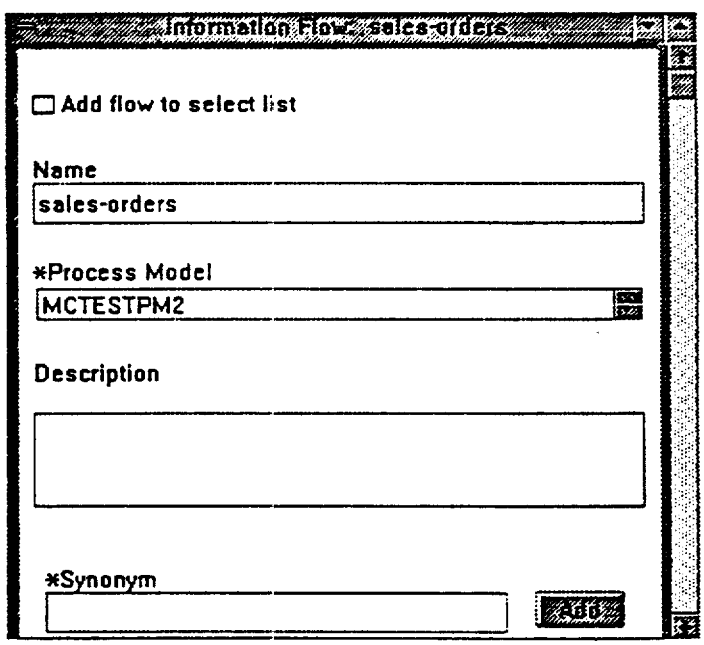
Figures 7, 8, 9, 10, 11, 12, 13, 14, 15, 16, 17, 18, 19, 20, 21, 21B:
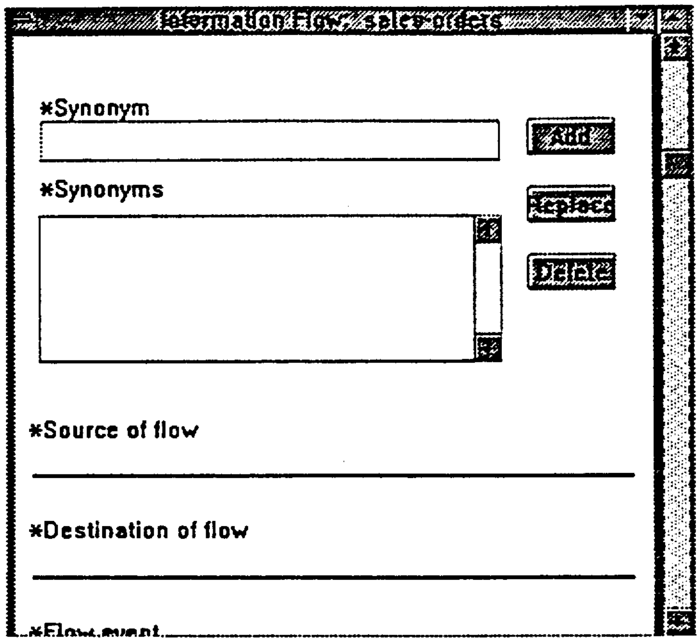
Figures 7, 8, 9, 10, 11, 12, 13, 14, 15, 16, 17, 18, 19, 20, 21, 21C:
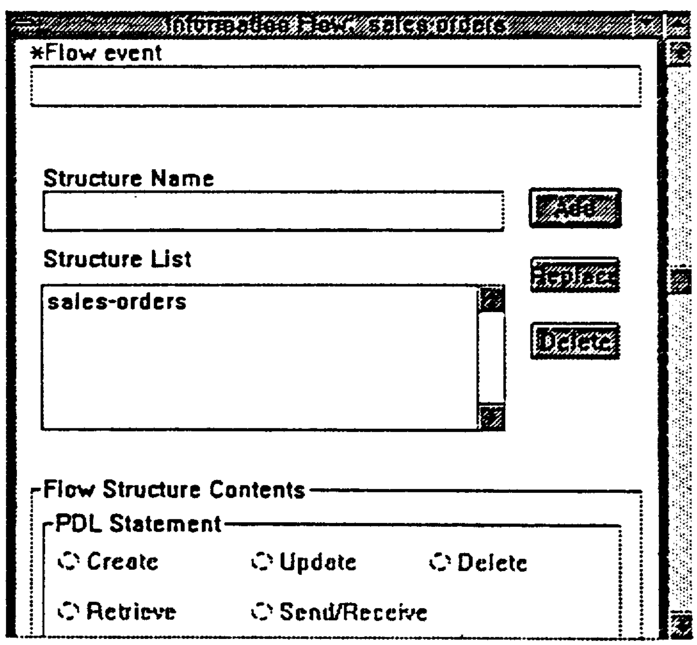
Figures 7, 8, 9, 10, 11, 12, 13, 14, 15, 16, 17, 18, 19, 20, 21, 21D:
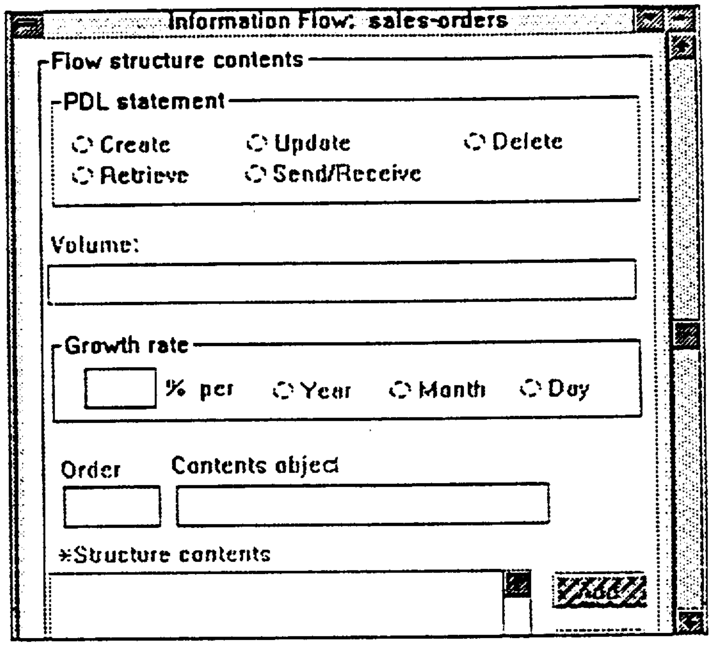
Figures 7, 8, 9, 10, 11, 12, 13, 14, 15, 16, 17, 18, 19, 20, 21, 21E:
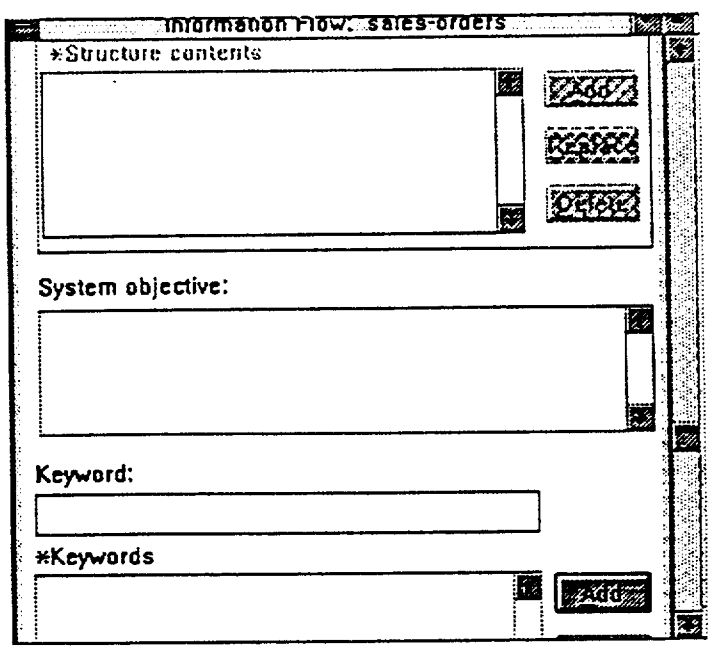
Figures 7, 8, 9, 10, 11, 12, 13, 14, 15, 16, 17, 18, 19, 20, 21, 21F:
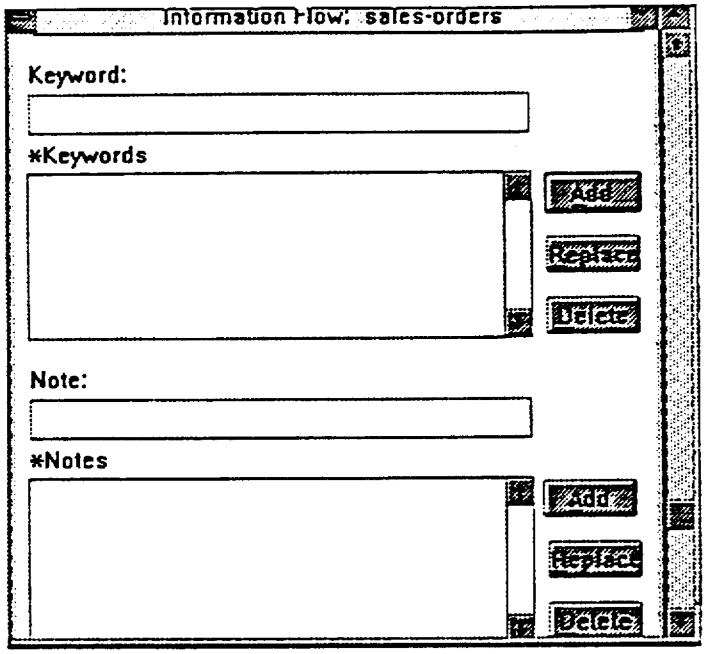
Figures 7, 8, 9, 10, 11, 12, 13, 14, 15, 16, 17, 18, 19, 20, 21, 21G:
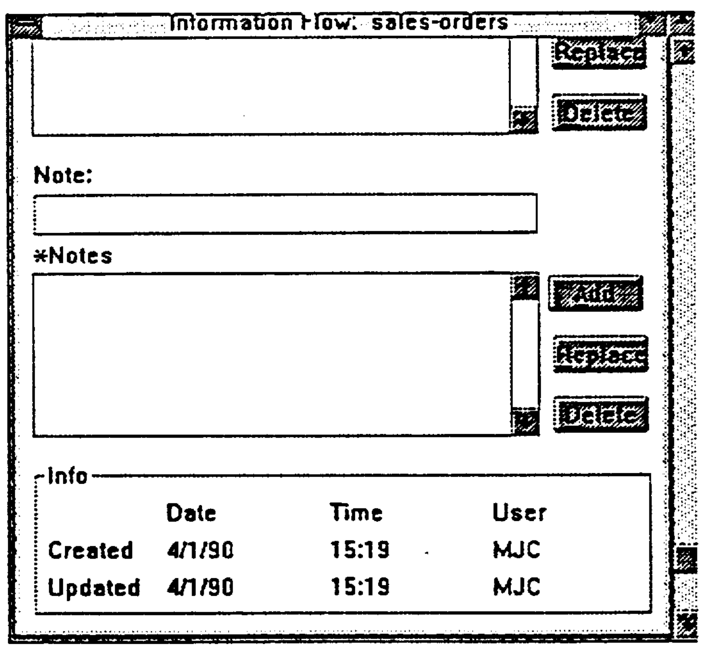
Figures 7, 8, 9, 10, 11, 12, 13, 14, 15, 16, 17, 18, 19, 20, 21, 22, 22A:
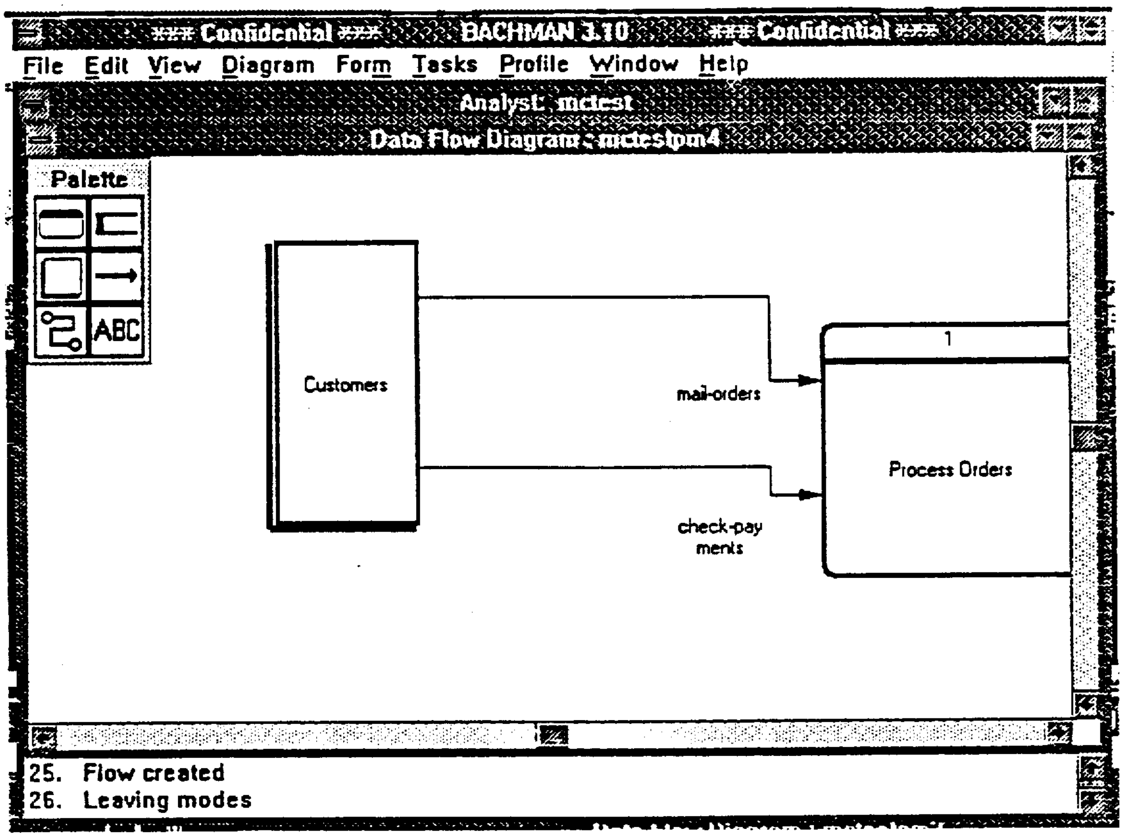
Figures 1, 9:
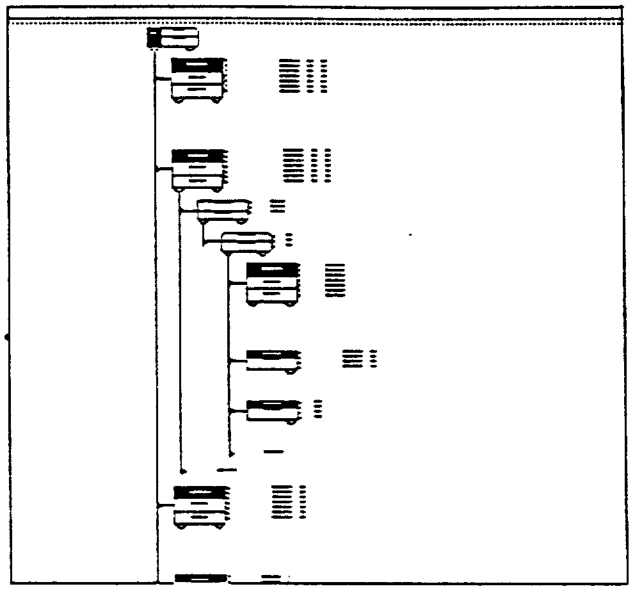
Figures 2, 9:
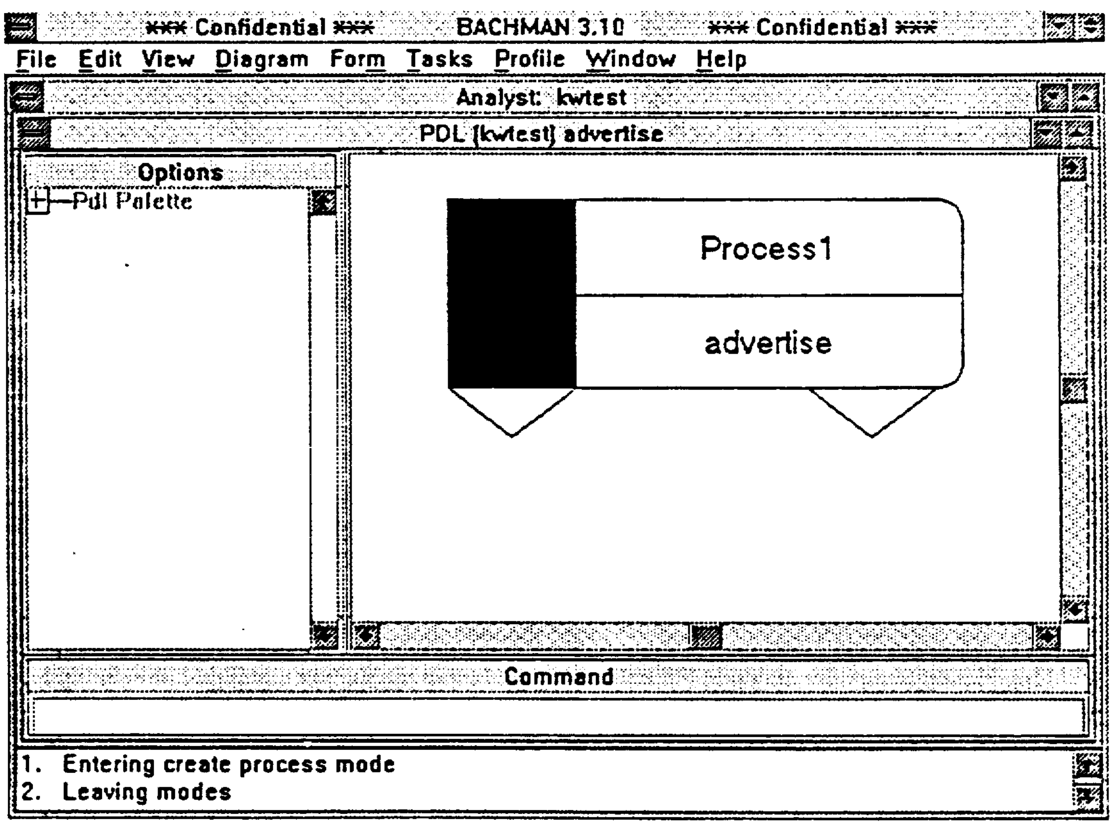
Figures 3, 9:
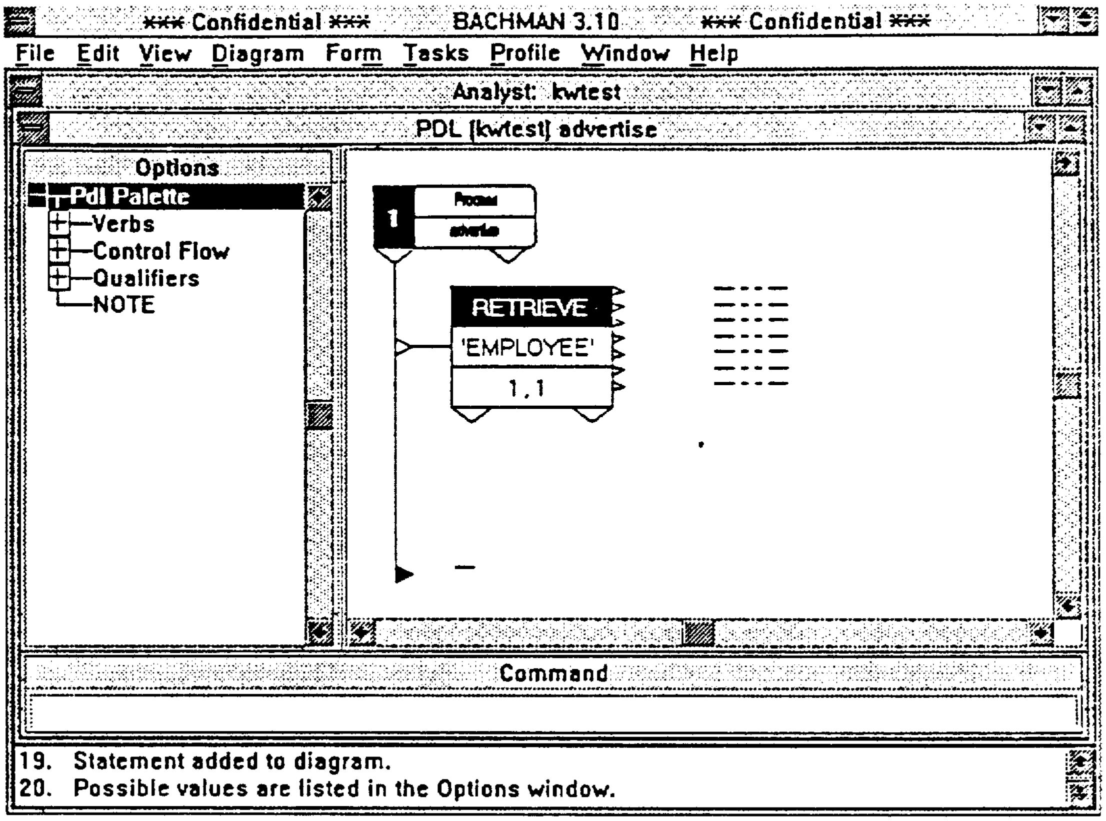
Figures 4, 9:
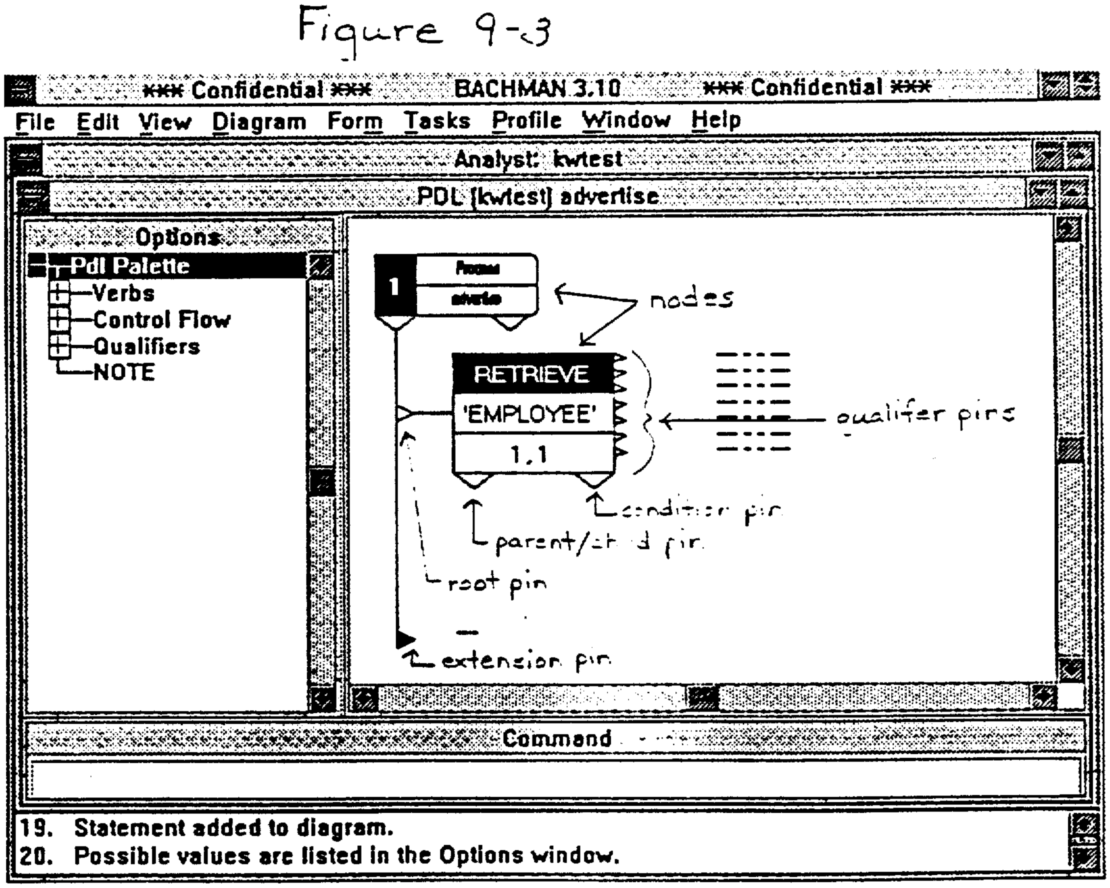
Figures 5, 9:
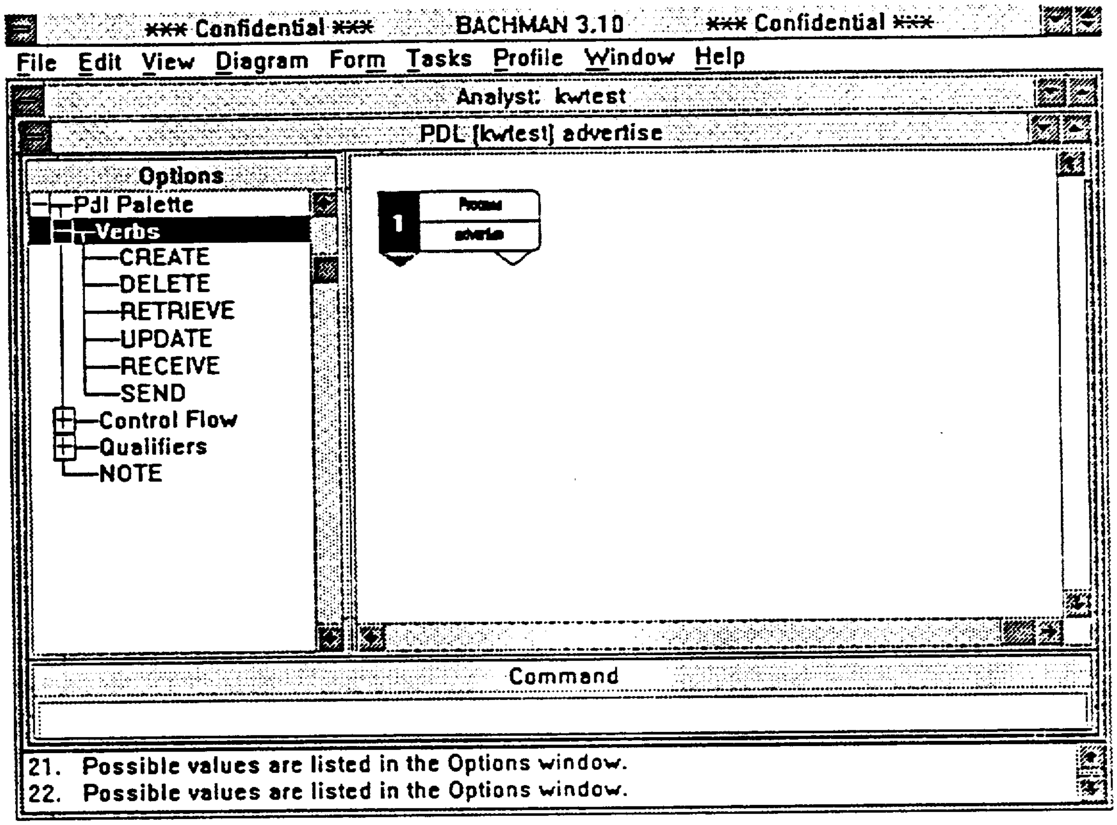
Figures 6, 9:
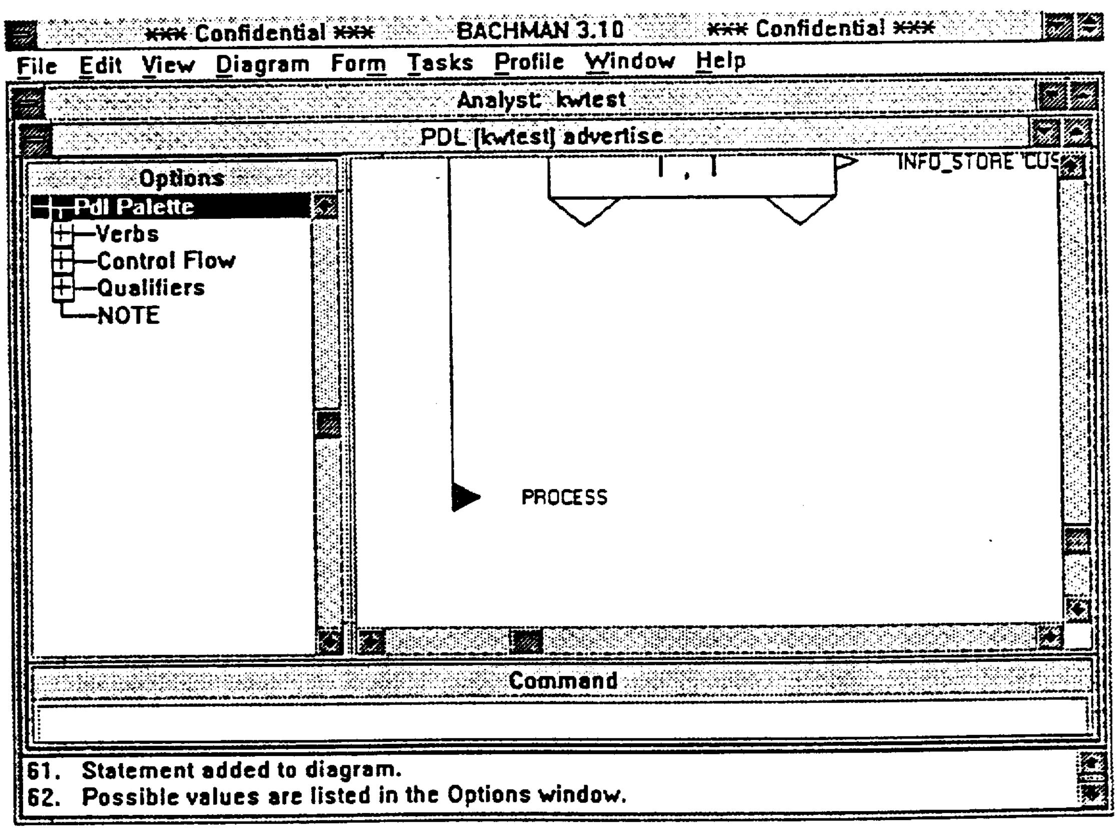
Figures 7, 9:
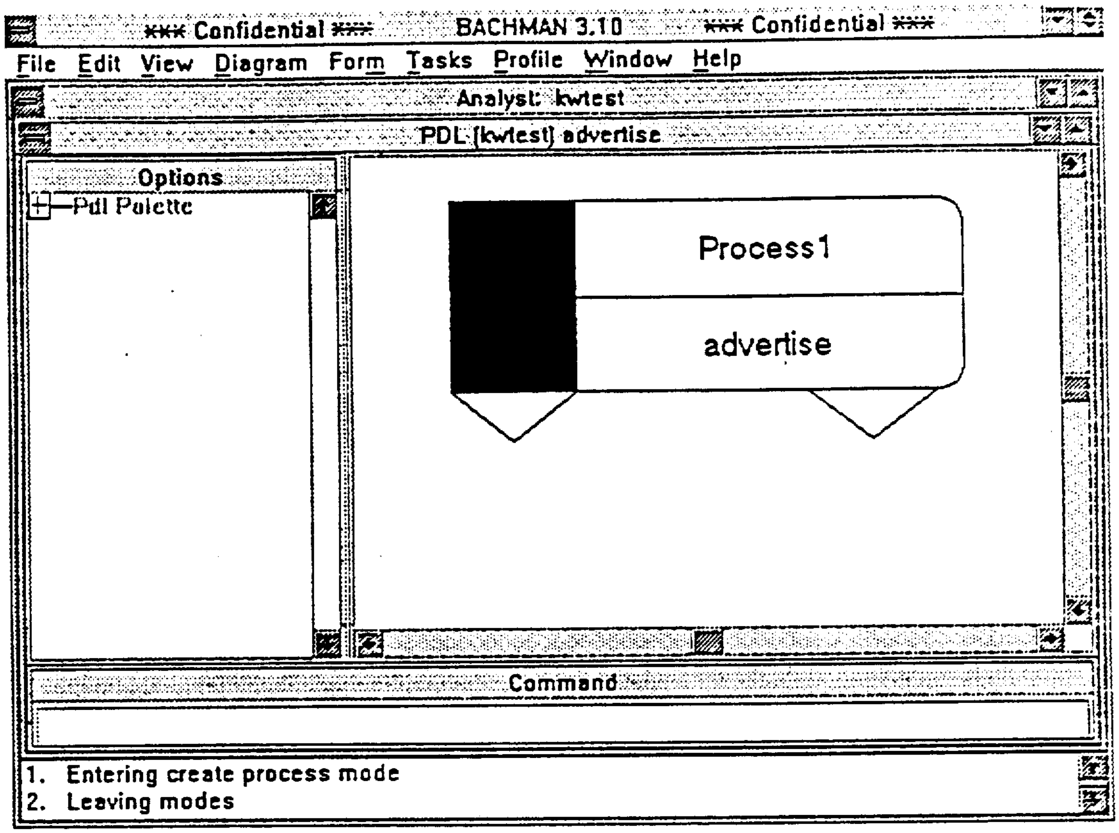
Figures 8, 9:
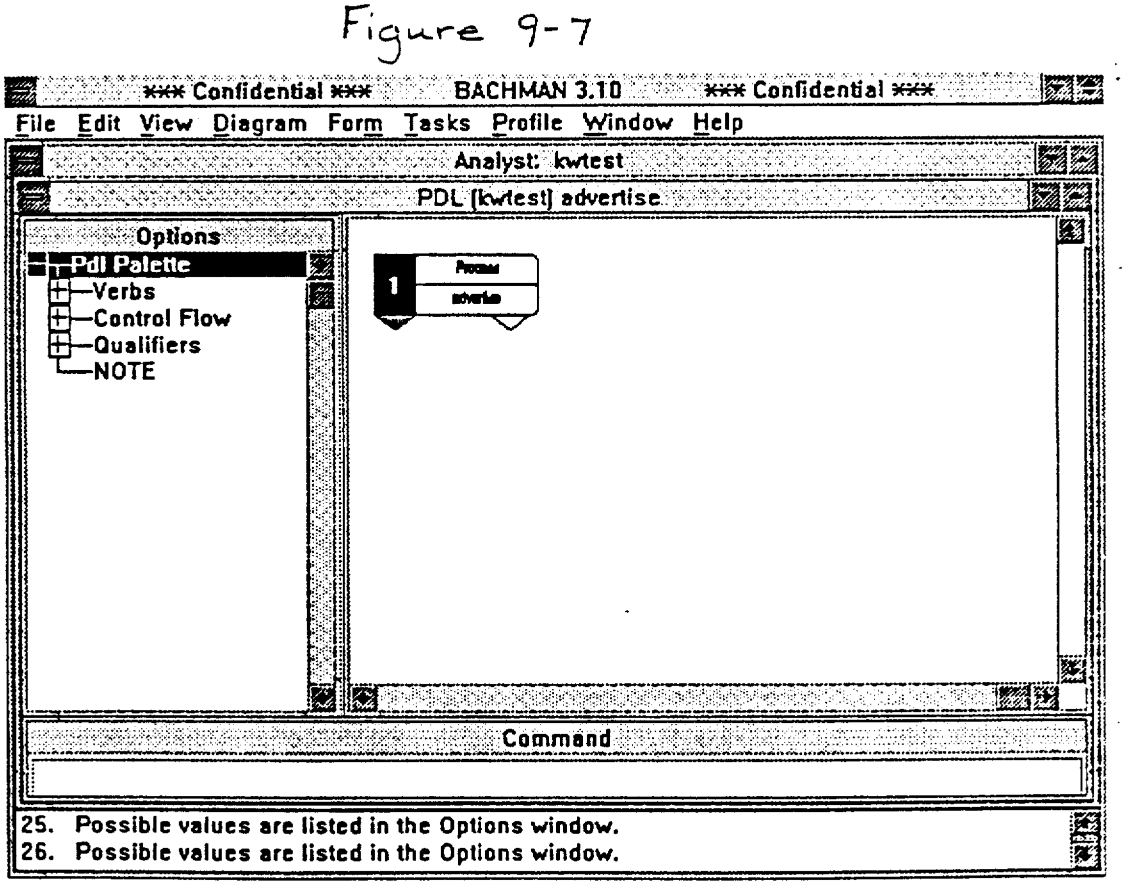
Figure 9:
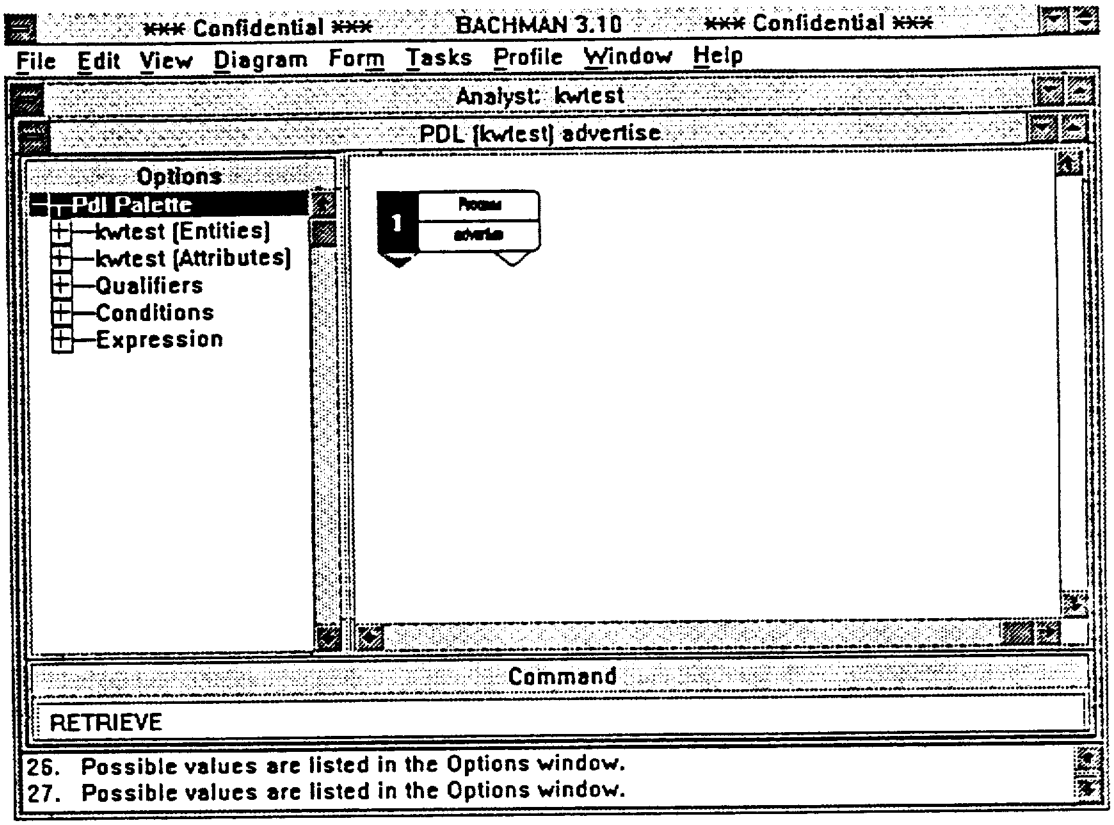
Figures 9, 10:
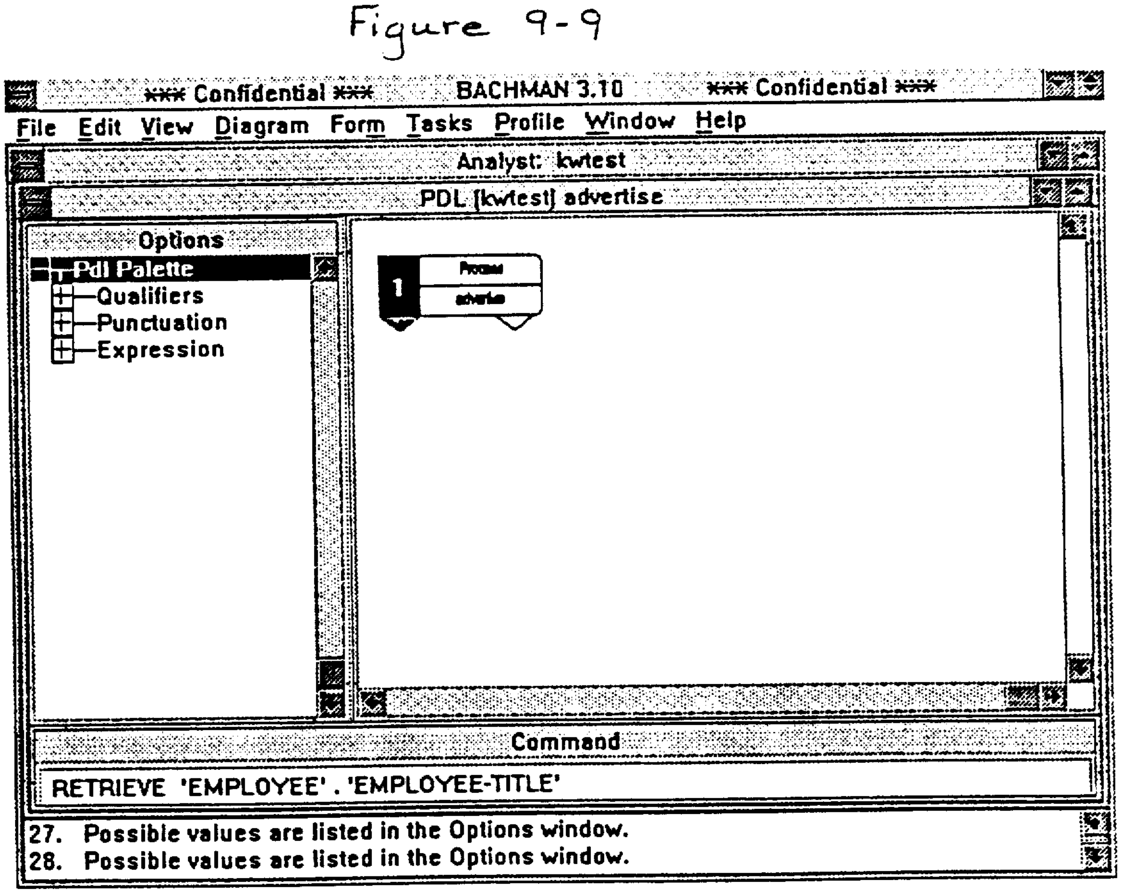
Figures 9, 10, 11:
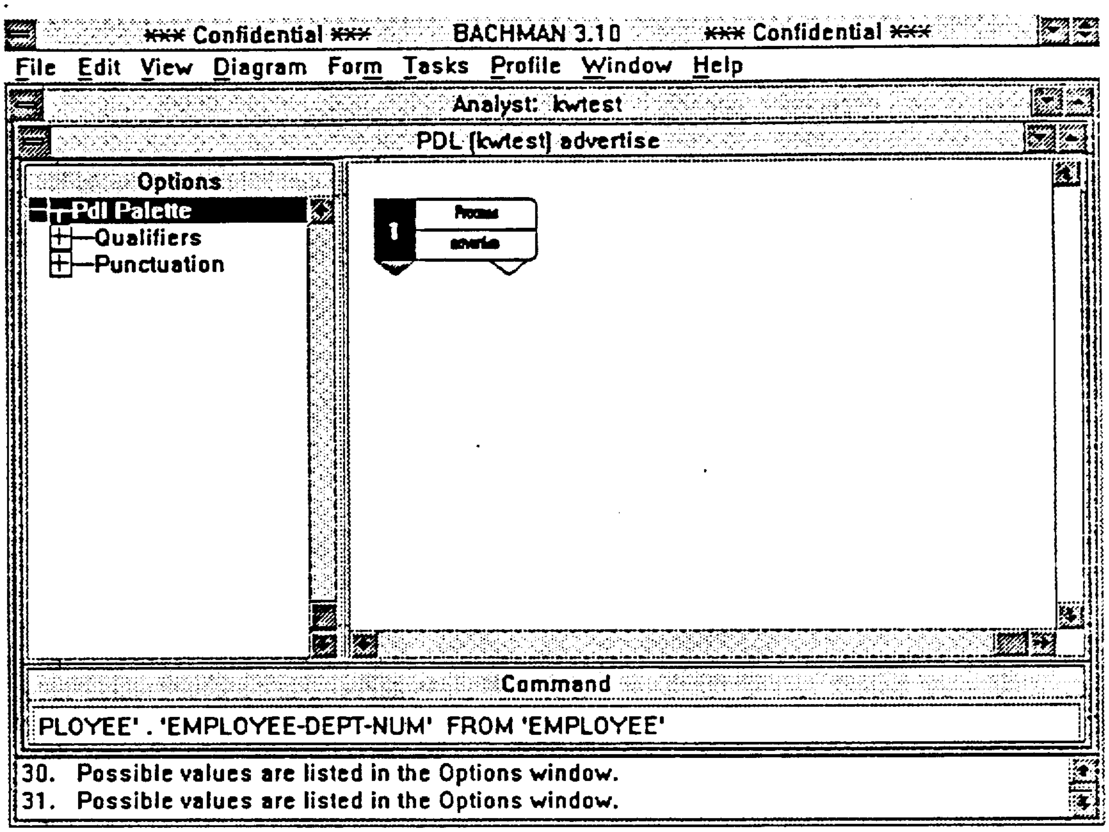
Figures 9, 10, 11, 12:
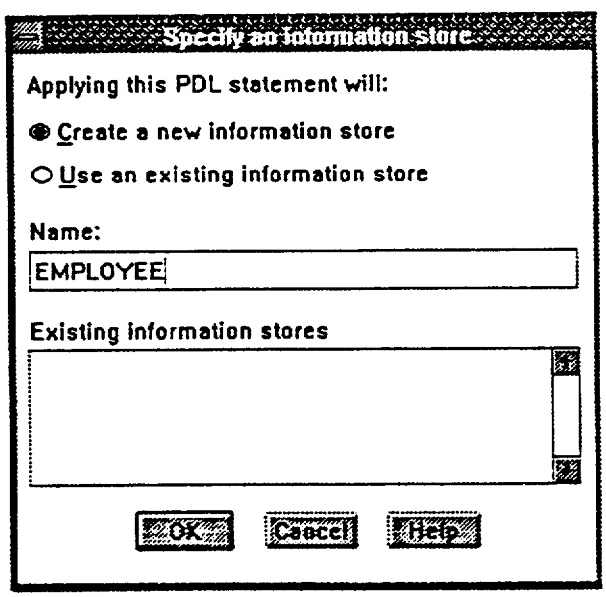
Figures 9, 10, 11, 12, 13:
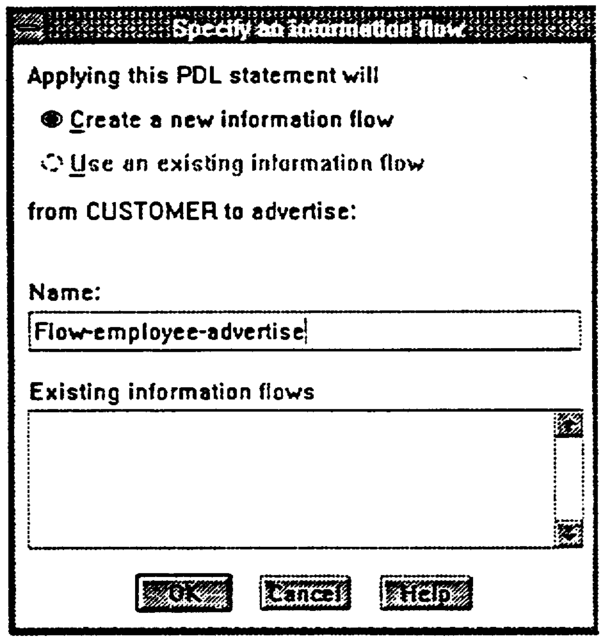
Figures 9, 10, 11, 12, 13, 14:
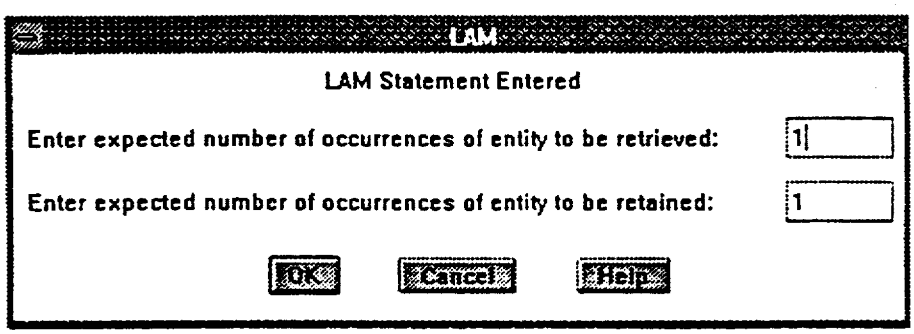
Figures 9, 10, 11, 12, 13, 14, 15:
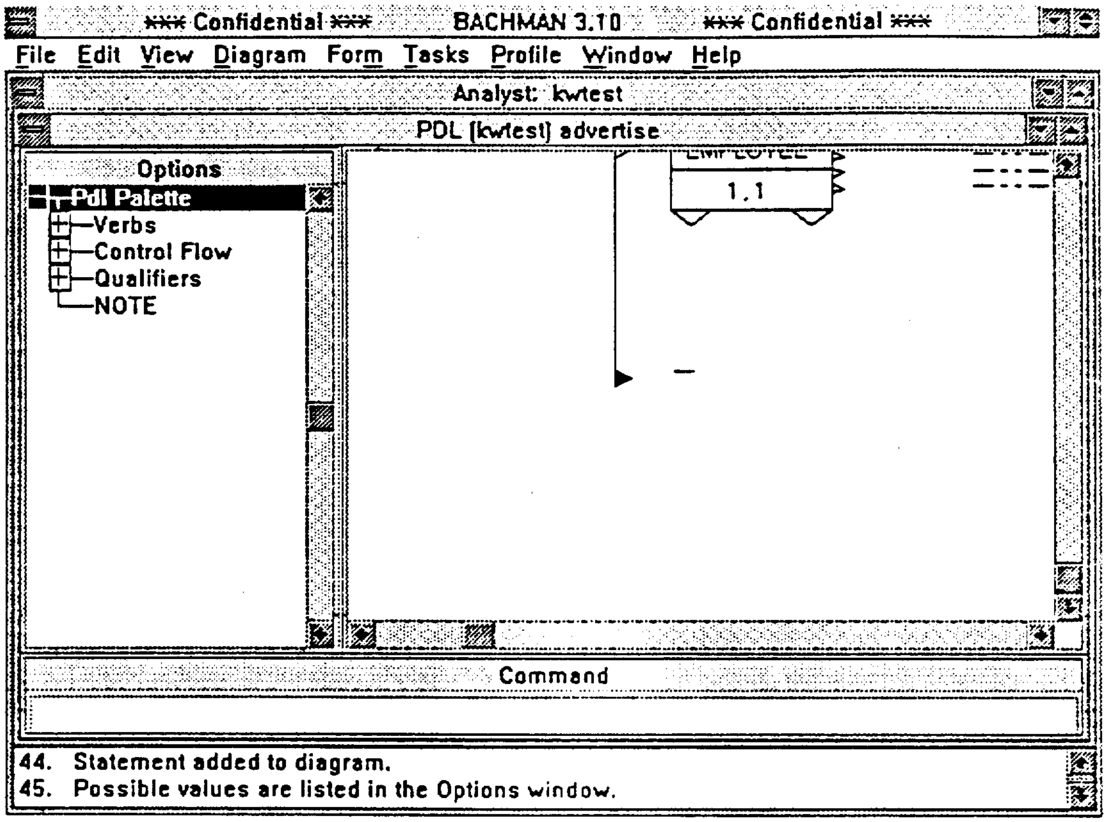
Figures 9, 10, 11, 12, 13, 14, 15, 16:
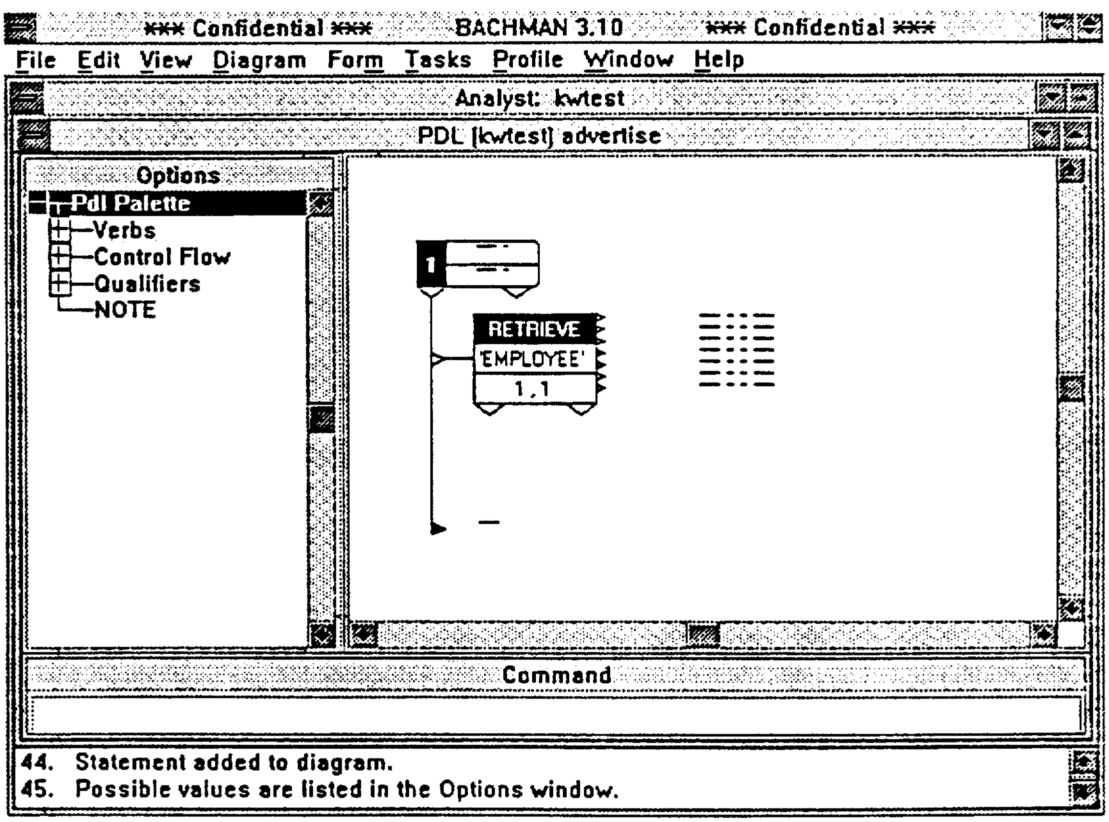
Figures 9, 10, 11, 12, 13, 14, 15, 16, 17, 18, 19, 20:
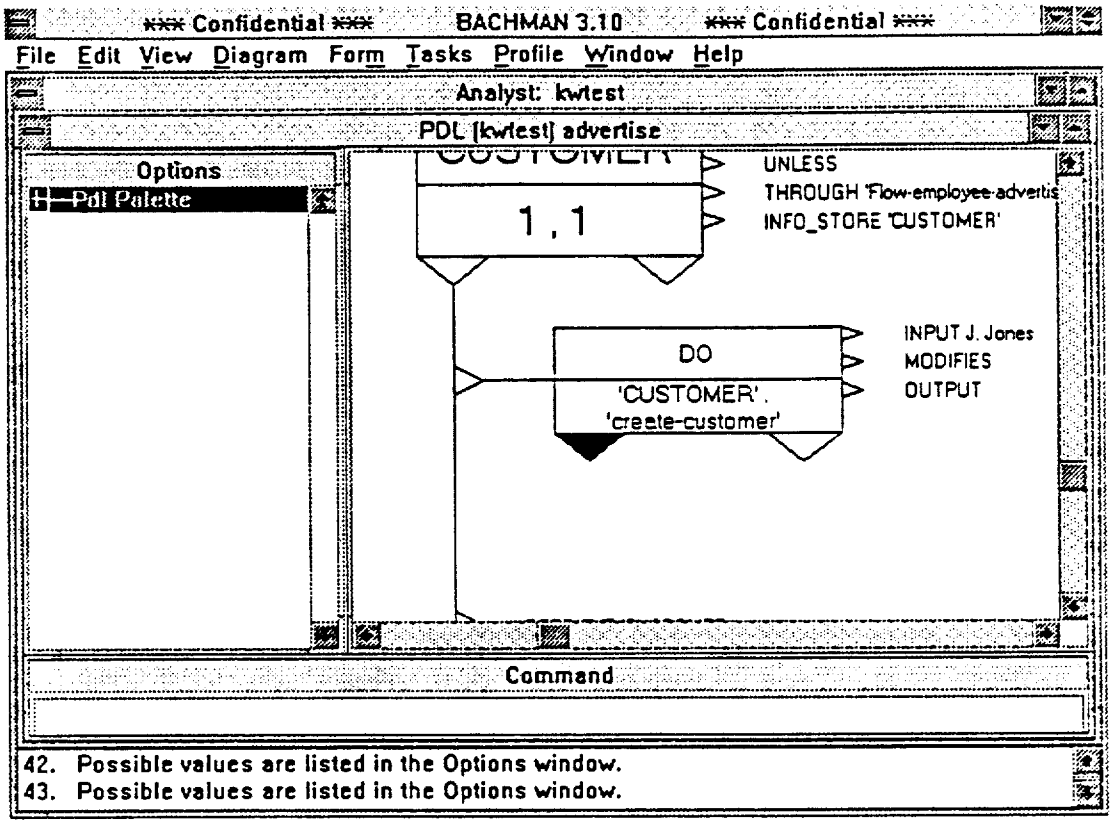
Figures 9, 10, 11, 12, 13, 14, 15, 16, 17, 18, 19, 20, 21:
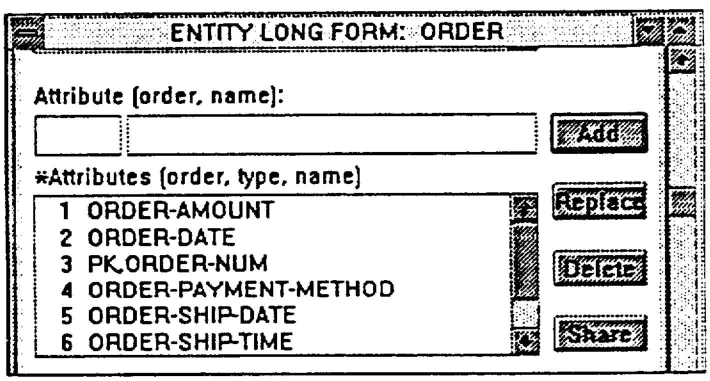
Figures 9, 10, 11, 12, 13, 14, 15, 16, 17, 18, 19, 20, 21, 22:
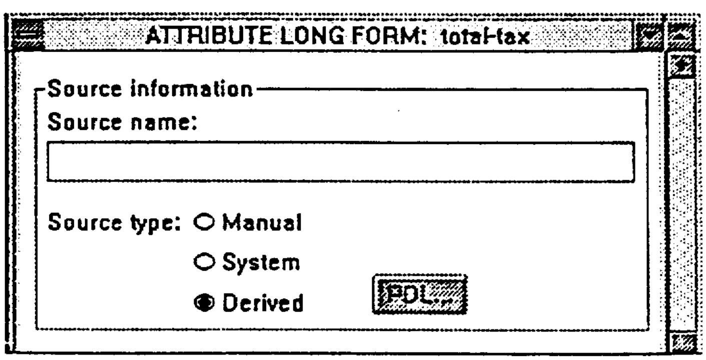
Figures 9, 10, 11, 12, 13, 14, 15, 16, 17, 18, 19, 20, 21, 22, 23:
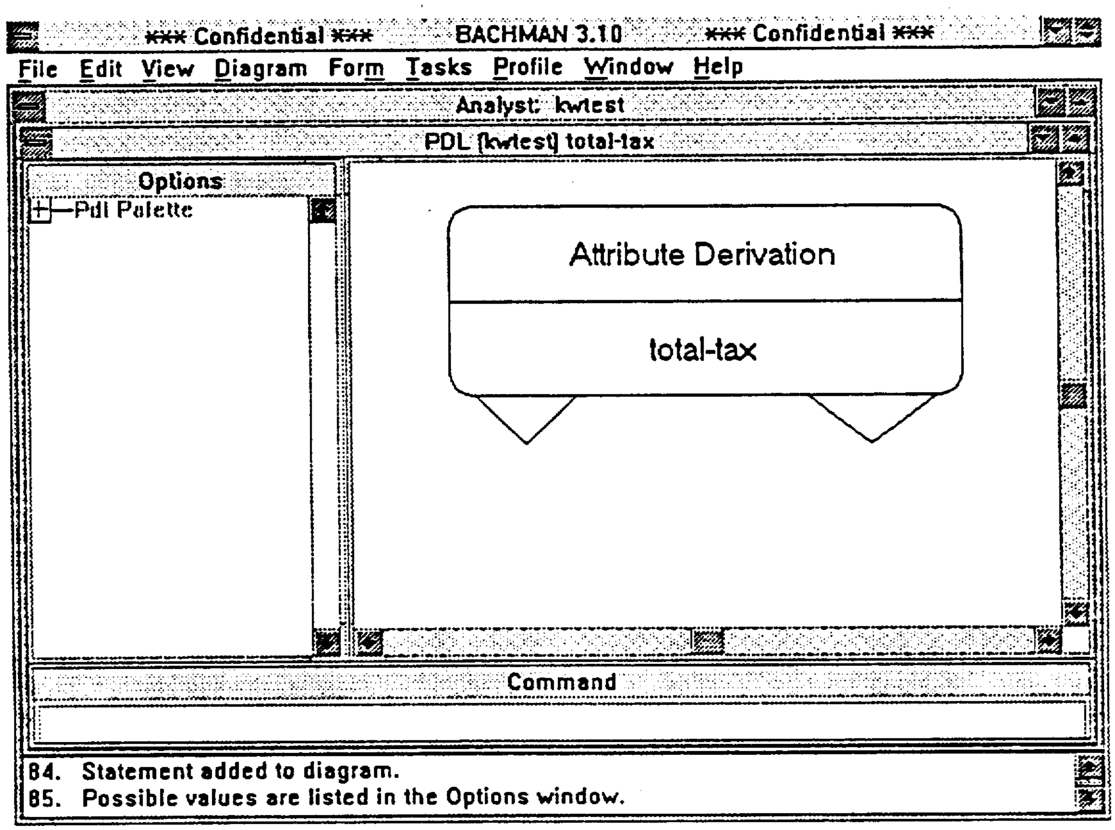
Figures 1, 11:
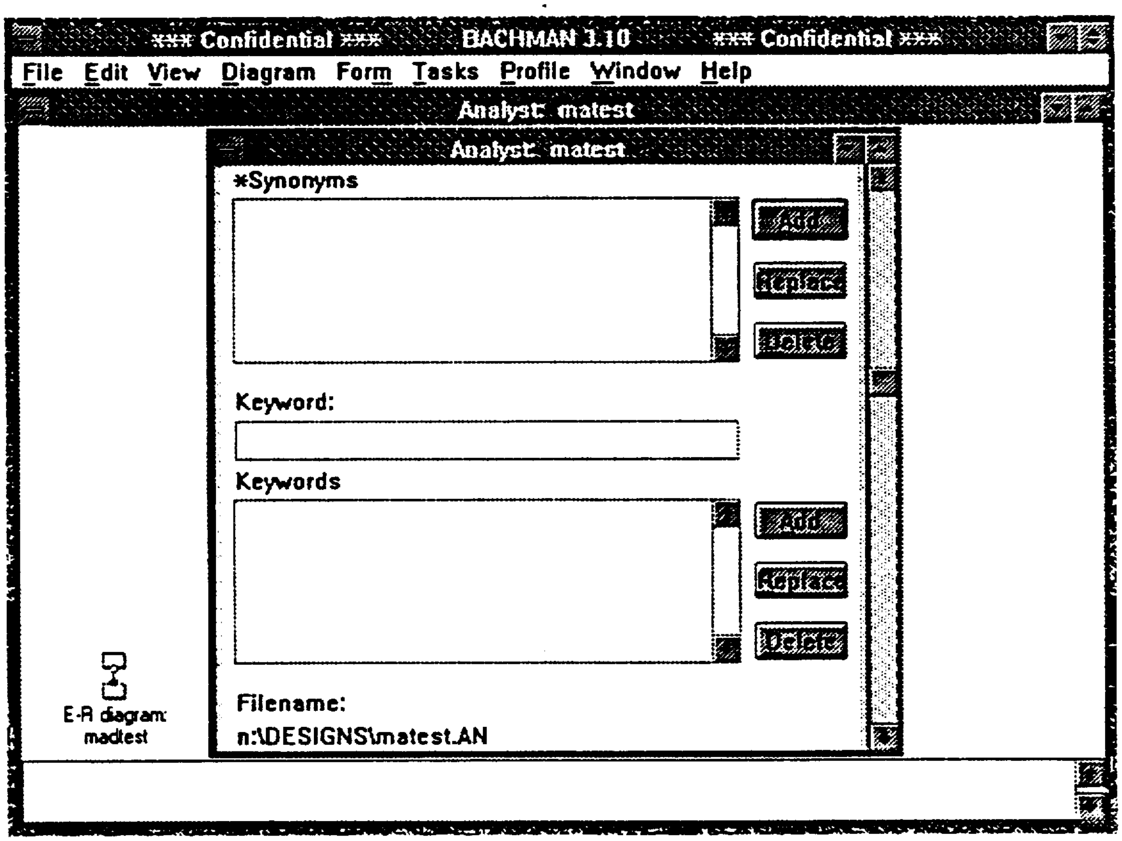
Figures 1, 11:
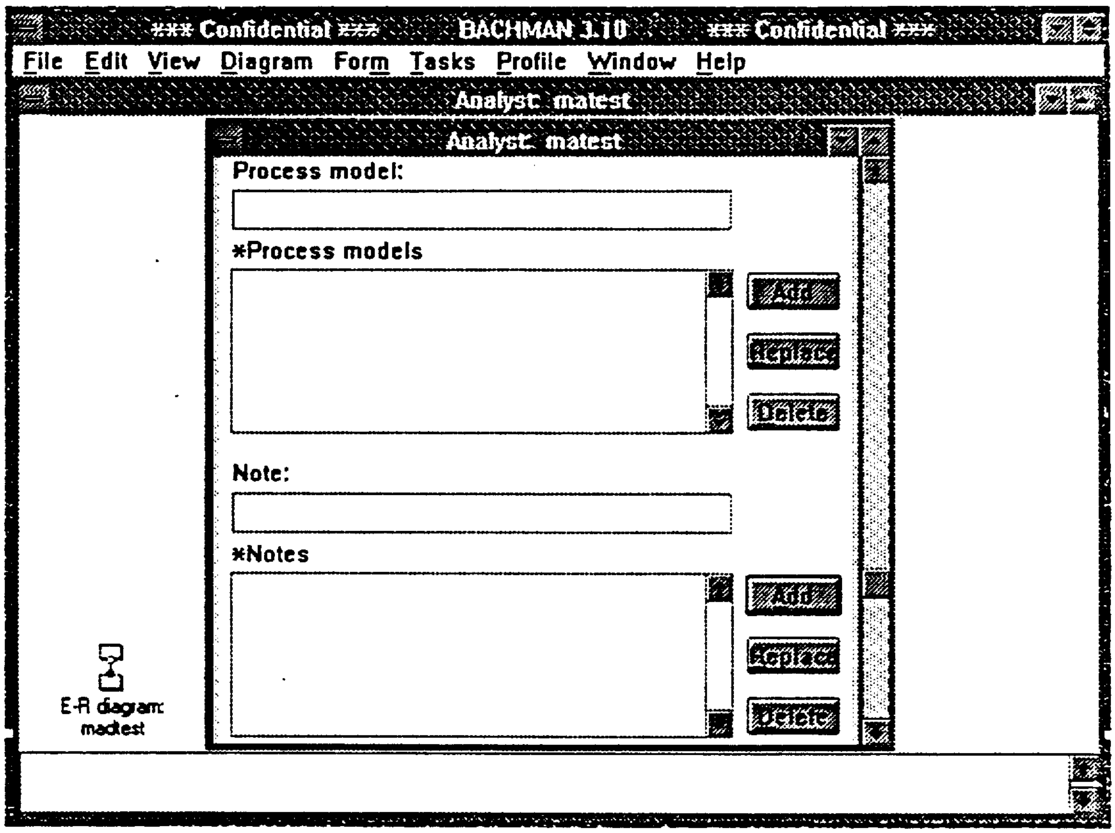
Figures 1, 11:
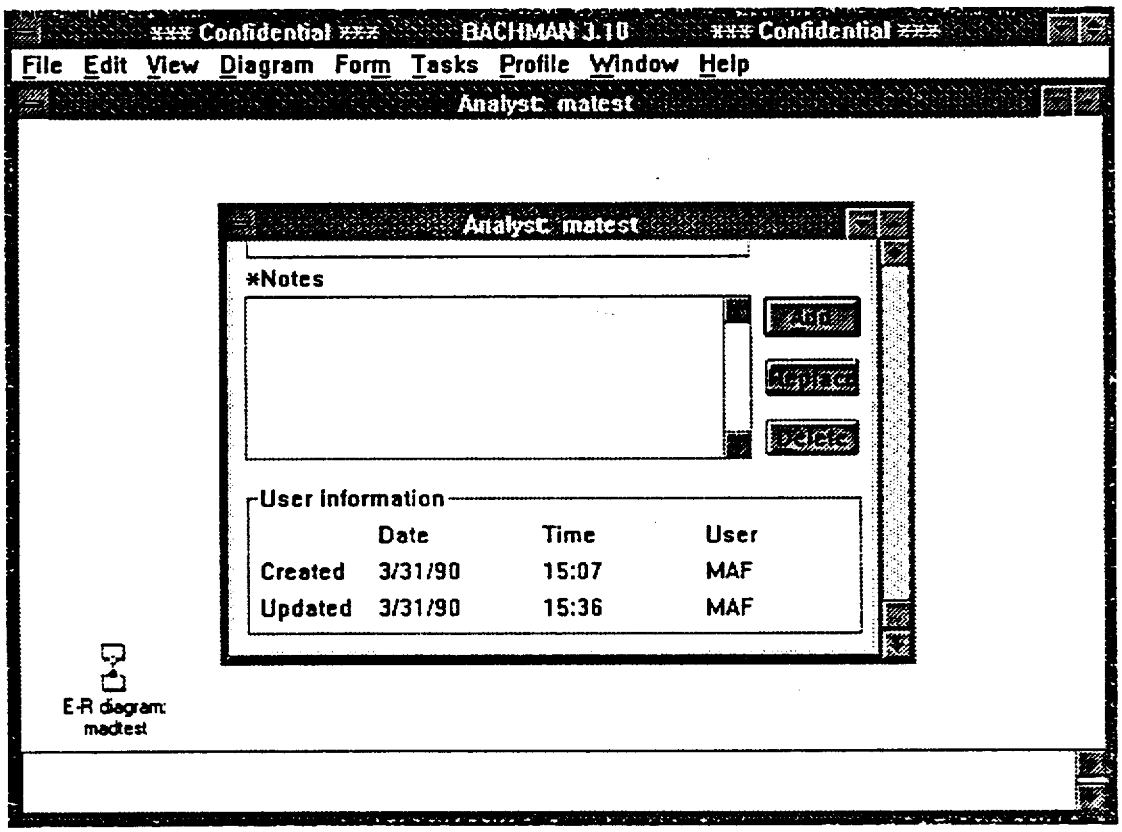
Figure 11:
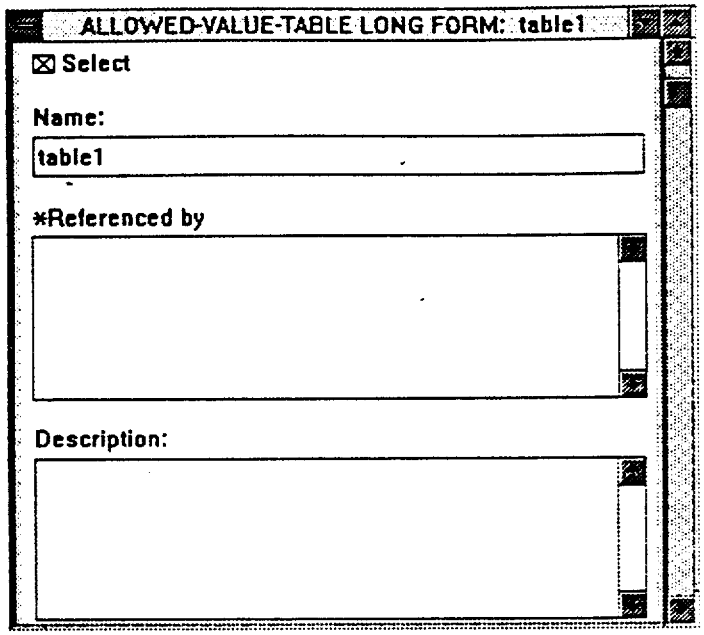
Figure 2:
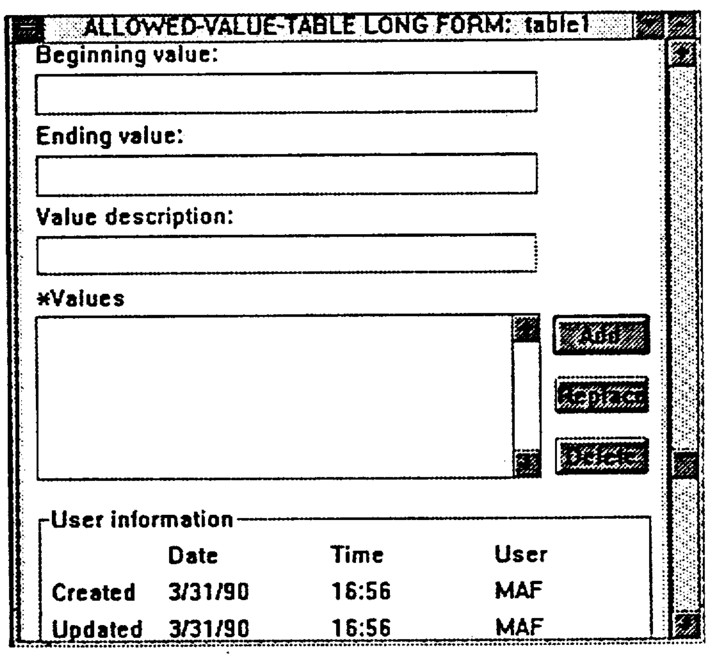
Figure 11:
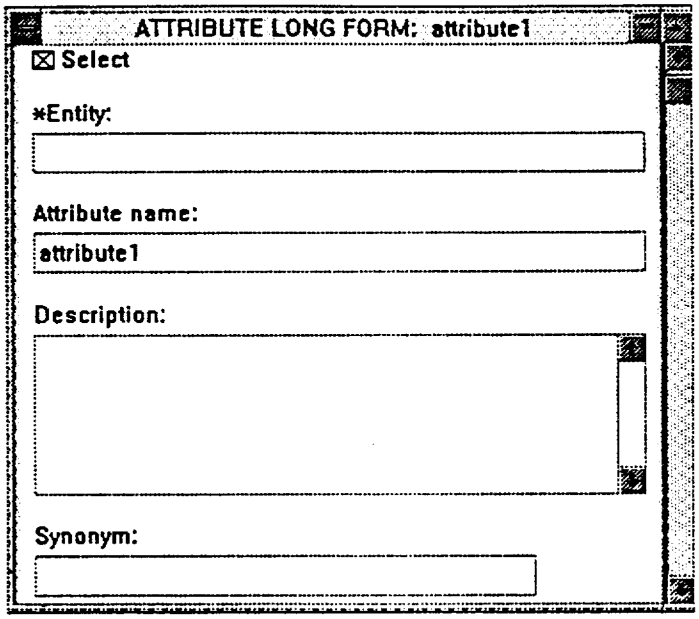
Figure 3:
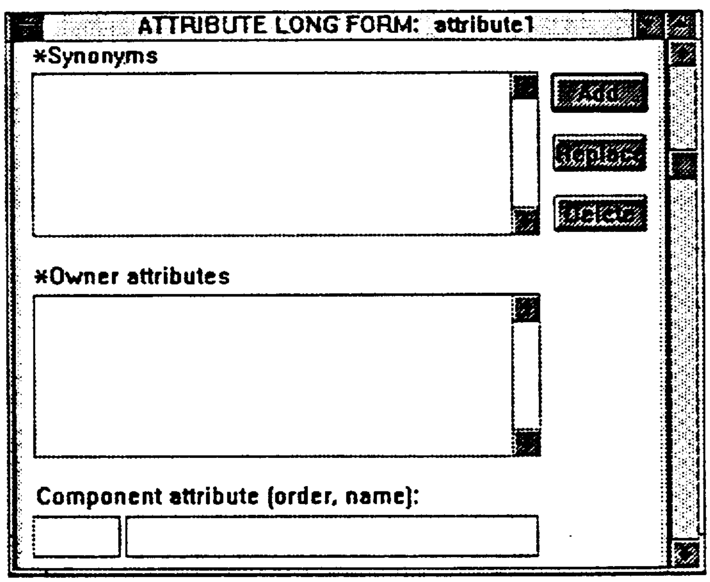
Figures 3, 11:
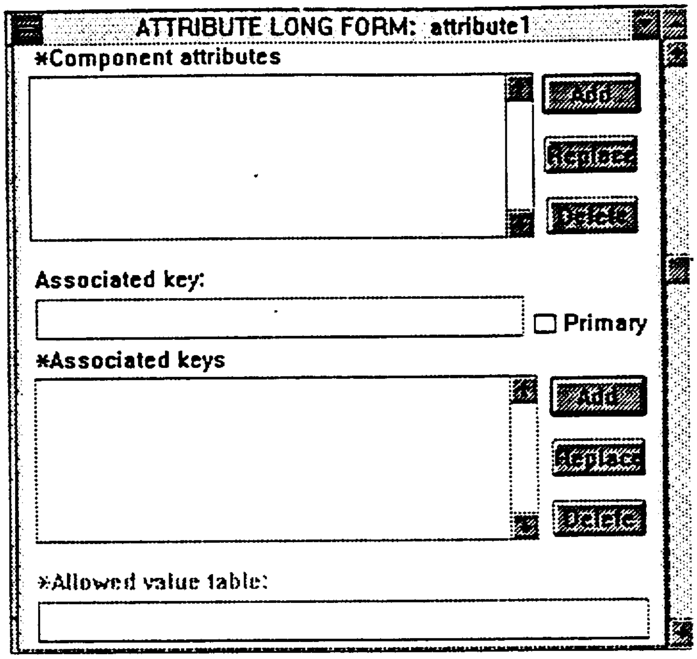
Figures 3, 11:
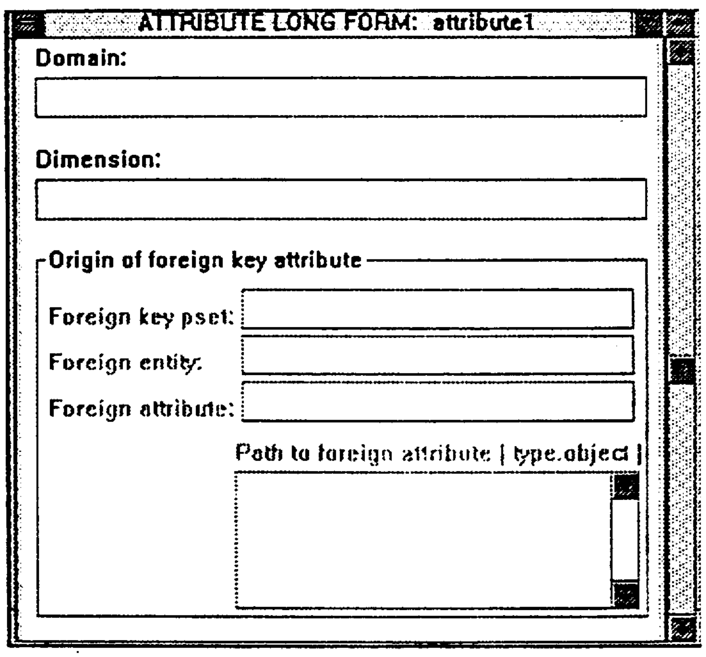
Figures 3, 11:
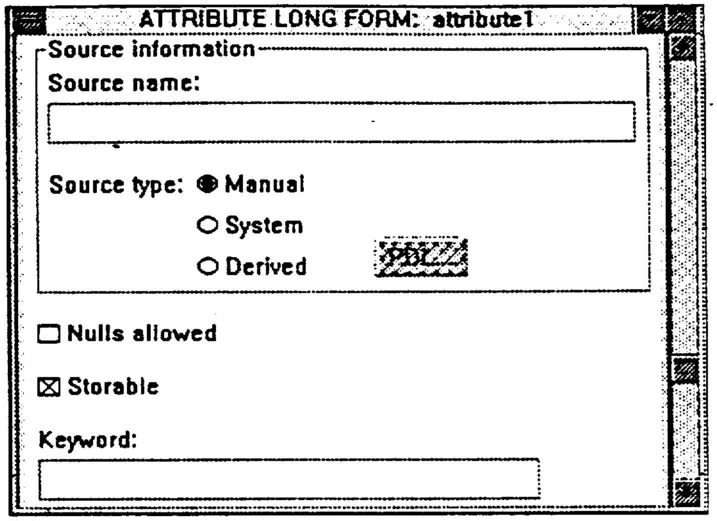
Figures 3, 11:
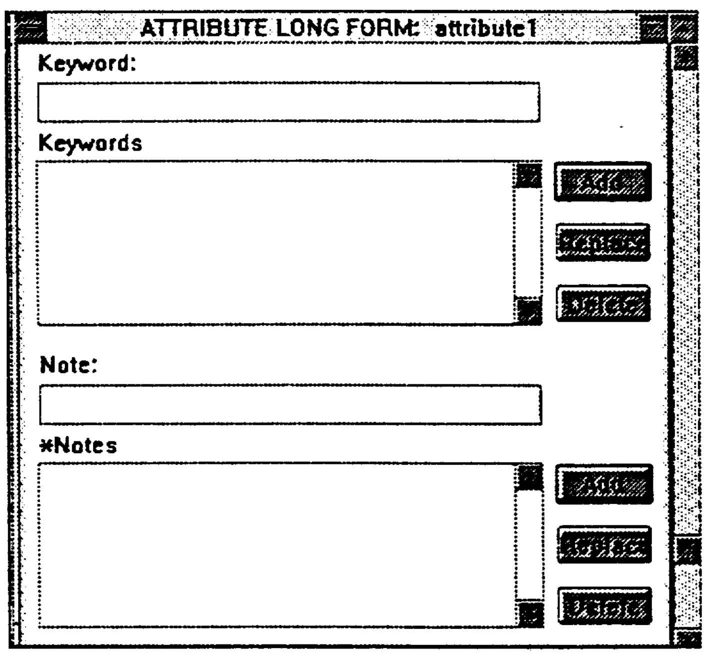
Figures 4, 11:
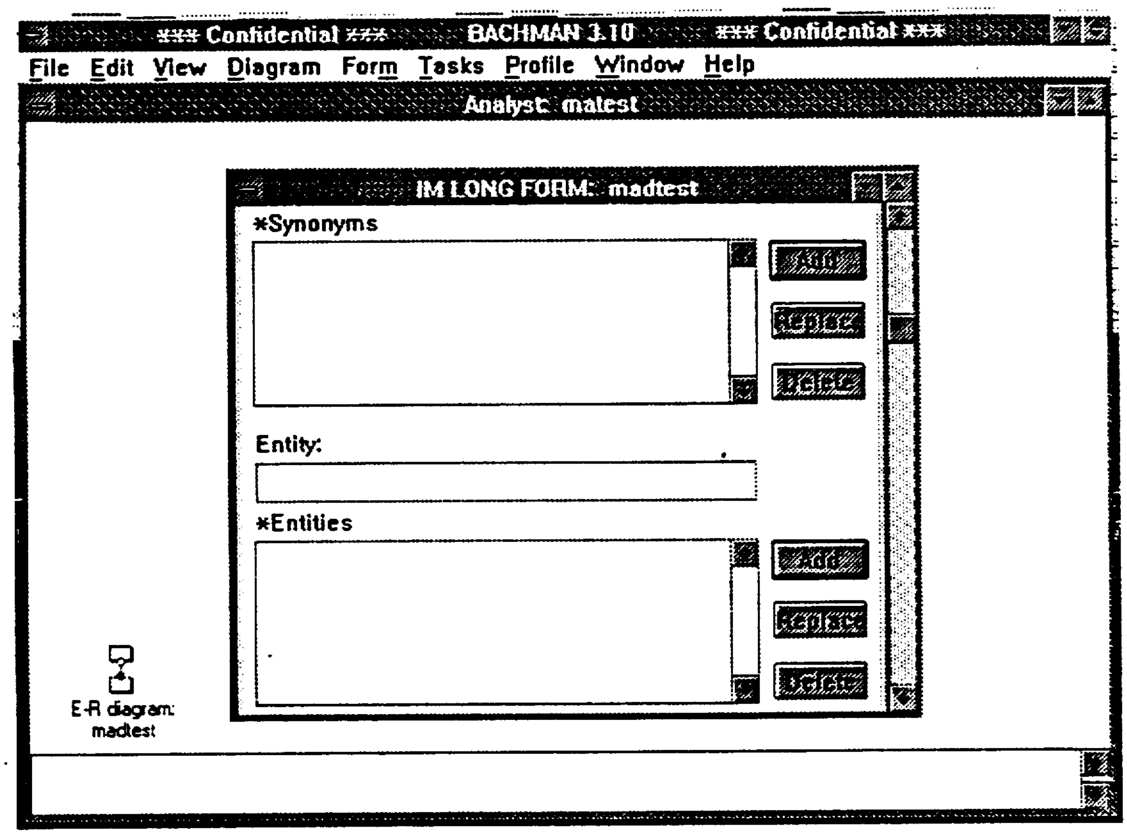
Figures 4, 11:
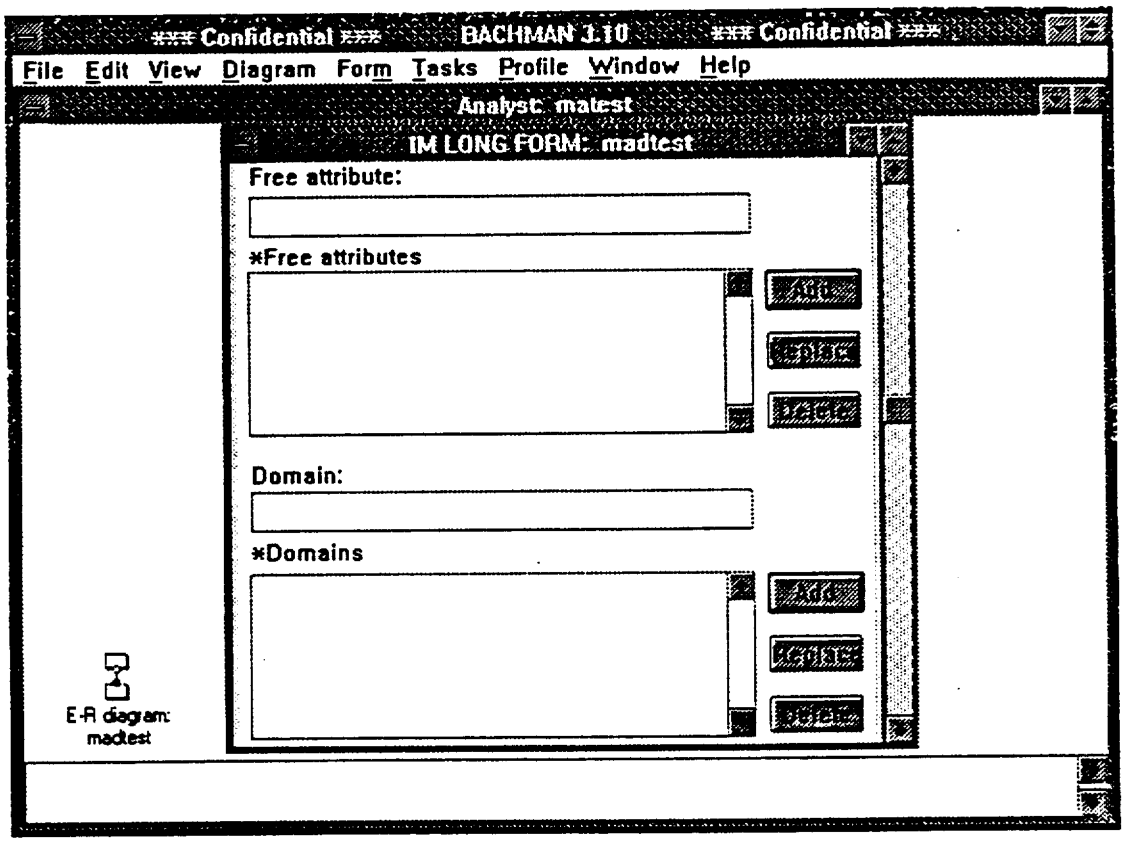
Figures 4, 11:
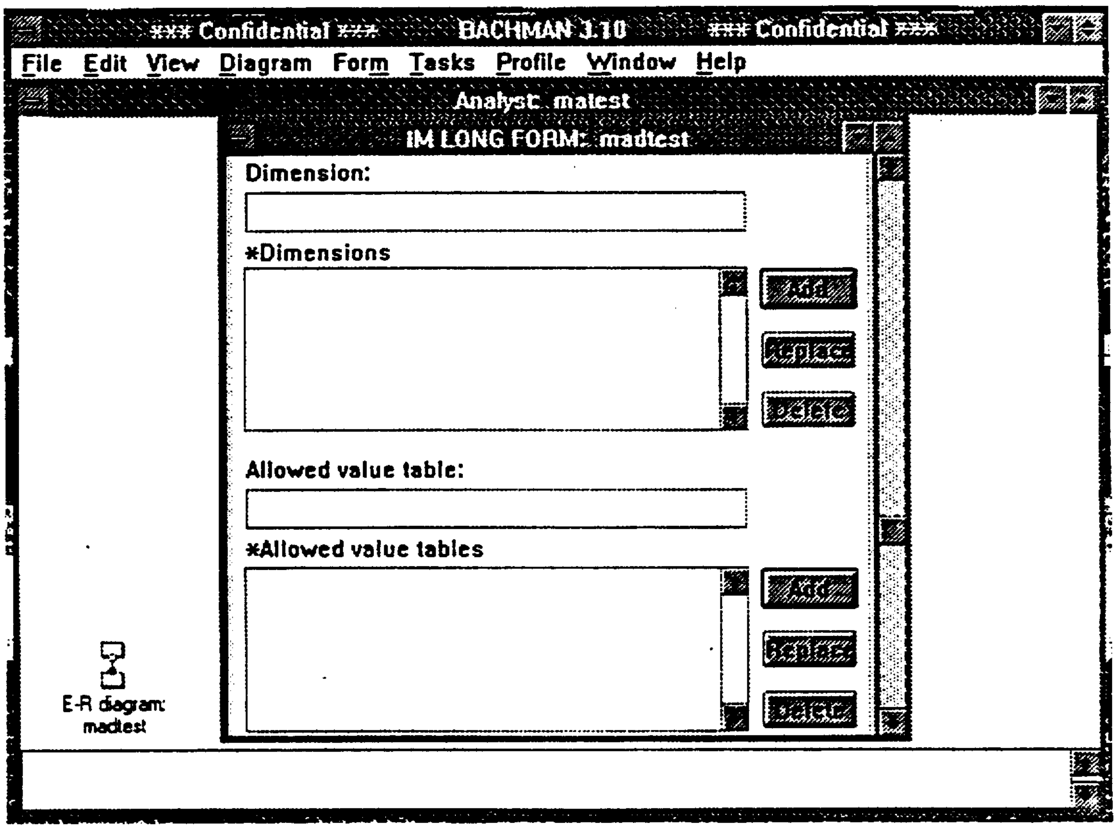
Figures 4, 11:
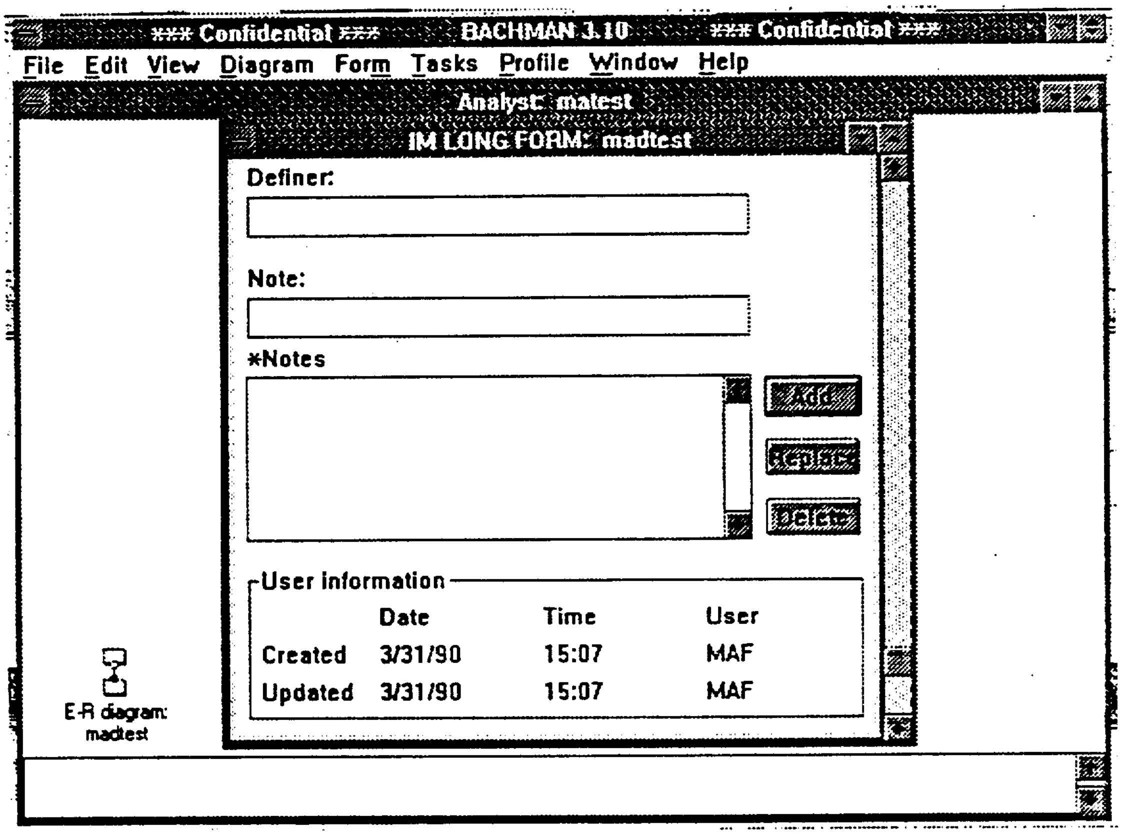
Figure 11:
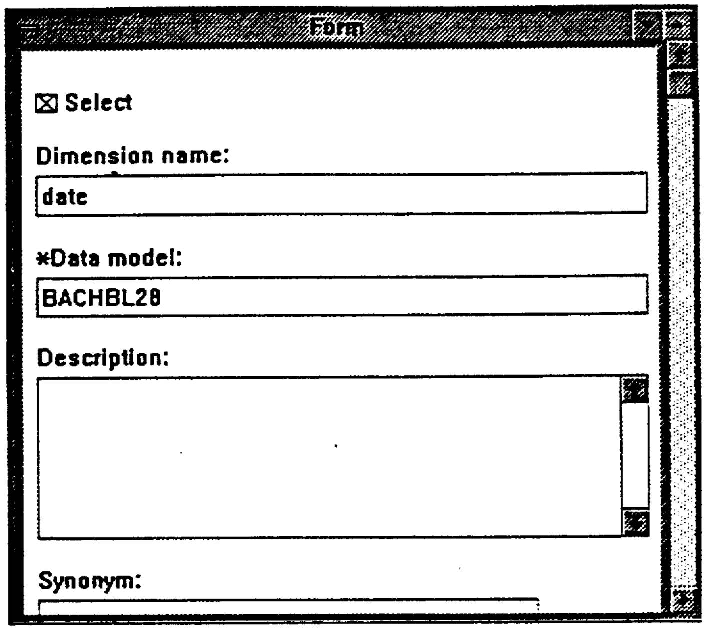
Figure 5:
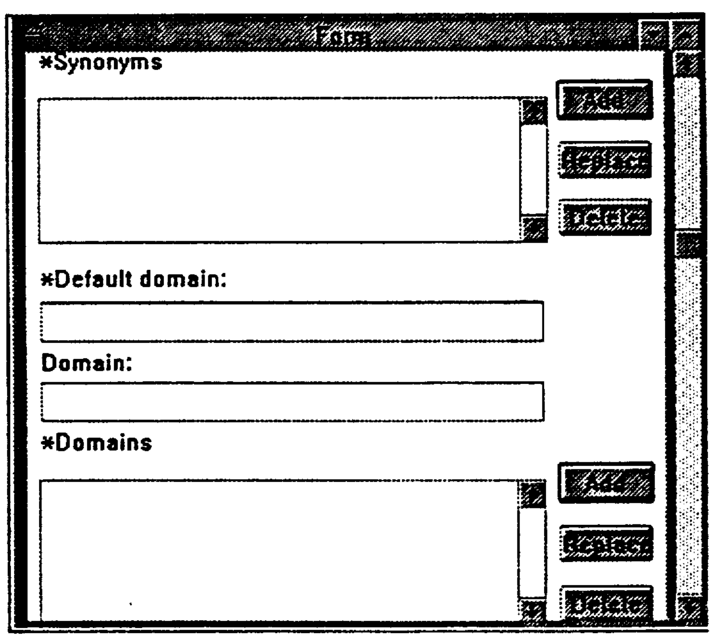
Figures 5, 11:
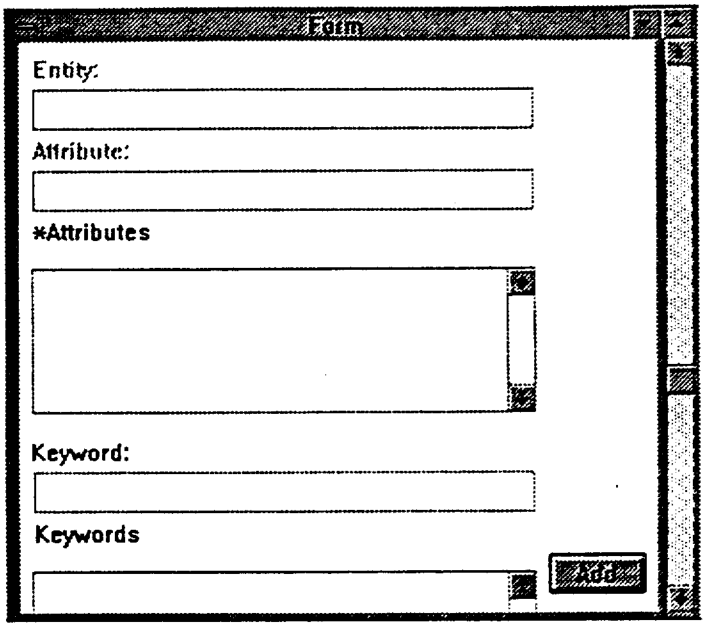
Figures 5, 11:
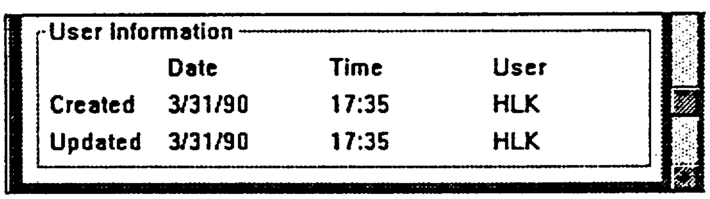
Figure 11:
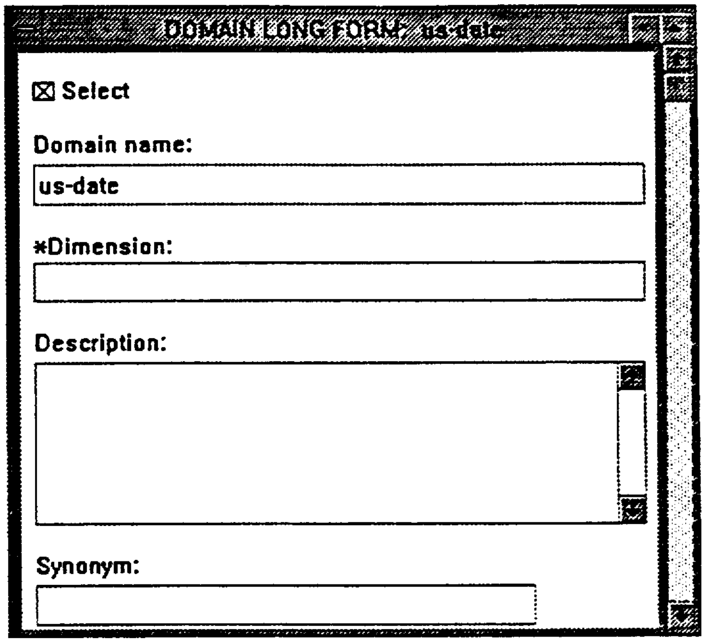
Figure 6:
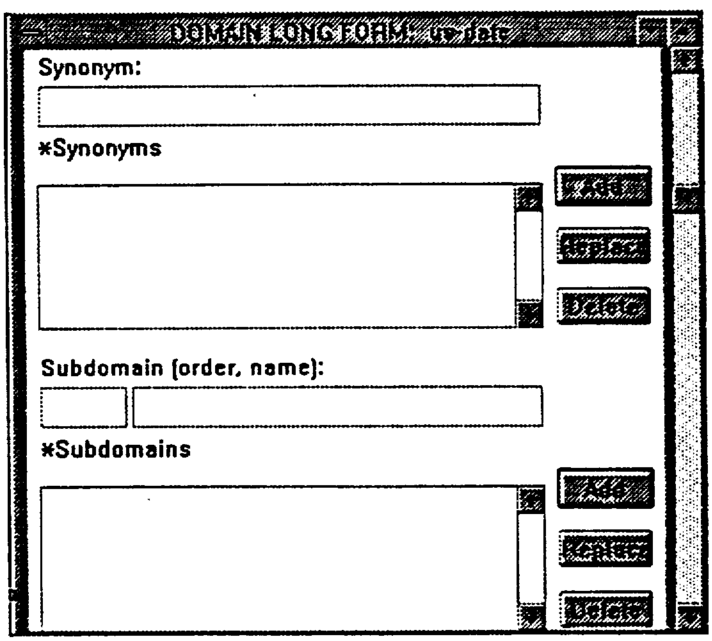
Figures 6, 11:
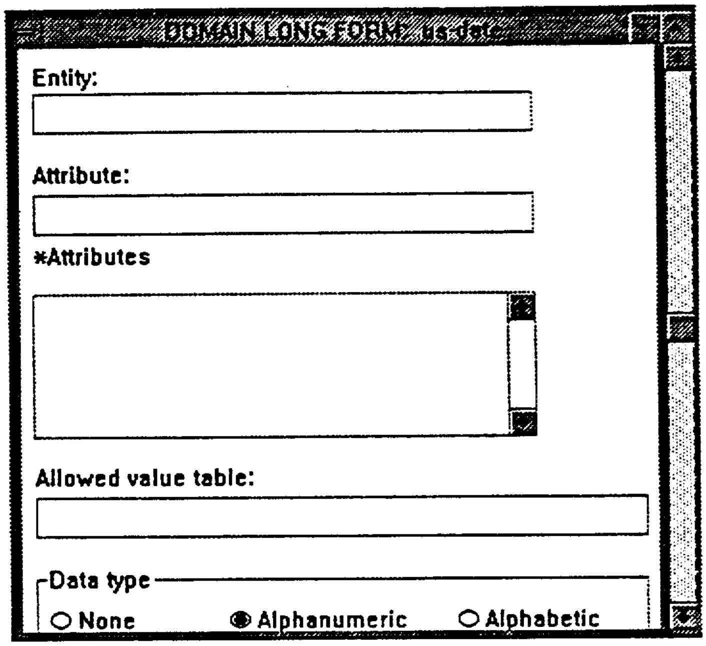
Figures 6, 11:
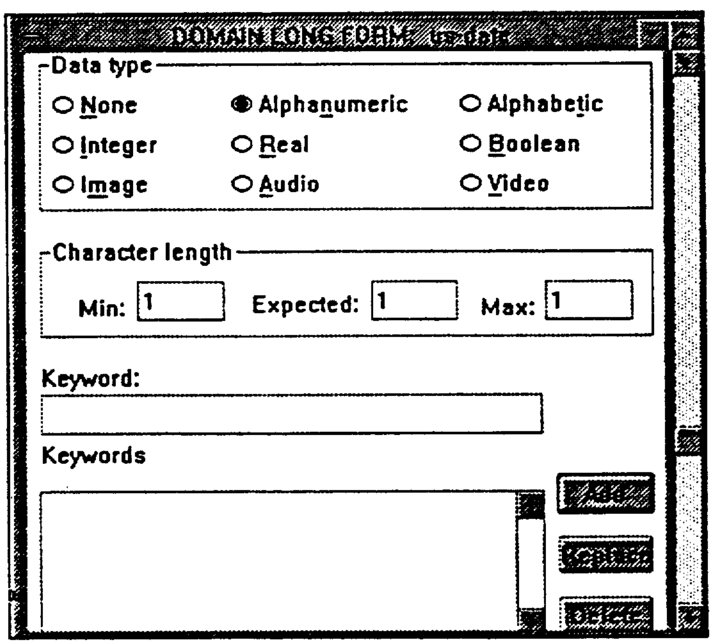
Figures 7, 11:
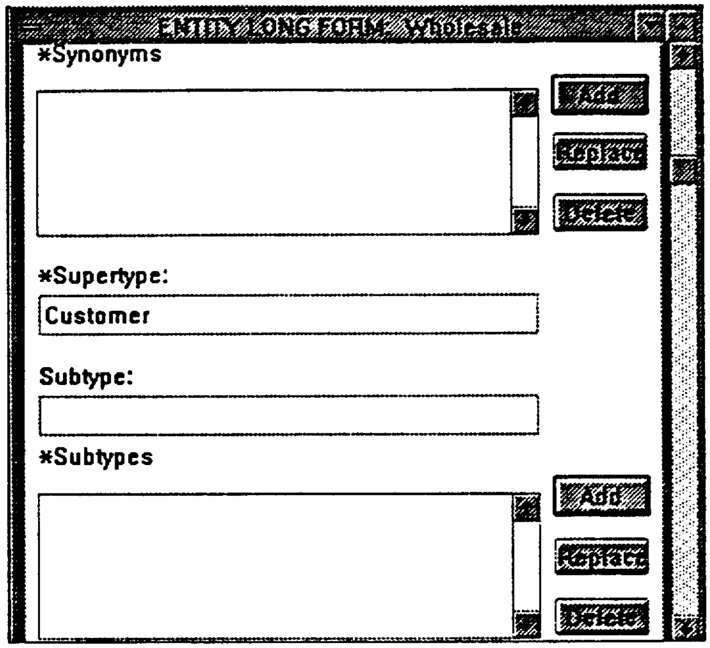
Figures 7, 11:
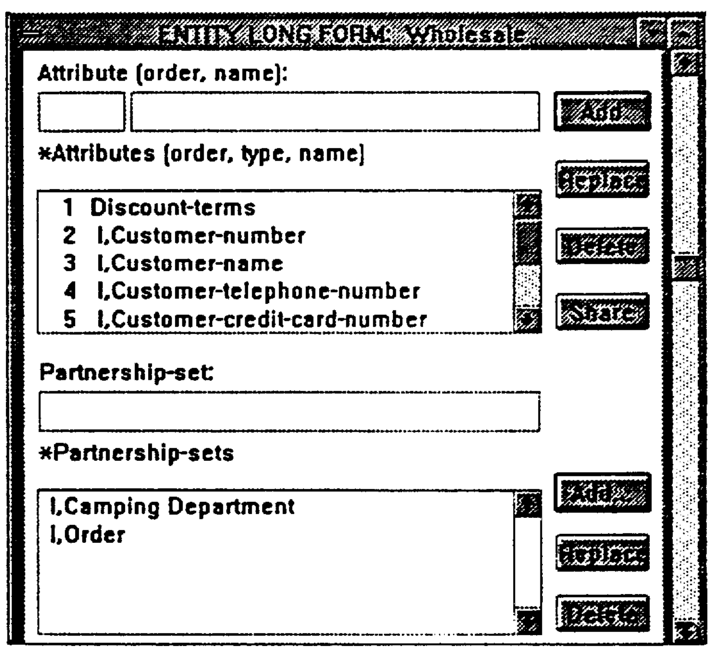
Figures 7, 11:
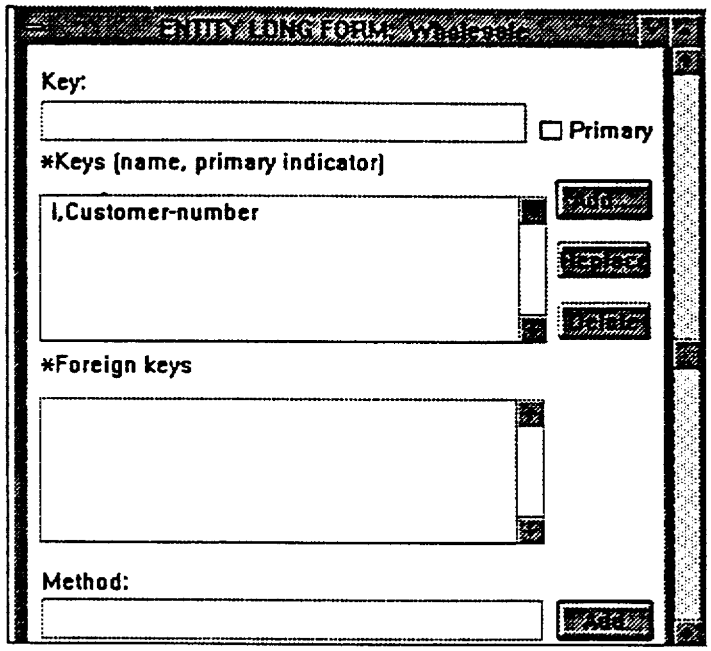
Figures 7, 11:
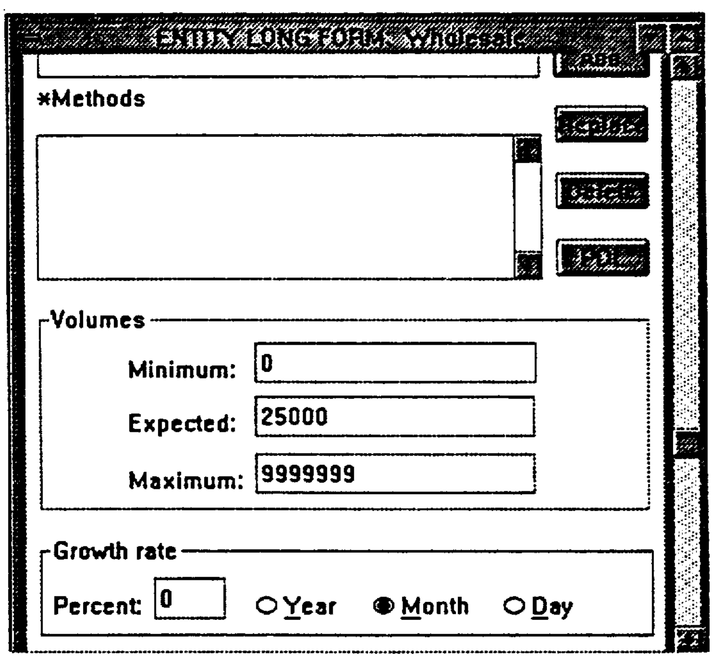
Figures 7, 11:
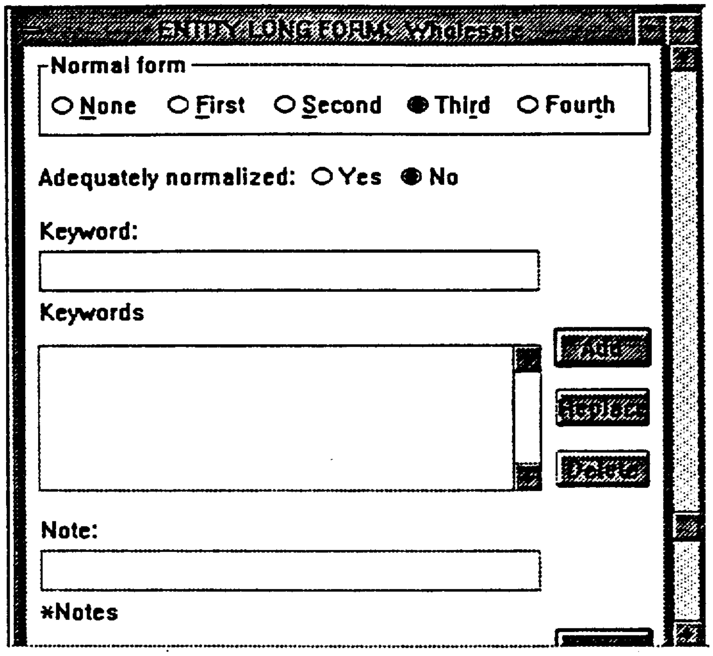
Figures 7, 11:
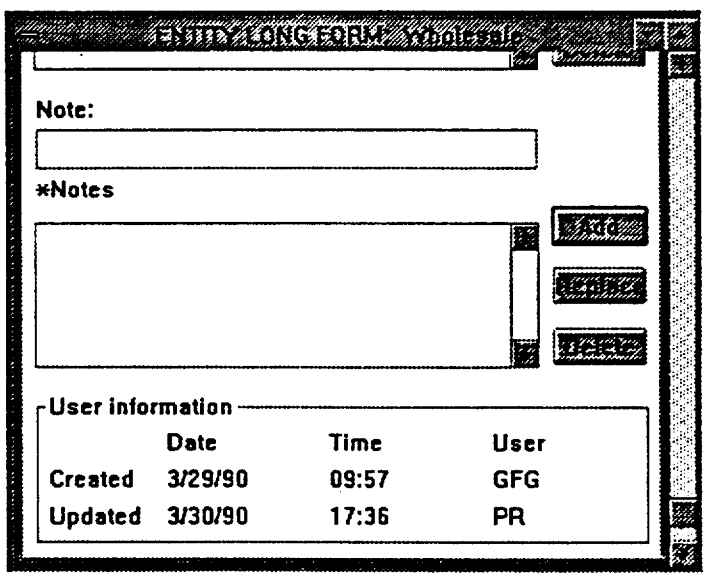
Figures 9, 11:
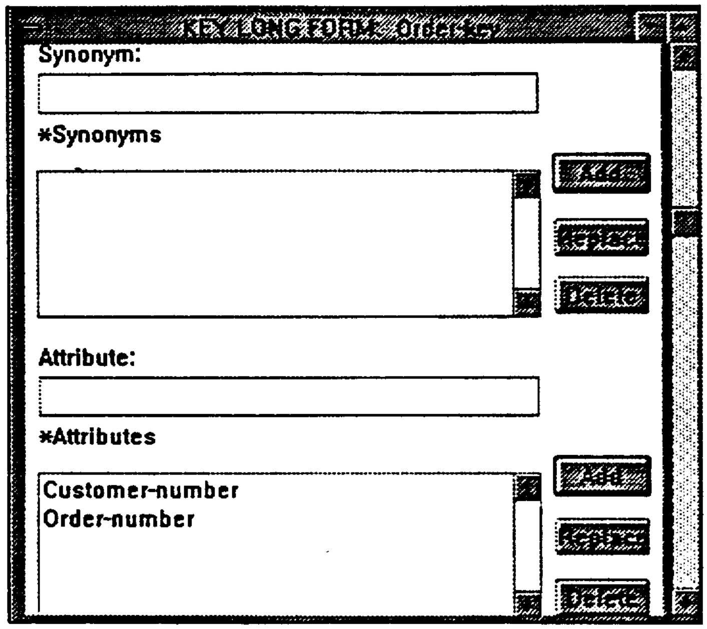
Figures 9, 11:
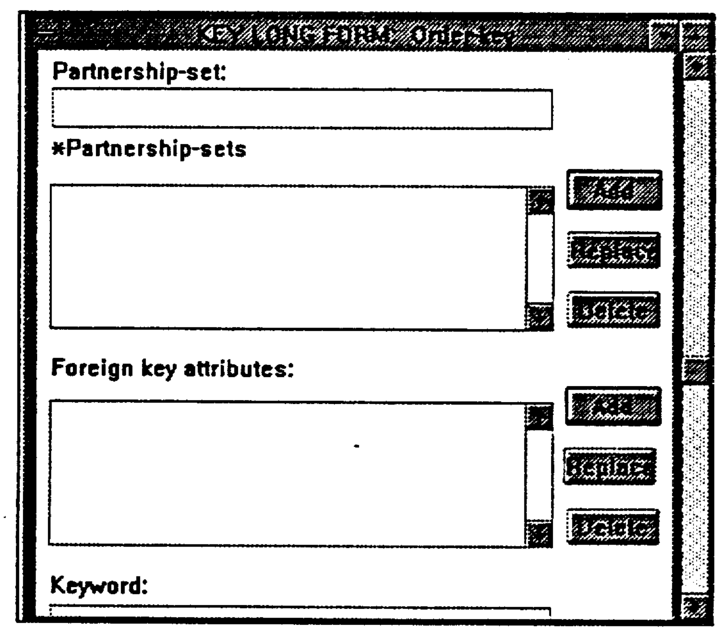
Figure 11:
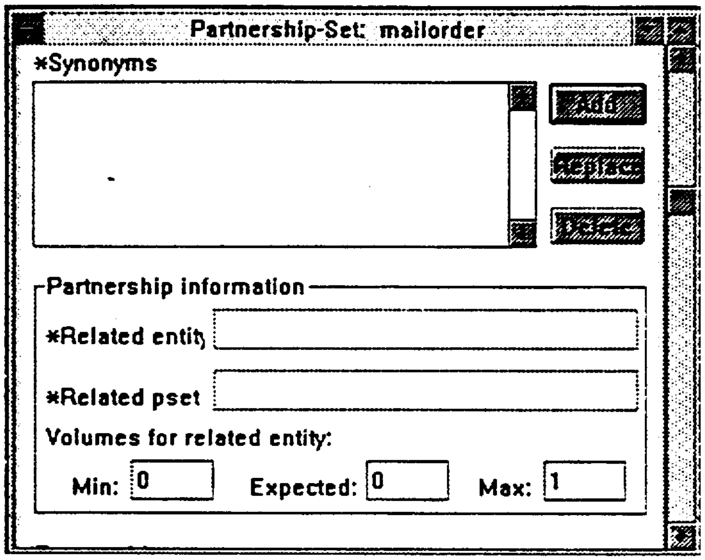
Figure 11:
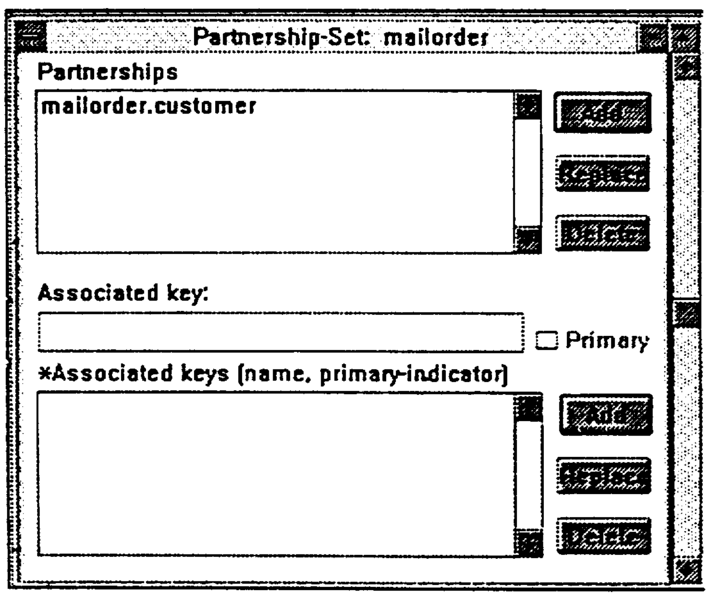
Figure 11:
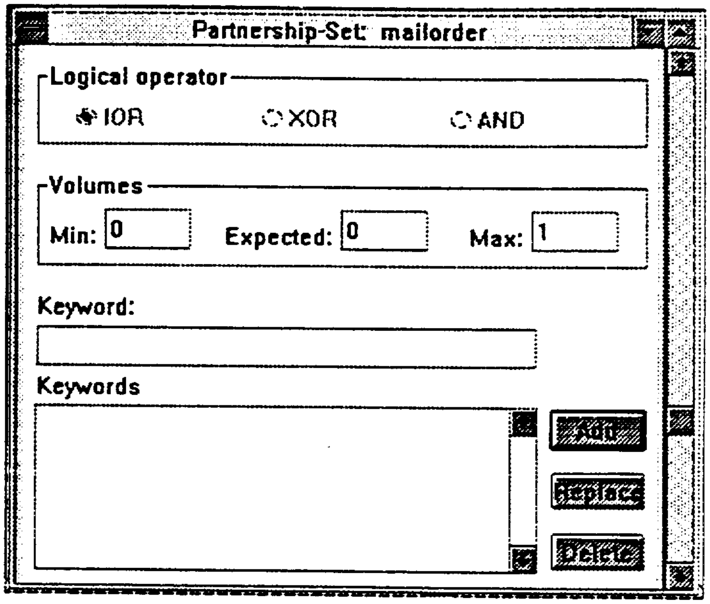
Figure 11:
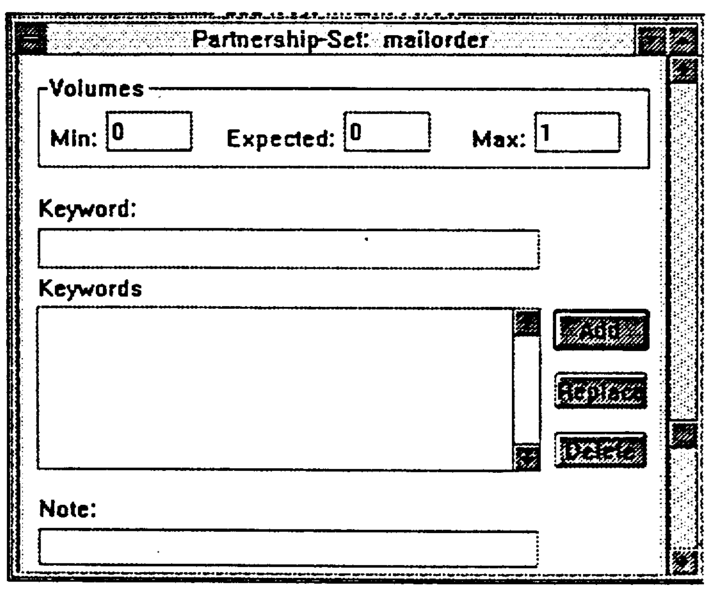
Figures 11, 12, 13, 13A:
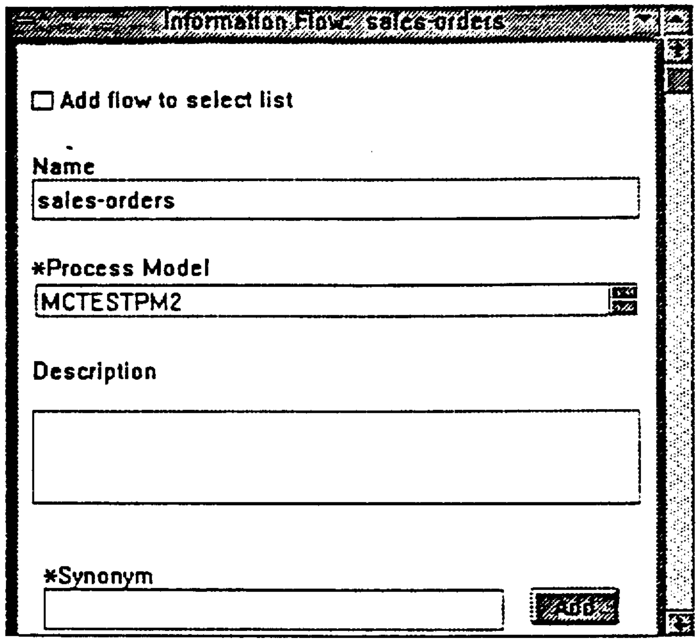
Figures 11, 12, 13, 13B:
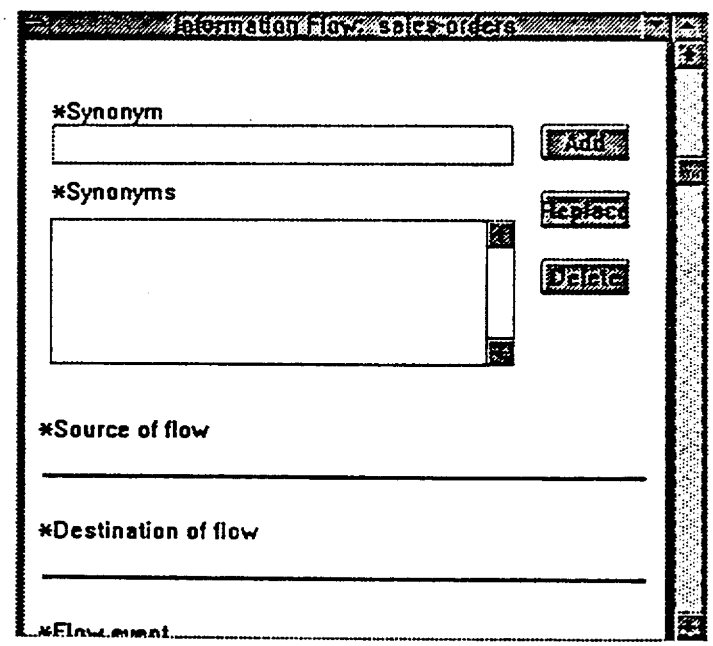
Figures 11, 12, 13, 13C:
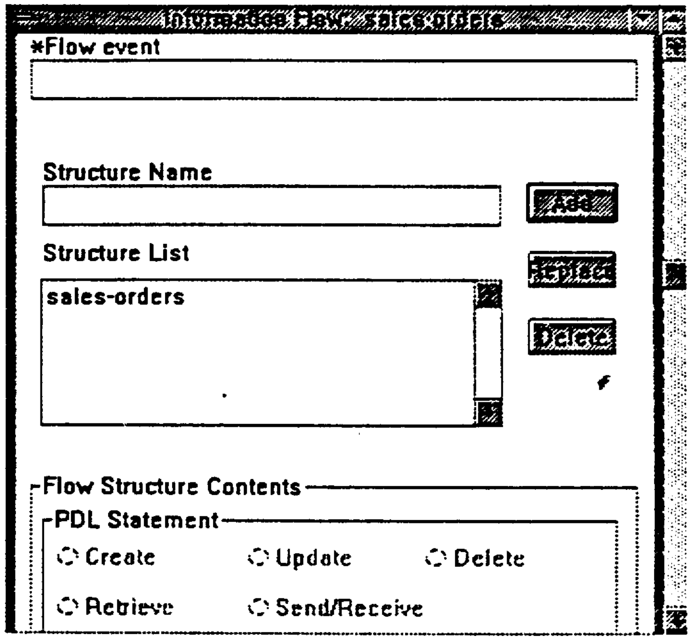
Figures 11, 12, 13, 13D:
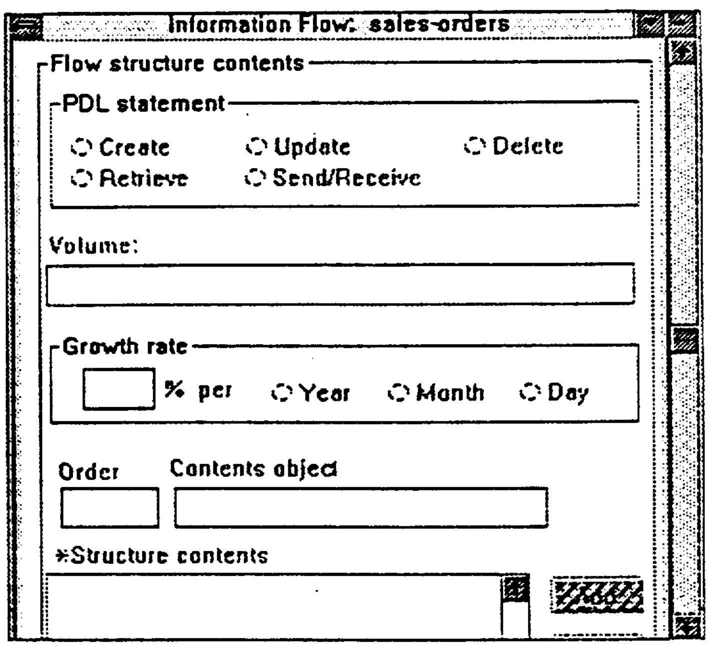
Figures 11, 12, 13, 13E:
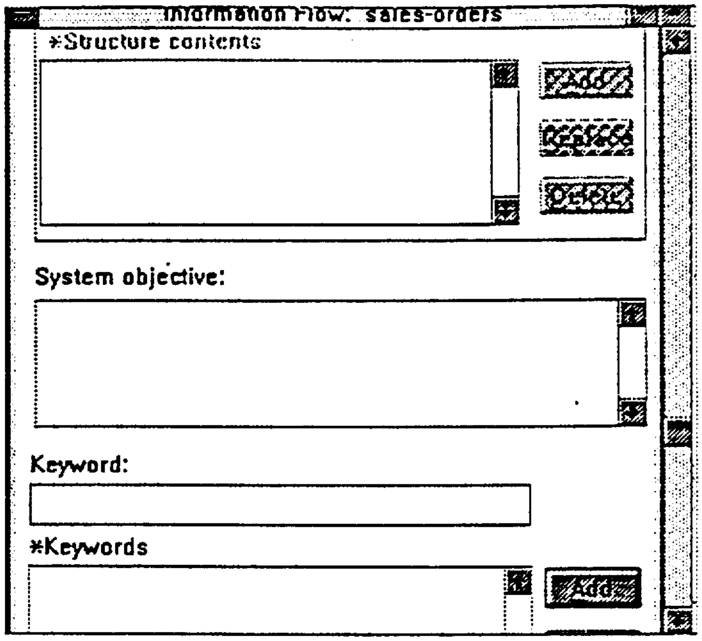
Figures 11, 12, 13, 13F:
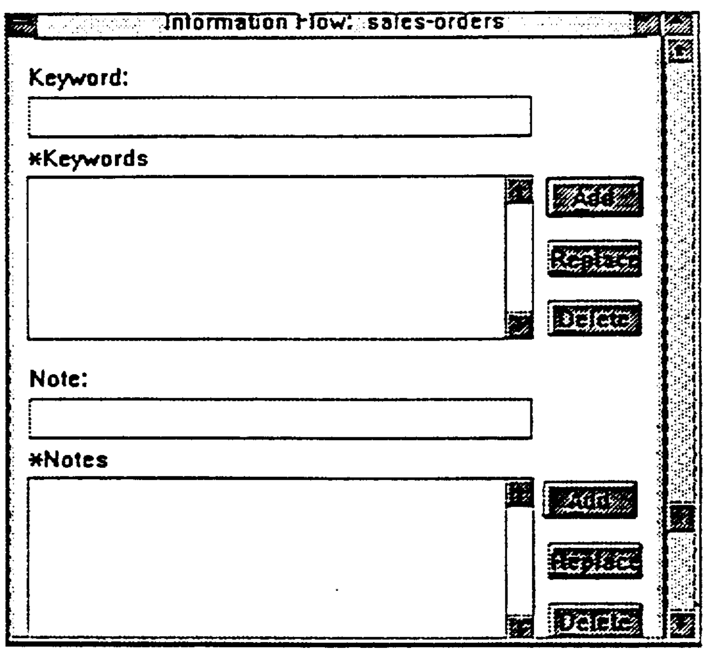
Figures 11, 12, 13, 13G:
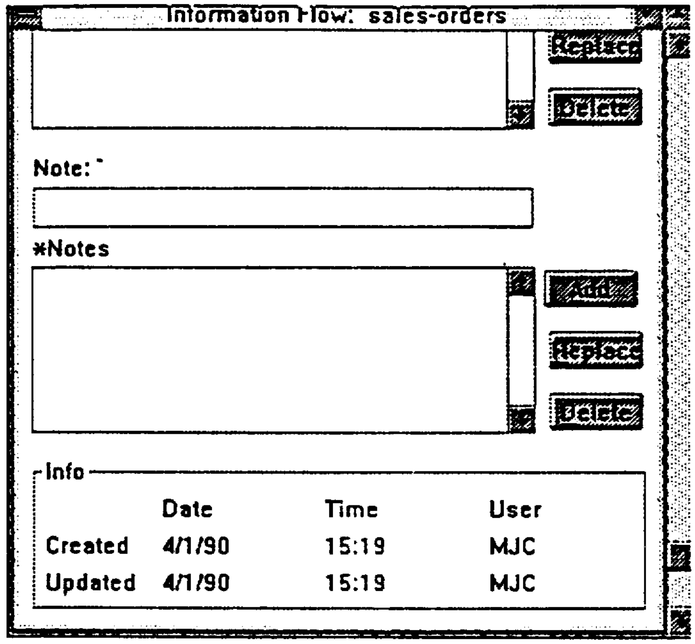
Figures 11, 12, 13, 14, 14A:
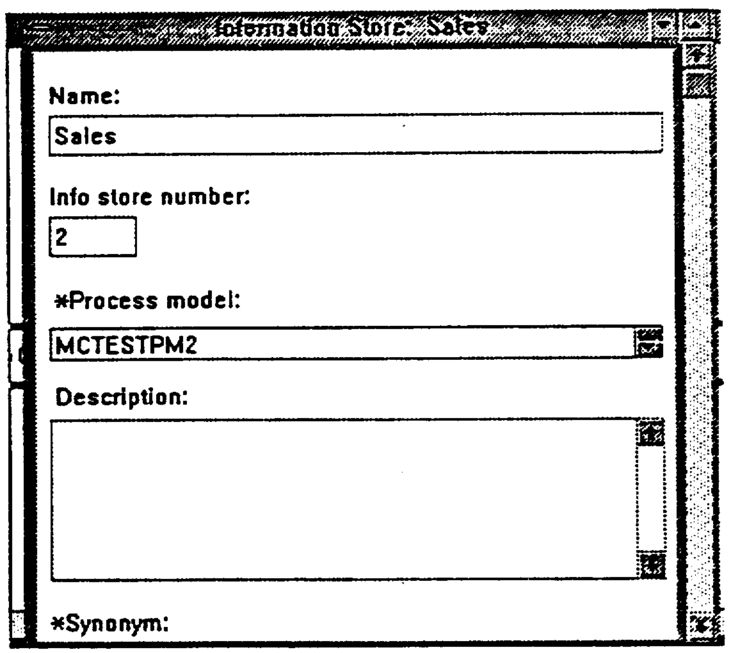
Figures 11, 12, 13, 14, 14B:
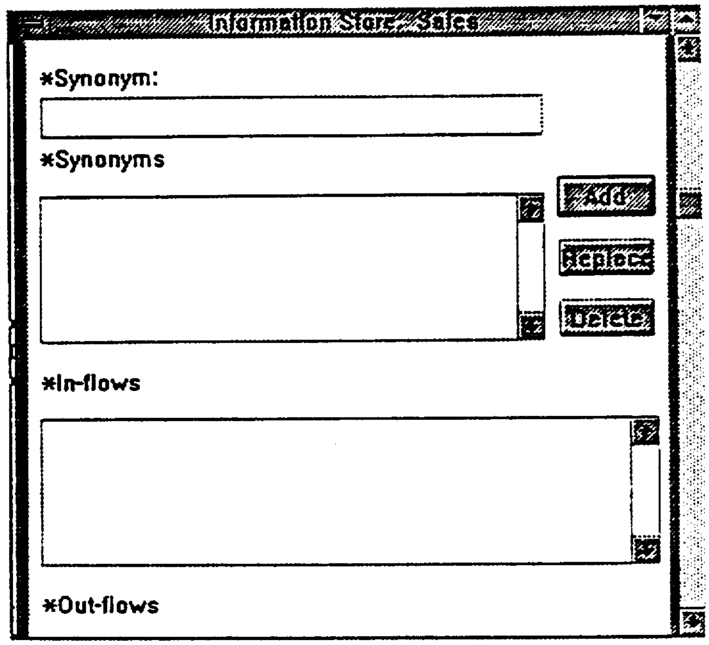
Figures 11, 12, 13, 14, 14C:
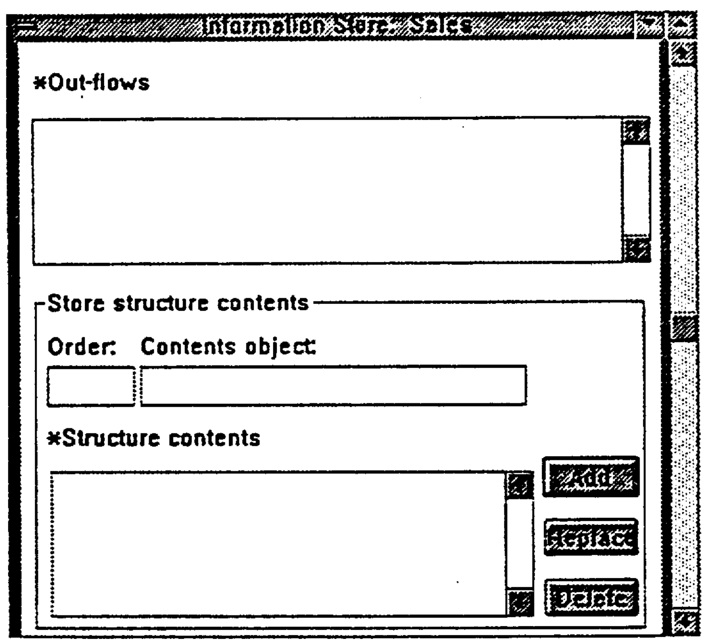
Figures 11, 12, 13, 14, 14D:
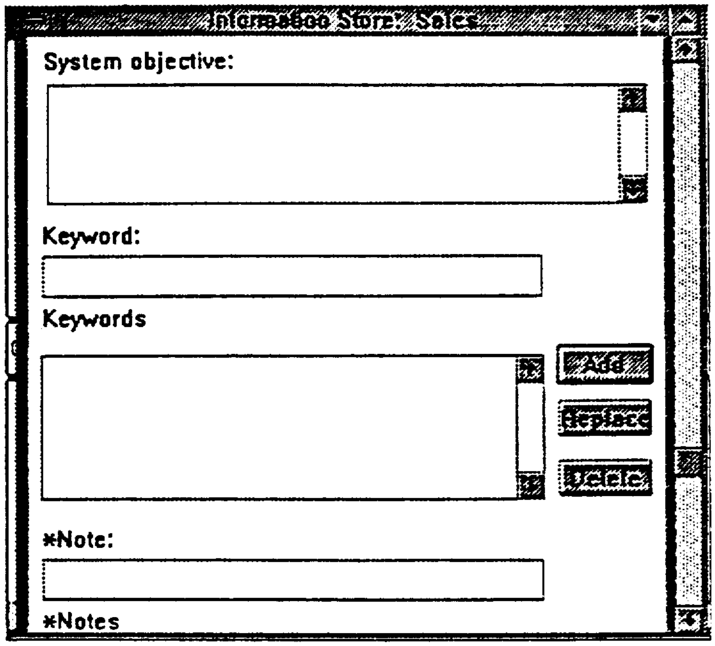
Figures 11, 12, 13, 14, 14E:
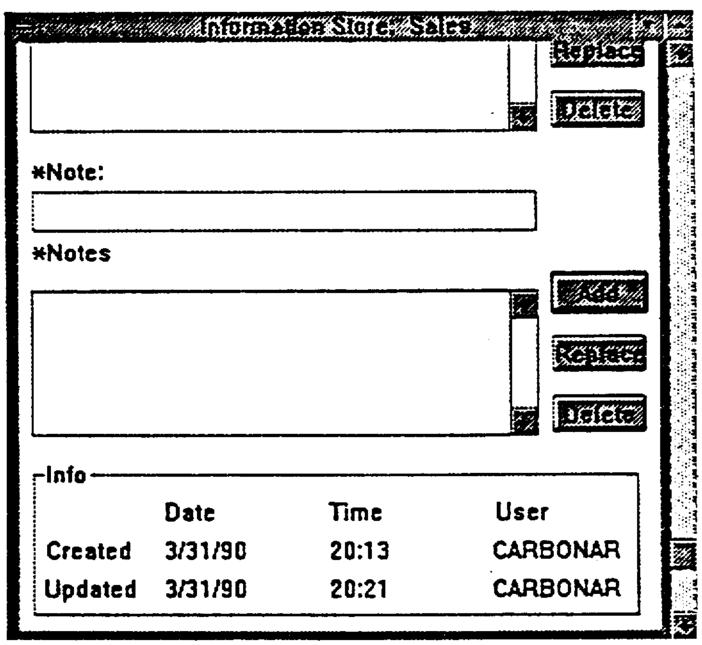
Figures 11, 12, 13, 14, 15, 15A:
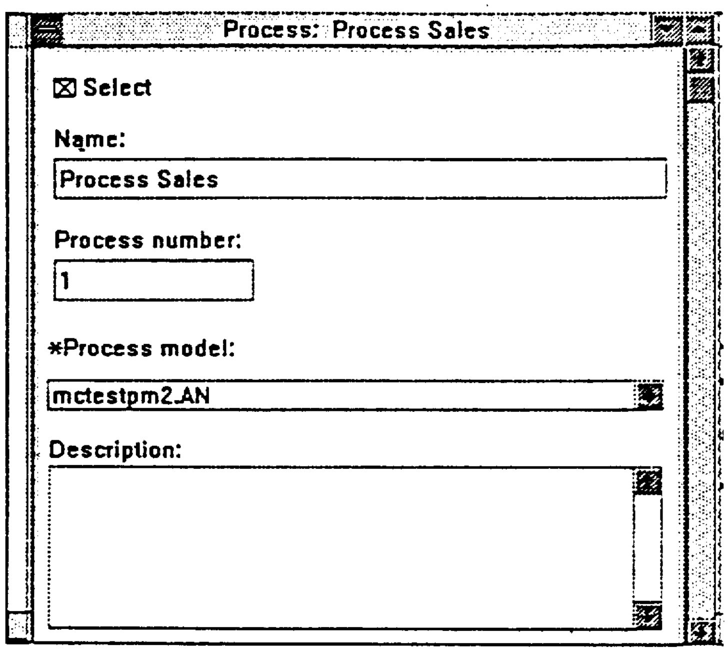
Figures 11, 12, 13, 14, 15, 15B:
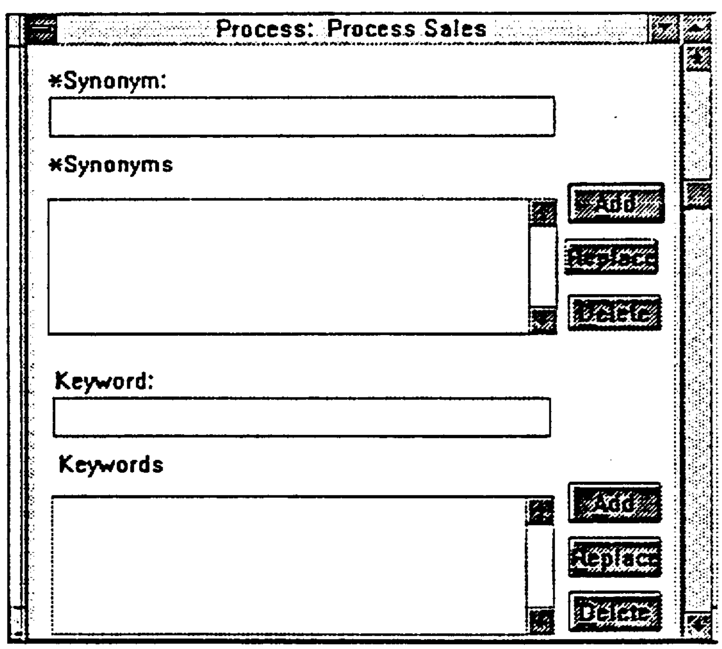
Figures 11, 12, 13, 14, 15, 15C:
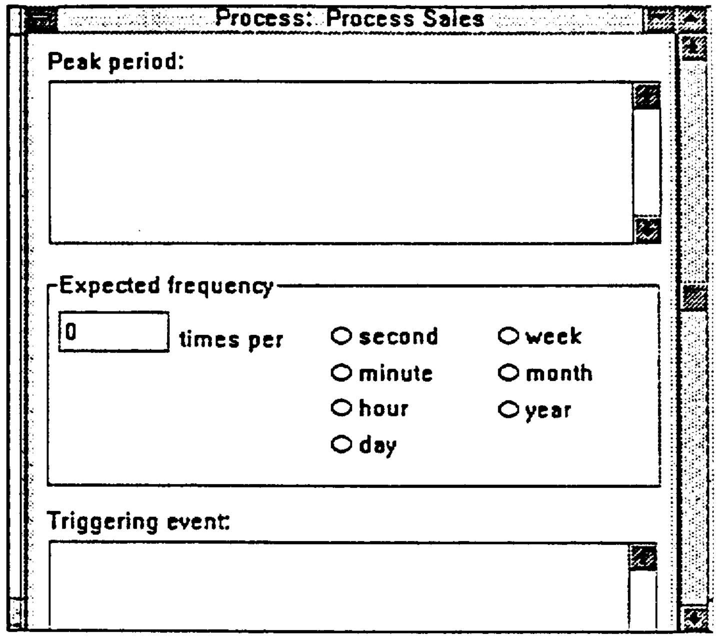
Figures 11, 12, 13, 14, 15, 15D:
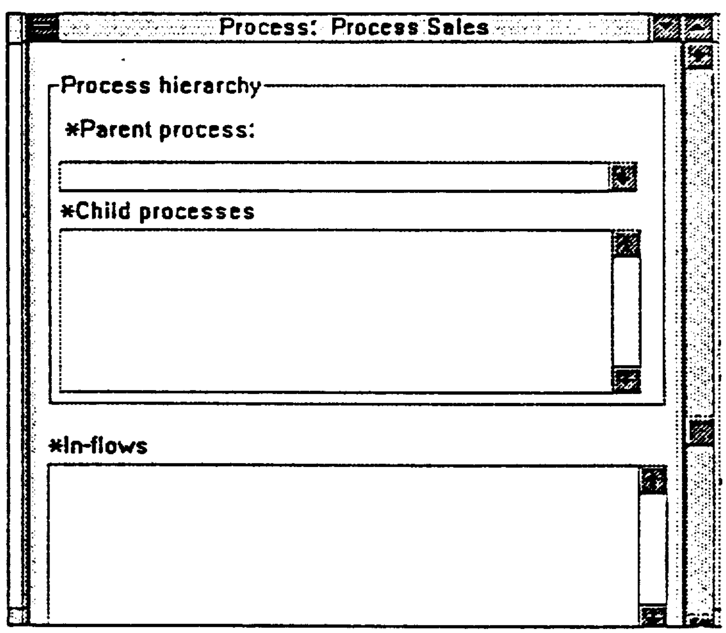
Figures 11, 12, 13, 14, 15, 15E:
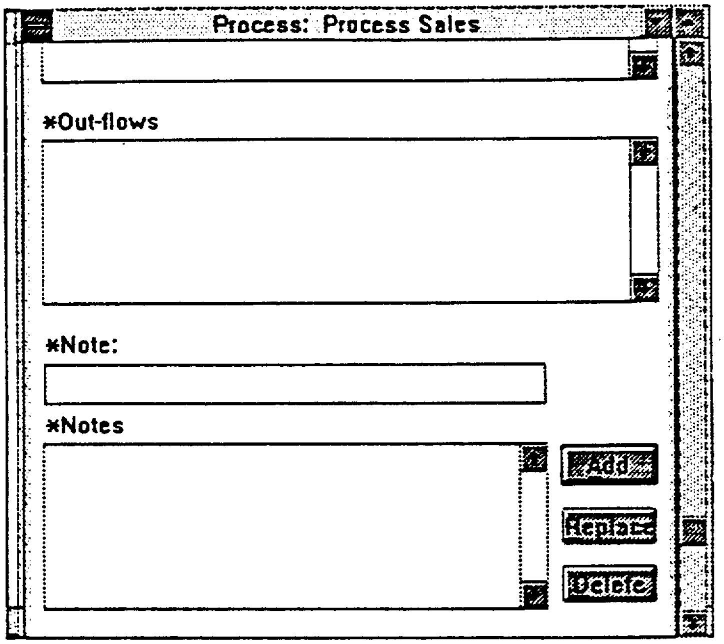
Figures 11, 12, 13, 14, 15, 15F:
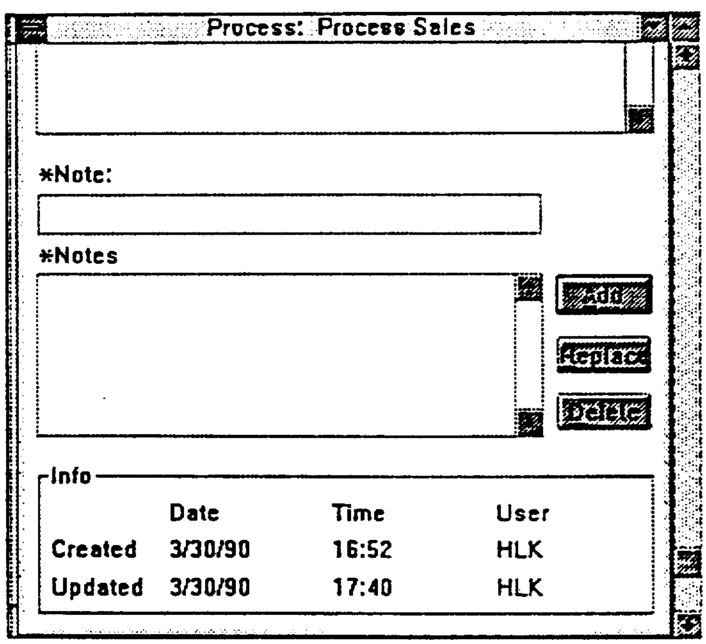
Figures 11, 12, 13, 14, 15, 16, 16A:
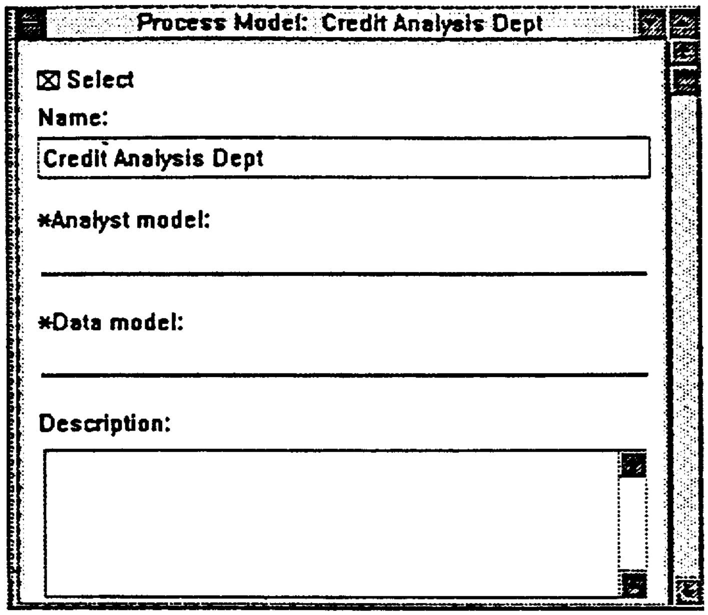
Figures 11, 12, 13, 14, 15, 16, 16B:
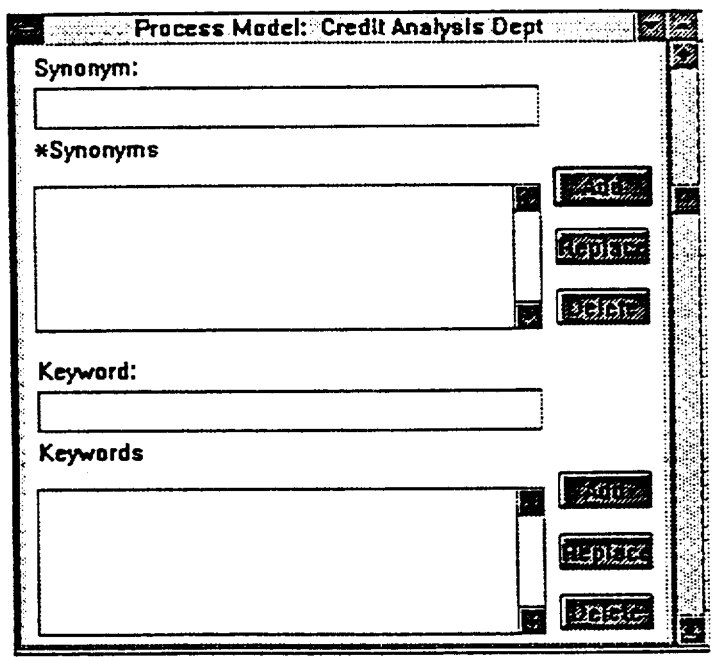
Figures 11, 12, 13, 14, 15, 16, 16C:
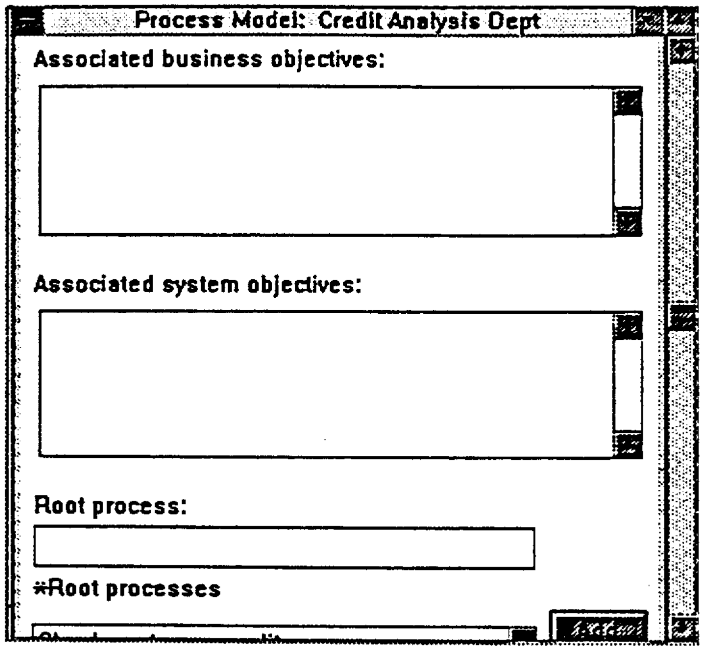
Figures 11, 12, 13, 14, 15, 16, 16D:
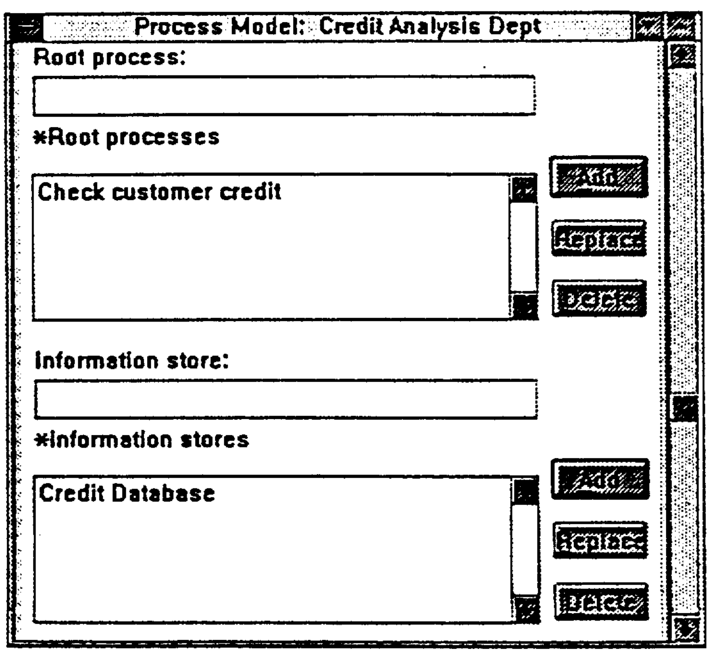
Figures 11, 12, 13, 14, 15, 16, 16E:
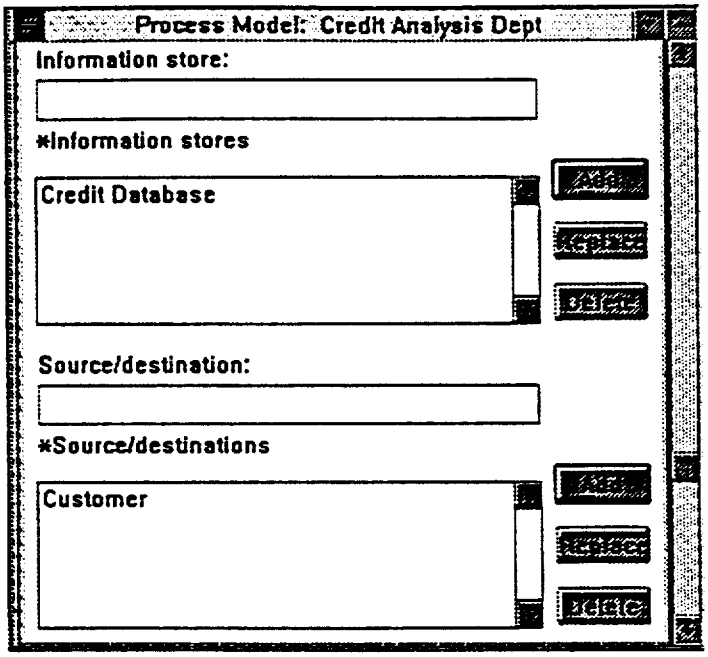
Figures 11, 12, 13, 14, 15, 16, 16F:
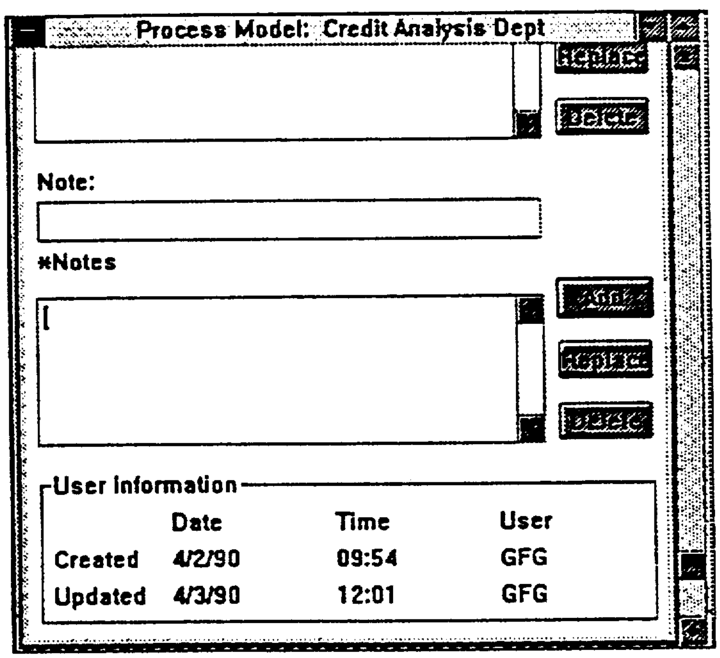
Figures 11, 12, 13, 14, 15, 16, 17, 17A:
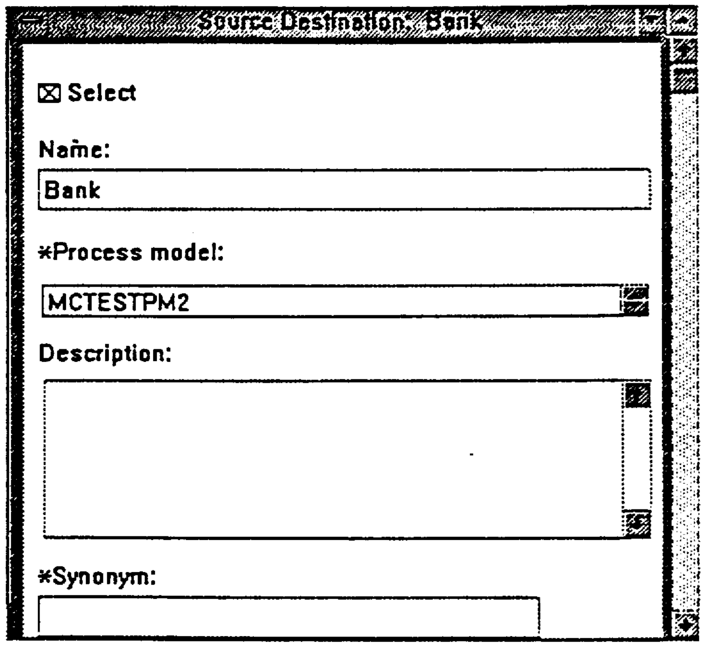
Figures 11, 12, 13, 14, 15, 16, 17, 17B:
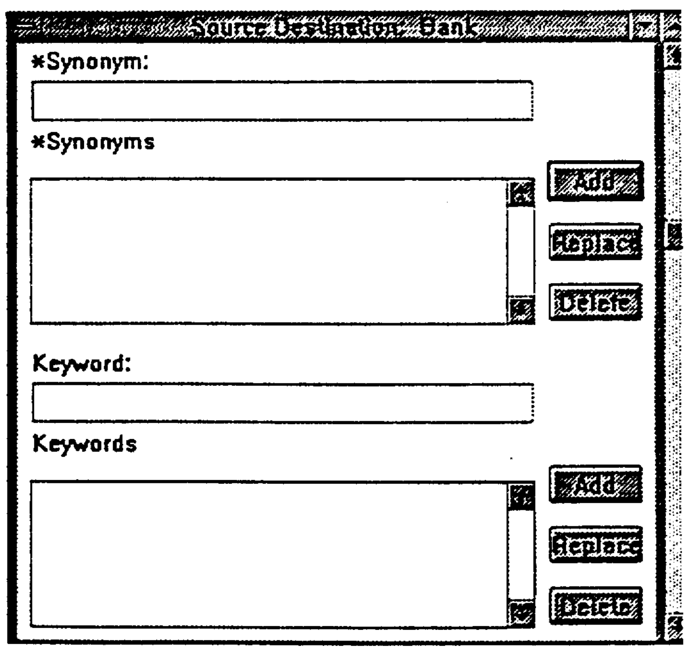
Figures 11, 12, 13, 14, 15, 16, 17, 17C:
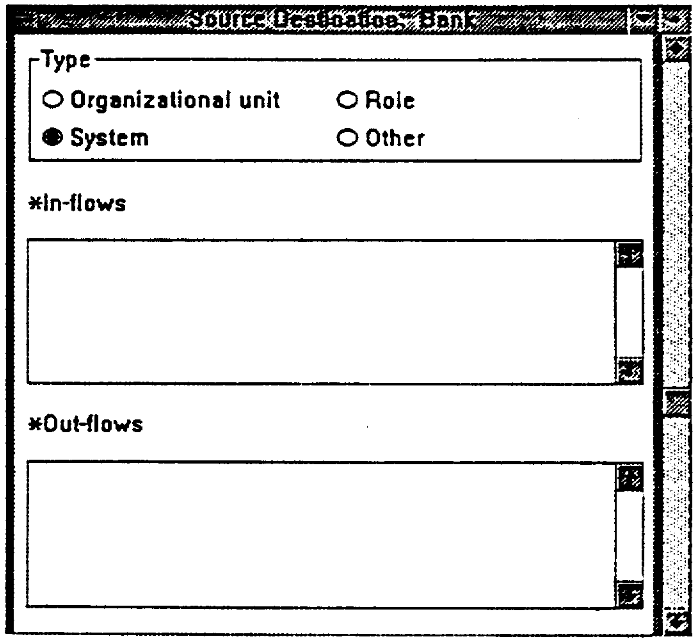
Figures 11, 12, 13, 14, 15, 16, 17, 17D:
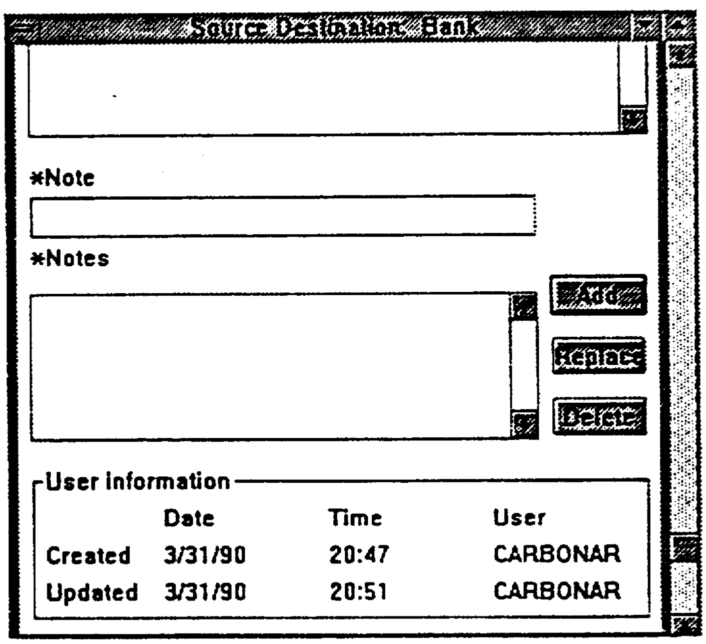
Figures 11, 12, 13, 14, 15, 16, 17, 18, 19:
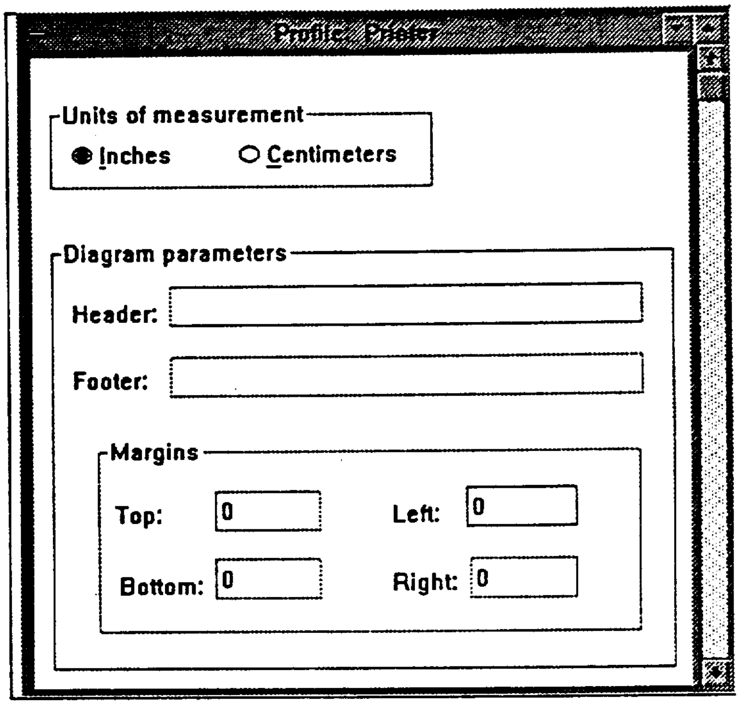
Figures 11, 12, 13, 14, 15, 16, 17, 18, 19:
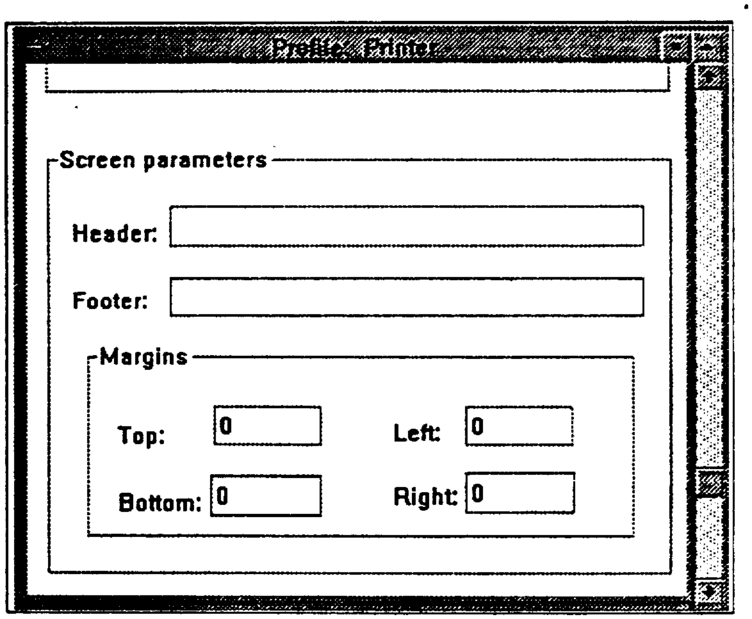
Figures 11, 12, 13, 14, 15, 16, 17, 18, 19, 20:
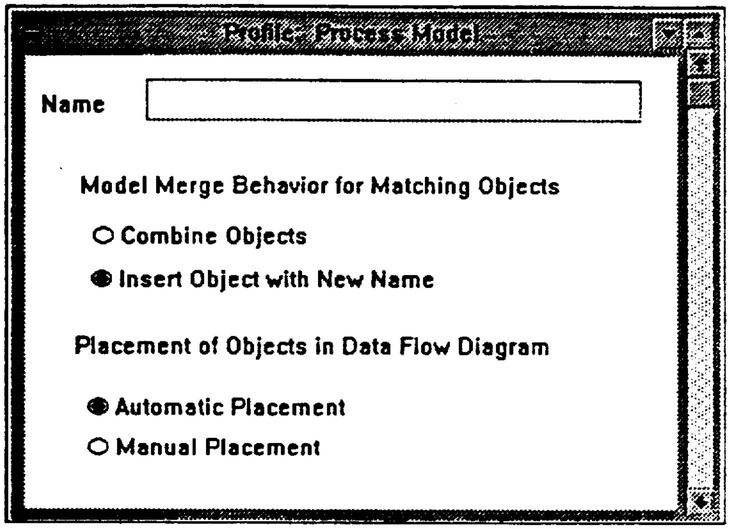
Figures 11, 12, 13, 14, 15, 16, 17, 18, 19, 20, 21:
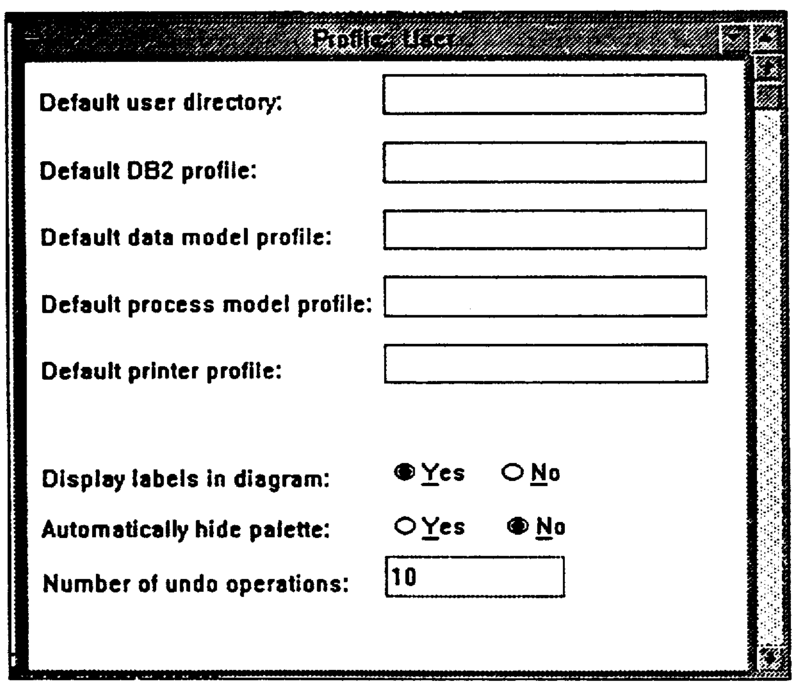

In an IFM diagram 50 a user can create a high-level process 56 for a process or group of processes by defining process boundaries 70. In the illustrated embodiment, and as shown in FIGS. 6A and 6B, the system prompts the user to name the new high-level process, and then draws the new process 74 around the selected, or "boundaried", processes 72. The original processes 72 become subprocesses of the new process 74. Making a new process boundary 70 is a way of changing the hierarchy of processes in the process model. Each new high-level process has a form. This form lists the subprocesses in the process hierarchy fields of display. Likewise, the forms for each subprocess list the new process as the top-level process. In a similar manner, process boundaries 70 may be undone, returning the process model to the state it was in before the process boundary 70 was created.

Function Modeler

Figures 1, 2:
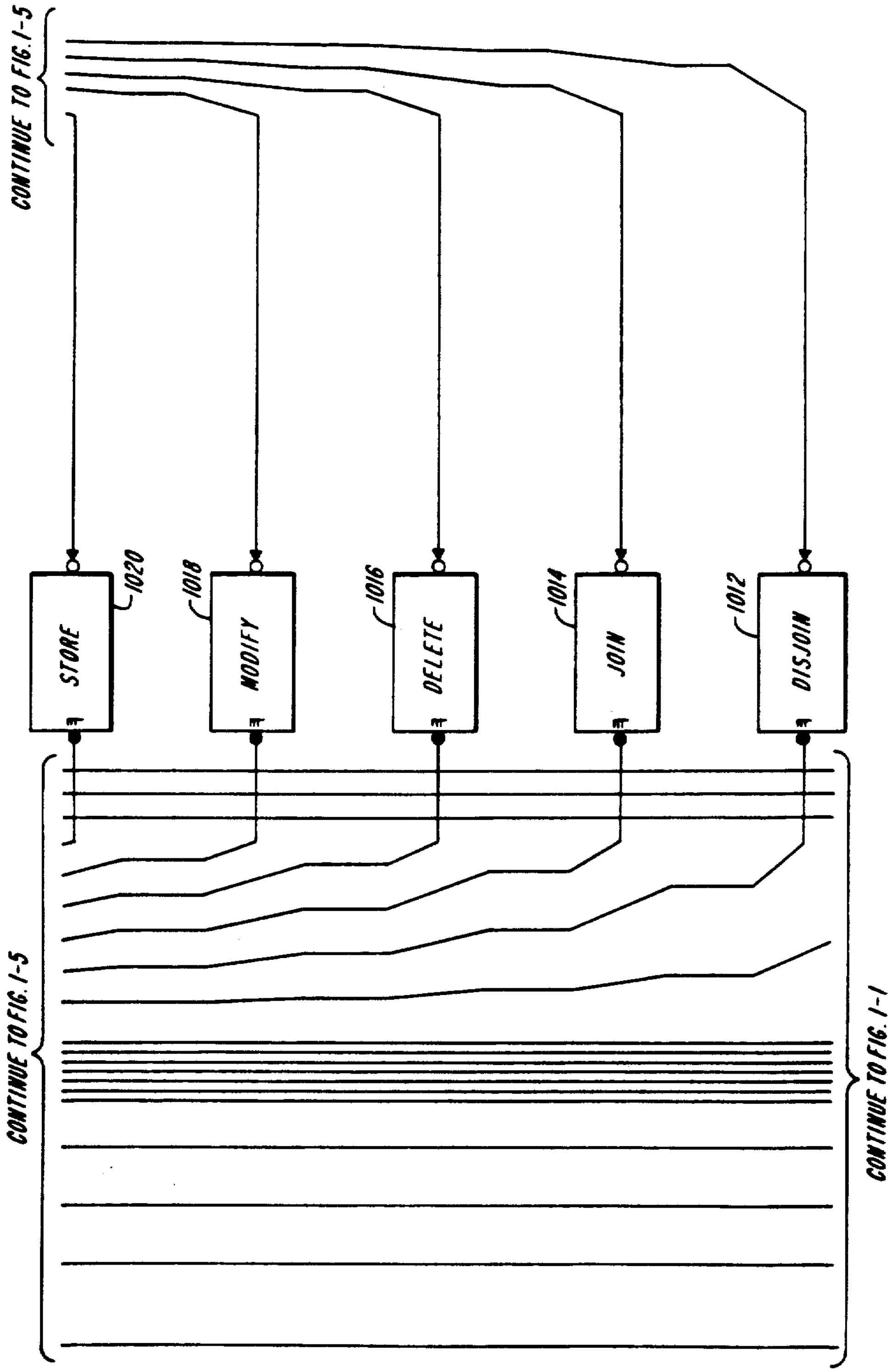
Figures 1, 2, 3:
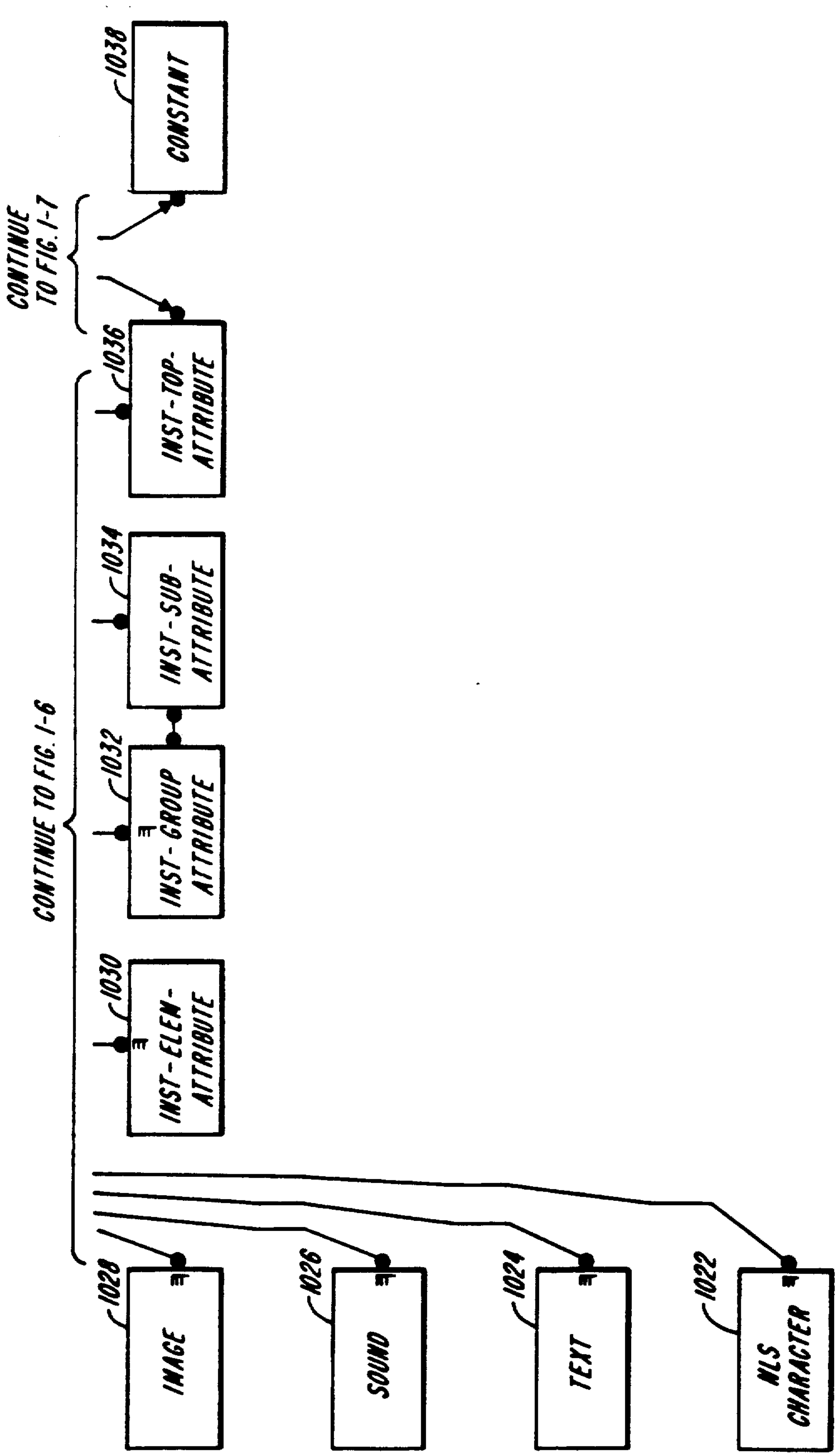
Figures 1, 2, 3, 4:
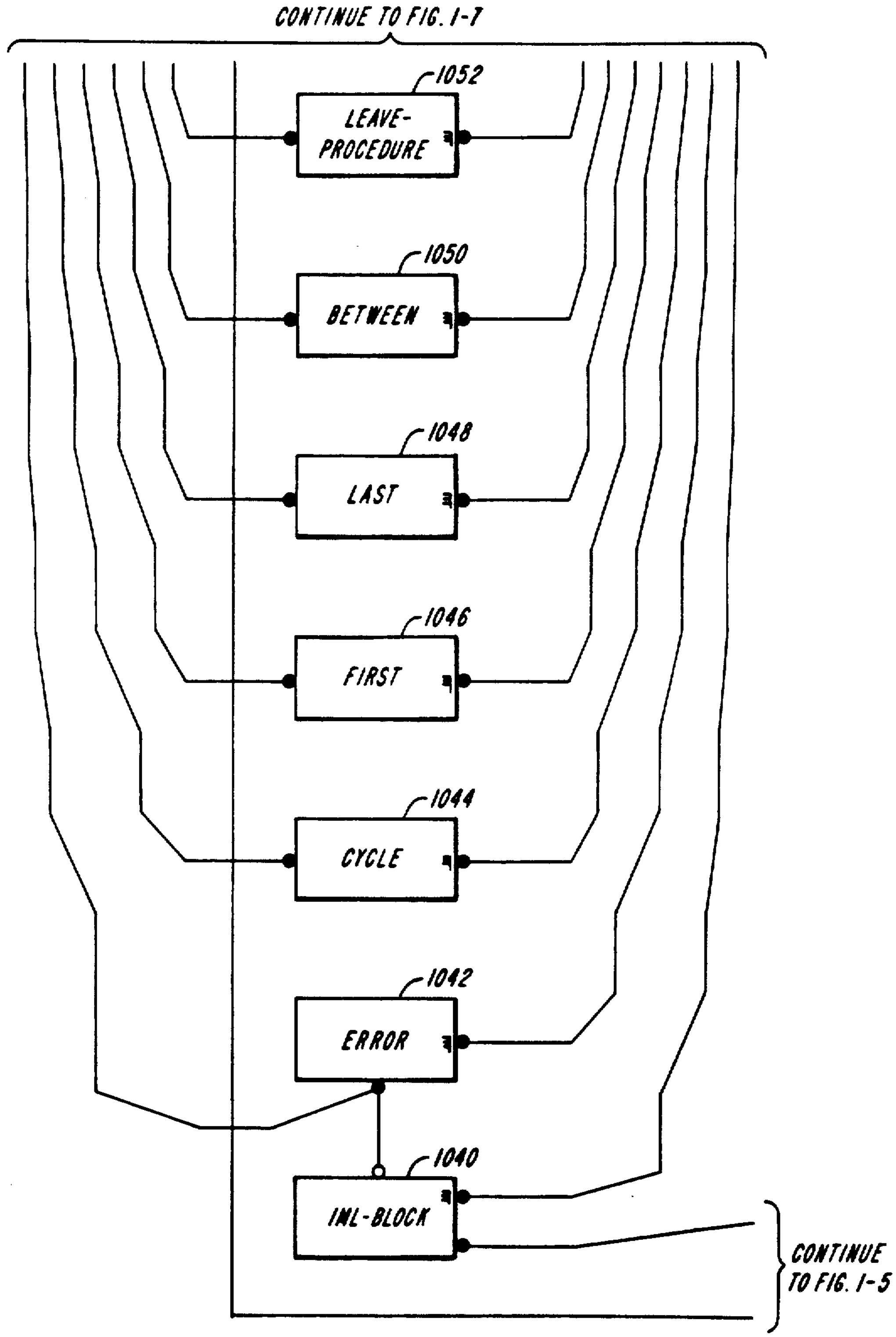
Figures 1, 2, 3, 4, 5:
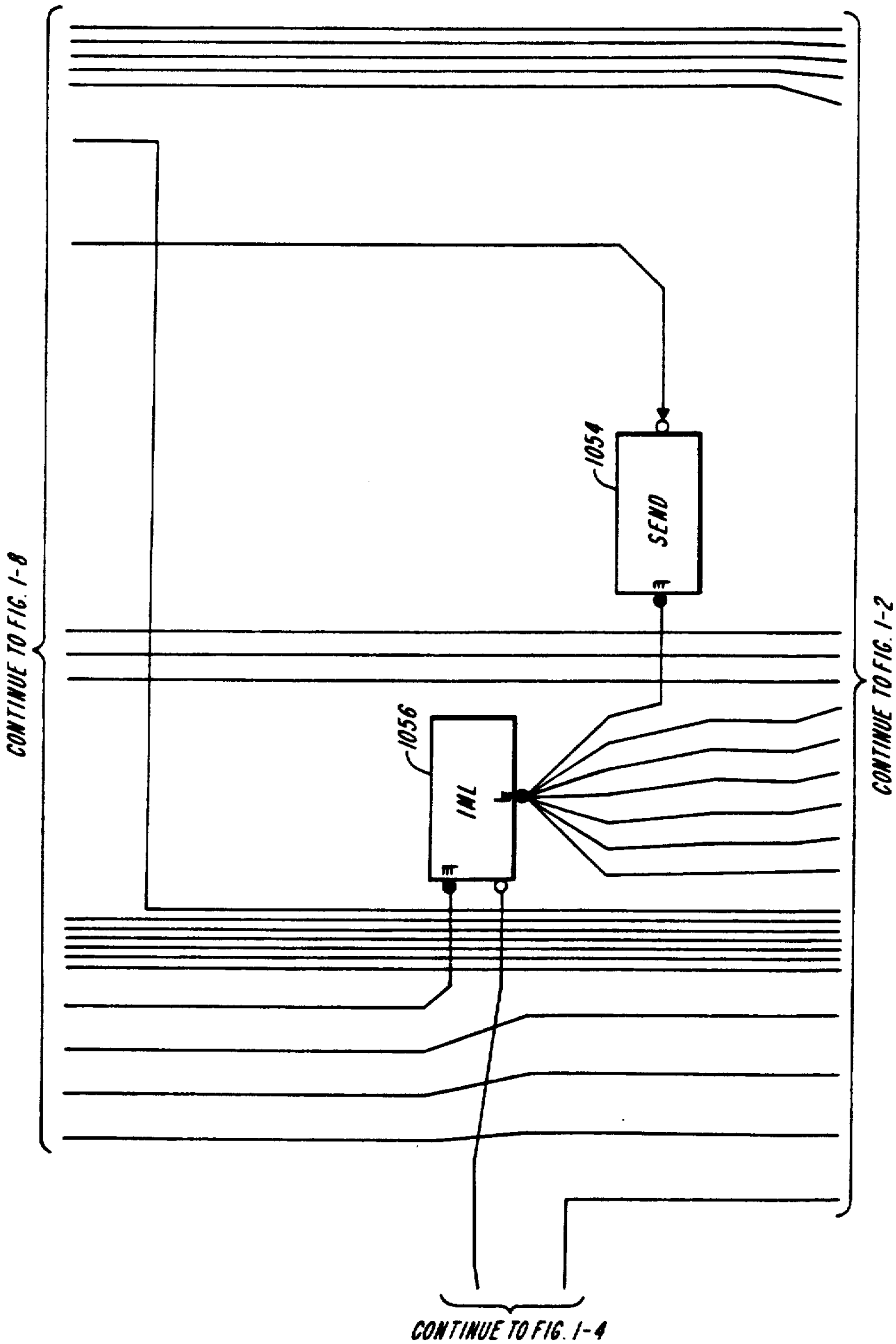
Figures 1, 2, 3, 4, 5, 6:
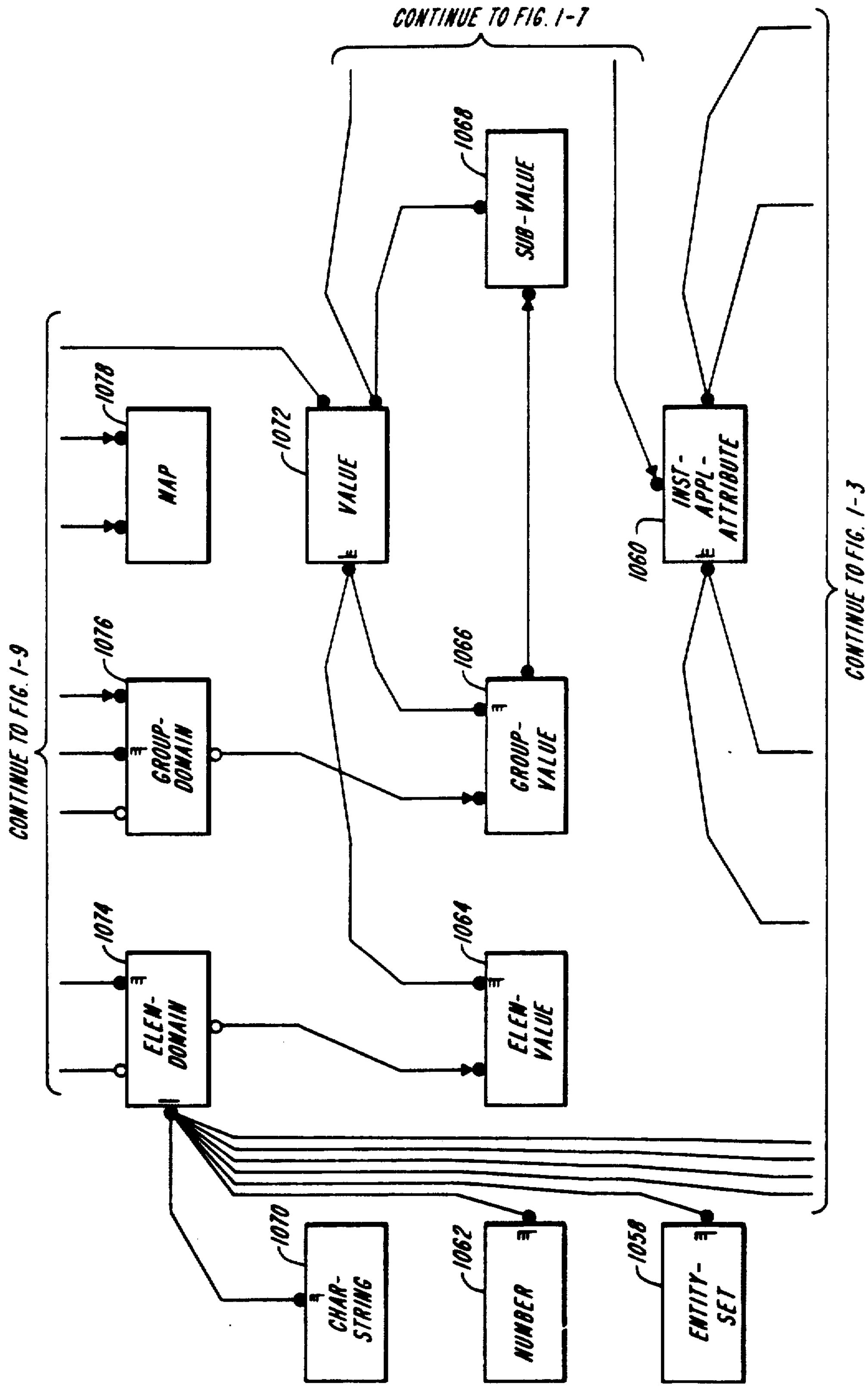
Figures 1, 2, 3, 4, 5, 6, 7:
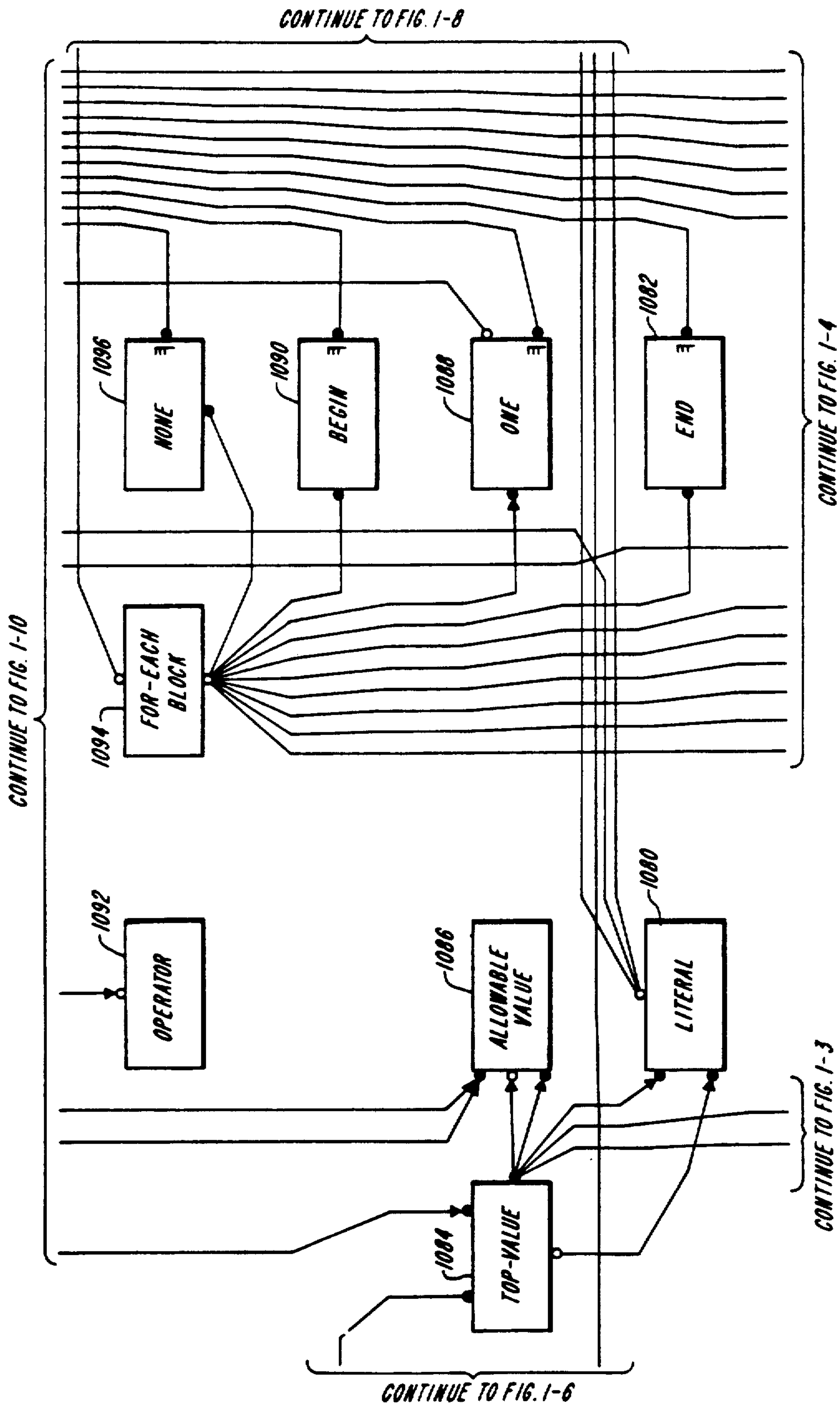

Once an IFM containing process is created, the function modeler 7 may be invoked to generate and display a function decomposition (FD) diagram of the process, as exemplified by diagram 80 shown in FIG. 7. The decomposition diagram 80 consists of subprocesses 84 identified by the operator to be associated with an identified process 82 For example, as shown in FIG. 7, if the process 82 is identified as "fill orders", subprocesses 84 identified with that process 82 may include, "generate inventory update", "handle orders for shipping", "put orders in boxes", and "take boxes to mail room". In the preferred embodiment, a pointing device, such as a mouse, is used to select a process displayed in an IFM diagram. By selecting a process with the pointing device, a decomposition diagram may be superimposed over all or part of the IFM diagram.

A typical FD diagram 80 of the present invention is shown in FIG. 7. There, the diagram 80 is a tree-structure type diagram, having nodes containing process description 86, process 82, and subprocess 84. The relationship between the nodes is shown graphically by a main line 88, and branch lines 90. The nodes are each connected to the lines 88, 90 at root pins 92. Each of lines 88, 90 also has an extension pin, 94 at which nodes may be attached.

An important aspect of the present invention is that the FD objects of the FD diagram 80 are dynamically linked to the IM and IFM objects such that a change to the FD diagram 80 (FIG. 7) is substantially immediately reflected in the IFM diagram 50 (FIG. 5) and the design data sets of both the information modeler and the process modeler.

In addition, a FD diagram 80 may display subprocesses 62 created in a process explosion. Thus, there are two ways in which subprocesses 62 may be created and displayed: using the process explosion from an IFM diagram 50; or using the function modeler to create a FD diagram 80.

Logic Modeler

The system 10 of the invention also includes a logic modeler 6 which specifies the logic of primitive processes defined in an IFM. The logic modeler 6 primarily embodies a graphical, structured language which enables a user to define business logic of the processes that operate on entities defined in an IM. The logic modeler 6 may be used to define logic models for describing the flow of information between models.

The logic modeler 6 refers to entities and attributes in the IM as it defines the logic that operates on the entities and their attributes according to the organization's business rules. For example, the business rule for deriving an attribute can be expressed in the logic modeler 6 and stored.

Figures 1, 2, 3, 4, 5, 6, 7, 8:
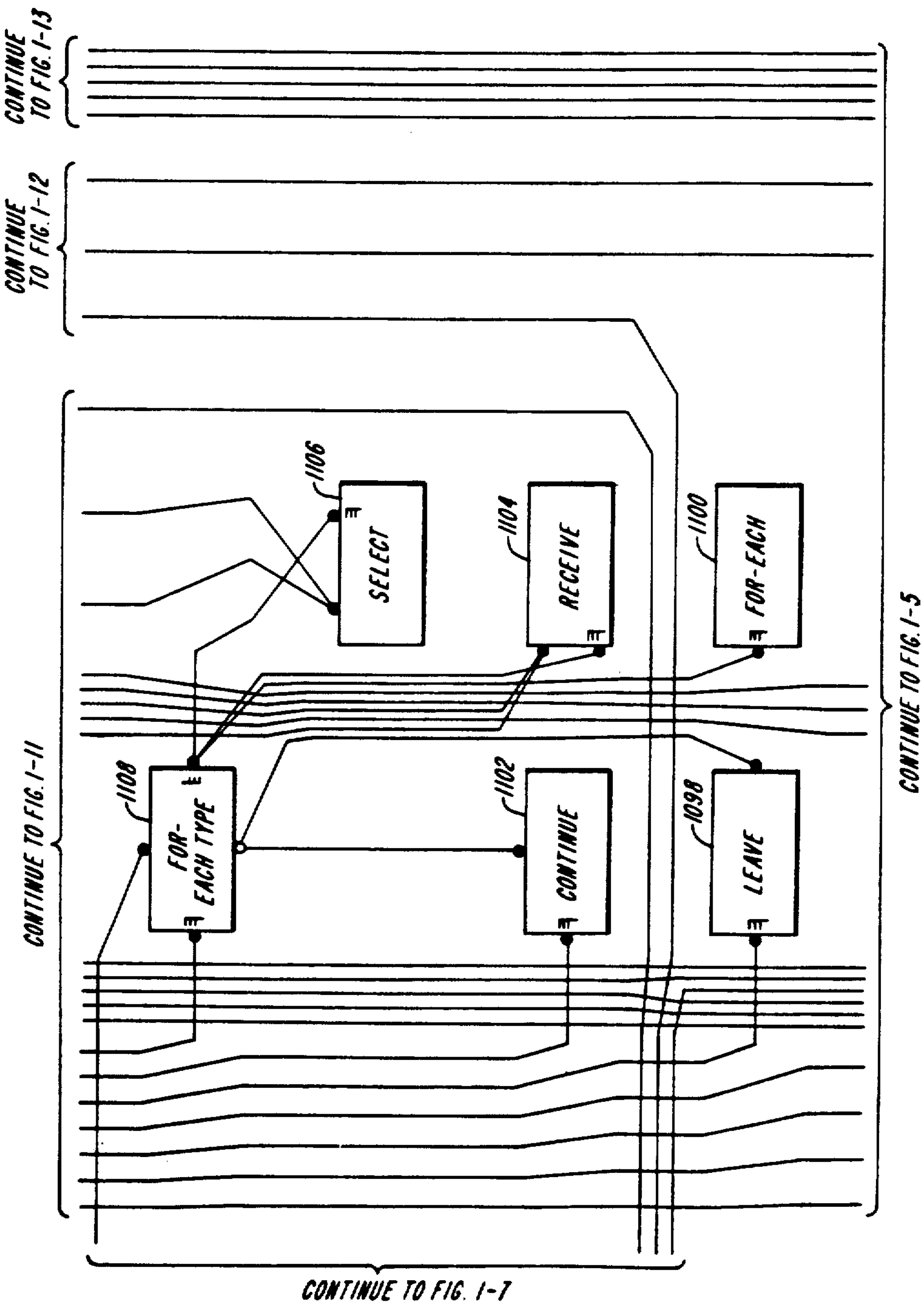

In the preferred embodiment, the structured language is a Process Description Language (PDL), which shows the flow of processing in relation to objects in the IFM and the specific operations performed on entities and attributes in the information model. The logic modeler 6 is generally related to an IFM and to an IM. As shown in FIG. 8, a PDL diagram 100 may be built by creating PDL statements, one at a time, in a window. The system then automatically generates graphical representation of the statement in the PDL diagram 100. The logic modeler 6 includes PDL procedures and PDL statements in describing and displaying logical operations on objects. As discussed above, entity methods and derived attributes may be used to define a procedure on an entity in the corresponding IFM diagram 50. PDL procedures may also include process procedures, which describe the business logic of the primitive process, and derived attributes, which are attributes having a value calculated each time it is used.

PDL statements may be used to build procedures and write specifications that describe the business logic of primitive processes in a corresponding IFM diagram. Statements may be built by a user or generated by the system, using keywords, identifiers, and expressions. Keywords which may be used in building PDL statements may include, inter alia: CREATE; RETRIEVE; UPDATE; DELETE; SEND; RECEIVE; SIGNAL; and, WHEN.

In the system of the present invention, several types of statements are available, including logical access statements (RETRIEVE, CREATE, UPDATE, DELETE), iteration statements (FOREACH, and LOOP), conditional statements (IF, CASE), and control transfer statements (EXIT, SKIP, RESUME). Logical access statements describe selecting or changing data defined in information stores. These statements are equivalent to statements that describe database access in a physical database. Any of the logical access statements of the present embodiment can create new objects in the IM diagram and in the IFM diagram In the preferred embodiment, "send" and "receive" statements are also available. The "send" statement defines the destination of information leaving a particular process. It can create an information flow from the process a user is currently editing to another process or source/destination. The syntax, or semantic rule, associated with a "send" statement is: SEND-(INFORMATION-STRUCTURE-REFERENCE)-WHERE (optional)-THROUGH (optional)-TO (optional). "Information-structure-reference" specifies the information to be sent from the process. The information can be a list of attribute references or an "entity.*" (indicating all attributes of a particular entity). An attribute reference can be an attribute name or a qualified attribute name. Optional clauses may include "where", "through", and "to". The "where" clause specifies search conditions that determine the information to send. The "through" clause specifies the information flow through which a user wants to send information. In one embodiment, only one information flow is allowed. The "to" clause specifies one or more processes or source/destination objects to which a user wants to send information.

The "receive" statement specifies the source of the information entering the process. It can create an information flow from a specified process or source/destination to the process for which a user is currently specifying PDL. The syntax associated with a "receive" statement is: RECEIVE-(INFORMATION-STRUCTURE-REFERENCE)-WHERE (optional)-THROUGH (optional)-FROM (optional). The "information-structure-reference" is the same as for "send" statements. Similarly, the "where" clause specifies search conditions that determine the information to receive, the "through" clause specifies the information flow through which a user wants to receive the information, and the "from" clause specifies the process or source/destination object from which the information is to be received. In one embodiment, neither the "send" nor the "receive" statements are allowed in entity method and derived attribute procedures. Both SEND and RECEIVE can create entities and attributes in the information model by reference. That is, if a user references an entity or attribute which does not exist, the system will prompt the user to create such an entity or attribute. Thus, similar to logical access statements, SEND and RECEIVE statements of the present embodiment can create new objects in the IM diagram and in the IFM diagram.

A SIGNAL statement may be used to signal an exception condition or error and to transfer control to a condition handler (WHEN clause) defined for the specified condition. A syntax for the statement is: SIGNAL-condition-(-expression list-). The "condition" is one of the system-defined conditions, including: ABORT, DUPLICATE, EMPTY, ONE, BEGIN, FIRST, LAST, EXIT, BETWEEN, END, END GROUP, SKIP, and, OTHERWISE. The system may test for and signal some of these conditions by default. An "expression-list" is a user-defined list of parameters to be passed to the condition handler.

A condition handler, such as WHEN, may be included to specify the action to take when a particular condition arises. This may be used in place of a user-written PDL statement to test for or signal that a condition exists. This may be used in conjunction with a SIGNAL statement to explicitly signal any of the system default conditions. Thus, as an argument to the SIGNAL statement, a user may specify the condition to be signaled and any parameters to be passed to the condition handler.

Two other important PDL statements are CONNECT and DISCONNECT. In general, these statements provide the means by which two instances of entities are caused to be joined at one of their partnership sets by a single partnership. The CONNECT statement may provide the means for causing a new instance of a partnership to be created joining two instances of a partnership set, each of which is associated with an instance of an entity. In the case of non-directed, recursive partnerships, the two ends of a single instance of a partnership must both be attached to the same instance of a partnership set.

In the preferred embodiment, when a CONNECT statement is executed, it is necessary to establish two sets of information; one set for each end of the partnership being created. In that instance, each set must include: (1) identification of the type of entity and instance to be connected; (2) identification of the type of partnership set to be connected; and, (3) identification of the rules of insertion to be applied to the new Partnership endpoint. These rules may include identification of the new partnership endpoint as the "first" member, as the "last" member, as the "prior" member to some designated current member, as the "next" member after some designated current member, sorted by some attribute value controlled by sorting rules, or in no particular order. Where the maximum cardinality is one, the rules of insertion are moot, as there can then be only one instance of a partnership endpoint at an instance of a partnership set at any moment in time.

The CONNECT statement may be an independent statement, or may be included as an extension of an INSERT statement. In the preferred embodiment, where the minimum cardinality is one (1) for one of the partnership sets, then the CONNECT statement must be treated as an extension of the INSERT statement to assure that the integrity of the partnership set is maintained after the INSERT is completed. In the situation where the minimum cardinality is one (1) for both partnership sets of the partnership, it may be necessary to actually INSERT both entities and CONNECT them before the information structure is in a consistent state. Where the minimum cardinality is zero for both ends of the partnership, or where the maximum cardinality is greater than one (1) for both ends of the partnership, it is essential that there exist an independent CONNECT statement which may add partnerships as they are required.

The DISCONNECT statement provides the means for causing an existing partnership to be destroyed. The destroyed partnership might be replaced by a new one, several, or none, depending upon the information situation.

Where it is essential to the integrity of the data definitions, it may be necessary that a RECONNECT statement be constructed as a separate command, or as a pairing of a DISCONNECT statement and a CONNECT statement to assure that the minimum cardinality rules remains intact. Where the order of the members of a partnership set is defined as being controlled by the values of one or more attributes, then the modification of the value of one of those attributes might require that the members of a partnership set be reordered to maintain the integrity of the declarations. The SORT statement may be defined to cause the members of a partnership set to be placed in a defined sequence on a batch basis, rather than on an ad hoc basis as they are created.

Other statements available in the illustrated system, plus a brief description, are listed below in TABLE 2.

TABLE 2

| PDL STATEMENTS | |
|---|---|
| ABORT | signals fatal error and rolls back all changes specified by the transaction |
| CASE | executes zero, one or more of several possible statement lists; compares several possible values to the value of "case selector" |
| COMMIT | transfers process results to information store |
| DO | calls an entity method or procedure from a process procedure, another entity method, or the same entity method |
| EXIT | used in iteration blocks to terminate the iteration statement and transfer control to the EXIT condition handler or to the statement following the iteration block |
| FOREACH | starts an iteration block, processing a single entity occurrence on each iteration until a specified condition is met |
| IF | makes the execution of a block statement conditional |
| LOOP | starts an iteration block, processing the statements within the block until a specified condition is met |
| NOTE | adds comments to a PDL specification |
| RESUME | used in condition handlers to indicate that the condition handler completed successfully, and transfers control to the statement following the SIGNAL statement that raised the condition |
| RETURN | exits from the process with a value |
| SKIP | terminates the current iteration and transfers control to the SKIP condition handler or to the next iteration of the block |

Other embodiments may have other statements which perform substantially the same functions as the CREATE, RETRIEVE, UPDATE, DELETE, SEND, RECEIVE, or other statements of the preferred embodiment described above. The description above is not intended to be semantically limiting, but merely to describe functions for affecting the modelers and associated design data.

The logic modeler 6 may be accessed from any of the other three modelers. In general, an IFM having the processes upon which the logic modeler 6 is to act must be opened prior to accessing the logic modeler. When a user creates or modifies objects in the IFM diagram 50, the system 10 automatically creates or modifies the corresponding PDL statements and their graphical representations. For example, if an information flow is created from a source/destination object to a primitive process and the contents of the information flow in the IFM diagram 50 are defined, the PDL diagram 100 for that primitive process contains a node labeled "receive" (nodes are described in detail below). The "receive" node represents a PDL statement that describes the source of information coming into the process.

In a similar manner, when PDL objects are created or modified, the system creates or modifies the corresponding objects in the IFM diagram 50. For example, any of the PDL logical access statements can create a new entity in the IM diagram 30 or a new information store in the IFM.

The PDL diagram 100 may also include graphical representation of the process description, and may enable a user to generate a report containing the text of a process description. In the preferred embodiment of the system 10, the graphical representation is in the form of a tree structure diagram, shown in FIG. 8. The tree 100 may have a series of nodes 102, pins 104, and PDL statements 106. The nodes 102 appear as boxes on the tree structure diagram 100. The nodes 102 contain text fields, upon which statements from the modelers or from internal language statements, appear.

Figures 1, 2, 3, 4, 5, 6, 7, 8, 9:
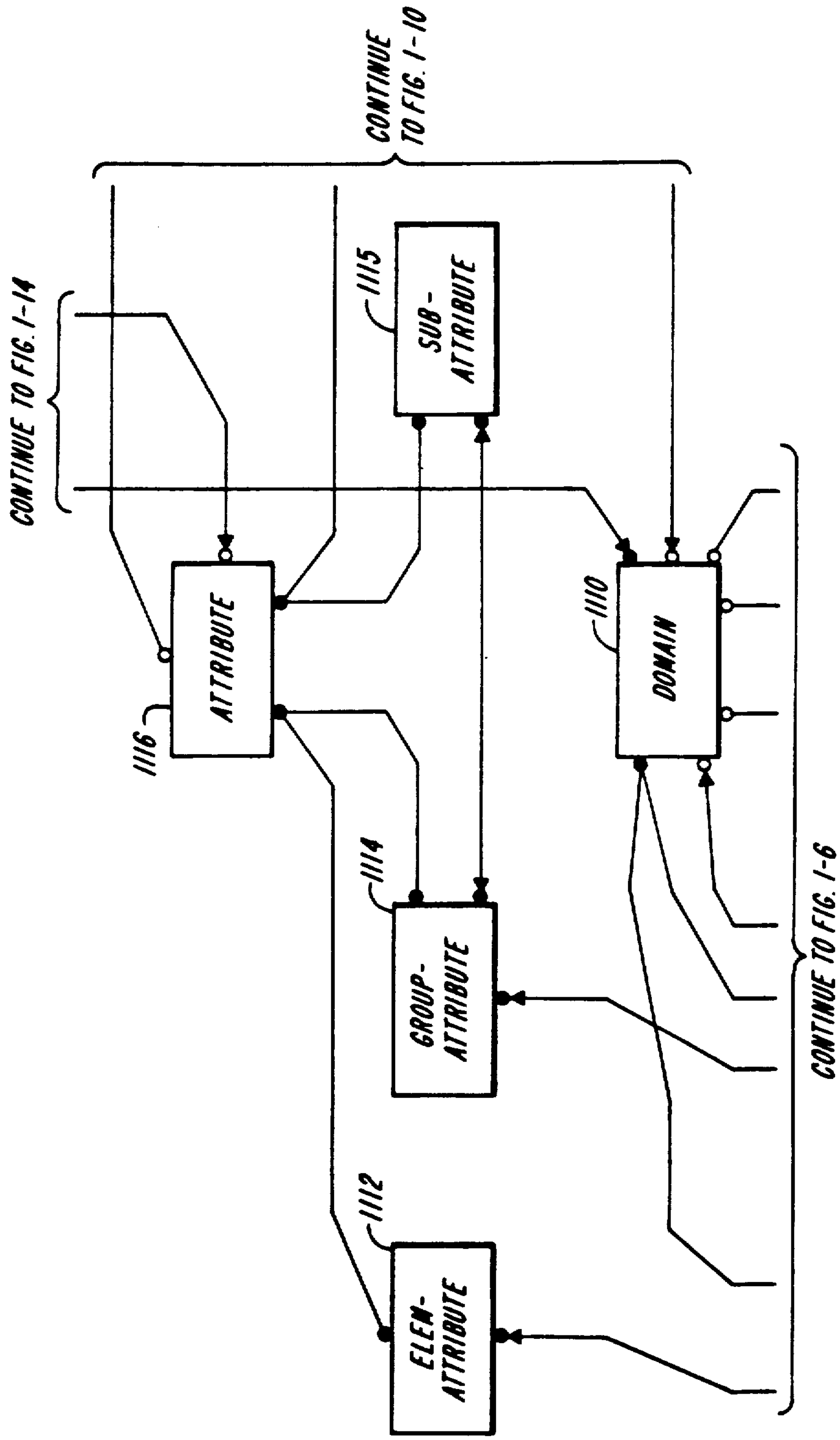

Pins 104 represent the relationship, or link, between statements or parts of statements. The position of a pin 104 in relation to its node 102 indicates the type of pin 104 it is. As best shown in FIG. 9, pin types may include: extension pins 112; root pins 114; parent/child pins 116; qualifier pins 118; and condition pins 120. An extension pin 112 may be used to mark each location where an operator can add nodes 102 to the end of an existing sequence. An extension pin 112 may appear at the end of a main line 108, or at the end of each line that represents a subsection of a process description. A root pin 114 may be used to mark the location, or root, of a node 102. Selection of a root pin 114 by an operator enables the operator to insert nodes 102 before the root pin 114. A root pin 114 may appear along any line of a process description. A parent/child pin 116 my be used to mark the beginning of a subtree of nodes, and allows a user to insert nodes 102 at the beginning of a subtree. A qualifier pin 118 may be used to represent a clause 117 that modifies a PDL statement 106 contained in an associated node 102. A condition pin 120 may be used to represent directions for handling exception conditions and errors associated with statements in a node 102. An important aspect of the nodes/pins relationship is that each pin 104 is associated with at least one node 102, and is graphically represented as such.

In general, each node 102 and its attached pins 104 represent a PDL statement 106. Pins 104 may also have active or inactive, and may be displayed to the user independent of its status. A pin 104 having active status is defined as a pin 104 which acts upon the associated node 102, whereas a pin 104 having inactive status is defined as a pin 104 which merely represents the possibility of becoming active upon user input.

The logic modeler 6 may have a series of windows associated with it which are unique to the logic modeler. These windows may be similar to those used in the other modelers, but may only reflect activities within the logic modeler and associated logic model.

PDL statements and their graphical representations can be created either by being generated by the system 10 from objects in the corresponding IM and IFM, or entered directly by the operator. The graphical representations may be in the form of a tree structure diagram 100, a network diagram (not shown), or other forms customary in the art, which may be displayed in a diagram window 24. In the preferred embodiment, a node 102 representing the scope of the description occurs at the top of each PDL diagram 100. The node is generated by the system 10 to describe the process for which the user is specifying a logic modeler 4. All possible qualifier pins 118 and a condition pin 120 appear on the node 102 independent of whether a user has actually entered them as part of the statement. In the preferred embodiment, if a qualifier pin 118 is active, i.e. actually part of the statement, the text of the clause represented by the pin 118 appears to the side of the pin 118. If a pin 103 is not active, it serves as a place holder, telling the user that a clause may be added to the statement.

Addition or modification of design data, or objects, in the PDL diagram 100 may be achieved by establishing an editing focus, which may be user-selected and system activated. An editing focus may be a pin 104 to which the user wants to add a node 102, or it can be a node 102 or pin 104 the user wants to modify. When a new node 102 is added to the end of a LM tree of a PDL diagram, the logic modeler automatically creates a new pin 112 that extends from the new node. This extension pin 112 then becomes the editing focus. An operator can easily change this editing focus by selecting another object in the displayed PDL diagram 100.

Figures 1, 2, 3, 4, 5, 6, 7, 8, 9, 10:
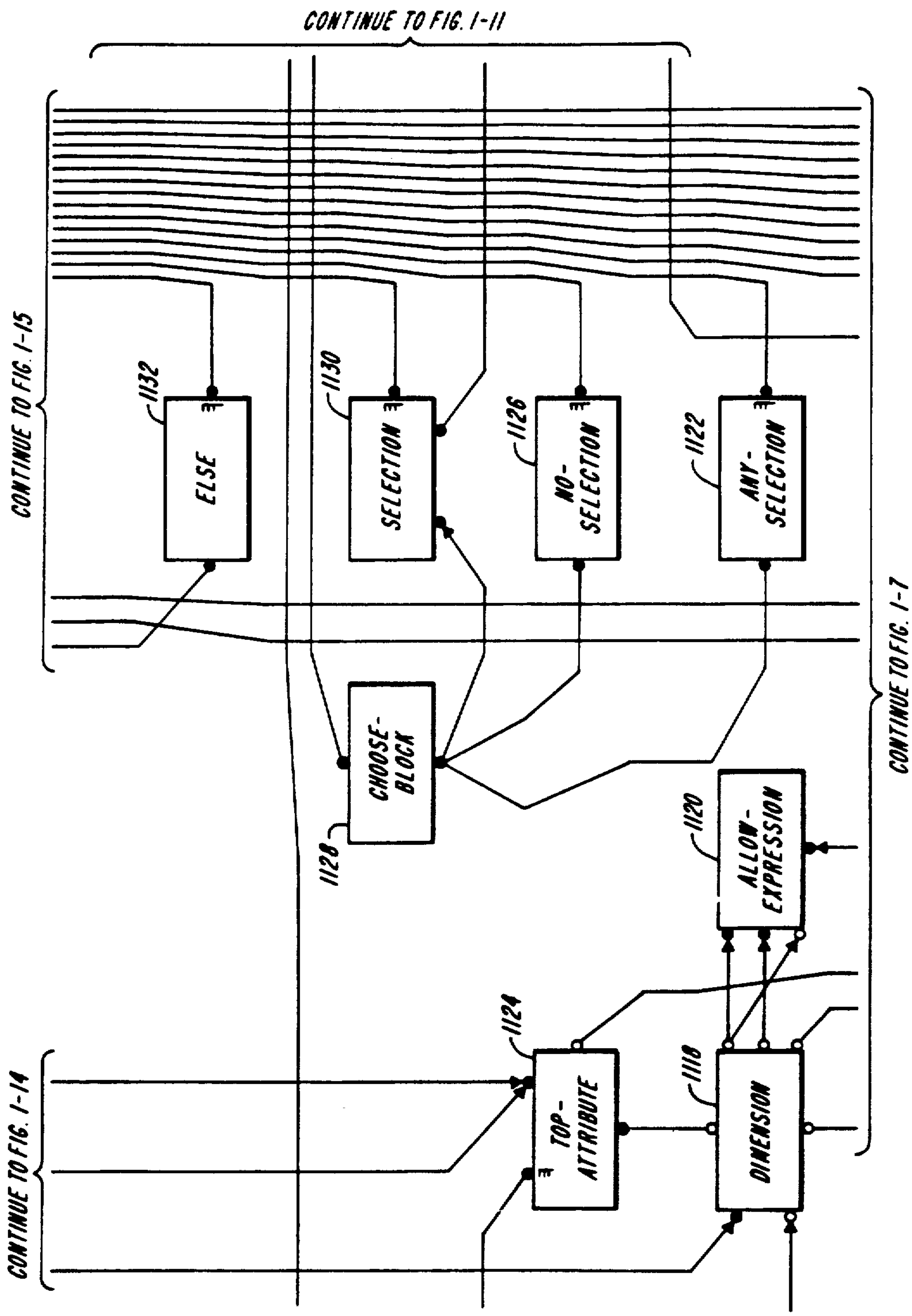

In the preferred system, the logic modeler may also include an options modeler and related options windows which present items available for the operator to use in building PDL statements 106 and manipulating PDL diagrams 100. An exemplary option window 150 is shown in FIG. 10. The options modeler is a language sensitive editor which generates a display of syntactically valid options for insertion by the user at a selected point in a line of a procedure, specification, or statement. The options window shows only those terms and/or phrases which are syntactically valid for building PDL statements, and thus may be displayed as a PDL palette as shown in FIG. 10.

The syntactic validity of an option is determined by comparing the options available, to criteria which may be defined by logical relationships, general semantic rules, expert rules, and heuristics. Logical relationships may include requirements such as certain keywords must be used in conjunction with specific identifiers. General semantic rules may include requirements that two keywords cannot occur next to each other without intervening identifiers. Expert rules and heuristics may involve series of user-defined logical correlations which must occur before a PDL statement structure is considered correct.

In the illustrated embodiment, the options window 150 is a tree-like display of items that a user can use to build PDL statements. These items may include keywords, symbols, identifiers, and the names of objects in the corresponding IM diagram 30 and IFM diagram 50. When the logic modeler 6 is first displayed, a single PDL palette 152 appears in the options window. Once a user selects an editing focus, the PDL palette item expands to display one or more categories of the PDL grammar. For example, when a user sets the editing focus to an extension pin 112, a root pin 114, or a parent/child pin 116, the following items appear in the options window: verbs, control flow, qualifiers, NOTE. The first three items are categories of the PDL grammar. The fourth item is a PDL keyword that can be used to add comments to procedures.

In other systems, an option modeler may be used in conjunction with any of the modelers, or editors, in designing and building a model.

Additional Aspects of the System (1) Dynamic Linking

An important aspect of the present system is a dynamic linking between the design data sets of each modeler. Within the logic modeler, when design data is created or modified in the information modeler or process modeler, the system automatically creates or modifies the corresponding PDL statements and their graphical representations. For example, if an operator creates a source/destination design data, or object, with an information flow to a primitive process in the IFM, the PDL diagram 100 for that primitive process contains a node 102 labeled RECEIVE. The RECEIVE node represents a PDL statement that describes the source of information coming into the process. In a similar way, when an operator creates or modifies PDL objects or design data in the logic modeler, the system creates or modifies the corresponding design data in the IFM and/or IM.

The dynamic characteristics of the system of the invention may be achieved by use of partnership sets. As best described in U.S. Pat. No. 4,631,664 (Bachman, 1986), partnership sets may be used to control storage, retrieval, and modification of information in a design data collection contained in storage devices in a design data processing system. In the present system, partnership sets are used to handle complex information sets, as described above.

(2) Dynamic Text and Graphics

In addition, each of the modeler displays may include text having a combination of icons and alphanumerics. The text may be dynamic, such that a user may affect IM design data, IFM design data, FD design data, and PDL design data by interacting with either the icons or alphanumerics. Since the present system is a primarily graphics system enabling an information system user to create graphic models of complex information systems, the ability to use dynamic icons and alphanumerics may be an important feature of such a system.

(3) Diagnostics

Further, the system of the invention may include an internal diagnostic or consistency check which signals to a user when improper terminology is used. Certain processes, semantic rules, logical relationships, expert rules, heuristics, text fields and pins may be stored in a database storage. When a user creates, modifies or adds design data in any of the modelers, the present system will check those statements against internally-stored design data. If the input design data does not correspond to the predetermined design data, the improper design data is "flagged" by the system and appropriate flag signals are displayed to the user.

In addition to being a double-check system for syntactic and semantic correctness of statements, the signals may be a part of an iterative process performed within the system. In the preferred embodiment, a design task may be included which is an intelligent, rule-based task that automates the repetitive process of examining and modifying the information model. The design task may include expert rules and heuristics against which statements and procedures are checked.

In the illustrated embodiment, the design task works in the following series of steps: (1) using a built-in set of design rules, the design task searches the information model for objects that might be more complex than necessary; (2) it then displays a list of those objects and actions that might simplify those objects; (3) the user then decides what action to take next, which may be either selecting an action that modifies one or more of the objects, or marking one or more of the objects as correct, thus indicating that the rule is inappropriate for the particular object; and, (4) the user then decides whether to rerun the same design rule, or to run the next rule.

(4) Filters

A user may also define and implement filters. A filter allows a user to view and operate on a subset of a model. The objects that are included in a subset, or filtered model, are determined by selection criteria defined by a user when the filter is created. In the preferred embodiment, multiple filters may be created for the same model, however only one filter can be active at a time. For example, if a user wants to display objects created by a specific user and also display objects of a certain type, two filters can be defined, each including those respective objects. Both of these filters would be applied to the same original model, but they would each produce a subset of that model.

When using the filters, if a diagram is displayed when a filter is activated, the filter takes effect immediately. That is, all objects which do not meet the selection criteria of the filter are automatically cleared from that diagram. It may be possible to implicitly include objects when an object is explicitly selected to be included in a filtered model. For example, if an information flow is the selection criteria of the filter, the objects that are the source and destination of that flow are implicitly selected, but not associated subordinate objects, such as flow structures. Similarly, when a diagram of a filtered model is displayed, objects that meet the filter selection criteria are displayed, along with any objects upon which their existence may depend.

(5) Process Description Language (PDL)

The system of the present invention enables a user to describe the elements and concepts most important to a business organization. Building a model of complex organizations facilitates the communication of vital business functions among the many departments of an organization. In the preferred embodiment, PDL enables a user, in a specification/design mode, to specify business logic for a model. Objects and processes (i.e. PDL design data) are specified and/or defined. In an execution mode, PDL enables a user to manipulate instances of objects and processes of the model. Such objects and processes, in both modes, include entities, attributes, processes, messages, and relationships. In both modes, the processes may be independent processes, or cooperating processes which are focused upon the successful processing of individual "business transactions".

The transactions specified by PDL are business transactions which are declared to be indivisible elements. The PDL essentially enables the system to assure that a user is working with such indivisible elements by providing a means for defining pieces of discrete business processing. The business world, or environment of an organization, can thus be defined in terms of discrete transactions which are known and either processed or not processed. In a model for complex organizations defined in terms of business transactions, or indivisible elements, validity checks need to be performed each time an instance of an object or process is manipulated or a process is defined. To do so, user data is effectively maintained in a static form until the specific transaction either becomes "successfully" or "not successfully" processed.

The business transactions related to the processes specified by the PDL are thus indivisible elements of work which are to be treated by the business as being in one of four states: waiting to be processed; in process; completely and successfully processed; or, completely and unsuccessfully processed. In the preferred embodiment, the rules expressed by the PDL for one business transaction can only either specify access to information in an information store that has been placed there by completed other business transactions. or specify receipt of messages from completed business transactions. During its processing period, i.e., in the execution mode, the PDL enables the storage of new information in the information store, and the sending of information intended for other processes. Moreover, the stored information will immediately be available to processes cooperating on the same business transaction. In the case of an unsuccessful process, it may make changes to the user data, and send messages reporting an unsuccessful transactions after its prior actions have been undone. Processes working on other business transactions will not be able to access the new information, nor will the processes be aware of the generation of the messages until after the source process has either successfully terminated or declared that it has been aborted.

Thus, in execution mode, the present system with PDL enables a user to manipulate instances of objects and processes within a model. That is, the user data is essentially put into a static state during which operations are, in effect, reversibly performed without affecting existing instances of objects or processes. That is, changes to the user data are performed in "quarantine", and are not incorporated into the user data until the process is determined to be (in accordance with criteria or algorithms defined by the PDL design data), and reported successful or unsuccessful. A user-specified process may then abort the action without side-effects to the existing user data, or commit the action. This is analogous to having a master "undo" command which retrieves data deleted, but temporarily stored, in an application. The changed user data may be made accessible for processing in conjunction with other business transactions.

In the preferred embodiment, a PDL an ITERATOR statement may be a major block of a program, having a number of nested blocks. Each nested block contains the logic to be executed under a designated circumstance or set of circumstances.

(6) Entity-sets

The system of the preferred embodiment may also include entity-sets. In the specification mode, entity-sets are defined in terms of references to entity types and conditions. In the execution mode, an instance of an entity-set contains references to a list of entity instances, which are then treated as a value. Thus, in the execution mode, entity-sets may be assigned to a variable or to the attribute of an entity, or may be used as an operand. For example, such entity-sets may be the operand of an ITERATOR statement.

An entity-set variable provides the means for storing and accessing a list of references to entity instances. In the execution mode, this collection of references is ordered, i.e., there is a "first" reference, a sequence of "next" references, and finally a "last" reference. The sequence of references is preserved, unless some explicit action is made to reorder that set. New references may be added to, deleted from, or rearranged in the list. It may be possible for one entity instance to be referenced in an entity-set more than once, however explicit action may be used to hide duplicate references to a single entity instance. The type of entity instances referenced within an entity-set may be of the same or different entities.

An entity-set is a generalization of the partnership-set of the partnership data model. It takes the properties of a partnership-set expressed as a particular property of an entity and characterizes it as a holder of a list of entity references. These properties are transfered to a new type of data variable, which is not necessarily identified with a particular entity. The assignment of a list of references from a partnership-set has the effect of transforming that list from a dynamic list, responsive to the creation and deletion of partnerships between the subject partnership-set and other partnership-sets, into a static list subject only to explicit commands addressing that list.

Generally, data variables are named storage structures, where each data variable is specialized to handle particular types of data. In the present embodiment, during operation in the specification mode, an operator may declare a variable to be an entity-set variable; during operation in the execution mode, a user data value may be assigned to an entity-set variable. Thus, this leads to a new type of data variable, i.e., one that can store and return the values which are references to entity instances. In the preferred embodiment, an entity-set has three basic states: empty (i.e., the entity-set has no members); not-empty (i.e., the entity-set has a list of one or more entity references); and, undefined (i.e., no entity-set, either empty or not empty, has been assigned to the data variable). The undefined state may appear initially after the data variable has been established but before any value has been assigned to it. The undefined state may also arise subsequent to a data variable being nullified.

The association of data variable with a data type entity-set enables the separation of the idea of the set of entity instances associated in partnership with a partnership-set, from the act of iterating over the list of entity instances of a partnership-set to perform the actual processing of those entity instances. In the preferred embodiment, a SELECT statement may be used to assign an entity-set to a data variable, and to hold that entity-set value until it becomes appropriate to take some action against the set of entity instances referenced by the entity-set value.

Establishment of entity-set data types enables the identification of data variables, including those which are process-local variables, as well as those attributes of entity instances which may be defined, as having the data type of entity-set. Further, any operation which may be performed upon an entity instance may also iteratively operate on a set of entity instances by referencing a variable of the type entity-set. Specifically, within the logic modeler of the preferred embodiment, PDL statements may act upon entity-set variables. Operations may also involve two or more entity-sets. For example, entity-sets may be merged, concatenated, compared, joined, and tested for the inclusion of one within the other, or the exclusion of one from the other.

While, in the preferred embodiment, PDL is used to manipulate business transaction design data, other embodiments may use mechanisms independent of the PDL of the present system. Business transaction design data may correspond to transaction-related information, such as rules of transactions which operate on entities, attributes, and relationships. These rules may include processing algorithms, and may be stored internal to a computer system. User data may then be transformed in accordance with the transaction design data.

The user data of the entire business transaction model described above may be held in an externally perceived static state, while that data is effectively internally transformed in a reversible manner. The discrete elements of the user data of a business transaction may be tested against the existing user data without making externally perceived changes to the existing user data. Once the internal check is complete, in accordance with the predetermined algorithms, external signals may be sent by a user to either commit (if "successful") or abort (if "unsuccessful") the changes to the user data. Subsequent to the abort signal and the reversal of prior action on the user data and messages, the process may make changes to the user data and send other messages that are relevant to the unsuccessful transaction (e.g. indicative of the unsuccessful processing). The changed user data then becomes fully externally accessible.

The specification, or outcome, of the system described above, may be converted into code and implemented to produce a working application system. That conversion may be accomplished manually, or under the control of a programmed digital computer. This specification, or outcome, is preferably in terms of PDL statements similar to those discussed above and as listed in Table 2.

The following section is a manual describing a preferred embodiment of the present system.

Table of Contents

■ Preface

■ 1 BACHMAN/Re-Engineering Product Set

■ 2 What Is an Analyst Model?

Diagrams and Forms . . . . 2-2

Data Model . . . . 2-3
- Review of E-R Diagram . . . . 2-3
- Data Model Objects . . . . 2-4

Process Model . . . . 2-6
- Review of DFD . . . . 2-6
- Review of FD . . . . 2-6
- Review of Process Description Language . . . . 2-6
- Process Model Objects . . . . 2-6

Model Integrity . . . . 2-6

■ 3 Working With the BACHMAN System

OS/2 and Presentation Manager . . . . 3-1

Mouse and Keyboard . . . . 3-2
- Mouse Operations . . . . 3-2
- Mouse Pointer and Text Cursor . . . . 3-3

Working With Windows . . . . 3-3
- Window Types . . . . 3-4
- Common Window Operations . . . . 3-5
- Arranging Windows on the Desktop . . . . 3-6
- Closing a Window . . . . 3-6
- Moving a Window . . . . 3-7
- Sizing a Window . . . . 3-7
- Minimizing a Window . . . . 3-8
- Maximizing a Window . . . . 3-9
- Restoring a Window . . . . 3-9
- Scrolling a Window . . . . 3-10
- Selecting a Window . . . . 3-11

Working with Menus . . . . 3-11
- Menu Types . . . . 3-11
- Selecting Menu Choices . . . . 3-12
- Menu Components . . . . 3-13

Starting the BACHMAN/Analyst . . . . 3-14

Working with Diagram Windows . . . 3-14
Creating Diagram Objects Using the Palette . . . 3-15
Selecting and Deselecting Diagram Objects . . . 3-16
Changing the View of a Diagramg . . . 3-17
Annotating a Diagram . . . 3-18
Changing the Layout of a Diagram . . . 3-19
Displaying a Diagram in More Than One Window . . . 3-23

Working with Form and Pop-up Windows . . . 3-24

4 Working With an Analyst Model

Creating a New Analyst Model . . . 4-1

Opening an Existing Analyst Model . . . 4-3

Saving an Analyst Model . . . 4-4

Importing and Exporting an Analyst Model . . . 4-4
Importing Analyst Model Information . . . 4-5
Exporting Analyst Model Information . . . 4-5
Import/Export File Format . . . 4-6

Deleting an Analyst Model . . . 4-8

Renaming an Analyst Model . . . 4-8

Merging Analyst Models . . . 4-8

Using Find to Locate an Analyst Model Object . . . 4-8

Using Filters to View and Operate on a Subset of a Model . . . 4-9
Creating a Filter . . . 4-10
Defining Filter Selection Criteria . . . 4-10
Selecting Objects to be Included in a Filtered Model . . . 4-14
Turning a Filter On and Off . . . 4-15
Performing Tasks on a Filtered Model . . . 4-15

Editing an Analyst Model Object . . . 4-16
Deleting an Analyst Model Object . . . 4-16

Undoing and Redoing an Operation . . . 4-16

Keeping a Log of Operations . . . 4-17

Printing Diagrams and Screens . . . 4-18
Before You Begin . . . 4-19
Basic Printing . . . 4-21
Advanced Printing Features . . . 4-22

Producing a Report . . . 4-23
Description of the BACHMAN Database . . . 4-24
Summary Procedure . . . 4-24
Transfer Data to the BACHMAN Database . . . 4-25
Start Query Manager . . . 4-26
Open the BACHMAN Database . . . 4-26

DRAFT

Create the Query . . . . . . . . . . . . . . . . . . . . . . . . . . . . . . 4-26
Save the Query . . . . . . . . . . . . . . . . . . . . . . . . . . . . . . . 4-32
Produce the Report . . . . . . . . . . . . . . . . . . . . . . . . . . . . 4-33
Format the Report . . . . . . . . . . . . . . . . . . . . . . . . . . . . . 4-33
Save the Form . . . . . . . . . . . . . . . . . . . . . . . . . . . . . . . 4-33
Export the Query and the Form . . . . . . . . . . . . . . . . . . . . . 4-34
Create an Index . . . . . . . . . . . . . . . . . . . . . . . . . . . . . . 4-34
Print the Report . . . . . . . . . . . . . . . . . . . . . . . . . . . . . 4-35
Exit From Query Manager . . . . . . . . . . . . . . . . . . . . . . . . 4-35

Managing Development of an Analyst Model . . . . . . . . . . . . . . . . 4-35

5 Building a Data Model

Diagram and Form Interactions . . . . . . . . . . . . . . . . . . . . . . . . 5-1

Displaying an Entity-Relationship Diagram . . . . . . . . . . . . . . . . . 5-2

Creating an Entity . . . . . . . . . . . . . . . . . . . . . . . . . . . . . . 5-3
Creating and Placing an Entity . . . . . . . . . . . . . . . . . . . . . 5-3
Adding Information About an Entity . . . . . . . . . . . . . . . . . . 5-5

Editing an Entity . . . . . . . . . . . . . . . . . . . . . . . . . . . . . . . 5-6
Copying an Entity (Not available in the Beta release.) . . . . . . . . . 5-6
Deleting an Entity . . . . . . . . . . . . . . . . . . . . . . . . . . . . 5-7
Establishing a Foreign Key Reference . . . . . . . . . . . . . . . . . . 5-7
Removing a Foreign Key Reference . . . . . . . . . . . . . . . . . . . 5-8
Changing a Relationship to an Entity . . . . . . . . . . . . . . . . . . 5-8
Changing an Entity to a Relationship . . . . . . . . . . . . . . . . . . 5-9
Changing a Complex Relationship to an Entity Type Hierarchy . . . 5-10
Changing an Entity Type Hierarchy to a Complex Relationship . . . 5-11
Splitting an Entity . . . . . . . . . . . . . . . . . . . . . . . . . . . . 5-11
Merging an Entity . . . . . . . . . . . . . . . . . . . . . . . . . . . . 5-12

Creating an Attribute . . . . . . . . . . . . . . . . . . . . . . . . . . . . 5-13
Creating an Entity-Owned Attribute . . . . . . . . . . . . . . . . . . 5-14
Creating a Free Attribute . . . . . . . . . . . . . . . . . . . . . . . . 5-15
Creating Component Attributes . . . . . . . . . . . . . . . . . . . . . 5-15
Creating a Shared Attribute . . . . . . . . . . . . . . . . . . . . . . . 5-16

Editing an Attribute . . . . . . . . . . . . . . . . . . . . . . . . . . . . . 5-16

Creating Dimensions and Domains . . . . . . . . . . . . . . . . . . . . . . 5-16
Creating a Dimension . . . . . . . . . . . . . . . . . . . . . . . . . . 5-17
Creating a Domain . . . . . . . . . . . . . . . . . . . . . . . . . . . . 5-17

Editing Dimensions and Domains . . . . . . . . . . . . . . . . . . . . . . . 5-21

Creating a Relationship . . . . . . . . . . . . . . . . . . . . . . . . . . . 5-21
Creating a Simple Relationship . . . . . . . . . . . . . . . . . . . . . 5-21
Partnership Sets . . . . . . . . . . . . . . . . . . . . . . . . . . . . . 5-25
Creating a Complex Relationship . . . . . . . . . . . . . . . . . . . . 5-27
Creating an Entity Type Hierarchy . . . . . . . . . . . . . . . . . . . 5-31

Editing a Relationship . . . . . . . . . . . . . . . . . . . . . . . . . . . . 5-33

Creating a Key . . . . . . . . 5-34
Single Attribute Keys . . . . . . . . 5-34
Multiple Attribute Keys . . . . . . . . 5-34
Multiple Partnership Set Keys . . . . . . . . 5-35
Partnership Set and Attribute Keys . . . . . . . . 5-35
Single Partnership Set Keys . . . . . . . . 5-36
Foreign Keys . . . . . . . . 5-36

Editing a Key . . . . . . . . 5-37

6 Working With a Data Model

Viewing a Subset of the Data Model . . . . . . . . 6-1

Normalizing a Data Model . . . . . . . . 6-1

Running the Design Task on a Data Model . . . . . . . . 6-2
Before Running the Design Task . . . . . . . . 6-2
Running the Design Task . . . . . . . . 6-3

Design Rules . . . . . . . . 6-4
Entity Rules . . . . . . . . 6-4
Attribute Rules . . . . . . . . 6-7
Relationship Rules . . . . . . . . 6-8
Key Rules . . . . . . . . 6-9
Domain Rules . . . . . . . . 6-10
Dimension Rules . . . . . . . . 6-10
Allowable Values Rules . . . . . . . . 6-10

Printing an E-R Diagram . . . . . . . . 6-10

Merging Data Models . . . . . . . . 6-11

7 Building a Process Model

Displaying a Process Model Diagram . . . . . . . . 7-2

Creating a Process . . . . . . . . 7-2
Creating and Placing a Process . . . . . . . . 7-3
Creating and Placing a Subprocess Using the FD Diagram . . . . . . . . 7-5
Adding Information About a Process . . . . . . . . 7-7

Editing a Process . . . . . . . . 7-8
Exploding a Process . . . . . . . . 7-9
Making a New Process Boundary . . . . . . . . 7-11
Hiding or Showing Subprocesses . . . . . . . . 7-13
Merging Processes . . . . . . . . 7-14
Repositioning a Process Using the FD Diagram . . . . . . . . 7-16
Renumbering Processes . . . . . . . . 7-16
Auto Repositioning Renumbered Processes (Not Available in the Beta Release) . . . . . . . . 7-17
Cutting a Process to the Clipboard (Not Available in the Beta Release) . . . . . . . . 7-17
Pasting a Process from the Clipboard (Not Available in the Beta Release) . . . . . . . . 7-17

DRAFT

Copying a Process (Not Available in the Beta Release) . . . . . . . . 7-17
Deleting a Process . . . . . . . . . . . . . . . . . . . . . . . . . . . . . . 7-18
Editing a Primitive Process Using PDL . . . . . . . . . . . . . . . . . . 7-19

Creating an Information Store . . . . . . . . . . . . . . . . . . . . . . . . . 7-19
Creating and Placing an Information Store . . . . . . . . . . . . . . . . 7-19
Adding Information About an Information Store . . . . . . . . . . . . 7-21

Editing an Information Store . . . . . . . . . . . . . . . . . . . . . . . . . . 7-23
Merging Information Stores . . . . . . . . . . . . . . . . . . . . . . . . . 7-23
Cutting an Information Store to the Clipboard (Not Available in the Beta Release) . . . . . . . . . . . . . . . . . . . . . . . . . . . . . . . . 7-26
Pasting an Information Store from the Clipboard (Not Available in the Beta Release) . . . . . . . . . . . . . . . . . . . . . . . . . . . . . 7-26
Copying an Information Store (Not Available in the Beta Release) . . 7-26
Deleting an Information Store . . . . . . . . . . . . . . . . . . . . . . . . 7-26
Editing an Information Store Using PDL . . . . . . . . . . . . . . . . . 7-27

Creating a Source/Destination . . . . . . . . . . . . . . . . . . . . . . . . . 7-27
Creating and Placing a Source/Destination . . . . . . . . . . . . . . . . 7-27
Adding Information About a Source/Destination . . . . . . . . . . . 7-29

Editing a Source/Destination . . . . . . . . . . . . . . . . . . . . . . . . . . 7-30
Merging Source/Destination Objects (Nonsystem) . . . . . . . . . . 7-31
Cutting a Source/Destination to the Clipboard (Not Available in the Beta Release) . . . . . . . . . . . . . . . . . . . . . . . . . . . . . . . . 7-32
Pasting a Source/Destination from the Clipboard (Not Available in the Beta Release) . . . . . . . . . . . . . . . . . . . . . . . . . . . . . 7-32
Copying a Source/Destination (Not Available in the Beta Release) . 7-32
Deleting a Source/Destination . . . . . . . . . . . . . . . . . . . . . . . . 7-33
Editing a Source/Destination Using PDL . . . . . . . . . . . . . . . . . 7-33

Creating an Information Flow . . . . . . . . . . . . . . . . . . . . . . . . . 7-33
Creating and Placing an Information Flow . . . . . . . . . . . . . . . . 7-34
Adding Information About an Information Flow . . . . . . . . . . . . 7-37

Editing an Information Flow . . . . . . . . . . . . . . . . . . . . . . . . . . 7-38
Reconnecting an Information Flow . . . . . . . . . . . . . . . . . . . . . 7-39
Merging Information Flows . . . . . . . . . . . . . . . . . . . . . . . . . . 7-40
Cutting an Information Flow to the Clipboard (Not Available in the Beta Release) . . . . . . . . . . . . . . . . . . . . . . . . . . . . . . . . 7-42
Pasting an Information Flow to the Clipboard (Not Available in the Beta Release) . . . . . . . . . . . . . . . . . . . . . . . . . . . . . . . . 7-42
Copying an Information Flow (Not Available in the Beta Release) . . 7-42
Deleting an Information Flow . . . . . . . . . . . . . . . . . . . . . . . . 7-42
Editing an Information Flow Using PDL . . . . . . . . . . . . . . . . . 7-42

8 Working with a Process Model

Viewing a Subset of the Process Model . . . . . . . . . . . . . . . . . . . . 8-1

Running the Design Task on a Process Model . . . . . . . . . . . . . . . . 8-1

Printing a Functional Decomposition or Data Flow Diagram . . . . . . . . . 8-1

Merging Process Models . . . . . . . . . . 8-2

■ 9 Introduction to PDL

The Interrelationship of Analyst Diagrams . . . . . . . . . . 9-2

PDL Procedures . . . . . . . . . . 9-2

PDL Statements . . . . . . . . . . 9-3

Displaying PDL Diagrams . . . . . . . . . . 9-3
- Displaying a PDL Diagram for a Process Procedure . . . . . . . . . . 9-3
- Using the Context Menu to Display a PDL Diagram . . . . . . . . . . 9-4
- Using the Diagram Pull-Down Menu to Display a PDL Diagram . . . . 9-4

PDL Screen Layout . . . . . . . . . . 9-5
- Diagram Window . . . . . . . . . . 9-5
- Message Area . . . . . . . . . . 9-7
- Options Window . . . . . . . . . . 9-7
- Command Window . . . . . . . . . . 9-7

Building a PDL Diagram . . . . . . . . . . 9-7
- Using the Diagram Window . . . . . . . . . . 9-8
- Using the Options Window . . . . . . . . . . 9-9
- Using the Command Window . . . . . . . . . . 9-11
- Activating a Window . . . . . . . . . . 9-14

Building a RETRIEVE Statement, an Example . . . . . . . . . . 9-14

Manipulating PDL Objects . . . . . . . . . . 9-17
- Changing the PDL Diagram View . . . . . . . . . . 9-17
- Moving a Node . . . . . . . . . . 9-18
- Undoing and Redoing Operations . . . . . . . . . . 9-18
- Deleting Objects . . . . . . . . . . 9-19
- Hiding Objects . . . . . . . . . . 9-20

Producing PDL Reports . . . . . . . . . . 9-20

Entity Methods . . . . . . . . . . 9-21
- Displaying the Entity Form . . . . . . . . . . 9-22
- Creating a New Entity Method . . . . . . . . . . 9-23
- Calling an Entity Method . . . . . . . . . . 9-24
- Editing an Entity Method . . . . . . . . . . 9-26

Derived Attributes . . . . . . . . . . 9-27
- Creating a New Derived Attribute . . . . . . . . . . 9-27
- Building PDL for a Derived Attribute . . . . . . . . . . 9-29
- Editing a Derived Attribute . . . . . . . . . . 9-29

■ 10 PDL Reference

Expressions . . . . . . . . . . 10-1
- Operators . . . . . . . . . . 10-1
- Literals . . . . . . . . . . 10-2
- Functions . . . . . . . . . . 10-2

DRAFT

Handling Exception and Error Conditions . . . . . . . . . . . . . . . . . . 10-4

PDL Statements . . . . . . . . . . . . . . . . . . . . . . . . . . . . 10-6

ABORT Statement . . . . . . . . . . . . . . . . . . . . . . . . . . . 10-8
Syntax . . . . . . . . . . . . . . . . . . . . . . . . . . . . . 10-8

CASE Statement . . . . . . . . . . . . . . . . . . . . . . . . . . . 10-9
Syntax . . . . . . . . . . . . . . . . . . . . . . . . . . . . . 10-9
Notes . . . . . . . . . . . . . . . . . . . . . . . . . . . . . 10-9

COMMIT Statement . . . . . . . . . . . . . . . . . . . . . . . . . .10-10
Syntax . . . . . . . . . . . . . . . . . . . . . . . . . . . . .10-10
Notes . . . . . . . . . . . . . . . . . . . . . . . . . . . . .10-10

CREATE Statement . . . . . . . . . . . . . . . . . . . . . . . . . .10-11
Syntax . . . . . . . . . . . . . . . . . . . . . . . . . . . . .10-11
Notes . . . . . . . . . . . . . . . . . . . . . . . . . . . . .10-13
Example . . . . . . . . . . . . . . . . . . . . . . . . . . . .10-13

DELETE Statement . . . . . . . . . . . . . . . . . . . . . . . . . .10-14
Syntax . . . . . . . . . . . . . . . . . . . . . . . . . . . . .10-14
Notes . . . . . . . . . . . . . . . . . . . . . . . . . . . . .10-15
Example . . . . . . . . . . . . . . . . . . . . . . . . . . . .10-15

DO Statement . . . . . . . . . . . . . . . . . . . . . . . . . . . .10-16
Syntax . . . . . . . . . . . . . . . . . . . . . . . . . . . . .10-16
Notes . . . . . . . . . . . . . . . . . . . . . . . . . . . . .10-16

EXIT Statement . . . . . . . . . . . . . . . . . . . . . . . . . . .10-18
Syntax . . . . . . . . . . . . . . . . . . . . . . . . . . . . .10-18

FOREACH Statement . . . . . . . . . . . . . . . . . . . . . . . . .10-19
Syntax . . . . . . . . . . . . . . . . . . . . . . . . . . . . .10-19
Notes . . . . . . . . . . . . . . . . . . . . . . . . . . . . .10-21

IF Statement . . . . . . . . . . . . . . . . . . . . . . . . . . . .10-22
Syntax . . . . . . . . . . . . . . . . . . . . . . . . . . . . .10-22
Notes . . . . . . . . . . . . . . . . . . . . . . . . . . . . .10-23

LOOP Statement . . . . . . . . . . . . . . . . . . . . . . . . . . .10-24
Syntax . . . . . . . . . . . . . . . . . . . . . . . . . . . . .10-24
Notes . . . . . . . . . . . . . . . . . . . . . . . . . . . . .10-25

NOTE Statement . . . . . . . . . . . . . . . . . . . . . . . . . . .10-26
Syntax . . . . . . . . . . . . . . . . . . . . . . . . . . . . .10-26

RECEIVE Statement . . . . . . . . . . . . . . . . . . . . . . . . .10-27
Syntax . . . . . . . . . . . . . . . . . . . . . . . . . . . . .10-27
Notes . . . . . . . . . . . . . . . . . . . . . . . . . . . . .10-28
Example . . . . . . . . . . . . . . . . . . . . . . . . . . . .10-29

RESUME Statement . . . . . . . . . . . . . . . . . . . . . . . . . .10-30
Syntax . . . . . . . . . . . . . . . . . . . . . . . . . . . . .10-30

RETRIEVE Statement . . . . . . . . . . . . . . . . . . . . . . . . .10-31
Syntax . . . . . . . . . . . . . . . . . . . . . . . . . . . . .10-31

Notes . . . . . . . . . . . . . . . . . . . . . . . . . . . . . . . . . . . . .10-35
Example . . . . . . . . . . . . . . . . . . . . . . . . . . . . . . . . . . . .10-35

RETURN Statement . . . . . . . . . . . . . . . . . . . . . . . . . . . . . . .10-37
Syntax . . . . . . . . . . . . . . . . . . . . . . . . . . . . . . . . . . . . .10-37

SEND Statement . . . . . . . . . . . . . . . . . . . . . . . . . . . . . . . .10-38
Syntax . . . . . . . . . . . . . . . . . . . . . . . . . . . . . . . . . . . . .10-38
Notes . . . . . . . . . . . . . . . . . . . . . . . . . . . . . . . . . . . . .10-40
Example . . . . . . . . . . . . . . . . . . . . . . . . . . . . . . . . . . . .10-40

SIGNAL Statement . . . . . . . . . . . . . . . . . . . . . . . . . . . . . . .10-41
Syntax . . . . . . . . . . . . . . . . . . . . . . . . . . . . . . . . . . . . .10-41
Notes . . . . . . . . . . . . . . . . . . . . . . . . . . . . . . . . . . . . .10-41

SKIP Statement . . . . . . . . . . . . . . . . . . . . . . . . . . . . . . . .10-42
Syntax . . . . . . . . . . . . . . . . . . . . . . . . . . . . . . . . . . . . .10-42

UPDATE Statement . . . . . . . . . . . . . . . . . . . . . . . . . . . . . . .10-43
Syntax . . . . . . . . . . . . . . . . . . . . . . . . . . . . . . . . . . . . .10-43
Notes . . . . . . . . . . . . . . . . . . . . . . . . . . . . . . . . . . . . .10-45
Example . . . . . . . . . . . . . . . . . . . . . . . . . . . . . . . . . . . .10-45

11 Forms Reference

Analyst Model Form . . . . . . . . . . . . . . . . . . . . . . . . . . . . . . 11-1

Data Model Forms . . . . . . . . . . . . . . . . . . . . . . . . . . . . . . . 11-2
Allowed Value Table Form . . . . . . . . . . . . . . . . . . . . . . . . . . 11-2
Attribute Form . . . . . . . . . . . . . . . . . . . . . . . . . . . . . . . . 11-2
Data Model Form . . . . . . . . . . . . . . . . . . . . . . . . . . . . . . . 11-4
Dimension Form . . . . . . . . . . . . . . . . . . . . . . . . . . . . . . . . 11-4
Domain Form . . . . . . . . . . . . . . . . . . . . . . . . . . . . . . . . . . 11-5
Entity Form . . . . . . . . . . . . . . . . . . . . . . . . . . . . . . . . . . 11-6
Filter Form . . . . . . . . . . . . . . . . . . . . . . . . . . . . . . . . . . 11-7
Key Form . . . . . . . . . . . . . . . . . . . . . . . . . . . . . . . . . . . 11-8
Notes Form . . . . . . . . . . . . . . . . . . . . . . . . . . . . . . . . . . 11-9
Partnership-Set Form . . . . . . . . . . . . . . . . . . . . . . . . . . . . . 11-9
Synonym Form . . . . . . . . . . . . . . . . . . . . . . . . . . . . . . . . .11-10

Process Model Forms . . . . . . . . . . . . . . . . . . . . . . . . . . . . . .11-11
Event Form . . . . . . . . . . . . . . . . . . . . . . . . . . . . . . . . . .11-11
Information Flow Form . . . . . . . . . . . . . . . . . . . . . . . . . . . . .11-11
Information Store Form . . . . . . . . . . . . . . . . . . . . . . . . . . . .11-13
Notes Form . . . . . . . . . . . . . . . . . . . . . . . . . . . . . . . . . .11-14
Process Form . . . . . . . . . . . . . . . . . . . . . . . . . . . . . . . . .11-14
Process Model Form . . . . . . . . . . . . . . . . . . . . . . . . . . . . . .11-15
Source/Destination Form . . . . . . . . . . . . . . . . . . . . . . . . . . . .11-16
Synonym Form . . . . . . . . . . . . . . . . . . . . . . . . . . . . . . . . .11-17

Profile Forms . . . . . . . . . . . . . . . . . . . . . . . . . . . . . . . . .11-18
Data Model Profile Form . . . . . . . . . . . . . . . . . . . . . . . . . . . .11-19
Printer Profile Form . . . . . . . . . . . . . . . . . . . . . . . . . . . . . .11-20
Process Model Profile Form . . . . . . . . . . . . . . . . . . . . . . . . . .11-20

DRAFT

User Profile Form . . . . . . . . . . . . . . . . . . . . . . . . . . . . . . . . . .11-21

■ A Import/Export File Format

■ B PDL Pop-Up Windows

Select an Entity Pop-Up Window . . . . . . . . . . . . . . . . . . . . . . . . . B-1

Define an Asterisk Pop-Up Window . . . . . . . . . . . . . . . . . . . . . . . B-1

Specify an Information Flow Pop-Up Window . . . . . . . . . . . . . . . . . B-2

Specify an Information Store Pop-Up Window . . . . . . . . . . . . . . . . . B-3

Specify a Process or Source/Destination Pop-Up Window . . . . . . . . . . B-3

Confirm Missing WHERE Clause Pop-Up Window . . . . . . . . . . . . . . . B-4

LAM Pop-Up Window . . . . . . . . . . . . . . . . . . . . . . . . . . . . . . . B-5

Preface

The documentation for the Beta Release of the BACHMAN/Analyst 3.10 consists of 11 chapters and 2 appendixes. Not all chapters are complete.

Chapter 1, BACHMAN/Re-Engineering Product Set, describes the complete product set. Not yet available.

Chapter 2, Analyst Model, describes what the Analyst model is and its component models, represented by diagrams and forms. It describes each object in a data or process model. Outline only.

Chapter 3, Working With the BACHMAN System, describes the BACHMAN desktop, components of the screen, and operations common to all diagrams and forms. It is important to read this chapter to learn procedures that help you work with the BACHMAN/Analyst system.

Chapter 4, Working With an Analyst Model, describes tasks performed on an Analyst model, such as opening the model, saving the model, logging model operations, locating objects within the model, viewing a subset of the model, printing diagrams and screens, and producing reports. It is important to read this chapter to learn procedures that help you work with the Analyst model.

Chapter 5, Building a Data Model, describes how you create and edit objects in a data model using the Bachman Entity-Relationship diagram and the data model forms. The editing sections are not yet available.

Chapter 6, Working With a Data Model, describes tasks you can do in a data model, such as normalizing the model and using the Design task to check it.

Chapter 7, Building a Process Model, is similar to Chapter 5, Building a Data Model. It describes how you create and edit the objects in a process model using the data flow diagram, functional decomposition diagram, and process model forms.

Chapter 8, Working with a Process Model, is similar to Chapter 6, Working With a Data Model, describing tasks such as running the Design task and merging process models. Not yet available.

Chapter 9, Introduction to PDL, describes how to write process description language (PDL) procedures using the PDL diagram.

Chapter 10, PDL Reference, is the reference for the process description language, describing its expressions and statements.

Chapter 11, Forms Reference, describes all the forms and their fields. For Beta, it also describes how profiles are used. Not yet complete.

Appendix A describes the import/export file format. Appendix B describes the PDL pop-up windows.

Glossary. Not yet available

Index. Not yet complete.

Chapter 1
BACHMAN/Re-Engineering Product Set

> ☛ *This chapter has not yet been written. It will contain an overview of the entire product set, much like Chapter 1 of the BACHMAN/Data Analyst Reference provided with Release 2.20.*

Chapter 2
What Is an Analyst Model?

> ☛ *This chapter is still in its infancy. It has been included only to show you the complete structure of the BACHMAN/Analyst Reference manual.*

An information model represents a business or portion of a business. The BACHMAN/Analyst is a software tool for building, analyzing, and modifying information models. Within the BACHMAN/Analyst, the precise, complete definition of your information model is stored as an Analyst model.

Each Analyst model contains a data model and, optionally, one or more process models.

- A data model describes the objects that are used within the information system. For example, if the business you are modeling is a hardware store, your data model might contain objects such as
  - a customer entity with attributes Name, Address
  - ....

Relationships between entities in a data model are frequently described by an Entity-Relationship (E-R) diagram, as shown in Figure 2-1.
- A process model describes a function that occurs within the information system. For example, if the business you are modeling is a hardware store, you might have a process model that describes the ... function. That process model might contain objects such as
  - a process Buy-New-Stock that receives requests from customers
  - ...

Relationships between objects in a process model are frequently described by a data flow diagram (DFD), as shown in Figure 2-2. Detailed specifications for each process are sometimes written in structured English, as shown in Figure 2-3.

An Analyst model contains far too much information to be viewed all at once. Therefore, the BACHMAN/Analyst provides a set of diagrams and forms that allow you to build and examine different portions of the Analyst model. The first section of this chapter, Diagrams and Forms, briefly describes these diagrams and forms.

The second section of the chapter, Data Model, describes the objects in the data model. The third section of the chapter, Process Model, describes the objects in the process model.

The BACHMAN/Analyst ensures that the Analyst model is always consistent by validating each piece of information that you enter. For example:

- If you attempt to enter an entity that already exists, the system displays an error message and gives you an opportunity to enter a different name.
- Or, if, within the process model, you attempt to reference an entity that does not exist, the system displays an error message and gives you an opportunity to create the entity or to specify a different entity.

The fourth section of this chapter, Model Integrity, describes the validation done by the system to ensure a consistent Analyst model.

In addition to automatic validation, the BACHMAN system provides a Design task that you can run at any time. The Design task can help you analyze your model. For example, it can help you build a more concise model by finding redundant structures or those structures that can be shared within an entity hierarchy. The Design task is described in the Running the Design Task on a Data Model and Running the Design Task on a Process Model sections later in this book.

Finally, once you have created an Analyst model that you are comfortable with, you use the Forward Engineering task to translate the data model into an implementation-specific physical design. A complementary task, reverse engineering, allows you to translate an implementation-specific physical design into a more conceptual Analyst model. The engineering tasks are described in the BACHMAN Engineering Guide.

Diagrams and Forms

The BACHMAN system provides a variety of diagrams and forms for looking at different portions of the Analyst model:

- Entity-Relationship (E-R) diagrams show you the entities in the data model and their relationships to each other. See Figure 2-1.
- Data flow diagrams (DFD) show you the processes, information stores, and source/destination objects in a process model, as well as the information flows between these objects. See Figure 2-2.
- Functional decomposition (FD) diagrams show you the process hierarchy of the processes in the process model. See Figure 2-4.
- Process description language (PDL) diagrams show you the specification of a process. The specification is written in PDL, BACHMAN's structured English specification language. See Figure 2-3.
- Forms show you detailed information about a particular object in the Analyst model. Figure 2-5 shows an Entity form. Similar forms exist for the objects in an Analyst model:
  - ...

You use the diagrams and forms to display and modify the Analyst model. When you modify the Analyst model, the system automatically updates all open diagrams and forms. For example, assume that you have opened an E-R diagram and an Entity form for the CUSTOMER entity. If you delete the CUSTOMER entity from the E-R diagram, the CUSTOMER form is automatically closed because the entity no longer exists.

You can have many diagrams and forms open simultaneously, although only one at a time can be active. You can open any diagram or form at any time. You can easily move from one diagram or form to another. Because of this flexibility, you can develop an Analyst model in the order that you are most comfortable with. You can start with the data model, the process model, or even the process specifications. You can complete one model before moving to another, or develop the data and process models in parallel.

Although you can easily open any diagram or form at any time, both documentation and training tend to use the following path through the BACHMAN/Analyst because it covers all the diagrams and forms in a logical order:

1 Build the skeleton of the data model using the E-R diagram.
2 Add detail to the data model using the data model forms.
3 Build the skeleton of the process model using the DFD.
4 Add detail to the process model using the process model forms.
5 Write the PDL specifications for the processes.

Figure 2-6 shows the various common and not-so-common development paths through the BACHMAN/Analyst.

Data Model

This section discusses each object in the data model. It starts with a brief description of the Entity-Relationship diagram and the objects that appear in that diagram. Then it expands to cover data model objects that do not appear in that diagram.

Each object in the data model is precisely defined by its form. However, to understand the information in the forms, it is easiest to have a general understanding of all the objects in the data model and how they relate to one another. This section provides the general understanding (for example, it mentions that entities can be arranged hierarchically). The Forms Reference provides a detailed description of each form (for example, it describes the Subtype and Supertype fields on the Entity form).

If you are familiar with E-R diagrams, you might want to skim this section and then glance through the Data Model forms reference to see the amount and type of information contained in the data model.

Review of E-R Diagram

Entity

Relationship

1:1, 1:M, M:M

Optional/mandatory partnership-sets

Reading the E-R diagram.

Using good names is important to the clarity of the model.

If the E-R diagram and the concepts behind it are new to you, you should consider reading industry references. A few are listed here:

- Rapid System Development

Data Model Objects

Figure X-X uses an E-R diagram to show the most significant data model objects and their relationships. The following sections discuss the objects in general terms.

Entity

Basic building block. Described by attributes. Can be assigned methods.

Relationships among entities are defined as partnerships.

Each entity is uniquely identified by key. Key consists of one or more attributes, partnership-sets, or combination of both. More on keys later.

Entities can be arranged hierarchically. All information about the superentity applies to subentities. Subentities can have additional information.

When you forward engineer, entity normally becomes a table in the physical design. The mapping between the entity and its physical table is stored in the Entity form.

The following entity information is also included in the data model, although it is not discussed here: volume info, growth rate, normalization level, keywords, notes, maintenance information, and synonyms.

Attribute

Used to define entities. Attribute usually in an entity.

For each attribute, you specify a domain. The domain describes the representation of the attribute. More on domains later.

Attributes do not have to be in an entity. For convenience, BACHMAN allows free attributes. Lets you think of the adjectives and attach them to entities at leisure.

The following attribute information is also included in the data model, although it is not discussed here: ....

Partnership-Set

A relationship between two or more entities is defined by a partnership. The partnership includes the partnership-sets on the entities and the lines that connect the partnership-sets.

Figure showing simple relationship.

Minimum, Expected, and Maximum Volumes

In the discussion of the E-R diagram, we read the partnership-sets and lines as text. For example, an *order* may *contain* one or more *line items* and a *line item* must be *part of* only one *order*.

All of this information is stored in the partnership-set. The *contain* partnership-set has a minimum volume of 0, a maximum volume of more than 1, and related partnership-set of *part of*. The *part of* partnership-set has a minimum volume of 1, a maximum volume of 1, and a related partnership-set of *contain*.

A partnership-set can also have an expected volume; for example, the contain partnership set might have an expected volume of 3 and a maximum volume of 50, indicating that most orders have three line items and no order can have more than 50 line items.

Complex Relationships

In the examples so far, each partnership-set is connected to one other partnership-set. Partnership-sets can be connected to more than one other partnership-set.

Example

If one partnership-set defines a relationship between an occurrence of its entity and many other entities, the partnership has to express how its entity relates to the other entities:

- This entity can be related to one or more of the others (IOR)

picture
- This entity can be related to one and only one of the others (XOR)

picture
- This entity must be related to all the others (AND)

picture

If a partnership-set is a complex partnership-set, it contains a list of all the partnership-sets that it is connected to.

Additional Partnership-Set Information

The following partnership-set information is also included in the data model, although it is not discussed here: ....

Key

To be supplied.

Domain and Dimension

To be supplied.

Process Model

This section discusses each object in the process model. It starts with a brief description of the data flow and functional decomposition diagrams and the objects that appear in those diagrams. Then it expands to cover process model objects that do not appear in those diagrams.

Each object in a process model is precisely defined by its form. However, to understand the information in the forms, it is easiest to have a general understanding of all the objects in the process model and how they relate to one another. This section provides the general understanding. The Forms Reference provides a detailed description of each form.

If you are familiar with data flow and functional decomposition diagrams, you might want to skim this section and then glance through the Process Model forms reference to see the amount and type of information contained in the process model.

Review of DFD

To be supplied.

Review of FD

To be supplied.

Review of Process Description Language

To be supplied.

Process Model Objects

To be supplied.

Model Integrity

An Analyst model contains a significant amount of data that may be worked on by several people over months or even years. Maintaining the integrity of the model is critical to the development effort. The BACHMAN/Analyst maintains integrity of the model by ensuring that

- Each object is internally correct.

- Object names can be a maximum of 75 characters. They can include letters, numbers, pound sign (#), dollar sign ($), ampersand (&), and separator characters. The separator characters, underscore ( _ ), dash (-), and space, are equivalent. Upper- and lowercase characters are also equivalent. Leading and trailing spaces are removed.
- The field values of the object, as defined by the object's form, must contain valid values. See the Forms Reference for the validation rules of specific fields.
- The field values of the object are consistent with each other.

For example, if you have a partnership-set with minimum, expected, and maximum values of 1 and you change the minimum value to 2, the system changes the expected and maximum values to 2 as well. The system also displays a message in the Messages window informing you that it changed the expected and maximum values.

- Duplicate objects are not created.

For example, if your data model contains the entity CUSTOMER-ORDER and you attempt to create an entity CUSTOMER_ORDER, the system displays an error message.

- Every data model object referenced within the process model exists.

For example, if you have displayed an information flow form to add the entity CUSTOMER-ORDER to the flow and have not yet added the entity CUSTOMER-ORDER to the data model, the system displays a message warning you that CUSTOMER-ORDER does not exist and asking you if you would like to create it.

For a second example, if you have displayed an E-R diagram and attempt to delete an entity that appears in an information flow in the process model, the system warns you that the reference to the entity will be removed from both the information flow and the PDL statement that defines that information flow. You must confirm to delete the entity once you have been warned that the deletion affects the process model.

- Every data or process model object referenced in PDL exists.

Example of add entity in PDL.

Example of delete information flow in PDL.

- Changes to the Analyst model appear immediately in all diagrams and forms that are currently displayed.

Example of moving information flow in PM.

Any time the BACHMAN/Analyst determines that a change you are making to the Analyst model is inconsistent, it either

- Fixes the inconsistency, warning you of the modification that was automatically made by the system.
- Prevents you from making the change, warning you of the inconsistency. In cases like this, the system might also provide you with an opportunity to select an action that would make the change consistent.

Chapter 3
Working With the BACHMAN System

This chapter describes the basic information that you need to know to begin working with the BACHMAN/Analyst. Included in this chapter are descriptions of:

- How OS/2 and *Presentation Manager* relate to the BACHMAN/Analyst.
- How to use the mouse and keyboard.
- How to start and stop the BACHMAN/Analyst.
- How to work with the BACHMAN/Analyst windows.
- How to perform common window operations, such as sizing or moving.
- How to work with diagram windows.
- How to work with form and pop-up windows.
- How to work with menus.

This chapter includes generic OS/2 window and menu information that you might want to skip if you are already familiar with OS/2. Note, however, this chapter also includes information specific to the BACHMAN/Analyst that is not covered anywhere else in this manual.

OS/2 and Presentation Manager

The BACHMAN/Analyst Release 3.10 runs on Operating System/2 (OS/2) Version 1.2, Extended Edition.

OS/2 helps you control the operation of the programs and devices that make up the BACHMAN/Analyst.

OS/2 also provides a multitasking environment that allows you to run not only more than one application at the same time, but also more than one copy of the same application. For example, you can run more than one copy of the BACHMAN/Analyst within a single OS/2 session.

The ability to view more than one application within a single OS/2 session is due to the capabilities of *Presentation Manager*, a graphics-based interface that allows each OS/2 application to be displayed in its own *window*, or area of the screen where application specific information is displayed.

For more information about OS/2 and *Presentation Manager*, refer to the *IBM Operation System/2 Version 1.2 User's Guide* and the OS/2 online tutorial.

Mouse and Keyboard

In the BACHMAN/Analyst, the mouse is the primary input device. However, you can perform most operations using both the mouse and the keyboard.

Mouse Operations

The mouse, as shown in Figure 3-1, is a hand-held pointing device. There are two buttons on the mouse: button 1 and button 2. You hold the mouse and slide it on a flat smooth surface. On the screen, an associated pointer, also shown in Figure 3-1, mimics the motion of the mouse. The pointer can assume different shapes depending on its screen location.

Figure 3-1 Mouse and Pointer

See illustration at chapter end.

In general, just moving the mouse changes nothing except the location of the pointer on the screen and, possibly, the shape of the pointer. The following sections describe the operations that you can perform using different combinations of pressing and releasing mouse buttons. *Pressing* a button means holding a button down while the mouse remains stationary. *Releasing* a button simply means letting go of the button.

Clicking

Clicking a button consists of two operations: pressing down on a button and quickly releasing it while the mouse remains stationary. (If the mouse changes position between pressing and releasing, dragging - not clicking - has occurred).

Clicking is commonly used to *select* (mark or highlight) an object, to move the cursor to a text insertion point, or to turn a control on or off.

Double-Clicking

Double-clicking a button consists of quickly clicking a button twice. When the two clicks are close enough together, in terms of time and screen location, they constitute a double-click.

Double-clicking is commonly used as a shortcut for performing an action. For example, when you open a Diagram window, double-clicking on the diagram icon is a faster way of opening it than clicking once on the icon to select it, and then clicking on Restore in the System Menu to open it.

Dragging

Dragging means pressing and holding a button while moving the mouse to a new location and then releasing the button.

Dragging can have different effects, depending on what is under the pointer when the button is pressed. You can use dragging to select more than one object, select more than one menu choice, and move or resize a window or diagram object.

Mouse Pointer and Text Cursor

In the BACHMAN/Analyst the shape of the mouse pointer changes to indicate the state of the product or system. For example, if you open an Analyst model, the pointer changes from the default arrow pointer to an hourglass, indicating that the system is processing information. In Table 3-1, all of the possible mouse pointer shapes are shown, along with a description of what each shape indicates. Also shown in Table 3-1, are the possible text cursor shapes. Note that a text cursor is different from the mouse pointer; the text cursor marks the location of the keyboard focus. For example, if you move the cursor to a field where you can type information the cursor changes to an I-bar ( ).

Table 3-1 Mouse Pointer and Text Cursor Shapes

| SHAPE | DEFINITION |
|---|---|
| | Default Pointer |
| | Compass |
| | Vertical Arrow |
| | Horizontal Arrow |
| | Diagonal Arrows |
| | Cross: Create Mode |
| | Hourglass: System Processing |
| | Default Text Cursor |
| | I-bar: Text Insertion Mode |

Working With Windows (Add introduction)

Window Types

Although you can have many windows open simultaneously, certain windows must be opened before others. For example, the BACHMAN Desktop, as shown in Figure 3-2, must be opened before all other BACHMAN windows. It is the first window that you see when you start the BACHMAN system.

Figure 3-2 BACHMAN Desktop

See illustration at chapter end.

In Figure 3-3, an open Analyst window is shown. Note that its borders are displayed within those of the BACHMAN Desktop, indicating that its existence depends on the BACHMAN Desktop; when you close the BACHMAN Desktop, you also close any open Analyst windows.

Initially, diagram icons appear in the lower left corner of an Analyst window, representing each diagram associated with the open Analyst model.

For example, if the open Analyst model consists of a data model and an associated process model, one E-R diagram icon and a set of DFD and FD diagram icons, as shown in Figure 3-3, are displayed. These icons represent minimized Diagram windows which you can open by simply double-clicking button 1 on them.

Figure 3-3 Analyst Window and Message Area

See illustration at chapter end.

In addition to an Analyst window, a message area is displayed when you open an Analyst model. The message area, also shown in Figure 3-3, is displayed in the lower portion of the BACHMAN Desktop, and is associated with an entire Analyst model. System messages are displayed in this area when you perform actions on either a data or process model. The message area is scrollable, allowing you to view not only the most recently received message, but also all previously received messages.

Once you have opened an Analyst window, you can begin to work on your model by displaying different Diagram and Form windows. A Diagram window allows you to create or edit a model in a graphical manner, while a Form window allows you to edit detailed information about the objects in a model.

An open E-R Diagram window is shown in Figure 3-4. Note that its borders are displayed within those of the Analyst window, indicating that its existence depends on the Analyst window; when you close the Analyst window, you also close any open Diagram windows. When you display some Diagram windows, a palette, also shown in Figure 3-4, is automatically displayed within the window. You can create or edit objects in a diagram using the palette. For more information about Diagram windows, refer to Working with Diagram Windows in this chapter.

Figure 3-4 Diagram and Form Windows

See illustration at chapter end.

An open Form window is also shown in Figure 3-4. Not only can you enter detailed object information into a form window, but you can also create new objects and display other Form windows from the one that is already opened. Although the borders of a Form window are not explicitly displayed within those of an Analyst window, its existence also depends on an Analyst window; when you close the Analyst window, you also close any open Form windows. For more information about Form windows, refer to Working with Form and Pop-up Windows in this chapter.

Another type of window that is periodically displayed within the BACHMAN/Analyst is a pop-up window. A pop-up window is displayed when the system needs more information. It is always displayed in the frontmost plane of your screen. For example, in Figure 3-5, a Create Entity pop-up window is shown. Before you can create the entity, you must enter specific information about it in this pop-up window.

Figure 3-5 Pop-Up Window

See illustration at chapter end.

In addition to these windows which are common to all data and process models, there are two windows unique to a PDL Diagram window: the Command window and the Options window. For more information about them, refer to the Chapter 9, Introduction to PDL.

Common Window Operations

Since many windows can be opened and displayed within the BACHMAN/Analyst at the same time, you need to be able to identify each window, and manipulate or modify its contents.

A sample window is shown in Figure 3-6, with the different window components labeled. Although not all of these components are included in every window, if they are, they look like those shown in Figure 3-6, with the exception of the System Menu. You need to explicitly open the System Menu. The System Menu is generally the same for every window. However, sometimes a choice might appear in gray text indicating that it is not available for that window. You can display the System Menu using either the mouse or keyboard.

Figure 3-6 Window Components

See illustration at chapter end.

- ▼ To display the System Menu using the mouse:

Click button 1 on the System Menu icon.

- ▼ To display the System Menu using the keyboard:

Press Shift+Esc or Alt+Spacebar.

Arranging Windows on the Desktop

You can display cascading or tiled windows. When windows are displayed so that they overlap each other, as shown in Figure 3-7a, they are referred to as *cascading* windows. When windows are displayed side by side, as shown in Figure 3-7b, they are referred to as *tiled* windows.

Figure 3-7 Cascading and Tiled Windows

| See illustration at chapter end. |
|---|

You can specify these window display options by selecting Cascade or Tile from the Window pull-down menu.

- ▼ To display a minimized window using the mouse:

1. Click button 1 on the window icon.

The System Menu is displayed.

2. Click button 1 on Restore.

The window is restored to its previous or default size.

*Note:* You can also open a window by double-clicking button 1 on the window icon.

Closing a Window

When you finish working in a window you can close it. However, because the existence of some windows depends on others, you might close more than just the desired window. In particular, if you close the BACHMAN Desktop, every other BACHMAN window is closed and you exit from the system.

- ▼ To close a window using the mouse:

1. Click button 1 on the System Menu icon.

The System Menu is displayed.

2. Click button 1 on Close.

The window is closed.

▼ To close a window using the keyboard:

1 Press Shift+Esc or Alt+Spacebar.

The System Menu is displayed.

2 Press Alt+F4 to select Close.

The window is closed.

▼ To close all open windows at the same time: (Post Beta)

Select Close All from the Window pull-down menu.

Moving a Window

Moving a window is useful when you do not want to close or minimize it; you just want to move it to another part of the screen and still be able to quickly access it.

▼ To move a window using the mouse:

1 Position the pointer on any part of the title bar.

2 Press and hold button 1.

3 Drag the mouse in the direction that you want to move the window.

As you drag the mouse, a gray outline of the window is drawn, indicating the new location of the window.

4 Release button 1 when the outline is in the desired location.

The window is moved to the new location.

▼ To move a window using the keyboard:

1 Press Shift+Esc or Alt+Spacebar.

The System Menu is displayed.

2 Press Alt+F7 to select Move.

A gray outline overlays the window border.

3 Press the arrow keys to move the outline in the direction that you want to move the window.

4 Press Enter when the outline is in the desired location.

The window is moved to the new location.

*Note:* You can press Esc at any point in this procedure to cancel the move operation.

Sizing a Window

Sizing a window is useful when you don't want to close, minimize, or maximize it; you just want it to occupy a smaller or larger portion of the screen. When you move the mouse pointer across a window border, the pointer shape changes, indicating the direction in which you can size the window.

▼ To change the height or width of a window using the mouse:

1 Position the pointer on either the top, bottom, left, or right edge of the window.

The pointer shape changes to a vertical ( ) or horizontal arrow ( ).

2 Press and hold button 1 while dragging the mouse in the direction that you want to size the window.

As you drag the mouse, a gray outline of the window is drawn, indicating the new size of the window.

3 Release button 1 when the outline is the desired size.

The window is changed to the new size.

▼ To change the height or width of a window using the keyboard:

1 Press Shift+Esc or Alt+Spacebar.

The System Menu is displayed.

2 Press Alt+F8 to select Size.

A gray outline overlays the window border.

3 Press the up, down, left, or right arrow keys to move the outline in the direction that you want to size the window.

4 Press Enter when the outline is the desired size.

The window is changed to the new size.

*Note:* You can press Esc at any point in this procedure to cancel the size operation.

▼ To change both the height and width of a window using the mouse:

1 Position the pointer on a corner of the window.

The pointer shape changes to a diagonal arrow ( ).

2 Press and hold button 1 while dragging the mouse in the direction that you want to size the window.

As you drag the mouse, a gray outline is drawn, indicating the new size of the window.

3 Release button 1 when the outline is the desired size.

The window is changed to the new size.

Minimizing a Window

Minimizing a window is useful when you want to set a window or application aside, but not necessarily close it or shut it down. For example, if you are working in the BACHMAN/Analyst and want to momentarily return to OS/2, you can minimize the BACHMAN Desktop.

You can minimize a window using either the mouse or the keyboard, however, after the window has been minimized, you must use the mouse to select the window icon.

▼ To minimize a window using the mouse:

Click button 1 on the minimize icon ( ).

The window is displayed as an icon in the lower left corner of the screen.

▼ To minimize a window using the keyboard:

1 Press Shift+Esc or Alt+Spacebar

The System Menu is displayed.

2 Press Alt+F9 to select Minimize.

The window is displayed as an icon in the lower left corner of the screen.

*Note:* You can press Esc at any point in this procedure to cancel the minimize operation.

Maximizing a Window

Maximizing a window is useful when you want the window to occupy a large part of the screen.

▼ To maximize a window using the mouse:

Click button 1 on the maximize icon ( ).

The window is enlarged to its maximum size, possibly taking up the entire screen. At the same time, the maximize icon changes shape and become the Restore icon ( ).

▼ To maximize a window using the keyboard:

1 Press Shift+Esc or Alt+Spacebar.

The System Menu is displayed.

2 Press Alt+F10 to select Maximize.

The window is enlarged to its maximum size, possibly taking up the entire screen.

*Note:* You can press Esc at any point in this procedure to cancel the maximize operation.

Restoring a Window

Restoring a window is useful when you have either minimized or maximized it, and you want it to return to its previous size and location, not the default size and location.

▼ To restore a window using the mouse:

Click button 1 on the restore icon ( ).

The window is restored to the location and size it was before the minimize or maximize operation.

▼ To restore a window using the keyboard:

1 Press Shift+Esc or Alt+Spacebar.

The System Menu is displayed.

2 Press Alt+F5 to select Restore.

The window is restored to the location and size it was before the minimize or maximize operation.

*Note:* You can press Esc at any point in this procedure to cancel the restore operation.

Scrolling a Window

When there is more information available in a window than is currently visible, you can use scroll bars to view all of it. Scroll bars can be either horizontal or vertical and appear at the bottom or right side of a window, respectively.

▼ To scroll a window one line at a time using the mouse:

Click button 1 on the arrow in the scroll bar that points in the direction that you want to scroll.

The window is scrolled up or down one line.

▼ To scroll a window one page at a time using the mouse:

Click button 1 on either side of the slider box.

The window is scrolled up one page if you clicked above the slider box and down one page if you clicked below it.

▼ To scroll a window to a specific location using the mouse:

1 Position the pointer on the slider box.
2 Drag the slider box in the direction that you want to scroll.
3 Release button 1 when you reach the desired location.

▼ To scroll a window one line at a time using the keyboard:

Press the arrow key that points in the direction that you want to scroll.

The window is scrolled up or down one line.

▼ To scroll a window one page at a time using the keyboard:

- Press PgUp or F7 to scroll up one page.
- Press PgDn or F8 to scroll down one page.
- Press Shift+F7 to scroll one page to the left.
- Press Shift+F8 to scroll one page to the right.

Selecting a Window

Even though several windows can be open on the desktop at the same time, you can work in only one window at a time. This window is referred to as the *active* window. Although processing can be taking place in an inactive window, you cannot manipulate it directly; only the active window can be manipulated directly. For example, if you select Close from the File pull-down menu, only the active window is closed. Keep in mind that when you close a window, any windows that are specifically opened within it are also closed. For example, if you close the Analyst window, every window opened within it is also closed.

▼ To make a window active:

Click button 1 anywhere inside the window. The following takes place:

- The title bar is highlighted.
- The window is displayed in the frontmost plane of your screen: any parts that had been covered by other windows become visible.
- The choices on the pull-down menus change to reflect those that are available for the active window; available choices appear in black text while unavailable choices appear in gray text.
- The window is reinstated just as it was before it became active - the same portion of information is displayed and anything that was selected is still selected.

When you have several windows open on your desktop, you might find it quite cluttered or you might forget exactly which windows are open. Regardless of the circumstances, you can rapidly access an open window from the Window pull-down menu. On the pull-down menu there is an associated entry for each open window. This entry consists of a number (ranging from 1 to ?) followed by a window title (Post Beta).

If, for example, you want to modify a field in an open Entity Form, but the window is hidden behind several others, you can go to the Window pull-down menu and click button 1 on the Entity Form entry or type the number that appears to the left of the entry. The Entity Form is then displayed on the desktop in the frontmost plane.

Working with Menus

In the BACHMAN/Analyst, you use menus to select operations that you want to perform and to set system defaults.

Menu Types

The BACHMAN system uses two types of menus: pull-down menus and context menus. In Figure 3-8, examples of both of these menus are shown.

Figure 3-8 Pull-Down Menu and Context Menu

| See illustration at chapter end. |
|---|

A pull-down menu is accessed from the action bar; when you select a choice on the action bar, the associated pull-down menu drops down from that choice. Depending on the state of the application, certain pull-down menu choices may appear in gray text, indicating that they are not currently available.

▼ To display a pull-down menu using the mouse:

Press and hold button 1 on a choice in the action bar.

The associated pull-down menu is displayed.

▼ To display a pull-down menu using the keyboard:

1 Press F10 to select the action bar.

It becomes highlighted.

2 Either type the letter that is underlined in the choice or press the arrow keys to highlight the choice and then Enter to select it.

Context menus can only be accessed when you are working in a Diagram window. They pop up next to a selected object and contain the choices available for that selected object. For example, if you are working with an E-R diagram you can click button 2 on an entity to display the entity context menu. The context menu appears next to the selected entity and lists the available entity-related choices. You cannot display a context menu using the keyboard.

▼ To display a context menu using the mouse:

Click button 2 on any object.

The context menu is displayed next to the object.

Selecting Menu Choices

Once a menu is displayed, you can select a choice using either the mouse or the keyboard.

▼ To select a menu choice using the mouse:

1 Position the pointer on the desired choice.

The choice becomes highlighted.

2 Click button 1 on the desired choice.

The associated action takes place.

*Note:* If you move the pointer over a menu choice with button 1 pressed, the choice is highlighted, indicating that when you release the button it will be selected.

▼ To select a menu choice using the keyboard:

1 Press the arrow keys to move the highlight to the desired choice.

2 Press Enter.

The associated action takes place.

*Note:* If the highlight does not follow the cursor movement, press the Spacebar to select the choice.

Menu Components

There are certain components included in menus that allow you to select the menu choice with the keyboard, or they indicate that certain actions will take place when you select that choice.

In Figure 3-9, a sample menu is shown with pointers to the different menu components.

Figure 3-9 Menu Components

See illustration at chapter end.

Mnemonic

A mnemonic is a letter that is underlined in a menu choice, allowing you to select that choice with the keyboard. You just type the letter that is underlined in the choice and the corresponding action takes place.

Number

A number, if available, is displayed to the left of a menu choice, allowing you to select that choice using the keyboard. You just type the associated number and the corresponding action takes place.

Accelerator

Accelerators are keys or combinations of keys that allow you to perform certain operations using just the keyboard.

Accelerators, if available, appear to the right of a menu choice. When you see an accelerator that is a combination of keys, such as Ctrl+Esc, it means to press and hold down the first key while pressing and releasing the second one. You do not have to display a menu if you already know the accelerator for the choice that you want.

Ellipsis

An ellipsis appears to the right of a menu choice, indicating that when you select that choice a pop-up window is displayed.

Cascading Menu Icon

The cascading menu icon appears to the right of a menu choice, indicating that when you select that choice a cascading menu is displayed to the right of the choice.

Starting the BACHMAN/Analyst

▼ To start the BACHMAN/Analyst:

1 Select BACHMAN ReEngineering Product Set from the OS/2 Desktop Manager window.

The Group window is displayed.

2 Select BACHMAN Analyst 3.10 from the Group window.

The system loads the BACHMAN software.

3 Enter your user name in the User Login pop-up window.

4 Select OK.

The BACHMAN Desktop is displayed.

▼ To exit from the BACHMAN/Analyst:

Select Exit from the File pull-down menu.

The system closes all files and returns to the original OS/2 screen.

Working with Diagram Windows

Once you have opened an Analyst window, you can begin to work on your model by displaying different Diagram and Form windows. A Diagram window allows you to create or edit a model in a graphical manner, while a Form window allows you to edit detailed information about the objects in a model. There are four Diagram windows in the BACHMAN/Analyst, each displaying a different diagram. In Figures 3-10 through 3-13, the different Diagram windows are shown.

Figure 3-10 E-R Diagram Window and Palette

See illustration at chapter end.

Figure 3-11 DFD Diagram Window and Palette

See illustration at chapter end.

Figure 3-12 FD Diagram Window

See illustration at chapter end.

Figure 3-13 PDL Diagram Window

See illustration at chapter end.

Creating Diagram Objects Using the Palette

A palette, as shown in both Figures 3-10 and 3-11, allows you to work on your model in a purely graphical manner. You can create and edit a diagram simply by selecting symbols from the palette and performing a few mouse operations. You use the palette much like a painter uses his own: you select symbols to populate a diagram just as a painter selects paint to paint a picture.

In Figure 3-14, the E-R palette is shown, with each symbol labeled. In Figure 3-15, the DFD palette is shown, with each symbol labeled. (FD palette - Post Beta).

Figure 3-14 E-R Palette

See illustration at chapter end.

Figure 3-15 DFD Palette

See illustration at chapter end.

▼ To create an object using the palette:

1 Click button 1 on a symbol in the palette.

The symbol becomes highlighted and the associated create pop-up window is displayed. (In addition, the pointer shape changes to a cross and a message is displayed in the message area telling you the specific create mode that you are in - Post Beta)

For example, if you create an entity in this way, the Create Entity pop-up window is displayed and a message, "Entering create entity mode", is displayed in the message area.

2 Click button 1 on OK or Cancel when you have finished defining the object.

The object is placed in the diagram and the system exits the create mode. A message is displayed in the message area telling you that you have exited the create mode.

For example, if you created an entity, it is placed in the diagram and a message, "Leaving create entity mode", appears in the message area.

*Note:* You can also exit a mode by selecting another palette symbol or by clicking button 1 on the same symbol; palette symbols act as toggle switches - you can turn them on and off by simply selecting or deselecting them.

Selecting and Deselecting Diagram Objects

Before you can perform an operation (other than create) on a diagram object, you need to select it. You can select a single object or a group of objects. Once an object is selected, you can move it, size it, display its form, display its context menu, or perform an action bar operation.

▼ To select a single object using the mouse:

Click button 1 on the object.

A gray outline overlays the object border. In addition, any previously selected objects are deselected.

▼ To deselect a single object using the mouse:

Click button 1 on the diagram background.

The object is no longer selected.

*Note:* Object lables and text blocks are diagram objects and can be selected.

▼ To select a group of objects using the mouse:

1 Press and hold button 1 on the diagram background.

2 Drag the mouse across the objects that you want to select.

As you drag the mouse, a box is drawn that encloses the selected objects.

3 Release button 1 when you have finished selecting objects.

a gray outline overlays each selected object border.

▼ To select a group of objects using the mouse and keyboard:

1 Press and hold the Shift key.

2 Click button 1 on each object that you want to select.

A gray outline overlays each object border and a box encloses all of the selected objects.

3 Release the Shift key when you have finished selecting objects.

▼ To deselect one object in a group using the mouse:

1 Press and hold the Shift key.

2 Click button 1 on the object that you want to deselect.

▼ To deselect all objects in a group using the mouse:

Click button 1 on the diagram background.

Holding the Shift key while you perform mouse operations preserves the current selection of objects. Without the Shift key depressed, a mouse click de-selects all selected objects in the diagram.

Changing the View of a Diagramg

Changing the view of a diagram allows you to see a different portion of a diagram. When a diagram is first displayed, it is displayed in its entirety. You can change the portion of the diagram that you see by enlarging and reducing the size of the objects in the diagram.

▼ To display an entire diagram using the mouse:

1 Select Diagram from the action bar.

The Diagram pull-down menu is displayed.

2 Select Fit from the Diagram pull-down menu.

The size of all diagram objects are adjusted so that they all appear in the Diagram window.

▼ To display an entire diagram using the keyboard:

Press the Home key.

The size of all diagram objects are adjusted so that they all appear in the window.

▼ To enlarge or reduce the size of objects in a diagram using the mouse:

1 Select Diagram from the action bar.

The Diagram pull-down menu is displayed.

2 Select Zoom from the Diagram pull-down menu.

A cascading menu is displayed with a zoom scale of 1 through 8: 1 produces the largest sized objects while 8 produces the smallest sized objects.

3 Click button 1 on the number associated with the desired object size.

The size of all diagram objects are adjusted accordingly.

▼ To enlarge or reduce the size of objects using the keyboard:

- Press PgUp to enlarge the size of objects.
- Press PgDn to reduce the size of objects.

▼ To zoom in on a portion of the diagram using the mouse:

1 Press and hold button 2 on the diagram background.

2 Drag the mouse across the objects that you want to zoom in on.

As you drag the mouse, a box is drawn that encloses all of the objects.

3 Release button 2 when all of the objects that you want to zoom in on are enclosed in the box.

The size of the objects are adjusted so that only those in the box are displayed in the Diagram window.

Annotating a Diagram

*Note:* In the Beta release, FD text blocks are not available.

You can annotate a diagram by inserting blocks of text in the diagram itself. You can insert a text block using the palette or the diagram context menu. Once you have inserted a text block in a diagram, you can select it and move it like any other diagram object.

▼ To add a text block using the palette:

1 Display a diagram.

2 Click button 1 on the ABC palette symbol.

The symbol becomes highlighted and a message is displayed in the message area indicating that you are in a create text block mode.

3 Click button 1 on the location in the diagram where you want to insert the text block.

The system displays a text cursor at the selected location.

*Note:* If you click on an existing text block, the system enters an edit, as opposed to create, mode. To exit from the edit mode, click outside of the existing text block. To then start the create process, click somewhere else in the diagram.

4 Type the desired text (up to 500 characters) using any characters, spaces, or carriage returns.

Because the system is in a create text block "mode", you can add another text block by repeating steps 3 and 4.

▼ To exit the create text block mode:

1 Click button 1 on the diagram background and then do one of the following:

- Press Esc.
- Select a palette symbol.
- Select an action bar choice.

A message appears in the message area indicating that the system has exited from the create text block mode.

▼ To add a text block using the diagram context menu:

1 Display a diagram.

2 Click button 2 on the diagram background

The diagram context menu is displayed.

3 Select Create Text Block from the context menu.

The system displays a text cursor at the location where you clicked button 2.

4 Type the text (up to 500 characters) using any characters, spaces, and carriage returns.

To add another text block, you can repeat this procedure

Changing the Layout of a Diagram

The layout of the functional decompostion (FD) and Process Description Language (PDL) diagrams contribute to the definition of an Analyst model:

- The FD diagram shows the hierarchy of the processes in the model. The diagram is also used to imply a processing order for those processes. Thus, changing the layout of the FD diagram changes the definition of the process model.

To change the layout of an FD diagram, drag any process in the diagram up or down the vertical bar of the diagram.

- The PDL diagram describes the logic of a PDL process. Changing the order of the PDL statements within the diagram, again changes the definition of the process model.

For information about changing the layout of a PDL diagram, refer to Chapter 10.

The layout of the Entity-Relationship (E-R) diagram and the data flow diagram (DFD) is important for presentation purposes and for ease of use. However, the layout of these diagrams does not contribute to the definition of the Analyst model.

This section describes how to change the layout of the E-R and DFD diagrams. Although the objects in these diagrams are different, you size objects, move objects, and reroute lines the same way in either diagram.

Changing the Size of Diagram Objects

The *standard size* of an entity (E-R diagram), process (DFD), source/destination object (DFD), information store (DFD), or text block (E-R or DFD) is its minimum size. The system initially displays a diagram object using its minimum size. You can then change its size by dragging one of its borders or corners.

▼ To change the size of an entity, process, source/destination object, information store, or text block:

1 Move the mouse pointer over the border or corner of the object.

The shape of the mouse pointer is dynamic:

- A vertical double-ended arrow indicates that you are on a border that you can move vertically.
- A horizontal double-ended arrow indicates that you are on a border that you can move horizontally.
- A diagonal double-ended arrow indicates that you are on a corner, which you can move vertically, horitzontally, or diagonally.

2 Press and hold button 1.

3 Drag the mouse pointer in the desired direction.

A ghost image of the object's border moves with the mouse pointer.

4 Release the mouse button when the ghost image reaches the desired size.

▼ To change the size of a group of these objects:

1 Select the objects.

2 Press and hold the Shift key.

3 Change the size of one of the objects in the group.

The selected object acts as the controller object. As you change the size of the controller object, the ghost images of all the objects change.

4 Release the mouse button when the ghost images reach the desired size.

*Note:* Text blocks cannot be sized as a group because they cannot be included in a bounding box.

▼ To return an entity, process, source/destination object, information store, or text block to its standard size:

1 Select the object.

2 Select Standardize size from the Diagram pull-down menu or from the object's context menu.

Moving Diagram Objects

You can change the location of an entity (E-R diagram), process (DFD), source/destination object (DFD), information store (DFD), or text block by:

- Dragging the object.

- Changing the amount of space between two or more objects.
- Aligning two or more objects in a row or column.

When you move an object to a new position, any object already near or at that position is plowed out of the way.

*Note:* A text block can only be moved by dragging it individually. All other moves are done using bounding boxes. Because text blocks cannot be included in a bounding box, they cannot participate in moves that use bounding boxes.

▼ To move an entity, process, information store, source/destination object, or text block:

1 Move the mouse pointer over the object.

2 Press and hold button 1.

3 Drag the mouse pointer in the desired direction.

A ghost image of the object moves with the mouse pointer.

4 Release the mouse button when the ghost image reaches the desired location.

▼ To move a group of diagram objects (except text blocks):

1 Select the objects.

2 Press and hold the Shift key.

3 Move the mouse pointer inside the bounding box.

Be careful of where you place the pointer. If the mouse pointer is on the border or corner of a selected object, you resize the group of selected objects when you drag the mouse. If the mouse pointer is on the border or corner of the bounding box, you change the amount of space between the objects when you drag the mouse.

4 Press and hold button 1.

5 Drag the mouse pointer in the desired direction.

As you drag the mouse, the bounding box and the ghost images of all the selected objects move.

6 Release the mouse button and Shift key when the ghost images reach the desired position.

▼ To change the amount of space between two or more objects (except text blocks):

1 Select the objects.

2 Press and hold the Shift key.

3 Move the mouse pointer over the border or corner of the bounding box.

Be careful of where you place the pointer. If the mouse pointer is inside of the bounding box, you move or resize the objects as a group when you drag the mouse.

4 Press and hold button 1.

5 Drag the mouse pointer in the desired direction:

- Making the bounding box wider changes the horizontal spacing of the objects.
- Making the bounding box taller changes the vertical spacing of the objects.

The minimum size of the bounding box leaves an adequate amount of space between all of the selected objects.

6 Release the mouse button and Shift key when the ghost images are appropriately spaced.

▼ To align two or more objects (except text blocks) in a row or columns:

1 Select the objects.

2 Select Align in Row or Align in Column from the Diagram pull-down menu or the context menu of one of the objects.

Rerouting Diagram Lines

You can reroute a partnership line (E-R diagram) or an information flow (DFD) by:

- Moving a line segment. (Post Beta)
- Moving the end points of the line.
- Moving the vertices of the line. (Post Beta).
- Manually rerouting the line.

When you move a partnership line or information flow, the associated label moves also. If necessary, you can move the label independently by dragging it (refer to the procedure in Moving Diagram Objects).

*Note:* When moving a line, if you place it close to a horizontal or vertical position, the system snaps the line to the horizontal or vertical position.

Moving a Line Segment

If a partnership line or information flow is a straight, vertical or horizontal line, the following procedure moves the entire line without changing its orientation. If the line consists of a number of segments, the following procedure can be used to move any one of the segments.

▼ To move a line segment:

1 Move the mouse pointer over the line.

The shape of the mouse pointer is dynamic:

- A vertical double-ended arrow indicates that you can move the line vertically.
- A horizontal double-ended arrow indicates that you can move the line horizontally.

2 Press and hold button 1.

3 Drag the mouse pointer in the desired direction.

The system displays a ghost image of the line segment that moves with the mouse pointer.

4 Release the mouse button when the line segment reaches the desired position.

Moving the End Points (or Vertices - Post Beta)

In an E-R diagram, the end points of a partnership line are partnership-sets. In a DFD, the end points of an information flow are the points at which the information flow touches its source object and its destination object.

The end points of a line are always on the border of an entity, process, information store, or source/destination object. They can be moved to any other point on the same object. You cannot move the end point of a line to another object because doing so would change the definition of the model.

▼ To move an end point or vertex of a line:

1 Move the mouse pointer along the line until it changes to a compass.

2 Press and hold button 1.

3 Drag the mouse pointer in the desired direction.

The system displays a ghost image of the line (or partnership-set) that moves with the mouse pointer.

4 Release the mouse button when the line (or partnership-set) reaches the desired position.

Manually Rerouting a Line

Manually rerouting a line allows you to draw a new path for the line by selecting the vertices along that path.

▼ To manually reroute a line:

1 Select the manual reroute icon from the palette.

2 Select a point on the line that you are rerouting.

3 Select the vertices of the new path, in order.

A ghost image of the line moves with the mouse pointer as you select the vertices of the new path.

4 Select a second point on the original line to finish drawing the new path.

5 Return to step 2 to reroute another line or select the manual reroute icon again to exit from the mode.

Alternatively, you can reroute a line by selecting Manual Reroute from its context menu.

Displaying a Diagram in More Than One Window

Once you have displayed a diagram, you can display another copy of the same diagram or another type of associated diagram.

▼ To display another diagram:

1 Select New Diagram from the Diagram pull-down menu.

A cascading menu is displayed with the different diagram types (that you can access from the current diagram) listed: E-R, DFD, FD, and PDL.

For example, the PDL choice is displayed in gray text because it is unavailable unless you select a primitive process in a diagram or form before selecting New Diagram from the pull-down menu.

2 Select any available diagram type.

The selected diagram is displayed in another Diagram window.

For example, if a DFD is displayed and you select DFD from the New Diagram cascading menu, another DFD window is displayed containing the same diagram.

Working with Form and Pop-up Windows

While using the BACHMAN/Analyst, there are times when you must enter specific information into a window. Usually, this information is entered into a Form window or Pop-up window. In Figure 3-16, a sample form window is shown. Note that you can move between fields in a window with the mouse, the keyboard, or a combination of both.

Figure 3-16 Form Window

| |
|---|
| See illustration at chapter end. |

▼ To move between fields using the mouse:

Click button 1 on the field that you want to move to.

It becomes the active field.

▼ To move between fields using the keyboard:

- Press Tab to move the cursor forward from field to field.
- Press Shift + Tab to move the cursor backward from field to field.

*Note:* Enter is equivalent to the default pushbutton: Apply or OK.

In Figure 3-17, many but not all of the different types of fields that can appear in a window are show. The following sections describe the different types of fields that can exist within a form or pop-up window and how to enter information into them.

Figure 3-17 Window Fields

See illustration at chapter end.

Radio Buttons

Radio buttons are placed to the left of items in a group. From this group you can only select one item. When you select a radio button, its circle is partially filled in. If, after selecting one radio button, you select a different one, the previous button is no longer selected.

▼ To select a radio button using the mouse:

Click button 1 on the radio button.

The radio button's circle is partially filled in.

▼ To select a radio button using the keyboard:

1 Press the Tab key to move to the group of radio buttons.

2 Press the arrow keys to move the cursor to the radio button that you want to select.

The radio button's circle is partially filled in.

Check Boxes

Check boxes are placed to the left of items in a list. From this list you can select one or more items. When a check box is selected, the system places an X in it. When it is selected again, the system removes the X.

▼ To select a check box using the mouse:

Click button 1 on the check box.

An X is placed in the box.

▼ To select a check box using the keyboard:

1 Press the Tab key to move to the group of check boxes.

2 Press the arrow keys to move the cursor to the check box that you want to select.

3 Press the Spacebar to select it.

An X is placed in the check box.

Entry Fields

Entry fields are simply a part of a window where you can type information. Some entry fields allow more text than is currently visible.

▼ To enter a value to in entry field using the mouse do one of the following:

- Click button 1 on the entry field.

A text cursor appears in the field. Type the value in the field.
- Select the value from the associated list box, if one exists.

The value is highlighted and appears in the entry field.

▼ To enter a value to in entry field using the keyboard:

1 Press the Tab key until the text cursor appears in the field.

2 Type the value in the field or select it from the associated list box, if one exists.

*Note:* An asterisk to the left of an entry field name indicates that you can display another form from that field by double-clicking button 1 in the entry field. For example, in an Information Flow form, the process model field name appears as "* Process Model". If you double-click button 1 in the field, the Process Model form is displayed.

*Note:* If entry field name is displayed in gray text you cannot edit the value in that field. For Beta, if you do edit the value in the field, when you press OK the value is changed back to its original value and an error message is displayed.

List Boxes

A list box is a rectangular box that contains a list of scrollable choices.

▼ To select items in a list box using the mouse:

Click button 1 on each item that you want to select.

The item becomes highlighted.

If an entry field is associated with the list box, indicating that you can only select one item, the item is also displayed in the entry field.

▼ To select items in a list box using the keyboard:

1 Press the Tab key to move the cursor to the list box.

2 Press the arrow keys to move to each item that you want to select.

Each item becomes highlighted.

If an entry field is associated with the list box, indicating that you can only select one item, the item is also displayed in the entry field.

*Note:* An asterisk to the left of a list box name indicates that you can navigate to another form from that list box by double-clicking button 1 on an item in it. For example, in an Information Flow Model form, the synonym list box name appears as "* Synonyms". If you double-click button 1 on a synonym in the list box, the associated Synonym form is displayed.

Pushbuttons

If a window does not have an action bar associated with it, pushbuttons often appear in the window allowing you to perform certain actions. Some common pushbuttons are OK, Apply, Cancel, and Help.

When a pushbutton is selected, the action indicated by the text in the pushbutton occurs immediately.

▼ To select a pushbutton using the mouse:

Click button 1 on the pushbutton.

▼ To select a pushbutton using the keyboard:

1 Press the Tab key to move to the group of pushbuttons.
2 Press the arrow keys to highlight the desired pushbutton; a darker border indicates that it is highlighted.
3 Press Enter to select the pushbutton.

Spin Buttons

A spin button allows you to specify a field value by scrolling through a ring of choices.

▼ To select a value using the mouse:

- Press and hold button 1 on either the up or down arrow until the desired value is displayed.

▼ To select a value using the keyboard:

1 Press the Tab key to move the cursor into the field.
2 Type in the desired value.

Chapter 4
Working With an Analyst Model

This chapter describes operations that are performed on the entire Analyst model. Subsequent chapters describe operations that are performed on the data and process models.

The operations discussed in this chapter include:

- Creating new models, opening existing models, and saving models.
- Importing Analyst model information from a formatted ASCII file and exporting Analyst model information to a formatted ASCII file.
- Deleting, renaming, and merging Analyst models.
- Searching for objects in an Analyst model.
- Using filters to view a subset of the objects in an Analyst model.
- Deleting or copying objects in an Analyst model. (Copying to be supplied after Beta when the clipboard becomes available.)
- Undoing, redoing, and logging operations.
- Printing diagrams and screens.
- Producing reports.
- Managing an Analyst model being developed and maintained by a number of different people. (To be supplied after Beta.)

Creating a New Analyst Model

▼ To create a new Analyst model:

1 Select New from the File pull-down menu.

A cascading menu appears.

2 Select Analyst Model from the cascading menu.

The New Analyst Model pop-up window appears, as shown in Figure 4-1. Descriptions of the fields follow the figure.

3 Enter a name for the Analyst model in the Model Name field.

4 Optionally, you can enter a file name and data model name. By default, the system uses the Analyst model name for both of these.

5 Enter a process model name for each process model that you want to include in the Analyst model. If you do not enter a process name, no process models are created.

6 Select the OK pushbutton to create the new Analyst model.

Figure 4-1 New Analyst Model Pop-Up Window

See illustration at chapter end.

1 File name

Enter a name for the file in which to store the Analyst model. If you do not enter a file name, the system uses the first 8 characters of the name specified in the Model name field. If you enter a directory in this field, the system uses that directory. Otherwise, the directory is the one specified in the Default User Directory field of the current User Profile. (The full file name of an Analyst model appears on the Analyst Model form.)

2 Model name

Enter a name for the new Analyst model. The name can be a maximum of 75 characters. It can include letters, numbers, pound sign (#), dollar sign ($), ampersand (&), and separator characters. The separator characters, underscore (_), dash (-), and space, are equivalent. Upper- and lowercase characters are also equivalent. Leading and trailing spaces are removed.

3 Data model

Enter a name for the data model of the new Analyst model. Follow the naming rules listed in the Model name field. If you do not enter a data model name, the system uses the name specified in the Model name field.

4 Process model

Optionally, enter the names of one or more process models for the new Analyst model. Follow the naming rules listed in the Model name field. If you do not enter a process name, the new Analyst model will not include a process model.

When you create a new Analyst model, the system automatically opens that model. When a model is opened, the system displays an Analyst window, as shown in Figure 4-2. The icons in the lower left corner of the window represent the minimized data model and process model diagrams: an Entity-Relationship (E-R) diagram for the data model, and a data flow diagram (DFD) and functional decomposition (FD) diagram for each process model. The Analyst model opened in Figure 4-2 has two process models, so the system displays two DFD icons and two FD icons.

Figure 4-2 Analyst Window

See illustration at chapter end.

▼ To display the diagram associated with an icon:

Double-click button 1 on the icon.

▼ To display the Analyst Model form for the Analyst model:

1 Minimize all open diagram windows. If you just created a new Analyst model, the diagram windows are minimized.

2 Double-click button 1 on the background of the Analyst window.

Opening an Existing Analyst Model

▼ To open an existing Analyst model:

1 Select Open from the File pull-down menu.

The Open Model pop-up window appears, as shown in Figure 4-3. Descriptions of the fields follow the figure.

2 Select an Analyst model file from the Files list box or enter the name of an Analyst model file into the File Name field. Analyst model files usually have a file extension of .AN.

3 Select the OK pushbutton to open the selected Analyst model.

When you open an Analyst model, the system displays an Analyst window, as discussed in Creating a New Analyst Model.

Figure 4-3 Open Analyst Model Pop-Up Window

See illustration at chapter end.

1 File name

Enter a file name or a wildcard specification. If you enter a file name, the system opens the Analyst model in that file. If you enter a wildcard specification, the system uses the Files list box to display the file names that match the specification. The following wildcards are allowed:

- Asterisk (*), which matches zero or more characters.
- Question mark (?), which matches exactly one character.

The Files list box initially contains all the files in the current directory with a .AN extension because the File Name field contains the wildcard specification *.AN.

2 Directory

The Directory field displays the name of the current directory. To change directories, use the Directories list box:

- Select [..] to move up a directory.

- Select a directory name to move to that directory.
- Select a drive name to move to that drive.

Saving an Analyst Model

Saving an Analyst model writes the information from the data model and all process models to a file. You cannot save the data or process models individually.

▼ To save an Analyst model:

Select Save from the File pull-down menu.

The system writes the Analyst model information in the file that you specified when you created the Analyst model.

▼ Alternatively, you can use Save As to write the information to a different file:

1 Select Save As from the File pull-down menu.

The Save Analyst Model pop-up window appears, as shown in Figure 4-4.

2 Optionally, select a directory for the new Analyst model file. The Directory field works like the one in the Open Analyst Model pop-up window; refer to the description following Figure 4-3.

3 Enter a new Analyst model file name in the File Name field.

4 Select the OK pushbutton to save the Analyst model to the specified file.

Figure 4-4 Save Analyst Model Pop-Up Window

See illustration at chapter end.

Importing and Exporting an Analyst Model

An *import/export file* is a specially formatted ASCII file that contains Analyst model information. The main purpose of an import/export file is to allow you to transfer information between the BACHMAN/Analyst and other applications.

The Import task reads Analyst model information from an import/export file into a new Analyst model. The Export task of the BACHMAN/Analyst writes Analyst model information to an import/export file.

If you want to use the Analyst model information with a non-Analyst application, you can write your own program to move the information between the import/export file and that non-Analyst application. For a detailed description of the import/export file format, refer to Appendix A.

Importing Analyst Model Information

The Import task reads data into an Analyst model from a specially formatted import/export file. For a detailed description of the file format, refer to Appendix A.

▼ To import information into an Analyst model:

1 Create a new Analyst model.

2 Select Import from the Tasks pull-down menu.

The Import Model pop-up window appears, as shown in Figure 4-5.

3 Select an import/export file from the Files list box or enter the name of an import/export file into the File Name field.

Import/export files usually have an extension of .VAR. The Files and Directories list boxes in the Import Model pop-up window work like those in the Open Analyst Model pop-up window; refer to the descriptions following Figure 4-3.

4 Select the OK pushbutton to import the selected import/export file.

*Note:* Duplicate names errors might occur when you import Release 2.10 models into the BACHMAN/Analyst Release 3.10. In Release 2.10, periods (.) and ampersands (&) are both valid characters in object names. In Release 3.10, periods are no longer valid object names characters; they are converted to ampersands.

Figure 4-5 Import Model Pop-Up Window

| |
|---|
| See illustration at chapter end. |

Undoing an Import

You can undo an import operation. You cannot undo the creation of the new Analyst model. To delete a new, unwanted Analyst model, close the Analyst window.

Exporting Analyst Model Information

The Export task writes data from an Analyst model into a specially formatted import/export file. For a detailed description of the file format, refer to Appendix A.

▼ To export information from an Analyst model:

1 Open the Analyst model.

2 Select Export from the Tasks pull-down menu.

The Export Model pop-up window appears, as shown in Figure 4-6.

3 Select an import/export file from the Files list box or enter the name of an import/export file into the File Name field.

*Note:* If you select an existing file, the system overwrites the information in that file.

Import/export files usually have an extension of .VAR. The Files and Directories list boxes in the Export Model pop-up window work like those in the Open Analyst Model pop-up window; refer to the descriptions following Figure 4-3.

4 Select whether to use Version 3.10 or Version 2.10 format for the import/export file.

If you select Version 3.10, you can import the resultant import/export file into Release 3.10 of the BACHMAN/Analyst product. If you select Version 2.10, you can import the resultant import/export file into Release 2.10, 2.15, or 2.20 of the BACHMAN/Data Analyst product, or into Release 3.10 of the BACHMAN/Analyst.

5 Select whether to use fixed or variable format for the import/export file. Information in fixed-format files appears at specific locations on a line. Information in variable-format files is separated by commas.

6 Select the OK pushbutton to export the Analyst model information to the selected import/export file.

Figure 4-6 Export Model Pop-Up Window

| |
|---|
| See illustration at chapter end. |

Import/Export File Format

The BACHMAN/Analyst provides four import/export file formats:

| | |
|---|---|
| Version 2.10 fixed format | Version 2.10 variable format |
| Version 3.10 fixed format | Version 3.10 variable format |

The Version 2.10 formats contain only the information that can be read by the BACHMAN/Data Analyst, Versions 2.10, 2.15, or 2.20. This is a subset of the Version 3.10 information.

In all four file formats, each line of the file contains information about a single model object. In the fixed file formats, each piece of information appears at a specific location on the line. In the variable file formats, each piece of information is followed by a comma to separate it from the following piece of information.

Figure 4-7 shows the beginning of an import/export file in Version 3.10 variable format.

The first nonblank line contains the version number of the BACHMAN system that is exporting or importing the file. The remainder of the file contains tables of model objects.

An import/export file contains a table for each type of object that an Analyst model can contain. Each object in the Analyst model is defined as a row in the appropriate table. For example, if you export a data model containing one entity, the entity table of the import/export file contains a single row, as shown in Figure 4-7.

A table's columns define the information in the table. For example, to understand the information in the entity table, use the following column definitions:

| | |
|---|---|
| entitykey | identification number for the entity |
| createdby | person who created the entity |
| createdtime | time the entity was created |
| modifiedby | person who last modified the entity |
| modifiedtime | time the entity was last modified |
| name | entity name |
| minvol | minimum volume |
| maxvol | maximum volume |
| expvol | expected volume |
| grwpct | growth percentage |
| entity | parent entity |
| outline | eight coordinates that define the entity's location in the E-R diagram |
| valbits | eight validation bits used by the system |
| text | the identification number of the text object for the entity description (you can find that text object in the text table) |

Appendix A describes the columns in each table of the Version 3.10 import/export files.

> ☛ *The Version 3.10 fixed format is not available for Beta. The Version 2.10 single file formats are available; however, their descriptions have not been incorporated into the 3.10 documentation. For Beta, refer to Chapter 14 of the BACHMAN/Data Analyst Reference manual for descriptions of the 2.10 formats.*

Figure 4-7 Export File: Version 3.10, Variable Format

See illustration at chapter end.

Deleting an Analyst Model

▼ To delete an Analyst model:

Delete the Analyst model file using the OS/2 DEL command.

Renaming an Analyst Model

☛ *To be supplied after Beta.*

▼ To rename an Analyst model:

1. Open the Analyst model.
2. Select Rename from the File pull-down menu.
3. Enter the new Analyst model name and file name in the pop-up window that appears.

Merging Analyst Models

☛ *To be supplied after Beta.*

The BACHMAN/Analyst also allows you to merge the following:

- Process models, as shown in Merging Process Models.
- Data models, as shown in Merging Data Models.
- Analyst model objects of the same type, as shown in the editing section of the object type. For example, refer to Editing Processes for information about merging processes.

Using Find to Locate an Analyst Model Object

It might be time-consuming to locate an object on a large diagram. The BACHMAN/Analyst provides the Find command so that you can rapidly locate any object in an Analyst model. Once the object is located, you can select it, de-select it, or edit it.

▼ To find an Analyst model object:

1. Select Find from the Edit pull-down menu.

An Object Finder pop-up window appears, as shown in Figure 4-8.

2 Check the Select List box at the top of the Object Finder window if you want to limit your search to objects on the select list.

3 In the Object Types list box, double-click button 1 on the type of object that you want to find.

All objects of the selected type appear in the Objects list box in alphabetical order. (If you checked the Select List box, objects of the selected type that are on the select list appear.)

4 In the Objects list box, select the object that you want to find.

The Objects list box displays only those objects that are alphabetically later than the name (if any) entered in the Object Name field. To shorten the list of objects in the Objects list box, enter a name in the Object Name field. To redisplay the full list of object names, delete the name from the Object Name field.

5 Select one of the following operations for the selected object:

- Select to add the object to the select list.
- Deselect to remove the object from the select list.
- Select & Edit to display the form for the object.

6 Select the Apply or OK pushbutton to perform the operation.

- Apply leaves the Find Object window open so that you can select another object or operation.
- OK closes the Find Object window.

Figure 4-8 Object Finder Pop-Up Window

See illustration at chapter end.

Using Filters to View and Operate on a Subset of a Model

A filter allows you to view and operate on a subset of a model. The objects that are included in a filtered version of a model are determined by selection criteria that you define when you create a filter.

You can create multiple filters for the same model, allowing you to have more than one subset of the same model. However, only one filter can be active at a time. For example, if you want to display objects created by a specific user and also display objects of a certain type, you can define two filters, each including those respective objects. Both of these filters would be applied to the same original model, but they would each produce a unique subset of that model.

Creating a Filter

▼ To create a filter:

1. Select Some from the View pull-down menu.

The Filter Form, as shown in Figure 4-9, appears on the screen.

2. Specify the desired filter selection criteria in the Filter Form.
3. Select Apply or OK.

If you select Apply, the filter is saved for the current session but the form is not closed. If you select OK, the filter is saved for the current session and the form is closed.

*Note:* A filter is permanently saved when you save the associated model.

If a diagram is displayed when you select OK, the filter takes effect immediately; all objects that do not meet the selection criteria are automatically cleared from the diagram. For example, assume an E-R diagram is displayed and you create a filter that includes only entities. When you select OK on the Filter Form, the E-R diagram is re-drawn with all of the partnership sets cleared from it.

Figure 4-9 The Filter Form

See illustration at chapter end.

Defining Filter Selection Criteria

When you select Some from the View pull-down menu, the Filter Form appears. The following sections describe the different fields that appear on this form, along with descriptions of the type of information that can be entered in these fields, and, for some fields, descriptions of how to enter that information.

Filter Name

The name of a filter. This can be either a new or an existing filter name.

▼ To enter a new filter name:

Type the name in the field.

▼ To enter an existing filter name:

- Type the name in the field.
- Select the name from the Filters list box.

The other fields in the form change to reflect the selection criteria specified for that filter.

Keywords List Box

A list of unique identifiers associated with objects in an Analyst model. Keywords are commonly displayed in an object's form. The following procedures describe how to select and deselect keywords from the list box.

▼ To select one keyword:

Click button 1 on the keyword.

The keyword becomes highlighted.

▼ To select more than one keyword:

Click button 1 on each keyword that you want to select.

Each keyword becomes highlighted.

▼ To deselect a keyword:

Click button 1 on the keyword that you want to deselect.

The highlight is removed from the keyword.

Created by

A user name. This can be any valid user name. If, for example, you want to see only objects created by user McCALL, you can enter McCALL in this field.

Updated by

A user name. This can be any valid user name. If, for example, you want to see only objects that were most recently updated by user McCALL, you can enter McCALL in this field.

Objects List Box

A list of object types in a Analyst model. You can select one or more of these object types to be included in a filtered model.

▼ To select only one object type:

Click button 1 on the object type.

It becomes highlighted.

▼ To select more than one object type:

Click button 1 on each object type that you want to select.

Each object type becomes highlighted.

▼ To deselect an object type:

Click button 1 on it

The highlight is removed.

Time created: From and To

A date and time. The format is mm-dd-yy_hh:mm. Where, mm= month (1 - 12)
dd = day (1 - 31)
yy = year (0 - 99)
hh= hour (1 - 24)
mm = minute (0 - 60)

You do not have to enter values in both of these entry fields.

*Note:* If you only specify a value in the From entry field, the To entry field is automatically supplied with the current date and time when you select either Apply or OK. If you only specify a value in the To entry field, the From entry field is not supplied with a value; all objects created up until the date and time in the To entry field are included in the filtered model.

Time updated: From and To

A date and time. The format is mm-dd-yy_hh:mm. Where, mm= month (1 - 12)
dd = day (1 - 31)
yy = year (0 - 99)
hh= hour (1 - 24)
mm = minute (0 - 60)

You do not have to enter values in both of these entry fields.

*Note:* If you only specify a value in the From entry field, the To entry field is automatically supplied with the current date and time when you select either Apply or OK. If you only specify a value in the To entry field, the From entry field is not supplied with a value; all objects created up until the date and time in the To entry field are included in the filtered model.

Control Options

Control options allow you to specify how you want the filter selection criteria to be combined or applied when the filter is turned on.

Criteria Combinations: Some (OR) and All (AND)

Some or All define whether the objects in a filtered model must meet at least one or all of the specified selection criteria. The default is All.

If you select Some (logical OR), an object must meet at least of one of the specified selection criteria for it to be included in the filtered model. For example, if entities and objects created by user McCALL are specified as the selection criteria and you select Some, the filtered model will include not only the entities created by user McCALL, but also any other objects that user McCALL created.

If you specify All (logical AND), objects must meet all of the specifed selection criteria to be included in a filtered model. For example, if entities and objects created by user McCALL are specified as the selection criteria and you select All, the filtered model will include only those entities that user McCALL created.

Criteria Testing: Exclusive (NOT) and Inclusive

Exclusive or Inclusive define whether the objects in a filtered version of a model are those that meet the specified filter selection criteria, or those that do not meet the specified filter selection criteria. The default is Inclusive.

If you select Exclusive, all objects that meet the selection criteria are excluded from the filtered model. For example, if entities are specified as the selection criteria and you select Exclusive, the filtered model will exclude all entities.

*Note:* When you select Exclusive, the filter selection criteria is not treated as a group. Instead, each selection criterion (for example, each keyword or each object), is treated as if a NOT were placed in front of it.

For example, if you have defined a filter to include entities or objects created by user McCALL, and then select Exclusive, the filter will include everything except those entities created by user McCALL.

The following equations demonstrate how the system treats these control option combinations. Note that each criterion is treated individually and then the common NOT is factored out, creating the final filter selection criteria.

Combining Exclusive with Some:

(NOT entities) OR (NOT objects created by McCALL) =
NOT (entities AND objects created by McCALL)

Combining Exclusive with All:

(NOT entities) AND (NOT objects created by McCALL) =
NOT (entities OR objects created by McCALL)

If you select Inclusive, all objects that meet the selection criteria are included in the filtered model. For example, if entities are specified as the selection criteria and you select Inclusive, the filtered model will include just entities, not any other type of object.

Pushbuttons

OK - saves (for the current session) and turns on the filter that is currently displayed in the Filter Form and closes the form.

Apply - saves (for the current session) the filter that is currently displayed in the Filter Form but does not close the form.

Delete - deletes the filter that is currently displayed in the Filter Form but does not close the form.

Clear - clears all of the fields in the Filter Form but does not close the form. In addition, if a field has a default value it is reset to that value.

Cancel - turns off the filter that is currently displayed in the Filter Form and closes the form.

Help - post Beta.

Selecting Objects to be Included in a Filtered Model

Sometimes, when you explicitly select an object to be included in a filtered model, other objects are implicitly selected along with it. When the existence of an explicitly selected object depends on another object, that other object is implicitly selected. For example, if you select an information flow, the objects that are the source and destination of that flow are implicitly selected, but not the associated subordinate objects, such as flow structures.

Table 4-1 shows explicitly selected objects in the first column, and objects that are implicitly selected along with them in the second.

Table 4-1 Explicitly and Implicitly Selected Objects

| EXPLICITLY SELECTED OBJECTS | IMPLICITLY SELECTED OBJECTS |
|---|---|
| Attribute | Owner Entity |
| Dimension | Data Model |
| Domain | Superdomain |
| | Data Model (if free Domain) |
| Entity | Data Model |
| Key | Owner Entity |
| | Component Attributes |
| | Component Partnership Sets |
| Keyword | All Objects that share Keyword |
| Method | Owner Entity (if Entity Method) |
| Partnership | Associated Partnership Sets |
| Partnership Set | Owner Entity |
| | Associated Partnerships |
| Information Flow | Flow Source |
| | Flow Destination |
| Process | Parent Process (if any) |
| PDL Statement | Parent PDL Statement |

When a diagram of a filtered model is displayed, objects that meet the filter selection criteria are displayed, along with any objects that their existence might depend on. For example, if you specify that you want to see only the objects created by user McCALL, and one of the objects that McCALL created was a partnership set, the entity associated with that partnership set is also displayed in the filtered E-R diagram.

In addition, when you access an object's form, only those objects that meet the selection criteria are displayed in the form. For example, if you display an Entity form, and attributes are not included in the filtered model, attributes do not appear in the form.

*Note:* If a filter is turned on that removes one partnership set from a partnership, both the associated partnership set and the line connecting the two partnership sets are also removed.

*Note:* If you add an object to a filtered model and that object does not meet the filter selection criteria, it is added to the filtered model anyway. It will be displayed in the forms and diagram until you turn the filter off and then back on again, or select another filter.

Similiarly, if, for example, entities with the keyword K1 are excluded from a filtered model, and K1 is renamed to K2, those entities, that should now be displayed, are not displayed until you turn the filter off and then back on again.

Turning a Filter On and Off

▼ To turn on a filter:

1 Display the filter that you want to turn on in the Filter Form.

2 Select OK.

For Beta, you can tell that a filter is on when both All and Some are available on the View pull-down menu.

*Note:* You can turn on only one filter at a time. However, you can create and save several different filters, to be turned on at your convenience.

▼ To turn off a filter, either:

- Display the filter that you want to turn off in the Filter Form and select Cancel.
- Select All from the View pull-down menu.

For Beta, you can tell that a filter is not active when only Some is available on the View pull-down menu.

If you are working on a filtered model and would like to turn on a different filter, you can do so quite easily.

▼ To turn on a different filter:

1 Display the Filter Form.

2 Create or select another filter.

3 Select OK.

The currently displayed filter becomes the active filter.

Performing Tasks on a Filtered Model

Most tasks and file operations that you can perform within the BACHMAN/Analyst act on the original model, not the filtered model. For example, if you have a filter turned on and select Export from the Tasks pull-down menu, the original model, not the currently active filtered model, is exported.

*Note:* The Print and Logs file operations and the Design and Transform tasks acts on the filtered model.

Editing an Analyst Model Object

The BACHMAN/Analyst provides three ways to edit objects:

- Use the Edit pull-down menu to perform operations, such as delete and copy, that are applicable to all objects.
- Use the object forms to edit the information in an object. For example, use the Entity form to modify an entity's name, attributes, volume, and so on.
- Use the transforms to perform multiple-step operations. For example, use Merge Entities to merge two entities into a single entity.

Each type of object in an Analyst model uses different forms and transforms. For more information, refer to Chapters 5 and 7 which discuss how to create and edit each type of object.

This section discusses operations applicable to all objects:

- Delete

> ☛ *Clipboard operations, such as copy and paste, to be supplied after Beta.*

Deleting an Analyst Model Object

▼ To delete an Analyst model object:

1. Select one or more objects.
2. Select Cut or Clear from the Edit pull-down menu.

Undoing and Redoing an Operation

The BACHMAN/Analyst provides two types of logs:

- Undo/redo logs, which automatically provide a history of editing operations.
- Analyst logs, which you can use to collect a history of editing operations and Expert Advisor messages. These logs are discussed in Keeping a Log of Operations, 4-17.

The undo log is a history of editing operations that the BACHMAN/Analyst keeps for you. You can use the undo log to undo any of the operations in the log. The BACHMAN/Analyst also keeps a redo log, which is a history of the operations that you have undone. You can use the redo log to redo any of the operations that you have undone.

The number of editing operations recorded in the undo and redo logs is defined in your User profile. The default number of operations recorded is 5.

You can make this number as large as you want, depending on the amount of memory you want to devote to this capability.

▼ To undo the most recent editing operation:

Select Undo from the Edit pull-down menu.

If you are not sure what the most recent editing operation was, you can use the undo log to check the operation before undoing it:

1 Select Undo Log from the Edit pull-down menu.

An Undo Log window similar to the one shown in Figure 4-10 appears.

2 If you want to undo the most recent operation in the undo log, select it and then select the Apply pushbutton. (You must undo operations in order starting with the most recent.)

3 Close the Undo Log window by selecting Close from its system menu.

▼ To redo the most recent undo operation:

Select Redo from the Edit pull-down menu.

If you are not sure what operation was most recently undone, you can use the redo log to check the operation before redoing it:

1 Select Redo Log from the Edit pull-down menu.

2 If you want to redo the most recently undone operation in the redo log, select it and then select the Apply pushbutton. (You must redo operations in order, starting with the most recent.)

3 Close the Redo Log window by selecting Close from its system menu.

Figure 4-10 Undo Log Window

See illustration at chapter end.

As shown in the undo log of Figure 4-10, you undo discrete operations rather than collections of operations. For example, you undo a change to a field on a form rather than undoing all of the changes to the form. Likewise, you undo individual changes made while running the Design task rather than undoing all of the changes made while running the Design task.

*Note:* Not all operations can be undone. For example, you cannot undo a save operation.

Keeping a Log of Operations

The BACHMAN/Analyst provides two types of logs:

- Undo/Redo Logs, which automatically provide a history of editing operations. These logs are discussed in Undoing and Redoing an Operation, 4-16.
- Analyst Logs, which you can use to collect a history of editing operations and Expert Advisor messages.

| |
|---|
| ☛ ***Documentation to be supplied after Beta.*** |

Generally, you start a log before running the Design or Normalize tasks.

▼ To start an Analyst Log:

1 Select Logs from the File pull-down menu.

2 ...

▼ To stop an Analyst Log:

1 Select Logs from the File pull-down menu.

2 ...

Printing Diagrams and Screens

The BACHMAN/Analyst offers you a wide range of printing options. You can print diagrams and screens. When you print large diagrams that cover multiple pages, you can choose to print only certain pages. When you work with screens, you can print the whole screen, a window, or just part of the screen. Depending on your needs, you can produce a basic print with just a few keystrokes or you can use BACHMAN's advanced printing features to fine-tune the appearance of your diagram or screen on the page. Advanced features such as *registration marks* and *bleed* are especially useful if you are working with large, multipage diagrams. This section on printing covers the following topics:

- Before you begin
  - Choosing a printer and setting printer options
  - Creating a standard page layout [available post-beta]
  - Previewing diagram prints with the Grid
- Basic printing
  - Printing a diagram
  - Printing a screen
- Advanced printing
  - Modifying your page layout
  - Using headers and footers
  - Working with large diagrams While printing and working with print-related features you use the following pull-down menus:

- File (for printing, changing page layout, and changing printers)
- Diagram (for controlling the Grid)
- Profile (for creating a standard page layout)

Before You Begin

There are some things you should know about before you actually begin printing.

Choosing a Printer and Setting Printer Options

You use Change Printer on the File pull-down menu to change your printer or set the printer options. Depending on the type of printer you use, you can change settings for such options as

- Orientation — printing vertically (*portrait*) or horizontally (*landscape*) on the page
- Paper — the size of the paper you will be printing on (letter, legal, and so on )
- Paper source — for example, a specific paper tray, manual or automatic feed
- Print quality — whether you want draft or letter quality printing.

*Note:* This section assumes that the printer you plan to use has been set up correctly through the OS/2 Control Panel and the OS/2 Print Manager. If you are unsure of this, consult your system administrator or the OS/2 documentation.

▼ To choose a printer and set printer options:

1. Select Print Options from the File pull-down menu.
2. Select Change Printer.
3. Select the printer you want to use from the list box.
4. If you do not want to check or change printer settings, skip to step 8.
5. To check or change printer settings, select the Setup button. The BACHMAN/Analyst displays the Job Properties pop-up window with options for the specific printer you chose in step 3.
6. Select the options you want.
7. Select the OK pushbutton to close this pop-up window.
8. Select the OK pushbutton to close the main Change Printer pop-up window.

Creating a Standard Page Layout [available post-beta]

You use Printer from the Profile pull-down menu to create a standard page layout for both diagram and screen prints. There are two options in the Printer Profile that you can modify:

- Margins — you can change the margins to any width over the minimum already determined by the printer you choose.
- Headers and footers — you can create standard text to appear at the top of your page (*header*) or the bottom (*footer*). Also, you can choose from a list of *macro* characters to automatically include commonly used text, such as your name, the date, the model name, and page numbering.

Table 4-2 Macro Characters You Can Use in Headers and Footers

| WHEN YOU TYPE THIS... | THIS APPEARS WHEN YOU PRINT... |
|---|---|
| @d | Current date in dd-mmm-yy format |
| @n | Design name |
| @p | Current page number of the diagram |
| @t | Total number of pages in entire diagram |
| @u | User name |

*Note:* While you are working in specific diagrams, you can override the standard page layout in your Printer Profile at any time.

Previewing Diagram Prints with the Grid

Before you print a diagram you can use the grid to preview the printed diagram. The grid displays only the page area you will actually print on (it excludes the margins). This is especially useful when your diagram takes up more than one page because you can check to see if the page breaks bisect any important diagram elements. If this happens, you can rearrange or resize your diagram.

*Notes:* When you choose the grid, it is automatically bound to your diagram. For example, if you use zoom to enlarge your diagram, the grid enlarges with it. If you want to resize your diagram on the page, you can unbind the grid using the Grid Bound menu choice. You can then, for example, enlarge your diagram and the grid will remain the same size.

Depending on the size and resolution of your monitor, text may be too small to read on your screen, but will always appear legibly on your printed diagrams.

▼ To preview a diagram print using the grid:

1 Select Grid from the Diagram pull-down menu.

2 If you do not want to rearrange or resize your diagram, go to step 7.

3 If you want to move bisected elements of your diagram, use the mouse to capture and drag them to a new location.

4 If you are satisfied with the appearance of your diagram, go to step 7. If you want to resize your diagram, go to the next step.

5 To unbind your diagram from the Grid, select Grid Bound from the Diagram pull-down menu.

6 Resize your diagram.

7 To switch off the Grid, select Grid again.

*Tip:* A second way to preview your printed diagram is to select the Preview pushbutton from the Print Diagram pop-up window while you are preparing to make a print. You can then stop the printing procedure and return to the grid to make any necessary changes.

Basic Printing

Printing a Diagram

▼ To make a simple print of all or part of the diagram you are working on:

1 Preview your diagram using the grid.

2 Select Print from the File pull-down menu.

3 Select Diagram.

The Print Diagram dialog box appears.

4 Select the OK pushbutton.

Printing a Screen

▼ To make a simple print of a screen:

1 Select Print from the File menu.

2 Select Screen.

The Print Screen Timer dialog box appears.

3 Choose whether you want to print a Full Screen, Window, or Region (part of the screen).

4 If you want the pointer to appear in your print, select the Pointer check box.

5 If you want some time to prepare the screen before the snapshot is taken (for example, to clear a pull-down menu or move a palette), enter the number of seconds delay you want.

6 Select the OK pushbutton.

*Note:* The Print Screen pop-up window also lets you change the page layout (Page Layout pushbutton) and change the printer and set printer options (Change Printer pushbutton).

Advanced Printing Features

Modifying Your Page Layout

When you want to print any specific diagram or screen, you can modify the settings for margins, headers, and footers (those you set in the Printer profile).

*Note:* If you modify the page layout for a diagram, the modified version remains attached to that particular diagram until you change it.

▼ To set the page margins:

1. Select Print Options from the File pull-down menu.
2. Select Page Layout.

The Page Layout pop-up window appears.
3. If you want to work in centimeters, change the unit type.
4. Set the margins. (You can quickly overtype any existing margins by clicking left with your mouse, holding the left button down, and moving the mouse to select the field. Then simply type in the new values.)
5. Press Tab to see the results of your choices.
6. Select the OK pushbutton.

Using Page Headers and Footers

You can create a header or a footer for any diagram or screen print. If you created text headers and footers in the Printer profile, you can change them while you are printing diagrams or screens. You can also use the macro characters listed in Table 4-2.

▼ To create or change a page header or footer:

1. Select Print from the File pull-down menu.
2. Select Diagram or Screen from the cascading menu.

The Print Diagram or Print Screen pop-up window appears.

*Note:* If the Header or Footer boxes are grayed out, the margins in your page layout may be too narrow for text. Change the margins before you continue.

3. Select the check box for Header or Footer or both.
4. Select the field.
5. The text cursor appears.
6. Enter the text and any macro characters.
7. When you have finished, select the OK pushbutton.

Tips for Printing Large Diagrams

In addition to the grid, you can use two other features to align multiple pages and assemble large diagrams:

- Registration marks — crosses marking all four inner corners of the page margins.
- Bleed — when a diagram overlaps the inner margin boundaries of the page.

*Note:* The Bleed option only appears in the dialog box if your diagram covers more than one page.

▼ To use registration marks or bleed:

1. Select Print from the File pull-down menu.
2. Select Diagram from the cascading menu.

The Print Diagram pop-up window appears.
3. Select the Registration Mark or Bleed check box or both.
4. Select the OK pushbutton.

Producing a Report

Reports can help you to examine, to summarize, or to present model information. They can be particularly effective when used with printed Entity-Relationship (E-R) or data flow (DFD) diagrams.

You design and produce reports using the BACHMAN database and OS/2 Query Manager:

- The BACHMAN database is an OS/2 Database Manager database designed for use with the BACHMAN/Analyst. The Check In task of the BACHMAN/Analyst writes Analyst model information to the BACHMAN database.
- The OS/2 Query Manager is an OS/2 utility that allows you to build and execute Structured Query Language (SQL) queries against an OS/2 Database Manager database. It also provides forms that you can use to format the reports produced by your queries.

In addition to producing reports using Query Manager, you can produce two reports within the BACHMAN/Analyst: the PDL text report and the PDL LAM report. For more information on these reports, refer to Producing PDL Reports in Chapter 9.

This section includes:

- A description of the BACHMAN database.
- A summary of the steps required to produce a report.
- Detailed descriptions of each step in the summary procedure.

Note: If you are unfamiliar with Query Manager, work through the Query Manager tutorial in the *IBM Operating System/2 Extended Edition Version 1.2 Getting Started* manual before reading this section.

Description of the BACHMAN Database

The BACHMAN database contains all of the tables defined for import/export files, as described in Appendix A. You must be familiar with these table descriptions before you can use the BACHMAN database to produce reports.

In addition to the tables included in an import/export file, the BACHMAN database includes:

- A model table. Each row of the model table describes one of the Analyst models in the database. The columns in the table are:
  - *name*. The name of the Analyst model.
  - *version*. A number unique among Analyst models of the same name.
  - *code*. A number unique among all Analyst models in the database.
  - *type*. A code indicating whether the model is an Analyst model (1) or a DB2 model (2).
- An *mcode* column in each table other than the model table. Each row of a column identifies an object in the Analyst model. The *mcode* identifies the Analyst model that owns the object.

The BACHMAN database is fully normalized. In particular, this means that many-to-many relationships are described using *cross-reference tables*. For example, entities and keywords have a many-to-many relationship (an entity can have many keywords and each keyword can be associated with many entities). In the BACHMAN database, an entity and its keyword are described by three tables:

- The entity is described in the Entity table.
- The keyword is described in the Keyword table.
- The entity and keyword are associated in the Entitykeyword table (the *cross-reference table*).

Summary Procedure

▼ To produce a report using the BACHMAN database and Query Manager:

1. Within the BACHMAN/Analyst, transfer the Analyst model data to the BACHMAN database.
2. Start Query Manager.
3. Open the BACHMAN database.
4. Create a query:
   a. Open a new query.
   b. Select the tables that you want to reference.

c Select the columns that you want to include in your report.

d Specify the row conditions (if any) for the query.

5 Save the query.

6 Produce the report by running the query.

7 Format the report by modifying its form.

8 Save the report form.

9 Export the query and the form.

10 Create indices for the tables used in the query.

11 Exit from Query Manager.

Transfer Data to the BACHMAN Database

Use Check In to move Analyst model information into the BACHMAN database.

▼ To check Analyst model information into the BACHMAN database:

1 Select Check In from the File pull-down menu.

An hourglass appears indicating that the operation may take a number of seconds. While displaying the hourglass, the system creates an import/export file.

2 Continue working with the Analyst once the hourglass disappears. You can even exit from the Analyst at this time.

3 The system begins moving the information from the import/export file into the BACHMAN database. It creates a log file, C:\TMP_DBIMP.LOG, to keep track of the information entered into the database.

Once the information is in the BACHMAN database, the system deletes the import/export file and displays a message indicating that the Analyst model information has been successfully entered into the database. The message appears even if you have exited from the Analyst.

*Note:* Transferring information to the BACHMAN database can take 10 minutes or more.

4 Use your favorite editor to the check the log created in step 3.

All of the information should have been successfully imported into the database. If the information has not been successfully imported, you must correct the problem that caused the error and use Check In to transfer the data again. The most common errors are caused by lack of either memory or disk space:

- If your log contains memory errors, exit from applications other than the BACHMAN/Analyst, reenter the BACHMAN/Analyst, and run Check In again.
- If your log contains disk errors, delete as many files as possible from your local disk, reenter the BACHMAN/Analyst, and run Check In again.

> ☛ *Check Out, which transfers data from the BACHMAN database back to the BACHMAN/Analyst, is not available for Beta.*

Start Query Manager

▼ To start Query Manager:

1. Select Query Manager from the OS/2 Main-Group menu.
2. If a logon pop-up window appears, log on as the user BACHMAN. Do not enter a password.
3. The Query Manager window appears with a list of available databases.

*Note:* The Check In task automatically logs you on as the Query Manager user BACHMAN. However, if you have rebooted your machine since running the Check In task, the logon pop-up window appears.

Open the BACHMAN Database

▼ To open the BACHMAN database:

1. Select BACHMAN from the list of databases.
2. Select Open from the Actions pull-down menu.

Query Manager's main selection menu appears.

Alternatively, you can double-click button 1 on BACHMAN.

Create the Query

A query determines the content of a report. Typically, the complexity of the report is directly related to the complexity of the query. This section walks through the creation of three queries:

- A simple query that displays the code, name, and version of each model in the BACHMAN database. You can use similar queries to produce other reports that display information from one table.
- A multiple-table query that displays the name of each entity in a model, its minimum and maximum volumes, and the names of its associated attributes. You can use similar queries to produce other reports that display information from more than one table, as long as you do not need to use cross-reference tables.
- A cross-referencing query that displays the name of each entity in a model and its keyword. You can use similar queries to other produce reports that display information that must be read using a cross-reference table.

Simple Query

The following instructions create a query that generates a report that displays the code, name, and version of each model in the BACHMAN database. Figure 4-11 and 4-12 show the query and report, respectively.

Figure 4-11 Simple Query

| |
|---|
| See illustration at chapter end. |

Figure 4-12 Simple Query Report

| |
|---|
| See illustration at chapter end. |

Open a New Query

▼ To open a new query:

1 Select Queries from the main selection menu.

The Queries window appears.

2 Double-click button 1 on -NEW- to open a new query.

The Prompted Query window appears displaying the Tables panel.

Select the Table

The report that you are creating references the columns of the MODEL table.

▼ To select the MODEL table:

1 Enter MODEL into the Tables panel.

If you do not remember the name of a table, you can use the List pushbutton of the Tables panel to display a list of the fields. To select a subset of the list, type the first few characters of a table name and then select the List pushbutton.

2 Select the Enter pushbutton or press Return.

Query Manager displays the Specify panel.

Select the Columns

The report that you are creating lists the code, name, and the version number of each model in the database. Therefore, select the CODE, NAME, and VERSION columns.

▼ To select the columns:

1 Select Columns from the Specify panel.

2 Select the Enter pushbutton or press Return.

Query Manager displays the Columns panel.

3 Select CODE, NAME, and VERSION from the Column Names list box.

4 Select the Enter pushbutton or press Return.

Query Manager redisplays the Specify panel.

5 Select the Cancel pushbutton to exit from the Specify panel.

You have created the simple query shown in Figure 4-11. Running the query, as discussed in Producing the Report, produces the report shown in Figure 4-12.

Multiple-Table Query

The following instructions create a query that generates a report that displays the name of each entity in a model with the names of its associated attributes. Figures 4-13 and 4-14 show the query and report, respectively.

Figure 4-13 Multiple-Table Query

| |
|---|
| See illustration at chapter end. |

Figure 4-14 Multiple-Table Query Report

| |
|---|
| See illustration at chapter end. |

Open a New Query

▼ To open a new query:

1 Select Queries from the main selection menu.

The Queries window appears.

2 Double-click button 1 on -NEW- to open a new query.

The Prompted Query window appears displaying the Tables panel.

Select and Join the Tables

The report that you are creating displays information about entities and their attributes. Therefore, select the ENTITY and ATTRIBUTE tables.

▼ To select the tables:

1 Enter ENTITY and ATTRIBUTE into the Tables panel.

If you do not remember the name of a table, you can use the List pushbutton of the Tables panel to display a list of the fields. To select a subset of the list, type the first few characters of a table name and then select the List pushbutton.

2 Select the Enter pushbutton or press Return.

Because you have entered multiple tables, Query Manager displays the Join Columns panel.

When you select multiple tables, you must join the tables. In this case, you join the ENTITY and ATTRIBUTE tables using the following columns:

- ENTITY.ENTITYKEY, which contains a unique number that identifies the entity.
- ATTRIBUTE.ENTITY, which contains an ENTITY.entitykey value that identifies the owner entity of the attribute.

▼ To join the tables:

1 Select ENTITYKEY from ENTITY list box and ENTITY from the ATTRIBUTE list box.

2 Select the Enter pushbutton or press Return.

Query Manager displays the Specify panel.

Select the Columns

The report that you are creating lists the name, minimum volume, and maximum volume of each entity and the name of each attribute. Therefore, you want to select the ENTITY.NAME, ENTITY.MINVOL, ENTITY.MAXVOL, and ATTRIBUTE.NAME columns.

▼ To select columns:

1 Select Columns from the Specify panel.

2 Select the Enter pushbutton or press Return.

Query Manager displays the Columns panel.

3 Select ENTITY.NAME, ENTITY.MINVOL, ENTITY.MAXVOL, and ATTRIBUTE.NAME.

*Note:* When Query Manager displays two columns with the same name from two different tables, the column name is preceded by a corelation name. In this example, ENTITY.NAME and ATTRIBUTE.NAME appear in the Columns panel as A.NAME and B.NAME.

4 Select the Enter pushbutton or press Return.

Query Manager redisplays the Specify panel.

Select the Row Conditions

When you joined the ENTITY and ATTRIBUTE tables, you relied on the ENTITY.ENTITYKEY column to uniquely identify each entity. This column uniquely identifies an entity within a model. However, the BACHMAN database can contain many different models and many different versions of the same model.

To uniquely identify an object within the BACHMAN database, you need both its model code and its object code. For example, an entity is uniquely identified by the model code in the ENTITY.MCODE column and the object key in the ENTITY.ENTITYKEY column.

Your query, as it currently stands, has the potential of creating rows that contain an entity from one model and attributes from another model. You want to ensure that your report contains only those rows that contain entities and attributes from the same model. To do that, create the row condition:

If ENTITY.MCODE Is Equal To ATTRIBUTE.MCODE

If you want your report to include only the entities and attributes from a particular model, add the model code to the row condition. For example, to display only the entities and attributes of the model with a MODEL.CODE value of 1, create the row condition:

If ENTITY.MCODE Is Equal To ATTRIBUTE.MCODE
AND ENTITY.MCODE Is Equal To 1

Your query must contain a row condition for each table. For example, if your report includes the domain of each attribute, you need to ensure that the entity, attribute, and domain are all from the same model:

If ENTITY.MCODE Is Equal To ATTRIBUTE.MCODE
AND ENTITY.MCODE Is Equal To DOMAIN.MCODE
AND ENTITY.MCODE Is Equal To 1

▼ The following instructions create the row condition: If ENTITY.MCODE Is Equal To ATTRIBUTE.MCODE
AND ENTITY.MCODE Is Equal To 1.

1. Select Row Conditions from the Specify panel and press Return.

Query Manager displays the Row Conditions panel.

2. Select ENTITY.MCODE.

Query Manager displays the Comparison Operators panel.

3. Select Is as the verb, Equal to... as the Comparison, and press Return.

Query Manager displays the Equal To panel.

4. Enter ATTRIBUTE.MCODE and press Return.

Query Manager redisplays the Specify panel.

5. Select Row Conditions again and press Return.

Query Manger displays the Condition Connectors panel.

6. Select And and press Return.

Query Manger displays the Row Conditions panel.

7. Select ENTITY.MCODE and press Return.

Query Manager displays the Comparison Operators panel.

8. Select Is Equal To and press Return.

Query Manager displays the Equal To panel.

9. Enter 1 and press Return.

10. Select the Cancel pushbutton to exit from the Specify panel.

You have created the multiple-table query shown in Figure 4-13. Running the query, as discussed in Producing the Report, produces the report shown in Figure 4-14.

The report does not contain either free attributes or entities without attributes. When you join two or more tables, rows that contain a null (or zero) value in a column named within the join are not included in the report. To write a query that produces a report that includes these rows, you must use SQL. Figure 4-15 shows an SQL statement that produces a report (Figure 4-16) that lists all entities and their attributes (if any). Refer to the *IBM OS/2 Extended Edition Version 1.2 Structured Query Language (SQL) Concepts* manual for more information.

Figure 4-15 Multiple Table SQL Query

See illustration at chapter end.

Figure 4-16 Multiple Table SQL Query Report

See illustration at chapter end.

Cross-Referencing Query

Creating a cross-referencing query is similar to creating any other multiple-table query. The following instructions create a query that generates a report that displays the names of entities and their keywords. The instructions assume that you are familiar with multiple-table queries. Figures 4-17 and 4-18 show the query and report, respectively.

Figure 4-17 Cross-Referencing Query

See illustration at chapter end.

Figure 4-18 Cross-Referencing Query Report

See illustration at chapter end.

▼ To create a cross-reference query:

1 Open a new query.
2 Select the ENTITY, KEYWORD, and ENTITYKEYWORD tables.
3 Join the ENTITY and ENTITYKEYWORD tables using ENTITY.ENTITYKEY and ENTITYKEYWORD.ENTITYKEY.

4 Join the ENTITYKEYWORD and KEYWORD tables using ENTITYKEYWORD.KEYWORDKEY and KEYWORD.KEYWORDKEY.

5 Select the ENTITY.NAME and KEYWORD.VALUE columns. The KEYWORD.VALUE column contains the keyword name.

6 Create the following row condition:

If ENTITY.MCODE Is Equal To ENTITYKEYWORD.MCODE
AND ENTITY.MCODE Is Equal To KEYWORD.MCODE
AND ENTITY.MCODE Is Equal To 1

You have created the cross-reference query shown in Figure 4-17. Running the query, as discussed in Producing the Report, produces the report shown in Figure 4-18.

As explained in the discussion of the Multiple-Table query, you must use SQL to create a report that contains null (or zero) values in any column named within the join of two tables. Figure 4-19 shows an SQL statement that produces a report (Figure 4-20) that lists all entities and their keywords (if any).

Figure 4-19 Cross-Referencing SQL Query

| See illustration at chapter end. |
|---|

Figure 4-20 Cross-Referencing SQL Query Report

| See illustration at chapter end. |
|---|

Save the Query

Saving a query adds it to the BACHMAN database. If you exit from Query Manager without saving the query, the query is erased.

▼ To save a query:

1 After modifying the query in the Prompted Query window, select Exit Query from the Exit pull-down menu.

A pop-up window appears.

2 Select Save and Exit.

A pop-up window appears.

3 Enter a name and comment.

4 Select the Enter pushbutton or press Return.

Produce the Report

After creating your query, you are ready to produce a report by running the query.

▼ To run a report:

1 Select the query that you want to run.

The Prompted Query window appears.

*Note:* If you just created a query, this step is not necessary. The query you created is already selected.

2 Select Run from the Actions pull-down menu.

The report appears.

If you have created and saved a form for your report (as shown in the next section), you can produce a formatted report by selecting Run Using from the Action pull-down menu rather than selecting Run.

Format the Report

After producing a report, you typically want to change its format by modifying its form.

▼ To modify a report form after producing the report:

1 Select Form from the Display pull-down menu.

Remember, you can easily move between the report and its form using the Display pull-down menu.

2 Modify the form as described in the *IBM Operating System/2 Extended Edition Version 1.2 Getting Started manual.*

Save the Form

Saving a form adds it to the BACHMAN database. If you exit from Query Manager without saving the form, the form is erased.

▼ To save a form:

1 After modifying the form in the Form window, select Exit Form from the Exit pull-down menu.

A pop-up window appears.

2 Select Save and Exit.

A pop-up window appears.

3 Enter a name and comment.

4 Select the Enter pushbutton or press Return.

If you exit from the Report window after modifying the report form, Query Manager prompts you to return to the Form window to save the form.

Export the Query and the Form

Saving a query or a form writes it to the BACHMAN database. Exporting a query or a form writes it to a text file on your local drive.

When you install a new release of the BACHMAN/Analyst, the BACHMAN database is deleted. All saved queries and forms that are part of the database are also deleted. Therefore, it is critical that you export queries and forms before installing a new release of the BACHMAN/Analyst.

▼ To export a query or form:

1. Select Queries or Forms from Query Manager's main selection menu.
2. Select the query or form.
3. Select Export from the Tools pull-down menu.

A pop-up window appears.
4. Enter the full name of a file to hold the query or form. You must specify a local drive (usually, C: or D:).

Using a file naming convention, such as *query-name*.QRY and *form-name*.FRM, is useful for maintenance.
5. Select the Enter pushbutton or press Return.

Create an Index

Indexing the tables used within a query improves performance in two ways:

- It reduces the time required to run the query.
- It reduces the reponse time required for paging up and down within the report produced by the query.

The Check In task of the BACHMAN/Analyst does not generate indices. However, once you have added indices to the BACHMAN database, the Check In task updates the indices after adding information to the database. The more indices you have, the longer it takes the Check In task to move information from the BACHMAN/Analyst into the BACHMAN database.

▼ To create an index for a table within Query Manager:

1. Select Tables and Views from the main selection menu.
2. Select the table that you want to index.
3. Select Add Index from the Actions pull-down menu.

A pop-up window appears.
4. Enter the MCODE and object key columns (for example, ENTITYKEY in the ENTITY table) in the Column Name column.

A pop-up window appears.
5. Enter an index name.

Using a naming convention, such as IX_*tablename*, is useful for maintenance.

6 Select the No Duplicates Allowed radio button.

7 Select the Enter pushbutton or press Return.

▼ After creating an index, run statistics to ensure that existing queries use the index. To run statistics:

1 Select Tables and Views from the main selection menu.

2 Select the table that you want to index.

3 Select Run Statistics from the Tools pull-down menu.

A pop-up window appears.

4 For Statistical options, select Both. For Allow other users to update while running statistics, select Yes.

5 Select the Enter pushbutton or press Return.

A pop-up window appears.

6 Enter the name of the index that you created for the selected table.

7 Select the Enter pushbutton or press Return.

Print the Report

▼ To print a report:

1 Produce the report.

Query Manager displays the Report window.

2 Select Print from the Actions pull-down menu.

A pop-up window appears.

3 Select To printer.

A pop-up window appears.

4 Select the Enter pushbutton or press Return.

By default, the report is sent to LPT1.

For more information, refer to the IBM OS/2 Extended Edition Version 1.2 documentation.

Exit From Query Manager

▼ To exit from Query Manager:

Select Exit Query Manager form the Exit pull-down menu.

Managing Development of an Analyst Model

This section describes how to maintain a model that is being modified by many people.

☛ *To be supplied after Beta.*

Chapter 5
Building a Data Model

To build a data model, you open an Analyst model and display an Entity-Relationship (E-R) diagram. You can use that diagram and the data model forms to create entities, relationships, and other data model objects. After you create data model objects, you can edit them through forms or through applicable editing tasks on menus.

The first section of this chapter describes some of the ways the actions you perform in the E-R diagram affect other diagrams and forms within an Analyst model. The second section describes how you display an E-R diagram. The third through tenth sections discuss how you create and edit data model objects (including entities, attributes, relationships, keys, dimensions, and domains).

Diagram and Form Interactions

Diagrams and forms are the tools used for defining and manipulating all the objects of the Analyst model. Once you create an object, it can be displayed graphically in a diagram or textually in a form. Likewise, when you edit the object the new information is accessible from any applicable diagram or form. Diagrams and forms provide different ways of accessing the same objects, and they offer different perspectives of the same Analyst model.

You can use BACHMAN's process description language (PDL) and the PDL diagram to define procedures that affect occurrences of entities and derive values for occurrences of attributes in a data model. A procedure that affects an entity is called an *entity method*. A procedure that derives (that is, calculates) a value for an attribute is called a *derivation procedure*.

An *entity method* is a PDL procedure defined for a specific entity in an E-R diagram. For example, you could define an entity method for the CUSTOMER entity that increments a counter and adds a new customer to the database each time a new customer is inserted.

A *derived attribute* is an attribute whose occurrences get their values as the result of an internal calculation, rather than through data entry or from another system. For example, you could define a derivation procedure to calculate a value for the attribute Current-Mortgage-Rate by adding 2 to the value of a variable called Prime-Rate every time the value of the variable changes.

For more information about PDL, and about entity methods and derivation procedures, refer to Chapter 9, Introduction to PDL.

For information about the forms you use to add and edit information in a data model, refer to Chapter 11, Forms Reference.

Displaying an Entity-Relationship Diagram

Before you can display an E-R diagram, you must open an Analyst model (refer to Chapter 4, Working With an Analyst Model, if you need more information).

After you open an Analyst model on the BACHMAN desktop, you can display an E-R diagram three ways:

- Using the E-R icon.
- Using New Diagram on the Diagram pull-down menu.
- Using the Window pull-down menu. *(Not available in the Beta release.)*

▼ To display an E-R diagram using the E-R icon:

1 Double-click button 1 on the icon.

2 The system restores the minimized E-R diagram window associated with the icon.

▼ To display an E-R diagram using New Diagram on the Diagram pull-down menu:

1 Select New Diagram under Diagram.

The system displays a cascading menu of the diagram types associated with the open Analyst model (Figure 5-1).

Figure 5-1 Cascading Menu From the New Diagram Choice

See illustration at chapter end.

2 Select E-R as the type of diagram to display.

The system displays the selected diagram.

▼ To display an E-R diagram using the Window pull-down menu: *(Not available in the Beta release.)*

1 Select the Analyst model from the numbered list under Window.

The system displays a cascading menu of the diagrams associated with the selected Analyst model (Figure 5-2).

Figure 5-2 Cascading Menu From the Analyst Model Choice

See illustration at chapter end.

2 Select the E-R diagram you want to display.

The system displays the selected diagram.

Creating an Entity

You create an entity by naming it and adding it to a data model. You can then use the Entity form to supply detailed information about the entity. (Refer to Editing an Entity for more information.) You can also add attributes for an entity when you first create it. (Refer to Creating an Attribute for more information.)

Creating and Placing an Entity

You can create entities using the Entity icon on the E-R diagram palette, the Create Entities choice on the E-R diagram context menu, or the Entities field of the Data Model form. (Entity type hierarchies are described under Creating a Relationship in this chapter.)

The system places the entities in the diagram according to the placement methods you specified in the Data Model Profile form (that is, automatically or manually). (Refer to Chapter 11, Forms Reference, if you need further information about setting a profile.)

Using the Palette to Create an Entity

You can use the palette to create and place a number of entities in the model.

▼ To create entities using the palette:

1 Select the Entity icon on the palette.

You enter Create Entity mode, and the Create Entity pop-up window appears (Figure 5-3).

Figure 5-3 Create Entity Pop-Up Window

See illustration at chapter end.

To exit from the pop-up window (and Create Entity mode) without creating any entities, select the Cancel pushbutton.

2 In the Create Entity window, enter one or more entity names in the Names list box.

If you attempt to enter a duplicate or invalid name, the system blocks entry of the name and displays an error message.

3 When you finish adding entity names, select the OK pushbutton.

Using the Diagram Context Menu to Create an Entity

You can use the Create Entity choice on the Diagram context menu to create entities.

▼ To create entities using the Diagram context menu:

1 Click button 2 on the background of the E-R diagram.

The system displays the context menu for the entire diagram.

2 Select Create Entity.

The system clears the context menu and displays the Create Entity pop-up window (see Figure 5-3).

3 Use the Create Entity pop-up window to name the entities, and place the entities in the diagram, as described under Using the Palette, steps 2 and 3.

Using the Data Model Form to Create an Entity

You can use the Entities field on the Data Model form to create entities. *(Not available in the Beta release.)*

Placing an Entity in the Diagram

There are two ways to place an entity in an E-R diagram:

- Automatically
- Manually

If you set the Data Model profile to Automatic Placement, then the first time you create entities the system places them in the diagram and scales them to fill the visible part of the window. When you add additional entities, the system automatically places them in the lower left of the diagram, and you might need to fit the diagram again to make them appear.

If you set the Data Model profile to Manual Placement, and you create the entities by naming them in the Create Entity pop-up window, then you must click button 1 once in each place you want an entity to appear. After you click button 1 for the last entity you created, the system displays the entities.

Results in Related Diagrams and Forms

The entities you create can be seen in the E-R diagram and its applicable forms, and in the Data Model form.

Undo Entity Creation

You can undo the results of creating an entity by selecting Undo from the Edit pull-down menu immediately after leaving Create Entity mode. If you created several entities at once, all of them are undone.

Alternatively, to delete one or more entities, you can select the entity or group of entities and then select Clear from the Edit pull-down menu.

Adding Information About an Entity

After you create an entity, you can display the Entity form to enter detailed information about the entity. The form can be retrieved for data entry, editing, or reference as long as the entity exists in the model.

When you display the form, you can enter information such as a brief description of the entity, its attributes, keys, synonyms, supertypes and subtypes, partnership sets, foreign keys, methods, volumes, growth rates, and notes. (Refer to Chapter 11, Forms Reference, for complete field descriptions for the Entity form.)

From the Entity form you can also display forms for other data model objects, such as attributes, keys, partnership sets, and methods. Fields that allow you to display other forms are marked with an asterisk.

You can display a form for an entity three ways:

- By double-clicking on an entity in an E-R diagram.
- By selecting Form from the Form pull-down menu. *(Not available in the Beta release.)*
- By selecting Find from the Edit pull-down menu. *(Not available in the Beta release.)*

▼ To display the Entity form for a specific entity, double-click button 1 on the entity.

The system displays an Entity form for the selected entity.

For more information about finding Analyst model objects, refer to Chapter 4, Working With an Analyst Model. For more information about working with forms, refer to Chapter 3, Working With the BACHMAN System.

Results in Related Diagrams and Forms

When you add or edit information about an entity in the Entity form, related data model and process model diagrams change accordingly, depending on the type of information you add or edit. For example, if you name an entity method on the Entity form, then display the PDL diagram, a node for the entity method appears in the PDL diagram so that you can define the process logic for the procedure.

Undoing Information Entered Into a Form

The system accepts a change to an entity each time you leave a field in the Entity form. You can undo any information entered into a field by selecting Undo from the Edit pull-down immediately after the system accepts the field values and before you perform any other operation.

Editing an Entity

Once you enter an entity into an E-R diagram and further define it in the Entity form, you can change the entity by editing the information in the form or by selecting editing operations from the action bar or the Entity context menu.

This section provides information about the editing operations available from the action bar and Entity context menu. For information about using the Entity form, refer to Creating an Entity in this chapter. For information about creating entity type hierarchies, refer to Creating a Relationship, also in this chapter.

When you edit an entity in an E-R diagram, you select the entity and then select an editing operation from the action bar or from the entity's context menu. These operations include

- Copying an entity *(Not available in the Beta release.)*
- Deleting an entity
- Establishing foreign key references*
- Removing foreign key references*
- Changing a relationship to an entity*
- Changing an entity to a relationship*
- Changing a complex relationship to an entity type hierarchy*
- Changing an entity type hierarchy to a complex relationship*
- Splitting an entity*
- Merging entities*

The operations marked with an asterisk are transformations. Transformations combine multistep editing operations and make them accessible from a single menu choice, Transform, which appears on the Tasks pull-down menu.

The following sections give the procedures for performing editing operations on entities. The operations are presented in the order shown above.

You can undo an editing operation by selecting Undo from the Edit pull-down menu; the entity returns to its pre-edited state.

Copying an Entity *(Not available in the Beta release.)*

You can copy an entity by using the Edit pull-down menu as described in Chapter 4, Working With an Analyst Model.

Results in Related Diagrams and Forms

When you copy an entity, related data model and process model diagrams change accordingly to reflect the copied entity. You can look at information about the copied entity in the Entity form.

Undoing Entity Copy

You can undo an entity copy operation as described in Chapter 4, Working With an Analyst Model. The data model returns to the state it was in before you performed the copy. All diagrams and forms associated with the data model, displayed or not displayed, are updated.

Deleting an Entity

You can delete an entity by using the Edit pull-down menu as described in Chapter 4, Working With an Analyst Model.

You can verify the deletion by selecting Find from the Edit pull-down menu. The deleted entity is no longer listed among the objects in the model.

Results in Related Diagrams and Forms

Entity deletion completely deletes the entity and all information about it from the E-R diagram, and from all related forms and diagrams.

Undoing an Entity Deletion

You can undo the entity deletion as described in Chapter 4, Working With an Analyst Model. All diagrams and forms associated with the data model, displayed or not displayed, are updated.

Establishing a Foreign Key Reference

A foreign key is a primary key in one entity that acts as a unique identifier in another, partner entity. (Refer to Creating a Key for more information about keys.)

▼ To establish a reference to a foreign key, follow these steps:

1 Select an entity that has one or more attributes that you want to transform to a foreign key.

2 Select Transform under Tasks.

3 Select the Establish Foreign Key Reference transformation.

4 Select the OK pushbutton.

A pop-up window appears.

5 Select the attributes that you want to transform.

6 Check Create a New Entity, if you want to create the entity to be referenced by the foreign key, and type the new entity's name in the Target Entity entry field. (Alternatively, you can select an existing entity from the Target Entities list box. All entities listed in the list box have the same number of attributes in their primary keys as the number of attributes you selected to transform.)

*Note:* If you check Create a New Entity, the attributes you chose to transform move to the new entity, but their names remain the same.

7 Select the OK pushbutton.

The system transforms the attribute automatically. If you create a new entity, the system places it in the lower left corner of the diagram. You can use Fit under Diagram to see the entity.

Removing a Foreign Key Reference

The Remove Foreign Key Reference transformation deletes an entity with a primary key that is referenced as a foreign key in a partner entity. The components of the primary key are moved to the partner entity. The most common reason for performing this edit is to remove an entity whose only important characteristic is its primary key.

▼ To move referenced primary key components to a partner entity:

1 Select the entity to be deleted. This entity's primary key must be referenced as a foreign key in a partner entity.

2 Select Transform under Tasks.

3 Select the Remove Foreign Key Reference transformation.

4 Select the OK pushbutton.

The system then performs these steps:

- Moves every component of the referenced primary key to the partner entity.
- Deletes the original entity and all other non-key attributes.

Consider the following example, illustrated in Figure 5-4. The PRODUCT-TYPE entity has only one attribute, PRODUCT-TYPE-CODE, that represents a particular line of products and that is also the primary key. The PRODUCT-TYPE entity has a relationship with the PRODUCT entity. The PRODUCT entity has numerous attributes that describe a particular product within a product line.

You decide that the PRODUCT-TYPE entity should be deleted and its attribute should be moved to the PRODUCT entity. Rather than going through several editing steps, you automate the process by using the Remove Foreign Key Reference transformation.

Figure 5-4 Removing Foreign Key References to an Entity

See illustration at chapter end.

Changing a Relationship to an Entity

The Change Relationship to Entity transformation creates an entity and inserts it in the middle of a relationship to further qualify the relationship.

▼ To transform a relationship to an entity:

1 Select the relationship you want to transform.
2 Select Transform under Tasks.
3 Select the Change Relationship to Entity transformation.
4 Select the OK pushbutton.

The system then performs these steps:

- Replaces the relationship with an entity. The name of the entity is a catenation of the two partner entity names.
- Creates two mandatory partnership sets for the new entity to connect it to the two partner entities.
- Creates a key for the new entity. The components of the key are the two new partnership sets.

Consider the following example, illustrated in Figure 5-5. The PURCHASE and WAREHOUSE entities have a many-to-many relationship. You decide that an entity representing stock is required to capture information about the relationship between the purchase and the warehouse. Rather than go through several editing steps, you automate the process by using the Change Relationship to Entity transformation.

The system creates the PURCHASEWAREHOUSE entity. It is related to the PURCHASE and WAREHOUSE entities by two one-to-many relationships. You can change the name of the entity through the Entity form (for example, you might rename it STOCK).

Figure 5-5 Changing a Relationship to an Entity

See illustration at chapter end.

Changing an Entity to a Relationship

The Change Entity to Relationship transformation replaces an entity with a relationship. It is commonly used to replace non-information-bearing entities that relate two other entities.

▼ To transform an entity to a relationship:

1 Select the entity you want to transform.
2 Select Transform under Tasks.
3 Select the Change Entity to Relationship transformation.
4 Select the OK pushbutton.

If the entity has attributes or local names for foreign key attributes, a warning message appears. A pop-up window prompts you to continue or cancel the transformation.

The system then performs these steps:

- Deletes the entity and its subordinate objects (attributes, keys, partnership sets, and so on).
- Replaces the entity with a single relationship that joins the partnership sets on the two related entities.
- Adjusts partnership set volumes as required.

Consider the following example, illustrated in Figure 5-6. The STOCK entity has a many-to-one relationship with the PURCHASE and WAREHOUSE entities. You decide the STOCK entity is not needed. (It might have been created to resolve a many-to-many relationship for translation into a specific database management system.)

When you choose the Change Entity to Relationship transformation for the STOCK entity, a pop-up window warns you that the STOCK entity has attributes. You select Accept, indicating that you want to continue even though the entity will be deleted. The system deletes the STOCK entity and establishes a new relationship between the PURCHASE and WAREHOUSE entities.

Figure 5-6 Changing an Entity to a Relationship

See illustration at chapter end.

Changing a Complex Relationship to an Entity Type Hierarchy

The Change Complex Relationship to Entity Type Hierarchy transformation changes an IOR or XOR complex relationship to an entity type hierarchy. Overlapping attributes or relationships at the subtype level are analyzed and, if appropriate, are generalized in the supertype entity. As a result, you have a model that is more expressive than a complex relationship. (Generalization rules are described in Chapter 12 of the *BACHMAN/Data Analyst Reference* manual for Release 2.20)

▼ To transform a complex relationship to an entity type hierarchy:

1 Select a complex partnership set.
2 Select Transform under Tasks.
3 Select the Change Complex Relationship to Entity Type Hierarchy transformation.
4 Select the OK pushbutton.

*Note:* An error message appears if one of the partners in the complex relationship currently participates as a subtype in another entity type hierarchy.

The system transforms the relationship to an entity type hierarchy, and displays the new hierarchy in the diagram.

Consider the following example, illustrated in Figure 5-7. A company has three types of customers: retail, mail-order, or employee. This is modeled as an IOR relationship.

You decide this relationship should be modeled as an entity type hierarchy. There are many attributes among the RETAIL, MAIL-ORDER, and EMPLOYEE entities that can be generalized at the CUSTOMER entity level. The model is strengthened because an entity type hierarchy models the situation more precisely than a complex relationship.

Figure 5-7 Changing a Complex Relationship to an Entity Type Hierarchy

See illustration at chapter end.

Changing an Entity Type Hierarchy to a Complex Relationship

The Change Entity Type Hierarchy to Complex Relationship transformation changes an entity type hierarchy to an XOR complex relationship. This transformation copies the attributes and partnership sets of a supertype entity to its subtype entities as part of the conversion process.

▼ To transform an entity type hierarchy to a complex relationship:

1. Select a supertype entity.
2. Select Transform under Tasks.
3. Select the Change Entity Type Hierarchy to Complex Relationship transformation.
4. Select the OK pushbutton.

The system displays a pop-up window.
5. Enter partnership set names for the new relationships, and specify the kind of relationship you want to create. (If you do not specify a kind of relationship, the system automatically creates an XOR relationship.)
6. Select the OK pushbutton.

The system replaces the entity type hierarchy with the type of relationship you specified.

Splitting an Entity

The Split Entity transformation copies or moves specified attributes and partnership sets from one entity to a new entity.

*Note:* If you copy or move all the components of a key to a new entity, the system copies or moves the key, too. If the key is *moved* to the new entity, the system deletes it from the old entity. If the primary key is deleted, the system selects one of the alternate keys, if defined, as the new primary key. If an alternate key is not defined, there are three ways to define the primary key:

- If there are several attributes defined, the system displays a list of their names from which you can select one to be the primary key.
- If there is only one attribute defined, that attribute becomes the primary key automatically, and a message appears in the Messages window to confirm this result.
- If there are no attributes defined, a pop-up window appears so that you can create a primary key.

▼ To split an entity:

1. Select an entity that has more than one partnership set or attribute.
2. Select Transform under Tasks.
3. Select the Split Entity transformation.
4. Select the OK pushbutton.

A pop-up window appears.
5. Type the name of the new entity in the New Entity Name field.
6. Select any attributes in the Attributes list that you want to copy or move to the new entity.
7. Select any partnership sets in the Partnership Set list that you want to copy or move to the new entity.
8. Select one of the Relationship choices to define a relationship between the new entity and the original.
9. Specify whether to copy or move the original components.
10. Select the OK pushbutton.

The system splits the original entity into two entities and creates the relationship you specified.

Merging an Entity

The Merge Entities transformation merges the subordinate objects of one entity (the source) into another (the target), and then deletes the source entity. This transformation is commonly used to eliminate redundant entities.

*Note:* This transformation uses Merge. Therefore, you might want to review the Merge parameters in the Design and User profiles described in Chapter 6 of the BACHMAN/Data Analyst Reference manual for Release 2.20 before running the transformation. For more information about profiles, refer to Chapter 11, Forms Reference, of this book.

▼ To merge two entities:

1. Select a source entity to merge.
2. Select Transform under Tasks.

3 Select the Merge Entities transformation.

4 Select the OK pushbutton.

A pop-up window appears.

5 Type the name of the entity that you want to be the target entity, or select one from the list box.

6 Select the OK pushbutton.

The system then performs these steps:

- Merges the attributes, keys, and partnership sets of the source entity to the target entity.
- Deletes the source entity.

*Note:* The steps described are just one example of how the system performs during a Merge operation. The actual steps at any time depend on your profile settings. Refer to Chapter 11, Forms Reference, for more information about profiles.

Creating an Attribute

An attribute is a value that describes or identifies an entity. You can specify as many attributes as you need to describe an entity.

Consider the CATALOG entity for a typical mail-order business. The XYZ Mail-Order Company periodically issues a new catalog. The catalogs are important to the business because they reflect new items and prices. The following attributes represent the information about catalogs that is most important to the business:

- Catalog-ID represents the unique identification number of a catalog. Items and their prices are cross-referenced against the identification number.
- Catalog-Date-Effective represents the date when items and prices in a catalog take effect.
- Catalog-Date-Expired represents the date when items and prices in a catalog expire.

Every attribute has an attribute name. This name must be unique within an entity, but can be duplicated in different entities.

Attributes can be grouped into sets of values called dimensions, and further classified into domains and subdomains. Dimensions and domains can yield a variety of information about your information model. They are discussed in Creating Dimensions and Domains in this chapter.

You can document three important properties of the values represented by an attribute: the source of the values, whether the values can be represented as null values, and whether the values can be stored for forward-engineering into a data base.

You can document three sources of values:

- Values from a manual source are entered manually (that is, with the keyboard or mouse).
- Values from a system source are entered from another system.
- Values from a derived source are entered as the result of a calculation.

Attributes that get their values as the result of a calculation are referred to as *derived attributes*. For more information about derived attributes, refer to Chapter 9, Introduction to PDL.

You can create four kinds of attributes:

- Entity-owned attributes
- Free attributes
- Component attributes
- Shared attributes

*Entity-owned attributes* are associated with an entity. For example, the entity CUSTOMER might own the attribute Customer-Number.

*Free attributes* are associated with a data model, but not with a particular entity in the data model. You usually create free attributes when you want to enter several attributes at one time, or in a batch, before using them to define entities.

*Component attributes* are attributes that make up the definition of another attribute. You can think of component attributes as children of a parent or *owner attribute*.

*Shared attributes* are component attributes that are shared by the definitions of two or more other attributes.

Creating an Entity-Owned Attribute

You can create an attribute and associate it with a particular entity by using the Entity form or the Create Entity pop-up window.

▼ To create attributes for a particular entity from the Entity form:

1 Move the cursor to the Attribute field.

2 You can type an order number, if you wish, or press Tab to move the cursor to the right half of the field.

3 Type the name of the new attribute.

4 Select the Add pushbutton.

The system adds the name of the new attribute to the Attributes list box, and automatically assigns an order number if you did not specify one.

5 Add additional attributes or close the form.

▼ To create attributes for a particular entity from the Create Entity pop-up window:

1 Name a new entity or select an existing entity from the Entities list box.

2 Select Add Attr.

The system displays the Create Attribute pop-up window (Figure 5-8).

Figure 5-8 Create Attribute Pop-Up Window

See illustration at chapter end.

3 Type the name of the new attribute. You can also enter a description of the attribute, its expected length, and its data type.

4 Select the Apply pushbutton.

The system automatically adds the name of the attribute to the Attributes list box.

5 If you want to add more attributes for this entity, repeat steps 3 and 4.

6 Select the OK pushbutton to return to the Create Entity pop-up window.

Creating a Free Attribute

You can create a free attribute (that is, an attribute that is not associated with a particular entity) by using the Data Model form or the Create attribute choice from the Form pull-down menu.

▼ To create free attributes from the Data Model form:

1 Type the name of the new attribute in the Free Attribute field.

2 Select the Add pushbutton.

The system automatically adds the attribute to the data model and displays its name in the Free Attributes list box. You can add additional attributes, or close the form.

▼ To create free attributes from the Form pull-down menu:

1 Select Create Attribute under Form

The Create Attribute pop-up window appears.

2 Type the name of a new attribute in the Attribute Name field. You can also specify additional information about the attribute, if you wish.

3 Select the Apply pushbutton.

4 Enter additional free attributes or select the OK pushbutton to close the window.

The next time you open the Data Model form, the names of the free attributes appear in the Free Attributes list box.

Creating Component Attributes

You can specify one or more attributes as the components of another attribute. For example, you could specify the attributes Work-Hours and Vacation-Hours as the components of an attribute called Employee-Time. Employee-Time becomes the owner attribute of its components.

▼ To create component attributes from the Entity form:

1. Type the name of a new attribute and add it to the Attributes list box, or select an existing attribute from the list box.
2. Double-click button 1 on the name of the attribute in the Attributes list box to display the Attribute form.
3. In the Component Attribute entry field, enter the name of the first attribute you want to use to compose the owner attribute.
4. Select the Add pushbutton.
5. Add additional component attributes, if you wish, or close the Attribute form.

The system displays the names of the component attributes indented below the name of the owner attribute in the Attributes list box of the Entity form.

Creating a Shared Attribute

You can specify one or more component attributes to be shared by the definitions of other attributes. For example, the attribute Product-Type-Code might be shared by the definitions of the Product-Type attribute and the Package-Type attribute.

▼ To create shared attributes from the Entity form:

1. Select the attribute that you want to share from the Attributes list box.
2. Change the attribute's order number to the order number of the new owner attribute that will share it.
3. Select the Share pushbutton.

The system displays the shared attribute's name indented in the Attributes list box below the name of the new owner attribute, as well as under the name of the original owner attribute. The system also updates the order numbers in the list.

Editing an Attribute

☛ *Documentation to be supplied after the Beta release.*

Creating Dimensions and Domains

Dimensions and domains help you manage information by classifying attributes in a meaningful way.

Creating a Dimension

A dimension consolidates attributes with the same logical values, regardless of their data types or how the data they represent is intended to be stored or displayed. Date and time are examples of very common dimensions. For example, consider the following attributes:

- Date-Order-Filled
- Date-Employee-Hired

Each of these attributes can be considered part of the same class of attributes, those that represent a date. If there are many date-related attributes throughout a data model, you can assign each to the same Date dimension.

Figure 5-9 illustrates how attributes in a data model can be classed into different dimensions. Notice that each attribute is associated with a single dimension, but that a dimension may represent many attributes.

Figure 5-9 Dimensions as Classes of Attributes

See illustration at chapter end.

▼ To create a dimension:

1 Open the Data Model form.

2 Move the cursor to the Dimension entry field.

3 Type the name of a new dimension.

4 Select the Add pushbutton.

The system automatically names the dimension and places the name in the Dimension list box.

5 Double-click button 1 on the name of the dimension in the list box.

The system displays the Dimension form. You can use this form to add detailed information about the dimension, such as the attributes it classifies.

Creating a Domain

A domain describes the representation of an attribute within the context of the attribute's dimension.

For example, consider these attributes as part of a data model:

- Date-Order-Placed represents the date that a request for an order is received.
- Date-Order-Filled represents the date than an order is packed.
- Date-Emp-Hired represents the date that an employee is hired.
- Vacation-Date represents the date that an employee starts a vacation period.

All of these attributes can be assigned to the Date dimension. But suppose these attributes are in a data model that represents a multinational corporation. Then date information might be represented in two formats:

- US date format (month/day/year) to represent order attributes.
- European date format (day/month/year) to represent employee attributes.

Figure 5-10 illustrates how a domain represents an attribute within the context of a dimension.

Figure 5-10 Domains as Representations of Attributes

| |
|---|
| See illustration at chapter end. |

You can specify data types for the attributes in a domain to represent the physical storage characteristics of the attribute at the data level. You can also create superdomains and subdomains. Data types, superdomains, and subdomains are described later in this section.

You can create a domain three ways:

- From the Data Model form.
- From the Dimension form
- From the Create Attribute pop-up window.

▼ To create a domain from the Data Model form:

1 Open the Data Model form.
2 Move the cursor to the Domain entry field.
3 Type the name of a new domain.
4 Select the Add pushbutton.

The system automatically names the domain and places the name in the Domain list box.

5 Double-click button 1 on the name of the domain in the list box.

The system displays the Domain form. You can use this form to add detailed information about the domain, such as the names of subdomains that it comprises, the attributes it represents, and data types.

▼ To create a domain from the Dimension form:

1 Open the Dimension form.
2 Move the cursor to the Domain entry field.
3 Type the name of a new domain.
4 Select the Add pushbutton.

The system automatically names the domain and places the name into the Domain list box.

5 Double-click button 1 on the name of the domain in the list box.

The system displays the Domain form. You can use this form to add detailed information about the domain, such as the names of subdomains that it comprises, the attributes it represents, and data types.

▼ To create a domain from the Create Attribute pop-up window:

1 Open the Create Attribute pop-up window.
2 Name an attribute and a domain.
3 Select the OK pushbutton.

The system automatically creates the attribute and the domain you named, and assigns the attribute to the domain.

4 Open the Data Model form.
5 Double-click button 1 on the name of the new domain in the Domain list box.

The system displays the Domain form. You can use this form to add detailed information about the domain, such as the names of subdomains that it comprises, the attributes it represents, and data types.

Specifying Data Types

The data represented by attributes can be displayed or printed in different ways. You can define different data types to describe the data storage characteristics. An attribute initially has no data type. You can define any one of seven data types for an attribute:

- Character. You specify alphanumeric or alphabetic, and the maximum and expected length.
- Integer.
- Real.
- Boolean.
- Image.
- Audio.
- Video.

For example, suppose the US Date domain is associated with the Date-Order-Placed and Date-Order-Filled attributes. Both attributes are being stored in integer format, as illustrated in Figure 5-11.

Figure 5-11 Data Types as Storage Characteristics of Attributes

See illustration at chapter end.

You specify data types for attributes in the Data Type field of the Domain form or the Create Attribute pop-up window. (Refer to Creating a Domain or Creating an Attribute in this chapter for information on accessing this form and window).

Creating Superdomains and Subdomains

A subdomain is the smallest discrete domain unit. It is used to specify the structure of a superdomain. There can be many levels of subdomains. The level immediately above a subdomain is its superdomain.

Referring to Figure 5-12, consider the following example:

- The European Date domain corresponds to the Vacation-Date and Date-Emp-Hired attributes.
- The Vacation-Date attribute is displayed in Julian format and stored in integer format.
- The Date-Emp-Hired attribute is displayed and printed in two ways, in long form (character: 1 January 1990) and in short form (integer: 01/01/90).

You want to assign two data types to the European Date domain. You examine the hire date and notice that it can be broken down into Day, Month, and Year components. You can control the data type characteristic of each component by assigning a data type to each component, creating three subdomains.

Figure 5-12 illustrates the breakdown of the European Date domain into subdomains and their data types.

Figure 5-12 Superdomain, Subdomain, and Data Type

See illustration at chapter end.

▼ To create superdomains and subdomains:

1. Open the Data Model form.
2. Move the cursor to the Domain field.
3. Add a new domain to the list box or select an existing domain.

This domain will be the superdomain after you specify subdomains in the following steps.
4. Double-click button 1 on the name of the domain in the list box.

The system displays the Domain form.
5. In the Subdomain field, type the name of the subdomain you want to create. You can also specify an order number, if you wish.
6. Select the Add pushbutton.

The system adds the name to the Subdomain list box, and automatically assigns an order number if you did not specify one.

7 Add additional subdomains, if you want, or select the OK pushbutton to return to the Data Model form.

The names of any subdomains you created appear in the Domain list box on the Data Model form.

Editing Dimensions and Domains

| |
|---|
| ☛ *Documentation to be supplied after the Beta release.* |

Creating a Relationship

You create relationships between entities to represent the natural relationships found in your business. You can represent three categories of relationships:

- Simple
- Complex
- Hierarchical

Simple relationships are drawn with a line and one or more partnership sets. The line describes the maximum number of relationships that each occurrence of an entity has with an occurrence of another entity. An arrowhead on the end of the line means the maximum is many, no arrowhead means the maximum is one.

Partnership sets specify how each occurrence of a partner entity participates in the relationship (that is, at least one instance of the entity must occur, or any number of instances may occur). Partnership sets are described later in this section.

Complex relationships are drawn with multiple lines from one partnership set on an entity to two or more other entities. If no arc appears between the lines, the diagram represents an Inclusive OR relationship. A single arc indicates an Exclusive OR relationship, and a double arc indicates an AND relationship.

Hierarchical relationships, which are referred to as *entity type hierarchies*, are unique representations of complex relationships between entities of the same type. They are drawn in a "box-in-box" formation. The outer box represents the supertype entity; inner boxes represent subtype entities.

Creating a Simple Relationship

Simple relationships can occur between

- Two entities
- An entity and itself (this relationship is called a recursive relationship)

- Two existing partnership sets
- Any combination of a partnership set and an entity You can describe all simple relationships as one-to-one, one-to-many, or many-to-many.

*Note:* The following procedures demonstrate how to create relationships between two entities.

One-to-One Relationships

A one-to-one relationship indicates that for every occurrence of entity A, the relationship is such that there can be a maximum of one occurrence of entity B. From entity B's perspective, there can be a maximum of one occurrence of entity A.

The relationship between Invoice and Order shown in Figure 5-13 is an example of a one-to-one relationship. Each order is related to a maximum of one invoice; each invoice is related to a maximum of one order.

Figure 5-13 Examples of Relationships

| |
|---|
| See illustration at chapter end. |

▼ To create a one-to-one relationship between two entities:

1. Select the One-to-one relationship icon from the palette.
2. Select the first entity in the relationship.
3. Select the second entity in the relationship.

The Create Relationship pop-up window appears. This window displays the names of the two entities you selected. By default, the partnership set associated with each entity bears the name of the partner entity. That is, if you create a relationship between entity A and entity B, entity A's partnership set is named B and entity B's partnership set is named A. (If a partnership set already exists by the same name, the system distinguishes the new partnership set by appending a number to the name; for example, A1.)

You can edit partnership set names in the Create Relationship pop-up window to make them more meaningful. For example, if you create a relationship between two entities named EMPLOYEE and PERSONNEL-FILE, you can change the partnership set name for EMPLOYEE to "must have a", and the partnership set name for PERSONNEL-FILE to "describes one". Then you can describe the relationships as *EMPLOYEE must have a PERSONNEL-FILE* and *PERSONNEL-FILE describes one EMPLOYEE.*

*Note:* If you create a relationship using an existing partnership set, the actual name of the source partnership set appears in the Create Relationship pop-up window. If you rename it, the partnership set is renamed in all of its relationships.

4 Select the OK pushbutton.

The system creates the relationship automatically.

One-to-Many Relationships

A one-to-many relationship indicates that for every occurrence of entity A, the relationship is such that there can be a maximum of many (that is, unlimited) occurrences of entity B, and a maximum of one occurrence of entity A. The arrowhead at the end of the partnership line represents a many relationship from entity A's perspective.

The relationship between ORDER and LINE-ITEM shown in Figure 5-13 is an example of a one-to-many relationship. Each line item can be related to a maximum of one order; each order can be related to many line items.

▼ To create a one-to-many relationship between two entities:

1 Select the One-to-many relationship icon from the palette.

2 Follow steps 2 through 4 for creating a one-to-one relationship.

Many-to-Many Relationships

A many-to-many relationship indicates that for every occurrence of entity A, the relationship is such that there can be many occurrences of entity B, and for every occurrence of entity B, there can be many occurrences of entity A.

The relationship between WAREHOUSE and STOCK-ITEM shown in Figure 5-13 is an example of a many-to-many relationship. Each warehouse can be related to many stock items. Each stock item can be related to many warehouses.

▼ To create a many-to-many relationship between two entities:

1 Select the Many-to-many relationship icon from the palette.

2 Follow steps 2 through 4 for creating a one-to-one relationship.

Recursive Relationships

A recursive relationship is a simple relationship between an entity and itself. You create recursive relationships to describe relationships between occurrences of the same entity.

For example, employees are related to each other in a number of different ways. Employees can be on the same project team. One employee can manage other employees. You can represent all employees generally with one EMPLOYEE entity.

There are two kinds of recursive relationships:

- Directed

- Nondirected

A *directed recursive relationship* occurs when members in a relationship have varied perspectives. For example, an employee can be a manager, and an employee can also have a manager. Figure 5-14 shows how you can model the manager-employee relationship.

Figure 5-14 Manager-Employee Relationship

| See illustration at chapter end. |
|---|

The two partnership sets in Figure 5-14 represent the Manages and Managed-By perspectives. You can start at one partnership set and look to the other to understand the nature of the relationship between one employee and the other.

There is a natural one-to-many relationship between managers and other employees. The manager manages many employees; an employee has only one manager. A manager and his or her employees have a directed recursive relationship.

▼ To create a directed recursive relationship:

1 Select one of the simple relationship icons from the palette.
2 Select the entity.
3 Select the entity a second time.

The system draws the relationship automatically.

A *nondirected recursive relationship* occurs when the nature of a relationship remains constant regardless of the members' perspectives. For example, two or more employees can be on the same project team (Figure 5-15).

Figure 5-15 Employees on a Project Team

| See illustration at chapter end. |
|---|

A nondirected recursive relationship is modeled with only one partnership set, because the perspective of any one project team member is the same as any other. The line appears in a "teardrop" shape, beginning and ending at the same partnership set.

▼ To create a nondirected recursive relationship:

1 Select one of the simple relationship icons from the palette.
2 Select an existing partnership set.
3 Select the same partnership set again.

The system draws the relationship automatically.

Partnership Sets

A partnership set represents information about a relationship between two entities from the perspective of one of the entities. Partnership sets help you describe and document the relationships in your business.

There are always at least two partnership sets for a relationship. Each partnership set represents one partner's view of the relationship. Partnership sets are graphically represented as circles and have descriptive names. If a partnership set is part of the primary key of an entity, a diamond appears next to the partnership set. Figure 5-16 illustrates two sample partnership sets.

Figure 5-16 Partnership Sets and Their Names

See illustration at chapter end.

Consider the relationship between the DEPARTMENT entity and the EMPLOYEE entity shown in Figure 5-16. The partnership set on the DEPARTMENT entity is named EMPLOYEE because it represents the perspective of the department with respect to the employees. The partnership set on the EMPLOYEE entity is named DEPARTMENT because it represents the perspective of the employee with respect to a particular department. Each department can have many employees.

Suppose there is another relationship between the DEPARTMENT entity and the EMPLOYEE entity that is considered important by the company. Each department has a manager. The manager is also an employee. Figure 5-17 shows how you can model this relationship.

Figure 5-17 Documenting Two Relationships

See illustration at chapter end.

The partnership set on the DEPARTMENT entity is named Manager because it represents the perspective of the department with respect to the employee (the manager). The partnership set on the EMPLOYEE entity is named Manages because it represents the perspective of the employee (the manager) with respect to the department that he or she manages. The partnership line tells you that a department has one manager, and an employee manages only one department.

You can also use partnership sets to document the minimum number of relationship occurrences that can exist between two entities. To do this, you specify each partnership set as either optional or mandatory (Figure 5-18).

Figure 5-18 Optional and Mandatory Partnership Sets

See illustration at chapter end.

Optional Partnership Sets

An open circle denotes an optional partnership set (see Figure 5-18). An optional partnership set indicates that a relationship with a partner entity is optional. An optional partnership set does not preclude the existence of a relationship; it merely means that an occurrence of an entity can have a minimum of zero relationships with its partner entity. When you first draw a relationship between entities, the system depicts the associated partnership sets as optional.

For example, consider the Manages partnership set shown in Figure 5-17. This partnership set is optional because an employee can exist without being a manager.

In an optional partnership set, an entity may or may not have a relationship with its partner entity. Because the relationship is optional, you can also think of the entity as being independent of its partner entity.

▼ To specify a partnership set as optional using the palette:

1. Select the Optional partnership set icon from the palette.
2. Select the partnership set that you want to make optional.

The system changes the partnership set to an empty circle.

▼ To specify a partnership set as optional using the context menu:

1. Select the partnership set that you want to make optional.
2. Click button 2 on the partnership set to display the context menu.
3. Select Optional.

The system changes the partnership set to an empty circle.

Mandatory Partnership Sets

A filled-in circle denotes a mandatory partnership set (see Figure 5-18). A mandatory partnership set indicates that a relationship with at least one occurrence of a partner entity is required. That is, an entity must share a relationship with at least one partner entity.

For example, consider the Manager partnership set shown in Figure 5-17. This partnership set is mandatory because a department cannot exist without an employee to manage.

Because the relationship is mandatory, you can also think of an entity as being dependent on its partner entity: the entity owes its existence to the existence of the partner entity.

▼ To specify a partnership set as mandatory using the palette:

1 Select the Mandatory partnership set icon from the palette.
2 Select the partnership set that you want to make mandatory.
The system changes the partnership set to a filled-in circle.

▼ To specify a partnership set as mandatory using the context menu:

1 Select the partnership set that you want to make mandatory.
2 Click button 2 on the partnership set to display the context menu.
3 Select Mandatory.
The system changes the partnership set to a filled-in circle.

Creating a Complex Relationship

A complex relationship has more than one relationship. You create complex relationships in an E-R diagram when you want to show that two or more relationships form a logical group.

For example, suppose a telephone company maintains two entities, Local and Long-Distance. The Customer entity has a relationship with both the Local and Long-Distance entities. The two entities are related logically and you want to model this fact. Figure 5-19 shows a way of modeling this business situation.

Figure 5-19 Typical Complex Relationship

See illustration at chapter end.

Types of Complex Relationships

In an E-R diagram of a data model, you can depict three types of complex relationships: IOR, XOR, and AND (Figure 5-20).

Figure 5-20 Logical Operators for Complex Relationships

See illustration at chapter end.

The partnership set that unites the lines in a complex relationship is called a *complex partnership set*. It has the same properties of a partnership set in any other relationship. A complex partnership set

- Documents the meaning of the relationship
- Is optional or mandatory
- Represents the minimum, expected, and maximum volumes of the complex relationship (see Table 5-1)

Table 5-1 Partnership Set Volumes for Complex Relationships

| RELATIONSHIP | VOLUME | VALID VALUES |
|---|---|---|
| IOR | Maximum | In a range from the highest partnership maximum volume to the sum of the partnership maximum volumes |
| | Minimum | 0, if optional, or in a range from the lowest partnership minimum volume to the sum of the partnership maximum volumes. |
| | Expected | In a range from the partnership set minimum volume to the partnership set maximum volume. |
| XOR | Maximum | The highest maximum partnership volume. |
| | Minimum | 0, if optional, or the lowest partnership minimum volume. |
| | Expected | In a range from the partnership set minimum volume to the partnership set maximum volume. |
| AND | Maximum | In a range from the sum of the partnership minimum volumes to the sum of the partnership maximum volumes. |
| | Minimum | 0, if optional, or in a range from the sum of the partnership minimum volumes to the sum of the partnership maximum volumes. |
| | Expected | In a range from the partnership set minimum volume to the partnership set maximum volume. |

Inclusive OR (IOR) Relationships

An IOR complex relationship means that relationship occurrences can exist in any combination.

For example, an office can have furniture, fixtures, or office equipment in any combination. As shown in Figure 5-21, an office can contain nothing at all; or it can contain furniture, or furniture and fixtures, or fixtures and office equipment, or any combination of the three.

Figure 5-21 IOR Complex Relationship

See illustration at chapter end.

You can create an IOR relationship three ways:

- By using diagramming operations
- By using the IOR icon in the palette
- By using the context menu ▼ To create an IOR relationship using diagramming operations:

1 Create a relationship between two entities.

2 Create a second relationship between the partnership set on the first entity and another entity. To do this, select the partnership set, then the other entity.

The system automatically creates an IOR relationship among the three entities.

▼ To create an IOR relationship using the palette:

1 Select the IOR icon from the palette.

2 Select a complex partnership set.

The system automatically recreates the relationship as an IOR relationship.

▼ To create an IOR relationship using the context menu:

1 Select a complex partnership set.

2 Click button 2 on the partnership set to display the context menu.

3 Select IOR.

The system automatically recreates the relationship as an IOR relationship.

Exclusive OR (XOR) Relationships

An XOR complex relationship means that only one relationship occurrence exists at a time, to the exclusion of other relationships.

For example, suppose a customer is a mail-order customer, a retail customer, or an employee, and that the nature of the business dictates that a customer can fit only one of those three categories. The single arc crossing the lines between entities indicates that the relationship shown in Figure 5-22 is an XOR complex relationship.

Figure 5-22 XOR Complex Relationship

| See illustration at chapter end. |
|---|

You can create an XOR relationship two ways:

- By using the XOR icon in the palette.
- By using the context menu.

▼ To create an XOR relationship using the palette:

1. Select the XOR icon from the palette.
2. Select a complex partnership set.

The system automatically creates an XOR relationship.

▼ To create an XOR relationship using the context menu:

1. Select a complex partnership set.
2. Click button 2 on the partnership set to display the context menu.
3. Select XOR.

The system automatically recreates the relationship as an XOR relationship.

AND Relationships

An AND relationship means that all the relationship occurrences must exist at the same time.

Suppose an engine, a frame, a body, and tires must all be related to a model car at the same time. By its nature, a model car is not complete until all the parts have been assembled. In Figure 5-23, the double arc crossing the lines between the entities indicates that this is an AND complex relationship.

Figure 5-23 AND Complex Relationship

| See illustration at chapter end. |
|---|

You can create an AND relationship two ways:

- By using the AND icon in the palette.
- By using the context menu.

▼ To create an AND relationship using the palette:

1 Select the AND icon from the palette.

2 Select a complex partnership set.

The system automatically creates an AND relationship between the entities you specified.

▼ To create an AND relationship using the context menu:

1 Select a complex partnership set.

2 Click button 2 on the partnership set to display the context menu.

3 Select AND.

The system automatically recreates the relationship as an AND relationship.

Creating an Entity Type Hierarchy

An entity type hierarchy is a special relationship between a supertype entity and one or more subtype entities. A supertype entity generically represents one or more other entities of the same type (the subtype entities).

Generalized Attributes and Keys

The attributes and keys in the supertype entity are shared by the subtype entities. For example, let the CUSTOMER entity be the supertype entity containing attributes such as Customer-Identification-Number (which is also the key) and Customer-State. These attributes are common to all the other subtype entities. The attributes and the key are *generalized* in the Customer entity; they are *inherited* by the subtype entities.

The MAIL-ORDER, RETAIL, and EMPLOYEE entities represent specific types of customers. Each has a one-to-one mandatory relationship with the CUSTOMER entity. Each has its own set of attributes. Each inherits the attributes and partnership sets of the supertype entity. Figure 5-24 illustrates a typical entity type hierarchy.

Figure 5-24 Entity Type Hierarchy

See illustration at chapter end.

*Note:* Relationships are generalized only when you create an entity type hierarchy by transforming a complex relationship. They are not generalized when you create an entity type hierarchy by using the palette.

Generalized Relationships

All relationships between the supertype entity and other entities are shared by the subtype entities. For example, the CUSTOMER entity has a one-to-many relationship with the ORDER entity because each customer can place many orders. In the absence of the entity type hierarchy, you would be required to define separate relationships between the ORDER entity and CUSTOMER entity and all of the subtype entities.

Instead of creating separate relationships, you create one set of relationships with the supertype entity that is shared with the subtype entities. Figure 5-25 illustrates a relationship with the supertype entity that is shared with the subtype entities.

Figure 5-25 Generalized Relationship

See illustration at chapter end.

*Note:* Attributes and keys are generalized only when you create an entity type hierarchy by transforming a complex relationship. They are not generalized when you create an entity type hierarchy by using the palette.

Nested Entity Type Hierarchies

You can create hierarchies within hierarchies. For example, the mail-order customer can order items over the phone or by sending in an order form. You create the PHONE-IN and SEND-IN entities as subtypes within the MAIL-ORDER entity. You do this to show that there are two types of mail-order customers and because you want to maintain a different set of information on each type of customer for marketing purposes. This type of nested entity type hierarchy is illustrated in Figure 5-26.

Figure 5-26 Nested Entity Type Hierarchy

See illustration at chapter end.

There is no logical limit to the number of nested hierarchies you can create. At each level, the attributes and partnership sets from higher levels are inherited.

Subtype Entities and Relationships

It is possible to establish separate relationships between the subtype entities or between the subtype entities and other entities.

Suppose the FURNITURE entity is related to the TABLE, CHAIR, and DESK entities in an entity type hierarchy relationship. Each table is a piece of furniture, each chair is a piece of furniture, and each table is a piece of furniture. But the hierarchy doesn't tell you about the relationships that might exist between the subtype entities, TABLE, CHAIR, and DESK.

Now consider the situation modeled in Figure 5-27. The chairs do not necessarily have a relationship with tables and desks. High-backed chairs and special order chairs are ordered and shipped separately. However, each desk must have a matching chair and tables can come with zero or more matching chairs. As shown in Figure 5-27, you can model this situation within the context of an entity type hierarchy.

Figure 5-27 Relationships Among Subtype Entities

| |
|---|
| See illustration at chapter end. |

You can create an entity type hierarchy by using the Entity Type Hierarchy icon in the palette or by using the Transform choice under Tasks. For more information about Transform, refer to the Editing an Entity section of this chapter.

▼ To create an entity type hierarchy using the palette:

1 Select the Entity Type Hierarchy icon from the palette.

2 Drag the first entity that you want to make a subtype entity into the entity that you want to make the supertype entity.

The system expands the supertype entity automatically to surround the subtype entity.

3 Continue to drag any other entities that you want to depict as subtypes into the supertype entity.

The system expands the supertype entity each time so that all the subtype entities appear inside it.

▼ To delete an entity type hierarchy:

Drag each subtype entity out of the supertype entity and place it on the background of the diagram.

Editing a Relationship

| |
|---|
| ☛ ***Documentation to be supplied after the Beta release.*** |

Creating a Key

A key uniquely identifies one occurrence of an entity. For example, every house has a unique address and every employee has a unique employee identification number. In an E-R diagram of a data model, you can represent unique keys with one or more attributes, or partnership sets, or a combination of both attributes and partnership sets.

You can define one key or many keys for an entity. If you define multiple keys, one must be the *primary key*. The other keys are called *alternate keys*. You can change any of the alternate keys to the primary key at any time.

For example, a customer might be uniquely identified by a customer identification number, or by a name and address combination. You could choose either as the primary key for the CUSTOMER entity, and the other key would automatically become an alternate key. In this case, you might choose the customer ID number as the primary key because it is the most common way to access customer information.

Each key has a key name. A key with a single component is often named after this component. A key with multiple components can be given a name to reflect its meaning.

▼ To define a key:

1. Type the name of the key in the Key Name field of the Entity form.
2. Select the Add pushbutton.

The Create Key pop-up window appears. This window displays the entity name and the key name, and lists the attributes and partnership sets you can select to compose the key.
3. Select the components of the key.
4. Select the OK pushbutton.

The following paragraphs show examples of keys composed of various combinations of attributes and partnership sets.

Single Attribute Keys

You can define a single attribute as a key that uniquely identifies a single occurrence of an entity. The attribute is usually a fabricated number or a sequence number. Employee numbers, customer numbers, and order numbers are typical examples. An attribute selected as a single-attribute key does not usually describe any special properties of an entity. It just uniquely identifies it.

Multiple Attribute Keys

You can define two or more attributes as a key that uniquely identifies a single occurrence of an entity. In many cases, one of the attributes is a property of the entity, and the other is a sequence number.

For example, the PRODUCT entity might have a key called Product-ID that consists of a product type code and a product number. The product type code identifies the type of product (01 might mean tennis shoes, while 02 might mean running shoes). The product number uniquely identifies the product within the product code (for example, 007, 008, 009, and so forth).

Multiple Partnership Set Keys

You can define two or more partnership sets as a key that uniquely identifies a single occurrence of an entity. Multiple partnership set keys are commonly used to identify an entity that relates two other entities.

For example, a supplier can sell many products, and a product is purchased from many suppliers. You might create the PURCHASE entity to define the relationship between the PRODUCT and SUPPLIER entities (Figure 5-28).

Figure 5-28 Multiple Partnership Set Keys

See illustration at chapter end.

For each occurrence of the PURCHASE entity in this relationship, there is a unique occurrence of the PRODUCT and SUPPLIER entities. You can uniquely identify an occurrence of the PURCHASE entity through this relationship with PRODUCT and SUPPLIER by defining the Supplier partnership set and the Product partnership set as the components of the PURCHASE entity's key.

Alternatively, you could define the components of the PURCHASE entity's key to be the primary keys of the SUPPLIER entity and the PRODUCT entity. However, this requires duplication of the Supplier and Product key components in the PURCHASE entity. Instead, the system uses the partnership set to derive a foreign key.

Partnership Set and Attribute Keys

You can define any combination of attributes and partnership sets to form a key that uniquely identifies a single occurrence of an entity.

Consider the following example, illustrated in Figure 5-29:

- The PRODUCT-TYPE entity has a one-to-many relationship with the PRODUCT entity.
- The PRODUCT-TYPE entity is uniquely identified by the Prod-Type-Code attribute.
- The PRODUCT entity has a Product-Sequence attribute, but the attribute does not uniquely identify the product. Rather, each product is uniquely identified by a product sequence number that is part of the Product-Type-Code.

You can uniquely identify a product if you have a product sequence number and at least one relationship with the PRODUCT-TYPE entity. To do this, you specify the Product-Sequence attribute as one key component and the Product-Type partnership set as the other key component.

Figure 5-29 Key With Relationship and Attribute Components

| See illustration at chapter end. |
|---|

Single Partnership Set Keys

You can define a single partnership set as a key that uniquely identifies a single occurrence of an entity.

Consider the following example, illustrated in Figure 5-30. The DEPARTMENT entity has a mandatory one-to-one relationship with the MANAGER entity. The DEPARTMENT entity might already have attributes that can be used singly or in combination to build a unique key. However, you can specify the Manager partnership set as an alternate key. By specifying the relationship with Manager as a key, you recognize that, given a manager, you can uniquely identify a department.

Figure 5-30 Single Partnership Set Key

| See illustration at chapter end. |
|---|

*Note:* Only mandatory partnership sets can be defined as single partnership set keys.

Foreign Keys

A *foreign key* is a primary key in one entity that acts as a unique identifier in a partner entity. You can think of a partner entity as being referenced by the primary key in the other entity.

Foreign keys are derived automatically; you do not explicitly define them. When an entity has a maximum of one relationship with its partner, the primary key of the partner entity is referenced as the foreign key.

For example, suppose the CUSTOMER entity has a primary key called Customer-Number and has a one-to-many relationship with the ORDER entity (see Figure 5-31). Orders are identified by the Customer-Number concatenated with the ORDER entity's Order-Number attribute. From the perspective of the ORDER entity, each occurrence of an order is related to exactly one customer.

Figure 5-31 Reference to a Foreign Key

See illustration at chapter end.

The Customer-Number automatically becomes a foreign key in the Order entity because of the relationship with CUSTOMER. The foreign key is derived from the one-to-many relationship between the ORDER and CUSTOMER entities and the fact that the CUSTOMER entity has a defined primary key.

Editing a Key

☛ *Documentation to be supplied after the Beta release.*

Chapter 6
Working With a Data Model

After creating a data model, you can use the following tasks to help you improve and maintain the model:

- Filters to view a subset of the model.
- Normalize to normalize the model.
- Design to help you create a more concise model.
- Print to print the Bachman Entity-Relationship diagram of the model.
- Merge to merge two data models.

This chapter discusses each of these tasks.

Viewing a Subset of the Data Model

By default, the information displayed in E-R diagrams and data model forms reflects all the information in the data model. To examine just a portion of the information in the data model, use filters as discussed in Chapter 4.

Normalizing a Data Model

▼ To run the Normalize task:

1 Open an Analyst model.

2 Select Normalize from the Tasks pull-down menu.

3 Respond to the pop-up windows as they appear.

> ☛ *The Normalize task of the BACHMAN/Analyst is similar to the Normalize task of the BACHMAN/DA, Release 2.20. For Beta, refer to the BACHMAN/Data Analyst Reference manual for more information.*

Running the Design Task on a Data Model

The objective of data modeling is to render a complex information model into its most concise form. Typically, this is an iterative process. You build the model, examine it against a set of design rules, and then continue to modify and examine it until you are satisfied. The Design task of the BACHMAN/Analyst is an intelligent, rule-based task that automates the repetitive process of examining and modifying the data model. It works as follows:

1 Using a built-in set of design rules, the Design task searches the data model for objects that might be more complex than necessary.

2 It displays a list of those objects and actions that might simplify those objects.

3 You decide what action to take:

- Select an action that modifies one or more of the objects.
- Mark one or more of the objects as correct, indicating that the rule is not appropriate for this object.

4 You choose to rerun the same design rule or to run the next rule.

Modifications that you make to the model in response to one rule may cause additional objects to appear in response to that rule or a different rule. Therefore, after running through all its rules, the Design task returns to the first rule and repeats its examination of the model. The Design task finishes when it runs through all its rules without finding any objects that might be simplified. (You can, of course, stop the Design task at any time.)

Typically, you run the Design task following major changes to your data model. For example, after

- Forward engineering
- Reverse engineering
- Capturing data
- Entering significant amounts of new information You might also want to run the Design task before forward engineering. For more information about forward and reverse engineering, see the *BACHMAN/Database Administrator Reference* manual. For more information about Capture, see the *BACHMAN DA Capture* manual.

Before Running the Design Task

Before starting the Design task:

- Set the desired level of interaction in the current Data Model profile.

Each rule has a priority level. The Design task only runs the rules that have a priority level greater than the interaction level that you set in the profile. Table 6-1 lists the rules and their priorities.

> *For Beta, the profile setting has no effect on the Design task. Therefore, Table 6-1 is not included in the documentation.*

- Optionally, start a log to keep track of the changes you make to the data model while running the Design task.

Running the Design Task

▼ To start the Design task:

1 Open the Analyst model.

2 Select Design from the Task pull-down menu.

The Design Methods pop-up window appears, as shown in Figure 6-1.

3 Fill in the Design Methods pop-up window as follows:

a Select the sets of rules that the Design task should run. Selecting and deselecting Data Model Rules selects and deselects all of the rules.

b Select whether or not the Design task should examine objects previously marked as correct.

c Select the OK pushbutton.

Figure 6-1 Design Methods Pop-Up Window

| See illustration at chapter end. |
|---|

The Design task begins examining the data model using the rules that you selected. When a rule locates an object that can be simplified, the system displays an Advisor pop-up window, as shown in Figure 6-2.

Figure 6-2 Advisor Pop-Up Window

| See illustration at chapter end. |
|---|

From an Advisor pop-up window, you can display an explanation of how the rule applies to an object or you can modify an object.

▼ To display an explanation of how the rule applies to an object:

1 Select one or more objects.

2 Select the Help pushbutton.

> ☛ *Help is not available in Beta.*

▼ To modify an object:

1. Select one or more objects.
2. Select an action.
3. Select either the Apply pushbutton.

Apply executes the action for each object and then reruns the current rule against the modified data model.

▼ To move to the next rule:

Select the Continue pushbutton.

Continue ignores any selected action.

The Design task finishes when either

- You cancel the task by selecting the Cancel pushbutton on an Advisor pop-up window.
- The Design task makes a complete pass through all of the rules that you selected without finding any object that can be simplified.

Design Rules

The Design rules are grouped by object type:

- Entity
- Attribute
- Relationship
- Key
- Domain
- Dimension
- Allowed value table The following sections describe each set of rules.

Entity Rules

Single Subtype

Displays any supertype entity that has only one subtype entity. You generally want to merge the two entities.

Type Hierarchy Benefit Analysis

Displays any supertype entity that has a benefit factor that is less than the value specified in the Benefit Threshold for Type Hierarchy field of the Data Model profile. You generally want to transform the entity type hierarchy into an XOR relationship.

The system calculates the benefit factor for a supertype entity as (order * properties) – order where *order* is the number of subtypes and *properties* is the number of attributes and partnership-sets that are generalized in the parent entity.

Non-Information-Bearing Subtype

Displays any subtype entity that has no locally defined attributes or locally defined relationships. You generally want to delete such entities.

Non-Information-Bearing Relationship

Displays any entity that has no supertype, no subtype, no attributes, and exactly two mandatory 1:1 or 1:M simple relationships. You generally want to transform such entities into relationships.

Variable-Length Text Entity

Displays any entity that has no supertype, no subtype, and at least one relationship to a second entity, which is a text entity. The text entity must have one nonkey attribute that has a data type of character (maximum length greater than 40) and exactly one relationship, which is a simple 1:M or 1:1 relationship, to the first entity.

Componentless Entities

Displays any entity that has no supertype, no subtype, no attributes, no relationships, and a maximum volume greater than 1. You generally want to delete the entity.

Entities Without Attributes

Displays any entity that has no supertype, no attributes, and participates in less than three relationships. You generally want to delete the entity.

Entities Without Relationships

Displays any entity with a maximum volume greater than 1 that has no relationships, local or inherited. You generally want to delete the entity.

Entities Without Keys

Displays any entity with a maximum volume greater than 1 that has no keys, local or inherited. You generally want to add a key to the entity.

Unnormalized Entity

Displays any entity that is not in third normal form, is not marked as normalized, and has at least two attributes, one of which is not in a key.

OOK Entity in Type Hierarchy

Displays any one-of-a-kind entity (an entity with a maximum volume of 1) that is in a type hierarchy. You generally want to remove the entity from the entity type hierarchy.

Unreferenced Entity

Displays any entity that is not referenced by a Process Description Language (PDL) procedure. If an entity has attributes that are referenced by a PDL procedure, that entity is not displayed by this rule.

> ☛ *After Beta, this definition will be extended to include entities that are not referenced by DBMS.*

Entity Without Methods

Displays any entity that has no entity methods.

Multiple Keys

Displays any entity that has more than one key, defined locally or inherited. You might want to delete the alternate keys or split the entities based on the alternate keys.

> ☛ *For Beta, the action that splits an entity based on alternate keys is not available.*

Key in OOK Entity

Displays any one-of-a-kind entity (an entity with a maximum volume of 1) that has one or more keys, either locally defined or inherited.

Duplicate Keys

Displays any entity that has a primary key with the same components as the primary key of a different entity. (The system treats components as the same if they are the same object type and have the same name.) You generally want to merge entities that have the same primary key.

Multiattribute Keys

Displays any entity that has a primary key with more than one attribute. You might want to create an attribute that uniquely identifies the entity and use that attribute as the primary key.

> ☛ *For Beta, the action that generates the primary key is not available.*

Attribute Rules

Attribute Without Domain

Displays any attribute that has no domain. You generally want to assign the attribute to a domain.

Derived Attribute Without PDL

Displays any derived attribute that has no derivation method.

Duplicate Attribute Name

Displays any attribute that has the same name as another attribute and that meets one of the following criteria:

- It is not the only primary key component of its entity.
- It is a foreign key attribute.
- It does not share a common supertype entity with the other attribute of the same name.

> ☛ *The last criterion is not included in Beta.*

Attribute in IM Pool

Displays all free attributes.

Unreferenced Attribute

Displays any attribute that is not referenced by a Process Description Language (PDL) procedure.

> ☛ *After Beta, this definition will be extended to include attributes that are not referenced by DBMS.*

Foreign Key Identification

Displays any attribute that has the same name, domain, or dimension as an attribute that is a primary key component. The system detects these attributes based on name, domain, or dimension depending on the setting of the Foreign Key Profile field of the Data Model profile. You generally want to transform these attributes into foreign key relationships.

Relationship Rules

One-to-Many Relationship With OOK Entity

Displays any 1:M relationship where at least one of the related entities is a one-of-a-kind entity (has a maximum volume of 1). You generally want to remove the one-of-a-kind entity from the relationship.

Simple Type Hierarchy Detection

The system reviews all mandatory, nonrecursive IOR partnership-sets with a maximum volume of 1. It displays the relationship if the following statements are true:

- All partnership-sets related to the IOR partnership-set have a minimum and maximum volume of 1.
- The entities related to the owner entity of the IOR partnership-set through that partnership-set are not supertypes or subtypes of the owner entity.
- The projected benefit factor of the owner entity, if the relationship were transformed into an entity type hierarchy, is greater than the value specified in the Benefit Threshold for Type Hierarchy field of the Data Model profile.

The system calculates the benefit factor for a supertype entity as (order * properties) – order where *order* is the number of subtypes and *properties* is the number of attributes and partnership-sets defined in the supertype entity.

Complex Type Hierarchy Detection

The system reviews all mandatory, nonrecursive relationships that have a complex IOR or XOR partnership-set at one end. It displays the relationship if the following statements are true:

- The entities related to the owner entity of the IOR or XOR partnership-set through that partnership-set are not supertypes or subtypes of the owner entity.
- The projected benefit factor of the owner entity, if the relationship were transformed into a complex entity type hierarchy, is greater than the value specified in the Benefit Threshold for Type Hierarchy field of the Data Model profile.

The system builds the complex entity type hierarchy by creating a new supertype entity named after the IOR/XOR partnership-set, as shown in Figure 6-3.

The system calculates the benefit factor for the new supertype entity as (order * properties) – order where *order* is the number of subtypes and *properties* is the number of attributes and partnership-sets that are generalized in the parent entity.

> *For Beta, the action that transforms these relationships into complex entity type hierarchies is not available.*

Figure 6-3 Complex Relationship to Complex Hierarchy

See illustration at chapter end.

Unrelated Partnership-Set

Displays any partnership-set that is not part of a relationship. (Such a partnership-set cannot be created with Release 3.10 of the BACHMAN/Analyst.)

Default Partnership-Set Names

Displays any partnership-set that has the same name as one of its related entities. Generally, you want to change the name of the partnership-set.

Duplicate 1-to-M Relationship

Displays pairs of 1:M simple, not fully optional, relationships that relate the same two entities. You generally want to combine the relationships.

Fully Mandatory One-to-One Relationship

Displays any fully mandatory 1:1 simple relationship between two entities. You might want to merge the entities.

Fully Optional Relationship

Displays any relationship that has no mandatory partnership-sets.

Key Rules

Overlapping Keys

Displays pairs of keys within the same entity where the components of one key are a subset of the components of the other key. If both keys uniquely identify the entity, you generally want to delete the key with the larger number of components.

Unnecessary Key Components

Displays any key that has multiple components, where one component is a mandatory partnership-set with a related partnership-set that has a maximum volume of 1. You might want to delete the other key components because the partnership-set alone uniquely identifies the entity.

Insufficient Key

Displays any key that has one component: a M:1 or M:M partnership-set. You generally want to delete or modify the key because it does not uniquely identify the entity.

Domain Rules

Incomplete Domain

Displays any domain that has no subdomain and no data type.

Domains Without Dimension

Displays any domain that has no dimension.

Domains Without Allowed Values

Displays any domain that has no subdomain and no allowed values table.

Dimension Rules

Dimension Without Attributes

Displays any dimension that has no attributes. You generally want to delete the dimension.

Dimension Without Domains

Displays any dimension that has no domains. You generally want to delete the dimension.

Allowable Values Rules

Allowed Value Table Without a Domain

Displays any allowed value table that has no domain. Within the BACHMAN/Analyst, allowed value tables have a domain unless you create the allowed value table using the Data Model form or remove the allowed value table from the Domain form.

Printing an E-R Diagram

> ☛ *After Beta, a brief summary of diagram printing will appear here. For Beta, see Chapter 4.*

▼ To print an E-R diagram:

1 Display the E-R diagram.

2 Select Print from the File pull-down menu.

3 Select Diagram from the cascading menu.

The BACHMAN/Analyst offers extensive printing options. It also provides a report production capability by exporting data model information to OS/2's Query Manager facility. For more information on printing and producing reports, see Chapter 4.

Merging Data Models

Merging two data models means adding the information from the *source* Analyst model to the information in the *target* Analyst model. A data model merger

- Combines the data model of the source model with the data model of the target model.

To combine data models, the system adds the data model objects in the source model to the target unless a matching object already exists within the target model. The merge parameters of the current Data Model profile determine what the system considers a match and how matching objects are combined.

> ☛ *The Beta documentation does not fully describe the Data Model Profile form. For Beta, refer to Release 2.10 of the BACHMAN/Data Analyst Reference manual.*

- Copies the process models of the source model into the target model. If the source and target models each have a process model with the same name, a unique number is added to the name of the process model from the source model to avoid a naming conflict.
- Does not affect the source Analyst model.

▼ To merge two data models:

1 Open both the source and target Analyst models.

2 Display the Analyst window of the target Analyst model.

3 Select Merge from the Task pull-down menu.

A cascading menu appears.

4 Select Data Model Merge from the cascading menu.

The Merge Selected E-R Model pop-up window appears. Notice that the title bar of the pop-up window names the target model.

5 Select the source Analyst model from the Open Data Models list box.

6 Select the OK pushbutton to begin the merge.

The BACHMAN/Analyst also allows you to merge the following:

- Process models, as shown in Merging Process Models, Chapter 8.
- Analyst models, as shown in Merging Analyst Models, Chapter 4.
- Analyst model objects of the same type, as shown in the editing section of the object type. See Editing Processes, Chapter 7, for information about merging processes.

Chapter 7
Building a Process Model

Before you can build a process model, you must create a process model that is associated with an Analyst model. You create a process model in one of two ways:

- Entering a process model name in the New Model pop-up window. (Refer to Chapter 4, Creating a New Analyst Model.)
- Entering a process model name in the Analyst Model form. (Refer to Chapter 11, Analyst Model Form.)

Once you create the process model, you can display the process model diagrams and forms. You build the model by creating and placing objects into diagrams and by adding detailed information about the objects in forms.

The diagrams that you use to build the process model are the data flow diagram (DFD), the functional decomposition (FD) diagram, and the process description language (PDL) diagram:

- Use the DFD to create and place processes, information stores, source/destination objects, and information flows in the model.
- Use the FD diagram to create and place processes and subprocesses. You can see each process that you create in the DFD in the FD diagram and vice versa. The FD diagram shows process hierarchy.
- Use the PDL diagram only after you have created a primitive process in the model. PDL is BACHMAN's structured language for specifying the logic of primitive processes.

The first section of this chapter explains how to display the process model diagrams.

After creating and placing process model objects in the diagrams, you can edit the objects by entering information in the appropriate form or by selecting applicable editing tasks from menus. The following sections discuss creating and editing process model objects:

- Processes
- Information Stores
- Source/Destination Objects
- Information Flows It is important to remember that the diagrams and forms are the tools used for defining and manipulating the objects of the model. Once you create an object, it exists in the model and can be displayed graphically in any applicable diagram or textually in a form. When you edit the object, the new information about the object is accessible from any applicable diagram or form. The diagrams and forms provide different ways of accessing the same model objects; they offer different perspectives of the same higher-level model, the Analyst model. Having complementary tools to look at and work with a model accommodates different work styles.

*Note:* Because of its specialized function, the PDL diagram is mentioned in this chapter only when necessary to explain how it is affected by modeling tasks performed in the other process model diagrams and the forms. For more information about PDL, refer to Chapter 9, Introduction to PDL.

Displaying a Process Model Diagram

To create and place objects in a process model using diagrams, you must open an Analyst model that has a process model and display either a DFD or an FD diagram. You cannot display a PDL diagram initially for an empty process model.

You can display a DFD or FD diagram in one of three ways:

- Using the DFD icon or the FD icon that appears when an Analyst model having a process model is opened on the BACHMAN Desktop (refer to Figures 3-3 and 4-2):
  - Double-click button 1 on the icon.

The system restores the minimized DFD or FD window associated with the icon .
- Using New Diagram on the Diagram pull-down menu:

1 Select New Diagram from the Diagram pull-down menu.

The system displays a cascading menu of diagram types: E-R, DFD, FD, PDL.

2 Select any of the diagram types displayed in black text to display that type of diagram for the model.

- Using the Window pull-down menu: (Not Available in the Beta Release)
  - Select the Analyst model from the numbered list on the Window pull-down menu.

The system displays a cascading menu of diagrams associated with the selected Analyst model.
  - Select the diagram you want to display from the cascading menu.

The system displays the selected diagram.

Creating a Process

You create a process by adding it to the process model using the DFD, the Process Model form, or the FD diagram. You can then use the Process form to enter detailed information about the process.

For more information about forms, refer to Chapter 3, Working With Form and Pop-Up Windows, and Chapter 11, Process Model Forms.

Creating and Placing a Process

The procedures given in the following paragraphs assume that you have opened an Analyst model that has a process model and have displayed either the DFD or the FD diagram.

You can create processes using the process symbol on the palette, the Create Process choice on the DFD or FD diagram context menu, or the Processes field of the Process Model form.

Using the Palette

Using the palette, you can create and place a number of processes in the model.

▼ To create a process using the palette:

1 Select the process symbol in the palette.

The system highlights the palette symbol, displays a message in the message area, and displays the Create Processes pop-up window (Figure 7-1).

While you are in the create process mode, you cannot perform any other type of operation.

To exit from the pop-up window (and the create process mode) without creating any processes, click on Cancel.

2 In the Create Processes pop-up window, enter one or more process names in the Process field (Figure 7-1).

3 When you are done adding process names, click on OK.

The system places the processes in the diagram according to the placement method you specified in the Profile form. (Refer to Chapter 11, Profile Forms.)

*Note:* In the FD diagram, you have no automatic placement choice. You can only place processes manually, one at a time, when prompted by the message area. Where you place a process in the FD diagram determines its level in the hierarchy of processes: process, subprocess, or primitive process. For more information about creating leveled processes, refer to Creating and Placing a Subprocess Using the FD Diagram in this chapter.

Figures 7-2 and 7-3 show the processes placed in the DFD and the FD diagram.

Notice that the system numbers the processes in the order of creation.

Figure 7-1 The Create Processes Pop-Up Window

| |
|---|
| See illustration at chapter end. |

Figure 7-2 DFD Showing Processes

See illustration at chapter end.

Figure 7-3 FD Diagram Showing Processes

See illustration at chapter end.

Using the Diagram Context Menu

As an alternative to using the palette, you can use the diagram context menu to create processes. Although some of the choices on the DFD and FD context menus differ, both menus contain the Create Process choice.

▼ To create a process using the context menu:

1 Click button 2 on the background of the diagram that you are working with, either the DFD or the FD diagram.

The system displays the context menu for the entire diagram.

2 Select Create Primitive Process.

The system clears the context menu and displays the Create Processes pop-up window.

3 Use the Create Processes pop-up window as described for using the palette.

The system places the processes in the diagram as described for using the palette.

Seeing Results in Related Diagrams and Forms

The processes you create in the model can be seen in the DFD, the FD diagram, and the Process Model form. After you create a process, you can use the Process form to enter and edit detailed information about the process. The form is available for retrieval and editing as long as the process exists in the model.

When you create a process in the DFD, it is a primitive process. The process remains primitive until you explode it in the DFD or add a subprocess to it in the FD diagram. (Refer to the sections in this chapter on Adding a Subprocess Using the FD Diagram and Exploding a Process.)

You can see a newly created primitive process in the PDL diagram. The process appears in the PDL diagram as the process description node to which the process logic statements will be added, either by you or by the system, as you add information flows into and out of the process. You specify the logic of a process using the process description language, which can be written textually or graphically. Refer to Chapter 9, Introduction to PDL.

Undoing Process Creation

You can undo the results of creating a process as described in Chapter 4, Undoing and Redoing Operations. If you have created several processes at once, selection of Undo undoes the creation of all the processes. The process model returns to the state it was in before the creation of the processes. All diagrams and forms associated with the process model, displayed or not displayed, are updated.

Alternatively, to delete one or more processes, you can select the process or group of processes and then select Clear from the Edit pull-down menu.

After Creating a Process

Once you have created a process, you can

- Select a palette symbol to create another process model object.
- Display the Process form to enter detailed information about a process. Refer to Adding Information About a Process in this chapter.
- Display the PDL diagram for a selected primitive process to specify the logic of the process. Refer to Chapter 9, Introduction to PDL for more information.
- Display the companion diagram (DFD or FD, whichever diagram you did not use to create the process) to view and edit the process.
- Select an editing operation from the action bar or the process context menu. Refer to Editing a Process in this chapter.

Creating and Placing a Subprocess Using the FD Diagram

Sometimes you will need to define a complex process more specifically by breaking it down into more manageable units for specification. The smaller components of a process are called *subprocesses*, or *child processes*. A process that has been partitioned into subprocesses is the *top-level*, or *parent process*. When you partition a process into subprocesses you begin to build a process hierarchy, which may comprise several levels. If necessary, a subprocess can be partitioned further into lower-level subprocesses. A process that has no subprocesses is a *primitive process*. Only a primitive process can have information flows attached to it. Higher-level processes cannot have information flows attached to them.

Figure 7-4 shows a process hierarchy in the FD diagram. Figure 7-7 shows a process hierarchy in the DFD. Each primitive process in a hierarchy has its logic specified in the process description language, which you can display in the PDL diagram.

When you create a process in the DFD from the palette or context menu, you create a primitive process. You can then explode the process or make a new process boundary to create subprocesses. (Refer to the sections in this chapter on Exploding a Process and Making a New Process Boundary.)

When you create a process in the FD diagram from the palette or context menu, you create a top-level process, a subprocess, or a primitive process, depending on where you place it in the diagram.

*Tip:* In the FD diagram you work only with processes. There are no information flows, information stores, or source/destination objects in the FD diagram. For this reason, it is a good idea to begin defining process hierarchy in the FD diagram before you create processes in the DFD that may have information flows attached. This way you can avoid mistakenly adding subprocesses to a process that has information flows attached in the DFD, that is, a primitive process.

The procedure below uses an example of six processes in three levels:

- Reorder Stock
  - Determine Products to Reorder
  - Select Suppliers
    - Check Supplier Prices
    - Check Supplier Delivery Times
  - Confirm Purchase Orders All the processes in this example are being created initially in the FD diagram; they have no information flows attached to them. Later, in the DFD, only the primitive processes in this hierarchy will be the sources or targets of information flows.

▼ To create a hierarchy of processes:

1 Display the FD diagram of your process model.

2 Add the processes using the Create Processes pop-up window as described in the section Creating and Placing Processes. For example, enter the names of these processes: Reorder Stock, Determine Products to Reorder, Select Suppliers, Check Supplier Prices, Check Supplier Delivery Times, Confirm Purchase Orders.

The message area prompts you to place Process: Reorder Stock.

3 Select the subprocess pin extending from the process description node.

The system places Reorder Stock on the main lin. The message area prompts you to place Process: Determine Products to Reorder.

4 Select the subprocess pin of Reorder Stock.

The system places Determine Products to Reorder on the branch of Reorder Stock. The message area prompts you to place Process: Select Suppliers.

5 Select the root pin on the Reorder Stock branch.

The system places Select Suppliers on the branch, under Determine Products to Reorder. The message area prompts you to place Process: Check Supplier Prices.

6 Select the subprocess pin of Select Suppliers.

The system places Check Supplier Prices on the Select Suppliers branch. The message area prompts you to place Process: Check Supplier Delivery Times.

7 Select the root pin of the Select Suppliers branch.

The system places Check Supplier Delivery Times on the branch, directly under Check Supplier Prices. The message area prompts you to place Process: Confirm Purchase Orders.

8 Select the root pin on the Reorder Stock branch.

The system places Confirm Purchase Orders on the branch. The message area indicates that new process creation is complete.

Figure 7-4 shows the hierarchy of processes created in the procedure above. The functional decomposition has three levels. Reorder Stock, the top-level process, has three subprocesses: Determine Products to Reorder, Select Best Suppliers, and Confirm Purchase Orders. The subprocess Select Beat Suppliers has two subprocesses.

Altogether, this hierarchy has four primitive processes: Determine Products to Reorder, Check Supplier Prices, Check Supplier Delivery Times, and Confirm Purchase Orders. You can create information flows between these processes in the DFD. You can display the PDL Diagrams for these processes.

Figure 7-4 FD Diagram Showing Subprocesses

See illustration at chapter end.

Seeing Results in Related Diagrams and Forms

The processes, subprocesses, and primitive processes you create in the FD diagram can be seen in the DFD and the Process Model form. Primitive processes can be seen in their PDL Diagrams. Every process created has its own form. The relationship of a process to its higher-level and lower-level processes is indicated in the Process Hierarchy fields of its form.

Undoing Process/Subprocess Creation

Refer to Adding Processes to a Model, Undoing Process Creation in this chapter.

Adding Information About a Process

Once you have created a process, you can display the Process form to enter detailed information about the process. The form can be retrieved for data entry, editing, or reference as long as the process exists in the model.

From the Process form you can also navigate to forms for other process model objects such as information flows, events, and other processes. Fields that allow you to navigate to other forms are marked with an asterisk (*). Simply double-click button 1 on the field with the asterisk to display the form for the related object.

You can display a form for a process in one of three ways:

- By double-clicking on a process in a DFD or FD diagram:
  - Double-click button 1 on the process.

The system displays the Process form for the selected process (Figure 7-5).

The Process form is not available from the PDL diagram.
- By selecting Form from the Form pull-down menu: (Not Available in the Beta Release)
- By selecting Find from the Edit pull-down menu: (Not Available in the Beta Release)

For more information about finding Analyst model objects, refer to Chapter 4, Using Find to Locate Analyst Model Objects.

For descriptions of each field of the Process form, refer to Chapter 11, Process Model Forms. For more information about using forms, refer to Chapter 3, Working With Form and Pop-Up Windows.

Figure 7-5 The Process Form

| See illustration at chapter end. |
|---|

Seeing Results in Related Diagrams and Forms

When you add or edit information about the process in the Process form, the process model diagrams and forms change depending on the type of information you are adding or editing. For example, if you delete the process's trigger event, the Event form is no longer available. (The Event form is not available in the Beta Release.)

Undoing Information Entered into the Form

The system accepts a change to the process each time you leave a field of the form. You can undo any change accepted by the system. To undo all changes to a form you must undo each change made to the form. Related diagrams and forms, displayed or not displayed, are updated accordingly.

Editing a Process

Once you have entered a process into the diagram and further defined it in the Process form, you can change the process by editing the information in the form or by selecting editing operations from the action bar or the process context menu. If the process is a primitive process, you can display the PDL diagram and modify the process logic that is defined in the PDL. For more information on PDL, refer to Chapter 9, Introduction to PDL.

This section provides information about the editing operations that are available from the action bar and process context menu. For information about the Process form, refer to the section Adding Information About a Process in this chapter.

When you edit a process by the diagram, you select the process and then select an editing operation from the action bar or from the process's context menu. These operations include

- Exploding a process*
- Making a new process boundary*
- Hiding or showing subprocesses
- Merging processes*
- Repositioning processes using the FD Diagram
- Renumbering processes
- Automatic repositioning of renumbered processes (Not Available in the Beta Release)
- Cutting a process to the clipboard (Not Available in the Beta Release)
- Pasting a process from the clipboard (Not Available in the Beta Release)
- Copying a process (Not Available in the Beta Release)
- Deleting a process
- Editing a primitive process using PDL The operations marked with an asterisk are transformations. Transformations combine multistep editing operations and make them accessible from a single menu choice, Transform.

Some editing operations can be selected from either the DFD or the FD diagram; others can be selected from only one of the diagrams. However, all changes are made to the process in the process model and are reflected immediately in all diagrams and forms regardless of whether they are displayed.

You can undo an editing operation and the process returns to its pre-edited state.

The following sections give the procedures for performing editing operations on processes. The operations are presented in the order shown previously.

Exploding a Process

Once you have created a process, you might want to partition it into lower-level processes or subprocesses. Dividing a high-level process into two or more subprocesses is called explosion. You can explode a process using the DFD. The process that you explode must have at least one information flow attached to it, either incoming or outgoing. For information about creating information flows, refer to the section Creating an Information Flow in this chapter.

When you explode a process, the number of subprocesses generated and named by the system for the exploded process equals the number of flows coming into and out of the process. The system names the subprocesses by adding the verbs "handle" and "generate" before the name of the respective information flow. A subprocess related to an incoming flow has the word "handle" in its name. A subprocess related to an outgoing flow has the word "generate" in its name. If you explode a subprocess, the names of the next level of subprocesses add a numeric suffix to the name of their superior process. The system also numbers the subprocesses hierarchically to indicate their level under the high-level process. Here is an example:

- A process model contains Process 5, Analyze Shipments (Figure 7-6). The process has three information flows coming into it: Past Deliveries, Outstanding Purchase Orders, and Shipment Information. The process also has two information flows going out of it: Accepted Quantities and Increments to Inventory. You realize that this process can be more accurately defined if you explode it into several lower-level processes.
- When you explode the Analyze Shipments process, the system displays five subprocesses with these names and numbers (Figure 7-7):

5.1 Handle Past Deliveries 5.2 Handle Outstanding Purchase Orders 5.3 Handle Shipment Information 5.4 Generate Accepted Quantities 5.5 Generate Increments to Inventory

Figure 7-6 Sample DFD With Process to Be Exploded (Process 5, Analyze Shipments)

| |
|---|
| See illustration at chapter end. |

Figure 7-7 Explosion of Process 5, Analyze Shipments

| |
|---|
| See illustration at chapter end. |

▼ To explode a process into subprocesses:

1. Display the DFD.
2. Select the process that you want to explode. Make sure that the process has at least one incoming or outgoing information flow.
3. Select Transform from either:
   - the selected process's context menu
   - the Tasks pull-down menu The system displays the Choose a Transformation pop-up window (Figure 7-8).
4. Select Explode a Process from the list of transformations:
   a. Select the radio button for Explode a Process.
   b. Click on OK.

The system explodes the selected process, displaying the resulting subprocesses (Figure 7-7).

When the high-level process is exploded and the subprocesses are displayed, a minus sign (–) in the process banner of the high-level process indicates that all subprocesses are displayed.

When the DFD is refreshed or subsequently displayed after being closed, processes that have been exploded have a plus sign (+) in the process banner to indicate the existence of subprocesses not currently shown. For more information about hiding and showing subprocesses, refer to the section Hiding or Showing Subprocesses in this chapter.

Figure 7-8 The Choose a Transformation Pop-Up Window

| |
|---|
| See illustration at chapter end. |

Seeing Results in Related Diagrams and Forms

After you have exploded a process in the DFD, you can see the subprocesses in the process hierarchy of the FD diagram. If a subprocess is a primitive process, you can select it in the DFD or the FD diagram and display the PDL diagram for it. You can access PDL only from a primitive process, that is, a subprocess that has no lower-level subprocesses. PDL is not accessible from processes that have subprocesses.

You can also see the subprocesses created by the process explosion listed in the Process form for the high-level process. Each new subprocess has a form.

Undoing Process Explosion

You can undo a process explosion as described in the chapter Chapter 4, Undoing and Redoing Operations. The process model returns to the state it was in before you exploded the process. All diagrams and forms associated with the process model, displayed or not displayed, are updated.

Making a New Process Boundary

In the DFD you can create a higher-level process for a process or group of processes by selecting the transformation Make a New Process Boundary. The system prompts you to name the new high-level process and then draws the new process around the selected processes. The original processes become subprocesses of the new process. Making a new process boundary is another way of changing the hierarchy of processes in the process model. Here is an example:

- A process model contains three processes: Receive Orders, Update Accounts Receivable, and Prepare Invoices (Figure 7-9A). You want to group these processes under a high-level process, Process Orders.

- When you make the new process boundary for the three selected processes, the system draws the new process, Process Orders, around the three processes. Process Orders is now the top-level process, with three subprocesses (Figure 7-9B).

▼ To make a new process boundary:

1 Display the DFD.

2 Select the process or processes for which you want to create a higher-level process.

3 Select Transform from the Tasks pull-down menu.

The system displays the Choose a Transformation pop-up window (Figure 7-8).

4 Select Make a New Boundary from the list of transformations:

a Select the radio button for Make New Process Boundary.

b Click on OK.

The system displays the New Parent Process Name pop-up window.

5 Enter the name of the new process in the entry field and click on OK.

The system draws the new process around the selected processes to create a high-level process with subprocesses (refer to Figure 7-9).

You might want to renumber the processes after making a new process boundary.

Figure 7-9 Processes With New Boundary

Figure 7-9A DFD With Three Processes Selected: Receive Orders, Update Accounts Receivable, and Prepare Invoices See illustration at chapter end.

Figure 7-9B DFD With New High-Level Process (Process Orders)

See illustration at chapter end.

Seeing Results in Related Diagrams and Forms

After you make a new boundary for a process or group of processes, you can see the new hierarchy of the new process and its subprocesses in the FD diagram. Each new high-level process has a form. This form lists the subprocesses in the Process Hierarchy fields. Likewise, the forms for each subprocess list the new process as the top-level process. Information flows in and out of the subprocesses also flow in and out of the high-level process.

Undoing New Process Boundary

You can undo the new process boundary as described in Chapter 4, Undoing and Redoing Operations. The process model returns to the state it was in before you made the new process boundary. All diagrams and forms associated with the process model, displayed or not displayed, are updated.

Hiding or Showing Subprocesses

After you have exploded a process, you can hide or show its subprocesses in the DFD and the FD diagram. You can also hide or show all the subprocesses for every exploded process in an entire DFD. This feature is not available from the FD diagram.

Hiding and showing subprocesses is a display feature only. When you hide or show subprocesses, you do not change the model; the subprocesses exist in the model even though they may be hidden in the diagram. This feature is a toggle operation that allows you to change the state of a diagram from hiding subprocesses to showing them with the click of a mouse button.

▼ To hide or show the subprocesses of a process:

1 Display the DFD or FD diagram.

In the DFD, the banner of a process with subprocesses contains a minus sign (-) or a plus sign (+). A minus sign indicates that the subprocesses of the process are shown (refer to Figure 7-7). A plus sign indicates that the subprocesses are hidden.

In the FD diagram, the subprocess pin of a process is normally hollow (refer to Figure 7-4). If the process has subprocesses and the subprocesses are hidden, a solid pin is displayed.

2 To hide or show the subprocesses of a process in either the DFD or the FD diagram:

- In the DFD, click button 1 on the minus sign or the plus sign of the process with subprocesses.
- In the FD diagram, double-click button 1 on the pin of the process with subprocesses.

The system refreshes the diagram, showing or hiding the subprocesses for the selected process.

▼ To hide or show the subprocesses for all exploded processes in an entire DFD:

1 Display the DFD.

This operation is not available from the FD diagram.

2 Select Show All Processes Exploded from the DFD context menu.

The system displays all the subprocesses for all processes that have been exploded in the diagram.

Seeing Results in Related Diagrams and Forms

Hiding or showing subprocesses in process model diagrams is a display feature only. The subprocesses still exist in the model whether or not they are shown. Hiding and showing subprocesses in one diagram does not affect the other diagrams or the forms.

Merging Processes

From the DFD you can merge two processes in a model if both the source process and the target process are primitive processes or both are nonprimitive processes. The system checks to ensure that you have selected compatible processes to merge.

When you merge two processes, the system creates a new process. The two original processes are deleted. You name the new process that results from the merge in the New Target Name pop-up window. The name of the target process is the default.

The process resulting from the merge inherits the information flows from both the source process and target process. Information flows between source and target processes are deleted when the two processes are merged.

The process resulting from the merge is placed in the diagram automatically.

Processes that have been filtered out of a model cannot be merged. (For more information about filters, refer to Chapter 4, Using Filters.)

▼ To merge two processes:

1 Display the DFD.

2 First select the source process, then select the target process. (Remember to hold down the Shift key while you click on the processes to select both processes.)

3 Select Transform from the Tasks pull-down menu.

The system displays the Choose a Transformation pop-up window (refer to Figure 7-8).

4 Select Merge Two Objects from the list of transformations:

a Select the Merge Two Objects radio button.

b Click on OK.

The system displays the New Target Name pop-up window. The entry field of the window displays the target process name as the default for the name of the new process resulting from the merge.

5 Press OK to accept the process name. Or enter a new name for the process resulting from the merge, then press OK.

The system merges the two processes. Any information flows between the two processes are deleted. Figure 7-10 shows an example of two processes that are merged.

Figure 7-10 Two Processes Merged

Figure 7-10A Processes Before Merge

| |
|---|
| See illustration at chapter end. |

Figure 7-10B Process After Merge

| |
|---|
| See illustration at chapter end. |

Seeing Results in Related Diagrams and Forms

When you merge two processes, the new process becomes part of the model. All appropriate diagrams and forms are updated to reflect the existence of the new process. You can see the new process in the DFD, the FD diagram, and, for merged primitive processes, in the PDL diagram. The new process has a form.

If the merged processes are nonprimitive processes, the new nonprimitive process is a concatenation of the source process's subprocesses and the target process's subprocesses.

If the merged processes are primitive processes, the PDL for the source process is concatenated to the PDL for the target to generate the PDL for the new process. If there is PDL for only one of the primitive processes that is merged, the resultant PDL contains the PDL that exists for the one process.

If the merged processes had information flows attached to them, any PDL statements that referenced the flows are updated to reflect the new process name that you specified when the processes were merged.

The Process form for the new process shows the combined fields of the source and target processes. The values of the target process are preferred when the source and target fields are the same. The Process Model form lists the new process in place of the original two processes.

Undoing Process Merge

You can undo the merge of two processes as described in Chapter 4, Undoing and Redoing Operations. The process model returns to the state it was in before you performed the merge; that is, the model contains the source and target processes in their pre-merge states. All diagrams and forms associated with the process model, displayed or not displayed, are updated.

Repositioning a Process Using the FD Diagram

The FD diagram shows the hierarchy of processes, subprocesses, and primitive processes in the model. This leveled view of processes lets you see more clearly the relationships of the processes within a level and from level to level.

From the FD diagram you can change the position of a process within the same level. That is, the process being moved must retain its relationship to the higher-level process. Although moving a process within a level does not really change the hierarchy, it does imply a change in process sequence that may affect system implementation.

You can reposition a process in the FD diagram by selecting and dragging the process to a new location in the diagram.

▼ To reposition a process:

1 Display the FD diagram.

2 Click and hold button 1 on the pin of the process that you want to move.

The system highlights the pin and the process node.

3 Drag the mouse, moving the process along the main line or branch.

4 When the ghost image of the process is at the target position, release the mouse button.

The process replaces the ghost image at the new position in the diagram.

Seeing Results in Related Diagrams and Forms

Repositioning a process within a level has no effect in any other diagrams or forms.

Undoing Reposition

You can undo the repositioning of a process as described in Chapter 4, Undoing and Redoing Operations. The FD diagram returns to the state it was in before you repositioned the process.

Renumbering Processes

You can renumber the processes of a model from either the DFD or the FD diagram. You may want to renumber the processes after deleting, copying, repositioning, merging processes, or making a new process boundary.

▼ To renumber processes:

1 Display the DFD or FD diagram.

2 Select Renumber from either of two menus:

- the Diagram pull-down menu
- the diagram context menu

The system renumbers all the processes in the model including all subprocesses and primitive processes using the hierarchical numbering scheme (1, 1.1, 1.2, . . . 4, 4.1, 4.2, etc.). Processes are numbered from top to bottom and from left to right.

▼ To renumber the subprocesses of a process in the FD diagram:

1 Display the FD diagram.
2 Select a process with subprocesses to be renumbered.
3 Select Renumber Children from the process's context menu.

The system renumbers the subprocesses of the selected high-level process.

Once you have renumbered the processes in the model, numbers do not change until you select Renumber again. Changing the diagram layout does not affect process numbers.

Seeing Results in Related Diagrams and Forms

You can see the renumbered processes from any process model diagram: DFD, FD, or PDL. Forms that refer to processes by number show the new process numbers.

Undoing Process Renumbering

You can undo the renumbering of processes as described in Chapter 4, Undoing and Redoing Operations. The processes revert to the numbers they had before you selected Renumber from the menu. The process model returns to the state it was in before you performed the renumbering. All diagrams and forms associated with the process model, displayed or not displayed, are updated.

Auto Repositioning Renumbered Processes (Not Available in the Beta Release)

(Post-Beta feature planned for FD diagram. After renumbering processes in DFD user can select auto reposition in FD to have system reposition processes according to new numbering scheme initiated in DFD.)

Cutting a Process to the Clipboard (Not Available in the Beta Release)

Pasting a Process from the Clipboard (Not Available in the Beta Release)

Copying a Process (Not Available in the Beta Release)

You can copy a process by using the Edit pull-down menu as described in Chapter 4, Editing Analyst Model Objects.

Seeing Results in Related Diagrams and Forms

When you copy a process in a model, all the diagrams reflect the copied process and the system creates a form for the copied process.

Undoing Process Copy

You can undo the process copy as described in Chapter 4, Undoing and Redoing Operations. The process model returns to the state it was in before you performed the copy. All diagrams and forms associated with the process model, displayed or not displayed, are updated.

Deleting a Process

You can delete a process by using the Edit pull-down menu as described in Chapter 4, Editing Analyst Model Objects.

If the process you delete has subprocesses, the subprocesses are not deleted and they assume the level of the deleted process. For example, in this process hierarchy—

- Reorder Stock (Level 1)
  - Determine Products to Reorder (Level 2)
  - Select Suppliers (Level 2)
    Check Supplier Prices (Level 3)
    Check Supplier Delivery Times (Level 3)
  - Confirm Purchase Orders (Level 2)

—if you delete the process Select Suppliers, its subprocesses—Check Supplier Prices and Check Supplier Delivery Times—become Level 2 processes.

After deleting a process, you may want to renumber the processes in the DFD or the FD diagram. Refer to Renumbering Processes in this chapter.

Seeing Results in Related Diagrams and Forms

The process is deleted from the DFD, the FD diagram, and the PDL diagram if the process is a primitive process. If the deleted process had information flows attached to it, the flows are deleted also. If the deleted process had subprocesses, the subprocesses assume the deleted process's position in the hierarchy. The Process form and any reference to the process on the Process Model form are also deleted.

Undoing Process Deletion

You can undo the deletion of a process as described in Chapter 4, Undoing and Redoing Operations. The process model returns to the state it was in before you performed the deletion. All diagrams and forms associated with the process model, displayed or not displayed, are updated.

Editing a Primitive Process Using PDL

You can edit a primitive process using the process description language (PDL). PDL is a structured language that you use to describe the logic of the primitive processes of the model. PDL is graphically represented as a tree-like structure in the PDL diagram.

You can display the PDL diagram for a selected primitive process from either the DFD or the FD diagram using one of two methods:

- Select PDL from the primitive process's context menu.
- Select a primitive process, then select PDL from the New Diagram menu that cascades from the Diagram pull-down menu.

For more information about PDL, refer to Chapter 9, Introduction to PDL.

Creating an Information Store

You create an information store by adding it to the process model using the DFD, the Process Model form, or by entering a reference to a new information store in a logical access statement in PDL. (Information stores are not represented in the FD diagram, which only shows processes.) You can then use the Information Store form to supply detailed information about the store.

An information store must have one (and only one) information store structure. The information store structure contains entities and attributes, which may or may not be defined in the data model. An entity can exist in one or many information stores. The contents of the information store structure (entities and attributes) link the process model's DFD, the data model's E-R Diagram, and the associated process model and data model forms.

Information stores are referenced in the PDL for a primitive process when there is an information flow from a process to a store that is described by a logical access statement (CREATE, RETRIEVE, UPDATE, DELETE) with an INFO_STORE clause.

You can use the Information Store form to supply detailed information about the store. For example, you define the information store structure and the contents of the structure in the Information Store form. For more information about forms, refer to Chapter 3, Working with Form and Pop-Up Windows, and Chapter 11, Process Model Forms.

Creating and Placing an Information Store

The procedures given in the following paragraphs assume that you have opened an Analyst model that has a process model and have displayed the DFD.

You can create information stores using the information store symbol on the palette, the Create Information Store choice on the DFD context menu, or the Information Stores field of the Process Model form.

Using the Palette

Using the palette, you can create and place a number of information stores in the model.

▼ To create information stores using the palette:

1 Select the information store symbol in the palette.

The system highlights the palette symbol, displays a message in the message area, and displays the Create Information Stores pop-up window (Figure 7-11).

While you are in the create information store mode, you cannot perform any other type of operation.

To exit from the pop-up window (and the create information stores mode) without creating any stores, click on Cancel.

2 In the Create Information Stores pop-up window, enter one or more information store names into the Information Store field (Figure 7-11).

3 When you are done adding information store names, click on OK.

The system places the information stores in the diagram according to the placement method you specified in the Profile Form. (Refer to Chapter 11, Profile Forms.)

Figure 7-12 shows the information stores placed in the DFD.

Figure 7-11 The Create Information Stores Pop-Up Window

See illustration at chapter end.

Figure 7-12 DFD Showing Processes and Information Stores

See illustration at chapter end.

Using the Diagram Context Menu

As an alternative to using the palette, you can use the Create Information Store choice on the DFD context menu to create information stores.

▼ To create information stores using the context menu:

1 Click button 2 on the background of the DFD.

The system displays the context menu for the entire DFD.

2 Select Create Information Store.

The system clears the context menu and displays the Create Information Stores pop-up window.

3 Use the Create Information Stores pop-up window as described for using the palette.

The system places the information stores in the diagram as described for using the palette.

Seeing Results in Related Diagrams and Forms

The information stores you create in the model can be seen in the DFD and the Process Model form. After you create an information store, you can use the Information Store form to enter and edit detailed information about the information store. The form is available for retrieval and editing as long as the information store exists in the model.

Information stores can also be seen in the INFO_STORE clauses of logical access statements (RETRIEVE, CREATE, UPDATE, and DELETE) in PDL. You enter and edit process logic in the PDL diagram. Refer to Chapter 9, Introduction to PDL.

Undoing Information Store Creation

You can undo the results of creating an information store as described in Chapter 4, Undoing and Redoing Operations. If you have created several information stores at once, selection of Undo undoes the creation of all the stores. The process model returns to the state it was in before the creation of the information stores. All diagrams and forms associated with the process model, displayed or not displayed, are updated.

Alternatively, to delete one or more information stores, you can select the store or group of stores and then select Clear from the Edit pull-down menu.

After Creating an Information Store

Once you have created an information store, you can

- Select a palette symbol to create another process model object.
- Display the Information Store form to enter detailed information about a store, including the contents of the information store. Refer to Adding Information About an Information Store in this chapter.
- Display the Entity-Relationship Diagram, the Entity form, or the Attribute form to see the entities and attributes that you may have defined as contents of the information store in the Information Store form.
- Select an editing operation from the action bar or the information store context menu. Refer to Editing an Information Store in this chapter.

Adding Information About an Information Store

Once you have created an information store, you can display the Information Store form to enter detailed information about the store (Figure 7-13). The form can be retrieved for data entry, editing, or reference as long as the information store exists in the model.

Within the Information Store form, you define the contents of the information store structure and the entities and attributes contained in the structure. Enter the name of the attribute and its owner entity in the Contents Object field of the Store Structure Contents box using the format ENTITY.ATTRIBUTE (see Figure 7-13C). The entities and attributes you name as contents of the store may or may not be defined in the data model.

*Note:* In the Beta Release, free attributes are not recognized. Also in this release, entities alone cannot be specified for store contents; entities must be qualified by attributes in the format ENTITY.ATTRIBUTE or ENTITY.*.

If, when you define the contents of the information store, you name entities and attributes that do not exist in the data model, you have created these objects and you can see them in the data model when you next display the E-R Diagram or display any associated forms. For more information about creating entities, refer to Chapter 5, Building a Data Model.

From the Information Store form you can also navigate to forms for other process model objects such as information flows. Fields that allow you to navigate to other forms are marked with an asterisk (*). Simply double-click button 1 on the field with the asterisk to display the form for the related object.

There are three ways to display the form for the selected information store:

- By double-clicking button 1 on the store in the DFD
- By selecting Form from the Form pull-down menu (Not Available in the Beta Release)
- By selecting Find from the Edit pull-down menu The procedures for displaying the Information Store form are the same ones described in the Adding Information About a Process section of this chapter.

For descriptions of each field of the Information Store form, refer to Chapter 11, Process Model Forms. For more information about using forms, refer to Chapter 3, Working with Form and Pop-Up Windows.

Figure 7-13 The Information Store Form

See illustration at chapter end.

Seeing Results in Related Diagrams and Forms

When you add or edit information about the information store in the Information Store form, the DFD, the PDL diagram, and the E-R Diagram change accordingly, depending on the type of information you are adding or editing. Forms in the data model and process model also change.

If you define the contents of the information store as including new entities and attributes in the data model, you can see these entities and attributes in the diagrams and forms of the data model: the Entity-Relationship Diagram (shows entities only), the Data Model form, the Entity form, and the Attribute form.

Undoing Information Entered into the Form

The system accepts a change to the information store each time you leave a field of the form. You can undo any change accepted by the system. To undo all changes to a form you must individually undo each change made to the form. Related diagrams and forms, displayed or not displayed, are updated accordingly.

Editing an Information Store

Once you have entered an information store into the DFD and further defined it in the Information Store form, you can change the store by editing the information in the form or by selecting editing operations from the action bar or the information store context menu.

This section provides information about the editing operations that are available from the action bar or the information store context menu. For more information about the Information Store form, refer to the section Adding Information About an Information Store in this chapter.

When you edit an information store by the diagram, you select the information store and then select an editing operation from the action bar or from the information store's context menu. These operations include

- Merging information stores*
- Cutting an information store to the clipboard (Not Available in the Beta Release)
- Pasting an information store from the clipboard (Not Available in the Beta Release)
- Copying an information store (Not Available in the Beta Release)
- Deleting an information store
- Editing an information store using PDL The operations marked with an asterisk are transformations. Transformations combine multistep editing operations and make them accessible from a single menu choice, Transform.

All these editing operations are available from the DFD. All changes are made to the information store in the process model and are reflected immediately in all appropriate diagrams and forms regardless of whether they are displayed.

You can undo an editing operation and the information store returns to its pre-edited state.

The following sections give the procedures for performing editing operations on information stores. The operations are presented in the order shown previously.

Merging Information Stores

From the DFD you can merge two information stores in a model as long as they do not contain any entity that is part of a many-to-many relationship.

The system checks to ensure that the information stores you have selected to merge meet this criterion. (This validation is not available in the Beta Release.)

When you merge two information stores, the system creates a new information store. The two original information stores are deleted. You name the new information store that results from the merge in the New Target Name pop-up window. The name of the target store is the default.

The new information store inherits the information flows from both of the original stores.

Information stores that have been filtered out of a model cannot be merged.

▼ To merge two information stores:

1 Display the DFD.

2 First select the source information store, then select the target information store. (Remember to hold down the Shift key while you click on the stores to select both stores.)

3 Select Transform from the Tasks pull-down menu.

The system displays the Choose a Transformation pop-up window (refer to Figure 7-8).

4 Select Merge Two Objects from the list of transformations:

a Select the Merge Two Objects radio button.

b Click on OK.

The system displays the New Target Name pop-up window. The entry field of the window displays the target store name as the default for the name of the new information store resulting from the merge.

5 Press OK to accept the information store name. Or, enter a new name for the information store resulting from the merge, then press OK.

The system merges the two data stores. Figure 7-14 shows an example of two information stores that are merged.

Figure 7-14 Two Information Stores Merged

Figure 7-14A Information Stores Before Merge

See illustration at chapter end.

Figure 7-14B Information Store After Merge

See illustration at chapter end.

Figure 7-14C Contents of Merged Information Store

| |
|---|
| See illustration at chapter end. |

Seeing Results in Related Diagrams and Forms

When you merge two information stores, the new information store becomes part of the model. All appropriate diagrams and forms are updated to reflect the existence of the new information store.

If the merged information stores had information flows attached to them, any PDL statements that referenced the stores are updated to reflect the new store name that you specified when the stores were merged.

The Information Store form for the new information store shows the combined fields of the source and target stores. The values of the target information store are chosen when the source and target fields are the same.

The Process Model form lists the new information store in place of the original two stores.

Seeing Results in Information Store Contents

An information store contains owned-attributes enclosed in one information store structure. Each information store has one and only one structure for its contents. When two information stores are merged, the structure in the resulting new information store contains the attributes that were defined in the structures of the original source and target information stores. (In the Beta Release, free attributes are not recognized.)

The contents of the information stores are merged according to these rules:

- If there are any attributes that do not match, the target information store inherits those attributes into its structure.
- If there are matching attributes, the system uses the target information store's values for those attributes.

Figure 7-14C shows how the contents of two information stores merge.

Undoing Information Store Merge

You can undo the merge of two information stores as described in Chapter 4, Undoing and Redoing Operations. The process model returns to the state it was in before you performed the merge; that is, the model contains the source and target information stores in their pre-merge states. All diagrams and forms associated with the process model, displayed or not displayed, are updated.

Cutting an Information Store to the Clipboard (Not Available in the Beta Release)

Pasting an Information Store from the Clipboard (Not Available in the Beta Release)

Copying an Information Store (Not Available in the Beta Release)

You can copy an information store by using the Edit pull-down menu as described in Chapter 4, Editing Analyst Model Objects.

Seeing Results in Related Diagrams and Forms

When you copy an information store in a model, all the applicable diagrams reflect the copied information store and the system creates a form for the copied store.

Undoing Information Store Copy

You can undo the information store copy as described in Chapter 4, Undoing and Redoing Operations. The process model returns to the state it was in before you copied the object. All diagrams and forms associated with the process model, displayed or not displayed, are updated.

Deleting an Information Store

You can delete an information store by using the Edit pull-down menu as described in Chapter 4, Editing Analyst Model Objects.

Seeing Results in Related Diagrams and Forms

The information store is deleted from the DFD. If the information store had information flows coming into it from a primitive process, any logical access statements in the PDL diagram that referred to the store are also deleted. Any flows attached to the deleted store are deleted. The Information Store form and any reference to the information store on the Process Model form are deleted.

Undoing Information Store Deletion

You can undo the deletion of an information store as described in Chapter 4, Undoing and Redoing Operations. The process model returns to the state it was in before you performed the deletion. All diagrams and forms associated with the process model, displayed or not displayed, are updated.

Editing an Information Store Using PDL

For more information about PDL, refer to Chapter 9, Introduction to PDL.

Creating a Source/Destination

You create a source/destination by adding it to the process model using the DFD or the Process Model form. (Source/destination objects are not represented in the FD diagram, which only shows processes.) You can then use the Source/Destination form to supply detailed information about the source/destination.

For more information about forms, refer to Chapter 3, Working with Form and Pop-Up Windows, and Chapter 11, Process Model Forms.

Creating and Placing a Source/Destination

The procedures given in the following paragraphs assume that you have opened an Analyst model that has a process model and have displayed the DFD.

You can create source/destination objects using the source/destination symbol on the palette, the Create Source/Destination choice on the DFD context menu, or the Source/Destination field of the Process Model form.

Using the Palette

Using the palette, you can create and place a number of source/destination objects in the model.

▼ To create source/destination objects using the palette:

1 Select the source/destination symbol in the palette.

The system highlights the palette symbol, displays a message in the message area, and displays the Create Source/Destination pop-up window (Figure 7-15).

While you are in the create source/destination mode, you cannot perform any other type of operation.

To exit from the pop-up window (and the create source/destination mode) without creating any objects, click on Cancel.

2 In the Create Source/Destination pop-up window, enter one or more source/destination names in the Source/Destination field.

3 When you are done adding source/destination names, click on OK.

The system places the source/destination objects in the diagram according to the placement method you specified in the Profile form. (Refer to Chapter 11, Profile Forms.

Figure 7-16 shows the source/destination objects in the DFD.

Figure 7-15 The Create Source/Destination Pop-Up Window

| See illustration at chapter end. |
|---|

Figure 7-16 DFD Showing Processes, Information Stores, and Source/Destinations

| See illustration at chapter end. |
|---|

Using the Diagram Context Menu

As an alternative to using the palette, you can use the Create Sources/Destinations choice on the DFD context menu to create source/destination objects.

▼ To create source/destination objects using the context menu:

1. Click button 2 on the background of the DFD.

The system displays the context menu for the entire DFD.

2. Select Create Source/Destination.

The system clears the context menu and displays the Create Source/Destination pop-up window.

3. Use the Create Source/Destination pop-up window as described for using the palette.

The system places the source/destination objects in the diagram as described for using the palette.

Seeing Results in Related Diagrams and Forms

The source/destination objects you create in the model can be seen in the DFD and the Process Model form. After you create a source/destination, you can use the Source/Destination form to enter and edit detailed information about the source/destination. The form is available for retrieval and editing as long as the source/destination exists in the model.

If a source/destination is a system source/destination, then it can be defined as another process model in the Analyst model. As such, it has its own process model diagrams (DFD, FD, PDL) and forms.

Undoing Source/Destination Creation

You can undo the results of creating a source/destination as described in Chapter 4, Undoing and Redoing Operations. If you have created several source/destination objects at once, selection of Undo undoes the creation of all the source/destination objects. The process model returns to the state it was in before the creation of the source/destination objects. All diagrams and forms associated with the process model, displayed or not displayed, are updated.

Alternatively, to delete one or more source/destination objects, you can select the object or group of objects and then select Clear from the Edit pull-down menu.

After Creating a Source/Destination

Once you have created a source/destination, you can

- Select a palette symbol to create another process model object.
- Display the Source/Destination form to enter detailed information about a source/destination. Refer to Adding Information About a Source/Destination in this chapter.
- Select an editing operation from the action bar or the source/destination context menu. Refer to Editing a Source/Destination in this chapter.

Adding Information About a Source/Destination

Once you have created a source/destination, you can display the Source/Destination form to enter detailed information about the source/destination (Figure 7-17). The form can be retrieved for data entry, editing, or reference as long as the source/destination exists in the model.

From the Source/Destination form you can also navigate to forms for other process model objects such as information flows and related source/destination objects. Fields that allow you to navigate to other forms are marked with an asterisk (*). Simply double-click button 1 on the field with the asterisk to display the form for the related object.

There are three ways to display the form for the selected source/destination:

- By double-clicking button 1 on the source/destination in the DFD
- By selecting Form from the Form pull-down menu (Not Available in the Beta Release)
- By selecting Find from the Edit pull-down menu The procedures for displaying the Source/Destination form are the same ones described in the Adding Information About a Process section of this chapter.

For descriptions of each field of the Source/Destination form, refer to Chapter 11, Process Model Forms. For more information about using forms, refer to Chapter 3, Working with Form and Pop-Up Windows.

Figure 7-17 The Source/Destination Form

See illustration at chapter end.

Seeing Results in Related Diagrams and Forms

When you add or edit information about the source/destination in the Source/Destination form, the DFD and process model forms change depending on the type of information you are adding or editing. PDL references to the source/destination (SEND and RECEIVE statements) change accordingly.

Undoing Information Entered into the Form

The system accepts a change to the source/destination each time you leave a field of the form. You can undo any change accepted by the system. To undo all changes to a form you must individually undo each change made to the form. Related diagrams and forms, displayed or not displayed, are updated accordingly. Original PDL references return.

Editing a Source/Destination

Once you have entered a source/destination into the DFD and further defined it in the Source/Destination form, you can change the source/destination by editing the information in the form or by selecting editing operations from the action bar or the source/destination context menu.

This section provides information about the editing operations that are available from the action bar or the source/destination context menu. For more information about the Source/Destination form, refer to the section Adding Information About a Source/Destination in this chapter.

When you edit a source/destination using the diagram, you select the source/destination and then select an editing operation from the action bar or from the source/destination's context menu. These operations include

- Merging source/destination objects (nonsystem)*
- Cutting a source/destination to the clipboard (Not Available in the Beta Release)
- Pasting a source/destination from the clipboard (Not Available in the Beta Release)
- Copying a source/destination object (Not Available in the Beta Release)
- Deleting a source/destination
- Editing a source/destination using PDL The operations marked with an asterisk are transformations. Transformations combine multistep editing operations and make them accessible from a single menu choice, Transform.

All these editing operations are available from the DFD. All changes are made to the source/destination in the process model and are reflected immediately in all appropriate diagrams and forms regardless of whether they are displayed.

You can undo an editing operation and the source/destination returns to its pre-edited state.

The following sections give the procedures for performing editing operations on source/destination objects. The operations are presented in the order shown previously.

Merging Source/Destination Objects (Nonsystem)

From the DFD you can merge two source/destination objects in a model if both are of the same type: system, organizational unit, role, or other. A *system source/destination* is another process model. The system checks to ensure that you have selected compatible source/destination objects to merge.

This section describes how to merge two source/destination objects of any type other than system. To merge two system source/destination objects, you merge the process models as described in Chapter 8, Merging Process Models.

When you merge two nonsystem source/destination objects, the system creates a new source/destination. The two original objects are deleted. You name the new source/destination object that results from the merge in the New Target Name pop-up window. The name of the target object is the default.

The source/destination resulting from the merge inherits the information flows from both the source and target objects.

Objects that have been filtered out of a model cannot be merged.

▼ To merge two nonsystem source/destination objects:

1 Display the DFD.

2 First select the source object, then select the target object. (Remember to hold down the Shift key while you click on the objects to select them both.)

3 Select Transform from the Tasks pull-down menu.

The system displays the Choose a Transformation pop-up window (refer to Figure 7-8).

4 Select Merge Two Objects from the list of transformations:

a Select the Merge Two Objects radio button.

b Click on OK.

The system merges the two objects and displays the New Target Name pop-up window. The entry field of the window displays the target object name as the default for the name of the new source/destination resulting from the merge.

5 Click on OK to accept the object name. Or, enter a new name for the source/destination resulting from the merge, then press OK.

The system merges the two source/destination objects. Figure 7-18 shows an example of two source/destination objects merged.

Figure 7-18 Two Source/Destination Objects Merged

Figure 7-18A Source/Destination Objects Before Merge

See illustration at chapter end.

Figure 7-18B Source/Destination Objects After Merge

See illustration at chapter end.

Seeing Results in Related Diagrams and Forms

When you merge two source/destination objects, the new object becomes part of the model. All appropriate diagrams and forms are updated to reflect the existence of the new source/destination. The new source/destination has a form.

If the merged source/destination objects had information flows attached to them, any PDL statements that referenced them are updated to reflect the new source/destination name that you specified when the objects were merged.

The Source/Destination form for the new object shows the combined fields of the source and target objects. The values of the target object are chosen when the source and target fields are the same.

The Process Model form lists the new source/destination object in place of the original two objects.

Undoing Source/Destination Merge

You can undo the merge of two source/destination objects as described in Chapter 4, Undoing and Redoing Operations. The process model returns to the state it was in before you performed the merge; that is, the model contains the source and target objects in their pre-merge states. All diagrams and forms associated with the process model, displayed or not displayed, are updated.

Cutting a Source/Destination to the Clipboard (Not Available in the Beta Release)

Pasting a Source/Destination from the Clipboard (Not Available in the Beta Release)

Copying a Source/Destination (Not Available in the Beta Release)

You can copy a source/destination by using the Edit pull-down menu as described in Chapter 4, Editing Analyst Model Objects.

Seeing Results in Related Diagrams and Forms

When you copy a source/destination in a model, all the applicable diagrams reflect the copied object and the system creates a form for the copied source/destination.

Undoing Source/Destination Copy

You can undo the source/destination copy as described in Chapter 4, Undoing and Redoing Operations. The process model returns to the state it was in before you copied the object. All diagrams and forms associated with the process model, displayed or not displayed, are updated.

Deleting a Source/Destination

You can delete a source/destination by using the Edit pull-down menu as described in Chapter 4, Editing Analyst Model Objects.

Seeing Results in Related Diagrams and Forms

The source/destination is deleted from the DFD. If the source/destination had information flows coming into it from a process, any logical access statements in the PDL diagram that referred to the source/destination are deleted. Any flows attached to the deleted source/destination are deleted. The Source/Destination form and any reference to the source/destination on the Process Model form are deleted.

Undoing Source/Destination Deletion

You can undo the deletion of a source/destination as described in Chapter 4, Undoing and Redoing Operations. The process model returns to the state it was in before you performed the deletion. All diagrams and forms associated with the process model, displayed or not displayed, are updated.

Editing a Source/Destination Using PDL

For more information about PDL, refer to Chapter 9, Introduction to PDL.

Creating an Information Flow

You create an information flow by adding it to the process model using the DFD, the process model forms, or PDL. (Information flows are not represented in the FD diagram, which only shows processes.) In the DFD you can add information flows only if they are attached to other process model objects (primitive processes, information stores, or source/destinations).

An information flow can have zero, one, or many information flow structures corresponding to the information packets carried by the flow. Each information flow structure contains entities and attributes, which may or may not be defined in the data model. The contents of the information flows (entities and attributes) link the process model's DFD, the data model's E-R Diagram, and the associated process model and data model forms.

In PDL you can add an information flow by inserting a CREATE, RETRIEVE, UPDATE, DELETE, SEND, or RECEIVE statement to the logic of a primitive process. Each information flow structure corresponds to one of these statements in PDL. If you modify the flow structure, you modify the PDL statement. If you modify the PDL statement, you modify the flow structure. For more information refer to Chapter 9, Introduction to PDL.

You can use the Information Flow form to supply detailed information about the flow. For example, you define the information flow structure and the contents of the structure in the Information Flow form. For more information about forms, refer to Chapter 3, Working with Form and Pop-Up Windows, and Chapter 11, Process Model Forms.

Creating and Placing an Information Flow

The procedures given in the following paragraphs assume that you have opened an Analyst model that has a process model; you have displayed the DFD; and you have created some processes, information stores, and source/destination objects.

To add an information flow to the model you must already have at least two processes, or a process and an information store or source/destination object. Data cannot flow between two information stores or between two source/destination objects without an intervening process. Therefore, the system accepts only information flows created between these objects:

- Between two processes
- Between a process and a source/destination
- Between a process and an information store You can create information flows using the information flow symbol on the palette, the Create Information Flow choice on the DFD context menu, or the In Flows and Out Flows fields of the process, information store, and source/destination forms.

Using the Palette

Using the palette, you can create a number of information flows between objects in the model.

▼ To create information flows using the palette:

1 Select the information flow symbol in the palette.

The system highlights the palette symbol and displays a message in the message area.

While you are in the create information flow mode, you cannot perform any other type of operation.

To exit from the create information flow mode without creating any flows:

a Press the Esc button on the keyboard.

b Select a palette symbol.

c Select a choice from the action bar.

2 Select the flow's source and target objects:

a Select the flow's source object.

b Select the flow's target object.

The system displays the Create Information Flow pop-up window (Figure 7-19).

3 In the Create Information Flow pop-up window, enter a name in the Information Flow field.

4 Click on OK.

The system clears the pop-up window and draws the flow from the selected source object to the selected target object (Figure 7-20). Notice that you are still in the create flow mode, as indicated by the message area and the highlighted palette symbol.

5 Create another information flow by a Selecting another set of source and target objects for the flow b Entering the information flow name in the Create Information Flow pop-up window and clicking on OK 6 Repeat step 5 to continue drawing information flows between objects.

7 When you are finished creating information flows, exit from the mode using one of the methods described in step 1.

The message area indicates that you are leaving the mode and the palette symbol is no longer highlighted.

Figure 7-20 shows an information flow added to a DFD.

Figure 7-19 Create Information Flow Pop-Up Window

See illustration at chapter end.

Figure 7-20 DFD Showing Processes, Information Stores, Source/Destinations, and Information Flows See illustration at chapter end.

Using an Object's Context Menu

As an alternative to using the palette, you can use the context menus of any flow source to create an information flow. The context menus for processes, information stores, and source/destination objects all contain the Create Flow choice. The creation of information flows from a context menu is nonmodal.

▼ To create information flows using a context menu:

1. Click button 2 on the flow's source object (process, information store, or source/destination) to display the object's context menu.
2. Select Create Flow.
3. Select the flow's target object.

The system displays the Create Information Flow pop-up window.
4. Enter the name of the information flow in the entry field and click on OK.

The system draws the information flow from the source to the target objects. Notice that you are not in a mode. At this point, you can create another information flow by displaying an object's context menu, or you can perform another type of operation.

Seeing Results in Related Diagrams and Forms

The information flows you create in the model can be seen in the DFD and the process model forms that reference information flows (the Process, Information Store, and Source/Destination forms). After you create an information flow, you can use the Information Flow form to enter and edit detailed information about the flow. The form is available for retrieval and editing as long as the information flow exists in the model. Refer to the section Adding Information About an Information Flow in this chapter.

Undoing Information Flow Creation

You can undo the results of creating an information flow as described in Chapter 4, Undoing and Redoing Operations. If you have created several flows within a mode, selection of Undo undoes the creation of all the flows. The process model returns to the state it was in before the creation of the flows. All diagrams and forms associated with the process model, displayed or not displayed, are updated.

Alternatively, to delete a flow, you can select the flow and then select Clear from the Edit pull-down menu.

After Creating an Information Flow

Once you have created an information flow, you can

- Select a palette symbol to create another process model object.
- Display the Information Flow form to enter detailed information about an information flow, including the contents of the information flow. Refer to Adding Information About an Information Flow in this chapter.
- Display the Entity-Relationship Diagram, the Entity form, or the Attribute form to see the entities and attributes that you may have defined as contents of the information flow in the Information Flow form.

- Display the PDL diagram for a primitive process with incoming and outgoing flows from another process or source/destination to see the SEND and RECEIVE statements. (An information flow appears in PDL only after you define the contents of the flow in the form.)
- Select an editing operation from the action bar or the information flow context menu. Refer to Editing an Information Flow in this chapter.

Adding Information About an Information Flow

Once you have created an information flow, you can display the Information Flow form to enter detailed information about the flow (Figure 7-21). The form can be retrieved for data entry, editing, or reference as long as the information flow exists in the model.

Within the Information Flow form, you define the information flow structures and the entities and attributes contained in those structures. These entities and attributes may or may not be defined in the data model. In defining an information flow structure, you automatically identify the corresponding PDL statement (CREATE, RETRIEVE, UPDATE, DELETE, SEND/RECEIVE).

*Note:* In the Beta Release, free attributes are not recognized. Also in this release, entities alone cannot be specified for store contents; entities must be qualified by attributes in the format ENTITY.ATTRIBUTE or ENTITY.*.

If, when you define the contents of the flow structure, you name entities and attributes that do not exist in the data model, you have created these objects and you can see them in the data model when you next display the E-R Diagram or display any associated forms. For more information about creating entities, refer to Chapter 5, Building a Data Model.

From the Information Flow form you can also navigate to forms for other process model objects such as processes and information stores. Fields that allow you to navigate to other forms are marked with an asterisk (*). Simply double-click button 1 on the field with the asterisk to display the form for the related object.

There are three ways to display the form for the selected information flow:

- By double-clicking button 1 on the information flow in the DFD
- By selecting Form from the Form pull-down menu (Not Available in the Beta Release)
- By selecting Find from the Edit pull-down menu The procedures for displaying the Information Flow form are the same ones described in the Adding Information About a Process section of this chapter.

For descriptions of each field of the Information Flow form, refer to Chapter 11, Process Model Forms. For more information about using forms, refer to Chapter 3, Working with Form and Pop-Up Windows.

Figure 7-21 The Information Flow Form

| |
|---|
| See illustration at chapter end. |

Seeing Results in Related Diagrams and Forms

When you add or edit information about the information flow in the Information Flow form, the DFD, the PDL diagram, and the E-R Diagram change accordingly, depending on the type of information you are adding or editing. Forms in the data model and process model also change. Here are some examples:

- If you identify a new entity in the contents of the information flow, that entity appears in the E-R Diagram and the Entity form of the data model when you next display them.
- If you change the contents of the information flow, the statements in PDL change accordingly.

Undoing Information Entered into the Form

The system accepts a change to the information flow each time you leave a field of the form. You can undo any change accepted by the system. To undo all changes to a form you must individually undo each change made to the form. Related diagrams and forms, displayed or not displayed, are updated accordingly.

Editing an Information Flow

Once you have entered an information flow into the DFD and further defined it in the Information Flow form, you can change it by editing the information in the form or by selecting editing operations from the action bar or the information flow context menu.

This section provides information about the editing operations that are available from the action bar or the information flow context menu. For more information about the Information Flow form, refer to the section Adding Information About an Information Flow in this chapter.

When you edit an information flow by the diagram, you select the information flow and then select an editing operation from the action bar or from the information flow's context menu. These operations include

- Reconnecting an information flow*
- Merging information flows*
- Cutting an information flow to the clipboard (Not Available in the Beta Release)
- Pasting an information flow to the clipboard (Not Available in the Beta Release)

- Copying an information flow (Not Available in the Beta Release)
- Deleting an information flow
- Editing an information flow using PDL The operations marked with an asterisk are transformations. Transformations combine multistep editing operations and make them accessible from a single menu choice, Transform.

All these editing operations are available from the DFD. All changes are made to the information flow in the process model and are reflected immediately in all appropriate diagrams and forms regardless of whether they are displayed.

You can undo an editing operation by selecting Undo from the Edit pull-down menu, and the information flow returns to its pre-edited state.

The following sections give the procedures for performing editing operations on information flows. The operations are presented in the order shown previously.

Reconnecting an Information Flow

From the DFD you can change an information flow's target object. This redirects the flow to a different target object.

▼ To reconnect an information flow:

1 Display the DFD.

2 Select the information flow that you want to reconnect and its new target object. The order in which you select these objects does not matter. (Remember to hold down the Shift key while you click on both objects.)

3 Select Transform from the Tasks pull-down menu.

The system displays the Choose a Transformation pop-up window (refer to Figure 7-8).

4 Select Reconnect Information Flow from the list of transformations:

a Select the Reconnect Information Flow radio button.

b Click on OK.

The system draws the information flow to the new target object.

Seeing Results in Related Diagrams and Forms

When you change the target of an information flow, you can see the new route of the flow in the DFD. All appropriate forms are updated to reflect the new target object of the flow. The form for the new target object identifies the flow as an incoming flow. The form for the former target object no longer lists the flow as an incoming flow.

In the Beta Release, the information flow structures of the reconnected flow are deleted.

Undoing Reconnect Information Flow

You can undo the change of flow connection as described in Chapter 4, Undoing and Redoing Operations. The process model returns to the state it was in before you reconnected the flow to the new target. All diagrams and forms associated with the process model, displayed or not displayed, are updated.

Merging Information Flows

From the DFD you can merge two information flows if the flows' source object and target object are the same. The system checks to ensure that the information flows you have selected to merge have common source and target objects.

When you merge two information flows, the system creates a new information flow. The two original information flows are deleted. You name the new information flow that results from the merge in the New Target Name pop-up window. The name of the target flow name is the default.

Information flows that have been filtered out of a model cannot be merged.

▼ To merge two information flows having the same source object and target object:

1 Display the DFD.

2 First select the source information flow, then select the target information flow. (Remember to hold down the Shift key while you click on the flows to select both flows.)

3 Select Transform from the Tasks pull-down menu.

The system displays the Choose a Transformation pop-up window (refer to Figure 7-8).

4 Select Merge Two Objects from the list of transformations:

a Select the Merge Two Objects radio button.

b Click on OK.

The system displays the New Target Name pop-up window. The entry field of the window displays the target flow name as the default for the name of the new information flow resulting from the merge.

5 Press OK to accept the information flow name. Or, enter a new name for the information flow resulting from the merge, then press OK.

The system merges the two information flows. Figure 7-22 shows an example of two information flows that are merged.

Figure 7-22 Two Information Flows Merged

Figure 7-22A Information Flows Before Merge

| |
|---|
| See illustration at chapter end. |

Figure 7-22B Information Flow After Merge

See illustration at chapter end.

Figure 7-22C Contents of Merged Information Flow

See illustration at chapter end.

Seeing Results in Related Diagrams and Forms

When you merge two information flows, the new information flow becomes part of the model. All appropriate diagrams and forms are updated to reflect the existence of the new information flow.

The Information Flow form for the new information flow shows the combined fields of the source and target flows. The values of the target flow are chosen when the source and target fields are the same.

Seeing Results in Information Flow Contents

An information flow contains owned-attributes, which may be enclosed in one or more information flow structures. Each information flow may have zero, one, or more structures for its contents. When two information flows are merged, the structures in the resulting new information flow contain the attributes that were defined in the structures of the original source and target information flows. (In the Beta Release, free attributes are not recognized.)

The contents of the information flows are merged according to these rules:

- The system compares the structures of the source information flow with the structures of the target information flow. If a match is not found, the target information flow inherits the unmatched information flow structures.
- If there are any attributes that do not match, the target information flow inherits those attributes into its structure.
- If there are matching attributes, the system uses the target information flow's values for those attributes.

Figure 7-22C shows how the contents of two information flows merge.

Undoing Information Flow Merge

You can undo the merge of two information flows as described in Chapter 4, Undoing and Redoing Operations. The process model returns to the state it was in before you performed the merge; that is, the model contains the source and target flows in their pre-merge states. All diagrams and forms associated with the process model, displayed or not displayed, are updated.

Cutting an Information Flow to the Clipboard (Not Available in the Beta Release)

Pasting an Information Flow to the Clipboard (Not Available in the Beta Release)

Copying an Information Flow (Not Available in the Beta Release)

You can copy an information flow by using the Edit pull-down menu as described in Chapter 4, Editing Analyst Model Objects.

Seeing Results in Related Diagrams and Forms

When you copy an information flow in a model, all the applicable diagrams reflect the copied object and the system creates a form for the copied information flow.

Undoing Information Flow Copy

You can undo the information flow copy as described in Chapter 4, Undoing and Redoing Operations. The process model returns to the state it was in before you copied the information flow. All diagrams and forms associated with the process model, displayed or not displayed, are updated.

Deleting an Information Flow

You can delete an information flow by using the Edit pull-down menu as described in Chapter 4, Editing Analyst Model Objects.

Seeing Results in Related Diagrams and Forms

The information flow is deleted from the DFD. The Information Flow form and any reference to the flow on other process model forms are deleted. All references to the flow in PDL are removed.

Undoing Information Flow Deletion

You can undo the deletion of an information flow as described in Chapter 4, Undoing and Redoing Operations. The process model returns to the state it was in before you performed the deletion. All diagrams and forms associated with the process model, displayed or not displayed, are updated.

Editing an Information Flow Using PDL

For more information about PDL, refer to Chapter 9, Introduction to PDL.

Chapter 8
Working with a Process Model

After creating a process model, you can use the following tasks to help you improve and maintain the model:

- Filters to view a subset of the model.
- Design to locate potential problems within the model.
- Print to print the functional decomposition or data flow diagram of the model.
- Merge to merge two process models.

This chapter discusses each of these tasks.

Viewing a Subset of the Process Model

By default, the information displayed in the DFD, the FD diagram and process model forms reflects all of the information in the process model. To examine just a portion of the information in the process model, use filters as discussed in Chapter 4.

Running the Design Task on a Process Model

> ☛ *To be supplied after Beta.*

Printing a Functional Decomposition or Data Flow Diagram

> ☛ *After Beta, a brief summary of diagram printing will appear here.*

The BACHMAN/Analyst offers extensive printing options. It also provides a report production capability by exporting data model information to OS/2's Query Manager facility. For more information on printing and producing reports, see Chapter 4.

Merging Process Models

> ☛ *Documentation to be supplied after Beta.*

▼ To merge two process models that are in the same Analyst model:

1. Select Merge from the Task pull-down menu.
   A cascading menu appears.
2. Select Process Model from the cascading menu.
   The Merge Two Process Models pop-up window appears.
3. Select Interface Merge or Full Merge.
4. Select the source and target process models.
5. Select the OK pushbutton to begin merging the process models.
   The source process model is deleted.

▼ To merge two process models that are in different Analyst models:

1. Merge the Analyst models.
2. Use the previous procedure to merge the process models.

The BACHMAN/Analyst also allows you to merge:

- Data models, as shown in Merging Data Models.
- Analyst models, as shown in Merging Analyst Models.
- Analyst model objects of the same type, as shown in the editing section of the object type. For example, see Editing Processes for information about merging processes.

Chapter 9
Introduction to PDL

The BACHMAN/Analyst's Process Description Language (PDL) is a graphical, structured language that you can use to specify the business logic of primitive processes defined in a Data Flow Diagram (DFD). PDL shows the flow of processing in relation to objects in the DFD and the specific operations performed on entities and attributes in the Entity-Relationship (E-R) diagram.

A PDL diagram is a tree-like structure that provides an easily-understood picture of the operations performed on your business information. Figure 9-1 shows a sample PDL diagram.

Figure 9-1 A PDL Diagram

See illustration at chapter end.

You build a PDL diagram by creating statements, one at a time, in a window. The system presents a separate window of options from which you can select keywords, identifiers, and symbols to build your PDL statements. If you prefer, you can type statements or use a combination of typing and selecting items from the options window. For each statement you enter, the system automatically generates its graphical representation in the diagram.

To modify existing statements, you can, at any time, display the text of an entire statement or part of a statement and edit that text by selecting items from the options window or by typing.

Here are a few of the many features that PDL provides:

- An easy-to-read graphical representation of your business logic.
- English-like statements that you use to describe a process.
- The option of creating statements by selecting items from a window or by typing.
- Autocompletion of parts of PDL statements with a single keystroke.
- Automatic generation of new entities and attributes in the data model from information you provide in PDL statements.
- Automatic generation of PDL statements from information provided in the DFD and E-R diagram.
- Two types of PDL reports: a text report containing all of the PDL statements that describe a process and a LAM report that provides access information about the logic you have specified for a process.

This chapter provides introductory information about PDL and explains how to use the PDL windows. Chapter 10 provides reference information about expressions, exception and error conditions, and each of the PDL statements.

The Interrelationship of Analyst Diagrams

When you create or modify objects in the E-R diagram or DFD, the system automatically creates or modifies the corresponding PDL statements and their graphical representations. For example, if you create an information flow from a source/destination object to a primitive process and define the contents of the information flow in the DFD, your PDL diagram for that primitive process contains a node labeled RECEIVE. The RECEIVE node represents a PDL statement that describes the source and nature of information coming into the process.

In a similar way, when you create or modify PDL objects, the system creates or modifies the corresponding objects in the E-R diagram or the DFD. For example, any of the PDL logical access statements can create a new entity in the E-R diagram or a new information store in the DFD.

In your PDL diagram, the system-generated objects appear at the top of the diagram in the order in which you create the corresponding objects in the DFD. You can reposition these objects within the same vertical line of your PDL diagram. See the section Moving Nodes for more information.

PDL Procedures

A *PDL procedure* is a body of PDL statements that describes a specific operation or set of operations to be performed on your business information. In the Beta release of the BACHMAN/Analyst, there are three types of PDL procedures:

- Process procedure
- Entity method
- Derived attributes

A *process procedure* is defined on a primitive process in a corresponding DFD. It describes the business logic of the primitive process.

An *entity method* is a procedure defined on an entity in the corresponding E-R diagram. An entity method is a generic procedure that describes an operation to be performed on the specified entity. Any time you need to perform the operation described by an entity method you call it from a process procedure, another entity method, or from within the same entity method. See the section Entity Methods later in this chapter.

A *derived attribute* is defined on an attribute in the E-R diagram. It is an attribute whose value is calculated each time it is used. The value of a derived attribute is not stored in the database. See the section Derived Attributes later in this chapter.

PDL Statements

The Bachman PDL provides several types of statements that you can use to build procedures:

- Logical access statements (RETRIEVE, CREATE, UPDATE, DELETE)
- Iteration statements (FOREACH, LOOP)
- Conditional statements (IF, CASE)
- Control transfer statements (for example, EXIT, SKIP, RESUME)

The PDL logical access statements describe selecting or changing data defined in information stores. These statements are equivalent to statements that describe database access in a physical database. Any of the PDL logical access statements can create new objects in the E-R diagram and in the DFD.

To visually distinguish logical access statements from other types of statements in a PDL diagram, the initial keywords of logical access statements appear in reverse video. This feature provides an easy-to-read logical access path through your data model. If you want to view only the logical access statements in a PDL diagram, you can apply a filter that temporarily removes all other types of statements from the diagram. See Chapter 4 for information about applying filters to your Analyst model.

In addition , you can produce a report that lists detailed information about the logical access statements in a procedure or a report that contains all of the PDL statements in a procedure. See the section Producing PDL Reports later in this chapter.

To aid in access-based design, the RETRIEVE statement includes a volume clause that allows you to specify the expected number of entity occurrences to be retrieved and the number of entity occurrences to be retained.

Displaying PDL Diagrams

The way in which you display a PDL diagram depends on the type of PDL procedure you want to build: process procedure, entity method, or derived attribute. Most often you will display a PDL diagram to build a process procedure. The following sections explain how to display a PDL diagram for a process procedure.

The sections Entity Methods and Derived Attributes, later in this chapter, explain how to display PDL diagrams for entity methods and derived attributes.

Displaying a PDL Diagram for a Process Procedure

Before displaying a PDL diagram for a process procedure, you must display the DFD or FD diagram for which you want to specify PDL. Once you have the DFD or FD diagram on the screen, you can use either of the following methods to display the PDL diagram:

- The context menu for the primitive process
- The action bar's Diagram pull-down menu Once you have displayed a PDL diagram, you can minimize the diagram so that it appears as an icon in the Analyst window, or you can close it. When you want to display the PDL diagram again, double-click button 1 on the icon to restore it, or open the diagram as explained in the following sections. See Chapter 3 for detailed information about windows.

Using the Context Menu to Display a PDL Diagram

▼ To display a PDL diagram using the context menu for a primitive process:

1 In the DFD or FD diagram, click button 2 on the primitive process for which you want to specify PDL.

The process context menu appears.

2 In the context menu, click button 1 on the PDL choice.

The system displays the PDL windows shown in Figure 9-2. If you have created information flows in the DFD, the PDL diagram contains additional objects.

Figure 9-2 PDL Windows

| See illustration at chapter end. |
|---|

Using the Diagram Pull-Down Menu to Display a PDL Diagram

▼ To display a PDL diagram using the Diagram choice on the action bar:

1 In the DFD or FD diagram, select the primitive process for which you want to specify PDL.

The process is grayed to indicate that it is selected.

2 Select the Diagram choice on the action bar.

The system displays the Diagram pull-down menu.

3 From the pull-down menu, select the New Diagram choice.

The system displays a cascading menu of new diagram choices.

4 From the cascading menu, select the PDL choice.

The system displays the PDL windows shown in Figure 9-2. If you have created information flows in the DFD, the PDL diagram contains additional objects.

PDL Screen Layout

Whether you are building PDL for a process procedure, an entity method, or a derived attribute, the PDL display consists of the same three windows: the Diagram window, the Options window, and the Command window. In addition, the message area appears across the bottom of the screen as it does for all Analyst model displays. Figure 9-3 shows the layout of these screen elements.

Figure 9-3 PDL Screen Elements

| |
|---|
| See illustration at chapter end. |

Diagram Window

The PDL Diagram window displays the graphical representation of your PDL statements. The PDL statements compose a procedure that describes the logic of one of the following:

- A primitive process that you selected in the DFD or FD diagram
- An entity method that you defined on the Entity form in the E-R diagram
- A derived attribute that you defined on the Attribute form in the E-R diagram The building blocks of a PDL diagram are objects that can be either nodes or pins.

Nodes

A *node*, which appears as a box, represents an entire PDL statement or part of a statement.

Nodes that represent logical access statements (RETRIEVE, CREATE, UPDATE, and DELETE) appear with their top sections in reverse video.

The vertical lines in a PDL diagram show the flow of control from one node to the next. The vertical line on the left side of the diagram is referred to as the *main line*. All other vertical lines are called *branches*. Each node after the first is attached by a horizontal line to either the main line or a branch.

Pins

A *pin* represents the relationship, or link, between statements or parts of statements. The position of a pin in relation to its node indicates the type of pin it is. Figure 9-4 shows PDL nodes and the various types of pins. The following paragraphs provide a brief explanation of each type of pin.

Figure 9-4 PDL Nodes and Pins

See illustration at chapter end.

Extension Pin

An extension pin appears at the end of the main line and at the end of each branch of your process procedure. An extension pin marks each location where you can add nodes to the end of a sequence.

The system labels each extension pin with the name of the statement or clause at the top of the main line or branch. For example, at the end of the main line of a process procedure, the extension pin is labeled "PROCESS" which is the name of the first statement in a process procedure. Extension pin labels serve as a reminder when only a portion of your PDL diagram is visible in the Diagram window.

Root Pin

A root pin appears to the left of each node along any line of your process description. A root pin marks the location (or root) of a node. Selection of a root pin allows you to insert nodes before the root pin.

Parent/Child Pin

A parent/child pin appears on the lower left edge of a node. It marks the beginning of a branch of your process description. Selection of a parent/child pin allows you to insert nodes at the beginning of the branch.

Qualifier Pin

A qualifier pin appears along the right side of a node. Each qualifier pin attached to a node represents a clause that modifies the PDL statement, such as a WHERE clause. Selection of a qualifier pin allows you to add or modify a qualifying clause.

Condition Pin

A condition pin appears on the lower right edge of a node. It represents a WHEN clause used for handling exception conditions and errors. See Chapter 10 for more information about handling exception and error conditions.

In general, each node and its attached qualifier and condition pins represent a PDL statement. The exceptions are the IF and CASE statements, which are represented by multiple nodes that show the component parts of these statements, and WHEN clauses that describe exception and error conditions. See Chapter 10 for information about the IF and CASE statements and handling exception and error conditions.

All possible qualifier pins and the condition pin appear on the node whether or not you have actually entered them as part of the statement. If a qualifier pin is *active* (actually part of the statement), you see the text of the clause to the right of the pin. If a pin is not active, it serves as a place holder, reminding you that you can add a clause to this statement if you want. When a pin is inactive, you see only the initial keyword for the clause.

This display of both active and inactive pins allows you to easily modify a statement by selecting a pin and entering the appropriate clause in the Command window.

Message Area

The message area displays prompts and messages from the system. This window might prompt you to enter information that completes a PDL statement, or it might describe a mistake in the PDL statement you are entering. See Chapter 2 for additional information about the message area.

Options Window

The Options window displays the elements you can use to create and modify PDL statements and their graphical representations. Those elements include PDL keywords and the names of objects you have defined in the corresponding E-R diagram and DFD.

Command Window

The Command window displays the text of the PDL statement or clause you are currently entering. To enter a PDL statement, you can type the statement, select choices from the Options window, or use a combination of both. When you select a choice from the Options window or type, the text appears in the Command window at the current cursor location. When you press Enter to submit the statement, the system displays the statement's graphical representation in the Diagram window.

Building a PDL Diagram

To build a PDL diagram, you use features of the Diagram window, the Options window, and the Command window to create one statement at a time.

▼ To add a new statement or to modify an existing statement, follow these general steps:

1. Select an object in the Diagram window to establish the location (called the editing focus) where you want to add or modify a statement.
2. Select choices from the Options window or type text to create or modify the statement in the Command window.
3. Press the Enter key to submit the statement you have entered in the Command window.

The system updates the diagram to show your addition or modification.

The following sections provide detailed information about using the PDL windows to create and modify PDL statements. The section Building a RETRIEVE Statement, an Example explains, step by step, how to create a PDL statement.

Using the Diagram Window

PDL statements and their graphical representations can be created in either of the following ways:

- Generated by the system from information in the corresponding DFD
- Entered by you using the PDL windows At the top of each PDL diagram, you see a system-generated node that represents a PROCESS statement, a METHOD statement, or an ATTRIBUTE DERIVATION statement. The PROCESS node is generated by the system when you select a DFD process for which you want to specify PDL. The PROCESS node specifies the process name and any triggering event. The METHOD node is generated by the system when you define an entity method in the E-R diagram. The ATTRIBUTE DERIVATION node is generated by the system when you define a derived attribute in the E-R diagram.

Each additional node in the PDL diagram is either generated by the system when you define the contents of an information flow in the DFD or created by you using the PDL windows.

Selecting Objects in the Diagram Window

You select objects from the Diagram window to add or modify PDL statements and to perform operations (such as move or delete) on the objects in the diagram.

▼ To select a PDL object with the mouse:

Click button 1 on the object in the Diagram window.

To show that an object is selected, the system displays a gray border around a node or a section of a node and displays pins solid gray.

*Note:* In the Beta release, you can select only one PDL object at a time. You cannot select multiple objects.

▼ To deselect an object, use either of the following methods:

- Click button 1 on the diagram background.
- Select a different object.

Establishing the Editing Focus

To add or modify objects in the PDL diagram, you begin by selecting the *editing focus*. The editing focus can be a pin to which you want to add a node (add the next PDL statement), or it can be a node or pin you want to modify. To establish the editing focus, you select an object in the Diagram window, as described in the previous section.

When you select the editing focus, the system automatically updates the categories and choices in the Options window. For example, when you select a node or a pin that is active, the system first displays the text for that node or pin in the Command window and then updates the Options window.

Therefore, the Options window contains only those categories and choices appropriate for modifying the displayed text.

In addition to updating choices in the Options window, the system also activates the Options window when you select the editing focus. When the Options window is active, you can select the available keywords and identifiers (the names of E-R and DFD objects) to add or modify a PDL statement.

Using the Options Window

The Options window is a tree-like display of choices that you can use to build PDL statements. These choices include keywords, symbols, and the names of objects in the corresponding E-R diagram and DFD.

When you first display the PDL windows, a single item, PDL palette, appears in the Options window. When you select an editing focus, the PDL palette item expands to display one or more categories of the PDL grammar. For example, when you set the editing focus to an extension pin, a root pin, or a parent/child pin, the following choices appear in the Options window:

- Verbs
- Control flow
- Qualifiers
- NOTE

The first three choices are categories of the PDL grammar. The NOTE choice is a PDL keyword that you can use to add comments to your procedures. See Chapter 10 for more information about the NOTE statement.

Expanding and Collapsing the Options Tree

Each category that appears in the Options window has a plus (+) sign to the left of it. The plus sign indicates that the category has hidden choices subordinate to it.

▼ To display the choices in a category:

Click button 1 on the plus sign.

The system displays all the choices in that category and changes the plus sign to a minus (–) sign.

Figure 9-5 shows the Verbs category expanded to display all of its choices.

Figure 9-5 Expanded Options Window Category

| See illustration at chapter end. |
|---|

The minus sign indicates that the category has been expanded to show all of its choices. Some categories have subcategories. Therefore, when you expand a category you might see other categories (with plus signs to the left) along with choices you can select to create PDL statements.

▼ To hide the choices in a category:

Click button 1 on the minus sign.

The system collapses the category, displaying only the category name and a plus sign.

When you select choices from the Options window, the system updates the window with another group of appropriate categories which you can expand and collapse as explained in the preceding paragraphs. When you press the Enter key to submit a PDL statement, the Options window redisplays the three categories (Verb, Control flow, and Qualifiers) and the keyword NOTE. The categories are collapsed.

If you display a new PDL diagram using New Diagram on the Edit pull-down menu, the Options window shows only the initial item (PDL palette), as it does for any new display.

Selecting Choices From the Options Window

▼ To select an choice displayed in the Options window:

Click button 1 on the choice.

The selected choice appears in the Command window.

To continue adding text to the Command window, you can click on other choices in the Options window, type text, or use a combination of both.

When you select an attribute from the Options window, the system displays the fully qualified attribute name in the Command window. For example, if you select an attribute named *item*, the system qualifies the attribute name with its entity name and encloses the entity name and the attribute name in single quotation marks:

'product'.'item'

Updating the Options Window

In general, the categories and choices that appear in the Options window depend on the editing focus and any text that is displayed in the Command window. Each time you select a choice from the Options window, the system automatically updates the Options window with items appropriate for the new context.

When you type text in the Command window, however, the system does not automatically update the Options window. You can explicitly update the Options window by pressing the F1 function key.

*Note:* In the Beta release, the Command window must be active when you press the F1 function key.

Using the Command Window

The Command window, in combination with the Options window, allows you to create and modify PDL statements that describe the logic of a process, an entity method, or a derived attribute. To build PDL, you enter statements in the Command window, one at a time. In the Diagram window, the system displays the graphical representation of each PDL statement you enter.

Adding a New Statement

To add a new statement to your process description, you first set the editing focus to an extension pin, a root pin, or a parent/child pin. Select an extension pin if you want to add the new statement to the end of the main line or to the end of a branch of the process description. Select a root pin if you want to insert a new statement before the statement represented by the root pin. Select a parent/child pin if you want to add the first statement to a branch or insert a new statement at the beginning of a branch.

Once you have set the editing focus, you can create the new statement using any of the methods explained in the next section.

When you add a new node to the end of the PDL main line or a branch, the system automatically creates a new pin that extends from the root pin of the new node. This extension pin becomes the editing focus. When you select a root pin and insert a new node, the selected root pin remains the editing focus. You can easily change this system-set editing focus by clicking button 1 on the object you want.

Each extension pin, whether on the main line or a branch, has a label. The label is the name of the node at the top of the main line or branch to which the extension pin is attached. For example, if you add a RETRIEVE statement to the end of the main line of a process procedure, the system displays the RETRIEVE node in the Diagram window, extends the main line to which the new node was added, and displays a selected extension pin at the end of the main line. The label "PROCESS" (for the first node on the main line) appears to the right of the extension pin. See Figure 9-6.

Figure 9-6 An Extension Pin and Its Label

See illustration at chapter end.

Each extension pin label serves as a reminder of the top-level statement on the main line or a branch. This feature is especially useful when only extension pins appear in the diagram window.

Entering Text in the Command Window

To enter text in the Command window, you can use any of the following methods:

- Select choices, one at a time, from the Options window. Each choice you select appears in the Command window.

- Type the text of the statement or clause.
- Press the Tab key to automatically complete parts of the statement you are entering. See the next section for additional information about the PDL autocompletion feature.
- Use any combination of the three preceding methods: select choices from the Options window, type text, and use the Tab key to automatically complete certain components.

The Command window is always active. This means that any time you type displayable characters, those characters appear in the Command window. You do not have to click on the window title bar to make the Command window active.

If you change text displayed in the Command window and then change the editing focus in the Diagram window, the system displays a pop-up window to warn you that changing the editing focus replaces the text in the Command window. The pop-up window allows you either to continue with the operation, thereby changing the editing focus and losing the text in the Command window, or to cancel the operation.

Automatically Completing Components

Autocompletion is a PDL feature that allows you to add the next component to a statement in the Command window by pressing the Tab key. (Autocompletion also fills in omitted parts of a statement when you press the Enter key to submit the statement. See the next section for additional information.)

For example, if the corresponding E-R diagram contains an entity named *Products* with *item*, *description*, and *price* attributes, you might begin a RETRIEVE statement as follows:

RETRIEVE item, description, price

Then press the Tab key to complete the next component. The system adds the FROM clause to the end of the RETRIEVE statement:

RETRIEVE item, description, price FROM Products

When you use the Tab key, the system reads the information that you have already entered in the Command window to determine the default value for the next component in the statement. You can use the Tab key to complete components at the end of the text in the Command window; you cannot use it to insert components in the middle of the text.

In some cases, the Command window does not contain enough information to determine the default value for the next component. To complete the component, the system may display a pop-up window that asks you to supply the required information. For example, if you begin a RETRIEVE statement as follows:

RETRIEVE * and then press the Tab key to complete the next component (FROM *entity*), the system does not have enough information to complete the FROM clause. The asterisk (*), meaning all attributes, does not give any indication of the entity that contains the attributes. In this case, the system displays a pop-up window that asks you to specify the entity name.

Submitting Text

When the PDL statement or clause in the Command window appears as you want it, press the Enter key to submit the text to the system. The system then displays the graphical representation of your statement or clause in the diagram window.

When you press Enter to add a logical access statement, the system may display one or more pop-up windows that ask you to supply additional information. For example, when you submit a RETRIEVE statement that contains an ambiguous attribute name (an attribute that exists in more than one entity), the system displays a pop-up window that asks you to specify the entity name.

As part of the PDL autocompletion feature, the system generates default names for objects in omitted clauses. If the default name does not exist, the system displays a pop-up window that asks you to supply additional information. For example, if you omit the INFO_STORE clause from a logical access statement, the system generates a default name for the information store. If that information store does not exist, the system displays a pop-up window that allows you to accept the default name, enter another name, or select an existing information store.

Modifying an Existing Statement

To modify an existing statement, you set the editing focus to either a node or a qualifier pin, depending on what it is you want to modify. In the Command window, the system displays the text of the entire statement or part of the statement.

▼ To modify an entire statement:

Click button 1 on the keyword in the top section of the node.

The system displays the text of the statement in the Command window.

▼ To modify the text of a qualifying clause:

Click button 1 on the qualifier pin.

If the pin is active, the system displays the text of the qualifying clause. If the pin is not active, the pin is selected but no text appears in the Command window.

Once you have set the editing focus and existing text is displayed in the Command window, you can use the following keys to delete text:

- Backspace key — deletes one character at a time to the left of the text cursor.
- Delete key — deletes the character under the text cursor.

Activating a Window

Although the system automatically activates windows based on your current context, there might be times that you want to activate a window, and in the case of the Options window, update the window on your own. For example, when you type information in the Command window, the Options window does not automatically update. You might want to activate and update the Options window so that you can select choices to add to the Command window.

▼ To activate a PDL window, use either of the following methods:

- Click button 1 on the window's title bar.
- Press a function key or control key sequence shown in the following table.

Table 9-1 Control Key Sequences for Activating Windows

| Control Key | Window |
|---|---|
| F1 | Options |
| Ctrl+D | Diagram |
| Ctrl+C | Command |

Building a RETRIEVE Statement, an Example

This section shows you how to create a RETRIEVE statement in a process procedure. With the exception of a few language constraints, you follow the same basic steps to build a PDL statement in an entity method or a derived attribute procedure.

Figure 9-7 shows the PDL windows as they appear when you select a primitive process in the DFD or FD diagram. The system automatically generates the PROCESS node shown in the Diagram window. This is the top level node of the process procedure. It shows the name of the process (in this case, Advertise) and any triggering event defined in the DFD. If you have created information flows and defined their contents in the DFD, the PDL diagram contains additional nodes.

Figure 9-7 The PDL Windows as They Initially Appear

See illustration at chapter end.

▼ To begin building PDL for the process, establish the editing focus:

Select the parent/child pin on the PROCESS node.

The parent/child pin turns gray to indicate that it is selected, and the PDL palette category in the Options window expands. See Figure 9-8.

Figure 9-8 The Selected Pin and Expanded Category

See illustration at chapter end.

▼ To build the RETRIEVE statement in the Command window:

☛ *The figures for steps 1 through 8 are at the end of this chapter.*

1 Click button 1 on the plus (+) sign to the left of the Verbs category in the Options window.

The Verbs category expands to show the choices within it.

2 Select the keyword RETRIEVE from the Options window.

The system displays RETRIEVE in the Command window and updates the Options window as shown in Figure 9-9.

3 Expand the Attributes category (click button 1 on the plus sign) and select the first attribute you want to retrieve.

In the Command window, the system displays the attribute name qualified with its entity name and encloses each name in single quotation marks. The system also updates the Options window. See Figure 9-10.

4 Expand the Punctuation category and select the comma (,).

The system displays the comma in the Command window and, once again, updates the Options window.

5 Expand the Attributes category and select another attribute to retrieve.

The fully qualified attribute name appears in the Command window, and the system updates the Options window.

6 Press the Tab key to automatically complete the next component in the RETRIEVE statement.

The system adds the FROM clause to the text in the Command window. The FROM clause identifies the entities from which you are retrieving information.

7 Click button 1 anywhere in the text in the Command window and press the End key to bring the FROM clause into view. See Figure 9-11.

8 Press the Enter key to submit the statement.

The system now displays a series of pop-up windows that prompt you to supply additional information about the RETRIEVE statement. The first pop-up window, titled Specify an Information Store, is shown in Figure 9-12. The system displays this window because an information store with the system-generated default name does not exist in the DFD. The default name consists of the names of the entities specified in the FROM clause separated by ampersand (&) symbols (*entity1&entity2*).

Figure 9-12 The Specify an Information Store Pop-Up Window

See illustration at chapter end.

▼ To complete the Specify an Information Store pop-up window:

Select the OK pushbutton to create a new information store with the default name shown in the entry field.

The system now displays the Specify an Information Flow pop-up window as shown in Figure 9-13.

Figure 9-13 The Specify an Information Flow Pop-Up Window

See illustration at chapter end.

▼ To complete the Specify an Information Flow pop-up window:

Select the OK pushbutton to create a new information flow with the default name shown in the entry field.

The system displays the LAM pop-up window shown in Figure 9-14. This pop-up window allows you to specify usage information about the retrieve operation.

Figure 9-14 The LAM Pop-Up Window

See illustration at chapter end.

▼ To supply the information in the LAM pop-up window:

1. Press the Backspace key to delete the number in the first entry field.
2. Type a number to indicate the number of entity occurrences you expect the statement to retrieve.
3. Press the Tab key to move the text cursor to the second entry field.
4. Press the Backspace key to delete the number from the second entry field.
5. Type a number to indicate the expected number of entity occurrences to be retained.
6. Press the OK pushbutton.

The system creates the RETRIEVE node and adds it to your PDL diagram. At the same time, the system extends the main branch of the diagram and automatically selects the extension pin so that you can add the next statement. The extension pin is labeled with the name of the top-level node, PROCESS. See Figure 9-15.

Figure 9-15 The Diagram After Submitting the RETRIEVE Statement

See illustration at chapter end.

▼ To bring the entire PDL diagram into view:

Select Fit on the Diagram pull-down menu.

The system displays all of the PDL objects in the Diagram window as shown in Figure 9-16.

Figure 9-16 The Entire PDL Diagram

See illustration at chapter end.

The three sections of the RETRIEVE node show the type of statement, the entities from which information is to be retrieved, and the expected volume. All of the qualifying clauses appear on the right side of the node, whether or not they are active (part of this statement).

You can easily modify the statement by selecting a qualifying pin and entering the clause in the Command window.

If you redisplay the DFD, you will see the the new information store and information flow created by the RETRIEVE statement.

Manipulating PDL Objects

The following sections provide information about changing the view of your diagram, moving nodes, undoing previous operations, deleting objects, and hiding parts of your PDL diagram.

Changing the PDL Diagram View

Changing the view of your PDL diagram shrinks or enlarges the diagram so that more or less of it appears in the Diagram window. You can choose to:

- Fit the entire diagram in the Diagram window.
- "Zoom in" on or "zoom out" from the diagram by degrees.
- "Zoom in" on a particular portion of the diagram.
- Scroll through the diagram using the scroll bars on the Diagram window.

You can also use the Page Up and Page Down keys to scroll through the diagram and the Home key to fit the entire diagram in the Diagram window.

*Note:* In the Beta release, the Diagram window must be active when you use the Page Up, Page Down, and Home keys to change the view.

For detailed information about changing the diagram view, see Chapter 2.

Moving a Node

Within the PDL diagram, you can move nodes both horizontally and vertically, one node at a time. You can move a node horizontally along the line that attaches the node to the root pin. You can move a node vertically anywhere on the vertical line (main line or branch) to which the node is attached. Vertical movement allows you to position a node closer to the node above or below it, or to change the order of a node in relation to the other nodes on the same vertical line.

*Note:* In the Beta release, vertical movement is limited to the vertical line to which the node is attached. You cannot move a node to another vertical line.

▼ To move a node horizontally:

1 Press and hold mouse button 1 on the background of the node you want to move.

2 Move the mouse in a horizontal direction to the new location. To guide you, a bounding box appears around the node.

3 Release the mouse button. The node and its attached pins move to the new location. Any branches attached to the node move in relation to the new position.

▼ To move a node vertically:

1 Press and hold button 1 on the root pin of the node you want to move.

2 Move the mouse in a vertical direction to the new location. To guide you, a bounding box appears around the root pin and its node. If the bounding box enters the region of another root pin (an area slightly above or below the other root pin), that root pin is highlighted. The highlighting indicates that the node you are moving will be inserted above the highlighted pin.

3 When the bounding box is at the new location, release the mouse button. The node and its attached pins and branches move to the new location. If another root pin is highlighted when you release the mouse button, the system inserts the node you are moving above the highlighted pin.

Undoing and Redoing Operations

As you build an Analyst model, the system keeps a log of the operations you perform on the model. This *undo log* records each operation you perform through the diagrams and forms that make up the Analyst model. The logging feature allows you to undo one operation at a time, beginning with the last operation you performed.

The system also keeps a separate log of the operations you undo, called the *redo log*. The redo log allows you to cancel operations that you have undone, thereby doing the operation again.

The next two sections provide brief explanations of how to undo and redo operations. For more detailed information, see Chapter 4.

Undoing Previous Operations

▼ To undo the previous operation, you can use either of the following methods:

- Select Undo from the Edit pull-down menu to undo the last operation you performed. You can continue to select Undo for each previous operation you want to undo.
- Select Undo Log from the Edit pull-down menu to display a pop-up window that contains a list of the operations you can undo. Select the operations one at a time, beginning with the most recent operation in the log.

*Tip:* If you want to change part of a statement, it is usually easier to select the node or a qualifier pin and edit the text in the Command window rather than undo the entire statement and re-enter it.

Redoing Operations

▼ To redo an operation you have previously undone, you can use either of the following methods:

- Select Redo from the Edit pull-down menu to redo the last operation you undid. You can continue to select Redo for each previously undone operation.
- Select Redo Log from the Edit pull-down menu to display a pop-up window that contains a list of the operations you can redo. Select the operations one at a time, beginning with the most recent operation in the log.

Deleting Objects

Using Cut on the Edit pull-down menu, you can delete entire subtrees, nodes, and pins. Deleting objects from a PDL diagram also deletes the statements and clauses they represent.

▼ To delete a PDL object:

1. Select the object you want to delete: a node to delete the node and all branches attached to it or a parent/child pin to delete the branches that extend from the pin.
2. Select Edit from the action bar.
3. Select Cut from the Edit pull-down menu.

The system removes the objects from the Diagram window.

Hiding Objects

Hiding objects means temporarily removing those objects from your PDL diagram. The objects are hidden, not deleted.

You can hide any object or group of objects by applying filters, or you can selectively hide condition handlers and branches of your procedure by clicking on objects in the Diagram window.

With the BACHMAN/Analyst's filters mechanism, you can hide objects in any diagram of your analyst model. You can use the predefined filters supplied with your system, or you can define your own filters. For complete information about filters, see Chapter 3.

▼ To hide a condition handler:

Double-click button 1 on the condition pin.

The system hides all of the objects that make up the condition handler and displays a filled condition pin to indicate that there are hidden objects.

▼ To redisplay a hidden condition handler:

Double-click button 1 on the filled condition pin.

The system displays the objects that make up the condition handler and displays an unfilled condition pin.

▼ To hide a branch of your PDL diagram:

Double-click button 1 on the parent/child pin at the top of the branch.

The system hides all of the objects that make up the branch and displays a filled parent/child pin to indicate that there are hidden objects.

▼ To redisplay a hidden branch:

Double-click button 1 on the filled parent/child pin.

The system displays the objects that make up the branch and displays an unfilled parent/child pin.

Producing PDL Reports

The BACHMAN/Analyst provides two types of PDL reports that you can produce for any PDL procedure:

- A PDL text report that contains the complete text of the statements in the procedure
- A PDL LAM report that provides detailed information about each logical access statement in the procedure ▼ To produce either type of PDL report:

1 Select Reports from the Tasks pull-down menu.

The system displays a cascading menu of report types.

2 From the cascading menu, select either the PDL Report choice or the PDL LAM Report choice.

The system displays a pop-up window that prompts you for a directory path and filename for the report.

3 Type the directory path and filename you want for your report.

4 Click button 1 on the OK pushbutton.

The system generates the type of PDL report you requested and places it in the specified directory. You can either print the report or view it using any ASCII editor.

Entity Methods

An *entity method* is a PDL procedure that is attached to an entity in an E-R diagram rather than to a process in the DFD. Each entity method defines a generic operation to be performed on all occurrences of the entity, similar to methods in object-oriented programming.

Object-oriented design provides a means of achieving code reusability with accompanying gains in productivity and data integrity. Entity methods support users in the specification and development of object-oriented systems.

A typical use for an enity method might be to specify a referential integrity rule required by a user's business. For example, your company might have a rule that requires the *last-customer-number* attribute to be incremented by one each time a new customer is created and the assignment of that number to the new customer. The traditional "process-centered" approach would force all developers of applications to include the code for this operation each time an application creates a new customer.

An alternative is to create a *create-customer* entity method that handles this operation. Then, whenever an application creates a new customer, the developer calls the *create-customer* entity method, which ensures that the *last-customer-number* attribute is incremented by 1 and assigned to the new customer.

Here is an example of the PDL statements you might include in a *create-customer* entity method:

```
RETRIEVE last-customer-number FROM counters
UPDATE counters SET last-customer-number = last-customer-number + 1
CREATE customer customer-number VALUES last-customer-number
```

The *create-customer* entity method could be expanded to include all mandatory, non-null attributes for the new customer.

The use of entity methods protects the applications from changes made in the data model. If, for example, the MIS department decides to increment the

*last-customer-number* attribute by 2 instead of 1, the change is made only in the entity method rather than in all of the applications.

Working with an entity method involves three general steps:

1 Defining or modifying the entity method name on the Entity form in the E-R diagram. Defining a new entity method attaches that method to a specific entity in the E-R diagram. You can define multiple entity methods for the same entity; however, you cannot attach the same entity method to multiple entities.

2 Creating or editing the PDL statements for the entity method. Using the PDL windows, you build the procedure that describes the operation to be performed by the entity method.

3 Calling an entity method from a procedure. Once you have created an entity method, you can use it in any process procedure, another entity method, or the same entity method (the entity method calls itself). Any changes you make to an entity method are immediately reflected in all of the procedures that call the method.

Displaying the Entity Form

Whether you want to create a new entity method or modify an existing entity method, you begin by displaying the Entity form.

You access the Entity form in the E-R diagram. On this form, you define new entity methods, modify existing entity methods, and navigate to the PDL diagram for an entity method.

▼ To display the Entity form:

Double-click button 1 on the entity for which you want to create a new entity method or modify an existing entity method.

The system displays the Entity form.

Figure 9-17 shows the section of the Entity form used to define and modify entity methods.

Figure 9-17 Methods Section of the Entity Form

See illustration at chapter end.

Table 9-2 provides a brief description of each pushbutton in the Methods section of the Entity form.

Table 9-2 Pushbuttons Used for Entity Methods

| PUSHBUTTON | DESCRIPTION |
|---|---|
| Add | Adds a new entity method name to the list box. You type the name in the entry field. |
| Replace | Replaces the name of an existing entity method with a new name that you enter in the entry field. |

| PUSHBUTTON | DESCRIPTION |
|---|---|
| Delete | Deletes a selected entity method from the list box. |
| PDL | Navigates to the PDL windows where you enter PDL statements for a new or existing entity method. |

The following sections include information about using the Methods section of the Entity form.

Creating a New Entity Method

To create a new entity method, you first display the E-R diagram that contains the entity on which you want to define the entity method. You then display the Entity form, as explained in the previous section.

Using the Methods section of the Entity form, enter the name of the new entity method and then navigate to the PDL diagram for the new entity method. In the PDL diagram, you create the PDL statements for the entity method.

The following sections explain the details of creating a new entity method.

Defining a New Entity Method on the Entity Form

▼ To define a new entity method:

1. Using the Methods section of the Entity form (see Figure 9-17), type the name of the entity method in the entry field.
2. Click button 1 on the Add pushbutton or press the Enter key to submit the name.

The new name appears in the list box.

Navigating to the PDL Diagram

After defining the new entity method, you navigate from the Entity form to the PDL diagram where you can write the statements for the entity method.

▼ To navigate to the PDL diagram from the Entity form, use either of the following procedures:

- Click button 1 on the entity method name in the list box and then click button 1 on the PDL pushbutton.
- Double-click button 1 on the entity method name in the list box.

The system displays the PDL diagram shown in Figure 9-18.

Figure 9-18 PDL Diagram for an Entity Method

See illustration at chapter end.

Building PDL for an Entity Method

Using the PDL windows, you build PDL statements that describe the operations to be performed by the entity method.

The PDL Diagram window contains the METHOD node that shows the name of the entity and the name of the entity method. To the METHOD node, you can add INPUT, OUTPUT, and MODIFIES parameters. Table 9-3 explains the three METHOD node parameters.

Table 9-3 METHOD Node Parameters

| Parameter | Description |
|---|---|
| INPUT | Specifies parameters to be passed from the calling procedure to the entity method. The parameters must be set up in the calling procedure. |
| OUTPUT | Specifies parameters to be passed from the entity method to the calling procedure. The parameters must be set up in the entity method. The results are returned to the calling procedure. |
| MODIFIES | Specifies parameters that are passed to the entity method and return a result to the calling procedure if the parameters are changed by the entity method. |

You build an entity method procedure just as you build a process procedure. Begin by selecting the parent/child pin of the METHOD node to set the editing focus. You can then select choices from the Options window or type text in the Command window to add PDL statements to the entity method.

Because an entity method is defined on an entity in the E-R diagram, the PDL for an entity method must not contain statements or clauses that reference objects in the DFD diagram. Therefore, you can use the entire PDL grammar except the following statements and clauses:

- SEND statement
- RECEIVE statement
- THROUGH clause in logical access statements
- INFO_STORE clause in logical access statements The keywords in the preceding list do not appear in the Options window when you are building PDL for an entity method. In addition, the qualifier pins for THROUGH and INFO_STORE clauses do not appear on nodes that represent logical access statements.

Calling an Entity Method

Once you have created an entity method, you can use it in any process procedure, other entity method, or the same entity method. To call an entity method from a procedure, you enter a DO statement in the procedure.

The DO statement specifies the entity to which the entity method is attached and the name of the entity method. In addition, the DO statement allows you to pass values to parameters in the entity method. Figure 9-19 shows the syntax of the DO statement.

Figure 9-19 Syntax of the DO Statement

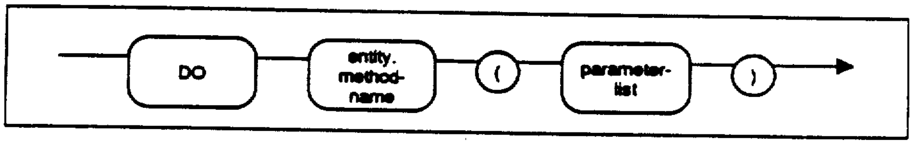

Table 9-4 explains the parameters you can pass to an entity method. See Chapter 10 for additional information about the components of the DO statement.

Table 9-4 DO Statement Parameters

| Parameter | Description |
|---|---|
| INPUT | Specifies values to be passed from the calling procedure to the INPUT parameters in the entity method. |
| OUTPUT | Specifies values to be passed from the entity method to the calling procedure. The parameter must be set up in the entity method. The result is returned to the calling procedure. |
| MODIFIES | Specifies values that are passed to the MODIFIES parameters in the entity method. If the values are changed by the entity method |

The DO statement acts on the entity set in the local store of the calling procedure. If the entity set contains more than one occurrence, the DO statement iteratively applies the entity method to each occurrence.

Figure 9-20 shows the graphical representation of the DO statement in a calling procedure. The graphical representation of the entity method extends from the parent/child pin on the lower left corner of the DO node. By default, the entity method nodes are hidden. This is indicated by the filled parent/child pin on the DO node.

Figure 9-20 DO Node in the Diagram Window

See illustration at chapter end.

▼ To display the graphical representation of the entity method:

Double-click button 1 on the parent/child pin of the DO node.

The system displays the nodes of the entity method in the Diagram window.

*Note:* The Diagram window of the calling procedure shows THROUGH and INFO_STORE pins on nodes that represent logical access statements in an entity method. This is because in a later release of the BACHMAN/Analyst, the system will prompt you to supply the DFD information as it pertains to this particular use of the entity method.

When an entity method calls itself, only the METHOD node appears when you double-click on the parent/child pin of the DO node. The system does not duplicate the other nodes in the diagram.

*Note:* In the Beta release, recursive entity method calls are not full implemented.

Editing an Entity Method

Although you can display entity method objects in any calling procedure, you cannot edit the method in the calling procedure's Diagram window. You must return to the Entity form in the E-R diagram and navigate to the PDL diagram for the entity method.

*Note:* If you have already displayed the PDL diagram for an entity method in the current session with the BACHMAN/Aanalyst and have not closed the PDL windows, you can redisplay the PDL diagram by restoring the icon in the Analyst window.

Any changes you make to an entity method are automatically made to all procedures that call that entity method.

In addition to changing the PDL for entity methods, you can change the names of entity methods and delete entity methods. These editing operations are performed on the Entity form.

Changing the Name of an Entity Method

▼ To change the name of an entity method:

1 Display the Entity form in the E-R diagram that contains the entity method.

2 From the list box in the Methods section of the Entity form, select the entity method name you want to change.

The name appears in the entry field.

3 Edit the entity method name in the entry field.

4 Select the Replace pushbutton.

Deleting an Entity Method

▼ To delete an entity method:

1 Display the Entity form in the E-R diagram that contains the entity method you want to delete.

2 From the list box in the Methods section of the Entity form, select the entity method you want to delete.

The name appears in the entry field.

3 Select the Delete pushbutton.

Derived Attributes

A *derived attribute* is an attribute whose value is calculated each time it is used in a procedure. The value is not stored in the database.

For example, for a transaction-based system, you might want to create a derived attribute, called *total-tax*, that calculates the total sales tax for each sales transaction. The following PDL statement is an example of a derivation rule you might write for *total-tax*:

**SET total-tax = subtotal-taxable * 0.05**

This derivation rule sets the derived attribute *total-tax* equal to 5% of the value of the stored attribute *subtotal-taxable*.

You might want to create another derived attribute, called *grand-total*, that calculates the grand total for the sale:

SET grand-total = total-tax + subtotal-taxable + subtotal-non-taxable

Note that the derivation rule for *grand-total* uses the derived attribute *total-tax*. A derived attribute can include any number of other derived attributes in its derivation rule.

Once you have created a derived attribute, you can use it just as you do any other attribute defined in your E-R diagram. The names of derived attributes appear in the PDL Options window so that you can select them for use in PDL statements.

There are three general steps involved in creating and modifying derived attributes:

1 Defining or modifying the name of the derived attribute on the Entity form in the E-R diagram.

2 Specifying that the attribute is derived on the Attribute form in the E-R diagram.

3 Creating or modifying the PDL that describes the derivation rule for the attribute.

The following sections explain these steps in terms of creating a new derived attribute and modifying an existing derived attribute.

Creating a New Derived Attribute

To create a new derived attribute, you begin by defining the attribute on the Entity form for the entity that you want to contain the derived attribute.

▼ To display the Entity form:

Double-click button 1 on the entity to contain the derived attribute.

The system displays the Entity form. Figure 9-21 shows the section of the Entity form used to define attributes.

Figure 9-21 Attribute Section of the Entity Form

| See illustration at chapter end. |
|---|

▼ To add the derived attribute to Attribute section of the Entity form:

1. Type a number in the first entry field to indicate where you want to place the derived attribute in relation to the other attributes in the list box.
2. Type the name for the derived attribute in the second entry field.
3. Select the Add pushbutton to add the name to the list box.

After defining the derived attribute, you navigate from the Entity form to the Attribute form.

▼ To navigate to the Attribute form:

Double-click button 1 on the derived attribute name in the list box.

The system displays the Attribute form. Figure 9-22 shows the section of the Attribute form used to specify an attribute as derived.

Figure 9-22 Source Information Section of the Attribute Form

| See illustration at chapter end. |
|---|

Using the Source Information section of the Attribute form, you specify that the attribute is a derived attribute and then navigate to the PDL diagram where you create the derivation rule.

▼ To specify that the attribute is derived:

Select the Derived radio button.

The PDL pushbutton becomes active to indicate that you can use it to navigate to the PDL diagram for the derived attribute.

▼ To navigate to the PDL diagram:

Select the PDL pushbutton.

The system displays the diagram shown in Figure 9-23.

Figure 9-23 PDL Diagram for a Derived Attribute

See illustration at chapter end.

Building PDL for a Derived Attribute

Using the PDL windows, you build the PDL statements that specify the derivation rule for the derived attribute.

The PDL Diagram window contains the ATTRIBUTE DERIVATION node which shows the name of the entity and the name of the derived attribute. You build the PDL statements for a derived attribute just as you do for a process procedure or an entity method. Begin by selecting the parent/child pin of the ATTRIBUTE DERIVATION node to set the editing focus. You can then select choices from the Options window or type text in the Command window to add PDL statements for the derived attribute.

Because a derived attribute is defined on an entity in the E-R diagram, the PDL for a derived attribute must not contain statements or clauses that reference objects in the DFD diagram. Therefore, you can use the entire PDL grammar except the following statements:

- Logical access statements (CREATE, DELETE, RETRIEVE, and UPDATE)
- DO
- SEND
- RECEIVE
- ABORT
- COMMIT The keywords in the preceding list do not appear in the Options window when you are building PDL for a derived attribute.

The PDL for a derived attribute must include a SET statement that sets the value of the derived attribute.

Editing a Derived Attribute

At any time, you can modify the PDL for a derived attribute, change the name of a derived attribute, or delete a derived attribute.

Modifying the PDL for a Derived Attribute

▼ To modify the PDL for a derived attribute:

1 Display the Entity form as explained in the section Creating a New Derived Attribute.

2 Navigate from the Entity form to the Attribute form by double-clicking button 1 on the name of the derived attribute in the Attributes list box.

3 In the Source Information section of the Attribute form, select the PDL pushbutton.

The system displays the PDL windows and the diagram for the derived attribute.

4 Using the PDL windows, modify the PDL for the derived attribute.

Changing the Name of a Derived Attribute

▼ To rename a derived attribute:

1 Display the Entity form as explained in the section Creating a New Derived Attribute.

2 Select the name of the derived attribute in the Attributes list box.

The name of the derived attribute appears in the Attribute entry field.

3 Type the new name for the derived attribute in the Attribute entry field.

4 Select the Replace pushbutton.

The new name appears in the Attributes list box.

Deleting a Derived Attribute

▼ To delete a derived attribute:

1 Display the Entity form as explained in the section Creating a New Derived Attribute 2 Select the name of the derived attribute in the Attributes list box.

The name appears in the Attribute entry field.

3 Select the Delete pushbutton.

The system deletes the derived attribute from the list box and from the entry field.

Chapter 10
PDL Reference

You use the Process Description Language (PDL) to write specifications that describe the business logic of primitive processes in a corresponding Data Flow Diagram (DFD). The beginning sections of this chapter provide reference information about expressions and handling exception and error conditions. The remainder of this chapter provides detailed reference information about each of the PDL statements you can use to write specifications.

Expressions

An expression consists of literals, attribute references, process local store references, and variables combined with operators or built-in functions. Expressions can perform arithmetic operations, comparisons, and special functions.

The following sections explain the PDL operators and functions.

Operators

*Operators* are the symbols or keywords you use to perform arithmetic, comparison, or logical operations. Table 10-1 shows the operators you can use in expressions.

Table 10-1 PDL Operators

| Operator | Description |
|---|---|
| + | Adds two numeric expressions. |
| - | Subtracts one numeric expression from another. |
| * | Multiplies two numeric expressions. |
| / | Divides one numeric expression by another. |
| IDIV(*number1, number2*) | Divides one numeric expression by another to produce an integer result. |
| REMAINDER(*number1, number2*) | Returns the remainder after integer division. |
| POWER(*number1, number2*) | Raises *number1* to the power of *number2*. |
| ROUND(*number* [*,decimal-places*]) | Rounds a numeric expression to the specified number of decimal places. If *decimal-places* is omitted |
| NEGATE(*number*) | Negates a numeric expression. |
| ABS(*number*) | Computes the absolute value of a numeric expression. |
| SQR(*number*) | Returns a number squared. |

| Operator | Description |
|---|---|
| SQRT(*number*) | Returns the square root of a numbe |
| = | Returns a true value if two expressi equal. |
| <> | Returns a true value if two expressi not equal. |
| < | Returns a true value if the first of tv expressions is less than the second. |
| > | Returns a true value if the first of tv expressions is greater than the seco |
| <= | Returns a true value if the first of tv expressions is less than or equal to second. |
| >= | Returns a true value if the first of tv expressions is greater than or equa second. |
| OR | Returns a true value if either of two expressions is true. |
| AND | Returns a true value if each of two expressions is true. |

Table 10-2 shows the order in which the system processes the operator: order of precedence is shown from highest to lowest and from left to ri

Table 10-2 Order of Precedence of PDL Operators

| Precedence | Operators |
|---|---|
| Highest | POWER |
| | * / IDIV REMAINDER |
| | + − |
| | < > <= >= |
| Lowest | = <> |

You can use parentheses ( ) to override the order of precedence.

Literals

Your PDL procedures can include the following literals:

- Numbers
- Character strings enclosed in quotation marks
- The keyword TRUE
- The keyword FALSE

Functions

PDL provides built-in functions that you can use to perform operation individual values, groups of values, entity sets, character strings, dates times. The following sections describe these types of PDL functions.

Aggregate Functions

Aggregate functions operate on groups of values or on entity sets. Table 10-3 shows the PDL aggregate functions, their arguments, and a brief description of each.

Table 10-3 Aggregate Functions

| Function(Argument) | Description |
|---|---|
| AVERAGE(*number1, number2...*) | Computes the average of a group of values. |
| COUNT(*value1, value2...*) | Counts the number of values in a group. |
| MINIMUM(*value1, value2...*) | Returns the lowest value in a group. |
| MAXIMUM(*value1, value2...*) | Returns the highest value in a group. |
| SUM(*number1, number2...*) | Computes the total of the values in a group. |
| STDDEV(*number1, number2...*) | Computes the standard deviation of the values in a group. |
| VARIANCE(*number1, number2...*) | Computes the variance of the values in a group. |

Entity Set Functions

Entity set functions operate on groups of entity occurrences, called *entity sets*. Table 10-4 shows the PDL functions that operate on entity sets.

Table 10-4 Entity Set Functions

| Function(Argument) | Description |
|---|---|
| REMOVE_DUPLICATES(*entity-set*) | Removes duplicate occurrences from an entity set. |
| COMBINE(*entity-set1, entity-set2*) | Concatenates two entity sets. Use REMOVE_DUPLICATES to remove duplicate occurrences after the concatenation. |
| FIND_DIFFERENCE(*entity-set1, entity-set2*) | Returns occurrences that are not common to two entity sets. |
| FIND_COMMON(*entity-set1, entity-set2*) | Returns the intersection of two entity sets. |
| CONTAINS(*entity-set1, entity-set2*) | Returns true if *entity-set1* contains *entity-set2*. |
| MATCHES(*entity-set1,,entity-set2*) | Returns true if *entity-set1* matches *entity-set2*. The entity set comparison is order independent. |

String Functions

String functions operate on character strings. Table 10-5 shows the PDL string functions, their arguments, and a brief description of each.

Table 10-5 String Functions

| Function(Argument) | Description |
|---|---|
| CONCAT(*string1, string2*) | Concatenates two string values. |
| SUBSTRING(*string, start, length*) | Returns part of a string value given the starting position and length of the substring. |

Date Functions

Date functions return date values. Table 10-6 shows the PDL date functions, their arguments, and a brief description of each.

Table 10-6 Date Functions

| Function(Argument) | Description |
|---|---|
| YEAR(*date*) | Returns the year given a date. |
| MONTH(*date*) | Returns the month given a date. |
| DAY(*date*) | Returns the day given a date. |
| WEEK_OF_THE_YEAR(*date*) | Returns the week of the year given a date. |
| WEEK_OF_THE_MONTH(*date*) | Returns the week of the month given a date. |
| DAY_OF_THE_YEAR(*date*) | Returns the day of the year given a date. |
| DAY_OF_THE_MONTH(*date*) | Returns the day of the month given a date. |
| DAY_OF_THE_WEEK(*date*) | Returns the day of the week given a date. |

Time Functions

Time functions return time values. Table 10-7 shows the PDL time functions, their arguments, and a brief description of each.

Table 10-7 Time Functions

| Function(Argument) | Description |
|---|---|
| HOUR(*time*) | Returns the hour of the specified time. |
| MINUTES(*time*) | Returns the minutes of the specified time. |
| SECONDS(*time*) | Returns the seconds of the specified time. |
| SECONDS_SINCE_MIDNIGHT(*time*) | Returns the number of seconds since midnight. |

Handling Exception and Error Conditions

The system provides a set of default conditions for which it tests and then signals if the condition exists. When a particular condition is signaled, the system searches for an associated condition handler. The condition handler specifies the action to take for the condition.

Table 10-8 lists the system default conditions and a brief description of each. The table groups the conditions by the PDL statements in which they are used.

Table 10-8 PDL Default Conditions

| STATEMENT | CONDITION | DESCRIPTION |
|---|---|---|
| Logical Access | ABORT | Signals a fatal error; used to handle abnormal termination. ABORT automatically rolls back the changes specified by the transaction. |
| | DUPLICATE | Signals duplicate entity occurrences. |
| | EMPTY | Signals an entity set that is null. |
| SEND and RECEIVE | EMPTY | Signals an entity set that is null. |
| FOREACH | DUPLICATE | Signals duplicate occurrences in an entity set. |
| | EMPTY | Signals an entity set that is null. |
| | ONE | Signals that there is only one entity occurrence in the entity set. |
| | BEGIN | Signals before the processing of any entity occurrences begins. |
| | FIRST | Signals before processing the first entity occurrence. |
| | LAST | Signals before processing the last entity occurrence. |
| | EXIT | Signals that processing has ended; exits the iteration block. |
| | BETWEEN | Signals between processing of entity occurrences. |
| | END | Signals after processing all entity occurrences. |
| | END_GROUP | Signals after processing a group of entity occurrences. The group is specified in a GROUP BY clause. |
| | SKIP | Signals when an entity occurrence is skipped. The skipped occurrences are specified by a WHERE clause. |
| CASE | OTHERWISE | Specifies the action to take when none of the *expressions* matches the value of the *case-selector*. |

To use a system default condition, you do not have to write PDL statements to test for or signal that the condition exists. You just write the condition handler (WHEN clause) that specifies the action to take when a particular condition arises.

For example, if you want to run a body of PDL statements between iterations of a FOREACH block, you add the following clause to the condition pin on the FOREACH node:

WHEN BETWEEN

To the parent/child pin of the WHEN node, add the statements you want to execute between iterations of the FOREACH block.

You can explicitly signal any of the system default conditions by including a SIGNAL statement in your procedures. As an argument to the SIGNAL statement, you specify the condition to be signaled and any parameters you want to pass to the condition handler.

The system also provides ABORT, EXIT, and SKIP statements that automatically invoke a SIGNAL statement. You can either use the ABORT, EXIT, or SKIP statement, or use ABORT, EXIT, or SKIP as an argument to the SIGNAL statement. For more information about these control transfer statements, see the ABORT, EXIT, SKIP, and SIGNAL Statement sections in this chapter.

PDL Statements

The remainder of this chapter describes the PDL statements. The statements are listed in alphabetical order and each statement description begins on a new page.

Each section that describes a PDL statement provides the following information:

- A brief description of the statement
- The syntax of the statement
- A description of each component shown in the syntax
- Notes that explain special information about the statement or provide hints using the statement
- One or more examples that illustrate the use of the statement

*Note:* In the Beta documentation, only the logical access statements (RETRIEVE, CREATE, UPDATE, and DELETE) and the SEND and RECEIVE statements have examples.

The syntax for each statement is shown as a *syntax diagram*. A syntax diagram defines the syntax by showing the following:

- Each of the components of the statement, including keywords, identifiers, and expressions.
- Required and optional information.
- The order in which you must enter the components.

In a syntax diagram, each component of the statement is shown in a box with rounded corners. The order in which you enter the components is indicated by the left-to-right, top-to-bottom flow of the lines that connect the components. Any component that appears on the top line of the diagram is required. All other components are optional.

Following each syntax diagram is a description of each of the statement's components. Some of the component descriptions are illustrated with additional syntax diagrams.

PDL keywords are shown in uppercase. All other components are shown in lowercase.

*Note:* PDL keywords are not reserved words. This means that you can have E-R diagram and DFD objects with names that are also keywords. The system distinguishes the meaning of a word by its position within a PDL statement.

ABORT Statement
The ABORT statement signals a fatal error and rolls back all changes specified by the transaction. It transfers control to the ABORT condition handler.
Syntax
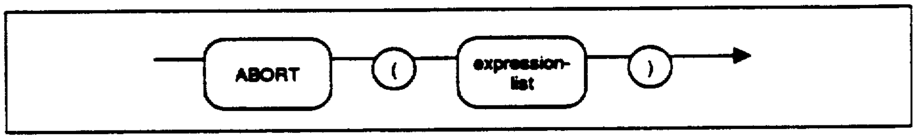
(expression-list)
A list of user-defined parameters to be passed to the ABORT condition handler.
Notes
The ABORT statement cannot be used in derived attribute procedures.

CASE Statement

The CASE statement executes one of several possible statement lists depending on the value of an expression. It compares several possible values to the value of the *case selector.*

Syntax

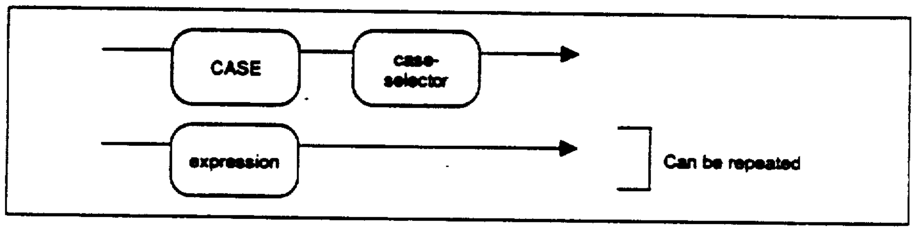

CASE case-selector

The *case-selector* is an expression that resolves to the value with which you want to compare the possible values.

expression

One of the possible values of the *case-selector.* Enter one expression for each possible value of the *case-selector.* Follow each expression with a statement list (see the Notes section).

Notes

Enter the CASE *case-selector* component and each *expression* as a separate statement in the Command window. Then, add a statement list to the parent/child pin of each *expression* node. Each statement list specifies the action to take when an *expression* matches the value of the *case-selector.*

To the condition pin of the CASE *case-selector* node, you can add the OTHERWISE condition handler followed by a list of statements to be executed when none of the *expressions* matches the value of the *case-selector.* For more information, see the section Handling Exception and Error Conditions.

COMMIT Statement

The COMMIT statement transfers process results to information store. You can use the COMMIT statement at any time to apply the current results to the information store.

Syntax

The COMMIT statement consists of the the keyword COMMIT.

Notes

An implicit COMMIT statement occurs when a process has successfully completed. You can, however, explicitly commit process results by including a COMMIT statement anywhere in your procedure.

The COMMIT statement cannot be used in derived attribute procedures.

CREATE Statement

The CREATE statement is a logical access statement that creates new entity occurrences in an information store.

Syntax

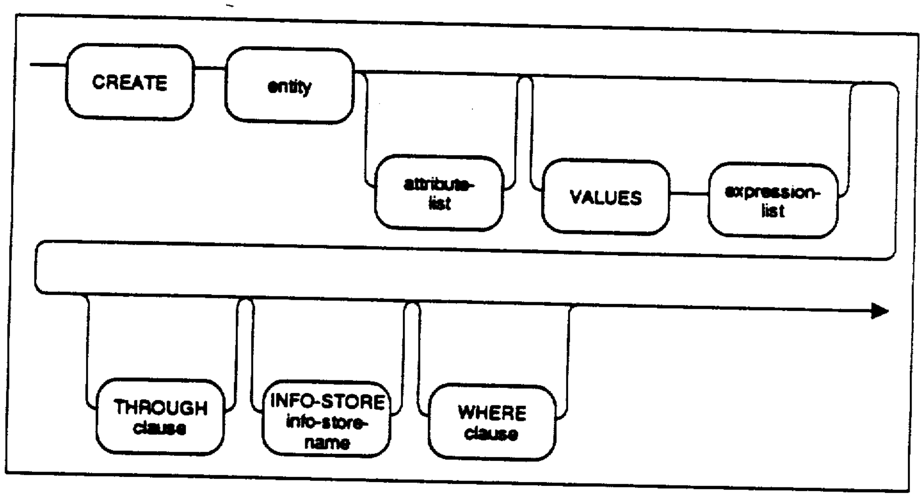

entity

The name of the entity in which you want to create an entity occurrence.

attribute-list

The names of the attributes into which you want to insert values. The attribute list must include all mandatory key values and all attributes that are defined as not null.

*Note:* In the Beta release, the system does not enforce this mandatory key and not null restriction.

VALUES expression-list

The information to be inserted into each of the attributes. Each expression must contain one and only one value for an attribute named in the *attribute-list*. You must enter the values in the same order in which you entered the attributes.

If you omit the *attribute-list*, the VALUES clause must contain a value for each attribute in the specified entity. If you omit both the attribute list and the VALUES clause, the CREATE statement creates an entity occurrence with null values.

THROUGH clause

The optional THROUGH clause specifies the information flow through which you want to create the entity occurrence. Only one information flow is allowed.

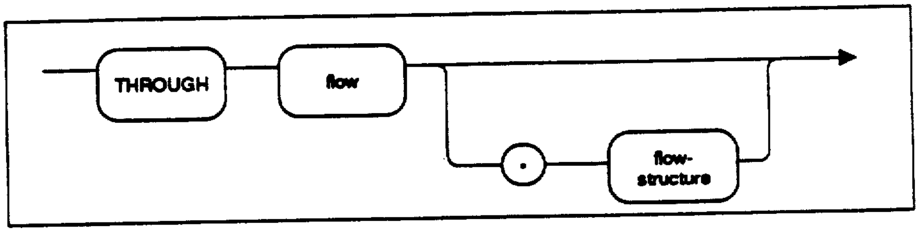

If you omit the THROUGH clause and an information flow does not exist from the current process to the specified information store, or you specify the name of a new information flow, the system displays the Specify an Information Flow pop-up window when you submit the statement. This window allows you to create a new information flow or use an existing information flow. If you choose to create a new information flow, you can either accept the default name shown in the entry field or type another name. The default name is either the name you specified in the THROUGH clause or a system-generated name. The system default name consists of the word "Flow" and the source and destination of the information flow (Flow-*source-destination*). See Appendix C for more information about the Specify an Information Flow pop-up window.

INFO_STORE info-store-name

An optional information store name. If you enter the name of a new information store, the system creates it in the DFD.

If you omit the INFO_STORE clause and the default-named information store does not exist, or you specify the name of a new information store, the system displays the Specify an Information Store pop-up window when you submit the statement. This pop-up window allows you to create a new information store or use an existing information store. If you choose to create a new information store, you can either use the default name shown in the entry field or type another name. The default name is either the name you supplied in the INFO_STORE clause or a system-generated name that is the same as the entity name specified for the create operation. See Appendix C for more information about the Specify an Information Store pop-up window.

WHERE clause

The optional WHERE clause specifies search conditions that determine the entity occurrences to create. The components on each side of the AND or OR in the Boolean expression must include an attribute contained in the entity specified in the entity component.

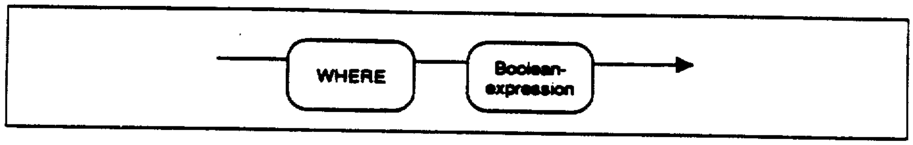

Notes

The THROUGH and INFO_STORE clauses are not allowed on a CREATE statement in entity method procedures. See Chapter 9 for more information about entity methods.

The CREATE statement cannot be used in derived attribute procedures. See Chapter 9 for more information about derived attributes.

Example

```
CREATE products code, item, description, price
      VALUES 'T179", 'pliers', 'electrical', '9.95'
      THROUGH new_products INFO_STORE products
```

DELETE Statement

The DELETE statement is a logical access statement that deletes entity occurrences from information stores.

Syntax

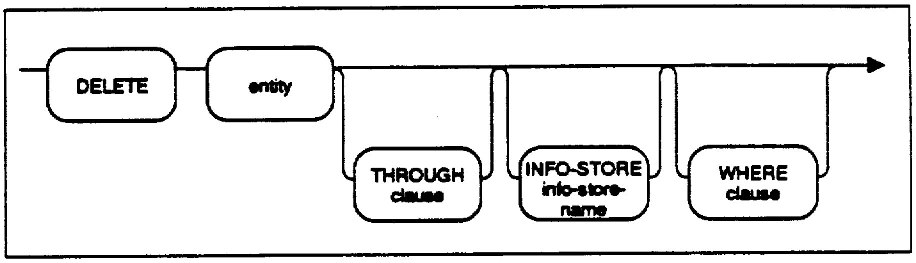

entity

The name of the entity from which you want to delete information.

THROUGH clause

The optional THROUGH clause specifies the information flow through which you want to delete the information. Only one information flow is allowed.

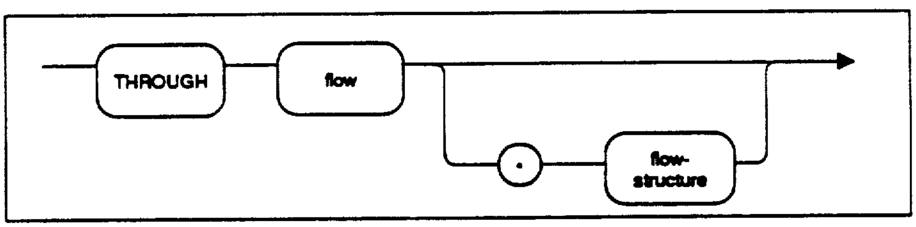

If you omit the THROUGH clause and the information flow does not exist from the current process to the specified information store, or you specify the name of a new information flow, the system displays the Specify an Information Flow pop-up window when you submit the statement. This window allows you to create a new information flow or use an existing information flow. If you choose to create a new information flow, you can either accept the default name shown in the entry field or type another name. The default name is either the name you specified in the THROUGH clause or a system-generated name. The system default name consists of the word "Flow" and the source and destination of the information flow (Flow-*source-destination*). See Appendix C for more information about the Specify an Information Flow pop-up window.

INFO_STORE info-store-name

An optional information store name. If you enter the name of a new information store, the system creates it in the DFD.

If you omit the INFO_STORE clause and the default-named information store does not exist, or you specify the name of a new information store, the system displays the Specify an Information Store pop-up window when you submit the statement. This pop-up window allows you to create a new information store or use an existing information store. If you choose to create a new information store, you can either use the default name shown in the entry field or type another name. The default name is either the name you supplied in the INFO_STORE clause or a system-generated name that is the same as the entity name specified for the delete operation. See Appendix C for more information about the Specify an Information Store pop-up window.

WHERE clause

The optional WHERE clause specifies search conditions that determine the entity occurrences to delete. The components on each side of the AND or OR in the Boolean expression must include an attribute contained in the entity specified in the *entity* component.

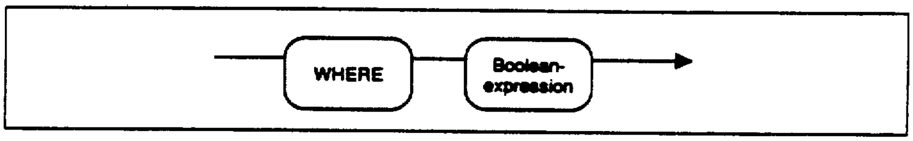

If you omit the WHERE clause, the system displays the Confirm Missing WHERE Clause pop-up window. This window warns you that the DELETE statement will act on all occurrences of the specified entity. See Appendix C for more information about this pop-up window.

Notes

The THROUGH and INFO_STORE clauses are not allowed on a DELETE statement in entity method procedures. See Chapter 9 for more information about entity methods.

The DELETE statement cannot be used in derived attribute procedures. See Chapter 9 for more information about derived attributes.

Example

```
DELETE customer THROUGH customer-data INFO_STORE customer
  WHERE customer-num = 3467
```

DO Statement

The DO statement calls an entity method from a process procedure, another entity method, or the same entity method.

Syntax

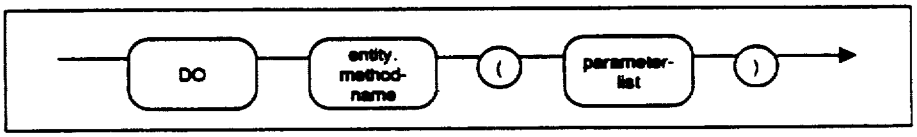

entity.method-name

Specifies the name of the entity to which the entity method is attached and the name of the entity method. Use a period (.) to separate the entity name from the entity method name.

(parameter-list)

Defines parameters to be used by the entity method. INPUT *expression-list* defines parameters to be passed from the process procedure to the entity method. The parameters must be set up in the process procedure before they are passed to the enity method. OUTPUT *expression-list* defines parameters to be passed from the enity method to the process procedure. The parameters must be set up in the entity method. The results are returned to the process procedure. MODIFIES *expression-list* defines parameters that are passed to the entity method and return a result to the process procedure if the parameters are modified by the entity method.

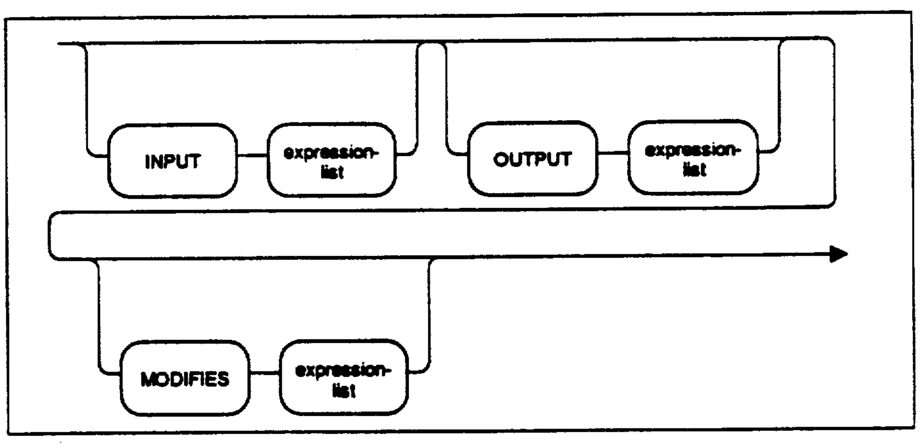

Notes

When a DO statement calls an entity method from a process procedure or another entity method, the system includes the entity method objects in the procedure's diagram. For a recursive call of an entity method (an entity method calls itself), the system includes only the METHOD node in the diagram.

In the Beta release, recursive calls of entity methods are not allowed.

By default, the entity method branch is hidden. A filled parent/child pin on the DO node indicates that the entity method is included but hidden. To display the entity method objects, double-click button 1 on the parent/child pin of the DO node.

Although you can display the entity method objects in the calling procedure's diagram window, you cannot edit the entity method there. You must return to the E-R diagram that contains the entity method and display the Entity form for the entity. From the Entity form, you can navigate to the PDL diagram for the entity method. For more information about creating and modifying entity methods, see Chapter 9.

The DO statement cannot be used in derived attribute procedures. See Chapter 9 for more information about derived attributes.

EXIT Statement
The EXIT statement is used in iteration blocks (FOREACH and LOOP statements). It terminates the iteration statement and transfers control to the EXIT condition handler (if defined) or to the statement following the iteration block.
Syntax
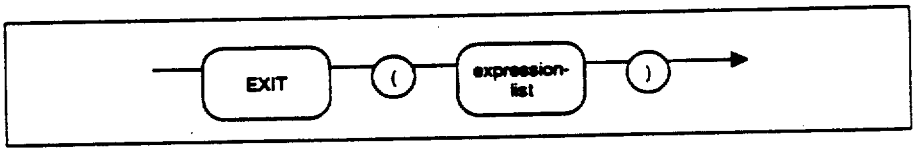
(expression-list)
A list of user-defined parameters to be passed to the condition handler.

FOREACH Statement

The FOREACH statement starts an iterating block, processing a single entity occurrence on each iteration until a specified condition is met. The condition can be either of the following:

- The condition under which processing continues (WHILE clause).
- The condition under which processing stops (UNTIL clause).

Syntax

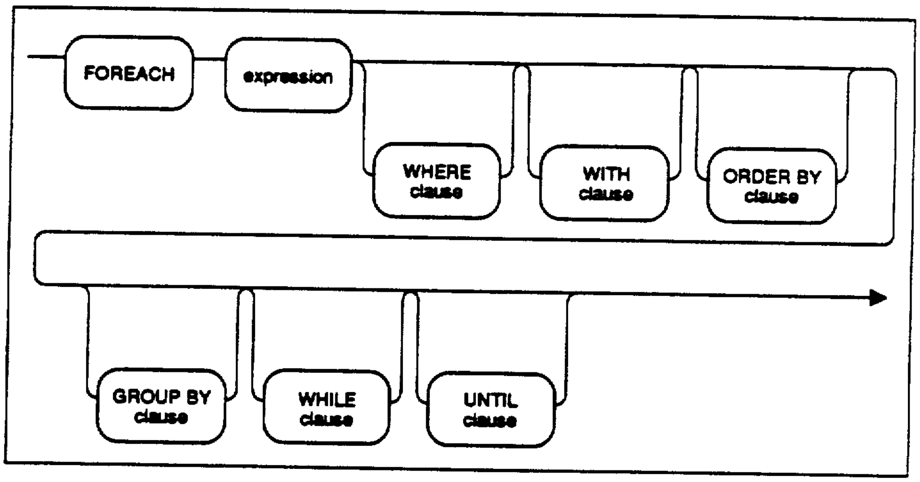

expression

Identifies the set of entity occurrences to be processed.

WHERE clause

The optional WHERE clause consists of a Boolean expression that specifies conditions under which you want the information to be processed.

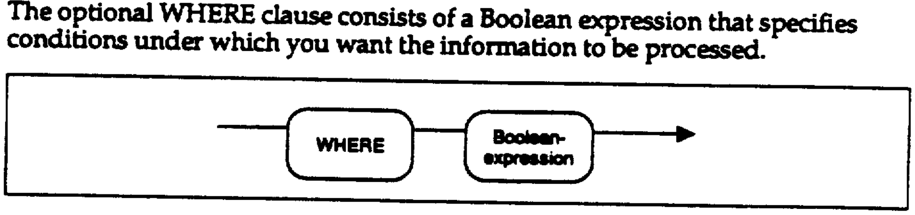

WITH clause

The optional WITH clause creates an alias for an entity occurrence.

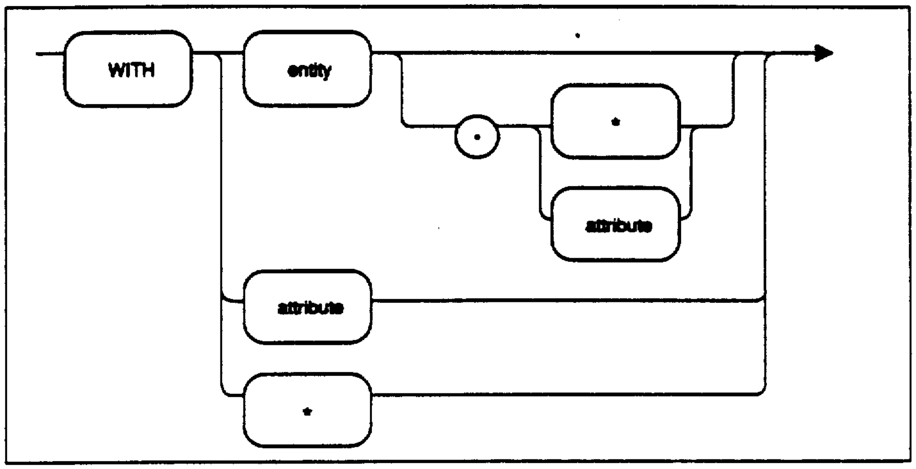

ORDER_BY clause

The optional ORDER_BY clause sorts the information by one or more attribute names or expressions. The default sort order is ascending. To sort in descending order, use the keyword DESC.

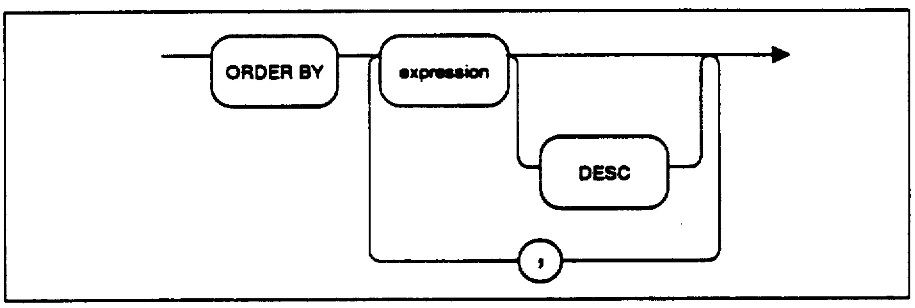

GROUP BY clause

The optional GROUP BY clause arranges the information into conceptual groups based on the value of one or more attributes.

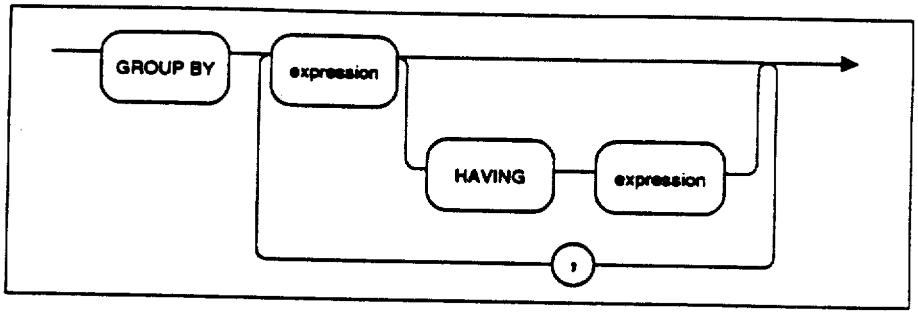

HAVING clause

If you specify a GROUP BY clause, the FOREACH statement can also have an optional HAVING clause. The HAVING clause specifies search conditions that determine the groups to be processed.

WHILE clause

Specifies the condition under which you want the FOREACH block to continue processing the statements within it. The FOREACH block continues iterating as long as the condition is true.

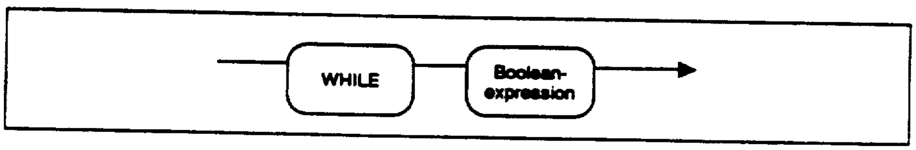

UNTIL clause

Specifies the condition under which you want the FOREACH block to stop processing the statements within it. The FOREACH block continues iterating as long as the condition is true. The UNTIL clause is equivalent to WHILE NOT.

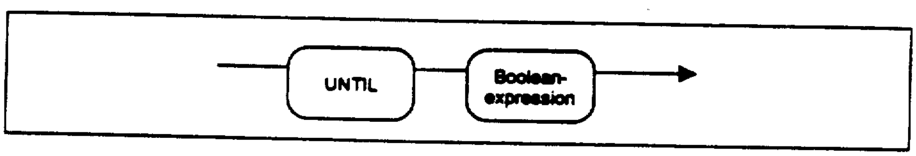

Notes

After entering the FOREACH statement, enter the statements to be executed on each iteration of the block. Add these statements to the parent/child pin of the FOREACH node.

IF Statement

The IF statement makes the execution of a block of statements conditional, as follows:

- If the expression following the keyword IF is true, the system executes the statements following the keyword THEN.
- If the expression following the keyword IF is false, the system evaluates the expression following the keyword ELSEIF.
- If the ELSEIF expression is true, the system executes the statements that follow that expression.
- If the ELSEIF expression is false, the system evaluates the expression following the next ELSEIF keyword (if any).
- If all the expressions following the IF and ELSEIF keywords evaluate to false, the system executes the statements following the keyword ELSE.

Syntax

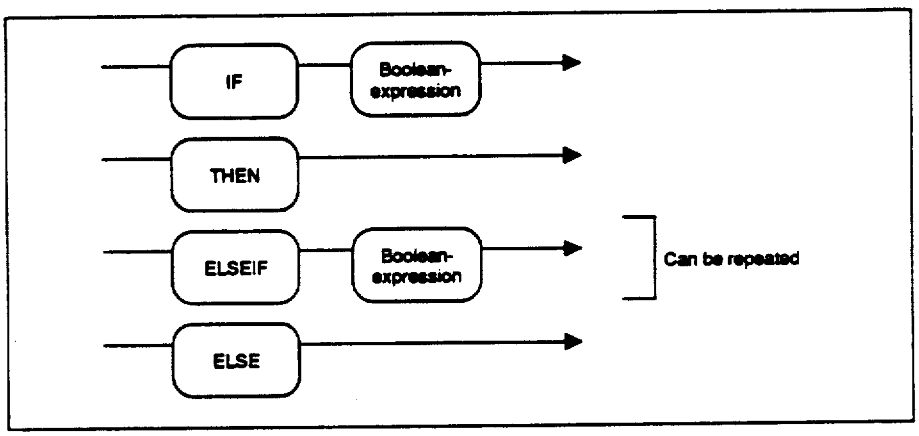

IF expression

Specifies the first condition to be evaluated. The expression must resolve to a logical (true/false) result.

THEN

When you press the RETURN key to submit the IF *expression* component, the system automatically adds the THEN component to the diagram. You do not have to enter THEN in the Command window.

ELSEIF expression

The expression to be evaluated when the IF *expression* is false. You can have multiple ELSEIF components, each followed by a statement list. If you do not include an ELSEIF component, the system executes the statement list following the ELSE component when the IF *expression* is false.

ELSE

Indicates that the following statements (*else-statement-list*) are to be processed when all preceding expressions in the IF statement evaluate to false.

Notes

Enter each component of the IF statement (except THEN), shown in the Syntax section, as a separate statement. After you enter the IF, ELSEIF, and ELSE components, enter an appropriate list of statements to be executed if the preceding expression is true. You add the statement lists to the parent/child pin of the IF, ELSEIF, and ELSE nodes.

Selection of certain pins attached to an IF statement node is restricted because the insertion of statements either preceding or following those pins is invalid. You cannot select the parent/child pin attached to the IF node or the root pins attached to the THEN and ELSEIF nodes. You can, however, select the root pin attached to the ELSE node, which allows you to insert additional ELSEIF components.

LOOP Statement

The LOOP statement starts an iterating block, processing the statements within the block until a specified condition is met. The condition can be:

- The number of times you want the block to iterate (TIMES clause)
- The condition under which processing continues (WHILE clause)
- The condition under which processing stops (UNTIL clause)

Syntax

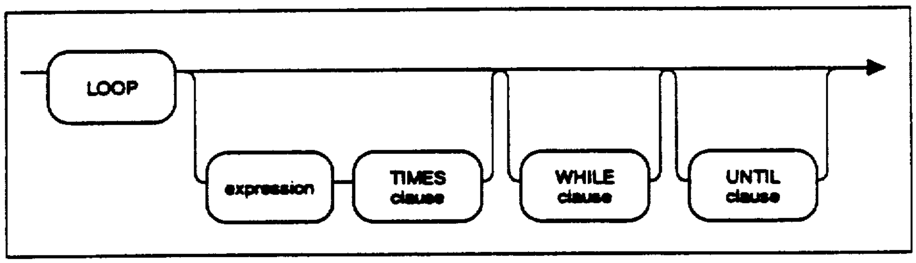

expression TIMES

The number of times you want the block of statements to iterate. The expression must resolve to an integer.

WHILE clause

Specifies the condition under which you want the LOOP block to continue processing the statements within it. The LOOP block continues iterating as long as the condition is true.

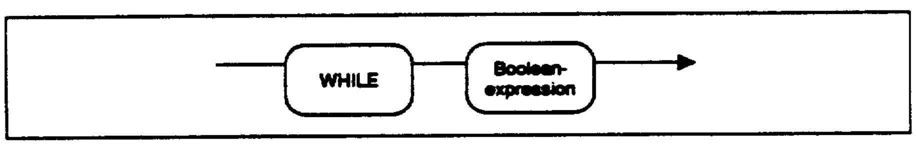

UNTIL clause

Specifies the condition under which you want the LOOP block to stop processing the statements within it. The LOOP block continues iterating as long as the condition is true. The UNTIL clause is equivalent to WHILE NOT.

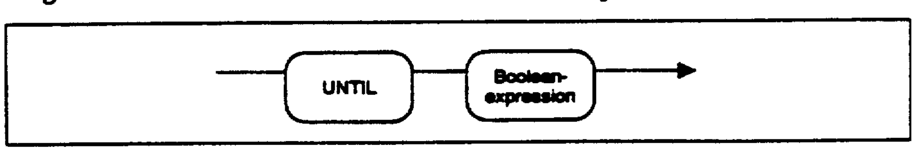

Notes

After entering the LOOP statement, enter the statements to be executed on each iteration of the block. Add these statements to the parent/child pin of the LOOP node.

NOTE Statement
The NOTE statement adds comments to your PDL specification.
Syntax
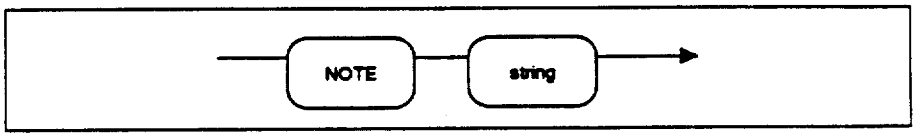
string
Specifies the text of the comment you want to include in your PDL specification.

RECEIVE Statement

The RECEIVE statement specifies the source of the information entering the process. It creates an information flow from a specified process or source/destination to the process for which you are currently specifying PDL.

Syntax

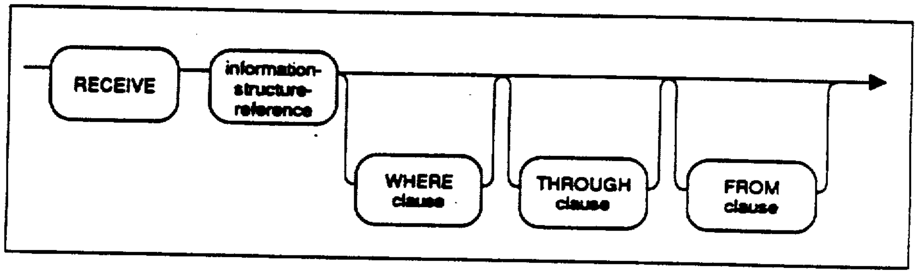

info-structure-reference

Specifies the information to be received for processing. The information can be a list of attribute references or *entity.** to indicate all attributes of a particular entity. An attribute reference can be an attribute name or a qualified attribute name (*entity.attribute*).

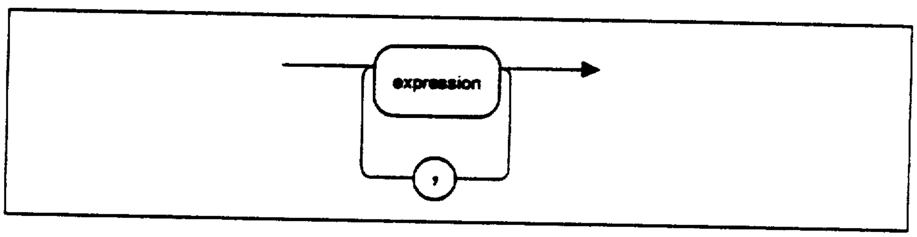

WHERE clause

The optional WHERE clause specifies search conditions that determine the information to receive. The components on each side of the AND or OR in the Boolean expression must include an attribute contained in an entity named in the FROM clause. If you omit the WHERE clause, all of the information qualifies for the operation.

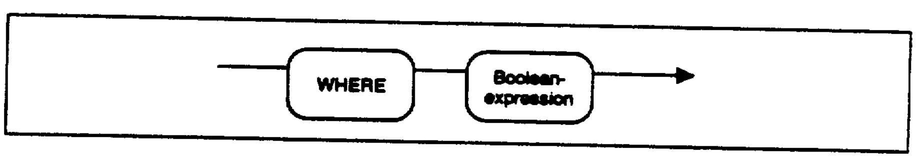

THROUGH clause

The optional THROUGH clause specifies the information flow through which you want to receive the information. Only one information flow is allowed.

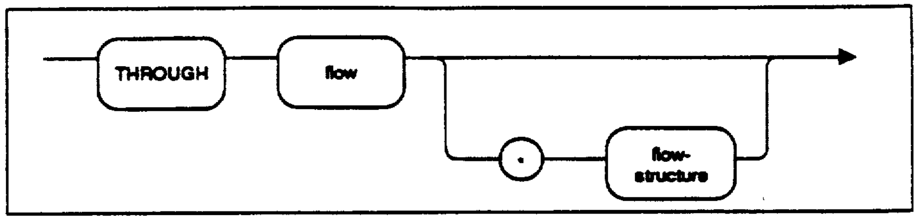

If you omit the THROUGH clause and an information flow does not exist from the specified process or source/destination to the current process, or you specify the name of a new information flow, the system displays the Specify an Information Flow pop-up window when you submit the statement. This window allows you to create a new information flow or use an existing information flow. If you choose to create a new information flow, you can either accept the default name shown in the entry field or type another name. The default name is either the name you specified in the THROUGH clause or a system-generated name. The system default name consists of the word "Flow" and the source and destination of the information flow (Flow-*source-destination*). See Appendix C for more information about the Specify an Information Flow pop-up window.

FROM clause

The optional FROM clause specifies the process or source/destination object from which the information is to be received. If you enter a process name, it must be a process other than the one for which you are currently specifying PDL. When you specify a process in the FROM clause, the system generates the appropriate SEND statement for that process.

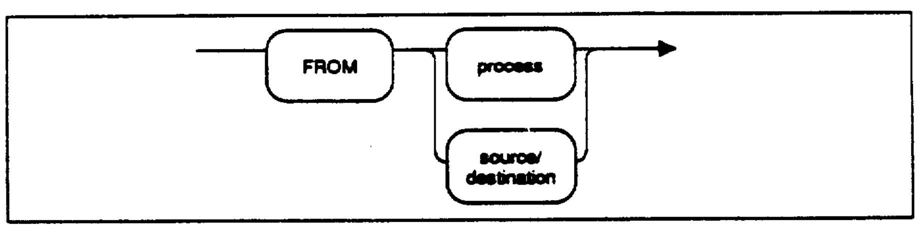

If the process or source/destination does not exist or is invalid, the system displays the Specify or Source/Destination pop-up window. This window allows you to create a new process or source/destination, or to use an existing process or source/destination. See Appendix C for more information about this pop-up window.

Notes

The RECEIVE statement cannot be used in entity method and derived attribute procedures. See Chapter 9 for more information about entity methods and derived attributes.

Example

```
RECEIVE 'cust-sales-history'.'cust-sales-total',
    'customer'.'cust-num', 'item'.'item-price'
    THROUGH 'flow-process-order'
    FROM 'different-process'
```

RESUME Statement
The RESUME statement is used in condition handlers. It indicates that the condition handler completed successfully and transfers control to the statement following the SIGNAL statement that raised the condition.
Syntax
The RESUME statement consists of the keyword RESUME.

RETRIEVE Statement

The RETRIEVE statement is a logical access statement that specifies the information you want to select for processing.

Syntax

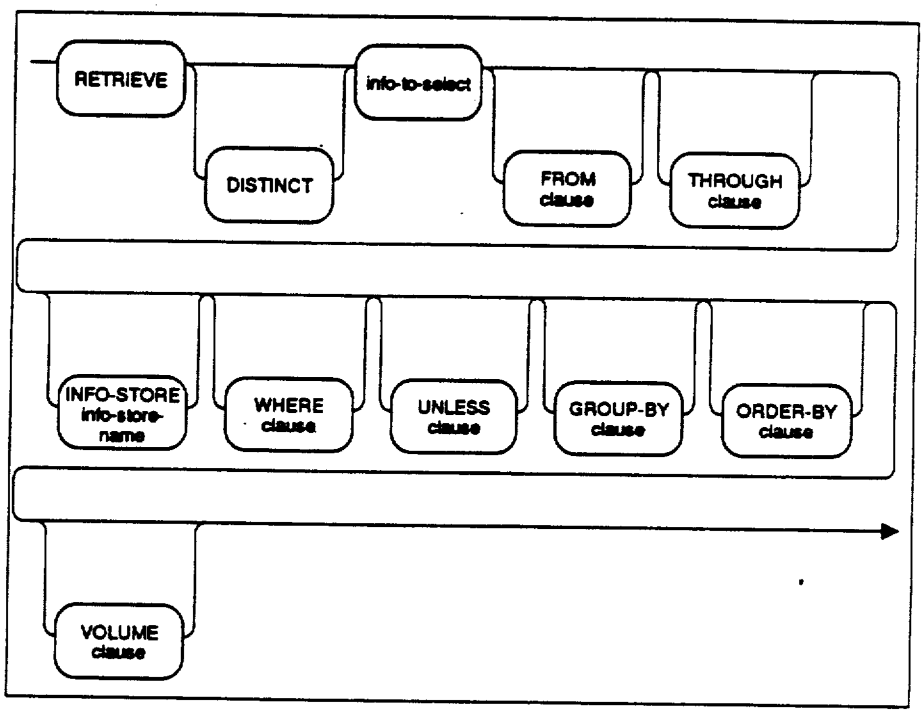

DISTINCT

The optional keyword DISTINCT retrieves only unique values from the specified list of information. If you omit the keyword DISTINCT, all entity occurrences qualify for selection.

info-to-select

The attributes you want to retrieve. You can specify either a comma-separated list of attribute references or an asterisk (*) to indicate all attributes. An attribute reference can be an attribute name, a qualified attribute name (*entity.attribute*), or a prefix expression that includes an attribute name or a qualified attribute name.

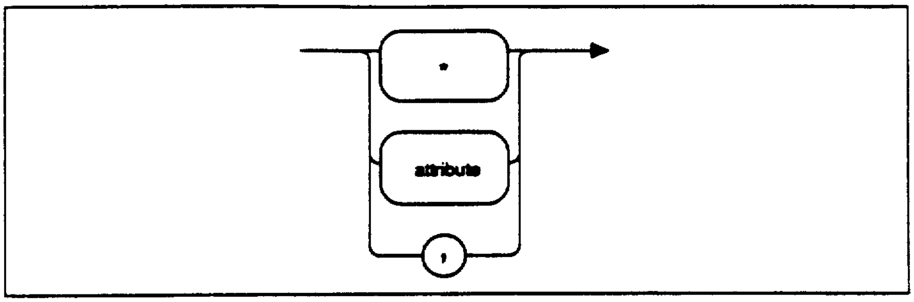

If an unqualified attribute is defined in more than one entity specified in the FROM clause, the system displays the Select an Entity pop-up window when you submit the statement. If you use an asterisk for the *info-to-select*, the system displays the Define an Asterisk pop-up window for you to specify the meaning of the asterisk in the current statement. See Appendix C for more information about these pop-up windows.

FROM clause

The optional FROM clause specifies the entities from which you want to retrieve the information. Each attribute specified in the *info-to-select* must be contained in an entity specified in the FROM clause.

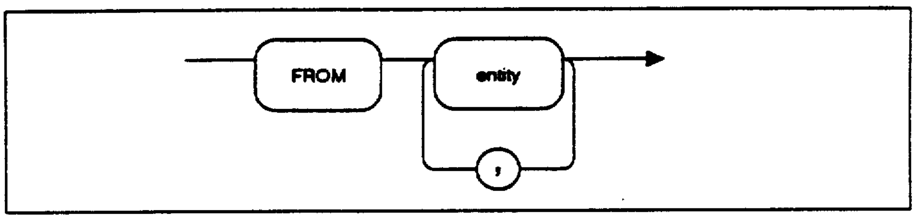

If the *info-to-select* is a list of attributes and you use the TAB key to automatically complete the FROM clause, the system derives the entity names from the list of attributes. If the *info-to-select* is an asterisk, the system displays the Select an Entity pop-up window when you press the Tab key.

If the *info-to-select* is a list of attributes and you omit the FROM clause, the system derives the entity name from the list of attributes when you submit the statement. If the *info-to-select* is an asterisk, however, the system derives the entity name from the INFO_STORE clause (if specified). If you omit both the FROM clause and the INFO_STORE clause, the system displays the Select an Entity pop-up window when you submit the statement. See Appendix C for more information about this pop-up window.

THROUGH clause

The optional THROUGH clause specifies the information flow through which you want to retrieve the information. Only one information flow is allowed.

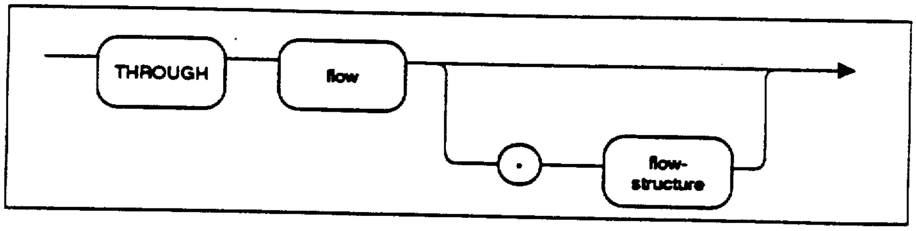

If you omit the THROUGH clause and no information flows exist from the specified information store to the current process, or you specify the name of a new information flow, the system displays the Specify an Information Flow pop-up window when you submit the statement. This window allows you to create a new information flow or use an existing information flow. If you choose to create a new information flow, you can either accept the default name shown in the entry field or type another name. The default name is either the name you specified in the THROUGH clause or a system-generated name. The system default name consists of the word "Flow" and the source and destination of the information flow (Flow-*source-destination*). See Appendix C for more information about the Specify an Information Flow pop-up window.

INFO_STORE info-store-name

An optional information store name. If you enter the name of a new information store, the system creates it in the DFD.

If you omit the INFO_STORE clause and the default-named information store does not exist, or you specify the name of a new information store, the system displays the Specify an Information Store pop-up window when you submit the statement. This pop-up window allows you to create a new information store or use an existing information store. If you choose to create a new information store, you can either use the default name shown in the entry field or type another name. The default name is either the name you supplied in the INFO_STORE clause or a system-generated name that consists of each entity specified in the FROM clause separated by ampersand (&) symbols (*entity1&entity2&entity3*). See Appendix C for more information about the Specify an Information Store pop-up window.

WHERE clause

The optional WHERE clause specifies search conditions that determine the entity occurrences to retrieve. The components on each side of the AND or OR in the Boolean expression must include an attribute contained in an entity named in the FROM clause. If you omit the WHERE clause, all entity occurrences qualify for selection.

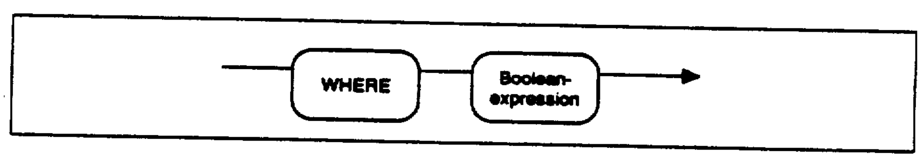

UNLESS clause

The optional UNLESS clause specifies search conditions that determine the entity occurrences that should not be retrieved. The UNLESS clause is the logical negation of the WHERE clause. The components on each side of the AND or OR in the Boolean expression must include an attribute contained in an entity named in the FROM clause. If you omit the UNLESS clause, all entity occurrences qualify for selection.

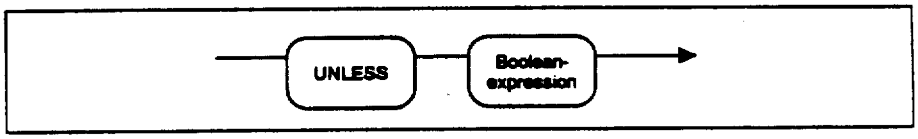

GROUP BY clause

The optional GROUP BY clause arranges the information into conceptual groups based on the value of one or more attributes. Each attribute you specify in the GROUP BY clause must be contained in an entity named in the FROM clause.

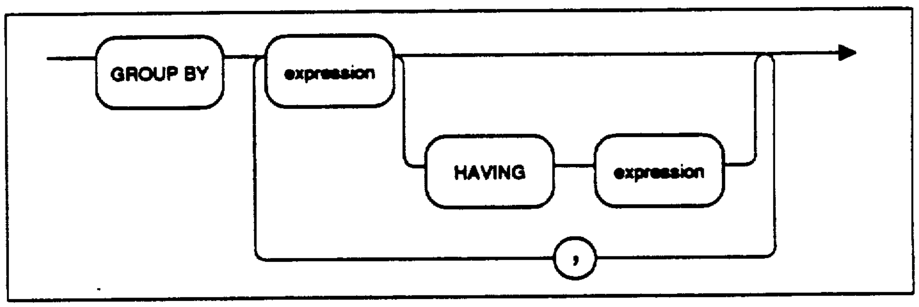

If the GROUP BY clause contains an unqualified attribute that is defined in more than one entity in the FROM clause, the system displays the Select an Entity pop-up window when you submit the statement. This window allows you to resolve the ambiguity. See Appendix C for more information about the Select an Entity pop-up window.

HAVING clause

If you specify a GROUP BY clause, the RETRIEVE statement can also have an optional HAVING clause. The HAVING clause specifies search conditions that determine the groups to be retrieved. The clause must specify an attribute named in the *info-to-select* component.

ORDER_BY clause

The optional ORDER_BY clause sorts the retrieved information by one or more attribute names or expressions. The clause must specify an attribute named in the *info-to-select* component. The default sort order is ascending. To sort in descending order, use the keyword DESC.

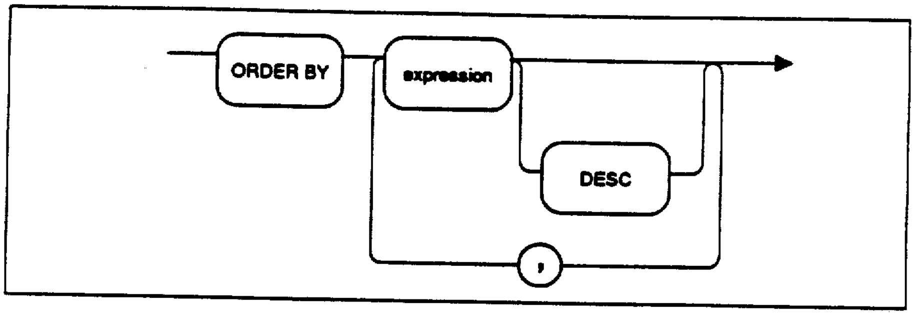

If the ORDER_BY clause contains an unqualified attribute that is defined in more than one entity in the FROM clause, the system displays the Select an Entity pop-up window when you submit the statement. This window allows you to resolve the ambiguity. See Appendix C for more information about the Select an Entity pop-up window.

VOLUME clause

The optional VOLUME clause allows you to specify database usage information by entering two numbers separated by a comma. The first number indicates the number of entity occurrences you expect to retrieve. The second number indicates the number of entity occurrences you expect to retain.

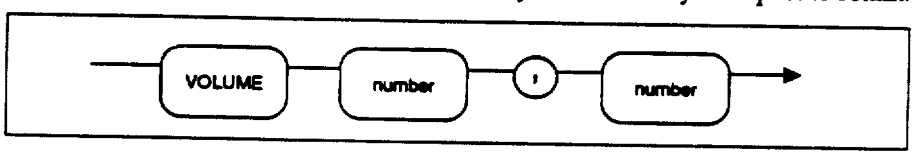

If you omit the VOLUME clause, the system displays the LAM pop-up window when you submit the statement. This window prompts you for the usage information. See Appendix C for more information about the LAM pop-up window.

Notes

The THROUGH and INFO_STORE clauses are not allowed on a RETRIEVE statement in entity method procedures. See Chapter 9 for more information about entity methods.

The RETRIEVE statement cannot be used in derived attribute procedures. See Chapter 9 for more information about derived attributes.

Example

```
RETRIEVE * FROM products
    THROUGH product-data INFO_STORE products ORDER BY item
```

```
RETRIEVE 'sales'.'sales-num', 'products'.'code, 'item', 'description', 'qty'
    FROM sales, products, sale_items
    THROUGH new-sales INFO_STORE sales_data
    WHERE sales.sale-num = sale-items.sale-num AND products.code =
      sale-items.code
```

RETURN Statement
The RETURN statement exits from the process with a value.
Syntax
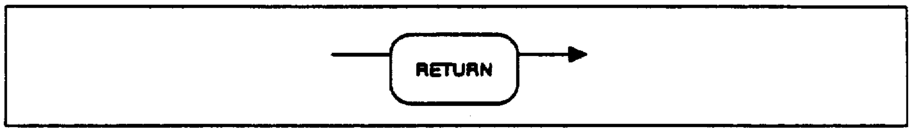
The RETURN statement consists of the keyword RETURN.

SEND Statement

The SEND statement defines the destination of information leaving the process. If necessary, it creates an information flow from the process you are currently editing to another process or source/destination.

Syntax

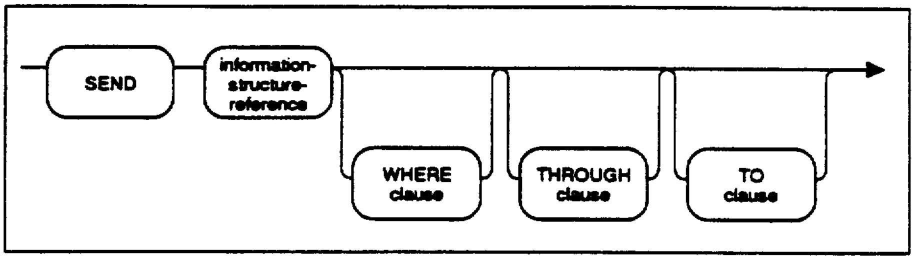

info-structure-reference

Specifies the information to be sent from the process. The information can be a list of attribute references or an *entity*.* to indicate all attributes of a particular entity. An attribute reference can be an attribute name or a qualified attribute name (*entity.attribute*).

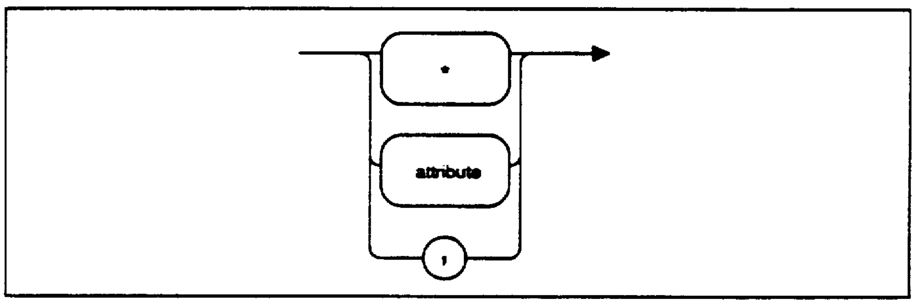

WHERE clause

The optional WHERE clause specifies search conditions that determine the information to send. The components on each side of the AND or OR in the Boolean expression must include an attribute contained in the information specified for the send operation.

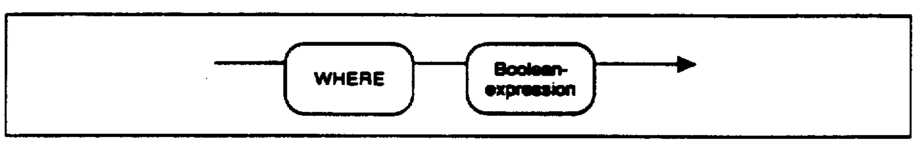

THROUGH clause

The optional THROUGH clause specifies the information flow through which you want to send the information. Only one information flow is allowed.

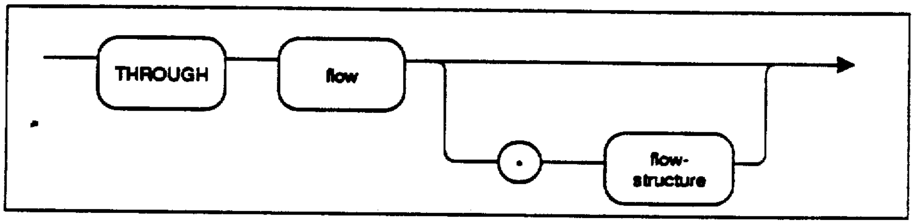

If you omit the THROUGH clause and no information flows exist from the current process to the specified process or source/destination object, or you specify the name of a new information flow, the system displays the Specify an Information Flow pop-up window when you submit the statement. This window allows you to create a new information flow or use an existing information flow. If you choose to create a new information flow, you can either accept the default name shown in the entry field or type another name. The default name is either the name you specified in the THROUGH clause or a system-generated name. The system default name consists of the word "Flow" and the source and destination of the information flow (Flow-*source-destination*). See Appendix C for more information about the Specify an Information Flow pop-up window.

TO clause

The optional TO clause specifies the process or source/destination object to which you want to send the information. If you enter a process name, it must be a process other than the one for which you are currently specifying PDL. When you specify a process in the TO clause, the system generates the appropriate RECEIVE statement for that process.

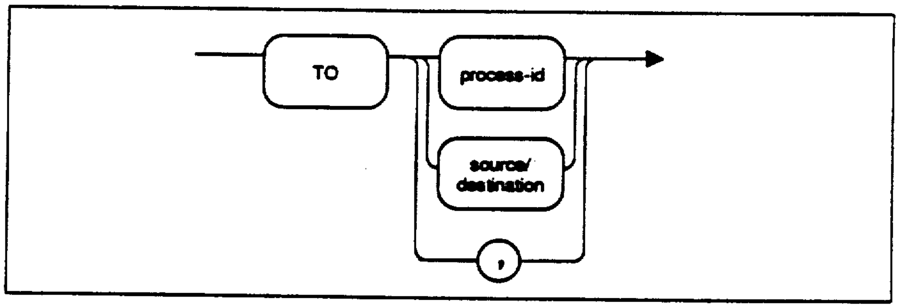

If the process or source/destination object does not exist or is invalid, the system displays the Specify a Process or Source/Destination pop-up window. This window allows you to create a new process or source/destination, or to use an existing process or source/destination. See Appendix C for more information about this pop-up window.

Notes

The SEND statement is not allowed in entity method or derived attribute procedures. See Chapter 9 for information about entity methods and derived attributes.

Example

```
SEND catalogue-id TO salesperson THROUGH screen-setup
```

SIGNAL Statement

The SIGNAL statement signals an exception condition or error and transfers control to the condition handler (WHEN clause) defined for the specified condition.

Syntax

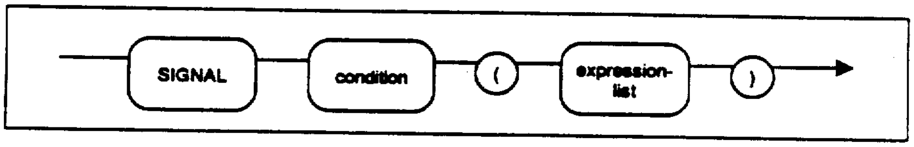

condition

One of the system-defined conditions listed in Table 10-9.

expression-list

A user-defined list of parameters to be passed to the condition handler.

Notes

By default, the system tests for and signals some of the conditions listed in Table 10-9. You use the SIGNAL statement to explicitly signal these conditions.

For more information about exception and error conditions, see the section Handling Exception and Error Conditions earlier in this chapter.

Table 10-9 System-defined Conditions

| STATEMENT | CONDITION |
|---|---|
| Logical Access | ABORT |
| | DUPLICATE |
| | EMPTY |
| SEND and RECEIVE | EMPTY |
| FOREACH | DUPLICATE |
| | EMPTY |
| | ONE |
| | BEGIN |
| | FIRST |
| | LAST |
| | EXIT |
| | BETWEEN |
| | END |
| | END_GROUP |
| | SKIP |
| CASE | OTHERWISE |

SKIP Statement
The SKIP statement is used in iteration blocks (FOREACH and LOOP statements). It terminates the current iteration and transfers control to the SKIP condition handler (if defined) or to the next iteration of the block.
Syntax
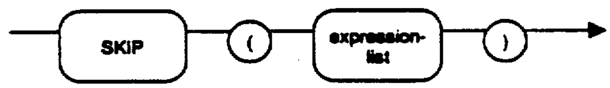
(expression-list)
A list of user-defined parameters to be passed to the SKIP condition handler.

UPDATE Statement

The UPDATE statement is a logical access statement that changes the values of entity occurrences in information stores.

Syntax

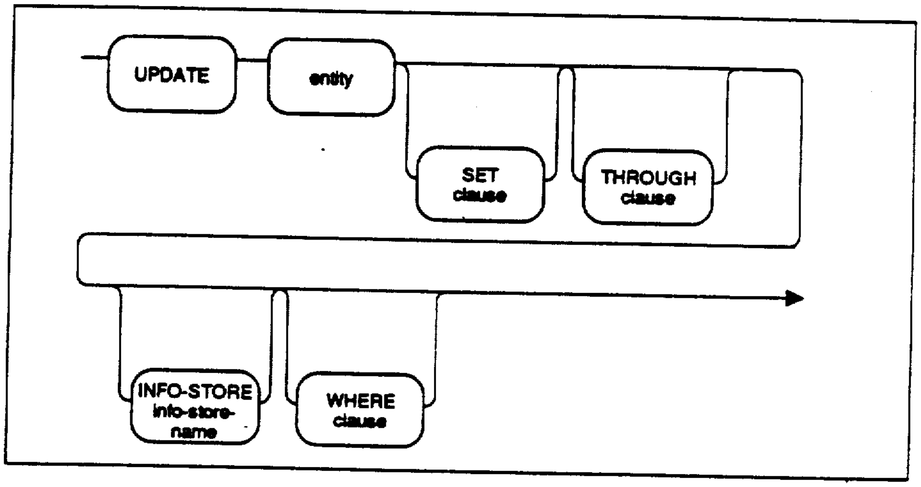

entity

The name of the entity that contains the attributes to be updated.

SET clause

Assigns new values to attributes in the specified entity. On the left side of the equal sign in each assignment, you must include an attribute contained in the specified entity.

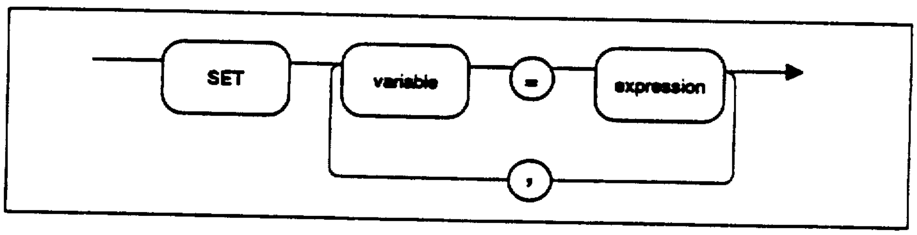

THROUGH clause

The optional THROUGH clause specifies the information flow through which you want to update the information. Only one information flow is allowed.

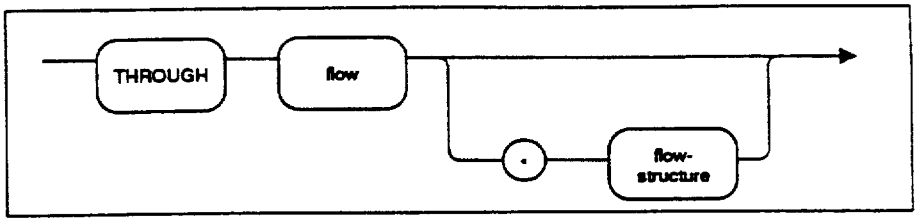

If you omit the THROUGH clause and no information flows exist from the current process to the specified information store, or you specify the name of a new information flow, the system displays the Specify an Information Flow pop-up window when you submit the statement. This window allows you to create a new information flow or use an existing information flow. If you choose to create a new information flow, you can either accept the default name shown in the entry field or type another name. The default name is either the name you specified in the THROUGH clause or a system-generated name. The system default name consists of the word "Flow" and the source and destination of the information flow (Flow-*source-destination*). See Appendix C for more information about the Specify an Information Flow pop-up window.

INFO-STORE info-store-name

An optional information store name. If you enter the name of a new information store, the system creates it in the DFD.

If you omit the INFO_STORE clause and the default-named information store does not exist, or you specify the name of a new information store, the system displays the Specify an Information Store pop-up window when you submit the statement. This pop-up window allows you to create a new information store or use an existing information store. If you choose to create a new information store, you can either use the default name shown in the entry field or type another name. The default name is either the name you supplied in the INFO_STORE clause or a system-generated name that is the same as the entity name specified for the update operation. See Appendix C for more information about the Specify an Information Store pop-up window.

WHERE clause

The optional WHERE clause specifies search conditions that determine the entity occurrences to update. The components on each side of the AND or OR in the Boolean expression must include an attribute named in the *attribute-list* component.

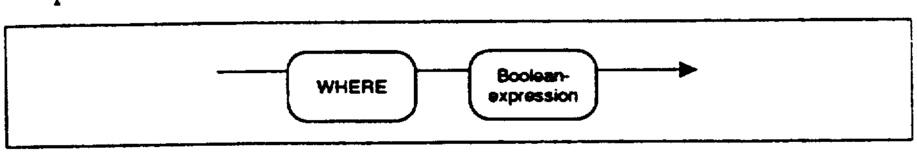

If you omit the WHERE clause, the system displays the Confirm Missing WHERE Clause pop-up window when you submit the statement. This window warns you that the UPDATE statement will act on all occurrences of the specified entities.. See Appendix C for more information about this pop-up window.

Notes

The THROUGH and INFO_STORE clauses are not allowed on an UPDATE statement in entity method procedures. See Chapter 9 for more information about entity methods.

The UPDATE statement cannot be used in derived attribute procedures. See Chapter 9 for more information about derived attributes.

Example

```
UPDATE products SET in-stock-qty = in-stock-qty - qty
    THROUGH product-data INFO_STORE inventory
    WHERE code = current-code
```

Chapter 11
Forms Reference

The following sections describe the Analyst Model form, data model forms, process model forms, and profile forms. For instructions on displaying and editing forms, see Chapter 3, Working With the BACHMAN System.

Analyst Model Form

The Analyst Model form (Figure 11-1) contains the following fields:

*Note:* Asterisks (*) indicate fields from which you can display other forms.

Analyst Model Name—Names the Analyst model.

*Data Model Name—Names the data model associated with this Analyst model. You can use this field to display a Data Model form.

Description—Describes the Analyst model.

*Synonym/Synonyms—Lists other names that you can use to reference the Analyst model. You can use this field to display a Synonym form.

Keyword/Keywords—Lists the keywords associated with the Analyst model.

File Name—Names the file that contains the Analyst model. The file name always has the extension .AN.

*Process Model/Process Models—Lists the process models associated with the Analyst model. You can use this field to display a Process Model form.

*Note/Notes—Lists the notes associated with the Analyst model. You can use this field to display a Notes form.

User Information/Created—Displays the login name of the person who created this Analyst model, and the date and time at which the model was created. The system automatically enters this information; you cannot edit it.

User Information/Updated—Displays the login name of the person who last updated this Analyst model, and the date and time at which the model was last updated. The system automatically enters this information; you cannot edit it.

Data Model Forms

This section describes the following data model forms:

- Allowed Value Table form
- Attribute form
- Data Model form
- Dimension form
- Domain form
- Entity form
- Filter form
- Key form
- Notes form
- Partnership-Set form
- Synonym form

*Note:* Asterisks (*) indicate fields from which you can display other forms.

Allowed Value Table Form

The Allowed Value Table form (Figure 11-2) contains the following fields:

Select—Indicates that the table has been selected and placed on the Select list.

Name—Names the table.

*Referenced By—Lists the objects that use this table. You can use this field to display a form for a selected object.

Description—Describes the table.

Beginning Value—Displays the first value in the table.

Ending Value—Displays the last value in the table.

Value Description—Describes the values in the table.

Values—Lists the values in the table.

User Information/Created—Displays the login name of the person who created this table, and the date and time at which the table was created. The system automatically enters this information; you cannot edit it.

User Information/Updated—Displays the login name of the person who last updated this table, and the date and time at which the table was last updated. The system automatically enters this information; you cannot edit it.

Attribute Form

The Attribute form (Figure 11-3) contains the following fields:

Select—Indicates that the attribute has been selected and placed on the Select list.

*Entity—Names the entity (if any) that owns the attribute. You can use this field to display an Entity form for the entity.

Attribute name—Names the attribute.

Description—Describes the attribute. The system does not use this description; it is for your information only.

*Synonym/Synonyms—Lists other names that you can use to reference the attribute. You can use this field to display a Synonym form.

*Owner Attributes—Lists the owner attributes associated with this attribute. You can use this field to display an Attribute form for a selected owner attribute.

*Component Attribute/Component Attributes—Lists the order and names of component attributes associated with this attribute. You can use this field to display an Attribute form for a selected component attribute.

*Associated Key/Associated Keys—Displays the associated keys for this attribute. You can use this field to display a Key form for a selected associated key.

*Allowed Value Table—(Not available in the Beta release.) Displays information about the allowed value table associated with this attribute. You can use this field to display an Allowed Value Table form for the table.

Domain—Names the domain to which this attribute belongs.

Dimension—Names the dimension to which this attribute belongs.

Origin of Foreign Key Attribute—(Not available in the Beta release.) If this attribute is a foreign key, this field describes the components of the attribute.

Source Information—Describes the name and type of the source that supplies a value for this attribute. Source type includes:

- Manual - means the value is entered manually
- System - means the value is entered from another system
- Derived - means the value is calculated by the system. If you specify Derived, you can select the PDL pushbutton to display a PDL diagram for the derivation method.

Nulls Allowed—Means the attribute can have a null value.

Storable—Means the attribute value can be stored.

Keyword/Keywords—Lists the keywords associated with this attribute. If this attribute is a free attribute, the system uses keyword values to determine whether or not the attribute meets the selection criteria for a filter. If this attribute is associated with an entity, the Keyword field is ignored and the attribute is selected for the filter if its associated entity is selected. For more information on filters, refer to Chapter 4, Working With an Analyst Model.

*Note/Notes—Displays the notes associated with this attribute. You can use this field to display a Notes form.

User Information/Created—Displays the login name of the person who created this attribute, and the date and time at which the attribute was created. The system automatically enters this information; you cannot edit it.

User Information/Updated—Displays the login name of the person who last updated this attribute, and the date and time at which the attribute was last updated. The system automatically enters this information; you cannot edit it.

Data Model Form

The Data Model form (Figure 11-4) contains the following fields:

Select—Indicates that the data model has been selected and placed on the Select list.

Data Model Name—Names the data model.

Description—Describes the data model. The system does not use this description; it is for your information only.

*Synonym/Synonyms—Lists other names that you can use to reference the data model. You can use this field to display a Synonym form.

*Entity/Entities—Lists the entities in this data model. By modifying this field, you can add, delete, or rename entities. You can use this field to display an Entity form.

*Free Attribute/Free Attributes—Lists the free attributes in the data model. By modifying this field, you can add, delete, or rename free attributes. You can use this field to display an Attribute form.

*Domain/Domains—Lists the domains in the data model. You can use this field to display a Domain form.

*Dimension/Dimensions—Lists the dimensions in the data model. You can use this field to display a Dimension form.

*Allowed Value Table/Allowed Value Tables—Lists tables of allowable values for attributes in the data model. You can use this field to display an Allowed Value Table form.

Definer—Names the person who designed the data model.

*Note/Notes—Displays the notes associated with this data model.

User Information/Created—Displays the login name of the person who created this data model, and the date and time at which the data model was created. The system automatically enters this information; you cannot edit it.

User Information/Updated—Displays the login name of the person who last updated this data model, and the date and time at which the data model was last updated. The system automatically enters this information; you cannot edit it.

Dimension Form

The Dimension form (Figure 11-5) contains the following fields:

Select—Indicates that the dimension has been selected and placed on the Select list.

Dimension name—Names the dimension.

*Data model—Names the data model that holds the dimension. You can use this field to display the Data Model form for that data model.

Description—Describes the dimension. The system does not use this description; it is for your information only.

*Synonym/Synonyms—Lists other names that you can use to reference the dimension. You can use this field to display a Synonym form.

*Default Domain—Displays the domain to which the system assigns this dimension if you do not specify another one. You can use this field to display a Domain form for the default domain.

*Domain/Domains—Lists the domains to which this dimension belongs. You can use this field to display a Domain form for a selected domain.

Entity—Displays the name of the entity that owns a selected attribute in the dimension. Values displayed in this field cannot be modified.

*Attribute/Attributes—Lists all the attributes associated with this dimension. You can use this field to display an Attribute form. Values displayed in the Attribute entry field cannot be modified.

Keyword/Keywords—Lists the keywords evaluated to determine whether or not this dimension meets the selection criteria for a filter.

*Note/Notes—Displays the notes associated with this dimension. You can use this field to display a Notes form.

User Information/Created—Displays the login name of the person who created this dimension, and the date and time at which the dimension was created. The system automatically enters this information; you cannot edit it.

User Information/Updated—Displays the login name of the person who last updated this dimension, and the date and time at which the dimension was last updated. The system automatically enters this information; you cannot edit it.

Domain Form

The Domain form (Figure 11-6) contains the following fields:

Select—Indicates that the domain has been selected and placed on the Select list.

Domain Name—Names the domain.

*Dimension—Names the dimension to which the domain belongs.

Description—Describes the domain. The system does not use this description; it is for your information only.

*Synonym/Synonyms—Lists other names that you can use to reference the domain. You can use this field to display a Synonym form.

•Subdomain/Subdomains—Lists the order and names of subdomains contained by this domain. You can use this field to display a Domain form for a selected subdomain.

Entity—Displays the name of the entity that owns a selected attribute in the domain.

•Attribute/Attributes—Lists the attributes that belong to the domain. You can use this field to display an Attribute form.

Allowed Value Table—Names the table of allowable values associated with the domain.

Data Type—Describes the type of data in the domain.

Character Length—Describes the length of character values allowed in the domain.

Keyword/Keywords—Lists the keywords evaluated to determine whether or not this domain meets the selection criteria for a filter.

•Note/Notes—Displays the notes associated with this domain. You can use this field to display a Notes form.

User Information/Created—Displays the login name of the person who created this domain, and the date and time at which the domain was created. The system automatically enters this information; you cannot edit it.

User Information/Updated—Displays the login name of the person who last updated this domain, and the date and time at which the domain was last updated. The system automatically enters this information; you cannot edit it.

Entity Form

The Entity form (Figure 11-7) contains the following fields:

Select—Indicates that the entity has been selected and placed on the Select list.

Entity Name—Names the entity. By modifying this field, you can delete or rename the entity.

Data Model—Displays the name of the data model that contains the entity. Values in this field cannot be modified.

Description—Describes the entity. The system does not use this description; it is for your information only.

•Synonym/Synonyms—Lists other names that you can use to reference the entity. You can use this field to display a Synonym form.

•Supertype—Displays the name of this entity's parent entity. This field is only applicable for entities that are part of an entity type hierarchy. You can use this field to display an Entity form for the supertype entity.

•Subtype/Subtypes—Lists the names of this entity's child entities. This field is only applicable for entities that are part of an entity type hierarchy. You can use this field to display an Entity form for a selected subtype entity.

*Attribute/Attributes—Lists the names of this entity's attributes. You can use this field to add, delete, or rename the entity's attributes, and to display an Attribute form. To enter an attribute, specify its name in the Attribute field (you can also specify its order number, if you want).

*Partnership Set/Partnership Sets—Displays the names of the partnership sets on this entity. You can use this field to display a Partnership-Set form.

*Key/Keys—Lists the keys for this entity. To mark a key as a primary key, select the Primary box next to the Key field when you enter or edit the key. You can use this field to display a Key form.

*Foreign Keys—Displays the foreign keys that are associated with this entity. You can use this field to display a Key form for a selected foreign key.

*Method/Methods—Lists the processes associated with this entity. You can use this field to display a PDL diagram for a selected method.

Volumes—Describes the minimum, expected, and maximum number of times you expect this entity to be accessed.

Growth Rate—Describes the rate at which you expect to create new instances of this entity. You can enter the growth rate as a percent, and indicate whether it is a yearly, monthly, or daily rate.

Normal Form—Describes the level of normalization applied to this entity (that is, none, first, second, third, or fourth).

Adequately Normalized—Indicates whether the level of normalization applied to this entity is acceptable.

Keyword/Keywords—Lists the keywords evaluated to determine whether or not this entity meets the selection criteria for a filter.

*Note/Notes—Displays the notes associated with this entity. You can use this field to display a Notes form.

User Information/Created—Displays the login name of the person who created this entity, and the date and time at which the entity was created. The system automatically enters this information; you cannot edit it.

User Information/Updated—Displays the login name of the person who last updated this entity, and the date and time at which the entity was last updated. The system automatically enters this information; you cannot edit it.

Filter Form

The Filter form (Figure 11-8) contains the following fields. For more information about filters, and about the pushbuttons on the Filter form, refer to Chapter 4, Working With an Analyst Model.

Filter Name—Names the filter.

Filters—Lists the filters already defined for the selected object.

Keyword/Keywords—Lists the keywords that the system uses as search criteria to determine whether an object matches this filter.

Created By—Displays the login name of the person who created this filter, and the date and time at which the filter was created. The system automatically enters this information; you cannot edit it.

Updated By—Displays the login name of the person who last updated this filter, and the date and time at which the filter was last updated. The system automatically enters this information; you cannot edit it.

Objects—Lists the objects for which the filter searches.

Time Created—Displays the time that passed between starting to create the filter and finishing.

Time Updated—Displays the time that passed between starting to update the filter and finishing.

Combine Criteria—Specifies whether some or all the search criteria should be combined to filter an object.

Criteria Testing—Specifies whether the search criteria excludes or includes objects.

Key Form

The Key form (Figure 11-9) contains the following fields:

Select—Indicates that the key has been selected and placed on the Select list.

Primary—Indicates that the key is a primary key.

Key Name—Names the key.

Entity—Names the entity that owns the key.

Description—Describes the key. The system does not use this description; it is for your information only.

*Synonym/Synonyms—Lists other names that you can use to reference the key. You can use this field to display a Synonym form.

*Attribute/Attributes—Lists the attributes associated with this key. You can use this field to display an Attribute form.

*Partnership Set/Partnership Sets—Lists the partnership sets associated with this key. You can use this field to display a Partnership-Set form.

Foreign Key Attributes—Lists the foreign key attributes associated with this key.

Keyword/Keywords—Lists the keywords evaluated to determine whether or not this key meets the selection criteria for a filter.

*Note/Notes—Displays the notes associated with this key. You can use this field to display a Notes form.

User Information/Created—Displays the login name of the person who created this key, and the date and time at which the key was created. The system automatically enters this information; you cannot edit it.

User Information/Updated—Displays the login name of the person who last updated this key, and the date and time at which the key was last updated. The system automatically enters this information; you cannot edit it.

Notes Form

The Notes form (Figure 11-10) contains the following fields:

Select—Indicates that the note has been selected and placed on the Select list.

Note Name—Names the note.

*Referenced By—Lists the objects that refer to this note. You can use this field to display a form for a selected object.

Text—Displays the content of the note.

Keyword/Keywords—Lists the keywords evaluated to determine whether or not this note meets the selection criteria for a filter.

User Information/Created—Displays the login name of the person who created this note, and the date and time at which the note was created. The system automatically enters this information; you cannot edit it.

User Information/Updated—Displays the login name of the person who last updated this note, and the date and time at which the note was last updated. The system automatically enters this information; you cannot edit it.

Partnership-Set Form

The Partnership-Set form (Figure 11-11) contains the following fields:

Select—Indicates that the partnership set has been selected and placed on the Select list.

Partnership-Set Name—Names the partnership set.

*Entity—Names the entity that owns the partnership set. You can use this field to display an Entity form for the entity.

Description—Describes the partnership set. The system does not use this description; it is for your information only.

*Synonym/Synonyms—Lists other names that you can use to reference the partnership set. You can use this field to display a Synonym form.

Partnership Information—Describes the related objects in the partnership, including entity names, partnership-set names, and entity volumes. You can use this field to display Entity forms and Partnership-Set forms for related objects.

Partnerships—Lists the entities related through the partnership.

*Associated Key/Associated Keys—Lists the associated keys for this partnership set. You can use this field to display a Key form for a selected associated key.

Logical Operator—If this partnership set is part of a complex relationship, this field specifies the logical operator that describes the relationship (that is, IOR, XOR, or AND).

Volumes—Describes the minimum, expected, and maximum volume of occurrences of the partnership set.

Keyword/Keywords—Lists the keywords evaluated to determine whether or not this partnership set meets the selection criteria for a filter.

*Note/Notes—Displays the notes associated with this partnership set. You can use this field to display a Notes form.

User Information/Created—Displays the login name of the person who created this partnership set, and the date and time at which the partnership set was created. The system automatically enters this information; you cannot edit it.

User Information/Updated—Displays the login name of the person who last updated this partnership set, and the date and time at which the partnership set was last updated. The system automatically enters this information; you cannot edit it.

Synonym Form

The Synonym form (Figure 11-12) contains the following fields:

Select—Indicates that the synonym has been selected and placed on the Select list.

Name—Names the synonym.

*Used By—Lists the objects that refer to this synonym. You can use this field to display a form for a selected object.

User Information/Created—Displays the login name of the person who created this synonym, and the date and time at which the synonym was created. The system automatically enters this information; you cannot edit it.

User Information/Updated—Displays the login name of the person who last updated this synonym, and the date and time at which the synonym was last updated. The system automatically enters this information; you cannot edit it.

Process Model Forms

This section describes the following process model forms:

- Event form (Not Available in the Beta Release)
- Information Flow form
- Information Store form
- Notes form
- Process form
- Process Model form
- Source/Destination form
- Synonym form

*Note:* Asterisks (*) indicate fields from which you can display other forms.

Event Form

*Not Available in the Beta Release*

Information Flow Form

Figures 1, 2, 3, 4, 5, 6, 7, 8, 9, 10, 11:
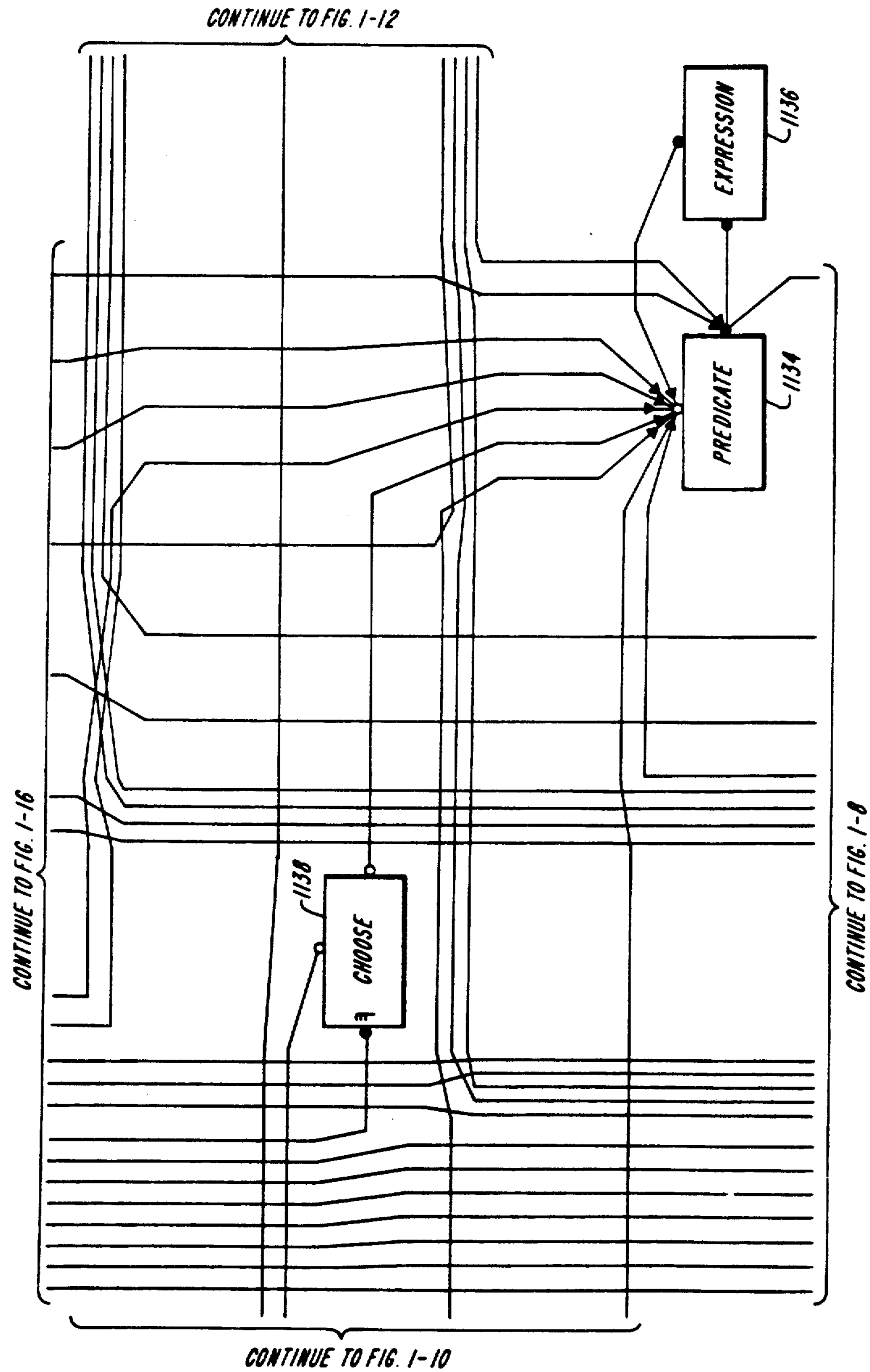
Figures 1, 2, 3, 4, 5, 6, 7, 8, 9, 10, 11, 12:
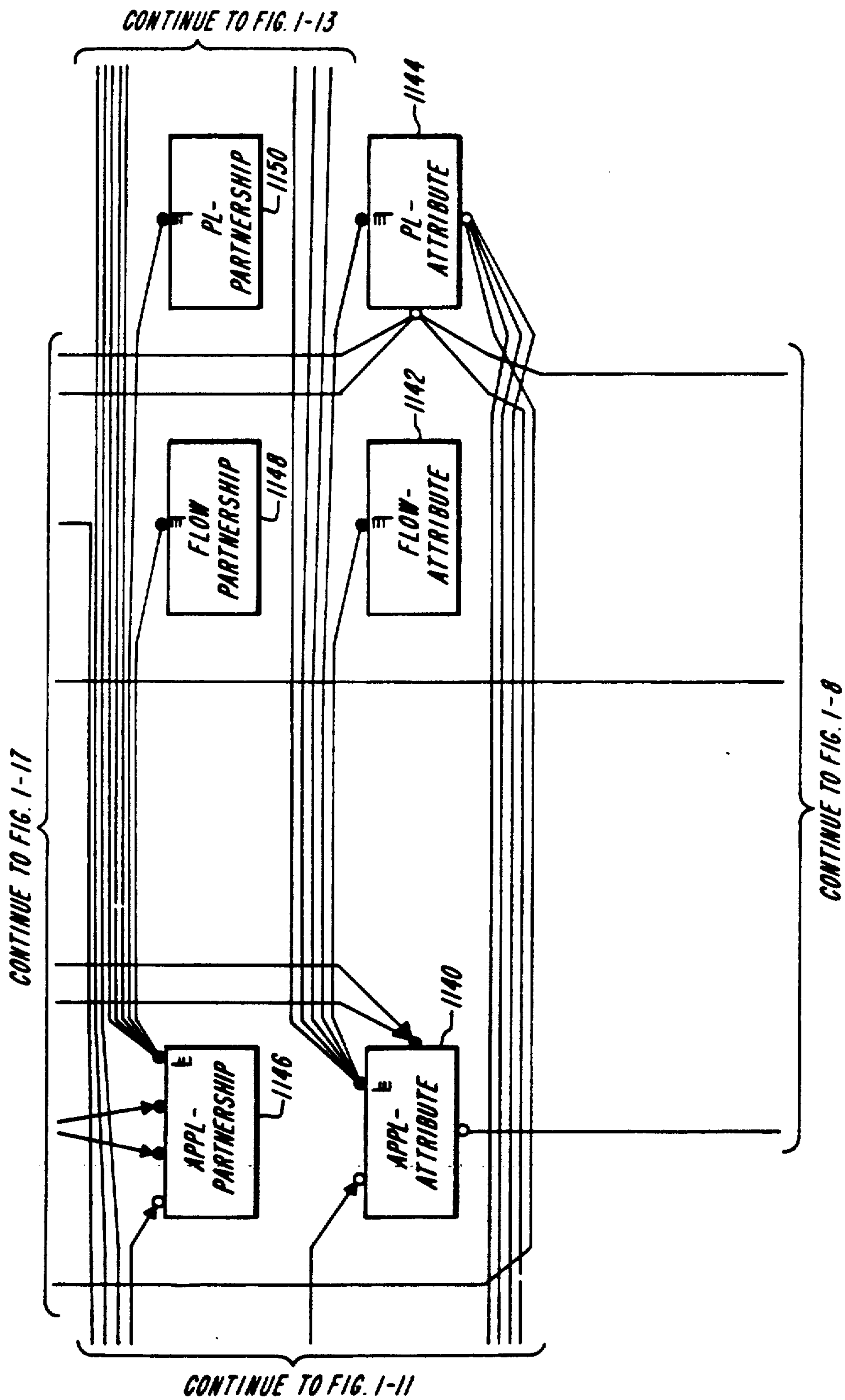
Figures 1, 2, 3, 4, 5, 6, 7, 8, 9, 10, 11, 12, 13:
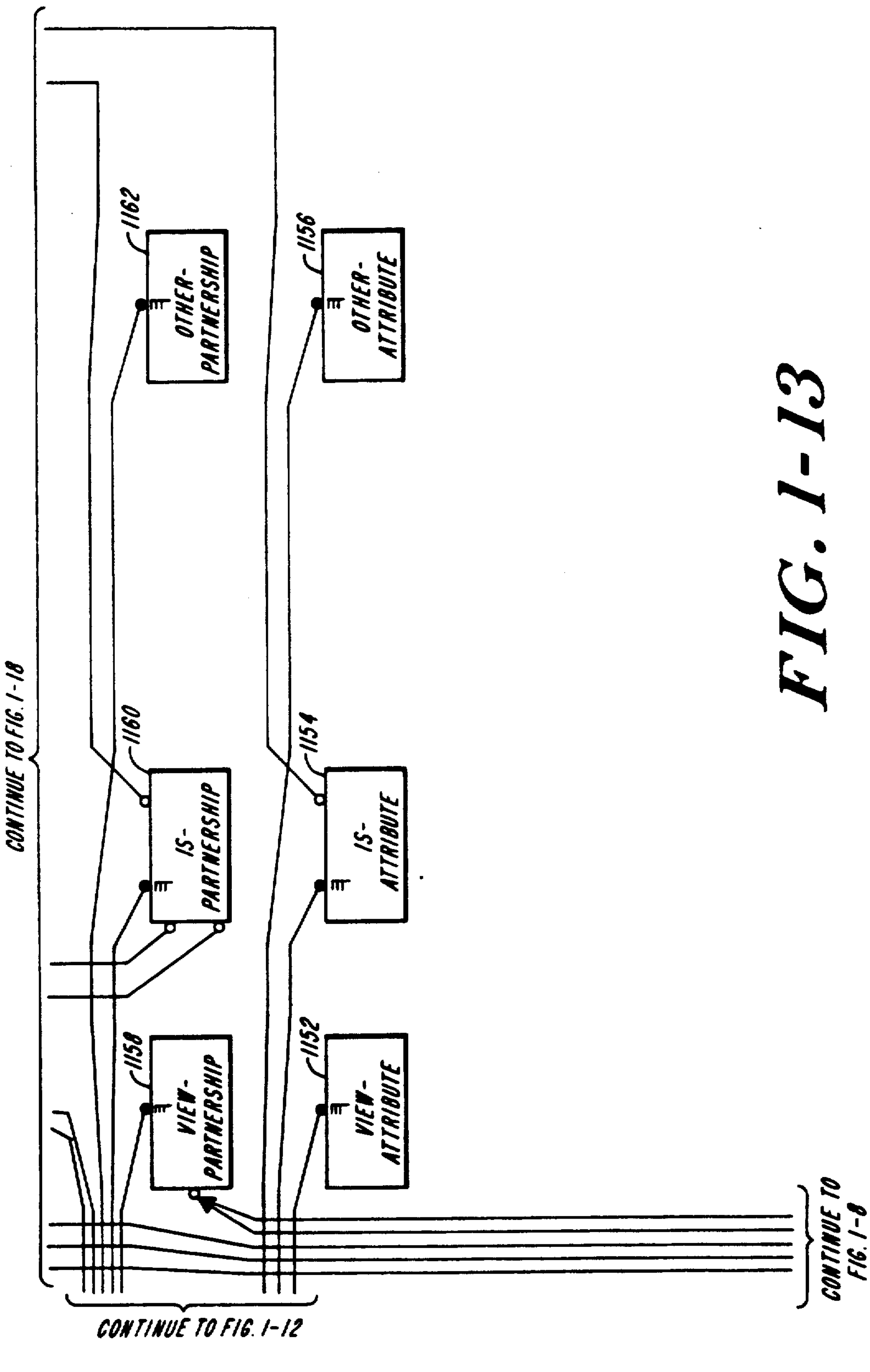
Figures 1, 2, 3, 4, 5, 6, 7, 8, 9, 10, 11, 12, 13, 14:
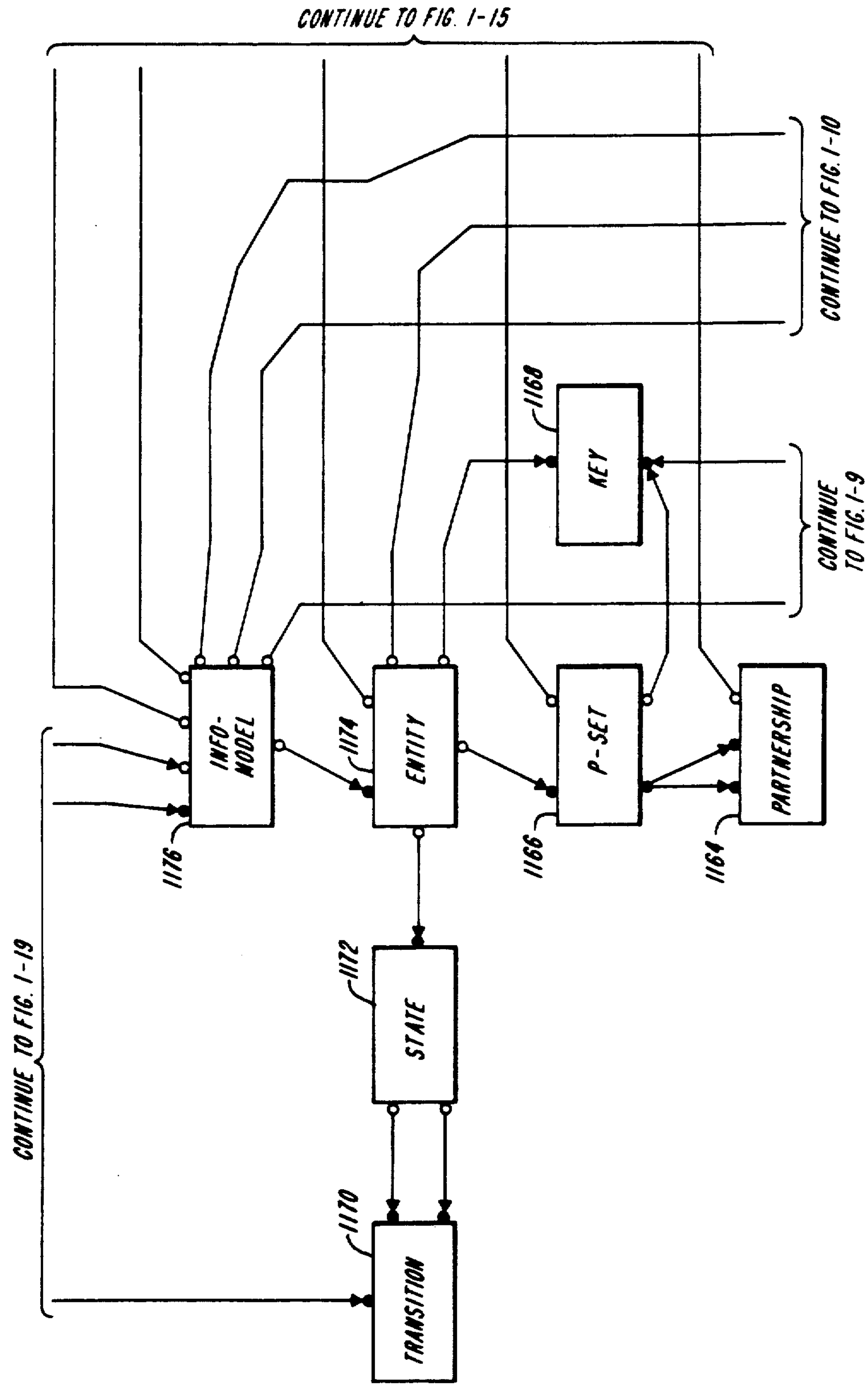
Figures 1, 2, 3, 4, 5, 6, 7, 8, 9, 10, 11, 12, 13, 14, 15:
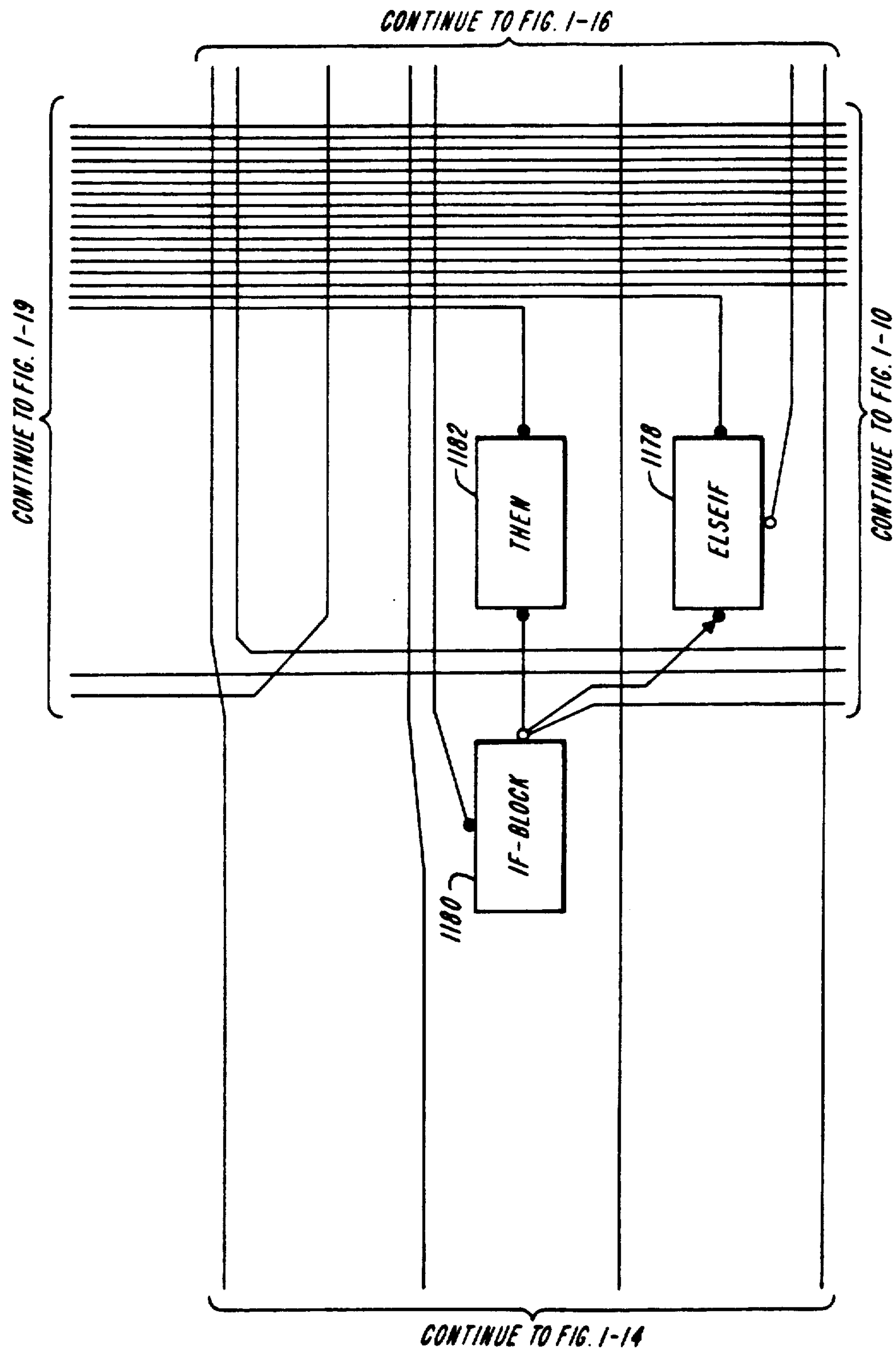
Figures 1, 2, 3, 4, 5, 6, 7, 8, 9, 10, 11, 12, 13, 14, 15, 16:
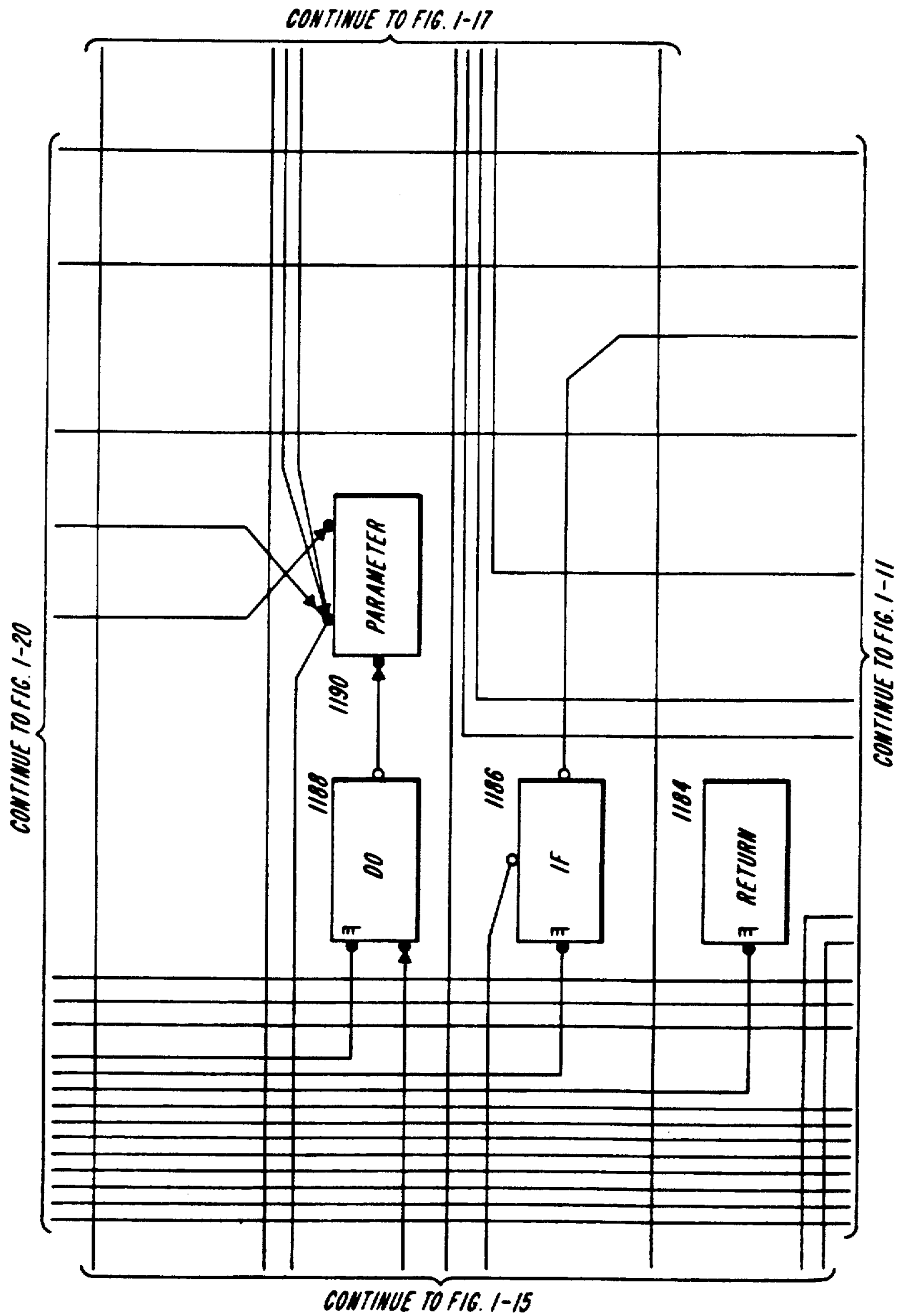
Figures 1, 2, 3, 4, 5, 6, 7, 8, 9, 10, 11, 12, 13, 14, 15, 16, 17:
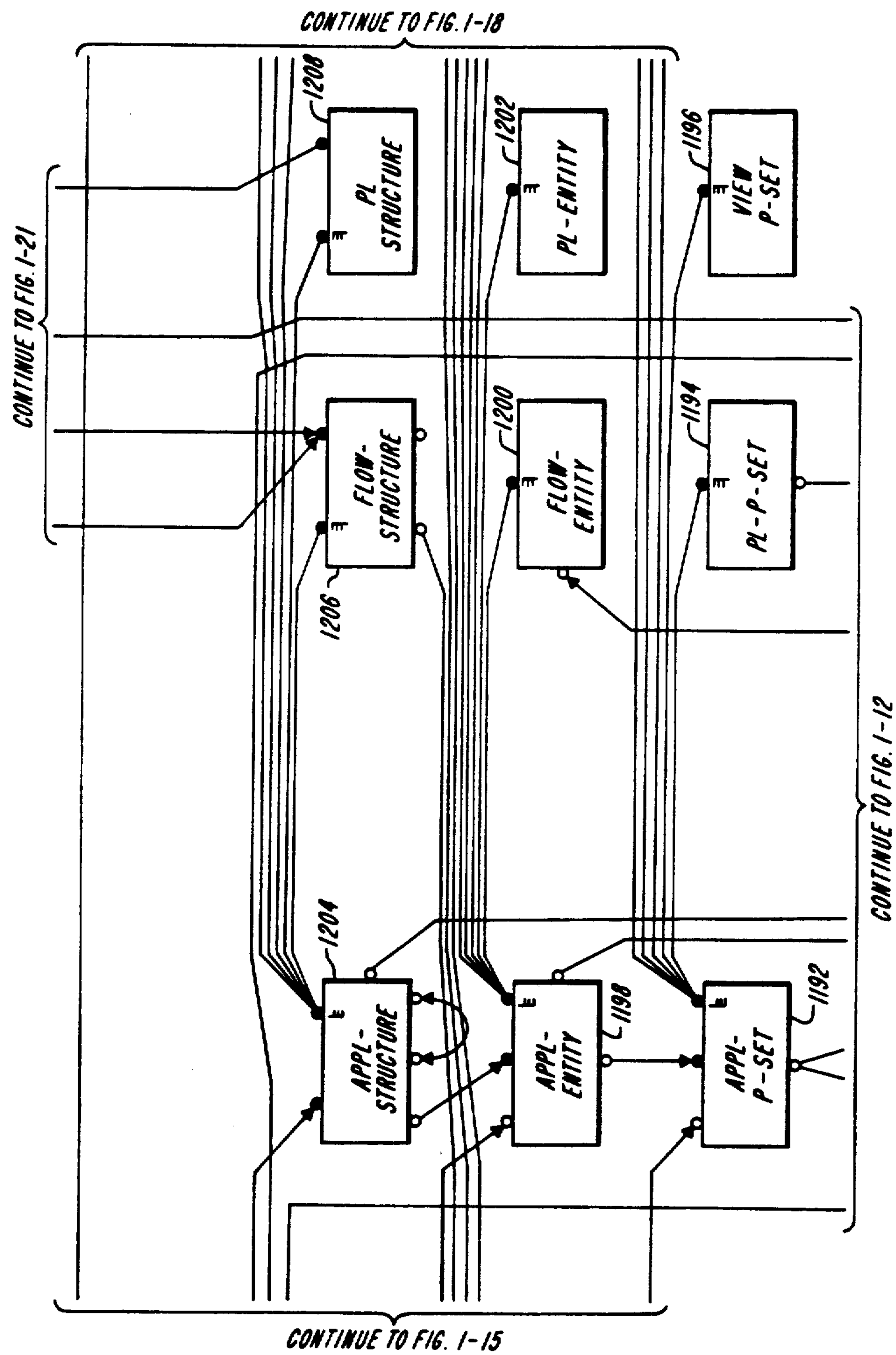
Figures 1, 2, 3, 4, 5, 6, 7, 8, 9, 10, 11, 12, 13, 14, 15, 16, 17, 18:
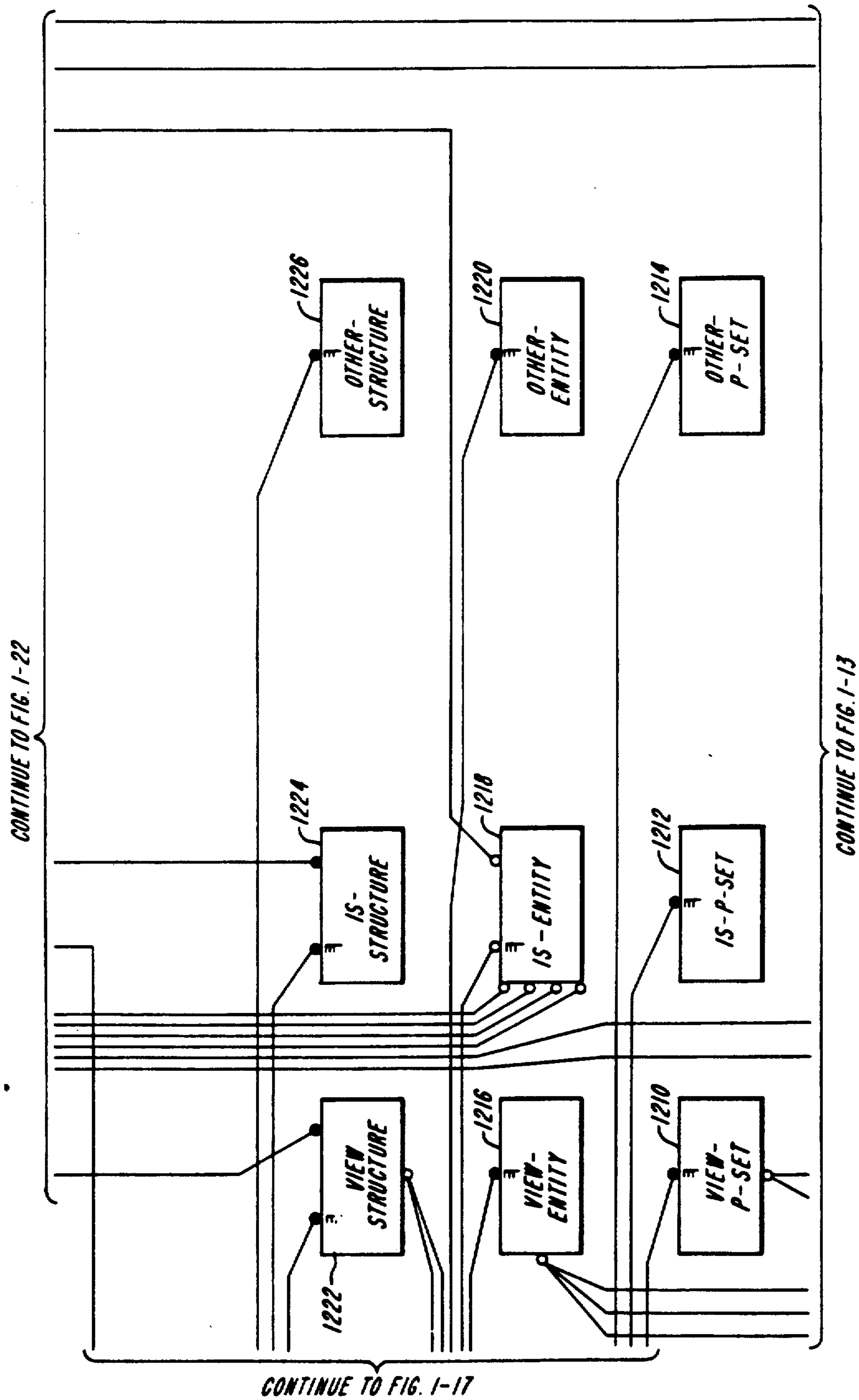
Figures 1, 2, 3, 4, 5, 6, 7, 8, 9, 10, 11, 12, 13, 14, 15, 16, 17, 18, 19:
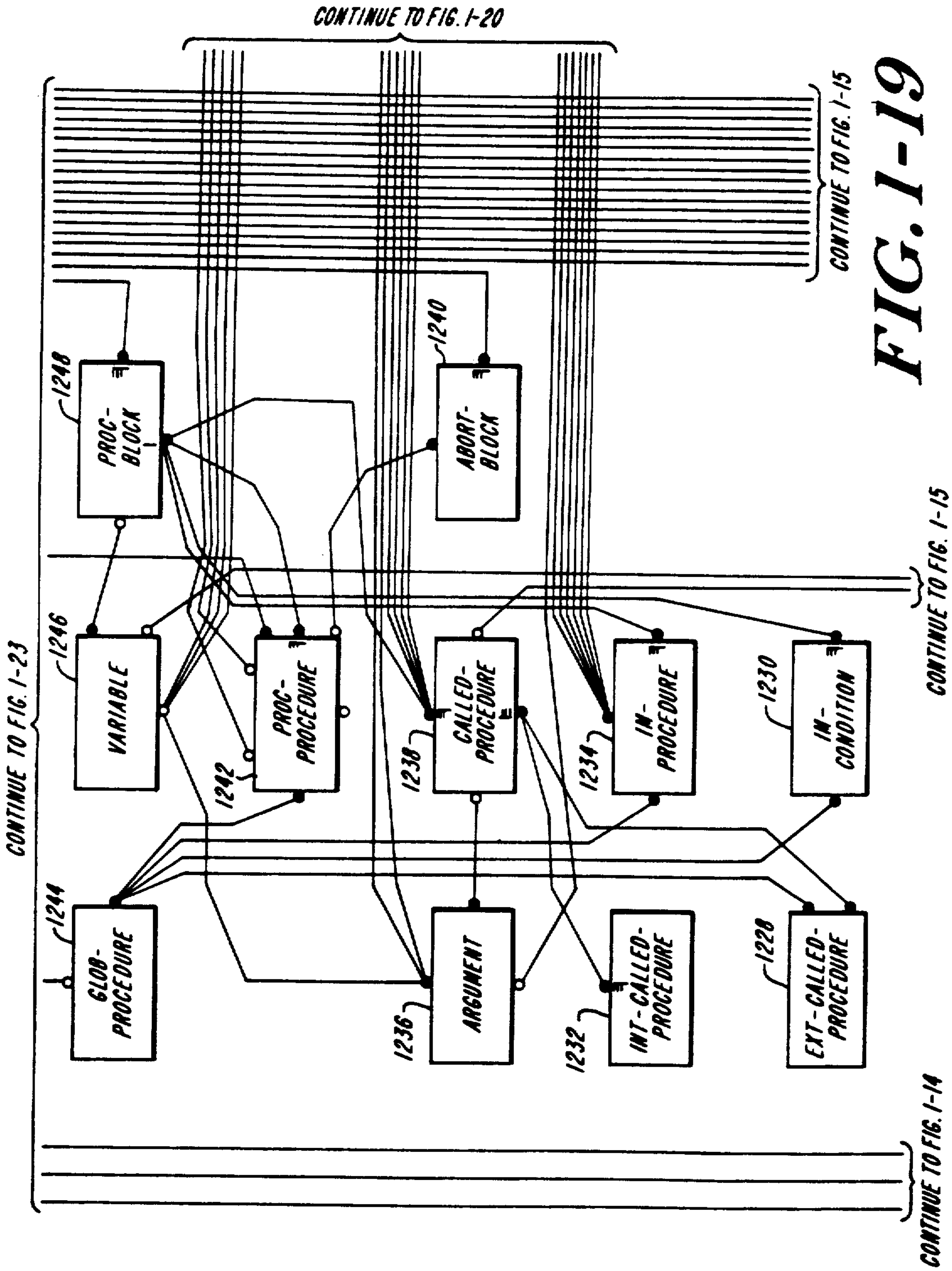
Figures 1, 2, 3, 4, 5, 6, 7, 8, 9, 10, 11, 12, 13, 14, 15, 16, 17, 18, 19, 20:
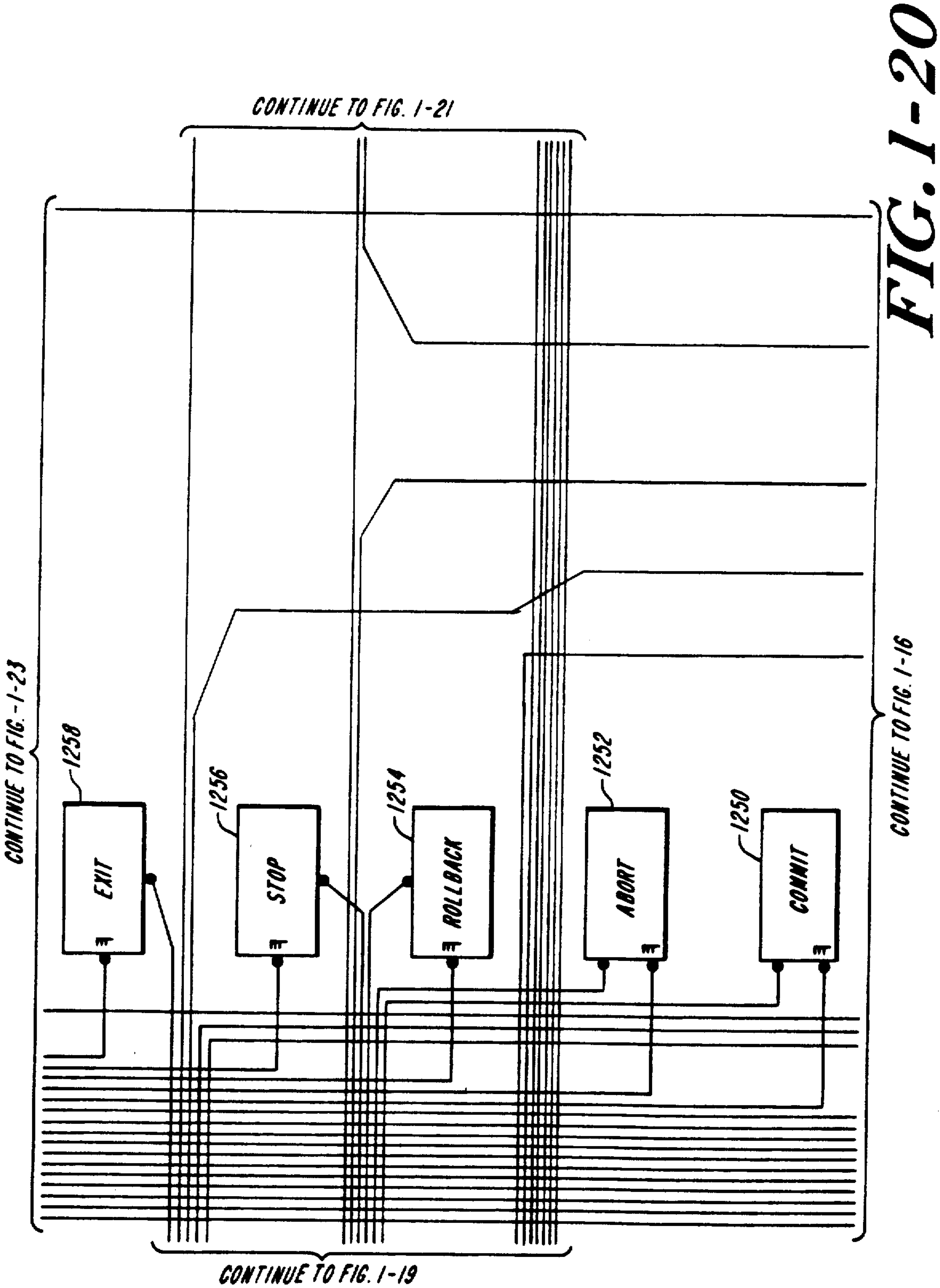
Figures 1, 2, 3, 4, 5, 6, 7, 8, 9, 10, 11, 12, 13, 14, 15, 16, 17, 18, 19, 20, 21:
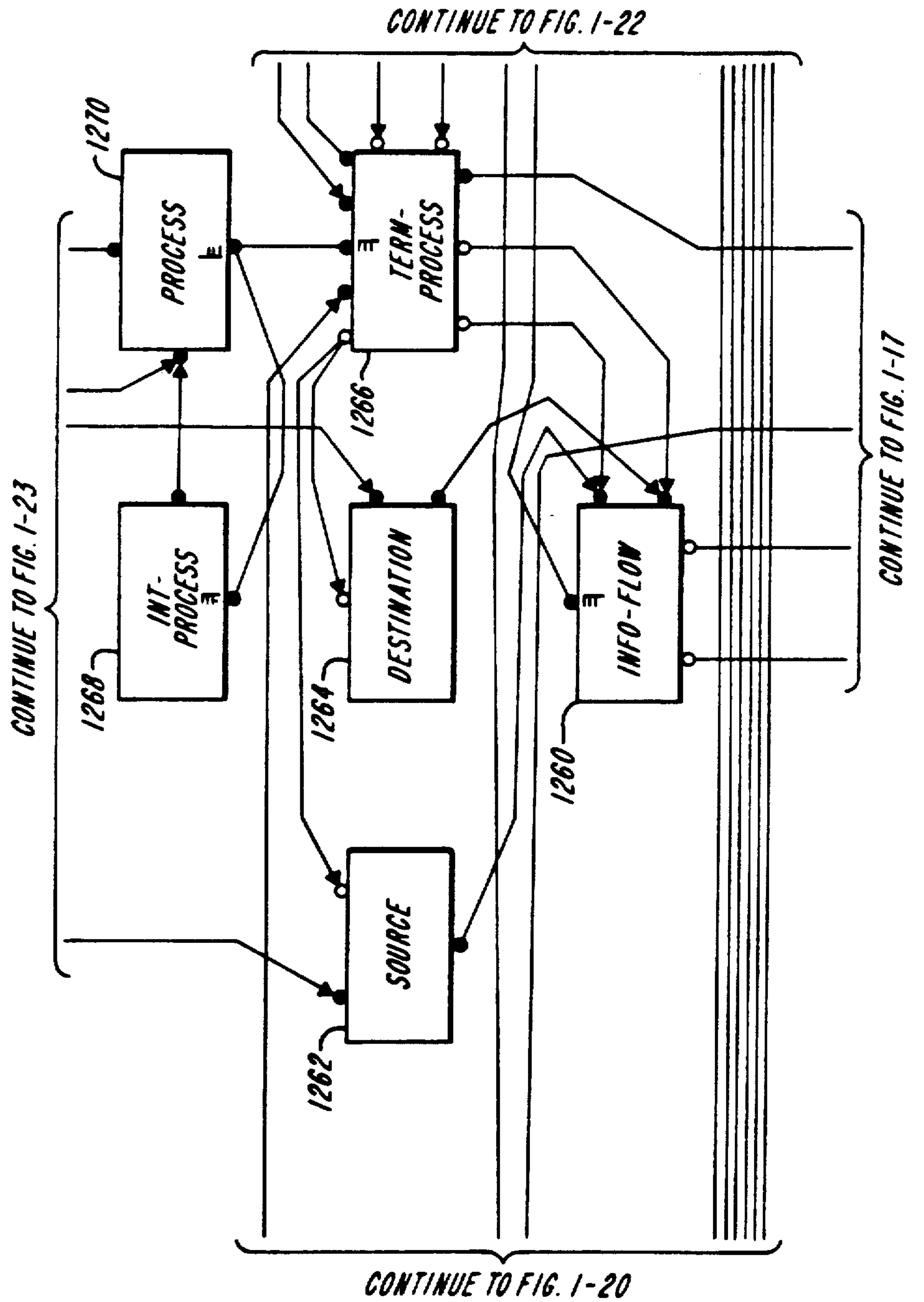
Figures 1, 2, 3, 4, 5, 6, 7, 8, 9, 10, 11, 12, 13, 14, 15, 16, 17, 18, 19, 20, 21, 22:
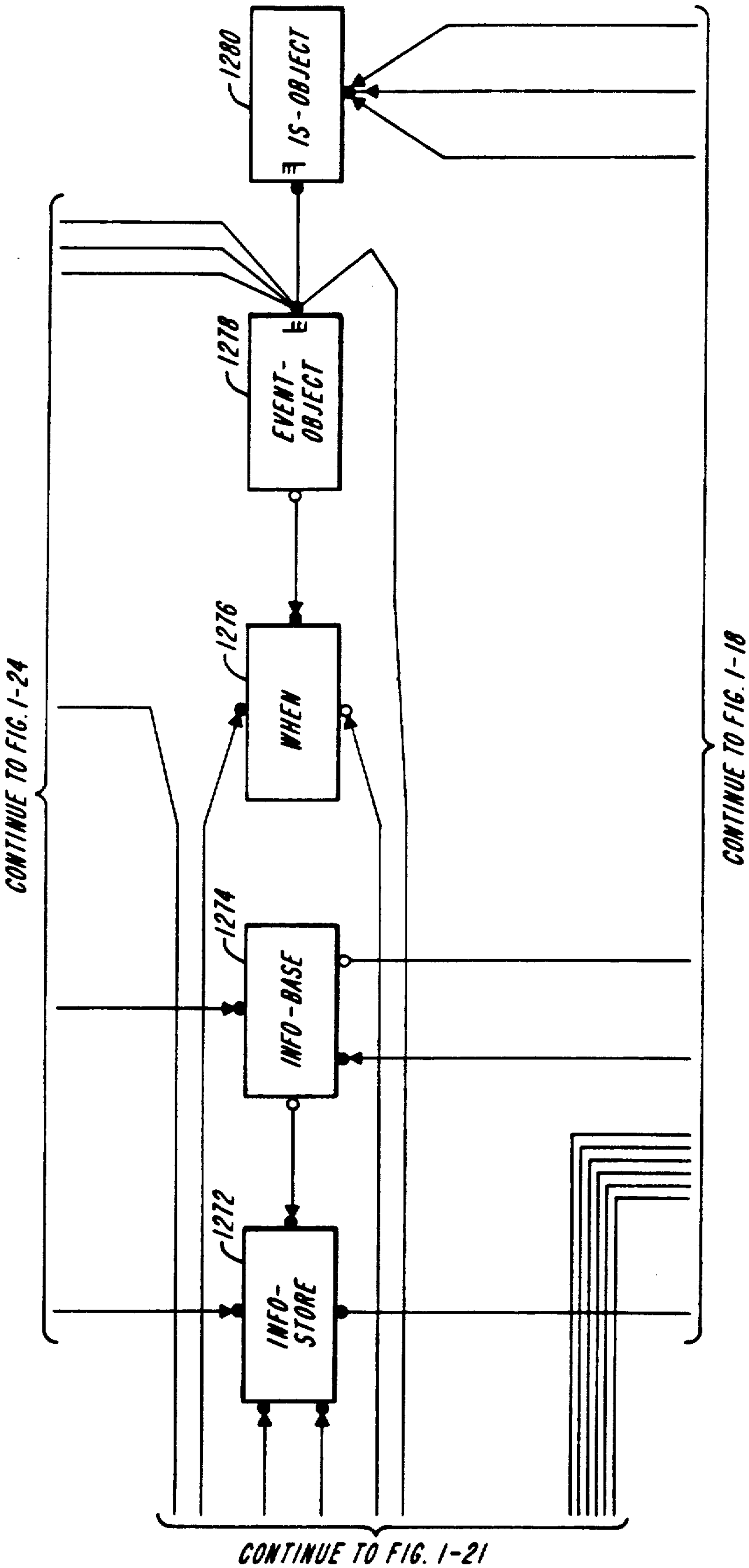
Figures 1, 2, 3, 4, 5, 6, 7, 8, 9, 10, 11, 12, 13, 14, 15, 16, 17, 18, 19, 20, 21, 22, 23:
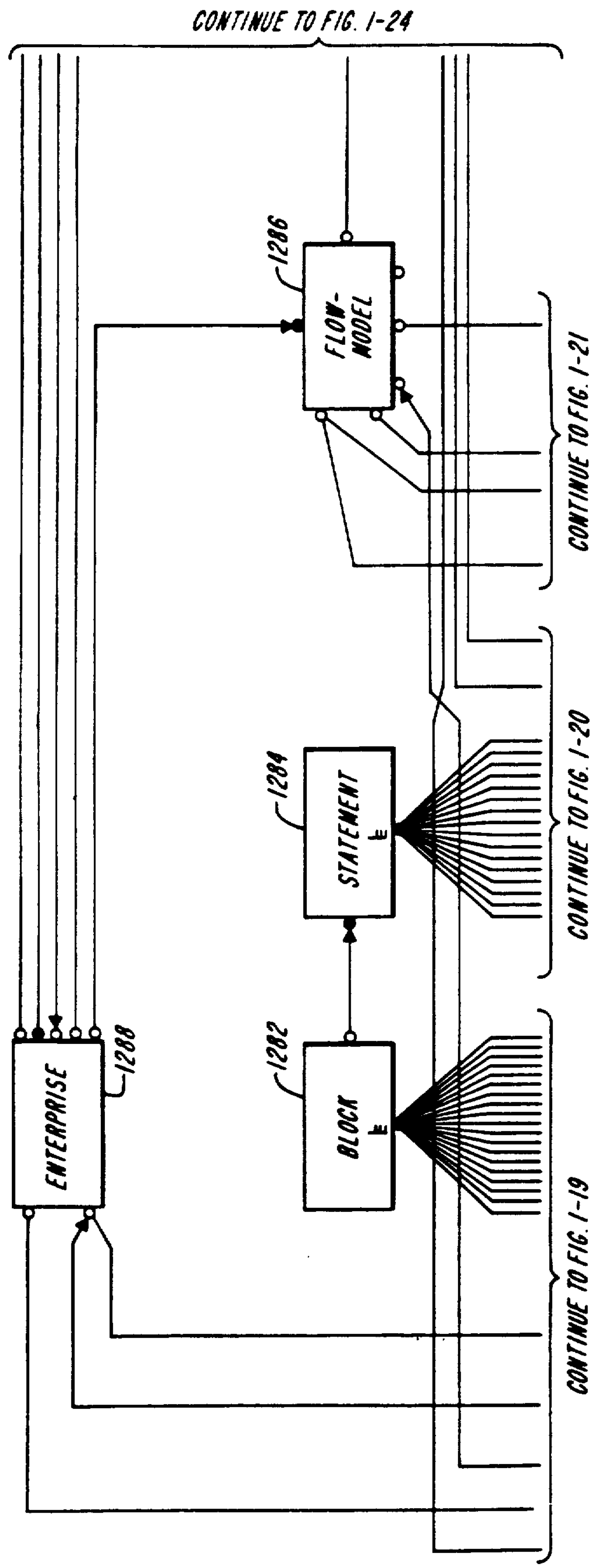
Figures 1, 2, 3, 4, 5, 6, 7, 8, 9, 10, 11, 12, 13, 14, 15, 16, 17, 18, 19, 20, 21, 22, 23, 24:
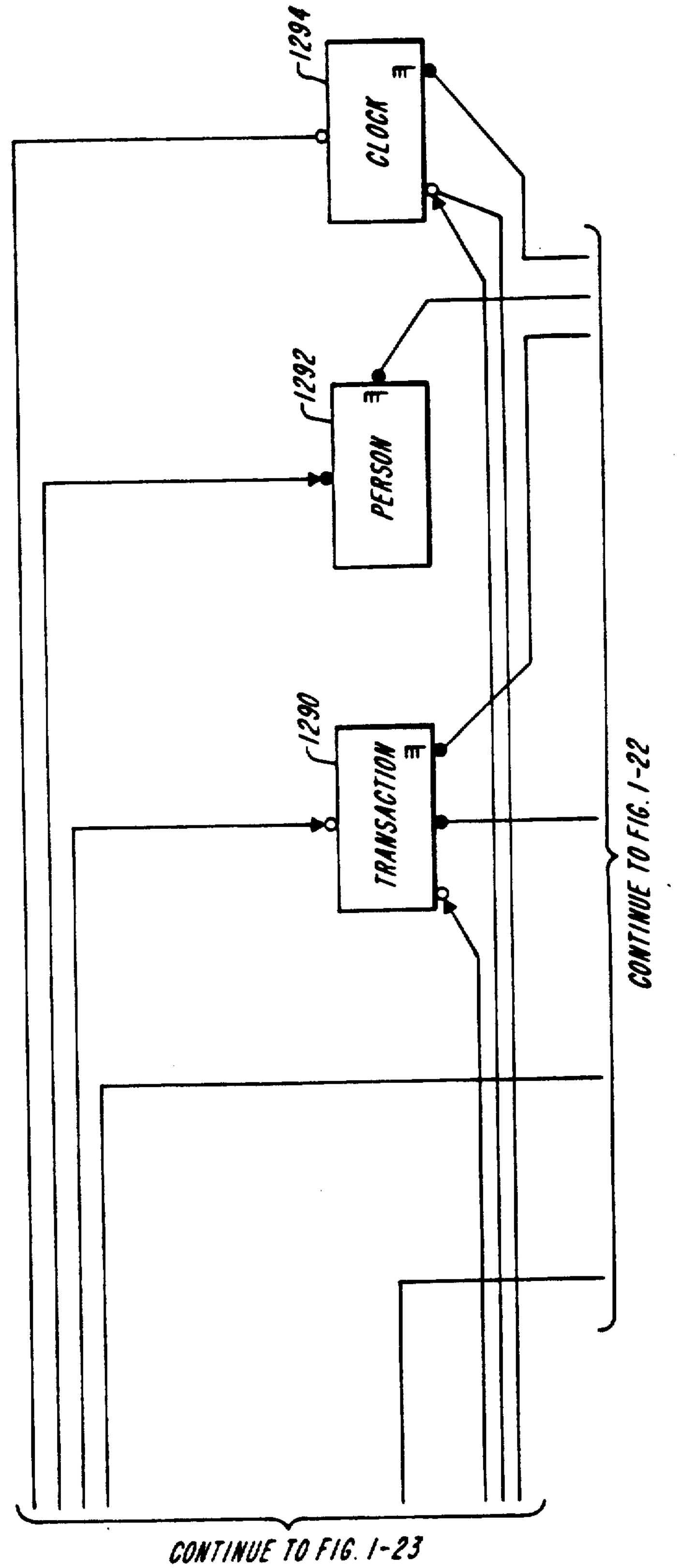
Figure 2:
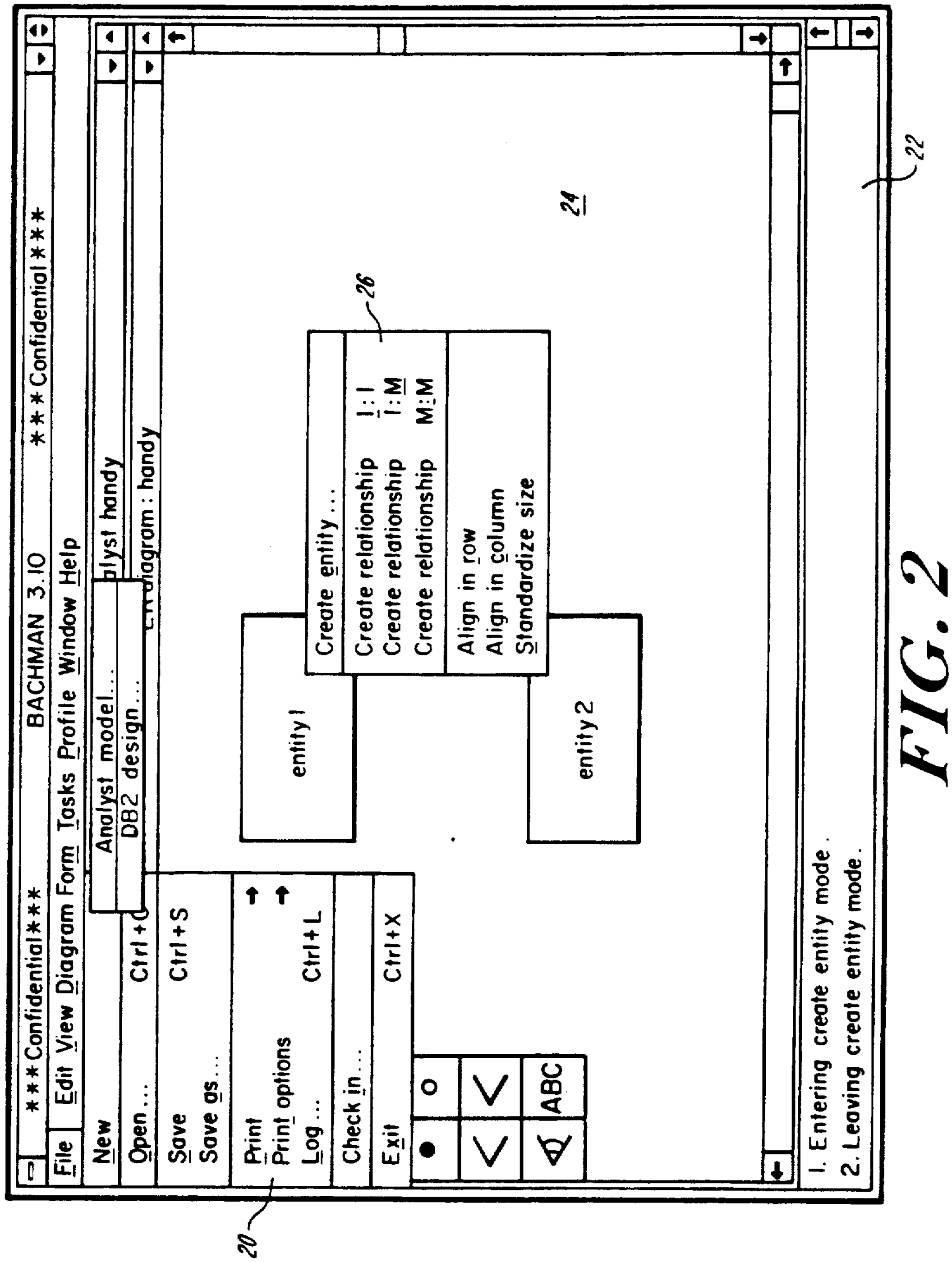

The Information Flow form (Figure 11-13) contains the following fields:

Figure 11-13 Information Flow Form

See illustration at chapter end.

Select—Indicates that the information flow is selected and placed on the Select list.

Name—Specifies the name of the information flow.

*Process Model—Specifies the name of the process model to which the information flow belongs. You cannot edit information in this field. From this field you can display the Process Model form.

Description—Describes the information flow. The system does not use this description; it is for your information only.

*Synonym/Synonyms—An entry field and a list box. Specifies other names by which the information flow is known. From this field you can display the form for the selected synonym.

*Source of Flow—Specifies the source of the information flow by object type and name. From this field you can display the form for the flow's source object (source/destination, information store, or process).

*Destination of Flow—Specifies the destination of the information flow by object type and name. From this field you can display the form for the flow's destination object (source/destination, information store, or process).

*Flow Event—Specifies the event that initiates the information flow. From this field you can display the Event form.

Structure Name—Specifies the name of an information flow structure to be added, deleted, or replaced. An information flow may have zero, one, or many structures.

Structure List—Lists existing structures of the information flow.

Flow Structure Contents—Defines the entities and attributes contained in the information flow structure.

PDL Statement—Specifies the PDL statement corresponding to the information flow structure: CREATE, RETRIEVE, UPDATE, DELETE, SEND/RECEIVE.

Volume—Specifies the number of transactions that the information flow structure is expected to bear.

Growth Rate—Specifies the rate of growth (percent) and period (year, month, or day) of growth expected for the information flow structure.

Order—Specifies by number the sequence of the entity or attribute contained in the information flow structure.

*Contents Object—Specifies the contents of the information flow structure as entities, stored attributes, derived attributes, or free attributes. From this field you can display the form for the named entity or attribute.

*Structure Contents—Lists the entities and attributes contained in the information flow structure. From this field you can display the form for the selected entity or attribute.

System Objective—Describes the objectives of the system (derived from the business objectives) to which the information flow applies. The system does not use this information; it is for your use only.

Keyword/Keywords— Specifies a keyword associated with the information flow.

*Note/Notes— Contains notes about the information flow. From this field you can display the Notes form.

User Information/Created—Displays the login name of the person who created this information flow, and the date and time at which the information flow was created. The system automatically enters this information; you cannot edit it.

User Information/Updated—Displays the login name of the person who last updated this information flow, and the date and time at which the information flow was last updated. The system automatically enters this information; you cannot edit it.

Information Store Form

The Information Store form (Figure 11-14) contains the following fields:

Figure 11-14 Information Store Form

See illustration at chapter end.

Select—Indicates that the information store is selected and placed on the Select list.

Name—Specifies the name of the information store.

Information Store Number—Specifies the number of the information store.

*Process Model—Specifies the name of the process model to which the information store belongs. You cannot edit information in this field. From this field you can display the Process Model form.

Description—Describes the information store. The system does not use this description; it is for your information only.

*Synonym/Synonyms— Specifies other names by which the information store is known. From this field you can display the form for the selected synonym.

*In-Flows—Specifies the information flows into the information store. From this field you can display the form for the selected information flow.

*Out-Flows—Specifies the information flows out of the information store. From this field you can display the form for the selected information flow.

Store Structure Contents—Specifies the name of the information store structure. An information store must have one and only one structure.

> Order—Specifies the sequence of the entity or the stored attribute contained in the information store structure.
>
> Contents Object—Names the entities or stored attributes contained in the information store structure. Use the format ENTITY to enter the names of entities. (In the Beta Release, the system does not recognize structures entered in the format ENTITY.) Use the format ENTITY.ATTRIBUTE or ENTITY.* to enter the names of stored attributes.

*Structure Contents—Lists the entities and stored attributes contained in the information store structure. From this field you can display the form for the selected entity or attribute.

System Objective—Describes the objectives of the system (derived from the business objectives) to which the information store applies. The system does not use this information; it is for your use only.

Keyword/Keywords— Specifies a keyword associated with the information store.

*Note/Notes— Contains notes about the information store. From this field you can display the Notes form.

User Information/Created—Displays the login name of the person who created this information store, and the date and time at which the information store was created. The system automatically enters this information; you cannot edit it.

User Information/Updated—Displays the login name of the person who last updated this information store, and the date and time at which the information store was last updated. The system automatically enters this information; you cannot edit it.

Notes Form

Refer to the section Data Model Forms in this chapter.

Process Form

The Process form (Figure 11-15) contains the following fields:

Figure 11-15 Process Form

| |
|---|
| See illustration at chapter end. |

Select—Indicates that the process is selected and placed on the Select list.

Name—Specifies the name of the process.

Process Number—Specifies the number of the process.

*Process Model—Specifies the name of the process model to which the process belongs. You cannot edit information in this field. From this field you can display the Process Model form.

Description—Describes the process. The system does not use this description; it is for your information only.

*Synonym/Synonyms— Specifies other names by which the process is known. From this field you can display the form for the selected synonym.

Peak Period—Specifies when the highest volume of processing is expected to occur.

Expected Frequency—Specifies the number of times per second, minute, hour, day, week, month, or year that the process is expected to occur.

Triggering Event—Specifies the event that initiates the process (arrival of an information flow, a user/management request, an information store event, a clock/calendar event).

*Process Hierarchy—Specifies the process's relationship to higher-level (parent) and lower-level (child) processes.

> Parent Process—Specifies the parent process, if one exists. From this field you can display the form for the parent process.

Child Processes—Lists the child processes, if any exist. From this field you can display the forms for the selected child processes.

*In-Flows—Specifies the information flows into the process. From this field you can display the form for the selected information flow.

*Out-Flows—Specifies the information flows out of the process. From this field you can display the form for the selected information flow.

*Note/Notes— Contains notes about the process. From this field you can display the Notes form.

User Information/Created—Displays the login name of the person who created this process, and the date and time at which the process was created. The system automatically enters this information; you cannot edit it.

User Information/Updated—Displays the login name of the person who last updated this process, and the date and time at which the process was last updated. The system automatically enters this information; you cannot edit it.

Process Model Form

The Process Model form (Figure 11-16) contains the following fields:

Figure 11-16 Process Model Form

See illustration at chapter end.

Select—Indicates that the process model is selected and placed on the Select list.

Name—Specifies the name of the process model.

*Analyst Model—Specifies the name of the Analyst model to which the process model belongs. You cannot edit information in this field. From this field you can display the form for the specified Analyst model.

*Data Model—Specifies the name of the data model to which the process model belongs. You cannot edit information in this field. From this field you can display the form for the specified data model.

Description—Describes the process model. The system does not use this description; it is for your information only.

*Synonym/Synonyms— Specifies other names by which the process model is known. From this field you can display the form for the selected synonym.

Keyword/Keywords— Specifies a keyword associated with the process model.

Associated Business Objectives—Describes the business objective that the process model attempts to meet. The system does not use this information; it is for your use only.

Associated System Objectives—Describes the system objective that the process model attempts to meet. The system does not use this information; it is for your use only.

*Root Process/Root Processes— Specifies all of the top-level processes contained in the model. From this field you can display the form for a selected process.

*Information Store/Information Stores— Specifies all of the information stores contained in the model. From this field you can display the form for the selected information store.

*Source/Destination-Source/Destinations— Specifies all of the source/destination objects contained in the model. From this field you can display the form for the selected source/destination.

*Note/Notes— Contains notes about the process model. From this field you can display the Notes form.

User Information/Created—Displays the login name of the person who created this process model, and the date and time at which the process model was created. The system automatically enters this information; you cannot edit it.

User Information/Updated—Displays the login name of the person who last updated this process model, and the date and time at which the process model was last updated. The system automatically enters this information; you cannot edit it.

Source/Destination Form

The Source/Destination form (Figure 11-17) contains the following fields:

Figure 11-17 Source/Destination Form

See illustration at chapter end.

Select—Indicates that the source/destination is selected and placed on the Select list.

Name—Specifies the name of the source/destination.

*Process Model—Specifies the name of the process model to which the source/destination belongs. You cannot edit information in this field. From this field you can display the Process Model form.

Description—Describes the source/destination. The system does not use this description; it is for your information only.

*Synonym/Synonyms— Specifies other names by which the source/destination is known. From this field you can display the form for the selected synonym.

Keyword/Keywords— Specifies a keyword associated with the source/destination.

Type—Specifies the type of source/destination: Organizational Unit, System, Role, Other.

*In-Flows—Specifies the information flows into the source/destination. From this field you can display the form for the selected information flow.

*Out-Flows—Specifies the information flows out of the source/destination. From this field you can display the form for the selected information flow.

*Note/Notes— Contains notes about the source/destination. From this field you can display the Notes form.

User Information/Created—Displays the login name of the person who created this source/destination, and the date and time at which the source/destination was created. The system automatically enters this information; you cannot edit it.

User Information/Updated—Displays the login name of the person who last updated this source/destination, and the date and time at which the source/destination was last updated. The system automatically enters this information; you cannot edit it.

Synonym Form

Refer to the section Data Model Forms in this chapter.

Profile Forms

A *profile* defines values for standard system and design parameters. The BACHMAN/Analyst provides four profiles that allow you to customize the system to your environment and your preferred work style:

- The User profile allows you to specify information about your environment and preferred work style. Such as a default directory, the names of your default profiles, the desired level of Advisor interactions, and the number of edit operations that can be undone.
- The Data Model profile allows you to select automatic or manual placement of new objects, to set default values for model objects (for example, a default for the expected volume for entities), and to set default behavior for actions (for example, a default behavior for merging model objects).
- The Process Model profile allows you to select automatic or manual placement of new objects and to set default behavior for actions (for example, a default behavior for merging model objects).
- The Printer profile allows you to set default headers, footers, and margins to be used when printing.

BACHMAN provides the following default profiles in the BACHMAN root directory. When you start the BACHMAN system, these profiles are the active profiles:

| | |
|---|---|
| User | *loginname*.PUR |
| Data model | BACHMAN.PDM |
| Process model | BACHMAN.PPM |
| Printer | BACHMAN.PPR |

You can create new profiles and edit existing profiles. The most recently edited profile, is the active profile of that type.

*Note:* Do not edit the BACHMAN.PUR, BACHMAN.PDM, BACHMAN.PPM, or BACHMAN.PPR profiles. They contain the system's default profile values.

▼ To edit a profile:

1 Select Profile from the action bar.

The Profile pull-down menu is a list of the different types of profiles.

2 Select the type of profile that you want to edit.

A pop-up window appears.

3 Use the Directory list box and the File Name entry field to specify the file name of the profile that you want to edit.

If you specify a nonexistent file name, the system warns you that the file does not exist and asks if you would like to select it anyway. If you say Yes, the system creates a new profile. The fields of the new profile are initialized using the field values of the matching BACHMAN profile.

4 Edit the profile form that appears.

As with any form, changing a field value has an immediate effect. For example, if you change the Advisor interaction settings on the User form, the modified settings immediately become the current settings.

5 Close the profile form using the system menu icon.

A Save Profile pop-up window appears.

6 Select one of the following from the Save Profile pop-up window:

- Save—saves the modified profile.
   - Save as—saves the modified settings in a new profile. The new profile is the active profile.
   - Use for session—does not save the modified profile; however, the modified profile is the active profile.

7 Select the OK pushbutton.

To return to the profile form, select the Cancel pushbutton.

▼ The Save Profile pop-up window does not allow you to cancel changes that you have made to the profile. If you want to return to your pre-edited version of the profile:

1 Select Use For Session in the Save Profile pop-up window.

2 Edit the profile again.

The pre-edited version of the profile appears because Use For Session did not save your changes.

The following sections describe the profile forms.

Data Model Profile Form

The Data Model Profile form (Figure 11-18) contains the following fields:

Figure 11-18 Data Model Profile Form

See illustration at chapter end.

The following field, which appears in the Entities area of the form, is new for Release 3.10:

Place Entities Created Via Palette—Specifies whether the system automatically places newly created objects into the diagram for you or prompts you to place them into the diagram.

- If you select Automatic Placement, the system places all newly created objects in the lower-left corner of the diagram. The objects are not visible until you fit the diagram or scroll to its lower-left corner.
- If you select Manual Placement, the system prompts you to place each newly created object. When prompted (the prompt appears in the message area), click button 1 in the diagram to indicate where you want the object to appear.

> *The remaining fields on the Data Model Profile form are similar to the fields on the Design Profile in the BACHMAN/Data Analyst Release 2.10. For Beta, refer to the* BACHMAN/Data Analyst Reference *manual.*

Printer Profile Form

The Printer Profile form (Figure 11-19) contains the following fields:

Figure 11-19 Printer Profile Form

| |
|---|
| See illustration at chapter end. |

Units of measurement—Specifies whether the system reads the measurements that you enter as inches or centimeters.

Diagram parameters—Specifies the default headers, footers, and margins used when printing diagrams.

Screen parameters—Specifies the default headers, footers, and margins used when printing screens.

Print Options on the File pull-down menu sets additional printer information, such as the type of printer that you are using. Refer to Chapter 4, Working With an Analyst Model, for more information.

Process Model Profile Form

The Process Model Profile form (Figure 11-20) contains the following fields:

Figure 11-20 Process Model Profile Form

| |
|---|
| See illustration at chapter end. |

Model Merge Behavior for Matching Objects—Specifies whether matching objects should be combined or renamed when they are merged.

- If you select Combine Objects, the system combines the matching objects into a single object.
- If you select Insert Object with New Name, the system adds a number to the name of the source object to differentiate it from the target object. The objects no longer match and are not combined.

Placement of Objects in Data Flow Diagram—Specifies whether the system automatically places newly created objects into the diagram for you or prompts you to place them into the diagram.

- If you select Automatic Placement, the system places all newly created objects in the lower-left corner of the diagram. The objects are not visible until you fit the diagram or scroll to its lower-left corner.
- If you select Manual Placement, the system prompts you to place each newly created object. When prompted (the prompt appears in the message area), click button 1 in the diagram to indicate where you want the object to appear.

User Profile Form

The User Profile form (Figure 11-21) contains the following fields:

Figure 11-21 User Profile Form

See illustration at chapter end.

The following fields are new for Release 3.10:

Default DB2 profile—Specifies the full file name of your default DB2 profile. If no file is specified, the system uses the BACHMAN.PD2 profile in the BACHMAN root directory.

Default Data Model profile—Specifies the full file name of your default Data Model profile. If no file is specified, the system uses the BACHMAN.PDM profile in the BACHMAN root directory.

Default Process Model profile—Specifies the full file name of your default Process Model profile. If no file is specified, the system uses the BACHMAN.PPM profile in the BACHMAN root directory.

Default Printer profile—Specifies the full file name of your default Printer profile. If no file is specified, the system uses the BACHMAN.PPR profile in the BACHMAN root directory.

Color settings are not included in the Release 3.10 User Profile because they can be modified through the Utilities menu of the OS/2 Desktop Manager.

> ☛ *The remaining fields on the User Profile form are similar to the fields on the User Profile in the BACHMAN/Data Analyst Release 2.10. For Beta, refer to the BACHMAN/Data Analyst Reference manual.*

Appendix A
Import/Export File Format

Following are column descriptions for each table in an import/export file, Release 3.10 format. The "Enter as" information provided for many of the columns is applicable only if you are creating or modifying the information.

This appendix uses the notation TABLE.column to refer to a column in a table. For example, the notation ENTITY.entitykey refers to the entitykey column of the Entity table.

ANALYST_MODEL

This table lists the Analyst models.

*analyst_modelkey* The unique number that identifies this object.

*createdby* The login name of the person who created this object. Enter as 0-9 alphanumeric characters.

*createdtime* The time at which this object was created. Enter as zero.

*modifiedby* The login name of the person who last modified this object. Enter as 0-9 alphanumeric characters.

*modifiedtime* The time at which this object was last modified. Enter as zero.

*name* The name of this object. Enter as 1-76 characters. The name can include letters, numbers, pound signs (#), dollar signs ($), ampersands (&), underscores (_), dashes (-), and spaces. Underscores, dashes, and spaces are equivalent. Upper- and lower-case characters are equivalent.

*text* The TEXT.textkey value that identifies the Analyst model's description (the description is defined as a separate Text object).

ANALYST_MODELKEYWO

This table associates Analyst models and keywords. Only Analyst models that have keywords appear in this table. An Analyst model appears in the table once for each of its keywords.

*analyst_modelkey* The ANALYST_MODEL.analyst_modelkey value that identifies the Analyst model.

*keywordkey* The KEYWORD.keywordkey value that identifies the keyword.

ANALYST_MODELALIAS

This table associates Analyst models and synonyms (aliases). Only Analyst models that have synonyms appear in this table. An Analyst model appears in the table once for each of its synonyms.

*analyst_modelkey* The ANALYST_MODEL.analyst_modelkey value that identifies the Analyst model.

*aliaskey* The ALIAS.aliaskey value that identifies the synonym.

ANALYST_MODELNOTES

This table associates Analyst models and notes. Only Analyst models that have notes appear in this table.

*analyst_modelkey* The ANALYST_MODEL.analyst_modelkey value that identifies the Analyst model.

*noteskey* The NOTES.noteskey value that identifies the note.

DATA_MODEL

This table lists the data model. Enter only one data model for an Analyst model.

*data_modelkey* The unique number that identifies this object.

*createdby* The login name of the person who created this object. Enter as 0-9 alphanumeric characters.

*createdtime* The time at which this object was created. Enter as zero.

*modifiedby* The login name of the person who last modified this object. Enter as 0-9 alphanumeric characters.

*modifiedtime* The time at which this object was last modified. Enter as zero.

*name* The name of this object. Enter as 1-33 characters. The name can include letters, numbers, pound signs (#), dollar signs ($), ampersands (&), underscores (_), dashes (-), and spaces. Underscores, dashes, and spaces are equivalent. Upper- and lower-case characters are equivalent.

*valbits* Eight validation bits (*valbits*, *valbits2*, ... *valbits8*) that are used during the design task to determine if this object is "Marked as correct". Enter as zeros.

*definer* The name of the person who designed this object. Enter as 0-41 alphanumeric characters.

*text* The TEXT.textkey value that identifies the data model's description (the description is defined as a separate Text object).

*analyst_model* The ANALYST_MODEL.analyst_modelkey that identifies the Analyst model that contains the data model.

DATA_MODELTEXT

This table lists the text blocks in the data model.

*data_modelkey* The DATA_MODEL.data_modelkey value that identifies the data model that contains this object.

*textkey* The TEXT.textkey value that identifies the text of the text block.

TEXT

This table lists the text of the following objects/fields:

- text blocks
- object descriptions
- notes

*textkey* A unique number that identifies this object.

*createdby* The login name of the person who created this object. Enter as 0-9 alphanumeric characters.

*createdtime* The time at which this object was created. Enter as zero.

*modifiedby* The login name of the person who last modified this object. Enter as 0-9 alphanumeric characters.

*modifiedtime* The time at which this object was last modified. Enter as zero.

*loc* Eight values (*loc, loc2, ... loc8*) that define the location of the text block within the Entity-Relationship (E-R) diagram. Enter as zeros.

*just* A number that defines the text justification of a text block, as shown in the following table. Enter zero for object descriptions and note text.

| NUMBER | JUSTIFICATION |
|---|---|
| 0 | Center |
| 1 | Bottom |
| 2 | Top |
| 4 | Left |
| 5 | Left bottom |
| 6 | Left top |
| 8 | Right |
| 9 | Right bottom |
| 10 | Right top |

*string* The text string.

> ☛ *In Beta, the text is not written to the Data Manager database so there is no string column defined in the database.*

ALIAS

This table lists all of the synonyms (aliases) in the Analyst model. An alias is associated with another object through a separate table. For example, if an entity has a synonym:

- The ALIAS table defines the synonym.
- The ENTITY table defines the entity.
- The ENTITYALIAS table associates the entity and the synonym.

*aliaskey* A unique number that identifies this object.

*createdby* The login name of the person who created this object. Enter as 0-9 alphanumeric characters.

*createdtime* The time at which this object was created. Enter as zero.

*modifiedby* The login name of the person who last modified this object. Enter as 0-9 alphanumeric characters.

*modifiedtime* The time at which this object was last modified. Enter as zero.

*name* The name of this object. Enter as 1-33 characters. The name can include letters, numbers, pound signs (#), dollar signs ($), ampersands (&), underscores (_), dashes (-), and spaces. Underscores, dashes, and spaces are equivalent. Upper- and lower-case characters are equivalent.

KEYWORD

This table lists all of the keywords in the Analyst model. A keyword is associated with another object through a separate table. For example, if an entity has a keyword:

- The KEYWORD table defines the keyword.
- The ENTITY table defines the entity.
- The ENTITYKEYWORD table associates the entity and the keyword.

*keywordkey* A unique number that identifies this object.

*createdby* The login name of the person who created this object. Enter as 0-9 alphanumeric characters.

*createdtime* The time at which this object was created. Enter as zero.

*modifiedby* The login name of the person who last modified this object. Enter as 0-9 alphanumeric characters.

*modifiedtime* The time at which this object was last modified. Enter as zero.

*value* The keyword. Enter as 1-9 alphanumeric characters.

*text* The TEXT.textkey value that identifies the keyword's description (the description is defined as a separate Text object).

NOTES

This table lists all of the notes in the Analyst model. A note is associated with another object through a separate table. For example, if an entity has a note:

- The NOTES table defines the note.
- The ENTITY table defines the entity.
- The ENTITYNOTES table associates the entity and the note.
- The TEXT table defines the text of the note.

*noteskey* A unique number that identifies this object.

*createdby* The login name of the person who created this object. Enter as 0-9 alphanumeric characters.

*createdtime* The time at which this object was created. Enter as zero.

*modifiedby* The login name of the person who last modified this object. Enter as 0-9 alphanumeric characters.

*modifiedtime* The time at which this object was last modified. Enter as zero.

*title* The title of the note. Enter as 0-33 alphanumeric characters.

*text* The TEXT.textkey value that identifies the text of the note, which is defined as a separate Text object.

NOTESKEYWORD

This table associates notes and keywords. Only notes that have keywords appear in this table.

*noteskey* The NOTES.noteskey value that identifies the note.

*keywordkey* The KEYWORD.keywordkey value that identifies the keyword.

ER_NOTES

This table is provided for consistency with Release 2.10 format import/export files. Release 2.10 uses this table to record which objects have been marked as correct during Design task sessions.

Do not enter data for this table.

*er_noteskey* A unique number that identifies this object.

*createdby* The login name of the person who created this object. Enter as 0-9 alphanumeric characters.

*createdtime* The time at which this object was created. Enter as zero.

*modifiedby* The login name of the person who last modified this object. Enter as 0-9 alphanumeric characters.

*modifiedtime* The time at which this object was last modified. Enter as zero.

*kwdcode* Used by the system.

*srccode* Used by the system.

ENTITY

This table lists the entities in the data model.

*entitykey* A unique number that identifies this object.

*createdby* The login name of the person who created this object. Enter as 0-9 alphanumeric characters.

*createdtime* The time at which this object was created. Enter as zero.

*modifiedby* The login name of the person who last modified this object. Enter as 0-9 alphanumeric characters.

*modifiedtime* The time at which this object was last modified. Enter as zero.

*name* The name of this object. Enter as 1-33 characters. The name can include letters, numbers, pound signs (#), dollar signs ($), ampersands (&), underscores (_), dashes (-), and spaces. Underscores, dashes, and spaces are equivalent. Upper- and lower-case characters are equivalent.

*minvol* The lowest possible number of occurrences for this entity.

*maxvol* The highest possible number of occurrences for this entity.

*expvol* The expected number of occurrences for this entity.

*grwpct* The expected growth percentage for this entity.

*gptu* The character representing the growth rate period for this entity. Enter one of the following: D for day, M for month, or Y for year.

> ☛ *Not currently in the import/export file.*

*entity* The ENTITY.entitykey value that identifies the parent entity. Enter zero if there is no parent entity.

*outline* Eight numbers (*outline, outline2, ... outline8*) that define the location of the entity within the Entity-Relationship (E-R) diagram.

*valbits* Eight validation bits (*valbits, valbits2, ... valbits8*) that are used during the design task to determine if this object is "Marked as correct". Enter as zeros.

*text* The TEXT.textkey value that identifies the object's description (the description is defined as a separate Text object).

ENTITYNOTES

This table associates entities and notes. Only entities that have notes appear in this table.

*entitykey* The ENTITY.entitykey value that identifies the entity.

*noteskey* The NOTES.notekey value that identifies the note.

ENTITYALIAS

This table associates entities and synonyms (aliases). Only entities that have synonyms appear in this table. An entity appears in the table once for each of its synonyms.

*entitykey* The ENTITY.entitykey value that identifies the entity.

*aliaskey* The ALIAS.aliaskey value that identifies the synonym.

ENTITYKEYWORD

This table associates entities and keywords. Only entities that have keywords appear in this table. An entity appears in the table once for each of its keywords.

*entitykey* The ENTITY.entitykey value that identifies the entity.

*keywordkey* The KEYWORD.keywordkey value that identifies the keyword.

ENTITYER_NOTES

This table associates entities and DA notes; see the ER_NOTES table for more information.

Do not enter data for this table.

*entitykey* The ENTITY.entitykey value that identifies the entity.

*er_noteskey* The ER_NOTES.er_noteskey value that identifies the DA note.

ENT_KEY

This table lists the keys in the data model. The components of the key are associated with the key in separate tables. For example, if a key is composed of two attributes and a partnership-set:

- The ENT_KEY table defines the key.
- The ATTRIBUTE table defines the attributes.
- The P_SET table defines the partnership-set.
- The ATTRIBUTEENT_KEY table associates the attributes with the key.
- The P_SETENT_KEY table assoicates the partnership-set with the key.

*ent_keykey* A unique number that identifies this object.

*createdby* The login name of the person who created this object. Enter as 0-9 alphanumeric characters.

*createdtime* The time at which this object was created. Enter as zero.

*modifiedby* The login name of the person who last modified this object. Enter as 0-9 alphanumeric characters.

*modifiedtime* The time at which this object was last modified. Enter as zero.

*entity* The ENTITY.entitykey value that identifies the owner entity.

*name* The name of this object. Enter as 1-33 characters. The name can include letters, numbers, pound signs (#), dollar signs ($), ampersands (&), underscores (_), dashes (-), and spaces. Underscores, dashes, and spaces are equivalent. Upper- and lower-case characters are equivalent.

*valbits* Eight validation bits (*valbits, valbits2, ... valbits8*) that are used during the design task to determine if this object is "Marked as correct". Enter as zeros.

*text* The TEXT.textkey value that identifies the key's description (the description is defined as a separate Text object).

ENT_KEYNOTES

This table associates keys and notes. Only keys that have notes appear in this table.

*ent_keykey* The ENT_KEY.ent_keykey value that identifies the key.

*noteskey* The NOTES.notekey value that identifies the note.

ENT_KEYALIAS

This table associates keys and synonyms (aliases). Only keys that have synonyms appear in this table. A key appears in the table once for each of its synonyms.

*ent_keykey* The ENT_KEY.ent_keykey value that identifies the key.

*aliaskey* The ALIAS.aliaskey value that identifies the synonym.

ENT_KEYKEYWORD

This table associates keys and keywords. Only keys that have keywords appear in this table. A key appears in the table once for each of its keywords.

*ent_keykey* The ENT_KEY.ent_keykey value that identifies the key.

*keywordkey* The KEYWORD.keywordkey value that identifies the keyword.

ENT_KEYER_NOTES

This table associates keys and DA notes; see the ER_NOTES table for more information.

Do not enter data for this table.

*ent_keykey* The ENT_KEY.ent_keykey value that identifies the key.

*er_noteskey* The ER_NOTES.er_noteskey value that identifies the DA note.

ATTRIBUTE

This table lists the attributes in the data model.

*attributekey* A unique number that identifies this object.

*createdby* The login name of the person who created this object. Enter as 0-9 alphanumeric characters.

*createdtime* The time at which this object was created. Enter as zero.

*modifiedby* The login name of the person who last modified this object. Enter as 0-9 alphanumeric characters.

*modifiedtime* The time at which this object was last modified. Enter as zero.

*entity* The ENTITY.entitykey value that identifies the owner entity; zero if the attribute is a free attribute. The following column identifies the data model of a free attribute.

*data_model* The DATA_MODEL.data_modelkey value that identifies the data model of a free attribute; zero if the attribute is owned by an entity. The previous column identifies the owner entity of an attribute that is not free.

*name* The name of this object. Enter as 1-33 characters. The name can include letters, numbers, pound signs (#), dollar signs ($), ampersands (&), underscores (_), dashes (-), and spaces. Underscores, dashes, and spaces are equivalent. Upper- and lower-case characters are equivalent.

*ordnum* The number that determines the location of this attribute in the attribute list of the Entity form.

*sourcename* The character representing the source of the data for this attribute. Enter one of the following: M for data entered manually, S for data entered by the system, or D for data calculated (derived) by a derivation procedure.

*dimension* The DIMENSION.dimensionkey value that identifies the owner dimension, if any.

*domain* The DOMAIN.domainkey value that identifies the owner domain.

*valbits* Eight validation bits (*valbits, valbits2, ... valbits8*) that are used during the design task to determine if this object is "Marked as correct". Enter as zeros.

*text* The TEXT.textkey value that identifies the object's description (the description is defined as a separate Text object).

ATTRIBUTEENT_KEY

This table associates attributes and keys. Only attributes that are key components appear in this table. An attribute appears in the table once for each key in which it is a component.

*attributekey* The ATTRIBUTE.attributekey value that identifies the attribute.

*ent_keykey* The ENT_KEY.ent_keykey value that identifies the key.

ATTRIBUTENOTES

This table associates attributes and notes. Only attributes that have notes appear in this table.

*attributekey* The ATTRIBUTE.attributekey value that identifies the attribute.

*noteskey* The NOTES.notekey value that identifies the note.

ATTRIBUTEALIAS

This table associates attributes and synonyms (aliases). Only attributes that have synonyms appear in this table. An attribute appears in the table once for each of its synonyms.

*attributekey* The ATTRIBUTE.attributekey value that identifies the attribute.

*aliaskey* The ALIAS.aliaskey value that identifies the synonym.

ATTRIBUTEKEYWORD

This table associates attributes and keywords. Only attributes that have keywords appear in this table. An attribute appears in the table once for each of its keywords.

*attributekey* The ATTRIBUTE.attributekey value that identifies the attribute.

*keywordkey* The KEYWORD.keywordkey value that identifies the keyword.

ATTRIBUTEER_NOTES

This table associates attributes and DA notes; see the ER_NOTES table for more information.

Do not enter data for this table.

*attributekey* The ATTRIBUTE.attributekey value that identifies the attribute.

*er_noteskey* The ER_NOTES.er_noteskey value that identifies the DA note.

ATTR_JUNCTION

This table lists all attributes that are components of other attributes. Only attributes that have parent attributes appear in this table. Shared attributes appear in the table once for each parent.

*attr_junctionkey* A unique number that identifies this object.

*createdby* The login name of the person who created this object. Enter as 0-9 alphanumeric characters.

*createdtime* The time at which this object was created. Enter as zero.

*modifiedby* The login name of the person who last modified this object. Enter as 0-9 alphanumeric characters.

*modifiedtime* The time at which this object was last modified. Enter as zero.

*ordnum* The number that determines the location of this attribute in the attribute list of the Attribute form.

*attribute* The ATTRIBUTE.attributekey value that identifies the parent attribute.

*attribute2* The ATTRIBUTE.attributekey value that identifies the child attribute.

P_SET

This table lists the partnership-sets in the data model.

*p_setkey* A unique number that identifies this object.

*createdby* The login name of the person who created this object. Enter as 0-9 alphanumeric characters.

*createdtime* The time at which this object was created. Enter as zero.

*modifiedby* The login name of the person who last modified this object. Enter as 0-9 alphanumeric characters.

*modifiedtime* The time at which this object was last modified. Enter as zero.

*entity* The ENTITY.entitykey value that identifies the owner entity.

*name* The name of this object. Enter as 1-33 characters. The name can include letters, numbers, pound signs (#), dollar signs ($), ampersands (&), underscores (_), dashes (-), and spaces. Underscores, dashes, and spaces are equivalent. Upper- and lower-case characters are equivalent.

*minvol* The minimum volume for this partnership-set. Enter zero to create an optional partnership-set. Enter one or more to create a mandatory partnership-set.

*maxvol* The maximum volume for this partnership-set. Enter one to create an x:1 partnership-set. Enter a number greater than one to create an x:M partnership-set.

*expvol* The expected volume for this partnership-set. Enter a number that between the minimum volume and the maximum volume, inclusive.

*valbits* Eight validation bits (*valbits, valbits2, ... valbits8*) that are used during the design task to determine if this object is "Marked as correct". Enter as zeros.

*loc* Four numbers (*loc, loc2, ... loc4*) that describe the location of the partnership-set within the Entity-Relationship (E-R) diagram. Enter as zeros.

*labelvisible* A number that indicates whether this partnership-set's label is visible. Enter 1 for visible or 0 for not visible.

*labelloc* Four numbers (*labelloc, labelloc2, ... labelloc4*) that describe the location of the partnership-set's label within the Entity-Relationship (E-R) diagram. Enter as zeros.

*labeljust* A number that defines the text justification of the label, as shown in the following table.

| NUMBER | JUSTIFICATION |
|---|---|
| 0 | Center |
| 1 | Bottom |
| 2 | Top |
| 4 | Left |
| 5 | Left bottom |
| 6 | Left top |
| 8 | Right |
| 9 | Right bottom |
| 10 | Right top |

*labelbreaks* This column is not currently used.

*text* The TEXT.textkey of the label text, which is defined as a separate Text object.

P_SETENT_KEY

This table associates partnership-sets and keys. Only partnership-sets that are key components appear in this table. A partnership-set appears in the table once for each key in which it is a component.

*p_setkey* The P_SET.p_setkey value that identifies the partnership-set.

*ent_keykey* The ENT_KEY.ent_keykey value that identifies the key.

P_SETNOTES

This table associates partnership-sets and notes. Only partnership-sets that have notes appear in this table.

*p_setkey* The P_SET.p_setkey value that identifies the partnership-set.

*noteskey* The NOTES.notekey value that identifies the note.

P_SETALIAS

This table associates partnership-sets and synonyms (aliases). Only partnership-sets that have synonyms appear in this table. A partnership-set appears in the table once for each of its synonyms.

*p_setkey* The P_SET.p_setkey value that identifies the partnership-set.

*aliaskey* The ALIAS.aliaskey value that identifies the synonym.

P_SETKEYWORD

This table associates partnership-sets and keywords. Only partnership-sets that have keywords appear in this table. A partnership-set appears in the table once for each of its keywords.

*p_setkey* The P_SET.p_setkey value that identifies the partnership-set.

*keywordkey* The KEYWORD.keywordkey value that identifies the keyword.

P_SETER_NOTES

This table associates partnership-sets and DA notes; see the ER_NOTES table for more information.

Do not enter data for this table.

*p_setkey* The P_SET.p_setkey value that identifies the partnership-set.

*er_noteskey* The ER_NOTES.er_noteskey value that identifies the DA note.

PARTNERSHIP

The table lists the partnerships in the data model.

*partnershipkey* A unique number that identifies this object.

*createdby* The login name of the person who created this object. Enter as 0-9 alphanumeric characters.

*createdtime* The time at which this object was created. Enter as zero.

*modifiedby* The login name of the person who last modified this object. Enter as 0-9 alphanumeric characters.

*modifiedtime* The time at which this object was last modified. Enter as zero.

*p_set* The P_SET.p_setkey value that identifies the source partnership-set of the partnership.

*p_set2* The P_SET.p_setkey value that identifies the destination partnership-set of the partnership.

*min1vol* The minimum volume of the source partnership-set for this partnership.

*max1vol* The maximum volume of the source partnership-set for this partnership.

*min2vol* The minimum volume of the destination partnership-set for this partnership.

*max2vol* The maximum volume of the destination partnership-set for this partnership.

*valbits* Eight validation bits (*valbits, valbits2, ... valbits8*) that are used during the design task to determine if this object is "Marked as correct". Enter as zeros.

PARTNERSHIPER_NOTES

This table associates partnerships and DA notes; see the ER_NOTES table for more information.

Do not enter data for this table.

*partnershipkey* The PARTNERSHIP.partnershipkey value that identifies the partnership.

*er_noteskey* The ER_NOTES.er_noteskey value that identifies the DA note.

PSHIP_ROUTE_PT

This table lists the vertices of each partnership line.

Do not enter data in this table.

*pship_route_ptkey* A unique number that identifies this object.

*createdby* The login name of the person who created this object. Enter as 0-9 alphanumeric characters.

*createdtime* The time at which this object was created. Enter as zero.

*modifiedby* The login name of the person who last modified this object. Enter as 0-9 alphanumeric characters.

*modifiedtime* The time at which this object was last modified. Enter as zero.

*segpt* Four values (*segpt, segpt2, segpt3, segpt4*) that define the location of the vertex within the Entity-Relationship (E-R) diagram.

*partnership* The PARTNERSHIP.partnershipkey value that identifies the partnership line that contains this vertex.

*indx* The order number of this vertex with the series of vertices for its partnership line.

DIMENSION

*dimensionkey* A unique number that identifies this object.

*createdby* The login name of the person who created this object. Enter as 0-9 alphanumeric characters.

*createdtime* The time at which this object was created. Enter as zero.

*modifiedby* The login name of the person who last modified this object. Enter as 0-9 alphanumeric characters.

*modifiedtime* The time at which this object was last modified. Enter as zero.

*name* The name of this object. Enter as 1-33 characters. The name can include letters, numbers, pound signs (#), dollar signs ($), ampersands (&), underscores (_), dashes (-), and spaces. Underscores, dashes, and spaces are equivalent. Upper- and lower-case characters are equivalent.

*dimension* Not currently used.

*valbits* Eight validation bits (*valbits, valbits2, ... valbits8*) that are used during the design task to determine if this object is "Marked as correct". Enter as zeros.

*text* The TEXT.textkey value that identifies the dimension's description (the description is defined as a separate Text object).

DIMENSIONNOTES

This table associates dimensions and notes. Only dimensions that have notes appear in this table.

*dimensionkey* The DIMENSION.dimensionkey value that identifies the dimension.

*noteskey* The NOTES.notekey value that identifies the note.

DIMENSIONALIAS

This table associates dimensions and synonyms (aliases). Only dimensions that have synonyms appear in this table. A dimension appears in the table once for each of its synonyms.

*dimensionkey* The DIMENSION.dimensionkey value that identifies the dimension.

*aliaskey* The ALIAS.aliaskey value that identifies the synonym.

DIMENSIONER_NOTES

This table associates dimensions and DA notes; see the ER_NOTES table for more information.

Do not enter data for this table.

*dimensionkey* The DIMENSION.dimensionkey value that identifies the dimension.

*er_noteskey* The ER_NOTES.er_noteskey value that identifies the DA note.

DOMAIN

*domainkey* A unique number that identifies this object.

*createdby* The login name of the person who created this object. Enter as 0-9 alphanumeric characters.

*createdtime* The time at which this object was created. Enter as zero.

*modifiedby* The login name of the person who last modified this object. Enter as 0-9 alphanumeric characters.

*modifiedtime* The time at which this object was last modified. Enter as zero.

*dimension* The DIMENSION.dimensionkey value that identifies the domain's dimension; zero if the domain has no dimension.

A domain can have a dimension, a superdomain, or neither. Use the dimension column to identify the domain's dimension, the domain column to enter its superdomain, or (if it has neither a dimension nor a superdomain) the data_model column to identify the owning data model.

*data_model* The DATA_MODEL.data_modelkey value that identifies the data model that contains the domain; zero if the domain has a dimension or superdomain.

A domain can have a dimension, a superdomain, or neither. Use the dimension column to identify the domain's dimension, the domain column to enter its superdomain, or (if it has neither a dimension nor a superdomain) the data_model column to identify the owning data model.

*domain* The DOMAIN.domainkey value that identifies the domain's superdomain; zero if the domain has no superdomain.

A domain can have a dimension, a superdomain, or neither. Use the dimension column to identify the domain's dimension, the domain column to enter its superdomain, or (if it has neither a dimension nor a superdomain) the data_model column to identify the owning data model.

*name* The name of this object. Enter as 1-33 characters. The name can include letters, numbers, pound signs (#), dollar signs ($), ampersands (&), underscores (_), dashes (-), and spaces. Underscores, dashes, and spaces are equivalent. Upper- and lower-case characters are equivalent.

*ord* smallint,

*minvalue* Explanation to be supplied.

*minvalue2* Explanation to be supplied.

*minvalue3* Explanation to be supplied.

*minvalue4* Explanation to be supplied.

*maxvalue* Explanation to be supplied.

*maxvalue2* Explanation to be supplied.

*maxvalue3* Explanation to be supplied.

*maxvalue4* Explanation to be supplied.

*minlen* The minimum length for a character datatype. Enter zero if the domain does not have a character datatype.

*maxlen* The maximum length for a character datatype. Enter zero if the domain does not have a character datatype.

*valbits* Eight validation bits (*valbits, valbits2, ... valbits8*) that are used during the design task to determine if this object is "Marked as correct". Enter as zeros.

*avglen* The average length for a character datatype. Enter zero if the domain does not have a character datatype.

*text* The TEXT.textkey value that identifies the object's description (the description is defined as a separate Text object).

DOMAINNOTES

This table associates domains and notes. Only domains that have notes appear in this table.

*domainkey* The DOMAIN.domainkey value that identifies the domain.

*noteskey* The NOTES.notekey value that identifies the note.

DOMAINALIAS

This table associates domains and synonyms (aliases). Only domains that have synonyms appear in this table. A domain appears in the table once for each of its synonyms.

*domainkey* The DOMAIN.domainkey value that identifies the domain.

*aliaskey* The ALIAS.aliaskey value that identifies the synonym.

DOMAINKEYWORD

This table associates domains and keywords. Only domains that have keywords appear in this table. A domain appears in the table once for each of its keywords.

*domainkey* The DOMAIN.domainkey value that identifies the domain.

*keywordkey* The KEYWORD.keywordkey value that identifies the keyword.

DOMAINER_NOTES

This table associates domains and DA notes; see the ER_NOTES table for more information.

Do not enter data for this table.

*domainkey* The DOMAIN.domainkey value that identifies the domain.

*er_noteskey* The ER_NOTES.er_noteskey value that identifies the DA note.

METHOD

*methodkey* A unique number that identifies this object.

*createdby* The login name of the person who created this object. Enter as 0-9 alphanumeric characters.

*createdtime* The time at which this object was created. Enter as zero.

*modifiedby* The login name of the person who last modified this object. Enter as 0-9 alphanumeric characters.

*modifiedtime* The time at which this object was last modified. Enter as zero.

*entity* The ENTITY.entitykey value that identifies the owner entity for an entity method; zero if the method is a derivation method. The following column identifies the owner attribute for a derivation method.

*attribute* The ATTRIBUTE.attributekey value that identifies the owner attribute of the derivation method; zero if the method is an entity method. The previous column identifies the owner entity for an entity method.

*domain* The DOMAIN.domainkey value that identifies the domain of a derivation method; zero if the method is an entity method.

*name* The name of this object. Enter as 1-33 characters. The name can include letters, numbers, pound signs (#), dollar signs ($), ampersands (&), underscores (_), dashes (-), and spaces. Underscores, dashes, and spaces are equivalent. Upper- and lower-case characters are equivalent.

PROCESS_MODEL

This table lists the process models in the Analyst model.

*process_modelkey* A unique number that identifies this object.

*createdby* The login name of the person who created this object. Enter as 0-9 alphanumeric characters.

*createdtime* The time at which this object was created. Enter as zero.

*modifiedby* The login name of the person who last modified this object. Enter as 0-9 alphanumeric characters.

*modifiedtime* The time at which this object was last modified. Enter as zero.

*analyst_model* The ANALYST_MODEL.analyst_modelkey value that identifies the Analyst model that contains this process model.

*data_model* The DATA_MODEL.data_modelkey value that identifies the data model associated with this process model.

*name* The name of this object. Enter as 1-33 characters. The name can include letters, numbers, pound signs (#), dollar signs ($), ampersands (&), underscores (_), dashes (-), and spaces. Underscores, dashes, and spaces are equivalent. Upper- and lower-case characters are equivalent.

*text* The TEXT.textkey value that identifies the system objective of the process model. The objective is defined as a separate Text object.

*text2* The TEXT.textkey value that identifies the business objective of the process model. The objective is defined as a separate Text object.

*text3* The TEXT.textkey value that identifies the object's description. The description is defined as a separate Text object.

*hproc* The process number to be assigned to the next process created in the process model. The BACHMAN system resets this value when you renumber processes; therefore, enter it as zero and renumber processes after importing the file.

*hstore* The information store number to be assigned to the next information store created in the process model. The BACHMAN system resets this value when you renumber information stores; therefore, enter it as zero and renumber information stores after importing the file.

*Note:* You cannot renumber information stores in Beta.

PROCESS_MODELNOTES

This table associates process models and notes. Only process models that have notes appear in this table.

*process_modelkey* The PROCESS_MODEL.process_modelkey value that identifies the process model.

*noteskey* The NOTES.noteskey value that identifies the note.

PROCESS_MODELKEYWO

This table associates process models and keywords. Only process models that have keywords appear in this table. A process model appears in the table once for each of its keywords.

*process_modelkey* The PROCESS_MODEL.process_modelkey value that identifies the process model.

*keywordkey* The KEYWORD.keywordkey value that identifies the keyword.

PROCESS_MODELTEXT

This table associates process models and notes. Only process models that have notes appear in this table.

*process_modelkey* The PROCESS_MODEL.process_modelkey value that identifies the process model.

*textkey* The NOTES.notekey value that identifies the note.

ENTITY_PM_MAP

This table associates entities with the process models that reference them. Only entities referenced by process models appear in this table. An entity appears in the table once for each process model that references it.

*entity_pm_mapkey* A unique number that identifies this object.

*createdby* The login name of the person who created this object. Enter as 0-9 alphanumeric characters.

*createdtime* The time at which this object was created. Enter as zero.

*modifiedby* The login name of the person who last modified this object. Enter as 0-9 alphanumeric characters.

*modifiedtime* The time at which this object was last modified. Enter as zero.

*name* The name of this object. Enter as 1-33 characters. The name can include letters, numbers, pound signs (#), dollar signs ($), ampersands (&), underscores (_), dashes (-), and spaces. Underscores, dashes, and spaces are equivalent. Upper- and lower-case characters are equivalent.

*entity* The ENTITY.entitykey value of the referenced entity.

*process_model* The PROCESS_MODEL.process_modelkey value of the process model that references the entity.

*cum_access* For internal use only. Always enter as zero.

*metric_2* For internal use only. Always enter as zero.

ATTRIB_PM_MAP

This table associates attributes with the process models that reference them. Only attributes referenced by process models appear in this table. An attribute appears in the table once for each process model that references it.

*attrib_pm_mapkey* A unique number that identifies this object.

*createdby* The login name of the person who created this object. Enter as 0-9 alphanumeric characters.

*createdtime* The time at which this object was created. Enter as zero.

*modifiedby* The login name of the person who last modified this object. Enter as 0-9 alphanumeric characters.

*modifiedtime* The time at which this object was last modified. Enter as zero.

*name* The name of this object. Enter as 1-33 characters. The name can include letters, numbers, pound signs (#), dollar signs ($), ampersands (&), underscores (_), dashes (-), and spaces. Underscores, dashes, and spaces are equivalent. Upper- and lower-case characters are equivalent.

*attribute* The ATTRIBUTE.attributekey value of the referenced attribute.

*process_model* The PROCESS_MODEL.process_modelkey value of the process model that references the attribute.

*cum_access* For internal use only. Enter as zero.

*metric_2* For internal use only. Enter as zero.

PROCESS

This table lists the processes in the process model.

*processkey* A unique number that identifies this object.

*createdby* The login name of the person who created this object. Enter as 0-9 alphanumeric characters.

*createdtime* The time at which this object was created. Enter as zero.

*modifiedby* The login name of the person who last modified this object. Enter as 0-9 alphanumeric characters.

*modifiedtime* The time at which this object was last modified. Enter as zero.

*process_model* The PROCESS_MODEL.process_modelkey value of the process model that contains the process.

*name* The name of this object. Enter as 1-76 characters. The name can include letters, numbers, pound signs (#), dollar signs ($), ampersands (&), underscores (_), dashes (-), and spaces. Underscores, dashes, and spaces are equivalent. Upper- and lower-case characters are equivalent.

*process* The PROCESS.processkey value that identifies the parent process; zero if the process has no parent process.

*number* The process number. If the process is a subprocess, this is the last number of the subprocess number. For example, if the process number is 1.2, this value is 2. Previous numbers of the subprocess number can be found in the definition of the parent process.

*outline* Eight values (*outline, outline2, ... outline8*) that define the location of the process within the Data Flow Diagram (DFD).

*primitive* A number that indicates whether the process is a primitive process. Enter one for a primitive process; zero for a nonprimitive process.

*process2* The PROCESS.processkey value that identifies the sibling process that appears above this process in the FD diagram. Enter as zero.

*text* The TEXT.textkey value that identifies the Organizational Unit of the process. The organizational unit is defined as a separate Text object.

*text2* The TEXT.textkey value that identifies the object's description. The description is defined as a separate Text object.

*hchild* The process number to be assigned to the next subprocess created in this process. The BACHMAN system resets this value when you renumber the subprocesses of a process; therefore, enter it as zero and renumber the subprocesses after importing the file.

PROCESSNOTES

This table associates processes and notes. Only processes that have notes appear in this table.

*processkey* The PROCESS.processkey value that identifies the process.

*noteskey* The NOTES.noteskey value that identifies the note.

PROCESSTEXT

This table associates processes and performance objectives. Only processes that have performance objectives appear in this table.

*processkey* The PROCESS.processkey value that identifies the process.

*textkey* The TEXT.textkey value that identifies the text of the performance objective. The objective is defined as a separate Text object.

PROCESSKEYWORD

This table associates entities and keywords. Only entities that have keywords appear in this table. A process appears in the table once for each of its keywords.

*processkey* The PROCESS.processkey value that identifies the process.

*keywordkey* The KEYWORD.keywordkey value that identifies the keyword.

SOURCE_DEST

This table lists the source/destination objects in the process model.

*source_destkey* A unique number that identifies this object.

*createdby* The login name of the person who created this object. Enter as 0-9 alphanumeric characters.

*createdtime* The time at which this object was created. Enter as zero.

*modifiedby* The login name of the person who last modified this object. Enter as 0-9 alphanumeric characters.

*modifiedtime* The time at which this object was last modified. Enter as zero.

*process_model* The PROCESS_MODEL.process_modelkey value of the process model that contains the source/destination object.

*name* The name of this object. Enter as 1-76 characters. The name can include letters, numbers, pound signs (#), dollar signs ($), ampersands (&), underscores (_), dashes (-), and spaces. Underscores, dashes, and spaces are equivalent. Upper- and lower-case characters are equivalent.

*outline* Eight values (*outline, outline2, ... outline8*) that define the location of the source/destination object within the Data Flow Diagram (DFD).

*text* The TEXT.textkey value that identifies the object's description. The description is defined as a separate Text object.

SOURCE_DESTNOTES

This table associates source/destination objects and notes. Only source/destination objects that have notes appear in this table.

*source_destkey* The SOURCE_DEST.source_destkey value that identifies the source/destination object.

*noteskey* The NOTES.noteskey value that identifies the note.

SOURCE_DESTKEYWORD

This table associates source/destination objects and notes. Only source/destination objects that have notes appear in this table.

*source_destkey* The SOURCE_DEST.source_destkey value that identifies the source/destination object.

*keywordkey* The KEYWORD.keywordkey value that identifies the keyword.

INFO_STORE

This table lists the information stores in the process model.

*info_storekey* A unique number that identifies this object.

*createdby* The login name of the person who created this object. Enter as 0-9 alphanumeric characters.

*createdtime* The time at which this object was created. Enter as zero.

*modifiedby* The login name of the person who last modified this object. Enter as 0-9 alphanumeric characters.

*modifiedtime* The time at which this object was last modified. Enter as zero.

*process_model* The PROCESS_MODEL.process_modelkey value of the process model that contains the process.

*name* The name of this object. Enter as 1-76 characters. The name can include letters, numbers, pound signs (#), dollar signs ($), ampersands (&), underscores (_), dashes (-), and spaces. Underscores, dashes, and spaces are equivalent. Upper- and lower-case characters are equivalent.

*outline* Eight values (*outline, outline2, ... outline8*) that define the location of the information store within the Data Flow Diagram (DFD).

*number* The number of the information store.

*text* The TEXT.textkey value that identifies the object's system objective. The objective is defined as a separate Text object.

*text2* The TEXT.textkey value that identifies the object's description. The description is defined as a separate Text object.

INFO_STORENOTES

This table associates information stores and notes. Only information stores that have notes appear in this table.

*info_storekey* The INFO_STORE.info_storekey value that identifies the information store.

*noteskey* The NOTES.noteskey value that identifies the note.

INFO_STOREKEYWORD

This table associates information stores and keywords. Only information stores that have keywords appear in this table. An information store appears in the table once for each of its keywords.

*info_storekey* The INFO_STORE.info_storekey value that identifies the information store.

*keywordkey* The KEYWORD.keywordkey value that identifies the keyword.

INFO_FLOW

This table lists the information flows in the process model. Two rows are created for each information flow (one for each direction).

*info_flowkey* A unique number that identifies this object.

*createdby* The login name of the person who created this object. Enter as 0-9 alphanumeric characters.

*createdtime* The time at which this object was created. Enter as zero.

*modifiedby* The login name of the person who last modified this object. Enter as 0-9 alphanumeric characters.

*modifiedtime* The time at which this object was last modified. Enter as zero.

*process_model* The PROCESS_MODEL.process_modelkey value of the process model that contains the source/destination object.

*name* The name of this object. Enter as 1-76 characters. The name can include letters, numbers, pound signs (#), dollar signs ($), ampersands (&), underscores (_), dashes (-), and spaces. Underscores, dashes, and spaces are equivalent. Upper- and lower-case characters are equivalent.

*source_dest* The SOURCE_DEST.source_destkey value that identifies the source/destination object, if any, at the start of the information flow; zero if the information flow starts at a different type of object.

*info_store* The INFO_STORE.info_storekey value that identifies the information store, if any, at the start of the information flow; zero if the information flow starts at a different type of object.

*process* The PROCESS.processkey value that identifies the process, if any, at the start of the information flow; zero if the information flow starts at a different type of object.

*text* This column is being deleted from the export file.

*text2* The TEXT.textkey value that identifies the system objective of the information flow. The objective is defined as a separate Text object.

*text3* The TEXT.textkey value that identifies the object's description. The description is defined as a separate Text object.

INFO_FLOWNOTES

This table associates information flows and notes. Only information flows that have notes appear in this table.

*info_flowkey* The INFO_FLOW.info_flowkey value that identifies the information flow.

*noteskey* The NOTES.noteskey value that identifies the note.

INFO_FLOWKEYWORD

This table associates information flows and notes. Only information flows that have notes appear in this table.

*info_flowkey* The INFO_FLOW.info_flowkey value that identifies the information flow.

*keywordkey* The KEYWORD.keywordkey value that identifies the keyword.

INFO_FLOWSOURCE_DE

This table associates an information flow and the source/destination object that is its destination. Only information flows that end at a souce/destination object appear in this table.

*info_flowkey* The INFO_FLOW.info_flowkey value that identifies the information flow.

*source_destkey* The SOURCE_DEST.source_destkey value that identifies the source/destination object.

INFO_FLOWINFO_STOR

This table associates an information flow and the information store that is its destination object. Only information flows that end at an information store appear in this table.

*info_flowkey* The INFO_FLOW.info_flowkey value that identifies the information flow.

*info_storekey* The INFO_STORE.info_storekey value that identifies the information store.

INFO_FLOWPROCESS

This table associates an information flow and the process that is its destination object. Only information flows that end at a process appear in this table.

*info_flowkey* The INFO_STORE.info_storekey value that identifies the information store.

*processkey* The PROCESS.processkey value that identifies the process.

FLOW_ROUTE_PT

This table lists the vertices of each information flow.

Do not enter data in this table.

*flow_route_ptkey* A unique number that identifies this object.

*createdby* The login name of the person who created this object. Enter as 0-9 alphanumeric characters.

*createdtime* The time at which this object was created. Enter as zero.

*modifiedby* The login name of the person who last modified this object. Enter as 0-9 alphanumeric characters.

*modifiedtime* The time at which this object was last modified. Enter as zero.

*segpt* Four values (*segpt, segpt2, segpt3, segpt4*) that define the location of the vertex within the Data Flow Diagram (DFD).

*indx* The order number of this vertex with the series of vertices for its information flow.

*info_flow* The INFO_FLOW.info_flowkey value that identifies the information flow that contains this vertex.

PDL

This table, with the tables in the following list, describe the Process Description Language (PDL) procedures in the Analyst model. Descriptions of these tables will be supplied in a later release of the documentation.

- PDL_ENTITY_METHOD
- PDL_PROCESS_ROOT
- PDL_EXTERNAL_PROC
- PDL_INTERNAL_PROC
- DO_STATEMENT
- SEND_STATEMENT
- RECEIVE_STATEMENT

- SIGNAL_STATEMENT
- CREATE_STATEMENT
- DELETE_STATEMENT
- UPDATE_STATEMENT
- RETRIEVE_STATEMEN
- ORDER_ATTRIBUTE
- GROUP_ATTRIBUTE
- IF_STATEMENT
- ELSEIF_STATEMENT
- CASE_STATEMENT
- CASE_SELECTOR
- ASSIGN_STATEMENT
- FOREACH_STATEMENT
- LOOP_STATEMENT
- PDL_EXPRESSION
- PDL_VARIABLE
- PDL_SIMPLECONST
- PDL_CONSTANT
- WHEN_STATEMENT
- ENTITY_APPSTRUCT
- ATTRIB_APPSTRUCT
- TAPP_OBSOLETE
- NOTE_STATEMENT
- PDL_ENTITY_METHOD

STORE_STRUCTURE

This table lists the information store structures in a process model. Enter one information store structure for each information store.

*store_structurekey* A unique number that identifies this object.

*createdby* The login name of the person who created this object. Enter as 0-9 alphanumeric characters.

*createdtime* The time at which this object was created. Enter as zero.

*modifiedby* The login name of the person who last modified this object. Enter as 0-9 alphanumeric characters.

*modifiedtime* The time at which this object was last modified. Enter as zero.

*name* The name of this object. Enter as 1-32 characters. The name can include letters, numbers, pound signs (#), dollar signs ($), ampersands (&), underscores (_), dashes (-), and spaces. Underscores, dashes, and spaces are equivalent. Upper- and lower-case characters are equivalent.

*info_store* The INFO_STORE.info_storekey value that identifies the information store.

*ordnum* The number that determines the order in which the structure appears in the Structure List field of the Information Store form. Enter as 0.

STORE_ENTITY

This table lists the entities in each information store structure. The table identifies an entity by its entity-to-process model map. The map associates an entity with the process model that references the entity. For example, if an entity is contained an in information store:

- The ENTITY table defines the entity.
- The INFO_STORE table defines the information store.
- The STORE_STRUCTURE table defines the information store structure.
- The ENTITY_PM_MAP table associates the entity with the process model that contains the information store.
- The STORE_ENTITY table associates the entity and the information store using the entity's ENTITY_PM_MAP and the information store's STORE_STRUCTURE.

*store_entitykey* A unique number that identifies this object.

*createdby* The login name of the person who created this object. Enter as 0-9 alphanumeric characters.

*createdtime* The time at which this object was created. Enter as zero.

*modifiedby* The login name of the person who last modified this object. Enter as 0-9 alphanumeric characters.

*modifiedtime* The time at which this object was last modified. Enter as zero.

*name* The name of this object. Enter as 1-32 characters. The name can include letters, numbers, pound signs (#), dollar signs ($), ampersands (&), underscores (_), dashes (-), and spaces. Underscores, dashes, and spaces are equivalent. Upper- and lower-case characters are equivalent.

*store_structure* The STORE_STRUCTURE.store_structurekey value that identifies the information store structure that contains the entity.

*entity_pm_map* The ENTITY_PM_MAP.entity_pm_mapkey value that identifies the entity.

*ordnum* The number that determines the order in which this entity appears in the Structure Contents field of the Information Store form.

STORE_ATTRIBUTE

This table lists the attributes in each information store structure. The table identifies an attribute by its attribute-to-process model map. The map associates an attribute with the process model that references the attribute. For example, if an attribute is contained in an information store:

- The ATTRIBUTE table defines the attribute.
- The INFO_STORE table defines the information store.
- The STORE_STRUCTURE table defines the information store structure.

- The ATTRIB_PM_MAP table associates the attribute with the process model that contains the information store.
- The STORE_ATTRIBUTE table associates the attribute and the information store using the attribute's ATTRIB_PM_MAP and the information store's STORE_STRUCTURE.

*store_attributekey* A unique number that identifies this object.

*createdby* The login name of the person who created this object. Enter as 0-9 alphanumeric characters.

*createdtime* The time at which this object was created. Enter as zero.

*modifiedby* The login name of the person who last modified this object. Enter as 0-9 alphanumeric characters.

*modifiedtime* The time at which this object was last modified. Enter as zero.

*name* The name of this object. Enter as 1-32 characters. The name can include letters, numbers, pound signs (#), dollar signs ($), ampersands (&), underscores (_), dashes (-), and spaces. Underscores, dashes, and spaces are equivalent. Upper- and lower-case characters are equivalent.

*store_entity* The STORE_ENTITY.store_entitykey value that identifies the entity in the information store structure that owns this attribute; zero is the attribute is a free attribute. The previous column identifies the informations structure that contains the free attribute.

*store_structure* The STORE_STRUCTURE.store_structurekey value that identifies the structure that contains this free attribute; zero if the attribute is owned by an entity. The following column identifies the owner entity of an owned attribute.

*type* This column is not used by the system.

*attrib_pm_map* The ATTRIB_PM_MAP.attrib_pm_mapkey value that identifies the attribute.

*ordnum* The number that determines the order in which this attribute appears in the Structure Contents field of the Information Store form.

FLOW_STRUCTURE

This table lists the information flow structures in a process model.

*flow_structurekey* A unique number that identifies this object.

*createdby* The login name of the person who created this object. Enter as 0-9 alphanumeric characters.

*createdtime* The time at which this object was created. Enter as zero.

*modifiedby* The login name of the person who last modified this object. Enter as 0-9 alphanumeric characters.

*modifiedtime* The time at which this object was last modified. Enter as zero.

*name* The name of this object. Enter as 1-32 characters. The name can include letters, numbers, pound signs (#), dollar signs ($), ampersands (&), underscores (_), dashes (-), and spaces. Underscores, dashes, and spaces are equivalent. Upper- and lower-case characters are equivalent.

*info_flow* The INFO_FLOW.info_flowkey value that identifies information flow that contains this structure.

*ordnum* The number that determines the order in which this structure appears in the Structure List of the Information Flow form.

FLOW_ENTITY

This table lists the entities in each information flow structure. The table identifies an entity by its entity-to-process model map. The map associates an entity with the process model that references the entity. For example, if an entity is contained in an information flow:

- The ENTITY table defines the entity.
- The INFO_FLOW table defines the information flow.
- The FLOW_STRUCTURE table defines the information flow structure.
- The ENTITY_PM_MAP table associates the entity with the process model that contains the information store.
- The FLOW_ENTITY table associates the entity and the information flow using the entity's ENTITY_PM_MAP and the information flow's FLOW_STRUCTURE.

*flow_entitykey* A unique number that identifies this object.

*createdby* The login name of the person who created this object. Enter as 0-9 alphanumeric characters.

*createdtime* The time at which this object was created. Enter as zero.

*modifiedby* The login name of the person who last modified this object. Enter as 0-9 alphanumeric characters.

*modifiedtime* The time at which this object was last modified. Enter as zero.

*name* The name of this object. Enter as 1-32 characters. The name can include letters, numbers, pound signs (#), dollar signs ($), ampersands (&), underscores (_), dashes (-), and spaces. Underscores, dashes, and spaces are equivalent. Upper- and lower-case characters are equivalent.

*flow_structure* The FLOW_STRUCTURE.flow_structurekey value that identifies the information flow structure that contains this entity.

*entity_pm_map* The ENTITY_PM_MAP.entity_pm_mapkey value that identifies the entity.

*ordnum* The number that determines the order in which this entity appears in the Structure Contents field of the Information Flow form. If the *star* column contains zero, the entity does not appear in the Structure Contents field and this column is zero.

*store_entity* The STORE_ENTITY.store_entitykey value that verifies that this entity appears in the information store structure. If the destination of the information flow is not an information store, the entity does not have to appear in the information store structure and this column is zero.

*star* A number that indicates whether all attributes of the entity are included in the flow structure. Enter 1 if all attributes are included; 0 if only those attributes specified by the FLOW_ATTRIBUTE table are included.

FLOW_ATTRIBUTE

This table lists the attributes in each information flow structure. The table identifies an attribute by its attribute-to-process model map. The map associates an attribute with the process model that references the attribute. For example, if an attribute is contained in an information flow:

- The ATTRIBUTE table defines the attribute.
- The INFO_FLOW table defines the information flow.
- The FLOW_STRUCTURE table defines the information flow structure.
- The ATTRIB_PM_MAP table associates the attribute with the process model that contains the information store.
- The FLOW_ATTRIBUTE table associates the attribute and the information flow using the attribute's ATTRIB_PM_MAP and the information flow's FLOW_STRUCTURE.

*flow_attributekey* A unique number that identifies this object.

*createdby* The login name of the person who created this object. Enter as 0-9 alphanumeric characters.

*createdtime* The time at which this object was created. Enter as zero.

*modifiedby* The login name of the person who last modified this object. Enter as 0-9 alphanumeric characters.

*modifiedtime* The time at which this object was last modified. Enter as zero.

*name* The name of this object. Enter as 1-32 characters. The name can include letters, numbers, pound signs (#), dollar signs ($), ampersands (&), underscores (_), dashes (-), and spaces. Underscores, dashes, and spaces are equivalent. Upper- and lower-case characters are equivalent.

*flow_structure* The FLOW_STRUCTURE.flow_structurekey value that identifies the structure that contains this free attribute; zero if the attribute is owned by an entity. The following column identifies the owner entity of an owned attribute.

*flow_entity* The FLOW_ENTITY.flow_entitykey value that identifies the entity in the information flow structure that owns this attribute; zero is the attribute is a free attribute. The previous column identifies the informations structure that contains the free attribute.

*type* This column is not used by the system.

*ordnum* The number that determines the order in which this attribute appears in the Structure Contents field of the Information Flow form.

*store_attribute* The STORE_ATTRIBUTE.store_attributekey value that verifies that this attribute appears in the information store structure. If the destination of the information flow is not an information store, the attribute does not have to appear in the information store structure and this column is zero.

*attrib_pm_map* The ATTRIB_PM_MAP.attrib_pm_mapkey value that identifies the attribute.

Appendix B
PDL Pop-Up Windows

When you enter PDL logical access statements, a SEND statement, or a RECEIVE statement, the system may display one or more pop-up windows that prompt you to either clarify information or supply missing information. This appendix explains each of these pop-up windows.

At the bottom of each pop-up window, there is a Cancel pushbutton. If you select the Cancel pushbutton, the system returns you to the PDL windows where you can edit the statement in the Command window. When you press the Enter key to submit the statement again, the system displays all of the pop-up windows again, including the one you canceled if it is still appropriate.

Select an Entity Pop-Up Window

The Select an Entity pop-up window, shown in Figure B-1, appears when you enter a PDL statement that contains an ambiguous attribute name (the attribute is defined in more than one entity).

Figure B-1 Select an Entity Pop-Up Window

See illustration at chapter end.

▼ To specify the entity that contains the attribute you want to use, follow these steps:

1. Select the entity name from the list box.
2. Select the OK pushbutton.

In your PDL statement, the system qualifies the attribute name with the entity you selected (*entity.attribute*).

Define an Asterisk Pop-Up Window

The Define an Asterisk pop-up window, shown in Figure B-2, appears when you enter a RETRIEVE statement that contains an asterisk (*) for the *info-to-select* component.

Figure B-2 Define an Asterisk Pop-Up Window

See illustration at chapter end.

The two radio buttons in the pop-up window allow you to choose the meaning of the asterisk in the RETRIEVE statement you are currently submitting. The asterisk can mean either of the following:

- All Possible Attributes (the default) — all attributes as they exist now and as they may exist in the future. If, at a later time, you add attributes to the entities specified in the RETRIEVE statement, the new attributes will be included in the retrieve operation.
- Only Existing Attributes — the specific list of attributes currently defined. If you select this radio button, the system substitutes the list of attributes for the asterisk in the RETRIEVE statement.

▼ To select the meaning of the asterisk:

1 Select one of the radio buttons.
2 Select the OK pushbutton.

Specify an Information Flow Pop-Up Window

The Specify an Information Flow pop-up window, shown in Figure B-3, appears when you enter a logical access statement, a SEND statement, or a RECEIVE statement in which you have omitted the THROUGH clause and no information flow exists between the objects, or you have specified the name of a new information flow.

Figure B-3 Specify an Information Flow Pop-Up Window

See illustration at chapter end.

The radio buttons in the pop-up window allow you to either create a new information flow or use an existing information flow. Following the two radio buttons, the pop-up window shows the names of the two DFD objects connected by the flow. The list box shows the names of the existing information flows that connect the two DFD objects.

▼ To create a new information flow (the default), use either of the following methods:

- Select the OK pushbutton to accept the default name displayed in the entry field.
- Type a new name in the entry field and select the OK pushbutton.

▼ To use an existing information flow, follow these steps:

1. Select the Use an Existing Information Flow radio button.
2. Select the name of the existing information flow from the list box.
3. Select the OK pushbutton.

Specify an Information Store Pop-Up Window

The Specify an Information Store pop-up window, shown in Figure B-4, appears when you enter a logical access statement in which you have omitted the INFO_STORE clause and the default-named information store does not exist, or you have specified the name of a new information store.

Figure B-4 Specify an Information Store Pop-Up Window

| See illustration at chapter end. |
|---|

The radio buttons in the pop-up window allow you to either create a new information store or use an existing information store.

▼ To create a new information store (the default), use either of the following methods:

- Select the OK pushbutton to accept the default name displayed in the entry field.
- Type a new name in the entry field and select the OK pushbutton.

▼ To use an existing information store, follow these steps:

1. Select the Use an Existing Information Store radio button.
2. Select the name of the existing information store from the list box.
3. Select the OK pushbutton.

Specify a Process or Source/Destination Pop-Up Window

The Specify a Process or Source/Destination pop-up window, shown in Figure B-5, appears when you omit the TO clause in a SEND statement or the FROM clause in a RECEIVE statement and the default-named object does not exist, or when you specify the name of a new process or source/destination object.

Figure B-5 Specify a Process or Source/Destination Pop-Up Window

| See illustration at chapter end. |
|---|

The radio buttons in the pop-up window allow you to choose one of four options: create a new source/destination object (the default), create a new process, use an existing source/destination object, or use an existing process. If you select either of the radio buttons that allows you to use an existing object, the list box displays a list of the appropriate objects, either source/destination objects or processes.

▼ To create a new source/destination object (the default), use either of the following methods:

- Select the OK pushbutton to accept the default name displayed in the entry field.
- Type a new name in the entry field and select the OK pushbutton.

▼ To create a new process, follow these steps:

1 Select the Create a New Process radio button. In the entry field, the system displays a default name for the new process.

2 Specify the name for the new process by using either of the following steps:

- Select the OK pushbutton to accept the default name displayed in the entry field.
- Type a new name in the entry field and select the OK pushbutton.

▼ To use an existing source/destination object or an existing process, follow these steps:

1 Select either the Use an Existing Source/Destination or Use an Existing Process radio button.

2 Select the name of the existing source/destination object or process from the list box.

3 Select the OK pushbutton.

Confirm Missing WHERE Clause Pop-Up Window

The Confirm Missing WHERE Clause pop-up window, shown in Figure B-6, appears when you omit the WHERE clause in an UPDATE or DELETE statement. Without the WHERE clause, the statement updates or deletes all occurrences of the specified entity.

Figure B-6 Confirm Missing WHERE Clause Pop-Up Window

See illustration at chapter end.

You can either return to the Command window and add the WHERE clause to the UPDATE or DELETE statement, or ignore the warning and add the PDL statement without the WHERE clause.

▼ To return to the Command window to add the WHERE clause:

Select the Cancel pushbutton.

The system removes the pop-up window and displays a message telling you that the statement will not be applied to the diagram. You can now add the WHERE clause to the DELETE or UPDATE statement in the Command window.

▼ To ignore the warning and add the DELETE or UPDATE statement to the diagram:

Select the OK pushbutton.

The system displays the DELETE or UPDATE node in the Diagram window. If you want, you can then add the missing WHERE clause by selecting the WHERE qualifier pin and entering the appropriate text in the Command window.

LAM Pop-Up Window

The LAM pop-up window, shown in Figure B-7, appears when you omit the VOLUME clause in a RETRIEVE statement. This window prompts you to supply the number of entity occurrences you expect the statement to retrieve and the number to be retained.

Figure B-7 LAM Pop-Up Window

See illustration at chapter end.

You can either accept the default values shown in the pop-up window or enter different values.

▼ To accept the default values in the LAM pop-up window:

Select the OK pushbutton.

▼ To enter different values in the LAM pop-up window:

1. Press the Backspace key to delete the number in the first entry field.
2. Type the number of entity occurrences you expect the statement to retrieve.
3. Press the Tab key to move the text cursor to the second entry field.
4. Press the Backspace key to delete the number in the second entry field.
5. Type the number of entity occurrences you expect to be retained.
6. Select the OK pushbutton.

The values you specify for the VOLUME clause appear in the third section of the RETRIEVE node in the diagram.

Index

!

.AN, for Analyst model files 4-3
.VAR, for import/export files 4-5

A

ABORT statement 10-8
accelerators 3-13
    selecting menu choices with 3-13
Advisor 6-3
Aggregate functions 10-3
Allowed Value Table form
    description of 11-2
Allowed value tables
    design rules 6-10
Analyst Model form
    description of 11-1
Analyst models
    building 2-3
    creating 4-1
    See also Data models
    deleting 4-8
    description of 2-1
    displaying 4-3
    exporting 4-5
    filtering 4-9 - 4-15
    importing 4-5
    integrity of 2-6
    merging 4-8
    naming 4-2
    See also Process models
    renaming 4-8
    reports 4-23
    saving 4-4
    transfer to database 4-25
    using with Release 2.10 4-5
    viewing a subset of 4-9 - 4-15
Analyst modelss
    opening 4-3
Analyst window 3-4
    figure of 3-4
    See also windows
annotating a diagram 3-18
ATTRIBUTE DERIVATION node 9-8, 9-29
Attribute form
    description of 11-2
Attributes
    attribute name 5-13
    component 5-15
    creating 5-13 - 5-15
    deleting 4-16
    design rules 6-7
    editing 5-16
    entity-owned 5-14
    finding 4-8
    free 5-15
    kinds of 5-14
    shared 5-16
    sources of values for 5-13
Autocompletion of statements 9-12

B

BACHMAN database 4-24
    description of 4-23
    moving data to 4-25
BACHMAN Desktop 3-4
    figure of 3-4
    See also windows
BACHMAN system
    customizing 11-18
BACHMAN/Analyst
    exiting from 3-14
    starting 3-14
    stopping 3-14
    windows 3-4
Bleed
    using in large diagram prints 4-23

C cascading menu icon 3-14
cascading menus 3-14
cascading windows
    figure of 3-6
CASE statement 10-9
Categories in PDL Options window 9-9
changing the layout of a diagram
    E-R 3-19
    FD 3-19
    PDL 3-19
check boxes
    selecting 3-25
Check In 4-25
Child processes See Subprocesses
clicking 3-2
closing a window
using the keyboard 3-7
using the mouse 3-6
Collapsing PDL options 9-9
Command window 9-7, 9-11
automatically completing components 9-12
entering text in 9-11
modifying text in 9-13
submitting text in 9-13
COMMIT statement 10-10
Condition pins 9-6
Constraints
on statements in derived attributes 9-29
on statements in entity methods 9-24
context menus
displaying 3-12
figure of 3-11
using to add text blocks 3-19
Copying information flows
results of 7-42
undoing 7-42
Copying information stores
results of 7-26
undoing 7-26
Copying processes
results of 7-18
undoing 7-18
Copying source/destination objects
results of 7-33
undoing 7-33
Create Flow
choice on context menu 7-36
Create Information Store
choice on context menu 7-20
create mode 3-18
entering 3-19
exiting 3-19
See also palette
Create Primitive Process
choice on context menu 7-4
Create Source/Destination
choice on context menu 7-28
CREATE statement 10-11 - 10-13
Creating information flows
conditions for 7-34
procedures for 7-34 - 7-35
results of 7-36
undoing 7-36
Creating information stores
procedures for 7-19 - 7-20
results of 7-21
undoing 7-21
Creating processes
procedures for 7-3 - 7-4
results of 7-4
undoing 7-5
Creating source/destination objects
procedures for 7-27 - 7-28
results of 7-28
undoing 7-28
Creating subprocesses
example of 7-11 - 7-12
in the DFD 7-10 - 7-11
in the FD diagram 7-6
procedure for 7-12
results of 7-7, 7-11 - 7-12
undoing 7-7, 7-11, 7-13
cursor
See text cursor
Customizing the environment
See Profiles
Cut 4-16

D

Data Analyst, importing to Release 3.10 4-5
Data flow diagram
displaying 7-2
displaying subprocesses 7-13
renumbering processes in 7-16
using 7-1
data model
building 5-1
Data Model form
description of 11-4
Data Model profile
entity placement methods 5-4
Data Model Profile form
description of 11-19
Data models
creating 4-2
description of 2-3
design task 6-2
forms for 11-2 - 11-10
merging 6-11
naming 4-2
profile 11-19
reports 4-23
saving 4-4
validating 6-2
data types
specifying for attributes 5-19
Date functions 10-4
Default directory
See Profiles
DELETE statement 10-14 - 10-15
Deleting Analyst model 4-8
derived attributes 9-30
entity methods 9-26
objects in model 4-16
PDL objects 9-19
Deleting a source/destination
results of 7-33
undoing 7-33
Deleting information flows
results of 7-42
undoing 7-42
Deleting information stores
results of 7-26
undoing 7-26
Deleting processes
example of 7-18
results of 7-18
undoing 7-18
derivation procedure
definition 5-1
derived attribute
definition 5-1
renaming 9-30
Derived attributes 9-2, 9-27 - 9-30
creating 9-27
deleting 9-30
editing 9-29
PDL statements in 9-29
deselecting objects
groups of 3-17
one of a group 3-17
single 3-16
Design task
description of 6-2
rules 6-4
starting 6-3
DFD
See Data flow diagram
DFD Diagram window
figure of 3-15
palette 3-15
DFD palette
figure of 3-15
symbols on 3-15
Diagram context menus
displaying in a DFD 7-4
displaying in an FD diagram 7-4
diagram lines
rerouting 3-22
diagram objects
aligning in rows/columns 3-22
changing space between 3-21
changing the size of 3-20
deselecting 3-16
moving 3-20
moving end points or vertices 3-23
moving groups of 3-21
moving line segments 3-22
selecting 3-16
Diagram prints
preview using the grid 4-20
Diagram window 3-4
figure of 3-4
PDL 9-5, 9-8
diagram windows
DFD 3-15
E-R 3-14
FD 3-15
PDL 3-15
See also windows
working with 3-14 - 3-23
diagrams
annotating 3-18
building PDL 9-7 - 9-13
changing the layout of 3-19
changing the view of 3-17
changing the view, PDL 9-17
display features 7-2, 7-13
displaying in multiple windows 3-23
displaying in their entirety 3-17
displaying PDL 9-3 - 9-4
fitting 3-17
Interrelationship of 9-2
printing 4-18
See also Process models, diagrams
syntax for PDL statements 10-6 - 10-7
zooming in/out on 3-17
Dimension form
description of 11-4
Dimensions
creating 5-17
deleting 4-16
design rules 6-10
editing 5-21
finding 4-8
Directory list box 4-3
Displaying
PDL diagrams 9-3 - 9-4
Displaying subprocesses
for a DFD 7-13
indicators for 7-13
of a process 7-13
results of 7-14
DO statement 9-24, 10-16 - 10-17
Domain form
description of 11-5
Domains
creating 5-17
creating superdomains and subdomains 5-20
deleting 4-16 design rules 6-10
editing 5-21
finding 4-8
double-clicking 3-2
dragging 3-3

E

E-R Diagram window
figure of 3-14
palette 3-14
E-R palette
figure of 3-15
symbols on 3-15
Editing focus, PDL 9-8
ellipsis 3-14
Entities
adding information about 5-5
automatically placing 5-4
changing a relationship to an entity 5-8
changing to a relationship 5-9
copying 5-6
creating from Data Model form 5-4
creating with context menu 5-4
creating with palette 5-3
deleting 4-16, 5-5, 5-7
design rules 6-4
editing 5-6
establishing foreign key references to 5-7
finding 4-8
manually placing 5-4
merging 5-12
placing in an E-R diagram 5-4
removing foreign key references from 5-8
splitting 5-11
transformations for editing an entity 5-6
undoing creation 5-4
Entity form
defining entity methods on 9-22
description of 11-6
displaying 5-5
entity method
definition 5-1
Entity methods 9-2, 9-21 - 9-26
defining on the Entity form 9-23
deleting 9-26
displaying in a calling procedure 9-25
editing 9-26
PDL statements in 9-24
renaming 9-26
Entity set functions 10-3
entity type hierarchies 5-21
changing complex relationships to 5-10
changing to complex relationships 5-11
creating 5-31
generalizing attributes 5-31
generalizing keys 5-31
generalizing relationships 5-32
nested 5-32
relationships among subtype entities 5-32
Entity-Relationship diagram 5-1
displaying from Diagram pull-down menu 5-2
displaying from Window pull-down menu 5-2
displaying with E-R icon 5-2
entry fields
displaying forms from 3-26
entering values in 3-25
Error conditions, handling 10-4 - 10-5
Exception conditions, handling 10-4 - 10-5
EXIT statement 10-18
Expanding PDL options 9-9
Expert Advisor 6-3
Exploding a process
example of 7-10
procedure for 7-10
results of 7-11
undoing 7-11
Export 4-5
file format A-1
file formats, list of 4-6
in Query Manager 4-34
Expressions, PDL 10-1 - 10-3
Extension pins
PDL 9-6

F

FD diagram
See Functional decomposition diagram
FD Diagram window
figure of 3-15
File names
wildcards in 4-3
File pull-down
See choice name (e.g. Save)
Files list box 4-3
Filter form
description of 11-7
filter selection criteria
combining 4-12
defining 4-10
including/excluding 4-13
keywords 4-11
objects 4-11
objects created by user 4-11
objects updated by user 4-11
time span for objects created 4-12
time span for objects updated 4-12 filters
- adding objects to filtered model 4-15
- combining Exclusive with All 4-13
- combining Exclusive with Some 4-13
- combining selection criteria 4-12
- creating 4-10
- creating more than one 4-15
- defining selection criteria 4-10
- excluding objects 4-13
- Filter Form, figure of 4-10
- implicit and explicit object selection 4-14
- including objects 4-13
- naming 4-10
- performing tasks on filtered model 4-15
- selecting objects in 4-14
- selection criteria control options 4-12
- turning off 4-15
- turning on 4-15
- using to operate on a subset of a model 4-9 - 4-15
- using to view a subset of model 4-9 - 4-15
- View pull-down menu 4-10

Find 4-8
fitting a diagram 3-17
Flows
- See Information flows

Footers
- creating standard 4-20

FOREACH statement 10-19 - 10-21
form window
- See also windows form windows 3-4
- entering information into 3-24 - 3-27
- example of 3-4
- moving between fields in 3-24
- types of fields in 3-24
- working with 3-24 - 3-27

Functional decomposition diagram
- displaying 7-2
- displaying subprocesses 7-13
- renumbering processes in 7-16
- repositioning processes in 7-16
- using 7-1

Functions, PDL 10-2
- aggregate 10-3
- date 10-4
- entity set 10-3
- string 10-3
- time 10-4

G generalization 5-10

H

Headers
- creating standard 4-20

Hiding objects, PDL 9-20
hourglass pointer 3-3

I

IF statement 10-22 - 10-23
Import 4-5
- file format A-1
- file formats, list of 4-6

Index, for BACHMAN database 4-34
information flow
- rerouting 3-22

Information Flow form
- description of 11-11
- displaying 7-37
- effects of merging objects 7-41
- results of editing 7-38

Information Flow transformations
- reconnecting an information flow 7-39

Information flows
- conditions for creating 7-34
- copying 7-42
- creating using context menu 7-35
- creating using the palette 7-34
- defining contents of 7-34, 7-37, 7-41
- deleting 4-16, 7-42
- editing operations, list of 7-38
- finding 4-8
- merging 7-40
- reconnecting 7-39
- referenced in PDL 7-34, 7-37
- relationship to data model 7-37
- relationship to E-R diagram 7-34
- structure 7-37
- structures 7-34, 7-41

Information store form 7-19, 7-21
- description of 11-13
- displaying 7-22
- effects of merging stores 7-25
- results of editing 7-22

Information store transformations
- merging information stores 7-23

Information stores 7-19 - 7-22
- copying 7-26
- creating using context menu 7-20
- creating using the DFD palette 7-20
- defining contents of 7-22
- deleting 4-16, 7-26
- editing operations, list of 7-23
- finding 4-8 merging 7-23
placing in the DFD 7-20
referenced in PDL 7-19, 7-21
relationship to E-R diagram 7-19, 7-22
structure 7-19

K

Key form
description of 11-8
Keys
alternate 5-34
creating 5-34 - 5-36
deleting 4-16
derivation of foreign keys 5-36
design rules 6-9
editing 5-37
finding 4-8
foreign 5-36
key names 5-34
multiple attribute 5-34
multiple partnership set 5-35
partnership set and attribute 5-35
primary 5-34
single attribute 5-34
single partnership set 5-36
keywords
specifying in filters 4-11

L list boxes
displaying forms from 3-26
selecting items in 3-26
Literals in PDL 10-2
Logical access statements 9-3
LOOP statement 10-24 - 10-25

M

Macro characters
including in headers or footers 4-20
Making a new process boundary
example of 7-11
procedure for 7-12
results of 7-12 - 7-13
manual reroute 3-23
Margins
setting in printer profile 4-20
maximizing a window
using the keyboard 3-9
using the mouse 3-9
menu components 3-13
accelerators 3-13
cascading menu icon 3-14
ellipsis 3-14
mnemonics 3-13
numbers 3-13
menus 3-11 - 3-13
components of 3-13
context menus 3-11
pull-down menus 3-11
selecting choices on 3-12
types of 3-11
working with 3-11 - 3-13
Merging
Analyst models 4-8
data models 6-11
process models 8-2
Merging information flows
conditions for 7-40
effect on contents 7-41
example of 7-40
procedure for 7-40
results of 7-41
undoing 7-41
Merging information stores
effect on contents 7-25
example of 7-24
procedure for 7-24
results of 7-25
undoing 7-25
Merging processes
example of 7-14
procedure for 7-14
results of 7-15
undoing 7-15
Merging source/destination objects
example of 7-31
procedure for 7-31
results of 7-32
undoing 7-32
message area 3-4, 9-7
figure of 3-4
See also windows
METHOD node 9-8, 9-24
minimizing a window
using the keyboard 3-9
using the mouse 3-9
mnemonics 3-13
selecting menu choices with 3-13
mode
create 3-18
edit 3-18
mouse
figure of 3-2
pointer shapes 3-2
selecting objects with 3-2 mouse operations
clicking 3-2
double-clicking 3-2
dragging 3-3
pressing 3-2
releasing 3-2
mouse pointer 3-3
table of shapes 3-3
See also text cursor
moving a window
using the keyboard 3-7
using the mouse 3-7
moving diagram objects 3-20
moving line segments 3-22

N

Naming rules 4-2
Navigating
from the Entity form to a PDL diagram 9-23
from the Entity form to the Attribute form 9-28
New 4-1
New Diagram
choice on Diagram pull-down menu 7-2
Nodes 9-5
ATTRIBUTE DERIVATION 9-8, 9-29
METHOD 9-8, 9-24
moving 9-18
PROCESS 9-8
system-generated 9-8
non-information-bearing entities
replacing 5-9
NOTE statement 10-26
Notes form
description of 11-9, 11-14
numbers 3-13
selecting menu choices with 3-13

O objects
deleting PDL 9-19
diagram 3-16
hiding PDL 9-20
in a filtered model 4-11
manipulating PDL 9-17 - 9-19
process model, types of 7-1
selecting PDL 9-8
Open 4-3
Operating System/2 3-1
Operators, PDL 10-1
Options window 9-7, 9-9
OS/2
See Operating System/2
OS/2 Print Manager 4-19

P

Page layout
modifying 4-22
palette 3-4
DFD 3-15
E-R 3-15
using to create diagram objects 3-15
Parent processes
See Processes, hierarchy of
Parent/child pins
PDL 9-6
partnership
rerouting 3-22
Partnership Set form
description of 11-9
partnership sets
definition of complex partnership set 5-28
describing relationships 5-21
description of 5-25
documenting minimum relationship occurrences 5-25
mandatory 5-26
optional 5-26
volumes for complex relationships (table) 5-28
PDL
See Process Description Language
PDL diagram
See Process description language diagram
PDL diagram windows
example of 3-15
Pins
PDL 9-5
pop-up window 3-5
See also windows
pop-up windows
example of 3-5
in a PDL example 9-15
PDL B-1
working with 3-24 - 3-27
Presentation Manager 3-1
Previewing
diagram prints using grid 4-20
Primitive processes
definition of 7-5
displaying PDL for 7-19
Printer
changing 4-19
choosing 4-18
Printer Options
setting 4-18

Printer profile
setting 4-20
Printer Profile form
description of 11-20
Printing
diagrams 4-18
profile 11-20
reports 4-35
screens 4-18
procedures, PDL 9-2
process description language
interaction with a data model 5-1
introduction 9-1, 9-3, 9-5, 9-7, 9-9, 9-11, 9-13, 9-15, 9-17, 9-19, 9-21, 9-23, 9-25, 9-27, 9-29
procedures 9-2
reference 10-1
reports 9-20
screen layout 9-5 - 9-6
statements 9-3
Process description language diagram
using 7-1
Process form
description of 11-14
displaying 7-8
effects of merging processes 7-15
results of editing 7-8
Process hierarchy
building in FD diagram 7-6
changes caused by process deletion 7-18
definition of 7-5
example of 7-6
exploding a process in the DFD 7-9
making a new process boundary 7-11
repositioning processes 7-16
Process Model form
description of 11-15
Process Model Profile form
description of 11-20
Process models
creating 4-2
description of 2-6
diagrams, types and uses of 7-1
displaying diagrams 7-2
forms for 11-11
merging 8-2
naming 4-2
objects in 7-1
profile 11-20
reports 4-23
saving 4-4
PROCESS node 9-8
Process procedures 9-2
Process transformations
exploding a process 7-9
making a new process boundary 7-11
merging two processes 7-14
Processes
copying 7-17
creating subprocesses by exploding in the DFD 7-9
creating using context menus 7-4
creating using the DFD or FD palette 7-3
deleting 4-16, 7-18
editing operations, list of 7-9
exploding 7-9
finding 4-8
hierarchy of 7-5
leveled 7-7
making a new process boundary 7-11
merging 7-14
placing in the DFD 7-3
placing in the FD diagram 7-3
See also Primitive processes
renumbering of 7-16
repositioning in the FD diagram 7-16
See also Subprocesses
Profiles 11-18
pull-down menus
displaying 3-12
figure of 3-11
pushbuttons
selecting 3-27

Q

Qualifier pins 9-6
Query manager
creating an index 4-34
creating queries 4-26
description of 4-23
exiting 4-35
exporting queries and forms 4-34
formatting reports 4-33
moving data to 4-25
producing reports 4-33
saving queries 4-32
saving report forms 4-33
starting 4-26

R radio buttons
selecting 3-25
RECEIVE statement 10-27 - 10-29
Reconnecting information flows
procedure for 7-39
results of 7-39
undoing 7-40
Redo 4-17
Redo log 4-17

Redoing operations, PDL 9-18
Reference, PDL 10-1
Registration marks
using in large diagram prints 4-23
Relationships
AND 5-30
categories of 5-21
complex 5-21
creating 5-21 - 5-32
creating complex relationships 5-27
creating directed recursive relationships 5-24
creating many-to-many relationships 5-23
creating nondirected recursive relationships 5-24
creating one-to-many relationships 5-23
creating one-to-one relationships 5-22
creating simple relationships 5-21
definition of recursive relationships 5-23
deleting 4-16
described by partnership sets 5-21
describing simple relationships 5-22
design rules 6-8
directed recursive 5-24
drawing complex relationships 5-21
drawing simple relationships 5-21
editing 5-33
finding 4-8
hierarchical 5-21
IOR 5-28
kinds of recursive relationships 5-23
nondirected recursive 5-24
simple 5-21
types of complex relationships 5-27
XOR 5-29
Renaming
derived attributes 9-30
entity methods 9-26
Renumber
choice on diagram context menu 7-16
choice on the Diagram pull-down menu 7-16
Renumber children
choice on FD process context menu 7-17
Renumbering processes
procedure for 7-16
results of 7-17
undoing 7-17
Renumbering subprocesses
procedure in FD diagram 7-17
Reports
PDL 9-20
See Query manager
Repositioning a process
in the FD diagram 7-16
procedure for 7-16
results of 7-16
undoing 7-16
restoring a window
using the keyboard 3-10
using the mouse 3-9
RESUME statement 10-30
RETRIEVE statement 10-31 - 10-36
example of entering 9-14 - 9-16
RETURN statement 10-37
Root pins
PDL 9-6

S

Save 4-4
Save As 4-4
Saving
Query Manager forms 4-33
Query Manager queries 4-32
Saving a model
as ASCII file 4-5
as model 4-4
Screens
printing 4-18
scroll bars
slider box 3-5
scrolling a window 3-10
one line at a time 3-10
one page at a time 3-10
to a specific location 3-10
selecting a window
active vs. inactive 3-11
selecting menu choices
using the keyboard 3-13
using the mouse 3-12
selecting objects
groups of 3-16
single 3-16
SEND statement 10-38 - 10-40
Setting profiles 11-18
Show all processes exploded
choice on DFD context menu 7-13
SIGNAL statement 10-41
SKIP statement 10-42
Source/Destination form 7-29
description of 11-16
displaying 7-29
effects from merging objects 7-32
results of editing 7-30
Source/destination objects
copying 7-32
creating using context menu 7-28
creating using the DFD palette 7-27
deleting 4-16, 7-33
editing operations, list of 7-30
finding 4-8 placing in the DFD 7-27
system type 7-28, 7-31
Source/Destination transformations
merging source/destination objects 7-31
spin buttons
selecting values from 3-27
SQL
See Structured Query Language
Statements
submitting 9-13
Statements, PDL 10-6 - 10-7
entering 9-7 - 9-13
example of entering 9-14 - 9-16
in derived attributes 9-29
in entity methods 9-24
modifying 9-13
reference 10-6 - 10-7
types of 9-3
Stores
See Information stores
String functions 10-3
Structure
for information flow contents 7-34
Structured Query Language 4-31 - 4-32
Structures
for information flows 7-41
for information store contents 7-19
subdomains
creating 5-20
Subprocesses
creating and placing in the FD diagram 7-6
creating in the DFD 7-9, 7-11
definition of 7-5
hiding and showing, for a process 7-13
hiding and showing, for an entire DFD 7-13
indicator in the DFD 7-11, 7-13
indicator in the FD diagram 7-13
superdomains
creating 5-20
Synonym form
description of 11-10, 11-17
System Menu
displaying 3-5

T

Tasks pull-down
See choice name (e.g. Import)
text blocks
adding to diagram 3-18
See also annotating a diagram
creating with context menus 3-19
text cursor 3-3
See also mouse pointer
table of shapes 3-3
tiled windows
figure of 3-6
Time functions 10-4
Transform
choice from the Tasks pull-down menu 7-39 - 7-40
choice on Tasks pull-down menu 7-31
choice on the Tasks pull-down menu 7-9 - 7-10, 7-12, 7-14, 7-24
See also Transformations
transformations
changing a complex relationship to an entity type hierarchy 5-10
changing a relationship to an entity 5-8
changing an entity to a relationship 5-9
changing an entity type hierarchy to a complex relationship 5-11
definition of 7-9
establishing a foreign key reference 5-7
See also Information Flow transformations
See also Information Store transformations
merge entities 5-12
See also Process transformations
removing a foreign key reference 5-8
See also Source/Destination transformations
split entity 5-11

U

Undo 4-17
Undo log 4-17
Undoing operations, PDL 9-18
UPDATE statement 10-43 - 10-45
Updating the Options window 9-10
User Profile form
description of 11-21

V

View pull-down menu 4-10

W

Wildcards, for Files list box 4-3
window components
action bar 3-5
figure of 3-5
maximize icon 3-5
minimize icon 3-5
restore icon 3-5
scroll bar 3-5
slider box 3-5
System Menu icon 3-5 title bar 3-5
window border 3-5
window fields
check boxes 3-24
entry fields 3-24
figure of 3-24
list boxes 3-24
pushbuttons 3-24
radio buttons 3-24
spin buttons 3-24
window operations 3-5
changing window height 3-8
changing window height and width 3-8
changing window width 3-8
closing a window 3-6
maximizing a window 3-9
minimizing a window 3-8
moving a window 3-7
restoring a window 3-9
scrolling a window 3-10
selecting a window 3-11
sizing a window 3-7
windows 3-3 - 3-10
activating PDL 9-14
Analyst window 3-4
arranging on desktop 3-6
BACHMAN Desktop 3-4
BACHMAN/Analsyt 3-4
cascading 3-6
Diagram window 3-4
displaying minimized 3-6
Form window 3-4
message area 3-4
PDL 9-5 - 9-6
PDL Command 9-11
PDL Diagram 9-8
PDL Options 9-9
pop-up window 3-5
pop-up, PDL B-1
tiled 3-6
types of 3-4
working with 3-3 - 3-10

Z zooming 3-17

Appendix A, attached hereto, is a complete printout of the object code for the system described in detail above and is incorporated herein by reference.

Appendix B, also attached, are figures referred by the manual.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

APPENDIX A

Directory SATURN:[PCCOMMON.DUMP.DATA]

DBDEFIN.BND;1 MODEL.SQL;1

Total of 2 files.

Directory SATURN:[PCCOMMON.DUMP.DLL]

| | | | |
|---|---|---|---|
| ABOUT.TMP;1 | ADV.TMP;1 | ANALDESK.TMP;1 | ANALUT.TMP;1 |
| ANALYST.TMP;1 | ANFORM.TMP;1 | APBSORT.TMP;1 | APPBASE.TMP;1 |
| BRD.TMP;1 | BRDNOPL.TMP;1 | BRDPLOW.TMP;1 | BUSBASE.TMP;1 |
| CHECKIN.TMP;1 | DA-ABOUT.DLL;1 | DA-DSGN.DLL;1 | DA-FIND.DLL;1 |
| DA-IMPRT.DLL;1 | DA-NORM.DLL;1 | DA-XPORT.DLL;1 | DAATTRDF.TMP;1 |
| DAAVTDF.TMP;1 | DACOPY.TMP;1 | DAD.TMP;1 | DADIMDF.TMP;1 |
| DADOMDF.TMP;1 | DAENTDF.TMP;1 | DAFILTER.TMP;1 | DAFORM.TMP;1 |
| DAHELP.TMP;1 | DAIMDF.TMP;1 | DAKEYDF.TMP;1 | DAM.TMP;1 |
| DAMERGE.TMP;1 | DAMERROR.TMP;1 | DAMRIDFE.TMP;1 | DANLS.TMP;1 |
| DANOTEDF.TMP;1 | DAPICK.TMP;1 | DAPREDS.TMP;1 | DAPROF.TMP;1 |
| DAPROFDF.TMP;1 | DAPSETDF.TMP;1 | DASHORT.DLL;1 | DASHORT.TMP;1 |
| DASYNDF.TMP;1 | DAXFORM.TMP;1 | DBG.TMP;1 | DFM.TMP;1 |
| DGM.TMP;1 | DML.TMP;1 | DMLGLOB.TMP;1 | DMLLL.TMP;1 |
| DMLUT.TMP;1 | DUT.TMP;1 | ENGMAPS.TMP;1 | ERR.TMP;1 |
| EVFORM.TMP;1 | FILTTOOL.TMP;1 | FLFORM.TMP;1 | GRFORMS.TMP;1 |
| GRTAB.TMP;1 | GTI.TMP;1 | HCS.TMP;1 | HCSINIT.TMP;1 |
| IECOMMON.TMP;1 | IFMDML.TMP;1 | IMTAB.TMP;1 | ISFORM.TMP;1 |
| LOG.TMP;1 | LOGIN.TMP;1 | MEM.TMP;1 | METHGLOB.TMP;1 |
| METHOD.TMP;1 | MOD.TMP;1 | NEWMETA.TMP;1 | OBJFND.TMP;1 |
| PDLDGM.TMP;1 | PDLLOOKS.TMP;1 | PDLSYN.TMP;1 | PDMMAP.TMP;1 |
| PDMTAB.TMP;1 | PMFORM.TMP;1 | PPMMAP.TMP;1 | PPMPROF.TMP;1 |
| PPMTAB.TMP;1 | PPRMAP.TMP;1 | PPRPROF.TMP;1 | PPRTAB.TMP;1 |
| PRFORM.TMP;1 | PRO.TMP;1 | PURMAP.TMP;1 | PURPROF.TMP;1 |
| PURTAB.TMP;1 | RLOGVIEW.TMP;1 | SA-DGFD.DLL;1 | SA-DGPDL.DLL;1 |
| SA-DIFM.DLL;1 | SA-IMPRT.DLL;1 | SA-MERGE.DLL;1 | SA-PDLED.DLL;1 |
| SA-XFORM.DLL;1 | SADADESK.TMP;1 | SADGM.TMP;1 | SAFORMS.TMP;1 |
| SAFREE2.TMP;1 | SAFRMUTL.TMP;1 | SAM.TMP;1 | SAUT.TMP;1 |
| SDFORM.TMP;1 | SHP.TMP;1 | SIO.TMP;1 | SME.TMP;1 |
| TBE.TMP;1 | TREE.TMP;1 | UIW.TMP;1 | ULOGVIEW.TMP;1 |
| UTL.TMP;1 | UVMAPS.TMP;1 | | |

Total of 118 files.

Directory SATURN:[PCCOMMON.DUMP.MSG]

| | | | |
|---|---|---|---|
| DAFORM.MSG;1 | DAHELPM.MSG;1 | DAM.MSG;1 | DAMRGMSG.MSG;1 |
| DAXFORM.MSG;1 | DEL.MSG;1 | DESK.MSG;1 | FLFORM.MSG;1 |
| PRFORM.MSG;1 | SAFRMUTL.MSG;1 | | |

Total of 10 files.

Directory SATURN:[PCCOMMON.DUMP.PBIN]

| | | | |
|---|---|---|---|
| BACHCOPY.EXE;1 | BACHMAN.EXE;1 | DBCREAT.EXE;1 | DBDEFIN.EXE;1 |
| DBDROP.EXE;1 | DBIMP.EXE;1 | DMLBE.EXE;1 | ERRBE.EXE;1 |
| FINDBND.EXE;1 | PLOW_OFF.CMD;1 | | |

Total of 10 files.

```
Dump of file SATURN:[PCCOMMON.DUMP.MSG]DAFORM.MSG;1 on 18-APR-1990 10:53:52.42
File ID (965,33,0)   End of file block 1 / Allocated 4

Virtual block number 1 (00000001), 512 (0200) bytes

 25000000 00000000 00000000 00000000 01000000 03534540 00464753 4D484DFF .MKMSGF.MES....................% 000000
 206F7420 64656075 73736120 73692031 25206560 616E2065 68544900 86007300 .s.Ñ.IThe name %1 is assumed to  000020
 616E6572 206E6565 62207361 68206863 69687720 2C322520 6F742072 65666572 refer to %2, which has been rena 000040
 20312520 6560616E 20656854 490A0D2E 796C676E 696C6472 6F636361 20646560 med accordingly...IThe name %1  000060
 68203225 20202E32 25206F74 20726566 6572206F 74206465 6D757373 61207369 is assumed to refer to %2.  %2 h 000080
 64206F74 20796168 4F490A0D 2E646560 616E6572 206E6565 6220544F 4E207361 as NOT been renamed...IOkay to d 0000A0
 00000000 00000000 00000000 00000000 0A0D0A0D 3F322520 31252065 74656C65 elete %1 %2?.................... 0000C0
 00000000 00000000 00000000 00000000 00000000 00000000 00000000 00000000 ................................ 0000E0
 00000000 00000000 00000000 00000000 00000000 00000000 00000000 00000000 ................................ 000100
 00000000 00000000 00000000 00000000 00000000 00000000 00000000 00000000 ................................ 000120
 00000000 00000000 00000000 00000000 00000000 00000000 00000000 00000000 ................................ 000140
 00000000 00000000 00000000 00000000 00000000 00000000 00000000 00000000 ................................ 000160
 00000000 00000000 00000000 00000000 00000000 00000000 00000000 00000000 ................................ 000180
 00000000 00000000 00000000 00000000 00000000 00000000 00000000 00000000 ................................ 0001A0
 00000000 00000000 00000000 00000000 00000000 00000000 00000000 00000000 ................................ 0001C0
 00000000 00000000 00000000 00000000 00000000 00000000 00000000 00000000 ................................ 0001E0

Dump of file SATURN:[PCCOMMON.DUMP.MSG]DAM.MSG;1 on 18-APR-1990 10:53:55.42
File ID (978,18,0)   End of file block 11 / Allocated 12

Virtual block number 1 (00000001), 512 (0200) bytes

 75000000 00000000 00000000 00000000 01000000 28534540 00464753 4D484DFF .MKMSGF.MES+...................u 000000
 8F080807 8606E706 4805E805 6A040604 5203CC03 4802CF02 5701DE01 6500ED00 .Ü.e.ß.W.ü.H.ä.R.ø.j.Ò.H.Ó...... 000020
 9010F910 740FEC0F 6E0E830E 370D400C 970C0308 7E0AFA0A 7509F009 CF091608 ...ü.b.u.*.~.....a.7...n.š.t.*.. 000040
 79746974 6E652072 6F464915 89158A15 2514C114 5C13F713 93132E12 88121811 ..:|.....%.\.è.%...¿.IFor entity 000060
 756C6F76 206D7560 696E696D 20656874 20676E69 676E6168 63202C27 31252720  '%1', changing the minimum volu 000080
 20646573 75616320 73616820 27332527 206F7420 27322527 206D6F72 66206560 me from '%2' to '%3' has caused  0000A0
 6E616863 206F7420 27342527 20656075 6C6F7620 64657463 65707865 20656874 the expected volume '%4' to chan 0000C0
 202C2731 25272079 7469746E 6520726F 4620490A 0D2E2735 2527206F 74206567 ge to '%5'...I For entity '%1',  0000E0
 606F7266 20656075 6C6F7620 60756D69 6E696D20 65687420 676E6967 6E616863 changing the minimum volume from 000100
 78616D20 65687420 64657375 61632073 61682027 33252720 6F742027 32252720  '%2' to '%3' has caused the max 000120
 2527206F 74206567 6E616863 206F7420 27342527 20656075 6C6F7620 6D756D69 imum volume '%4' to change to '% 000140
 676E6967 6E616863 202C2731 25272079 7469746E 6520726F 4620490A 0D2E2735 5'...I For entity '%1', changing 000160
 74202732 2527206D 6F726620 656D756C 6F762064 65746365 70786520 65687420  the expected volume from '%2' t 000180
 6F762060 756D696E 696D2065 68742064 65737561 63207361 68202733 2527206F o '%3' has caused the minimum vo 0001A0
 20490A0D 2E273525 27206F74 2065676E 61686320 6F742027 34252720 656D756C lume '%4' to change to '%5'...I  0001C0
 78652065 68742067 6E69676E 61686320 2C273125 27207974 69746E65 20726F46 For entity '%1', changing the ex 0001E0

Dump of file SATURN:[PCCOMMON.DUMP.MSG]DAM.MSG;1 on 18-APR-1990 10:53:55.42
File ID (978,18,0)   End of file block 11 / Allocated 12

Virtual block number 2 (00000002), 512 (0200) bytes

 20273325 27206F74 20273225 27206D6F 72662065 6D756C6F 76206465 74636570 pected volume from '%2' to '%3'  000000
 25272065 6D756C6F 76206075 6D697861 6D206568 74206465 73756163 20736168 has caused the maximum volume '% 000020
 746E6520 726F4620 490A0D2E 27352527 206F7420 65676E61 6863206F 74202734 4' to change to '%5'...I For ent 000040
 76206075 6D697861 6D206568 7420676E 69676E61 6863202C 27312527 20797469 ity '%1', changing the maximum v 000060
 73756163 20736168 20273325 27206F74 20273225 27206D6F 72662065 6D756C6F olume from '%2' to '%3' has caus 000080
 6863206F 74202734 25272065 6D756C6F 76206D75 6D696E69 6D206568 74206465 ed the minimum volume '%4' to ch 0000A0
 27312527 20797469 746E6520 726F4620 490A0D2E 27352527 206F7420 65676E61 ange to '%5'...I For entity '%1' 0000C0
 72662065 6D756C6F 76206075 6D697861 6D206568 7420676E 69676E61 6863202C , changing the maximum volume fr 0000E0
 65206568 74206465 73756163 20736168 20273325 27206F74 20273225 27206D6F om '%2' to '%3' has caused the e 000100
 6F742065 676E6168 63206F74 20273425 2720656D 756C6F76 20646574 63657078 xpected volume '%4' to change to 000120
 6E206568 74202C27 31252720 79746974 6E652072 6F462049 0A0D2E27 35252720  '%5'...I For entity '%1', the n 000140
 61602027 73657079 74627573 20657461 6964656D 6D692066 6F206075 73207765 ew sum of immediate subtypes' ma 000160
 20646573 75616320 73616820 2C273225 27202C73 656D756C 6F76206D 756D6978 ximum volumes, '%2', has caused  000180
 676E6168 63206F74 20273325 2720656D 756C6F76 206D756D 69786160 20656874 the maximum volume '%3' to chang 0001A0
 74202C27 31252720 79746974 6E652072 6F462049 0A0D2E27 34252720 6F742065 e to '%4'...I For entity '%1', t 0001C0
 73657079 74627573 20657461 6964656D 6D692066 6F206075 73207765 6E206568 he new sum of immediate subtypes 0001E0
```

```
Dump of file SATURN:[PCCOMMON.DUMP.MSG]DAM.MSG;1 on 18-APR-1990 10:53:55.42
File ID (978,18,0)   End of file block 11 / Allocated 12

Virtual block number 3 (00000003), 512 (0200) bytes

 61632073 6168202C 27322527 202C7365 6D756C6F 76206465 74636570 78652027 ' expected volumes, '%2', has ca 000000
 6F742027 33252720 656D756C 6F762064 65746365 70786520 65687420 64657375 used the expected volume '%3' to 000020
 27207974 69746E65 20726F46 20490A0D 2E273425 27206F74 2065676E 61686320  change to '%4'...! For entity ' 000040
 75732065 74616964 656D6069 20666F20 6D757320 77656E20 65687420 2C273125 %1', the new sum of immediate su 000060
 68202C27 32252720 2C73656D 756C6F76 206D756D 696E6960 20277365 70797462 btypes' minimum volumes, '%2', h 000080
 33252720 656D756C 6F76206D 756D696E 696D2065 68742064 65737561 63207361 as caused the minimum volume '%3 0000A0
 69746E65 20726F46 20490A0D 2E273425 27206F74 2065676E 61686320 6F742027 ' to change to '%4'...! For enti 0000C0
 676E6168 63207361 77202733 25272079 6568206E 65687720 2C273125 27207974 ty '%1', when key '%3' was chang 0000E0
 20796568 202C7965 68207972 61606972 70206E6F 6E206120 6562206F 74206465 ed to be a non-primary key, key  000100
 68207972 61606972 70206568 74206564 6160206E 65656220 73617720 27322527 '%2' was been made the primary k 000120
 6D6F6320 74736577 65662065 68742073 61682074 69206573 75616365 62207965 ey because it has the fewest com 000140
 65687720 2C273125 27207974 69746E65 20726F46 20490A0D 2E73746E 656E6F70 ponents...! For entity '%1', whe 000160
 68202C64 65766F6D 65722073 61772079 65682079 72616069 72702065 6874206E n the primary key was removed, k 000180
 79656820 79726160 69727020 65687420 65646160 20736177 20273225 27207965 ey '%2' was made the primary key 0001A0
 6F706D6F 63207473 65776566 20656874 20736168 20746920 65737561 63656220  because it has the fewest compo 0001C0
 27207965 68202C27 31252720 79746974 6E652072 6F462049 0A0D2E73 746E656E nents...! For entity '%1', key ' 0001E0

Dump of file SATURN:[PCCOMMON.DUMP.MSG]DAM.MSG;1 on 18-APR-1990 10:53:55.42
File ID (978,18,0)   End of file block 11 / Allocated 12

Virtual block number 4 (00000004), 512 (0200) bytes

 65682079 72616069 72702065 68742065 64616020 6E656562 20736168 20273125 %1' has been made the primary ke 000000
 6C6E6F20 73277974 69746E65 20656874 20736920 74692065 73756163 65622079 y because it is the entity's onl 000020
 206E6568 77202C27 31252720 79746974 6E652072 6F462049 0A0D2E79 65682079 y key...! For entity '%1', when  000040
 20796568 206F7420 64656464 61207361 77202733 25272065 74756269 72747461 attribute '%3' was added to key  000060
 20646567 6E616863 20736177 20657475 62697274 74612065 6874202C 27322527 '%2', the attribute was changed  000080
 69757165 72207361 20272C64 65776F6C 6C612074 6F6E2073 6C6C754E 27206F74 to 'Nulls not allowed,' as requi 0000A0
 206E6920 64656E69 61746E6F 63207365 74756269 72747461 20726F66 20646572 red for attributes contained in  0000C0
 70206E65 6877202C 27312527 20797469 746E6520 726F4620 490A0D2E 73796568 keys...! For entity '%1', when p 0000E0
 2065606D 6C6F7620 6D756069 6E696020 73746920 64616820 27322527 20746573 set '%2' had its minimum volume  000100
 766F6D65 72207361 77207465 73702065 6874202C 30206F74 20646567 6E616863 changed to 0, the pset was remov 000120
 6E616D20 796C6E6F 2065636E 6973202C 27332527 20796568 20606F72 66206465 ed from key '%3', since only man 000140
 6820666F 20737265 626D6560 20656220 6E616320 73746573 70207972 6F746164 datory psets can be members of k 000160
 27207974 69746E65 206E6920 27322527 20746573 7020726F 46490A00 2E737965 eys...!For pset '%2' in entity ' 000180
 656D756C 6F76206D 756D696E 696D2065 68742067 6E69676E 61686320 2C273125 %1', changing the minimum volume 0001A0
 68742064 65737561 63207361 68202734 2527206F 74202733 25272060 6F726620  from '%3' to '%4' has caused th 0001C0
 65676E61 6863206F 74202735 25272065 6D756C6F 76206465 74636570 78652065 e expected volume '%5' to change 0001E0

Dump of file SATURN:[PCCOMMON.DUMP.MSG]DAM.MSG;1 on 18-APR-1990 10:53:55.42
File ID (978,18,0)   End of file block 11 / Allocated 12

Virtual block number 5 (00000005), 512 (0200) bytes

 746E6520 6E692027 32252720 74657370 20726F46 490A0D2E 27362527 206F7420  to '%6'...!For pset '%2' in ent 000000
 76206D75 6D696E69 6D206568 7420676E 69676E61 6863202C 27312527 20797469 ity '%1', changing the minimum v 000020
 73756163 20736168 20273425 27206F74 20273325 27206D6F 72662065 6D756C6F olume from '%3' to '%4' has caus 000040
 6863206F 74202735 25272065 6D756C6F 76206D75 6D697861 6D206568 74206465 ed the maximum volume '%5' to ch 000060
 2C273125 27207974 69746E65 20726F46 490A0D2E 27362527 206F7420 65676E61 ange to '%6'...!For entity '%1', 000080
 61632079 72616069 7270206F 74202732 25272079 65682067 6E69676E 61686320  changing key '%2' to primary ca 0000A0
 69727020 6E6F6E20 6564616D 20656220 6F742027 33252720 79656820 64657375 used key '%3' to be made non-pri 0000C0
 6820796C 6E6F206E 61632079 7469746E 65206E61 2065636E 6973202C 79726160 mary, since an entity can only h 0000E0
 7469746E 6520726F 46490A0D 2E796568 20797261 6D697270 20656E6F 20657661 ave one primary key...!For entit 000100
 2D6E6F6E 206F7420 27322527 20796568 20676E69 74746573 202C2731 25272079 y '%1', setting key '%2' to non- 000120
 6E697320 2C6E6564 64697272 65766F20 6E656562 20736168 20797261 6D697270 primary has been overridden, sin 000140
 20797469 746E6520 6E692079 65682079 6C6E6F20 65687420 73692074 69206563 ce it is the only key in entity  000160
 20656E6F 20796C6E 6F207361 68207974 69746E65 206E6120 66692820 27312527 '%1' (if an entity has only one  000180
 20656874 20646572 65646973 6E6F6320 73692079 65682074 61687420 2C796568 key, that key is considered the  0001A0
 27322527 28202731 25272072 6F727245 490A0D2E 29796568 20797261 6D697270 primary key)...!Error '%1' ('%2' 0001C0
 69202732 25272074 65737020 726F4649 0A0D2E64 65726574 6E756F63 6E652029 ) encountered...!For pset '%2' i 0001E0
```

```
Dump of file SATURN:[PCCOMMON.DUMP.MSG]DAM.MSG;1 on 18-APR-1990 10:53:55.42
File ID (978,18,0)   End of file block 11 / Allocated 12

Virtual block number 6 (00000006), 512 (0200) bytes

65707865 20656874 20676E69 676E6168 63202C27 31252720 79746974 6E65206E n entity 'X1', changing the expe 000000
61682027 34252720 6F742027 33252720 6D6F7266 20656D75 6C6F7620 64657463 cted volume from 'X3' to 'X4' ha 000020
27352527 20656D75 6C6F7620 6D756D69 6E696D20 65687420 64657375 61632073 s caused the minimum volu • 'X5' 000040
27207465 73702072 6F46490A 0D2E2736 2527206F 74206567 6E616863 206F7420  to change to 'X6'...IFor pset ' 000060
65687420 676E6967 6E616863 202C2731 25272079 7469746E 65206E69 20273225 X2' in entity 'X1', changing the 000080
2527206F 74202733 2527206D 6F726620 656D756C 6F762064 65746365 70786520  expected volume from 'X3' to 'X 0000A0
656D756C 6F76206D 756D6978 616D2065 68742064 65737561 63207361 68202734 4' has caused the maximum volume 0000C0
7020726F 46490A0D 2E273625 27206F74 2065676E 61686320 6F742027 35252720  'X5' to change to 'X6'...IFor p 0000E0
6E69676E 61686320 2C273125 27207974 69746E65 206E6920 27322527 20746573 set 'X2' in entity 'X1', changin 000100
74202733 2527206D 6F726620 656D756C 6F76206D 756D6978 616D2065 68742067 g the maximum volume from 'X3' t 000120
6F76206D 756D696E 696D2065 68742064 65737561 63207361 68202734 2527206F o 'X4' has caused the minimum vo 000140
46490A0D 2E273625 27206F74 2065676E 61686320 6F742027 35252720 656D756C lume 'X5' to change to 'X6'...IF 000160
61686320 2C273125 27207974 69746E65 206E6920 27322527 20746573 7020726F or pset 'X2' in entity 'X1', cha 000180
2527206D 6F726620 656D756C 6F76206D 756D6978 616D2065 68742067 6E69676E nging the maximum volume from 'X 0001A0
74636570 78652065 68742064 65737561 63207361 68202734 2527206F 74202733 3' to 'X4' has caused the expect 0001C0
27362527 206F7420 65676E61 6863206F 74202735 25272065 6D756C6F 76206465 ed volume 'X5' to change to 'X6' 0001E0

Dump of file SATURN:[PCCOMMON.DUMP.MSG]DAM.MSG;1 on 18-APR-1990 10:53:55.42
File ID (978,18,0)   End of file block 11 / Allocated 12

Virtual block number 7 (00000007), 512 (0200) bytes

68202731 25272065 74756269 72747461 2079656B 206E6769 65726F46 490A0D2E ...IForeign key attribute 'X1' h 000000
20273225 27207465 73702072 6F662064 65746172 656E6567 206E6565 62207361 as been generated for pset 'X2'  000020
206E6F69 7463656A 6F727020 61207361 202C2733 25272079 7469746E 65206E69 in entity 'X3', as a projection  000040
79656B20 79726160 69727020 6E692027 34252720 65747562 69727474 6120666F of attribute 'X4' in primary key 000060
206E6769 65726F46 490A0D2E 27362527 20797469 746E6520 666F2027 35252720  'X5' of entity 'X6'...IForeign  000080
656E6567 206E6565 62207361 68202731 25272065 74756269 72747461 2079656B key attribute 'X1' has been gene 0000A0
25272079 7469746E 65206E69 20273225 27207465 73702072 6F662064 65746172 rated for pset 'X2' in entity 'X 0000C0
61207965 6B206E67 6965726F 66206D6F 72662067 6E696461 63736163 202C2733 3', cascading from foreign key a 0000E0
7270206E 69202735 25272074 65737020 666F2027 34252720 65747562 69727474 ttribute 'X4' of pset 'X5' in pr 000100
0A0D2E27 37252720 79746974 6E652066 6F202736 25272079 656B2079 72616D69 imary key 'X6' of entity 'X7'... 000120
20666F20 656D756C 6F76206D 756D6978 616D2065 68742067 6E69676E 61684349 IChanging the maximum volume of  000140
27207974 69746E65 206E6565 77746562 20706968 7372656E 74726170 20656874 the partnership between entity ' 000160
7469746E 65206465 74616C65 7220646E 61202732 25272074 65737020 2C273125 X1', pset 'X2' and related entit 000180
61657267 206F7420 31206D6F 72662027 34252720 74657370 202C2733 25272079 y 'X3', pset 'X4' from 1 to grea 0001A0
6420656B 74207372 65676769 72742029 27352527 28203120 6E616874 20726574 ter than 1 ('X5') triggers the d 0001C0
65747562 69727474 61207965 6B206E67 6965726F 6620666F 206E6F69 74656C65 eletion of foreign key attribute 0001E0

Dump of file SATURN:[PCCOMMON.DUMP.MSG]DAM.MSG;1 on 18-APR-1990 10:53:55.42
File ID (978,18,0)   End of file block 11 / Allocated 12

Virtual block number 8 (00000008), 512 (0200) bytes

746E652B 20746573 70207369 68742068 74697720 64657461 69636F73 73612073 s associated with this pset (ent 000000
206E6769 65726F46 490A0D2E 29273225 27207465 7370202C 27312527 20797469 ity 'X1', pset 'X2')...IForeign  000020
27322527 20746573 7020726F 66202731 25272065 74756269 72747461 2079656B key attribute 'X1' for pset 'X2' 000040
64657465 6C656420 6E656562 20736168 20273325 27207974 69746E65 206E6920  in entity 'X3' has been deleted 000060
20656D75 6C6F7620 6D756D69 78616D20 65687420 676E6967 6E616843 490A0D2E ...IChanging the maximum volume  000080
7469746E 65206E65 65777465 62207069 68737265 6E747261 70206568 7420666F of the partnership between entit 0000A0
6E652064 6574616C 65722064 6E612027 32252720 74657370 202C2731 25272079 y 'X1', pset 'X2' and related en 0000C0
65746165 7267206D 6F726620 27342527 20746573 70202C27 33252720 79746974 tity 'X3', pset 'X4' from greate 0000E0
68742073 72656767 69727420 31206F74 20292735 25272820 31206E61 68742072 r than 1 ('X5') to 1 triggers th 000100
62697274 74612079 656B206E 67696572 6F662066 6F206E6F 69746165 72632065 e creation of foreign key attrib 000120
2C273125 27207974 69746E65 28207465 73702073 69687420 726F6620 73657475 utes for this pset (entity 'X1', 000140
20273125 27207965 6B20676E 69747465 53490A0D 2E292732 25272074 65737020  pset 'X2')...ISetting key 'X1'  000160
20797469 746E6520 666F2079 656B2079 72616D69 72702065 68742065 62206F74 to be the primary key of entity  000180
6F662066 6F206E6F 69746165 72632065 68742073 72656767 69727420 27322527 'X2' triggers the creation of fo 0001A0
64657461 6C657220 726F6620 73657475 62697274 74612079 656B206E 67696572 reign key attributes for related 0001C0
6F742027 31252720 79656B20 676E6974 74655349 0A0D2E73 65697469 746E6520  entities...ISetting key 'X1' to 0001E0
```

```
Dump of file SATURN:[PCCOMMON.DUMP.MSG]DAM.MSG;1 on 18-APR-1990 10:53:55.42
File ID (978,18,0)   End of file block 11 / Allocated 12

Virtual block number 9 (00000009), 512 (0200) bytes

 666F2079 65682079 7261606 9 72702065 68742065 62207265 676E6F6C 206F6E20  no longer be the primary key of 000000
 6974656C 65642065 68742073 72656767 69727420 27322527 20797469 746E6520  entity '%2' triggers the deleti 000020
 726F6620 73657475 62697274 74612079 6568206E 67696572 6F662066 6F206E6F on of foreign key attributes for 000040
 72747461 20676E69 64644149 0A0D2E73 65697469 746E6520 64657461 6C657220  related entities...!Adding attr 000060
 25272079 65682079 72616069 72702065 6874206F 74202731 25272065 74756269 ibute '%1' to the primary key '% 000080
 63206568 74207372 65676769 72742027 33252720 79746974 6E652066 6F202732 2' of entity '%3' triggers the c 0000A0
 65747562 69727474 61207965 6B206E67 6965726F 6620666F 206E6F69 74616572 reation of foreign key attribute 0000C0
 69766F6D 6552490A 0D2E7365 69746974 6E652064 6574616C 65722072 6F662073 s for related entities...!Removi 0000E0
 61606972 70206568 7420606F 72662027 31252720 65747562 69727474 6120676E ng attribute '%1' from the prima 000100
 67676972 74202733 25272079 7469746E 6520666F 20273225 27207965 6B207972 ry key '%2' of entity '%3' trigg 000120
 6E69646E 6F707365 72726F63 20666F20 6E6F6974 656C6564 20656874 20737265 ers the deletion of correspondin 000140
 6C657220 726F6620 73657475 62697274 74612079 6568206E 67696572 6F662067 g foreign key attributes for rel 000160
 7372656E 74726170 20676E69 64644149 0A0D2E73 65697469 746E6520 64657461 ated entities...!Adding partners 000180
 20796568 20797261 60697270 20656874 206F7420 27312527 20746573 2D706968 hip-set '%1' to the primary key  0001A0
 65687420 73726567 67697274 20273325 27207974 69746E65 20666F20 27322527 '%2' of entity '%3' triggers the 0001C0
 75626972 74746120 79656B20 6E676965 726F6620 666F206E 6F697461 65726320  creation of foreign key attribu 0001E0

Dump of file SATURN:[PCCOMMON.DUMP.MSG]DAM.MSG;1 on 18-APR-1990 10:53:55.42
File ID (978,18,0)   End of file block 11 / Allocated 12

Virtual block number 10 (0000000A), 512 (0200) bytes

 6F6D6552 490A0D2E 73656974 69746E65 20646574 616C6572 20726F66 20736574 tes for related entities...!Remo 000000
 74206D6F 72662027 31252720 74657320 70696873 72656E74 72617020 676E6976 ving partnership-set '%1' from t 000020
 25272079 7469746E 6520666F 20273225 27207965 6B207972 61606972 70206568 he primary key '%2' of entity '% 000040
 72726F63 20666F20 6E6F6974 656C6564 20656874 20737265 67676972 74202733 3' triggers the deletion of corr 000060
 73657475 62697274 74612079 6568206E 67696572 6F662067 6E69646E 6F707365 esponding foreign key attributes 000080
 676E6974 74655349 0A0D2E73 65697469 746E6520 64657461 6C657220 726F6620  for related entities...!Setting 0000A0
 20706968 7372656E 74726170 20524F49 20666F20 656D756C 6F762027 31252720  '%1' volume of IOR partnership- 0000C0
 20646573 75616320 20273325 27207974 69746E65 206E6920 27322527 20746573 set '%2' in entity '%3'  caused  0000E0
 35252720 6D6F7266 20646567 6E616863 20656220 6F742027 34252720 73277469 it's '%4' to be changed from '%5 000100
 6C206D75 6D696E69 6D20676E 69747465 53490A0D 2020272E 36252720 6F742027 ' to '%6.'  ..!Setting minimum l 000120
 73277469 20646573 75616320 27312527 206E6961 6D6F6420 666F2068 74676E65 ength of domain '%1' caused it's 000140
 66206465 676E6168 63206562 206F7420 6874676E 656C2064 65746365 70786520  expected length to be changed f 000160
 696E696D 20676E69 74746553 490A0D2E 27332527 206F7420 27322527 20606F72 rom '%2' to '%3'...!Setting mini 000180
 64657375 61632027 31252720 6E69616D 6F642066 6F206874 676E656C 20607560 mum length of domain '%1' caused 0001A0
 676E6168 63206562 206F7420 6874676E 656C2060 75606978 61602073 27746920  it's maximum length to be chang 0001C0
 20676E69 74746553 490A0D2E 27332527 206F7420 27322527 20606F72 66206465 ed from '%2' to '%3'...!Setting  0001E0

Dump of file SATURN:[PCCOMMON.DUMP.MSG]DAM.MSG;1 on 18-APR-1990 10:53:55.42
File ID (978,18,0)   End of file block 11 / Allocated 12

Virtual block number 11 (0000000B), 512 (0200) bytes

 63202731 2527206E 6961606F 6420666F 20687467 6E656C20 64657463 65707865 expected length of domain '%1' c 000000
 20656220 6F742068 74676E65 6C206D75 6D696E69 6D207327 74692064 65737561 aused it's minimum length to be  000020
 74655349 0A0D2E27 33252720 6F742027 32252720 6D6F7266 20646567 6E616863 changed from '%2' to '%3'...!Set 000040
 27206E69 616D6F64 20666F20 6874676E 656C2064 65746365 70786520 676E6974 ting expected length of domain ' 000060
 74206874 676E656C 20607560 69786160 20732774 69206465 73756163 20273125 %1' caused it's maximum length t 000080
 0D2E2733 2527206F 74202732 2527206D 6F726620 6465676E 61686320 6562206F o be changed from '%2' to '%3'.. 0000A0
 61606F64 20666F20 6874676E 656C206D 75606978 61602067 6E697474 6553490A .!Setting maximum length of doma 0000C0
 676E656C 20607560 696E696D 20732774 69206465 73756163 20273125 27206E69 in '%1' caused it's minimum leng 0000E0
 2527206F 74202732 2527206D 6F726620 6465676E 61686320 6562206F 74206874 th to be changed from '%2' to '% 000100
 20666F20 6874676E 656C206D 75606978 61602067 6E697474 6553490A 0D2E2733 3'...!Setting maximum length of  000120
 64657463 65707865 20732774 69206465 73756163 20273125 27206E69 61606F64 domain '%1' caused it's expected 000140
 20273225 2720606F 72662064 65676E61 68632065 62206F74 20687467 6E656C20  length to be changed from '%2'  000160
 25272065 74756269 72747461 20676E69 766F6D65 52490A0D 2E273325 27206F74 to '%3'...!Removing attribute '% 000180
 69766F6D 6552490A 0D2E2732 2527206E 6F69736E 656D6964 206D6F72 66202731 1' from dimension '%2'...!Removi 0001A0
 2527206E 6961606F 6420606F 72662027 31252720 65747562 69727474 6120676E ng attribute '%1' from domain '% 0001C0
 00000000 00000000 00000000 00000000 00000000 00000000 00006F0A 0D2E2732 2'...o.......................... 0001E0
```

```
Dump of file SATURN:[PCCOMMON.DUMP.MSG]DAMRGMSG.MSG;1 on 18-APR-1990 10:53:57.93
File ID (981,15,0)   End of file block 2 / Allocated 4

Virtual block number 1 (00000001), 512 (0200) bytes

25000000 00000000 00000000 00000000 01000100 03534540 00464753 4D4840FF .MKMSGF.MES....................% 000000
69746E65 20732731 25206C65 646F6020 65637275 6F732065 68544902 74015800 .X.t.IThe source model %1's enti 000020
20657079 74726570 7573206F 74206465 7463656E 6E6F6320 73692032 25207974 ty %2 is connected to supertype  000040
2C352520 79746974 6E652073 27342520 2E312520 6E692033 25207974 69746E65 entity %3 in %1. %4's entity %5, 000060
65677265 60207369 68742066 6F207974 69746E65 20746567 72617420 65687420  the target entity of this merge 000080
69746E65 20657079 74726570 7573206F 74206465 7463656E 6E6F6320 7369202C , is connected to supertype enti 0000A0
61206E61 2065736F 6F686320 65736165 6C502020 2E342520 6E692036 25207974 ty %6 in %4.  Please choose an a 0000C0
74204B4F 20737365 72702064 6E61206E 6F697463 61206574 61697270 6F727070 ppropriate action and press OK t 0000E0
20322520 73273125 20666F20 65677265 60206568 74206574 656C7060 6F63206F o complete the merge of %1's %2  000100
63206F74 204C4543 4E414320 73736572 5020202E 36252073 27352520 68746977 with %5's %6.  Press CANCEL to c 000120
756F7320 65685449 0A002E65 67726560 206C6564 6F602065 6874206C 65636E61 ancel the model merge...IThe sou 000140
20746F6E 20736920 32252079 7469746E 65207327 3125206C 65646F60 20656372 rce model %1's entity %2 is not  000160
20797469 746E6520 65707974 72657075 73206120 6F742064 65746365 6E6E6F63 connected to a supertype entity  000180
79746974 6E652073 27332520 6C65646F 60207465 67726154 20202E31 25206E69 in %1.  Target model %3's entity 0001A0
6E652065 70797472 65707573 206F7420 64657463 656E6E6F 63207369 20342520  %4 is connected to supertype en 0001C0
6F727070 61206E61 2065736F 6F686320 65736165 6C502020 2E352520 79746974 tity %5.  Please choose an appro 0001E0

Dump of file SATURN:[PCCOMMON.DUMP.MSG]DAMRGMSG.MSG;1 on 18-APR-1990 10:53:57.93
File ID (981,15,0)   End of file block 2 / Allocated 4

Virtual block number 2 (00000002), 512 (0200) bytes

6F63206F 74204B4F 20737365 72702064 6E61206E 6F697463 61206574 61697270 priate action and press OK to co 000000
68746977 20322520 73273125 20666F20 65677265 60206568 74206574 656C706D mplete the merge of %1's %2 with 000020
65636E61 63206F74 204C4543 4E414320 73736572 5020202E 35252073 27342520  %4's %5.  Press CANCEL to cance 000040
20656372 756F7320 65685449 0A002E65 67726560 206C6564 6F602065 6874206C l the model merge...IThe source  000060
65746365 6E6E6F63 20736920 32252079 7469746E 65207327 3125206C 65646F60 model %1's entity %2 is connecte 000080
202E3125 206E6920 33252079 7469746E 65206570 79747265 70757320 6F742064 d to supertype entity %3 in %1.  0000A0
64657463 656E6E6F 6320746F 6E207369 20352520 79746974 6E652073 27342520  %4's entity %5 is not connected 0000C0
2065736F 6F686320 65736165 6C502020 2E657079 74726570 75732061 206F7420  to a supertype.  Please choose  0000E0
20737365 72702064 6E61206E 6F697463 61206574 61697270 6F727070 61206E61 an appropriate action and press  000100
73273125 20666F20 65677265 60206568 74206574 656C706D 6F63206F 74204B4F OK to complete the merge of %1's 000120
204C4543 4E414320 73736572 5020202E 35252073 27342520 68746977 20322520  %2 with %4's %5.  Press CANCEL  000140
00000000 0A002E65 67726560 206C6564 6F602065 6874206C 65636E61 63206F74 to cancel the model merge....... 000160
00000000 00000000 00000000 00000000 00000000 00000000 00000000 00000000 ................................ 000180
00000000 00000000 00000000 00000000 00000000 00000000 00000000 00000000 ................................ 0001A0
00000000 00000000 00000000 00000000 00000000 00000000 00000000 00000000 ................................ 0001C0
00000000 00000000 00000000 00000000 00000000 00000000 00000000 00000000 ................................ 0001E0

Dump of file SATURN:[PCCOMMON.DUMP.DLL]DAMRIDFE.TMP;1 on 18-APR-1990 10:42:20.25
File ID (582,20,0)   End of file block 2 / Allocated 4

Virtual block number 1 (00000001), 512 (0200) bytes

00000000 00000040 00000000 00000008 0000FFFF 00000004 00000002 001C5A4D MZ................I.......@....... 000000
00000080 00000000 00000000 00000000 00000000 00000000 00000000 00000000 ................................ 000020
6F6E6E61 63206061 72676F72 70207369 685421CD 4C01B821 CD09B400 0EBA1F0E ..o..Ç.èI|.LèIThis program . nno 000040
00000000 00000024 0A0D0D2E 65646F60 20534F44 206E6920 6E757220 65622074 t be run in DOS mode....$....  .  000060
00010006 00000000 00020000 00000000 00038009 5ACA72A6 000000CA 0505454E NE..ò...Iròz...................... 000080
00000000 00000000 00010002 00040000 00000157 00C300C1 00780070 00400014 ..@.p.x.è.Ú.W..................... 0000A0
00040E21 00000000 00100F21 00020022 000F0F00 000F0020 007E0F00 007D0017 ..}...-. .......".."...!.. ....!... 0000C0
66646972 6D616408 00030005 00020005 00A11EF1 00A10020 00751EF1 00750023 #.u.þ.u.+.Â.þ.Â..........4amridf 0000E0
46444952 4D414412 0001474E 49525453 44414F4C 4644504C 45484144 12000065 e...DAMELPDFLOADSTRING...DAMRIDF 000100
0003464C 4553444F 4D484546 44495240 41441000 02474E49 52545344 414F4C45 ELOADSTRING...DAMRIDFEHMODSELF.. 000120
20405020 322F534F 10000000 0003001C 03004003 01034E49 57405005 00000100 .....PMWIN...M..........OS/2 PM  000140
0000068E D88EFFFF B81E5657 000000C8 00000000 00000000 45464449 52404144 DAMRIDFE.........à...WV.|...Ä.... 000160
0000068E 006A006A D88E0008 B81E5657 000000C8 C8C95F5E 1F0000E9 0000A126 &A..Ö...^_èÚà...WV.|...Äj.j..... 000180
0000C800 08CAC95F 5E1F0000 FFFF9A06 76FF0876 FF0A76FF 0C76FF00 0036FF26 &.6...v..v..v..v.......^_èò..à.. 0001A0
FF0876FF 0A76FF0C 76FF0000 36FF2600 00068E00 6A006AD8 8E0024B8 1E565700 .WV.|$..Äj.j.....&.6...v..v..v.. 0001C0
00009000 01007301 03000000 03005500 02000208 CAC95F5E 1F000000 429A0676 v..B....^_èò.....U.......s...... 0001E0
```

```
Dump of file SATURN:[PCCOMMON.DUMP.DLL]DAMRIDFE.TMP;1 on 18-APR-1990 10:42:20.25
File ID (582,20,0)   End of file block 2 / Allocated 4

Virtual block number 2 (00000002), 512 (0200) bytes

00000000 00000000 00000400 02000200 01CB0001 B81F0000 3E89D88E FFFFB81E .|...Ä.>...|..Ù................ 000000
69617274 736E6F63 20656D61 4E160352 00000000 00000004 00000002 0001FFFF ................R..Name constrai 000020
48230070 6C654820 3A070060 726F4620 6C696174 65440C00 726F7272 6520746E nt error..Detail form..: Help.#H 000040
72656820 73656F67 206D726F 46206C69 61746544 20726F66 20677360 20706C65 elp msg for Detail Form goes her 000060
01000100 01000100 01000100 01000100 6F540300 20676E69 676E6168 430A0065 e..Changing ..To................ 000080
746F6E20 65727574 6165461C 00010352 00000000 00000000 00000000 01000100 ................R....Feature not 0000A0
43203A10 00726F72 7245204C 4D440A00 74657920 6465746E 6560656C 70606920  implemented yet..DML Error..: C 0000C0
63617261 68632038 20312061 20726574 6E452800 6E6F6974 61636966 6972616C larification.*Enter a 1-8 charac 0000E0
74726F70 78450700 74726F70 78652072 6F662065 60616E20 656C6966 20726574 ter file name for export..Export 000100
01007265 6E696665 6420726F 6620726F 72726520 746E6961 7274736E 6F431D00 ..Constraint error for definer.. 000120
00000000 00000000 00000000 0000FF00 01000100 01000100 01000100 01000100 ................................ 000140
00000000 00000000 00000000 00000000 00000000 00000000 00000000 00000000 ................................ 000160
00000000 00000000 00000000 00000000 00000000 00000000 00000000 00000000 ................................ 000180
00000000 00000000 00000000 00000000 00000000 00000000 00000000 00000000 ................................ 0001A0
00000000 00000000 00000000 00000000 00000000 00000000 00000000 00000000 ................................ 0001C0
00000000 00000000 00000000 00000000 00000000 00000000 00000000 00000000 ................................ 0001E0
```

```
Dump of file SATURN:[PCCOMMON.DUMP.DLL]DAPICK.TMP;1 on 18-APR-1990 10:42:30.89
File ID (589,27,0)   End of file block 9 / Allocated 12

Virtual block number 1 (00000001), 512 (0200) bytes

00000000 00000040 00000000 00000088 0000FFFF 00000004 00000007 01EC5A4D MZ§.............|.......a....... 000000
00000080 00000000 00000000 00000000 00000000 00000000 00000000 00000000 ................................ 000020
6F6E6E61 63206D61 72676F72 70207369 685421CD 4C01B821 CD09B400 0EBA1F0E ..¤..Ç.È|.LÈ!This program canno 000040
00000000 00000024 0A0D0D2E 65646F60 20534F44 206E6920 6E757220 65622074 t be run in DOS mode....$....... 000060
00040008 00000000 00030000 00000000 00058009 6439FF2E 00120140 0505454E NE..M.....9d.................... 000080
00000000 00000000 00010002 00040000 000001DF 00ED00E5 00880080 0040001E ..a.....|.U.Õ................... 0000A0
00480F00 00480009 000F0F00 000F00D7 06D20F00 06020060 036E0F00 03600020  .m...n.'.@...@.@.......).N...N. 0000C0
01381E81 0138 00F4 01381E81 013800E0 00020E21 00000000 00100F21 0002000F Ô...!.......!...Å.;.Ÿ.;.¶.;.Ÿ.;. 0000E0
01544345 4A424F45 4E4F4B43 49500D00 00484349 50414406 00340004 00330004 ..3...4..DAPICK...PICKONEOBJECT. 000100
4E414D45 534F4F48 43414410 00025453 494C404F 5246594E 41404B43 49501000 ..PICKMANYFROMLIST...DACHOOSEMAN 000120
43454A42 4F594E41 404B4349 500F0003 434F5250 474C4454 53494C4D 4F524659 YFROMLISTDLGPROC...PICKMANYOBJEC 000140
6D640353 4C4C4143 534F4408 4E495740 50050000 4E001000 07000100 00045354 TS.........N...PMWIN.DOSCALLS.dm 000160
49465952 4555514C 4D440D45 4C444E41 484C4544 4F4D5952 4555514C 4D44136C l.DMLQUERYMODELHANDLE.DMLQ*FRYFI 000180
004D454D 03545349 4C454552 464C4D44 084E4C52 59524555 514C4D44 08444C45 ELD.DMLQUERYRLN.DMLFREELIS) YEM. 0001A0
1A000001 06030330 0305FD03 0203021E 03010148 434F4C42 434F4C4C 4140454D MEMALLOCBLOCK........*..0..@.... 0001C0
00000000 00007974 696C6963 61462065 736F6F68 43204144 204D5020 322F534F OS/2 PM DA Choose Facility...... 0001E0
```

```
Dump of file SATURN:[PCCOMMON.DUMP.DLL]DAPICK.TMP;1 on 18-APR-1990 10:42:30.89
File ID (589,27,0)   End of file block 9 / Allocated 12

Virtual block number 2 (00000002), 512 (0200) bytes

5EC4FA56 89F84689 08568B06 468B01E1 E90E468B 088EFFFF B81E5657 000078C8 àx..WV.|...Ä.F.ÕÅ..F..V..F%.V*ó^ 000000
FFFE5689 FC468912 578B2610 478B26F8 5EC4B256 89B04689 02578B26 078B26F8 %&..&.W..F¯.Vyá^%&.G.&.W..F=.V±. 000020
4EE90375 02470B26 078B26FC 5EC40000 FFFF9AF8 76FFFA76 FF006A10 76FF1276 v..v.j..v*.v%.....ó^*&..&.G.u.ÕN 000040
00003D00 00FFFF9A 50168846 8D026A37 FF260277 FF26FC5E C48076FF B276FF00 ..vý.v¯ó^*&.w.&.7j..F..P.....=.. 000060
468DFF6A 006A0161 68008268 1076FF12 76FF0189 E900008A 0004B800 09E90375 u.Õ..|..¤..Õ...v...v.h..he.j.j..F 000080
76FF0057 E90C468B 0071E90A 468B015C E9FFA3E9 04FC4683 00000003 9A501688 ..P.Ä....F*.ÕÈ.Õ\..F.Õq..F.ÕW..v 0000A0
1076FF12 76FFF646 89000000 F99A006A 006A006A 006A0165 68008268 1076FF12 ..v.h..he.j.j.j.j..*....F-.v..v. 0000C0
1276FF00 0001529A 50168446 8D505242 CA830000 00022BF6 468B0168 680A76FF .v.hh..F-+@....ðBRP.FÇ.P.R....v. 0000E0
FFEFE9FF A1E90375 00013000 08E9000E E90000FF FF9A5016 B4468D6E 6A1076FF .v.jn.FÇ.P.....Õ..Õ..=..u.ÕÅ.Õÿ. 000100
1276FF00 80E90A46 8800D7E9 FFEFE9FF 87E90375 00823000 08E9000E E90011E9 Õ..Õ..Õ..=..u.Õ..Õÿ.Õ=..F.Õ...v. 000120
6A1076FF 1276FFF6 46890000 FFFF9A00 6A006A00 6A006A01 65680082 681076FF .v.h..he.j.j.j.j.......F-.v..v.j 000140
02508B26 00882610 5FC426F8 5EC402E6 C1F6768B FA5689F8 46890000 FFFF9A00 .......F%.V*.v-èl.ó^%&ó_.&..&.P. 000160
76FF0032 E9000001 A79A016A 1076FF12 76FF0257 89260789 26145FC4 26F85EC4 á^%&ó_.&..&.W..v..v.j..T...Õ2..v 000180
00463D00 13E90016 E90019E9 0063E900 008A0000 B80000FF FF9A156A 1076FF12 ..v.j.......j..¤..Õc.Õ..Õ..Õ..=F. 0001A0
FF0C76FF 0E76FF10 76FF1276 FF0038E9 FFE7E9FF D1E90375 00503DFF 78E90375 u.Õx.=P.u.Õl.ÕÕ.Õ;..v..v..v..v.. 0001C0
03750030 3DFF3CE9 03750020 3D001BE9 0027E900 00FFFF9A 0676FF08 76FF0A76 v..v..v......Õ'.Õ..= .u.Õ<.=0.u. 0001E0
```

Dump of file SATURN:[PCCOMMON.DUMP.DLL]DAPICK.TMP;1 on 18-APR-1990 10:42:30.89
File ID (589,27,0)   End of file block 9 / Allocated 12

Virtual block number 3 (00000003), 512 (0200) bytes

```
30C8000E CAC95F5E 1F0000E9 00008A00 0088FFC5 E9FE07E9 03750038 30FEAFE9 ÕE±=;.u.Õ.±Õé.|..¤..Õ...^_èò..À0 000000
FFFF9A50 160C468D 1076FF12 76FF0000 07C7260A 5EC4D88E 0008881E 56570000 ..WV.|...Äá^.&ú....v..v..Fé.P... 000020
FFDC76FF 0E76FF10 76FF1276 FF0114E9 000A8800 06E90375 00003D02 46890000 ...F@=..u.Õ..|..Õ...v..v..vR.vÉ. 000040
E05EC400 EAE9000A 880006E9 03750000 30D24689 0000FFFF 9A5016E0 46800E76 v..FÅ.P......F@=..u.Õ..|..Õõ.á^Á 000060
12568810 468800CD E9000088 001407C7 260A5EC4 000EE903 74024708 26078826 &..&.G.t.Õ..á^.&ú...|..Õë..F..V. 000080
006AFA56 89F84689 08568806 4688F656 89F44689 E2568BE0 4688E656 89E44689 .Fõ.V|.FÅ.Vã.F¶.V-.F..V..F%.V°j. 0000A0
00FFFF9A 5016E446 8D336A00 0036FF26 0000068E FFFF68FF FF68016A 006A016A j.j.j.h..h......&.6..j3.Fõ.P.... 0000C0
56890846 890000FF FF9A006A 006A0015 E9037406 46080446 88065689 D4468900 ..Få.Vø.Få.Føt.Õ..j.j.......FÄ.V 0000E0
0000FFFF 9AD476FF D676FFD0 46890000 FFFF9AD4 76FFD676 FF0060E9 D84688DA Õ.FÄÕ'..vø.vå......FÄ.vø.vå..... 000100
0A5EC400 2AE9000B B80010E9 00468800 00FFFF9A E076FFE2 76FF1076 FF1276FF .v..v..vã.vÅ......FÄÕ..|..Õ°.á^. 000120
75FFFF30 FFE1E903 75001530 0013E900 16E90000 B8001CE9 00008800 1507C726 &ú...|..Õ..|..Õ..Õ..=..u.ÕÅ.=..u 000140
03000000 0102C700 02007A00 0102D001 0300110E CAC95F5E 1FFFE4E9 FFD3E903 .ÕR.Õõ..^_èò.....|...z...ù...... 000160
03008600 01010801 03007F00 0100A401 03007E00 01019701 03007C00 01030E01 .....|.........É............... 000180
03001E00 01004E01 03000000 0102CA00 05000000 05022600 02000700 01031C01 .........&.......ò.......N...... 0001A0
03002800 03007902 03008300 0101E901 03001400 03023E02 03001F00 01016201 .b.......>.......Õ...°...y...(.. 0001C0
00000000 00000000 0000F300 0102F701 03004200 03032002 03003600 03026802 .h...6...-...B...%...µ.. ....... 0001E0
```

Dump of file SATURN:[PCCOMMON.DUMP.DLL]DAPICK.TMP;1 on 18-APR-1990 10:42:30.89
File ID (589,27,0)   End of file block 9 / Allocated 12

Virtual block number 4 (00000004), 512 (0200) bytes

```
5EC4FA56 89F84689 08568806 46880199 E90E4688 D88EFFFF B81E5657 000038C8 à8..WV.|...Ä.F.Õ...F..V..F%.V°á^ 000000
FFFE5689 FC468912 57882610 478826F8 5EC4F456 89F24689 02578826 078826F8 %&..&.W..F·.V¶á^%&.G.&.W..F•.V±. 000020
4EE90375 02470826 078826FC 5EC40000 FFFF9AF8 76FFFA76 FF006A10 76FF1276 v..v.j..v°.v%.....á^=&..&.G.u.ÕN 000040
00003000 00FFFF9A 5016C846 8D026A37 FF260277 FF26FC5E C4F276FF F476FF00 ..v¶.v·á^=&.w.&.7j..Fà.P.....=.. 000060
468DFF6A 006A0161 68008268 1076FF12 76FF0141 E900008A 00048800 09E90375 u.Õ..|..¤..ÕA..v..v.h..ha.j.j..F 000080
76FF1276 FF008AE9 0A468801 11E90114 E9FFA3E9 04FC4683 00000000 9A5016C8 à.P.Å....F=.ÕÈ.Õ..Õ...F.Õ¤..v..v 0000A0
9A006A10 76FF1276 FFF64689 00000139 9A006A00 6AFF6A00 6A016568 00826810 .h..he.j.j.j.j..9....F-.v..v.j.. 0000C0
5EC402E6 C1F67688 004EE903 75FFF67E 830000F0 46C7FA56 89F84689 0000FFFF .....F%.V°ÚFÞ...--.u.ÕN..v-èl.á^ 0000E0
26008926 1FC42618 5FC426F8 5EC402E6 C1F07688 02508826 00882610 5FC426F8 %&6_.&..&.P..vÞèl.á^%&6_.&6.&..& 000100
F6468900 00FFFF9A 006A006A F676FF00 6A016568 00826810 76FF1276 FF025089 .P..v..v.h..he.j..v-j.j.......F- 000120
FF9A016A 1076FF12 76FF0032 E9000001 5F9A016A 1076FF12 76FFFFA9 E9F046FF .FÞÕ`..v..v.j......Õ2..v..v.j... 000140
00503DFF 3EE90375 00463D00 13E90016 E90019E9 0063E900 008A0000 880000FF ...|..¤..Õc.Õ..Õ..Õ..=F.u.Õ>.=P. 000160
0676FF08 76FF0A76 FF0C76FF 0E76FF10 76FF1276 FF0038E9 FFE7E9FF D1E90375 u.Õl.Õõ.Õ;..v..v..v..v..v..v..v. 000180
03750038 30FEF7E9 03750030 30FF02E9 03750020 30001BE9 0027E900 00FFFF9A .....Õ'.Õ..= .u.Õ..=0.u.Õ%±=;.u. 0001A0
0008881E 56570000 32C8000E CAC95F5E 1F0000E9 00008A00 0088FFC5 E9FE4FE9 Õ0±Õé.|..¤..Õ...^_èò..À2..WV.|.. 0001C0
00008A00 01880009 E9037500 00300000 FFFF9A50 16CE468D 1276FF14 76FFD88E .Ä.v..v..Fö.P.....=..u.Õ..|..¤.. 0001E0
```

Dump of file SATURN:[PCCOMMON.DUMP.DLL]DAPICK.TMP;1 on 18-APR-1990 10:42:30.89
File ID (589,27,0)   End of file block 9 / Allocated 12

Virtual block number 5 (00000005), 512 (0200) bytes

```
75000030 0000FFFF 9A5016E0 46801076 FFCE76FF D076FF12 76FF1476 FF0126E9 Õ&..v..v..vÅ.vö.v..FÅ.P.....=..u 000000
8A0003B8 0009E903 74024708 26078826 E05EC400 FCE90000 8A000288 0009E903 .Õ..|..¤..Õ•.á^Å&..&.G.t.Õ..|..¤ 000020
05880009 E9037500 00300000 FFFF9A50 16D4468D 286A006A 0676FF00 E4E90000 ..Õõ..v.j.j(.Få.P.....=..u.Õ..|. 000040
89145688 12468808 C483FFFF 00009A04 76FFD676 FF006A28 6A00C2E9 00008A00 .¤..Õõ.j(j..vø.vå......å..F..V.. 000060
57892607 89260656 88044688 085EC4F6 5689F446 89E2568B E04688E6 5689E446 Fõ.V|.FÅ.Vã.F¶.V-á^..Få.Vø&..&.W 000080
0036FF26 0002068E FFFF68FF FF68016A 006A016A 006AFE56 8CFC4689 D4468D02 ..Få.F•.V±j.j.j.j.h..h......&.6. 0000A0
006A0018 E90374DA 46080846 880A5689 D8468900 00FFFF9A 5016E446 8D346A00 .j4.Fõ.P......FÄ.VÕ.FÄ.FÕt.Õ..j. 0000C0
00FFFF9A D876FFDA 76FF0033 E90E5688 0C4688DE 5689DC46 890000FF FF9A006A j.......FÉ.VR.FÉ.VRÕ3..vÕ.vÄ.... 0000E0
0000FFFF 9AE076FF E276FF12 76FF1476 FF0000FF FF9AD876 FFDA76FF D2468900 ..F@.vÕ.vÄ......v..v..vã.vÅ..... 000100
E90E4688 D88E01DE B81E5657 00003ECB 0010CAC9 5F5E1F00 00E90000 8A000088 |..¤..Õ...^_èò..à>..WV.|R..Ä.F.Õ 000120
5EC4F456 89F24689 02578826 078826F8 5EC4FA56 89F84689 08568806 46880290 ...F..V..F%.V°á^%&..&.W..F·.V¶á^ 000140
004E9AF8 76FFFA76 FF006A10 76FF1276 FFFE5689 FC468912 57882610 478826F8 %&.G.&.W..F•.V±.v..v.j..v°.v%.N. 000160
FF260277 FF26FC5E C4F276FF F476FF00 53E90375 02470826 078826FC 5EC40000 ..á^•&..&.G.u.ÕS..v¶.v·á^=&.w.&. 000180
00008A00 04880009 E9037500 00300000 00799A50 16C2468D 0677FF26 FB5EC437 7á^%&.w..Fõ.P.y...=..u.Õ..|..¤.. 0001A0
FC468300 00041D9A 5016C246 8DFF6A00 6A016168 00826810 76FF1276 FF0233E9 Õ3..v..v.h..ha.j.j..Fõ.P......F• 0001C0
F8468900 0005679A 006A1076 FF1276FF 01ACE90A 46880203 E90206E9 FF9EE904 .Õ..Õ..Õ...F.Õ¯..v..v.j..g....F% 0001E0
```

```
Dump of file SATURN:[PCCOMMON.DUMP.DLL]DAPICK.TMP;1 on 18-APR-1990 10:42:30.89
File ID (589,27,0)   End of file block 9 / Allocated 12

Virtual block number 6 (00000006), 512 (0200) bytes

0004469A 006A006A FF6A006A 01656800 82681076 FF1276FF 0000F046 C7FA5689 .V*úFb...v..v.h..he.j.j.j.j..F.. 000000
76FF006A 01656800 82681076 FF1276FF F046FF00 23E90375 FFF67E83 F6468900 ..F-.--.u.Õ#..Fb.v..v.h..he.j..v 000020
085FC426 F85EC400 22E90374 00F07E83 FFD4E9F6 46890000 04E69A00 6A006AF6 -j.j..l....F-Õå..-b.t.Õ".á^Y&á . 000040
FF26F85E C4017BE9 00008A00 04B80000 05579A01 6A1076FF 1276FF00 0107C726 &ú....v..v.j..W...|..¤..Õ(.á^Y&. 000060
00058800 09E90375 00003000 0002529A 5016EA46 8D5002E0 C1F04688 006A0477 w.j..FbèÅ.P.Fõ.P.R...=..u.Õ..|.. 000080
02E0C1F0 46880257 89260789 26EC5688 EA46880C 5FC426F8 5EC40150 E900008A ¤..ÕP.á^Y&á_..Fõ.V$&..`.W .FbèÅ. 0000A0
6A006A01 65680082 681076FF 1276FF08 C4830274 00009AEA 76FFEC76 FF006A50 Pj..v$.võ...t..á..v..v.. . e.j.j 0000C0
E6C1F676 880047E9 0375FFF6 7E830000 EE46C7F6 46890000 05359A00 6A006AFF .j.j..5....F-úFY...--.u.ÕG.  --èl 0000E0
FF025089 26008926 EA76C402 E3C1EE5E 88025088 26008826 105FC426 F85EC402 .á^Y&á_.&..&.P..^Yèò.ávõ&..&.P.. 000100
E9EE46FF F6468900 0000A49A 006A006A F676FF00 6A016568 00826810 76FF1276 v..v.h..he.j..v-j.j..Ê....F-.FYÕ 000120
76FF0051 E9000005 869A016A 1076FF12 76FF0000 07C72608 5FC426F8 5EC4FF80 ¯.á^Y&á_.&ú....v..v.j......Õo..v 000140
1276FF00 0107C726 085FC426 F85EC4FA 5689F846 89000000 E09A006A 1076FF12 ..v.j..Ã....F%.V*á^Y&á_.&ú....v. 000160
75004630 0013E900 16E90019 E90063E9 00008A00 00880000 014F9A01 6A1076FF .v.j..O...|..¤..Õc.Õ..Õ..Õ..=F.u 000180
76FF0C76 FF0E76FF 1076FF12 76FF0038 E9FFE7E9 FF82E903 75005030 FE4CE903 .ÕL±=P.u.Õÿ.ÕÕ.Õ;..v..v..v..v..v 0001A0
E9037500 303DFE10 E9037500 20300018 E90027E9 000001A1 9A0676FF 0876FF0A ..v..v..À...Õ'.Õ..= .u.Õ.±=0.u.Õ 0001C0
0026C800 0ECAC95F 5E1F0000 E900008A 000088FF C5E9F058 E9037500 3830FE05 .±=;.u.Õx»Õé.|..¤..Õ...^_èò..á&. 0001E0

Dump of file SATURN:[PCCOMMON.DUMP.DLL]DAPICK.TMP;1 on 18-APR-1990 10:42:30.89
File ID (589,27,0)   End of file block 9 / Allocated 12

Virtual block number 7 (00000007), 512 (0200) bytes

0006E903 74024708 26078826 125EC400 0107C726 0A5EC4D8 8E033888 1E565700 .WV.|8..Ãá^.&ú...á^.&..&.G.t.Õ.. 000000
4688F656 89F44689 14568812 4688E656 89E44689 18568816 468800A4 E9000088 |..ÕE..F..V..Fõ.V|.F..V..F¶.V-.F 000020
89F04689 08568806 4688E846 890E4688 EA468910 4688EE56 89EC4689 0C56880A ..V..F$.VY.F..Fõ.F..Fõ.F..V..Fb. 000040
5016E446 8D346A00 0036FF26 0002068E FFFF6802 8368016A 006A016A 006AF256 V.j.j.j.j.h°.h......&.6..j4.Fõ.P 000060
89000002 E39A006A 006A0015 E90374DE 46080C46 880E5689 DC468900 0002C99A .è....FÉ.VR.FÉ.FRt.Õ..j.j..D.... 000080
9ADC76FF DE76FFDA 46890000 02FD9ADC 76FFDE76 FF001FE9 E04688E2 5689E046 FÅ.Vß.FÅÕ...VR.VÉ.»....FÕ.VR.VÉ. 0000A0
06820103 007A0001 06810103 00139000 14CAC95F 5E1F0000 E9000088 00000308 ....|..Õ...^_èò..........z...ÿ. 0000C0
06C00103 00000002 06680002 007F0001 03D90103 007E0001 046E0103 007C0001 ..|...n...-...l.........k.......á. 0000E0
03F90103 001E0001 037E0103 00000005 06050002 00000004 04CC0002 00070001 ......Ø.....................-.......'. 000100
02860005 00280003 03AE0203 00830001 05C80103 00140003 01EE0203 001F0001 ......Ÿ.......à...°...0...(...R. 000120
04910203 03300002 066E0005 00420003 031C0203 00360003 02180203 00000002 ..........6.......8...n...0..... 000140
01C80001 881F0000 3E89D88E FFFF881E 00000000 00F30001 06980103 00520004 ..R.......µ.......|...Ã.>...|..ù. 000160
DAF70788 067EC457 38E30C4E 88EC8855 00000000 00000000 00000600 02000200 ................U.$.N.DØVé-..¤%Õ 000180
8C10E301 87AAF3C9 13A8F3E9 01E08A0A 4688012B D1870103 D323081B 012B0C74 t.+1.ÛW¥.1.1+1.F..Å1Õµ .èµ .1D.. 0001A0
00020033 01050001 C8500856 88064688 5FAAF3C9 13A8F3E9 01C38EFF FFC381C3 Û.Û...ûlÕµ .èµ _.F..V.]ù....3... 0001C0
00000000 00000006 00020002 0001FFFF 00000000 00000000 00000000 00000088 ................................ 0001E0

Dump of file SATURN:[PCCOMMON.DUMP.DLL]DAPICK.TMP;1 on 18-APR-1990 10:42:30.89
File ID (589,27,0)   End of file block 9 / Allocated 12

Virtual block number 8 (00000008), 512 (0200) bytes

000F9400 009000FE 00100001 00000007 00000000 FFFF0001 000E0352 00000138 ;...R......................±....... 000000
00970021 80010001 01130005 00050000 00000000 010FFFFF 003300AA 01140005 ....`.3......................!... 000020
00840097 00478002 00080119 00040006 00000000 0000FFFF FFFF0064 0008001E ....d.....................G...Ç. 000040
00080028 006F001A 80010001 011E0008 00050000 00000000 FFFFFFFF 006E0008 ..n.......................o.(... 000060
00820049 0086002E 00478000 00000127 00000007 00000000 0000FFFF FFFF0078 x..............'.....G...R.|... 000080
FFFF0046 000C0026 00100034 80020400 01280006 00030000 00000000 FFFFFFFF ..............(.....4...&...F... 0000A0
FFFFFFFF 0050000C 00260010 007E8002 0000012F 00060003 00000000 0000FFFF .........../.....-...&...P..... 0000C0
6843FFFF FFFF005A 000C0026 001000C8 80020100 01360004 00030000 00000000 ..........6.....à...&...Z.....Ch 0000E0
68430074 78655400 3A656D61 4E000000 03007463 656A624F 206E6120 65736F6F oose an Object.....Name:.Text.Ch 000100
00000000 0000706C 6548006C 65636E61 43006573 6F6F6843 00003A73 6563696F oices:..Choose.Cancel.Help...... 000120
00009400 009000FE 00100001 00000007 00000000 FFFF0001 000E0352 00000138 ;...R......................±....... 000140
00970021 80010001 01130005 00050000 00000000 010FFFFF 003400AA 01140001 ....`.4......................!... 000160
00840097 00478002 00080119 00040006 00000000 0000FFFF FFFF0064 0008001E ....d.....................G...Ç. 000180
00080028 006F001A 80010001 011E0008 00050000 00000000 FFFFFFFF 006E0008 ..n.......................o.(... 0001A0
00820049 0086002E 00478000 00010127 00000007 00000000 0000FFFF FFFF0078 x..............'.....G...R.|... 0001C0
FFFF0046 000C0026 00100034 80020400 01280006 00030000 00000000 FFFFFFFF ..............(.....4...&...F... 0001E0
```

```
Dump of file SATURN:[PCCOMMON.DUMP.DLL]DAPICK.TMP;1 on 18-APR-1990 10:42:30.89
File ID (589,27,0)   End of file block 9 / Allocated 12

Virtual block number 9 (00000009), 512 (0200) bytes

 FFFFFFFF 0050000C 00260010 007E8002 0000012F 00060003 00000000 0000FFFF ............/.....-...&...P..... 000000
 6843FFFF FFFF005A 000C0026 001000C8 80020100 01360004 00030000 00000000 ..........6.....à...&...Z.....Ch 000020
 68430074 78655400 3A656D61 4E000000 03007463 656A624F 206E6120 65736F6F oose an Object.....Name:.Text.Ch 000040
 00000000 C400706C 6548006C 65636E61 43006573 6F6F6843 00003A73 6563696F oices:..Choose.Cancel.Help.á.... 000060
 00000000 00000000 00000000 00000000 00000000 00000000 00000000 00000000 ................................ 000080
 00000000 00000000 00000000 00000000 00000000 00000000 00000000 00000000 ................................ 0000A0
 00000000 00000000 00000000 00000000 00000000 00000000 00000000 00000000 ................................ 0000C0
 00000000 00000000 00000000 00000000 00000000 00000000 00000000 00000000 ................................ 0000E0
 00000000 00000000 00000000 00000000 00000000 00000000 00000000 00000000 ................................ 000100
 00000000 00000000 00000000 00000000 00000000 00000000 00000000 00000000 ................................ 000120
 00000000 00000000 00000000 00000000 00000000 00000000 00000000 00000000 ................................ 000140
 00000000 00000000 00000000 00000000 00000000 00000000 00000000 00000000 ................................ 000160
 00000000 00000000 00000000 00000000 00000000 00000000 00000000 00000000 ................................ 000180
 00000000 00000000 00000000 00000000 00000000 00000000 00000000 00000000 ................................ 0001A0
 00000000 00000000 00000000 00000000 00000000 00000000 00000000 00000000 ................................ 0001C0
 00000000 00000000 00000000 00000000 00000000 00000000 00000000 00000000 ................................ 0001E0

Dump of file SATURN:[PCCOMMON.DUMP.DLL]DAPROF.TMP;1 on 18-APR-1990 10:42:40.96
File ID (603,31,0)   End of file block 2 / Allocated 4

Virtual block number 1 (00000001), 512 (0200) bytes

 00000000 00000040 00000000 00000088 0000FFFF 00020004 00000002 00015A4D MZ!.............!.......@....... 000000
 00000080 00000000 00000000 00000000 00000000 00000000 00000000 00000000 ................................ 000020
 6F6E6E61 63206D61 72676F72 70207369 685421CD 4C01B821 CD09B400 0EBA1F0E ..º..Ç.ëI|.LÉIThis program canno 000040
 00000000 00000024 0A0D0D2E 65646F6D 20534F44 206E6920 6E757220 65622074 t be run in DOS mode....$....... 000060
 00010003 00000000 00000000 00000400 0003800A 6CF6E250 000000C8 0505454E NE..à...]â-l.................... 000080
 00000000 00000000 00010000 00040000 00000155 00850083 00580058 0040000F ..@.X.X.°.ç.U................... 0000A0
 00666F72 70616406 00120E01 0011002C 00360E00 00360028 00E80F00 00E80017 ..Õ...Õ.(.6...6.,.........daprof. 0000C0
 4F525041 44180001 58494645 5250454D 414E4A42 4F544547 464F5250 41441600 ..DAPROFGETOBJNAMEPREFIX...DAPRO 0000E0
 42544547 464F5250 41441A00 02584946 45525045 4D414E53 53414C43 54454746 FGETCLASSNAMEPREFIX...DAPROFGETB 000100
 55514C4D 44006C6D 64030000 01000003 45524F43 53554E45 4850594B 484E414C LANKHYPHENUSCORE.......dml.DMLQU 000120
 656C6966 6F725020 41440800 00000003 00690300 17030103 44494C4D 44595245 ERYDMLID......!.......DA Profile 000140
 E90020B8 D88EFFFF B81E5657 000000C8 00000000 00000000 00000000 00000073 s..................à...WV.|...Ã|-.Õ 000160
 8D0A76FF 0C76FF0E 76FF1076 FF088E00 08881E56 57000004 C8C8C95F 5E1F0000 ...^_èùà...WV.|...Ä.v..v..v..v.. 000180
 76FF1076 FF0017E9 8E898800 06E90375 00FC7E83 FC468900 00FFFF9A 5016FE46 F±.P......F•.-•.u.Õ..|¿.Õ...v..v 0001A0
 1E565700 0004C800 0CCAC95F 5E1F0000 E9FFFF00 699A0676 FF0876FF FE76FF0E ..v±.v..v..!...Õ...^ èò..à...WV. 0001C0
 FE5E8CFC 46890004 B8003FE9 FE5E8CFC 46890000 B80030E9 0A4688D8 8E001FB8 |...Ä.F.Õ0.|...F•.^±Õ?.|...F•.^± 0001E0

Dump of file SATURN:[PCCOMMON.DUMP.DLL]DAPROF.TMP;1 on 18-APR-1990 10:42:40.96
File ID (603,31,0)   End of file block 2 / Allocated 4

Virtual block number 2 (00000002), 512 (0200) bytes

 03750002 30001BE9 FE5E8CFC 4689000E B80027E9 FE5E8CFC 46890009 B80033E9 Õ3.|...F•.^±Õ'.|...F•.^±Õ..=..u. 000000
 FF0876FF FC76FFFE 76FFFF09 E9FFD0E9 03750005 30FFCCE9 03750003 30FFC8E9 Õà.=..u.Õã.=..u.ÕÀ.Õ1..v±.v=.v.. 000020
 00010050 00020004 90000ACA C95F5E1F 0000E900 008808C4 83FFFF00 009A0676 v.......á.|..Õ...^_èò.......]... 000040
 00000000 00000005 00010035 02030000 00030071 00020000 00020005 00020000 ....!.......q.......5........... 000060
 A8C78806 7EC4D1F7 AEF2FFFF B9C033C0 8ED88CFE 880A76C5 1EDE8807 8BEC8B55 U.ß.®.ß.év..±.Ä.à3â¿..·ÙÑ1á-..ù· 000080
 00000000 00000000 0000C850 C28C1FFA 88F388A4 F3C913A5 F3E90149 A4027401 .t.ÉI!Õ¤E.è¤Ê.¤.!..õ]ù......... 0000A0
 00000000 00000000 00000000 0000204A 424F0052 54544100 54455350 00544E45 ENT.PSET.ATTR.OBJ ............... 0000C0
 00000000 00000000 00000000 00000000 00000000 00000000 00000000 00000000 ................................ 0000E0
 00000000 00000000 00000000 00000000 00000000 00000000 00000000 00000000 ................................ 000100
 00000000 00000000 00000000 00000000 00000000 00000000 00000000 00000000 ................................ 000120
 00000000 00000000 00000000 00000000 00000000 00000000 00000000 00000000 ................................ 000140
 00000000 00000000 00000000 00000000 00000000 00000000 00000000 00000000 ................................ 000160
 00000000 00000000 00000000 00000000 00000000 00000000 00000000 00000000 ................................ 000180
 00000000 00000000 00000000 00000000 00000000 00000000 00000000 00000000 ................................ 0001A0
 00000000 00000000 00000000 00000000 00000000 00000000 00000000 00000000 ................................ 0001C0
 00000000 00000000 00000000 00000000 00000000 00000000 00000000 00000000 ................................ 0001E0
```

```
Dump of file SATURN:[PCCOMMON.DUMP.DLL]DASYNDF.TMP;1 on 18-APR-1990 10:43:26.14
File ID (614,10,0)   End of file block 13 / Allocated 16

Virtual block number 1 (00000001), 512 (0200) bytes

 00000000 00000040 00000000 00000088 0000FFFF 00000004 00000008 01FA5A4D MZ*.............|.......a....... 000000
 00000080 00000000 00000000 00000000 00000000 00000000 00000000 00000000 ................................ 000020
 6F6E6E61 63206D61 72676F72 70207369 685421CD 4C01B821 CD09B400 0EBA1F0E ..¤..Ç.ë!¡.Lê!This program canno 000040
 00000000 00000024 0A00002E 65646F6D 20534F44 206E6920 6E757220 65622074 t be run in DOS mode....$....... 000060
 00080008 00000000 00030000 00000000 00058009 EA396413 00070358 0505454E NE..X....d9õ.................... 000080
 00000000 00000000 00010002 00040000 0000030F 00A30093 00880080 0040002F /.@.......È.Ò.................. 0000A0
 005A0E00 005A0159 000F0F00 000F0157 068E0F00 068E000D 080A0F00 080A0041 A.......Ì./.../.W.......Y.Z...Z. 0000C0
 02891E81 0289016A 00811EF1 00810161 00020E21 00000000 00100F21 0010015F _...!.......!...a...þ...j.¿.Ý.¿. 0000E0
 DE008E00 78005500 19000700 01000000 46444E59 53414407 00640004 00020005 ......d..DASYNDF.........U.x./.Þ 000100
 6C6D6403 4B434F4C 42434F4C 4C414D45 4D004D45 4D034E49 574D5005 00024401 .D...PMWIN.MEM.MEMALLOCBLOCK.dml 000120
 49544759 52455551 4C4D440B 454C444E 41484C45 444F4D59 52455551 4C4D4413 .DMLQUERYMODELHANDLE.DMLQUERYGI! 000140
 4954470B 49544703 5453494C 45455246 4C4D440B 4E4C5259 52455551 4C4D440B .DMLQUERYRLN.DMLFREELIST.GI!.GI! 000160
 10606164 03525450 41544144 58554159 52455551 49544712 4C4F4F54 4C4C494B KILLTOOL.GI!QUERYAUXDATAPTR.dam. 000180
 41440F4E 59534554 41455243 4D41440C 454D414E 5443454A 424F5445 474D4144 DAMGETOBJECTNAME.DAMCREATESYN.DA 0001A0
 52454D41 444E4F4E 59414C50 5349444D 41441354 43454A42 4F50554B 4F4F4C4D MLOOKUPOBJECT.DAMDISPLAYNONDAMER 0001C0
 48424859 52455551 4D46440E 4D524F46 53534543 4F52504D 46440E4D 46440352 R.DFM.DFMPROCESSFORM.DFMQUERYHBH 0001E0

Dump of file SATURN:[PCCOMMON.DUMP.DLL]DASYNDF.TMP;1 on 18-APR-1990 10:43:26.14
File ID (614,10,0)   End of file block 13 / Allocated 16

Virtual block number 2 (00000002), 512 (0200) bytes

 0F4D5448 59524555 514D4644 084A424F 4C4D4448 59524555 514D4644 0F504145 EAP.DFMQUERYHDMLOBJ.DFMQUERYHTM. 000000
 4D464410 4C4F4F54 59524555 514D4644 0C474C44 444E5748 59524555 514D4644 DFMQUERYHWNDDLG.DFMQUERYTOOL.DFM 000020
 4400444C 45494652 45545349 4745524D 46441041 54414452 45535559 52455551 QUERYUSERDATA.DFMREGISTERFIELD.D 000040
 4D46440F 4E46444E 414D4D4F 43544553 4D46440F 4E464553 4F4C4354 45534D46 FMSETCLOSEFN.DFMSETCOMMANDFN.DFM 000060
 46440E4E 46455441 47495641 4E544553 4D464410 4E464C4F 52544E4F 43544553 SETCONTROLFN.DFMSETNAVIGATEFN.DF 000080
 4E4D4644 13415441 44524553 55544553 4D46440E 4E465946 49544F4E 5445534D MSETNOTIFYFN.DFMSETUSERDATA.DFMN 0000A0
 44455453 494C5353 45434F52 504D4644 194D524F 46474E4F 4C455441 47495641 AVIGATELONGFORM.DFMPROCESSLISTED 0000C0
 45544345 4C455358 4F425453 494C5952 4555514D 46441744 4E414D4D 4F435449 ITCOMMAND.DFMQUERYLISTBOXSELECTE 0000E0
 4F464144 0E4F464E 49524553 5554494E 494D524F 46414412 4D524F46 41440644 D.DAFORM.DAFORMINITUSERINFO.DAFO 000100
 41445055 4A424F0F 5443454C 45535449 4E494A42 4F0D454C 54495454 45534D52 RMSETTITLE.OBJINITSELECT.OBJUPDA 000120
 4F464554 41445055 4A424F12 454D414E 54494E49 4A424F08 5443454C 45534554 TESELECT.OBJINITNAME.OBJUPDATEFO 000140
 4E414859 4649544F 4E454B41 4D54554C 4D441654 554C4D44 05454D41 4E535543 CUSNAME.DMLUT.DMLUTMAKENOTIFYHAN 000160
 45525455 4C4D4410 4554454C 45445245 54534947 45525455 4C4D4413 52454C44 DLER.DMLUTREGISTERDELETE.DMLUTRE 000180
 4C4D441B 59464954 4F4E5353 45434F52 5054554C 4D441254 45535245 54534947 GISTERSET.DMLUTPROCESSNOTIFY.DML 0001A0
 1C000005 09030101 4554414C 45524E55 4554414C 45525245 54534947 45525455 UTREGISTERRELATEUNRELATE........ 0001C0
 530C0000 6D726F46 20676E6F 4C206D79 6E6F6E79 53204144 204D5020 322F534F OS/2 PM DA Synonym Long Form...S 0001E0

Dump of file SATURN:[PCCOMMON.DUMP.DLL]DASYNDF.TMP;1 on 18-APR-1990 10:43:26.14
File ID (614,10,0)   End of file block 13 / Allocated 16

Virtual block number 3 (00000003), 512 (0200) bytes

 890A46B8 D8EFFFF B81E5657 000002C8 00000000 01504152 5453544F 4F424E59 YNBOOTSTRAP.....à...WV.|...Ä.F.. 000000
 5700000E C8000CCA C95F5E1F FFF4E900 03E90006 E9000088 0009E9FE 468BFE46 F±.F±õ..|..Õ..Õ..Õ¶..^_èò..à...W 000020
 03E90029 E900008B 0009E9F4 468B0001 F246C7F4 46890A46 8B088E00 088B1E56 V.|...Ä.F..F¶úF ...F¶õ¯..|..Õ).Õ. 000040
 9AF676FF FC76FFFE 76FF0676 FF0876FF 0A76FF0C 76FFF876 FFFA76FF FFF4E900 .Õ¶..v°.v½.v..v..v..v..v±.v•.v-. 000060
 0876FF0A 76FFD88E 0033B81E 56570000 D4C8000C CAC95F5E 1F0000E9 0000FFFF ....Õ...^_èò..àå..WV.|3..Ä.v..v. 000080
 76FFFA56 89F84689 0000FFFF 9A0676FF B076FFB2 76FF0000 FFFF9A50 16804680 .F¯.P......vý.v¯.v........F½.V°.v 0000A0
 E900008A 00008800 09E90375 23847E80 0000FFFF 9A501684 46804 06A F876FFFA °.v½j@.FÇ.P......-Ç#u.Õ..|..¤..Õ 0000C0
 7407F47E 83F65689 F44689FF CA830000 0D04C483 FFFF0000 9A501685 468D0001 !..Fç.P......å.....ò..F¶.V-.-¶.t 0000E0
 9A008068 5016FF2C 868D0676 FFB076FF B276FF00 1AE90374 FFF67E83 0023E903 .Õ#..—.t.Õ...vý.v¯.v......Ph... 000100
 FFB076FF B276FF00 1AE90374 FFF67E83 0023E903 7406F47E 830035E9 0000FFFF ....Õ5..-¶.t.Õ#..—.t.Õ...vý.v¯. 000120
 FF0A76FF 0057E900 00BA0000 B80009E9 0000FFFF 9A5016FF 2C868D00 868D0676 v.h........P.....Õ..|..¤. ÕW..v.. 000140
 0876FF0A 76FF0676 FF5016FF 2C868D50 16FC468D 0000FFFF 9A5016AE 468D0876 v..FÛ.P......F•.P.....P.. .v..v. 000160
 FFAE76FF 0017E900 00BA0000 B80009E9 03750000 3DAC4689 0EC483FF FF07139A ......å..F¯=..u.Õ..|..¤..ò...vÙ. 000180
 56570000 0AC80006 CAC95F5E 1F0000E9 0000FFFF 9A5016FF 2C868DFC 76FFFE76 v±.v•.....P.....Õ...^_èò..à...WV 0001A0
 06E90375 000030F6 46890000 FFFF9A50 16FC468D 0E76FF10 76FFD88E 0086881E .|...Ä.v..v..F•.P......F-=..u.Õ. 0001C0
 0000FFFF 9A5016F8 468D0E76 FF1076FF 004AE903 740C087E 8300C0E9 F6468800 ..F-Õå..-...t.ÕJ..v..v..F½.P..... 0001E0
```

```
Dump of file SATURN:[PCCOMMON.DUMP.DLL]DASYNDF.TMP;1 on 18-APR-1990 10:43:26.14
File ID (614,10,0)   End of file block 13 / Allocated 16

Virtual block number 4 (00000004), 512 (0200) bytes

390015E9 03740A46 39FA568B F8468800 96E9F646 880006E9 03750000 30F64689 .F-=..u.Ö...F-Ö...F%.V°9F.t.Ö..9 000000
07C726FC 5EC4006D E90000B8 0000FFFF 9A656A0E 76FF1076 FF000DE9 03740C56 V.t.Ö...v..v.je.....!..Öm.é^=&ú. 000020
46890000 FFFF9A06 76FF0876 FF0A76FF 0C76FF02 77FF2604 77FF26FC 5EC40001 ..é^=&.w.&.w..v..v..v..v.......F 000040
00A0680E 76FF1076 FF000007 C726FC5E C40038E9 F6468800 06E90375 00003DF6 -=..u.Ö...F-ÖB.é^=&ú....v..v.h.. 000060
00FFFF9A 009F680E 76FF1076 FF000002 8D9A00A1 680E76FF 1076FF00 00027F9A ......v..v.hÀ.......v..v.h...... 000080
1476FF16 76FFD88E 0182881E 56570000 02C8000C CAC95F5E 1F0000E9 00008800 .!..Ö...^_èò..à...WV.!ÿ..Ä.v..v. 0000A0
0000FFFF 9AFFFF68 01736806 76FF0876 FF0A76FF 0C76FF0E 76FF1076 FF1276FF .v..v..v..v..v..v..v.hs.h....... 0000C0
30FE4689 0000FFFF 9A1476FF 1676FF00 22E9FE46 880006E9 03750000 3DFE4689 .F±=..u.Ö...F±Ö"..v..v.......F±= 0000E0
56570000 0AC80012 CAC95F5E 1F0000E9 00008800 06E9FE46 880006E9 03750000 ..u.Ö...F±Ö..!..Ö...^_èò..à...WV 000100
16F6468D FC76FFFE 76FF0000 FFFF9A50 16FC468D 0E76FF10 76FFD88E 02A6881E .!Ï..Ä.v..v..F=.P......v±.v=.F-. 000120
F876FFFC 76FFFE76 FF0022E9 FA468800 06E90375 00003DFA 46890000 FFFF9A50 P......F°=..u.Ö...F°Ö"..v±.v=.v% 000140
000CCAC9 5F5E1F00 00E90000 FFFF9A00 6A0A76FF 0C76FF06 76FF0876 FFF676FF .v-.v..v..v..v.j......Ö...^_èò.. 000160
30E84689 00000096 9A5016EE 46800876 FF0A76FF D88E0312 881E5657 000064C8 àd..WV.!...Ä.v..v..FŸ.P......FÒ= 000180
E8468900 0003229A 5016EA46 800876FF 0A76FF01 65E9E846 880006E9 03750000 ..u.Ö...FÒÕe..v..v..Fõ.P."....FÒ 0001A0
00300000 01EC9A50 16FC468D 0876FF0A 76FF0144 E9E8468B 0006E903 7500003D =..u.Ö...FÒÕD..v..v..F=.P.š...=. 0001C0
E9037500 003DE846 89000002 E89A0876 FF0A76FF 0126E9E8 46880006 E9037500 .u.Ö...FÒÕ&..v..v..Ò....FÒ=..u.Ö 0001E0

Dump of file SATURN:[PCCOMMON.DUMP.DLL]DASYNDF.TMP;1 on 18-APR-1990 10:43:26.14
File ID (614,10,0)   End of file block 13 / Allocated 16

Virtual block number 5 (00000005), 512 (0200) bytes

FFEA76FF EC76FF00 F9E90000 880006E9 0374FE46 08FC4688 010AE9E8 46880006 ...FÒÕ...F=.F±t.Ö..!..Ö°..v§.vÕ. 000000
E9E84688 0006E903 7500003D E8468900 00FFFF9A 5016F846 8D036AFC 76FFFE76 v±.v=j..F%.P......FÒ=..u.Ö...FÒÕ 000020
F45EC4F2 46FF04F4 46830007 E90000F2 46C7F656 89F44689 FA568BF8 46880000 Ä..F%.V°.F¶.V-úF...Ö...F¶..F·é^¶ 000040
169C468D 37FF2602 77FF26F4 5EC4EA76 FFEC76FF 008FE903 75024708 26078826 &..&.G.u.Ö...v§.vÕÄ^¶&.w.&.7.F.. 000060
04F89AF8 76FFFA76 FFEA76FF EC76FF00 29E90375 00003DE8 46890000 FFFF9A50 P......FÒ=..u.Ö)..v§.vÕ.v°.v%.%. 000080
EE76FFF0 76FF0058 E90000B8 0000FFFF 9A000068 1EE876FF EE76FFF0 76FF0000 ...vb.vŸ.vÒ.h.......!..ÕX..vb.vŸ 0000A0
01696806 76FFEE76 FFF076FF 000004E0 9A50169C 468DFF6A 006A0161 680676FF .v.ha.j.j..F..P.Å....vb.vŸ.v.h!. 0000C0
76FFEC76 FFFF58E9 009C46C6 0000FFFF 9A37FF26 0277FF26 F45EC4F2 76FF006A j..v é^¶&.w.&.7.....ÕF...[..v§.v 0000E0
1E565700 0008C800 06CAC95F 5E1F0000 E90000B8 0000FFFF 9AF876FF FA76FFEA õ.v°.v%.....!..Ö...^_èò.:à...WV. 000100
16FC468D 066A1E6A FA76FF00 00FFFF9A 5016FA46 8D0676FF 0876FF08 8E037888 !x..Ä.v..v..F°.P......v°j.j..F=. 000120
05F09A06 76FF0876 FF00A2E9 F8468800 06E90375 00003DF8 46890000 FFFF9A50 P......F%=..u.Ö...F%ÕÄ..v..v..b. 000140
FF0676FF 0876FF08 C483FFFF 04889A06 76FF0876 FFFC76FF FE76FF04 C4830581 ...é..v±.v=.v..v.........é..v..v.. 000160
76FF0876 FF0000FF FF9AFFFF 6805A168 0676FF08 76FF0000 FFFF9AFC 76FFFE76 v±.v=.......v..v.hÀ.h........v..v 000180
76FF0876 FF0000FF FF9AFFFF 68058268 0676FF08 76FF0000 FFFF9A00 6A006A06 .j.j........v..v.hý.h........v..v 0001A0
0876FF00 00FFFF9A FFFF6802 C6680676 FF0876FF 0000FFFF 9AFFFF68 05C36806 .hù.h........v..v.hó.h........v. 0001C0
0004CAC9 5F5E1F00 00E90000 880000FF FF9A0000 36FF2600 0E068E64 6A0676FF .v.jd....&.6.......!..Ö...^_èò.. 0001E0

Dump of file SATURN:[PCCOMMON.DUMP.DLL]DASYNDF.TMP;1 on 18-APR-1990 10:43:26.14
File ID (614,10,0)   End of file block 13 / Allocated 16

Virtual block number 6 (00000006), 512 (0200) bytes

FFFF68FF FF68FFFF 68FFFF68 656A0676 FF0876FF D88E0511 881E5657 000000C8 à...WV.!...Ä.v..v.jeh..h..h..h.. 000000
6AFFFF68 064368FF FF68FFFF 68676A06 76FF0876 FF000006 369A006A 006A006A j.j.j..6....v..v.jgh..h..hC.h..j 000020
006A016A 006A006A FFFF6805 50686F6A 0676FF08 76FF0000 06539A00 6A006A00 .j.j..S....v..v.johP.h..j.j.j.j. 000040
006A006A 006A006A 006A0682 68067F68 00906806 76FF0876 FF000006 719A006A j..q....v..v.h..h..h..j.j.j.j.j. 000060
A09A006A 006A006A 006A006A 06A06806 9068009E 680676FF 0876FF00 00068F9A ......v..v.h..h..h..j.j.j.j.j..Ù 000080
0006CB9A 006A006A 006A006A 006A068E 68068868 009C6806 76FF0876 FF000006 ....v..v.h..hE.h/.j.j.j.j.j..ù.. 0000A0
FF000006 E99A006A 006A006A 006A006A 060C6806 D96800A0 680676FF 0876FF00 ..v..v.h..h].hE.j.j.j.j.j..Õ.... 0000C0
0876FF00 0007079A 006A006A 006A006A 006A06FA 6806F768 00A16806 76FF0876 v..v.hÀ.h%.h°.j.j.j.j.j.......v. 0000E0
5E1F0000 E90000FF FF9A006A 006A006A 006A006A FFFF68FF FF68009F 680676FF .v.h..h..h..j.j.j.j.j......Õ...^ 000100
FF0876FF 07892602 47892600 0088105E C4088E05 F8881E56 57000010 C8CBC95F _èùà...WV.!%..Äé^.!..&.G.&...v.. 000120
0876FF00 87E9F046 880006E9 03750000 30F04689 000003A9 9A5016F4 46800676 v..F¶.P.`....Fb=..u.Ö...FbÕñ..v. 000140
46880096 E9F0468B 0006E903 7500003D F0468900 0003889A 5016FA46 800676FF .v..F°.P......Fb=..u.Ö...FbÖ...F 000160
FFFE4689 000007A4 9A006A00 6A006A00 6A016568 6F6AFA76 FFFC76FF 004DE90A .ÕM..v=.v°johe.j.j.j.j..Ê....F±. 000180
89260789 26105EC4 000004C0 9A006A00 6AFE76FF 006A016A 686F6AFA 76FFFC76 v=.v°johj.j..v±j.j..&...é^.&..&. 0001A0
FFF676FF FFECE9FF ABE90375 006F3000 08E90046 E90000B8 004CE900 00880257 W.!..ÕL.!..ÕF.Õ..=o.u.Õ .Õ§..v-. 0001C0
F0468900 00FFFF9A 1076FF12 76FF006A 006AF876 FF0C76FF 0E76FFF2 76FFF476 v¶.v·.v..v..v%j.j..v..v.......Fb 0001E0
```

```
Dump of file SATURN:[PCCOMMON.DUMP.DLL]DASYNDF.TMP;1 on 18-APR-1990 10:43:26.14
File ID (614,10,0)   End of file block 13 / Allocated 16

Virtual block number 7 (00000007), 512 (0200) bytes

05210203 003590C8 C95F5E1F 0000E900 00B80006 E9F04688 0006E903 75000030 =..u.Õ...Fbõ..¡..Õ...^_èù.S...!. 000000
07880103 02250007 06270205 00000001 062A0002 01E50007 06610202 00010006 ..!...a...!...*.......'...X..... 000020
013C0103 00040001 00BC0103 01590006 05A70203 00000002 05640002 007F0001 ......d.......T...Y...V.......<. 000040
07180002 03700001 06460005 00E00006 03CA0203 00000004 000A0002 00870001 ......Ö.......ò...Å...F...p..... 000060
02710203 00080002 05320203 00130001 00A40103 01690006 05C90203 00000005 ......è...i...É.......2.......q. 000080
06050202 00000001 05A40005 00F00006 07380203 007E0001 05C60005 01E50007 ..!...ó...~...8...b...Æ......... 0000A0
07590203 017A0006 05870203 030A0001 02C90005 007C0005 04720203 02070007 ......r...|...è...........z...Y. 0000C0
03320203 00800005 03620203 02150007 06080202 01F80007 03E30203 00FC0006 ..•...D...½...........b.......2. 0000E0
02200203 029E0001 06200005 010C0006 01580203 01890006 05760203 00100003 ......v.......X......`....... . 000100
024A0203 01E50007 06640205 009A0005 07E90203 02250007 06240202 02070007 ......$...%...Õ.......d...|...J. 000120
05850005 01AA0001 05840005 01190006 01C20203 01980006 019C0203 02860008 ..............õ............`...Ç. 000140
00700203 012A0006 06170203 00300003 041D0203 00AA0005 04A00203 00280001 ..+.......`.......=.......•...p. 000160
05960203 02310007 02CC0203 02070007 06080205 00490003 048E0203 01AC0006 ..¯.......!...........ä...1..... 000180
05880203 01C60006 01100203 02150007 060E0205 00C20006 05DF0203 01380006 ..;...Õ...ô...............ó...|. 0001A0
FF0C76FF D88EFFFF 881E5657 00000CC8 00000000 00000000 00000000 01490006 ..!.............à...WV.¡...Å.v.. 0001C0
FA76FF00 68E9F846 880006E9 03750000 30F84689 0000FFFF 9A5016FA 46800A76 v..F•.P......F½=..u.Õ...F½Õk..v• 0001E0

Dump of file SATURN:[PCCOMMON.DUMP.DLL]DASYNDF.TMP;1 on 18-APR-1990 10:43:26.14
File ID (614,10,0)   End of file block 13 / Allocated 16

Virtual block number 8 (00000008), 512 (0200) bytes

76FFF676 FF0040E9 F8468800 06E90375 000030F8 46890000 FFFF9A50 16F44680 .F¶.P......F½=..u.Õ...F½ÕM..v-.v 000000
88FC4688 002CE9F8 46880006 E9037500 0030F846 890000FF FF9A5016 FC4680F4 ¶.F=.P......F½=..u.Õ...F½Õ,..F•. 000020
676AF476 FFF676FF 0010E900 00880006 E9037510 56390008 E903740E 4639FE56 V±9F.t.Õ..9V.u.Õ..¡..Õ...v-.v¶jg 000040
800A76FF 0C76FFD8 8E000888 1E565700 000CC8C8 C95F5E1F 0000E900 00FFFF9A .....Õ...^_èùà...WV.¡...Å.v..v.. 000060
F4468DFA 76FF0068 E9F84688 0006E903 7500003D F8468900 0000189A 5016FA46 F•.P......F½=..u.Õ...F½Õk..v•.F¶ 000080
468DF476 FFF676FF 004DE9F8 46880006 E9037500 0030F846 89000000 369A5016 .P.6....F½=..u.Õ...F½ÕM..v-.v¶.F 0000A0
39FE5688 FC468800 2CE9F846 880006E9 03750000 30F84689 00000057 9A5016FC =.P.V....F½=..u.Õ...F½Õ,..F=.V±9 0000C0
880000FF FF9A006A FA76FF00 10E90000 880006E9 03751056 390008E9 03740E46 F.t.Õ..9V.u.Õ..¡..Õ...v•j......¡ 0000E0
16FA4680 0A76FF0C 76FFD88E 00A5881E 56570000 10C8C8C9 5F5E1F00 00E9FFFF ..Õ...^_èùà...WV.¡É..Å.v..v..F•. 000100
9A5016F2 4680FA76 FF008AE9 F0468800 06E90375 000030F0 46890000 00859A50 P.ç....Fb=..u.Õ...FbÕo..v•.F·.P. 000120
5016FC46 80F276FF F476FF00 9CE9F046 880006E9 03750000 30F04689 00000003 &....Fb=..u.Õ...FbÕ...v¶.v·.F•.P 000140
16F64680 F276FFF4 76FF0078 E9F04688 0006E903 75000030 F0468900 0000F49A .¶....Fb=..u.Õ...FbÕ(..v¶.v·.F-. 000160
0E4639FE 5688FC46 88005AE9 F0468800 06E90375 000030F0 46890000 FFFF9A50 P......Fb=..u.Õ...FbÕZ..F•.V±9F. 000180
03751456 390008E9 03741246 39FE5688 FC468800 1CE90375 10563900 08E90374 t.Õ..9V.u.Õ...F=.V±9F.t.Õ..9V.u. 0001A0
00FFFF9A 006A006A 006A006A 016E686F 6AF676FF F876FF00 28E90000 880006E9 Õ..¡..Õ(..v½.v-john.j.j.j.j..... 0001C0
0142881E 56570000 00C8C8C9 5F5E1F00 00E9FFFF 03709A6F 6AF276FF F476FF00 ..v¶.v·jo.p...Õ...^_èùà...WV.¡B. 0001E0

Dump of file SATURN:[PCCOMMON.DUMP.DLL]DASYNDF.TMP;1 on 18-APR-1990 10:43:26.14
File ID (614,10,0)   End of file block 13 / Allocated 16

Virtual block number 9 (00000009), 512 (0200) bytes

00C8C8C9 5F5E1F00 00E908C4 83FFFF03 3E9A0A76 FF0C76FF 0E76FF10 76FFD88E .Å.v..v..v..v..>....á.Õ...^_èùà. 000000
00E908C4 83024103 3E9A0A76 FF0C76FF 0E76FF10 76FFD88E 022E881E 56570000 ..WV.¡...Å.v..v..v..v..>.A..á.Õ. 000020
3E9A0A76 FF0C76FF 0E76FF10 76FFD88E 0256881E 56570000 00C8C8C9 5F5E1F00 ..^_èùà...WV.¡V..Å.v..v..v..v..> 000040
0E76FF10 76FFD88E 027E881E 56570000 00C8C8C9 5F5E1F00 00E908C4 83026903 .!..á.Õ...^_èùà...WV.¡~..Å.v..v. 000060
02A6881E 56570000 00C8C8C9 5F5E1F00 00E908C4 83029103 3E9A0A76 FF0C76FF .v..v..>....á.Õ...^_èùà...WV.¡!. 000080
00C8C8C9 5F5E1F00 00E908C4 83028903 3E9A0A76 FF0C76FF 0E76FF10 76FFD88E .Å.v..v..v..v..>.¿..á.Õ...^_èùà. 0000A0
00E908C4 8302E103 3E9A0A76 FF0C76FF 0E76FF10 76FFD88E 02CE881E 56570000 ..WV.¡Õ..Å.v..v..v..v..>.Å. ¢.Õ. 0000C0
3E9A0A76 FF0C76FF 0E76FF10 76FFD88E 02F6881E 56570000 00C8C8C9 5F5E1F00 ..^_èùà...WV.¡-..Å.v..v..v... .> 0000E0
0676FF08 76FFD88E 031E881E 56570000 18C8C8C9 5F5E1F00 00E908C4 83030903 .....á.Õ...^_èùà...WV.¡...Å.v.... 000100
4680FA76 FF0118E9 F0468800 06E90375 000030F0 46890000 01529A50 16FA4680 .F•.P.R....Fb=..u.Õ...FbÕ...v•.F 000120
80EC76FF EE76FF00 FAE9F046 880006E9 03750000 30F04689 00000170 9A5016EC &.P.p....Fb=..u.Õ...FbÕ•..vŸ.v&. 000140
EC76FFEE 76FF00D9 E9F04688 0006E903 75000030 F0468900 0001919A 5016FC46 F•.P......Fb=..u.Õ...FbÕ1..vŸ.v& 000160
76FF0876 FF008BE9 F0468800 06E90375 000030F0 46890000 01829A50 16F64680 .F-.P.ý....Fb=..u.Õ...FbÕ¡..v..v 000180
46880006 E9037500 0030F046 890000FF FF9A5016 F2468003 6AFC76FF FE76FF06 ..v±.v•j..F·.P......Fb=..u.Õ...F 0001A0
47082607 8826E85E C404E846 830004E9 EA5689E8 4689F456 88F24688 008FE9F0 bÕ...F·.V¶.FÕ.VõÕ...FÕ.á^Õ&..&.G 0001C0
0039E903 74025739 260042E9 03740739 260C5688 0A4688E8 5EC40056 E9037502 .u.ÕV.á^Õ.F..V.&9.t.Õ8.&9W.t.Õ9. 0001E0
```

```
Dump of file SATURN:[PCCOMMON.DUMP.DLL]DASYNDF.TMP;1 on 18-APR-1990 10:43:26.14
File ID (614,10,0)   End of file block 13 / Allocated 16

Virtual block number 10 (0000000A), 512 (0200) bytes

 006A006A 016E686F 6AF676FF F876FF00 0004799A F276FFF4 76FF0676 FF0876FF .v..v..v¶.v·.y....v½.v-john.j.j. 000000
 FF0876FF FF97E900 1AE9021C 03709A6F 6AEC76FF EE76FF00 0002009A 006A006A j.j.......vŸ.všjo.p...Õ..Õ...v.. 000020
 881E5657 000008C8 CBC95F5E 1F0000E9 00008800 00FFFF9A F276FFF4 76FF0676 v.:v¶.v·.....|..Õ...^ èùà...WV.| 000040
 880006E9 03750000 30F84689 0000FFFF 9A5016FE 46800676 FF0876FF D88E0346 F..Ä.v..v..F±.P......F½=..u.Õ... 000060
 0006E903 7500003D F8468900 00FFFF9A 5016FA46 8D0676FF 0876FF02 03E9F846 F½Õ...v..v..F°.P......F½=..u.Õ.. 000080
 890000FF FF9A5052 0002050C 56880A46 88FA76FF FC76FFFE 76FF01E2 E9F8468B .F½Õã..v±.v•.v°.F..V....RP...... 0000A0
 68026A0A 6A0277FF 260477FF 260A5EC4 018BE9F8 46880006 E9037500 0030F846 F½=..u.Õ...F½Õ¡.ã^.&.w.&.w.j.j.h 0000C0
 FF260A5E C4018DE9 F8468800 06E90375 00003DF8 46890000 05989AFF FF680539 9.h........F½=..u.Õ...F½Õ..ã^.&. 0000E0
 46880006 E9037500 0030F846 890000FF FF9AFFFF 68056468 0A6A0277 FF260477 w.&.w.j.hd.h........F½=..u.Õ...F 000100
 9AFFFF68 05956805 6D68056A 68036A0A 6A0277FF 260477FF 260A5EC4 0164E9F8 ¥Õd.ã^.&.w.&.w.j.j.hj.hm.h..h... 000120
 0277FF26 0477FF26 0A5EC401 33E9F846 880006E9 03750000 30F84689 0000FFFF .....F½=..u.Õ...F½Õ3.ã^.&.w.&.w. 000140
 0108E9F8 46880006 E9037500 0030F846 89000005 C69AFFFF 6805C068 026A026A j.j.hã.h...ó....F½=..u.Õ...F½Õ.. 000160
 000030F8 46890000 05F19AFF FF6805EB 682F6A01 6A0277FF 260477FF 260A5EC4 ã^.&.w.&.w.j.j/hŠ.h...þ....F½=.. 000180
 FFFF6806 1668026A 066A0277 FF260477 FF260A5E C4000DE9 F8468800 06E90375 u.Õ...F½Õï.ã^.&.w.&.w.j.j.h..h.. 0001A0
 77FF2604 77FF260A 5EC400B2 E9F8468B 0006E903 7500003D F8468900 00061C9A ......F½=..u.Õ...F½Õý.ã^.&.w.&.w 0001C0
 87E9F846 880006E9 03750000 30F84689 00000647 9AFFFF68 06416802 6A076A02 .j.j.hA.h...G....F½=..u.Õ...F½Õ. 0001E0

Dump of file SATURN:[PCCOMMON.DUMP.DLL]DASYNDF.TMP;1 on 18-APR-1990 10:43:26.14
File ID (614,10,0)   End of file block 13 / Allocated 16

Virtual block number 11 (0000000B), 512 (0200) bytes

 0030F846 89000006 729AFFFF 68066C68 026A056A 0277FF26 0477FF26 0A5EC400 .ã^.&.w.&.w.j.j.hl.h...r....F½=. 000000
 FF680331 68026A03 6A0277FF 260477FF 260A5EC4 005CE9F8 46880006 E9037500 .u.Õ...F½Õ\.ã^.&.w.&.w.j.j.h1.h. 000020
 FF260477 FF260A5E C40031E9 F8468800 06E90375 000030F8 46890000 FFFF9AFF .......F½=..u.Õ...F½Õ1.ã^.&.w.&. 000040
 E9F8468B 0006E903 75000030 F8468900 0005169A FFFF6805 1068026A 096A0277 w.j.j.h..h........F½=..u.Õ...F½Õ 000060
 00000001 04640002 00D10006 04A00203 001C90CB C95F5E1F 0000E9F8 46880006 ...F½Õ...^_èü.........!...d..... 000080
 00000002 06970002 007F0001 04550103 02C60002 06440005 00650004 03740203 ..t...e...Õ...6...U............. 0000A0
 00000005 04900002 00E00006 03950203 024E0002 05C30005 024A0008 04E80203 ..Š...J...û...N.......Å.......... 0000C0
 02EE0002 066F0005 00FC0006 03860203 02610008 053F0203 00F00006 04C10203 ..è...b...7...a...Ñ...=...o...Ÿ. 0000E0
 00310003 03560203 00000002 05130005 02760002 05EE0005 02750008 06900203 ......u...Ÿ...v...........V...1. 000100
 02250007 00910203 02990008 05700203 03160002 069A0005 00300003 030F0203 ..Õ...*............p...........X. 000120
 02260002 05980005 00490003 04300203 029E0002 06190005 00900002 053C0005 ..<..............=...|.......&. 000140
 01C80001 881F0000 3E89088E FFFFB81E 013A0002 05670005 00590004 012B0203 ..+...Y...g...:..|...Å.>...|..ù. 000160
 99C03306 76C51E56 57EC8855 000001E9 00000000 00000000 00000600 02000200 ................Õ...U.$WV.‘v.3ã. 000180
 D1E3011B 72302C1F 77393CAC 01752B3C 0474203C 50F77409 3CFB7420 3CACD833 3Ù¯< t«<.t%P<-t.<+u.¯<9w.,L .1D1 0001A0
 D8F70775 93203C58 0CEB00D2 83080307 13090302 D1E3D1D2 D1E3D1FA 88CB88D2 @.ù.°1D1@1D1@.).ø.Ä.@.ŠÉX<-.ˍ.XÄ 0001C0
 FFFF0079 62646573 5574696E 496E7953 00000000 0000CB5D 5F5E1FDA F7000283 .@.%Õ.^_]ù......SynInitUsedby... 0001E0

Dump of file SATURN:[PCCOMMON.DUMP.DLL]DASYNDF.TMP;1 on 18-APR-1990 10:43:26.14
File ID (614,10,0)   End of file block 13 / Allocated 16

Virtual block number 12 (0000000C), 512 (0200) bytes

 7463656C 65732065 74616470 55350352 00000000 00000000 0006000E 00020001 ................R.5Update select 000000
 6F6C206D 796E6F6E 7973206E 69206D79 6E6F6E79 7320666F 20737574 61747320  status of synonym in synonym lo 000020
 2060796E 6F6E7973 20666F20 6560616E 20657461 6470552C 0060726F 6620676E ng form.,Update name of synonym  000040
 01000100 01000100 01000100 60726F66 20676E6F 6C206D79 6E6F6E79 73206E69 in synonym long form............ 000060
 00000000 00000000 00000000 00000000 01000100 01000100 01000100 01000100 ................................ 000080
 007F1400 0090022A 00000001 00000011 00000000 FFFF0001 000E0352 00000289 ¿...R.....................*....... 0000A0
 0098000B 80020002 022F0006 00030000 00000000 022BFFFF 006400A7 0102FF37 7...!.d...+.........../......... 0000C0
 003C0085 00088001 00010236 00050005 00000000 0000FFFF FFFF0065 000C0028 (...e................6.........<. 0000E0
 0008009C 0079000B 8002000C 023C0000 00060000 00000000 FFFFFFFF 00660009 ..f................<........y..... 000100
 006E0008 00640065 00088001 0001023D 00080005 00000000 0000FFFF FFFF0067 g...............=........e.d...n. 000120
 FFFF006F 002C00AA 0032000B 80000000 02460000 00070000 00000000 FFFFFFFF ...............F.......2.`.,.o... 000140
 FFFFFFFF 0096002C 00FA0002 00028001 00020247 00100005 00000000 0000FFFF ............G.........°.,........ 000160
 0000FFFF FFFF0097 00080019 001E0037 80010001 02580004 00050000 00000000 ..........X.....7................ 000180
 00000000 FFFFFFFF 00980008 001A001E 00788001 0001025D 00040005 00000000 ........]....x................... 0001A0
 00000000 0000FFFF FFFF0099 0008001A 001E00C3 80010001 02620004 00050000 ......b.....Ù.................... 0001C0
 00050000 00000000 FFFFFFFF 009A0008 00280014 00068001 00010267 00070005 ....g.........(.................. 0001E0
```

```
Dump of file SATURN:[PCCOMMON.DUMP.DLL]DASYNDF.TMP;1 on 18-APR-1990 10:43:2e.14
File ID (614,10,0)   End of file block 13 / Allocated 16

Virtual block number 13 (0000000D), 512 (0200) bytes

000A0005 00000000 0000FFFF FFFF0098 00080028 00050005 80010001 026F0007 ..o.........(..................... 000000
0282000A 00050000 00000000 FFFFFFFF 009C0008 00370014 00378001 00010277 w.....7...7....................... 000020
0001028D 000A0005 00000000 0000FFFF FFFF009D 00080037 00140078 80010001 ....x...7......................... 000040
80010001 0298000A 00050000 00000000 FFFFFFFF 009E0008 00370014 00C38001 ..Ü...7........................... 000060
00788001 000102A3 000A0005 00000000 0000FFFF FFFF009F 00080037 00050037 7...7...................É.....x. 000080
000500C3 80010001 02AE000A 00050000 00000000 FFFFFFFF 00A00008 00370005 ..7...................Ü.....Ü... 0000A0
73552A00 003A6560 614E0074 63656C65 53000000 0000FFFF FFFF00A1 00080037 7...À.........Select.Name:..*Us 0000C0
6D695400 65746144 006E6F69 74616D72 6F666E49 20726573 55000079 62206465 ed by..User Information.Date.Tim 0000E0
5F5F5F5F 5F5F5F5F 5F006465 74616470 55006465 74616572 43007265 73550065 e.User.Created.Updated._________ 000100
5F5F5F5F 5F5F5F5F 005F5F5F 5F5F5F5F 5F5F5F00 5F5F5F5F 5F5F5F5F 5F5F005F _.__________.__________.________ 000120
00000000 0000FF00 5F5F5F5F 5F5F5F5F 5F5F005F 5F5F5F5F 5F5F5F5F 5F005F5F __.__________.__________....... 000140
00000000 00000000 00000000 00000000 00000000 00000000 00000000 00000000 ................................ 000160
00000000 00000000 00000000 00000000 00000000 00000000 00000000 00000000 ................................ 000180
00000000 00000000 00000000 00000000 00000000 00000000 00000000 00000000 ................................ 0001A0
00000000 00000000 00000000 00000000 00000000 00000000 00000000 00000000 ................................ 0001C0
00000000 00000000 00000000 00000000 00000000 00000000 00000000 00000000 ................................ 0001E0

Dump of file SATURN:[PCCOMMON.DUMP.MSG]DAXFORM.MSG;1 on 18-APR-1990 10:53:59.60
File ID (984,33,0)   End of file block 4 / Allocated 4

Virtual block number 1 (00000001), 512 (0200) bytes

29000000 00000000 00000000 00000000 01000100 0553454D 00464753 4D4B4DFF .MKMSGF.MES...................) 000000
65747562 69727474 61206465 7463656C 65732065 68544905 A505B903 98022200 .".....E.IThe selected attribute 000020
64206874 69772064 65746169 636F7373 61207964 6165726C 61207369 20322520  X2 is already associated with d 000040
6165726C 61206574 75626972 74746120 6E412020 2E332520 6E6F6973 6E656D69 imension X3.  An attribute alrea 000060
63206E6F 69736E65 6D696420 61206874 69772064 65746169 636F7373 61207964 dy associated with a dimension c 000080
6D6F6420 61206874 69772064 65746169 636F7373 61206562 20796C6E 6F206E61 an only be associated with a dom 0000A0
6D696420 65687420 6E692073 69206E69 616D6F64 20746168 74206669 206E6961 ain if that domain is in the dim 0000C0
6E692074 6F6E2073 69203125 206E6961 6D6F6420 65685420 202E6E6F 69736E65 ension.  The domain X1 is not in 0000E0
706F6320 6F742053 45592073 73657250 20202E33 25206E6F 69736E65 6D696420  dimension X3.  Press YES to cop 000100
6F666562 20332520 6E6F6973 6E656D69 64206F74 20312520 6E696160 6F642079 y domain X1 to dimension X3 befo 000120
68746977 20322520 65747562 69727474 6120676E 69746169 636F7373 61206572 re associating attribute X2 with 000140
6169636F 73736120 6F74204F 4E207373 65725020 202E3125 206E6961 6D6F6420  domain X1.  Press NO to associa 000160
69736E65 6D696420 65687420 68746977 20322520 65747562 69727474 61206574 te attribute X2 with the dimensi 000180
28203125 206E6961 6D6F6420 736E776F 20796461 65726C61 20746168 74206E6F on that already owns domain X1 ( 0001A0
74612065 74616963 6F737361 206E6568 74206F74 20646E61 2029796E 61206669 if any) and to then associate at 0001C0
73657250 20202E31 25206E69 616D6F64 20687469 77203225 20657475 62697274 tribute X2 with domain X1.  Pres 0001E0

Dump of file SATURN:[PCCOMMON.DUMP.MSG]DAXFORM.MSG;1 on 18-APR-1990 10:53:59.60
File ID (984,33,0)   End of file block 4 / Allocated 4

Virtual block number 2 (00000002), 512 (0200) bytes

2E6D726F 66736E61 72742065 68742074 726F6261 206F7420 4C45434E 41432073 s CANCEL to abort the transform. 000000
20736920 32252065 74756269 72747461 20646574 63656C65 73206568 54490A0D ..IThe selected attribute X2 is  000020
2E6E6F69 736E656D 69642061 20687469 77206465 74616963 6F737361 20746F6E not associated with a dimension. 000040
636F7373 6120746F 6E207369 20746168 74206574 75626972 74746120 6E412020   An attribute that is not assoc 000060
20796C6E 6F206E61 63206E6F 69736E65 6D696420 61206874 69772064 65746169 iated with a dimension can only  000080
61687420 6E696160 6F64206E 61206874 69772064 65746169 636F7373 61206562 be associated with an domain tha 0000A0
5420202E 6C6F6F70 206E6961 6D6F6420 65657266 20656874 206E6920 73692074 t is in the free domain pool.  T 0000C0
20656572 66206568 74206E69 20746F6E 20736920 3125206E 6961606F 64206568 he domain X1 is not in the free  0000E0
64207970 6F63206F 7420484F 20737365 72502020 2E6C6F6F 70206E69 616D6F64 domain pool.  Press OK to copy d 000100
6C6F6F70 206E6961 6D6F6420 65657266 20656874 206F7420 3125206E 6961606F omain X1 to the free domain pool 000120
31252065 74756269 72747461 20676E69 74616963 6F737361 2065726F 66656220  before associating attribute X1 000140
74204C45 434E4143 20737365 72502020 2E322520 6E696160 6F642068 74697720  with domain X2.  Press CANCEL t 000160
6C657320 65685449 0A0D2E6D 726F6673 6E617274 20656874 2074726F 6261206F o abort the transform...IThe sel 000180
69636F73 73612074 6F6E2073 69203225 20657475 62697274 74612064 65746365 ected attribute X2 is not associ 0001A0
656C6573 20656854 20202E6E 6F69736E 656D6964 20612068 74697720 64657461 ated with a dimension.  The sele 0001C0
2064656E 776F2079 64616572 6C612073 69203125 206E6961 6D6F6420 64657463 cted domain X1 is already owned  0001E0
```

```
Dump of file SATURN:[PCCOMMON.DUMP.MSG]DAXFORM.MSG;1 on 18-APR-1990 10:53:59.60
File ID (984,33,0)   End of file block 4 / Allocated 4

Virtual block number 3 (00000003), 512 (0200) bytes

 74206574 75626972 74746120 6E412020 2E332520 6E6F6973 6E656069 64207962 by dimension %3.  An attribute t 000000
 206E6961 606F6420 61206874 69772064 65746169 636F7373 61207369 20746168 hat is associated with a domain  000020
 73756020 6E6F6973 6E656069 64206120 79622064 656E776F 20736920 74616874 that is owned by a dimension mus 000040
 64207461 68742068 74697720 64657461 69636F73 73612065 62206F73 6C612074 t also be associated with that d 000060
 74616963 6F737361 206F7420 53455920 73736572 5020202E 6E6F6973 6E656069 imension.  Press YES to associat 000080
 3325206E 6F69736E 65606964 20687469 77203225 20657475 62697274 74612065 e attribute %2 with dimension %3 0000A0
 25206574 75626972 74746120 64657461 69636F73 7361206E 65687420 646E6120  and then associated attribute % 0000C0
 63206F74 204F4E20 73736572 5020202E 3125206E 6961606F 64206874 69772032 2 with domain %1.  Press NO to c 0000E0
 6E69616D 6F642065 65726620 65687420 6F742031 25206E69 61606F64 2079706F opy domain %1 to the free domain 000100
 72747461 20657461 69636F73 7361206E 65687420 6F742064 6E61206C 6F6F7020  pool and to then associate attr 000120
 3125206E 6961606F 64206565 72662065 68742068 74697720 32252065 74756269 ibute %2 with the free domain %1 000140
 61727420 65687420 74726F62 61206F74 204C4543 4E414320 73736572 5020202E .  Press CANCEL to abort the tra 000160
 20312520 64656E6E 61687072 6F20676E 6974656C 6544490A 0D2E6D72 6F66736E nsform...[Deleting orphanned %1  000180
 74207069 68736E6F 6974616C 65722078 656C706D 6F632065 6854490A 0D2E3225 %2...[The complex relationship t 0001A0
 726F6673 6E617274 20796863 72617265 69682065 70797420 79746974 6E65206F o entity type hierarchy transfor 0001C0
 6C706D6F 63206120 7463656C 6573206F 7420756F 79207365 72697571 65722060 m requires you to select a compl 0001E0

Dump of file SATURN:[PCCOMMON.DUMP.MSG]DAXFORM.MSG;1 on 18-APR-1990 10:53:59.60
File ID (984,33,0)   End of file block 4 / Allocated 4

Virtual block number 4 (00000004), 512 (0200) bytes

 6F20726F 20657669 73756C63 6E692065 70797420 666F2820 74657320 70207865 ex p-set (of type inclusive-or o 000000
 20646574 616C6572 20736920 74616874 2029726F 20657669 73756C63 78652072 r exclusive-or) that is related  000020
 70797420 61206E69 20796461 65726C61 20746F6E 20736569 7469746E 65206F74 to entities not already in a typ 000040
 20676E69 74656560 20737465 73207020 6F4E2020 2E796863 72617265 69682065 e hierarchy.  No p-sets meeting  000060
 6C657320 796C746E 65727275 63206572 61206169 72657469 72632065 73656874 these criteria are currently sel 000080
 00000000 00000000 00000000 00000000 00000000 00000000 0A0D2E64 65746365 ected........................... 0000A0
 00000000 00000000 00000000 00000000 00000000 00000000 00000000 00000000 ................................ 0000C0
 00000000 00000000 00000000 00000000 00000000 00000000 00000000 00000000 ................................ 0000E0
 00000000 00000000 00000000 00000000 00000000 00000000 00000000 00000000 ................................ 000100
 00000000 00000000 00000000 00000000 00000000 00000000 00000000 00000000 ................................ 000120
 00000000 00000000 00000000 00000000 00000000 00000000 00000000 00000000 ................................ 000140
 00000000 00000000 00000000 00000000 00000000 00000000 00000000 00000000 ................................ 000160
 00000000 00000000 00000000 00000000 00000000 00000000 00000000 00000000 ................................ 000180
 00000000 00000000 00000000 00000000 00000000 00000000 00000000 00000000 ................................ 0001A0
 00000000 00000000 00000000 00000000 00000000 00000000 00000000 00000000 ................................ 0001C0
 00000000 00000000 00000000 00000000 00000000 00000000 00000000 00000000 ................................ 0001E0

Dump of file SATURN:[PCCOMMON.DUMP.PBIN]DBCREAT.EXE;1 on 18-APR-1990 10:54:18.91
File ID (366,6,0)   End of file block 27 / Allocated 28

Virtual block number 1 (00000001), 512 (0200) bytes

 00000001 00000040 00000000 CEF80000 0000FFFF 00000020 0000001B 002F5A4D MZ/..... .........%ö....a....... 000000
 00000400 00000000 00000000 00000000 00000000 00000000 00000000 00000000 ................................ 000020
 00000000 00000000 00000000 00000000 00000000 00000000 00000000 00000000 ................................ 000040
 00000000 00000000 00000000 00000000 00000000 00000000 00000000 00000000 ................................ 000060
 00000000 00000000 00000000 00000000 00000000 00000000 00000000 00000000 ................................ 000080
 00000000 00000000 00000000 00000000 00000000 00000000 00000000 00000000 ................................ 0000A0
 00000000 00000000 00000000 00000000 00000000 00000000 00000000 00000000 ................................ 0000C0
 00000000 00000000 00000000 00000000 00000000 00000000 00000000 00000000 ................................ 0000E0
 00000000 00000000 00000000 00000000 00000000 00000000 00000000 00000000 ................................ 000100
 00000000 00000000 00000000 00000000 00000000 00000000 00000000 00000000 ................................ 000120
 00000000 00000000 00000000 00000000 00000000 00000000 00000000 00000000 ................................ 000140
 00000000 00000000 00000000 00000000 00000000 00000000 00000000 00000000 ................................ 000160
 00000000 00000000 00000000 00000000 00000000 00000000 00000000 00000000 ................................ 000180
 00000000 00000000 00000000 00000000 00000000 00000000 00000000 00000000 ................................ 0001A0
 00000000 00000000 00000000 00000000 00000000 00000000 00000000 00000000 ................................ 0001C0
 00000000 00000000 00000000 00000000 00000000 00000000 00000000 00000000 ................................ 0001E0
```

```
Dump of file SATURN:[PCCOMMON.DUMP.PBIN]DBCREAT.EXE;1 on 18-APR-1990 10:54:18.91
File ID (366,6,0)   End of file block 27 / Allocated 28

Virtual block number 2 (00000002), 512 (0200) bytes

72502032 2F534F20 73657269 75716572 20606172 676F7270 20736968 540033E8 Ò3.This program requires OS/2 Pr 000000
4C018821 CD09B41F 0E5A240A 002E7265 67616E61 40206E6F 69746174 6E657365 esentation Manager...$Z..Ç.ë!.L 000020
00000000 00000000 00000000 00000000 00000000 00000000 00000000 000021CD ë!.............................. 000040
00000000 00000000 00000000 00000000 00000000 00000000 00000000 00000000 ................................ 000060
00000000 00000000 00000000 00000000 00000000 00000000 00000000 00000000 ................................ 000080
00000000 00000000 00000000 00000000 00000000 00000000 00000000 00000000 ................................ 0000A0
00000000 00000000 00000000 00000000 00000000 00000000 00000000 00000000 ................................ 0000C0
00000000 00000000 00000000 00000000 00000000 00000000 00000000 00000000 ................................ 0000E0
00000000 00000000 00000000 00000000 00000000 00000000 00000000 00000000 ................................ 000100
00000000 00000000 00000000 00000000 00000000 00000000 00000000 00000000 ................................ 000120
00000000 00000000 00000000 00000000 00000000 00000000 00000000 00000000 ................................ 000140
00000000 00000000 00000000 00000000 00000000 00000000 00000000 00000000 ................................ 000160
00000000 00000000 00000000 00000000 00000000 00000000 00000000 00000000 ................................ 000180
00000000 00000000 00000000 00000000 00000000 00000000 00000000 00000000 ................................ 0001A0
00000000 00000000 00000000 00000000 00000000 00000000 00000000 00000000 ................................ 0001C0
00000000 00000000 00000000 00000000 00000000 00000000 00000000 00000000 ................................ 0001E0

Dump of file SATURN:[PCCOMMON.DUMP.PBIN]DBCREAT.EXE;1 on 18-APR-1990 10:54:18.91
File ID (366,6,0)   End of file block 27 / Allocated 28

Virtual block number 3 (00000003), 512 (0200) bytes

00040003 00030000 000101A6 0A000000 0003020A 568C138A 0002009D 0505454E NE.........V........!........... 000000
00000000 00000000 00010000 00040000 0000049F 00680063 00580058 0040000F ..@.X.X.c.k..................... 000020
74616572 63626407 0A200F01 0875028A 02880E01 00000000 26560F00 2656004B K.V&..V&........ɑ.u... ..dbcreat 000040
53044950 415F5054 4E49414C 51530C41 4C515304 00002E00 25001300 01000000 .......X.....SQLA.SQLAINIP_API.S 000060
08000053 4C4E0353 4C4C4143 534F4408 4950415F 44455243 454C5153 0C454C51 QLE.SQLECRED_API.DOSCALLS.ÑLS... 000080
01067E83 D88EFFFF 8B1E5657 00004AC8 00000000 00455845 2E746165 72636264 dbcreat.EXE.....àJ..WV.ı...Ä.-.. 0000A0
0019E908 C4830037 05EE9A50 16864680 0477FF26 0677FF26 085EC400 1BE9037F ..Ö..é^.&.w.&.w..FÑ.P.Ÿ.7..é.Ö.. 0000C0
E9037F02 067E8304 C4830065 06249A50 16864680 04C48300 4405929A 0042681E .hB....D..é..FÑ.P.$.e..é..-....Ö 0000E0
50681E00 11E908C4 83007905 EE9A5016 E0468D08 77FF260A 77FF2608 5EC4001B ..é^.&.w.&.w..FÄ.P.Ÿ.y..é.Ö...h} 000100
46888646 8A0018E9 03743A87 7E80630E 46C608C4 83009E05 EE9A5016 E0468000 ..FÄ.P.Ÿ....é.6FÑc.-ñ:t.Ö...FÑ.F 000120
04C48300 D606A29A 50168646 8D08C483 00A805EE 9A501686 46805016 8B468D0E ß.Fı.P.FÑ.P.Ÿ.¨..é..FÑ.P.Ä.e..é. 000140
FF9A5052 FFFF8A00 0088006A 5016E046 8D007668 1E50E42A DE468A50 1686468D .FÑ.P.Fß*ÕP.hv..FÄ.Pj.ı..ɑ..RP.. 000160
02C8C8C9 5F5E1F08 C483FFFF 05929A00 77681E50 16864680 00E400EE 9A0000FF ....Ÿ.Ö..FÑ.P.hw.......é..^_èùÐ. 000180
E9037500 0E060826 000CA126 0768068E 0000FDFE 86C7D88E 0008881E 56570002 ..WV.ı...Äù.±»....h.&Ä..&....u.Ö 0001A0
FE008680 08C48301 6105929A 0099681E 000C36FF 26000E36 FF260768 068E007A z...h.&.6..&.6...h.....e..é....± 0001C0
FDFEBE83 FDFE8689 0000FFFF 9A505200 CABA0000 8800A968 1E006A02 00685016 .Ph..j..h`.ı..ɑð.RP.......±».f±» 0001E0

Dump of file SATURN:[PCCOMMON.DUMP.PBIN]DBCREAT.EXE;1 on 18-APR-1990 10:54:18.91
File ID (366,6,0)   End of file block 27 / Allocated 28

Virtual block number 4 (00000004), 512 (0200) bytes

0012E903 7F00FDFE 8E8306C4 83017005 929A0085 681EFDFE B6FF0010 E9037C00 .|.Ö...Ñ±».hç....)..é../±»...Ö.. 000000
C95F5E1F 02C48300 2803229A 016A08C4 83018705 929A0008 681E5016 FE008680 ...±.P.hÄ.......é.|..".(..é..^_è 000020
8C00E626 8900E226 89FC0001 EFE90000 00000000 00000000 00000000 000090C8 ù..................Öÿ..•.&ß..&!.. 000040
B8050AA3 E0865800 00FFFF9A 5016C488 5000DC1E 8900DEA3 00E00E89 4900E81E .Ö.1..Ä.Eß...É.P.é.P.....X.ÄE..1 000060
FF054136 FF01E407 1A9A01DF 01A29A01 2702989A 0048E800 00FFFF9A 501E050C ...P.....ÖK....'..Ä.Ô....ö..6A.. 000080
06C73600 03880202 03229A50 01E90000 9A053936 FF053836 FF053036 FF053F36 67..6=..6;..69....Ö.P."...!..6ú. 0000A0
7500050C 3E800000 8800E416 FF5000FF 88021807 069A0208 06CA9A50 032200E4 ö.".P.ð....ø...!..P..ö.E...>...u 0000C0
00308026 47017500 3080267F FF89000E 068EFF33 480004F4 06C63804 E806C608 .6.Ö.;ö.¶..K3...ß.¿..&.=.u.G&.=. 0000E0
05118F1F F788071E 062EE8E7 74AEF2C0 330874CA 88A6F3C8 88D18804 E88E4374 tC/ö..!.ûµ!.ðt.3ð·UtÓŠ.....X.e.. 000100
74C0FEAC 9198ACEE E8AAC20A 1172412C AC92E0D2 1972412C AC04B114 7500F883 .«.u.Ÿ.¯,Ar.@Ä.¯,Ar..ö¯ŠŸ¯..¯±ßt 000120
0000FFFF 9A521650 1653C488 50870511 A780D488 5200028B C31F16F7 E2AA4801 .N¨ßX..ûE..R.å.I..ÑP.åS.P.R..... 000140
8B5050C0 335A0479 4805118F 08088106 7500023D 07740001 30408112 7558C008 .ðXu.Ÿa=..t.=..u.Ÿ.....Kyå23åPP. 000160
DA8C075C 06C5000E 368829E3 075A0E88 58580000 FFFF9A53 16520E02 0A8A50DC ÉPɑ...R.S.....XX..Z.Ð).6Ñ.é.\..ö 000180
8E1F1607 581EFF36 00038B0A 8C076006 C53603F0 E91F1605 7307581E FF360833 3Ü6..X.s...ðÞ.6é.'..ÖE..6..X.../ 0001A0
648E0052 E80A128F 0A128EEC 8855C800 5FE80764 8F07648E 0068E807 648F0764 d.ed.Öh./d.ed.Ö_.ÜU.$/..e..ÖR./d 0001C0
F49A0032 E807688F 07688E00 38E80768 8F07688E EC885503 E80049E8 07688F07 .eh.Ö1.Š.U.$/h.ēh.Ö;./h.eh.Ö2..¶ 0001E0
```

```
Dump of file SATURN:[PCCOMMON.DUMP.PBIN]DBCREAT.EXE;1 on 18-APR-1990 10:54:18.91
File ID (366,6,0)   End of file block 27 / Allocated 28

Virtual block number 5 (00000005), 512 (0200) bytes

 FFFF9A50 06468A50 0001B800 0DE800FF 0646C705 7500067E 830B74C0 08021D06 ....åt..~..u.úF...Ô..|..P.F.P... 000000
 1DFFF274 02450805 8804EF83 0E73F738 C307581E FF000288 07E3075A 0E880000 ....Z.D.E....X.û;%s..ÿ....E.t .. 000020
 8936F775 00FF7C80 06744EF0 8800DE1E 8E000CA1 054E068F 054C068F 00C3EEEB ŠYü...L...N.ÀE...ß..ÞNt..|..u%6. 000040
 ACFA75C0 0A42AC00 01BFD233 054A3689 36960175 FF04F696 05451E8C 36054336 6C.6..E..-..u..6.6J.3©¢.. B.åu°¯ 000060
 3C247422 3C5474C0 0AE87409 3CEC7420 3CAC4E47 6374C00A F774093C FB74203C < t«<.t%.åtcGN¯< t§<.tÒ.åtT<"t$< 000080
 CE7501A8 D113E9D1 C188D7E8 D1030474 223CFA74 5C3CAC41 C933E8EB 4203745C \t.BŠÒ3èA¯<\t'<"t..1Š¤.è1Ò.1´.uö 0000A0
 03047422 3CFA745C 3CAC41C9 33F0E842 03745C3C C274223C 2774C00A AC4E01EB Š.N¯.åt'<"tô<\t.BŠÞ3èA¯<\t'<"t.. 0000C0
 C788E7D1 E7D147D7 03D70305 393E891F 169FE806 7501A8D1 13E9D1C1 88DFE8D1 1ŠÒ.è1Ò.1´.uø$....>9..¤.¤G1Ò1Ò.ú 0000E0
 3F893607 16F80308 8805301E 8C0538A3 FD84E900 08880673 0384E8FE 2440C203 .ö@$±ÒÇ.s.|..ÕÇ»Ê;...=..Å.½..6.? 000100
 74203CAC AAC03303 EBFA75C0 0AAAAC4E A400DE1E 8E054A36 8804C383 02578C36 6.W..û..6J...ß.ÊN¯¯.åu°Š.3å¯¯< t 000120
 3CDA7420 3CAC4EAA D78804C3 8302578C 363F8936 0081E903 75C00AF7 74093CF8 «<.t%.Àu.Õ..6.76.W..û..¤ N¯< tÖ< 000140
 5C800674 223CFA74 5C3CAC41 C933E8EB AA03745C 3C267422 3C6374C0 0AD67409 .t¤.åtc<"t&<\t.¯ŠÒ3èA¯<\t'<"t.¯\ 000160
 2A74C00A AC4ED787 4FAA2280 D78746C9 E8AA2280 0573AAF3 E9D15C80 D5E8AAF3 µ¯Š1¯\1Ö¤¯s.¯"¯ŠèF.¤¯"¯O.¤N¯.åt° 000180
 D15C8005 E8AAF35C 80067422 3CFA745C 3CAC41C9 33F0E8AA 03745C3C B674223C <"tÑ<\t.¯ŠÞ3èA¯<\t'<"t.¯\µ¯Š1¯\1 0001A0
 75C08503 5121889A 00000247 C7000007 C71F16AA C033C7E8 AA228095 73AAF3E9 Õµ¯s.¯"¯Šú3å¯..ú...úG.....!0..åu 0001C0
 7400087E 83064EC4 FE468D00 248A0552 88500001 88EC8855 FF22E905 4C2EFF04 ...L.Õ".U.Š|..PER.¤$..F±åN..-..t 0001E0

Dump of file SATURN:[PCCOMMON.DUMP.PBIN]DBCREAT.EXE;1 on 18-APR-1990 10:54:18.91
File ID (366,6,0)   End of file block 27 / Allocated 28

Virtual block number 6 (00000006), 512 (0200) bytes

 0000FFFF 9A5050C0 33501652 531E5100 1089511E 00010550 06C70550 89510621 |.Q¿P.ú.P....Q¿..Q.SR.P3ÂPP..... 000000
 E58899C0 33037493 C085DA8C 0017C381 0000FFFF 9A501652 531E0550 36FF0EE8 Š..6P..SR.P......Û...Ö.å.t.3å..| 000020
 9AF676FF 1EFC568C FA46890A 468DF85E 8CF64689 058A8856 0CEC83EC 8855C85D }ÙU.Š.Š.V|...F-.^%.F..F°.V=..v-. 000040
 05E00AD8 9AF676FF F876FF06 76FF0876 FFFA76FF FC76FFF0 8804C483 05CE094A J.ö..å..Þ.v=.v°.v...v...v%.v-.Å.Å. 000060
 885590C8 5DE5885E F4468806 C4830528 0A2C9A56 F676FFF8 76FFF446 890CC483 .å..F¶.v%.v-V.,.+..å..F¶^.|}ù.U. 000080
 7401A8C7 88067EC4 D1F7AEF2 FFFF89C0 33C08ED8 8CFE880A 76C51EDE 88D788EC Š.¤.B.év..±.Å.å3å¿.. Ù%16-..ú .t 0000A0
 56880646 885606EC 83EC8855 C85DC28C 1FFA88F3 88A4F3C9 13A5F3E9 D149A402 .É11ÒµÉ.èµÉ.µ.°..Ö}ÙU.Š.Š.V.F..V 0000C0
 0DE8E42A 078A2605 80068E05 7E06FF05 7E1E8813 7805820E FFFE5689 FC468908 ..F=.V±....x...~...~.....å..°ÕŠ, 0000E0
 39085688 06468825 75FFFE83 1A740AFE 83F08804 C48305B2 084E9A50 1E057E88 |~..P.M.ÿ..å..Þ.±.t..±.uX.F..V.9 000100
 5EC4900F E8085688 06468800 07C626FC 5EC41EE8 99C02805 75FE5639 0A75FC46 F=u.9V±u.+å.Š.å^=&å...F..V.Š..å^ 000120
 C00A078A D388065E C5D98CEC 885590C8 5DE5885E 909CE8FC 46FF0788 26C688FC ¤.6&...F¤Š..^.|}ù.U.Š.1é^..ß...å 000140
 00FC88EC 8855C85D D98EDA8C 92EF75C0 0A078A43 07884104 04731A3C 612C1174 t.,¤<.s..A..C...åuÿ..Ö.1}ÙU.Š|¤. 000160
 0288C85D E5880604 07D69A50 00FF8805 761EFF04 74000578 3E830658 07D69A50 P.¤.X..>x..t...v.|..P.¤.Å..|}ù|. 000180
 50000188 06E806CA 9A117455 F480F8E2 E032ACFC E4320042 89F63356 F820E900 .Õ «V3-¿B.2Õ=¯2Åå«.¶Ut..Ò.Ò.|..P 0001A0
 26FFFFB9 FF33F633 C033000E 068E057C 068F057A 068FC85E 00018807 0A07D69A .¤...|..^ù..z...|...ß.3å3-3.¿..& 0001C0
 00098806 7300C1E8 C603E601 E6D1FE88 FE2440C7 8846FA75 AE46AEF2 0674053A :.t.·ÚFÛu°F.ú@$±.±|||.6Òé.s.|.. 0001E0

Dump of file SATURN:[PCCOMMON.DUMP.PBIN]DBCREAT.EXE;1 on 18-APR-1990 10:54:18.91
File ID (366,6,0)   End of file block 27 / Allocated 28

Virtual block number 7 (00000007), 512 (0200) bytes

 06382604 8820E349 0716F633 1F06D888 FE03F888 CF880541 168C053F A3FAC1E9 Õè°Ê?...A..Ü.%.±.Å..3-..1Ò+..&;. 000000
 AAAC04C3 8302578C 263F8926 0A74595E 5FA7F300 068904E8 BF575651 107504E8 Ò.u.QVWèÒ.¿..µ|_^Yt.&.?&.V..Û.¯¯ 000020
 D88E00F6 885756EC 88550005 7A2EFF07 161F1602 4F89260F 892605E2 FA75C00A .åu°å1&..&.O......±..U.$VW|-..Å 000040
 5E5F96EB EBF788AE F2FFFF89 C033970C 74964010 74C238AD 07788E06 5688C08E .å.V.ƒx.Û;Òt.ß.t..3å¿..·Û.%ŠŠ._^ 000060
 AEF2FFFF 89C033FA 88921F74 C0080713 07A69A06 76FF57EC 88550002 CA50E588 .||Þ..U.ŠW.v..|....åt...°3å¿..¯0 000080
 E61E885A 0002CA50 E5885F58 0000FFFF 9A501651 521E5300 0288C488 50490117 %||P.åE..S.RQ.P.....[_.||Þ..Z..| 0000A0
 490C7558 C0850000 FFFF9A1E 5150410F C98049C8 88197200 E01E3826 72080300 ..År&;.Å.r..Ù1.è.APQ.¯......¯Xu.| 0000C0
 885500E2 FFC388E3 88027207 121E3808 7208280C 880EE8F8 00E61E87 00E00E89 ..Å...|.%Š..É+År.;...r..D.Ù.¯.U. 0000E0
 C4FE4689 066E05E0 D1C103E0 D1C888F9 F7000CB9 99057E2D 06468856 02EC83EC &.&.V.F.--..¿..%°.å1Å.è1Å.n...¿å 000100
 0874020A 47F62606 5EC4008F E9FFFF88 0674400A 47F62607 74830A47 F626065E ^.&-G..t.&-G.@t.|..Ò¢.å^.&-G..t. 000120
 20C38827 750C0A47 F626065E 88F82780 FE5E8801 0A4F8026 90E9E820 0A4F8026 &.O. ŠÕ.&.O...^±.'«.^.&-G..u'.ù· 000140
 C4830E70 E80676FF 06007501 066E87F6 E3D1D803 E3D1D888 F9F7000C 8999057E ~..¿..%°.Å1D.Å1D-.n..u. .v.Òp..å 000160
 26065EC4 0277FFFE 5E880257 89260789 26085788 26064788 26065EC4 9013E804 .Š..å^.&.G.&.V.&..&.W..·.·.w.å^.& 000180
 74C00804 47892606 5EC408C4 8307E018 5C9A50E4 2A08478A 260677FF 260877FF .w.&.w.&.G.°ÕP.\.Å..å.å^..,G..åt 0001A0
 4FE90000 0447C726 0A470826 10809003 E8208005 7400047F 83261C75 FFFF3005 .=..u.&....t.¯ Š..¯.&.G.&ÙG...Õo 0001C0
 04EC83EC 8855C85D E5885EE4 2A048A26 02478E26 07FF2637 8826044F FF2690FF ..&.O.&.7&..&.G.&..°Õ^.|}ÙU.Š.Š. 0001E0
```

Dump of file SATURN:[PCCOMMON.DUMP.PBIN]DBCREAT.EXE;1 on 18-APR-1990 10:54:18.91
File ID (366,6,0)    End of file block 27 / Allocated 28

Virtual block number 8 (00000008), 512 (0200) bytes

```
75059606 7E8113E8 0000FE46 C7077509 74087E81 0E75058A 067E8107 1406FF56 000000
000C8999 057E2DC3 881A750C 0A47F626 065EC400 01FE46C7 297507AC 087E8130 000020
81E60302 81FE7688 90900081 E9C02807 7401066E 87F6E3D1 D803E3D1 D888F9F7 000040
88D27400 08025489 048902C4 830A6819 859A5002 00881575 02440804 8806EAC6 000060
D1FE7688 065EC4FC 4689066E 05E0D1C1 03E0D1C8 88F9F700 0C899905 7E200646 000080
020088FC 76880257 89260789 26085789 26064789 2606EC94 8806EA84 88E6D1E6 0000A0
83EC8855 C850E588 5E000188 020A4F80 26065E88 1107C60E 88044789 26024489 0000C0
83FE5E8C FC468906 6E05E0D1 C103E0D1 C888F9F7 000C8999 057E2D08 468804EC 0000E0
02C4830A 7D1AE69A 50E42A08 478A2608 5EC47574 1007F626 FC5EC451 7400067E 000100
C4000002 47C72600 07C626FC 5EC404C4 830A8C17 CC9A0876 FF0A76FF 5F74C008 000120
C4247410 07F626FC 5EC42DE8 08578926 06478926 02578926 07892699 C028085E 000140
090117CC 9A0876FF 0A76FF0E 74C00802 C4830ACE 1AE69A50 E42A0847 8A26085E 000160
0E468808 A41E8C08 A2A308A8 8809C115 929A000A 88EC8855 90C85DE5 8804C483 000180
9C06C700 00089E06 C7087A16 890878A3 08568806 46880894 16890892 A3105688 0001A0
089AA308 7EA30882 A3C02800 0108A006 C7031BE9 037425F6 7E800390 E9000008 0001C0
30017F80 260A5EC4 00200A08 06C70890 A30876A3 087CA308 96A30898 A30880A3 0001E0
```

Dump of file SATURN:[PCCOMMON.DUMP.PBIN]DBCREAT.EXE;1 on 18-APR-1990 10:54:18.91
File ID (366,6,0)    End of file block 27 / Allocated 28

Virtual block number 9 (00000009), 512 (0200) bytes

```
00089606 C7088206 FF0D7528 3F80260A 5E88903E E800300A 0806C70A 46FF4975 000000
5EC40DE8 087606FF 9014E808 9606FF1A 75000882 3E830E75 203F8026 9028E800 000020
75C00802 C48309AA E80E5098 078A260A 5E880A46 FF089006 FFC77520 3F80260A 000040
0C7D0008 A63E830C 56890A46 8908C483 08F2E80E 501E08A6 880A76FF 0C76FFD0 000060
00200A08 06C70675 300A083E 83007400 08903E83 08A6A308 F708A6A1 089006FF 000080
08C48308 A5E80E50 1E08A088 0A76FF06 0A46FF08 9806FF2E 752E3F80 260A5EC4 0000A0
46309807 8A260A5E C408980E FF000108 A006C70A 700008A0 3E830C56 890A4689 0000C0
C4097500 08803E83 00020880 06C70675 006C3028 74006830 4074004E 3030740 0000E0
08E80001 088006C7 90025CE9 1C75003F 80260A5E C40A46FF 03754C3F 80260A5E 000100
74004730 0A740045 30F84689 98078A26 C8E80008 088006C7 00E80010 088006C7 000120
03750063 30019FE9 037E7874 00693DF8 468820F8 4683087E 06FF0875 00583005 000140
2608921E C4157502 08803E83 900167E9 014CE903 7500253D 0160E903 7E0149E9 000160
92068307 8926089C A11FC426 08921EC4 0DE80000 0247C726 07892608 9CA11FC4 000180
75200A47 F6260878 1EC401C8 E9037400 089C3E83 017EE903 7500089E 3E830408 0001A0
E802C483 01ACE80E 50000A88 00000876 06C7089A 06FF01BA E9FFFF88 0180E903 0001C0
75080880 3E830004 08A006C7 089806FF 087E06FF 087C06FF 90F0E800 088890C1 0001E0
```

Dump of file SATURN:[PCCOMMON.DUMP.PBIN]DBCREAT.EXE;1 on 18-APR-1990 10:54:18.91
File ID (366,6,0)    End of file block 27 / Allocated 28

Virtual block number 10 (0000000A), 512 (0200) bytes

```
83FA4689 08A6A128 7408A606 39FA4689 0880A3C0 2B7E7401 08803E83 0085E903 000000
A6A3C028 027DC008 08A6A105 08A62E83 909013E8 000008A6 06C70A74 0008903E 000020
00FA7E83 02C48304 A1E80E50 003A8802 C483013A E80E5000 10880208 92068308 000040
06C79007 E808A6A3 C028027D C00808A6 A300052D FA468815 74000890 3E832274 000060
E9001088 FF06E902 08920683 02C48300 F7E80E50 00108804 08922E83 000008A6 000080
50002588 FF20E903 55E80EF8 76FF90F3 E8000188 FF30E902 77E80E50 C028FF35 0000A0
74000880 3E83087E 00673005 7C006530 FEFEE903 75006430 90FF15E9 0436E80E 0000C0
E9037500 6E30903A E8FE5689 FC468940 0C56880A 46880A4E FF0C5688 0A468809 0000E0
30FEA8E9 03750075 30887400 733DFED6 E9037500 703DFED8 E9037500 6F3DFE72 000100
0474C00A F6468807 8A26FC5E C4FC46FF 9034E80A 46FF9081 E8FF75E9 03750078 000120
0A4689FE 568BFC46 8806C483 045EE80E 0A76FF0C 76FF500A 4628C388 EC75253C 000140
43E90374 200A47F6 2608781E C4FC53E9 0374C00A F6468807 8A260A5E C40C5689 000160
067E8300 200A0806 C7067400 08983E83 565712EC 83EC8855 C850E588 089CA1FE 000180
02578826 07882608 921EC419 75100880 3E830774 0208803E 83089A06 FF04740A 0001A0
C7FC4689 07882608 921EC411 7400089A 3E83902C E8040892 0683FE56 89FC4689 0001C0
0E740008 763E8302 08920683 FE5689FC 46899907 88260892 1EC40EE8 0000FE46 0001E0
```

```
Dump of file SATURN:[PCCOMMON.DUMP.PBIN]DBCREAT.EXE;1 on 18-APR-1990 10:54:18.91
File ID (366,6,0)   End of file block 27 / Allocated 28

Virtual block number 11 (0000000B), 512 (0200) bytes

 F45689F2 468908A4 168808A2 A10A06A3 C0289003 EB06468B 0674FE46 08FC4688 .F..F.t..F.Š..+àÈ..ÀÀ...È..F .V¶ 000000
 FC46882D 07C626F2 46FFF25E C41D750A 067E832B 7D00FE7E 83317500 089A3E83 .>...u1.-..)+.~..u.6^..F.&6.-.F. 000020
 08848800 00F646C7 9006E800 01F646C7 FE5689FC 46890AF7 00028308 F7FE568B .V.%À.@.%Ö.F..V.úF-..Š..úF-..|.. 000040
 45740008 983E830A C4830F09 1ADC9AFC 76FFFE76 FF501E06 76FFFA5E 8CF84689 .F%.^..v..P.v..v..È.)..6..>...tE 000060
 080A063E 830D7EC9 08F04E89 C82B08A0 0E8804C4 830AE11A 9A9AF876 FFFA76FF .v..v%...Ä..6.....+à.Nb.è-..>... 000080
 8CF27E89 F47FC008 49C18847 3005C626 05E8F27E C4F04E88 00000A06 06C70675 u.ú......Nb6--Š.&6.0G.èl.6.¶.- . 0000A0
 80037C61 3C0774C9 08048807 8A26F85E C4F276C5 EE5E8C08 7E0E8BF0 4E89F446 F¶.Nb..-..^Yév·6^%&.....èt.<a|.. 0000C0
 080882A1 14750008 9A3E83EE 5E8EF45E 8CF27689 E375003F 8026F846 FF46202C , F.F%&.?.u0.v·.^¶.^Y.>...u.À... 0000E0
 C850E588 5F5E02C4 830311E8 0E50C028 02E80001 88057500 F67E8308 74089606 ...t..~-.u.|..Š.+àP.Ò...6.^_.||ù 000100
 0683FA56 89F84689 08941688 0892A100 018E1874 00067E83 565710EC 83EC8855 U.&.&.WV.-..t./..À.......F%.V... 000120
 10E8FA56 89F84689 02578826 07882608 921EC413 74080880 3E83008F E9020892 ...Ö...>...t.6...&..&.W..F%.V.Š. 000140
 08F84688 0E740808 803E8304 08920683 FA5E8CF8 4689FC46 89078826 08921EC4 6...&...F=.F%.^.......>...t..F%. 000160
 89FA5688 F8468BFA 5E8CF846 8906F988 097500FC 7E83900A E806F288 1575FA46 F.u.|·.Š...~..u.|..F%.^..F%.V.. 000180
 1574003F 8026F246 FFF25EC4 900EE808 A00E881C 74089836 39F628F4 5689F246 F·.V¶+-96..t.....Š..6^·.F·&.?.t. 0001A0
 0008903E 83FE2808 A63E88F3 75003F80 26F246FF F25EC446 90EDE810 7ECE3846 F;ö-.ŠÚ.F6^·.F·&.?.u..>Ï.+..>... 0001C0
 57087400 08903E83 06C48301 8DE80EF8 76FFFA76 FF5602C4 83015FE8 0E570875 u.V.Ò_..6.V.v..v%.Ò§..6..>...t.W 0001E0

Dump of file SATURN:[PCCOMMON.DUMP.PBIN]DBCREAT.EXE;1 on 18-APR-1990 10:54:18.91
File ID (366,6,0)   End of file block 27 / Allocated 28

Virtual block number 12 (0000000C), 512 (0200) bytes

 5689FC46 89089416 880892A1 06EC83EC 885590C8 50E5885F 5E02C483 0142E80E .Ò8..6.^_.||ù.U.&.&.À....  .F..V 000000
 06C70675 0008983E 83FA4688 C02A9003 E8018005 7547067E 83067467 067E83FE ..-.gt..~.Gu.¯.Š..*à.F..>.. .u.ú. 000020
 FF08A036 FF087E36 FF000108 A006C706 750008A0 3E830D74 00FA7E80 000608A0 .....-..t..>...u.ú......6~..  .. 000040
 00FA7E80 0EC48307 161EFF26 076A068E FC76FFFE 76FF08A2 36FF08A4 36FF0676 v..6È..6À..v..v...j.&.....6..-.. 000060
 763E8304 C483071A 1EFF2607 6A068E08 A236FF08 A436FF14 75000876 3E831874 t..>v..u..6È..6À...j.&.....6..>v 000080
 8304C483 07221EFF 26076A06 8E08A236 FF08A436 FF147500 08A03E83 18740008 ..t..>...u..6È..6À...j.&..".6.. 0000A0
 1EFF2607 6A068EFC 76FFFE76 FF187408 96060808 82A10000 0A0606C7 08089206 ....ú.....À......t..v..v...j.&.. 0000C0
 3E8356EC 885590C8 50E58801 33E80E50 C02802E8 00018805 74C00804 C4830726 &..6..8t.|..Š.+àP.Ò3..||ù.U.&V.> 0000E0
 2A048826 02478E26 07FF2637 88260646 8A157804 4FFF2608 781EC430 7500089E ...u=6.x.&.0.x..F.&.7&..&.G.&..* 000100
 06FF9005 E8089E06 FF077540 06C48312 8D15869A 0676FF53 087A36FF 9011E8E4 ðŠ...6z.S.v..Ñ.§..6.ðu.....Š.... 000120
 36FF18E8 507EF608 06768857 7500089E 3E835657 02EC83EC 885590C8 505E089C ..^Jù.U.&.&.WV.>...uW.v..--PŠ..6 000140
 1E7EC008 4EC68808 9E06FF04 754006C4 83132915 869A0A08 36FF0878 36FF087A z..6x..6...Ñ.)..6.ðu......6N.6-. 000160
 3E8304E8 E42A0588 2602478E 2607FF26 3F88260A 08A00478 044FFF26 08781EC4 6.x.&.0.x6...&.7&..&.G.&..*ðŠ6.> 000180
 9E3E830A 76885657 02EC83EC 8855C850 E5885F5E 089C0601 06468807 7500089E ...u..F.....^_.||ùW.&.&.WV.v..>. 0001A0
 754006C4 83139F15 869A5098 078A2606 5EC40878 36FF087A 36FF22E8 5E750008 ..u^Š".6z..6x.6^.&...P.Ñ....6.ðu 0001C0
 C4078A26 065EC4CD 78044FFF 2608781E C42574C0 084EC688 0646FF08 9E06FF04 ......F..6N.&t%6.x.&.0.xë6^.&..6 0001E0

Dump of file SATURN:[PCCOMMON.DUMP.PBIN]DBCREAT.EXE;1 on 18-APR-1990 10:54:18.91
File ID (366,6,0)   End of file block 27 / Allocated 28

Virtual block number 13 (0000000D), 512 (0200) bytes

 06010A46 88077500 089E3E83 CAE8E42A 05882602 478E2607 FF263F88 2608781E .x.&.7&..&.G.&..*ðŠð.>...u..F... 000000
 4689C028 F65689F4 468908A4 168808A2 A1560CEC 83EC8855 C850E588 5F5E089C ..^_.||ùU.&.&.VÀÀ...È..F¶.V-+&.F 000020
 0A063E83 067628F0 28F84689 04C4830F C41A9A9A F476FF52 08A63688 FA4689FC ..F¯.6|.R.v¶...6..6..F%+b+v..>.. 000040
 1975203F 8026F45E C4227500 08903E83 4E017508 0A063E83 08E802EE 83057510 .u..Y.Š..>...u.N.>...u"6^¶&.?-u. 000060
 0874300A 083E83F8 4EFF02C4 83FE67E8 0E509807 8A26F446 FF127530 0A083E83 .>..0u..F¶&...P.Òg..6..N%.>..0t. 000080
 FF077400 0A063E83 0068E80E FA46FF07 7400067E 83187400 08903E83 077EF608 .-~..>...t..-..t..F..Òh..>...t.. 0000A0
 7500FA7E 830A7400 067E8302 C483FE74 E80E5629 75000890 3E830072 E80EFC46 F..Òr..>...u)V.Òt..6..~..t..-..u 0000C0
 0EF476FF F676FFF8 76FF0042 E80E0475 00FC7E83 0A74000A 063E8300 38E80E04 ..Ò;..>...t..-..u..Ò8..v%.v-.v¶. 0000E0
 C850E588 5E02C483 FE2EE80E 5600200A 0806C70E 74000890 3E8306C4 83FEAFE8 Ò..6..>...t.ú... .V.Ò...6.^.||ù 000100
 FD8AE80E 50003088 C802C483 FDC6E80E 50002088 03E8002B 88057400 08823E83 .>...t.|+.Š.| .P.Ò6».6.ú|0.P.Ò». 000120
 C483FD9C E80E5000 788803E8 00588805 7400087E 3E831775 100A063E 8302C483 .6..>...u..>-..t.|X.Š.|x.P.Ò.=.6 000140
 83378826 08921EC4 12752A3F 80260A5E C40001FE 46C75657 06EC83EC 8855C802 .ÙU.&.&.WVúF...6^.&.?*u.6...&.7. 000160
 0A5E88F6 280A46FF FFFFFE46 C7087520 3F80260A 5EC49061 E80A46FF 02089206 .....F.Šo.6^.&.?-u.úF....F.+-.^. 000180
 F8880030 0A0806C7 0675303C 0A750898 36393C7F 393C407C 303CFA46 88078A26 &...F.<0|ð<9.<96..u.<0u.ú...0..« 0001A0
 802647F1 8830E983 C803E1D1 CE03E1D1 E1D1CE88 98058A26 1C7F3930 802606E8 Š.&.=9..&....õ1Å1Å.õ1Å.à.Ò0.þG&. 0001C0
 885F5E0C 56880A46 88378926 065EC4F0 8BEEF7FE 46880C46 8C0A7E89 0E7D303D =0)8.-..F..F.%Y.þ6^.&.7.F..V.^_. 0001E0
```

Dump of file SATURN:[PCCOMMON.DUMP.PBIN]DBCREAT.EXE;1 on 18-APR-1990 10:54:18.91
File ID (366,6,0) End of file block 27 / Allocated 28

Virtual block number 14 (0000000E), 512 (0200) bytes

```
30802647 01EBFC7E C4064E8A FE5EBCFC 46890700 8B5704EC 83EC8B55 90CB50E5 []ù.U.$.$.W|...F•.^±.N.ó-•$.GR.= 000000
50E5885F C02BFE46 8CFC7E89 9009E8FE 468CFC7E 89000188 F4750038 26117400 .t.&8.u¶|...-•.F±$...-•.F±•â_.[] 000020
E9C03305 7540070E A15152C8 5152E388 05720712 1E380872 0828DC88 5A5990CB ù.YZ.É+Ár.;...r..DRQùRQÀ..âu.3âõ 000040
99057E2D C388FA46 89E42A08 478A2608 5EC45657 08EC83EC 8855070E 2EFFEC62 b$....U.$.$.UVá^.&.G.*ô.F•.ù-~.. 000060
74400A47 F6260774 830A47F6 26F84689 066E05E0 D1C103E0 D1C888F9 F7000C89 ¿..%•.àìÁ.éìÁ.n..FY&-G..t.&-G.ât 000080
26200A4F 80260E74 010A47F6 26085EC4 900139E9 FFFF8820 0A4F8026 085EC40F .ó^.&.O. |..ô9..ó^.&-G..t.&.O. & 0000A0
47F626FC 7689F088 04478926 C028EF0A 67802602 0A4F8026 90E2E800 000447C7 úG...$ã.&.O..&.g.ÿ•â&.G..Þ.v•&-G 0000C0
7E813775 01066E87 F6E3D1D8 03E3D1D8 88F9F700 0CB99905 7E20C388 51750C0A ..uO.ù-~..¿..%•.ÀID.ÀID-.n..u7.- 0000E0
1AE69AFA 76FF0F75 095F0A7E 81167505 96087E81 0E741666 0A7E8107 75058A08 ...u..-.f.t..-...u..-...u..v•.|. 000100
881A7508 0A47F626 085EC404 C483008C E80876FF 0A76FF0C 75C00802 C483160E ñ..ó..âu..v..v.ÒV..ó.ó^.&-^..u.. 000120
26378826 085E8869 7401066E 87F6E301 D803E301 D888F9F7 000C8999 057E20C3 ù-~..¿..%•.ÀID.ÀID-.n. t|. &.7& 000140
F6080447 89264802 4588F87E 88025789 26078926 40085788 26064788 26067728 +w.&.G.&.W.a&..&.W..-½. H&.. .- 000160
20051187 F6FA5E88 18EBFC46 8908C483 16FE1CFA 9AFA76FF 0677FF26 5256167E ~.VR&.w..v•.•.±..ó..F•$..^•-... 000180
07882606 468A065F C426085E C408C483 17231C8C 9A535050 C0285000 02881174 t.|..P+âPPS.V.#..ó.ó^.&ó..F.&.. 0001A0
0374FC76 39FC4689 08C48325 401CFA9A FA76FF50 1606468D 50C68800 018E19E8 $./...óP.F..P.v•.•.â%.ó..F•9v•t. 0001C0
8999057E 20044688 071406FF 04EC83EC 8855C850 E5885F5E E42A0646 8AFE8EE9 Õ/±.F.*ô^_.[]ùU.$.$......F.-~..¿ 0001E0
```

Dump of file SATURN:[PCCOMMON.DUMP.PBIN]DBCREAT.EXE;1 on 18-APR-1990 10:54:18.91
File ID (366,6,0) End of file block 27 / Allocated 28

Virtual block number 15 (0000000F), 512 (0200) bytes

```
C4831670 19859A50 020088FE 5E8CFC46 89066E05 E001C103 E001C888 F9F7000C ..%•.à|Á.é|Á.n..F•.^±|..P.ç.p..ó 000000
20E80200 0247C726 FC5EC408 0A4F8026 10740008 08578926 06478926 045EC402 .ó^.&.G.&.W..Át.&.O..ó^•&úG...$ 000020
00010247 C726FC5E C4085789 26064789 2640FE56 88FC4688 040A4F80 26045EC4 ó^.&.O...F•.V±â&.G.&.W.ó^•&úG... 000040
83EC8855 C350E588 00000447 C7260257 89260789 26085788 26064788 26045EC4 ó^.&.G.&.W.&..&.W.&úG....[]ùU.$. 000060
8999057E 20C3881A 75080A47 F6265A75 023C0324 0A478A26 065EC4F6 285604EC $.V+-ó^.&.G.$.<.uZ&-G..u..ù-~..¿ 000080
FC468906 47282607 8826065E 88397401 066E87F6 E3D1D803 E3D1D888 F9F7000C ..%•.ÀID.ÀID-.n..t9.^.&..&+G..F• 0000A0
74FC4638 08C48317 6C1CFA9A 50E42A08 478A2606 77FF2608 77FF2650 287EC008 .ó-(P&.w.&.w.&.G.*ôP.•.|..ó.;F•t 0000C0
C7260257 89260789 26085788 26064788 26065EC4 FFFF8E20 0A4F8026 065EC408 .ó^.&.O. /..ó^.&.G.&.W.&..&.W.&ù 0000E0
0C4E883F 73050F1E 38065E88 C03308EC 83EC8855 90CB50E5 885EC688 00000447 G....ó^.[]ù.U.$.&.3â.^.;...s?.N. 000100
740A3C05 25878A10 74080511 87F6087E C40C4E88 D2335745 75020511 87F64CE3 DL-....uEW3O.N.ó-.-....t...X.<.t 000120
E900098A 0674C008 5F0000FF FF9A5016 FA468D51 5706530A 052587C6 4942AA08 .^B|ó.X..S.WQ.F•.P......_.ât.□..Õ 000140
FE880876 C5071E57 56F80511 A780C850 E5880475 80051187 F6C203FA 4688037A ±..F•.ó-.....u..[]ù.[..«V̄W..év..± 000160
0205118F 80260875 1A3C1E74 C43AAC04 05118F80 2606750A 3C800084 28E3C888 .àD(Ç..<.u.&.....¯:ât.<.u.&..... 000180
E2E8E774 0A3C8007 7401F983 C850E588 5E5F1F06 08462BC7 88EAE247 058805E8 $...Gãõ.ù+F....^.[]ù.•.t..<.tÕ$$ 0001A0
74C00800 0018A39A 5016FA46 8D515016 F9468053 1C750808 24744005 1187F626 &-...ât$.Ûu.S.F•.PQ.F•.P.È....ât 0001C0
0019299A 5016FA46 8D515016 F9468053 00F946C6 86E80A80 0303E95E 5F1F0607 ..._^Õ..¯.$ÑóF•.S.F•.PQ.F•.P.).. 0001E0
```

Dump of file SATURN:[PCCOMMON.DUMP.PBIN]DBCREAT.EXE;1 on 18-APR-1990 10:54:18.91
File ID (366,6,0) End of file block 27 / Allocated 28

Virtual block number 16 (00000010), 512 (0200) bytes

```
5050FFFF 88531C75 08051187 F6263574 010C7E83 3674FFFF FA46F7DC 75C00800 ..âuÉ%F•..t6.-..t5&-....u.S±..PP 000000
0A3C0525 878826F9 468AFF6F E90F750A F97E8000 00FFFF9A 5016FC46 8D5008F7 %ÀP.F•.P......-•.u.Õo..F•&..X.<. 000020
FE4F8026 0574C308 C08C065E C4EC8855 0099E8C5 750AF97E 80FF58E9 00800274 t.¯.Õ[..-•.uè$..U.$ó^..â.ùt.&.O± 000040
740025E8 08750007 4C3E831E 73FFF130 06468857 5602ECB3 EC8855C8 50E58801 ..[]ùU.$.$.VW.F.•Þ.s..>L..u.ÕX.t 000060
5E5F02C4 8318271E 809A0676 FF087500 78E80574 0018E815 750082E8 074CA312 .ÈL.Õ..u.Õ..t.Õx.U..v..¯.'..ó._^ 000080
80510E4F 8050501E C033FE5E 89FEE383 43065E88 0776065E 3900F088 C850E588 .[]ùÈÞ.9^.v..^.C.D±.^±3â.PP.O.Õ¯ 0000A0
08A30A8E 05740208 0750A307 4E1687C2 883874FF FA8308C4 8319E920 5A9A5002 .P.Z Õ..ó..•.tB.ô..N.ÈP..Øt..ÕÈ. 0000C0
05000AA3 01478000 02A30000 A3000A88 0C478948 480008A3 C03308BE FE5E8800 ..^±.Ã3âÈ..NN.G.|..È..È...G.È... 0000E0
C3D98EC1 8CD20804 90E80750 1E8ED833 064E88C0 8ED88CC3 1FD88C00 06A30000 ..È...Ã.Õ.Ã.â.N.3Û..P.Õ...Ø.è.1ù 000100
10C01805 74A6F3F9 2801F7AE F2FFFF89 C0330A7E C40676C5 1EDE8807 88EC8855 U.$.m.B.év.ó-.3â¿..·ÛK|+•µ|t..ó. 000120
50FA8891 49D1F7AE F2FFFF89 C033067E C4D788EC 885500C8 5DFA88F3 881FFFFF ....m.•|ù.U.$.æó-.3â¿..·ÛK||..•| 000140
F3C032F8 E2AA0374 C00AAC0C E30E4E88 DF880A76 C5067EC4 1E5657EC 885500C8 ù.U.$WV.ó-.év..Õ.N.D.¯.ât.¯â½2âµ 000160
050F1E38 065E88EC 8855062A E9008357 56EC8855 C850E588 5F5E1FC2 8CC388AA ¯.ù.ô.^_.[]ùU.$VW*.Õ•.U.$.^.;... 000180
7EC457EC 885500C8 50E588C0 3302E800 01080574 40051187 F60C7C00 F883117D )..«.|.¯...ât.|...$.3â.[]ù.U.$Wó- 0001A0
9A50520A E804C483 05750208 0975C008 58181619 859A5040 1A151A9A 9A570606 ..W.....âP.ç....[.âu..Øu..ó.$.RP. 0001C0
33001089 C08ED08C 0A76C51E 575620EC 83EC8855 C850E588 5F08C483 181005EE Ÿ....ó._.[]ùU.$.$ VW.év..Ã.â¿..3 0001E0
```

```
Dump of file SATURN:[PCCOMMON.DUMP.PBIN]DBCREAT.EXE;1 on 18-APR-1990 10:54:18.91
File ID (366,6,0)   End of file block 27 / Allocated 28

Virtual block number 17 (00000011), 512 (0200) bytes

 C5E7EBE0 4308EFD3 03B1E002 07E18001 B0C888F8 881474C0 0AACABF3 E07E8DC0 ȧ.~Å¤¨¯.ât..½.à¯..Ã.ØAÝ.Æý.CÁŠÓé 000000
 448DE674 E04322EF D303B1E0 D207E180 0180C888 F88B1974 00FF25AC 02330676 v.3Ø¯X..t..½.à¯..Ã.ØAÝ.Æý"CÁt|.D 000020
 1E50000A 88187500 07303E80 D88E1658 881E56EC 8855CB50 E5885E5F 1FDA8CFF ..Ö._^.|]ùU.$V.¡X..Ã.>0..u.¡..P. 000040
 3A0874C0 85ADFC07 318E0656 88010730 06C60000 FFFF9A50 0731881E 50073D88 ¡=.P.¡1.P.....6.0...V./1.=U.Ãt.: 000060
 0C080C07 09060D05 18040203 02021601 CB5DE588 5E1F0001 88F377D4 3AF772D0 Ãr%:åw¡...^.|]ù................. 000080
 08590D57 0D530D52 02430041 02350212 12110D10 120F160D 160C0808 070A0C09 ..................S.A.C.R.S.W.Y. 0000A0
 89050DA3 16080D00 080702CE 0BA40D84 09820A81 0A801606 09721C70 2060006C l.m p.r...........É.ö.ø.....É... 0000C0
 0A0024B9 18E08B05 0DA3CB5D E58899FF FF880008 E8CB50E5 8899FFFF 88050616 ...|....|]ùÒ..|....|]ùÉ..ÉÀ.¿$.. 0000E0
 8A2E4301 76CA3C04 728C3C43 0A76243C 0472133C F7E24343 1674073A 2E1875E4 õu..:.t.CCã%<.r.<$v.C<Vr.<òv.C.. 000100
 26FA5EC4 1CEBF62B FC5E8CFA 4689057E B85606EC 83EC8855 00C30506 A3980147 G..Ê..ù.U.š.$.V|-..F°.^•+-Š.6¨°8 000120
 3906E816 8806E6A1 0CFA4683 46017440 04C4831B 3217CC9A 53060E74 830A47F6 -G..t..S.6.2..6.@t.F.F°.Ã|...Ò.9 000140
 FF5CE9C0 3300098A 0872050F 1E3B065E 88EC8855 90CB5DE5 885EC688 0876FA46 F°vÃ.6^.|]ù.U.š.^.;...r.¤..3àÕ\. 000160
 91E175C0 855A5900 0019799A 51160C76 FF0876FF 0A76FF53 CC8804EC 83FF68E9 Öh..$..äS.v..v..v..Q.y...YZ.àuÃ. 000180
 18E9C033 00098A08 72050F1E 38065E88 0CEC83EC 885500C8 5DE588FD 0511A780 .1..».|]ù.U.š.š..^.;...r.¤..3àÕ. 0001A0
 74800511 87F60000 1CE59A50 16F44680 51414151 51C93353 12742005 1187F6FF .-... t.S3èQQAAQ.F¶.P.|...-....t 0001C0
 E30C4E88 F86689F2 88FA8856 57FCFC46 89FE4689 C0330856 C50A468E FA5E8C7D ).^°.F.éV.3à.F±.F==UV.°.¨.f%.N.D 0001E0

Dump of file SATURN:[PCCOMMON.DUMP.PBIN]DBCREAT.EXE;1 on 18-APR-1990 10:54:18.91
File ID (366,6,0)   End of file block 27 / Allocated 28

Virtual block number 18 (00000012), 512 (0200) bytes

 283D0200 8ADC8802 EC831F4E 7600A83D 1C9B2174 9AFA5E8E 1E5275AE F20AB060 '¯..ÛuR..^°.t!..=¨.vN..š..É¤..=( 000000
 0028E8F4 E2AA1A74 FB380D74 0A3CAC0C 4E880716 FA8804B8 E2280080 8A037302 .s.¤..•å.å.°...N.¯<.t.;«t.¨ö¶Ò•. 000020
 93E9FA5E 8E5F5EE1 E80014E8 E2E8FC46 FF0A80AA 001FE803 75FB380D 80009AE9 Ö..¯.;«u.Ò..¨¯..F•Šàò..ŠÃ^ .^°Õ. 000040
 468D5152 1E53065E 881FE3CA 28CF881F 061E5153 501D5E15 929AFFFC 887AE800 .Šz¡•....^.PSQ....Ù•ðD..^.Š.RQ.F 000060
 C4831FC3 FA885858 591F0774 D808FE5E 01F45E88 1175C008 00000800 9A5016F4 ¶.P......åu..^¶.^±.Ut..Y(X.°ù..6 000080
 FE5E8E26 E8F90020 8A03E800 1C8A0875 00098A00 01300D74 00603018 74C00808 ..Ãt.=m.t.=..¤..u.¤..Š.¤ .°Š&.^± 0000A0
 FE468806 E8F9C033 001C8A0E E8F80375 1A3F8008 5E880A5E 8E0E7440 051187F6 -...@t..^..^..?.u.%Š.¤..3à°Š..F± 0000C0
 1EEEE8C1 880475C9 080C4E88 FDE8E9C8 5DE58804 72FA5E8E 5F5EF866 88FC4628 •F•.f%^_.^°r..|]ùÕÒ».N..èu..éŠŸ. 0000E0
 00013D00 74006D3D 1774C008 1F071E00 0010049A 5016F446 8D51521E 530856C5 éV.S.RQ¯F¶.P.å.......åt.=m.t.=.. 000100
 26DA880A 74400511 87F68775 C008F446 8BC2E800 208AC7E8 001C8ACC 7500098A ¤..uÑo..Šúo .Šõ.F¶.åuñ-...@t..Õ& 000120
 CB5DE588 01FE4F80 04740808 065E88EC 8855A3E8 C033001C 8AA6E802 751A3F80 .?.u.Š|¤..3àŠÉU.$.^..Ut..O±..|]ù 000140
 A3FE2440 24E899C0 33057501 73E80005 88071E29 75003F83 07428857 56EC8855 U.$VWEB..?.u)..|..Òs.u.3à.Š$@$±È 000160
 0009E8C0 8ED88C06 4E880748 3689FFFE FE44C704 C6830001 04C79607 44A30742 B.ÉD..ú....6.úO±±..6H..N..Ã.ÃO.. 000180
 48427401 A8FE88AD FC02778B F273EEF9 83FEE180 FA744100 CEE9CB5D E5885E5F _^.|]ùÕö.At°.Ã±.°Vs¨.w.=U.±¨.tBH 0001A0
 89F9030C 74FE88E6 E8FE4489 F7880002 05C20334 7401A8AD F0030088 1573C138 ¯ès..Ã.ÞU¨.t4.6....%.O±Š|.±t..°. 0001C0
 027F8907 501E8C26 05740138 D18CDA8C C688FE4C FEF90305 E8058948 C128FE4C L±•éN..Š..°±t±.6.Ö.1;|t.&..P.... 0001E0

Dump of file SATURN:[PCCOMMON.DUMP.PBIN]DBCREAT.EXE;1 on 18-APR-1990 10:54:18.91
File ID (366,6,0)   End of file block 27 / Allocated 28

Virtual block number 19 (00000013), 512 (0200) bytes

 F0030088 8073C138 48FE88F2 7401A8A0 F003FE88 2574FFFE 30020754 06C626C3 ù&6.T..=±.tX.±.bÙ¨.t·.±H;ès§.Ã.Þ 000000
 540EFE26 14E8088E 0474C008 08478BE6 E8FE4489 F7880002 05C203E2 7401A8AD Ù¨.t8.6....%.O±Š|.G..åt..ÃŠ.&±.T 000020
 0074C638 006AE8C0 33067788 8CE83788 074C1E8E 260574C7 38078C08 8C117407 .t..Ã.ø;üt.&..L..7ŠV.w.3àÒj.;ót. 000040
 260474C1 38018C08 8C99E84E 4E960574 001CE8FE 40FE0074 005EE898 40400124 $.@@.Ò^.t.±M±Ò..t..NNŠ..Ã.1;èt.& 000060
 52163826 7FFF8A41 4149C828 037401A8 FE458851 C399C033 02478907 880750A3 ÊP....G.3à.ùQ.E±¨.t.•à|AA¤..&;.R 000080
 EAD1D2F7 0875000C E8C628C2 23D2F700 72C20315 72C603C1 88F575EA D1047607 .v.1õuÃ.ê.ór..ôr.%Ø#ô•6Ò..u.%Ø1õ 0000A0
 D72B0688 067789FF FEFE44C7 F203F088 FE885718 74001DE8 5152C359 C033E575 u13àYùRQÒ..t.W.±.b.·ùD±±..w..ø•ø 0000C0
 FA8308C4 831D8920 5A9A1F06 500001B8 5052521E D2335053 C35A5958 FE55894A J.U±XYZùSP3Ø.RRP|..P...Z ¿..Ã..° 0000E0
 48064688 08568800 E68F3875 000A7E83 065756EC 885500C3 D2080274 5B5A1FFF ..Z[t..Øù.U.$VW..~..uØ•|..V..F.H 000100
 735E003E E8560E46 89024488 0074F738 11744804 E636884C E8277200 57E80775 u.ÒW.r'ŠL.6|.Ht.;%t..D..F.VÒ>.^s 000120
 FFFF9A50 C0335016 52C48850 21E899FF FF880675 02080473 04E6FE81 04C68334 4.6..±|.ø..Øu.¡...ŠIP.ØR.P3àP... 000140
 880E4E88 C850E588 5E5F07C0 33038804 E6368902 5C891489 E675C085 F9580000 ..(°.Ãu|...\..6|..R3à._^.|]ù.N.. 000160
 0675F738 C18ED388 26721C03 DA882CE8 F9F27504 E6FE8104 C6830C74 024C39F7 %9L.t..6..±|.u·°Š,.Ö..F&.&.é;%u. 000180
 00C3018B 04879200 E0168904 75F7380E 75C08500 0008269A 51531373 00E01E39 9.Ã.ø.SQ.&....ÃuØ;%u...Ã.....1ù. 0001A0
 800A7902 080E750A F9831374 C00A93FC 071E570A 7EC51E08 56880646 880E4E88 .N..F..V..é-.V..=..Ãt..°.u..Øy.¯ 0001C0
 0276393C 30040387 92F1F793 F1F70274 C0080233 92F788DA F7000283 D8F7AA20 -¨%Ù.Ø.%Ö.%.3Ø.Ãt.%þ.%þ..Æ.0<9v. 0001E0
```

```
Dump of file SATURN:[PCCOMMON.DUMP.PBIN]DBCREAT.EXE;1 on 18-APR-1990 10:54:18.91
File ID (366,6,0)   End of file block 27 / Allocated 28

Virtual block number 20 (00000014), 512 (0200) bytes

 885E5F1F 58DA8CF2 72C73801 448DFF44 880586AC 4F0588E2 75C308C2 88AA2704 .'¯.ô.úuã..O¯...D..D.;úr .ÖX._^. 000000
 8E5618EC 83EC8855 F9E8C033 C8515208 F7C42807 73C43807 12A15A59 00CB50E5 Í]ù.YZÀ..;ás.+á%ÄRQù3ãŠ°U.Š.Š.V. 000020
 890A0EA3 0A0C1689 0A0AA399 C028FE56 89FC4689 05301688 260538A1 26076C06 .ţ.&À;.&..=..F•.Vı+à.Ê......Ê... 000040
 0277FF26 FC5EC450 1E070688 51E8FE56 89FC4689 05301688 260538A1 260A1016 ...&À;.&..=..F•.VıŠQı...Pá^•&.w. 000060
 0277FF26 FC5EC450 F676FF17 74000BF6 5689F446 8908C483 228A183C 9A37FF26 &.7.<.."..á..F¶.V-.Ät..v-Pá^•&.w. 000080
 75C00804 C4830329 E80E37FF 260277FF 26FC5EC4 46E808C4 83013CE8 0E37FF26 &.7.Ò<..á.ŠFá^•&.w.&.7.Ò)..ð..âu 0000A0
 75223C80 2602478E 2607FF26 3788262B 74024708 26078826 FC5EC404 FC468335 5.F•.á^•&..&.G.t•&.7&..&.G.&.<"u 0000C0
 00E846C7 00E2E9FF FF88C874 C00804C4 8302F4E8 0E37FF26 0277FF26 FC5EC493 .á^•&.w.&.7.Ò¶..á..Âtùı..Õã.úfÒ. 0000E0
 5689EA46 89065788 26044788 26EA5EC4 14E8EC56 89EA4689 0A101688 0A0EA100 .À.. ....Fõ.VšŠ.á^õ&.G.&.W..Fõ.V 000100
 8902C483 23251985 9A500004 05E001E0 D1E84688 E475EC46 08EA4688 E846FFEC Š.FÒ.Fõ.FŠuð.FÒiÂIÂ...P.ç.%#.á.. 000120
 E8468807 6E068E05 3D168926 0538A326 FA568807 6C068EAD 74000BFA 5689F846 F%.V°.ÂtÙ..ţ..V°&Ê;.&..=...n..FÒ 000140
 C208EC56 89EA4689 06578826 04478826 EA5EC408 E80A1016 880A0EA1 0539A326 &É9.À......Š.á^õ&.G.&.W..Fõ.Vš.ó 000160
 28F85EC4 D1E80257 89260789 2604F846 83F85EC4 02578826 078826EA 5EC41A74 t.á^õ&..&.W.á^%.F%.&..&.W.ŠiÃ^½• 000180
 4788260A 0E1EC423 74C208EC 5689EA46 890A1016 880A0EA1 07892602 478926C0 à&.G.&..À.......Fõ.Vš.ót#á...&.G 0001A0
 885EC028 CCE804C4 83238A19 A09AEA76 FFEC76FF 0A101689 0A0EA306 57882604 .&.W.Ê.......vš.võ....#.á.Ša+ã^. 0001C0
 FE5689FC 4689F856 89F64689 08568806 46880000 E846C71A EC83EC88 55C850E5 Í]ùW.Š.Š.úfÒ...F..V..F-.V½.F•.Vı 0001E0

Dump of file SATURN:[PCCOMMON.DUMP.PBIN]DBCREAT.EXE;1 on 18-APR-1990 10:54:18.91
File ID (366,6,0)   End of file block 27 / Allocated 28

Virtual block number 21 (00000015), 512 (0200) bytes

 5689F646 89C28CC3 880A753A 3C04742F 3C08745C 3CE64688 078A26FC 5EC422E8 Š"á^•&..,FÌ<\t.</t.<:u..ù.ô.F-.V 000000
 0802C483 23F4189A 9A509807 8A26FC5E C41973FC 46390C56 880A4688 FC46FFF8 ½.F•.F..V.9F•s.á^•&...P...¶#.á.. 000020
 06468820 753A3F80 260A5EC4 0C56890A 4689F856 88F64688 D9EBFC46 FFBF74C0 åte.F•Š1.F-.V½.F..V.á^.&.?:u .F. 000040
 0A5EC401 62E904C4 83016CE8 0E0676FF 0876FF10 740C5638 0575C338 40085688 .V.ə;úu.;V.t..v..v..Òl..á.Õb.á^. 000060
 76FF0876 FFFA4689 4006462B C3880975 3A3C0474 2F3C0874 5C3CE646 88078A26 &...FÌ<\t.</t.<:u..ù•f.ə.F°.v..v 000080
 F45689F2 46890A0C 16880A0A A18A7400 08EC5689 EA468904 C483241E 05389A06 ..8..Š.á..Fõ.Vš.ÂtɑÀ.......F .V¶ 0000A0
 FF501E07 0888008C E90375C0 0808C483 24381A70 9AEA76FF EC76FF50 1E070988 ı...P.vš.võ.p.8Š.á..âu.ÕV.ı...P. 0000C0
 745C3CE6 4688078A 260A5EC4 00A2E903 75C00808 C4832462 1A709AEA 76FFEC76 vš.võ.p.bŠ.á..âu.ÕÀ.á^.&...FÌ<\t 0000E0
 74000808 56890646 8904C483 248F180A 9AEA76FF EC76FF2D 742F3C31 743A3C35 5<:t1</t-.vš.võ....Š.á..F..V..Ât 000100
 9C1A9A9A EA76FFEC 76FF00A9 E9FFFF88 6374C008 04C48300 8AE80E50 0876FF0F ..v.P.Òɑ..á..Âtcı..Ö`..vš.võ.... 000120
 76FFEC76 FFD574D0 08F05689 EE468902 C48324C1 19859A50 40FA4603 04C48324 Š.á..F°əP.ç.éŠ.á..FŸ.Vþ.Âtf.vš.v 000140
 24E005EE 9A5052FA 46030AC4 8324CE1A 829A50F0 76FF0676 FF0876FF FA76FFEA ô.v°.v..v..vÞP.ý.öŠ.á..F°RP.Ÿ.UŠ 000160
 83127F05 389A5050 C028E846 FF9075C0 0804C483 0057E80E 5052FA46 2808C483 .á.•F°RP.ÒW..á..âu..FÒ•âPP.8.... 000180
 0D74F446 08F24688 FE85E903 7500E87E 83FF11E9 03740008 EC5689EA 468904C4 á..Fõ.Vš.Ât.Õ...-Ò.u.Õçı.F .F¶t. 0001A0
 88C02804 C4830084 E80E5052 0A101688 0A0EA107 E8065788 26044788 26F25EC4 á^·&.G.&.W.Š.À......RP.Ò...á.•à. 0001C0
 88057500 08FE5689 FC468902 C48325E8 19859A50 00088804 EC83EC88 55C850E5 Í]ùW.Š.Š.ı..P.ç.ŠX.á..F•.Vı.Âu.ı 0001E0

Dump of file SATURN:[PCCOMMON.DUMP.PBIN]DBCREAT.EXE;1 on 18-APR-1990 10:54:18.91
File ID (366,6,0)   End of file block 27 / Allocated 28

Virtual block number 22 (00000016), 512 (0200) bytes

 47892606 478926C0 28FC5EC4 02578926 07892608 56880646 88FC5EC4 56E8FFFF ..ŠVá^•.F..V.&..&.W.á^•+á&.G.&.G 000000
 468800E8 06578926 04478926 FE5688FC 46880A0A 1EC41474 0A100608 0A0EA104 .À......t.á....F•.Vı&.G.&.W.Š..F 000020
 8855C850 E588C028 0A0C1689 0A0AA3FE 5688FC46 880A1016 890A0EA3 FE5688FC •.VıÊ.......F•.VıÊ......•à.Í]ùW. 000040
 FA5689F8 46890657 88260447 8826065E C40092E9 03750846 08064688 08EC83EC Š.Š..F..F.u.Õ..á^.&.G.&.W..F%.V° 000060
 08C48321 D61A709A 37FF2602 77FF26F8 5EC437FF 260277FF 26065EC4 7D740008 .Ât)á^.&.w.&.7á^½&.w.&.7.p.ø!.á. 000080
 5EC40257 88260788 26F85EC4 FE5689FC 46890257 88260788 26065EC4 347DC008 .á)4á^.&..&.V..F•.Vıá^½&..&.V.á^ 0000A0
 26044788 26F85EC4 02578926 078926FE 5688FC46 88F85EC4 02578926 07892606 .&..&.V.á^%.F•.Vı&..&.W.á^½&.G.& 0000C0
 6EE90856 89064689 06578826 04478826 065EC497 75000BFA 5689F846 89065788 .W..F%.V°.Âu.á^.&.G.&.W..F..V.Õn 0000E0
 00000003 18A00002 00000002 013F0002 00000001 20490002 001290C8 50E588FF ..Í]ù.....I ......?............. 000100
 008A0003 1E5D0103 00890003 19400103 00050003 036E0103 00060001 01440203 ..D.......n.......M.......].... 000120
 00260003 20F90103 00220003 20AE0103 00180002 00CF0203 00040004 188A0103 ..ɑ.......Ù.......Ò ..".... ..&. 000140
 00410003 057C0103 00400003 056C0103 003A0003 1D260103 00310003 01D50103 ..f...1...&...:...l...ə...|...A. 000160
 00000000 00000000 005C0003 01C50103 00590003 02DA0103 00400003 02AC0103 ..~...M...Ö...Y...é...\......... 000180
 6F43202D 20797261 7262694C 20656069 54206E75 5220534D 00000000 00000000 ........MS Run-Time Library - Co 0001A0
 70726F43 2074666F 736F7263 694D202C 38383931 20296328 20746867 69727970 pyright (c) 1988, Microsoft Corp 0001C0
 63614200 203A6574 61657263 206F7420 65736162 61746164 20726574 6E450011 ..Enter database to create: .Bac 0001E0
```

```
Dump of file SATURN:[PCCOMMON.DUMP.PBIN]DBCREAT.EXE;1 on 18-APR-1990 10:54:18.91
File ID (366,6,0)    End of file block 27 / Allocated 28

Virtual block number 23 (00000017), 512 (0200) bytes

20657361 62617461 44000065 73616261 74616420 7473796C 616E4120 6E616068 hman Analyst database..Database  000000
444F434C 51530A00 0A646574 61657263 20796C6C 75667373 65636375 73207325 %s successfully created...SQLCOD 000020
45205054 4E49414C 51530A00 6F6D2E31 3030687A 6C717300 646C2520 53492045 E IS %ld.sqlzk001.mo..SQLAINIP E 000040
00000000 0073250A 000A6425 20302065 646F6320 6E727574 6552202E 524F5252 RROR. Return code = %d...%s..... 000060
00000000 00000000 00000000 00000000 00000000 0000FFFF 00000339 00000000 ....9........................... 000080
00000000 00000000 00000000 00000000 00000000 00000000 00000000 00000000 ................................ 0000A0
00000000 00000000 00000000 00000000 00000000 00000000 00000000 00000000 ................................ 0000C0
00000000 00000000 00000000 00000000 00000000 00000000 00000000 00000000 ................................ 0000E0
00000000 00000000 00000000 00000000 00000000 00000000 00000000 00000000 ................................ 000100
00000000 00000000 00000000 00000000 00000000 00000000 00000000 00000000 ................................ 000120
00000000 00000000 00000000 00000000 00000000 00000000 00000000 00000000 ................................ 000140
00000000 00000000 00000000 00000000 00000000 00000000 00000000 00000000 ................................ 000160
00000000 00000000 00000000 00000000 00000000 00000000 00000000 00000000 ................................ 000180
00000000 00000000 00000000 00000000 00000000 00000000 00000000 00000000 ................................ 0001A0
00000000 00000000 00000000 00000000 00000000 00000000 00000000 00000000 ................................ 0001C0
00000000 00000000 00000000 00000000 00000000 00000000 00000000 00000000 ................................ 0001E0

Dump of file SATURN:[PCCOMMON.DUMP.PBIN]DBCREAT.EXE;1 on 18-APR-1990 10:54:18.91
File ID (366,6,0)    End of file block 27 / Allocated 28

Virtual block number 24 (00000018), 512 (0200) bytes

00000000 00000000 00000000 00000000 00000000 00000000 00000000 00000000 ................................ 000000
00000000 00000000 00000000 00000000 00000000 00000000 00000000 00000000 ................................ 000020
00000000 00000000 00000000 00000000 00000000 00000000 00000000 00000000 ................................ 000040
00000000 00000000 00000000 00000000 00000000 00000000 00000000 00000000 ................................ 000060
00000000 00000000 00000000 00000000 00000000 00000000 00000000 00000000 ................................ 000080
00000000 00000000 00000000 00000000 00000000 00000000 00000000 00000000 ................................ 0000A0
00000000 00000000 00000000 00000000 00000000 00000000 00000000 00000000 ................................ 0000C0
00000000 00000000 00000000 00000000 00000000 00000000 00000000 00000000 ................................ 0000E0
00000000 00000000 00000000 00000000 00000000 00000000 00000000 00000000 ................................ 000100
00000000 00000000 00000000 00000000 00000000 00000000 00000000 00000000 ................................ 000120
00000000 00000000 00000000 00000000 00000000 00000000 00000000 00000000 ................................ 000140
00000000 00000000 00000000 00000000 00000000 00000000 00000000 00000000 ................................ 000160
00000000 00000000 00000000 00000000 00000000 00000000 00000000 00000000 ................................ 000180
00000000 00000000 00000000 00000000 00000000 00000000 00000000 00000000 ................................ 0001A0
00000000 00000000 00000000 00000000 00000000 00000000 00000000 00000000 ................................ 0001C0
00000000 00000000 00000000 00000000 00000000 00000000 00000000 00000000 ................................ 0001E0

Dump of file SATURN:[PCCOMMON.DUMP.PBIN]DBCREAT.EXE;1 on 18-APR-1990 10:54:18.91
File ID (366,6,0)    End of file block 27 / Allocated 28

Virtual block number 25 (00000019), 512 (0200) bytes

00000000 00000000 00000000 00000000 00000000 00000000 00000000 00000000 ................................ 000000
00000000 00000000 00000000 00000000 00000000 00000000 00000000 00000000 ................................ 000020
00000000 00000000 00000000 00000000 00000000 00000000 00000000 00000000 ................................ 000040
00000000 00000000 00000000 00000000 00000000 00000000 00000000 00000000 ................................ 000060
00000000 00000001 FFFF003D 4F464E49 5F454C49 465F435F 00E60000 00000000 ......l._C_FILE_INFO=........... 000080
00000000 00000000 00000000 81818100 14000000 00000000 00000000 00000000 ................................ 0000A0
00000000 0000000A 0A0A0A0A 0A0A0A0A 0A0A0A0A 0A0A0A0A 0A0A0A00 00000000 ................................ 0000C0
00000000 00000000 00000000 00000001 00000000 00000000 00000000 00000000 ................................ 0000E0
00880000 00000000 00000000 00000000 00000000 00000000 00000000 00000000 ................................ 000100
00000000 00000000 00000102 00000000 00000000 00000001 07680088 00000586 ......h......................... 000120
00000000 00000000 00000000 00000000 00000000 00000000 00000000 00000202 ................................ 000140
00000000 00000000 00000000 00000000 00000000 00000000 00000000 00000000 ................................ 000160
00000000 00000000 00000000 00000000 00000000 00000000 00000000 00000000 ................................ 000180
00000000 00000000 00000000 00000000 00000000 00000000 00000000 00000000 ................................ 0001A0
00000000 00000000 00000000 00000000 00000000 00000000 00000000 00000000 ................................ 0001C0
00000000 00000000 00000000 00000000 00000000 00000000 00000000 00000000 ................................ 0001E0
```

```
Dump of file SATURN:[PCCOMMON.DUMP.PBIN]DBCREAT.EXE;1 on 18-APR-1990 10:54:18.91
File ID (366,6,0)   End of file block 27 / Allocated 28

Virtual block number 26 (0000001A), 512 (0200) bytes

00000000 00000000 00000000 00000200 00010000 00000000 00000000 00000000 ................................ 000000
00000000 00000000 00000000 00000000 00000000 00000000 00000000 00000000 ................................ 000020
00000000 00000000 00000000 00000000 00000000 00000000 00000000 00000000 ................................ 000040
00000000 00000000 00000000 00000000 00000000 00000000 00000000 00000000 ................................ 000060
00296C6C 756E2800 296C6C75 6E280000 00000000 000000E8 06620000 00000000 ......b.ò.........(null).(null). 000080
06EE0718 06EE0766 06EE0000 0C20FFFF FFFF002E 2E002E00 3F2A0000 23202D28 +- #..*?.......... ...Ÿ.f.Ÿ...Ÿ. 0000A0
00000000 00000000 00000000 00000000 01010000 00000724 06EE0720 06EE071C ..Ÿ. .Ÿ.$....................... 0000C0
00000000 00000000 00000000 20000000 00000000 00000000 00000000 00000000 ................................ 0000E0
00303030 36520000 3E3E4753 4D4E3C3C 076A076E 06E8FFFF FFFF1C78 00000000 ....x.....ò.n.j.<<NMSG>>..R6000. 000100
6920200A 00333030 36520003 000A0D77 6F6C6672 65766F20 68636174 73202D0A .- stack overflow.....R6003..- i 000120
20200A00 38303036 52000800 0A003020 79622065 64697669 64207265 6765746E nteger divide by 0.....R6008..-  000140
0A0D7374 6E656075 67726120 726F6620 65636170 73206867 756F6E65 20746F6E not enough space for arguments.. 000160
726F6620 65636170 73206867 756F6E65 20746F6E 20200A00 39303036 52000900 ...R6009..- not enough space for 000180
65206560 6974206E 757200FF 000A0D00 FC000A00 746E6560 6E6F7269 766E6520  environment...*......run-time e 0001A0
20746E69 6F702067 6E697461 6F6C6620 200A0032 30303652 00020020 726F7272 rror ...R6002..- floating point  0001C0
696F7020 6C6C756E 20200A00 31303036 52000100 0A006465 64616F6C 20746F6E not loaded.....R6001..- null poi 0001E0

Dump of file SATURN:[PCCOMMON.DUMP.PBIN]DBCREAT.EXE;1 on 18-APR-1990 10:54:18.91
File ID (366,6,0)   End of file block 27 / Allocated 28

Virtual block number 27 (0000001B), 512 (0200) bytes

02000000 01072800 020003FF FFFF000A 00746E65 606E6769 73736120 7265746E nter assignment..........(...... 000000
00000000 00000000 00000000 00000000 00000000 03076C00 02000000 02058000 .........:.l.................... 000020
00000000 00000000 00000000 00000000 00000000 00000000 00000000 00000000 ................................ 000040
00000000 00000000 00000000 00000000 00000000 00000000 00000000 00000000 ........................  ....... 000060
00000000 00000000 00000000 00000000 00000000 00000000 00000000 00000000 ................................ 000080
00000000 00000000 00000000 00000000 00000000 00000000 00000000 00000000 ................................ 0000A0
00000000 00000000 00000000 00000000 00000000 00000000 00000000 00000000 ................................ 0000C0
00000000 00000000 00000000 00000000 00000000 00000000 00000000 00000000 ................................ 0000E0
00000000 00000000 00000000 00000000 00000000 00000000 00000000 00000000 ................................ 000100
00000000 00000000 00000000 00000000 00000000 00000000 00000000 00000000 ................................ 000120
00000000 00000000 00000000 00000000 00000000 00000000 00000000 00000000 ................................ 000140
00000000 00000000 00000000 00000000 00000000 00000000 00000000 00000000 ................................ 000160
00000000 00000000 00000000 00000000 00000000 00000000 00000000 00000000 ................................ 000180
00000000 00000000 00000000 00000000 00000000 00000000 00000000 00000000 ................................ 0001A0
00000000 00000000 00000000 00000000 00000000 00000000 00000000 00000000 ................................ 0001C0
00000000 00000000 00000000 00000000 00000000 00000000 00000000 00000000 ................................ 0001E0

Dump of file SATURN:[PCCOMMON.DUMP.PBIN]DBDEFIN.EXE;1 on 18-APR-1990 10:54:23.48
File ID (378,14,0) . End of file block 32 / Allocated 32

Virtual block number 1 (00000001), 512 (0200) bytes

00000001 00000040 00000000 CEF80000 0000FFFF 00000020 00000020 01605A40 MZm. ... .........Ÿö....a....... 000000
00000400 00000000 00000000 00000000 00000000 00000000 00000000 00000000 ................................ 000020
00000000 00000000 00000000 00000000 00000000 00000000 00000000 00000000 ................................ 000040
00000000 00000000 00000000 00000000 00000000 00000000 00000000 00000000 ................................ 000060
00000000 00000000 00000000 00000000 00000000 00000000 00000000 00000000 ................................ 000080
00000000 00000000 00000000 00000000 00000000 00000000 00000000 00000000 ................................ 0000A0
00000000 00000000 00000000 00000000 00000000 00000000 00000000 00000000 ................................ 0000C0
00000000 00000000 00000000 00000000 00000000 00000000 00000000 00000000 ................................ 0000E0
00000000 00000000 00000000 00000000 00000000 00000000 00000000 00000000 ................................ 000100
00000000 00000000 00000000 00000000 00000000 00000000 00000000 00000000 ................................ 000120
00000000 00000000 00000000 00000000 00000000 00000000 00000000 00000000 ................................ 000140
00000000 00000000 00000000 00000000 00000000 00000000 00000000 00000000 ................................ 000160
00000000 00000000 00000000 00000000 00000000 00000000 00000000 00000000 ............................  .. 000180
00000000 00000000 00000000 00000000 00000000 00000000 00000000 00000000 ................................ 0001A0
00000000 00000000 00000000 00000000 00000000 00000000 00000000 00000000 ................................ 0001C0
00000000 00000000 00000000 00000000 00000000 00000000 00000000 00000000 ................................ 0001E0
```

Dump of file SATURN:[PCCOMMON.DUMP.PBIN]DBDEFIN.EXE;1 on 18-APR-1990 10:54:23.48
File ID (378,14,0) End of file block 32 / Allocated 32

Virtual block number 2 (00000002), 512 (0200) bytes

```
72502032 2F534F20 73657269 75716572 20606172 676F7270 20736968 540033E8 Ô3.This program requires .˜/2 Pr 000000
4C01B821 CD09B41F 0E5A240A 0D2E7265 67616E61 4D206E6F 69746174 6E657365 esentation Manager...$Z..Ç.ë!.L 000020
00000000 00000000 00000000 00000000 00000000 00000000 00000000 000021CD ë!.............................. 000040
00000000 00000000 00000000 00000000 00000000 00000000 00000000 00000000 ................................ 000060
00000000 00000000 00000000 00000000 00000000 00000000 00000000 00000000 ................................ 000080
00000000 00000000 00000000 00000000 00000000 00000000 00000000 00000000 ................................ 0000A0
00000000 00000000 00000000 00000000 00000000 00000000 00000000 00000000 ................................ 0000C0
00000000 00000000 00000000 00000000 00000000 00000000 00000000 00000000 ................................ 0000E0
00000000 00000000 00000000 00000000 00000000 00000000 00000000 00000000 ................................ 000100
00000000 00000000 00000000 00000000 00000000 00000000 00000000 00000000 ................................ 000120
00000000 00000000 00000000 00000000 00000000 00000000 00000000 00000000 ................................ 000140
00000000 00000000 00000000 00000000 00000000 00000000 00000000 00000000 ................................ 000160
00000000 00000000 00000000 00000000 00000000 00000000 00000000 00000000 ................................ 000180
00000000 00000000 00000000 00000000 00000000 00000000 00000000 00000000 ................................ 0001A0
00000000 00000000 00000000 00000000 00000000 00000000 00000000 00000000 ................................ 0001C0
00000000 00000000 00000000 00000000 00000000 00000000 00000000 00000000 ................................ 0001E0
```

Dump of file SATURN:[PCCOMMON.DUMP.PBIN]DBDEFIN.EXE;1 on 18-APR-1990 10:54:23.48
File ID (378,14,0) End of file block 32 / Allocated 32

Virtual block number 3 (00000003), 512 (0200) bytes

```
00050003 00030000 00010548 0A000000 0003020A 1D03046E 000200E3 0505454E NE..D...n...........N........... 000000
00000000 00000000 00010000 00040000 000004E5 00600063 00580058 0040000F ..@.X.X.c.m.|................... 000020
6E696665 64626407 08900F01 09F30356 048C0E01 00000000 2F660F00 2F660050 P.f/..f/........V.#......dbdefin 000040
4C51530C 414C5153 04534C4C 4143534F 44080000 72004600 1C000A00 01000000 .........F.r...DOSCALLS.SOLA.SOL 000060
54455341 4C515308 4C4C4143 414C5153 0848414C 51530549 50415F50 544E4941 AINTP_API.SOLAK.SOLACALL.SOLASET 000080
49534945 4C51530C 454C5153 04545254 53414C51 5308504F 5453414C 51530853 S.SOLÄSTOP.SOLASTRT.SOLE.SOLEIST 0000A0
03495041 5F445254 53454C51 530C4950 415F4450 5453454C 51530C49 50415F47 G_API.SOLESTPD_API.SOLESTRD_API. 0000C0
00000000 00000000 00000000 00000045 58452E6E 69666564 62640800 00534C4E NLS...dbdefin.EXE............... 0000E0
C4830088 08C19A0F A0680000 FC46C700 00FA46C7 088EFFFF 881E5657 000096C8 å...WV.|...ÄúF°..úF•..h...ê....á 000100
FF72868B 0000FF70 86C70000 FFFF9A50 52FFFFBA 000088FF 749689FF 72868902 ...r...t.|..n..RP.....û.p.....r. 000120
04084683 FE468948 06468801 23E9037F 01067E83 FF6C9689 FF6A8689 FF749688 ..t...j...l..-....Ö#..F.H.F±.F.. 000140
FF26085E C4004268 1E026A01 03E90375 00003DFE 4EFFFE46 88040846 830004E9 Ö...F...F±.N±=..u.Ö..j..hB.á^.&. 000160
05025788 26078826 085EC400 1EE90374 00003D0A C48300A8 00729A37 FF260277 w.&.7.r.¨..á.=..t.Ö..á^.&..&.W.. 000180
0277FF26 085EC400 45681E02 6A00C2E9 08C48300 C60C7C9A 023E681E 50520002 ..RP.h>..|.ó..á.Öö.j..hE.á^.&.w. 0001A0
00020502 57882607 8826085E C4001EE9 03740000 300AC483 00E90072 9A37FF26 &.7.r.Ö..á.=..t.Ö..á^.&..&.W.... 0001C0
FF260277 FF26085E C4004868 1E026A00 84E908C4 8301040C 7C9A0202 681E5052 RP.h...|....á.Ö..j..hH.á^.&.w.&. 0001E0
```

Dump of file SATURN:[PCCOMMON.DUMP.PBIN]DBDEFIN.EXE;1 on 18-APR-1990 10:54:23.48
File ID (378,14,0) End of file block 32 / Allocated 32

Virtual block number 4 (00000004), 512 (0200) bytes

```
50520002 05025788 26078826 085EC400 1EE90374 00003D0A C4830127 00729A37 7.r.'..á.=..t.Ö..á^.&..&.W....RP 000000
0C829A37 FF260277 FF26085E C4004868 1E0046E9 08C48301 400C7C9A 0248681E .hH..|.@..á.ÖF..hK.á^.&.w.&.7.ÿ. 000020
1E37FF26 0277FF26 085EC400 20E90001 FA46C700 08E90374 00003008 C4830166 f..á.=..t.Ö..úF°..Ö .á^.&.w.&.7. 000040
930CDC9A 0202681E FEE8E902 C483017F 06C49A01 6A08C483 01700A54 9A004F68 hO..T.p..á.j..á....á.ÖS±.h...É.. 000060
CF0CF49A 0202681E 04C48301 9F0A549A 0067681E 0018E903 74000030 04C48301 ..á.=..t.Ö...hg..T....á..h...¶.Û 000080
75000030 0000FFFF 9A008068 5016FF76 868D0202 681E0085 681E076A 04C48301 ..á.j..h...h....v..Ph.......=..u 0000A0
868D02C4 8301E806 C49A016A 08C48301 D90A549A 0088681E 0202681E 001AE903 .Ö...h...h...T.1..á.j..á.Š..á... 0000C0
8302160A 1C9A5016 FF76868D 008F681E 08C48301 FD0A549A 00A9681E 5016FF76 v..P.h`..T.»..á..he...v..P...... 0000E0
06C49A01 6A04C483 02200A54 9A00C168 1E0016E9 0374D008 F85689F6 468908C4 á..F-.V¾.Ät.Ö...hé..T. ..á.j..á. 000100
0A549A00 D3681E00 18E90374 00003004 C4830240 0CDC9A02 3E681E02 C483022C ,..á..h>..£.@..á.=..t.Ö...h£..T. 000120
8A1E8C26 0488A326 00E9B808 E4068E04 C483FFFF 0CF49A02 3E681E04 C483024C L..á..h>..¶....á...Ö.|Ö.&É..&... 000140
000CA126 08E6068E 0000FFFF 9A505200 208A0000 88536A02 48681E02 3E681E04 ..h>..hH.JS|..¤-.RP.......|.&À.. 000160
F65EC401 93E9048A 1E8C2604 88A32600 FC8808E4 068E0013 E9037500 0E060826 &....u.Ö....Ö.|•.&É..&....Ö..á^- 000180
0EE9048A 2602478E 2607FF26 378826F6 5EC40013 E9037D00 047F8326 044FFF26 &.O.&....).Ö..á^-&.7&..&.G.&..Ö. 0001A0
740AFF6E 8E800131 E90375C0 FEFF6E86 8804C483 03170A80 9AF676FF F876FF00 ..v¾.v-.¨ ....á...n.±Äu.Ö1..ƒn..t 0001C0
830007C6 26FF6A86 FFFF6A9E C40006E9 03743BFF 6E8E8020 FF6E86C6 0005E903 .Ö..6.n. .ƒn.;t.Öw.á.|...|.&6... 0001E0
```

```
Dump of file SATURN:[PCCOMMON.DUMP.PBIN]DBDEFIN.EXE;1 on 18-APR-1990 10:54:23.48
File ID (378,14,0)   End of file block 32 / Allocated 32

Virtual block number 5 (00000005), 512 (0200) bytes

 08E4068E 08C48303 4C0A549A 011E681E FF7286FF FF7486FF 0014E903 7500FA7E -*.u.Ô...Ñt..Ñr..h...T.L..á...Ô. 000000
 00FFFF9A 5052026F BA0000B8 006A006A 01DA681E 048A1E8C 260488A3 26012288 ¡".&È..&.....hÖ.j.j.j..¤o.RP.... 000020
 FF9A006A 006AFF72 B6FFFF74 B6FF5004 C483001C 0CDC9AFF 7286FFFF 7486FF00 ..Ñt..Ñr..É....á.P.Ñt..Ñr.j.j... 000040
 E6068E00 00FFFF9A 006A006A 0000FFFF 9A006A00 6A006A00 6A016A17 6A0000FF ...j.j.j.j.j.j......j.j........Ì 000060
 26000EE9 0374FF34 000C3E81 2608E606 8E0021E9 0375000E 06082600 0CA12608 .&À..&....u.Ô!...Ì.&.>..4.t.Ô..& 000080
 8689FF74 9688FF72 86880000 FF7086C7 0080E900 03E90003 E90374FF 000E3E83 .>...t.Ô..Ô..Ô..ú.p.....r...t... 0000A0
 FF6A86FF FF6A9EC4 0012E903 7E0F9EFF 708E81FF 7086FF00 3FE9FF6C 9689FF6A j...l.Ô?...p../p...-.Ô..á.j...j. 0000C0
 016A08C4 8304030A 549A0146 681EFF72 86FFFF74 86FF001E E9078826 FF6E868A ..n.&..Ô...Ñt..Ñr..hf..T....á.j. 0000E0
 349AF676 FFF876FF 0000FFFF 9A505203 38BA0000 B8FE92E9 02C48304 2106C49A .á.1..á.Ô.±j..¤8.RP......v½.v-.4 000100
 681E0488 36FF2604 8A36FF26 08E4068E 02C48302 CA06C49A 006A04C4 83042809 .+..á.j..á.ò..á...Ô.&.6..&.6...h 000120
 980A549A 0164681E 000C36FF 26000E36 FF2608E6 068E08C4 83045F0A 549A0160 '..T._..á...Ì.&.6..&.6...hd..T.. 000140
 FFFF9A50 5204AABA 00008801 74681E00 6A020068 50520479 BA028888 08C48304 ..á.j..¤y.RPh..j..ht.j..¤¨.RP... 000160
 FC7E8306 C4830485 0A549A01 80681EFC 76FF000F E9037C00 FC7E83FC 46890000 ...F•.~•.|.Ô...v•.h...T.ç..á..-• 000180
 A78808E4 068E08C4 8305200A 549A01A3 681E5052 04068A02 88880014 E9037F00 ...Ô..j..¤•.RP.hÈ..T. ..á...Ô.jÌ 0001A0
 6A000003 309A5052 040FBA00 0088006A 006A010A 681E048A 1E8C2604 88A32601 .&È..&.....hÖ.j.j.j..¤..RP.=...j 0001C0
 0CA12608 E6068E00 0003799A 006A006A 00000370 9A006A00 6A006A00 6A006A1C .j.j.j.j.j..p...j.j..y.....Ì.&À. 0001E0

Dump of file SATURN:[PCCOMMON.DUMP.PBIN]DBDEFIN.EXE;1 on 18-APR-1990 10:54:23.48
File ID (378,14,0)   End of file block 32 / Allocated 32

Virtual block number 6 (00000006), 512 (0200) bytes

 0A549A01 B6681E00 0C36FF26 000E36FF 2608E606 8E001AE9 0375000E 06082600 .&....u.Ô....Ì.&.6..&.6...hÑ..T. 000000
 00000000 00000000 00000000 CBC95F5E 1F02C483 03F906C4 9A016A08 C483052A *..á.j..á.'..á..^_èü............ 000020
 521E8902 54A30256 0E894902 5E1E8C02 5C268902 582689FC 0001EFE9 00000000 ....Ôÿ..=.&X..&\...^.1..V.ÉT...R 000040
 3A9A0048 E80000FF FF9A501E 06828806 80A3E086 580000FF FF9A5016 C4885002 .P.á.P.....X.ÀÈ..j...P.....ÒK..: 000060
 AF36FF06 B136FF06 B336FF06 B536FF06 B736FF05 860E1A9A 05810544 9A044506 .E..D.........6ñ..6ç..6°..6Ý..6É 000080
 BA0ED69A 05AA0DCA 9A5006C4 025A06C7 36000388 05A406C4 9A500588 00009A06 ......P.á.É.j..6ü.Z.á.P.ò.  .ø.¤ 0000A0
 FF334800 066A06C6 38065E06 C6087500 06823E80 00008802 5A16FF50 00FF8805 .j..P..Z.É...>...u.6.^.;6.j  K3. 0000C0
 74CA88A6 F3C88801 88065E8E 43740030 80264701 75003080 267FFF89 0254068E ..T.¿..&.=.u.G&.=.tC/^..Ì.ùm¡.ɔt 0000E0
 E0D21972 412CAC04 81147500 F8830687 8F1FF788 071E062E E8E774AE F2C03308 .3à·ÙtÒŠ.....%.€...«.u.Ÿ.¯,Ar.ØÀ 000100
 04885200 0288C31F 16F7E2AA 480174C0 FEAC9198 ACEEEBAA C20A1172 412CAC92 .¯,Ar..ô`ŠŸ¯..¯±ât.H¯ë%..ùÉ..R.å 000120
 02300774 00013040 81127558 C0080000 FFFF9A52 16501653 C4885087 0687A780 .Ì..ñP.áS.P.R......åXu.Ÿə=..t.=. 000140
 0000FFFF 9A531652 0E05AC8A 500C8850 50C0335A D4794806 878F0808 81067500 .u.Ÿ.....KyÅZ3âPP.ÉPn¯..R.S..... 000160
 074EE91F 16057308 D41EFF36 D8330A8C 080806C5 02543688 29E30806 0E885858 XX..ø.D).6Ì.é.Ã..Ö3Ü6..å.s...ÒN. 000180
 08E08F08 E08E0068 E808E08F 08E08E1F 1608D41E FF360003 880A8C08 DC06C536 6é.É..ÒÉ..6..å.../Å.€Å.Òh./Å.€Å. 0001A0
 E48EEC88 5503E800 49E808E4 8F08E08E 0052E808 908F0890 8EEC8855 C8005FE8 Ò_.ùU.$/..€..ÒR./Å.€ô.Òl.Š.U.$/ô 0001C0
 C7057500 067E8308 74C00805 8F00F49A 0032E808 E48F08E4 8E0038E8 08E48F08 .€ô.Ò;./ô.€ô.Ò2..¶.€..åt..-..u.ú 0001E0

Dump of file SATURN:[PCCOMMON.DUMP.PBIN]DBDEFIN.EXE;1 on 18-APR-1990 10:54:23.48
File ID (378,14,0)   End of file block 32 / Allocated 32

Virtual block number 7 (00000007), 512 (0200) bytes

 D41EFF00 028807E3 08D60E88 0000FFFF 9A500646 8A500001 880000E8 00FF0646 F...Ô..j..P.F.P.......ø.D.É....å 000000
 52A106C4 068F06C2 068F00C3 EEE81DFF F2740245 08058804 EF830E73 F738C308 .û;%s..ÿ....E.t`..ŠŸü...ô...á.ÀR 000020
 0175FF04 F69606B8 1E8C3606 89368936 F77500FF 7C800674 4EF08802 541E8E02 ...T..bNt..|..ü%6.6¿.6..É..-..u. 000040
 4E476374 C00AF774 093CF874 203CACFA 75C00A42 AC0001BF 023306C0 36893696 .6.6å.30¢.. ¨8.åu'¯< t«<.t%.åtcGN 000060
 FA745C3C AC41C933 E8E84203 745C3C24 74223C54 74C00AE8 74093CEC 74203CAC ¯< t$<.tò.åtT<"t$<\t.8ŠÒ3èA¯<\t' 000080
 5C3CC274 223C2774 C00AAC4E 01E8CE75 01A8D113 E9D1C188 D7E80103 0474223C <"t..ÌŠø.é1Ö.1`.uöŠ.N¯.åt'<"tô<\ 0000A0
 E8067501 A8D113E9 D1C188DF E8D10304 74223CFA 745C3CAC 41C933F0 E8420374 t.BŠÞ3èA¯<\t'<"t..ÌŠÒ.é1Ö.1`.uøŠ 0000C0
 E9000888 06730712 E8FE2440 C203C788 E7D1E7D1 47D70307 0306AF3E 891F169F ....>É..ø.øG1Ò1Ò.ú.6ð$±Ò..s.j..Ô 0000E0
 541E8E06 C0368804 C3830257 8C363F89 360716F8 03088806 831E8C06 81A3F084 Ç=ÉŸ...°..Ã.%..6.76.V..ù..6å...T 000100
 89360081 E90375C0 0AF77409 3CF87420 3CACAAC0 3303E8FA 75C00AAA AC4EA402 .ÉN¯¯.åu'Š.38¯¯< t«<.t%.åu.Ô..6. 000120
 745C3C26 74223C63 74C00A06 74093CDA 74203CAC 4EAAD788 04C38302 578C363F 76.V..ù..ø`N¯< tÖ<.tø.åtc<"t&<\t 000140
 22800573 AAF3E9D1 5C800D5E8 AAF35C80 0674223C FA745C3C AC41C933 E8E8AA03 .¯ŠÒ3èA¯<\t'<"t.¯\ø`Šf¯\1Òø`s.¯" 000160
 41C933F0 E8AA0374 5C3C8674 223C2A74 C00AAC4E D7874FAA 22800787 46C9E8AA `ŠèF.ø¯"`Ò.øN¯.åt'<"tÑ<\t.`ŠÞ3èA 000180
 16AAC033 C7E8AA22 809573AA F3E9D15C 80D5E8AA F35C8006 74223CFA 745C3CAC ¯<\t'<"t.¯\ø`Šf¯\1Òø`s.¯"`Šù3å`. 0001A0
 000188EC 8855FF22 E906C22E FF0475C0 8506F32A 989A0000 0247C700 0007C71F .ù...ùG.....°ø..åu...ô.Ô".U.$j.. 0001C0
 511E0001 06C606C7 06C68951 06217400 087E8306 4EC4FE46 8D00248A 06C88850 PÉå.¤Ŝ..F±6N..-..t!.0¿6.ù.6....0 0001E0
```

```
Dump of file SATURN:[PCCOMMON.DUMP.PBIN]DBDEFIN.EXE;1 on 18-APR-1990 10:54:23.48
File ID (378,14,0)   End of file block 32 / Allocated 32

Virtual block number 8 (00000008), 512 (0200) bytes

 FFFF9A50 1652531E 06C636FF 0EE80000 FFFF9A50 50C03350 1652531E 51001089 ¿..Q.SR.P3âPP.....Š..66..SR.P... 000000
 5EC4FFFF 8E5612EC 83EC8855 C85DE588 99C03303 7493C085 DA8C0017 C3810000 ...ù...Ö.â.t.3ä..|]üU.Š.Š.V/..Á^ 000020
 8804C483 098512C6 9A530600 87E90374 400A47F6 2600C1E9 0375830A 47F62606 .&-G..u.Ôé.&-G.ət.Õñ..S.6....á.. 000040
 FF0876FF FA468907 EC878BE3 D10803E3 D1088BF9 F7000C89 9906F82D 064688F0 Þ.F.-%..¿..K*.ÄiD.ÄiD..Š..F*.v.. 000060
 697CC008 02C48309 831E6A9A 50E42A08 478A2606 5EC404C4 8309970F 4E9A0676 v..N....á.á^.&.G.*öP.j.*..á..â|i 000080
 568CFC46 89F2468D 08C48309 D80C7C9A 5016F046 8D501E06 EC886674 00FA7E83 .-*.tf|Š..P.Fb.P.|.Ä..á..F..F=.V 0000A0
 9004E808 C48309F3 224A9A50 16F0468D 501E06EE 8815745C FE7F8026 FC5EC4FE ±á^=&..±\t.¡V..P.Fb.P.J"µ..Á.Š.. 0000C0
 22AC9A50 16F0468D 08C4830A 0022909A FA76FFFC 76FFFE76 FF50000A 88FC4EFF .N=|..P.v±.v=.v*.."...6..Fb.P.¯" 0000E0
 83EC8855 90C850E5 885EC688 000A47C6 26065EC4 FFFF8E03 74C00804 C48308CD ë..á..ât./..á^.&6G...ó^.|]ù.U.Š. 000100
 76FF0876 FF0A76FF 0C76FF50 FE76FF1B 740008FE 5689FC46 890A441E 109A04EC Š....D..F=.V±.Ät..v±P.v..v..v..v 000120
 46890704 88560CEC 83EC8855 90C850E5 8899C028 9004E80C C483095A 10209A06 .. .Z..á.Š..+Ä..|]ù.U.Š.Š.V¡...F 000140
 76FFFC76 FFF08804 C4830A90 11389AF6 76FF1EFC 568CFA46 890A468D F85E8CF6 -.^%.F..F*.V=..v-.8....á..Þ v=.v 000160
 9A56F676 FFF876FF F446890C C4830AA2 13569AF6 76FFF876 FF0676FF 0876FFFA *.v..v..v%.v-.V.Ä..á..F¶.v%.  V. 000180
 0C899906 F8200646 885602EC 83EC8855 90C850E5 885EF446 8806C483 0A25121A ..%..á..F¶^.|]ù.U.Š.Š.V.F.-%.... 0001A0
 400A47F6 26077483 0A47F626 065EC4FE 468907E8 05E001C1 03E001C8 88F9F700 .%*.à|Á.ëiÁ.Ò..F±6^.&-G..t.&-G.ə 0001C0
 88010A4F 802690E9 E8200A4F 80260874 020A47F6 26065EC4 008FE9FF FF880674 t.¡..Õ«.á^.&-G..t.&.O. ŠÖ.&.O... 0001E0

Dump of file SATURN:[PCCOMMON.DUMP.PBIN]DBDEFIN.EXE;1 on 18-APR-1990 10:54:23.48
File ID (378,14,0)   End of file block 32 / Allocated 32

Virtual block number 9 (00000009), 512 (0200) bytes

 D803E3D1 D888F9F7 000C8999 06F820C3 8827750C 0A47F626 065E88F8 2780FE5E ^±.'=.^.&-G..u'.Ù-%..¿..K*.ÄiD.Ä 000000
 57882606 47882606 5EC49013 E804C483 0462E806 76FF0600 750107E8 87F6E3D1 ÌD-.Ò..u...v.Òb..á.Š..á^.&.G.&.W 000020
 50E42A08 478A2606 77FF2608 77FF2606 5EC40277 FFFE5E88 02578926 07892608 .&..&.W..^±.w.á^.&.w.&.w.&.G.*ôP 000040
 80057400 047F8326 1C75FFFF 300574C0 08044789 26065EC4 08C4830A 741E949A ...t..á.á^.&.G..át.=..u.&....t.¯ 000060
 8E2607FF 26378826 044FFF26 90FF4FE9 00000447 C7260A47 08261080 9003E820  Š..¯.&.G.&úG...Õ0..&.0.&.7&..&. 000080
 5DE58801 FE4F8026 0574C308 C08C065E C4EC8855 C85DE588 5EE42A04 8A260247 G.&..*ô^.|]üU.Šá^..á.ût.&.O±..|] 0000A0
 088AA312 740025E8 08750008 8A3E831E 73FFF130 06468857 5602EC83 EC8855C8 üU.Š.Š.VW.F.=þ.s..>...u.Ö%.t.Ê.. 0000C0
 C85DE588 5E5F02C4 8308631F EA9A0676 FF087500 78E80574 0018E815 750082E8 Ò..u.Ò..t.Òx.u..v..ô.c..á. ^.|]ù 0000E0
 949A5002 80510E4F 8D50501E C033FE5E 89FEE383 43065E88 0776065E 3900F088 Ēþ.9^.v..^.C.D±.^±38.PP.O.Ō¯.P.. 000100
 FE5E8800 08A3DA8E 0574D208 088EA308 8C1687C2 883874FF FA8308C4 8308F521 Ì%..á..*.t8.ô....Ê...@t..ÖÊ...^± 000120
 06A3000D 05000AA3 01478D00 02A30000 A3000A88 0C478948 480008A3 C033088E .Ä3âÈ..HH.G.¡..Ê..Ê...G.Ê.....Ê. 000140
 88EC8855 C3D98EC1 8CD20813 8EE8088E 1E8ED833 064E88C0 8ED88CC3 1FD88C00 ..Ä.ú.Ä.á.N.3Ù....Ò/..@.ê.|üU.Š. 000160
 A4027401 A8C78806 7EC401F7 AEF2FFFF 89C033C0 8ED88CFE 880A76C5 1EDE88D7 ¤.8.év..±.Ä.á3Ä¿..ÚÄ|á-..ú´.t.Ê 000180
 0A7EC406 76C51EDE 88D788EC 8855C85D C28C1FFA 88F388A4 F3C913A5 F3E9D149 ||ÔæÊ.èæÊ.µ.*..ö|üU.Š.ø.8.év.á-. 0001A0
 88EC8855 00C850FA 88F3881F FFFF10C0 180574A6 F3F928D1 F7AEF2FF FF89C033 3â¿..·ÚÄ|+*µ|t..á.....µ.*]ù.U.Š. 0001C0
 56880646 885606EC 83EC8855 00C850FA 889149D1 F7AEF2FF FF89C033 067EC407 æá-.3â¿..·ÚÄ||..*]ù.U.Š.Š.V.F..V 0001E0

Dump of file SATURN:[PCCOMMON.DUMP.PBIN]DBDEFIN.EXE;1 on 18-APR-1990 10:54:23.48
File ID (378,14,0)   End of file block 32 / Allocated 32

Virtual block number 10 (0000000A), 512 (0200) bytes

 0DE8E42A 078A2606 FA068E06 F806FF06 F81E8813 7806FC0E FFFE5689 FC468908 ..F=.V±..=.x...%...%...*.&..*ôŠ. 000000
 39085688 06468825 75FFFE83 1A740AFE 83F08804 C4830C21 0A809A50 1E06F888 ¡%..P.¯.|..á..Þ.±.t..±.u%.F..V.9 000020
 5EC4900F E8085688 06468800 07C626FC 5EC41EE8 99C02805 75FE5639 0A75FC46 F=u.9V±u.+á.Š.á^=&6...F..V.Š..á^ 000040
 4E880A7E C40676C5 1E5657EC 885590C8 5DE5885E 909CE8FC 46FF0788 26C688FC =.6&...F=Š..^.|]ù.U.&VV.év.á-..N 000060
 0277E33A 0672E73A 47461C74 C00A2074 E40A058A 26248A20 865A8341 873EE30E .D>ñA*ZN .$&...Õt .ât.F..Ór.:Dw. 000080
 F7494902 72000089 0974E03A C93307E2 0875E03A C6020277 C33A0672 C73AE602 .|:úr.:Úw..ó:Äu.&=3è:Ät.¿...r.||% 0000A0
 F01EFF04 740006F2 3E830D28 0ED69A50 00FC88EC 8855C850 E5885F5E 1FC188D1 |.ê.^_.|]üU.Š|=.P.ø.(..>...t...Þ 0000C0
 E032ACFC E4320042 89F63356 F7C2E900 0288C850 E5880004 0ED69A50 00FF8806 .|..P¯ø.â..|]ù¡..ÖöXV3-¿8.2ô=¯2Ä 0000E0
 068F06F4 068FCB5E 0001880E 0A0ED69A 50000188 00E800CA 9A117455 F480F8E2 â=.¶Ut..Ò.Ò.¡..P.ø...¡..^ù..¶... 000100
 FE2440C7 8846FA75 AE46AEF2 0674053A 26FFFFB9 FF33F633 C0330254 068E06F6 -...T.3á3-3.¿..&:.t.·ÚFÔu*F.üə±± 000120
 FE03F888 CF880687 168C0685 A3F763E9 00098806 7300C1E8 C603E6D1 E6D1FE88 .±||||.6òè.s.¡..ÒcXÊç...ñ..Ù.%.± 000140
 5FA7F300 0689065E 8F575651 1075065E 06382604 8828E349 0716F633 1F06D888 .Ä..3-..ID+..&;.^.u.QVWe^.¿..µ|_ 000160
 161F1602 4F89260F 892605E2 FA75C00A AAAC04C3 8302578C 263F8926 0A74595E ^Yt.&.?&.W..Ò.¯¯.âu*á|&..&.O...¯ 000180
 74964010 74C238AD 08F68E06 5688C08E D88E0008 885756EC 88550006 F42EFF07 ...¶..U.&VW|...Ä.â.V./-.Ù;ôt.ə.t 0001A0
 0EA69A06 76FF57EC 88550002 CA5DE588 5E5F96E8 E8F788AE F2FFFFB9 C033970C ..3ô¿..·O.%ŠŠ._^.||ò..U.&V.v...|. 0001C0
 9A501651 521E5300 0288C488 5049D1F7 AEF2FFFF 89C033FA 88921F74 C0080E13 ...&t...*3â¿..¯ÚÄ||P.6E..S.RO.P. 0001E0
```

```
Dump of file SATURN:[PCCOMMON.DUMP.PBIN]DBDEFIN.EXE;1 on 18-APR-1990 10:54:23.43
File ID (378,14,0)   End of file block 32 / Allocated 32

Virtual block number 11 (0000000B), 512 (0200) bytes

C98049C8 88197202 561E3826 72D80302 5C1E885A 0002CA5D E5885F58 0000FFFF ....{_.|)ò..Z..\..Är&;.V.r..ùl.è 000000
72D828DC 880EE8F8 025C1E87 02560E89 490C7558 C0850000 FFFF9A1E 5150410F .APO........âXu.I..V...\.%$..É•Ár 000020
080A47F6 26357483 0A47F626 065EC4EC 885500E2 FFC388E3 88027208 A01E3808 .;...r..D.û.â.U.$â^.&-G..t5&-G.. 000040
07892699 C028F70A 67802606 5EC404C4 830EE008 AC9A0677 FF260877 FF262E74 t.&.w.&.w..¯.Á..ô.ô^.&.g.%•â.&.. 000060
2D044688 08A206FF 04EC83EC 8855C850 04478926 08578926 06478926 02578926 &.W.&.G.&.W.&.G.|üU.$.$...Á..F.- 000080
08C19A50 020088FE 5E8CFC46 8907E805 E0D1C103 E0D1C888 F9F7000C 899906F8 %..¿..%'.àlÁ.èlÁ.Ò..F•.^t¡..P.è. 0000A0
0247C726 FC5EC408 0A4F8026 10740008 08578926 06478926 045EC402 C4830F8D m..ô.ô^.&.G.&.W..Ät.&.O..á^•&uG. 0000C0
C726FC5E C4085789 26064789 2640FE56 88FC4688 040A4F80 26045EC4 20E80200 ..$ ô^.&.O...f•.Vt@&.G.&.W.á^•&ü 0000E0
C350E588 00000447 C7260257 89260789 26085788 26064788 26045EC4 00010247 G...ô^.&.G.&.W.&..&.W.&üG....|)ü 000100
99C02813 74007730 0C740072 30277400 6130980 7 8A260A5E C4560AEC 83EC8855 U.$.$.Vô^.&...=ø.t'=r.t.=w.t.•à. 000120
90F4E801 098E90F1 E802FC46 C603018E 9022E800 018901FC 46C6F628 9000EFE9 Õÿ..•-óF•.¿..Š".∫..óF•.Şb.∫..S¶. 000140
74C90837 74003F80 260A5EC4 0A46FF80 FC46C6FE E6830002 CE814375 0002C6F7 %ó..uC.ö...|tóF•..F.ô^.&.?.t7.èt 000160
E84000CE 810E75C0 00A9C688 15750074 3D137400 62300674 002B3098 078A2633 3&...=•.tø=b.t.=t.u..ó`.àu..ö.ə$ 000180
FF0876FF 565001A4 88FE4E89 8DE88000 CE8190C4 E8C92805 74C000A9 C6889000 Á..ó`.Át.•èŠâ..ö..S§.N‡¦€.PV.v.. 0001A0
06FF0A47 8826FC46 8A0E5EC4 FF69E903 7DC008FA 468908C4 830FC025 0E9A0676 v...Xâ..â..F".ô).Õi.ô^..F•R.G... 0001C0
F85E88C0 2AF84689 07E805E0 D1C103E0 D1C888F9 F7000C89 9906F820 C38808A2 Á..û-%..¿..%'.àlÁ.èlÁ.Ò..F½*à.^½ 0001E0

Dump of file SATURN:[PCCOMMON.DUMP.PBIN]DBDEFIN.EXE;1 on 18-APR-1990 10:54:23.48
File ID (378,14,0)   End of file block 32 / Allocated 32

Virtual block number 12 (0000000C), 512 (0200) bytes

26025789 26078926 99C0280E 5E880000 0447C7F8 5E880447 89260E5E 88980788 ....^.&.G..^%úG....^.•â.&..&.W.& 000000
FF5604EC 83EC8855 90C850E5 885EC28C C3880847 8826FA46 8A085789 26064789 .G.&.W..F'&.G..ù.ô^.|)ù.U.$.$.V. 000020
81307507 10067E81 13E80000 FE46C707 75116208 7E810E75 0704067E 8108A206 .Á..-...u..~.b.u.úF‡..Š..~...u0. 000040
F9F7000C 899906F8 20C3881A 750C0A47 F626065E C40001FE 46C72975 0EAC087E -.¯.u)úF‡..ô^.&-G..u..ù-%..¿..%' 000060
64C681E6 D302B1FE 76889090 0081E9C0 28077401 07E887F6 E3D1D803 E3D1D888 .ÀlD.ÀlD-.Ò..t.•âÕ.....v‡Ý.#|.ód 000080
06468802 74000802 54890489 02C48312 5908C19A 50020088 15750244 08048808 ....D.u.|..P.ê.Y..ô....T..Át@.F. 0000A0
D1E601FE 7688065E C4FC4689 07E805E0 D1C103E0 D1C888F9 F7000C89 9906F820 -%..¿..%'.àlÁ.èlÁ.Ò..F•ô^..v‡||| 0000C0
44890200 88FC7688 02578926 07892608 57892606 47892608 66948808 64848 8E6 |..d...f.&.G.&.W.&..&.W..v•|...D 0000E0
04EC83EC 8855C850 E5885E00 0188020A 4F802606 5E881107 C6DE8804 47892602 .&.G..Bó...^.&.O..(..^.|)üU.$.$. 000100
067E83FE 5E8CFC46 8907E805 E0D1C103 E0D1C888 F9F7000C 899906F8 2008468B .F.-%..¿..%'.àlÁ.èlÁ.Ò..F•.^‡.~. 000120
C00802C4 83126828 A49A50E4 2A08478A 26085EC4 75741007 F626FC5E C4517400 .tOô^•&-..tuô^.&.G.*ðP.€(k..â..ô 000140
085EC400 000247C7 260007C6 26FC5EC4 04C48312 AA12C69A 0876FF0A 76FF5F74 t..v..v..ó.`..ô.ô^•&ó..&üG...ô^. 000160
085EC424 741007F6 26FC5EC4 20E80857 89260647 89260257 89260789 2699C028 +Ẑ.&..&.V.&.G.&.W.Š-ô^•&-..t$ô^. 000180
C48310C5 12C69A08 76FF0A76 FF0E74C0 0802C483 128C28A4 9A50E42A 08478A26 &.G.*ðP.€(V..â..ât..v..v..ó.é..ô 0001A0
0A47F626 5A75023C 03240A47 8A26065E C4F62856 04EC83EC 885590C8 50E58804 ..|)ù.U.$.$.V•-ô^.&.G.$.<.uZ&-G. 0001C0
065E8839 740107E8 87F6E301 0803E301 0888F9F7 000C8999 06F820C3 881A7508 .u..ū-%..¿..%'.ÀlD.ÀlD-.Ò..t9.^. 0001E0

Dump of file SATURN:[PCCOMMON.DUMP.PBIN]DBDEFIN.EXE;1 on 18-APR-1990 10:54:23.48
File ID (378,14,0)   End of file block 32 / Allocated 32

Virtual block number 13 (0000000D), 512 (0200) bytes

CC9A50E4 2A08478A 260677FF 260877FF 2650287E C008FC46 89064728 26078826 &..&+G..F=.&-(P&.w.&.w.&.G.*ðP.& 000000
57882606 47882606 5EC4FFFF 8E200A4F 8026065E C40874FC 463808C4 8311AF26 &€..&.;F»t.&^.&.O. /..&^.&.G.&.V 000020
2122CA9A 000A88EC 885590C8 50E5885E C6880000 0447C726 02578926 07892608 .&..&.W.&üG.....ð^.||ü.U.$|...ð"| 000040
F6A30856 88064688 0A121689 0A10A310 56880E46 880A221E 8C0A20A3 0A268813 .|&.È ...".F..V.È.........F..V.È- 000060
1E06C703 18E90374 25F67E80 039DE900 000A1A06 C700000A 1C06C709 F8168909 ...%.ü.....ü.....Ö...-Xt.Ö..ü.. 000080
0A0EA309 F4A309FA A30A14A3 0A16A309 FEA30A18 A309FCA3 0A00A3C0 2800010A ...+8È..È=.È..Ès.È..È..È*.ȶ.È.. 0000A0
260A5E88 903EE800 30088606 C70A46FF 49753001 7F80260A 5EC40020 088606C7 ü.. .&^.&...Ou[.F.ü...O.$>...^.& 0000C0
FF1A7500 0A003E83 0E75203F 80269028 E800000A 1406C70A 0006FF00 75283F80 .?+u.....ü....$(.&.? u..>...u.. 0000E0
260A5E88 0A46FF0A 0E06FFC7 752D3F80 260A5EC4 0DE809F4 06FF9014 E80A1406 ...$....¶.$.&^.&.?-uü.....F..^.& 000100
C48308F2 E80E501E 0A24880A 76FF0C76 FF0075C0 0802C483 09AAE80E 5098078A ...P.Ò^..&..&uf.v..v.|$..P.Ò..& 000120
74000A0E 3E830A24 A308F70A 24A10A0E 06FF0C7D 000A243E 830C5689 0A468908 ..F..V..>$..).....ÀS.¥ÀÈS..>...t 000140
FF060A46 FF0A1606 FF2E752E 3F80260A 5EC40020 088606C7 06753008 863E8300 ..>..Ou.ú....&^.&.?.u.......F.... 000160
010A1E06 C70A7D00 0A1E3E83 0C56890A 468908C4 8308A5E8 0E501E0A 1E880A76 v.|...P.ÒÈ..&..F..V..>...).ú.... 000180
0675006C 30287400 68304074 004E3030 74004630 98078A26 0A5EC40A 160EFF00 .....&^.&....=F.t==H.t0=h.t»=l.u. 0001A0
003F8026 0A5EC40A 46FF0375 4C3F8026 0A5EC409 750009FE 3E830002 09FE06C7 ü.$....>t...u.&^.&.?Lu..F.&^.&.?. 0001C0
8A26C8E8 000809FE 06C7D0E8 001009FE 06C7D8E8 000109FE 06C79002 5CE91C75 u.Ö\..ü.$....$Àü.$...$Àü.$...$À&. 0001E0
```

Dump of file SATURN:[PCCOMMON.DUMP.PBIN]DBDEFIN.EXE;1 on 18-APR-1990 10:54:23.48
File ID (378,14,0)   End of file block 32 / Allocated 32

Virtual block number 14 (0000000E), 512 (0200) bytes

```
30F8468B 20F84683 09FC06FF 08750058 30057400 47300A74 00453DF8 46899807 ...F½=E.t.=G.t.=X.U...•..F½ .F½= 000000
67E9014C E9037500 25300160 E9037E01 49E90375 00633001 9FE9037E 78740069 l.tx~.Õ..=c.u.Õl.~.Õ'.=x.u.ÕL.Õg 000020
1EC400E8 00000247 C7260789 260A1AA1 1FC4260A 101EC415 750209FE 3E839001 ...>±..u.á...&á.À..&..&ÚG...Š.á. 000040
74000A1A 3E83017E E9037500 0A1C3E83 040A1006 83078926 0A1AA11F C4260A10 ..&á.À..&........>...u.Õ-..>...t 000060
09F406C7 0A1806FF 018AE9FF FF8801BD E9037520 0A47F626 09F61EC4 01CBE903 .Õù.á.-.&-G. u.Õ§.|..Õп.....ú.¶. 000080
06FF09FC 06FF09FA 06FF90F0 E800088B 90C1EB02 C48301AC E80E5000 0AB80000 ..|..P.Õ¯..á.Šê.|..Šb...•...•... 0000A0
468909FE A3C0287E 740109FE 3E830085 E9037508 09FE3E83 00040A1E 06C70A16 ..ú......>±..u.Õ...>±..t~•âÈt..F 0000C0
2E839090 13E80000 0A2406C7 0A74000A 0E3E83FA 46890A24 A128740A 240639FA •9.$.t(À$..F•.>...t.ú.$...Š..... 0000E0
8802C483 013AE80E 50001088 020A1006 830A24A3 C028027D C0080A24 A1050A24 $..À$..á).•âÈ$......|..P.Õ:..á.| 000100
0A24A300 052DFA46 88157400 0A0E3E83 227400FA 7E8302C4 8304A1E8 0E50003A :.P.ÕÀ..á..-•.t".>...t..F•-..È$. 000120
8300F7E8 0E500010 B8040A10 2E830000 0A2406C7 9007E80A 24A3C028 0270C008 .á).•âÈ$.Š..ú.$........|..P.Õ¼.. 000140
90F3E800 0188FF30 E90277E8 0E50C028 FF35E900 1088FF06 E9020A10 068302C4 á......Õ..|..Õ5.•âP.Õw.ÕO.|..Šæ. 000160
6530FEFE E9037500 643090FF 15E90436 E80E5000 2588FF20 E90355E8 0EF876FF .v½.ÕU.Õ .¡%.P.Õ6.Õ...=d.u.Õ±±=e 000180
89400C56 880A4688 0A4EFF0C 56880A46 88097400 09FE3E83 D87E0067 30057C00 .|.=g.-Ã.>±..t..F..V..N..F..V.ə. 0001A0
FED6E903 7500703D FED8E903 75006F30 FE72E903 75006E30 903AE8FE 5689FC46 F•.V±Š:.=n.u.Õr±=o.u.ÕÄ±:ρ.u.Õø± 0001C0
46FF9034 E80A46FF 9081E8FF 75E90375 007830FE A8E90375 00753088 74007330 =s.t.=u.u.Õ¨±=x.u.Õu.ŠŸ..F.Š4..F 0001E0
```

Dump of file SATURN:[PCCOMMON.DUMP.PBIN]DBDEFIN.EXE;1 on 18-APR-1990 10:54:23.48
File ID (378,14,0)   End of file block 32 / Allocated 32

Virtual block number 15 (0000000F), 512 (0200) bytes

```
E80E0A76 FF0C76FF 500A4628 C388EC75 253C0474 C00AF646 88078A26 FC5EC4FC =á^=&...F-.ât.<%uš.Ú+F.P.v..v..Ò 000000
53E90374 C00AF646 88078A26 0A5EC40C 56890A46 89FE5688 FC468806 C483045E ^..á..F•.V±.F..V.á^.&...F-.ât.ÕS 000020
3E835657 12EC83EC 8855CB50 E5880A1A A1FE43E9 0374200A 47F62609 F61EC4FC •á.-.&-G. t.ÕC±À...Ì]ÙU.&.&.WV.> 000040
09FE3E83 07740209 FE3E830A 1806FF04 740A067E 83002008 8606C706 74000A16 ...t.ú... ..-..t......>±..t..>±. 000060
0A183E83 902CEB04 0A100683 FE5689FC 46890257 88260788 260A101E C4197510 .u.á...&..&.W..F•.V±.....Š,..>.. 000080
89FC4689 99078826 0A101EC4 0EE80000 FE46C7FC 46890788 260A101E C4117400 .t.á...&...F•úF±..Š.á...&....F•. 0000A0
84A3C028 9003E806 46880674 FE4608FC 46880E74 0009F43E 83020A10 0683FE56 V±......>¶..t..F•.F±t..F.Š..•âÈ. 0000C0
750A067E 83287000 FE7E8331 75000A18 3E83F456 89F24689 0A221688 0A20A108 .À ...".F .V¶.>...ul.-±.)•.-..u 0000E0
46C7FE56 89FC4689 DAF700D2 830BF7FE 5688FC46 882D07C6 26F246FF F25EC41D .á^ .F &6.-.F•.V±¾Ã.Ø.¾Ö.F=.V±úF 000100
9AFC76FF FE76FF50 1E0676FF FA5E8CF8 46890A02 B80000F6 46C79006 E80001F6 -..Š..úF-..|...F½.^•.v..P.v±.v=. 000120
0A1E0E88 04C48313 5F0CDC9A F876FFFA 76FF4574 000A163E 830AC483 1857289A .(V..á..>...tE.v•.v½.É._..á..... 000140
C62605E8 F27EC4F0 4E880000 088406C7 06750808 843E8300 7EC908F0 4E89C828 •â.Nb.è-..>...u.ú......Ñbá~ Š.&6 000160
F85EC4F2 76C5EE5E 8C09FC0E 88F04E89 F4468CF2 7E89F47F C00849C1 88473005 .OG.èl.â.¶.-·.F¶.Nb..•..^Ÿév á^½ 000180
F45E8CF2 7689E375 003F8026 F846FF46 202C8003 7C613C07 74C90804 88078A26 &.....èt.<a|..., F.F¾&.?.uÕ.v·.^¶ 0001A0
C02802EB 00018805 7500F67E 8308740A 1406080A 00A11475 000A183E 83EE5E8E .^¶.>...u.À......t..--.u.|..Š.+â 0001C0
A10001BE 18740006 7E835657 10EC83EC 8855CB5D E5885F5E 02C48303 11E80E50 P.Õ...á.^_.Ì]ÙU.&.&.WV.-..t./..À 0001E0
```

Dump of file SATURN:[PCCOMMON.DUMP.PBIN]DBDEFIN.EXE;1 on 18-APR-1990 10:54:23.48
File ID (378,14,0)   End of file block 32 / Allocated 32

Virtual block number 16 (00000010), 512 (0200) bytes

```
260A101E C4137408 09FE3E83 008FE902 0A100683 FA5689F8 46890A12 16880A10 .......F½.V•.....Õ...>±..t.á...& 000000
0683FA5E 8CF84689 FC468907 88260A10 1EC410E8 FA5689F8 46890257 88260788 ..&.W..F½.V•Š.á...&...F•.F½.^•.. 000020
73880975 00FC7E83 900AE808 6C881575 FA4608F8 46880E74 0809FE3E 83040A10 ....>±..t..F½.F•u.|l.Š...~•.u.|s 000040
E80A1E0E 881C740A 163639F6 28F45689 F24689FA 5688F846 88FA5E8C F8468908 ..F½.^•.F½.V•.F·.V¶•-96..t.....Š 000060
3F8026F2 46FFF25E C44690ED E8107ECE 38461574 003F8026 F246FFF2 5EC4900E ..á^·.F·&.?.t.F;ð-.ŠÚ.Fá^·.F·&.? 000080
0EF876FF FA76FF56 02C48301 5FE80E57 0875000A 0E3E83FE 280A243E 88F37500 .uæ.>$.•±.>...u.W.Õ ..á.V.v•.v½. 0000A0
83EC8855 90C850E5 885F5E02 C4830142 E80E5708 74000A0E 3E8306C4 830180E8 Õ§..á..>...t.W.ÕB..Ĩ.^_.Ì]ù.U.&. 0000C0
9003E801 80057547 067E8306 7467067E 83FE5689 FC46890A 1216880A 10A106EC &.À.......F•.V±.-.gt..¯.Gu.¯.Š.. 0000E0
C7067500 0A1E3E83 0D7400FA 7E800006 0A1E06C7 0675000A 163E83FA 4688C02A •â.F•.>...u.û......-•.t..>...u.û 000100
068EFC76 FFFE76FF 0A2036FF 0A2236FF 0676FF0A 1E36FF09 FC36FF00 010A1E06 ......6•..6...v..6"..6 ..v±.v=.. 000120
8E0A2036 FF0A2236 FF147500 09F43E83 187400FA 7E800EC4 8308A41E FF2608E8 Õ.&..£..á..-•.t..>¶..u..6"..6 .. 000140
2036FF0A 2236FF14 75000A1E 3E831874 0009F43E 8304C483 08A81EFF 2608E806 .Õ.&..´..á..>¶..t..>...u..6"..6 000160
740A1406 080A00A1 00000884 06C7080A 10068304 C4830880 1EFF2608 E8068E0A ...Õ.&..¯..á......ú.....À......t 000180
0E50C028 02E80001 880574C0 0804C483 08841EFF 2608E806 8EFC76FF FE76FF18 ..v±.v=..Õ.&..Ç..á..ât.|..Š.+âP. 0001A0
06468A15 78044FFF 2609F61E C4307500 0A1C3E83 56EC8855 90C850E5 880133E8 Õ3..Ì]Ù.U.$V.>...u=á.-.&.O.x..F. 0001C0
83183823 869A0676 FF5309F8 36FF9011 E8E42A04 88260247 8E2607FF 26378826 &.7&..&.G.&..•ÕŠ...6½.S.v...#;.. 0001E0
```

```
Dump of file SATURN:[PCCOMMON.DUMP.PBIN]DBDEFIN.EXE;1 on 18-APR-1990 10:54:23.48
File ID (378,14,0)   End of file block 32 / Allocated 32

Virtual block number 17 (00000011), 512 (0200) bytes

0A1C3E83 565702EC 83EC8855 90C8505E 0A1A06FF 9005EB0A 1C06FF07 754006C4 å.ðu.....Š......^]ù.U.š.š.WV.>.. 000000
06C48318 A723869A 088636FF 09F636FF 09F836FF 18EB507E F6080676 88577500 .uW.v..--PŠ..6½..6-..6....#1..á. 000020
FF263F88 260886A0 D478044F FF2609F6 1EC41E7E C0084EC6 880A1C06 FF047540 ðu......óN.â-.á.-.&.O.›'...&.?&. 000040
C850E588 5F5E0A1A 06010646 88077500 0A1C3E83 D4E8E42A 05882602 478E2607 .&.G.&..*öŠå.>...u..F...  ^_.[]ù 000060
26065EC4 09F636FF 09F836FF 22E85E75 000A1C3E 830A7688 565702EC 83EC8855 U.š.š.WV.v..>...u^Š".6½..6-.á^.& 000080
F61EC425 74C0084E C6880646 FF0A1C06 FF047540 06C4831C 1D23869A 5098078A ...P..#...á.ðu......F..óN.ât%á.- 0000A0
E42A0588 2602478E 2607FF26 3F882609 F61EC407 8A26065E C4CD7804 4FFF2609 .&.O.xëá^.&..á.-.&.?&..&.G.&..*ö 0000C0
0A20A156 0CEC83EC 8855C850 E58B5F5E 0A1A0601 0A468807 75000A1C 3E83CAE8 Šö.>...u..F.....^.[]ùW.š.š.VÀ . 0000E0
8318420C DC9AF476 FF520A24 3688FA46 89FC4689 C028F656 89F44689 0A221688 ..".,F¶.V-+å.F•.F¯.6$.R.v¶.É.B.. 000100
3E834E01 75080884 3E8308E8 02EE8305 75100884 3E830676 28F028F8 468904C4 á..F½+b+v..>...u..Ÿ.Š..>...u.N.> 000120
67E80E50 98078A26 F446FF12 75300886 3E831975 2D3F8026 F45EC422 75000A0E ...u"á^¶&.?-u..>..Ou..F¶R...P.Òg 000140
FF077400 067E8318 74000A0E 3E83077E F6080874 3008863E 83F84EFF 02C483FE ±.á..N½.>..Ot..--..>...t.-..t.. 000160
FE74E80E 56297500 0A0E3E83 0072E80E FC46FF07 74000884 3E830068 E80EFA46 F•.Òh..>...t..F•.Òr..>...u)V.Òt± 000180
047500FC 7E830A74 0008843E 83003BE8 0E047500 FA7E830A 7400067E 8302C483 .á..~..t..-•.u..Ò;..>...t..-•.u. 0001A0
20088606 C70E7400 0A0E3E83 06C483FE AFE80EF4 76FFF676 FFF876FF 0042E80E .Ò8..v½.v-.v¶.ÒE±.á..>...t.ù...  0001C0
E80E5000 208803E8 00288805 74000A00 3E83C850 E5885E02 C483FE2E E80E5600 .V.Ò.±.á.^.[]ù.>...t.¡•.Š.¡ .P.Ò 0001E0

Dump of file SATURN:[PCCOMMON.DUMP.PBIN]DBDEFIN.EXE;1 on 18-APR-1990 10:54:23.48
File ID (378,14,0)   End of file block 32 / Allocated 32

Virtual block number 18 (00000012), 512 (0200) bytes

88057400 09FC3E83 17751008 843E8302 C483FD8A E80E5000 3088C802 C483FDC6 ó».á.ù¡O.P.Òn».á..>...u..>•..t.¡ 000000
0A5EC400 01FE46C7 565706EC 83EC8855 C802C483 F09CE80E 50007888 03E80058 X.Š.¡x.P.Ò.».á.ùW.š.š.WVúF±..á^. 000020
75203F80 260A5EC4 9061E80A 46FF020A 10068337 88260A10 1EC41275 2A3F8026 &.7ªu.á...&.7......F.Šà.á^.&.?-u 000040
0A163639 3C7F393C 407C303C FA468807 8A260A5E 88F6280A 46FFFFFF FE46C708 .úF±...F.+-.^.&...F'<0|à<9.<96.. 000060
E1D1E1D1 CE889805 8A261C7F 39308026 06E8F888 00300886 06C70675 303C0A75 u.<0u.ú...0..«Š.&.=9..&....öiÀiÀ 000080
C4F088EE F7FE4688 0C468C0A 7E890E7D 30308026 47F18830 E983C803 E1D1CE03 .ðiÀ.à.Ò0.bG&.=0)R.-..F..F±¥Ÿ.bá 0000A0
8CFC4689 087A8857 04EC83EC 885590C8 50E5885F 5E0C5688 0A468837 8926065E ^.&.7.F..V.^_.[]ù.U.š.š.Vjz..F•. 0000C0
E8FE468C FC7E8900 0188F475 00382611 74003D80 264701E8 FC7EC406 4E8AFE5E ^±.N.á-=Š.G&¯=.t.&8.u¶¡...~•.F±Š 0000E0
C4FE5E8C FC468906 F88804EC 83EC8855 90C850E5 885FC028 FE468CFC 7E899009 ...-=.F±+å .[]ù.U.š.š.¡%..F•.^±á 000100
26078926 08578926 06478926 990A4788 26044789 26C02825 75830A47 F626FC5E ^•&-G..uX+ä&.G.&.G..&.G.&.W.&..& 000120
0862163B C3750860 06380CFC 4683C28C C38817E8 C28CC388 FF0847C6 26025789 .W.&6G...ù.ôŠ..û.ô.F•.;.'.uù;.b. 000140
C8E9048C E9C03300 098A0872 06851E38 065E88EC 885590C8 50E58899 C0288075 u§+å..[]ù.U.š.^.;...r.¤..3àõŸ.Òà 000160
38065E88 C03308EC 83EC8855 C850E588 00068787 C6F375C0 850000FF FF9A5304 .S......âuæó.....[]ùW.š.š.3à.^.; 000180
74080687 87F6087E C40C4E88 D2335745 75020687 87F64CE3 0C4E883F 7306851E ...s7.N.DL-....uEW30.N.á-.-....t 0001A0
5F0000FF FF9A5016 FA468051 5706530A 069887C6 4942AA08 740A3C06 98878A10 ......<.t.`BIó....S.WO.F'.P.....  0001C0
56F80687 A780C850 E5880475 80068787 F6C203FA 46880450 E900098A 0674C008 .ât.¤..ÕP..F'.ó-....u..[]ù.Ì..«V 0001E0

Dump of file SATURN:[PCCOMMON.DUMP.PBIN]DBDEFIN.EXE;1 on 18-APR-1990 10:54:23.48
File ID (378,14,0)   End of file block 32 / Allocated 32

Virtual block number 19 (00000013), 512 (0200) bytes

1A3C1E74 C43AAC04 06878F80 2606750A 3C800084 28E3C888 FE880876 C5071E57 W..év..±.ÀD(Ç..<.u.&.....¯:át.<. 000000
7401F983 C850E588 5E5F1F06 08462BC7 88EAE247 058805E8 0206878F 80260875 u.&.....Š...Gãõ.ù+F....^.[]ù.•.t 000020
5016FA46 8D515016 F9468D53 1C750808 24744006 8787F626 E2E8E774 0A3C8007 ..<.tÓŠä&-...ðt$.Ùu.S.F•.PQ.F•.P 000040
8D515016 F9468D53 00F946C6 86E80A80 0309E95E 5F1F0607 74C00800 001ED89A .Ù....ât..._^Ò).¯.ŠÑóF•.S.F'.PQ. 000060
08068787 F6263574 010C7E83 3674FFFF FA46F70C 75C00800 001F619A 5016FA46 F•.P.¤....âüÈ¥F•..tó.-..tŠ&-.... 000080
468AFF6F E90F750A F97E8000 00FFFF9A 5016FC46 8D5008F7 5050FFFF 88531C75 u.S¡..PP¥ÄP.F•.P......-•.u.Õo..F 0000A0
D8080650 88EC8855 0099E8C5 750AF97E 80FF58E9 00800274 0A3C0698 878826F9 •&....<.t.¯.Õ(..-•.uéŠ..U.&.^..Ù 0000C0
750173E8 00058807 1E297500 3F830880 885756EC 8855C850 E58801FE 4F800474 t..O±..[]ùW.$VWE...?.u)..¡..Òs.u 0000E0
08863689 FFFEFE44 C704C683 000104C7 960882A3 0880A3FE 244024E8 99C03305 .3à.Š$à$±È..È...û....ó.ùO±±..6.. 000100
7788F273 EEF983FE E180FA74 4100CEE9 C850E588 5E5F0009 E8C08E08 8C064E88 .N..Ã.ÀÒ.._^.[]ùÒõ.At•.Ã±.•Ÿs·.w 000120
4489F788 000205C2 03347401 A8ADF003 00881573 C1384842 7401A8FE 88ADFC02 .•Ù.±¨.tBN;ès..Ã.bÙ¨.t4.ô....¥.D 000140
D13801BC DA8CC688 FE4CFEF9 0305E805 8948C128 FE4C89F9 030C74FE 88E6E8FE ±Šl.±t..•.L±•èH..Š..•±L±.6.Ö.1;1 000160
88F27401 A8ADF003 FE882574 FFFE3002 089206C6 26C3027F 89088E1E 8C260574 t.&.......üÀó....=±.t¥.±.bÙ¨.t·. 000180
C0080847 88E6E8FE 4489F788 000205C2 03E27401 A8ADF003 00888073 C13848FE ±N;ès§.Ã.bÙ¨.tã.ô....¥.D±Šl.G..å 0001A0
7788BCE8 3788088A 1E8E2605 74C73807 8CD88C11 7408920E FE2614E8 D88E0474 t..ÃŠ.&±...t..Ã.¤;ùt.&.....7ŠŸ.w 0001C0
E84E4E96 0574001C E8FE4DFE 0D74005E E8984040 01240D74 C638006A E8C03306 .3àÒj.;ót.$.ðð.Ò^.t.±H±Ò..t..NNŠ 0001E0
```

```
Dump of file SATURN:[PCCOMMON.DUMP.PBIN]DBDEFIN.EXE;1 on 18-APR-1990 10:54:23.48
File ID (378,14,0)   End of file block 32 / Allocated 32

Virtual block number 20 (00000014), 512 (0200) bytes

C82B0374 01A8FE45 8851C399 C0330247 89078808 8EA32604 74C138D1 8CD88C99 ..Ã.1;êt.&È.....G.3à.ùO.E±´.t.+à 000000
2BC22302 F70D72C2 031572C6 03C188F5 75EAD104 76089016 38267FFF 8A414149 |AAm..&;...v.lõuÑ.ê.ór..ór.%Ø#ó+ 000020
44C7F203 F08BFE8B 57187400 10E85152 C359C033 E575EAD1 D2F70875 000CE8C6 6ò..u.%Ølõul3àYuROÒ..t.W.±.Þ. ùÒ 000040
1F065000 01B85052 521E0233 5053C35A 5958FE55 894AD72B 06880677 89FFFEFE ±±..w..ø+#J.U±XYZùSP3Ø.RRP¡..P.. 000060
3875000A 7E830657 56EC8855 00C3020B 0274585A 1FFFFA83 08C4831A FD21949A ..!».ó..°..Z(t..Øù.U.$VW..-..uß 000080
44880074 F7381174 48065C36 884CE827 720057E8 07754806 46880856 88025C8F «\..V..F.Hu.ÒW.r'ŠL.6\.Ht.;%t..D 0000A0
885021EB 99FFFF8B 0675020B 0473065C FE8104C6 8334735E 003EE856 0E468902 ..F.VÒ>.^s4.6..±\.s..Øu.¡...$!P. 0000C0
07C03303 88065C36 89025C89 1489E675 C085F95B 0000FFFF 9A50C033 501652C4 ÄR.P3àP.....[°.âu|...\..6\..Æ3â. 0000E0
1C03DA88 2CE8F9F2 75065CFE 8104C683 0C74024C 39F7880E 4E88C85D E5885E5F _^.|]ù.N..%9L.t..ó..±\.u ¹$,.Ò.. 000100
890475F7 380E75C0 8500000F 269A5153 13730256 1E390675 F738C18E D3882672 F&.Æ.ê;%u.9.V.s.SO.&....âuÑ;%u.. 000120
C4FF758D AEF2FFFF 89C03306 7EC41EDE 88D788EC 885500C3 D1880487 92025616 .V.....|ù.U.$.ø.Ñ.ó~.3ó¿...Ù.u.ó 000140
D149A402 740001C6 F7064688 FE870846 8ED88EC0 8CF928D1 F7AEF2FF FFB90A7E ~.¿..ÚK|+°.ó.Ä.F..±.F.%ó..t.È|| 000160
83023306 46880C4E 88018357 56EC8855 C850C28C 1FFA88F3 88A4F3C9 13A5F3E9 ÕøÊ.êøÊ.ø.°..ò]ùU.$VW"..N..F.3Ø. 000180
C0850000 FFFF9A50 50C03306 76FF0876 FFEC8855 0689E908 7EC51E99 01750AF9 °.u...é~.Õ¿.U.$.v...v.3âPP......ó 0001A0
A15152C8 5152E388 057208A0 1E380872 0828DC88 5A5900C8 5DE58800 84E90374 t.Õ...|]ù.YZ.É+Är.;...r..DROÙRQÀ 0001C0
0C090C08 0C070906 00051804 02030202 1601089C 2EFFE2CC E9C03305 7540089C ..Ðu.3âÖäã...................... 0001E0

Dump of file SATURN:[PCCOMMON.DUMP.PBIN]DBDEFIN.EXE;1 on 18-APR-1990 10:54:23.48
File ID (378,14,0)   End of file block 32 / Allocated 32

Virtual block number 21 (00000015), 512 (0200) bytes

006C0859 00570D53 00520243 00410235 02121211 0010120F 1600160C 0808070A ................S.A.C.R.S.V.Y.l. 000000
7C168906 83A31608 0D000807 02CE08A4 00840982 0A810A80 16060972 1C702060 m p.r...........Ê.ö.ø.....Ê....| 000020
75E40A00 248922EE 880683A3 CB5DE588 99FFFF88 0008E8C8 50E58899 FFFF8806 .|....|]ùÒ..|....|]ùÊ..ÈŸ"¿$..Òu 000040
01478A2E 430176CA 3C0472BC 3C430A76 243C0472 133CF7E2 43431674 073A2E18 ..:.t.CCã%<.r.<$v.C<Vr.<òv.C..G. 000060
9906F82D C388FA46 89E42A08 478A2608 5EC45657 08EC83EC 885500C3 067CA398 .È|.ù.U.$.$.VVó^.&.G.°ô.F°.ù-½.. 000080
74400A47 F6260774 830A47F6 26F84689 07E805E0 D1C103E0 D1C888F9 F7000C89 ¿..¥°.âlÅ.élÅ.Ò..FÝ&-G..t.&-G.Ðt 0000A0
26200A4F 80260E74 010A47F6 26085EC4 900139E9 FFFF8820 0A4F8026 085EC40F .ó^.&.O. |..Ò9..ó^.&-G..t.&.O. & 0000C0
47F626FC 7689F088 04478926 C028EF0A 67802602 0A4F8026 90E2E800 000447C7 ùG...$ä.&.O..&.g.Ÿ+ß&.G..Þ.v=&-G 0000E0
7E813775 0107E887 F6E30108 03E30108 88F9F700 0C899906 F820C388 51750C0A ..ùØ.ù-½..¿..K°.ÄlD.ÄlD-.Ò..u7.- 000100
28A49AFA 76FF0F75 114D0A7E 81167507 10087E81 0E742436 0A7E8107 75070408 ...u..-.6$t..-...u..-.M.u..v°.È( 000120
881A7508 0A47F626 085EC404 C483E840 E80876FF 0A76FF0C 75C00802 C48324AE Ù$.ó..âu..v...v.ÒÐ$.ó.ó^.&-G..u.. 000140
26378826 085E8869 740107E8 87F6E301 0803E301 0888F9F7 000C8999 06F820C3 ù-½..¿..K°.ÄlD.ÄlD-.Ò..tl.^.&.7& 000160
F6080447 89264802 4588F87E 88025789 26078926 40085788 26064788 2606772B +w.&.G.&.V.Ð&..&.W..-½.E.H&.G..- 000180
20068787 F6FA5E88 18E8FC46 8908C483 24CE26CC 9AFA76FF 0677FF26 5256167E -.VR&.w...v°.ßõ$.ó..F=$..^°-... 0001A0
07882606 468A065F C426085E C408C483 24F32A46 9A535050 C0285000 02881174 t.|..P+âPPS.F*µ$.ó.ó^.&ó_..F.&.. 0001C0
0374FC76 39FC4689 08C4832E 5026CC9A FA76FF50 16064680 50C68800 018E19E8 $./...óP.F..P.v°.ß&P..ó..F=9v=t. 0001E0

Dump of file SATURN:[PCCOMMON.DUMP.PBIN]DBDEFIN.EXE;1 on 18-APR-1990 10:54:23.48
File ID (378,14,0)   End of file block 32 / Allocated 32

Virtual block number 22 (00000016), 512 (0200) bytes

FE568D16 0676FF08 76FF4087 0EEC83EC 8855C850 E5885F5E E42A0646 8AFE8EE9 Õ/±.F.°Õ^.|]ùU.$.$.ñÐ.v..v...V± 000000
2A750400 A910CA80 08740100 A90A4688 018AE80C 4E885252 D23352F8 56801652 R..VÑR3ØRÑ.N.Ò...F.`..t..Ò.`..u° 000020
58C08500 00FFFF9A 5050C033 50160676 FF0876FF FE468050 02CA8022 740200A9 `..t".Ò.P.F±.v..v..P3âPP......âX 000040
301674C0 080000FF FF9A5050 C03350C7 0A000325 525101CA 8003E8FE 4E880875 u..N±$..Ò.ØRX...ùP3âPP......ât.= 000060
9A500072 06850638 FE468800 8DE9FDA8 E90011BA 03740002 8AF0C2F6 0E75006E n.u.-õÞø..t.ø..Ò´»Ò...F±;...r.P. 000080
75C00800 00064E9A 50F8468D 1653F45E 801650D0 88E4E8C0 3300188A 00001E83 ....ø..3â$Ò.ÄP..^¶S..FÝP.N....âu 0000A0
3CF4468A F24E8880 81027580 080106F6 07754000 A90E7580 00A9C933 0A468861 ø.F.3è`..u.`.Ðu.-.|..u.Ÿ..N`.F¶< 0000C0
46F77A74 C90AF446 88C03200 83E908F4 46C60775 023C008E E940F446 C6077501 .u.óF¶ØÕ..<.u.óF¶.Õ..2ã.F¶.è±%F 0000E0
0083300C 74C00800 001F819A 50FA468D 16510002 895151FF FF895273 7400020A ...tsR¿..OO¿..ø..F°P.Ÿ....ât.=.. 000100
75C00800 001F859A 50F8468D 16500001 8850F646 8016524F E8C033FD 24E90374 t.Õ$»3âŠOR..F-P|..P..FÝP......âu 000120
0000FFFF 9AFA76FF FC76FF00 FC5E8301 FA6E8352 18751AF6 7E833274 F8463923 Ø9FÝt2.--.u.R.n°..^=..v=.v°..... 000140
287548C1 F6F44E8A AA75C008 00002615 9A50FA46 80165050 50C03352 8E75C008 .âu/R3âPPP..F°P..&...âu`.N¶-ÂHu( 000160
46F710C9 80037400 01F846F7 00002559 9A5050C0 3350F846 80160676 FF0876FF .v..v...FÝP3âPP.Y%..%F½..t.. %F 000180
23D0F706 7EA1C850 E5880687 8F880888 C28801C9 80F24E0A 20C98003 7400080A ...t..è .N·.è..ó.Ä.....|]ùÄ-. ¼# 0001A0
C0330009 8A087206 851E3806 5E880CEC 83EC8055 00C301C9 80037580 A8C933C1 é3è`.u..è.ù.U.$.$..^.;...r.ø..>» 0001C0
068787F6 00002670 9A5016F4 46805141 415151C9 33531274 20068787 F6FC57E9 ÕW=-... t.S3èOOAAQ.F¶.P.pé..-... 0001E0
```

```
Dump of file SATURN:[PCCOMMON.DUMP.PBIN]DBDEFIN.EXE;1 on 18-APR-1990 10:54:23.48
File ID (378,14,0)   End of file block 32 / Allocated 32

Virtual block number 23 (00000017), 512 (0200) bytes

 4E80F866 89F288FA 885657FC FC4689FE 4689C033 0856C50A 468EFA5E 8C707480 .t).^*.F.éV.3à.F±.F••WV.*. .f½.N 000000
 0200BADC 8802EC83 1F4E7600 A8302440 2A849AFA 5E8E1E52 75AEF20A B060E30C .D'¯.·ÙuR..^*..*@$= .vN..š..£π.. 000020
 E8F4E2AA 1A74F838 0D740A3C AC0C4E88 0716FA88 D488E228 00808A03 7302283D =(.s.¤..+ã.å.*..N.¯<.t.;«t.¯ã¶ö 000040
 FA5E8E5F 5EE1E800 14E8E2E8 FC46FF0A 80AA001F E80375F8 38008000 9AE90028 +.Õ..¯.;«u.Ò..¯¯..F•šãÒ..ŠÃ^_.^* 000060
 51521E53 065E881F E3CA28CF 881F061E 51535027 3022CA9A FFFCB87A EB0093E9 Õ..Š2|•..ò"0'PSQ....ú•ðD..^.Š.RQ 000080
 1FC3FA88 5858591F 07740808 FE5E01F4 5E881175 C0080000 0F009A50 16F4468D .F¶.P......âu..^¶.^±.Ut..Y(X.*ú. 0000A0
 8E26E8F9 00208A03 E8001C8A 08750009 8A000130 0D74006D 3D1874C0 0808C483 .é..ât.=m.t.=..¤..u.¤..Š.¤ .*$&. 0000C0
 8806E8F9 C033001C 8A0EE8F8 03751A3F 80085E88 0A5E8E0E 74400687 87F6FE5E ^±-...ât..^..^..?.u.½Š.¤..3ã*Š.. 0000E0
 E8C18804 75C9080C 4E88F824 E9C850E5 880472FA 5E8E5F5E F86688FC 4628FE46 F±•F•.f½^_.^*r..|]ùÕ$«.N..èu..éŠ 000100
 30007400 6D301774 C0081F07 1E000027 A69A5016 F4468D51 521E5308 56C51EEE ¥.éV.S.RQ.F¶.P.|'......ât.=m.t.= 000120
 880A7440 068787F6 8775C008 F4468BC2 E800208A C7E8001C 8ACC7500 098A0001 ..¤..uäo..Šùo .Šõ.F¶.âun-...ât.. 000140
 4E880F88 0A76C506 7EC41E56 57EC8855 A3E8C033 001C8AA6 E802751A 3F80260A Õ&.?.u.Š|o..3âŠ£U.ŠWV.á-.éV..Õ.N 000160
 835756EC 8855C850 E5885F5E 1FC28CC3 88AAF3C0 32F8E2AA 0374C00A AC0CE30E .D.¯.ât.¯ã½2ãµ¯.ù.ò.^_.|]ùU.ŠVW° 000180
 E80001B8 05744006 8787F60C 7C00F883 11700685 1E38065E 88EC8855 0084E900 .ÕÇ.U.$.^.;...)..«.|.¯...ât.|..Š 0001A0
 C0085828 D408C19A 50402780 0C0C9A57 06067EC4 57EC8855 00C850E5 88C03302 .3ã.|]ù.U.$Wã-..W.£..'ãP.ê.â(|.à 0001C0
 20EC83EC 8855C850 E5885F08 C4832808 0C7C9A50 520AE804 C4830575 D2080975 u..Øu..á.Š.RP.|.U(.Á._.|]ùU.Š.Š 0001E0

Dump of file SATURN:[PCCOMMON.DUMP.PBIN]DBDEFIN.EXE;1 on 18-APR-1990 10:54:23.48
File ID (378,14,0)   End of file block 32 / Allocated 32

Virtual block number 24 (00000018), 512 (0200) bytes

 80018OC8 88F88814 74C00AAC A8F3E07E 8DC03300 1089C08E D08C0A76 C51E5756 VW.év..Å.â¿..3ã.-ÅµË¯.ât..½.ã¯.. 000000
 E18001B0 C888F888 197400FF 25ACD233 0676C5E7 E8E04308 EFD303B1 E0D207E1 Å.ØÅÝ.Åÿ.CÅŠÒév.3Ø¯X..t..½.ã¯..Å 000020
 56880646 880E4E88 C850E588 5E5F1FDA 8CFF448D E674E043 22EFD303 81E0D207 .ØÅÝ.Åÿ"CÅt|.D..Ö._^.|]ù.N..F..V 000040
 F7000283 D8F7AA2D 800A79D2 080E750A F9831374 C00A93FC 071E570A 7EC51E08 ..é-.W..=..ât..*.u..Øy.¯·¯½Ù.Ø.½ 000060
 75C308C2 88AA2704 0276393C 3004D387 92F1F793 F1F70274 C008D233 92F7880A Õ.½.3Ø.ât.½þ.½þ..Å.0<9v..'¯.ò.ùu 000080
 56EC8855 00C850E5 885E5F1F 580A8CF2 72C73801 448DFF44 880586AC 4F0588E2 ã..O¯...D..D.;ür¯.ÕX._^.|]ù.U.ŠV 0000A0
 0000FFFF 9A50088F 881E5008 C8881E50 000A8818 7500088E 3E80088E 2428881E .|(Š.Å.>/..u.|..P.|ù.P.|¢.P..... 0000C0
 E5885E1F 000188F3 77D43AF7 72003A08 74C085AD FC088F8E 06568801 088E06C6 ó./...V./é.•Ù.ât.:År½:âwµ|...^.| 0000E0
 0E74830A 47F626FA 5EC41CE8 F628FC5E 8CFA4689 06F88856 06EC83EC 8855C85D }ùU.Š.Š.V|½..F*.^•+-Š.á^*&-G..t. 000100
 C6880876 FA463908 62168808 60A10CFA 46834601 744004C4 8328F012 C69A5306 .S.ó.b(.á.ât.F.F*.Å'...b.9F*vÅ.ó 000120
 04EC83F8 ECE9F8E0 E9C03300 098A0872 06851E38 065E88EC 885590C8 50E5885E ^.|]ù.U.Š.^.;...r.¤..3ãÕÅ½ÕŠ½.Š. 000140
 88FD0687 A78091E1 75C0855A 59000026 F89A5116 0C76FF08 76FF0A76 FF53CC88 .ãS.v..v..v..Q.¥Š..Y2.âuÅ..|..«. 000160
 8E5618EC 83EC8855 F9E8C033 C8515208 F7C42807 73C43808 A0A15A59 00C850E5 |]ù.YZÅ..;ós.+ã½ÅRQù3ãŠ'U.Š.Š.V. 000180
 89088CA3 088A1689 0888A399 C028FE56 89FC4689 06831688 260681A1 2608EA06 .ò.ŠÅÝ.Š..*..F•.V±+ã.£......£... 0001A0
 0277FF26 FC5EC450 1E089488 51E8FE56 89FC4689 06831688 260681A1 26088E16 ...ŠÅÝ.Š..*..F•.V±ŠQ|...Pá^•Š.w. 0001C0
 0277FF26 FC5EC450 F676FF17 74D008F6 5689F446 8908C483 2B9A28FA 9A37FF26 Š.7.*(.+.á..F¶.V-.Åt..v-Pá^•Š.w. 0001E0

Dump of file SATURN:[PCCOMMON.DUMP.PBIN]DBDEFIN.EXE;1 on 18-APR-1990 10:54:23.48
File ID (378,14,0)   End of file block 32 / Allocated 32

Virtual block number 25 (00000019), 512 (0200) bytes

 75C00804 C4830329 E80E37FF 260277FF 26FC5EC4 46E808C4 83013CE8 0E37FF26 Š.7.ò<..á.ŠFá^•Š.w.Š.7.ò)..Á..au 000000
 75223C80 2602478E 2607FF26 37882628 74024708 26078826 FC5EC404 FC468335 5.F•.á^•Š..Š.G.t+Š.7Š..Š.G.Š.<"u 000020
 00E846C7 00E2E9FF FF88C874 C00804C4 8302F4E8 0E37FF26 0277FF26 FC5EC493 .á^•Š.w.Š.7.ò¶..á..âtù|..õã.úFò. 000040
 5689EA46 89065788 26044788 26EA5EC4 14E8EC56 89EA4689 088E1688 088CA100 .Å.......Fõ.VŠŠ.á^õŠ.G.Š.W..Fõ.V 000060
 8902C483 2C3508C1 9A500004 05E001E0 D1E84688 E475EC46 08EA4688 E846FFEC Š.FÒ.Fõ.FŠuò.FÒ|Å|Å...P.é.5,.á.. 000080
 E8468800 EC068E06 83168926 0681A326 FA568808 EA068EA0 74D008FA 5689F846 F½.V*.ÅtÙ..õ..V*ŠEÝ.Š..*...Š..FÒ 0000A0
 C208EC56 89EA4689 06578826 04478826 EA5EC408 E8088E16 88088CA1 06AFA326 ŠEE.Å......Š.á^õŠ.G.Š.W..Fõ.VŠ.ò 0000C0
 28F85EC4 D1E80257 89260789 2604F846 83F85EC4 02578826 078826EA 5EC41A74 t.á^õŠ..Š.W.á^½.F½.Š..Š '/.Š|á^½+ 0000E0
 47882608 8C1EC423 74C208EC 5689EA46 89088E16 88088CA1 07892602 478926C0 ŠŠ.G.Š..Å.......Fõ.VŠ.òt..5...Š.G 000100
 885EC028 CCE804C4 832C9A08 AC9AEA76 FFEC76FF 088E1689 088CA306 57882604 .Š.W.£.......vŠ.võ.¯...,.á.SŠ+á^. 000120
 FE5689FC 4689F856 89F64689 08568806 46880000 E846C71A EC83EC88 55C850E5 |]ùU.Š.Š.úFÒ...F..V..F-.V½.F•.V± 000140
 5689F646 89C28CC3 880A753A 3C04742F 3C08745C 3CE64688 078A26FC 5EC422E8 Š"á^•Š...F|<\t.</t.<:u..û.ò.F-.V 000160
 0802C483 2D04298C 9A509807 8A26FC5E C41973FC 46390C56 880A4688 FC46FFF8 ½.F•.F..V.9F•s.á^•Š...P.¥)..·.Á.. 000180
 06468820 753A3F80 260A5EC4 0C56890A 4689F856 88F64688 D9E8FC46 FF8F74C0 âtè.F•Š|.F-.V½.F..V.á^.Š.?:u .F. 0001A0
 0A5EC401 62E904C4 83016CE8 0E0676FF 0876FF10 740C5638 0575C338 40085688 .V.ã;ûu.;V.t..v..v..òl..á.Õb.á^. 0001C0
 76FF0876 FFFA4689 4006462B C3880975 3A3C0474 2F3C0874 5C3CE646 88078A26 Š...F|<\t.</t.<:u..û+F.ã.F* v..v 0001E0
```

```
Dump of file SATURN:[PCCOMMON.DUMP.PBIN]DBDEFIN.EXE;1 on 18-APR-1990 10:54:23.48
File ID (378,14,0)   End of file block 32 / Allocated 32

Virtual block number 26 (0000001A), 512 (0200) bytes

F45689F2 4689088A 16880888 A18A74D0 08EC5689 EA468904 C48320 2E 08DA9A06 ..Ö..-.á..Fõ.Vš.ÅtoÅ.......F .V¶ 000000
FF501E08 9988008C E90375C0 0808C483 2D480CB2 9AEA76FF EC76FF50 1E089788 ¡...P.vš.võ.ý.H-.á..âu.Õ¥.¡...P. 000020
745C3CE6 4688078A 260A5EC4 00A2E903 75C00808 C4832072 0CB29AEA 76FFEC76 vš.võ.ý.r-.á..âu.ÕÅ.á^.&...Fl<\t 000040
74D00808 56890646 8904C483 2D9F28C8 9AEA76FF EC76FF2D 742F3C31 743A3C35 5<:t1</t-.vš.võ.À(.-.á..F..V..Åt 000060
ACOCDC9A EA76FFEC 76FF00A9 E9FFFF88 6374C008 04C48300 8AE80E50 0876FF0F ..v.P.Òo..á..âtc¡..Õ`..vš.võ.É.` 000080
76FFEC76 FFD574D0 08F05689 EE468902 C48320D1 08C19A50 40FA4603 04C4832D -.á..F*ƏP.è.1-.á..FŸ.vÞ.Åt¡.vš.v 0000A0
2DFD0C7C 9A5052FA 46030AC4 832D0E28 709A50F0 76FF0676 FF0876FF FA76FFEA õ.v*.v..v..vÞP.p(ß-.á..F*RP.|.»- 0000C0
83218308 DA9A5050 C028E846 FF9D75C0 0804C483 0057E80E 5052FA46 2808C483 .á.+F*RP.ÒW..á..Âu..FÒ+âPP.Ö..!. 0000E0
0074F446 08F24688 FE85E903 7500E87E 83FF11E9 0374D008 EC5689EA 468904C4 á..Fõ.Vš.Åt.Õ...~Õ.u.Õç¡.F .F¶t. 000100
88C02804 C4830084 E80E5052 088E1688 088CA107 E8065788 26044788 26F25EC4 á^.&.G.&.W.Š.À......RP.Ò...á.+â. 000120
88057500 08FE5689 FC468902 C4832EF8 08C19A50 00088804 EC83EC88 55C850E5 ¦}ùU.Š.Š.¡..P.ê.«..á..F•.V‡.Âu.¡ 000140
47892606 478926C0 28FC5EC4 02578926 07892608 56880646 88FC5EC4 56E8FFFF ..Švá^•.F..V.&..&.W.á^•+â&.G.&.G 000160
468800E8 06578926 04478926 FE5688FC 46880888 1EC41474 088E0608 088CA104 .À.......t.á....F•.V‡&.G.&.W.Š..F 000180
8855C85D E588C028 088A1689 0888A3FE 5688FC46 88088E16 89088CA3 FE5688FC •.V‡Ê.......F•.V‡Ê......+à.¦}ùU. 0001A0
FA5689F8 46890657 88260447 8826065E C40092E9 03750846 08064688 08EC83EC &.Š..F..F.u.Õ..á^.&.G.&.W..F%.V* 0001C0
08C4832A E60C829A 37FF2602 77FF26F8 5EC437FF 260277FF 26065EC4 7D74D008 .Åt)á^.&.w.&.7á^¼&.w.&.7.ý.|*.á. 0001E0

Dump of file SATURN:[PCCOMMON.DUMP.PBIN]DBDEFIN.EXE;1 on 18-APR-1990 10:54:23.48
File ID (378,14,0)   End of file block 32 / Allocated 32

Virtual block number 27 (0000001B), 512 (0200) bytes

5EC40257 88260788 26F85EC4 FE5689FC 46890257 88260788 26065EC4 3470C008 .á)4á^.&..&.W..F•.V‡á^¼&..&.W.á^ 000000
26044788 26F85EC4 02578926 078926FE 5688FC46 88F85EC4 02578926 07892606 .&..&.W.á^½.F•.V‡&..&.W.á^¼&.G.& 000020
6EE90856 89064689 06578826 04478826 065EC497 75D008FA 5689F846 89065788 .W..F%.V*.Åu.á^.&.G.&.W..F..V.Õn 000040
00000002 04680002 00650004 02740203 00000001 2A250002 001E90C8 5DE588FF ..¦}ù.....X*......t...e...h..... 000060
008A0001 282F0103 00890001 26390103 00050001 07100103 00000003 29C20002 ..ó)..............9&....../(.... 000080
00040005 29DC0103 00220001 21E80103 000F0002 047E0203 00970001 01880103 ..¦........~.......Õ!..". .É).... 0000A0
003A0001 2A6F0103 00220003 04EC0203 00310001 05770103 00260001 22330103 ..3"..&...w...1...$..."...n* :. 0000C0
00400001 090E0103 003C0001 228A0103 00380001 25A00103 00280003 035F0203 .._...+....X..¡...o"..<...... ?. 0000E0
00460001 25770103 00440001 265C0103 00340003 04F50203 00410001 091E0103 ......A...%...4...\&..D...wX..F. 000100
00590001 067C0103 004D0001 25890103 00300003 04080203 00480001 26900103 ...&..K...Ü...=...¿X..M...|...Y. 000120
00000000 00000000 00580004 04140203 00480004 00320203 005C0001 05670103 ..g...\...2...K.......X......... 000140
6F43202D 20797261 7262694C 20656069 54206E75 52205340 00000000 00000000 ........MS Run-Time Library - Co 000160
70726F43 2074666F 736F7263 6940202C 38383931 20296328 20746867 69727970 pyright (c) 1988, Microsoft Corp 000180
60726170 2064657A 696E676F 6365726E 55006E7A 20007020 00662000 64200011 ..-d.-f.-p.-zn.Unrecognized parm 0001A0
75747320 6C715320 666F2065 60616E65 6C696620 7265746E 45000A20 7325203A : Xs ..Enter filename of Sql stu 0001C0
20747570 6E692064 6E696620 6F742065 6C62616E 55004854 41504400 203A6666 ff: .DPATH.Unable to find input  0001E0

Dump of file SATURN:[PCCOMMON.DUMP.PBIN]DBDEFIN.EXE;1 on 18-APR-1990 10:54:23.48
File ID (378,14,0)   End of file block 32 / Allocated 32

Virtual block number 28 (0000001C), 512 (0200) bytes

72000A73 25203A65 6C696620 7475706E 6920646E 756F4600 0A732520 656C6966 file Xs..Found input file: Xs..r 000000
73616261 74614420 7265746E 45000A65 6C696620 6E65706F 20746F6E 6E614300 .Cannot open file..Enter Databas 000020
72617453 00657361 62617461 64206568 74207472 61745300 203A656D 614E2065 e Name: .Start the database.Star 000040
73250020 20202020 20202020 20202E64 656C6961 66206573 61626174 61642074 t database failed.           .Xs 000060
20657461 65726320 6465606D 69206574 75636578 65207473 65742074 6547000A ..Get test execute immed create  000080
000A7330 342E2520 676E6F6C 206F6F74 20746E65 6D657461 74730065 6C626174 table.statement too long X.40s.. 0000A0
006F6D2E 3130306B 7A6C7173 00646C25 20534920 45444F43 4C51530A 0073250A .Xs..SQLCODE IS Xld.sqlzk001.mo. 0000C0
25203D20 65646F63 206E7275 74655220 2E524F52 52452050 544E4941 4C51530A .SQLAINIP ERROR. Return code = X 0000E0
49204544 4F434C51 530A002E 68726F77 20686361 626C6C6F 52007325 0A000A64 d...Xs.Rollback work...SQLCODE I 000100
43414241 416F0000 2E44454C 49414620 4B434142 4C4C4F52 20202C64 6C252053 S Xld,  ROLLBACK FAILED...oAABAC 000120
20202020 20204745 4D536F62 4175204E 49464544 4244204E 414D4843 41424342 BCBACHMAN DBDEFIN uAboSMEG        000140
00000000 00000000 00000000 00000000 00000000 00000000 00000000 00002020   .............................. 000160
00000000 00000000 00000000 00000000 00000000 00000000 00000000 00000000 ................................ 000180
FFFF0000 06D80000 00000000 00000000 00000000 00000000 00000000 00000000 ..........................Ü..... 0001A0
00000000 00000000 00000000 00000000 00000000 00000000 00000000 00000000 ................................ 0001C0
00000000 00000000 00000000 00000000 00000000 00000000 00000000 00000000 ................................ 0001E0
```

```
Dump of file SATURN:[PCCOMMON.DUMP.PBIN]DBDEFIN.EXE;1 on 18-APR-1990 10:54:23.48
File ID (378,14,0)   End of file block 32 / Allocated 32

Virtual block number 29 (0000001D), 512 (0200) bytes

00000000 00000000 00000000 00000000 00000000 00000000 00000000 00000000 ................................ 000000
00000000 00000000 00000000 00000000 00000000 00000000 00000000 00000000 ................................ 000020
00000000 00000000 00000000 00000000 00000000 00000000 00000000 00000000 ................................ 000040
00000000 00000000 00000000 00000000 00000000 00000000 00000000 00000000 ................................ 000060
00000000 00000000 00000000 00000000 00000000 00000000 00000000 00000000 ................................ 000080
00000000 00000000 00000000 00000000 00000000 00000000 00000000 00000000 ................................ 0000A0
00000000 00000000 00000000 00000000 00000000 00000000 00000000 00000000 ................................ 0000C0
00000000 00000000 00000000 00000000 00000000 00000000 00000000 00000000 ................................ 0000E0
00000000 00000000 00000000 00000000 00000000 00000000 00000000 00000000 ................................ 000100
00000000 00000000 00000000 00000000 00000000 00000000 00000000 00000000 ................................ 000120
00000000 00000000 00000000 00000000 00000000 00000000 00000000 00000000 ................................ 000140
00000000 00000000 00000000 00000000 00000000 00000000 00000000 00000000 ................................ 000160
00000000 00000000 00000000 00000000 00000000 00000000 00000000 00000000 ................................ 000180
00000000 00000000 00000000 00000000 00000000 00000000 00000000 00000000 ................................ 0001A0
00000000 00000000 00000000 00000000 00000000 00000000 00000000 00000000 ................................ 0001C0
00000000 00000000 00000000 00000000 00000000 00000000 00000000 00000000 ................................ 0001E0

Dump of file SATURN:[PCCOMMON.DUMP.PBIN]DBDEFIN.EXE;1 on 18-APR-1990 10:54:23.48
File ID (378,14,0)   End of file block 32 / Allocated 32

Virtual block number 30 (0000001E), 512 (0200) bytes

00000000 00000000 00000000 00000000 00000000 00000000 00000000 00000000 ................................ 000000
00000000 00000000 00000000 00000000 00000000 00000000 00000000 00000000 ................................ 000020
00000000 00000000 00000000 00000000 00000000 00000000 00000000 00000000 ................................ 000040
00000000 00000000 00000000 00000000 00000000 00000000 00000000 00000000 ................................ 000060
00000000 00000000 00000000 00000000 00000000 00000000 00000000 00000000 ................................ 000080
00000000 00000000 00000000 00000000 00000000 00000000 00000000 00000000 ................................ 0000A0
00000000 00000000 00000000 00000000 00000000 00000000 00000000 00000000 ................................ 0000C0
00000000 00000000 00000000 00000000 00000000 00000000 00000000 00000000 ................................ 0000E0
00000000 00000000 00000000 00000000 00000000 00000000 00000000 00000000 ................................ 000100
00000000 00000000 00000000 00000000 00000000 00000000 00000000 00000000 ................................ 000120
00000000 00000000 00000000 00000000 00000000 00000000 00000000 00000000 ................................ 000140
00000000 00000000 00000000 00000000 00000000 00000000 00000000 00000000 ................................ 000160
00000000 00000000 00000000 00000000 00000000 00000000 00000000 00000000 ................................ 000180
435F025C 00000000 00000000 00000000 00000000 00000000 00000000 00000000 ............................\._C 0001A0
00000000 00000000 00000000 00000000 0001FFFF 00304F46 4E495F45 4C49465F _FILE_INFO=..................... 0001C0
0A0A0A0A 0A000000 00000000 00000000 00000000 00008181 81001400 00000000 ................................ 0001E0

Dump of file SATURN:[PCCOMMON.DUMP.PBIN]DBDEFIN.EXE;1 on 18-APR-1990 10:54:23.48
File ID (378,14,0)   End of file block 32 / Allocated 32

Virtual block number 31 (0000001F), 512 (0200) bytes

00000000 00000000 00000000 00000000 000A0A0A 0A0A0A0A 0A0A0A0A 0A0A0A0A ................................ 000000
00000000 00000000 00000000 00000000 00000000 00000000 00010000 00000000 ................................ 000020
00880000 07000088 00000000 00000000 005C005C 00000000 00000000 00000000 ............\.\................. 000040
00000000 02020000 00000000 00000000 01020000 00000000 00000000 000108E6 |............................... 000060
00000000 00000000 00000000 00000000 00000000 00000000 00000000 00000000 ................................ 000080
00000000 00000000 00000000 00000000 00000000 00000000 00000000 00000000 ................................ 0000A0
00000000 00000000 00000000 00000000 00000000 00000000 00000000 00000000 ................................ 0000C0
00000000 00000000 00000000 00000000 00000000 00000000 00000000 00000000 ................................ 0000E0
00000000 00000000 00000000 00000000 00000000 00000000 00000000 00000000 ................................ 000100
00000000 00000000 00000000 00000000 00000000 00000000 00000000 00000000 ................................ 000120
00000000 00000000 00000000 00000000 00000000 02000001 00000000 00000000 ................................ 000140
00000000 00000000 00000000 00000000 00000000 00000000 00000000 00000000 ................................ 000160
00000000 00000000 00000000 00000000 00000000 00000000 00000000 00000000 ................................ 000180
00000000 00000000 00000000 00000000 00000000 00000000 00000000 00000000 ................................ 0001A0
00002320 20280029 6C6C756E 2800296C 6C756E28 00000000 00000000 025E070C É.^.........(null).(null).+- #.. 0001C0
FFFFFFFF 002E2E00 2E003F2A 00002000 00000000 00000000 00000000 00000000 .................. ..*?.......... 0001E0
```

```
Dump of file SATURN:[PCCOMMON.DUMP.PBIN]DBDEFIN.EXE;1 on 18-APR-1990 10:54:23.48
File ID (378,14,0)   End of file block 32 / Allocated 32

Virtual block number 32 (00000020), 512 (0200) bytes

00000101 00000000 08820DEE 08AE0DEE 08AA0DEE 08A60DEE 08E20DEE 00000090 ....Ÿ.ã.Ÿ.I.Ÿ.˙.Ÿ.Ü.Ÿ.ý.....    . 000000
00000000 00000000 00000000 00000000 00000000 00000000 00000000 00000000 ................................ 000020
200A0D30 30303652 00003E3E 4753404E 3C3C08E8 08EC0862 08E4FFFF FFFF2A02 .*....ð.b.š.Ô.<<NMSG>>..R6000..· 000040
746E6920 200A0D33 30303652 0003000A 00776F6C 66726576 6F206863 61747320  stack overflow.....R6003..· int 000060
6F6E202D 0A0D3830 30365200 08000A0D 30207962 20656469 76696420 72656765 eger divide by 0.....R6008..· no 000080
09000A0D 73746E65 6D756772 6120726F 66206563 61707320 6867756F 6E652074 t enough space for arguments.... 0000A0
6520726F 66206563 61707320 6867756F 6E652074 6F6E202D 0A0D3930 30365200 .R6009..· not enough space for e 0000C0
72726520 656D6974 206E7572 00FF000A 0000FC00 0A0D746E 656D6E6F 7269766E nvironment...•......run·time err 0000E0
6F6E2074 6E696F70 20676E69 74616F6C 6620200A 00323030 36520002 0020726F or ...R6002..· floating point no 000100
746E696F 70206C6C 756E2020 0A0D3130 30365200 01000A0D 64656461 6F6C2074 t loaded.....R6001..· null point 000120
FA000200 00000108 B6000200 03FFFFFF 000A0D74 6E65606E 67697373 61207265 er assignment..........Ñ.......* 000140
00000000 00000000 00000000 00000000 00000000 00000308 EA000200 00000206 .......õ........................ 000160
00000000 00000000 00000000 00000000 00000000 00000000 00000000 00000000 ................................ 000180
00000000 00000000 00000000 00000000 00000000 00000000 00000000 00000000 ................................ 0001A0
00000000 00000000 00000000 00000000 00000000 00000000 00000000 00000000 ................................ 0001C0
00000000 00000000 00000000 00000000 00000000 00000000 00000000 00000000 ................................ 0001E0

Dump of file SATURN:[PCCOMMON.DUMP.DLL]DBG.TMP;1 on 18-APR-1990 10:43:58.67
File ID (617,9,0)   End of file block 28 / Allocated 28

Virtual block number 1 (00000001), 512 (0200) bytes

00000000 00000040 00000000 00000088 0000FFFF 00000004 0000001C 01525A4D MZR.............!.......@....... 000000
00000080 00000000 00000000 00000000 00000000 00000000 00000000 00000000 ................................ 000020
6F6E6E61 63206D61 72676F72 70207369 685421CD 4C01B821 CD098400 0E8A1F0E ..¤..Ç.ë!¡.Lë!This program canno 000040
00000000 00000024 0A0D0D2E 65646F60 20534F44 206E6920 6E757220 65622074 t be run in DOS mode....$....... 000060
00050005 00000000 00030CA2 00000000 00058001 18F897EF 000C008E 0505454E NE../...ÿ.%.........Å........... 000080
00000000 00000000 00010000 00040000 0000014A 008F0085 00680068 00400021 !.@.h.h.....J................... 0000A0
02000E21 00000000 187A0F00 187A003F 01740F00 01740021 00800F00 00800017 ........!.t...t.?.z...z.....!... 0000C0
45424742 44070001 54524553 53414742 44090000 47424403 1C000F21 1A6801CD ë.h.!....DBG...DBGASSERT...DBGBE 0000E0
4C414344 42480853 4C4C4143 534F4408 00002200 1C001300 0A000100 00025045 EP..........."...DOSCALLS.KBDCAL 000100
02014554 49525753 4F44084F 4953034E 49574D50 05534C4C 41434F49 5608534C LS.VIOCALLS.PMWIN.SIO.DOSWRITE.. 000120
20676E69 67677562 65442030 312E3320 41442F41 53100000 00000301 01000003 ...........SA/DA 3.10 Debugging  000140
E9064688 D88EFFFF 881E5657 000000C8 00000000 00000000 73656E69 74756F72 routines........à...WV.!...Ä.F.Õ 000160
0001B800 1FE90000 FFFF9A64 6A07D068 002CE900 0000269A 01F46800 C8680027 '.hà.h¶..&...Õ,.hÅ.jd.....Õ..!.. 000180
E9000088 FFE1E9FF D7E90375 000230FF D1E90375 00013000 13E90016 E9001FE9 Õ..Õ..Õ..=..u.Õ!.=..u.Õ•.ÕÄ.!..Õ 0001A0
46890000 FFFF9A00 6A006AD8 8E000888 1E565700 0004C800 02CAC95F 5E1F0000 ...^_èò..à...WV.!...Äj.j.......F 0001C0
00050061 000200F3 0004006A 01030003 90CBC95F 5E1F0000 E9FC4688 FE5689FC •.V±¯F•Õ...^_èü.....j...#...a... 0001E0

Dump of file SATURN:[PCCOMMON.DUMP.DLL]DBG.TMP;1 on 18-APR-1990 10:43:58.67
File ID (617,9,0)   End of file block 28 / Allocated 28

Virtual block number 2 (00000002), 512 (0200) bytes

16FE468D D88EFFFF 881E5657 000144C8 00000000 00000032 00010019 01030000 ........2.......àD..WV.!...Ä.F±. 000000
030E7F80 26FA5EC4 FC5689FA 4689C028 FECC968B 0000FFFF 9A5016FE CC868050 P..ß±.P.......ß±•å.F•.V•á^•£.... 000020
FECE868D 0042681E 0C76FF0E 76FF0876 FF0A76FF 0676FF00 C2681E00 5BE90374 t.Õ[..hô..v..v..v..v..v..hB...ð± 000040
1E5016FE CE868D01 6A006A01 6A006AFF FF00009A 016A16C4 83FFFF00 289A5016 .P.(....á.j......j.j.j.j...ð±.P. 000060
00D6E900 00FFFF9A 016A016A 0009E903 74000730 0000FFFF 9A246A01 6A006768 hg.j.j$.....•..t.Õ..j.j......Õ•. 000080
9A5016FE CE868D00 78681E0C 76FF0E76 FF0876FF 0A76FF06 76FF0001 FEC686C7 ú.ó±...v..v..v..v..v..hx...ð±.P. 0000A0
6A006A01 6A005F00 009A016A 0000FFFF 9A006A50 16FEC686 8D12C483 00E50028 (.Í..á...ó±.Pj......j....._.j.j.j 0000C0
011D9A00 6A5004C4 83005500 109A5016 FECE868D 5016FECE 86800000 01109A00 ........ó±.P..ð±.P...U..á¯Pj.... 0000E0
9A006A00 6A5040FE CA868B00 00FFFF9A 006A5016 FEC8868D 5016FECA 86800000 ....ò±.P..ò±.Pj........ò±@Pj.j.. 000100
0012E903 7400FEBE BE8000FE BE86C600 00FFFF9A 006A216A 00A0681E 0000FFFF .....h..j!j......ó./±..//±.t.Õ.. 000120
037541FE BCBE8000 00FFFF9A 006AFFE4 E90000FF FF9A006A 016A5016 FEBC868D ..V±.Pj.j......Õð.j......./V±Au. 000140
C95F5E1F 0000E900 00B80000 00899A01 6A016A00 09E90374 61FE8CBE 80000AE9 Õ.../V±at.Õ..j.j......!..Õ...^_è 000160
01030005 00010162 01030000 000300B2 00020000 000100C9 0002000C 90000ACA b.......è.......ý.......b....... 000180
01030001 00030145 01030004 00020138 01030000 00050008 00020008 00010018 ................;.......E....... 0001A0
01030008 00040078 0103000F 00030002 01030008 000300C0 01030009 00030101 ........á.......•.......x....... 0001C0
00000000 00000000 00000000 00000000 00000000 00000000 00000013 000300EE Ÿ............................... 0001E0
```

```
Dump of file SATURN:[PCCOMMON.DUMP.DLL]DBG.TMP;1 on 18-APR-1990 10:43:58.67
File ID (617,9,0)   End of file block 28 / Allocated 28

Virtual block number 3 (00000003), 512 (0200) bytes

46805657 000016C8 00CB5DFA 88914901 F7AEF2FF FFB9C033 067EC4D7 8BEC8855 U.$.mÁ-.3â¿.. Ü%11..*]ù.à...WV.F 000000
89260856 88064688 420A47C6 26F85EC4 FE568CFC 46890E46 80FA568C FB4689EC $.F%.V*.F..F=.V±á^Ÿ&6G.B.F..V.&. 000020
9A53060A 76FF0C76 FFFC76FF 167FFF04 47C72602 57892607 89260857 89260647 G.&.W.&..&.W.&úG.....v•.v..v..S. 000040
88260247 8E2607FF 263F8826 C02A1278 044FFF26 F85EC4F0 880CC483 0090021E .....á..bá^Ÿ&.O.x.*ã&.?&..&.G.&. 000060
5EC45657 000008C8 CBC95F5E C68806C4 83FFFF00 AB9A006A 53FA76FF 900FEB05 .Š...v*Sj.. ....á..ó^_èúà...WVä^ 000080
113C05E0 D1C103E0 D1C88BF9 F7000CB9 99054820 C38BFA46 89E42A0B 478A2608 .&.G.*ð.F*.ù-H..¿..%*.àìÀ.èìÀ.<. 0000A0
90012BE9 FFFF8820 0A4F8026 085EC40F 74400A47 F6260774 830A47F6 26F84689 .F%&-G..t.&-G.ət.á^.&.O. ¡..Ö+.. 0000C0
67802602 0A4F8026 90E2EB00 000447C7 26200A4F 80260E74 010A47F6 26085EC4 á^.&-G..t.&.O. &úG...Šã.&.O..&.g 0000E0
68F9F700 0CB99905 4820C388 4C750C0A 47F626FC 7689F088 04478926 C028EF0A .ÿ+à&.G..b.v•&-G..uL.ù-H..¿..%*k 000100
7E811675 0560087E 810E7401 510A7E81 07750554 087E8137 7501113C 87F60608 Ã.-.<..u7.-.T.u..-.Q.t..-.'.u..- 000120
04C4830C 51E80876 FF0A76FF 0C75C008 02C48301 C4101E9A FA76FF0F 75FFFF0A ...u..v*...á..á..Àu..v..v.Òo..á. 000140
88677401 113C87F6 060868F9 F7000C89 99054820 C3881575 080A47F6 26085EC4 á^.&-G..u..ù-H..¿..%*kÄ.-.<..tg. 000160
48024588 F87E8802 57892607 89264008 57882606 47882606 77282637 8826085E ^.&.7&+w.&.G.&.W.ə&..&.W..-%.E.H 000180
5E8819E8 FC468908 C48301E2 0E869AFA 76FF0677 FF265256 167EF608 04478926 &.G..-~.VR&.w..v*...ã..á..F•Š..^ 0001A0
468A065F C426085E C408C483 02050E48 9A53006A 006A026A 0F742017 4087F6FA *-.M. t.j.j.j.S.H....Á.á^.&á_..F 0001C0
FC7639FC 468908C4 8300720E 869AFA76 FF501606 46805600 018E17EB 07882606 .&..Š.ƒ..V.F..P.v*...r..á..F=9v• 0001E0

Dump of file SATURN:[PCCOMMON.DUMP.DLL]DBG.TMP;1 on 18-APR-1990 10:43:58.67
File ID (617,9,0)   End of file block 28 / Allocated 28

Virtual block number 4 (00000004), 512 (0200) bytes

8C1A94A3 1A9AB801 5810429A 000AB8EC 8855C8C9 5F5EE42A 06468AFE CCE90374 t.Ôä±.F.*ð^_èüU.$¡...B.[.¡..Ê... 000000
9006C71A 6C16891A 6AA30856 88064688 1A861689 1A84A310 56880E46 8B1A961E ....F..V.Ê.......F..V.Êj...l.ú.. 000020
1A74A3C0 2800011A 9206C703 08E90374 25F67E80 038DE900 001A8E06 C700001A ...ú.....Ö...~-%t.Ö..ú.....*áÊt. 000040
5EC40020 1BFA06C7 1A82A31A 68A31A6E A31A88A3 1A8AA31A 72A31A8C A31A70A3 Êp.Ê..Êr.Ê..Ê..Ên.Êh.Ê..ú.*. .Á^ 000060
7406FF00 752B3F80 260A5E88 903EE800 301BFA06 C70A46FF 49753001 7F80260A .&...0uI.F.ú.*.0.Š>..^.&.?+u...t 000080
06FF9014 E81A8806 FF1A7500 1A743E83 0E75203F 80269028 E800001A 8806C71A .ú.....Š(.&.? u..>t..u.....Š.... 0000A0
0978E80E 5098078A 260A5E88 0A46FF1A 8206FFC7 752D3F80 260A5EC4 00EB1A68 h.Š.á^.&.?-uú.....F..^.&...P.Òx. 0000C0
3E830C56 890A4689 08C48308 C7E80E1A 98681E0A 76FF0C76 FFD075C0 0802C483 .á..ÀuI.v..v..h...Òú..á..F..V..> 0000E0
C7067530 1BFA3E83 0074001A 823E831A 98A308F7 1A98A11A 8206FF0C 70001A98 ...}.....Å..%ÀÊ...>...t..>*.0u.ú 000100
7BE80E1A 92681E0A 76FF060A 46FF1A8A 06FF2D75 2E3F8026 0A5EC400 201BFA06 .*. .á^.&.?.u-.....F...v..h...Ò( 000120
8A260A5E C41A8A0E FF00011A 9206C70A 70001A92 3E830C56 890A4689 08C48308 ..á..F..V..>...}.ú.........á^.&. 000140
1A723E83 00021A72 06C70675 006C3D28 74006830 4074004E 30307400 46309807 ..=F.t==N.tə=h.t+=[.u.ú.r....>r. 000160
1A7206C7 90024EE9 1C75003F 80260A5E C40A46FF 03754C3F 80260A5E C4097500 .u.á^.&.7Lu..F.á^.&.?.u.ÖN..ú.r. 000180
0A740045 30F84689 98078A26 C8E80008 1A7206C7 00E80010 1A7206C7 08E80001 ..ŠÀú.r...ŠÀú.r...Šà&....F½=E.t. 0001A0
3D0191E9 037E7874 00693DF8 468820F8 46831A70 06FF0875 00583005 7400473D =G.t.=X.u...p..F% .F½=ì.tx-.Ö..= 0001C0
C4157502 1A723E83 900159E9 0140E903 7500253D 0152E903 7E013FE9 03750063 c.u.Ö?.-.ÖR.=X.u.Öə.ÖY...>r..u.á 0001E0

Dump of file SATURN:[PCCOMMON.DUMP.DLL]DBG.TMP;1 on 18-APR-1990 10:43:58.67
File ID (617,9,0)   End of file block 28 / Allocated 28

Virtual block number 5 (00000005), 512 (0200) bytes

89261A8E A11FC426 1A841EC4 0DE80000 0247C726 0789261A 8EA11FC4 261A841E ...&Á.À..&..&úG...$.á...&Á.À..&. 000000
F6261A6A 1EC401B0 E9037400 1A8E3E83 0170E903 75001A90 3E83041A 84068307 .......>...u.Öp..>...t.Ö§.á.j.&- 000020
C483019E E80E0A6A 00001A68 06C71A8C 06FF01AC E9FFFF88 01AFE903 75200A47 G. u.ÖÉ.¡..Ö¯.....ú.h...j..Ö...á 000040
75081A72 3E830004 1A9206C7 1A8A06FF 1A7006FF 1A6E06FF F2E8086A 90C3E802 .Šù.j.Š ..n...p.....ú......>r..u 000060
83FA4689 1A98A128 741A9806 39FA4689 1A72A3C0 287A7401 1A723E83 0081E903 .Ö...>r..tz+áÊr..F*9...t(Å...F*. 000080
98A3C028 027DC008 1A98A105 1A982E83 909013E8 00001A98 06C70A74 001A823E >...t.ú.....Š........Å...á).+áÊ. 0000A0
3E832274 00FA7E83 02C48304 8DE80E3A 6A02C483 0130E80E 106A021A 8406831A ......j..ÒO..á.j:.Ö...á..-*.t".> 0000C0
00001A98 06C79007 E81A98A3 C028027D C0081A98 A3000520 FA468815 74001A82 ...t..F*-..Ê...á).+áÊ..Š..ú..... 0000E0
E80E006A 90FF3FE9 106AFF10 E9021A84 068302C4 8300F1E8 0E106A04 1A842E83 .....j..Öp..á......Ö..j.Ö?..j..Ö 000100
643D90FF 21E90428 E80E256A FF2AE903 49E80EF8 76FFF4E8 016A90FF 39E9026E n.Ö9..j.Š¶.v%.ÖI.Ö*.jX.Ö(.ÖI..=d 000120
0A4EFF0C 56880A46 88097400 1A723E83 DA7E0067 30057C00 6530FF0C E9037500 .u.Ö..=e.|.=g.-Ö.>r..t..F..V..N. 000140
FEE4E903 75006F3D FE80E903 75006E3D 903AE8FE 5689FC46 89400C56 880A4688 .F..V.ə.F•.V±Š:.=n.u.Ö.±=o.u.Öö± 000160
9081E8FF 79E90375 00783DFE 89E90375 0075308F 7400733D FEE0E903 7500703D =p.u.ÖÀ±=s.t.=u.u.Ö¿±=x.u.Öy.ŠŸ. 000180
500A4628 C38BEC75 253C0474 C00AF646 88078A26 FC5EC4FC 46FF9034 E80A46FF .F.Š4..F•á^•&...F-.Àt.<%u$.ú+F.P 0001A0
88078A26 0A5EC40C 56890A46 89FE5688 FC468806 C483044C E80E0A76 FF0C76FF .v..v..ÒL..á..F•.V±.F..V.Á^.&... 0001C0
000012C8 CBC91A8E A1FE51E9 0374200A 47F6261A 6A1EC4FC 63E90374 C00AF646 F-.Àt.Öc=á.j.&-G. t.Öo±À..èùà... 0001E0
```

```
Dump of file SATURN:[PCCOMMON.DUMP.DLL]DBG.TMP;1 on 18-APR-1990 10:43:58.67
File ID (617,9,0)   End of file block 28 / Allocated 28

Virtual block number 6 (00000006), 512 (0200) bytes

0774021A 723E831A 8C06FF04 740A067E 83002018 FA06C706 74001A8A 3E835657 WV.>...t.ú.*. ..-..t......>r..t. 000000
902CE804 1A840683 FE5689FC 46890257 8B26078B 261A841E C4197510 1A723E83 .>r..u.&...&..&.W..F=.V‡.....$,. 000020
99078826 1A841EC4 0EE80000 FE46C7FC 4689078B 261A841E C4117400 1A8C3E83 .>...t.&...&...F=úF‡..$.&...&... 000040
9003E806 46880674 FE4608FC 46880E74 001A683E 83021A84 0683FE56 89FC4689 .F=.V‡......>h..t..F=.F‡t..f.$.. 000060
832B7D00 FE7E8331 75001A8C 3E83F456 89F24689 1A961688 1A94A118 F8A3C028 +äÉ½.À........F .V¶.>...u1.-‡.)*. 000080
89FC4689 DAF70002 83D8F7FE 5688FC46 8B2007C6 26F246FF F25EC41D 750A067E -..u.&^..F &6.-.F=.V‡¼Ã.@.¼Ö.F=. 0000A0
FE76FF50 1E0676FF FA5E8CF8 46891A76 B80000F6 46C79006 E80001F6 46C7FE56 V‡úF-..$..úF-..¦v..F%.^*.v..P.v‡ 0000C0
04C48302 2700109A F876FFFA 76FF4574 001A8A3E 830AC483 07081014 9AFC76FF .v=......&..>...tE.v*.v½...'..&. 0000E0
F27EC4F0 4E880000 18F806C7 0675081B F83E830D 7EC908F0 4E89C828 1A920E8B ....*à.Nb.è-..>½..u.ú.½....NbÁ- 000100
76C5EE5E 8C1A700E 8BF04E89 F4468CF2 7E89F47F C00849C1 88473005 C62605E8 $.&6.OG.èl.à.¶.-..F¶.Nb..p..^Yév 000120
7689E375 003F8026 F846FF46 202C8003 7C613C07 74C90804 88078A26 F85EC4F2 .&^½&.....èt.<a|.., F.F½&.?.uD.v 000140
00018805 7500F67E 8308741A 8806081A 74A11475 001A8C3E 83EE5E8E F45E8CF2 ..^¶.^Y.>...u.Àt.....t..--.u.¦.. 000160
A10001BE 18740006 7E835657 000010C8 C8C95F5E 02C48302 FFE80E50 C02802E8 $.+âP.Ò...&.^_èúà...WV.-..t./..À 000180
261A841E C4137408 1A723E83 008FE902 1A840683 FA5689F8 46891A86 16881A84 .......F½.V*.....Õ...>r..t.&...& 0001A0
0683FA5E 8CF84689 FC468907 8B261A84 1EC410EB FA5689F8 46890257 8B26078B ..&.W..F½.V*$.6...&...F=.F½.^*.. 0001C0
FD880975 00FC7E83 900AE800 F6881575 FA4608F8 46880E74 081A723E 83041A84 ....>r..t..F½.F*u.¦-.$...-=.u.¦» 0001E0

Dump of file SATURN:[PCCOMMON.DUMP.DLL]DBG.TMP;1 on 18-APR-1990 10:43:58.67
File ID (617,9,0)   End of file block 28 / Allocated 28

Virtual block number 7 (00000007), 512 (0200) bytes

E81A920E 881C741A 8A3639F6 28F45689 F24689FA 5688F846 88FA5E8C F8468900 ..F%.^*.F%.V*.F .V¶+-96..t.....$ 000000
3F8026F2 46FFF25E C44690ED E8107ECE 38461574 003F8026 F246FFF2 5EC4900E ..&^ .F &.?.t.F;ö-.$Ú.F&^ .F &.? 000020
0EF876FF FA76FF56 02C48301 59E80E57 0875001A 823E83FE 281A983E 88F37500 .uæ.>..+‡.>...u.W.ÒY..&.V.v*.v%. 000040
84A10000 06C890C8 C95F5E02 C483013C E80E5708 74001A82 3E8306C4 830183E8 Ò*..&..>...t.W.Ò<..&.^_èú.à...À. 000060
4688C02A 9003E801 80057547 067E8306 7467067E 83FE5689 FC46891A 8616881A .......F=.V‡.-.gt..-.Gu. .$..*&.F 000080
011A9206 C7067500 1A923E83 007400FA 7E800006 1A9206C7 0675001A 8A3E83FA *.>...u.ú......-*.t..>...u.ú.... 0000A0
FF261986 068EFC76 FFFE76FF 1A9436FF 1A9636FF 0676FF1A 9236FF1A 7036FF00 ..6p..6...v..6...6...v‡.v=....&. 0000C0
26198606 8E1A9436 FF1A9636 FF147500 1A683E83 187400FA 7E800EC4 8305281E .(..&..-*.t..>h..u..6...6......& 0000E0
86068E1A 9436FF1A 9636FF14 75001A92 3E831874 001A683E 8304C483 052C1EFF ......&..>h..t..>...u..6...6..... 000100
FE76FF18 741A8806 081A74A1 000018F8 06C7081A 84068304 C4830534 1EFF2619 .&..4..&......ú.%...Àt.....t..v‡ 000120
C90129E8 0E50C028 02E80001 880574C0 0804C483 05381EFF 26198606 8EFC76FF .v=....&..B..&..Àt.|..$.+&P.Ò).è 000140
FF263788 2606468A 1478044F FF261A6A 1EC43C75 001A903E 83560000 00C890C8 ú.à...V.>...u<&.j.&.O.x..F.&.7&. 000160
FF077540 06C48309 E300A89A 0676FF53 1A6C36FF 10E8E42A 04882602 478E2607 .&.G.&..*Ò$..6l.$.v.. .Ð..&.au.. 000180
F6080676 88577500 1A903E83 56570000 02C890C8 C95E1A8E 06FF9005 E81A9006 ...$......^èú.à...WV.>...uW.v..- 0001A0
881A9006 FF047540 06C4830A 4800A89A 18FA36FF 1A6A36FF 1A6C36FF 18E8507E -P$..6l..6j..6*.. .K..&.au...... 0001C0
05882602 478E2607 FF263F88 2618FAA0 D478044F FF261A6A 1EC41E7E C0084EC6 6N.&-.6.j.&.O.x&.*.&.7&..&.G.&.. 0001E0

Dump of file SATURN:[PCCOMMON.DUMP.DLL]DBG.TMP;1 on 18-APR-1990 10:43:58.67
File ID (617,9,0)   End of file block 28 / Allocated 28

Virtual block number 8 (00000008), 512 (0200) bytes

830A7688 56570000 02C8C8C9 5F5E1A8E 06010646 88077500 1A903E83 D4E8E42A *ÒS&.>...u..F.....^_èúà...WV.v.. 000000
06C4830A 8000A89A 5098078A 26065EC4 1A6A36FF 1A6C36FF 22E85E75 001A903E >...u^$".6l..6j.&^.&...P. .§..&. 000020
8A26065E C4CD7804 4FFF261A 6A1EC425 74C0084E C6880646 FF1A9006 FF047540 au.......F..6N.à‡X&.j.&.O.xè&^.&. 000040
0A468807 75001A90 3E83CAE8 E42A0588 2602478E 2607FF26 3F88261A 6A1EC407 .&.j.&.7&..&.G.&..*Ò$ó.>...u..f. 000060
89FC4689 C028F656 89F44689 1A961688 1A94A156 00000CC8 C8C95F5E 1A8E0601 ....^_èúà...VÀ........F¶.V-+&.F=. 000080
75101BF8 3E830676 28F028F8 468904C4 8306F600 109AF476 FF521A98 3688FA46 F*.6..R.v¶...-..&..F½+b+v..>%..u 0000A0
3E831975 203F8026 F45EC422 75001A82 3E834E01 750818F8 3E8308E8 02EE8305 ..Y.$..>%..u.N.>...u"&^¶&.?-u..> 0000C0
F6080874 3018FA3E 83F84EFF 02C483FE 71E80E50 98078A26 F446FF12 753018FA *.Ou..F¶&...P.Òq‡.&..N%.>*.Ot..- 0000E0
FC46FF07 74001BF8 3E830066 E80EFA46 FF077400 067E8318 74001A82 3E83077E -..>...t..-..t..F*.Òf..>%..t..F= 000100
0E047500 FA7E830A 7400067E 8302C483 FE7EE80E 56297500 1A823E83 0070E80E .Òp..>...u)V.Ò-‡.&..-..t..-*.u.. 000120
85E80EF4 76FFF676 FFF876FF 0040E80E 047500FC 7E830A74 0018F83E 830039E8 Ò9..>%..t..-=.u..Ò@..v%.v-.v¶.Òç 000140
1A743E83 C8C95E02 C483FE38 E80E5600 2018FA06 C70E7400 1A823E83 06C483FE ‡.&..>...t.ú.*. .V.Ò8‡.&.^èú.>t. 000160
F83E8302 C483FDC8 E80E306A C802C483 FD02E80E 50002088 03E80028 88057400 .t.¦*.$.¦ .P.Ò@».&.ÚJO.Òà».&..>% 000180
000006C8 C802C483 FDAAE80E 500078B8 03E80058 88057400 1A703E83 17751018 ..u..>p..t.|X.$.|x.P.Ò¯».&.Úà... 0001A0
E80A46FF 021A8406 83378826 1A841EC4 12752A3F 80260A5E C40001FE 46C75657 WVúF‡..&^.&.?*u.&...&.7......F.$ 0001C0
303CFA46 88078A26 0A5E88F6 280A46FF FFFFFE46 C7087520 3F80260A 5EC49060 '.&^.&.?-u.úF‡...F.+-.^.&...F*<0 0001E0
```

```
Dump of file SATURN:[PCCOMMON.DUMP.DLL]DBG.TMP;1 on 18-APR-1990 10:43:58.67
File ID (617,9,0)   End of file block 28 / Allocated 28

Virtual block number 9 (00000009), 512 (0200) bytes

 187F3930 802606EB FB880030 18FA06C7 0675303C 0A751A8A 3639387F 393C3F7C |?<9.;96..u.<0u.ú.º.0..«Š.&.=9.. 000000
 468C0A7E 890F7030 30802647 F18830E9 83C803E1 01CE0302 E1C1CE88 98058A26 &....öèÅ..öÌÅ.à.Õ0.þG&.=0)ò.-..F 000020
 01048857 000004C8 CBC95F5E 0C56880A 46883789 26065EC4 F088EEF7 FE46880C ..F±¥Y.bá^.&.7.F..V.^ èùà...V¡.. 000040
 FC7E8900 0188F475 00382611 74003080 264701E8 FC7EC406 4E8AFE5E 8CFC4689 .F•.^±.N.á-•Š.G&.=.t.ÅB.u¶¡...-• 000060
 580000FF FF9A5016 C48850EC 885590C8 C95FC028 FE468CFC 7E899009 E8FE468C .F±Š...-•.F±•â_èu.U.ŠP.á.P.....x 000080
 00018809 A711569A 039EE800 21E80000 FFFF9A01 0A681E01 0C681E17 46A3E086 .ÅÈF..h...h.......Ò!.Ò...V.Ï.¡.. 0000A0
 010C068E FF330000 881E0112 16FF00FF 680CD800 889A0CC8 00349A50 C85DE588 .Ï)ùP.4.ù....Å.h.......£..3..... 0000C0
 F2C03308 74CA88A6 F3C888D1 8805168E 31740030 80264701 75003080 267FFF89 ¿..&.=.u.G&.=.t1/...Ì.ùæÌ.òt.3à 0000E0
 E8AAC20A 0572412C AC9204E0 C00E7241 2CAC1740 8F1FF788 071E061C E8E774AE ÙtÔŠ.....%.¢M.¯,Ar.àÅ..¯,Ar..ô`Š 000100
 9A5000FF 8805241E FF047400 05263E83 0C000088 9A5000FC 88EC8855 00C31FED Ü.ù.U.Š¡•.P...Ï..>&..t...$.¡..P. 000120
 401074C2 38AD1990 8E065688 C08ED88E 01438857 56EC8855 C85DE588 003E0088 ..>..Ì)ùW.ŠVW¡C..Å.á.V./..Ù;ôt.@ 000140
 9A0676FF 57EC8855 0002CA5D E5885E5F 96E8E8F7 88AEF2FF FF89C033 970C7496 .t..3à¿.. Ù.%ŠŠ._^.Ì)ò..U.ŠW.v.. 000160
 1651521E 530002B8 C4885049 D1F7AEF2 FFFF89C0 33FA8892 1F74C008 00520058 X.R..ât...º3à¿..¯ÙÅÌÌP.ÁE..S.RO. 000180
 000C8999 05482004 4688195E 06FF0000 04C80002 CA5DE588 5F580000 FFFF9A50 P.....(_.Ì)ò..à.....^..F.-M..¿.. 0001A0
 5EC402C4 83009213 119A0200 68FE5E8C FC468911 3C05E001 C103E001 C888F9F7 %º.àÌÅ.ëÌÅ.<..F•.^±h.......á.á^ 0001C0
 5EC49021 E8020002 47C726FC 5EC4080A 4F802611 74000808 57892606 47892604 .&.G.&.W..Åt.&.O..á^•&ùG...Š1.á^ 0001E0

Dump of file SATURN:[PCCOMMON.DUMP.DLL]DBG.TMP;1 on 18-APR-1990 10:43:58.67
File ID (617,9,0)   End of file block 28 / Allocated 28

Virtual block number 10 (0000000A), 512 (0200) bytes

 5EC40001 0247C726 FC5EC408 57892606 47892640 FE5688FC 4688040A 4F802604 .&.O...F•.V±@&.G.&.W.á^•&ùG...á^ 000000
 1E38065E 88EC8855 C3C90000 0447C726 02578926 07892608 57882606 47882604 .&.G.&.V.&...&.V.&ùG...èùU.Š.^.;. 000020
 51160C76 FF0876FF 0A76FF53 CC8804EC 830460E9 0454E9C0 3300098A 0872174B K.r.o..3éÕÏ.Õ'..Š..ÄS.v..v..v..0 000040
 38065E88 0CEC83EC 885500C8 50E588FD 1740A780 91E175C0 855A5900 00FFFF9A .....YZ.åuÅ..ÏM.•.Ì)ù.U.Š.Š..^.; 000060
 16F4468D 51414151 51C93353 12742017 4087F604 13E9C033 00098A08 7217481E .K.r.o..3éÕ..~.M. t.S3èOOAAO.F¶. 000080
 57FCFC46 89FE4689 C0330856 C50A468E FA5E8C66 74801740 87F60000 0E719A50 P.q...-.M..tf.^º.F.éV.3â.F±.F••W 0000A0
 88D488E2 2800808A 0C8802EC 833875AE F20A8049 E30C4E88 F86689F2 88FA8856 V.º.·.f%.N.0Ï¯.·Ùu¡.&..Éo..•â.Å. 0000C0
 1FE80375 F83800B0 009AE900 28E8F4E2 AA1A74F8 380D740A 3CAC0C4E 880716FA º...N.¯<.t.;«t.¯ã¶Ô•.Õ. ¯.;«u.Ò. 0000E0
 00E91042 9AFFFC88 7AE80093 E9FA5E8E 5F5EE1E8 0014E8E2 E8FC46FF 0A80AA00 .¯¯..F•Šàò..ŠÅ^_.^ºÕ..Š± •..B.Ò. 000100
 75C00800 0000829A 5016F446 8D51521E 53065E88 1FE3CA28 CF881F06 1E515350 PSQ....Ü•òD..^.Š,RO.F¶.P.ÿ....Åu 000120
 30007400 60301874 C00808C4 831FC3FA 88585859 1F07740B 08FE5E01 F45E8811 ..^¶.^±.Ut..Y(X.ºù..á..ât.=m.t.= 000140
 880A5E8E 0E744017 4087F6FE 5E8E26E8 F900208A 03E8001C 8A087500 098A0001 ..o..u.o..Š.o .ºŠ&.^±-.M.@t..^.. 000160
 FA5E8E5F 5EF8668B FC4628FE 468806EB F9C03300 1C8A0EEB F803751A 3F80085E ^..?.u.%Š.o..3âºŠ..F±•F•.f%^_.^º 000180
 16F4468D 51521E53 0856C51E EEE8C188 0475C908 0C4E8802 F7E9C85D E5880472 r..Ì)ùÕ%..N..èu..èŠV.éV.S.RO¯F¶. 0001A0
 8AC7E800 1C8ACC75 00098A00 01300074 00603017 74C0081F 071E0000 0F499A50 P.Ï.......ât.=m.t.=..o..uäo..Šùo 0001C0
 33001C8A A6E80275 1A3F8026 DA880A74 40174087 F68775C0 08F4468B C2E80020  .Šò.F¶.Åuñ-.M.@t..ÖR.?.u.Šlo..3 0001E0

Dump of file SATURN:[PCCOMMON.DUMP.DLL]DBG.TMP;1 on 18-APR-1990 10:43:58.67
File ID (617,9,0)   End of file block 28 / Allocated 28

Virtual block number 11 (0000000B), 512 (0200) bytes

 F60C7C00 F883117D 17481E38 065E88EC 88550442 E9008357 56EC8855 00A3E8C0 åŠÈ.U.ŠVWº.Õ8.U.Š.^.;.K.)..«.|.- 000000
 05720546 1E380872 0828DC88 5A5900C8 50E588C0 3302E800 01880574 40174087 .M.@t.¡..Š.3à.Ì)ù.YZ.É•Är.;.F.r. 000020
 1740A780 04885200 02880542 2EFF5152 FC74E9C0 33057540 0542A1C8 5152E388 .DRQùÅB.@u.3àÕt=RQ..B.E..R.å.ÏM. 000040
 81067500 02300774 00013D40 81127558 C0080000 FFFF9A52 16501653 C4885087 ƒP.áS.P.R......âXu.Ÿ@=..t.=..u.Ÿ 000060
 01AEE903 7319761E FFD833C2 8C197A06 C41EE319 780E885A D4794817 408F0808 ...M.KyåZ..x.D.á.z..ô3Ù..v.s.ÕÙ. 000080
 880073E8 19828F19 828E007C E819828F 19828E19 761EFF00 0388C28C 197E06C4 á.-..ôE....v./..«..Õ|./..«..Òs.¡ 0000A0
 51E81986 8F19828E D88E0D5E 88C30000 FFFF9A10 E3680E01 6A087419 86301982 ..=..t.j..hD......Ûı¯..Äƒ..«..Òo 0000C0
 31E81986 8F19828E 003AE818 FC8F18FC 8EEC8855 0000100E 9A006A00 6A036A00 .j.j.j..R...U.Š/•.«•.Ò:./..«..Ò1 0000E0
 9A500646 8A50C033 001AE819 868F1986 8E0023E8 19868F19 868EEC88 5503E800 .Š.U.â/..«..Õ#./..«..Ò..3âP.F.P. 000100
 F2740245 08058804 EF830E73 F738C319 761EFF00 028807E3 19780E88 0000FFFF ......x.D.E....v.ù;%s..ÿ....E.t 000120
 89C02801 0C168800 F0E90375 010C3639 FF28F628 56570000 14C800C3 EEE810FF ..ŠŸù.à...WV+-+.96..u.Õb.....•Å. 000140
 080AC483 11CA1424 9A051668 1EF676FF F876FF0C 6AF85689 F64689F2 5689F046 Fb.V·.F-.V%j..v%.v-.h...Š.ò..á.. 000160
 FFF65EC4 0CE847EA 75003F80 26F646FF F65EC400 8CE90376 7FFFFE81 461974C0 ât.F.±..v.ÕV.á^-.F-&.?.uõGŠ.á^-. 000180
 8904C483 11D913CC 9A046A50 0145808A 75003F80 26F65E88 F475003F 8026F646 F-&.?.u¶.^-&.?.uo.E.Pj..ä.1..á.. 0001A0
 08FC4688 6D74EE46 08EC4688 FE5689FC 468902C4 83120F13 119A56EE 5689EC46 F&.VŸV......á..F•.V±.F&.FŸtm.F•. 0001C0
 2E14249A 0516681E F076FFF2 76FF0C6A 19551689 1953A3EE 5688EC46 886674C2 ôtf.F&.VŸÈS...U.j..v·.vb.h.  Š.. 0001E0
```

Dump of file SATURN:[PCCOMMON.DUMP.DLL]DBG.TMP;1 on 18-APR-1990 10:43:58.67
File ID (617,9,0)   End of file block 28 / Allocated 28

Virtual block number 12 (0000000C), 512 (0200) bytes

```
FFF05EC4 04EC4683 02578926 078926FE 5688FC46 88EC5EC4 2C74C008 0AC4830F ..á..ât,á^š.F•.V‡&..&.W..Fš.á^b. 000000
F475003F 8026F046 FFF05EC4 E8EB0E74 C00A0788 26FC46FF FC5EC407 8A26F046 Fb&..á^•.F•&...ât.Šòá^b.Fb&.?.u¶ 000020
09060005 18040203 02021601 FA70E900 028890C8 C95F5EA7 75003F80 26F05EC4 á^b&.?.uI^_èu.j..Ôp•........... 000040
00530052 02430041 02350212 12110010 120F1600 160C0808 070A0C09 0C080C07 ......................S.A.C.R.S. 000060
1264BB17 49A3CB5D E58899FF FFB80008 E8CB5DE5 8899FFFF B8174216 891749A3 W.Y.I.m p.r...........É.c.@..... 000080
76CA3C04 728C3C43 0A76243C 0472133C F7E24343 1674073A 2E1875E4 0A0024B9 É|...B.I....I]ùÒ..|....I] É!.Éd. 0000A0
5DE58801 FE4F8026 0574C308 C08C065E C4EC8855 00C31742 A3980147 8A2E4301 ¿$..Ôu..:.t.CCã¼<.r.<$v.C<.-.<òv 0000C0
196AA312 740025E8 08750019 6A3E831E 73FFF130 06468857 5602EC83 EC8855C8 .C..G..ÈB.ū.U.šá^..â.ût.&.O‡..|] 0000E0
C850E588 5E5F02C4 83118A15 169A0676 FF087500 78E80574 0018E815 750082E8 ùU.š.$.VU.F.÷þ.s..>j..u.Ò%.t.Èj. 000100
C29A5002 80510E4F 8D50501E C033FE5E 89FEE383 43065E88 0776065E 3900F08B Ò..u.Ò..t.Òx.u..v.......á._^.I]ù 000120
FE5E8800 08A30A8E 0574D208 196EA319 6C1687C2 883874FF FA8308C4 83134516 Eb.9^.v..^.C.D‡.^‡3à.PP.O.Ō¯.P.ō 000140
06A30000 05000AA3 01478000 02A30000 A3000A88 0C478948 480008A3 C033D88E .E..á..•.t8.ō..|.Èn..@t..ÒÈ...^‡ 000160
00000AC8 C3098EC1 8C020B01 9AE8196E 1E8ED833 064E88C0 8ED88CC3 1FD88C00 .Ä3àÉ..HH.G.j..É..É...G.É.....É. 000180
EB99C028 0674FFFF C2F7FA56 89F84689 13F917C0 9A0676FF 006A0876 FF006A56 ..Ä.ù.Ä.â.N.3U..n.Ò...@.è.1ùà... 0001A0
9A50FE76 FF006A56 1274D008 FE5689FC 468902C4 83141213 119A56F8 7688902F Vj..v.j..v..â.•..F½.V•%ô..t.+â.Š 0001C0
                                                                        /..v%V......á..F•.V‡.Ât.Vj..v‡P. 0001E0
```

Dump of file SATURN:[PCCOMMON.DUMP.DLL]DBG.TMP;1 on 18-APR-1990 10:43:58.67
File ID (617,9,0)   End of file block 28 / Allocated 28

Virtual block number 13 (00000000), 512 (0200) bytes

```
8827E30E 4E881E56 57EC8855 90C8C95E FE5688FC 46889007 E808C483 13711778 x.q..á.Š...F•.V‡^èù.U.ŠWV..N.D'. 000000
0477FF45 3A26C933 FF448AA6 F30A76C5 FE88C803 D9F7AEF2 C033F788 067EC409 1á-..%3à·Ú%1.ù.‡év.æ1.D.3è&:E.w. 000020
071E570A 7EC51E08 56880646 880E4E88 00C850E5 885F5E1F C188D1F7 49490474 t.II%1.è.^_.Ilù..N..F..V..é-.W.. 000040
C008D233 92F788DA F7000283 D8F7AA2D 800A7902 080E750A F9831374 C00A93FC •..ât..•.u..@y.¯-¯%Ü.@.%Ö.%.3@.â 000060
880586AC 4F0588E2 75C308C2 88AA2704 0276393C 30040387 92F1F793 F1F70274 t.%b.%b..Æ.0<9v..•¯.ô.ùuã..O¯... 000080
8CFA4689 05488856 000006C8 00C850E5 885E5F1F 58DA8CF2 72C73801 448DFF44 D..D.;ûr·.ÖX._^.I]ù.Â...V|H..F•. 0000A0
46834601 744004C4 83130E17 F49A5306 0E74830A 47F626FA 5EC41CE8 F628FC5E ^•+-Š.á^•&-G.¯t..S.¶.B..á.@t.F.F 0000C0
4F800474 D808065E 88EC8855 90C8C95E C6880876 FA463917 38168817 36A10CFA •.Â6...8.9F•vÄ.ó^èù.U.$.^..Üt..O 0000E0
99C03305 750176E8 00058807 1E297500 3F831960 885756EC 8855C850 E58801FE ‡..I]ùU.$VWE•..7.u)..|..Òv.u.3â. 000100
8C064E88 19663689 FFFEFE44 C704C683 000104C7 961962A3 1960A3FE 244024E8 Š‡a$‡É•.Èb..ú....ó.ùD‡‡..6f..N.. 000120
88ADFC02 7788F273 EEF983FE E180FA74 410000E9 C850E588 5E5F0009 E8C08ED8 Ä.âò.._^.IJùÒÄ.At•.Ä‡.•Vs·.w.•Ü. 000140
88E6E8FE 4489F788 000205C2 03357401 A8ADF003 D0881573 C1384843 7401A8FE ‡¨.tCH;ès..Ä.bÜ¨.t5.ô....%.D‡Š1. 000160
26057401 3810E489 DA8CC688 FE4CFEF9 0305E805 8948C128 FE4C89F9 030C74FE ‡t..•.L‡+èH..Š..•‡L‡.ó.Ò¿ō.;1t.& 000180
3848FE88 F27401A8 ADF003FE 882574FF FE3D0219 7206C626 C3027F89 196E1E8C ..n....ù&ó.r..=‡.t%.‡.bÜ¨.t·.‡H; 0001A0
8E0474C0 08084788 E6E8FE44 89F78800 0205C203 E27401A8 ADF00300 888C73C1 ésV.Ä.bÜ¨.tã.ô....%.D‡Š1.G..ât.. 0001C0
33067788 88E83788 196A1E8E 260574C7 3815A98F 088C1274 19720EFE 2615E808 ÄŠ.&‡.r.t..Ä€¨.;út.&..j..7ŠE.w.3 0001E0
```

Dump of file SATURN:[PCCOMMON.DUMP.DLL]DBG.TMP;1 on 18-APR-1990 10:43:58.67
File ID (617,9,0)   End of file block 28 / Allocated 28

Virtual block number 14 (0000000E), 512 (0200) bytes

```
8C98E84E 4E960574 001DE8FE 4DFE0074 005FE898 40400124 0074C638 0068E8C0 âÒk.;ót.$.aa.Ò_.t.‡M‡Ò..t..N.¨.. 000000
49C82803 7401A8FE 458851C3 99C03302 47890788 196EA326 0474C138 15F08908 Ä¿».;èt.&Èn....G.3Ä.ÙQ.E‡¨.t.. • 000020
C628C223 02F70072 C2031572 C603C188 F575EA01 04761970 1638267F FF8A4141 AÄn..&;.p.v.IôuŊ.ê.ór..ór.%@#ô+ô 000040
FE44C7F2 03F088FE 88571874 001DE851 52C359C0 33E575EA D102F708 75000CE8 Ò..u.%@1ôu13âYúRQÒ..t.W.‡.b.·ùD‡ 000060
9A1F0650 00018850 52521E02 335053C3 5A5958FE 55894AD7 28068806 7789FFFE ‡..W..ø+mJ.U‡XYZùSP3@.RRP|..P... 000080
148F3875 000A7E83 065756EC 8855C302 0802745B 5A1FFFFA 8308C483 14E516C2 ô.Î..á..•..Z{t..@ùU.ŠVW..~..uB€. 0000A0
89024488 0074F738 11744805 1436884C E8277200 57E80775 48064688 08568801 ..V..F.Nu.ÒV.r'ŠL.6..Nt.;%t..D.. 0000C0
52C48850 21E899FF FFB80675 D2080473 0514FE81 04C68334 735E003E E8560E46 F.VÒ>.^s4.6..‡..s..@u.|...ŠIP.6R 0000E0
5E5F07C0 33038805 14368902 5C891489 E675C085 F9580000 FFFF9A50 C0335016 .P3âP.....[•.âu]...\..6...Æ3â._^ 000100
26721C03 DA882CE8 F9F27505 14FE8104 C6830C74 024C39F7 880E4E88 C850E588 .I]ù.N..%9L.t..6..‡..u·•Š,.Ö..F& 000120
0E168904 75F738DE 75C08500 00FFFF9A 51531373 010E1E39 0675F738 C18ED388 .Æ.ê;%u.9...s.SQ......âuÆ;%u.... 000140
D3230818 01280C74 DAF7D788 067EC457 38E30C4E 88EC8855 00C3018B 04879201 .....1ù.U.Š.N.DBVá-..m%Öt.+1.ÙW& 000160
D1C38EFF FFC381C3 8C10E3D1 87AAF3C9 13A8F3E9 D1E08A0A 46880128 01870103 .1.1+1.F..Â1Ôµ¨.èµ¯.1D..û.û...ù1 000180
08750A5E 8808080C 5E880846 88EC8855 C8500856 88064688 5FAAF3C9 13A8F3E9 Ôµ¨.èµ^.F..V.]ùU.Š.F..^..Ä.^.u. 0001A0
E5880103 E3F70646 88C8030C 66F70646 88C888E3 F70008CA 50E588E3 F7064688 .F.%D.1Jò..%D.à.F.%f..à.F.%D.1.I 0001C0
88157508 0A47F626 5575023C 03240A47 8A26065E C4F62856 000004C8 0008CA50 Jò..à...V+-á^.&.G.$.<.ùÙ&-G..u.. 0001E0
```

```
Dump of file SATURN:[PCCOMMON.DUMP.DLL]DBG.TMP;1 on 18-APR-1990 10:43:58.67
File ID (617,9,0)   End of file block 28 / Allocated 28

Virtual block number 15 (0000000F), 512 (0200) bytes

46890647 2B26078B 26065E8B 39740111 3C87F606 D868F9F7 000C8999 05482DC3 Û-H..¿..%ªkÄ.-.<..t9.^.&..&+G..F 000000
FC463B08 C48316B2 0EB69A50 E42A0047 BA260677 FF260877 FF265028 7EC00BFC ».å~(P&.w.&.w.&.G.*ôP...ÿ..á.;F= 000020
26025789 26078926 08578B26 06478B26 065EC4FF FFBE200A 4F802606 5EC40874 t.á^.&.O. /..á^.&.G.&.W.&..&.W.& 000040
10F80103 00050001 11300103 00000003 18480002 000CCBC9 5EC68B00 000447C7 úG....ó^èÜ....H.......0.......½. 000060
17610103 00220001 17160103 00880001 17A80105 00000005 16320002 00070001 ......2.....................".... a. 000080
0CBE0103 004D0001 107A0103 00260005 0FD20203 003A0001 0EB20103 00260001 ..&...ÿ...:...@...&...z...M.../. 0000A0
542D6E75 5220534D 00000000 00000000 00000000 005C0001 0CAB0103 005B0001 ..[......\............MS Run-1 0000C0
38383931 20296328 20746867 69727970 6F43202D 20797261 7262694C 20656069 ime Library - Copyright (c) 1988 0000E0
0A732520 3A6E6F69 74726573 73410011 70726F43 2074666F 736F7263 6940202C , Microsoft Corp..Assertion: %s. 000100
6E6F6974 72657373 41007325 0A0A7525 203A656E 694C0A73 2520203A 656C6946 File:  %s.Line: %u..%s.Assertion 000120
6966202C 7325203A 64656C69 6166206E 6F697472 65737341 0064656C 69614620  failed.Assertion failed: %s, fi 000140
726F2073 7365636F 72702074 726F6241 000A7525 20656E69 6C202C73 2520656C le %s, line %u..Abort process or 000160
65592020 2020200A 7463656C 65530020 3F29432F 41282065 756E6974 6E6F6320  continue (A/C)? .Select.     Ye 000180
6F727020 646E6520 6F74206F 4E202020 20200A65 756E6974 6E6F6320 6F742073 s to continue.      No to end pro 0001A0
1C000000 00000000 23202D28 00296C6C 756E2800 296C6C75 6E280000 73736563 cess..(null).(null).+- #........ 0001C0
00000000 00000000 00000000 00000000 00000000 00000000 19861C00 11131C00 ................................ 0001E0

Dump of file SATURN:[PCCOMMON.DUMP.DLL]DBG.TMP;1 on 18-APR-1990 10:43:58.67
File ID (617,9,0)   End of file block 28 / Allocated 28

Virtual block number 16 (00000010), 512 (0200) bytes

00000000 00000000 00000000 00000000 00000000 00000000 00000000 00000000 ................................ 000000
00000000 00000000 00000000 00000000 00000000 00000000 00000000 00000000 ................................ 000020
00000000 00000000 00000000 00000000 00000000 00000000 00000000 00000000 ................................ 000040
00000000 00000000 00000000 00000000 00000000 00000000 00000000 00000000 ................................ 000060
00000000 00000000 00000000 00000000 00000000 00000000 00000000 00000000 ................................ 000080
00000000 00000000 00000000 00000000 00000000 00000000 00000000 00000000 ................................ 0000A0
00000000 00000000 00000000 00000000 00000000 00000000 00000000 00000000 ................................ 0000C0
00000000 00000000 00000000 00000000 00000000 00000000 00000000 00000000 ................................ 0000E0
00000000 00000000 00000000 00000000 00000000 00000000 00000000 00000000 ................................ 000100
00000000 00000000 00000000 00000000 00000000 00000000 00000000 00000000 ................................ 000120
00000000 00000000 00000000 00000000 00000000 00000000 00000000 00000000 ................................ 000140
00000000 00000000 00000000 00000000 00000000 00000000 00000000 00000000 ................................ 000160
00000000 00000000 00000000 00000000 00000000 00000000 00000000 00000000 ................................ 000180
00000000 00000000 00000000 00000000 00000000 00000000 00000000 00000000 ................................ 0001A0
00000000 00000000 00000000 00000000 00000000 00000000 00000000 00000000 ................................ 0001C0
00000000 00000000 00000000 00000000 00000000 00000000 00000000 00000000 ................................ 0001E0

Dump of file SATURN:[PCCOMMON.DUMP.DLL]DBG.TMP;1 on 18-APR-1990 10:43:58.67
File ID (617,9,0)   End of file block 28 / Allocated 28

Virtual block number 17 (00000011), 512 (0200) bytes

00000000 00000000 00000000 00000000 00000000 00000000 00000000 00000000 ................................ 000000
00000000 00000000 00000000 00000000 00000000 00000000 00000000 00000000 ................................ 000020
00000000 00000000 00000000 00000000 00000000 00000000 00000000 00000000 ................................ 000040
00000000 00000000 00000000 00000000 00000000 00000000 00000000 00000000 ................................ 000060
00000000 00000000 00000000 00000000 00000000 00000000 00000000 00000000 ................................ 000080
00000000 00000000 00000000 00000000 00000000 00000000 00000000 00000000 ................................ 0000A0
00000000 00000000 00000000 00000000 00000000 00000000 00000000 00000000 ................................ 0000C0
00000000 00000000 00000000 00000000 00000000 00000000 00000000 00000000 ................................ 0000E0
00000000 00000000 00000000 00000000 00000000 00000000 00000000 00000000 ................................ 000100
00000000 00000000 00000000 00000000 00000000 00000000 00000000 00000000 ................................ 000120
00000000 00000000 00000000 00000000 00000000 00000000 00000000 00000000 ................................ 000140
00000000 00000000 00000000 00000000 00000000 00000000 00000000 00000000 ................................ 000160
00000000 00000000 00000000 00000000 00000000 00000000 00000000 00000000 ................................ 000180
00000000 00000000 00000000 00000000 00000000 00000000 00000000 00000000 ................................ 0001A0
00000000 00000000 00000000 00000000 00000000 00000000 00000000 00000000 ................................ 0001C0
052A125E FFFF125E 00000000 00304F46 4E495F45 4C49465F 435F0114 00000000 ......_C_FILE_INFO=.....^...^.*. 0001E0
```

```
Dump of file SATURN:[PCCOMMON.DUMP.DLL]DBG.TMP;1 on 18-APR-1990 10:43:58.67
File ID (617,9,0)   End of file block 28 / Allocated 28

Virtual block number 18 (00000012), 512 (0200) bytes

00000000 05500000 0200FFFF FFFF0101 00000000 0536125E 0532125E 052E125E ^...^.2.^.6...............P..... 000000
00000000 02020000 00000000 00000000 01020000 00000000 00000000 0001FFFF ................................ 000020
00000000 00000000 00000000 00000000 00000000 00000000 00000000 00000000 ................................ 000040
00000000 00000000 00000000 00000000 00000000 00000000 00000000 00000000 ................................ 000060
00000000 00000000 00000000 00000000 00000000 00000000 00000000 00000000 ................................ 000080
00000000 00000000 00000000 00000000 00000000 00000000 00000000 00000000 ................................ 0000A0
00000000 00000000 00000000 00000000 00000000 00000000 00000000 00000000 ................................ 0000C0
00000000 00000000 00000000 00000000 00000000 00000000 00000000 00000000 ................................ 0000E0
00000000 00000000 00000000 00000000 00000000 00000000 00000000 00000000 ................................ 000100
00000000 00000000 00000000 00000000 00000000 00000000 00000000 00000000 ................................ 000120
00000000 00000000 00000000 00000000 00000000 00000000 00000000 00000000 ................................ 000140
00000000 00000000 00000000 00000000 00000000 00000000 00000000 00000000 ................................ 000160
00000000 00000000 00000000 00000000 00000000 00000000 00000000 00000000 ................................ 000180
00000000 00000000 00000000 00000000 00000000 00000000 00000000 00000000 ................................ 0001A0
00000000 00000000 00000000 00000000 00000000 00000000 00000000 00000000 ................................ 0001C0
00000000 00000000 00000000 00000000 00000000 00000000 00000000 00000000 ................................ 0001E0

Dump of file SATURN:[PCCOMMON.DUMP.DLL]DBG.TMP;1 on 18-APR-1990 10:43:58.67
File ID (617,9,0)   End of file block 28 / Allocated 28

Virtual block number 19 (00000013), 512 (0200) bytes

00000000 00000000 00000000 00000000 00000000 00000000 00000000 00000000 ................................ 000000
00000000 00000000 00000000 00000000 00000000 00000000 00000000 00000000 ................................ 000020
00000000 00000000 00000000 00000000 00000000 00000000 00000000 00000000 ................................ 000040
00000000 00000000 00000000 00000000 00000000 00000000 00000000 00000000 ................................ 000060
00000000 00000000 00000000 00000000 00000000 00000000 00000000 00000000 ................................ 000080
00000000 00000000 00000000 00000000 00000000 00000000 00000000 00000000 ................................ 0000A0
00000000 00000000 00000000 00000000 00000000 00000000 00000000 00000000 ................................ 0000C0
00000000 00000000 00000000 00000000 00000000 00000000 00000000 00000000 ................................ 0000E0
00000000 00000000 00000000 00000000 00000000 00000000 00000000 00000000 ................................ 000100
00000000 00000000 00000000 00000000 00000000 00000000 00000000 00000000 ................................ 000120
00000000 00000000 00000000 00000000 00000000 00000000 00000000 00000000 ................................ 000140
00000000 00000000 00000000 00000000 00000000 00000000 00000000 00000000 ................................ 000160
00000000 00000000 00000000 00000000 00000000 00000000 00000000 00000000 ................................ 000180
00000000 00000000 00000000 00000000 00000000 00000000 00000000 00000000 ................................ 0001A0
00000000 00000000 00000000 00000000 00000000 00000000 00000000 00000000 ................................ 0001C0
00000000 00000000 00000000 00000000 00000000 00000000 00000000 00000000 ................................ 0001E0

Dump of file SATURN:[PCCOMMON.DUMP.DLL]DBG.TMP;1 on 18-APR-1990 10:43:58.67
File ID (617,9,0)   End of file block 28 / Allocated 28

Virtual block number 20 (00000014), 512 (0200) bytes

00000000 00000000 00000000 00000000 00000000 00000000 00000000 00000000 ................................ 000000
00000000 00000000 00000000 00000000 00000000 00000000 00000000 00000000 ................................ 000020
00000000 00000000 00000000 00000000 00000000 00000000 00000000 00000000 ................................ 000040
00000000 00000000 00000000 00000000 00000000 00000000 00000000 00000000 ................................ 000060
00000000 00000000 00000000 00000000 00000000 00000000 00000000 00000000 ................................ 000080
00000000 00000000 00000000 00000000 00000000 00000000 00000000 00000000 ................................ 0000A0
00000000 00000000 00000000 00000000 00000000 00000000 00000000 00000000 ................................ 0000C0
00000000 00000000 00000000 00000000 00000000 00000000 00000000 00000000 ................................ 0000E0
00000000 00000000 00000000 00000000 00000000 00000000 00000000 00000000 ................................ 000100
00000000 00000000 00000000 00000000 00000000 00000000 00000000 00000000 ................................ 000120
00000000 00000000 00000000 00000000 00000000 00000000 00000000 00000000 ................................ 000140
00000000 00000000 00000000 00000000 00000000 00000000 00000000 00000000 ................................ 000160
00000000 00000000 00000000 00000000 00000000 00000000 00000000 00000000 ................................ 000180
00000000 00000000 00000000 00000000 00000000 00000000 00000000 00000000 ................................ 0001A0
00000000 00000000 00000000 00000000 00000000 00000000 00000000 00000000 ................................ 0001C0
00000000 00000000 00000000 00000000 00000000 00000000 00000000 00000000 ................................ 0001E0
```

```
Dump of file SATURN:[PCCOMMON.DUMP.DLL]DBG.TMP;1 on 18-APR-1990 10:43:58.67
File ID (617,9,0)    End of file block 28 / Allocated 28

Virtual block number 21 (00000015), 512 (0200) bytes

 00000000 00000000 00000000 00000000 00000000 00000000 00000000 00000000 ................................ 000000
 00000000 00000000 00000000 00000000 00000000 00000000 00000000 00000000 ................................ 000020
 00000000 00000000 00000000 00000000 00000000 00000000 00000000 00000000 ................................ 000040
 00000000 00000000 00000000 00000000 00000000 00000000 00000000 00000000 ................................ 000060
 00000000 00000000 00000000 00000000 00000000 00000000 00000000 00000000 ................................ 000080
 00000000 00000000 00000000 00000000 00000000 00000000 00000000 00000000 ................................ 0000A0
 00000000 00000000 00000000 00000000 00000000 00000000 00000000 00000000 ................................ 0000C0
 00000000 00000000 00000000 00000000 00000000 00000000 00000000 00000000 ................................ 0000E0
 00000000 00000000 00000000 00000000 00000000 00000000 00000000 00000000 ................................ 000100
 00000000 00000000 00000000 00000000 00000000 00000000 00000000 00000000 ................................ 000120
 00000000 00000000 00000000 00000000 00000000 00000000 00000000 00000000 ................................ 000140
 00000000 00000000 00000000 00000000 00000000 00000000 00000000 00000000 ................................ 000160
 00000000 00000000 00000000 00000000 00000000 00000000 00000000 00000000 ................................ 000180
 00000000 00000000 00000000 00000000 00000000 00000000 00000000 00000000 ................................ 0001A0
 00000000 00000000 00000000 00000000 00000000 00000000 00000000 00000000 ................................ 0001C0
 00000000 00000000 00000000 00000000 00000000 00000000 00000000 00000000 ................................ 0001E0

Dump of file SATURN:[PCCOMMON.DUMP.DLL]DBG.TMP;1 on 18-APR-1990 10:43:58.67
File ID (617,9,0)    End of file block 28 / Allocated 28

Virtual block number 22 (00000016), 512 (0200) bytes

 00000000 00000000 00000000 00000000 00000000 00000000 00000000 00000000 ................................ 000000
 00000000 00000000 00000000 00000000 00000000 00000000 00000000 00000000 ................................ 000020
 00000000 00000000 00000000 00000000 00000000 00000000 00000000 00000000 ................................ 000040
 00000000 00000000 00000000 00000000 00000000 00000000 00000000 00000000 ................................ 000060
 00000000 00000000 00000000 00000000 00000000 00000000 00000000 00000000 ................................ 000080
 00000000 00000000 00000000 00000000 00000000 00000000 00000000 00000000 ................................ 0000A0
 00000000 00000000 00000000 00000000 00000000 00000000 00000000 00000000 ................................ 0000C0
 00000000 00000000 00000000 00000000 00000000 00000000 00000000 00000000 ................................ 0000E0
 00000000 00000000 00000000 00000000 00000000 00000000 00000000 00000000 ................................ 000100
 00000000 00000000 00000000 00000000 00000000 00000000 00000000 00000000 ................................ 000120
 00000000 00000000 00000000 00000000 00000000 00000000 00000000 00000000 ................................ 000140
 00000000 00000000 00000000 00000000 00000000 00000000 00000000 00000000 ................................ 000160
 00000000 00000000 00000000 00000000 00000000 00000000 00000000 00000000 ................................ 000180
 00000000 00000000 00000000 00000000 00000000 00000000 00000000 00000000 ................................ 0001A0
 00000000 00000000 00000000 00000000 00000000 00000000 00000000 00000000 ................................ 0001C0
 00000000 00000000 00000000 00000000 00000000 00000000 00000000 00000000 ................................ 0001E0

Dump of file SATURN:[PCCOMMON.DUMP.DLL]DBG.TMP;1 on 18-APR-1990 10:43:58.67
File ID (617,9,0)    End of file block 28 / Allocated 28

Virtual block number 23 (00000017), 512 (0200) bytes

 00000000 00000000 00000000 00000000 00000000 00000000 00000000 00000000 ................................ 000000
 00000000 00000000 00000000 00000000 00000000 00000000 00000000 00000000 ................................ 000020
 00000000 00000000 00000000 00000000 00000000 00000000 00000000 00000000 ................................ 000040
 00000000 00000000 00000000 00000000 00000000 00000000 00000000 00000000 ................................ 000060
 00000000 00000000 00000000 00000000 00000000 00000000 00000000 00000000 ................................ 000080
 00000000 00000000 00000000 00000000 00000000 00000000 00000000 00000000 ................................ 0000A0
 00000000 00000000 00000000 00000000 00000000 00000000 00000000 00000000 ................................ 0000C0
 00000000 00000000 00000000 00000000 00000000 00000000 00000000 00000000 ................................ 0000E0
 00000000 00000000 00000000 00000000 00000000 00000000 00000000 00000000 ................................ 000100
 00000000 00000000 00000000 00000000 00000000 00000000 00000000 00000000 ................................ 000120
 00000000 00000000 00000000 00000000 00000000 00000000 00000000 00000000 ................................ 000140
 00000000 00000000 00000000 00000000 00000000 00000000 00000000 00000000 ................................ 000160
 00000000 00000000 00000000 00000000 00000000 00000000 00000000 00000000 ................................ 000180
 00000000 00000000 00000000 00000000 00000000 00000000 00000000 00000000 ................................ 0001A0
 00000000 00000000 00000000 00000000 00000000 00000000 00000000 00000000 ................................ 0001C0
 00000000 00000000 00000000 00000000 00000000 00000000 00000000 00000000 ................................ 0001E0
```

```
Dump of file SATURN:[PCCOMMON.DUMP.DLL]DBG.TMP;1 on 18-APR-1990 10:43:58.67
File ID (617,9,0)   End of file block 28 / Allocated 28

Virtual block number 24 (00000018), 512 (0200) bytes

00000000 00000000 00000000 00000000 02000001 00000000 00000000 00000000 ................................ 000000
00000000 00000000 00000000 00000000 00000000 00000000 00000000 00000000 ................................ 000020
00000000 00000000 00000000 00000000 00000000 00000000 00000000 00000000 ................................ 000040
00000000 00000000 00000000 00000000 00000000 00000000 00000000 00000000 ................................ 000060
00000000 00000000 00000000 00000000 00000000 00000000 00000000 00000000 ................................ 000080
00000000 00000000 00000000 00000000 00000000 00000000 00000000 00000000 ................................ 0000A0
00000000 00000000 00000000 00000000 00000000 00000000 00000000 00000000 ................................ 0000C0
00000000 00000000 00000000 00000000 00000000 00000000 00000000 00000000 ................................ 0000E0
00000000 00000000 00000000 00000000 00000000 00000000 00000000 00000000 ................................ 000100
00000000 00000000 00000000 00000000 00000000 00000000 00000000 00000000 ................................ 000120
00000000 00000000 00000000 00000000 00000000 00000000 00000000 00000000 ................................ 000140
00000000 00000000 00000000 00000000 00000000 00000000 00000000 00000000 ................................ 000160
00000000 00000000 00000000 00000000 00000000 00000000 00000000 00000000 ................................ 000180
00000000 00000000 00000000 00000000 00000000 00000000 00000000 00000000 ................................ 0001A0
00000000 00000000 00000000 00000000 00000000 00000000 00000000 00000000 ................................ 0001C0
00000000 00000000 00000000 00000000 00000000 00000000 00000000 00000000 ................................ 0001E0

Dump of file SATURN:[PCCOMMON.DUMP.DLL]DBG.TMP;1 on 18-APR-1990 10:43:58.67
File ID (617,9,0)   End of file block 28 / Allocated 28

Virtual block number 25 (00000019), 512 (0200) bytes

00000000 00000000 00000000 00000000 00000000 00000000 00000000 00000000 ................................ 000000
00000000 00000000 00000000 00000000 00000000 00000000 00000000 00000000 ................................ 000020
00000000 00000000 00000000 00000000 00000000 00000000 00000000 00000000 ................................ 000040
00000000 00000000 00000000 00000000 00000000 00000000 00000000 00000000 ................................ 000060
00000000 00000000 00000000 00000000 00000000 00000000 00000000 00000000 ................................ 000080
00000000 00000000 00000000 00000000 00000000 00000000 00000000 00000000 ................................ 0000A0
00000000 00000000 00000000 00000000 00000000 00000000 00000000 00000000 ................................ 0000C0
00000000 00000000 00000000 00000000 00000000 00000000 00000000 00000000 ................................ 0000E0
00000000 00000000 00000000 00000000 00000000 00000000 00000000 00000000 ................................ 000100
00000000 00000000 00000000 00000000 00000000 00000000 00000000 00000000 ................................ 000120
00000000 00000000 00000000 00000000 00000000 00000000 00000000 00000000 ................................ 000140
00000000 00000000 00000000 00000000 00000000 00000000 00000000 00000000 ................................ 000160
00000000 00000000 00000000 00000000 00000000 00000000 00000000 00000000 ................................ 000180
00000000 00000000 00000000 00000000 00000000 00000000 00000000 00000000 ................................ 0001A0
00000000 00000000 00000000 00000000 00000000 00000000 00000000 00000000 ................................ 0001C0
00000000 00000000 00000000 00000000 00000000 00000000 00000000 00000000 ................................ 0001E0

Dump of file SATURN:[PCCOMMON.DUMP.DLL]DBG.TMP;1 on 18-APR-1990 10:43:58.67
File ID (617,9,0)   End of file block 28 / Allocated 28

Virtual block number 26 (0000001A), 512 (0200) bytes

00000000 00000000 00000000 00000000 00000000 00000000 00000000 00000000 ................................ 000000
00000000 00000000 00000000 00000000 00000000 00000000 00000000 00000000 ................................ 000020
00000000 00000000 00000000 00000000 00000000 00000000 00000000 00000000 ................................ 000040
00000000 00000000 00000000 00000000 00000000 00000000 00000000 00000000 ................................ 000060
00000000 00000000 00000000 00000000 00000000 00000000 00000000 00000000 ................................ 000080
00000000 00000000 00000000 00000000 00000000 00000000 00000000 00000000 ................................ 0000A0
00000000 00000000 00000000 00000000 00000000 00000000 00000000 00000000 ................................ 0000C0
00000000 00000000 00000000 00000000 00000000 00000000 00000000 00000000 ................................ 0000E0
00000000 00000000 00000000 00000000 00000000 00000000 00000000 00000000 ................................ 000100
00000000 00000000 00000000 00000000 00000000 00000000 00000000 00000000 ................................ 000120
00000000 00000000 00000000 00000000 00000000 00000000 00000000 00000000 ................................ 000140
00000000 00000000 00000000 00000000 00000000 00000000 00000000 00000000 ................................ 000160
00000000 00000000 00000000 00000000 00000000 00000000 00000000 00000000 ................................ 000180
00000000 00000000 00000000 00000000 00000000 00000000 00000000 00000000 ................................ 0001A0
00000000 00000000 00000000 00000000 00000000 00000000 00000000 00000000 ................................ 0001C0
00000000 00000000 00000000 00000000 00000000 00000000 00000000 00000000 ................................ 0001E0
```

```
Dump of file SATURN:[PCCOMMON.DUMP.DLL]DBG.TMP;1 on 18-APR-1990 10:43:58.67
File ID (617,9,0)   End of file block 28 / Allocated 28

Virtual block number 27 (0000001B), 512 (0200) bytes

81818101 00000001 00000000 00000000 00000000 00000116 11300000 00000000 ......0......................... 000000
00000000 00000000 00000000 00000000 00000000 00000000 00000000 00000000 ................................ 000020
00000000 00000000 00000000 00000000 00000000 00000000 00000000 00000000 ................................ 000040
00000000 00000000 00000000 00000000 00000000 00000000 00000000 00000000 ................................ 000060
00000000 00000000 00000000 00000000 00000000 00000000 00000000 00000000 ................................ 000080
00000000 00000000 00000000 00000000 00000000 00000000 00000000 00000000 ................................ 0000A0
00000000 00000000 00000000 00000000 00000000 00000000 00000000 00000000 ................................ 0000C0
00000000 00000000 00000000 00000000 00000000 00000000 00000000 00000000 ................................ 0000E0
0A0A0A00 00000000 00000000 00000000 00000000 00000000 00000000 00000000 ................................ 000100
0A0A0A0A 0A0A0A0A 0A0A0A0A 0A0A0A0A 0A0A0A0A 0A0A0A0A 0A0A0A0A 0A0A0A0A ................................ 000120
0A0A0A0A 0A0A0A0A 0A0A0A0A 0A0A0A0A 0A0A0A0A 0A0A0A0A 0A0A0A0A 0A0A0A0A ................................ 000140
0A0A0A0A 0A0A0A0A 0A0A0A0A 0A0A0A0A 0A0A0A0A 0A0A0A0A 0A0A0A0A 0A0A0A0A ................................ 000160
0A0A0A0A 0A0A0A0A 0A0A0A0A 0A0A0A0A 0A0A0A0A 0A0A0A0A 0A0A0A0A 0A0A0A0A ................................ 000180
0A0A0A0A 0A0A0A0A 0A0A0A0A 0A0A0A0A 0A0A0A0A 0A0A0A0A 0A0A0A0A 0A0A0A0A ................................ 0001A0
0A0A0A0A 0A0A0A0A 0A0A0A0A 0A0A0A0A 0A0A0A0A 0A0A0A0A 0A0A0A0A 0A0A0A0A ................................ 0001C0
0A0A0A0A 0A0A0A0A 0A0A0A0A 0A0A0A0A 0A0A0A0A 0A0A0A0A 0A0A0A0A 0A0A0A0A ................................ 0001E0

Dump of file SATURN:[PCCOMMON.DUMP.DLL]DBG.TMP;1 on 18-APR-1990 10:43:58.67
File ID (617,9,0)   End of file block 28 / Allocated 28

Virtual block number 28 (0000001C), 512 (0200) bytes

0000000A 0A0A0A0A 0A0A0A0A 0A0A0A0A 0A0A0A0A 0A0A0A0A 0A0A0A0A 0A0A0A0A ................................ 000000
00000000 00000000 00000000 00000000 00000000 00000000 00000000 00000000 ................................ 000020
3E3E4753 4D4E3C3C FFFF053A 14C40000 00000000 00000000 00000000 00002000 . ................Ä.:...<<NMSG>> 000040
36520003 000A0D77 6F6C6672 65766F20 68636174 7320200A 00303030 36520000 ..R6000..- stack overflow.....R6 000060
52000800 0A0D3020 79622065 64697669 64207265 6765746E 6920200A 00333030 003..- integer divide by 0.....R 000080
67726120 726F6620 65636170 73206867 756F6E65 20746F6E 20200A00 38303036 6008..- not enough space for arg 0000A0
73206867 756F6E65 20746F6E 20200A00 39303036 52000900 0A0D7374 6E656D75 uments.....R6009..- not e.ough s 0000C0
757200FF 000A0D00 FC000A00 746E656D 6E6F7269 766E6520 726F6620 65636170 pace for environment...•......ru 0000E0
6E697461 6F6C6620 200A0D32 30303652 00020020 726F7272 65206560 6974206E n-time error ...R6002..- floatin 000100
00031984 00020003 FFFFFF00 0A0D6465 64616F6C 20746F6E 20746E69 6F702067 g point not loaded.............. 000120
00000000 00000000 00000000 00000000 00051738 00020000 0004054A 00020000 ....J.......8................... 000140
00000000 00000000 00000000 00000000 00000000 00000000 00000000 00000000 ................................ 000160
00000000 00000000 00000000 00000000 00000000 00000000 00000000 00000000 ................................ 000180
00000000 00000000 00000000 00000000 00000000 00000000 00000000 00000000 ................................ 0001A0
00000000 00000000 00000000 00000000 00000000 00000000 00000000 00000000 ................................ 0001C0
00000000 00000000 00000000 00000000 00000000 00000000 00000000 00000000 ................................ 0001E0

Dump of file SATURN:[PCCOMMON.DUMP.PBIN]DBIMP.EXE;1 on 18-APR-1990 10:54:33.53
File ID (384,26,0)   End of file block 77 / Allocated 80

Virtual block number 1 (00000001), 512 (0200) bytes

00000001 00000040 00000000 CEF80000 0000FFFF 00000020 00000040 00925A4D MZ..M... .........%ö....a....... 000000
00000400 00000000 00000000 00000000 00000000 00000000 00000000 00000000 ................................ 000020
00000000 00000000 00000000 00000000 00000000 00000000 00000000 00000000 ................................ 000040
00000000 00000000 00000000 00000000 00000000 00000000 00000000 00000000 ................................ 000060
00000000 00000000 00000000 00000000 00000000 00000000 00000000 00000000 ................................ 000080
00000000 00000000 00000000 00000000 00000000 00000000 00000000 00000000 ................................ 0000A0
00000000 00000000 00000000 00000000 00000000 00000000 00000000 00000000 ................................ 0000C0
00000000 00000000 00000000 00000000 00000000 00000000 00000000 00000000 ................................ 0000E0
00000000 00000000 00000000 00000000 00000000 00000000 00000000 00000000 ................................ 000100
00000000 00000000 00000000 00000000 00000000 00000000 00000000 00000000 ................................ 000120
00000000 00000000 00000000 00000000 00000000 00000000 00000000 00000000 ................................ 000140
00000000 00000000 00000000 00000000 00000000 00000000 00000000 00000000 ................................ 000160
00000000 00000000 00000000 00000000 00000000 00000000 00000000 00000000 ................................ 000180
00000000 00000000 00000000 00000000 00000000 00000000 00000000 00000000 ................................ 0001A0
00000000 00000000 00000000 00000000 00000000 00000000 00000000 00000000 ................................ 0001C0
00000000 00000000 00000000 00000000 00000000 00000000 00000000 00000000 ................................ 0001E0
```

```
Dump of file SATURN:[PCCOMMON.DUMP.PBIN]DBIMP.EXE;1 on 18-APR-1990 10:54:33.53
File ID (384,26,0)   End of file block 77 / Allocated 80

Virtual block number 2 (00000002), 512 (0200) bytes

 72502032 2F534F20 73657269 75716572 20606172 676F7270 20736968 540033E8 Ô3.This program requires OS/2 Pr 000000
 4C018821 CD09B41F 0E5A240A 002E7265 67616E61 4D206E6F 69746174 6E657365 esentation Manager...$Z..Ç.è!¡.L 000020
 00000000 00000000 00000000 00000000 00000000 00000000 00000000 000021CD è!............................. 000040
 00000000 00000000 00000000 00000000 00000000 00000000 00000000 00000000 ................................ 000060
 00000000 00000000 00000000 00000000 00000000 00000000 00000000 00000000 ................................ 000080
 00000000 00000000 00000000 00000000 00000000 00000000 00000000 00000000 ................................ 0000A0
 00000000 00000000 00000000 00000000 00000000 00000000 00000000 00000000 ................................ 0000C0
 00000000 00000000 00000000 00000000 00000000 00000000 00000000 00000000 ................................ 0000E0
 00000000 00000000 00000000 00000000 00000000 00000000 00000000 00000000 ................................ 000100
 00000000 00000000 00000000 00000000 00000000 00000000 00000000 00000000 ................................ 000120
 00000000 00000000 00000000 00000000 00000000 00000000 00000000 00000000 ................................ 000140
 00000000 00000000 00000000 00000000 00000000 00000000 00000000 00000000 ................................ 000160
 00000000 00000000 00000000 00000000 00000000 00000000 00000000 00000000 ................................ 000180
 00000000 00000000 00000000 00000000 00000000 00000000 00000000 00000000 ................................ 0001A0
 00000000 00000000 00000000 00000000 00000000 00000000 00000000 00000000 ................................ 0001C0
 00000000 00000000 00000000 00000000 00000000 00000000 00000000 00000000 ................................ 0001E0

Dump of file SATURN:[PCCOMMON.DUMP.PBIN]DBIMP.EXE;1 on 18-APR-1990 10:54:33.53
File ID (384,26,0)   End of file block 77 / Allocated 80

Virtual block number 3 (00000003), 512 (0200) bytes

 00050004 00040000 0001098C 20000400 0004030A 800DA491 000200E4 0505454E NE..ð....Êi¯....... ¥........... 000000
 00000000 00000000 00010000 00040000 000004E6 00730069 00600060 0040001F ..ə.'.'.i.s.|................... 000020
 13A00F01 11F00868 02940E01 00000000 01700E01 00140866 7FF00F00 7FF00051 Q.b...b.f.....p.........h.b..... 000040
 4D500553 4C4C4143 534F4408 00006000 43001000 0A000100 0000706D 69626405 .dbimp.........C.m...DOSCALLS.PM 000060
 414C5153 084C4C41 43414C51 5308434F 4C41414C 5153084B 414C5153 054E4957 WIN.SOLAK.SOLAALOC.SOLACALL.SOLA 000080
 51530849 50414C51 53065452 5453414C 51530850 4F545341 4C515308 56544553 SETV.SOLASTOP.SOLASTRT.SOLAPI.SQ 0000A0
 50404947 4C515307 52415453 474C5153 08445054 53474C51 53084452 5453474C LGSTRD.SQLGSTPD.SQLGSTAR.SQLGIMP 0000C0
 696C6974 75207472 6F706049 20726567 616E614D 20617461 44180000 534C4E03 .NLS...Data Manager Import util! 0000E0
 FF9A006A D88EFFFF 881E5657 000492C8 00000000 00000000 00000000 00007974 ty..............à...WV.¡...Äj... 000100
 A65689A4 46890000 FFFF9A00 6AFF7A86 FFFF7C86 FFFF7C96 89FF7A86 890000FF .....z...|..Ñ|..Ñz.j.......FÊ.V! 000120
 74000800 02168926 0000A326 0F92068E 08C483FF FF0D949A 0200681E 0042681E .hB..h........á.....&Ê..&.. ..Ät 000140
 067E8300 0000859A 016A016A 08C48300 9500CC9A 0A4C681E 0044681E 0019E903 .Ö...hD..hL..á....á.j.j..ç.. .-. 000160
 36FF2600 0236FF26 0F92068E 0061681E 37FF2602 77FF2608 5EC40043 E9037C02 .|.ÖC.á^.&.w.&.7.ha.....&.6..  6 000180
 04C48300 CD0CAC9A 000036FF 26000236 FF260F92 068E0CC4 8300AB00 CC9A0000 ...á.¨..á.....&.6..&.6...¯.ë..a. 0001A0
 8300DE0E 669A5016 FF7E868D 0477FF26 0677FF26 085EC400 00FFFF9A 016A016A j.j......á^.&.w.&.w...~..P.f.Ñ.. 0001C0
 C4830102 118A9A50 16FF7686 8D04C483 00EC12B0 9A007568 1E0000FF FF9A08C4 á.......hu..¯.$..á...v..P.o....á 0001E0

Dump of file SATURN:[PCCOMMON.DUMP.PBIN]DBIMP.EXE;1 on 18-APR-1990 10:54:33.53
File ID (384,26,0)   End of file block 77 / Allocated 80

Virtual block number 4 (00000004), 512 (0200) bytes

 260090A3 260F9406 8E08C483 00380D94 9A010C68 1E008368 1E0000FF 7486C704 .ú.t....h...hÊ....;..á.....&Ê..& 000000
 5016FB76 86800085 681E5016 FF7E868D 01330F80 9A0041E9 03740008 00921689 .....Ät.ÖA..¯.3...-..P.h....v«.P 000020
 FF9A006A 006A00A4 681E5016 FB76868D 006A006A 016A006A 0CC48301 6710FC9A .•.g..á.j.j.j.j...v«.P.hÊ.j.j... 000040
 0F96068E 08C48300 5F00949A 01EE681E 0088681E 00000069 9A016A01 6A0000FF ...j.j..i....h¡..hŸ...._...á..... 000060
 8D008A68 1E5016FF 7E868D01 980F809A 0041E903 74000800 8E168926 008CA326 &Ê..&.....Ät.ÖA..¯......-..P.ho.. 000080
 6A000A68 1E5016FB 76868000 6A006A01 6A006A0C C48301D8 10FC9A50 16FB7686 .v«.P.•.Ü..á.j.j.j.j...v«.P.hö.j 0000A0
 68009036 FF260092 36FF260F 94068E00 0002469A 016A016A 00000230 9A006A00 .j..0...j.j..F.......&.6..&.6..h 0000C0
 FF0EDE9A 5016FB76 868000EE 681E146A 0AC48301 EF0FF49A 5016FB76 868001F4 ¶...v«.P.¶.ÿ._á.j..hŸ...v«.P.Ñ.. 0000E0
 16FB7686 80010368 1E5016FF 7E868002 140F809A 004EE903 7500003D 0AC48301 ..á.=..u.ÖN..¯......-..P.h....v«. 000100
 9A006A00 6A012268 1E5016FB 76868000 6A006A01 6A006A0C C4830255 10FC9A50 P.•.U..á.j.j.j.j...v«.P.h".j.j.. 000120
 FF7E868D 016A0000 01589A01 6A016A00 00037A9A 006A006A 01EE681E 0000014F O....hŸ.j.j..z...j.j..X...j...-. 000140
 5016F06A 86800136 681EA076 FFA276FF A25689A0 468906C4 83027307 7E9A5016 .P.-.s..á..F..VÅ.vÅ.v..h6...j».P 000160
 9A5016FB 76868001 F4680090 36FF2600 9236FF26 0F94068E 0CC48302 9210FC9A .•....á.....&.6..&.6..h¶...v«.P. 000180
 8302D80E DE9A5016 FB76868D 0138681E 026A00C1 E9037500 080AC483 02AD0FF4 ¶.Ü..á..Äu.Öè.j..h;...v«.P.Ñ.Ä.. 0001A0
 8D013E68 1E0049E9 0375030B A187F608 8898F878 868A005A E9037400 00300AC4 á.=..t.ÖZ...x«..Ä-.Å..u.Ö!..h>.. 0001C0
 5016AC46 8DFF7486 FF01EE68 1EFE5689 FC468908 C48302F3 12049A50 16FB7686 .v«.P...µ..á..F•.V‡.hŸ..Ñt..F¯.P 0001E0
```

```
Dump of file SATURN:[PCCOMMON.DUMP.PBIN]DBIMP.EXE;1 on 18-APR-1990 10:54:33.53
File ID (384,26,0)   End of file block 77 / Allocated 80

Virtual block number 5 (00000005), 512 (0200) bytes

 C4830327 0E669A50 16AC468D FC76FFFE 76FF0000 FF7486C7 0AC48303 0C04489A .H....á.ú.t....vt.v•.F¯.P.f.'..á 000000
 FB76868D 08C48303 3B0E669A 5016FD74 868D5016 FD6A8680 FF7486FF 0048E908 .ÕH...t...j».P..t•.P.f.;..á...v« 000020
 868D008C 36FF2600 8E36FF26 0F96068E 08C48303 570E209A 5016FD74 868D5016 .P..t».P. .W..á.....&.6..&.6.... 000040
 920FB09A 04C48303 6F118A9A 5016A846 8DFF19E9 08C48303 6710969A 5016FD74 t».P...g..á.Õ...F´.P.¤.o..á..¯.. 000060
 9A014068 1E0000FF FF9A006A 006A01EE 681E0000 03879A00 6A006A01 DC681E03 ..hÊ.j.j.......hŸ.j.j.......hə.. 000080
 E711829A A876FFAA 76FFFF76 B6FFFF78 B6FF0051 E90375D0 0804C483 03AF0F1A ..€..á..Åu.Õo..Ñx..Ñv..v´.v´...Ó 0000A0
 FB70B6FF FB72B6FF FB74B6FF 1FA5A5A5 A5DA8E1E 0716F088 F86EBE8D 08C48303 ..á../n«.Þ....ÖÉÉÉ..Ñt«.Ñr«.Ñp« 0000C0
 8D0018E9 14C48301 1E10FC9A 5016FB76 868D0149 681E5016 FF7E8680 FB6EB6FF .Ñn«..-..P.hI...v«.P.•....á.Õ... 0000E0
 8D006A00 6A016A00 6A0CC483 018310FC 9A5016FB 76868D01 99681E50 16FF7E86 .~..P.h....v«.P.•....á.j.j.j.j.. 000100
 7CB6FF00 00FFFF9A A476FFA6 76FF0000 01849A00 6A006A01 C7681E50 16FB7686 .v«.P.hú.j.j..Ç....vÍ.vÉ......Ñ| 000120
 B81E5657 00016EC8 CBC95F5E 1F000001 B09A006A 016A0000 FFFF9AFF 7AB6FFFF ..Ñz......j.j..§....^_èuàn..WV.¡ 000140
 03750000 3D04C483 04840718 9A0676FF 0876FF02 86E90375 000A7E83 D88E0008 ...Å.-..u.ÕÑ..v..v.......á.=..u. 000160
 0E76FF02 12681E04 C4830496 0CAC9A00 8C36FF26 008E36FF 260F9606 8E0067E9 Õg.....&.6..&.6...¯....á..h...v. 000180
 1E0028E9 0374000B 008E1689 26008CA3 260F9606 8E08C483 04C40D94 9A0C76FF .v....á..á.....&É..&.....Åt.Õ(.. 0001A0
 016A04EB 0FB09A08 C48304CC 0DCC9A00 0036FF26 000236FF 260F9206 8E021468 h......&.6..&.6...ä.ä..á..¯.S.j. 0001C0
 04C48304 FD0CAC9A 008C36FF 26008E36 FF260F96 068E023C E9000004 3F9A016A j..7...Õ<.....&.6..&.6...¯.»..á. 0001E0

Dump of file SATURN:[PCCOMMON.DUMP.PBIN]DBIMP.EXE;1 on 18-APR-1990 10:54:33.53
File ID (384,26,0)   End of file block 77 / Allocated 80

Virtual block number 6 (00000006), 512 (0200) bytes

 209A5016 FF5E868D 0676FF08 76FF08C4 8305110E 669A5016 FF5E868D 0234681E .h4...^..P.f....á..v..v...^..P.  000000
 9A5016FF 5E868D08 C4830532 0E669A50 1680468D 5016FF5E 868D08C4 8305240E .$..á...^..P.F¯.P.f.2..á...^..P. 000020
 6F0DCC9A 000036FF 26000236 FF260F92 068E0241 681EAE46 8904C483 054F0EC6 6.O..á..FÜ.hA.....&.6..&.6...ä.o 000040
 7B0DCC9A 000036FF 26000236 FF260F92 068E026F 681E0676 FF0876FF 08C48305 ..á..v..v..ho.....&.6..&.6...ä.( 000060
 76FF5004 C4830597 0EC69A03 26681E50 04C48305 880EC69A 030A681E 0CC48305 ..á..h...6....á.P.h&..6....á.P.v 000080
 04B8006A 5004C483 05E90EC6 9A031E68 1E006A50 04C48305 A60EC69A 0C76FF0E ..v..6.Ï..á.Pj..h...6.Õ..á.Pj.¡. 0000A0
 76FF0E76 FF006A00 6A5016AE 468D0326 681E006A 006A030A 681E5052 FFFFBA00 .¤..RP.h..j.j..h&..FÜ.Pj.j..v..v 0000C0
 868908C4 83060A0D 949A030A 681E0287 681E0000 FFFF9A03 1E681E00 6A006A0C .j.j..h........h...h.........á... 0000E0
 080AC483 06310FF4 9A5016FE 96868000 C868FE92 B6FFFE94 B6FFFE94 9689FE92 .±...±.Ñ.±.Ñ.±hð....±.P.¶.1..á.. 000100
 CC9A0000 36FF2600 0236FF26 0F92068E 0289681E 5016FE96 868D0023 E9037500 Åu.Õ#....±.P.h......&.6..&.6...ä 000120
 6A006A03 0A681E04 C4830402 0CAC9AFE 92B6FFFE 94B6FFFF BDE90CC4 83064400 .D..á.Õ§..Ñ.±.Ñ.±.¯....á..h..j.j 000140
 681E0676 FF0876FF 0023E903 75001206 08260010 A1260F98 068E0000 02309A00 ..=.......&À..&....u.Õ#..v..v..h 000160
 76FF0876 FF0020E9 0CC48306 A600CC9A 000036FF 26000236 FF260F92 068E028C ......&.6..&.6...ä.Ï..á.Õ ..v..v 000180
 8E02BB68 1E0CC483 06C000CC 9A000036 FF260002 36FF260F 92068E02 A1681E06 ..hÀ.....&.6..&.6...ä.â..á..hÉ.. 0001A0
 9A0C76FF 0E76FF02 E8681E08 C48306D2 0DCC9A00 0036FF26 000236FF 260F9206 ...&.6..&.6...ä.@..á..hÒ..v..v.. 0001C0
 8E02EA68 1E0028E9 0374000B 008E1689 26008CA3 260F9606 8E08C483 07000094 .....á.....&É..&.....Åt.Õ(..hõ.. 0001E0

Dump of file SATURN:[PCCOMMON.DUMP.PBIN]DBIMP.EXE;1 on 18-APR-1990 10:54:33.53
File ID (384,26,0)   End of file block 77 / Allocated 80

Virtual block number 7 (00000007), 512 (0200) bytes

 D39A016A 016A0466 0FB09A08 C4830708 0DCC9A00 0036FF26 000236FF 260F9206 ...&.6..&.6...ä....á..¯.f.j.j..& 000000
 FF0003E9 0000FE46 C7088E04 50881E56 57000002 C8C8C95F 5E1F0000 E9000004 ...Õ...^_èuà...WV.¡P..ÄüF±..Õ... 000020
 76FF0876 FF0028E9 03750000 3D04C483 07500EC6 9A501E03 2A0513FE 4668FE46 F±kF±..•¯.P.6.).á.=..u.Õ(..v..v 000040
 0009E900 01B80006 E9037400 003D08C4 8306830E 9C9A501E 032A0513 FE466806 .kF±..•..P......á.=..t.Õ..¡..Õ.. 000060
 FA468900 0088088E 0723881E 56570000 B6C8C8C9 5F5E1F00 00E90000 B8FFBCE9 ÕŸ.¡..Õ...^_èuàÑ..WV.¡#..Ä¡...F• 000080
 08C48307 B90E669A 5016FF4A 86800676 FF0876FF FC4689FE 46890000 B8FB4689 .F%¡...F±.F=.v..v...J..P.f.¿..á. 0000A0
 9A050A68 1E05B068 1E5016FF 70868D53 6A5004C4 83073E0E C69A05DA 681E006A j..hÕ..ó.>..á.PjS..p..P.h¯..hÕ.. 0000C0
 026A0000 0849A50 16FF7086 80006A00 6A05B268 1EFF6E86 890A4688 0000FFFF .....F...n..hý.j.j...p..P.K...j. 0000E0
 16FF6C86 8D5016F8 468D046A 01F16800 6A026A00 00085A9A 006A006A 016A016A j.j.j.j..z...j.j.hþ.j..F%.P..l.. 000100
 9A006A00 6A000008 CF9A006A 006A026A 006A016A 186A0000 08769A00 6A006A50 Pj.j..v...j.j.j.j.j.j..U...j.j.. 000120
 6A000008 F39A5016 FF70868D 006A006A 0582681E 00FA5683 01F84683 0000080B Ä....F%..V•..hý.j.j...p..P.µ...j 000140
 6A006A50 16FF4A86 8D216A01 CC68006A 016A0000 08A19A00 6A006A02 6A026A01 .j.j.j.j..À...j.j.hã.j!..J..Pj.j 000160
 6A006A00 6A006A50 16FF6E86 8D026A01 F468016A 016A0000 08929A00 6A006A00 .j.j......j.j.h¶.j...n..Pj.j.j.j 000180
 468D046A 01F16800 6A026A00 0009029A 006A006A 036A016A 026A0000 088E9A00 ../...j.j.j.j.j......j.j.hþ.j..F 0001A0
 819A006A 006A026A 016A026A 186A0000 09109A00 6A006A50 16FF6C86 8D5016FC •.P..l..Pj.j......j.j.j.j.j.j... 0001C0
 FF70868D 006A006A 0582681E 00FE5683 01FC4683 0000098A 9A006A00 6A000009 ...j.j.......F•..V±..hý.j.j...p. 0001E0
```

```
Dump of file SATURN:[PCCOMMON.DUMP.PBIN]DBIMP.EXE;1 on 18-APR-1990 10:54:33.53
File ID (384,26,0)   End of file block 77 / Allocated 80

Virtual block number 8 (00000008), 512 (0200) bytes

 80046A01 F068006A 016A0000 FFFF9A00 6A006A04 6A046A01 6A0000FF FF9A5016 .P.....j.j.j.j.j......j.j.hb.j.. 000000
 5016FF4A 868D216A 01CC6801 6A016A00 0009399A 006A006A 006A006A 5016F846 F½.Pj.j.j.j..9...j.j.hä.j!..J..P 000020
 6A006A00 6A5016FC 468D046A 01F06802 6A016A00 0009549A 006A006A 006A006A j.j.j.j..T...j.j.hb.j..F•.Pj.j.j 000040
 9A006A00 6A006A00 6A5016FF 6E868D02 6A01F468 036A016A 00000970 9A006A00 .j..p...j.j.h¶.j...n..Pj.j j.j.. 000060
 86800000 FFFF9A00 6A006A00 00FFFF9A 006A006A 006A016A 036A186A 0000FFFF ....j.j.j.j.j.j......j.j... .... 000080
 00000000 00000000 90CBC95F 5E1F0000 E9FA568B F8468800 00FFFF9A 5016FF70 p..P......F½.V•Õ...^_èù.....  .. 0000A0
 E4A305E6 0E894905 EE1E8C05 EC268905 E82689FC 0000F3E9 00000000 00000000 ........Õæ..•.&Ò..&§¯...Ÿ.Ì..Ì.εÒ 0000C0
 E80000FF FF9A501E 0CE8880C E6A3E086 580000FF FF9A5016 C4885005 E21E8905 ...ß.P.ô.P.....X.ÀÈÌ.¡Ò..P.....Ò 0000E0
 1736FF00 1936FF00 1836FF00 1D36FF09 FA14C29A 09F50988 9A07AB13 A29A004B K..Å.¨..¡.¾..ô.•..6...6...6...6. 000100
 0A1E149E 9A50142C 05EA06C7 36000388 0A18142C 9A5009FF 00009A00 1536FF00 ..6.......P.,...¡..6ù.õ.,.P..... 000120
 09FA06C6 3809EE06 C6087500 0CE83E80 00008805 EA16FF50 00FF880A 2E157E9A .~,..¡..P..õ.£...>Ò..u.6.Ÿ.;6.•. 000140
 F3CB88D1 8809EE8E 43740030 80264701 75003080 267FFFB9 05E4068E FF334800 .K3...õ.¿..ß.=.u.G&.=.tC/Ÿ..Ì.ùµ 000160
 412CAC04 81147500 F8830CED 8F1FF788 071E062E E8E774AE F2C03308 74CA88A6 Ì.òt.3â·ÙtÓŠ.....¾.¢Ù..«.u.Ÿ.¯,A 000180
 068FC31F 16F7E2AA 480174C0 FEAC9198 ACEEEBAA C20A1172 412CAC92 E0021972 r.@Å.¯,Ar..ô˙ŠŸ¯..¯±åt.H˙ä¾..ú.. 0001A0
 1E8C3600 1F368936 F77500FF 7C800674 4EF08805 E41E8E05 E2A10A08 068F0A06 ......Åã...õ..bNt..|..u¾6.6..6.. 0001C0
 093CF874 203CACFA 75C00A42 AC0001BF D2330A04 36893696 0175FF04 F6960021 Ì..-..u..6.6..3ø¢..˙B.åu•¯< t«<. 0001E0

Dump of file SATURN:[PCCOMMON.DUMP.PBIN]DBIMP.EXE;1 on 18-APR-1990 10:54:33.53
File ID (384,26,0)   End of file block 77 / Allocated 80

Virtual block number 9 (00000009), 512 (0200) bytes

 E8E84203 745C3C24 74223C54 74C00AE8 74093CEC 74203CAC 4E476374 C00AF774 t¾.ßtcGN¯< t$<.tÒ.ßtT<"t$<\t.BŠÒ 000000
 C00AAC4E 01E8CE75 01A80113 E901C188 D7E80103 0474223C FA745C3C AC41C933 3èA¯<\t•<"t..Ì§æ.èÌÕ.Ì˙.uöŠ.N¯.ß 000020
 D1C1880F E8D10304 74223CFA 745C3CAC 41C933F0 E8420374 5C3CC274 223C2774 t'<"tô<\t.BŠb3èA¯<\t•<"t..ÌŠÕ.èÌ 000040
 E8FE2440 C203C788 E7D1E7D1 47D70307 0300153E 891F169F E8D67501 A8D113E9 Õ.Ì˙.uæ$....>...æ.æGÌÒÌÒ.ú.ôã$±Ò 000060
 C3830257 8C363F89 360716F8 03D88800 191E8C00 17A3FE80 E9000888 06730A42 B.s.¡..Õ¯±È.......Ã.½..6.76.W..û 000080
 0AF77409 3CF87420 3CACAAC0 3303E8FA 75C00AAA AC4EA405 E41E8E0A 04368804 ..6....ß.£N¯˙.åu•Š.3å¯¯< t«<.t¾. 0000A0
 74C00AD6 74093CDA 74203CAC 4EAAD788 04C38302 578C363F 89360081 E90375C0 åu.Õ..6.76.W..û..æ˙N¯< tÕ<.tæ.ßt 0000C0
 5C800SE8 AAF35C80 0674223C FA745C3C AC41C933 E8E8AA03 745C3C26 74223C63 c<"t&<\t.˙ŠÒ3èA¯<\t•<"t.¯\µ˙Šf¯\ 0000E0
 5C3C8674 223C2A74 C00AAC4E D7874FAA 22800787 46C9E8AA 22800573 AAF3E901 ÌÕµ˙s.¯"˙ŠèF.æ¯"˙O.æN¯.ßt•<"tR<\ 000100
 809573AA F3E9D15C 8005E8AA F35C8006 74223CFA 745C3CAC 41C933F0 E8AA0374 t.˙Šb3èA¯<\t•<"t.¯\µ˙Šf¯\ÌÕµ˙s.¯ 000120
 E90A062E FF0475C0 850A3355 A29A0000 0247C700 0007C71F 16AAC033 C7E8AA22 "˙Šù3å˙..û...úG....ÅU3..Åu.....Õ 000140
 0A0A8951 06217400 087E8306 4EC4FE46 8D00248A 0A0C8850 00018BEC 8855FF22 ".U.ß¡..PE..¤$..F±ôN..~..t¦.O¿.. 000160
 0A0A36FF 0EE80000 FFFF9A50 50C03350 1652531E 51001089 511E0001 0A0A06C7 ú......O¿..O.SR.P3åPP.....Š..6.. 000180
 83EC8855 CB5DE58B 99C03303 7493C085 DA8C0017 C3810000 FFFF9A50 1652531E .SR.P......û...Õ.ô.t.3å..Ì}ùU.ß. 0001A0
 9A530600 87E90374 400A47F6 2600C1E9 0375830A 47F62606 5EC4FFFF 8E5612EC ß.V/..ô^.&-G..u.Õé.&-G.ãt.Õñ..S. 0001C0
 288788E3 D10803E3 D10888F9 F7000CB9 990A342D 064688F0 8804C483 0CFD1E2C ,.»..ß..þ.F.-4..¿..¾•.ÃÌD.ÃÌD..( 0001E0

Dump of file SATURN:[PCCOMMON.DUMP.PBIN]DBIMP.EXE;1 on 18-APR-1990 10:54:33.53
File ID (384,26,0)   End of file block 77 / Allocated 80

Virtual block number 10 (0000000A), 512 (0200) bytes

 2829009A 50E42A08 478A2606 5EC404C4 83000F18 429A0676 FF0876FF FA468908 ..F•.v..v..B....ô.ô^.&.G.*õP.Å)+ 000000
 08C48300 500E669A 5016F046 80501E0A 30886674 00FA7E83 697CC008 02C48300 ..ô..ß|Ì.-•.tf¡O..P.Fb.P.f.P..ô. 000020
 0E209A50 16F04680 501E0A32 8815745C FE7F8026 FC5EC4FE 568CFC46 89F24680 .F·.F•.Vtô^•&..±\t.¡2..P.Fb.P. . 000040
 08C48300 7829FA9A FA76FFFC 76FFFE76 FF50000A 88FC4EFF 9004E808 C483006B k..ô.Š...N•¡..P.vt.v•.v•.•)x..ô. 000060
 885EC688 000A47C6 26065EC4 FFFF8E03 74C00804 C4830C45 2EE09A50 16F04680 .Fb.P.Å.E..ô..ôt./..ô^.&6G...ô^. 000080
 0C76FF50 FE76FF18 7400008FE 5689FC46 89008C29 769A04EC 83EC8855 90CB50E5 Ì}ù.U.ß.ß..v)¥..F•.Vt.Åt,.vtP.v. 0000A0
 83EC8855 90CB50E5 8899C028 9004E80C C4830C02 18869A06 76FF0876 FF0A76FF .v..v..v....@..ô.Š..+å..Ì}ù.U.ß. 0000C0
 FC76FFF0 8804C483 0E021C9E 9A0676FF 0876FFFC 568CFA46 890E468D 565708EC ß.UV.F..F•.V•.v..v.......˙..b.v• 0000E0
 560676FF 0876FFF8 880CC483 0E131E8C 9A0676FF 0876FF0A 76FF0C76 FFFA76FF .v•.v..v..v..v..¥....ô..½....v.V 000100
 FFFF89C0 33067EC4 1EDE88D7 88EC8855 CB5DE588 5F5EC788 06C48300 9D1D809A ......ô..ú^_.Ì}ùU.ß.æ.ß.ô~.3å¿.. 000120
 01C6F706 4688FE87 08468ED8 8EC08CF9 28D1F7AE F2FFFF89 0A7EC4FF 758DAEF2 ·Û.u.ô~.¿..¯Ú¾Ì+•.ß.Ã.F..±.F.¾6. 000140
 76C51EDE 88D788EC 8855C850 C28C1FFA 88F388A4 F3C913A5 F3E90149 A4027400 .t.ÈÌÌÕµÈ.èµÈ.µ.•..õ}ùU.ß.æ.ß.év 000160
 13A5F3E9 D149A402 7401A8C7 88067EC4 D1F7AEF2 FFFF89C0 33C08ED8 8CFE880A ..±.Ã.ß3å¿..·Ú¾Ìô-..ú˙.t.ÈÌÌÕµÈ. 000180
 F2FFFF89 C0330A7E C40676C5 1EDE88D7 88EC8855 CB50C28C 1FFA88F3 88A4F3C9 èµÈ.µ.•..õ}ùU.ß.æ.ß.év.ô~.3å¿..· 0001A0
 C033067E C4D788EC 885500C8 5DFA88F3 881FFFFF 1DC01805 74A6F3F9 28D1F7AE Ú¾Ì+•µÌt..ô.....µ.•}ù.U.ß.æô~.3å 0001C0
 F788067E C4098827 E30E4E88 1E5657EC 885500C8 5DFA8891 49D1F7AE F2FFFF89 ¿..·Ú¾ÌÌ..•}ù.U.ßWV..N.D'.Ìô~..¾ 0001E0
```

```
Dump of file SATURN:[PCCOMMON.DUMP.PBIN]DBIMP.EXE;1 on 18-APR-1990 10:54:33.53
File ID (384,26,0)   End of file block 77 / Allocated 80

Virtual block number 11 (0000000B), 512 (0200) bytes

 D1F74949 04740477 FF453A26 C933FF44 8AA6F30A 76C5FE8B CB03D9F7 AEF2C033 3å·Û%).ù.±év.µ!.D.3è&:E.w.t.II%I 000000
 C20BFC56 89FA4689 0D1D168B 0D18A156 06EC83EC 8B5500C8 5DE58B5F 5E1FC18B .ê.^_.I)ù.U.$.$.VÅ.......F*.V•.ó 000020
 46839090 06EBF08B 04C4830F 680EC69A 0676FF08 76FF6E74 08460806 468B7674 tv.F..F.tn.v..v..ó.h..á..bŠ....F 000040
 7EC63B04 C4830F91 0EC69A37 FF260277 FF264A74 02470B26 078B26FA 5EC404FA *.á^*&..&.G.tJ&.w.&.7.6....á.;6- 000060
 DE9A37FF 260277FF 26FA5EC4 0676FF08 76FF56D1 753D3880 261FC426 FA5EC4DD 1á^*&á.&.8=uiV.v..v.á^*&.w.&.7.8 000080
 CB5DE58B 5E99C02B 9004EBC2 8C01408D 1FC426FA 5EC4B475 C00B0AC4 830DE60E .I..á..àuÇá^*&á..ə..óŠ..+á.^.I)ù 0000A0
 53060E74 830A47F6 26FA5EC4 1CEBF62B FC5EBCFA 46890A58 8B5606EC 83EC8B55 U.$.$.V¡X..F*.^•+-Š.á^*&-G..t..S 0000C0
 8B5EC68B 0876FA46 39089E16 8B089CA1 0CFA4683 46017440 04C4830F 430CAC9A .".C..á.ət.F.F*.Å......9F*vÅ.ó^. 0000E0
 C02B067F 000A7E83 FE5689FC 46890856 8B06468B 565706EC 83EC8B55 90CB5DE5 I)ù.U.$.$.WV.F..V..F•.V±.-....+à 000100
 8B237540 F08B04C4 830FD318 BE9A0C76 FF0E76FF 45EBFA76 8B0A7E8B 907CEB99 .Š|..-..v*ŠE.v..v../.&..$..bəu#. 000120
 FA76890A 7E8945EB FA76890A 7E8999C0 2B0B75FE 56391075 FC463908 568B0646 F..V.9F•u.9V±u.+á..-..v*ŠE.-..v* 000140
 078B26AF 78044FFF 260C5EC4 E6744FE9 740A3C07 8826C68B FC46FFFC 5EC430EB Š0á^•.F•.ó&..<.tÕ0tIá^.&.0.xf&.. 000160
 5E08568B 06468B00 07C626FC 5EC4A8EB E42A078A 26C28EDB 8807FF26 02578B26 &.V.&...Å.ó&..*óŠ´á^•&ó...F..V.^ 000180
 76FFF88B 04C48310 870EC69A 0676FF08 76FF5657 06EC83EC 8B5590CB 5DE58B5F _.I)ù.U.$.$.WV.v..v..ó.ñ..á..%.v 0001A0
 9A0676FF 0876FF50 00018857 0A76FF0C 76FFF08B 04C48310 D21C9E9A 0A76FF0C ¯.v....@..á..b.v..v.W|..P.v..v.. 0001C0
 C02B0475 FA7E3906 C4831025 1D809A56 0A76FF0C 76FFFA46 890CC483 10E415F6 -.8..á..F*.v..v.V...X..á.9-*u.+à 0001E0

Dump of file SATURN:[PCCOMMON.DUMP.PBIN]DBIMP.EXE;1 on 18-APR-1990 10:54:33.53
File ID (384,26,0)   End of file block 77 / Allocated 80

Virtual block number 12 (0000000C), 512 (0200) bytes

 0E468DFA 568CF846 89EC468D 565716EC 83EC8B55 90CB5DE5 8B5F5EFF FF8B03EB $.¡..^_.I)ù.U.$.$.WV.F$.F%.V*.F. 000000
 26078926 08578926 06478926 08568806 4688420A 47C626F8 5EC4FE56 8CFC4689 .F•.V±ẑ^Ṽ&6G.B.F..V.&.G.&.W.&..& 000020
 C4F0880C C4831174 1EBC9A53 060A76FF 0C76FFFC 76FF167F FF0447C7 26025789 .W.&úG.....v•.v..v..S.Ṽ.t..á..bá 000040
 C02B53FA 76FF9010 E8058826 02478E26 07FF263F 8826C02A 1278044F FF26F85E ^%&.O.x.*á&.7&..&.G.&..Š...v*S+á 000060
 462B0856 8B06468B 04EC83EC 8B5590CB 5DE58B5F 5EC68B06 C48310A7 19BA9A50 P.¤.I..á..ó^_.I)ù.U.$.$..F..V.+F 000080
 8B114830 859AC28E 11B38A0C DA8B11AD 2FD59AFC 5E8DFC46 89FE5689 0C5618DA ..V..V±.F•.^•.I/Ù.£Ö.¤*..ó..0H.¡ 0000A0
 50F6468A 00B40000 FFFF9A50 16F4468D 0CEC83EC 8B5590CB 5DE58807 868A0CDA Ö.¤...I)ù.U.$.$..F¶.P.....Ç..F-P 0000C0
 830CC483 11A02A16 9A50078C 20FA468B 50F9468A 50F8468A 50F4468A 50F5468A .F%P.F¶P.F%P.F*P.F*-Ṽ.P..*...á.. 0000E0
 07160788 DE8B20EC 83EC8B55 00CB5DE5 8B078926 02578926 065EC40A 7400087E -..t.á^.&.V.&...I)ù.U.$.$ .8.•.. 000100
 B1E0D207 E18001B0 C88BF88B 1474C00A AC0A76C5 071EABF3 E07E8DC0 33001089 ¿..3á.-Áµ¨..év.¯.át..%.à¯..Å.@ÁŶ 000120
 3689264E 0F7500FF 25AC0CA2 36C52605 75C608D8 8C0676C5 E7EBE043 0BEFD303 .&Ŷ.CÁŠÖév..Å.óu.&éóÅ.¯X..u.N&.6 000140
 8D0775E0 4322EFD3 0381E0D2 07E18001 B0C88BFB 8848EBD8 8E0CA41E 8C260CA2 Å.&..£..ÅŠH.%.à¯..Å.@ÁŶ.&ŷ"CÁuµ. 000160
 D207E180 018DC88B F88B18EB FF448D05 7500FF25 AC0CA41E 8C260CA2 A326FF44 D.&£Å.&..£.¯X..u..D.Š..%.à¯..Å.@ 000180
 00CB50E5 8B1F060A 8CFA88F3 8B0CA206 872696FF 6488E174 E04322EF D303B1E0 ÁŶ.&ŷ"CÁtÅ.d..&..Å..µ.*.Ö...I)ù. 0001A0
 F05689EE 468904C4 8312E20F 1A9A501E 0CA6B818 EC83D88E 1EEC8B55 4590581E .X.EU.$..Å.$.¡I..P...ð..á..FŶ.Vb 0001C0
 94E90001 B80775C0 0806C483 13362EA4 9AEE76FF 5250C02B 20750846 08064688 .F..F.u +áPR.vŶ.£.6..á..áu.¡..Ö. 0001E0

Dump of file SATURN:[PCCOMMON.DUMP.PBIN]DBIMP.EXE;1 on 18-APR-1990 10:54:33.53
File ID (384,26,0)   End of file block 77 / Allocated 80

Virtual block number 13 (0000000D), 512 (0200) bytes

 89C02BF8 5689F646 8908568B 064688F4 5E8CF246 890CAE88 90008EE9 C02B9000 ..+&Ö...¡0..F·.^¶.F..V..F-.V%+á. 000000
 EE76FFF0 76FF5016 EE468D00 1836FF0D 1D36FF37 74F0460B EE468BFA 4689FC46 F•.F*.FŶ.Fbt7.6...6...FŶ.P.vb.vŶ 000020
 8B05740D 0CE23E83 0C74020C E23E830E 7540EC46 890EC483 13802B3A 9A50C02B +áP.:+...á..F$əu..>ä..t..>ä..t.. 000040
 1836FF0D 1D36FFF0 5E8CEE46 890C89B8 03E80CB1 8B057400 0CEB3E80 31EBEC46 F$Š1.>Ò..t.¡Ŷ.Š.¡¿..FŶ.^b.6...6. 000060
 5756CB4D 5D1FE58B 02ED830E C48311EA 2CF69A50 C02BEE76 FF1E5016 EE468D0D ..FŶ.P..vŶ+áP.-,ð..á..Ù..I.)MüVW 000080
 C4885087 0CEDA780 D48B5200 02BBCB5E 5FA5F300 0AB90D4A BF0CC68E C08ED88C .Å.á/ó.«J.¿..µE_^ùE..R.å.IÙ.ñP.á 0000A0
 ED8F0808 B1067500 02300774 00013D40 B1127558 C0080000 FFFF9A52 16501653 S.P.R......áXu.Ŷə=..t.=..u.Ŷ...Ù 0000C0
 29E30F84 0E8B5858 0000FFFF 9A531652 0E0A208A 50DC8B50 50C0335A D479480C .Kyå23áPP.ÉP¤ ..R.S.....XX....D) 0000E0
 B80A8C0F 8A06C536 23A2E91F 1605730F 821EFF36 DB330A8C 0F8606C5 05E4368B .6ð.é....Ö3U6....9...ÖÅ#6é....ÖE 000100
 BEEC8B55 CB005FE8 0F808F0F 7CBE0068 E80F8EBF 0F8EBE1F 160F821E FF360003 ..6...../..«..Òh,/|.«..Ò_.ùU.$/ 000120
 BE003BE8 0F92BF0F 92BEEC8B 5503EB00 49E80F92 BF0F8EBE 0052E813 9ABF139A ..«..ÒR./..«..ÒI.Š.Ù.$/..ĩ..Ò;./ 000140
 B8D000E8 00FF0646 C7057500 067E8308 74C00812 C537D49A 0032E80F 928F0F92 ..«..Ò2..å7é..ät..-..u.úF...Ò..¡ 000160
 EF830E73 F738C30F 821EFF00 02B807E3 0F840E8B 0000070F 9A500646 8A500001 ..P.F.P.........D.£.....ù;%s..ŷ 000180
 74000028 3E83145B 157E9A50 00FCB8EC 8B5500C3 EEEB1DFF F2740245 08058804 ....E.t·..ŠŶù.U.$¡•.P.-.(..>(..t 0001A0
 C03305E4 068E0D2C 068F0D2A 068FCB5D E58B14A8 157E9A50 00FF8800 261EFF04 ...&.¡..P.-.¨..I)ù..*.......ó.3á 0001C0
 C603E6D1 E6D1FE8B FE2440C7 8B46FA75 AE46AEF2 0674053A 26FFFF89 FF33F633 3-3.¿..&:.t.·ÚFÚù*F.úə$±.±IIII.6 0001E0
```

Dump of file SATURN:[PCCOMMON.DUMP.PBIN]DBIMP.EXE;1 on 18-APR-1990 10:54:33.53
File ID (384,26,0)   End of file block 77 / Allocated 80

Virtual block number 14 (0000000E), 512 (0200) bytes

```
0716F633 1F06D88B FE03F88B CF8B0D10 168C001B A3F52FE9 0009B806 7300C1E8 Òè.s.¡..Õ/¥È.......ü.%.±.Ä..3-.. 000000
263F8926 0A74595E 5FA7F300 06B909EE BF575651 107509EE 06382604 8B2BE349 ID+..&;.Y.u.OVWeY.¿..µI_^Yt.&.?& 000020
88550000 2A2EFF07 161F1602 4F89260F 892605E2 FA75C00A AAAC04C3 8302578C .W..û:  .âu¹ãI&..&.O.......*..U. 000040
F2FFFFB9 C033970C 74964010 74C23BAD 0F808E06 5688C08E D88E11A6 885756EC $VW¡I..Ä.â.V.ƒ¯.Ü;ôt.∂.t..3ä¿.. 000060
8B921F74 C00814BC 154E9A06 76FF57EC 88550002 CA50E58B 5E5F96E8 E8F78BAE Û.¥SS._^.I1ò..U.$W.v..N.V..ât... 000080
E5885F5B 0000FFFF 9A501651 521E5300 02B8C48B 5049D1F7 AEF2FFFF 89C033FA *3ä¿..¯ÜÄIIP.6E..S.RQ.P.....[_.Ì 0000A0
FFFF9A1E 5150410F C98049CB 8B197205 E61E3B26 72080305 EC1E885A 0002CA5D ]ò..Z..$..Ar&;.Ì.r..ùI.è.APQ.... 0000C0
88027200 8E1E3808 72D82BDC 880EEBF8 05EC1E87 05E60E89 490C7558 C0850000 ...âXu.I..Ì...$.½S..É+Ãr.;...r.. 0000E0
89FC4689 1641492C 9A0A76FF 500C76FF 50C02856 1AEC83EC 885500E2 FFC388E3 D.ù.ã.U.$.$.V+âP.v.P.v...ÌA..F•. 000100
47F6260E 5EC49002 8FE9C02B 0675000C 7E830674 000A7E83 FA5689F8 4689FE56 V±.F%.V*.-..t..-..u.+äÕ...ó^.&-G 000120
D10803E3 D1088BF9 F7000CB9 99169740 489A5306 501E0A34 B80086E9 03740C0A ..t.Õ..¡4..P.S.H∂...¿..¥*.ÄID.Ä¹ 000140
7788260F 88260E5E C4078A26 065EC425 78044FFF 260E5EC4 65750108 2487F6E3 D-.$..ueá^.&.O.x%á^.&..á^.&..&.w 000160
26065EC4 0E76FF10 76FF16E8 07882609 88C68E16 80024781 26067301 07832602 .&...s.&.G.¯..ó.1&..S..v..v.á^.& 000180
25C01B01 064683FF 78E90374 200A47F6 260E5EC4 06C48316 0119BA9A 5098078A ...P.σ.I..á.á^.&-G. t.Õ(..F...à% 0001A0
489A5306 501E0A34 88247508 0A47F626 0E5EC400 FA5E8301 F86E8308 460117C0 â..F..n%..^*.á^.&-G..u$¡4..P.S.H 0001C0
4608F846 880123E9 03750108 2487F6E3 D1D803E3 D1D88BF9 F7000C89 99175840 ∂[..¿..¥*.ÄID.ÄID-.$..u.Ċ¶..F%.F 0001E0
```

Dump of file SATURN:[PCCOMMON.DUMP.PBIN]DBIMP.EXE;1 on 18-APR-1990 10:54:33.53
File ID (384,26,0)   End of file block 77 / Allocated 80

Virtual block number 15 (0000000F), 512 (0200) bytes

```
5689EA46 89000405 0E4688F0 5689EE46 89000A05 1056880E 46880187 E90375FA *u.Õ...F..V.....FY.Vb.F.....Fõ.V 000000
76F8463B 05770E72 FA563802 28078B26 7E74003F 8326E65E C4E85689 E64689EC &.FI.Vòá^I&.7.t-&..+Ø;V*r.w.;F%v 000020
5EC40676 FF0876FF 500000F6 46C7F446 89044788 260E5EC4 909009EB F8468807 ..F%S...á^.&.G..F¶úF-..P.v..v.á^ 000040
8389F646 130F0126 F44E8BC0 280E5EC4 0AC48317 D043E29A 37FF2602 77FF260E .&.w.&.7.âCI..á.á^.+â.N¶&...F-¿. 000060
F65688F4 46880846 01E003FF FFB9F646 13064E01 F44E88C0 28024701 26E00317 .ÆÄ&.G.+â.N¶.N..F-¿..ÆÅ.F..F¶.V- 000080
260E5EC4 078A2606 5EC42678 0FFF26EA 5EC464E8 072926E6 5EC4FA56 19F84629 )F%.V*á^I&).Sdá^ò&..x&á^.&..á^.& 0000A0
FF1076FF 9017E807 88260988 C68E17F5 02478126 06730107 83260277 88260F88 ..&.w.&...s.&.G.¥..ó.1&..S...v.. 0000C0
4683008F E9037420 07F626EE 5EC406C4 83186F19 BA9A5098 078A2606 5EC40E76 v.á^.&...P.σ.o..á.á^Y&-. t.Õ...F 0000E0
468890FF 0AE97374 FA4608F8 468800FA 5E8301F8 6E830846 01185325 C0180106 ...â%S..F..n%..^*..F%.F*tsÕ....F 000100
5689EA46 89000405 0E4688E8 5689E646 89000A05 1056880E 46886774 FA4608F8 %.F*tg.F..V.....FI.VÒ.F.....Fõ.V 000120
26067301 07832602 7788260F 88260E5E C4078A26 065EC425 780FFF26 EA5EC4EC &á^ò&..x%á^.&..á^.&..&.w.&...s.& 000140
94198A9A 5098078A 26065EC4 0E76FF10 76FF16E8 07882609 88C68E18 9F024781 .G....ó.1&..S..v..v.á^.&...P.σ.. 000160
52FA561B F8462BFE 5688FC46 880A76FF 50C02818 742007F6 26E65EC4 06C48318 ..á.á^I&-. t.+âP.v..F•.V±+F%.V*R 000180
08F8468B 00FA5E83 01F86E83 084601FF FF25C01B 01064683 20E81588 49609A50 P.'I..S .F...âX...F..n%..^*..F%. 0001A0
F7000C89 990A342D 06468856 02EC83EC 885590C8 50E5885E 90FF7AE9 C974FA46 F*tèÕz..^.[]ù.U.$.$.V.F.-4..¿..¥ 0001C0
0674400A 47F62607 74830A47 F626065E C4FE4689 082405E0 D1C103E0 D1C888F9 *.àIÅ.èIÅ.$..F±á^.&-G..t.&-G.∂t. 0001E0
```

Dump of file SATURN:[PCCOMMON.DUMP.PBIN]DBIMP.EXE;1 on 18-APR-1990 10:54:33.53
File ID (384,26,0)   End of file block 77 / Allocated 80

Virtual block number 16 (00000010), 512 (0200) bytes

```
FE5E8801 0A4F8026 90E9E820 0A4F8026 0874020A 47F62606 5EC4008F E9FFFF88 ¡..Õ¢.á^.&-G..t.&.O. SÕ.&.O...^± 000000
E3D10803 E3D1088B F9F7000C 89990A34 2DC38827 750C0A47 F626065E 88F82780 .'«.^.&-G..υ'.û-4..¿..¥*.ÄID.ÄID 000020
26085788 26064788 26065EC4 9013E804 C4831F54 E80676FF 06007501 082487F6 -.$..υ...v.ÕT..á.S..á^.&.G.&.W.& 000040
1C9A50E4 2A08478A 260677FF 260877FF 26065EC4 0277FFFE 5E880257 89260789 ..&.W..^±.w.á^.&.w.&.w.&.G.*ÕP.. 000060
E8208005 7400047F 83261C75 FFFF3D05 74C00804 47892606 5EC408C4 83160A3B ;...á.á^.&.G..ât.=..u.&....t.¯ $ 000080
02478E26 07FF2637 8826044F FF2690FF 4FE90000 0447C726 0A470826 10809003 ..¯.&.G.&úG...ÕO..&.O.&.7&..&.G. 0000A0
C388FA46 89E42A08 478A2608 5EC45657 08EC83EC 8855C85D E5885EE4 2A048A26 &..*Õ^.[]ùU.$.$.WVá^.&.G.*Õ.F*.Ú 0000C0
F6260774 830A47F6 26F84689 082405E0 D1C103E0 D1C888F9 F7000C89 990A342D -4..¿..¥*.àIÅ.èIÅ.$..F¥&-G..t.&- 0000E0
80260E74 010A47F6 26085EC4 900139E9 FFFF8820 0A4F8026 085EC40F 74400A47 G.∂t.á^.&.O. ¡..Õ9..á^.&-G..t.&. 000100
7689F088 04478926 C028EF0A 67802602 0A4F8026 90E2E800 000447C7 26200A4F O. &úG...Sã.&.O..&.g.ÿ+â&.G..Þ.v 000120
01082487 F6E3D1D8 03E3D1D8 88F9F700 0C89990A 3420C388 51750C0A 47F626FC •&-G..υO.û-4..¿..¥*.ÄID.ÄID-.$.. 000140
76FF0F75 15540A7E 8116750A 4C087E81 0E741A6A 0A7E8107 750A4008 7E813775 u7.-.∂.u..-.j.t..-.L.u..-.Ì.u..v 000160
0A47F626 085EC404 C4831E0C E80876FF 0A76FF0C 75C00802 C4831AE2 40249AFA *.$∂ã..á..âu..v..v.Õ...á.á^.&-G. 000180
085E8869 74010824 87F6E301 D803E301 D888F9F7 000C8999 0A3420C3 881A7508 .u..Õ-4..¿..¥*.ÄID.ÄID-.$..tI.^. 0001A0
89264802 4588F87E 88025789 26078926 40085788 26064788 26067728 26378826 &.7&+w.&.G.&.W.∂&..&.W..-%.E.H&. 0001C0
F6FA5E88 1BE8FC46 8908C483 1B023C60 9AFA76FF 0677FF26 5256167E F6080447 G..--.VR&.w..v*.'<...á..F•Š..^*- 0001E0
```

```
Dump of file SATURN:[PCCOMMON.DUMP.PBIN]DBIMP.EXE;1 on 18-APR-1990 10:54:33.53
File ID (384,26,0)   End of file block 77 / Allocated 80

Virtual block number 17 (00000011), 512 (0200) bytes

 468A065F C426085E C408C483 1B273920 9A535050 C02B5000 02B81174 200CED87 .Ù. t.¡..P+âPPS. 9'..ô.ô^.&ô_..F 000000
 39FC4689 08C48319 713C609A FA76FF50 1606468D 50C68B00 01BE19EB 07882606 .&..$./...óP.F..P.v'.'<q..ô..F•9 000020
 26357483 0A47F626 065EC4EC 8B55C85D E58B5F5E E42A0646 8AFEBEE9 0374FC76 v•t.Õ/±.F.*ô^_.|]ùU.šä^.&-G..t5& 000040
 C02BF70A 67802606 5EC404C4 831A743E 049A0677 FF260877 FF262E74 080A47F6 ~G..t.&.w.&.w...>t..ô.ô^.&.g.%+à 000060
 0A5EC456 0AEC83EC 8B55CB5D 04478926 08578926 06478926 02578926 07892699 .&..&.W.&.G.&.W.&.G.]ùU.$.$.Vá^. 000080
 01FC46C6 F62B9000 EFE999C0 2B137400 773D0C74 00723D27 74006130 98078A26 &...=a.t'=r.t.=w.t.+à.Õ'..+-óF•. 0000A0
 0002CE81 43750002 C6F790F4 EB01098E 90F1EB02 FC46C603 01BE9022 EB000189 ¿..$".f..óF•.$þ.f..$¶.%c .uC.ö.. 0000C0
 D674002B 3D98078A 263374C9 08377400 3F80260A 5EC40A46 FF80FC46 C6FEE683 .|±óF•..F.á^.&.?.t7.èt3&...=•.tø 0000E0
 2B0574C0 00A9C68B 900DEB40 00CEB10E 75C000A9 C6881575 00743D13 7400623D •b.t.=t.u..ó .âu..ö.ə$Å..ó .ât.+ 000100
 08C4831B 61395E9A 0676FF08 76FF5650 01A48BFE 4E898DEB 8000CE81 90C4EBC9 è$á..ö..$§.N±¡Ê.PV.v..v..^9ə..ô. 000120
 0CB9990A 342DC38B 0D9006FF 0A478826 FC468A0E 5EC4FF69 E9037DC0 08FA4689 .F*.â}.Õ|.á^..F•&.G......ù-4..¿. 000140
 04478926 0E5E8898 0788F85E 8BC02AF8 46890B24 05E001C1 03E001C8 88F9F700 .%*.àíÅ.èíÅ.$..F%*á.^%....^.&.G. 000160
 FA468A08 57892606 47892602 57892607 892699C0 2B0E5E8B 00000447 C7F85E88 .^%úG....^.+à.&..&.W.&.G.&.W..F* 000180
 0E750A40 067E8100 9006FF56 04EC83EC 8B5590CB 50E58B5E C28CC38B 08478826 &.G..ù.ộ^.|]ù.U.$.$.V.....-.ə.u. 0001A0
 01FE46C7 29751A5C 087E8130 750A4C06 7E8113EB 0000FE46 C707751C C8087E81 .~.à.u.úF±..$..-.L.uO.-.\.u)úF±. 0001C0
 87F6E3D1 D803E3D1 D888F9F7 000C8999 0A342DC3 881A750C 0A47F626 065EC400 .ó^.&-G..u..ù-4..¿..%*.ÄID.ÄID-. 0001E0
```
```
Dump of file SATURN:[PCCOMMON.DUMP.PBIN]DBIMP.EXE;1 on 18-APR-1990 10:54:33.53
File ID (384,26,0)   End of file block 77 / Allocated 80

Virtual block number 18 (00000012), 512 (0200) bytes

 00BB1575 02440804 8B0D2EC6 81E60302 81FE768B 90900081 E9C02807 74010824 $..t.+äÕ.....v±Ý.ɐ|.ó.....D.u.¡. 000000
 8BF9F700 0CB9990A 34200646 8B027400 08025489 048902C4 8310BF3E 199A5002 .P..>¢..ó....T..Ät@.F.-4..¿..%*. 000020
 260D3094 8B0D2E84 8BE6D1E6 D1FE768B 065EC4FC 46890824 05E001C1 03E001C8 àíÅ.èíÅ.$..F•ó^..v±||||......0.& 000040
 1107C6DE 8B044789 26024489 020088FC 76880257 89260789 26085789 26064789 .G.&.W.&..&.W..v•¡...D.&.G..Bó.. 000060
 000C8999 0A342D08 468804EC 83EC8855 C85DE58B 5E000188 020A4F80 26065E8B .^.&.O..¡..^.|]ùU.$.$..F.-4..¿.. 000080
 1007F626 FC5EC451 7400067E 83FE5E8C FC46890B 2405E001 C103E001 C88BF9F7 %*.àíÅ.èíÅ.$..F•.^±.-..tOó^•&-.. 0000A0
 2C9A0876 FF0A76FF 5F74C00B 02C4831D D140249A 50E42A08 478A2608 5EC47574 tuá^.&.G.*óP.$əI..ó..ât .v..v.., 0000C0
 02578926 07892699 C028085E C4000002 47C72600 07C626FC 5EC404C4 831E101E ....ó.ó^•&ó..&úG...ó^.+Ĩ.&..&.W. 0000E0
 40249A50 E42A0847 8A26085E C4247410 07F626FC 5EC420EB 08578926 06478926 &.G.&.W.$-ó^•&-..t$á^.&.G.*óP.$ə 000100
 83EC8855 90CB5DE5 8B04C483 1C2B1E2C 9A0876FF 0A76FF0E 74C00802 C4831E22 "..ó..ât..v..v..,+..ó..|]ù.U.$. 000120
 89990A34 2DC3881A 75080A47 F6265A75 023C0324 0A478A26 065EC4F6 285604EC $.V+-ó^.&.G.$.<.uZ&-G..u..ù-4..¿ 000140
 FC468906 47282607 8B26065E 8B397401 082487F6 E3010803 E3D1D888 F9F7000C ..%*.ÄID.ÄID-.$..t9.^.&..&+G..F• 000160
 74FC463B 08C4831D 153C609A 50E42A08 478A2606 77FF2608 77FF2650 287EC008 .ó~(P&.w.&.w.&.G.*óP.'<...ó.;F•t 000180
 C7260257 89260789 2608578B 2606478B 26065EC4 FFFF8E20 0A4F8026 065EC408 .ó^.&.O. ƒ..ó^.&.G.&.W.&..&.W.&ù 0001A0
 1E1E8C12 1CA31222 881E8737 B09A000A B8EC8855 90CB5DE5 885EC688 00000447 G....ó^.|]ù.U.$|...¯7..¡".È..... 0001C0
 00121806 C711F416 8911F2A3 0856B806 4688120E 1689120C A3105688 0E468812 ..F..V.È.......F..V.È...¶.ú.... 0001E0
```
```
Dump of file SATURN:[PCCOMMON.DUMP.PBIN]DBIMP.EXE;1 on 18-APR-1990 10:54:33.53
File ID (384,26,0)   End of file block 77 / Allocated 80

Virtual block number 19 (00000013), 512 (0200) bytes

 F8A311FC A3C02B00 01121A06 C7031BE9 037425F6 7E800390 E9000012 1606C700 .ú.....Õ...--%t.Õ..ú.....•âÈ•.È% 000000
 260A5EC4 00201382 06C7120A A311F0A3 11F6A312 10A31212 A311FAA3 1214A311 .È..È*.È..È..È-.Èb.È..ú... .ó^.& 000020
 C711FC06 FF00752B 3F80260A 5E88903E EB003013 8206C70A 46FF4975 30017F80 ...Ou|.F.ú...0.$>..^.&.?+u...•.ú 000040
 11F006FF 9014EB12 1006FF1A 750011FC 3E830E75 203F8026 9028EB00 00121006 .....$(.&.? u..>•..u.....$....Þ. 000060
 C48309AA EB0E5098 078A260A 5E880A46 FF120A06 FFC7752D 3F80260A 5EC40DEB $.ó^.&.?·uú.....F..^.&...P.Ò`..ó 000080
 203E830C 56890A46 8908C483 08F2E80E 501E1220 880A76FF 0C76FF0D 75C00802 ..âu|.v..v.| ..P.Ò`..á..F..V..> 0000A0
 06C70675 3013823E 830D7400 120A3E83 1220A308 F71220A1 120A06FF 0C7D0012 ..)......Å .%ÄÈ ..>...t..>..Ou.ú. 0000C0
 A5E80E50 1E121A88 0A76FF06 0A46FF12 1206FF2E 752E3F80 260A5EC4 00201382 .. .ó^.&.?.u......F...v.|...P.ÒÈ 0000E0
 8A260A5E C412120E FF000112 1A06C70A 7D00121A 3E830C56 890A4689 08C48308 ..á..F..V..>...).ú.........ó^.&. 000100
 11FA3E83 000211FA 06C70675 006C3028 74006830 4074004E 30307400 463D9807 ..=F.t==N.tə=h.t+=|.u.ú.*....>*. 000120
 11FA06C7 90025CE9 1C75003F 80260A5E C40A46FF 03754C3F 80260A5E C4097500 .u.ó^.&.?Lu..F.ó^.&.?.u.Õ\..ú.*. 000140
 0A740045 3DF84689 98078A26 C8E80008 11FA06C7 D0E80010 11FA06C7 D8E80001 ..$Äù.*...$Äù.*...$ə&....F%=E.t. 000160
 3D019FE9 037E7874 00693DF8 468820F8 468311F8 06FF0875 00583005 74004730 =G.t.=X.u...%..F% .F%=|.tx-.Õ..= 000180
 C4157502 11FA3E83 900167E9 014CE903 7500253D 0160E903 7E0149E9 03750063 c.u.Õ|,~.Õ'.=%.u.ÕL.Õg...>*..u.ó 0001A0
 89261216 A11FC426 120C1EC4 0DE80000 0247C726 07892612 16A11FC4 26120C1E ...&ó.Å..&..&úG...$.ó...&ó.Å..&. 0001C0
 F62611F2 1EC401C8 E9037400 12163E83 017EE903 75001218 3E830412 0C068307 .......>...u.Õ-..>...t.Õù.ó.`.&- 0001E0
```

```
Dump of file SATURN:[PCCOMMON.DUMP.PBIN]DBIMP.EXE;1 on 18-APR-1990 10:54:33.53
File ID (384,26,0)   End of file block 77 / Allocated 80

Virtual block number 20 (00000014), 512 (0200) bytes

 01ACE80E 50000A88 000011F0 06C71214 06FF018A E9FFFF88 01B0E903 75200A47 G. u.Õ§.¡..Õn.....ú.Þ...¡..P.Ò¯. 000000
 3E830004 121A06C7 121206FF 11F806FF 11F606FF 90F0E800 088890C1 EB02C483 .Ä.Šè.¡..$Þ..-...½.....ú......> 000020
 1220A128 74122006 39FA4689 11FAA3C0 2B7E7401 11FA3E83 0085E903 750811FA ª..u.Õ...>ª..t~+ãÈª..Fª9. .t(À . 000040
 027DC008 1220A105 12202E83 909013E8 00001220 06C70A74 00120A3E 83FA4689 .Fª.>...t.ú. ...Š..... ..À ..ä). 000060
 02C48304 A1E80E50 003A8802 C483013A E80E5000 10B80212 0C068312 20A3C028 +ÄÈ ......¡..P.Ò:..Ä.¡:.P.ÒÀ..Ä. 000080
 EB1220A3 C028027D C0081220 A300052D FA468815 7400120A 3E832274 00FA7E83 .-ª.tª.>...t..Fª-..È ..ä).+äÈ .Š 0000A0
 FF06E902 120C0683 02C48300 F7E80E50 00108804 120C2E83 00001220 06C79007 ..ú. ........¡..P.Ò%..Ä......Õ.. 0000C0
 FF20E903 55E80EF8 76FF90F3 E80001B8 FF30E902 77E80E50 C02BFF35 E9001088 ¡..Õ5.+äP.Òw.Õ0.¡..Š#..v½.ÕU.Õ . 0000E0
 3E83087E 0067300S 7C006530 FEFEE903 75006430 90FF15E9 0436E80E 50002588 ¡%.P.Ò6.Õ...=d.u.Õ±±=e.|.=g.-Ä.> 000100
 6E30903A EBFE5689 FC468940 0C56880A 46880A4E FF0C5688 0A468809 740011FA ª..t..F..V..N..F..V.a.F=.V±Š:.=n 000120
 03750075 30887400 733DFED6 E9037500 703DFED8 E9037500 6F3DFE72 E9037500 .u.Õr±=o.u.ÕÄ±=p.u.Õ¤±=s.t.=u.u. 000140
 F6468807 8A26FC5E C4FC46FF 9034E80A 46FF9081 E8FF75E9 03750078 3DFEA8E9 Õ ±=x.u.Õu.ŠŸ..F.Š4..F•á^•&...F- 000160
 5688FC46 8806C483 045EE80E 0A76FF0C 76FF500A 4628C388 EC75253C 0474C00A .Ät.<%uš.Û+F.P.v..v..Ò^..Ä..F=.V 000180
 200A47F6 2611F21E C4FC53E9 0374C00A F6468807 8A260A5E C40C5689 0A4689FE ±.F..V.Ä^.&...F~.ât.ÕS•Ä. .&-G.  0001A0
 20138206 C7067400 12123E83 565712EC 83EC8855 CB50E58B 1216A1FE 43E90374 t.ÕC±À...|]ùU.$.$.WV.>...t.ú...  0001C0
 07882612 0C1EC419 751011FA 3E830774 0211FA3E 83121406 FF04740A 067E8300 ..~..t......>ª..t..>ª..u.Ä...&.. 0001E0

Dump of file SATURN:[PCCOMMON.DUMP.PBIN]DBIMP.EXE;1 on 18-APR-1990 10:54:33.53
File ID (384,26,0)   End of file block 77 / Allocated 80

Virtual block number 21 (00000015), 512 (0200) bytes

 07882612 0C1EC411 74001214 3E83902C EB04120C 0683FE56 89FC4689 02578826 &.W..F=.V±.....Š,..>...t.Ä...&.. 000000
 F03E8302 120C0683 FE5689FC 46899907 8826120C 1EC40EEB 0000FE46 C7FC4689 .F=úF±..Š.Ä...&....F=.V±......>Þ 000020
 4689121E 1688121C A11380A3 C0289003 E806468B 0674FE46 08FC4688 0E740011 ..t..F=.F±t..F.Š..+äÈ..À.......F 000040
 07C626F2 46FFF25E C41D750A 067E8328 7D00FE7E 83317500 12143E83 F45689F2 ·.V¶.>...u1.-±.)+.-..u.Ä^ .F &6. 000060
 00F646C7 9006E800 01F646C7 FE5689FC 46890AF7 00028308 F7FE5688 FC46882D -.F=.V±%Ä.@.%Õ.F=.V±úF-..Š..úF-. 000080
 123E830A C483238D 401A9AFC 76FFFE76 FF501E06 76FFFA5E 8CF84689 11FEB800 .¡±..F½.^ª.v..P.v±.v=..a§#.Ä..>. 0000A0
 830D7EC9 08F04E89 C828121A 0E8804C4 831EC50E C69AF876 FFFA76FF 45740012 ..tE.vª.v½.6.é..Ä.....+Ò.Nb.è~.. 0000C0
 F47FC008 49C18847 3005C626 05E8F27E C4F04E88 00001380 06C70675 0813803E >...u.ú.....NÞÄ~ Š.&6.0G.él.Ä.¶ 0000E0
 3C0774C9 08048807 8A26F85E C4F276C5 EE5E8C11 F80E88F0 4E89F446 8CF27E89 .~·.F¶.NÞ..½..^Ÿév·Ä^Ÿ&.....èt.< 000100
 14750012 143E83EE 5E8EF45E 8CF27689 E375003F 8026F846 FF46202C 80037C61 ●|..., F.F½&.?.uD.v·.^¶.^Ÿ.>...u. 000120
 5F5E02C4 830311E8 0E50C028 02E80001 88057500 F67E8308 74121006 0811FCA1 À=.....t..~~.u.¡..Š.+äP.Ò...Ä.^  000140
 89F84689 120E1688 120CA100 018E1874 00067E83 565710EC 83EC8855 CB50E588 .|]ùU.$.$.WV.-..t./..À.......F½. 000160
 89F84689 02578826 07882612 0C1EC413 740811FA 3E83008F E902120C 0683FA56 Vª.....Õ...>ª..t.Ä...&..&.W..F½. 000180
 0E740811 FA3E8304 120C0683 FA5E8CF8 4689FC46 89078826 120C1EC4 10E8FA56 VªŠ.Ä...&...F=.F½.^ª......>ª..t. 0001A0
 F8468BFA 5E8CF846 89003D88 097500FC 7E83900A E8003688 1575FA46 08F8468B .F½.Fªu.¡6.Š...~•.u.¡=..F½.^ª.F½ 0001C0
 8026F246 FFF25EC4 900EE812 1A0E881C 74121236 39F628F4 5689F246 89FA5688 .Vª.F·.V¶+-96..t.....Š..Ä^ .F &. 0001E0

Dump of file SATURN:[PCCOMMON.DUMP.PBIN]DBIMP.EXE;1 on 18-APR-1990 10:54:33.53
File ID (384,26,0)   End of file block 77 / Allocated 80

Virtual block number 22 (00000016), 512 (0200) bytes

 83FE2812 203E88F3 75003F80 26F246FF F25EC446 90EDE810 7ECE3846 1574003F ?.t.F;Õ~.ŠÙ.FÄ^·.F·&.?.u¤.> .+±. 000000
 120A3E83 06C48301 8DE80EF8 76FFFA76 FF5602C4 83015FE8 0E570875 00120A3E >...u.W.Ò ..Ä.V.vª.v½.Õ§..Ä..>.. 000020
 89120E16 88120CA1 06EC83EC 885590C8 5DE5885F 5E02C483 0142E80E 57087400 .t.W.ÒB..Ž.^_.|]ù.U.$.$.À....... 000040
 0012123E 83FA4688 C02A9003 E8018005 7547067E 83067467 067E83FE 5689FC46 F=.V±.-.gt.._.Gu.¯.Š..ªÄ.Fª >... 000060
 FF11F836 FF000112 1A06C706 7500121A 3E830074 00FA7E80 0006121A 06C70675 u.ú......-ª.t..>...u.ú...... ½.. 000080
 0EC48300 4A1EFF26 0F9A068E FC76FFFE 76FF121C 36FF121E 36FF0676 FF121A36 6...v..6...6...v±.v=....&..J. ^. 0000A0
 C4830D4E 1EFF260F 9A068E12 1C36FF12 1E36FF14 750011F0 3E831874 00FA7E80 .-ª.t..>Þ..u..6...6......&..N..Ä 0000C0
 0D561EFF 260F9A06 8E121C36 FF121E36 FF147500 121A3E83 18740011 F03E8304 ..>Þ..t..>...u..6...6......&..V. 0000E0
 9A068EFC 76FFFE76 FF187412 10060811 FCA10000 138006C7 08120C06 8304C483 .Ä......ú.....À=.....t..v±.v=... 000100
 885590CB 5DE58801 33E80E50 C02802E8 00018805 74C00804 C483005A 1EFF260F .&..Z..Ä..Ät.¡..Š.+ÄP.Õ3..|]ù.U. 000120
 02478E26 07FF2637 88260646 8A157804 4FFF2611 F21EC43D 75001218 3E8356EC $V.>...u=Ä.·.&.O.x..F.&.7&..&.G. 000140
 EB121806 FF077540 06C48326 A1198A9A 0676FF53 11F436FF 9011E8E4 2A048826 &..*ÕŠ...6¶.S.v..¤.Ä&.Ä.au.....Š 000160
 507EF608 06768857 75001218 3E835657 02EC83EC 885590C8 505E1216 06FF9005 ......^]ù.U.$.$.WV.>...uW.v..--P 000180
 4EC68812 1806FF04 754006C4 83270019 8A9A1382 36FF11F2 36FF11F4 36FF18EB Š..6¶..6·..6...¤..'.Ä.au......6N 0001A0
 E42A0588 2602478E 2607FF26 3F882613 82A0D478 044FFF26 11F21EC4 1E7EC008 .Ä~.Ä.·.&.O.xÄ...&.?&..&.G.&..*Õ 0001C0
 76885657 02EC83EC 8855C85D E5885F5E 12160601 06468807 75001218 3E8304E8 ŠÄ.>...u..F.....^_.|]ùU.$.$.WV.v 0001E0
```

```
Dump of file SATURN:[PCCOMMON.DUMP.PBIN]DBIMP.EXE;1 on 18-APR-1990 10:54:33.53
File ID (384,26,0)   End of file block 77 / Allocated 80

Virtual block number 23 (00000017), 512 (0200) bytes

83278319 8A9A5098 078A2606 5EC411F2 36FF11F4 36FF22E8 5E750012 183E830A ..>...u^$".6¶..6·.Á^.&...P.¤..'. 000000
065EC4CD 78044FFF 2611F21E C42574C0 084EC688 0646FF12 1806FF04 754006C4 å.@u......F..óN.ät%å. .&.O.xeá^. 000020
88077500 12183E83 CAE8E42A 05882602 478E2607 FF263F88 2611F21E C4078A26 &..å. .&.?&..&.G.&..*ðŠð.>...u.. 000040
F65689F4 4689121E 1688121C A1560CEC 83EC8855 C850E588 5F5E1216 06010A46 F.....^_.||ÙU.$.$.VÅ.......F¶.V- 000060
067628F0 28F84689 04C48323 A80EC69A F476FF52 12203688 FA4689FC 4689C028 •å.F•.F¯.6 .R.v¶.6. ¨#.å..F½•b•v. 000080
8026F45E C4227500 120A3E83 4E017508 13803E83 08E802EE 83057510 13803E83 .>...u..Ÿ.Š..>...u.N.>...u"å^¶&. 0000A0
823E83F8 4EFF02C4 83FE67E8 0E509807 8A26F446 FF127530 13823E83 1975203F ?·u..>..Ou..F¶&...P.Ògt.å..N%.>. 0000C0
13803E83 0068E80E FA46FF07 7400067E 83187400 120A3E83 077EF608 08743013 .Ot..--..>...t..~..t..F'.Òh..>.. 0000E0
830A7400 067E8302 C483FE74 E80E5629 7500120A 3E830072 E80EFC46 FF077400 .t..F•.Òr..>...u)V.Òtt.å..~..t.. 000100
F676FFF8 76FF0042 E80E0475 00FC7E83 0A740013 803E8300 38E80E04 7500FA7E ~'.u..Ò;..>...t..~•.u..Ò8..V%.v- 000120
5E02C483 FE2EE80E 56002013 8206C70E 7400120A 3E8306C4 83FEAFE8 0EF476FF .v¶.Òt±.å..>...t.ú... .V.Ò.±.å.^ 000140
50003088 C802C483 FDC6E80E 50002088 03E8002B 88057400 11FC3E83 C850E588 .||ù.>•..t.|•.Š.| .P.Òó».å.ù|0.P 000160
E80E5000 788803E8 00588805 740011F8 3E831775 1013803E 8302C483 FD8AE80E .Òn».å..>...u..>%..t.|X.Š.|x.P.Ò 000180
120C1EC4 12752A3F 80260A5E C40001FE 46C75657 06EC83EC 8855C802 C483FD9C .».å.ÙJ.$.$.WVúF±..å^.&.?*u.å... 0001A0
280A46FF FFFFFE46 C7087520 3F80260A 5EC49061 E80A46FF 02120C06 83378826 &.7......F.Šа.å^.&.?·u.úF±...F.• 0001C0
138206C7 0675303C 0A751212 36393C7F 393C407C 303CFA46 88078A26 0A5E88F6 -.^.&...F'<0|a<9.<96..u.<Ou.ú... 0001E0

Dump of file SATURN:[PCCOMMON.DUMP.PBIN]DBIMP.EXE;1 on 18-APR-1990 10:54:33.53
File ID (384,26,0)   End of file block 77 / Allocated 80

Virtual block number 24 (00000018), 512 (0200) bytes

8830E983 C803E1D1 CE03E1D1 E1D1CE88 98058A26 1C7F393D 802606E8 F8880030 O..«Š.&.=9..&....öIÅIÅ.öIÅ.à.ÕO. 000000
56880A46 88378926 065EC4F0 88EEF7FE 46880C46 8C0A7E89 DE7D303D 802647F1 þG&.=0)Ñ.~..F..F±¥Y.bá^.&.7.F..V 000020
01E8FC7E C4064E8A FE5E8CFC 46890044 885704EC 83EC8855 90C850E5 885F5E0C .^_.||ù.U.$.$.W|D..F•.^±.N.å-•Š. 000040
C028FE46 8CFC7E89 9009E8FE 468CFC7E 89000188 F4750038 26117400 3D802647 G&.=.t.&8.u¶|...-•.F±Š...-•.F±•å 000060
28257583 0A47F626 FC5EC4FE 5E8CFC46 890A3488 04EC83EC 885590C8 50E5885F  .||ù.U.$.$.|4..F•.^±á^•&-G..uX• 000080
C388FF08 47C62602 57892607 89260857 89260647 8926990A 47882604 478926C0 Õ&.G.&.G..&.G.&.W.&..&.W.&6G...û 0000A0
90C85DE5 8899C028 80750B9E 1638C375 089C0638 0CFC4683 C28CC388 17E8C28C .åŠ..û.ð.F•.;...uù;...u§•à..||ù. 0000C0
75C08500 00FFFF9A 530E6EE9 0E62E9C0 330009BA 08720CE8 1E38065E 88EC8855 U.$.^.;.Š.r.¤..3ÃÒb.Õn.S......åu 0000E0
1E990175 0AF983D2 33064688 0C4E8801 835756EC 8855C850 E588000C ED87C6F3 µó.Ù...||ÙU.$VW"..N..F.38.'.u... 000100
28C23399 03448D50 520001BA 51808806 76885657 20EC83EC 88551A7F E9087EC5 é~.Õ..U.$.$ WV.v.|.Ö¤..RP.D..3ó• 000120
AA8F88E3 D1085E88 EC5689EA 46892A73 492C9A50 5299C228 C233F8D3 000289C2 ó¿..K%3ó•ó.RP..Is*.FÕ.V$.^.1D.€` 000140
5052990E 46885052 99003C88 47017E02 087E8307 750208F9 F7000489 99C68800 ..ó.¿..%'.@u..~..~.G|<..RP.F..RP 000160
87492C9A E65E89E4 4E895052 990A880C 4688C888 51530828 0E10892A 8F492C9A .,I.*¿..•ÜSO.à.F..Ö.RP.NÕ.^1.,IÑ 000180
4E895052 99C703C2 030A4688 0088EEF7 0A880160 88C88851 53000188 5180892A *¿.OE..SQ.à|m..ÖÁY.Å.F..ó.Ú.RP.N 0001A0
13C80399 DA881046 88C888E6 5613E446 03E25613 E046032A EA492C9A E25E89E0 Å.^ã.,Iõ*.fÅ.Vã.FÕ.V|.à.F..¿ .À. 0001C0
880002A1 28184066 9AFC4689 C7030A46 88EC5E11 EA4E0112 CED381A6 00C1810A Õ.é.|.&ö..NÕ.^$.F..ú.F•.fa.• '.. 0001E0

Dump of file SATURN:[PCCOMMON.DUMP.PBIN]DBIMP.EXE;1 on 18-APR-1990 10:54:33.53
File ID (384,26,0)   End of file block 77 / Allocated 80

Virtual block number 25 (00000019), 512 (0200) bytes

00083E83 F246890C 4688F646 89480846 88F84689 50448DEC 5611EA46 01000416 .å..FÕ.V$.DP.F%.F.N.F-.F..F`.>ø. 000000
EA468800 EC5E830E 10EA6E81 0974C008 04C48326 63414A9A 5016EE46 8D1A7400 .t..F¶.P.JAc&.å..åt..nÕ...^$..FÕ 000020
FF0A76FF 28683780 9A0014B8 D88E1EEC 88554590 581E90C8 50E5885F 5EEC5688 .V$^_.||ù..X.EU.$..Å|...¯7k•.v.. 000040
14C4832B 8744EC9A 0C76FF0E 76FF1076 FF1276FF 5016EE46 8D5016F2 46800876 v..F¯.P.F¶.P.v..v..v..v..$D.•.å. 000060
89FA4689 06C4832B 9F428C9A 0876FF0A 76FF5000 5CB89001 73E9FFFF 88077540 ðu.|..ÕS..|\.P.v..v...B.•.å..F*. 000080
46881075 C208F856 89F64689 06C4832B EA428C9A 0876FF0A 76FF5000 2F88FC56 V=|/.P.v..v...BÕ•.å..F-.V%.Õu..F 0000A0
76F64639 FC5688FA 46880874 FC4600FA 468819EB 0A568808 46882775 FC4608FA '.F•u'.F..V.Š..F'.F•t..F'.V•9F-v 0000C0
0806C483 2C08422C 9AFA76FF FC76FF50 002E88FC 5689FA46 89F85688 F646880C ..F-.V%.F'.V•|..P.v•.v'..B..,.å.. 0000E0
0EC4832C 1F48589A 0676FF08 76FF0A76 FFEE76FF F076FFF2 76FFF476 FF237400 Åt#.v¶.v·.vÞ.v¶.v..v..v..XH..,.å. 000100
02C4832C 513E199A 50000505 04C4832C 280EC69A 0876FF0A 76FF0087 E9EC4689 .FŠÕÑ..v..v...ó.•,.å.....P...>O,.å. 000120
669AFA76 FFFC76FF 0876FF0A 76FF0088 E9FFFFEC 46C70875 D008FC56 89FA4689 .F'.V•.Åu.ÚFŠ..Õ....v...v...•.v'.f 000140
FFFC76FF 50C02808 C4832C75 0E209AFA 76FFFC76 FF501E0D 648808C4 832C640E .d,.å.|d..P.v•.v'. .u,.å.• P.v•. 000160
428C9AFA 76FFFC76 FF50002E 88501E0D 69882174 C00806C4 832C902E A49AFA76 v'.Ê..,.å..åt||!..P|..P.v•,v'..B 000180
76FFFC76 FFEE76FF F076FFF2 76FFF476 FF08C483 2C870E66 9A505206 C4832C9A .,.å.RP.f.ñ,.å..v¶.v·.vÞ.v¶.v•.v 0001A0
F076FF04 C4832C06 3E049AFA 76FFFC76 FFEC4689 0EC4832C C848589A 0676FFFA '.v..XHå,.å..FŠ.v•.v'..>ø,.å..vÞ 0001C0
8802ED83 EC468804 C4832A40 3E049AF2 76FFF476 FF04C483 2CE43E04 9AEE76FF .v¶..>ð,.å..v¶.v·..>a*.å..FŠ.Ù.. 0001E0
```

```
Dump of file SATURN:[PCCOMMON.DUMP.PBIN]DBIMP.EXE;1 on 18-APR-1990 10:54:33.53
File ID (384,26,0)   End of file block 77 / Allocated 80

Virtual block number 26 (0000001A), 512 (0200) bytes

 8689FF20 868D5657 202E37B0 9A00E4B8 088E1EEC 88554590 581E90CB 4D5D1FE5 |.]Mù..X.EU.$..Å¡ö..¯7.-WV.. ... 000000
 20602B3A 9A0676FF 0876FF0A 76FF0C76 FF0E76FF 1076FF12 76FFFF72 968CFF70 p...r..v..v..v..v..v..v..v..:+m· 000020
 8688078A 26085EC4 36750D0C E23E8307 74020CE2 3E834475 40FF7886 890EC483 .ó...x.ðuD.>ã..t..>ã..uóá¯.&.... 000040
 83209B0F 1A9A501E 006E8819 743A017F 80260774 C00A2474 5C3C2874 2F3CFF1E ..</t(<\t$.át.&...:t.jn..P....¯. 000060
 B6FFFF7C 86FF5000 7F889001 13E9FF78 86880875 D008FF7C 9689FF7A 868904C4 ó...z...|..Åu...x.Ö...|..P.Ñ|..Ñ 000080
 FF7A8EC4 00FD46C6 FF7C9689 FF7A8689 0AC4832E 243ED49A 5016FF7E 868DFF7A z...~..P.å>$..ó...z...|.óF».å/z. 0000A0
 708689ED 75003080 26464704 88058A26 00743B3D 802600E8 FF7086C5 FF1C9E8C ....éÑp.Š.&.=;t.&....Gf&.=.uU.Ñp 0000C0
 708688FF 708EFF00 07C626FF 709EC4FF 7C868CFF 7A8E89FF 1C9E8EFF 729E8CFF ...r....../z...|.ó.p.&ó....p...p 0000E0
 745C3F80 26FF749E C4FF7296 8CFF7086 89FF2086 80FF7696 89FF7486 89C28CFF ..ö..t...v... ...p...r.ó.t.&.?\t 000100
 FF0876FF 0A76FF08 C4832E3A 0E209AFF 7086FF16 501E0073 8812742F 3F802618 .&.?/t.¡s..P..Ñp.. .:..ó..v..v.. 000120
 FFFF7286 FF0C76FF 0E76FF10 76FF1276 FF08C483 2E590E20 9AFF7086 FFFF7286 Ñr..Ñp.. .Y..ó..v..v..v..v..Ñr.. 000140
 830A7402 0CE23E83 FF16E903 7440FF78 86890EC4 83284A28 3A9A0676 FFFF7086 Ñp..v..:+J+.ó...x.ðt.Ö...>ã..t.. 000160
 0008FF7A 86FFC28C C388FEF8 E9037500 3F8026FF 7A9EC4FF 05E90374 000CE23E >ã..t.Ö..ó.z.&.?.u.Ö½.û.ö..z..Å 000180
 0676FF08 76FF02EC 83EC8855 90CB4D5D 1FE58802 ED835F5E FEE6E9FF 17E90374 t.Ö..Ö|±^_.Ù..|.]Mù.U.$.$..v..v. 0001A0
 8A0C7400 01FE46F7 1374020A 46F61675 C0080000 FFFF9A50 50C03350 FE468D16 ..F±P3ÀPP¯.....ðu.-F..t.¥F±..t.¤ 0001C0
 06529A50 50C03306 76FF0876 FFEC8855 00C850E5 88097AE9 096EE900 05880000 ..¡..Õn.Öz..|]ù.U.$.v..v.3ÀPP.R. 0001E0
```

```
Dump of file SATURN:[PCCOMMON.DUMP.PBIN]DBIMP.EXE;1 on 18-APR-1990 10:54:33.53
File ID (384,26,0)   End of file block 77 / Allocated 80

Virtual block number 27 (0000001B), 512 (0200) bytes

 90C9DE9B EC8855C8 50E5889B 90C1DE9B EC8855C8 50E58809 5CE90374 C0850000 ...ât.Ö\..|]ùU.$.Ñé...|]ùU.$ 'À. 000000
 EC8855CB 50E5889B 90E1DE9B EC8855CB 50E5889B 90E9DE9B EC8855CB 50E5889B ..|]ùU.$.ÑÖ...|]ùU.$.ÑÄ...|]ùU.$ 000020
 50E5889B 90C0D99B EC8855CB 50E5889B 90F1DE9B EC8855CB 50E5889B 90F9DE9B .Ñ°...|]ùU.$.Ñþ...|]ùU.$.\ó...|] 000040
 901FD09B EC8855CB 50E5889B 9007D09B EC8855CB 50E5889B 90E0D99B EC8855CB ùU.$.\Å...|]ùU.$.Ť....|]ùU.$.Ť.. 000060
 EC8855CB 50E5889B 9007DC9B EC8855CB 50E5889B 9017D09B EC8855CB 50E5889B ..|]ùU.$.Ť....|]ùU.$.É....|]ùU.$ 000080
 50E5889B 902FDC9B EC8855CB 50E5889B 9027DC9B EC8855CB 50E5889B 900FDC9B .É....|]ùU.$.É'...|]ùU.$.É/...|] 0000A0
 9007DF9B EC8855CB 50E5889B 903FDC9B EC8855CB 50E5889B 9037DC9B EC8855CB ùU.$.É7...|]ùU.$.É7...|]ùU.$.Ö.. 0000C0
 550716CB 50E5889B 902FDF9B EC8855CB 50E5889B 9007D89B EC8855CB 50E5889B ..|]ùU.$.Ù....|]ùU.$.Ö/. .|]ù..U 0000E0
 EC885507 16CB50E5 889B901F D9269BEC 88550716 CB50E588 9B9007D9 269BEC88 .$.&1....|]ù..U.$.&1....|`ù..U.$ 000100
 269BEC88 550716CB 50E5889B 9007D826 9BEC8855 0716CB5D E5889890 17D9269B .&1....|]ù..U.$.&Å....|]ù..U.$.& 000120
 2FD8269B EC885507 16CB50E5 889B9027 D8269BEC 88550716 CB50E588 9B900FD8 Å....|]ù..U.$.&Å'...|]ù..U.$.&Å/ 000140
 9B903FD8 269BEC88 550716CB 50E5889B 9037D826 9BEC8855 0716CB50 E5889890 ...|]ù..U.$.&Å7...|]ù..U.$.&Å?.. 000160
 E5889890 1FD0269B EC885507 16CB5DE5 889B9007 D0269BEC 88550716 CB5DE588 .|]ù..U.$.&Ť....|]ù..U.$.&Ť....| 000180
 CB5DE588 9B9007DC 269BEC88 550716CB 50E5889B 9017D026 9BEC8855 0716CB5D ]ù..U.$.&Ť....|]ù..U.$.&É....|]ù 0001A0
 0716CB5D E5889890 27DC269B EC885507 16CB50E5 889B900F DC269BEC 88550716 ..U.$.&É....|]ù..U.$.&É'...|]ù.. 0001C0
 88550716 CB50E588 9B9037DC 269BEC88 550716CB 50E5889B 902FDC26 9BEC8855 U.$.&É/...|]ù..U.$.&É7...|]ù..U. 0001E0
```

```
Dump of file SATURN:[PCCOMMON.DUMP.PBIN]DBIMP.EXE;1 on 18-APR-1990 10:54:33.53
File ID (384,26,0)   End of file block 77 / Allocated 80

Virtual block number 28 (0000001C), 512 (0200) bytes

 9BEC8855 0716CB5D E5889B90 07DF269B EC885507 16CB5DE5 889B903F DC269BEC $.&É?...|]ù..U.$.&Ö....|]ù..U.$. 000000
 565704EC 83EC8855 CB5DE588 9B902FDF 269BEC88 550716CB 50E5889B 9007D826 &U....|]ù..U.$.&Ö/...|]ùU.$.$.WV 000020
 26065E88 07E80020 0598078A 26065E88 0C740108 A187F608 8898078A 26065EC4 ó^.&....Ä-.Å..t..^.&.... .Š..^.& 000040
 5EC40846 8C067E89 F2750408 A187F608 8898058A 2647F888 16740065 3098078A ...=e.t..«G&....Ä-:Å..u·.-..F.ó^ 000060
 46FFF788 078826C6 88F88898 078A2606 5E882E07 C6260646 FFF08898 078A2606 .&....b.F.&ó...^.&....%.ó&...%.F 000080
 2E308026 9008E806 7EC45657 06EC83EC 8855CB5D E5885F5E FC7E89E9 75C00A06 ..ðuÖ.-=^_.|]ùU.$.$.WVó-.Š..&.=. 0000A0
 900EE806 7E886774 003F8026 0646FF0F 8808468C 067E89F3 75003080 26470774 t.G&.=.u¯.-..F..Ö.F.&.?.tg.-.Š.. 0000C0
 064EFFC2 8CC78808 468C067E 89E07500 30802647 07744530 80260074 65308026 &.=et.&.=Et.G&.=.uÛ.-..F..Ù.ö.N. 0000E0
 752E3F80 260F8808 468C067E 89F97430 3080264F 9002E806 7E88FE56 89FC4689 .F=.V±.-.Š..O&.=0t°.-..F..Ö&.?.u 000100
 5E8EFE5E 8CFC7689 F275C00A 078826AC 065EC406 46FFFC76 C5FA5E8C 064EFF03 ..N..^°év=.F.ó^.¯&...ðu·.v=.^±.^ 000120
 7ED09808 D0980FA0 160C9807 D0269806 5EC402EC 83EC8855 90CB5DE5 885F5EFA ±^_.|]ù.U.$.$.ó^..&1..É....ÏÅ.Ï- 000140
 7E835657 08EC83EC 8855CB5D E588C028 CB50E588 90018807 729EFF66 8A9B90FE ±...f..r.¡...|]ù+ð.|]ùU.$.$.WV.- 000160
 A5A5A5A5 DA8E1EF0 88F88808 5EC404C4 8332A13E FE9A0C76 FF0E76FF 24740006 ..t$.v..v..±>Å2.ó.ó^..«.Þ..ÖEEEE 000180
 DA8E1E07 16F088F8 7E8D04C4 8333333E FE9A0C76 FF0E76FF 90CB5DE5 885F5E1F .^ .|]ù..v..v..±>33.ó..~%.Þ....Ö 0001A0
 56570AEC 83EC8855 CB5DE588 5F5E9B90 1FD9269B F846009B 085EC41F A5A5A5A5 ÉÉÉÉ.ó^..ÏF%.&1...^ .|]ùU.$.$.WV 0001C0
 00018805 75203F83 26F85EC4 FA5689F8 4689138E 1688138C 41477400 00843E80 .>...tGÀ.......F%.VÏó^¥&.?·u.¡.. 0001E0
```

```
Dump of file SATURN:[PCCOMMON.DUMP.PBIN]DBIMP.EXE;1 on 18-APR-1990 10:54:33.53
File ID (384,26,0)   End of file block 77 / Allocated 80

Virtual block number 29 (0000001D), 512 (0200) bytes

 FF50C02B 9003EB00 01B8067E 000E7E83 FE5689FC 46890C56 8B0A4603 C02B02EB Š.+å.F..V..F=.V±.~..~.¡..Š..+åP. 000000
 37FF2602 77FF2604 77FF2606 77FF2606 5EC458EB 06C48304 5DEB0EFC 76FFFE76 v±.v=.Ö)..á.ŠXá^.&.w.&.w.&.w.&.7 000020
 02EB0001 B8057E00 0E7EB350 400E468B 5052FA56 89F84689 08C48333 7149C19A .ê1q3.á..F%.V'RP.F.ªP.~..~.¡..Š. 000040
 529A5052 0C568B0A 4603C703 C02B02EB 00018805 75203F83 26F88BF8 5EC4C02B +åá^%.¥&.?-u.¡..Š.+å.Ú.F..V.RP.R 000060
 46FFFC5E C40A752D 3F8326F8 5EC4FE56 89FC4689 0C568B0A 46880AC4 8333CB3F ?ú3:á..F..V..F=.V±á^¥&.?-u.á^=.F 000080
 B82E07C6 26FC5E88 FC46FF07 88260147 8A26FC5E C4147E00 0E7E832D 07C626FC =&ó.-.~..~.á^=&.G.&...F=.^=&ó..¡ 0000A0
 08C48335 050E669A 5052FE56 88FC4603 0E46030B F7C01801 0D843E80 501E0D7E ~..P.>....Å¼Å.F..F=.V±RP.f..5.á. 0000C0
 3F802606 5FC426F8 5EC4FC46 FF4507C6 26FC5EC4 07740010 7E83FE56 89FC4689 .F=.V±.-..t.á^=&ó.E.F=á^¥&á_.&.? 0000E0
 83FC46FF 2D07C626 FC5EC4F0 8BD8F70B 7DF60BF0 88480247 8826F85E C45E7430 0t^á ¥&.G.H.Þ.-}.%Å.Þá^=&ó.¯.F=. 000100
 7C0AFE83 FC46FFF2 8BF9F799 C68B0700 26FC5EC4 F9F70064 B999C68B 157C64FE ±d|..ó.¿d.%'á^=&...ó.%'.·.F  ±.| 000120
 0026C68B FC5EC4FC 46FFF28B F9F799C6 8B070026 FC5EC4F9 F7000AB9 99C68B15 ..ó.¿..%'á^=&...ó.%'.·.F=á^=..^.. 000140
 FF0E76FF 1076FF01 0D8406C6 04EC83EC 8B5590CB 50E58B5F 5E0C568B 0A468B07 ..F..V.^_.|}ù.U.Š.Š.ó.....v..v.. 000160
 8B55CB5D E58B000D 8406C6FE 5689FC46 89FE49E8 0E0676FF 0876FF0A 76FF0C76 v..v..v..v..Ö|±.F=.V±ó.....|}ùU. 000180
 26F45EC4 F65689F4 4689138E 1688138C A1517400 0D843E80 00F246C6 12EC83EC &.Š.óF·..>...tQÅ.......F¶.V-á^¶& 0001A0
 6A750E46 390D86A1 FE5689FC 46890C56 8B0A4603 C02B02E8 00018805 75203F83 .?-u.¡..Š.+å.F..V..F=.V±Å..9F.uj 0001C0
 4AEB0007 C626EE5E 8B3007C6 26EE46FF EE5EC4F0 5689EE46 89008606 03FC468B .F=.....FŸ.VÞá^Ÿ.FŸ&ó.0.^Ÿ&ó..ŠJ 0001E0

Dump of file SATURN:[PCCOMMON.DUMP.PBIN]DBIMP.EXE;1 on 18-APR-1990 10:54:33.53
File ID (384,26,0)   End of file block 77 / Allocated 80

Virtual block number 30 (0000001E), 512 (0200) bytes

 F65689F4 468908C4 83353549 C19A37FF 260277FF 260477FF 260677FF 26065EC4 á^.&.w.&.w.&.w.&.7.é155.á..F¶.V- 000000
 0C568B0A 4603C02B 02EB0001 B805752D 3F832650 0E460302 478B26F4 5EC45052 RPá^¶&.G..F.P&.?-u.¡..Š.+å.F..V. 000020
 C40A752D 3F8326F4 5EC4FE56 89FC4689 0C568B0A 46880AC4 83595A3F 529A5052 RP.R?ZY.á..F..V..F=.V±á^¶&.?-u.á 000040
 05EB0EFC 76FFFE76 FF500001 B81D7F00 027F8326 F45EC42D 07C626FC 46FFFC5E ^=.F=&ó.-á^¶&.......¡..P.v±.v=.Ö. 000060
 687E000E 7E83FC46 0102478B 26F45EC4 0AEB3007 C626FC46 FFFC5EC4 06C48302 ..á.á^=.F=&ó.0Š.á^¶&.G..F=.-..-h 000080
 8326F45E C42E07C6 26FC46FF FC5EC406 C48301D8 E80EFC76 FFFE76FF 500001B8 ¡..P.v±.v=.ÖÅ..á.á^=.F=&ó..á^¶&. 0000A0
 B8037E0E 463B08F7 02478B26 0EEB0BF7 02478B26 08740000 843E8043 7D00027F ...}C.>...t.&.G.%ÅŠ.&.G.%Å;F.-.. 0000C0
 FC76FFFE 76FF5000 30B80E76 FF06C483 0196EB0E FC76FFFE 76FF500E 46890E46 F..F.P.v±.v=.Ö...á..v.¡0.P.v±.v= 0000E0
 0E76FF01 0D8406C6 04EC83EC 8B55CB5D E58B0C56 8B0A468B 08C48336 4C44409A .@DL6.á..F..V..|}ùU.Š.Š.ó.....v. 000100
 90CB50E5 8B000D84 06C6FE56 89FC4689 FE6EEB0E 0676FF08 76FF0A76 FF0C76FF .v..v..v..v..Ön±.F=.V±ó.....|}ù. 000120
 C4833688 49C19A37 FF260277 FF260477 FF260677 FF26065E C45606EC 83EC8B55 U.Š.Š.Vá^.&.w.&.w.&.w.&.7.é1.6.á 000140
 9003EB00 01B80675 203F8326 0D86A348 02478B26 138C1EC4 138E1689 138CA308 .Ê......á...&.G.HÊ..&.?-u.¡..Š.. 000160
 8C1EC40A C4833788 3F529A50 520E76FF 5306FE56 89FC4689 0C568B0A 4603C02B +å.F..V..F=.V±.S.v.RP.R7.7.á.á.. 000180
 C68B077C FCFE8300 86368900 8BA2C02A 02EB0180 047D0086 36394E02 77882613 .&.w.N96..).¯.Š.*åÅ...6...±=|..6 0001A0
 8B5E0CC4 83FD93EB 0E0676FF 0876FF0A 76FF0C76 FF0E76FF 1076FF1F 7F0E4639 9F....v..v..v..v..v..v..Ö.».á.^. 0001C0
 5E8EFE5E 8CFC7689 F97500FF 7C8046FC 76C5FA5E 8C1E7400 0D883E80 90CB50E5 |}ù..>...t..^*évøF.|..u'.v=.^±.^ 0001E0

Dump of file SATURN:[PCCOMMON.DUMP.PBIN]DBIMP.EXE;1 on 18-APR-1990 10:54:33.53
File ID (384,26,0)   End of file block 77 / Allocated 80

Virtual block number 31 (0000001F), 512 (0200) bytes

 5E0AC483 FEF6EB0E 0676FF08 76FF0A76 FF0C76FF 0E76FF00 FE47C626 FC5EC4FA *á^=&6G±..v..v..v..v..v..Ö-±.á.^ 000000
 FF0A76FF 0C76FF10 76FF1276 FF197545 0E7EB306 74650E7E 83EC8B55 CB50E58B .|}ùU.Š.~.et..~.Eu..v..v..v..v.. 000020
 76FF0B76 FF0A76FF 0C76FF10 76FF1875 660E7E83 9035EBFB 8FEB0E06 76FF0876 v..v..Ö.«$5..~.fu..v..v..v..v..v 000040
 FEC0EB0E 0676FF08 76FF0A76 FF0C76FF 1076FF12 76FFCB5D 0AC483FD 39EB0E06 ..Ö9=.á.}ù.v..v..v..v..v..v..Öå± 000060
 FF504004 C48337A3 0EC69A06 76FF0B76 FF297400 0A7E83EC 8B5590CB 500CC483 .á.}ù.U.Š.-..t).v..v..ó.Ê7.á.ªP. 000080
 D27AE900 028BCB50 0AC48332 7D43189A 50520856 88064603 0A468B06 76FF0876 v..v..F..F..V.RP..C)2.á.}ù¡..Öz@ 0000A0
 D25AE9C0 33057540 008AA151 52CB5152 E3B80572 008E1E38 08720828 DCBB5A59 YZ.Ê+År.;...r..DRQùRQÅ..ªu.3áÖZ@ 0000C0
 500001B8 35F3149E 9A117455 F480FBE2 E032ACFC E4320042 89F63356 008A2EFF ....V3-¿B.2ö=¯2Åã«.¶Ut....µ5¡..P 0000E0
 0808070A 0C090C08 0C070906 00051B04 02030202 1601CB5E 00018837 EA157E9A .-.ö7¡..^ù....................... 000100
 1C70206D 006C0B59 00570053 00520243 00410235 02121211 0D10120F 160D160C ............S.A.C.R.S.W.Y.l.m p. 000120
 FFFFB80C E216890C E9A31608 00000807 02CE0BA4 0D840982 0A810A80 16060972 r...........Ê.ð.¤.....ÊÖ...ã.¡.. 000140
 073A2E18 75E40A00 24B937FA BB0CE9A3 CB50E58B 99FFFF88 0008E8CB 50E5B899 ..|}ùÖ..¡....|}ùÊÖ.Ê'7¿$..Öu..:. 000160
 0CE2A39B 01478A2E 430176CA 3C04728C 3C430A76 243C0472 133CF7E2 43431674 t.CCã%<.r.<$v.C<Ÿr.<Þv.C..G..Êã. 000180
 E0D1C103 E0D1C8B8 F9F7000C B9990A34 20044688 0D9006FF 04EC83EC 8B5500C3 Ù.U.Š.Š......F.-4..¿..%'.ÞlÅ.élÅ 0001A0
 08578926 06478926 045EC402 C48337F3 3E199A50 020088FE 5E8CFC46 89082405 .$..F=.^±¡..P..>µ7.á.á^.&.G.&.W. 0001C0
 8BFC468B 040A4F80 26045EC4 20EB0200 0247C726 FC5EC408 0A4F8026 10740008 .Åt.&.O..á^=&ùG...Š á^.&.O...F=. 0001E0
```

Dump of file SATURN:[PCCOMMON.DUMP.PBIN]DBIMP.EXE;1 on 18-APR-1990 10:54:33.53
File ID (384,26,0)   End of file block 77 / Allocated 80

Virtual block number 32 (00000020), 512 (0200) bytes 26085788 26064788 26045EC4 00010247 C726FC5E C4085789 26064789 2640FE56 V:a&.G.&.W.á^•&uG...á^.&.G.&.W.& 000000
3300098A 08720CEB 1E3B065E 8BEC8855 C35DE588 00000447 C7260257 89260789 ..&.W.&uG....[]uU.š.^.;.Š.r.¤..3 000020
855A5900 00FFFF9A 51160C76 FF0876FF 0A76FF53 CC8804EC 83FF1EE9 FF12E9C0 àÕ..Õ...š..äS.v..v..v..Q.....YZ. 000040
FE568D16 0676FF08 76FF4087 0EEC83EC 885500C8 5DE588FD 0CEDA780 91E175C0 àuÄ..ÌU.».[]ù.U.š.š.ña.v..v...V: 000060
2A750400 A910CA80 08740100 A90A4688 018AE80C 4E885252 023352F8 568D1652 R..V¼R3@RR.N.Ò...F.`..t..ò.`..u* 000080
58C08500 002EBA9A 5050C033 50160676 FF0876FF FE468050 02CA8022 740200A9 `..t".ò.P.F:.v..v..P3äPP.¤....âX 0000A0
3D1674C0 080000FF FF9A5050 C03350C7 0A000325 525101CA 8003EBFE 4E880875 u..N:Š..ò.QR%...úP3äPP......ât.= 0000C0
9A500072 0CEB063B FE468800 8DE9FE64 E900118A 03740002 BAF0C2F6 0E75006E n.u.-ôþ¤..t.¤..Òd:Õ...F:;.Š.r.P. 0000E0
75C00800 0013B69A 50F8468D 1653F45E 80165000 8BE4EBC0 330018BA 000029E9 Õ)..¤..3äŠõ.ÀP..`¶S..F¼P.Ñ....àu 000100
3CF4468A F24E8880 81027580 0E7706F6 07754000 A90E7580 00A9C933 0A468861 a.F.3è`..u.`.àu.-.w..u.Ÿ..N .F¶< 000120
46F77A74 C90AF446 88C03200 83E908F4 46C60775 023C008E E940F446 C6077501 .u.óF¶àÕ..<.u.óF¶.Õ..2â.F¶.èt:¼F 000140
00833D0C 74C00800 0039499A 50FA468D 16510002 895151FF FF895273 7400020A ...tsR¿..OO¿..Q..F'P.19...ât.=.. 000160
75C00800 00FFFF9A 50F8468D 16500001 8850F646 8D16524F EBC033FD E0E90374 t.ÕÄ»3äŠOR..F-P¦..P..F¼P......àu 000180
0000FFFF 9AFA76FF FC76FF00 FC5E8301 FA6E8352 18751AF6 7E833274 F8463923 #9F½t2.--.u.R.n'..^•..v•.v'..... 0001A0
287548C1 F6F44E8A AA75C008 00003A65 9A50FA46 8D165050 50C03352 8E75C008 .àu/R3äPPP..F'P.e:...àu`.N¶-êHu( 0001C0
46F710C9 80037400 01F846F7 000039A9 9A5050C0 3350F846 8D160676 FF0876FF .v..v...F¼P3äPP.`9..%F%..t..è.%F 0001E0

Dump of file SATURN:[PCCOMMON.DUMP.PBIN]DBIMP.EXE;1 on 18-APR-1990 10:54:33.53
File ID (384,26,0)   End of file block 77 / Allocated 80

Virtual block number 33 (00000021), 512 (0200) bytes

2300F70C E4A1CB5D E580CED 8F88D888 C28801C9 80F24E0A 20C98003 7400080A ...t..è .N·.è..ó.Ä..Ú..[]ùÀõ.%À# 000000
0C4E883F 730CEB1E 38065E88 C03308EC 83EC8855 00C301C9 80037580 A8C933C1 é3è`.u..è.ú.U.$.$.3á.^.;.Š.s?.N. 000020
740A3C0D 01878A10 74080CED 87F6087E C40C4E88 D2335745 75020CED 87F64CE3 DL-.Ú..uEW3@.N.á~.-.Ú..t.....<.t 000040
E900098A 0674C008 5F00003A 899A5016 FA468D51 5706530A 000187C6 4942AA08 .¯θ1ó....S.WO.F'.P..:...ât.¤..Õ 000060
FE880876 C5071E57 56F80CED A780C85D E5880475 800CED87 F6C203FA 4688FCD4 Â=.F'.ó-.Ú..u..[]ù.ÌÚ.«W..év..: 000080
020CED8F 80260875 1A3C1E74 C43AAC04 0CED8F80 2606750A 3C800084 28E3C888 .ÀD(Ç..<.u.&..Ú..¯:ât.<.u.&..Ú.. 0000A0
E2EBE774 0A3C8007 7401F983 C85DE588 5E5F1F06 084628C7 8BEAE247 058805E8 Š...Gãõ.ú+F...^.[]ù.'.t..<.tÕŠã 0000C0
74C00800 003B639A 5016FA46 8D515016 F9468D53 1C75DB08 2474400C ED87F626 &-.Ú.at$.Úu.S.F'.PQ.F'.P.c;...ât 0000E0
0038E99A 5016FA46 8D515016 F9468D53 00F946C6 86EB0A80 FC5DE95E 5F1F0607 ...^ÕJ•¯.ŠÑóF'.S.F'.PQ.F'.P.Õ;. 000100
5050FFFF 88531C75 080CED87 F6263574 010C7E83 3674FFFF FA46F70C 75C00800 ..âuE%F'..t6.~..t5&-.Ú..u.S¦..PP 000120
0A3C0D01 878826F9 468AFF6F E90F750A F97E8000 003AC09A 5016FC46 8D5008F7 %ÀP.F=.P.â:...~'.u.Õo..F'&....<. 000140
8A08720C E81E3806 5E880CEC 83EC8855 0099EBC5 750AF97E 80FF5BE9 00B00274 t.¯.Õ[..-'.uéŠ..U.$.$..^.;.Š.r.¤ 000160
00003C39 9A5016F4 468D5141 415151C9 33531274 200CED87 F6F8CFE9 C0330009 ..3äÕU«-.Ú. t.S3èQQAAQ.F¶.P.9<.. 000180
89F288FA 885657FC FC4689FE 4689C033 0856C50A 468EFA5E 8C7D7480 0CED87F6 -.Ú..t).^'.F.éV.3á.F:.F••WV.'.`. 0001A0
8802EC83 1F4E7600 A83D38C0 4A989AFA 5E8E1E52 75AEF20A 8060E30C 4E88F866 f%.N.D'¯.·ÚuR..^'..Jõ8=`.vN..š.. 0001C0
1A74F838 0D740A3C AC0C4E88 0716FA88 D488E228 00808A03 73022830 02008ADC Éo..«(.s.¤..+ã.â.'...N.¯<.t.;«t. 0001E0

Dump of file SATURN:[PCCOMMON.DUMP.PBIN]DBIMP.EXE;1 on 18-APR-1990 10:54:33.53
File ID (384,26,0)   End of file block 77 / Allocated 80

Virtual block number 34 (00000022), 512 (0200) bytes

5EE1EB00 14E8E2E8 FC46FF0A B0AA001F E80375F8 380DB000 9AE90028 E8F4E2AA `ã¶Õ•.Õ..¯.;«u.Õ..`¯..F=Šãõ..ŠÃ^ 000000
065E8B1F E3CA28CF 881F061E 5153503C C437B09A FFFCB87A EB0093E9 FA5E8E5F .^'Õ..Šz:•..¯7á<PSQ....ù+õD..^. 000020
5858591F 07740808 FE5E01F4 5E881175 C0080000 15A89A50 16F4468D 51521E53 Š.RQ.F¶.P.`....âu..^¶.^:.Ùt..Y(X 000040
00208A03 E8001C8A 08750009 BA000130 0074006D 301874C0 0808C483 1FC3FA88 .'Ù..á..ât.=m.t.=..¤..u.¤..Š.¤ . 000060
C033001C BA0EEBF8 03751A3F 80085E88 0A5E8E0E 74400CED 87F6FE5E 8E26E8F9 '$&.^:-.Ú.ât..^..^..?.u.%Š.¤..3á 000080
75C9080C 4E8BFA9C E9C85DE5 880472FA 5E8E5F5E F8668BFC 462BFE46 8806E8F9 'Š..F:+F•.f%^_^•r..[]uÕ.'.N..èu 0000A0
60301774 C00B1F07 1E000030 3A9A5016 F4468D51 521E5308 56C51EEE E8C18804 ..èŠŸ.éV.S.RQ.F¶.P.:=......ât.=m 0000C0
0CED87F6 8775C008 F44688C2 E800208A C7E8001C 8ACC7500 098A0001 30007400 .t.=..¤..uãó..Šuö .Šõ.F¶.àuñ-.Ú. 0000E0
0574C308 C08C065E C4EC8855 A3E8C033 001C8AA6 E802751A 3F80260A 880A7440 ât..õ&.?.u.Š¦¤..3äŠèU.šá^..â.ùt. 000100
0875000E 823E831E 73FFF130 06468857 5602EC83 EC8855C8 5DE58801 FE4F8026 &.Õ:..[]ùU.š.š.VW.F.=þ.s..>...u. 000120
83301F4A 8E9A0676 FF087500 78E80574 0018E815 750082E8 0E82A312 740025E8 Õ%.t.È..Õ..u.Õ..t.Õx.u..v../J.=. 000140
8050501E C033FE5E 89FEE383 43065E88 0776065E 3900F088 C850E588 5E5F02C4 á._^.[]ùÈb.9^.v..^.C.Õ:.^:3á.PP. 000160
05740208 0E86A30E 841687C2 883874FF FA8308C4 833E4D4C 689A5002 80510E4F O.Õ¯.P.hLM>.á..'.t8.ó....È....@t. 000180
01478D00 02A30000 A3000A88 0C478948 480008A3 C033088E FE5E8800 08A30A8E .ÕÈ...^:.A3ÀÈ..HH.G.¦..È..È....G. 0001A0
8C0208C0 3AE80E86 1E8EDB33 064E88C0 8E088CC3 1FD88C00 06A30000 05000AA3 È.....È...Ä.ù.Ä.â.N.3Ù.....Õ:...@. 0001C0
32F8E2AA 0374C00A AC0CE30E 4E88DF88 0A76C506 7EC41E56 57EC8855 C3D98EC1 â.]ùU.ŠVV.á-.év..Õ.N.D.¯.ât.`â½2 0001E0

```
Dump of file SATURN:[PCCOMMON.DUMP.PBIN]DBIMP.EXE;1 on 18-APR-1990 10:54:33.53
File ID (384,26,0)   End of file block 77 / Allocated 80

Virtual block number 35 (00000023), 512 (0200) bytes

 F6D88898 058A2647 01EB067E C45657EC 8B55C85D E58B5F5E 1FC28CC3 88AAF3C0 ô.^.ü.ô.^_.[]iU.$WVâ-.Š.G&....Ä- 000000
 9A570876 FF5004C4 833F320E C69A5706 5050C028 08468C06 7E89F275 0808A187 .Ä..u..-..F.+âPP.W.ó.2?.â.P.v.W. 000020
 5F5EDA8C 1390881F A5A5A5A5 DA8E1E07 1EF08813 908F0008 050AC483 3E794F1A .Oy>.â....¢...b....ÖÊÊÊ.¡...Ö^_ 000040
 578B2606 478B260C 5EC4FA56 89F84689 08568806 46885657 0AEC83EC 8855C85D ]iU.$.$.WV.F..V..F%.V*â^.&.G.&.W 000060
 F876C5F6 5E8C0A4E 882E7E00 0A7E8330 07C626F8 46FFF85E C4FE5689 FC468908 ..F=.V±â^%.F¥&ó.0.-..-..N..^-év% 000080
 8EFA5E8C F87689E7 E2460488 30809003 E8078A26 FC46FF09 74003F80 26FC5EC4 â^=&.?.t..F=&..Š..¯0..Fãó.v%.^*. 0000A0
 7EC4F84E FF1F7C35 3F8026FC 5EC4287C 000A7E83 0007C626 F85EC40A 4E89F65E ^-.N.â^¥&ó...-..|(â^=&.?5|..N%â- 0000C0
 3F802606 5EC407FE 260F88FA 468CF87E 89F57439 3080264F 3005C626 9006E8F8 %Š..&ó.00&.=9t¥.-%.F*.Ô&±.â^.&.? 0000E0
 C4833F25 0E669A06 76FF5250 52400856 88064688 15E80247 FF260C5E C4097531 1u.â^.&.G.Š..F..V.@RPR.v..f.X7.â 000100
 11700CEB 1E38065E 88EC8855 0464E900 835756EC 88550000 90C850E5 885F5E08 .^_.[]ü...U.$VW*.Öd.U.$.^.;.Š.). 000120
 56880646 88EC8855 00C850E5 88C03302 E8000188 0574400C E087F60C 7C00F883 .«.|.-.Ü.@t.¡..Š.3â.[]ü.U.$.F..V 000140
 05E80E08 75001398 3E830008 CA50E588 D3180A46 28E8D3EA 03176F89 0C5E8808 ..^.¿o.ÆõñŠ+F..Æ.[]ò...>...u..Ò. 000160
 FC5689FA 468904C4 8340840F 1A9A501E 0DC68856 06EC83EC 8855C813 9806FF00 .....iU.$.$.V¡ó..P...Ça.â..F*.V= 000180
 D836FF00 DA36FF53 06500003 8800A1E9 0375003F 8026FA5E C400ADE9 0375D008 .Äu.ÖU.â^*&.?.u.ÖÄ.¡..P.S.6Ö..6Ä 0001A0
 C4834006 4D1E9AFA 76FFFC76 FF03FA46 83505299 DE10880A C48340CC 3ED49A00 ..â>ha.ó.¡...RP.F*..v•.v*..M•a.â 0001C0
 D8889800 8A261C74 00388026 FA5EC4F6 28000416 890002A3 4126492C 9A505204 .RP.,I&AÈ0...â.+-â^*&.8.t.&....Ä 0001E0

Dump of file SATURN:[PCCOMMON.DUMP.PBIN]DBIMP.EXE;1 on 18-APR-1990 10:54:33.53
File ID (384,26,0)   End of file block 77 / Allocated 80

Virtual block number 36 (00000024), 512 (0200) bytes

 8B1F7400 388026FA 5EC4D87C 03FE8346 06752038 8026FA5E 88097504 08A187F6 -.Ä..u..^*&.8-u.F.±.|Ûâ^*&.8.t.¡ 000000
 1EC49009 E80AC483 400C3ED4 9A000C36 FF000E36 FF5052C6 03C28CC3 88500003 ..P.ú.ó.óRP.6n..6É..â>.a.â.Š..â. 000020
 06EC83EC 885590C8 50E5885E 0006A340 C018013F 8026000C 1EC40007 C626000C É.&ó..â.É.&.?..âaÉø.^.[]ü.U.$.$. 000040
 260A7E03 087F8326 000DE903 7E09087F 832600C7 E9037003 087F8326 065EC456 Vâ^.&....).Öü.&....-.Ö§.&....-.& 000060
 88261075 03087F83 26177E07 C2FE8107 6CC6810A 77882600 91E9037D 09087F83 ....).Ö..&.w..ól..±ó.-.&....u.&. 000080
 C6F7FA46 890DAE87 88E30108 5F882606 5E88900E E8000705 00AC8788 E3D1085F _.1D..¯....Š...^.&._.1D..Ü..F*%6 0000A0
 C2339909 88014480 C880EEF7 0160B846 EE830A77 8826065E C4FA46FF 03750003 ¯.u..F*ó^.&.w..ŸF¡m.¥Ÿ.à.D..1.3ó 0000C0
 4689C228 FA4688F9 F70007B9 99000405 C303FA46 03C228C2 33F80300 0289C228 +ó¿..Æ%3ó+ó.F*.ü....¿..¥*.F*+ó.F 0000E0
 9018E800 018818 7C 02047F83 26227509 7F0E4739 26157503 087F8326 065E88FE ±.^.&....u.&9G...u"&....|.¡..Š.. 000100
 57EC8855 C850E588 5EC028E5 7C01047F 83260775 EE7C0E47 3926FE46 88065EC4 â^..F±&9G.|Ÿu.&....||•â^.[]iU.$W 000120
 C78EFF33 04740538 264FAEF2 F8880A46 8AD9F741 AEF2FFFF 89C0330F 88067EC4 â~..Ö3â¿...ÛA%).F..«.ÜÖ&8.t.3..ü 000140
 5842663E 199A5040 40850EC6 9A570606 7EC457EC 885500C8 5DE5885F C28CC788 .ú.ô_.[]ü.U.$Vâ-..V.ó..@@P..>f8( 000160
 57EC8855 C850E588 5F08C483 42600E66 9A50520A E804C483 0575D208 0975C008 .âu.¯0u..ó.Š.RP.f.m8.â._.[]iU.$W 000180
 04E8D008 C0330674 05382647 AEF2FD0A 468A4FD9 F741AEF2 FFFF89C0 33067EC4 â-.3â¿...ÛA%1O.F.=·ÜG&8¯.t.3â.ÄŠ. 0001A0
 80C03300 1089C08E D08C0A76 C51E5756 20EC83EC 8855C85D E58B5FFC C28CC788 .ü.ó=_.[]iU.$.$ VW.év..Ä.â¿..3â. 0001C0
 0676C5E7 E8E04308 EFD30381 E00207E1 800180C8 88F88814 74C00AAC A8F3E07E -Âµ¨¯.ât..%.à¯..Ä.0ÄŸ.ÆŸ.CÄŠÖév. 0001E0

Dump of file SATURN:[PCCOMMON.DUMP.PBIN]DBIMP.EXE;1 on 18-APR-1990 10:54:33.53
File ID (384,26,0)   End of file block 77 / Allocated 80

Virtual block number 37 (00000025), 512 (0200) bytes

 8CFF448D E674E043 22EF0303 81E00207 E1800180 C880F888 197400FF 25ACD233 30¯%..t..%.à¯..Ä.0ÄŸ.ÆŸ"CÄt].D.. 000000
 561E067E C40A76C5 56571E00 85E90375 C9080E4E 88EC8855 C850E588 5E5F1F0A Ö._^.[]iU.$.N..èu.Öç..WVév.â-..V 000020
 8E167805 D88C0773 F1034950 73000A83 C1285778 02080E4E 88428240 489A5706 .W¯Ma.B.N..ØxW+è.Ö.sPl.bs..Ä.(.. 000040
 C603C323 D818C628 C703C323 D818C728 48C18841 C08E4340 05C08C07 73F90308 Ä.*s..â.MC.âA.èH+ú.Ü#ú.ú+ó.Ü#ú.ó 000060
 832DC08C D175FFFF 83D88E43 582D088C 0775FFFE 835CE391 FCA4F3FD C1289140 a.+è=µÉ•.D\.±.u..Ä-XC.Ä...u!.â-. 000080
 C203C323 D818C228 D2F7D688 C203C323 D818C228 D2F7D788 48C188C8 E8C08E43 C.âŠà.èH.ø%0+ó.Ü#ú.ó.ø%0+ó.Ü#ú.ó 0000A0
 C08CC775 FF0808BE 438F0508 8C0775F6 0818E391 A4F3C913 A5F3E9D1 C1289140 a.+è1ÖµE.èµÉ.D..-u..Ä..C.Ä..uú.â 0000C0
 0A76C556 571E4EE3 0E4E88EC 8855C850 08568806 46881F5F 5E8EE8C0 8E43C605 .6C.âŠ/^_..F..V.]iU.$.N.DN.WVév. 0000E0
 9140C203 C3230818 C22802F7 0688C203 C3230818 C22802F7 D78848C1 88067EC4 â-..èH.ø%0+ó.Ü#ú.ó.ø%0+ó.Ü#ú.óa. 000100
 2405C08C C775FF08 D88E4301 05088C07 75F60818 E391A4F3 C913A5F3 E9D1C128 +è1ÖµE.èµÉ.D..-u..Ä.1C.Ä..uú.â.$ 000120
 DAF7D788 067EC457 38E30C4E 88EC8855 C8500856 88064688 1F5F5E8E E8C08E44 D.âŠ/^_..F..V.]iU.$.N.D8Vâ-..øXÖ 000140
 8C10E301 87AAF3C9 13A8F3E9 D1E08A0A 4688D128 0187D103 D3230818 D1280C74 t.+1.Ü#ú.1.1+1.F..Ä1Öµ¨.èµ^.1D.. 000160
 56880646 880E4E88 C8500856 88064688 5FAAF3C9 13A8F3E9 D1C38E44 2FC381C3 û.û/D.û1Öµ¨.èµ^_.F..V.]û.N..F..V 000180
 F700D283 D8F7AA20 800A7902 080E750A F9831374 C00A93FC 071E570A 7EC51E08 ..é-.W..•..ât..T.u..øy.¯-¨%Ü.0.% 0001A0
 75C308C2 88AA2704 0276393C 30040387 92F1F793 F1F70274 C0080233 92F7880A Ö.%.30.ât.¥b.¥b..Æ.0<9v..*¨.ó.úu 0001C0
 83EC8855 00C850E5 885E5F1F 58DA8CF2 72C73801 448DFF44 880586AC 4F0588E2 â..O¨...D..D.;úr·.ÖX._^.[]ü.U.$. 0001E0
```

```
Dump of file SATURN:[PCCOMMON.DUMP.PBIN]DBIMP.EXE;1 on 18-APR-1990 10:54:33.53
File ID (384,26,0)   End of file block 77 / Allocated 80

Virtual block number 38 (00000026), 512 (0200) bytes

 89085688 0646880C 56890A46 890D1D16 880018A1 00750C46 080A4688 56570EEC &.WV.F..F.u.À.......F..V..F..V.. 000000
 04C48345 6C0EC69A 37FF2602 77FF2604 F84683F8 5EC419EB 00028EFA 5689F846 F%.V°/..Š.á^%.F%.&.w.&.7.6.lE.á. 000020
 5EC41A72 7FFFFE81 F6768905 767FFFFE 81067402 47082607 8826F85E C4F00340 a.bá^Y&..&.G.t..±..vf.v-.±..r.Á^ 000040
 C48345C1 3E199A56 2FE8000A 0CE906C7 00070CE2 06C70789 26024789 26C02812 .+âå.G.&..ú.à...ú.Õ...Š/V..>éE.Á 000060
 0C0CE206 C7078926 02478926 C028125E C41F7500 08025789 26078926 0E5EC402 .á^.&..&.W..Àu.á^.+â&.G.&..ú.ã.. 000080
 901AE800 028EFA56 89F84689 0C56880A 46889002 85E9FFFF 8800080C E906C700 .ú.Õ...|..Õç...F..V..F%.V°/..Š.. 0000A0
 26078826 F85EC4F0 034004C4 8346150E C69A37FF 260277FF 2604F846 83F85EC4 á^%.F%.&.w.&.7.6..F.á.a.Þá^Y&..& 0000C0
 754F0375 000CECB0 80F8880F 74C008FE 46890CEB A1D5767F FFFE8106 74024708 .G.t..±..v(ÅŠ..F±.ât..%.§Š..u.Ou 0000E0
 FF1876FF FE760303 74000CE8 3E80F003 000E05FE 46881274 00FE7E83 FE7E89F6 -.-±.-±.t..F±....Þ.>ò..t..v±.v.. 000100
 260E5EC4 18767FFE 30057502 080213C6 03022BF6 460304C4 8346390E C69A1676 v..6.9F.á..F-+0.6.0.0u.=±.v.á^.& 000120
 125EC402 C4834668 3E199A56 FF0DE90E 5EC404C4 8346483E 049A37FF 260277FF .w.&.7..>HF.á.á^.Õ..V..>hF.á.á^. 000140
 0E5EC404 C48346AC 3E049A37 FF260277 FF260E5E C4197500 08025789 26078926 &..&.W..Àu.á^.&.w.&.7..>¯F.á.á^. 000160
 FA5689F8 46890856 88064688 F45689F2 46890257 88260788 260E5EC4 90FF0FE9 Õ...á^.&..&.W..F·.V¶.F..V..F%.V° 000180
 C48346C2 0E669AF2 76FFF476 FF37FF26 0277FF26 6A740247 08260788 26F85EC4 á^Y&..&.G.tj&.w.&.7.v¶.v·.f.óF.á 0001A0
 5EC4903C EBF24601 4004C483 46E10EC6 9A37FF26 0277FF26 04F84683 F85EC408 .á^%.F%.&.w.&.7.6.ÅF.á.a.F Š<.Á^ 0001C0
 77FF2604 F84683F8 5EC408C4 8346F70E 669AF276 FFF476FF 37FF2602 77FF26F8 Y&.w.&.7.v¶.v·.f.%F.á.á^%.F%.&.w 0001E0

Dump of file SATURN:[PCCOMMON.DUMP.PBIN]DBIMP.EXE;1 on 18-APR-1990 10:54:33.53
File ID (384,26,0)   End of file block 77 / Allocated 80

Virtual block number 39 (00000027), 512 (0200) bytes

 26078826 F85EC4F2 46FF2007 C626F25E C4F24601 04C48347 6F0EC69A 37FF2602 .&.7.6.oG.á..F·á^·&6. .F·á^Y&..& 000000
 5689F246 8902578B 26078826 125EC407 8826FF47 8826C02A F25EC489 7502470B .G.u¿á^·*â&.G.&..á^.&..&.W..F·.V 000020
 C43F7500 FE7E8345 7502470B 26078826 F85EC4FA 5689F846 890C568B 0A4688F4 ¶.F..V..F%.V°á^Y&..&.G.uE.-±.u?á 000040
 850E669A F276FFF4 76FF37FF 260277FF 26F85EC4 9033EB00 07C626F2 46FFF25E ^·.F·&6..Š3.á^Y&.w.&.7.v¶.v·.f.. 000060
 5EC4F246 014004C4 8347B10E C69A37FF 260277FF 2604F846 83F85EC4 08C48347 G.á.á^%.F%.&.w.&.7.6.ÝG.á.a.F·á^ 000080
 669AF276 FFF476FF 501E09EE 8800A6E9 037500FE 7E83C275 02470826 078826F8 Y&..&.G.uõ.-±.u.Õl.¡Ÿ..P.v¶.v·.f 0000A0
 C4F62837 74000CE8 3E80F246 0104C483 43350EC6 9A501E09 EE8808C4 83478E0E ./G.á.¡Ÿ..P.6.5C.á..F·.>ò..t7+-á 0000C0
 05882641 040F240C ED848A47 05882641 040F24F8 D3048198 0CED848A 1EE8F27E -·Š...Ú..Ÿ.R%$..A&..G..Ú.$..A&.. 0000E0
 078826FE 468AF246 FFF25EC4 38EBF446 8CF27E89 0875C008 FE4EFFFE 46884647 GF.F±.N±.âuÀ.-·.F¶Š;á^·.F·.F±&.. 000100
 8AEB7400 0CED8C80 0E74C008 49C18846 47058826 FF8007E8 F27E88FE 4E88F628 +-.N±.-·Š.¯.&..GF.él.ât..ŸÚ..tŠ. 000120
 0007C626 F25EC400 07C626F2 46FFF25E 88FE4E89 F4468CF2 7E8990E7 E80CED84 .Ú.5Ó..-·.F¶.N±.^·.F·&6..á^·&6.. 000140
 0806C483 45282EA4 9A0876FF 0A76FF50 C03304EC 83EC8855 CB50E588 5F5EC028 +á^_.[]ÚU.$.$.3âP.v..v..É.+E.á.. 000160
 168A0874 00013042 0E740003 3D137400 02304219 7400003D D2330646 886F75C0 âuo¯F.30=..t.B=..t.=..t.B=..t.o. 000180
 0A76FF50 16FC468D 1076FF12 76FF0C76 FF0E76FF 52505050 C033EF80 E9C03300 .3âÕ¯ÿ3âPPPR.v..v..v..v..F•.P.v. 0001A0
 74C00804 6FE90375 02067E83 00000023 06C70000 FFFF9A00 01002306 C70876FF .v.ú.#........ú.#....-..u.Õo..ât 0001C0
 D88E1CB3 881E56EC 8855C850 E588FE46 8AE08A05 7500067E 83FC4688 EF81E903 .Õ.ÿ.F•.-..u..Â.F±.[]ÚU.$V.¡°..Å 0001E0

Dump of file SATURN:[PCCOMMON.DUMP.PBIN]DBIMP.EXE;1 on 18-APR-1990 10:54:33.53
File ID (384,26,0)   End of file block 77 / Allocated 80

Virtual block number 40 (00000028), 512 (0200) bytes

 88010E1E 06C60000 FFFF9A50 0E1F881E 500E2888 1E50000A 88187500 0E1E3E80 .>...u.|..P.|*.P.|..P.... Á..... 000000
 88EC8855 CB5DE588 5E1F0001 88F377D4 3AF772D0 3A0874C0 85ADFC0E 1FBE0656 V./..•Ú.ât.:Ar%:âw¤|...^.[]ÚU.$. 000020
 66F70646 88C888E3 F70008CA 5DE588E3 F7064688 08750A5E 88D8080C 5E880846 F..^..Ä.^.u..F.%D.[]ò..%D.à.F.%f 000040
 880A4E88 1575C008 0C468856 53EC8855 0008CA5D E588D103 E3F70646 88C8030C ..à.F.%D.1.[]ò..U.$SV.F..âu..N.. 000060
 D8D1E9D1 06468808 56880A5E 88C88838 E8D388F1 F7064688 D888F1F7 D2330846 F.30%Þ.Ä.F.%Þ.ŘŠ8.à.^..V..F.1ô1Ú 000080
 06720777 0856380C 720103E6 F70A4688 910C66F7 F088F3F7 F475C908 D8D1EAD1 1ô1Ä.èu¶%¤.Þ%f...F.%l.1r.;V.w.r. 0000A0
 3ABF0676 8DC08ED8 8CFC5756 EC885500 08CA5DE5 88585E96 D2334E01 7606463B ;F.v.N30.^[.[]ò..U.$VW•.Ä.à.v.¢: 0000C0
 0E308FAA 91A4F391 98ACC888 0E428F5D 03CEE855 0E3ABEA5 36A536A5 36A5360E .6É6É6É6É/:.UÒö.]¢B..à¯..¤É.´¢0. 0000E0
 5508C483 CB5DE588 5E5FC788 DA8C085D 8C0E4206 45C7044D 89025589 1089FF32 2....U..M.úE.B..}..Õ.ú_^.[]ù.á.U 000100
 880E568F 88E3D10E 741E8848 6A149E9A 0E74A300 812D50E4 2ADA8E48 EC8AEC88 .âo$N.Õ°ãP·..Ét....|H.¯t.1D..V.E 000120
 9A4A4115 7E9A5000 65050E74 A14A3815 7E9A5000 FD884A23 4D229A04 4F890E6E n..O..™H#J¡•.P.-.BJÀt..e.P.-.AJ. 000140
 830A47F6 26FA5EC4 1CE8F628 FC5E8CFA 46890A34 885606EC 83EC8855 4A4D142C ,.MJU.$.$.V|4..F°.^•+-Š.á^°&-G.. 000160
 D876FA46 39089E16 88089CA1 0CFA4683 46017440 04C4834A 521E2C9A 53060E74 t..S.,.RJ.á.at.F.F°.À......9F°vÄ 000180
 88EC8855 F9E8C033 CB515208 F7C42807 73C4380D 8EA15A59 90C850E5 885EC688 .á^.[]ù.YZÀ..;âs.+áXÄROù3âŠ°U.$. 0001A0
 0005B807 1E297500 3F830E78 885756EC 8855C85D E58801FE 4F800474 D808065E ^..Út..O±..[]ÚU.$VVÉx..?.u)..|.. 0001C0
 FFFEFE44 C704C683 000104C7 960E7AA3 0E78A3FE 244024E8 99C03305 750173E8 Òs.u.3Â.$$a$±Éx.É±..û....6.ÚD±±. 0001E0
```

Dump of file SATURN:[PCCOMMON.DUMP.PBIN]DBIMP.EXE;1 on 18-APR-1990 10:54:33.53
File ID (384,26,0)   End of file block 77 / Allocated 80

Virtual block number 41 (00000029), 512 (0200) bytes

```
EEF983FE E180FA74 4100CEE9 CB50E588 5E5F0009 E8C08ED8 8C064E88 0E7E3689 .6~..N..Ä.âÒ.._^.{}üÕö.At°.Ät.°Ÿ 000000
000205C2 03347401 A8ADF003 D0881573 C13B4842 7401A8FE 8BADFC02 7788F273 s .w.•U.t .tBH;ès..Å.bU .t4.ô... 000020
DA8CC688 FE4CFEF9 0305E805 8948C128 FE4C89F9 030C74FE 88E6E8FE 4489F788 .%.D‡Š|.‡t..°.L‡•êH..Š..°‡L‡.6.Ö 000040
A8ADF003 FE882574 FFFE3D02 0E8A06C6 26C3027F 890E861E 8C260574 D138D18C .1;1t.&.......üÃ6....=‡.t%.‡.bU 000060
88E6E8FE 4489F788 000205C2 03E27401 A8ADF003 D0888073 C13B48FE 88F27401 .t .‡H;ès§.Å.bU .tã.ô....%.D‡Š|. 000080
37880E82 1E8E2605 74C738D7 8CD88C11 740E8A0E FE2614E8 D88E0474 C0080847 G..Åt..ÄŠ.&‡...t..Ä.■;üt.&.....7 0000A0
0574001C E8FE4DFE 0074005E E8984040 01240074 C638006A E8C03306 77888CE8 $¥.w.3âÒj.;ót.$.@@.Ò^.t.‡H‡Ò..t. 0000C0
01A8FE45 8851C399 C0330247 8907880E 86A32604 74C138D1 8CD88C99 E84E4E96 .NN$..Ä.1;èt.&Ê.....G.3â.üQ.E‡ . 0000E0
F70D72C2 031572C6 03C188F5 75EAD104 760E8816 38267FFF 8A414149 C8280374 t.+àlAAo..&;...v.lõu%.è.ór..ór.% 000100
F088FE88 57187400 10E85152 C359C033 E575EAD1 D2F70875 000CE8C6 28C22302 ØNó+óÒ..u.%Ølõul3âYüROÒ..t.W.‡.b 000120
01885052 521ED233 5053C35A 5958FE55 894AD728 06880677 89FFFEFE 44C7F203 . üD‡‡..w..■+■J.U‡XYZüSP3Ø.RRP|. 000140
7E830657 56EC8855 00C30208 027458 5A 1FFFFA83 08C4834A 774C689A 1F065000 .P...hLwJ.â..°..Z(t..Øü.U.$VW..- 000160
F73B1174 4809EC36 884CE827 720057E8 07754806 46880856 8805ECBF 3875000A ..uØ¢$..V..F.Hu.ÖW.r'ŠL.6$.Ht.;% 000180
99FFFF88 06750208 047309EC FE8104C6 8334735E 003EE856 0E468902 44880074 t..D..F.VÒ>.^s4.6..‡$.s..Øu.|... 0001A0
8809EC36 89025C89 1489E675 C085F958 0000FFFF 9A50C033 501652C4 885021E8 Š!P.âR.P3âP.....(°.âuÎ...\..6$.. 0001C0
2CE8F9F2 7509ECFE 8104C683 0C74024C 39F7880E 4E88CB5D E5885E5F 07C03303 #3â._^.{}ü.N..%9L.t..6..‡$.u °$, 0001E0
```

Dump of file SATURN:[PCCOMMON.DUMP.PBIN]DBIMP.EXE;1 on 18-APR-1990 10:54:33.53
File ID (384,26,0)   End of file block 77 / Allocated 80

Virtual block number 42 (0000002A), 512 (0200) bytes

```
380E75C0 85000015 CE9A5153 137305E6 1E390675 F738C18E D3882672 1C03DA88 .Ö..r&.K,è;%u.9.l.s.SQ.ö....âuR; 000000
51000289 DC885301 578DE42A 078A0002 59E900C3 D1880487 9205E616 890475F7 %u...|.....lü.ÕY....°Ö.W.S.É¿..Q 000020
03740008 3000058A 0874000A 300007BA 2174C008 C8580000 582A9A53 1650521E .RP.S.°[..[ü.âtlo..•..t.o..*..t. 000040
FEFFFFFF FFFFFFFC 66405C14 439A50FF FF884D57 157E9A4C 57149E9A 5200068A o..R...WL.-.WM|..P.C.\Mf•......‡ 000060
80087502 08C30720 8340008B C0333001 04C70E98 8E3FF8CC CCCCCCCC CCCCC03F ?ëäääääää«?ƒ..ú..03â.Âa* .ü.Øu.. 000080
8C06C3C0 33070001 8A0E858E 03E80EAF 8E08E80E A98E0A74 FF08F981 08740FE1 Å.t..°..t./ .Š./£.Š./ç.o...3âü.. 0000A0
88044408 02440804 8820837F 07648006 4C885EA5 F3000489 570E8CBF FCC08ED8 Ä.â•¢..W¿..■£^.L..d..° ...D..D.. 0000C0
A0509890 0EBD3ED9 9B53A574 D1F77FF0 C1F7D1F7 20830279 C908A574 06440800 Å.D.t£.èy.°-%l%êb.%ltES.l>§...P. 0000E0
88ADF88A AC0E93BE FF339890 3CD898C0 D9980400 980E8F2E D998580E 8FA20E8D §.Â¢.X.).¢..l..)ß.Ü<..3./..¯,%Ü. 000100
5713430F 8112F4E9 81FA13C8 03E7F69A 800713C8 03E4F640 8091E2F7 4D108AC8 âo.M%ã.¯H-ô.à.■¯.-Ö.à.°.Ö¶..ÖC.W 000120
74410E8C 06F69890 0E883EDD 98D9089B 2FD82E98 5F4D6788 0728E80E 8C8EDFF7 %Ö/..Ö+.£gM ..Ü/.Ä).l>£...-.¥.At 000140
AD93AD92 AD95AD97 AD98900E 8D2ED998 3CD89857 C9DE982F D82E9840 71884708 .G£qM..Ü/.ßẽW.Ü<.).§...Ü.Ü.Ü.Ü.Ü 000160
13E91303 9AD681F4 E2DC000E D1DD01DA D1E8D10C E3C033F7 8809F73F FEE98191 ..Ö‡?%).%3âD.1Š1Ö111ßÃÉã¶ ■...Ö. 000180
D1E4D000 D0030102 D1050106 D1E4D050 56555253 51C03200 10890E99 8FD91301 !.le..¿..2âOSRUVPÂÖl■111Ø1ßÂÂÂÖ1 0001A0
D5D1D601 E4000014 091359D1 1359E913 59F11359 E5125900 D0030102 D1050106 ■111Ø1ßÂÂY.lY.þY.ÕY.lY.)..ÂÖl■11 0001C0
5A0001B8 0C880E98 8E12C183 FCAEF3F0 3080494F 80E2AA30 04590000 D3010201 1Ø1ßÂÂY.0´â§Ol¯0»µÜ•.ê./....|..Z 0001E0
```

Dump of file SATURN:[PCCOMMON.DUMP.PBIN]DBIMP.EXE;1 on 18-APR-1990 10:54:33.53
File ID (384,26,0)   End of file block 77 / Allocated 80

Virtual block number 43 (0000002B), 512 (0200) bytes

```
8005730A 7630000F 5806C600 28E8010F 5806C60E 56880833 5756EC88 55C30758 t.ǖU.$VV3U.V.6.X..Ò(.6.X..;v.s.. 000000
D88CFCC8 50E5885E 5F0006E8 0E5E8802 335756EC 8855C85D E5885E5F 0D8940C9 èâ.._^.{}üǖ.$VV3Ø.^.Ö.._^.{}ü•.Ä 000020
0EE08E0A 4E88088E A4F30EE0 8F0676C5 27E8F633 40810676 64F9830A 4E88C08E .â.N._°dv.Ÿâ3-Š'év.¢Â.µÉ.Ä.N./Â. 000040
89027589 0D890ECE 8F0A7603 06762850 0070E855 0ED68F06 4E010C46 88067689 .v..F..N.¢e.UÖp.]+v..v.¢Ö....U.. 000060
74093CF8 74203CAC D83399C0 330676C5 1E5657EC 8855C30A 8CC78806 50890445 E..)..ü.ÖÜU.$UV.év.3â.3Ü¯< t«<.t 000080
D1D2D1E3 D1FA88C8 8802D1E3 D11B7230 2C1F7739 3CAC0175 203C0474 203C50F7 %P<-t.<«u.¯<9w..0r.1D1Ø.ü.°1D1Ø1 0000A0
CB5D5F5E 1FDAF700 D2830BF7 07759320 3C580CE8 00028308 03D71309 03D201E3 D1Ø.l.ø.Ä.Ø.ŠÉX<-.u.%Ä.Ø.%Ö.^_]ü 0000C0
89CE030F 4836890F 463E89FC 0F792ED9 98580F79 A20F77A0 5098900F 773E0998 .l>w...P.w.Äy.X.l.y.■.>F..6H..ö. 0000E0
4836880F 440E8800 94E8000A 0F5006C7 48750808 C9330F56 16890F52 A30F4A0E .J.£R...f.3è.ÜuKü.P...Ö......6H 000100
5AA130C9 80037418 42C1F706 75FFFF0F 5206F70F 440E0A00 C2E8000F 7406C60F .6.t..ÖÖ...D.%.R...u.%éB.t...ñÄZ 000120
E80F501E 89C39890 0F772E09 9802CD80 0375000F 4C3E830F 742E8A0F 5C1E880F ...\...t..>L..u..ê..).w...Ö.... 000140
C98026E8 30C98058 85E80F44 0E881000 980F5A06 D8980F46 3E880F44 0E890274 t...D...>F..Ü.Z..f...D.ŠçX.èÖŠß.è 000160
7480C7F6 05E80A75 80C7F610 C9801274 0700D388 0008830F F70BF717 759E5830 0X.u.%ÜXÖ.Ü..ß.■t...è.-ü.u.Š.-ü.t 000180
02A6E8F8 88807202 ADE80988 C933509F 02A2E8C3 0F5C1E89 0F5A3E89 20C98003 ..è .>Z...\.üÖÂ..P3è.1ÖÜ.r§.%Öl. 0001A0
03050003 D1E7D100 D580A13 FD030500 D301E7D1 D500D301 E7D1EF88 D388BF72 r¢.ß.Ÿ1Ö1ßÂ11Ö1ßÂl.».Ö.f.1Ö1ßÂl. 0001C0
E880CD80 03750258 E8FFEE0F 4E06C70F 4C0E89C9 3393EB04 7400D580 000383F8 %.ß..f.tâŠ.3è..t.ü.N.Ÿ.ÖX.u..ê.Ö 0001E0
```

```
Dump of file SATURN:[PCCOMMON.DUMP.PBIN]DBIMP.EXE;1 on 18-APR-1990 10:54:33.53
File ID (384,26,0)   End of file block 77 / Allocated 80

Virtual block number 44 (0000002C), 512 (0200) bytes

 3C04742B 3C5F7400 0F583E80 3374453C 4074443C 4E6F7402 C2E8D833 C9320116 ..2è3Uòô.toN<Dt@<Et3.>X..t_<+t.< 000000
 3C057739 3C08742D 3C0C742B 3C4E4E02 9AE84616 74000F56 3E8024E8 4E57752D -uWN$$.>V..t.FÒ..NN<+t.<-t.<9w.< 000020
 01F2E846 00000F52 06C70EC9 80FFD3E8 06E80402 C981FFDC E833E858 C3017230 0r.úX$3ÒÉ..è..Š.Òß..è.Ú.R...FÒ . 000040
 800D7401 C5F6D8F7 02759E58 40C98003 75000F56 3E800A75 02C5F601 D0E8509F .PÒÅ.-é.u..>V..u..èaX.u.%Ú-é.t.. 000060
 810F543E 2B047510 C5F60F52 3E030F4E 3E03F888 0F521E89 0F4E1E89 D8337FE5 Î.3U..N...R...«.>N..>R.-é.u.+>T.. 000080
 80037607 0F4C3E83 0F463E88 038FE8FE A6BF037D FEA6FF81 013ABF03 7E013AFF .:.-.«:...Î±).«Î±Ò«..>F..>L..v.. 0000A0
 DB9B2275 410F7606 F69B900F 753ED09B D9DE9B0F 6A2ED89B E1D99BC0 D99B08C9 è..Îâ.ÎÅ.Ù.j..Ñ).Î>u...-.v.Au".Ù 0000C0
 C359076D 0880E580 51010F74 0E800574 100F7506 F69B900F 753ED09B 1DD09BE2 ã.Î..Î>u...-.u..t...t..ι Î..m.Yû 0000E0
 D78B0F8B EF88FF33 C301C980 5FAB7FF0 0DE58AAB ABABC033 57D80D9B 0F463E8B .>F..ÎÅW3ã .Î.b. .è.ù. .ÿ.Ô.● 000100
 D5830003 83000358 0044E850 0168E8F1 E80F4E0E FF0975C0 0A397201 7AE8C78B .úÒz.r9.ðu...N.ŠþÒk.PÒD.X.A.Æ..Í 000120
 F6E80034 E8480B78 FF08403E 88FEE580 FB730151 E8E67212 F980C1FE 00D78300 ..●.±è.'.rÎÒQ.s«.Î±|>@..x.HÒ4.Š- 000140
 8B535557 C30F602E DB985EA8 92AB96AB 95AB93AB 920F608F F78856C0 3301C080 .ë.3âV.%«'.. . . . .^.Ù.'.úWUS. 000160
 E840C980 58C307D1 05010301 E201F813 58E81358 D8135800 03000BE8 000EE8C2 ôÒ..Ò...ÅX.ÅX.ÒX.%ÎãÎÆÎÎÎ●ùX.è@Š 000180
 C7F610C9 801274D7 08038800 D8830FF7 D8F780CD 801A759E 58ED3230 C980582C ,X.è02ÙX.u..ë.%Ù¼Ò.Ù..Æ.●t..è.-ú 0001A0
 E8D98BC9 33509F00 79E8C30F 5C1E890F 5A3E8920 C9800374 80C7F605 E80A7580 .u.Š.-ú.t..è .>Z...\.úÒy..P3è.1Ò 0001C0
 A1750208 0F5026F7 C388EA88 F8880F50 26F7C788 508A7200 7DE8F888 87720084 ..rñ.%Ò).rnP.ú%&P..%.õ.ú%&P..●uÀ 0001E0

Dump of file SATURN:[PCCOMMON.DUMP.PBIN]DBIMP.EXE;1 on 18-APR-1990 10:54:33.53
File ID (384,26,0)   End of file block 77 / Allocated 80

Virtual block number 45 (0000002D), 512 (0200) bytes

 7506F69B 900F753E D0981000 9BE2DB9B 92E80873 000383F8 03589872 D0030888 .Å.Îr.X.%.Æ.sÅŠ..Ùã.Î..Î>u...-.u 000000
 F2770CCC F8811772 002EE83F FF8BC359 07600880 E5805101 0F740E80 0574100F ..t...t..Q.Î..m.YúÉ.?Ò..r..«ñ.w 000020
 4E03742D 3C05742B 3C097400 76E8C3E4 E8E378D8 03E3D1E3 D1C303E3 D102CD80 .ë.1D.úÎDÎD.ÅxDŠÒúÒv.t.<+t.<-t.N 000040
 32E47D0F 50063A0A 04EC7211 2C067E09 3CF47230 2CF97400 62E8C3F9 4EC3FF0C ..ÚN'úÒb.t',Or¶<.-.,.rš..:.P.)Ò2 000060
 F610CD80 EF7510C5 F6EFE880 0F440E80 F37528C5 F6C3F901 CD80C033 4E46C3E4 ÒúFN3å.ë.'ú-é(u●..D..Šÿ-é.uÿ.ë.- 000080
 0F4E06FF 067510C5 F60884CE 77093CD2 72302CEA 742E3CD0 740024E8 DE7501C5 é.uñÒ$.tÎ<.tõ,Or●<.wöÇ.-é.u...N. 0000A0
 74093CEE 74203C10 74000F57 3E80AC23 730F4A36 38C3E432 0F4C06FF EC0A2084 Ç .$..L.2ðù;6J.s#^.>W..t.< tŸ<.t 0000C0
 02A00000 00000000 00C3C032 C35F2402 777A3C06 72613CE2 74003CE6 740A3CEA õ<.tÎ<.tã<ar.<zw.$ ú2Àú........ 0000E0
 00400C9C 40000000 00000040 08FA0000 00000000 004005C8 00000000 00000040 @.......à.@.......T.@.......@..@. 000100
 00000040 16989680 00000000 004012F4 24000000 00000040 0FC35000 00000000 .....Pù.@......$¶.@.........@... 000120
 A82B7085 9E404ED3 C218CECC EDA10040 348E18C9 8F040000 0040198E 8C200000 .. Ÿ/.@....éè..4@.ÅÙëö.ôÆN@.çp+` 000140
 818F1281 ED44A040 9EAF298D 050E4395 D74083E8 194F8E1A E525F040 6990C5AD Ùé.Î@«XÎ..O.Š.@æ.C...)É.@.DÙ.... 000160
 7CE070F7 80392755 6841A893 8A47C980 E98CE040 D3C2781F 49FFCFA6 05408982 .¿@ÎÎÙ.Î.xôÆ@Å.Õ.èGo.`AkU'9.%pÅ| 000180
 0A3FF8CC CCCCCCCC CCCCCD44 2681842F 29F2CCE3 764351AA 7EE8F890 F9DE8E42 B.Ñ'.«Š~`OCvÒä )/..&Dëäääääää«7. 0001A0
 4784233F F1D18717 58E21965 2C3FF583 126E978D 4FDF383F F8A3D70A 3D70A3D7 ●Èp=.●É%?;ÒO..n..%?,e.ÃX.ñ'b?#.G 0001C0
 118461CE FD3FE7D6 8F94D5E5 7A428C3F E88637BD 05AF6C69 B63FEEA7 C5AC471B .G¯éÎŸ?ÑÎÎÉ.§7.Š?ŸBzÎÎ.«●Ò: 5a.. 0001E0

Dump of file SATURN:[PCCOMMON.DUMP.PBIN]DBIMP.EXE;1 on 18-APR-1990 10:54:33.53
File ID (384,26,0)   End of file block 77 / Allocated 80

Virtual block number 46 (0000002E), 512 (0200) bytes

 B11EAD45 39948A3F AF9A8E14 C044753B 533FC9E6 95948EC4 4DE1583F E4A8CC77 wä¨Ò?(ÅMé/..Îè?S;uDë./.É?n.9EÙ.Ÿ 000000
 44F81585 928E068D 2F3F5F88 127C53B1 7EC1593F 7A886131 388ABCE2 C63F94CF Ù.?6ðŸo;Îa.z?Yè-ŸS|.É_?/../...«D 000020
 3A308191 FF837754 23CC063E 55000046 7C648CE4 A13F2AA8 7FEA27A5 39E9A53F ?ÉÒ9É'ð.`*?ÅðŸd|FÅÎU>¯ñ#Îw....=: 000040
 57DFF754 558B0579 FF085397 8B3807FD 00889747 8238D13C ACC03143 25637A19 .zcXC1ð¯<1B.G.|.»●;É.S..y.ÉUÎ%ÒW 000060
 E0D0E0D0 E08AE0D0 53E97400 072557EF D1EFD1EF D1C78827 74FF0800 46C3815F _.úF...t'.úÎÿÎÿÎÿWX..tÒSÅÅ.ÅÅÅÅÅ 000080
 17A1260F 9C068E56 18EC83EC 885500C3 D0E858C9 DE982FD8 2E980803 E432C402 ¯á2ð.Å..Ù/.Ñè(ŠÅÙ.U.&.&.V....&Å. 0000A0
 17A12613 8A168913 88A31386 16891384 A399C028 FE5689FC 46890019 168B2600 .&.....F●.V±+ð.É......É......&Å. 0000C0
 42BA9A37 FF260277 FF26FC5E C4501E0D 768851E8 FE5689FC 46890019 168B2600 .&.....F●.V±ŠÒ|v..Pá^●&.w.&.7.oB 0000E0
 3CE80E37 FF260277 FF26FC5E C450F676 FF177400 08F65689 F4468908 C48356A4 ÉV.á..F¶.V-.Åt..v-Pá^●&.w.&.7.Ò< 000100
 C404FC46 833575C0 0804C483 0329E80E 37FF2602 77FF26FC 5EC446E8 08C48301 ..á.ŠFá^●&.w.&.7.Ò)..á..Åu5.F●.á 000120
 FF26FC5E C4937522 3C802602 478E2607 FF263788 262B7402 47082607 8826FC5E ^●&..&.G.t+&.7&..&.G.&.<"u.á^●&. 000140
 16881388 A10000E8 46C700E2 E9FFFF88 C874C008 04C48302 F4E80E37 FF260277 w.&.7.Ò¶..á..ÅtÙ|..Òã.úFÒ..Å.... 000160
 4688E846 FFEC5689 EA468906 57882604 47882 6EA 5EC414E8 EC5689EA 4689138A ...Fõ.V$Š.á^ô&.G.&.W..Fõ.V&.FÒ.F 000180
 08FA5689 F8468902 C483573F 3E199A50 000405E0 D1E0D1E8 4688E475 EC4608EA õ.F$uõ.FÒÎÅÎÅ...P..>?W.á..F%.V'. 0001A0
 88A10015 A326E846 880F9E06 8ED01916 89260D17 A326FA56 880F9C06 8EAD740D ÅtÙ.....V'&É..&.........FÒ&É..Å. 0001C0
 26EA5EC4 1A74C20B EC5689EA 46890657 88260447 8826EA5E C408EB13 8A168813 .....Š.á^ô&.G.&.W..Fõ.V&.òt.á^ô& 0001E0
```

```
Dump of file SATURN:[PCCOMMON.DUMP.PBIN]DBIMP.EXE;1 on 18-APR-1990 10:54:33.53
File ID (384,26,0)   End of file block 77 / Allocated 80

Virtual block number 47 (0000002F), 512 (0200) bytes

 26024789 26C02BF8 5EC4D1EB 02578926 07892604 F84683F8 5EC40257 88260788 ..&.W.á^%.F%.&..&.W.$1á^½+A&.G.& 000000
 A3065788 26044788 2613881E C42374C2 08EC5689 EA468913 8A168813 88A10789 ..Å.......Fõ.V$.õt#Á...&.G.&.W.È 000020
 EC8855C8 50E5885E C028CCE8 04C48357 A43E049A EA76FFEC 76FF138A 16891388 .......v$.võ..>ÈW.á.Šä+á^.|}ùU.$ 000040
 26FC5EC4 22E8FE56 89FC4689 F85689F6 46890856 88064688 0000E846 C71AEC83 .$.GFÒ...F..V..F-.V½.F=.V$Š"á^+& 000060
 4688FC46 FFF85689 F64689C2 8CC3880A 753A3C04 742F3C08 745C3CE6 4688078A ...F|<\t.</t.<:u..û.ô.F-.V½.F=.F 000080
 FC46FFBF 74C00802 C483580E 48E69A50 98078A26 FC5EC419 73FC4639 0C56880A ..V.9F=s.á^=&...P.|H.X.á..âtê.F= 0000A0
 C3384008 56880646 88207S3A 3F80260A 5EC40C56 890A4689 F8568BF6 468809E8 Š1.F-.V½.F..V.á^.&.7:u .F..V.ə;ù 0000C0
 E6468807 8A260A5E C40162E9 04C48301 6CE80E06 76FF0876 FF10740C 56380575 u.;V.t..v..v..ÒI..á.Òb.á^.&...F| 0000E0
 58380C52 9A0676FF 0876FFFA 46894006 4628C388 09753A3C 04742F3C 08745C3C <\t.</t.<:u..û+F.ə.F*.v..v..R.8X 000100
 FF501E0D 79B8F456 89F24689 13861688 1384A18A 74D008EC 5689EA46 8904C483 .á..Fõ.V$.ÅtnÅ.......F .V¶iy..P. 000120
 9AEA76FF EC76FF50 1E007888 008CE903 75C00808 C4835852 0E9C9AEA 76FFEC76 v$.võ...RX.á..âu.ÕV.|(..P.v$.võ. 000140
 3C31743A 3C35745C 3CE64688 078A260A 5EC400A2 E90375C0 0808C483 587C0E9C ..|X.á..âu.ÕÅ.á^.&...F|<\t5<:t1< 000160
 0E500876 FF0F74D0 08085689 06468904 C48358A9 425A9AEA 76FFEC76 FF20742F /t-.v$.võ.2B X.á..F..V..Åt..v.P. 000180
 460304C4 8358860E C69AEA76 FFEC76FF 00A9E9FF FF886374 C00804C4 83008AE8 Òn..á..âtc|..Õ ..v$.võ.ó.ÑX.á..F 0001A0
 76FFFA76 FFEA76FF EC76FFD5 74D008F0 5689EE46 8902C483 58083E19 9A5040FA *əP..>ÙX.á..FŸ.VÞ.Åtf.v$.võ.v*.v 0001C0
 FA462808 C4835907 0E669A50 52FA4603 0AC48358 E83ED49A 50F076FF 0676FF08 ..v..vÞP.Å>ÒX.á..F*RP.f..Y.á.+F* 0001E0
```

```
Dump of file SATURN:[PCCOMMON.DUMP.PBIN]DBIMP.EXE;1 on 18-APR-1990 10:54:33.53
File ID (384,26,0)   End of file block 77 / Allocated 80

Virtual block number 48 (00000030), 512 (0200) bytes

 89EA4689 04C48320 060C529A 5050C028 E846FF9D 75C00804 C4830057 E80E5052 RP.ÒW..á..âu..FÒ+áPP.R..-.á..Fõ. 000000
 47B826F2 5EC40D74 F44608F2 4688FE85 E9037500 E87E83FF 11E90374 D008EC56 V$.Åt.Õ...~Õ.u.Õçt.F .F¶t.á^ &.G 000020
 EC8855C8 5DE588C0 2804C483 0084E80E 5052138A 16881388 A107E806 57882604 .&.W.Š.Å......RP.Ò...á.+â.|}ùU.$ 000040
 5EC456E8 FFFF8805 75D008FE 5689FC46 8902C483 5A053E19 9A500008 8804EC83 .$.|..P..>.Z.á..F=.V$.Åu.|..ŠVá^ 000060
 06081388 A1044789 26064789 26C028FC 5EC40257 89260789 26085688 064688FC =.F..V.&..&.W.á^=+á&.G.&.G.Å.... 000080
 88A3FE56 88FC4688 00E80657 89260447 8926FE56 88FC4688 13841EC4 1474138A ..t.á....F=.V$&.G.&.W.Š..F=.V$È. 0000A0
 468808EC 83EC8855 CB50E588 C0281386 16891384 A3FE5688 FC468813 8A168913 ......F=.V$È......+á.|}ùU.$.$..F 0000C0
 5EC47D74 D008FA56 89F84689 06578826 04478826 065EC400 92E90375 08460806 ..F.u.Õ..á^.&.G.&.W..F%.V*.Åt)á^ 0000E0
 5EC4347D C00808C4 8355F00E 9C9A37FF 260277FF 26F85EC4 37FF2602 77FF2606 .&.w.&.7á^½&.w.&.7...ÞU.á..â)4á^ 000100
 89260789 26065EC4 02578826 07882 6F8 5EC4FE56 89FC4689 02578826 07802606 .&..&.W..F=.V$á^½&..&.W.á^.&..&. 000120
 F8468906 57802604 478826F8 5EC40257 89260789 26FE5688 FC4688F8 5EC40257 W.á^%.F=.V$&..&.W.á^½&.G.&.W..F% 000140
 90C85DE5 88FF6EE9 08568906 46890657 88260447 8826065E C4977500 08FA5689 .V*.Åu.á^.&.G.&.W..F..V.Òn..|}ù. 000160
 616F612A 610860EF 58F95887 58D85AAC 57472E2E 2E776667 0A053738 40455340 MSEM87..gfw...GW ZÄ[ñ[*[ÿ'.e*eoe 000180
 58881E16 0A0D3037 384F4EC8 1F5A8097 FF2ED98E FFFF891E E3D15C5F 58E7610C .øÒ[_\!D.¿...]....Z.ùNO87=....|X 0001A0
 308026FC FF331F0E C68E7274 F6081E00 0009E89A 50001488 1E0000FF FF9A5000 .P.......|..P.Š.....-tr.ó..3.=&.= 0001C0
 4FAEF320 807FFF89 50E8E774 AEF2C032 7FFF890B 74A6F35A A58E0005 89657400 .te¿../ÉZæ|t.¿..2â·ÙtÓŠP¿..¯ æÙO 0001E0
```

```
Dump of file SATURN:[PCCOMMON.DUMP.PBIN]DBIMP.EXE;1 on 18-APR-1990 10:54:33.53
File ID (384,26,0)   End of file block 77 / Allocated 80

Virtual block number 49 (00000031), 512 (0200) bytes

 57065300 0188C488 50F880CF 88F8204F AEF2DF88 7FFF89C0 33387402 0A158A26 &...ØtB3â¿...Ô·ÙO+«.Ù.«P.áE..S.W 000000
 1F580000 58149A50 16530002 88575AAA 8F0E5300 0188C488 000030C3 9A501651 Q.P.Ù=...áE..S.e ZWE..S.P..[..[. 000020
 6A000468 1E0DE800 04A2E800 022411CD 08750000 143E831F 9048E800 000406C6 ó....ŠH...>...u.ë.$.ÅÒÅ .Š..h..j 000040
 C3F9FFFE 08147324 11E80A75 0000143E 83207400 00043E80 0000FFFF 9A006A03 .j.......>...t .>...u.Ò. :s.|z.*ù 000060
 0000043E 8016E800 78E80575 0000143E 83000013 E49A0024 681E5C88 680E106A j..h|\.h$..ð....>...u.Òx.Š..>... 000080
 A30000A3 C0330545 E8133288 0034E800 00587B9A 0020681E 66AE680E 076A0F75 u.j..hÙf.h ..([..Ò4.|2.ÒE.3âÈ..È 0000A0
 36FFC323 DCE8E308 05740000 043E8000 88E81075 0000143E 83C39800 04A00002 ......Û.>...u.Ò...>...t.ÙDÒÉñù.6 0000C0
 98037400 04063AC0 330010A3 000EA1E3 08027400 00043E80 C30000FF FF9A0058 X......Û.>...t.ÙDÅ..È..3á:...t.. 0000E0
 8C108940 21CD0020 8F353488 000089C3 00021689 0000A3C3 0008A300 0CA3E208 UâÈ..È..ûÈ......û¿..|45e .ë|ə... 000100
 622C8F61 FF8E6249 8A097400 00043E80 663E8F66 588E6602 8AF3E204 C7830245 E..û.âµn@f/(fe>f.>...t.n|b/.ee,b 000120
 8F253488 000089C3 1F21CD07 884021CD 0680F8E2 4021CD00 08892534 881F0E1E ...|4%¿..ë|əâ=.øë|ə.øë!.û¿..|4%e 000140
 D9369800C 880EEC83 28740000 043E8002 33C3F4E2 04C78340 1F21CD15 C51E0020 ..é.ë!.ə.ú.â¶ù3Ø.>...t(.$..É.6) 000160
 EFE24201 7403F883 03E383E8 D1E8D1D8 88000889 0EC48304 4788362F D9369837 7.6)/6.G..á.¿...ÀIÒIÒ.D..«.t.Bây 000180
 0E80C302 CC800374 0000043E 80020019 0E80C3C2 03F3F60C 83000E06 280010A1 Å..+...*.-µ.ôù......>...t..ä.ù.. 0001A0
 5EC51E53 02468920 46875C84 88007609 98EC881C EC835550 19E843CF C3040019 ...ĜùÇŠ.PU.$..$.Iv.|Ç\.F .F.S.é^ 0001C0
 9A881E53 F8E20898 007609EC 881CEC83 555010E8 084689C4 860E7328 04078806 ....(sÑ.á.F.Š.PU.$..$Iv..Ùâ«S.|. 0001E0
```

```
Dump of file SATURN:[PCCOMMON.DUMP.PBIN]DBIMP.EXE;1 on 18-APR-1990 10:54:33.53
File ID (384,26,0)   End of file block 77 / Allocated 80

Virtual block number 50 (00000032), 512 (0200) bytes

 01FEE903 7402A800 84E901CF 80067401 A80A7501 C7F6FF32 02468AC0 33D88E5A Z.A38.F.2.-u.u.'.t..u.O..'.t.Ot. 000000
 02CAE908 CF800674 08A80A75 08C7F609 E802F1E8 04CF8008 7404A80C 7504C7F6 -u.u.'.t..u.Op.S)-u.u.'.t..u.Oo. 000020
 0C580575 01FA3D07 E4800846 88501F74 01A8C322 D3F6FCE3 80C0C880 00061E8A ....uà.D.-A"u'.t.P.F..O.=".u.X. 000040
 C48358 1F 00080609 006ED998 E2089801 34027558 01003003 38250846 880EE880 .S..F.%8.=..Xu.4..Uã.)n......(.á 000060
 51535602 E5E902C4 83585806 47893604 4788360C 885350C3 5802758F FFA95D1C .]`.«u.XuPS.E6.G.6.G.[X.6.O].VSQ 000080
 E0F28108 56885274 C0C7F6C8 D3E9D0E9 D038E180 C08A03F7 024E8804 5E885752 RV.^..N.%f.ë.ÃBAÕAÕRu-uàtR.V.. Á 0000A0
 FA800E74 12FA8090 34E81675 08C2F608 7510C2F6 40750120 C2F72075 C0C2F601 .-ôàu %ô .u@-ô.u.-ô.u.S4..".t..." 0000C0
 890CC683 FE82E803 75001236 38001036 883FE780 20750110 C2F79027 E8097414 .t.S'.%ô..u .Ó?.6..;6..u.Òÿ±.6.. 0000E0
 0974C0C2 F601E0F2 81085688 904AE803 7403C3F6 0105E93C D898F609 98001036 6...)-.U<Õ..-u.t.$J..V..Á.-ôàt. 000100
 008EE903 75000E36 38001036 889028E8 00C0E806 74D80890 35E80375 0110C2F7 %ô..u.$5..Ut.Òà.$•..6..;6..u.Õ/. 000120
 0CC3F600 1036890C EE83FE68 E8037500 0E363800 1036882C D898F7D9 9803C880 .ù..)%.U,.6..;6..u.Òh±.Ÿ..6..-ù. 000140
 E301E301 004C2ED8 980079E8 E8D1E8D1 004C3ED8 981A74F6 08F0E683 F3885075 uP.µ.)b.-t..U>L.)S)Soy..U.L.)D)D 000160
 3688F609 982CD898 F7D998F7 D9980CC8 80237400 0E363800 1036882D E803C880 .ù.$-.6..;6..t#.ù..)%.)%.U,.)-.6 000180
 C2F70875 C0C2F601 E0F28108 56880010 36890CEE 83FE13E8 0375000E 36380010 ..;6..u.O.±.Ÿ..6...V..Á.-ôàu.%ô 0001A0
 07E283EC 750CC3F6 F179E2D3 50C48A0F E180CA8A 9046E803 7510C2F6 19750120 .u.-ô.u.$F..Ò.Å.¤áPRãyp-ù.u$.ã. 0001C0
 CC80C3F3 740003C3 F7F7D998 C8D1C8D1 900FE824 7503C2F6 CAD30388 CA88E200 Ãã.Ò.RRÒ-ô.u$$..)ù)ù.)%%ù..tµù.ä 0001E0

Dump of file SATURN:[PCCOMMON.DUMP.PBIN]DBIMP.EXE;1 on 18-APR-1990 10:54:33.53
File ID (384,26,0)   End of file block 77 / Allocated 80

Virtual block number 51 (00000033), 512 (0200) bytes

 0E80FDEC E95E5859 5A5F010A E8FE24FE 67E95E58 595A5F00 66D99800 0246C604 .6F...)f. ZY[^Og±$±Ò.. Z:'^Ò$».. 000000
 C0C7F654 7530F983 30E18008 7410F983 007408F9 830338E1 81084E88 51020008 ...0.N..ÃB..".t..".t..Ã0.-?uT-uà 000020
 883C0898 F6D99800 1036890C C683FD5C E8037500 12363800 1036883F E7801074 t..Ò?.6..;6..u.Ò\».6..6...)-.U<. 000040
 10F98008 7408F980 38E18359 0054E800 87E8084E 890104C1 810400E1 8151084E N.0.Ã...è...N.Òñ.ÒT.Y.ÃB.".t..". 000060
 7FE80374 0100F981 0138E181 084E8831 E80091E8 084E8906 C1C98108 F1802474 t$.þ..èè..N.Ò..$1.N..ÃB..'..t.Ò. 000080
 060A9800 183ED098 D80098C9 D998D1D8 98C9D998 E2089840 CC801CE8 0024E800 .Ò$.$..Ã∂.Uã.)è.Ã).)è.TÃ.T>..... 0000A0
 126EDF98 16758019 46F62174 7FFFC1F7 1A4E8898 127ED898 FD42E9FD 24590018 ..Y$»ÒB».U-...N.%è..t!-F..u..Òn. 0000C0
 89144E89 124E89C9 33C3126E D8981A4E 01403EE9 810C7400 1A7E8398 127ED898 .U-...-..t..Ò>∂.N..Un.ù3è.N..N.. 0000E0
 FCEAE900 03E80373 5800C030 01F48001 C0250846 8850E8E8 1A4E8918 4E89164E N..N..N.$ÒP.F.%à..¶.=à.Xs.Ò..Òõ• 000100
 084E8800 583E8804 74000014 3E83078C E2089853 5156571E 40CC805C 7540C4F6 -à∂u\.Ã∂.WVQS,Uã.µ.>...t..>X..N. 000120
 7E8D147E 89E9860A 76C504C9 8038E180 0974C0F3 80C0E380 D8CD8007 E580D988 .).[..èÃ.Dô.µÃt..ÃB.è.év..Ò.-..- 000140
 18060A98 00183ED0 981F5F5E 5958125E FFC81946 C6174E89 981646C6 127E8916 ..~.6F...N.6F.ù.^.[Y^_..]>...... 000160
 83247501 C4F68983 287580A8 88833175 02C4F68A 83387504 C4F68883 531EC300 .ù.$°.-ô.uB°.-ô.u1°.`¯u+°.-ô.u$° 000180
 A8878306 7520A886 830C7510 A8858312 7508A884 83187504 A883831E 7501A881 .'.u.°.'.u.°.'.u.°.'.u.°.' u.°.' 0001A0
 80197500 00143E83 589321CD 4C849305 75000206 080000A1 D88E5CEF 88007540 ∂u.|ÿ\.ÃÃ......u..ÇLëI.[.>...u.. 0001C0
 A3CF581F 00001EFF 04E89062 2E06C62E 0016A20F 75000016 3E801274 0000043E >...t..>...u.Ã...6..b.$......XÙÊ 0001E0

Dump of file SATURN:[PCCOMMON.DUMP.PBIN]DBIMP.EXE;1 on 18-APR-1990 10:54:33.53
File ID (384,26,0)   End of file block 77 / Allocated 80

Virtual block number 52 (00000034), 512 (0200) bytes

 063AC033 C30006A1 C3000AA3 001C2ED9 98001CA3 08740000 043E80FF 3C250006 ..%<..>...t.Ê...)...Ê..ûÃ..û3à:. 000000
 043E800C 0025C300 08A31FFF 25000806 083F2400 18A09800 183ED098 08740004 ..t..[>......$?....%..Ê..û%...>. 000020
 D998FCD9 98001C2E D998001C A3C108F3 E580000A 0E889800 0A3ED998 20740000 ..t .)>........|µ.èÊ...)....)•.) 000040
 25C30067 E8000A06 8F5D14E4 E8550008 2688E50A F3E58051 000A0E88 C3000A2E ...0....0.|µ.|.&..UÒõ.]....Òg.ûX 000060
 001C2ED9 98001CA3 C108F3E5 80000A0E 8898000A 3ED99829 74000004 3E800C00 ...>...t).)>........|µ.èÊ...)... 000080
 00082688 E50AF3E5 8051000A 0E88C300 1E168800 1CA1000A 2ED99800 1C1ED898 .U....)...Ã......û....0.|µ.|.&.. 0000A0
 00103689 0CEE83FA E5E80375 000E3638 00103688 0019E803 88C28850 135EE855 UÒ^.].ô.%Ò...6..;6..u.Ò|°.Ÿ..6.. 0000C0
 F6CD0A3F E580C2CD 8000062E 8AD1F600 0C0E0800 080E0900 180E88C3 000A068F ....Ù............-|.....ëô.|?.ë- 0000E0
 4EC00C80 048A0876 C5EC8856 1E555098 F8FE73E9 910974DF FFC1F700 192E8AD1 |....%è.Òt).Òs±«.PU.V.$év.....ÃN 000100
 50CF98F8 35E80001 88530489 9880C486 260C1824 D0F6E800 E800E800 0876894E N.v.ÃÒÃÒÃÒ-Ã$..&.6¯...SE..$5«.ùP 000120
 55000088 5098F8CF 581F0000 1EFF0016 0686C033 CF622E06 C62E088E 6084881E .|Ç'.Ã.6..bù3à.........XÜ«.P|..U 000140
 30093030 F8250140 882875C4 385854D8 33530429 0876894E 4E0876C5 EC88561E .V.$év.NN.v.).S3U|X;6u(.∂.X«0=10 000160
 589004C6 0374E0DF 30014088 0874E208 30FEFF25 01408816 72F03C02 408A0775 u..∂.<br..∂.X.±=Uãt..∂.=ÒÃt.6..[ 000180
 67446790 6726670C 67426790 67306716 674A6790 672E6714 674C90CF 58501F5E ^.]XU.Lg.g.g.gJg.g0g.gBg.g&g.g0g 0001A0
 67026790 67226708 673C6790 6734671A 67046790 6736671C 67066790 6724670A .g$g.g.g.g6g.g.g.g4g.g<g.g"g.g.g 0001C0
 6932686C 68626932 68586952 69496938 693078E9 78EE6942 69596790 67326718 .g2g.gYi8iYxÒx=i8iIiRiXh2ibhlh2i 0001E0
```

```
Dump of file SATURN:[PCCOMMON.DUMP.PBIN]DBIMP.EXE;1 on 18-APR-1990 10:54:33.53
File ID (384,26,0)   End of file block 77 / Allocated 80

Virtual block number 53 (00000035), 512 (0200) bytes

 706273F8 71877480 6FA76904 68F868EC 68A46919 69286910 6898688E 69326884 .h2i.h.h.i(i.iÈhšhŴh.iIo¯t.q«sbp 000000
 790E79CF 79097904 79ED75C2 78987845 78947568 69327745 78887463 72887506 .uErct.xEw2ihu.xEx.xöuÜyåylyüyßy 000020
 764A6932 78C97F0C 7A836932 69326932 69327D80 70847E66 7E3E6932 79E879E3 DyÖy2i>-f-.)¯)2i2i2i2i°z..è(2iJv 000040
 7956794F 794F794F 794F7963 794F793A 796A7963 794F7950 79136932 693278A2 Åx2i2i.ylyOycyjy:yOycyOyOyOyOyVy 000060
 698E6980 6990697C 69806980 6990697C 6A097956 794F793A 79507971 794F7956 VyOyqyly:yOyVy.j|i.i.i.i|i.i.i.i 000080
 698E6985 69906997 699769A8 69906997 683969E9 6990697C 697C698E 69F6698E .i-i.i|i|i.iõi9k.i.i i.i.i.içi.i 0000A0
 698E69A6 698769B0 69A669A8 69906997 6C8869A8 69906985 69AB698E 69F6698E .i-i.i içi.i i¦t.i.i ili i.ili.i 0000C0
 C0010000 00000000 00000705 03014240 06046985 69906997 6997698E 69F6698E .i-i.i.i.i.içi..@B.............â 0000E0
 FFFFFFFF FFFF0280 4000C000 00000000 00000300 40000000 00000000 00000100 ...........@.........å.@........ 000100
 00007FEF FFFFFFFF FFFF7FF0 00000000 00007F7F FFFF7F80 00000000 3FFFFFFF ...?................b.......ÿ... 000120
 FFFE8930 A2F4F66A 818A0000 00008000 00000000 00000100 00000000 00000000 ........................ʾj-¶ÅO.±. 000140
 F333F90E 64840000 FFFF860A 91C1689B 2C230000 00000083 D742C265 539E0000 ...Seö8a°i....#,.kè..... ..dß°3µ 000160
 8AFE0000 0001C90F DAA22168 C2350000 00018000 00000000 00000000 00008504 .ç................5öh!ÅO.e....±. 000180
 FFFE9A20 9A84F8CF F7990000 000088AA 38295C17 F08C0000 0001049A 784BCD18 .ëKx.å...,Vb.\);¨|.....%ü«.. .±. 0001A0
 2C074037 00800005 8F695C3E D85A7804 00030000 FFFF8172 17F7D1CF 79AC0000 ..¨yüi%.rŸ......å(ZÅ>\i.....7Mæ, 0001C0
 00000014 F506868B 5E5891CB 00800012 828A8BEE 6617DCD3 0000000C D6040DF8 %ÅÅø....ÆÉ.fŸEn.....ù.X^...%.... 0001E0

Dump of file SATURN:[PCCOMMON.DUMP.PBIN]DBIMP.EXE;1 on 18-APR-1990 10:54:33.53
File ID (384,26,0)   End of file block 77 / Allocated 80

Virtual block number 54 (00000036), 512 (0200) bytes

 0CFEC746 FA960000 000FC939 B27088CF 66630080 00099C79 05020120 86E50003 ..Ì. ...y.....cfü.pý9è.....*Fü±. 000000
 0000FFFD A650A4C9 CF085832 00040000 0014F506 86885E58 91C80080 0013E487 ñõ....ü.X^...%......2I.üèÈP|»... 000020
 90EFE9CF 55504265 00000005 9C4A52A8 E228899F 00000002 D0F0A848 D5CAD1CE öîôîK¨bÅ......+ã¨RJ.....eBPUuÕÿ. 000040
 84E70000 0003F062 4F0A5638 83100003 00000005 A443E5E6 24AD4890 00000006 .....KU$||CÉ........8V.Obb....ÕÇ 000060
 0005A443 E5E624AD 48900000 0006AC50 90205860 24380000 0005EE50 5190601E .m.OPŸ....;$m[ .P¯.....KU$||CÉ.. 000080
 C3A35FAF 0000000E EC983054 14E1AD08 00000005 F27406FC F4051898 00020000 .......¶•.t·.....ÙÅ.T=.$....É_Éù 0000A0
 0012A003 81829878 E8500000 000ADAA7 10883878 776F0002 00000014 FDF0D84A JÅb»......ow(8..Îö....)Ò(..Ÿ.... 0000C0
 F6314F9C 0000FFFE 987157E2 C2997704 00030000 00168720 F814E709 837E0000 ..~..Ô.%-ñ.......w.õãWq.±....O1- 0000E0
 0080000A 8AC4E42F 1D0928C9 00000008 B2D3C9E0 7AEA488A 00800004 DE915E35 5^.Æ.....KÖzÜèÆÿ....è(../õå..... 000100
 F4E06C83 88960000 00089C04 1FD0A933 EF600080 00058EAC 025B3E70 76880002 ..Evp>[.¯.....'ÿ3`Å........E.ÌÅ¶ 000120
 5EC08904 C7067689 4E4E0676 C5EC8856 1E556692 668C6696 66870080 0009C05F _å.....f.f.f.fU.V.Šév.NN.v.ù..å^ 000140
 C5C788D3 88FCEC88 5502EC83 53515256 571E0650 F8669666 8C669266 87CF5D1F ¯]ü.f.f.f.f«P..WVROS.Š.U.Š•.Æ.üé 000160
 C38E088C 0AE80E46 8E6653A7 FF2EC301 03E383C3 D0C3D009 88FE4088 4747147E -.GG.Mt.1ÅüÅü.D.1ü..ÌSf.F.Š..Ü.û 000180
 50FC6636 A7FF2EFE 40884706 E38302E8 C0098AD3 8857E802 468CC38E D38C04E8 Š..Æ.ù.F.ŠW.Æ.1åŠ..D.G.Mt..Ì6f•P 0001A0
 D388C28E CF7328C1 8002C783 0D88147E C5C788DA 8CEC8855 16535152 56571E06 ..WVROS.U.Š.Ö.üé-....ú..è(sü.ô.Æ 0001C0
 80FE4088 47147EC5 C788038B FCC08ED8 8CEC8855 16535152 56571E06 50F820E8 Š «P..WVROS.U.Š.Å.å•.Æ.üé-.G.Mt. 0001E0

Dump of file SATURN:[PCCOMMON.DUMP.PBIN]DBIMP.EXE;1 on 18-APR-1990 10:54:33.53
File ID (384,26,0)   End of file block 77 / Allocated 80

Virtual block number 55 (00000037), 512 (0200) bytes

 8E007603 F08BC033 48E8F088 C2886296 A7FF2EE3 811FE383 D08AC500 C50034E9 Ö4ÅéÅé.Ì.D.ÌD..Ì.b.ô.bŠN3å.b.v.. 000000
 C68808E8 02468E00 7603F088 C0332CE8 4798058A F08BC288 D003C688 08E80246 F.Š..ô.Å.ô.b...GŠ,3å.b.v..F.Š..ô 000020
 F003C288 F0880246 8E00568B C6880EE8 47473588 12E84747 0588F088 C2880003 .Å.ô.b..GGŠ..5GGŠ..ô.V..F..b.ô.b 000040
 087401C1 F60EE383 D08AED00 ED00ED00 ED002000 001806C7 D88E6232 88147E89 .-.|2b.Åü.... ÅÜÅÜÅÜÅÜ.Ì.D.-ê.t. 000060
 47E80098 3E890CEF 83FE8800 103688C0 8E088C58 000CE853 00ACE962 E697FF2E ...|bõ¯.SÒÉ.[.Å.å.ô...±.ÿ..>..ŠG 000080
 7401C1F6 0EE383E8 D0E8D0E8 D0E8D0D0 8A0018A3 C78EDF8E 67548FC0 33147E89 .-.3å«Ìg.Ô.üÉ...ÌÅŠÅŠÅŠÅŠ.D.-ê.t 0000A0
 80037408 C3F60098 3E890474 04C1F600 9836893C 720048E8 6CE862F6 97FF2E07 ....-bŠÌÖM.r<.ô..-ê.t..>..-û.t.. 0000C0
 00103689 0CEE83F4 C5E80375 000E3638 00103688 620697FF 2E187402 C1F602F3 æ.-ê.t....æb.ô..;ô..u.Òé¶.Ÿ..ô.. 0000E0
 F28A1CE2 80D58AFE 88001036 8821E801 00180E83 F482E828 E8620697 FF2E32E8 Š2...æbŠ+Òý¶.....Š1.ô....±.Ì.å..· 000100
 0018A15F 5E5A5958 02C48350 010EE8C3 F5017FF8 000E3E38 FA2BF632 D602E600 ÅÌ.æ2-+°;>..%..%üÒ..}.ô.[YZ^_Å.. 000120
 1FDFFFA9 0019268A D0F6C40A 3FE480C2 CC800006 268AD0F6 000C0608 00080609 ........-Å.Å...åô.ô7.ô-Å.Å..¨.Ô. 000140
 88FFF3E8 630EA7FF 2E06E383 D9886306 A7FF2E06 E383D988 F81AE9CF 58027507 .u.XüÒ.%.1.D...Ì.c.1.D...Ì.cÒæ.. 000160
 D9886316 A7FF2E06 E383D988 C3001036 890CEE83 F432E803 75000E36 38001036 ô..;ô..u.Ò2¶.Ÿ..ô..û.1.D...Ì.c.1 000180
 C1F70203 F1812474 0806C1F7 1173E911 8CE90375 0006C1F7 631EA7FF 2E06E383 .D...Ì.cKé..u.ÕŸ.Õs.Ké..tŠ.þ..Ké 0001A0
 C1F7C312 4689000C A16875C4 385854C3 0000000C 06C70774 8104F981 11750603 ..u..°..t.ú.....üÌX;ôukÅ...F.üKé 0001C0
 E800008A 0F80E90F 99E90375 0400C1F7 108AE910 D8E90375 0400C1F7 0C741000 ..t.Ké..u.ÕÜ.Õn.Ké..u.Õ..Õ...ÌÅŠ 0001E0
```

```
Dump of file SATURN:[PCCOMMON.DUMP.PBIN]DBIMP.EXE;1 on 18-APR-1990 10:54:33.53
File ID (384,26,0)   End of file block 77 / Allocated 80

Virtual block number 56 (00000038), 512 (0200) bytes

 6346A7FF 2E0EE383 E800D08A 6336A7FF 2E0EE383 E800D08A 6326A7FF 2E0EE383 .D...I&c.ÿÃŠ.D...I6c.ÿÃŠ.D...Ifc 000000
 E9C03305 7406C1F6 115CE900 01881075 0006C1F7 04F18011 22E91C75 0006C1F7 %ê..u.Ö"..þ.%ê..u.¡..Ö\.-ê.t.3àö 000020
 638E88F7 87D23315 E8639E88 D23319E8 00808A1E E880008A C3400018 0E831152 R.....ãÚπ..Š.¤..Š.3øE.cŠ.3ø.%E/c 000040
 0A7532D8 03E0D198 08440AE0 D0E0000B 458A637E 88D23305 E8638E88 D2330CE8 Š.3øE/cŠ.3øE-c.E.ÅÅÅÅ.D..ìÅ.Å2u. 000060
 F78802E8 0400180E 83C30A55 880051E8 D68AF788 27FF2E08 4488084D 880A5432 2T..M..D...'.%.øÒQ..U.ù.....Š..% 000080
 EAE863F2 8E040018 0E83C30A 7508001B E87FE680 F23263E6 8E30E801 00180E83 .....Š=/Ic2..Ì.Ò...u.ù...../ cŠõ 0000A0
 0CEF83A5 2EA52EA5 2EA52EA5 2EA52E00 983E8801 00180E83 63FE8E04 00180E83 ...../tc......>...E.E.E.E.E.E.ÿ. 0000C0
 C5741000 0806F6C3 0CEE830C EF83A5A5 A5A5A5A5 0C74F73B 00983E8B C30CEE83 .Ÿ.ù.>..;%t.EEEEEE.ÿ..Ÿ.ù-.....té 0000E0
 86F78708 7CC12887 E8F38888 E8F08804 77A7F300 04890F88 C68886E8 C1780632 2øxêŠ..ó.Ò¿..µIw..ÞŠ..µŠ.+ê|..%. 000100
 88024D88 15880DF7 02790632 00018008 75885255 2F7E0043 3008F708 F7C803F2 ·.å%Å%Å=C.-/UR.u.§..2øy.%I...M.. 000120
 06325152 550388E9 000F8300 08830009 8301EA83 0449E903 78ED0806 7D880450 )..)..Ùx.ÒI..õ..)..Ù..Ò.Ò..URQ2ø 000140
 CA830374 ED081A7C 0EFE8370 74F608EE 87F633AD D888ADC8 88ADD088 ADE8889C ..ÒU.ÅU.åU.ÅU3-.Ÿ.-tp.±.|..Ùt..ò 000160
 CC800374 C00A9533 7C06FE83 29725374 E57710EE 83C033D8 88C888D1 88EA8801 ..õ.1.ù.Å3â.Ÿ.w|tSr).±.|3..ât..ä 000180
 D1E50128 74117708 EE83E432 C48AF88A DF8AE88A CD8AF18A D68A95E2 8AC48A01 ..ó.ã..ø.þ.ë.Š.Ö.%.á2õ.Ÿ.w.t(|||| 0001A0
 D1DAD1DE D1D801E8 0120CD83 0374003F C5F7CE87 19E8F375 460001D3 D1D1D102 ø|||ÑÌÅFuµŠ..ö%é?.t..ë ÌÒÌÙÌñÌÒÌ 0001C0
 7C13045C 13024C13 14032278 589D01CD 8303743F FFC5F7F8 88F788CE 88F4E2D0 ÌãŶ.ö.%.½¼é.?t..ë..Xx"...L..\..| 0001E0

Dump of file SATURN:[PCCOMMON.DUMP.PBIN]DBIMP.EXE;1 on 18-APR-1990 10:54:33.53
File ID (384,26,0)   End of file block 77 / Allocated 80

Virtual block number 57 (00000039), 512 (0200) bytes

 045C1802 4C181428 037DE9F0 884001CD 83037300 D10AD1D9 D108D1DF D1107306 .s.ÌÒÌÙÌ)ÌÒÌIs..ë.ã.ÞÒ).+..L..\. 000000
 8802A4E9 F088FE13 DE13CE13 0613F5D0 F7D2F7D1 F7D3F7D7 F7F6331A 73067C18 .|.s.3-%ø%Å%I%Ø%I%.ø.ö.ñ.s.ÞÒÉ.. 000020
 74C00804 88C888E8 880833FA 225040C1 0352F232 FE8A5502 9AE95080 F48058F0 ÞX.¶.PÕ..U.±2.R.éãP"*3U.Š.ù...åt 000040
 13C803E2 F70974D2 08025588 1074C008 048855CA 88E888E2 F70674D2 0815880C ....øt.%ã.Ò.ÒU...ât..U..øt.%ã.à. 000060
 C93350C1 08580005 830A13C8 03E2F709 74D20815 880F74C0 08024488 000583DA Ö.f..D..ât....øt.%ã.à.Ö.f.X.éP3è 000080
 02558810 74C00802 44880001 83EA1308 03E2F709 74D20804 55881074 C008048B ...ât..U..øt.%ã.Å.õ.1..D..ât..U. 0000A0
 EA130803 E2F70974 D2081588 0F74C008 04448800 D183EA13 D803E2F7 0974D208 .øt.%ã.Å.õ.1..D..ât....øt.%ã.Å.õ 0000C0
 1074C008 02448800 D383CA13 E8030665 F70A74C0 080488D8 3350C308 58000183 .1.X.ÚP3Ù...ât.%e..Ò.ò.Æ..D..ât. 0000E0
 E2F70974 D2080255 881074C0 08044488 000383CA 13E803E2 F70974D2 08045588 .U..øt.%ã.Ò.ò.Æ..D..ât..U..øt.%ã 000100
 583FFFE5 81D58800 D383CA13 E803E2F7 0974D208 15880644 88000383 CA13E803 .Ò.ò.Æ..D....øt.%ã.Ò.ò.Æ...f.Í.?X 000120
 55881074 C0080444 88000583 DA13C803 0665F70A 74C00802 448852E0 3350C508 .éP3ÚR.D..ât.%e..à.Ö.f..D..ât..U 000140
 D5830A13 C803E2F7 0974D208 02558806 44880005 830A13C8 03E2F709 74D20804 ..øt.%ã.à.Ö.f..D..U..øt.%ã.à.Ö.f 000160
 F70974D2 08045588 06448800 D183EA13 08030665 F70A74C0 08044488 C9335100 .O3è.D..ât.%e..Å.õ.f..D..U..øt.% 000180
 74C00858 D888C888 D188FA88 50590113 C5030665 F7064488 000183EA 130803E2 å.Å.õ.I..D.%e..é.IY).*.1.ù.ÅX.ât 0001A0
 5E5FFCA7 F3FD0004 8906C783 06C68357 565255F2 32C118F9 0161E95E 01CD8303 ..ë.^Òa.*.é2 URVW.ó..ù.¿..»µI• ^ 0001C0
 D8D1EAD1 08729DFF 33A5A5A5 A5009A8F F78892AD D088ADD8 88ADC888 ADE8889C ..ÒU.åU.ÅU.ÅU..%e..EEEE3..r.ÌõTÅ 0001E0

Dump of file SATURN:[PCCOMMON.DUMP.PBIN]DBIMP.EXE;1 on 18-APR-1990 10:54:33.53
File ID (384,26,0)   End of file block 77 / Allocated 80

Virtual block number 58 (0000003A), 512 (0200) bytes

 38E85700 3CE85700 40E80000 001C06C7 57004AE8 001C3E89 55450FD1 09D10801 ÌÙ|||ÒEU.>..ÒJ.Wù.....Òã.WÒ<.WÒ8 000000
 0275025C 38077504 443B0C75 06543800 9A8E2272 D2D1D001 D301E1D1 80018000 .§..1Å1±1Å1ør"/..;T.u.;D.u.;\.u. 000020
 3BFF3300 A0368801 3CE95E5F 5859D788 E888E432 C40AC308 C108C208 0C730C38 ;.s..ó.é.ú.62ô.Ò.øY[_^Ò<..6..3.; 000040
 50F288E7 F70474C0 08009AA1 F588E033 975352F6 F74177F0 38047502 08627306 øsb.Øu.;bwAX-RS.3Ù.XÅ...ât.XÒ. P 000060
 001C1688 92000283 E803E7F7 0874C008 009EA1EA 13F003E7 F70674C0 08009CA1 Å...ât.XÒ.Þ.õÅ...ât.XÒ.Ò.ø...... 000080
 1613009E 0613009C 1E13009A 0E034F13 73939192 95E8185D DD1858CE 18032858 (+Å.õ[.1].Ò....s.O.............. 0000A0
 009A1688 C213009E 1E13009C 0E03009E 0618009C 1E18009A 0E284FC3 ED7300A0 ..sÙÙO+....................ó.... 0000C0
 8863E68E E9E8ED33 D588CA88 0988F888 0C74C8FE 10EE831F 75FF0804 80C9E8F5 %Šè¯...u..Ÿ.±ât..«.).ò.f3ÙŠÒ/Ic. 0000E0
 F28ACE8A E98A0D8A F88AC78A E08A9708 EE831875 FF00C7F7 F8C9E950 5800983E >..X]Òè«%ù..u..Ÿ...Å.ù.«.1.Ò.ö.  000100
 EF748000 C7F7D7D1 D3D1D1D1 D2D1E5D1 4E667580 00C7F795 C032E08A D48A9597 ...Å.Å2å.%ù..ufN||||ø||||±|ø%ù .tÿ 000120
 778000F9 810F72E8 001872E8 D0200018 0E834474 C908E88A CD0ACA08 D50853E8 ŠS.f.ò.Æ.Š.ètD.... ÅÒr.ÅÒr..· .w 000140
 C7800CE8 0272E4D0 50581472 E8D00CE8 1A72E4D0 505814E8 227401C7 F627721D .r'-ù.t"Š.XPÅÒr.Š.ÅÒr.XPÅÒr.Š..´ 000160
 A273E800 5072E800 0008A000 A8E9D98A CA880588 ED334680 008F0473 00078301 ..ø.s.€..F3Ù.f.ò.)Ò ....ÅÒr]ÅÒsÅ 000180
 810F72E8 001872E8 D0200018 0E83E074 ED0895F8 E68007E4 80E68AC2 0AC40A95 ..á.ó.|.ð..|%..ÙtÅ.... ÅÒr.ÅÒr.. 0001A0
 0272E4D0 50581972 E8D00CE8 1F72E4D0 505814E8 277408C6 F62C721D 770400F0 ø..w.r,-ó.t'Š.XPÅÒr.Š.ÅÒr.XPÅÒr. 0001C0
 834174ED 08E8D047 E8D232ED 33468000 8F0473FD 130D13CD 1308C680 ED3311E8 Š.3Ù.ó..ê.f.»s.€..F3Ù2øŠGÅÒ.ÙtA. 0001E0
```

Dump of file SATURN:[PCCOMMON.DUMP.PBIN]DBIMP.EXE;1 on 18-APR-1990 10:54:33.53
File ID (384,26,0)   End of file block 77 / Allocated 80

Virtual block number 59 (0000003B), 512 (0200) bytes

```
72E4D050 5814EB27 7401C2F6 2C721D77 8000F081 0F72E8D0 1872E8D0 2000180E ... ÅÒr.ÅÒr..».w.r,-ô.t'Š.XPÅÒr 000000
4680008F 0473FD13 0D13CD13 01C283ED 3311EB02 72E4D050 581972E8 D00CEB1F .Š.ÅÒr.XPÅÒr.Š.3U.ô..ë.Ì.»s.€..F 000020
01FE8118 7D4000FE 810A6588 80E4805D 58064589 04508902 40891589 970098A1 Å......M..]..E.X].Ô..e...a)..t. 000040
D0E8D000 08A00800 180E83C3 0A6588FA 60E863E6 8EC3000B 45C60875 89087EC0 à-..u.óE..ù/ÌcÒ''.e.Ù.......ÀOÀ 000060
7580C4F6 2000180E 830A72E8 D0C30A65 88FA42E8 63F28E22 72E8D00E 72E8D0E8 ÒÅÒr.ÅÒr"/ cÒR'.e.ùÅÒr..... -â.u 000080
D1D08AAD 26F888AD 26EAEBD4 7480C4F6 2000180E 83C30A65 88FA2AE8 640A8EE8 Ò/.dÒ''.e.ù.... -6.tåŠõ&U.%&U.Åi 0000A0
F63280CA 80001036 890CC683 ECDAE803 75001236 38001036 88C486C8 D00124C0 6$.Åà.6.6..;6..u.ÒÒš.6..6...ô.2- 0000C0
89044488 C033057C 89075488 08748808 4489987F 2C0A6488 3374003C 2174FF3C <.t!<.t3.d.....D..t..ï..|.3à.D.. 0000E0
FA800A64 8803E801 CE800875 FF080C75 80FA8002 86400088 0A6488C3 04890244 D...ù.d.¡.ƏÑ..'.uÊ..uÄ.ö.Š€.d..' 000100
79D20AD2 D0E70148 40987F2C 0200180E 838FE801 CE80C001 880875FF 080C7580 .u...u.¡.ä.ö.Š€.....,..ƏHÌÒÅ0.0y 000120
84E0D10A 648A0744 8A055C88 127501C1 F60098E9 0888C033 077502C1 F6A8E8F7 %Š -ê.u.3ã.ÅÕ..-ê.u..\..D..d.ìÅÇ 000140
C90A084C 8A0A4488 00103688 FE880008 E9008EE9 00A6E90A 648A0081 E9D801FF .ÌÅÕ...d.Ò].Õ..ÕÄ..t.6...D..L..è 000160
88D8D1E1 D0E0D0E0 8607648A 7F04D07E FF8130DF 70008030 0844880A 4C8AC175 uê.L..D.=..)Ò=..~ì...d..ÅÅÅÅÌÅ. 000180
72E9D0E9 D0E90000 080E8A20 00180E83 37740354 08055C88 F632060A 02540814 ..Ì..ø2-.\..Ì.t7.... ....ÅÕÅÕÅÒr 0001A0
D0880979 D0320000 1501C383 D08A1574 01C3F605 771C7280 00FA8132 72E9D02C ,ÅÒr2.'..r.w.-ù.t..Å.ù....?Åy..Å 0001C0
180E83D5 E8EC78E4 0AF0E8D0 78E40AF6 72E9D0C3 ABC388AB 931674FF FE80E2D1 Ìã.t.t.. .ù ùÅÒr-.Õx¡Šb.Õx$$Ì... 0001E0
```

Dump of file SATURN:[PCCOMMON.DUMP.PBIN]DBIMP.EXE;1 on 18-APR-1990 10:54:33.53
File ID (384,26,0)   End of file block 77 / Allocated 80

Virtual block number 60 (0000003C), 512 (0200) bytes

```
6416A12E FC0A80E4 8064181E 882E3172 E9D01872 E9D0E9D0 E9D00008 0E8A2800 .(....ÅÕÅÕÅÒr.ÅÒr1....d.Õ..•.Å.d 000000
641AA12E ABC38AE7 0A80E480 641C1E88 2EE37580 C4F60572 E9D0C6E8 ABC388AB ¨.ù¨ŠóÅÒr.-6.uD....d.Õ..Ò.ù .Å.d 000020
8A025408 14889137 7D001830 FF820508 F7300018 0E83E5E8 CA7480C4 F6A9E8A8 ¨Š¨-â.tòŠÌ....0%Ä...=..)7....Ì.. 000040
0A648AE5 86F5E201 CA800373 DAD1E801 01CA8003 74C00A06 5C880454 88C60AC2 ô.6.Ì..\..ät..ò.ÌŠÌÒs..ò.ã%.Ì.d. 000060
12363800 103688FE 88FF50E9 D888C033 FF25E902 32F28ADE 8AF88AC7 8A80E480 .Õ..ù.».Ã. 2ØÕX.3ã.ÅÕP..t.6..;6. 000080
88FE87AD 26C888AD 26D088AD 26E888AD 26FE8700 1036890C C683E808 E8037500 .u.Ò.Š.6..6...t&U.Ò&U.Å&U.ã&U.t. 0000A0
89075C88 80C88003 D1D1D1D2 D1E5D1D3 D1D1D1D2 D1E5D1D3 D1D1D1D2 D1E5D108 ÅÌÌ¡0ÌÌÌ€ÌÌ¡0ÌÌÌ€ÌÌ¡0ÌÌÌ€.ù..\.. 0000C0
D1E8D1E8 D17FE480 3488F632 0A748880 E680F48A CA08CD08 016C8903 5489054C L..Ì..l..ë.ò.¶.Ì..t.2-.4.Õ.ÌòÌòÌ 0000E0
7580F880 02864000 88C30874 88084489 03FF2D10 74000030 0F7407FF 30E8D1E8 ÒÌÒ=..t.*..t.-...D..t.ù¡.ƏÑ..«.u 000100
20020018 0E8306E8 0186C001 880775C9 08087580 F880E6E8 01CE80E8 75C908EF ÿ.èuŠ.ô.ŠÌ.«.u..èu.¡.ÃÑ.Šø.....- 000120
0254892C 89F37908 08030101 D1D2D1E5 01484006 5C88044C 88025488 2C8803FF ....,Ì..L..\.ƏHÌÌÌ0ÌÌÌ€.Uy».,.Ì. 000140
0154883D 7501C1F6 0119E9A8 A8A8A8C0 33097502 C1F6A6E8 F632065C 89044C89 .L..\.2-ŠÌ-ê.u.3ã ¨¨ Õ..-ê.u*.Ì. 000160
D1D8D1D8 D1E9D0DA D1D8D1D8 D1E9D0DA D1D8D1D8 D1E9D007 4C8A0544 88035C88 .\..D..L.ÅÕÌÅÌÙÌÕÅÕÌÅÌÙÌÕÅÕÌÅÌÙÌ 000180
80E3800A 5C8A00D7 E9A8C10A E70A7FF0 8880E780 0A7C8AA8 C288A8C3 88A8920A Õ.¨.ù¨.ô¨.|..Õ.¡Þ..Õ.é Õ•..\..D. 0001A0
FD81086C 880A4C8A F175C90A 084C8A00 103688FE 889FE801 0AE900CF E900E0E9 ÕÙ.ÕÙ.Õ..Š..t.6...L..èub.L..Ì..» 0001C0
2000180E 83527407 C2F601CA 800374C0 0A015488 048ADC7E FC01FD81 0F7D0400 ..)Õ.».•-É...Ì..ät..ò.-ó.tR.... 0001E0
```

Dump of file SATURN:[PCCOMMON.DUMP.PBIN]DBIMP.EXE;1 on 18-APR-1990 10:54:33.53
File ID (384,26,0)   End of file block 77 / Allocated 80

Virtual block number 61 (0000003D), 512 (0200) bytes

```
8A054488 035C8834 7408C2F6 397404C2 F63072E8 D03A72E8 D0E8D0E8 D00008A0 ...ÅÒÅÒÅÒr:ÅÒr0-ô.t9-ô.t4.\..D.. 000000
D053E81C 7C0400FD 81457FE1 80267900 D1800000 15000383 08C2837F E180074C L..Å..6..€.....Ì.y&.Å.E.»..|.ŠSÅ 000020
D1D8D1D8 D1E9007F E180074C 8A054488 035C88CC 72E1D004 72E8D008 E80673E1 Åsø$.ÅÒr.ÅÅrã.\..D..L..Å.ÅÕÌÅÌÙÌ 000040
E0D103FF 05C588A8 C288A8C3 88A8920A D1D8D1D8 D1E9D0DA D1D8D1D8 D1E9D0DA ÕÅÕÌÅÌÙÌÕÅÕÌÅÌÙÌÕ.¨.ù¨.ô¨.é...ÌÅ 000060
80E3800A 5C8A2800 180E8306 EF83C3A8 E10A80E1 800A4C8A C10AE001 E001E001 ÌÅÌÅÌÅ.ê.L..Å..Å¨ù.ÿ.....(.\..D. 000080
D1E8A8E3 0AAD2EA5 2EA52EA5 2E641E8E 1D72E9D0 1472E9D0 E9D0E9D0 0008DE8A ....ÅÕÅÕÅÒr.ÅÒr./.d.Ê.Ê.Ê.Ù.D¨Š1 0000A0
CD88DDF7 03FFC581 3000180E 83F5E8DF 74D80AE6 E864268E E875D80A 0472E9D0 ÅÒr..Ùuò/&dŠÌ.ÙtÕŠ%....0.é..%Ì.ë 0000C0
A8F6E208 D1D0D1D8 D1EAD001 4488036C 88055C88 07548A80 E6800A74 8A04C183 .ê..t..Ì..Ì..\..Ì..D.ÅõÌÙÌÌÌÅã-¨ 0000E0
00103688 000F88D3 88D088ED 333174FF 08F888AD 2686E8A8 C288A8C3 88A8C588 .ê¨.ù¨.ô¨Š.&Ù.%..t13Ù.Ì.€¡...6.. 000100
6C88DFF7 027980E5 80CF8808 4C88C932 00103689 0CC683E8 85E80375 00123638 ;6..u.Ò.Ò.6..6..2è.L...Ù.Ì.y.%Õ.Ì 000120
89024489 0489C033 00103689 0CC683E8 50E80375 00123638 00103688 0259E90A .ÕY..6..;6..u.ÒÌÒ.6..6..3ã...D.. 000140
44F63875 020844F6 00103688 56C30864 8801840A 6488C001 0844C706 44890444 D..D.ùD..å.d.Ç..d.ùV.6..-D..u8-D 000160
648A1875 D808022A E8025C88 1488067C 88046C88 2A7F0FF9 83084C88 2E750108 ..u..L..'..*.Ì..|....\.Ò*..Ùu..d 000180
EDE88000 8A010018 0E83F7E8 D233C3A8 C2885F09 78C23304 74DAF704 79E40A0A ..Õy.%Õt.3òx. .ò ù30Š%.....σ..ŠU 0001A0
E7CEE803 75001236 38001036 88001F88 D38808 33 3D74C508 F888AD26 E888AD26 &Ù.Õ&Ù.%.ét=3Ù.€¡...6..;6..u.Òòó 0001C0
88000783 01C583FF F583FFF7 830C7980 E580CF88 084C88C9 32001036 890CC683 .6..6..2è.L..Ù.Ì.y..%..% .é..•.. 0001E0
```

```
Dump of file SATURN:[PCCOMMON.DUMP.PBIN]DBIMP.EXE;1 on 18-APR-1990 10:54:33.53
File ID (384,26,0)   End of file block 77 / Allocated 80

Virtual block number 62 (0000003E), 512 (0200) bytes

C388ABC2 885F0008 E8560187 E900102D ED33FD88 FF38E901 94E90674 FF0B0A6C l...t.ô..ô8..»3U-..ô..vò.. .ô .ù 000000
067C8B04 6C88337F 1FF98308 4C883275 010B44F6 41750208 44F60010 3688C3A8  ù.6..-D..uA-D..u2.L..*..3.l..|. 000020
33000383 01C283FF F283FFF3 830C79E4 0A0A648A 2175ED08 017CE802 5C881488 ...\.ò|..uu!.d..ôy..#.. ..ô..#.3 000040
D88BAD26 D08BA026 C3023380 00B80100 180E83F6 74DA08C3 DA880233 C30678C3 ùx.ù30.ôù.ôt-.....£..30ù&ù.A&ù.À 000060
E70EE803 75001236 38001036 88003F88 3F74C208 C308C508 F888A026 E888A026 &ù.ô&u.%.é.ù.ôt?¡?..6..;6..u.ò.ô 000080
75ED080F 75FF080A 6C880091 E8037980 E580CF88 084C88C9 32001036 890CC683 .6..6..2è.L..ü.|.y.ô...ì...u..ùu 0000A0
ABC588AB C388AB5F 9297000E E856FE72 E900CEE9 00202D02 33D833EA 88F88808 ..«.ô3Ù30- .ôö.ôr±vò.... .ù .é 0000C0
88046C88 417F3FF9 83084C88 35750108 44F64F75 020844F6 00103688 C3ABC288 .ô ù.6..-D..uO-D..u5.L..¯?.A.l.. 0000E0
90E80375 000E3638 1878C733 0033E803 79E40A0A 648A008A E8025C88 1488067C |....\.ôπ..d..ôy.ô3.3ùx.;6..u.ò. 000100
180E8308 E80275FA 08F808FD 08E5E8D5 88D088ED 33FF33C3 00103689 0CEE83E6 |.Ÿ..6..ù3.3U.¹.f§1.».«.*u.§U... 000120
4C880010 3688C300 07830005 83000383 F50AF7D3 F7D5F7D7 F7E4E880 008F0100 ..¢..§ô%a%Í%Â%ô%.Â..f..■.ù.6...l 000140
0774C208 C308C508 C708C033 0050E802 5C881488 067C8804 6C88207D 3FF98308 ..¹?) .l..|....\.ôP.3â.ù.é.ù.ôt. 000160
D1C933E9 E8010844 C6064489 04448902 44890489 C0010844 C7C30017 E8003F88 ¡?.ô..ùÙD..ô...D..D..D.6O..§ô3è1 000180
046C8902 5C891489 084489C1 030AD108 D100D1DF D1F4E202 72D701D5 D1D3D1E2 ãÌÆÌÌÌør.ã¶ÌôÌÌÌÙÌö.è.D....\..l. 0001A0
02740508 D308137E 30F98358 7D40F983 2874617C 49D9F73F E983C033 C3067C89 .|.ù3ã.ô?%Ì||at+.'a){.'O-..Æ.ft. 0001C0
D10001EF D1F2E200 0002730A D10BD10D D1EFD130 E9830F88 EF88FF33 D788010C ...■3..ÿ.ô.ôôìÿÌÌÌÙìös.ÀÀã ìÿÌÌÌ 0001E0

Dump of file SATURN:[PCCOMMON.DUMP.PBIN]DBIMP.EXE;1 on 18-APR-1990 10:54:33.53
File ID (384,26,0)   End of file block 77 / Allocated 80

Virtual block number 63 (0000003F), 512 (0200) bytes

E022C20A 31750800 0806F629 75040008 06F62000 180E8326 74C00804 D0DAD1D8 UÌôÀ8.8t&.... -....u)-....u1.ô"À 000000
06F6C7E8 D788DF88 EF88FF33 E43201B0 C3F813E8 13081301 C283C033 0873EC00 À§s.3ã.ô..Ä.ô.Ÿù¯.2ô3..ÿ.ô.■§ù-. 000020
75001236 38001036 88FE88CF E8DC7580 0A44F6E2 E8D97580 0A44F6EA 75080008 ...uô-D..u1§ã-D..uÉ§ù.±.6..;6..u 000040
8EC28EDA 8CC08CA5 A5A5A5D8 8EC28EDA 8CC08CFE 87001036 890CC683 E54AE803 .ôJÌ.6..6...±.à.ô.ô.ÆÉÉÉ.¿ ô.ô. 000060
2D257400 003D0F74 7FFF30F6 327FE480 0A748880 E680F48A F78708EF 83AD2608 À&ù.ÿ..%.¶.Ì..t..ô.2-=..t.=. tX- 000080
80E3752C 08026C08 046C88ED 75800006 7C810286 400088C3 08748808 44893FFF .?.D..t.ùı.aÑ..|...uÚ.l..l..,ω. 0000A0
89ED3330 00180E83 CAE80186 C0018807 752C0802 6C08046C 08066C88 DEE801CE ô.§8.l..l..l..,u.¡.ôÑ.§ò....ô3ù. 0000C0
38001036 88A8E60A 7FFF88A5 A5A5A51F 7501C7F6 E5E8066C 89046C89 026C892C ,.l..l..l.§l-ù.u.ÉÉÉÉ¡...l .6..; 0000E0
8BABE60A 7FFF88A8 800088A8 ABA8C033 C3001036 890CEE83 E486E803 75000E36 6..u.ôÑô.Ÿ..6..ù3ã   |..  |...l . 000100
ABABABAB ABC033B3 7502C7F6 C3001036 890CEE83 E492E803 75000E36 38001036 6..;6..u.ô.ô.Ÿ..6..ù-ú.u°3ã 000120
FF050844 88001036 88FE88C3 00103689 0CEE83E4 71E80375 000E3638 00103688 .6..;6..u.ôqô.Ÿ..6..ù.±.6...D... 000140
30E80375 000E3638 08EE83A8 A5A5A5A5 C475FF0A 087C8AE6 0A80E680 0A748A3F ?.t..l..l.|...uãÉÉÉÉ .Ÿ.;6..u.ô= 000160
000AA3AD 26C3800A 74800010 3688C37F 0A648000 103688C3 00103689 0CEE83E4 ô.Ÿ..6..ù.ô...d..ù.6...t..ù&ùÉ.. 000180
08458A0F 810CEF83 FE880010 3688C3A8 FE88000C A1C3A8FE 880006A1 C30006A3 É..ùÀ...± ùÀ...± ù.6...±.ÿ.Ÿ..E. 0001A0
7EC0013D 087D4000 300E7008 440308F7 0279C90A 0A408AE8 D3064588 C82A0F24 $.*à.E.ÆÒ.M..èy.%Â.D.p.±.ə).=.â- 0001C0
D23302E8 0001BAE8 E8010844 C6C00188 F1E80308 44C64000 880979C3 0844890F ..D.ùy.¡.ə6O..§þ¡.ã6O..§ôù..§.30 0001E0

Dump of file SATURN:[PCCOMMON.DUMP.PBIN]DBIMP.EXE;1 on 18-APR-1990 10:54:33.53
File ID (384,26,0)   End of file block 77 / Allocated 80

Virtual block number 64 (00000040), 512 (0200) bytes

FF2EE3D0 085D0AE3 D0E3D008 5C8AD833 0A658A0A 448AF787 02742000 001806F7 %.... t..%.D..e.3U.\.ÀDÀD.}.ÀD.. 000000
8306C683 0004891F 7F1A7C08 45380844 880F86F7 870479C0 0A4678E0 326356A7 ÌVc2ÀxF.ôy..%.Ô.D..;E.|...¿...6.. 000020
C632E800 000D06C6 39E80100 0D06C640 E8400000 06C60E77 0972FCA7 F3FD06C7 ú.»■|er.w.6...ə§ə6....§96....§26 000040
E8097880 E480E574 10000806 F6E5E8E0 788024F2 74100008 06F628E8 41000006 ...À§+-....t $.xÀ§Ì-....tÌ.6.x1§ 000060
E8037500 0E363800 10368814 74020B0C E8887480 E480E032 07741000 0806F600 À-....t■2À.ô.tÉ§É.■t..6..;6..u.ò 000080
8B0724C0 01C4860A 44880E74 000E3638 41800010 3688C300 1036890C EE83E31C .D.Ÿ..6..ù.6..¯A;6..t..D..ãlã$.£ 0000A0
8B6376A7 FF2EE301 085C8AD3 880B3380 240A448A 00103688 C3000DA2 072E630E 8c.■À..ù.6...D.$.3U.Æ.\.1D..ÌvcÉ 0000C0
643A8803 E8642E88 08E864B2 8800E864 A68812E8 649A8817 E8648E88 1CE86482 .d§.É.d§.É.d§.ÉÌd§.Éyd§.É.d§.É:d 0000E0
A52EA52E A52E0010 3E88F388 00103689 0CC683E2 A1E80375 00123638 00103688 .6..;6..u.ôÀã.6..6...■.>...É.É.É 000100
C783EFAE E8087F00 1036380C C683F788 ED09E95A 0473EDE9 E8C3A52E A52EA52E .É.É.Éùôôùs.2ôlù.%.6.;6....ôùÿ.ù 000120
0689EDA8 E95A0473 ED88E8C0 8ED88C18 741C00C1 F7C30010 3E890CEF 83EFE80C .§ÿ.ÿ..>..ùXè..t..À.àôÉùs.2ô ù¿. 000140
03750012 36380010 3688E093 E95A0473 EDA3E8C3 F5E24646 1C89A81D 88048800 ..... ..FFãXùôÉùs.2ô.ù.6..;6..u. 000160
5A0473ED 76E81074 01C0C1F7 C3EF59E8 F787C08E D88C0010 36890CC6 83E228E8 ô+ã.6..6...À.À.XôYÿùXèã.t.ôvùs.2 000180
36890CEE 83E203E8 0375000E 36380010 36881474 C008EF42 E8C28EDA 8CED66E9 ôfù.ô.6ôôÿ.ãt..6..;6..u.ô.ã.Ÿ..6 0001A0
A308442B 0845880C EE83F788 000000A4 06C7ED33 00983E89 00103E88 55C30010 ..ùù.>...>..3ùù.É....%.Ÿ..E.+D.É 0001C0
72045C38 12772572 06443890 42E80875 88067D06 45880450 88024088 158800A2 À....M..]..E.)..u.§8.;D.rXw.;\.r 0001E0
```

```
Dump of file SATURN:[PCCOMMON.DUMP.PBIN]DBIMP.EXE;1 on 18-APR-1990 10:54:33.53
File ID (384,26,0)   End of file block 77 / Allocated 80

Virtual block number 65 (00000041), 512 (0200) bytes

 8314E8D8 750087E8 18740000 A23E8300 8BE81172 14380477 1772024C 3808771E .w.;L.r.w.;.r.ÒE..>Å..t.Ò..uÁ$.. 000000
 83C58850 E08A970A 7D880874 8800E8C4 750073E8 00A0E800 8BE80074 0000A23E >Å..t.Ò..Ò..Òs.uá$..t..)...ÁP.é. 000020
 74ED0809 7502A802 CC8003E8 FDE48005 7501A8F8 E4800000 268A00A4 2E08FCE5 |•..É..&...ð«´.u..ð»$..ä. .u..Ut 000040
 E9ED3300 00268801 CC8003E8 FEE48020 74ED0809 7504A840 CC8003EB BFE48021 !.ð¢$..äa´.u..Ut .ð±$..ä..&..3UÒ 000060
 01CC800C E8FEE480 057540A8 0000A040 CC8003E8 BFE48005 7502A800 00A0F261 a ... ´.u..ð¢$..äa... ´au..ð±$É.ä. 000080
 00A20EFF D001D301 D1D1E201 C3EFE800 03E80574 0000A23E 830C7580 C4F6D7E8 $a-é.u..>Å..t.Ò..$yùiäiii#iÁ..Å. 0000A0
 002CE800 103688C3 4506441B 045C1802 4C181428 C3000100 A406C7C3 0172E5D1 !!r.ùú.É...ù•..L..\..D.Eù.6..Ò,. 0000C0
 63FE8EFE 8810720C D0EA7502 C4F609E8 187510A8 0008A012 72D00020 730CD0C3 ùÁÉs ÅÅr.... ´.u.$.-á.uõÅÉr..±/±c 0000E0
 08448800 000A45C7 004C8F56 0E7503B0 A90A4488 C3008100 180E81F7 8BEDCEE8 ÒöU.%......ù.D.´..uRV¢L.ùE....D. 000100
 F90372FE F8830845 89F8D10A D10901E8 D1400774 01A80254 8B044C8B 065C8848 H.\..L..!. ´.t.a!$!!iÒi½.E..«±r.• 000120
 C1880388 D001E803 F5F7C033 D388FFFF 800373EA 03570880 E3F78075 885239E8 $9R|u¯%D$ÁW.ðs.$...Å3ä¼%.Òii.Å.è 000140
 89D9D1D8 D1DE1301 C183C888 D088F5F7 58F088F5 F7C18803 88D001E8 13F9F5F7 %%!.Òii.Å.è%%.bX%%.i.à.è..ªiUii. 000160
 40FFECCB E8004CBE ECC1E800 983E895F F7880000 05C70000 0245C704 4D89065D }..M.ùE...ú....%_.>..Òê$/L ´ùS.M 000180
 8EC98C56 E8ED3AC3 5F008CBE A52EA52E A52EA52E A52EA52E 008C8F57 C3F78808 ..%ùW¢...É.É.É.É¯É.É/.._ù:U ' è. 0001A0
 87F78707 1F061E08 79C90A57 56064575 D13A80E2 800A5588 2680E180 0A4C88D9 !.L..Å.&.U..ã.:!uÉ.VW.èÿ......4. 0001C0
 CA3B3FFF C2810855 88263FFF C181084C 88CA77ED 0A2875F5 3A01E680 01E580CA ò.|..|.:%u(.Uwò.L..è.?&.U..ó.?;ò 0001E0

Dump of file SATURN:[PCCOMMON.DUMP.PBIN]DBIMP.EXE;1 on 18-APR-1990 10:54:33.53
File ID (384,26,0)   End of file block 77 / Allocated 80

Virtual block number 66 (00000042), 512 (0200) bytes

 E80080BF C3D98EC1 8C075E5F FCA70175 A70475A7 0775A7F0 06C78306 C6831175 u..ó..ú.»!u.!u.!u.!•_^..è.!ù¢..Ò 000000
 56510098 3E89EC97 E85F91AD 2E5EEC20 E800983E 89ECC1E8 00748F53 5657ECCA ð$WVS¢t.Òê$.>..Ò $^.Ū._Ò.$.>..ÒV 000020
 C6835EE8 F5E85356 5EDE88E9 E2595EEC 18E8FF56 E8560CC6 835EEC0C E800748E /t.Ò.$^.ó.VòV.Ò.$^Yäð.Ā¯VSÒ%$^.6 000040
 748E560C C6835159 5EE8F2E8 00983E89 00748E56 51EC66E8 F8885758 91AD2E0C ..Ù.[W.«Ò!$QV/t..>..Ò $ ‹O.ó.V/t 000060
 00103688 56001EE8 00103688 C35FF788 E9E2595E E8D0E8FF 18E8565E E8CEE800 .Òö$^VÒ..Òi$^Yäð.%_ù.6..ú..V.6.. 000080
 C3FF5DE8 648E88C3 EC34E85E 00103E88 00103689 0CC6830F 05E80375 0012363B ;6..u.Ò.Ò.6..6...>¯..^Ò4$ùE/dÒ].ù 0000A0
 DEDEE803 75000E36 38001036 88001036 880019E8 0CEF830A 4488F788 00103E88 .>...%.Ò..ÿ.Ò...6...6..;6..u.ÒRR 0000C0
 E8E8004C 8FF78836 73FEC6E8 6446BE00 80E86AE8 00983E89 C3001036 890CEE83 .Y..6..û.>..Òj$¯./FdÒó±s6.%¢L.Ò$ 0000E0
 E864528E FE88575E E835E8FE 8FE8643A 8EE843E8 00983E89 FE9CE864 528E56E8 $V/RdÒ.±.>..ÒC$/:dÒ.±Ò$$^W.±/RdÒ 000100
 58E81AE8 00983E89 FEE4E865 2288F788 500180E8 35E85EE8 40E80098 3E89FE82 .±.>..Òa$^Ò$$¯.P.%E"eÒÒ±.>..Ò.$X 000120
 89F78757 FECOE865 9288C300 01E80010 3688C3E8 1CE8FE5A E8645E8E 0974C00A .åt./^dÒZ±Ò.$ù.6..Ò..ùE.eÒÅ±V.%. 000140
 830A4488 F7880010 3E88C3F7 880845FF EAE9E800 983E895F F788EAE7 E800983E >..Òóõ.%_.>..Òõõ.E..%ù.>...%.D.. 000160
 8856C300 1036890C EE830E28 E8037500 0E363800 10368800 10368800 19E80CEF ÿ.Ò...6.¯.6..;6..u.Ò(R.Y..6..ùV. 000180
 77FDFEE8 646A8E00 000845C7 08508BE8 38E80068 8F575EFE 88E845E8 005C8FF7 %¢\.ÒE$.±^Weh.Ò;$.].ùE.../jdÒ±»w 0001A0
 D808C033 580069E8 535F58F7 88EA7AE8 00983E89 FD08E864 3A8E5343 084DFF04 ..M.CS/:dÒÅ».>..Òzõ.%[_SÒi.[3à.Ù 0001C0
 C188ABC3 88A8A8A8 00688FD8 D157F873 E3D14900 1089D8F7 80820479 D0883974 ¢9.Åy.ÿ.%Ù¿..!!Ds«WiÙ¢ñ.   .ù .è 0001E0

Dump of file SATURN:[PCCOMMON.DUMP.PBIN]DBIMP.EXE;1 on 18-APR-1990 10:54:33.53
File ID (384,26,0)   End of file block 77 / Allocated 80

Virtual block number 67 (00000043), 512 (0200) bytes

 00103E88 C3EA4EE8 00983E89 5FF788EA 41E80098 3E890068 8E005C8F A8C288A8 ¨.ò¨¢\./h..>..ÒAõ.%_.>..ÒNõù.>.. 000000
 890CEE83 0082E803 75000E36 38001036 88001036 880019E8 0CEF830A 4488F788 .%.D..ÿ.Ò...6...6..;6..u.Ò.!.Y.. 000020
 0845FFEA 05E85EEA 10E80098 3E89FD52 E864768E 56EAA1E8 004C8F57 C3001036 6..ùW¢L.ÒÅõV/vdÒR».>..Ò.ò^Ò.ò.E. 000040
 00000000 0000C3E9 D9E80098 3E895FF7 88E9EAE8 00983E89 FD84E865 DE88F788 .%É8eÒÇ».>..Òõõ.%_.>..Ò!Òù...... 000060
 2502887F D28A7F74 068C7F72 1E8921CD 3502881F 0E1E0000 00000000 00000000 .............|.5¢T..r...t.¤ø.|.% 000080
 2E250288 52501EC3 1F21CD25 23887F8A 8A7F7806 8C7F761E 8921CD35 238821CD ¢!|#5¢!..v...x.¤¤.|#%¢!.ù.PR|.%. 0000A0
 2EFF2E58 5A1F21CD 2523887F 7616C52E FFE9E81E 5250C31F 585A21CD 7F7216C5 é.r.¢!Z%.ùPR.ÒÒ..é.v.|#%¢!.Z%... 0000C0
 7F722EFF 2ECFDCF4 E8047480 7F7006F6 2E59FEE2 00038951 7F703E00 2E907F76 v...!>p.O¿..â±Y.-.p..t.Ò¶Éü...r. 0000E0
 00020436 010300F6 0002000F 01030065 0004050A 02030000 00014065 00020028 •...eM......Ö...e.......-...6... 000100
 00044A13 00020005 00011478 01030000 00030582 00020000 00026796 000200F7 %....g......ÿ.......x.........J.. 000120
 0002041E 01030090 0001488A 0103008A 00014036 01030089 00013C00 01030000 .....<......6M......¤M.......... 000140
 00014C8C 01030021 000111C6 01030088 00014473 01050087 00014055 01050088 ....Ua......sD......6...!...¥L.. 000160
 00015803 01030026 00014007 01030016 000307F9 02030004 00054906 01030022 ".....!......•.......M..&...&[.. 000180
 00015854 01030031 00015A80 0103001F 00030827 02030028 00015A83 01030027 '...°Z..+...'.......$Z..1...![.. 0001A0
 00012EEE 01030038 000139F0 0103003A 00013C8C 01030028 00030816 02030034 4.......(....<..:...b9..;...Y... 0001C0
 00020026 01030041 00010C96 01030031 00030830 02030040 00010C86 0103003C <.......a...0...1.......A...&... 0001E0
```

Dump of file SATURN:[PCCOMMON.DUMP.PBIN]DBIMP.EXE;1 on 18-APR-1990 10:54:33.53
File ID (384,26,0)   End of file block 77 / Allocated 80

Virtual block number 68 (00000044), 512 (0200) bytes

```
000307EA 02030046 000139C7 01030044 00013AAC 0103003B 00020429 0103003A :...)...;...`:..D...ú9..!  .õ... 000000
000109DB 01030059 0001589D 01030040 00013A09 0103004B 00013AE0 0103003A :...Á:..K....:..M....[..Y'..Ü... 000020
00000000 0000005C 00040003 02030053 00040995 0203004A 000407D0 0203005C \...Å...J.......S...Ř...\....... 000040
00000000 00000000 00000000 014E0000 00A60000 00000000 00000000 00000000 ...............Ï...N............ 000060
6F432020 20797261 7262694C 20656069 54206E75 5220534D 00000000 00000000 ........MS Run-Time Library - Co 000080
70726F43 2074666F 736F7263 694D202C 38383931 20296328 20746867 69727970 pyright (c) 1988, Microsoft Corp 0000A0
656C6966 20676F6C 206E6570 6F206F74 20656C62 6120656C 62616E55 00770011 ..w.Unable able to open log file 0000C0
4D484341 42204E4F 474F4C00 0A656D61 6E6C6564 6F6D2073 25206567 61735500 .Usage %s modelname..LOGON BACHM 0000E0
726F6620 656C6966 20726176 206E6570 6F206F74 20656C62 616E5500 72004E41 AN.r.Unable to open var file for 000100
656C6261 6E550077 006E6968 63656843 20726567 616E614D 61746144 00732520  %s.DataManager Checkin.w.Unable 000120
614D6174 61440073 2520726F 6620656C 69662068 726F7720 6E65706F 206F7420  to open work file for %s.DataMa 000140
31562074 73796C61 6E41206E 616D6863 6142006E 69686365 68432072 6567616E nager Checkin.Bachman Analyst V1 000160
2520726F 6620656C 69662072 61762065 6C62617A 696E676F 6365726E 5500302E .0.Unrecognizable var file for % 000180
002A002A 2A002C64 6C25006E 69686365 68432072 6567616E 61446174 61440073 s.DataManager Checkin.%ld,.**.*. 0001A0
6920796C 6C756673 73656363 75732073 25206C65 646F4D00 47554245 444C4D44 DMLDEBUG.Model %s successfully i 0001C0
69206F74 20656D69 54202E65 73616261 74616420 6F746E69 20646574 726F706D mported into database. Time to i 0001E0
```

Dump of file SATURN:[PCCOMMON.DUMP.PBIN]DBIMP.EXE;1 on 18-APR-1990 10:54:33.53
File ID (384,26,0)   End of file block 77 / Allocated 80

Virtual block number 69 (00000045), 512 (0200) bytes

```
25206C65 646F4D00 73646E6F 63657320 66322E25 206C6564 6F6D2074 726F706D mport model %.2f seconds.Model % 000000
74616420 6F746E69 20646574 726F706D 6920796C 6C756673 73656363 75732073 s successfully imported into dat 000020
745C3A63 00006E69 6B636568 43207265 67616E61 4D617461 44002E65 73616261 abase..DataManager Checkin..c:\t 000040
006B7277 2E706D69 62645F5C 706D745C 3A630072 61762E70 6D696264 5F5C706D mp\_dbimp.var.c:\tmp\_dbimp.wrk. 000060
20656C62 6120656C 62616E55 00770067 6F6C2E70 6D696264 5F5C706D 745C3A63 c:\tmp\_dbimp.log.w.Unable able  000080
204F544E 49205452 45534E49 00656C69 66207475 7074756F 206E6570 6F206F74 to open output file.INSERT INTO  0000A0
2A2A2A2A 2A2A2A2A 2A2A2A2A 2A2A2A2A 2A2A2A2A 2A2A2A2A 2A2A2A2A 2A2A0A00 ..****************************** 0000C0
2074726F 706D6920 676E696E 6E696765 42000A2A 2A2A2A2A 2A2A2A2A 2A2A2A2A *************..Beginning import  0000E0
0A44454C 49414620 73252046 4F205452 4F504D49 00732500 72000A73 2520666F of %s..r.%s.IMPORT OF %s FAILED. 000100
2A2A2A2A 2A000A73 25204445 54524F50 4D492059 4C4C5546 53534543 43555300 .SUCCESSFULLY IMPORTED %s..***** 000120
2A2A2A2A 2A2A2A2A 2A2A2A2A 2A2A2A2A 2A2A2A2A 2A2A2A2A 2A2A2A2A 2A2A2A2A ******************************** 000140
756F206E 65706F20 6F742065 6C626120 656C6261 6E550077 000A2A2A 2A2A2A2A ******..w.Unable able to open ou 000160
41420000 67736D2E 706D6975 6C71735C 706D745C 3A630065 6C696620 74757074 tput file.c:\tmp\sqluimp.msg..BA 000180
4C445000 00000000 00000000 00000000 0000004C 4450004C 4544004E 414D4843 CHMAN.DEL.PDL................PDL 0001A0
544F4F52 5F535345 434F5250 5F4C4450 0000444F 4854454D 5F595449 544E455F _ENTITY_METHOD..PDL_PROCESS_ROOT 0001C0
4E524554 4E495F4C 44500000 434F5250 5F4C414E 52455458 455F4C44 50000000 ...PDL_EXTERNAL_PROC..PDL_INTERN 0001E0
```

Dump of file SATURN:[PCCOMMON.DUMP.PBIN]DBIMP.EXE;1 on 18-APR-1990 10:54:33.53
File ID (384,26,0)   End of file block 77 / Allocated 80

Virtual block number 70 (00000046), 512 (0200) bytes

```
444E4553 00000000 00000054 4E454D45 54415453 5F4F4400 00434F52 505F4C41 AL_PROC..DO_STATEMENT.......SEND 000000
544E454D 45544154 535F4556 49454345 52000000 0000544E 454D4554 4154535F _STATEMENT.....RECEIVE_STATEMENT 000020
54415453 5F455441 45524300 0000544E 454D4554 4154535F 4C414E47 49530000 ..SIGNAL_STATEMENT...CREATE_STAT 000040
54414450 55000000 544E454D 45544154 535F4554 454C4544 00000054 4E454D45 EMENT...DELETE_STATEMENT...UPDAT 000060
544E454D 45544154 535F4556 45495254 45520000 00544E45 4D455441 54535F45 E_STATEMENT...RETRIEVE_STATEMENT 000080
42495254 54415F50 554F5247 00000000 45545542 49525454 415F5245 44524F00 .ORDER_ATTRIBUTE....GROUP_ATTRIB 0000A0
46494553 4C450000 00000000 00544E45 4D455441 54535F46 49000000 00455455 UTE....IF_STATEMENT.......ELSEIF 0000C0
00000000 00544E45 4D455441 54535F45 53414300 0000544E 454D4554 4154535F _STATEMENT...CASE_STATEMENT..... 0000E0
4D455441 54535F4E 47495353 41000000 00000052 4F544345 4C45535F 45534143 CASE_SELECTOR.......ASSIGN_STATEM 000100
5059544E 45485700 00544E45 4D455441 54535F48 43414552 4F460000 00544E45 ENT...FOREACH_STATEMENT..WHENTYP 000120
50000000 0000544E 454D4554 4154535F 504F4F4C 00544E45 4D455441 54535F45 E_STATEMENT.LOOP_STATEMENT.....P 000140
0000454C 42414952 41565F4C 44500000 0000004E 4F495353 45525058 455F4C44 DL_EXPRESSION.....PDL_VARIABLE.. 000160
534E4F43 5F4C4450 00000000 54534E4F 43454C50 4D49535F 4C445000 00000000 .....PDL_SIMPLECONST....PDL_CONS 000180
4E450000 00000054 4E454D45 54415453 5F4E4548 57000000 00000000 544E4154 TANT.......WHEN_STATEMENT.....EN 0001A0
43555254 53505041 5F424952 54544100 00005443 55525453 5050415F 59544954 TITY_APPSTRUCT...ATTRIB_APPSTRUC 0001C0
54415453 5F45544F 4E000000 00000045 54454C4F 53424F5F 50504154 00000054 T...TAPP_OBSOLETE......NOTE_STAT 0001E0
```

```
Dump of file SATURN:[PCCOMMON.DUMP.PBIN]DBIMP.EXE;1 on 18-APR-1990 10:54:33.53
File ID (384,26,0)   End of file block 77 / Allocated 80

Virtual block number 71 (00000047), 512 (0200) bytes

00000000 00000000 4E454857 5F444552 45474749 52540000 00000054 4E454D45 EMENT.....TRIGGERED_WHEN........ 000000
414D4843 41424342 43414241 416F0000 00000000 00000000 00000000 00000000 ..................oAARACBCBACHMA 000020
414D4843 41422020 20202020 20204745 4D537647 415A2020 204C4544 4F4D204E N MODEL   ZAGvSMEG        BACHMA 000040
00000000 00000000 00000000 00000000 FFFF0000 14430000 00000000 0000004E N.........C...................... 000060
00000000 00000000 00000000 00000000 00000000 00000000 00000000 00000000 ................................ 000080
00000000 00000000 00000000 00000000 00000000 00000000 00000000 00000000 ................................ 0000A0
00000000 00000000 00000000 00000000 00000000 00000000 00000000 00000000 ................................ 0000C0
00000000 00000000 00000000 00000000 00000000 00000000 00000000 00000000 ................................ 0000E0
00000000 00000000 00000000 00000000 00000000 00000000 00000000 00000000 ................................ 000100
00000000 00000000 00000000 00000000 00000000 00000000 00000000 00000000 ................................ 000120
00000000 00000000 00000000 00000000 00000000 00000000 00000000 00000000 ................................ 000140
00000000 00000000 00000000 00000000 00000000 00000000 00000000 00000000 ................................ 000160
00000000 00000000 00000000 00000000 00000000 00000000 00000000 00000000 ................................ 000180
00000000 00000000 00000000 00000000 00000000 00000000 00000000 00000000 ................................ 0001A0
00000000 00000000 00000000 00000000 00000000 00000000 00000000 00000000 ................................ 0001C0
00000000 00000000 00000000 00000000 00000000 00000000 00000000 00000000 ................................ 0001E0

Dump of file SATURN:[PCCOMMON.DUMP.PBIN]DBIMP.EXE;1 on 18-APR-1990 10:54:33.53
File ID (384,26,0)   End of file block 77 / Allocated 80

Virtual block number 72 (00000048), 512 (0200) bytes

00000000 00000000 00000000 00000000 00000000 00000000 00000000 00000000 ................................ 000000
00000000 00000000 00000000 00000000 00000000 00000000 00000000 00000000 ................................ 000020
00000000 00000000 00000000 00000000 00000000 00000000 00000000 00000000 ................................ 000040
00000000 00000000 00000000 00000000 00000000 00000000 00000000 00000000 ................................ 000060
00000000 00000000 00000000 00000000 00000000 00000000 00000000 00000000 ................................ 000080
00000000 00000000 00000000 00000000 00000000 00000000 00000000 00000000 ................................ 0000A0
00000000 00000000 00000000 00000000 00000000 00000000 00000000 00000000 ................................ 0000C0
00000000 00000000 00000000 00000000 00000000 00000000 00000000 00000000 ................................ 0000E0
00000000 00000000 00000000 00000000 00000000 00000000 00000000 00000000 ................................ 000100
00000000 00000000 00000000 00000000 00000000 00000000 00000000 00000000 ................................ 000120
00000000 00000000 00000000 00000000 00000000 00000000 00000000 00000000 ................................ 000140
00000000 00000000 00000000 00000000 00000000 00000000 00000000 00000000 ................................ 000160
00000000 00000000 00000000 00000000 00000000 00000000 00000000 00000000 ................................ 000180
00000000 00000000 00000000 00000000 00000000 00000000 00000000 00000000 ................................ 0001A0
00000000 00000000 00000000 00000000 00000000 00000000 00000000 00000000 ................................ 0001C0
00000000 00000000 00000000 00000000 00000000 00000000 00000000 00000000 ................................ 0001E0

Dump of file SATURN:[PCCOMMON.DUMP.PBIN]DBIMP.EXE;1 on 18-APR-1990 10:54:33.53
File ID (384,26,0)   End of file block 77 / Allocated 80

Virtual block number 73 (00000049), 512 (0200) bytes

00000000 00000000 00000000 00000000 00000000 00000000 00000000 00000000 ................................ 000000
00000000 00000000 00000000 00000000 00000000 00000000 00000000 00000000 ................................ 000020
00000000 00000000 00000000 00000000 00000000 00000000 00000000 00000000 ................................ 000040
0001FFFF 00304F46 4E495F43 4C49465F 435F05EC 00000000 00000000 00000000 ............§._C_FILE_INFO=..... 000060
00000000 00000000 00000000 00000000 00000000 00010000 00000000 00000000 ................................ 000080
00010F98 00940000 0A3C0094 005C005C 00000000 00000000 00000000 00000000 ................\.\...<......... 0000A0
00000000 00000000 02020000 00000000 00000000 01020000 00000000 00000000 ................................ 0000C0
00000000 00000000 00000000 00000000 00000000 00000000 00000000 00000000 ................................ 0000E0
00000000 00000000 00000000 00000000 00000000 00000000 00000000 00000000 ................................ 000100
00000000 00000000 00000000 00000000 00000000 00000000 00000000 00000000 ................................ 000120
00000000 00000000 00000000 00000000 00000000 00000000 00000000 00000000 ................................ 000140
00000000 00000000 00000000 00000000 00000000 00000000 00000000 00000000 ................................ 000160
00000000 00000000 00000000 00000000 00000000 00000000 00000000 00000000 ................................ 000180
00000000 00000000 00000000 00000000 00000000 00000000 02000001 00000000 ................................ 0001A0
00000000 00000000 00000000 00000000 00000000 00000000 00000000 00000000 ................................ 0001C0
00000000 00000000 00000000 00000000 00000000 00000000 00000000 00000000 ................................ 0001E0
```

```
Dump of file SATURN:[PCCOMMON.DUMP.PBIN]DBIMP.EXE;1 on 18-APR-1990 10:54:33.53
File ID (384,26,0)    End of file block 77 / Allocated 80

Virtual block number 74 (0000004A), 512 (0200) bytes

05EE0818 00000000 00000000 00000000 00000000 00000000 00000000 00000000 ...............................Y. 000000
20202020 20202020 20202020 20202020 20282828 28282020 20202020 20202000 .        (((((                   000020
10101010 10848484 84848484 84848410 10101010 10101010 10101010 10104820  H............................... 000040
10101010 01010101 01010101 01010101 01010101 01010101 81818181 81811010 ................................ 000060
10101010 02020202 02020202 02020202 02020202 02020202 82828282 82821010 ................................ 000080
00000000 00000000 00000000 00000000 00000000 00000000 00000000 00000020 ................................ 0000A0
00000000 00000000 00000000 00000000 00000000 00000000 00000000 00000000 ................................ 0000C0
00000000 00000000 00000000 00000000 00000000 00000000 00000000 00000000 ................................ 0000E0
00000000 00000000 00000000 00000000 00000000 00000000 00000000 00000000 ................................ 000100
646E616D 6D6F6300 6578652E 646D6300 632F0043 4550534D 4F430000 00000000 ......COMSPEC./c.cmd.exe.command 000120
00000000 00000CD4 32380CD0 31280CCC 32660CC8 319EFFFF 37140000 6D6F632E .com...7...1à.f2ä.(1Å.82å....... 000140
00000000 00000000 00000000 00000000 81818100 14000000 00000000 00000000 ................................ 000160
00000000 00000000 0000000A 0A0A0A0A 0A0A0A0A 0A0A0A0A 0A0A0A0A 0A0A0A00 ................................ 000180
756E2800 296C6C75 6E280000 00000000 00000000 00000000 00000000 00000000 ......................(null).(nu 0001A0
00000058 37AA0D54 37AA0D50 37AA0D4C 37AA0F7E 37AA0000 23202028 00296C6C ll).+- #..`7~.`7L.`7P.`7T.`7X... 0001C0
2865002E 2E002E00 3F2A0000 5C004854 41500065 78652E00 6D6F632E 01010000 .....com..exe.PATH.\..*?......e+ 0001E0

Dump of file SATURN:[PCCOMMON.DUMP.PBIN]DBIMP.EXE;1 on 18-APR-1990 10:54:33.53
File ID (384,26,0)    End of file block 77 / Allocated 80

Virtual block number 75 (0000004B), 512 (0200) bytes

00850097 0078005A 0038001E FFFF0000 15A0FFFF FFFF0000 00000000 00303030 000...................;.Z.x...ç. 000000
011000F2 00D30084 00960077 0059003A 001EFFFF 0160014E 01300111 00F30004 â.µ...0.N.m.....:.Y.w...Ç.Æ.`... 000020
0F9C0DCE 0DDE0DCA 00010000 46500054 44450054 53450000 5A54016C 014D012F /.M.l.TZ..EST.EDT.PF....Ò.Ñ.ö... 000040
41726140 6265466E 614A0074 61536972 46756854 64655765 75546E6F 4D6E7553 SunMonTueWedThuFriSat.JanFebMarA 000060
00000002 00006365 44766F4E 74634F70 65536775 416C754A 6E754A79 614D7270 prMayJunJulAugSepOctNovDec...... 000080
00000000 00000000 00000000 00000000 00000000 00000000 00000000 00000000 ................................ 0000A0
35303430 33303230 31300000 00000000 00000000 00000000 00000000 00000000 ......................0102030405 0000C0
00000000 00000000 00000000 78783136 4D053231 31313031 39303830 37303630 06070809101112.M61xx............ 0000E0
00000000 00000000 00000000 00000000 00000000 00002000 00000000 00000000 ................................ 000100
32000000 00444E49 23310546 4E492331 054E414E 23310500 00000000 00000000 ..........1#NAN.1#INF.1#IND....2 000120
00000000 00000000 00000000 00000000 00000043 41C37937 E0800024 66800013 ...f$..ÂÃ7yÚAC.................. 000140
00000000 00000000 00000000 00000000 00000000 00000000 00000000 00000000 ................................ 000160
00000000 00000000 00000000 00000000 00000000 00000000 00000000 00000000 ................................ 000180
00000000 00000000 00000000 00000000 00000000 00000000 00000000 00000000 ................................ 0001A0
00000000 00009000 00000000 00000000 00000000 00000000 00000000 00000000 ................................ 0001C0
0CD8138E 00133200 00000000 43FEFFFF FFFFFFFF FC000000 00000000 00000000 ...........•......±C.....2....Ã. 0001E0

Dump of file SATURN:[PCCOMMON.DUMP.PBIN]DBIMP.EXE;1 on 18-APR-1990 10:54:33.53
File ID (384,26,0)    End of file block 77 / Allocated 80

Virtual block number 76 (0000004C), 512 (0200) bytes

0F9A0F9E 089E0F96 0F940F92 FFFF0F8C 4A540F84 4A0CFFFF 0166005C 5A960000 ...Z\.f....J..TJ................ 000000
68636174 7320200A 00303030 36520000 3E3E4753 4D4E3C3C 00000000 00000000 ........<<NMSG>>..R6000..- stack 000020
64207265 6765746E 6920200A 00333030 36520003 000A0D77 6F6C6672 65766F20  overflow.....R6003..- integer d 000040
756F6E65 20746F6E 20200A0D 38303036 52000800 0A0D3020 79622065 64697669 ivide by 0.....R6008..- not enou 000060
39303036 52000900 0A0D7374 6E656D75 67726120 726F6620 65636170 73206867 gh space for arguments.. ..R6009 000080
6E6F7269 766E6520 726F6620 65636170 73206867 756F6E65 20746F6E 20200A0D ..- not enough space for  nviron 0000A0
00020020 726F7272 65206560 6974206E 757200FF 000A0D00 FC000A0D 746E6560 ment...•......run-time err.: ... 0000C0
64616F6C 20746F6E 20746E69 6F702067 6E697461 6F6C6620 200A0D32 30303652 R6002..- floating point not load 0000E0
73736120 7265746E 696F7020 6C6C756E 20200A0D 31303036 52000100 0A0D6465 ed.....R6001..- null pointer ass 000100
7020676E 6974616F 6C66202D 0A0D4854 414D203A 00F0000A 00746E65 6D6E6769 ignment...».: MATH..- floating-p 000120
726F6E65 64006600 0A0D6469 6C61766E 69006500 203A726F 72726520 746E696F oint error: .e.invalid...f.denor 000140
776F6C66 7265766F 0068000A 0D302079 62206564 69766964 0067000A 006C616D mal...g.divide by 0...h.overflow 000160
75006800 0A0D7463 6178656E 69006A00 0A0D776F 6C667265 646E7500 69000A00 ...i.underflow...j.inexact...k.u 000180
0A0D006D 000A0D74 6F6F7220 65726175 7173006C 000A0D64 6574616C 7560656E nemulated...l.square root...m... 0001A0
65646E75 20686361 7473006F 000A0D77 6F6C6672 65766F20 68636174 73006E00 .n.stack overflow...o.stack unde 0001C0
0A0D6465 74617265 6E656720 796C7469 63696C70 78650070 000A0D77 6F6C6672 rflow...p.explicitly generated.. 0001E0
```

```
Dump of file SATURN:[PCCOMMON.DUMP.PBIN]DBIMP.EXE;1 on 18-APR-1990 10:54:33.53
File ID (384,26,0)   End of file block 77 / Allocated 80

Virtual block number 77 (0000004D), 512 (0200) bytes

6E6F2079 726F6D65 6D206867 756F6E65 20746F6E 20200A0D 35303036 52000500 ...R6005..- not enough memory on 000000
6E6F2074 616D726F 66206461 6220200A 00363030 36520006 000A0063 65786520  exec.....R6006..- bad format on 000020
656D6E6F 7269766E 65206461 6220200A 00373030 36520007 000A0063 65786520  exec.....R6007..- bad environme 000040
00020F88 00020000 00010F90 00020004 FFFFFF00 0A006365 7865206E 6F20746E nt on exec...................... 000060
00000000 00000000 00000000 00000000 00040DDA 00020000 00030A36 00020000 ....6.......Ö................... 000080
00000000 00000000 00000000 00000000 00000000 00000000 00000000 00000000 ................................ 0000A0
00000000 00000000 00000000 00000000 00000000 00000000 00000000 00000000 ................................ 0000C0
00000000 00000000 00000000 00000000 00000000 00000000 00000000 00000000 ................................ 0000E0
00000000 00000000 00000000 00000000 00000000 00000000 00000000 00000000 ................................ 000100
00000000 00000000 00000000 00000000 00000000 00000000 00000000 00000000 ................................ 000120
00000000 00000000 00000000 00000000 00000000 00000000 00000000 00000000 ................................ 000140
00000000 00000000 00000000 00000000 00000000 00000000 00000000 00000000 ................................ 000160
00000000 00000000 00000000 00000000 00000000 00000000 00000000 00000000 ................................ 000180
00000000 00000000 00000000 00000000 00000000 00000000 00000000 00000000 ................................ 0001A0
00000000 00000000 00000000 00000000 00000000 00000000 00000000 00000000 ................................ 0001C0
00000000 00000000 00000000 00000000 00000000 00000000 00000000 00000000 ................................ 0001E0

Dump of file SATURN:[PCCOMMON.DUMP.MSG]DEL.MSG;1 on 18-APR-1990 10:54:01.27
File ID (990,7,0)   End of file block 1 / Allocated 4

Virtual block number 1 (00000001), 512 (0200) bytes

29000000 00000000 00000000 00000000 01000000 0553454D 00464753 4D4B4DFF .MKMSGF.MES....................) 000000
27322527 202C2731 25272066 6F206E6F 6974656C 65444901 31000D00 A8006100 .a.`.1.1.IDeletion of '%1', '%2' 000020
002E2734 2527202C 27332527 20666F20 6E6F6974 656C6564 20646573 75616320  caused deletion of '%3', '%4'.. 000040
20646573 75616320 27322527 202C2731 25272066 6F206E6F 6974656C 6544490A .IDeletion of '%1', '%2' caused  000060
2C273325 27202074 63656A62 6F206E61 6870726F 20666F20 6E6F6974 656C6564 deletion of orphan object  '%3', 000080
20273225 27202C27 31252720 666F206E 6F697465 6C654449 0A0D2E27 34252720  '%4'...IDeletion of '%1', '%2'  0000A0
6544490A 002E2735 25272027 34252720 6D6F7266 20273325 27206465 73756163 caused '%3' from '%4' '%5'...IDe 0000C0
27332527 20646573 75616320 27322527 202C2731 25272066 6F206E6F 6974656C letion of '%1', '%2' caused '%3' 0000E0
71657362 75732064 6E612079 74706D65 2065606F 63656220 6F742027 34252720  '%4' to become empty and subseq 000100
25272066 6F206E6F 6974656C 6544490A 002E6465 74656C65 6420796C 746E6575 uently deleted...IDeletion of '% 000120
62606560 20666F20 6E6F6974 656C6564 20646573 75616320 27322527 202C2731 1', '%2' caused deletion of memb 000140
00000000 00000000 00000000 00000A0D 0A0D202E 27342527 20273325 27207265 er '%3' '%4'. .................. 000160
00000000 00000000 00000000 00000000 00000000 00000000 00000000 00000000 ................................ 000180
00000000 00000000 00000000 00000000 00000000 00000000 00000000 00000000 ................................ 0001A0
00000000 00000000 00000000 00000000 00000000 00000000 00000000 00000000 ................................ 0001C0
00000000 00000000 00000000 00000000 00000000 00000000 00000000 00000000 ................................ 0001E0

Dump of file SATURN:[PCCOMMON.DUMP.DLL]DFM.TMP;1 on 18-APR-1990 10:44:03.15
File ID (618,10,0)   End of file block 65 / Allocated 68

Virtual block number 1 (00000001), 512 (0200) bytes

00000000 00000040 00000000 000000B8 0000FFFF 00000004 0000003F 00F65A4D MZ-.?...........|.......a....... 000000
00000080 00000000 00000000 00000000 00000000 00000000 00000000 00000000 ................................ 000020
6F6E6E61 63206D61 72676F72 70207369 685421CD 4C01B821 CD09B400 0EBA1F0E ..o..Ç.ê!|.Lê!This program canno 000040
00000000 00000024 0A0D0D2E 65646F6D 20534F44 206E6920 6E757220 65622074 t be run in DOS mode....$....... 000060
00080008 00000000 00070000 00000000 000A8009 7E4060CA 00B1059A 0505454E NE....Ÿ.ò'a-.................... 000080
00000000 00000000 00010001 00040000 000006C8 04180408 009C0098 0040002B +.a.........ú................... 0000A0
01840F00 01840205 071E0F00 071E0186 09580F00 095700E8 06E40F00 06E30070 p.D...ő.Š.W...X................. 0000C0
19960F00 1996047A 000F0F00 000F0478 1A3A0F00 1A3902CC 0A060F00 0A050220  ........8.9...:.x.......z....... 0000E0
4D464403 00010001 04201EF1 042007D1 1CE00F21 1B4C061A 02020E21 00000000 ....!.....L.!.Â.!. .þ. ......DFM 000100
48535952 4555514D 46441300 02444C45 49465245 54534947 45524D46 44100000 ...DFMREGISTERFIELD...DFMQUERYSH 000120
50554F52 47544944 4545484I 4D545345 4E4D4644 14000353 55544154 53544649 IFTSTATUS...DFMNESTMAKEEDITGROUP 000140
46441800 05444554 43454C45 534D4554 49595245 55515453 454E4D46 44180004 ...DFMNESTQUERYITEMSELECTED...DF 000160
434F5250 4D464419 00064445 5443454C 4553454S 54495952 45555154 53494C40 MLISTQUERYITEMSELECTED...DFMPROC 000180
45494659 52455551 4D464416 0007444E 414D404F 43544944 45545349 4C535345 ESSLISTEDITCOMMAND...DFMQUE:YFIE 0001A0
4650554F 52475952 45555154 53454E4D 46441700 08535449 42454C59 5453444C LDSTYLEBITS...DFMNESTQUERYGK 'PF 0001C0
19000A41 54414452 45535544 4C454946 59524555 514D4644 15000953 444C4549 IELDS...DFMQUERYFIELDUSERDATA  . 0001E0
```

```
Dump of file SATURN:[PCCOMMON.DUMP.DLL]DFM.TMP;1 on 18-APR-1990 10:44:03.15
File ID (618,10,0)   End of file block 65 / Allocated 68

Virtual block number 2 (00000002), 512 (0200) bytes

 53404644 10000844 4E41404D 4F435449 44455453 454E5353 45434F52 50404644 DFMPROCESSNESTEDITCOMMAND...DFMS 000000
 00004E46 444E4140 404F4354 45534046 440F000C 4E465347 52414C4F 4F545445 ETTOOLARGSFN...DFMSETCOMMANDFN.. 000020
 454C4544 5453494C 40464411 000E4045 54494554 454C4544 5453454E 40464411 .DFMNESTDELETEITEM...DFMLISTDELE 000040
 4555514D 46440E00 1040524F 46535345 434F5250 4046440E 000F4045 54494554 TEITEM...DFMPROCESSFORM...DFMQUE 000060
 53454E4D 46440E00 124C4F4F 54595245 55514046 440C0011 50414548 42485952 RYHBHEAP...DFMQUERYTOOL...DFMNES 000080
 46440E00 14415441 44524553 55595245 55514046 44100013 40455449 44444154 TADDITEM...DFMQUERYUSERDATA...DF 0000A0
 440E0016 4E464553 4F4C4354 45534046 44000015 40455449 44444154 53494C4D MLISTADDITEM...DFMSETCLOSEFN...D 0000C0
 00184154 41445245 53555445 53404644 0E00174E 46594649 544F4E54 45534046 FMSETNOTIFYFN...DFMSETUSERDATA.. 0000E0
 49465445 53404644 13001953 40415241 50455441 45524359 52455551 40464414 .DFMQUERYCREATEPARAMS...DFMSETFI 000100
 00184045 54495952 45555154 53454E4D 46441000 1A415441 44524553 55444C45 ELDUSERDATA...DFMNESTQUERYITEM.. 000120
 5453494C 59524555 51404644 17001C4D 45544959 52455551 5453494C 40464410 .DFMLISTQUERYITEM...DFMQUERYLIST 000140
 11001E4A 424F4C40 44485952 4555514D 46440F00 10444554 43454C45 53584F42 BOXSELECTED...DFMQUERYHDMLOBJ... 000160
 424F4C4D 44485445 53404644 00001F45 40414E4C 45444F40 59524555 51404644 DFMQUERYMODELNAME...DFMSETHDMLOB 000180
 5453454E 40464412 00214E46 464C4553 59464954 4F4E5445 53404644 1200204A J ..DFMSETNOTIFYSELFFN!..DFMNEST 0001A0
 4C404644 1200234D 54485952 4555514D 46440800 22404554 49454341 4C504552 REPLACEITEM"..DFMQUERYH!'#..DFML 0001C0
 45545349 4C535345 434F5250 40464419 00244045 54494543 414C5045 52545349 ISTREPLACEITEMS..DFMPROCL'SLISTE 0001E0

Dump of file SATURN:[PCCOMMON.DUMP.DLL]DFM.TMP;1 on 18-APR-1990 10:44:03.15
File ID (618,10,0)   End of file block 65 / Allocated 68

Virtual block number 3 (00000003), 512 (0200) bytes

 43544944 45545345 4E535345 434F5250 40464419 00254C4F 52544E4F 43544944 DITCONTROLX..DFMPROCESSNESTEDITC 000000
 45534046 440F0027 454C5449 5440524F 46544553 4046440F 00264C4F 52544E4F ONTROL&..DFMSETFORMTITLE'..DFMSE 000020
 1300294E 46455441 47495641 4E544553 40464410 00284E46 4C4F5254 4E4F4354 TCONTROLFN(..DFMSETNAVIGATEFN).. 000040
 57485952 4555514D 46440F00 2A40524F 46474E4F 4C455441 47495641 4E404644 DFMNAVIGATELONGFORM*..DFMQUERYHW 000060
 4C414353 4F440800 0175011F 00E200A6 00160010 000A0001 00002847 4C44444E NODLG+..........[.ã...u...DOSCAL 000080
 470E4C4F 4F544C4C 49484954 47084954 47034950 47405005 4E49574D 5005534C LS.PMWIN.PMGPI.GTI.GTIKILLTOOL.G 0000A0
 444E4553 4954470A 47534054 534F5049 54470A43 4F52504C 4F4F5446 45444954 TIDEFTOOLPROC.GTIPOSTMSG.GTISEND 0000C0
 4E495759 52455551 49544712 574F444E 49574C4F 4F545445 53495447 1047534D MSG.GTISETTOOLWINDOW.GTIQUERYWIN 0000E0
 45534954 47105254 50415441 44585541 59524555 51495447 124C4F4F 54574F44 DOWTOOL.GTIQUERYAUXDATAPTR.GTISE 000100
 4D03544E 45524150 4C4F4F54 59524555 51495447 12525450 41544144 58554154 TAUXDATAPTR.GTIQUERYTOOLPARENT.M 000120
 00504145 48594F52 54534544 4D454D0E 50414548 45544145 52434045 4D0D4D45 EM.MEMCREATEHEAP.MEMDESTROYHEAP. 000140
 440D6C60 64034843 4F4C4245 4552464D 45400C4B 434F4C42 434F4C4C 41404540 MEMALLOCBLOCK.MEMFREEBLOCK.dml.D 000160
 4555514C 4D44004C 45444F4D 45455246 4C4D440C 4D544845 52495551 43414C4D MLACQUIREHIM.DMLFREEMODEL.DMLQUE 000180
 424C5455 10545544 03544345 4A424F54 43454C45 534C4D44 0F44494C 4D445952 RYDMLID.DMLSELECTOBJECT.DUT.UTLB 0001A0
 524F5352 55434553 41454C45 52474142 4C545513 524F5352 55435449 4E494741 AGINITCURSOR.UTLBAGRELEASECURSOR 0001C0
 0D454841 4D514553 4C54550A 524F5352 55434554 41524554 49474142 4C545513 .UTLBAGITERATECURSOR.UTLSEQMAKE. 0001E0

Dump of file SATURN:[PCCOMMON.DUMP.DLL]DFM.TMP;1 on 18-APR-1990 10:44:03.15
File ID (618,10,0)   End of file block 65 / Allocated 68

Virtual block number 4 (00000004), 512 (0200) bytes

 0202F003 01014554 49525753 4F44084F 4953034D 45544944 44415145 534C5455 UTLSEQADDITEM.SIO.DOSWRITE...b.. 000000
 01109F03 06010105 03020106 30030503 03162603 0EED0306 04036803 04590302 ..Y..h....Ù..&..&..=............ 000020
 0202099C 03050104 70031480 03060205 810308C6 03020218 10030601 01530302 ..S.........ó..........p........ 000040
 090F0308 34030538 03020502 35030601 03FF0302 01118303 06010384 0301A903 .`..Ç...............5....8..4.... 000060
 01087003 07A20303 010301F3 03020400 00030508 03153403 06030613 0300AB03 .¨.......4..........#.....Å..).. 000080
 0107E803 05CA0306 65030203 168E0307 5503032F 03060302 40030201 13010306 .......M..../..U.......e..ò..Š.. 0000A0
 5320736D 726F4620 30312E33 204E414D 48434142 19000002 A7030201 000A0306 ..Ö....T....BACHMAN 3.10 Forms S 0000C0
 00000000 00000000 00000000 01434F52 504C4F4F 54404644 08000060 65747379 ystem...DFMTOOLPROC............. 0000E0
 03750000 30F24689 0000FFFF 9A5016FA 4680006A D88EFFFF 881E5657 00000EC8 å...VV.¡...Äj..F°.P......F·=..u. 000100
 0030F246 890000FF FF9A5016 FC468002 86681E6A FA76FF02 C2E9F246 880006E9 ö...F·Öö..v°j.h...F•.P......F·=. 000120
 FF234789 26064688 FC5EC407 8926FA46 88FC5EC4 029FE9F2 46880006 E9037500 .u.Ö...F·Ö..á^•.F°&..á^•.F.&.G#. 000140
 88FC4688 FC77FF26 FE77FF26 085EC404 08468300 00FFFF9A FC76FFFE 76FF0676 v..v±.v•......F..á^.&.w±&.w•.F•. 000160
 5EC4FE57 8826FC47 8826085E C4040846 8308C483 FFFF0056 9A505200 0205FE56 V±...RP.V....á..F..á^.&.G•&.W±á^ 000180
 878926FC 5EC4FE57 8826FC47 8826085E C4040846 83009497 89260092 878926FC •&....&.....F..á^.&.G•&.W±á^•&.. 0001A0
 FE5688FC 46880280 878926FC 5EC4FE47 8826085E C4020846 83000697 89260004 å.&..ø..F..á^.&.G±á^•&.....F•.V± 0001C0
 03750000 30F24689 08C48302 E003E09A 5052009E 05FE5688 FC468850 5200A205 .Å.RP.F•.V±...RP.Å.Å..á..F·=..u. 0001E0
```

Dump of file SATURN:[PCCOMMON.DUMP.DLL]DFM.TMP;1 on 18-APR-1990 10:44:03.15
File ID (618,10,0)   End of file block 65 / Allocated 68

Virtual block number 5 (00000005), 512 (0200) bytes

5EC40000 FFFF9A00 9EB7FF26 00A0B7FF 26FC5EC4 0676FF01 E2E9F246 880006E9 Õ...F·Õã..v.á^•&.ñ..&.ñ.......á^ 000000
9A505200 B405FE56 88FC4688 50520002 05FE5688 FC468806 76FF0280 B7FF26FC •&.ñ...v..F•.V±...RP.F•.V±.Ç.RP. 000020
97882600 D4878826 FC5EC401 96E9F246 880006E9 03750000 30F24689 0000FFFF .....F·=..u.Õ...F·Õ..á^•&..å.&.. 000040
00048788 26FC5EC4 0038E903 74FFFA83 0040E903 74000030 FFE28300 00250006 •.%...ã.=..t.Õa..•.t.Õ8.ʲ•&..å. 000060
FC5EC400 D6978926 00048789 26FC5EC4 00949788 26009287 8826FC5E C4F44689 .F¶á^•&....&....á^•&..å.• .•.á^• 000080
FC5EC400 B4B7FF26 00B6B7FF 26FC5EC4 0024E900 92878926 00948789 26000088 ¦..&....&....Õ$.á^•&.ñÑ.&.ñÇ.á^• 0000A0
FE5688FC 468837FF 26FC5EC4 0000FFFF 9A5016F4 46800092 B7FF2600 94B7FF26 &.ñ..&.ñ...F¶.P.....á^•&.7.F•.V± 0000C0
2600BE87 89260000 B8FC5EC4 0000000C 87C726FC 5EC40000 FFFF9A50 5200DE05 .R.RP.....á^•&ú.É...á^•¦..&../.& 0000E0
2600C287 89260000 B8FC5EC4 00888789 2600BA87 89260000 B8FC5EC4 00BC8789 ..¥.á^•¦..&..¤.&..¦.á^•¦..&..ó.& 000100
FC5EC400 00E287C6 26FC5EC4 00C48789 2600C687 89260000 B8FC5EC4 00C08789 ..å.á^•¦..&..6.&..Å.á^•&6.ã..á^• 000120
FC5EC402 7C878926 027E8789 26000088 FC5EC402 78878926 027A8789 26000088 ¦..&..z.&..x.á^•¦..&..-.&..|.á^• 000140
8087FF26 FC5EC4F4 76FF5016 F6468000 01028487 C726FC5E C4000002 8287C726 &ú.....á^•&ú......F-.P.v¶á^•&.ñ. 000160
76FFFE76 FF0050E9 F2468800 06E90375 00F27E83 F2468908 C483FFFF 00009A02 .......å..F·.-·.u.Õ...F·ÕP..v±.v 000180
FFFF9A00 9EB7FF26 00A0B7FF 26FC5EC4 0020E903 7500F27E 83F24689 F65EFFFC •.^-.F·.-·.u.Õ .á^•&.ñ..&.ñ..... 0001A0
05709A00 9EB7FF26 00A0B7FF 26FC5EC4 001BE9F2 46880000 FFFF9AFA 76FF0000 ...v•......F·Õ..á^•&.ñ..&.ñ...p. 0001C0
E90E4688 D88E0008 881E5657 00000EC8 C8C95F5E 1F0000E9 F2468804 C483FFFF ...á..F·Õ...^_èùÀ...WV.¦...Ã.F.Õ 0001E0

Dump of file SATURN:[PCCOMMON.DUMP.DLL]DFM.TMP;1 on 18-APR-1990 10:44:03.15
File ID (618,10,0)   End of file block 65 / Allocated 68

Virtual block number 6 (00000006), 512 (0200) bytes

1EE90375 008E8708 26008C87 8826FA5E C4000003 489A5016 FA468D10 76FF0360 m..v..F•.P.K...á^•&..¥.&../.u.Õ. 000000
E9039EE9 99008C9F FF26FA5E C40676FF 0876FF0A 76FF0C76 FFFA76FF FC76FF00 ..v•.v•.v..v..v..v.á^•&..¥..Õ..Õ 000020
1EE90375 008A8708 26008887 8826FA5E C40000FF FF9A5016 FA468D10 76FF0392 ...v..F•.P.....á^•&..¦.&..¤.u.Õ. 000040
E9035EE9 9900889F FF26FA5E C40676FF 0876FF0A 76FF0C76 FFFA76FF FC76FF00 ..v•.v•.v..v..v..v.á^•&..¦..Õ^.Õ 000060
0334E904 C483FFFF 00009AFA 76FFFC76 FF000003 A99A5016 FA468D10 76FF0352 R..v..F•.P.`....v•.v•......å.Õ4. 000080
FF001CE9 0375008E 87082600 8C878826 FA5EC400 0004059A 5016FA46 8D1076FF .v..F•.P.....á^•&..¥.&../.u.Õ... 0000A0
76FF02F6 E90302E9 99008C9F FF26FA5E C4006A0C 6A0A76FF 0C76FFFA 76FFFC76 v•.v•.v..v.j.j.á^•&..¥..Õ. Õ-..v 0000C0
8D1076FF 02E1E900 008A0000 8802EAE9 9906C483 FFFF0000 9A1076FF 0A76FF0C ..v..v.......å..Õõ.¦..¤..ÕÁ  v.. 0000E0
FF2600A8 B7FF26FA 5EC40000 05A59A50 16FE468D 1076FF00 0004A59A 5016FA46 F•.P.È....v..F±.P.È...á^•&.í. Å. 000100
6A00A687 FF2600A8 B7FF26FA 5EC4F856 89F64689 00000444 9A006A05 6A00A687 Ñ¦.j.j..D....F-.V½á^•&.ñ´.&.ñ¦.j 000120
FFFF9A01 6A00A687 FF2600A8 B7FF26FA 5EC4F456 89F24689 0000FFFF 9A006A04 .j.......F·.V¶á^•&.ñ´.&.ñ¦.j.... 000140
00028487 C726FA5E C4000005 BC9A016A 006A5052 99104688 1DAE68FE 76FF0000 ...v±hÛ..F..RPj.j..¥...á^•&ú.... 000160
8D1076FF 0241E900 008A0000 880000FF FF9A00A6 B7FF2600 A8B7FF26 FA5EC400 .á^•&.ñ´.&.ñ¦......¦..¤..ÕA..v.. 000180
8B2600A6 878826FA 5EC40789 26024789 26000088 0A5EC400 0004D99A 5016FA46 F•.P.\...á^.¦..&.G.&..á^•&..Î.&. 0001A0
FA5EC400 0005099A 5016FA46 8D1076FF 0204E902 57892607 8926065E C400A897 .´.á^.&..&.W.Õ...v..F•.P.....á^• 0001C0
010DE900 008A0000 88000107 C7260A5E C401E5E9 01E8E907 89260A5E C4078826 &..á^.&..Õò.Õ1.á^.&ú...¦..¤..Õ1. 0001E0

Dump of file SATURN:[PCCOMMON.DUMP.DLL]DFM.TMP;1 on 18-APR-1990 10:44:03.15
File ID (618,10,0)   End of file block 65 / Allocated 68

Virtual block number 7 (00000007), 512 (0200) bytes

96878826 FA5EC400 31E90374 1E3F8326 0A5EC400 0006019A 5016FA46 8D1076FF .v..F•.P.....á^.&.?.t.Õ1.á^•&... 000000
065EC400 9C978826 009A8788 26FA5EC4 02578926 0789260A 5EC40098 97882600 .&....á^.&..&.W.á^•&....&....á^. 000020
FFFC76FF 001DE903 75000287 0B2600D0 878826FA 5EC40049 E9025789 26078926 &..&.W.Õ1.á^•&..Å.&..•.u.Õ...v•. 000040
26000088 0A5EC400 1AE90000 9FFF26FA 5EC40676 FF0876FF 0A76FF0C 76FFFA76 v•.v..v..v..v.á^•&..Å.Õ..á^.¦..& 000060
8D1076FF 0141E900 008A0000 88078926 02478926 00008806 5EC40789 26024789 .G.&..á^.¦..&.G.&..¦..¤..ÕA..v.. 000080
0000062E 9A0676FF 0876FF0A 76FF0C76 FF108168 FE76FF00 0005DA9A 5016FE46 F±.P.Õ....v±hŸ..v..v..v..v...... 0000A0
76FF0000 06199A50 16FE468D 1076FF01 03E90003 E9037408 46080646 880111E9 Õ...F..F.t.Õ..Õ...v..F±.P......v 0000C0
5016FA46 8D1076FF 00DCE900 00FFFF9A 0676FF08 76FF0A76 FF0C76FF 1DAF68FE ±hÉ..v..v..v..v......ÕÉ..v..F•.P 0000E0
FE76FF00 00FFFF9A 5016FE46 8D1076FF 003FE903 75FC4608 FA468800 0003089A ......F•.F•u.Õ?..v..F±.P......v± 000100
9A0084B7 FF260086 B7FF26FA 5EC40000 FFFF9A00 6A006A50 52991046 8810AE68 hÛ..F..RPj.j......á^•&.ñÑ.&.ñÇ.. 000120
76FF0A76 FF0C76FF 0E76FF10 76FF0082 E9000002 C69A37FF 26FA5EC4 0000FFFF ....á^•&.7.6...Õ...v..v..v..v..v 000140
75100130 0033E903 76FD29E9 03751000 300065E9 0071E900 00FFFF9A 0676FF08 ..v......Õq.Õe.=Å.u.Õ)»v.Õ3.=..u 000160
7510CD30 FC66E903 7510CC30 FF64E903 75100430 FD52E903 75100330 FD6FE903 .Õo»=..u.ÕR»=..u.Õd.=å.u.Õf•=ë.u 000180
A7FF2E93 C003FF98 E9037600 083010A0 20FFA3E9 FCD6E903 7510CF30 FC9EE903 ,Õ.•=ü.u.Õ•=ÕÉ.-Ü.=..v.Õ...Å...Ï 0001A0
5F5E1F00 00E90000 8A000088 04D0049C 06520500 059C04EF 05C304EC 03FC06C2 ô.•.$.û.ÿ.....R...Å.¦..¤..Õ...^_ 0001C0
88020300 7C000204 8F010300 00000300 F3000200 00000103 EA000200 180CCAC9 èò.....õ.......µ...........|...¯ 0001E0

```
Dump of file SATURN:[PCCOMMON.DUMP.DLL]DFM.TMP;1 on 18-APR-1990 10:44:03.15
File ID (618,10,0)   End of file block 65 / Allocated 68

Virtual block number 8 (00000008), 512 (0200) bytes

 40020300 00000503 98000201 5C000701 E6020300 00000402 84000200 6F000403 ...o...........!...\...........a 000000
 69020300 00000800 8A000200 00000204 5E010300 07000202 BE010300 E6000601 ...!.../.......^...............i 000020
 00020300 19000204 28010300 00000A02 F8000200 F4000606 40020300 82000400 .......a...¶...%.......(.......Å 000040
 F1020300 AA000500 14020300 26000406 65020300 93000404 12020301 01000601 ................e...&..........b 000060
 37020300 48000401 1A020300 40000404 73020300 B8000506 48020300 35000405 ...5...K...|...s...a.......K...7 000080
 8B06468B D88EFFFF B81E5657 000008C8 00000000 00000000 00000000 C7000500 ...ú............à...WV.|...Ä.F.. 0000A0
 E0B7FF26 F85EC400 7DE99A73 B80006E9 0374FA46 0BF8468B FA5689F8 46890856 V..F%.V*.F%.F*t.Õ..|s.Õ}.ó^V&.ñÅ 0000C0
 FFFF9A50 16FC468D 00EB7FFF 2600E0B7 FF26F85E C40000FF FF9A000E B7FF2600 .&.ñß......ó^V&.ñÅ.&.ñß..F=.P... 0000E0
 568BFC46 8B0C5EC4 0028E903 74073926 0A468BFC 5EC40039 E9037400 003D0000 ..=..t.Õ9.ó^=.F.&9.t.Õ(.ó^..F=.V 000100
 0016E900 00880000 FFFF9A00 DEB7FF26 00E0B7FF 26F85EC4 02578926 078926FE ±&..&.W.ó^V&.ñÅ.&.ñß......|..Õ.. 000120
 57000004 C8CBC95F 5E1F0000 E99A768B 07892602 47892600 00B80C5E C4FFA8E9 Õ^.ó^.|..&.G.&..|v.Õ...^_èúà...W 000140
 5EC4001D E90375FE 4608FC46 8BFE5689 FC46890C 5688OA46 8BD88E00 08881E56 V.|...Ä.F..V..F=.V±.F=.F±u.Õ..ó^ 000160
 0088065E C40013E9 00008802 57892607 8926065E C4000697 8B260004 878826FC =&..à.&..ø.ó^.&..&.W.|..Õ..ó^.|. 000180
 8E00838B 1E565700 0006C800 08CAC95F 5E1F0000 E99A73B8 07892602 47892600 .&.G.&..|s.Õ...^_èò..à...WV.:*.. 0001A0
 037500FA 7E83FA46 890AC483 FFFF0000 9A0C76FF 0E76FF0A 76FF5016 FC4680D8 Ä.F=.P.v..v..v.......ó..F*.~  u. 0001C0
 C95F5E1F 0000E900 00B80789 26065EC4 0E478B26 FC5EC400 13E9FA46 8B0006E9 Õ...F*Õ..ó^=&.G.ó^.&..|..Õ... _* 0001E0

Dump of file SATURN:[PCCOMMON.DUMP.DLL]DFM.TMP;1 on 18-APR-1990 10:44:03.15
File ID (618,10,0)   End of file block 65 / Allocated 68

Virtual block number 9 (00000009), 512 (0200) bytes

 00009A0C 76FF0E76 FF0A76FF 5016FC46 80088E01 00881E56 57000006 C8000ACA ò..à...WV.|...Ä.F=.P.v..v..v.... 000000
 8B260A47 8B26FC5E C40018E9 FA468800 06E90375 00FA7E83 FA46890A C4830122 "..ó..F*.-*.u.Õ...F*Õ..ó^=&.G.&. 000020
 1E565700 0004C800 0ACAC95F 5E1F0000 E900008B 02578926 07892606 5EC40C57 W.ó^.&..&.W.|..Õ...^_èò..à...WV. 000040
 26FC5EC4 0012E903 75FE4608 FC468BFE 5689FC46 890C5688 0A468BD8 8E01588B |[..Ä.F..V..F=.V±.F=.F±u.Õ..ó^=& 000060
 C95F5E1F 0000E99A 73B80000 07C72606 5EC4000E E900008B 07892606 5EC4078B ..ó^.&..|..Õ..ó^.&ú...|s.Õ...^_è 000080
 4608FC46 8BFE5689 FC46890C 5688OA46 8BD88E01 81881E56 57000004 C80008CA ò..à...WV.|Ý..Ä.F..V..F=.V±.F=.F 0000A0
 00008802 57892607 8926065E C4009497 8B260092 878826FC 5EC4001D E90375FE ±u.Õ..ó^=&....&....ó^.&..&.W.|.. 0000C0
 0004C800 08CAC95F 5E1F0000 E99A73B8 07892602 47892600 0088065E C40013E9 Õ..ó^.|..&.G.&..|s.Õ...^_èò..à.. 0000E0
 001DE903 75FE4608 FC468BFE 5689FC46 890C5688 0A468BD8 8E01F888 1E565700 .WV.|=..Ä.F..V..F=.V±.F=.F±u.Õ.. 000100
 065EC400 13E90000 B8025789 26078926 065EC400 B6978B26 0084878B 26FC5EC4 ó^=&..Ç.&..Ñ.ó^.&..&.W.|..Õ..ó^. 000120
 55881E56 57000004 C80008CA C95F5E1F 0000E99A 73B80789 26024789 2600008B |..&.G.&..|s.Õ...^_èò..à...WV.|U 000140
 878826FC 5EC4001D E90375FE 4608FC46 8BFE5689 FC46890C 5688OA46 8BD88E02 ..Ä.F..V..F=.V±.F=.F±u.Õ..ó^=&.. 000160
 47892600 0088065E C40013E9 00008802 57892607 8926065E C400A897 8B2600A6 Ï.&..´.ó^.&..&.W.|..Õ..ó^.|..&.G 000180
 0A468BD8 8E02AF8B 1E565700 0004C800 08CAC95F 5E1F0000 E99A738B 07892602 .&..|s.Õ...^_èò..à...WV.|[..Ä.F. 0001A0
 FE4608FC 46880037 E99A748B 0006E903 74084608 064688FE 5689FC46 890C5688 .V..F=.V±.F.¯F.t.Õ..|t.Õ7..F=.F± 0001C0
 008808C4 83FFFF00 569A0676 FF0876FF 50520002 05FE5688 FC468800 1FE90375 u.Õ...F=.V±...RP.v..v..V....ó.|. 0001E0

Dump of file SATURN:[PCCOMMON.DUMP.DLL]DFM.TMP;1 on 18-APR-1990 10:44:03.15
File ID (618,10,0)   End of file block 65 / Allocated 68

Virtual block number 10 (0000000A), 512 (0200) bytes

 B81E5657 000004C8 0008CAC9 5F5E1F00 00E99A73 B80007C6 26065EC4 0000E900 .Õ..ó^.&6..|s.Õ...^_èò..à...WV.| 000000
 8B26FC5E C40014E9 0375FE46 08FC468B FE5689FC 46890C56 880A468B D88E0309 ...Ä.F..V..F=.V±.F=.F±u.Õ..ó^=&. 000020
 5F5E1F00 00E99A73 B8000007 C726065E C4000EE9 00008807 8926065E C4028287 ...ó^.&..|..Õ..ó^.&ú...|s.Õ...^  000040
 08FC468B FE5689FC 46890C56 880A468B D88E0370 B81E5657 000004C8 0008CAC9 èò..à...WV.|p..Ä.F..V..F=.V±.F=¯ 000060
 07C72606 5EC4000E E900008B 07892606 5EC42347 8B26FC5E C40013E9 0375FE46 F±u.Õ..ó^=&.G#ó^.&..|..Õ..ó^.&ú. 000080
 56880A46 8BD88E03 8C881E56 57000004 C80008CA C95F5E1F 0000E99A 73B80000 ..|s.Õ...^_èò..à...WV.|V..Ä.F..V 0000A0
 C400DA97 8B260008 878826FC 5EC4001D E90375FE 4608FC46 8BFE5689 FC46890C ..F=.V±.F=.F±u.Õ..ó^=&..Ä.&..Õ.ó 0000C0
 E99A738B 07892602 47892600 0088065E C40013E9 00008802 57892607 8926065E ^.&..&.W.|..Õ..ó^.|..&.G.&..|s.Õ 0000E0
 5689F846 8918568B 16468808 8E04078B 1E565700 000AC800 08CAC95F 5E1F0000 ...^_èò..à...WV.|...Ä.F..V..F%.V 000100
 16FC468D 106A1E6A 37FF26F8 5EC400AF E99A738B 0006E903 74FA4608 F84688FA *.F%¯F*t.Õ..|s.Õ€.ó^V&.7j.j..F=. 000120
 12568810 4688FC5E C4008AE9 F6468800 06E90375 00003DF6 46890000 FFFF9A50 P......F-*..u.Õ...F-Õ..ó^=.F..V. 000140
 2614468B FC5EC408 57892606 4789260E 56880C46 8BFC5EC4 04578926 02478926 &.G.&.W.ó^=.F..V.&.G.&.W.ó^=.F.& 000160
 F85EC40C 5789260A 47892608 56880646 8BFC5EC4 0E478926 0A468BFC 5EC40789 ..ó^=.F.&.G.ó^=.F..V.&.G.&.W.ó^% 000180
 00FFFF9A FC76FFFE 76FF016A 000CB7FF 26006AF8 5EC4000E B7FF2600 E0B7FF26 &.ñÅ.&.ñß.ó^%j.&.ñÉ.j..V±.V=.... 0001A0
 00E90000 B8000C87 FF26F85E C4000EE9 F6468800 06E90375 00F67E83 F6468900 ..F-.~-.u.Õ...F-Õ..ó^V&..É.|..Õ. 0001C0
 FE5689FC 46890C56 880A468B D88E0461 B81E5657 000004C8 0014CAC9 5F5E1F00 ..^_èò..à...WV.|a..Ä.F..V..F=.V± 0001E0
```

```
Dump of file SATURN:[PCCOMMON.DUMP.DLL]DFM.TMP;1 on 18-APR-1990 10:44:03.15
File ID (618,10,0)   End of file block 65 / Allocated 68

Virtual block number 11 (0000000B), 512 (0200) bytes

008800C2 97892600 C0878926 08568806 4688FC5E C40019E9 0375FE46 08FC4688 .F=.F±u.Õ..á^=.F..V.&..å.&. ô.¡. 000000
0A4688D8 8E0540B8 1E565700 0004C800 08CAC95F 5E1F0000 E99A7388 0006E900 .Õ..¡s.Õ...^_èò..à...WV.¡ə.. .F. 000020
87892608 56880646 88FC5EC4 0019E903 75FE4608 FC4688FE 5689FC46 890C5688 .V..F=.V±.F=.F±u.Õ..á^=.F..V.. . 000040
56570000 04C80008 CAC95F5E 1F0000E9 9A738800 06E90000 8800CA97 892600C8 à.&..ò.¡..Õ..¡s.Õ...^_èò..à...WV 000060
FC5EC400 19E90375 FE4608FC 4688FE56 89FC4689 0C56880A 4688088E 0589881E .¡...Ä.F..V..F=.V±.F=.F±u.Õ..á^= 000080
C95F5E1F 0000E99A 73880006 E9000088 00C69789 2600C487 89260856 88064688 .F..V.&..á.&..ó.¡..Õ..¡s.Õ...^_è 0000A0
00009A0C 76FF0E76 FF0A76FF 5016FC46 8D088E05 D2881E56 57000006 C80008CA ò..à...WV.¡@..Ä.F=.P.v..v..v.... 0000C0
08568806 4688FC5E C40017E9 FA468800 06E90375 00FA7E83 FA46890A C4830170 p..á..F'.-'.u.Õ...F'Õ..á^=.F..V. 0000E0
8E061888 1E565700 0018C800 0ACAC95F 5E1F0000 E9000088 0C578926 0A478926 &.G.&.W.¡..Õ...^_èò..à...WV.¡... 000100
16F2468D 0042681E 010DE903 75FE4608 FC4688FE 5689FC46 89105688 0E4688D8 Ä.F..V..F=.V±.F=.F±u.Õ...hB..F . 000120
8306C600 569A5052 002505FE 5688FC46 880A76FF 0C76FF08 C48306AD 00569A50 P.V.Ù..á..v..v..F=.V±.%.RP.V.ó.. 000140
8826FC5E C408C483 06E50056 9A505200 4605FE56 88FC4688 0676FF08 76FF08C4 á..v..v..F=.V±.F.RP.V.Ì..á.á^=&. 000160
0676FF08 76FF04C4 8306F500 8C9A5016 F2468D00 82E90375 00A88708 2600A687 .Ì.&..`.u.Õÿ..F .P...%..á..v..v. 000180
8940C603 C70304C4 83034900 8C9AF888 0A76FF0C 76FF04C4 83070500 8C9AF088 .Þ......á..v..v..%...Ì..á..ú.óə. 0001A0
9A5016E8 4680EC76 FF5C6AF0 76FF0630 01A99A50 16F0468D 0E76FF10 76FFEC46 F§.v..v..FÞ.P.`.0..vÞj\.vš.FÒ.P. 0001C0
16F2468D 0676FF08 76FF0055 E9EE4688 0006E903 7500EE7E 83EE4689 00000492 .....FY.-Y.u.Õ...FYÕU..v..v..F . 0001E0

Dump of file SATURN:[PCCOMMON.DUMP.DLL]DFM.TMP;1 on 18-APR-1990 10:44:03.15
File ID (618,10,0)   End of file block 65 / Allocated 68

Virtual block number 12 (0000000C), 512 (0200) bytes

A087FF26 FC5EC414 C4830694 00D69AE8 76FFEA76 FF004668 1E0A76FF 0C76FF50 P.v..v..hF..võ.vÒ.@....á.á^=&.ñ. 000000
880000FF FF9AE876 FFEA76FF F076FF00 00FFFF9A E876FFEA 76FF009E 87FF2600 .&.ñ...võ.vÒ......vÞ.võ.vÒ.....¡ 000020
4688D88E 066D881E 56570000 04C8000C CAC95F5E 1F0000E9 9A738800 06E90000 ..Õ..¡s.Õ...^_èò..à...WV.¡m..Ä.F 000040
89260856 88064688 FC5EC400 19E90375 FE4608FC 4688FE56 89FC4689 0C56880A ..V..F=.V±.F=.F±u.Õ..á^=.F..V.&. 000060
57000004 C80008CA C95F5E1F 0000E99A 73880006 E9000088 00949789 26009287 ...&.....¡..Õ..¡s.Õ...^_èò..à...W 000080
5EC40019 E90375FE 4608FC46 88FE5689 FC46890C 56880A46 88D88E07 AA881E56 V.¡`..Ä.F..V..F=.V±.F=.F±u.Õ..á^ 0000A0
5F5E1F00 00E99A73 880006E9 00008800 CE978926 00CC8789 26085688 064688FC =.F..V.&..å.&..ö.¡..Õ..¡s.Õ...^_ 0000C0
08FC4688 FE5689FC 46890C56 880A4688 D88E07F3 881E5657 000004C8 0008CAC9 èò..à...WV.¡µ..Ä.F..V..F=.V±.F=. 0000E0
0006E900 008800BE 97892600 8C878926 08568806 4688FC5E C40019E9 0375FE46 F±u.Õ..á^=.F..V.&..V.&../.¡..Õ.. 000100
890C5688 0A4688D8 8E083C88 1E565700 0004C800 08CAC95F 5E1F0000 E99A7388 ¡s.Õ...^_èò..à...WV.¡<..Ä.F..V.. 000120
89260088 87892608 56880646 88FC5EC4 0019E903 75FE4608 FC4688FE 5689FC46 F=.V±.F=.F±u.Õ..á^=.F..V.&..¡.&. 000140
0885881E 56570000 04C80008 CAC95F5E 1F0000E9 9A738800 06E90000 88008A97 .¤.¡..Õ..¡s.Õ...^_èò..à...WV.¡.. 000160
88064688 FC5EC400 19E90375 FE4608FC 4688FE56 89FC4689 0C56880A 4688D88E .Ä.F..V..F=.V±.F=.F±u.Õ..á^=.F.. 000180
C80008CA C95F5E1F 0000E99A 73880006 E9000088 00029789 26000087 89260856 V.&..Ä.&..@.¡..Õ..¡s.Õ...^_èò..à 0001A0
E90375FE 4608FC46 88FE5689 FC46890C 56880A46 88088E08 CE881E56 57000004 ...WV.¡ö..Ä.F..V..F=.V±.F=.F±u.Õ 0001C0
00E99A73 880006E9 00008800 DA978926 00D88789 26085688 064688FC 5EC40019 ..á^=.F..V.&..Ä.&..ö.¡..Õ..¡s.Õ. 0001E0

Dump of file SATURN:[PCCOMMON.DUMP.DLL]DFM.TMP;1 on 18-APR-1990 10:44:03.15
File ID (618,10,0)   End of file block 65 / Allocated 68

Virtual block number 13 (0000000D), 512 (0200) bytes

67000705 00020300 00000207 20000201 48000700 4E020300 0A08CAC9 5F5E1F00 ..^_èò.....H...N... ............g 000000
23000700 37020300 00000A09 17000200 10000207 7D010300 00000807 64000201 ...∂........)...............7...# 000020
00000000 00000000 D5000507 88020300 C7000507 30020301 34000700 86020301 ........4...0...ù........†........ 000040
46880003 E9037C06 463808F7 00828788 26085EC4 D88EFFFF 881E5657 000004C8 à...WV.¡...Äá^.&..ý.%Ä;F.|.Õ..._F 000060
00808739 26064688 085EC406 46890000 880003E9 037F0000 30064688 06468906 ..F..F.*....Õ._|...F.á^..F.&9.¯. 000080
6A006A00 A687FF26 00A887FF 26085EC4 00808789 26064688 085EC400 68E90375 u.Õh.á^..F.&..¯.á^.&.ñ´.&.ñÌ.j.j 0000A0
0668009E 87FF2600 A087FF26 085EC400 00FFFF9A 026A006A 006A0676 FF006A00 .j..v.j.j.j......á^.&.ñ..&.ñ..h. 0000C0
06460300 82878826 085EC401 A168FC76 FFFE76FF FE5689FC 46890000 FFFF9A80 ........F=.V±.v±.v=hÅ.á^.&..ý..F. 0000E0
76FFD88E 0008881E 56570000 0AC8C8C9 5F5E1F00 00FFFF9A 006A006A 5052022B +@RPj.j........^_èùà...WV ...Ä.v 000100
6CE91046 880000FF FF9A5016 F8468DFC 76FF0000 FFFF9A50 16FC468D 0676FF08 ..v..F=.P.......v=.F%.P....  F.Õl 000120
C40060E9 FE468900 AC878826 F85EC400 78E9FE46 8908F700 AC878826 F85EC400 .á^%&..¯.%Ä.F±Õ(.á^%&..¯..F±Õm.á 000140
D22800AA 878826F8 5EC40056 E9FE4689 D8F7F1F7 000689D2 2800AA87 8826F85E ^%&..¯.+@¿..%Þ%Ä.F±ÕV.á^%&..¯.+@ 000160
B0878826 F85EC4FE 46890082 872826F8 5EC40E46 880041E9 FE4689F1 F7000689 ¿..%Þ.F±ÕA..F.á^%&+.ý..F±á^%&..¯ 000180
0160A7FF 2E93C003 FFEFE903 7600053D 00012000 1FE90041 E90025E9 FE462900 .)F±Õ%.ÕA.Õ..-..=..v.Õÿ..á...Ì`. 0001A0
F876FFFA 76FFF646 89FE4603 00808788 26F85EC4 01280128 00F100E1 011600FF ....Ä.Þ.+.+.á^%&..¯..F±.F-.v'.v% 0001C0
01E246C7 D88E008A 881E5657 000038C8 C8C95F5E 1F06C483 FFFF0000 9AF676FF .v—......á..^_èùàB..WV.¡¤..ÄúFã. 0001E0
```

```
Dump of file SATURN:[PCCOMMON.DUMP.DLL]DFM.TMP;1 on 18-APR-1990 10:44:03.15
File ID (618,10,0)   End of file block 65 / Allocated 68

Virtual block number 14 (0000000E), 512 (0200) bytes

 0000079A 5016E446 8DFC76FF C8468900 0000CA9A 5016FC46 8D1076FF 1276FF00 ..v..v..F=.P.ò....Fà.v•.Fô.P.■.. 000000
 FC46881D AE68FE76 FF0000FF FF9A5016 FE468DFC 76FF01AF E90E4688 C8468900 ..Fà.F.ÕC..v•.F±.P......v±hÙ..F• 000020
 00A2B7FF 2600A4B7 FF26E45E C4016A00 6A01CDE9 0000FFFF 9A016A00 6A505299 .RPj.j......Õë.j.j.á^Õ&.ñÉ.&.ñÅ. 000040
 E2468DE4 76FFE676 FF0013E9 037500C2 87082600 C0878826 E45EC400 00FFFF9A .....á^Õ&..â.&..õ.u.Õ...v|.vö.Fã 000060
 00008800 00FFFF9A 006AFC76 FF000AE9 037500E2 7E8300C0 9FFF26E4 5EC45016 .Pá^Õ&..ä..-ã.u.Õ...v•j......|.. 000080
 FFFF9A50 16CE4680 F876FFFA 76FFFA56 89F84689 0C56880A 46880193 E90000BA ¤..Õ...F..V..F½.V'.v'.v½.Fö.P... 0000A0
 87882 6E4 5EC40021 E9037F04 463B02C4 83FFFF01 569A0080 87FF26E4 5EC40000 ..á^Õ&.ñ¯..V....á.;Fâ..Õ!.á^Õ&.. 0000C0
 008A0000 8806C483 01860000 9AE076FF E476FFE6 76FFE046 89044628 E8D100AA ¯.lò+Få.FÅ.v|.vö.vÅ......á.|..¤. 0000E0
 1276FFCC 5689CA46 890000FF FF9A006A 006A006A 006A1076 FF1276FF 0135E900 .Õ5..v..v.j.j.j.j.......Fò.Vä.v. 000100
 EC6AFF6A 016A006A 5016E846 8DCA76FF CC76FF00 00FFFF9A 5016E846 8D1076FF .v..FÒ.P......vä.vò.FÒ.Pj.j.j.jš 000120
 76FF008E E90000FF FF9ACA76 FFCC76FF 0000FFFF 9A505200 00FFFF9A 006A006A j.j......RP......vä.vò.....Õ/..v 000140
 008A0001 8800A1E9 0CC48302 9600829A 1076FF12 76FF0A76 FF0C76FF 0676FF08 ..v..v..v..v..v..ý....á.ÕÅ.|..¤. 000160
 5000AC87 2826E45E C400AA87 8826E45E C400AA87 89260846 88E45EC4 0085E900 .Õç.á^Õ.F.&..¯.á^Õ&..¯.á^Õ&+.¯.P 000180
 FF1076FF 1276FF00 80E90000 8A000088 00828789 26E45EC4 02C48302 6D01569A .V.m..á.á^Õ&..ý.|..¤..Õ...v...v.. 0001A0
 23E90375 00233D00 43E90063 E9000003 D29A0676 FF0876FF 0A76FF0C 76FF0E76 v..v..v..v..v..@...Õc.ÕC.=#.u.Õ# 0001C0
 4EE90375 00293DFF C0E9FE34 E9037500 0D3DFF96 E9037500 07300013 E90376FF .v.Õ..=..u.Õ..=..u.Õ4±Õå.=).u.ÕN 0001E0
```

```
Dump of file SATURN:[PCCOMMON.DUMP.DLL]DFM.TMP;1 on 18-APR-1990 10:44:03.15
File ID (618,10,0)   End of file block 65 / Allocated 68

Virtual block number 15 (0000000F), 512 (0200) bytes

 FF1276FF FF9DE9FE 8DE90375 1BBA3DFF 6AE90375 004F30FF 55E90375 003130FE ±=1.u.ÕU.=O.u.Õj.=¤.u.Õ.±Õ...v.. 000000
 000ECAC9 5F5E1F00 00E90000 FFFF9A06 76FF0876 FF0A76FF 0C76FF0E 76FF1076 v..v..v..v..v......Õ...^_èò.. 000020
 47892600 0088065E C4FF769E 8CFF7486 89004E88 D88E0198 881E5657 000098C8 à...WV.|...Ä|N...t...v.á^.|¯.&.G 000040
 00FFFF9A 006A006A 006AFFFF 68031368 FF7486FF FF7686FF 006A006A 07892602 .&..j.j..Ñv..Ñt.h..h..j.j.j..... 000060
 60681E00 58681E00 00FF7A86 C70100FF 7886C700 00FF7286 C7407BFF 7086C700 .ú.p.(âú.r...ú.x...ú.z....h[..h' 000080
 16FF7086 8DFF7886 FFFF7A86 FF016A00 6A0CC483 03430006 9A5016FF 7C868D00 ...|..P.ø.C..á.j.j..Ñz..Ñx...p.. 0000A0
 4680016A 020036FF 261A6806 8E006A00 6A5016FF 7C868DFF 7486FFFF 7686FF50 P.Ñv..Ñt...|..Pj.j...h.&.( .j..F 0000C0
 6A006A00 18E90374 FF6A8608 FF688688 FF6A9689 FF688689 0000FFFF 9A5016FC •.P.......h...j...h...j.t.Õ..j.j 0000E0
 FF6A9688 FF688688 065EC400 28E9FF6C 8688FF6E 9689FF6C 86890000 FFFF9A00 .........l...n...l.Õ(.á^...h...j. 000100
 5F5E1F00 00E90000 88025789 26078926 FE5688FC 46880A5E C4025789 26078926 &..&.W.á^..f=.V±&..&.W.|..Õ...^_ 000120
 76FF0000 01AD9A50 16FE468D 0676FF08 76FFD88E 03E8881E 56570000 18C8C8C9 èúâ...WV.|Ò..Ä.v..v..F±.P.Ù....v̄ 000140
 76FF1076 FF0E76FF 0C76FF00 6A006A06 76FF0876 FF000001 809A5016 FA468DFE ±.F'.P.§....v..v.j.j..v..v..v..v 000160
 C4000002 5E9A5016 E8468D00 A2B7FF26 00A4B7FF 26FA5EC4 0000006D 9A036A12 .j..m...á^'&.ñÉ.&.ñÅ..FÒ.P.^...á 000180
 044A0156 9A5000AC 872826FA 5EC400AA 878826FA 5EC400AA 878926EA 4688FA5E ^'.Fõ&..¯.á^'&..¯.á^'&+.¯.P.V.J. 0001A0
 FF0876FF D88E04EA 881E5657 00003ECB C8C95F5E 1F008287 8926FA5E C402C483 .á.á^'&..ý..^_èùâ>..WV.|õ..Ä.v.. 0001C0
 A887FF26 F65EC400 0005079A 5016F646 8DFE76FF 000004FA 9A5016FE 468D0676 v..F±.P.'....v̄±.F-.P.....á^-&.ñ¨ 0001E0
```

```
Dump of file SATURN:[PCCOMMON.DUMP.DLL]DFM.TMP;1 on 18-APR-1990 10:44:03.15
File ID (618,10,0)   End of file block 65 / Allocated 68

Virtual block number 16 (00000010), 512 (0200) bytes

 04468D00 A2B7FF26 00A4B7FF 26F65EC4 000005C3 9A5016C2 468D00A6 87FF2600 .&.ñÍ..Fö.P.û...á^-&.ñÉ.&.ñÅ..Få 000000
 F65EC400 AE878926 C64688F6 5EC400AC 878926C4 4688F65E C4000005 389A5016 .P.¿...á^-.Fá&..¯.á^-.Fõ&..Û.á^- 000020
 C400AA87 8826F65E C400AA87 8926F65E C400FA05 C123C918 00FA2D00 AC878826 &..¯.-'..è#é.'.á^-&..¯.á^-&..¯.á 000040
 00828788 26F65EC4 00828789 26F65EC4 02C48305 5E01569A 5000AC87 2826F65E ^-&•.¯.P.V.^..á.á^-&..ý.á^-&..ý. 000060
 46880000 EC46C700 05EA46C7 0000E846 C70005E6 46C70080 878926F6 5EC4D8F7 ¾Ä^-&..¯.úF|..úFÒ..úFõ..úF$...F 000080
 13EA4603 D22800AA 878826F6 5EC4F05E 89EE4E89 DA13C803 E85E88E6 4E8899C6 ó..N|.^Ò.â.Õ.NŸ.^Þá^-&..¯.+@.Fõ. 0000A0
 00FFFF9A 006A5016 E6468D00 9E87FF26 00A0B7FF 26F65EC4 F45689F2 4689EC56 V±.F·.V¶á^-&.ñ..&.ñ...F|.Pj..... 0000C0
 00A0B7FF 26F65EC4 FE76FFE6 76FFEA76 FF50E646 28EE4688 50EA4628 F2468800 ..F·+FõP.FŸ•F|P.võ.v|.v±á^-&.ñ.. 0000E0
 006A006A 006A00A6 87FF2600 A887FF26 F65EC40E C4830411 04E29A00 9E87FF26 &.ñ...&....á.á^-&.ñ´.&.ñÍ.j.j.j. 000100
 009E87FF 2600A0B7 FF26F65E C4000005 249A026A 006A006A 008087FF 26F65EC4 á^-&.ñ¯.j.j.j..$...á^-&.ñ..&.ñ.. 000120
 8826F65E C4006A00 6A01A068 FA76FFFC 76FFFC56 89FA4689 00000082 9A800668 h........F'.V•.v•.v'h..j.j.á^-&. 000140
 0019C8C9 5F5E1F00 00FFFF9A 016AFA76 FFFC76FF 000000A9 9A5052C0 28008297 .ý.+ÄRP.¯.....v•.v'j.......^_èù.. 000160
 00030002 041D0103 006F0004 05950203 00000003 06A80002 00F30002 04A20103 ..Å...µ...¯.............o......... 000180
 008C0002 04840103 00080002 07150103 000A0002 05AC0103 00080002 06CF0103 ..Ù.......¯........................ 0001A0
 0000000A 05780002 00130002 06E40103 00000008 06080002 008F0002 067D0103 ..}................õ........x..... 0001C0
 001A0004 02390203 00930004 01D30203 001A0002 02C90103 00980002 02E50103 ..Í........è........Æ........9..... 0001E0
```

```
Dump of file SATURN:[PCCOMMON.DUMP.DLL]DFM.TMP;1 on 18-APR-1990 10:44:03.15
File ID (618,10,0)   End of file block 65 / Allocated 68

Virtual block number 17 (00000011), 512 (0200) bytes

 00B20002 036F0103 002E0002 02F70103 00AD0002 02EC0103 00200002 02B30103 ..°...-...š...Ù...¾.......o...ý. 000000
 01900003 04140005 00400004 01E80203 004D0002 02010103 003D0002 07080103 ......=.......M...Ò...ə......... 000020
 E9064688 D88EFFFF B81E5657 000188C8 00000000 00000000 005C0004 05880203 ......\..........à...WV.¡...Ä.F.Ò 000040
 16FE7886 8D006C68 1E00A5E9 08C48300 3400569A 5016FE78 86800064 681E0087 ...hd...x±.P.V.4..Ä.ÒE..hl...x±. 000060
 78E908C4 83005E00 569A5016 FE78868D 0074681E 0090E908 C4830049 00569A50 P.V.I..Ä.Ò...ht...x±.P.V.^..Ä.Ò( 000080
 5016FE78 868D0082 681E0066 E908C483 00730056 9A5016FE 78868000 78681E00 ..h(...x±.P.V.s..Ä.Òf..h....x±.P 0000A0
 003CE908 C483FFFF 00569A50 16FE7886 8D008968 1E0051E9 08C48300 8800569A .V....Ä.Òо..h....x±.P.V....Ä.Ò<. 0000C0
 88E90375 000930FF 7EE90375 00033DFF 71E90375 00013000 33E900E9 E984A288 ¡Å.ÒÒ.Ò3.=..u.Òg.=..u.Ò~.=..u.Ò. 0000E0
 FF78868D FFC4E9FF B2E90375 000C3DFF A5E90375 000830FF 98E90375 000A3DFF .=..u.Ò..=..u.ÒE.=..u.Òÿ.Òå...x. 000100
 06E90375 00F87E83 F8468900 0001379A 5016FA46 805016FE 78868000 80685016 .Ph....x±.P.F°.P.7....F½.-½.u.Ò. 000120
 0006E903 7500003D 00000158 9A5016FC 46800090 681EFA76 FF0088E9 84A98800 .¡`.Ò...v°.h...F•.P.{...=..u.Ò.. 000140
 16FE7886 8D008068 5016FF78 868DFC5E FF5016FE 78868D08 76FF0069 E984A988 ¡`.Òl..v...x±.P.^•..x..Ph....x±. 000160
 FA76FF00 32E9F846 880006E9 037500F8 7E83F846 890000FF FF9A5016 FA468D50 P.F°.P......F½.-½.u.Ò...FÝÒ2..v° 000180
 FF9AFA76 FF000EE9 037500F8 7E83F846 890000FF FF9A0A76 FF0C76FF 016A006A j.j..v..v.......F½.-½.u.Ò...v°.. 0001A0
 00020000 0008001F 00020005 CBC95F5E 1F0000E9 00008800 06E9F846 880000FF ....FÝÒ..¡..Ò...^_èù............ 0001C0
 0000002E 0001016F 0103002D 00010104 0103002C 000100E1 01030000 000A0008 ........Å...,.......-...n....... 0001E0

Dump of file SATURN:[PCCOMMON.DUMP.DLL]DFM.TMP;1 on 18-APR-1990 10:44:03.15
File ID (618,10,0)   End of file block 65 / Allocated 68

Virtual block number 18 (00000012), 512 (0200) bytes

 5EC40000 FFFF9A00 DEB7FF26 00E0B7FF 26065EC4 D88EFFFF 8B1E5657 000004C8 à...WV.¡...Ä6^.&.ñÄ.&.ññ......6^ 000000
 FC5EC400 26E90374 00003D00 00FFFF9A 5016FC46 8D000EB7 FF2600E0 B7FF2606 .&.ñÄ.&.ññ..F•.P.....*..t.Ò&.6^• 000020
 025FFF26 FC5EC437 FF26FC5E C40676FF 0876FF00 13E90375 04470B26 02478B26 &.G.&.G.u.Ò...v..v.6^•&.76^•&._. 000040
 FF5016FC 4680088E 0008881E 56570000 04C8C8C9 5F5E1F00 00E90000 88FFB8E9 ÒE.¡..Ò...^_èùà...WV.¡...Ä.F•.F̄. 000060
 75FE4608 FC468800 00E287C6 26065EC4 0AC483FF FF00009A 0676FF08 76FF0A76 v..v..v.......6.6^.&6.ä...F•.F±u 000080
 0E76FF0A 76FF0676 FF0876FF 002AE903 75084708 26064788 26FC5EC4 003AE903 .Ò:.6^•&.G.&.G.u.Ò*..v..v..v..v. 0000A0
 5EC40008 E9065FFF 26FC5EC4 1076FF12 76FF5052 00E20508 56880646 880C76FF .v..F..V..ä.RP.v..v.6^•&._.Ò..6^ 0000C0
 06468808 28E90E46 88D88E00 76881E56 57000250 C8C8C95F 5E1F0001 07C7260C .&ù....^_èùàP..WV.¡v..Ä.F.Ò(..F. 0000E0
 FF00A897 892600A6 87892612 56881046 88FE0C9E C4FE0E96 89FE0C86 89085688 .V....±.¯.±á..±.F..V.&..Î.&..`.. 000100
 FF00009A FE0CB6FF FE0EB6FF 00000156 9AFE0CB6 FFFE0EB6 FF006A10 76FF1276 v..v.j..Ñ.±.Ñ.±.V....Ñ.±.Ñ.±.... 000120
 1076FF12 76FF0000 FFFF9A0A 76FF0C76 FF186A10 76FF1276 FF0831E9 04C483FF ..6.Òl..v..v.j..v..v.......v..v. 000140
 0E968BFE 0C868810 76FF1276 FF016A00 6AFE0E96 89FE0C86 89000001 8D9A006A j..§......±...±j.j..v..v....±... 000160
 00008800 00E287C6 26FE0C9E C40000FF FF9A206A 006A0094 681E5052 00E205FE ±.ä.RP.h..j.j .....6..±&6.ä..¡.. 000180
 0003109A 006A1076 FF1276FF FDF48689 084688FD 8086890A 468807EF E900008A α..Òÿ..F...¯».F...¶».v..v.j..... 0001A0
 0008E903 7409FDF4 BE830015 E903740A 3C0A24FD 80868AFE 0E9689FE 0C868900 ....±...±..¯»$.<.t.Ò.../¶».t.Ò.. 0001C0
 E9037409 FDF4BE83 0015E903 74423C42 24FD8086 8A000102 8287C726 FE0C9EC4 6..±&ù.......¯»$B<Bt.Ò.../¶».t.Ò 0001E0

Dump of file SATURN:[PCCOMMON.DUMP.DLL]DFM.TMP;1 on 18-APR-1990 10:44:03.15
File ID (618,10,0)   End of file block 65 / Allocated 68

Virtual block number 19 (00000013), 512 (0200) bytes

 7517F0F4 BE8300D4 E903744A 3C4A24FD 80868A00 00028287 C726FE0C 9EC40008 ..6..±&ù.......¯»$J<Jt.Òå../¶».u 000000
 10B80003 E90100B8 0006E903 7417FDF4 BE8300C0 E9037415 FDF4BE83 000AE903 .Ò.../¶».t.Òå../¶».t.Ò..¡..Ò..¡. 000020
 8680406A F276FFF4 76FFF456 89F24689 0000FFFF 9A006A01 6A006AFD 82868901 ...ÿ»j.j.j.......F·.V¶.v¶.v·jə.. 000040
 FF00D29A 5016FE15 86800702 E90003E9 037523FE 148E8000 00FFFF9A 5016FE14 .±.P....../.±#u.Ò..Ò.....±.P.@.. 000060
 FE568E83 0052E903 7407FE54 BE83FE56 9689FE54 8689FFCA 83000000 04C483FF ..6.....ò...T±..V±./T±.t.ÒR../V± 000080
 0CB6FFFE 0EB6FF00 35E90375 00C68708 2600C487 8826FE0C 9EC40048 E90374FF .t.ÒH.6..±&..6.&..6.u.Ò5..Ñ.±.Ñ. 0000A0
 FE0C9EC4 006A006A 5153C80B C928FDB2 9E880000 FFFF9AFF 6AF276FF F476FFFE ±.v¶.v·j........ÿ»+è.ÅSQj.j.6..± 0000C0
 0876FF0A 76FF0C76 FF0E76FF 1076FF12 76FF06A7 E900008A 00008800 C49FFF26 &..6.¡..α..Òl..v..v..v..v..v..v. 0000E0
 00FFFF9A 006A1076 FF1276FF 0681E900 008A0010 88068AE9 0000FFFF 9A0676FF .v......Ò..¡..α..Ò...v..v.j..... 000100
 8686C700 38FD8486 C7FDF296 89FDF086 89085688 064688FE 0E9689FE 0C868900 ....±...±.F..V...ᵬ»..»ú.Ç»8.ú.Ñ 000120
 0010FDE0 86C70352 FDDE86C7 0000FDDC 86C7FD88 8689FD8A 86890000 880000FD ».........ᵬ»..|»ú.Ê»..ú.Ñ»R.ú.Å».. 000140
 681E0002 FDEA86C7 0002FDE8 86C70000 FDE686C7 0008FDE4 86C70000 FDE286C7 ú.ã»..ú.ð»..ú.|»..ú.ò»..ú.õ»...h 000160
 027E87C7 26000102 7C87C726 FE0C9EC4 08C48305 1200569A 5016FD8C 868000A1 Å...¥».P.V....6.6..±&ú.|...&ú.~. 000180
 027C87FF 26027E87 FF26FE0C 9EC4006A 006A0477 FF260677 FF26FDF0 9EC40000 ..6.ᵬ»&.w.&.w.j.j.6..±&.ñ-.&.ñ|. 0001A0
 027E87FF 26FE0C9E C40477FF 260677FF 26FDF09E C40000FF FF9A5016 FD848680 ..Ç».P.....6.ᵬ»&.w.&.w.6..±&.ñ-. 0001C0
 0000052E 9A006A10 76FF1276 FF05A2E9 00008A00 00880000 FFFF9A02 7C87FF26 &.ñ|......¡..α..ÒÅ..v..v.j...... 0001E0
```

```
Dump of file SATURN:[PCCOMMON.DUMP.DLL]DFM.TMP;1 on 18-APR-1990 10:44:03.15
File ID (618,10,0)   End of file block 65 / Allocated 68

Virtual block number 20 (00000014), 512 (0200) bytes

 0C56880A 4688055E E90003E9 03740000 E2BF8026 FE0C9EC4 FE0E9689 FE0C8689 ...±...±á..±&.¢ã..t.Õ..Õ^..F..V. 000000
 02788739 26F45688 F24688FE 0C9EC4F6 468908F7 C0180106 7E83F456 89F24689 .F .V¶.~...à¼Á.F-á..±.F .V¶&9.x. 000020
 056AF276 FFF476FF 006CE903 7400F67E 830075E9 0374027A 97392600 7FE90374 t.Õ..&9.z.t.Õu..--.t.Õl..v¶.v j. 000040
 00A487FF 26FE0C9E C4004DE9 03741256 380055E9 03741046 380000FF FF9A006A j......;F.t.ÕU.;V.t.ÕM.á..±&.ñÉ. 000060
 18896810 76FF1276 FF000004 AB9A006A 006AF276 FFF476FF 18BA6800 A2B7FF26 &.ñÅ.ho..v¶.v j.j..¨....v..v.h¿. 000080
 56890646 89C02800 88022800 11000846 880000FF FF9A006A 006AF276 FFF476FF .v¶.v j.j.......F....+0.Å+á.F..V 0000A0
 509A0A76 FF1076FF 1276FFFD B286890C 4688FDF8 86890A46 880481E9 0484E908 .ÕÇ.ÕÝ..F...½».F...ý».v..v..v..P 0000C0
 FE14BE80 00000265 9A5016FE 14868040 6AF276FF F476FFF4 5689F246 89000006 ....F .V¶.V¶.v jâ...±.P.e..../.± 0000E0
 548689FF CA830000 0004C483 027F0002 9A5016FE 15868004 8CE90003 E9037523 #u.Õ..Õ.....±.P.0....á.....ò...T 000100
 0001FDEE 86C7FE0E 9689FE0C 86890000 06029A00 6A1076FF 1276FFFE 569689FE ±..V±.v..v.j..0......±...±ú.Ý».. 000120
 037406FE 54BE8300 00FFFF9A 5016FDFA 868D009E B7FF2600 A0B7FF26 FE0C9EC4 á..±&.ñ..&.ñ....¹».P....../I±.t. 000140
 14E90374 07FE54BE 83005AE9 037502FD B2BE8300 0AE90374 FFFE56BE 830014E9 Õ.../V±.t.Õ.../ý».u.ÕZ../I±.t.Õ. 000160
 830014E9 03740AFE 54BE8300 3CE90375 03FDB2BE 83000AE9 0374FFFE 56BE8300 ../V±.t.Õ.../ý».u.Õ<../I±.t.Õ... 000180
 56BE8300 B2E90374 03FE54BE 83001EE9 037509FD B2BE8300 0AE90374 FFFE56BE /V±.t.Õ.../ý».u.Õ.../I±.t.Õý../V 0001A0
 008FE903 740000E2 BF8026FE 0C9EC400 9EE90374 01FDB2BE 8300A8E9 0374FFFE ±.t.Õ´../ý».t.Õ..á..±&.¢ã..t.Õ.. 0001C0
 5016FDF6 868D0075 E9037400 0284BF83 26FE0C9E C40084E9 03740400 FDFA86F7 %.¹»..t.Õ..á..±&.¢...t.Õu...-».P 0001E0

Dump of file SATURN:[PCCOMMON.DUMP.DLL]DFM.TMP;1 on 18-APR-1990 10:44:03.15
File ID (618,10,0)   End of file block 65 / Allocated 68

Virtual block number 21 (00000015), 512 (0200) bytes

 7402FDEE BE830EC4 83013F00 6E9AFE0C B6FFFE0E B6FFFDF8 B6FF5016 FDEE868D ..Ý».P.Ñ½».Ñ.±.Ñ.±.n.?..á../Ý».t 000000
 04FDEEBE 830034E9 027A9789 26027887 8926F456 88F24688 FE0C9EC4 0017E903 .Õ..á..±.F .V¶&..x.&..z.Õ4../Ý». 000020
 97892602 78878926 FE0C9EC4 000006EF 9AFDF686 FF1076FF 1276FF00 20E90374 t.Õ ..v..v..Ñ-».ÿ...á..±&..x.&.. 000040
 878826FE 0C9EC400 3FE90374 01FDEEBE 830000E2 87C626FE 0C9EC400 0AE9027A z.Õ..á..±&6.ã.../Ý».t.Õ?.á..±&.. 000060
 FFFE0E86 FF001DE9 03740002 848F8326 FE0C9EC4 002CE903 7500C687 082600C4 á.&..6.u.Õ,.á..±&.¢...t.Õ...Ñ.±. 000080
 86890A46 88028DE9 00C49FFF 26FE0C9E C40676FF 0876FF0A 76FF0C76 FFFE0C86 Ñ.±.v..v..v..v.á..±&..á.Õ§..F... 0000A0
 86C7FE0E 9689FE0C 86890000 01639A00 6A1076FF 1276FFFD EC868906 4688FDF8 Ý».F...$».v..v.j..c.......±....±ú. 0000C0
 BF8326FE 0C9EC4F4 5689F246 890000FF FF9AFDF8 86FF1076 FF1276FF 0001FDEE Ý»...v..v..Ñ½»......F .V¶á..±&.¢ 0000E0
 26FE0C9E C400F5E9 037401FD EC8E8302 84E90000 8A000088 0009E903 75000284 ...u.Õ..|..¤..Õ.../$».t.Õ%.á..±& 000100
 B6FFFE0E B6FFFDF8 B6FF5016 FDEE868D 5016FDF6 868D00E6 E9037400 00E28F80 .¢ã..t.Õ|...-».P..Ý».P.Ñ½».Ñ.±.Ñ 000120
 BE830082 E9037503 FDEEBE83 008CE903 7501FDEE BE830EC4 83061500 6E9AFE0C .±.n....á../Ý».u.ÕV../Ý».u.Õý../ 000140
 830034E9 027A9789 26027887 8926F456 88F24688 FE0C9EC4 0017E903 7402FDEE Ý».t.Õ,.á..±.F .V¶&..x.&..z.Õ4.. 000160
 78878926 FE0C9EC4 000004DF 9AFDF686 FF1076FF 1276FF00 20E90374 04FDEEBE /Ý».t.Õ ..v..v..Ñ-».Õ...á..±&..x 000180
 505200E2 05FE0E96 88FE0C86 880000E2 87C626FE 0C9EC400 0AE9027A 97892602 .&..z.Õ..á..±&6.ã.....±...±.ã.RP 0001A0
 186A1076 FF1276FF 0000E287 C626FE0C 9EC408C4 83038800 569A5016 FE58868D ..X±.P.V....á.á..±&6.ã...v..v.j. 0001C0
 58868D10 76FF1276 FF016A00 6A000001 309A0278 87FF2602 7A87FF26 FE0C9EC4 á..±&.ñz.&.ñx..0...j.j..v..v...X 0001E0

Dump of file SATURN:[PCCOMMON.DUMP.DLL]DFM.TMP;1 on 18-APR-1990 10:44:03.15
File ID (618,10,0)   End of file block 65 / Allocated 68

Virtual block number 22 (00000016), 512 (0200) bytes

 8826FE0C 9EC40030 E9037401 FDEEBE83 0000018F 9A206A00 6A008368 1E5016FE ±.P.h°.j.j ....../Ý».t.Õ0.á..±&. 000000
 76FF0876 FF0A76FF 0C76FFFE 0C86FFFE 0E86FF00 10E90375 00CA8708 2600C887 .à.&..ò.u.Õ...Ñ.±.Ñ.±.v..v..v..v 000020
 0C4688FA 5689F846 89990A46 880142E9 00008A00 008800C8 9FFF26FE 0C9EC406 .á..±&..à.|..¤..Õ8..F...F½.V°.F. 000040
 5689EE46 890000FF FF9A006A 006A5016 F8468D10 76FF1276 FFFE5689 FC468999 ..F=.V±.v..v..F½.Pj.j.......FÝ.V 000060
 89000003 FC9A006A 1076FF12 76FFFDF8 86890000 02CA9AFF 6AEE76FF F076FFF0 Þ.vÞ.vÝj..ò.....½=.v..v.j..=.... 000080
 C4830088 00009AFE 0CB6FFFE 0EB6FFFD F8B6FF50 16FE1086 8DFE0E96 89FE0C86 ..±...±...±.P.Ñ½».Ñ.±.Ñ.±......á 0000A0
 00CC8788 26FE0C9E C4008EE9 00008A00 00880009 E90374FE 128608FE 1086880A ....±...±t.Õ..|..¤..Õ/.á..±&..ã. 0000C0
 FE0CB6FF FE0EB6FF 001BE903 75010E47 F626FE10 9EC40029 E9037500 CE870826 &..ò.u.Õ).á..±&-G..u.Õ...Ñ.±.Ñ.± 0000E0
 E90059E9 0079E900 008A0000 880009E9 0085E900 CC9FFF26 FE0C9EC4 FDF886FF .Ñ½»á..±&..ã.Õ..Õ..|..¤..Õy.ÕY.Õ 000100
 E9037500 3030FD81 E9037500 20300018 E90376F9 DEE90375 00373000 53E90056 V.ÕS.=7.u.Õñ°v.Õ..= .u.Õ.»=0.u.Õ 000120
 007330FA 96E90375 004330F7 A8E90375 003830FF D2E9F9CA E9037500 3630F885 .«=6.u.Õò°Õ0.=;.u.Õ´%=C.u.Õ.¹=s. 000140
 76FF1076 FF1276FF FFA7E9F7 D2E90375 18B930F8 39E90375 007A30FE EEE90375 u.ÕÝ±=z.u.Õ9½=¿.u.Õ0%ÕI..v..v..v 000160
 000008C8 000ECAC9 5F5E1F00 00E90000 03049A06 76FF0876 FF0A76FF 0C76FF0E ..v..v..v..v......Õ...^ èò..à... 000180
 A2B7FF26 00A487FF 26F85EC4 FA5689F8 46890C56 880A4688 D88E00F3 881E5657 VV.¡µ..Å.F..V..F½.V°á^½Ì.ÑÉ.& ñÅ 0001A0
 89FC4689 0000FFFF 9AF876FF FA76FF08 76FF0676 FFFFFF68 07456801 6A006A00 .j.j.hE.h...v..v..v°.v½......¹ . 0001C0
 1F0000E9 00008800 03E90000 FFFF9A00 6A006A00 0CE90374 FE4608FC 4688FE56 V±.F=.F±t.Õ..j.j......Õ..¡..Õ... 0001E0
```

Dump of file SATURN:[PCCOMMON.DUMP.DLL]DFN.TMP;1 on 18-APR-1990 10:44:03.15
File ID (618,10,0) End of file block 65 / Allocated 68

Virtual block number 23 (00000017), 512 (0200) bytes

```
03000000 02088C00 0200F300 0209F201 03014800 07003102 03001708 CAC95F5E ^_èò.....1...H.......#...¥...... 000000
03000000 0509C600 02000400 0204F801 0300E800 0509C900 05007A00 02090801 .Ã...z...è...Š...½.......ó...... 000020
02001300 02079401 03000000 0807C900 02008800 02080C01 03000A00 02055501 .U..............è............... 000040
03001E00 0207EF01 03001000 02088A01 03001900 02046301 03000000 0A09A400 .Ê.......c..............ÿ...... 000060
0300A800 0303E601 03002300 02087701 03009A00 0303C701 03001F00 02089801 ..........ú.......w...#...Ì..... 000080
00004E00 02024C01 03012300 07001A02 03004500 02049301 0300B300 02098E01 ......*.......E.......#...L...N.. 0000A0
006A006A 006A006A 0165680C 76FF0E76 FF1076FF D88EFFFF 881E5657 000002C8 à...WV.|...Ä.v..v..v.he.j.j.j.j. 0000C0
76FF5052 FE4608C0 28065688 0168680C 76FF0E76 FF1076FF FE468900 0000459A .E....F±.v..v..v.hh..V.*à.F±RP.v 0000E0
FFD88E00 08881E56 57000004 C8000CCA C95F5E1F 0000E900 00FFFF9A 0876FF0A ..v.......Õ...^_èò..à...WV.|...Ä. 000100
FFFE5689 FC468900 0000979A 006A006A 0C76FF00 6A016A68 0A76FF06 76FF0876 v..v..v.hj.j..v.j.j.......F•.V±. 000120
76FF0876 FF000000 859A006A 006A5052 D2280C46 88016368 0A76FF06 76FF0876 v..v..v.hc..F.*@RPj.j..ç....v..v 000140
FF0676FF 0876FF00 0000019A 0E76FF10 76FF5052 D2280C46 88016168 0A76FF06 ..v.ha..F.*@RP.v..v..l....v..v.. 000160
56570000 06C8C8C9 5F5E1F00 0000219A FC76FFFE 76FF0C76 FF006A01 69680A76 v.hi.j..v..v±.v=.!....^_èùà...WV 000180
00B4B7FF 26008687 FF26FC5E C40000FF FF9A5016 FC468D0E 76FFD88E 005B881E .|[..Ä.v..F•.P.....á^•&.ñÑ.&.ñÇ. 0001A0
001DE999 FA468800 07E90375 00FA7E83 FA468900 00FFFF9A 016A0A76 FF0C76FF .v..v.j.......F*.-*.u.Õ...F*.Õ.. 0001C0
5F5E1F00 00E90000 8A000088 0000FFFF 9A016A00 6A029A68 006A1DAF 680E76FF .v.hÊ.j.h..j.j......|..n..Õ...^_ 0001E0
```

Dump of file SATURN:[PCCOMMON.DUMP.DLL]DFN.TMP;1 on 18-APR-1990 10:44:03.15
File ID (618,10,0) End of file block 65 / Allocated 68

Virtual block number 24 (00000018), 512 (0200) bytes

```
006A006A 0126680C 76FF0676 FF0876FF D88E00E2 881E5657 000000C8 000ACAC9 èò..à...WV.|ã..Ä.v..v..v.h&.j.j. 000000
01979A00 6A006A00 6A006A01 26680E76 FF0676FF 0876FF00 00017E9A 006A006A j.j..~.....v..v..v.h&.j.j.j.j.... 000020
C8C95F5E 1F000000 759A006A 006A016A 006A0126 680A76FF 0676FF08 76FF0000 ...v..v..v.h&.j.j.j.j...u....^_èù 000040
7E800000 FFFF9A50 168C4680 406A0A76 FF0C76FF D88E014C 881E5657 000044C8 ÄO..WV.|L..Ä.v..v.jà.F¥.P.......~ 000060
FC4689FF CA830000 0D04C483 FFFF0002 9A50168D 46800066 E90003E9 0375238C ¥#u.Õ..Õf..F§.P.@....á.....ò..F• 000080
7E83001B E9037502 0E7E8300 09E90374 FFFE7E83 0012E903 7407FC7E 83FE5689 .V±.-•.t.Õ...-±.t.Õ...-..u.Õ...~ 0000A0
FF1276FF 1476FF00 17E90374 010E7E83 0020E903 74FFFE7E 830029E9 037406FC =.t.Õ)..-±.t.Õ ..-..t.Õ...v..v.. 0000C0
8E01A888 1E565700 0004C8CB C95F5E1F 0AC483FF FF01449A 0676FF08 76FF1076 v..v..v..D....á..^_èùà...WV.|`.. 0000E0
0000027F 9A0A76FF 0C76FF00 6A006A01 61680477 FF260E5E C41276FF 1476FF08 Ä.v..v.á^.&.w.ha.j.j..v..v...... 000100
F49A0676 FF0876FF FE76FF00 6A016968 0477FF26 0E5EC412 76FF1476 FFFE4689 .F±.v..v.á^.&.w.hi.j..v±.v..v..¶ 000120
FFFF9A50 520000FF FF9A0277 FF260E5E C41276FF 1476FF12 76FF1476 FF000002 ....v..v..v..v.á^.&.w......RP... 000140
01449A12 76FF1476 FF0677FF 260E5EC4 0877FF26 0E5EC40A 77FF260E 5EC40000 ..á^.&.w.á^.&.w.á^.&.w..v..v..D. 000160
76FF1476 FF0000FF FF9A00C0 681E0277 FF260E5E C41276FF 1476FF0A C483022B •..á..v..v.á^.&.w..hà.......v..v 000180
75FFFC7E 83FC4689 0000031E 9A006A00 6A006A00 6A016568 0477FF26 0E5EC412 .á^.&.w.he.j.j.j.j.......F•.-•.u 0001A0
01659A00 6A006AFC 76FF006A 01646804 77FF260E 5EC41276 FF1476FF 001EE903 .Õ...v..v.á^.&.w.hd.j..v•j.j..e. 0001C0
76FF1476 FFD88E02 30881E56 57000004 C80010CA C95F5E1F 0000E900 00880000 ..|..Õ...^_èò..à...WV.|=..Ä.v..v 0001E0
```

Dump of file SATURN:[PCCOMMON.DUMP.DLL]DFN.TMP;1 on 18-APR-1990 10:44:03.15
File ID (618,10,0) End of file block 65 / Allocated 68

Virtual block number 25 (00000019), 512 (0200) bytes

```
74FFFC7E 83FC4689 0000037F 9A006A00 6A006A00 6A016568 0477FF26 0E5EC412 .á^.&.w.he.j.j.j.j.......F•.-•.t 000000
9C9A0A76 FF0C76FF FF6A006A 01616804 77FF260E 5EC41276 FF1476FF 0064E903 .Õd..v..v.á^.&.w.ha.j.j..v...... 000020
000003C1 9A006A00 6A006A00 6A016068 0477FF26 0E5EC412 76FF1476 FF000003 ....v..v.á^.&.w.h`.j.j.j.j..t .. 000040
0676FF08 76FF5000 6A48FE46 88016968 0477FF26 0E5EC412 76FF1476 FFFE4689 .F±.v..v.á^.&.w.hi..F±Hj.P.v..v. 000060
6A5052D2 28FC4688 01636804 77FF260E 5EC41276 FF1476FF 0062E900 0003E49A .Õ...Õb..v..v.á^.&.w.hc..F•*@RPj 000080
FF5052D2 28FC4688 01616804 77FF260E 5EC41276 FF1476FF 00000406 9A006A00 .j.......v..v.á^.&.w.ha..F•*@RP. 0000A0
FFFC76FF 006A0169 680477FF 260E5EC4 1276FF14 76FF0000 04269A0A 76FF0C76 v..v..&....v..v.á^.&.w.hi.j..v•. 0000C0
FF0677FF 260E5EC4 0877FF26 0E5EC40A 77FF260E 5EC40000 025C9A06 76FF0876 v..v..\...á^.&.w.á^.&.w.á^.&.w.. 0000E0
D79A00C1 681E0277 FF260E5E C41276FF 1476FF0A C48302C0 01449A12 76FF1476 v..v..D.à..á..v..v.á^.&.w..hê..• 000100
FF0C76FF D88E0337 881E5657 000002C8 0010CAC9 5F5E1F00 00E90000 88000002 ...|..Õ...^_èò..à...WV.|7..Ä.v.. 000120
FFFE7E83 FE468900 0004C19A 006A006A 006A006A 01656804 77FF2606 5EC40A76 v.á^.&.w.he.j.j.j.j..ê....F±.-t. 000140
006A006A 5052022B FE468801 63680477 FF26065E C40A76FF 0C76FF00 20E90375 u.Õ ..v..v.á^.&.w.hc..F±*@RPj.j. 000160
0A76FF0C 76FF0677 FF26065E C40877FF 26065EC4 0A77FF26 065EC400 0003549A .T...á^.&.w.á^.&.w.á^.&.w..v..v. 000180
00880000 045F9A00 C2681E02 77FF2606 5EC40A76 FF0C76FF 0AC48304 4801449A .D.H..á..v..v.á^.&.w..hõ.._....|. 0001A0
105EC414 76FF1676 FFD88E04 78881E56 57000004 C80008CA C95F5E1F 0000E900 .Õ...^_èò..à...WV.|x..Ä.v..v.á^. 0001C0
E903730E 4639FE46 88FE4689 00000577 9A006A00 6A006A00 6A016068 0477FF26 &.w.h`.j.j.j.j..w....F±.F±9F.s.Õ 0001E0
```

```
Dump of file SATURN:[PCCOMMON.DUMP.DLL]DFM.TMP;1 on 18-APR-1990 10:44:03.15
File ID (618,10,0)   End of file block 65 / Allocated 68

Virtual block number 26 (0000001A), 512 (0200) bytes

 0477FF26 105EC414 76FF1676 FF0040E9 03750C46 080A4688 0084E99A 78880006 ..ıx.Õ...F..F.u.Õ∂..v..v.á^.&.w. 000000
 7E83FC46 89000005 889A0A76 FF0C76FF 50520E46 08C02817 8826105E C4016868 hh.á^.&..+â.F.RP.v..v..ı....F•.- 000020
 76FF0028 E9037508 46080646 880039E9 0000FFFF 9A006A00 6A000CE9 037400FC •.t.Õ..j.j......Õ9..F..F.u.Õ(..v 000040
 26065EC4 00000495 9A006A00 6A0E76FF 006A016A 680477FF 26105EC4 1476FF16 ..v.á^.&.w.hj.j..v.j.j......á^.& 000060
 FFD88E05 13881E56 57000002 C80012CA C95F5E1F 0000E900 00880257 89260789 ..&.W.ı..Õ...^_èõ..à...WV.ı...Ä. 000080
 88FE4689 00000530 9A006A00 6A006A00 6A016568 0477FF26 125EC416 76FF1876 v..v.á^.&.w.he.j.j.j.j..0....F±. 0000A0
 FF1276FF 1476FF16 76FF1876 FF078926 FE4688OE 5EC40009 E9037510 46080E46 F..F.u.Õ..á^..F±&...v..v..v..v.. 0000C0
 000AC800 14CAC95F 5E1F0000 E904E305 089A0676 FF0876FF 0A76FF0C 76FFFE76 v±.v..v..v..v....Ð.Õ...^_èõ..à.. 0000E0
 5EC41E6A 0676FFFA 46891046 880000FE 46C70001 FC46C708 8E050888 1E565700 .WV.ıÜ..ÄúF•..úF±...F..F¯.v.j.á^ 000100
 1676FF00 48E90374 06473926 FA468808 5EC40000 FFFF9A50 16F6468D 37FF2608 .&.7.F-.P.....á^..F•&9G.t.ÕH..v. 000120
 0375003F 8026F65E C4000006 EA9AF676 FFF876FF 506A0277 FF26085E C41476FF .v.á^.&.w.jP.v½.v-.õ...á^-&.?.u. 000140
 89990707 02359A00 6A006AF6 76FFF876 FF0876FF 0A76FF14 76FF1676 FF0022E9 Õ"..v..v..v..v..v½.v-j.j..5..... 000160
 77FF2608 5EC41476 FF1676FF 003CE903 74084739 26FA4688 085EC4FE 5689FC46 F•.V±á^..F•&9G.t.Õ<..v..v.á^.&.w 000180
 F676FFF8 76FF0876 FF0A76FF 1476FF16 76FF0000 FFFF9AF6 76FFF876 FF506A02 .jP.v½.v-......v..v..v..v..v½.v- 0001A0
 FF0018E9 03740A47 3926FA46 88085EC4 FE5689FC 46899907 2E032F9A 006A006A j.j../.....F•.V±á^..F•&9G.t.Õ... 0001C0
 F676FFF8 76FF0676 FFFE5689 FC468999 06310470 9A0876FF 0A76FF14 76FF1676 v..v..v..v..p.1...F•.V±.v..v½.v- 0001E0

Dump of file SATURN:[PCCOMMON.DUMP.DLL]DFM.TMP;1 on 18-APR-1990 10:44:03.15
File ID (618,10,0)   End of file block 65 / Allocated 68

Virtual block number 27 (0000001B), 512 (0200) bytes

 8E0645B8 1E565700 000AC800 12CAC95F 5E1F0000 E9FE5688 FC468800 00FFFF9A ......F•.V±Õ...^_èõ..à...WV.ıE.. 000000
 C4002CE9 037401FC 7E830009 E9037502 FC7E83FC 46891246 88F64689 10468808 Ä.F..F-.F..F•.-=.u.Õ...-•.t.Õ,.á 000020
 1676FF0C 76FF0E76 FFFC76FF 0677FF26 085EC408 77FF2608 5EC40A77 FF26085E ^.&.w.á^.&.w.á^.&.w..v•.v..v..v. 000040
 0087E9FC 46880098 E9037404 473926F6 4688085E C410C483 068C01A0 9A1476FF .v....¥..á.á^..F-&9G.t.Õ...F•Õ.. 000060
 6A0676FF FE468900 0008119A 006A006A 006A006A 016568F6 76FF1476 FF1676FF .v..v..v-he.j.j.j.j.......F±.v.j 000080
 085EC401 6868F676 FF1476FF 1676FF00 00066A9A 5016F846 8037FF26 085EC41E .á^.&.7.F½.P.j....v..v..v-hh.á^. 0000A0
 FF26085E C41476FF 1676FF00 0005F89A F876FFFA 76FF5052 FE4608C0 28178826 &..+â.F±RP.v•.v½.½....v..v.á^.&. 0000C0
 008A0000 88000007 419AF876 FFFA76FF 0676FF00 0004FA9A F876FFFA 76FF0277 w..v•.v½.•....v..v•.v½.A....ı..¤. 0000E0
 CAC95F5E 1F0000E9 00008A00 01880000 E9FF71E9 03750001 300008E9 0017E900 .Õ..Õ..=..u.Õg.Õ..ı..¤..Õ...^_èõ 000100
 006A0160 680677FF 260A5EC4 0676FF08 76FFD88E 0750881E 56570000 12C80012 ..à...WV.ıJ..Ä.v..v.á^.&.w.h'¯j. 000120
 EE4639FE 4688EE46 FF0003E9 EE46890E 4688FE46 89000008 CF9A006A 006A006A j.j.j..ü....F±.F..FŸÕ...FŸ.F±9FŸ 000140
 4608C028 16578826 0A5EC401 68680677 FF260A5E C40676FF 0876FF00 ECE90372 r.Õ$..v..v.á^.&.w.hh.á^.&.W.+â.F 000160
 0677FF26 0A5EC406 76FF0876 FF000008 ED9A1C77 FF261E77 FF260A5E C45052EE ŸRPá^.&.w.&.w..Ü....v..v.á^.&.w. 000180
 00C3681E 5040EE46 88FC5689 FA468900 0009439A 006A006A EE76FF00 6A016A68 hj.j..vŸj.j..C....F•.V•.FŸ∂P.hû. 0001A0
 9A1C77FF 261E77FF 260A5EC4 5016F046 8D046A0A C4830922 00069A50 16F04680 .Fb.P.ø."..á.j..Fb.Pá^.&.w.&.w.. 0001C0
 006A5052 D228EE46 88016368 0677FF26 0A5EC406 76FF0876 FF0AC483 01D200A4 Ê.Ø..á..v..v.á^.&.w.hc..FŸ+ØRPj. 0001E0

Dump of file SATURN:[PCCOMMON.DUMP.DLL]DFM.TMP;1 on 18-APR-1990 10:44:03.15
File ID (618,10,0)   End of file block 65 / Allocated 68

Virtual block number 28 (0000001C), 512 (0200) bytes

 5EC45052 D228EE46 88016168 0677FF26 0A5EC406 76FF0876 FF000009 6A9A006A j..j....v..v.á^.&.w.ha..FŸ+ØRPá^ 000000
 006A0169 680677FF 260A5EC4 0676FF08 76FF0000 098A9A1C 77FF261E 77FF260A .&.w.&.w.......v..v.á^.&.w.hi.j. 000020
 086A881E 56570000 06C8C8C9 5F5E1FFF 06E90000 07D59AFA 76FFFC76 FFEE76FF .vŸ.v•.v•.ı...Õ...^_èùà...WV.ıj. 000040
 76FF0C76 FF0676FF 0876FF00 0447C626 065EC400 24E90375 0C46080A 4688D88E .Ä.F..F.u.Õ$.á^.&6G¯..v..v..v..v 000060
 FC5689FA 46890006 05085688 06468820 0447C626 065EC408 C4830A64 00569A0A ..V.d..á.á^.&6G. .F..V.....F•.V• 000080
 75003F80 26FA5EC4 000FE903 75080007 87F6FF2A 1F8A26FA 5EC4FA46 FF0003E9 Õ...F•á^•&..*.-.ø..u.Õ..á^•&.?.u 0000A0
 5EC40008 E9037514 46081246 880028E9 0374003F 8026FA5E C4FFDCE9 0003E903 .Õ..ÕE.á^•&.?.t.Õ(..F..F.u.Õ..á^ 0000C0
 46081246 88005EE9 0007C626 0E5EC400 07E90375 1046080E 46880000 07C72612 .&ú....F..F.u.Õ..á^.&6..Õ^..F..F 0000E0
 52000605 08568806 46880007 C626FA5E C4FE4688 078A26FA 5EC40034 E9037514 .u.Õ4.á^•&...F±á^•&6...F..V....R 000100
 1046080E 46880788 26FE468A FA5EC407 8926125E C4E8D104 C4830A94 008C9A50 P......á.1Õá^.&..á^•.F±&...F..F. 000120
 02C8C8C9 5F5E1F08 C4830908 00569A0E 76FF1076 FFFA76FF FC76FF00 14E90375 u.Õ...v•.v•.v..v..V....á..^_èùà. 000140
 C4830AE4 00D69A0E 76FF1076 FF00C768 1E504006 4688D88E 099E881E 56570000 ..WV.ı...Ä.F.∂P.hü..v..v..ø¯Õ..á 000160
 76FF1076 FF00CD68 1E0015E9 0372FE46 39084688 FE46FF00 03E90000 FE46C70A .úF±..Õ...F±.F.9F±r.Õ...hê..v..v 000180
 08C48309 C400109A 0E76FF10 76FF0A76 FF0C76FF FFD0E908 C4830AF8 00109A0E ....•..á.Õı..v..v..v..v....á..á. 0001A0
 60680677 FF260A5E C40676FF 0876FF08 8E0AA688 1E565700 0002C8C8 C95F5E1F .^_èùà...WV.ıJ..Ä.v..v.á^.&.w.h' 0001C0
 C404C483 0A8C00CE 9A0E76FF 1076FFFE 46890000 08879A00 6A006A00 6A006A01 .j¯j.j.j.......F±.v..v..Õ.¥..á.á 0001E0
```

Dump of file SATURN:[PCCOMMON.DUMP.DLL]DFM.TMP;1 on 18-APR-1990 10:44:03.15
File ID (618,10,0)   End of file block 65 / Allocated 68

Virtual block number 29 (0000001D), 512 (0200) bytes

```
C4000CE9 03770739 26FE4688 125EC400 0EE90375 003F8326 125EC407 8926125E ^.&..á^.&.7.u.Õ..á^..F±&9.w.Õ..á 000000
080DB81E 56570000 00C8C8C9 5F5E1F0F FF26125E C40006E9 078926FE 4688125E ^..F±&..Õ..á^.&...^_èuà...WV.¡.. 000020
08490E4E 88C02816 5788260A 5EC40168 680677FF 260A5EC4 0676FF08 76FFD88E .Ä.v..v.á^.&.w.hh.á^.&.U.+à.N.I. 000040
6A006A00 6A006A10 76FF1276 FF000008 2A9A1C77 FF261E77 FF260A5E C45052C1 éRPá^.&.w.&.w..*....v..v.j.j.j.j 000060
1E565700 0018C8CB C95F5E1F 10C48307 A609969A 1C77FF26 1E77FF26 0A5EC400 .á^.&.w.&.w....Ì..Á..^_èuà...WV. 000080
46890000 0C499A00 6A006A00 6A006A01 65680876 FF0E76FF 1076FFD8 8E087E88 ¡-..Ä.v..v..v.he.j.j.j.j..Ì....F 0000A0
FF1076FF 02CAE900 008A0000 880009E9 037400EA 7E830009 E90375FF EA7E83EA õ.~õ.u.Õ...~õ.t.Õ..¡..¤..Õò..v.. 0000C0
0A5EC450 52EA4608 C0280088 D2280007 05164788 260A5EC4 01686808 76FF0E76 v..v.hh.á^.&.G....+@.Á+à.FõRPá^. 0000E0
F2468D18 77FF261A 77FF260A 5EC45016 FE468D00 0000039A 1C77FF26 1E77FF26 &.w.&.w.......F±.Pá^.&.w.&.w..F 000100
5016E846 8DEE4689 FE468810 C4830C92 09969A1C 77FF261E 77FF260A 5EC45016 .Pá^.&.w.&.w.......á..F±.FŸ.Fò.P 000120
30E90374 0100067E 810EC483 00260876 9A0E76FF 1076FF0A 76FF0C76 FFEA76FF .võ.v..v..v..v..v.&..á..~...t.Õ0 000140
FC4639FE 4688FE46 89C103C2 230218C1 2841E84E 8840FE46 88FC4689 FE468800 ..F±.F=.F±ã.NÒA+ê.@#ò.ê.F±.F±9F= 000160
0009E9FE 4EFF0006 E9037700 FE7E8300 18E90218 E900008A 00008800 09E90374 t.Õ..¡..¤..Õ..Õ...~±.w.Õ...N±Õ.. 000180
006AEA76 FF006A01 64680677 FF260A5E C40E76FF 1076FF01 FDE90000 8A000088 ¡..¤..Õ»..v..v.á^.&.w.hd.j..võj. 0001A0
FE76FF18 77FF261A 77FF260A 5EC41C77 FF261E77 FF260A5E C4000000 609A006A j..m...á^.&.w.&.w.á^.&.w.&.w..v± 0001C0
0677FF26 0A5EC4EA 76FF1C77 FF261E77 FF260A5E C40CC483 00490A9E 9AEA76FF .võ...I..á.á^.&.w.&.w..võá^.&.w. 0001E0
```

Dump of file SATURN:[PCCOMMON.DUMP.DLL]DFM.TMP;1 on 18-APR-1990 10:44:03.15
File ID (618,10,0)   End of file block 65 / Allocated 68

Virtual block number 30 (0000001E), 512 (0200) bytes

```
77FF260A 5EC40E76 FF1076FF F04689EA 46880CC4 830DE700 539A0E76 FF1076FF .v..v..S.Ó..á..Fõ.Fb.v..v.á^.&.w 000000
0A5EC40E 76FF1076 FFEA46FF FA468900 0000A89A 006A006A 006A006A 01606806 .h'.j.j.j.j.......F*.Fõ.v..v.á^. 000020
260A5EC4 5052EA46 08C02800 88D22800 07051647 88260A5E C4016868 0677FF26 &.w.hh.á^.&.G....+@.Á+à.FõRPá^.& 000040
00058C9A 006A006A 000CE903 7400EC7E 83EC4689 00000E90 9A1C77FF 261E77FF .w.&.w.......F§.-§.t.Õ..j.j..... 000060
1E77FF26 0A5EC450 16F24680 1877FF26 1A77FF26 0A5EC450 16FE4680 EC468900 ..F§.F±.Pá^.&.w.&.w..F .Pá^.&.w. 000080
E90372EA 4639FA46 8800C8E9 0377FE46 39EE4688 10C4830E 3409969A 1C77FF26 &.w....4..á..FŸ9F±w.Õà..F*9Fõr.Õ 0000A0
1C77FF26 1E77FF26 0A5EC4FE 4EFF0003 E9FE46FF 0006E903 74010006 7E81008D §..~...t.Õ...F±Õ...N±á^.&.w.&.w. 0000C0
1E77FF26 0A5EC40C C4830E57 0A9E9AEA 76FFFE76 FF1877FF 261A77FF 260A5EC4 á^.&.w.&.w..v±.võ...W..á.á^.&.w. 0000E0
FFEA46FF 0CC4830E 8700539A 0E76FF10 76FF0677 FF260A5E C4EA76FF 1C77FF26 &.w..võá^.&.w..v..v..S.ñ..á..Fõ. 000100
08C02800 88D22800 07051647 88260A5E C4016868 0677FF26 0A5EC40E 76FF1076 v..v.á^.&.w.hh.á^.&.G....+@.Á à. 000120
1A77FF26 0A5EC450 16FE468D 00000ED9 9A1C77FF 261E77FF 260A5EC4 5052EA46 FõRPá^.&.w.&.w..)....F±.Pá^.&.w. 000140
FFFF20E9 10C48308 CF09969A 1C77FF26 1E77FF26 0A5EC450 16F24680 1877FF26 &.w..F·.Pá^.&.w.&.w....ü..á.Õ-.. 000160
00008800 0008AF9A 016A006A F076FF00 6A016468 0677FF26 0A5EC40E 76FF1076 v..v.á^.&.w.hd.j..vbj.j..€...¡.. 000180
226A1E6A 1876FFD8 8E08E188 1E565700 0006C800 0CCAC95F 5E1F0000 E900008A ¤..Õ...^_èb..à...WV.¡Ä..Ä.v.j.j" 0001A0
4688FC5E C4017DE9 FA468800 06E90375 000030FA 46890000 07ED9A50 16FC4680 .F•.P.Ú....F*=..u.Õ...F*Õ).á^•.F 0001C0
89261046 88FC5EC4 04478926 124688FC 5EC40247 89261446 88FC5EC4 07892618 .&..á^•.F.&.G.á^•.F.&.G.á^•.F.&. 0001E0
```

Dump of file SATURN:[PCCOMMON.DUMP.DLL]DFM.TMP;1 on 18-APR-1990 10:44:03.15
File ID (618,10,0)   End of file block 65 / Allocated 68

Virtual block number 31 (0000001F), 512 (0200) bytes

```
0C478926 0A4688FC 5EC40A47 89260C46 88FC5EC4 08478926 0E4688FC 5EC40647 G.á^•.F.&.G.á^•.F.&.G.á^•.F.&.G. 000000
50220E47 6826FC5E C41E6A18 76FF0000 1047C726 FC5EC400 320E47C7 26FC5EC4 á^•&úG.2.á^•&úG....v.j.á^•&kG."P 000020
76FF1876 FF0014E9 03750000 3DFA4689 00000F01 9A505200 1205FE56 88FC4688 .F•.V±...RP.1....F*=..u.Õ...v..v 000040
5EC41E6A 1876FF16 47892616 4688FC5E C400E9E9 FA468800 000FEF9A FC76FFFE ±.v=.ÿ....F*ÕÕ.á^•.F.&.G..v.j.á^ 000060
0027E903 75000030 FA468900 00102E9A 50520018 05FE5688 FC468816 77FF26FC =&.w..F=.V±...RP......F*=..u.Õ'. 000080
00104C9A FC76FFFE 76FF1876 FF00000F F09A1277 FF261477 FF26FC5E C41876FF .v.á^•&.w.&.w..»....v..v±.v•.L.. 0000A0
07051647 8826FC5E C41E6A18 76FF0007 C626185F C426FC5E C40091E9 FA468800 ..F*Õ..á^•&á_.&ó...v.j.á^•&.G... 0000C0
1876FF00 3AE90375 000030FA 46890000 0F069A50 52001C05 FE5688FC 46885000 .P.F•.V±...RP̄......F*=..u.Õ:..v. 0000E0
609A1277 FF261477 FF26FC5E C41876FF 0000105F 9A1877FF 261A77FF 26FC5EC4 á^•&.w.&.w.._....v.á^•&.w.&.w..m 000100
C6261C5F C426FC5E C40021E9 FA468800 0008379A FC76FFFE 76FF1876 FF000010 ....v..v±.v•.7....F*ÕI.á^•&á_.&ó 000120
C80014CA C95F5E1F 0000E900 00880257 89260789 26FE5688 FC468806 5EC40007 ..á^..F•.V±&..&.W.¡..Õ...^_èõ..à 000140
E9037524 46082246 88FE5689 FC468928 56882646 88088E0E F5881E56 57000004 ...WV.¡%..Ä.F&.V(.F•.V±.F"̄.F$u.Õ 000160
02478826 FC5EC400 0DE90375 1C46081A 46880789 26225EC4 078826FC 5EC4000C ..á^•&..á^"&...F..F.u.Õ..á^•&.G. 000180
46880789 26165EC4 04478826 FC5EC400 0DE90375 18460816 46880789 261A5EC4 á^.&...F..F.u.Õ..á^•&.G.á^.&...F 0001A0
0DE90375 1046080E 46880789 26125EC4 06478826 FC5EC400 0DE90375 14460812 ..F.u.Õ..á^•&.G.á^.&...F..F.u.Õ. 0001C0
0A478826 FC5EC400 0DE90375 0C46080A 46880789 260E5EC4 08478826 FC5EC400 .á^•&.G.á^.&...F..F.u.Õ..á^•&.G. 0001E0
```

```
Dump of file SATURN:[PCCOMMON.DUMP.DLL]DFM.TMP;1 on 18-APR-1990 10:44:03.15
File ID (618,10,0)   End of file block 65 / Allocated 68

Virtual block number 32 (00000020), 512 (0200) bytes

 46880789 26065EC4 0C478826 FC5EC400 0DE90375 08460806 46880789 260A5EC4 6^.&...F..F.u.Õ..á^*&.G.á^.&...F 000000
 C95F5E1F 0000E900 00880789 261E5EC4 16478826 FC5EC400 0DE90375 2046081E ..F u.Õ..á^*&.G.á^.&..|..Õ...^_\ 000020
 76FF1876 FFFC5689 FA468914 56881246 88D88E10 A7881E56 57000008 C80024CA ò$.à...WV.|Ï..Ä.F..V..F*.V=.v.., 000040
 7D00107E 83FE4689 000008FA 9A006A00 6A006A00 6A016068 0677FF26 FA5EC416 .á^*&.w.h'.j.j.j.j..*....F±.-..) 000060
 7DE90375 003F8026 0A5EC410 4689FE46 880006E9 03771046 39FE4688 0008E903 .Õ...F±9F.w.Õ...F±.F.Á^.&.?.u.Õ) 000080
 0CC4830C 700A9E9A 1076FF0E 76FF0A76 FF0C76FF 1C77FF26 1E77FF26 FA5EC400 .á^*&.w.&.w..v..v..v..v....r..á. 0000A0
 FF261E77 FF26FA5E C45052D2 28104688 01616806 77FF26FA 5EC41676 FF1876FF .v..v.á^*&.w.ha..F.+ØRPá^*&. .&. 0000C0
 FF0876FF 1076FF00 6A016968 0677FF26 FA5EC416 76FF1876 FF000012 439A1C77 w..C....v..v.á^*&.w.hi.j..v..... 0000E0
 5EC40AC4 83127C08 629A1676 FF1876FF FA76FFFC 76FF1076 FF000012 C69A0676 v..ó....v..v=.v*.v..v..b.|..á.á^ 000100
 C48311F8 01449A16 76FF1876 FF0877FF 26FA5EC4 0A77FF26 FA5EC40C 77FF26FA *&.w.á^*&.w.á^*&.w..v..v..D.w..á 000120
 FA5EC416 76FF1876 FF000012 A99A0000 681E0477 FF26FA5E C41676FF 1876FF0A ..v..v.á^*&.w..hÅ..`....v..v.á^* 000140
 6A006A01 65680677 FF26FA5E C41676FF 1876FF00 0008299A 0001681E 0277FF26 &.w..hi..)....v..v.á^*&.w.he.j.j 000160
 26FA5EC4 1676FF18 76FF001E E90375FF F87E83F8 46890000 12F09A00 6A006A00 .j.j..b....F½.~½.u.Õ...v..v.á^*& 000180
 14CAC95F 5E1F0000 E9000088 00001184 9A006A00 6AF876FF 006A0164 680677FF .w.hd.j..v½j.j..Ç...|..Õ...^_èò. 0001A0
 C41676FF 1876FFFC 5689FA46 89145688 12468808 8E118888 1E565700 0008C800 .à...WV.|...Ä.F..V..F*.V=.v.¯v.á 0001C0
 C41676FF 1876FFF8 46890000 13529A00 6A006A00 6A006A01 65680677 FF26FA5E ^*&.w.he.j.j.j.j..R....F½.v..v.á 0001E0
```

```
Dump of file SATURN:[PCCOMMON.DUMP.DLL]DFM.TMP;1 on 18-APR-1990 10:44:03.15
File ID (618,10,0)   End of file block 65 / Allocated 68

Virtual block number 33 (00000021), 512 (0200) bytes

 E9037D00 107E83FE 46890000 13B79A00 6A006A00 6A006A01 60680677 FF26FA5E ^*&.w.h'.j.j.j.j..ñ....F±.-..).Õ 000000
 76FF1C77 FF261E77 FF26FA5E C4104689 FE468800 06E90377 104639FE 46880008 ...F±9F.w.Õ...F±.F.á^*&.w.&.w..v 000020
 76FF1876 FF0020E9 0375FFF8 7E830CC4 83141F0A 9E9A1076 FF0E76FF 0A76FF0C ..v..v..v.......á..-½.u.Õ ..v..v 000040
 76FF1876 FF000013 DE9A006A 006A5052 D22BF846 88016368 0677FF26 FA5EC416 .á^*&.w.hc..F½+ØRPj.j..ñ....v..v 000060
 13FE9A1C 77FF261E 77FF26FA 5EC45052 D2281046 88016168 0677FF26 FA5EC416 .á^*&.w.ha..F.+ØRPá^*&.w.&.w..±. 000080
 12239A06 76FF0876 FF1076FF 006A0169 680677FF 26FA5EC4 1676FF18 76FF0000 ...v..v.á^*&.w.hi.j..v..v..v..#. 0000A0
 4208629A 1676FF18 76FFFA76 FFFC76FF 50F84603 C123C918 F8462810 46880000 ...F.+F½.è#è.F¥P.v=.v*.v..v..b.8 0000C0
 9A1676FF 1876FF08 77FF26FA 5EC40A77 FF26FA5E C40C77FF 26FA5EC4 0AC48314 ..á.á^*&.w.á^*&.w.á^*&.w..v..v.. 0000E0
 1876FF00 00146F9A 0002681E 0277FF26 FA5EC416 76FF1876 FF0AC483 12590144 D.Y..á..v..v.á^*&.w..hØ..o....v. 000100
 0014CAC9 5F5E1F00 00E90000 88000012 939A0003 681E0477 FF26FA5E C41676FF .v.á^*&.w..h®......|..Õ...^_èò.. 000120
 37E90375 40064688 FE5689FC 46890A56 88084688 D88E1309 881E5657 000004C8 à...WV.|...Ä.F..V..F=.V±.F.Ðu.Õ7 000140
 0013329A 006A006A 5052D228 06468801 63680677 FF26FC5E C40C76FF 0E76FF00 ..v..v.á^=&.w.hc..F.+ØRPj.j..2.. 000160
 C40C77FF 26FC5EC4 0AC48314 F608629A 0C76FF0E 76FFFC76 FFFE76FF 0676FF00 ..v..v±.v=.v..v..b.-..á.á^=&.w.á 000180
 76FF0E76 FF0AC483 13800144 9A0C76FF 0E76FF08 77FF26FC 5EC40A77 FF26FC5E ^=&.w.á^=&.w..v..v..D....á..v..v 0001A0
 681E0477 FF26FC5E C40C76FF 0E76FF00 0015239A 0004681E 0277FF26 FC5EC40C .á^=&.w..hå..#....v..v.á^=&.w..h 0001C0
 D88E1488 881E5657 000008C8 000ACAC9 5F5E1F00 00E90000 88000014 599A0005 f..Y...|..Õ...^_èò..à...WV.|...Ä 0001E0
```

```
Dump of file SATURN:[PCCOMMON.DUMP.DLL]DFM.TMP;1 on 18-APR-1990 10:44:03.15
File ID (618,10,0)   End of file block 65 / Allocated 68

Virtual block number 34 (00000022), 512 (0200) bytes

 006A006A 01606806 77FF26FA 5EC41876 FF1A76FF FC5689FA 46891656 88144688 .F..V..F*.V=.v..v.á^*&.w.h'.j.j. 000000
 1A76FF00 A2E99A78 880006E9 03731246 39FE4688 FE468900 0015A79A 006A006A j.j..Ï....F±.F±9F.s.Õ..|x.ÕÅ..v. 000020
 FF26FA5E C4505212 4608C028 16578826 FA5EC401 68680677 FF26FA5E C41876FF .v.á^*&.w.hh.á^*&.W.+å.F.RPá^*&. 000040
 0000008D 9A006A00 6A000CE9 037400F8 7E83F846 89000016 089A1C77 FF261E77 w.&.w.......F½.-½.t.Õ..j.j..§... 000060
 969A1C77 FF261E77 FF26FA5E C4006A00 6A0A76FF 0C76FF0E 76FF1076 FF005CE9 Õ\..v..v..v..v.j.j.á^*&.w.&.w... 000080
 6A680677 FF26FA5E C41876FF 1A76FF00 28E90375 08460806 468810C4 83140309 .&..á..F..F.u.Õ(..v..v.á^*&.w.hj 0000A0
 1F0000E9 00008802 57892607 8926065E C4000014 8D9A006A 006A1276 FF006A01 .j..v.j.j..§...á^.&..&.W.|..Õ... 0000C0
 76FFFC56 89FA4689 14568812 4688D88E 153C881E 56570000 06C80016 CAC95F5E ^_èò..à...WV.|<..Ä.F..V..F*.V=.v 0000E0
 76FFFE46 89000015 659A006A 006A006A 006A0165 680677FF 26FA5EC4 1676FF18 ..¯v.á^*&.w.he.j.j.j.j..e....F±.v 000100
 9A0676FF 0876FF0A 76FF0C76 FF0E76FF 1076FFFE 76FF1276 FF1476FF 1676FF18 ..v..v..v..v±.v..v..v..v..v..v.. 000120
 08568806 4688D88E 162E881E 56570000 12C80014 CAC95F5E 1F0000E9 15E11534 4.Ä.Õ...^_èò..à...WV.|...Ä.F..V. 000140
 7401F07E 830009E9 037502F0 7E83F046 89104688 EE46890E 4688F656 89F44689 .F¶.V-.F.¯F¥.F..Fb.-b.u.Õ...-b.t 000160
 FF0C76FF F076FF08 77FF26F4 5EC40A77 FF26F45E C40C77FF 26F45EC4 002CE903 .Õ,.á^¶&.w.á^¶&.w.á^¶&.w..vb.v.. 000180
 88010EE9 03740647 3926EE46 88F45EC4 10C48317 8D01A09A 1276FF14 76FF0A76 v..v..v.......á.á^¶.F¥&9G.t.Õ... 0001A0
 46890000 17609A00 6A006A00 6A006A01 6568EE76 FF1276FF 1476FF00 EDE9F046 FbÕU..v..v..vŸhe.j.j.j.j..'....F 0001C0
 C4016868 EE76FF12 76FF1476 FF00E3E9 00008A00 00880009 E90374FF F27E83F2 ·.-·.t.Õ..|..¤..Õò..v..v..vŸhh.á 0001E0
```

```
Dump of file SATURN:[PCCOMMON.DUMP.DLL]DFM.TMP;1 on 18-APR-1990 10:44:03.15
File ID (618,10,0)   End of file block 65 / Allocated 68

Virtual block number 35 (00000023), 512 (0200) bytes

 9A1C77FF 261E77FF 26F45EC4 5052F246 0BC02B00 8B022B00 07051647 8B26F45E ^¶&.G....+@.Å+ã.F RPá^¶&.w.&.w.. 000000
 C45016F8 468D1877 FF261A77 FF26F45E C4505200 2005F656 8BF4468B 00001657 W....F¶.V-. .RPá^¶&.w.&.w..F½.Pá 000020
 C40477FF 26F45EC4 1276FF14 76FF10C4 8317E409 969A1C77 FF261E77 FF26F45E ^¶&.w.&.w....õ..á..v..v.á^¶&.w.á 000040
 16F8468D 0277FF26 F45EC412 76FF1476 FF000017 C29A1877 FF261A77 FF26F45E ^¶&.w.&.w..ô....v..v.á^¶&.w..F½. 000060
 76FFEE76 FFF476FF F676FF12 76FF1476 FF0047E9 00008A00 00880000 15009A50 P.....|..n..ÕG..v..v..v-.v¶.vŸ.v 000080
 E9037501 003DFF0B E9037500 01300018 E90027E9 00008A00 00881682 0BD99AF0 Þ.)...|..n..Õ'.Õ..=..u.Õ..=..u.Õ 0000A0
 0014C800 10CAC95F 5E1F0000 E900008A 0001B800 00E9FFC5 E9037501 1030FFCD è.=..u.Õé.Õ..|..n..Õ...^_èò..à.. 0000C0
 468BF25E C4EE4689 0E468BF4 5689F246 89085688 06468B08 8E169688 1E565700 .WV.|...Ä.F..V..F .V¶.F..FŸá^ .F 0000E0
 7E9A5016 F6468D50 6A0277FF 26F25EC4 1276FF14 76FF00AC E9037408 473926EE Ÿ&9G.t.Õ¯..v..v.á^ &.w.jP.F-.P.~ 000100
 191A9A18 77FF261A 77FF26F2 5EC4506A 0477FF26 F25EC412 76FF1476 FF000018 ....v..v.á^ &.w.jPá^ &.w.&.w.... 000120
 FFF476FF 5016F646 8D5016EC 468D0064 E9037500 3F802618 5FC426F2 5EC40000 ..á^ &á_.&.?.u.Õd..F$.P.F-.P.v¶. 000140
 76FFF276 FFF476FF EC76FF50 16FE468D 10C48318 C708059A 1276FF14 76FFF276 v .v..v....ú..á..Ft.P.v$.v¶.v .v 000160
 5EC4FE76 FFEC76FF F276FFF4 76FF1276 FF1476FF 0EC48318 F008769A 1276FF14 ..v..v.Þ..á..v..v..v¶.v .v$.vtá^ 000180
 0A473926 EE4688F2 5EC4013D E9991956 11839A00 6A006A18 77FF261A 77FF26F2 &.w.&.w.j.j....V..Õ=.á^ .FŸ&9G. 0001A0
 76FF0000 19399A50 16F6468D 506A0277 FF26F25E C41276FF 1476FF00 0EE90374 t.ÕR..v..v.á^ &.w.jP.F-.P.9....v 0001C0
 EC468D00 0006939A 1877FF26 1A77FF26 F25EC450 6A0477FF 26F25EC4 1276FF14 ..v.á^ &.w.jPá^ &.w.&.w.......F$ 0001E0

Dump of file SATURN:[PCCOMMON.DUMP.DLL]DFM.TMP;1 on 18-APR-1990 10:44:03.15
File ID (618,10,0)   End of file block 65 / Allocated 68

Virtual block number 36 (00000024), 512 (0200) bytes

 5016FE46 8D10C483 19720805 9A1276FF 1476FFF2 76FFF476 FF5016F6 468D5016 .P.F-.P.v¶.v .v..v....r..á..Ft.P 000000
 F25EC412 76FF1476 FF0EC483 19000876 9A1276FF 1476FFF2 76FFF476 FFEC76FF .v$.v¶.v .v..v..v.1..á..v..v.á^ 000020
 E90374EC 4639F046 8BF04689 00001A08 9A006A00 6A006A00 6A016568 0677FF26 &.w.he.j.j.j.j.......Fb.Fb9F$t.Õ 000040
 FF1276FF 1476FFFE 46892047 8B26F25E C4000AE9 03750020 7FB326F2 5EC40017 ..á^ &.. .u.Õ..á^ &.G .Ft.v..v.. 000060
 991A2413 019A006A 006A1877 FF261A77 FF26F25E C4FE76FF EC76FFF2 76FFF476 v¶.v .v$.vtá^ &.w.&.w.j.j....$.. 000080
 680677FF 26F25EC4 1276FF14 76FF0038 E903740C 473926EE 468BF25E C40050E9 ÕP.á^ .FŸ&9G.t.Õ8..v..v.á^ &.w.h 0000A0
 76FFF276 FFF476FF 1276FF14 76FFF046 89000017 1A9A006A 006A006A 006A0165 e.j.j.j.j.......Fb.v..v..v¶.v .v 0000C0
 02158C01 03000F10 CAC95F5E 1F0000E9 00008A00 01880009 E99916E8 14809AF0 Þ...$..Õ..|..n..Õ...^_èò.....¥.. 0000E0
 0217AB01 03000400 02018A01 03006F00 0400EF02 03007F00 02199001 0300F300 .µ............ÿ...o...ō....... .. 000100
 02029701 03000000 08083A00 02000000 0618AB00 02008700 02185F01 03008600 ..........................:.......... 000120
 02029E01 03003500 04013002 03010F00 06010902 03000000 0A182500 02001300 .....X...............0...5....... 000140
 00000000 00000000 00000000 00000500 050FA502 0300C700 050F8C02 03004000 .M.......ú...É...f............... 000160
 00000000 00000000 00000900 02000200 01C80001 8B1F0200 3E89088E FFFF881E .|...Å.>...|..ù.................. 000180
 FFFFB9C0 33067EC4 1EDE8BD7 8BEC8B55 00000000 00000000 00000000 00000000 ................U.$.■.R.á-.3å¿.. 0001A0
 01C6F706 468BFE87 08468ED8 8EC08CF9 2B01F7AE F2FFFFB9 0A7EC4FF 758DAEF2 ·Û.u.á~.¿.. Ü½|+*.å.Ä.F..±.F.%6. 0001C0
 76C51EDE 8BD78BEC 8B55CB50 C28C1FFA 8BF38BA4 F3C913A5 F3E90149 A4027400 .t.Él|Õµ É.èµÉ.µ.*..ô]üU.$.■.R.év 0001E0

Dump of file SATURN:[PCCOMMON.DUMP:DLL]DFM.TMP;1 on 18-APR-1990 10:44:03.15
File ID (618,10,0)   End of file block 65 / Allocated 68

Virtual block number 37 (00000025), 512 (0200) bytes

 13A5F3E9 D149A402 7401A8C7 8B067EC4 D1F7AEF2 FFFFB9C0 33C08ED8 8CFE8B0A ..±.Ä.å3å¿.. Ü½1á~..ú´.t.É||ÕµÉ. 000000
 8B9149D1 F7AEF2FF FF89C033 067EC4D7 8BEC8B55 C850C28C 1FFA8BF3 8BA4F3C9 èµÉ.µ.*..ô]üU.$.■á-.3å¿.. Ü½||.. 000020
 32F8E2AA 0374C00A AC0CE30E 4E8B0F8B 0A76C506 7EC41E56 57EC8B55 00C8B5DFA *]ù.U.$WV.á-.év..Õ.M.D.¯.åt.´å½2 000040
 89EC468D 56570000 16C8000C 93E9000C 97E9C85D E58B5F5E 1FC28CC3 8BAAF3C0 åµ^.ú.ô.^_.|]ùÕ...Õ...à...WV.F$. 000060
 06478926 08568B06 468B420A 47C626F8 5EC4FE56 8CFC4689 0E468DFA 568CF846 F½.V*.F..F•.Vtá^½&6G.B.F..V.&.G. 000080
 02E49A53 060A76FF 0C76FFFC 76FF167F FF0447C7 26025789 26078926 08578926 &.W.&..&.W.&úG.....v•.v..v..S.Õ. 0000A0
 EB058B26 02478E26 07FF263F 8B26C02A 1278044F FF26F85E C4F08B0C C483014B K..á..Þá^½&.O.x.*á&.7&..&.G.&..$ 0000C0
 067C0006 7E830000 00C8C8C9 5F5EC68B 06C483FF FF016E9A 006A53FA 76FF900F ...v*S]..n....á..ó^_èùÀ....~..|. 0000E0
 FA4689E4 2A08478A 26085EC4 56570000 08C890C8 C908F706 46889006 EB06468B .F.$...F.%Àèù.à...WVá^.&.G.*ô.F* 000100
 0774830A 47F626F8 4689121E 05E001C1 03E001C8 8BF9F700 0C899906 2A20C38B .ú-*..¿..%*.à1Á.é1Á....F½&-G..t. 000120
 0E74010A 47F62608 5EC49001 2BE9FFFF 8B200A4F 8026085E C40F7440 0A47F626 &-G.Øt.á^.&.O. |..Õ+..á^.&-G..t. 000140
 F08B0447 8926C02B EF0A6780 26020A4F 802690E2 EB000004 47C72620 0A4F8026 &.O. &úG...$ã.&.O..&.g.ÿ+â&.G..Þ 000160
 81377501 121E87F6 06D86BF9 F7000C89 99062A2D C3884C75 0C0A47F6 26FC7689 .v=&-G..uL.û·*..¿..%*kÄ.-....u7. 000180
 3A9AFA76 FF0F75FF FF0A7E81 16750642 087E810E 7402170A 7E810775 0636087E -.6.u..-...t..-.B.u..-...u..v*.: 0001A0
 1575080A 47F62608 5EC404C4 830CA7E8 0876FF0A 76FF0C75 C00802C4 83028A11 ....á..àu..v..v.ÕÏ..á.á^.&-G..u. 0001C0
 26067728 26378B26 085E8B67 7401121E 87F6060B 68F9F700 0C899906 2A20C38B .ú-*..¿..%*kÄ.-....tg.^.&.7&•w.& 0001E0
```

Dump of file SATURN:[PCCOMMON.DUMP.DLL]DFM.TMP;1 on 18-APR-1990 10:44:03.15
File ID (618,10,0)   End of file block 65 / Allocated 68

Virtual block number 38 (00000026), 512 (0200) bytes

```
5256167E F6080447 89264802 4588F87E 88025789 26078926 40085788 26064788 .G.&.W.a&..&.W..-½.E.H&.G..--.VR 000000
026A0F74 20182F87 F6FA5E88 19E8FC46 8908C483 02A80FA2 9AFA76FF 0677FF26 &.w..v*.Ä.`..6..F*Š..^*-./. t.j. 000020
5600018E 17E80788 2606468A 065FC426 085EC408 C48302C8 0F649A53 006A006A j.j.S.d.ü..6.6^.&6_..F.&..Š./..V 000040
E42A0646 8AFECCE9 0374FC76 39FC4689 08C48301 200FA29A FA76FF50 1606468D .F..P.v*.Ä. ..6..F*9v*t.Öü±.F.*Ö 000060
A3105688 0E468818 7A1E8C18 78A3187E 88022111 5E9A000A 88EC8855 CBC95F5E ^_èüU.Š|...^.!.|-.Êx...z..F..V.È 000080
E900001B 7206C700 00187406 C7185016 89184EA3 08568806 4688186A 16891868 h...j..F..V.ÈN...P.ú.t...ú.r...Ö 0000A0
A31856A3 1870A318 54A31858 A3C02800 01187606 C7030BE9 037425F6 7E80038D ...--Xt.Ö..ú.v...+âÈX.ÈT.Èp.ÈV.È 0000C0
46FF4975 30017F80 260A5EC4 00201CDE 06C71866 A31B4CA3 1852A318 6CA3186E n.ÈI.ÈR.ÈL.Èf.ú.R. .6^.&...0ul.F 0000E0
9028E800 00186C06 C7185806 FF0D7528 3F80260A 5E88903E E800301C DE06C70A .ú.R.0.Š>..^.&.?*u...X.ú.l...Š(. 000100
3F80260A 5EC40DE8 184C06FF 9014E818 6C06FF1A 75001858 3E830E75 203F8026 &.? u..>X..u...l.Š....l.Š.6^.&.? 000120
0C76FFD0 75C00802 C4830978 E80E5098 078A260A 5E880A46 FF186606 FFC7752D -uù..f..F..^.&...P.Òx..6..ÂuÏ.v. 000140
A1186606 FF0C7D00 187C3E83 0C56890A 468908C4 8308C7E8 0E187C68 1E0A76FF .v..h|..Òú..6..F..V..>|..)...f.Â 000160
80260A5E C400201C DE06C706 75301CDE 3E830074 0018663E 83187CA3 08F7187C |.XÂÈ|..>f..t..>R.0u.ú.R. .6^.&. 000180
0C56890A 468908C4 830878E8 0E187668 1E0A76FF 060A46FF 186E06FF 2D752E3F ?.u-..n..F...v..hv..Ò(..6..F..V. 0001A0
004E303D 7400463D 98078A26 0A5EC418 6E0EFF00 01187606 C70A7D00 18763E83 .>v..).ú.v.....n.6^.&...=F.t==N. 0001C0
4C3F8026 0A5EC409 75001856 3E830002 185606C7 0675006C 30287400 68304074 tâ=h.t+=l.u.ú.V....>V..u.6^.&.7L 0001E0
```

Dump of file SATURN:[PCCOMMON.DUMP.DLL]DFM.TMP;1 on 18-APR-1990 10:44:03.15
File ID (618,10,0)   End of file block 65 / Allocated 68

Virtual block number 39 (00000027), 512 (0200) bytes

```
00101856 06C7D8E8 00011856 06C79002 4EE91C75 003F8026 0A5EC40A 46FF0375 u..F.6^.&.?.u.ÖN..ú.V...ŠÂú.V... 000000
08750058 3D057400 47300A74 004530F8 46899807 8A26C8E8 00081856 06C7D0E8 ŠÂú.V...Šà&....F½=E.t.=G.t.=X.u. 000020
E9037E01 3FE90375 00633001 91E9037E 78740069 30F84688 20F84683 185406FF ..T..F½ .F½=ì.tx-.Ö..=c.u.Ö7.-.Ö 000040
261872A1 1FC42618 681EC415 75021856 3E839001 59E90140 E9037500 25300152 R.=X.u.Öa.ÖY...>V..u.6.h.&6.Âr.& 000060
18743E83 04186806 83078926 1872A11F C4261868 1EC400E8 00000247 C7260789 ..&úG...Š.6.h.&6.Âr.&....h...>t. 000080
FFB801AF E9037520 0A47F626 184E1EC4 018DE903 74001872 3E830170 E9037500 .u.Öp..>r..t.Ö§.6.N.&-G. u.Ö£.|. 0000A0
06FFF2E8 086A90C3 E802C483 019EE80E 0A6A0000 184C06C7 187006FF 01ACE9FF .Ö¯...p.ú.l...j..Ö...6.Šù.j.Š .. 0000C0
74011856 3E830081 E9037508 18563E83 00041876 06C7186E 06FF1854 06FF1852 R...T...n.ú.v....>V..u.Ö...>V..t 0000E0
187C06C7 0A74001B 663E83FA 4689187C A128741B 7C0639FA 46891856 A3C0287A z+âÈV..F*9.|.t(Â|..F*.>f..t.ú.|. 000100
E80E106A 02186806 83187CA3 C028027D C008187C A105187C 2E839090 13E80000 ..Š.....|..Â|..â).+âÈ|...h..j..Ö 000120
052DFA46 88157400 18663E83 227400FA 7E8302C4 83048DE8 0E3A6A02 C4830130 0..6.j:.Ö...6..-*.t".>f..t..F*-. 000140
F1E80E10 6A041868 2E830000 187C06C7 9007E818 7CA3C028 027DC008 187CA300 .È|..â).+âÈ|.Š..ú.|.....h..j..Öp 000160
F4E8016A 90FF39E9 026EE80E 006A90FF 3FE9106A FF10E902 18680683 02C48300 ..â...h..Ö..j.Ö7..j..Ön.Ö9..j.Š¶ 000180
7C00653D FF0CE903 7500643D 90FF21E9 0428E80E 256AFF2A E90349E8 0EF876FF .v½.Öl.Ö*.jX.Ö(.Öl..=d.u.Ö..=e.| 0001A0
FC468940 0C56880A 46880A4E FF0C5688 0A468809 74001856 3E830A7E 00673005 .=g.-Ö.>V..t..F..V..N..F..V.a.F= 0001C0
7330FEE0 E9037500 7030FEE4 E9037500 6F30FE80 E9037500 6E30903A EBFE5689 .V±Š:.=n.u.Ö.±=o.u.ÖÖ±=p.u.ÖÂ±=s 0001E0
```

Dump of file SATURN:[PCCOMMON.DUMP.DLL]DFM.TMP;1 on 18-APR-1990 10:44:03.15
File ID (618,10,0)   End of file block 65 / Allocated 68

Virtual block number 40 (00000028), 512 (0200) bytes

```
C4FC46FF 9034E80A 46FF9081 E8FF79E9 03750078 30FE89E9 03750075 308F7400 .t.=u.u.Ö¿±=x.u.Öy.ŠŸ..F.Š4..F=6 000000
044CE80E 0A76FF0C 76FF500A 462BC38B EC75253C 0474C00A F6468807 8A26FC5E ^*&...F-.ât.<Xu§.ù+F.P.v..v..ÖL. 000020
C4FC63E9 0374C00A F6468807 8A260A5E C40C5689 0A4689FE 5688FC46 8806C483 .6..F=.V±.F..V.6^.&...F-.ât.Öc=6 000040
C7067400 186E3E83 56570000 12C8C8C9 1872A1FE 51E90374 200A47F6 26184E1E .N.&-G. t.ÖQ±Âr.èùà...WV.>n..t.ú 000060
681EC419 75101856 3E830774 0218563E 83187006 FF04740A 067E8300 201CDE06 .R. ..-..t...p..>V..t..>V..u.6.h 000080
681EC411 74001870 3E83902C E8041868 0683FE56 89FC4689 02578826 07882618 .&..&.W..F=.V±..h..Š,..>p..t.6.h 0000A0
18680683 FE5689FC 46899907 88261868 1EC40EE8 0000FE46 C7FC4689 07882618 .&...F=úF±..Š.6.h.&....F=.V±..h. 0000C0
16881878 A11CDCA3 C0289003 E8064688 0674FE46 08FC4688 0E74001B 4C3E8302 ..>L..t..F=.F±t..F.Š..+âÈÈ.Âx... 0000E0
46FFF25E C410750A 067E832B 7D00FE7E 83317500 18703E83 F45689F2 4689187A z..F·.V¶.>p..u1.-±.)+.-..u.6^·.F 000100
9006E800 01F646C7 FE5689FC 46890AF7 00028308 F7FE5688 FC46882D 07C626F2 ·&6.-.F=.V±XÂ.0.XÖ.F=.V±úF-..Š.. 000120
C48307D1 11309AFC 76FFFE76 FF501E06 76FFFA5E 8CF84689 185A8800 00F646C7 úF-..|Z..F½.^*.v..P.v±.v=.0.!..6 000140
08F04E89 C8281876 0E8804C4 8302E000 8C9AF876 FFFA76FF 4574001B 6E3E830A ..>n..tE.v*.v½...Ü..6...v.+â.NÞ. 000160
49C18847 3005C626 05E8F27E C4F04E88 00001CDC 06C70675 081CDC3E 83007EC9 è-..>È..u.ú.È....NÞ6-·Š.&6.0G.^! 000180
08048807 8A26F85E C4F276C5 EE5E8C18 540E88F0 4E89F446 8CF27E89 F47FC008 .6.¶.-··.F¶.NÞ..T..^Ÿèv·6^½&.... 0001A0
703E83EE 5E8EF45E 8CF27689 E375003F 8026F846 FF46202C 80037C61 3C0774C9 èt.<a|..., F.F½&.?.uÐ.v·.^¶.^Ÿ.>p 0001C0
8302FFE8 0E50C028 02E80001 88057500 F67E8308 74186C06 081858A1 1475001B ..u.ÂX...l.t..--.u.|..Š.+âP.Ò... 0001E0
```

Dump of file SATURN:[PCCOMMON.DUMP.DLL]DFM.TMP;1 on 18-APR-1990 10:44:03.15
File ID (618,10,0)   End of file block 65 / Allocated 68

Virtual block number 41 (00000029), 512 (0200) bytes

```
89F84689 186A1688 1868A100 018E1874 00067E83 56570000 10C8CBC9 5F5E02C4 6.^_èùà...WV.~..t./..Àh...j..F%. 000000
89F84689 02578826 07882618 681EC413 74081856 3E83008F E9021868 0683FA56 V*..h..Õ...>V..t.á.h.&..&.W..F%. 000020
0E740818 563E8304 18680683 FA5E8CF8 4689FC46 89078826 18681EC4 10E8FA56 V*Š.6.h.&...F•.F%.^*..h...>V..t. 000040
F84688FA 5E8CF846 89010F88 097500FC 7E83900A E8010888 1575FA46 08F84688 .F%.F*u.¡Ä.Š...-•.u.¡Ò..F%.^*.F% 000060
8026F246 FFF25EC4 900EE818 760E881C 7418GE36 39F628F4 5689F246 89FA5688 .V*.F·.V¶+-96n.t...v.Š..á^·.F·&. 000080
83FE2818 7C3E88F3 75003F80 26F246FF F25EC446 90EDE810 7ECE3846 1574003F ?.t.F;ö-.ŠU.Fá^·.F·&.?.u#.>|.+±. 0000A0
18663E83 06C48301 83E80EF8 76FFFA76 FF5602C4 830159E8 0E570875 0018663E >f..u.W.ÒY..á.V.v*.v%.Ò"..á..>f. 0000C0
5689FC46 891B6A16 881868A1 000006C8 90C8C95F 5E02C483 013CE80E 57087400 .t.W.Ò<..á.^_èù.à...Àh...j..F•.V 0000E0
06C70675 00186E3E 83FA4688 C02A9003 E8018005 7547067E 83067467 067E83FE ±.~.gt..-.Gu.¯.Š..*à.F*.>n..u.ú. 000100
FF187636 FF185436 FF000118 7606C706 75001876 3E830074 00FA7E80 00061876 v....-*.t..>v..u.ú.v....6f..6v.. 000120
00FA7E80 0EC48306 0A1EFF26 1A6A068E FC76FFFE 76FF1878 36FF187A 36FF0676 v..6z..6x..v±.v•..j.&.....á..-*. 000140
4C3E8304 C483060E 1EFF261A 6A068E18 7836FF18 7A36FF14 7500184C 3E831874 t..>L..u..6z..6x...j.&.....á..>L 000160
8304C483 06161EFF 261A6A06 8E187836 FF187A36 FF147500 18763E83 1874001B ..t..>v..u..6z..6x...j.&.....á.. 000180
1EFF261A 6A068EFC 76FFFE76 FF187418 6C060018 58A10000 1CDC06C7 08186806 .h..ú.É...Àx...l.t..v±.v•..j.&.. 0001A0
743E8356 000000C8 90C8C901 29E80E50 C02802E8 00018805 74C00804 C483061A ...á..ât.¡..Š.+àP.Ò).èù.à...V.>t 0001C0
E42A0488 2602478E 2607FF26 37882606 468A1478 044FFF26 184E1EC4 3C75001B ..u<á.N.&.O.x..F.&.7&..&.G.&..*ô 0001E0
```

Dump of file SATURN:[PCCOMMON.DUMP.DLL]DFM.TMP;1 on 18-APR-1990 10:44:03.15
File ID (618,10,0)   End of file block 65 / Allocated 68

Virtual block number 42 (0000002A), 512 (0200) bytes

```
187206FF 9005E818 7406FF07 754006C4 830AA901 6E9A0676 FF531850 36FF10E8 Š..6P.S.v..n.`..á.àu...t.Š....r. 000000
36FF1850 36FF18E8 507EF608 06768857 75001874 3E835657 000002C8 90C8C95E ^èù.à...WV.>t..uW.v..--PŠ..6P..6 000020
184E1EC4 1E7EC008 4EC68818 7406FF04 754006C4 83081101 6E9A1CDE 36FF184E N..6N..n....á.àu...t..6N.á-.6.N. 000040
75001874 3E83D4E8 E42A0588 2602478E 2607FF26 3F88261C DEA00478 044FFF26 &.O.xá.N.&.?&..&.G.&..*ôŠá.>t..u 000060
36FF22E8 5E75001B 743E830A 76885657 000002C8 C8C95F5E 18720601 06468807 ..F...r.^_èùà...WV.v..>t..u^Š".6 000080
0646FF18 7406FF04 754006C4 83088301 6E9A5098 078A2606 5EC4184E 36FF1850 P..6N.á^.Ì...P.n....á.àu...t..F. 0000A0
FF263F88 26184E1E C4078A26 065EC4CD 78044FFF 26184E1E C42574C0 084EC688 .6N.àtXá.N.&.O.xëá^.&..á.N.&.?&. 0000C0
0CC8C8C9 5F5E1872 06010A46 88077500 18743E83 CAE8E42A 05882602 478E2607 .&.G.&..*ôŠò.>t..u..F...r.^_èùÀ. 0000E0
F476FF52 187C3688 FA4689FC 4689C028 F65689F4 4689187A 16881878 A1560000 ..VÀx...±..F¶.V-+ā.F•.F*.6|¯R.v¶ 000100
1CDC3E83 08E802EE 83057510 1CDC3E83 06762BF0 2BF84689 04C48307 8C008C9A ...Ÿ..á..F%+b+v..>É..u..Ÿ.Š..>É. 000120
8A26F446 FF127530 1CDE3E83 1975203F 8026F45E C4227500 18663E83 4E017508 .u.N.>f..u"á^¶&.?-u..>R.Ou..F¶&. 000140
83187400 18663E83 077EF608 08743010 DE3E83F8 4EFF02C4 83FE71E8 0E509807 ..P.Òq±.á..N%.>R.Ot..--..>f..t.. 000160
75001866 3E830070 E80EFC46 FF077400 1CDC3E83 0066E80E FA46FF07 7400067E ~..t..F*.Òf..>É..t..F•.Òp..>f..u 000180
0A74001C DC3E8300 39E80E04 7500FA7E 830A7400 067E8302 C483FE7E E80E5629 )V.Ò~±.á..-..t..-*.u..Ò9..>É..t. 0001A0
74001866 3E8306C4 83FE85E8 0EF476FF F676FFF8 76FF0040 E80E0475 00FC7E83 .-•.u..Òà..v%.v-.v¶.Òç±.á..>f..t 0001C0
208803E8 00288805 7400185B 3E83C8C9 5E02C483 FE38E80E 5600201C DE06C70E .ú.R. .V.Ò8±.á.^èù.>X..t.¡*.Š.¡ 0001E0
```

Dump of file SATURN:[PCCOMMON.DUMP.DLL]DFM.TMP;1 on 18-APR-1990 10:44:03.15
File ID (618,10,0)   End of file block 65 / Allocated 68

Virtual block number 43 (0000002B), 512 (0200) bytes

```
74001854 3E831775 101CDC3E 8302C483 FDC8E80E 306AC802 C483FD02 E80E5000 .P.Ò@».á.ùj0.Òà».á..>É..u..>T..t 000000
0A5EC400 01FE46C7 56570000 06C8C802 C483FDAA E80E5000 788803E8 00588805 .¡X.Š.¡x.P.Ò^».á.ùà...WVúF±..¿`. 000020
75203F80 260A5EC4 9060E80A 46FF0218 68068337 88261868 1EC41275 2A3F8026 &.?*u.á.h.&.7..h...F.Š'.á^.&.?-¸ 000040
186E3639 387F393C 3F7C303C FA468807 8A260A5E 88F6280A 46FFFFFF FE46C708 .úF±...F.+-.^.&...F*<0|?<9.;96n. 000060
0302E1C1 CE889805 8A26187F 39308026 06E8F888 00301CDE 06C70675 303C0A75 u.<0u.ú.R.0..«Š.&.=9..&....öèÀ.. 000080
5EC4F088 EEF7FE46 880C468C 0A7E89DF 70303080 2647F188 30E983C8 03E1D1CE ðíÀ.à.Ò0.þG&.=0)Ò.-..F..F±XŸ.þá^ 0000A0
C4064E8A FE5E8CFC 468901E6 88570000 04C8C8C9 5F5E0C56 880A4688 37892606 .&.7.F..V.^_èùà...W¡Ì..F=.^±.N.á 0000C0
8CFC7E89 9009E8FE 468CFC7E 89000188 F4750038 26117400 30802647 01E8FC7E -•Š.G&.=.t.Ì8.u¶¡...-•.F±Š...-•. 0000E0
50F77409 3CF87420 3CACD833 99C03306 76C51E56 57EC8855 90C8C95F C028FE46 F±+à_èù.U.$WV.év.3á.3U¯< t«<.tXP 000100
D1E301D2 01E301FA 88C888D2 D1E30118 72302C1F 77393CAC 0175283C 0474203C <-t.¯<+u.¯<9w.,0r.1D1@.ù.*1D1@1D1 000120
8855C850 5F5E1FDA F7000283 08F70775 93203C58 0CE80002 83080307 13090302 @.\.•.Ã.@.ŠÉX<-.u.XÃ.@.XÒ.^_]ùU. 000140
21E80000 FFFF9A01 EC681E01 EE681E18 28A3E086 580000FF FF9A5016 C48850EC $P.á.P.....X.ÀÉ(..hŸ..h$......Ò! 000160
16FF00FF 680DF40E A49A0DE7 0E509A50 C850E588 0001880A 6D12729A 039EE800 .Ò...r.m.¡...[]ùP.P.Ò..É.¶.h.... 000180
8805F88E 31740030 80264701 75003080 267FFFB9 01EE068E FF33000D 881E01F4 ¶..É..3...Ÿ.¿..&.=.u.G&.=.t1/%.. 0001A0
C00E7241 2CAC182F 8F1FF788 071E061C E8E774AE F2C03308 74CA88A6 F3C88801 |.ù#|.òt.3á·UtÒŠ.....%.«/.¯,Ar.à 0001C0
06083E83 0DF90EA4 9A5000FC 88EC8855 00C31FED E8AAC20A 0572412C AC9204E0 À..¯,Ar..ô¯ŠU.ú.U.Š¡=.P.É.*..>.. 0001E0
```

```
Dump of file SATURN:[PCCOMMON.DUMP.DLL]DFM.TMP;1 on 18-APR-1990 10:44:03.15
File ID (618,10,0)   End of file block 65 / Allocated 68

Virtual block number 44 (0000002C), 512 (0200) bytes

 C08ED88E 02098857 56EC8855 CB5DE588 0E5A0EA4 9A5000FF 8806061E FF047400 .t.....|..P.Ê.Z..|]üU.$VW|...Ä.å 000000
 E5885E5F 96EBEBF7 88AEF2FF FF89C033 970C7496 401074C2 38AD1A74 BE065688 .V./t.Ù;ôt.ə.t..3à¿.. Ù.¥$$._^.| 000020
 D1F7AEF2 FFFF89C0 33FA8892 1F74C008 0E6E0E74 9A0676FF 57EC8855 0002CA5D ]ò..U.$W.v..t.n..åt...*3à¿..¯Ü¼i 000040
 06FF0000 04C80002 CA5DE588 5F580000 FFFF9A50 1651521E 530002B8 C4885049 IP.6E..S.RQ.P.....[..|]ò..à..... 000060
 68FE5E8C FC468912 1E05E0D1 C103E0D1 C888F9F7 000CB999 062A2D04 46881A40 ə..F.-*..¿..¥*.àIÀ.ÈIÀ....F•.^±h 000080
 5EC4080A 4F802611 74000808 57892606 47892604 5EC402C4 830EAE14 209A0200 ...-.Ü..6.6^.&.G.&.W..Àt.&.O..6^ 0000A0
 57892606 47892640 FE5688FC 4688040A 4F802604 5EC49021 E8020002 47C726FC •&üG...Š1.6^.&.O...F•.V±ə&.G.&.W 0000C0
 0447C726 02578926 07892608 57882606 47882604 5EC40001 0247C726 FC5EC408 .6^•&üG...6^.&.G.&.W.&..&.W.&üG. 0000E0
 CC8804EC 830460E9 0454E9C0 3300098A 08721820 1E38065E 88EC8855 C3C90000 ..èüU.$.^.;.-.r.¤..3äÕI.Õ'..$..ë 000100
 50E588FD 182FA780 91E175C0 855A5900 00FFFF9A 51160C76 FF0876FF 0A76FF53 S.v..v..v..Q.....YZ.åuÅ..I/.».|] 000120
 12742018 2F87F604 13E9C033 00098A08 72182D1E 38065E88 0CEC83EC 885500C8 Ù.U.$.$..^.;.-.r.¤..3àÕ..-./. t. 000140
 C50A468E FA5E8C66 7480182F 87F60000 0F8D9A50 16F4468D 51414151 51C93353 S3èQQAAQ.F¶.P.....-./..tf.^*.F.é 000160
 833B75AE F20AB049 E30C4E88 F86689F2 88FA8856 57FCFC46 89FE4689 C0330856 V.3à.F±.F••UV.*.·.f½.N.DI¯.·Üu;. 000180
 2BE8F4E2 AA1A74FB 3B00740A 3CAC0C4E 880716FA 880488E2 2B00808A DC8802EC $..Ê¤..+ã.å.*...N.¯<.t.;«t.¯ä¶O+ 0001A0
 E9FA5E8E 5F5EE1E8 0014E8E2 E8FC46FF 0AB0AA00 1FE80375 FB3B0080 009AE900 .Õ..¯.;«u.Ò..¯¯..F•Šäò..ŠÄ^.^*Õ 0001C0
 8D51521E 53065E88 1FE3CA28 CF881F06 1E515350 0F05115E 9AFFFC88 7AE80093 ..Šz|•..^...PSQ....ü+òD..^.Š.RQ. 0001E0

Dump of file SATURN:[PCCOMMON.DUMP.DLL]DFM.TMP;1 on 18-APR-1990 10:44:03.15
File ID (618,10,0)   End of file block 65 / Allocated 68

Virtual block number 45 (0000002D), 512 (0200) bytes

 831FC3FA 88585859 1F077408 08FE5E01 F45E8811 75C00800 000ECE9A 5016F446 F¶.P.ö....åu..^¶.^±.Üt..Y[X.*ü.. 000000
 5E8E26E8 F900208A 03E8001C 8A087500 098A0001 30007400 60301874 C00808C4 6..åt.•m.t.•..¤..u.¤..Š.¤ .*$&.^ 000020
 468806E8 F9C03300 1C8A0EE8 F803751A 3F80085E 880A5E8E 0E744018 2F87F6FE ±-./.ət..^..^..?.u.%Š.¤..3à*Š..F 000040
 EEE8C188 0475C908 0C4E8802 F7E9C850 E5880472 FA5E8E5F 5EF86688 FC4628FE ±+F•.f%^_.^*r..|]üÕ%..N..èu..èŠŸ 000060
 01300074 00603017 74C0081F 071E0000 10659A50 16F4468D 51521E53 0856C51E .éV.S.RQ¯F¶.P.e.......åt.•m.t.•. 000080
 DA880A74 40182F87 F68775C0 08F44688 C2E80020 8AC7E800 1C8ACC75 00098A00 .¤..uäo..Šü¤ .$ò.F¶.åuñ-./.ət..Ö 0000A0
 065E88EC 88550442 E9008357 56EC8855 00A3E8C0 33001C8A A6E80275 1A3F8026 &.?.u.Š|¤..3àŠÈ.U.$VW*.Õ8.U.$.^. 0000C0
 5A5900C8 5DE588C0 3302E800 01880574 40182F87 F60C7C00 F883117D 182D1E38 ;.-.)..«.|.-./.ət.|..Š.3à.|]ü.YZ 0000E0
 2EFF5152 FC74E9C0 33057540 0624A1C8 5152E388 05720628 1E380872 D828DC88 .É+Är.;.(.r..DRQÜÀ$.əu.3àÕt•RQ.. 000100
 81127558 C0080000 FFFF9A52 16501653 C4885087 182FA780 04885200 02880624 $.Ê..R.å.I/.ñP.6S.P.R......åXu.Ÿ 000120
 8C1A5C06 C41EE31A 5A0E885A D4794818 2F8F0808 81067500 02300774 00013040 ə•..t.•..u.Ÿ.../.Kyå2..Z.D.6.\.. 000140
 E81A648F 1A648E1A 581EFF00 0388C28C 1A6006C4 01AEE903 731A581E FFD833C2 63U..X.s.ÕÜ.6.'..ôÊ....X./d.ed.Ò 000160
 88C30000 FFFF9A11 FF680E01 6A08741A 68301A64 880073E8 1A64BF1A 648E007C |./d.ed.Òs.|d.=h.t.|..h......Ü| 000180
 E08F1CE0 8EEC8855 000011FA 9A006A00 6A036A00 51E81A68 8F1A648E D88E0E7A z..Ä/d.eh.ÒQ.|.|.|..*...U.$/Ä.eÄ 0001A0
 688F1A68 8E0023E8 1A688F1A 688EEC88 5503E800 31E81A68 8F1A648E 003AE81C .Ò:./d.eh.Ò1.Š.U.$/h.eh.Ò#./h.eh 0001C0
 F738C31A 581EFF00 028807E3 1A5A0E88 0000FFFF 9A500646 8A50C033 001AE81A .Ò..3åP.F.P.......Z.D.E....X.ü;% 0001E0

Dump of file SATURN:[PCCOMMON.DUMP.DLL]DFM.TMP;1 on 18-APR-1990 10:44:03.15
File ID (618,10,0)   End of file block 65 / Allocated 68

Virtual block number 46 (0000002E), 512 (0200) bytes

 01EE3639 FF28F628 56570000 14C800C3 EEE810FF F2740245 08058804 EF830E73 s..Ÿ....E.t·..ŠŸü.à...WV+-+.96Ÿ. 000000
 1EF676FF F876FF0C 6AF85689 F64689F2 5689F046 89C02801 EE168800 F0E90375 u.Õb...Ÿ.+å.fb.V·.F-.V%j..v%.v-. 000020
 26F646FF F65EC400 8CE90376 7FFFFE81 461974C0 080AC483 12E61540 9A05F868 h%..ə.|..6..åt.F.±..v.ÕŸ.6^-.F-& 000040
 01458D8A 75003F80 26F65E88 F475003F 8026F646 FFF65EC4 0CE847EA 75003F80 .?.uõG$.6^-.F-&.?.u¶.^-&.?.u¤.E. 000060
 FE5689FC 468902C4 83132814 2D9A56EE 5689EC46 8904C483 12F514E8 9A046A50 Pj..Ò.%..6..F$.VŸV.-.+..6..F•.V± 000080
 76FF0C6A 1A371689 1A35A3EE 5688EC46 886674C2 08FC4688 6D74EE46 08EC4688 .F$.FŸtm.F•.ôtf.F$.VŸÈS...7.j..v 0000A0
 078926FE 5688FC46 88EC5EC4 2C74C008 0AC48310 4A15409A 05F8681E F076FFF2 ·.vb.h%..ə.J..6..åt,6^$.F•.V±&.. 0000C0
 E8EB0E74 C00A0788 26FC46FF FC5EC407 8A26F046 FFF05EC4 04EC4683 02578926 &.W..F$.6^b.Fb&..6^•.F•&...åt.ŠÒ 0000E0
 FA70E900 028890C8 C95F5EA7 75003F80 26F05EC4 F475003F 8026F046 FFF05EC4 6^b.Fb&.?.u¶6^b&.?.uI^_èü.|..Õp* 000100
 12110010 120F1600 160C0808 070A0C09 0C080C07 09060005 18040203 02021601 ................................ 000120
 09820A81 0A801606 09721C70 2060006C 08590057 00530052 02430041 02350212 ..5.A.C.R.S.W.Y.l.m p.r......... 000140
 FF880008 E8C850E5 8899FFFF 88182416 89182BA3 16080000 080702CE 08A40D84 ..Ê.ö.•.....Ê+...$.|....|]üÒ..|. 000160
 0472133C F7E24343 1674073A 2E1875E4 0A002489 13808818 28A3C850 E58899FF ...|]üÊ+.E..¿$..Õu..:.t.CCå%<.r. 000180
 C08C065E C4EC8855 00C31824 A3980147 8A2E4301 76CA3C04 728C3C43 0A76243C <$v.C<Ÿr.<òv.C..G..È$.Ò.U.$6^..å 0001A0
 4C3E831E 73FFF130 06468857 5602EC83 EC8855C8 50E58801 FE4F8026 0574C308 .Üt.&.Ò±..|]üW.$.$.VW.F.=þ.s..>L 0001C0
 329A0676 FF087500 78E80574 0018E815 750082E8 1A4CA312 740025E8 0875001A ..u.ÒX.t.ÊL.Ò..u.Ò..t.Òx.u..v..2 0001E0
```

Dump of file SATURN:[PCCOMMON.DUMP.DLL]DFM.TMP;1 on 18-APR-1990 10:44:03.15
File ID (618,10,0)   End of file block 65 / Allocated 68

Virtual block number 47 (0000002F), 512 (0200) bytes

```
C033FE5E 89FEE383 43065E8B 0776065E 3900F08B CB5DE58B 5E5F02C4 8312A616 .ï..á._^.ï]ùEb.9^.v..^.C.D±.^±3à 000000
1A50A31A 4E1687C2 8B3874FF FA8308C4 83146117 0E9A5002 80510E4F 8050501E .PP.O.ō .P.ñ.a..á..*.t8.ô..N.ÉP. 000020
02A30000 A3000A88 0C478948 480008A3 C033088E FE5E8800 08A30A8E 05740208 .@t..ÖE...^±.A3àE..HH.G.¡..Ê..Ê. 000040
9AE81A50 1E8ED833 064E88C0 8ED88CC3 1FD88C00 06A30000 05000AA3 01478000 ..G.È.....È...Ä.ú.Á.â.N.3U..P.Ò. 000060
89F84689 151518DC 9A0676FF 006A0876 FF006A56 00000AC8 C3098EC1 8C020801 ..@.è.ìúà...Vj..v.j..v..É....F%. 000080
FE5689FC 468902C4 83152E14 209A56F8 7688902F EB99C028 0674FFFF C2F7FA56 V*%ö..t.+ã.Š/..v½V.-....á..F=.V± 0000A0
90CBC95E FE5688FC 46889007 EB08C483 14801894 9A50FE76 FF006A56 1274D008 .Ãt.Vj..v±P......á.Š...F=.V±^èù. 0000C0
F30A76C5 FE8BC803 09F7AEF2 C033F788 067EC409 8827E30E 4E881E56 57EC8B55 U.$WV..N.D'.lá-..K3à·ÚÁl.ù.±év.µ 0000E0
880E4E88 00CB5DE5 885F5E1F C18801F7 49490474 0477FF45 3A26C933 FF448AA6 Ï.D.3è8:E.w.t.II%l.è.^_.ï]ù_.N.. 000100
D8F7AA2D 800A7902 080E750A F9831374 C00A93FC 071E570A 7EC51E08 56880646 F..V..é-.W..•..ât..*.u..@y.¯- %Ù 000120
88AA2704 0276393C 30040387 92F1F793 F1F70274 C0080233 92F7880A F7000283 .@.XÖ.X.30.ât.Xþ.Xþ..#.0<9v..' . 000140
00CB5DE5 885E5F1F 580A8CF2 72C73801 448DFF44 880586AC 4F0588E2 75C308C2 ô.ùuå..O¯...D..D.;ùr·.ÖX._^.ï]ù. 000160
109A5306 0E74830A 47F626FA 5EC41CE8 F628FC5E 8CFA4689 062A8856 000006C8 à...V|*..F*.^•+-Š.á^*&-G..t..S.. 000180
90CBC95E C6880876 FA463918 1A168818 18A10CFA 46834601 744004C4 8314FA19 .*..á.@t.F.F*.Å......9F*vÄ.ó¯èù. 0001A0
1E297500 3F831A42 885756EC 8855CB5D E58801FE 4F800474 D808065E 88EC8855 U.$.^..Ùt..O±..ï]ùU.$VWEB..?.u). 0001C0
C704C683 000104C7 961A44A3 1A42A3FE 244024E8 99C03305 750176E8 00058807 .¡..Òv.u.3à.$$a$±É8.ÉD..ú....6.ú 0001E0
```

Dump of file SATURN:[PCCOMMON.DUMP.DLL]DFM.TMP;1 on 18-APR-1990 10:44:03.15
File ID (618,10,0)   End of file block 65 / Allocated 68

Virtual block number 48 (00000030), 512 (0200) bytes

```
E180FA74 410000E9 CB5DE588 5E5F0009 E8C08ED8 8C064E88 1A483689 FFFEFE44 D±±..6N..N..Ä.àÒ.._^.ï]ùÖÅ.At*.Å 000000
03357401 A8ADF003 00881573 C1384843 7401A8FE 88ADFC02 7788F273 EEF983FE ±.*Ys·.w.•Ù.±´.tCH;ès..Å.bÙ´.t5. 000020
FE4CFEF9 0305E805 8948C128 FE4C89F9 030C74FE 88E6E8FE 4489F788 000205C2 ô....%.D±Šl.±t..*.L±+èH..Š..*±L± 000040
882574FF FE3D021A 5406C626 C3027F89 1A501E8C 26057401 38120089 DA8CC688 .6.Ö¿..;lt.&..P....ù&6.l..=±.tX. 000060
89F78800 0205C203 E27401A8 ADF003D0 888C73C1 3848FE88 F27401A8 ADF003FE ±.bÙ´.t·.±H;ésV.Å.bÙ´.tä.ó....%. 000080
260574C7 3816C58F D88C1274 1A540EFE 2615E808 8E0474C0 08084788 E6E8FE44 D±Šl.G..ât..ÄŠ.&±.T.t..Äeé.;ùt.& 0000A0
4DFE0D74 005FE898 40400124 0D74C638 0068E8C0 33067788 88E83788 1A4C1E8E ..L..7ŠE.w.3àÒk.;ót.$.aa.Ò_.t.±M 0000C0
99C03302 47890788 1A50A326 0474C138 17198908 8C98E84E 4E960574 001DE8FE ±Ò..t..NNŠ..Ä¿..;èt.&ÉP....G.3á. 0000E0
C603C188 F575EAD1 04761A52 1638267F FF8A4141 49C82803 7401A8FE 458851C3 ùQ.E±´.t.+àIAAn..&;.R.v.lõu%.è.6 000100
001DE851 52C359C0 33E575EA 01D2F708 75000CE8 C628C223 D2F70072 C2031572 r..ór.%@#ò+6Ò..u.%@lõul3àYúRÒÒ.. 000120
335053C3 5A5958FE 55894AD7 28068806 7789FFFE FE44C7F2 03F088FE 88571874 t.W.±.b. úD±±..w..@+eJ.U±XYZúSP3 000140
8855C302 0802745B 5A1FFFFA 8308C483 160117DE 9A1F0650 00018850 52521ED2 @.RRP¡..P...ñ....á..*..Z[t..@ÙÙ 000160
F636884C E8277200 57E80775 48064688 08568801 F68F3875 000A7E83 065756EC $VW..~..uB¢-..V..F.Nu.ÒW.r'ŠL.6- 000180
D2080473 05F6FE81 04C68334 735E003E E8560E46 89024488 0074F738 11744805 .Nt.;%t..D..F.VÒ>.^s4.6..±-.s..@ . ^01A0
5C891489 E675C085 F9580000 FFFF9A50 C0335016 52C48850 21E899FF FF880675 u.¡...$IP.áR.P3àP.....[*.àul...\ 0001C0
F6FE8104 C6830C74 024C39F7 880E4E88 CB5DE588 5E5F07C0 33038805 F6368902 ..6-..#3à._^.ï]ù.N..X9L.t..6..±- 0001E0
```

Dump of file SATURN:[PCCOMMON.DUMP.DLL]DFM.TMP;1 on 18-APR-1990 10:44:03.15
File ID (618,10,0)   End of file block 65 / Allocated 68

Virtual block number 49 (00000031), 512 (0200) bytes

```
00FFFF9A 51531373 01F01E39 0675F738 C18ED388 26721C03 DA882CE8 F9F27505 .u·*Š,.Ö..r&.#.è;%u.9.b.s.SQ.... 000000
067EC457 38E30C4E 88EC8855 00C30188 04879201 F0168904 75F738DE 75C08500 ..àuN;%u...b.....lü.U.Š.N.DBVá~. 000020
87AAF3C9 13A8F3E9 D1E08A0A 46880128 D1870103 D3230818 D1280C74 DAF70788 .m%Öt.+l.Ù#¢.l.l+l.F..ÅlÖm¨.èm¨. 000040
88EC8855 CB500856 88064688 5FAAF3C9 13A8F3E9 D1C38EFF FFC381C3 8C10E3D1 lD..Ù.Û...ùlÖm¨.èm¨_.F..V.]ÙU.Š. 000060
66F70646 88C888E3 F70008CA 5DE588E3 F7064688 08750A5E 88D8080C 5E880846 F..^..Ä.^.u..F.%D.lÏò..%D.à.F.%f 000080
03240A47 8A26065E C4F62856 000004C8 0008CA5D E588D103 E3F70646 88C8030C ..à.F.%D.l.l]ò..à...V+-á^.&.G.$. 0000A0
39740112 1E87F606 D868F9F7 000C8999 062A20C3 88157508 0A47F626 5575023C <,ùU&-G..u..û·*..¿..%*kÄ.-....t9 0000C0
E42A0847 8A260677 FF260877 FF265028 7EC008FC 46890647 28260788 26065E88 .^.&..&+G..F•.à-(P&.w.&.w.&.G.*Ö 0000E0
06478826 065EC4FF FF8E200A 4F802606 5EC40874 FC463808 C48317CE 0FA29A50 P.Å.ö..á.;f=t.á^.&.O. /..á^.&.G. 000100
00050001 124C0103 000CC8C9 5EC68800 000447C7 26025789 26078926 08578826 &.W.&..&.W.&ùG....ó^èù....L..... 000120
00880001 18C70105 0000000A 174E0002 00000008 19640002 00070001 12140103 ..........d.......N.......ú..... 000140
003A0001 0FCE0103 01790008 10EE0203 00260001 187D0103 00220001 18320103 ..2...".. .)...&...Y...y...ö...:. 000160
00000000 00000000 005C0001 00C70103 00580001 000A0103 004D0001 11960103 ......M...Ö...[...ú...\......... 000180
6F432020 20797261 7262694C 20656069 54206E75 52205340 00000000 00000000 ........MS Run-Time Library - Co 0001A0
70726F43 2074666F 736F7263 6940202C 38383931 20296328 20746867 69727970 pyright (c) 1988, Microsoft Corp 0001C0
0060726F 46003020 72657765 6956204D 46440000 73257325 73250020 203A0011 ..:  .Xs%s%s..DFM Viewer 0.Form. 0001E0
```

```
Dump of file SATURN:[PCCOMMON.DUMP.DLL]DFM.TMP;1 on 18-APR-1990 10:44:03.15
File ID (618,10,0)   End of file block 65 / Allocated 68

Virtual block number 50 (00000032), 512 (0200) bytes

61607270 70007061 60727570 00736072 6F667267 00736072 6F666173 00007325 %s..saforms.grforms.purmap.pprma 000000
21726F72 72452079 72746E45 00003123 00706160 60647000 70616060 70700070 p.ppmmap.pdmmap.#1..Entry Error! 000020
0021726F 72724520 7972746E 45006465 63617073 6F6E6F4D 20606574 73795300 .System Monospaced.Entry Error!. 000040
20202020 20202020 20000000 00000000 00202000 20206434 25006434 25000000 ...%4d.%4d  .  ........          000060
10101010 10101010 48202020 20202020 20202020 20202020 20202028 28282828 (((((                 H........ 000080
01018181 81818181 10101010 10101084 84848484 84848484 84101010 10101010 ................................ 0000A0
02028282 82828282 10101010 10100101 01010101 01010101 01010101 01010101 ................................ 0000C0
00000000 00000000 00201010 10100202 02020202 02020202 02020202 02020202 ...................... ......... 0000E0
00000000 00000000 00000000 00000000 00000000 00000000 00000000 00000000 ................................ 000100
00000000 00000000 00000000 00000000 00000000 00000000 00000000 00000000 ................................ 000120
00000000 00000000 00000000 00000000 00000000 00000000 00000000 00000000 ................................ 000140
2800296C 6C756E28 00000000 00000000 00000000 00000000 00000000 00000000 ......................(null).( 000160
00000000 00001A6A 1CE0122F 1CE01CE0 00000000 00002320 20280029 6C6C756E null).+- #......Å.Å./.Å.j....... 000180
00000000 00000000 00000000 00000000 00000000 00000000 00000000 00000000 ................................ 0001A0
00000000 00000000 00000000 00000000 00000000 00000000 00000000 00000000 ................................ 0001C0
00000000 00000000 00000000 00000000 00000000 00000000 00000000 00000000 ................................ 0001E0

Dump of file SATURN:[PCCOMMON.DUMP.DLL]DFM.TMP;1 on 18-APR-1990 10:44:03.15
File ID (618,10,0)   End of file block 65 / Allocated 68

Virtual block number 51 (00000033), 512 (0200) bytes

00000000 00000000 00000000 00000000 00000000 00000000 00000000 00000000 ................................ 000000
00000000 00000000 00000000 00000000 00000000 00000000 00000000 00000000 ................................ 000020
00000000 00000000 00000000 00000000 00000000 00000000 00000000 00000000 ................................ 000040
00000000 00000000 00000000 00000000 00000000 00000000 00000000 00000000 ................................ 000060
00000000 00000000 00000000 00000000 00000000 00000000 00000000 00000000 ................................ 000080
00000000 00000000 00000000 00000000 00000000 00000000 00000000 00000000 ................................ 0000A0
00000000 00000000 00000000 00000000 00000000 00000000 00000000 00000000 ................................ 0000C0
00000000 00000000 00000000 00000000 00000000 00000000 00000000 00000000 ................................ 0000E0
00000000 00000000 00000000 00000000 00000000 00000000 00000000 00000000 ................................ 000100
00000000 00000000 00000000 00000000 00000000 00000000 00000000 00000000 ................................ 000120
00000000 00000000 00000000 00000000 00000000 00000000 00000000 00000000 ................................ 000140
00000000 00000000 00000000 00000000 00000000 00000000 00000000 00000000 ................................ 000160
00000000 00000000 00000000 00000000 00000000 00000000 00000000 00000000 ................................ 000180
00000000 00000000 00000000 00000000 00000000 00000000 00000000 00000000 ................................ 0001A0
00000000 00000000 00000000 00000000 00000000 00000000 00000000 00000000 ................................ 0001C0
00000000 00000000 00000000 00000000 00000000 00000000 00000000 00000000 ................................ 0001E0

Dump of file SATURN:[PCCOMMON.DUMP.DLL]DFM.TMP;1 on 18-APR-1990 10:44:03.15
File ID (618,10,0)   End of file block 65 / Allocated 68

Virtual block number 52 (00000034), 512 (0200) bytes

00000000 00000000 00000000 00000000 00000000 00000000 00000000 00000000 ................................ 000000
00000000 00000000 00000000 00000000 00000000 00000000 00000000 00000000 ................................ 000020
00000000 00000000 00000000 00000000 00000000 00000000 00000000 00000000 ................................ 000040
00000000 00000000 00000000 00000000 00000000 00000000 00000000 00000000 ................................ 000060
00000000 00000000 00000000 00000000 00000000 00000000 00000000 00000000 ................................ 000080
00000000 00000000 00000000 00000000 00000000 00000000 00000000 00000000 ................................ 0000A0
00000000 00000000 00000000 00000000 00000000 00000000 00000000 00000000 ................................ 0000C0
00000000 00000000 00000000 00000000 00000000 00000000 00000000 00000000 ................................ 0000E0
00000000 00000000 00000000 00000000 00000000 00000000 00000000 00000000 ................................ 000100
00000000 00000000 00000000 00000000 00000000 00000000 00000000 00000000 ................................ 000120
00000000 00000000 00000000 00000000 00000000 00000000 00000000 00000000 ................................ 000140
5F454C49 465F435F 01F60000 00000000 00000000 00000000 00000000 00000000 ................................ 000160
00000618 137A0614 137A0610 137A060C 137AFFFF 137A0000 00000030 4F464E49 ......................-._C_FILE_ 000180
00000000 00000000 00000001 1A680000 00000632 00000200 FFFFFFFF 01010000 INFO*.....z...z...z...z...z..... 0001A0
00000000 00000000 00000000 00000000 00000202 00000000 00000000 00000102 ............2.....h............. 0001C0
                                                                        ................................ 0001E0
```

```
Dump of file SATURN:[PCCOMMON.DUMP.DLL]DFM.TMP;1 on 18-APR-1990 10:44:03.15
File ID (618,10,0)   End of file block 65 / Allocated 68

Virtual block number 53 (00000035), 512 (0200) bytes

00000000 00000000 00000000 00000000 00000000 00000000 00000000 00000000 ................................ 000000
00000000 00000000 00000000 00000000 00000000 00000000 00000000 00000000 ................................ 000020
00000000 00000000 00000000 00000000 00000000 00000000 00000000 00000000 ................................ 000040
00000000 00000000 00000000 00000000 00000000 00000000 00000000 00000000 ................................ 000060
00000000 00000000 00000000 00000000 00000000 00000000 00000000 00000000 ................................ 000080
00000000 00000000 00000000 00000000 00000000 00000000 00000000 00000000 ................................ 0000A0
00000000 00000000 00000000 00000000 00000000 00000000 00000000 00000000 ................................ 0000C0
00000000 00000000 00000000 00000000 00000000 00000000 00000000 00000000 ................................ 0000E0
00000000 00000000 00000000 00000000 00000000 00000000 00000000 00000000 ................................ 000100
00000000 00000000 00000000 00000000 00000000 00000000 00000000 00000000 ................................ 000120
00000000 00000000 00000000 00000000 00000000 00000000 00000000 00000000 ................................ 000140
00000000 00000000 00000000 00000000 00000000 00000000 00000000 00000000 ................................ 000160
00000000 00000000 00000000 00000000 00000000 00000000 00000000 00000000 ................................ 000180
00000000 00000000 00000000 00000000 00000000 00000000 00000000 00000000 ................................ 0001A0
00000000 00000000 00000000 00000000 00000000 00000000 00000000 00000000 ................................ 0001C0
00000000 00000000 00000000 00000000 00000000 00000000 00000000 00000000 ................................ 0001E0

Dump of file SATURN:[PCCOMMON.DUMP.DLL]DFM.TMP;1 on 18-APR-1990 10:44:03.15
File ID (618,10,0)   End of file block 65 / Allocated 68

Virtual block number 54 (00000036), 512 (0200) bytes

00000000 00000000 00000000 00000000 00000000 00000000 00000000 00000000 ................................ 000000
00000000 00000000 00000000 00000000 00000000 00000000 00000000 00000000 ................................ 000020
00000000 00000000 00000000 00000000 00000000 00000000 00000000 00000000 ................................ 000040
00000000 00000000 00000000 00000000 00000000 00000000 00000000 00000000 ................................ 000060
00000000 00000000 00000000 00000000 00000000 00000000 00000000 00000000 ................................ 000080
00000000 00000000 00000000 00000000 00000000 00000000 00000000 00000000 ................................ 0000A0
00000000 00000000 00000000 00000000 00000000 00000000 00000000 00000000 ................................ 0000C0
00000000 00000000 00000000 00000000 00000000 00000000 00000000 00000000 ................................ 0000E0
00000000 00000000 00000000 00000000 00000000 00000000 00000000 00000000 ................................ 000100
00000000 00000000 00000000 00000000 00000000 00000000 00000000 00000000 ................................ 000120
00000000 00000000 00000000 00000000 00000000 00000000 00000000 00000000 ................................ 000140
00000000 00000000 00000000 00000000 00000000 00000000 00000000 00000000 ................................ 000160
00000000 00000000 00000000 00000000 00000000 00000000 00000000 00000000 ................................ 000180
00000000 00000000 00000000 00000000 00000000 00000000 00000000 00000000 ................................ 0001A0
00000000 00000000 00000000 00000000 00000000 00000000 00000000 00000000 ................................ 0001C0
00000000 00000000 00000000 00000000 00000000 00000000 00000000 00000000 ................................ 0001E0

Dump of file SATURN:[PCCOMMON.DUMP.DLL]DFM.TMP;1 on 18-APR-1990 10:44:03.15
File ID (618,10,0)   End of file block 65 / Allocated 68

Virtual block number 55 (00000037), 512 (0200) bytes

00000000 00000000 00000000 00000000 00000000 00000000 00000000 00000000 ................................ 000000
00000000 00000000 00000000 00000000 00000000 00000000 00000000 00000000 ................................ 000020
00000000 00000000 00000000 00000000 00000000 00000000 00000000 00000000 ................................ 000040
00000000 00000000 00000000 00000000 00000000 00000000 00000000 00000000 ................................ 000060
00000000 00000000 00000000 00000000 00000000 00000000 00000000 00000000 ................................ 000080
00000000 00000000 00000000 00000000 00000000 00000000 00000000 00000000 ................................ 0000A0
00000000 00000000 00000000 00000000 00000000 00000000 00000000 00000000 ................................ 0000C0
00000000 00000000 00000000 00000000 00000000 00000000 00000000 00000000 ................................ 0000E0
00000000 00000000 00000000 00000000 00000000 00000000 00000000 00000000 ................................ 000100
00000000 00000000 00000000 00000000 00000000 00000000 00000000 00000000 ................................ 000120
00000000 00000000 00000000 00000000 00000000 00000000 00000000 00000000 ................................ 000140
00000000 00000000 00000000 00000000 00000000 00000000 00000000 00000000 ................................ 000160
00000000 00000000 00000000 00000000 00000000 00000000 00000000 00000000 ................................ 000180
00000000 00000000 00000000 00000000 00000000 00000000 00000000 00000000 ................................ 0001A0
00000000 00000000 00000000 00000000 00000000 00000000 00000000 00000000 ................................ 0001C0
00000000 00000000 00000000 00000000 00000000 00000000 00000000 00000000 ................................ 0001E0
```

```
Dump of file SATURN:[PCCOMMON.DUMP.DLL]DFM.TMP;1 on 18-APR-1990 10:44:03.15
File ID (618,10,0)    End of file block 65 / Allocated 68

Virtual block number 56 (00000038), 512 (0200) bytes

00000000 00000000 00000000 00000000 00000000 00000000 00000000 00000000 ................................ 000000
00000000 00000000 00000000 00000000 00000000 00000000 00000000 00000000 ................................ 000020
00000000 00000000 00000000 00000000 00000000 00000000 00000000 00000000 ................................ 000040
00000000 00000000 00000000 00000000 00000000 00000000 00000000 00000000 ................................ 000060
00000000 00000000 00000000 00000000 00000000 00000000 00000000 00000000 ................................ 000080
00000000 00000000 00000000 00000000 00000000 00000000 00000000 00000000 ................................ 0000A0
00000000 00000000 00000000 00000000 00000000 00000000 00000000 00000000 ................................ 0000C0
00000000 00000000 00000000 00000000 00000000 00000000 00000000 00000000 ................................ 0000E0
00000000 00000000 00000000 00000000 00000000 00000000 00000000 00000000 ................................ 000100
00000000 00000000 00000000 00000000 00000000 00000000 00000000 00000000 ................................ 000120
00000000 00000000 00000000 00000000 00000000 00000000 00000000 00000000 ................................ 000140
00000000 00000000 00000000 00000000 00000000 00000000 00000000 00000000 ................................ 000160
00000000 00000000 00000000 00000000 00000000 00000000 00000000 00000000 ................................ 000180
00000000 00000000 00000000 00000000 00000000 00000000 00000000 00000000 ................................ 0001A0
00000000 00000000 00000000 00000000 00000000 00000000 00000000 00000000 ................................ 0001C0
00000000 00000000 00000000 00000000 00000000 00000000 00000000 00000000 ................................ 0001E0

Dump of file SATURN:[PCCOMMON.DUMP.DLL]DFM.TMP;1 on 18-APR-1990 10:44:03.15
File ID (618,10,0)    End of file block 65 / Allocated 68

Virtual block number 57 (00000039), 512 (0200) bytes

00000000 00000000 00000000 00000000 00000000 00000000 00000000 00000000 ................................ 000000
00000000 00000000 00000000 00000000 00000000 00000000 00000000 00000000 ................................ 000020
00000000 00000000 00000000 00000000 00000000 00000000 00000000 00000000 ................................ 000040
00000000 00000000 00000000 00000000 00000000 00000000 00000000 00000000 ................................ 000060
00000000 00000000 00000000 00000000 00000000 00000000 00000000 00000000 ................................ 000080
00000000 00000000 00000000 00000000 00000000 00000000 00000000 00000000 ................................ 0000A0
00000000 00000000 00000000 00000000 00000000 00000000 00000000 00000000 ................................ 0000C0
00000000 00000000 00000000 00000000 00000000 00000000 00000000 00000000 ................................ 0000E0
00000000 00000000 00000000 00000000 00000000 00000000 00000000 00000000 ................................ 000100
00000000 00000000 00000000 00000000 00000000 00000000 00000000 00000000 ................................ 000120
00000000 00000000 00000000 00000000 00000000 00000000 00000000 00000000 ................................ 000140
00000000 00000000 00000000 00000000 00000000 00000000 00000000 00000000 ................................ 000160
00000000 00000000 00000000 00000000 00000000 00000000 00000000 00000000 ................................ 000180
00000000 00000000 00000000 00000000 00000000 00000000 00000000 00000000 ................................ 0001A0
00000000 00000000 00000000 00000000 00000000 00000000 00000000 00000000 ................................ 0001C0
00000000 00000000 00000000 00000000 00000000 00000000 00000000 00000000 ................................ 0001E0

Dump of file SATURN:[PCCOMMON.DUMP.DLL]DFM.TMP;1 on 18-APR-1990 10:44:03.15
File ID (618,10,0)    End of file block 65 / Allocated 68

Virtual block number 58 (0000003A), 512 (0200) bytes

00000000 00000000 00000000 00000000 00000000 00000000 00000000 00000000 ................................ 000000
00000000 00000000 00000000 00000000 00000000 00000000 00000000 00000000 ................................ 000020
00000000 00000000 00000000 00000000 00000000 00000000 00000000 00000000 ................................ 000040
00000000 00000000 00000000 00000000 00000000 00000000 00000000 00000000 ................................ 000060
00000000 00000000 00000000 00000000 00000000 00000000 00000000 00000000 ................................ 000080
00000000 00000000 00000000 00000000 00000000 00000000 00000000 00000000 ................................ 0000A0
00000000 00000000 00000000 00000000 00000000 00000000 00000000 00000000 ................................ 0000C0
00000000 00000000 00000000 00000000 00000000 00000000 00000000 00000000 ................................ 0000E0
00000000 00000000 00000000 00000000 00000000 00000000 00000000 00000000 ................................ 000100
00000000 00000000 00000000 00000000 00000000 00000000 00000000 00000000 ................................ 000120
00000000 00000000 00000000 00000000 00000000 00000000 00000000 00000000 ................................ 000140
00000000 00000000 00000000 00000000 00000000 00000000 00000000 00000000 ................................ 000160
00010000 00000000 00000000 00000000 00000000 00000000 00000000 00000000 ................................ 000180
00000000 00000000 00000000 00000000 00000000 00000000 00000000 00000000 ................................ 0001A0
00000000 00000000 00000000 00000000 00000000 00000000 00000000 00000200 ................................ 0001C0
00000000 00000000 00000000 00000000 00000000 00000000 00000000 00000000 ................................ 0001E0
```

```
Dump of file SATURN:[PCCOMMON.DUMP.DLL]DFM.TMP;1 on 18-APR-1990 10:44:03.15
File ID (618,10,0)   End of file block 65 / Allocated 68

Virtual block number 59 (0000003B), 512 (0200) bytes

00000000 00000000 00000000 00000000 00000000 00000000 00000000 00000000 ................................ 000000
00000000 00000000 00000000 00000000 00000000 00000000 00000000 00000000 ................................ 000020
00000000 00000000 00000000 00000000 00000000 00000000 00000000 00000000 ................................ 000040
00000000 00000000 00000000 00000000 00000000 00000000 00000000 00000000 ................................ 000060
00000000 00000000 00000000 00000000 00000000 00000000 00000000 00000000 ................................ 000080
00000000 00000000 00000000 00000000 00000000 00000000 00000000 00000000 ................................ 0000A0
00000000 00000000 00000000 00000000 00000000 00000000 00000000 00000000 ................................ 0000C0
00000000 00000000 00000000 00000000 00000000 00000000 00000000 00000000 ................................ 0000E0
00000000 00000000 00000000 00000000 00000000 00000000 00000000 00000000 ................................ 000100
00000000 00000000 00000000 00000000 00000000 00000000 00000000 00000000 ................................ 000120
00000000 00000000 00000000 00000000 00000000 00000000 00000000 00000000 ................................ 000140
00000000 00000000 00000000 00000000 00000000 00000000 00000000 00000000 ................................ 000160
00000000 00000000 00000000 00000000 00000000 00000000 00000000 00000000 ................................ 000180
00000000 00000000 00000000 00000000 00000000 00000000 00000000 00000000 ................................ 0001A0
00000000 00000000 00000000 00000000 00000000 00000000 00000000 00000000 ................................ 0001C0
00000000 00000000 00000000 00000000 00000000 00000000 00000000 00000000 ................................ 0001E0

Dump of file SATURN:[PCCOMMON.DUMP.DLL]DFM.TMP;1 on 18-APR-1990 10:44:03.15
File ID (618,10,0)   End of file block 65 / Allocated 68

Virtual block number 60 (0000003C), 512 (0200) bytes

00000000 00000000 00000000 00000000 00000000 00000000 00000000 00000000 ................................ 000000
00000000 00000000 00000000 00000000 00000000 00000000 00000000 00000000 ................................ 000020
00000000 00000000 00000000 00000000 00000000 00000000 00000000 00000000 ................................ 000040
00000000 00000000 00000000 00000000 00000000 00000000 00000000 00000000 ................................ 000060
00000000 00000000 00000000 00000000 00000000 00000000 00000000 00000000 ................................ 000080
00000000 00000000 00000000 00000000 00000000 00000000 00000000 00000000 ................................ 0000A0
00000000 00000000 00000000 00000000 00000000 00000000 00000000 00000000 ................................ 0000C0
00000000 00000000 00000000 00000000 00000000 00000000 00000000 00000000 ................................ 0000E0
00000000 00000000 00000000 00000000 00000000 00000000 00000000 00000000 ................................ 000100
00000000 00000000 00000000 00000000 00000000 00000000 00000000 00000000 ................................ 000120
00000000 00000000 00000000 00000000 00000000 00000000 00000000 00000000 ................................ 000140
00000000 00000000 00000000 00000000 00000000 00000000 00000000 00000000 ................................ 000160
00000000 00000000 00000000 00000000 00000000 00000000 00000000 00000000 ................................ 000180
00000000 00000000 00000000 00000000 00000000 00000000 00000000 00000000 ................................ 0001A0
00000000 00000000 00000000 00000000 00000000 00000000 00000000 00000000 ................................ 0001C0
00000000 00000000 00000000 00000000 00000000 00000000 00000000 00000000 ................................ 0001E0

Dump of file SATURN:[PCCOMMON.DUMP.DLL]DFM.TMP;1 on 18-APR-1990 10:44:03.15
File ID (618,10,0)   End of file block 65 / Allocated 68

Virtual block number 61 (0000003D), 512 (0200) bytes

00000000 00000000 00000000 00000000 00000000 00000000 00000000 00000000 ................................ 000000
00000000 00000000 00000000 00000000 00000000 00000000 00000000 00000000 ................................ 000020
00000000 00000000 00000000 00000000 00000000 00000000 00000000 00000000 ................................ 000040
00000000 00000000 00000000 00000000 00000000 00000000 00000000 00000000 ................................ 000060
00000000 00000000 00000000 00000000 00000000 00000000 00000000 00000000 ................................ 000080
00000000 00000000 00000000 00000000 00000000 00000000 00000000 00000000 ................................ 0000A0
00000000 00000000 00000000 00000000 00000000 00000000 00000000 00000000 ................................ 0000C0
00000000 00000000 00000000 00000000 00000000 00000000 00000000 00000000 ................................ 0000E0
00000000 00000000 00000000 00000000 00000000 00000000 00000000 00000000 ................................ 000100
00000000 00000000 00000000 00000000 00000000 00000000 00000000 00000000 ................................ 000120
00000000 00000000 00000000 00000000 00000000 00000000 00000000 00000000 ................................ 000140
00000000 00000000 00000000 00000000 00000000 00000000 00000000 00000000 ................................ 000160
00000000 01F81212 00000000 00000000 00000000 00000000 00000000 00000000 ................................ 000180
00000000 00000000 00000000 00008181 81010000 00010000 00000000 00000000 ..........................%..... 0001A0
00000000 00000000 00000000 00000000 00000000 00000000 00000000 00000000 ................................ 0001C0
00000000 00000000 00000000 00000000 00000000 00000000 00000000 00000000 ................................ 0001E0
```

```
Dump of file SATURN:[PCCOMMON.DUMP.DLL]DFM.TMP;1 on 18-APR-1990 10:44:03.15
File ID (618,10,0)   End of file block 65 / Allocated 68

Virtual block number 62 (0000003E), 512 (0200) bytes

00000000 00000000 00000000 00000000 00000000 00000000 00000000 00000000 ................................ 000000
00000000 00000000 00000000 00000000 00000000 00000000 00000000 00000000 ................................ 000020
00000000 00000000 00000000 00000000 00000000 00000000 00000000 00000000 ................................ 000040
00000000 00000000 00000000 00000000 00000000 00000000 00000000 00000000 ................................ 000060
00000000 00000000 00000000 00000000 00000000 00000000 00000000 00000000 ................................ 000080
00000000 00000000 00000000 00000000 00000000 00000000 00000000 00000000 ................................ 0000A0
0A0A0A0A 0A0A0A0A 0A0A0A0A 0A0A0A0A 0A000000 00000000 00000000 00000000 ................................ 0000C0
0A0A0A0A 0A0A0A0A 0A0A0A0A 0A0A0A0A 0A0A0A0A 0A0A0A0A 0A0A0A0A 0A0A0A0A ................................ 0000E0
0A0A0A0A 0A0A0A0A 0A0A0A0A 0A0A0A0A 0A0A0A0A 0A0A0A0A 0A0A0A0A 0A0A0A0A ................................ 000100
0A0A0A0A 0A0A0A0A 0A0A0A0A 0A0A0A0A 0A0A0A0A 0A0A0A0A 0A0A0A0A 0A0A0A0A ................................ 000120
0A0A0A0A 0A0A0A0A 0A0A0A0A 0A0A0A0A 0A0A0A0A 0A0A0A0A 0A0A0A0A 0A0A0A0A ................................ 000140
0A0A0A0A 0A0A0A0A 0A0A0A0A 0A0A0A0A 0A0A0A0A 0A0A0A0A 0A0A0A0A 0A0A0A0A ................................ 000160
0A0A0A0A 0A0A0A0A 0A0A0A0A 0A0A0A0A 0A0A0A0A 0A0A0A0A 0A0A0A0A 0A0A0A0A ................................ 000180
0A0A0A0A 0A0A0A0A 0A0A0A0A 0A0A0A0A 0A0A0A0A 0A0A0A0A 0A0A0A0A 0A0A0A0A ................................ 0001A0
00000000 00000000 00000000 00000000 000A0A0A 0A0A0A0A 0A0A0A0A 0A0A0A0A ................................ 0001C0
00000000 00000000 00000000 20000000 00000000 00000000 00000000 00000000 .................... ........... 0001E0

Dump of file SATURN:[PCCOMMON.DUMP.DLL]DFM.TMP;1 on 18-APR-1990 10:44:03.15
File ID (618,10,0)   End of file block 65 / Allocated 68

Virtual block number 63 (0000003F), 512 (0200) bytes

73202D0A 00303030 36520000 3E3E4753 404E3C3C FFFFFFFF 061C15E0 00000000 ....Å.......<<NMSG>>..R6000..- s 000000
6765746E 69202D0A 00333030 36520003 000A0D77 6F6C6672 65766F20 68636174 tack overflow.....R6003..- integ 000020
20746F6E 20200A0D 38303036 52000800 0A0D3020 79622065 64697669 64207265 er divide by 0.....R6008..- not  000040
52000900 0A0D7374 6E656075 67726120 726F6620 65636170 73206867 756F6E65 enough space for arguments.....R 000060
766E6520 726F6620 65636170 73206867 756F6E65 20746F6E 20200A00 39303036 6009..- not enough space for env 000080
726F7272 6520656D 6974206E 757200FF 000A0000 FC000A00 746E6560 6E6F7269 ironment...=......run-time error 0000A0
20746F6E 20746E69 6F702067 6E697461 6F6C6620 200A0D32 30303652 00020020  ...R6002..- floating point not  0000C0
00020000 0009062C 00020000 00081A66 00020003 FFFFFF00 0A006465 64616F6C loaded..........f.......,....... 0000E0
000C0000 00200020 00200000 04204349 00000000 00000000 00000000 000A181A ................IC ... . . ..... 000100
00000000 00000000 00000000 00000000 FFFFFF00 00000001 00010080 00400000 ..@............................. 000120
00FFFF03 80FFFF3F 80FFFFFF FFFFFF3F C0FFFFFF FFFFFF3F 00000000 00000000 ........?......å?.......?....... 000140
00F0E1FF FF0FFF3F 00F887FF FFC3FF3F 00FC1FFC 7FF0FF3F 00FE7F00 00FCFF3F ?.=...±.?.b.=.=.?.Û...%.?....Åb. 000160
78C0FFFF FFFFC73F 3880FFFF FFFFE33F 1800FEFF FFFFF03F 0800F8FF FF3FFC3F ?=?..%..?b...±..?0.....8?û....åx 000180
F8383333 3333333F F8300000 0000803F F8300000 0000803F 78E0FFFF FFFFCF3F ?ü....Åx?.....0%?.....0%?333338% 0001A0
783EF3FF FFFFFF3C F83C0000 0000003E F83C0000 0000003E F8383333 3333333F ?333338%>.....<%>.....<%<....µ>x 0001C0
383FF3FF FFFFFF39 383FF03F 000C0638 383FF03F 000C0638 783EF3FF FFFFFF3C <....µ>x8...?b?88...?b?89....µ?8 0001E0

Dump of file SATURN:[PCCOMMON.DUMP.DLL]DFM.TMP;1 on 18-APR-1990 10:44:03.15
File ID (618,10,0)   End of file block 65 / Allocated 68

Virtual block number 64 (00000040), 512 (0200) bytes

983FF3FF FFFFFF33 983F3018 30186030 983F3018 30186030 983FF3FF FFFFFF31 1....µ?.0'.0.0?.0'.0.0?.3....µ?. 000000
983F3333 33333303 983F0000 00000000 983F0000 00000000 983FF3FF FFFFFF03 .....µ?.......?.......?..33333?. 000020
983F0300 00000000 983FCCCC CCCCCC00 983FCCCC CCCCCC30 983F3333 33333333 333333?.0ääääää?..ääää8?.......?. 000040
383F333C F0000008 383FF0FF FFFFFF09 383FF0FF FFFFFF31 983F0300 00000030 0.....?.1....b?8.....b?8...b<3?8 000060
F83C333C F00F000C F83CF0FF FFFF7F0C 783EF0FF FFFFFF30 783E333C F0000030 0..b<3>x0....b>x.....b<%...b<3<% 000080
F833333C 7000800C F833F0FF FFFF1F0C F839F0FF FFFF3F33 F839333C F00F0032 2..b<39%3?...b9%.....b3%...p<33% 0000A0
F81F0200 0000E00C F80FF0FF FFFFC30C F807F0FF FFFF4733 F827333C 70000033 3..p<3'%3G...b.%.û...b.%.Å.....% 0000C0
F8FF1F00 00C0CC0C F8FF87CC CC00CC0C F8FFC1CC CC0C3233 F87F0000 00003833 38.....%32.ääå.%.ä.ää..%.ää....% 0000E0
F8FFFF7F CCCCCC0C F8FFFF7F CCCCCC0C F8FFFF03 00333333 F8FF7F00 00303333 330....%333....%.ääå...%.ääå...% 000100
01000000 00000000 FFFFFFFF FFFFFFFF 00000000 00000000 00000000 00000000 ................................ 000120
01000000 00000000 01000000 00000000 01000000 00000000 01000000 00000000 ................................ 000140
01000000 00000000 01000000 00000000 01000000 00000000 01000000 00000000 ...:............................ 000160
01000000 00000000 01000000 00000000 01000000 00000000 01000000 00000000 ................................ 000180
01000000 00000000 01000000 00000000 01000000 00000000 01000000 00000000 ................................ 0001A0
01000000 00000000 01000000 00000000 01000000 00000000 01000000 00000000 ................................ 0001C0
01000000 00000000 01000000 00000000 01000000 00000000 01000000 00000000 ................................ 0001E0
```

```
Dump of file SATURN:[PCCOMMON.DUMP.DLL]DFN.TMP;1 on 18-APR-1990 10:44:03.15
File ID (618,10,0)   End of file block 65 / Allocated 68

Virtual block number 65 (00000041), 512 (0200) bytes

01000000 00000000 01000000 00000000 01000000 00000000 01000000 00000000 ................................ 000000
01000000 00000000 01000000 00000000 01000000 00000000 01000000 00000000 ................................ 000020
01000000 00000000 01000000 00000000 01000000 00000000 01000000 00000000 ................................ 000040
01000000 00000000 01000000 00000000 01000000 00000000 01000000 00000000 ................................ 000060
01000000 00000000 01000000 00000000 01000000 00000000 01000000 00000000 ................................ 000080
01000000 00000000 01000000 00000000 01000000 00000000 01000000 00000000 ................................ 0000A0
01000000 00000000 01000000 00000000 01000000 00000000 01000000 00000000 ................................ 0000C0
01000000 00000000 01000000 00000000 01000000 00000000 01000000 00000000 ................................ 0000E0
00000000 00000000 00000000 00000000 01000000 00000000 01000000 00000000 ................................ 000100
00000000 00000000 00000000 00000000 00000000 00000000 00000000 00000000 ................................ 000120
00000000 00000000 00000000 00000000 00000000 00000000 00000000 00000000 ................................ 000140
00000000 00000000 00000000 00000000 00000000 00000000 00000000 00000000 ................................ 000160
00000000 00000000 00000000 00000000 00000000 00000000 00000000 00000000 ................................ 000180
00000000 00000000 00000000 00000000 00000000 00000000 00000000 00000000 ................................ 0001A0
00000000 00000000 00000000 00000000 00000000 00000000 00000000 00000000 ................................ 0001C0
00000000 00000000 00000000 00000000 00000000 00000000 00000000 00000000 ................................ 0001E0

Dump of file SATURN:[PCCOMMON.DUMP.DLL]DGM.TMP;1 on 18-APR-1990 10:44:12.07
File ID (620,6,0)   End of file block 186 / Allocated 188

Virtual block number 1 (00000001), 512 (0200) bytes

00000000 00000040 00000000 00000088 0000FFFF 00000004 0000008A 014D5A4D MZM.¤..............|.......a....... 000000
00000080 00000000 00000000 00000000 00000000 00000000 00000000 00000000 ................................ 000020
6F6E6E61 63206D61 72676F72 70207369 685421CD 4C01B821 CD09B400 0EBA1F0E ..¤..Ç.è!¡.LèIThis program canno 000040
00000000 00000024 0A00002E 65646F6D 20534F44 206E6920 6E757220 65622074 t be run in DOS mode....$....... 000060
0000000E 00000000 00002588 00000000 000E8009 A20C11A6 01A80E74 0505454E NE..t.¯.|..Â.........X.......... 000080
00000000 00000000 00010000 00040000 0000109C 08520838 00800080 0040004A J.a.¯.¯.8.R..................... 0000A0
0E380F00 0E37090C 0E860F00 0E86081A 44500F00 444F03B7 29660F00 2965010F ..e)..f)ñ.OD..PD..........7...8. 0000C0
084C0F00 084C0CF8 17A00F00 17A00878 0FFE0F00 0FFE0A75 060C0F00 06D80A01 ..Û...É.u.±...±.x.......«.L...L. 0000E0
10FA0F00 10FA1200 127A0F00 127A10D3 184C0F00 184C0F15 18AE0F00 18AE0085 ..Û...Û...L...L.®.z...z...ª...ª. 000100
4C4C4F52 43534D47 440F0000 4D474403 0F700F21 0F58163E 31C90F00 31C9131B ..è1..è1>.[.!.p..DGM...DGMSCROLL 000120
414F4254 45534D47 44080002 54505245 544E4543 4D47440B 00015445 5346464F OFFSET...DGMCENTERPT...DGMSETBOA 000140
58455741 52444D47 44150004 4554554C 4F534241 4D4F4F5A 4D47440F 00034452 RD...DGMZOOMABSOLUTE...DGMDRAWEX 000160
4553554F 4D545341 4C595245 55514D47 44150005 454C4352 49434445 444F4C50 PLODEDCIRCLE...DGMQUERYLASTMOUSE 000180
4D474411 00075450 4553554F 4D545341 4C595245 55514D47 44130006 45444F4D MODE...DGMQUERYLASTMOUSEPT...DGM 0001A0
4553554F 4D545341 4C544553 4D474413 0008454C 4143534D 4F4F5A59 52455551 QUERYZOOMSCALE...DGMSETLASTMOUSE 0001C0
4D474414 000A5941 4C505349 44545845 54595245 55514D47 44130009 45444F4D MODE...DGMQUERYTEXTDISPLAY...DGM 0001E0

Dump of file SATURN:[PCCOMMON.DUMP.DLL]DGM.TMP;1 on 18-APR-1990 10:44:12.07
File ID (620,6,0)   End of file block 186 / Allocated 188

Virtual block number 2 (00000002), 512 (0200) bytes

53554F4D 59524555 514D4744 10000845 4C444E41 4859504F 43445241 48544553 SETHARDCOPYHANDLE...DGMQUERYMOUS 000000
55514D47 4412000D 584F4244 45444E55 4F525741 52444D47 4411000C 52545045 EPTR...DGMDRAWROUNDEDBOX...DGMQU 000020
4D474415 000F4853 45524645 524D4744 0A000E54 4E45494C 43444E57 48595245 ERYHWNDCLIENT...DGMREFRESH...DGM 000040
4E574859 52455551 4D474411 0010544E 45545845 4D415247 41494459 52455551 QUERYDIAGRAMEXTENT...DGMQUERYHWN 000060
44485952 45555140 47440000 12435241 57415244 4D47440A 00114540 41524644 DFRAME...DGMDRAWARC...DGMQUERYHD 000080
43445241 48544553 4D474415 00145449 4E555952 4555514D 47440C00 134E4957 WIN...DGMQUERYUNIT...DGMSETHARD⁻ 0000A0
4E414859 504F4344 52414859 52455551 4D474416 00155941 4C505349 4459504F OPYDISPLAY...DGMQUERYHARDCOPYHA. 0000C0
41455457 4152444D 47440F00 174E4654 4E494150 5445534D 47440000 16454C44 DLE...DGMSETPAINTFN...DGMDRAWTEA ⁾⁾00E0
1959414C 50534944 59504F43 44524148 59524555 514D4744 17001850 4F524452 RDROP...DGMQUERYHARDCOPYDISPLAY. 0U0100
4F524552 59425241 454E4D47 4413001A 4D415247 41494457 4152444D 47440E00 ..DGMDRAWDIAGRAM...DGMNEARBYRERO 000120
554F4244 49524759 504F4344 52414859 52455551 4D474419 0018444E 45455455 UTEEND...DGMQUERYHARDCOPYGRIDBOU 000140
4F525952 45555140 47441300 1D574F44 4E495752 41454C43 4D47440E 001C444E ND...DGMCLEARWINDOW...DGMQUERYRO 000160
4E494C4D 47441200 1F434448 59524555 514D4744 08001E54 4E455458 45455455 UTEEXTENT...DGMQUERYHDC...DGMLIN 000180
55514D47 44100021 584F4254 49464D47 44090020 53444E45 48435445 52545345 ESTRETCHENDS ..DGMFITBOX!..DGMQU 0001A0
514D4744 13002343 4F525044 4E574E49 57440800 224F464E 49524553 55595245 ERYUSERINFO"..DWINWNDPROC#..DGMQ 0001C0
56454E49 4C594252 41454E4D 47441300 24534F50 52545045 53554F4D 59524555 UERYMOUSEPTRPOS$..DGMNEARBYLINEV 0001E0
```

```
Dump of file SATURN:[PCCOMMON.DUMP.DLL]DGM.TMP;1 on 18-APR-1990 10:44:12.07
File ID (620,6,0)   End of file block 186 / Allocated 188

Virtual block number 3 (00000003), 512 (0200) bytes

454C434D 47440800 26584F42 4D524F46 534E4152 544D4744 0F002558 45545245 ERTEXX..DGMTRANSFORMBOX&..DGMCLE 000000
55514D47 44160028 454C4143 53544946 59524555 514D4744 10002758 4F425241 ARBOX'..DGMQUERYFITSCALE(..DGMQU 000020
544E4554 58455445 534D4744 0E002948 54474E45 4C544944 45545845 54595245 ERYTEXTEDITLENGTH)..DGMSETEXTENT 000040
4D474411 002B474E 49525453 4445444F 4C505845 57415244 4D474415 002A4E46 FN*..DGMDRAWEXPLODEDSTRING+..DGM 000060
4553554F 4D545341 4C544553 4D474411 002C544E 45545845 4554554F 52544553 SETROUTEEXTENT,..DGMSETLASTMOUSE 000080
57415244 4D474408 002E5345 444F4D52 45535552 41454C43 4D474411 002D5450 PT-..DGMCLEARUSERMODES...DGMDRAW 0000A0
4645534F 4C435445 534D4744 0D003058 4F425741 52444D47 440A002F 454E494C LINE/..DGMDRAWBOX0..DGMSETCLOSEF 0000C0
44100032 53525454 41544944 4548434F 4C425458 45545445 534D4744 1800314E N1..DGMSETTEXTBLOCKEDITATTRS2..D 0000E0
00344554 554F5257 4152444D 47440C00 33544944 45545845 54545241 54534D47 GMSTARTTEXTEDIT3..DGMDRAWROUTE4. 000100
42485345 52464552 4D474412 00355453 49444D49 52545453 554A4441 4D474411 .DGMADJUSTTRIMDIST5..DGMREFRESHB 000120
16003754 4E455458 454D4152 47414944 5445534D 47441300 364B4349 4854584F OXTHICK6..DGMSETDIAGRAMEXTENT7.. 000140
55544553 4D47440C 00384E4F 47594C4F 50444544 4F4C5058 45574152 444D4744 DGMDRAWEXPLODEDPOLYGON8..DGMSETU 000160
54574152 444D4744 10003A44 52414F42 59524555 514D4744 0000394D 4F4F5A50 PZOOM9..DGMQUERYBOARD:..DGMDRAWT 000180
4E494D47 4417003C 584F4248 53455246 45524D47 4400003B 4B434F4C 42545845 EXTBLOCK;..DGMREFRESHBOX<..DGMIN 0001A0
3E54494E 55544553 4D47440A 00304547 4E414843 59504F43 44524148 4D524F46 FORMHARDCOPYCHANGE=..DGMSETUNIT> 0001C0
534D4744 15003F44 4E554F42 44495247 59504F43 44524148 5445534D 47441700 ..DGMSETHARDCOPYGRIDBOUND?..DGMS 0001E0

Dump of file SATURN:[PCCOMMON.DUMP.DLL]DGM.TMP;1 on 18-APR-1990 10:44:12.07
File ID (620,6,0)   End of file block 186 / Allocated 188

Virtual block number 4 (00000004), 512 (0200) bytes

44455458 45545445 534D4744 13004054 4944454B 434F4C42 54584554 54524154 TARTTEXTBLOCKEDIT@..DGMSETTEXTED 000000
594F5254 5345444D 47440A00 424E4550 5445534D 47440900 41535254 54415449 ITATTRSA..DGMSETPENB..DGMDESTROY 000020
57415244 4D47440D 00444741 5244314E 4F545455 42595245 55514D47 44130043 C..DGMQUERYBUTTON1DRAGD..DGMDRAW 000040
4C574152 444D4744 0C004650 41454859 52455551 4D47440C 0045454C 43524943 CIRCLEE..DGMQUERYHEAPF..DGMDRAWL 000060
4D474410 00484741 5244324E 4F545455 42595245 55514D47 44130047 32454E49 INE2G..DGMQUERYBUTTON2DRAGH..DGM 000080
47441100 4A4E4550 59524555 514D4744 0B004952 4F544345 4E4E4F43 57415244 DRAWCONNECTORI..DGMQUERYPENJ..DG 0000A0
52545045 53554F4D 5445534D 47440E00 4B544944 45545845 54485349 4E49464D MFINISHTEXTEDITK..DGMSETMOUSEPTR 0000C0
4D474411 004D4154 4C45444C 4C4F5243 53485355 50595245 55514D47 4417004C L..DGMQUERYPUSHSCROLLDELTAM..DGM 0000E0
4E554D41 52474149 44544553 4D474417 004E4741 5244314E 4F545455 42544553 SETBUTTON1DRAGN..DGMSETDIAGRAMUN 000100
44150050 47415244 324E4F54 54554254 45534D47 4411004F 4D435245 50535449 ITSPERCMO..DGMSETBUTTON2DRAGP..D 000120
4E495754 45534D47 44120051 41544C45 444C4C4F 52435348 53555054 45534D47 GMSETPUSHSCROLLDELTAQ..DGMSETWIN 000140
10005345 54554F52 42555354 5245534E 494D4744 11005254 4E455458 45574F44 DOWEXTENTR..DGMINSERTSUBROUTES.. 000160
5040524F 46534E41 52544D47 440E0054 4E46544E 45545845 59524555 514D4744 DGMQUERYEXTENTFNT..DGMTRANSFORMP 000180
1500564D 43524550 5354494E 554D4152 47414944 59524555 514D4744 19005554 TU..DGMQUERYDIAGRAMUNITSPERCMV.. 0001A0
58455453 494D4744 14005747 4553454E 494C4F48 54524F59 42524145 4E4D4744 DGMNEARBYORTHOLINESEGW..DGMISTEX 0001C0
0000594F 464E4952 45535554 45534D47 440E0058 44455449 4445474E 49454254 TBEINGEDITEDX..DGMSETUSERINFOY.. 0001E0

Dump of file SATURN:[PCCOMMON.DUMP.DLL]DGM.TMP;1 on 18-APR-1990 10:44:12.07
File ID (620,6,0)   End of file block 186 / Allocated 188

Virtual block number 5 (00000005), 512 (0200) bytes

06005848 53455246 45525449 464D4744 0D005A53 45444F4D 59524555 514D4744 DGMQUERYMODESZ..DGMFITREFRESH[.. 000000
4412005D 454E494C 4445444F 4C505845 57415244 4D474413 005C5449 464D4744 DGMFIT\..DGMDRAWEXPLODEDLINE]..D 000020
45425448 59524555 514D4744 0C005E58 4F424445 444F4C50 58455741 52444D47 GMDRAWEXPLODEDBOX^..DGMQUERYNIBE 000040
504F5445 534D4744 0C006048 54474E45 4C4D524F 46534E41 52544D47 4412005F _..DGMTRANSFORMLENGTH`..DGMSETOP 000060
00635350 48595245 55514D47 44080062 45544145 52434D47 44090061 4E464E45 ENFNa..DGMCREATEb..DGMQUERYHPSc 000080
0016000D 00070001 00006454 4E455458 45574F44 4E495759 52455551 4D474414 .DGMQUERYWINDOWEXTENTd.......... 0000A0
08495047 4D50054E 49574D50 05000615 05F90503 05C504F1 04840121 00AC0052 R.¯.!...þ.é.Ä.*.....PMWIN.PMGPI. 0000C0
45444D45 4D0E5041 45484554 41455243 4D454D00 4D454D03 534C4C41 43534F44 DOSCALLS.MEM.MEMCREATEHEAP.MEMDE 0000E0
42454552 464D454D 0C4B434F 4C42434F 4C4C414D 454D0050 41454859 4F525453 STROYHEAP.MEMALLOCBLOCK.MEMFREEB 000100
4741424C 54551352 4F535255 4354494E 49474142 4C545510 54554403 4B434F4C LOCK.DUT.UTLBAGINITCURSOR.UTLBAG 000120
435A5350 5455440C 4548414D 5145534C 54550A52 4F535255 43455441 52455449 ITERATECURSOR.UTLSEQMAKE.DUTPSZC 000140
5403455A 49535A53 50545544 0A594F52 54534544 5A535054 55440045 54414552 REATE.DUTPSZDESTROY.DUTPSZSIZE.T 000160
45425407 52455453 49474552 4E554542 54005245 54534947 45524542 54084542 BE.TBEREGISTER.TBEUNREGISTER.TBE 000180
4542540E 54494445 444E4545 42540A54 4944454E 49474542 4542540C 57415244 DRAW.TBEBEGINEDIT.TBEENDEDIT.TBE 0001A0
45545942 4E494854 474E454C 59524555 51454254 15525454 41544944 45544553 SETEDITATTR.TBEQUERYLENGTHINBYTE 0001C0
53494454 50504853 09504853 034E4F49 5449444E 45525952 45555145 42541153 S.TBEQUERYRENDITION.SHP.SHPPIDIS 0001E0
```

Dump of file SATURN:[PCCOMMON.DUMP.DLL]DGM.TMP;1 on 18-APR-1990 10:44:12.07
File ID (620,6,0)   End of file block 186 / Allocated 188

Virtual block number 6 (00000006), 512 (0200) bytes

```
454E494C 5048530D 45544154 4F525450 5048530B 54534944 44545050 48530A54 T.SHPPTDDIST.SHPPTROTATE.SHPLINE 000000
414C5045 52454E49 4C504853 10545044 4441454E 494C5048 530C4554 41455243 CREATE.SHPLINEADDPT.SHPLINEREPLA 000020
52455551 454E494C 50485311 54504556 4F4D4552 454E494C 5048530F 54504543 CEPT.SHPLINEREMOVEPT.SHPLINEQUER 000040
45555145 4E494C50 48531354 50595245 5551454E 494C5048 530E544E 554F4359 YCOUNT.SHPLINEQUERYPT.SHPLINEQUE 000060
50485310 54505453 414C5952 45555145 4E494C50 48531254 50545352 49465952 RYFIRSTPT.SHPLINEQUERYLASTPT.SHP 000080
49444D49 52545952 45555145 4E494C50 48531452 54544159 52455551 454E494C LINEQUERYATTR.SHPLINEQUERYTRIMDI 0000A0
52455551 454E494C 50485312 54505458 454E5449 4E49454E 494C5048 53115453 ST.SHPLINEINITNEXTPT.SHPLINEQUER 0000C0
50485316 4D494457 4F525241 59524555 51454E49 4C504853 14545054 58454E59 YNEXTPT.SHPLINEQUERYARROWDIM.SHP 0000E0
1545564F 4D454E49 4C504853 084D4944 444E4F4D 41494459 52455551 454E494C LINEQUERYDIAMONDDIM.SHPLINEMOVE. 000100
534F5243 47455350 48531053 52545441 504F5244 5459504F 43454E49 4C504853 SHPLINECOPYTDROPATTRS.SHPSEGCROS 000120
43504853 14535549 44415259 52455551 454C4352 49435048 5314584F 42534553 SESBOX.SHPCIRCLEQUERYRADIUS.SHPC 000140
49444152 59524555 51435241 50485311 5245544E 45435952 45555145 4C435249 IRCLEQUERYCENTER.SHPARCQUERYRADI 000160
59524555 51435241 50485315 5245544E 45435952 45555143 52415048 53115355 US.SHPARCQUERYCENTER.SHPARCQUERY 000180
50454557 53454C47 4E415952 45555143 52415048 53155452 41545345 4C474E41 ANGLESTART.SHPARCQUERYANGLESWEEP 0001A0
45555150 4F524454 50485314 43524154 45535045 54414552 43435241 50485313 .SHPARCCREATEPSETARC.SHPTDROPQUE 0001C0
50485313 5450444E 45595245 5551504F 52445450 48531254 50545241 54535952 RYSTARTPT.SHPTDROPQUERYENDPT.SHP 0001E0
```

Dump of file SATURN:[PCCOMMON.DUMP.DLL]DGM.TMP;1 on 18-APR-1990 10:44:12.07
File ID (620,6,0)   End of file block 186 / Allocated 188

Virtual block number 7 (00000007), 512 (0200) bytes

```
4E415952 45555150 4F524454 50485312 53554944 41525952 45555150 4F524454 TDROPQUERYRADIUS.SHPTDROPQUERYAN '00000
5551504F 52445450 48531554 53554A59 52455551 504F5244 54504853 11454C47 GLE.SHPTDROPQUERYJUST.SHPTDROPQU 0u0020
48531552 54544159 52455551 504F5244 54504853 11545349 444D4952 54595245 ERYTRIMDIST.SHPTDROPQUERYATTR.SH 000040
52455551 504F5244 54504853 174D4944 574F5252 41595245 5551504F 52445450 PTDROPQUERYARROWDIM.SHPTDROPQUER 000060
584F4244 4E554F42 59524555 51425458 54504853 144D4944 444E4F4D 41494459 YDIAMONDDIM.SHPTXTBQUERYBOUNDBOX 000080
59524555 51425458 54504853 12584F42 444E554F 42544553 42545854 50485312 .SHPTXTBSETBOUNDBOX.SHPTXTBQUERY 0000A0
51425458 54504853 14545355 4A595245 55514254 58545048 53105448 47494548 HEIGHT.SHPTXTBQUERYJUST.SHPTXTBQ 0000C0
59545354 4E4F4659 52455551 42545854 50485315 45434146 544E4F46 59524555 UERYFONTFACE.SHPTXTBQUERYFONTSTY 0000E0
4E554F43 42545854 50485311 53455459 42595245 55514254 58545048 5311454C LE.SHPTXTBQUERYBYTES.SHPTXTBCOUN 000100
45504853 1A525450 53455459 42595245 55514254 58545048 53145345 54594254 TBYTES.SHPTXTBQUERYBYTESPTR.SHPE 000120
4F4D4D47 440D444F 4D03544E 45545845 59524555 51425458 54444544 4F4C5058 XPLODEDTXTBQUERYEXTENT.MOD.DGMMO 000140
4C4C5550 45444F4D 4D474408 48535550 45444F4D 4D474408 45544145 52434544 DECREATE.DGMMODEPUSH.DGMMODEPULL 000160
45434F52 5045444F 4D4D4744 1854434E 55465945 4B544553 45444F4D 4D474412 .DGMMODESETKEYFUNCT.DGMMODEPROCE 000180
56455945 4B535345 434F5250 45444F4D 4D474416 544E4556 45455355 4F4D5353 SSMOUSEEVENT.DGMMODEPROCESSKEYEV 0001A0
4E455458 45595245 55514452 420E594F 52545345 44445242 0A445242 03544E45 ENT.BRD.BRDDESTROY.BRDQUERYEX:EN 0001C0
59524555 514E4E4F 43445242 0F53544F 4C535952 4555514E 4E4F4344 52421154 T.BRDCONNQUERYSLOTS.BRDCONNQUE.Y 0001E0
```

Dump of file SATURN:[PCCOMMON.DUMP.DLL]DGM.TMP;1 on 18-APR-1990 10:44:12.07
File ID (620,6,0)   End of file block 186 / Allocated 188

Virtual block number 8 (00000008), 512 (0200) bytes

```
52455551 4E4E4F43 4452420F 45444953 59524555 514E4E4F 43445242 104D4944 DIM.BRDCONNQUERYSIDE.BRDCONNQUER 000000
4E4F4344 52421154 50524F48 434E4159 52455551 4E4E4F43 44524214 43524159 YARC.BRDCONNQUERYANCHORPT.BRDCON 000020
420F454E 494C4859 52455551 4554554F 52445242 12455455 4F525952 4555514E NQUERYROUTE.BRDROUTEQUERYHLINE.B 000040
45505954 59524555 51455455 4F524452 42115450 59524555 51455455 4F524452 RDROUTEQUERYPT.BRDROUTEQUERYTYPE 000060
41474244 09474244 03504F52 44544859 52455551 504F5244 52414554 44524216 .BRDTEARDROPQUERYHTDROP.DBG.DBGA 000080
53534348 0F535254 54414449 52475952 45555153 43481153 43480354 52455353 SSERT.HCS.HCSQUERYGRIDATTRS.HCSS 0000A0
43480945 54414552 43534348 0954494E 49534348 07535254 54414449 52475445 ETGRIDATTRS.HCSINIT.HCSCREATE.HC 0000C0
03255903 13F20311 98030104 45544952 57534F44 084F4953 03455445 4C454453 SDELETE.SIO.DOSWRITE........YX. 0000E0
01050403 08010519 030C0127 29031158 0327C003 28040301 0434C903 020113A2 Å....ê4....(.å'.[..)'........... 000100
2E030102 0A840302 0124AA03 0F0A0303 8D032653 03010406 52030201 032C0305 ........R....S&.......`$......... 000120
0A010000 0304CE03 080224DC 0302011E 96030101 05370304 6D030802 20500324 $.P ...m..7.........É$...ð...... 000140
1FB70319 5B030102 166E030A 01261603 2884030B 1E030103 05C80308 01105903 .Y....à........(..&...n....[..ñ. 000160
01109903 0C011DEB 03085F03 210E0301 03066403 0A010528 03050103 08030401 .........(....d....@!._..Š....... 000180
08030101 06200300 9A030202 03070326 E603283A 03010340 61030201 1F410301 ..A....a@...:(.!&............ ..... 0001A0
31880302 010E4103 07770301 0203EC03 0A0115B3 03020106 B9030C8A 030C021F ............"....$....w..A.....1 0001C0
76030801 211E0301 0105FE03 0801043D 03010129 AE030201 251C0311 10030102 .......%...Û)...*....±.....!...v 0001E0
```

```
Dump of file SATURN:[PCCOMMON.DUMP.DLL]DGM.TMP;1 on 18-APR-1990 10:44:12.07
File ID (620,6,0)   End of file block 186 / Allocated 188

Virtual block number 9 (00000009), 512 (0200) bytes

020124E7 03010106 88030201 27540301 02032085 03010300 30030844 030C0205 ....D..=..... .@..!'........0$.. 000000
1A030102 02490305 01063603 0C01201B 0301011A 0C030201 278A0301 01111803 .......'...E..... ...6....!..... 000020
69031F7A 03010214 FF030A01 10070328 0003268B 03010303 ED030801 26900329 )..&...U....E&.Å(...........z..i 000040
61694446 00000F94 03259203 0000031E CF03220E 0325CF03 0106383E 03200F03 !.............ÿ....Š..m$....U... 000060
38393120 74686769 7279706F 43202963 28206065 74737973 62755320 60617267 ..-.>8...üX.R".ü......X.....FDia 000080
49202C73 60657473 7953206E 6F697461 60726F66 6E49206E 61606863 61422039 gram Subsystem (c) Copyright 198 0000A0
0C46080A 4688D88E FFFFB81E 000020C8 00000000 00000000 00000000 002E636E 9 Bachman Information Systems, I 0000C0
F6468050 07892602 478926C0 28065EC4 01ADE98A D4880675 08460806 46880874 nc...............à ...|...Ä.F..F.  000E0
FF9A5016 F8468000 DE680A6A F676FF01 8CE98AD3 880674C0 080000FF FF9A5016 t..F..F.u.|å.ÕU.á^.+ä&.G.&..P.F- 000100
C4044789 26F6468B F85EC401 68E98AD3 880000FF FF9AF676 FF0E74C0 080000FF .P......åt.|ñ.Õ...v-j.hR..F%.P.. 000120
6A478926 6C478926 F85EC400 017647C7 26F85EC4 66478926 68478926 C028F85E ....åt..v-.....|ñ.Õh.á^%.F-&.G.á 000140
0E468BF8 5EC46247 89266447 8926F85E C4FFFF70 47C726FF FF6E47C7 26F85EC4 ^%+ä&.Gh&.Gfá^%&uGv..á^%&.Gl& Gj 000160
FF0C76FF 0C578926 0A478926 0C56880A 4688F85E C4105789 260E4789 2610568B á^%&uGn..&uGp..á^%&.Gd&.Gbá^%.. 000180
05B800E4 E80EF876 FFFA76FF 1075D008 FE5689FC 46890000 FFFF9A80 08680A76 .V.&.G.&.W.á^%.F..V.&.G.&.W..v.. 0001A0
FA76FF00 6AFC76FF FE76FF08 57892606 478926FE 568BFC46 8BF85EC4 0009E98A v.h........F=.V±.Åu..v*.v½.Õõ.|f 0001C0
                                                                        .Õ).á^%.F=.V±&.G.&.W..v±.v=j..v* 0001E0

Dump of file SATURN:[PCCOMMON.DUMP.DLL]DGM.TMP;1 on 18-APR-1990 10:44:12.07
File ID (620,6,0)   End of file block 186 / Allocated 188

Virtual block number 10 (0000000A), 512 (0200) bytes

E98A058B 0675C008 0000FFFF 9A5016E4 468DFC76 FFFE76FF 0000FFFF 9AF876FF .v%......v±.v=.Fõ.P......åu.|f.õ 000000
20578926 1E478926 F85EC499 E646881C 5789261A 478926F8 5EC499E8 46880098 ...Fõ.á^%&.G.&.W..F|.á^%&.G.&.W  000020
76FFFA76 FF0F7500 08E25689 E0468900 00FFFF9A FFFF6801 A168FC76 FFFE76FF .v±.v=hÅ.h........FÅ.Vã.Åu..v*.v 000040
C028F85E C4745789 26724789 26E2568B E0468BF8 5EC453E8 8AD58800 5DE80EF8 %.Õ).|f.Šsá^%.FÅ.Vã&.Gr&.Wtá^%+á 000060
F876FFFA 76FF0F74 C00804C4 83FFFF00 009AF876 FFFA76FF 3A478926 3C478926 &.G<&.G:.v*.v½......á..åt..v*.v% 000080
CAC91F00 E8C02802 57892607 8926FA56 88F8468B 065EC414 E88AD28B 001EE80E .Õ..|@.Š.á^..F%.V*&..&.W.+åŠ..èõ 0000A0
11E9C028 0575C208 FA5689F8 46890856 8806468B 088E0006 881E0000 16C8000C ..å....|...Ä.F..V..F%.V*.õu.+åÕ. 0000C0
76FFFA76 FFEE5EFF 53060574 D008F056 89EE4689 6C578826 6A478826 F85EC401 .á^%&.Gj&.Wl.FŸ.Vb.Åt..S.^Ÿ.v*.v 0000E0
AE87FF26 F85EC406 76FF0876 FF00E4E8 0E0676FF 0876FF04 C483FFFF 01989AF8 %.......á..v..v..Õõ..v..v.á^%&.ñÜ 000100
D008F656 89F44689 00C89788 2600C687 8826F85E C40000FF FF9A00AC 87FF2600 .&.ñ¯......á^%&..õ.&..å..F¶.V-.Å 000120
0001149A 006A006A 006A0677 FF260877 FF26F85E C40000FF FF9A50F6 76FF0974 t..v-P.....á^%&.w.&.w.j.j.j..... 000140
C40000FF FF9A50FE 76FF0974 D008FE56 89FC4689 3C578826 3A478826 F85EC400 .á^%&.G:&.W<.F=.V±.Åt..v±P.....á 000160
0000FFFF 9A000AB7 FF26000C 87FF2661 E8C02804 75C008F2 46890447 8826F85E ^%&.G..F..åu.+åŠa&.ñÉ.&.ñÕ...... 000180
88261247 8826F85E C404C483 FFFF0174 9AF876FF FA76FF49 E88AE088 0574C008 .åt.|Å.Š|.v*.v%.t....á.á^%&.G.&. 0001A0
EA76FFEC 76FF0000 00589AF2 76FF0000 FFFF9A53 06F276FF EC5689EA 46891457 W..Fõ.VŠ.v..S......v..[....vŠ.võ 0001C0
8E01D888 1E000010 C80004CA C91F00E8 C02804E8 8AD58805 75C00800 00FFFF9A ......åu.|f.Š.+åŠ..èõ..å....|Ä.. 0001E0

Dump of file SATURN:[PCCOMMON.DUMP.DLL]DGM.TMP;1 on 18-APR-1990 10:44:12.07
File ID (620,6,0)   End of file block 186 / Allocated 188

Virtual block number 11 (0000000B), 512 (0200) bytes

97882600 AC878826 F85EC463 E8C02804 75C208FA 5689F846 89085688 06468808 Ä.F..V..F%.V*.õu.+åŠcá^%&..¯.&.. 000000
F676FF00 00FFFF9A 5052F656 89F44689 40578826 3E478826 FE5689FC 468900AE Ü..F=.V±&.G>&.W@.F¶.V-RP......v- 000020
74F25639 0575F046 39FE5688 FC468823 75C00800 00FFFF9A 5016F046 8DF476FF .v¶.Fb.P......åu#.F=.V±9Fbu.9V t 000040
0018C800 04CAC91F 00E8C028 C9E80000 02379AF0 76FFF276 FF0676FF 0876FF11 ..v..v..v..vb.7...Šè+ÅŠ..èõ..à.. 000060
FF0087E9 8AD48806 75C208FE 5689FC46 89085688 06468808 8E0300B8 1E565700 .WV.|...Ä.F..V..F=.V±.õu.|å.Õ... 000080
C208EA56 89E84689 70578826 6E478826 FC5EC404 C483FFFF 03069A06 76FF0876 v..v.......á.á^=&.Gn&.Wp.FÕ.Võ.á 0000A0
8053FE76 FF1EE81F A5F20008 890A8E1E 0716F088 EC7E8D00 2A05C28C C3881975 u..Ü.õ.*..-&.b....Õ¿...É.Š..v±S. 0000C0
76FF5016 EC46801F A5F20008 891F161E EC768D2A 7F8DFC5E C4E85EFF 5016EC46 F$.P.^Õá^=..*.vŠ...¿...É..F$.P.v 0000E0
FFFF9A00 6A006A00 6A0677FF 260877FF 26FC5EC4 08C483FF FF0AAF9A 0676FF08 ..v..£....á.á^=&.w.&.w.j.j.j.... 000100
890C5688 0A4688D8 8E0395B8 1E565700 0060C800 04CAC95F 5E1F00E8 C0280000 ..+åŠ..^_èõ..à'..WV.|...Ä.F..V.. 000120
F07E8D08 56880646 880309E9 8AD48806 75084608 06468808 74C2080E 56890C46 FÉ.V8.õt..F..F.u.|å.Õ...F..V..-b 000140
882476F0 4639057F 287CF256 39FA5688 F846881F A5F20008 89DA8E1E 0716F088 .b....Õ¿...É..F%.V*9V.|+..9Fbv$. 000160
F84689CA 5688C846 88F25689 F046R9FA 5688F846 88CA5689 C84689F2 5688F046 Fb.V..Fà.Võ.F%.V*.Fb.V..Fà.Võ.F% 000180
5689C446 89F65688 F4468824 76[illegible] 057F287C F65639FE 5688FC46 88FA5689 .V*.F=.V±9V-|+..9F¶v$.F¶.V-.Fá.V 0001A0
7A7F8326 DC5EC4FE 5689FC46 89[illegible] C4468BF6 5689F446 89FE5688 FC4688C6 ó.F=.V±.F¶.V-.Fá.Vó.F=.V±á^É&..z 0001C0
47032603 E0C10E47 8826C05E C4C25689 C0468900 4205C28C C38801B2 E9037402 .t.Õý..Ü.õ.8..Fá.Võá^&&.G.èÅ.&.G 0001E0
```

```
Dump of file SATURN:[PCCOMMON.DUMP.DLL]DGM.TMP;1 on 18-APR-1990 10:44:12.07
File ID (620,6,0)   End of file block 186 / Allocated 188

Virtual block number 12 (0000000C), 512 (0200) bytes

 9AB85E8D 05320287 9AF05E8D 1FA5A5A5 A5DA8E1E 0716F088 887E8D0A 578B2608 .&.W..-|.b....ÖEEEE..^b...2..^|. 000000
 8D08C483 056407A1 9A054A03 879ADC88 08EC8305 4506619A 0C9E1E8D 053B060A ..;.......a.E..š..É.ñ.J..À.d..'.. 000020
 0326C05E C4058104 6E9A0569 01FA9AB0 5E8D1FA5 A5A5A5DA 8E1E0716 F088807E -¯.b....ÖEEEE..^¯.*.i..n...á^ι`. 000040
 9A0C9E1E 80059206 0A9AB85E 80058902 879AF45E 80F25689 F0468902 57132607 .&.W..Fb.V·.^¶......^|........... 000060
 DA8E1E07 16F088A8 7E8D08C4 83058807 A19A05A1 03879ADC 8808EC83 059C0661 a....š..É.ñ.À..À.E..á..-`.b....Ö 000080
 13C80306 778B2604 4F8826C0 5EC4FFFF 046E9A05 C001FA9A A85E8D1F A5A5A5A5 EEEE..^`.*.á..n...á^ä&.O.&.w..à. 0000A0
 DA8E1E07 16F088A8 7E8D0A57 88260847 032603E0 C10E4788 26F67689 F44E89F2 ·.N¶.v-&.G.éÀ.&.G.&.W..-´.b....Ö 0000C0
 EC830616 06619A0C 9E1E8D06 0C060A9A A85E8D06 0302879A F85E8D1F A5A5A5A5 EEEE..^%......^`...........a....š 0000E0
 8D1FA5A5 A5A5DA8E 1E0716F0 88807E8D 08C48306 3507A19A 06180387 9ADC8808 ..É.ñ....À.5..á..-¯.b....ÖEEEE.. 000100
 9AFC5E8D FA5689F8 46890257 13260703 26C05EC4 0652046E 9A063A01 FA9AB05E ^¯.*.:..n.R.á^ä&..&.W..F%.V*.^•. 000120
 9A067203 879ADC88 08EC8306 6006619A 0C9E1E80 0663060A 9AA85E8D 065A0287 ..Z..^`...c.......a.m..š..É.ñ.r.. 000140
 6E9A0691 01FA9AA0 5E8D1FA5 A5A5A5DA 8E1E0716 F088A07E 8D08C483 068C07A1 À....á..~..b....ÖEEEE..^..*....n 000160
 069A0A76 FF0C76FF FE7689FC 4E89F213 C8030677 8826044F 8826C05E C4052A04 .*.á^ä&.O.&.w..à.·.N•.v±.v..v... 000180
 05C28CC3 881975C2 08A25689 A0468970 5788266E 4788260C 5EC404C4 83038803 .|..á.á^É&.Gn&.Wp.F..VÅ.õu..ú.ô. 0001A0
 A05EFF50 16CC468D 53DE76FF 1EE81FA5 F2000889 DA8E1E07 16F088CC 7E8D002A *..~ä.b....Ö¿...É.Š..vRS.Fä.P.^. 0001C0
 0AAF9A0A 76FF0C76 FF5016CC 468D1FA5 F2000889 1F161ECC 768D2A7F 8D0C5EC4 á^É..*.vä...¿...É..Fä.P.v..v..€. 0001E0

Dump of file SATURN:[PCCOMMON.DUMP.DLL]DGM.TMP;1 on 18-APR-1990 10:44:12.07
File ID (620,6,0)   End of file block 186 / Allocated 188

Virtual block number 13 (0000000D), 512 (0200) bytes

 5689E046 89F25688 F0468800 FE568301 FC468300 FA568301 F8468308 C4830417 ...á..F%..V*..F=..V±..Fb.V·.FÅ.V 000000
 89FE5688 FC4688E6 5689E446 89F65688 F44688EA 5689E846 89FA5688 F84688E2 ä.F%.V*.FÖ.Võ.F¶.V-.FÖ.V|.F=.V±. 000020
 00E8C028 0000042E 9A006A50 16E0468D 0677FF26 0877FF26 DC5EC4EE 5689EC46 F$.VŸá^É&.w.&.w..FÅ.Pj.......+å$. 000040
 080E5689 DC46890E 56880C46 88D88E04 45881E56 57000060 C80008CA C95F5E1F .^_èò..å'..WV.|E..Å.F..V..FÉ.VR. 000060
 F07E8D0A 56880846 880370E9 8AD48806 7D01067E 8306740A 46080846 880E74C2 ôt¯..F..F.t..~..).|å.Öp..F..V..-b 000080
 882476F0 4639057F 287CF256 39FA5688 F846881F A5F20008 89DA8E1E 0716F088 .b....Ö¿...É..F%.V*9V·|+..9FbV$. 0000A0
 F84689CA 5688C846 88F25689 F04689FA 5688F846 88CA5689 C84689F2 5688F046 Fb.V·.Få.Vò.F%.V*.Fb.V·.Få.Vò.F% 0000C0
 5689C446 89F65688 F4468824 76F44639 057F287C F65639FE 5688FC46 88FA5689 .V*.F•.V±9V-|+..9F¶V$.F¶.V-.Fá.V 0000E0
 7A7F8326 DC5EC4FE 5689FC46 89C65688 C44688F6 5689F446 89FE5688 FC4688C6 ó.F•.V±.F¶.V-.Fó.Vó.F=.V±ó^É&..z 000100
 47032603 E0C10E47 8826C05E C4C25689 C0468900 4205C28C C3880218 E9037402 .t.Ö...Û.ô.B..Få.Vòä^ä&.G.éÅ.&.G 000120
 9AB85E8D 08720287 9AF05E8D 1FA5A5A5 A5DA8E1E 0716F088 887E8D0A 578B2608 .&.W..-|.b....ÖEEEE..^b...r..^|. 000140
 8D08C483 08A407A1 9A088A03 879A0C88 08EC8308 8506619A 0C9E1E80 087B060A ..(.......a....š..É.ñ....À.É..á.. 000160
 0326C05E C408C104 6E9A08A9 01FA9AB0 5E8D1FA5 A5A5A50A 8E1E0716 F088807E -¯.b....ÖEEEE..^¯.*.`..n.ê.á^ä&. 000180
 9A0C9E1E 80080206 0A9AB85E 8D08C902 879AF45E 8DF25689 F0468902 57132607 .&.W..Fb.V·.^¶...è..^|...@...... 0001A0
 DA8E1E07 16F088A8 7E8D08C4 8308F807 A19A08E1 03879ADC 8808EC83 080C0661 a.É..$..É.ñ.Ä..À.«..á..-`.b....Ö 0001C0
 13C80306 778B2604 4F8826C0 5EC405F8 046E9A09 0001FA9A A85E8D1F A5A5A5A5 EEEE..^`,*....n.«.á^ä&.O.&.w..à. 0001E0

Dump of file SATURN:[PCCOMMON.DUMP.DLL]DGM.TMP;1 on 18-APR-1990 10:44:12.07
File ID (620,6,0)   End of file block 186 / Allocated 188

Virtual block number 14 (0000000E), 512 (0200) bytes

 DA8E1E07 16F088A8 7E8D0A57 88260847 032603E0 C10E4788 26F67689 F44E89F2 ·.N¶.v-&.G.éÀ.&.G.&.W..-´.b....Ö 000000
 EC830956 06619A0C 9E1E8D09 4C060A9A A85E8D09 4302879A F85E8D1F A5A5A5A5 EEEE..^%...C..^`...t.......a.V..$ 000020
 8D1FA5A5 A5A5DA8E 1E0716F0 88807E8D 08C48309 7507A19A 09580387 9ADC8808 ..É.ñ.(..À.u..á..-¯.b....ÖEEEE.. 000040
 9AFC5E8D FA5689F8 46890257 13260703 26C05EC4 0992046E 9A097A01 FA9AB05E ^¯.*.z..n...á^ä&..&.W..F%.V*.^•. 000060
 9A098203 879ADC88 08EC8309 AD06619A 0C9E1E8D 09A3060A 9AA85E8D 099A0287 .....^`...Ê.......a.Ù..š..É.ñ.ý.. 000080
 6E9A0901 01FA9AA0 5E8D1FA5 A5A5A50A 8E1E0716 F088A07E 8D08C483 09CC07A1 À.ä..á..~..b....ÖEEEE..^..*.1..n 0000A0
 8803E3C1 0E5F8826 FE7689FC 4E89F213 C8030677 8826044F 8826C05E C4086A04 .j.á^ä&.O.&.w..à.·.N•.v±&._.èD.. 0000C0
 619A0C9E 1E8D0A11 068A9A0A 0802949A 065E8D0A 0301FE9A 188D0874 C426C076 vä&át....±....^...................a 0000E0
 A5DA8E1E 0716F088 A07E8D08 C4830A3A 07A19A0A 2003879A DC8808EC 830A1806 .....å..É.ñ. ..À.:..á..-..b....ÖE 000100
 76FF0001 0646C705 7D00013D 06468909 38046E9A 0A3F01FA 9AA05E8D 1FA5A5A5 EEE..^..*.7..n.;..F.=..).úF....v 000120
 75C208A2 5689A046 89705788 266E4788 260C5EC4 04C48306 8103069A 0C76FF0E ..v.....Ÿ..á.á^É&.Gn&.Wp.F..VÅ.õu 000140
 4680530E 76FF1EE8 1FA5F200 0889DA8E 1E0716F0 88CC7E8D 002A05C2 8CC38819 ..û.ó.*..~ä.b....Ö¿...É.Š..vRS.F 000160
 0E76FF50 16CC468D 1FA5F200 08891F16 1ECC768D 2A7F8D0C 5EC4A05E FF5016CC ä.P.^.ó^É..*.vä...¿...É..Fä.P.v. 000180
 88F04688 FE5611FC 460199FA 5611F846 01990646 8808C483 07100AAF 9A0C76FF .v..€....á..F...F%.V*..F=.V±.Fb. 0001A0
 E65689E4 4689F656 88F44688 EA5689E8 4689FA56 88F84688 E25689E0 4689F256 V·.FÅ.Vä.F%.V*.FÖ.Võ.F¶.V-.FÖ.V| 0001C0
 689A006A 5016E046 8D0677FF 260877FF 260C5EC4 EE5689EC 4689FE56 88FC4688 .F•.V±.F$.VŸá^É&.w.&.w..FÅ.Pj..h 0001E0
```

```
Dump of file SATURN:[PCCOMMON.DUMP.DLL]DGM.TMP;1 on 18-APR-1990 10:44:12.07
File ID (620,6,0)   End of file block 186 / Allocated 188

Virtual block number 15 (0000000F), 512 (0200) bytes

46890856 88064688 D88E077F 881E0000 04C8000A CAC95F5E 1F00EBC0 28000007 ...+âS..^èò..à....I...Ä.F..V..F 000000
75C00800 00FFFF9A 1277FF26 1477FF26 FC5EC410 EB8AD488 0575C208 FE5689FC •.V±.ôu.|ä.S.á^•&.w.&.w.......âu 000020
56880A46 88D88E08 24881E56 57000048 C80004CA C91F00EB C02804EB 8AD68805 .|ø.S.+âS..èò..âH..WV.|$..Ä.F..V 000040
80085688 06468802 B1E98AD4 88067508 46080646 880874C2 08FE5689 FC46890C ..F•.V±.ôt..F..F.u.|â.ÖŸ..F..V.. 000060
76EC4639 057F287C EE5639F6 5688F446 881FA5F2 000889DA 8E1E0716 F088EC7E -$.b....Öz...È..F¶.V-9VŸ|+..9F$v 000080
89E25688 E04688EE 5689EC46 89F65688 F44688E2 5689E046 89EE5688 EC468824 $.F$.VŸ.FÅ.Vã.F¶.V-.F$.VŸ.FÅ.Vã. 0000A0
DC4689F2 5688F046 882476F0 4639057F 287CF256 39FA5688 F84688F6 5689F446 F¶.V-.F%.V•9V |+..9Fb v$.Fb.V .FÉ 0000C0
8326FC5E C4FA5689 F846890E 5688DC46 88F25689 F04689FA 5688F846 880E5689 .V8.F%.V•.Fb.V .FÉ.V8.F%.V•á^•&. 0000E0
2603E0C1 0E478826 D85EC4DA 56890846 89004205 C28CC388 01B2E903 74027A7F .z.t.ÖŸ..Ù.ó.B..FÄ.VÖá^Ä&.G.èÄ.& 000100
5E8D0C54 02879AEC 5E8D1FA5 A5A5A5DA 8E1E0716 F088D07E 8D0A5788 26084703 .G.&.W..-Ä.b....ÖEEEE..^$...T..^ 000120
C4830C86 07A19A0C 6C03879A DC8808EC 830C6706 619A0C9E 1E800C5D 060A9AD0 Å...]......ø.g..$..É.ñ.I..À....á 000140
D85EC40C A3046E9A 0C8801FA 9AC85E8D 1FA5A5A5 A5DA8E1E 0716F088 C87E8008 ..-à.b....ÖEEEE..^à.•....n.É.á^Ä 000160
9E1E8D0C B4060A9A D05E8D0C A802879A F05E8DEE 5689EC46 89025713 26070326 &..&.W..F$.VŸ.^b.....^Å...Ç.... 000180
1E0716F0 88C07E8D 08C4830C D007A19A 0CC303B7 9ADC8808 EC830CBE 06619A0C ..ø./..$..É.ñ.Ù..Å.I..á..-ã.b... 0001A0
03067788 26044F88 26085EC4 09F8046E 9A0CE201 FA9AC05E 8D1FA5A5 A5A5DABE .ÖEEEE..^à.•.ã..n.«.á^Ä&.O.&.w.. 0001C0
1E0716F0 88C07E8D 0A578826 08470326 03E0C10E 478826F2 7689F04E 89F213C8 à...Nb.v &.G.èÄ.&.G.&.W..-ã.b... 0001E0

Dump of file SATURN:[PCCOMMON.DUMP.DLL]DGM.TMP;1 on 18-APR-1990 10:44:12.07
File ID (620,6,0)   End of file block 186 / Allocated 188

Virtual block number 16 (00000010), 512 (0200) bytes

00380661 9A0C9E1E 800D2E06 0A9AC05E 800D2502 879AF45E 8D1FA5A5 A5A5DABE .ÖEEEE..^¶...X..^â..........ø.8. 000000
A5A5A5A5 DA8E1E07 16F088C8 7E8008C4 83005707 A19A0D3D 03879ADC 8808EC83 .$..É.ñ.=..Å.W..á..-à.b....ÖEEEE 000020
5E8DF656 89F44689 02571326 07032608 5EC40074 046E9A0D 5C01FA9A C85E8D1F ..^à.•.\..n.t.á^Ä&..&.W..F¶.V-.^ 000040
9403879A DC8808EC 83008F06 619A0C9E 1E800D85 060A9AC0 5E8D007C 02879AF8 %...|..^à..........ø....$..É.ñ.. 000060
00B301FA 9A885E8D 1FA5A5A5 A5DA8E1E 0716F088 887E8D08 C48300AE 07A19AD0 ..Å.Ù..á..~|.b....ÖEEEE..^|.•.•. 000080
478826FC 5EC4FA76 89F84E89 F213C803 06778826 044F8826 D85EC40C 4C046E9A .n.L.á^Ä&.O.&.w..à...N%.v•á^•&.G 0000A0
006AE476 FFE676FF EA5689E8 46890000 FFFF9A50 52E65689 E4468914 57882612 .&.W..Fò.V|RP......Fò.Vö.v|.vöj. 0000C0
76FFF276 FFF476FF F676FFF8 76FFFA76 FF006A00 6A006A00 6A00000E 329A006A j..2...j.j.j.j..v•.v%.v-.v¶.v..v 0000E0
76FFEA76 FFE476FF E676FF1C C483FFFF 00819AE4 76FFE676 FFEC76FF EE76FFF0 b.vŸ.v$.v|.vö.Ÿ....á..v|.vö.vö.v 000100
0A4688D8 8E086788 1E565700 001CC800 08CAC95F 5E1F00EB C0280000 FFFF9AE8 ò.....+âS..^_èò..à...WV.|ø..Ä.F. 000120
56880646 880098E9 8AD48806 75084608 06468808 74C208FE 5689FC46 890C5688 .V..F•.V±.öt..F..F.u.|â.Ö...F..V 000140
4639057F 287CEE56 39F65688 F44681F1 A5F20008 890A8E1E 0716F088 EC7E8008 ..-$.b....Öz...È..F¶.V-9VŸ|+..9F 000160
5688E846 88EE5689 EC4689F6 5688F446 88EA5689 E84689EE 5688EC46 882476EC $v$.F&.VŸ.Fò.Vö.F¶.V-.F$.VŸ.Fò.V 000180
89F2568B F0468824 76F04639 057F287C F25639FA 5688F846 88F65689 F44689EA ò.F¶.V-.F%.V•9V |+..9Fb v$.Fb.V . 0001A0
FC5EC4FA 5689F846 89E65688 E44688F2 5689F046 89FA5688 F84688E6 5689E446 F8.V|.F%.V•.Fb.V .F8.V|.F%.V•á^• 0001C0
56570000 08C80008 CAC95F5E 1F00EBC0 281FA5F2 0008891F 161EEC76 802A7F8D ..•.v$...¿...É.+âS..^_èò..à...WV 0001E0

Dump of file SATURN:[PCCOMMON.DUMP.DLL]DGM.TMP;1 on 18-APR-1990 10:44:12.07
File ID (620,6,0)   End of file block 186 / Allocated 188

Virtual block number 17 (00000011), 512 (0200) bytes

04880575 08460806 46880874 C208FE56 89FC4689 0C56880A 4688088E 0E49881E .|I..Ä.F..V..F•.V±.öt..F..F.u.|â 000000
5688FC46 88065EC4 1875C208 FA5689F8 46897057 88266E47 8826FC5E C45AE88A .SZá^•&.Gn&.Wp.F%.V•.ôu.á^..F•.V 000020
FF0676FF 0876FFFC 76FFFE76 FF26E81F A5F20008 890A8E1E F088F888 002A05FE ±.•..«.b..Öz...É.S&.v±.v•.v..v.. 000040
5F5E1F00 E8C0281F A5F20008 890A8E1E F0882A7F 8D085688 064688FC 5EC4F85E ^%á^•.F..V...•.b..Öz...É.+âS..^ 000060
46880874 C208FE56 89FC4689 0C56880A 4688088E 0F12881E 000004C8 0008CAC9 èò..à....|...Ä.F..V..F•.V±.öt..F 000080
89260647 8926065E C4078926 02478926 C028065E C447E88A D4880575 08460806 ..F.u.|â.SGá^.+â&.G.&..á^.&.G.&. 0000A0
261E4788 26FC5EC4 0A578926 08478926 065EC41C 5788261A 478826FC 5EC40447 G.á^•&.G.&.W.á^.&.G.&.W.á^•&.G.& 0000C0
9A881E56 5700001C C80008CA C91F00EB C0280E57 89260C47 8926065E C4205788 .W á^.&.G.&.W.+âS..èò..à...WV.|. 0000E0
08E98AD4 88067508 46080646 880874C2 08EE5689 EC46890C 56880A46 88088E0F ..Ä.F..V..F$.VŸ.öt..F..F.u.|â.ÖÄ 000100
F25639FA 5688F846 881FA5F2 0008890A 8E1E0716 F088F07E 8D085688 06468800 |.F..V..-b.b....Öz...É..F%.V•9V. 000120
5689F046 89FA5688 F84688EA 5689E846 89F25688 F0468824 76F04639 057F287C |+..9Fb v$.Fb.V..Fò.Vö.F%.V•.Fb.V 000140
882476F4 4639057F 287CF656 39FE5688 FC4688FA 5689F846 89EA5688 E84688F2 ..Fò.Vö.F%.V•.F•.V±9V-|+..9F¶v$. 000160
FC4689E6 5688E446 88F65689 F44689FE 5688FC46 88E65689 E44689F6 5688F446 F¶.V-.Fö.V|.F•.V±.F¶.V-.Fö.V|.F• 000180
FC4688EC 5EC41C57 89261A47 8926F256 18F04628 FA5688F8 4688EC5E C4FE5689 .V±á^&.F%.V•+Fb.V &.G.&.V.á^&.F• 0001A0
836A006A 0A77FF26 0C77FF26 EC5EC420 5789261E 478926F6 5618F446 28FE5688 .V±+F¶.V-&.G.&.W á^$&.w.&.w.j.j. 0001C0
0008CAC9 5F5E1F00 E8C02800 00FFFF9A 036A1E77 FF261A77 FF26F476 FFF076FF .vb.v¶&.w.&.w.j......+âS..^_èò.. 0001E0
```

Dump of file SATURN:[PCCOMMON.DUMP.DLL]DGM.TMP;1 on 18-APR-1990 10:44:12.07
File ID (620,6,0)   End of file block 186 / Allocated 188

Virtual block number 18 (00000012), 512 (0200) bytes

```
087C010A 7E830E74 C208FE56 89FC4689 0E56880C 4688D88E 100F881E 000004C8 à....|...Ä.F..V..F•.V‡.ôt..-..|. 000000
C200009A FC76FFFE 76FF0A76 FF0676FF 0876FF19 E88AD488 05750846 08064688 .F..F.u.¡å.Š..v..v..v..v‡.v•...ó 000020
5689FC46 890C5688 0A468808 8E111688 1E000004 C8000ACA C91F00E8 0AC48302 ..å.Š..èò..à....|...Ä.F..V..F•.V 000040
28078926 065EC450 478826FC 5EC411E8 8A048805 75084608 06468808 74C208FE ‡.ôt..F..F.u.¡å.Š.å^•&.GPå^.&..• 000060
FE5689FC 46891256 88104688 D88E1161 881E5657 00002CC8 0008CAC9 1F00E8C0 åŠ..èò..à,..WV.|•..Ä.F..V..F•.V‡ 000080
46880075 0E46080C 46880105 E98AD488 067E0406 7E83067C 01067E83 0C74C208 .ôt..-..|..-..-.|å.Õf..F..F.u..f 0000A0
E8468900 4205FE56 88FC4688 0128E903 7402067E 8301C0E9 C0280575 0A460808 ..F.u.+åÒå..-..t.Õ+..F•.V‡.B..FÒ 0000C0
8D0874C4 26E87688 03E3C10E 5F8826E8 5EC40083 E903750E 46080C46 88EA5689 .Võ.F..F.u.Õ..å^Õ&._.èÐ..vÒ&åt.. 0000E0
8808EC83 12340661 9A0C9E1E 8D122A06 8A9A1221 02879A0C 5E8D121C 01FE9A18 ..‡....^....!....*......•.4..$.. 000100
DC5E8D1F A5A5A5A5 DA8E1E07 16F0880C 7E8D08C4 83125307 A19A1239 03879ADC É.Ñ.9..Å.S..å..-É.Þ....ÕEEEE..^É 000120
B803E8FF FFB8057D 000E7E83 1175C208 E65689E4 46890D1D 046E9A12 5801FA9A .•.X..n....FÕ.V|.ôu..-..).|..Š.| 000140
26E85EC4 0083E903 750A4608 0846880E 56890C46 89E65688 E4468806 E8990001 ...Š..FÕ.V|.F..V..F..F.u.Õ..å^Õ& 000160
B8068A9A 12AF0287 9A085E8D 12AA01FE 9A188D08 74C426E8 768803E3 C10E5F88 ._.èÐ..vÒ&åt....‡.^..^....€....| 000180
88D47E8D 08C48312 E107A19A 12C703B7 9ADC8808 EC8312C2 06619A0C 9E1E8D12 ......•.ô..$..É.ñ.ú..Å.Ä..å..-å. 0001A0
C208DE56 890C4689 1214046E 9A12E601 FA9AD45E 8D1FA5A5 A5A5DA8E 1E0716F0 Þ....ÕEEEE..^å.•.|..n....FÉ.VÑ.ó 0001C0
C40A5689 0846890E 56880C46 8806E899 00018803 E8FFFF88 057D000A 7E831175 u..-..}.|..Š.|...Š..FÉ.VÑ.F..V.å 0001E0
```

Dump of file SATURN:[PCCOMMON.DUMP.DLL]DGM.TMP;1 on 18-APR-1990 10:44:12.07
File ID (620,6,0)   End of file block 186 / Allocated 188

Virtual block number 19 (00000013), 512 (0200) bytes

```
F088EC7E 8D002A05 C28CC388 1975C208 D65689D4 46897057 88266E47 8826FC5E ^•&.Gn&.Wp.Få.V•.ôu..û.ô.*..-$.Þ 000000
8D2A7F8D FC5EC4D4 5EFF5016 EC468D53 FE76FF1E E81FA5F2 00088 9DA 8E1E0716 ....Õ¿...É.Š..v‡S.F&.P.^åå^•..*. 000020
FC76FFFE 76FF5016 0C468D50 16084680 5016EC46 8D1FA5F2 0008891F 161EEC76 v$...¿...É..F$.P.F..P.F..P.v‡.v• 000040
9AFC76FF FE76FF0C 76FF0E76 FF0876FF 0A76FF50 16EC468D 10C48313 920F859A ......å..F$.P.v..v..v..v..v‡.v•. 000060
88084688 D88E11A0 881E0000 04C8000E CAC95F5E 1F00E8C0 2810C483 0A8602BF €.Ñ..å.+åŠ..^ èò..à....|...Ä.F.. 000080
47392606 4688FC5E C40C7C01 067E832C E88AD488 0575C208 FE5689FC 46890A56 V..F•.V‡.ôu.|Ĩ.Š,.-..|.å^•.F.&9G 0000A0
CAC91F00 E8C02806 C483114F 03E79AFC 76FFFE76 FF0676FF 15E88AE2 88057D4E Ñ).|å.Š..v..v‡.v•.Ô.O..å.+åŠ..èò 0000C0
46880075 C208FE56 89FC4689 0C56880A 4688D88E 13A8881E 56570000 60C80006 ..à'..WV.|'..Ä.F..V..F•.V‡.ôu..F 0000E0
1975C208 C65689C4 46897057 88266E47 8826FC5E C40539E9 C0280575 08460806 ..F.u.+åÕ9.å^•&.Gn&.Wp.Få.Vô.ôu. 000100
EC468D53 FE76FF1E E81FA5F2 00088 9DA 8E1E0716 F088EC7E 8D002A05 C28CC388 .û.ô.*..-$.Þ....Õ¿...É.Š..v‡S.F& 000120
004205FE 5688FC46 881FA5F2 0008891F 161EEC76 8D2A7F8D FC5EC4C4 5EFF5016 .P.^åå^•..*.v$...¿...É..F•.V‡.8. 000140
88260847 032603E0 C10E4788 26E85EC4 01FFE97A 478826FC 5EC4EA56 89E84689 .FÕ.Vòå^•&.G‡Õ..å^Õ&.G.èÅ.&.G.&. 000160
B8060A9A 8C5E8D14 AF02889A 065EC41F A5A5A5A5 DA8E1E07 16F0888C 7E8D0A57 W..-¥.Þ....ÕEEEE.å^....€..^¥...| 000180
88847E8D 08C48314 E107A19A 14C703B7 9ADC8808 EC8314C2 06619A0C 9E1E8D14 ......•.ô..$..É.ñ.ú..Å.Ä..å..-Ç. 0001A0
13260703 26E85EC4 1501046E 9A14E601 FA9A845E 8D1FA5A5 A5A5DA8E 1E0716F0 Þ....ÕEEEE..^Ç.•.|..n...å^Õ&..&. 0001C0
9A0C9E1E 8D151206 0A9A8C5E 8D150902 889A045F 8D065EC4 CA5689C8 46890257 W..Fà.Vòå^.._......^¥.......... 0001E0
```

Dump of file SATURN:[PCCOMMON.DUMP.DLL]DGM.TMP;1 on 18-APR-1990 10:44:12.07
File ID (620,6,0)   End of file block 186 / Allocated 188

Virtual block number 20 (00000014), 512 (0200) bytes

```
DA8E1E07 16F088AC 7E8D08C4 83153807 A19A1521 03879ADC 8808EC83 151C0661 •....$..É.Ñ.!..Å.;..å..-~.Þ....Õ 000000
13C80306 77882604 4F8826E8 5EC412A2 046E9A15 4001FA9A AC5E8D1F A5A5A5A5 EEEE..^~.•.ə..n.Å.å^Õ&.O.&.w..à. 000020
C40122E9 1FA5A5A5 A5DA8E1E 0716F088 DC7E8D08 56880646 88CE7689 CC4E89F2 ·.Nå.vö.F..V..-É.Þ....ÕEEEE.Õ".å 000040
1FA5A5A5 A5DA8E1E 0716F088 AC7E8D0A 57882608 47032603 E0C10E47 8826E85E ^Õ&.G.èÅ.&.G.&.W..-~.Þ....ÕEEEE. 000060
02879AA0 5E8DA046 89A25689 02571826 072826E8 5EC40257 88260788 26065EC4 å^.&..&.W.å^Õ&+.&.W..VÅ.F..^.... 000080
07A19A15 D003879A DC8808EC 8315C806 619A0C9E 1E8D15C1 06229AAC 5E8D1588 |..^~."..è......•.Ù..$..É.Ñ.Å..Å. 0000A0
19046E9A 15EF01FA 9A845E8D 1FA5A5A5 A5DA8E1E 0716F088 847E8D08 C48315EA õ..å..-Ç.Þ....ÕEEEE..^Ç •.9..n.. 0000C0
A2568906 57182604 472826E8 5EC40657 88260447 8826065E C4DE5689 0C468916 ..FÉ.V8å^.&.G.&.W.å^Õ&+C &.W..VÅ 0000E0
8808EC83 16340661 9A0C9E1E 8D162A06 229AAC5E 8D162102 879AA05E 8DA04689 .F..^....!..^~."..*......•.4..$.. 000100
A45E8D1F A5A5A5A5 DA8E1E07 16F088A4 7E8D08C4 83165307 A19A1639 03879ADC É.Ñ.9..Å.S..å..-É.Þ....ÕEEEE..^É 000120
DA8E1E07 16F088C8 7E8D0856 88064688 E25689E0 468914A7 046E9A16 5801FA9A .•.X..n.Ĩ..FÅ.V8.F..V..-à.Þ....Õ 000140
E8FDF1E9 03750002 3DFEE8E9 03750001 3D12E802 07E98AD8 881AE81F A5A5A5A5 EEEE.Š.¡Ù.Õ•.Š.=..u.ÕÕ‡=..u.Õþ»Š 000160
EC831686 06619A0C 9E1E8D16 AC06319A 0CA61E8D 16A30288 9A1A5F8D FC5EC4E6 Ìå^•._....É...Ĩ..1.¯......•.Ñ..$ 000180
8D1FA5A5 A5A5DA8E 1E0716F0 88A47E8D 08C48316 D507A19A 16880387 9ADC8808 ..É.Ñ.É..Å.|..å..-É.Þ....ÕEEEE.. 0001A0
A61E8D16 F402889A 1E5F8DFC 5EC4D256 89D04689 16E8046E 9A16DA01 FA9AA45E ^É.•.Õ..n.Š..FÅ.V•å^•._.....¶...Ĩ 0001C0
C4831726 07A19A17 0C03879A DC8808EC 83170706 619A0C9E 1E8D16FD 06319A0C ..Ĩ.»......•....$..É.Ñ...Å.&..å 0001E0
```

```
Dump of file SATURN:[PCCOMMON.DUMP.DLL]DGM.TMP;1 on 18-APR-1990 10:44:12.07
File ID (620,6,0)   End of file block 186 / Allocated 188

Virtual block number 21 (00000015), 512 (0200) bytes

D4468915 80046E9A 172B01FA 9A845E8D 1FA5A5A5 A5DA8E1E 0716F088 847E8008 ..-Ç.b....ÖEEEE..^Ç.*.+..n.¯..Fâ 000000
56390A75 CC463906 56880446 881575CA 56391A75 C8463902 56880046 88065689 .V@.FÅ.V@9Fàu.9Vòu..Fâ.V@9Fäu.9V 000020
F65688F4 46883872 0C463905 7F427C0E 5639EE56 88EC4688 01FCE9C0 280575CE öu.+âÕ=..F$.VŸ9VA|B..9FÉr;.F¶.V- 000040
46881772 E0463905 7F1E7CE2 5639F256 88F04688 2977DC46 39057C30 7FDE5639 9VA.0|.9FÉw).Fb.V·9Vä|...9FÁr..F 000060
46880150 E90374C0 08C02802 E80001B8 0577E046 39057C0C 7FE25639 FA5688F8 %.V*9Vä..|.9FÁw.|..Š.+â.ôt.ÕP..F 000080
46881EE8 DE56890C 4689EE56 88EC4688 0E73DC46 39057C15 7FDE5639 EE5688EC $.VŸ9VA..|.9FÉs..F$.VŸ.FÉ.VAŠ..F 0000A0
88F04688 DE56890C 4689F656 88F44688 0C760C46 39057F13 7CDE5639 F65688F4 ¶.V-9VA|...9FÉv..F¶.V-.FÉ.VA.Fb. 0000C0
88F84688 1EE8E256 89E04689 F25688F0 46880E73 E0463905 7C157FE2 5639F256 V·9Vä..|.9FÂs..Fb.V·.FÂ.VäŠ..F%. 0000E0
478826E8 5EC4E256 89E04689 FA5688F8 46880C76 E0463905 7F137CE2 5639FA56 V*9Vä|...9FÁv..F%.V*.FÁ.Vää^Õ&.G 000100
879ADC5E 8D1FA5A5 A5A5DA8E 1E0716F0 88A47E8D 0A578826 08470326 03E0C10E .@Å.&.G.&.W..-É.b....ÖEEEE..^É.. 000120
A19A1871 03B79ADC 8808EC83 186C0661 9A0C9E1E 8D186206 0A9AA45E 8D185902 .Y..^É...b......@.l..Š..É.ñ.q..Å 000140
046E9A18 9001FA9A 845E8D1F A5A5A5A5 DA8E1E07 16F08884 7E8D08C4 83188807 ....á..-Ç.b....ÖEEEE..^Ç.*....n. 000160
060A9AA4 5E8D1880 02879AE0 5E8DCA56 89C84689 02571326 070326E8 5EC418A8 '.á^Õ&..&.W..Fà.Vò.^Å.....^É... 000180
8C7E8008 C48318E2 07A19A18 C803879A DC8808EC 8318C306 619A0C9E 1E8D1889 ¿......@.ü..Š..É.ñ.à..Å.ã..á..-¥ 0001A0
044F8826 E85EC416 9A046E9A 18E701FA 9A8C5E8D 1FA5A5A5 A5DA8E1E 0716F088 .b....ÖEEEE..^¥.*.Ó..n...á^Õ&.O. 0001C0
E65689E4 46890256 18004628 CA5688C8 4688CE76 89CC4E89 F213C803 06778826 &.w..à.·.Nä.vö.Fà.Vò+FÅ.V@.FÕ.VÌ 0001E0

Dump of file SATURN:[PCCOMMON.DUMP.DLL]DGM.TMP;1 on 18-APR-1990 10:44:12.07
File ID (620,6,0)   End of file block 186 / Allocated 188

Virtual block number 22 (00000016), 512 (0200) bytes

F7000283 08F70846 885016EC 46800A56 89084689 D65618D4 4628CE56 88CC4688 .Fä.Vö+Fâ.V@.FÅ.VÖ.F$.P.FÄ%Å.@.% 000000
10C48313 73028F9A FC76FFFE 76FF5052 DAF70002 8308F7E6 5688E446 885052DA ÕRP.FÕ.VI%Å.@.%ÕRP.V±.V=.€.s..á. 000020
FC46890E 56880C46 88088E13 FA881E56 57000046 C80008CA C95F5E1F 00E8C02B +âŠ..^_èò..àF..WV.|*..Å.F..V..F= 000040
80E98A04 88067E04 067E8306 7C01067E 830C740A 46080846 881474C2 08FE5689 .V±.ôt¯..F..F.t..-..|..-. -.|â.Õ§ 000060
EC5639F4 5688F246 881FA5F2 000889DA 8E1E0716 F088EA7E 800A5688 08468802 ..F..V..-õ.b....Ö¿...É..F .V¶9V$ 000080
5689EA46 89F45688 F24688E8 5689E646 89EC5688 EA468824 76EA4639 057F287C |+..9FÕv$.FÕ.V$.F|.VÒ.F .V¶.FÕ.V 0000A0
882476EE 4639057F 287CF056 39F85688 F64688F4 5689F246 89E85688 E64688EC $.F|.VÒ.F .V¶.F-.V%9Vb|+..9FŸv$. 0000C0
F64689E4 5688E246 88F05689 EE4689F8 5688F646 88E45689 E24689F0 5688EE46 FŸ.Vb.Fâ.VÕ.F-.V%.FŸ.Vb.Fâ.VÕ.F- 0000E0
88260E5E C4E05689 0E468900 4205FE56 88FC4688 010FE903 7401067E 83F85689 .V%.-..t.ÕÕ..F=.V±.@..Fß.VÁá^A&. 000100
88EA4688 1FA5A5A5 A5DA8E1E 0716F088 D67E8D0A 57882608 47032603 E0C10E47 G.éÅ.&.G.&.W..-@.b....ÖEEEE..FÕ. 000120
06229A06 5E8D1A70 02879AC2 5E8DC246 89C45689 02571826 072826E0 468EEC56 V$.FÅ&+.&.W..Vá.FÕ.^Õ...p..^@.". 000140
CE7E8008 C4831AA2 07A19A1A 8803879A DC8808EC 831A8306 619A0C9E 1E8D1A79 Y......@....Š..É.ñ....Å.Å..á..-ö 000160
88EC5689 EA46891A CC046E9A 1AA701FA 9ACE5E8D 1FA5A5A5 A5DA8E1E 0716F088 .b....ÖEEEE..^ö.*.|..n.ä..FÕ.V$. 000180
5E8D1A04 02879AC2 5E8DC246 89C45689 06571826 04472826 DE5EC4F0 5688EE46 FŸ.Vbá^A&+G.&.W..Vá.FÕ.^Õ...á..^ 0001A0
C4831806 07A19A1A EC03879A DC8808EC 831AE706 619A0C9E 1E8D1AD0 06229AD6 @.".T......@.Ó..Š..É.ñ.Š..Å....á 0001C0
EE468918 51046E9A 180801FA 9AC65E8D 1FA5A5A5 A5DA8E1E 0716F088 C67E8D08 ..-ó.b....ÖEEEE..^ó.*....n.Q..FŸ 0001E0

Dump of file SATURN:[PCCOMMON.DUMP.DLL]DGM.TMP;1 on 18-APR-1990 10:44:12.07
File ID (620,6,0)   End of file block 186 / Allocated 188

Virtual block number 23 (00000017), 512 (0200) bytes

A5DA8E1E 0716F088 C67E8D0A 57882608 47032603 E0C10E47 88260E5E C4F05689 .Vbá^A&.G.éÅ.&.G.&.W..-ó.b....ÖE 000000
02879AC2 5E8DC246 89C45689 02571826 072826E0 468EF456 88F24688 1FA5A5A5 EEE..F·.V¶.FÅ&+.&.W..Vá.Fõ.^ó... 000020
07A19A18 7003879A DC8808EC 8318B806 619A0C9E 1E8D1861 06229AC6 5E8D1858 X..^ó.".@......@.k..Š..É.ñ.p..Å. 000040
84046E9A 188F01FA 9ACE5E8D 1FA5A5A5 A5DA8E1E 0716F088 CE7E8D08 C48318BA ...á..-õ.b....ÖEEEE..^õ.*....n.Ç 000060
5E8DC246 89C45689 06571826 04472826 DE5EC4F8 5688F646 88F45689 F246891B ..F·.V¶.F-.V%á^A&+G.&.W..Vá.Fõ.^ 000080
D403879A DC8808EC 8318CF06 619A0C9E 1E8D18C5 06229AC6 5E8D18BC 02879AC2 ó...¥..^ó.".é......@.Ü..Š..É.ñ.â 0000A0
18F301FA 9A8A5E8D 1FA5A5A5 A5DA8E1E 0716F088 8A7E8D08 C48318EE 07A19A18 ..Å.¥..á..-α.b....ÖEEEE..^α.*.µ. 0000C0
0000C08F 83260074 00C88708 2600C687 8826FC5E C4F85689 F646891A 68046E9A .n.h..F-.V%á^=&..ó.&..à.t.& *á.. 0000E0
77FF261C 77FF261E 77FF2620 77FF2650 006A006A FA4689C0 2802E800 01880575 u.|..Š.+á.F*j.j.P&.w &.w.&.w `.w 000100
5E1F00E8 C028E743 E80E0C76 FF0E76FF 16C483FF FF00EF9A 53065016 EA468D1A ..Fõ.P.S.ÿ....á..v..v..ÕCÕ+âŠ..` 000120
75C208FE 5689FC46 89085688 06468808 8E196388 1E565700 001AC800 0ACAC95F _èò..â...WV.|c..Å.F..V..F=.V±.óu 000140
C28CC388 1975C208 E85689E6 46897057 88266E47 8826FC5E C4009FE9 8A048806 -|â.Õ..á^=&.Gnâ.Wp.F|.VÕ.óu..û.ó 000160
5EFF5016 EC468053 FE76FF1E E81FA5F2 000889DA 8E1E0716 F088EC7E 80002A05 .*..-ã.b....Õ¿...É.Š..v±S.F$.P.^ 000180
00C88708 2600C687 8826FC5E C41FA5F2 0008891F 161EEC76 802A7F8D FC5EC4E6 |á^=..*.vã...¿...É.á^=&..ó.&..à. 0001A0
77FF2620 77FF2650 006A006A EA4689C0 2802E800 01880575 0000C08F 83260074 t.&.eâ..u.|..Š.+á.FÕj.j.P&.w &.w 0001C0
E80E0676 FF0876FF 16C4831C 3800EF9A 53065016 EC468D1A 77FF261C 77FF261E .&.w.&.w..F$.P.S.ÿ.;..á..v..v..Ò 0001E0
```

Dump of file SATURN:[PCCOMMON.DUMP.DLL]DGM.TMP;1 on 18-APR-1990 10:44:12.07
File ID (620,6,0)   End of file block 186 / Allocated 188

Virtual block number 24 (00000018), 512 (0200) bytes

```
890A568B 0846880B 8E1C508B 1E565700 001AC800 04CAC95F 5E1F00EB C02BE67B (!+âŠ..^_èò..à...WV.¡)..Ä.F..V.. 000000
E85689E6 46897057 8B266E47 8B26FC5E C400A5E9 8AD4B806 75C20BFE 5689FC46 F•.V±.ôu.¡Å.ÕE.á^•&.Gn&.Wp.Fl.Vò 000020
FE76FF1E EB1FA5F2 0008B9DA 8E1E0716 F08BEC7E 8D002A05 C28CC38B 1975C20B .ôu..ù.ö.*..-š.Þ....Õ¿...E.Š..v± 000040
8B26FC5E C41FA5F2 0008B91F 161EEC76 8D2A7F8D FC5EC4E6 5EFF5016 EC468D53 S.Fš.P.^Ì&^•..*.vš...¿...E.á^•&. 000060
006A006A EA4689C0 2B02E800 01B80575 0000C08F 83260074 00C8870B 2600C687 .ó.&..à.t.&.eà..u.¡..Š.+à.Fõj.j. 000080
16C4831D 0300EF9A 53065016 EC468D1A 77FF261C 77FF261E 77FF2620 77FF2650 P&.w &.w.&.w.&.w..Fš.P.S.ÿ....á. 0000A0
5700001A C80006CA C95F5E1F 00EBC02B E5ADE80E 0876FF0A 76FF0A74 00067E83 .-..t..v..v..ÒUl+âŠ..^_èò..à...W 0000C0
B8057508 46080646 8B0874C2 08FE5689 FC46890C 568B0A46 8BD8BE1D 25B81E56 V.¡%..Ä.F..V..F•.V±.ôt..F..F.u.¡ 0000E0
002A05C2 8CC38B19 75C20BE8 5689E646 8970578B 266E478B 26FC5EC4 7BEBBAD4 Å.S(á^•&.Gn&.Wp.Fl.VÒ.ôu..ù.ö.*. 000100
5EC4E65E FF5016EC 468D53FE 76FF1EEB 1FA5F200 0889DA8E 1E0716F0 8BEC7E8D .-&.Þ....Õ¿...E.Š..v±S.Fš.P.^Ì&^ 000120
262077FF 26FC5EC4 006A0676 FF0876FF 1FA5F200 08891F16 1EEC768D 2A7F8DFC •..*.vš...¿...E..v..v.j.á^•&.w & 000140
1F00EBEA 468916C4 8310C800 EF9A5306 5016EC46 8D1A77FF 261C77FF 261E77FF .w.&.w.&.w..Fš.P.S.ÿ.ù..á..FõŠ.. 000160
05750846 08064688 08740C46 080A4688 D88E1DF3 B81E0000 00C80008 CAC95F5E ^_èò..à....¡µ..Ä.F..F.t..F..F.u. 000180
C80008CA C91F00EB C0286457 89266247 89260856 88064688 0A5EC415 EB8AD48B ¡Ȁ.Š.á^..F..V.&.Gb&.Wd+âŠ..èò..à 0001A0
5EC415EB 8AD48805 75084608 0646880B 740C4608 0A46880B 8E1E9C8B 1E000000 ....¡...Ä.F..F.t..F..F.u.¡å.Š.á^ 0001C0
1E05B81E 000000C8 0008CAC9 1F00EBC0 2B685789 26664789 2608568B 0646880A ..F..V.&.Gf&.Wh+âŠ..èò. à....¡f. 0001E0
```

Dump of file SATURN:[PCCOMMON.DUMP.DLL]DGM.TMP;1 on 18-APR-1990 10:44:12.07
File ID (620,6,0)   End of file block 186 / Allocated 188

Virtual block number 25 (00000019), 512 (0200) bytes

```
0856B806 46880A5E C415EB8A D4B80575 0846080 6 4688087 4 0C46080A 4688D88E .Ä.F..F.t..F..F.u.¡å.Š.á^..F..V. 000000
46080A46 8BD88E1F 0EB81E00 0000C800 08CAC91F 00EBC02B 6C578926 6A478926 &.Gj&.Wl+âŠ..èò..à....¡...Ä.F..F 000020
5789266E 47892608 5688064 6 880A5EC4 15EB8AD4 B8057508 46080646 8B08740C .t..F..F.u.¡å.Š.á^..F..V.&.Gn&.W 000040
0806468B 08740C46 080A468B D88E1F47 B81E0000 00C80008 CAC91F00 EBC02B70 p+âŠ..èò..à....¡G..Ä.F..F.t..F.. 000060
C02B0257 89260789 26065EC4 7057B826 6E478B26 0A5EC419 EB8AD48B 05750846 F.u.¡å.Š.á^.&.Gn&.Wpá^.&..&.W.+â 000080
5EC418EB 8AD48805 750C4608 0A468BD8 8E1F8088 1E000000 C80008CA C91F00EB Š..èò..à....¡...Ä.F..F.u.¡å.Š.á^ 0000A0
1E000000 C80008CA C91F00EB C02B0257 89260789 26065EC4 0257B826 078B260A .&..&.W.á^.&..&.W.+âŠ..èò..à.... 0000C0
89260789 2608568B 0646880A 5EC414EB 8AD48805 750C4608 0A4688D8 8E1F8088 ¡$..Ä.F..F.u.¡å.Š.á^..F..V.&..&. 0000E0
0646880B 740C4608 0A4688D8 8E1FF1B8 1E000000 C80008CA C91F00EB C02B0257 W.+âŠ..èò..à....¡b..Ä.F..F.t..F. 000100
0008CAC9 1F00EBC0 2B078926 065EC478 478B260A 5EC411EB 8AD48805 75084608 .F.u.¡å.Š.á^.&.Gxá^.&..+âŠ..èò.. 000120
C411EB8A D4B80575 08460806 4688087 4 0C46080A 4688D88E 2021B81E 000000C8 à....¡! .Ä.F..F.t..F..F.u.¡å.Š.á 000140
8BD88E20 56881E00 0008C800 08CAC91F 00EBC02B 07892606 5EC47A47 8B260A5E ^.&.Gzá^.&..+âŠ..èò..à....¡V .Ä. 000160
69EB8AD4 B8057E03 067E8306 7C01067E 830C74C2 08FE5689 FC46890A 568B0846 F..V..F•.V±.ôt..-..|..-..-.¡å.Š1 000180
8999FFFD B804EB99 C02B0575 03067E83 59EBC02B 04757B47 39260646 8BFC5EC4 á^•.F.&9Gxu.+âŠY.-..u.+å.Š.¡»... 0001A0
FF261477 FF26FC5E C4000000 F39A5052 1277FF26 1477FF26 FC5EC4FA 5689F846 F%.V°á^•&.w.&.w.RP.µ...á^•&.w.&. 0001C0
468BFC5E C40000FF FF9A0076 B7FF2600 78B7FF26 0CAE068E 02E3C106 5E8B1277 w..^.èÐ...Ü.&.ñx.&.ñv......á^•.F 0001E0
```

Dump of file SATURN:[PCCOMMON.DUMP.DLL]DGM.TMP;1 on 18-APR-1990 10:44:12.07
File ID (620,6,0)   End of file block 186 / Allocated 188

Virtual block number 26 (0000001A), 512 (0200) bytes

```
46890A56 8B08468B D88E2068 B81E0000 04C80006 CAC91F00 EBC02B78 47892606 .&.Gx+âŠ..èò..à....¡. .Ä.F..V..F 000000
2606468B FC5EC418 EB8AD48B 057E0406 7E83067C 01067E83 0C74C20B FE5689FC •.V±.ôt..-..|..-..-.¡å.Š.á^•.F.& 000020
24B81E00 0004C800 06CAC91F 00EBC02B 7A478926 0646880B EBC02B04 757A4739 9Gzu.+âŠ..F.&.Gz+âŠ..èò..à....¡$ 000040
831C7F04 107E8322 7C01107E 832874C2 08FE5689 FC468914 56881246 8BD88E21 !.Ä.F..V..F•.V±.ôt(.-..|".-..... 000060
29EB8AD4 B8057508 46080646 8B08740C 46080A46 8B107F04 0E7E8316 7C010E7E -..|..-.....F..F.t..F..F.u.¡å.Š) 000080
08309A50 52004205 FE568BFC 46881076 FF0E76FF 0A76FF0C 76FF0676 FF0876FF .v..v..v..v..v..v..F•.V±.B.RP.0. 0000A0
28741646 08144688 D88E216F B81E0000 00C80010 CAC91F00 EBC02B10 C4831E85 ...á.+âŠ..èò..à....¡o!.Ä.F..F.t( 0000C0
08740C46 080A468B 107F040E 7E83167C 010E7E83 1C7F0410 7E83227C 01107E83 .-..|".-.....-..|..-.....F..F.t. 0000E0
FF1076FF 0E76FF0A 76FF0C76 FF0676FF 0876FF2C EB8AD48B 05750846 08064688 .F..F.u.¡å.Š,.v..v..v..v..v..v.. 000100
00C80012 CAC91F00 EBC02B12 C48321D0 0A909A50 52004205 16568B14 46881276 v..F..V..B.RP...Ä!.á.+âŠ..èò..à. 000120
01167E83 2C7F0418 7E83327C 01187E83 38741C46 081A468B D88E21E4 B81E0000 ...¡8!.Ä.F..F.t8.-..|2.-.....-.. 000140
08741046 080E468B 10740C46 080A4688 18741446 0812468B 207F0416 7E83267C |&.-... .F..F.t..F..F.t..F..F.t. 000160
FF1276FF 1476FF16 76FF1876 FF1A76FF 1C76FF3C EB8AD48B 05750846 08064688 .F..F.u.¡å.Š<.v..v..v..v..v..v.. 000180
76FF0876 FF0E76FF 1076FF16 76FF1876 FF1A76FF 1C76FFFE B0E80E0A 76FF0C76 v..v..Ò¯±.v..v..v..v..v..v..v..v 0001A0
14568B12 4688D88E 2254B81E 56570000 10C80018 CAC91F00 EBC02BFE 94E80E06 ..Ò.±+âŠ..èò..à...WV.¡T".Ä.F..V. 0001C0
040E7E83 0E7C010E 7E83147F 04107E83 1A7C0110 7E832074 C20BFE56 89FC4689 .F•.V±.ôt .-..|..-.....-..|..-.. 0001E0
```

Dump of file SATURN:[PCCOMMON.DUMP.DLL]DGM.TMP;1 on 18-APR-1990 10:44:12.07
File ID (620,6,0) End of file block 186 / Allocated 188

Virtual block number 27 (0000001B), 512 (0200) bytes

```
FC468800 FAE9C02B 05751046 390E4688 0107E98A D4880675 08460806 4688087F ...F..F.u.¡å.Ö...F.9F.u.+åÖ•..F= 000000
C10E5F88 26F85EC4 6775010E 7E836075 02107E83 FA5689F8 46890042 05FE5688 .V±.B..F¾.V•.-..um.-..ugá^¾&._.è 000020
0C9E1E80 2373068A 9A236A02 879A0A5E 8D236501 FE9A1880 0874C426 F08803E3 D..Þ&át....±.e#.^....j#...s#.... 000040
8E1E0716 F088F07E 8D08C483 239C07A1 9A238203 879ADC88 08EC8323 7D06619A .a.)#.$..É.ñ..#.À..#.á..-Þ.Þ.... 000060
8374E802 57892607 8926065E C423C104 6E9A23A1 01FA9AF0 5E8D1FA5 A5A5A5DA ÖEEEE..^Þ.•.À#.n.é#á^.&..&.W.$t. 000080
F8768803 E3C10E5F 8826F85E C4230902 879A0A5E 8D637502 0E7E8369 7501107E ~..uí.-..uc.^....1#á^¾&. .èD..v¾ 0000A0
A19A23F1 03879ADC 8808EC83 23EC0661 9A0C9E1E 8D23E206 2A9A1880 0874C426 &át....•.ã#.....a.$#.&..É.ñ.þ#.À 0000C0
046E9A24 1001FA9A F05E8D1F A5A5A5A5 DA8E1E07 16F088F0 7E8D08C4 83240807 ..$.á..-Þ.Þ....ÖEEEE..^Þ.•..$.n. 0000E0
00C80010 CAC95F5E 1F00EBC0 2804EB8A DA8805EB 02578926 07892606 5EC41850 P.á^.&..&.W.$.¡Ö.$.+å$..^ èò..à. 000100
0C76FF18 E88AD488 05750846 08064688 08740C46 080A4688 D88E22E6 881E0000 ...¡|"•.Ä.F..F.t..F..F.u.¡Ä.$..v. 000120
0000C800 08CAC91F 00EBC028 02578926 07892606 5EC40000 FFFF9A00 6A0A76FF .v.|......á^.&..&.W.+å$..èò..à.. 000140
260A5EC4 19E88AD4 88057508 46080646 8808740C 46080A46 88D88E24 34881E00 ..¡4$.Ä.F..F.t..F..F.u.¡å.$.á^.& 000160
881E0000 00C80008 CAC91F00 EBC02802 57892607 8926065E C4405788 263E4788 .G>&.Wøá^.&..&.W.+å$..èò..à....| 000180
0A478826 0A5EC419 E88AD488 05750846 08064688 08740C46 080A4688 D88E2473 s$.Ä.F..F.t..F..F.u.¡å.$.á^.&.G. 0001A0
8E248088 1E000000 C80008CA C91F00EB C0280257 89260789 26065EC4 0C578826 &.W.á^.&..&.W.+å$..èò..à....|¯$. 0001C0
065EC404 4788260A 5EC411EB 8AD48805 75084608 06468808 740C4608 0A468808 Ä.F..F.t..F..F.u.¡å.$.á^.&.G.á^. 0001E0
```

Dump of file SATURN:[PCCOMMON.DUMP.DLL]DGM.TMP;1 on 18-APR-1990 10:44:12.07
File ID (620,6,0) End of file block 186 / Allocated 188

Virtual block number 28 (0000001C), 512 (0200) bytes

```
46880874 0C46080A 4688D88E 24ED881E 000000C8 0008CAC9 1F00EBC0 28078926 &..+å$..èò..à....¡Ü$.Ä.F..F.t..F 000000
02578926 07892606 5EC43C57 88263A47 88260A5E C419EB8A D4880575 08460806 ..F.u.¡å.$.á^.&.G:&.W<á^.&..&.W. 000020
46080646 8808740C 46080A46 88D88E25 22881E00 0000C800 08CAC91F 00EBC028 +å$..èò..à....¡"X.Ä.F..F.t..F..F 000040
CAC91F00 EBC0283C 5789263A 47892608 56880646 880A5EC4 15EB8AD4 88057508 .u.¡å.$.á^..F..V.&.G:&.W<+å$..èò 000060
EB8AD488 05750846 08064688 08740C46 080A4688 D88E255F 881E0000 00C80008 ..à....:¡ X.Ä.F..F.t..F..F.u.¡å.$ 000080
C80008CA C91F00EB C0280257 89260789 26065EC4 14578826 12478826 0A5EC419 .á^.&.G.Ë.W.á^.&..&.W.+å$..èò..à 0000A0
75084608 06468808 74C208FE 5689FC46 890C5688 0A468808 8E259888 1E000004 ....|.X.Ä.F..V..F=.V±.ôt..F..F.u 0000C0
EBC02802 57892607 8926065E C4000C97 8826000A 878826FC 5EC418EB 8AD48805 .¡å.$.á^=&..Ö.&..É.á^.&..&.W.+å$ 0000E0
05750846 08064688 08740C46 080A4688 D88E2505 881E0000 00C80008 CAC91F00 ..èò..à....¡¡X.Ä.F..F.t..F..F.u. 000100
C91F00EB C0280257 89260789 26065EC4 18578826 16478826 0A5EC419 EB8A.. 8 ¡å.$.á^.&.G.&.W.á^.&..&.W.+å$..è 000120
8AD48805 75084608 06468808 740C4608 0A468808 8E261C88 1E000000 C80008.. ò..à....¡.&.Ä.F..F.t..F..F.u.¡å. 000140
0008CAC9 1F00EBC0 28025789 26078926 065EC408 57882606 4788260A 5EC419EL $.á^.&.G.&.W.á^.&..&.W.+å$..èò.. 000160
87892606 4688085E C40FEB8A D4880575 0A460808 4688D88E 2659881E 000000C8 à....¡Y&.Ä.F..F.u.¡å.$.á^..F.&.. 000180
8AD48805 750A4608 084688D8 8E269688 1E000000 C80006CA C91F00EB C0280080 ¯.+å$..èò..à....|.&.Ä.F..F.u.¡å. 0001A0
26C1881E 56570000 00C80006 CAC91F00 EBC02800 82878926 06468808 5EC40FEB $.á^..F.&..ÿ.+å$..èò..à...WV.¡ê& 0001C0
08568806 46880A5E C41BEB8A D4880575 08460806 46880874 0C46080A 4688D88E .Ä.F..F.t..F..F.u.¡å.$.á^..F..V. 0001E0
```

Dump of file SATURN:[PCCOMMON.DUMP.DLL]DGM.TMP;1 on 18-APR-1990 10:44:12.07
File ID (620,6,0) End of file block 186 / Allocated 188

Virtual block number 29 (0000001D), 512 (0200) bytes

```
EE881E00 0000C800 08CAC95F 5E1F00EB C02B1FA5 A5A5A50A 8E1EF088 00848F8D .«Ç..Þ..ÖEEEE.+å$..^_èò..à....¡Ÿ 000000
1F00EBC0 2800BC87 89260646 88085EC4 0FE88AD4 8805750A 46080846 88D88E26 &.Ä.F..F.u.¡å.$.á^..F.&..V.+å$.. 000020
D4880575 08460806 46880874 0C46080A 4688D88E 272F881E 000000C8 0006CAC9 èò..à....¡/'.Ä.F..F.t..F..F.u.¡å 000040
881E0000 00C80008 CAC91F00 EBC02807 8926065E C4008087 88260A5E C412EB8A .$.á^.&.. .á^.&..+å$..èò..à....| 000060
82878826 0A5EC412 E88AD488 05750846 08064688 08740C46 080A4688 D88E275A Z'.Ä.F..F.t..F..F.u.¡å.$.á^.&..ÿ 000080
080A4688 D88E2790 881E5657 000000C8 0008CAC9 1F00E8C0 28078926 065EC400 .á^.&..+å$..èò..à...WV.|.'.Ä.F.. 0000A0
88F88800 84050C56 880A4688 065EC41C E88AD488 05750846 08064688 08740C46 F.t..F..F.u.¡å.$.á^..F..V..Ç..«. 0000C0
4688D88E 27C8881E 000000C8 0008CAC9 5F5E1F00 EBC02B1F A5A5A5A5 DA8E1EF0 Þ..ÖEEEE.+å$..^_èò..à....¡á'.Ä.F 0000E0
8926065E C4008C87 88260A5E C412EB8A D4880575 08460806 46880874 0C46080A ..F.t..F..F.u.¡Ä.$.á^.&..V.á^.&. 000100
89FC4689 0C56880A 4688D88E 280A881E 56570000 04C80008 CAC91F00 EBC02807 .+å$..èò..à...WV.|.(.Ä.F..V..F=. 000120
88527F8D 08568806 4688FC5E C41AEB8A D4880575 08460806 46880874 C208FE56 V±.ôt..F..F.u.¡å.$.á^=.F..V...R. 000140
D88E2842 881E5657 000004C8 0008CAC9 5F5E1F00 EBC02B1F A5A5A5A5 DA8E1EF0 Þ..ÖEEEE.+å$..^_èò..à...WV.¡B(.Ä 000160
065EC41C E88AD488 05750846 08064688 0874C208 FE5689FC 46890C56 880A4688 .F..V..F=.V±.ôt¯..F..F.u.¡å.$.á^. 000180
0008CAC9 5F5E1F00 EBC02B1F A5A5A5A5 DA8E1EF0 88F88800 5205FE56 88FC4688 .F=.V±.R..«.Þ..ÖEEEE.+å$..^_èò.. 0001A0
08064688 0874C208 FE5689FC 46890C56 880A4688 D88E288C 881E5657 000004C8 à...WV.|.(.Ä.F..V..F=.V±.ôt¯..F.. 0001C0
2B1FA5A5 A5A5DA8E 1EF0885A 7F8D0856 88064688 FC5EC41A E88AD488 05750846 F.u.¡å.$.á^=.F..V...Z.Þ..ÖEEEE.+ 0001E0
```

Dump of file SATURN:[PCCOMMON.DUMP.DLL]DGM.TMP;1 on 18-APR-1990 10:44:12.07
File ID (620,6,0)   End of file block 186 / Allocated 188

Virtual block number 30 (0000001E), 512 (0200) bytes

```
89FC4689 0C56880A 4688088E 2808881E 56570000 04C80008 CAC95F5E 1F00EBC0 åS..^_èò..à...WV.¡Ä(.Ä.F..V..F•. 000000
88005A05 FE5688FC 4688065E C41CE88A 04880575 08460806 46880874 C208FE56 Vz.ôt¯..F..F.u.¡å.S.é^..F•.Vz.Z.. 000020
05007000 02210701 03002208 CAC95F5E 1F00EBC0 281FA5A5 A5A5DA8E 1EF088F8 «.Þ..ÖÉÉÉÉ.•äS..^_èò."....I..p.. 000040
03000800 01110101 03000000 04015700 02006700 05035902 03030800 04015A00 .Z.......Y...g...Ÿ.............. 000060
03000A00 0202F101 03000000 06224000 02000000 05021400 02000A00 01012401 .$...............a"......þ...... 000080
03000000 0813E400 02050000 09009702 05000000 070E2000 02001300 01000601 .ø....... ................ô...... 0000A0
03001E00 01026001 03000000 09194800 02050000 09009002 02001000 02084901 .I...............K.......m...... 0000C0
03000000 00235000 02000000 0C0A5700 02002500 01015001 03001F00 01245601 .V$......]...%...W........]#..... 0000E0
0304F500 09028802 03001A00 04003302 03000000 0E292200 02002F00 01080F01 ...../..."}......3...........%.. 000100
03004500 0402DE02 0304A200 08037E02 03003700 04004F02 03002800 0402E602 .Ì...(...O...7...-...Å...æ...E.. 000120
03006000 0200DE01 03006C00 0220E301 03008C00 0602AC02 03060800 0C025702 .W.......¯...¥...D ..l...æ...m.. 000140
88064688 D88EFFFF 881E5657 00004AC8 00000000 00000000 00005600 05034902 .I...V...........àJ..WV.¡...Ä.F.. 000160
1E7F0C0E 7E83247C 000E7E83 2A740C46 080A4688 3274C208 FE5689FC 46890856 V..F•.Vz.ôt2.F..F.t*.-..|$.-.... 000180
D488067D 00187E83 067C0014 7E830C7C 01107E83 067E0C0E 7E83067C 0A0E7E83 .-..|..-..-..-..|..-..|..-..).¡å 0001A0
F65688F4 46881FA5 F2000889 DA8E1E07 16F088EC 7E800C56 880A4688 05C7E98A .Öü..F..V..-å.Þ....Ö¿...É..F¶.V- 0001C0
4689F656 88F44688 E.56890E 4689EE56 88EC4688 2476EC46 39057F28 7CEE5639 9VŸ|+..9Få.v$.Få.VŸ.Få.VÅ.F¶.V-.F 0001E0
```

Dump of file SATURN:[PCCOMMON.DUMP.DLL]DGM.TMP;1 on 18-APR-1990 10:44:12.07
File ID (620,6,0)   End of file block 186 / Allocated 188

Virtual block number 31 (0000001F), 512 (0200) bytes

```
F0463905 7F2B7CF2 5639FA56 88F84688 F65689F4 4689E056 880E4688 EE5689EC å.VŸ.Få.VÅ.F¶.V-.F%.V•9V·|+..9FÞ 000000
DC56880A 4688F256 89F04689 FA5688F8 46880C56 89DA4689 F25688F0 46882476 v$.FÞ.V·.FÖ.VÉ.F%.V•.FÞ.V·.FÖ.VÉ 000020
D8568906 46890042 05C28CC3 880300E9 0374027A 7F8326FC 5EC4FA56 89F84689 .F%.V•é^•å..z.t.Õ...û.ô.B..F•.VÄ 000040
A5A5A5A5 DA8E1E07 16F088CE 7E800A57 88260847 032603E0 C10E4788 26D65EC4 é^øå.G.éÅ.å.G.å.W..-ö.Þ....ÖÉÉÉ 000060
9ADC8808 EC830132 06619A0C 801E8D01 28060A9A CE5E8D01 1F02889A 0A5EC41F .é^.......^ö...(...¯..ø.2..å..É. 000080
FA9AC65E 801FA5A5 A5A5DA8E 1E0716F0 88C67E8D 08C48301 5107A19A 013703B7 Ñ.7..Å.Q..é..-ô.Þ....ÖÉÉÉ..^ô.• 0000A0
889A045F 800A5EC4 EE5689EC 46890257 13260703 26D65EC4 0171046E 9A015601 .V..n.q.é^øå..å.W..Få.VŸé^.._... 0000C0
A19A0191 03879ADC 8808EC83 018C0661 9A0C801E 80018206 0A9ACE5E 80017902 .y..^ö.......¯..ø....å..É.Ñ.¯...À 0000E0
046E9A01 8001FA9A 8E5E8D1F A5A5A5A5 DA8E1E07 16F0888E 7E8D08C4 8301A807 .¨..é..-ƒ.Þ....ÖÉÉÉ..^ƒ.•.¯..n. 000100
032603E0 C10E4788 26F27689 F04E89F2 13C80306 77882604 4F882606 5EC4FFFF ..é^øå.O.å.w..à.·.NÞ.v·å.G.éÅ.å. 000120
01F60288 9A085F8D 0A5EC41F A5A5A5A5 DA8E1E07 16F0888E 7E800A57 88260847 G.å.W..-ƒ.Þ....ÖÉÉÉ.é^.._....-. 000140
022807A1 9A020E03 879ADC88 08EC8302 0906619A 0C801E80 01FF060A 9A8E5E8D .^ƒ.......¯..ø....å..É.Ñ.¯..À.(. 000160
C4024804 6E9A022D 01FA9AC6 5E8D1FA5 A5A5A50A 8E1E0716 F088C67E 800BC483 .é..-ô.Þ....ÖÉÉÉ..^ô.•.-..n.N.é 000180
060A9A8E 5E800250 02889A0C 5F800A5E C4F65689 F4468902 57132607 0326065E ^øå.._å.W..F¶.V-é^.._....P..^ƒ... 0001A0
867E8D08 C4830282 07A19A02 6803879A 0C8808EC 83026306 619A0C80 1E800259 Y...¯..ø.c..$..É.Ñ.Ñ..À....é..-Ñ 0001C0
044F8826 D65EC401 17046E9A 028701FA 9A865E8D 1FA5A5A5 A5DA8E1E 0716F088 .Þ....ÖÉÉÉ..^Ñ.•....n...é^øå.O. 0001E0
```

Dump of file SATURN:[PCCOMMON.DUMP.DLL]DGM.TMP;1 on 18-APR-1990 10:44:12.07
File ID (620,6,0)   End of file block 186 / Allocated 188

Virtual block number 32 (00000020), 512 (0200) bytes

```
0E5F8826 5F740012 7E83067F 677C0014 7E83FA76 89F84E89 F213C803 06778826 å.w..à.·.N%.v•.-..|g...-..t_å._. 000000
1E8D0205 068A9A02 CC02879A 125E8D02 C701FE9A 18800874 C4260676 8803F3C1 èD..vøåát.....ú..¯....ë....(... 000020
0716F088 867E8D08 C48302FE 07A19A02 E403879A 0C8808EC 83020F06 619Aù 0 ¯..ø.Ô..$..É.Ñ.ô..À.z..é..-Ñ.Þ.. 000040
7C00187E 83145689 12468903 2F046E9A 030301FA 9A865E8D 1FA5A5A5 A5DA8E. ..ÖÉÉÉ..^Ñ.•....n./..F..V..-..| 000060
3701FE9A 18800874 C4260676 8803E3C1 0E5F8826 065EC462 7400167E 83067F6A j...-..tbé^øå._.èD..vøåát.....z.7 000080
5403879A 0C8808EC 83034F06 619A0C80 1E800345 068A9A03 3C02879A 165E8D03 ..^....<....E...¯..ø.O..å..É.Ñ.T 0000A0
037301FA 9A865E8D 1FA5A5A5 A5DA8E1E 0716F088 867E8D08 C483036E 07A19A03 ..À.n..é..-Ñ.Þ....ÖÉÉÉ..^Ñ.•.s. 0000C0
E3C10E5F 8826065E C4697E07 0E7E8306 7C020E7E 83185689 16468903 9D046E9A .n....F..V..-..|..-..-ié^øå._.èD 0000E0
0C801E80 0383068A 9A03AA02 949A105E 8003A501 FE9A188D 0874C426 06768803 ..vøåát.....z.É..^....¯....•.¯.¯. 000100
8E1E0716 F088867E 8008C483 030C07A1 9A03C203 879ADC88 08EC8303 8D06619A .ø.§..å..É.Ñ.ô..À.É..é..-Ñ.Þ.... 000120
00011046 C7057D00 01301046 8901EE04 6E9A03E1 01FA9A86 5E8D1FA5 A5A5A5DA ÖÉÉÉ..^Ñ.•.À..n.Y..F.=..).úF... 000140
1476FF16 76FF1876 FF01E8E9 0E4688E6 5689E446 89145788 26124788 26FC5EC4 é^•å.G.å.W..Fô.V|.F.Öô..v...v...v. 000160
76FFE676 FFEC76FF EE76FFF0 76FFF276 FFF476FF F676FFF8 76FFFA76 FF1276FF .v..v•.v%.v-.v¶.v·.vÞ.vŸ.vå.v|.v 000180
EA5689E8 46890000 FFFF9AE4 76FFE676 FF01D7E9 E246891C C483FFFF 00819AE4 ô.Ÿ....é..Fëôa..v|.vô......Fô.vô 0001A0
7E830674 090E7E83 16E80000 8846C700 0F8646C7 0C75080E 7E830674 080E7E83 .-..t..-..u.úFÑ..úF|..Š..-..t..- 0001C0
FF0000FF FF9A8676 FF8876FF E476FFE6 76FF0000 8846C700 088646C7 0A750C0E ..u.úFÑ..úF|...v|.vô.v|.vÑ...... 0001E0
```

```
Dump of file SATURN:[PCCOMMON.DUMP.DLL]DGM.TMP;1 on 18-APR-1990 10:44:12.07
File ID (620,6,0)    End of file block 186 / Allocated 188

Virtual block number 33 (00000021), 512 (0200) bytes

EE76FFF0 76FFF276 FFF476FF F676FFF8 76FFFA76 FF1276FF 1476FF16 76FF1876 v..v..v..v..v°.v½.v-.v¶.v·.vÞ.vŸ 000000
E876FFEA 76FFE476 FFE676FF E246891C C4830508 00819AE4 76FFE676 FFEC76FF .vš.v|.vö.Ÿ....á..Fã.v|.vö.võ.vÒ 000020
F876FFFA 76FF107C FF1076FF 1276FF14 76FF1676 FF1876FF 013EE900 0004889A .....Ö>..v..v..v..v..v..v..v°.v½ 000040
20C48305 4601229A E476FFE6 76FFEC76 FFEE76FF F076FFF2 76FFF476 FFF676FF .v-.v¶.v·.vÞ.vŸ.vš.v|.vö.".F..á 000060
76FFF676 FFF876FF FA76FF12 76FF1476 FF1676FF 1876FF0E 76FF0100 E9E24689 .Fãö...v..v..v..v..v..v°.v½.v-.v 000080
C5E9E246 891EC483 0434039E 9AE476FF E676FFEC 76FFEE76 FFF076FF F276FFF4 ¶.v·.vÞ.vŸ.vš.v|.vö...4..á..Fãöé 0000A0
46C70C75 080E7E83 0674080E 7E83EA56 89E84689 00000446 9AE476FF E676FF00 ..v|.vö.F....Fö.vö.-..t..-..u.úF 0000C0
0000C046 C700088E 46C70A75 0C0E7E83 0674090E 7E8316E8 0000C046 C7000FBE /..úFå..§..-..t..-..u.úF/..úFå.. 0000E0
1076FF12 76FF1476 FF1676FF 1876FF00 0004D19A 8E76FFC0 76FFE476 FFE676FF .v|.vö.vå.v/.¶....v..v..v..v..v. 000100
76FFE676 FFEC76FF EE76FFF0 76FFF276 FFF476FF F676FFF8 76FFFA76 FF1076FF .v..v°.v½.v-.v¶.v·.vÞ.vŸ.vš.v|.v 000120
3D27E800 00059D9A E876FFEA 76FFE476 FFE676FF E2468920 C483048C 01229AE4 ö.".Ÿ..á .Fã.v|.vö.võ.vÒ.....$'= 000140
05510551 05160516 05160516 05160516 04080408 05FCA7FF 2E93C003 2277000C ..w".å...|•.Ä.Ä.............Q.Q. 000160
006A006A 006A088E 008881E 000000C8 CBC95F5E 1F00E8E2 4688043F 043F0407 ..?.?..Fã§..^_èùå....j...Äj.j.j. 000180
CAC91F00 E814C483 F988E80E 0E76FF10 76FF0A76 FF0C76FF 0876FF06 76FF006A j..v..v..v..v..v..v..O|°.á.§..èò 0001A0
76FF1076 FF0E76FF 0A76FF0C 76FF0676 FF0876FF D88E0626 881E0000 00C8000C ..å....|å..Ä.v..v..v..v..v..v..v 0001C0
881E5657 000036C8 0014CAC9 1F00E814 C483F982 E80E1676 FF1876FF 1276FF14 ..v..v..v..Ò.°.á.§..èò..å6..WV.| 0001E0

Dump of file SATURN:[PCCOMMON.DUMP.DLL]DGM.TMP;1 on 18-APR-1990 10:44:12.07
File ID (620,6,0)    End of file block 186 / Allocated 188

Virtual block number 34 (00000022), 512 (0200) bytes

00087E83 1E740C46 080A4688 2674C208 FE5689FC 46891056 880E4688 D88E0658 X..Ä.F..V..F=.Vz.ôt&.F..F.t..-.. 000000
03A0E98A D488067D 01067E83 0C7E0C08 7E83067C 0A087E83 127F0C08 7E83187C |..-.....-..|..-..-..-..).¡å.ÖÙ. 000020
0000FFFF 9A5016E6 46800A76 FF0C76FF 0000FFFF 9A5016F4 46800A76 FF0C76FF .v..v..F¶.P......v..v..F|.P..... 000040
478826E2 5EC4E456 89E24689 004205C2 8CC38801 85E90374 027A7F83 26FC5EC4 á^•&..z.t.Öç..û.ô.B..Fã.Vöé^ã&.G 000060
879AF45E 801FA5A5 A5A50A8E 1E0716F0 880A7E80 0A578826 08470326 03E0C10E .éÅ.&.G.&.W..-Ö.Þ....ÖEEEE..^¶.. 000080
A19A0751 03B79ADC 8808EC83 074C0661 9A0C801E 80074206 0A9ADA5E 80073902 .9..^Ö...8...-..•.L..&..É.ñ.Q..À 0000A0
046E9A07 7001FA9A D.5E801F A5A5A5A5 DA8E1E07 16F088D2 7E8008C4 83076807 .k..á..-@.Þ....ÖEEEE..^@.°.p..n. 0000C0
060A9ADA 5E800790 02879AF8 5E80F656 89F44689 02571326 070326E2 5EC40788 ..á^ãå..&.W..F¶.V-.^½......^Ö... 0000E0
CA7E8008 C48307C2 07A19A07 A803B79A DC8808EC 8307A306 619A0C80 1E800799 .... ..•.É..å..É.ñ. ..À.ô..á..-ò 000100
044F8826 E25EC402 BF046E9A 07C701FA 9ACA5E80 1FA5A5A5 A50A8E1E 0716F088 .Þ....ÖEEEE..^ò.°.ù..n.•.á^ã&.0. 000120
FE9A1880 0874C426 E2768803 E3C10E5F 8826FA76 89F84E89 F213C803 06778826 &.w..å.·.N½.v°&._.èD..vã&át....± 000140
879A0C88 08EC8308 1106619A 0C801E80 0807068A 9A07FE02 879AE65E 8007F901 .°..^|...±.........•....å..É.ñ 000160
01FA9ACA 5E801FA5 A5A5A50A 8E1E0716 F088CA7E 8008C483 083007A1 9A081603 ....Å.0..á..-ò.Þ....ÖEEEE..^ò.°. 000180
0E5F8826 E25EC469 7E07087E 83067C02 087E83E8 5689E646 89085F04 6E9A0835 §..n. ..F|.VÒ.-..|..-..-ié^ã&._. 0001A0
1E800875 068A9A08 6C02949A 065E8008 6701FE9A 18800874 C426E276 8803E3C1 èD..vã&át....±.g..^....|....u.. 0001C0
0716F088 CA7E8008 C483089E 07A19A08 8403879A DC8808EC 83087F06 619A0C80 -..•....&..É.ñ....À....á..-ò.Þ.. 0001E0

Dump of file SATURN:[PCCOMMON.DUMP.DLL]DGM.TMP;1 on 18-APR-1990 10:44:12.07
File ID (620,6,0)    End of file block 186 / Allocated 188

Virtual block number 35 (00000023), 512 (0200) bytes

0646C705 7D000130 06468907 31046E9A 08A301FA 9ACA5E80 1FA5A5A5 A5DA8E1E ..ÖEEEE..^ò.°.É..n.1..F.=..).úF. 000000
FFE876FF 0676FF01 88E90846 88EE5689 EC468914 57882612 478826FC 5EC40001 ..á^•&.G.&.W..F&.VŸ.F.Ö...v..vÒ. 000020
E9EA4689 12C48309 00063F9A EC76FFEE 76FFF476 FFF676FF F876FFFA 76FFE676 v|.v°.v½.v-.v¶.vŸ.vš.?....á..Fõö 000040
83050407 D99AEC76 FFEE76FF F476FFF6 76FFF876 FFFA76FF E676FFE8 76FF0186 ...vÒ.v|.v°.v½.v-.v¶.vŸ.vš.|.å.. 000060
83067408 087E83F2 5689F046 89000005 589AEC76 FFEE76FF 0160E9EA 468910C4 á..Fõö'..vŸ.vš.X....FÞ.V·.-..t.. 000080
CA46C70A 750C087E 83067409 087E8316 E80000CC 46C7000F CA46C70C 7508087E -..u.úFò..úFë..§..-..t..-..u.úFò 0000A0
76FFE676 FFE876FF 000005E9 9ACA76FF CC76FFEC 76FFEE76 FF0000CC 46C70008 ..úFë...vŸ.vš.vë.vò.Ö....vÒ.v|.v 0000C0
76FFEE76 FFEA4689 10C48309 8D07D99A EC76FFEE 76FFF476 FFF676FF F876FFFA °.v½.v-.v¶.vŸ.vš.|.§..á..Fõ.vŸ.v 0000E0
76FFF876 FFFA76FF E676FFE8 76FF0876 FF0009E9 00000964 9AF076FF F276FFEC š.v·.vÞ.d...Ö|..v..vÒ.v|.v°.v½.v 000100
1F9AEC76 FFEE76FF 0080E9EA 468912C4 8308E707 499AEC76 FFEE76FF F476FFF6 -.v¶.vŸ.vš.|.Ö..á..Fõö¯..vŸ.vš.. 000120
E8000004 46C7000F 0246C70C 7508087E 83067408 087E83F2 5689F046 89000009 ....FÞ.V·.-..t..-..u.úF@..úFå..$ 000140
D476FFEC 76FFEE76 FF000004 46C70008 0246C70A 750C087E 83067409 087E8316 ..-..t..-..u.úF@..úFå...vŸ.vš.vå 000160
EE76FFF4 76FFF676 FFF876FF FA76FFE6 76FFE876 FF0676FF 00000998 9AD276FF .v@......v..vÒ.v|.v°.v½.v-.v¶.vŸ 000180
E800000A 149AF076 FFF27'FF EC76FFEE 76FFEA46 8912C483 0983063F 9AEC76FF .vš.?....á..Fõ.vŸ.vš.v·.vÞ.....$ 0001A0
09C8099F 099F099F 099F099F 099F08C9 08C90A5E A7FF2E93 C0032277 000C''27 '=..w".å...|^.è.è.............à. 0001C0
088E0690 881E5657 000062C8 000CCAC9 5F5E1F00 E8EA4688 09180918 08F20' 9 à........Fõ§..^_èò..àb..WV.|...À 0001E0
```

Dump of file SATURN:[PCCOMMON.DUMP.DLL]DGM.TMP;1 on 18-APR-1990 10:44:12.07
File ID (620,6,0)   End of file block 186 / Allocated 188

Virtual block number 36 (00000024), 512 (0200) bytes

```
087E831E 740C4608 0A468826 74C20800 008A46C7 FE5689FC 46891056 880E4688 .F..V..F..V.úF....ôt&.F..F.t..~. 000000
C2E98C63 88067D01 067E8306 7E0C087E 83067C0A 087E8312 7F0C087E 83187C00 .|..~.....~..|..~..~..~..).|c.Ðó 000020
00FFFF9A 50168C46 8D0A76FF 0C76FF00 00FFFF9A 5016FA46 8D0A76FF 0C76FF02 ..v..v..F!.P......v..v..F¥.P.... 000040
00FFFF9A 5016F246 8D0A76FF 0C76FF00 00FFFF9A 50168646 8D0A76FF 0C76FF00 ..v..v..FÑ.P......v..v..F·.P.... 000060
57882612 478826FC 5EC4CC56 89CA4689 C05689BE 46890042 05FE5688 FC468800 ..F..V..F/.VÀ.Fb.VÄÅ^.&.G.&.W 000080
00018805 7E01067E 83087F00 0730107C 000230CE 46890846 88C85689 C6468914 ..F6.VÀ.F..Fö=..|.=.....~..~.|.. 0000A0
57882608 47032603 E0C10E47 88268E5E C401A8E9 7A478826 D0468906 468803E8 Š..F..FÅ&.GzÕ`.á^/&.G.êÅ.&.G.&.W 0000C0
0897060A 9AAE5E8D 088E0287 9AF25E8D 1FA5A5A5 A5DA8E1E 0716F088 AE7E8D0A ..-Û.Þ....ÖEEEE..^·......^Û..... 0000E0
F088A67E 8D08C483 08C007A1 9A08A603 879ADC88 08EC8308 A106619A 0C801E8D ..¯..a.À..å..É.Ñ.Ì..À.å..å..-Ì.Þ 000100
57132607 03268E5E C408D004 6E9A08C5 01FA9AA6 5E801FA5 A5A5A5DA 8E1E0716 ....ÖEEEE..^Ì.*.é..n.Ì.á^/&..&.W 000120
08F80661 9A0C801E 8D08EE06 0A9AAE5E 8D08E502 879AF65E 80F45689 F2468902 ..F·.V¶.^-...Ì..^Û...Ÿ...¯..a.½. 000140
A5A5A5A5 DA8E1E07 16F0889E 7E8D08C4 830C1707 A19A08F0 03879ADC 8808EC83 .å..É.Ñ.»..À....å..-..Þ....ÖEEEE 000160
F64E89F2 13C80306 77882604 4F88268E 5EC407F1 046E9A0C 1C01FA9A 9E5E801F ..^..*....n.þ.á^/&.O.&.w..à.·.N- 000180
0C530287 9A865E8D 0C4E01FE 9A188D08 74C4268E 768803E3 C10E5F88 26F87689 .v½._.èO..v/&At....±.N..^Ñ...S. 0001A0
08C4830C 8507A19A 0C680387 9ADC8808 EC830C66 06619A0C 801E8D0C 5C068A9A ...\...¯..a.f..å..É.Ñ.k..À....á. 0001C0
89864689 0CA8046E 9A0C8A01 FA9A9E5E 8D1FA5A5 A5A5DA8E 1E0716F0 889E7E8D .~..Þ....ÖEEEE..^..*....n.¯..FÑ. 0001E0
```

Dump of file SATURN:[PCCOMMON.DUMP.DLL]DGM.TMP;1 on 18-APR-1990 10:44:12.07
File ID (620,6,0)   End of file block 186 / Allocated 188

Virtual block number 37 (00000025), 512 (0200) bytes

```
02949A00 5E8D0C80 01FE9A18 8D0874C4 26CA7688 03E3C10E 5F8826CA 5EC48856 V|á^ò&._.èO..vò&át....±.¯..^Å... 000000
830CE707 A19A0CCD 03879ADC 8808EC83 0CC80661 9A0C801E 800C8E06 8A9A0C85 ç..../..¯..a.à..å..É.Ñ.ë..À.Ö.. 000020
46890886 046E9A0C EC01FA9A A65E801F A5A5A5A5 DA8E1E07 16F088A6 7E8008C4 Å..-Ì.Þ....ÖEEEE..^Ì.*.å..n....F 000040
75000230 F1740001 300FE811 E8024689 D046B819 E8000102 46C7057D 00013002 0=..).úF0..Š..FÅ.F0$.$.=..tþ=..u 000060
7E83087F 0C087E83 117C0808 7E830C7E 09087E83 067C0808 7E8300E8 FE48E903 .ÕK±$..~..|..~..~..~..|..~.....~ 000080
C2468D00 74C00804 689C020 02E80001 88057E01 D27E8300 020246C7 057D0202 0.).úF0...~0.~.|..Š.+å.Få.åt..Fó 0000A0
5016C246 805016F2 46808676 FF8876FF FA76FF8C 76FF04C4 830D890C 4E9A5016 .P.N....å..v¥.v*.v|.vÑ.F·.P.Fó.P 0000C0
468804C4 83FFFF0E 059A5016 C2468D00 7400047E 838A4689 10C4830A 360FF89A .½.6..å..Fo.-å.t..Fó.P......å..F 0000E0
89F04689 1056880E 46880D8E 0A8C881E 56570000 6EC8000C CAC95F5E 1F00E88A oŠ..^ èb..àn..WV.|...Ä.F..V..FÞ. 000100
0C7C0106 7E83127F 0C087E83 187C0008 7E831E74 0C46080A 46882674 C20BF256 V·.ôtÏ.F..F.t..~..|..~......~..|. 000120
FFFF9A50 160A4680 0A76FF0C 76FF032F E98A0488 067F0C08 7E830C7C 0A087E83 .~..|..~.....|å.Õ/..v..v..FÕ.P... 000140
5689AA46 890C5688 0A468803 0CE9C028 0573020A 7E83067C 007F000C 7E830000 ...~É...|..~Õ.s.+åÕ...F..V..F¯.V 000160
5689AE46 8914578B 26124788 26F05EC4 84568982 46890042 05F2568B F04688AC ¯.FÞ.V·.Ì..Fý.VÇá^Þ&.G.&.W..FÛ.V 000180
7A478826 88468906 468803E8 00018805 7F000730 0A7C0002 30864689 08468880 ¯.f..FÑ=..|.=....|..Š..F..F|&.Gz 0001A0
885E8D0E 7301FE9A 188D0874 C4268276 8803E3C1 0E5F8826 825EC475 E8EE4689 .F¥Šuá^ý&._.èO..vý&át....±.±..^| 0001C0
07A19A0E 9003879A DC8808EC 830E8806 619A0C80 1E800E81 068A9A0E 7802949A ...x........¯..a....å..É.Ñ....Å. 0001E0
```

Dump of file SATURN:[PCCOMMON.DUMP.DLL]DGM.TMP;1 on 18-APR-1990 10:44:12.07
File ID (620,6,0)   End of file block 186 / Allocated 188

Virtual block number 38 (00000026), 512 (0200) bytes

```
46046E9A 0EAF01FA 9AA25E8D 1FA5A5A5 A5DA8E1E 0716F088 A27E8D08 C4830EAA `..á..-Å.Þ....ÖEEEE..^Å.*.£..n.F 000000
3DF17400 01300CE8 0CE88A46 89884688 16E80001 8A46C705 7D000130 8A46890C ..Fo=..).úFo..Š..F|.Fo$.$.=..tþ= 000020
7E83087F 0C087E83 117C0808 7E830C7E 09087E83 067C0808 7E8300E8 81740002 ..t.$..~..|..~..~..~..|..~.....~ 000040
AA468D00 74C0088C 4689C028 02E80001 88057E01 8A7E8300 028A46C7 057D028A o.).úFo...~o.~.|..Š.+å.F¥.åt..F¯ 000060
4689C028 FE568CFC 4689F446 8DE8568C E64689DE 468D04C4 8300550C 4E9A5016 .P.N.U..á..F8.F|.VÒ.F¶.F=.V±+å.F 000080
006A0A76 FF0C76FF 1FA5A5A5 A5DA8E1E F088F088 028CE646 88FC5EC4 EA4689EC å.Fõá^=.F|.0.=.Þ..ÖEEEE..v..v.j. 0000A0
8E1EF088 F888E856 88E64688 FC5EC400 EC568301 EA46831D E80000FF FF9A006A j......Š..Fõ..V&.á^=.F|.VÒ.=.Þ.. 0000C0
7E83016C E90374C0 080000FF FF9AE676 FFE876FF 0A76FF0C 76FF1FA5 A5A5A5DA ÖEEEE..v..v..vÒ.v|......åt.Õl..~ 0000E0
0716F088 A27E8D0A 57882608 47032603 E0C10E47 8826825E C400E0E9 037402EE ¥.t.ÕÅ.á^ý&.G.èÅ.&.G.&.W..-Å.Þ.. 000100
0906619A 0C801E8D 0FCF060A 9AA25E8D 0FC60288 9AE65EC4 1FA5A5A5 A5DA8E1E ..ÖEEEE.á^|...ó..^Å...ü...¯..a.\ 000120
A5A5A5DA 8E1E0716 F0889A7E 8008C483 0FF807A1 9A0FDE03 879ADC88 08EC830F ..å..É.Ñ.8..À.½..á..-..Þ....ÖEEE 000140
26078926 E65EC402 57132607 0326825E C4101C04 6E9A0FFD 01FA9A9A 5E801FA5 É..^..*.»..n...á^ý&..&.W.á^|&..& 000160
83103706 619A0C80 1E8D102D 060A9AA2 5E8D1024 02889A04 5F80E65E C4025789 .W.á^|......$..^Å......¯..a.7.. 000180
1FA5A5A5 A5DA8E1E 0716F088 927E8D08 C4831056 07A19A10 3C03879A DC8808EC å..É.Ñ.<..À.V..á..-..Þ....ÖEEEE. 0001A0
26E65EC4 F213C803 06778826 044F8826 825EC40E 68046E9A 105801FA 9A925E8D .^..*.(..n.k.á^ý&.O.&.w..à.·á^|& 0001C0
006A1875 00EC7E83 217501EA 7E83FED7 E90375EC 4608EA46 88067789 26044F89 .O.&.w..Fõ.F$u.Õa±.-õ.ul.~&.u.j. 0001E0
```

```
Dump of file SATURN:[PCCOMMON.DUMP.DLL]DGM.TMP;1 on 18-APR-1990 10:44:12.07
File ID (620,6,0)   End of file block 186 / Allocated 188

Virtual block number 39 (00000027), 512 (0200) bytes

 2DDC5688 DA46880E C4831005 09E49A50 16AA4680 E676FFE8 76FFFC76 FFFE76FF .vs.v=.vÒ.vl.F`.P.ð.f..á..FÖ.VÉ- 000000
 AA4680FC 76FFFE76 FFE676FF E876FF01 6A1875EC 56382075 EA463800 DA830001 ...Ö.;Fõu ;Všu.j..vÒ.vl.vs.v=.F` 000020
 9AAE76FF 8076FFFC 76FFFE76 FFE676FF E876FF08 76FF0EC4 83110809 E49A5016 .P.ð....á..v..vÒ.vl.vs.v=.v¯.vÛ. 000040
 E8C02804 C4830F15 0E059A50 16AA4680 0074008C 7E83FE5F E90EC483 0073048C ¥.s..á.Ô ±.-¥.t..F`.P......á.+åS 000060
 FA5689F8 46891856 88164688 D88E0DA2 881E5657 000054C8 000CCAC9 5F5E1F00 ..^_èò..ÃT..WV.¡Å..Å.F..'..F%.V* 000080
 0C087E83 187C0008 7E831E74 14460812 46882674 C2080000 E446C700 00EC46C7 úF&..úFð...ôt&.F..F.t..-. |..-.. 0000A0
 1276FF14 76FF0442 E98AD488 067F0C08 7E830C7C 0A087E83 0C7C0106 7E83127F ...-..|..-..|..-....¡å.Ö8..v..v. 0000C0
 EE468804 1FE9C028 057302EE 7E83067C 007F00F0 7E830000 00EE9A50 16EE4680 .FŸ.P.¥....-P...|..-Ÿ.s.+åÖ...FŸ 0000E0
 720A4639 057F0D7C 0C5639F0 5688EE46 8812730E 4639057C 197F1056 39F05688 .VÞ9V...|.9F.s..FŸ.VÞ9V.|...9F.r 000100
 75FF0A7E 830E4689 104689C0 280875FF 107E830E 75FF0E7E 8303F5E9 8AD48806 .¡å.ÖK..-..u..-..u.+å.F..F..-..u 000120
 04478826 F85EC40C 56890A46 89000A83 00012DF0 5688EE46 881275FF 0C7E8318 ..-..u..FŸ.VÞ-...Ö..F..V.á^¥&.G. 000140
 8826EA56 89E84689 004205C2 8CC388DE 56890C46 89145788 26124788 26E64689 .Fl&.G.&.W..FÉ.VA.ü.ó.B..FÒ.Vö&. 000160
 01FE9A18 800874C4 26E87688 03E3C10E 5F8826E8 5EC46975 000230F6 46897A47 Gz.F-=..uiá^Ò&._.èD..vÒ&át....±. 000180
 03879ADC 8808EC83 12500661 9A0CB01E 80124606 8A9A1230 02949A06 5E801238 8..^....=....F...¯..a.P..&..É.ñ. 0001A0
 7401FA9A C45E8D1F A5A5A5A5 DA8E1E07 16F088C4 7E8D08C4 83126F07 A19A1255 U..Å.o..á..-á.Þ....ÖEEEE..^á.*.t 0001C0
 830C7E09 087E8306 7C08087E 83000106 46C7057D 00013006 46890F8E 046E9A12 ..n./..F.*..).úF....-..|..-..-.. 0001E0

Dump of file SATURN:[PCCOMMON.DUMP.DLL]DGM.TMP;1 on 18-APR-1990 10:44:12.07
File ID (620,6,0)   End of file block 186 / Allocated 188

Virtual block number 40 (00000028), 512 (0200) bytes

 09087E83 067C0808 7E830002 0646C705 7D02067E 83087F0C 087E8311 7C08087E -..|..-.....-..).úF....-..|..-.. 000000
 0188057E 01067E83 EC4689C0 2802E800 0188057F 0C087E83 087C0808 7E830C7E -..-..|..-....|..Š.+á.F&.-..-.|. 000020
 9A016A00 6ADC76FF DE76FF00 A9E90375 C0080775 00EC7E83 E44689C0 2802E800 .Š.+á.Fð.-&.u..âu.Ö`..vB.vÉj.j.. 000040
 89000009 CF9ADC76 FFDE76FF 507400EC 7E8302AE E98AD588 0675C008 0000FFFF .....âu.¡f.ÒÜ..-&.tP.vB.vÉ.Ü.... 000060
 087E8316 E80000C6 46C7000F C446C70C 7508087E 83067408 087E83E2 5689E046 FÅ.Vã.-..t..-..u.úFá..úFó..Š..-. 000080
 9AC476FF C676FFDC 76FFDE76 FF0000C6 46C70008 C446C70A 750C087E 83067409 .t..-..u.úFá..úFó...vB.vÉ.vó.vá. 0000A0
 880675C0 080000FF FF9A5052 99064688 DC76FFDE 76FF3474 00E47E83 00000A48 K....-ð.t4.vB.vÉ.F..RP......âu.¡ 0000C0
 76FF021E E98AD688 0675C008 0000FFFF 9A036A00 6ADC76FF DE76FF02 37E98AD5 f.Ö7..vB.vÉj.j.......âu.¡ø.Ö...v 0000E0
 C02801FE E98AD388 0674C008 0000FFFF 9A5016CC 468D5003 E0C1EE46 880A6AE6 |j..FŸèÅ.P.Fã.P.....ât.¡Å.Ö±.+á 000100
 76FF1476 FFF45689 F2468910 56880E46 880A568C D8468900 468DFC46 89FE4689 .F±.F=.FÅ.FÄ.VÖ.F..V..F`.V¶.v..v 000120
 0131E903 7EF45639 0C56880A 468800F4 568301F2 468308E8 00000F53 9A505212 .RP.S...Š..F`..V¶..F..V.9V¶-.Ö1. 000140
 E90374C0 0800000F 839AD876 FFDA76FF 1276FF14 76FF0127 E90376F2 4639087C |.9F`v.Ö'..v..v..vÖ.vÅ......ât.Ö 000160
 BC7E8D0A 57882608 47032603 E0C10E47 8826E85E C400E0E9 037402F6 7E83010F ...—.t.ÖÅ.á^Ö&.G.èÅ.&.G.&.W..-¥ 000180
 0C801E80 1453060A 9A8C5E80 144A0288 9AD85EC4 1FA5A5A5 A5DA8E1E 0716F088 .Þ....ÖEEEE.á^Å...J..^¥...S...¯. 0001A0
 8E1E0716 F08847E 8D08C483 147C07A1 9A146203 879ADC88 08EC8314 5006619A .ø.]..&..É.ñ.b..Å.|..á..-Ç.Þ.... 0001C0
 D85EC402 57132607 0326E85E C414A004 6E9A1481 01FA9A84 5E8D1FA5 A5A5A5DA ÖEEEE..^Ç.*....n...á^Ö&..&.W.á^Å 0001E0

Dump of file SATURN `PCCOMMON.DUMP.DLL]DGM.TMP;1 on 18-APR-1990 10:44:12.07
File ID (620,6,0)   .nd of file block 186 / Allocated 188

Virtual block number 41 (00000029), 512 (0200) bytes

 619A0C80 1E8014B1 060A9A8C 5E8014A8 02889A04 5F80D85E C4025789 26078926 &..&.W.á^Ã.......^¥...Ÿ...¯..ø 000000
 A5DA8E1E 0716F088 AC7E8D08 C483140A 07A19A14 C003879A 0C880BEC 83148806 .É..&..É.ñ.Ã..Å.Ö..á..-¯.Þ....ÖÉ 000020
 F213C803 06778826 044F8826 E85EC412 30046E9A 140F01FA 9AAC5E80 1FA5A5A5 EEE..^¯.*.Ö..n.0.á^Ö&.O.&.w..à.` 000040
 76C403E3 C1088800 FE568301 FC4683FE 5688FC46 88067789 26044F89 26085EC4 á^Ã&.O.&.w..F=.Vs.F=..Vs..ÄèD.áv 000060
 CC76FFCE 76FFFC76 FFFE76FF 0876FFFE 89E91FA5 A5A5A51F 161ED076 8D3880CC å.8.vÅ...EEEE.Ö¿±.v..vs.v=.vö.vå 000080
 0574C008 0000FFFF 9ACC76FF CE76FFE6 76FF0EC4 8310F205 6A9ADC76 FFDE76FF .vB.vÉ.j.`..á..vl.vö.vã......ât. 0000A0
 0575C008 0000FFFF 9ADC76FF DE76FF47 7400E47E 83067500 EC7E8357 E88AD388 ¡É.ŠW.-&.u..-ð.tG.vB.vÉ......âu. 0000C0
 E88AD588 0575D008 0000FFFF 9A006A00 6A016A00 6ADC76FF DE76FF37 E88AD588 ¡f.Š7.vB.vÉj.j.j.j.......Åu.¡f.Š 0000E0
 C95F5E1F 00E8C028 00001350 9AE076FF E276FFDC 76FFDE76 FF117400 EC7E831B ..-&.t..vB.vÉ.vã.vÅ.P...+åŠ..^_è 000100
 087E830C 740C4608 0A468814 7410460B 0E4688D8 8E112088 1E000006 C80014CA ò..å....| ..Ä.F..F.t..F..F.t..-. 000120
 800A76FF 0C76FF00 010646C7 05700106 7E8368E8 8AD48805 7E0C087E 83067C00 .|..-..-.¡å.Šk.-..).úF....v..v.. 000140
 FF1A7501 FA7E8300 00FFFF9A 5016FA46 800A76FF 0C76FF00 00FFFF9A 5016FC46 F*.P......v..v..F*.P.......-*.u.. 000160
 FF0E76FF 1076FF20 E822E8F7 75E80E06 76FF0876 FFFC76FF FE76FF0E 76FF1076 v..v..vs.v=.v..v..ÒuÅŠ"Š .v..v.. 000180
 74C8000C CAC91F00 E8F4D1E8 0E0676FF 0876FFFF 6AFF6AFF 6AFF6AFC 76FFFE76 vs.v=j.j.j.j..v..v..Ö1*Š..èò..ât 0001A0
 7E830E7F 020E7E83 147C000E 7E831A74 0C46080A 4688D88E 1589881E 56570000 ..WV.|¿..Å.F..F.t..-..|..-.....- 0001C0
 FFFF9A50 16EC4680 0A76FF0C 76FF0455 E98A0488 06751246 08104688 0874000E ..t..F..F.u.¡å.ÖU..v..v..FŠ.P... 0001E0
```

```
Dump of file SATURN:[PCCOMMON.DUMP.DLL]DGM.TMP;1 on 18-APR-1990 10:44:12.07
File ID (620,6,0)   End of file block 186 / Allocated 188

Virtual block number 42 (0000002A), 512 (0200) bytes

16DC468D 0A76FF0C 76FFC656 8CC44689 BC468D04 3AE9C028 057D02EC 7E830000 ...-&.).+åÖ:..F¥.Fá.Vó.v..v..fÉ. 000000
B4468D0A 76FF0C76 FF0000FF FF9AC476 FFC676FF 0A76FF0C 76FF0000 FF¨'9A50 P......v..v..vó.vá......v..v..FÇ 000020
56888446 8806E88A 56888846 88087502 DC7E8306 7401DC7E 830000FF FF9A 116 .P......-É.t..-É.u..F¡.V¤Š..FÇ.V 000040
9A505299 146A006A E0468900 028803E8 00018805 75010E7E 83E85689 E6468.46 Ñ.F¦.VÒ.-..u.¡..Š.¡...FÄj.j..RP. 000060
FA46897A 47882606 5EC40381 E98ADE88 0676E646 38057F0D 7CE85638 144200C4 á.B.;VÒ|...;F¦v.¦B.ÔŸ.á^.&.Gz.F* 000080
800A5788 26084703 2603E0C1 0E478826 E25EC4E4 5689E246 89004205 C28CC388 .ú.ó.B..Fâ.Vóâ^ãä.G.èÁ.&.G.&.W.. 0000A0
1E8D1775 060A9AA4 5E8D176C 02889AC4 5EC41FA5 A5A5A5DA 8E1E0716 F088A47E -É.Þ....ÖEEEE.á^á...¦..^É...u... 0000C0
0716F088 9C7E8D08 C483179E 07A19A17 8403B79A DC8808EC 83177F06 619A0C80 ¯..a....$..É.ñ....À....á..-..Þ.. 0000E0
C4025713 26070326 E25EC417 C2046E9A 17A301FA 9A9C5E8D 1FA5A5A5 A5DA8E1E ..ÖEEEE..^..'.É...n.ô.á^ãä..&.W.á 000100
0C8D1E8D 17D3060A 9AA45E8D 17CA0288 9A045F8D C45EC402 57892607 8926C45E ^áä..&.W.á^á.....Þ..^É...á...¯. 000120
8E1E0716 F088947E 8D08C483 17FC07A1 9A17E203 879ADC88 08EC8317 DD06619A .a.¦..$..É.ñ.ã..À.=..á..-..Þ.... 000140
C8030677 8826044F 8826E25E C4171204 6E9A1801 01FA9A94 5E8D1FA5 A5A5A5DA ÖEEEE..^..'....n...á^ãä.O.&.w..à 000160
F6468948 EC46880A E80000F6 46C70000 F846C706 77892604 4F8926C4 5EC4F213 .á^áä.O.&.w.úF%..úF-..$..F$H.F- 000180
8D5016EA 468D5016 EE468DF6 76FF0A76 FF0C76FF 0167E903 7C02F87E 83F846FF .F%.-%.|.Ög..v..v..v-.F¥.P.Fõ.P. 0001A0
F076FF3F E8EA4688 DA568CD8 4689C842 8D03E6C1 F8768800 00FFFF9A 5016F246 F·.P.......v%èl..Bà.FÄ.VÖ.FõŠ7.vÞ 0001C0
FC468DEE 76FFF076 FF30E800 00FFFF9A D876FFDA 76FFF276 FF006A00 6AEE76FF .v¥j.j..v·.vÖ.vÁ.....Š0.vÞ.v¥.F• 0001E0

Dump of file SATURN:[PCCOMMON.DUMP.DLL]DGM.TMP;1 on 18-APR-1990 10:44:12.07
File ID (620,6,0)   End of file block 186 / Allocated 188

Virtual block number 43 (0000002B), 512 (0200) bytes

8D74C008 08E80DE8 0000FFFF 9A0876FF DA76FFFC 76FFFE76 FF0000FF FF9A5016 .P......vż.v•.vÖ.vÄ.....$.Š..åt§ 000000
88260847 032603E0 C10E4788 26E25EC4 00E0E903 7402FA7E 8300E802 74000230 ≈..tθŠ..-'.t.ÖÅ.á^ãä.G.èÁ.&.G.&. 000020
F8060A9A 945E8D18 EF0289A DB5EC41F A5A5A5A5 DA8E1E07 16F08894 7E8D0A57 W..-..Þ....ÖEEEE.á^Ä...ÿ..^....% 000040
889C7E80 08C48319 2107A19A 190703B7 9ADC8808 EC831902 06619A0C 801E8018 ...¯..a....$..É.ñ....À.l..á..-.. 000060
13260703 26E25EC4 1945046E 9A192601 FA9A9C5E 8D1FA5A5 A5A5DA8E 1E0716F0 Þ....ÖEEEE..^..'.&..n.E.á^ãä..&. 000080
80195606 0A9A945E 80194D02 889A045F 8D085EC4 02578926 07892608 5EC40257 W.á^Aä..&.W.á^Ä._....M..^....V.. 0000A0
16F0888C 7E8D08C4 83197F07 A19A1965 03879ADC 8808EC83 19600661 9A0C801E .¯..a.'..$..É.ñ.ẽ..À....á..-..Þ. 0000C0
77882604 4F8826E2 5EC41764 046E9A19 8401FA9A 8C5E8D1F A5A5A5A5 DA8E1E07 ...ÖEEEE..^..'....n.d.á^ãä.O.&.w 0000E0
00D89788 26000687 8826065E C4FE86E9 06778926 044F8926 D85EC4F2 13C80306 ..à..á^Aä.O.&.w.Õ.ż á^.&..ø.&..Á. 000100
7502FA7E 830108E9 0375C008 E04EFFE0 468800E8 5E830AE6 6E838256 89804689 .F¯.Vý.nl..^Ò..FÅ.NÅ.åu.Õ...-'.u 000120
F402879A E65E8019 EF01FE9A 18800874 C426E276 8803E3C1 0E5F8826 E25EC464 dá^ãä._.èO..vãäát....ż.ÿ..^l...¶ 000140
C4831A26 07A19A1A 0C03879A DC8808EC 831A0706 619A0C80 1E8D19FD 068A9A19 ....».. ¯..a....$..É.ñ....À.&..á 000160
AC468918 E7046E9A 1A2801FA 9ABC5E8D 1FA5A5A5 A5DA8E1E 0716F088 8C7E8D08 ..-..Þ....ÖEEEE..^..'.+..n.Ó..F¯ 000180
88067301 AC7E8306 7C0E7F00 AE7E83AE 5689AC46 89E85688 E646880C EBAE5689 .VùŠ..Fl.VÒ.F¯.VÛ.-Û...|..-¯.s.¡ 0001A0
76FF026A 5016C846 8DC476FF C676FFAC 76FFAE76 FFB076FF 8276FF00 82E98ADE 8.Õ...vý.v¯.vÛ.v¯.vó.vá.Fà.Pj..v 0001C0
FF00000A D09A5016 F4468D80 76FF8276 FF58E88A DE880574 C0080000 FFFF9ADC É......åt.¡8.ŠX.vý.v¯.F¶.P.Î.... 0001E0

Dump of file SATURN:[PCCOMMON.DUMP.DLL]DGM.TMP;1 on 18-APR-1990 10:44:12.07
File ID (620,6,0)   End of file block 186 / Allocated 188

Virtual block number 44 (0000002C), 512 (0200) bytes

76FFC676 FFAC76FF AE76FFF4 76FFDE76 FF00000A ED9A5016 DE468D80 76FF8276 vý.v¯.FB.P.Ú....vÑ.v¶.vÛ.v¯.vó.v 000000
00E85E83 14E66E83 0FE88ADE 880574C0 0810C483 15390FF8 9A1076FF 1276FFC4 á.v..v..%.9..á..åt.¡8.Š..nl..^Ò. 000020
46891056 880E4688 D88E1656 881E5657 0000A0C8 CBC95F5E 1F00E8C0 28FEE8E9 ÕŠż+åŠ..^_èùà...WV.¡V..Ä.F..V..F 000040
E98AD488 067E0C08 7E83067C 00087E83 0C740C46 080A4688 1474C208 EA5689E8 Ò.Võ.ót..F̄..F.t..-..|..-..-.¡å.Õ 000060
004205C2 8CC388AC 5689AA46 899C5689 9A468914 57882612 478826E8 5EC404E8 Ò.á^Òä.G.&.W..F..V..F˙.V¯.ù.ô.B. 000080
E80001B8 057F0007 300A7C00 02308246 89084688 805689AE 4689A456 89A24689 .FÅ.VÊ.FÜ.V¯.F..Fý=..|.=....|..$ 0000A0
74C426A2 768803E3 C10E5F88 26A25EC4 77E8E646 897A4788 26844689 06468803 ..F..FÇä.Gz.FlŠwá^Aä._.èD..vÃäåt 0000C0
EC831896 06619A0C 801E8018 8C068A9A 18830294 9A845E8D 187E01FE 9A188D08 ....ż.-..^Ç...........¯..ø....á 0000E0
1FA5A5A5 A5DA8E1E 0716F088 FF788E8D 08C4831B 8707A19A 189803B7 9ADC8808 ..É.ñ...À.ñ..á..ƒx..Þ....ÖEEEE. 000100
84468819 E80001B6 46C7057D 00013086 468919E7 046E9A18 BC01FA9A FF789E8D ..x..'.¥..n.Ó..FÑ=..}.úFÑ..Š..FÇ 000120
09087E83 067C0808 7E8300E8 FF7CE903 75000230 F1740001 300FE811 E8864689 .FÑŠ.Š.=..tþ=..u.Ò|.Š..-..|..-.. 000140
88057E01 867E8300 028646C7 057D0286 7E83087F 0C087E83 117C0808 7E830C7E -..-..|..-.....-Ñ.}.úFÑ...-Ñ.-.¡ 000160
88468980 468004C4 ʳ110A40C 4E9A5016 A6468000 74C00888 4689C028 02E80001 ..Š.+à.F¡.åt..Fl.P.N.É..á..F..F. 000180
50160846 800A76FF ᴗ.76FFF6 568CF446 89EC4680 96568C94 46898C46 808A568C .V..F..F..V..F$.F¶.V-.v..v..FÄ.P 0001A0
C400E7E9 037402E6 7E830000 16C39A88 76FF8A76 FF0A76FF 0C76FF00 00168E9A ......v..v..v..v..ù....-l.t.ÕÒ.á 0001C0
A5A5A5A5 DA8E1E07 16F088FF 788E8D0A 57882608 47032603 E0C10E47 8826A25E ^Ää.G.èÁ.&.G.&.W..ƒx..Þ....ÖEEEE 0001E0
```

```
Dump of file SATURN:[PCCOMMON.DUMP.DLL]DGM.TMP;1 on 18-APR-1990 10:44:12.07
File ID (620,6,0)   End of file block 186 / Allocated 188

Virtual block number 45 (0000002D), 512 (0200) bytes

DC8808EC 831C8306 619A0CB0 1E8D1CA9 060A9AFF 789E8D1C A002889A 885EC41F .á^.........x.... ... ..e.°..&..É 000000
709E8D1F A5A5A5A5 DA8E1E07 16F088FF 708E8D08 C4831CD4 07A19A1C B803B79A .ñ.¡..À.â..á..fp..Þ....ÖEEEE...p 000020
C4025789 26078926 945EC402 57132607 0326A25E C41CF804 6E9A1CD9 01FA9AFF ..°.)..n.%.á^Å&..&.W.á^.&..&.W.á 000040
8808EC83 1D140661 9A0C801E 8D100A06 0A9AFF78 9E8D1001 02889A04 5F8D885E ^..........x.........  ..e....$.. 000060
9E8D1FA5 A5A5A5DA 8E1E0716 F088FF68 8E8D08C4 83103507 A19A1D19 03879ADC É.ñ....À.5..á..fh..Þ....ÖEEEE... 000080
8926945E C4F213C8 03067788 26044F88 26A25EC4 1876046E 9A1D3A01 FA9AFF68 h..°.:..n.v.á^Å&.O.&.w..à.·á^.&. 0000A0
76FF0C76 FF0247E9 037CE446 39084688 E446FF03 E80000E4 46C70677 8926044F O.&.w.úFÖ..Š..FÖ.FA9FÖ|.ÖG..v..v 0000C0
C0E800CF E9064688 00001855 9A5016E2 46805016 06468050 160A4680 E476FF0A ..vÖ.FÖ.P.Fø.P.Fâ.P.U....FøÖü.Šë 0000E0
006AF876 FFFA76FF 000015F5 9A5016F8 46805052 E05689DE 46890C56 880A4688 .FÖ.VÉ.F8.VÁRP.F%.P.%....v°.v%j. 000100
8800A7E9 A85689A6 4689FA56 88F84688 0000FFFF 9AF476FF F676FFE2 76FF006A j..vâ.v-.v¶......F%.V°.F|.V´ÖI.. 000120
4689FA56 89F84689 00049788 26000287 8826E85E C4A05689 9E46890C 56880A46 FÖ.VÉ.F..V.á^Ö&..Ø.&..â..F%.V°.F 000140
FC76FFFE 76FFF876 FFFA76FF 00001893 9A5016FC 46809E76 FFA076FF A85689A6 |.V´.v..v..F•.P......v°.v%.vz.v= 000160
006A006A F876FFFA 76FF0'00 18A49AF4 76FFF676 FFFC76FF FE76FF00 00FFFF9A ......vz.v•.v-.v¶.É....v°.v%j.j. 000180
9AF476FF F676FF00 6A016A00 6AF876FF FA76FF00 001E509A 9476FF96 76FF''4A j..v..v..P....v°.v%j.j.j..v-.v¶. 0001A0
75000230 FF22E903 75000130 FF2CE903 75C00819 E818E800 00E246C7 0000FF.  ....úFâ..Š.Š..âu.Ö,.=..u.Ö".=..u 0001C0
57882608 47032603 E0C10E47 8826A25E C400E7E9 037402E6 7E8300E8 FF58E90, .Ö(.Š..-|.t.ÖÖ.á^Å&.G.éÀ.&.G.&.W 0001E0

Dump of file SATURN:[PCCOMMON.DUMP.DLL]DGM.TMP;1 on 18-APR-1990 10:44:12.07
File ID (620,6,0)   End of file block 186 / Allocated 188

Virtual block number 46 (0000002E), 512 (0200) bytes

060A9AFF 689E8D1E B002889A F45EC41F A5A5A5A5 DA8E1E07 16F088FF 688E8D0A ../h_..Þ....ÖEEEE.á^¶...¯...h.... 000000
708E8D08 C4831EE4 07A19A1E C803B79A DC8808EC 831EC306 619A0CB0 1E8D1E89 ¿...¯..e.û..ĕ..É.ñ.à..À.Ö..á../p 000020
0326A25E C41F0804 6E9A1EE9 01FA9AFF 709E8D1F A5A5A5A5 DA8E1E07 16F088FF ..Þ....ÖEEEE...p..°.Ö..n...á^Å&. 000040
0A9AFF68 9E8D1F11 02889A04 5F8D45E C4025789 26078926 F45EC402 57132607 .&.W.á^¶&..&.W.á^¶._........h... 000060
8E8D08C4 831F4507 A19A1F29 03879ADC 8808EC83 1F240661 9A0C801E 8D1F1A06 ..... ..e.$..ĕ..É.ñ.)..À.E..á../ 000080
26A25EC4 1C97046E 9A1F4A01 FA9AFF60 9E8D1FA5 A5A5A5DA 8E1E0716 F088FF60 '..Þ....ÖEEEE...'..°.J..n...á^Å& 0000A0
161E0716 8C768080 7E800677 8926044F 8926F45E C4F213C8 03067788 26044F88 .O.&.w..à. á^¶&.O.&.w..-..v..... 0000C0
831C2509 E49A5016 A6468DF4 76FFF676 FF8876FF 8A76FFE2 76FF1FA5 A5A5A51F .EEEE..vâ.v..v..v-.v¶.F|.P.Ö.X.. 0000E0
E90EC483 1A8A048C 9A9A76FF 9C76FF88 76FF8A76 FFF476FF F676FF08 76FF0EC4 á..v..v-.v¶.v..v..v..v..¥.¤..á.Ö 000100
9876FF50 16A64680 18740098 7E830000 FFFF9A50 16984680 0A76FF0C 76FFF0A8 "».v..v..F..P.......-..t..F|.P.v. 000120
059A5016 A646800D 7400887E 830EC483 F66EE80E E876FFEA 76FF0A76 FF0C76FF .v..v..vÖ.vÖ.Ön-.á..-|.t..F|.P.. 000140
0E4688D8 8E1AE4B8 1E565700 007AC800 0CCAC95F 5E1F00E8 C02804C4 831F800E ....á.+âŠ..^_èò..âz..WV.¡Ö..Ä.F. 000160
46882674 C208F446 88000082 46C78E56 898C4689 004205F6 5689F446 89105688 .V..F¶.V-.B..F¥.V/úFÿ...F¶.Öt&.F 000180
7E83067E 0C087E83 067C0A08 7E83127F 0C087E83 187C0008 7E831E74 0C460B0A ..F.t..-..|..~......-..|..-..-..- 0001A0
57882612 478826F4 5EC4CA56 89C84689 8E56888C 46880478 E98AD488 067D0106 ..).¡â.Ö(..F¥.V/.Fâ.Vöá^¶&.G.&.W 0001C0
89064688 03E80001 88057F00 07300A7C 000230CC 46890846 88C65689 C4468914 ..Fâ.VÖ.F..Fä=..|.*....¡..Š..F.. 0001E0

Dump of file SATURN:[PCCOMMON.DUMP.DLL]DGM.TMP;1 on 18-APR-1990 10:44:12.07
File ID (620,6,0)   End of file block 186 / Allocated 188

Virtual block number 47 (0000002F), 512 (0200) bytes

208601FE 9A188008 74C426C8 768803E3 C10E5F88 26C85EC4 75E87A47 8826CE46 Föâ.GzŠuá^Å&._.èÖ..vÂ&át.....z.R 000000
20030387 9ADC8808 EC8320CE 06619A0C 801E8D20 C4068A9A 20880294 9ACE5E8D .^ö...É ...á ..¯..e.ö .ĕ..É.ñ.Æ 000020
9A20F201 FA9A9E5E 8D1FA5A5 A5A5DA8E 1E0716F0 889E7E8D 08C48320 ED07A19A .À.Ü .á..-..Þ....ÖEEEE..^..°.· . 000040
0001300C E80EE8D0 4689CE46 8816E800 01D046C7 057D0001 30004689 1EA7046E n.Ï..FÄ=..).úFÀ..Š..Fö.FÀŠ.Š.=.. 000060
7F0C087E 83117C08 087E830C 7E09087E 83067C08 087E8300 E8817400 0230F174 tÞ=..t.Š..-..|..-..-..-..|..-... 000080
FF0C76FF D24689C0 2802E800 0188057E 01D07E83 00020046 C7057D02 D07E8308 ..-À.).úFÀ...-À.-.|..Š.+á.F@.v.. 0000A0
FF0C76FF 0000FFFF 9A501684 46800A76 FF0C76FF 00001E22 9A5016F8 46800A76 v..F%.P."....v..v..FÇ.P......v.. 0000C0
FF0C76FF 0000FFFF 9A5016F0 46800A76 FF0C76FF 0000FFFF 9A5016A6 46800A76 v..F|.P......v..v..FÞ.P......v.. 0000E0
0E478826 8C5EC402 04E90374 027A7F83 26F45EC4 0000FFFF 9A5016F2 46800A76 v..F .P.....á^¶&..z.t.Ö..á^¥&.G. 000100
02879AF8 5E8D1FA5 A5A5A5DA 8E1E0716 F0889E7E 800A5788 26084703 2603E0C1 éÀ.&.G.&.W..-..Þ....ÖEEEE..^%... 000120
07A19A21 F003B79A DC8808EC 8321E806 619A0CB0 1E8D21E1 060A9A9E 5E8D2108 À|.^....À|..¯..e.Š|.&..É.\.Þ|.À. 000140
27046E9A 220F01FA 9A965E8D 1FA5A5A5 A5DA8E1E 0716F088 967E8D08 C483220A .".á..-..Þ....ÖEEEE..^..°. ".n.' 000160
38060A9A 9E5E8D22 2F02879A FC5E8DFA 5689F846 89025713 26070326 8C5EC422 "á^¥&..&.W..F%.V°.^=.../".^....8 000180
888E7E8D 08C48322 6107A19A 22470387 9ADC8808 EC832242 06619A0C 801E8022 "..¯..e.B".â..É.ñ.G".À.a".á..-.. 0001A0
26044F88 268C5EC4 20AE046E 9A226601 FA9A8E5E 8D1FA5A5 A5A5DA8E 1E0716F0 Þ....ÖEEEE..^..°.f".n.Ö á^¥&.O.& 0001C0
888E7E8D 0A578826 08470326 03E0C10E 478826FE 7689FC4E 89F213C8 03067788 .W..â.·.N=.vz&.G.éÀ.&.G.&.W..-.. 0001E0
```

```
Dump of file SATURN:[PCCOMMON.DUMP.DLL]DGM.TMP;1 on 18-APR-1990 10:44:12.07
File ID (620,6,0)   End of file block 186 / Allocated 188

Virtual block number 48 (00000030), 512 (0200) bytes

 9A0CB01E 8D22B206 0A9A8E5E 8D22A902 879AB45E 8D1FA5A5 A5A5DA8E 1E0716F0 Þ....ÖEEEE..^Ç...`".^....ÿ"..¯.. 000000
 DA8E1E07 16F08896 7F8D08C4 83220B07 A19A22C1 03B79ADC 8808EC83 228C0661 ■.¥".$..É.ñ.è".À.Ü".á..-..Þ....Ö 000020
 89B44689 02571326 0703268C 5EC422F8 046E9A22 E001FA9A 965E801F A5A5A5A5 ÉEEE..^..'.Å".n.%"á^¥&..&.W..FÇ. 000040
 DC8808EC 83231304 619A0CB0 1E8D2309 060A9A8E 5E8D2300 02879A88 5E8D8656 VÑ.^¡....#.^.....#..¯..■..#.$..É 000060
 9A865E80 1FA5A5A5 A5DA8E1E 0716F088 867E8D08 C4832332 07A19A23 1803B79A .ñ..#.À.2#.á..-..Þ....ÖEEEE..^.. 000080
 88268A76 89B84E89 F213C803 06778826 044F8826 8C5EC421 D0046E9A 233701FA '.7#.n.Àlá^¥&.O.&.w..à.`.N¡.vo&. 0000A0
 2377068A 9A236E02 879AA65E 8D236901 FE9A188D 0874C426 8C768803 E3C10E5F _.è0..v¥&át.....$.l#.^l...n#...w# 0000C0
 F088867E 8D08C483 23A007A1 9A238603 879ADC88 08EC8323 8106619A 0CB01E8D ..¯..■..#.$..É.ñ..#.À..#.á..-..Þ 0000E0
 D27E83A8 5689A646 8922A104 6E9A23A5 01FA9A86 5E8D1FA5 A5A5A5DA 8E1E0716 ....ÖEEEE..^..'.E#.n.À".F!.V`.-@ 000100
 0A76FF0C 76FF5016 84468D50 16F8468D 04C48323 D80C4E9A 5016C046 8D0D7400 .t..Fà.P.H.À#.á..F%.P.FÇ.P.v..v. 000120
 F8462886 56888446 8800EEE9 0374C008 82468910 C4831FF1 081D9A50 16C04680 .Fà.P...þ..á..Fý.àt.ÖY..FÇ.VÑ+F% 000140
 879A865E 80985689 964689FE 5618FC46 288A5688 88468888 56898646 89FA561B .V'.F..V..F¡.Vo+F•.V$.F..V..^... 000160
 24330287 9A965E8D 242E0287 9A965E80 2426068A 9A241E02 879A865E 8D241902 ..$.^.....$...&$.^.....$.^....3$ 000180
 88AA7E80 08C48323 61077D9A 24470387 9ADC8808 EC832442 06999A24 38068A9A ...8$...8$.$..É.ñ.G$.).■#.á..-¯. 0001A0
 8808EC83 24740661 9A0CB01E 8D246A01 FA9AAA5E 8D1FA5A5 A5A5DA8E 1E0716F0 Þ....ÖEEEE..^¯.'.j$..¯..■.t$.$.. 0001C0
 F276FF1F A5A5A5A5 DA8E1E07 16F0889E 7E8D08C4 83249F07 A19A2479 03B79ADC É.ñ.y$.À..$.á..-..Þ....ÖEEEE..v· 0001E0

Dump of file SATURN:[PCCOMMON.DUMP.DLL]DGM.TMP;1 on 18-APR-1990 10:44:12.07
File ID (620,6,0)   End of file block 186 / Allocated 188

Virtual block number 49 (00000031), 512 (0200) bytes

 C0468050 16F8468D 50522411 046E9A24 A401FA9A 9E5E80A6 76FFA876 FFF076FF .vÞ.v`.vl.^..'.É$.n..$RP.F%.P.Fà 000000
 04C48323 880E059A 5016C046 80007400 D27E83B2 468914C4 831FAA14 959A5016 .P...¯..á..Fý.~@.t..Fà.P...E#.á. 000020
 46891056 880E4688 D88E2009 881E5657 00007EC8 000CCAC9 5F5E1F00 E8824688 .FýŠ..^_èò..à-..WV.¡. .Ä.F..V..F 000040
 740C4608 0A468826 74C208F0 46880000 AE46C78A 56898846 89004205 F25689F0 Þ.V·.8..F¡.VoúFÜ...FÞ.ôt&.F..F.t 000060
 88067D01 067E8306 7E0C087E 83067C0A 087E8312 7F0C087E 83187C00 087E831E ..-..|..-.....-..|..-..-..-..).¡ 000080
 8AD48806 75FE4608 FC468800 001E009A 5016FC46 800A76FF 0C76FF04 72E98AD4 à.Ör..v..v..F•.P......F•.F$u.¡À. 0000A0
 C25689C0 46891457 88261247 8826F05E C4C65689 C446898A 56888846 880454E9 ÖI..F¡.Vo.Fá.VóÁ^Þ&.G.&.W..Fà.Vò 0000C0
 E87A4788 26CA4689 0646'803 E8000188 057F0007 300A7C00 0230C846 89084688 .F..Fà*..|.*....¡..Š..F..Fò&.GzŠ 0000E0
 8402949A CA5E8025 AF01FE9A 18800874 C426C476 8803E3C1 0E5F8826 C45L ''75 uá^á&._.è0..váÈát.....$.ÉX.^ò...Ç 000100
 C48325E6 07A19A25 CC03B79A DC8808EC 8325C706 619A0CB0 1E8D258D 068A9A''5 X...§X..¯..■.üX.$..É.ñ.àX.À.ÌX.á 000120
 CC468924 61046E9A 25E801FA 9A9A5E80 1FA5A5A5 A5DA8E1E 0716F088 9A7E80U' ..-..Þ....ÖEEEE..^..'.$X.n.■$.Fä 000140
 81740002 3DF17400 01300CE8 0EE8CC46 89CA4688 16E80001 CC46C705 7D00013D *..).úFä..Š..Fò.FäŠ.Š.*..tþ*..t. 000160
 057D02CC 7E83087F 0C087E83 117C0808 7E830C7E 09087E83 067C0808 7E8300E8 Š..-..|..-..-..-..|..-......-ä.). 000180
 5016F446 8DFC76FF FE76FFCE 4689C028 02E80001 88057E01 CC7E8300 02CC46C7 úFä...-ä.-.¡..Š.+à.Fö.V$.V•.F¶.P 0001A0
 5016A246 8DFC76FF FE76FF00 0021689A 50168046 8DFC76FF FE76FF00 0021589A .X!...V$.V•.F¯.P.h!...V$.V•.FÀ.P 0001C0
 5016EE46 8DFC76FF FE76FF00 0021889A 5016EC46 8DFC76FF FE76FF00 0021789A .x!...V$.V•.F$.P..!...V$.V•.FŸ.P 0001E0

Dump of file SATURN:[PCCOMMON.DUMP.DLL]DGM.TMP;1 on 18-APR-1990 10:44:12.07
File ID (620,6,0)   End of file block 186 / Allocated 188

Virtual block number 50 (00000032), 512 (0200) bytes

 08470326 03E0C10E 47882688 5EC40204 E9037402 7A7F8326 F05EC400 0021989A ..!..á^Þ&..z.t.Ö..á^¡&.G.'À.&.G. 000000
 0A9A9A5E 8026D102 879AF45E 8D1FA5A5 A5A5DA8E 1E0716F0 889A7E80 0A578826 &.W..-..Þ....ÖEEEE..^¶...1&.^... 000020
 7E8D08C4 83270307 A19A26E9 03B79ADC 8808EC83 26E40661 9A0CB01E 8D26DA06 .Ö&..¯..■.Ö&.$..É.ñ.Ö&.À..'.á..- 000040
 07032688 5EC42720 046E9A27 0801FA9A 925E801F A5A5A5A5 DA8E1E07 16F08892 ..Þ....ÖEEEE..^..'..'.n. 'á^¡&.. 000060
 619A0CB0 1E8D2731 060A9A9A 5E8D2728 02879AF8 5E8DF656 89F44689 02571326 &.W..F¶.V-.^%...('.^....1'..¯..■ 000080
 A5DA8E1E 0716F088 8A7E8D08 C483275A 07A19A27 4003B79A DC8808EC 83273806 .:'.$..É.ñ.ə'.À.Z'.á..-..Þ....ÖE 0000A0
 F213C803 06778826 044F8826 885EC425 A7046E9A 275F01FA 9A8A5E8D 1FA5A5A5 ÉEE..^..'. '.n.ÌXá^¡&.O.&.w..À.· 0000C0
 A5DA8E1E 0716F088 8A7E8D0A 57882608 47032603 E0C10E47 8826FA76 89F84E89 .N%.v'&.G.ČA.&.G.&.W..-..Þ....ÖE 0000E0
 08EC8327 8506619A 0CB01E8D 27A8060A 9A8A5E8D 27A20287 9A805E8D 1FA5A5A5 EEE..^¯...À'.^.....¨'..¯..■.ç'.$. 000100
 5E8D1FA5 A5A5A5DA 8E1E0716 F088927E 8D08C483 27D407A1 9A27BA03 879ADC88 .É.ñ.¤'.À.$'.á..-..Þ....ÖEEEE..^ 000120
 879AB45E 80825689 80468902 57132607 0326885E C427F104 6E9A27D9 01FA9A92 ..'.)'.n.þ'á^¡&..&.W..F¯.Vý.^Ç.. 000140
 A19A2811 03B79ADC 8808EC83 280C0661 9A0CB01E 8D280206 0A9A8A5E 8D27F902 .''.^.....(.. ..■..(.$..É.ñ..(.À 000160
 046E9A28 3001FA9A 825E801F A5A5A5A5 DA8E1E07 16F08882 7E8D08C4 83282807 .+(.á..-..Þ....ÖEEEE..^..'.0(.n. 000180
 768803E3 C10E5F88 26867689 844E89F2 13C80306 77882604 4F882688 5EC426C9 è&á^¡&.O.&.w..à.`.NÇ.vÑ&._.è0..v 0001A0
 06619A0C 801E8028 70068A9A 28670287 9AA25E8D 286201FE 9A188D08 74C42688 ¡&át....$.b(.^À...g(...p(¯..¯..■. 0001C0
 A5A5DA8E 1E0716F0 88827E8D 08C48328 9907A19A 287F0387 9ADC8808 EC83287A z(.$..É.ñ..(.À..(.á..-..Þ....ÖEE 0001E0
```

```
Dump of file SATUR. [PCCOMMON.DUMP.DLL]DGM.TMP;1 on 18-APR-1990 10:44:12.07
File ID (620,6,0)   End of file block 186 / Allocated 188

Virtual block number 51 (00000033), 512 (0200) bytes

168C4680 007400CE 7E83A456 89A24689 279A046E 9A289E01 FA9A825E 8D1FA5A5 EE..^..*..(.n..'.FÅ.VÊ.-ö.t..F¥. 000000
56888446 88845689 824689F6 561BF446 28825688 80468804 C48324CB 0C4E9A50 P.N.ü$.á..F¯.Vý+F¶.V-.F..V..FÇ.V 000020
068A9A28 F002879A 825E8028 E802879A 825E8094 56899246 89FA561B F8462886 Ñ+F%.V*.F..V..^....Š(.^....Þ(... 000040
8808EC83 29140699 9A290A06 8A9A2905 02879A92 5E802900 02879A92 5E8028F8 ½(.^.....).^.....)....)....).å.. 000060
A65E8D1F A5A5A5A5 DA8E1E07 16F088A6 7E8D08C4 83285A07 7D9A2919 03879A0C É.ñ..).).Z(.á..-Ì.Þ....ÖEEEE..^Ì 000080
08C48329 7107A19A 29480387 9ADC8808 EC832946 06619A0C 801E8029 3C01FA9A .*.<)..¯..a.F).å..É.ñ.K).Å.q).á. 0000A0
FA9A9A5E 8DA276FF A476FFEC 76FFEE76 FF1FA5A5 A5A5DA8E 1E0716F0 889A7E8D .¬..Þ....ÖEEEE..v¥.vå.vÊ.vÅ.^..* 0000C0
83AE4689 14C48324 8514959A 50168C46 8D5016F4 46805052 28E3046E 9A297601 .v).n.D(RP.F¶.P.F¥.P...ç$.á..FÖ. 0000E0
80C8000C CAC95F5E 1F00E8AE 468804C4 8328840E 059A5016 8C46800D 7400CE7E ~ö.t..F¥.P...Ç(.á..FÜ$..^_èò..å. 000100
C7005689 CE468900 4205FE56 89FC4689 0C56880A 4688088E 24E4881E 56570000 ..WV.¡0$.Å.F..V..F=.V±.B.¯Fö.VÅü 000120
FF0319E9 C0280573 01A07E83 0000FFFF 9A5016A0 46800676 FF0876FF 0001AC46 F¯...v..v..F..P......~..s.+åÖ... 000140
E0880675 FA4608F8 46880875 C008A646 890000FF FF9A5016 F8468006 76FF0876 v..v..F%.P......FÌ.åu..F%.F*u.¡Å 000160
768803E3 C10E5F88 26CE5EC4 0000FFFF 9A5016A8 46800676 FF0876FF 02F4E98A .Ö¶..v..v..F´.P.....á^öå._.èD..v 000180
06619A0C 801E802A 50068A9A 2A470287 9AA85E8D 2A4201FE 9A188008 74C426CE öåát....±.B*.^...G*...P*.. ..a. 0001A0
A5A5DA8E 1E0716F0 88987E8D 08C4832A 7907A19A 2A5F0387 9ADC8808 EC832A5A Z*.å..É.ñ.,*.Å.y*.á..-..Þ....ÖEE 0001C0
73000130 057C117F D208A456 89A24689 2933046E 9A2A7E01 FA9A985E 8D1FA5A5 EE..^..*.-*.n.3).FÅ.VÊ.0..|.=..s 0001E0

Dump of file SATURN:[PCCOMMON.DUMP.DLL]DGM.TMP;1 on 18-APR-1990 10:44:12.07
File ID (620,6,0)   End of file block 186 / Allocated 188

Virtual block number 52 (00000034), 512 (0200) bytes

8826CE5E C40000FF FF9A5016 E6468D06 76FF0876 FF0000A4 46C70001 A246C70A .úFÅ..úFÊ...v..v..FÌ.P.....á^öå. 000000
9AE65E8D 1FA5A5A5 A5DA8E1E 0716F088 987E8D0A 57882608 47032603 E0C10E47 G.èÅ.å.G.å.W..¯..Þ....ÖEEEE..^Ì. 000020
9A2AF203 879ADC88 08EC832A ED06619A 0C801E8D 2AE3060A 9A985E8D 2ADA0287 ..Ö*.^....D*..¯..a.Ü*.å..É.ñ..*. 000040
6E9A2B11 01FA9A90 5E8D1FA5 A5A5A50A 8E1E0716 F088907E 8D08C483 28C07A1 Å..+.á..-..Þ....ÖEEEE..^..*..+.n 000060
0A9A985E 8D283102 879AEA5E 8D045689 02468902 57132607 0326CE5E C4282904 .)+á^öå..å.W..F0.Vå.^ð...1+.^... 000080
7E8D08C4 83286307 A19A2849 03879ADC 8808EC83 28440661 9A0C801E 80283A06 .:+..¯..a.D+.å..É.ñ.I+.Å.c+.á..- 0000A0
4F8826CE 5EC42A3A 046E9A28 6801FA9A 885E8D1F A5A5A5A5 DA8E1E07 16F08888 ..Þ....ÖEEEE..^..*.h+.n.:*á^öå.O 0000C0
7E8D0A57 88260847 032603E0 C10E4788 26087689 064E89F2 13C80306 77882604 .å.W..Å.´.N0.vÅå.G.èÅ.å.G.å.W..¯ 0000E0
801E8028 84060A9A 885E8028 A802879A EE5E8D1F A5A5A5A5 DA8E1E07 16F08888 ..Þ....ÖEEEE..^¥...¨+.^....Ç+..¯ 000100
1E0716F0 88907E8D 08C48328 D007A19A 28C30387 9ADC8808 EC8328BE 06619A0C ..a./+.å..É.ñ.ü+.Å.I+.á..-..Þ... 000120
46890257 13260703 26CE5EC4 28FA046E 9A28E201 FA9A905E 8D1FA5A5 A5A5DA8E .ÖEEEE..^..*.ã+.n.*+á^öå..å.W..F 000140
08EC832C 1506619A 0C801E8D 2C08060A 9A885E8D 2C020287 9AF25E8D DC56890A Ö.VÊ.^.........^............å. 000160
5E8D1FA5 A5A5A5DA 8E1E0716 F088807E 8D08C483 2C3407A1 9A2C1A03 879ADC88 .É.ñ...Å.4,.á..-..Þ....ÖEEEE..^ 000180
E076890E 4E89F213 C8030677 8826044F 8826CE5E C42AD204 6E9A2C39 01FA9A80 ..*.9,.n.0*á^öå.O.å.W..å.¯.N8.vÅ 0001A0
46890856 88064688 88568986 46890C56 88DA4688 805689AE 46890456 88024688 .F0.VÅ.FÜ.V¯.FÖ.VÊ.FÑ.V¡.F0.VÅ.F 0001C0
76FF0000 FFFF9A50 16E44680 0676FF08 76FF8C56 898A4689 D688C188 84568982 ý.VÇ.è.a.Fa.V¥.v..v..FÖ.P......v 0001E0

Dump of file SATURN:[PCCOMMON.DUMP.DLL]DGM.TMP;1 on 18-APR-1990 10:44:12.07
File ID (620,6,0)   End of file block 186 / Allocated 188

Virtual block number 53 (00000035), 512 (0200) bytes

5EC40000 FFFF9A50 16E24680 0676FF08 76FF0000 FFFF9A50 16F64680 0676FF08 ..v..F-.P......v..v..Fã.P.....á^ 000000
261477FF 265016AE 4680A076 FFF876FF FA76FF00 6A000A87 FF26000C 87FF26FC *å.ñÉ.å.ñÖ.j..v*.vÑ.v..F¨.På.W.å 000020
30A64689 0000FFFF 9A50168E 4680AC76 FFA276FF E276FFF6 76FFE476 FF1277FF .W..vÖ.v-.vã.vÅ.v¯.F/.P..  ..FÌ= 000040
C80008CA C95F5E1F 00E8C028 02E88AE0 88057400 A67E830F E88AE588 05758789 ¿.u.¡Ì.Š..-Ì.t.¡Å.Š.+åŠ..^ èò..à 000060
88261247 8826FC5E C4FE5689 FC468916 56881446 88D88E29 86881E56 57000048 H..WV.¡Ñ).Ä.F..V..F=.V±á^*Ï.G.å. 000080
00127E83 FA46897A 478826F4 5689F246 89004205 C28CC388 EC5689EA 46891457 W..Fõ.VŠ.û.ó.8..F¨.V¶å.Gz.F*.-.. 0000A0
46C70A73 01087E83 067C127F 000A7E83 0424E98A D4880673 02107E83 067C0E7F ..|..-..s.¡Å.Ö$..-....|..-..s.úF 0000C0
83000106 46C70575 00067E83 067F0C06 7E830C7C 00067E83 00000A46 C7000108 ...úF.....-..|..-.....~..u.úF.... 0000E0
2D8601FE 9A188008 74C426F2 768803E3 C10E5F88 26F25EC4 0142E903 7402FA7E -*.t.Ö8.á^ å._.èD..v·ååt....±.Ñ- 000100
20D30387 9ADC8808 EC832DCE 06619A0C 801E802D C4068A9A 20880294 9A085E8D .^....É·...á·..¯ ..a.ö-.å..É.ñ.å- 000120
9A2DF201 FA9AD05E 8D1FA5A5 A5A5DA8E 1E0716F0 88D07E8D 08C4832D ED07A19A .Å.Ü-.á..-Å.Þ....ÖEEEE..^Å.*.·-. 000140
26084703 2603E0C1 0E478826 F25EC400 010846C7 05700001 30084689 28A3046E n.Ê+.FÅ=..).úFÄ..á^·å.G.èÅ.å.G.å 000160
060A9AD0 5E802E30 02889A0C 5EC41FA5 A5A5A5DA 8E1E0716 F088D07E 800A5788 .W..-Å.Þ....ÖEEEE.á^....O..^Å... 000180
C87E8D08 C4832E62 07A19A2E 4803879A DC8808EC 832E4306 619A0C80 1E8D2E39 9...  ..a.C..å..É.ñ.H..Å.b..á..-à 0001A0
26070326 F25EC42E 82046E9A 2E6701FA 9AC85E8D 1FA5A5A5 A5DA8E1E 0716F088 .Þ....ÖEEEE..^å.*.g..n...á^·å.-å 0001C0
0C801E8D 2E93060A 9AD05E8D 2E8A0288 9A045F8D 0C5EC4E4 5689E246 89025713 .W..Fã.Vöá^.._........^Å.......¯. 0001E0
```

```
Dump of file SATURN:[PCCOMMON.DUMP.DLL]DGM.TMP;1 on 18-APR-1990 10:44:12.07
File ID (620,6,0)   End of file block 186 / Allocated 188

Virtual block number 54 (00000036), 512 (0200) bytes

 8E1E0716 F088C07E 8D08C483 2E8C07A1 9A2EA203 879ADC88 08EC832E 9D06619A .a....$..É.Ñ.Å..Å.¥..ó..~å.Þ.... 000000
 C8030677 8826044F 8826F25E C420AE04 6E9A2EC1 01FA9AC0 5E8D1FA5 A5A5A50A ÖEEEE..^à.ª.è..n.Ü-ó^·&.O.&.w..à 000020
 DA8E1E07 16F088E2 7E8D0E56 880C4688 08468908 46881BE8 E87689E6 4E89F213 . .Nl.vÖŠ..F..FÄ.F..V..~ã.Þ....Ö 000040
 75C00800 0012F09A 016A006A EA76FFEC 76FF0085 E9037F01 D87E831F A5A5A5A5 EEEE..~Á...Öç..vš.vöj.j..Þ....åu 000060
 FF507F0C 067E8356 7C08067E 830C7E09 067E8306 7C08067E 830260E9 8AD58806 .¡f.Öm..~..|..~..~..~..|V.~...P. 000080
 0FC046C7 0C750806 7E830674 08067E83 F05689EE 46890000 13089AEA 76FFEC76 vš.vö......fŸ.VÞ.~..t..~..u.úFå. 0000A0
 76FF0000 C246C700 08C046C7 0A750C06 7E830674 09067E83 16EB0000 C246C700 .úfô..Š..~..t..~..u.úfå..úFó...v 0000C0
 00001367 9A505299 D84688EA 76FFEC76 FF000015 A49AC076 FFC276FF EA76FFEC š.vö.vö.vå.Ê....vš.vö.FÁ.RP.g... 0000E0
 8AD68806 75C00800 0013809A 036A006A EA76FFEC 76FF01EA E98AD588 0675C008 .åu.¡f.Öò..vš.vöj.j.......åu.¡ø. 000100
 F8563912 56881046 8800F856 8301F646 8308E800 00F846C7 0001F646 C70101E9 Öl.úF~..úF%..Š..F~..V%..F..V.9V% 000120
 C10E4788 26F25EC4 00E7E903 7402FA7E 830142E9 0372F646 39087C01 4CE9037E ~.ÖL.|.9F~r.Ö8..~ª.t.Öô.ó^·&.G.é 000140
 C403E3C1 F65E881F A5A5A5A5 DA8E1E07 16F088C8 7E8D0A57 88260847 032603E0 Å.&.G.&.W..~à.Þ....ÖEEEE..^~èD.ó 000160
 9ADC8808 EC833032 J6619A0C 801E8D30 28060A9A C85E8D30 1F02889A 18800C76 v.......0.^à...(0..¯..a.20.š..É. 000180
 FA9AD05E 8D1FA5A5 A5A5DA8E 1E0716F0 88007E8D 08C48330 5107A19A 30370387 ñ.70.Å.00.ó..~Å.Þ....ÖEEEE..^Å.ª 0001A0
 5EC403E6 C1F6768B DC56890A 46890257 13260703 26F25EC4 3077046E 9A305601 .V0.n.w0ó^·&..&.W..FÖ.VÉ.v~èl.ó^ 0001C0
 9ADC8808 EC833092 06619A0C 801E8D30 88060A9A C85E8D30 7F02889A 0458800C ..X.....0.^à....0..¯..a..0.š..É. 0001E0

Dump of file SATURN:[PCCOMMON.DUMP.DLL]DGM.TMP;1 on 18-APR-1990 10:44:12.07
File ID (620,6,0)   End of file block 186 / Allocated 188

Virtual block number 55 (00000037), 512 (0200) bytes

 FA9AB85E 8D1FA5A5 A5A5DA8E 1E0716F0 88B87E8D 08C48330 8107A19A 309703B7 ñ..0.Å.¥0.ó..~¡.Þ....ÖEEEE..^|.ª 000000
 881BE8E0 76890E4E 89F213C8 03067788 26044F88 26F25EC4 2E28046E 9A308601 .Ñ0.n.(.ó^·&.O.&.w..à.·.NB.vÅŠ.. 000020
 DA468006 76FF1FA5 A5A5A5DA 8E1E0716 F088DA7E 8D0E5688 0C460303 E0C1F646 F-èÅ..F..V..~Ö.Þ....ÖEEEE..v..FÖ 000040
 7E8076E8 8ADF8805 74C0080E C4832987 048C9AEA 76FFEC76 FF5016E2 46805016 .P.Få.P.vš.vö.¥..).ó..åt.¡Ö.Šv.~ 000060
 15689AEA 76FFEC76 FF597E01 D87E83FE 9EE91FA5 A5A5A51F 161E0716 DA7680E2 å.vÖ.....EEEE.Ö.±.~Å.~Y.vš.vö.h. 000080
 D0080000 15849A00 (A006A01 6A006AEA 76FFEC76 FF49E88A D5880575 C0080000 ...åu.¡f.Šl.vš.vöj.j.j.|.......Å 0000A0
 FF117F0C 067E8317 7C08067E 830C7E09 067E8306 7C08067E 832DE88A D5880575 u.¡f.Š·.~..|..~..~..~..|..~..... 0000C0
 5700012E C80012CA C?5F5E1F 00E8C028 00002F78 9AEE76FF F076FFEA 76FFEC76 vš.vö.vÞ.vŸ.(/..+åŠ..^_èò..à...W 0000E0
 57882612 478826FF 0C9EC4FF 0E9689FF 0C868918 56881646 88088E2D 17881E56 V.¡.~.Å.F..V.........ó¯..&.G.&.W 000100
 FF0A8689 7A478826 FF009689 FEFE8689 004205C2 8CC388FE EC9689FE EA868914 ...ò±..š±.û.ô.B...±±....&.G±.... 000120
 7E83067F 127C0014 7E8318E8 02DEE98A D4880873 03127E83 067C107F 00147E83 .~....|..~..s.¡å.Ö8.Š..~..|....~ 000140
 010846C7 0A730108 7E83067C 127F000A 7E830000 1446C700 1E1246C7 0A761E12 ..v.úF...úF....~....|..~..s.úF.. 000160
 C0280001 0C46C705 75000C7E 83000106 46C70575 00089906 46880000 0A46C700 .úF....F...Åu.úF....~..u.úF...+å 000180
 037EFF08 96391456 88124688 00FF0896 8301FF06 86830AE8 FF068689 FF088689 ........Š...........F. V.9...~. 0001A0
 0E478826 FEFE9EC4 00F7E903 7402FF0A 8E83014F E90372FF 06863909 7C015AE9 Öz.|.9...r.Ö0../...t.Ö%.'.±±&.G. 0001C0
 C1FF069E 881FA5A5 A5A5DA8E 1E0716F0 88FEE28E 800A5788 26084703 2603E0C1 èÅ.&.G.&.W../ä±.Þ....ÖEEEE.....è 0001E0

Dump of file SATURN:[PCCOMMON.DUMP.DLL]DGM.TMP;1 on 18-APR-1990 10:44:12.07
File ID (620,6,0)   End of file block 186 / Allocated 188

Virtual block number 56 (00000038), 512 (0200) bytes

 EC833286 06619A0C 801E8032 AC060A9A FEE29E8D 32A30288 9A18800E 76C403E3 0.óv......É2..ã±...¯2..¯..a.Ñ2.š 000000
 1FA5A5A5 A50A8E1E 0716F088 FEDA8E8D 08C48332 D707A19A 32880387 9ADC8808 ..É.Ñ.É2.Å.a2.ó../Ö±.Þ....ÖEEEE. 000020
 F09689FE EE868902 57132607 0326FEFE 9EC43301 046E9A32 DC01FA9A FEDA9E8D ..Ö±.ª.É2.n..3ó.±±&..&.W...¥±..Þ 000040
 0C801E8D 3313060A 9AFEE29E 80330A02 889A0458 800E5EC4 03E6C1FF 068688FE ±.Ñ..èl.ó^..X......3..ã±....3..¯. 000060
 1E0716F0 88FED28E 8D08C483 333E07A1 9A332203 879ADC88 08EC8333 1006619A .a..3.š..É.ñ."3.Å.>3.ó../Ø±.Þ... 000080
 77882604 4F8826FE FE9EC430 17046E9A 334301FA 9AFED29E 801FA5A5 A5A50A8E .ÖEEEE...Ø±.ª.C3.n..0ó.±±&.O.&.w 0000A0
 FEEE8E8D 1056880E 460303E0 C1FF0686 8810E8FE F4868 9FE F28E89F2 13C80306 ..à.·..±.Ñ¶±Š.....èÅ..F..V../¥± 0000C0
 89FF1082 89FEF096 88FEEE86 8803E6C1 FF068688 1FA5A5A5 A50A8E1E 0716F088 .Þ....ÖEEEE..Ñ..èl...¥±..Þ±..... 0000E0
 0C4688FE 80E9FF16 9289FF14 8289FEF4 9688FEF2 868803E6 C1FF0686 88FF1292 ....Ñ..èl...·±..¶±........Ö.±.F. 000100
 86C71CE8 0000FEF8 86C70011 FEF686C7 2AE80000 FEF886C7 0040FEF6 86C72CE8 Š,ú.~±ð.ú.½±..Š°ú.~±..ú.½±..Š.ú. 000120
 86FFFEEC 86FFE4E8 D8740002 30CF7400 01300CE8 0EE80000 FEF886C7 0010FEF6 ~±..ú.½±..Š.Š.=..tü=..tÅŠÖ.Ñš±.Ñ 000140
 FEFA8689 0000FFFF 9AFEEA86 FFFEEC86 FFFF0496 89FF0286 890000FF FF9AFEEA ò±..............Ñš±.Ñõ±.......ª± 000160
 004287FF 260044B7 FF260C88 068E02E3 C1065E88 FEEA86FF FEEC86FF FEFC9689 ..=±.Ñš±.Ñõ±.^.èD...¡.&.ñD.&.ñ8. 000180
 86FFFEEC 86FF0000 348A9AFE F686FFFE F886FFFE EA86FFFE EC86FF00 0034A59A .É4...Ñš±.Ñõ±.Ñ%±.Ñ-±.¤4...Ñš±.Ñ 0001A0
 86FF0000 FFFF9A50 16FF1086 80FEEA86 FFFEEC86 FF0000FF FF9A016A 006/.¯EA ò±j.j.......Ñš±.Ñõ±.....P......Ñ 0001C0
 9AFEEA86 FFFEEC86 FF0000FF FF9A5016 FF108680 1276FF14 76FFFEEA 86FF?¯C å±.Ñõ±.v..v......P......Ñš±.Ñõ±. 0001E0
```

```
Dump of file SATURN:[PCCOMMON.DUMP.DLL]DGM.TMP;1 on 18-APR-1990 10:44:12.07
File ID (620,6,0)   End of file block 186 / Allocated 188

Virtual block number 57 (00000039), 512 (0200) bytes

EAB6FFFE ECB6FF00 00FFFF9A FF0286FF FF04B6FF FEEAB6FF FEECB6FF 0000FFFF .....Ãs±.Ão±.Ã...Ã........Ãs±.Ão 000000
1E565700 0036C800 14CAC95F 5E1F00EB C0280000 FFFF9AFE FAB6FFFE FCB6FFFE ±.Ã=±.Ã*±.....+âS..^ èò..à6..WV. 000020
89EA4689 14578B26 12478B26 FB5EC4FA 5689F846 89185688 16468808 8E319388 ¡.1.Ã.F..V..F%.V*6^%Ĩ.G.&.W..Fõ. 000040
04880675 14460812 4688F646 897A4788 26F05689 EE468900 4205C28C C388EC56 V&.û.6.B..FŸ.VÞ&.Gz.F-.F..F.u.¡â 000060
99064688 00000A46 C7000108 46C70A73 01087E83 067C127F 000A7E83 0323E98A .Õ#..-....|..-..s.úF...úF....F.. 000080
478826EE 5EC401C8 E9F64688 00010C46 C7057500 0C7E8300 010646C7 05750008 .Âu.úF....-..u.úF....F-Õù.á^Ÿ&.G 0000A0
889A125E C41FA5A5 A5A5DA8E 1E0716F0 88DA7E80 0A578826 08470326 03E0C10E .éÂ.&.G.&.W..-Ö.Þ....ÖEEEE.á^... 0000C0
A19A3591 03879ADC 8808EC83 358C0661 9A0C801E 80358206 0A9ADA5E 80397902 .y5.^Ö....5..¯..a..5.&..É.Ñ..5.À 0000E0
046E9A35 8001FA9A D25E8D1F A5A5A5A5 DA8E1E07 16F088D2 7E8008C4 8335A807 .¨5.á..-Ø.Þ....ÖEEEE..^Ø.ª.¯5.n. 000100
DA5E8D35 D302889A 045F8D12 5EC4E456 89E24689 02571326 070326EE 5EC435C8 úSá^Ÿ&.‗&.W..Fã.VÖó^.......Æ5.^Ö 000120
08C48336 0507A19A 35E80387 9A0C8808 EC8335E6 06619A0C 801E8D35 DC060A9A ...É5..¯..a.Î5.&..É.Ñ.Š5.À..6.á. 000140
26EE5EC4 329A046E 9A360A01 FA9ACA5E 8D1FA5A5 A5A50A8E 1E0716F0 88CA7E8D .-ò.Þ....ÖEEEE..^ò.ª..6.n..2á^Ÿ& 000160
800874C4 26EE7688 03E3C10E 5F8826E8 7689E64E 89F213C8 03067788 26044F88 .O.&.w..à.·.N|.vÖ&._.èD..vŸ&át.. 000180
8808EC83 36540661 9A0C801E 80364A06 8A9A3641 02879A0E 5E80363C 01FE9A18 ..±.<6.^....A6...J6..¯..a.T6.&.. 0001A0
CA5E8D1F A5A5A5A5 DA8E1E07 16F088CA 7E8008C4 83367307 A19A3659 03879ADC É.Ñ.Y6.À.s6.á..-ò.Þ....ÖEEEE..^ò 0001C0
74C426EE 768803E3 C10E5F88 26EE5EC4 F45689F2 46893696 046E9A36 7801FA9A .ª.x6.n..6.F·.V¶á^Ÿ&._.èD..vŸ&át 0001E0
```

```
Dump of file SATURN:[PCCOMMON.DUMP.DLL]DGM.TMP;1 on 18-APR-1990 10:44:12.07
File ID (620,6,0)   End of file block 186 / Allocated 188

Virtual block number 58 (0000003A), 512 (0200) bytes

EC833686 06619A0C 801E8036 AC068A9A 36A30287 9A085E8D 369E01FE 9A188008 ....±..6.^....£6...¯6..¯..a.Ñ6.& 000000
8D1FA5A5 A5A5DA8E : 0716F0 88D27E8D 08C48336 D507A19A 36B80387 9A0C8808 ..É.Ñ.É6.À.Í6.á..-Ø.Þ....ÖEEEE.. 000020
16F088E2 7E8D1456 8a124688 38E8FE56 89FC4689 3571046E 9A360A01 FA9AD25E ^Ø.ª.Ö6.n.q5.F=.V±Š;.F..V..-ã.Þ. 000040
5689FC46 890A5688 084688F4 5689F246 89105688 0E46881F A5A5A5A5 DA8E1E07 ...ÖEEEE..F..V..F·.V¶.F..V..F=.V 000060
76FFE876 FFF276FF F476FF23 75030C7E 83C5E8FE 2DE90375 0002300A E80CE8FE ±Š.Š.=..u.Ö·±Šé.-..u#.v¶.v·.vÖ.v 000080
7E832875 01087E83 00E8E910 C4833772 07D99AEA 76FFEC76 FFE276FF E476FFE6 |.vö.vã.v&.vö.\.r7.á.ÖS..-..u+.- 0000A0
9AEA76FF EC76FFE2 76FFE476 FFE676FF E876FFF2 76FFF476 FF0676FF 2575000A ..u%.v..v¶.v·.vÖ.v|.vö.vã.v&.vö. 0000C0
76FFE276 FFE476FF E676FFE8 76FFF276 FFF476FF FC76FF23 E812C483 37970749 |..7.á.Š#.v=.v¶.v·.vÖ.v|.vö.vã.v 0000E0
00003408 9AEA76FF EC76FF00 8EE90374 020C7E83 12C48331 00063F9A EA76FFEC &.vö.?..1.á..-..t.Ö...v&.vö..4.. 000100
9A006A00 6AEA76FF EC76FF00 00382F9A 116A006A EA76FFEC 76FFD456 89D24689 .FØ.Vâ.v&.vöj.j../8...v&.vöj.j.. 000120
FFEC76FF 005689CE 4689E856 88E64688 CC5689CA 4689E456 88E24688 00003457 W4...Fâ.Vö.Fò.Vä.F|.VÖ.Fö.VÂ.v&. 000140
C02800B8 FC462BF2 4688026A 006AEA76 FFEC76FF 0000346A 9A5016CA 4680EA76 vö.Fò.P.j4...v&.vöj.j..F·+F=.Â+â 000160
469AD276 FFD476FF EA76FFEC 76FF0000 34909AEA 76FFEC76 FF0000FF FF9A5052 RP......v&.vö..4...v&.vö.vâ.vØ.F 000180
1C5688 1A 4688D88E 34D1881E 56570000 6CC80014 CAC95F5E 1F00E8C0 28000034 4..+âS..^ èò..àl..WV.¡14.Ã.F..V. 0001A0
46890042 05C28CC3 88CE5689 CC468914 578B2612 478826F0 5EC4F256 89F04689 .FÞ.V·á^ÞĨ.G.&.W..Fä.Vö.û.ô.B..F 0001C0
C02802E8 00018805 7400087E 83067F00 7C000A7E 83EE4689 7A478826 D8568906 ø.VÂ&.Gz.FŸ.-..|....-..t.¡..Š.+â 0001E0
```

```
Dump of file SATURN:[~CCOMMON.DUMP.DLL]DGM.TMP;1 on 18-APR-1990 10:44:12.07
File ID (620,6,0)   End of file block 186 / Allocated 188

Virtual block number 59 (0000003B), 512 (0200) bytes

06468807 ADE98AD4 88067E0C 067E8306 7C00067E 830C7418 46081646 88D04689 .FÂ.F..F.t..-..|..-..-.¡â.ÕÙ..F. 000000
8826065E C40366E9 EE468800 010C46C7 0575000C 7E830001 0646C705 75D00899 ..Âu.úF....-..u.úF....FŸÕf.á^ø&. 000020
38F7068A 9A38EE02 879A125E 8D38E901 FE9A188D 0874C426 D6768803 E3C10E5F _.èD..vø&át....±.Ö8.^....Ÿ8...%8 000040
F088AC7E 8D08C483 392007A1 9A390603 879ADC88 08EC8339 0106619A 0C801E80 ..¯..a..9.&..É.Ñ..9.À. 9.á..-¯.Þ 000060
D65EC4E0 5689DE46 89394304 6E9A3925 01FA9AAC 5E8D1FA5 A5A5A5DA 8E1E0716 ....ÖEEEE..^¯.ª.X9.n.C9.F8.VÂá^ø 000080
068A9A39 5002879A 0E5E8039 4801FE9A 18800874 C4260676 8803E3C1 0E5F8826 &._.èD..vø&át....±.K9.^....P9... 0000A0
A47E8D08 C4833982 07A19A39 6803879A 0C8808EC 83396306 619A0CB0 1E8D3959 Ÿ9..¯..a.c9.&..É.Ñ.h9.À..9.á..-Ê 0000C0
88DC5689 0A468936 34046E9A 398701FA 9AA45E8D 1FA5A5A5 A5DA8E1E 0716F088 .Þ....ÖEEEE..^É.ª..9.n.46.FÖ.VÉ. 0000E0
032603E0 C10E4788 26D65EC4 1FA5A5A5 A5DA8E1E 0716F088 E67E8D18 56881646 F..V..-|.Þ....ÖEEEE.á^ø&.G.éÂ.&. 000100
845E8039 D302879A E65E8D1F A5A5A5A5 DA8E1E07 16F08884 7E8D0A57 88260847 G.&.W..‗Ç.Þ....ÖEEEE..^|...Æ9.^Ç 000120
08C4833A 0507A19A 39E80387 9A0C8808 EC8339E6 06619A0C 801E8039 DC060A9A ...É9..¯..a.Î9.&..É.Ñ.S9.À..:.á. 000140
26065EC4 3A22046E 9A3A0A01 FA9A9C5E 8D1FA5A5 A5A5DA8E 1E0716F0 889C7E8D .-..Þ....ÖEEEE..^..ª..:.n.":á^ø& 000160
0C801E8D 3A33060A 9A845E8D 3A2A0287 9AEA5E8D C65689C4 46890257 13260703 ..&.W..Fá.Vó.^ö...*:.^Ç...3:..¯. 000180
8E1E0716 F088947E 8D08C483 3A5C07A1 9A3A4203 879ADC88 08EC833A 3006619A .Ø.=:.&..É.Ñ.B:.À.\:.á..-..Þ.... 0001A0
C8030677 88260 44F 8826065E C438E104 6E9A3A61 01FA9A94 5E8D1FA5 A5A5A5DA ÖEEEE..^..ª.a:.n.ÃBá^ø&.O.&.w..â 0001C0
1FA5A5A5 A5DA8E1E 0716F088 E67E8D00 08051856 88164688 CA7689C8 4E89F213 .·.Nâ.vö.F..V.....-|.Þ....ÖEEEE. 0001E0
```

Dump of file SATURN:[PCCOMMON.DUMP.DLL]DGM.TMP;1 on 18-APR-1990 10:44:12.07
File ID (620,6,0) End of file block 186 / Allocated 188

Virtual block number 60 (0000003C), 512 (0200) bytes

```
A5A5A5A5 DA8E1E07 16F08894 7E8D0A57 88260847 032603E0 C10E4788 2608468E .FÄ&.G.éÅ.&.G.&.W..-..Þ. ..ÖEEEE 000000
9ADC8808 EC833AD2 06619A0C 801E8D3A C8060A9A 945E8D3A 8F02879A E65E8D1F ..^l...e:.^....à:..¯.:a.0..$..É. 000020
FA9A9C5E 8D1FA5A5 A5A50A8E 1E0716F0 889C7E8D 08C4833A F107A19A 3AD70387 ñ.a:.Å.þ:.á..-..Þ....ÖEEEE..^..' 000040
3B160287 9AEA5E8J 8E56898C 46890257 13260703 26065EC4 380E046E 9A3AF601 .-:.n..;á^e&..&.W..F¥.V/.^ö....; 000060
3B4807A1 9A382E03 879ADC88 08EC8338 2906619A 0C801E8D 3B1F060A 9A945E8D .^.....;..¯..a.);.$..É.ñ..;.Å.H; 000080
C439C804 6E9A3840 01FA9AA4 5E8D1FA5 A5A5A50A 8E1E0716 F088A47E 8008C483 .á..-É.Þ....ÖEEEE..^É.'.H;.n.ù9á 0000A0
E3C10E5F 88265F74 00007E83 C27689C0 4E89F213 C8030677 8826044F 8826065E ^e&.0.&.w..à.·.Nå.vö.-Å.t_&._.èO 0000C0
0C801E8D 3893068A 9A388A02 879A085E 80388501 FE9A1880 0874C426 06768803 ..va&åt....:..;.^.....;....;..¯. 0000E0
8E1E0716 F0889C7E 8008C483 388C07A1 9A38A203 879ADC88 08EC8338 9D06619A .a..;.$..É.ñ.Å;.Å.¥;.á..-..Þ.... 000100
56881246 8870E8F6 5689F446 893A8704 6E9A38C1 01FA9A9C 5E8D1FA5 A5A5A50A ÖEEEÉ..^..'.è;.n.ñ:.F¶.V-Šp.F..V 000120
C4468902 57882607 8826165E C40C5689 DA468910 5688DE46 88E05689 DE468914 ..F0.VÅ.F..V..FÖ.VÉá^.&..&.W..Fá 000140
268E5689 8C46890A 57882608 478826CA 5689C846 89065788 26044788 26C65689 .Vö&.G.&.W..Fà.Vö&.G.&.W..F¥.V/& 000160
E8F65689 F446890A 56880846 880C7400 D07E83C2 5689C046 890E5788 260C4788 .G.&.W..Fá.Vö.-Å.t..F..V..F¶.V-Š 000180
C7057701 F47E8306 7C0D7F00 F67E8313 7400007E 8390E8FC 92E90375 0002300A .=..u.Õ.=Š..-Å.t..—...|..-¶.w.ú 0001A0
89FC4689 CA5688C8 4688FA56 89F84689 C65688C4 46886375 030C7E83 00000046 FÅ...-..uc.Fá.Vö.F%.V°.Fà.Vö.F=. 0001C0
4688FA56 89F84689 8E56888C 46880000 3CF99A50 16F8468D CC76FFCE 76FFFE56 V±.vö.vä.F%.P.'<...F¥.V/.F%.V°.F 0001E0
```

Dump of file SATURN:[PCCOMMON.DUMP.DLL]DGM.TMP;1 on 18-APR-1990 10:44:12.07
File ID (620,6,0) End of file block 186 / Allocated 188

Virtual block number 61 (0000003D), 512 (0200) bytes

```
FFDE76FF E076FF50 16F8468D 016A006A CC76FFCE 76FFFE56 89FC4689 C25688C0 Å.Vö.F=.V±.vö.väj.j..F%.P.vÅ.v8. 000000
006A006A CC76FFCE 76FF01F7 E9037500 D07E8303 99E90000 30319ADA 76FFDC76 vÉ.vÖ.1=..Ö...-Å.u.Ö%..vö.väj.j. 000020
CE76FFFE 5689FC46 89CA5688 C8468BFA 5689F846 89C65688 C4468800 003E229A .">...Fá.Vö.F%.V°.Fà.Vö.F=.V±.vö 000040
89C25688 C04688FA 5689F846 898E5688 8C468800 003D989A 5016F846 8DCC76FF .vä.F%.P..=...F¥.V/.F%.V°.Fá.Vö. 000060
DA76FFDC 76FFDE76 FFE076FF 5016F846 80026A00 6ACC76FF CE76FFFE 5689FC46 F=.V±.vö.väj.j..F%.P.vÅ.v8.vÉ.vÖ 000080
830C5619 DA4629E0 56190E46 29F65688 F4468800 F65E8301 F46E8300 00300F9A .Ö=...n¶..^-..F¶.V-)F8.VÅ)FÖ.VÉ. 0000A0
5688C446 880A4689 DC4689C0 28087D00 DC7E83DE 4689E046 89C02808 7D00E07E -Å.).+å.FÅ.F8.-É.).+å.FÉ.FÖ.Fá.V 0000C0
FFFE5689 FC4689F6 5613F446 03CA5688 C84688FA 5689F846 89F65613 F44603C6 6.F¶.V-.F%.V°.Fà.Vö.F¶.V-.F=.V±. 0000E0
5689F846 89F65618 F44628BE 5688BC46 8800003E 569A5016 F84680CC 76FFCE76 vö.vä.F%.P.V>...F¥.V/+F¶.V-.F%.V 000100
F8468D02 6A006ACC 76FFCE76 FFFE5689 FC4689F6 561BF446 28C25688 C04688FA °.Fá.Vö+F¶.V-.F=.V±.vö.väj.j..F% 000120
7E830000 3EA59ACC 76FFCE76 FF00003E 9A9ADA76 FFDC76FF DE76FFE0 76FF5016 .P.vÅ.v8.vÉ.vÖ..>...vö.vä.É>...~ 000140
006ACC76 FFCE76FF D45689D2 46890000 37AC9ACC 76FFCE76 FF00C3E9 0374020C ..t.Öü..vö.vä.¯7...F0.Vå.vö.väj. 000160
13F44603 C65688C4 46880000 37D09A00 6A006ACC 76FFCE76 FF00003E 869A116A j..Ñ>...vö.väj.j..Å7...Fá.Vö.F¶. 000180
CC76FFCE 76FFFE56 89FC4689 F65613F4 4603CA56 88C84688 FA5689F8 4689F656 V-.F%.V°.Fà.Vö.F¶.V-.F=.V±.vö.vä 0001A0
88C04688 FA5689F8 4689F656 18F4462B 8E5688BC 46880000 3F1A9A50 16F8468D .F%.P..?...F¥.V/+F¶.V-.F%.V°.Fà. 0001C0
E076FF50 16F8468D 026A006A CC76FFCE 76FFFE56 89FC4689 F65618F4 4628C256 Vö+F¶.V-.F=.V±.vö.väj.j..F%.P.vÅ 0001E0
```

Dump of file SATUR› [PCCOMMON.DUMP.DLL]DGM.TMP;1 on 18-APR-1990 10:44:12.07
File ID (620,6,0) End of file block 186 / Allocated 188

Virtual block number 62 (0000003E), 512 (0200) bytes

```
FFCC76FF CE76FF00 00381E9A CC76FFCE 76FF0000 3F529ADA 76FFDC76 FFDE76FF .v8.vÉ.vÖ.R?...vö.v8..8...vö.vä. 000000
0033F39A CC76FFCE 76FF00A4 E9037401 0C7E8301 99E90000 37C19AD2 76FFD476 vå.v0.è7..Ö...-..t.ÖÉ..vö.vä.µ3. 000020
4287FF26 004487FF 260C8806 8E02E3C1 065E88CC 76FFCE76 FFE45689 E2468900 ..fä.Vö.vö.vä.^.èD...¡.&.ñO.&.ñ8 000040
76FFFE56 89FC4689 CA5688C8 4688FA56 89F84689 C65688C4 46880000 3F639A00 ..c?...Fá.Vö.F%.V°.Fà.Vö.F=.V±.v 000060
C25688C0 4688FA56 89F84689 8E56888C 46880000 37F89A50 16F8468D CC76FFCE ö.vä.F%.P.%7...F¥.V/.F%.V°.Fá.Vö 000080
76FFDC76 FFDE76FF E076FF50 16F8468D 026A006A CC76FFCE 76FFFE56 89FC4689 .F=.V±.vö.väj.j..F%.P.vÅ.v8.vÉ.v 0000A0
CC76FFCE 76FF00EC E9000034 319AE276 FFE476FF CC76FFCE 76FF0000 FFFF9ADA Ö......vö.vä.vö.vä.14..Õ$..vö.vä 0000C0
FFCE76FF E45689E2 46890000 3ECD9ACC 76FFCE76 FFD45689 D2468900 0030FE9A .±=...F0.Vå.vö.vä.ë>...Fä.Vö.vö. 0000E0
004487FF 260C8806 8E02E3C1 065E88CC 76FFCE76 FF000040 529A116A 006ACC76 väj.j..Ra...vö.vä.^.èD...¡.&.ñO. 000100
89C65688 C4468800 003CD19A 016A006A CC76FFCE 76FF0000 40419A00 4287FF26 &.ñ8..Aa...vö.väj.j..1<...Fá.Vö. 000120
003C7E9A 5016F846 8DCC76FF CE76FFFE 5689FC46 89CA5688 C84688FA 5689F846 F%.V°.Fà.Vö.F=.V±.vö.vä.F%.P.-<. 000140
6ACC76FF CE76FFFE 5u89FC46 89C25688 C04688FA 5689F846 898E5688 8C468800 ..F¥.V/.F%.V°.Fá.Vö.F=.V±.vö.väj 000160
9ACC76FF CE76FF00 003C869A DA76FFDC 76FFDE76 FFE076FF 5016F846 8D026A00 .j..F%.P.vÅ.v8.vÉ.vÖ.Ñ<...vö.vä. 000180
76FFD476 FFCC76FF CE76FF00 003EF29A E276FFE4 76FFCC76 FFCE76FF 000030EA ö=...vö.vä.vö.vä.·>...vö.v8.vå.v 0001A0
18468808 8E384688 1E565700 0088C800 18CAC95F 5E1F00E8 C0280000 3E139AD2 0..>..+åŠ..^ èö..à...WV.¡F8.Ä.F. 0001C0
88261247 8826EA56 89E84689 0C578826 0A478826 E45EC4E6 5689E446 891A5688 .V..Fö.Vlá^öÉ.G.&.W..FÖ.Vö&.G.&. 0001E0
```

```
Dump of file SATURN:[PCCOMMON.DUMP.DLL]DGM.TMP;1 on 18-APR-1990 10:44:12.07
File ID (620,6,0)   End of file block 186 / Allocated 188

Virtual block number 63 (0000003F), 512 (0200) bytes

01AA46C7 E246897A 47B826CE 5689CC46 89004205 C28CC388 A85689A6 46891457 W..FI.V'.Û.Ô.B..Fä.VöL.Gz.FäÚF¯. 000000
FE568CFC 4689EC46 8D1FA5F2 000889DA 8E1E0716 F088EC7E 8D0E5688 0C468800 ..F..V..-&.Þ....ÖL...É..F&.F=.V± 000020
89025788 26078826 2D730847 3926067C 357F0A57 39260257 88260788 26FC5EC4 á^=&..&.W.&9W..5|.&9G.s-&..&.W.. 000040
4789269E 56889C46 88FC5EC4 02578926 0789260A 57882608 4788269E 56899C46 F..V.&.G.&.W.&..&.W.á^=.F..V.&.G 000060
88262F76 04473926 067F377C 06573926 0E578826 0C478826 FC5EC40A 57892608 .&.W.á^=&.G.&.W.&9W.|7..&9G.v/&. 000080
88FC5EC4 06578926 04478926 0E578826 0C478826 9A568998 46890657 88260447 G.&.W..F..V.&.G.&.W.&.G.&.W.á^=. 0000A0
03E0C10E 478826CC 5EC40213 E9037402 E27E830E 5789260C 4789269A 56889846 F..V.&.G.&.W..-ã.t.Ô..á^ä&.G.èA. 0000C0
80419502 889AFC5E C41FA5A5 A5A5DA8E 1E0716F0 88907E80 0A578826 08470326 &.G.&.W..-..Þ....ÖEEEE.á^=....A. 0000E0
8341C707 A19A41AD 03879ADC 8808EC83 41A80661 9A0C801E 80419E06 0A9A905E ^.....A.. ..=.'A.&..É.ñ.ÚA.À.úA. 000100
5EC441E7 046E9A41 CC01FA9A 885E8D1F A5A5A5A5 DA8E1E07 16F08888 7E8D08C4 á..-..Þ....ÖEEEE..^..'.äA.n.ÓAá^ 000120
F8060A9A 905E8041 EF02889A 045F80FC 5EC4D256 89004689 02571326 070326CC äL..&.W..FÀ.Vøá^=._....ÿA.^....% 000140
88807E8D 08C48342 2107A19A 42070387 9A0C8808 EC834202 06619A0C 801E8D41 A..¯..=..B.&..É.ñ..B.À.1B.á..-.. 000160
26044F88 26CC5EC4 387D046E 9A422601 FA9A805E 8D1FA5A5 A5A5DA8E 1E0716F0 Þ....ÖEEEE..^..'.&B.n.);á^ä&.O.& 000180
88807E8D 0A578826 08470326 03E0C10E 47882606 7689044E 89F213C8 03067788 .w..à.·.Nà.v=&.G.èA.&.G.&.W..-.. 0001A0
1E804275 060A9A80 5E8D426C 02889A08 5F8DFC5E C41FA5A5 A5A5DA8E 1E0716F0 Þ....ÖEEEE.á^=._....(B.^....uB.. 0001C0
0716F088 887E8D08 C483429E 07A19A42 8403879A DC8808EC 83427F06 619A0C80 ¯..=..B.&..É.ñ..B.À..B.á..-..Þ.. 0001E0

Dump of file SATURN:[PCCOMMON.DUMP.DLL]DGM.TMP;1 on 18-APR-1990 10:44:12.07
File ID (620,6,0)   End of file block 186 / Allocated 188

Virtual block number 64 (00000040), 512 (0200) bytes

89025713 26070326 CC5EC442 8E046E9A 42A301FA 9A885E80 1FA5A5A5 A5DA8E1E ..ÖEEEE..^..'.ÈB.n./Bá^ä&..&.W.. 000000
D906619A 0C801E8D 42CF060A 9A805E8D 42C60288 9A0C5F80 FC5EC4DA 56890846 FÀ.Vöá^=.....6B.^....üB..¯..=.\ 000020
A5A5DA8E 1E0716F0 88FF788E 8D08C483 42FA07A1 9A420E03 879A0C88 08EC8342 B.&..É.ñ.ßB.À.'B.á..ƒx..Þ....ÖEE 000040
F213C803 06778826 044F8826 CC5EC441 8D046E9A 42FF01FA 9AFF789E 8D1FA5A5 ÈÈ...x..'..B.n..Aá^ä&.O.&.w..à.· 000060
879A105E 80433101 FE9A188D 0874C426 CC768803 E3C10E5F 88260E76 890C4E89 .NÉ.vB&._.èD..vä&át....±.1C.^... 000080
436A07A1 9A434E03 879A0C88 08EC8343 4906619A 0C801E80 433F068A 9A433602 .6C...?C..¯..=.IC.&..É.ñ.NC.À.jC 0000A0
87046E9A 436F01FA 9AFF789E 8D1FA5A5 A5A5DA8E 1E0716F0 88FF788E 8D08C483 .á..ƒx..Þ....ÖEEEE...x..'.oC.n.ñ 0000C0
1F161E07 16EC768D 007E8DA2 5689A046 89125688 1046881D E8A25689 A0468943 C.F..VÀŠ..F..V..F..VÀ.-À.v&..... 0000E0
76FF0000 A246C700 01A046C7 0A7301A0 7E83067C 127F00A2 7E831FA5 F2000889 ¿..·É..-À...|..¯..s.úF...úFÀ...v 000100
56880846 88AE5689 AC468902 56880046 88E04689 04C48342 6400109A 1476FF16 ..v....dB.á..FÀ.FÀ.Vø.F¯.VÛ.FÀ.V 000120
C48A5689 884689DE 56880C46 88825689 80468906 56880446 88865689 844689DA Ö.FÇ.VÑ.Fà.V=.F¯.Vý.FÉ.Vø.F|.V□á 000140
1477FF26 5016AC46 8DE076FF 1476FF16 76FF006A 00DA87FF 26000C87 FF26E45E ^ö&.ñÉ.&.ñö.j..v..v..vÀ.F¯.P&.w. 000160
A4468900 002CE89A 50168C46 8DAA76FF A076FF06 76FF0876 FF0A76FF 1277FF26 &.w..v..v..v..v..v¯.F¥.P.Ò,...FÉ 000180
3816CAC9 5F5E1F00 E8C02802 E88AE088 057400A4 7E830FE8 8AE58805 7587893D =¿.u.¡Í.Š..-É.t.¡À.Š.+àŠ..^_èò.; 0001A0
7800022F 8C010300 7500023F 82010302 4000071E 11020300 7400023F 86010300 ...Ñ?..t.......M....?..u..../..¤ 0001C0
7C00022F A5010300 00000329 90000205 4200091F 8E020303 51000726 91020300 ....&..Q.../...B....)......É/..| 0001E0

Dump of file SATURN:[PCCOMMON.DUMP.DLL]DGM.TMP;1 on 18-APR-1990 10:44:12.07
File ID (620,6,0)   End of file block 186 / Allocated 188

Virtual block number 65 (00000041), 512 (0200) bytes

82000234 83010300 8000023F E0010302 D800071A 98020304 54000729 F8020300 ...«)..T........À...Ú?.......4... 000000
89000238 13010303 E100072A 20020301 6100071E 39020300 83000240 25010300 ...Xa......9...a... *..À....8... 000020
9200023F 97010301 0E000231 4A010300 00000737 40000205 5200091C 62020300 ...b...R...a7.......J1.......?... 000040
97000240 30010300 9600023F C5010302 EE00071A 72020300 9300023F 71010300 ...q?......r...Ÿ...é?.......0a... 000060
67000910 84020303 F400072C 8A020302 74000706 EC020301 F0000713 D4020300 ...Å...Þ...&...t.....,..¶.......g 000080
82000711 76020302 02000714 07020300 00000E40 69000200 00000043 29000205 ...)C.......ia...............v.... 0000A0
79000910 A4020302 89000706 DC020304 0500072C 9A020303 02000726 51020301 ...Q&.......,.......É.......É...y 0000C0
8C000918 81020304 1 )0072C AA020303 17000726 61020301 9400071D BC020305 ...¥.......a&......¯............. 0000E0
2A000726 71020305 G,J0091C 51020300 37000413 A0020302 9E00070A FD020305 ...»...........7...Q....-...q&..* 000100
21000916 03020302 80000708 00020300 45000415 48020305 9C000916 05020303 ...........H...E.......¯...Æ...| 000120
31000916 82020303 3E000726 81020305 AE000925 41020303 B900072A A7020305 ...Ì*..¿...AX..Ú....&..>...ý...1 000140
CA000644 29020304 42000729 E0020300 EA00022F 09010302 C200071A 88020305 .......ô..../..ð...Á)..B...)D..ò 000160
00000000 00000000 6000022F 36010300 6C000231 7C010300 E8000231 2E010300 ....1..Š...|1..(...6/..m........ 000180
02571826 0728260E 5EC40257 88260788 26125EC4 D88EFFFF 881E5657 000038C8 äB..WV.|...Äá^.&..&.W.á^.&+.&.W. 0001A0
890C4689 06571826 04472826 0E5EC406 57882604 47882612 5EC4E256 89E04689 .FÀ.Vãá^.&.G.&.W.á^.&+G.&.W..FÉ. 0001C0
8D006502 879ADC5E 8D005006 8A9A0055 02879AE0 5E8D0050 02879AE0 5E800E56 VB.^À...P..^À...U....)..^É...e.. 0001E0
```

```
Dump of file SATURN:[PCCOMMON.DUMP.DLL]DGM.TMP;1 on 18-APR-1990 10:44:12.07
File ID (620,6,0)   End of file block 186 / Allocated 188

Virtual block number 66 (00000042), 512 (0200) bytes

 FFFF077D 9A007E03 B79ADC88 08EC8300 7906999A 006F068A 9A006A02 879ADC5E ^É...j....o....y..$..É.ñ.-..)... 000000
 FA9AEC5E 8000A102 1E9A0C8A 1E801FA5 A5A5A50A 8E1E0716 F08BEC7E 8008C483 .á..-$.Þ....ÖÉÉÉ...¤....À..^$.* 000020
 74C42606 768B03E3 C10E5F88 26065EC4 018CE900 01880677 00C6069E 9A00A601 .Ä....ô.w.¡..Ö..á^.&._.èÐ..v.&át 000040
 EC8300E6 06619AC0 C21E8000 DC068A9A 00030287 9A0A5E80 00CE01FE 9A188008 ....z.ö..^....&....É.¯.ö..a.|..$ 000060
 801FA5A5 A5A5DA8E 1E0716F0 88047E80 08C48301 0507A19A 00EB0387 9ADC8808 ..É.ñ.$..À....á..-å.Þ....ÖÉÉÉ.. 000080
 02879AF4 5E800120 01FA9AEC 5E80F656 89F44689 0118046E 9A010A01 FA9AD45E ^å.*....n....f¶.V-.^$.*. ..^¶... 0000A0
 26072B26 0E5EC402 578B2607 8B26125E C40100E9 00018806 76014F06 9E9A0125 X....Ö.v.¡..Ö..á^.&..&.W.á^.&+.& 0000C0
 8303879A E45E8001 5F06229A EC5E8001 5702879A C85E80C8 4689CA56 89025718 .W..Vò.Fà.^à...W..^å.".._..^ö.ñ.. 0000E0
 C85E80C8 4689CA56 89065718 26044728 260E5EC4 06578B26 04478B26 125EC401 .á^.&.G.&.W.á^.&+G.&.W.¯Vò.Fà.^à 000100
 E45E8001 A302879A F45E8001 9803879A F85E8001 9306229A EC5E8001 8802879A ......^å."....^%.ñ....^¶...É..^ö 000120
 08C48301 D507A19A 01880387 9ADC8808 EC8301B6 06619A0C C21E8001 AC060A9A ...¯...ô..a.Ñ..$..É.ñ.É..À.í..á. 000140
 26165EC4 01EC046E 9A010A01 FA9AD45E 801FA5A5 A5A5DA8E 1E0716F0 88047E80 .-å.Þ....ÖÉÉÉ..^å.*.Ö..n.$.á^.& 000160
 83020706 619A0CC2 1E8U01FD 060A9AF8 5E8001F4 02879AF4 5E800257 19760729 ).&.W..^¶...¶..^%...»...ô..a.... 000180
 1FA5A5A5 A5DA8E1E 0716F088 CC7E8008 C4830226 07A19A02 0C03879A DC8B 1EC $..É.ñ....À.&..á..-ü.Þ....ÖÉÉÉ. 0001A0
 C95F5E1F 00EBC028 06571926 04472926 165EC400 48046E9A 022801FA 9ACC5.1D .^ü.*.+..n.N.á^.&)G.&.W.+å$..^ è 0001C0
 8B26E256 89E04689 06578B26 04478B26 065EC408 8E000888 1E565700 0040C8.8 üàâ..WV.¡...Áá^.&.G.&.W..FÁ.Vâ¯. 0001E0

Dump of file SATURN:[PCCOMMON.DUMP.DLL]DGM.TMP;1 on 18-APR-1990 10:44:12.07
File ID (620,6,0)   End of file block 186 / Allocated 188

Virtual block number 67 (00000043), 512 (0200) bytes

 02571B26 072B260A 5EC40257 8B26078B 260E5EC4 E65689E4 46890A57 8B260847 G.&.W..FÖ.V|á^.&..&.W.á^.&+.&.W. 000000
 89004689 06571B26 04472B26 0A5EC406 578B2604 478B260E 5EC40656 89044689 .fà.Vøá^.&.G.&.W.á^.&+G.&.W..fÀ. 000020
 8D02C502 879AD05E 8D02B006 8A9A0285 02879AD4 5E8002B0 02879AD4 5E800256 VÖ.^å...¯..^å...ç....§..^À...é.. 000040
 0099077D 9A020E03 879ADC88 08EC8302 D906999A 02CF068A 9A02CA02 879AD05E ^À...b....Ü....\..&..É.ñ.ä..)... 000060
 FA9AE85E 8D030102 1E9A0C8A 1E801FA5 A5A5A50A 8E1E0716 F08BE87E 8D08C483 .á..-Ò.Þ....ÖÉÉÉ...¤.......^Ò.* 000080
 74C426E4 768B03E3 C10E5F88 26E45EC4 0240E98A DF880677 0326069E 9A030601 ......&.w.¡Ö.Öa.á^Ö&._.èÐ..vÖ&át 0000A0
 4906619A 0CC21E8D 033F068A 9A033602 889A205F 8D065EC4 033101FE 9A188008 ....z.1.á^.. ...ó....?...ó..a.| 0000C0
 A5A5A50A 8E1E0716 F08BC87E 8008C483 036807A1 9A034E03 879ADC88 08EC8303 ..&..É.ñ.N..Ã.h..á..-å.Þ....ÖÉÉÉ 0000E0
 8803E3C1 0E5F8826 E45EC4F2 5689F046 89038804 6E9A0360 01FA9AC8 5E801FA5 É..^à.*.m..n....FÞ.V·á^Ö&._.èÐ.. 000100
 C21E8003 A4068A9A 039B0288 9A1C5F80 065EC403 9601FE9A 18800874 C426E476 vÖ&át....z...á^..........¯É...ó 000120
 1E0716F0 88C07E8D 08C48303 CD07A19A 03830387 9ADC8808 EC8303AE 06619A0C ..a.Ü..&..É.ñ.*..Ã.è..á..-å.Þ... 000140
 01FA9AE8 5E80F656 89F44689 03E0046E 9A030201 FA9AC05E 801FA5A5 A5A50A8E .ÖÉÉÉ..^å.*.@..n.À..F¶.V-.^Ò.*. 000160
 578B2607 8B260A5E C40159E9 8A0FB806 76041706 9E9A03E0 02879AF4 5E8003E8 Ò..^¶...Ü......v.¡Ö.ÖY.á^.&..&.W 000180
 2706229A E85E8004 1F02879A C05E80C0 4689C256 89025718 26072B26 0E5EC402 .á^.&+.&.W..Vò.Fà.^à......^Ò.".' 0001A0
 89065718 26044728 260E5EC4 06578B26 04478B26 0A5EC404 4B03879A D85E8004 ..^Â.ñ.K.á^.&.G.&.W.á^.&+G.&.W.. 0001C0
 065EC404 AF03879A F85E8004 5806229A E85E8004 5302879A C05E80C0 4689C256 Vó.Fà.^à...S..^Ò.".[..^%.ñ.£.á^. 0001E0

Dump of file SATURN:[PCCOMMON.DUMP.DLL]DGM.TMP;1 on 18-APR-1990 10:44:12.07
File ID (620,6,0)   End of file block 186 / Allocated 188

Virtual block number 68 (00000044), 512 (0200) bytes

 FFF276FF 0A76FF0C 76FF0E76 FF1076FF 04C48309 98E80E53 06097400 127F8326 &....t..S.Ò...á..v..v..v..v..v·. 000000
 09740012 7F832606 5EC414C4 83FFFF08 289AE076 FFE276FF F476FFF6 76FFF076 vÞ.v~.v¶.vã.vÁ.(....á.á^.&....t. 000020
 06619A0C C21E8D04 C0060A9A D85E8004 8702879A F45E8004 C4830890 E80E5306 .S.Ò...á..^¶...ñ..^Ã...à...ô..a. 000040
 A5A50A8E 1E0716F0 88C07E8D 08C48304 E907A19A 04CF0387 9ADC8808 EC8304CA ò..&..É.ñ.ü..À.Ö..á..-á.Þ....ÖÉÉ 000060
 02879AF4 5E800257 11260701 260E5EC4 0500046E 9A04EE01 FA9AC05E 801FA5A5 ÉÉ..^à.*.Ý..n...á^.&..& '!..^¶... 000080
 07A19A05 2003879A DC8808EC 83051806 619A0CC2 1E800511 060A9AF8 5E800508 ...^%.......ó..a.....&..É.⅟. ..À. 0000A0
 A8046E9A 053F01FA 9AC85E8D 1FA5A5A5 A5DA8E1E 0716F088 C87E8008 C483053A :..á..-à.Þ....ÖÉÉÉÉ..^à.*.?..n.' 0000C0
 8E0249B8 1E565700 005CC8C8 C95F5E1F 00EBC028 06571126 04470126 0E5EC402 .á^.&.G.&.W.+å$..^ èüà\..WV.¡|.. 0000E0
 E25689E0 46890A57 8B260847 8B260E56 890C4689 06578B26 04478B26 065EC408 Ãá^.&.G.&.W..fÉ.VÐ¯.G.&.W..FÁ.Vã 000100
 478B260E 5EC4CA56 89C84689 02571B26 072B260A 5EC40257 8B26078B 260E5EC4 á^.&..&.W.á^.&+.&.W..Fà.Vòá^.&.G 000120
 5E8005C4 02879AC8 5E80C656 89C44689 06571B26 04472B26 0A5EC406 578B2604 .&.W.á^.&+G.&.W..Fá.Vó.^à...á..^ 000140
 05E3068A 9A05DE02 879AC45E 80050902 879AC45E 80050106 8A9A05C9 02879AC8 à...è....]..^á...)..^á...8....D. 000160
 8E1E0716 F08BE87E 8008C483 02F9077D 9A05F203 879ADC88 08EC8305 ED06999A ...Ü..&..É.ñ.·..).*..á..-Ò.Þ.... 000180
 DF880677 063A069E 9A061A01 FA9AE85E 8D061502 1E9A0C8A 1E801FA5 A5A5A5DA ÖÉÉÉÉ...¤.......^Ò.*.......:.w.¡Ö 0001A0
 8D065EC4 064501FE 9A188008 74C426E0 768B03E3 C10E5F88 26E05EC4 038BE98A .ÖÉ.á^Á&._.èÐ..vÁ&át....z.É.á^.. 0001C0
 9A066203 879ADC88 08EC8306 5006619A 0CC21E8D 0653068A 9A064A02 889A285F _(...J...¯S...ó..a.]..$..É.ñ.b.. 0001E0
```

```
Dump of file SATURN:.?CCOMMON.DUMP.DLL]DGM.TMP;1 on 18-APR-1990 10:44:12.07
File ID (620,6,0)    End of file block 186 / Allocated 188

Virtual block number 69 (00000045), 512 (0200) bytes

6E9A0681 01FA9ABC 5E801FA5 A5A5A5DA 8E1E0716 F088BC7E 8008C483 067C07A1 A.|..á..-V.Þ....ÖEEEE..^V.°....n 000000
AA01FE9A 18800874 C426E076 8803E3C1 0E5F8826 E05EC4E6 5689E446 89069F04 ....FÖ.VIá^ÄL._.èD..vÄLát....±.  000020
9ADC8808 EC8306C2 06619A0C C21E8006 88068A9A 06AF0288 9A245F80 065EC406 .á^.. $...£....|...ô..a.ô..š..É. 000040
FA9AB45E 801FA5A5 A5A50A8E 1E0716F0 88847E8D 08C48306 E107A19A 06C703B7 ñ.ú..Ã.Ã..á..-Ç.Þ....ÖEEEE..^Ç.° 000060
800874C4 26E07688 03E3C10E 5F8826E0 5EC4F656 89F44689 0704046E 9A06E601 .l..n....F¶.V-á^ÄL._.èD..vÄLát.. 000080
83072706 619A0CC2 1E80071D 068A9A07 1402889A 2C5F8006 5EC4070F 01FE9A18 ..±...á^.................ô..a.'.. 0000A0
1FA5A5A5 A5DA8E1E 0716F088 AC7E8D08 C4830746 07A19A07 2C03879A DC8808EC á..É.ñ.,..Ã.F..á..~¯.Þ....ÖEEEE. 0000C0
9A0CC21E 80076201 FA9AE85E 80F25689 F0468907 59046E9A 074801FA 9AAC5E8D .^¯.°.K..n.Y..FÞ.V·.^Ö.ª.b...ô.. 0000E0
DA8E1E07 16F088A4 7E8008C4 83078807 A19A0771 03879ADC 8808EC83 076C0661 a.l..á..É.ñ.q..À....á..-É.Þ....Ö 000100
DA3BF25E 13F04E03 F65E88F4 4E8807CE 046E9A07 9001FA9A A45E801F A5A5A5A5 EEEE..^É.°....n.ö..N¶.^-.NÞ.^.;Ö 000120
18260728 260E5EC4 02578826 0788260A 5EC40231 E98ADF88 0676C838 047F0C7C |...;áv.¡Ö.Ö1.á^.&..&.W.á^.&+.&. 000140
08020387 9AD45E8D 07DE0622 9AE85E8D 07060287 9AB45E8D 84468986 56890257 W..VÑ.FÇ.^Ç...ø..^Ö.".8..^á.ñ... 000160
9AB45E8D 84468986 56890657 18260447 28260E5E C4065788 26044788 260A5EC4 á^.&.G.&.W.á^.&+G.&.W..VÑ.FÇ.^Ç. 000180
16F088CC 7E8D1056 880E4688 082F0387 9AF85E80 08120622 9AE85E80 080A0287 .....^Ö."....^½.ñ./..F..V..-ö.Þ. 0001A0
06619A0C C21E8008 40060A9A 045E8008 3702879A F05E8D1F A5A5A5A5 DA8E1E07 ...ÖEEEE..^Þ...7..^á...a...ô..a. 0001C0
A5A5DA8E 1E0716F0 88A47E8D 08C48308 6907A19A 084F0387 9ADC8808 EC83084A J..š..É.ñ.O..À.i..á..-É.Þ....ÖEE 0001E0

Dump of file SATURN:[PCCOMMON.DUMP.DLL]DGM.TMP;1 on 18-APR-1990 10:44:12.07
File ID (620,6,0)    End of file block 186 / Allocated 188

Virtual block number 70 (00000046), 512 (0200) bytes

02879AF0 5E8D0257 11260701 260E5EC4 0880046E 9A086E01 FA9AA45E 801FA5A5 EE..^É.°.n..n...á^.&..&.W..^Þ... 000000
07A19A08 A003879A DC8808EC 83089806 619A0CC2 1E8D0891 060A9AF8 5E800888 ...^½.......ô..a....š..É ñ....À. 000020
8C046E9A 088F01FA 9AAC5E80 1FA5A5A5 A5DA8E1E 0716F088 AC7E8D08 C483088A a..á..-¯.Þ....ÖEEEE..^¯.· ¢..n.V 000040
76FF5016 CC468D0E 76FF1076 FF0C77FF 26065EC4 06571126 04470126 0E5EC405 .á^.&.G.&.W.á^.&.w..v..v..Fä.P.v 000060
FF04C483 0509E80E 53060974 00127F83 26065EC4 0EC48304 9104BC9A 0C76F. E &.vÉ.V....á.á^.&....t..S.Ö...á.. 000080
08459A0C 76FF0E76 FFF476FF F676FFE4 76FFE676 FF0A76FF 0C76FF0E 76FF10. v..v..v..v..vl.vö.v-.v¶.v8.vÉ.E. 0000A0
09460287 9AF45E80 04C48304 01E80E53 06097400 127F8326 065EC414 C48308E, Ö..á.á^.&....t..S.Ö...á..^¶...F. 0000C0
097807A1 9A095E03 879ADC88 08EC8309 5906619A 0CC21E80 094F060A 9AD45E80 .^á...O...ô..a.Y..š..É.ñ.^..À.x. 0000E0
C4098F04 6E9A097D 01FA9AA4 5E801FA5 A5A5A5DA 8E1E0716 F088A47E 8008C483 .á..-É.Þ....ÖEEEE..^É.°.)..n...á 000100
06619A0C C21E8D09 A0060A9A F85E8D09 9702879A F45E8002 57112607 01260E5E ^.&..&.W..^¶......^½.......ô..a. 000120
A5A5DA8E 1E0716F0 88AC7E8D 08C48309 C907A19A 09AF0387 9ADC8808 EC8309AA ¯..š..É.ñ.£..À.è..á..-¯.Þ....ÖEE 000140
1F00E8C0 28065711 26044701 260E5EC4 0600046E 9A09CE01 FA9AAC5E 801FA5A5 EE..^¯.°.ö..n...á^.&.G.&.W.+áŠ.. 000160
8B26FC56 89FA4689 02578826 07882606 5EC4D88E 0550881E 00000EC8 CBC95F5E ^_èùà....|]..Äá^.&..&.W..F°.V«&. 000180
000A789A 5016FE46 801276FF 026AFA76 FFFC76FF F85689F6 46890A57 88260847 G.&.W..F-.V½.v«.v°j..v..F±.P.(.. 0001A0
83067F2D 7C00F47E 830000FF FF9A5016 F24680FA 76FFFC76 FF437400 FE7E8300 ..-±.tC.v«.v°.F·.P......-¶.|-... 0001C0
F876FFF2 76FFF476 FF0A76FF 0C76FF0E 76FF1076 FF0E76FF 1076FF25 7400F27E -·.tX.v..v..v..v..v..v..v¶.v·.v½ 0001E0

Dump of file SATURN:[PCCOMMON.DUMP.DLL]DGM.TMP;1 on 18-APR-1990 10:44:12.07
File ID (620,6,0)    End of file block 186 / Allocated 188

Virtual block number 71 (00000047), 512 (0200) bytes

8300000A CD9A5016 FE468D12 76FF006A FA76FFFC 76FF14C4 83F599E8 0EF676FF .v-.Ö.X.á..v«.v°j..v..F±.P.ë.... 000000
FF9A5052 00200506 46885052 001C0508 56880646 88FA76FF FC76FF37 7400FE7E -±.t7.v«.v°.F..V....RP.F.. .RP.. 000020
FFFC76FF 0CC483F7 88E80E06 76FF0876 FF0A76FF 0C76FF0E 76FF1076 FF0000FF ....v..v..v..v..v..v..Ö.X.á..v«. 000040
06468BFA 76FFFC76 FF3F7400 FE7E8300 00FFFF9A 5016FE46 801276FF 016AFA76 v°j..v..F±.P......-±.t7.v«.v°.F. 000060
1076FF00 00FFFF9A 5052002C 05064688 50520028 05064688 50520024 05085688 .V..$.RP.F..(.RP.F...RP......v. 000080
000EC8C8 C91F00E8 C0280CC4 83FA42E8 0E0676FF 0876FF0A 76FF0C76 FF0E76FF .v..v..v..v..v..ÒB°.á.+áŠ..èùà.. 0000A0
0A578826 08478826 F85689F6 46890657 88260447 88260065E C4088E09 EA881E00 ..|ô..Äá^.&.G.&.W..F-.V½&.G.&.W. 0000C0
76FF4374 00FE7E83 000008AF 9A5016FE 4680026A 0A76FF0C 76FFFC56 89FA4689 .F°.V«.v..v.j..F±.P.£....-±.tC.v 0000E0
FF1476FF 257400F2 7E83067F 207C00F4 7E830000 FFFF9A50 16F2468D 0A76FF0C ..v..F·.P......-¶.|-...-·.tX.v.. 000100
C483F462 E80EFA76 FFFC76FF F276FFF4 76FF0E76 FF1076FF 1276FF14 76FF1276 v..v..v..v..v..v¶.v·.v«.v°.Öb¶.á 000120
880A76FF 0C76FF37 7400FE7E 83000008 FE9A5016 FE468000 6A0A76FF 0C76FF14 ..v..v.j..F±.P.±....-±.t7.v..v.. 000140
1076FF12 76FF1476 FF0000FF FF9A5052 00200506 46885052 001C0508 56880646 F..V....RP.F.. .RP......v..v..v. 000160
FFFF9A50 16FE4680 016A0A76 FF0C76FF 0CC483F6 54E80E06 76FF0876 FF0E76FF .v..v..v..ÒT-.á..v..v.j..F±.P... 000180
52002805 06468850 52002405 08568806 46880A76 FF0C76FF 3F7400FE 7E830000 ...-±.t?.v..v..F..V..$.RP.F..(.R 0001A0
0676FF08 76FF0E76 FF1076FF 1276FF14 76FF0000 FFFF9A50 52002C05 06468850 P.F...RP......v..v..v..v..v..v. 0001C0
26044788 26065EC4 D88E0823 881E0000 08C8C8C9 1F00E8C0 280CC483 F911E80E .Ö.°.á.+áŠ..èùà....|#..Äá^.&.G.& 0001E0
```

```
Dump of file SATUR :[PCCOMMON.DUMP.DLL]DGM.TMP;1 on 18-APR-1990 10:44:12.07
File ID (620,6,0)   End of file block 186 / Allocated 188

Virtual block number 72 (00000048), 512 (0200) bytes

 5EC400B5 E98AD588 0675C008 0000FFFF 9A016A00 6A5052FE 5689FC46 8906578B .W..F=.VzRPj.j.......âu.¡f.Õç.á^ 000000
 FE76FF5C 7F0C0C7F 8326637C 080C7F83 260E7E09 0C7F8326 077C080C 7F832606 .&....|.&....~.&....|c&.....\.vz 000020
 7F832607 74080C7F 8326065E C4165789 26144789 26065EC4 0000FFFF 9AFC76FF .v=.....á^.&.G.&.W.á^.&....t.&.. 000040
 46C70A75 0C0C7F83 26077409 0C7F8326 18E80000 FA46C700 0FF846C7 0C75080C ..u.úF%..úF°..$.&....t.&....u.úF 000060
 C4FC76FF FE76FF00 00FFFF9A F876FFFA 76FFFC76 FFFE76FF 0000FA46 C70008F8 %..úF°...vz.v=.v°.v%......vz.v=á 000080
 6A006AFC 76FFFE76 FF1CE88A D5880575 C0080000 FFFF9A50 52991047 8826065E ^.&.G..RP......âu.¡f.$..vz.v=j.j 0000A0
 D88E0C54 881E0000 08C8C8C9 1F00E8C0 2804E88A D6880575 C0080000 FFFF9A03 .......âu.¡ø.$.+â$..èùà....¡T..Å 0000C0
 0675C008 00000C70 9A016A00 6A5052FE 5689FC46 8906578B 2604478B 26065EC4 á^.&.G.&.W..F=.VzRPj.j..p....âu. 0000E0
 83264A7C 080C7F83 260E7E09 0C7F8326 077C080C 7F832606 5EC4009C E98AD588 ¡f.Õ..á^.&....|.&....~.&....|J&. 000100
 2618E800 00FA46C7 000FF846 C70C7508 0C7F8326 0774080C 7F832643 7F0C0C7F ....C&....t.&....u.úF%..úF°..$.& 000120
 FA76FFFC 76FFFE76 FF0000FA 46C70008 F846C70A 750C0C7F 83260774 090C7F83 ....t.&....u.úF%..úF°...vz.v=.v° 000140
 75C00800 0000A9A 50529910 47882606 5EC4FC76 FFFE76FF 00000CF5 9AF876FF .v%.%....vz.v=á^.&.G..RP......âu 000160
 C02804E8 8AD68805 75C00800 0000229A 036A006A FC76FFFE 76FF1CE8 8AD58805 .¡f.$..vz.v=j.j.."....âu.¡ø.$.+á 000180
 FE5689FC 46890657 88260447 8826065E C4D88E0D 3C881E00 0004C8C8 C91F00E8 $..èùà....¡<..Åá^.&.G.& W..F=.Vz 0001A0
 FF9A006A 006A016A 006AFC76 FFFE76FF 52E88A05 880575C0 080000FF FF9A5052 RP......âu.¡f.$R.vz.v=j.·.j.j... 0001C0
 7F83260E 7E090C7F 8326077C 080C7F83 26065EC4 36E88A05 88057500 080000FF ....Âu.¡f.56á^.&....|.&....~.&.. 0001E0

Dump of file SATURN:[PCCOMMON.DUMP.DLL]DGM.TMP;1 on 18-APR-1990 10:44:12.07
File ID (620,6,0)   End of file block 186 / Allocated 188

Virtual block number 73 (00000049), 512 (0200) bytes

 C0280000 0DC49A14 77FF2616 77FF26FC 76FFFE76 FF137F0C 0C7F8326 1A7C080C ..|.&.......vz.v=&.w.&.w..á...+à 000000
 007C0002 0DF10103 00780002 00090103 01CA0007 0A1D0203 001290C8 C91F00E8 $..èù.........ò...\...x...þ...|. 000020
 010E0002 0E3F0103 00000007 09200002 03630007 086A0203 01080007 0A330203 ..3...Ü...j...c... .......?..... 000040
 03880007 08030203 0000000E 0E080002 00000000 093E0002 03790007 08540203 ..T...y...>..............á..... 000060
 00EA0002 00580103 022A0007 0AF90203 03A10007 0C2A0203 02150007 0A9F0203 ..........°...Å...¡...°...X...õ. 000080
 00000000 00000000 006D0002 0CA40103 006C0002 0E7A0103 00E80002 0E230103 ..#...$...z...l...£...m......... 0000A0
 8904478B 26065EC4 D4568902 46890856 88064688 D88EFFFF 881E5657 00003AC8 à:..WV.¡...Ä.F..V..Fø.Vâá^.&.G.. 0000C0
 46C7CC56 89CA4689 0C578826 0A478826 FE5689FC 46890857 88260647 8826E646 F|&.G.&.W..F=.Vz&.G.&.W..Fò.VâúF 0000E0
 52003E05 C28CC388 E676FF02 AEE98AD4 88067508 4608C388 00000046 C75008CE ò.PúFÅ...û.F.u.¡Å.ÕÜ..v|.û.ô.>.R 000100
 9A0676FF 0876FF04 C483FFFF 00A39A50 52004205 08568806 46880000 FFFF9A50 P......F..V..B.RP.È....á..v..v.. 000120
 9AFC76FF FE76FF00 027A47C7 26065EC4 00017847 C726065E C404C483 FFFF0237 7....á.á^.&úGx..á^.&úGz...vz.v=. 000140
 478926C8 5688C646 88065EC4 024FE98A D5880675 D008C856 89C64689 0000FFFF .....Fó.Vâ.Âu.¡f.Õ0.á^..Fó.Vâ&.G 000160
 FF0E77FF 261077FF 26065EC4 F25689F0 4689F656 89F44689 99C02818 57892616 .&.W.+â..F¶.V~.FÞ.V·á^.&.w.&.w.. 000180
 880675C2 08D85689 06468900 00FFFF9A CE76FFD0 76FF5016 F0468DC6 76FFC876 vâ.vó.FÞ.P.vÅ.vö......Fø.VÄ.ðu.¡ 0001A0
 FF9A5016 F8468DE6 76FF1457 89261247 89260856 88D64688 065EC401 FEE98A05 f.Ôz.á^..Fø.VÄ&.G.&.W..v|.F%.P.. 0001C0
 FF68016A F876FFFA 76FF00AE 97892600 AC878926 FA5688F8 4688065E C40000FF ...á^..F%.V°&..^.&..Û..v°.v%j.h. 0001E0

Dump of file SATURN:[PCCOMMON.DUMP.DLL]DGM.TMP;1 on 18-APR-1990 10:44:12.07
File ID (620,6,0)   End of file block 186 / Allocated 188

Virtual block number 74 (0000004A), 512 (0200) bytes

 87C72606 5EC40000 FFFF9AF8 76FFFA76 FFD276FF D476FF00 00FFFF9A FFFF68FF .h........vâ.vø.v°.v%.....á^.&ú. 000000
 009A0676 FF0876FF 00000082 87C72606 5EC40000 008087C7 26065EC4 0000008C ¥...á^.&ú.¯...á^.&ú.ý....v..v... 000020
 C8878926 C028065E C41174C0 080000FF FF9A5016 EC468DD2 76FFD476 FFFFFF00 ....vâ.vø.Fâ.P......ât.á^.+â&..à 000040
 C726065E C400C897 892600C6 878926EE 5688EC46 88065EC4 13E800C6 87892600 .&..ó.$.á^..Fâ.VŸ&..ó.&..à.á^.&ú 000060
 000000C4 87C72600 6400C287 C726065E C4000000 8E87C726 065EC400 0100C087 .â...á^.&ú./...á^.&ú.ô.d.&ú.á... 000080
 00050447 C726E25E C4000002 47C72600 0507C726 E25EC4E4 568CE246 89DA468D .fÖ.Fâ.Vôá^â&ú...&úG...á^â&úG... 0000A0
 26E25EC4 1FA5A5A5 A5DA8E1E F088527F 8DE45688 E2468806 5EC40000 0647C726 &úG...á^..Fâ.VÕ..R.Þ..ÕEEEE.á^â& 0000C0
 88E24688 065EC400 000647C7 26001404 47C726E2 5EC40000 0247C726 001407C7 ú...&úG...á^â&úG...&úG...á^..Fâ. 0000E0
 0674C008 000002CA 9A5016E8 468DE676 FF1FA5A5 A5A5DA8E 1EF0885A 7F8DE456 VÕ..Z.Þ..ÕEEEE..v|.FÒ.P.ò....ât. 000100
 EA76FF04 47892606 478926E2 5EC40789 26024789 26C028E2 5EC40090 E98ADD88 ¡f.Ô..á^â+â&.G.&..á^â&.G.&.G..vô 000120
 E476FF00 6A016A00 6AE876FF EA76FF00 0002A49A E276FFE4 76FF5050 50E876FF .vÒPPP.vô.vâ.Ê....vô.vÒj.j.j..vô 000140
 4688E676 FF000497 89260002 878926EA 5688E846 88065EC4 0000FFFF 9AE276FF .vâ.....á^..FÒ.Vô&..ø.&..á..v|.F 000160
 028C9AD2 76FFD476 FF2CE88A DE880574 C0080000 FFFF9A50 5200D605 08568806 ..V..ø.RP......ât.¡ø.$,.vâ.vø... 000180
 280074C0 080000FF FF9A5052 00DA0508 56880646 880676FF D876FF04 C483FFFF ...á..vÅ.vø.F..V..Ö.RP......ât.+ 0001A0
 890000FF FF9A006A 1076FF12 76FFD88E 0008881E 00000CC8 C8C95F5E 1F00E8C0 â$..^_èùà....¡...Å.v..v.j....... 0001C0
 88FA5689 F84689FE 5688FC46 880CE8F8 4689FA46 89C0280A 75D008FE 5689FC46 F=.Vz¯Âu.+ô.F°.F%$..F=.Vz.F%.V°. 0001E0
```

```
Dump of file SATURN:[PCCOMMON.DUMP.DLL]DGM.TMP;1 on 18-APR-1990 10:44:12.07
File ID (620,6,0)   End of file block 186 / Allocated 188

Virtual block number 75 (0000004B), 512 (0200) bytes

52990A46 88006AF8 76FFFA76 FF033BE9 99C02806 75FA4608 F8468802 86E90E46 F.Õ...F%.F*u.+å.Õ;..v*.v%j..F..R 000000
FFFF9A00 A2B7FF26 00A4B7FF 26FC5EC4 016A006A 000003A9 9A505299 0C468850 P.F..RP.`...j.j.á^=&.ñÉ.&.ñÅ.... 000020
990A4688 016AF876 FFFA76FF 0286E903 75FA4608 F8468803 05E99900 01880000 ..|...Õ...F%.F*u.ÕR..v*.v%j..F.. 000040
46880280 E9990001 88000003 FE9A5052 990C4688 5052990A 4688026A F876FFFA RP.F..RP.Æ...Õ...F%.F*u.+å.ÕÅ..v 000060
04289A50 52990C46 88505299 0A468803 6AF876FF FA76FF02 61E90375 FA4608F8 *.v%j..F..RP.F..RP.±...|...Õ¯..F 000080
52990A46 88046AF8 76FFFA76 FF0278E9 99C02806 75FA4608 F8468802 45E90000 %.F*u.Õa..v*.v%j..F..RP.F..RP.(. 0000A0
4DE999C0 280675FA 08F846 88025BE9 99000188 00000456 9A505299 0C468850 ..ÕE..F%.F*u.+å.Õ(..v*.v%j..F..R 0000C0
2DE99900 01880000 04849A50 52990C46 88505299 0A468805 6AF876FF FA76FF02 P.F..RP.V...|...Õ(..F%.F*u.+å.ÕM 0000E0
0C468850 52990A46 88066AF8 76FFFA76 FF021FE9 99C02806 75FA4608 F8468802 ..v*.v%j..F..RP.F..RP.....|...Õ- 000100
FA76FF01 F1E999C0 280675FA 4608F846 8801FFE9 99000188 0000FFFF 9A505299 ..F%.F*u.+å.Õ...v*.v%j..F..RP.F. 000120
8802E006 369AF876 FFFA76FF 0196E900 00FFFF9A 0A76FF08 76FF0676 FFF876FF .RP.....|...Õ...F%.F*u.+å.Õþ..v* 000140
2666478B 26247400 767F8326 FC5EC401 79E90375 FA4608F8 468801C8 E9990001 .v%.v..v..v......Õ...v*.v%.6.Å.| 000160
E9000076 47C726FC 5EC4F45E FFF876FF FA76FF09 74C208F6 5689F446 89685788 ...Õå..F%.F*u.Õy.á^=&..v.t$&.GfÆ 000180
FC76FFFE 76FF0676 FF006A08 76FF006A 1774FE46 08FC4688 0186E999 C0280148 .Wh.F¶.V-.õt..v*.v%.^¶á^=&úGv..Õ 0001A0
8EE301D8 88084688 0676FF21 74FE4608 FC468801 61E999C0 280CC483 0439E80E H.+å.Õ...F=.F±t.j..v.j..v..v±.v= 0001C0
                                                                        .09..á.+å.Õa..F=.F±t!.v..F..ÅID. 0001E0

Dump of file SATURN:[PCCOMMON.DUMP.DLL]DGM.TMP;1 on 18-APR-1990 10:44:12.07
File ID (620,6,0)   End of file block 186 / Allocated 188

Virtual block number 76 (0000004C), 512 (0200) bytes

08FC4688 0132E999 C02808C4 83058004 189AFC76 FFFE76FF 00C887FF 260CCA06 .ò.&.ñà..v±.v=......á.+å.Õ2..F=. 000000
0418 9AFC 76FFFE76 FFU08887 FF260CCA 068EE301 08880846 880676FF 2174FE46 F±t!.v..F..ÅID..ò.&.ñ|..v±.v=... 000020
FE6A0A77 FF260C77 FF26FC5E C43074FE 4608FC46 880103E9 99C02808 C4830082 ...á.+å.Õ...F=.F±tÓá^=&.w.&.w.j± 000040
0003E80E FC76FFFE 76FF0075 C008C028 02E80001 88057401 00C2F700 0003189A .....%ô..t.|..$.+å.åu..v±.v=.ÕE. 000060
00073DFE E9E90375 0005302F 77FD72E9 03750070 307FE800 C5E999C0 2804C483 .á.+å.Õé.$.=p.u.Õr»w/=..u.ÕÕ±=.. 000080
E9037500 323DFF33 E9037500 31309974 002330FF 15E90375 000930FF 23E90375 u.Õ#.=..u.Õ..=#.t.=1.u.Õ3.=2.u.Õ 0000A0
733DFD92 E9037500 7230F073 E9037500 713D1A77 FD02E903 75007430 46E8FF5A Z.$f=t.u.Õ@»w.=q.u.Õs»=r.u.Õ.»=s 0000C0
FE4FE903 75007A3D FE29E903 7500763D FD05E903 7500753D 22E8FE0D E9037500 .u.Õ.±$"=u.u.Õ(»=v.u.Õ)±=z.u.ÕÕ± 0000E0
76FF0C76 FF0E76FF 1076FF12 76FF1E75 FE4608FC 468800E8 FE6CE903 75125930 =Y.u.Õl±$..F=.F±u..v..v..v..v..v 000100
FF0A76FF 0C76FF0E 76FF1076 FF1276FF 1EE820E8 0000FFFF 9A0676FF 0876FF0A ..v..v......$ $..v..v..v..v..v.. 000120
88D88E03 0E881E56 57000068 C8000ECA C91F00E8 725FFF26 FC5EC406 76FF0876 v..v.á^=&. r$..èò..åh..WV.|...Å. 000140
12478826 FE5689FC 46890857 88260647 8826065E C48E5689 8C468908 56880646 F..V..F¥.V7á^.&.G.&.W..F=.V±&.G. 000160
C276FFFC 76FFFE76 FFC65689 C4468900 4205C28C C388C256 89C04689 14578826 &.W..Fá.Vô.û.ô.B..Fá.Vô.v±.v=.vô 000180
880A5689 084689CA 5688C846 88FA5689 F8468900 00FFFF9A 5016C846 8DC076FF .vå.Fà.P......F%.V*.Fà.Vò.FÅ.VÖ. 0001A0
E44689D6 5688D446 88DE5689 DC4689CE 5688CC46 88E25689 E0468902 56880046 FÅ.V@.FÅ.Vä.Fä.Vö.FÉ.VB.Få.V=.FÕ 0001C0
A5DA8E1E 0716F088 847E800A 57882608 47032603 E0C10E47 8826C45E C4E65689 .V|á^á&.G.èÅ.&.G.&.W..-Ç.Þ....ÕE 0001E0

Dump of file SATURN:[PCCOMMON.DUMP.DLL]DGM.TMP;1 on 18-APR-1990 10:44:12.07
File ID (620,6,0)   End of file block 186 / Allocated 188

Virtual block number 77 (0000004D), 512 (0200) bytes

02879AA0 5E8DA046 89A25689 02571826 072826C6 468EDA56 88D84688 1FA5A5A5 ÈÈÈ..FÅ.VÖ.Fó&+.&.W..VÅ.F..^.... 000000
07A19A07 8003879A DC8808EC 83077806 619A0CCC 1E800771 06229A84 5E800768 h..^Ç.".q...ä..a.(..ä..É.ñ....Å. 000020
C4046E9A 079F01FA 9AAC5E80 1FA5A5A5 A50A8E1E 0716F088 AC7E8008 C483079A ...á..~^.Þ....ÕÈÈÈÈ..^~.*.....n.á 000040
5E80A046 89A25689 06571826 04472826 C45EC40E 56880C46 88EA5689 E8468907 ..FÒ.VÕ.FÉ.Vßá^á&+G.&.W..VÅ.F..^ 000060
E403879A DC8808EC 8307DF06 619A0CCC 1E8007D5 06229A84 5E8007CC 02879AA0 ....ä..^Ç.".f...ä..a.Õ..&..É.ñ.Õ 000080
080301FA 9AA45E80 1FA5A5A5 A50A8E1E 0716F088 A47E8008 C48307FE 07A19A07 ..Å.±..á..~É.Þ....ÕÈÈÈÈ..^É.*... 0000A0
A47E800A 57882608 47032603 E0C10E47 8826C45E C4EE5689 EC4689FF FF046E9A .n....F$.VYá^á&.G.èÅ.&.G.&.W..-É 0000C0
89A25689 02571826 072826C6 468EE256 88E04688 1FA5A5A5 A5DA8E1E 0716F088 .Þ....ÕÈÈÈÈ..FÅ.Vä.Fó&+.&.W..VÅ. 0000E0
DC8808EC 83086306 619A0`CC 1E800859 06229AA4 5E800850 02879AA0 5E80A046 F..^....P..^É.".Y...ä..a.c..&..É 000100
9AAC5E80 1FA5A5A5 A50A8E1E 0716F088 AC7E8008 C4830882 07A19A08 6803E79A .ñ.h..À....á..-^.Þ....ÕÈÈÈÈ..^~. 000120
06571826 04472826 C45EC4E6 5688E446 88F25689 F0468908 AC046E9A 088701FA *....n.~..FÞ.V·.FÕ.V|á^á&+G.&.W. 000140
8308C706 619A0CCC 1E800880 06229AA4 5E800884 02879AA0 5E80A046 89A2568B .VÅ.F..^....Ç..^É.".$...á..a.ú.. 000160
1FA5A5A5 A50A8E1E 0716F088 987E8008 C48308E6 07A19A08 CC03879A DC8808EC &..É.ñ.ä..Å.|..á..-..Þ....ÕÈÈÈÈ. 000180
5EC40000 FFFF9AF8 76FFFA76 FFF65689 F4468907 60046E9A 08E801FA 9A985E80 .^..*.$..n.'..F¶.V-.v*.v%.....á^ 0001A0
5FFF2606 5EC45016 E84680BC 76FF8E76 FF145789 26124789 26FA5688 F8468806 ..F%.V*&.G.&.W..v/.v¥.FÕ.Pá^.&._ 0001C0
06016A0C 7400008E 8F832606 5EC41457 89261247 8926C256 88C04688 065EC462 bá^..Fà.VÕ&.G.&.W.á^.&.«/..t.j.. 0001E0
```

```
Dump of file SATURN:[PCCOMMON.DUMP.DLL]DGM.TMP;1 on 18-APR-1990 10:44:12.07
File ID (620,6,0)   End of file block 186 / Allocated 188

Virtual block number 78 (0000004E), 512 (0200) bytes

 002CC8C8 C95F5E1F 00E8C028 0000FFFF 9AF876FF FA76FF06 C483FFFF 063C9A53 S.<....Á..v°.vħ.....+äŠ..^_èüà,. 000000
 E8468970 5788266E 47882606 5EC4FE56 8CFC4689 EC468008 8E0698B8 1E565700 .WV.¡...Ä.F$.F•.V±ó^.&.Gn&.Wp.FÒ 000020
 1FA5F200 08890A8E 1EF088F8 88002A05 08568806 4688FC5E C41875C2 08EA5689 .Võ.òu.ó^•.F..V..*..=.Þ..Õ¿...Ë. 000040
 1EF0882A 7F8DFE5C 88FC4688 065EC4E8 5EFFFC76 FFFE76FF 0676FF08 76FF26E8 $&.v..v..v±.v•.^Öó^..F•.V±..*.Þ. 000060
 47882606 5EC408C4 830198E8 0E0676FF 0876FF50 16EC4680 1FA5F200 0889DA8E .Ö¿..·È..Fâ.P.v..v..Ò...ó.ó^.&.G 000080
 E676FF00 C3E90375 0100C2F7 000005A1 9AFE6A50 52E65689 E446890C 5788260A .&.W..FÒ.VÌRPj±.À...Ẍò..u.Õù..vÌ 0000A0
 8900000A 309A0E6A E476FFE6 76FF0000 D646C7D4 46890000 0A1B9A0C 6AE476FF .vÕj.......FåúF•...vÌ.vÕj..0.... 0000C0
 890C4689 D6561304 4603D228 00000A48 9A106AE4 76FFE676 FF00000A 46C7D846 FÄúFÖ...vÌ.vÕj..K...+Ø.Få.V•.FÊ. 0000E0
 E676FFE2 5689E046 890A5613 08460302 2B0000FF FF9A126A E476FFE6 76FF0E56 V8.vÌ.vÕj......+Ø.FÄ.VÖ.FÄ.Vã.vÌ 000100
 016A5016 D44680E4 76FFE676 FF00000A 989A006A 01006800 6A006AFE 6AE476FF .vÕj±j.|.h..j.......vÌ.vÕ.få.Pj. 000120
 880C4688 0000FFFF 9A006A01 0068006A 010068FE 6AE476FF E676FF00 00FFFF9A ......vÌ.vÕj±h..|.h..j.......FÈ. 000140
 1056890E 46890A56 18084628 E25688E0 46880C56 890A4689 065618D4 4628DE56 V8+Få.V•.F..V..FÅ.Vã+FÄ.VÖ.F..V. 000160
 89261E47 89261056 880E4688 065EC41C 5789261A 4789260C 56880A46 88065EC4 ó^..F..V.&.G.&.W.ó^..F..V.&.G.&. 000180
 510AAF9A 0676FF08 76FFFC76 FFFE76FF 04C4830A FF00009A 0676FF08 76FF2057 W .v..v.......ó..v±.v•.v..v..€.Q 0001A0
 75084608 06468808 8E096588 1E565700 001AC8C8 C95F5E1F 00E8C028 08C48305 ..ó.+äŠ..^_èüà...WV.¡e..Ä.F..F.u 0001C0
 B80575C0 080000FF FF9A5016 E646800A 77FF260C 77FF2606 5EC447E8 8AD48805 .¡å.$Gó^.&.w.&.w..FÌ.P......åu.¡ 0001E0

Dump of file SATURN:[PCCOMMON.DUMP.DLL]DGM.TMP;1 on 18-APR-1990 10:44:12.07
File ID (620,6,0)   End of file block 186 / Allocated 188

Virtual block number 79 (0000004F), 512 (0200) bytes

 768D227F 8D065EC4 E5689FC 468999EC 4688FA56 89F84689 99EE4688 29E8BAD5 (.$).FŸ.:F%.V°.Fã..F•.V±ó^...".v 000000
 5EC4088E 0815881E 5570000 4AC8C8C9 5F5E1F00 E8C02B1F A5A5A5A5 1F161EF8 %...ÈÈÈÈ.+äŠ..^_èüàJ..WV.¡...Äó^ 000020
 00013005 7F167CD2 0899E246 88000008 379A5016 DE468006 77FF2608 77FF2606 .&.w.&.w..F8.P.7....Fâ..Ø|...•.. 000040
 8D08C602 949AE25E 8D0188E9 8AD58806 73000130 057C007F 020899E0 46880F72 r..FÀ..Ø..|.•..•.¡ǃ.Õ...^â...ó.. 000060
 E706319A 0CD41E8D 080F0294 9AE05E8D 08060387 9AF85E8D 08CE0631 9A0CD41E .å..1.ö..^ħ.ñ.•..^À...Ô...å..1.Ô 000080
 8D065EC4 0C050387 9AD65E8D 08FA0288 9A1A5F8D 065EC408 F203879A F05E8D08 ..^Þ.ñ.·.ó^.._....•..^•.ñ...ó^.. 0000A0
 0C2301FA 9AD65E8D 0C1E021E 9A0CDC1E 8D0C1603 879ACE5E 8D0C0002 889A1E5F _.......^õ.ñ.....É.......^•.•.#. 0000C0
 8806730C 4C069E9A 0C3801FA 9ACE5E8D 0C36021E 9A0CDC1E 8D18720C 2E069E9A .....r...É....ó..^ö.•.;....L.•.| 0000E0
 041E8D0C 6403879A 580C5806 3A9A53D6 5E8D0C55 021E9A0C D41E8D00 FDE98AD1 Ì.Ô»...å....U..^•S.:.[.(.ñ.d...å 000100
 D65E8D0C 8301FA9A F85E8D0C 7803879A 580C7306 3A9A53CE 5E8D0C6D 021E9A0C ....m..^öS.:.s.[.ñ.(..^%.•....^• 000120
 08C4830C 8507A19A 0C980387 9ADC8808 EC830C96 06619A0C CC1E8D0C 8C05DA9A .Ö.....ä..•....š..É.ñ....À.ç..á. 000140
 89CA4689 0CC8046E 9A0C8A01 FA9A8E5E 801FA5A5 A5A5DA8E 1E0716F0 888E7E8D .-ƒ.Þ....ÕÈÈÈÈ..^/.•.ø..n.à..Fò. 000160
 DC8808EC 830CE306 619A0CCC 1E800CD9 050A9ACE 5E800CD0 01FA9AF0 5E8DCC56 Vä.^Þ.•.À..^ö.Ö.\...ä..•.D..š..É 000180
 9A865E8D 1FA5A5A5 A50A8E1E 0716F088 867E8008 C4830002 07A19A0C E803879A .ñ.Ò..À....ó..~Ñ.Þ....ÕÈÈÈÈ..^Ñ. 0001A0
 76FF2074 C208C646 880775CC 4608CA46 88C85689 C6468908 48046E9A 000701FA •....n.H..Fó.Và.Fò.Fäu..Fó.õt .v 0001C0
 C02810C4 830AE802 8F9A0676 FF0876FF CA76FFCC 76FFC676 FFC876FF 0A76FF0C ..v..và.vó.vë.vò.v..v..¢.Š..ó.+å 0001E0

Dump of file SATURN:[PCCOMMON.DUMP.DLL]DGM.TMP;1 on 18-APR-1990 10:44:12.07
File ID (620,6,0)   End of file block 186 / Allocated 188

Virtual block number 80 (00000050), 512 (0200) bytes

 75C208FE 5689FC46 890C5688 0A468808 8E087A88 1E000004 C8C8C95F 5E1F00E8 Š..^ èüà....¡z..Ä.F..V..F•.V±.õu 000000
 FFFE76FF 016A006A 0097E908 468800C1 E9C02805 74400646 F600CCE9 00018806 .¡..Õä.-F.ət.+äÒé..F.Õ..j.j..v±. 000020
 E908C483 0DAF0418 9AFC76FF FE76FF02 6A006A00 A2E908C4 83009A04 1B9AFC76 v•......ó.ÕÄ.j.j..v±.v•...É..ó.Õ 000040
 FC76FFFE 76FF066A 006A79E8 08C48300 C30418A9 FC76FFFE 76FF076A 006A008D ..j.j..v±.v•...ù..ó.Šyj.j..v±.v• 000060
 76FFFF6A 53E806C4 8300E701 DC9AFC76 FFFE76FF 016A65E8 08C48300 39041B9A ...9..ó.Šej..v±.v•.É.Õ..ó.ŠSj..v 000080
 76FF0C76 FF34E8FF FF1C559A FC76FFFE 76FF41E8 06C483FF FF01DC9A FC76FFFE ±.v•.É....ó.ŠA.v±.v•.U...Š4.v..v 0000A0
 CA0E1FA7 FF2E93C0 03F17700 07300011 2020E826 E8000188 27E800F7 03809A0A ....¥.$'¡..S&$ -..•..ωþ.å...Ì..ò 0000C0
 C1000803 68020300 210CCAC9 1F00E8C0 2800A200 8D0D8600 7800EE00 F8000C00 .É.«.Ÿ.x.Ñ...À.+äŠ..èò.Ì...h...é 0000E0
 0A000108 8F010300 00000401 3F000201 54000702 8D020300 0000010E 04000204 ...............T...?............ 000100
 00000600 74000200 8F00010A 81010300 07000200 F1010300 00000501 81000200 ...........þ...............t.... 000120
 0000080D 05000200 10000208 FA010301 1600010A 6F010304 DA000804 A0020300 ...Ù...Õ...o.......•.......ƒ.... 000140
 1F000109 F0010300 1000010A 06010300 00000900 85000200 78000500 62020300 ...b...(......................Þ.... 000160
 00000008 8D000200 29000100 A0010300 00000C04 8D000200 00000809 44000200 ...D.......§...........)...§.... 000180
 82000106 68010300 00000E00 40000200 2E000109 50010300 20000106 E9010300 ...Õ...-...P.......N.......h...ý 0001A0
 80000602 F7020304 96000801 56020304 88000801 1F020300 47000401 42000500 ...B...G...........V.......%... 0001C0
 46000702 58020304 AE000801 45020300 5C000103 7E010306 01000C01 8F020300 ...........~...\...E...Ù...X...F 0001E0
```

```
Dump of file SATURN:[PCCOMMON.DUMP.DLL]DGM.TMP;1 on 18-APR-1990 10:44:12.07
File ID (620,6,0)   End of file block 186 / Allocated 188

Virtual block number 81 (00000051), 512 (0200) bytes

08460806 4688D88E FFFFB81E 000004C8 00000000 00000000 00000000 00000001 ................à....|...Ã.F..F. 000000
0575C208 FE5689FC 46890000 FFFF9A00 6A008636 FF016A00 6A4CEB8A 04880575 u.|å.ŠLj.j..6..j.......F•.V±.ôu. 000020
00A087C7 26065EC4 00A49789 2600A287 8926FE56 88FC4688 065EC42E EB8AD588 |f.Š.á^..F=.V±&..Â.&..Ê.á^.&ü... 000040
0006881E 00000EC8 0004CAC9 1F00E800 A8878926 00AA8789 26C02806 5EC40000 ..á^.+áå..¨.&..¨.Š..èò..à....|.. 000060
C0280674 C008FA46 890000FF FF9A5016 FC46800A 6A0A6A04 77FF2606 5EC4088E .Äá^.&.w.j.j..F=.P......F•.åt.+å 000080
E999C028 06750008 F85689F6 46890000 FFFF9A0A 76FF006A 016A006A 00A4E999 .ÕÉ.j.j.j..v.......F-.V%.Âu.+å.Õ 0000A0
28FC5EC4 04578926 02478926 F85688F6 4688FC5E C4078926 0A4688FC 5EC40086 ..á^=.F.&..á^=.F-.V%&.G.&.W.á^=+ 0000C0
1275D008 F45689F2 468900AA 97882600 A8878826 065EC406 47892608 478926C0 å&.G.&.G.á^.&..¨.&..¨..F·.V¶.Âu. 0000E0
26107408 47082606 478826F2 5EC42EE8 00AA9789 2600A887 8926FE56 88FC4688 .F=.V±&..´.&..¨.Š.á^·&.G.&.G.t.& 000100
08578926 06478926 FE5688FC 4688F25E C4E3E8F4 5689F246 89085788 26064788 .G.&.W..F·.V¶ŠDá^·.F•.V±&.G.&.W. 000120
97882600 A8878826 065EC4D8 8E006E88 1E000004 C8C8C91F 00E8F856 88F64688 .F-.V%Š..èüà....|n..Äá^.&..¨.&.. 000140
46890857 88260647 8826FC5E C411EB37 E899C028 0575D008 FE5689FC 468900AA ¨..F=.V±.Âu.+å.S7Š.á^=&.G.&.W..F 000160
E8045788 26024788 260A7507 39260A46 88FC5EC4 1774FE46 08FC4688 FE5689FC =.V±.F=.F±t.á^=.F.&9.u.&.G.&.W.Š 000180
8AD48806 75084608 06468808 8E014188 1E00000A C8C8C91F 00E899C0 28D0E807 .ŠÂ+å.Š..èüà....|A..Ã.F..F.u.|å. 0001A0
75D008FA 5689F846 8900AA97 882600A8 878826F6 46890447 8826065E C40093E9 Õ..á^.&.G..F-&..´.&..¨..F%.V•.Âu 0001C0
FF260477 FF260074 04470826 02478826 F85EC443 74FA4608 F8468871 E8C02804 .+åŠq.F%.F•tCá^%&.G.&.G.t.&.w.&. 0001E0

Dump of file SATURN:[PCCOMMON.DUMP.DLL]DGM.TMP;1 on 18-APR-1990 10:44:12.07
File ID (620,6,0)   End of file block 186 / Allocated 188

Virtual block number 82 (00000052), 512 (0200) bytes

FFFF9A53 06F676FF FE5689FC 46890857 88260647 8826F85E C40000FF FF9A0277 w......á^%&.G.&.W..F•.V±.v-.S... 000000
C400A287 892600A4 878926C0 28065EC4 85E8FA56 89F84689 FE5688FC 46880000 ...F•.V±.F%.V•Šçá^.+å&..Ê.&..Â.á 000020
A1881E00 0008C8C8 C91F00E8 00A88789 2600AA87 8926065E C400A087 8926065E ^.&....á^.&..´.&..¨.Š..èüà....|À 000040
88067E0E 087E8306 7C00087E 830C74C2 08FE5689 FC46890C 56880A46 88D88E01 ..Ã.F..V..F•.V±.ôt..-..|..-..-.| 000060
FA5689F8 468906C4 83FE84E8 0EFC76FF FE76FF06 76FF4EE8 08468800 82E98AD4 å.Õý..F.ŠN.v..v±.v=.ÕÇ±.á..F%.V• 000080
016A006A 23E8FA56 89F84689 06C483FD C7E80EFC 76FFFE76 FF0676FF 1675D008 .Âu..v..v±.v•.Õú».á..F%.V•Š#j.j. 0000A0
88DDE8AD 74000E30 07E8FA56 89F84689 00000022 9A006A00 8687FFE3 D1085E88 .^.ID.ñ..j..".....F%.V•Š.=..tUŠI. 0000C0
880575C0 080000FF FF9AF876 FFFA76FF 016A006A 48E88AD5 880575FA 4608F846 F%.F•u.|f.Škj.j..v•.v%......Âu.| 0000E0
87892608 4688FC5E C400A497 892600A2 878926FA 5688F846 88FC5EC4 33E88AD5 f.Š3á^=.F%.V•&..Â.&..Ê.á^=.F.&.. 000100
000004C8 0008CAC9 1F00E8C0 2800A687 89260646 88FC5EC4 08750E08 7E8300A0 ...-..u.á^=.F.&..|.+åŠ..èò..à... 000120
04880575 0C46080A 46880874 C208FE56 89FC4689 1056880E 4688D88E 024F881E .|O..Ã.F..V..F•.V±.ôt..F..F.u.|å 000140
0E3F8326 0A5EC418 74084608 06468807 89260A5E C400A087 8826FC5E C435E88A .Š5á^=&....á^.&...F..F.t.á^.&.?. 000160
002CC800 0CCAC91F 0·^8C028 07892606 5EC4C028 02E800A6 878826FC 5EC40A75 u.á^=&..|.Š.+àá^.&..+åŠ..èò..à,. 000180
75084608 06468808 7·.208FE 5689FC46 890C5688 0A468808 8E033288 1E565700 .WV.|2..Ã.F..V..F•.V±.ôt..F..F.u 0001A0
8E1E0716 F088F47E 80085688 06468800 F6E97A47 8826FC5E C4016AE9 8AD48806 .|å.Õj.á^=&.GzÕ-..F..V..-¶.Þ.... 0001C0
F088E47E 804C5788 264A4703 2603E0C1 50478826 FC5EC400 F0E91FA5 A5A5A5DA ÕEEEE.Õþ.á^=&.GPèÂ.&.GJ&.WL.-Õ.Þ 0001E0

Dump of file SATURN:[PCCOMMON.DUMP.DLL]DGM.TMP;1 on 18-APR-1990 10:44:12.07
File ID (620,6,0)   End of file block 186 / Allocated 188

Virtual block number 83 (00000053), 512 (0200) bytes

619A0CE4 1E800411 060A9AE4 5E800408 02889A06 5EC41FA5 A5A5A5DA 8E1E0716 ....ÕEEEE.á^.......^Õ.......Õ... 000000
A5DA8E1E 0716F088 DC7E8008 C483043A 07A19A04 2003879A DC8808EC 83041806 ....&..Ê.ñ. ..Â.:..á..-Ê.Þ....ÕÊ 000020
F213C803 44778826 424F8826 FC5EC404 5F046E9A 043F01FA 9ADC5E8D 1FA5A5A5 ÊÊÊ..^Ê.•.?..n._.á^=&.O8&.wO.à.· 000040
06619A0C E41E8004 70060A9A E45E8004 6702889A 045F8006 5EC4F676 89F44E89 .N¶.v-á^.._....ð..^Õ...p...Õ..•. 000060
A5A5DA8E 1E0716F0 88047E8D 08C48304 9907A19A 047F0387 9ADC8808 EC83047A z..&..Ê.ñ....Â....á..-å.Þ....ÕÊÊ 000080
89F213C8 03487788 26464F88 26FC5EC4 FFFF046E 9A049E01 FA9AD45E 8D1FA5A5 ÊÊ..^å.•....n...á^=&.OF&.wN.à.·. 0000A0
89F65688 F4468800 EBF*12E9 03750002 3DFF02E9 03750001 3D12E8FA 7689F84E N%.v•Š.=..u.Õ..=..u.Õ..Š..F¶.V-. 0000C0
016A006A 0677FF26 0877FF26 FC5EC4F2 5689F046 89FA5688 F84688EE 5689EC46 F&.VY.F%.V•.FÞ.V·á^=&.w.&.w.j.j. 0000E0
9AF076FF EC76FF01 6A0C5A1C E88AD588 0575C008 0000FFFF 9A016A50 16EC4680 .F&.Pj.......Âu.|f.Š.j.j..v&.vÞ. 000100
881E5657 000030C8 0008CAC9 5F5E1F00 E8C02804 E88AD588 0575C008 0000FFFF .....Âu.|f.Š.+åŠ..^_èò..à0..WV.| 000120
E98AD488 06750846 08064688 0874C208 FE5689FC 46890C56 880A4688 088E0395 ...Ã.F..V..F•.V±.ôt..F..F.u.|å.Õ 000140
5EC4016A 006A0168 E98AD588 0675C008 0000FFFF 9A5016EC 4680016A 006A0183 ..j.j..F&.P......Âu.|f.Õk.j.j.á^ 000160
880146E9 8AD58806 75C00800 0004F89A 016A5016 EC468006 77FF2608 77FF26FC =&.w.&.w..F&.Pj..%....Âu.|f.ÕF.. 000180
0EE97A47 8826FC5E C4FA5689 F84689F2 5688F046 88F65689 F44689EE 5688EC46 F&.VY.F¶.V-.FÞ.V·.F%.V•á^=&.GzÕ. 0001A0
032603E0 C1504788 26FC5EC4 0100E91F A5A5A5A5 1F161EF4 7680F888 065EC401 .á^..=.v¶...EEEE.Õ..á^=&.GPèÂ.&. 0001C0
2826FE46 8EF65688 F446881F A5A5A5A5 DA8E1E07 16F088E4 7E804C57 88264A47 GJ&.WL.-Õ.Þ....ÕEEEE..F¶.V-.F±&+ 0001E0
```

```
Dump of file SATURN:[PCCOMMON.DUMP.DLL]DGM.TMP;1 on 18-APR-1990 10:44:12.07
File ID (620,6,0)   End of file block 186 / Allocated 188

Virtual block number 84 (00000054), 512 (0200) bytes

 0CE41E8D 06130622 9AE45E8D 060A0287 9AD05E8D D04689D2 56894457 18264247 GB&.WD.V@.FÅ.^Å......^ð.".....ð. 000000
 8E1E0716 F08BDC7E 8D08C483 063C07A1 9A062203 879ADC8B 08EC8306 1006619A .@....&..É.ñ."..Å.<..á..-É.Þ.... 000020
 F8468B02 57892607 8926065E C4066A04 6E9A0641 01FA9ADC 5E8D1FA5 A5A5A5DA ÕEEEE..^É.°.A..n.].á^.&..&.W..F% 000040
 9AE45E8D 06720287 9AD05E8D D04689D2 56894857 18264647 2826FC5E C4FA5688 .V°á^=&+GF&.WH.V@.FÅ.^Å...r..^ð. 000060
 8D08C483 06A407A1 9A068A03 879ADC8B 08EC8306 8506619A 0CE41E8D 06780622 ".(...ð..@....&..É.ñ....Å.É..á.. 000080
 8926065E C4040004 6E9A06A9 01FA9AD4 5E8D1FA5 A5A5A5DA 8E1E0716 F08B047E -å.Þ....ÕEEEE..^å.°.`..n...á^.&. 0000A0
 E8FEF5E9 03750002 30FEEAE9 03750001 3D12EB18 EB8AD988 19EB0657 89260447 G.&.W.Š.¡1.Š.Š.=..u.Õð±=..u.Õ%±$ 0000C0
 30000200 00000006 02000200 24000105 81010300 0808CAC9 5F5E1F00 EBC028E7 Ô+åŠ..^_èð.........$...........0 0000E0
 8C010300 59000101 F3010300 57000100 9E010300 37000400 83020300 00000E05 ............7.......W...µ...Y...¥ 000100
 5C010300 5F000105 10010300 45000402 0E020300 5C000102 E7010300 58000102 ...¡...Ô...\.......E......._...\ 000120
 08740006 7E83088E FFFF881E 000002C8 00000000 00000000 00000000 60000105 ...'............à....¡...Å.=..t. 000140
 890000FF FF9A0876 FF0A76FF 106A0A6A 0676FF48 EB8AD488 05750A46 08084688 .F..F.u.¡å.ŠH.v.j.j..v..v....... 000160
 FF260277 FF26085E C41EE88A D3880789 26024789 26C02808 5EC41174 C008FE46 F±.åt.á^.+å&.G.&..¡&.Š.á^.&.w.&. 000180
 0006881E 000000C8 C8C91F00 EBC02804 EB000188 0574C008 04C48300 4EE80E37 7.ÒN..á..åt.¡..Š.+åŠ..èüå....¡.. 0001A0
 FF9A0876 FF0A76FF 0676FF18 EB8AD488 05750A46 08084688 08740006 7E83088E .Ä.-..t..F..F.u.¡å.Š..v..v..v... 0001C0
 06468808 8E006E88 1E000000 C8C8C91F 00E8C028 04E88AD3 880574C0 080000FF ....åt.¡&.Š.+åŠ..èüå....¡n..Ä.F. 0001E0

Dump of file SATURN:[PCCOMMON.DUMP.DLL]DGM.TMP;1 on 18-APR-1990 10:44:12.07
File ID (620,6,0)   End of file block 186 / Allocated 188

Virtual block number 85 (00000055), 512 (0200) bytes

 47892606 47892606 5EC40789 26024789 26C02806 5EC432E8 8AD48805 75084608 .F.u.¡å.$2á^.+å&.G.&..á^.&.G.&.G 000000
 C8C8C91F 00E80E47 8926065E C40C4789 26065EC4 08478926 0A478926 065EC404 .á^.&.G.&.G.á^.&.G.á^.&.G.Š..èüå 000020
 A8E98AD4 8806750C 46080A46 88087408 46080646 88088E00 A9881E56 5700005A Z..WV.¡`..Ä.F..F.t..F..F.u.¡å.Õ´ 000040
 18260728 260A5788 26084788 260A5EC4 EA5689E8 46890042 05085688 06468803 ..F..V..B..FÒ.Võá^.&.G.&.W.&+.&. 000060
 8826F656 89F44689 06571826 04472826 0E578826 0C478826 DC56890A 46890257 W..FÒ.VÉ&.G.&.W.&+G.&.W..F¶.V-&. 000080
 9A0CEC1E 8D017202 879AA65E 8DA64689 A8568902 57132607 03260A57 88260847 G.&.W.&..&.W..V´.FÎ.^Î...r...á.. 0000A0
 8D08C483 01A407A1 9A018A03 879ADC88 08EC8301 8506619A 0CF41E8D 01780631 1.(...¶..@....&..É.ñ....É..á.. 0000C0
 56890646 89010004 6E9A01A9 01FA9AC2 5E8D1FA5 A5A5A5DA 8E1E0716 F08BC27E -ð.Þ....ÕEEEE..^ó.°.`..n.±..F@.V 0000E0
 02879AA6 5E8DA646 89A85689 0E571326 0C470326 06578826 04478826 0A5EC408 Äå^.&.G.&.W.&.G.&.W..V´.FÎ.^Î... 000100
 A19A01F1 03879ADC 8808EC83 01EC0661 9A0CF41E 8D01E206 319A0CEC 1E8D01D9 1...&..1.å...¶..@.&..&..É.ñ.þ..À 000120
 046E9A02 1001FA9A 8A5E8D1F A5A5A5A5 DA8E1E07 16F0888A 7E8D08C4 83020807 ....á..-¤.Þ....ÕEEEE..^¤.°....n. 000140
 06619A0C F41E8D02 3006319A 0CEC1E8D 02270287 9A0E5E8D CC5689CA 4689021E ...Fð.Vä.^....'...&..1.0...¶..@. 000160
 A5A5DA8E 1E0716F0 88827E8D 08C48302 5907A19A 023F0387 9ADC8808 EC83023A :..&..É.ñ.?..Å.Y..á..-ÿ.Þ....ÕEE 000180
 1E8D0275 02879A12 5E8DFE56 89FC4689 026C046E 9A025E01 FA9A825E 8D1FA5A5 ÉE..^ÿ.°.^..n.l..F•.V±.^....u... 0001A0
 8302A707 A19A028D 03879ADC 8808EC83 02880661 9A0CF41E 8D027E06 319A0CEC &..1.-...¶..@....&..É.ñ....Å.Î.. 0001C0
 468902F8 046E9A02 AC01FA9A AA5E8D1F A5A5A5A5 DA8E1E07 16F088AA 7E8D08C4 á..-`.Þ....ÕEEEE..^^.°.˜..n.%..F 0001E0

Dump of file SATURN:[PCCOMMON.DUMP.DLL]DGM.TMP;1 on 18-APR-1990 10:44:12.07
File ID (620,6,0)   End of file block 186 / Allocated 188

Virtual block number 86 (00000056), 512 (0200) bytes

 1C7201F4 7E83067F 247C00F6 7E832A72 010A7E83 067F327C 000C7E83 FA5689F8 %.V°.-É.|2...-ð.r°.--.|$...-¶.r. 000000
 E98AD188 06730112 7E83067C 0E7F0014 7E830E72 010E7E83 067F167C 00107E83 .-..|....-..r..-....|..-..s.¡1.ð 000020
 8D031503 879ACE5E 8D030006 8F9A0305 02879ADA 5E8D0300 02879A0E 5E8D01C7 ú..^.......^ö...........^ö.ñ.... 000040
 9AEC5E8D 03320387 9AEC5E8D 032A068F 9A032202 879AF45E 8D031D02 879A125E ^.......^¶..."....°..^&.ñ.2..^&. 000060
 EC5E8D08 E8035301 FA9ACE5E 8D0A7303 49069E9A 033F01FA 9ACE5E8D 033A01FA °.:..^ö.°.?....I.s..^ö.°.S.Š..^& 000080
 199A0CFC 1E8D0371 0?FA9AE0 5E8D5016 DE468D03 6803879A E05E8D03 5801FA9A .°.{..^Å.ñ.h..F8.P.^Å.°.q...•... 0000A0
 46081846 8810C483 .?FF0418 9AE876FF EA76FF03 F003879A DC8808EC 83037806 .(..&..É.ñ.Þ..vð.vÒ......á..F..F 0000C0
 77FF26E8 5EC4DE76 ??187400 167E8301 18E9C028 0789260E 4688185E C40E741A .t.á^..F8&..+åÖ...-..t..vBá^Ò&.w 0000E0
 0E478826 E85EC40E 4789260E 4688E85E C408C483 FFFF0CAA 9A0676FF 0876FF0E ..v..v..`....á.á^Ö.F8&.G.á^Ò&.G. 000100
 02879AD6 5E8D1FA5 A5A5A5DA 8E1E0716 F088E07E 8D0A5788 26084703 2603E0C1 &Å.&.G.&.W..-Å.Þ....ÕEEEE..^ø... 000120
 07A19A04 1003879A DC8808EC 83040806 619A0CF4 1E800401 060A9AE0 5E8D03F8 %..^Å.......¶..@....&..É.ñ....Å. 000140
 FF046E9A 042F01FA 9AAA5E8D 1FA5A5A5 A5DA8E1E 0716F088 AA7E8008 C483042A °..á..-`.Þ....ÕEEEE..^^.°./..n.. 000160
 E05E8D04 5302879A CA5E8002 5C89260C 8926E876 C4DA18C8 28FE5E88 FC4E88FF ..N•.^±+à.ÕåvÕ&..&.\..^ð...S..^Å 000180
 08C48304 8507A19A 04680387 9ADC8808 EC830466 06619A0C F41E8D04 5C060A9A ...\...¶..@.f..&..É.ñ.k..Å....á. 0001A0
 88F84E88 0169046E 9A048A01 FA9A825E 8D1FA5A5 A5A5DA8E 1E0716F0 88827E8D .-ÿ.Þ....ÕEEEE..^ÿ.°....n.Î..N%. 0001C0
 10E99A06 76FF0876 FF0E7400 167E8306 5C892604 4C8926E8 76C4DA18 C828FA5E ^°+à.ÕåvÕ&.L.&.\..-..t..v..v..ð. 0001E0
```

```
Dump of file SATURN:[PCCOMMON.DUMP.DLL]DGM.TMP;1 on 18-APR-1990 10:44:12.07
File ID (620,6,0)   End of file block 186 / Allocated 188

Virtual block number 87 (00000057), 512 (0200) bytes

08460806 4688088E 00F7881E 56570000 38C8CBC9 5F5E1F00 E8C02804 C483038A
5EC4EC46 89EE4689 E84689EA 4689C028 01F0E98A 04880675 0C46080A 46880874 ¤..â.+âS..^ èùâ8..WV.¡X..Ä.F..F. 000000
801FA5A5 A5A50A8E 1E0716F0 88E07E8D 0A578826 08470326 03E0C10E 47882606 t..F..F.u.¡Ì.Öþ.+â.Fõ.FÒ.FŸ.F$â^ 000020
03879ADC 8808EC83 05300661 9A0CF41E 80052606 0A9AE05E 80051002 879AE85E .&.G.éÀ.&.G.&.W..-Ä.Þ....ÖEEEE.. 000040
5401FA9A 085E801F A5A5A5A5 DA8E1E07 16F088D8 7E8008C4 83054F07 A19A0535 ^Ò......^Ä...&...¶..e.0.....É.ñ. 000060
5E800574 02879AEC 5E80FA56 89F84689 02571326 07032606 5EC4056C 046E9A05 5..À.O..â..-Ä.Þ....ÖEEEE..^Ä.*.T 000080
C48305A6 07A19A05 8C03879A DC8808EC 83058706 619A0CF4 1E80057D 060A9AE0 ..n.l.â^.&..&.W..F%.V*.^&...t..^ 0000A0
065EC404 48046E9A 05A801FA 9A005E80 1FA5A5A5 A50A8E1E 0716F088 D07E8008 À...)...¶..e....&..É.ñ....À.Ì..â 0000C0
57882608 47032603 E0C10E47 8826FE76 89FC4E89 F213C803 06778826 044F8826 ..-Ä.Þ....ÖEEEE..^Ä.*.....n.K.â^. 0000E0
05F7060A 9A005E80 05EE0288 9A0A5EC4 1FA5A5A5 A50A8E1E 0716F088 D07E8 0A &.O.&.w..â...N=.v±&.G.éÀ.&.G.&.W 000100
F088087E 8008C483 062007A1 9A060603 879ADC88 08EC8306 0106619A 0CF41E.. ..-Ä.Þ....ÖEEEE.â^....Ÿ..^Ä...X. 000120
57132607 0326065E C4064004 6E9A0625 01FA9A08 5E801FA5 A5A5A50A 8E1E0716 ..¶..e....&..É.ñ....À. ..â..-Ä.Þ 000140
619A0CF4 1E800651 060A9A00 5E800648 02889A04 5F800A5E C4F25689 F0468902 ....ÖEEEE..^Ä.*.X..n.ə.â^.&..&.W 000160
A50A8E1E 0716F088 C87E8008 C483067A 07A19A06 6003879A DC8808EC 83065806 ..FÞ.V·â^.......H..^Ä...Q...¶..e 000180
F213C803 06778826 044F8826 065EC405 15046E9A 067F01FA 9AC85E80 1FA5A5A5 .[..&..É.ñ.¯..Ä.z..â..-â.Þ....ÖE 0001A0
4688F656 19F44629 FE5688FC 4688F256 19F04629 FA5688F8 4688F676 89F44E89 EEE..^â.*....n...â^.&.O.&.w..â.· 0001C0
                                                                        .N¶.V-.F%.V*)FÞ.V·.F=.V±)F¶.V-.F 0001E0
Dump of file SATURN:[PCCOMMON.DUMP.DLL]DGM.TMP;1 on 18-APR-1990 10:44:12.07
File ID (620,6,0)   End of file block 186 / Allocated 188

Virtual block number 88 (00000058), 512 (0200) bytes

00E8C028 06571926 04472926 F65688F4 4688065E C4025719 26072926 F25688F0
750E4608 0C468808 74084608 064688D8 8E04C688 1E565700 001CC8CB C95F5E1F Þ.V·&).&.W.â^..F¶.V-&)G.&.W.+âS. 000000
8826065E C4072101 FE9A1880 085FC426 065EC403 E6C10A76 880134E9 8AD48806 .^ èùâ...WV.¡ó..Ä.F..F.t..F..F.u 000020
8826065E C40748O3 879AF85E 80072906 2A9A1880 0874C426 06768803 E3C10E5F .¡Ì.04..v.èl.â^.&ó_....±.l.â^.&. 000040
F85E8007 5302879A E45E80E4 4689E656 89025718 26072826 0C5EC402 57882607 -.éD..v.&ât....*.)..^%.ñ.K.â^.&. 000060
08C48307 8507A19A 07680387 9ADC8808 EC830766 06619A0C F41E8007 5C060A9A .&.W.â^.&+.&.W..VÌ.Fõ.^Ò...S..^% 000080
260C5EC4 07C2046E 9A078A01 FA9AF05E 801FA5A5 A5A50A8E 1E0716F0 88F07E8D ...\...¶..e.f..&..É.ñ.k..À....â. 0000A0
28260C5E C4065788 26044788 26065EC4 02578926 07892606 5EC40257 13260703 .-Þ.Þ....ÖEEEE..^Þ.*....n.ô.â^.& 0000C0
0CF41E80 0703060A 9AF85E80 07CA0287 9AE45E80 E44689E6 56890657 18260447 ..&.W.â^.&..&.W.â^.&.G.&.W.â^.&+ 0000E0
8E1E0716 F088E87E 8008C483 07FC07A1 9A07E203 879ADC88 08EC8307 D006619A G.&.W..VÌ.Fõ.^õ...b..^%...£...¶. 000100
C8030677 8826044F 88260C5E C405E604 6E9A0801 01FA9AE8 5E801FA5 A5A5A50A .e.Ì..&..É.ñ.&..À.=..â..-Ò.Þ.... 000120
C8C95F5E 1F00E8C0 280E4789 260A4688 065EC406 77892604 4F892606 5EC4F213 ÖEEEE..^Ò.*....n.Ì.â^.&.O.&.w..à 000140
1C7F040A 7E83227C 010A7E83 28740846 08064688 088E0600 881E5657 000024C8 .·â^.&.O.&.w.â^..F.&.G.+âS..^_èù 000160
E98A0488 06751446 08124688 08741046 080E4688 107F040C 7E83167C 010C7E83 âS..WV.¡Ì..Ä.F..F.t(.-..|".-.... 000180
F0E90374 020C7E83 0106E903 74010A7E 83020CE9 C0280575 0A46390C 46880219 .-..|..-.....F..F.t..F..F.u.¡â.Ö 0001A0
A5A5A50A 8E1E0716 F088F87E 800A5788 26084703 2603E0C1 0E478826 065EC400 ...F.9F.u.+âÖ...-..t.Ö...-..t.Ö» 0001C0
                                                                        .â^.&.G.éÀ.&.G.&.W..-%.Þ....ÖEEE 0001E0
Dump of file SATURN:[PCCOMMON.DUMP.DLL]DGM.TMP;1 on 18-APR-1990 10:44:12.07
File ID (620,6,0)   End of file block 186 / Allocated 188

Virtual block number 89 (00000059), 512 (0200) bytes

9AE45E8D E44689E6 56890257 1826072B 26065EC4 02578826 0788260E 5EC41FA5
9A08F203 879ADC88 08EC8308 ED06619A 0CF41E80 08E30622 9AF85E80 080A0287 E.â^.&..&.W.â^.&+.&.W..VÌ.Fõ.^ö. 000000
6E9A0911 01FA9AF0 5E801FA5 A5A5A50A 8E1E0716 F088F07E 8008C483 090C07A1 ..Ö..^%.".D...¶..e.Ù..&..É.ñ.... 000020
2604472B 26065EC4 06578826 04478826 0E5EC402 57892607 8926125E C4093F04 À....â..-Þ.Þ....ÖEEEE..^Þ.*....n 000040
06619A0C F41E8009 5006229A F85E8009 4702879A E45E80E4 4689E656 89065718 .7.â^.&..&.W.â^.&.G.&.W.â^.&+G.& 000060
A5A50A8E 1E0716F0 88E87E8D 08C48309 7907A19A 095F0387 9ADC8808 EC83095A .W..VÌ.Fõ.^Ò...G..^%.".P...¶..e. 000080
7E8300F9 E9065789 26044789 26125EC4 0709046E 9A097E01 FA9AE85E 801FA5A5 Z..&..É.ñ._..À.y..â..-Ò.Þ....ÖEE 0000A0
88260847 032603E0 C10E4788 26065EC4 00E2E903 74010C7E 8300E8E9 0374020A EE..^Ò.*.-..n...â^.&.G.&.W.Ö*..- 0000C0
D8060A9A E85E8009 CF02889A 0E5EC41F A5A5A5A5 DA8E1E07 16F088E8 7E800A57 ..t.ÖS..-..t.Öâ.â^.&.G.éÀ.&.G.&. 0000E0
88F07E8D 08C4830A 0107A19A 09E70387 9ADC8808 EC8309E2 06619A0C F41E8009 W..-Ò.Þ....ÖEEEE.â^....Ü..^Ò...À 000100
13260703 26065EC4 0A25046E 9A0A0601 FA9AF05E 801FA5A5 A5A50A8E 1E0716F0 ...¶..e.ä..&..É.ñ.Ö..À....â..-Þ. 000120
800A3606 0A9AE85E 800A2002 889A045F 800E5EC4 02578926 07892612 5EC40257 Þ....ÖEEEE..^Þ.*....n.X.â^.&..&. 000140
16F0880C 7E8008C4 830A5F07 A19A0A45 03879ADC 8808EC83 0A400661 9A0CF41E W.â^.&..&.W.â^.........^Ò...6.. 000160
77882604 4F882606 5EC408D2 046E9A0A 6401FA9A 0C5E801F A5A5A5A5 DA8E1E07 .¶..e.ə..&..É.ñ.Ë..À._..â..-É.Þ. 000180
C8C95F5E 1F00E8C0 2804E88A DA8805E8 06778926 044F8926 125EC4F2 13C80306 ...ÖEEEE..^É.*.d..n.0.â^.&.O.&.w 0001A0
1C7F040C 7E83227C 010C7E83 28740846 08064688 088E0838 881E5657 000034C8 ..à.·â^.&.O.&.w.S.¡Ö.S.+âS..^_èù 0001C0
                                                                        â4..WV.¡8..Ä.F..F.t(.-..|".-.... 0001E0
```

Dump of file SATURN:[PCCOMMON.DUMP.DLL]DGM.TMP;1 on 18-APR-1990 10:44:12.07
File ID (620,6,0)   End of file block 186 / Allocated 188

Virtual block number 90 (0000005A), 512 (0200) bytes

```
E98AD488 06751646 08144688 08741246 08104688 107F040E 7E83167C 010E7E83 .~..|..~.....F..F.t..F..F.u.|&.Ö 000000
7C357F0A 57392602 57882607 8826145E C40479E9 C02B0575 0C46390E 46880486 ...F.9F.u.+äÖy.&^.&..&.W.&9W..5| 000020
26078926 0A578824 08478826 FE5689FC 46890257 8826078B 262D7308 47392606 .&9G.s-&..&.W..F•.V&&.G.&.W.&..& 000040
260E5788 260C4788 26145EC4 0A578926 08478926 FE5688FC 4688145E C4025789 .W.&^..F•.V&&.G.&.W.&^.&.G.&.W.& 000060
260C4788 26FA5689 F8468906 57882604 4788262F 76044739 26067F37 7C065739 9W.|7..&9G.v/&.G.&.W..F%.V'&.G.& 000080
010C7E83 0E578926 0C478926 FA5688F8 4688145E C4065789 26044789 260E5788 .W.&.G.&.W.&^..F%.V'&.G.&.W..~.. 0000A0
0A578826 08470326 03E0C10E 47882606 5EC401F9 E9037402 0E7E8302 02E90374 t.Ö...~..t.Ö'.&^.&.G.éÀ.&.G.&.W. 0000C0
26072826 065EC402 57882607 8826105E C41FA5A5 A5A50A8E 1E0716F0 88F07E8D .~Þ.Þ....ÖEEEE.&^.&..&.W.&^.&+.& 0000E0
06619A0C F41E8D08 D006229A F05E8008 C702879A DC5E8DDC 46890E56 89025718 .W..V8.FÉ.^É...Ú..^Þ.".À...¶..a. 000100
A5A50A8E 1E0716F0 88E87E8D 08C4830B F907A19A 08DF0387 9ADC8B08 EC830B0A Ü..&..É.Ñ.Ö..À.'..&..~Ö.Þ....ÖEE 000120
47882610 5EC40257 89260789 26145EC4 0C2C046E 9A08FE01 FA9AE85E 8D1FA5A5 EE..^Ö.'.±..n.,.&^.&..&.W.&^.&.G 000140
5E8D0C34 02879ADC 5E8DDC46 89DE5689 06571826 04472826 065EC406 57882604 .&.W.&^.&+G.&.W..V8.FÉ.^É...4..^ 000160
C4830C66 07A19A0C 4C03879A DC8808EC 830C4706 619A0CF4 1E8D0C30 06229AF0 Þ.".=...¶..a.G..&..É.Ñ.L..À.f..& 000180
145EC409 C7046E9A 0C6801FA 9AE05E8D 1FA5A5A5 A50A8E1E 0716F088 E07E8D08 ..~À.Þ....ÖEEEE..^À.'.k..n.ú.&^. 0001A0
16F088E0 7E8D0A57 88260847 032603E0 C10E4788 26065EC4 06578926 04478926 &.G.&.W.&^.&.G.éÀ.&.G.&.W..~À.Þ. 0001C0
56890257 18260728 26065EC4 0A578826 08478826 105EC41F A5A5A5A5 DA8E1E07 ...ÖEEEE.&^.&.G.&.W.&^.&+.&.W..V 0001E0
```

Dump of file SATURN:[PCCOMMON.DUMP.DLL]DGM.TMP;1 on 18-APR-1990 10:44:12.07
File ID (620,6,0)   End of file block 186 / Allocated 188

Virtual block number 91 (0000005B), 512 (0200) bytes

```
08EC830C D506619A 0CF41E8D 0CC80622 9AE05E8D 0CC20287 9ADC5E8D DC46890E &.FÉ.^É...ö..^À.".ù...¶..a.f..&. 000000
5E8D1FA5 A5A5A5DA 8E1E0716 F088E87E 8D08C483 0CF407A1 9A0CDA03 879^^C88 .É.Ñ.Ö..À.¶..&..~Ö.Þ....ÖEEEE..^ 000020
5788260C 47882610 5EC40A57 89260847 8926145E C4002804 6E9A0CF9 01FA% %8 Ö.'.'..n.(.&^.&.G.&.W.&^.&.G.&.W 000040
06229AE0 5E8D0030 02879ADC 5E8DDC46 890E5689 06571826 04472826 065EC4 E .&^.&+G.&.W..V8.FÉ.^É...0..^À.". 000060
D47E8D08 C4830062 07A19A0D 4803879A DC8808EC 83004306 619A0CF4 1E8D0D39 9...¶..a.C..&..É.Ñ.H..À.b..&..~& 000080
0C478926 145EC408 BF046E9A 006701FA 9AD45E8D 1FA5A5A5 A5DA8E1E 0716F088 .Þ....ÖEEEE..^&.'.g..n.¢.&^.&.G. 0000A0
0E478826 065EC401 C6E90374 010E7E83 01CFE903 74020C7E 830100E9 0E578926 &.W.Öt..~..t.ÖÜ..~..t.Öö.&^.&.G. 0000C0
02889A10 5EC41FA5 A5A5A5DA 8E1E0716 F088047E 8D0A5788 26084703 2603E0C1 éÀ.&.G.&.W..~&.Þ....ÖEEEE.&^.... 0000E0
07A19A0D D003879A DC8808EC 8300C806 619A0CF4 1E800DC1 060A9AD4 5E8D0088 ¡..^&...è...¶..a.Ù..&..É.Ñ.À..À. 000100
0E046E9A 0DEF01FA 9AE85E8D 1FA5A5A5 A50A8E1E 0716F088 E87E8008 C48300EA ö..&..~Ö.Þ....ÖEEEE..^Ö.'.ÿ..n.. 000120
0E160288 9A045F8D 105EC402 57892607 8926145E C4025713 26070326 065EC40E .&^.&..&.W.&^.&..&.W.&^......... 000140
0E4807A1 9A0E2E03 879ADC88 08EC830E 2906619A 0CF41E8D 0E1F060A 9AD45E8D .^&.......¶..a.)..&..É.Ñ¯...À.H. 000160
C40C8A04 6E9A0E40 01FA9ACC 5E8D1FA5 A5A5A5DA 8E1E0716 F088CC7E 8D08C483 .&..~ä.Þ....ÖEEEE..^ä.'.M..n.¤.& 000180
0E478826 065EC406 77892604 4F892614 5EC4F213 C8030677 8826044F 8826065E ^.&.O.&.w..&.·&^.&.O.&.w.&^.&.G. 0001A0
085F8D10 5EC41FA5 A5A5A5DA 8E1E0716 F088CC7E 8D0A5788 26084703 2603E0C1 éÀ.&.G.&.W..~ä.Þ....ÖEEEE.&^..¸. 0001C0
0E8303B7 9ADC8808 EC830EAE 06619A0C F41E8D0E A4060A9A CC5E8D0E 9802889A ......^ä...É...¶..a.Û..&..É.Ñ.▼. 0001E0
```

Dump of file SATURN:[PCCOMMON.DUMP.DLL]DGM.TMP;1 on 18-APR-1990 10:44:12.07
File ID (620,6,0)   End of file block 186 / Allocated 188

Virtual block number 92 (0000005C), 512 (0200) bytes

```
9A0ED201 FA9AE05E 8D1FA5A5 A5A5DA8E 1E0716F0 88E07E8D 08C4830E CD07A19A .À.ë..&..~À.Þ....ÖEEEE..^À.'.@.. 000000
9A0C5F8D 105EC40A 57892608 47892614 5EC40257 13260703 26065EC4 0EF2046E n.·.&^.&..&.W.&^.&.G.&.W.&^.._.. 000020
9A0F1203 879ADC88 08EC830F 0006619A 0CF41E8D 0F03060A 9ACC5E8D 0EFA0288 ..'..^ä.......¶..a....&..É.Ñ¯... 000040
6E9A0F31 01FA9AE8 5E8D1FA5 A5A5A5DA 8E1E0716 F088E87E 8D08C483 0F2C07A1 À.,..&..~Ö.Þ....ÖEEEE..^Ö.'.1..n 000060
8805E80E 7789260C 4F892614 5EC4F213 C8030677 8826044F 8826065E C400B004 .¯.&^.&.O.&.w..&.·&^.&.O.&.w.Š.¡ 000080
74084608 06468808 8E0A9888 1E565700 0008C8CB C95F5E1F 00E8C028 04E88ADA Ö.Š.+åŠ..^_èüá...WV.¡...Ä.F..F.t 0000A0
768803E3 C10E5F88 26065EC4 74E88AD4 88057D01 0A7E8306 740E4608 0C46880E ..F..F.t..=..).¡å.Štá^.&._.èÖ..v 0000C0
06619A0C F41E800F 80068A9A 0FA70294 9A0A5E8D 0FA201FE 9A188008 74C42606 .&åt....±.À..^....Ï....¯..¶..a. 0000E0
A5A5DA8E 1E0716F0 88F87E8D 08C4830F D907A19A 0FBF0387 9ADC8808 EC830F8A ¤..&..É.Ñ.¢..À.\..&..~%.Þ....ÖEE 000100
26057D01 3F83260C 5EC40789 260C5EC4 0E93046E 9A0FDE01 FA9AF85E 8D1FA5A5 EE..^%.'.&..n...&^.&..&^.&.7.).& 000120
0000000B 04800002 00000008 03860002 000690CB C95F5E1F 00E8C028 000107C7 ú...+åŠ..^_èù...............¯..... 000140
00450004 008F0203 00370004 00280203 0000000E 0F650002 00000000 0F9A0002 .........ê.......+...7.......E. 000160
89FC4689 1056880E 4688FA56 89F84689 0C56880A 46880D8E FFFF881E 000008C8 à....¡...Ä.F..V..F%.V'.F..V..F•. 000180
4688FA56 89F84689 14568812 46880000 007E9A50 16F8468D 0676FF08 76FFFE56 V±.v..v..F%.P.~....F..V..F%.V'.F 0001A0
0C56880A 46880000 00A69A50 16F8468D 0676FF08 76FFFE56 89FC4689 18568816 ..V..F•.V±.v..v..F%.P.Ï....F..V. 0001C0
FFFF9A50 16F8468D 0676FF08 76FFFE56 89FC4689 18568816 4688FA56 89F84689 .F%.V'.F..V..F•.V±.v..v..F%.P... 0001E0
```

```
Dump of file SATURN:[PCCOMMON.DUMP.DLL]DGM.TMP;1 on 18-APR-1990 10:44:12.07
File ID (620,6,0)   End of file block 186 / Allocated 188

Virtual block number 93 (0000005D), 512 (0200) bytes

0676FF08 76FFFE56 89FC4689 1056880E 4688FA56 89F84689 14568812 46880000 ...F..V..F%.V*.F..V..F=.V±.v..v. 000000
56880A46 88088E00 06881E00 0008C8C8 C91F00E8 C0280000 FFFF9A50 16F8468D .F%.P.....+åS..èuà....|...Ä.F..V 000020
2E9A5016 F8468D06 76FF0876 FFFE5689 FC468910 56880E46 88FA5689 F846890C ..F%.V*.F..V..F=.V±.v..v..F%.P.. 000040
76FF0876 FFFE5689 FC468918 56881646 88FA5689 F8468914 56881246 88000000 ....F..V..F%.V*.F..V..F=.V±.v..v 000060
1F00E8C0 280000FF FF9A1E76 FF2076FF 1A76FF1C 76FF5016 F8468001 6A006A06 .j.j..F%.P.v..v..v .v......+åS.. 000080
0130057F 227CD208 991A4688 2A740846 08064688 D88E0087 881E0000 10C8C8C9 èuà....|ñ..Ä.F..F.t*.F...@|"..=. 0000A0
D488067D 00247E83 067C0020 7E830C72 00013005 7F137C02 08991C46 88187200 .r..F...@|...=..r..~ .|..-$.).|à 0000C0
89F44689 0C56880A 46882476 0A463905 7F287C0C 56391456 88124688 0237E98A .Õ7..F..V.9V.|+..9F.v$.F..V..F¶. 0000E0
18568816 46881456 89124689 F65688F4 46880C56 890A4689 14568812 4688F656 V-.F..V..F..V..F¶.V-.F..V..F..V. 000100
46891856 88164688 F25689F0 46891056 880E4688 24760E46 39057F28 7C105639 9V.|+..9F.v$.F..V..Fþ.V·.F..V..F 000120
880A4688 6375011C 7E836975 011A7E83 18568916 4689F256 88F04688 1056890E ..V..Fþ.V·.F..V..~..ui.~..uc.F.. 000140
9A5016F8 46800676 FF0876FF FE5689FC 46891056 880E4688 FA5689F8 46890C56 V..F%.V*.F..V..F=.V±.v..v..F%.P. 000160
FF0876FF FE5689FC 46891856 88164688 FA5689F8 46891456 88124688 00000272 r....F..V..F%.V*.F..V..F=.V±.v.. 000180
FF0158E9 000002AA 9A2276FF 2476FF1E 76FF2076 FF5016F8 4680026A 006A0676 v.j.j..F%.P.v .v..v$.v".^...ÕX.. 0001A0
1056880E 4688FA56 89F84689 0C56880A 46880000 FFFF9A00 6A006A06 76FF0876 v..v.j.j.......F..V..F%.V*.F..V. 0001C0
89F84689 14568812 46880000 00DF9A50 16F8468D 0676FF08 76FFFE56 89FC4689 .F=.V±.v..v..F%.P.Õ....F..V..F%. 0001E0

Dump of file SATURN:[PCCOMMON.DUMP.DLL]DGM.TMP;1 on 18-APR-1990 10:44:12.07
File ID (620,6,0)   End of file block 186 / Allocated 188

Virtual block number 94 (0000005E), 512 (0200) bytes

2076FF50 16F8468D 026A006A 0676FF08 76FFFE56 89FC4689 18568816 4688FA56 V*.F..V..F=.V±.v..v.j.j..F%.P.v  000000
481A4688 1974001E 7E83067F 217C0020 7E830000 01179A22 76FF2476 FF1E76FF .v..v$.v"......~ .|I...~..t..F.H 000020
227E8306 7F217C00 247E831E 46892046 89C02808 7D00207E 83205619 1E462999 .)F..V .~ .).+å.F .F..-$.|I...~" 000040
991A4688 22468924 4689C028 08700024 7E832456 19224629 99481C46 88197400 .t..F.H.)F".V$.-$.).+å.F$.F".F.. 000060
83000120 1056130E 4603991C 4688FA56 89F84689 00DA8300 01200C56 130A4603 .F..V.-...Õ..F%.V*.F...F..V.-... 000080
88124E88 991A4688 00000200 9A5016F8 46800676 FF0876FF FE5689FC 4689000A Õ..F=.V±.v..v..F%.P......F...N.. 0000A0
DA18C828 185E8816 4E88991C 4688FA5E 89F84E89 00038301 C1830A18 C828145E ^.+à.Õ.ê..Æ..N%.^*.F...N..^.+à.Õ 0000C0
76FF2076 FF5016F8 4680026A 006A0676 FF0876FF FE5E89FC 4E890003 8301C183 .ê..Æ..N=.^±.v..v.j.j..F%.P.v .v 0000E0
14C8C8C9 1F00E8C0 280000FF FF9A0676 FF0876FF 00000238 9A2276FF 2476FF1E ..v$.v".8....v..v.......+åS..èuà. 000100
880676FF 0876FFF6 5689F446 890000FF FF9A0676 FF0876FF 088E0128 881E0000 ...|(..Ä.v..v.......F¶.V-.v..v.. 000120
56391456 88124688 0000FFFF 9A0042B7 FF260044 87FF2600 04068E02 E3C1225E ^"èD.....&.ñD.&.ñ8.......F..V.9V 000140
890A4689 14568812 4688F256 89F04689 0C56880A 46882476 0A463905 7F287C0C .|+..9F.v$.F..V..Fþ.V·.F..V..F.. 000160
24760E46 39057F28 7C105639 18568816 46881456 89124689 F25688F0 46880C56 V..Fþ.V·.F..V..F..V.9V.|+..9F.v$ 000180
4689EE56 88EC4688 1056890E 46891856 88164688 EE5689EC 46891056 880E4688 .F..V..F&.VŸ.F..V..F..V..F&.VŸ.F 0001A0
FF0876FF FE5689FC 46891U56 880E4688 FA5689F8 46890C56 880A4688 18568916 ..V..F..V..F%.V*.F..V..F=.V±.v.. 0001C0
46891856 88164688 FA5689F8 46891456 88124688 00000334 9A5016F8 4680U 76 v..F%.P.4....F..V..F%.V*.F..V..F 0001E0

Dump of file SATURN:[PCCOMMON.DUMP.DLL]DGM.TMP;1 on 18-APR-1990 10:44:1¿.07
File ID (620,6,0)   End of file block 186 / Allocated 188

Virtual block number 95 (0000005F), 512 (0200) bytes

9A1E76FF 2076FF1A 76FF1C76 FF5016F8 4680026A 006A0676 FF0876FF FE5689FC =.V±.v..v.j.j..F%.P.v..v..v .v.. 000000
00000CC8 C8C91F00 E8C02800 0003049A F476FFF6 76FF0676 FF0876FF 00000388 .....v..v..v-.v¶.å...+åS..èuà... 000020
125E8806 76FF0876 FFF65689 F4468900 0003AF9A 0676FF08 76FFD88E 03A4881E .|Ê..Ä.v..v..£....F¶.V-.v..v..^. 000040
02578826 0788260A 5EC40000 055F9A00 4287FF26 004487FF 26000406 8E02E3C1 èD.....&.ñD.&.ñ8........á^.&..&.W. 000060
9A5016F8 46800676 FF0876FF FE5689FC 46890657 88260447 8826FA56 89F84689 .F%.V*&.G.&.W..F=.V±.v..v..F%.P. 000080
89FC4689 06578826 04478826 FA5689F8 46890257 88260788 260E5EC4 00000468 h...á^.&..&.W..F%.V*&.G.&.W..F=. 0000A0
819AF476 FFF676FF 0676FF08 76FF0000 00569A50 16F8468D 0676FF08 76FFFE56 V±.v..v..F%.P.V....v..v..v-.v¶.Ý 0000C0
89000004 CD9A0676 FF0876FF D88E04C2 881E0000 10C8C8C9 1F00E8C0 28000004 ...+åS..èuà....|ô..Ä.v.. '..ë.... 0000E0
9A0042B7 FF260044 87FF2600 04068E02 E3C1125E 880676FF 0876FFF2 5689F046 Fþ.V·.v..v..^.èD.....&.ñL &.ñ8.. 000100
89FC4689 06578826 04478826 FA5689F8 46890257 88260788 260A5EC4 00000634 4...á^.&..&.W..F%.V*&.G.&.W..F=. 000120
5689F446 89000805 0C56880A 46880000 05209A50 16F8468D 0676FF08 76FFFE56 V±.v..v..F%.P. ....F..V.....F¶.V 000140
57882607 8826F45E C4307410 46080E46 8800105E 83010E6E 8308F446 8304E8F6 -Š..F¶..n...^...F..F.t0á^¶&..&.W 000160
5016F846 800676FF 0876FFFE 5689FC46 89065788 26044788 26FA5689 F8468902 ..F%.V*&.G.&.W..F=.V±.v..v..F%.P 000180
C8C8C91F 00E8C028 000004F2 9AF076FF F276FF06 76FF0876 FF8CE800 00054E9A .N...Šv.v..v..v .vþ.`...+åS..èuà 0001A0
7F0808F6 5E89F44E 89DA18C8 28145E88 124E8899 164688D8 8E057088 1E00000C ....|P..Ä.F...N..^.+à.Õ.N¶.^-.Ü. 0001C0
0676FF08 76FF0A76 FF0C76FF 0E76FF10 76FF1276 FF1476FF 247301F9 83057C28 +|..*.s$.v..v..v..v..v..v..v..v. 0001E0
```

```
Dump of file SATURN:[PCCOMMON.DUMP.DLL]DGM.TMP;1 on 18-APR-1990 10:44:12.07
File ID (620,6,0)   End of file block 186 / Allocated 188

Virtual block number 96 (00000060), 512 (0200) bytes

 46891056 880E4688 FA5689F8 46890C56 880A4688 008AE9C0 2810C483 0155E80E .ÕU..å.+åÕn..F..V..F%.V°.F..V..F 000000
 0676FF08 76FF1A7F 01167E83 00000707 9A5016F8 46800676 FF0876FF FE5689FC •.V±.v..v..F%.P......-.....v..v. 000020
 4A9A006A 006A0676 FF0876FF 72EBC028 0000071D 9A5052C0 28125688 026A006A j.j..V.+åRP.....+åSr.v..v.j.j..J 000040
 76FF0876 FFFE568^ FC468910 56880E46 88FA5689 F846890C 56880A46 88000002 ....F..V..F%.V°.F..V..F=.V±.v..v 000060
 0007339A 5052C028 12568802 6A006A06 76FF0876 FF000005 CE9A5016 F8468006 ..F%.P.ö....v..v.j.j..V.+åRP.3.. 000080
 03939A06 76FF0876 'F0000FF FF9A5052 C028F456 88026A00 6A0676FF 0876FF00 ..v..v.j.j..V¶+åRP......v..v.... 0000A0
 46890000 05789A06 5FF0876 FF088E06 45881E00 000CC8C8 C91F00E8 C0280000 ..+åS..èüå....¡E..Å.v..v..(....F 0000C0
 CE9AD042 87FF2600 4487FF26 0D04068E 02E3C116 5E880676 FF0876FF F65689F4 ¶.V-.v..v..^.èD.....&.ñD.&.ñ8..ö 0000E0
 76FF0876 FFFE5689 FC468910 56880E46 88FA5689 F846890C 56880A46 88000007 ....F..V..F%.V°.F..V..F=.V±.v..v 000100
 0006CC9A 5052C028 12568802 6A006A06 76FF0876 FF000006 809A5016 F8468006 ..F%.P.¯....v..v.j.j..V.+åRP.ä.. 000120
 4F881E00 0008C8C8 C91F00E8 C0280000 05A09AF4 76FFF676 FF0676FF 0876FF00 ..v..v..v-.v¶.....+åS..èüå....¡O 000140
 76FF0876 FFFE5689 FC468910 56880E46 88FA5689 F846890C 56880A46 88D88E07 ..Ä.F..V..F%.V°.F..V..F=.V±.v..v 000160
 0007809A 5052C028 12568801 6A006A06 76FF0876 FF000007 A79A5016 F8468006 ..F%.P.Ì....v..v.j.j..V.+åRP.§.. 000180
 46890257 88260788 26165EC4 088E07DF 881E5657 000070C8 C8C91F00 E8C02800 .+åS..èüåp..WV.¡Ö..Åå^.&..&.W..F 0001A0
 26072826 125EC402 57882607 8826EE56 89EC4689 06578826 04478826 EA5689E8 Ö.Võ&.G.&.W..F&.VŸ&..&.W.å^.&+.& 0001C0
 8906571B 26044728 26125EC4 06578826 04478826 165EC486 56898446 8902571B .W..FÇ.VÑå^.&.G.&.W.å^.&+G.&.W.. 0001E0

Dump of file SATURN:[PCCOMMON.DUMP.DLL]DGM.TMP;1 on 18-APR-1990 10:44:12.07
File ID (620,6,0)   End of file block 186 / Allocated 188

Virtual block number 97 (00000061), 512 (0200) bytes

 02879A80 5E8008A0 068A9A08 9802879A 845E8008 9302879A 845E8082 56898046 F¯.Vÿ.^Ç......^Ç...........^¯... 000000
 7D9A08C1 03879ADC 8808EC83 088C0699 9A088206 8A9A08AD 02879A80 5E8008A8 `..^¯...Ü....ÿ....¥..å..É.ñ.è..) 000020
 5E8008E4 021E9A0D 061E801F A5A5A5A5 DA8E1E07 16F088C8 7E8008C4 83FFFF07 ....å..-å.Þ....ÖEEEE........ð..^ 000040
 26165EC4 02578826 07882612 5EC4024E E9C02805 77092E06 9E9A08E9 01FA9AC8 å.°.Õ......w.+åÕN.å^.&..&.W.å^.& 000060
 18260447 2826165E C4065788 26044788 26125EC4 D6568904 46890257 18260728 +.&.W..FÅ.Vøå^.&.G.&.W.å^.&+G.&. 000080
 094603B7 9AD85E8D 093E0622 9AC85E8D 09360287 9A0A5E8D D2568900 46890657 W..FÅ.VØ.^....6..^å.".>..^Ä.ñ.F. 0000A0
 879ADC88 08EC8309 6106619A 0D0E1E8D 0957060A 9AD85E8D 094E0287 9AD45E8D .^å...N..^Ä...W.......e.e..å..É.ñ 0000C0
 01FA9AA8 5E8D1FA5 A5A5A50A 8E1E0716 F088A87E 8D08C483 098007A1 9A096603 .f..Å....å..-´.Þ....ÖEEEE..^´.°. 0000E0
 8D09A502 879AD05E 8D8A5689 88468902 57132607 0326165E C4099D04 6E9A0985 ...n...å^.&..&.W..F¡.Vo.^Å...É.. 000100
 83090707 A19A098D 03879ADC 8808EC83 09880661 9A0D0E1E 8D09AE06 0A9AD85E ^Ä...Ö......a.¡..å..É.ñ.§..Å.e.. 000120
 5EC409F9 046E9A09 DC01FA9A A05E8D1F A5A5A5A5 DA8E1E07 16F088A0 7E8008C4 å..-..Þ....ÖEEEE..^..°.É..n.°.å^ 000140
 9A00161E 800A0202 879A0E5E 808E7689 8C4E89F2 13C80306 77882604 4F882616 .&.O.&.w..å.´.N¥.v/.^.......... 000160
 9AC05E8D 0A220622 9AC85E8D 0A1A0287 9AD05E8D 0A1203B7 9AC05E8D 0A0A0631 1....^å.ñ....^Å......^å.".."..^å. 000180
 8D08C483 0A5407A1 9A0A3A03 879ADC88 08EC830A 3506619A 0D0E1E8D 0A28060A ..+......e.5..å..É.ñ.:..Å.Ì..å.. 0001A0
 5689E446 890A6704 6E9A0A59 01FA9A98 5E8D1FA5 A5A5A50A 8E1E0716 F088987E -..Þ....ÖEEEE..^..°.Y..n.g..Fð.V 0001C0
 06619A0D 0E1E800A 80060A9A C05E8D0A 7706229A C85E8D0A 6F02879A D45E80E6 Ì.^å...o..^å.".w..^å..........e. 0001E0

Dump of file SATURN:[PCCOMMON.DUMP.DLL]DGM.TMP;1 on 18-APR-1990 10:44:12.07
File ID (620,6,0)   End of file block 186 / Allocated 188

Virtual block number 98 (00000062), 512 (0200) bytes

 A5A5DA8E 1E0716F0 88907E8D 08C4830A A907A19A 0A8F03B7 9ADC8808 EC830A8A ...&..É.ñ....Å.`..å..-..Þ....ÖEE 000000
 13E44603 8A568888 4688E256 89E04689 0888046E 9A0AAE01 FA9A905E 8D1FA5A5 ÉE..^..°.Û..n....FÅ.Vå.F¡.Vo.Fð. 000020
 8A568888 4688F656 89F44689 E25618E0 46288E56 888C4688 F25689F0 4689E656 Vl.FÞ.V·.F¥.V/+FÅ.Vå.F¶.V-.F¡.Vo 000040
 76FFFE56 89FC4689 E25613E0 46038E56 888C4688 FA5689F8 4689E656 18E44628 +Fð.Vl.F%.V°.F¥.V/.FÅ.Vå.F=.V±.v 000060
 0876FF00 0008079A 5016E846 8D0676FF 0876FF00 0006DF9A 006A006A 0676FF08 ..v.j.j..Ò....v..v..FÒ.P......v. 000080
 00E8C028 0000073E 9A0676FF 0876FF00 00FFFF9A 5016E846 8D036A00 6A0676FF .v.j.j..FÒ.P......v..v..>...+åS. 0000A0
 5689E046 89025788 26078826 165EC408 8E0830B8 1E565700 0080C8C8 C95F5E1F .^_èüå...WV.¡O..Äå^.&..&.W..FÅ.V 0000C0
 02571826 07282612 5EC4C257 88260788 26E65689 E4468906 57882604 47882 6E2 å&¯G.&.W..Fð.Vl&..&.W.å^.&+.&.W. 0000E0
 89A04689 06571826 04472826 125EC406 57882604 47882616 5EC4A656 89A4..'89 .FÉ.Vlå^.&.G.&.W.å^.&+G.&.W..F.. 000100
 8D08C502 879AA05E 8D088006 8A9A0885 02879AA4 5E800880 02879AA4 5E80A..4 VÅ.^É...¯..^É...ç....§..^....é.. 000120
 080C077D 9A080E03 879ADC88 08EC8308 D906999A 08CF068A 9A08CA02 879AA05. ^....ð....Ü....\..å..É.ñ.8..).É. 000140
 FA9A885E 8D0C0102 1E9A0006 1E8D1FA5 A5A5A50A 8E1E0716 F088887E 8D08C483 .å..-¡.Þ....ÖEEEE...........^¡.° 000160
 26072826 165EC402 57882607 8826125E C4029DE9 C0280577 0C48069E 9A0C0601 ......K.w.+åÕ..å^.&..&.W.å^.&+.& 000180
 8906571B 26044728 26165EC4 06578826 04478826 125EC4CE 5689CC46 8902571B .W..Fä.Vöå^.&.G.&.W.å^.&+G.&.W.. 0001A0
 5E8D0C64 03879AC0 5E8D0C5C 06319A0D 161E8D0C 5402879A 0A5E8DCA 5689C846 Få.Vð.^....T......1.\..^å.ñ.d..^ 0001C0
 8D0C8501 FA9AC05E 8D0C7D03 879A805E 8D0C7506 319A0D16 1E8D0C6D 02879A0E ....m......1.u..^¯.ñ.)..^å.°.... 0001E0
```

```
Dump of file SATURN:[PCCOMMON.DUMP.DLL]DGM.TMP;1 on 18-APR-1990 10:44:12.07
File ID (620,6,0)   End of file block 186 / Allocated 188

Virtual block number 99 (00000063), 512 (0200) bytes

800CA606 0A9AD05E 800C9D02 879ACC5E 800C9503 879AD05E 800C8D06 229AB85E ^|.".....^Å.ñ....^ä.......^Å...!..  000000
16F08898 7E8008C4 830CCF07 A19A0CB5 03879ADC 8808EC83 0C800661 9A0D0E1E ....a.....å..É.ñ.ç..Å.ü..ó..-..Þ.  000020
02571326 07032616 5EC40CEC 046E9A0C D401FA9A 985E8D1F A5A5A5A5 DA8E1E07 ...ÖEEEE..^...Å..n.å.ó^.&..&.W.  000040
83000706 619A000E 1E800CFD 060A9AD0 5E800CF4 02879AC8 5E80AA56 89A84689 .F .V .^à...¶..^Å...».......a....  000060
1FA5A5A5 A50A8E1E 0716F088 907E8D08 C4830026 07A19A0D 0C03879A DC8808EC å..É.ñ....Å.&..ó..-..Þ....ÖEEEE.  000080
89AC4E89 F213C803 06778826 044F8826 165EC400 48046E9A 002801FA 9A905E80 .^..'.+..n.H.ó^.&.O.&.w..à.·.N^.  0000A0
619A000E 1E800061 060A9A80 5E800058 06229A88 5E800050 02879AC8 5E80AE76 vÖ.^à...P..^|.".X..^¯...a......a  0000C0
A50A8E1E 0716F088 887E8008 C48300BA 07A19A00 7003879A DC8808EC 83006806 .k..å..É.ñ.p..Å....ó..-..Þ....ÖE  0000E0
8000A502 879ACC5E 800E5689 0C468900 90046E9A 008F01FA 9A885E80 1FA5A5A5 EEE..^..'....n....FÉ.V8.^à...É..  000100
03879ADC 8808EC83 00C00661 9A0D0E1E 80008606 0A9A805E 8000AD06 229A885E ^|.".Ü..^¯...Ñ......a.å..å..É.ñ.  000120
E401FA9A 805E801F A5A5A5A5 DA8E1E07 16F08880 7E8008C4 8300DF07 A19A00C5 é..Å.Ö..ó..-..Þ....ÖEEEE..^..'.ô  000140
4688EA56 89E84689 DE56130C 4603AA56 88A84688 DA5689D8 46890BA8 046E9A00 ..n.¨..FÅ.VÖ.F ·.V ·.FÉ.V8.FÖ.Võ.F  000160
02571826 07282616 5EC4AA56 88A84688 EE5689EC 46890A56 18084628 AE5688AC ¯.VÜ+FÅ.VÖ.F&.VŸ.F ·.V ·ó^.&+.&.W.  000180
AE5613AC 46030657 18260447 2826AE56 88AC4688 F25689F0 4689AA56 13A84603 .F ·.V ·.FÞ.V·.F¯.VÜ&+G.&.W..F¯.VÜ  0001A0
4603AE56 88AC4688 FA5689F8 46890E56 180C4628 AA5688A8 4688F656 89F44689 .F¶.V-.F ·.V ·+FÉ.V8.F%.V'.F¯.VÜ.F  0001C0
800676FF 0876FF00 0008099A 006A006A 0676FF08 76FFFE56 89FC4689 0A561308 Å.VÖ.F=.V±.v..v.j.j.......v..v..  0001E0

Dump of file SATURN:[PCCOMMON.DUMP.DLL]DGM.TMP;1 on 18-APR-1990 10:44:12.07
File ID (620,6,0)   End of file block 186 / Allocated 188

Virtual block numbe, 100 (00000064), 512 (0200) bytes

0876FF00 0008209A 5016E046 80046A00 6A0676FF 0876FF00 0008199A 5016E046 FÅ.P......v..v.j.j..FÅ.P.-....v.  000000
C0281256 88D88E08 40881E00 003AC8C8 C95F5E1F 00E8C028 00000838 9A0676FF .v..8...+åS..^ èùà:...¡M..Å.V.+å  000020
0788260A 5EC4C646 890001DE 46C7DC46 89CA5689 C8468914 5688F656 89F44689 .F¶.V-.V..Få.Vδ.FÉùF8...Fóá^.&..  000040
5A9A0676 FF0876FF FE5689FC 46890657 88260447 8826FA56 89F84689 02578826 &.W..F%.V'&.G.&.W..F•.V±.v..v..Z  000060
46890646 89C02800 00FFFF9A 5016E046 800676FF 0876FFF2 5689F046 89000007 ....FÞ.V·.v..v..FÅ.P.....+å.F•.F  000080
76FF0876 FF084689 DA4689C0 28CE5689 CC46890Z 56890046 89105688 0E4688D4 Å.F..V..FÅ.V8.Fä.Vö+å.FÖ.FÅ.v..v  0000A0
0676FF08 76FF0000 0FA09A08 6A006A06 76FF0876 FF0000FF FF9A5016 CC468006 ..Fä.P......v..v.j.j.......v..v.  0000C0
46C70775 00080000 0FC29A00 6A006AF4 76FFF676 FFDC76FF DE76FF50 16F84680 .F%.P.v8.vÉ.v-.v¶j.j..ô....Åu.úF  0000E0
9A0042B7 FF260044 87FF2600 04068E02 E3C1165E 880676FF 0876FF4A E88AD6C6 6•.ŠJ.v..v..^.èD.....&.ñD.&.ñ8..  000100
76FFCA76 FFF476FF F676FFDC 76FFDE76 FF5016F8 46800676 FF0876FF 0000077F .....v..v..F%.P.v8.vÉ.v-.v¶.vò.v  000120
FF00000F 479A5016 E0468006 76FF0876 FF8AD6C6 46C70575 00080000 FFFF9AC8 à......Åu.úFó•..v..v..FÅ.P.G....  000140
0E87881E 00003EC8 C8C91F00 E8C64688 00000F56 9AF076FF F276FF06 76FF0876 v..v..v·.vÞ.V....FóŠ..èùà>...¡ñ.  000160
5EC40001 DE46C7DC 4689CA56 89C84689 145688F6 5689F446 89C02812 5688088E .Å.V.+å.F¶.V-.V..Få.Vò.FÉùF8..ó^  000180
46890257 88260788 260A5EC4 0000C246 C7C65689 C4468906 57882604 47882606 .&.G.&.W..Fó.VóùFô..ó^.&..&.W..F  0001A0
F0468900 000EFF9A C476FFC6 76FFFE56 89FC4689 06578826 04478826 FA5689F8 %.V'&.G.&.W..F•.V±.vó.vá......FÞ  0001C0
56880E46 88044689 D64689C0 2800000F 159A5016 E04680C4 76FFC676 FFF25689 .V·.vó.vá.FÅ.P.....+å.F•.Få.F..V  0001E0

Dump of file SATURN:[PCCOMMON.DUMP.DLL]DGM.TMP;1 on 18-APR-1990 10:44:12.07
File ID (620,6,0)   End of file block 186 / Allocated 188

Virtual block number 101 (00000065), 512 (0200) bytes

5016CC46 80C476FF C676FFD8 4689DA46 89C028CE 5689CC46 89025689 D0468910 ..FÅ.V8.Fä.Vö+å.FÖ.FÅ.vó.vá.Fä.P  000000
6AC476FF C676FF04 C4831102 0E059A53 060A7400 127F8326 065EC400 0011619A .a...ó^.&.....t..S......ó..vó.vàj  000020
6AF476FF F676FFDC 76FFDE76 FF5016F8 4680C476 FFC676FF 00001126 9A086A00 .j..&....vó.vá.F%.P.v8.vÉ.v-.v¶j  000040
9A53060A 7400127F 8326065E C462E88A D6C246C7 0775D008 00001148 9A006A00 .j..H....Åu.úFó•.Šbá^.&.....t..S.  000060
00448 7FF 26000406 8E02E3C1 0C5F8826 065EC4C4 76FFC676 FF04C483 FFFF0D36 6....ó..vó.váá^.&. .èD.....&.ñD.  000080
76FFF676 FFDC76FF DE76FF50 16F84680 C476FFC6 76FF0000 11729A00 42B7FF26 &.ñ8..r....vó.vá.F%.P.v8.vÉ.v-.v  0000A0
5016E046 80C476FF C676FF8A D6C246C7 05750008 00000F76 9AC876FF CA76FFF4 ¶.vò.và.v....Åu.úFó•..vó.vá.FÅ.P  0000C0
6CC8C8C9 1F00E8C2 46880000 0FEC9AF0 76FFF276 FFC476FF C676FF00 000FD89A .Ü....vó.vá.v·.vÞ.å....FóŠ..èùàl  0000E0
1E7C0016 7E832474 0C46080A 46882C74 08460806 4688088E 0FFE881E 56570000 ..WV.¦±..Å.F..F.t,.F..F.t$.-..|.  000100
04880 67E 0C1A7E83 067C001A 7E830C74 00187E83 127F0A18 7E83187C 00187E83 .-..|..-......-..t..-..|..-..-.|å  000120
1ED8768D C67E8D1F A5A5A5A5 DA8E1E07 16F08808 7E800C56 880A4688 02CCE98A .Öä..F..V..-Å.Þ....ÖEEEE..-ó.vÅ.  000140
0706319A 00261E80 11FF0619 9A001E1E 8011F602 949A165E 801FA5A5 A5A51F16 ..EEEE..^....-..............&..1..  000160
F67E8008 C4831232 07869A84 76FF8676 FF8876FF 8A76FF12 1803879A 845E8012 ..^Ç.ñ....vα.v|.vÑ.vÇ...2..ó..--  000180
AC5E8012 4306019A 002E1E80 123801FA 9AF65E80 1FA5A5A5 A50A8E1E 0716F088 .Þ....ÖEEEE..^-.'.;........C..^¯  0001A0
76FF8676 FF8876FF 8A76FF12 6403879A 8E5E8012 5302879A 125E8012 4803879A .ñ.K..^....S..^ƒ.ñ.d..vα.v|.vÑ.v  0001C0
128601FA 9AA45E80 1FA5A5A5 A50A8E1E 0716F088 A47E8008 C483127E 078F9A84 Ç...-..á..-É.Þ....ÖEEEE..^É.'...  0001E0
```

```
Dump of file SATURN:[PCCOMMON.DUMP.DLL]DGM.TMP;1 on 18-APR-1990 10:44:12.07
File ID (620,6,0)   End of file block 186 / Allocated 188

Virtual block number 102 (00000066), 512 (0200) bytes

 B79ADC88 08EC8312 A106619A 0D0E1E8D 1297060A 9ABE5E8D 128E0622 9AAC5E8D .^".".....^/..........ø.À..å..É.ñ 000000
 01FA9A9C 5E8D1FA5 A5A5A50A 8E1E0716 F0889C7E 8D08C483 12C007A1 9A12A603 .|..À.å..á..-..Þ....ÖEEEE..^..•. 000020
 8E5E8D12 E306229A AC5E8D12 D801FA9A F65E8000 5689CE46 89120304 6E9A12C5 é..n.ã..Fö.VÀ.^-.•.Û..^".".D..^/ 000040
 08C48313 1507A19. 12F803B7 9ADC8808 EC8312F6 06619A00 0E1E8012 EC060A9A ...å......ø.-..å..É.ñ.«..À....á. 000060
 89F24689 08F9046E 9A131A01 FA9A945E 801FA5A5 A5A5DA8E 1E0716F0 88947E8D .-..Þ....ÖEEEE..^..•....n.•..F·. 000080
 C6768DEA 7E80DE56 11DC4601 D05613CE 4603CC56 11CA4601 1056880E 4688F456 V¶.F..V..Fò.Vä.Fö.VÀ.FÉ V8.-ð.vó 0000A0
 4629F456 88F24688 1FA5A5A5 A51F161E EA7680E2 7E8D1FA5 A5A5A51F 161E0716 .....ÉEEE..-â.vð...ÉEEÉ. F·.V¶)F 0000C0
 4689005A 0516468B 0000D246 C78C4689 010E0516 4688EC56 11EA4601 E45619E2 å.Vð.Fð.Vå.F.....F¥úF®....r..Z..F 0000E0
 9A5016C6 46800A76 FF0C76FF 50E04689 00A28788 E301185E 886C7402 187E8304 å.-..tl.^.1D..À..FÁP.v..v..Fó.P. 000100
 D646C78C 4601E046 88000013 E29A5016 D846800A 76FF0C76 FFE076FF 00001383 •....vÀ.v..v..FÄ.P.å....FÀ.F¥úF® 000120
 16E24280 03E6C106 76880A76 FF0C76FF E076FF26 7D02067E 830646FF 03E80000 ..Š..F®.-®.)&.vÀ.v..v..v®èl..Bã. 000140
 D8F70168 20E00116 46881A76 FF01E802 4201E046 88E601D6 76880000 FFFF9A50 P......v®ll.FÀ.B®Šl.v..F.1Á-h.%À 000160
 FA91E80E 0676FF08 76FF5016 D8468012 76FF1476 FF52F9F7 01688999 8C468850 P.F¥.¿h.%•R.v..v..FÄ.P.v..v..Ò.• 000180
 FF1A76FF 357D0206 7E830646 FF03E800 000646C7 FE468916 4628005A 8812C483 .á.¡Z.+F..F±úF®..Š..F®.-®.)5.v.. 0001A0
 E2428003 E6C1D676 88F276FF F476FF52 F9F70168 8999D242 88E601D6 7688FE76 v±.v®ll.B®.¿h.%•R.v¶.v·.v®èl..Bã 0001C0
 FF0A76FF 0C76FF50 16C6468D 1A76FFC2 EB12C483 FA45E80E 0676FF08 76FF5016 .P.v..v..ÒE•.á.$ó.v..Fó.P.v..v.. 0001E0

Dump of file SATURN:[PCCOMMON.DUMP.DLL]DGM.TMP;1 on 18-APR-1990 10:44:12.07
File ID (620,6,0)   End of file block 186 / Allocated 188

Virtual block number 103 (00000067), 512 (0200) bytes

 8E118688 1E565700 006CC8CB C95F5E1F 00E8C028 0EC483F0 33E80E06 76FF0876 v..v..Ó3Þ.á.+åŠ..^_èùål..WV.¡... 000000
 187E830C 7C00187E 83127C00 167E8318 740C4608 0A468820 74084608 06468808 Ä.F..F.t .F..F.t..=..|..-..|..-. 000020
 A5DA8E1E 0716F088 D87E800C 56880A46 8802CCE9 8A048806 7500187E 83067F0A ....-..u.¡å.Öä..F..V..-Ä.Þ....ÖE 000040
 199A0D1E 1E8D1501 02949A16 5E801FA5 A5A5A51F 161E0876 8DC67E80 1FA5A5A5 ÉEE..-ó.vÄ...EEEE..^............ 000060
 8476FF86 76FF8876 FF8A76FF 152303B7 9AB45E8D 15120631 9A0D261E 80150A06 .....å..1....^Ç.ñ.#..vα.v¡.vÑ.vÇ 000080
 80154601 FA9AF65E 801FA5A5 A5A5DA8E 1E0716F0 88F67E80 08C48315 3D07869A ...=..á..--.Þ....ÖEEEE..^-.•.F.. 0000A0
 156F03B7 9ABE5E8D 155E0287 9A125E8D 155603B7 9AAC5E80 154E0601 9A002E1E ......N..^".ñ.V..^.....^..^/.ñ.o. 0000C0
 A5A5DA8E 1E0716F0 88A47E80 08C48315 8907BF9A 8476FFB6 76FFB876 FF8A76FF .vα.v¡.vÑ.vÇ......á..-É.Þ....ÖEE 0000E0
 9A0D0E1E 8D15A206 0A9A8E5E 80159906 229AAC5E 80159101 FA9AA45E 801FA5A5 ÉE..^É.•....^".".....^/...À...... 000100
 DA8E1E07 16F0889C 7E8008C4 8315C807 A19A1581 03879ADC 8808EC83 15AC0661 ø.¯..å..É.ñ.Ý..À.ü..á..-..Þ....Ö 000120
 15E601FA 9AF65E80 D05689CE 468915DE 046E9A15 D001FA9A 9C5E8D1F A5A5A5A5 ÉEEE..^..•.À..n.å..Fö.VÀ.^-.•.|. 000140
 879ADC88 08EC8316 0106619A 0D0E1E8D 15F7060A 9ABE5E8D 15EE0622 9AAC5E80 .^".".Ý..^/...%.......ø....å..É.ñ 000160
 01FA9A94 5E8D1FA5 ¨5A5A5DA 8E1E0716 F088947E 8008C483 162007A1 9A160603 ....À. ..á..-..Þ....ÖEEEE..^..•. 000180
 01D05613 CE4603CC ..11CA46 01105688 0E4688F4 5689F246 8911E004 6E9A1625 %..n.Ú..F·.V¶.F..V..Fò.Vä.Fö.VÀ. 0001A0
 A5A51F16 1EEA768D E27E801F A5A5A5A5 1F161E07 16C6768D EA7E80DE 5611DC46 FÉ.V8.-ð.vó.....ÉEEE..-â.vð...ÉE 0001C0
 46C78C46 89010E05 164688EC 5611EA46 01E45619 E24629F4 5688F246 881FA5A5 ÉE..F·.V¶)Fâ.Vð.Fð.Vå.F.....F¥úF 0001E0

Dump of file SATURN:[PCCOMMON.DUMP.DLL]DGM.TMP;1 on 18-APR-1990 10:44:12.07
File ID (620,6,0)   End of file block 186 / Allocated 188

Virtual block number 104 (00000068), 512 (0200) bytes

 FF50E046 8900A287 8BE30118 5E886C74 02187E83 D4468900 5A051646 880000D2 ®...F..Z..Få.-..tl.^.1D..À..FÁP. 000000
 16ED9A50 16D8468D 0A76FF0C 76FFE076 FF000016 8E9A5016 C646800A 76FF0C76 v..v..Fó.P./....vÀ.v..v..FÄ.P.Ú. 000020
 76FF0C76 FFE076FF 267D02D6 7E830646 FF03E800 000646C7 8C4601E0 46880000 ...FÀ.F¥úF®..Š..F®.-®.)&.vÀ.v..v 000040
 4688D1EB D24201E0 4688E6D1 D6768800 0013A09A 5016E242 8D03E6C1 D676880A ..v®èl..Bà.P......v®ll.FÀ.B®Šl.F 000060
 76FF5016 D8468D12 76FF1476 FF52F9F7 01688999 8C468850 D8F70168 2DE00116 .1Á-h.%ÁP.F¥.¿h.%•R.v..v..FÄ.P.v 000080
 7E830646 FF03E800 000646C7 FE468916 4628005A 8810C483 F8D0E80E 0676FF08 ..v..ÒÁ%.á.¡Z.+F..F±úF®..Š..F®.- 0000A0
 C1D67688 F276FFF4 7(°F52F9 F70168B9 99D24288 E601D676 88FE76FF 327D02D6 ®.)2.v±.v®ll.B®.¿h.%•R.v¶.v·.v®è 0000C0
 C646800C 77FF2606 5EC4C5EB 10C483F8 87E80E06 76FF0876 FF5016E2 428003E6 |..®ã.P.v..v..Ò.%.á.Šáá^.&.w..Fó 0000E0
 C8C95F5E 1F00E8C0 28CEC483 ED28E80E 0477FF26 0677FF26 0A76FF0C 76FF5016 .P.v..v.&.w.&.w..Ò(Ú.á.+åŠ..^_èù 000100
 00020E85 01030000 00031084 00020075 00021059 01030074 000210C4 01030010 ....á...t...Y...u...Ç........... 000120
 000210A1 01030083 000204A0 01030082 00020E99 01030081 00020621 01030080 ....|.......................À... 000140
 00020E75 0103008A 000210E4 01030089 00020810 01030087 0002106F 01030086 ....o...............ð.......u... 000160
 000716A8 02030000 000E149D 00020000 000D14F8 00020097 00020EA4 01030096 ....É.......%................... 000180
 88064688 D88EFFFF 881E5657 00001EC8 00000000 00000000 00000000 0000013A :................à...WV.¡...Ä.F.. 0001A0
 04880675 0E46080C 4688087C 010A7E83 0001E246 C7F65689 F4468900 42050856 V..B..F¶.V-úFà...-..|..F..F.u.¡å 0001C0
 9A505200 0805F656 88F4468B 5003E0C1 0A46880A 6A0477FF 26065EC4 013BE98A .Ò;.á^.&.w.j..F.èÄ.P.F¶.V-...RP. 0001E0
```

Dump of file SATURN:[PCCOMMON.DUMP.DLL]DGM.TMP;1 on 18-APR-1990 10:44:12.07
File ID (620,6,0)   End of file block 186 / Allocated 188

Virtual block number 105 (00000069), 512 (0200) bytes

```
88260847 8826F45E C4EE4689 0A468801 0EE98AD3 880674C0 08EC4689 0000FFFF
8800C3E9 0375C008 EE4EFFEE 4688080C 468308F0 468308EB F25689F0 46890A57 .....Fã.ãt.¡ã.Õ...F..FÝá^¶ã.G.ã. 000000
E80000E2 46C70774 00E27E83 1FA5A5A5 A5DA8E1E 0716F088 E47E800E 56880C46 W..Fþ.V.Š..Fþ..F...FÝ.HÝ.âu.Õü.. 000020
E80E0676 FF0876FF 137600E2 069E9A00 C401FA9A E45E8D00 8F01FA9A F85E8D2A F..V..-ð.þ....ÕEEEE..-ã.t.úFã..$ 000040
FA069E9A 00EF01FA 9AE45E80 00EA021E 9A00361E 800094E9 00018804 C48300A2 •.^%.•.¢..^ð.•.á....ã.v..v..v..Õ 000060
80011502 1E9A003E 1E8029E8 01000387 9AE45E80 0102021E 9A00361E 80137300 Ã..á.¡..Õ....6....ð..^ð.•.ÿ....• 000080
80FFFF03 879AE45E 80012002 1E9A003E 1E801176 0125069E 9A011A01 FA9AE45E .•...6.......^ð.ñ...$)..>....... 0000A0
E91FA5A5 A5A51F16 1EF8768D F888F05E C41FA5A5 A5A51F16 1E0716E4 768DF87E ^ð.•......%.v...>.......^ð.ñ.... 0000C0
1F00E8C0 280E4789 26F45EC4 F8D1C228 990A4688 0C478926 0A4688F4 5EC4FF28 -%.vð.....EEEE.á^þ.«.v%...EEEE.Õ 0000E0
FA46C7FE 5689FC46 89004205 08568806 4688088E 0008881E 000006C8 CBC95F5E (.á^¶.F.ã.G..F..+ð1%á^¶ã.G.+ãS.. 000100
77FF260A 77FF26FC 5EC40477 FF26065E C41A740A 47082608 478826FC 5EC40000 ^_èüâ....¡...Ã.F..V..■..F=.V±úF• 000120
FC5EC40C 478926FC 5EC40847 89260A47 8926C028 FC5EC4FA 46890000 FFFF9A08 ..á^=ã.G.ã.G.t.á^.ã.w.á^=ã.w.ã.w 000140
06750846 08064688 088E017A 881E5657 000030C8 CBC91F00 E8FA4688 0E478926 .......F•á^=+ãã.G.ã.G.á^=ã.G.á^= 000160
EE5689EC 46890042 05085688 06468801 E1E9C028 0575000A 7E8301EC E98AD488 ã.G..F•Š..èùàO..WV.¡z..Ã.F..F.u. 000180
3926EA46 8811E800 00EA46C7 077DC008 EA46890A 4628E846 890E4788 26EC5EC4 ¡ã.Õ±..-.:u.+ãÕÃ..F..V..■..Fã.VÝ 0001A0
C6878826 065EC401 99E9C028 0575EA46 39E84688 EA468948 0C478826 087F0C47 á^ãã.G..FÕ+F..Fð.á).úFð..Š..Fðã9 0001C0
G...ã.G.H.Fð.FÕ9Fðu.+ãÕ..á^.ã..6 0001E0
```

Dump of file SATURN:[PCCOMMON.DUMP.DLL]DGM.TMP;1 on 18-APR-1990 10:44:12.07
File ID (620,6,0)   End of file block 186 / Allocated 188

Virtual block number 106 (0000006A), 512 (0200) bytes

```
08C483FF FF0CAA9A 5306E876 FFEA76FF 10750000 C08F8326 187400C8 87082600
08EC8302 9506619A 004E1E80 02880631 9A00461E 80028202 889A1A5F 80065EC4 .ã..à.t.ã.¢ã..u..vð.vÕ.$.^....á. 000000
5E801FA5 A5A5A5DA 8E1E0716 F088087E 8D08C483 028407A1 9A029A03 879ADC88 á^..-.........F..1.....H..•....ã. 000020
00461E8D 02030288 9A1E5F8D 065EC4E2 5689E046 8902CA04 6E9A0289 01FA9AD8 .É.ñ....Ã.Ç..á..-Ã.þ....ÕEEEE..^ 000040
08C48303 0507A19A 02E80387 9ADC8808 EC8302E6 06619A00 4E1E8002 DC06319A Ã.•.¿..n.ò..FÃ.Vãá^.........ã...F. 000060
89E44689 0087046E 9A030A01 FA9AD05E 801FA5A5 A5A5DA8E 1E0716F0 88007E8D .1.É...H..•.l..ã..É.ñ.Š..Ã....á. 000080
00C68788 26065EC4 0AC483FF FF06059A EC76FFEE 76FFEA76 FF5016E0 4680E656 .-Ã.þ....ÕEEEE..^Ã.•....n.ñ..Fð. 0000A0
6E478826 065EC404 C4830268 10E99A53 060A7500 00C08F83 26127400 C8870826 Vl.FÃ.P.vð.vÝ.vã.ſ....á.á^.ã..6. 0000C0
890A8E1E 0716F088 F07E8D00 2A05C28C C3881975 C2080256 89004689 70578826 ã..à.t.ã.¢ã..u..S.Õ.k..á.á^.ã.Gn 0000E0
B91F161E F076802A 7F80065E C4D05EFF 5016F046 80530876 FF1EE81F A5F20008 ã.Wþ.FÃ.V■.ðu..û.ð.•..-þ.þ....Õ¿ 000100
03069A06 76FF0876 FF08C483 00E2E80E 0676FF08 76FF5016 F0468D1F A5F20008 ...É.Š..v.S.Fþ.P.^Ãá^...•.vþ...¿ 000120
260877FF 26065EC4 08C483FF FF0AAF9A 0676FF08 76FF5016 F0468004 C483FFFF ...É..Fþ.P.v..v..ðã..á..v..v.... 000140
8E01E488 1E000004 C8C8C95F 5E1F00E8 C0280000 FFFF9A00 6A006A00 6A0677FF ...á..Fþ.P.v..v..É....á.á^.ã.w.ã 000160
0E0676FF 52500A46 280E4788 26FC5EC4 FE5689FC 46890042 05085688 06468808 .w.j.j.j......+ãŠ..^_èüâ....¡ð.. 000180
88260847 8826065E C4D88E03 E0881E56 57000008 C8C8C91F 00E806C4 83FDC9E8 Ã.F..V..■..F=.V±á^=ã.G.+F.PR.v.. 0001A0
5E01FA9A 0A5E802A 7EF87639 4601E8F6 28F84689 0C478826 FE5689FC 46890A57 Õè».á.Š..èüâ...WV.¡Ú..Ãá^.ã.G.ã. 0001C0
W..F•.V±ã.G..F%+-Š.F9v%—•.^..•.^ 0001E0
```

Dump of file SATURN:[PCCOMMON.DUMP.DLL]DGM.TMP;1 on 18-APR-1990 10:44:12.07
File ID (620,6,0)   End of file block 186 / Allocated 188

Virtual block number 107 (0000006B), 512 (0200) bytes

```
E8C02837 8926125E C40A7302 79069E9A 046301FE 9A198DFC 5EC403E7 C1FE8804
0423881E 56570000 4CC8C8C9 5F5E1F00 E8C02807 892648F8 4688125E C4D0E810 ..±èÕ.á^•...±.c....y.•.á^.ã.7+ãŠ 000000
C4DC4689 0E4689E0 4689E246 89C028E6 5689E446 89004205 08568806 4688088E .ŠÃá^..F%Hã..+ãŠ..^_èüãL..WV.¡#. 000020
8808EC83 04040661 9A004E1E 8004CA06 319A0046 1E8004C1 02889A1A 5F80065E .Ã.F..V..■..Fð.V¦+á.Fã.FÃ.F■.Fèá 000040
CC5E8D1F A5A5A5A5 0A8E1E07 16F088CC 7E8D08C4 8304F307 A19A0409 03879ADC ^.._.....è...F..1.ò...H..•.á..ã.. 000060
9A00461E 80051202 889A1E5F 80065EC4 06568904 46890509 046E9A04 F801FA9A É.ñ.1..Ã.µ..á..-ã.þ....ÕEEEE..^ã 000080
8008C483 054407A1 9A052A03 879ADC88 08EC8305 2506619A 004E1E80 05180631 .•.%..n....Fã.Vøá^.._.........F.. 0000A0
56890846 89044F04 6E9A0549 01FA9AC4 5E801FA5 A5A5A5DA 8E1E0716 F088C47E 1.....H..•.X..ã..É.ñ.•..Ã.D..á.. 0000C0
A5A5A5DA 8E1E0716 F088C47E 800A5788 26084703 2603E0C1 0E478826 E45EC4DA -á.þ....ÕEEEE..^á.•.I..n.O..FÃ.V 0000E0
DC8808EC 83059306 619A004E 1E800589 060A9AC4 5E800580 02889A0A 5EC41FA5 Õá^ðã.G.èÃ.ã.G.ã.W..-á.þ....ÕEEE 000100
9ACC5E8D 1FA5A5A5 A5DA8E1E 0716F088 CC7E8D08 C48305B2 07A19A05 9803879A E.á^........^á.......H..•....ã..É 000120
9A045F80 0A5EC4EA 5689E846 89025713 26070326 E45EC405 D2046E9A 058701FA .ñ....Ã.ý..á..-ã.þ....ÕEEEE..^ã. 000140
9A05F203 879ADC88 08EC8305 E006619A 004E1E80 05E3060A 9AC45E80 05DA0288 •.ñ..n.■.á^ðã..ã.W...FÕ.Võá^.._.. 000160
6E9A0611 01FA9A8C 5E801FA5 A5A5A5DA 8E1E0716 F088C7E 8D08C483 060C07A1 ..Õ..^á...D...H..•.Ú..ã..É.ñ.¯.. 000180
2603E0C1 0E478826 EE7689EC 4E89F213 C8030677 8826044F 8826E45E C4048804 Ã....á..-¥.þ....ÕEEEE..^¥.•....n 0001A0
5702889A 085F8D0A 5EC41FA5 A5A5A5DA 8E1E0716 F088C7E 800A5788 26084703 -¡.á^ðã.O.ã.w..à..Nã.vÝã.G.èÃ.ã 0001C0
.G.ã.W..-¥.þ....ÕEEEE.á^.._....W 0001E0
```

```
Dump of file SATURN:[PCCOMMON.DUMP.DLL]DGM.TMP;1 on 18-APR-1990 10:44:12.07
File ID (620,6,0)   End of file block 186 / Allocated 188

Virtual block number 108 (0000006C), 512 (0200) bytes

 8907A19A 066F03B7 9ADC8808 EC83066A 06619A0D 4E1E8D06 60060A9A 8C5E8D06 ..^V...'...N..a.|..&..É.ñ.o..À.. 000000
 06A9046E 9A068E01 FA9ACC5E 8D1FA5A5 A5A5DA8E 1E0716F0 88CC7E80 08C48306 ..&..-å.Þ....ÖÉÉÉ..^ä.'....n.`. 000020
 0A9A8C5E 8006B102 889A0C5F 8D0A5EC4 F25689F0 46890257 13260703 26E45EC4 Ä^ô&..&.W..FÞ.V·Ä^........Ý..^V.. 000040
 7E8008C4 8306E307 A19A06C9 03B79ADC 8808EC83 06C40661 9A0D4E1E 8D06BA06 .a...N..a.Ä..&..É.ñ.Ï..À.D..Ä..~ 000060
 4F8826E4 5EC40578 046E9A06 E801FA9A 845E8D1F A5A5A5A5 DA8E1E07 16F08884 Ç.Þ....ÖÉÉÉ..^Ç.'.Ô..n.x.Ä^ô&.O 000080
 72044639 057F427C D65639EA 5688E846 88F67689 F44E89F2 13C80306 77882604 .&.w..à.·.N¶.v-.FÖ.Vö9V¤|B..9Fàr 0000A0
 057F1E7C DA5639EE 5688EC46 88297704 4639057C 307FD656 39F25688 F0468838 ;.FÞ.V·9V¤.0|.9Fàw).F&.V¥9VÖ|... 0000C0
 C008C028 02E80001 880'7708 4639057C 0C7FDA56 39F65688 F4468817 72084639 9FÄr..F¶.V-9VÜ..|.9FÄw.|..Š.+&.& 0000E0
 28065688 D4468814 73F04639 057C1B7F F2563906 56880446 8800EFE9 C02..574 t.+&Öÿ..FÅ.V¤9V·..|.9FÞ¤..F&.V¤+ 000100
 88127668 4639057F 197CEA56 39D65688 D4468824 E8E25689 E04689F2 5618.. 6 FÞ.V·.FÅ.VäS$.F&.V¤9Vö|...9FÖv.. 000120
 4639057C 1B7FF656 390A5688 D84688E2 5689E046 89EA5618 E8462806 56880'. 6 F&.V¤+FÖ.Vö.FÅ.Vä.FÅ.VÖ9V-..|.9F 000140
 EE56390A 56880846 8824E8DE 56890C46 89F65618 F4462B0A 56880846 881473F4 ¶s..FÅ.VÖ+F¶.V-.FÉ.VñS$.FÅ.VÖ9V¥ 000160
 4608E046 880E5689 DC4689EE 5618EC46 280A5688 08468812 76EC4639 057F197C |...9F&v..FÅ.VÖ+F&.V¥.FÉ.V8.FÅ.F 000180
 4688FA56 89F84689 DAF70002 8308F7E2 5688E046 884774DE 46080C46 880875E2 &u..FÉ.F8tG.FÅ.VäXÄ.0.XÖ.F%.V'.F 0001A0
 57192607 2926FA56 88F84688 E45EC4FE 5689FC46 890AF700 02830BF7 0E56880C É.V8XÄ.0.XÖ.F=.V±Ä^ô.F%.V'&).&.W 0001C0
 00020009 90CBC95F 5E1F00E8 C0280657 19260447 2926FE56 88FC4688 E45EC402 .Ä^ô.F=.V±&)G.&.W.+&S..^_èù..... 0001E0

Dump of file SATURN:[PCCOMMON.DUMP.DLL]DGM.TMP;1 on 18-APR-1990 10:44:12.07
File ID (620,6,0)   End of file block 186 / Allocated 188

Virtual block number 109 (0000006D), 512 (0200) bytes

 00020000 000C0380 00020000 00080344 00020000 000903C3 00020000 00060323 #.......Ù.......D.......¯....... 000000
 02030037 00040050 02030000 000E048E 0002002F 000103DA 01030000 0000064F O.......Ö.../...........P...7... 000020
 08064688 088EFFFF 881E5657 00002CC8 00000000 00000000 00000045 00040182 ý...E............À...WV.|...Ã.F.. 000040
 879AF45E 8DF65689 F446891C 5788261A 47882606 5EC40218 E98AD488 06750846 F.u.|Å.Ö..Ä^.&.G.&.W..F¶.V-.^¶.. 000060
 EC830056 06619A0D 661E8D00 4C06319A 0D5E1E8D 00430619 9A0D561E 80003A02 .:...V....C...^..1.L...f..a.V..& 000080
 8D1FA5A5 A5A5DA8E 1E0716F0 88E47E8D 08C48300 7507A19A 00580387 9ADC8808 ..É.ñ.[..À.u..Ä..-Ö.Þ....ÖÉÉÉ.. 0000A0
 EC4603FF FF00F89A 5052026A 006AEE56 89EC4689 0088046E 9A007A01 FA9AE45E ^ô.'.z..n....F&.VÝj.j.RP.%....F& 0000C0
 619A0066 1E800081 06319A00 6E1E8D00 A802879A F45E8DF2 5689F046 89EE5613 .VÝ.FÞ.V·.^¶...`...n..1.Ý...f..a 0000E0
 A5DA8E1E 0716F088 DC7E8D08 C48300DA 07A19A00 C003879A DC8808EC 83008806 .É..&..É.ñ.&..À.Ö..Ä..-É.Þ....ÖÉ 000100
 00F89A50 52026A00 6AE65689 E4468900 F0046E9A 000F01FA 9ADC5E8D 1FA5A5A5 ÉÉÉ..^É.'.Ô..n.Þ..F8.V||j.j.RP.%. 000120
 8E978926 008C8789 26F25688 F0468806 5EC4FA56 89F84689 E65613E4 46030031 1..FÖ.V|.F%.V'Ä^..FÞ.V·&....&... 000140
 89205788 261E4788 26065EC4 00929789 26009087 8926FA56 88F84688 065EC400 .Ä^..F%.V'&....&....Ä^.&.G.&.W . 000160
 80015606 319A005E 1E8D014D 06199A0D 561E8D01 4402879A FC5E8DFE 5689FC46 F=.V±.^=...D...V....M...^..1.V.. 000180
 16F08804 7E8008C4 83017F07 A19A0165 03879ADC 8808EC83 01600661 9A00661E .f..a.'..&..É.ñ.e..À....Ä..-å.Þ. 0001A0
 026A006A 0E5689DC 46890195 046E9A01 8401FA9A D45E8D1F A5A5A5A5 DA8E1E07 ...ÖÉÉÉ..^å.'....n....FÉ.V8j.j. 0001C0
 9A0D6E1E 8D018202 879AFC5E 8DF25689 F04689DE 56130C46 03009F00 F89A5052 RP.%....FÉ.V8.FÞ.V·.^=...ý...n.. 0001E0

Dump of file SATURN:[PCCOMMON.DUMP.DLL]DGM.TMP;1 on 18-APR-1990 10:44:12.07
File ID (620,6,0)   End of file block 186 / Allocated 188

Virtual block number 110 (0000006E), 512 (0200) bytes

 8D08C483 01E407A1 9A01CA03 879ADC88 08EC8301 C506619A 00661E8D 01880631 1.£...f..a.é..&..É.ñ.ò..À.Ö..Ä.. 000000
 56890446 8901FA04 6E9A01E9 01FA9AE4 5E801FA5 A5A5A5DA 8E1E0716 F088E47E -Ö.Þ....ÖÉÉÉ..^Ö.'.Ö..n.'..F&.V 000020
 5688F046 88065EC4 FA5689F8 46890656 13044603 013800F8 9A505202 6A006A06 ¤j.j.RP.%.;..F&.V¤.F%.V'Ä^..FÞ.V 000040
 C028009A 97892600 98878926 FA5688F8 4688065E C4009697 89260094 878926F2 ·&....&....Ä^..F%.V'&....&....+& 000060
 5EC46EE8 8AD48805 75084608 06468808 8E000888 1E000004 C8C8C95F 5E1F00E8 $..^_èùà....|...Ã.F..F.u.|&.Šnå^ 000080
 80878926 065EC400 0002809A 80066850 52FE5689 FC46890C 5788260A 47882606 .&.G.&.W..F=.V±RPh.......Ä^.&... 0000A0
 C47E5789 267C4789 26065EC4 0000FFFF 9A800768 FC76FFFE 76FF0082 97892600 .&.....v±.v¤h.......Ä^.&.G|&.W-Ä 0000C0
 76FF0876 FF008887 8926008A 87892606 5EC40084 87892600 86878926 C028065E ^.+&&....&....Ä^.&....&.....v..v 0000E0
 74084608 06468808 8E023088 1E000008 C8C8C91F 00E8C028 04C483FD 48E80E06 ..ÖK».Ä.+&$..èùà....|=..Ã.F..F.t 000100
 28057510 46080E46 8800750C 46080A46 880139E9 8AD48806 75144608 12468808 ..F..F.u.|&.Ö9..F..F.u..F..F.u.+ 000120
 0E679A53 060A7500 00C08F83 26127400 C8870826 00C68788 26065EC4 0124E9C0 &ÖS.Ä^.&..Ö.&..&.t.&.e&..u..S.g. 000140
 08F71056 880E4688 FA5689F8 46890AF7 00028308 F70C5688 0A468804 C48303C1 é..Ä..F..V.XÄ.0.XÖ.F%.V' .F..V.XÄ 000160
 88065EC4 44571926 42472926 FA5688F8 4688065E C4FE5689 FC46890A F7000283 .0.XÖ.F=.V±Ä^..F%.V'&)GB( WDÄ^.. 000180
 46080A46 8804C483 FFFF0306 9A0676FF 0876FF48 57192646 472926FE 5688FC46 F=.V±&)GF&.WH.v..v.......Ä..F..F 0001A0
 15741046 080E4688 0AC4830F C5E80E06 76FF0876 FF006A12 76FF1476 FF15740C .t..v..v.j..v..v..Öé..Ä..F..F.t. 0001C0
 87082600 C6878826 065EC40A C4830FA8 E80E0676 FF0876FF 016A1276 FF1476FF .v..v.j..v..v..Ö´..Ä.Ä^.&..Ö.&.. 0001E0
```

```
Dump of file SATURN:[PCCOMMON.DUMP.DLL]DGM.TMP;1 on 18-APR-1990 10:44:12.07
File ID (620,6,0)   End of file block 186 / Allocated 188

Virtual block number 111 (0000006F), 512 (0200) bytes

 77FF2608 77FF2606 5EC404C4 83FFFF10 E99A5306 22750000 C08F8326 2A7400C8 à.t*&.¢å..u".S.Ö....á.á^.&.w.&.w 000000
 885008F7 F8468806 77FF2608 77FF2606 5EC436E8 0000FFFF 9A006A00 6A006A06 .j.j.j......$6á^.&.w.&.w..F%%ÄP. 000020
 9A026A00 6A006A00 6A006A00 6A006A00 6A006A50 DAF70002 8308F7FE 5688FC46 F=.V±%Ä.@.%ÖPj.j.j.j.j.j.j.j.j.. 000040
 89EC4689 EE4689C0 28088E02 C5881E56 57000058 C8C8C91F 00E8C028 0000FFFF ....+àŠ..èüàX..WV.¡é..Ä+å.FŸ.Få. 000060
 830490E9 8AD48806 7E0C0A7E 83067C01 0A7E830C 7408460B 064688E8 4689EA46 Fö.FÖ.F..F.t..~..|..~..~.¡å.Ö... 000080
 5689E446 89705788 266E4788 26065EC4 047FE9C0 2805750B 0A7E8306 740C0A7E ~..t..~..u.+åÖ..á^.&.Gn&.Wp.FÖ.V 0000A0
 76FF1EE8 1FA5F200 0889DA8E 1E0716F0 88F07E8D 002A05C2 8CC38819 75C208E6 |.öu..ü.ö.*..~Þ.Þ....Ö¿...È.Š..v 0000C0
 E90A4688 1FA5F200 08891F16 1EF07680 2A7F8006 5EC4E45E FF5016F0 46805308 .S.FÞ.P.^ö6^...*.vÞ...¿...È..F.Ö 0000E0
 0090878B 26065EC4 03C9E9EE 5689EC46 89009297 88260090 87882606 5EC403B7 ñ.á^.&....&.....Få.VŸÖè.á^.&.... 000100
 97882600 8C878826 065EC403 ACE9EE56 89EC4689 DAF70002 8308F700 92978826 &....%Ä.@.%Ö.Få.VŸÖ¯.á^.&....&.. 000120
 890AF700 028308F7 008E9788 26008C87 8826065E C40396E9 EE5689EC 4689008E ...Få.VŸÖ..á^.&....&....%Ä.@.%Ö. 000140
 89E84689 DAF70002 8308F700 9A978826 00988788 26065EC4 0379E9EE 5689EC46 Få.VŸÖy.á^.&....&....%Ä.@.%Ö.FÖ. 000160
 8826065E C40346E9 EA5689E8 4689009A 97882600 98878826 065EC403 5CE9EA56 VöÖ\.á^.&....&.....FÖ.VöÖF.á^.&. 000180
 0094878B 26065EC4 0329E9EA 5689E846 890AF700 028308F7 00969788 26009487 ...&....%Ä.@.%Ö.FÖ.VöÖ).á^.&.... 0001A0
 46880E75 050A7E83 E25689E0 4689990C 46880313 E9EA5689 E8468900 96978826 &.....FÖ.VöÖ...F...FÅ.Vã.~..u..F 0001C0
 0208DE56 89DC4689 F6561BF4 4628FE56 88FC4688 0CE8F256 18F04628 FA5688F8 %.V*+FÞ.V·Š..F=.V±+F¶.V~.FÉ.V8.@ 0001E0

Dump of file SATURN:[PCCOMMON.DUMP.DLL]DGM.TMP;1 on 18-APR-1990 10:44:12.07
File ID (620,6,0)   End of file block 186 / Allocated 188

Virtual block number 112 (00000070), 512 (0200) bytes

 8D050506 8F9A05CD 02879ADC 5E8D05C8 021E9A00 761E8D68 76006430 057F7?  |r..=d.vk..v....à..^É...è....f.. 000000
 05F80661 9A00661E 8005EE06 229AC05E 8005E502 879AE05E 8D05D003 879AC05? ^à.ñ.Ì..^Å...Ì..^å.".Ÿ...f..a.%. 000020
 A5A5A5A5 DA8E1E07 16F08888 7E8D08C4 83061707 A19AD5F0 03879ADC 8808EC83 .å..É.ñ.»..À....á..-¡.Þ....ÖEEEE 000040
 C4E25688 E0468848 E80A4688 E25689E0 468901A9 046E9A06 1C01FA9A 885E8D1F ..^¡.°....n.`..FÅ.Vå.F.ŠN.FÅ.Vãá 000060
 4689C028 31E8CC46 89CE4689 C028CA56 89C84689 00869718 26008487 2826065E ^.&+...&.....Få.Vò+å.Fö.FåŠ1+å.F 000080
 E80EEBCE 5689CC46 89E2561B E0462800 8A978826 00888788 26065EC4 C84689CA ò.Fåá^.&....&....+FÅ.Vå.Få.VöŠ.Š 0000A0
 56880646 88D44689 06468900 46890246 89C02800 E8017400 0A308374 0005300C .=..t*=..t¶Š.+å.F@.FÅ.F¤.Få.F..V 0000C0
 88887E8D 0A578826 08470326 03E0C10E 47882608 5EC40A56 89084689 00420508 ..B..FÄ.VöÁ^Äå.G.éÅ.&.G.&.W..-¡. 0000E0
 9A00661E 8D060206 0A9A885E 8D06C902 879AC85E 8D1FA5A5 A5A5DA8E 1E0716F0 Þ....ÖEEEE..^à...è..^¡.. ¶...f.. 000100
 DA8E1E07 16F088C0 7E8D08C4 8306F807 A19A06E1 03879ADC 8808EC83 060C0661 a.É..å..É.ñ.Ä..À.=..á..-á.Þ....Ö 000120
 89C84689 02571326 07032608 5EC40718 046E9A07 0001FA9A C05E8D1F A5A5A5A5 EEEE..^à.°....n...á^Äå..&.W..Få. 000140
 DC8808EC 83073306 619A0066 1E8D0729 060A9A88 5E8D0720 02879ACC 5E8DCA56 Vò.^à... ..^¡..-)...f..a.3..å..É 000160
 9A805E8D 1FA5A5A5 A5DA8E1E 0716F088 807E8D08 C4830752 07A19A07 3803879A .ñ.B..À.R..á..-¯.Þ....ÖEEEE..^¯. 000180
 8826CE76 89CC4E89 F213C803 06778826 044F8826 D85EC405 C0046E9A 075701FA °.W..n.å.á^Äå.O.&.w..à.·.Nã.vö&. 0001A0
 9A005E8D 1FA5A5A5 A5DA8E1E 0716F088 807E8D0A 57882608 47032603 E0C10E47 G.éÅ.&.G.&.W..-¯.Þ....ÖEEEE..^Å. 0001C0
 9A078203 879ADC88 08EC8307 AD06619A 00661E8D 07A3060A 9A805E8D 079A0287 .....^¯...È...f..a.Ù..å..É.ñ.ÿ.. 0001E0

Dump of file SATURN:[PCCOMMON.DUMP.DLL]DGM.TMP;1 on 18-APR-1990 10:44:12.07
File ID (620,6,0)   End of file block 186 / Allocated 188

Virtual block number 113 (00000071), 512 (0200) bytes

 6E9A07D1 01FA9AC0 5E8D1FA5 A5A5A5DA 8E1E0716 F088C07E 8D08C483 07CC07A1 À.ä..á..-à.Þ....ÖEEEE..^à.°.Ì..n 000000
 DA9A805E 8007F102 879AD45E 80025689 D0468902 57132607 0326085E C407E904 .Ö.á^Äå..&.W..FÅ.V@.^à...Þ..^¯.. 000020
 7E8D08C4 83082307 A19A0809 03879ADC 8808EC83 08040661 9A00661E 8D07FA06 .°...f..a....å..É.ñ....À.#..á..~ 000040
 4F882608 5EC406C1 046E9A08 2801FA9A A85E8D1F A5A5A5A5 DA8E1E07 16F088A8 `.Þ....ÖEEEE..^`.°.(..n.è.á^Äå.O 000060
 5689EC46 89CA561B C8462802 56880046 88067689 D44E89F2 13C80306 77882604 .&.w..à.·.Nå.v@.FÅ.V@+Få.Vò.Få.V 000080
 7700083D 00012028 E878E8C0 282EE8EA 5689E846 89CE5618 CC462806 88C188EE Ÿ.è.@+Få.Vö.FÒ.VöŠ.+åŠxŠ(·..=..w 0000A0
 63086305 7E056805 48053505 18057E04 F804E504 C8048208 79A7FF2E 93C003F2 ·.å...Ìy.ý.à.Ì.«.~...S.K.h.-.c.c 0000C0
 5016EC46 805016E8 46805016 F04680 3A 74EA4608 E8468808 75EE4608 EC468808 ..Få.FŸu..FÒ.Föt:.FÞ.P.FÒ.P.Få.P 0000E0
 76FFEC76 FFEE76FF E876FFEA 76FF5016 F0468010 C48306C8 E80E0676 FF0876FF .v..v..Òù..á..FÞ.P.vö.vÒ.vŸ.vå.v 000100
 D88E0423 881E5657 000026C8 C8C95F5E 1F00E8C0 2810C483 F9E7E80E 0676FF08 ..v..ÒÓ°.á.+åŠ..^ èüàå..WV.¡#..Ä 000120
 125E8D09 13021E9A 00761E8D 00FEE903 7764127E 83097F01 09E9037D 00147E83 .~..).Ö.....~.dw.Ö±...v.......^. 000140
 060A9AF2 5E8D0930 02879A0A 5E8D0928 03879AF2 5E8D0920 068F9A09 1802879A ........ ..^·.ñ.(..^....0..^·... 000160
 EA7E8D08 C4830962 07A19A09 4803879A DC8808EC 83094306 619A0066 1E8D0939 9...f..a.C..å..É.ñ.H..À.b..á..-ö 000180
 9A0E5E8D FC468909 72046E9A 096701FA 9AEA5E8D 1FA5A5A5 A5DA8E1E 0716F088 .Þ....ÖEEEE..^ö.°.g..n.r..F=.^.. 0001A0
 9A099203 879ADC88 08EC8309 8D06619A 0D661E8D 0983060A 9AF25E8D 097A0287 ..z..^·......f..a....å..É.ñ.... 0001C0
 6E9A0981 01FA9AE2 5E8D1FA5 A5A5A5DA 8E1E0716 F088E27E 8D08C483 09AC07A1 À.¯..á..-ã.Þ....ÖEEEE..^ã.°.Ý..n 0001E0
```

Dump of file SATURN:[PCCOMMON.DUMP.DLL]DGN.TMP;1 on 18-APR-1990 10:44:12.07
File ID (620,6,0)   End of file block 186 / Allocated 188

Virtual block number 114 (00000072), 512 (0200) bytes

```
83090706 619A0D66 1E8D09CD 060A9AF2 5E8D09C4 02879A12 5E8DFE46 89098C04 .V..Fz.^....Á..^....ë...f..e.e.. 000000
1FA5A5A5 A5DA8E1E 0716F088 0A7E8D08 C48309F6 07A19A09 DC03879A DC8808EC Å..É.Ñ.É..À.-..á..-Ö.Þ....ÖEEEE. 000020
4688FE46 890E4688 FC46890A 468812E8 FA468907 92046E9A 09F801FA 9ADA5E8D .^Ö.*.«..n....F*§..F..F•.F..Fz.F 000040
00FC7E83 08E8FC46 89057EFC 4639FA46 880001FA 46C7057F 00FA7E83 FA468912 ..F*.~*...ÚF*...F*9F•~..F=§..-=. 000060
829A5052 C028FA56 8850520 2 28FC4688 01A06806 76FF0876 FF0000FC 46C7057D ).úF•...v..v.h...F=+ØRP.V*+ãRP.. 000080
FF0876FF FE468948 ⌄47CFE46 39FA4688 0CE80001 FE46C707 7FD1FA7E 8300000A ....-*...úFz..§..F*9Fz|.H.Fz.v.. 0000A0
00FC7E83 0676FF08 76FF0000 FFFF9A00 6A006A50 52FE4688 FA568801 A6680676 v.h!..V*.FzRP|.j.......v..v..-•. 0000C0
C8C8C95F 5E1F00E8 C0280000 FFFF9A50 C02802E8 00018805 7F7FFFFC 7E810C7C |..-•....|..§.+ãP.....+ãŠ..^_èùà 0000E0
46080A46 880874C2 08F65689 F4468908 56880646 88D88E08 EC881E56 57000058 X..WV.|å..Ä.F..V..F¶.V-.ôt..F..F 000100
5EC40789 26024789 26C028E8 5EC4EA56 8CE84689 D8468004 A7E98AD4 8806750C .u.|å.ÕI..FÄ.FÖ.VÕá^Ö+áå.G.å..á^ 000120
C40A5789 26084789 26E85EC4 1C578826 1A478826 F45EC404 47892606 478926E8 Öå.G.å.G.á^¶å.G.å.W.á^Öå.G.å.W.á 000140
46890042 05F65688 F44688 0E 5789260C 478926E8 5EC42057 88261E47 8826F45E ^¶å.G.å.W á^Öå.G.å.W..F¶.V-.Ø..F 000160
DA8E1E07 16F088CC 7E8D0A57 88260847 032603E0 C10E4788 26D45EC4 06568904 å.Vøá^Åå.G.èÅ.å.G.å.W..-ë.Þ....Ö 000180
80884689 8A568902 571B2607 2826045E C4025788 26078826 E85EC41F A5A5A5A5 ÉÉÉÉ.á^Öå..å.W.á^Åå+.å.W..Vo.F|. 0001A0
03879ADC 8808EC83 08900661 9A0D661E 8D088606 229ACC5E 8D087D02 879A885E ^|...)..^ë.".....f..e....å..É.ñ. 0001C0
8401FA9A C45E8D1F A5A5A5A5 DA8E1E07 16F088C4 7E8D08C4 8308AF07 A19A0895 ...À.É..á..-á.Þ....ÖEEEE..^á.*.Ç 0001E0
```

Dump of file SATURN:[PCCOMMON.DUMP.DLL]DGN.TMP;1 on 18-APR-1990 10:44:12.07
File ID (620,6,0)   End of file block 186 / Allocated 188

Virtual block number 115 (00000073), 512 (0200) bytes

```
2826D45E C4065788 26044788 26E85EC4 02578926 078926E8 5EC408E2 046E9A08 ..n.å.á^Öå..å.W.á^Öå.G.å.W.á^Åå+ 000000
00661E8D 08F30622 9ACC5E8D 08EA0287 9A885E80 8846898A 56890657 18260447 G.å.W..Vo.F|.^|...ð..^ë.".µ...f. 000020
8E1E0716 F0888C7E 8D08C483 0C1C07A1 9A0C0203 879ADC88 08EC8308 F006619A .e.».å..É.ñ....À....á..-V.Þ.... 000040
5EC40657 89260447 8926E85E C4090804 6E9A0C21 01FA9A8C 5E8D1FA5 A5A5A5DA ÖEEEE..^V.*.|..n...á^Öå.G.å.W.á^ 000060
C41FA5A5 A5A5DA8E 1E0716F0 888C7E8D 0A578826 08470326 03E0C10E 47882604 åå.G.èÅ.å.G.å.W..-V.Þ....ÖEEEE.á 000080
02879A88 5E8D8846 898A5689 02571826 07282604 5EC40A57 88260847 8826E85E ^Öå.G.å.W.á^Åå+.å.W..Vo.F|.^|... 0000A0
07A19A0C 9003879A DC8808EC 830C8806 619A0D66 1E8D0C81 06229A8C 5E8D0C78 ×..^V.".....f..e....å..É.ñ....À. 0000C0
DE046E9A 0CAF01FA 9AC45E8D 1FA5A5A5 A5DA8E1E 0716F088 C47E8D08 C4830CAA `..á..-á.Þ....ÖEEEE..^á.*.É..n.å 0000E0
18260447 2826045E C40E5788 260C4788 26E85EC4 0A578926 08478926 E85EC40C .á^Öå.G.å.W.á^Öå.G.å.W.á^Åå+G.å. 000100
F906619A 00661E8D 0CEF0622 9A8C5E8D 0CE60287 9A885E8D 8846898A 56890657 W..Vo.F|.^|...l..^V.".ÿ...f..e.* 000120
A5A5A5DA 8E1E0716 F088807E 8D08C483 0D1807A1 9A0CFE03 879ADC88 08EC830C ..å..É.ñ.z..À....á..-¯.Þ....ÖEEE 000140
1A5F8DF4 5EC40E57 89260C47 8926E85E C4087504 6E9A0D10 01FA9A80 5E8D1FA5 É..^¯.*....n.u.á^Öå.G.å.W.á^¶._. 000160
5403879A DC8808EC 830D4F06 619A0D66 1E8D0D45 06319A0D 561E8D0D 3C02889A ...<...V..1.E...f..e.O..å..É.ñ.Ì 000180
007301FA 9A805E8D 1FA5A5A5 A5DA8E1E 0716F088 807E8D08 C483006E 07A19A00 ..À.n..á..-¯.Þ....ÖEEEE..^¯.*.e. 0001A0
80D09606 319A0D56 1E8D0D8D 02889A1E 5F8DF45E C4EE5689 EC468900 8404ι 9A .n....Få.VŸá^¶._........V..1.... 0001C0
16F088C4 7E8D08C4 8300 8F07 A19A0DA5 03879ADC 8808EC83 0DA00661 9A0D6ι E .f..e....å..É.ñ.É..À.e..á..-á.Þ. 0001E0
```

Dump of file SATURN:[PCCOMMON.DUMP.DLL]DGN.TMP;1 on 18-APR-1990 10:44:12.07
File ID (620,6,0)   End of file block 186 / Allocated 188

Virtual block number 116 (00000074), 512 (0200) bytes

```
26F45EC4 F25689F0 46890C70 046E9A0D C401FA9A C45E8D1F A5A5A5A5 DA8E1E07 ...ÖEEEE..^á.*.á..n.p..FÞ.V·á^¶å 000000
EC46881F A5A5A5A5 DA8E1E07 16F088B0 7E8D4C57 88264A47 032603E0 C1504788 .GPèÅ.å.GJå.WL.-¯.Þ....ÖEEEE..Få 000020
9A805E8D 0E120287 9A885E8D 8846898A 56894457 18264247 2826F646 8EEE5688 .VŸ.F-å+GBå.WD.Vo.F|.^|......^¯. 000040
8D08C483 0E4407A1 9A0E2A03 879ADC88 08EC830E 2506619A 00661E8D 0E180622 ".....f..e.X..å..É.ñ.*..À.D..á.. 000060
5689F846 890E6E04 6E9A0E49 01FA9AC4 5E8D1FA5 A5A5A5DA 8E1E0716 F088C47E -á.Þ....ÖEEEE..^á.*.I..n.n..F%.V 000080
0E760287 9A885E8D 8846898A 56894857 18264647 2826F45E C4F25688 F04688FA *.FÞ.V·á^¶å+GFå.WH.Vo.F|.^|...v. 0000A0
0EA807A1 9A0E8E03 879ADC88 08EC830E 8906619A 00661E8D 0E7F0622 9A805E8D .^¯.".....f..e....å..É.ñ....À.´. 0000C0
89003304 6E9A0EAD 01FA9AA8 5E8D1FA5 A5A5A5DA 8E1E0716 F088A87E 8D08C483 .á..-´.Þ....ÖEEEE..^´.*.Û..n.3.. 0000E0
97892600 84878926 F45EC402 571B2607 28260A5E C4FA5688 F84688FE 5689FC46 F•.Vz.F%.V*á^.å+.å.W.á^¶å....å.. 000100
57882608 478826E8 5EC45052 02571826 0728260A 57882608 4788260A 5EC40086 ..á^.å.G.å.W.å+.å.W.RPá^Öå.G.å.W 000120
0E7C77FF 267E77FF 26008487 FF260086 87FF26F4 5EC45052 02571826 0728260A .å+.å.W.RPá^¶å.ñ..å.ñ..å.w-å.w|. 000140
26008887 8926F45E C4065718 26044728 260A5EC4 FE5688FC 468810C4 83F901E8 Öl*.á..F=.Vzá^.å+G.å.W.á^¶å....å 000160
0C478826 E85EC450 52065718 26044728 260E5788 260C4788 260A5EC4 008A9789 ....á^.å.G.å.W.å+G.å.W.RPá^Öå.G. 000180
008287FF 26008887 FF26008A 87FF26F4 5EC45052 06571826 04472826 0E578826 å.W.å+G.å.W.RPá^¶å.ñ..å.ñ..å.ñ.. 0001A0
8E0A87B8 1E565700 004CC8C8 C95F5E1F 00E8C028 10C483F9 68E80E00 8087FF26 å.ñ...Ök*.á.+ãŠ..^_èùàL..WV.|ñ.. 0001C0
260E5EC4 11750247 08260788 260A5EC4 D6568904 46890042 05085688 06468808 Å.F..V..B..Få.Vøá^¯å..å.G.u.á^.å 0001E0
```

```
Dump of file SATURN:[PCCOMMON.DUMP.DLL]DGM.TMP;1 on 18-APR-1990 10:44:12.07
File ID (620,6,0)    End of file block 186 / Allocated 188

Virtual block number 117 (00000075), 512 (0200) bytes

 D806319A 00561E8D 0FCF0288 9A1A5F80 065EC403 88E9C028 05750247 08260788
 88CC7E8D 08C48310 3107A19A 0FE70387 9ADC8808 EC830FE2 06619A0D 661E800F ..&.G.u.+ãÕ..á^.._....ü...V..1.Ä 000000
 5EC4FA56 89F84689 1 17046E 9A100601 FA9ACC5E 8D1FA5A5 A5A5DA8E 1E0716F0 ...f..e.ã..&..É.ñ.Õ..À....á..-ë. 000020
 DC8808EC 83103306 61?A0066 1E8D1029 06319A00 561E8D10 2002889A 1E5F8006 Þ....ÕEEEE..^ë.*....n....F%.V*á^ 000040
 9AC45E8D 1FA5A5A5 A5DA8E1E 0716F088 C47E8D08 C4831052 07A19A10 3803879A .._.... ...V..1.)...f..e.3..&..É 000060
 57882608 47032603 E0C10E47 8826045E C4FE5689 FC46890E 0A046E9A 105701FA .ñ.8..À.R..á..-á.Þ....ÕEEEE..^á. 000080
 1097060A 9AC45E8D 108E0288 9A125EC4 1FA5A5A5 A5DA8E1E 0716F088 C47E800A *.W..n....F*.V±á^â&.G.éÀ.&.G.&.W 0000A0
 F088CC7E 8D08C483 10C007A1 9A10A603 879ADC88 08EC8310 A106619A 00661E8D ..-á.Þ....ÕEEEE.á^.......^á..... 0000C0
 57132607 0326045E C410E004 6E9A10C5 01FA9ACC 5E8D1FA5 A5A5A5DA 8E1E0716 ..f..e.À..&..É.ñ.|..À.â..á..-ã.Þ 0000E0
 619A0066 1E8D10F1 060A9AC4 5E8D10E8 02889A04 5F8D125E C4DA5689 08468902 ....ÕEEEE..^ë.*.é..n.À.á^â&..&.W 000100
 A5DA8E1E 0716F088 8C7E8D08 C483111A 07A19A11 0003879A DC8808EC 8310F806 ..FÀ.Võá^.._....Õ..^á...þ...f..e 000120
 F213C803 06778826 044F8826 045EC40F C6046E9A 111F01FA 9A8C5E8D 1FA5A5A5 .«..&..É.ñ.¯...À....á..-V.Þ....ÕE 000140
 A5DA8E1E 0716F088 8C7E8D0A 57882608 47032603 E0C10E47 88260E76 890C4E89 EEE..^V.*....n.ó.á^â&.O.&.w..à. 000160
 11780661 9A00661E 8D116E06 0A9A8C5E 8D116502 889A085F 8D125EC4 1FA5A5A5 .NÉ.v8&.G.éÀ.&.G.&.W..-V.Þ....ÕE 000180
 A5A5A5A5 DA8E1E07 16F088CC 7E8D08C4 83119707 A19A117D 03879ADC 8808EC83 EEE.á^..........e..^V...n...f..e.x. 0001A0
 5EC4E256 89E04689 02571326 07032604 5EC411B7 046E9A11 9C01FA9A CC5E8D1F .&..É.ñ.J..À....á..-ë.Þ....ÕEEEE 0001C0
                                                                         ..^ë.*....n.ñ.á^â&..&.W..FÀ.Vãá^ 0001E0

Dump of file SATURN:[PCCOMMON.DUMP.DLL]DGM.TMP;1 on 18-APR-1990 10:44:12.07
File ID (620,6,0)    E.d of file block 186 / Allocated 188

Virtual block number 1.8 (00000076), 512 (0200) bytes

 9ADC8808 EC831102 06619A0D 661E8D11 C8060A9A 8C5E8D11 8F02889A 0C5F8D12
 FA9A845E 8D1FA5A5 A5A5DA8E 1E0716F0 88847E8D 08C48311 F107A19A 11070387 .._....e..^V...à...f..e.8..&..É. 000000
 0A5EC4E6 7689E44E 89F213C8 03067788 26044F88 26045EC4 1086046E 9A11F601 ñ.ã..À.þ..á..-Ç.Þ....ÕEEEE..^Ç.* 000020
 0C460302 57882607 88260E5E C4EA5689 E84689DA 56130846 03025788 26078826 .-..n...á^â&.O.&.w..à.·.NÕ.v|á^. 000040
 C4F25689 F04689E2 5613E046 03025788 26078826 0A5EC4EE 5689EC46 890E5613 &..&.W..FÀ.VÕ.FÕ.Vöá^.&..&.W..FÉ 000060
 057F427C FA5639EA 5688E846 88F65689 F4468906 13C10302 57882607 88260E5E .V8.F&.VYá^.&..&.W..FÀ.V&.FÞ.V·á 000080
 FE5639EE 5688EC46 882977F8 4639057C 307FFA56 39F25688 F0468838 72F84639 ^.&..&.W..é.ø.F¶.V-.FÕ.Vö9V*|8.. 0000A0
 02E80001 880577FC 4639057C 0C7FFE56 39F65688 F4468817 72FC4639 057F1E7C 9F%r;.FÞ.V·9V*.0|.9F%w).F&.V¶9V± 0000C0
 FF88057D 00027F83 26377402 47082607 88260A5E C4008AE9 C0280574 C008C028 |...9F=r..F¶.V-9V±..|.9F=w.|..$. 0000E0
 4628FA56 88F84688 0CE80A56 18084628 FA5688F8 46880E7E C0080001 8803E8FF +à.át.+àÕ..á^.&..&.G.t7&....).|. 000100
 7D00027F 83263774 02470826 0788260E 5EC40257 89260789 260A5EC4 E25618E0 .$.|...á-..F%.V*+FÄ.VÕ$..F%.V*+F 000120
 5688FC46 880CE80E 5618DC46 28FE5688 FC46880E 7EC00800 018803E8 FFFF8805 À.Vãá^.&..&.W.á^.&..&.G.t7&....) 000140
 56570000 68C8C8C9 5F5E1F00 E8C02802 57892607 89260E5E C4E65618 E44628FE .|..$.|...á-..F*.V±+FÉ.V8$..F=.V 000160
 89CC468D 053DE98A D4880675 0E46080C 46880874 08460806 4688088E 0F80881E ±+FÕ.V|á^.&..&.W.+á$..^ èùàh..WV 000180
 26065EC4 04478926 06478926 0C5EC407 89260247 8926C028 0C5EC40E 568CDC46 .|...Ä.F..F.t..F..F.u.|Ä.Õ=..Fë. 0001A0
 0C5EC420 5788261E 47882606 5EC40A57 89260847 89260C5E C41C5788 261A4788 FÉ.V8á^É+â&.G.&..á^É&.G.&.G.á^.& 0001C0
                                                                         .G.&.W.á^É&.G.&.W.á^.&.G.&.W á^É 0001E0

Dump of file SATURN:[PCCOMMON.DUMP.DLL]DGM.TMP;1 on 18-APR-1990 10:44:12.07
File ID (620,6,0)    End of file block 186 / Allocated 188

Virtual block number 119 (00000077), 512 (0200) bytes

 E0C10E47 8826C85E C4CA5689 C8468900 42050856 8806468B 0E578926 0C478926
 8826078B 260C5EC4 1FA5A5A5 A5DA8E1E 0716F088 8C7E8D0A 57882608 47032603 &.G.&.W..F..V..8..Fà.Vòá^â&.G.éÀ 000000
 06229A8C 5E8D1410 02879AA8 5E8DA846 89AA5689 02571826 072826C8 5EC40257 .&.G.&.W..-V.Þ....ÕEEEE.á^É&..&. 000020
 847E8D08 C4831442 07A19A14 2803879A DC8808EC 83142306 619A0066 1E8D1419 W.á^â&+.&.W..V`.F´.^´......^V.". 000040
 26078926 0C5EC414 75046E9A 144701FA 9A845E8D 1FA5A5A5 A5DA8E1E 0716F088 ....f..e.#..&..É.ñ.(..À.8..á..-Ç 000060
 8DA84689 AA568906 57182604 472826C8 5EC40657 88260447 88260C5E C4025, ? .Þ....ÕEEEE..^Ç.*.G..n.u.á^É&..& 000080
 03879ADC 8808EC83 14900661 9A00661E 8D148606 229A8C5E 8D147D02 879AA85 .W.á^É&.G.&.W.Â^â&+G.&.W..V`.F´. 0000A0
 8401FA9A AC5E8D1F A5A5A5A5 DA8E1E07 16F088AC 7E8D08C4 8314AF07 A19A1495 ^`...)..^V."....f..e.....&..É.ñ. 0000C0
 26084703 2603E0C1 0E478826 C85EC406 57892604 4789260C 5EC4115D 046E9A14 ...À.£..á..-¯.Þ....ÕEEEE..^`.*.Ç 0000E0
 C85EC40A 57882608 4788260C 5EC41FA5 A5A5A5DA 8E1E0716 F088AC7E 8D0A5788 ..n.].á^É&.G.&.W.á^â&.G.éÀ.&.G.& 000100
 661E8D15 1406229A AC5E8D15 0802879A A85E8DA8 4689AA56 89025718 26072826 .W..-¯.Þ....ÕEEEE.á^É&.G.&.W.á^à 000120
 1E0716F0 88847E80 08C48315 3D07A19A 15230387 9ADC8808 EC83151E 06619A0D &+.&.W..V`.F´.^´......^`."....f 000140
 C40A5789 26084789 260C5EC4 1571046E 9A154201 FA9A845E 8D1FA5A5 A5A5DA8E ..e....&..É.ñ.#..À.=..á..-Ç.Þ... 000160
 879AA85E 8DA84689 AA568906 57182604 472826C8 5EC40E57 88260C47 88260C5E .ÕEEEE..^Ç.*.8..n.q.á^É&.G.&.W.á 000180
 A19A1591 03879ADC 8808EC83 158C0661 9A00661E 8D158206 229AAC5E 80157902 ^É&.G.&.W.á^â&+G.&.W..V`.F´.^`.. 0001A0
 046E9A15 8001FA9A A05E8D1F A5A5A5A5 DA8E1E07 16F088A0 7E8008C4 8315A807 ·Y..^¯."....f..e....&..É.ñ....À 0001C0
                                                                         .¨..á..-..Þ....ÕEEEE..^..*.¯..n. 0001E0
```

Dump of file SATURN:[PCCOMMON.DUMP.DLL]DGM.TMP;1 on 18-APR-1990 10:44:12.07
File ID (620,6,0)   End of file block 186 / Allocated 188

Virtual block number 120 (00000078), 512 (0200) bytes 0806319A 0D561E80 15CF0288 9A1A5F8D 065EC40E 5789260C 4789260C 5EC41408 ..á^É&.G.&.W.á^.._....ü...V..1.Ä 000000
88A07E8D 08C48316 0107A19A 15E70387 9ADC8808 EC8315E2 06619A00 661E8015 ...f..a.ã..$..É.Ã.Ó..À....á..-.. 000020
5EC4EE56 89EC4689 1617046E 9A160601 FA9AA05E 8D1FA5A5 A5A5DA8E 1E0716F0 Þ....ÖÉÉÉÉ..^..*....n....F$.VŸá^ 000040
DC8808EC 8316330C 619A0066 1E8D1629 06319A00 561E8D16 2002889A 1E5F8006 .._.... ...V..1.)...f..a.3..$..É 000060
9AB45E8D 1FA5A5A5 A5DA8E1E 0716F088 847E8D08 C4831652 07A19A16 3803879A .Ã.B..À.R..á..-Ç.Þ....ÖÉÉÉÉ..^Ç. 000080
5788264A 47032603 E0C15047 8826065E C4F25689 F0468915 03046E9A 165701FA *.W..n....FÞ.V·á^.&.GPèÀ.&.GJ&.W 0000A0
57182642 47282608 468EEE56 88EC4688 1FA5A5A5 A5DA8E1E 0716F088 A07E8D4C L.-..Þ....ÖÉÉÉÉ..F$.VŸ.F.&+GB&.W 0000C0
16880661 9A00661E 8D16AE06 229AA05E 8D16A502 879AA85E 8DA84689 AA568944 D.V'.F'.^'...É..^..".Û...f..a.¡. 0000E0
A5A5A5A5 DA8E1E07 16F08884 7E8D08C4 83160707 A19A1680 03879ADC 8808EC83 .$..É.Ã.§..À.a..á..-Ç.Þ....ÖÉÉÉÉ 000100
47282606 5EC4F256 88F04688 FA5689F8 46891701 046E9A16 DC01FA9A 845E8D1F ..^Ç.*.É..n....F%.V*.FÞ.V·á^.&+G 000120
9A00661E 8D171206 229AA05E 8D170902 879AA85E 8DA84689 AA568948 57182646 F&.WH.V'.F'.^'......^..".....f.. 000140
DA8E1E07 16F08898 7E8D08C4 83173807 A19A1721 03879ADC 8808EC83 171C0661 a....$..É.Ã.I..À.;..á..-..Þ....Ö 000160
5EC40127 E90A4688 FE5689FC 468915C6 046E9A17 4001FA9A 985E8D1F A5A5A5A5 ÉÉÉÉ..^..*.ə..n.ó..F•.V±.F.Ô'.á^ 000180
88260C47 88260C5E C4E25689 E0468906 57182604 4728260E 5788260C 4788260C .&.G.&.W.&+G.&.W..FÀ.Väá^É&.G.&. 0001A0
5618FC46 280E5788 260C4788 260C5EC4 C65689C4 46890657 18260447 28260E57 W.&+G.&.W..Fá.Vóá^.&.G.&.W.+F•.V 0001C0
880676E0 4638057F 007CE256 38E65689 E44689C0 28022804 E8027C08 7FD208FE ±.Ø..|.Š.+Ø+á.FÖ.V|;Vã|...;FÀv.. 0001E0

Dump of file SATURN [PCCOMMON.DUMP.DLL]DGM.TMP;1 on 18-APR-1990 10:44:12.07
File ID (620,6,0)   End of file block 186 / Allocated 188

Virtual block number 121 (00000079), 512 (0200) bytes

4688EA56 89E84689 00829788 26008087 8826065E C4F65689 F44689E0 4688E256 Vã.FÀ.F¶.V-á^.&....&.....FÖ.Vö.F 000000
26072826 0A578826 08478826 0C5EC400 A5E9008A 97892600 88878926 F65688F4 ¶.V-&....&....ÖÉ.á^.&.G.&.W.&+.& 000020
5689C446 8902571B 26072826 0A578826 08478826 DC5EC4E2 5689E046 8902571B .W..FÀ.Väá^É&.G.&.W.&+.&.W..Fá.V 000040
E44689C0 28022804 E8027C08 7FD20802 57182607 28260C5E C4FA5688 F84688C6 ó.F%.V*á^.&+.&.W..Ø..|.Š.+Ø+á.FÖ 000060
8826065E C4F65689 F44689E0 4688E256 880676E0 4638057F 007CE256 38E65689 .V|;Vã|...;FÀv..Vã.FÀ.F¶.V-á^.&. 000080
04881 8E8 00869789 26008487 8926F656 88F44688 EA5689E8 46897E57 88267C47 G|&.W-.FÖ.Vö.F¶.V-&....&....$.¡å 0000A0
FFC676FF E076FFE2 76FFE8E8 FECAE903 75000130 FF65E903 75C00811 E836E88A .$ó$..åu.Õe.=..u.Öõ±$Ö.vã.vÀ.vó. 0000C0
0009C8C9 5F5E1F00 E8C02810 C483F042 E80EE876 FFEA76FF F476FFF6 76FFC476 vá.v-.v¶.vö.vÖ.ØØÞ.á.+á$..^_èù.. 0000E0
00000008 03100002 00990001 04100103 00130001 02650103 00080001 0AA20103 ..À.......e..................... 000100
0000000E 13520002 002F0001 03080103 00000000 16900002 0000000C 03660002 ..f...............À.../...R..... 000120
88064688 D88EFFFF 881E5657 000020C8 00000000 00000000 00300001 0A4F0103 ..O...=.........à ..WV.¡...Ã.F.. 000140
C4004502 889AFC5E C4FE5689 FC468900 52050646 88FA5689 F8468900 42050856 V..Ø..F%.V*.F..R..F•.V±á^=...E.á 000160
00580661 9A007E1E 8D004E06 2A9A188D 0874C426 F8768803 E3C10E5F 8826F85E ^%&._.éD..v%&át....*.N...~..a.X. 000180
A5A5A5A5 DA8E1E07 16F088E8 7E8D08C4 83007707 A19A0050 03879ADC 8808EC83 .$..Ē.Ã.}..À.w..á..-Ò.Þ....ÖÉÉÉÉ 0001A0
C400A502 889A045F 8DFC5EC4 F65689F4 4689008D 046E9A00 7C01FA9A E85E8D1F ..^Ò.*.|..n....F¶.V-á^=._....É.á 0001C0
00880661 9A007E1E 8D00AE06 2A9A188D 0874C426 F8768803 E3C10E5F 8826F85E ^%&._.éD..v%&át....*.Û..¯-..a.¡. 0001E0

Dump of file SATURN:[PCCOMMON.DUMP.DLL]DGM.TMP;1 on 18-APR-1990 10:44:12.07
File ID (620,6,0)   End of file block 186 / Allocated 188

Virtual block number 122 (0000007A), 512 (0200) bytes

A5A5A5A5 DA8E1E07 16F088E0 7E8D08C4 83000707 A19A008D 03879ADC 8808EC83 .$..É.Ã.§..À.a..á..-À.Þ....ÖÉÉÉÉ 000000
46280257 88260788 260A5EC4 F25689F0 4689FFFF 046E9A00 DC01FA9A E05E8D1F ..^À.*.É..n....FÞ.V·á^.&..&.W.+F 000020
C4F2561B F0462806 57882604 4788260A 5EC40257 89260789 260E5EC4 F65618F4 ¶.V-á^.&..&.W.á^.&.G.&.W.+FÞ.V·á 000040
4789260E 5EC4F656 13F44603 02578826 0788260A 5EC40657 89260447 89260E5E ^.&.G.&.W.á^.&..&.W..F¶.V-á^.&.G 000060
5789260C 4789260E 5EC4F256 13F04603 06578826 04478826 0A5EC40A 57892608 .&.W.á^.&.G.&.W..FÞ.V·á^.&.G.&.W 000080
89004205 08568806 46880886 00088 81E 56570000 38C8C8C9 5F5E1F00 E8C0280E .+áŠ..^_èùA8..WV.¡...À.F..V..B.. 0000A0
C40A7506 57392610 75044739 260A5EC4 06578826 04478826 0E5EC4F2 5689F046 FÞ.V·á^.&.G.&.W.á^.&9G.u.&9W.u.á 0000C0
75025739 26107507 39260A5E C4025788 26078826 0E5EC42F E8000107 C726165E ^.&ú...Š/á^.&..&.W.á^.&9.u.&9W.u 0000E0
7E8D0C56 880A4688 021FE9C0 28000007 C726165E C40DE800 0207C726 165EC40A .á^.&ú...Š.á^.&ú...+áÖ...F..V..- 000100
1FA5A5A5 A5DA8E1E F088E07E 8D105688 0E46881F A5A5A5A5 DA8E1E07 16F088F4 ¶.Þ....ÖÉÉÉÉ..F..V..-À.Þ..ÖÉÉÉÉ. 000120
46880E56 890C4689 F65688F4 46882476 F4463905 7F287CF6 5639E256 88E04688 .FÀ.Vã9V-|+..9F¶v$.F¶.V-.FÉ.V8.F 000140
7CFA5639 E65688E4 4688E256 89E04689 DE5688DC 4688F656 89F44689 E25688E0 À.Vã.F¶.V-.FÉ.V8.FÀ.Vã.FÖ.V|9V*| 000160
FA5689F8 4689E656 88E44688 DA568908 4689FA56 88F84688 2476F846 39057F28 +..9F%v$.F%.V*.FÀ.VÖ.FÖ.V|.F%.V* 000180
889AFC5E C4FE5689 FC468900 52050856 88064688 E65689E4 46890A56 88D84688 .FÀ.VÖ.FÖ.V|.F..V..R..F•.V±á^=.. 0001A0
9A007E1E 8D029206 2A9A188D 0874C426 F0768803 E3C10E5F 8826F05E C4028902 ...á^Þ&._.éD..vÞ&át....*.....-.. 0001C0
DA8E1E07 16F08800 7E8D08C4 83028807 A19A02A1 03879ADC 8808EC83 029C0661 a....$..Ē.Ã.À..À.£..á..-À.Þ....Ö 0001E0

Dump of file SATURN:[PCCOMMON.DUMP.DLL]DGM.TMP;1 on 18-APR-1990 10:44:12.07
File ID (620,6,0)   End of file block 186 / Allocated 188

Virtual block number 123 (0000007B), 512 (0200) bytes

```
889A045F 80FC5EC4 EE5689EC 46890201 046E9A02 C001FA9A D05E8D1F A5A5A5A5 EEEE..^Å.•.å..n.|..Få.VŸá^•._... 000000
9A007E1E 8002F206 2A9A1880 0874C426 F0768803 E3C10E5F 8826F05E C402E902 .Õ.á^Þå._.èO..vÞåát....•.·...~.. 000020
DA8E1E07 16F088C8 7E8008C4 83031807 A19A0301 03879A0C 8808EC83 02FC0661 •.•..å..Ë.ñ....À....á..-à.Þ....Õ 000040
A2E907B8 26165EC4 EA5689E8 4689002D 046E9A03 2001FA9A C85E8D1F A5A5A5A5 EEEE..^à.•. ..n.-..FÕ.Võá^.å..ÕÅ 000060
EA5618E8 4628FA56 88F84688 125EC402 57892607 8926F656 88F44688 125EC400 .á^..F¶.V-å..å.W.á^..F%.V•+FÕ.Võ 000080
88E44688 125EC40A 57892608 478926E2 5688E046 88125EC4 06578926 04478926 å.G.å.W.á^..FÅ.Vãå.G.å.W.á^..FÕ. 0000A0
5618EC46 28F65688 F4468812 5EC460E8 0E578926 0C478926 EA5613E8 4603E656 V|.FÕ.Võå.G.å.W.Š'á^..F¶.V-+Få.V 0000C0
88E04688 125EC406 57892604 478926FA 5688F846 88125EC4 02578926 078926EE Ÿå..å.W.á^..F%.V•å.G.å.W.á^..FÅ. 0000E0
5789260C 478926E6 5688E446 88125EC4 0A578926 08478926 EE5613EC 4603E256 Vã.Få.VŸå.G.å.W.á^..FÕ.V|å.G.å.W 000100
000034C8 C8C95F5E 1F00E800 018800E8 A2740002 30FF56E9 03750001 300FE80E .Š.=..u.ÕV.=..tÅŠ.¡..Š..^_èüÀ4.. 000120
067C007F 00FE7E83 0000FFFF 9A5016FC 468D1276 FF1476FF D88E0162 881E5657 WV.¡b..Ã.v..v..F•.P......-±...|. 000140
8902571B 26072826 0E5EC402 57882607 88260A5E C401A2E9 C0280573 01FC7E83 .-•.s.+àÕÅ.á^.å..å.W.á^.å+.å.W.. 000160
5689E446 8906571B 26044728 260E5EC4 06578826 04478826 0A5EC4F2 5689F046 fÞ.V·á^.å.G.å.W.á^.å+G.å.W..FÕ.V 000180
879AF05E 80047102 879AF05E 80015AE9 8AD88806 75F24608 F046880E 75C208E6 |.õu..FÞ.F·u.¡Ä.Õz..^Þ...q..^Þ.. 0001A0
06999A04 90068A9A 04880287 9AE45E80 04860287 9AE45E80 047E068A 9A047602 .v....-..^Õ......^Õ............. 0001C0
A5A5DA8E 1E0716F0 88E87E80 08C48304 8A077D9A 049F0387 9ADC8808 EC83049A ...å..É.ñ....).¤..á..-Õ.Þ....ÕEE 0001E0
```

Dump of file SATURN:[PCCOMMON.DUMP.DLL]DGM.TMP;1 on 18-APR-1990 10:44:12.07
File ID (620,6,0)   End of file block 186 / Allocated 188

Virtual block number 124 (0000007C), 512 (0200) bytes

```
ECE98AD8 88067704 D7069E9A 04C701FA 9AE85E8D 04C2021E 9A00861E 8D1FA5A5 EE........ó..^Õ.•.ú....■.w.¡Å.Õå 000000
F702879A F05E8004 EF03879A F45E8004 E706229A E85E8004 DF02879A FC5E8000 ..^•...Õ..^Õ.".Õ..^¶.ñ.ÿ..^Þ...% 000020
2907A19A 050F0387 9ADC8808 EC83050A 06619A00 7E1E8005 00060A9A F45E8004 ..^¶.......~..■....å..É.ñ....Å.) 000040
053C046E 9A052E01 FA9AD45E 801FA5A5 A5A5DA8E 1E0716F0 88D47E8D 08C48305 ..á..-å.Þ....ÕEEEE..^å.•....n.<. 000060
83055706 619A007E 1E80054D 060A9AF4 5E800544 02879AE4 5E80E256 89E04689 .FÅ.Vã.^Õ...D..^¶...M...-..■.W.. 000080
1FA5A5A5 A5DA8E1E 0716F088 CC7E8D08 C4830576 07A19A05 5C03879A DC8808EC å..É.ñ.\..À.v..ó..-ä.Þ....ÕEEEE. 0000A0
E0462802 57882607 88260A5E C40E5689 DC468902 71046E9A 057801FA 9ACC5E80 .^ä.•.(..n.q..FÉ.Vëá^.å..å.W.+FÅ 0000C0
5EC40E56 180C4628 06578826 04478826 0A5EC402 57892607 8926065E C4E2561B .Vëá^.å..å.W.á^.å.G.å.W.+FÉ.Vëá^ 0000E0
D88E03F4 881E5657 000016C8 0010CAC9 5F5E1F00 E8C02806 57892604 47892606 .å.G.å.W.+àŠ..^_èò..à...WV.¡¶..Ä 000100
FF70E8C0 28047500 F 7E8300 00FFFF9A 5016FA46 8D0E76FF 026A0676 FF0876FF .v..v.j..v..F'.P̃......-•.u.+åŠp. 000120
E8C02804 7301FC7E 83u67C0C 7F00FE7E 83000004 049A5016 FC46800E 76FF0876 V..v..F•.P......-±...|..-•.s.+åŠ 000140
46800676 FF0876FF 0000FFFF 9A5016EA 46800E76 FF016A00 6A0676FF 0876FF4E N.v..v.j.j..v..Fõ.P......v..v..F 000160
8DF8880A 5EC415E8 C0280474 C008FDAA E80E5016 F246800A 76FF0C76 FF5016EA õ.P.v..v..F·.P.Õ^».åt.+åŠ.á^..«. 000180
46880886 05CC881E 000028C8 C8C95F5E 1F00E800 01881FA5 A5A5A51F 161EF276 v·...EEEE.¡..Š..^_èüà(...¡ä..Å.F 0001A0
46882074 14460812 46882874 18460816 46883074 C208F656 89F44689 1C56881A ..V..F¶.V-.ôtO.F..F.t(.F..F.t .F 0001C0
D4880675 08460806 46880874 1046080E 46881074 0C46080A 46881874 1046080E ..F.t..F..F.t..F..F.t..F..F.u.¡å 0001E0
```

Dump of file SATURN:[PCCOMMON.DUMP.DLL]DGM.TMP;1 on 18-APR-1990 10:44:12.07
File ID (620,6,0)   End of file block 186 / Allocated 188

Virtual block number 125 (0000007D), 512 (0200) bytes

```
1676FF18 76FF0000 07C7260E 5EC4FFFF 0247C726 FFFF07C7 26065EC4 0157E98A .ÕW.á^.åú...åúG...á^.åú.. .v..v. 000000
E0468D01 1EE9C02B 0573020C 7E83067C 007F000E 7E830000 FFFF9A50 160C468D .FÉ.P.......-Ä...|..-É.s.+åÕ...FÅ 000020
1876FFF0 4689F246 89C0280C C483F8FE E80EF476 FFF676FF 1276FF14 76FF5016 .P.v..v..v-.v¶.Õ±%.á.+å.F·.FÞ.v. 000040
9A5016F8 46801676 FF.376FF 00F25683 01F04683 08E80000 FFFF9A50 501676FF .v.PP.....Š..FÞ..V·..v..v..F%.P. 000060
E8468838 72F84639 057F427C FA5639E2 5688E046 8800ADE9 0374C008 0000FFFF .....åt.ÕÜ..FÅ.Vã9V•|8..9F%r;.FÕ 000080
72FC4639 057F1E7C FE5u39E6 5688E446 882977F8 4639057C 307FFA56 39EA5688 .Võ9V•.0|.9F%w).FÕ.V|9V±|...9F•r 0000A0
8CE80275 C008C028 02E80001 880577FC 4639057C 0C7FFE56 39EE5688 EC468817 ..Få.VŸ9V±..|.9F•w.¡..Š.+å.åu.Š. 0000C0
C4167C00 027F8326 065EC400 00FFFF9A 50160846 805016F8 46801276 FF1476FF .v..v..F%.P.FÅ.P.....á^.å....|.á 0000E0
8926DA56 88084688 0A5EC420 76073926 057F277C 02573926 0A568808 46880A5E ^..FÅ.VÕå9W.|'..å9.v á^..FÅ.VÕå. 000100
FF027F83 26065EC4 FF34E902 57892607 8926F256 88F04688 065EC402 57892607 .å.W.á^..FÞ.V·å..å.W.Õ4.á^.å.... 000120
0018CAC9 1F00E8C0 28078926 0E5EC4C0 2802E800 01880576 FF3F8326 067F007C |...å.7.v.|..Š.+åá^.å..+åŠ..èò.. 000140
081A4688 3874C208 F45689F2 46892056 881E4688 088E066A 881E5657 00003AC8 å:..WV.¡j..Ä.F..V .F·.V¶.ôtB.F.. 000160
08124688 18741046 080E4688 20741446 08124688 28741846 08164688 30741C46 F.tO.F..F.t(.F..F.t .F..F.t..F.. 000180
07C7260A 5EC401CF E98AD488 06750846 08064688 08740C46 080A4688 10741446 F.t..F..F.t..F..F.u.¡å.ÕÜ.á^.åú. 0001A0
00000606 9A5016EA 46801A76 FF1C76FF 000007C7 26125EC4 FFFF0247 C726FFFF ..åúG...á^.åú....v..v..Fõ.P.ø... 0001C0
80006A00 6A006A1A 76FF1C76 FF0196E9 C0280573 02EA7E83 067C007F 00EC7E83 .-å...|..-õ.s.+åÕ...v..v.j.j.j.. 0001E0
```

```
Dump of file SATURN:[PCCOMMON.DUMP.DLL]DGM.TMP;1 on 18-APR-1990 10:44:12.07
File ID (620,6,0)   End of file block 186 / Allocated 188

Virtual block number 126 (0000007E), 512 (0200) bytes

 A5A51F16 1E0716F8 768DCA7E 8D0000F0 46C70001 EE46C700 0006249A 5016CA46 Fò.P.$...úFŸ..úFÞ...-ò.v½.....ÈÈ 000000
 8DCA7E8D 00F05683 01EE4683 18E80000 07169A01 6A006A1A 76FF1C76 FF1FA5A5 ÈÈ..v..v.j.j......Š..FŸ..vÞ..-ò. 000020
 0374C008 00000730 9A5016F8 468D1A76 FF1C76FF 1FA5A5A5 A51F161E 0716F876 v½.....ÈÈÈ..v..v..F½.P.0....ôt. 000040
 29E80EF2 76FFF47' FF5016CA 46805016 F8468D50 160A468D 5016F646 800103E9 Ö...F-.P.FÖ.P.F½.P.Fò.P.v¶.v·.Ö) 000060
 40720739 26057F47 7C025739 260C5688 DA468816 5EC4AAE8 0275C008 14C483F8 ½.6..6u.Š¨6^..FÖ.VÈ&9W.|G..&9.rà 000080
 7F217C06 573926E0 5688DE46 88207707 3926057C 347F0257 3926E456 88E24688 .Fà.VÖ&9W..4|.&9.w-.F8.VÀ&9W.|!. 0000A0
 02E80001 88057704 47392606 7C007F06 573926E8 5688E646 88197204 47392606 .&9G.r..Fl.VÖ&9W...|.&9G.w.|..Š. 0000C0
 46805016 F8468016 76FF1876 FF501602 46805016 C64680FF 48E90375 C008C028 +à.àu.ÖK..Fó.P.FÖ.P.v..v..F½.P.F 0000E0
 573926C8 5688C646 880E5EC4 167C0002 7F83260A 5EC414C4 830530E8 0E5016CA ò.P.Ò=..6.6^.&....|.6^..Fó.V6&9W 000100
 EE46880A 5EC40257 89260789 26C85688 C64688OE 5EC43976 07392605 7F407C02 .|à..&9.v96^..Fó.V6&..&.W.6^..FŸ 000120
 065EC4C0 2802E800 01880575 01F67E83 02578926 07892600 DA830001 20F05688 .VÞ-...Ö.&..&.W..—.u.|..Š.+àà^. 000140
 C4C02802 E80001B8 0576FF3F 8326067F 007CFF02 7F83260A 5EC4FECE E9078926 &..Öö±6^.&....|...&.?.v.|..Š.+àà 000160
 28125EC4 088E0818 881E5657 000018C8 001CCAC9 5F5E1F00 E8C02807 8926125E ^.&..+àŠ..^_èò..à...WV.|...Ä6^.+ 000180
 07392605 7F597C02 57392606 5EC40257 88260788 260E5EC4 07892602 478926C0 6&.G.&..6^.Ï..&.W.6^.&9W.|Y..&9. 0001A0
 88260447 88263A72 08473926 067F427C 0A573926 0E5EC402 57882607 88265272 rR&..&.W.6^.&9W.|B..&9G.r:&.G.&. 0001C0
 5EC40E57 88260C47 88260E5E C4217204 47392606 7F297C06 57392606 5EC40657 W.6^.&9W.|)..&9G.r!6^.&.G.&.W.6^ 0001E0

Dump of file SATURN:[PCCOMMON.DUMP.DLL]DGM.TMP;1 on 18-APR-1990 10:44:12.07
File ID (620,6,0)   End of file block 186 / Allocated 188

Virtual block number 127 (0000007F), 512 (0200) bytes

 C40004E9 C0280575 C008C028 02E80001 88057704 47392606 7C007F06 57392606 .&9W...|.&9G.w.|..Š.+à.àu.+àÖà.6 000000
 04478826 0A5EC4F6 5689F446 89025718 26072826 065EC402 57882607 88260A5E ^.&..&.W.6^.&+.&.W..F¶.V-6^.&.G. 000020
 F45E8D08 1302879A F45E8DF2 5689F046 89065718 26044728 26065EC4 06578826 &.W.6^.&+G.&.W..FÞ.V·.^¶......^¶ 000040
 9A083206 8A9A0820 02879AF0 5E8D0828 02879AF0 5E8D0820 068A9A08 1802879A ........ ..^Þ...(..^Þ...·....2.. 000060
 0A8E1E07 16F088F8 7E8D08C4 83046907 7D9A0841 03879ADC 8808EC83 083C0699 ..<..à..È.ñ.A..).î..6..-½.Þ....Ö 000080
 08730387 9ADC8808 EC83086E 06619A0D 7E1E8D08 6401FA9A F85E8D1F A5A5A5A5 ÈÈÈÈ..^½.•.d...-..a.n..à..È.ñ.s. 0000A0
 9A089201 FA9AE85E 8D1FA5A5 A5A5DA8E 1E0716F0 88E87E8D 08C48308 8D07A19A .À....6..-Ö.Þ....ÖÈÈÈÈ..^Ö.•.... 0000C0
 881E5657 000064C8 C8C95F5E 1F00E800 01880257 89260789 26125EC4 0808046E n...6^.&..&.W.|..Š..^_èùàd..WV.| 0000E0
 5EC41874 06573926 06750447 3926065E C4065788 26044788 260A5EC4 088E0A48 H..Ä6^.&.G.&.W.6^.&9G.u.&9W.t.6^ 000100
 FF1476FF 1676FF18 76FF2675 02573926 2C750739 26065EC4 02578826 0788260A .&..&.W.6^.&9.u,&9W.u&.v..v..v.. 000120
 88064688 02E3E9C0 2814C483 02F0E80E 53060A76 FF0C76FF 0E76FF10 76FF1276 v..v..v..v..v..S.ÖÞ..6.+àÖD..F.. 000140
 A5DA8E1E F088BC7E 8D0C5688 0A46881F A5A5A5A5 DA8E1E07 16F088F0 7E8D0856 V..-Þ.Þ....ÖÈÈÈÈ..F..V..-V.Þ..ÖÈ 000160
 18F44628 C25688C0 46880656 89044689 F25618F0 4628BE56 88BC4688 1FA5A5A5 ÈÈÈ..FV.V/+FÞ.V·.FÀ.Va.Fà.Vô+F¶. 000180
 8826C656 89C44689 F25618F0 46280257 88260788 260E5EC4 D25689D0 4689F656 V-.FÀ.V06^.&..&.W.+FÞ.V·.Fà.V6&. 0001A0
 02879AD4 5E8D0C90 02879AD4 5E808A56 89884689 F65618F4 46280657 88260447 G.&.W.+F¶.V-.F|.Va.^À......^À... 0001C0
 8906999A 0CAF068A 9A0CAA02 879AD05E 800CA502 879AD05E 800C9006 8A9A0C95 ........^À...È..^À...'....È....¿ 0001E0

Dump of file SATURN:[PCCOMMON.DUMP.DLL]DGM.TMP;1 on 18-APR-1990 10:44:12.07
File ID (620,6,0)   End of file block 186 / Allocated 188

Virtual block number 128 (00000080), 512 (0200) bytes

 A5A5A50A 8E1E0716 F088C87E 8D08C483 0CD9077D 9A0C8E03 879ADC88 08EC830C ..à..È.ñ./..).\..6..-à.Þ....ÖÈÈÈ 000000
 01FFE900 01880677 0CFF069E 9A0CE601 FA9AC85E 800CE102 1E9A0086 1E8D1FA5 È........À..^à.•.Ì......w.|..Õ.. 000020
 88F08804 76FF0676 ·8876FF 8A76FF00 1400C49A C476FFC6 76FFD076 FFD276FF .v0.vÀ.vô.và.6....vo.v|.v0.và.Þ. 000040
 00360622 9AC85E80 uu2E0287 9A9C5E8D 9C46899E 56890718 C6280026 00C49AFA •.6.&.+ó.a.V..F..^.......^à.".6. 000060
 00560387 9AF85E8D 004E0622 9AC85E8D 004601FA 9AD85E80 003E0387 9AD85E8D .^Ä.ñ.>..^À.•.F..^à.".N..^½.ñ.V. 000080
 00760287 9AD45E8D 006E0387 9AE85E8D 0066060A 9AF85E8D 005E0287 9AD05E8D .^À...^..^½...f..^Ö.ñ.n..^à...v. 0000A0
 FA9AE85E 8D00ACE9 03751446 08124688 009103B7 9AE05E8D 007E060A 9AF85E8D .^½...-..^À.ñ....F..F.u.Ö¨..^Ö.• 0000C0
 7E8D08C4 8300C307 A19A0DA9 03879ADC 8808EC83 00A40661 9A007E1E 8D009A01 .....-..a.È..à..È.ñ.`..À.ú..6..- 0000E0
 0703260E 5EC400E4 046E9A0D C801FA9A 805E801F A5A5A5A5 DA8E1E07 16F088B0 ¯.Þ....ÖÈÈÈÈ..^¯.•.à..n.ö.6^.&.. 000100
 8300F706 619A007E 1E8000ED 01FA9AE0 5E800257 89260789 26125EC4 02571326 &.W.6^.&..&.W..^À.•.Ù...-..a.K.. 000120
 1FA5A5A5 A5DA8E1E 0716F088 A87E8D08 C4830E16 07A19A0D FC03879A DC8808EC &..È.ñ.=..À....6..-´.Þ....ÖÈÈÈÈ. 000140
 26125EC4 F218C828 06778826 044F8826 0E5EC40E 30046E9A 0E1801FA 9AA85E8D .^´.•....n.=.6^.&.O.&.w.+à.·6^.& 000160
 03879ADC 8808EC83 0E500661 9A007E1E 800E4601 FA9AD85E 80067789 26044F89 .O.&.w..^À.•.F...-..a.P..à..È.ñ. 000180
 7401FA9A A85E8D1F A5A5A5A5 DA8E1E07 16F088A8 7E8D08C4 830E6F07 A19A0E55 U..À.o..6..-´.Þ....ÖÈÈÈÈ..^´.•.t 0001A0
 DC8808EC 830E9306 619A007E 1E800E89 01FA9AD8 5E80387D D2080E80 046E9A0E ..n....•)8.^À.•.....-..a....à..È 0001C0
 DAF70002 8308F70E 88046E9A 0EA7021E 9A088808 C4830EA2 07A19A0E 9803879A .ñ....À.À..6..Ä...Ì..n.|.ÀÀ.•.ÀÖ 0001E0
```

Dump of file SATURN:[PCCOMMON.DUMP.DLL]DGM.TMP;1 on 18-APR-1990 10:44:12.07
File ID (620,6,0)   End of file block 186 / Allocated 188

Virtual block number 129 (00000081), 512 (0200) bytes

```
07A19A0E D003B79A DC8B08EC 830ECB06 619A0D7E 1E8D0EC1 01FA9AD8 5E8D2FEB $/.^Ä.•.ê...-..•.ù..&..£.ñ.Ä..Ä. 000000
1F00EBC0 2B025789 26078926 165EC40B 5B046E9A 0EDF021E 9AD88808 C4830EDA Ö..6..Ä...Ô._n.[.6^.&..&.W.+åS.. 000020
DA8E1E07 16F08BF8 7E800856 88064688 D88E0880 881E5657 00001CC8 CBC95F5E ^ èùå...WV.¡¯..Ä.F..V..-½.Þ....Ö 000040
5639F256 8BF04688 1FA5A5A5 A5DA8E1E F08BF07E 800C568B 0A46881F A5A5A5A5 ÉÉÉÉ..F..V..-Þ.Þ..ÐÉÉÉÉ..FÞ.V·9V 000060
89F84689 F25688F0 4688EA56 89E84689 FA5688F8 46882476 F8463905 7F28¯^FA •|+..9F%v$.F%.V•.FÒ.Vŏ.FÞ.V·.F%. 000080
2476FC46 39057F28 7CFE5639 F65688F4 4688F256 89F04689 EA5688E8 4688FA 5 V•.FÒ.Vŏ.FÞ.V·.F¶.V-9V±|+..9F=v$ 0000A0
4689E656 88E44688 FE5689FC 4689F656 88F44688 E65689E4 4689FE56 88FC46b. .F=.V±.FŏVǀ.F¶.V-.F=.V±.FŏVǀ.F 0000C0
0728260E 5EC4FA56 88F84688 4675FA56 394B75F8 4639F256 88F04688 F65689F4 ¶.V-.FÞ.V·9F%uK9V•uF.F%.V•6^.&+. 0000E0
89260789 26FA5688 F8468812 5EC42674 14460812 4688EE56 89EC4689 02571826 &.W..F&.VŸ.F..F.t&6^..F%.V•&..&. 000100
FE5688FC 468841E8 06578926 04478926 125EC406 57882604 4788260E 5EC40257 W.6^.&.G.&.W.6^.&.G.&.W.$^.F=.V± 000120
02578826 07882622 74144608 124688EE 5689EC46 89065718 26044728 260E5EC4 6^.&+G.&.W..F&.VŸ.F..F.t"&..&.W. 000140
7D00EE7E 83065789 26044789 26FE5688 FC468812 5EC40257 89260789 26125EC4 6^.&..&.W.6^..F=.V±&.G.&.W..-Ÿ.) 000160
02578926 07892616 5EC4EE56 88EC4688 06EBDAF7 00028308 F7EE5688 EC46880F ..F&.VŸKÄ.Ø.XÖS..F&.VŸ6^.&..&.W. 000180
5689FA46 89245688 224688D8 8E0EFC88 1E565700 003EC8C8 C95F5E1F 00E8C028 +åS..^ èùå>..WV.¡=..Ä.F".V$.F•.V 0001A0
0E468810 74144608 12468818 741C4608 1A468820 74204608 1E468828 74C208FC =.ôt(.F..F t .F..F.t..F..F.t..F. 0001C0
C7260A5E C4000007 C726165E C40290E9 8AD48806 750C4608 0A468808 74104608 .F.t..F..F.u.¡å.Ö..6^.&ú...6^.&ú 0001E0
```

Dump of file SATURN:[PCCOMMON.DUMP.DLL]DGM.TMP;1 on 18-APR-1990 10:44:12.07
File ID (620,6,0)   End of file block 186 / Allocated 188

Virtual block number 130 (00000082), 512 (0200) bytes

```
C41774C0 08FE4689 C02802EB 00018805 74084608 064688FF FF0247C7 26FFFF07 ...&úG....F..F.t.¡..S.+6.F±.åt.6 000000
16E6468D 1E76FF20 76FF0447 89260647 8926065E C4078926 02478926 C028065E ^.+6&.G.&..6^.&.G.&.G..v .v..F¦. 000020
FF5016CE 46800236 E98ADC88 067302E6 7E83067C 0E7F00E8 7E830000 088C9A50 P......~Ò...|..-¦.s.¡É.Ö6..Fö.P. 000040
1E76FF20 76FFF246 89F44689 C0280CC4 83EEE1E8 0EFA76FF FC76FF1A 76FF1C76 v..v..v=.v•.ÔÄŸ.6.+6.F¶.F·.v .v. 000060
0012599A 5016C646 8D1E76FF 2076FF00 F4568301 F2468308 EB000012 2F9A5050 PP./...S..F·..V¶..v .v..F6.P.Y.. 000080
CFE80E50 16C6468D 1A76FF1C 76FF5016 CE468050 16C2468D 008FE903 74C00800 ..åt.Ö...F6.P.Fö.P.v..v..F6.P.Öü 0000A0
125EC418 76FF3F83 26067F20 7CFF027F 83260A5E C42874C0 08F64689 10C483F8 ½.6..F-.åt(6^.&....| ..&.7.v.6^. 0000C0
8926C456 88C24688 125EC494 E8027707 3926057C 097F0257 3926C456 88C24688 .F6.V6&9W...|.&9.w.S.6^..F6.V6&. 0000E0
76FF2076 FF197400 FE7E8302 57892607 8926F456 88F24688 0A5EC402 57892607 .&.W.6^..F·.V¶&..&.W..-±.t..v .v 000100
7CFF027F 83260A5E C4FF52E9 00000885 9A0676FF 0876FF00 6AF276FF F476FF1E ..V¶.v·j..v..v..ç...ÖR.6^.&....| 000120
C0280132 E9C02800 0107C726 0E5EC400 0107C726 165EC415 76FF3F83 26067F10 ...&.7.v.6^.&ú...6^.&ú...+6Ö2.+6 000140
DE9A5050 1E76FF20 76FF1FA5 A5A5A51F 161E0716 C676800E 7E8DF246 89F44689 .F¶.F·.~8.v6.....ÉÉÉÉ..v .v.PP.8 000160
2076FF1F A5A5A5A5 1F161E07 16C6768D DE7E8000 F4568301 F2468318 EB000008 ...S..F·..V¶..~8.v6.....ÉÉÉÉ..v 000180
4680C7EB 0275F446 08F24688 008EE903 74C00800 0009089A 5016C646 8D1E76FF .v..F6.P......åt.Ö/..F·.F¶u.Sú.F 0001A0
8DA6EB02 7500F87E 830000FF FF9A5016 F8468050 16CE4680 5016C646 8D50160E 8.P.F6.P.Fö.P.F%.P......-½.u.S¦. 0001C0
14C483F8 F8E80E50 16DE4680 5016C646 8D1A76FF 1C76FF50 16EA4680 5016C246 Fö.P.Fö.P.v..v..F6.P.F8.P.Ö«½.6. 0001E0
```

Dump of file SATURN:[PCCOMMON.DUMP.DLL]DGM.TMP;1 on 18-APR-1990 10:44:12.07
File ID (620,6,0)   End of file block 186 / Allocated 188

Virtual block number 131 (00000083), 512 (0200) bytes

```
7F025739 26C45688 C2468812 5EC41976 FF3F8326 067F217C FF027F83 260A5EC4 6^.&....|!..&.?.v.6^..Fö.V6&9W.. 000000
C7260E5E C4025789 26078926 C45688C2 4688125E C4FF5AE9 03770739 26057C0A .|.&9.w.ÖZ.6^..Fö.V6&..&.W.6^.&ú 000020
C4107400 FE7E8302 57892607 8926000A 83000120 F45688F2 46880A5E C4000007 ...6^..F·.V¶-...Ö.&..&.W..-±.t.6 000040
8326067F 107CFF02 7F83260A 5EC4FF13 E91FA5A5 A5A51F16 1EEA768D F888065E ^..«.vŏ...ÉÉÉÉ.Ö..6^.&....|...&. 000060
1061881E 5600002E C80020CA C95F5E1F 00E8C028 000107C7 26165EC4 0876FF3F ?.v.6^.&ú...+åS..^_èð .å...V.¡e. 000080
0105E903 74025739 26010EE9 03740739 260E5EC4 02578826 07882612 5EC4088E .Ä6^.&..&.W.6^.&9.ī.Ö..&9W.t.Ö.. 0000A0
8326165E C400E8E9 0173E900 01880974 003F8326 1A5EC412 74003F83 26165EC4 6^.&.?.t.6^.&.?.t.¡..Ös.ÖÒ.6^.&. 0000C0
74003F83 26165EC4 00C8E900 0107C726 1E5EC408 74003F83 261A5EC4 1475003F ?.u.6^.&.?.t.6^.&ú...Öù.6^.&.?.t 0000E0
5016F846 800A76FF 0C76FF00 AEE90000 07C7261E 5EC40875 003F8326 1A5EC414 .6^.&.?.u.6^.&ú...ÖÙ..v..v..F%.P 000100
FF260E5E C40676FF 0876FF00 00FFFF9A 5016E046 800A76FF 0C76FF00 00FFFF9A ......v..v..FÅ.P......v..v.6^.&. 000120
75FA5639 1875F846 39E2568B E0468800 0011E09A 5016F046 80006A37 FF260277 w.&.7j..FÞ.P.Å....FÅ.Vä9F%u.9V•u 000140
16F0468D 5016F846 800004E9 00018806 75FE5639 0875FC46 39E6568B E4468816 ..Fö.V¦9F=u.9V±u.¡..Öå..F%.P.FÞ. 000160
800000FF FF9A5016 08468050 16F0468D 5016E046 80000014 489A5016 E8468D50 P.FÒ.P.K....FÅ.P.FÞ.P.FÄ.P...... 000180
1E5EC400 018803E8 C0280473 0C88069E 9A146201 FA9AE85E 80145001 FA9AD85E ^Ä.•.)..^Ö.•.b......s.+åS.¡..6^. 0001A0
28047707 3926057C 087F0257 39260E5E C4025788 26078826 125EC427 E8078926 &..S'6^.&..&.W.6^.&9W...|.&9.w.+ 0001C0
89025788 26078826 0ı EC452 75013F83 261E5EC4 0789261E 5EC40001 8803E8C0 åS.¡..6^.&..6^.&.?.uR6^.&..&.W.. 0001E0
```

```
Dump of file SATURN:[PCCOMMON.DUMP.DLL]DGM.TMP;1 on 18-APR-1990 10:44:12.07
File ID (620,6,0)   End of file block 186 / Allocated 188

Virtual block number 132 (00000084), 512 (0200) bytes

 88044688 125EC402 57892607 89260E5E C4025788 26078826 125EC406 56890446 F&.V&^.&..&.W.&^.&..&.W.&^..F&. 000000
 5EC40789 26165EC4 0788261A 5EC4D246 89078826 165EC402 57892607 89260656 V&..&.W.&^.&...F&^.&..&^.&..&^ 000020
 891C5688 1A468808 8E134E88 1E00001C C8C8C95E 1F00E8C0 28078926 D246881A ..F&..+&S..^eu&....|H..A.F..V.. 000040
 E47E8306 7C0E7F0G E67E8300 0010F29A 5016E446 8D1276FF 1476FFFE 5689FC46 F=.V.v..v..F0.P.......|...|..-0 000060
 0E4680S0 160A4680 50160846 80501606 46805016 F6468D01 30E98A0C 88067302 .s.|E.00..F-.P.F..P.F..P.F..P.F. 000080
 8800FAE9 0374C008 F446891C C483FDE5 E80E1676 FF1876FF 1276FF14 76FF5016 .P.v..v..v..v..0|=.&..F¶.&t.0°.. 0000A0
 3A7CFA56 39105688 0E468800 FA5E8301 F86E8308 E8FA5689 F846890C 56880A46 F..V..F%.V'$..n%..^°..F..V.9V'|: 0000C0
 1876FF18 7500067E 830675FA 56390875 F846390C 56880A46 883376F8 4639057F ..9F%v3.F..V.9F%u.9V'u..-..u..v. 0000E0
 1056880E 468883E8 000C5E83 010A6E83 0000FFFF 9A006AF8 76FFFA76 FF1676FF .v..v°.v%j.......n...^..$°.F..V. 000100
 468800F2 568301F0 468308E8 F04689F2 4689C028 FA5689F8 46890002 83000105 ....0..F%.V°+&.F·.FP$..FP..V·..F 000120
 46885575 00087E83 0675F246 08F04688 6573F046 39057C6C 7FF25639 E65688E4 0.V|9V·.t|.9FPse.FP.F·u..-...W.F 000140
 1276FF14 76FF3975 00067E83 0675F256 38087SF0 4638000A 83000120 E65688E4 0.V|-...0.;FPu.;V·u..-...u9.v..v. 000160
 83F876FF FA76FF16 76FF1876 FF000013 FD9A5016 E8468DF6 76FFF076 FFF276FF .v·.vP.v-.F0.P.»....v..v..v°.v%. 000180
 18C80018 CAC91F00 E8C02881 E80000FF FF9A5016 E8468D00 6A00FA56 8301F846 F%..V°.j..F0.P.....$.+&$..e0..&. 0001A0
 08460806 46880874 0C46080A 46881074 1046080E 46880886 1505881E 56570000 ..WV.|...A.F..F.t..F..F.t..F..F. 0001C0
 0646881F A5A5A5A5 DA8E1E07 16F088F8 7E800C56 880A4688 0006E98A 04880675 u.|&.0&..F..V..-%.P....0EEEE..F. 0001E0

Dump of file SATURN:[PCCOMMON.DUMP.DLL]DGM.TMP;1 on 18-APR-1990 10:44:12.07
File ID (620,6,0)   End of file block 186 / Allocated 188

Virtual block number 133 (00000085), 512 (0200) bytes

 00A5E80E F876FFFA 76FFF076 FFF276FF 1FA5A5A5 A5DA8E1E F088F07E 80085688 .V..-P.P..0EEEE..v·.vP.v°.v%.0E. 000000
 89EC4689 08C48300 8CE80EFC 76FFFE76 FFF476FF F676FFEA 5689E846 8908C483 .&..F0.V0.v-.v¶.v±.v=.0...&..F&. 000020
 00FFFF9A 5016E846 800E76FF 1076FF34 74C208EC 46880775 EA4608E8 4688EE56 VŸ.F0.F0u..F&.0t4.v..v..F0.P.... 000040
 29FE5619 FC4629EE 5688EC46 88F25619 F04629FA 5619F846 29EA5688 E8468800 ..F0.V0)F%.V°)FP.V·.F&.VŸ)F=.V±) 000060
 F0468018 75C0080A C4830090 E80E0E76 FF1076FF 006A5016 F8468DF6 5619F446 F¶.V-.F%.Pj..v..v..0...&..&u..FP 000080
 5E1F00E8 C02804E8 00018805 74C0080A C4830085 E80E0E76 FF1076FF 016A5016 .Pj..v..v..0...&..&t.|..$.+&$..^ 0000A0
 0C7E8328 7400067E 83067F30 7C00087E 83088E16 76881E00 0000C800 0CCAC95F _e0..&....|v..A.-..|0...-..t(.-. 0000C0
 0C568806 760A4638 057F007C 0C563808 56880646 881A7400 0A7E8306 7F227C00 .|"...-..t..F..V.;V.|...;F.v..V. 0000E0
 4638057C 007F0C56 38085688 0646881A 7D000C7E 83207D00 087E8328 E80A4688 .F.$+.-..) .-..)..F..V.;V...|.;F 000100
 0C5EC408 8E177888 1E00000C C8C8C91F 00E899C0 2805E80A 46880C56 8806730A .s..V..F.$.+&.$..eu&....|(..A&^. 000120
 0CC48300 AFE80E06 76FF0876 FF016A0A 76FF5016 FC468D57 7402470B 26078826 &..&.G.tW.F=.P.v.j..v..v..0E..&. 000140
 89FA4689 C028F656 89F44689 02578826 0788260C 5EC4009F E9000188 0674C008 .&t.|..0..&^.&..&.W..F¶.V-+&.F°. 000160
 12C48302 68E80E06 76FF0876 FF5016F4 4680016A 50FC76FF FE76FF0A 76FFF846 F%.v..v±.v=Pj..F¶.P.v..v..0k..&. 000180
 48E80E06 76FF0876 FF006A0A 76FF5016 FC468058 7406470B 2604478B 260C5EC4 &^.&.G.&.G.tX.F=.P.v.j..v..v..0K 0001A0
 06578826 04478826 0C5EC4F4 4689F646 89C0283C E8000188 0574C008 0CC48300 ..&..&t.|..$<+&.F-.F¶&^.&.G.&.W. 0001C0
 E80E0676 FF0876FF 5016F446 80016A00 6AFC76FF FE76FF0A 76FFFA56 89F84689 .F%.V°.v..v±.v=j.j..F¶.P.v..v..0 0001E0

Dump of file SATURN:[PCCOMMON.DUMP.DLL]DGM.TMP;1 on 18-APR-1990 10:44:12.07
File ID (620,6,0)   End of file block 186 / Allocated 188

Virtual block number 134 (00000086), 512 (0200) bytes

 16EA468D 0676FF08 76FFD88E 17E9881E 00001EC8 C8C91F00 E8C02812 C4830206 ...&.+&$..eu&....|0..A.v..v..F0. 000000
 127C00EC 7E830158 E9000188 067302EA 7E83067C 0E7F00EC 7E830000 15219A50 P.|....-$...|..-0.s.|..0(..-$.|. 000020
 0E0676FF 0876FF01 6A006A0C 76FF0000 EC46C700 04EA46C7 0A7604EA 7E83067F ...-0.v.uF0..uF$...v.j.j..v..v.. 000040
 76FF016A 006A0C76 FF107601 EA7E8306 7F257C00 EC7E83E4 46890AC4 830135E8 05..&..F0.-&.|X...-0.v..v.j.j..v 000060
 C0280000 FE46C7E2 4689C028 02E80001 880574C0 080AC483 0110E80E 0676FF08 ..v..0...&..&t.|..$.+&.F&uF±..+& 000080
 FA463905 7C707FFC 5639EC56 88EA4688 00FC5683 01FA4683 08E8FA46 89FC4689 .F=.F°$..F°..V=..F0.V$9V=.p|.9F° 0000A0
 800C76FF FA76FFFC 76FF0676 FF0876FF 4C7400FA 7E83067F 547C00FC 7E836973 s|.-=.|T...-°.tL.v..v..v=.v'.v.. 0000C0
 EE4689F4 5688F246 8806E8F8 5688F646 88087400 0A7E8300 00163F9A 5016F246 F·.P.?....-..t..F-.V%$..F·.V¶.FŸ 0000E0
 88EE4688 0FE800FC 5E8301FA 6E830001 FE46C70F 75E85639 1475E646 39F05689 .VP9F|u.9V0u.uF±...n°..^=.$..FŸ. 000100
 8352E807 89260247 8926C028 0E5EC40E 7500FE7E 83FF7DE9 E85689E6 4689F056 VP.F|.V0)..-±.u.&^.+&&.G.&..$R. 000120
 C4227400 E27E8338 E8078926 02478926 C0280E5E C40E7400 E27E8314 7400E47E -0.t..-&.t.&^.+&&.G.&..$8.-&.t"& 000140
 E8025789 26078926 00018802 28057600 0130057F 0C7C0208 FC5688FA 46880E5E ^..F°.V=.0|...=..v.+0|..&..&.W.$ 000160
 18C2881E 000010C8 C8C91F00 E8C02802 57892607 8926FC56 88FA4688 0E5EC410 .&^..F°.V=&..&.W.+&$..eu&....|0. 000180
 76FF0876 FF00001A 889A5016 F84680OE 76FF0A76 FF0C76FF 0676FF08 76FFD88E .A.v..v..v..v..v..F%.P......v..v 0001A0
 88F44688 00001995 9A5016F0 46800E76 FF505200 02830001 050C5688 0A468806 ..F..V.....0.RP.v..FP.P......F¶. 0001C0
 E8000188 0574FA56 390575F8 4639F256 88F04688 1574FE56 390575FC 4639F656 V-9F=u.9V±t..FP.V·9F%u.9V't.|..$ 0001E0
```

```
Dump of file SATURN:[PCCOMMON.DUMP.DLL]DGM.TMP;1 on 18-APR-1990 10:44:12.07
File ID (620,6,0)    End of file block 186 / Allocated 188

Virtual block number 135 (00000087), 512 (0200) bytes

08E8FE56 89FC4689 1056880E 46880B8E 1A4E881E 00000CC8 C8C91F00 E8C02802 .+åS..èùÅ....¦N..Å.F..V..F».VšS. 000000
0676FF08 76FF5E77 FC463905 7C657FFE 56391456 88124688 00FE5683 01FC4683 .F=..Vz..F..V.9Vz.e|.9F»w^.v..v. 000020
F4460302 57882607 88260A5E C400001A 679A5016 F4468016 76FFFC76 FFFE76FF .vz.v».v..F¶.P.g...Å^.&..&.W..F¶ 000040
0876FFFA 5689F846 89FA5613 F8460306 57882604 47882 6F6 5689F446 89F65613 .V-.F¶.V-&.G.&.W..F½.V°.F½.V°.v. 000060
02030011 90C8C91F 88E80000 FFFF9A50 16F44680 1676FFFC 76FFFE76 FF0676FF .v..vz.v».v..F¶.P.....Š..èù..... 000080
02030161 00071842 020301D8 000705F8 02030154 0007165F 020301CA 000705E1 Å...ò.......T....«...Ü...ß...ø... 0000A0
00020000 00001455 00020172 0007158C 020301F0 00071133 02030263 00071283 ....c...3...Þ...V...r...U....... 0000C0
02030194 00071AFF 02030182 000718D2 02030202 0007114D 02030000 000E1A8E /.........M.......Ø............. 0000E0
02030187 000713E1 0203012F 00071437 02030125 000707A1 020301A3 000713D1 1...È...Å...X...7.../...Ã...Ñ... 000100
88064688 D88EFFFF 881E5657 00007CC8 00000000 00000000 00000241 00071700 ....A.............å|..WV.|...Ã.F.. 000120
74104608 0E4688FF FF03879A F85E8000 27021E9A 008E1E8D F25689F0 46890856 V..FÞ.V·........'..^½.ñ....F..F.t 000140
266E4788 26F05EC4 EA568CE8 46890846 8003A7E9 8AD48806 75F24608 F0468808 ..FÞ.F·u.|å.ÒÏ..FÃ.FÒ.Vòá^Þ&.Gn& 000160
DA8E1EF0 88F88800 2A05F256 88F04688 E85EC418 75C2088E 56898C46 89705788 .Wp.F¥.V/.ôu.á^Ò.FÞ.V·.*..«.Þ..Ŏ 000180
EA5688E8 4688F05E C48C5EFF E876FFEA 76FFF076 FFF276FF 26E81FA5 F2000889 ¿..·E.Š&.v·.vÞ.vô.vÒ.^¥á^Þ.FÒ.Vŏ 0001A0
8E1E0716 F088C87E 80004205 F25688F0 46881FA5 F2000889 DA8E1EF0 882A7F80 ..*.Þ..Ö¿..·È..FÞ.V·.B..-å.Þ.... 0001C0
F4468902 57882607 8826EC5E C4EE5689 EC468900 DA05F046 881FA5F2 0008890A Ö¿..·È..FÞ.Ö..Fš.VŸá^Š&..&.W..F¶ 0001E0

Dump of file SATURN:[PCCOMMON.DUMP.DLL]DGM.TMP;1 on 18-APR-1990 10:44:12.07
File ID (620,6,0)    End of file block 186 / Allocated 188

Virtual block number 136 (00000088), 512 (0200) bytes

478826F0 5EC402FC E98AE088 0674C008 0000FFFF 9A53060E 76FF1076 FFF65689 .V-.v..v..S......åt.|Å.Õ».á^Þ&.G 000000
05F25688 F0468814 57892612 47892610 56880E46 88C25689 C0468914 57882612 .&.W..Få.Vö.F..V.&.G.&.W..FÞ.V·. 000020
0A578C26 08478926 F8468DC4 5EC404C4 83FFFF00 A39A5052 C65689C4 46890042 8..Fá.VóRP.È....å.á^á.F½&.G.&.W. 000040
A8468002 37E90375 0C46080A 46880000 0E47C726 C45EC400 010C47C7 26C45EC4 á^á&úG...á^á&úG....F..F.u.Ö7..F´ 000060
4788260A 5EC40257 89260789 26885EC4 02578826 0788260A 5EC48A56 8C884689 .F|.Vøá^.&..&.W.á^|&..&.W.á^.&.G 000080
8926885E C4065788 26044788 260A5EC4 0A578926 08478926 885EC40A 57882608 .&.W.á^|&.G.&.W.á^.&.G.&.W.á^|&. 0000A0
C1064688 0E578926 0C478926 885EC40E 5788260C 4788260A 5EC40657 89260447 G.&.W.á^.&.G.&.W.á^|&.G.&.W..F»è 0000C0
57882607 8826885E C41FA5A5 A5A5DA8E 1E0716F0 88A07E8D D2568800 460303E0 Å..FÅ.VØ.~..Þ....ÜEEEE.á^|&..&.W 0000E0
961E8001 F406229A A05E8001 E802879A 8C5E808C 46898E56 89CA5618 C8462802 .+Få.Vò.V..F..^.....Š..^..".¶.... 000100
1E0716F0 88987E8D 08C48.02 1007A19A 02030387 9ADC8808 EC8301FE 06619A0D ..ø.ŧ..&..É.ñ....Å....á..~..Þ... 000120
5EC40257 89260789 26E85EC4 0248046E 9A022201 FA9A985E 801FA5A5 A5A5u. ^E .ÜEEEE..^..°.".n.K.á^Ò&..&.W.á^ 000140
A05E8002 5302879A 8C5E808C 46898E56 89CE5618 CC462806 57882604 478826t ' |&.G.&.W.+Fä.Vö.V..F..^.....S..^. 000160
08C48302 8507A19A 02680387 9ADC8808 EC830266 06619A0D 961E8002 5C06229A .".\......ø.f..&..É.ñ.k..Å....á. 000180
26E85EC4 001F046E 9A028A01 FA9A905E 801FA5A5 A5A5DA8E 1E0716F0 88907E8D .~..Þ....ÜEEEE..^..°....n...á^Ò& 0001A0
A5A5A5DA 8E1E0716 F088907E 80025688 D0460303 E0C10646 88065789 26044789 .G.&.W..F»èÅ..FÅ.VØ.~..Þ....ÜEEE 0001C0
D702879A 8C5E808C 46898E56 89CA5618 C846280A 57882608 47882688 5EC41FA5 E.á^|&.G.&.W.+Få.Vò.V..F..^....■ 0001E0

Dump of file SATURN:[PCCOMMON.DUMP.DLL]DGM.TMP;1 on 18-APR-1990 10:44:12.07
File ID (620,6,0)    End of file block 186 / Allocated 188

Virtual block number 137 (00000089), 512 (0200) bytes

0907A19A 02EF0387 9ADC8808 EC8302EA 06619A0D 961E8002 E006229A 905E8002 ..^..".Å......ø.ô..&..É.ñ.ÿ..Å.. 000000
0338046E 9A030E01 FA9A985E 801FA5A5 A5A5DA8E 1E0716F0 88987E8D 08C48303 ..á..~..Þ....ÜEEEE..^..°....n.8. 000020
898E5689 CE5618CC 46280E57 88260C47 8826885E C40A5789 26084789 26E85EC4 á^Ò&.G.&.W.á^|&.G.&.W.+Fä.Vö.V.. 000040
DC8808EC 83035306 619A0096 1E800349 06229A90 5E800340 02879A8C 5E808C46 F..^.....ä..^..".|.......ä.S..&..É 000060
9A845E80 1FA5A5A5 A5DA8E1E 0716F088 847E8008 C4830372 07A19A03 5803879A .ñ.X..Å.r..á..-..Þ....ÜEEEE..^.. 000080
E876FFEA 76FF0676 FF0876FF 0E578926 0C478926 E85EC401 E3046E9A 037701FA °.w..n.0.á^Ò&.G.&.W..v..v..vô.vÒ 0000A0
7680427F 80F05EC4 14578926 12478926 C25688C0 4688F05E C4625FFF 26F05EC4 á^Þ&._bá^Þ.Få.Vö&.G.&.W.á^Þ..8.v 0000C0
8AE08805 74C00800 00FFFF9A 37FF2602 77FF26EC 5EC41FA5 F2000889 1F161EC8 å...¿..·É.á^š&.w.&.7......åt.|Å. 0000E0
0000C800 0CCAC95F 5E1F00E8 C0280257 89260789 26F65688 F44688EC 5EC414E8 Š.á^å.F¶.V-&..&.W.+åŠ..^_èò..å.. 000100
8A048805 7301067E 83067C00 7F00087E 830E740C 46080A46 88D88E00 08881E00 ..|...Å.F..F.t..-....|..=..ø.|å. 000120
00C80008 CAC91F00 E8C02800 C4978926 00C28789 26085688 0646880A 5EC417E8 Š.á^..F..V.&..ò.&..á.+åŠ..èò..å. 000140
0A5EC418 E88AD488 05750846 08064688 08740C46 080A4688 D88E03F3 881E0000 ...|ø..Å.F..F.t..F..F.u.|å.Š.á^. 000160
0004C800 08CAC91F 00E8C028 02578926 07892606 5EC400C4 97882600 C2878826 &..ô.&..á.á^.&..&.W.+åŠ..èò..å.. 000180
01067E83 3DE88AD4 880575C2 08FE5689 FC46890A 56880846 88D88E04 34881E00 ..|4..Å.F..V..F=.Vz.ôu.|« Š=.-.. 0001A0
FF0676FF 008E8789 26064688 25E8C028 0475008E 873826FC 5EC40646 8940C018 .åä.F.á^=&;./.u.+åŠX.F.&. ŕ..v.. 0001C0
00C80006 CAC91F00 E8C02804 E88AE488 0574C008 06C48301 83E80EFC 76FFFE76 vz.v».Ò...á..åt.|Ô.Š.+åŠ..eo..å. 0001E0
```

```
Dump of file SATURN:[PCCOMMON.DUMP.DLL]DGM.TMP;1 on 18-APR-1990 10:44:12.07
File ID (620,6,0)   End of file block 186 / Allocated 188

Virtual block number 138 (0000008A), 512 (0200) bytes

 0A5EC412 E88AD488 75750846 08064688 08740C46 080A4688 D88E0473 881E0000 ...¡s..Ä.F..F.t..F..F.u.¡å.Š.á^. 000000
 4688D88E 0404881E 000000C8 0008CAC9 1F00E8C0 28078926 065EC400 8E878826 &../.á^.&..+áŠ..èÒ..à....¡å..Ä.F 000020
 C02800C8 97892600 C6878926 08568806 46880A5E C417E88A D4880575 0C46080A ..F.u.¡å.Š.á^..F..V.&..Ó.&..à.+à 000040
 75084608 06468808 740C4608 0A4688D8 8E050A88 1E000000 C80008CA C91F00E8 Š..èÒ..à....¡...Ä.F..F.t..F..F.u 000060
 E8C02802 57892607 8926065E C400C897 882600C6 8788260A 5EC418E8 8AD48805 .¡å.Š.á^.&..Ó.&..à.á^.&..&.W.+áŠ 000080
 0575C208 FE5689FC 46890A56 88084688 D88E0530 881E0000 04C80008 CAC91F00 ..èÒ..à....¡=..Ä.F..V..F=.V±.Óu. 0000A0
 28047500 C0873926 06468800 000646C7 05750000 8E8F8326 FC5EC42E E88AD485 ¡å.Š.á^=&.¢/..u.úF....F.£9.á.u.+ 0000C0
 057C881E 000000C8 0006CAC9 1F00E8C0 2800C087 892640C0 1801067E 8310E8C0 åŠ..~...ÁΩ&..á.+áŠ..èÒ..à....¡|. 0000E0
 C400C087 88260A5E C412E88A D4880575 08460806 46880874 0C46080A 4688D88E .Ä.F..F.t..F..F.u.¡å.Š.á^.&..à.á 000100
 46890856 88064688 D88E05CE 881E0000 06C80008 CAC91F00 E8C02807 8926065E ^.&..+áŠ..èÒ..à....¡Ó..Ä.F..V..F 000120
 74C008FA 468906C4 830015E8 0E505201 6A147400 008E8F83 26FC5EC4 FE5689FC =.V±á^=&.¢/..t.j.RP.Ó...á..F°.át 000140
 46890856 88064688 D88E0604 881E5657 0000A0C8 0004CAC9 1F00E8C0 2804E802 .Š.+áŠ..èÒ..à...WV.¡...Ä.F..V..F 000160
 04568902 468900C8 97882600 C6878826 065EC406 48E9C028 0575C208 AC5689AA ¯.V¯.Óu.+áÓH.á^.&..Ó.&..à..F0.Vå 000180
 080000FF FF9A5016 F0468050 16844680 0276FFD4 76FF0628 E98AE488 06750008 .Äu.¡Ó.Ó+..vå.v0.F..P.FÞ.P...... 0001A0
 8A46898C 4689C028 88568986 46890042 05085688 06468806 0CE98AE4 880674C0 át.¡Ó.Ó...F..V..8..FÑ.V¡+á.F¥.Fα 0001C0
 89205788 261E4788 26C45689 C246891C 5788261A 47882606 5EC48E46 89C04689 .Fá.F/á^.&.G.&.W..FÓ.Vá&.G.&.W . 0001E0

Dump of file SATURN:[PCCOMMON.DUMP.DLL]DGM.TMP;1 on 18-APR-1990 10:44:12.07
File ID (620,6,0)   End of file block 186 / Allocated 188

Virtual block number 139 (0000008B), 512 (0200) bytes

 1E0716F0 88FF7C8E 800A5788 26084703 2603E0C1 0E478826 865EC4C8 5689C646 F6.Vàá^Ñ&.G.èÅ.&.G.&.W../|..Þ... 000000
 8DFF6886 89FF6A96 8902571B 26072826 88468E8C 56880A46 881FA5A5 A5A5DA8E .ÖEEEE..Fα.V¥.F¡&+.&.W...]...h.. 000020
 9ADC8808 EC830732 06619A0D 961E8D07 2806229A FF7C9E8D 071F0287 9AFF689E .h.......|..".(......a.2..&..É. 000040
 FF749E80 1FA5A5A5 A5DA8E1E 0716F088 FF748E8D 08C48307 5307A19A 07370387 Ñ.7..À.S..&../t..Þ....ÖEEEE...t. 000060
 57182604 47282686 5EC4C056 888E4688 E056890E 46890780 046E9A07 5801FA9A .°.X..n....F8.VÅ.F/.Vàá^Ñ&+G.&.W 000080
 9A0D961E 8D079206 229AFF7C 9E8D0789 02879AFF 689E8DFF 688689FF 6A968906 ...j...h...h........|.."........ 0000A0
 8E1E0716 F088FF6C 8E8D08C4 83078D07 A19A07A1 03879ADC 8808EC83 079C0661 a....&..É.Ñ.À..À.§..&../l..Þ.... 0000C0
 47882686 5EC4E456 89E24689 02CF046E 9A07C201 FA9AFF6C 9E8D1FA5 A5A5A5DA ÖEEEE...l..°.Ó..n.ü..Fä.VÓá^Ñ&.G 0000E0
 88C24688 1FA5A5A5 A5DA8E1E 0716F088 FF6C8E8D 0A578826 08470326 03E0C10E .èÅ.&.G.&.W../l..Þ....ÖEEEE..FÓ. 000100
 6C9E8D08 1402879A FF689E8D FF688689 FF6A9689 02571826 07282688 468EC456 VÓ.F¡&+.&.W...j...h...h........l 000120
 C4830848 07A19A08 2C03879A DC8808EC 83082706 619A0D96 1E8D0810 06229AFF .."........a.'..&..É.Ñ.,..À.H..á 000140
 89087504 6E9A084D 01FA9AFF 749E8D1F A5A5A5A5 DA8E1E07 16F088FF 748E8D08 ../t..Þ....ÖEEEE...t..°.M..n.u.. 000160
 9E8DFF68 8689FF6A 96890657 18260447 2826865E C4C85688 C64688E8 5689E646 F|.VÒ.FÓ.Vàá^Ñ&+G.&.W...j...h... 000180
 879ADC88 08EC8308 9106619A 0D961E80 08870622 9AFF6C9E 8D087E02 879AFF68 h....~...l..".........a....&..É.Ñ 0001A0
 9AFF609E 8D1FA5A5 A5A5DA8E 1E0716F0 88FF608E 8008C483 088207A1 9A089603 ....À.ý..á../`..Þ....ÖEEEE...`.. 0001C0
 56188446 28E05688 DE4688F0 76FFF276 FFEC5689 EA468907 16046E9A 088701FA °.Ñ..n....FÓ.V$.v·.vÞ.F8.VÅ+F..V 0001E0

Dump of file SATURN:[PCCOMMON.DUMP.DLL]DGM.TMP;1 on 18-APR-1990 10:44:12.07
File ID (620,6,0)   End of file block 186 / Allocated 188

Virtual block number 140 (0000008C), 512 (0200) bytes

 7CE05639 D388C188 9A5E8998 4E89DA18 C828E05E 88DE4E88 093700F8 9A505286 .RP.%.7..N8.^Å+à.Ö.N..^..è.Æ9VÅ| 000000
 7F0C7CE8 56399A56 88984688 9A561198 4601F256 88F04688 0C760E46 39057F13 ...9Fßv..FÞ.V·.F..V..F..V.9VÖ|.. 000020
 18884628 E45688E2 4688_476 FFF676FF A24689C0 2802E800 01880572 E6463905 .9F|r.¡..Š.+á.FÅ.v~.v¶.Fä.VÖ+F.. 000040
 E4563903 88C18896 5E89944E 89DA18C8 28E45E88 E24E8808 0800F89A 505_^456 V.RP.%....Nä.^Ö+à.Ö.N..´ .è.Æ9VÖ 000060
 0C7CEC56 39965688 94468896 56119446 01F65688 F446880C 76E24639 057F1.^C |...9Fäv..F¶.V~.F..V..F..‘.9V$|. 000080
 0315E9C0 280575C0 08097500 A27E839C 4689C028 02E80001 880572EA 463905‚‘ ..9Fõr.¡..Š.+á.F..~Å.u..Åu.+áÓ.. 0000A0
 57882612 47882606 5EC402FF E9C028FF FF038D9A AA76FFAC 76FF1075 000A7E83 .~..u..v¯.v´.....+áÓ..á^.&.G.&.W 0000C0
 7E83A846 FF03E800 00A846C7 00017847 C726EE46 89784788 26A65689 A4468914 ..FÊ.V|&.Gx.FŸ&ÚGx..úF´..Š..F´.~ 0000E0
 46899A56 88984688 A056899E 4689F256 88F04688 7CE8A846 8802C0E9 037C02A8 ´.|.Óá..F´$|.FÞ.V·.F..V..F..V..F 000100
 88EA4688 DC56890A 4689E456 88E24688 D05689CE 4689E856 88E64688 CC5689CA Ò.Vä.F|.VÒ.FÖ.VÅ.Fä.VÒ.FÖ.VÉ.FÒ. 000120
 89CA4689 96568894 4688A056 899E4689 F65688F4 46884CE8 92568990 4689EC56 V$.F..V.ŠL.F¶.V~.F..V..F..V..FÒ. 000140
 E85688E6 46880856 89D64689 E05688DE 46880056 89CE4689 EC5688EA 4688CC56 Vä.FÕ.V$.FÖ.VÅ.F8.VÅ.F¤.VÄ.F|.VÒ 000160
 4601A056 889E4688 0CE800E8 86740001 3DFF7DE9 0375C008 0EE88E56 898C4689 .F..V.Š..åu.Õ).=..tÑŠ.Š..F..V..F 000180
 E8A84688 0208E903 76CA4639 087C0212 E9037ECC 56390056 88CE4688 CC5611CA Ò.Vä.FÖ.VÅ9Vä-.Õ..|.9FÒv.Õ...F´Š 0001A0
 56899046 89CC5688 CA46881F E8D85689 D646898E 56898C46 89CC5688 CA468828 (.FÒ.Vä.F..V..F¤.VÅŠ..FÒ.Vä.F..V 0001C0
 032603E0 C10E4788 26865EC4 00E8E374 00013004 74C00808 E8DC5689 DA468992 ..FÖ.VÉŠ..átÅ=..tDŠ.á^Ñ&.G.èÅ.&. 0001E0
```

```
Dump of file SATURN:[PCCOMMON.DUMP.DLL]DGM.TMP;1 on 18-APR-1990 10:44:12.07
File ID (620,6,0)   End of file block 186 / Allocated 188

Virtual block number 141 (0000008D), 512 (0200) bytes

 9E8D0AF5 02879AD6 5E8D1FA5 A5A5A5DA 8E1E0716 F088FF60 8E8D0A57 88260847 G.&.W../'..Þ....ÕEEEE..^ø...%... 000000
 83082907 A19A0800 03879ADC 8808EC83 08080661 9A0D961E 8D0AFE06 0A9AFF60 '....±......e....&..É.ñ....À.).. 000020
 0846046E 9A082E01 FA9AFF6C 9E8D1FA5 A5A5A5DA 8E1E0716 F088FF6C 8E8D08C4 ó../l..Þ....ÕEEEE...l..'....n.F. 000040
 58060A9A FF609E8D 084F0287 9ADA5E8D 805689AE 46890257 13260703 26865EC4 ó^R&..&.W..FÛ.V¯.^Ö...O...'....X 000060
 FF748E8D 08C4830B 8307A19A 08670387 9ADC8808 EC830B62 06619A0D 961E8D08 .......a.b..&..É.ñ.g..À....ó../t. 000080
 4F882686 5EC40806 046E9A08 8801FA9A FF749E8D 1FA5A5A5 A5DA8E1E 0716F088 .Þ....ÕEEEE...t..'....n.ø.ó^R&.O 0000A0
 8E8D0A57 88260847 032603E0 C10E4788 26847689 824E89F2 13C80306 77882604 .&.w..à.·.Ný.vÇ&.G.éÀ.&.G.&.W../ 0000C0
 80080606 0A9AFF6C 9E8008CD 02879A8C 5E8D1FA5 A5A5A5DA 8E1E0716 F088FF6C l..Þ....ÕEEEE..^....ë...l....ø.. 0000E0
 F088FF74 8E8D08C4 830C0107 A19A08E5 03879ADC 8808EC83 08E00661 9A0D961E ....ø.À..&..É.ñ.l..À....ó../t..Þ 000100
 13260703 26865EC4 0C1E046E 9A0C0601 FA9AFF74 9E8D1FA5 A5A5A5DA 8E1E0716 ....ÕEEEE...t..'....n...ó^R&..&. 000120
 06619A00 961E800C 30060A9A FF6C9E8D 0C270287 9A905E8D FA5689F8 46890257 W..F%.V'.^....'...l....O......ø. 000140
 A5DA8E1E 0716F088 FF7C8E8D 08C4830C 5807A19A 0C3F0387 9ADC8808 EC830C3A :..&..É.ñ.?..À.[..ó../|..Þ....ÕE 000160
 13C80306 77882604 4F882686 5EC40AEC 046E9A0C 6001FA9A FF7C9E8D 1FA5A5A5 ÉÉÉ...|..'.'..n.&.ó^R&.O.&.w..à. 000180
 C483FFFF 048C9AA4 76FFA676 FF5016AE 46805016 F8468003 6AFE7689 FC4E89F2 ·.N=.v±j..F%.P.FÛ.P.vÎ.vÉ.V....ó 0001A0
 56570000 38C8CBC9 ` 5E1F00 E8C02878 478926EE 4688065E C4FD34E9 F0D4E90E .Õ&»Ö4»ó^..FY&.Gx+åS..^ èüà8..WV 0001C0
 C8978826 00C68788 26065EC4 019EE98A 04880675 08460806 4688088E 0644881E .|D..Ä.F..F.u.|&.Ö..ó^.Ï..ó.&..à 0001E0

Dump of file SATURN:[PCCOMMON.DUMP.DLL]DGM.TMP;1 on 18-APR-1990 10:44:12.07
File ID (620,6,0)   End of file block 186 / Allocated 188

Virtual block number 142 (0000008E), 512 (0200) bytes

 5016F846 80006A00 6AF476FF F676FF01 81E98AE4 88067500 08F65689 F4468900 ..F¶.V-.Àu.|ð.Õ...v-.v¶j.!..F%.P 000000
 5EC4F256 89F04689 00420508 56880646 880163E9 8AE48806 74C00800 0006889A ......åt.|ð.Õc..F..V..8..rp.V·ó^ 000020
 1FA5A5A5 A5DA8E1E 0716F088 D87E8DC1 0303E1C1 0A4E880A 57882608 478826F0 Þ&.G.&.W..N.éÅ..é.-Å.Þ....ÕEEEE. 000040
 A5A5A5DA 8E1E0716 F088E87E 8DC10303 E1C10C4E 880A5788 26084788 26F2468E .F·&.G.&.W..N.éÅ..é.-Õ.Þ....ÕEEE 000060
 02879AF8 5E800070 03879AE0 5E8D0068 06229AE8 5E8D0060 01FA9AD8 5E8D1FA5 É..^Ä.'.'..^Ò.".h..^Å.ñ.p..^%... 000080
 07A19A0D 9003879A DC8808EC 83008806 619A0096 1E800081 060A9AE0 5E800078 x..^Å..........ø....&..É.ñ....À. 0000A0
 8D046E9A 0DAF01FA 9AD05E8D 1FA5A5A5 A5DA8E1E 0716F088 D07E8D08 C48300AA ¨..ó..-Å.Þ....ÕEEEE..^Å.'.£..n.§ 0000C0
 00080661 9A0D961E 8D0DCE06 0A9AE05E 8000C502 879AFC5E 8DFA5689 F8468900 ..F%.V'.^=...ó..^Å...ö......ø.Å. 0000E0
 A5A5A5A5 DA8E1E07 16,088C8 7E8D08C4 830DF707 A19A0DDD 03879ADC 8808EC83 .&..É.ñ.Î..À.%..ó..-à.Þ....ÕEEEE 000100
 0AF87E83 067C127F 00FA7E83 FE5689FC 468908C4 046E9A0D FC01FA9A C85E8D1F ..^à.'.=..n.ó..F=.V±.-'...|..-%. 000120
 C7000AFC 46C70A73 0AFC7E83 067C127F 00FE7E83 0000FA46 C7000AF8 46C70A73 ø.úF%..úF'...-±...|..-=.ø.úF=..ú 000140
 E88AE488 0574C008 0000FFFF 9A5016F8 4680006A 006AF476 FFF676FF 0000FE46 F±...v-.v¶j.j..F%.P......åt.|ð.Š 000160
 82881E56 5700002C C8C8C95F 5E1F00E8 C02804C4 83000CE8 0E0676FF 0876FF11 ..v..v..Ô...ó.+åS..^ èüà,..WV.|ý 000180
 468900C8 97882600 C6878826 065EC401 37E98AD4 88067508 46080646 88D88E0C ..Ä.F..F.u.|å.Ö7.ó^.Ï..ó.&..à..F 0001A0
 0CF19A00 6A006A50 16EC468D F876FFFA 76FF011A E98AE488 06750008 FA5689F8 %.V'.Àu.|ð.Õ...v'.v%.F&.Pj.j..Þ. 0001C0
 CA050646 88F65689 F4468900 42050856 88064688 00FCE98A E4880674 C0080000 ...åt.|ð.Õ=..F..V..8..F¶.V-.F..ð 0001E0

Dump of file SATURN:[PCCOMMON.DUMP.DLL]DGM.TMP;1 on 18-APR-1990 10:44:12.07
File ID (620,6,0)   End of file block 186 / Allocated 188

Virtual block number 143 (0000008F), 512 (0200) bytes

 0716F088 E47E8D0A 57882608 47032603 E0C10E47 8826F45E C4FE5689 FC468900 ..F=.V±ó^¶&.G.éÀ.&.G.&.W..-ð.Þ.. 000000
 1906619A 00961E8D 0F0F060A 9AE45E8D 0F060287 9AEC5E8D 1FA5A5A5 A5DA8E1E ..ÕEEEE..^&......^ð..........ø.. 000020
 A5A5A5DA 8E1E0716 F088DC7E 8008C483 0F3807A1 9A0F1E03 879ADC88 08EC830F ..&..É.ñ....À.8..ó..-É.Þ....ÕEEE 000040
 26078926 FC5EC402 57132607 0326F45E C40F5904 6E9A0F30 01FA9A0C 5E8D1FA5 É..^É.'.=..n.Y.ó^¶&..&.W.ó^=&..& 000060
 8808EC83 0F740661 9A0D961E 800F6A06 0A9AE45E 800F6102 879AF05E 80025789 .W..^Þ...ø..^ð...j.......ø.t..&.. 000080
 D45E801F A5A5A5A5 DA8E1E07 16F088D4 7E8D08C4 830F9307 A19A0F79 03879ADC É.ñ.y..À....ó..-&.Þ....ÕEEEE..^à 0000A0
 044F8926 FC5EC4F2 13C80306 77882604 4F8826F4 5EC40D58 046E9A0F 9801FA9A .'....n.X.ó^¶&.O.&.w..à.·ó^=&.O. 0000C0
 74084608 06468808 8E0E6F88 1E565700 0008C8C8 C95F5E1F 00E8C028 06778926 &.w.+åS..^ èüà...WV.|o..Ä.F..F.t 0000E0
 F87E8010 56880E46 88177410 46080E46 880105E9 8AD48806 750C4608 0A468808 ..F..F.u.|Ï.Ö...F..F.t..F..V..-% 000100
 0EAE9A50 16F8468D 006A006A 0676FF08 76FF1EE8 1FA5A5A5 A5DA8E1E 0716F088 .Þ....ÕEEEE.Š..v..v.j.j..F%.P.Û. 000120
 0F7D0002 7F83260A 5EC4187D 00027F83 260A5EC4 00C8E98A E4880674 C0080000 ...åt.|ð.Õà.ó^.&....).ó^.&....). 000140
 2C7C0257 3926FA56 88F84688 0A5EC438 E8E7E802 57112607 0126FA56 88F84688 .F%.V'&..&.W.ŠÕŠ;ó^..F%.V'&9W.|, 000160
 F846880F 72073926 057F167C 02573926 FA5688F8 46880A5E C4257207 3926057F ..&9.r%ó^..F%.V'&9W.|...&9.r..F% 000180
 10700006 7F83260A 5EC41C7D 00067F83 260A5EC4 08E80257 19260729 26FA5688 .V'&).&.W.ŠÛó^.&....).ó^.&....). 0001A0
 7C065739 26FE5688 FC46880A 5EC43EE8 E6E80657 11260447 0126FE56 88FC4688 .F=.V±&.G.&.W.Š|Š>ó^..F=.V±&9V.| 0001C0
 10720447 3926067F 187C0457 3926FE56 88FC4688 0A5EC427 72044739 26067F2F /..&9G.r'ó^..F=.V±&9W.|...&9G.r. 0001E0
```

```
Dump of file SATURN:[PCCOMMON.DUMP.DLL]DGM.TMP;1 on 18-APR-1990 10:44:12.07
File ID (620,6,0)   End of file block 186 / Allocated 188

Virtual block number 144 (00000090), 512 (0200) bytes

 1E565700 0034C8C8 C95F5E1F 00E8C028 D9E80657 19260447 2926FE56 88FC4688 .F•.V±&)G.&.W.$1+á$..^_èüâ4..WV. 000000
 00C897B8 2600C687 8826065E C40171E9 8AD48806 75084608 06468808 8E0FC588 ¡é..Ä.F..F.u.¡å.Ôq.á^.Ë..ó.&..à. 000020
 004205C2 8CC388F2 568CF046 89E8468D 0154E98A E4880675 0008FA56 89F84689 .F%.V•.Åu.¡Ô.ÔT..FÔ.FÞ.V·.ü.ò.B. 000040
 26084703 2603E0C1 0E478826 F45EC4FE 5689FC46 8900CA05 C388F656 89F44689 .F¶.V-.ù.ò..F•.V±á^¶&.G.éÅ.&.G.& 000060
 26F45EC4 02578826 078826FC 5EC41FA5 A5A5A5DA 8E1E0716 F088E07E 800A5788 .W..~Å.Þ....ÖEEEE.á^•&..&.W.á^¶& 000080
 00961E80 11930622 9AE05E8D 118A0287 9ACC5E8D CC4689CE 56890257 18260728 +.&.W..Vö.Fä:^ä......^Å.".......  0000A0
 8E1E0716 F088D87E 8008C483 118C07A1 9A11A203 879ADC88 08EC8311 9006619A .a....$..Ê.ñ.À..À.¥..á..-Å.Þ.... 0000C0
 FC5EC402 57892607 8926F05E C411EF04 6E9A11C1 01FA9AD8 5E8D1FA5 A5A5A5DA ÖEEEE..^Å.•.ê..n.ÿ.á^Þ&..&.W.á^• 0000E0
 F702879A CC5E8DCC 4689CE56 8906571B 2604472B 26F45EC4 06578826 04478826 &.G.&.W.á^¶&+G.&.W..Vö.Fä.^ä...% 000100
 2907A19A 120F0387 9ADC8808 EC83120A 06619A00 961E8D12 0006229A E05E8011 ..^Å.".........a....&..Ê.ñ....Å.) 000120
 0EFE046E 9A122E01 FA9AD05E 8D1FA5A5 A5A5DA8E 1E0716F0 88007E80 08C48312 ..á..-Å.Þ....ÖEEEE..^Å.•....n.±. 000140
 83FD6EE8 0EF876FF FA76FFF0 76FFF276 FF006A00 6A065789 26044789 26F05EC4 á^Þ&.G.&.W.j.j..v·.vÞ.v• v%.Òn». 000160
 04E8BAE4 880574C0 0800000E 449A006A 006AF076 FFF276FF F876FFFA 76FF0CC4 á..v•.v%.v·.vÞj.j..D....ᵢ ¡ô.Š. 000180
 0C8C0002 00000006 01100002 00000001 099F0002 000990C8 C95F5E1F 00E8C028 +á$..^_èü...................... 0001A0
 12630203 0000000E 10F10002 00000000 11820002 05070008 100E0203 00000007 .........■...........þ.......c. 0001C0
 00000000 00000000 00000000 008C0006 03C50203 00800006 000C0203 05E90008 ..Ô...Ê...¯...é...¥............. 0001E0
```

```
Dump of file SATURN:[PCCOMMON.DUMP.DLL]DGM.TMP;1 on 18-APR-1990 10:44:12.07
File ID (620,6,0)   End of file block 186 / Allocated 188

Virtual block number 145 (00000091), 512 (0200) bytes

 E8FE5689 FC468908 56880646 880E7504 3C0C240A 468AD88E FFFF881E 000004C8 à....¡...Ä.F.$.<.u..F..V..F•.V±$ 000000
 4E88FFFF 00289A50 5200DA83 00012D0E 56880C46 88026A00 6A29750C 0A46F661 a-F..u)j.j..F..V.-...Ö.RP.(....N 000020
 28085688 0646881A 75083C0C 240A468A 32E8FE5E 89FC4E89 DA18C828 085E8806 ..^.+à.Ö.N•.^±$2.F.$.<.u..F..V.+ 000040
 FFFF9A65 6A000868 1E00FD68 1E0FE8FE 5689FC46 89000283 0001050E 56180C46 F..V.....@..F•.V±Š..h=..hÄ.je... 000060
 0004C8C8 C91F0257 89260789 26FE5688 FC468810 5EC41074 12460810 46880000 ...F..F.t.á^..F•.V±&..&.W..èüà.. 000080
 8300012D 0E56130C 46030856 88064688 1A75013C 03240A46 8AD88E00 06881E00 ..¡...Ä.F.$.<.u..F..V..F..V.-... 0000A0
 03003C00 289A0C76 *F0E76FF 026A006A 1D75030A 46F649E8 FE5689FC 4689000A Ö..F•.V±Š|-F..u.j.j..v..v..(.<.. 0000C0
 89FC4689 08568806  5880E75 023C0324 0A468A26 E8FE5689 FC468908 56130646 F..V..F•.V±Š&.F.$.<.u..F..V..F•. 0000E0
 4688105E C4107412 46081046 88000000 7E9A7B6A 010A681E 012F681E 0FE8FE56 V±$..h/..h..j(.~....F..F.t.á^..F 000100
 46890856 88064688 D88E00A3 881E0000 08C8C8C9 1F025789 26078926 FE5688FC •.V±&..&.W..èüà....¡Ê..Ä.F..V..F 000120
 0C478926 C028F85E C4FA5689 F8468900 9E978826 009C8788 26FC5EC4 FE5689FC •.V±á^•&....&.....F%.V•á^Y+á&.G. 000140
 478926F8 5EC41247 89261447 8926F85E C40E4789 26104789 26F85EC4 0A478926 &.G.á^Y&.G.&.G.á^Y&.G.&.G.á^Y&.G 000160
 8926F85E C41E4789 26204789 26F85EC4 1A478926 1C478926 F85EC416 47892618 .&.G.á^Y&.G.&.G.á^Y&.G &.G.á^Y&. 000180
 C43A4789 263C4789 26F85EC4 38478926 F85EC436 478926F8 5EC42247 89262447 G$&.G"á^Y&.G6á^Y&.G8á^Y&.G<&.G:á 0001A0
 2A478926 2C478926 F85EC426 47892628 478926F8 5EC43E47 89264047 8926F85E ^Y&.G@&.G>á^Y&.G(&.G&á^Y&.G,&.G* 0001C0
 F85EC442 478926F8 5EC43247 89263447 8926F85E C42E4789 26304789 26F85EC4 á^Y&.G0&.G.á^Y&.G4&.G2á^Y&.G8á^Y 0001E0
```

```
Dump of file SATURN:[PCCOMMON.DUMP.DLL]DGM.TMP;1 on 18-APR-1990 10:44:12.07
File ID (620,6,0)   End of file block 186 / Allocated 188

Virtual block number 146 (00000092), 512 (0200) bytes

 5689FC46 89085688 06468808 8E013488 1E000008 C8C8C91F 44478926 46478926 &.GF&.GD.èüà....¡4..Ä.F..V..F•.V 000000
 C7260F74 00067F83 26F85EC4 FA5689F8 4689009E 97882600 9C878826 FC5EC4FE ±á^•&.....&.....F%.V•á^Y&....t.&ú 000020
 08568806 4688088E 0211881E 000008C8 C8C91F00 010847C7 26F85EC4 00000647 G...á^Y&úG....èüà....¡...Ä.F..V. 000040
 087F8326 F85EC4FA 5689F846 89009E97 8826009C 878826FC 5EC4FE56 89FC4689 .F•.V±á^•&....&.....F%.V•á^Y&... 000060
 89FC4689 08568806 4688D88E 0256881E 00000AC8 C8C91F00 000847C7 26067400 .t.&úG....èüà....¡V..Ä.F..V..F•. 000080
 880574C0 080000FF FF9A5016 F84680AC 6A0A6A50 F6468904 478826FC 5EC4FE56 V±á^=&.G..F-Pj.jL.F%.P......át.¡ 0000A0
 00000447 C726F85E C4009E97 8926009C 878926FA 5688F846 88FC5EC4 3FE88AD3 £.$?á^•.F%.V•&....&....á^Y&úG... 0000C0
 2804C483 FE32E80E 0676FF08 76FF0000 0847C726 F85EC400 000647C7 26F85EC4 á^Y&úG...á^Y&úG....v..v..Ò2±.á.+ 0000E0
 26FC5EC4 FE5689FC 46890856 88064688 D88E0292 881E0000 08C8C8C9 1F00E8C0 á$..èüà....¡...Ä.F..V..F•.V±á^•& 000100
 7F832618 E8C02804 7500047F 8326F85E C4FA5689 F8468900 9E978826 009C8788 ....&.....F%.V•á^Y&....u.+á$.&.. 000120
 030C881E 000024C8 C8C91F00 E8C02800 010647C7 26067500 087F8326 00750006 ..u.&....u.&úG...+á$..èüà$...¡.. 000140
 97882600 9C878826 EC468904 478826FC 5EC4FE56 89FC4689 08568806 4688D88E .Ä.F..V..F•.V±á^•&.G..F$&....&.. 000160
 000A8788 26FC5EC4 0127E98A 04880675 00047F83 26EE5EC4 F05689EE 4689009E ...F¥.VÞá^Y&....u.¡å.Ô'.á^•&..Ö. 000180
 FEE98AE0 880674C0 080000FF FF9A5016 FA468050 52F85689 F6468900 DC978826 &..É..F-.V%RP.F•.P......át.¡Å.Ò± 0001A0
 FA46FF00 E2E98AD3 880674C0 080000FF FF9A5016 F2468DFA 76FF006A EC76FF00 ..v$j..v•.F·.P......át.¡£.Ôã..F• 0001C0
 008FE98A E0880674 C0080000 FFFF9A50 16FA468D F276FFF4 76FFF676 FFF876FF .v%.v-.v¶.v·.F•.P......át.¡Å.Ô¢. 0001E0
```

Dump of file SATURN:[PCCOMMON.DUMP.DLL]DGM.TMP;1 on 18-APR-1990 10:44:12.07
File ID (620,6,0)   End of file block 186 / Allocated 188

Virtual block number 147 (00000093), 512 (0200) bytes

```
5052003A 05C28CC3 8B2277FF 262477FF 26EE5EC4 F276FFF4 76FF0676 FF0876FF .v..v..v¶.v.á^Y&.w$&.w".û.ô.:.RP 000000
4688FFFF 043D9A50 160C4680 0676FF08 76FF0000 FFFF9A50 160C4680 4277FF26 &.wB.FÉ.P......v..v..FÉ.P.=....F 000020
FF265052 002605C2 8CC38842 77FF2644 77FF2646 77FF26EE 5EC44874 0C46080A ..F.tHá^Y&.wF&.wD&.wB.û.ô.&.RP&. 000040
FF261C77 FF260E76 FF1076FF F276FFF4 76FF2277 FF262477 FF263677 FF263877 wB&.wô&.w$&.w".v¶.v..v..v.&.w.&. 000060
C726EE5E C404C483 FC96E80E 0676FF08 76FF22C4 830A5EFF 0676FF08 76FF1A77 w..v..v..^..á".v..v..Ò.•.á.á^Y&ú 000080
1F00E8C0 2B04E88A D3880574 C0080000 FFFF9AF2 76FFF476 FFEC76FF 00000447 G....v&.v¶.v.......át.¡&.$.+á$.. 0000A0
C437E88A D4B80575 00067E83 067C007F 00087E83 D88E035E 881E0000 00C8C8C9 èùà....|^..Ä.-....|..-..u.¡á.$7á 0000C0
26065788 26044788 26167208 47392606 7F1E7C0A 57392602 57882607 88260A5E ^.&..&.W.&9W.|...&9G.r.&.G.&.W.& 0000E0
1E565700 0012C8C8 C91F00E8 C02804E8 8A048805 730C4739 26067C00 7F0E5739 9W...|.&9G.s.|á.$.+á$..èùà...WV. 000100
8A048806 75084608 06468808 74C208FE 5689FC46 89105688 0E468808 8E04C888 |à..Ä.F..V..F•.V±.ôt..F..F.u.¡á. 000120
879A0A5E 80056101 FE9A1880 4A74C426 FC768803 E3C1505F 8826FC5E C400A5E9 ÒE.á^=&._PèD..v•&átJ...±.•..^... 000140
059807A1 9A057E03 879ADC88 08EC8305 7906619A 009E1E80 056F068A 9A056602 .f....o......•.y..&..É.ñ.-..À... 000160
99000D04 6E9A0590 01FA9AEE 5E801FA5 A5A5A50A 8E1E0716 F088EE7E 8008C483 .á..-Y.Þ....ÒEEEE..^Y.•....n.ì.. 000180
FF26FC5E C40000F8 46C70001 F646C70A 73000130 057C117F D208F856 89F64689 .F-.V%.•..|.=..s.úF-..úF%..á^=&. 0001A0
0484B8E6 01FA7688 065EC400 00FFFF9A 5016FA46 80F676FF 000AB7FF 26000C87 ñÉ.&.ñÖ..v-.F•.P.....á^..v•||... 0001C0
890C5688 0A4688D8 8E052188 1E000008 C8000CCA C95F5E1F 00E8C02B 07892601 .&..+á$..^_èò..à....|!..Ä.F..V.. 0001E0
```

Dump of file SATURN:[PCCOMMON.DUMP.DLL]DGM.TMP;1 on 18-APR-1990 10:44:12.07
File ID (620,6,0)   End of file block 186 / Allocated 188

Virtual block number 148 (00000094), 512 (0200) bytes

```
00740846 08064688 FA5689F8 4689009E 97882600 9C878826 FC5EC4FE 5689FC46 F=.V±á^=&....&.....F%.V•.F..F.t. 000000
D88E05F5 881E0000 0AC80008 CAC91F00 E8C02807 8926065E C4044788 26F85EC4 á^Y&.G.á^.&..+á$..èò..à....|%..Ä 000020
C4FA5689 F8468900 9E978826 009C8788 26FC5EC4 FE5689FC 46890856 88064688 .F..V..F=.V±á^=&....&.....F%.V•á 000040
890CC483 FCDCE80E 0676FF08 76FF4877 FF264A77 FF261A77 FF261C77 FF26F85E ^Y&.w.&.w.&.wJ&.wH.v..v..ÒE•.á.. 000060
5689F046 892A5688 28468808 8E063C88 1E565700 006CC800 04CAC91F 00E8F646 F-$..èò..àl..WV.¡<..Ä.F(.V•.FÞ.V 000080
047F8326 EC5EC400 01C246C7 EE5689EC 4689009E 97882600 9C878826 F05EC4F2 ·á^Þ&....&.....F&.VYúFô..á^&&... 0000A0
001046C7 07D00E46 C70A7500 0E7E8306 7C127F00 107E8304 74E98AE0 88067400 .t.¡À.Ôt..-....|..-..u.úF.À.úF.. 0000C0
5EC4043F E90374C0 08C04689 08C483FD D1E80E1C 76FF1E76 FF1476FF 1676FF00 ..v..v..v..v..Ò|•.á..Fá.át.Ö7.á^ 0000E0
56881C46 88EC5EC4 1C578926 1A478926 26568824 4688EC5E C4000104 47C726EC &&úG...á^&.F$.V&&.G.&.W.á^&.F..V 000100
EC5EC438 47892618 4688EC5E C4364789 261A4688 EC5EC424 57892622 4789261E .&.G"&.W$á^&.F.&.Gáá^&.F.&.GBá^& 000120
56881446 88EC5EC4 46578926 44478926 1056880E 4688EC5E C4424789 26124688 .F.&.GBá^&.F..V.&.GD&.WFá^&.F..V 000140
4A578926 48478926 08568806 4688EC5E C41FA5F2 0008890A 8E1EF088 267F8016 ...&.Þ..Ö¿...É.á^&.F..V.&.GH&.WJ 000160
F25688F0 468803A3 E98AD488 0674C008 0000FFFF 9A5016C4 468D2076 FF2276FF .v".v .Fá.P......át.¡à.ÒÉ..FÞ.V· 000180
07C601FE 9A188008 74C426F0 8803E3C1 0E5F8826 C85EC4CA 5689C846 89004205 .B..Fà.Vòá^à&._.èD..Þ&át....±.ô. 0001A0
07E303B7 9ADC8808 EC8307DE 06619A0D 9E1E8D07 D4068A9A 07C80287 9A1C5E8D .^....ù....À......•.B..&..É.ñ.D. 0001C0
9A080201 FA9AB45E 801FA5A5 A5A50A8E 1E0716F0 88847E8D 08C48307 FD07A19A .À.»..á..-Ç.Þ....ÒEEEE..^Ç.•.... 0001E0
```

Dump of file SATURN:[PCCOMMON.DUMP.DLL]DGM.TMP;1 on 18-APR-1990 10:44:12.07
File ID (620,6,0)   End of file block 186 / Allocated 188

Virtual block number 149 (00000095), 512 (0200) bytes

```
00008E46 C70001BC 46C70A73 00013005 7C117FD2 088E5689 8C468999 0559046E n.Y...FY.V/.•..|.=..s.úFY..úF/.. 000000
26084703 2603E0C1 0E478826 C85EC4FE 5689FC46 89085788 26064788 26F05EC4 á^Þ&.G.&.W..F=.V±á^à&.G.èÀ.&.G.& 000020
060A9AB4 5E800860 02889A14 5EC41FA5 A5A5A50A 8E1E0716 F088847E 800A5788 .W..-Ç.Þ....ÒEEEE.á^......'..^Ç... 000040
AC7E8008 C4830892 07A19A08 7803879A 0C88080EC 83087306 619A009E 1E800869 ¦.......•.•..&..É.ñ.x..À....á..-¯ 000060
26070326 C85EC408 82046E9A 089701FA 9AAC5E80 1FA5A5A5 A5DA8E1E 0716F088 .Þ....ÒEEEE..^¯.•....n.ý.á^à&..& 000080
009E1E80 08C3060A 9A845E80 088A0288 9A045F80 145EC4CE 5689CC46 89025713 .W..Fä.Vöá^..........¤..^Ç...ù..... 0000A0
8E1E0716 F088A47E 8008C483 08EC07A1 9A080203 879ADC88 08EC8308 CD06619A .•.ë..&..É.ñ.B..À.&..á..-É.Þ.... 0000C0
C8030677 8826044F 8826C85E C4078E04 6E9A08F1 01FA9AA4 5E801FA5 A5A5A50A ÒEEEE..^É.•.Þ..n./.á^à&.O.&.W..à 0000E0
8E1E0716 F088A47E 800A5788 26084703 2603E0C1 0E478826 02768900 4E89F213 .·.NÀ.v•&.G.èÀ.&.G.&.W..-É.Þ.... 000100
06619A00 9E1E8D09 40060A9A A45E8D09 3702889A 085F8D14 5EC41FA5 A5A5A50A ÒEEEE.á^.......7..^É...ä......•. 000120
A5A50A8E 1E0716F0 88AC7E80 08C48309 6907A19A 094F03B7 9ADC8808 EC83094A J..&..É.ñ.Ö..À.¡..á..-¯.Þ....ÒEE 000140
D65689D4 46890257 13260703 26C85EC4 0989046E 9A096E01 FA9AAC5E 801FA5A5 EE..^¯.•.n..n...á^à&..&.W..Fà.V• 000160
8808EC83 09A40661 9A009E1E 8D099A06 0A9AA45E 80099102 889A0C5F 80145EC4 á^..-.........^É..........•.É..&.. 000180
9C5E801F A5A5A5A5 DA8E1E07 16F0889C 7E8008C4 8309C307 A19A09A9 03879ADC É.ñ.¯..À.û..á..-..Þ....ÒEEEE..^. 0001A0
880A7689 D84E89F2 13F80306 77882604 4F8826C8 5EC40858 046E9A09 C801FA9A .•.à..n.X.á^à&.O.&.w..à..NÀ.vÖ. 0001C0
E04689D2 5688D046 88E65689 E44689D6 5688D446 88DE5689 DC4689CE 5688CC46 Fä.Vö.FÉ.VB.Fà.V•.FÖ.V¦.FÀ.V•.FÀ 0001E0
```

```
Dump of file SATURN:[PCCOMMON.DUMP.DLL]DGM.TMP;1 on 18-APR-1990 10:44:12.07
File ID (620,6,0)   End of file block 186 / Allocated 188

Virtual block number 150 (00000096), 512 (0200) bytes

 889C7E80 0A578826 08470326 03E0C10E 478826EA 5689E846 89D688C1 88E25689 .Vã.ê.ø.FÒ.VõÆ.G.éÅ.Æ.G.Æ.W..-.. 000000
 9A0D9E1E 8D0A4206 0A9A9C5E 800A3902 889A0A5E C41FA5A5 A5A5DA8E 1E0716F0 Þ....ÖEEEE.é^....9..^....8...... 000020
 DA8E1E07 16F088AC 7E8DJ8C4 830A6807 A19A0A51 03B79ADC 8808EC83 0A4C0661 ø.L..Ä..Ê.ñ.Q..Å.k..é..-¯.Þ....Ö 000040
 89F44689 0257132? 070326C8 5EC40A88 046E9A0A 7001FA9A AC5E8D1F A5A? ?A5 EEEE..^¯.ª.p..n...é^àÆ..Æ.W..F¶. 000060
 EC830AA6 06619A0D 9E1E8D0A 9C060A9A 9C5E8D0A 9302889A 045F8D0A 5EC4F? ?6 V-é^.._.......^...........ø.!..Æ 000080
 8D1FA5A5 A5A5DA8E 1E0716F0 88947E8D 08C4830A C507A19A 0AAB03B7 9ADC88?? ..Ê.ñ."..Å.é..é..-..Þ....ÖEEEE.. 0000A0
 7689FB4E 89F213C8 03067788 26044F88 26C85EC4 092F046E 9A0ACA01 FA9A945E ^..ª.ò..n./.é^àÆ.O.Æ.w..à.·.N%.v 0000C0
 77FF26EC 5EC42076 FF2276FF FC76FFFE 76FF000A B7FF2600 DCB7FF26 F05EC4FA ªé^ÞÆ.ñÉ.Æ.ñÖ..v±.v=.v".v é^ßÆ.w 0000E0
 260877FF 26F05EC4 C276FFBC 76FF3877 FF263677 FF264277 FF265016 DC468044 D.FÉ.PÆ.wBÆ.w6Æ.wB.v¥.vÖé^ÞÆ.w.Æ 000100
 5F5E1F00 EBC02804 E88AE088 0574C008 C0468900 00FFFF9A 5016F446 8D0677FF .w..F¶.P......Fé.ât.¡Å.Š.+éŠ..^ 000120
 478826E8 5EC4EA56 89E84689 1C56881A 4688D88E 0691881E 000028C8 0026CAC9 èðÆ.à(...¡...Å.F..V..FÒ.Võé^ÒÆ.Ĝ 000140
 4688DC76 FF0095E9 0374C008 0000FFFF 9A501608 46801276 FF1476FF DC468904 ..FÉ.v..v..FÅ.P......ât.Ö...vÉ.F 000160
 4680E476 FFE676FF 1276FF14 76FF7E75 C0080000 03CF9A50 16E4468D 50529908 Å.RP.Fð.P.ü....âu-.v..v..vÌ.vð.F 000180
 5075C008 0000FFFF 9A5016EC 46801276 FF1476FF 6475C008 0000FFFF 9A501608 Å.P......âud.v..v..FÌ.P......âuP 0001A0
 9A5016DE 46801276 FF1476FF 3C75C008 0000FFFF 9A5016E0 46801276 FF1476FF .v..v..FÅ.P......âu<.v..v..F8.P. 0001C0
 FF1476FF 1475C008 0000FFFF 9A5016E2 46801276 FF1476FF 2875C008 0000FFFF .....âu(.v..v..Fâ.P......âu..v.. 0001E0

Dump of file SATURN:[PCCOMMON.DUMP.DLL]DGM.TMP;1 on 18-APR-1990 10:44:12.07
File ID (620,6,0)   End of file block 186 / Allocated 188

Virtual block number 151 (00000097), 512 (0200) bytes

 76FF1876 FF1A76FF 1C76FF70 E88AD188 0574C008 0000FFFF 9A5016F0 46801276 v..FÞ.P......ât.¡Ì.Šp.v..v..v..v 000000
 76FF1076 FFE076FF 5016F046 8DE76FF? E276FFEC 76FFEE76 FFE476FF E676FF16 ..vÌ.vð.v¥.vâ.vã.v8.FÞ.P.vÅ.v..v 000020
 1276FF14 76FF28E8 0274C008 DA4689FA 38E80E06 76FF0876 FF0A76FF 0C76FF0E ..v..v..v..v..Ö8ª.FÖ.ât.Š+.v..v. 000040
 E88AD388 0574C008 000004AE 9AE476FF E676FFDC 76FF0000 FFFF9A50 16F0468D .FÞ.P......vÉ.vÌ.vð.Ú....ât.¡Æ.Š 000060
 9A5016EC 46800676 FF0876FF D88E0B4A B81E0000 1CC80018 CAC91F00 EBC02804 .+âŠ..èð..à....¡J..Å.v..v..Fâ.P. 000080
 FF0876FF 3C75C008 00000BCC 9A5016E8 46800676 FF0876FF 5075C008 00000888 ¡....âuP.v..v..FÒ.P.ö....âu<.v.. 0000A0
 000008F4 9A5016EA 46800676 FF0876FF 2875C008 000008E0 9A5016E6 46800676 v..FÌ.P.Å....âu(.v..v..Fð.P.¶... 0000C0
 0C76FF38 E88AD188 0574C008 00000C08 9A5016F0 46800676 FF0876FF 1475C008 .âu..v..v..FÞ.P......ât.¡Ì.Š;.v. 0000E0
 C008E446 890022E8 0EE876FF 5016F046 8DE676FF EA76FFEC 76FFEE76 FF0A76FF .v..v¥.vâ.vð.vÌ.FÞ.P.vÒ.Ö"..Fð.Æ 000100
 0054C800 08CAC91F 00E8C028 00000C66 9A5016F0 46800676 FF0876FF 14E80274 t.Š..v..v..FÞ.P.f...+âŠ..èð..âT. 000120
 97882600 9C878826 FC5EC4FE 5689FC46 89165688 14468808 8E0C9088 1E565700 .WV.¡...Å.F..V..F=.V±é^=Æ....Æ.. 000140
 0A76FF03 15E98AE0 88067500 047F8326 F85EC400 010246C7 FA5689F8 4689009E ...F%.VªúF8..é^%Æ....u.¡Å.Ö...v. 000160
 104688F8 5EC402F8 E90374C0 08004689 08C483F7 35E80E10 76FF1276 FF0876FF .v..v..v..Ö5%.é..FÅ.ât.Ö%.é^%.F. 000180
 C4384789 260C4688 F85EC436 4789260E 4688F85E C4245789 26224789 26125688 .V.Æ.G"Æ.W$é^%.F.Æ.Gôé^%.F.Æ.G8é 0001A0
 5EC40C57 89260A47 8926F85E C4025788 26078826 085EC442 47892606 4688F85E ^%.F.Æ.G8é^.Æ..Æ.W.é^%Æ.G.Æ.W.é^ 0001C0
 E4468900 4205FE56 88FC4688 10578926 0E478926 F85EC406 57882604 47882608 .Æ.G.Æ.W.é^%Æ.G.Æ.W..F=.V±.8..Fð 0001E0

Dump of file SATURN:[PCCOMMON.DUMP.DLL]DGM.TMP;1 on 18-APR-1990 10:44:12.07
File ID (620,6,0)   End of file block 186 / Allocated 188

Virtual block number 152 (00000098), 512 (0200) bytes

 02879A10 5E8D0E20 01FE9A18 8D0874C4 26F08803 E3C10E5F 8826E45E C4E65689 .VÌé^ðÆ._.èÐ..ÞÆét....±. ..^.... 000000
 830E5707 A19A0E30 03B79ADC 8808EC83 0E380661 9A0D9E1E 8D0E2E06 8A9A0E25 %..........ø.8..Ä..Ê.ñ.=..Å.W.. 000020
 89990A31 046E9A0E 5C01FA9A C45E8D1F A5A5A5A5 DA8E1E07 16F088C4 7E8D08C4 é..~é.Þ....ÖEEEE..^é.ª.\..n.1... 000040
 478826E4 5EC40000 CE46C700 01CC46C7 0A730001 30057C11 7FD208CE 5689CC46 Fä.Vö.8..|.=..s.úFÄ..úFö..é^ðÆ.G 000060
 889A085E C41FA5A5 A5A5DA8E 1E0716F0 88C47E8D 0A578826 08470326 03E0C10E .éÅ.Æ.G.Æ.W..-é.Þ....ÖEEEE.é^... 000080
 A19A0EC1 03B79ADC 8808EC83 0E8C0661 9A0D9E1E 8D0E8206 0A9AC45E 8D0EA902 .'..^é...ý......ø.¥..Ä..Ê.ñ.è..Å 0000A0
 046E9A0E E001FA9A 8C5E8D1F A5A5A5A5 DA8E1E07 16F088BC 7E8D08C4 830E0807 .Ù..é..-¥.Þ....ÖEEEE..^¥.ª.Å..n. 0000C0
 C45E8D0F 0302889A 045F8D08 5EC40656 89044689 02571326 070326E4 5EC40EF8 «.é^ðÆ..Æ.W..Fâ.Vøé^.._.......^é 0000E0
 08C4830F 3507A19A 0F18038? 9A0C8808 EC830F16 06619A00 9E1E8D0F 0C060A9A .........ø....Ä..Ê.ñ¯...Å.S..é. 000100
 26E45EC4 0E18046E 9A0F3A01 FA9A845E 8D1FA5A5 A5A5DA8E 1E0716F0 88847E8D .-Ç.Þ....ÖEEEE..^Ç.ª.:..n...é^ðÆ 000120
 0A578826 08470326 03E0C10E 478826DA 7689D84E 89F213C8 03067788 26044F88 .O.Æ.w..à.·.NÄ.vÖÆ.G.éÅ.Æ.G.Æ.W. 000140
 060A9A84 5E8D0F80 02889A08 5F8D085E C41FA5A5 A5A5DA8E 1E0716F0 88847E8D .-Ç.Þ....ÖEEEE.é^.._.......^Ç... 000160
 8C7E8D08 C4830F82 07A19A0F 9803879A DC8808EC 830F9306 619A0D9E 1E8D0F89 .......ø....Ä..Ê.ñ¯...Å.ý..é..-¥ 000180
 26070326 E45EC40F ?2046E9A 0F8701FA 9A8C5E8D 1FA5A5A5 A5DA8E1E 0716F088 .Þ....ÖEEEE..^¥.ª.ñ..n.8.é^ðÆ..Æ 0001A0
 0D9E1E8D 0FE3060A ?845E8D 0FDA0288 9A0C5F8D 085EC4DE 5689DC46 89025713 .W..FÉ.V8é^.._....Ö..^Ç...D..... 0001C0
 8E1E0716 F088AC7E 8D08C483 100C07A1 9A0FF203 879ADC88 08EC830F ED06619A .ø.Ú..Ä..Ê.ñ¯..Å....é..-¯.Þ.... 0001E0
```

Dump of file SATURN:[PCCOMMON.DUMP.DLL]DGM.TMP;1 on 18-APR-1990 10:44:12.07
File ID (620,6,0) End of file block 186 / Allocated 188

Virtual block number 153 (00000099), 512 (0200) bytes

```
C8030677 8826044F 8826E45E C40EA104 6E9A1011 01FA9AAC 5E8D1FA5 A5A5A5DA ÐEEEE..^¯.*....n.Å.6^0&.O.&.w..à 000000
F25689F0 46890E56 880C4688 EA5689E8 46890656 88044688 E27689E0 4E89F213 .·.NÅ.vã.Fâ.V●.FÖ.Võ.FÉ.V8.Fþ.V· 000020
FF26000C 87FF26FC 5EC4F656 89F44689 0688C188 EE5689EC 46890A56 88084688 .FÅ.VÖ.F$.VŸ.ê.ø.F¶.V-á^●&.ñÉ.&. 000040
FFFF9A02 76FFCC76 FF3877FF 263677FF 264277FF 26F85EC4 5016E846 8D000A87 ñÖ..FÒ.Pá^½&.w8&.w6&.w8.vü.v●... 000060
45881E00 000CC800 12CAC95F 5E1F00E8 C02804E8 8AE08805 74C00800 46890000 ...FÅ.åt.¡Å.Š.+àŠ.._èò..à....¡E 000080
89F84689 009E9788 26009C87 8826FC5E C4FE5689 FC46890C 56880A46 88088E0D ..Ä.F..V..F=.V±6^●&.¯...&.....F½. 0000A0
4680000A 87FF2600 0C87FF26 FC5EC423 E88AE088 05750004 7F8326F8 5EC4FA56 V*6^½&....u.¡Å.$#6^●&.ñÉ.&.ñÖ..F 0000C0
08290203 00169000 08CAC91F 078926F6 4680065E C4F44689 00000383 9A5016F6 -.P.*....F¶6^..F-&...èò.......). 0000E0
010F0203 000F0006 03F20203 03CE0007 00300203 00000001 043C0002 00020006 ..●...<.......0...ö...·...Ô..... 000100
10E40203 04690007 042A0203 00EA0006 107E0203 03E10007 0CA00203 05C9000A ..è.......Ä...−...õ...*...í...ð. 000120
109F0002 00000000 0F780002 00860005 088A0203 03F40007 0C840203 00F90006 ..*...Ç...¶...........x......... 000140
078C0203 010F0006 05010203 04050007 0CDC0203 00930005 0C740203 0000000E ......t.......É.......ì......... 000160
0CF00203 04300007 08A40203 00370004 02870203 041A0007 0CC80203 00A10005 ..À...à.......ñ...7...£...0...Þ. 000180
00000000 00000000 00000000 00000000 00000000 04420007 08700203 03890007 ..¿...p..'.B..................... 0001A0
FF335356 57EC8855 00C85DFA 88914901 F7AEF2FF FF89C033 067EC4D7 88EC8855 U.Ì.●6~.3à¿...Ú¼ÌÌ..ª]ù.U.ÌWVS3. 0001C0
47117DC0 080C4688 06568V08 46890000 100AF708 F7065688 47117DC0 08084688 .F..â).G.V.ŘÅŘÖ....F..V..F..â).G 0001E0
```

Dump of file SATURN:[PCCOMMON.DUMP.DLL]DGM.TMP;1 on 18-APR-1990 10:44: .07
File ID (620,6,0) End of file block 186 / Allocated 188

Virtual block number 154 (0000009A), 512 (0200) bytes

```
0888F1F7 D2330846 880A4E88 1575C008 0A56890C 46890000 1DDAF7D8 F70A5688 .V.ŘÅŘÖ....F..V..åu..N..F.3●½þ.Å 000000
F475D808 D801EAD1 D9D1E801 06468808 56880A4E 88088838 E8D388F1 F7064688 .F.½þ.ŘŠ8.Å.N..V..F.ÌŠÌÌÌðÌÅ.ÙW¶ 000020
D2334E01 76064638 06720777 0856380C 720103E6 F70A4688 910C66F7 F088F1F7 ½þ.þŘf...F.ŘÌ.Ìr.;V.w.r.;F.v.N3● 000040
88D8080C 5E880846 88EC8855 0008CA5D E5885F5E 58000A83 D8F7DAF7 07754F96 .Ou.ŘÔŘÅ.Ö.[^_.Ì]ò..U.&.F..^..Å. 000060
E3F70646 88C8030C 66F70646 88C888E3 F70008CA 5DE588E3 F7064688 08750A5E ^.u..F.ŘD.Ì]ò¯..ŘD.à.F.Řf..à.F.ŘD 000080
0010DAF7 D8F70656 88471170 C0080846 88FF3357 53EC8855 0008CA5D E588D103 .Ì.Ì]ò..U.&SW3..F..â).G.V.ŘÅŘÖ.. 0000A0
C0080A56 890C4689 0000100A F7D8F70A 5688107D C0080C46 88065689 08468900 ..F..V..F..â)..V.ŘÅŘÖ....F..V..à 0000C0
880A4E88 D88848E8 43794FD2 33C288F1 F7064688 F1F70233 0846880A 4E881875 u..N..F.3●½þ.F.½þ.ò3●0yCŠH.Å.N.. 0000E0
0C720103 0A66F791 0C66F7C8 88F1F7F4 75D808D8 D1EAD109 D1E8D106 46880856 V..F.ÌŠÌÌÌðÌÅ.ÙW¶½þ.àŘf..Řf..Ìr. 000100
830BF7DA F707794F 08561806 46280C56 180A4628 06760646 38087207 77085638 ;V.w.r.;F.v.+F..V.+F..V.Oy.ŘÔŘÅ. 000120
D08CCB5E 5FA5F300 0A890186 BF01368E C08ED88C 57560008 CA5DE588 585F000A Ö._[.Ì]ò..VW.Å.å/6.e..¿..µE_^ù.Å 000140
16E8F388 D98EA5A5 FC088EC1 8ED98CC0 8CF8880C C38303F6 1E88F388 5756C08E .åV̄W.µ..−..û..«.à.].ê.Å●EE.T̄.µŠ. 000160
03F61E89 4E7403E2 F881F388 A5A5FCC1 8ED98CF8 880CC383 03F61E88 F3885756 VW.µ..−..û..«.].ê●EE.µ.«ã.tN..−. 000180
8ED98CC0 8CF8880C C38303F6 1E88F388 5756C08E D08CC85E 5F03FE47 C6FC7789 .w●6G±._^ù.Å.åVW.µ..−..û .«.à.]. 0001A0
FCC18ED9 8CF8880C C38303F6 1E88F388 575618E8 F388098E A5A5A5A5 FCD88EC1 ê.Ä●EEEE.].µŠ.VW.µ..−..û..«.].ê● 0001C0
8C575605 E9E9C85E 5FFC7789 07FE47C6 03F61E89 0E7403E2 F881F388 A5A5A5A5 EEEE.µ.«ã.t...−.6G±..w●_^ùÙÖ.VW. 0001E0
```

Dump of file SATURN:[PCCOMMON.DUMP.DLL]DGM.TMP;1 on 18-APR-1990 10:44:12.07
File ID (620,6,0) End of file block 186 / Allocated 188

Virtual block number 155 (0000009B), 512 (0200) bytes

```
3CA5A5FE 4588ADF8 880CC383 03F61E88 F388FCD8 8EC18ED9 8CD88C57 5604E800 ÅŠ.VW.Å.].ê.Å●.µ..−..û..●Û.E±EE< 000000
88260788 26C08ED0 8CC85E5F D98EFC5F 8903F61E 89CF7403 E2F881A5 A5027403 .t.EE.«ã.tü..−.._●.]_^ù.Å.åå..&. 000020
C78AD088 DA885756 99078803 E802578B 07880AE8 99078826 C08ED08C 14E80257 W.Š..Å.åå...Š...W.Š....VW.Ö.Å.ú 000040
8CFC7D89 03F63E89 1C7403E2 FF810CC7 8303F63E 88000883 DAF7D8F7 07798024 $.y.ŘÙŘÖ.Ù..>−..ú...å.t..>−..)●. 000060
88876080 5507FE45 C6FF63E9 C85E5F08 0AE89E84 03FE45C6 0F7500FF 80C18E09 ].ê...u.6E±.Ç.Ò.._^ùÕc.6E±.U§'.. 000080
810CC783 FE458AFC 758803F6 3E88C08E D88C5756 C85E5F50 0E69E8FB 880833C8 ù3Ú.«Òi.]_^ùVW.Å.Š.>−..u●.E±.ú.. 0000A0
F63E8857 56C85E5F A5A50274 033CA5A5 FCFE4588 FC7D8903 F63E8981 7403E2FF .ã.tŸ.>−..)●.E±●EE<.t.EE_^ùVW.>− 0000C0
5E5FA8A8 FCC033C0 8ED88C03 FE45C6FC 7D8903F6 3E898C74 03E2FF81 0CC78303 ..ú...å.t..>−..)●6E±..Å.Š3å●¨ ¨ ^ 0000E0
8ED88C02 E8008C11 E80C03F6 068303F6 1E88FCF8 885756C0 8ED88C02 E8008CC8 ù.ÅŠ..Å.åVW.«●..−...−..Š..ÅŠ..Ī. 000100
268955C8 5E5F0C03 F62E83A5 A5FC7788 007503FE 7F8003F6 1E88FCF8 885756C0 åVW.«●..−...±.u..w●EE..−.._^ùW.& 000120
03F61E88 FCF88857 56C08ED8 8C02E8D0 8CE4E850 0E885F05 2CE857FC 778801A8 ´..w●WÒ,._.8]Š8.ÅŠ..Å.åVW.ã●..−. 000140
77880F75 07FE7F80 03F61E88 FCF88857 56C08ED8 8C02E800 8C11E80C 03F60683 ..−..Š..ÅŠ..Å.åVW.«●..−...±.u..w 000160
C08ED88C 02E8D08C E9E8DF87 F7881B6E E8DF87CB 5E5F0C03 F62E83A5 A5A5A5FC ●EEEE..−.._^ù.Òòn..Ř.ÓŠÖ.ÅŠ..Å.å 000180
8803F61E 88F88857 56C08ED8 8C02E8D0 8C10E80C 03F60683 03F61E88 F8885756 VW.«..−...¯..Š..ÅŠ..Å.åVW.«..−.. 0001A0
0F8850E8 09888A09 8188C85E 5FA5A502 74033CA5 A5A8FC0C 03F62E83 FE478AF3 µ.G±..−..● EE<.t.EE_^ù¡Ÿ.oE.ŠP¡Ô 0001C0
C2E89010 E805C3E8 36E8044E 8A044888 01662688 9FFFFF04 A79A48E8 09E48A09 .oð.ŠH.Ī.....&f.¡H.ōN.ŠóÒù.Š..Òô 0001E0
```

```
Dump of file SATURN:[PCCOMMON.DUMP.DLL]DGM.TMP;1 on 18-APR-1990 10:44:12.07
File ID (620,6,0)   End of file block 186 / Allocated 188

Virtual block number 156 (0000009C), 512 (0200) bytes

A79AC30A F700D283 08F70773 589E0166 268A5005 05E89004 EB0610E8 900AE805 .$..Ò..$..Ò!.P.&f..Xs.XÀ.@.XÕü.! 000000
36890CEE 8303F636 bd515301 A8268955 5756045A 8A0454B8 01662688 9F043904 .9...&f.¡T.¤Z.VWU.&´.S0.6-..Ÿ..6 000020
32FE5D8A 03F63E88 57CB5E5F 5D5859D2 FF02E800 FF047508 7488030A 7C8003F6 -..|...t.u..ÀŠ..0Y()_^ìW.>-..]±2 000040
08037555F 8001F6F7 7480FF41 F6CB5F08 75F0FF41 F6087403 F8801375 7F01F6FF .-..u..«.t.-A.Þu._û-Ã..t%-.._u.. 000060
38FC7588 FE5D8A03 F63E8857 56CB5F7F 2180FF32 FE5D8A03 F63E8857 C8F9CBE4 ðü°ìW.>-..]±2..!._ûVW.>-..]±.u•; 000080
5E5FA880 F480AD08 7503F880 A5FCC18E D98CFC7D 89CB5E5F 803180FF 320875F7 %u.2..1._^ù.)•.!.ê•E.«.u.Ù.¶.¨_^ 0000A0
0888F388 575604E8 19FAE857 5602E8C0 8ED08C57 56CB5E5F A880F480 ADA5A5C8 ûÈÈÙ.¶.¯¯^ûVW.Å.àŠ.VWÒ°.$.VW.µ|. 0000C0
8ED08C57 565EE800 0488F388 575604E8 19E2E857 5602E8C0 8ED08C57 5676E800 .$vVW.Å.ÅŠ.VWÒã.$.VW.µ|..$^VW.Å. 0000E0
19B2E857 5602E8C0 8E008C57 5646E800 0C88F388 575604E8 19CAE857 5602E8C0 àŠ.VWÒò.$.VW.µ|..$FVW.Å.àŠ.VWÒý. 000100
10B8F388 575604E8 199AE857 5602E8C0 8ED08C57 562EE800 1488F388 575604E8 $.VW.µ|..$.VW.Å.àŠ.VWÒ..$.VW.µ|. 000120
8C03F63E 88D88800 0088F388 575604E8 1982E857 5602E8C0 8ED08C57 5616E800 .$.VW.Å.àŠ.VWÒ..$.VW.µ|...Å.>-.. 000140
E80278BF 02C383CB 5E5F5001 4A97FF01 A8268955 FC7D8710 7407FE7D 80C18ED9 ).ê.)±.t..)•U.&´...J.]_^ù.ù.«x.Ò 000160
000A88F3 88575604 E81951E8 575602E8 C08ED08C 5756DFE8 03F63E88 F7881980 ...%.>-.$ÒVW.Å.àŠ.VWÒÒ¯$.VW.µ|.. 000180
C08ED08C 57565EE8 000688F3 88575604 E81939E8 575602E8 C08ED08C 575676E8 $vVW.Å.àŠ.VWÒ9.$.VW.µ|..$^VW.Å.à 0001A0
E81909E8 575602E8 C08ED08C 575646E8 000E88F3 88575604 E81921E8 575602E8 $.VWÒ!.$.VW.µ|..$FVW.Å.àŠ.VWÒ..$ 0001C0
001288F3 88575604 E818F1E8 575602E8 C08ED08C 57562EE8 001688F3 88575604 .VW.µ|..$.VW.Å.àŠ.VWÒþ.$.VW.µ|.. 0001E0

Dump of file SATURN:[PCCOMMON.DUMP.DLL]DGM.TMP;1 on 18-APR-1990 10:44:12.07
File ID (620,6,0)   End of file block 186 / Allocated 188

Virtual block number 157 (0000009D), 512 (0200) bytes

D98C03F6 3E880888 000288F3 88575604 E818D9E8 575602E8 C08ED08C 575616E8 $.VW.Å.àŠ.VWÒ1.$.VW.µ|...Å.>-..) 000000
8817E800 0C881CE8 00088821 E800488B FF39E95E 18D4E856 057407FE 7D80C18E .ê.)±.t.VÒÅ.^Ò9.£..$!£..$.£..$.£ 000020
07FE7D80 03F63E88 57560018 8803E800 1C8808E8 00008800 E800148B 12E80010 ..$.£..$.£..$.£..$.£..VW.>-..)±. 000040
731CF883 087D88FC 7D89FC75 88C08ED8 8C03F63E 890CEF83 287407F2 7D803974 t9.)·.t•.ÿ..>-..Ä.å.u•.)•.)..«.s 000060
7D8002C3 83CDE818 67E802C3 83CB5E5F 5D014A97 FF01A826 89553E73 18F8832F /.«.s>U.&´...J.]_^ù.ù.Òg.¸ˆ.ù..) 000080
014697FF 01A82689 550C03F6 2E83F787 8FE81852 E803F63E 890CEF83 C47407F2 ·.tå.ÿ..>-.ÒR.$«.%..-..U.&´...F. 0000A0
9E5E5FE0 0AE4D0E8 D1410025 9F5D014A 97FF01A8 2689550C 03F62E83 C85E5F5D ]_^ù..-..U.&´...J.].X.A1ÒÅ6.Å_^. 0000C0
8B4E4E03 F6368BFC C08ED08C 5756000C 8803E8FF 320F02E7 D0F88AE3 D0E300C8 ùÄDÀD.«ÀÒ.Ò2.$.£..VW.Ä.å•.6-.ÑN. 0000E0
7D8003F6 3E885756 EC88F5C8 5E5FF4E2 47471088 FE448905 87AD0005 89F828FE ±•«¿..Ù...D±..GGå¶_^ìW.$VW.>-..) 000100
880E53E9 17EEBA01 6F880E5C E916D18A 016988C8 5DE5885E 5F17D9E8 0374°7FE ±.t.Ò1._^.[)ùÈ[.¤I.Ò\.£o.¤Ÿ.ÒS.£ 000120
5DE5885E 5F001BE8 C0325756 EC88550E 41E9178F 8A017988 0E4AE917 D58A0.°4 t.¤[.ÒJ¯£y.¤..ÒA.U.$VW2àÒ.._^.[) 000140
3603F88F 06768D07 1EFCC850 E5885E5F 8003FF36 800008E8 80805756 EC8855L' ìU.$VW¯.Ò...6..._^.[)ù•...v.«%.6 000160
0744F603 40E85503 F6368903 F88E03F6 36FFFF44 3036FF45 30A536A5 36A536A5 E6E6E6E0E.600..6¯./%..6-.Uòa.-0. 000180
8F5D07FD E8017E8F 067403F8 8EC08ED8 8E5804BF E81E0716 067E8D55 5D187980 .y.]U.-....Ò«.X.Ä.â/%.t.«-.Ò».]. 0001A0
01A406C7 12E88380 333001A4 06C71CE8 84803430 01A406C7 00C30A8C 9603F606 .-...Òù.ú.Ê.04¯.$.ú.Ê.03¯.$.ú.Ê. 0001C0
A406C706 758C3C02 741EFF04 74000276 3E838A80 303101A4 06C708E8 81803130 01¯.$.ú.Ê.10¯..>v..t...t.<.u.ú.Ê 0001E0

Dump of file SATURN:[PCCOMMON.DUMP.DLL]DGM.TMP;1 on 18-APR-1990 10:44:12.07
File ID (620,6,0)   End of file block 186 / Allocated 188

Virtual block number 158 (0000009E), 512 (0200) bytes

A6A10863 20E89A50 00FD8808 5823809A 01A08804 71208E9A 01A6A3E4 2A323101 .12*ðÈ!... q.£....#[.¡».P.Ò c.À! 000000
C0330254 880C88FC 03F63E88 C3087820 349A01A6 36FF086C 20E89A50 FFE40501 ..ð.P.Ò |..6|..4 x.ú.>-.=...T.3à 000020
C73800C2 818FE680 D8D1D901 FAD1D801 D9D1FAD1 D8D1D901 FAD12974 7F80C2F7 Xð..t)!°!!!À!°!!!À!°!!!À.!..ð.8ú 000040
C80AADC8 88ADFC03 F63E88EA E8D08AC8 88C3F788 06558904 4D890245 89000005 ....£..M..U..Xú.à.ÀŠð.>-.=Ù.ÀÙ.à 000060
0A808101 CA800374 CD0AD301 E2D10301 E2D10301 E2D1F88A ADDC8AF0 8AAD048A .ÀÙ.Þ.ÉÙ.%!à!£!à!£!à!£.ët..ð.Ÿ.. 000080
C6F61572 0777D13A E001E001 E0013872 38002030 7747E030 7FF025E9 22EC8AF9 °.£"Ò%Þ.=ÀGw=-.ðr;!À!À!À:!w.r.-6 0000A0
4589E50A C70A7FE7 801674C0 0817747F 80300080 05087300 D38301C6 80107401 .t..6..£.s....=..t..àt..Ò..ú.!.E 0000C0
E8C38800 880A8802 33C3F788 02458905 89C033FE 08E9C3F7 880589C6 8AE38A02 ..0.6...%üÒU±3à...E..%û3@.Ò.À.ûŠ 0000E0
C48A000B 830AF70B F70779C0 08C38800 880A8811 E8DAF715 79020808 3300881D ..À3U.@y.%ÒŠ..Ò.À.û.ày.%Ù%Ò.Ù..à 000100
88DA8811 E809F715 79C908D8 33C88810 E8C388C8 88DA8802 330474E9 9E848024 $.Ç.Òt.30.Ò.à.ûŠ..à3U.èy.%!Š..Ò. 000120
E8003AE8 0785E985 60800233 FF338024 C48A000B 8309F708 F70779C0 08C388C8 à.ú.ày.%Ù%!.Ù..6$.3.30§'.Òç.Ò:.$ 000140
003EE800 E8009CE8 C3C80167 75000283 C0010026 E803E800 35E808E8 0028E800 .Ò+.$.ÒŠ.$.Ò&.!à.@.ug!àûÒ..$.Ò>. 000160
41E803E8 0078E808 E8002CE8 00E8002C E8C34E75 D2080039 E803E800 5DE808E8 $.Ò].$.Ò9..@uNûÒ,.$.Ò,.$.Ò(.$.ÒA 000180
56E8C3CA D1217500 0183C201 00018300 0283F508 F7D2F7D1 F70079FF 08C93300 .3è..y.%!K@%À%.@..!.!ò.!.u!!òûÒV 0001A0
E9FDE9E9 C3017200 0283C313 D813F581 F980CD0A E82201B5 D833001C E803E800 .$.Ò..3Üç."Ò.ë.°.%.Ù.û.@.r.ûÒÒ»Ò 0001C0
D1E9D1E9 D17FE580 10CE80F1 220FB6F9 8808EE83 91AD91AD 93ADD60A 92AD00A4 Ê.Ù..@Ù.Ù.Ù..Ÿ..°Ñ."þ.ö..!.!Ò!Ò! 0001E0
```

```
Dump of file SATURN:[PCCOMMON.DUMP.DLL]DGM.TMP;1 on 18-APR-1990 10:44:12.07
File ID (620,6,0)   End of file block 186 / Allocated 188

Virtual block number 159 (0000009F), 512 (0200) bytes

 8AADF88A ACDA8AD2 332FE825 E983CA7F 20F98378 7203FEE9 810874C9 0BE9D1E9 ÐlÕ.ètÄ.Õ±.rx.ª .ò.ÕX$/²9.Õ¯.¥Ú. 000000
 F9834772 7EE9804D 74C9080C 00F90100 E4007FE1 83F988E9 8A04EE83 C186ACC8 à¯.é.Y..Õ.ª.Ä.ÄÕÄl ªAÉ.èt. .Õ-rG.ª 000020
 E68AC48A F88ADF8A D30A01E2 80020OF5 01FA801A 7C08F980 D9F720E9 83997F20  ...Õ ¥l.ª.|..ª.¥Äø.ä..Æ.ü.%.á.| 000040
 CA8AF3E2 0002800A D00801D8 D1EED000 DA8001B2 01FA8015 E3E1E808 E980F632 2-.Õ.$ÄD..ª.ý..Õ.AÝlÄlÜAÕ.ø.ãµ.ò 000060
 0303F636 880131E8 07800068 E8F035E9 C30088C0 33000180 0081F9C3 C3880088 .Ä.ùü ªÝ..l.3á.AüÕS»Õh.¯.Õl..ó-.. 000080
 08E80380 0087E8FD 0FE9C3FE 88067C89 E0737FF0 FA817FE6 80D78810 EF83067C |..ÿ..ø.l..ªÞ.sA.|..±üÕ.»Õ..¯.Õ. 0000A0
 001EE8C3 FE88027C 890F737F 80FA817F E680D788 0080EF81 027C0303 F6368801 ..ó-..|..ÿ...ø.l..ª..sÕ.|..±üÕ.. 0000C0
 88FCC3FE 88027C01 0080EF81 03F63688 0053E8C3 FE88067C 0110EF83 03F63688 .ó-..ÿ..|..±üÕS..ó-..ÿ...|..±üø. 0000E0
 CA0A0FE1 83F98806 4C880010 8A03F636 88C08EA5 A5A5A5C1 8ED98CC0 8C03F63E >-..Ä.\.éEEEÉ.á.ó-.¤...L..ª.Ä..ò 000100
 3FE8D9F7 047D0433 E981E901 E901E901 E9D10035 887FE580 CF88F0E7 83064C89 .L..ÕÞ.ü.l.¡5.1ÕlÕlÕlÕ.Õ3.).¥l$? 000120
 E183F988 024C8800 808A03F6 3688C08E A5A5C18E D98CC08C 03F63E88 FC0082E9 Õ..ø.>-..á.\.éEE.á.ó-.¤...L..ª.Ä 000140
 3809F748 7D0096E9 81E032CD 8AE1D100 18887FE5 80CF8880 E783024C 89CA0A7F ..ò.L..Õ..ü.l.¡..lÄ.ë2Ú.Õ..)H%l; 000160
 147C08F9 800233EA 288000E5 81EF88C8 880A74C8 38FA0880 00E78114 7CEF88C8 à.ÿ|..Õ...ª;àt..à.ÿ.l..+õ3ø.ª.|. 000180
 EE8AD7C1 8A01AA88 0C33348A E7E84608 E9800004 C6140A00 02800082 F501FA80 .ª.¥ÿ..ø...ó...Õ.FSÕ.4D.E¨..èø.Ÿ 0001A0
 0ADE22D7 0AFAE207 D0EAD106 E3E18AEF 8A000188 C3348AD1 88C933C3 2C88E822 ªÕ.,ü3è.l.4üE...ÿ.ÄD.lõÄøãª.ø"8. 0001C0
 06E33488 F202CE28 C8C39803 F60E88E2 D3CC8AFD 88027400 DA8001B2 81FA8003 Æ.ª.ý..Õ.t..».ÄÆã..-...à+ó.¨.4D. 0001E0

Dump of file SATURN:[PCCOMMON.DUMP.DLL]DGM.TMP;1 on 18-APR-1990 10:44:12.07
File ID (620,6,0)   End of file block 186 / Allocated 188

Virtual block number 160 (000000A0), 512 (0200) bytes

 50882602 4488C3E4 D07FCC80 F8C8E9C3 F5D3014C 747F80C3 F7C3FAE2 00148046 F...àªüÄû..tLlÆ¥üÕà«.ä.Äõü.D.&.] 000000
 D10578EF 32EC8AD8 7403F77F 80C3F7D3 F7E27400 F77F80A9 00F7E174 7F80A902 .`..tÄ¥Ä`..¥ÄtäÆ¥Æ¥ü..¥ÆtÄ.&2ÿx[] 000020
 5E747FF0 C3F7C305 38260488 0575C338 DA8EC18E D98CC28C F7879308 73E001E3 DlÁs...¥.õ.\.é.Õ;üu...&;.ü¥üÞ.t^ 000040
 D0F77FF0 A900F7E1 747FF0A9 065D8826 064488C3 E4007FCC 80F875E9 C3F50301 lÆ¥üÕu«.ä.Äõü.D.&.].`Þ.tÄ¥Ä`Þ.¥Ä 000060
 8ED98CC2 8CF78793 0873E001 E3010578 EF32EC8A 087403F7 7FF0C3F7 D3F7E274 tä¥Æ¥üÞ.¥ÆtÄ.&2ÿx[lDlÁs...¥.õ.\. 000080
 87C30538 26048805 75024538 26024488 0E750445 38260444 881775C3 38DA8EC1 é.Õ;üu..D.&;E.u..D.&;E.u...&;.û. 0000A0
 81017488 FF7C8802 4C8880CF 80008235 8A015D88 02458803 E880F480 024588F7 ¥.E..¶.$..E..]..Sÿ..ü..L..|..t.. 0000C0
 DCF6E52A 91FA87F3 870573EC 3A5874E4 0A6574ED 0AC001C1 D18000CE 81FF00E7 Õ...ö..lèlà.Üte.Õt(:&s..µ.ª.ª|-É 0000E0
 D38801C8 80037402 08127C0E F98055E3 0085CD8A 910900E8 D0C9D049 7718FC80 .ø.wlÄèÄÕÄl..ëç.DU.ª.|..øt..ù..Æ 000100
 08E980FD 8ADF8AF3 8AD68A01 CE800374 D20A287E 05F9803E 741D7210 E98D0833 3U.Õ.r.t>.ª.-+.øt..ö..ø.µ.Õ.».Õ. 000120
 CA800374 3FC2F600 97E9E800 C1880788 DE8819E8 F875C1FE D301E201 23741777 w.tØlàlÆ±èu¥$..ß.ø.èÄÕÕ..-õ?t..ò 000140
 80C4FEDA 01080150 730E1307 031470E0 D020CA80 03743FC2 F6FAE20A D1E80120  l$lÕä*-õ?t..ò ÄÄp..ø.ßsPlÜlÕ±á. 000160
 800875D8 08D0F600 D383F50A F7D3F70A 730E8807 88F318FA 28FA41E9 4575FFFC ø.uÉÕAª+ª.µ.ø.ßs.¥Æ¥Õ¥.Æ.-Ä.Üu.. 000180
 FE0A78FF 0AD232F2 8ADE8AF8 8A5B7608 EC800F75 FF0A6474 D8080A87 6A7610EC &.vj.Õ.Ütd..u..&.v[.«.ß. 2ø..x.± 0001A0
 800F7401 C6F61472 077780FA 80017CE9 03740001 823E80F6 71D3D1E2 D14874CC àtKlàlÆq¬.>ÿ..t.Õ|..ª.w.r.-ó.t.. 0001C0
 3E88C70A 7FE78080 2417747F 80A90801 E0003A74 FFFC80C4 FE077300 D38301C6 ó..Æ.s.±á.ø.t:ÄÄlÄ`..t.$..Õ..ü.> 0001E0

Dump of file SATURN:[PCCOMMON.DUMP.DLL]DGM.TMP;1 on 18-APR-1990 10:44:12.07
File ID (620,6,0)   End of file block 186 / Allocated 188

Virtual block number 161 (000000A1), 512 (0200) bytes

 458903F6 3E88C033 017EE903 74000182 3E80C3F7 880589C6 8AE38A02 45896. 6 -..E..D.6...¥û.>ý..t.Õ-.3á.>-..E 000000
 0AD9D0E1 D1024D88 D674E40A D8D0E001 963488AD FCF990E9 E679C3F7 880589L  ....¥üÿlÕ.ª»Ü.4.lÄÄÄ.Õtø.M.lÄÄl. 000020
 EF8AFF32 50CD74FF FC8080C4 80D370E5 027FED80 80EC80C1 32088830 88C874EL Ùtù.».Ä2é.&..Ü..lpÆ.á..».tëP2..ÿ 000040
 F7C188FA 88000283 0803E7F7 C588509F C0080A88 E7F7C688 E88880C9 8080C880 .ù..è..$.ó¥Õ.Õ.á.P.é¥Õ.Ä.ø..ª.é¥ 000060
 E40AD301 E2010878 FF0A5893 D388C703 E1F6C588 01C88003 749E58FA 13D803E6 l.Ä.ªx.t..ù..é-Ä.ú.Æ.X..x.1ål£.õ 000080
 0AD800E0 D1024488 D900E1D1 024D88F7 87FF1AE9 AD74FFFC 80C4FEFF 69E90A75 u.Õl.±á.».tüÕ...¥.M.lÄÄl.D.lÄÄÄ. 0000A0
 78E90375 FFFC8080 C480FF78 E90371E5 2A7FED80 81EC80C1 320874E4 0A5C74ED Üt\.õtÜ2è.&..Ü.ª[q.Õ(..á..».u.Õx 0000C0
 248A0154 88500182 3E0209D1 E8010874 0001823E 8080CF80 C932208A 015D88FF ..]..-2è.ü..>ý..t.1$ll.>ý.P.T..$ 0000E0
 E9FF76E9 DD8801CA 800374D6 88C20800 11E8EE88 001AE808 D1EAD180 CE80C032 2á.õ.1õlÄÕ...ŸÕ...ó.øt..ò..lÕv.Õ 000100
 D313C103 4E077307 88FA1808 F7E1F7C6 88FA8815 E3C03396 F3F71D73 0338F880 ¬¾;Æs.¥µ.3áD..ª.ó¥Ä¥Ä.ª.øs.N.é.Æ 000120
 3A0EED80 0774ED0A 01842E8A 00018206 C6C3ED73 C1880003 C128FFFF 8EC3F973 ±ªü/..+è.Ä.ésÜüó.ý....Ç..Üt..Ü.: 000140
 06C7585B 5AFE4EE8 08320233 52535001 8503F606 C703F636 FF3874E4 0A3C77EC &w<.õtß.ó-.ú.-.ç.PSR3ø2ÜÕN±Z(Xú. 000160
 FF0182A2 02330833 C033FE33 E903F606 8F585B5A FE0FE8FF 32525350 018903F6 -.¿.PSR2.Õ.±Z(X..-.Õ3±3á3U3øÄý.. 000180
 F581066D 88F787D3 E80187A3 0185A3C0 33FE1AE8 52535001 8903F606 C703F636 6-.ú.-.¿.PSRÕ.±3áEç.Èñ.$Æ.¥.ø..¥ 0001A0
 6088C3FE 8803F636 88A8E60A 80E6807F E480ADA5 A5A503F6 3E88F788 1DE88000 ..$..¥.>-.EEEÜ.õ..|..|¨.6-..±ü.ø 0001C0
 C0080686 95F78709 77E838E0 E5830274 FFE025DA D0E0D1DE 00E5D106 4488FC06 .ø.D.1lÄßlÄÄÕXÄ.tø.lÄ;Õw..¥..ø.á 0001E0
```

```
Dump of file SATURN:[PCCOMMON.DUMP.DLL]DGM.TMP;1 on 18-APR-1990 10:44:12.07
File ID (620,6,0)   End of file block 186 / Allocated 188

Virtual block number 162 (000000A2), 512 (0200) bytes

8AACF888 E086C001 C001C001 57D001E2 D00001E6 D0897706 A03D08F7 C528C274 tô+ê%Á=..w¿Å11ÏÅã11W1ã1ã1ã.Å.%¯. 000000
8801C980 03740208 187C0EFF 836374FF 0810CC80 0FE480AD 93AD91AD 92C032E0 Å2à.Ù.Ù.Ù.Õ..ä...tc...|..@t..è.. 000020
F18AD68A 01CE8003 74D20A2B 7C06FF83 23724874 E77710EF 83C03308 88CB8801 1.ù.Ä3à.ÿ.wÓtHr#...|+.@t..ö..ø.þ 000040
16E8F575 47D0D101 D1D1D1E2 D123740F 7708EF83 E432C48A F88ADF8A E88ACD8A .ë.$.Õ.%.620.ÿ.w.t#1ã111Æ1ÃGu%$. 000060
20CA8003 743FC2F6 975ECF87 F6E20AD1 DFD1D8D1 E8D120CA 8003743F C2F6CF87 .ü-ô?t..ò 1Õ1Ù1Õ1Õã-.ü^.-ô?t..ò 000080
9E581000 CE810FFF E6810574 88509F50 035C1301 4C133402 D8D0E5D1 3870E5D1 1íþ;11ÅÅ.4.L..\.P.P.t..Î...ö..X. 0000A0
D10088E9 F6ECE903 75E0FD83 20C5830A D1D9D1D8 D1DFD113 742000C7 F7FE1358 X.±%ú. t.1Õ1Ù11Õ.é .»Åu.Õ$-Õ..1 0000C0
F6331373 FE1B9E10 00CE810F FFE6819F 05748803 5C1B014C 1B342AD0 F6D8D0E5 1ÅÅ-Å*4.L..\..t...Î...ö....$s.3- 0000E0
ED811375 E0C7F618 75FF0800 04BEFCFE 130E13CE 13F5DAF7 D1F7D3F7 D7F7D0F6 -Å%ø%Æ%1%Ö%.ö.ß.±=/....u.-úÅu..Ú 000100
E08A9727 760100ED 8118751F E0C7F7E4 E8D233CA 88D988F8 8830744E 40760200 ..vøNt=.=.).õ3@ŠÕ%úÅ.u..Ù..v'..Å 000120
D3D1D1D1 E2D17174 20ED8312 751000C7 F7970082 F28ACE8A E98ADD8A F88AC78A .ú.«.f.Õ.ö. ÿ..%ú..u..Ù tq1ã111Æ 000140
C6801A74 01C6F61F 72077780 FA800385 E9037400 01CA3E80 FC9065E8 E8E8D7D1 1ø$$$e.«.>ò..t.Õ...*.w.r.-ô.t..ô 000160
DE8703F6 3E88F788 3074E0F0 8320C583 08742000 C7F70007 83000383 00018301 ..1..Æ..ø.%ú. t..é .»ÅtO.%.>-..ß 000180
ABC688A8 C188AAC6 VA055088 064589C7 0AC508C0 32E08622 74EDD10F E7808024 $..Õ.1Üt".Å2à.é.ú.E..}..ô¨.è¨.ô¨ 0001A0
A8A8F788 03F63E88 L0330377 E9037400 01CA3E80 FCF5FDE9 0379C3F7 8805EF83 .ÿ..%ûy.Õ»%=.>ò..t.Õw.3à.>-..%¨¨ 0001C0
2DE1D1E0 D1D0747F F0E181D1 33064088 D8747FF0 25D08806 4488FCC3 FE88A8A8 ¨¨.±ú».D..Å%Þ.tÜ.M.31.Åþ.tÅ1Å1Å- 0001E0

Dump of file SATURN:[PCCOMMON.DUMP.DLL]DGM.TMP;1 on 18-APR-1990 10:44:12.07
File ID (620,6,0)   End of file block 186 / Allocated 188

Virtual block number 163 (000000A3), 512 (0200) bytes

5D01CA80 03740181 E8500801 E6008674 FFE03080 0005BC70 C1037FE0 E9818000 ...ÕÅ..èp¥...=Å tÑÅ11ÅPÒ..t..ò.] 000000
8874E0FD 8320C583 93E80A75 ED0807D1 03D10101 E2D10E75 1000C7F7 D8D0E5D1 11ÅÅ%ú..u.1ã111Æ1ø.Ùu.$..é .»Åt. 000020
E0019874 7FF025D0 33064488 EF747FF0 E181D188 064D88FC F787F58C E9FF24E9 Õ$.Õ.%.%=.M..1.Åþ.tÿ.D.3Å%þ.t.1Å 000040
ADC932E8 8AAC5008 D1E60098 74FFE030 80000598 70C1287F E0E98180 202DE1D1 1Å- ..ÕÅ.+êp....=Å.t.Å11ÅP¯.Õ2èÙ 000060
46A5A5AB 10CC800F E480A0FD 01C88F05 C683F788 509210CC 800FE480 AD92AD93 .Û.Û.Õ..ä..P.%.ô.¢à.»Ù.Õ..ë.¨ÈÉF 000080
ADEDD1AB 01CA2602 E8D1E888 ADF78801 C88FFD1F 740001CA 3E800005 C6FCA447 GÉ=ó...>ò..t.»¢à..%ú.Õ1Õ.ßò.¨1ÙÙ 0000A0
0037E857 0038E857 003FE809 D1D8D108 D1EAD158 FCABD8D1 ADABD8D1 ADABD8D1 1Å¨Ù1Å¨Ù1Å¨«X1õ1Å1Ù11Õ?.WÕ;.WÕ7. 0000C0
D8D1EFD1 08CA8003 7-07C2F6 01CA8003 745F5859 D788C208 C10BC308 0033E857 WÕ3..û.è.Õ.øY(_t..ò.-ô.t..ò.1ÿ1Ù 0000E0
730638FF 3301C836 88FF08E9 DAD10901 D8D1EFD1 DAD10901 D8D1EFD1 DAD10901 11Õ1ÿ1Ù11Õ1ÿ1Ù11Õ0...ôà.3.;øs 000100
01C4A150 F288E7F7 0474C008 01C2A1F5 88ED3397 52F6F738 77F03804 7502085C \.@u.;Þw;%-R.3Ù.%Åô..åt.%Õ. PÅé. 000120
D018CE18 DAF75A92 000283E8 03E7F708 74C00801 C6A1EA13 F003E7F7 0674C008 .åt.%Õ.Þ.õÅô..åt.%Õ.Õ.Ø..Z%Õ.ö.T 000140
0E284FC3 ED7301C8 161301C6 061301C4 1E1301C2 0E034F13 73939192 95E8185D ].Õ....ø.O..ô...é...ô...à.sÙÙO+. 000160
E4320644 8AC9E8F5 01C21688 C21301C6 1E1301C4 0E0301C6 061801C4 1E1801C2 ò...é...ô...á...ô..ò..ò.%$è.D.2ô 000180
E1F708E3 0D8B911A E30C88E8 88083301 C0A3100C 0F240645 8A018EA3 100C0F24 $...È/..E.$...Èà.3Ù.$..D....D.%Ã 0001A0
0815880E 74C00802 4488ED33 55DA13C8 03E2F706 74D20802 55880488 CA88E888 .Õ.ò...U..@t.%ã.à.ÕU3Ù.D..åt.... 0001C0
03E2F706 74D20802 55880074 C0080244 8850C108 58D5D1DA 13C803E2 F70874D2 @t.%ã.à.Õ1(X.èP.D..át..U..@t.%ã. 0001E0

Dump of file SATURN:[PCCOMMON.DUMP.DLL]DGM.TMP;1 on 18-APR-1990 10:44:12.07
File ID (620,6,0)   End of file block 186 / Allocated 188

Virtual block number 164 (000000A4), 512 (0200) bytes

74C00804 4488D1D1 EA130803 E2F70874 D2080455 880F74C0 08048BC9 33EA13D8 Ã.õ3è...åt..U..@t.%ã.Ã.õ11.D..åt 000000
E80301C0 26F70874 C008048B 50C30858 000183EA 130803E2 F7097402 0815880F ....@t.%ã.Ã.õ.1.X.ûP...åt.%&å..Õ 000020
08740208 0455880F 74C00802 4488D833 CA13E803 01BE26F7 0874C008 0588CA13 .ò...åt.%&/..Õ.õ3Ù.D..åt..U..@t. 000040
5500D383 CA13E803 E2F70974 D2080255 881074C0 08044488 D3D1CA13 E803E2F7 %ã.Õ.õ1Æ.D..åt..U..@t.%ã.Õ.õ.Æ.U 000060
DA13C803 D1C026F7 0874C008 0244880A 13C80301 8E26F708 74C00802 4588ED33 3Ú.E..åt.%&/..à.Õ.D..åt.%&å..à.Õ 000080
13080301 C026F704 4488D501 DA13C803 E2F70874 D2080455 881A74C0 08044488 .D..åt..U..@t.%ã.à.Õ11.D.%&å..Ã. 0000A0
D1D1D1E2 D15A97C5 0301C026 F601BEA0 EA130803 01BE26F7 0874C008 04458BEA õ.E..åt.%&/..Ã.õ./.-&å..é.Z1ã111 0000C0
01C83688 0001CA06 C6C3F608 5E07D1D3 D1D1D1E2 D107D1D3 D1D1D1E2 D107D1D3 Æ1ø1ã111Æ1ø1ã111Æ1ø^.-ûô.ò...ôù. 0000E0
57555352 515001CD 03F606C7 03F636FF 4C74ED08 5077F538 04C0EE81 0874F608 .-t..Ÿà.;%wP.Ùtl.ô-.ú.-.ð.PQRSUW 000100
F8D1E8FF 33575553 52515001 D503F606 C758595A 585D5FFC 3EE8D233 C9330833 3Ü3è3@ò>=_](ZYXú.-.f.PQRSUW3.Õ1« 000120
03F636FF 01CAA2FF 33ED3308 33D233C9 33C033F6 1AE903F6 068F5859 5A585D5F _](ZYX..-.Õ.•3è3è3@3Ù3Ù3.Åò..ô-. 000140
FC5756EC 8855C6E8 A8A8A8A8 C03301CD 8FF8F8E8 57555352 51500105 03F606C7 ü.-.f.PQRSUWÕ%«¢ë.3à¨¨¨¨¨¨$ôU.ßVW= 000160
01E48F06 7680071E FC5756EC 885508E8 A536A536 A536A536 01EC8F0E 7680071E ...v.¢$.6E6E6E6E$.U.ßVW•...v.¢ð. 000180
068F5850 D2FF5553 01F403F6 06C703F6 36FF01EC 8F01E48E A536A536 A536A536 6E6E6E6E/ð.¢$..ô-.ú.-.¶.SU.@][.. 0001A0
00020806 C601E21E 8C01F01E 89C88AC9 33C85DE5 885E5FDA 8C01F488 087203F6 -.r.)¶..Õ_^.]}û3è.à..Å...ã.ô.... 0001C0
A8A8A8A8 C0331874 033C0C74 073C1274 03FC8001 F48F0102 0806C605 75030230 «..u.ô....¢¶..•.t.<.t.<.t.3à¨¨¨¨¨¨ 0001E0
```

```
Dump of file SATURN:[PCCOMMON.DUMP.DLL]DGM.TMP;1 on 18-APR-1990 10:44:12.07
File ID (620,6,0)   End of file block 186 / Allocated 188

Virtual block number 165 (000000A5), 512 (0200) bytes

 1EF18801 DE0E89A5 A5A5A507 488E07E8 8001FB0E 80A5A5A5 A507488E 03B117E8 $.Ÿ./H.EEEE..«..$./H.EEEE..8..þ. 000000
 02720301 DE3E8307 7500020B 3E802180 9475C008 04C48308 8123E59A 50010E88 ¡8.P.!#...6..åu.¯|.>...u..>8..r. 000020
 23809A02 08881677 23809A4B 01E01E88 1874F60B 01FA8488 E6010400 A3982280 ¯".Ê..]].Ç°..-t...Å.K..#w.E....# 000040
 F8FE8BAB F30004B9 C033FE88 03F63688 C3F90501 88FF59E9 168020E8 9A5616A8 ´.V.Ó ¯.ÓY.¡..°ù.6-..±3â¿..µ¨.±½ 000060
 01548803 4C88055C 8A3FE020 D778FFF0 25E1747F F0A9F88A 06448807 6A8FFCC3 ü=¢j..D..½`Þ.tÅ%Þ.x¤-Å?.\..L..Ÿ. 000080
 D1E80100 10050974 10A880CF 80030101 01E20103 D1D1D1E2 D1030101 D1E20156 V1ã111Æ1ã111Æ1ã111Æ.Ü.´.t....1$1 0000A0
 0373EA03 57D880E3 F7AF8188 5236E8F9 0372FEF8 83064589 3FE005F8 D10AD109 11Ö1½.Å7.E..«±r.°$6R¡ŸÊ%Ð$ÅW.ðs. 0000C0
 F088F5F7 C188D388 D0D1E813 F9F5F7C1 88038800 D1E803F5 F7C03303 88FFFF8D $...Æ3å%%.Ö1Ï.Æ.è%%°.Ö1Ï.Æ.è%%.Þ 0000E0
 D1E1D100 D1D301E1 01D001D3 01E1D100 D1D301E1 D1C0330E 03C8880D 88F5F758 X%%.Ï.å.ã3å1Å1Æ1Å1Å1Æ1Å1Å1Æ1Å1Å1 000100
 88C3F810 066083F8 A5E85FF8 13E8575E 000005C7 024D8904 5D890645 08D001D3 Æ1Å.E..]..M.ú...^WÒ.« ÒE½.m..½ú. 000120
 0025E803 F636880C CAE80CE9 E80C8AE8 004EE80C 0FE81C73 41A0307F E4800644 D..ð.=.As.ÓÒ.ÓN.Óα.ÓÓ¯Óð..6-.Ó%. 000140
 C3F8FACA E8075A8E 08747FF0 A906448B 1472FFD1 E8C3F904 058BFAE2 E90CD7E8 Óm.Óã°¡..°úÓ1.r..D.´Þ.t./Z.Óð°½ú 000160
 448810E8 0180C3F8 FE880C5A E8075A8E 0A773E40 307FF025 064488C3 F9080288 ¡..°ú.D.%Þ.=a>w./Z.ÓZ..±½ú¯.$..D 000180
 A67341A0 067C817F 0764800C 38E8020C A2FC8024 07448AEA 763E4030 7FF02506 .%Þ.«a>vö.D.$.«Å..Ó;..d...|..As! 0001A0
 528F06E8 F7DFE807 528F0879 800744F6 14740102 0C06F6FA 1CE8020D 8FDC4AE8 ÓJ.¢..Ó.°-....t.-D..y.¢R.ÓÓ%$.¢R 0001C0
 1588F78D E807528F 06740102 0C06F680 020C3680 05730CAC E8F2ACE8 F7FAE807 .Ó°%Ó¯·Ó¯.s..6...-....t.¢R.Ó$%E. 0001E0

Dump of file SATURN:[PCCOMMON.DUMP.DLL]DGM.TMP;1 on 18-APR-1990 10:44:12.07
File ID (620,6,0)   End of file block 186 / Allocated 188

Virtual block number 166 (000000A6), 512 (0200) bytes

 8855C307 44308024 020CA0F7 C9E8077A 8F0004E8 C9330225 880015E8 021D8902 .¿..Ó..EX.3èÓ..¢z.ÓèK...$.OD.úU. 000000
 00200598 078A2606 5E880C74 01062187 F6088898 078A2606 5EC45657 04EC83EC å.å.WVá^.&....Å-.|..t..^.&..... . 000020
 7E89F275 04062187 F6088898 058A2647 F8881674 00653098 078A2606 5E8807E8 $..^.&...=e.t..«G&....Å-.|..u·.- 000040
 26C688F8 8898078A ?4065E88 2E07C626 0646FFF0 8898078A 26065EC4 08468C06 ..F.á^.&....Þ.F.&6...^.&....½.6& 000060
 E8067EC4 565706EC ??EC8855 C85DE588 5F5EFC7E 89E975C0 0A0646FF F7880788 ...%.F..åuÓ.-«^_.|]úU.å.å.WVá-.$ 000080
 6774003F 80260646 FF0F8808 468C067E 89F37500 30802647 07742E30 80269008 ..&.=.t.G&.=.uµ.-..F..Ó.F.&.7.t0 0000A0
 8808468C 067E89ED 75003080 26470774 45308026 00746530 8026900E E8067E88 .-.$..&.=et.&.=Et.G&.=.uÚ.-..F.. 0000C0
 8808468C 067E89F9 74303080 264F9002 E8067E88 FE5689FC 4689064E FFC28CC7 Ú.Ó.N..F«.V±.-.$..Ó&.=Ot°.-..F.. 0000E0
 7689F275 C00A0788 26AC065E C40646FF FC76C5FA 5E8C064E FF03752E 3F80260F Ó&.7.u..N..^°év=.F.á^.¯&...åu·.v 000100
 01FE9A06 5EC41990 021E9A00 A61E80EC 885590C8 50E5885F 5EFA5E8E FE5E8CFC «.^±.^°^_.|]ù.U.å..|......á^..±. 000120
 24740006 7E835657 08EC83EC 8855C850 C028C850 00018805 72198906 9E9A1995 .....¿.r.|..]ù+å]úU.å.å.WV.-..t$ 000140
 885F5E1F A5A5A5A5 DA8E1EF0 88F88808 5EC404C4 83190021 549A0C76 FF0E76FF .V..v..T||..á.á^..«.Þ..ÓEEEE.^ . 000160
 A5A5A5A5 DA8E1E07 16F088F8 7E8004C4 8319F721 549A0C76 FF0E76FF 90C85DE5 |]ù..v..v..T|%..á..-½.Þ....ÓEEEE 000180
 56570AEC 83EC8855 90C850E5 885F5E1A 7303719A 085EC419 FF021E9A F85E8D1F ..^½.....á^..q.±.^_.|]ù.U.å.å.WV 0001A0
 00018805 752D3F83 26F85EC4 FA5689F8 46890F5E 16880F5C A1477400 026E3E80 .>n..tGÅ\...^..F½.V°á^½&.?-u.¡.. 0001C0
 FF50C028 9003E800 0188067E 000E7E83 FE5689FC 46890C56 880A4603 C02802E8 $.+å.F..V..F=.V±.-..-.|..$..+åP. 0001E0

Dump of file SATURN:[PCCOMMON.DUMP.DLL]DGM.TMP;1 on 18-APR-1990 10:44:12.07
File ID (620,6,0)   End of file block 186 / Allocated 188

Virtual block number 167 (000000A7), 512 (0200) bytes

 37FF2602 77FF2604 77FF2606 77FF2606 5EC458E8 06C48304 5DE80EFC 76FFFE76 v±.v=.Ó]..á.$Xá^.&.w.&.w.&.w.&.7 000000
 02E80001 88057E00 0E7E8350 400E4688 5052FA56 89F84689 08C4831A 81239A9A ..#Ÿ..á..F½.V°RP.F.@P.-..-.¡..$. 000020
 AA9A5052 0C56880A 4603C703 C02802E8 00018805 752D3F83 26F888F8 5EC4C028 +åá^½.½&.?-u.¡..$.+å.ú.F..V.RP.¯ 000040
 46FFFC5E C40A752D 3F8326F8 5EC4FE56 89FC4689 0C56880A 46880AC4 83180821 |...á..F..V..F=.V±á^½&.?-u.á^=.F 000060
 882E07C6 26FC5E88 FC46FF07 88260147 8A26FC5E C4147E00 0E7E832D 07C626FC =&6.-.-..-.á^=&.G.&...F=.^=&6..¡ 000080
 08C4831C 45211E9A 5052FE56 88FC4603 0E4603D8 F7C01801 026E3E80 501E0268 h..P.>n...á%Å.F..F=.V±RP .|E..á. 0000A0
 3F802606 5FC426F8 5EC4FC46 FF4507C6 26FC5EC4 07740010 7E83FE56 89FC4689 .F=.V±.-..t.á^=&6.E.F=á^)..á_.&.? 0000C0
 83FC46FF 2007C626 FC5EC4F0 8808F708 7DF608F0 88480247 8826F85E C45E7430 0t^á^½&.G.H.Þ.-).%Å.Þá^=&o.¯.F=. 0000E0
 7C0AFE83 FC46FFF2 88F9F799 C6880700 26FC5EC4 F9F70064 8999C688 157C64FE ±d|..6.¿d.%°á^=&...6.%°.·.F=.±.| 000100
 0026C688 FC5EC4FC 46FFF288 F9F799C6 88070026 FC5EC4F9 F7000A89 99C68815 ..Ó.¿..%°á^=&...6.%°.·.F=á^=.6&. 000120
 FF0E76FF 1076FF01 026E06C6 04EC83EC 885590C8 5DE5885F 5E0C5688 0A468807 ..F..V.^_.|]ù.U.å.å.6.n...v..v.. 000140
 8855C85D E5880002 6E06C6FE 5689FC46 89FE49E8 0E0676FF 0876FF0A 76FF0C76 v..v..v..v..Ó1±.F=.V±6.n...|]úU. 000160
 26F45EC4 F65689F4 46890F5E 16880F5C A1517400 026E3E80 00F246C6 12EC83EC å.å.6F·..>n..tQÅ\...^..F¶.V-á^¶& 000180
 6A750E46 390270A1 FE5689FC 46890C56 880A4603 C02802E8 00018805 752D3F83 .?-u.¡..$.+å.F..V..F=.V±Åp.9F.uj 0001A0
 4AE80007 C626EE5E 883007C6 26EE46FF EE5EC4F0 5689EE46 89027006 03FC4688 .F=..p..FŸ.VÞá^Ÿ.FŸ&6.0.^Ÿ&6..$J 0001C0
 F65689F4 468908C4 831C7523 9A9A37FF 260277FF 260477FF 260677FF 26065EC4 á^.&.w.&.w.&.w.&.7..#u..á..F¶.V- 0001E0
```

Dump of file SATURN:[PCCOMMON.DUMP.DLL]DGM.TMP;1 on 18-APR-1990 10:44:12.07
File ID (620,6,0)   End of file block 186 / Allocated 188

Virtual block number 168 (000000A8), 512 (0200) bytes

```
0C56880A 4603C02B 02EB0001 B8057520 3F832650 0E460302 47882 6F4 5EC45052 RP6^¶&.G..F.P&.?-u.¡..$.+å.F..V. 000000
C40A7520 3F8326F4 5EC4FE56 89FC4689 0C56880A 46880AC4 83168621 AA9A5052 RP.¯!Â..å..F..V..F=.V±6^¶&.?-u.å 000020
05E80EFC 76FFFE74 FF500001 88107F00 027F8326 F45EC420 07C626FC 46FFFC5E ^•.F=&6.-å^¶&......¡..P.v±.v=.Ò. 000040
687E000E 7E83FC46 01024788 26F45EC4 0AEB3007 C626FC46 FFFC5EC4 06C48302 ..å.6^•.F=&6.0$.6^¶&.G..F•.-..-h 000060
8326F45E C42E07C6 26FC46FF FC5EC406 C48301D8 E80EFC76 FFFE76FF 500001B5 ¡..P.v±.v•.ÒÄ..å.6^•.F=&6..6^¶&. 000080
88037E0E 4630D8F7 02478826 0EE8D8F7 02478826 08740002 6E3E8043 7D00027F ...)C.>n..t.&.G.%Ä$.&.G.%Ä;F.-.. 0000A0
FC76FFFE 76FF5000 30880E76 FF06C483 0196E80E FC76FFFE 76FF500E 46890E46 F..F.P.v±.v•.Ò...å..v.¡0.P.v±.v• 0000C0
0E76FF01 026E06C6 04EC83EC 8855C85D E5880C56 880A4688 08C4831D 8C23389A .8#...å..F..V..[]ìU.&.&.6.n...v. 0000E0
90C850E5 8800026E 06C6FE56 89FC4689 FE6EE80E 0676FF08 76FF0A76 FF0C76FF .v..v..v..v..Òn±.F=.V±6.n...[]ù. 000100
C4831DC8 239A9A37 FF260277 FF260477 FF260677 FF26065E C45606EC 83EC8855 U.&.&.V6^.&.w.&.w.&.w.&.7..#à..6 000120
9003E800 01880675 2D3F8326 0270A348 02478826 0F5C1EC4 0F5E1689 0F5CA308 .È\...^.6.\.&.G.Nèp.&.?-u.¡..$.. 000140
5C1EC40A C4831EC8 21AA9A50 520E76FF 5306FE56 89FC4689 0C56880A 4603C02B +å.F..V..F=.V±.S.v.RP.¯!Â..6.6.\ 000160
C688077C FCFE8302 70368902 72A2C02A 02E801B0 047D0270 36394E02 7788260F .&.w.N96p.).¯.$.*åÂr..6p..±=|..6 000180
885E0CC4 83FD93E8 0E0676FF 0876FF0A 76FF0C76 FF0E76FF 1076FF1F 7F0E4639 9F....v..v..v..v..v..v..Ò.».å.^. 0001A0
5E8EFE5E 8CFC7689 F97500FF 7C8046FC 76C5FA5E 8C1E7400 02723E80 90C850E5 []ù..>r..t..^*év=F.|..u*.v=.^±.^ 0001C0
5E0AC483 FEF6E80E 0676FF08 76FF0A76 FF0C76FF 0E76FF00 FE47C626 FC5EC4FA *å^•&6G±..v..v..v..v..v..Ò-±.å.^ 0001E0
```

Dump of file SATURN:[PCCOMMON.DUMP.DLL]DGM.TMP;1 on 18-APR-1990 10:44:12.07
File ID (620,6,0)   End of file block 186 / Allocated 188

Virtual block number 169 (000000A9), 512 (0200) bytes

```
FF0A76FF 0C76FF10 76FF1276 FF197545 0E7E8306 74650E7E 83EC8855 C85DE588 .[]ìU.&.~.et..~.Eu..v..v..v..v.. 000000
76FF0876 FF0A76FF 0C76FF10 76FF1875 660E7E83 9035E8FB 8FE80E06 76FF0876 v..v..Ò.«$5..~.fu..v..v..v..v..v 000020
FEC0E80E 0676FF08 76FF0A76 FF0C76FF 1076FF12 76FFC85D 0AC483FD 39E80E06 ..Ò9».6.]ù.v..v..v..v..v..v..Òå± 000040
FF504004 C4831EE3 00109A06 76FF0876 FF297400 0A7E83EC 885590C8 5D0CC483 .å.]ù.U.&.-..t).v..v....D..6.@P. 000060
4590088C C888C850 0AC48319 88226E9A 50520856 88064603 0A468806 76FF0876 v..v..F..F..V.RP.n"...å.]ù.à.Ä.E 000080
ED83F802 76168902 740E8908 E8028603 F606C708 74127703 F8830 88E 1EEC8855 U.&..Ä.«.w.t.ú.-...$...t...v.%.Ù 0000A0
FC088EC1 8ED98CC0 8C02788F F388C8F3 F60C8302 862003F6 A1C84050 1FE58802 ..[.]MùÀ-.-..*.-µù.µex..å.\.è.Ä• 0000C0
C302788E D98EA5A5 A5A5FCD8 8EC18ED9 8CC08C02 788FF388 C302788E D98EA5A5 ÈÈ.\/x.û.µex..å.\.è.Ä•ÈÈÈÈ.\/x.û 0000E0
D1058925 747F80C2 F70254B8 0C88C033 FCFC7588 03E807FE 45C6FC7D 89FC7588 .u=.)•6E±.$..u••3å...T.%ò..tX..! 000100
55893800 C2818FE6 80044089 02458908 D1D901FA D1D80109 D1FAD1D8 D1D901FA *|||Ä|*|||Ä|*|||Ä.E..M..[..8.8.U 000120
16501653 C4885087 0408A780 D4885200 028BC306 45890445 89024589 0589C306 .û...E..E..E.ûE..R.å.[..ñP.6S.P. 000140
D4794804 088F0808 81067500 02300774 00013040 81127558 C0080000 FFFF9A52 R......åXu.Ýa=..t.=..u.Ý.....Kyå 000160
038BC28C 0C9A06C4 00CAE903 730C921E FFD833C2 8C0C9606 C41EE30C 940E885A Z....D.6....ó3Ü....s.Òò.6....òE. 000180
6A08740C 9E300C9E 880073E8 0C908F0C 888E007C E80C9E8F 0C9E8E0C 921EFF00 ....ƒ..e..Ò|.ƒ..e..Òs.¡..=..t.j 0001A0
9A006A00 6A036A00 51E80C9E 8F0C9E8E 088EFFFF 88C30000 FFFF9A20 18680E01 ..h. .....û|...Äƒ..e..Òo.j.j.j.. 0001C0
9E8EEC88 5503E800 31E80C9E 8F0C9E8E 003AE80F 688F0F68 8EEC8855 00002016 . ..U.&/h.eh.Ò:.ƒ..e..Ò1.$.U.&/. 0001E0
```

Dump of file SATURN:[PCCOMMON.DUMP.DLL]DGM.TMP;1 on 18-APR-1990 10:44:12.07
File ID (620,6,0)   End of file block 186 / Allocated 188

Virtual block number 170 (000000AA), 512 (0200) bytes

```
0C940E88 0000FFFF 9A500646 8A50C033 001AE80C 9E8F0C9E 8E0023E8 0C9E8F0C .e..Ò#./..e..Ò..3èP.F.P......... 000000
885500C3 EEEB1DFF F2740245 08058804 EF830E73 F738C30C 921EFF00 028807E3 Ð.È......ù;%s..ÿ....E.t·..$Ýù.U. 000020
E5882098 20E89A50 00FF8806 1C1EFF04 7400061E 3E831033 20E89A50 00FC88EC å¡=.P.Ò 3..>...t......¡..P.Ò . .[ 000040
401074C2 38AD0086 8E065688 C08ED88E 201C8857 56EC8855 0502E900 028BC85D ]ù¡..Ò..U.&VW|. .Ä.&.V.ƒR.ù;Òt.@ 000060
9A0676FF 57EC8855 0002CA5D E5885E5F 96E8E8F7 88AEF2FF FF89C033 970C7496 .t..3å¿...Ò.%$$._^.[]ò..U.&W.v... 000080
1651521E 530002B8 C4885049 D1F7AEF2 FFFF89C0 33FA8892 1F74C008 20AC2088 ¡ ¯ .åt...*3å¿..¯Ò%1P.6E..S.RQ. 0000A0
33C08ED8 8CFE880A 76C51EDE 88078BEC 88550002 CA5DE588 5F580000 FFFF9A50 P.....[..[]ò..U.&.m.&.6v..s.Ä.å3 0000C0
1FFA88F3 88A4F3C9 13A5F3E9 D149A402 7401A8C7 88067EC4 D1F7AEF2 FFFF89C0 å¿..¯Ò%Íå-..ù¯.t.É!!Òµ E.èµÉ.µ.*. 0000E0
7E89F275 08062187 F6088898 058A2647 9002E806 7EC45657 000000C8 CB5DC28C .ò]ùà...WVå-.$..Gå.....Ä-.¡..u·.- 000100
050AC483 20F2265F 9A570876 FF5004C4 83218A00 109A5706 006A006A 08468C06 ..F..j..j..W.....¡.å.P.v.W..&·..å.. 000120
56570000 0AC8C8C9 5F5EDA8C 0F608B1F A5A5A5A5 DA8E1E07 1EF0880F 608F0008 ..e'..Þ....ÒÈÈÈÈ.¡'..Ò^.Èùå...WV 000140
F85EC4FE 5689FC46 89085788 26064788 260C5EC4 FA5689F8 46890856 88064688 .F..V..F%.V*6^.&.G.&.W..F=.V±6^% 000160
FF097400 3F8026FC 5EC4F876 C5F65E8C 0A4E882E 7E000A7E 833007C6 26F846FF .F%&6.0.-..-..N..^-év%6^•&.?.t... 000180
C626F85E C40A4E89 F65E8EFA 5E8CF876 89E7E246 04883080 9003E807 8A26FC46 F=&..$..^0..FåÒ.v%.^•.^-.N.6^%&6 0001A0
264F3005 C6269006 E8F87EC4 F84EFF1F 7C353F80 26FC5EC4 287C000A 7E830007 ...-..|(6^•&.75|..N%6-%$..&6.0O& 0001C0
0247FF26 0C5EC409 75313F80 26065EC4 07FE260F 88FA468C F87E89F5 74393080 .=9t%.-%.F*.Ò&±.6^.&.71u.6^.&.G. 0001E0
```

```
Dump of file SATURN:[PCCOMMON.DUMP.DLL]DGM.TMP;1 on 18-APR-1990 10:44:12.07
File ID (620,6,0)   End of file block 186 / Allocated 188

Virtual block number 171 (000000AB), 512 (0200) bytes

 88550000 90CBC95F 5E08C483 217D211E 9A0676FF 52505240 08568806 468815.  $..F..V.ƏRPR.v...!)!.ó.^_èù...U. 000000
 0E4E8822 62261A9A 5706561E 067EC40A 76C55657 1E0085E9 0375C908 0E4E88EL  ‡.N..èu.Õç..WVév.ó-..V.W..&b".N. 000020
 22A305C0 8C0773F9 03088EFF FF05D88C 0773F103 49507300 DA83C128 57780208 .ØxW+è.Ö.sPI.ps..Ä....Ä.ªs..â.Ê" 000040
 1E391FCA4 F3FDC128 9140C603 C3230818 C628C703 C3230818 C72848C1 8841C08E .âA.èH+ú.Ùĥú.ú+ó.Ùĥú.óə.+è≈µÊ•.D 000060
 1D78848C1 88C8E8C0 8E220920 C08CD175 FFFF8308 8E22AE20 D88C0775 FFFE835C \.±.u..Á-Ü".Ä...ul.â-}".áŠà.èH.■ 000080
 C913A5F3 E9D1C128 9140C203 C3230818 C22802F7 D688C203 C3230818 C22802F7 %Ø+ó.Ùĥú.ó.øXØ+ó.Ùĥú.óə.+è1ÖµÊ.è 0000A0
 1F5F5E8E E8C08E23 1C05C08C C775FF08 D88E22E5 05D88C07 75F60818 E391A4F3 µÊ.D..-u..Ä.[".Ä..uú.â..#.âS/^. 0000C0
 D3230818 D1280C74 0AF7D788 067EC457 38E30C4E 88EC8855 C8500856 88064688 .F..V.]ùW.‡.N.DØWó-..øXÖt.+1.ÙŴ 0000E0
 D1C38E23 27C381C3 8C10E301 87AAF3C9 13A8F3E9 D1E08A0A 46880128 D1870103 .1.1+1.F..Á1Öµ¨.èµ¨.1D..û.û'#.û1 000100
 521E5100 02890C88 5301578D E42A078A C8500856 88064688 5FAAF3C9 13A8F3E9 Ôµ¨.èµ¨_.F..V.]ù..*ô.W.S.É¿..Q.R 000120
 A536A536 A536072C 8F06768D C08ED88C FC5756EC 8855C858 00002112 9A531650 P.S..I.¯[ùW.‡VW•.Ä.â.v.¢,.6E6E6E 000140
 0255891D 89FF3207 228FAA91 A4F39198 ACC88807 348F5003 88E85507 2C8EA536 6E/,.UÒ..]¢4..â¯..µÉ.¯¢".2....U. 000160
 06C6C85D E588C033 EC8855C8 5DE5885E 5FC788DA 8C085D8C 07340645 C7044D89 .M.úE.4..]..Ö.ú_^.[]ùW.‡3â.]]ùó. 000180
 E9076A8F 03F63688 EC03E907 6A8F03F6 3688EC30 E9076A8F 03F63688 C8010750 P..ù.6-.¢j.Öó‡.Ƶ-.¢j.Ö.‡.6-.¢j.Ö 0001A0
 EE68E907 6A8E03F6 3E88E8E5 E9076A8E 03F63E88 EE7CE907 6A8F03F6 3688EE23 #Y.6-.¢j.Ö|Y.>-./j.Ö1$.>- /j.ÖhY 0001C0
 03F63E88 076A8EC3 0875F738 03F63E88 C3585FA8 A8A8A803 F63E88FC C0335750 PW3â•.>-.¨¨¨¨_Xù.>-.;Xu.ù;j..>-. 0001E0

Dump of file SATURN:[PCCOMMON.DUMP.DLL]DGM.TMP;1 on 18-APR-1990 10:44:12.07
File ID (620,6,0)   End of file block 186 / Allocated 188

Virtual block number 172 (000000AC), 512 (0200) bytes

 83A5A5A5 A50772BF C308EE83 A5A5A5A5 076A8F03 F63688C3 03F63688 A5A5A5A5 EEEE.6-.û.6-.¢j.EEEE.Y.û¢r.EEEE. 000000
 8804E807 6A8EE0FF 34FF0274 FF0474FF 0674FF58 03F63688 04E8076A 8EC308EE Y.û/j.$..6-.X.t..t..t..4.Á/j.$.. 000020
 91ADF388 A5A5A5A5 076A8F03 F63688ED FF06448F 04448F02 448F048F 5803F636 6-.X...D..D..D..Á.6-.¢j.EEEE.µÙ. 000040
 5EED66E8 076A8F03 F6368856 511CE3A5 A5A5A503 F63E8817 E851E032 0579C908 .èy.2ÙQ$..>-.EEEED.QV.6-.¢j.ÖfÙ^ 000060
 28747FF0 25E88A06 4488C3F7 8803F63E 88E4E208 C683595E E856E803 F63E8856 V.>-.ÖV$^Y.6.âô.>-..%ú.D..ÖXb.t+ 000080
 10C0800B F7D88898 E800E8D0 E8004107 E180C88A E8030481 23770370 303FC020 -â?=p.w#Y.ÆÒ.à.Å.AÅÒÅÒÅÒ..ÅXÙ.ë. 0000A0
 07828FED 08E8FE88 08EE83A5 A5A5A507 7A8F5351 C3066C88 E0020640 8A066C86 .l..ə.ØÅ.l.ûQS¢z.EEEE.Y..±Ò.Û¢.. 0000C0
 FF51E8FE F3E80782 8EA5A5A5 A5078A8F 11740808 58FF66E8 5808EE83 A5A5A5A5 EEEE.Y.(Öf.(.Ût.¢..EEEE/..Öµ±ÖQ. 0000E0
 FEF8E851 ECC9E907 7A8FFFEC E8ECD2E9 07828FED 38E8078A 8E0673FF C7E8C3F9 ªùÖú.¢./..Ò;Û¢..Ö#ÈÖ‡.¢z.Öè$ÖÖ%± 000100
 5016C488 50EC8855 EA83E907 6A8EECB3 E80772BE 5FFEE2E8 FEA8E8EC C0E8F888 .«ÒâšÒ´±Öâ±_ƒr.Ö"â/j.Ö.ôU.$P.â.P 000120
 449AF9F0 E80021E8 0000FFFF 9A079268 1E079468 1E0404A3 E0865800 00FFFF9A .....X.ÁE...h...h.......Ö1.Öbª.D 000140
 0000881E 079A16FF 00FF6825 8E20E89A 2581208E 9A50C85D E5880001 88228828 (."¡...[]ùP.. ÝX.Ö ƒXh.......E.. 000160
 88A6F3C8 88D18808 9E8E3174 00308026 47017500 3080267F FF890794 068EFF33 3.....¿..&.=.u.G&.*.t1/...1.ùµ!. 000180
 412CAC92 04E0C00E 72412CAC 0408BF1F F780071E 061CE8E7 74AEF2C0 330874CA ôt.3â·ÛtÖŠ.....K.¢..¯,Ar.âÅ..¯,A 0001A0
 0A462BEB D3EAD3FF FF890C5E 88085688 064688EC 885500C3 1FEDE8AA C20A0572 r..ô¨ŠÙ.û.U.‡.F..V..^.¿..ÆÖÅ$+F. 0001C0
 38000C41 06C60028 E8010C41 06C60E56 88D83357 56EC8855 0008CA5D E588D318 .Æ.[]ò..U.‡VW3Ù.V.6.A..Ö(.6.A..; 0001E0

Dump of file SATURN:[PCCOMMON.DUMP.DLL]DGM.TMP;1 on 18-APR-1990 10:44:12.07
File ID (620,6,0)   End of file block 186 / Allocated 188

Virtual block number 173 (000000AD), 512 (0200) bytes

 E5885E5F 0006E80E 5E880233 5756EC88 55C85DE5 885E5F00 8940C980 05730A76 v.s..èə.._^.[]ùW.‡VW3Ø.^.Ò..^.[ 000000
 88088EA4 F3088E8F 0676C527 E8F63340 81067664 F9830A4E 88C08ED8 8CFCC85D ]ù•.Å.â.N¯..ªdv.Ÿə3-$'év.¢/.µÊ.Å. 000020
 8908AC8F 0A760306 76285004 56E85508 848F064E 010C4688 06768908 8E8E0A4E N.//..v..F..N.¢Ç.UÖV.]+v..v.¢¯.. 000040
 831675C4 3A808025 09478A2E 09648A56 53C30A8C C7880650 89044589 02758900 ..u..E..]..ú.ÖùSV.d...G.X..:óu.. 000060
 AD93AD92 AD95AD56 C3585EF3 E10738 2E 048802E8 8302EE83 0005890A C3830AC6 ó..ú.¿...Y..$....;.Åµ^[ùVÙ.Ù.Ù.Ù 000080
 895E03FE 20D8D1F5 00013000 D1E3D1F4 E2DFD10D D10AD1D8 D1E80100 0589FF33 3.¿..ÌÖÌÜÌÖÌÌÌÖâ¶ÌDÌÅ=..%ÌÙ-±.^. 0000A0
 CCCCCCCC CCCCCCCD 0000FFFF FFFFFFFF FC66C308 4489065C 89045489 026C893C <.[..T..\..D.ûf•........ëääääää 0000C0
 0489570C 228FFCC0 8ED88C06 C3075840 D088C033 300144C6 0104C60C 2E8EFFFD •./..6..6D.03â.Âə[.û..Ä.â•¢".W¿. 0000E0
 8EFF33FF 78E85320 830279C9 0806747F F0C1F720 837F0764 80064C88 5EA5F300 .µÊ^.L..d..ª Xèp.t..èy.ª-SÒ(.3./ 000100
 F69A8007 13C803E4 I 408091 E2F74D10 8AC8883F FE05ADF8 8A887480 A8AC0C29 ).¯¯.tE.YÙ.±7.âo.MXâ.¯M-ô.â.ø¯.- 000120
 4709725F FF13E827 1¢8078C E80C228E DFF75713 430F8112 F4E981FA 13C803E7 Ó.â.ª.Ö¶..ÖC.WXÖ/".Ö..E.'Ö.. r.G 000140
 D1DAD1E8 D10CE3C0 33F788D9 F791AD93 AD92AD95 AD97AD57 5F0615E8 27288857 WE('Ö.._WÙ.Ù.Ù.Ù.Ù.X).X3âD.1Š1Ö1 000160
 55525351 C0320010 890C2F8F D9130113 E913039A D68156C4 80F4E2DC D0DED1DD Ì1âÁEâ¶¯.âV.ø...Ö.].]¢/.¿...2âQSRU 000180
 F11359E5 02590000 D3D1D201 D5D1D601 E4D00000 D3D1D201 D5D1D601 E4D05056 VPÂÖ1ø1110ÌÆÂÂÂÖ1ø1110ÌÆÂÂY.lY.þ 0001A0
 80494F8D E259AA30 04D00003 D1D2D105 D1D6D1E4 00001409 13590113 59E91359 Y.ÖY.lY.]..ÅÖ1ø1110ÌÆÂ.0¯YâŞÖ1¯ 0001C0
 3639FF28 F6285657 000014C8 C30758 5A 0001880C 880C2E8E 12C183FC AEF3F030 0»µÙ•.è./....|..Z[.ùâ...WV+-+.96 0001E0
```

```
Dump of file SATURN:[PCCOMMON.DUMP.DLL]DGM.TMP;1 on 18-APR-1990 10:44:12.07
File ID (620,6,0)   End of file block 186 / Allocated 188

Virtual block number 174 (000000AE), 512 (0200) bytes

76FFF876 FF0C6AF8 5689F646 89F25689 F04689C0 28079416 8800F0E9 03750794 ..u.Ðþ.....+à.Fþ.V·.F-.V%}..v%.v 000000
46FFF65E C4008CE9 03767FFF FE814619 74C0080A C4832888 2A749A08 9E681EF6 -.h...t*|(.á..ât.F.±..v.Ö¥.á^-.F 000020
808A7500 3F8026F6 5E88F475 003F8026 F646FFF6 5EC40CEB 47EA7500 3F8026F6 -&.?.uôG$.á^-.F-&.?.u¶.^-&.?.uo. 000040
89FC4689 02C48328 FD29619A 56EE5689 EC468904 C48328C7 2A1C9A04 6A500145 E.Pj...*ú(.á..F$.VÝV.a).´.á..F•. 000060
0C6A0613 16890611 A3EE5688 EC468866 74C208FC 46886074 EE4608EC 4688FE56 V±.F$.FÝtm.F•.ôtf.F$.VÝÊ.  ...j. 000080
26FE5688 FC4688EC 5EC42C74 C0080AC4 8325C32A 749A089E 681EF076 FFF276FF .v·.vþ.h...t*ùX.á..ât,á^$.F•.V±& 0000A0
0E74C00A 078826FC 46FFFC5E C4078A26 F046FFF0 5EC404EC 46830257 89260789 ..&.W..F$.á^Þ.FÞ&..á^•.F•&...ât. 0000C0
C4EC8855 90C8C95F 5EA77500 3F8026F0 5EC4F475 003F8026 F046FFF0 5EC4E8EB Šôá^Þ.FÞ&.?.u¶á^Þ&.?.ul^_èù.U.&á 0000E0
73FFF130 06468857 5602EC83 EC8855C8 5DE58801 FE4F8026 0574C308 C08C065E ^..á.ût.&.O±..|}ùW.&.&.VŴ.F.•þ.a 000100
FF087500 78E80574 0018E815 750082E8 0C7EA312 740025E8 0875000C 7E3E831E ..>-..u.ÒX.t.Ê-.Ò..u.Ò..t.Òx.u.. 000120
89FEE383 43065E88 0776065E 3900F088 CB5DE588 5E5F02C4 8328782F 689A0676 v..h/x(.á._^.|}ùÊÞ.9^.v..^.C.D±. 000140
801687C2 883874FF FA8308C4 83299531 149A5002 80510E4F 8050501E C033FE5E ^±3á.PP.O.Õ¯.P..1.).á..•.t8.ô... 000160
A3000A88 0C478948 480008A3 C033088E FE5E8800 08A30A8E 0574020P 0C82A30C .Ê...@t..ÒÊ...^±.Ã3áÊ..HH.G.|..Ê 000180
1E8ED833 064E88C0 8ED88CC3 1F088C00 06A30000 05000AA3 01478000 02A30000 ..Ê...G.Ê.....Ê...Ã.û.Ã.à.N.3U.. 0001A0
2A4900C4 9A0676FF 006/9876 FF006A56 00000AC8 C3098EC1 8CD20805 9CE80C82 ..Ò...@.è.)ùà...Vj..v.j..v..á.I* 0001C0
468902C4 832A6229 619A56F8 7688902F E899C028 0674FFFF C2F7FA56 89F.¨489 .F%.V*%ó..t.+á.$/..v%V.a)b*.á..F 0001E0

Dump of file SATURN:[PCCOMMON.DUMP.DLL]DGM.TMP;1 on 18-APR-1990 10:44: 2.07
File ID (620,6,0)   End of file block 186 / Allocated 188

Virtual block number 175 (000000AF), 512 (0200) bytes

FE5688FC 46889007 E808C483 29C12338 9A50FE76 FF006A56 1274D008 FE5689FC •.V±.Ât.Vj..v±P.8#è).á.$...F•.V± 000000
FE88CB03 D9F7AEF2 C033F788 067EC409 8827E30E 4E881E56 57EC8855 90C8C95E ^èù.U.$WV..N.D'.¼-..%3á·ÙÑ).ù.± 000020
58C850E5 885F5E1F C18801F7 49490474 0477FF45 3A26C933 FF448AA6 F30A76C5 év.µ|.D.3è&:E.w.t.||%1.é.^_.|}ùx 000040
88E17202 0CE80833 0C4E1E89 00ACE908 330185E8 EF88FF33 D78840C9 8030C980 .è0.èa.a3..ÿÒ..3ÜÒ¯...N.3ÜÒ..rÃ. 000060
720888C5 03C47502 080C4E2E F7C388EA 88F8880C 4E26F7C7 8850E072 0205E8F8 %Ò..rÁP.ú%&N..%.Ö.ú%.N..@uá.é.Ãr 000080
A3C0330C 5216890C 50A30C46 0E89CE03 0C443E89 FCB5E808 73000383 F803588E /X.%.£.aÁŠç•.>D..ö..F.ÊP...R.3áÊ 0000A0
4E417401 FDE80833 00E7E89F 75D80880 CD800375 01ADE891 0C4CA30C 48A30C4A J.ÊN.ÊL..ÒÜ.u..ë..Üu.ÒÒ.3ÜÒ».tAN 0000C0
03E80402 C9814E27 7502742D 3C06742B 3C317400 0C413E80 1274453C 1C74443C <Dt.<Et..>A..t1<+t.<-t.u'N.è..$. 0000E0
08F70275 9E5840C9 80037502 C5F60088 E8509F01 6CE84600 000C5006 C70EC980 .è.ú.P...FÒl..PÒ..-é.u..èaX.u.%Ü 000100
0C523E28 047510C5 F60C4C3E 03FB0330 C9800374 1872C1F7 0675FF08 0C503E88 .>P...u.%èr.t..è0.«.>L.-é.u.+>R. 000120
54A13875 5E5901AC E8000C62 06C60C44 3E880394 E80C588E 5156507F 0190FF81 .....PVQ/X.Ò...>D.ó.b..Ò¯.Ý^uBÁT 000140
4A3E8380 07408004 747FF006 45F70003 83F508F7 03F71374 80C5F60C 561E880C ...V.-é.t.%&%Ä%.£.%E.Þ.t..M...>J 000160
4E06C63F FF88C301 C980C302 CD800375 000C4A3E 830C622E 8A08C980 0376070C ..v..è...b..>J..u..ë.ú.è.ùÊ.?6.N 000180
33C30FEB DE780803 E301E301 C303E301 02CD80ED 770CCCF8 81177200 E4E80A0C ..Òð.r..«ä.wÜ.ë.1D.ù1D1D.ÄxBŠÒù3 0001A0
1999FF81 00078300 05830003 83000358 008AE850 28720006 E807880F 88EF88FF ..ÿ.Ô.mÒe.r(PÒ..X.Á.Æ..!..a..... 0001C0
C7F61675 0C4C0608 C508C788 EEE80C4C 06FF01CA 800374C0 0A007200 88E8E572 r|ÒÊ.r..ât..ð...L.ŠŸ.ú.é..l.u.-ú 0001E0

Dump of file SATURN:[PCCOMMON.DUMP.DLL]DGM.TMP;1 on 18-APR-1990 10:44:12.07
File ID (620,6,0)   End of file block 186 / Allocated 188

Virtual block number 176 (00000080), 512 (0200) bytes

1E890C54 168920C9 8010C980 06E80575 D2080975 8000F881 0F7480C5 F6177480 .t.-é.t..«..u..@u.$..è..è ..T... 000000
FF080040 88F1E80C 4C0EFF00 25E80973 1999FF81 1C74C208 C308C508 C7880C56 V..ú.é.û.ôt.....a.ÒX...L.$þ|a... 000020
E8C28853 5557C35E A892A896 A895A893 A8920C58 8FF78856 F6E8002A E8480678 x.HÒ*.$-V.%eX..¨.¨.¨.¨.¨^ÙAUS.ôÒ 000040
203C0874 005EE8C3 D7D1D501 D301E201 F81358E8 13580813 58000300 08E8000E ..Ò...ÃX.ÃX.ÒX.%1ã1Æ111mùÒ^.t.<- 000060
10E8397D 0C4E063A 072C027E 093C4572 302C4A74 004EE8C3 4E460175 283C0674 t.<+u.FNùÒN.tJ,0rE<.-.,.:.N.)9$. 000080
4A06FF08 CD800C4C 0EFF0E74 10C5F626 77093C2A 72302C20 742E3C33 740037E8 Ò7.t3<.t ,0r*<.w&-é.t...L..ë...J 0000A0
23730C46 3638C3F9 4EC9E810 CD800C48 06FF0975 10C5F6F4 E820CD80 C3E4320C ,20ù.é $¶-é.u...N..ë.ŠèN*û;6F.s# 0000C0
02777A3C 0672613C E274003C E6740A3C EA74093C EE74203C 1074000C 403E80AC ¯.>a..t.< tÝ<.tõ<.t|<.tã<ar.<zw. 0000E0
E7D13E78 03FE05AD 4974C208 C108C508 F888AD95 AD91AD92 AD57C3C0 32C35F24 $_û2àúAÙ.Ù.Ù.Ù.%.é.é.ôt|Ù.±.x>1Ò 000100
FA81F633 D30AD922 43F075C8 FED7D000 D107D1D5 D1D1D1E2 D1000588 DFD1E8D1 1Ò1ÒÊ..1ã1111m1ÁÂm±ùuÞC"1.Æ3-.* 000120
0C620E80 0FE80007 80F57FF0 300E74FF F0A9000? 80C613FE 13EE13CE 13F58001 ..%.ö.Ÿ.±.ó.m.`Þ.t.=Þ.%.m.$...b. 000140
890C6480 C3FF0A06 45890475 89026089 00895FF7 88F888E8 88C88808 88C03301 .3á.Ã.à.Ò.%.%_...m..u..E...ù$d.¿ 000160
0408F6C4 2AC42AE0 22C72800 04880007 8F084401 0847882E A8F3C033 FD880008 ...»3áµ¨..G..Ð.¢..|..+ú"Á*á*á-Ä. 000180
56113E00 46013E27 F72E0488 06C683F7 28F10308 C3830F28 D9285653 C8889804 ...àSV+)+Ò.ù..Þ+%.ó....%'>.f.>.V 0001A0
C808AD91 ADF5870E ED838C75 4F02C583 5B5EE6E2 02C38302 EE830004 56833E02 .>.V...Ÿ..ù.ã|^(.é.OuV.Ù..%Ù.Ù.à 0001C0
D1D1D1D7 D1E2D108 4CFF0078 C008F588 AD93AD91 AD97AD01 0A92ADCD 0AC808AD Ù.à.èÙ..1Ù.Ù.Ù.Ù.%.óx..L.1ã1m111 0001E0
```

Dump of file SATURN:[PCCOMMON.DUMP.DLL]DGM.TMP;1 on 18-APR-1990 10:44:12.07
File ID (620,6,0)   End of file block 186 / Allocated 188

Virtual block number 177 (000000B1), 512 (0200) bytes

```
C0D1086C 01D5D1C5 130D13CD 13FD13F5 8001FA81 ED330508 EF230001 8DD0D1D3 ..#ÿ.13Û....  000000
C8000000 00000000 0004A000 00000000 0000C306 4489045C 89024C89 3C89C508 .è.<.L..\..D.û........à 000020
00368E18 C9BF040C 00000018 8E8C2000 00000000 000E9C40 00000000 00000007 ........a......¥/......éè..6. 000040
DE8E01AA 938A47C9 80E98CE0 000SC278 1F49FFCF A6D5006B 9DC5ADA8 2870859E .çp÷'Üé.k.ÍÍü.Í.xôÍ.Á.Ô.èGo.`..B 000060
1EAD4539 948AFFCB E69594BE C44DE15B FFE6ABCC 77118461 CEFDFFF3 D1871758 ........ 000080
C0314325 637A193A FE57D000 467C648C E4A1FF2C A87FEA27 A539E9A5 FF96CF81 ........ 0000A0
78E85753 F573EF01 0074FF08 0AC3830A E883DFF7 2ED88805 79FF082E 7E88FCAE ........ 0000C0
0C748857 56EC8855 C85DE588 01FE4F80 0474D808 065E88EC 8855C3EC E8585FFE ........ 0000E0
04C7960C 76A30C74 A3FE2440 24E899C0 33057501 76E80005 88071E29 75003F83 ........ 000100
D0E9CB5D E5885E5F 0009E8C0 8ED88C06 4E880C7A 3689FFFE FE44C704 C6830001 ........ 000120
F003D088 1573C138 48437401 A8FE88AD FC027788 F273EEF9 83FEE180 FA744100 ........ 000140
E8058948 C128FE4C 89F9030C 74FE88E6 E8FE4489 F7880002 05C20335 7401A8AD ........ 000160
020C8606 C626C302 7F890C82 1E8C2605 74013820 8E89DA8C C68BFE4C FEF90305 ........ 000180
C203E274 01A8ADF0 03D0888C 73C13848 FE88F274 01A8ADF0 03FE8825 74FFFE30 ........ 0001A0
F88FD88C 12740C86 0EFE2615 E8D88E04 74C00808 4788E6E8 FE4489F7 88000205 ....%.D±Sl.G..ât..ÄS.&±...t..Äe« 0001E0
```

Dump of file SATURN:[PCCOMMON.DUMP.DLL]DGM.TMP;1 on 18-APR-1990 10:44:12.07
File ID (620,6,0)   End of file block 186 / Allocated 188

Virtual block number 178 (000000B2), 512 (0200) bytes

```
E8984040 01240074 C6380068 E8C03306 778888E8 37880C7E 1E8E2605 74C7382F /;ût.&..-..7SE.w.3äðk.;ôt.$.aa.ò 000000
07880C82 A3260474 C138304F 89D88C98 E84E4E96 0574001D E8FE4DFE 0074005F _.t.±M±Ò..t..NNS..Á¿OO;êt.&E.... 000020
EAD10476 0C841638 267FFF8A 414149C8 28037401 A8FE4588 51C399C0 33024789 .G.3á.ûO.E±'.t.÷áIAÁn..&;...v.1ö 000040
59C033E5 75EAD1D2 F7087500 0CE8C628 C22302F7 0072C203 1572C603 C188F575 uÄ.ê.ôr..ôr.%#ô÷ôð..u.%ð1ðu13äY 000060
58FE5589 4AD72806 8806:789 FFFEFE44 C7F203F0 88FE8857 1874001D E85152C3 ûROÒ..t.W.±.P..ûD±±..w..ø÷aJ.U±K 000080
74585A1F FFFA8308 C4832A2E 31149A1F 06500001 88505252 1E023350 53C5. 59 YZûSP3Ø.RRP|..P.....1.°.á..°..Z(t 0000A0
720057E8 07754806 46880856 88079C8F 3875000A 7E830657 56EC8855 C3020b ? ..ðûU.ßVW..-..uðe...V..F.Hu.ÔW.r 0000C0
FE8104C6 8334735E 003EE856 0E468902 44880074 F7381174 48089C36 884CE82' 'ŠL.6..Ht.;%t..D..F.VÒ>.^s4.6..± 0000E0
C085F958 0000FFFF 9A50C033 501652C4 885021E8 99FFFF88 0675020B 0473089C ..a..Ðu.|...ŠIP.áR.P3âP.....[°.á 000100
0C74024C 39F7880E 4E88C850 E5885E5F 07C03303 88089C36 89025C89 1489E675 uÍ...\..6...á3à._^.[]ù.N..%9L.t. 000120
13730796 1E390675 F738C18E.03882672 1C030A88 2CE8F9F2 75089CFE 8104C683 .ô..±..u·°S,.Ô..r&.E.ê;%u.9....a. 000140
00239402 03000CC3 01880487 92079616 890475F7 380E75C0 850000FF FF9A5153 SQ......âuB;%u..........lû.....#. 000160
0E308400 02000000 00310400 02000700 03203001 03000500 03206801 03061900 .....h ......0 .......1.......0. 000180
03262701 05004D00 031F8201 03002600 03318301 03002200 03316801 03000000 .....h1..".....°1..&....ÿ...M...'&. 0001A0
00000000 00005C00 03259101 03005800 0325A401 03008800 03236801 05008700 ......k#.......£%..[....%..\...... 0001C0
6F43202D 20797261 7262694C 20656069 54206E75 5220534D 00000000 00000000 ........MS Run-Time Library - Co 0001E0
```

Dump of file SATURN:[PCCOMMON.DUMP.DLL]DGM.TMP;1 on 18-APR-1990 10:44:12.07
File ID (620,6,0)   End of file block 186 / Allocated 188

Virtual block number 179 (000000B3), 512 (0200) bytes

```
70726F43 2074666F 736F7263 694D202C 38383931 20296328 20746867 69727970 pyright (c) 1988, Microsoft Corp 000000
00040000 00060000 00050000 00030000 00010000 00020000 00070000 00000011 ................................ 000020
000C0000 00020000 00000000 00000000 00000000 00000000 00000000 00000000 ................................ 000040
0000000C 0008000A 00090008 00070006 00050004 00030002 00010000 00020000 ................................ 000060
00030002 00010000 013800E1 010E0000 00200087 005A0000 00000084 0000000E ....Ç.....Z...·.....Ä.;......... 000080
5C6A6F72 705C3A71 000C000A 00080009 00080007 00060000 000C0005 00080004 ........................q:\proj\ 0000A0
4C414600 632E7469 6465745C 6D67645C 6D73775C 6372735C 31333030 6A6F7270 proj0031\src\wsm\dgm\tedit.c.FAL 0000C0
775C6372 735C3133 30306A6F 72705C6A 6F72705C 3A710002 00010000 00004553 SE........q:\proj\proj0031\src\w 0000E0
19A20138 18E4FFFF 1E540000 45534C41 4600632E 74696465 745C6D67 645C6D73 sm\dgm\tedit.c.FALSE..T...ð.8.Â. 000100
0EFF1298 0F011235 0E781009 000F1008 0011102E 00190144 197E0140 186E013C <.n.ã.-.D..........(.5....... 000120
00000000 6E617403 00736F63 03006E69 73030074 72717304 00000C80 0C6A1296 ..j.$....sqrt..sin..cos..tan.... 000140
01010000 00000194 20820190 2082018C 20820188 20820C8A 20823FF0 00000000 ....Þ7ý ..ý ..ý ..ý ..ý ........ 000160
00000000 00000000 00000000 000080C0 E0F0F8FC FEFF0000 00007878 31364005 .M61xx.....±÷%ÞÅã............... 000180
00000000 00000000 00000000 00000000 00000000 00000000 00000000 00000000 ................................ 0001A0
00790078 00000000 00000000 00000000 00000000 00000000 00000000 00000000 ..........................x.y. 0001C0
C234C540 0921F800 0000003F D45F306D C9C88300 00203A02 0000007A 00000000 ....z....: ...ÄèmO_â7....%I.Åé4ô 0001E0
```

```
Dump of file SATURN:[PCCOMMON.DUMP.DLL]DGM.TMP;1 on 18-APR-1990 10:44:12.07
File ID (620,6,0)   End of file block 186 / Allocated 188

Virtual block number 180 (000000B4), 512 (0200) bytes

 AB3DE612 3C686AD4 30BD6AE4 20DC0849 9C3CEB80 FF6993DF 9500073E DAA22168 h!ÀÖ>...Ö.I..Ò<.I.È öj§0åjh<.I=" 000000
 553F8111 11111110 B0BF2A01 A01A013E 1A3EC71D E3A524F0 63BE5AE6 454B5DC0 å]KE|Z/cÞ$ÉD.ú>.>....*¢¯......?U 000020
 00000000 00000000 00000000 00000000 00000030 30302865 00BFC555 55555555 UUUUÉ¢.e+000.................... 000040
 00000000 000000r0 00000000 00000000 00000000 00000000 00000000 00000000 ................................ 000060
 00000000 00000000 00000000 00000000 00000000 00000000 00000000 00000000 ................................ 000080
 00000000 00000000 00000000 00000000 00000000 00000000 00000000 00000000 ................................ 0000A0
 00000000 00000000 00000000 00000000 00000000 00000000 00000000 00000000 ................................ 0000C0
 00000000 00000000 00000000 00000000 00000000 00000000 00000000 00000000 ................................ 0000E0
 00000000 00000000 00000000 00000000 00000000 00000000 00000000 00000000 ................................ 000100
 00000000 00000000 00000000 00000000 00000000 00000000 00000000 00000000 ................................ 000120
 00000000 00000000 00000000 00000000 00000000 00000000 00000000 00000000 ................................ 000140
 00000000 00000000 00000000 00000000 00000000 00000000 00000000 00000000 ................................ 000160
 00000000 00000000 00000000 00000000 00000000 00000000 00000000 00000000 ................................ 000180
 00000000 00000000 00000000 00000000 00000000 00000000 00000000 00000000 ................................ 0001A0
 00000000 00000000 02860000 00000000 00000000 00000000 00000000 00000000 ................................ 0001C0
 00000000 00000000 00000000 00000000 00008181 81010000 00010000 00000000 ................................ 0001E0

Dump of file SATURN:[PCCOMMON.DUMP.DLL]DGM.TMP;1 on 18-APR-1990 10:44:12.07
File ID (620,6,0)   End of file block 186 / Allocated 188

Virtual block number 181 (000000B5), 512 (0200) bytes

 00000000 00000000 00000000 00000000 00000000 00000000 00000000 00000000 ................................ 000000
 00000000 00000000 00000000 00000000 00000000 00000000 00000000 00000000 ................................ 000020
 00000000 00000000 00000000 00000000 00000000 00000000 00000000 00000000 ................................ 000040
 00000000 00000000 00000000 00000000 00000000 00000000 00000000 000  000 ................................ 000060
 00000000 00000000 00000000 00000000 00000000 00000000 00000000 0000  00 ................................ 000080
 00000000 00000000 00000000 00000000 00000000 00000000 00000000 00000000 ................................ 0000A0
 00000000 00000000 00000000 00000000 00000000 00000000 00000000 00000000 ................................ 0000C0
 0A0A0A0A 0A0A0A0A 0A0A0A0A 0A0A0A0A 0A0A0A0A 0A000000 00000000 00000000 ................................ 0000E0
 0A0A0A0A 0A0A0A0A 0A0A0A0A 0A0A0A0A 0A0A0A0A 0A0A0A0A 0A0A0A0A 0A0A0A0A ................................ 000100
 0A0A0A0A 0A0A0A0A 0A0A0A0A 0A0A0A0A 0A0A0A0A 0A0A0A0A 0A0A0A0A 0A0A0A0A ................................ 000120
 0A0A0A0A 0A0A0A0A 0A0A0A0A 0A0A0A0A 0A0A0A0A 0A0A0A0A 0A0A0A0A 0A0A0A0A ................................ 000140
 0A0A0A0A 0A0A0A0A 0A0A0A0A 0A0A0A0A 0A0A0A0A 0A0A0A0A 0A0A0A0A 0A0A0A0A ................................ 000160
 0A0A0A0A 0A0A0A0A 0A0A0A0A 0A0A0A0A 0A0A0A0A 0A0A0A0A 0A0A0A0A 0A0A0A0A ................................ 000180
 0A0A0A0A 0A0A0A0A 0A0A0A0A 0A0A0A0A 0A0A0A0A 0A0A0A0A 0A0A0A0A 0A0A0A0A ................................ 0001A0
 0A0A0A0A 0A0A0A0A 0A0A0A0A 0A0A0A0A 0A0A0A0A 0A0A0A0A 0A0A0A0A 0A0A0A0A ................................ 0001C0
 00000000 00000000 00000000 00000000 00000000 000A0A0A 0A0A0A0A 0A0A0A0A ................................ 0001E0

Dump of file SATURN:[PCCOMMON.DUMP.DLL]DGM.TMP;1 on 18-APR-1990 10:44:12.07
File ID (620,6,0)   End of file block 186 / Allocated 188

Virtual block number 182 (000000B6), 512 (0200) bytes

 20202020 20202020 20202020 20202020 20282828 28282020 20202020 20202000 .         (((((                000000
 10101010 10848484 84848484 84848410 10101010 10101010 10101010 10104820 H............................... 000020
 10101010 01010101 01010101 01010101 01010101 01010101 81818181 81811010 ................................ 000040
 10101010 02020202 02020202 02020202 02020202 02020202 82828282 82821010 ................................ 000060
 00000000 00000000 00000000 00000000 00000000 00000000 00000000 00000020 ................................ 000080
 00000000 00000000 00000000 00000000 00000000 00000000 00000000 00000000 ................................ 0000A0
 00000000 00000000 00000000 00000000 00000000 00000000 00000000 00000000 ................................ 0000C0
 00000000 00000000 00000000 00000000 00000000 00000000 00000000 00000000 ................................ 0000E0
 00000000 00000000 00000000 00000000 00000000 00000000 00000000 00000000 ................................ 000100
 00000000 00003FE0 00000000 00000000 7FEFFFFF FFFFFFFF 00000000 00000000 .............ÿ........ Å7...... 000120
 00000000 00000000 00000000 00000000 00000000 00004000 00000000 00003FF0 Þ?.......ð.............. ....... 000140
 00040F70 20480F70 0F700000 00000000 00000000 00000000 00000000 00000000 .....................p.p.^ p... 000160
 00000000 00000000 00000000 00000000 00000000 00000000 00000000 00000000 ................................ 000180
 00000000 00000000 00000000 00000000 00000000 00000000 00000000 00000000 ................................ 0001A0
 00000000 00000000 00000000 00000000 00000000 00000000 00000000 00000000 ................................ 0001C0
 00000000 00000000 00000000 00000000 00000000 00000000 00000000 00000000 ................................ 0001E0
```

```
Dump of file SATURN:[PCCOMMON.DUMP.DLL]DGM.TMP;1 on 18-APR-1990 10:44:12.07
File ID (620,6,0)   End of file block 186 / Allocated 188

Virtual block number 183 (000000B7), 512 (0200) bytes

00000000 00000000 00000000 00000000 00000000 00000000 00000000 00000000 ................................ 000000
00000000 00000000 00000000 00000000 00000000 00000000 00000000 00000000 ................................ 000020
00000000 00000000 00000000 00000000 00000000 00000000 00000000 00000000 ................................ 000040
00000000 00000000 00000000 00000000 00000000 00000000 00000000 00000000 ................................ 000060
00000000 00000000 00000000 00000000 00000000 00000000 00000000 00000000 ................................ 000080
00000000 00000000 00000000 00000000 00000000 00000000 00000000 00000000 ................................ 0000A0
00000000 00000000 00000000 00000000 00000000 00000000 00000000 00000000 ................................ 0000C0
00000000 00000000 00000000 00000000 00000000 00000000 00000000 00000000 ................................ 0000E0
00000000 00000000 00000000 00000000 00000000 00000000 00000000 00000000 ................................ 000100
00000000 00000000 00000000 00000000 00000000 00000000 00000000 00000000 ................................ 000120
00000000 00000000 00000000 00000000 00000000 00000000 00000000 00000000 ................................ 000140
00000000 00000000 00000000 00000000 00000000 00000000 00000000 00000000 ................................ 000160
00000000 00000000 00000000 00000000 00000000 00000000 00000000 00000000 ................................ 000180
00000000 00000000 00000000 00000000 00000000 00000000 00000000 00000000 ................................ 0001A0
00000000 00000000 00000000 00000000 00000000 00000000 00000000 00000000 ................................ 0001C0
00000000 00000000 00000000 00000000 00000000 00000000 00000000 00000000 ................................ 0001E0

Dump of file SATURN:[PCCOMMON.DUMP.DLL]DGM.TMP;1 on 18-APR-1990 10:44:12.07
File ID (620,6,0)   End of file block 186 / Allocated 188

Virtual block number 184 (000000B8), 512 (0200) bytes

00000000 00000000 00000000 00000000 00000000 00000000 00000000 00000000 ................................ 000000
00000000 00000000 00000000 00000000 00000000 00000000 00000000 00000000 ................................ 000020
00000000 00000000 00000000 00000000 00000000 00000000 00000000 00000000 ................................ 000040
00000000 00000000 00000000 00000000 00000000 00000000 00000000 00000000 ................................ 000060
00000000 00000000 00000000 00000000 00000000 00000000 00000000 00000000 ................................ 000080
00000000 00000000 00000000 00000000 00000000 00000000 00000000 00000000 ................................ 0000A0
00000000 00000000 00000000 00000000 00000000 00000000 00000000 00000000 ................................ 0000C0
00000000 00000000 00000000 00000000 00000000 00000000 00000000 00000000 ................................ 0000E0
00000000 00000000 00000000 00000000 00000000 00000000 00000000 00000000 ................................ 000100
00000000 00000000 00000000 00000000 00000000 00000000 00000000 00000000 ................................ 000120
00000000 00000000 00000000 00000000 00000000 00000000 00000000 00000000 ................................ 000140
435F079C 00000000 00000000 00000000 00000000 00000000 00000000 00000000 ..............................._C 000160
00000000 00000000 00000000 00000000 00000000 00304F46 4E495F45 4C49465F _FILE_INFO=..................... 000180
00000000 00000000 00000000 00000000 00000000 00000000 00000000 00000000 ................................ 0001A0
00000000 00000000 00000000 00000000 00000000 00000000 00000000 00000000 ................................ 0001C0
00000000 00000000 00000000 00000000 00000000 00000000 00000000 00000000 ................................ 0001E0

Dump of file SATURN:[PCCOMMON.DUMP.DLL]DGM.TMP;1 on 18-APR-1990 10:44..2.07
File ID (620,6,0)   End of file block 186 / Allocated 188

Virtual block number 185 (000000B9), 512 (0200) bytes

00000000 00000000 00000000 00000000 00000000 00000000 00000000 00000000 ................................ 000000
00000000 00000000 00000000 00000000 00000000 00000000 00000000 00000000 ................................ 000020
00000000 00000000 00000000 00000000 00000000 00000000 00000000 00000000 ................................ 000040
00000C94 08490000 00000198 1EEA0000 0C9C23EE 0148019A 00002000 00000000 ..... .....H.Y#....ð.......|..... 000060
00000000 00000CAE 3FE00000 00000000 FFFF4000 00000000 00003FE0 00000000 ....Å?.......a.........Å?Û....... 000080
00000000 40000000 00000000 3FE00000 00000000 0C883FE0 00000000 00000000 .........Å?|.......Å?.......a.... 0000A0
66666666 3FE00000 00000000 40000000 00000000 3FE00000 00000000 3FF00000 ..þ?......Å?.......a......Å?ffff 0000C0
06F44000 00000000 00003FE0 00000000 00000000 00000000 00000CCA 3FEE6666 ffY?ò...............Å?.......a¶ø 0000E0
00003F50 624D02F1 A9FC3FF0 00000000 00004066 80000000 00004009 21FB5443 CT=!.a......fa......þ?=`þøMbP?.. 000100
00004000 00000000 00003FE0 00000000 00004000 00000000 00004049 00000000 ....Ia.......a.......Å?.......a.. 000120
00004059 00000000 00004018 00000000 00003FE0 00000000 00004008 00000000 .....a......Å?........a......Ya.. 000140
00003FE0 00000000 00003FF0 00000000 00000000 00000000 00003FE0 00000000 ....Å?..............þ?......Å?.. 000160
0A004854 414D203A 00FD3E3E 4753404E 3C3C0000 00000000 00003FE0 00000000 ....Å?........<<NMSG>>».: MATH.. 000180
6C61766E 69006500 203A726F 72726520 746E696F 702D676E 6974616F 6C66202D - floating-point error: .e.inval 0001A0
00776F6C 66726576 6F006800 0A003020 79622065 64697669 64006700 0A006469 ld...g.divide by 0...h.overflow. 0001C0
6C746963 696C7078 65007000 0A00776F 6C667265 766F2068 63617473 006E000A ..n.stack overflow...p.explicitl 0001E0
```

```
Dump of file SATURN:[PCCOMMON.DUMP.DLL]DGM.TMP;1 on 18-APR-1990 10:44:12.07
File ID (620,6,0)   End of file block 186 / Allocated 188

Virtual block number 186 (000000BA), 512 (0200) bytes

 79000A0D 726F7272 65204E49 41404F44 0078000A 00646574 6172656E 65672079 y generated...x.DOMAIN error...y 000000
 0000000A 00726F72 72652053 534F4C54 007A000A 00726F72 72652047 4E495300 .SING error...z.TLOSS error..... 000020
 30303652 0003000A 00776F6C 66726576 6F206863 61747320 200A0030 30303652 R6000..- stack overflow.....R600 000040
 30365200 08000/.00 30207962 20656469 76696420 72656765 746E6920 200A0033 3..- integer divide by 0.....R60 000060
 60756772 6120726F 66206563 61707320 6867756F 6E652074 6F6E2020 0A003830 08..- not enough space for argum 000080
 61707320 686775^^ 6E652074 6F6E2020 0A003930 30365200 09000A00 73746E65 ents.....R6009..- not enough spa 0000A0
 206E7572 00FF00I  0D00FC00 0A0D746E 65606E6F 7269766E 6520726F 66206563 ce for environment...*......run- 0000C0
 20676E69 74616F6C 6620200A 00323030 36520002 0020726F 72726520 65606974 time error ...R6002..- floating  0000E0
 00000000 00000000 000000FF FF000A00 64656461 6F6C2074 6F6E2074 6E696F70 point not loaded................ 000100
 8E000200 02FF0000 00000000 00000000 00000000 00000000 00000000 00000000 ................................ 000120
 00000000 00000000 00000000 00000000 00000000 00000E07 9E000200 0000000C ................................ 000140
 00000000 00000000 00000000 00000000 00000000 00000000 00000000 00000000 ................................ 000160
 00000000 00000000 00000000 00000000 00000000 00000000 00000000 00000000 ................................ 000180
 00000000 00000000 00000000 00000000 00000000 00000000 00000000 00000000 ................................ 0001A0
 00000000 00000000 00000000 00000000 00000000 00000000 00000000 00000000 ................................ 0001C0
 00000000 00000000 00000000 00000000 00000000 00000000 00000000 00000000 ................................ 0001E0

Dump of file SATURN:[PCCOMMON.DUMP.DLL]DML.TMP;1 on 18-APR-1990 10:44:35.23
File ID (622,20,0)   End of file block 171 / Allocated 172

Virtual block number 1 (00000001), 512 (0200) bytes

 00000000 00000040 00000000 000000B8 0000FFFF 00000004 000000A8 016C5A4D MZl."...........|.......@....... 000000
 00000080 00000000 00000000 00000000 00000000 00000000 00000000 00000000 ................................ 000020
 6F6E6E61 63206061 72676F72 70207369 685421CD 4C01B821 CD09B400 0EBA1F0E ..¤..Ç.ël¦.LëlThis program canno 000040
 00000000 00000024 0A0D0D2E 65646F60 20534F44 206E6920 6E757220 65622074 t be run in DOS mode....$....... 000060
 00090012 00000000 00040000 00000400 00128000 AC608091 02520CA5 0505454E NE..€.R...m¯.................... 000080
 00000000 00000000 00010000 00040000 00000F77 08330821 00000000 0040001A ..@.À.Â.!.3.w................... 0000A0
 00120F00 00120327 00340F00 0D34024C 119C0F00 119C0123 02240F00 022400FA *.$...$.#.......L.4...4.'....... 0000C0
 243A0F00 243A06A1 05FC0F00 05FB063B 081E0F00 081D0584 25080F00 2507032A *..X...X........;.«....•.À.:$..:$ 0000E0
 0C080F00 0C080C37 0C240F00 0C24086E 08880F00 08870AAC 18880F00 188808EA ð.......¯.ñ...¡.n.$...$.7....... 000100
 53530F00 53530E17 00C20F00 00C20E09 018C0F00 018C0DEB 0E380F00 0E380CFF ..B...B.$.¥...¥...ô...ô...SS..SS 000120
 55595245 55514C40 44110000 6C606403 21900F21 1FE21357 020A0E21 00000000 ....!...W.â.!..!.dml...DMLQUERYU 000140
 52455551 4C404418 00024E58 54545241 54534C4D 44080001 59424445 54414450 PDATEDBY...DMLSTARTTXN...DMLQUER 000160
 4B4C4C41 59524555 514C4044 13000354 4E554F43 5443454A 424F4C45 444F4059 YMODELOBJECTCOUNT...DMLQUERYALLK 000180
 49545952 4555514C 4D441300 05455441 4552434C 4D440900 04534452 4F575945 EYWORDS...DMLCREATE...DMLQUERYTI 0001A0
 0007454D 414E4E47 49534544 59524555 514C4044 12000644 45544144 5055454D MEUPDATED...DMLQUERYDESIGNNAME.. 0001C0
 4F54534C 4D441200 08455059 54544345 4A424F44 44415245 544C4946 4C4D4416 .DMLFILTERADDOBJECTTYPE...DMLSTO 0001E0

Dump of file SATURN:[PCCOMMON.DUMP.DLL]DML.TMP;1 on 18-APR-1990 10:44:35.23
File ID (622,20,0)   End of file block 171 / Allocated 172

Virtual block number 2 (00000002), 512 (0200) bytes

 44505559 52455551 5245544C 49464C4D 44190009 48434142 4C4C4F52 4E585450 PTXNROLLBACK...DMLFILTERQUERYUPD 000000
 444F4D4C 4D440E00 0846464F 5245544C 49464C4D 440C000A 55454D49 54455441 ATETIMEU...DMLFILTEROFF...DMLMOD 000020
 440C0000 4554414C 45524E55 454C504D 49534C4D 4411000C 454D414E 45524C45 ELRENAME...DMLSIMPLEUNRELATE...D 000040
 4F525255 53485449 57455441 4552434C 4D441600 0E314E4C 52595245 55514C4D MLQUERYRLN1...DMLCREATEWITHSURRO 000060
 4E494C4D 44080010 44455441 45524345 4D495454 45534C4D 4411000F 45544147 GATE...DMLSETTIMECREATED...DMLIN 000080
 524C4D44 09001245 50595454 4F4C5359 52455551 4C4D4410 0011544F 4C535449 IISLOT...DMLQUERYSLOTTYPE...DMLR 0000A0
 5245544C 49465952 4555514C 4D441100 14455641 534C4D44 07001345 54414C45 ELATE...DMLSAVE...DMLQUERYFILTER 0000C0
 514C4D44 17001645 54/15453 59524555 51524554 4C49464C 4D441300 15544942 BIT...DMLFILTERQUERYSTATE...DMLQ 0000E0
 4C535952 4555514C 4D441000 17455341 42544345 4A424F4C 45444F4D 59^24555 UERYMODELOBJECTBASE...DMLQUERYSL 000100
 001A444C 45494654 45534C4D 44080019 4F444552 4C4D4407 0018455A 495..44F OTSIZE...DMLREDO...DMLSETFIELD.. 000120
 454C4544 4C4D4409 00184449 4C4D4445 50595454 4F4C5359 52455551 4C4D..15 .DMLQUERYSLOTTYPEDMLID...DMLDELE 000140
 4D441500 104F444E 5554554F 48544957 4E585454 52415453 4C4D4416 001C4554 TE...DMLSTARTTXNWITHOUTUNDO...DM 000160
 41524554 4C49464C 4D441300 1E594244 45544145 52435445 53524554 4C49464C LFILTERSETCREATEDBY...DMLFILTERA 000180
 43454A42 4F53494C 4D441200 204F444E 554C4D44 07001F44 524F5759 45484444 DOKEYWORD...DMLUNDO ..DMLISOBJEC 0001A0
 4945474E 41484345 54414552 43595245 55514C40 44180021 44455445 4C454454 TDELETEDI..DMLQUERYCREATECHANGEI 0001C0
 4D441000 23594244 45544144 50555445 53524554 4C49464C 4D441500 224F464E NFO"..DMLFILTERSETUPDATEDBY#..DM 0001E0
```

```
Dump of file SATURN:[PCCOMMON.DUMP.DLL]DML.TMP;1 on 18-APR-1990 10:44:35.23
File ID (622,20,0)   End of file block 171 / Allocated 172

Virtual block number 3 (00000003), 512 (0200) bytes

 43455445 4C454459 52455551 4C4D4418 0024444E 41465445 53524554 4C49464C LFILTERSETFANDS..DMLQUERYDELETEC 000000
 4555514C 4D440F0C 26455441 4C45524E 554C4D44 0800254F 464E4945 474E4148 HANGEINFO%..DMLUNRELATE&..DMLQUE 000020
 45544145 52435952 45555152 45544C49 464C4D44 17002753 5245544C 49465952 RYFILTERS'..DMLFILTERQUERYCREATE 000040
 45444F4D 4C4D4408 0029454D 414E5445 53524554 4C49464C 4D441000 28594244 DBY(..DMLFILTERSETNAME)..DMLMODE 000060
 53494C4C 4F4F5452 4548544F 4C45444F 4D595245 55514C4D 441A002A 5249444C LDIR*..DMLQUERYMODELOTHERTOOLLIS 000080
 45534544 4C4D440E 002C444E 41465952 45555152 45544C49 464C4D44 12002B54 T+..DMLFILTERQUERYFAND,..DMLDESE 0000A0
 0C002E54 4F4C5345 54414C45 52454C50 4D49534C 4D441300 2D4C4C41 5443454C LECTALL-..DMLSIMPLERELATESLOT... 0000C0
 4F534145 52524554 4C494654 45534C4D 4412002F 4C45444F 4D454552 464C4D44 DMLFREEMODEL/..DMLSETFILTERREASO 0000E0
 44000031 4F464E49 45474E41 48434554 414C4552 59524555 514C4D44 1800304E NO..DMLQUERYRELATECHANGEINFO1..D 000100
 55514C4D 441A0033 53414556 41534C4D 44090032 544E554F 43595245 55514C4D MLQUERYCOUNT2..DMLSAVEAS3..DMLQU 000120
 59524555 514C4D44 1900344F 464E4945 474E4148 43455441 4C45524E 55595245 ERYUNRELATECHANGEINFO4..DMLQUERY 000140
 45555152 45544C49 464C4D44 16003554 53494C54 43454C45 53444552 4544524F ORDEREDSELECTLIST5..DMLFILTERQUE 000160
 0037454D 414E4854 49574554 41455243 4C4D4411 00365344 524F5759 45485952 RYKEYWORDS6..DMLCREATEWITHNAME7. 000180
 49464449 4C4D440F 00385453 494C5443 454C4553 4C4C4159 52455551 4C4D4415 .DMLQUERYALLSELECTLIST8..DMLIDFI 0001A0
 4C4D440F 003A5443 454A424F 5443454C 45534C4D 440F0039 454C4241 5245544C LTERABLE9..DMLSELECTOBJECT:..DML 0001C0
 54584554 44494C4D 44595245 55514C4D 4417003B 59424445 54414450 55544553 SETUPDATEDBY;..DMLQUERYDMLIDTEXT 0001E0

Dump of file SATURN:[PCCOMMON.DUMP.DLL]DML.TMP;1 on 18-APR-1990 10:44:35.23
File ID (622,20,0)   End of file block 171 / Allocated 172

Virtual block number 4 (00000004), 512 (0200) bytes

 5458454E 4F464E49 4E4C5254 4F4C5359 52455551 4C4D4417 003C5443 454A424F OBJECT<..DMLQUERYSLOTRLNINFONEXT 000000
 44414552 4C4D4408 003E4554 41545354 43454C45 53595245 55514C4D 4413003D =..DMLQUERYSELECTSTATE>..DMLREAD 000020
 544C4946 4C4D4410 00404547 4E414843 5245544C 49464C4D 440F003F 54584554 TEXT?..DMLFILTERCHANGE@..DMLFILT 000040
 49545245 504F5250 5443454A 424F5445 534C4D44 16004159 4F525453 45445245 ERDESTROYA..DMLSETOBJECTPROPERTI 000060
 4C45444F 4D595245 55514C4D 44130043 4C45444F 4D57454E 4C4D440B 00425345 ESB..DMLNEWMODELC..DMLQUERYMODEL 000080
 464C4D44 12004545 4D414E54 4F4C5359 52455551 4C4D4410 0044454C 444E4148 HANDLED..DMLQUERYSLOTNAMEE..DMLF 0000A0
 440C0047 5453494C 45455246 4C4D4408 0046454D 414E5952 45555152 45544C49 ILTERQUERYNAMEF..DMLFREELISTG..D 0000C0
 53455441 4C45524E 55454C50 4D49534C 4D441500 484C4C41 5443454C 45534C4D MLSELECTALLH..DMLSIMPLEUNRELATES 0000E0
 56495443 41595245 55514C4D 4414004A 4E585450 4F54534C 4D440A00 49544F4C LOTI..DMLSTOPTXNJ..DMLQUERYACTIV 000100
 55514C4D 4419004C 5245544C 4946594C 5050414C 4D440E00 4B524554 4C494645 EFILTERK..DMLAPPLYFILTERL..DMLQU 000120
 5245544C 49464C4D 4416004D 544F4C53 4540414E 524F4654 43454A42 4F595245 ERYOBJECTFORNAMESLOTM..DMLFILTER 000140
 49525044 494C4D44 59524555 514C4D44 16004E45 56495355 4C434E49 46544553 SETFINCLUSIVEN..DMLQUERYDMLIDPRI 000160
 59524555 514C4D44 1:005054 58455445 54495257 4C4D440C 004F454D 414E544E NTNAMEO..DMLWRITETEXTP..DMLQUERY 000180
 45404954 5445534C 4D441100 51544E55 4F434C4F 4F545245 48544F4C 45444F4D MODELOTHERTOOLCOUNTQ..DMLSETTIME 0001A0
 474E4148 43545845 54;55449 52575952 4555514C 4D441B00 52444554 41445055 UPDATEDR..DMLQUERYWRITETEXTCHANG 0001C0
 59524555 514C4D44 11005445 4C494647 4F4C5445 534C4D44 0D00534F 464E4945 EINFOS..DMLSETLOGFILET..DMLQUERY 0001E0

Dump of file SATURN:[PCCOMMON.DUMP.DLL]DML.TMP;1 on 18-APR-1990 10:44:35.23
File ID (622,20,0)   End of file block 171 / Allocated 172

Virtual block number 5 (00000005), 512 (0200) bytes

 49544554 41445055 54455352 45544C49 464C4D44 17005545 5059544C 45444F4D MODELTYPEU..DMLFILTERSETUPDATETI 000000
 45494659 52455551 4C4D4400 00574C45 444F4D4E 45504F4C 4D440C00 564C454D MELV..DMLOPENMODELW..DMLQUERYFIE 000020
 4C454D49 544E4F49 54414552 43595245 55515245 544C4946 4C4D441B 0058444C LDX..DMLFILTERQUERYCREATIONTIMEL 000040
 55515443 454C4553 4C4D4413 005A4554 414C4552 454C504D 49534C4D 440F0059 Y..DMLSIMPLERELATEZ..DMLSELECTQU 000060
 5C59454B 45544147 4F525255 53595245 55514C4D 4414005B 544E554F 43595245 ERYCOUNT[..DMLQUERYSURROGATEKEY\ 000080
 5445534C 4D440F00 5D4F464E 4945474E 41484354 45535952 4555514C 4D441500 ..DMLQUERYSETCHANGEINFO]..DMLSET 0000A0
 0F005F4E 4C525952 45555154 43454C45 534C4D44 11005E45 4D414E4E 49474F4C LOGINNAME^..DMLSELECTQUERYRLN_.. 0000C0
 59524555 51524554 4C49464C 4D441900 60454C49 46474F4C 59524555 514C4D44 DMLQUERYLOGFILE`..DMLFILTERQUERY 0000E0
 6240544B 59464954 4F4E5952 4555514C 4D441100 61534550 59545443 454A424F OBJECTTYPESa..DMLQUERYNOTIFYHTMb 000100
 4E414843 5458454E 59524555 514C4D44 12006349 54475952 4555514C 4D440B00 ..DMLQUERYGTIc..DMLQUERYNEXTCHAN 000120
 544C4946 4C4D4400 0065454D 414E4C45 444F4D59 52455551 4C4D4411 00644547 GEd..DMLQUERYMODELNAMEe..DMLFILT 000140
 4D441800 67535443 454A424F 4C4C4159 52455551 4C4D4412 0066444E 49465245 ERFINDf..DMLQUERYALLOBJECTSg..DM 000160
 544C4946 4C4D4418 00685453 5249464F 464E494E 4C52544F 4C535952 4555514C LQUERYSLOTRLNINFOFIRSTh..DMLFILT 000180
 5245544C 49465445 534C4D44 0F006945 56495355 4C434E49 46595245 55515245 ERQUERYFINCLUSIVEi..DMLSETFILTER 0001A0
 55515245 544C4946 4C4D4417 00684E58 54574F52 524F424C 4D440C00 6A544942 BITj..DMLBORROWTXNk..DMLFILTERQU 0001C0
 4C4D440B 006D4E4C 52595245 55514C4D 4408006C 59424445 54414450 55595245 ERYUPDATEDBYl..DMLQUERYRLNm..DML 0001E0
```

Dump of file SATURN:[PCCOMMON.DUMP.DLL]DML.TMP;1 on 18-APR-1990 10:44:35.23
File ID (622,20,0)   End of file block 171 / Allocated 172

Virtual block number 6 (00000006), 512 (0200) bytes

544E4F49 54414552 43544553 5245544C 49464C4D 4419006E 4E4F5245 544C4946 FILTERONn..DMLFILTERSETCREATIONT 000000
440C0070 454D414E 454C4946 4C45444F 4D595245 55514C4D 4415006F 4C454D49 IMELo..DMLQUERYMODELFILENAMEp..D 000020
4D441100 72405448 45524955 5143414C 4D440D00 714E4654 494E4954 45534C4D MLSETINITFNq..DMLACQUIREHIMr..DM 000040
42444554 41455?43 5445534C 4D440F00 73594244 45544145 52435952 4555514C LQUERYCREATEDBYs..DMLSETCREATEDB 000060
59524555 514C4D44 16007545 4D414E4E 49474F4C 59524555 514C4D44 11007459 Yt..DMLQUERYLOGINNAMEu..DMLQUERY 000080
50544345 4A424F59 52455551 4C4D4418 00764449 4C4D4445 4D414E54 4E495250 PRINTNAMEDMLIDv..DMLQUERYOBJECTP 0000A0
464C4D44 17007844 494C4D44 59524555 514C4D44 00007753 45495452 45504F52 ROPERTIESw..DMLQUERYDMLIDx..DMLF 0000C0
49545952 4555514C 4D441300 7955454D 49544554 41445055 54455352 45544C49 ILTERSETUPDATETIMEUy..DMLQUERYTI 0000E0
49544145 52435952 45555152 45544C49 464C4D44 18007A44 45544145 5243454D MECREATEDz..DMLFILTERQUERYCREATI 000100
464C4D44 19007C45 54414552 43524554 4C49464C 4D440F00 7B55454D 49544E4F ONTIMEU{..DMLFILTERCREATE|..DMLF 000120
45544C49 464C4D44 19007D4C 454D4954 45544144 50555952 45555152 45544C49 ILTERQUERYUPDATETIMEL}..DMLFILTE 000140
45444F4D 59524555 514C4D44 18007E55 454D4954 4E4F4954 41455243 54455352 RSETCREATIONTIMEU~..DMLQUERYMODE 000160
00805445 53454C50 4D49534C 4D440C00 7F4F464E 4945474E 41484345 4D414E4C LNAMECHANGEINFO...DMLSIMPLESET.. 000180
40500553 4C4C4143 534F4408 00014C01 3F011200 8500A200 81001000 0A000100 .........Â.ç...?.L...DOSCALLS.PM 0001A0
594F5254 5345444D 454D0E50 41454845 54414552 4340454D 0D4D454D 034E4957 WIN.MEM.MEMCREATEHEAP.MEMDESTROY 0001C0
1248434F 4C424545 52464D45 4D0C4B43 4F4C4243 4F4C4C41 4D454D0D 50414548 HEAP.MEMALLOCBLOCK.MEMFREEBLOCK. 0001E0

Dump of file SATURN:[PCCOMMON.DUMP.DLL]DML.TMP;1 on 18-APR-1990 10:44:35.23
File ID (622,20,0)   End of file block 171 / Allocated 172

Virtual block number 7 (00000007), 512 (0200) bytes 42454552 46455241 48534D45 4D114B43 4F4C4243 4F4C4C41 45524148 534D454D MEMSHAREALLOCBLOCK.MEMSHAREFREEB 000000
45444441 5252450C 52524503 54524556 4E4F4345 52414853 4D454D0F 48434F4C LOCK.MEMSHARECONVERT.ERR.ERRADDE 000020
4C41564C 54550E4C 5455034E 46544958 4545564F 4D455252 52450F4E 46544958 XITFN.ERRREMOVEEXITFN.UTL.UTLVAL 000040
504C4C0A 5458454E 4C4C0644 4145484C 4C066C6C 6C6D6405 52545045 54414449 IDATEPTR.dmlll.LLHEAD.LLNEXT.LLP 000060
45484444 414C4C09 4444414C 4C054556 45495254 45524C4C 0A53554F 49564552 REVIOUS.LLRETRIEVE.LLADD.LLADDHE 000080
45444C4C 094F5245 5A4C4C06 4854474E 454C4C4C 08455445 4C45444C 4C084441 AD.LLDELETE.LLLENGTH.LLZERO.LLDE 0000A0
12475340 444E4553 4954470A 47534D54 534F5049 54470A49 54470359 4F525453 STROY.GTI.GTIPOSTMSG.GTISENDMSG. 0000C0
03455449 5257474F 4C08474F 4C03574F 444E4957 4C4F4F54 59524555 51495447 GTIQUERYTOOLWINDOW.LOG.LOGWRITE. 0000E0
4F440745 54495257 534F4408 45534F4C 43534F44 084E4550 4F534F44 074F4953 SIO.DOSOPEN.DOSCLOSE.DOSWRITE.DO 000100
03020002 03070124 99030501 0A060306 01089303 02010889 03030144 41455253 SREAD.............#.....$...#... 000120
03080200 F7030201 13220305 63030502 17700309 0108E303 05010023 0307ED03 .Ú..#....0....)....c..".....%.... 000140
02010F14 03080100 00030601 0000030F 01080903 03010531 03070106 D8031CD2 #..U....1....1.................. 000160
03060108 5F03080' 06180309 0101D703 0A920306 02129E03 13620305 02076703 .g....b..........#........_.... 000180
0A012349 0308010: 00030901 07C90306 8F030502 084E0302 01031D03 030100FC •.........N.......è.........I#.. 0001A0
029A0306 3F030000 03050318 05030801 0928030A 0103AE03 072F0305 0208DC03 .É..../..Û....(.............?.... 0001C0
05010010 03020120 10030801 06140308 01036A03 05010976 03060100 00030201 ........v....j........... ....... 0001E0

Dump of file SATURN:[PCCOMMON.DUMP.DLL]DML.TMP;1 on 18-APR-1990 10:44:35.23
File ID (622,20,0)   End of file block 171 / Allocated 172

Virtual block number 8 (00000008), 512 (0200) bytes

7F030501 0764030B 010AA103 0A0107DB 03020100 F8030801 0A26030A 0113F603 .-....&....%....Û....À....d..... 000000
03065A03 06020989 03030100 00030801 243F0305 0108E803 08010408 03070107 .........Ò....7$........¿....Z.. 000020
8703019C 0302020A 7E030301 0168031E 9A030502 03AD0303 01019D03 08010579 y.........Ù.......k....~........ 000040
020C4A03 020121AD 03080105 48030801 00780303 01024F03 0501068B 0306010F ....£....O....x....H....ÙI...J.. 000060
03010876 03060104 59030301 23530303 29030502 07A10306 01214E03 122B0305 ..+..NI...À....)..S#...Y....v... 000080
01029703 0801036B 03020105 AF030501 0C96030A EF030302 09DA030A 01092103 .I....Ö....ÿ........£....k....... 0000A0
0308010C 59030301 0981030A 0108BF03 03010212 03080114 49030801 03EF0305 ..ÿ....I.......................Y.... 0000C0
103E0302 0102CA03 0A010FFA 03020108 6C030A01 08990305 01083003 03010388 .....=..........l.....•....b....>. 0000E0
0106DF03 05010A37 03020113 B50302E5 03050203 64030282 03060221 93030501 ....I...ý..d....I..ç....7....Ô.. 000100
08390303 03051403 0201008E 030F010C DE030301 04870312 E2030502 04CC0308 ..â....ã.........â................9. 000120
03050407 A1030301 05F70305 01016603 0A090303 0222B003 05010C32 03096903 .Í..2....¯"......f....%....À.... 000140
6E614020 61746144 1600000B 88030801 081C030A 0104CF03 05170300 4F030438 ;..O.....ü...............Data Man 000160
00000000 00000000 00000000 00000000 00004950 41207265 79614C20 72656761 ager Layer API................... 000180
48E90374 00013000 8E0EFF26 008EA126 1E6E068E 088EFFFF 881E5657 000000C8 à...WV.¡...Ä..n.&À..&....=..t.ÖH 0001A0
0636FF26 000836FF 261E7006 8E0036E9 03750008 06082600 06A1261E 70068E00 ...p.&À..&....u.Ö6...p.&.6..&.6. 0001C0
6A0006A3 260008A3 26000088 1E70068E 0000FFFF 9A006A00 6A006A00 6A296A00 .j)j.j.j.j........p.¡..&È..&È..j 0001E0

```
Dump of file SATURN:[PCCOMMON.DUMP.DLL]DML.TMP;1 on 18-APR-1990 10:44:35.23
File ID (622,20,0)   End of file block 171 / Allocated 172

Virtual block number 9 (00000009), 512 (0200) bytes

D88E0008 881E5657 000088C8 CBC95F5E 1F0000E9 00018800 00FFFF9A 01F46800 .h¶......¡..Õ...^_èùà...WV.¡...Ä 000000
FF0085E9 0001880^ 06E90375 00003000 00FFFF9A 0042681E 5016FF7C 8680016A j...|..P.hB......=..u.Õ..¡..Õç.. 000020
68501680 4680009A E90001B8 0006E903 75000030 0000FFFF 9AFF7CB6 FFFF7E86 Ñ-..Ñ|......=..u.Õ..¡..Õ...F..Ph 000040
03750000 3D0000FF FF9A0052 681E5016 FF788680 006A006A 006A006A 046A0080 ..j.j.j.j.j...x..P.hR......=..u. 000060
03750000 3D0000FF FF9A4E20 68006AFF 7CB6FFFF 7EB6FF00 68E90001 880006E9 Õ..¡..Õk..Ñ-..Ñ|.j.h Ñ.....=..u. 000080
FF9AFF7C B6FFFF7E B6FF003E E90001B8 0000011F 9AFF7CB6 FFFF7EB6 FF0013E9 Õ...Ñ-..Ñ|......¡..Õ>..Ñ-..Ñ|... 0000A0
0000FFFF 9A0676FF 0876FF00 5C681E00 23E90001 880006E9 03750000 3D0000FF ...=..u.Õ..¡..Õ#..h\..v..v...... 0000C0
1E565700 000AC8CB C95F5E1F 0000E900 00880006 E90001B8 0006E903 75000030 =..u.Õ..¡..Õ..¡..Õ...^_èùà...WV. 0000E0
00003D00 00FFFF9A 5016F646 80006A00 6AFFFF68 01C46803 6A026AD8 8E007C88 ¡|..Áj.j.há.h..j.j..F-¯P.....=.. 000100
0006E903 75000030 008E06FF 26008EA1 261E6E06 8E0094E9 00008800 06E90375 u.Õ..¡..Õ....n.&À..&.....=..u.Õ.. 000120
16FA4680 0018E903 75000030 0000013C 9A5016FA 46800075 681E0079 E90001B8 j..Õy..hu..F•.P.<...=..u.Õ...F•. 000140
89FC4689 C028FA56 880048E9 00008800 06E90375 00003004 C483FFFF 00749A50 P.t....á.=..u.Õ..|..ÕH..V•+á.F•. 000160
04478826 FC5EC400 08168926 0006A326 1E70068E 02578826 078826FC 5EC4FE56 V±á^•&..&.W...p.&È..&....á^•&.G. 000180
1F0000E9 00018800 00FFFF9A FA76FF00 02168926 0000A326 1E72068E 06578826 &.W...r.&È..&.....v•.....¡..Õ... 0001A0
0103008F 000100A8 0103008E 000100F7 01030000 0001016A 00020000 CBC95F5E ^_èù....j.......¥............... 0001C0
02030000 00010160 00050018 00010080 01030017 0001010C 01030090 00010007 ■¯.......................m....... 0001E0

Dump of file SATURN:[PCCOMMON.DUMP.DLL]DML.TMP;1 on 18-APR-1990 10:44:35.23
File ID (622,20,0)   End of file block 171 / Allocated 172

Virtual block number 10 (0000000A), 512 (0200) bytes

00020027 00010215 01030024 00010180 01030020 00010065 01030085 00040179 y.......e... ...¯...$.......'... 000000
1E74068E 088EFFFF 881E5657 000008C8 00000045 0002004C 01030000 00120161 ■.......L...E...à...WV.¡...Ä..t. 000020
E9000088 0006E903 75000030 00000072 9A5016F8 46800000 36FF2600 0236FF26 &.6..&.6...F%.P.r...=..u.Õ..¡..Õ 000040
00009E9A F876FFFA 76FF0000 FFFF9AF8 76FFFA76 FF0010E9 0374010A 7E83008E ƒ..-..t.Õ...v•.v½......v•.v½.... 000060
16FC4680 1FE236FF 1FE436FF 0086E903 751FE406 081FE2A1 1FE41689 1FE2A300 .Èã...õ.Àã...õ.u.Õ...6õ..6ã..F•. 000080
300000FF FF9AF876 FFFA76FF 006CE984 90880006 E9037500 00300000 FFFF9A50 P.....=..u.Õ..¡..Õl..v•.v½.....= 0000A0
8A000088 0000E91F E416891F E2A30000 FFFF9AF8 76FFFA76 FF0015E9 03750000 ..u.Õ...v•.v½.....Èã...õ.Õ..¡..¤ 0000C0
7205FE56 88FC4688 001FE903 741C4739 260C4688 FC5EC41F E416891F E2A30000 ..Èã...õ.á^•.F.&9G.t.Õ...F•.V±.r 0000E0
0000E984 9088FF6E E90009E9 00008808 C483FFFF 07A29A06 76FF0876 FF505200 .RP.v..v..Å....á.¡..Õ..Õn.¡..Õ.. 000100
46800A76 FF0C76FF 0000F646 C7D88E00 08881E56 5700000A C80008CA C95F5E1F .^_èò..à...WV.¡...ÀúF-...v..v..F 000120
57882606 478826F8 5EC4006F E9849288 0006E903 75000030 00000020 9A5016F8 %.P̄. ...=..u.Õ..¡..Õo.á^%&.G.&.W 000140
07A29A50 52009305 FE5688FC 46885052 007205FE 5688FC46 88FE5689 FC468908 ..F•.V±.F•.V±.r.RP.F•.V±...RP.Å. 000160
46880676 FF0876FF 002DE984 9E880006 E9037400 127F8326 F85EC408 C483017C |..á.á^%&....t.Õ..¡..Õ-..v..v..F 000180
8804C483 FFFF1560 9AFC76FF FE76FF08 C483000C 07A29A50 52007205 FE5688FC •.V±.r.RP.Å.É..á..v±.v•.m....á.. 0001A0
76FF0A76 FF0C76FF D88E00FF 881E5657 00000EC8 0008CAC9 5F5E1F00 00E9F646 F-Õ...^_èò..à...WV.¡...Ä.v..v..v 0001C0
1E76068E 0198E984 AC880006 E90375D0 08FE5689 FC468906 C483FFFF 10A19A14 ..À....Ī..F•.V±.Àu.Õ..¡¯.Õ....v. 0001E0

Dump of file SATURN:[PCCOMMON.DUMP.DLL]DML.TMP;1 on 18-APR-1990 10:44:35.23
File ID (622,20,0)   End of file block 171 / Allocated 172

Virtual block number 11 (0000000B), 512 (0200) bytes

FA5689F8 46890000 FFFF9A00 6A006A00 6A006A10 CA680006 36FF2600 0836FF26 &.6..&.6..hò.j.j.j.j.......F%.V• 000000
00003000 0001149A 5016FC46 80F876FF FA76FF01 67E984AB 880006E9 0374000B .Àt.Õ..¡¨.Õg..v•.v½.F•.P.....=.. 000020
4807A29A 50520072 15FE5688 FC46880A 76FF0C76 FF0149E9 84928800 06E90375 u.Õ..¡..ÕI..v..v..F•.V±.r.RP.Å.H 000040
FC5EC408 C4830265 07A29A50 52008405 FE5688FC 46880E76 FF1076FF 08C48302 ..á..v..v..F•.V±.Ç.RP.Å.e..á.á^• 000060
FE5688FC 468804C4 83032208 F89A5052 000A05FE 5688FC46 881C4789 2614468B .F.&.G..F•.V±...RP.%."..á..F•.V± 000080
46880006 E9037500 0030F246 8908C483 FFFF0000 9AFC76FF FE76FF50 52000405 ...RP.v±.v•......á..F·=..u.Õ...F 0000A0
08F65689 F4468906 C483FFFF 085C9AFC 76FFFE76 FF1477FF 26FC5EC4 0000E9F2 ·ÕÀ.á^•&.w..v±.v•.\....á..F¶.V-. 0000C0
5788260E 47882600 10578326 010E4783 26FC5EC4 00A8E984 94880006 E90374D0 Àt.Õ..¡..Õ˙.á^•&.G..&.W..&.G.&.W 0000E0
5EC45052 002E05FE 5688FC46 881A77FF 26FC5EC4 09578926 07478926 F45EC410 .á^¶&.G.&.W.á^•&.w..F•.V±...RPá^ 000100
1E478926 FC5EC405 57882603 478826F4 5EC40000 FFFF9A03 77FF2605 77FF26F4 ¶&.w.&.w......á^¶&.G.&.W.á^•&.G. 000120
000F05F6 5688F446 8804C483 015008F8 9A505200 0805F656 88F4468B 20578926 &.W .F¶.V-...RP.%.P..á..F¶.V-... 000140
0676FF08 76FF0184 87892601 86878926 000088FC 5EC404C4 83FFFF00 009A5052 RP......á.á^•¡..&..Ñ.&..Ç..v..v. 000160
57000012 C80010CA C95F5E1F 0000E90A C4830184 05EF9AFC 76FFFE76 FF1276FF .v..v±.v•.ÿ.Ç..á.Õ...^_èò..à...W 000180
30000003 D09A5016 F0468000 0036FF26 000236FF 261E7406 8ED88E01 A4881E56 V.¡É..Ä..t.&.6..&.6...Fb.P.Å...= 0001A0
469AF076 FFF276FF 00000042 9AF076FF F276FF01 70E90000 880006E9 03750000 ..u.Õ..¡..Õp..v·.vÞ.B....v·.vÞ.F 0001C0
9A5016FC 4680F476 FFF676FF 009EE903 75F64608 F44688F6 5689F446 89000004 ....F¶.V-.F¶.F-u.Õ...v-.v¶.F•.P. 0001E0
```

```
Dump of file SATURN:[PCCOMMON.DUMP.DLL]DML.TMP;1 on 18-APR-1990 10:44:35.23
File ID (622,20,0)   End of file block 171 / Allocated 172

Virtual block number 12 (0000000C), 512 (0200) bytes

 38E90374 1C473926 10468BFC 5EC40128 E9000088 0006E903 75000030 0000049F ....=..u.Õ..|..Õ+.á^=.F.&9G.t.Õ; 000000
 E9037400 003008C4 8304C507 D89A0A76 FF0C76FF 50520084 05FE5688 FC468800 ..F=.V&.Ç.RP.v..v..Ä.é..á.=..t.Õ 000020
 FFF276FF 00E1E90A C4830505 05EF9AFC 76FFFE76 FF0E76FF 0676FF08 76FF001A ...v..v..v..v&.v=.ÿ....á.ÕÄ..v.. 000040
 F65689F4 46890C30 004D9AF0 76FFF276 FF0014E9 03750000 30000000 889AF076 vÞ.....=..u.Õ...v..vÞ.M....F¶.V- 000060
 000636FF 26000836 FF261E76 068EFF57 E9F65689 F4468900 008A0000 88000CE9 Õ..|..¤...F¶.V-ÕW...v.&.6..&.6.. 000080
 84A88800 06E90374 0008FA56 89F84689 000001E6 9A006A00 6A006A00 6A10CA68 hò.j.j.j.j..Ì....F%.V°.Àt.Õ..|.. 0000A0
 5CE98492 880006E9 03750000 30000002 099A5016 FC4680F8 76FFFA76 FF007AE9 Õz..v°.v%.F=.P.....=..u.Õ..|..Õ\ 0000C0
 10468BFC 5EC408C4 83022F07 A29A5052 008405FE 5688FC46 880A76FF 0C76FF00 ..v..v..F=.V&.Ç.RP.Å./..á.á^=.F. 0000E0
 EE468800 06E90375 000030EE 468904C4 8302A400 009AF876 FFFA76FF 1C4.'926 &.G..v°.v%...Ê..á..FŸ=..u.Õ...FŸ 000100
 5F5E1F00 00E90AC4 83035C05 EF9AFC76 FFFE76FF 0E76FF06 76FF0876 FF00.<E9 Õ...v..v..v..v&.v=.ÿ.\..á.Õ...^_ 000120
 76FFFC46 89FE4689 00008800 00FA46C7 D88E0373 881E5657 000006C8 000CCAC9 èò..à...WV.|8..ÀÚF°..|...F&.F=.V 000140
 0006E903 74FE4608 FC4688FE 5689FC46 8906C483 056810A1 9A1076FF 0A76FF0C ..v..v..Ä.h..á..F=.V&.F=.F&t.Õ.. 000160
 0000E90A C4830424 05EF9AFC 76FFFE76 FF0E76FF 0676FF08 76FF001A E9849788 |..Õ...v..v..v..v&.v=.ÿ.$..á.Õ.. 000180
 00109A37 FF260277 FF26085E C4088E05 1C881E56 57000000 C8000CCA C95F5E1F .^_èò..à...WV.|...Äá^.&.w.&.7... 0001A0
 068E0036 E9037500 08060826 0006A126 1E76068E 0048E903 74000090 3E83053A :..>...t.ÕH...v.&À..&....u.Õ6... 0001C0
 881E7606 8E0000FF FF9A006A 006A006A 006A296A 000636FF 26000836 FF261E76 v.&.6..&.6..j)j.j.j.j........v.| 0001E0

Dump of file SATURN:[PCCOMMON.DUMP.DLL]DML.TMP;1 on 18-APR-1990 10:44:35.23
File ID (622,20,0)   End of file block 171 / Allocated 172

Virtual block number 13 (0000000D), 512 (0200) bytes

 C8C8C95F 5E1F0000 E9000188 0000FFFF 9A01F468 006A0006 A3260008 A3260000 ..&È..&È..j.h¶......|..Õ...^_èùà 000000
 0000FFFF 9A5016F4 4680286A 026A1A77 FF26065E C4D88E05 7F881E56 5700000C ...WV.|...Àá^.&.w.j.j(.F¶.P..... 000020
 00300000 03889A50 16FC4680 F476FFF6 76FF0144 E9849488 0006E903 75000030 =..u.Õ..|..ÕD..v-.v¶.F=.P.....=. 000040
 026A08C4 8304050A 249AFC76 FFFE76FF 006A286A 0126E984 92880006 E9037500 .u.Õ..|..Õ&.j(j..v&.v=.$....á.j. 000060
 0006E903 75000030 0000FFFF 9A5016F8 4680FC76 FFFE76FF FFFF6805 9068036A j.h..h...v&.v=.F%.P.....=..u.Õ.. 000080
 C408C483 027E0000 9A0676FF 0876FF50 52000405 FE5688FC 468800EC E9849288 |..Õ&..F=.V&...RP.v..v....~..á.á 0000A0
 08578926 06478926 08568806 4688FC5E C4025789 26078926 F65688F4 4688FC5E ^=.F¶.V-&..&.W.á^=.F..V.&.G.&.W. 0000C0
 8826065E C41A5789 26184789 26FA5688 F84688FC 5EC41447 89260A46 88FC5EC4 á^=.F.&.G.á^=.F%.V°&.G.&.W.á^.&. 0000E0
 C40E4789 26FC5EC4 12478826 065EC40C 5789260A 478926FC 5EC40857 88260647 G.&.W.á^=&.G.&.W.á^.&.G.á^=&.G.á 000100
 3D0000FF FF9A5052 001605FE 5688FC46 88006A10 478926FC 5EC41C47 8826065E ^.&.G.á^=&.G.j..F=.V&...ºP.....= 000120
 57892607 89260C5E C4025788 26078826 FC5EC400 45E98495 880006E9 03750000 ..u.Õ..|..ÕE.á^=&..&.W.á'.&..&.W 000140
 5052003E 05085688 0646881A 77FF2606 5EC40001 2647C726 FC5EC400 9006FF02 .....á^=&ÚG&..á^.&.w..F..V..>.RP 000160
 F7881E56 57000008 C8C8C95F 5E1F0000 E90000FF FF9A37FF 260277FF 26FC5EC4 á^=&.w.&.7.....Õ...^_èùà...WV.|X 000180
 43E98491 880006E9 03750000 30000006 2A9A5016 F8468006 76FF0876 FFD88E05 ..Ä.v..v..F%.P.*...=..u.Õ..|..ÕC 0001A0
 5016FC46 801477FF 26F85EC4 0030E984 9E880006 E9037400 127F8326 F85EC400 .á^Y&....t.Õ..|..Õ0.á^Y&.w..F=.P 0001C0
 C483FFFF 00009A37 FF260277 FF26065F C426F85E C4FC76FF FE76FF00 00FFFF9A ......v&.v=á^Y&á_.&.w.&.7......á 0001E0

Dump of file SATURN:[PCCOMMON.DUMP.DLL]DML.TMP;1 on 18-APR-1990 10:44:35.23
File ID (622,20,0)   End of file block 171 / Allocated 172

Virtual block number 14 (0000000E), 512 (0200) bytes

 FC4680 0A 76FF0C76 FFD88E07 6F881E56 57000004 C80004CA C95F5E1F 0000E908 .Õ...^_èò..à...WV.|o..Ä.v..v..F= 000000
 E9037400 127F8326 FC5EC400 3FE98491 880006E9 03750000 30000007 7F9A5016 .P.....=..u.Õ..|..Õ?.á^=&....t.Õ 000020
 A29A5052 00840508 57882606 478826FC 5EC40676 FF0876FF 002CE984 9E880006 ..|..Õ,..v..v.á^=&.G.&.W..Ç.RP.Å 000040
 57000200 C80008CA C95F5E1F 0000E906 5307679A 0A76FF0C 76FF08C4 83064907 .I..á..v..v..g.S.Õ...^_èò..à...W 000060
 80009268 1E08C483 087807A2 9A5016FE 0086800A 76FF0C76 FFD88E07 E3881E56 V.|D..Ä.v..v....&.P.Å.x..á..h... 000080
 5E1F0000 FFFF9A50 16FE0086 800676FF 0876FF08 C4830831 075C9A50 16FE0086 ..&.P.\.1..á..v..v....&.P......^ 0000A0
 9A5016F8 46800A76 FF0C76FF 0000F246 C7D88E08 53881E56 57000012 C8C8C95F èùà...WV.|S..ÀÚF....v..v..F%.P. 0000C0
 C40032E9 03770012 7F8326F8 5EC4016E E98491 88 0006E903 75000030 00000954 T...=..u.Õ..|..Õn.á^Y&....w.Õ2.á 0000E0
 0676FF08 76FF08C4 83083F08 489A0A76 FF0C76FF 0676FF08 76FF1247 FF26F85E ^Y&.G..v..v..v..v..K.?..á..v..v. 000100
 89FC4689 08578826 06478826 F85EC401 2FE908C4 83018A16 189AF876 FFFA76FF .v°.v%......á.Õ/.á^Y&.G.&.W..F=. 000120
 266A026A 1A77FF26 FC5EC401 08E984A7 880006E9 03750024 7F8326FC 5EC4FE56 V&á^=&..$.u.Õ..|Ì.Õ..á^=&.w.j.j& 000140
 4680F476 FFF676FF 00E8E984 94880006 E9037500 00300000 060C9A50 16F44680 .F¶.P.....=..u.Õ..|..Õò..v-.v¶.F 000160
 EE76FFF0 76FF006A 266A00CA E9849288 0006E903 75000030 000007F3 9A5016EE Ÿ.P.µ...=..u.Õ..|..Õò.j&j..vÞ.vŸ 000180
 26078826 F85EC40A 57892608 478926FE 5688FC46 88EE5EC4 08C48308 660A249A .$.f..á.á^Y.F=.V&&.G.&.W.á^Y&..& 0001A0
 5EC42C57 89262A47 8926F656 88F44688 FC5EC402 57892607 8926EE5E C4025788 .W.á^Y&..&.W.á^=.F¶.V-&.G°&.W,á^ 0001C0
 C4000126 47C72606 5FC426F8 5EC40001 2447C726 FC5EC424 57892622 478926F8 Y&.G"&.W$á^=&ÚG$..á^Y&á_.&ÚG&..á 0001E0
```

Dump of file SATURN:[PCCOMMON.DUMP.DLL]DML.TMP;1 on 18-APR-1990 10:44:35.23
File ID (622,20,0)   End of file block 171 / Allocated 172

Virtual block number 15 (0000000F), 512 (0200) bytes

```
0676FF08 76FF08C4 8308E508 4B9A0A76 FF0C76FF 0676FF08 76FF1247 FF26F85E ^¥&.G..v..v..v..v..K.[..á..v..v. 000000
0003A49A 5052004E 05FE5688 FC4688F2 468908C4 8308F90C D99AF876 FFFA76FF .v".v½.].'..á..F..F•.V±.N.RP.Ê.. 000020
0000E9F2 46880E57 89260C47 8926EE5E C4025788 26078826 565FC426 FC5EC400 .á^•&á_V&..&.W.á^Y&.G.&.W..F.Ō.. 000040
46800E76 FF1076FF 0000F646 C7D88E08 98881E56 5700000E C80008CA C95F5E1F .^_èò.¯à...WV.|...ÄúF-...v..v..F 000060
16F2468D 0676FF08 76FF00E1 E98491B8 0006E903 75000030 00000A72 9A5016F8 ½.P̄.r...=..u.Ō..|..ŌĀ..v..v..F·. 000080
89085788 26064788 26F85EC4 00C3E984 92880006 E9037500 00300000 08809A50 P.¯...=..u.Ō..|..Ōü.á^¥&.G.&.W.. 0000A0
001AE903 74065739 260023E9 03740447 39261056 880E4688 F25EC4FE 5689FC46 F•.V±á^·.F..V.&9G.t.Ō#.&^V.t.Ō.. 0000C0
0077E984 AA880006 E9037402 227F8326 FC5EC400 00E90375 01227F83 26FC5EC4 á^•&..".u.Ō..á^•&..".t.Ō..)¯.Ōw. 0000E0
0E76FF10 76FF0A76 FF0C76FF 1247FF26 F85EC400 32E90377 00127F83 26F85EC4 á^¥&....w.Ō2.á^¥&.G..v..v..v..v. 000100
C40038E9 08C48308 3916189A F876FFFA 76FF0A76 FF0C76FF 08C48308 25084B9A .K.X..á..v..v..v".v½...9..á.Ō8.á 000120
0A76FF0C 76FF08C4 8309E508 4B9A0E76 FF1076FF 0A76FF0C 76FF1247 FF26F85E ^¥&.G..v..v..v..v..K.[..á..v..v. 000140
0EC8000C CAC95F5E 1F0000E9 F64688F6 468908C4 8309F90E 8C9AF876 FFFA76FF .v".v½...'..á..F-.F-Ō...^_èò..à. 000160
3000000A 549A5016 F8468D06 76FF0876 FF0000F2 46C7D88E 0A3F881E 56570000 ..WV.|7..ÄúF ...v..v..F½.P̄.T...= 000180
47FF26F8 5EC40000 E9037700 127F8326 F85EC400 C6E98491 880006E9 03750000 ..u.Ō..|..Ō6.á^¥&....w.Ō..á^¥&.G 0001A0
00247F83 26FC5EC4 FE5689FC 46890857 88260647 8826F85E C400ACE9 00008812 .|..Ō¯.á^¥&.G.&.W..F•.V±á^=&..$. 0001C0
5688FC46 881247FF 26F85EC4 00012447 C726FC5E C40088E9 84A78800 06E90375 u.Ō..|Ī.Ō..á^•&úG$..á^¥&.G..F•.V 0001E0
```

Dump of file SATURN:[PCCOMMON.DUMP.DLL]DML.TMP;1 on 18-APR-1990 10:44:35.23
File ID (622,20,0)   End of file block 171 / Allocated 172

Virtual block number 16 (00000010), 512 (0200) bytes

```
0A0D9A50 52004E05 FE5688FC 4688005B E9037500 0800000B FE9A5052 004E05FE ±.N.RP.±....Åu.Ō(..F•.V±.N.RP... 000000
05FE5688 FC468800 34E90375 00080000 FFFF9A50 52004E05 FE5688FC 46880000 ...F•.V±.N.RP......Åu.Ō4..F•.V±. 000020
FE5688FC 46880000 FFFF9AF4 76FFF676 FFF65689 F4468900 0003AF9A 5052004E N.RP.E....F¶.V-.v-.v¶......F•.V± 000040
56570000 06C80004 CAC95F5E 1F0000E9 F24688FF 85E90000 FFFF9A50 52004E05 .N.RP.....Ōç..F·Ō...^_èò..à...WV 000060
03750000 3000000B 689A5016 FC468D06 76FF0876 FF0000FA 46C7D88E 0856881E .|V..ÄúF*...v..v..F=.P̄.k...=..u. 000080
26FC5EC4 007DE984 9E880006 E9037400 127F8326 FC5EC400 90E98491 880006E9 Ō..|..Ō..á^•&....t.Ō..|..Ō).á^•& 0000A0
9AFC76FF FE76FF00 11E90375 24470826 22478826 FC5EC400 21E90374 01127F83 .....t.Ōl.á^•&.G"&.G$u.Ō...v±.v•. 0000C0
16DF9AFC 76FFFE76 FF0011E9 03770112 6F8326FC 5EC4FA46 8904C483 FFFF0000 .....á..F*á^•&.o..w.Ō...v±.v•.Ō. 0000E0
065FC426 FC5EC400 1AE90374 00287F83 26065FC4 26FC5EC4 0031E904 C4830807 ....á.Ō1.á^•&á_.&..(.t.Ō..á^•&á_. 000100
0004CAC9 5F5E1F00 00E9FA46 88000026 47C72606 5FC426FC 5EC40000 2447C726 &úG$..á^•&á_.ÈúG&...F*Ō...^_èò¯. 000120
7500003D 00000085 9A5016F8 46800676 FF0876FF D88E0C52 881E5657 00001AC8 à...WV.|R..Ā.v..v..F½.P.ç...¯=..u 000140
FF26F85E C4FE5689 FC468908 578B2606 478826F8 5EC40246 E98491B8 0006E903 .Ō..|..ŌF.á^¥&.G.&.W..F•.V±á^¥&. 000160
9A9A1677 FF26F85E C40000FF FF9A1877 FF261A77 FF26F85E C40000FF FF9A0477 w......á^¥&.w.&.w......á^¥&.w... 000180
3E05FE56 88FC4688 00000ECB 9A505200 3E050857 88260647 8826F85E C400000E ...á^¥&.G.&.W..>.RP.ù....F•.V±.> 0001A0
8DEC76FF EE76FF00 78E90375 EE4608EC 4688EE56 89EC4689 00000E08 9A505200 .RP......F&.VŸ.F&.FŸu.Ō(..vŸ.v&. 0001C0
08568806 4688F05E C40189E9 00008800 06E90375 00003000 000E829A 5016F046 Fþ.P.ý...=..u.Ō..|..Ō¿.á^þ.F..V. 0001E0
```

Dump of file SATURN:[PCCOMMON.DUMP.DLL]DML.TMP;1 on 18-APR-1990 10:44:35.23
File ID (622,20,0)   End of file block 171 / Allocated 172

Virtual block number 17 (00000011), 512 (0200) bytes

```
9A505200 3E05FE56 88FC4688 0040E900 03E90374 02573926 000CE903 74073926 &9.t.Ō..&9W.t.Ō..Ō@..F•.V±.>.RP. 000000
89EC4689 00000E06 9A505200 3E05FE56 88FC4688 0019E903 7500003D 00000F31 1...=..u.Ō...F•.V±.>.RP.ø....F&. 000020
9A505200 3E05FE56 88FC4688 FF7AE9EE 5689EC46 8900008A 00008800 0CE9EE56 VŸŌ..|..¤...F&.VŸŌz..F•.V±.>.RP. 000040
FF0034E9 0375D008 00000807 9A505200 3E05FE56 88FC4688 00900EFF 00000F67 g........F•.V±.>.RP.ø....Åu.Ō4.. 000060
5EC40112 E9E64688 0006E903 7500003D E6468904 C4830CD0 00EE9AF8 76FFFA76 v".v½.Ÿ.Å..á..F|=..u.Ō...F|Ō..á^ 000080
0F769A37 FF260277 FF26F85E C400FDE9 849F8800 000E8E9A 37FF2602 77FF26F8 ¥&.w.&.7.....|..Ō=.á^¥&.w.&.7.v. 0000A0
16E8468D 000036FF 26000236 FF261E74 068E0000 FFFF9A1A 77FF26FC 5EC40000 ..á^•&.w.........t.&.6..&.6...FŌ. 0000C0
FF00000B EE9AE876 FFEA76FF 008CE984 92880006 E9037500 00300000 0EF79A50 P.X...=..u.Ō..|..ŌŸ..vō.vŌ.Ÿ.... 0000E0
76FFEE76 FF0075E9 0375EE46 08EC4688 EE5689EC 46890000 0F449AE8 76FFEA76 vō.vŌ.D....F&.VŸ.F&.FŸu.Ōu..vŸ.v 000100
26078826 FC5EC400 77E90000 880006E9 03750000 3000000C 679A5016 F44680EC &.F¶.P.g...=..u.Ō..|..Ōw.á^•&..& 000120
E876FFEA 76FF0036 E90003E9 03740257 3926000C E9037407 3926F45E C4025788 .W.á^¶&9.t.Ō..&9W.t.Ō..Ō6..vō.vŌ 000140
0CE9EE56 89EC4689 00000C15 9AE876FF EA76FF00 14E90375 00003D00 0004339A .3...=..u.Ō...vō.vŌ......F&.VŸŌ. 000160
FF26FC5E C400000C 369AE876 FFEA76FF FF80E9EE 5689EC46 8900008A 00008800 .|..¤...F&.VŸŌ...vō.vŌ.6...á^•&. 000180
18881E56 57000008 C80004CA C95F5E1F 0000E900 00880000 0C269A37 FF260277 w.&.7.&...|..Ō...^_èò..à...WV.|. 0001A0
42E98491 880006E9 03750000 3000000F C69A5016 FC46800A 76FF0C76 FFD88E00 ..Ä.v..v..F=.P.6...=..u.Ō..|..Ō8 0001C0
E9037500 00300000 00289A50 16F8468D 1E77FF26 2077FF26 065FC426 FC5EC400 .á^•&á_.&.w &.w..F½.P.(...=..u.Ō 0001E0
```

Dump of file SATURN:[PCCOMMON.DUMP.DLL]DML.TMP;1 on 18-APR-1990 10:44:35.23
File ID (622,20,0)   End of file block 171 / Allocated 172

Virtual block number 18 (00000012), 512 (0200) bytes

```
00008802 57892607 8926065E C405578B 26034788 26F85EC4 0018E984 92880006 ..|..Ō..á^¼&.G.&.W.á^.&..&.W.|.. 000000
16FC4680 0A76FF0C 76FFD88E 0F8FB81E 56570000 04C80008 CAC95F5E 1F0000E9 Ō...^_èò..à...WV.|...Ä.v..v..F=. 000020
8926065E C414478B 26FC5EC4 0013E984 91880006 E9037500 00300000 0F9F9A50 P.....=..u.Ō..|..Ō..á^=&.G.á^.&. 000040
0E76FF10 76FFD8AE 1002881E 56570000 04C80008 CAC95F5E 1F0000E9 00008807 .|..Ō...^_èò..à...WV.|...Ä.v..v. 000060
2606478B 26FC5EC4 0032E984 91880006 E9037500 00300000 10129A50 16FC4680 .F=.P.....=..u.Ō..|..Ō2.á^=&.G.& 000080
C7260001 07C72606 5EC408C4 83097307 A29A0A76 FF0C76FF 50520072 0508578B .W..r.RP.v..v..Ä.s..á.á^.&ú...&ú 0000A0
74068ED8 8E10468B 1E565700 000CC800 0CCAC95F 5E1F0000 E9000088 00000247 G...|..Ō...^_èò..à...WV.|F..Ä..t 0000C0
00008800 09E90375 C0003000 0011099A 5016F446 8D000036 FF260002 36FF261E .&.6..&.6...F¶.P.....=..u.Ō..|.. 0000E0
89F84689 00001171 9AF476FF F676FF00 0000849A F476FFF6 76FF00C0 E90000BA ¤..Ōá..v-.v¶......v-.v¶.q....F%. 000100
00003000 0010569A 5016FC46 8DF876FF FA76FF00 90E90375 FA4608F8 4688FA56 V°.F%.F°u.Ō...v°.V%.F=.P.V...=.. 000120
FC4688800 2AE90374 1C473926 064688FC 5EC40078 E90000BA 00008800 09E90375 u.Ō..|..¤..Ōx.á^=.F.&9G.t.Ō°..F= 000140
46880009 E9037400 003008C4 83108107 089A0876 FF0A76FF 50520072 05FE5688 .V±.r.RP.v..v..Ä....á.=..t.Ō...F 000160
F476FFF6 76FF0014 E9037500 00300000 00F09AF4 76FFF676 FF003FE9 FE5688FC =.V±Ō?..v-.v¶.Þ...=..u.Ō...v-.v¶ 000180
000088FF 65E9FA56 89F84689 00008A00 0088000C E9FA5689 F8468900 0000949A ......F%.V°Ō..|..¤...F%.V°Ōe.|.. 0001A0
00020004 000610E8 02030143 0008088A 0203001E 90CBC95F 5E1F0000 E90000BA ¤..Ō...^_èù........C...Ō...à... 0001C0
0203000F 000602FA 02030000 00030335 00020071 000310C1 02030000 00020AF3 µ.......Ž...q...5.......°...Ō... 0001E0
```

Dump of file SATURN:[PCCOMMON.DUMP.DLL]DML.TMP;1 on 18-APR-1990 10:44:35.23
File ID (622,20,0)   End of file block 171 / Allocated 172

Virtual block number 19 (00000013), 512 (0200) bytes

```
01030085 00040664 02030000 00090E58 000200EF 00060E30 020300E5 00060758 [...[...0...ÿ...X.......d....... 000000
00020014 0003070B 02030000 000A0CB2 000200FB 00060E44 02030020 000105E0 Å... ...D...%..ý............... 000020
0005002E 00010053 01030000 000D07CC 00020092 00040063 02030000 000C0400 [.......c.......à.......S....... 000040
00020000 00101141 00020022 0003006F 02030000 000E068A 00020577 00020656 V...w............o...".....A....... 000060
0203004C 00030936 02030045 000205C7 01030030 0002047C 01030000 001210A9 `.......|...=...ú...E...ó...L... 000080
0000005F 00030E79 020300C2 0006115E 0203008B 00061000 0203012C 000707B1 Ÿ...,...[...£...^...ô...y....... 0000A0
5E1F08C4 83FFFF07 A29A0676 FF0876FF 0094681E D88EFFFF B81E5657 000000C8 à...WV.|...Ä.h...v..v..Ä....Ā..^ 0000C0
300000FF FF9A5016 FC4680DA 76FF0C76 FFD88E00 08881E56 57000004 CBCBC95F _èùà...WV.|...Ä.v..v..F=.P.....= 0000E0
0876FF50 52007205 08578B26 06478B26 FC5EC400 24E98491 B80006E9 03750000 ..u.Ō..|..Ō&.á^=&.G.&.W...r.RP.v. 000100
B81E5657 000004C8 0008CAC9 5F5E1F00 00E90000 8808C483 001907A2 9A0676FF .v..Ä....á.|..Ō...^_èò..à...WV.| 000120
E98491B8 0006E903 75000030 0000003B 9A5016FC 4680DA76 FF0C76FF D88E002B +..Ä.v..v..F=.P.;...=..u.Ō..|..Ō 000140
FF0876FF 1677FF26 FC5EC400 18E90374 00003000 00FFFF9A 0676FF08 76FF0031 1..v..v.......=..t.Ō..á^=&.w..v.. 000160
56570000 08C80008 CAC95F5E 1F0000E9 84A88800 06E90009 E90000FF FF9A0676 v......Ō..Ō..|´.Ō...^_èò..à...WV 000180
91880006 E9037500 003ᴗ0000 00909A50 16FC4680 0676FF08 76FFD88E 0080881E .|...Ä.v..v..F=.P.....=..u.Ō..|. 0001A0
16F84680 5002E0C1 0A468800 6A1677FF 26FC5EC4 000C5683 010A4683 003⁻984 .Ō]..F...V..á^=&.w.j..F.èÅ.P.F%. 0001C0
FA76FF00 6A5002E0 C10A468B 002DE984 98880006 E9037500 00300000 FFFF??50 P.....=..u.Ō..|..Ō·..F.èÅ.Pj..v° 0001E0
```

Dump of file SATURN:[PCCOMMON.DUMP.DLL]DML.TMP;1 on 18-APR-1990 10:44:35.23
File ID (622,20,0)   End of file block 171 / Allocated 172

Virtual block number 20 (00000014), 512 (0200) bytes

```
00E90000 88025789 26078926 FA5688F8 46880E5E C408C483 00660A24 9AF876FF .v%.$.f...á.á^..F%.V°&..&.W.|..Ō. 000000
04C483FF FF01A69A 0A76FF0C 76FFD88E 00E2881E 56570000 00C8CBC9 5F5E1F00 ..^_èùà...WV.|ä..Ä.v..v..Ī....á. 000020
1F0000E9 00008800 03E98492 880006E9 0374270F 3F812606 5EC40789 26065EC4 á^.Ī..á^.&.?.'t.Ō..|..Ō..|..Ō... 000040
00F29A50 16FC4680 0676FF08 76FFD88E 016E881E 56570000 04C8000C CAC95F5E ^_èò..à...WV.|n..Ä.v..v..F=.P.·. 000060
16C8C8C9 5F5E1F00 00E9078B 26FC5EC4 0006E927 0F880006 E9037500 00300000 ..=..u.Ō..|.'Ō..á^=&..Ō...^_èùà. 000080
30000002 959A5016 F4468006 76FF0876 FF0000EA 46C7D88E 01AE881E 56570000 ..WV.|Ō..ÄúFō...v..v..F¶.P.....= 0000A0
C483023C 06869A06 76FF0876 FF0A76FF 0C76FF01 08E98491 880006E9 03750000 ..u.Ō..|..Ō...v..v..v..v..Ä.<..á 0000C0
C483017B 000A9A06 76FF0876 FFFC76FF FE76FF0E 76FF1076 FFFE5689 FC468908 ..F=.V±.v..v..v±.v=.v..v..Ō.(..á 0000E0
89F84689 02578826 0788260E 5EC400C6 E9EA4688 0006E903 7500003D EA46890C ..Fō=..u.Ō...FōŌó.á^.&..&.W..F%. 000100
4688F256 89F04689 000002FC 9A0A76FF 0C76FF00 00FFFF9A 0A76FF0C 76FFFA56 V°.v..v.......v..v..=....FÞ.V·.F 000120
06E90375 00003000 0001BE9A 5016EC46 8DF076FF F276FF00 8FE90375 F24608F0 Þ.F·u.Ō...v·.vÞ.F&.P.ƒ...=..u.Ō. 000140
00E90375 00267F83 26F45EC4 002EE903 74040247 F626EC5E C40071E9 84928800 .|..Ōq.á^$&-G..t.Ō..á^¶&..&.u.Ō. 000160
89260789 26F2568B F0468804 F84683F8 5EC40014 E9037500 257F8026 EC5EC400 .á^$&..X.u.Ō..á^%.F%..FÞ.V·&..&. 000180
0000FFFF 9A0A76FF 0C76FF00 14E90375 00003000 00FFFF9A 0A76FF0C 76FF0257 W..v..v......=..u.Ō...v..v..... 0001A0
000AC8C8 C95F5E1F FF66E9F2 5689F046 890000BA 00008800 0CE9F256 89F04689 .FÞ.V·Ō..|..¤...FÞ.V·Ōf..^_èùà.. 0001C0
06E90375 00003000 0003669A 5016FC46 8D0A76FF 0C76FFD8 8E01E688 1E565700 .WV.|l..Ä.v..v..F=.P.f...=..u.Ō. 0001E0
```

```
Dump of file SATURN:[PCCOMMON.DUMP.DLL]DML.TMP;1 on 18-APR-1990 10:44:35.23
File ID (622,20,0)    End of file block 171 / Allocated 172

Virtual block number 21 (00000015), 512 (0200) bytes

 0676FF08 76FF004C E9849E88 0006E903 7400127F 8326FC5E C4005FE9 84918800 .|..Õ_.á^=&....t.Õ..|..ÕL..v..v. 000000
 76FFF876 FFFA76FF 002EE984 92880006 E9037500 0030D000 01F89A50 16F8468D .F½.P.«...=..u.Õ..|..Õ...v°.v½.v 000020
 04024F80 26F85EC. 7008E903 7400F67E 83F64689 08C483FF FF108A9A FC76FFFE ±.v=.¤....á..F-.--.t.Õ..á^½&.D.. 000040
 E9037400 0A7E8308 'E032588 1E565700 0008C800 08CAC95F 5E1F0000 E9000088 |..Õ...^_èò..à...WV.|X..Ä.-..t.Õ 000060
 0006E903 75000030 00000423 9A5016FC 468D0C76 FF0E76FF 008AE984 A4880006 ..|É.Õ...v..v..F=.P.#...=..u.Õ.. 000080
 260A468B FC5EC400 59E984A4 880006E9 03740028 7F8326FC 5EC4006C E9849288 |..Õl.á^=&..(.t.Õ..|É.ÕY.á^=.F.& 0000A0
 F8468D2A 77FF262C 77FF26FC 5EC40A46 89284788 26FC5EC4 000AE903 72284739 9G(r.Õ..á^=&.G(.F.á^=&.w,&.w°.F½ 0000C0
 76FFF876 FFFA76FF 0A76FF00 1DE98492 880006E9 03750000 30000003 359A5016 .P.5...=..u.Õ..|..Õ...v..v°.v½.v 0000E0
 1E565700 0016C800 0ECAC95F 5E1F0000 E9000088 0AC48301 4609C69A 0676FF08 ..v..ó.F..á.|..Õ...^_èò..à...WV. 000100
 84918800 06E90375 00003D00 0004A29A 5016FC46 8D1076FF 1276FFD8 8E03B588 |ç..Ä.v..v..F=.P.Å..¯=..u.Õ..|.. 000120
 16F8468D 0C76FF0E 76FF0160 E9849E88 0006E903 7400127F 8326FC5E C40180E9 Õ..á^=&....t.Õ..|..Õm..v..v..F½. 000140
 FF500002 05284788 26F85EC4 014FE984 92880006 E9037500 0030D000 050F9A50 P.....=..u.Õ..|..ÕO.á^½&.G(...P. 000160
 98880006 E90374F6 4608F446 88F65689 F4468906 C48305E3 0C4D9AFC 76FFFE76 v±.v=.M.D...á..F¶.V-.F¶.F-t.Õ..|. 000180
 5EC40053 E9037500 287F8326 F85EC407 8926F45E C4284788 26F85EC4 011FE984 .Õ..á^½&.G(á^¶&..á^½&..(.u.ÕS.á^ 0001A0
 E2E98492 880006E9 03750000 30000005 949A5016 EA468D2A 77FF262C 77FF26F8 ½&.w,&.w°.FÕ.P......=..u.Õ..|..Õã 0001C0
 C4830588 09C69A50 52000205 F65688F4 4688EA76 FFEC76FF 2877FF26 F85EC400 .á^½&.w(.v±.vÕ.F¶.V-...RP.ó.|..á 0001E0

Dump of file SATURN:[PCCOMMON.DUMP.DLL]DML.TMP;1 on 18-APR-1990 10:44:35.23
File ID (622,20,0)    End of file block 171 / Allocated 172

Virtual block number 22 (00000016), 512 (0200) bytes

 00A3E984 A4880006 E9037400 0A7E8300 00FFFF9A 2A77FF26 2C77FF26 F85EC40A .á^½&.w,&.w°......-..t.Õ..|É.ÕÉ. 000000
 E9037500 003D0000 FFFF9A50 16F0468D 0A76FF02 6A1A77FF 26065FC4 26FC5EC4 á^=&á .&.w.|..v..FÞ.P.....=..u.Õ 000020
 0006E903 7500003D 000003D4 9A5016EA 468DF076 FFF276FF 007BE984 94880006 ..|..Õ(..v·.vÞ.Fõ.P.à...=..u.Õ.. 000040
 F85EC40A C4830447 09C69AEA 76FFEC76 FF0676FF 0876FF0A 76FF005D E9849288 |..Õ]..v..v..v..v±.võ.ó.G..á.á^½ 000060
 FC76FFFE 76FFF876 FFFA76FF F476FFF6 76FF2C57 89262A47 8926F256 88F04688 .FÞ.V·&.G°&.W,.v-.v¶.v°.v½.v±.v= 000080
 EE468802 024F8026 F85EC428 4789260A 4688F85E C4EE4689 0CC48303 8711899A ......á..FÝá^½.F.&.G(á^½&.O...FÝ 0000A0
 0002699A 0676FF08 76FF088E 0461881E 56570000 04C8000E CAC95F5E 1F0000E9 Õ...^_èò..à...WV.|à..Ä.v..v..|.. 0000C0
 0A468800 4FE90375 FE4608FC 4688FE56 89FC4689 00000670 9A0676FF 0876FF00 ..v..v..p....F=.V±.F=.F±u.ÕO..F. 0000E0
 0002E99A 0676FF08 76FF0036 E90003E9 0374FE56 39000BE9 0374FC46 390C5688 .V.9F=t.Õ..9V±t.Õ..Õ6..v..v..Õ.. 000100
 00008800 0CE9FE56 89FC4689 00000274 9A0676FF 0876FF00 14E90375 00003000 .=..u.Õ...v..v..t....F=.V±Õ..|.. 000120
 FFFF9A06 76FF0876 FF0014E9 0375FE46 08FC4688 FFA6E9FE 5689FC46 890000BA ¤...F=.V±Õl..F=.F±u.Õ...v..v.... 000140
 0612881E 56570000 10C8CBC9 5F5E1F00 00E984A3 880006E9 0009E900 00880000 ..|..Õ..Õ..|É.Õ...^_èùà...WV.|.. 000160
 03750000 30000007 1F9A5016 FC468D06 76FF0876 FFF84689 FA468900 0088088E .Ä|...F°.F½.v..v..F=.P.....=..u. 000180
 07779A0A 76FF0C76 FF000006 1D9A0A76 FF0C76FF 0080E9FF FFBA8492 880009E9 Õ..|..¤..Õ¯..v..v.......v..v..w. 0001A0
 719A5016 F0468DF4 76FFF676 FF0080E9 0375F646 08F44688 F65689F4 46890000 ...F¶.V-.F¶.F-u.Õ...v-.v¶.FÞ.P.q 0001C0
 8326FC5E C40022E9 03740402 47F626F0 5EC40065 E90003E9 03750000 30000004 ...=..u.Õ..Õe.á^Þ&-G..t.Õ".á^=&. 0001E0

Dump of file SATURN:[PCCOMMON.DUMP.DLL]DML.TMP;1 on 18-APR-1990 10:44:35.23
File ID (622,20,0)    End of file block 171 / Allocated 172

Virtual block number 23 (00000017), 512 (0200) bytes

 0C76FF00 FA568301 F8468300 08E90375 00257F80 26F05EC4 000DE903 7500267F .&.u.Õ..á^Þ&..X.u.Õ...F½..V°..v. 000000
 5689F446 89000006 289A0A76 FF0C76FF 0014E903 7500003D 0000065D 9A0A76FF .v..]...*..u.Õ...v..v..(....F¶.V 000020
 C95F5E1F 0000E9FA 5688F846 88FF75E9 F65689F4 46890000 BA000088 000CE9F6 -Õ..|..¤...F¶.V-Õu..F½.V°Õ...^_è 000040
 00003000 0006D79A 5016FC46 8D0A76FF 0C76FFD8 8E068E88 1E565700 0004C8C8 ùà...WV.|ƒ..Ä.v..v..F=.P.■...=.. 000060
 02578926 07892606 5EC4ω57 88260847 8826FC5E C4001BE9 84928800 06E90375 u.Õ..|..Õ..á^=&.G.&.W.á^.&..&.W. 000080
 800A76FF 0C76FFD8 8E07A988 1E565700 0004C800 0CCAC95F 5E1F0000 E90ν.'98 |..Õ...^_èò..à...WV.|¯..Ä.v..v.. 0000A0
 88261847 8826FC5E C4001BE9 84928800 06E90375 00003D00 0007B99A 5016FL 5 F=.P.¿...=..u.Õ..|..Õ..á^=&.G.&. 0000C0
 1E565700 0004C800 0CCAC95F 5E1F0000 E9000088 02578926 07892606 5EC41A5. W.á^.&..&.W.|..Õ...^_èò..à...WV. 0000E0
 84928800 06E90375 00003000 0008059A 5016FC46 800A76FF 0C76FFD8 8E07F588 |%..Ä.v..v..F=.P.....=..u.Õ..|.. 000100
 E9000088 08C48305 3C07A29A 0676FF08 76FF5052 000F05FE 5688FC46 88001FE9 Õ...F=.V±...RP.v..v..Å.<..á.|..Õ 000120
 5016FC46 800A76FF 0C76FFD8 8E084188 1E565700 0004C800 0CCAC95F 5E1F0000 ...^_èò..à...WV.|A..Ä.v..v..F=.P 000140
 76FF5052 001C05FE 5688FC46 88001FE9 84928800 06E90375 00003000 0008519A .O...=..u.Õ..|..Õ...F=.V±...RP.v 000160
 1E565700 0004C800 0CCAC95F 5E1F0000 E9000088 0BC48308 7707A29A 0676FF08 ..v..Ä.w..á.|..Õ...^_èò.....WV. 000180
 84928800 06E90375 00003000 0008A19A 5016FC46 800A76FF 0C76FFD8 8E089188 |...Ä.v..v..F=.P.Å...=..u.C..|.. 0001A0
 0CCAC95F 5E1F0000 E9000088 00578926 08478926 08568806 4688FC5E C40017E9 Õ..á^=.F..V.&.G.&.W.|..Õ...^_èò. 0001C0
 00003000 0008F19A 5016FC46 800A76FF 0C76FFD8 8E08E188 1E565700 0004C800 .à...WV.|Å..Ä.v..v..F=.P.þ...=.. 0001E0
```

Dump of file SATURN:[PCCOMMON.DUMP.DLL]DML.TMP;1 on 18-APR-1990 10:44:35.23
File ID (622,20,0)   End of file block 171 / Allocated 172

Virtual block number 24 (00000018), 512 (0200) bytes

```
E9000088 1A578926 18478926 08568806 4688FC5E C40017E9 84928800 06E90375 u.Õ..¡..Õ..á^=.F..V.&.G.&.W.¡..Õ 000000
5016FC46 800A76FF 0C76FFD8 8E0929B8 1E565700 0004C800 0CCAC95F 5E1F0000 ...^_èò..à...WV.¡)..Ä.v..v..F=.P 000020
05FE5688 FC468806 76FF0876 FF001FE9 84928800 06E90375 00003000 0009399A .9...=..u.Õ..¡..Õ...v..v..F=.V±. 000040
1E565700 0004C8U0 0CCAC95F 5E1F0000 E9000088 08C48308 C707A29A 5052000F ..RP.Ä.ú..á.¡..Õ...^_èò..à...WV. 000060
84928800 06E90375 00003000 0009819A 5016FC46 800A76FF 0C76FFD8 8E0971B8 ¡q..Ä.v..v..F=.P.....=..u.Õ..¡.. 000080
E9000088 08C48309 A707A29A 5052001C 05FE5688 FC468806 76FF0876 FF001FE9 Õ...v..v..F=.V±...RP.Ä.Ï..á.¡..Õ 0000A0
000000A9 9A0676FF 0876FFD8 8E09C188 1E565700 0006C800 0CCAC95F 5E1F0000 ...^_èò..à...WV.¡è..Ä.v..v.. ... 0000C0
00300000 09D19A50 16FC4680 0C76FF0E 76FF0049 E984A588 0006E903 75000030 =..u.Õ..¡É.Õl..v..v..F=.P.l...=. 0000E0
76C42DFA 5E68FA46 89480E47 2826FC5E C40A4688 0028E984 91880006 E9037500 .u.Õ..¡..Õ+..F.á^=&+G.H.F*k^*-áv 000100
06C8000A CAC95F5E 1F025789 26078926 065EC414 50882612 4088260A 74C426FC =&ât.&.ə.&.P.á^.&..&.W..^_èò..à. 000120
84A58800 06E90375 00003000 000A1C9A 0676FF08 76FF088E 0A11881E 56570000 ..WV.¡...Ä.v..v......=..u.Õ..¡É. 000140
27E98491 880006E9 03750000 3000000A 3A9A5016 FC46800C 76FF0E76 FF0045E9 ÕE..v..v..F=.P.:...=..u.Õ..¡..Õ' 000160
08568806 46880A74 C426FC76 C42DFA5E 68FA4689 480E4728 26FC5EC4 0A468800 ..F.á^=&+G.H.F*k^*-áv=&ât..F..V. 000180
76FF0C76 FF088E0A 86881E56 57000004 C8000ACA C95F5E1F 14508926 12408926 &.ə.&.P..^_èò..à...WV.¡...Ä.v..v 0001A0
065FC426 FC5EC400 1DE98491 880006E9 03750000 3000000A AF9A5016 FC46800A ..F=.P.É...=..u.Õ..¡..Õ..á^=&á_. 0001C0
0004C800 08CAC95F 5E1F0000 E9000088 01CA9789 2601C887 89260856 88064688 .F..V.&..à.&..ò.¡..Õ...^_èò..à.. 0001E0
```

Dump of file SATU■ :[PCCOMMON.DUMP.DLL]DML.TMP;1 on 18-APR-1990 10:44:35.23
File ID (622,20,0)   End of file block 171 / Allocated 172

Virtual block number 25 (00000019), 512 (0200) bytes

```
06E90375 00003000 0008079A 5016FC46 800A76FF 0C76FF08 8E0AF788 1E565700 .WV.¡%..Ä.v..v..F=.P.....=..u.Õ. 000000
89260789 26065EC4 01CA9788 2601C887 8826065F C426FC5E C40021E9 84918800 .¡..Õ!.á^=&á_.&..à.&..ò.á^.&..&. 000020
76FF1076 FF088E08 45881E56 57000010 C80008CA C95F5E1F 0000E900 00880257 W.¡..Õ...^_èõ..à...WV.¡E..Ä.v..v 000040
800A76FF 0C76FF00 72E98491 880006E9 03750000 3000000B C59A5016 FC46800E ..F=.P.é...=..u.Õ..¡..Õr..v..v.. 000060
75040247 F626F05E C40054E9 84918800 06E90375 00003000 0008559A 5016F046 FÞ.P.U...=..u.Õ..¡..ÕT.á^Þ&-G..u 000080
C4F65689 F446890C 5788260A 47882606 5FC426FC 5EC40041 E984AE88 0006E903 .Õ..¡Û.ÕA.á^=&á_.&.G.&.W..F¶.V-á 0000A0
09C69A06 76FF0876 FF5016F4 4680086A FA5689F8 46890957 88260747 8826F05E ^Þ&.G.&.W..F%.V¯j..F¶.P.v..v..ó. 0000C0
76FFD88E 0897881E 56570000 00C8000C CAC95F5E 1F0000E9 0000880A C48309F7 %..á.¡..Õ...^_èò..à...WV.¡...Ä.v 0000E0
1E565700 0000C800 04CAC95F 5E1F0000 E9000088 04C48302 1C00009A 0676FF08 ..v.......á.¡..Õ...^_èò..à...WV. 000100
94681E06 76FF0876 FF086A08 C4830C84 0A249A00 94681E00 6A096AD8 8E0C3A88 ¡:..Äj.j..h...$....á.j..v..v..h. 000120
0C61881E 56570000 04C80004 CAC95F5E 1F0000E9 0000880A C4830C20 081A9A00 .... ..á.¡..Õ...^_èò..à...WV.¡a. 000140
0017E984 92880006 ⁻9037500 00300000 0BA79A50 16FC4680 0A76FF0C 76FFD88E .Ä.v..v..F=.P.Ï...=..u.Õ..¡..Õ.. 000160
04C80008 CAC95F5E 1F0000E9 00008807 8926065E C41C4788 26065FC4 26FC5EC4 á^=&á_.&.G.á^.&..¡..Õ...^_èò..à. 000180
E9037500 00300000 C⁻AE9A50 16FC4680 0A76FF0C 76FFD88E 0C9E881E 56570000 ..WV.Ï...Ä.v..v..F=.P.Û...=..u.Õ 0001A0
A29A0676 FF0876FF 50520084 0508578B 26064788 26FC5EC4 0024E984 92880006 ..¡..Õ$.á^=&.G.&.W..Ç.RP.v..v..Å 0001C0
02030004 000606FE 0203000E 900008CA C95F5E1F 0000E900 008808C4 830C7007 .p..á.¡..Õ...^_èò.......±...å... 0001E0
```

Dump of file SATURN:[PCCOMMON.DUMP.DLL]DML.TMP;1 on 18-APR-1990 10:44:35.23
File ID (622,20,0)   End of file block 171 / Allocated 172

Virtual block number 26 (0000001A), 512 (0200) bytes

```
00020000 000904C8 000200EF 0006069E 02030000 00030C47 00020071 00030CF6 -...q...G...........ÿ...à....... 000000
020300A6 00050A91 02030031 00030122 02030000 00120CE6 00020000 00100021 ¦.......1.......".......1... ...!... 000020
020300C2 00060764 0203008B 000606F3 0203004C 00030576 0203003F 000300C3 Û...?...v...L...µ...£... ..ó... 000040
FFFF0159 9AFFFF00 109AD88E FFFF881E 00000000 00000000 0000005F 0003054D M..._............¡...Ä......Y... 000060
00000000 00000012 00020002 00000010 00090002 00000001 000E0002 0003C81F .ù.............................. 000080
75000030 0000FFFF 9A5016FC 46800A76 FF0C76FF D88EFFFF 881E5657 000004C8 à...WV.¡...Ä.v..v..F=.P.....=..u 0000A0
89260789 26065EC4 01880508 57882606 478826FC 5EC4001E E9849188 0006E903 .Õ..¡..Õ..á^=&.G.&.W..¡.á^.&..&. 0000C0
0088065E C4D88E00 08881E56 5700000C C80008CA C95F5E1F 0000E900 00880257 W.¡..Õ...^_èò..à...WV.¡...Äá^.¡. 0000E0
0006E903 75000030 00000089 9A5016FC 46800A76 FF0C76FF 07892602 47892600 .&.G.&...v..v..F=.P.¿...=..u.Õ.. 000100
300000FF FF9A5016 F4468068 6A026A1A 77FF2606 5FC426FC 5EC4000E E9849188 ¡..Õ8.á^=&á_.&.w.j.jk.F¶.P.....= 000120
00003000 0000189A 5016F846 80F476FF F676FF00 87E98494 880006E9 03750000 ..u.Õ..¡..Õñ..v~.v¶.F%.P.....=.. 000140
F85EC408 C483FFFF 0A249AF8 76FFFA76 FF006A68 6A0099E9 84AD8800 06E90375 u.Õ..¡Ü.Õ..jkj..v°.v%.$....á.á^% 000160
F85EC402 57882607 8826065F C426FC5E C4000123 47C726F8 5EC40001 2147C726 &ÚG!..á^%&ÚG#..á^=&á_.&..&.W.á^% 000180
4805FA56 88F84688 00000124 9A505200 5805FA56 88F84688 27578926 25478926 &.G%&.W'.F%.V°.[.RP.$....F%.V°.K 0001A0
88050857 88260647 8826FC5E C41A77FF 26065FC4 26FC5EC4 0000FFFF 9A505200 .RP.....á^=&á_.&.w.á^=&.G.&.W..¡ 0001C0
00880257 89260789 26F65688 F4468806 5EC40000 FFFF9AF4 76FFF676 FF505201 .RP.v~.v¶.....á^..F¶.V-&..&.W.¡. 0001E0
```

```
Dump of file SATURN:[PCCOMMON.DUMP.DLL]DML.TMP;1 on 18-APR-1990 10:44:35.23
File ID (622,20,0)   End of file block 171 / Allocated 172

Virtual block number 27 (0000001B), 512 (0200) bytes

 FC46800A 76FF0C76 FFD88E00 57881E56 57000008 C80008CA C95F5E1F 0000E900 .Ô...^_èò..à...WV.|W..Ä.v..v..F• 000000
 08578826 06478826 FC5EC400 83E98491 880006E9 03750000 30000000 749A5016 .P.t...=..u.Ô..|..Ô°.á^•&.G.&.W. 000020
 89000002 179A5052 01880508 57882606 478826FC 5EC40000 FFFF9A50 52018805 .|.RP.....á^•&.G.&.W..|.RP...... 000040
 56390008 E90374F8 46390856 88064688 0063E903 75FA4608 F84688FA 5689F846 F%.V°.F%.F°u.Ôc..F..V.9F%t.Ô..9V 000060
 00300000 FFFF9A50 52018805 08578826 06478826 FC5EC400 4AE90003 E90374FA °t.Ô..ÔJ.á^•&.G.&.W..|.RP.....=. 000080
 5689F846 890000FF FF9A5052 01880508 57882606 478826FC 5EC4001E E9037500 .u.Ô..á^•&.G.&.W..|.RP......F%.V 0000A0
 88050857 88260647 8826FC5E C4FF92E9 FA5689F8 46890000 8A000088 000CE9FA °Ô..|..¤...F%.V°Ô..á^•&.G.&.W..| 0000C0
 76FF0C76 FFD88E01 73881E56 57000004 C80008CA C95F5E1F 0000FFFF 9A505201 .RP......^_èò..à...WV.|s..Ä.v..v 0000E0
 FFFC76FF FE76FF00 1AE984AD 880006E9 03750000 30000001 839A5016 FC46800A ..F•.P.....=..u.Ô..|Ü.Ô...v±.v•. 000100
 56570000 04C80008 CAC95F5E 1F0000E9 00008808 C4830008 07A29A06 76FF0876 v..v..Ä.Ä..á.|..Ô...^_èò..à...WV 000120
 AD880006 E9037500 00300000 02679A50 16FC4680 0A76FF0C 76FFD88E 0257881E .|W..Ä.v..v..F•.P.g...=..u.Ô..|Ü 000140
 5E1F0000 E9000088 08C48302 8807A29A FC76FFFE 76FF0676 FF0876FF 001AE984 .Ô...v..v..v±.v•.Å....á.|..Ô...^ 000160
 0002829A 5016FC46 800A76FF 0C76FFD8 8E02A288 1E565700 0004C800 08CAC95F _èò..à...WV.|Å..Ä.v..v..F•.P.ÿ.. 000180
 E9000088 07892606 5EC42347 8826FC5E C40013E9 84AD8800 06E90375 00003000 ¯•..u.Ô..|Ü.Ô..á^•&.G#á^.&..|..Ô 0001A0
 5016FC46 800876FF 0A76FFD8 8E02ED88 1E565700 0004C800 08CAC95F 5E1F0000 ...^_èò..à...WV.|Ü..Ä.v..v..F•.P 0001C0
 00008823 47892606 4688FC5E C40010E9 84AD8800 06E90375 00003000 0002FD9A .»...=..u.Ô..|Ü.Ô..á^•.F.&.G#|.. 0001E0

Dump of file SATURN:[PCCOMMON.DUMP.DLL]DML.TMP;1 on 18-APR-1990 10:44:35.23
File ID (622,20,0)   End of file block 171 / Allocated 172

Virtual block number 28 (0000001C), 512 (0200) bytes

 16FC4680 0A76FF0C 76FFD88E 0331881E 56570000 04C80006 CAC95F5E 1F0000E9 Ô...^_èò..à...WV.|1..Ä.v..v..F•. 000000
 8926065E C4214788 26FC5EC4 0013E984 AD880006 E9037500 00300000 03419A50 P.A...=..u.Ô..|Ü.Ô..á^•&.G!á^.&. 000020
 0876FF0A 76FFD88E 0372881E 56570000 04C80008 CAC95F5E 1F0000E9 00008807 .|..Ô...^_èò..à...WV.|r..Ä.v..v. 000040
 89260646 88FC5EC4 0010E984 AD880006 E9037500 00300000 03829A50 16FC4680 .F•.P.....=..u.Ô..|Ü.Ô..á^•.F.&. 000060
 76FF0C76 FFD88E03 86881E56 57000004 C80006CA C95F5E1F 0000E900 00882147 G!|..Ô...^_èò..à...WV.|Ñ..Ä.v..v 000080
 29478826 FC5EC400 18E984AD 880006E9 03750000 30000003 C69A5016 FC46800A ..F•.P.6...=..u.Ô..|Ü.Ô..á^•&.G) 0000A0
 57000004 C80008CA C95F5E1F 0000E900 00880257 89260789 26065EC4 28578826 &.W+á^.&..&.W.|..Ô...^_èò..à...W 0000C0
 880006E9 03750000 30000004 079A5016 FC46800A 76FF0C76 FFD88E03 F7881E56 V.|¼..Ä.v..v..F•.P.....=..u.Ô..| 0000E0
 0000E900 00880257 89260789 26065EC4 2F578826 20478826 FC5EC400 18E984AD Ü.Ô..á^•&.G.&.W/á^.&..&.W.|..Ô.. 000100
 539A5016 FC46800A 76FF0C76 FFD88E04 43881E56 57000004 C80008CA C95F5E1F .^_èò..à...WV.|C..Ä.v..v..F•.P.S 000120
 89262947 89260856 88064688 FC5EC400 17E984AD 880006E9 03750000 30000004 ...=..u.Ô..|Ü.Ô..á^•.F..V.&.G)&. 000140
 76FF0C76 FFD88E04 8F881E56 57000004 C80008CA C95F5E1F 0000E900 00882857 W+|..Ô...^_èò..à...WV.|...Ä.v..v 000160
 88064688 FC5EC400 17E984AD 880006E9 03750000 30000004 9F9A5016 FC46800A ..F•.P.....=..u.Ô..|Ü.Ô..á^•.F.. 000180
 D7881E56 57000004 C80008CA C95F5E1F 0000E900 00882F57 89262047 89260856 V.&.G·&.W/|..Ô...^_èò..à...WV.|• 0001A0
 18E984AD 880006E9 03750000 30000004 E79A5016 FC46800A 76FF0C76 FFD88E04 ..Ä.v..v..F•.P.Ô...=..u.Ô..|Ü.Ô. 0001C0
 C95F5E1F 0000E900 00880257 89260789 26065EC4 33578826 31478826 FC5EC400 .á^•&.G1&.W3á^.&..&.W.|..Ô...^_è 0001E0

Dump of file SATURN:[PCCOMMON.DUMP.DLL]DML.TMP;1 on 18-APR-1990 10:44:35.23
File ID (622,20,0)   End of file block 171 / Allocated 172

Virtual block number 29 (0000001D), 512 (0200) bytes

 30000005 2F9A5016 FC46800A 76FF0C76 FFD88E05 1F881E56 57000004 C80008CA ò..à...WV.|...Ä.v..v..F•.P./...• 000000
 89260789 26065EC4 37578826 35478826 FC5EC400 18E984AD 880006E9 03750000 ..u.Ô..|Ü.Ô..á^•&.G5&.W7á^.&..&. 000020
 76FF0C76 FFD88E05 68881E56 57000004 C80008CA C95F5E1F 0000E900 00880257 W.|..Ô...^_èò..à...WV.|k..Ä.v..v 000040
 88064688 FC5EC400 17E984AD 880006E9 03750000 30000005 789A5016 FC46800A ..F•.P.(...=..u.Ô..|Ü.Ô..á^•.F.. 000060
 87881E56 57000004 C80008CA C95F5E1F 0000E900 00883357 89263147 89260856 V.&.G1&.W3|..Ô...^_èò..à...WV.|ñ 000080
 17E984AD 880006E9 03750000 30000005 C79A5016 FC46800A 76FF0C76 FFD88E05 ..Ä.v..v..F•.P.ú...=..u.Ô..|Ü.Ô. 0000A0
 C80008CA C95F5E1F 0000E900 00883757 89263547 89260856 88064688 FC5EC400 .á^•.F..V.&.G5&.W7|..Ô...^_èò..à 0000C0
 03750000 30000006 0F9A5016 FC46800A 76FF0C76 FFD88E05 FF881E56 57000004 ...WV.|...Ä.v..v..F•.P.....=..u. 0000E0
 83020307 A29A0676 FF0876FF 50520039 05FE5688 FC468800 1FE984AD 880006E9 Ô..|Ü.Ô...F•.V±.9.RP.v..v..Å.Æ.. 000100
 76FF0C76 FFD88E06 47881E56 57000004 C80008CA C95F5E1F 0000E900 008808C4 á.|..Ô...^_èò..à...WV.|G..Ä.v..v 000120
 880676FF 0876FF00 1FE984AD 880006E9 03750000 30000006 579A5016 FC46800A ..F•.P.W...=..u.Ô..|Ü.Ô...v..v.. 000140
 C80008CA C95F5E1F 0000E900 008808C4 83067007 A29A5052 003905FE 5688FC46 F•.V±.9.RP.Å.)..á.|..Ô...^_èò..à 000160
 03750000 30000006 A79A5016 FC46800A 76FF0C76 FFD88E06 97881E56 57000004 ...WV.|...Ä.v..v..F•.P.Ì...=..u. 000180
 8306C007 A29A0676 FF0876FF 50520042 05FE5688 FC468800 1FE984AD 880006E9 Ô..|Ü.Ô...F•.V±.B.RP.v..v..Å.ë.. 0001A0
 76FF0C76 FFD88E06 E7881E56 57000004 C80008CA C95F5E1F 0000E900 008808C4 á.|..Ô...^_èò..à...WV.|Ó..Ä.v..v 0001C0
 880676FF 0876FF00 1FE984AD 880006E9 03750000 30000006 F79A5016 FC46800A ..F•.P.X...=..u.Ô..|Ü.Ô...v..v.. 0001E0
```

```
Dump of file SATURN:[PCCOMMON.DUMP.DLL]DML.TMP;1 on 18-APR-1990 10:44:35.23
File ID (622,20,0)   End of file block 171 / Allocated 172

Virtual block number 30 (0000001E), 512 (0200) bytes

 C80008CA C95F5E1F 0000E900 00B808C4 83071D07 A29A5052 004205FE 568BFC46 F=.V±.B.RP.Ä....é.¡..Ô...^_èò..à 000000
 03750000 30000007 479A5016 FC46800A 76FF0C76 FFD88E07 37881E56 57000004 ...WV.¡7..Ä.v..v..F=.P.G...=..u. 000020
 E90000B8 02578926 07892600 4805FE56 8BFC468B 065EC400 19E984AD B80006E9 Ô..¡Ù.Ô..á^..F=.V±.K.&..&.W.¡..Ô 000040
 5016F846 800C76.F 0E76FFD8 8E07B7B8 1E565700 0010C800 08CAC95F 5E1F0000 ...^_èò..à...WV.¡...Ä.v..v..F%.P 000060
 468D2577 FF262777 FF26F85E C4009FE9 84AD8800 06E90375 00003000 0008049A ....=..u.Ô..¡Ù.Ô..á^Y&.w'&.wX.F 000080
 FF026A1A 77FF26FC 5EC4007C E98491B8 0006E903 7500003D 00000797 9A5016FC =.P.....=..u.Ô..¡..Ô|.á^=&.w.j.. 0000A0
 F476FFF6 76FF0058 E98494B8 0006E903 75000030 0000009B 9A5016F4 46800676 v..F¶.P.....=..u.Ô..¡..ÔX..v-.v¶ 0000C0
 76FF0A76 FF0676FF 003AE984 92B80006 E9037500 00300000 07E19A50 16F04680 .F▷.P.Ä...=..u.Ô..¡..Ô:..v..v..v 0000E0
 52004805 FA568BF8 46881A77 FF26FC5E C40AC483 076D09C6 9AF076FF F276FF08 ..v·.v▷.6.m..á.á^=&.w..F%.V°.K.R 000100
 1E565700 0004C800 0ACAC95F 5E1F0000 E90000B8 0000014A 9AF476FF F676FF50 P.v-.v¶.J...¡..Ô...^_èò. à...WV. 000120
 84AD8800 06E90375 00003000 0008469A 5016FC46 800A76FF 0C76FFD8 8E07D188 ¡l..Ä.v..v..F=.P.F...=..u Ô..¡Ù. 000140
 C95F5E1F 0000E900 00B80257 89260789 26005805 FE568BFC 4688065E C40019E9 Ô..á^..F=.V±.[.&..&.W.¡..Ô...^_è 000160
 30000009 1E9A5016 F8468008 76FF0A76 FFD88E08 A1B81E56 57000008 C80008CA ò..à...WV.¡Ä..Ä.v..v..F%.P.....= 000180
 08B19A50 16FC4680 2577FF26 2777FF26 F85EC400 45E984AD B80006E9 03750000 ..u.Ô..¡Ù.ÔE.á^Y&.w'&.wX.F=.P.Ý. 0001A0
 005805FA 568BF846 881A77FF 26FC5EC4 0022E984 91B80006 E9037500 00300000 ..=..u.Ô..¡..Ô".á^=&.w..F%.V°.[. 0001C0
 1E565700 000EC800 06CAC95F 5E1F0000 E90000B8 00000888 9A0676FF 006A5052 RPj..v......¡..Ô...^_èò..à...WV. 0001E0

Dump of file SATURN:[PCCOMMON.DUMP.DLL]DML.TMP;1 on 18-APR-1990 10:44:35.23
File ID (622,20,0)   End of file block 171 / Allocated 172

Virtual block number 31 (0000001F), 512 (0200) bytes

 5016FC46 8D0676FF 0876FF09 8303EF9A 5016F846 8D0676FF 0876FFD8 8E08EB88 ¡$..Ä.v..v..F%.P.ÿ....v..v..F=.P 000000
 0876FF04 C483086A 08F89A50 16FC4680 0000E903 74FE460B FC468B09 AB043B9A .;.¨..F=.F±t.Ô...F=.P.%.j..á..v. 000020
 A19A5016 F4468D0E 76FF1076 FF0A76FF 0C76FFFF FF02E59A 5016F246 8D0676FF .v..F·.P.l....v..v..v..v..F¶.P.À 000040
 08C48309 E508C49A F476FFF6 76FFF876 FFFA76FF 09D80F82 9A1E781E 80FFFF07 .....x....Ù..v°.v%.v-.v¶.á.l..á. 000060
 FC76FFFE 76FF0A09 0F829A1E 781E8D00 34E90373 09F81402 9A09EA0F 829AD888 .Ä...ö....%.s.Ô4...x.......v±.v= 000080
 B80006E9 0376099B 14029A0A 180F829A D888O8C4 830A1308 C49AF476 FFF676FF .v-.v¶.á....á..Ä..........v.Ô..¡ 0000A0
 F2468812 5EC4000C E9037500 3F832612 5EC40789 26125EC4 00008800 03E90001 ..Ô..¡..á^.&..á^.&.?.u.Ô..á^..F· 0000C0
 C8C8C95F 5E1F0000 E90000B8 07892608 F7C01B01 F27E8312 5EC4000E E9078926 &..Ô..á^..-·..à%A&..¡..Ô...^_èùà 0000E0
 76FF0876 FF0A8906 3F9A5016 F6468006 76FF0876 FFD88E09 61881E56 57000018 ...WV.¡a..Ä.v..v..F-.P.?....v..v 000100
 C108399A 5016EC46 8D0E76FF 1076FF0A 76FF0C76 FF097302 E59A5016 EA468D06 ..Fõ.P.l.s..v..v..v..v..F&.P.9.è 000120
 E8468908 C48309CA 07D89A50 16EC4680 505204C4 830AB809 429A5016 F6468009 ..F-.P.B.¡..á.RP.F$.P.Ä.ò..á..FÒ 000140
 EA468812 5EC4000C E9037500 3F832612 5EC40789 2608F7C0 1B01E87E 83125EC4 á^..-Ô..à%A&..á^.&.?.u.Ô..á^..Fõ 000160
 C8C8C95F 5E1F0000 E90000B8 07892608 F7C01B01 EA7E8312 5EC4000E E9078926 &..Ô..á^..-ö..á%A&..¡..Ô...^_èùà 000180
 76FF0876 FF0B2905 179A5016 FC468D06 76FF0876 FFD88E0A 67881E56 5700000E ...WV.¡g..Ä.v..v..F=.P...)..v..v 0001A0
 0AA908F8 9A5016F2 468D000D E90374F4 460BF246 88085105 639A5016 F2468006 ..F·.P.c.Q..F·.F¶t.Ô...F·.P.%.`. 0001C0
 8D0E76FF 1076FF0A 76FF0C76 FF0A7902 E59A5016 F6468006 76FF0876 FF04C483 .á..v..v..F-.P.l.y..v..v..v..v.. 0001E0

Dump of file SATURN:[PCCOMMON.DUMP.DLL]DML.TMP;1 on 18-APR-1990 10:44:35.23
File ID (622,20,0)   End of file block 171 / Allocated 172

Virtual block number 32 (00000020), 512 (0200) bytes

 C49AF876 FFFA76FF FC76FFFE 76FF0881 0F829A1E 781E800A 9F07ED9A 5016F846 F%.P.Ù.....x.......v±.v=.v°.v%.á 000000
 08AF0F82 9A1E781F 8D0034E9 0373089E 14029A08 900F829A 08880BC4 83088808 ....á..Ä..........s.Ô4...x....£. 000020
 083E1402 9A0BBE0· 829AD888 08C48308 8908C49A F876FFFA 76FFF276 FFF476FF .v¶.v·.v°.v%.á.¿..á..Ä...ƒ....>. 000040
 000CE903 75003F83 26125EC4 07892612 5EC40000 B80003E9 0001B800 06E90376 v.Ô..¡..Ô..¡..á^.&..á^.&.?.u.Ô.. 000060
 0000E900 00B80789 2608F7C0 1B01F67E 83125EC4 000EE907 8926F646 88125EC4 á^..F-&..Ô..á^..--..á%A&..¡..Ô.. 000080
 2F060F9A 5016F646 8D0676FF 0876FFD8 8E08078B 1E565700 0018C8C8 C95F5E1F .^_èùà...WV.¡...Ä.v..v..F-.P.Ô./ 0000A0
 EC468D0E 76FF1076 FF0A76FF 0C76FF0B 1902E59A 5016EA46 8D0676FF 0876FF0C ..v̄..v..Fõ.P.l....v..v..v..v..F& 0000C0
 08700708 9A5016EC 46805052 04C4830C 5E09429A 5016F646 80086708 899A5016 .P...g..F-.P.B.^..á.RP.F$.P.Ä.p. 0000E0
 000CE903 75003F83 26125EC4 07892608 F7C01801 E87E8312 5EC4E846 8908C483 .á..Fòá^..-Ô..á%A&..á^.&.?.u.Ô.. 000100
 0000E900 00B80789 2608F7C0 1B01EA7E 83125EC4 000EE907 8926EA46 88125EC4 á^..Fò&..Ô..á^..-ö..á%A&..¡..Ô.. 000120
 FF0876FF 000001A6 9A0676FF 0876FFD8 8E0C0088 1E565700 0008C8C8 C95F5E1F .^_èùà...WV.¡...Ä.v..v..l....v.. 000140
 4680FC76 FFFE76FF 007EE903 75FE460B FC468BFE 5689FC46 89000000 3A9A0676 v..:....F=.V±.F=.F±u.Ô-..v±.v=.F 000160
 FFFA76FF 0A76FF0C 76FF006E E9849288 0006E903 7500003D 000008FB 9A5016F8 %.P.«...=..u.Ô..¡..Ôn..v..v..v°. 000180
 0044E900 00B80001 07C7260E 5EC4000E E9037400 003D08C4 830C4F07 D89AF876 v%.Ä.O..á.=..t.Ô..á^.&ú...¡..ÒD. 0001A0
 46890000 01B89A06 76FF0876 FF0014E9 03750000 30000001 FA9A0676 FF0876FF .v..v..°...=..u.Ô...v..v..Ê....F 0001C0
 00B80000 07C7260E 5EC4FF77 E9FE5689 FC468900 00BA0000 B8000CE9 FE5689FC =.V±Ô..¡..¤...F=.V±Ôw.á^.&ú...¡. 0001E0
```

Dump of file SATURN:[PCCOMMON.DUMP.DLL]DML.TMP;1 on 18-APR-1990 10:44:35.23
File ID (622,20,0) End of file block 171 / Allocated 172

Virtual block number 33 (00000021), 512 (0200) bytes

```
5016F446 800676FF 0876FF08 8E0CAD88 1E565700 0032C8C8 C95F5E1F 0000E900 .Õ...^_èùâ2..WV.¡Ù..Ä.v..v..F¶.P 000000
5016FE46 800A76FF 0C76FF00 A3077F9A 5016FA46 800676FF 0876FF00 9302E59A .Í....v..v..F".P...Ê..v..v..F±.P 000020
FF0A76FF 0C76FF07 E713229A 0A76FF0C 76FF0008 E9037500 FE7E8300 87129E9A ...ñ..~±.u.Õ...v..v..".Õ..v..v.. 000040
76FF0008 E9037500 FE7C83F2 46890E20 04CC9A50 16F64680 1276FF0E 76FF1076 v..v..v..F-.P.ä.-..F.-±.u.Õ...v 000060
4689F856 88F64688 0087E9F2 46880006 E9037500 F27E830E 4212E29A 0A. °F0C ..v..ã.B..~.u.Õ...F Õñ..F-.V½.F 000080
0277FF26 F65EC40A 76FF0C76 FF0077E9 03750247 08260788 26F65EC4 0056.°CE ö.VÄ6^-&..&.G.u.Õw..v..v.6^-&.w. 0000A0
9AFA76FF FC76FF50 16024680 5016FE46 80FFFF02 979A5016 D2468002 6A37F;°26 &.7j..F●.P......F±.P.F●.P.v=.v'. 0000C0
0107C726 145EC400 08E90375 00F47E83 0033E903 7500FE7E 830CC483 0C1F0CA5 È....6..~±.u.Õ3..~¶.u.Õ..6^.&ú.. 0000E0
0000880C 4500789A CE76FFD0 76FF0A76 FF0C76FF 000007C7 26145EC4 0008E900 .Õ..6^.&ú....v..v..vÅ.vö.x.E.¡.. 000100
76FF0A76 FF0C76FF 07892608 F7C01801 F47E8314 5EC4FF7A E904F646 83002CE9 Õ,..F-.Õz.6^..-¶..ãXÄ&...v..v..v 000120
D88E0071 881E5657 00000EC8 C8C95F5E 1F0000E9 0000880E 7800789A CE76FFD0 Å.vö.x.(.¡..Õ...^_èùà...WV.¡q..Ä 000140
16FA4680 0676FF08 76FF0EA7 01669A50 16FE4680 0E76FF10 76FF0A76 FF0C76FF .v..v..v..v..F±.P.f.Ï..v..v..F". 000160
76FFF476 FF0000FC 46C70083 08999A50 16F24680 0676FF08 76FF0EF4 02E59A50 P.Ï.¶..v..v..F.P.....úF=...v¶.v 000180
E90374F8 4608F646 88F85689 F6468900 000F689A F276FFF4 76FF0000 0C889AF2 .¡....v¶.v.h....F-.V½.F-.F½t.Õ 0001A0
4639FE46 880049E9 0375F846 08F64688 007DE900 00880001 07C72612 5EC4000E ..6^.&ú...¡..Õ)..F-.F½u.ÕI..F±9F 0001C0
14E90375 00003000 0000279A F276FFF4 76FF0036 E90001FC 46C70008 E90374F6 -t.Õ..úF=..Õ6..v¶.v..'...=..u.Õ. 0001E0
```

Dump of file SATURN:[PCCOMMON.DUMP.DLL]DML.TMP;1 on 18-APR-1990 10:44:35.23
File ID (622,20,0) End of file block 171 / Allocated 172

Virtual block number 34 (00000022), 512 (0200) bytes

```
5689F646 8900008A 00008800 0CE9F856 89F64689 00000CC3 9AF276FF F476FF00 ..v¶.v.û....F-.V½Õ..¡..¤...F-.V 000000
01FA7E83 125EC400 0EE90789 26FA4688 125EC400 0CE90375 00FC7E83 FFACE9F8 ½Õ¯..-=.u.Õ..6^..F'&..Õ..6^..-'. 000020
46C7088E 0E8C881E 56570000 0AC8C8C9 5F5E1F00 00E90000 88078926 D8F7C018 .ãXÄ&..¡..Õ...^_èùà...WV.¡¥..ÄúF 000040
45E98492 880006E9 03750000 3000000C E49A5016 FA468006 76FF0876 FF0000FE ±...v..v..F'.P.Õ...=..u.Õ..¡..ÕE 000060
26FA5EC4 019FE912 46881036 13629A50 16F64680 5016F846 800E76FF 1076FF02 ..v..v..F½.P.F-.P.b.6..F.Õ..6^'& 000080
16FE4680 0022E903 752F4708 26204788 26FA5EC4 0010E903 74284708 26294788 .G)&.G+t.Õ..6^'&.G-&.G/u.Õ"..F±. 0000A0
01880006 E910C483 10810959 9A0676FF 0876FF0A 76FF0C76 FF0E76FF 1076FF50 P.v..v..v..v..v..v..Y....6.Õ..¡. 0000C0
08263547 8826FA5E C40010E9 03743347 08263147 8826FA5E C40187E9 01E2E900 .Õã.Õ..6^'&.G1&.G3t.Õ..6^'&.G5&. 0000E0
FF9A0676 FF0876FF 0A76FF0C 76FF0E76 FF1076FF 5016FE46 800022E9 03753747 G7u.Õ"..F±.P.v..v..v..v..v..v... 000100
80025E9 03750039 7F8026FA 5EC4013C E90197E9 00018800 06E910C4 8310890A .¿..6.Õ..¡..Õ..Õ<.6^'&..9.u.ÕX.. 000120
0DE910C4 8310F10A 5F9A0676 FF0876FF 0A76FF0C 76FF0E76 FF1076FF 5016FE46 F±.P.v..v..v..v..v..v.._.þ..6.Õ. 000140
FF1076FF 5016FE46 800025E9 03750042 7F8026FA 5EC4015C E9000188 0006E901 .Õ..¡..Õ\.6^'&..B.u.ÕX..F±.P.v.. 000160
E9000188 0006E900 05E910C4 830EE40C 059A0676 FF0876FF 0A76FF0C 76FF0E76 v..v..v..v..v....Õ..6.ÕÍ.Õ..¡..Õ 000180
E9037500 147E8300 2EE90375 00080000 FFFF9A50 52004805 FC5688FA 46880124 $..F'.V=.K.RP......Åu.Õ...~..u.Õ 0001A0
8100699A 0676FF08 76FF0A76 FF0C76FF 0E76FF10 76FF1476 FF5016FE 46800025 %..F±.P.v..v..v..v..v..v..v..Í.. 0001C0
0000110E 9A505200 5805FC56 88FA4688 007EE900 D9E90001 880006E9 12C48311 ..6.Õ..¡..ÕI.Õ-..F'.V=.[.RP..... 0001E0
```

Dump of file SATURN:[PCCOMMON.DUMP.DLL]DML.TMP;1 on 18-APR-1990 10:44:35.23
File ID (622,20,0) End of file block 171 / Allocated 172

Virtual block number 35 (00000023), 512 (0200) bytes

```
849A0676 FF0876FF 0A76FF0C 76FF0E76 FF1076FF 5016FE46 800022E9 0375000B .Äu.Õ"..F±.P.v..v..v..v..v..v..Ç 000000
037503E8 300033E9 008EE900 0188003C E90097E9 00018800 06E910C4 8311DA0E .Õ..6.Õ..¡..Õ..Õ<.¡..Õ..Õ3.=Õ.u. 000020
037503ED 3DFF0FE9 037503E8 3DFEDFE9 037503EA 3DFE9CE9 037503E9 3DFE59E9 ÕY±=Õ.u.Õ.±=õ.u.ÕÕ±=Š.u.Õ..=Ù.u. 000040
01FE7E83 11F01385 9AFE76FF 0E76FF10 76FFFFC4 E9FF85E9 037503EE 3DFF3FE9 Õ?.=Ÿ.u.Õ..Õ6..v..v..v±.ç.Þ..~±. 000060
1FE90374 00FE7E83 002EE900 0088121E 13F69A01 6A0E76FF 1076FF00 13E90374 t.Õ...v..v.j..-...¡..Õ...~±.t.Õ. 000080
0FF41385 9A016A0E 76FF1076 FF0000E9 037501F6 7E800016 E9037500 F67E8000 ..--.u.Õ...--.u.Õ...v..v.j..ç.¶. 0000A0
FC46800A 76FF0C76 FFD88E0F 8A881E56 57000008 C8C8C95F 5E1F0000 E9000088 ¡..Õ...^_èùà...WV.¡¤..Ä.v..v..F● 0000C0
5016F846 800A76FF 0C76FF00 42E98491 880006E9 03750000 3000000F CF9A5016 .P.ü...=..u.Õ..¡..ÕB..v..v..F½.P 0000E0
87882606 5FC426FC 5EC40021 E9000088 0006E903 74FA4608 F84688FF FF0F879A ......F½.F't.Õ..¡..ÕI.6^●&6_.&.. 000100
04C80008 CAC95F5E 1F0000E9 00008802 57892607 8926065E C4018697 88260184 Ç.&..Ñ.6^.&..&.W.¡..Õ...^_èÕ..à. 000120
E9037500 00300000 12439A50 16FC4680 0A76FF0C 76FFD88E 1233881E 56570000 ..WV.¡3..Ä.v..v..f●.P.C..=..u.Õ 000140
CAC95F5E 1F0000E9 00008807 8926065E C4264788 26FC5EC4 0013E984 91880006 ..¡..Õ..6^●&.G&6^.&..¡..Õ...^_èò 000160
00300000 12869A50 16FC4680 0676FF08 76FFD88E 12A6881E 56570000 04C80008 ..à...WV.¡Ï..Ä.v..v..f●.P.Ñ..=. 000180
CAC95F5E 1F0000E9 00008800 012647C7 26FC5EC4 000FE984 91880006 E9037500 .u.Õ..¡..Õ..6^●&úG&..¡..Õ...^_èò 0001A0
00300000 12FA9A50 16FC4680 0676FF08 76FFD88E 12EA881E 56570000 04C80004 ..à...WV.¡õ..Ä.v..v..f●.P.'...=. 0001C0
CAC95F5E 1F0000E9 7008800 002647C7 26FC5EC4 000FE984 91880006 E9037500 .u.Õ..¡..Õ..6^●&úG&..¡..Õ...^_èò 0001E0
```

Dump of file SATURN:[PCCOMMON.DUMP.DLL]DML.TMP;1 on 18-APR-1990 10:44:35.23
File ID (622,20,0)   End of file block 171 / Allocated 172

Virtual block number 36 (00000024), 512 (0200) bytes

```
00300000 133A9A50 16FC468D 0E76FF10 76FFD88E 132A881E 56570000 04C80004 ..à...WV.¡*..Ä.v..v..F•.P.:...=. 000000
8A26FC5E C4078926 0A5EC4E4 2A25478A 26FC5EC4 0022E984 92880006 E9037500 .u.Ö..¡..Ö".á^•&.G%*Öá^.&..á^•&. 000020
8E136A88 1E565700 0004C800 0CCAC95F 5E1F000G E9000088 07882606 5EC42647 G&á^.&..¡..Ö...^_èò..à...WV.¡j.. 000040
C40010E9 849288J0 06E90375 00003000 00137A9A 5016FC46 800876FF 0A76FFD8 Ä.v..v..F•.P.z...=..u.Ö..¡..Ö..á 000060
138D881E 56570000 04C80006 CAC95F5E 1F0000E9 00008825 47882606 468AFC5E ^•.F.&.G%¡..Ö...^_èò..à...WV.¡§. 000080
0010E984 92880006 E9037500 00300000 13CD9A50 16FC468D 0876FF0A 76FFD88E .Ä.v..v..F•.P.e...=..u.Ö..¡..Ö.. 0000A0
FE881E56 57000010 C80006CA C95F5E1F 0000E900 00882647 88260646 8AFC5EC4 á^•.F.&.G&¡..Ö...^_èò..à...WV.¡± 0000C0
E1E98491 880006E9 03750000 30000014 A19A5016 FA46800C 76FF0E76 FFD88E13 ..Ä.v..v..F¹.P.À...=..u.Ö..¡..ÖÀ 0000E0
9A5016F4 46800C76 FF0E76FF 00CEE900 00880006 E9037400 267F8326 FA5EC400 .á^¹&..&.t.Ö..¡..Öö..v..v..F¶.P. 000100
5016F046 8D0676FF 0876FF00 ADE90000 880006E9 0374F646 08F44688 15341228 +.4..F¶.F-t.Ö..¡..ÖU..v..v..FÞ.P 000120
0E472826 FA5EC407 8826F05E C4008FE9 84928800 06E90375 00003000 00140E9A .....=..u.Ö..¡..Ö..á^Þ&..á^¹&+G. 000140
037503ED 0A7E8100 40E90375 00187883 260A74C4 26FA76C4 2DF85E68 F8468948 H.F%k^%-áv¹&át.&.x..u.Öa..~.Û.u. 000160
76C42DF8 5E68001A E9037416 4039260A 46880A74 C426FA76 C42DF85E 680017E9 Ö..k^%-áv¹&át..F.&9a.t.Ö..k^%-áv 000180
FF0A76FF FE76FF00 00FE46C7 0005E903 ED0A46C7 FE468916 4088260A 74C426FA ¹&át.&.a..FtúF.Ù.Ö..úFt...vt.v.. 0001A0
E9000088 0006E910 C483113F 0F829AF4 76FFF676 FF0C76FF 0E76FF06 76FF0876 v..v..v..v..v-.v¶.ÿ.?..á.Ö..¡..Ö 0001C0
029A5052 002E0508 56880646 88D88E14 3F881E56 57000008 C8C8C95F 5E1F0000 ...^_èúà...WV.¡7..Ä.F..V....RP.. 0001E0
```

Dump of file SATURN:[PCCOMMON.DUMP.DLL]DML.TMP;1 on 18-APR-1990 10:44:35.23
File ID (622,20,0)   End of file block 171 / Allocated 172

Virtual block number 37 (00000025), 512 (0200) bytes

```
75FE4608 FC4688FE 5689FC46 89000015 069A5052 002E0508 56880646 88000.0F ....F..V:...RP.ø....F•.Vt.F•.Ftu 000000
E98492B8 0006E903 7500003D 0000144F 9A5016F8 468DFC76 FFFE76FF 0068E903 .Ök..vt.v•.F%.P.O...=..u.Ö..¡..Ö 000020
0F559A50 52002E05 08568806 46880026 47C626F8 5EC40125 47C626F8 5EC40053 S.á^%&ÖG%.á^%&ÖG&..F..V....RP.U. 000040
FE5689FC 46890000 0F009A50 52002E05 08568806 46880019 E9037500 00300000 ..=..u.Ö...F..V....RP......F•.Vt 000060
56570000 0EC8C8C9 5F5E1F00 00E90000 88FF8AE9 FC4689FE 46890000 880009E9 Ö..¡...Ft.F•Ö..¡..Ö...^_èúà...WV 000080
002E05FE 5688FC46 88FE5689 FC468908 57882606 47882606 5EC4088E 154F881E .¡O..Äá^.&.G.&.W..F•.Vt.F•.Vt... 0000A0
F64688F8 5689F646 89000015 6F9A5052 002E05FE 5688FC46 88000015 5F9A5052 RP._....F•.Vt...RP.o....F-.V%.F- 0000C0
0006E903 75000030 00001590 9A5016F2 468DF676 FFF876FF 00A4E903 75F84608 .F%u.ÖÉ..v%.v-.F·.P.....=..u.Ö.. 0000E0
C4260676 C42DFA5E 68FA4689 480E4728 26065EC4 078826F2 5EC4008C E98492B8 ¡..Ö..á^·&..á^.&+G.H.F¹k^¹·áv.&á 000100
C40010E9 002647C6 26F25EC4 002547C6 26F25EC4 0013E903 75001878 83260A74 t.&.x..u.Ö..á^·&ÖG%.á^·&ÖG&.Ö..á 000120
30000015 8E9A5052 002E05FE 5688FC46 88002647 C626F25E C4012547 C626F25E ^·&ÖG%.á^·&ÖG&..F•.Vt...RP.ƒ...= 000140
0009E9F8 5689F646 89000016 339A5052 002E05FE 5688FC46 880019E9 03750000 ..u.Ö...F•.Vt...RP.3....F-.V%Ö.. 000160
02881E56 5700005C C8C8C95F 5E1F0000 E9000088 FF51E9F6 4689F846 89000088 ¡...F%.F-Öo.¡..Ö...^_èúà\..WV.¡. 000180
00003000 00174A9A 5016F446 800676FF 0876FF00 00F246C7 0000E446 C7D88E16 ..ÁúFÖ..úF·...v..v..F¶.P.J...=.. 0001A0
76FF033A E9000088 0006E903 7400267F 8326F45E C4034DE9 84918800 06E90375 u.Ö..¡..ÖM.á^¶&..&.t.Ö..¡..Ö:..v 0001C0
FF0C76FF 031CE984 92880006 E9037500 00300000 17689A50 16E04680 0E76FF10 ..v..FÁ.P.h...=..u.Ö..¡..Ö...v.. 0001E0
```

Dump of file SATURN:[PCCOMMON.DUMP.DLL]DML.TMP;1 on 18-APR-1990 10:44:35.23
File ID (622,20,0)   End of file block 171 / Allocated 172

Virtual block number 38 (00000026), 512 (0200) bytes

```
078826E0 5EC402FE E98492B8 0006E903 75000030 000017C7 9A5016EE 46800A76 v..FŸ.P.ú...=..u.Ö..¡..Öt.á^Å&.. 000000
26F476C4 2DEC5E68 0015E903 7501257F 8026E05E C4EC4689 480E4728 26F45EC4 á^¶&+G.H.F§á^Å&..%.u.Ö..k^&-áv¶& 000020
76FF1076 FF028DE9 00008801 2547C626 E05EC400 0EE90374 00187883 260A74C4 át.&.x..t.Ö..á^Å&ÖG%.¡..Ö§..v..v 000040
8D0A76FF 0C76FF02 9FE98492 880006E9 03750000 30000017 E59A5016 E046800E ..FÁ.P.|...=..u.Ö..¡..Ö...v..v.. 000060
FF0003E9 03E8DE46 C70281E9 84928800 06E90375 00003000 0016549A 5016EE46 FŸ.P.T...=..u.Ö..¡..Ö..úFòÖ.Ö... 000080
FFDE76FF 0676FF08 76FF2647 88261246 8AE05EC4 0073E903 7603EEDE 7E810E46 FB.-BŸ.v.Ös.á^Å.F.&.G&.v..v..vB. 0000A0
26E05EC4 FFC3E900 03E90375 00E67E83 E646890A C4831889 14379A0E 76FF1076 v..v..7.¿..á..F|.-|.u.Ö..Öú.á^Å& 0000C0
03E90021 E90001F2 46C70008 E9037400 217F8326 EE5EC400 1EE90374 01257F80 ..%.t.Ö..á^Ÿ&..|.t.Ö..úF·..Öl.Ö. 0000E0
83FF80E9 0003E900 01E446C7 0008E903 7500217F 8326EE5E C40015E9 FF98E900 .Ö..Ö..á^Ÿ&..|.u.Ö..úFÖ..Ö..Ö... 000100
C626E05E C40008E9 037203EE DE7E8100 12E90374 00F27E83 0018E903 7400E47E -Ö.t.Ö...~·.t.Ö...-BŸ.r.Ö..á^Å&6 000120
8026E05E C4148223 539A326A 5016AC46 8D37FF26 E05EC406 76FF0876 FF012547 G%..v..v.á^Å&.7.F¯.Pj2.S#..á^Å&. 000140
F476C420 EC5E68E8 46FF0003 E90001E8 46C701AA E9000088 0006E903 7400257F .%.t.Ö..¡..Ö`.úFÖ..Ö...FÖk^&-áv¶ 000160
74C426F4 76C420EC 5E68C388 26E85E68 0182E903 73084039 26E84688 0A74C426 &át..FÖ&9a.s.Ö..k^Ö&.úk^&-áv¶&át 000180
260A74C4 26F476C4 20EC5E68 C38826E8 5E68A846 89044088 26088804 70C4260A .&áp..Å&.a..F´k^Ö&.úk^&-áv¶&át.& 0001A0
76FF0131 E9037402 AA7E8000 09E90375 01AA7E80 AA46880E 408A2608 880470C4 áp..Å&.a..F´.-´.u.Ö...~´.t.Öl..v 0001C0
0876FF00 08E90375 00EA7E83 0108E9A8 46881966 129E9A50 16EA4680 0676FF08 ..v..Fõ.P...f..F´Ö...-õ.u.Ö...v. 0001E0
```

```
Dump of file SATURN:[PCCOMMON.DUMP.DLL]DML.TMP;1 on 18-APR-1990 10:44:35.23
File ID (622,20,0)   End of file block 171 / Allocated 172

Virtual block number 39 (00000027), 512 (0200) bytes

 1604CC9A 5016F846 8DE876FF 0E76FF10 76FF0676 FF0876FF 19931322 9A0676FF .v..".....v..v..v..v..vÒ.F%.P.ä.. 000000
 5689A446 89FA568B F9468819 CB12E29A 0676FF08 76FF0008 E9037500 EA7E831A ..-õ.u.Õ...v..v..ã.ù..F%.V*.FÈ.V 000020
 FF0C76FF 37FF2602 77FF26F8 5EC4026A 0027E903 75024708 26078826 F85EC4A6 ¦á^Y&..&.G.u.Õ'.j.á^Y&.w.&.7.v.. 000040
 A676FF06 76FF0876 FFFFCAE9 04F84683 0EC48319 FD16F79A 0676FF08 76FF0A76 v..v..v..%.».á..F%.Õò..v..v..v¦ 000060
 FF1A2A13 229A0676 FF0876FF 0008E903 7500EA7E 830084E9 0ED40078 9AA476FF .vÊ.x.å.Õ...-õ.u.Õ...v..v..".*.. 000080
 0BE90375 00EA7E83 0000060B 9A5016FC 4680E876 FF0E76FF 1076FF06 76FF0876 v..v..v..v..vÒ.F=.P.Ü.Å..-õ.u.Õ. 0000A0
 FFFC76FF FE76FF02 6A001CE9 0375FE46 08FC4688 1A4E12E2 9A0676FF 0876FF00 ..v..v..ã.N..F=.F±u.Õ..j..v±.v=. 0000C0
 7500023D 0013E900 16E90019 E90EC483 182816F7 9A0676FF 0876FF0A 76FF0C76 v..v..v..v..%.(..á.Õ..Õ..Õ..=..u 0000E0
 0008C8CB C95F5E1F 0000E900 008BFE64 E9FFE7E9 FF7FE903 7500033D FEF0E903 .Õ»±=..u.Õ..ÕÕ.Õd±¦..Õ...^_èùà.. 000100
 05105688 0E468800 0016239A 5052002E 05105688 0E468808 8E16FF88 1E565700 .WV.¦...Ä.F..V....RP.#....F..V.. 000120
 FC76FFFE 76FF0077 E90375FE 4608FC46 88FE5689 FC468900 0018189A 5052002E ..RP......F=.V±.F=.F±u.Õw..v±.v= 000140
 FC76FFFE 76FF006A 005FE984 92880006 E9037500 00300000 17199A50 16F8468D .F%.P.....=..u.Õ..¦..Õ_.j..v±.v= 000160
 9A505200 2E051056 880E4688 0EC48319 4C16F79A 0676FF08 76FF0A76 FF0C76FF .v..v..v..v..%.L..á..F..V....RP. 000180
 89FC4689 000016D3 9A505200 2E051056 880E4688 0019E903 7500003D 000016BB £...=..u.Õ...F..V....RP.&....F=. 0001A0
 000026C8 CBC95F5E 1F0000E9 000088FF 7EE9FC46 89FE4689 00008800 09E9FE56 V±Õ..¦...F±.F=Õ-.¦..Õ...^_èùà&.. 0001C0
 2E050C56 880A4688 00001A95 9A505200 2E050C56 880A4688 D88E1A85 881E5657 WV.¦...Ä.F..V....RP......F..V... 0001E0

Dump of file SATURN:[PCCOMMON.DUMP.DLL]DML.TMP;1 on 18-APR-1990 10:44:35.23
File ID (622,20,0)   End of file block 171 / Allocated 172

Virtual block number 40 (00000028), 512 (0200) bytes

 00300000 18B19A50 16F0468D 0676FF08 76FFFE56 89FC4689 00001AA5 9A505200 .RP.E....F=.V±.v..v..FÞ.P.Ý...=. 000000
 000E7E83 02EAE903 75FE4608 FC468800 000E46C7 0309E984 92880006 E9037500 .u.Õ..¦..Õ..úF8...F=.F±u.Õõ..-8. 000020
 84928800 06E90375 00003000 001AC69A 5016E246 80FC76FF FE76FF02 E1E90374 t.ÕÄ..v±.v=.Fã.P.ó...=..u.Õ..¦.. 000040
 8D5016E0 4680FC76 FFFE76FF E8468948 0E472826 F05EC407 8826E25E C402D2E9 Õ@.á^ã&..á^Þ&+G.H.FÒ.v±.v=.FÅ.P. 000060
 7E83024B E9037400 18788326 0A74C426 F076C42D E85E681A EF13629A 5016EA46 Fõ.P.b.ÿ.k^Ò-ávÞ&át.&.x..t.ÕK..- 000080
 E646880A 74C426F0 76C420E8 5E68E646 FF0003E9 0001E646 C70242E9 037500E0 Å.u.Õ8.úf¦..Õ...F¦k^Ò-ávÞ&át..F¦ 0000A0
 08880470 C4260A74 C426F076 C420E85E 68C38826 E65E6800 FAE90373 08403926 &9a.s.Õ*.k^¦&.úk^Ò-ávÞ&át.&óp..Ä 0000C0
 8A26D888 0470C426 0A74C426 F076C42D E85E68C3 8826E65E 680A4689 04408826 &.a..FÕk^¦&.úk^Ò-ávÞ&át.&óp..Ä&. 0000E0
 FC76FFFE 76FF0676 FF0876FF 0080E90A 468800A6 E9037402 DC7E800C 46880E40 a..FÊ.-Ê.t.Õ¦..FÕÕ...v..v..v±.v= 000100
 010E46C7 0012E903 7402-708 26078826 F45EC41C 0904CC9A 5016F446 8DE676FF .v¦.F¶.P.ä.1.á^¶&..&.G.t.Õ..úF8. 000120
 E910F400 789AF476 FFF676FF 0676FF08 76FF1CF6 13859A00 6AFC76FF FE7‹ ‹00 ..v±.v=j..ç.-..v..v..v-.v¶.x.¶.Õ 000140
 460BF846 8810B006 0B9A5016 F8468DE6 76FFFC76 FFFE76FF 0676FF08 76FF‹ ‹2 &..v..v..v±.v=.v¦.F%.P.Ü  ..F%.F 000160
 13E90016 E90019E9 10DC1385 9A006AFC 76FFFE76 FF0001DE 46C70012 E90374:A *t.Õ..úF8...v±.v=j..ç.Ê.‹..Õ..Õ. 000180
 0003E900 03E90375 000E7E83 FFE7E9FF B1E90375 00033DFF 68E90375 00023D00 .=..u.Õk.=..u.ÕŸ.ÕÕ..-8.u.Ó..Õ.. 0001A0
 C426F076 C42DE85E 68E646FF 0003E900 01E646C7 011DE903 75000E7E 83FEECE9 Õ§±.-8.u.Õ..úF¦..Õ...F¦k^Ò-ávÞ&á 0001C0
 260A74C4 26F076C4 20E85E68 C38826E6 5E6800FB E9037308 403926E6 46880A74 t..F¦&9a.s.Õ«.k^¦&.úk^Ò-ávÞ&át.& 0001E0

Dump of file SATURN:[PCCOMMON.DUMP.DLL]DML.TMP;1 on 18-APR-1990 10:44:35.23
File ID (622,20,0)   End of file block 171 / Allocated 172

Virtual block number 41 (00000029), 512 (0200) bytes

 70C4260A 74C426F0 76C420E8 5E68C388 26E65E68 DA468904 40882608 880470C4 áp..Ä&.a..FÕk^¦&.úk^Ò-ávÞ&át.&áp 000000
 FF0676FF 0876FF00 9AE90A46 880083E9 037402DC 7E800C46 880E408A 26088804 ..Ä&.a..FÊ.-Ê.t.Õ°..FÕÕ...v..v.. 000020
 5EC4EE56 89EC4689 F65688F4 46881E10 04CC9A50 16F4468D E676FFFC 76FFFE76 v±.v=.v¦.F¶.P.a....F¶.V-.F§.VŸá^ 000040
 46831E28 13859A00 6A37FF26 0277FF26 F45EC400 18E90375 02470826 07882 6F4 ¶&..&.G.u.Õ..á^¶&.w.&.7j..ç.(..F 000060
 FF0676FF 0876FF00 4DE919E6 00789AEC 76FFEE76 FF0676FF 0876FFFF D9E904F4 ¶.Õ)..v..v..vŸ.v§.x.¦.ÕM..v..v.. 000080
 FA76FF00 00E90375 FA4608F8 4688197F 06089A50 16F8468D E676FFFC 76FFFE76 v±.v=.v¦.F%.P.Ü....F%.F*u.Õ...v* 0000A0
 03750003 30FF5EE9 03750002 300013E9 0016E900 19E918E7 13859A00 6AF876FF .v%j..ç.Ó.Õ..Õ..Õ..=..u.Õ^.=..u. 0000C0
 19E90375 00003000 0018009A 5052002E 050C5688 0A4688FE EBE9FFE7 E9FFB6E9 ÕÑ.ÕÕ.Õ§±.F..V....RP.....=..u.Õ. 0000E0
 FE468900 00880009 E9FE5689 FC468900 0018649A 5052002E 050C5688 0A468800 ..F..V....RP.d....F=.V±Õ..¦...F± 000100
 56570000 0ECBC8C9 5F5E1F00 00E90000 88078926 DE46880E 5EC4FD08 E9FC4689 .F=Õ.»á^..FÄ&..¦..Õ...^_èùà...WV 000120
 91880006 E9037500 00300000 1FC59A50 16FA468D 0A76FF0C 76FFD88E 1844881E .¦D..Ä.v..v..F*.P.é...=..u.Õ..¦. 000140
 26FA5EC4 0000204C 9A505200 0020459A 016A036A 016A006A 016A006A 0192E984 .Õ..j.j.j.j.j.j..E ..RP.L ..á^*& 000160
 76FF0062 E9037508 46080646 88018697 89260184 87892608 56880646 88065FC4 á_..F..V.&..Ç.&..Ñ..F..F.u.Õb..v 000180
 FF260877 FF26FA5E C404C483 1F3115FA 9AFA76FF FC76FF1F 1212E29A 0A76FF0C ..v..ã....v=.v*.*.1..á.á^*&.w.&. 0001A0
 FF26FA5E C45016FE 46800CC4 831F4F1A 7D9A0A76 FF0C76FF 0676FF08 76FF0677 w..v..v..v..v..).Õ..á..F±.Pá^*&. 0001C0
 001EE9FF D9E90374 00FE7E83 0CC4831F 6E183C9A 0A76FF0C 76FF0677 FF260877 w.&.w..v..v..<.n..á..-±.t.Õ).Õ.. 0001E0
```

```
Dump of file SATURN:[PCCOMMON.DUMP.DLL]DML.TMP;1 on 18-APR-1990 10:44:35.23
File ID (622,20,0)   End of file block 171 / Allocated 172

Virtual block number 42 (0000002A), 512 (0200) bytes

5EC41CAC 13229A0A 76FF0C76 FF04C483 1F7C1547 9A0677FF 260877FF 26FA5EC4 á^"&.w.&.w..G.|..á..v..v..".¨.á^ 000000
3E050857 8826064^ 8826FA5E C400001B 549A5052 003E0508 57882606 478826FA "&.G.&.W..>.RP.T...á^"&.G.&.W..> 000020
8DF276FF F476FFC  7FE90375 F4460BF2 4688F456 89F24689 0000201C 9A505200 .RP.. ...F·.V¶.F·.F¶u.Õ...v¶.v·. 000040
CF681477 FF26F6>E C4007FE9 00008800 06E90375 00003000 0018?A9A 5016F646 F-.P.z...=..u.Õ..|..Õ..á^-&.w.hü 000060
559A5052 003E0508 57882606 478826FA 5EC40000 FFFF9A00 6A006A00 6A006A10 .j.j.j.j......á^"&.G.&.W..>.RP.U 000080
00001E60 9A505200 3E050857 88260647 8826FA5E C4001EE9 03750000 3000001E ...=..u.Õ..á^"&.G.&.W..>.RP.m... 0000A0
016A006A 016A006A FF76E9F4 5689F246 8900008A 00008800 0CE9F456 89F24689 .F·.V¶Õ..|..¤...F·.V¶Õv.j.j.j.j. 0000C0
000CC800 08CAC95F 5E1F0000 E9000088 0000FFFF 9A505200 00FFFF9A 016A016A j.j......RP.....|..Õ...^_èò..à.. 0000E0
06E90375 00003000 0020CE9A 5016FC46 800676FF 0876FFD8 8E1EA288 1E565700 .WV.|Å..Å.v..v..F=.P.ö ..=..u.Õ. 000100
26FC5EC4 00001F8F 9A505200 3E050857 88260647 8826FC5E C400C2E9 84918800 .|..Õò.á^=&.G.&.W..>.RP.....á^=& 000120
E90375F6 4608F446 88F65689 F4468900 0021279A 5052003E 05085788 26064788 .G.&.W..>.RP.'|...F¶.V-.F¶.F-u.Õ 000140
0069E900 00880006 E9037500 00300000 1E829A50 16F84680 F476FFF6 76FF0081 ...v-.v¶.F%.P.ý...=..u.Õ..|..Õi. 000160
06478826 FC5EC400 001FEA9A 006A006A 0A76FF0C 76FF10CE 681477FF 26F85EC4 á^½&.w.hö..v..v.j.j..ô...á^=&.G. 000180
57882606 478826FC 5EC4001E E9037500 00300000 1FFF9A50 52003E05 08578826 &.W..>.RP.....=..u.Õ..á^=&.G.&.W 0001A0
F65689F4 46890000 BA000088 000CE9F6 5689F446 8900001F A49A5052 003E0508 ..>.RP.Ê....F¶.V-Õ..|..¤...F¶.V- 0001C0
0A76FF0C 76FFD88E 2065881E 56570000 04C8C8C9 5F5E1F00 00E90000 88FF74E9 Õt.|..Õ...^_èùà...WV.|e .Á.v..v. 0001E0

Dump of file SATURN:[PCCOMMON.DUMP.DLL]DML.TMP;1 on 18-APR-1990 10:44:35.23
File ID (622,20,0)   End of file block 171 / Allocated 172

Virtual block number 43 (0000002B), 512 (0200) bytes

F79A0A76 FF0C76FF FC76FFFE 76FF0676 FF0876FF 006A2181 122B9A50 16FC4680 .F=.P.+..!j..v..v..v±.v=.v..v..% 000000
FFD88E21 56881E56 5700000E C80008CA C95F5E1F 0000E900 00880EC4 831F0716 ....á.|..Õ...^_èò..à...\'/.|VI.Á. 000020
FA5EC400 ECE98491 880006E9 03750000 30000022 049A5016 FA4680DE 76FF1076 v..v..F".P..".·=..u.Õ..|..Õ&.á^" 000040
01880508 57882606 478826FA 5EC40000 20989A50 5201B805 08578826 06478826 &.G.&.W..|.RP.. ..á^"&.G.&.W..|. 000060
468DF276 FFF476FF 009EE903 75F4460B F2468BF4 5689F246 89000020 AD9A5052 RP.Ù ...F·.V¶.F·.F¶u.Õ...v¶.v·.F 000080
FFF876FF 0A76FF0C 76FF0093 E9000088 0006E903 75000030 00002075 9A5016F6 -.P.u ..=..u.Õ..|..Õ...v..v..v%. 0000A0
26F45688 F2468806 5EC40016 E9037400 FE7E83FE 468908C4 83000507 089AF676 v-.Å....á..F±.-±.t.Õ..á^..F·.V¶& 0000C0
00210A9A 50520188 05085788 26064788 26FA5EC4 005DE900 00880257 89260789 ..&.W.|..Õ].á^"&.G.&.W..|.RP..!. 0000E0
46890000 21E39A50 5201B805 08578826 06478826 FA5EC400 1EE90375 00003000 .=..u.Õ..á^"&.G.&.W..|.RP.Õ!...F 000100
02478926 00008806 5EC4FF57 E9F45689 F2468900 008A0000 88000CE9 F45689F2 ·.V¶Õ..|..¤...F·.V¶ÕW.á^.|..&.G. 000120
FF1076FF D88E2198 881E5657 000006C8 000CCAC9 5F5E1F00 00E90000 88078926 &..|..Õ...^_èò..à...WV.|.!.Å.v.. 000140
E90000FA 46C70072 E98491B8 0006E903 75000030 000021A8 9A5016FC 46800E76 v..F=.P. !..=..u.Õ..|..Õr.úF"..Õ 000160
5EC40A76 FF0C76FF 0046E903 77184739 26FA4680 065FC426 FC5EC4FA 46FF0003 ...F"á^=&á_..F"&9G.w.ÕF..v..v.á^ 000180
74000030 08C48322 2507089A 5052001A 05C10320 FA4E680C 5788260A 478826FC =&.G.&.W.kÑ"-.è...RP.Å.X".á.=..t 0001A0
5EC4FFA4 E90011E9 00008807 8926065E C440FA46 030E4788 26FC5EC4 0017E903 .Õ..á^=&.G..F"ǝá^.&..|..Õ..ÕÉ.á^ 0001C0
FFD88E22 88881E56 5700000E C8000CCA C95F5E1F 0000E900 00880000 07C72606 .&ù...|..Õ...^_èò..à...WV.||".Å. 0001E0

Dump of file SATURN:[PCCOMMON.DUMP.DLL]DML.TMP;1 on 18-APR-1990 10:44:35.23
File ID (622,20,0)   End of file block 171 / Allocated 172

Virtual block number 44 (0000002C), 512 (0200) bytes

0C468800 88E98491 880006E9 03750000 30000022 C89A5016 FC46800E 76FF1076 v..v..F=.P.à"..=..u.Õ..|..ÕE..F. 000000
FC5EC400 00880003 E90001B8 0006E903 7200F67E 83F64689 480E4728 26FC5EC4 á^=&+G.H.F-.--.r.Õ..|..Õ..|..á^= 000020
F2460800 00880003 E90001B8 0006E903 76F64E38 F2468949 184F8826 065FC426 &á .&.O.I.F·;N-v.Õ..|..Õ..|...F· 000040
89001A05 C1032DF6 4E(30C57 88260A47 8826FC5E C40060E9 84968800 06E90375 u.Õ..|..Õm.á^=&.G.&.W.kN--.è.... 000060
468904C4 83242308 029AF876 FFFA76FF 0038E903 75FA460B F84688FA 56?^F846 F%.V".F%.F"u.Õ;..v".v%...#$.á..F 000080
0876FF0A 76FFF876 FFFA76FF 0017E903 76F44639 06468800 22E90375 000C ?F4 ¶=..u.Õ"..F.9F¶v.Õ...v".v%.v..v. 0000A0
C8000CCA C95F5E1F 0000E900 00880007 C626085E C40007E9 08C48323 1707A?9A .Á..#.á.Õ..á^.&ó..|..Õ...^_èò..à 0000C0
03750000 30000023 689A5016 FC46800C 76FF0E76 FFD88E23 58881E56 57000006 ...WV.|(#.Å.v..v..F=.P.k#.¨=..u. 0000E0
C426FC76 C42DFA5E 68FA4689 480E4728 26FC5EC4 0A468800 29E98491 880006E9 Õ..|..Õ)..F.á^=&+G.H.F"k^"-áv=&á 000100
1E565700 000AC800 0ACAC95F 5E1F0000 E9000088 07892606 5EC41840 88260A74 t.&.ǝ.á^.&..|..Õ...^_èò..à...WV. 000120
84918800 06E90375 00003000 0024579A 5016FC46 800A76FF 0C76FF08 8E2447B8 |G$.Ä.v..v..F=.P.W$.¨=..u.Õ..|.. 000140
880006E9 037500F6 7E83F646 8912630F 879A5016 F846800A 76FF0C76 FF003EE9 Õ>..v..v..F%.P...c..F-.—.u.Õ... 000160
00E91C88 04CC9A06 76FF0876 FF206AF8 76FFFA76 FF0A76FF 0C76FF00 1CE9F646 F-Õ...v..v..v".v%j .v..v..ë...Õ. 000180
71000324 81020300 00000224 01000200 D4000622 7A020300 1208CAC9 5F5E1F00 ..^_èò.....z"..å...!$......Ý$..q 0001A0
EF000602 44020300 00000521 68000200 DF000609 48020300 0000031C 80000200 ...§.......H...Õ...h!......D...ÿ 0001C0
00001023 F9000201 01000601 14020300 F8000611 5C020300 00000824 FC000200 ...=$......\...%...........'#... 0001E0
```

```
Dump of file SATURN:[PCCOMMON.DUMP.DLL]DML.TMP;1 on 18-APR-1990 10:44:35.23
File ID (622,20,0)   End of file block 171 / Allocated 172

Virtual block number 45 (0000002D), 512 (0200) bytes

 88000621 CE020300 4C000308 28020301 21000720 F5020300 00001224 A1000200 ...A$......% ..!...(...L...o!..E 000000
 00000000 00000000 C2000622 50020300 5C00021E D8010300 5800021E D1010300 ...!...[...A...\...]"..ô......... 000020
 880006E9 03750000 300000FF FF9A0676 FF0876FF D88EFFFF 881E5657 00000CC8 à...WV.|...Ä.v..v......=..u.Ö..| 000040
 84918800 06E90375 00003000 00004F9A 5016FC46 8D1076FF 1276FF00 D0E984A5 E.ÖÄ..v..v..F=.P.O...=..u.Ö..|.. 000060
 94E98492 880006E9 03750000 300000FF FF9A5016 F646800C 76FF0E76 FF00B2E9 Öÿ..v..v..F-.P.....=..u.Ö..|..Ö. 000080
 03E90001 880006E9 037200FA 7E83FA46 89480E47 2826FC5E C4078826 F65EC400 .á^-&..á^=&+G.H.F*.-*.r.Ö..|..Ö. 0000A0
 0003E900 01880006 E9037618 4F3926F4 4689FA4E 88065FC4 26FC5EC4 00008800 .|..á^=&á_..N*.F¶&9O.v.Ö..|..Ö.. 0000C0
 260A4688 0A74C426 FC76C42D FA5E6800 44E98496 880006E9 0375F446 08000088 |...F¶u.Ö..|..ÖO.k^*-áv=&át..F.& 0000E0
 260A74C4 26FC76C4 2DFA5E68 C388260A 5E680027 E98493B8 0006E903 72084039 9a.r.Ö..|..Ö'.k^.&.úk^*-áv=&át.& 000100
 000008C8 000ECAC9 5F5E1F00 00E90000 88078926 065EC404 40882608 880470C4 áp..Ä&.a.á^.&..|..Ö...^_èb..à... 000120
 AFE984A5 880006E9 03750000 30000000 139A0676 FF0876FF D88E0008 881E5657 WV.|...Ä.v..v......=..u.Ö..|E.ÖE 000140
 880091E9 84918800 06E90375 00003000 0000319A 5016FC46 800E76FF 1076FF00 ..v..v..F=.P.1...=..u.Ö..|..Ö... 000160
 C4000088 0003E900 01880006 E9037200 FA7E83FA 4689480E 472826FC 5EC40C46 F.á^=&+G.H.F*.-*.r.Ö..|..Ö..|..á 000180
 46080000 880003E9 "0018800 06E90376 184F3926 F84689FA 4E88065F C426FC5E ^=&á_..N*.F%&9O.v.Ö..|..Ö..|...F 0001A0
 03720840 39260A46 .:0A74C4 26FC76C4 2DFA5E68 0044E984 96880006 E90375F8 %u.Ö..|..ÖO.k^*-áv=&át..F.&9a.r. 0001C0
 D88B0470 C4260A74 C426FC76 C42DFA5E 68C38826 0A5E6800 27E98493 880006E9 Ö..|..Ö'.k^.&.úk^*-áv=&át.&áp..Ä 0001E0

Dump of file SATURN:[PCCOMMON.DUMP.DLL]DML.TMP;1 on 18-APR-1990 10:44:35.23
File ID (622,20,0)   End of file block 171 / Allocated 172

Virtual block number 46 (0000002E), 512 (0200) bytes

 04881E56 57000008 C8000CCA C95F5E1F 0000E900 00880789 26065EC4 04408826 &.a.á^.&..|..Ö...^_èb..à...WV.|. 000000
 FF1076FF 00AFE984 A5880006 E9037500 00300000 010F9A06 76FF0876 FFD88E01 ..Ä.v..v......=..u.Ö..|E.ÖE..v.. 000020
 FC5EC40C 46880091 E98491B8 0006E903 7500003D 00000120 9A5016FC 46800E76 v..F=.P.-...=..u.Ö..|..Ö...F.á^= 000040
 5FC426FC 5EC40000 880003E9 00018800 06E90372 00FA7E83 FA468948 0E472826 &+G.H.F*.-*.r.Ö..|..Ö..|..á^=&á_ 000060
 06E90375 F8460800 00880003 E90001B8 0006E903 76184F39 26F84689 FA4E8806 ..N*.F%&9O.v.Ö..|..Ö..|...F%u.Ö 000080
 93880006 E9037208 4039260A 46880A74 C426FC76 C42DFA5E 680044E9 84968800 .|..ÖO.k^*-áv=&át..F.&9a.r.Ö..|. 0000A0
 C4024088 26088804 70C4260A 74C426FC 76C42DFA 5E68C388 260A5E68 0027E984 .Ö'.k^.&.úk^*-áv=&át.&áp..Ä&.a.á 0000C0
 76FFD88E 01DF881E 54570000 04C8000C CAC95F5E 1F0000E9 00008807 8926065E ^.&..|..Ö...^_èb..à...WV.|Ö..Ä.v 0000E0
 01EA9A06 76FF0876 FF0086E9 84A58800 06E90375 00003000 0002DE9A 0A76FF0C ..v..8...=..u.Ö..|E.Ö...v..v..Ö. 000100
 00000208 9A5016FC 469D0E76 FF1076FF 006DE984 A5880006 E9037500 00300000 ..=..u.Ö..|E.Öm..v..v..F=.P..... 000120
 76FF5052 002E0508 57882606 478826FC 5EC4004F E98491B8 0006E903 75000030 =..u.Ö..|..ÖO.á^=&.G.&.W....RP.v 000140
 26FC5EC4 0676FF08 76FF0257 89260789 260A5EC4 08C48303 5506869A 0E76FF10 ..v..R.U..á.á^.&..&.W..v..v.á^=& 000160
 5F5E1F00 00E90CC4 83FFFF01 DE9A0E76 FF1076FF 5052002E 05085788 26064788 .G.&.W....RP.v..v..8....á.Ö...^_ 000180
 03750000 30000003 9D9A1276 FF1476FF D88E028A 881E5657 000016C8 000CCAC9 èb..à...WV.|a..Ä.v..v......=..u. 0001A0
 0003BE9A 0A76FF0C 76FF0789 26024789 26000088 125EC401 E9E984A5 880006E9 Ö..|E.ÖÖ.á^.|..&.G.&...v..v../.. 0001C0
 02C59A06 76FF0876 FF000007 C7260A5E C401C3E9 84A58800 06E90375 00003000 .=..u.Ö..|E.Öü.á^.&ú....v..v..é. 0001E0

Dump of file SATURN:[PCCOMMON.DUMP.DLL]DML.TMP;1 on 18-APR-1990 10:44:35.23
File ID (622,20,0)   End of file block 171 / Allocated 172

Virtual block number 47 (0000002F), 512 (0200) bytes

 46801676 FF1876FF 000007C7 26065EC4 01A2E984 A5880006 E9037500 00300000 ..=..u.Ö..|E.ÖÄ.á^.&ú....v..v..F 000000
 0E472826 FA5EC410 4688017C E98491B8 0006E903 7500003D 00000532 9A5016FA *.P.2...=..u.Ö..|..Ö|..F.á^*&+G. 000020
 F04E8806 5FC426FA 5EC40000 880003E9 00018800 06E90372 00F07E83 F0468948 H.Fþ.-þ.r.Ö..|..Ö..|..á^*&á_..Nþ 000040
 84968800 06E90375 EA460800 00880003 E90001B8 0006E903 76184F39 26EA4689 .Fõ&9O.v.Ö..|..Ö..|...Fõu.Ö..|.. 000060
 0112E984 93880006 E9037208 4039260E 46880A74 C426FA76 C42DF05E 68012FE9 Ö/.k^þ-áv*&át..F.&9a.r.Ö..|..Ö.. 000080
 7E83FE46 89044088 26D88804 70C4260A 74C426FA 76C42DF0 5E68C388 260E5E68 k^.&.úk^þ-áv*&át.&áp..Ä&.a..F±.~ 0000A0
 68C38826 0E5E6800 D9E984A0 880006E9 0003E903 7402FE7E 830009E9 037503FE ±.u.Ö...-±.t.Ö..Ö..|..Ö).k^.&.úk 0000C0
 4689EE56 89EC4689 11508826 0F408826 D8880470 C4260A74 C426FA76 C42DF05E ^þ-áv*&át.&áp..Ä&.a.&.P..F$.VŸ.F 0000E0
 EC5EC407 89260A5E C4078826 EC5EC400 A1E98490 880006E9 0374D008 F85689F6 -.V%.Ät.Ö..|..ÖÄ.á^$&..á^.&..á^$ 000100
 5FC426FA 5EC40072 E9037500 3F8326F6 5EC404F6 46830789 26065EC4 02478826 &.G.á^.&...F-.á^-&.7.u.Ör.á^*&á_ 000120
 E98498B8 0006E903 75000030 0000FFFF 9A1276FF 1476FF08 6A026A1A 77FF2606 .&.w.j.j..v..v......=..u.Ö..|..Ö 000140
 92880006 E9037500 00300000 02FC9A50 16F24680 37FF2602 77FF2612 5EC40050 P.á^.&.w.&.7.F.P.=...=..u.Ö..|. 000160
 89261046 88F25EC4 02578926 078926F2 5EC4EE56 88EC4688 04EC4683 002EE984 .Ö...F$..F$.VŸá^.&..&.W.á^..F.&. 000180
 1E565700 000CC800 14CAC95F 5E1F0000 E9000088 06478926 0E4688F2 5EC40447 G.á^..F.&.G.|..Ö...^_èb..à...WV. 0001A0
 84928800 06E90375 00003000 0005E19A 5016F846 800E76FF 1076FF08 8E036C88 |l..Ä.v..v..F%.P.Ä...=..u.Ö..|.. 0001C0
 FF0876FF 0097E984 A588v006 E9037500 00300000 05C39A0A 76FF0C76 FF00B0E9 Ö..v..v..ü...=..u.Ö..|E.Ö...v.. 0001E0
```

```
Dump of file SATURN:[PCCOMMON.DUMP.DLL]DML.TMP;1 on 18-APR-1990 10:44:35.23
File ID (622,20,0)   End of file block 171 / Allocated 172

Virtual block number 48 (00000030), 512 (0200) bytes

5016FC46 8D1276FF 1476FF00 7EE984A5 B80006E9 03750000 30000003 779A0676 v..w...=..u.Õ..|É.Õ-..v..v..F•.P 000000
F4468902 578B2607 8B26F85E C40060E9 B491B800 06E90375 00003000 0003E49A .ð...=..u.Õ..|..Õ'.á^¥&..&.W..F¶ 000020
04F44683 07892606 5EC40247 8B26F45E C4078926 0A5EC407 8B26F45E C4F65689 .V-á^¶&..á^.&..á^¶&.G.á^.&...F¶. 000040
E9000088 0006E903 75003F83 26F45EC4 02578926 078926F8 5EC4F656 8BF44688 .F¶.V-á^¥&..&.W.á^¶&.?.u.Õ..|..Õ 000060
56570000 04C80010 CAC95F5E 1F0000E9 849D8800 00FFFF9A 0E76FF10 76FF0011 ...v..v......|..Õ...^_èò..à...WV 000080
FF0035E9 84A58800 06E90375 00003000 0005AA9A 0676FF08 76FFD88E 0581B81E .|...Ä.v..v.. ...=..u.Õ..|É.Õ5.. 0000A0
FC5EC400 17E98491 880006E9 03750000 30000005 919A5016 FC46800A 76FF0C76 v..v..F•.P.....=..u.Õ..|..Õ..á^• 0000C0
57000008 C80008CA C95F5E1F 0000E900 00880789 26065EC4 16478826 065FC426 &á_.&.G.á^.&..|..Õ...^_èò..à...W 0000E0
008AE984 A5880006 E9037500 00300000 06609A06 76FF0876 FFD88E06 62881E56 V.|b..Ä.v..v..m...=..u.Õ..|É.Õo. 000100
4688009C E98491B8 0006E903 75000030 0000068B 9A5016FC 46800E76 FF1076FF .v..v..F•.P.....=..u.Õ..|..Õ...F 000120
5EC40000 880003E9 00018800 06E90372 00FA7E83 FA468948 0E472826 FC5EC40C .á^•&+G.H.F•.-•.r.Õ..|..Õ..|..á^ 000140
F8460800 00880003 E90001B8 0006E903 76184F39 26F84689 FA4E8806 5FC426FC •&á_..N•.F¥&90.v.Õ..|..Õ..|...F¥ 000160
E9037208 4039260A 46880A74 C426FC76 C42DFA5E 68004FE9 84968800 06E90375 u.Õ..|..Õo.k^•-áv•&át..F.&9a.r.Õ 000180
03260A4E 68065088 26044088 260A74C4 26FC76C4 2DFA5E68 0032E984 93880006 ..|..Õ2.k^•-áv•&át.&.a.&.P.kN.&. 0001A0
0CCAC95F 5E1F0000 E9000088 08C483FF FF07A29A 0676FF08 76FF5052 001305C1 ê...RP.v..v..Ä....á.|..Õ...^_èò. 0001C0
0006E903 75000030 000006CE 9A0676FF 0876FF08 8E06C388 1E565700 0008C800 .à...WV.|ù..Ä.v..v..ö...=..u.Õ.. 0001E0

Dump of file SATURN:[PCCOMMON.DUMP.DLL]DML.TMP;1 on 18-APR-1990 10:44:35.23
File ID (622,20,0)   End of file block 171 / Allocated 172

Virtual block number 49 (00000031), 512 (0200) bytes

00300000 06EC9A50 16FC468D 0C76FF0E 76FF0000 07C72606 5EC400A9 E984A588 |É.Õ`.á^.&ú....v..v..F•.P.&...=. 000000
037200FA 7E83FA46 89480E47 2B26FC5E C40A4688 0083E984 91880006 E9037500 .u.Õ..|..Õ...F.á^•&+G.H.F•.-•.r. 000020
E9037618 4F3926F8 4689FA4E 88065FC4 26FC5EC4 00008800 03E90001 880006E9 Õ..|..Õ..|..á^•&á_..N•.F¥&90.v.Õ 000040
FC76C42D FA5E6800 36E98496 880006E9 0375F846 08000088 0003E900 01880006 ..|..Õ..|...F¥u.Õ..|..Õ6.k^•-áv• 000060
260A74C4 26FC76C4 2DFA5E68 001BE984 96880006 E9037400 10788326 0A74C426 &át.&.x..t.Õ..|..Õ..k^•-áv•&át.& 000080
07A9881E 56570000 14C8000A CAC95F5E 1F0000E9 00008807 8926065E C4104088 .a.á^.&..|..Õ...^_èò..à...WV.|`. 0000A0
7500003D 000008F8 9A5016F8 46800A76 FF0C76FF 0000F246 C70000EC 46C7D88E .ÄúF&..úF`...v..v..F¥.P.¥...=..u 0000C0
5688FC46 88FE5689 FC468908 578B2606 478826F8 5EC400C5 E98491B8 0006E903 .Õ..|..Õé.á^¥&.G.&.W..F•.V±.F•.V 0000E0
5689EE46 89000009 449A5052 003E05FE 5688FC46 880000FF FF9A5052 003E05FE ±.>.RP......F•.V±.>.RP.D....F¥.V 000100
7500003D 000007DA 'A5016F4 468DEE76 FFF076FF 0074E903 75F0460B EE4688F0 Þ.F¥.FÞu.Õt..vÞ.v¥.F¶.P.Õ...=..u 000120
F246FF00 03E90375 14473926 F45EC414 478826F8 5EC40065 E9000088 0006E903 .Õ..|..Õe.á^¥&.G.á^¶&9G.u.Õ...F· 000140
3E05FE56 88FC4688 0019E903 75000030 0000FFFF 9A505200 3E05FE56 88FC4688 .F•.V±.>.RP.....=..u.Õ...F•.V±.> 000160
FF81E9F0 5689EE46 8900008A 00008800 0CE9F056 89EE4689 0000FFFF 9A505200 .RP......F¥.VÞÕ..|..a...F¥.VÞÕ.. 000180
087E881E 56570000 16C80008 CAC95F5E 1F0000E9 00008807 8926F246 88065EC4 á^..F &..|..Õ...^_èò..à...WV.|~. 0001A0
880006E9 03750000 3000000A 039A5016 F8468D0C 76FF0E76 FF0000EA 46C7D88E .ÄúFõ...v..v..F¥.P.....=..u.Õ..| 0001C0
08578826 06478826 F85EC4F2 5689F046 89025788 26078826 065EC400 E6E98491 ..Õl.á^.&..&.W..FÞ.V á^¥&.G.&.W. 0001E0

Dump of file SATURN:[PCCOMMON.DUMP.DLL]DML.TMP;1 on 18-APR-1990 10:44:35.23
File ID (622,20,0)   End of file block 171 / Allocated 172

Virtual block number 50 (00000032), 512 (0200) bytes

52003E05 FE5688FC 46880000 08C79A50 52003E05 FE5688FC 4688FE56 89FC4689 .F•.V±.F•.V±.>.RP.ú....F•.V±.>.R 000000
F44680EC 76FFEE76 FF008EE9 0375EE46 08EC4688 EE5689EC 46890000 0A5D9A50 P.]....F&.V¥.F&.F¥u.Õ...v¥.v&.F¶ 000020
26F45EC4 14478826 F85EC400 76E90000 880006E9 03750000 30000008 989A5016 .P.....=..u.Õ..|..Õv.á^¥&.G.á^¶& 000040
05FE5688 FC468807 8v2602F0 4683F05E C4144788 26F85EC4 0011E903 75144739 9G.u.Õ..á^¥&.G.á^Þ.FÞ.&...F•.V±. 000060
0008D79A 5052003E 05FE5688 FC468800 19E90375 00003000 00092C9A 5052003E >.RP.,...=..u.Õ...F•.V±.>.RP.•.. 000080
E90003E9 0376010A 6E83EE56 89EC4689 00008A00 0088000C E9EE5689 EC468900 ..F&.V¥Õ..|..a...F&.V¥.n..v.Õ..Õ 0000A0
76FF088E 097E881E 56570000 04C8000A CAC95F5E 1F0000E9 000088FF 67E90003 ..Õg.|..Õ...^_èò..à...WV.|-..Á.v 0000C0
26FC5EC4 0013E984 91880006 E9037500 00300000 09939A50 16FC4680 0A76FF0C ..v..F•.P.....=..u.Õ..|..Õ..á^•& 0000E0
0A9A881E 56570000 04C80008 CAC95F5E 1F0000E9 00008807 8926065E C40E4788 .G.á^.&..|..Õ...^_èò..à...WV.|.. 000100
0017E984 91880006 E9037500 00300000 0AAA9A50 16FC4680 0A76FF0C 76FFD88E .Ä.v..v..F•.P.`...=..u.Õ..|..Õ.. 000120
03000A08 CAC95F5E 1F0000E9 00008807 8926065E C4184788 26065FC4 26FC5EC4 á^•&á_.&.G.á^.&..|..Õ...^_èò.... 000140
02000000 10078F00 02000000 03032700 02007100 030AEE02 03000400 0609E202 .ã...Ĩ...Y...q...'.............. 000160
03008800 06090202 03004C00 03051002 0300A600 05078402 03000000 120ADE00 .ß.......Ç...Ï.......L...•...£.. 000180
88064688 D88EFFFF 881E5657 000004C8 00005F00 03064902 0300C200 060A4502 .E...ò...Ï.......à...WV.|...Á.F.. 0001A0
2B9A5016 FC468037 FF260277 FF260A5E C404C483 FFFF0BF8 9A505200 08050856 V....RP.¥....Ĩ.á^.&.w.&.7.F•.P.+ 0001C0
FF26065E C403E868 37FF2602 77FF260A 5EC40020 E90375FE 4608FC46 88005912 .Y..F•.F±u.Õ .á^.&.w.&.7hÒ.á^.&. 0001E0
```

```
Dump of file SATURN:[PCCOMMON.DUMP.DLL]DML.TMP;1 on 18-APR-1990 10:44:35.23
File ID (622,20,0)   End of file block 171 / Allocated 172

Virtual block number 51 (00000033), 512 (0200) bytes

 1E565700 0004C8C8 C95F5E1F 0000E900 00B80AC4 83FFFF14 379A0377 FF260577 w.&.w..7....á.|..Õ...^_èùà...WV. 000000
 260277FF 260A5EC4 04C483FF FF00009A 5052000F 05085688 064688D8 8E000888 |...Ä.F..V....RP......Ã.á^.&.w.& 000020
 FF260277 FF260A5E C40020E9 0375FE46 08FC4688 00C2122B 9A5016FC 468D37FF .7.F•.P.+.õ..F•.F±u.Õ .á^.&.w.&. 000040
 5F5E1F00 00E90000 B80AC483 00311437 9A0377FF 260577FF 26065EC4 03EA6837 7hõ.á^.&.w.&.w..7.1..á.|..Õ...^_ 000060
 00300000 FFFF9A06 76FF0876 FF0000FA 46C7D88E 0071B81E 56570000 06C8C8C9 èùà...WV.|q..ÄúF•...v..v......=. 000080
 800C76FF 0E76FF07 89260247 89260000 B8065EC4 00ADE984 A5B80006 E9037500 .u.Õ..|E.ÕÙ.á^.|..&.G.&...v..v.. 0000A0
 7400127F 8326FC5E C40082E9 84918800 06E90375 00003000 00FFFF9A 5016FC46 F•.P.....=..u.Õ..|..Õ..á^•&....t 0000C0
 261077FF 26001057 8326010E 47832606 5FC426FC 5EC4006F E9849E88 0006E903 .Õ..|..Õo.á^=&á_.&.G..&.W..&.w.& 0000E0
 FA7E83FA 46890EC4 83FFFF01 B09AFC76 FFFE76FF 0A76FF06 76FF0876 FF0E77FF .w..v..v..v..v±.v•.¯....á..F•.-• 000100
 52002E05 08578826 06478826 FC5EC41A 77FF2606 5FC426FC 5EC4002D E9037400 .t.Õ-.á^•&á_.&.w.á^=&.G.&.W....R 000120
 000ACAC9 5F5E1F00 00E9FA46 8BFA4689 0000FFFF 9A37FF26 0277FF26 065EC450 Pá^.&.w.&.7......F•.F•Õ...^_èò.. 000140
 83FE4689 480E4728 26065EC4 0A468800 00F046C7 D88E000A 881E5657 000012C8 à...WV.|Õ..ÄúFÞ...F.á^.&+G.Ñ.F±. 000160
 3926EE46 89FE4E88 065FC426 065EC400 00B80003 E90001B8 0006E903 7200FE7E ~±.r.Õ..|..Õ..|..á^.&á_..N±.FÝ&9 000180
 5E6B01F5 E9849688 0006E903 75EE460B 00008800 03E90001 B80006E9 0376184F O.v.Õ..|..Õ..|...FÝu.Õ_.|..Õ%.k^ 0001A0
 065FC426 065EC401 DAE98496 B80006E9 0374000A 7883260A 74C42606 76C42DFE ±-áv.&át.&.x..t.Õ..|..ÕÕ.á^.&á_. 0001C0
 300000FF FF9A5016 FA468D0A 70FF260A 74C42606 76C42DFE 5E6B026A 1A77FF26 &.w.j.k^±-áv.&át.&.p..F•.P....¯= 0001E0
```

```
Dump of file SATURN:[PCCOMMON.DUMP.DLL]DML.TMP;1 on 18-APR-1990 10:44:35.23
File ID (622,20,0)   End of file block 171 / Allocated 172

Virtual block number 52 (00000034), 512 (0200) bytes

 00003000 0001159A 5016F646 8DFA76FF FC76FF01 A6E98494 B80006E9 03750000 ..u.Õ..|..Õl..v•.v•.F-.P.....=.. 000000
 FFF876FF 006A0A70 FF260A74 C4260676 C42DFE5E 680188E9 84928800 06E90375 u.Õ..|..Õ..k^±-áv.&át.&.p.j..v½. 000020
 03478926 FC568BFA 4688F65E C4078926 0A4688F6 5EC408C4 83001A0A 249AF676 v~.$....á.á^-.F.&..á^-.F•.V•&.G. 000040
 88104688 065FC426 065EC409 57892607 47892612 56881046 88F65EC4 05578926 &.W.á^-.F..V.&.G.&.W.á^.&á_..F.. 000060
 065FC426 065EC400 1DE90372 0E473926 0009E903 7D002BE9 037E1057 39261256 V.&9W.-.Õ+.).Õ..&9G.r.Õ..á¯.&á_. 000080
 5EC40125 47C626F6 5EC41057 89260E47 89261256 88104688 00125683 01104683 .F...V...F..V.&.G.&.W.á^-&óG%.Ã^ 0000A0
 0676FF08 76FF08C4 83033900 009AF676 FFF876FF 0676FF08 76FF0426 47C626F6 -&óG&..v..v..v½.v-...9..á..v..v. 0000C0
 5EC40257 89260789 26FC568B FA46880C 5EC408C4 83016500 699AF676 FFF876FF .v½.v-.l.e..á.á^..F•.V•&..&.W.á^ 0000E0
 000030F0 468908C4 83FFFF0F F19A0676 FF0876FF F676FFF8 76FF0102 47C626F6 -&óG...v½.v-.v..v..þ....á..Fþ=.. 000100
 006DE903 75000C78 83260A74 C4260676 C42DFE5E 680088E9 F0468800 06E90375 u.Õ...FþÕ..k^±-áv.&át.&.x..u.Õm. 000120
 06E90375 00003000 0002699A 5016F246 8D1E77FF 262077FF 26065FC4 26065EC4 á^.&á_.&.w &.w..F·.P.i...=..u.Õ. 000140
 2DFE5E68 0377FF26 0577FF26 F25EC437 FF260277 FF26065E C4004CE9 84928800 .|..ÕL.á^.&.w.&.7á^·&.w.&.w.k^±- 000160
 74C42606 76C42DFE 5E680377 FF260577 FF26F65E C40C70FF 260A74C4 260676C4 áv.&át.&.p.á^-&.w.&.w.k^±-áv.&át 000180
 881E5657 00000AC8 C8C95F5E 1F0000E9 F04688F0 4689FFFF 14499A0E 70FF260A .&.p..l....Fþ.FþÕ...^_èùà...WV.| 0001A0
 E984A588 0006E903 7500003D 000000EA 9A0676FF 0876FF00 00F846C7 D88E0188 |..ÄúF½...v..v..õ...=.u.Õ..|E.Õ 0001C0
 30000003 A59A5016 FC468D10 76FF1276 FF078926 02478926 00008806 5EC400F8 ½.á^.|..&.G.&...v..v..F•.P.É...= 0001E0
```

```
Dump of file SATURN:[PCCOMMON.DUMP.DLL]DML.TMP;1 on 18-APR-1990 10:44:35.23
File ID (622,20,0)   End of file block 171 / Allocated 172

Virtual block numbe  53 (00000035), 512 (0200) bytes

 008AE984 9E880006 E9037400 127F8326 FC5EC400 CDE98491 B80006E9 03750000 ..u.Õ..|..Õë.á^•&....t.Õ..|..Õ¤. 000000
 00008800 03E90001 B80006E9 037200FA 7E83FA46 89480E47 2B26FC5E C40E4688 .F.á^•&+G.H.F•.-•.r.Õ..|..Õ..|.. 000020
 080000B8 0003E900 01880006 E9037618 4F3926F6 4689FA4E 88065FC4 26FC5EC4 á^•&á_..N•.F-&9O.v.Õ..|..Õ..|... 000040
 E9037400 10788326 0A74C426 FC76C42D FA5E6800 6DE98496 B80006E9 0375F646 F-u.Õ¯.|..Õm.k^•-áv•&át.&.x..t.Õ 000060
 30F84689 03250002 9A0676FF 0876FF0E 76FF1076 FF1276FF 0052E984 96880006 ..|..ÕR..v..v..v..v..v..r` %..F½= 000080
 FA5E6837 FF260277 FF26065E C41076FF 1276FF00 20E9F846 880006E9 03750000 ..u.Õ...F½Õ-..v..v.á^.&.w.'.7k^• 0000A0
 0ECAC95F 5E1F0000 E903F808 5F9A0A76 FF0C76FF 1070FF26 0A74C426 FC76C42D -áv•&át.&.p..v..v.._.½.Õ...^_èò. 0000C0
 00003000 0004209A 0676FF08 76FF0000 FA46C7D8 8E041088 1E565700 0006C800 .à...WV.|...ÄúF•...v̄..v.. ...¯=.. 0000E0
 46801076 FF1276FF 07892602 47892600 0088065E C4009AE9 84A58800 06E90375 u.Õ..|E.Õ..á^.|..&.G.&...v..v..F 000100
 03740012 7F8326FC 5EC4006F E98491B8 0006E903 75000030 0000044B 9A5016FC •.P.K...=..u.Õ..|..Õo.á^•&....t_ 000120
 B09AFC76 FFFE76FF 0E76FF06 76FF0876 FF0A76FF 0C76FF00 5CE9849E B80006E9 Õ..|..Õ\..v..v..v..v..v..v±.v•.¯ 000140
 FC5EC41A 77FF2606 5FC426FC 5EC4002D E9037400 FA7E83FA 46890EC4 8304EA01 .õ..á..F•.~•.t.Õ-.á^=&á_.&.w.á^• 000160
 8BFA4689 0000019C 9A37FF26 0277FF26 065EC450 52002E05 08578826 06478826 &.G.&.W....RPá^.&.w.&.7¯.....F•. 000180
 E8020300 00000300 83000200 71000305 74020300 0B0ECAC9 5F5E1F00 00E9FA46 F•Õ...^_èò.....t...q...........Ò 0001A0
 65000200 00000805 2::300200 00000705 B1000200 00000500 9A000200 DF000605 ...Õ.¯...........Ý........X........e 0001C0
 48020300 A6000505 49020300 00001205 39000200 00001002 95000200 00000903 ..............9.......l...l...K 0001E0
```

Dump of file SATURN:[PCCOMMON.DUMP.DLL]DML.TMP;1 on 18-APR-1990 10:44:35.23
File ID (622,20,0)   End of file block 171 / Allocated 172

Virtual block number 54 (00000036), 512 (0200) bytes

88064688 D88EFFFF 881E5657 000004C8 00000000 00000000 00000000 4C000302 ...L...............á...WV.|...Á.F.. 000000
E9000088 0006E903 7400267F 83260A5E C404C493 FFFF08F8 9A505200 18050856 V....RP.%....á.á^.&..&.t.Õ..|..Õ 000020
20E90375 FE4608FC 46ua006C 12289A50 16FC4680 37FF2602 77FF260A 5EC40045 E.á^.&.w.&.7.F=.P.+.l..F=.F±u.Õ 000040
C483FFFF 14379AJ3 77FF2605 77FF2606 5EC403E9 6837FF26 0277FF26 0A. ^400 .á^.&.w.&.7hÕ.á^.&.w.&.w..7....á 000060
1C050856 88064688 D88E0008 881E5657 000004C8 CBC95F5E 1F0000E9 000u 90A .|..Õ...^ èùà...WV.|...Á.F..V... 000080
5EC40045 E9000088 0006E903 7400267F 83260A5E C404C483 FFFF0000 9A505.00 .RP.......Z.á^.&..&.t.Õ..|..ÕE.á^ 0000A0
0A5EC400 20E90375 FE4608FC 468800E8 12289A50 16FC4680 37FF2602 77FF260A .&.w.&.7.F=.P.+.Õ..F=.F±u.Õ .á^. 0000C0
0000880A C4830044 14379A03 77FF2605 77FF2606 5EC403E8 6837FF26 0277FF26 &.w.&.7h$.á^.&.w.&.w..7.D..á.|.. 0000E0
300000FF FF9A0676 FF0876FF D88E0084 881E5657 00000CC8 CBC95F5E 1F0000E9 Õ...^_èùà...WV.|...Á.v..v.......= 000100
00003000 0001549A 5016FC46 8D1076FF 1276FF01 73E984A5 880006E9 03750000 ..u.Õ..|É.Õs..v..v..F=.P.Ī...=.. 000120
46800C76 FF0E76FF 07892602 47892600 0088065E C40155E9 84918800 06E90375 u.Õ..|..ÕU.á^.|..&.G.&...v..v..F 000140
26FC5EC4 078826F6 5EC4012A E98492B8 0006E903 75000030 0000FFFF 9A5016F6 -.P.....=..u.Õ..|..Õ*.á^-&..á^=& 000160
065FC426 FC5EC400 00880003 E90001B8 0006E903 7200FA7E 83FA4689 480E4728 +G.H.F*.-*.r.Õ..|..Õ..|..á^=&á_. 000180
0006E903 75F44608 00008800 03E90001 880006E9 0376184F 3926F446 89FA4E88 .N*.F¶&90.v.Õ..|..Õ..|...F¶u.Õ.. 0001A0
84A08800 06E90372 08403926 0A4680A 74C426FC 76C42DFA 5E6800DA E98496B8 |..ÕÕ.k^*-áv=&át..F.&9a.r.Õ..|.. 0001C0
74020478 83260888 0470C426 0A74C426 FC76C420 FA5E68C3 88260A5E 6600BDE9 Õ§.k^.&.ùk^*-áv=&át.&áp..A&.x..t 0001E0

Dump of file SATURN:[PCCOMMON.DUMP.DLL]DML.TMP;1 on 18-APR-1990 10:44:35.23
File ID (622,20,0)   End of file block 171 / Allocated 172

Virtual block number 55 (00000037), 512 (0200) bytes

F8568BF6 46030088 260459C4 260A7DC4 26FC7EC4 2DFA5E68 260A7668 0039E903 .Õ9.kv.&k^*-á-=&á).&áY.&...F-.V½ 000000
0A5E6800 50E90257 89260789 26065EC4 08C48300 9606869A 1076FF12 76FF5052 RP.v..v..Ñ....á.á^.&..&.M.Õ].k^. 000020
76680036 E9037403 04788326 08880470 C4260A74 C426FC76 C42DFA5E 68C38826 &.ùk^*-áv=&át.&áp..A&.x..t.Õ6.kv 000040
03750240 08260088 26F676C4 18882604 59C4260A 7DC426FC 7EC42DFA 5E68260A .&k^*-á-=&á).&áY.&..áv-&..&.a.u. 000060
0000E900 00880006 E984A088 0006E900 000247C7 26000107 C726065E C4000EE9 Õ..á^.&ù...&ùG...Õ..|..Õ..|..Õ.. 000080
00300000 01089A06 76FF0876 FFD88E01 00881E56 5700000C C8000ECA C95F5E1F .^_èò..á...WV.|...Á.v..v.......=. 0000A0
75000030 000002E6 9A5016FC 46801076 FF1276FF 0209E984 A5880006 E9037500 .u.Õ..|É.Õ...v..v..F=.P.Ī...=..u 0000C0
E9037500 00300000 01299A50 16F64680 0C76FF0E 76FF01E8 E98491B8 0006E903 .Õ..|..Õ$..v..v..F-.P.)...=..u.Õ 0000E0
8826F65E C4018AE9 84AE8800 06E90375 040247F6 26F65EC4 01CDE984 92880006 ..|..Õë.á^-&-G..u.Õ..|Ù.Õn.á^-&. 000100
5EC40000 880003E9 00018800 06E90372 00FA7E83 FA468948 0E472826 FC5EC407 .á^=&+G.H.F*.-*.r.Õ..|..Õ..|..á^ 000120
F4460800 00880003 E90001B8 0006E903 76184F39 26F44689 FA4E8806 5FC426FC =&á_..N*.F¶&90.v.Õ..|..Õ..|...F¶ 000140
E9037208 4039260A 46880A74 C426FC76 C42DFA5E 68016AE9 84968800 06E90375 u.Õ..|..Õj.k^*-áv=&át..F.&9a.r.Õ 000160
26088804 70C4260A 74C426FC 76C42DFA 5E68C388 260A5E68 014DE984 93880006 ..|..ÕM.k^.&.ùk^*-áv=&át.&áp..A& 000180
08880470 C4260A74 C426FC76 C42DFA5E 68C38826 0A5E6800 4AE90374 01047883 .x..t.ÕJ.k^.&.ùk^*-áv=&át.&áp..Ä 0001A0
F8568BF6 46030088 260459C4 260A7DC4 26FC7EC4 2DFA5E68 260A7668 0270FF26 &.p.kv.&k^*-á-=&á).&áY.&...F-.V½ 0001C0
FC76C420 FA5E68C3 88260A5E 6800CE9 0AC48304 4609C69A 0676FF08 76FF5052 RP.v..v..ó.F..á.ÕE.k^.& ùk^*-áv= 0001E0

Dump of file SATURN:[PCCOMMON.DUMP.DLL]DML.TMP;1 on 18-APR-1990 10:44:35.23
File ID (622,20,0)   End of file block 171 / Allocated 172

Virtual block number 56 (00000038), 512 (0200) bytes

76C42DFA 5E68C388 260A5E68 004AE903 74050478 83260888 0470C426 0A74C426 &át.&áp..A&.x..t.ÕJ.k^.&.ùk^*-áv 000000
C4260A7D C426FC7E C42DFA5E 68260A76 680270FF 26088804 70C4260A 74C426FC =&át.&áp..A&.p.kv.&k^*-á-=&á).&á 000020
5E680071 E90AC483 001A09C6 9A0676FF 0876FF50 52F85688 F6460300 88260459 Y.&...F-.V½RP.v..v...ó....á.Õq.k^ 000040
68004AE9 03740404 78832608 880470C4 260A74C4 26FC76C4 2DFA5E68 C388260A .&.ùk^*-áv=&át.&áp..A&.x..t.ÕJ.k 000060
5E68260A 76680270 FF260888 0470C426 0A74C426 FC76C42D FA5E68C3 88260A5E ^.&.ùk^*-áv=&át.&áp..A&.p.kv.&k^ 000080
D79A0676 FF0876FF 5052F856 88F64603 00882604 59C4260A 7DC426FC 7EC42DFA *-á-=&á).&áY.&...F-.V½RP.v..v...= 0000A0
00000EC8 000ECAC9 5F5E1F00 00E90000 880006E9 84938800 06E90AC4 83FFFF23 #...á.Õ..|..Õ..|..Õ...^_èò..á... 0000C0
E3E984A5 880006E9 03750000 30000002 AA9A0676 FF0876FF D88E029F 881E5657 WV.|...Á.v..v.....=..u.Õ..|É.Õò 0000E0
FF01C5E9 84918800 06E90375 00003000 00051B9A 5016FC46 8D1076FF 1276FF01 ..v..v..F=.P.......=..u.Õ..|..Õé.. 000100
F65EC401 A7E98492 880006E9 03750000 30000006 999A5016 F6468D0C 76FF0E76 v..v..F-.P......=..u.Õ..|..Õ|.á^- 000120
00008800 03E90001 880006E9 037200FA 7E83FA46 89480E47 2826FC5E C4078826 &..á^=&+G.H.F*.-*.r.Õ..|..Õ..|... 000140
08000088 0003E900 01880006 E9037618 4F3926F2 4689FA4E 88065FC4 26FC5EC4 á^=&á_..N*.F·&90.v.Õ..|..Õ..|... 000160
72084039 260A4688 0A74C426 FC76C42D FA5E6801 57E98496 880006E9 0375F246 F·u.Õ..|..ÕW.k^*-áv=&át..F.&9a.r 000180
880470C4 260A74C4 26FC76C4 2DFA5E68 C388260A 5E68013A E984A088 0006E903 .Õ..|..Õ:.k^.&.ùk^*-áv=&át.&áp.. 0001A0
0A7DC426 FC7EC42C FA5E6826 0A766806 76FF0876 FF0035E9 03740204 78832608 A&.x..t.ÕS..v..v.kv.&k^*-á-=&á). 0001C0
00E4E90C C4830624 01DE9A10 76FF1276 FF5052F8 5688F646 03008826 0459C426 &áY.&...F-.V½RP.v..v..A.$..á.ÕÕ. 0001E0

```
Dump of file SATURN:[PCCOMMON.DUMP.DLL]DML.TMP;1 on 18-APR-1990 10:44:35.23
File ID (622,20,0)   End of file block 171 / Allocated 172

Virtual block number 57 (00000039), 512 (0200) bytes

 8DE90374 03047883 26088804 70C4260A 74C426FC 76C42DFA 5E68C388 260A5E68 k^.&.ûk^*-áv•&át.&áp..Á&.x..t.Õ§ 000000
 7500003D F446890C C483021B 00DA9A10 76FF1276 FF016A00 6A0676FF 0876FF00 ..v..v.j.j..v..v..Ö....á..F¶=..u 000020
 188B2604 59C426UA 7DC426FC 7EC42DFA 5E68260A 7668009A E9F44688 0006E903 .Õ...F¶Õ..kv.&k^*-á-•&á).&áY.&.. 000040
 7500267F 8326FC5E C4025789 26078926 1FC42606 5EC40250 8B260088 26F676C4 áv-&..&.P.á^.&á.&..&.W.á^•&..&.u 000060
 0277FF26 1FC42606 5EC40042 E9037502 470B2607 8B261FC4 26065EC4 0054E903 .ÕI.á^.&á.&..&.G.u.Õ8.á^.&á.&.w. 000080
 8026F65E C40029E9 84928800 06E90375 00003000 0002C89A 5016F646 8037FF26 &.7.F-.P.à...=..u.Õ..|..Õ).á^-&. 0000A0
 A0880006 E9000088 07892602 47892600 00881FC4 26065EC4 0010E903 7400257F .X.t.Õ..á^.&á.|..&.G.&..|..Õ..|. 0000C0
 04DF9A06 76FF0876 FFD88E04 04881E56 5700000C C8000ECA C95F5E1F 0000E984 .Õ...^_èò..à...WV.|â..Ä.v..v..Õ. 0000E0
 0000072A 9A5016FC 46801076 FF1276FF 0158E984 A5880006 E9037500 00300000 ..=..u.Õ..¡É.ÕX..v..v..F•.P.*... 000100
 00300000 04FD9A50 16F64680 0C76FF0E 76FF013A E98491B8 0006E903 75000030 =..u.Õ..|..Õ:..v..v..F-.P.»...=. 000120
 FA7E83FA 4689480E 472B26FC 5EC4078B 26F65EC4 011CE984 92880006 E9037500 .u.Õ..|..Õ..á^-&..á^=&+G.H.F*.-* 000140
 184F3926 F44689FA 4E88065F C426FC5E C40000B8 0003E900 01880006 E9037200 .r.Õ..|..Õ..|..á^=&á_..N*.F¶&9O. 000160
 2DFA5E6B 00CCE984 96880006 E90375F4 46080000 880003E9 00018800 06E90376 v.Õ..|..Õ..|...F¶u.Õ..|. Õä.k^*- 000180
 68C38826 0A5E6800 AFE984A0 880006E9 03720840 39260A46 880A74C4 26FC76C4 áv•&át..F.&9ə.r.Õ..|..ÕE.k^.&.ûk 0001A0
 0088E984 A0880006 E90'7503 04788326 08880470 C4260A74 C426FC76 C42DFA5E ^*-áv•&át.&áp..Á&.x..u.Õ..|..Õ.. 0001C0
 02508826 00882 6F6 76C41888 260459C4 260A7DC4 26FC7EC4 2DFA5E68 26. 7668 kv.&k^*-á-•&á).&áY.&..áv-&..&.P. 0001E0

Dump of file SATURN:[PCCOMMON.DUMP.DLL]DML.TMP;1 on 18-APR-1990 10:44:35.23
File ID (622,20,0)   End of file block 171 / Allocated 172

Virtual block number 58 (0000003A), 512 (0200) bytes

 470B2607 8826065E C4004BE9 03750026 7F8326FC 5EC40257 89260789 26065EC4 á^.&..&.W.á^•&..&.u.ÕK.á^.&..&.G 000000
 E9037500 00300000 070C9A50 16F6468D 37FF2602 77FF2606 5EC4003C E9037502 .u.Õ<.á^.&.w.&.7.F-.P.....=..u.Õ 000020
 26024789 26000088 065EC400 0DE90374 00257F80 26F65EC4 0020E984 92880006 ..|..Õ .á^-&..X.t.Õ..á^.|..&.G.& 000040
 76FF0876 FFD88E06 E3881E56 5700001E C8000ECA C95F5E1F 0000E900 00880789 ..|..Õ...^_èò..à...WV.¡D..Ä.v..v 000060
 9A5016F6 46801076 FF1276FF 0300E984 A5880006 E9037500 00300000 06EE9A06 ..Ÿ...=..u.Õ..|É.Õ...v..v..F-.P. 000080
 880006E9 03740012 7F8326F6 5EC402E2 E98491B8 0006E903 75000030 000008C1 è...=..u.Õ..|..Õä.á^-&....t.Õ..| 0000A0
 84928800 06E90375 00003000 0008269A 5016E646 800C76FF 0E76FF02 CFE9849E ..Õü..v..v..f|.P.&...=..u.Õ..|.. 0000C0
 26F65EC4 07882 6E6 5EC4029E E984AE88 0006E903 75040247 F626E65E C40281E9 ÕŸ.á^|&-G..u.Õ..|Û.Õ..á^|&..á^-& 0000E0
 065FC426 F65EC400 00880003 E90001B8 0006E903 7200EA7E 83EA4689 480E4728 +G.H.Fõ.-õ.r.Õ..|..Õ..|..á^-&á_. 000100
 0006E903 75E24608 00008800 03E90001 880006E9 0376184F 3926E246 89EA4E88 .Nõ.Fã&9O.v.Õ..|..Õ..|...Fãu.Õ.. 000120
 84938800 06E90372 08403926 0A46880A 74C426F6 76C42DEA 5E68024E E9849688 |..ÕN.k^õ-áv-&át..F.&9ə.r.Õ..|.. 000140
 46890240 8826D888 0470C426 0A74C426 F676C42D EA5E68C3 88260A5E 680231E9 Õ1.k^.&.ûk^õ-áv-&át.&áp..Á&.ə..F 000160
 0374FE46 08FC4688 FE5689FC 468906C4 83FFFF0C 4D9AF676 FFF876FF F476FFF4 ¶.v¶.v½.v-.M....á..F=.Vt.F•.Ft. 000180
 08880470 C4260A74 C426F676 C42DEA5E 68C38826 0A5E6801 EBE98498 880006E9 Õ..|..Õ§.k^.&.ûk^õ-áv-&át.&áp..Á 0001A0
 C4260A74 C426F676 C42DEA5E 68C38826 0A5E6800 9DE9FA46 88FA4689 04408826 &.ə..F*.F*Õ..k^.&.ûk^õ-áv-&át.&á 0001C0
 46030088 260459C4 260A7DC4 26F67EC4 2DEA5E68 260A7668 0270FF26 08880470 p..Á&.p.kv.&k^õ-á--&á).&áY.&...F 0001E0

Dump of file SATURN:[PCCOMMON.DUMP.DLL]DML.TMP;1 on 18-APR-1990 10:44:35.23
File ID (622,20,0)   End of file block 171 / Allocated 172

Virtual block number 59 (0000003B), 512 (0200) bytes

 EA5E68C3 88260A5E 68006EE9 0AC48303 D809C69A FC76FFFE 76FF5052 E85688E6 |.VÒRP.vt.v•.ó.Ü..á.Õn.k^.&.ûk^õ 000000
 7DC426F6 7EC42DEA 5E68260A 76680270 FF26088B 0470C426 0A74C426 F676C42D -áv-&át.&áp..Á&.p.kv.&k^õ-á--&á) 000020
 24E90AC4 830AFC23 D79AFC76 FFFE76FF 5052E856 8BE64603 00882604 59C4260A .&áY.&...F|.VÒRP.vt.v=.æ#•..á.Õ$ 000040
 E9037500 053DFF9D E9037500 043DFF58 E9037500 01300018 E90120E9 84938800 .|..Õ-.Õ..=..u.Õ[.=..u.Õ..=..u.Õ 000060
 06408826 08880470 C4260A74 C426F676 C42DEA5E 68C38826 0A5E68FF DCE9FF48 K.ÕÉ.k^.&.ûk^õ-áv-&át.&áp..Á&.ə. 000080
 0034E903 75024708 26078826 F05EC400 43E90375 D008F256 89F04689 08508826 &.P..FÞ.V·.Åu.ÕC.á^Þ&..&.G.u.Õ4. 0000A0
 7E83E446 891FFF26 F05EC406 76FF0876 FF0A76FF 0C76FF0E 76FF1076 FF1276FF .v..v..v..v..v..v..v.á^Þ&...Fõ.- 0000C0
 0C76FF0E 76FF1076 FF1276FF FF8DE904 F0468300 A7E9E446 880006E9 037500E4 õ.u.Õ...FõÕI..FÞ.Õ§..v..v..v..v. 0000E0
 680075E9 E4468800 06E90375 00003DE4 468904B1 08889A06 76FF0876 FF0A76FF .v..v..v....Ÿ..Fõ=..u.Õ...FõÕu.k 000100
 46890C50 88260A40 8826D888 0470C426 0A74C426 F676C420 EA5E68C3 88260A5E ^.&.ûk^õ-áv-&át.&áp..Á&.ə.&.P..F 000120
 1076FF12 76FF003A E9037502 470B2607 8826EC5E C40049E9 03750008 EE5689EC &.VŸ.Åu.ÕI.á^$&..&.G.u.Õ:..v..v. 000140
 7E83E446 891FFF26 EC5EC4FC 76FFFE76 FF0676FF 0876FF0A 76FF0C76 FF0E76FF .v..v..v..v..v..vt.v•á^$&...Fõ.- 000160
 57000018 C8000ECA C95F5E1F FF87E904 EC468300 07E9E446 880006E9 037500E4 õ.u.Õ...FõÕ...F$.Õñ..^_èò..à...W 000180
 880006E9 03750000 30000008 729A0676 FF0876FF 0000EA46 C7D88E08 67881E56 V.|g..ÄûFõ...v..v..r...=..u.Õ..| 0001A0
 84918800 06E90375 00003000 0008F29A 5016F646 8D1076FF 1276FF03 58E984A5 É.ÕX..v..v..F-.P.·...=..u.Õ..|.. 0001C0
 16EC4680 0C76FF0E 76FF0327 E9849E88 0006E903 7400127F 8326F65E C4033AE9 Õ:.á^-&....t.Õ..|..Õ'..v..v..F$. 0001E0
```

```
Dump of file SATURN:[PCCOMMON.DUMP.DLL]DML.TMP;1 on 18-APR-1990 10:44:35.23
File ID (622,20,0)   End of file block 171 / Allocated 172

Virtual block number 60 (0000003C), 512 (0200) bytes

06E90375 040247F6 26EC5EC4 0309E984 92880006 E9037500 003D0000 08909A50 P.....=..u.Ö..|..Ö..á^$&-G..u.Ö. 000000
06E90372 00F27E83 F2468948 0E472826 F65EC407 8826EC5E C402F6E9 84AEB800 .|Ü.Ö-.á^$&..á^-&+G.H.F .-·.r.Ö. 000020
0006E903 761B4F39 26E84689 F24E8806 5FC426F6 5EC40000 B80003E9 0001B800 .|..Ö..|..á^-&á_..N·.FÖ& Ͻ.v.Ö.. 000040
C426F676 C42DF25E 6802A6E9 84968800 06E90375 E8460800 00880003 E90001B8 |..Ö..|...FÖu.Ö..|..Öl.k^  áv-&á 000060
76C42DF2 5E68C388 260A5E68 0289E984 93880006 E9037208 4039260A 46880A74 t..F.&9a.r.Ö..|..Ö..k^.&.ük^··áv 000080
0E4F0C4D 9AF676FF F876FFF4 76FFF446 89024088 26088804 70C4260A 74C426F6 -&át.&áp..Ä&.a..F¶.v¶.v½.v-.M.O. 0000A0
C388260A 5E680243 E9849888 0006E903 74FE4608 FC4688FE 5689FC46 8906C483 .á..F•.V±.F•.F±t.Ö..|..ÖC.k^.&.ü 0000C0
5E680128 E9FA4688 FA468904 40882608 880470C4 260A74C4 26F676C4 2DF25E68 k^··áv-&át.&áp..Ä&.a..F°.F°Ö+.k^ 0000E0
F25E6826 0A766802 70FF2608 880470C4 260A74C4 26F676C4 2DF25E68 C388260A .&.ük^··áv-&át.&áp..Ä&.p.kv.&k^· 000100
09C69AFC 76FFFE76 FF5052EE 5688EC46 03008826 0459C426 0A7DC426 F67EC42D -á--&á).&áY.&...F$.VYRP.v±.v•.ó. 000120
0270FF26 D8880470 C4260A74 C426F676 C42DF25E 68C38826 0A5E680A C4830077 w..á.k^.&.ük^··áv-&át.&áp..Ä&.p. 000140
88EC4603 00882604 59C4260A 7DC426F6 7EC42DF2 5E68260A 76680676 FF0876FF .v..v.kv.&k^··á--&á).&áY.&...F$. 000160
0A74C426 F676C420 F25E68C3 88260A5E 680085E9 0AC48309 FF09C69A 5052EE56 VYRP.ó....á.Öç.k^.&.ük^··áv-&át. 000180
00882604 59C4260A 7DC426F6 7EC42DF2 5E68260A 76680270 FF26D888 0470C426 &áp..Ä&.p.kv.&k^··á--&á).&áY.&.. 0001A0
20F25E68 C388260A 5E680AC4 830E0823 D79AFC76 FFFE76FF 5052EE56 88EC4603 .F$.VYRP.v±.v•.a#...á.k^.&.ük^·· 0001C0
C42DF25E 68260A76 680676FF 0876FF02 70FF2608 880470C4 260A74C4 26F676C4 áv-&át.&áp..Ä&.p..v..v.kv.&k^··á 0001E0

Dump of file SATURN:[PCCOMMON.DUMP.DLL]DML.TMP;1 on 18-APR-1990 10:44:35.23
File ID (622,20,0)   End of file block 171 / Allocated 172

Virtual block number 61 (00000030), 512 (0200) bytes

0024E90A C4830E66 23D79A50 52EE5688 EC460300 88260459 C4260A7D C426F67E --&á).&áY.&...F$.VYRP.a#f..á.Ö$. 000000
8DE90375 000530FF 56E90375 000430FE CDE90375 00013D00 18E900F7 E9849388 |..Ö%.Ö..=..u.Öe±=..u.ÖV.=..u.Ö§ 000020
7D12829A F676FFF8 76FFEC76 FFEE76FF 0A76FFFC 76FFFE76 FFF476FF FFDCE9FE ±ÖÉ..v¶.v±.v•.v..vY.v$.v½.v-...) 000040
76FFF876 FF08C483 0E7A0000 9AEC76FF EE76FFF6 76FFF876 FFEA4689 10C48309 ..á..Fõ.v½.v-.vY.v$...z..á..v½.v 000060
02024F80 26EC5EC4 0008E903 7400EA7E 8308C483 0A49007C 9AEC76FF EE76FFF6 -.vY.v$.|.I..á..-õ.t.Ö..á^$&.O.. 000080
74164039 260A4688 0A74C426 F676C420 F25E6800 6AE90375 00267F83 26F65EC4 á^-&..&.u.Öj.k^··áv-&át..F.&9a.t 0000A0
FF0A76FF 1076FF12 76FF0026 47C626EC 5EC4F046 8825478A 26EC5EC4 0053E903 .ÖS.á^$&.GX.FÞá^$&ÖG&..v..v..v.. 0000C0
03740025 7F8026EC 5EC40021 E9037401 F07E800A C4830F02 14379A0C 76FF0E76 v..v..7....á..-Þ.t.Öl.á^$&..%.t. 0000E0
5F5E1F00 00E9EA46 88L3C483 00C0205D 9A1076FF 1276FF0C 76FF0E76 FF0014E9 Ö...v..v..v..v..] á..á..FõÖ...^_ 000100
0088F846 89FA4689 00008800 00E246C7 D88E0893 881E5657 000028C8 0C··CAC9 èÒ..á(..WV.|...ÁüFã..|...F°.F½|. 000120
880006E9 03750000 3000000F 749A5016 FC468012 76FF1476 FFF24689 F446 ·00 ..F¶.F·.v..v..F•.P.t...=..u.Ö..| 000140
46800E76 FF1076FF 04DAE984 9E880006 E9037400 127F8326 FC5EC404 EDE98·91 ..ÖU.á^•&....t.Ö..|..ÖÖ..v..v..F 000160
160A4680 0876FF0A 76FF04BC E9849288 0006E903 75000030 00000BC1 9A5016E4 Ö.P.è...=..u.Ö..|..ÖY..v..v..FÖ. 000180
472B26FC 5EC40788 26E45EC4 049EE984 92880006 E9037500 003D0000 0F439A50 P.C...=..u.Ö..|..Ö..á^Ö&..á^=&+G 0001A0
4E88065F C426FC5E C4000088 0003E900 01880006 E9037200 EE7E83EE 468948OE .N.FY.-Y.r.Ö..|..Ö..|..á^=&á_..N 0001C0
96880006 E9037508 46080000 880003E9 00018800 06E90376 184F3926 084689EE Y.FÄ&90.v.Ö..|..Ö..|...FÁu.Ö..|. 0001E0

Dump of file SATURN:[PCCOMMON.DUMP.DLL]DML.TMP;1 on 18-APR-1990 10:44:35.23
File ID (622,20,0)   End of file block 171 / Allocated 172

Virtual block number 62 (0000003E), 512 (0200) bytes

31E98493 880006E9 03720840 39260C46 880A74C4 26FC76C4 2DEE5E68 044EE984 .ÖN.k^Y·áv=&át..F.&9a.r.Ö..|..Öl 000000
03E90001 B80006E9 037200E8 7E83E846 89480E47 2826FC5E C4078826 DA5EC404 .á^Ö&..á^=&+G.H.FÖ.-Ö.r.Ö..|..Ö. 000020
0003E900 01880006 E9037618 4F392608 4689E84E 88065FC4 26FC5EC4 00008800 .|..á^=&á_..NÖ.FÄ&90.v.Ö..|..Ö.. 000040
26064688 0A74C426 FC76C420 E85E6803 E1E98496 880006E9 03750846 08000088 |...FÁu.Ö..|..ÖÄ.k^Ö·áv=&át..F.& 000060
260A74C4 26FC76C4 2DEE5E68 C388260C 5E6803C4 E9849388 0006E903 72084039 9a.r.Ö..|..Öá.k^.&.ük^Y·áv=&át.& 000080
70C4260A 74C426FC 76C420E8 5E68C388 26065E68 F6468904 40882608 880470C4 áp..Ä&.a..F-k^.&.ük^Ö·áv•&át.&áp 0000A0
03F07E83 0015E903 7402F67E 830009E9 037503F6 7E83F046 89044088 26088804 ..Ä&.a..FÞ.--.u.Ö...--.t.Ö...-Þ. 0000C0
0028E903 7403F67E 83035BE9 84A08800 06E90000 E9037402 F07E8300 09E90375 u.Ö...-Þ.t.Ö..Ö..|..Ö(..--.t.Ö+. 0000E0
02400826 008826E4 76C4188B 260459C4 260A7DC4 26FC7EC4 2DEE5E68 260C7668 kv.&k^Y·á-=&á).&áY.&..ávÖ&..&.a. 000100
26FC7EC4 2DE85E68 26067668 002BE903 7403F07E 830327E9 84A18800 06E90375 u.Ö..|Á.Ö'..-Þ.t.Ö+.kv.&k^Ö·á-=& 000120
6802F3E9 84A18800 06E90375 02400826 008826DA 76C4188B 260459C4 260A7DC4 á).&áY.&..ávÖ&..&.a.u.Ö..|Á.Öµ.k 000140
46890850 88260640 88260888 0470C426 0A74C426 FC76C42D EE5E68C3 88260C5E ^.&.ük^Y·áv=&át.&áp..Ä&.a.&.P..F 000160
1276FF14 76FF0039 E9037502 47082607 8826EA5E C4004BE9 0375D008 EC5689EA Ö.V$.Áu.ÖH.á^Ö&..&.G.u.Ö9..v..v. 000180
E27E83E2 46891FFF 26EA5EC4 006A0676 FF0876FF 0A76FF0C 76FF0E76 FF1076FF .v..v..v..v..v..v.j.á^Ö&...Fã.-ã 0001A0
FC76C420 E85E68C3 8826065E 68FF88E9 04EA4683 0286E9E2 46880006 E9037500 .u.Ö...FãÖ...FÖ.Ö|.k^.&.ük^Ö·áv= 0001C0
C4004BE9 0375D008 EC5689EA 46890850 88260640 88260888 0470C426 0A74C426 &át.&áp..Ä&.a.&.P..FÖ.V$.Áu.ÖH.á 0001E0
```

```
Dump of file SATURN:[PCCOMMON.DUMP.DLL]DML.TMP;1 on 18-APR-1990 10:44:35.23
File ID (622,20,0)   End of file block 171 / Allocated 172

Virtual block number 63 (0000003F), 512 (0200) bytes

 0A76FF0C 76FF0E76 FF1076FF 1276FF14 76FF0039 E9037502 47082607 8826EA5E ^õ&..&.G.u.õ9..v..v..v..v..v..v. 000000
 0212E9E2 46880006 E9037500 E27E83E2 46891FFF 26EA5EC4 006A0676 FF0876FF .v..v.j.á^õ&...Fâ.~â.u.Õ...Fãõ.. 000020
 88260888 0470C426 0A74C426 FC76C420 EE5E68C3 88260C5E 68FFB8E9 04EA4683 .Fõ.Õ¡.k^.&.úk^Ÿ-áv=&át.&áp..Ä&. 000040
 9A5016F8 46800C76 FF0E76FF 1076FF12 76FF1476 FF0019E9 03750C40 08260A40 ə.&.ə.u.Õ...v..v..v..v..v..F½.P. 000060
 260A4088 26088804 70C4260A 74C426FC 76C420E8 5E68C388 26065E68 12AF04CC ä.£.k^.&.úk^Õ-áv=&át.&áp..Ä&.ə.& 000080
 CC04CC9A 5016F246 800676FF 0876FF0A 76FF1276 FF1476FF 0019E903 750C4008 .ə.u.Õ...v..v..v..v..v..F .P.ä.ä 0000A0
 468900C1 14499A06 76FF0876 FF0A76FF 0C76FF0E 76FF1076 FF1276FF 1476FF12 ..v..v..v..v..v..v..v..v..|.è..F 0000C0
 F876FFFA 76FF1276 FF1476FF 0011E903 75FA4608 F8468800 3EE90375 000030E2 å=..u.Õ>..F½.F•u.Õ...v..v..v•.v½ 0000E0
 E800789A F276FFF4 76FF1276 FF1476FF 0011E903 75F44608 F2468813 0F00789A .x....F .F¶u.Õ...v..v..v¶.v .x.Ò 000100
 88260888 0470C426 0A74C426 FC76C42D EE5E68C3 88260C5E 680128E9 E2468805 ..Fãõ+.k^.&.úk^Ÿ-áv=&át.&áp..Ä&. 000120
 E9037502 47082607 88260E5E C40068E9 03750008 E05689DE 46890C50 88260A40 ə.&.P..F8.VÅ.Åu.Õk.á^8&..&.G.u.Õ 000140
 F876FFFA 76FF0676 FF0876FF 0A76FF0C 76FF0E76 FF1076FF 1276FF14 76FF003C <..v..v..v..v..v..v..v..v..v•.v½ 000160
 76FFFFB5 E9040E46 *30007E9 0003E903 7500E27E 83E24689 1FFF260E 5EC4006A j.á^8&...Fã.-ã.u.Õ..Õ...F8.Õç..v 000180
 5E680094 E9E24688 0006E903 7500E27E 83143400 789AF876 FFFA76FF 1276FF14 ..v..v•.v½.x.4..-ã.u.Õ...Fãõ..k^ 0001A0
 DE46890C 5088260A 47082608 880470C4 260A74C4 26FC76C4 20E85E68 C3882606 .&.úk^Õ-áv=&át.&áp..Ä&.ə.&.P..F8 0001C0
 FF1276FF 1476FF00 3CE90375 02470826 0788260E 5EC40062 E9037500 08E05689 .VÅ.Åu.Õb.á^8&..&.G.u.Õ<..v..v.. 0001E0

Dump of file SATURN:[PCCOMMON.DUMP.DLL]DML.TMP;1 on 18-APR-1990 10:44:35.23
File ID (622,20,0)   End of file block 171 / Allocated 172

Virtual block number 64 (00000040), 512 (0200) bytes

 891FFF26 DE5EC400 6AF276FF F476FF06 76FF0876 FF0A76FF 0C76FF0E 76FF1076 v..v..v..v..v..v..v¶.v j.á^8&... 000000
 76FFF476 FF1276FF 1476FFFF 85E9040E 46830007 E90003E9 037500E2 7E83E246 Fã.-ã.u.Õ..Õ...F8.Õç..v..v..v¶.v 000020
 1E565700 0018C800 10CAC95F 5E1F0000 E9000088 0006E9E2 468812F3 00789AF2 ·.x.µ..Fãõ..¡..Õ...^ èò..à...WV. 000040
 E9037500 00300000 14979A50 16FC4680 1276FF14 76FF0000 EE46C708 8E0F1C88 ¡...ÄúFŸ...v..v..F=.P̄.....=..u.Õ 000060
 76FF1076 FF0373E9 849E8800 06E90374 00127F83 26FC5EC4 0386E984 91880006 ..¡..Õ..á^=&....t.Õ..¡..Õs..v..v 000080
 800876FF 0A76FF03 55E98492 880006E9 03750000 30000014 859A5016 F04680OE ..Fþ.P.ç...*..u.Õ..¡..ÕU..v..v.. 0000A0
 FC5EC407 8826F05E C40337E9 84928800 06E90375 00003000 000F929A 5016EA46 Fõ.P.....=..u.Õ..¡..Õ7.á^þ&..á^= 0000C0
 5FC426FC 5EC40000 880003E9 00018800 06E90372 00F67E83 F6468948 0E472826 &+G.H.F-.--.r.Õ..¡..Õ..¡..á^=&á  0000E0
 06E90375 E8460800 00880003 E90001B8 0006E903 76184F39 26E84689 F64E8806 ..N-.FÒ&90.v.Õ..¡..Õ..¡...FÒu.Ȭ 000100
 93880006 E9037208 4039260C 46880A74 C426FC76 C42DF65E 6802E7E9 84968800 -¡..ÕÒ.k^--áv=&át..F.&9ə.r.Õ..¡. 000120
 01880006 E9037200 F47E83F4 4689480E 472826FC 5EC40788 26EA5EC4 02CAE984 .Õò.á^õ&..á^=&+G.H.F¶.-¶.r.Õ..¡. 000140
 00018800 06E90376 184F3926 E84689F4 4E88065F C426FC5E C4000088 0003E900 .Õ..¡..á^=&á ..N¶.FÒ&90.v.Õ..¡.. 000160
 880A74C4 26FC76C4 2DF45E68 027AE984 96880006 E90375E8 46080000 880003E9 Õ..¡...FÒu.Ȭ..¡..Õz.k^¶-áv=&át.. 000180
 C426FC76 C42DF65E 68C38826 0C5E6802 5DE98493 880006E9 03720840 39260646 F.&9ə.r.Õ..¡..Õ].k^.&.úk^--áv=&á 0001A0
 0A74C426 FC76C420 F45E68C3 8826065E 68FA4689 04408826 08880470 C4260A74 t.&áp..Ä&.ə..F•k^.&.úk^¶-áv=&át. 0001C0
 830015E9 037402FA 7E830009 E9037503 FA7E83F8 46890440 88260888 0470C426 &áp..Ä&.ə..F½.-•.u.Õ...-•.t.Õ... 0001E0

Dump of file SATURN:[PCCOMMON.DUMP.DLL]DML.TMP;1 on 18-APR-1990 10:44:35.23
File ID (622,20,0)   End of file block 171 / Allocated 172

Virtual block number 65 (00000041), 512 (0200) bytes

 037403FA 7E8301F4 E984A088 0006E900 00E90374 02F87E83 0009E903 7503▸ 7E -½.u.Õ...-½.t.Õ..Õ..¡..Õ¶..-•.t. 000000
 26008826 F076C418 88260459 C4260A7D C426FC7E C420F65E 68260C76 680028.9 Õ+.kv.&k^--á-=&á).&áY.&..ávp&..& 000020
 C420F45E 68260676 680028E9 037403F8 7E8301C0 E984A188 0006E903 75024008 .ə.u.Õ..¡Å.Õä..-½.t.Õ+.kv.&k^¶-á 000040
 E984A188 0006E903 75024008 26008826 EA76C418 88260459 C4260A7D C426FC7E -=&á).&áY.&..ávõ&..&.ə.u.Õ..¡Å.Õ 000060
 88260459 C4260A7D C426FC7E C420F65E 68260C76 680026E9 037403FA 7E83018C ...-•.t.Õ&.kv.&k^--á-=&á).&áY.&. 000080
 5E682606 76680026 E9037403 F87E8302 50892600 89260A56 8808468B F076C418 .ávþ.F..V.&..&.P...-½.t.Õ&.kv.&k^ 0000A0
 02508926 00892610 56880E46 88EA76C4 18882604 59C4260A 7DC426FC 7EC420F4 ¶-á-=&á).&áY.&..ávõ.F..V.&..&.P. 0000C0
 26FC7EC4 20F65E68 260C7668 1A77FF26 065FC426 FC5EC400 45E90374 02FA7E83 .-•.t.ÕE.á^=&á .&.w.kv.&k^--á-=& 0000E0
 EE468900 0017579A 0876FF0A 76FF5052 F25688F0 46030088 260459C4 260A7DC4 á).&áY.&...Fþ.V̄·RP.v..v..W....FŸ 000100
 FF26065F C426FC5E C40045E9 037402F8 7E8300E0 E9EE4688 0006E903 75000030 =..u.Õ...FŸÕÅ..-½.t.ÕE.á^=&á .&. 000120
 5052EC56 88EA4603 00882604 59C4260A 7DC426FC 7EC420F4 5E682606 76681A77 w.kv.&k^¶-á-=&á).&áY.&...Fõ.V̄&RP 000140
 FF0676FF 0092E9EE 46880006 E9037500 003DEE46 890000FF FF9A0E76 FF1076FF .v..v........FŸ=..u.Õ...FŸÕ...v.. 000160
 FFEE4689 10C4830C AE13799A FC76FFFE 76FFF076 FFF276FF EA76FFEC 76FF0C76 v..v&.võ.v·.vþ.v±.v=.y.Ù..á..FŸ. 000180
 9AF076FF F276FFFC 76FFFE76 FF08C483 17B20000 9AF076FF F276FFFC 76FFFE76 v±.v=.v .vþ...ÿ..á..v±.v=.v·.vþ. 0001A0
 76FFFE76 FF08C483 17DA0000 9AEA76FF EC76FFFC 76FFFE76 FF08C483 17C6007C |.ó..á..v±.v=.v&.võ...Õ..á..v±.v 0001C0
 02024F80 26F05EC4 0010E903 7400EE7E 8308C483 1272007C 9AEA76FF EC76FFFC •.v&.võ.|.r..á..-Ÿ.t.Õ..á^þ&.O.. 0001E0
```

```
Dump of file SATURN:[PCCOMMON.DUMP.DLL]DML.TMP;1 on 18-APR-1990 10:44:35.23
File ID (622,20,0)   End of file block 171 / Allocated 172

Virtual block number 66 (00000042), 512 (0200) bytes

8E1451B8 1E565700 0028C800 10CAC95F 5E1F0000 E9EE4688 02024F80 26EA5EC4 &^ô&.O...FŸÕ...^_èò..&(..WV.¡Q.. 000000
46801276 FF1476FF F24689F4 46890000 88F84689 FA468900 00880000 E246C7D8 ÂüFã..¡...F*.F%¡...F¶.F·.v..v..F 000020
03740012 7F8326°C 5EC40485 E98491B8 0006E903 7500003D 00001865 9A5016FC •.P.e...=..u.Õ..¡..Õ..&^•&....t. 000040
06E90375 00003000 0018839A 5016E446 8D0E76FF 1076FF04 72E9849E 880006E9 Õ..¡..Õr..v..v..FÕ.P.....*..u.Õ. 000060
880006E9 03750000 30000014 669A5016 DA468D08 76FF0A76 FF0454E9 84928800 .¡..ÕT..v..v..FÕ.P.f...*..u.Õ..¡ 000080
880006E9 037200EE 7E83EE46 89480E47 2B26FC5E C4078826 E45EC404 36E98492 ..Õ6.&^Õ&..&^•&+G.H.FŸ.-Ÿ.r.Õ..¡ 0000A0
01880006 E9037618 4F392608 4689EE4E 88065FC4 26FC5EC4 00008800 03E90001 ..Õ..¡..&^•&&_..NŸ.FÁ&9O.v.Õ..¡. 0000C0
0A74C426 FC76C42D EE5E6803 E6E98496 880006E9 0375D846 08000088 0003E900 .Õ..¡...FÁu.Õ..¡..Õ|.k^Ÿ-&v•&&t. 0000E0
480E4728 26FC5EC4 0788260A 5EC403C9 E98493B8 0006E903 72084039 260C4688 .F.&9ə.r.Õ..¡..Õè.&^Õ&..&^•&+G.H 000100
89E84E88 065FC426 FC5EC400 00880003 E90001B8 0006E903 7200E87E 83E84689 .FÕ.-Õ.r.Õ..¡..Õ..¡..&^•&&_..NÕ. 000120
E98496B8 0006E903 75D8460B 00008800 03E90001 880006E9 0376184F 39260846 FÁ&9O.v.Õ..¡..Õ..¡...FÁu.Õ..¡..Õ 000140
68035CE9 84938800 06E90372 08403926 0646880A 74C426FC 76C420E8 5E680379 y.k^Õ-&v•&&t..F.&9ə.r.Õ..¡..Õ\.k 000160
065E68F6 4689044  88260888 0470C426 0A74C426 FC76C42D EE5E68C3 88260C5E ^.&.ük^Ÿ-&v•&&t.&&p..Á&.ə..F-k^. 000180
7503F67E 83F0468y 04408826 D8880470 C4260A74 C426FC76 C420E85E 68C38826 &.ük^Õ-&v•&&t.&&p..Á&.ə..FÞ.--.u 0001A0
E90000E9 037402F0 7E830009 E9037503 F07E8300 15E90374 02F67E83 0009E903 .Õ...--.t.Õ...-Þ.u.Õ...-Þ.t.Õ..Õ 0001C0
26D88804 70C4260A 74C426FC 76C42DEE 5E68C388 260C5E68 02F3E984 A0880006 ..¡..Õµ.k^.&.ük^Ÿ-&v•&&t.&&p..Á& 0001E0

Dump of file SATURN:[PCCOMMON.DUMP.DLL]DML.TMP;1 on 18-APR-1990 10:44:35.23
File ID (622,20,0)   End of file block 171 / Allocated 172

Virtual block number 67 (00000043), 512 (0200) bytes

03750247 0B260788 26EA5EC4 0048E903 75D008EC 5689EA46 89085088 26064088 .ə.&.P..Fõ.V$.Âu.ÕH.&^õ&..&.G.u. 000000
EA5EC401 6A0676FF 0876FF0A 76FF0C76 FF0E76FF 1076FF12 76FF1476 FF0039E9 Õ9..v..v..v..v..v..v..v..v.j.&^õ 000020
26065E68 FFB8E904 EA468302 86E9E246 880006E9 037500E2 7E83E246 891FFF26 &...Fã.-ã.u.Õ...FãÕ...Fõ.Õ¡.k^.& 000040
5689EA46 89085088 26064088 26D88804 70C4260A 74C426FC 76C42DE8 5E68C388 .ük^Õ-&v•&&t.&&p..Á&.ə.&.P..Fõ.V 000060
1076FF12 76FF1476 FF0039E9 03750247 0B260788 26EA5EC4 0048E903 75D008EC &.Âu.ÕH.&^õ&..&.G.u.Õ9..v..v..v. 000080
037500E2 7E83E246 891FFF26 EA5EC401 6A0676FF 0876FF0A 76FF0C76 FF0E76FF .v..v..v..v..v.j.&^õ&...Fã.-ã.u. 0000A0
74C426FC 76C42DEE "E68C388 260C5E68 FFB8E904 EA468302 12E9E246 880006E9 Õ...FãÕ...Fõ.Õ¡.k^.&.ük^Ÿ-&v•&&t 0000C0
0E76FF10 76FF1276 FF1476FF 0019E903 750C4008 260A4088 26D88804 70C4260A .&&p..Á&.ə.&.ə.u.Õ...v..v..v..v. 0000E0
C4260A74 C426FC76 C42DE85E 68C38826 065E6818 3804CC9A 5016F846 800C76FF .v..F%.P.ä.Õ.k^.&.ük^Õ-&v•&&t.&& 000100
0676FF08 76FF0A76 FF1276FF 1476FF00 19E90375 0C400826 0A408826 D8880470 p..Á&.ə.&.ə.u.Õ...v..v..v..v..v. 000120
FF0876FF 0A76FF0C 76FF0E76 FF1076FF 1276FF14 76FF1855 04CC9A50 16F24680 .F·.P.ä.U..v..v..v..v..v..v..v.. 000140
1476FF00 11E90375 FA4608F8 4688003E E9037500 0030E246 89179E1C 029A0676 v..@....Fã=..u.Õ>..F%.F*u.Õ...v. 000160
FF1276FF 1476FF00 11E90375 F44608F2 46881898 00789AF8 76FFFA76 FF1276FF .v..v*.v%.x....F·.F¶u.Õ...v..v.. 000180
74C426FC 76C42DEE 5E68C388 260C5E68 0128E9E2 46881C26 00789AF2 76FFF476 v¶.v·.x.&..FãÕ+.k^.&.ük^Ÿ-&v•&&t 0001A0
260E5EC4 0068E903 75D008E0 5689DE46 890C5088 260A4088 26D88804 70C4260A .&&p..Á&.ə.&.P..FB.VÅ.Âu.Õk.&^B& 0001C0
0876FF0A 76FF0C76 FF0E76FF 1076FF12 76FF1476 FF003CE9 03750247 0B260788 ..&.G.u.Õ<..v..v..v..v..v..v..v. 0001E0

Dump of file SATURN:[PCCOMMON.DUMP.DLL]DML.TMP;1 on 18-APR-1990 10:44:35.23
File ID (622,20,0)   End of file block 171 / Allocated 172

Virtual block number 68 (00000044), 512 (0200) bytes

0007E900 03E90375 00E27E83 E246891F FF260E5E C4016AF8 76FFFA76 FF0676FF .v..v*.v%j.&^B&...Fã.-ã.u.Õ..Õ.. 000000
06E90375 00E27E83 1C8D0078 9AF876FF FA76FF12 76FF1476 FFFF85E9 04DE4683 .FB.Õç..v..v..v*.v%.x.§..-ã.u.Õ. 000020
88260888 0470C426 0A74C426 FC76C42D E85E68C3 8826065E 680094E9 E2468800 ..FãÕ..k^.&.ük^Õ-&v•&&t.&&p..Á&. 000040
E9037502 47082607 88260E5E C40062E9 0375D008 E05689DE 46890C50 88260A40 ə.&.P..FB.VÅ.Âu.Õb.&^B&..&.G.u.Õ 000060
F276FFF4 76FF0676 FF0876FF 0A76FF0C 76FF0E76 FF1076FF 1276FF14 76FF003C <..v..v..v..v..v..v..v..v..v¶.v· 000080
76FFFF85 E9040E46 830007E9 0003E903 7500E27E 83E24689 1FFF260E 5EC4016A j.&^B&...Fã.-ã.u.Õ..Õ...FB.Õç..v 0000A0
CAC95F5E 1F0000E9 00008800 06E9E246 88139000 789AF276 FFF476FF 1276FF14 ..v..v¶.v·.x....FãÕ..¡..Õ..._èò 0000C0
209A5016 FC468D12 76FF1476 FF0000EE 46C7D88E 180D881E 56570000 18C80010 ..à...WV.¡...ÁüFŸ...v..v. F•.P̄. 0000E0
9E880006 E9037400 127F8326 FC5EC403 08E98491 880006E9 03750000 30000010 ...=..u.Õ..¡..Õ..&^•&....t.Õ..¡. 000100
E98492B8 0006E903 75000030 0000103E 9A5016F0 46800E76 FF1076FF 02F5E984 .Õ%..v..v..FÞ.P.>...=..u.Õ..¡..Õ 000120
02B9E984 92880006 E9037500 00300000 18349A50 16EA468D 0876FF0A 76FF02D7 •..v..v..Fõ.P.4...=..u.Õ..¡..Õ¿. 000140
0003E900 01880006 E9037200 F67E83F6 4689480E 472826FC 5EC40788 26F05EC4 &^Þ&..&^•&+G.H.F-.--.r.Õ..¡..Õ.. 000160
880003E9 00018800 06E90376 184F3926 E84689F6 4E88065F C426FC5E C4000088 ¡..&^•&&_..N-.FÕ&9O.v.Õ..¡..Õ..¡ 000180
39260C46 880A74C4 26FC76C4 2DF65E68 0269E984 96880006 E90375E8 46080000 ...FÕu.Õ..¡..Õi.k^--&v•&&t..F.&9 0001A0
7E83F446 89480E47 2826FC5E C4078826 EA5EC402 4CE98493 880006E9 03720840 ə.r.Õ..¡..ÕL.&^õ&..&^•&+G.H.F¶.- 0001C0
4F3926E8 4689F44E 88065FC4 26FC5EC4 00008800 03E90001 880006E9 037. ^F4 ¶.r.Õ..¡..Õ..¡..&^•&&_..N¶.FÕ&9O 0001E0
```

```
Dump of file SATURN:[PCCOMMON.DUMP.DLL]DML.TMP;1 on 18-APR-1990 10:44:35.23
File ID (622,20,0)   End of file block 171 / Allocated 172

Virtual block number 69 (00000045), 512 (0200) bytes

 F45E6801 FCE98496 880006E9 0375E846 08000088 0003E900 01880006 E9037618 .v.Õ..|..Õ..|...FÕu.Õ..|..Õ=.k^¶ 000000
 C388260C 5E68010F E98493B8 0006E903 72084039 26064688 0A74C426 FC76C420 -áv=&át..F.&9ə.r.Õ..|..ÕÕ.k^.&.ú 000020
 5E68C388 26065E68 FA468904 40882608 880470C4 260A74C4 26FC76C4 20F65E68 k^--áv=&át.&áp..A&.ə..F°k^.&.úk^ 000040
 830009E9 037503FA 7E83F846 89044088 26088804 70C4260A 74C426FC 76C420F4 ¶-áv=&át.&áp..A&.ə..F%.-°.u.Õ... 000060
 84A08800 06E90000 E9037402 F87E8300 09E90375 03F87E83 0015E903 7402FA7E -°.t.Õ...-%.u.Õ...-%.t.Õ..Õ..|.. 000080
 260459C4 260A7DC4 26FC7EC4 20F65E68 260C7668 0023E903 7403FA7E 830176E9 Õv..-°.t.Õ#.kv.&k^--á-=&á).&áY.& 0000A0
 20F45E68 26067668 0023E903 7403F87E 83008926 02408926 000088F0 76C41888 ..ávÞ|..&.ə.&...-%.t.Õ#.kv.&k^¶- 0000C0
 7402FA7E 83008926 02408926 000088EA 76C41888 260459C4 260A7DC4 26FC7EC4 á-=&á).&áY.&..ávõ|..&.ə.&...-°.t 0000E0
 00882604 59C4260A 7DC426FC 7EC420F6 5E68260C 76680876 FF0A76FF 003DE903 .Õ=..v..v.kv.&k^--á-=&á).&áY.&.. 000100
 D8E9EE46 880006E9 03750000 30EE4689 08C4831F 61060A9A 5052F256 88F04603 .FÞ.V·RP...•..á..FŸ=..u.Õ...FŸÕÄ 000120
 260A7DC4 26FC7EC4 20F45E68 26067668 0E76FF10 76FF0030 E9037402 F87E8300 ..-%.t.Õ=..v..v.kv.&k^¶-á-=&á).& 000140
 06E90375 00003DEE 468908C4 83187C06 0A9A5052 EC5688EA 46030088 260459C4 áY.&...Fõ.VšRP...|..á..FŸ=..u.Õ. 000160
 9AFC76FF FE76FFF0 76FFF276 FFEA76FF EC76FF0C 76FF0676 FF0092E9 EE468800 ..FŸÕ...v..v..vš.võ.v·.vÞ.v±.v•. 000180
 76FF08C4 831FBD00 009AF076 FFF276FF FC76FFFE 76FFEE46 8910C483 17871473 s....á..FŸ.v±.v•.v·.vÞ...§..á..v 0001A0
 009AEA76 FFEC76FF FC76FFFE 76FF08C4 831FD100 7C9AF076 FFF276FF FC76FFFE ±.v•.v·.vÞ.|.Ì..á..v±.v•.vš.võ.. 0001C0
 037400EE 7E8308C4 831AFB00 7C9AEA76 FFEC76FF FC76FFFE 76FF08C4 831FE500 .Ì..á..v±.v•.vš.võ.|.«..á..-Ÿ.t. 0001E0

Dump of file SATURN:[PCCOMMON.DUMP.DLL]DML.TMP;1 on 18-APR-1990 10:44:35.23
File ID (622,20,0)   End of file block 171 / Allocated 172

Virtual block number 70 (00000046), 512 (0200) bytes

 0010CAC9 5F5E1F00 00E90000 8802024F 8026EA5E C402024F 8026F05E C40010E9 Õ..á^Þ&.O..á^õ&.O..|..Õ...^_èò.. 000000
 FF0E76FF 1076FF12 76FF0000 F846C700 00EE46C7 D88E1C0A 881E5657 000012C8 à...WV.|Õ..ÄúFŸ..úF%...v..v..v.. 000020
 1276FF01 59E9F046 0006E9 03750000 30F04689 20610166 9A5016F4 46800C76 v..F¶.P.f.• .FÞ=..u.Õ...FÞÕY..v. 000040
 46880006 E9037500 3DF046 891F1801 669A5016 F2468006 76FF0876 FF1076FF .v..v..v..F·.P.f....FÞ=...Õ...F 000060
 9A5016F6 46805016 FA46800A 76FFF476 FF5016FC 46801076 FF1276FF 0132E9F0 ÞÕ2..v..v..F•.P.v¶.v..F°.ı F-.P. 000080
 00F6E9F0 46880006 E9037500 F07E8300 0FE90375 849DF07E 81F04689 21120364 d..|.FÞ.-Þ..u.Õ...-Þ.u.Õ...FÞÕ-. 0000A0
 0676FF08 76FF0A76 FF0C76FF 0E76FF10 76FF1276 FF0033E9 0374F246 39FA4688 .F°9F·t.Õ3..v..v..v..v..v..v..v. 0000C0
 46880001 EE46C700 8DE9F046 880006E9 03750000 30F04689 1FA91449 9AF676FF .v-.I.`..FÞ=..u.Õ...FÞÕ§.úFŸ...F 0000E0
 9A5016F6 46805016 FA4680FC 76FFFE76 FF1076FF 1276FF00 88E90375 FE4608FC •.F±u.Õ...v..v..v±.v•.F°.P.F-.P. 000100
 7500F07E 830000F0 46C70001 F846C700 0AE90374 849DF07E 81F04689 FFFF0579 y....FÞ.-Þ..t.Õ..úF%..úFÞ...-Þ.u 000120
 76FF0E76 FF1076FF 1276FF00 33E90374 F24639FA 4688006C E9F04688 0006E903 .Õ...FÞÕl..F°9F·t.Õ3..v..v..v..v 000140
 F0468800 06E90375 000030F0 46892006 14499AF6 76FF0676 FF0876FF 0A76FF0C ..v..v..v..v-.I.• .FÞ=..u.Õ...FÞ 000160
 0016E984 A0880006 E9037400 EE7E83FF 78E90375 00F87E83 0001EE46 C70033E9 Õ3.úFŸ...-%.u.Õx..-Ÿ.t.Õ..|..Õ.. 000180
 0012C800 0ECAC95F 5E1F0000 E9F04688 0006E900 00880006 E9037484 9DF07E81 .-Þ..t.Õ..|..Õ...FÞÕ...^_èò..à.. 0001A0
 800C76FF 0E76FF10 76FF1276 FF0000F8 46C70000 EE46C708 8E201888 1E565700 .WV.|. .ÄúFŸ..úF%...v..v..v..v.. 0001C0
 1076FF12 76FF0158 E9F04688 0006E903 75000030 F0468921 FE01669A 5016F446 F¶.P.f.±I.FÞ=..u.Õ...FÞÕX..v..v. 0001E0

Dump of file SATURN:[PCCOMMON.DUMP.DLL]DML.TMP;1 on 18-APR-1990 10:44:35.23
File ID (622,20,0)   End of file block 171 / Allocated 172

Virtual block number 71 (00000047), 512 (0200) bytes

 31E9F046 880006E9 03750000 3DF04689 203A0166 9A5016F2 46800676 FF0876FF .v..v..F·.P.f.: .FÞ=..u.Õ...FÞÕ1 000000
 AF03649A 5016F646 805016FA 46800A76 FFF476FF 5016FC46 801076FF 1276FF01 ..v..v..F•.P.v¶.v..F°.P.F-.P.d.£ 000020
 FA468800 F5E9F046 880006E9 037500F0 7E83000F E9037584 9DF07E81 F0468922 ".FÞ.-Þ..u.Õ...-Þ.u.Õ...FÞÕX..F° 000040
 F676FF06 76FF0876 FF0A76FF 0C76FF0E 76FF1076 FF1276FF 0033E903 74F24639 9F·t.Õ3..v..v..v..v..v..v..v..v- 000060
 4608FC46 880001EE 46C7008C E9F04688 0006E903 75000030 F0468922 FD1CD29A .Ø.»".FÞ=..u.Õ...FÞÕŸ.úFŸ...F•.F 000080
 9205799A 5016F646 805016FA 468DFC76 FFFE76FF 1076FF12 76FF0088 E90375FE ±u.Õ...v..v..v±.v•.F°.P.F-.P.y.. 0000A0
 06E90375 00F07E83 0000F046 C70001F8 46C7000A E9037484 9DF07E81 F0468920  .FÞ.-Þ..t.Õ..úF%..úFÞ...-Þ.u.Õ. 0000C0
 76FF0C76 FF0E76FF 1076FF12 76FF0033 E90374F2 4639FA46 88006BE9 F0468800 ..FÞÕk..F°9F·t.Õ3..v..v..v..v..v 0000E0
 0032E9F0 46880006 E9037500 003DF046 8921601C D29AF676 FF0676FF 0876FF0A ..v..v..v-.Ø.'!.FÞ=..u.Õ...FÞÕ2. 000100
 F07E8100 15E984A3 880006E9 037400EE 7E83FF78 E9037500 F87E8300 01EE46C7 úFŸ...-%.u.Õx..-Ÿ.t.Õ..|É.Õ...-Þ 000120
 1E565700 0008C800 0ECAC95F 5E1F0000 E9F04688 0000F046 C70005E9 03748490 ..t.Õ..úFÞ...FÞÕ...^_èò..à...WV. 000140
 76FF0062 E984A588 0006E903 75000030 000008A3 9A0676FF 0876FFD8 8E2185B8 |Ç!.Ä.v..v..È...=..u.Õ..|É.Õb..v 000160
 FF0C76FF 0044E984 91880006 E9037500 003D0000 23989A50 16FC468D 0E76FF10 ..v..F•.P..#..=..u.Õ..|..ÕÕ..v.. 000180
 47F626F8 5EC40026 E98492B8 0006E903 75000030 00001CEF 9A5016F8 46800A76 v..F%.P.ÿ...=..u.Õ..|..Õ&.á^%&-G 0001A0
 0000E900 00880000 07C72606 5EC40008 E9000107 C726065E C4000BE9 03750402 ..u.Õ..á^.&ú...Õ..á^.&ú...|..Õ.. 0001C0
 C4832408 08029A0A 76FF0C76 FF088E23 51881E56 57000000 C8000CCA C95F5E1F .^_èò..à...WV.|Q#.Ä.v..v.....$.á 0001E0
```

```
Dump of file SATURN:[PCCOMMON.DUMP.DLL]DML.TMP;1 on 18-APR-1990 10:44:35.23
File ID (622,20,0)   End of file block 171 / Allocated 172

Virtual block number 72 (00000048), 512 (0200) bytes

 0024E908 C4832425 07A29A06 76FF0876 FF0A76FF 0C76FF00 17E90372 0E463804 .;F.r.Ô...v..v..v..v..Å.X$.á.Ô$. 000000
 0676C40E 5E880AC4 83003008 1A9A0676 FF0876FF 0A76FF0C 76FF0E76 FF0E4EFF .N..v..v..v..v..v....0..á..^.áv. 000020
 17090203 00000003 21070002 00710003 237A0203 000A90C8 C95F5E1F 0000C626 &ó...^_èù.....z#..q...a!........ 000040
 1F920002 00000008 22730002 00000006 222F0002 00000005 0ED80002 000F0006 ..Ô...Ã......./"......s"........ 000060
 00000000 00A60005 235C0203 00000012 230F0002 00000010 23EC0002 00000009 ......š#......Ô#......\#..Ì..... 000080
 0000BE9A 5016F446 800676FF 0876FF00 000846C7 088EFFFF 881E5657 00002CC8 à,..WV.¡...AúFA...v..v..F¶.P./.. 0000A0
 0006E903 7500247F 8326065F C426F45E C405E5E9 84918800 06E90375 00003000 .=..u.Ô..¡..Ôl.á^¶&á_.&..$.u.Ô.. 0000C0
 004E05FA 5688F846 88FA5689 F8468908 57882606 478826F4 5EC405CE E984A788 ¡Ì.Ôo.á^¶&.G.&.W..F%.V°.F%.V°.N. 0000E0
 F45EC400 012447C7 26F85EC4 05A0E984 90880006 E9037400 080000FF FF9A5052 RP......Åt.Ô..¡..Ô..á^%&úG$..á^¶ 000100
 9A5016E2 4680266A 026A1A77 FF26F85E C4000026 47C726F8 5EC40001 1247C726 &úG...á^%&úG&..á^%&.w.j.j&.Fã.P. 000120
 01699A50 16044680 E276FFE4 76FF0562 E98494B8 0006E903 7500003D 0000FFFF ....=..u.Ô..¡..Ôb..vÔ.vä.Fá.P.Ì. 000140
 8302240A 249A0476 FF0676FF 006A266A 0544E984 92880006 E9037500 00300000 ..=..u.Ô..¡..ÔD.j&j..ve.vá.$.$.. 000160
 045EC402 57882607 8826F45E C40A5789 26084789 26FA5688 F84688D4 5EC408C4 Á.á^á.F%.V°&.G.&.W.á^¶&..&.W.á^á 000180
 26224789 26F45EC4 2C578926 2A478926 E45688E2 4688F85E C4025789 26078926 &..&.W.á^%.Fã.VÔ&.G°&.W,á^¶&.G"& 0001A0
 88F84688 0000FFFF 9A505200 4E05FA56 88F84688 00012247 C726F85E C4245789 .W$á^%&úG"...F%.V°.N.RP......F%. 0001C0
 E076FF04 88E90375 E04608DE 4688E056 89DE4689 0000FFFF 9A505200 4E05FA56 V°.N.RP......FB.VÅ.FB.FÅu.Ô...vÅ 0001E0

Dump of file SATURN:[PCCOMMON.DUMP.DLL]DML.TMP;1 on 18-APR-1990 10:44:35.23
File ID (622,20,0)   End of file block 171 / Allocated 172

Virtual block number 73 (00000049), 512 (0200) bytes

 8826F05E C40499E9 84928800 06E90375 00003000 000180 9A 5016F046 800E76FF .vB.FÞ.P.§...=..u.Ô..¡..Ô..á^Þ&. 000000
 88F0468B 0777FF26 F05EC403 77FF2605 77FF26F0 5EC40676 FF0876FF 038AE907 .Ô...v..v.á^Þ&.w.&.w.á^Þ&.w...FÞ. 000020
 00026C9A 50160A46 800377FF 260577FF 26F05EC4 02590888 9A505200 0805F256 V·...RP...Y.á^Þ&.w.&.w..FÔ.P.Ì.. 000040
 F05EC402 4788260A 5EC40247 8A26F05E C40445E9 84928800 06E90375 00003000 .=..u.Ô..¡..ÔE.á^Þ&.G.á^Ô&.G.á^Þ 000060
 0374FE46 08FC4688 FE5689FC 468906C4 83FFFF0C 409AF476 FFF676FF 0977FF26 &.w..v-.v¶.M....á..F•.Vt.F•.Ft. 000080
 52000805 F25688F0 4688FC76 FFFE76FF 0977FF26 F05EC404 08E98498 880006E9 Ô..¡..Ô..á^Þ&.w...vt.v•.FÞ.V·...R 0000A0
 F05EC404 77FF2606 77FF26F0 5EC40676 FF0876FF 0307E90A C483FFFF 09C69A50 P.ó....á.Ô...v..v.á^Þ&.w.&.w.á^Þ 0000C0
 FF26F05E C402E01C D29A0E77 FF26F05E C40A77FF 260C77FF 26F05EC4 0877FF26 &.w.á^Þ&.w.&.w.á^Þ&.w..•.Ù.á^Þ&. 0000E0
 5EC40396 E9849288 0006E903 75000030 0000029D 9A50160A 46800477 FF260677 w.&.w..FÔ.P.....=..u.Ô..¡..Ô..á^ 000100
 0003009A 50160A46 800A77FF 260C77FF 26F05EC4 02478826 DA5EC402 478A26F0 Þ&.G.á^Ô&.G.á^Þ&.w.&.w..FÔ.P.... 000120
 0273E902 4788260A 5EC40347 8A26F05E C40365E9 84928800 06E90375 00003000 .=..u.Ô..¡..Ôe.á^Þ&.G.á^Ô&.G.Ôs. 000140
 260C77FF 26F05EC4 0877FF26 F05EC404 77FF2606 77FF26F0 5EC40676 FF0876FF .v..v.á^Þ&.w.&.w.á^Þ&.w.á^Þ&.w.& 000160
 9A50160A 46800477 FF260677 FF26F05E C4FFFF14 499A0E77 FF26F05E C40A77FF .w.á^Þ&.w..Ì...á^Þ&.w.&.w..FÔ.P. 000180
 02478826 DA5EC402 478A26F0 5EC40302 E9849288 0006E903 75000030 00000331 1...=..u.Ô..¡..Ô..á^Þ&.G.á^Ô&.G. 0001A0
 84928800 06E90375 00003000 00FFFF9A 50160A46 800A77FF 260C77FF 26F05EC4 á^Þ&.w.&.w..FÔ.P.....=..u.Ô..¡.. 0001C0
 800377FF 260577FF 26F05EC4 01DFE902 4788260A 5EC40347 8A26F05E C402D1E9 Ôl.á^Þ&.G.á^Ô&.G.ÔÔ.á^Þ&.w.&.w.. 0001E0

Dump of file SATURN:[PCCOMMON.DUMP.DLL]DML.TMP;1 on 18-APR-1990 10:44:35.23
File ID (622,20,0)   End of file block 171 / Allocated 172

Virtual block numbe- 74 (0000004A), 512 (0200) bytes

 E904024F 8026DA5E C4029DE9 84928800 06E90375 00003000 0003939A 50160A46 FÔ.P.....=..u.Ô..¡..Ô..á^Ô&.O..Ô 000000
 880006E9 03750000 30000003 C19A5016 DA468D03 77FF2605 77FF26F0 5EC40181 Ý.á^Þ&.w.&.w..FÔ.P.è...=..u.Ô..¡ 000020
 5016EA46 800277FF 260477FF 26F05EC4 0183E904 02778026 DA5EC402 6FE98492 ..Ôo.á^Ô&.w..Ô..á^Þ&.w.&.w..Fõ.P 000040
 0876FFEE 46892847 8826EA5E C40241E9 84928800 06E90375 00003000 0004539A .S...=..u.Ô..¡..ÔA.á^Ô&.G(.FŸ.v. 000060
 50520008 05F25688 F0468806 77FF26F0 5EC40277 FF260477 FF26F05E C40676FF .v.á^Þ&.w.&.w.á^Þ&.w..FÞ.V·...RP 000080
 C40000FF FF9ADE76 FFE076FF 006FE903 72064739 26EE4688 F05EC4FF FF04599A .Y...á^Þ.FŸ&9G.r.Ôo..vÅ.vB.....á 0000A0
 06E90375 00003000 0000A09A 50160E46 80500009 05EE4688 026A1A77 FF26F85E ^%&.w.j..FŸ...P.FB.P.....=..u.Ô. 0000C0
 880006E9 03750000 30000000 109A5016 F04680 0E 76FFE076 FF01CDE9 84948800 .¡..Ôe..vÅ.vB.FÞ.P.....=..u.Ô..¡ 0000E0
 26024789 26F05EC4 05578826 03478826 EA5EC400 0807C726 F05EC401 AFE98492 ..ÔC.á^Þ&ú...á^Ô&.G.&.W.á^Þ&.G.& 000100
 4688E856 89E64689 06C48301 E00C4D9A F476FFF6 76FF0677 FF26F05E C4045789 .W.á^Þ&.w..v-.v¶.M.Ù..á..FÌ.VÔ.F 000120
 FF26E65E C40024E9 0375003F 8326E65E C40165E9 84988800 06E90374 E84608E6 Ì.FÔt.Ô..¡..Ôe.á^Ì&.?.u.Ô$.á^Ì&. 000140
 C40AC483 000009C6 9A505200 0805F256 88F0468B 50520002 05E85688 E6468837 7.FÌ.VÔ...RP.FÞ.V·...RP.ó.Ì..á.á 000160
 50520002 05F25688 F0468806 76FF0876 FF0044E9 06478926 F05EC407 8826E65E ^Ì&..á^Þ&.G.ÔD..v..v..FÞ.V·...RP 000180
 21A7FF2E 93C003FF EFE90376 00083000 03200025 E90028E9 0028E9FF FF00F79A .%...Ô+.Ô(.Ô%.-..=..v.Ôÿ..á...Ì! 0001A0
 FA5688F8 46881A77 FF26F85E C404EF05 08050803 80038203 5402C002 2C018405 ...,.á.Ì...¯.....ÿ.á^%&.w..F%.V° 0001C0
 83E90846 880006E9 03750000 30084689 0000FFFF 9ADE76FF E076FF50 52005E05 .^.RP.vÅ.vB......FÅ=..u.Ô...FÅÔ° 0001E0
```

```
Dump of file SATURN:[PCCOMMON.DUMP.DLL]DML.TMP;1 on 18-APR-1990 10:44:35.23
File ID (622,20,0)   End of file block 171 / Allocated 172

Virtual block number 75 (0000004B), 512 (0200) bytes

F85EC400 19E90374 023F8326 F05EC400 00FFFF9A 5052004E 05FA5688 F84o.^00 ..F%.V°.N.RP.....á^Þ&.7.t.Õ..á^% 000000
E9037401 3F8326F0 5EC40E57 89260C47 8926045E C4025788 26078826 665FC. '5 &á f&..&.W.á^&&.G.&.W.á^Þ&.7.t.Õ 000020
F8468800 19E90375 00003D00 0001389A 5052004E 05FA5688 F8468800 40E900L3 ..Õ9..F%.V°.N.RP.8...=..u.Õ...F% 000040
89DE4689 00008A00 0088000C E9E05689 DE468900 0001489A 5052004E 05FA5688 .V°.N.RP.H....F8.VÁÕ..|..o...F8. 000060
26F45EC4 00002447 C726F85E C404C483 FFFF0000 9AF476FF F676FFFB 60E9E056 VÁÕm«.v-.v¶......á.á^%&úG$..á^¶& 000080
5700002C C80004CA C95F5E1F 0000E900 00880000 2247C726 F85EC400 001247C7 úG...á^%&úG"..|..Õ...^ èÕ..à,..W 0000A0
7500003D 00000365 9A5016F4 46800676 FF0876FF 00000846 C7D88E00 08881E56 V.|...AúFÄ...v..v..F¶.P.e...=..u 0000C0
E5E984A7 880006E9 03750024 7F832606 5FC426F4 5EC405FC E9849188 0006E903 .Õ..|..Õ».á^¶&á_.&..$.u.Õ..|Ï.Õl 0000E0
00639A50 52005E05 FA5688F8 4688FA56 89F84689 08578826 06478826 F45EC405 .á^¶&.G.&.W..F%.V°.F%.V°.^.RP.c. 000100
011247C7 26F45EC4 00012447 C726F85E C405B7E9 84908800 06E90374 D0080000 ...Ât.Õ..|..Õñ.á^%&úG$..á^¶&úG.. 000120
3D000004 359A5016 E2468026 6A026A1A 77FF26F8 5EC40000 2647C726 F85EC400 .á^%&úG&..á^%&.w.j.j&.Fã.P.5...= 000140
00003D00 0007849A 50160446 80E276FF E476FF05 79E98494 880006E9 03750000 ..u.Õ..|..Õy..vÕ.vä.Fá.P.....=.. 000160
D45EC408 C483083F 0A249AD4 76FFD676 FF006A26 6A0558E9 84928800 06E90375 u.Õ..|..Õ(.j&j..v».vá.$.7..á.á^á 000180
89260789 26045EC4 02578826 07882 6F4 5EC40A57 89260847 8926FA56 88F84688 .F%.V°&.G.&.W.á^¶&..&.W.á^&&..&. 0001A0
5EC42457 89262247 8926F45E C42C5789 262A4789 26E45688 E24688F8 5EC40257 W.á^%.Fã.VÕ&.G°&.W,á^¶&.G"&.W$á^ 0001C0
005E05FA 5688F846 88000005 819A5052 005E05FA 5688F846 88000222 47C726F8 %&úG"...F%.V°.^.RP.Ÿ....F%.V°.^. 0001E0

Dump of file SATURN:[PCCOMMON.DUMP.DLL]DML.TMP;1 on 18-APR-1990 10:44:35.23
File ID (622,20,0)   End of file block 171 / Allocated 172

Virtual block number 76 (0000004C), 512 (0200) bytes

46800E76 FFE076FF 049FE903 75E04608 DE4688E0 56890E46 89000005 C99A5052 RP.è....F8.VÁ.F8.FÁu.Õ...vÁ.v8.F 000000
FF039EE9 078826F0 5EC40480 E98492B8 0006E903 7500003D 000007D8 9A5016F0 Þ.P.Å...=..u.Õ..|..Õ¯.á^Þ&..Õ... 000020
000805F2 5688F046 880777FF 26F05EC4 0377FF26 0577FF26 F05EC406 76FF0876 v..v.á^Þ&.w.&.w.á^Þ&.w..FÞ.V·... 000040
7500003D 00000887 9A50160A 46800377 FF260577 FF26F05E C408740B 8B9A5052 RP...t.á^Þ&.w.&.w..FÕ.P.....=..u 000060
FF0977FF 26F05EC4 02478826 DA5EC402 478A26F0 5EC4045C E98492B8 0006E903 .Õ..|..Õ\.á^Þ&.G.á^Õ&.G.á^Þ&.w.. 000080
98880006 E90374FE 4608FC46 88FE5689 FC468906 C4830493 0C4D9AF4 76FFF676 v-.v¶.M....á..F».Vt.F».Ftt.Õ..|. 0000A0
DA09C69A 50520008 05F25688 F04688FC 76FFFE76 FF0977FF 26F05EC4 0422E984 .Õ".á^Þ&.w..vt.v».FÞ.V·...RP.6.Õ 0000C0
C40877FF 26F05EC4 0477FF26 0677FF26 F05EC406 76FF0876 FF031DE9 0AC48304 ..á.Õ...v..v.á^Þ&.w.&.w.á^Þ&.w.á 0000E0
77FF2606 77FF26F0 5EC40908 14499A0E 77FF26F0 5EC40A77 FF260C77 FF26F05E ^Þ&.w.&.w.á^Þ&.w..|...á^Þ&.w.&.w 000100
02478A26 F05EC403 A0E98492 880006E9 03750000 30000008 B89A5016 DA468D04 ..FÕ.P.|...=..u.Õ..|..ÕU.á^Þ&.G. 000120
7500003D 00000918 9A50160A 46800A77 FF260C77 FF26F05E C4024788 260A5EC4 á^Õ&.G.á^Þ&.w.&.w..FÕ.P.....=..u 000140
76FF0876 FF0289E9 02478826 DA5EC403 478A26F0 5EC4037C E98492B8 0006E903 .Õ..|..Õ|.á^Þ&.G.á^Õ&.G.Õ...v..v 000160
5EC40A77 FF260C77 FF26F05E C40877FF 26F05EC4 0477FF26 0677FF26 F05EC406 .á^Þ&.w.&.w.á^Þ&.w.á^Þ&.w.&.w.á^ 000180
30000009 4C9A5016 DA468D04 77FF2606 77FF26F0 5EC401AA 1C029A0E 77FF26F0 Þ&.w..0.¯.á^Þ&.w.&.w..FÕ.P.L...= 0001A0
FF26F05E C4024788 260A5EC4 02478A26 F05EC403 19E98492 880006E9 03750000 ..u.Õ..|..Õ..á^Þ&.G.á^Õ&.G.á^Þ&. 0001C0
5EC402E8 E98492B8 0006E903 7500003D 00000980 9A50160A 46800A77 FF260C77 w.&.w..FÕ.P.....=..u.Õ..|..ÕÕ.á^ 0001E0

Dump of file SATURN:[PCCOMMON.DUMP.DLL]DML.TMP;1 on 18-APR-1990 10:44:35.23
File ID (622,20,0)   End of file block 171 / Allocated 172

Virtual block number 77 (0000004D), 512 (0200) bytes

9A50160A 46800377 FF260577 FF26F05E C401F5E9 02478826 DA5EC403 478A26F0 Þ&.G.á^Õ&.G.ÕX.á^Þ&.w.&.w..FÕ.P. 000000
F05EC401 C7E90102 47C6260A 5EC40284 E98492B8 0006E903 7500003D 000009AE Ü...=..u.Õ..|..ÕÇ.á^Õ&6G..Õú.á^Þ 000020
0286E984 92880006 E9037500 003D0000 06389A50 160A4680 0377FF26 0577FF26 &.w.&.w..FÕ.P.8...=..u.Õ..|..Õ.. 000040
00000A6E 9A5016EA 46800277 FF260477 FF26F05E C40199E9 04024F80 260A5EC4 á^Õ&.O..Õ..á^Þ&.w.&.w..Fõ.P.n... 000060
5EC40676 FF0876FF EE468928 478B26EA 5EC40258 E98492B8 0006E903 7500003D =..u.Õ..|..ÕX.á^Õ&.G(.FŸ.v..v.á^ 000080
04030459 9A505200 0805F256 88F04688 0677FF26 F05EC402 77FF2604 77FF26F0 Þ&.w.&.w.á^Þ&.w..FÞ.V·...RP.Y... 0000A0
77FF26F8 5EC40000 04189ADE 76FFE076 FF006FE9 03720647 3926EE46 88F05EC4 á^Þ.FŸ&9G.r.Õo..vÁ.v8.....á^%&.w 0000C0
E98494B8 0006E903 7500003D 000006B8 9A50160E 46805000 0905EE46 88026A1A .|..FŸ...P.F8.P.E...=..u.Õ..|..Õ 0000E0
01C6E984 92880006 E9037500 003D0000 06D99A50 16F04680 DE76FFE0 76FF01E4 8..vÁ.v8.FÞ.P.1...=..u.Õ..|..Õ6. 000100
5EC40457 89260247 8926F05E C4055788 26034788 26EA5EC4 000807C7 26F05EC4 á^Þ&ú...á^Õ&.G.&.W.á^Þ&.G.&.W.á^ 000120
74E84608 E64688E8 ''89E646 8906C483 08080C4D 9AF476FF F676FF06 77FF26F0 Þ&.w..v-.v¶.M....á..F|.VÕ.F|.FÕt 000140
88E64688 37FF26E6 ::C40024 E9037500 3F8326E6 5EC4017C E9849888 0006E903 .Õ..|..Õ|.á^|&.7.u.Õ$.á^|&.7.F|. 000160
078826E6 5EC40AC4 8306F809 C69A5052 000805F2 5688F046 88505200 0205E856 VÕ...RP.FÞ.V·...RP.6.%..á.á^|&.. 000180
050300F7 9A505200 0205F256 88F04688 0676FF08 76FF005A E9064789 26F05EC4 á^Þ&.G.ÕZ..v..v..FÞ.V·...RP.X... 0001A0
00022000 27E9002A E9002DE9 124FFF26 F45EC400 37E91247 FF26F45E C40041E9 ÕA.á^¶&.G.Õ7.á^¶&.O.Õ-.Õ*.Õ'.-.. 0001C0
082309C8 099D096F 08D80847 079F082D 0850A7FF 2E93C003 FFEFE903 7600093D =..v.Õy..á...ÏP.-...G.Ü.o...ù.#. 0001E0
```

```
Dump of file SATURN:[PCCOMMON.DUMP.DLL]DML.TMP;1 on 18-APR-1990 10:44:35.23
File ID (622,20,0)   End of file block 171 / Allocated 172

Virtual block number 78 (0000004E), 512 (0200) bytes

00054C9A DE76FFE0 76FF5052 004E05FA 568BF846 8B1A77FF 26F85EC4 080A0837 7...á^½&.w..F½.V*.N.RP.vÅ.v8.L.. 000000
05609A50 52005E05 FA568BF8 46880084 E9084688 0006E903 75000030 08468900 ..FA=..u.Õ...FAÕÇ..F½.V*.^.RP.m. 000020
26045EC4 02578826 07882656 5FC426F8 5EC40019 E9037401 3F8326F0 5EC40000 ..á^P&.?.t.Õ..á^½&á V&..&.W.á^&& 000040
005E05FA 568BF846 880040E9 0003E903 7400127F 8326F45E C40E5789 260C4789 .G.&.W.á^¶&....t.Õ..Õ@..F½.V*.^. 000060
89000007 639A50?2 005E05FA 568BF846 880019E9 03750000 30000007 539A5052 RP.S...=..u.Õ...F½.V*.^.RP.c.... 000080
00009AF4 76FFF676 FFF856E9 E05689DE 46890000 BA000088 000CE9E0 5689DE46 F8.VÀÕ..|..¤...F8.VÀÕV«.v-.v¶... 0000A0
00002247 C726F85E C4000012 47C726F4 5EC40000 2447C726 F85EC404 C48305EE Ÿ..á.á^½&ÚG$..á^¶&ÚG...á^½&ÚG".. 0000C0
260A4688 065EC408 8E0623B8 1E565700 0000C800 04CAC95F 5E1F0000 E9000088 |..Õ...^ èò..à...WV.|#..Áá^..F.& 0000E0
C41677FF 26065EC4 0017E903 7520470B 261E4788 26065EC4 005EE903 721C4739 9G.r.Õ^.Ã^.&.G.&.G u.Õ..á^.&.w.á 000100
56880646 880A76FF 006A1677 FF26065E C40000FF FF9A1E77 FF262077 FF26065E ^.&.w &.w......á^.&.w.j..v..F..V 000120
8B065EC4 0018E900 008A0000 880009E9 03750000 300000FF FF9A5052 001E0508 ....RP.....=..u.Õ..|..¤..Õ..á^.. 000140
1E565700 0008C8C8 C95F5E1F 0000E920 5788261E 47882606 5EC41C47 89260A46 F.&.G.á^.&.G.&.W Õ...^_èùà...WV. 000160
49E90375 00080000 00279A50 52005E05 08578826 06478826 065EC408 8E0C5588 |U..Áá^.&.G.&.W..^.RP.7....Åu.ÕI 000180
57882606 47882606 5EC40000 08E39A50 52005E05 08578826 06478826 065EC400 .á^.&.G.&.W..^.RP.D...á^.&.G.&.W 0001A0
005E0508 57882606 478?2606 5EC40018 E90375D0 08000006 7E9A5052 005E0508 ..^.RP.-....Åu.Õ..á^.&.G.&.W..^. 0001C0
08029A0A 76FF0C76 FF026A1A 77FF2606 5FC42606 5EC4FFCC E900000B 9E? ?052 RP.....Õa.á^.&á_.&.w.j..v..v.... 0001E0

Dump of file SATURN:[PCCOMMON.DUMP.DLL]DML.TMP;1 on 18-APR-1990 10:44:?5.23
File ID (622,20,0)   End of file block 171 / Allocated 172

Virtual block number 79 (0000004F), 512 (0200) bytes

68E98494 880006E9 03750000 3000000A 509A5016 FC468D50 00040504 C4830088 E..á....P.F•.P.P...=..u.Õ..|..Õh 000000
C4004AE9 84928800 06E90375 00003D00 00090C9A 5016F846 8DFC76FF FE76FF00 ..v±.v•.F½.P.É...=..u.Õ..|..ÕJ.á 000020
08C4830A F507A29A 50520002 05FA568B F846880A 76FF0C76 FF000107 C726F85E ^½&ú....v..v..F½.V*...RP.Å.½..á. 000040
76FFFE76 FF505200 4E050857 88260647 88260656 C41A77FF 26065FC4 26065EC4 á^.&á_.&.w.á^.&.G.&.W..N.RP.v±.v 000060
5FC42606 5EC4D88E 0CE1881E 56570000 08C8C8C9 5F5E1F00 00E90000 087D9AFC •.)...Õ...^_èùà...WV.|Ã..Äá^.&á_ 000080
036A026A 1A77FF26 065FC426 065EC400 76E90000 880006E9 03740026 7F832606 .&..&.t.Õ..|..Õv.á^.&á_.&.w.j.j. 0000A0
468DFC76 FFFE76FF 004FE984 94880006 E9037500 003D0000 006F9A50 16FC4680 _F•.P.o...=..u.Õ..|..ÕÕ..v±.v•.F 0000C0
5EC40002 07C726F8 5EC40031 E98492B8 0006E903 75000030 000000B0 9A5016F8 ½.P.....=..u.Õ..|..ÕI.á^½&ú...á^ 0000E0
9AFC76FF FE76FF50 52004E05 08578826 06478826 065EC41A 77FF2606 5FC42606 .&á_.&.w.á^.&.G.&.W..N.RP.v±.v•. 000100
26065FC4 26065EC4 D88E0DF6 881E5657 000008C8 C8C95F5E 1F0000E9 000000E2 ã...Õ...^_èùà...WV.|-..Äá^.&á_.& 000120
FF0C76FF 026A1A77 FF26065F C426065E C4009FE9 00008800 06E90374 00267F83 ..&.t.Õ..|..Õ..á^.&á_.&.w.j..v.. 000140
0006E903 75000030 00000E26 9A5016FC 468D5000 040504C4 830F2008 029A0A76 v.... ..á....P.F•.P.Ī...=..u.Õ.. 000160
92880006 E9037500 003D0000 0E449A50 16F8468D FC76FFFE 76FF0068 E98494B8 |..Õh..v±.v•.F½.P.D...=..u.Õ..|. 000180
07A29A50 52000205 FA568BF8 46880A76 FF0C76FF 000907C7 26F85EC4 004AE984 .ÕJ.á^½&ú....v..v..F½.V*...RP.Å. 0001A0
5052004E 05085788 26064788 26065EC4 1A77FF26 065FC426 065EC408 C4830060 '..á.á^.&á_.&.w.á^.&.G.&.W..N.RP 0001C0
C4088E0E 94881E56 57000008 C8C8C95F 5E1F0000 E900000E 809AFC76 FFFE76FF .v±.v•.....Õ...^_èùà...WV.|...Äá 0001E0

Dump of file SATURN:[PCCOMMON.DUMP.DLL]DML.TMP;1 on 18-APR-1990 10:44:35.23
File ID (622,20,0)   End of file block 171 / Allocated 172

Virtual block number 80 (00000050), 512 (0200) bytes

77FF2606 5FC42606 5EC40076 E90000B8 0006E903 7400267F 8326065F C426065E ^.&á_.&..&.t.Õ..|..Õv.á^.&á_.&.w 000000
FE76FF00 4FE98494 880006E9 03750000 3000000E D49A5016 FC468D03 6A026A1A .j.j..F•.P.à...=..u.Õ..|..ÕÕ..v± 000020
C726F85E C40031E9 84928800 06E90375 00003D00 000EF29A 5016F846 8DFC76FF .v•.F½.P.`...=..u.Õ..|..ÕI.á^½&ú 000040
76FF5052 004E0508 57882606 47882606 5EC41A77 FF26065F C426065E C4000A07 ...á^.&á_.&.w.á^.&.G.&.W..N.RP.v 000060
065EC408 8E0F5888 1E565700 0008C8C8 C95F5E1F 0000E900 000F479A FC76FFFE ±.v•.G...Õ...^_èùà...WV.|[..Äá^. 000080
6A1A77FF 26065FC4 26065EC4 00A1E900 00880006 E9037400 267F8326 065FC426 &á_.&..&.t.Õ..|..ÕÀ.á^.&á_.&.w.j 0000A0
76FFFA76 FF007AE9 84948800 06E90375 00003D00 000F889A 5016F846 80096A02 .j..F½.P.....=..u.Õ..|..Õz..v*.v 0000C0
0607C726 FC5EC400 5CE98492 880006E9 03750000 3000000F A99A5016 FC468DF8 ½.F•.P.`...=..u.Õ..|..Õ\.á^•&ú.. 0000E0
C4055789 26034789 26FC5EC4 05578826 03478826 0A5EC400 0247C626 FC5EC400 .á^•&6G..á^.&.G.&.W.á^•&.G.&.W.á 000100
88260647 88260656 C41A77FF 26065FC4 26065EC4 07478926 FC5EC407 88260A5E ^.&..á^•&.G.á^.&á_.&.w.á^.&.G.&. 000120
56570000 08C8C8C9 5F5E1F00 00E90000 0FE59AF8 76FFFA76 FF505200 4E050857 W..N.RP.v*.v½.Ï...Õ...^_èùà...WV 000140
065EC400 A7E90000 880006E9 03740026 7F832606 5FC42606 5EC4D88E 0FF9881E .|'..Áá^.&á_.&..&.t.Õ..|..ÕI.á^. 000160
94880006 E9037500 003D0000 10299A50 16F8468D 096A026A 1A77FF26 065FC426 &á_.&.w.j.j..F½.P.)...=..u.Õ..|. 000180
E98492B8 0006E903 7500003D 00001047 9A5016FC 468DF876 FFFA76FF 0080E984 .Õ...v*.v½.F•.P.G...=..u.Õ..|..Õ 0001A0
26034788 260A5EC4 02478826 FC5EC402 478A260A 5EC40007 07C726FC 5EC40062 b.á^•&ú...á^.&.G.á^•&.G.á^.&.G.& 0001C0
C426065E C4074789 26FC5EC4 0788260A 5EC40557 89260347 8926FC5E C4055788 .W.á^•&.G.&.W.á^.&..á^•&.G.á^.&á 0001E0
```

```
Dump of file SATURN:[PCCOMMON.DUMP.DLL]DML.TMP;1 on 18-APR-1990 10:44:35.23
File ID (622,20,0)   End of file block 171 / Allocated 172

Virtual block number 81 (00000051), 512 (0200) bytes

 0010AE9A F876FFFA 76FF5052 004E0508 57882606 47882606 5EC41A77 FF26065F _.&.w.á^.&.G.&.W..N.RP.v°.v½.Û.. 000000
 267F8326 065FC42^ 065EC4D8 8E10C288 1E565700 0008C8C8 C95F5E1F 0000E900 ¯Õ...^_èùà...WV.¡ô..Äá^.&á_.&..& 000020
 05078826 0E5EC402 6A1A77FF 26065FC4 26065EC4 0001E900 00880006 E9037400 .t.Õ..¯¡..Õî.á^.&á_.&.w.j.á*.&... 000040
 76FFFA76 FF00A2E9 84948800 06E90375 00003000 0010F29A 5016F846 80500009 ..P.F½.P.·...=..u¯Õ..¡..ÕÅ..v°.v 000060
 0807C726 FC5EC400 84E98492 880006E9 03750000 30000011 109A5016 FC468DF8 ½.F=.P.....=..u.Õ..¡..Õ..á^=&ú.. 000080
 FC5EC407 88260E5E C4045789 26024789 26FC5EC4 05578826 03478826 0A5EC400 .á^.&.G.&.W.á^=&.G.&.W.á^.&..á^= 0000A0
 52000205 1056880E 468837FF 260E5EC4 0024E903 75003F83 260E5EC4 06478926 &.G.á^.&.?.u.Õ$.á^.&.7.F..V....R 0000C0
 C41A77FF 26065FC4 26065EC4 0AC4830E C509C69A 50520008 05FE5688 FC468850 P.F=.V±...RP.6.é..á.á^.&á_.&.w.á 0000E0
 5F5E1F00 00E90000 117D9AF8 76FFFA76 FF505200 4E050857 88260647 8826065E ^.&.G.&.W..N.RP.v°.v½.)...¯Õ...^_ 000100
 880006E9 03740026 7F832606 5FC42606 5EC4D88E 1191881E 56570000 08C8C8C9 èùà...WV.¡...Äá^.&á_.&..&.t.Õ..¡ 000120
 C99A5016 FC468D50 000C0514 4688026A 1A77FF26 065FC426 065EC400 CFE90000 ..Õù.á^.&á_.&.w.j..Ï....P.F=.P.è 000140
 0011E79A 5016F846 80FC76FF FE76FF00 A3E98494 880006E9 03750000 30000011 ...=..u.Õ.¯¡..ÕÊ..v±.v=.F½.P.Ô.. 000160
 5EC40247 8A260A5E C4000307 C726F85E C40085E9 84928800 06E90375 00003000 .=..u.Õ..¡..Ô..á^Y&ú...á^.&.G.á^ 000180
 4688F85E C4055789 26034789 26F85EC4 05578826 03478826 0A5EC402 478826F8 ½&.G.á^.&.G.&.W.á^½&.G.&.W.á^½.F 0001A0
 0805FA56 88F8468B 1076FF12 76FF1476 FF094789 2614468B F85EC407 4789260E .&.G.á^½.F.&.G..v..v..v..F½.V°.. 0001C0
 57882606 47882606 5EC41A77 FF26065F C426065E C40AC483 124F09C6 9A505200 .RP.6.O..á.á^.&á_.&.w.á^.&.G.&.W 0001E0

Dump of file SATURN:[PCCOMMON.DUMP.DLL]DML.TMP;1 on 18-APR-1990 10:44:35.23
File ID (622,20,0)   End of file block 171 / Allocated 172

Virtual block number 82 (00000052), 512 (0200) bytes

 1E565700 0008C8C8 C95F5E1F 0000E900 0012769A FC76FFFE 76FF5052 004E0508 ..N.RP.v±.v=.v...Õ...^_èùà...WV. 000000
 26065EC4 0002E900 00880006 E9037400 267F8326 065FC426 065EC4D8 8E128A88 ¡...Äá^.&á_.&..&.t.Õ..¯¡..Õ@.á^.& 000020
 84948800 06E90375 00003000 00128F9A 5016F846 8D106A02 6A1A77FF 26065FC4 á_.&.w.j.j¯.F½.P.¢...=..u.Õ..¡.. 000040
 8DE98492 880006E9 03750000 30000012 009A5016 FC468DF8 76FFFA76 FF00A8E9 Õ"..v°.v½.F=.P.Ì...=..u.Õ..¡..Õ. 000060
 5EC40247 8A260E5E C402:788 26FC5EC4 02478A26 0A5EC400 0407C726 FC5EC400 .á^=&ú...á^.&.G.á^=&.G.á^.&.G.á^ 000080
 88260E5E C4065789 26044789 26FC5EC4 05578826 03478826 0A5EC403 47E.¯^FC =&.G.á^.&.G.&.W.á^=&.G.&.W.á^.&. 0000A0
 4688FC5E C4084789 2612468B FC5EC40C 5789260A 478926FC 5EC40557 88260 47 G.&.W.á^=&.G.&.W.á^=.F.&.G.á^=.F 0000C0
 5052004E 0508578B 2606478B 26065EC4 1A77FF26 065FC426 065EC40E 478926 4 .&.G.á^.&á_.&.w.á^.&.G.&.W..N.RP 0000E0
 C4D88E13 81881E56 57000008 C8C8C95F 5E1F0000 E9000013 6D9AF876 FFFA76FF .v°.v½.m..¯Õ...^_èùà...WV.¡...Äá 000100
 77FF2606 5FC42606 5EC4000Z E9000088 0006E903 7400267F 8326065F C426065E ^.&á_.&..&.t.Õ..¯¡..Õ@.á^.&á_.&.w 000120
 FA76FF00 ABE98494 880006E9 03750000 30000013 819A5016 F8468010 6A026A1A .j.j¯..F½.P.Ÿ...=..u.Õ..¡..Õ"..v° 000140
 C726FC5E C4008DE9 84928800 06E90375 00003000 0013CF9A 5016FC46 8DF876FF .v½.F=.P.ü...=..u.Õ..¡..Õ..á^=&ú 000160
 C4034788 26FC5EC4 02478A26 0E5EC402 478826FC 5EC40247 8A260A5E C4000507 ...á^.&.G.á^=&.G.á^.&.G.á^=&.G.á 000180
 05578826 03478826 0E5EC406 57892604 478926FC 5EC40557 88260347 88260A5E ^.&.G.&.W.á^=&.G.&.W.á^.&.G.&.W. 0001A0
 C40E4789 2614468B FC5EC408 47892612 4688FC5E C40C5789 260A4789 26FC5EC4 á^=&.G.&.W.á^=.F.&.G.á^=.F.&.G.á 0001C0
 F876FFFA 76FF5052 004E0508 57882606 47882606 5EC41A77 FF26065F C426065E ^.&á_.&.w.á^.&.G.&.W..N.RP.v°.v½ 0001E0

Dump of file SATURN:[PCCOMMON.DUMP.DLL]DML.TMP;1 on 18-APR-1990 10:44:35.23
File ID (622,20,0)   End of file block 171 / Allocated 172

.Virtual block number 83 (00000053), 512 (0200) bytes

 267F8326 065EC408 8E147888 1E565700 0008C8C8 C95F5E1F 0000E900 0014679A .g...Õ...^_èùà...WV.¡(..Äá^.&..& 000000
 0014A89A 5016FC46 8D236A02 6A1A77FF 26065EC4 0087E900 00880006 E9037400 .t.Õ..¡..Õ¯.á^.&.w.j.j#.f=.P.¨.. 000020
 30000014 C99A5016 F8468DFC 76FFFE76 FF0064E9 84948800 06E90375 00003000 .=..u.Õ..¡..Õd..v±.v=.F½.P.è...= 000040
 50520093 0508568B 06468800 0807C726 F85EC400 46E98492 880006E9 03750000 ..u.Õ..¡..ÕF.á^Y&ú....F..V....RP 000060
 08568806 46881A77 FF26065E C408C483 134607A2 9A505200 0205FA56 88F8468B .F½.V°...RP.Å.F..á.á^.&.w..F..V. 000080
 881E5657 000008C8 CBC95F5E 1F0000E9 00001561 9AFC76FF FE76FF50 52004E05 .N.RP.v±.v=.@...Õ...^_èùà...WV.¡ 0000A0
 C426065E C4009FE9 00008800 06E90374 00267F83 26065FC4 26065EC4 D88E1575 u..Äá^.&á_.&..&.t.Õ..¯¡..Õ..á^.&á 0000C0
 9A5016FC 46805000 040504C4 8316AC08 029A0A76 FF0C76FF 026A1A77 FF26065F _.&.w.j..v̄..v....¯..á....P.F=.P. 0000E0
 15889A50 16F8468D FC76FFFE 76FF0068 E984948B 0006E903 7500003D 00001590 ¯....=..u.Õ..¡..Õh..v±.v=.F½.P.€. 000100
 46880A76 FF0C76FF 000C07C7 26F85EC4 004AE984 92880006 E9037500 00300000 ..=..u.Õ..¡..ÕJ.á^Y&ú....v..v..F 000120
 26065EC4 1A77FF26 065FC426 065EC408 C48315EE 07A29A50 52000205 FA5688F8 ½.V°...RP.Å.Ÿ..á.á^.&á_.&.w.á^.& 000140
 C8C8C95F 5E1F0000 E9000016 0C9AFC76 FFFE76FF 5052004E 0508578B 2606478B .G.&.W..N.RP.v±.v=.....¯Õ...^_èùà 000160
 E9000088 0006E903 7400267F 8326065F C426065E C4088E16 20881E56 57000008 ...WV.¡ ..Äá^.&á_.&..&.t.Õ..¯¡..Õ 000180
 03750000 30000016 609A5016 FC468D03 6A026A1A 77FF2606 5FC42606 5EC40076 v.á^.&á_.&.w.j.j¯..F=.P.'...=..u. 0001A0
 06E90375 00003000 00167E9A 5016F846 80FC76FF FE76FF00 4FE98494 880006E9 Õ..¡..ÕÕ..v±.v=.F½.P.~...=..u.Õ. 0001C0
 47882606 5EC41A77 FF26065F C426065E C4000007 C726F85E C40031E9 84928800 .¡..Õ1.á^Y&ú...á^.&á_.&.w.á^.&.G 0001E0
```

Dump of file SATURN:[PCCOMMON.DUMP.DLL]DML.TMP;1 on 18-APR-1990 10:44:35.23
File ID (622,20,0    End of file block 171 / Allocated 172

Virtual block number 84 (00000054), 512 (0200) bytes

```
0020C8C8 C95F5E1F 0000E900 0016D39A FC76FFFE 76FF5052 004E0508 57882606 .&.W..N.RP.v±.v=.£...Õ...^ èùà . 000000
0876FF00 00EE46C7 0000E446 C70000E2 46C70000 E046C7D8 8E16E788 1E565700 .WV.¦Õ..AúFÅ..úFã..úFõ..úFŸ...v. 000020
8326F85E C403C5E9 84918800 06E90375 00003000 0018259A 5016F846 8D0676FF .v..F½.P.%...=..u.Õ..¦..Õé.á^½&. 000040
C4FE5689 FC4689F8 57882606 47882 6F8 5EC40382 E9849E88 0006E903 7400127F ...t.Õ..¦..Õý.á^½&.G.&.W..F=.V±á 000060
4E05FE56 88FC4688 00000012 9A505200 4E05FE56 88FC4688 00002647 C726FC5E ^=&úG&...F=.V±.N.RP......F=.V±.N 000080
8DEA76FF EC76FF03 38E90375 EC4608EA 4688EC56 89EA4689 000008F8 9A505200 .RP.«....Fõ.V$.Fõ.F$u.Õ8..v$.võ. 0000A0
027CE907 8826F45E C40349E9 84928800 06E90375 00003000 0018799A 5016F446 F¶.P.y...=..u.Õ..¦..ÕI.á^¶&..Õ¦. 0000C0
0805F656 88F44688 0777FF26 F45EC403 77FF2605 77FF26F4 5EC40676 FF0876FF .v..v.á^¶&.w.&.w.á^¶&.w..F¶.V-.. 0000E0
00003000 0018DC9A 5016E646 8D0377FF 260577FF 26F45EC4 18C90888 9A505200 .RP...è.á^¶&.w.&.w..F¦.P.É...=.. 000100
FF0876FF 024DE902 47882 6E6 5EC40247 8A26F45E C402F5E9 84928800 06E90375 u.Õ..¦..Õ%.á^¶&.G.á^¦&.G.ÕM..v.. 000120
C40A77FF 260C77FF 26F45EC4 0877FF26 F45EC404 77FF2606 77FF26F4 5EC40676 v.á^¶&.w.&.w.á^¶&.w.á^¶&.w.&.w.á 000140
00001900 9A5016E6 46800477 FF260677 FF26F45E C4195D1C 029A0E77 FF26F45E ^¶&.w..Ø.].á^¶&.w.&.w..F¦.P..... 000160
26F45EC4 02478826 F65EC402 478A26F4 5EC40292 E9849288 0006E903 75000030 =..u.Õ..¦..Õ..á^¶&.G.á^¦&.G.á^¶& 000180
C40261E9 84928800 06E90375 00003000 0019709A 5016E646 800A77FF 260C77FF .w.&.w..F¦.P.p...=..u.Õ..¦..Õa.á 0001A0
77FF2606 77FF26F4 5EC40676 FF0876FF 0189E902 47882 6E6 5EC40347 8A26F45E ^¶&.G.á^¦&.G.Õ¿..v..v.á^¶&.w.&.w 0001C0
C407C514 499A0E77 FF26F45E C40A77FF 260C77FF 26F45EC4 0877FF26 F45EC404 .á^¶&.w.á^¶&.w.&.w.á^¶&.w..I.é.á 0001E0
```

Dump of file SATURN:[PCCOMMON.DUMP.DLL]DML.TMP;1 on 18-APR-1990 10:44:35.23
File ID (622,20,0)    End of file block 171 / Allocated 172

Virtual block number 85 (00000055), 512 (0200) bytes

```
E9849288 0006E903 7500003D 000019A1 9A5016E6 46800477 FF260677 FF26F45E ^¶&.w.&.w..F¦.P.À...=..u.Õ..¦..Õ 000000
5016E646 8D0A77FF 260C77FF 26F45EC4 02478826 E65EC402 478A26F4 5EC401FE ±.á^¶&.G.á^¦&.G.á^¶&.w.&.w..F¦.P 000020
47882 6E6 5EC40347 8A26F45E C401CDE9 84928800 06E90375 00003000 0019059A .f...=..u.Õ..¦..Õé.á^¶&.G.á^¦&.G 000040
06E90375 00003000 0017359A 5016E646 8D0377FF 260577FF 26F45EC4 0125E902 .Õ%.á^¶&.w.&.w..F¦.P.5...=..u.Õ. 000060
E6468D03 77FF2605 77FF26F4 5EC400F7 E904024F 8026E65E C40199E9 84928800 .¦..Õ..á^¦&.O..Õ%.á^¶&.w.&.w..F¦ 000080
00C9E904 02778026 E65EC401 68E98492 880006E9 03750000 3D00001A 319A5016 .P.1...=..u.Õ..¦..Õk.á^¦&.w..Õè. 0000A0
84928800 06E90375 00003000 0017A99A 5016F046 8D0277FF 260477FF 26F45EC4 á^¶&.w.&.w..FÞ.P.`...=..u.Õ..¦.. 0000C0
5688F446 880677FF 26F45EC4 0277FF26 0477FF26 F45EC406 76FF0876 FF0130E9 Õ=..v..v.á^¶&.w.&.w.á^¶& w..F¶.V 0000E0
9A505200 0205F656 88F44688 0676FF08 76FF007B E90A1E04 599A5052 00080 5F6 -...RP.Y...Õ(..v..v..F¶.V ...RP. 000100
E47E8300 4CE90001 E446C700 01E246C7 0005E903 7400EE7E 830062E9 081E00F7 %...Õb..-Ÿ.t.Õ..úFã..úFõ.¡ÕL..-õ 000120
3D00012D 002DE900 30E90033 E90001E2 46C7003B E90001EE 46C70005 E9037400 .t.Õ..úFŸ..Õ;.úFã..Õ3.Õ0.Õ-.-..= 000140
B61A2019 F219C419 30189C18 401AB61A AE1ACFA7 FF2E93C0 03FFEFE9 0376000C ..v.Õy..à...Ìu.Ù.Ñ.a...0.6.·. .Ñ 000160
76FF0000 00439A50 52004E05 FE5688FC 46880000 E046C71A 9D1A871A 6E1AB61A .Ñ.n.....úFÅ...F=.V±.N.RP.C....v 000180
5052004E 05FE5688 FC468800 3CE90003 E9037401 E27E8300 000A369A EA76FFEC £.võ.6....-ã.t.Õ..Õ<..F=.V±.N.RP 0001A0
89EA4689 00001804 9A505200 4E05FE56 88FC4688 0019E903 75D00800 000CF69A .-....Àu.Õ...F=.V±.N.RP......Fõ. 0001C0
00127F83 26F85EC4 124FFF26 F85EC4FC 8DE9EA46 89EC4689 00008800 09E9EC56 V$Õ..¦...F$.FõÕ§=á^½&.O.á^½&.... 0001E0
```

Dump of file SATURN:[PCCOMMON.DUMP.DLL]DML.TMP;1 on 18-APR-1990 10:44:35.23
File ID (622,20,0)    End of file block 171 / Allocated 172

Virtual block number 8. (00000056), 512 (0200) bytes

```
0000E900 00880000 2447C726 FC5EC400 09E90001 2647C726 FC5EC400 0CE9. 75 u.Õ..á^=&úG&..Õ..á^=&úG$..¦..Õ.. 000000
00031A03 02030000 00021A82 00020004 00061838 02030011 900004CA C95F5E'F .^_èÒ.......8...á............... 000020
00081866 000200EF 00061AFA 020300E5 00061771 02030000 00031A69 00020071 q...¡.......q...Ì...°...ÿ...f... 000040
00101651 00020000 000A0C20 000200F8 00061821 02030000 00090AAE 00020000 ....Û.......Ì...½... .......a... 000060
00031717 0203003F 00030C88 02030031 00030CA7 02030000 00121785 00020000 ............Ì...Ì.......7....... 000080
00000000 00000000 00000000 0000005F 00031805 02030088 000617F4 0203004C L...¶...£.......................... 0000A0
FC5EC4FE 5689FC46 89085788 26064788 26065EC4 D88EFFFF 881E5657 000016C8 à...WV.¦...Àá^.&.G.&.W..F=.V±á^= 0000C0
FE5688FC 46880000 00F89A50 52004E05 FE5688FC 46880070 E9037501 227F8326 &..".u.Õp..F=.V±.N.RP.½....F=.V± 0000E0
0000000A 9A5016F4 4680F076 FFF276FF F25689F0 46890000 01089A50 52004E05 .N.RP......FÞ.V·.v·.vÞ.F¶.P.Õ... 000100
83022C0D EE9A0676 FF0876FF 0014E903 74013F83 26F45EC4 0032E903 7400003D =..t.Õ2.á^¶&.?.t.Õ...v..v..Ÿ.... 000120
47882 6FC 5EC401E3 E90000B8 0006E903 74093F83 26F45EC4 0012E901 F8E904C4 á.Õ%.Õ..á^¶&.?.t.Õ..¦..ÕD.á^=&.G 000140
018DE900 00880006 E9037524 57392600 09E90374 22473926 065EC42C 5788262A =&.W,á^.&9G"t.Õ..&9W$u.Õ..¦..Õ§. 000160
003D0000 01299A50 16EA468D 2A77FF26 2C77FF26 FC5EC400 012847C7 26FC5EC4 á^=&úG(..á^=&.w,&.w*.Fõ.P.)...=. 000180
88FC4688 0000FFFF 9A505200 3E05FE56 88FC4688 0191E984 92880006 E9037500 .u.Õ..¦..Õ...F=.V±.>.RP......F=. 0001A0
F276FF00 F9E90375 F24608F0 4688F256 89F04689 0000015F 9A505200 3E05FE56 V±.>.RP._....FÞ.V·.FÞ.F·u.Õ°..v· 0001C0
5688FC46 880142E9 00008800 06E90375 00003000 00FFFF9A 5016F846 8DF076FF .vÞ.F½.P.....=..u.Õ..¦..Õ8..F=.V 0001E0
```

```
Dump of file SATURN:[PCCOMMON.DUMP.DLL]DML.TMP;1 on 18-APR-1990 10:44:35.23
File ID (622,20,0)   End of file block 171 / Allocated 172

Virtual block number 87 (00000057), 512 (0200) bytes

FF9A5052 003E05FE 5688FC46 880019E9 03750000 300000FF FF9A5052 003E05FE ±.>.RP.....=..u.Õ...F=.V±.>.RP.. 000000
88260788 26065EC4 F25689F0 46890000 8A000088 000CE9F2 5689F046 890000FF ....FÞ.V.Õ..¦..¤...FÞ.V.á^.&..&. 000020
02578826 078826F8 5EC40040 E9037502 57392600 09E90374 073926F8 5EC40257 W.á^Y&9.t.Õ..&9W.u.Õ@.á^Y&..&.W. 000040
2A77FF26 2C77FF26 FC5EC410 CC681477 FF26F85E C4065789 26044789 26EA5EC4 á^õ&.G.&.W.á^Y&.w.hä.á^•&.w,&.w^ 000060
02578826 078826F8 5EC4003D E9EE4689 0000020C 9A5052C0 28225788 26FC5EC4 á^•&.W"+áRP......FÝÕ=.á^Y...&.W. 000080
2A77FF26 2C77FF26 FC5EC410 CD681477 FF26065E C4065789 26044789 26EA5EC4 á^õ&.G.&.W.á^.&.w.hë.á^•&. .&.w^ 0000A0
03740126 7F8326FC 5EC4FEFC E9EE4689 0000FFFF 9A5052C0 28225788 26FC5EC4 á^=&.W"+áRP......FÝÕ=±á^=&..&.t. 0000C0
E9EE4688 0006E903 7500003D EE468904 C483FFFF 00EE9A06 76FF0876 FF001FE9 Õ...v..v..Ý....á..FÝ=..u.Õ...FÝÕ 0000E0
262A4789 2600008A ^^00088FC 5EC40000 FFFF9A22 77FF2624 77FF2606 5EC40038 ;.á^.&.w$&.w".....á^•¦..¤..&.G•& 000100
5F5E1F00 00E90000 : 000028 47C726FC 5EC42457 89262247 8926065E C42C5789 .W.á^.&.G"&.W$á^•&ÚG(..¦..Õ...^ 000120
00300000 005C9A50 16FC468D 0676FF08 76FFD88E 0008881E 56570000 04C8C8C9 èùâ...WV.¦...Ä.v..v..F•.P.\...=. 000140
880006E9 00018800 06E90375 040247F6 26FC5EC4 0019E900 00880006 E9037500 .u.Õ..¦..Õ..á^•&-G..u.Õ..¦..Õ..¦ 000160
00880A5E C40000EC 46C7D88E 028A881E 56570000 2AC8C8C9 5F5E1F00 00E90000 ..Õ..._èùâ*..WV.¦...ÄÚF$..á^.¦. 000180
00000339 9A501608 468D1476 FF1676FF 000007C7 26065EC4 07892602 47892600 .&.G.&.¯á^.&ú....v..v..FÄ.P.9... 0001A0
83FC5689 FA46890A 57882608 47882608 5EC405C7 E9849288 0006E903 7500003D =..u.Õ..¦..ÕÚ.á^Ä&.G.&.W..F•.V•. 0001C0
00003000 00029A9A 50160C46 800C77FF 260E77FF 26085EC4 0026E903 75000E7E ~..u.Õ&.á^Ä&.w.&.w..FÉ.P.....=.. 0001E0

Dump of file SATURN:[PCCOMMON.DUMP.DLL]DML.TMP;1 on 18-APR-1990 10:44:35.23
File ID (622,20,0)   End of file block 171 / Allocated 172

Virtual block number 88 (00000058), 512 (0200) bytes

449A5016 DC468D10 77FF2612 77FF2608 5EC40023 E9058AE9 84928800 06E90375 u.Õ..¦..Õ..Õ#.á^Ä&.w.&.w..FÉ.P.D 000000
C4104789 26124789 26000088 D85EC405 64E98492 880006E9 03750000 30000004 ...=..u.Õ..¦..Õd.á^Ä¦..&.G.&.G.á 000020
0011E968 57892666 4789260E 5688DC46 88FA5EC4 0014E903 7401227F 8326FA5E ^•&..".t.Õ..á^•.FÉ.VÄ&.GÍ&.WhÕ.. 000040
7F8326FA 5EC40459 E9037400 EC7E8358 57892656 4789260E 5688DC46 88FA5EC4 á^•.FÉ.VÄ&.GV&.WX.~$.t.ÕY.á^•&.. 000060
880019E9 03750000 30000004 009A5052 005E05FC 5688FA46 88003AE9 03740122 ".t.Õ:..F•.V=.^.RP.....=..u.Õ... 000080
37E904D7 E9849D88 0006E9EA 5689E846 89000004 259A5052 005E05FC 5688FA46 F•.V=.^.RP.X....FÕ.VõÕ..¦..Õ=.Õ7 0000A0
05FC5688 FA468800 19E90375 00003000 00FFFF9A 5052004E 05FC5688 FA468800 ..F•.V=.N.RP.....=..u.Õ...F•.V•. 0000C0
4680E876 FFEA76FF 049DE984 90880006 E9EA5689 E8468900 0000469A 5052004E N.RP.F....FÕ.VõÕ..¦..Õ...vÕ.vÕ.F 0000E0
C4D64689 078826EE 5EC4047F E9849288 0006E903 7500003D 000002FC 9A5016EE Ý.P.=...=..u.Õ..¦..Õ..á^Ý&...F•á 000100
E90004D6 46C70051 E9000506 46C7002E E9064688 005FE903 7401227F 8326FA5E ^•&..".t.Õ_..F•Õ..úF•..Õ¤.úF•..Õ 000120
0028E900 2EE90031 E9000A06 46C70039 E90007D6 46C70041 E9000606 46C70049 I.úF•..ÕA.ũF•..Õ9.úF•..Õ1.Õ..Õ+. 000140
FFCAE903 7500063D FFC2E903 7500053D FFC2E903 75000430 FFEAE903 7500013D =..u.Õõ.=..u.Õõ.=..u.Õò.=..u.Õò. 000160
0003E903 74101046 F603FEE9 84908803 1AE9D646 88FFCFE9 FF8AE903 7500073D =..u.Õ¤.Õù..F•Õ..¦..Õ±.-F..t.Õ.. 000180
83057A01 A69A0377 FF260577 FF26E05E C4E25689 E04689F0 5688EE46 88032DE9 Õ-..FÝ.VÞ.FÄ.Vãá^Ä&.w.&.w..Ï.z.. 0001A0
0003E903 7500003D 04C48305 9002829A 0377FF26 0577FF26 E05EC4FE 468904C4 á..F±á^Ä&.w.&.w.......á.=..u.Õ.. 0001C0
26065EC4 0001EC46 C70000E9 03741246 39FE4688 0008E903 7500127E 8302EDE9 ÕÙ..-..u.Õ...F±9F.t.Õ..úF$..á^.& 0001E0

Dump of file SATURN:[PCCOMMON.DUMP.DLL]DML.TMP;1 on 18-APR-1990 10:44:35.23
File ID (622,20,0)   End of file block 171 / Allocated 172

Virtual block number 89 (00000059), 512 (0200) bytes

C4F85689 F64689F0 5688EE46 88028DE9 0003E903 74041046 F602C9E9 001007C7 ú...Õè.-F..t.Õ..Õ§..FÝ.VÞ.F-.V%á 000000
8904C483 FFFF01A6 9A0477FF 260677FF 26F65EC4 0040E903 7400147F 832608SE ^Ä&....t.Õ@.á^-&.w.&.w..Ï....á.. 000020
0270E900 03E90375 00003D04 C483FFFF 02829A04 77FF2606 77FF26F6 5EC4FE46 F±á^-&.w.&.w.......á.=..u.Õ..Õp. 000040
0A77FF26 0C77FF26 F65EC400 001447C7 26085EC4 0030E900 011447C7 26085EC4 á^Ä&ÚG...Õ=.á^Ä&ÚG...á^-&.w.&.w. 000060
003D04C4 83060302 829A0A77 FF260C77 FF26F65E C4FE4689 04C48306 4001A69A .Ï.@..á..F±á^-&.w.&.w....&..á.=. 000080
EC46C700 00E90374 124639FE 4688000B E9037500 127E8302 27E90003 E9037500 .u.Õ..Õ'..-..u.Õ...F±9F.t.Õ..úF$ 0000A0
89F05688 EE468801 F7E90003 E9037408 1046F602 03E90004 07C72606 5EC40001 ..á^.&ú...Õ..-F..t.Õ..Õ%..FÝ.VÞ. 0000C0
01A69A04 77FF2606 77FF26F6 5EC40022 E9037400 147F8326 D85EC4F8 5689F646 F-.V%á^Ä&....t.Õ".á^-&.w.&.w..Ï. 0000E0
F65EC400 001447C7 26085EC4 001FE900 011447C7 26085EC4 FE468904 C483066B k..á..F±á^Ä&ÚG...Õ..á^Ä&ÚG...á^- 000100
39FE4688 0008E903 7500127E 83FE4689 04C48306 8001A69A 0A77FF26 0C77FF26 &.w.&.w..Ï.§..á..F±.-..u.Õ...F±9 000120
0003E903 74011046 F6017?E9 000807C7 26065EC4 0001EC46 C70000E9 03741246 F.t.Õ..úF$..á^.&ú...Õy.-F..t.Õ.. 000140
83072D01 A69A0377 FF260577 FF26E45E C4E65689 E44689F0 5688EE46 8801'^E9 Õm..FÝ.VÞ.FÕ.VÏá^Õ&.w.&.w..Ï.-.. 000160
0003E903 75000030 04C48307 9502829A 0377FF26 0577FF26 E45EC4FE 46890( 4 á..F±á^Õ&.w.&.w.......á.=..u.Õ.. 000180
26065EC4 0001EC46 C70000E9 03741246 39FE4688 0008E903 7500127E 830120E · Õ-..-..u.Õ...F±9F.t.Õ..úF$..á^.& 0001A0
C4E65689 E44689F0 5688EE46 8800FDE9 0003E903 74021046 F60109E9 000107C7 ú...Õ..-F..t.Õ..Õ»..FÝ.VÞ.FÕ.VÏá 0001C0
46880008 E9037500 127E83FE 468904C4 83077F01 A69A0377 FF260577 FF26E45E ^Õ&.w.&.w..Ï....á..F±.-..u.Õ...F 0001E0
```

```
Dump of file SATURN:[PCCOMMON.DUMP.DLL]DML.TMP;1 on 18-APR-1990 10:44:35.23
File ID (622,20,0)   End of file block 171 / Allocated 172

Virtual block number 90 (0000005A), 512 (0200) bytes

 E9037420 1046F600 87E90002 07C72606 5EC40001 EC46C700 00E90374 124639FE ±9F.t.Õ..úF$..á^.&ú...Õñ.-F. t.Õ 000000
 F001A69A 0277FF26 0477FF26 F25EC4F4 5689F246 89F05688 EE468800 A8E90003 ..Õ ..FY.VÞ.F .V¶á^ &.w.&.w..|.» 000020
 E9037500 003004C4 83051302 829A0277 FF260477 FF26F25E C4FE4689 04C48304 ..á..F±á^ &.w.&.w.......á.=..u.Õ 000040
 5EC40001 EC46C700 00E90374 124639FE 46880008 E9037500 127E8300 68E90003 ..Õk..~..u.Õ...F±9F.t.Õ..úF$..á^ 000060
 EC46C700 4007C726 065EC400 38E90003 E9037440 1046F600 47E90020 07C72606 .&ú. .ÕG.-F.àt.Õ..Õ..á^.&ú.à.úF$ 000080
 04D707FE A7FF2E93 C003FFEF E9037600 08300003 200025E9 0028E900 28E90001 ..Õ+.Õ(.ÕX.-..=..v.Õÿ..á...I±.=. 0000A0
 26078926 EA5688E8 46880A5E C4FB9EE9 07C90401 07E50759 07070697 06000547 G.......Y.Ï.Ï.è.Õ.«á^..FÕ.VÕ&..& 0000C0
 065EC400 28E90374 01147F83 26085EC4 0051E903 7401227F 8326FA5E C4025789 .W.á^'&..".t.ÕO.á^A&....t.Õ(.á^. 0000E0
 5052005E 05FC5688 FA468800 10E90374 083F8326 065EC400 0CE90375 043F8326 &.?.u.Õ..á^.&.?.t.Õ...F'.V=.^.RP 000100
 4EE91257 89261047 8926085E C40257B8 26078826 665FC426 FA5EC400 0008829A .ÿ...á^'&á_f&...&.W.á^A&.G.&.W.ÕN 000120
 3F832606 5EC4000C E9037504 3F832606 5EC40028 E9037401 147F8326 085EC400 .á^A&....t.Õ(.á^.&.?.u.Õ..á^.&.? 000140
 07882656 5FC426FA 5EC40000 01479A50 52004E05 FC5688FA 46880010 E9037408 .t.Õ...F'.V=.N.RP.G...á^'&á_V&.. 000160
 000004C8 0012CAC9 5F5E1F00 00E90000 88125789 26104789 26085EC4 02578826 &.W.á^A&.G.&.W.|..Õ...^_èò..à... 000180
 0006E903 75000030 0000035F 9A5016FC 46800A76 FF0C76FF 088E0202 881E5657 WV.|Õ..Ä.v..v..F=.P. ...=..u.Õ.. 0001A0
 00E90000 88025789 26078926 065EC405 57882603 478826FC 5EC4001B E9849288 |..Õ..á^=&.G.&.W.á^.Ë..&.W.|..Õ. 0001C0
 9A5016FC 46800E76 FF1076FF 088E08E4 881E5657 000004C8 0008CAC9 5F5E1F00 ..^_èò..à...WV.|Õ..Ä.v..v..F=.P. 0001E0

Dump of file SATURN:[PCCOMMON.DUMP.DLL]DML.TMP;1 on 18-APR-1990 10:44:35.23
File ID (622,20,0)   End of file block 171 / Allocated 172

Virtual block number 91 (0000005B), 512 (0200) bytes

 065EC405 57882603 478826FC 5EC40028 E9849288 0006E903 75000030 000008F4 ¶...=..u.Õ..|..Õ(.á^=&.G.&.W.á^. 000000
 0CCAC95F 5E1F0000 E9000088 0789260A 5EC40747 8826FC5E C4025789 26078926 &..&.W.á^=&.G.á^.&..|..Õ...^_èò. 000020
 00003000 0009409A 5016FC46 800E76FF 1076FFD8 8E093088 1E565700 0004C800 .à...WV.|Õ..Ä.v..v..F=.P.à...=.. 000040
 02578926 0789260A 5EC40557 88260347 8826FC5E C40028E9 84928800 06E90375 u.Õ..|..Õ(.á^=&.G.&.W.á^.&..&.W. 000060
 56570000 04C8000C CAC95F5E 1F0000E9 00008807 8926065E C4074788 26FC5EC4 á^=&.G.á^.&..|..Õ...^_èò..à...WV 000080
 92880006 E9037500 00300000 09999A50 16FC4680 0A76FF0C 76FFD88E 0989881E -|...Ä.v..v..F=.P.....=..u.Õ..|. 0000A0
 1F0000E9 00008802 57892607 8926065E C4045788 26024788 26FC5EC4 001BE984 .Õ..á^=&.G.&.W.á^.&..&.W.|..Õ... 0000C0
 09F29A50 16FC4680 1676FF18 76FFD88E 09E2881E 56570000 04C80008 CAC95F5E ^_èò..à...WV.|à..Ä.v..v..F=.P.·. 0000E0
 8926125E C4065788 26044788 26FC5EC4 004AE984 92880006 E9037500 00300000 ..=..u.Õ..|..ÕJ.á^=&.G.&.W.á^.&. 000100
 0A5EC40C 5788260A 478826FC 5EC40789 260E5EC4 08478826 FC5EC402 57892607 .&.W.á^=&.G.á^.&..á^=&.G.&.W.á^. 000120
 14CAC95F 5E1F0000 E9000088 07892606 5EC40E47 8826FC5E C4025789 26078926 &..&.W.á^=&.G.á^.&..|..Õ...^_èò. 000140
 00003000 000A3E9A 5016FC46 801676FF 1876FFD8 8E0A2E88 1E565700 0004C800 .à...WV.|...Ä.v..v..F=.P.>...=.. 000160
 02578926 07892612 5EC40657 88260447 8826FC5E C4004AE9 84928800 06E90375 u.Õ..|..ÕJ.á^=&.G.&.W.á^.&..&.W. 000180
 89260789 260A5EC4 0C578826 0A478826 FC5EC407 89260E5E C4084788 26FC5EC4 á^=&.G.á^.&..á^=&.G.&.W.á^.&..&. 0001A0
 000004C8 0014CAC9 5F5E1F00 00E90000 88078926 065EC40E 478826FC 5EC40257 W.á^=&.G.á^.&..|..Õ...^_èò..à... 0001C0
 0006E903 75000030 00000A89 9A5016FC 46800A76 FF0C76FF D88E0AA9 881E5657 WV.|`..Ä.v..v..F=.P.¿...=..u.Õ.. 0001E0

Dump of file SATURN:[PCCOMMON.DUMP.DLL]DML.TMP;1 on 18-APR-1990 10:44:35.23
File ID (622,20,0)   End of file block 171 / Allocated 172

Virtual block number 92 (0000005C), 512 (0200) bytes

 8808C483 FFFF07A2 9A0676FF 0876FF50 52000205 FE5688FC 4688001F E9849288 |..Õ...F=.V±...RP.v..v..Å....á.| 000000
 46800A76 FF0C76FF 088E0824 881E5657 000004C8 0008CAC9 5F5E1F00 00E90000 ..Õ...^_èò..à...WV.|$..Ä.v..v..F 000020
 57882604 478826FC 5EC4001B E9849288 0006E903 75000030 00000834 9A5016FC =.P.4...=..u.Õ..|..Õ..á^=&.G.&.W 000040
 04000603 E8020300 0C08CAC9 5F5E1F00 00E90000 88025789 26078926 065EC406 .á^.&..&.W.|..Õ...^_èò.....S...à 000060
 00000A05 D9000200 00000900 70000200 00000305 C3000200 71000308 84020300 .......q...ú........Ï........|.... 000080
 88000600 36020301 21000701 CC020300 00001208 74000200 00001008 5A000200 ...Z.......t.......ä...|...6...E 0000A0
 00000000 00000000 C9000603 D3020300 5F000302 4E020300 C2000608 61020300 ...a...Ó...N..._...Â...è........ 0000C0
 75000030 00000047 9A5016F8 46800C76 FF0E76FF D88EFFFF 881E5657 000014C8 à...WV.|...Ä.v..v..F%.P.G...=..u 0000E0
 76FF0A76 FFFE5689 FC468908 57882606 478826F8 5EC4016C E9849188 0006E903 .Õ..|..Õl.á^¥&.G.&.W..F=.V±.v..v 000100
 E9037401 067E8301 30E98492 880006E9 03750000 30000001 049A5016 EC468008 ..F&.P.....=..u.Õ..|..Õ=..~..t.Õ 000120
 26EC5EC4 0CC48300 C208709A FC76FFFE 76FFEC76 FFEE76FF 0876FF0A 76FF0042 B..v..v..vŸ.v$.v±.v=.p.ô..á.á^$& 000140
 00FFFF9A 0876FF0A 76FF5052 01CC05FE 5688FC46 881A77FF 26FC5EC4 012747C6 6G'.á^=&.w..F=.V±.ä.RP.v..v..... 000160
 9AFC76FF FE76FFEC 76FFEE76 FF0876FF 0A76FF00 1AE90374 00067E83 0023E900 .Õ#..~..t.Õ...v..v..vŸ.v$.v±.v=. 000180
 003E05FE 5688FC46 880000FF FF9A5052 003E05FE 5688FC46 880CC483 FFFF0870 p....á..F=.V±.>.RP......F=.V±.>. 0001A0
 468DF076 FFF276FF 0098E903 75F24608 F04688F2 5689F046 89000001 749A5052 RP.t....FÞ.V .FÞ.F u.Õ...v .vÞ.F 0001C0
 02578826 078826F8 5EC40080 E9849288 0006E903 75000030 0000FFFF 9A5016F4 ¶.P.....=..u.Õ..|..Õ..á^¥&..&.W. 0001E0
```

```
Dump of file SATURN:[PCCOMMON.DUMP.DLL]DML.TMP;1 on 18-APR-1990 10:44:35.23
File ID (622,20,0)   End of file block 171 / Allocated 172

Virtual block number 93 (0000005D), 512 (0200) bytes

76FF1000 681477FF 26F45EC4 001CE903 75025739 260009E9 03740739 26F45EC4 á^¶&9.t.Õ..&9W.u.Õ..á^¶&.w.hÅ..v 000000
0000FFFF 9A505200 3E05FE56 88FC4688 0000FFFF 9A5052C0 28065688 0876FF0A ..v..V.+åRP......F=.V±.>.RP..... 000020
0CE9F256 89F04689 0000FFFF 9A505200 3E05FE56 88FC4688 0019E903 7500003D =..u.Õ...F•.V±.>.RP......FÞ.V·Õ. 000040
0008C800 0ACAC95F 5E1F0000 E9000088 FF50E9F2 5689F046 8900008A 00008800 .¦..¤...FÞ.V·Õ).¦..Õ...^_èò..à.. 000060
06E90375 00003000 0001D39A 5016FC46 8D0E76FF 1076FFD8 8E000888 1E565700 .WV.¦...Ä.v..v..F•.P.£...=..u.Õ. 000080
880006E9 03750000 30000000 189A5016 F8468D0A 76FF0C76 FF0044E9 84918800 .¦..Õ0..v..v..F%.P.....=..u.Õ..¦ 0000A0
065EC400 08E90001 07C72606 5EC4000B E9037401 277F8026 F85EC400 26E98492 ..Õ&.á^¥&..'.t.Õ..á^.&ú...Õ..á^. 0000C0
76FFD88E 01A5881E 56570000 0EC8000C CAC95F5E 1F0000E9 00008800 0007C726 &ú...¦..Õ...^_èò..à...WV.¦É..Ä.v 0000E0
FC468010 76FF1276 FF014AE9 84A58800 06E90375 00003000 00FFFF9A 0676FF08 ..v......=..u.Õ..¦É.ÕJ..v..v..F• 000100
26024789 26000088 065EC401 2CE98491 880006E9 03750000 30000002 6E9A5016 .P.n...=..u.Õ..¦..Õ,.á^.¦..&.G.& 000120
0101E984 92880006 E9037500 00300000 01859A50 16F2468D 0C76FF0E 76FF0789 ...v..v..F·.P.ç...=..u.Õ..¦..Õ.. 000140
C426FC76 C42DFA5E 68C38826 0A5E68FA 4689480E 472826FC 5EC40788 26F25EC4 á^·&..á^•&+G.H.F•k^.&.úk^•-áv•&á 000160
7DC426FC 7EC42DFA 5E68260A 76680039 E9037402 04788326 08880470 C4260A74 t.&áp..Ä&.x..t.Õ9.kv.&k^•-á-•&á) 000180
5EC408C4 83007709 579A1076 FF1276FF 5052F456 88F24603 00882604 59C4260A .&áY.&...F·.V¶RP.v..v..W.w..á.á^ 0001A0
0470C426 0A74C426 FC76C42D FA5E68C3 88260A5E 680090E9 02578926 07892606 .&..&.W.Õ..k^.&.úk^•-áv•&át.&áp. 0001C0
260459C4 260A7DC4 26FC7EC4 2DFA5E68 260A766B 0069E903 74030478 83260888 .Ä&.x..t.Õi.kv.&k^•-á-•&á).&áY.& 0001E0

Dump of file SATURN:[PCCOMMON.DUMP.DLL]DML.TMP;1 on 18-APR-1990 10:44:35.23
File ID (622,20,0)   End of file block 171 / Allocated 172

Virtual block number 94 (0000005E), 512 (0200) bytes

0A7DC426 FC7EC42D FA5E6826 0A766800 41E90375 02400826 008826F2 76C41888 ..áv·&..&.@.u.ÕA.kv.&k^•-á-•&á). 000000
7500277F 8026F65E C4F85689 F6468902 50882600 8826F276 C4188826 0459C426 &áY.&..áv·&..&.P..F-.V¾á^-&..'.u 000020
00E90000 880006E9 84A08800 06E90000 0247C726 000107C7 26065EC4 000EE903 .Õ..á^.&ú...&úG...Õ..¦..Õ..¦..Õ. 000040
30000002 259A0676 FF0876FF D88E021A 881E5657 00000CC8 000ECAC9 5F5E1F00 ..^_èò..à...WV.¦...Ä.v..v..X...= 000060
00003000 0003D79A 5016FC46 8D1076FF 1276FF01 94E984A5 880006E9 03750000 ..u.Õ..¦É.Õ...v..v..F=.P.•...=.. 000080
03750000 30000004 F99A5016 F6468D0C 76FF0E76 FF0176E9 84918800 06E90375 u.Õ..¦..Õv..v..v..F-.P.•...=..u. 0000A0
C388260A 5E68FA46 89480E47 2826FC5E C4078826 F65EC401 58E98492 880006E9 Õ..¦..ÕX.á^-&..á^=&+G.H.F•k^.&.ú 0000C0
76FF0876 FF0035E9 03740204 78832608 880470C4 260A74C4 26FC76C4 2DFA5E68 k^•-áv•&át.&áp..Ä&.x..t.Õ5..v..v 0000E0
FF5052F8 5688F646 03008826 0459C426 0A7DC426 FC7EC42D FA5E6826 0A766806 .kv.&k^•-á-•&á).&áY.&...F-.V¾RP. 000100
74C426FC 76C42DFA 5E68C388 260A5E68 00F1E90C C4830209 0A4F9A10 76FF1276 v..v..O.)..á.Õþ.k^.&.úk^•-áv=&át 000120
76FF1276 FF016A00 6A0676FF 0876FF00 CAE90374 03047883 26088804 70C4260A .&áp..Ä&.x..t.Õò..v..v.j.j..v..v 000140
5E68260A 766800A7 E9F4468B 0006E903 7500003D F446890C C483FFFF 000A9A10 ..Õ....á..F¶=..u.Õ...F¶ÕÏ.kv.&k^ 000160
1FC42606 5EC40250 88260088 26F676C4 18882604 59C4260A 7DC426FC 7EC42DFA •-á-•&á).&áY.&..áv-&..&.P.á^.&á. 000180
47082607 88261FC4 26065EC4 0061E903 7500267F 8326FC5E C4025789 26078926 &..&.W.á^•&..&.u.Õa.á^.&á.&..&.G 0001A0
00003000 0002439A 5016F646 8037FF26 0277FF26 1FC42606 5EC4004F E9037502 .u.Õ0.á^.&á.&.w.&.7.f-.P.C...=.. 0001C0
00277F80 26F65EC4 `00E903 7500257F 8026F65E C40036E9 84928800 06E90375 u.Õ..¦..Õ6.á^-&..X.u.Õ..á^-&..'. 0001E0

Dump of file SATURN:[PCCOMMON.DUMP.DLL]DML.TMP;1 on 18-APR-1990 10:44:35.23
File ID (622,20,0)   End of file block 171 / Allocated 172

Virtual block number 95 (0000005F), 512 (0200) bytes

00E984A0 880006E9 00008807 89260247 89260000 881FC426 065EC400 10E90374 t.Õ..á^.&á.¦..&.G.&..¦..Õ..¦..Õ. 000000
9A5016FC 46800676 FF0876FF D88E0390 881E5657 000008C8 000ECAC9 5F5E1F00 ..^_èò..à...WV.¦...Ä.v..v..F•.P. 000020
002E0508 57882606 478826FC 5EC4009B E98491B8 0006E903 7500003D 000003B9 ¿...=..u.Õ..¦..Õ..á^•&.G.&.W.... 000040
89F84689 000005EE 9A505200 2E050857 88260647 8826FC5E C4000000 D39A5052 RP.£...á^•&.G.&.W....RP.Ý....F%. 000060
04480000 9A016AF8 76FFFA76 FF0676FF 0876FF00 5AE90375 FA4608F8 4688FA56 V•.F%.F•u.ÕZ..v..v..v•.v%j....H. 000080
FC5EC400 1EE90375 00003000 00015C9A 5052002E 05085788 26064788 26FC5EC4 á^•&.G.&.W....RP.\...=..u.Õ..á^• 0000A0
46890000 880009E9 FA5689F8 46890000 00E39A50 52002E05 08578826 06478826 &.G.&.W....RP.D....F%.V•Õ..¦...F 0000C0
D88E0550 881E5657 00000CC8 0004CAC9 5F5E1F00 00E90000 88FF98E9 F84689FA •.F¥Õ..¦..Õ...^_èò..à...WV.¦P..Ä 0000E0
5EC4011F E98491B8 0006E903 7500003D 000006A7 9A5016FC 46800676 FF0876FF .v..v..F•.P.Ï...=..u.Õ..¦..Õ..á^ 000100
00FDE900 00880006 E9037400 08000006 EA9A5052 01CC0508 57882606 478826FC •&.G.&.W..ä.RP.ö....Åt.Õ .¦..Õ». 000120
08578826 06478826 FC5EC400 0005839A 505201CC 05085788 26064788 26FC5EC4 á^•&.G.&.W..ä.RP.....á^•L G.&.W. 000140
76FFFA76 FF00A7E9 0375FA46 08F84688 FA5689F8 46890000 07299A50 5201CC05 .ä.RP.)....F%.V•.F%.F•u.Õ. .v•.v 000160
277F8026 F45EC400 A4E98492 880006E9 03750000 30000005 609A5016 F4468DF8 %.F¶.P.`...=..u.Õ..¦..ÕÉ.á^¶&..' 000180
06478826 FC5EC405 8E00009A 006AF876 FFFA76FF 0676FF08 76FF0013 E9037500 .u.Õ...v..v..v•.v%j..../.á^•&.G. 0001A0
8826FC5E C40062E9 00008800 06E90374 D0080000 FFFF9A50 5201CC05 08578826 &.W..ä.RP......Åt.Õ..¦..Õb.á^•&. 0001C0
26064788 26FC5EC4 001EE903 7500003D 000005D1 9A505201 CC050857 88260647 G.&.W..ä.RP.Ñ...=..u.Õ..á^•&.G.& 0001E0
```

```
Dump of file SATURN:[PCCOMMON.DUMP.DLL]DML.TMP;1 on 18-APR-1990 10:44:35.23
File ID (622,20,0)   End of file block 171 / Allocated 172

Virtual block number 96 (00000060), 512 (0200) bytes

 E9F84689 FA468900 00880009 E9FA5689 F8468900 0005989A 505201CC 05085788 .W..ä.RP......F%.V°Ô..|...F°.F%Ô 000000
 5F5E1F00 00E90000 B80000FF FF9A5052 01CC0508 57882606 478826FC 5EC4FF4E N.á^•&.G.&.W..ä.RP.....|..Ô...^_ 000020
 03750000 30000003 989A0676 FF0876FF 088E061C 881E5657 000016C8 0004CAC9 èò..à...WV.|...Á.v..v......=..u. 000040
 06E90375 00003040 0008299A 5016F846 800E76FF 1076FF01 58E984A5 880006E9 Ô..|É.ÔX..v..v..F%.P.)...=..u.Ô. 000060
 C4830484 000A9A0E 76FF1076 FF0A76FF 0C76FF06 76FF0876 FF013AE9 84918800 .|..Ô:..v..v..v..v..v..v..Ô....á 000080
 89FC4689 02578826 07882606 5EC4010F E9EA4688 0006E903 75000030 EA46890C ..Fö=..u.Ô...FöÔ..á^.&..&.W..F•. 0000A0
 0006719A F476FFF6 76FFF656 89F44689 01CC0508 57882606 478826F8 5EC4FE56 V±á^Y&.G.&.W..ä..F¶.V-.v-.v¶.q.. 0000C0
 F276FF00 8EE90375 F24608F0 4688F256 89F04689 0000088F 9AF476FF F676FF00 ..v-.v¶.€....Fþ.V .Fþ.F u.Ô/..v  0000E0
 F626EC5E C400A6E9 84928800 06E90375 00003000 00062C9A 5016EC46 8DF076FF .vþ.F$.P.,...=..u.Ô..|..Ôl.á^$&- 000100
 E9037500 257F8026 EC5EC400 00E90375 00267F83 26F85EC4 005DE903 74040247 G..t.Ôl.á^Y&..&.u.Ô..á^$&..%.u.Ô 000120
 26078926 F25688F0 468804FC 4683FC5E C40036E9 03750027 7F8026EC 5EC40043 C.á^$&..'.u.Ô6.á^•.F•..Fþ.V &..& 000140
 E9037600 0A7E8300 09E9037D 0011E903 7E000C7E 83000C5E 83010A6E 83025789 .W..n...^...~..~.Ô..}.Ô...~..v.Ô 000160
 869AF476 FFF676FF 0014E903 75000030 0000070C 9AF476FF F676FF00 36E90003 ..Ô6..v-.v¶.....=..u.Ô...v-.v¶.. 000180
 00E90000 88FF37E9 F25689F0 46890000 BA0000B8 000CE9F2 5689F046 89000006 ....Fþ.V Ô..|..¤...Fþ.V Ô7.|..Ô. 0001A0
 9A5016F8 46800A76 FF0C76FF 088E076C 881E5657 000008C8 000CCAC9 5F5E1F00 ..^_èò..à...WV.|l..Á.v..v..F%.P. 0001C0
 01CC0508 57882606 478826F8 5EC4003E E98491B8 0006E903 75000030 00000795 ....=..u.Ô..|..Ô>.á^Y&.G.&.W..ä. 0001E0

Dump of file SATURN:[PCCOMMON.DUMP.DLL]DML.TMP;1 on 18-APR-1990 10:44:35.23
File ID (622,20,0)   End of file block 171 / Allocated 172

Virtual block number 97 (00000061), 512 (0200) bytes

 FFFE76FF 0A76FF0C 76FFFE56 89FC4689 08C48309 4809579A 0A76FF0C 76FF5052 RP.v..v..W.K..á..F•.V±.v..v..v±. 000000
 F0881E56 57000010 C80008CA C95F5E1F 0000E906 0707649A 0676FF08 76FFFC76 v•.v..v..d.■.Ô...^_èò..à...WV.|þ 000020
 7500003D 000009C0 9A5016FC 46800676 FF0876FF F84689FA 46890000 88088E08 ..Á|...F°.F%.v..v..F•.P.à...=..u 000040
 259A0A76 FF0C76FF 000007FD 9A0A76FF 0C76FF00 80E9FFFF 8A849288 0009E903 .Ô..|..¤..Ô§..v..v..»....v..v..% 000060
 9A5016F0 4680F476 FFF676FF 0080E903 75F64608 F44688F6 5689F446 8900000A ....F¶.V-.F¶.F-u.Ô...v-.v¶.Fþ.P. 000080
 26FC5EC4 002FE903 74040247 F626F05E C40072E9 0003E903 75000030 00000900 ....•..u.Ô..Ôr.á^þ&-G..t.Ô/.á^•& 0000A0
 03750027 7F8026F0 5EC40015 E9037500 257F8026 F05EC400 00E90375 00267F83 ..&.u.Ô..á^þ&..%.u.Ô..á^þ&..'.u. 0000C0
 76FF0014 E9037500 00300000 08AC9A0A 76FF0C76 FF00FA56 8301F846 830008E9 Ô...F%..V°..v..v..¯...=..u.Ô...v 0000E0
 68E9F656 89F44689 00008A00 0088000C E9F65689 F4468900 0008089A 0A76FF0C ..v.......F¶.V-Ô..|..¤...F¶.V-Ôh 000100
 0000EE46 C7D88E09 5F881E56 57000012 C8C8C95F 5E1F0000 E9FA5688 F84688FF ..F%.V°Ô...^_èùà...WV.|_..ÁüFY.. 000120
 0E76FF10 76FFFE56 89FC4689 08C48309 2809579A 0676FF08 76FF0A76 FF0C76FF .v..v..v..v..W.+..á..F•.V±.v..v. 000140
 880006E9 03750000 30EE4689 0CC48307 8C000A9A 0676FF08 76FFFC76 FFFE76FF .v±.v•.v..v..Ô.V..á..FY=..u.Ô... 000160
 00000994 9A0A76FF 0C76FFFA 5689F846 89025788 26078826 0E5EC400 C6E9EE46 FYÔ6.á^.&..&.W..F%.V°.v..v...... 000180
 FFF676FF 008FE903 75F64608 F44688F6 5689F446 89000008 4F9A0A76 FF0C76FF .v..v..O....F¶.V-.F¶.F-u.Ô...v-. 0001A0
 47F626F0 5EC40071 E9849288 0006E903 75000030 00000978 9A5016F0 4680F476 v¶.Fþ.P.x...=..u.Ô..|..Ôq.á^þ&-G 0001C0
 14E90375 00277F80 26F05EC4 0021E903 7500257F 8026F05E C4002EE9 03740402 ..t.Ô..á^þ&..%.u.Ôl.á^þ&..'.u.Ô. 0001E0

Dump of file SATURN:[PCCOMMON.DUMP.DLL]DML.TMP;1 on 18-APR-1990 10:44:35.23
File ID (622,20,0)   End of file block 171 / Allocated 172

Virtual block number 98 (00000062), 512 (0200) bytes

 00000A12 9A0A76FF 0C76FF02 57892607 8926F656 88F44688 04F84683 F85EC400 .á^%.F%..F¶.V-&..&.W..v..v ..... 000000
 8A000088 000CE9F6 5689F446 89000009 9F9A0A76 FF0C76FF 0014E903 75000030 =..u.Ô...v..v.......F¶.V-Ô..|..¤ 000020
 260A5EC4 D88E0A57 881E5657 000004C8 CBC95F5E 1FFF66E9 F65689F4 46890000 ...F¶.V-Ôf..^_èùà...WV.|W..Áá^.& 000040
 9A505201 CC050856 88064688 00000ABC 9A505201 CC050856 88064688 002747C6 6G'..F..V..ä.RP.V....F..V..ä.RP. 000060
 0374FC46 39105688 0E468800 66E90375 FE4608FC 4688FE56 89FC4689 00000C02 .....F•.V±.F•.F±u.Ôf..F..V.9F=t. 000080
 46880030 E90000FF FF9A5052 01CC0508 56880646 880013E9 0374FE56 39001BE9 Ô..9V±t.Ô...F..V..ä.RP.....Ô=..F 0000A0
 5201CC05 08568806 46880019 E9037500 00300000 083C9A50 5201CC05 08568806 ..V..ä.RP.<...=..u.Ô...F..V..ä.R 0000C0
 5E1F0000 E9FF8FE9 FC4689FE 46890000 880009E9 FE5689FC 46890000 0AC79A50 P.ú....F•.V±Ô..|...F±.F•Ô..Ô...^ 0000E0
 02030000 00030A8F  0020071 00030AE8 02030004 000608A0 02030000 90C8C95F _èü.........à...Ô...q.......... 000100
 02030000 00080A6F .J0200F8 0006064F 020300EF 000608D7 020300E5 00060090 ....Í...■...ÿ...O...%...o....... 000120
 020300A6 00050777 02030116 0007014C 02030000 00120878 00020108 00060753 S.......x.......L.......w...Í... 000140
 008646C7 D88EFFFF 881E5657 000080C8 000000C2 000608EA 0203008B 00060890 ....£...ô...ô...à...WV.|...ÁüF.. 000160
 46800676 FF0876FF EA4689EC 46890000 88F84689 FA468900 00880000 8046C700 .úF...|...F°.F%|...F$.Fô.v..v..F 000180
 52000405 FE5688FC 46880632 E98492B8 0006E903 75000030 0000FFFF 9A5016FC =.P.....=..u.Ô..|..Ô2..F•.V±...R 0001A0
 0608E986 46880006 E9037500 00308646 8908C483 FFFF0000 9AFC76FF FE76FF50 P.v±.v=......á..F.=..u.Ô...F.Ô.. 0001C0
 E90374D0 088E5689 8C468906 C48302E6 085C9AFC 76FFFE76 FF1477FF 26FC5EC4 á^•&.w..v±.v=.\.Í..á..F..V..Át.Ô 0001E0
```

```
Dump of file SATURN:[PCCOMMON.DUMP.DLL]DML.TMP;1 on 18-APR-1990 10:44:35.23
File ID (622,20,0)   End of file block 171 / Allocated 172

Virtual block number 99 (00000063), 512 (0200) bytes

 77FF268C 5EC45052 002E05FE 568BFC46 881A77FF 26FC5EC4 05E0E984 94880006 ..|..ÕÀ.á^=&.w..F=.V±...RPá^.&.w 000000
 20578926 1E478926 FC5EC405 57882603 4788268C 5EC40000 030F9A03 77FF2605 .&.w......á^.&.G.&.W.á^=&.G.&.W  000020
 74D008DE 56890C46 8908C483 01750210 9A505200 8405FE56 88FC4688 009E681E .h...F=.V±.Ç.RP...u..á..FÉ.VÄ.Ät 000040
 95880006 E9037500 00300000 FFFF9A50 168A4680 006A057E E9849A88 0006E903 .Õ..|..Õ~.j..F..P.....=..u.Õ..|. 000060
 76FF000E E9037500 00300000 01499A50 16824680 0FCA6800 6A8A76FF 0564E984 .Õd..v.j.hò..F..P.I...=..u.Õ...v 000080
 00003000 0002329A 50160846 800E6A00 6A8A76FF 053CE984 98880000 01599A8A ..Y...|..Õ<..v.j.j...FÄ.P.2...=.. 0000A0
 90468041 6A016ADC 76FFDE76 FF0515E9 84988800 0002429A 8A76FF00 0EE90375 u.Õ...v..B...|..Õ...vB.vÉj.jA.F. 0000C0
 468D00A1 681E0A6A 04F0E984 90880006 E9037400 0030CC4 83019602 449A5016 .P.D....á.=..t.Õ..|..Õp.j..hÀ..F 0000E0
 8000AC68 1E0A6A04 CFE98490 880006E9 03750000 300AC483 0187096A 9A501690 ..P.j.ñ..á.=..u.Õ..|..Õü.j..h^.. 000100
 884689C5 46880 4AE E9849088 0006E903 75000030 0AC48301 F2096A9A 50169A46 F..P.j....á.=..u.Õ..|..ÕÜ..Fé.F. 000120
 9A505200 7205FE56 88FC4688 5016A446 800499E9 84908800 06E90374 00887E83 .-..t.Õ..|..Õ...FÉ.P.F=.V±.r.RP. 000140
 5688CD46 88FC5EC4 0C578926 0A478926 C85688C9 4688FC5E C408C483 0266.`A2 Å.k..á.á^=.Fè.VÙ&.G.&.W.á^=.Fë.V 000160
 16F84680 50E001C1 03E001E0 D1C88888 4688006A 8A76FF10 5789260E 47892.`F ù&.G.&.W..v.j..F..à1Å1Å.é1ÅP.F%. 000180
 88F8468B 042CE984 98880000 FFFF9A8A 76FF000E E9037500 00300000 FFFF9A.0 P.....=..u.Õ...v......|..Õ,.F%. 0001A0
 0CC48302 8002449A 8276FF84 76FF026A 016ADC76 FFDE76FF EC5689EA 4689FA56 V°.FÕ.V§.vÄ.vÉj.j..v..v..D.-..á. 0001C0
 825EC401 68E90003 E90374FF 3F832682 5EC403FA E9849088 0006E903 74000030 =..t.Õ..|..Õ°.á^.&.?.t.Õ..Õk.á^. 0001E0

Dump of file SATURN:[PCCOMMON.DUMP.DLL]DML.TMP;1 on 18-APR-1990 10:44:35.23
File ID (622,20,0)   End of file block 171 / Allocated 172

Virtual block number 100 (00000064), 512 (0200) bytes

 02449A50 52000205 84568882 46883 7FF 26825EC4 016ADC76 FFDE76FF 022F8326 &./..vB.vÉj.á^.&.7.F..V....RP.D. 000000
 47392682 5EC41447 8826FC5E C4038 5E9 84908800 06E90374 00003D0C C483033F ?..á.=..t.Õ..|..Õç.á^=&.G.á^.&9G 000020
 56898C46 8906C483 FFFF085C 9AFC76FF FE76FF02 77FF2682 5EC40030 E9037502 .u.Õ=.á^.&.w..v±.v=.\....á..F..V 000040
 FF9A0377 FF260577 FF268C5E C4505200 2E05FE56 88FC4688 1A77FF26 FC5EC48E .á^=&.w..F=.V±...RPá^.&.w.&.w... 000060
 56888246 88286A07 57892605 47892682 5EC40557 88260347 88268C5E C40000FF ...á^.&.G.&.W.á^.&.G.&.W.j(.F..V 000080
 268C5EC4 002747C6 268C5EC4 0AC483FF FF09C69A 8C76FF8E 76FF5052 00020584 ....RP.v..v..ó....á.á^.&óG'.á^.& 0000A0
 26074788 268C5EC4 078926F8 5EC40788 268C5EC4 002647C6 268C5EC4 012547C6 6G%.á^.&óG&.á^.&..á^%&..á^.&.G.& 0000C0
 06478926 F85EC405 57882603 4788268C 5EC40457 89260247 8926F85E C4095788 .W.á^%&.G.&.W.á^.&.G.&.W.á^%&.G. 0000E0
 0308067D 9AFC76FF FE76FF8C 76FF8E76 FF505200 2A058456 88824688 08578926 &.W..F..V..*.RP.v..v..v±.v=.).Ü. 000100
 FF8E76FF 1A77FF26 FC5EC400 2CE90374 16473926 FC5EC407 88268C5E C40CC483 .á.á^.&..á^=&9G.t.Õ,.á^=&.w..v.. 000120
 87E98646 880006E9 03750000 30864689 0AC48304 0209459A 0C76FFDE 76FF8C76 v..vB.vÉ.E....á..F.=..u.Õ...F.Õ. 000140
 FFEC76FF 8876FF0A 6A04A768 04A46800 19E9037F 01887E83 FE60E90A F8468302 ..F%.Õ'±.-....Õ..hÉ.hl.j..v..v§. 000160
 016ADC76 FFDE76FF F04689F2 46890000 880000EE 46C70CC4 83043808 E69AEA76 võ.|.;..á.úFŸ..|...F`.Fþ.vB.vÉj. 000180
 5EC4022A E9849088 0006E903 74000030 0CC48304 8C02449A D876FFDA 76FF0E6A j..vÕ.vÄ.D.¥..á.=..t.Õ..|..Õ°.á^ 0001A0
 4688D85E C4001EE9 03740739 26EE4688 D85EC401 C2E90003 E90374FF 3F832608 Å&.?.t.Õ..Õò.á^Å.FŸ&9.t.Õ..á^Å.F 0001C0
 89078826 D85EC400 64E90003 E9037404 57392600 0CE90374 02473926 F2568 8F0 Þ.V·&9G.t.Õ..&9W.t.Õ..Õd.á^Å&... 0001E0

Dump of file SATURN:[PCCOMMON.DUMP.DLL]DML.TMP;1 on 18-APR-1990 10:44:35.23
File ID (622,20,0)   End of file block 171 / Allocated 172

Virtual block number 101 (00000065), 512 (0200) bytes

 76FF8876 FF0A6A05 0C680509 68F25689 F0468904 57882602 47882608 5EC4EE46 FŸá^Å&.G.&.W..Fþ.V·h..h..j..v..v 000000
 E90374FA 4608F846 88FA5689 F8468910 C4830521 0A6C9A50 16EE4680 EA76FFEC &.võ.FŸ.P.l.I..á..F%.V°.F%.F°t.Õ 000020
 D85EC400 00054E9A 50168C46 800677FF 260877FF 26F85EC4 01A0E984 92880006 ..|..Õ..á^%&.w.&.w..F..P.N...á^Ä 000040
 0A6AFFFF 68063A68 E45689E2 46890C57 88260A47 88260 85E C4E04689 08478826 &.G..FÅá^Å&.G.&.W..Fã.Võh:.h..j. 000060
 08F84688 FA5689F8 468910C4 8306650A 6C9A5016 E0468DEA 76FFEC76 FF8876FF .v..v§.võ.FÅ.P.l.e..á..F%.V°.F%. 000080
 00349A50 16044680 0677FF26 0877FF26 F85EC401 38E98492 880006E9 0374FA46 F°t.Õ..|..Õ;.á^%&.w.&.w..Fá.P.4. 0000A0
 68C38826 D8680647 8826D85E C4D24689 48124728 26FC5EC4 0788268C 5EC40000 ..á^.&..á^=&+G.H.Fºá^Ä&.G.kÄ&.Ük 0000C0
 47882604 5EC40032 E9037403 04788326 08880470 C4260674 C426FC76 C420D25E ^@-áv=&át.&áp..Ä&.x..t.Õ2.á^Ä&.G 0000E0
 C4188826 0459C426 0670C426 FC7EC420 D25E6826 06776826 D85EC405 57882603 .&.W.á^Ä&kw,&k^@-á~=&á).&áY.&..á 000100
 26FC76C4 20025E68 C38826D8 68064788 26085EC4 0060E902 50892600 89268C76 v.&..&.P.Õ'.á^Ä&.G.kÄ&,Ük^@-áv=& 000120
 77682608 5EC41A77 FF26FC5E C40039E9 03740204 78832608 880470C4 260674C4 át.&áp..Ä&.x..t.Õ9.á^=&.w.á^Ä&kw 000140
 26045EC4 50528E56 888C4603 00882604 59C42606 7DC426FC 7EC42002 5E682606 .&k^@-á~=&á).&áY.&...F..V.RPá^Ä& 000160
 76FFDC76 FFDE76FF 0028E903 7500C77E 83FE09E9 00000086 9A0377FF 260577FF .w.&.w..Ñ...Õ.±.~ú.u.Õ(..vB.vÉ.v 000180
 0028E986 46880006 E9037500 00308646 890AC483 00800904 9AFC76FF FE76FFC7 ú.v±.v=.Å....á..F.=..u.Õ...F.Õ(. 0001A0
 01329A8A 76FF04C4 8300E201 369A0C76 FFDE76FF 0000FFFF 9A0477FF 26FC5EC4 á^=&.w.......vB.vÉ.6.ã..á..v..2. 0001C0
 C4078826 0A5EC4D8 8E000888 1E565700 0004C8C8 C95F5E1F 0000E900 00880000 ..|..Õ...^_èùà...WV.|...Äá^.&..á 0001E0
```

```
Dump of file SATURN·[PCCOMMON.DUMP.DLL]DML.TMP;1 on 18-APR-1990 10:44:35.23
File ID (622,20,0)   End of file block 171 / Allocated 172

Virtual block number 102 (00000066), 512 (0200) bytes

 0674C426 0676C42D FE5E68FC 46FF0003 E90001FC 46C7FE46 894B1247 2B26065E ^.&+G.H.FzúF=..Õ...F•k^z-áv.&át. 000000
 70C42606 74C42606 76C42DFE 5E68C388 26FC5E68 0198E903 73084039 26FC4688 .F•&9∂.s.Õ..k^•&.úk^z-áv.&át.&áp 000020
 C4260674 C4260676 C42DFE5E 68C38826 FC5E6800 68E90374 01047883 26088804 ..Ä&.x..t.Õh.k^•&.úk^z-áv.&át.&á 000040
 59C42606 7DC426O6 7EC42DFE 5E6826FC 76680E76 FF1076FF 0270FF26 D8880470 p..Ä&.p..v..v.kv•&k^z-á-.&á).&áY 000060
 76C42DFE 5E68C388 26FC5E68 0AC48304 1509C69A 50520C56 880A4603 00882604 .&...F..V.RP.ó....á.k^•&.úk^z-áv 000080
 C42DFE5E 68C38826 FC5E6801 0FE90E46 01024088 26088804 70C42606 74C42606 .&át.&áp..Ä&.∂..F.Õ..k^•&.úk^z-á 0000A0
 2DFE5E68 C38826FC 5E680068 E9037405 04788326 D8880470 C4260674 C4260676 v.&át.&áp..Ä&.x..t.Õh.k^•&.úk^z- 0000C0
 C42DFE5E 6826FC76 680E76FF 1076FF02 70FF2608 880470C4 260674C4 260676C4 áv.&át.&áp..Ä&.p..v..v.kv•&k^z-á 0000E0
 FC5E680A C483071F 09C69A50 520C5688 0A460300 88260459 C426067D C426067E -.&á).&áY.&...F..V.RP.ó. ..á.k^• 000100
 5E680086 E90E4601 02408826 D8880470 C4260674 C4260676 C42DFE5E 68C38826 &.úk^z-áv.&át.&áp..Ä&.∂..  Õ..k^ 000120
 6B0065E9 03740404 78832608 880470C4 260674C4 260676C4 2DFE5E68 C38826FC •&.úk^z-áv.&át.&áp..Ä&.x..t.Õe.k 000140
 0E76FF10 76FF0270 FF260888 0470C426 0674C426 0676C42D FE5E68C3 8826FC5E ^•&.úk^z-áv.&át.&áp..Ä&.p..v..v. 000160
 D79A5052 0C56880A 46030088 260459C4 26067DC4 26067EC4 2DFE5E68 26FC7668 kv•&k^z-á-.&á).&áY.&...F..V.RP.■ 000180
 40882608 880470C4 260674C4 260676C4 2DFE5E68 C38826FC 5E680AC4 83FFFF23 #...á.k^•&.úk^z-Áv.&át.&áp..Ä&.∂ 0001A0
 00008800 00F446C7 D88E0685 881E5657 00000CC8 C8C95F5E 1FFE48E9 0E460102 ..F.ÕKz.^_èùà...WV.¡...ÁuF¶..¡.. 0001C0
 260674C4 260676C4 2DFE5E68 FE468948 12472826 065EC40A 4688F646 89F84689 .F%.F-.F.Ž^.&+G.H.Fzk^z-áv.&át.& 0001E0

Dump of file SATURN:[PCCOMMON.DUMP.DLL]DML.TMP;1 on 18-APR-1990 10:44:35.23
File ID (622,20,0)   End of file block 171 / Allocated 172

Virtual block number 103 (00000067), 512 (0200) bytes

 C42DFE5E 68026A1A 77FF2606 5EC4009E E900008A 00008800 09E90374 000A7883 .x..t.Õ..¡..¤..Õ..á^.&.w.j.k^z-á 000000
 8A000088 0009E903 7500003D 0000FFFF 9A5016FA 4680A070 FF260674 C4260676 v.&át.&.p..F*.P.....=..u.Õ..¡..¤ 000020
 00008800 09E90375 00003000 0004E99A 5016F646 8DFA76FF FC76FF00 68E90000 ..Õk..v•.v*.F-.P.Õ...=..u.Õ..¡.. 000040
 0A249AF6 76FFF876 FF0.6A0A 70FF2606 74C42606 76C42DFE 5E68004A E900008A ¤..ÕJ.k^z-áv.&át.&.p.j..v%.v-.$. 000060
 C40557B9 26034789 26FC5688 FA4688F6 5EC40789 260A4688 F65EC408 C4..7A8 ^..á.á^-.F.&..á^-.F*.V=&.G.&.W.á 000080
 8E0864B8 1E565700 0004C8CB C95F5E1F 0000E9F8 5688F646 88012547 C626. 5E ^-&6GX..F-.VKÕ...^_èùà...WV.¡d.. 0000A0
 00003D00 0008C09A 5052002A 050C5688 0A468828 77FF260A 5EC4026A 0E76F..8 Ä.v.j.á^.&.w(.F..V..*.RP.á...=.. 0000C0
 000008E1 9A5016FC 46802A77 FF262C77 FF260A5E C40054E9 84988800 06E90375 u.Õ..¡..Õl.á^.&.w,&.w*.F•.P.Ä... 0000E0
 FE76FF28 77FF260A 5EC4016A 0676FF08 76FF0031 E98492B8 0006E903 75000030 =..u.Õ..¡..Õl..v..v.j.á^.&.w(.vz 000100
 1F0000E9 00008800 06E98490 880006E9 03740000 300CC483 09100244 9AFC76FF .v•.D....á.=..t.Õ..¡..Õ..¡..Õ... 000120
 C401CCE9 0375000A 7E830A4E FF0003E9 D88E094D 881E5657 000030C8 C8C95F5E ^_èùàO..WV.¡M..ÄÕ...N..~..u.Õë.á 000140
 E98494B8 0006E903 75000030 00000804 9A501606 46806B6A 026A1A77 FF26065E ^‾&.w.j.jk.F•.P.....=..u.Õ..¡..Õ 000160
 0191E984 92880006 E9037500 00300000 08229A50 160A468D D676FFD8 76FF01AF £..vÄ.v•.FÕ.P."...=..u.Õ..¡..Õ.. 000180
 0006E903 74000030 0CC4830A 9A02449A DA76FFDC 76FF686A 016A0C76 FF0E76FF .v..v.j.jk.vÉ.vÕ.D....á.=..t.Õ.. 0001A0
 189AD676 FFD876FF 505201B8 05085688 06468B1A 77FF2606 5EC4016B E98490B8 ¡..Õk.á^.&.w..F..V..¡.RP.vÄ.v•.. 0001C0
 88DA4688 006A106A 27578926 25478926 DA5EC402 57882607 8826065E C4000006 ...á^.&..&.W.á^Õ&.G%&.W'j.j..FÕ. 0001E0

Dump of file SATURN:[PCCOMMON.DUMP.DLL]DML.TMP;1 on 18-APR-1990 10:44:35.23
File ID (622,20,0)   End of file block 171 / Allocated 172

Virtual block number 104 (00000068), 512 (0200) bytes

 249A5052 005805DC 5688DA46 88006A10 6A08C483 0AB10A24 9A505200 4805DC56 VÉ.K.RP.$.Ÿ..á.j.j..FÕ.VÉ.[.RP.$ 000000
 00003D0C C4830AE3 02449A50 16DE4680 216A016A 0C76FF0E 76FF08C4 830AC80A .à..á..v..v.j.j!.F8.P.D.D..á.=.. 000020
 0003E903 7400003D 04C48309 B608029A 50160E46 8D00E6E9 84908800 06E90374 t.Õ..¡..Õl..F8.P...Ñ..á.=..t.Õ.. 000040
 0006E903 7500003D 00000969 9A501606 4680216A 026A1A77 FF26065E C40074E9 Õt.á^.&.w.j.j!.F•.P.i...=..u.Õ.. 000060
 92880006 E9037500 00300000 098C9A50 1600468D 0676FFD8 76FF00A8 E98494B8 ¡..Õ¨..vÄ.v•.FÅ.P.....=..u.Õ..¡. 000080
 46881A77 FF26065E C408C483 087907A2 9AD076FF D276FF50 16DE4680 008DE984 .Õ...F8.P.v•.vÄ.Å.y..á.á^.&.w..F 0000A0
 6A016A0C 76FF0E76 FFFF4FE9 000008B1 9AD676FF D876FF50 52004805 0C5688DA Õ.VÉ.K.RP.vÄ.v•.Ÿ...ÕO..v..v.j.j 0000C0
 FFD47E83 0035E984 90880006 E9037400 00300CC4 830A4302 449A5016 D4468D02 ..Få.P.D.C..á.=..t.Õ..¡..Õ5..-å. 0000E0
 505299D4 46885052 005805DC 5688DA46 881A77FF 26065EC4 0020E900 03E90374 t.Õ..Õ .á^.&.w..FÕ.VÉ.[.RP.Få.RP 000100
 09DC881E 56570000 02C8C8C9 5F5E1F00 00E90000 88FE28E9 FFAFE900 000A6F9A .o...ÕÉ.Õ(z¡..Õ...^_èùà...WV.¡É. 000120
 02478826 065EC400 14E90374 00003DFE 4689072B 260A5EC4 07882606 5EC4D88E .Ãá^.&..á^.&+..Fz=..t.Õ..á^.&.G. 000140
 00030A1E 02030000 C8C95F5E 1F0000E9 FE468800 06E90009 E902472B 260A5EC4 á^.&+G.Õ..Õ...FzÕ...^_èù........ 000160
 000C03AE 00020014 00030102 02030000 00080831 0002000F 00060860 02030071 q...'...Õ...1...............Û... 000180
 00100842 00020022 0003066E 02030000 000E005A 0002002E 00010658 01030000 ....X.......Z.......n..."...B... 0001A0
 00030A00 02030031 00030122 02030000 001208CE 000208C6 000C0405 00050000 ........ó...ö......."...1....... 0001C0
 FF3086C7 D88EFFFF 881E5657 0000E6C8 00000000 00000000 00000000 0000004C L...............àl..WV.¡...Äú.D. 0001E0
```

```
Dump of file SATURN:[PCCOMMON.DUMP.DLL]DML.TMP;1 on 18-APR-1990 10:44:35.23
File ID (622,20,0)   End of file block 171 / Allocated 172

Virtual block number 105 (00000069), 512 (0200) bytes

 16FC468D 0676FF08 76FF04C4 83005308 F89A5016 FF26868D FFFFFF2A 86C70000 ..ú.*.....&..P.½.S..á..v..v..F•. 000000
 5016FF32 868D0088 681E0A6A 054AE984 92B80006 E9037500 00300000 01BE9A50 P./...=..u.Õ..|..ÕJ.j..h|...2..P 000020
 88FC4688 0AC4830C 8009C69A 5016FF3C 868D00C3 681E0A6A 0AC48300 6709C69A .6.g..á.j..hü...<..P.6....á..F•. 000040
 FF678689 FF698689 00008808 C48300C8 07A29A50 16FF4686 80505200 7205FE56 V±.r.RP..f..P.Å.à..á.|....i...g. 000060
 86891057 88260E47 8826FC5E C4FF6096 89FF6886 890C5788 260A4788 26FC5EC4 á^=&.G.&.W...k...m.á^•&.G.&.W... 000080
 7E868908 C48300F5 02109A50 52008405 FE5688FC 468800CE 681EFF71 9689FF6F o...q..hö..F=.V±.Ç.RP...½..á...~ 0000A0
 FF32868D 416A016A FF7E86FF 8076FF04 ADE98490 880006E9 03740008 805689FF ..V..Åt.Õ..|..ÕÜ..v..Ñ~.j.jA..2. 0000C0
 0405FE56 88FC4688 0486E984 90880006 E9037400 00300CC4 83026F04 AA9A5016 .P.ˆ.o..á.=..t.Õ..|..Õ...F•.V±.. 0000E0
 30868800 07E90375 000030FF 30868908 C483FFFF 00009AFC 76FFFE76 FF505200 .RP.v±.v•......á...0.=..u.Õ....0 000100
 FF043FE9 84958800 0.E90375 00003000 00FFFF9A 5016FF78 8680006A 045AE9FF .Õ2.j...x..P.....=..u.Õ..|..Õ?.. 000120
 9AFF7886 FF000FE9 03750000 300000FF FF9A5016 FF22868D 0FCA6800 6AFF7886 Ñx.j.hò..."..P.....=..u.Õ...Ñx.. 000140
 FE5688FC 46880000 028E9A50 52002E05 FE5688FC 46880414 E9849888 0000FFFF ....|..Õ...F•.V±...RP......F•.V± 000160
 FF00ACE9 0375FF7C 8608FF7A 8688FF7C 9689FF7A 86890000 023E9A50 52002E05 ...RP.>.....z...|...z...|.u.Õ˜.. 000180
 03BEE984 92880006 E9037500 00300000 02C69A50 16FF7486 8DFF7A86 FFFF7C86 Ñ|..Ñz...t..P.6...=..u.Õ..|..Õf. 0001A0
 05939AFF 7E86FF80 76FFFC76 FFFE76FF FF7486FF FF7686FF FF2286FF FF2486FF .Ñ$..Ñ"..Ñv..Ñt..v±.v=.v..Ñ~.... 0001C0
 0247F626 FF749EC4 0386E9FF 30868800 07E90375 000030FF 30868910 C48302F0 Þ..á...0.=..u.Õ....0.Õ..á.t.&-G. 0001E0

Dump of file SATURN:[PCCOMMON.DUMP.DLL]DML.TMP;1 on 18-APR-1990 10:44:35.23
File ID (622,20,0)   End of file block 171 / Allocated 172

Virtual block number 106 (0000006A), 512 (0200) bytes

 E9037500 00300000 03149A50 52002E05 FE5688FC 4688FF67 86FF0004 E9037404 .t.Õ....g..F•.V±...RP.....=..u.Õ 000000
 00008800 08E9FF7C 9689FF7A 86890000 029E9A50 52002E05 FE5688FC 46880018 ...F•.V±...RP.......z...|.Õ..|.. 000020
 5504AA9A 5016FF2A 8680026A 016AFF7E 86FF8076 FFFF47E9 FF7A8689 FF7C8689 ..|...z.ÕG..v..Ñ-.j.j...•..P.ˆ.U 000040
 FFFF9A50 52002E05 FE5688FC 4688030C E98490B8 0006E903 7400003D 0CC48303 ..á.=..t.Õ..|..Õ...F•.V±...RP... 000060
 8608FF7A 8688FF7C 9689FF7A 86890000 032C9A50 52002E05 FE5688FC 46880000 ...F•.V±...RP.......z...|...z... 000080
 E9037500 00300000 FFFF9A50 16FF7486 8DFF7A86 FFFF7C86 FF0092E9 0375FF7C |.u.Õ...Ñ|..Ñz...t..P.....=..u.Õ 0000A0
 09099AFF 7E86FF80 76FFFC76 FFFE76FF FF7486FF FF7686FF 0286E984 92880006 ..|..ÕÑ..Ñv..Ñt..v±.v=.v..Ñ-.... 0000C0
 2E05FE56 88FC4688 0286E9FF 30868800 07E90375 000030FF 3086890C C483FFFF ...á...0.=..u.Õ.....0.Õ...F•.V±.. 0000E0
 0000FFFF 9A505200 2E05FE56 88FC4688 001BE903 7500003D 0000FFFF 9A505200 .RP.....=..u.Õ...F•.V±...RP..... 000100
 86468000 6A0E6AFF 61E9FF7A 8689FF7C 86890000 88000BE9 FF7C9689 FF7A8689 ..z...|.Õ..|.....|...z.Õm.j.j..F. 000120
 16864680 0E6A016A FF7E86FF 8076FF86 4689FF2A 868B08C4 8303740A 249A5016 .P.$.t..á...*..F..v..Ñ~.j.j..F.. 000140
 018805FE 5688FC46 880207E9 84908800 06E90374 0000300C C483FFFF 04AA9A50 P.ˆ....á.=..t.Õ..|..Õ...F•.V±.|. 000160
 88FF7C96 89FF7A86 89000004 2C9A5052 018805FE 5688FC46 88000001 869A5052 RP......F•.V±.|.RP.......z...|.. 000180
 00300000 00329A50 16944680 FF7AB6FF FF7C86FF 0080E903 75FF7C86 08FF7A86 .z...|.u.Õ...Ñ|..Ñz..F..P.2...=. 0001A0
 C48301F0 0C4F9AFF 7E86FF80 76FF9476 FF9676FF 0182E984 92880006 E9037500 .u.Õ..|..Õÿ..v..v..v..Ñ-..O.Þ..á 0001C0
 8805FE56 88FC4688 FF6986FF 018AE9FF 30868800 07E90375 000030FF 30868908 ...0.=..u.Õ....0.Õ....i..F•.V±.| 0001E0

Dump of file SATURN:[PCCOMMON.DUMP.DLL]DML.TMP;1 on 18-APR-1990 10:'':35.23
File ID (622,20,0)   End of file block 171 / Allocated 172

Virtual block number 107 (00000068), 512 (0200) bytes

 00000196 9A505201 8805FE56 88FC4688 001BE903 7500003D 00000226 9A505201 .RP.&...=..u.Õ...F•.V±.|.RP..... 000000
 FF7E86FF 8076FFFF 66E9FF7A 8689FF7C 86890000 88000BE9 FF7C9689 FF7A8689 ..z...|.Õ..|....|...z.Õf..v..Ñ-. 000020
 011EE984 90880006 E9037400 00300CC4 83047A04 AA9A5016 FF2A8680 026A366A j6j...•..P.ˆ.z...á.=..t.Õ..|..Õ.. 000040
 88000168 1E0000FF FF9A0477 FF26FC5E C404C483 04900136 9AFF7E86 FF8076FF .v..Ñ~..6....á.á^•&.w.......h1.. 000060
 0006E903 74D00880 5689FF7E 868908C4 8304CA02 109A5052 00B405FE 5688FC46 F•.V±.Ç.RP...ò..á...-..V..Åt.Õ.. 000080
 300CC483 04E704AA 9A5016FF 32868041 6A016AFF 7E86FF80 76FF0008 E9849088 |..ÕÄ..v..Ñ~.j.jA..2..P.ˆ.Õ..á.= 0000A0
 16824680 04C48304 F401369A FF7EB6FF 8076FF00 81E98490 880006E9 03740000 ..t.Õ..|..ÕŸ..v..Ñ-..6.¶..á..F.. 0000C0
 006EE903 7400003D 0000FFFF 9A5016FF 2C868000 D5681E04 C4830521 08F89A50 P.½.|..á..h(.......P.....=..t.Õn. 0000E0
 8E1E0716 F088FF1A 8E8008C4 83055D08 C49A8276 FF8476FF FF2686FF FF2886FF .Ñ(..Ñ&..v..v..á.)..á../...Þ.... 000100
 52007205 FE5688FC 4688FF1A 86FFFF1C 86FFFF1E 86FFFF20 86FF1FA5 A5A5A50A ÖEEEE..Ñ ..Ñ...Ñ...Ñ...F•.V±.r.R 000120
 1698468D 0A76FF0C 76FF016A 006A14C4 83002108 449A5016 98468000 DE681E50 P.hB..F..P.D.I..á.j.j..v..v..F.. 000140
 5E1F0000 E9FF3086 88000001 709AFF78 86FF0000 FFFF9A00 6A006A01 04681E50 P.h..j.j.......Ñx..p.....0.Õ...^ 000160
 8305F70A 249A1276 FF1476FF 006A0FCA 68088E00 08881E56 57000006 C8C8C95F  èùà...WV.|...Åhò.j..v..v..$.½.. 000180
 0E5EC400 0247C626 0E5EC400 F8E90000 880006E9 03750402 47F6260E 5EC408C4 Ã.á^.&-G..u.Õ..|..Õ«.á^.&6G..á^. 0001A0
 05145688 1246880E 76FF1076 FF286AFE 46FFFE46 89481247 2B260A5E C4078826 &..á^.&+G.H.F±.F±j(.v..v..F..V.. 0001C0
 0C76FF0E 76FF1076 FF505200 2A051456 88124688 0AC48306 4709C69A 50520002 ..RP.6.G..á..F..V..*.RP.v..v..v. 0001E0
```

Dump of file SATURN:[PCCOMMON.DUMP.DLL]DML.TMP;1 on 18-APR-1990 10:44:35.23
File ID (622,20,0)   End of file block 171 / Allocated 172

Virtual block number 108 (0000006C), 512 (0200) bytes

```
000247C6 260E5EC4 02078326 125EC407 8926125E C40CC483 03EC06C5 9A0A76FF .v..é.$..6.6^.&..6^.&...6^.&6G.. 000000
74000030 0CC48306 A704AA9A 1276FF14 76FF37FF 26125EC4 016A0676 FF0876FF .v..v.j.6^.&.7.v..v..`.I..6.=..t 000020
260E5EC4 004EE9C3 74164739 260A5EC4 0788260E 5EC40066 E9849088 0006E903 .Ö..|..Öf.6^.&..6^.&9G.t.ÖN.6^.& 000040
FF0031E9 84928800 06E90375 00003000 0003CA9A 5016FA46 8D2A77FF 262C77FF .w,&.w*.F*.P.ò...=..u.Ö..|..Ö1.. 000060
74000030 0CC48304 5D04AA9A FA76FFFC 76FF2877 FF260E5E C4016A06 76FF0876 v..v.j.6^.&.w(.v•.v*.`.I..6.=..t 000080
8E059888 1E565700 0006C8C8 C95F5E1F 0000E900 00880006 E9849088 0006E903 .Ö..|..Ö..|..Ö...^_èüà...WV.|... 0000A0
FF0003E9 0001FA46 C7FC4689 48124728 26065EC4 0788260A 5EC4002B FE46C7D8 ÄúF±(.6^.&..6^.&•G.H.F•úF*..Ö... 0000C0
68C38826 FA5E6801 '5E90373 08403926 FA468806 74C42606 76C42DFC 5E68FA46 F*k^•-6v.&6t..F*&9a.s.Ö%.k^*&.ûk 0000E0
C38826FA 5E680086 E9037401 04788326 D8880470 C4260674 C4260676 C42DFC5E ^•-6v.&6t.&6p..Ä&.x..t.Ö..k^*&.û 000100
067EC42D FC5E6826 FA766802 70FF2608 880470C4 260674C4 260676C4 2DFC5E68 k^•-6v.&6t.&6p..Ä&.p.kv*&k^•-6-. 000120
C4830813 09C69A0E 76FF1076 FF50520C 56880A46 03008826 0459C426 067DC426 &6).&6Y.&...F..V.RP.v..v..6....6 000140
680E4601 02408826 D8880470 C4260674 C4260676 C42DFC5E 68C38826 FA5E680A .k^*&.ûk^•-6v.&6t.&6p..Ä&.a..F.k 000160
014BE9FE 46010240 88260888 0470C426 0674C426 0676C42D FC5E68C3 8826FA5E ^*&.ûk^•-6v.&6t.&6p..Ä&.a..F±ÖK. 000180
86E90374 05047883 26088804 70C42606 74C42606 76C42DFC 5E68C388 26FA5E68 k^*&.ûk^•-6v.&6t.&6p..Ä&.x..t.Ö. 0001A0
26FA7668 0270FF26 08880470 C4260674 C4260676 C42DFC5E 68C38826 FA5E6800 .k^*&.ûk^•-6v.&6t.&6p..Ä&.p.kv*& 0001C0
0E76FF10 76FF5052 0C56880A 46030088 260459C4 26067DC4 26067EC4 2DFC5E68 k^•-6-.&6).&6Y.&...F..V.RP.v..v. 0001E0
```

Dump of file SATURN:[PCCOMMON.DUMP.DLL]DML.TMP;1 on 18-APR-1990 10:44:35.23
File ID (622,20,0)   End of file block 171 / Allocated 172

Virtual block number 109 (0000006D), 512 (0200) bytes

```
26088804 70C42606 74C42606 76C42DFC 5E68C388 26FA5E68 0AC48305 AD09C69A .6.Ù..6.k^*&.ûk^•-6v.&6t.&6p..Ä& 000000
40882608 880470C4 260674C4 260676C4 2DFC5E68 C38826FA 5E680E46 01024088 .a..F.k^*&.ûk^•-6v.&6t.&6p..Ä&.a 000020
83260888 0470C426 0674C426 0676C42D FC5E68C3 8826FA5E 6800A4E9 FE460102 ..F±ÖÊ.k^*&.ûk^•-6v.&6t.&6p..Ä&. 000040
26088804 70C42606 74C42606 76C42DFC 5E68C388 26FA5E68 0083E903 74040478 x..t.Ö..k^*&.ûk^•-6v.&6t.&6p..Ä& 000060
520C5688 0A460300 88260459 C426067D C426067E C42DFC5E 6826FA76 680270FF .p.kv*&k^•-6-.&6).&6Y.&...F..V.R 000080
0674C426 0676C42D FC5E68C3 8826FA5E 680AC483 FFFF2307 9A0E76FF 1076FF50 P.v..v..#...6.k^*&.ûk^•-6v.&6t. 0000A0
C4260674 C4260676 C42DFC5E 68C38826 FA5E680E 46010240 88260888 0470C426 &6p..Ä&.a..F.k^*&.ûk^•-6v.&6t.&6 0000C0
1E565700 0006C8C8 C95F5E1F 0000E9FE 4688FDF1 E9FE4601 02408826 D8880470 p..Ä&.a..F±Öp».F±Ö...^_èüà...WV. 0000E0
5EC40788 260E5EC4 0005E900 00880006 E9037504 0247F626 0E5EC4D8 8E06CD88 |ë..Ä6^.&-G..u.Ö..|..ÖT.6^.&..6^ 000100
880674C4 260A76C4 2DFE5E68 FC46FF00 03E90001 FC46C7FE 46894812 4728260A .&•G.H.F±úF•..Ö...F•k^±-6v.&6t.. 000120
74C4260A 76C42DFE 5E68C388 26FC5E68 0000FA46 C7009CE9 03730840 3926FC46 F=&9a.s.Ö..úF*..k^•&.ûk^±-6v.&6t 000140
0A76FF0C 76FF0E76 FF1076FF FC76FF00 23E90374 03047883 26088804 70C42606 .&6p..Ä&.x..t.Ö#..v•.v..v..v..v. 000160
76C42DFE 5E68C388 26FC5E68 0041E9FA 46890EC4 8309D00A 029A0676 FF0876FF .v..v....Í..6..F*ÖA.k^•&.ûk^±-6v 000180
76FF0E76 FF1076FF FC76FF00 20E90374 02047883 26088804 70C42606 74C4260A .&6t.&6p..Ä&.x..t.Ö ..v•.v..v..v 0001A0
46880006 E9037500 FA7E83FA 46890EC4 8306160A C29A0676 FF0876FF 0A76FF0C ..v..v..v..ò....6..F*.-*.u.Ö...F 0001C0
5EC4D88E 0911881E 56570000 0AC8C8C9 5F5E1F00 00E90000 88FF4AE9 0009E9FA *Ö..ÖJ.|..Ö...^_èüà...WV.|...Ä6^ 0001E0
```

Dump of file SATURN:[PCCOMMON.DUMP.DLL]DML.TMP;1 on 18-APR-1990 10:44:35.23
File ID (622,20,0)   End of file block 171 / Allocated 172

Virtual block number 110 (0000006E), 512 (0200) bytes

```
C426067D C4260A7E C42DFA5E 68261276 68FA4689 48124728 260A5EC4 0788260E .&..6^.&•G.H.F*kv.&k^*-6-.&6).&6 000000
0006E903 74F8460B F64688F8 5689F646 8902508B 26008826 0E76C418 88260459 Y.&..6v.&..&.P..F-.V%.F-.F%t.Ö.. 000020
5EC40049 E9037400 00300000 0670950 16FC4680 F676FFF8 76FF0067 E9000088 |..Ög..v%.v-.F•.P.)...=..t.ÖI.6^ 000040
26FC5EC4 0777FF26 0977FF26 FC5EC400 3CE90000 880006E9 03750402 47F626FC •&-G..u.Ö..|..Ö<.6^•&.w.&.w.6^•& 000060
9908E99A 0676FF08 76FF37FF 260E5EC4 0777FF26 0977FF26 0E5EC412 76FF37FF .7.v.6^.&.w.&.w.6^.&.7.v..v..Ö.. 000080
5EC4D88E 0A0A881E 56570000 10C8C8C9 5F5E1F00 00E98492 880006E9 12C48309 ..6.Ö..|..Ö...^_èüà...WV.|...Ä6^ 0000A0
C426067D C4260A7E C42DFA5E 68261276 68FA4689 48124728 260A5EC4 0788260E .&..6^.&•G.H.F*kv.&k^*-6-.&6).&6 0000C0
E9000088 0006E903 74F8460B F64688F8 5689F646 8910568B 0E460300 88260459 Y.&...F..V..F-.V%.F-.F%t.Ö..|..Ö 0000E0
4688F456 89F24689 000?03A3 9AF676FF F876FF00 0003939A F676FFF8 76FF0002 ●..v%.v-......v%.v-.Ê....F·.V¶.F 000100
06E90375 00003000 000A629A 5016FC46 8DF276FF F476FF00 A5E90375 F4460BF2 ·.F¶u.ÖE..v¶.v·.F•.P.b...•..u.Ö. 000120
FF260977 FF26FC5E C40044E9 0003E903 75040247 F626FC5E C4008DE9 849? ?00 .|..Ö..6^•&-G..u.Ö..ÖD.6^•&.w.&. 000140
FF0876FF 37FF260E 5EC40777 FF260977 FF260E5E C41276FF 37FF26FC 5EC4? 77 w.6^•&.7.v.6^.&.w.&.w.6^.&.7.v.. 000160
76FFF876 FF0039E9 F0468800 06E90375 000030F0 468912C4 830AAF08 E99A0676 v..Ö.£..6..Fb=..u.Ö...FbÖ9..v%.v 000180
E9F45689 F2468900 0008249A F676FFF8 76FF0014 E9037500 00300000 04149AF6 -.....=..u.Ö...v%.v-.$.. .F·.V¶Ö 0001A0
1E565700 000EC8C8 C95F5E1F 0000E900 0088FF50 E9F24689 F4468900 00880009 ..|...F¶.F·ÖP.|..Ö...^_èü ..WV. 0001C0
12468BF8 46891046 88F65689 F446890E 56880C46 88F24689 0A468808 8E0ACA88 |ò..Ä.F..F·.F..V..F¶.V-.F..F%.F. 0001E0
```

```
Dump of file SATURN:[PCCOMMON.DUMP.DLL]DML.TMP;1 on 18-APR-1990 10:44:35.23
File ID (622,20,0)   End of file block 171 / Allocated 172

Virtual block number 111 (0000006F), 512 (0200) bytes

 AA9A5016 F2468D0E 6A016A06 76FF0876 FFFE5689 FC468916 56881446 88FA4689 .F'.F..V..F•.V±.v..v.j.j..F .P.` 000000
 C8C8C95F 5E1F000C E90000B8 0006E984 90B80006 E9037400 00300CC4 83076C04 .l..á.=..t.Õ..¡..Õ..¡..Õ...^_èùà 000020
 0A76FF0C 76FF686A 016A0676 FF0876FF FFFFD646 C7D88E08 F1881E56 5700002E ...WV.¡þ..ÄûF•...v..v.j.jk.v¯.v. 000040
 52004805 0C56880A 468801AC E98490B8 0006E903 7400003D 0CC4830C E304AA9A .`.D..á.=..t.Õ..¡..Õ¯..F..V..K.R 000060
 08D84688 0A5689D8 46890000 00319A50 52004805 0C56880A 46880000 008C9A50 P......F..V..K.RP.1....FÄ.VÖ.FÄ. 000080
 880006E9 03750000 3D000008 459A5016 D24680D8 76FFDA76 FF0093E9 0375DA46 FÖu.Õ...vÖ.vÄ.F•.P.E...•..u.Õ..¡ 0000A0
 016A0676 FF0876FF 08C4830C FA07A29A 5016DE46 80D276FF D476FF01 5DE98492 ..Õl..vå.v•.F•.P.Å.'..á..v..v.j. 0000C0
 0A468801 25E98490 880006E9 03740000 3D0CC483 005604AA 9A50160E 4680216A jl.F•.P.`.V..á.=..t.Õ..¡..Õ%..F. 0000E0
 50520048 050C5688 0A468800 19E90375 00003D00 0000D09A 50520048 050C5688 .V..K.RP.1...=..u.Õ...F..V..K.RP 000100
 4680006A 216AFF62 E9D84689 DA468900 00880009 E9DA5689 D8468900 00009C9A ......FÄ.VÖÕ..¡...FÖ.FÄÕb.j!j..F 000120
 8300BE04 AA9A5016 DE468D21 6A016A06 76FF0876 FF08C483 0060DA24 9A50160E •.P.$.m..á..v..v.j.j!.F•.P.`./.. 000140
 00000819 9A505200 58050C56 880A4688 0082E984 90880006 E9037400 00300CC4 á.=..t.Õ..¡..Õý..F..V..[.RP..... 000160
 FF0876FF 0058E903 75000C7E 830C4689 000000F5 9A505200 58050C56 880A4688 .F..V..[.RP.¥....FÉ.-É.u.Õ(..v.. 000180
 61E98490 880006E9 03740000 3D0CC483 0E1904AA 9A50160C 4680026A 016A0676 v.j.j..FÉ.P.`....á.=..t.Õ..¡..Õa 0001A0
 050C5688 0A468800 16E90375 00003000 0008829A 50520058 050C5688 0A468800 ..F..V..[.RP.ý...=..u.Õ...F..V.. 0001C0
 6A026A06 76FF0876 FFFF9CE9 00000C46 C70005E9 DC468900 0008C59A 5052005B [.RP.é....FÉÕ..ûFÉ..Õ...v..v.j.j 0001E0

Dump of file SATURN:[PCCOMMON.DUMP.DLL]DML.TMP;1 on 18-APR-1990 10:44:35.23
File ID (622,20,0)   End of file block 171 / Allocated 172

Virtual block numbe  112 (00000070), 512 (0200) bytes

 E90000B8 0006E984 90B80006 E9037400 00300CC4 830C3104 AA9A5016 D6468001 ..F•.P.`.1..á.=..t.Õ..¡..Õ..¡..Õ 000000
 0002057A 01030071 00030CC3 02030004 00060CA2 0203000F 90C8C95F 5E1F0000 ...^_èù.....Å...å...û...q...z... 000020
 00000895 00020014 00030130 02030000 0008088A 00020098 00010504 01030088 ............□.......*........... 000040
 00100C73 00020022 00030583 02030000 000E011C 0002002E 00010487 01030000 .......................".....s... 000060
 00060019 020300B8 00060C92 02030031 0003015F 02030000 00120C57 00020000 ....W......._...1.......£....... 000080
 26065EC4 088EFFFF 881E5657 000090C8 00000000 00000000 00000000 000000C2 ô...............à...WV.¡...Äá^.& 0000A0
 00001247 C726065E C408C483 003F07A2 9A5016F0 4680011A 681E00F1 E91C4788 .G.Õþ..h...Fþ.P.Å.?..á.á^.&ûG... 0000C0
 00E4E903 E81247C7 26065EC4 08C48300 5C07A29A 5016F046 80012068 1E0101E9 Õ...h ..Fþ.P.Å.\..á.á^.&ûG.Ò.ÕÕ. 0000E0
 20681E00 C7E907D0 1247C726 065EC408 C4830079 07A29A50 16F0468D 0127681E .h'..Fþ.P.Å.y..á.á^.&ûG.Å.Õû..h- 000100
 46800134 681E00AA E9232812 47C72606 5EC408C4 83009607 A29A5016 F0468001 ..Fþ.P.Å....á.á^.&ûG.(#Õ`..h4..F 000120
 5016F046 80013868 1E0080E9 238C1247 C726065E C408C483 008307A2 9A5016F0 Þ.P.Å.*..á.á^.&ûG..#Õ...h,..Fþ.P 000140
 07A29A50 16F0468D 0142681E 0070E924 541247C7 26065EC4 08C48300 D007A29A .Å.Å..á.á^.&ûG.1$Õp..hB..Fþ.P.Å. 000160
 83FFFF07 A29A5016 F0468001 49681E00 53E923F0 1247C726 065EC408 C48300ED Û..á.á^.&ûG.Þ#ÕS..hI..Fþ.P.Å.... 000180
 E9037600 0C3D0001 2D002DE9 0082E984 A2880036 E924B812 47C72606 5EC408C4 á.á^.&ûG.¡$Õ6.¡Å.Õý.Õ-.-..=..v.Õ 0001A0
 00A7008A 006D00FE 0F^E00FE 00FE00FE 00500033 0016011A A7FF2E93 C003FFEC §..á...Ì....3.P.±.±.±.±.±.m...Ì. 0001C0
 FA468900 00FFFF9A 0A76FF0C 76FF5016 F0468000 80685016 FF70868D 00E100C4 á.Å...p..Ph...Fþ.P.v..v.......F' 0001E0

Dump of file SATURN:[PCCOMMON.DUMP.DLL]DML.TMP;1 on 18-APR-1990 10:44:35.23
File ID (622,20,0)   End of file block 171 / Allocated 172

Virtual block number 113 (00000071), 512 (0200) bytes

 FF9A5016 FC468001 50681E37 FF260A5E C40057E9 84A98800 06E90375 00FA7E83 .~'.u.Õ..¡`.ÕW.á^.&.7.hP..F•.P.. 000000
 88064688 50520006 05085688 06468800 35E984A9 880006E9 03750000 3D0000FF ...=..u.Õ..¡`.Õ5..F..V....RP.F.. 000020
 FC5EFF50 52001805 08568806 46885052 00160508 56880646 88505200 14050856 V....RP.F..V....RP.F..V....RP.^= 000040
 00020020 0001016F 0103002C 00010149 01030004 90C8C95F 5E1F0000 E90000B8 ¡..Õ...^_èù.....I...,...o...-... 000060
 260A5EC4 D88EFFFF 881E5657 000000C8 00000000 00120008 00020000 00100022 ".................à...WV.¡...Äá^.& 000080
 5EC42618 76680240 89261646 881A5EC4 2618766B 0089261A 76C42618 5E68078B ..k^.&áv.&..kv.&á^..F.&.ə.kv.&á^ 0000A0
 0E4688 1A 5EC42618 7668 0E40 88261246 8A1A5EC4 26187668 04408926 1446881A ..F.&.ə.kv.&á^..F.&.ə.kv.&á^..F. 0000C0
 50520013 051C5688 1A460326 18466806 76FF0876 FF115089 260F4089 26105688 .V.&.ə.&.P..v..v.kF.&.F..V....RP 0000E0
 00C80018 CAC95F5E 1F0000E9 00008807 01261646 880A5EC4 08C483FF FF07A29A .Å....á.á^..F.&..¡..Õ...^_èò..à. 000100
 D3408926 08568806 46880E5E C42DF068 0A462B0C 46880B8E 0008881E 56570000 ..WV.¡...Å.F.+F.kþ-á^..F.¯V.&.ə& 000120
 00960002 00000010 00730002 00029000 0CCAC95F 5E1F0000 E90000B8 D5508926 &.P(¡..Õ...^_èò.......s......... 000140
 00000000 00000000 00000000 00000000 00000000 00000000 00000000 00000012 ................................ 000160
 1E015668 1E05BAA3 E0865800 00FFFF9A 5016C488 5008BEFF FFB8601E 06EC8855 U.&..'¡...ÄP.á.P.....X.ÅÉo..hV.. 000180
 AC9A50CB 50E58800 0188071F 61FFFF15 D29A14A4 E80024E8 0000FFFF 9A015468 hT......Õ$.ÕÉ..•...a..¡...Ì]ûP.¯ 0001A0
 003D8026 7FFFB901 56068EFF 330000BB 1E015C16 FF00FF68 00510100 9A004100 .A....Q.h....\..£..3...V.¿..&.*. 0001C0
 1E061CEB E774AEF2 C0330874 CA88A6F3 C8880188 05608E31 74003080 26470175 u.G&.*.t1/'..Ì.ûµÌ.òt.3á UtÕ§... 0001E0
```

```
Dump of file SATURN:[PCCOMMON.DUMP.DLL]DML.TMP;1 on 18-APR-1990 10:44:35.23
File ID (622,20,0)   End of file block 171 / Allocated 172

Virtual block number 114 (00000072), 512 (0200) bytes

 88EC8B55 C31FEDEB AAC20A05 72412CAC 9204E0C0 0E72412C AC05C18F 1FF78807 ..%.eè.¯,Ar.åÅ..¯,Ar..ô`ŠÜ.ûU.š¡ 000000
 CB5DE588 00B60100 9A5000FF B8056E1E FF047400 05703E83 00560100 9A5000FC •.P...V..>p..t...n.¡..P...Ñ..|]ù 000020
 FFB9C033 970C7496 401074C2 3BAD1E92 8E065688 C08ED88E 00178857 56EC8B55 U.‹ìVW¡...A.à.V./..Ù;ôt.ə.t..3à¿. 000040
 1F74C008 00CA00CJ 9A0676FF 57EC8B55 0002CA5D E58B5E5F 96E8EBF7 8BAEF2FF .·Û.%Š$._^.[]ò..U.‹ìW.v..Ä.ò..ät. 000060
 5F5B0000 FFFF9A50 1651521E 53000288 C4885049 D1F7AEF2 FFFF89C0 33FA8892 ..*3à¿..¯Ü%IIP.ÄÈ..S.RQ.P.....[_ 000080
 400A47F6 260087E9 0375830A 47F62606 5EC4FFFF 8E560000 12C80002 CA5DE588 .[]ò..à...V/..á^.&-G..u.Õñ.&-G.ã 0000A0
 060B68F9 F7000C89 99090420 06468BF0 8804C483 01801AA0 9A530600 ADE90374 t.ÕÙ..S......á..Þ.F.-å..¿..%*kÁ. 0000C0
 9A50E42A 08478A26 065EC404 C4830192 19489A06 76FF0876 FFFA4689 15CC8788 ..ä..F*.v..v..H....á.á^.&.G.*ôP. 0000E0
 8301D107 A29A5016 F0468D05 72681E61 7400FA7E 83647CC0 0802C483 01AD2600 .&Ü..á..å|d.~*.ta.hr..FÞ.P.Å.I.. 000100
 5C9A5016 F0468D05 74681E13 745CFE7F 8026FC5E C4FE568C FC4689F2 468D08C4 á..F·.F•.Vtá^•&..t\t..ht..FÞ.P.\ 000120
 468D08C4 8301F627 8E9AFA76 FFFC76FF FE76FF0A 6AFC4EFF 03E808C4 8301E907 .Õ..á.Š..N•j..vt.v•.v*..'-..á..F 000140
 90C8C95E C688000A 47C62606 5EC4FFFF 8E0374C0 0804C483 010A2802 9A5016F0 Þ.P.@(...á..àt./..á^.&6G...ó^èù. 000160
 0876FF0A 76FF0C76 FF50FE76 FF187400 08FE5689 FC468902 3625AA9A 000004C8 à....`X6..F=.Vt.Åt..vtP.v..v..v. 000180
 006A0C76 FF006A56 000016C8 90C8C999 C0289004 E8DCC483 015A198E 9A0676FF .v....Z..á.Š..+à.èù.à...Vj..v.j. 0001A0
 0675000C 7E830674 000A7E83 FA5689F8 4689FE56 89FC4689 028928F0 9A0A76FF .v..Þ(...F•.Vt.F½.V*.-..t..-..u. 0001C0
 F7000CB9 9902CD27 AA9A5306 09D4681E 77750C0A 47F6260E 5EC40230 E9F84688 .F½Õ0.á^.&-G..uw.hå..S.`'ë..¿..% 0001E0

Dump of file SATURN:[PCCOMMON.DUMP.DLL]DML.TMP;1 on 18-APR-1990 10:44:35.23
File ID (622,20,0)   End of file block 171 / Allocated 172

Virtual block number 115 (00000073), 512 (0200) bytes

 73010783 26025788 26078826 2078044F FF260E5E C45C7501 15C887F6 060B68F9 *kÅ.-.à..u\á^.&.O.x &..&.'.&...s 000000
 83030A16 E09A0E76 FF1076FF 909010EB E42A078A 260888C2 8E02E802 47812606 .&.G.Ò..ó.Å&..*ôŠ....v..v..Å.... 000020
 83078826 C68803E5 08468105 73010646 83065EC4 01CAE9C0 2B057540 F08804C4 ó..Þàu.+àÒò.á^..F..s..F.|..ó&... 000040
 000C8999 037D27AA 9A530609 D4681E1E 75080A47 F6260E5E C400FA5E 8301F86E n½..^*.á^.&-G..u..hå..S.`')..¿.. 000060
 1056880E 4688013A E90375FA 4608F846 88000FE9 03750115 C887F606 D868F9F7 %*kÅ.-.à..u.ÕÒ..F½.F*u.Õ:..F..V. 000080
 46380577 0E72FA56 38022807 88267E74 003F8326 EE5EC4F0 5689EE46 89000405 ....FY.VÞá^Y&.?.t~&..+@;V*r.w.;F 0000A0
 77FF260E 5EC45000 00F646C7 F4468904 4788260E 5EC49090 09E8F846 880776F8 %v..F%Š...á^.&.G..F¶úF-..Pá^.&.w 0000C0
 F646130F 0126F44E 8BC02B0E 5EC40AC4 8303C909 C69A0676 FF0876FF 37FF2602 .&.7.v..v..ó.è..á.á^.+á.N¶&...F- 0000E0
 8BF4468B 084601E0 D3FFFFB9 F6461306 4E01F44E 8BC02B02 470126E0 D303A5B9 ¿È.ÆÅ&.G.+á.N¶.N..F-¿..ÆÅ.F..F¶. 000100
 F08B04C4 83045316 E09A0E76 FF1076FF 32E80729 26EE5EC4 FA5619F8 4629F656 V-)F½.V*á^Y&).Š2.v..v..Å.S..á..Þ 000120
 5E8301F8 6E830846 01043025 C0180106 46830788 26C68806 5EC4008E E9037540 àu.Õ..á^..ó&...F...àX=..F..n½..^ 000140
 89000A05 1056880E 46885E74 FA4608F8 46889OFF 3CE96A74 FA4608F8 468800FA *..F½.F*tjÕ<...F½.F*t^.F..V..... 000160
 26078826 0E5EC421 780FFF26 EA5EC4EC 5689EA46 89000405 0E4688F0 5689EE46 FY.VÞ.F.....Fõ.VšÁ^õ&..x|á^.&..& 000180
 0E76FF10 76FF0EE8 E42A078A 26088BC2 8E048002 47812606 73010783 26025788 .w.&...s.&.G....ó.Å&..*ôŠ..v..v. 0001A0
 28FE5688 FC46880A 76FF006A 100F8026 EE5EC421 7540F088 04C48304 7A16E09A .Å.z..á..Þàu|á^Y&...j..v..F•.Vt+ 0001C0
 01FFFF25 C0180106 46830788 26C68806 5EC428EB 02172924 9A5052FA 561BF846 F½.V*RP.$)..Š(á^..ó&...F...àX... 0001E0

Dump of file SATURN:[PCCOMMON.DUMP.DLL]DML.TMP;1 on 18-APR-1990 10:44:35.23
File ID (622,20,0)   End of file block 171 / Allocated 172

Virtual block number 116 (00000074), 512 (0200) bytes

 6A560000 1AC890C8 C95E90FF 7CE9C274 FA4608F8 468800FA 5E8301F8 6E830846 F..n½..^*..F½.F*tóÕ|..^èù.à...Vj 000000
 0674000A 7E83FA56 89F84689 FE5689FC 468904EF 28F09A0A 76FF006A 0C76FF00 ..v.j..v..Þ(ÿ..F•.Vt.F½.V*.-..t. 000020
 4127AA9A 53060904 681E7E75 0C0A47F6 260E5EC4 90027DE9 C0280675 000C7E83 .-..u.+àÕ)..á^.&-G..u~.hå..S.`'A 000040
 078A2606 5EC42678 044FFF26 0E5EC463 750115C8 87F60608 68F9F700 0CB99905 ..¿..%*kÅ.-.à..ucá^.&.O.x&á^.&.. 000060
 9017E807 88260988 C68E0557 02478126 06730107 83260277 88260F88 260E5EC4 á^.&..&.w.&...s.&.G.W..ó.1&..Š.. 000080
 8675200A 47F6260E 5EC406C4 83057717 029A5098 078A2606 5EC40E76 FF1076FF .v..v.á^.&...P.@.w..á.á^.&-G. u. 0000A0
 681E1E75 080A47F6 260E5EC4 00FA5E83 01F86E83 08460106 6025C018 01064683 .F...àX'..F..n½..^*.á^.&-G..u..h 0000C0
 08F8468B 0122E903 750115C8 87F60608 68F9F700 0CB99905 FB27AA9A 530609D4 à..S.`'•..¿..%*kÅ.-.à..u.Õ"..F½. 0000E0
 89EA4689 0004050E 4688F056 89EE4689 000A0510 56880E46 880186E9 0375FA46 F*u.Õ...F..V.....FY.VÞ.F.....Fõ. 000100
 F8463805 77007 2FA 56380228 07882670 74003F83 26E65EC4 E85689E6 4689EC56 V&.F|.VÕá^|&.?.t)&..+@;V*r.w.;F½ 000120
 5EC40676 FF0876FF 500000F6 46C7F446 89044788 260E5EC4 9008E8F8 46880676 v..F%Š..á^.&.G..F¶úF-..P.v..v.á^ 000140
 2389F646 130F0126 F44E8BC0 2B0E5EC4 0AC48306 7D09C69A 37FF2602 77FF260E .&.w.&.7.ó.)..á.á^.+á.N¶&...F-¿# 000160
 F65688F4 46880846 01E00303 9189F646 13064E01 F44E8BC0 2B024701 26E00306 .ÆÅ&.G.+à.N¶.N..F-¿..ÆÅ.F..F¶.V- 000180
 260E5EC4 078A2606 5EC42678 0FFF26EA 5EC464EB 072926E6 5EC4FA56 19F84629 )F½.V*á^|&).Šdá^õ&..x&á^.&..á^.& 0001A0
 FF1076FF 9017E807 88260988 C68E0695 02478126 06730107 83260277 88260F88 ..&.w.&...s.&.G....ó.1&..Š...v.. 0001C0
 4683008F E9037420 07F626EE 5EC406C4 83070F17 D29A5098 078A2606 5EC40E76 v.á^.&...P.@....á.á^Y&~. t.Õ...F 0001E0
```

```
Dump of file SATURN:[PCCOMMON.DUMP.DLL]DML.TMP;1 on 18-APR-1990 10:44:35.23
File ID (622,20,0)   End of file block 171 / Allocated 172

Virtual block number 117 (00000075), 512 (0200) bytes

468890FF 08E97374 FA4608F8 468800FA 5E8301F8 6E830846 0106F325 C0180106 ...åX..F..n%..^..F%.F*tsÕ....F 000000
5689EA46 89000405 0E4688E8 5689E646 89000A05 1056880E 46886774 FA4608F8 %.F*tg.F..V.....F|.VÒ.F.....Fõ.V 000020
26067301 07832602 7788260F 88260E5E C4078A26 065EC425 780FFF26 EA5EC4EC ...&..x...&..&.W.&...s.& 000040
3317D29A 5098078A 26065EC4 0E76FF10 76FF16E8 07882609 88C68E07 3F024781 .G.7..6.1&..S..v..v..&...P.@.3 000060
5052FA56 18F84628 FE5688FC 46880A76 FF006A18 742007F6 26E65EC4 06C48307 ..6.6^l&-. t.j..v..F=.V±+F%.V*RP 000080
08F84688 00FA5E83 01F86E83 08460102 8525C018 01064683 9021E802 5629249A .$)V.$l..F...åXç..F..n%..^*..F%. 0000A0
7580AEF2 FFFF89C0 33067EC4 1EDE88D7 88EC8855 90C8C95E 90FF7AE9 C974FA46 F*tèÖz..^èù.U.$.m.8.á-.3à¿.. Ú.u 0000C0
A4027400 01C6F706 4688FE87 08468ED8 8EC08CF9 2801F7AE F2FFFF89 0A7EC4FF .á-.¿.. Ú%l+*.å.Ä.F...F.%ó..t.Ê 0000E0
8CFE880A 76C51E0E 880788EC 8855C85D C28C1FFA 88F388A4 F3C913A5 F3E9D149 [lÕµÊ.èµÊ.µ.*..ó]ùU.$.m.8.év..±. 000100
8A4F3C9 13A5F3E9 D149A402 7401A8C7 88067EC4 D1F7AEF2 FFFF89C0 33C08ED8 Å.à3à¿.. Ú%lá-..ú´.t.Êl|ÕµÊ.èµÊ. 000120
2801F7AE F2FFFF89 C0330A7E C40676C5 1EDE88D7 88EC8855 C85DC28C 1FFA88F3 µ.*..ó]ùU.$.m.8.év.á-.3à¿.. Ú%l+ 000140
F2FFFF89 C033067E C40788EC 885500C8 5DFA88F3 881FFFFF 1DC01805 74A6F3F9 *µ|t..à.....µ.*]ù.U.$.má-.3à¿.. 000160
C00AAC0C E30E4E88 DF880A76 C5067EC4 1E5657EC 885500C8 5DFA8891 49D1F7AE Ú%l|..*]ù.U.$WV.á-.év..Ô.N.D.¯.à 000180
F84689EC 468D5657 000016C8 C850E588 5F5E1FC2 8CC388AA F3C032F8 E2AA0374 t.¨ä%2äµ¨.ù.ô.^ .|]ùà...WV.F$.F% 0001A0
89260647 89260856 88064688 420A47C6 26F85EC4 FE568CFC 46890E46 80FA568C .V*.F..F•.V±ó^Y&óG.B.F..V.&.G.&. 0001C0
08891826 9A53060A 76FF0C76 FFFC76FF 167FFF04 47C72602 57892607 89260857 W.&..&.W.&úG.....v•.v..v..S.&.¿. 0001E0

Dump of file SATURN:[PCCOMMON.DUMP.DLL]DML.TMP;1 on 18-APR-1990 10:44:35.23
File ID (622,20,0)   End of file block 171 / Allocated 172

Virtual block number 118 (00000076), 512 (0200) bytes

900FE805 88260247 8E2607FF 263F8826 C02A1278 044FFF26 F85EC4F0 880CC483 .á..Þá^Y&.O.x.*à&.?&..&.G.&..Š.. 000000
46280856 88064688 000004C8 C8C95F5E C68806C4 83048C17 D29A006A 53FA76FF .v*Sj..@.¥..á..ó^_èùà....F..V.+F 000020
88088E11 239AC28E 08F38A05 AE8808ED 0FE89AFC 5E80FC46 89FE5689 0C56180A ..V..V±.F•.^•.Š.Ú¯ÊÙ.¤µ..ô.#...¡ 000040
468A50F6 468A0084 0000FFFF 9A5016F4 468D0CEC 83EC8855 90C8C900 D68A05AE Û.¤•.èù.U.$.$..F¶.P.....Ç..f-P.F 000060
087E830C C48308E0 27C89A50 078C2DFA 468850F9 468A50F8 468A50F4 468A50F5 %P.F¶P.F%P.F*P.F•-¥.P.à'Ä..á..-. 000080
C00A078A D388065E C5098CEC 885500C8 5DE58807 89260257 8926065E C40A7400 .t.á^.&.W.&...|]ù.U.$.1é^..&...à 0000A0
88C033EC 8855C85D D98EDA8C 92EF75C0 0A078A43 07884104 04731A3C 612C1174 t.,ª<.s..A..C...åuy..Ö.1]ùU.$3à. 0000C0
D2F7D688 C203C323 D818C228 D2F7D788 48C1880A 7EC40676 C556571E 4FE30E4E N.DO.WVév.á-..èH.ª%@+ô.Ú#ù.ô.ª%@ 0000E0
FF08D88E 05240508 8C0775F6 081DE391 1875A6F3 C1289140 C203C323 D818C228 +ô.Ú#ù.ô@.+èµ|u..D..-u..Ä.$..Ä.. 000100
571E4EE3 0E4E88EC 885500C8 5D1F5F5E FFFF1DC0 18C2E8C0 8E09AA05 C08CC875 uù.â.¯..âŠô.â...^ .]ù.U.$.N.DN.W 000120
C323D818 C228D2F7 D688C203 C323D818 C228D2F7 D788B8C1 88067EC4 0A76C556 Vèv.á-..èH.ª%@+ô.Ú#ù.ô.ª%@+ô.Ú#ù 000140
C775FF08 D88E0985 05D88C07 75F60818 E391A4F3 C913A5F3 E9D1C128 9140C203 .ô@.+è|ÕµÊ.èµÊ.D..-u..Ä.ç..Ä..uú 000160
067EC457 38E30C4E 88EC8855 C85D0856 88064688 1F5F5E8E E8C08E0A 0805C08C .á....áS/^ ..F..V.]ùU.$.N.DBWá-. 000180
87AAF3C9 13A8F3E9 D1E08A0A 46880128 D187D103 D323D818 D1280C74 DAF7D788 .ª%Öt.+1.Ú#Æ.1.1+1.F..ÁlÕµ¨.èµ¨. 0001A0
00001CC8 C8500856 88064688 5FAAF3C9 13A8F3E9 D1C38E0A 13C381C3 8C10E3D1 lD..ú.ú...úlÕµ¨.èµ¨_.F..V.]ùà... 0001C0
9A505202 18000120 D2280E46 881076FF 006AF456 89F24689 0C56880A 46885657 WV.F..V..F¨.V¶j..v.¯F.+@-...@RP. 0001E0

Dump of file SATURN:[PCCOMMON.DUMP.DLL]DML.TMP;1 on 18-APR-1990 10:44:35.23
File ID (622,20,0)   End of file block 171 / Allocated 172

Virtual block number 119 (00000077), 512 (0200) bytes

012EE903 76F45639 FE5689FC 46890C56 03E2D308 16890002 830A4603 080028F0 Þ(...F..@.¿..Æã.V..F•.V±9V¶v.Ô.. 000000
890AF700 D283D8F7 EE568800 00EE46C7 EC468910 46880124 E90376F2 46390872 r.9F v.Ô$..F..F$úFY...VY%Ä.@.%Ö. 000020
75F608F0 88E801C7 88F67688 0E7E88E6 5689E446 89EE5688 EC4688EA 5689E846 FÒ.Võ.F$.VY.Fõ.V|.-..v-.úlÒ.Þ.-u 000040
03092828 F09A5000 6AFF4480 03E8C688 047401A8 C788E476 FFE676FF 008AE903 .Õ¤..v|.vô.ú´.t..óS..D.j.P.Þ((.. 000060
C483125E FF0676FF 0876FF50 52FA5689 F84689F4 5603E2D3 08588900 D283F246 F´.@.¿[.Æã.V¶.F%.V*RP.v..v..^..á 000080
46882C7D 00F07E8? 90009AE9 F676890E 7E89FA56 88F84688 1075C008 F0468908 ..FÞ.äu..F%.V*.-..v-Õ....-Þ.),.F 0000A0
C6880474 01A8C78 FE5689FC 4689FA56 03E2D308 87890002 83F84603 EA5688E8 Ò.Võ.F%.@.¿..Æã.V*.F=.V±.ú´.t..ó 0000C0
4689FA56 03E2D306 0F890002 83F84603 EE5688EC 4688901D E8F888FF 448D03E8 Š..D..%$...F$.VY.F%.@.¿..Æã.V*.F 0000E0
FF08FF39 E92D77F2 4639FF41 E9037337 77F45639 FE5688FC 4688FE88 F45689F2 ´.V¶.±.F=.V±9V¶u7s.ÕA.9F w-Ö9... 000100
4688FF70 E999C028 0674C008 08C48312 5EFF0676 FF0876FF F276FFF4 76FF2674 t&.v¶.v´.v..v..^..á..àt.+ã.Õp..F 000120
873E689A 001088EC 885590C8 C95F5E99 C028F676 890E7E89 90FF67E9 F45688F2 ´.V¶õg...-..v-+á.^_èù.U.$¡...h>ñ 000140
5603E2D3 0C788902 13064603 D2280C46 88FA5689 F8468908 56880646 8856570C .WV.F..V..F%.V*.F.+@.F..@¿x.Æã.V 000160
5874C008 F44EFF5F 74000A7E 830000F6 46C7F446 89480A46 88FE5689 FC468908 ..F=.V±.F.H.F¶úF-...-..t_.N¶.átX 000180
0E5EFFF8 76FFFA76 FFFC76FF FE76FFF6 7688F47E 880000F2 46C7F046 890C4688 .F..FÞúF´...-¶.v-.v±.v•.v*.v%.^. 0001A0
4E88C028 FA5689F8 4689FE56 88FC4688 28E8F676 89F47E89 46097EC0 0808C483 .á..à~.F.-¶.v-Š(.F•.V±.F%.V*+à.N 0001C0
46883E74 00F67E83 89E8D274 C0084FC7 88FE4601 E0030CC0 89F24613 FC4E01F0 Þ.N•.F´¿à.ÆÁ.F±.úO.át@S¿.--.t>.F 0001E0
```

Dump of file SATURN:[PCCOMMON.DUMP.DLL]DML.TMP;1 on 18-APR-1990 10:44:35.23
File ID (622,20,0)   End of file block 171 / Allocated 172

Virtual block number 120 (00000078), 512 (0200) bytes

```
0A468805 7636FF00 6A0676FF 0876FF05 7A168905 78A31056 880E4688 0576A30C .Ev..F..V.Ex...z..v..v.j..6v..F. 000000
C8C95F5E 0004E850 52085603 E2030CE7 89000283 0646030C D928F09A 50006A48 Hj.P.P().F..@.¿O.Aã.V.RPO..^_èù 000020
46890656 03E2^300 30890213 04460302 280576A1 560E453E 689A0008 88EC8855 U.$|...h>E.VAv.+@.F..@¿O.Aã.V..F 000040
36FFF876 FFFA76FF FC76FFFE 76FF60E8 FE5689FC 46890A56 88084688 FA5689F8 %.V".F..V..F=.V±Sm.v±.v=.v".v%.6 000060
89000283 F846030A F7D21308 F7D22805 76A10876 FF0A76FF 9070E801 91E80576 v.O..Sp..v..v.Av.+@%A.@%O.F%.@.¿ 000080
4689FA56 03E20300 96890213 F8460302 280576A1 FF94E850 52FA5603 E2030047 G.Aã.V"RPO..Av.+@.F%.@¿..Aã.V".F 0000A0
88FA5689 F8468906 5603E203 02130446 03022805 76A1FE56 89FC4689 0A568908 ..V..F=.V±Av.+@.F..@Aã.V..F%.V". 0000C0
C8880828 D2280576 A10119E9 03720846 39087201 23E90376 0A563906 56880446 F..V.9V.v.O#.r.9F.r.O..Av.+@+U.à 0000E0
FF1773FC 46390572 1:77FE56 39065688 04468BFE 5E01E303 00D889DA 13FC4E01 .N=.O¿U.AD.^±.F..V.9V±H.r.9F=s.. 000100
F7D21308 F7D22805 76A1C17E C00808C4 8305781E FFFC76FF FE76FF08 . °F0A76 v..v..v±.v=..x..6..â~èAv.+@%A.@% 000120
3905771E 72FA5639 0A568808 4688FA5E 01E3030E 6C890A13 F84E01C8 88. ?28DA O+U.à.N%.O¿l.AD.^".F..V.9V"r.w.9 000140
5688FC46 88887DC0 0808C483 05781EFF F876FFFA 76FF0876 FF0A76FF 177¢°846 F%v..v..v..v".v%..x..6..â)E.F=.V 000160
FFF876FF FA76FF08 76FF0A76 FFFEDFE9 0376F846 390872FE E9E90376 FA5639FE ±9V"v.OO±r.9F%v.OO±.v..v..v".v%. 000180
FA76FF08 76FF0A76 FF0E5827 AA9A0476 FF0676FF F876FFFA 76FF0070 E8057636 6v.Op..v".v%.v..v..¨'X..v..v..v" 0001A0
E2030E90 890213F8 46030228 0576A1FE 87E9037D C6380EAF 27AA9AF0 88F876FF .v%.b.¨'E.;6).Oñ±Av.+@.F%.@¿..Aã 0001C0
89000283 F846030A F7D21308 F7D22805 76A1FE52 E80476FF 0676FF50 52FA5603 .V"RP.v..v.OR±Av.+@%A.@%O.F%.@.¿ 0001E0
```

Dump of file SATURN:[PCCOMMON.DUMP.DLL]DML.TMP;1 on 18-APR-1990 10:44:35.23
File ID (622,20,0)   End of file block 171 / Allocated 172

Virtual block number 121 (00000079), 512 (0200) bytes

```
923E689A 00028BEC 88559000 08C2C95E FE54E906 56890446 89FA5603 E2030A98 ..Aã.V".F..V.Ot±^èò...U.$|...h>. 000000
0A468307 88260A5E C4078A26 065EC4FE 4688078A 260A5EC4 9037E804 768B560A .V.v.S7.6^.&...F±6^.&..6^.&...F. 000020
C6880846 010A5725 C0180106 46830788 26FE468A 065EC40C 46010EE9 25C01801 ..6%O..F.6^..F±&...F...6%W..F..6 000040
5FA5F300 0A8907E6 8F057C8E C08ED88C 57569000 0AC2C95E 047689C3 75C0084E N.àuù.v.^èò...VW.A.à/|.¢l.¿..µE_ 000060
D98EA5A5 FCD88EC1 8ED98CC0 8CF8880C C38309CC 1E88F388 5756C08E D08CC85E ^ù.A.àVW.µ..ä..ù..«.à.).è.A=EE.T 000080
4E740988 F881F388 A5A5FCC1 8ED98CF8 880CC383 09CC1E88 F3885756 16E8F388 .µ$.VW.µ..ä..ù..«.).è=EE.µ.«|.tN 0000A0
8CF8880C C38309CC 1E88F388 5756C08E D08CC85E 5F03FE47 C6FC7789 09CC1E89 ..ä..w=6G±._^ù.A.àVW.µ..à..ù..«. 0000C0
8CF8880C C38309CC 1E88F388 575618E8 F388D98E A5A5A5A5 FCD88EC1 8ED98CC0 à.).è.A=EEEE.).µ$.VW.µ..ä..ù..«. 0000E0
F2E9C85E 5FFC7789 07FE47C6 09CC1E89 0E740988 F881F388 A5A5A5A5 FCC18ED9 ).è=EEEE.µ.«|.t...ä.6G±..w=_^ùO 000100
4588ADF8 880CC383 09CC1E88 F388FCD8 8EC18ED9 8CD88C57 5604E800 8C575619 .VW.A$.VW.A.).è.A=.µ..ä..ù..«U.E 000120
26C08ED0 8CC85E5F D98EFC5F 8909CC1E 89CF7409 88F881A5 A5027403 3CA5A5FE ±EE<.t.EE.«|.tü..ä.._=.)_^ù.A.à& 000140
0A885756 99078803 E8025788 07880AE8 99078826 C08ED08C 14E80257 88260788 ..&.W.$..A.à&...$....W.$....VW.O 000160
09CC3E89 1C740988 FF810CC7 8309CC3E 88000883 DAF7D8F7 07798024 C78A0088 .A.u$.y.%U4O.U..>ä..ù...|.t..>ä. 000180
5507FE45 C6FF63E9 C85E5F1F 13E89E84 03FE45C6 0F7500FF 80C18ED9 8CFC7089 .)=.).è...u.6E±.Ç.O.._^ùOc.6E±.U 0001A0
FE458AFC 758809CC 3E88C08E 088C5756 C85E5F50 2272E8F8 88D833C8 8887608D §'..ù3U.«Or"]_^ùVW.A.ã.>ä..u=.E± 0001C0
56C85E5F A5A50274 033CA5A5 FCFE4588 FC708909 CC3E8981 740988FF 810CC783 .ù...|.tY.>ä..)=.E±=EE<.t.EE_^ùV 0001E0
```

Dump of file SATURN:[PCCOMMON.DUMP.DLL]DML.TMP;1 on 18-APR-1990 10:44:35.23
File ID (622,20,0)   End of file block 171 / Allocated 172

Virtual block number 122 (0000007A), 512 (0200) bytes

```
FCC033C0 8ED88C03 FE45C6FC 7D8909CC 3E898C74 0988FF81 0CC78309 CC3E8857 W.>ä..ù...|.t..>ä..)=6E±..A.à3à= 000000
E8D08C11 E80C09CC 068309CC 1E88FCF8 885756C0 8ED88C02 E8D08CC8 5E5FABAB ¨¨_^ù.A$..A.àVW.«=..ä...ä..$..A$ 000020
5E5F0C09 CC2E83A5 A5FC7788 007503FE 7F8009CC 1E88FCF8 885756C0 8ED88C02 ..A.àVW.«=..ä...±.u..w=EE..ä.._^ 000040
FCF88857 56C08ED8 8C02E8D0 8CE4E85D DE885F19 35E857FC 77880808 268955C8 ùW.&...w=WO5._.8)$O.A$..A.àVW.«= 000060
07FE7F80 09CC1E88 FCF88857 56C08ED8 8C02E800 8C11E80C 09CC0683 09CC1E88 ..ä...ä..$..A$..A.àVW.«=..ä...±. 000080
02E8D08C E9E80F87 F7882C04 E8DF87C8 5E5F0C09 CC2E83A5 A5A5A5FC 77880F75 u..w=EEEE..ä.._^ù.OOà..%.OSO.A$. 0000A0
88F88857 56C08ED8 8C02E800 8C10E80C 09CC0683 09CC1E88 F8885756 C08ED88C .A.àVW.«..ä...ä..$..A$..A.àVW.«. 0000C0
28288A28 1E88C85E 5FA5A502 74033CA5 A5A8FC0C 09CC2E83 FE478AF3 8809CC1E .à..µ.G±..ä..= EE<.t.EE_^ù|.+¤(+ 0000E0
E819CCE8 36E81182 8A11AC88 05AC2688 9F08EF12 089A48E8 2851BA28 4C8850E8 $P|L+¤Q+$H...ÿ...&¯.|¯.¤ÿ.$60ä.$ 000100
F7000283 08F70773 589E05AC 268A5019 DEE89004 E81A19E8 900AE819 C8E89010 ..Où.$..O..$..Oà.P.&¯..Xs.%A.@.% 000120
8309CC36 88515308 08268955 5756118E 8A118888 05AC2688 9F119012 089AC30A Où.......&¯.||.¤/.VWU.&..SO.6ä.. 000140
09CC3E88 57C85E5F 5D5859D2 FF02E800 FF047508 7488030A 7C8009CC 36890CEE Y..6ä..|...t.u..A$..@Y{|_^ùW.>ä. 000160
8001F6F8 7480FF41 F6C85F08 75F0FF41 F6087403 F8801375 7F01F6FF 32FE5D8A .]±2.-..u..«.t.-A.Du._ù-A..t%-.. 000180
FE5D8A09 CC3E8857 56C85F7F 2180FF32 FE5D8A09 CC3E8857 C8F9C8E4 0803755F _u..ôu'ùW.>ä..]±2..!._ùVW.>ä..]± 0001A0
F480AD08 7503F880 A5FCC18E D98CFC70 89C85E5F 803180FF 320875F7 38FC7588 ¯u=;%u.2..1._^ù.)=.).è=E.«.u.U.¶ 0001C0
575604E8 2860E857 5602E8C0 8ED08C57 56C85E5F A880F480 ADA5A5C8 5E5FA880 .¨_^ùEEU.¶._^ùVW.A.à$.VWO'+$.VW 0001E0
```

```
Dump of file SATURN:[PCCOMMON.DUMP.DLL]DML.TMP;1 on 18-APR-1990 10:44:35.23
File ID (622,20,0)   End of file block 171 / Allocated 172

Virtual block number 123 (0000007B), 512 (0200) bytes

565EE800 048E^388 575604EB 2848E857 5602E8C0 8ED08C57 5676E800 0888F388 .µ|..$vVW.A.å$.VWÒH+$.VW.µ|..$^V 000000
5602E8C0 8ED08C57 5646E800 0C88F388 575604EB 2830E857 5602E8C0 8ED08C57 W.A.å$.VWÒ0+$.VW.µ|..$FVW.A.å$.V 000020
575604EB 2800E857 5602E8C0 8ED08C57 562EE800 1488F388 575604EB 2818E857 WÒ.+$.VW.µ|..$.VW.A.å$.VWÒ.+$.VW 000040
88D88800 0088F388 575604EB 2AE8E857 5602E8C0 8ED08C57 5616E800 1088F388 .µ|..$.VW.A.å$.VWÒÒ*$.VW.µ|...Ä. 000060
02C383C8 5E5F5D05 9097FF08 08268955 FC7D8710 7407FE7D 80C18E09 8C09CC3E >ä..].ê.)±.t..)=U.&......] ^ü.ü. 000080
88575604 E82A87E8 575602EB C08ED08C 57560FEB 09CC3E88 F7882AF3 E8084E8F «N.Òx*.X.>ä.$ÒVW.A.å$.VWÒñ*$.VW. 0000A0
57565EEB 000688F3 88575604 E82A9FE8 575602EB C08ED08C 575676EB 000AB8F3 µ|..$vVW.A.å$.VWÒ.*$.VW.µ|..$^VW 0000C0
575602EB C08ED08C 575646EB 000E88F3 88575604 E82A87E8 575602EB C08ED08C .A.å$.VWÒ.*$.VW.µ|..$FVW.A.å$.VW 0000E0
88575604 E82A57E8 575602EB C08ED08C 57562EEB 001688F3 88575604 E82A6FE8 Òo*$.VW.µ|..$.VW.A.å$.VWÒW*$.VW. 000100
3E88D888 000288F3 88575604 E82A3FE8 575602EB C08ED08C 575616EB 001288F3 µ|..$.VW.A.å$.VWÒ?*$.VW.µ|...Ä.> 000120
0C8B1CE8 00088821 E80004B8 FF39E95E 2A3AE856 057407FE 7D80C18E D98C09CC ä..].ê.)±.t.VÒ:*^Ò9.E..$IE..$.E. 000140
09CC3E88 57560018 8803E800 1C8808E8 00008800 E80014B8 12E80010 8817E800 .$.E..$.E..$.E..$.E..$.E..VW.>ä. 000160
087D88FC 7D89FC75 88C08ED8 8C09CC3E 890CEF83 287407F2 7D803974 07FE7D80 .)±.t9.)·.t+.ÿ..>ä..A.â.u=.)=.). 000180
83CDE829 CDE802C3 83C85E5F 5D059097 FF080826 89553E73 18F8832F 731CF883 .«.s/.«.s>U.&......]_^ü.ü.Òë)$ë. 0001A0
08082689 550C09CC 2E83F787 8FE82988 E809CC3E 890CEF83 C47407F2 7D8002C3 ü..)·.té.ÿ..>ä.Ò¡)$¢¯X..ä..U.&.. 0001C0
0AE400E8 D1410025 9F5D0590 97FF0808 2689550C 09CC2E83 C85E5F5D 058C97FF ....]_^ü..ä..U.&......].X.AIÒAÒ. 0001E0

Dump of file SATURN:[PCCOMMON.DUMP.DLL]DML.TMP;1 on 18-APR-1990 10:44:35.23
File ID (622,20,0)   End of file block 171 / Allocated 172

Virtual block number 124 (0000007C), 512 (0200) bytes

CC3688FC C08ED88C 5756000C 8803E8FF 320F02E7 D0F88AE3 D0E300C8 .^5E5FE0 A_^.üAÒAÒ.«AÒ.Ò2.$.E..VW.A.â=.6ä 000000
3E885756 EC8855C8 5E5FF4E2 47471D88 FE448905 87AD0005 89F828FE 8.'E4E09 .ÑN.±+«¿..Ü...D±..GGâ¶_^üU.&VW.> 000020
C48850B7 05C1A780 D4885200 028800C8 5DE5885E 5F293FE8 037407FE 7DL009CC ä..)±.t.Ò?)_^.[]ü.E..R^â.Ié.ñP.6 000040
C18F0808 81067500 02300774 00013D40 81127558 C0080000 FFFF9A52 16501653 S.P.R......ãXu.Ÿ@=..t.=..u.Ÿ...ê 000060
1E6606C4 01AEE903 731E5E1E FFD833C2 8C1E6206 C41EE31E 600E885A D4794805 .KyâZ..'.D.á.b..ó3Ü..^.s.ÒÜ.á.f. 000080
6E3D1E6A 880073E8 1E5C8F1E 588E007C E81E6A8F 1E6A8E1E 5E1EFF00 0388C28C .ÒE....^./j.¢j.Ò|./X.¢\.Òs.¡j.=n 0000A0
6A036A00 51E81E6E 8F1E6A8E D88E08E6 88C30000 FFFF9A15 5F680E01 6A08741E .t.j..h_......ü¡|..Ä/j.¢n.ÒQ.j.j 0000C0
5503E800 31E81E6E 8F1E6A8E 003AE821 888F2188 8EEC8855 0000155A 9A006A00 .j..Z...U.â/.I¢.IÒ:./j.¢n.Ò1.$.U 0000E0
0000FFFF 9A500646 8A50C033 001AE81E 6E8F1E6E 8E0023E8 1E6E8F1E 6E8EEC88 .â/n.¢n.Ò#./n.¢n.Ò..3âP.F.P..... 000100
EEE81DFF F2740245 08058804 EF830E73 F738C31E 5E1EFF00 028807E3 1E600E88 ..'.D.E....^.ü;%s..ÿ....E.t·..$Ÿ 000120
5689F046 89C02801 56168800 F0E90375 01563639 FF28F628 56570000 14C800C3 ü.à...WV+-+.96V.u.Òþ...V.+â.Fþ.V 000140
461974C0 080AC483 16462752 9A056068 1EF676FF F876FF0C 6AF85689 F64689F2 ·.F-.V½j..v½.v-.h'..R'F..á..ât.F 000160
8026F646 FFF65EC4 0CE847EA 75003F80 26F646FF F65EC400 8CE90376 7FFFFE81 .±..v.Ò¥.á^-.F-&.?.uõG$.á^-.F-&. 000180
5689EC46 8904C483 165526FA 9A046A50 01458D8A 75003F80 26F65E88 F475003F ?.u¶.^-&.?.uɑ.E.Pj..*&U..á..F$.V 0001A0
886674C2 08FC4688 6D74EE46 08EC4688 FE5689FC 468902C4 83168826 3F9A56EE Ÿv.7&...á..F=.V±.F&.FŸtm.F=.òtf. 0001C0
0AC48311 D527529A 0560681E F076FFF2 76FF0C6A 07C91689 07C7A3EE 5688EC46 F&.VŸEü...è.j..v·.vþ.h'..R'I..á. 0001E0

Dump of file SATURN:[PCCOMMON.DUMP.DLL]DML.TMP;1 on 18-APR-1990 10:44:35.23
File ID (622,20,0)   End of file block 171 / Allocated 172

Virtual block number 125 (0000007D), 512 (0200) bytes

8A26F046 FFF05EC4 04EC4683 02578926 078926FE 5688FC46 88EC5EC4 2C74C008 .ât,á^&.F=.V±&..&.W..F&.á^þ.Fþ&. 000000
26F05EC4 F475003F 8026F046 FFF05EC4 E8E80E74 C00A0788 26FC46FF FC5EC407 .á^=.F=&...ât.$Òá^þ.Fþ&.?.u¶á^þ& 000020
F7000C89 9909042D 06468856 000002C8 E960E900 028890C8 C95F5EA7 75003F80 .7.uï^ èü.|..ÒmÒà...V.F.-â..¿..% 000040
0674400A 47F62607 74830A47 F626065E C4FE4689 15C805E0 D1C103E0 D1C888F9 *.âIA.ëIA.à..F±á^.&-G..t.&-G.ət. 000060
FE5E8801 0A4F8026 90E9E820 0A4F8026 0874020A 47F62606 5EC40089 E9FFFF88 |..Ò¿.á^.&-G..t.&.O. $Ò.&.O...^± 000080
0115C887 F6060868 F9F7000C 89990904 2DC38821 750C0A47 F626065E 88F82780 .'«.^.&-G..u¶.ü·â..¿..X'kA.-.à.. 0000A0
02578926 07892608 57882606 47882606 5EC412E8 04C48327 C8E80676 FF060C75 u...v.Òü'.á.$.á^.&.G.&.W.&..&.W. 0000C0
08C48316 0641AA9A 50E42A08 478A2606 77FF2608 77FF2606 5EC40277 FFFE5E88 .^±.w.á^.&.w.&.w.&.G.*ÒP.'A.-.á. 0000E0
08261080 9003E820 80057400 047F8326 1C75FFFF 300574C0 08044789 26065EC4 á^.&.G..ât.*..u.&....'.¯ $..¯.&. 000100
5EE42A04 8A260247 8E2607FF 26378826 044FFF26 90FF55E9 00000447 C7260A47 G.&üG...ÒU..&.O.&.7&..'.G.&..*Ò^ 000120
88F9F700 0C899909 D420C388 FA4689E4 2A08478A 26085EC4 56570000 08C8C8C9 èüà...WVé^.&.G.*Ò.F*.ü-ь..¿..X*. 000140
8026085E C40F7440 0A47F626 0774830A 47F626F8 468915C8 05E0D1C1 03E0D1C8 âIA.ëIA.à..F½&-G..t.&-G.ət.á^.&. 000160
E8000004 47C72620 0A4F8026 0E74010A 47F62608 5EC49001 28E9FFFF 88200A4F O. |..Ò+..á^.&-G..t.&.O. &üG...$ 000180
C3884C75 0C0A47F6 26FC7689 F0880447 8926C028 EF0A6780 26020A4F 802690E2 ã.&.O..&.g.ÿ+â&.G..þ.v=&-G..uL.ü 0001A0
741878 0A 7E810775 09E0087E 81377501 15C887F6 06D868F9 F7000C89 9909042D -â..¿..X'kA.-.à..u7.-.A.u..-.(.t 0001C0
76FF0C75 C00802C4 8318EE48 149AFA76 FF0F7515 600A7E81 167509EC 087E810E ..-.&.u..~.'.u..v*..HŸ..á..âu..v 0001E0
```

Dump of file SATURN:[PCCOMMON.DUMP.DLL]DML.TMP;1 on 18-APR-1990 10:44:35.23
File ID (622,20,0)   End of file block 171 / Allocated 172

Virtual block number 126 (0000007E), 512 (0200) bytes

```
68F9F700 0CB99909 D42DC388 1575080A 47F62608 5EC404C4 832680E8 0876FF0A ..v.Ô.&.á.á^.&-G..u..ú-å..¿..%*k 000000
26078926 40085788 26064788 26067728 26378826 085E8867 740115C8 87F60608 Á.-.à..tg.^.&.7&+w.&.G.&.W.a&..& 000020
190C42EE 9AFA76FF 0677FF26 5256167E F6080447 89264802 458BF87E 88025789 .W..-½.E.H&.G..-~.VR&.w..v°.Ÿ8.. 000040
C483192F 3FAE9A53 006A006A 026A0F74 2005C187 F6FA5E88 19EBFC46 8908C483 .á..F•$..^*-.é. t.j.j.j.S.Û?/..á 000060
8842EE9A FA76FF50 16064680 560001BE 17E80788 2606468A 065FC426 085EC408 .á^.&á_..F.&..$./..V.F..P.v°.Ÿ8. 000080
26065EC4 000000C8 CBC95F5E E42A0646 8AFECCE9 0374FC76 39FC4689 08C48317 ..á..F=9v=t.Ôäz.F.°ð^_èùà...á^.& 0000A0
065EC404 C4831885 262A9A06 77FF2608 77FF262E 74080A47 F6263574 830A47F6 -G..t5&-G..t.&.w.&.w.-°&...á.á^. 0000C0
0AC890C8 C9044789 26085789 26064789 26025789 26078926 99C02BF7 0A678026 &.g.X+á.&..&.W.&.G.&.W.&.G.èù.à. 0000E0
9000EEE9 99C02B1* 74007730 0C740072 30277400 61309807 8A260A5E C4560000 ..Vá^.&...=a.t'=r.t.=w.t.+á.ÔŸ.. 000100
0002C6F7 90F4E801 098E90F1 E802FC46 C60301BE 9022E800 018901FC 46C6F628 +-óF•.¿..$".ƒ..óF•.$þ.ƒ..$¶.%ó.. 000120
078A2633 74C90837 74003F80 260A5EC4 0A46FF80 FC46C6FE E6830002 CE814375 uC.ö...|zóF•..F.á^.&.?.t7.èt3&.. 000140
C6889000 E84000CE 810E75C0 00A9C688 15750074 30137400 62300674 00283098 .=+.t@=b.t.=t.u..ó`.âu..ö.aŠÀ..ó 000160
3FEC9A06 76FF0876 FF5601A4 68FE4E89 80E88000 CE8190C4 EBC92805 74C000A9 `.ât.+èŠá..ö..$§.NzhÊ.V.v..v..£? 000180
2DC38818 C606FF0A 478826FC 468A0E5E C4FF6AE9 037DC008 FA468908 C4831968 h..á..F°.á).Ôj.á^..F=&.G...ó..ú· 0001A0
5E889807 88F85E88 C02AF846 8915C805 E001C103 E001C888 F9F7000C 89990904 å..¿..%°.àlÁ.èlÁ.à..F½*â.^½....^ 0001C0
89260647 89260257 89260789 2699C028 0E5E8800 000447C7 F85E8804 4789260E .&.G..^ÝúG....^.+á.&..&.W.&.G.&. 0001E0
```

Dump of file SATURN:[PCCOMMON.DUMP.DLL]DML.TMP;1 on 18-APR-1990 10:44:35.23
File ID (622,20,0)   End of file block 171 / Allocated 172

Virtual block number 127 (0000007F), 512 (0200) bytes

```
03240A47 8A26065E C4F62B56 000004C8 CBC95EC2 8CC38808 478826FA 468A0857 W..F*&.G..û.ô^èùà...V+-á^.&.G.$. 000000
39740115 C887F606 D868F9F7 000CB999 09042DC3 88157508 0A47F626 5575023C <.ωU&-G..u..û-å..¿..%*kÄ.-.à..t9 000020
E42A0847 8A260677 FF260877 FF265028 7EC008FC 46890647 28260788 26065E88 .^.&..&+G..F=.á-(P&.w.&.w.&.G.*8 000040
06478826 065EC4FF FFBE200A 4F802606 5EC40874 FC463808 C4831A30 42EE9A50 P.Ÿ80..á.;F=t.á^.&.O. ƒ..á^.&.G. 000060
F43E689A 000AB8EC 8855CBC9 5EC68800 000447C7 26025789 26078926 08578826 &.W.&..&.W.&úG....ó^èùW.$¡...h>¶ 000080
E8A30856 88064688 20041689 2002A310 56880E46 8820141E 8C2012A3 2018881A .¡. È. ... .F..V.È. ... .F..V.ÈÒ 0000A0
1006C703 08E90374 25F67E80 0380E900 00200C06 C7000020 0E06C71F EA16891F ...ð.ú.. ..ú.. ..Ô...—Xt.Ô..ú.. 0000C0
2000A31F E6A31FEC A32006A3 2008A31F F0A3200A A31FEEA3 1FF2A3C0 28000120 ..+áÈ .ÈŸ.È. Èþ.È. È. È$.Èl.È. 0000E0
260A5E88 903EE800 30217806 C70A46FF 49753001 7F80260A 5EC40020 217806C7 ú.x! .á^.&...Oul.F.ú.x!0.$>..^.& 000100
FF1A7500 1FF23E83 0E75203F 80269028 E8000020 0606C71F F206FF00 75283F80 .?+u...·.ú.. ..$(.&.? u..>·..u.. 000120
260A5E88 0A46FF20 0006FFC7 75203F80 260A5EC4 00E81FE6 06FF9014 E8200606 .. $....l.$.á^.&.?-uú... .F..^.& 000140
08C48308 C7E80E20 16681E0A 76FF0C76 FFD075C0 0802C483 0978E80E 5098078A ...P.Ôx..á..âuï.v..v..h. .Ôú..á. 000160
00740020 003E8320 16A3D8F7 2016A120 0006FF0C 7D002016 3E830C56 890A4689 .F..V..>. .).... Å. %AÈ. .>. .t. 000180
76FF060A 46FF2008 06FF2075 2E3F8026 0A5EC400 20217806 C7067530 21783E83 .>x!0u.ú.x! .á^.&.?.u·... .F...v 0001A0
FF000120 1006C70A 7D002010 3E830C56 890A4689 08C48308 78E80E20 10681E0A ..h. .Ô(..á..F..V..>. .).ú.. ... 0001C0
06C70675 006C3D28 74006830 4074004E 30307400 46309807 8A260A5E C420080E .. á^.&...=F.t==N.t@=h.t+=l.u.ú. 0001E0
```

Dump of file SATURN:[PCCOMMON.DUMP.DLL]DML.TMP;1 on 18-APR-1990 10. ‹:35.23
File ID (622,20,0)   End of file block 171 / Allocated 172

Virtual block number 128 (00000080), 512 (0200) bytes

```
1C75003F 80260A5E C40A46FF 03754C3F 80260A5E C4097500 1FF03E83 00021FF0 Þ....>Þ..u.á^.&.?Lu..¹ á^.&.?.u. 000000
98078A26 C8E80008 1FF006C7 D0E80010 1FF006C7 08E80001 1FF006C7 90024EE9 ÒN..ú.Þ...ŠÁú.Þ...ŠÁú.Þ...Šà&... 000020
00693DF8 468B20F8 46831FEE 06FF0875 00583005 74004730 0A740045 30F84689 .F½=E.t.=G.t.=X.u...Ÿ..F½ .F½=i. 000040
900159E9 0140E903 75002530 0152E903 7E013FE9 03750063 300191E9 037E7874 tx~.Ô..=c.u.Ô?.~.ÔR.=%.u.Ôa.ÔY.. 000060
20021EC4 00E80000 0247C726 07892620 0CA11FC4 2620021E C4157502 1FF03E83 .>Þ..u.á.. &á.À. &..&úG...$.á.. 000080
E9037400 200C3E83 0170E903 7500200E 3E830420 02068307 8926200C A11FC426 &á.À. &..... ..>. .u.Ôp..>. .t.Ô 0000A0
00001FE6 06C7200A 06FF01AC E9FFFF88 01AFE903 75200A47 F6261FE8 1EC40180 $.á.Ô.&-G. u.ÔÉ.¡..Ô¯.... ú.l... 0000C0
201006C7 200806FF 1FEE06FF 1FEC06FF F2E8086A 90C3E802 C483019E E80E0A6A j..Ô...á.$ú.j.$·..&...Ÿ.... ú.. 0000E0
74201606 39FA4689 1FF0A3C0 287A7401 1FF03E83 0081E903 75081FF0 3E830004 ...>Þ..u.Ô...>Þ..tz+áÈÞ..F°9.. t 000100
2016A105 20162E83 909013E8 00002016 06C70A74 0020003E 83FA4689 2016A128 (À. .F°.>. .t.ú.. ..$...... .À. 000120
02C48304 80E80E3A 6A02C483 0130E80E 106A0220 02068320 16A3C028 027DC008 .á).+áÈ. ... .j..Ô0..á.j:.Ô...á. 000140
EB2016A3 C028027D C0082016 A300052D FA468815 74002000 3E832274 00FA7E83 .-°.t".>. .t..F°-..È. .á).+áÈ. $ 000160
106AFF10 E9022002 068302C4 8300F1E8 0E106A04 20022E83 00002016 06C79007 ..ú.. ..... .j..Ôþ..á.... .Ô..j. 000180
E80E256A FF2AE903 49E80EF8 76FFF4E8 016A90FF 39E9026E E80E006A 90FF3FE9 Ô?..j..Ôn.Ô9..j.$¶.v½.Ôl.Ô*.j%.Ô 0001A0
88097400 1FF03E83 DA7E0067 30057C00 6530FF0C E9037500 643090FF 21E90428 (.Ôl..=d.u.Ô..=e.|.=g.-Ô.>Þ..t.. 0001C0
FE80E903 75006E30 903AEBFE 5689FC46 89400C56 880A4688 0A4EFF0C 56880A46 F..V..N..F..V.a.F=.VzŠ:.=n.u.Ô.± 0001E0
```

Dump of file SATURN:[PCCOMMON.DUMP.DLL]DML.TMP;1 on 18-APR-1990 10:44:35.23
File ID (622,20,0) End of file block 171 / Allocated 172

Virtual block number 129 (00000081), 512 (0200) bytes

```
00783DFE 89E90375 00753D8F 7400733D FEE0E903 75007030 FEE4E903 75006F30 =o.u.Ōō±=p.u.ŌÁ±=s.t.=u.u.Ō¿±=x. 000000
253C0474 C00AF64F 88078A26 FC5EC4FC 46FF9034 E80A46FF 9081E8FF 79E90375 u.Ōy.ŠŸ..F.Š4..F•ó^•&...F-.ät.<% 000020
56890A46 89FE5688 FC468806 C483044C E80E0A76 FF0C76FF 500A4628 C388EC75 u$.ú+F.P.v..v..ÒL..á..F•.V±.F..V 000040
A1FE51E9 0374200A 47F6261F E81EC4FC 63E90374 C00AF646 88078A26 0A5EC40C .á^.&...F-.àt.Òc•á.Ò.&-G. t.Òø±À 000060
0A06FF04 740A067E :3002021 7806C706 74002008 3E835657 000012C8 C8C9200C . èùà...WV.>. .t.ú.xl ..-..t.... 000080
FE5689FC 46890257 68260788 2620021E C4197510 1FF03E83 0774021F F03E8320 .>Þ..t..>Þ..u.á.. &..&.W..F•.V± 0000A0
0EE80000 FE46C7FC 46890788 2620021E C4117400 200A3E83 902CE804 20020683 ... .Š,..>. .t.á.. &...F•úF±..Š. 0000C0
FE4608FC 46880E74 001FE63E 83022002 0683FE56 89FC4689 99078826 20021EC4 á.. &....F•.V±... ..>Ì..t..F•.F± 0000E0
7500200A 3E83F456 89F24689 20141688 2012A121 76A3C028 9003E806 46880674 t..F.Š..+áÈvIÀ. ... .F·.V¶.>. .u 000100
83D8F7FE 5688FC46 882007C6 26F246FF F25EC410 750A067E 83287D00 FE7E8331 1.-±.)+.-..u.á^·.F·&ó.-.F•.V±%Ä. 000120
FA5E8CF8 46891FF4 880000F6 46C79006 E80001F6 46C7FE56 89FC4689 DAF70002 @.Xö.F•.V±úF-..Š..úF-..¡¶..F½.^• 000140
F876FFFA 76FF4574 0020083E 830AC483 2013480A 9AFC76FF FE76FF50 1E0676FF .v..P.v±.v•..H. .á..>. .tE.v•.v½ 000160
217606C7 06750821 763E8300 7EC908F0 4E89C828 20100E88 04C48318 2F08029A .../..á.... +à.NÞ.è-..>vl.u.ú.vl 000180
8BF04E89 F4468CF2 7E89F47F C00849C1 88473005 C62605E8 F27EC4F0 4E880000 ...NÞá-·Š.&ó.OG.êl.á.¶.-·.F¶.NÞ. 0001A0
F846FF46 202C8003 7C613C07 74C90804 88078A26 F85EC4F2 76C5EE5E 8C1FEE0E .Ÿ..^Ÿév·á^Ÿ&.....èt.<a|.., F.F½ 0001C0
83087420 0606081F F2A11475 00200A3E 83EE5E8E F45E8CF2 7689E375 003F8026 &.?.uÐ.v·.^¶.^Ÿ.>. .u.À ..... t.. 0001E0
```

Dump of file SATURN:[PCCOMMON.DUMP.DLL]DML.TMP;1 on 18-APR-1990 10:44:35.23
File ID (622,20,0) End of file block 171 / Allocated 172

Virtual block number 130 (00000082), 512 (0200) bytes

```
7E835657 000010C8 C6C95F5E 02C48302 FFE80E50 C02802E8 00018805 7500F67E --.u.|..Š.+àP.Ò...á.^_èùà...WV.- 000000
1FF03E83 008FE902 20020683 FA5689F8 46892004 16882002 A10001BE 18740006 ..t./..À. ... .F½.V•... .Ō...>Þ. 000020
FC468907 88262002 1EC410E8 FA5689F8 46890257 88260788 2620021E C4137408 .t.á.. &..&.W..F½.V•Š.á.. &...F• 000040
900AE807 D2881575 FA4608F8 46880E74 081FF03E 83042002 0683FA5E 8CF84689 .F½.^•... ..>Þ..t..F½.F•u.¡@.Š.. 000060
083639F6 28F45689 F24689FA 5688F846 88FA5E8C F8468907 09880975 00FC7E83 .-•.u.¡1..F½.^•.F½.V•.F·.V¶+-96. 000080
C44690ED E8107ECE 38461574 003F8026 F246FFF2 5EC4900E E820100E 881C7420 t.... Š..á^·.F·&.?.t.F;ö-.ŠÙ.Fá 0000A0
02C48301 59E80E57 08750020 003E83FE 2820163E 88F37500 3F8026F2 46FFF25E ^·.F·&.?.u•.>. +±.>. .u.W.ÒŸ..á. 0000C0
C95F5E02 C483013C E80E5708 74002000 3E8306C4 8301B3E8 0EF876FF FA76FF56 V.v•.v½.Ò•..á..>. .t.W.Ò<..á.^_è 0000E0
80057547 067E8306 7467067E 83FE5689 FC468920 04168820 02A10000 06C890CB ù.à...À. ... .F•.V±.-.gt..-.Gu. 000100
20103E83 007400FA 7E800006 201006C7 06750020 083E83FA 4688C02A 9003E801 .Š..•à.F•.>. .u.ú.. ...-•.t..>. 000120
FFFE76FF 201236FF 201436FF 0676FF20 1036FF1F EE36FF00 01201006 C7067500 .u.ù.. ...6Ÿ..6. .v..6. .6. .v±. 000140
FF201436 FF147500 1FE63E83 1B7400FA 7E800EC4 8307E61E FF261E80 068EFC76 v•....&..|..á..-•.t..>Ì..u..6. . 000160
1436FF14 75002010 3E831874 001FE63E 8304C483 07EA1EFF 261E8006 8E201236 6. ....&..ō..á..>Ì..t..>. .u..6. 000180
081FF2A1 00002176 06C70820 02068304 C48307F2 1EFF261E 80068E20 1236FF20 .6. ....&..·..á.... .ú.vl..À·.. 0001A0
02E80001 880574C0 0804C483 07F61EFF 261E8006 8EFC76FF FE76FF1B 74200606 .. t..v±.v•....&..-..á..àt.¡..Š. 0001C0
1478044F FF261FE8 1EC43C75 00200E3E 83560000 00C890CB C90129E8 0E50C028 +àP.Ò).èù.à...V.>. .u<á.Ò.&.O.x. 0001E0
```

Dump of file SATURN:[PCCOMMON.DUMP.DLL]DML.TMP;1 on 18-APR-1990 10:44:35.23
File ID (622,20,0) End of file block 171 / Allocated 172

Virtual block number 131 (00000083), 512 (0200) bytes

```
EB17D29A 0676FF53 1FEA36FF 10E8E42A 04882602 478E2607 FF263788 2606468A .F.&.7&..&.G.&..*ōŠ..6ō.S.v..@.Š 000000
200E3E83 56570000 02C890C8 C95E200C 06FF9005 E8200E06 FF077540 06C48322 *.á.àu.... Š..... ^èù.à...WV.>. 000020
06C48323 5317D29A 217836FF 1FE836FF 1FEA36FF 18E8507E F6080676 88577500 .uW.v..--PŠ..6ō..6Ò..6xl.@.S#.á. 000040
FF263F88 262178A0 D478044F FF261FE8 1EC41E7E C0084EC6 88200E06 FF047540 àu.... .óN.à-.á.Ò.&.O.xà.xl&.?&. 000060
02C8C8C9 5F5E200C 06010646 88077500 200E3E83 D4E8E42A 05882602 478E2607 .&.G.&..*ōŠà.>. .u..F.... ^ èùà. 000080
5098078A 26065EC4 1FE836FF 1FEA36FF 22E85E75 00200E3E 830A7688 56570000 ..WV.v..>. .u^Š".6ō..6Ò.á^.Ī...P 0000A0
4FFF261F E81EC425 74C0084E C6880646 FF200E06 FF047540 06C48323 C517D29A .@.é#.á.àu.... .F..óN.àt%á.Ò.&.O 0000C0
3E83CAE8 E42A0588 2602478E 2607FF26 3F88261F E81EC407 8A26065E C4CU 304 .xéá^.&..á.Ò.&.?&..&.G.&..*ōŠò.> 0000E0
89F44689 20141688 2012A156 00000CC8 C8C95F5E 200C0601 0A468807 75002 7E . .u..F.... ^_èùà...VÀ. ... .F¶. 000100
28F028F8 468904C4 831FFE08 029AF476 FF522016 3688FA46 89FC4689 C028F6,6 V-+á.F•.F•.6.¯R.v¶...±..á..F½+Þ+ 000120
F45EC422 75002000 3E834E01 75082176 3E8308E8 02EE8305 75102176 3E830676 v..>vl.u..Ÿ.Š..>vl.u.N.>. .u"á^¶ 000140
83F84EFF 02C483FE 71E80E50 98078A26 F446FF12 75302178 3E831975 203F8026 &.?-u..>xl0u..F¶&...P.Òq±.á..N½. 000160
3E830066 E80EFA46 FF077400 067E8318 74002000 3E83077E F6080874 3021783E >xl0t..--..>. .t..-..t..F•.Òf..> 000180
7400067E 8302C483 FE7EE80E 56297500 20003E83 0070E80E FC46FF07 74002176 vl.t..F•.Òp..>. .u)V.Ò-±.á..-..t 0001A0
FFF876FF 0040E80E 047500FC 7E830A74 0021763E 830039E8 0E047500 FA7E830A ..-•.u..Ò9..>vl.t..-•.u..Òà..v½. 0001C0
C483FE38 E80E5600 20217806 C70E7400 20003E83 06C483FE 85E80EF4 76FFF676 v-.v¶.Òç±.á..>. .t.ú.xl .V.Ò8±.á 0001E0
```

```
Dump of file SATURN:[PCCOMMON.DUMP.DLL]DML.TMP;1 on 18-APR-1990 10:44:35.23
File ID (622,20,0)   End of file block 171 / Allocated 172

Virtual block number 132 (00000084), 512 (0200) bytes

E80E306A C802C483 FD02E80E 50002088 03E80028 88057400 1FF23E83 C8C95E02 .^èù.>·..t.|+.Š.| .P.Ò@».å.ùjO.Ò 000000
FDAAE80E 50007888 03E80058 88057400 1FEE3E83 17751021 763E8302 C483FDC8 à».å..>vl.u..>Ÿ..t.|X.Š.|x.P.Ò`» 000020
83378826 20021EC4 12752A3F 80260A5E C40001FE 46C75657 000006C8 C802C483 .å.ùà...WVüFz..å^.&.?*u.å.. &.7. 000040
0A5E88F6 280A46FF FFFFFE46 C7087520 3F80260A 5EC49060 E80A46FF 02200206 .. ..F.Š'.å^.&.?-u.üFz...F.+-.^. 000060
F8880030 217806C7 0675303C 0A752008 3639387F 393C3F7C 303CFA46 88078A26 &...F*<0|?<9.;96. u.<0u.ú.x!0..« 000080
30802647 F1883OE9 83C803E1 D1CE0302 E1C1CE88 98058A26 187F3930 802606E8 $.&.=9..&....öeÃ..öÌÃ.à.Ò0.þG&.= 0000A0
C8C95F5E 0C56880A 46883789 26065EC4 F088EEF7 FE46880C 468C0A7E 890F7D30 0)Ò.-..F..FzŸŸ.Þå^.&.7.F..V.^ èù 0000C0
00382611 74003080 264701E8 FC7EC406 4E8AFE5E 8CFC4689 07E08857 000004C8 à...W|Å..F=.^z.N.å-=Š.G&.=.t.Ì8. 0000E0
04880000 04C890C8 C95FC028 FE468CFC 7E899009 E8FE468C FC7E8900 0188F475 u¶|...~=.FzŠ...~=.Fz+å_èù.à...|å 000100
06478926 990A4788 26044789 26C02825 75830A47 F626FC5E C4FE5E8C FC468909 ..F=.^zå^=&-G..uX+å&.G.&.G..&.G. 000120
06380CFC 4683C28C C38817E8 C28CC388 FF0847C6 26025789 26078926 08578926 &.W.&..&.W.&6G...û.6Š..û.6.F=.;. 000140
3300098A 087205BF 1E38065E 88EC8855 90C8C999 C0288075 18C41638 C37518C2 ô.uù;.å.u§+å.èù.U.&.^.;.¢.r.¤..3 000160
065EC4EC 8855C85D E5880005 C187C6F3 75C08500 00FFFF9A 531800E9 18C4E9C0 åÒå.ÒÅ.S......åuµó.è...|)ùU.&å^. 000180
831E73FF F1300646 88575602 EC83EC88 55C850E5 8801FE4F 80260574 C308C08C .å.ût.&.0z..|)ùU.&.&.VW.F.=þ.s.. 0001A0
0676FF08 750078E8 05740018 E8157500 82E81802 A3127400 25E80875 0018023E >@..u.ÒX.t.È@.Ò..u.Ò..t.Òx.u..v. 0001C0
FE5E89FE E3834306 5E880776 065E3900 F088C850 E5885E5F 02C48322 AF448E9A ..DÉ".å._^.|)üEÞ.9^.v..^.C.Dz.^z 0001E0

Dump of file SATURN:[PCCOMMON.DUMP.DLL]DML.TMP;1 on 18-APR-1990 10:44:35.23
File ID (622,20,0)   End of file block 171 / Allocated 172

Virtual block number 133 (00000085), 512 (0200) bytes

A3180416 87C28838 74FFFA83 08C48326 73463A9A 50028051 0E4F8D50 501EC033 3à.PP.O.Q¯.P.:Fs&.å..*.t8.ó..à.È 000000
0000A300 0A880C47 89484800 08A3C033 D88EFE5E 880008A3 0A8E0574 D2081806 ø..@t..ÒÈ...^z.A3åÈ..HH.G.|..È.. 000020
18061E8E D833064E 88C08E08 8CC31F08 8C0006A3 00000500 0AA30147 800002A3 È...G.È.....È...Ä.û.Ä.à.N.3Ü..ø. 000040
46892727 28F09A06 76FF006A 0876FF00 6A560000 0AC8C309 8EC18CD2 081DE4E8 ÒÒ..@.è.lûà...Vj..v.j..v..Þ('.F 000060
89FC4689 02C48327 40263F9A 56F87688 902FE899 C0280674 FFFFC2F7 FA5689F8 %.V*%ò..t.+å.Š/..v%V.7&a'.å..F=. 000080
C95EFE56 88FC4688 9007E808 C483269F 0A249A50 FE76FF00 6A561274 D008FE56 Vz.Åt.Vj..vzP.$..&.å.Š...F=.Vz^è 0000A0
76C5FE88 C80309F7 AEF2C033 F788067E C4098827 E30E4E88 1E5657EC 885590C8 ù.U.$WV..N.D'.lå-..%3à·Ù%l.ù.zév 0000C0
885500C8 5DE5885F 5E1FC188 D1F74949 04740477 FF453A26 C933FF44 8AA6F30A .µÌ.D.3è&:E.w.t.II%l.è.^_.|)ù.U. 0000E0
06468BEC 88552300 E9087EC5 1E990175 0AF98302 33064688 0C4E8801 835756EC åVW°..N..F.3@.*.u...é-.Ò.ØU.&.F. 000100
76885657 000020C8 0008CA5D E588D318 0A4628E8 D3EAD30C 0A890C5E 88085688 .V..^.¿..ÆÒÆŠ+F..Æ.|)ò..à ..WV.v 000120
085E88EC 5689EA46 89281628 F09A5052 99F9F700 04899903 44805180 68016A06 .j.h.Q.D..¿..%*.RP.Þ(.(.Fõ.V&.^. 000140
0E4688 3C 6A006A47 017E0208 7E830775 D208F9F7 00048999 C6881CF6 8F88E3D1 lD.¢-..ó.¿..%*.Øu..-..-.Gj.j<.F. 000160
28F09AE6 5E89E44E 89505299 DA880C46 88C8880E 1068006A 283028F0 9A505299 .RP.Þ(O(j.h...à.F..Ö.RP.Nõ.^|.Þ( 000180
9AE25E89 E04E89[illegible] 52990A88 C703C303 01600E69 0A4688C8 88518068 016A2852 R(j.h.Q.à.F.i8m..ú.ú.Ö.RP.NÅ.^ã. 0001A0
A600C181 DA13C803 990A8810 4688C888 E65613E4 4603E256 13E04603 288528F0 Þ(.(.FÅ.Vã.Fõ.V|.à.F..Ö..à.Ö.é.| 0001C0
46011D20 16881D1C A1288648 389AFC46 89C7030A 4688EC5E 11EA4E01 12CED381 .Æö..Nõ.^&.F..ú.F=.8HÑ(Å.... ..F 0001E0

Dump of file SATURN:[PCCOMMON.DUMP.DLL]DML.TMP;1 on 18-APR-1990 10:44:35.23
File ID (622,20,0)   End of file block 171 / Allocated 172

Virtual block number 134 (00000086), 512 (0200) bytes

46801A74 0010223E 83F24689 0C4688F6 46894808 4688F846 89504480 EC5611EA ô.V&.DP.F%.F.H.F-.F..F·.>"..t..F 000000
5F5EEC56 88EA4688 00EC5E83 0E10EA6E 810974C0 0804C483 270C4912 9A5016EE Ÿ.P..l.'.å..åt..nõ...^$..Fõ.V&^_ 000020
00C850E5 8815FCE9 0374C085 0000FFFF 9A5050C0 330676FF 0876FFEC 8855C8C9 èùJ.$.v..v.3àPP......àt.Ò=..|)ù. 000040
88C888E3 F70008CA 5DE588E3 F7064688 08750A5E 88D8080C 5E880846 88EC8855 U.&.F..^..Å.^.u..F.%D.|)ò..%D.à. 000060
1575C008 0C468856 53EC8855 0008CA5D E588D103 E3F70646 88C8030C 66F70646 F.%f..à.F.%D.l.|)ò..U.&SV.F..åu. 000080
06468808 56880A5E 88C88838 E80388F1 F7064688 D888F1F7 02330846 880A4E88 .N..F.3@%þ.Å.F.%þ.Æ$8.à.^..V..F. 0000A0
0856380C 720103E6 F70A4688 910C66F7 F088F3F7 F475C908 08D1EAD1 08D1E9D1 lõlUlõlÅ.èu¶%µ.Þ%f...F.%l.lr.;V. 0000C0
C71CE884 80343008 0406C700 08CA5DE5 88585E96 D2334E01 76064638 06720777 w.r.;f.v.N3@.^[.|)ò..ú...04¯.Š.ú 0000E0
00084C3E 838A8030 31080406 C708E881 80313008 0406C712 E8838033 30080406 ...03¯.Š.ú...01¯.Š.ú...10¯..>L.. 000100
480E9A08 008827E5 00AC9A08 06A3E42A 32310804 06C70675 8C3C084A 1EFF0474 ¢...J.<.u.ú...12*8È...¯.|'£....K 000120
29E51578 9A080636 FF290901 009A50FF E4050806 A1290001 009A5000 FD8829C8 à)|=.P...Å)Å...ô.P...l).6...x.|) 000140
D1080109 01FAD108 D109D1FA D129747F 80C2F7C0 33025488 0C88FC09 CC3E88C3 û.>ä.=...T.3à%ó..t)l*lllÅl*lllÅl 000160
D08AC888 C3F78806 55890440 89024589 000005C7 3800C281 8FE68008 D10901FA *lllÅ.l..ô.8ú....E..M..U..%û.à.Å 000180
D1D301E2 D1D301E2 D1F88AAD DC8AF08A AD048AC8 0AADC888 ADFC09CC 3E88EAE8 Šõ.>ä.=Ù.àÙ.à.àÙ.Þ.ÈÙ.%lãlÆlãlÆl 0001A0
D1387238 00203077 47E0307F F025E922 EC8AF90A 808101CA 800374CD 0AD3D1E2 ãlÆ.ët..ò.Ÿ..*.$"Ö%Þ.=ÁGw=-.8r;l 0001C0
17747F80 30008005 08730003 8301C680 107401C6 F6157207 77D13AE0 D1E0D1E0 ÅlÅlÅ:lw.r.-6.t..ó..Æ.s....*..t. 0001E0
```

Dump of file SATURN:[PCCOMMON.DUMP.DLL]DML.TMP;1 on 18-APR-1990 10:44:35.23
File ID (622,20,0)   End of file block 171 / Allocated 172

Virtual block number 135 (00000087), 512 (0200) bytes

```
45890589 C033FEDB E9C3F788 0589C68A E38A0245 89E50AC7 0A7FE780 1674C008 .åt..ô..ú.|.E..D.6...%úÕU±3å...E 000000
C38BD08B DA8811EB DAF71579 D20BD833 D08B1DEB C38BD08B DA8B0233 C3F78802 ..%ú3@.Õ.Å.úS..Å3Ù.@y.%ÕS..Õ.Å.û 000020
C8881DEB C38BC38B DA8BD233 0474E99E B48024C4 8A000883 DAF7D8F7 0779C008 .åy.%Ú%Õ.Ù..á$.Ç.Õt.3@.Õ.à.úS..à 000040
338024C4 8A000883 D9F7D8F7 0779C008 C38BC88B DA8811EB D9F71579 C90BD833 3Ù.èy.%1S..Õ.à.û.ày.%Ú%1.Ù..á$.3 000060
000283C0 D10026E8 03E80035 E808E800 28E800EB 003AE807 B5E98560 B0D233FF .3@§'.Õç.Õ:.S.Õ+.S.ÕS.S.Õ&.1à.@. 000080
E8002CE8 C34E7502 080039E8 03E8005D E808EB00 3EE800EB 009CE8C3 C8016775 ug1àúÕ..S.Õ>.S.Õ].S.Õ9..@uÑúÕ,.S 0000A0
D1830002 83F5D8F7 D2F7D1F7 0079FF08 C9330041 E803E800 78E808EB 002CE800 .Õ,.S.Õ(.S.ÕA.3è..y.%1%@%Á%.@..1 0000C0
13F581F9 80CD0AE8 2201B508 33001CE8 03E80056 E8C3CAD1 21750001 83C20100 .1ô.1.ul1ÕúÕV.S.Õ..3Ûç."Õ.ë.*.%. 0000E0
0FB6F988 08EE8391 AD91AD93 ADD60A92 AD00A4E9 FDE9E9C3 01720002 83C3130B Ù.ú.@.r.úÕÕ»ÕÉ.Ù..@Ù.Ù.Ù..Ý..*Ñ. 000100
83CA7F20 F9837872 03FEE981 D874C90B E901E901 E901E901 7FE58010 CE80F122 "þ.ö..|.1Õ1Õ1Õ1Õ.ètÅ.Õ±.rx.* .Õ. 000120
F9D100E4 D07FE183 F988E98A 04EE83C1 86ACC88A ADF88AAC DA8AD233 2FEB25E9 Õ%S/3@.Õ¯.%Ù.à¯.ê.Ý..Õ.*.Å.ÅÕÅ1* 000140
D2D0F501 FA801A7C 08F98009 F720E983 997F20F9 8347727E E9804D74 C908DC00 ÁÉ.ètM.Õ-rG.* ...Õ %1.*.|..*.%Å@ 000160
EED0000A 8001B201 FA8015E3 E1E808E9 80F632E6 8AC48AF8 8ADF8AD3 0A01E280 .ã..Æ.Õ.%.6.12-.Õ.SÅD..*.ý..Õ.ÅŸ 000180
F035E9C3 D08BC033 00018000 B1F9C3C3 880088CA 8AF3E200 D2800AD0 0BD10801 1ÅiUÅÕ.@.ãµ.Õ.Å.ÚÚ*Ý..1.3ã.ÅÚÕS» 0001A0
067C89E0 737FF0FA 817FE680 07881 0EF 83067C03 09CC3688 0131E807 800068E8 Õh.¯.Õ1..6ã..|..ÿ..@.1..*þ.sÅ.|. 0001C0
FA817FE6 80D78800 80EF8102 7C0309CC 36880108 E8038000 87E8FD0F E9C3FE8B .±úÕ.»Õ..¯.Õ...6ã..|..ÿ...@.1..* 0001E0
```

Dump of file SATURN:[PCCOMMON.DUMP.DLL]DML.TMP;1 on 18-APR-1990 10:44:35.23
File ID (622,20,0)   End of file block 171 / Allocated 172

Virtual block number 136 (00000088), 512 (0200) bytes

```
CC368B00 53E8C3FE 88067C01 10EF8309 CC368B00 1EE8C3FE 88027C89 DF737F80 ..sÕ.|..±úÕ...6ã..ÿ..|..±úÕS..6ã 000000
09CC3688 C08EA5A5 A5A5C18E D98CC08C 09CC3E88 FCC3FE88 027C0100 80EF8109 ..ÿ...|..±ú«.>ã..å.).èEEEE.å.6ã. 000020
D1E9D1E9 D10035B8 7FE580CF 88F0E783 064C89CA 0A0FE183 F988064C 8800108A ¤...L..*.Å..Õ.L..Õþ.ü.|.¡5.1Õ1Õ1 000040
88C08EA5 A5C18ED9 8CC08C09 CC3E88FC 0082E93F EB09F704 7D0433E9 81E9D1E9 Õ1Õ.Õ3.).%1S?Õ..«.>ã..å.).èEE.å. 000060
E1D10018 887FE580 CF8880E7 83024C89 CA0A7FE1 83F98802 4C8B0080 8A09CC36 6ã.¤...L..*.Å..Õ.L..Õ..ü.|.¡..1Å 000080
EF88C888 0A74C838 FA088000 E781147C EF88C838 D9F7487D 0096E981 ED32CD8A .è2Ù.Õ..)H%);à.ÿ|..Õ...*;àt..à.ÿ 0000A0
E84608E9 800004C6 140A0002 800082F5 01FA8014 7C08F980 D233EA28 8000E581 .|..+õ3@.*.|..*.%ý..@...Õ...Õ.FS 0000C0
E18AEF8A 00018BC3 348AD188 C933C32C 88E822EE 8AD7C18A 080A880C E3348AE7 Õ.4D.É...è@.Ÿ"Õ.,û3è.1.4ÚÉ...ý.Å 0000E0
0E88E2D3 CC8AFD08 0274000A 80018281 FA80030A DE22070A FAE207D0 EAD106E3 D.1õÅ@ã*.@"B.Æ.*.ý..Õ.t..».ãÆã.. 000100
C8E9C3F5 D3014C74 7F80C3F7 C3FAE200 14804606 E33488F2 02CE28C8 039809CC ä...à+ö.'.4D.F...ã*ÚKÚ..tL1ÆkÚÕà 000120
C3F7D3F7 E274D0F7 7F80A9D0 F7E1747F 80A9025D 88260244 88C3E400 7FCC80F8 «.ä.ÅÕú.D.&.].`..tÅ%Å`..%ÅtãXÆ%Ú 000140
75C338DA 8EC18E^9 8CC28CF7 87930873 E0D1E3D1 D578EF32 EC8AD874 03F77F80 ..%ÆtÅ.$2ÿx[1D1Ås...%.Õ.1.è.Õ;Úu 000160
50882606 4488C3 ' D07FCC80 F875E9C3 F5D3015E 747FF0C3 F7C30538 26048805 ...&;.ÚkÚþ.t^1ÆkÚÕu«.ä.ÅÕú.D.&.] 000180
D1D578EF 32EC8AD8 74D3F77F F0C3F7D3 F7E274D0 F77FF0A9 D0F7E174 7FF0A906 .`þ.tÅ%Å`þ.%ÅtãXÆ%Úþ.%ÆtÅ.$2ÿx[1 0001A0
0244880E 75044538 26044488 1775C338 DA8EC18E D98CC28C F7879308 73E0D1E3 D1Ås...%.Õ.1.è.Õ;Úu..D.&;E.u..D. 0001C0
0082358A 015D8802 458803E8 80F48002 4588F787 C3053826 04880575 02453826 &;E.u...&;.Ú.%.E..¶.S..E..]..Sÿ. 0001E0
```

Dump of file SATURN:[PCCOMMON.DUMP.DLL]DML.TMP;1 on 18-APR-1990 10:44:35.23
File ID (622,20,0)   End of file block 171 / Allocated 172

Virtual block number 137 (00000089), 512 (0200) bytes

```
5B74E40A 6574ED0A C0D1C1D1 8000CE81 FF00E781 01748BFF 7C8B024C 8B80CF80 [illegible] 000000
8055E300 85C08A91 D9D0E8D0 C9004977 18FC80DC F6E52A91 FA87F387 0573EC3A [illegible] 000020
800374D2 0A2B7E05 F9B03E74 107210E9 80083303 8801C880 0374D208 127C0EF9 [illegible] 000040
8BD7B8DE 8B19EBF8 75C1FED3 D1E2D123 74177708 E980FD8A DFBAF38A D68A01CE [illegible] 000060
1470E0D0 20CA8003 743FC2F6 FAE20AD1 EBD120CA 8003743F C2F60097 E9EBD0C1 [illegible] 000080
D3F70A73 DE8BD78B F31BFA2B FA41E945 75FFFC80 C4FEDAD1 D8D15073 DE130703 [illegible] 0000A0
5B7608EC 800F75FF 0A6474D8 0BDA876A 7610EC80 0B750B0B D0F60003 83F5DAF7 [illegible] 0000C0
017CE903 74000812 3E80F671 D301E2D1 4B74CCFE 0A78FF0A D232F28A DE8AFB8A [illegible] 0000E0
A9D801E0 D03A74FF FC80C4FE 07730003 8301C680 0F7401C6 F6147207 7780FA80 [illegible] 000100
0008123E 80C3F78B 0589C68A E38A0245 8909CC3E 8BC70A7F E7808024 17747F80 [illegible] 000120
D0E0D196 34B8ADFC F99DE9E6 79C3F78B 05890245 8909CC3E 8BC03301 7EE90374 [illegible] 000140
D370E502 7FED8080 EC80C132 D8883088 CB74ED0A D9D0E1D1 02408BD6 74E40AD8 [illegible] 000160
8B509FC0 0BDA8BE7 F7C68BE8 8B80C980 80C880EF 8AFF3250 CD74FFFC 8080C480 [illegible] 000180
8BC703E1 F6C58801 CB800374 9E58FA13 0803E6F7 C18BFA8B 00D28308 03E7F7C5 [illegible] 0001A0
4D8BF787 FF1AE9AD 74FFFC80 C4FEFF69 E90A75E4 0AD3D1E2 D10B78FF 0A58930B [illegible] 0001C0
0371E52A 7FED8081 EC80C132 DB74E40A 5C74ED0A D8D0E001 024488D9 D0E10102 [illegible] 0001E0
```

Dump of file SATURN:[PCCOMMON.DUMP.DLL]DML.TMP;1 on 18-APR-1990 10:44:35.23
File ID (622,20,0)   End of file block 171 / Allocated 172

Virtual block number 138 (0000008A), 512 (0200) bytes

```
D1087400 08123E80 80CF80C9 32208A01 5088FF78 E90375FF FC8080C4 80FF78E9 Õ(..á..•.u.Õx..}..-2è.Ü..>...t.Ì 000000
C2080011 E8EE8800 1AE80801 EAD180CE 80C03224 8A015488 5008123E 02D9D1E8 $ÌÌ.>..P.T..$2à.ö.ÌÕÌÀÕ...ŸÕ...ò 000020
E1F7C688 FA8815E3 C03396F3 F71D7303 3BF880E9 FF76E90D 8801CA80 0374D688 .øt..ò..ÌÕv.Õ¯½;Æs.¥µ.3áD..•.óXÃ 000040
081206C6 C3ED73C1 880003C1 28FFFFBE C3F97303 13C1034E 07730788 FA1BD8F7 %Ã.•.øs.N.é.Æs•ú/..+ê.Ä.êsÙÚó... 000060
53500815 09CC06C7 09CC36FF 3874E40A 3C77EC3A 0EED8007 74ED0A08 142E8A00 ......Üt..Ü.:ìw<.õt8.6ä.ú.ä...PS 000080
09CC068F 58585AFE 0FE8FF32 52535008 1909CC06 C758585A FE4EE808 32023352 R3ø2ÜÒN±Z[Xú.ä...PSR2.Õ.±Z[X..ä. 0000A0
15A3C033 FE1AE852 53500819 09CC06C7 09CC36FF 0812A202 330B33C0 33FE33E9 Õ3±3à3Ü3øÀ...6ä.ú.ä...PSRÕ.±3âÈ. 0000C0
E6807FE4 80ADA5A5 A509CC3E 88F7881D E88000F5 81066088 F787D3E8 0817A308 .È..$Æ.¥.m..¥..$..¥.>ä.ÈÈÈÜ.õ..Ì 0000E0
83D274FF E025DAD0 E0D1DED0 E5D10644 88FC0660 88C3FE88 09CC3688 A8E60A80 ..Ì¨.6ä..±ü.m.•.D.ÌÌÄßÌÀÄÖXÀ.tø. 000100
DOD1E2D0 DDD1E6D0 897706A0 3008F7C5 28C274C0 08D68695 F7870977 E838E0E5 ÌÀ;Õw..¥..ø.ätõ+èXÀ•..w¿ÀÌÌÌÀàÌÌ 000120
6374FF08 10CC800F E480AD93 AD91AD92 C032E08A ACF888E0 86C0D1C0 01C0D157 WÌàÌàÌà.Ä.½¯.Äzà.Ü.Ü.Ü.Õ..ä...tc 000140
06FF8323 724874E7 7710EF83 C0330888 C8880188 01C98003 74D20818 7C0EFF83 ...|..øt..è..Ì.ü.Ä3à.ÿ.wÕtHr#... 000160
23740F77 08EF83E4 32C48AF8 8ADF8AE8 8ACD8AF1 8A068A01 CE800374 D20A287C |+.øt..ö..ø.þ.ë.$.Õ.½.á2õ.ÿ.w.t# 000180
E20AD1DF D1D801E8 0120CA80 03743FC2 F6CF8716 E8F57547 00D1D3D1 D1D1E201 ÌäÌÌÌÆÌÀGuX$..ü-õ?t..ò ÌÕÌÜÌÕÌÕä 0001A0
509F5003 5C13014C 13340208 D0E5D138 70E5D120 CA800374 3FC2F697 5ECF87F6 -.u^.-õ?t..ò ÌÌp;ÌÌÀX.4.L..\.P.P 0001C0
C5830AD1 D9D10801 DFD11374 2000C7F7 FE13589E 581000CE 810FFFE6 81057488 .t..Ì...ö..X.X.±Xú. t.ÌÕÌÜÌÌÌÕ.é 0001E0
```

Dump of file SATURN:[PCCOMMON.DUMP.DLL]DML.TMP;1 on 18-APR-1990 10:44:35.23
File ID (622,20,0)   End of file block 171 / Allocated 172

Virtual block number 139 (0000008B), 512 (0200) bytes

```
E6819F05 7488035C 18014C18 342AD0F6 D8D0E5D1 0088E9F6 ECE90375 E0FD8320 .»Äu.Õ$-Õ..ÌÌÀÀ-À•4.L..\..t...Ì 000000
8EFCFE13 DE13CE13 F50AF7D1 F7D3F7D7 F7D0F6F6 331373FE 1B9E1000 CE810FFF ...ö....±s.3--ÀX«X£XÌXÕX.ö.8.±•/ 000020
C7F7E4E8 0233CA88 D988F888 30744E40 760200ED 811375E0 C7F61875 FF080004 ....u.-úÀu..Ü..vãNt=.«.Ì.õ3ø$õXú 000040
1000C7F7 970082F2 8ACE8AE9 8AD08AF8 8AC78AE0 8A972776 0100ED81 18751FE0 À.u..Ü..v'..À.ú.«.Ì.Õ.ö.¨ÿ..Xü.. 000060
800385E9 03740008 2A3E80FC 9065E8E8 E8D7D103 D1D1D1E2 D1717420 ED831275 u..Ü tqÌàÌÌÌÆÌø$$$e.•.>•..t.Õ... 000080
20C58308 742000C7 F7000783 00038300 D18301C6 801A7401 C6F61F72 077780FA •.w.r.-ó.t..ó..Ì..Æ..ø.Xú. t..é 0000A0
4589C70A C508C032 E0862274 ED010FE7 808024DE 8709CC3E 88F78830 74E0FD83 ,»ÀtÕ.¥.>ä..8$..Õ.ÌÜt".Äzà.é.ú.E 0000C0
03740008 2A3E80FC F5FDE903 79C3F788 05EF83A8 C688A8C1 88AAC68A 055D8806 ..}..ó¨.è¨.ó¨.ÿ..Xüy.Õ»X•.>•..t. 0000E0
064D8808 747FF025 D0880644 88FCC3FE 88ABABAB A8F78809 CC3E88C0 330377E9 Õw.3à.>ä..X .±ü•.D..ÀXÞ.tÜ.M. 000100
D08674FF E0308000 058C70C1 037FE0E9 81800020 E1D1E001 00747FF0 E181D133 3Ì.ÀÞ.tÀÌÀÌÀ-...ÕÀ..êp¥...=À.tÑÀ 000120
0BD7D1D3 D1D1D1E2 D10E7510 00C7F7D8 D0E50150 01CA8003 740181E8 50D8D1E6 ÌÌÀPÕ..t..ò.}ÌÌÀÀXú..u.ÌàÌÌÌÆÌø. 000140
747FF0E1 81D18806 4088FCF7 87F58CE9 FF24E988 74E0FD83 20C58393 E80A75ED Üu.$..é .»Àt.Õ$.Õ.X.X=.M..Ì.ÀÞ.t 000160
FFE03080 00059870 C1287FE0 E9818020 2DE101E0 D198747F F0250033 06448BEF ÿ.D.3ÀXÞ.t.ÌÀÌÀ- ..ÕÀ.+êp....=À. 000180
288F05C6 83F78850 9210CC80 0FE480AD 92AD93AD C932E88A AC500801 E6009874 t.ÀÌÌAP¯.Õ2èÜ.Ü.Ü.Õ..ä..P.X.ó.«( 0001A0
F7880828 8FFD1F74 00082A3E 800005C6 FCA44746 A5A5A810 CC800FE4 80A0FD08 .»Ü.õ..ä.¨ÈÈFGÊ•ó...>•.t.»«(..X 0001C0
08D108D1 EAD158FC A8D8D1AD A8D8D1AD A8D8D1AD ED01AB08 2A2602E8 D1E888AD Ü.ÕÌÕ.Æ•.¨ÌÜÜÌÀ ÜÌÀ ÜÌ». •XÌõÌÀÌÜ 0001E0
```

Dump of file SATURN:[PCCOMMON.DUMP.DLL]DML.TMP;1 on 18-APR-1990 10:44:35.23
File ID (622,20,0)   End of file block 171 / Allocated 172

Virtual block number 140 (0000008C), 512 (0200) bytes

```
CA800374 5F5B59D7 88C208C1 08C30800 33E85700 37E85700 3BE85700 3FE80901 ÌÌÕ?.WÕ;.WÕ7.WÕ3..ú.è.ö.øY[_t..ò 000000
D1D9D1D8 D1EFD1DA D1D9D1D8 D1EFD1DA D1D9D1D8 D1EFD1D8 CA800374 07C2F601 .-õ.t..ò.ÌÿÌÜÌÌÌÕÌÿÌÜÌÌÌÕÌÿÌÜÌÌÌ 000020
22A1F588 ED339752 F6F73877 F0380475 D2085C73 D638FF33 0828368B FF08E90A ÕÕ...ó(.3.;øs\.øu.;Þw;X-R.3Ü.XÀ" 000040
E7F70874 C0080826 A1EA13F0 03E7F706 74C00808 24A150F2 88E7F704 74C00808 ..ât.XÓ. PÀ$..ât.XÕ.Þ.õÀ&..ât.XÓ 000060
1308241E [illegible] 034F1373 93919295 E81B5000 18CE180A F75A9200 D283E803 .Õ.ø..ZXÕ.ö.Ì].Õ....s.O..".. $.. 000080
1308261E [illegible] 03082606 1808241E 1808220E 284FC3ED 73082816 13082606 .&...(.sÜÙO+."...$...&...$...&.. 0000A0
08330820 A3100C0F 2406458A 081EA310 0C0F24E4 3206448A C9E8F508 221688C2 ó..".XSè.D.20$...È...E.$...È .3Ü 0000C0
DA13C803 E2F70674 D2080255 880488CA 88E888E1 F708E30D 88911AE3 0C88E888 .$..D....D.XÀ.Õ.ò...U..øt.Xä.à.Õ 0000E0
08024488 50C10858 D501DA13 C803E2F7 08740208 15880E74 C0080244 88ED3355 U3Ü.D..ât....øt.Xä.à.ÕÌÌX.èP.D.. 000100
F70874D2 08045588 0F74C008 0488C933 EA130803 E2F70674 D2080255 880074C0 ât..U..øt.Xä.À.õ3è...ât..U..øt.X 000120
C3085800 D183EA13 D803E2F7 0974D208 15880F74 C0080444 88D1D1EA 130803E2 à.À.õÌÌ.D..ât....øt.Xä.À.õ.Ì.X.ú 000140
880833CA 13E80308 1E26F708 74C00805 88CA13E8 03082026 F70874C0 08048850 P...ât.X& ..Õ.ò...ât.X&...Õ.ò3Ü. 000160
08025588 1074C008 04448803 D1CA13E8 03E2F708 74020804 55880F74 C0080244 D..ât..U..øt.Xä.Õ.òÌÆ.D..ât..U.. 000180
44880A13 C803081E 26F70874 C0080245 88ED3355 000383CA 13E803E2 F7097402 øt.Xä.Õ.ò.Æ.U3Ü.E..ât.X&...à.Õ.D 0001A0
13C803E2 F70874D2 08045588 1A74C008 044488DA 13C80308 2026F708 74C00802 ..ât.X& ..à.Õ.D..ât..U..øt.Xä.à. 0001C0
081EA0EA 13080308 1E26F708 74C00804 4588EA13 D8030820 26F70444 8805D1DA ÕÌÌ.D.X& ..Ä.õ.E..ât.X&...Ä.õ... 0001E0
```

```
Dump of file SATURN:[PCCOMMON.DUMP.DLL]DML.TMP;1 on 18-APR-1990 10:44:35.23
File ID (622,20,0)   End of file block 171 / Allocated 172

Virtual block number 141 (0000008D), 512 (0200) bytes

 D7D1D3D1 D1D1E2D1 D7D1D3D1 D1D1E2D1 D7D1D3D1 D1D1E2D1 5A97C503 082026F6 -& ..é.ZîâlllÆlaîâlllÆlaîâlllÆla 000000
 CC36FF4C 74ED0B50 77F53B04 C0EE8108 74F60B08 2B36B800 082A06C6 C3F60B5E ^.-ú6.*...6+..-t..Ÿá.;%wP.ÚtL.6ä 000020
 09CC06C7 58595A58 505FFC3E E8D233C9 33DB3357 55535251 50082D09 CC06C709 .ú.ä.-.PQRSUW3Û3è3Ò>=_][ZYXú.ä. 000040
 D233C933 C033FC1A E909CC06 8F58595A 585D5FF8 D1E8FF33 57555352 51500835 5.PQRSUW3.Ól«_][ZYX..ä.Ò.=3à3è3Ò 000060
 33082DBF F8F8E857 55535251 50083509 CC06C709 CC36FF08 2AA2FF33 ED330B33 3U3Ú3.Å*..6ä.ú.ä.5.PQRSUWÓ%«-.3 000080
 0C74011B DD87F608 8A98078A 26065EC4 565704EC 83EC8B55 00C6EBAB ABABABC0 å      $6.U.&.&.WVá^.&....Ä-.ì..t. 0000A0
 8B98058A 2647F888 16740065 3D98078A 26065E88 07E80020 0598078A . ^65E88 .^.&.... .$..^.&...=e.t..«G&.... 0000C0
 5E882E07 C626U646 FFF08898 078A2606 5EC40846 8C067E89 F275041B DD 7F6D8 Å-.ì..u·.-..F.á^.&....Þ.F.&6...^ 0000E0
 8B55C85D E5885F5E FC7E89E9 75C00A06 46FFF78B 078826C6 88F88898 078 2606 .&....%.6&...%.F..àuÕ.-=^_.[]ìU. 000100
 8B08468C 067E89F3 75003D80 26470774 2E308026 9008EB06 7EC45657 06ECB3EC &.&.WVá-.$..&.=.t.G&.=,uw.-..F.. 000120
 30802647 07744530 80260074 65308026 900EEB06 7EBB6774 003FB026 0646FFDF Ô.F.&.?.tg.-.$..&.=et.^.=Et.G&.= 000140
 3080264F 9002EB06 7E8BFE56 89FC4689 064EFFC2 8CC78808 468C067E 89ED7500 ,uU.-..F..ú.6.N..F=.V±.·.$..O&.= 000160
 065EC406 46FFFC76 C5FA5E8C 064EFF03 752E3F80 260F8808 468C067E 89F97430 0t'.-..F..Ô&.7.u..N..^'év=.F.á^. 000180
 9A1E821E 8DEC8855 90C850E5 885F5EFA 5E8EFE5E 8CFC7689 F275C00A 078826AC ˜&...àu·.v=.^±.^'^_.[]ù.U.&..... 0001A0
 83EC8855 C850C028 C8500001 88057238 8314029A 385F0F62 9A065EC4 385A0F82 ..Z86^..b._8....8r¯¦..]ú+à]ìU.&. 0001C0
 1EF088F8 88085EC4 04C48338 A746F09A 0C76FF0E 76FF2474 00067E83 565708EC &.WV.-..t$¯v..v..ÞFÌ8.á.á^..«.Þ. 0001E0

Dump of file SATURN:[PCCOMMON.DUMP.DLL]DML.TMP;1 on 18-APR-1990 10:44:35.23
File ID (622,20,0)   End of file block 171 / Allocated 172

Virtual block number 142 (0000008E), 512 (0200) bytes

 8BF87E8D 04C48338 C146F09A 0C76FF0E 76FF90C8 5DE5885F 5E1FA5A5 A5A5DA8E .ÖEEEE.^_.[]ù..v..v..ÞFè8.á..-%. 000000
 5DE5885F 5E393D10 D59A085E C438C90F 829AF85E 8D1FA5A5 A5A5DA8E 1E0716F0 Þ....ÖEÈÈÈ..^%...è8á^..[.=9^_.[] 000020
 5EC4FA56 89F84689 217C1688 217AA147 74000844 3E805657 0AEC83EC 885590CB ù.U.&.&.WV.>D..tGÀzI..|I.F%.V̄'á^ 000040
 067E000E 7E83FE56 89FC4689 0C56880A 4603C028 02E80001 8805752D 3F8326F8 %&.?-u.¦..$.+à.F..V..F=.V±.-..-. 000060
 260677FF 26065EC4 58E806C4 83045DE8 0EFC76FF FE76FF50 C02B9003 E80001B8 ¦..$..+àP.v±.v=.Ò]..á.$Xá^.&.w.& 000080
 8350400E 46885052 FA5689F8 468908C4 83397B4B 289A37FF 260277FF 260477FF .w.&.w.&.7.(K(9.á..F%.V'RP.F.ƏP. 0000A0
 C703C028 02E80001 8805752D 3F8326F8 88F85EC4 C02B02EB 0001B805 7E000E7E -..-.¦..$.+àá^%.Y&.7-u.¦..$.+à.ú 0000C0
 26F85EC4 FE5689FC 46890C56 880A4688 0AC48339 D547469A 50520C56 880A4603 .F..V.RP.FG(9.á..F..V..F=.V±á^Y& 0000E0
 FF078826 01478A26 FC5EC414 7E000E7E 832007C6 26FC46FF FC5EC40A 752D3F83 .7-u.á^=.F=&6.-.-..-.á^=&.G.&... 000100
 FE5688FC 46030E46 0308F7C0 18010844 3E80501E 083E882E 07C626FC 5E88FC46 F=.^=&6..¦>..P.>D...á%Ä.F..F=.V± 000120
 FC46FF45 07C626FC 5EC40774 00107E83 FE5689FC 468908C4 83380F07 A29A5052 RP.Å..;.á..F=.V±.-..t.á^=&6.E.F= 000140
 C4F08808 F7087DF6 08F08848 02478826 F85EC45E 74303F80 26065FC4 26F85EC4 á^Y&á_.&.70t^á^Y&.G.H.Þ.-).%Ä.Þá 000160
 F799C688 070026FC 5EC4F9F7 0064B999 C688157C 64FE83FC 46FF2007 C626FC5E ^=&6.¯.F=.±d|..6.¿d.%'á^=&...6.% 000180
 F288F9F7 99C68807 0026FC5E C4F9F700 0AB999C6 88157C0A FE83FC46 FFF288F9 '.·.F=.±.|..Ò.¿..%'á^=&...6.%'.· 0001A0
 06C604EC 83EC8855 90C850E5 885F5E0C 56880A46 88070026 C688FC5E C4FC46FF .F=á^=.6&...F..V.^_.[]ù.U.&.&.6. 0001C0
 C6FE5689 FC4689FE 49E80E06 76FF0876 FF0A76FF 0C76FF0E 76FF1076 FF010844 D...v..v..v..v..v.¯v..Ò!±.F=.V±6 0001E0

Dump of file SATURN:[PCCOMMON.DUMP.DLL]DML.TMP;1 on 18-APR-1990 10:44:35.23
File ID (622,20,0)   End of file block 171 / Allocated 172

Virtual block number 143 (0000008F), 512 (0200) bytes

 217C1688 217AA151 74000844 3E8000F2 46C612EC 83EC8855 C850E588 00084406 .D...[]ìU.&.$.6F·..>D..tOÀzI..|I 000000
 89FC4689 0C56880A 4603C028 02E80001 8805752D 3F8326F4 5EC4F656 89F44689 .F¶.V-á^¶&.?-u.¦..$.+à.F..V..F=. 000020
 07C626EE 46FFEE5E C4F05689 EE468908 460603FC 46886A75 0E463908 46A1FE56 V±ÀF.9F.uj.F=..F..FŸ.VÞá^Ÿ.FŸ&6. 000040
 3F4B289A 37FF2602 77FF2604 77FF2606 77FF2606 5EC44AE8 0007C626 EE5E8830 0.^Ÿ&6..$Já^.&.w.&.w.&.w.&.7.(K? 000060
 0001B805 75203F83 26500E46 030247B8 26F45EC4 5052F656 89F44689 08C4833B ;.á..F¶.V-RPá^¶&.G..F.P&.?-u.¦.. 000080
 FE5689FC 46890C56 880A4688 0AC48329 EE47469A 50520C56 880A4603 C02802EB $.+à.F..V.RP.FGŸ).á..F..V..F=.V± 0000A0
 0001881D 7F00027F 8326F45E C42007C6 26FC46FF FC5EC40A 75203F83 26F45EC4 á^¶&.?-u.á^=.F=&6.-á^¶&......¦.. 0000C0
 478826F4 5EC40AE8 3007C626 FC46FFFC 5EC406C4 830205E8 0EFC76FF FE76FF50 P.v±.v=.Ò...6.á^=.F=&6.O$.á^¶&.G 0000E0
 46FFFC5E C406C483 01D8E80E FC76FFFE 76FF5000 01B8687E 000E7E83 FC460102 ..F=.-..-h¦..P.v±.v=.ÒÄ..á.á^=.F 000100
 8B260EE8 D8F70247 8B260874 0008443E 80437D00 027F8326 F45EC42E 07C626FC =&6..á^¶&....)C.>D..t.&.G.%Ä$.&. 000120
 0E76FF06 C4830196 E80EFC76 FFFE76FF 500E4689 0E468803 7E0E4638 D8F70247 G.%Ä;F.-..F..F.P.v±.v=.Ò...á..v. 000140
 83EC8855 C850E588 0C56880A 468808C4 833C560A 249AFC76 FFFE76FF 50003088 ¦O.P.v±.v=.$.V<.á..F..V..[]ìU.&. 000160
 FE5689FC 4689FE6E E80E0676 FF0876FF 0A76FF0C 76FF0E76 FF010844 06C604EC &.6.D...v..v..v..v..v..Òn±.F=.V± 000180
 0277FF26 0477FF26 0677FF26 065EC456 06EC83EC 885590CB 5DE58800 084406C6 6.D...[]ù.U.&.&.Vá^.&.w.&.w.&.w. 0001A0
 83260846 A3480247 8826217A 1EC4217C 1689217A A308C483 3C924828 9A37FF26 &.7.(K.<.á.Èz!..|Ìá.z!&.G.HÈF.&. 0001C0
 9A50520E 76FF5306 FE5689FC 46890C56 880A4603 C02B9003 E80001B8 0675203F ?-u.¦..$..+à.F..V..F=.V±.S.v.RP. 0001E0
```

```
Dump of file SATURN:[PCCOMMON.DUMP.DLL]DML.TMP;1 on 18-APR-1990 10:44:35.23
File ID (622,20,0)   End of file block 171 / Allocated 172

Virtual block number 144 (00000090), 512 (0200) bytes

89084BA2 C02A02EB 01B0047D 08463639 4E02778B 26217A1E C40AC483 30924746 FG.=.á.á.z!&.w.N96F.).^.$.*äÄH.. 000000
76FF0876 FF0A76FF 0C76FF0E 76FF1076 FF1F7F0E 4639C68B 077CFCFE 83084636 6F..±•|..69F....v..v..v..v..v..v 000020
00FF7C80 46FC76C5 FA5E8C1E 74000848 3E8090CB 50E5885E 0CC483FD 93E80E06 ..Ò.=.á.^.[]ù..>H..t..^*évF.|.. 000040
FF0876FF 0A76FF0C 76FF0E76 FF00FE47 C626FC5E C4FA5E8E FE5E8CFC 7689F975 u*.v=.^±.^*á^•&óG±..v..v..v..v.. 000060
1276FF19 75450E7E 83067465 0E7E83EC 8855C850 E5885E0A C483FEF6 E80E0676 v..Ò-±.á.^.[]ùU.$.-.et..-.Eu..v. 000080
FF1076FF 1875660E 7E839035 EBFB8FE8 0E0676FF 0876FF0A 76FF0C76 FF1076FF .v..v..v..v..v..Ò.«$5..-.fu..v.. 0000A0
0A76FF0C 76FF1076 FF1276FF CB500AC4 83FD39E8 0E0676FF 0876FF0A 76FF0C76 v..v..v..v..Ò9».á.]ù.v..v..v..v. 0000C0
9A0676FF 0876FF29 74000A7E 83EC8855 90CB5D0C C483FEC0 E80E0676 FF0876FF .v..v..Òä±.á.]ù.U.$.-..t).v..v.. 0000E0
83385249 E09A5052 08568B06 46030A46 880676FF 0876FF50 4004C4B3 30AD0802 ..Ù=.á.ƏP.v..v..F..F..V.RP.ÄIRB. 000100
8908E808 5C09CC06 C7087412 7703F883 D88E1EEC 88554590 D88CC888 CB500AC4 á.]ù.à.Ä.EU.$..Ä.«.w.t.ú.ë.\.$.. 000120
4E8FF388 C8F3F60C B3085C20 09CCA1C8 4D501FE5 8802ED83 F8084C16 89084A0E .J...L.%.Ü..[.]MùÀë.-\.°.-µù.µ¢N 000140
FCD88EC1 8ED98CC0 8C084EBF F388C308 4E8ED98E A5A5FCD8 8EC18ED9 8CC08C08 ..á.\.ë.Ä=ÉÉ.\/N.û.µ¢N..á.\.ë.Ä= 000160
54880C88 C033FCFC 758803E8 07FE45C6 FC7D89FC 7588C308 4E8ED98E A5A5A5A5 ÉÉÉÉ.\/N.û.u=.)=6É±.$..u••3á...T 000180
40890245 89D8D109 01FAD108 D1D901FA D1D8D109 01FAD105 8925747F 80C2F702 .%ó..t%..!°!!!ÄI°!!!ÄI°!!!Á.E..N 0001A0
08720828 DC885A59 C3064589 04458902 45890589 C3065589 3800C281 8FE68004 ..|..ó.B.U.ù...E..E..E.ùYZ.É+Är. 0001C0
02021601 09CE2EFF 5152C1C7 E9C03305 754009CE A1C85152 E3880572 09D21E38 ;.@.r..DRQùÀö.Əu.3áÕùèRQ..ö..... 0001E0

Dump of file SATURN:[PCCOMMON.DUMP.DLL]DML.TMP;1 on 18-APR-1990 10:44:35.23
File ID (622,20,0)   End of file block 171 / Allocated 172

Virtual block number 145 (00000091), 512 (0200) bytes

02350212 12110010 120F1600 160C0808 070A0C09 0C080C07 09060005 18 :0203 ..............................5. 000000
08A40084 09820A81 0A801606 09721C70 2060006C 08590057 00530052 024.0041 A.C.R.S.W.Y.l.m p.r...........Ê. 000020
E58899FF FFB80008 E8C850E5 8899FFFF 88058616 8905BDA3 16080000 08D702CE ö.ø.....È§...Ñ.¡....[]ùÒ..¡....| 000040
0A76243C 0472133C F7E24343 1674073A 2E1875E4 0A0024B9 3E8CB805 BDA3CB5D ]ùÈ§.£.>¿$..ðu..:..t.CCã%<.r.<$v. 000060
2D04468B 1BC606FF 000004C8 00C305B6 A3980147 8A2E4301 76CA3C04 728C3C43 C<¥r.<òv.C..G..ÈÑ.û.à.....ó..f.- 000080
FD263F9A 020068FE 5E8CFC46 8915C805 E001C103 E001C888 F9F7000C B9990904 å..¿..X*.à1Á.è1Á.à..F=.^±h...?&» 0000A0
000247C7 26FC5EC4 080A4F80 261174D0 08085789 26064789 26045EC4 02C4833B ;.á.á^.&.G.&.W..Ät.&.O..á^•&úG.. 0000C0
C726FC5E C4085789 26064789 2640FE56 88FC4688 040A4F80 26045EC4 9021E802 .$!.á^.&.O...F=.V±ƏÆ.G.&.W.á^•&ú 0000E0
8855C3C9 00000447 C7260257 89260789 26085788 26064788 26045EC4 00010247 G...á^.&.G.&.W.&..&.W.&úG...èùU. 000100
76FF0A76 FF53CC88 04EC83FF 22E9FF16 E9C03300 09BA0872 058F1E38 065E88EC &.^.;.¢.r.¤..3áÕ..Õ"..&..äS.v..v 000120
83EC8855 00C850E5 88FD05C1 A78091E1 75C0855A 590000FF FF9A5116 0C76FF08 ..v..Q.....YZ.âuÅ..[è.».[]ù.U.$. 000140
4688018A E80C4E88 52520233 52F8568D 1652FE56 80160676 FF0876FF 40870EEC $.ñƏ.v..v...V±R..VYR3ØRR.N.Ò...F 000160
0676FF08 76FFFE46 8D5002CA 80227402 00A92A75 0400A910 CA800874 0100A90A .`..t..ò.`..u*`..t".ò.P.F±.v..v. 000180
50C70A00 03255251 01CA8003 E8FE4E88 087558C0 850000FF FF9A5050 C0335016 .P3áPP......âXu..N±$..ò.QRX...úP 0001A0
FE68E900 118A0374 00028AF0 C2F60E75 006E3016 74C00800 00FFFF9A 5050C033 3áPP......ât.=n.u.-ôbo..t.¤..Õh± 0001C0
F45E8D16 50008BE4 EBC03300 188A0000 26199A50 007205BF 0638FE46 88008DE9 Õ...F±;.¢.r.P..&..¤..3áŠÕ.ÂP..^¶ 0001E0

Dump of file SATURN:[PCCOMMON.DUMP.DLL]DML.TMP;1 on 18-APR-1990 10:44:35.23
File ID (622,20,0)   End of file block 171 / Allocated 172

Virtual block number 146 (00000092), 512 (0200) bytes

06F60775 4000A90E 758000A9 C9330A46 886175C0 08000014 F69A50F8 46801653 S..F¥P.-....âum.F.3è`..u.`.Əu.-. 000000
08F446C6 0775023C 008EE940 F446C607 75013CF4 468AF24E 88808102 75801D8F ...u.Ý..N`.F¶<.u.óF¶Əò..<.u.óF¶. 000020
46801651 00028951 51FFFFB9 52737400 020A46F7 7A74C90A F44688C0 320083E9 Õ..2á.F¶.èt±%F...tsR¿..QQ¿..Q..F 000040
00018850 F6468D16 524FE8C0 33FDE4E9 03740083 300C74C0 0800003F D79A50FA *P.m?...ât.=..t.Õð»3áŠOR..F-P¡.. 000060
8301FA6E 83521875 1AF67E83 3274F846 392375C0 080000FF FF9A50F8 46801650 P..F¥P......âu#9F%t2.—.u.R.n*.. 000080
40F39A50 FA468016 505050C0 33528E75 C0080000 FFFF9AFA 76FFFC76 FF00FC5E ^•..v•.v*......âu/R3áPPP..F*P.µƏ 0000A0
40379A50 50C03350 F8468016 0676FF08 76FF2875 48C1F6F4 4E8AAA75 C0080000 ...âu`.N¶-èHu(.v..v...F¥P3áPP.7Ə 0000C0
D888C288 01C980F2 4E0A20C9 80037400 080A46F7 10C98003 740001F8 46F70000 ..%F%..t..è.%F...t..è .N`.è..ó.Ä 0000E0
08EC83EC 885500C3 01C98003 7580A8C9 33C123D0 F705B8A1 C850E588 05C18F88 ..è..[]ùÀ¡.%Å#ë3è`.u..è.û.U.$.&. 000100
087EC40C 4E880233 57457502 05C187F6 4CE30C4E 883F7305 8F1E3806 5E88C033 3á.^.;.¢.s7.N.DL-.è..uEW3Ø.N.á-. 000120
5016FA46 80515706 530A06C1 87C64942 AA08740A 3C06C187 8A107408 05C187F6 -.è..t...è.<.t.`BIó.è..S.WQ.F*.P 000140
C850E588 04758005 C187F6C2 03FA4688 FCD8E900 098A0674 C0085F00 0041179A ..A..`.ât.¤..ÕÄ•.F*.ò-.è..u..[]ù 000160
AC0405C1 8F802606 750A3C80 008428E3 C888FE88 0876C507 1E5756F8 05C1A780 .[è.«Ṽw..év..±.ÀO(Ç..<.u.&..è..` 000180
E5885E5F 1F060846 28C788EA E2470588 05E80205 C18F8026 08751A3C 1E74C43A :ât.<.u.&..è..$...Gãõ.ú+F....^.[ 0001A0
5016F946 80531C75 D8082474 4005C187 F626E2E8 E7740A3C 80077401 F983C850 ]ù.*.t..<.tÒŠá&-.è.Əť$.Uu.S.F*.P 0001C0
805300F9 46C686E8 0A80FC61 E95E5F1F 060774C0 08000041 F19A5016 FA468051 Q.F*.P.þA...ât..._^Õa•`.ŠÑóF*.S. 0001E0
```

```
Dump of file SATURN:[PCCOMMON.DUMP.DLL]DML.TMP;1 on 18-APR-1990 10:44:35.23
File ID (622,20,0)   End of file block 171 / Allocated 172

Virtual block number 147 (00000093), 512 (0200) bytes

 3574010C 7E833674 FFFFFA46 F7DC75C0 08000042 779A5016 FA468D51 5016F946 F*.PQ.F*.P.wB...åuÉ%F*..t6.-..t5 000000
 750AF97E 8000J041 4E9A5016 FC468D50 D8F75050 FFFF8853 1C750805 C187F626 &-.è..u.S|..PP%AP.F=.P.NA...-*.u 000020
 88550099 EBC5750A F97E80FF 58E900B0 02740A3C 06C18788 26F9468A FF6FE90F .Õo..F*&..é.<.t.¯.Õ[.. *.uéS..U. 000040
 51C93353 127420^5 C187F6F8 D3E9C033 0009BA08 7205BF1E 38065E88 0CEC83EC &.&..^.;.€.r.¤..3àÖ€«-.´ t.S3èQ 000060
 C0330856 C50A468E FA5E8C66 748005C1 87F60000 42C79A50 16F4468D 51414151 QAAQ.F¶.P.úB..-.è..tf.^*.F.éV.3á 000080
 DC8802EC 83387SA: F20AB049 E30C4E88 F86689F2 88FA8856 57FCFC46 89FE4689 .F±.F=•WV.*.·.f%.N.DI¯.·Óu;.&..É 0000A0
 009AE900 28E8F4E2 AA1A74F8 3800740A 3CAC0C4E 880716FA 88D488E2 2800808A ¤..+ã.å.*...N.^<.t.;«t.¨å¶Ó+.Ô.. 0000C0
 7AEB0093 E9FA5E8E 5F5EE1E8 0014E8E2 E8FC46FF 0A80AA00 1FE80375 F8380080 ¯.;«u.Ò..¨¯..F•ŠãÒ..ŠÄ^_.^*Õ..Šz 0000E0
 5016F446 8051521E 53065E88 1FE3CA28 CF881F06 1E515350 3F4F3E68 9AFFFC88 ¡•..h>O?PSQ....ü+òD..^.Š.RQ.F¶.P 000100
 C00B08C4 831FC3FA 88585859 1F0774D8 08FE5E01 F45E8811 75C00800 00012A9A .*....âu..^¶.^±.Ût..Y[X.*û..á..å 000120
 C187F6FE 5E8E26E8 F900208A 03EB001C 8A087500 098A0001 30007400 603D1874 t.=m.t.=..¤..u.¤..Š.¤ .*$&.^±-.è 000140
 FC4628FE 468806E8 F9C03300 1CBA0EE8 F803751A 3F80085E 880A5E8E 0E744005 .ât..^..^..?.u.%Š.¤..3à*Š..F±+F• 000160
 0856C51E EEE8C188 0475C908 0C4E88FA 87E9C850 E5880472 FA5E8E5F 5EF86688 .f%^_.^*r..[]üÕñ*.N..èu..èŠ¥.éV. 000180
 00098A00 01300074 00603017 74C0081F 071E0000 43819A50 16F4468D 51521E53 S.RQ¯F¶.P.¥C......ât.=m.t.=..¤.. 0001A0
 1A3F8026 DA880A74 4005C187 F68775C0 08F44688 C2E80020 8AC7E800 1C8ACC75 ua¤..Šú¤ .Šô.F¶.âuñ-.è.ât..Ö&.?. 0001C0
 8855C850 E58801FE 4F800474 D808065E 88EC8855 00A3E8C0 33001C8A A6E80275 u.Š|¤..3àŠÈ.U.&.^..Ût..O±..[]üU. 0001E0

Dump of file SATURN:[PCCOMMON.DUMP.DLL]DML.TMP;1 on 18-APR-1990 10:44:35.23
File ID (622,20,0)   End of file block 171 / Allocated 172

Virtual block number 148 (00000094), 512 (0200) bytes

 18C8A3FE 244024E8 99C03305 750176E8 00058807 1E297500 3F831BC8 885756EC åVWEà..?.u)..¡..Õv.u.3á.Š$ã$±Èà. 000000
 5E5F0009 E8C08ED8 8C064E88 18CE3689 FFFEFE44 C704C683 000104C7 961BCAA3 Èò..ú....ó.úD±±..óö..N..Ä.åÒ.._^ 000020
 C1384843 7401A8FE 88ADFC02 7788F273 EEF983FE E180FA74 410000E9 C85DE588 .[]úÕÄ.At*.Ä±.*Ys·.w.•Ü.±´.tCH;è 000040
 FE4C89F9 030C74FE 88E6E8FE 4489F788 000205C2 03357401 A8ADF003 D0881573 s..Ä.Þܴ.t5.ò....%.D±Š|.±t..*.L± 000060
 C3027F89 18D61E8C 260574D1 38186D89 DA8CC688 FE4CFEF9 0305E805 8948C128 +èH..Š..*±L±.ó.Ö¿m.;|t.&..•....û 000080
 ADF00300 888C73C1 3848FE88 F27401A8 ADF003FE 882574FF FE3D0218 DA06C626 &ó.Ö..*±.t%.±.Þܴ.t·.±H;èsV.Ä.ÞÜ 0000A0
 18DA0EFE 2615E808 8E0474C0 08084788 E6E8FE44 89F78800 0205C203 E27401A8 ´.tã.ó....%.D±Š|.G..ât..ÄŠ.&±.Ö. 0000C0
 0074C638 0068E8C0 33067788 88E83788 18D21E8E 260574C7 3845218F D88C1274 t..Ä€|E;út.&..•..7ŠE.w.3àÒk.;ót. 0000E0
 0474C138 45758908 8C98E84E 4E960574 001DE8FE 4DFE0074 005FE898 40400124 $.ãã.Ö_.t.±M±Ò..t..NNŠ..Ä¿uE;èt. 000100
 1638267F FF8A4141 49C82803 7401A8FE 458851C3 99C03302 47890788 1806A326 &E•....G.3á.úQ.E±´.t.+åIAA¤..&;. 000120
 D102F708 75000CE8 C628C223 02F70072 C2031572 C603C188 F575EAD1 047618D8 Ä.v.[õu%.ê.ór..ór.%•#ô+6Ò..u.%•| 000140
 28068806 7789FFFE Fε44C7F2 03F088FE 88571874 001DE851 52C359C0 33E575EA õu|3àYûRQÒ..t.W.±.Þ.·úD±±..w..•+ 000160
 8308C483 4396463A 9A1F0650 00018850 52521ED2 335053C3 5A5958FE :.¯94AD7 •J.U±XYZúSP3•.RRP|..P...:F.C.á.. 000180
 48064688 08568801 5E8F3875 000A7E83 065756EC 8855C302 0802745B 5A ¯FFFA *..Z[t..•ûU.ŠVW..-..uB€^..V..F.N 0001A0
 735E003E E8560E46 89024488 0074F738 11744805 5E36884C E8277200 57E.0775 u.ÒW.r'ŠL.6^.Ht.;%t..D..F.VÒ>.^s 0001C0
 FFFF9A50 C0335016 52C48850 21E899FF FF880675 D2080473 055EFE81 04C68334 4.6..±^.s..•u.|...ŠIP.áR.P3äP... 0001E0

Dump of file SATURN:[PCCOMMON.DUMP.DLL]DML.TMP;1 on 18-APR-1990 10:44:35.23
File ID (622,20,0)   End of file block 171 / Allocated 172

Virtual block number 149 (00000095), 512 (0200) bytes

 880E4E88 C85DE588 5E5F07C0 33038805 5E368902 5C891489 E675C085 F9580000 ..[*.åu|...\..6^..Æ3á._^.[]ü.N.. 000000
 0675F738 C18ED388 26721C03 DA882CE8 F9F27505 5EFE8104 C6830C74 024C39F7 %9L.t..ó..±^.u·*$,.Õ..¯F&.Æ.è;%u. 000020
 00C3D188 04879201 58168904 75F73B0E 75C08500 00FFFF9A 51531373 01581E39 9.X.s.SQ......åuB;%u...X.....|ú. 000040
 08468C06 7E89F275 08180087 F6D88898 058A2647 9002E806 7EC45657 000000C8 à...WVá-.Š..G&....Ä-.[..u·.-..F. 000060
 7E8F0008 050AC483 462A4C71 9A570876 FF5004C4 83472608 029A5706 006A006A j.j..W...&G.á.P.v.W.qL*F.á....€- 000080
 88064688 56570000 0AC8C8C9 5F5EDA8C 217E881F A5A5A5A5 DA8E1E07 1EF08821 |.Þ....ÖEEEE.|-|.Ö^_èúå...WV.F.. 0000A0
 26F846FF F85EC4FE 5689FC46 89085788 26064788 260C5EC4 FA5689F8 46890856 V..F%.V*á^.&.G.&.W.¯F•.V±á^%.F%& 0000C0
 8A26FC46 FF097400 3F8026FC 5EC4F876 C5F65E8C 0A4E882E 7E000A7E 833007C6 6.0.-..-..N..^-évHá^=&.?.t..F•&. 0000E0
 7E830007 C626F85E C40A4E89 F65E8EFA 5E8CF876 89E7E246 04883080 9003E807 .Š..¯0..Fãö.vH.^*.^-.N.á^%&ó...- 000100
 74393080 264F3005 C6269006 E8F87EC4 F84EFF1F 7C353F80 26FC5EC4 287C000A ..|(á^•&.?Š|..N%á-%Š..&ó.OO&.=9t 000120
 468815E8 0247FF26 0C5EC409 75313F80 26065EC4 07FE260F 88FA468C F87E89F5 %.-%.F*.Ó&±.á^.&.?1u.á^.&.G.Š..F 000140
 835756EC 88550000 90C8C95F 5E08C483 471907A2 9A0676FF 52505240 08568806 ..V.ãRPR.v..Ä..G.á.^_èù...U.ŠVW* 000160
 E8000188 05744005 C187F60C 7C00F883 1170058F 1E38065E 88EC8855 0296E900 .Ö..U.&.^.;.€.)..«.|¯-.è.ât.|..Š 000180
 12681E56 000006C8 C8218606 FF0005E8 0E087500 21863E83 00C85DE5 88C03302 .3á.[]ù..>.|.u..Ò.....|ùå...V.h. 0001A0
 E9037500 3F8026FA 5EC400A8 E90375D0 08FC5689 FA468904 C4834881 48889A1D ..|K.H.á..F*.V=.Äu.Ö´.á^*&.?.u.Ö 0001C0
 FF03FA46 830E1068 006A0AC4 83489808 1A9A1D24 36FF1D26 36FF5006 036A009C ..j..P.6&..6$.....H.á.j.h...F*.. 0001E0
```

```
Dump of file SATURN:[PCCOMMON.DUMP.DLL]DML.TMP;1 on 18-APR-1990 10:44:35.23
File ID (622,20,0)   End of file block 171 / Allocated 172

Virtual block number 150 (00000096), 512 (0200) bytes

FA5EC4F6 2B1D2016 891D1EA3 48F02BF0 9A505204 C48348A2 4BB49AFA 76FFFC76 v=.v*.ÇKÂH.á.RP.Þ(ÞHÊ.... .+-á^* 000000
03FE8346 06752038 8026FA5E 8B097504 1B0087F6 DB889B00 8A261C74 00388026 &.8.t.&....Ä-.Ï..u..^*&.8-u.F.±. 000020
081A9A1D 2836FF1D 2A36FF50 52C603C2 8CC38B03 6A1D7400 388026FA 5EC4DB7C |Üá^*&.8.t.j..ù.ô.ÓRP.6*..6(.... 000040
C95E1D22 A34J 11B 013F8026 1D281EC4 0007C626 1D281EC4 9009EB0A C48347FE ±G.á.Š..á.(.&ó..á.(.&.?..ãaÉ".^è 000060
832600AD E903/E09 087F8326 0087E903 7D03087F 8326065E C4560000 06C890CB ù.à...Vá^.&....).Õñ.&....-.ÕU.&. 000080
7F832617 7E07C2FE 81076CC6 810A7788 260081E9 037D0908 7F83260A 7E03087F ...-.&....).Ö..&.w..6l..±ô.-.&.. 0000A0
FA8788E3 D1085F88 26065E88 900EEB00 07051CF8 8788E301 085F8826 10750308 ..u.&._.10..%....Š...^.&._.10..* 0000C0
F9F70004 B9990144 8D46EE83 0A778826 065EC4FA 46FF0375 0003C6F7 FA46891C ..F*%ó..u..F*á^.&.w..ÝF.D..¿..%* 0000E0
7503087F 8326FE46 89C22BFA 4688F9F7 00078999 000405C1 03016DCE 69FA4603 .F*iöm..é....¿..%*.F*+ô.F±&....u 000100
0E473926 FE468806 5EC49018 E8000188 187C0204 7F832622 75097F0E 47392615 .&9G...u"&....|.¡..Š..á^..F±&9G. 000120
56571E00 85E90375 C90B0E4E 88EC8B55 C8C95EC0 28E57C01 047F8326 0775EE7C |Vu.&....|Ì+ã^éüU.&.N..èu.Õç..WV 000140
F1034950 73000A83 C1285778 D2080E4E 88485427 AA9A5706 561E067E C40A76C5 év.á-..V.W.`'TH.N..ØxW+ê.Ö.sPl.þ 000160
C703C323 DB1BC728 48C18841 C08E4A15 05C08C07 73F90308 8E0ED405 D88C0773 s..Ä.å..Ä.*s..â..J.àA.èH+ú.Uªú.ú 000180
83D88E4A 2020088C 0775FFFE 835CE391 FCA4F3FD C1289140 C603C323 DB1BC628 +ô.Uªú.ôa.+è»µÉ•.D\.±.u..Á- J.Á. 0001A0
D2F7D688 C203C323 DB1BC228 D2F7D788 48C188C8 E8C08E4A 4B2DC08C D175FFFF ..ul.á-KJ.àŠà.èH.ª%@+ô.Uªú.ô.ª%@ 0001C0
4A5705D8 8C0775F6 0B18E391 A4F3C913 A5F3E9D1 C1289140 C203C323 DB1BC228 +ô.Uªú.ôa.+èlÕµÉ.èµÉ.D..-u..Ä.WJ 0001E0
```

```
Dump of file SATURN:[PCCOMMON.DUMP.DLL]DML.TMP;1 on 18-APR-1990 10:44:35.23
File ID (622,20,0)   End of file block 171 / Allocated 172

Virtual block number 151 (00000097), 512 (0200) bytes

0646B80E 4E8BC85D 08568806 46881F5F 5EBEEBC0 8E4A8E05 C08CC775 FF08D88E .Ä..uú.à..J.à$/^_..F..V.)ù.N..F. 000000
D2830BF7 AA20800A 79D2080E 750AF983 1374C00A 93FC071E 570A7EC5 1E08568B .V..é-.W..=..àt..*.u..@y.¯-`%U.@ 000020
08C288AA 27040276 393C3004 038792F1 F793F1F7 0274C008 023392F7 88DAF700 .%Ö.%.30.àt.%þ.%þ..&.0<9v..'`.ò. 000040
078A00C8 5DE5885E 5F1F580A 8CF272C7 38014480 FF448805 86AC4F05 88E275C3 ùuã..O¯...D..D.;úr·.ÖX._^.Ï]ù... 000060
D88CFC57 56EC8855 C8580000 443A9A53 1650521E 51000289 0C885301 578DE42A *Ö.W.S.É¿..Q.RP.S.:D..[ÜU.$VW*.Á 000080
9198ACC8 881D7A8F 5D020FE8 551D728E A536A536 A536A536 1D728F06 768DC08E .à.v.er.6É6É6É6É/r.UÒ..]¢z..à¯.. 0000A0
885E5FC7 880A8C08 5D8C1D7A 0645C704 4D890255 891D89FF 3210688F AA91A4F3 µÉ.`¢h.2....U..M.úÉ.z..]..Ö.ú_^. 0000C0
0E74830A 47F626FA 5EC41CEB F62BFC5E 8CFA4689 09D48856 000006C8 00C850E5 Ì]ù.à...V¦à..F*.^•+-Š.á^*&-G..t. 0000E0
C6880876 FA46391B C41688B1B C2A10CFA 46834601 744004C4 8349FD1A A09A5306 .S...»l.á.ãt.F.F*.Àô...á.9F*vÄ.ó 000100
46887674 C208FC56 89FA4689 07C91688 07C7A156 000006C8 00029FE9 90C8C95E ^èù.Ö...à...VÀú...è..F*.V=.ötv.F 000120
5EC404FA 46839090 06E8F088 04C4834C 0408029A 0676FF08 76FF6E74 08460806 ..F.tn.v..v.....L.á..ÞŠ....F*.á^ 000140
FA5EC4DD 7EC63804 C4834C2D 08029A37 FF260277 FF264A74 02470826 078826FA *&..&.G.tJ&.w.&.7...-L.á.;ó-Ìá^* 000160
83489527 529A37FF 260277FF 26FA5EC4 0676FF08 76FF5601 753D3880 261FC426 &á.&.8=ulV.v..v.á^*&.w.&.7.R'.K. 000180
335756EC 8855C8C9 5E99C02B 9004EBC2 8C014080 1FC426FA 5EC48475 C0080AC4 á..àuÇá^*&á..ǝ..ôŠ..+à.^èüU.$VW3 0001A0
5DE5885E 5F008940 C9800573 0A763800 1E2506C6 0028E801 1E2506C6 0E5688D8 Ü.V.6.X..Ò(.6.X..;v.s..èǝ.._^.Ì] 0001C0
7664F983 0A4E88C0 8E088CFC C850E588 5E5F0006 E80E5E88 02335756 EC8855C8 üU.$VW30.^.Ò.._^.Ì]ù=.Ä.á.N..*dv 0001E0
```

```
Dump of file SATURN:[PCCOMMON.DUMP.DLL]DML.TMP;1 on 18-APR-1990 10:44:35.23
File ID (622,20,0)   End of file block 171 / Allocated 172

Virtual block number 152 (00000098), 512 (0200) bytes

064E010C 46880676 8910A2BE 0A4E88D8 8EA4F31D A28F0676 C527E8F6 33408106 .Ýǝ3-Š'év.¢Ä.µÉ.Ä.N./Ä..v..F..N. 000000
DA8CC788 06508904 45890275 89008910 908F0A76 03067628 5D0241E8 551D988F ¢..UÒA.]+v..v.¢.....u..E..]..ú.Ö 000020
02E88302 EE830005 890AC383 0AC68316 75C43A80 80250947 8A2E0964 8A5653C3 ÚSV.d...G.X..:áu..ô..û.¿...Ÿ..Š. 000040
D1D0010A D10BD1E8 D10005B9 FF33AD93 AD92AD95 AD56C358 5EF3E107 3B2E0488 ...;.ʵ^(ÚVÜ.Ü.Ü.Ü3.¿..ÌÒÌÜÌÒÌÌÌ 000060
C3084489 065C8904 5489026C 893C895E 03FE2D08 D1F50001 3D0001E3 D1F4E20F Óà¶ÌDÌÂ=..%ÌU-±.^.<.l..Ì..\..D.ú 000080
C0333001 44C60104 C61E12BE FFFDCCCC CCCCCCCC CCCD0000 FFFFFFFF FFFFFC66 f=........èààààààà».ƒ..ô..6D.03à 0000A0
F720837F 07648006 4C885EA5 F3000489 571E068F FCC08ED8 8C06C307 > `00088 .Äǝ[.ù..Ä.á=¢..W¿..µÉ^.L..d..° % 0000C0
883FFE05 ADF88A88 7480A8AC 1E008EFF 33FF78E8 53208302 79C90806 74. `F0C1 èÞ.t..èy.°·SÒ(.3./..¯`.tÉ.%U.±7. 0000E0
5713430F 8112F4E9 81FA13C8 03E7F69A 80D713C8 03E4F64D 8091E2F7 4D1uBAC8 àn.M%ã.¯M-ô.à.ª¯.-Ö.à.*.Ò¶..ÒC.W 000100
AD95AD97 AD575F04 00E84D3A 88574709 725FFF13 E84D3088 0577E81E 068EDFF7 %Ò/..Òw.ÉÒMÒ.. r.GWÉ:MÒ.. WÜ.Ü.Ü 000120
039AD681 56C480F4 E20CD00E D1D001DA D1E8D10C E3C033F7 8809F791 AD93AD92 .Ü.Ü.%l.%3àD.ÌŠÌÒÌÌÌàÀÉã¶.6V.ª.. 000140
D00003D1 D201D5D1 D601E4D0 50565552 5351C032 0010891E 138FD913 D113E913 .Ö.l.lè..¿..2àOSRUVPÀÒÌªÌÌÌªÌÁÀÀ 000160
D1E4D000 14D91359 D11359E9 1359F113 59E50259 D0000301 D201D501 D601E400 ÀÒÌªÌÌÌªÌÁÀÀY.ÌY.þY.ÒY.ÌY.Ì..ÀÒÌ 000180
880C881E 128E12C1 83FCAEF3 FD308049 4F8DE259 AA3004D0 D0030102 01D5D106 ªÌÌÌªÌÁÀÀ.O`Yã§OI O»µÜ=.è./....¡ 0001A0
203C50F7 74093CF8 74203CAC DB3399C0 330676C5 1E5657EC 8855C307 5B5A0001 ..Z[.ÜU.$VV.év.3à.3Ü¯< t«<.t%P<· 0001C0
03D2D1E3 D1D2D1E3 D1FA88C8 88D2D1E3 D1187230 2C1F7739 3CAC0175 2B3C0474 t.<+u.¯<9w.,Or.ÌDÌª.ù.*ÌDÌªÌDÌª. 0001E0
```

Dump of file SATURN:[PCCOMMON.DUMP.DLL]DML.TMP;1 on 18-APR-1990 10:44:35.23
File ID (622,20,0)   End of file block 171 / Allocated 172

Virtual block number 153 (00000099), 512 (0200) bytes

```
 30C98058 CB5D5F5E 1FDAF700 D283D8F7 0775932D 3C58DCE8 00028308 03D71309 ).a.Á.@.$ÉX<-_u.%Å.@.%Ö.^_]üX.è0 000000
 05E8F888 E172027C E8DB331E 321E8900 ACE90B33 0185E8EF 8BFF3307 8B40C980 .èã.a3..ÿÖ..3UÖ¯...2.3UÖ..rÅ.%Ö. 000020
 0358BE72 D888C503 C475D208 1E322EF7 C388EA88 F8881E32 26F7C788 50E07202 .rÁP.ú%&2..%.õ.ú%.2..@uá.é.Är/X. 000040
 A31E2EA3 C0331E36 16891E34 A31E2A0E 89CE031E 283E89FC 85E80873 00D383F8 %.Æ.sÅ$ç=.>(..ö..*.É4...6.3âÈ..È 000060
 74443C4E 417401FD E8DB3300 E7E89F75 DB0880CD 80037501 ADE8911E 30A31E2C ,.ÈO..ÒU.u..ë..Ûu.ÒÒ.3ÙÒ».tAN<Dt 000080
 0EC98003 E80402C9 814E2775 0274203C 0674283C 3174001E 253E8012 74453C1C .<Et..>X..t1<+t.<-t.u'N.è..$..è. 0000A0
 343E8808 F702759E 5840C980 037502C5 F60088E8 509F016C E8460000 1E3406C7 ú.4...FÒl..PÒ..-é.u..èaX.u.%Ù.>4 0000C0
 90FF811E 363E2B04 7510C5F6 1E303E03 F80330C9 80037418 72C1F706 75FF0B1E ...u.%ër.t..è0.«.>0.-é.u.+>6.... 0000E0
 1E881E38 A138755E 5901ACE8 001E4606 C61E283E 880394E8 1E3C8E51 56507F01 ..PVO/<.Ò...>(.ó.F..Ò¯.Y^uBÅ8... 000100
 76071E2E 3E838007 40800474 7FF00645 F7000383 F5D8F7D3 F7137480 C5F61E3A :.-é.t.%Æ%Å%.Æ.%E.Þ.t..M...>...v 000120
 E80A1E32 06C63FFF 88C301C9 80C302CD 80037500 1E2E3E83 1E462E8A 08C98003 ..è...F..>...u..ë.û.è.ûE.?6.2..Ò 000140
 EF88FF33 C30FE8DE 780803E3 01E3D1C3 03E3D102 CD80E077 0CCCF881 177200E4 ò.r..«ä.wÛ.ë.1D.ü1D1D.ÄxßŠÒü3..ÿ 000160
 E8E57219 99FF8100 D7830005 83000383 D0035800 8AE85028 720006E8 D788DF88 .Ò.mÒ@.r(PÒ..X.Å.Æ..(..a.....r1Ò 000180
 177480C7 F616751E 300608C5 08C788EE E81E3006 FF01CA80 0374C00A 00720088 É.r..át..ò...0.$Ÿ.ú.é..0.u.-ú.t. 0001A0
 881E3A1E 891E3816 8920C980 10C98006 E8057502 08097580 00F8810F 7480C5F6 -é.t..«..u..@u.$..è..è ..8...:.. 0001C0
 480678FF 080040B¯ F1E81E30 0EFF0025 E8097319 99FF811C 74C208C3 08C508C7 ú.é.ú.òt.....s.ÒX...0.$þ¡ã...x.H 0001E0
```

Dump of file SATURN:[PCCOMMON.DUMP.DLL]DML.TMP;1 on 18-APR-1990 10:44:35.23
File ID (622,20,0)   End of file block 171 / Allocated 172

Virtual block number 154 (0000009A), 512 (0200) bytes

```
 E8000EE8 C2885355 57C35EAB 92AB96AB 95AB93AB 921E3C8F F78856F6 E8002AE8 Ò*.$-V.%¢<..¨.¨.¨.¨^ÙWUS.6Ò..Ò 000000
 3C06742D 3C087400 5EE8C3D7 D1D5D1D3 D1E2D1F8 1358E813 58081358 D0030008 ...ÅX.ÅX.ÒX.%ìãìÆìììøûÒ^.t.<-t.< 000020
 0037E81D E8397D1E 32063A07 2C027E09 3C457230 2C4A7400 4EE8C34E 4601752B +u.FNÛÒN.tJ,OrE<.~.,.:.2.)9$.Ò7. 000040
 E4321E2E 06FF08CD 801E300E FF0E7410 C5F62677 093C2A72 302C2074 2E3C3374 t3<.t ,Or*<.w&-é.t...0..ë.....2Ò 000060
 3E80AC23 731E2A36 38C3F94E C9EB10CD 801E2C06 FF097510 C5F6F4EB 20CD80C3 ù.ë $¶-é.u...,..ë.$èN*ù;6*.#¯.> 000080
 C35F2402 777A3C06 72613CE2 740D3CE6 740A3CEA 74093CEE 74203C10 74001E24 $..t.< tŸ<.tõ<.t|<.tã<ar.<zw.$ û 0000A0
 D1E8D1E7 D13E7803 FE05AD49 74C208C1 08C508F8 88AD95AD 91AD92AD 57C3C032 2àÛWÛ.Û.Û.Û.%.é.ê.ôt1Û.±.×>1Ò1Ò1 0000C0
 F58001FA 81F63303 0AD92243 F075C8FE D7D00001 D7D1D5D1 D1D1E2D1 0005880F ÒE..1ã1111ìaìÅÅm±ÙuÞC"1.Æ3-.*..% 0000E0
 C033011E 460E800F E800D780 F57FF030 0E74FFF0 A900D780 C613FE13 EE13CE13 .ö.Ÿ.±.ó.a.`Þ.t.=Þ.%.a.$...F..3Å 000100
 88000889 1E488DC3 FF0A0645 89047589 02608900 895FF788 F888E888 C888D888 .Å.à.Ò.%.%_...m..u..E...Û$N.¿... 000120
 88980404 D8F6C42A C42AE022 C7280004 8800078F 08440108 47882EAB F3C033FD »3äµ¨..G..Ð.e..¡..+ú"Å*á*á-Å.... 000140
 833E0256 113E0046 013E27F7 2E048806 C683F728 F10308C3 83DF2809 285653C8 åSV+)+Ò.û..þ+%.ó....%'>.F.>.V.>. 000160
 C808ADC8 08AD91AD F5870EED 838C754F 02C58358 5EE6E202 C38302EE 83000456 V...Ÿ..û.ã|^[.é.OuŸ.Û..%Û.Û.àÛ.à 000180
 D0010301 D1D1D7D1 E2D1084C FF0078C0 08F588AD 93AD91AD 97AD010A 92ADCD0A .ëÛ..1Û.Û.Û.Û.%.ôx..L.1ã1a111Æ1Å 0001A0
 89C508CD D1086C01 D5D1C513 DD13CD13 FD13F580 01FA81ED 33D508EF 2300018D §..#y.13Û.*..%.».ë.Ï.é1Ï.l.1ë.é. 0001C0
 000007C8 00000000 00000000 04A00000 00000000 00C30644 89045C89 024C893C <.L..\..D.û.................à... 0001E0
```

Dump of file SATURN:[PCCOMMON.DUMP.DLL]DML.TMP;1 on 18-APR-1990 10:44:35.23
File ID (622,20,0)   End of file block 171 / Allocated 172

Virtual block number 155 (0000009B), 512 (0200) bytes

```
 70B59E00 368E18C9 BF040000 0000188E 8C200000 00000000 0E9C4000 00000000 .....a........ Ÿ/......éè..6..çp 000000
 F89DF9DE 8E01AA93 8A47C980 E98CE000 05C2781F 49FFCFA6 D50068 9D C5ADA82B + Ûé.k.(1ù.1.xò(.Å.Ö.èGo.¨..8*.« 000020
 871758E2 19652CFF FAA3070A 3D70A3D7 0AFFFDCC CCCCCCCC CCCCCD03 53AA7EEB $-¨S.ëäääääää»..æêp=.æÊ*.,e.ãX.ñ 000040
 96CFB11E AD453994 BAFFCBE6 9594BEC4 4DE158FF E6ABCC77 118461CE FDFFF3D1 1µ.»öa..wä |.(ÅM6/..lù.a.9ÈÙ.Ÿü. 000060
 8BFCAEC0 31432563 7A193AFE 57D00046 7C648CE4 A1FF2CA8 7FEA27A5 39E9A5FF .ÈO9È'õ.¨,.ÅÒŸd|FÅ1W±:.zc%C1âÙ•£ 000080
 585FFE7B E85753F5 73EFD100 74FF080A C3830AEB 83DFF752 05880579 FF085278 (R..y.É1RŸÒ.$..ú...t.1ÿs%SWÒ(±_[ 0000A0
 7E020301 50000940 55020300 07000115 74010300 05000115 AC010300 14C3ECEB $$ú....¯.......t.......Ua..P...- 0000C0
 04010301 61000948 22020300 8800014A 99010500 87000127 87010501 58000940 a..X...ñ'.......J.......*K..a.... 0000E0
 DF000201 6A000942 98020300 26000146 D9010300 22000146 8E010300 21000109 ...!....F..*...!F..&....'..j...Ò 000100
 3A010300 00001245 AA000200 3C000128 E0010300 3A000143 1A010300 00001048 K.......C..:...Å(..<...¨E......: 000120
 21010300 58000100 34010300 40000140 97010300 48000141 6E010300 44000141 A..D...nA..K....a..H...4...[...! 000140
 54206E75 5220534D 00000000 00000000 00000000 00000000 00000000 5C000100 ...\...................MS Run-T 000160
 38383931 20296328 20746867 69727970 6F43202D 20797261 7262694C 20656069 ime Library - Copyright (c) 1988 000180
 69622E6D 65736C6D 645C6065 735C0011 70726F43 2074666F 736F7263 694D202C , Microsoft Corp..\sem\dmlsem.bi 0001A0
 6370696C 60645C6C 6D645C6D 656D6572 6168735C 00657865 2E65626C 60640073 s.dmlbe.exe.\sharemem\dml\dmlipc 0001C0
 00000073 69622E63 70696C6D 645C6C6D 645C6065 60657261 68735C00 7369622E .bis.\sharemem\dml\dmlipc.bis... 0001E0
```

```
Dump of file SATURN:[PCCOMMON.DUMP.DLL]DML.TMP;1 on 18-APR-1990 10:44:35.23
File ID (622,20,0)   End of file block 171 / Allocated 172

Virtual block number 156 (0000009C), 512 (0200) bytes

312E3330 00524448 454C4946 4C4D4400 62720000 004E414D 48434142 000A0000 ....BACHMAN...rb.DMLFILEHDR.03.1 000000
62770038 3230302E 30312E33 30005244 48454C49 464C4D44 00003832 30302E30 0.0028..DMLFILEHDR.03.10.0028.wb 000020
6C65646F 6D206576 6173206F 7420656D 69740047 55424544 4C4D4400 622B7200 .r+b.DMLDEBUG.time to save model 000040
6E692067 6E696767 75626544 000A7364 6E6F6365 73206632 2E25202D 20732520  %s - %.2f seconds..Debugging in 000060
72757000 62617472 67006261 746D6669 00626174 6D69006E 6F697461 6D726F66 formation.imtab.ifmta.grtab.pur 000080
00626174 32647000 62617460 64700062 61746D70 70006261 74727070 00626174 tab.pprtab.ppmtab.pdmt h.pd2tab. 0000A0
00000000 00000000 00000000 00001E6E 2190158F 21902190 00000000 00003123 #1.......!.!...!n............... 0000C0
00000000 00000000 00000000 00000000 00000000 00000000 00000000 00000000 ................................ 0000E0
00000000 00000000 00000000 00000000 00000000 00000000 00000000 00000000 ................................ 000100
00000000 00000000 00000000 00000000 00000000 00000000 00000000 00000000 ................................ 000120
00000000 00000000 00000000 00000000 00000000 00000000 00000000 00000000 ................................ 000140
00000000 00000000 00000000 00000000 00000000 00000000 00000000 00000000 ................................ 000160
00000000 00000000 00000000 00000000 00000000 00000000 00000000 00000000 ................................ 000180
00000000 00000000 00000000 00000000 00000000 00000000 00000000 00000000 ................................ 0001A0
00000000 00000000 00000000 00000000 00000000 00000000 00000000 00000000 ................................ 0001C0
00000000 00000000 00000000 00000000 00000000 00000000 00000000 00000000 ................................ 0001E0

Dump of file SATURN:[PCCOMMON.DUMP.DLL]DML.TMP;1 on 18-APR-1990 10:44:35.23
File ID (622,20,0)   End of file block 171 / Allocated 172

Virtual block number 157 (0000009D), 512 (0200) bytes

00000000 00000000 00000000 00000000 00000000 00000000 00000000 00000000 ................................ 000000
00000000 00000000 00000000 00000000 00000000 00000000 00000000 00000000 ................................ 000020
00000000 00000000 00000000 00000000 00000000 00000000 00000000 00000000 ................................ 000040
00000000 00000000 00000000 00000000 00000000 00000000 00000000 00000000 ................................ 000060
00000000 00000000 00000000 00000000 00000000 00000000 00000000 00000000 ................................ 000080
00000000 00000000 00000000 00000000 00000000 00000000 00000000 00000000 ................................ 0000A0
00000000 00000000 00000000 00000000 00000000 00000000 00000000 00000000 ................................ 0000C0
00000000 00000000 00000000 00000000 00000000 00000000 00000000 00000000 ................................ 0000E0
00000000 00000000 00000000 00000000 00000000 00000000 00000000 00000000 ................................ 000100
00000000 00000000 00000000 00000000 00000000 00000000 00000000 00000000 ................................ 000120
00000000 00000000 00000000 00000000 00000000 00000000 00000000 00000000 ................................ 000140
00000000 00000000 00000000 00000000 00000000 00000000 00000000 00000000 ................................ 000160
00000000 00000000 00000000 00000000 00000000 00000000 00000000 00000000 ................................ 000180
00000000 00000000 00000000 00000000 00000000 00000000 00000000 00000000 ................................ 0001A0
00000000 00000000 00000000 00000000 00000000 00000000 00000000 00000000 ................................ 0001C0
00000000 00000000 00000000 00000000 00000000 00000000 00000000 00000000 ................................ 0001E0

Dump of file SATURN:[PCCOMMON.DUMP.DLL]DML.TMP;1 on 18-APR-1990 10:44:35.23
File ID (622,20,0)   End of file block 171 / Allocated 172

Virtual block number 158 (0000009E), 512 (0200) bytes

00000000 00000000 00000000 00000000 00000000 00000000 00000000 00000000 ................................ 000000
00000000 00000000 00000000 00000000 00000000 00000000 00000000 00000000 ................................ 000020
00000000 00000000 00000000 00000000 00000000 00000000 00000000 00000000 ................................ 000040
00000000 00000000 00000000 00000000 00000000 00000000 00000000 00000000 ................................ 000060
00000000 00000000 00000000 00000000 00000000 00000000 00000000 00000000 ................................ 000080
00000000 00000000 00000000 00000000 00000000 00000000 00000000 00000000 ................................ 0000A0
00000030 4F464E49 5F454C49 465F435F 015E0000 00000000 00000000 00000000 ..............^._C_FILE_INFO=... 0000C0
058A3848 05863738 0582386C 057E37AE FFFF3D1E 00000000 0000005C 005C0000 ..\.\........=..U7-.18..87..H8.. 0000E0
00000000 2E2A2007 3403306C 3405306E 33A22FE8 31762E7C 31782E7E 31982E86 ...1-.x1|.v10/A3n0.410.4e-*..... 000100
00000000 00000000 00000000 81818101 00000001 00000000 00000000 00000000 ................................ 000120
00000000 00000000 00000000 00000000 00000000 00000000 00000000 00000000 ................................ 000140
00000000 00000000 00000000 00000000 00000000 00000000 00000000 00000000 ................................ 000160
00000000 00000000 00000000 00000000 00000000 00000000 00000000 00000000 ................................ 000180
00000000 00000000 00000000 00000000 00000000 00000000 00000000 00000000 ................................ 0001A0
00000000 00000000 00000000 00000000 00000000 00000000 00000000 00000000 ................................ 0001C0
00000000 00000000 00000000 00000000 00000000 00000000 00000000 00000000 ................................ 0001E0
```

```
Dump of file SATURN:[PCCOMMON.DUMP.DLL]DML.TMP;1 on 18-APR-1990 10:44:35.23
File ID (622,20,0)   End of file block 171 / Allocated 172

Virtual block number 159 (0000009F), 512 (0200) bytes

00000000 00000000 00000000 00000000 00000000 00000000 00000000 00.\0000
0A0A0A0A 0A0AC\0A 0A0A0A0A 0A0A0A00 00000000 00000000 00000000 000.0000 ................................ 000000
0A0A0A0A 0A0A0A0A 0A0A0A0A 0A0A0A0A 0A0A0A0A 0A0A0A0A 0A0A0A0A 0A0A0A0A ................................ 000020
0A0A0A0A 0A0A0A0A 0A0A0A0A 0A0A0A0A 0A0A0A0A 0A0A0A0A 0A0A0A0A 0A0A0A0A ................................ 000040
0A0A0A0A 0A0A0A0A 0A0A0A0A 0A0A0A0A 0A0A0A0A 0A0A0A0A 0A0A0A0A 0A0A0A0A ................................ 000060
0A0A0A0A 0A0A0A0A 0A0A0A0A 0A0A0A0A 0A0A0A0A 0A0A0A0A 0A0A0A0A 0A0A0A0A ................................ 000080
0A0A0A0A 0A0A0A0A 0A0A0A0A 0A0A0A0A 0A0A0A0A 0A0A0A0A 0A0A0A0A 0A0A0A0A ................................ 0000A0
0A0A0A0A 0A0A0A0A 0A0A0A0A 0A0A0A0A 0A0A0A0A 0A0A0A0A 0A0A0A0A 0A0A0A0A ................................ 0000C0
0A0A0A0A 0A0A0A0A 0A0A0A0A 0A0A0A0A 0A0A0A0A 0A0A0A0A 0A0A0A0A 0A0A0A0A ................................ 0000E0
00000000 00000000 00000000 0000000A 0A0A0A0A 0A0A0A0A 0A0A0A0A 0A0A0A0A ................................ 000100
160A07E8 160A1E5A 160A0000 2320202B 00296C6C 756E2800 296C6C75 6E280000 ................................ 000120
E0F0F8FC FEFF0000 00007878 31364D05 01010000 000007F4 160A07F0 160A07EC ..(null).(null).+- #..Ö.Z.Ö.Ö.Ö. 000140
00000000 00000000 00000000 00000000 00000000 00000000 00000000 000080C0 ‡.Ö.Þ.Ö.¶........M61xx.....±•½Þ 000160
00000000 00000000 00000000 00303030 28650000 00000000 00000000 00000000 À............................... 000180
00000000 00000000 00000000 00000000 00000000 00000000 00000000 00000000 ...............e+000............ 0001A0
00000000 00000000 00000000 00000000 00000000 00000000 00000000 00000000 ................................ 0001C0
                                                                        ................................ 0001E0

Dump of file SATURN:[PCCOMMON.DUMP.DLL]DML.TMP;1 on 18-APR-1990 10:44:35.23
File ID (622,20,0)   End of file block 171 / Allocated 172

Virtual block number 160 (000000A0), 512 (0200) bytes

00000000 00000000 00000000 00000000 00000000 00000000 00000000 00000000 ................................ 000000
00000000 00000000 00000000 00000000 00000000 00000000 00000000 00000000 ................................ 000020
00000000 00000000 00000000 00000000 00000000 00000000 00000000 00000000 ................................ 000040
00000000 00000000 00000000 00000000 00000000 00000000 00000000 00000000 ................................ 000060
00000000 00000000 00000000 00000000 00000000 00000000 00000000 00000000 ................................ 000080
00000000 00000000 00000000 00000000 00000000 00000000 00000000 00000000 ................................ 0000A0
00000000 00000000 00000000 00000000 00000000 00000000 00000000 00000000 ................................ 0000C0
00000000 00000000 00000000 00000000 00000000 00000000 00000000 00000000 ................................ 0000E0
FFFF085C 00000000 00000000 00000000 00000000 00000000 00000000 00000000 ................................ 000100
00000000 01020000 00000000 00000000 00011E76 000A0000 09DC000A 0200FFFF ...........................\... 000120
00000000 00000000 00000000 00000000 00000000 00000000 02020000 00000000 ......É.....v................... 000140
00000000 00000000 00000000 00000000 00000000 00000000 00000000 00000000 ................................ 000160
00000000 00000000 00000000 00000000 00000000 00000000 00000000 00000000 ................................ 000180
00000000 00000000 00000000 00000000 00000000 00000000 00000000 00000000 ................................ 0001A0
00000000 00000000 00000000 00000000 00000000 00000000 00000000 00000000 ................................ 0001C0
                                                                        ................................ 0001E0

Dump of file SATURN:[PCCOMMON.DUMP.DLL]DML.TMP;1 on 18-APR-1990 10:44:35.23
File ID (622,20,0)   End of file block 171 / Allocated 172

Virtual block number 161 (000000A1), 512 (0200) bytes

00000000 00000000 00000000 00000000 00000000 00000000 00000000 00000000 ................................ 000000
00000000 00000000 00000000 00000000 00000000 00000000 00000000 00000000 ................................ 000020
00000000 00000000 00000000 00000000 00000000 00000000 00000000 00000000 ................................ 000040
00000000 00000000 00000000 00000000 00000000 00000000 00000000 00000000 ................................ 000060
00000000 00000000 00000000 00000000 00000000 00000000 00000000 00000000 ................................ 000080
00000000 00000000 00000000 00000000 00000000 00000000 00000000 00000000 ................................ 0000A0
00000000 00000000 00000000 00000000 00000000 00000000 00000000 00000000 ................................ 0000C0
00000000 00000000 00000000 00000000 00000000 00000000 00000000 00000000 ................................ 0000E0
00000000 00000C"0 00000000 00000000 00000000 00000000 00000000 00000000 ................................ 000100
00000000 00000C.) 00000000 00000000 00000000 00000000 00000000 00000000 ................................ 000120
00000000 00000000 00000000 00000000 00000000 00000000 00000000 00000000 ................................ 000140
00000000 00000000 00000000 00000000 00000000 00000000 00000000 00000000 ................................ 000160
00000000 00000000 00000000 00000000 00000000 00000000 00000000 00000000 ................................ 000180
00000000 00000000 00000000 00000000 00000000 00000000 00000000 00000000 ................................ 0001A0
00000000 00000000 00000000 00000000 00000000 00000000 00000000 00000000 ................................ 0001C0
                                                                        ................................ 0001E0
```

```
Dump of file SATURN:[PCCOMMON.DUMP.DLL]DML.TMP;1 on 18-APR-1990 10:44:35.23
File ID (622,20,0)   End of file block 171 / Allocated 172

Virtual block number 162 (000000A2), 512 (0200) bytes

00000000 00000000 00000000 00000000 00000000 00000000 00000000 00000000 ................................ 000000
00000000 00000000 00000000 00000000 00000000 00000000 00000000 00000000 ................................ 000020
00000000 00000000 00000000 00000000 00000000 00000000 00000000 00000000 ................................ 000040
00000000 00000000 00000000 00000000 00000000 00000000 00000000 00000000 ................................ 000060
00000000 00000000 00000000 00000000 00000000 00000000 00000000 00000000 ................................ 000080
00000000 00000000 00000000 00000000 00000000 00000000 00000000 00000000 ................................ 0000A0
00000000 00000000 00000000 00000000 00000000 00000000 00000000 00000000 ................................ 0000C0
00000000 00000000 00000000 00000000 00000000 00000000 00000000 00000000 ................................ 0000E0
00000000 00000000 00000000 00000000 00000000 00000000 00000000 00000000 ................................ 000100
00000000 00000000 00000000 00000000 00000000 00000000 00000000 00000000 ................................ 000120
00000000 00000000 00000000 00000000 00000000 00000000 00000000 00000000 ................................ 000140
00000000 00000000 00000000 00000000 00000000 00000000 00000000 00000000 ................................ 000160
00000000 00000000 00000000 00000000 00000000 00000000 00000000 00000000 ................................ 000180
00000000 00000000 00000000 00000000 00000000 00000000 00000000 00000000 ................................ 0001A0
00000000 00000000 00000000 00000000 00000000 00000000 00000000 00000000 ................................ 0001C0
00000000 00000000 00000000 00000000 00000000 00000000 00000000 00000000 ................................ 0001E0

Dump of file SATURN:[PCCOMMON.DUMP.DLL]DML.TMP;1 on 18-APR-1990 10:44:35.23
File ID (622,20,0)   End of file block 171 / Allocated 172

Virtual block number 163 (000000A3), 512 (0200) bytes

00000000 00000000 00000000 00000000 00000000 00000000 00000000 00000000 ................................ 000000
00000000 00000000 00000000 00000000 00000000 00000000 00000000 00000000 ................................ 000020
00000000 00000000 00000000 00000000 00000000 00000000 00000000 00000000 ................................ 000040
00000000 00000000 00000000 00000000 00000000 00000000 00000000 00000000 ................................ 000060
00000000 00000000 00000000 00000000 00000000 00000000 00000000 00000000 ................................ 000080
00000000 00000000 00000000 00000000 00000000 00000000 00000000 00000000 ................................ 0000A0
00000000 00000000 00000000 00000000 00000000 00000000 00000000 00000000 ................................ 0000C0
00000000 00000000 00000000 00000000 00000000 00000000 00000000 00000000 ................................ 0000E0
00000000 00000000 00000000 00000000 00000000 00000000 00000000 00000000 ................................ 000100
00000000 00000000 00000000 00000000 00000000 00000000 00000000 00000000 ................................ 000120
00000000 00000000 00000000 00000000 00000000 00000000 00000000 00000000 ................................ 000140
00000000 00000000 00000000 00000000 00000000 00000000 00000000 00000000 ................................ 000160
00000000 00000000 00000000 00000000 00000000 00000000 00000000 00000000 ................................ 000180
00000000 00000000 00000000 00000000 00000000 00000000 00000000 00000000 ................................ 0001A0
00000000 00000000 00000000 00000000 00000000 00000000 00000000 00000000 ................................ 0001C0
00000000 00000000 00000000 00000000 00000000 00000000 00000000 00000000 ................................ 0001E0

Dump of file SATURN:[PCCOMMON.DUMP.DLL]DML.TMP;1 on 18-APR-1990 10:44:35.23
File ID (622,20,0)   End of file block 171 / Allocated 172

Virtual block number 164 (000000A4), 512 (0200) bytes

00000000 00000000 00000000 00000000 00000000 00000000 00000000 00000000 ................................ 000000
00000000 00000000 00000000 00000000 00000000 00000000 00000000 00000000 ................................ 000020
00000000 00000000 00000000 00000000 00000000 00000000 00000000 00000000 ................................ 000040
00000000 00000000 00000000 00000000 00000000 00000000 00000000 00000000 ................................ 000060
00000000 00000000 00000000 00000000 00000000 00000000 00000000 00000000 ................................ 000080
00000000 00000000 00000000 00000000 00000000 00000000 00000000 00000000 ................................ 0000A0
00000000 00000000 00000000 00000000 00000000 00000000 00000000 00000000 ................................ 0000C0
00000000 00000000 00000000 00000000 00000000 00000000 00000000 00000000 ................................ 0000E0
00000000 00000000 00000000 00000000 00000000 00000000 00000000 00000000 ................................ 000100
00000000 00000000 00000000 00000000 00000000 00000000 00000000 00000000 ................................ 000120
00000000 00000000 00000000 00000000 00000000 00000000 00000000 00000000 ................................ 000140
00000000 00000000 00000000 00000000 00000000 00000000 00000000 00000000 ................................ 000160
00000000 00000000 00000000 00000000 00000000 00000000 00000000 00000000 ................................ 000180
00000000 00000000 00000000 00000000 00000000 00000000 00000000 00000000 ................................ 0001A0
00000000 00000000 00000000 00000000 00000000 00000000 00000000 00000000 ................................ 0001C0
00000000 00000000 00000000 00000000 00000000 00000000 00000000 00000000 ................................ 0001E0
```

```
Dump of file SATURN:[PCCOMMON.DUMP.DLL]DML.TMP;1 on 18-APR-1990 10:44:35.23
File ID (622,20,0)   End of file block 171 / Allocated 172

Virtual block number 165 (000000A5), 512 (0200) bytes

00000000 00000000 00000000 00000000 00000000 00000000 00000000 00000000 ................................ 000000
00000000 00000000 00000000 00000000 00000000 00000000 00000000 00000000 ................................ 000020
00000000 00000000 00000000 00000000 00000000 00000000 00000000 00000000 ................................ 000040
00000000 00000000 00000000 00000000 00000000 00000000 00000000 00000000 ................................ 000060
00000000 00000000 00000000 00000000 00000000 00000000 00000000 00000000 ................................ 000080
00000000 00000000 00000000 00000000 00000000 00000000 00000000 00000000 ................................ 0000A0
00000000 00000000 00000000 00000000 00000000 00000000 00000000 00000000 ................................ 0000C0
00000000 00000000 00000000 00000000 00000000 00000000 00000000 00000000 ................................ 0000E0
00000000 00000000 00000000 00000000 00000000 00000000 00000000 00000000 ................................ 000100
00000000 00000000 00000000 00000000 00000000 00000000 00000000 00000000 ................................ 000120
00000000 00000000 00000000 00000000 00000000 00000000 00000000 00000000 ................................ 000140
00000000 00000000 00000000 00000000 00000000 00000000 00000000 00000000 ................................ 000160
00000000 00000000 00000000 00000000 00000000 00000000 00000000 00000000 ................................ 000180
00000000 00000000 00000000 00000000 00000000 00000000 00000000 00000000 ................................ 0001A0
00000000 00000000 00000000 00000000 00000000 00000000 00000000 00000000 ................................ 0001C0
00000000 00000000 00000000 00000000 00000000 00000000 00000000 00000000 ................................ 0001E0

Dump of file SATURN:[PCCOMMON.DUMP.DLL]DML.TMP;1 on 18-APR-1990 10:44:35.23
File ID (622,20,0)   End of file block 171 / Allocated 172

Virtual block number 166 (000000A6), 512 (0200) bytes

00000000 00000000 00000000 00000000 00000000 00000000 00000000 00000000 ................................ 000000
00000000 00000000 00000000 00000000 00000000 00000000 00000000 00000000 ................................ 000020
00000000 00000000 00000000 00000000 00000000 00000000 00000000 00000000 ................................ 000040
00000000 00000000 00000000 00000000 00000000 00000000 00000000 00000000 ................................ 000060
00000000 00000000 00000000 00000000 00000000 00000000 00000000 00000000 ................................ 000080
00000000 00000000 00000000 00000000 00000000 00000000 00000000 00000000 ................................ 0000A0
00000000 00000000 00000000 00000000 00000000 00000000 00000000 00000000 ................................ 0000C0
00000000 00000000 00000000 00000000 00000000 00000000 00000000 00000000 ................................ 0000E0
00000000 02000001 00000000 00000000 00000000 00000000 00000000 00000000 ................................ 000100
00000000 00000000 00000000 00000000 00000000 00000000 00000000 00000000 ................................ 000120
00000000 00000000 00000000 00000000 00000000 00000000 00000000 00000000 ................................ 000140
00000000 00000000 00000000 00000000 00000000 00000000 00000000 00000000 ................................ 000160
00000000 00000000 00000000 00000000 00000000 00000000 00000000 00000000 ................................ 000180
00000000 00000000 00000000 00000000 00000000 00000000 00000000 00000000 ................................ 0001A0
00000000 00000000 00000000 00000000 00000000 00000000 00000000 00000000 ................................ 0001C0
00000000 00000000 00000000 00000000 00000000 00000000 00000000 00000000 ................................ 0001E0

Dump of file SATURN:[PCCOMMON.DUMP.DLL]DML.TMP;1 on 18-APR-1990 10:44:35.23
File ID (622,20,0)   End of file block 171 / Allocated 172

Virtual block number 167 (000000A7), 512 (0200) bytes

00000000 00000000 00000000 00000000 00000000 00000000 00000000 00000000 ................................ 000000
00000000 00000000 00000000 00000000 00000000 00000000 00000000 00000000 ................................ 000020
00000000 00000000 00000000 00000000 00000000 00000000 00000000 00000000 ................................ 000040
00000000 00000000 00000000 00000000 00000000 00000000 00000000 00000000 ................................ 000060
00000000 00000000 00000000 00000000 00000000 00000000 00000000 00000000 ................................ 000080
00000000 00000000 00000000 00000000 00000000 00000000 00000000 00000000 ................................ 0000A0
00000000 00000000 00000000 00000000 00000000 00000000 00000000 00000000 ................................ 0000C0
00000000 00000000 00000000 00000000 00000000 00000000 00000000 00000000 ................................ 0000E0
00000000 00000000 00000000 00000000 00000000 00000000 00000000 00000000 ................................ 000100
00000000 00000000 00000000 00000000 00000000 00000000 00000000 00000000 ................................ 000120
00000000 00000000 00000000 00000000 00000000 00000000 00000000 00000000 ................................ 000140
00000000 00000000 00000000 00000000 00000000 00000000 00000000 00000000 ................................ 000160
00000000 00000000 00000000 00000000 00000000 00000000 00000000 00000000 ................................ 000180
00000000 00000000 00000000 00000000 00000000 00000000 00000000 00000000 ................................ 0001A0
00000000 00000000 00000000 00000000 00000000 00000000 00000000 00000000 ................................ 0001C0
00000000 00000000 00000000 00000000 00000000 00000000 00000000 00000000 ................................ 0001E0
```

```
Dump of file S. URN:[PCCOMMON.DUMP.DLL]DML.TMP;1 on 18-APR-1990 10:44:35.23
File ID (622,20,0)   End of file block 171 / Allocated 172

Virtual block number 168 (000000A8), 512 (0200) bytes

00000000 00000000 00000000 00000000 00000000 00000000 00000000 00000000 ................................ 000000
00000000 00000000 00000000 00000000 00000000 00000000 00000000 00000000 ................................ 000020
00000000 00000000 00000000 00000000 00000000 00000000 00000000 00000000 ................................ 000040
00000000 00000000 00000000 00000000 00000000 00000000 00000000 00000000 ................................ 000060
00000000 00000000 00000000 00000000 00000000 00000000 00000000 00000000 ................................ 000080
00000000 00000000 00000000 00000000 00000000 00000000 00000000 00000000 ................................ 0000A0
00000000 00000000 00000000 00000000 00000000 00000000 00000000 00000000 ................................ 0000C0
00000000 00000000 00000000 00000000 00000000 00000000 00000000 00000000 ................................ 0000E0
00000000 00000000 00000000 00000000 00000000 00000000 00000000 00000000 ................................ 000100
00000000 00000000 00000000 00000000 00000000 00000000 00000000 00000000 ................................ 000120
00000000 00000000 00000000 00000000 00000000 00000000 00000000 00000000 ................................ 000140
00000000 00000000 00000000 00000000 00000000 00000000 00000000 00000000 ................................ 000160
00000000 00000000 00000000 00000000 00000000 00000000 00000000 00000000 ................................ 000180
00000000 000000C0 00000000 00000000 00000000 00000000 00000000 00000000 ................................ 0001A0
00000000 00000000 00000000 00000000 00000000 00000000 00000000 00000000 ................................ 0001C0
00000000 00000000 00000000 00000000 00000000 00000000 00000000 00000000 ................................ 0001E0

Dump of file SATURN:[PCCOMMON.DUMP.DLL]DML.TMP;1 on 18-APR-1990 10:44:35.23
File ID (622,20,0)   End of file block 171 / Allocated 172

Virtual block number 169 (000000A9), 512 (0200) bytes

00000000 00000000 00000000 00000000 00000000 00000000 00000000 00000000 ................................ 000000
00000000 00000000 00000000 00000000 00000000 00000000 00000000 00000000 ................................ 000020
00000000 00000000 00000000 00000000 00000000 00000000 00000000 00000000 ................................ 000040
00000000 00000000 00000000 00000000 00000000 00000000 00000000 00000000 ................................ 000060
00000000 00000000 00000000 00000000 00000000 00000000 00000000 00000000 ................................ 000080
00000000 00000000 00000000 00000000 00000000 00000000 00000000 00000000 ................................ 0000A0
00000000 00000000 00000000 00000000 00000000 00000000 00000000 00000000 ................................ 0000C0
00000000 00000000 00000000 00000000 00000000 00000000 00000000 00000000 ................................ 0000E0
00000000 00000000 00000000 00000000 00000000 00000000 00000000 00000000 ................................ 000100
00000000 00000000 00001E80 15BC0000 00000000 00000000 00000000 00000000 ..................¥............. 000120
20202020 20282828 28282020 20202020 20202000 00002000 00000000 00000000 ......... ...          (((((      000140
84848410 10101010 10101010 10101010 10104820 20202020 20202020 20202020             H................. 000160
01010101 01010101 01010101 81818181 81811010 10101010 10848484 84848484 ................................ 000180
02020202 02020202 02020202 82828282 82821010 10101010 01010101 01010101 ................................ 0001A0
00000000 00000000 00000000 00000000 00000020 10101010 02020202 02020202 ............ ................... 0001C0
00000000 00000000 00000000 00000000 00000000 00000000 00000000 00000000 ................................ 0001E0

Dump of file SATURN:[PCCOMMON.DUMP.DLL]DML.TMP;1 on 18-APR-1990 10:44:35.23
File ID (622,20,0)   End of file block 171 / Allocated 172

Virtual block number 170 (000000AA), 512 (0200) bytes

00000000 00000000 00000000 00000000 00000000 00000000 00000000 00000000 ................................ 000000
00000000 00000000 00000000 00000000 00000000 00000000 00000000 00000000 ................................ 000020
00F30004 00850097 0078005A 0038001E FFFF0000 00000000 00000000 00000000 ..................;.Z.x...ç.å.µ. 000040
014D012F 011000F2 00D30084 00960077 0059003A 001EFFFF 0160014E 01300111 ..0.N.m.....:.Y.w...Ç.Æ.·.../.M. 000060
4D6E7553 18C41D1A 1D2A1D16 00010000 46500054 44450054 53450000 5A54016C l.TZ..EST.EDT.PF......*...Ä.SunM 000080
614D7270 4172614D 6265466E 614A0074 61536972 46756854 64655765 75546E6F onTueWedThuFriSat.JanFebMarAprMa 0000A0
00000000 00000000 00006365 44766F4E 74634F70 65536775 416C754A 6E754A79 yJunJulAugSepOctNovDec.......... 0000C0
00000000 00000000 00000000 00000000 00000000 00000000 00000000 00000000 ................................ 0000E0
00000000 00000000 00000000 00000000 00000000 00000000 00000000 00000000 ................................ 000100
00000000 00000000 00000000 00000000 00000000 00000000 00000000 00000000 ................................ 000120
00000000 00000000 00000000 00000000 00000000 00000000 00000000 00000000 ................................ 000140
00000000 00000000 00000000 00000000 00000000 00000000 00000000 00000000 ................................ 000160
00000000 00000000 00000000 00000000 00000000 00000000 00000000 00000000 ................................ 000180
00000000 00000000 00000000 00000000 00000000 00000000 00000000 00000000 ................................ 0001A0
FFFF1E68 48741E60 29B60000 000007F8 30B40000 058E0EFE 00000000 00000000 ........ø.....Ç=½.....Ñ)'.tKh... 0001C0
4753404E 3C3C0000 00000000 00000160 00000000 00000000 1E741E72 1E70FFFF ..p.r.t.........'.........<<NMSG 0001E0
```

Dump of file SATURN:[PCCOMMON.DUMP.DLL]DML.TMP;1 on 18-APR-1990 10:44:35.23
File ID (622,20,0)   End of file block 171 / Allocated 172

Virtual block number 171 (000000AB), 512 (0200) bytes 0003000A 0D776F6C 66726576 6F206863 61747320 200A0D30 30303652 00003E3E >>..R6000..- stack overflow..... 000000
08000A0D 30207962 20656469 76696420 72656765 746E6920 200A0D33 30303652 R6003..- integer divide by 0.... 000020
6120726F 66206563 61707320 6867756F 6E652074 6F6E202D 0A0D3830 30365200 .R6008..- not enough space for a 000040
6867756F 6E652074 6F6E202D 0A0D3930 30365200 09000A0D 73746E65 6D756772 rguments.....R6009..- not enough 000060
00FF000A 0000FC00 0A0D746E 656D6E6F 7269766E 6520726F 66206563 61707320  space for environment...*...... 000080
74616F6C 6620200A 00323030 36520002 0020726F 72726520 656D6974 206E7572 run-time error ...R6002..- float 0000A0
00485441 4D203A00 FD000A0D 64656461 6F6C2074 6F6E2074 6E696F70 20676E69 ing point not loaded...».: MATH. 0000C0
61766E69 00650020 3A726F72 72652074 6E696F70 20676E69 74616F6C 6620200A .- floating-point error: .e.inva 0000E0
776F6C66 72657( F 0068000A 00302079 62206564 69766964 0067000A 0064696C lid...g.divide by 0...h.overflow 000100
74696369 6C707b.. 0070000A 0D776F6C 66726576 6F206863 61747300 6E000A0D ...n.stack overflow...p.explicit 000120
09060002 00000010 1E6C0002 0003FFFF FF000A0D 64657461 72656E65 6720796C ly generated..........l.......ø. 000140
00000000 00000000 00000000 00000000 00000000 00000012 1D260002 00000011 ......&......................... 000160
00000000 00000000 00000000 00000000 00000000 00000000 00000000 00000000 ................................ 000180
00000000 00000000 00000000 00000000 00000000 00000000 00000000 00000000 ................................ 0001A0
00000000 00000000 00000000 00000000 00000000 00000000 00000000 00000000 ................................ 0001C0
00000000 00000000 00000000 00000000 00000000 00000000 00000000 00000000 ................................ 0001E0

Dump of file SATURN:[PCCOMMON.DUMP.DLL]DMLGLOB.TMP;1 on 18-APR-1990 10:44:56.67
File ID (627,22,0)   End of file block 315 / Allocated 316

Virtual block number 1 (00000001), 512 (0200) bytes 00000000 00000040 00000000 00000088 0000FFFF 00000004 00000132 009A5A4D MZ..2...........|.......a....... 000000
00000080 00000000 00000000 00000000 00000000 00000000 00000000 00000000 ................................ 000020
6F6E6E61 6320606' 72676F72 70207369 685421CD 4C01B821 CD09B400 0EBA1F0E ..a..Ç.ë|.LëThis program canno 000040
00000000 00000024 0A0D002E 65646F6D 20534F44 206E6920 6E757220 65622074 t be run in DOS mode....$....... 000060
000F0039 0000000C 00050000 00000800 002E800E B05AE6E2 000206AE 0505454E NE..Ù...âlZ¯.................9... 000080
00000000 00000000 00010008 00040000 00000730 025D023F 02340208 0040001D ..a...4.?.].0................... 0000A0
0AA40F00 0AA40228 0AC20F00 0AC20162 080E0F00 080E000C 06240F00 06240075 u.$...$.É.......b.ô...ô.(.Ê...Ê. 0000C0
00560F00 00560795 00560F00 0056078D 49380F00 493802DE 00110F00 001102D8 Ù.......8.8I..8I..V...V...V...V. 0000E0
03920F00 039209C6 00BE0F00 00BE08E4 00800F00 00800802 06000F00 0600079D .............ô./.../.ó....... 000100
1D320F00 1D320E57 15660F00 15660CF9 15D80F00 15D80B91 18260F00 18260A03 ..&...&...Ä...Ä.'.f...f.W.2...2. 000120
03E20F00 03E21101 03C40F00 03C410C1 04380F00 0438107A 04060F00 04061036 6.......z.8...8.è.6...6...ã...ã. 000140
07920F00 079211F9 03420F00 034211C1 03280F00 0328118A 04320F00 04321143 C.2...2...(...(.è.8...8.'....... 000160
2E380F00 2E38140D 1FD00F00 1FD01207 05540F00 0554127E 00560F00 00561276 v.V...V.-.T...T.a.Å...Å.I.8...8. 000180
005C0F00 005C1868 04800F00 0480181F 02A80F00 02A817F0 015A0F00 015A17D7 a.Z...Z.Þ.'.............k.\...\. 0001A0
01680F00 01681811 02F60F00 02F61ADE 01220F00 01221AC9 17500F00 17501947 G.P...P.è."...".8.-...-...h...h. 0001C0
06C60F00 06C61868 011E0F00 011E1856 011E0F00 011E1841 011E0F00 011E182C ,.......A.......V.......k.6...6. 0001E0

Dump of file SATURN:[PCCOMMON.DUMP.DLL]DMLGLOB.TMP;1 on 18-APR-1990 10:44:56.67
File ID (627,22,0)   End of file block 315 / Allocated 316

Virtual block number 2 (00000002), 512 (0200) bytes

4CC70F00 4CC71EB3 138C0F00 138C1D68 14720F00 14721C13 032A0F00 032A1BDC É.*...*...r...r.h.......*.úL..úL 000000
00961EF1 00962639 006E1EF1 006E2632 2AE00F01 2938238A 02040E01 00000000 .........#8)..A*2&n.þ.n.9&..þ... 000020
02151E81 02152697 027D1E81 027D266F 01421E81 0142265A 01681E81 01682643 C&h.Ÿ.h.Z&8.Ÿ.B.o&).Ÿ.)..&..Ÿ... 000040
02301E81 0230271D 02891E81 028926F1 01851E81 018526D5 01831E81 018326B9 ¿&*.Ÿ.*.(&ç.Ÿ.ç.þ&¿.Ÿ.¿..'=.Ÿ.=. 000060
01150004 010E0004 01240004 01080004 00460005 00450005 01D21E81 01D22741 A'0.Ÿ.0...E...F.......$......... 000080
01000000 424F4C47 4C4D4407 012C0004 01080004 01250004 01330004 01000004 ......3...%.........DMLGLOB.... 0000A0
69060004 1703F803 80038303 4702AF02 74022101 EC00C400 31002800 22001300 ...".+.1.&.$.!.t.É.G...¯.%.....i 0000C0
08524944 52554351 534F440A 4F495303 54494E49 4C4D444D 46490A6C 60646066 fmdml.IFMDMLINIT.SIO.DOSQCURDIR. 0000E0
53494745 52485445 4D5F1244 4F485445 4D064E49 574D5005 534C4C41 43534F44 DOSCALLS.PMWIN.METHOD._METHREGIS 000100
5445405F 0C534E46 4C4D4452 45545349 47455248 54454012 5353414C 43524554 TERCLASS.METHREGISTERDMLFNS._MET 000120
5445405F 1047534D 544E4552 4150444E 45534854 454D5F12 47534D44 4E455348 HSENDMSG._METHSENDPARENTMSG._MET 000140
10455441 49544E41 54534E49 45444854 45405F12 45544149 544E4154 .'4E4948 HINSTANTIATE._METHDEINSTANTIATE. 000160
53414C43 45564952 45444854 454D5F10 47534D54 534E4944 4E455348 5. 54D5F _METHSENDINSTMSG._METHDERIVECLAS 000180
0A4E5854 54524154 534C4D44 084D5448 45524955 5143414C 4D44006C 606 0353 $.dml.DMLACQUIRENTM.DMLSTARTTXN. 0001A0
59524555 514C4D44 134C4544 4F4D4545 52464C4D 440C4E58 54504F54 534C4D44 DMLSTOPTXN.DMLFREEMODEL.DMLQUERY 0001C0
59524555 514C4D44 00495447 59524555 514C4D44 08454C44 4E41484C 45444F4D MODELHANDLE.DMLQUERYGTI.DMLQUERY 0001E0

```
Dump of file SATURN:[PCCOMMON.DUMP.DLL]DMLGLOB.TMP;1 on 18-APR-1990 10:44:56.67
File ID (627,22,0)    End of file block 315 / Allocated 316

Virtual block number 3 (00000003), 512 (0200) bytes

 08444C45 49465445 534C4044 08444C45 49465952 4555514C 4D440054 4E554F43 COUNT.DMLQUERYFIELD.DMLSETFIELD. 000000
 414C4552 4C4D4409 314E4C52 59524555 514C4044 0C4E4C52 59524555 514C4D44 DMLQUERYRLN.DMLQUERYRLN1.DMLRELA 000020
 55514C4D 44005453 494C4545 52464C40 44084554 414C4552 4E554C4D 44084554 TE.DMLUNRELATE.DMLFREELIST.DMLQU 000040
 4C4D4408 4554454C 45444C4D 44094554 41455243 4C4D4409 44494C4D 44595245 ERYDMLID.DMLCREATE.DMLDELETE.DML 000060
 4C535952 4555514C 40441054 58455445 54495257 4C4D440C 54584554 44414552 READTEXT.DMLWRITETEXT.DMLQUERYSL 000080
 59524555 514C4044 11455A49 53544F4C 53595245 55514C4D 44104550 5954544F OTTYPE.DMLQUERYSLOTSIZE.DMLQUERY 0000A0
 52455551 49544712 47534D44 4E455349 54470A49 54470345 4D414E4E 49474F4C LOGINNAME.GTI.GTISENDMSG.GTIQUER 0000C0
 5304544E 45524150 4C4F4F54 59524555 51495447 12574F44 4E49574C 4F4F5459 YTOOLWINDOW.GTIQUERYTOOLPARENT.S 0000E0
 44495455 41530954 55505254 53545541 530A5254 53544547 54554153 0A545541 AUT.SAUTGETSTR.SAUTSTRPUT.SAUTID 000100
 4D414E50 49525453 54554153 00544D54 53544E52 50545052 54554153 0F545550 PUT.SAUTRPTPRNTSTMT.SAUTSTRIPNAM 000120
 424E5953 4C44500F 4E59534C 44500645 4D414E54 494D494C 45445455 41530F45 E.SAUTDELIMITNAME.PDLSYN.PDLSYNB 000140
 44500E45 5059544E 4F495353 45525058 454E5953 4C445014 45455254 444C4955 UILDTREE.PDLSYNEXPRESSIONTYPE.PD 000160
 4F535255 4354494E 49474142 4C545510 54554403 43455250 444E4946 4E59534C LSYNFINDPREC.DUT.UTLBAGINITCURSO 000180
 52455449 4741424C 54551352 4F535255 43455341 454C4552 4741424C 54551352 R.UTLBAGRELEASECURSOR.UTLBAGITER 0001A0
 4B414D4E 55514553 4C54550C 454B414D 5145534C 54550A52 4F535255 43455441 ATECURSOR.UTLSEQMAKE.UTLSEQUNMAK 0001C0
 54550052 45424D45 4D534951 45534C54 550E4854 474E454C 5145534C 54550C45 E.UTLSEQLENGTH.UTLSEQISMEMBER.UT 0001E0
```

```
Dump of file SATURN:[PCCOMMON.DUMP.DLL]DMLGLOB.TMP;1 on 18-APR-1990 10:44:56.67
File ID (627,22,0)    End of file block 315 / Allocated 316

Virtual block number 4 (00000004), 512 (0200) bytes

 45514553 4C545508 4C454853 55505145 534C5455 0C4C4554 53524946 5145534C LSEQFIRSTEL.UTLSEQPUSHEL.UTLSEQE 000000
 4F525453 45444045 4D0E5041 45484554 41455243 4D454D00 4D454D03 5954504D MPTY.MEM.MEMCREATEHEAP.MEMDESTRO 000020
 4B434F4C 4245/°52 464D454D 0C4B434F 4C42434F 4C4C414D 454D0050 41454859 YHEAP.MEMALLOCBLOCK.MEMFREEBLOCK 000040
 4C414E41 114C/ ⁄3 494E4F4E 4143454D 414E5455 4C414E41 1354554C 414E4106 .ANALUT.ANALUTNAMECANONICAL.ANAL 000060
 4F444E49 57524554 4E45434C 54550F4C 54550345 5241504D 4F43454D 414E5455 UTNAMECOMPARE.UTL.UTLCENTERWINDO 000080
 5441504C 4C554645 4B41404C 54550F48 54415045 534E4544 4E4F434C 54550F57 W.UTLCONDENSEPATH.UTLMAKEFULLPAT 0000A0
 4552434D 41440C6D 61640354 4F4F524E 41404B43 41425952 4555514C 54551348 H.UTLQUERYBACHMANROOT.dam.DAMCRE 0000C0
 45440E4B 53454441 44415308 52545441 45544145 52434D41 4400544E 45455441 ATEENT.DAMCREATEATTR.SADADESK.DE 0000E0
 4F440845 534F4C43 534F4408 4E45504F 534F4407 454C4946 4F525054 45474B53 SKGETPROFILE.DOSOPEN.DOSCLOSE.DO 000100
 61202973 28746365 6A624F20 6C6D4419 00004441 4552534F 44074554 49525753 SWRITE.DOSREAD...Dml Object(s) • 000120
 040E4683 D88EFFFF 881E5657 00005AC8 00000000 00007364 6F687465 6020646E nd methods......àZ..WV.¡...Å.F.. 000140
 FE578826 FC478826 0E5EC404 0E4683F6 5689F446 89FE5788 26FC4788 260E5EC4 å^.&.G•&.Wz.F¶.V-.F..å^.&.G•&.Wz 000160
 FE76FF18 6AFE5689 FC4689FE 578826FC 4788260E 5EC4040E 4683FA56 89F84689 .F½.V°.F..å^.&.G•&.Wz.F•.Vzj..vz 000180
 468914C4 830000FF FF9A006A 0A76FF0C 76FF2718 68F476FF F676FF13 6AFC76FF .v•j..v–.v¶h.'.v..v.j.......å..F 0001A0
 57000060 C8CBC95F 5E1F0000 E9000088 0006E9A6 46880006 E9037500 A67E83A6 Ì.~Ì.u.Ö...FÌÖ..¡..Ö...^ èùà'..W 0001C0
 020E4683 F65689F4 4689FE57 8826FC47 88260E5E C4040E46 83088E00 08881E56 V.¡...Å.F..å^.&.G•&.Wz.F¶.V-.F.. 0001E0
```

```
Dump of file SATURN:[PCCOMMON.DUMP.DLL]DMLGLOB.TMP;1 on 18-APR-1990 10:44:56.67
File ID (627,22,0)    End of file block 315 / Allocated 316

Virtual block number 5 (00000005), 512 (0200) bytes

 260E5EC4 040E4683 FC4689FE 4788260E 5EC4020E 4683FE46 89FE4788 260E5EC4 å^.&.Gz.Fz.F..å^.&.Gz.F•.F..å^.& 000000
 89F84689 FE578826 FC478826 0E5EC404 0E4683F2 5689F046 89FE5788 26FC4788 .G•&.Wz.Fp.V .F..å^.&.G•&.Wz.F½. 000020
 68000001 1F9AF876 FFFA76FF F076FFF2 76FF02A9 680058E9 037400FE 7E83FA56 V°.~z.t.ÖX.h`..v·.vp.v°.v½.....h 000040
 68F076FF F276FFF8 76FFFA76 FF0000FF FF9AF876 FFFA76FF F076FFF2 76FF0258 [..v·.vp.v°.v½......v°.v½.v·.vph 000060
 00008818 C4830000 016D9A00 6A0A76FF 0C76FF27 1A68F476 FFF676FF 136A0204 ..j..v–.v¶h.'.v..v.j..m....å.¡.. 000080
 0001A29A 006A0A76 FF0C76FF 271868F4 76FFF676 FFFE76FF 5016A046 80008AE9 Öo..F..P.vz.v–.v¶h.'.v..v.j..Å.. 0000A0
 5016A446 800047E9 FE468800 88E90000 880006E9 0374A246 08A04688 12C48300 ..å..F..FÅt.Ö..¡..Ö...FzÖG..FÊ.P 0000C0
 FF9A5016 A4468010 C4830000 02009A00 6AA076FF A276FF27 1C68F476 FFF676FF .v–.v¶h.'.vÅ.v.j.......å..FÊ.P.. 0000E0
 E9003EE9 00008800 00FFFF9A F876FFFA 76FFF076 FFF276FF 5016A446 800000FF ....FÊ.P.v·.vp.v°.v½.....¡..Ö>.Ö 000100
 76FF006A 020468F0 76FFF276 FFF876FF FA76FF00 00E9FFB1 E9037500 13300008 ..•..u.ÖŸ.Ö...v°.v½.v·.vph..j..v 000120
 5F5E1F00 00E90000 B818C483 00000067 9A006AA0 76FFA276 FF271A68 F476FFF6 –.v¶h.'.vÅ.v.j..g....å.¡..Ö...^ 000140
 F64689FE 578826FC 4788260E 5EC4040E 4683088E 0093881E 56570000 62C8CBC9 èùàb..WV.¡...Å.F..å^.&.G•&.Wz.F= 000160
 260E5EC4 020E4683 A65689A4 4689FE57 8826FC47 88260E5E C4040E46 83F85689 .V½.F..å^.&.G•&.Wz.FÊ.VÌ.F..å^.& 000180
 26FC4788 260E5EC4 040E4683 A84689FE 4788260E 5EC4020E 46839E46 89FE4788 .Gz.F..F..å^.&.Gz.F`.F..å^.&.G•& 0001A0
 76FFA676 FF5016FA 468DFA46 899E4688 0007C626 A45EC4FE 5689FC46 89FE5788 .Wz.F•.Vzå^Ê&å...F..F°.F°.P.vÌ.v 0001C0
 FF18C483 000002E9 9A006A0A 76FF0C76 FF271A68 F676FFF8 76FF006A 020468A4 Êh..j..v½.v-h.'.v..v.j..Ö....å.. 0001E0
```

```
Dump of file SATURN:[PCCOMMON.DUMP.DLL]DMLGLOB.TMP;1 on 18-APR-1990 10:44:56.67
File ID (627,22,0)   End of file block 315 / Allocated 316

Virtual block number 6 (00000006), 512 (0200) bytes

FA46899E 46880007 C626A45E C40000FF FF9AA476 FFA676FF A876FFFC 76FFFE76 vt.ve.v'.vl.vE.....6^E&6...F..F* 000000
12C48300 000.219A 006A0A76 FF0C76FF 271868F6 76FFF876 FF0F6A50 16A0468D .F..Pj..v%.v-h.'.v..v.j..!....6. 000020
FFA476FF A676FF9E 76FF5040 A84688FC 76FFFE76 FF004EE9 0375A246 08A04688 .F..FAu.ON..vt.ve.F'@P.v..vl.vE. 000040
F876FF50 16A0468D 18C48300 00033F9A 006AA076 FFA276FF 27E668F6 76FFF876 v%.v-hl'.vA.v.j..?....6..F..P.v% 000060
106A5016 A0468DFF A7E910C4 83000003 629A006A A076FFA2 76FF27DA 68F676FF .v-hO'.vA.v.j..b....6.Ol..F..Pj. 000080
75A2460B A0468812 C4830000 01469A00 6A0A76FF 0C76FF27 1868F676 FFF876FF .v%.v-h.'.v..v.j..F....6..F..FAu 0000A0
E668F676 FFF876FF A476FFA6 76FF9E76 FF5040A8 4688FC76 FFFE76FF 004EE903 .ON..vt.ve.F'@P.v..vl.vE.v%.v-hl 0000C0
FF27DA68 F676FFF8 76FF5016 A0468D18 C4830000 03889A00 6AA076FF A276FF27 '.vA.v.j..|....6..F..P.v%.v-hO'. 0000E0
68FA4689 9E468800 07C626A4 5EC4FFA7 E910C483 000003F8 9A006AA0 76FFA276 vA.v.j..«....6.Ol.6^E&6...F..F*h 000100
68F676FF F876FF07 6A5016AA 46800000 01089A50 16FA468D A476FFA6 76FF0223 #..vl.vE.F*.P......F'.Pj..v%.v-h 000120
FA468D50 16AA468D A476FFA6 76FF12C4 83000002 A89A006A 0A76FF0C 76FF2712 .'.v..v.j..'....6..vl.vE.F'.P.F* 000140
C626A45E C4000002 8F9AA476 FFA676FF A876FFFC 76FFFE76 FF000001 C59A5016 .P.e....vt.ve.v'.vl.vE.¢...6^E&6 000160
83D88E02 1AB81E56 57000008 C8C8C95F 5E1F0000 E90000B8 FA46899E 46880007 ...F..F*|..O...^ eua...WV.|...A. 000180
26FC4788 260E5EC4 040E4683 FA5689F8 4689FE57 8826FC47 88260E5E C4040E46 F..6^.&.G=&.Wt.F%.V*.F..6^.&.G=& 0001A0
0A76FF0C 76FF2714 68F876FF FA76FF13 6AFC76FF FE76FFFE 5689FC46 89FE5788 .Wt.F=.Vt.vt.vej..v*.v%h.'.v..v. 0001C0
4683D88E 044B881E 56570000 0EC8C8C9 5F5E1F00 00E912C4 83000003 9A9A006A j.......6.O...^_eua...WV.|K..A.F 0001E0

Dump of file SATURN:[PCCOMMON.DUMP.DLL]DMLGLOB.TMP;1 on 18-APR-1990 10:44:56.67
File ID (627,22,0)   End of file block 315 / Allocated 316

Virtual block number 7 (00000007), 512 (0200) bytes

8826FC47 88260E5E C4040E46 83FA5689 F84689FE 578826FC 4788260E 5EC4040E ..6^.&.G=&.Wt.F%.V*.F..6^.&.G=&. 000000
006A0A76 FF0C76FF 271468F8 76FFFA76 FF0F6A50 16FC468D F65689F4 4689FE57 Wt.F¶.V-.F=.Pj..v*.v%h.'.v..v.j. 000020
FE4608FC 4688005C E9F24688 0006E903 7500F27E 83F24689 12C48300 00052F9A ./....6..F.-'.u.O...F.O\..F=.Ft 000040
569A006A FC76FFFE 76FF27D8 68F876FF FA76FFF4 76FFF676 FF0F6A00 27E90375 u.O'.j..v-.v¶.v*.v%hU'.vt.vej..V 000060
0C76FF27 D868F876 FFFA76FF 0F6AF476 FFF676FF 0024E9F2 468912C4 83000005 ....6..F.O$..v-.v¶j..v*.v%hA'.v. 000080
57000008 C8C8C95F 5E1F0000 E9F24688 F2468912 C4830000 04939A00 6A0A76FF .v.j.......6..F..F.O...^ eua...W 0000A0
040E4683 FE5689FC 4689FE57 8826FC47 88260E5E C4040E46 83D88E04 AAB81E56 V.|..A.F..6^.&.G=&.Wt.F=.Vt.F.. 0000C0
76FFFE76 FF146AF8 76FFFA76 FF026AFA 5689F846 89FE5788 26FC4788 260E5EC4 6^.&.G=&.Wt.F%.V*j..v*.v%j..vt.v 0000E0
000000C8 CBC95F5E 1F0000E9 14C48300 0004F19A 006A0A76 FF0C76FF 271868FC =h.'.v..v.j..p....6.O...^_eua... 000100
05D4B81E 56570000 02C8C8C9 5F5E1F00 00E90856 88064688 D88E0573 881E5657 WV.|s..A.F..V.O...^_eua..WV.|A. 000120
FFFF9A00 6A008168 026A006A 006A006A 0042681E 016A316A FFFF68FF FF68D88E .Ah..h..j1j..hB.j.j.j.j.h..j.... 000140
02030000 000105F3 00020009 90C8C95F 5E1F0000 E9FE4688 FE468918 C4830000 ...6..Ft.FtO...^ eu.....#....... 000160
02030000 002E05EE 00020264 000801AF 02030246 00080427 0203005E 00050580 §...^...'...F...E...d...Y....... 000180
0000023C 000803DE 02030231 00080413 020305CC 000105F6 00050038 0005060E ....8...-...a.......1...8...<... 0001A0
5689F446 89FE5?*B 26FC4788 260E5EC4 040E4683 D88EFFFF 881E5657 00000EC8 a...WV.|...A.F..6^.&.G=&.Wt.F¶.V 0001C0
4788260E 5EC40/ E 4683FA56 89F84689 FE578826 FC478826 0E5EC404 0E4683F6 -.F..6^.&.G=&.Wt.F%.V*.F..6^.&.G 0001E0

Dump of file SATURN:[PCCOMMON.DUMP.DLL]DMLGLOB.TMP;1 on 18-APR-1990 10:44:56.67
File ID (627,22,0)   End of file block 315 / Allocated 316

Virtual block number 8 (00000008), 512 (0200) bytes

76FF2718 68F476FF F676FF14 6AFC76FF FE76FF0F 6AFE5689 FC4689FE 578826FC =&.Wt.F=.Vtj..vt.vej..v..v¶h.'.v 000000
000014C8 CBC95F5E 1F0000E9 F24688F2 468914C4 830000FF FF9A006A 0A76FF0C ..v.j.......6..F..F.O...' eua... 000020
0E4683F6 5689F446 89FE5788 26FC4788 260E5EC4 040E4683 D88E0008 881E5657 WV.|...A.F..6^.&.G=&.Wt.F¶.V-.F. 000040
0E5EC404 0E4683FC 4689FE47 88260E5E C4020E46 83FE4689 FE478826 0E5EC402 .6^.&.Gt.Ft.F..6^.&.Gt.F=.F..6^. 000060
F84689FE 578826FC 4788260E 5EC4040E 4683F256 89F04689 FE578826 FC478826 &.G=&.Wt.Fp.V..F..6^.&.G=&.Wt.F% 000080
000001A8 9AF876FF FA76FFF0 76FFF276 FF026968 0074E903 7400FE7E 83FA5689 .v*.-t.t.Ot.hi..v..vp.v*.v%.'... 0000A0
0A76FF0C 76FF271A 68F476FF F676FF00 6A020468 F076FFF2 76FFF876 FFFA76FF .v*.v%.v..vph..j..v-.v¶h.'.v..v. 0000C0
6A020468 F076FFF2 76FFF876 FFFA76FF 1CC48300 00FFFF9A 006A0A76 FF0C76FF .v..v.j.......6..v*.v%.v..vph..j 0000E0
00A1E900 008818C4 83000001 7A9A006A 0A76FF0C 76FF271A 68F476FF F676FF0F ..v-.v¶h.'.v..v.j..z....6.j..OA. 000100
C4830000 01F49A00 6A0A76FF 0C76FF27 1868F476 FFF676FF FE76FF50 16EC468D .F$.P.vt.v-.v¶h.'.v..v.j..¶....6 000120
76FFF276 FF028768 002EE9FE 4688006F E90000B8 0006E903 74EE4608 EC468812 ..F$.FYt.O..|..Oo..FtO..h...v..v 000140
0000FFFF 9AF876FF FA76FFF0 76FFF276 FF029268 000001BC 9AF876FF FA76FFF0 p.v*.v%.Y...h...v..vp.v*.v%..... 000160
020468F0 76FFF276 FFF876FF FA76FF00 00E9FFCA E9037500 0F3D0008 E9000EE9 O..O..=..u.Oo.O...v*.v%.v..vph.. 000180
00E90000 8818C483 00000067 9A006AEC 76FFEE76 FF271A68 F476FFF6 76FF006A j..v-.v¶h.'.vY.v$j..g....6.j..O. 0001A0
578826FC 4788260E 5EC4040E 4683D88E 0084B81E 56570000 62C8C8C9 5F5E1F00 ..^ euab..WV.|...A.F..6^.&.G=&.W 0001C0
020E4683 A65689A4 4689FE57 8826FC47 88260E5E C4040E46 83F85689 F64689FE t.F-.V%.F..6^.&.G=&.Wt.FE.Vl.F.. 0001E0
```

Dump of file SATURN:[PCCOMMON.DUMP.DLL]DMLGLOB.TMP;1 on 18-APR-1990 10:44:56.67
File ID (627,22,0)   End of file block 315 / Allocated 316

Virtual block number 9 (00000009), 512 (0200) bytes

```
260E5EC4 040E4683 A84689FE 4788260E 5EC4020E 46839E46 89FE478B 260E5EC4 &^.&.G±.F..F..&^.&.G±.F´.F..&^.& 000000
FF5016FA 468DFA46 899E468B 0007C626 A45EC4FE 5689FC46 89FE578B 26FC478B .G•&.W±.F•.V±&^Ê&6...F..F•.F•.P. 000020
00000200 9A076A0A 76FF0C76 FF271A68 F676FFF8 76FF006A 020468A4 76FFA676 v|.vÊh..j..v½.v-h.'.v..v.j..\... 000040
46880007 C626A45E C40000FF FF9AA476 FFA676FF A876FFFC 76FFFE76 FF18C483 .&..v±.v•.v´.v|.vÊ.....&^Ê&6...F 000060
0003159A 006A0A76 FF0C76FF 271B68F6 76FFF876 FF106A50 16A0468D FA46899E ..F•.F..Pj..v½.v-h.'.v..v.j..... 000080
A676FF9E 76FF5040 A84688FC 76FFFE76 FF004EE9 0375A246 08A0468B 12C48300 ..&..F..FÅu.ÒN..v±.v•.F´∂P.v..v| 0000A0
16A0468D 18C48300 0003339A 006AA076 FFA276FF 27E668F6 76FFF876 FFA476FF .vÊ.v½.v-h|'.vÅ.v.j..3....&..F.. 0000C0
A0468DFF A7E910C4 83000003 569A006A A076FFA2 76FF27DA 68F676FF F876FF50 P.v½.v-hÖ'.vÅ.v.j..V....&.ÕI..F. 0000E0
A0468812 C4830000 038E9A00 6A0A76FF 0C76FF27 1868F676 FFF876FF 116A5016 .Pj..v½.v-h.'.v..v.j.......&..F. 000100
FFF876FF A476FFA6 76FF9E76 FF5040A8 4688FC76 FFFE76FF 004EE903 75A2460B .FÅu.ÒN..v±.v•.F´∂P.v..v|.vÊ.v½. 000120
F676FFF8 76FF5016 A04680 18 C4830000 03AC9A00 6AA076FF A276FF27 E668F676 v-h|'.vÅ.v.j..¯....&..F..P.v½.v- 000140
9E468B00 07C626A4 5EC4FFA7 E910C483 00000153 9A006AA0 76FFA276 FF27DA68 hÖ'.vÅ.v.j..S....&.ÕI.&^Ê&6...F. 000160
F876FF07 6A5016AA 46800000 00FC9A50 16FA4680 A476FFA6 76FF0223 68FA4689 .F•h#..v|.vÊ.F•.P.•....F´.Pj..v½ 000180
16AA468D A476FFA6 76FF12C4 83000002 9C9A006A 0A76FF0C 76FF2712 68F676FF .v-h.'.v..v.j.......&..v|.vÊ.F´. 0001A0
C4000002 B39AA476 FFA676FF A876FFFC 76FFFE76 FF0000FF FF9A5016 FA468D50 P.F•.P......v±.v•.v´.v|.vÊ.•...& 0001C0
0E881E56 57000008 C8C8C95F 5E1F0000 E90000B8 FA46899E 46880007 C626A45E ^Ê&6...F..F•|..Õ...^_èùà...WV.|. 0001E0
```

Dump of file SATURN:[PCCOMMON.DUMP.DLL]DMLGLOB.TMP;1 on 18-APR-1990 10:44:56.67
File ID (627,22,0)   End of file block 315 / Allocated 316

Virtual block number 10 (0000000A), 512 (0200) bytes

```
260E5EC4 040E4683 FA5689F8 4689FE57 8826FC47 88260E5E C4040E46 83088E02 ..Ä.F..&^.&.G•&.W±.F½.V•.F..&^.& 000000
76FF2714 68F876FF FA76FF14 6AFC76FF FE76FFFE 5689FC46 89FE578B 26FC478B .G•&.W±.F•.V±.v±.v•j..v•.v½h.'.v 000020
043F881E 56570000 0EC8C8C9 5F5E1F00 00E912C4 83000003 EF9A006A 0A76FF0C ..v.j..ÿ....&.Õ...^_èùà...WV.|?. 000040
88260E5E C4040E46 83F65689 F44689FE 578826FC 4788260E 5EC4040E 4683088E .Ä.F..&^.&.G•&.W±.F¶.V-.F..&^.&. 000060
76FF5016 FC468007 89260247 89260000 88F85EC4 FA5689F8 4689FE57 8826FC47 G•&.W±.F½.V•&^½|..&.G.&...F•.P.v 000080
037500F2 7E83F246 8910C483 00000521 9A006A0A 76FF0C76 FF27E968 F476FFF6 -.v¶hÖ'.v..v.j..!....&..F·.-·.u. 0000A0
006AFC76 FFFE76FF 271E68F4 76FFF676 FFF876FF FA76FF00 28E90000 B80006E9 Õ..|..Õ(..v•.v½.v-.v¶h.'.v±.v•j. 0000C0
049E881E 56570000 0EC8C8C9 5F5E1F00 00E90000 88F24689 10C48300 0004879A ......&..F·|..Õ...^_èùà...WV.|.. 0000E0
88260E5E C4040E46 83FA5689 F84689FE 578826FC 4788260E 5EC4040E 4683088E .Ä.F..&^.&.G•&.W±.F½.V•.F..&^.&. 000100
FF0C76FF 271468F8 76FFFA76 FF106A50 16FC468D F65689F4 4689FE57 8826FC47 G•&.W±.F¶.V-.F•.Pj..v•.v½h.'.v.. 000120
4688005C E9F2468B 0006E903 7500F27E 83F24689 12C48300 0005C39A 006A0A76 v.j..û....&..F·.-·.u.Õ...F·Õ\..F 000140
FC76FFFE 76FF27D8 68F876FF FA76FFF4 76FFF676 FF106A00 27E90375 FE460BFC •.F±u.Õ'.j..v-.v¶.v•.½hÜ'.v±.v• 000160
D868F876 FFFA76FF 106AF476 FFF676FF 0024E9F2 468912C4 83000005 EA9A006A j..ŏ....&..F·Õ$..v-.v¶|..v•.v½hÅ 000180
C8C8C95F 5E1F0000 E9F2468B F2468912 C4830000 04F09A00 6A0A76FF 0C76FF27 '.v..v.j..Þ....&..F·.F·Õ...^_èùà 0001A0
FE5689FC 4689FE57 8826FC47 88260E5E C4040E46 83088E05 3E881E56 57000008 ...WV.|>..Ä.F..&^.&.G•&.W±.F•.V± 0001C0
FF156AF8 76FFFA76 FF026AFA 5689F846 89FE578B 26FC478B 260E5EC4 040E4683 .F..&^.&.G•&.W±.F½.V•j..v•.v½j.. 0001E0
```

Dump of file SATURN:[PCCOMMON.DUMP.DLL]DMLGLOB.TMP;1 on 18-APR-1990 10:44:56.67
File ID (627,22,0)   End of file block 315 / Allocated 316

Virtual block number 11 (0000000B), 512 (0200) bytes

```
C8C95F5E 1F0000E9 14C48300 0005859A 006A0A76 FF0C76FF 271868FC 76FFFE76 v±.v•h.'.v..v.j.......&.Õ...^_èù 000000
5689F846 89FE578B 26FC478B 260E5EC4 040E4683 D88E0607 881E5657 00000EC8 à...WV.|...Ä.F..&^.&.G•&.W±.F½.V 000020
76FFFA76 FF5016FC 468DF456 89F24689 FE578826 FC478826 0E5EC404 0E4683FA •.F..&^.&.G•&.W±.F·.V¶.F•.P.v•.v 000040
0006E903 7500F67E 83F64689 10C48300 00060E9A 006A0A76 FF0C76FF 27E968F8 ½hÖ'.v..v.j..B....&..F-.--.u.Õ.. 000060
06519A00 6AFC76FF FE76FF27 1C68F876 FFFA76FF F276FFF4 76FF0031 E9F6468B .F-Õ1..v¶.v·.v•.v½h.'.v±.v•j..Q. 000080
00000AC8 C8C95F5E 1F0000E9 F6468800 06E90375 00F67E83 F6468910 C4830000 ...&..F-.--.u.Õ...F-Õ...^_èùà... 0000A0
F6468DFE 5689FC46 89FE578B 26FC478B 260E5EC4 040E4683 D88E0668 881E5657 WV.|h..Ä.F..&^.&.G•&.W±.F•.V±.F- 0000C0
FA468912 C483 )00 07769A00 6A0A76FF 0C76FF27 1468FC76 FFFE76FF 146A5016 .Pj..v±.v•h.'.v..v.j..v....&..F• 0000E0
FFF876FF 0F6A..35 E90375F8 460BF646 880063E9 FA468800 06E90375 00FA7E83 .-•.u.Õ...F•Õc..F-.F½u.Õ5.j..v½. 000100
FA468914 C4830000 06AD9A00 6A0A76FF 0C76FF27 1968FC76 FFFE76FF 146AF676 v-j..v±.v•h.'.v..v.j..Ù....&..F• 000120
FF0A76FF 0C76FF02 6AFC76FF FE76FF00 6A0023E9 FA468800 06E90375 00FA7E83 .-•.u.Õ...F•Õ#.j..v±.v•j..v..v.. 000140
04881E56 57000000 C8C8C95F 5E1F0000 E912C483 00000129 9A006A06 76FF0876 v..v.j..)....&.Õ...^_èùà...WV.|. 000160
FFFF6808 8E078F88 1E565700 0002C8C8 C95F5E1F 0000E908 56880646 88D88E07 ..Ä.F..V.Õ...^_èùà...WV.|¢..Äh.. 000180
8918C483 0000FFFF 9A006A32 6A026A00 6A006A00 6A006C68 1E016A31 6AFFFF68 h..j1j..hl.j.j.j.j.j2j.......&.. 0001A0
02460008 04180203 005E0005 07360203 000990C8 C95F5E1F 0000E9FE 4688FE46 F±.F±Õ...^_èù.....6...^.......F. 0001C0
00380005 07F80203 0000002E 07D90002 00680005 07A80203 00000002 07DE0002 ..8.......¯...k...).......½...8. 0001E0
```

```
Dump of file SATURN:[PCCOMMON.DUMP.DLL]DMLGLOB.TMP;1 on 18-APR-1990 10:44:56.67
File ID (627,22,0)   End of file block 315 / Allocated 316

Virtual block number 12 (0000000C), 512 (0200) bytes

00000000 00000000 023C0008 03020203 07B70002 07E10005 02310008 04070203 ......1...Å...ñ...@...<......... 000000
000207C7 26085EC4 049AE999 A98803E5 E9064688 D88EFFFF 881E5657 000000C8 à...WV.¡...Ã.F.Ðl.¡`.Ô..á^.&ú... 000020
5EC4046E E9000007 C7260C5E C4000507 C726085E C40481E9 000007C7 260C5EC4 á^.&ú...Ô..á^.&ú...á^.&ú...Ôn.á^ 000040
0107C726 0C5EC400 3007C726 085EC404 5BE90001 07C7260C 5EC40031 07C72608 .&ú.1.á^.&ú...Ôl.á^.&ú.0.á^.&ú... 000060
C4003207 C726085E C40435E9 000107C7 260C5EC4 005007C7 26085EC4 0448E900 .ÔH.á^.&ú.P.á^.&ú...Ô5.á^.&ú.2.á 000080
085EC404 0FE90001 07C7260C 5EC40033 07C72608 5EC40422 E9000107 C7260C5E ^.&ú...Ô".á^.&ú.3.á^.&ú...Ô..á^. 0000A0
000107C7 260C5EC4 003507C7 26085EC4 03FCE900 0107C726 0C5EC400 3407C726 &ú.4.á^.&ú...Ô=.á^.&ú.5.á^.&ú... 0000C0
5EC40037 07C72608 5EC403D6 E9000107 C7260C5E C4003607 C726085E C403E9E9 ÔÖ.á^.&ú.6.á^.&ú...Ôe.á^.&ú.7.á^ 0000E0
26085EC4 03B0E900 0107C726 0C5EC400 3807C726 085EC403 C3E90001 07C7260C .&ú...Ôû.á^.&ú.8.á^.&ú...Ô¯.á^.& 000100
E9000107 C7260C5E C4003A07 C726085E C40390E9 000107C7 260C5EC4 003907C7 ú.9.á^.&ú...Ô..á^.&ú.:.á^.&ú...Ô 000120
0C5EC400 3C07C726 085EC403 77E90001 07C7260C 5EC40038 07C72608 5EC4038A ..á^.&ú.;.á^.&ú...Ôw.á^.&ú.<.á^. 000140
C726085E C40351E9 000107C7 260C5EC4 003D07C7 26085EC4 0364E900 0107C726 &ú...Ôd.á^.&ú.=.á^.&ú...ÔQ.á^.&ú 000160
2BE90001 07C7260C 5EC4003F 07C72608 5EC4033E E9000107 C7260C5E C4003E07 .>.á^.&ú...Ô>.á^.&ú.?.á^.&ú...Ô+ 000180
260C5EC4 004107C7 26085EC4 0318E900 0107C726 0C5EC400 4007C726 085EC403 .á^.&ú.@.á^.&ú...Ô..á^.&ú.A.á^.& 0001A0
07C72608 5EC402F2 E9000107 C7260C5E C4004207 C726085E C40305E9 000107C7 ú...Ô..á^.&ú.B.á^.&ú...Ô..á^.&ú. 0001C0
02CCE900 0107C726 0C5EC400 4407C726 085EC402 DFE90001 07C7260C 5EC40043 C.á^.&ú...Ôß.á^.&ú.D.á^.&ú...Ôì. 0001E0

Dump of file SATURN:[PCCOMMON.DUMP.DLL]DMLGLOB.TMP;1 on 18-APR-1990 10:44:56.67
File ID (627,22,0)   End of file block 315 / Allocated 316

Virtual block number 13 (0000000D), 512 (0200) bytes

C7260C5E C4004607 C726085E C402B9E9 000107C7 260C5EC4 004507C7 26085EC4 á^.&ú.E.á^.&ú...Ô¿.á^.&ú.F.á^.&ú 000000
4807C726 085EC402 93E90001 07C7260C 5EC40047 07C72608 5EC402A6 E9000107 ...Ôl.á^.&ú.G.á^.&ú...Ô..á^.&ú.H 000020
C4026DE9 000107C7 260C5EC4 004907C7 26085EC4 0280E900 0107C726 0C5EC400 .á^.&ú...Ô..á^.&ú.I.á^.&ú...Ôm.á 000040
07C7260C 5EC4004B 07C72608 5EC4025A E9000107 C7260C5E C4004A07 C726085E ^.&ú.J.á^.&ú...ÔZ.á^.&ú.K.á^.&ú. 000060
004D07C7 26085EC4 0234E900 0107C726 0C5EC400 4C07C726 085EC402 47E90001 ..ÔG.á^.&ú.L.á^.&ú...Ô4.á^.&ú.M. 000080
5EC4020E E9000107 C7260C5E C4004E07 C726085E C40221E9 000107C7 260C5EC4 á^.&ú...Ô!.á^.&ú.N.á^.&ú...Ô..á^ 0000A0
0007C726 0C5EC400 1207C726 085EC401 FBE90001 07C7260C 5EC4004F 07C72608 .&ú.O.á^.&ú...Ô«.á^.&ú...á^.&ú.. 0000C0
C4001E07 C726085E C401D5E9 000007C7 260C5EC4 002207C7 26085EC4 01E8E900 .ÔÕ.á^.&ú.".á^.&ú...Ôl.á^.&ú...á 0000E0
085EC401 AFE90000 07C7260C 5EC40021 07C72608 5EC401C2 E9000007 C7260C5E ^.&ú...Ôõ.á^.&ú.!.á^.&ú...ÔE.á^. 000100
000007C7 260C5EC4 002607C7 26085EC4 019CE900 0007C726 0C5EC400 1F07C726 &ú...á^.&ú...Ô..á^.&ú.&.á^.&ú... 000120
5EC40028 07C72608 5EC40176 E9000007 C7260C5E C4002707 C726085E C40189E9 Ô..á^.&ú.'.á^.&ú...Ôv.á^.&ú.(.á^ 000140
26085EC4 0150E900 0007C726 0C5EC400 2307C726 085EC401 63E90000 07C7260C .&ú...Ôc.á^.&ú.#.á^.&ú...ÔP.á^.& 000160
E9000007 C7260C5E C4001707 C726085E C40130E9 000007C7 260C5EC4 002507C7 ú.%.á^.&ú...Ô0.á^.&ú...á^.&ú...Ô 000180
0C5EC400 2A07C726 085EC401 17E90000 07C7260C 5EC40029 07C72608 5EC4012A *.á^.&ú.).á^.&ú...Ô..á^.&ú.*.á^. 0001A0
C726085E C400F1E9 000007C7 260C5EC4 002B07C7 26085EC4 0104E900 0007C726 &ú...Ô..á^.&ú.+.á^.&ú...Ôþ.á^.&ú 0001C0
C8E90000 07C7260C 5EC40016 07C72608 5EC4000E E9000007 C7260C5E C4001807 ...á^.&ú...Ôè.á^.&ú...á^.&ú...Ôù 0001E0

Dump of file SATURN:[PCCOMMON.DUMP.DLL]DMLGLOB.TMP;1 on 18-APR-1990 10:44:56.67
File ID (627,22,0)   End of file block 315 / Allocated 316

Virtual block number 14 (0000000E), 512 (0200) bytes

E9037600 50300031 20008SE9 0088E900 0007C726 0C5EC400 1D07C726 085EC400 .á^.&ú...á^.&ú...Ô¡.Ôç.-1.=P.v.Ô 000000
0122010F 00FC00E9 000600C3 0080009D 008A0077 0051040A A7FF2E93 C003FC10 .=.á...Ï..Q.w......ú.ø.Ô.»...". 000020
0252023F 022C0219 020601F3 01E001CD 018A01A7 01940181 016E015B 01480135 5.H.[.n.....].ø.ë.Å.µ.......?.R. 000040
00120012 02FD02EA 02C402D7 00120012 02810051 00510051 029E0288 02780265 e.x.....Q.Q.Q.Ÿ.....ø.á.ð.»..... 000060
00120012 00120336 03230310 00120012 003E03CE 00120012 00120012 ..........ð.>...........#.6...... 000080
08881E56 5700000A C8C8C95F 5E1F0000 E9000088 00640028 00180012 00120012 ........+.d.(..Ô...^_èùà...WV.[. 0000A0
7500F87E 83F84689 0AC483FF FF00009A 0676FF50 16F64680 5016FE46 80D88E00 ..Ã.Fs.P.F-.P.v........á..F½.-½.u 0000C0
FFFC5689 FA4689FE 578826FC 4788260C 5EC4040C 4683006A E9F84688 0006E903 .Ô...F½Ôj..F..á^.&.G=&.Wz.Fº.V=. 0000E0
880006E9 037500F8 7E83F846 890000FF FF9A0876 FF0A76FF F676FFFA 76FFFC76 v=.vº.v-.v..v........F½.-½.u.Ô... 000100
77FF2608 5EC4FA76 FFFC76FF 0020E900 00880006 E9037400 FE7E8300 2FE9F846 F½Ô/..-±.t.Ô..(..Ô ..v=.vºá^.&.w 000120
1E565700 0004C8C8 C95F5E1F 0000E900 00FFFF9A 50160646 80FE76FF 37FF2602 .&.7.vz.F..P.....Ô...^_èùà...WV. 000140
FC76FFFE 76FFFE56 89FC4689 FE578826 FC478826 0A5EC404 0A468308 8E04BFB8 ¡¢..Ã.F..á^.&.G=&.Wz.F=.Vz.vz.v= 000160
83D88E05 61881E56 5700000A C8C8C95F 5E1F0000 E90000FF FF9A0676 FF0876FF .v..v.......Ô...^_èùà...WV.¡a..Ã. 000180
0676FF08 76FFFA76 FFFC76FF FC5689FA 4689FE57 8826FC47 88260E5E C4040E46 F..á^.&.G=&.Wz.FT.V=.v=.vº.v..v. 0001A0
E9F64688 019FE9F8 46880006 E9037500 F87E83F8 46890000 FFFF9A50 16F64680 .F-.P......F½.-½.u.Ô...F½Ô...F-Ô 0001C0
```

Dump of file SATURN:[PCCOMMON.DUMP.DLL]DMLGLOB.TMP;1 on 18-APR-1990 10:44:56.67
File ID (627,22,0)   End of file block 315 / Allocated 316

Virtual block number 15 (0000000F), 512 (0200) bytes

```
5EC4017D E9000088 007F07C7 260A5EC4 018BE900 00880080 07C7260A 5EC40115 ..á^.&ú...|..Õ..á^.&ú...|..Õ).á^ 000000
07C7260A 5EC40161 E9000088 005307C7 260A5EC4 016FE900 00880060 07C7260A .&ú.'.|..Õo.á^.&ú.S.|..Õ=.á^.&ú. 000020
00880056 07C7260A 5EC40145 E9000088 005707C7 260A5EC4 0153E900 00880075 u.|..ÕS.á^.&ú.W.|..ÕE.á^.&ú.V.|. 000040
011BE900 00880059 07C7260A 5EC40129 E9000088 005807C7 260A5EC4 0137E900 .Õ7.á^.&ú.X.|..Õ).á^.&ú.Y.|..Õ.. 000060
260A5EC4 00FFE900 00880067 07C7260A 5EC4010D E9000088 006607C7 260A5EC4 á^.&ú.f.|..Õ..á^.&ú.g.|..Õ..á^.& 000080
007007C7 260A5EC4 00E3E900 0088006F 07C7260A 5EC400F1 E9000088 006807C7 ú.h.|..Õp.á^.&ú.o.|..ÕD.á^.&ú.p. 0000A0
E9000088 006C07C7 260A5EC4 00C7E900 00880073 07C7260A 5EC40005 E9000088 |..Õl.á^.&ú.s.|..Õú.á^.&ú.l.|..Õ 0000C0
5EC40090 E9000088 006E07C7 260A5EC4 00ABE900 0088006D 07C7260A 5EC40089 ¿.á^.&ú.m.|..Õ .á^.&ú.n.|..Õ..á^ 0000E0
E9037600 29300002 2D0067E9 006AE900 01FE46C7 008FE900 00880074 07C7260A .&ú.t.|..Õ..úF±..Õj.Õg.-..=).v.Õ 000100
06EC06EC 06EC06EC 06EC06EC 06EC05E2 06EC06EC 05F0070A A7FF2E93 C003FFEA õ..&...Ì..Þ.$.$.õ.$.$.$.$.$.$.$. 000120
06EC06EC 06EC06EC 06DE06A6 05FE06EC 06EC06EC 060C06EC 06EC06EC 06EC06EC $.$.$.$.$...$.$.±.Ì.B.$.$.$.$. 000140
76FF0600 06C206B4 067C066E 06600698 06EC068A 06280644 06EC0652 0636061A ..6.R.$.D.(...$...'.n.|.Ç.ó.Å..v 000160
CBC95F5E 1F0000E9 0000FFFF 9A0A76FF 0C76FFFE 76FF0676 FF0876FF FA76FFFC •.v•.v..v..v±.v..v......Õ...^_èù 000180
7500003D FFFF0A70 9A0202A3 26064688 27CC068E D88E059B B81E5657 000000C8 à...WV.|...Ä..ä'.F.&É...p...=¯.u 0001A0
07D19A02 FFE90000 B80006E9 03750000 30FFFF48 FC9A0312 E9000088 0006E903 .Õ..|..Õ...•H..=..u.Õ..|..Õ...1. 0001C0
00008800 06E90375 000030FF FF001A9A 02ECE900 00880006 E9037500 003DFFFF ..=..u.Õ..|..Õ$......=..u.Õ..|.. 0001E0
```

Dump of file SATURN:[PCCOMMON.DUMP.DLL]DMLGLOB.TMP;1 on 18-APR-1990 10:44:56.67
File ID (627,22,0)   End of file block 315 / Allocated 316

Virtual block number 16 (00000010), 512 (0200) bytes

```
03750000 30FFFF05 C49A02C6 E9000088 0006E903 7500003D FFFF001A 9A02D9E9 Õ1.......=..u.Õ..|..Õó..á...=..u. 000000
FF00819A 02A0E900 00880006 E9037500 0030FFFF 00749A02 83E90000 880006E9 Õ..|..Õ°..t...=..u.Õ..|..Õ...... 000020
E9000088 0006E903 7500003D FFFF0356 9A0280E9 00008800 06E90375 000030FF .=..u.Õ..|..Õ...V...=..u.Õ..|..Õ 000040
E9037500 0030FFFF 15989A02 67E90000 880006E9 03750000 30FFFF17 EA9A027A z..õ...=..u.Õ..|..Õg......=..u.Õ 000060
FFFF1CF6 9A0241E9 00008800 06E90375 000030FF FF15299A 0254E900 00880006 ..|..ÕT..)...=..u.Õ..|..ÕA..-... 000080
18E90000 880006E9 03750000 30FFFF03 C99A022E E9000088 0006E903 7500003D =..u.Õ..|..Õ...è...=..u.Õ..|..Õ. 0000A0
06E90375 000030FF FF03879A 0208E900 00880006 E9037500 0030FFFF 039A02 ..«...=..u.Õ..|..Õ.......=..u.Õ. 0000C0
30FFFF03 F69A01E2 E9000088 0006E903 7500003D FFFF03A6 9A01F5E9 00008800 .|..Õ%..Ì...=..u.Õ..|..Õä..-...= 0000E0
018CE900 00880006 E9037500 0030FFFF 02EB9A01 CFE90000 880006E9 03750000 ..u.Õ..|..Õù..$...=..u.Õ..|..Õ¥. 000100
0006E903 7500003D FFFF0755 9A01A9E9 00008800 06E90375 000030FF FF03059A .....=..u.Õ..|..Õ`..U...=..u.Õ.. 000120
0030FFFF 05179A01 83E90000 880006E9 03750000 30FFFF00 1A9A0196 E9000088 |..Õ.......=..u.Õ..|..Õ.......=. 000140
9A0150E9 00008800 06E90375 000030FF FF1F939A 0170E900 00880006 E9037500 .u.Õ..|..Õp......=..u.Õ..|..Õ].. 000160
880006E9 03750000 30FFFF01 1E9A014A E9000088 0006E903 75000030 FFFF20FC •-..=..u.Õ..|..ÕJ......=..u.Õ..| 000180
000030FF FF04439A 0124E900 00880006 E9037500 003DFFFF 02689A01 37E90000 ..Õ7..k...=..u.Õ..|..Õ$..C...=.. 0001A0
139A00FE E9000088 0006E903 7500003D FFFF001F 9A0111E9 00008800 06E90375 u.Õ..|..Õ.......=..u.Õ..|..Õ±... 0001C0
00880006 E9037500 0030FFFF 00E59A00 EBE90000 880006E9 03750000 3DFFFF17 ...=..u.Õ..|..Õ$..Ì...=..u.Õ..|. 0001E0
```

Dump of file SATURN:[PCCOMMON.DUMP.DLL]DMLGLOB.TMP;1 on 18-APR-1990 10:44:56.67
File ID (627,22,0)   End of file block 315 / Allocated 316

Virtual block number 17 (00000011), 512 (0200) bytes

```
75000030 FFFF012B 9A00C5E9 00008800 06E90375 000030FF FF02B99A 0008E900 .ÕÅ..¿...=..u.Õ..|..Õé..+...=..u 000000
00E19A00 9FE90000 880006E9 03750000 30FFFF00 E19A00B2 E9000088 0006E903 .Õ..|..Õÿ..Å...=..u.Õ..|..Õ...Å. 000020
00008800 06E90375 000030FF FF00E19A 008CE900 00880006 E9037500 003DFFFF ..=..u.Õ..|..Õ...Å...=..u.Õ..|.. 000040
03750000 3DFFFF02 EE9A0066 E9000088 0006E903 75000030 FFFF0689 9A0079E9 Õy......=..u.Õ..|..Õf..Ÿ...=..u. 000060
FF143A9A 0040E900 00880006 E9037500 003DFFFF 05E69A00 53E90000 880006E9 Õ..|..ÕS..Ì...=..u.Õ..|..Õa..:.. 000080
040368FF FF680A9E 68FFFF68 0A986800 6A0020E9 00008800 06E90375 000030FF .=..u.Õ..|..Õ-.j.h..h..h..h..h(. 0000A0
C95F5E1F 0000E900 01880006 E9000088 0006E903 75000030 0000FFFF 9AFFFF68 h.......=..u.Õ..|..Õ..|..Õ...^ è 0000C0
07C00002 00000021 09C10002 00000001 0A6C0002 00000020 09AE0002 003390C8 ù.3...Ù. .....l.......è.!.....Ï. 0000E0
079A0002 00000023 09E70002 00000003 0A920002 00000022 09D40002 00000002 ......å."............Ô.#....... 000100
07AD0002 04B70003 0A950005 00000025 0A0D0002 00000024 09FA0002 00000004 ......'.$.......X.........ñ...Ù. 000120
07E60002 00000027 0A330002 00000007 07D30002 00000026 0A200002 00000006 ...... .&.....&.......3.'.....|. 000140
080C0002 00000029 0A590002 00000009 07F90002 00000028 0A460002 00000008 ......F.(.....'.......Y.)....... 000160
08320002 017D0006 05C60203 0000000B 081F0002 0000002A 0A7F0002 0000000A ........•.............6...)...2. 000180
0A980005 0000000E 08580002 0000002E 07880002 0000000D 08450002 0000000C ......E...............X......... 0001A0
08910002 00000010 087E0002 0000000F 08680002 01880006 050F0203 05590003 ..Y...........k.......-......... 0001C0
08CA0002 00000013 08870002 00000012 08A40002 01950006 05870203 00000011 ..............È.......ñ.......ð. 0001E0
```

```
Dump of file SATURN:[PCCOMMON.DUMP.DLL]DMLGLOB.TMP;1 on 18-APR-1990 10:44:56.67
File ID (627,22,0)   End of file block 315 / Allocated 316

Virtual block number 18 (00000012), 512 (0200) bytes

 09030002 00000016 08F00002 01280006 07740203 00000015 08D00002 00000014 ......Ï.......t...(...Þ......... 000000
 093C0002 01360006 05400203 00000019 09290002 00000018 09160002 00000017 ...............).......M...6...<. 000020
 0AA10005 004B0J05 0AA40203 0000001C 09620002 0000001B 094F0002 0000001A ......O.......b.......£...K...À. 000040
 00000000 0000001F 09980002 0000001E 09880002 0000001D 09750002 05930003 ......u......................... 000060
 5689F646 89FE5788 26FC4788 260E5EC4 040E4683 D88EFFFF 881E5657 00000AC8 à...WV.¡...Ä.F..á^.&.G•&.Wz.F-.V 000080
 4689FE57 8826FC47 88260E5E C4040E46 83FA4689 FE478826 0E5EC402 0E4683F8 ½.F..á^.&.Gz.Fª.F..á^.&.G•&.Wz.F 0000A0
 00E90000 FFFF9AFC 76FFFE76 FFFA76FF 0A76FF0C 76FFF676 FFF876FF FE5689FC •.Vz.v½.v-.v..v..vª.vz.v•.....Ö. 0000C0
 578826FC 4788260E 5EC4040E 4683D88E 0008881E 56570000 0AC8C8C9 5F5E1F00 ..^_èùà...WV.¡...Ä.F..á^.&.G=&.W 0000E0
 FC478826 0E5EC40/ 0E4683FE 4689FE47 88260E5E C4020E46 83F85689 F64689FE ±.F¯.V½.F..á^.&.Gz.Fz.F..á^.&.G• 000100
 9AFA76FF FC76FFFE 76FF0A76 FF0C76FF F676FFF8 76FFFC56 89FA4689 FE578826 &.Wz.Fª.V•.v½.v-.v..v..vz.v•.vª. 000120
 260E5EC4 040E4683 D88E006E 881E5657 00000AC8 C8C95F5E 1F0000E9 0000FFFF ....Ö...^_èùà...WV.¡n..Ä.F..á^.& 000140
 C4040E46 83FA4689 FE478826 0E5EC402 0E4683F8 5689F646 89FE5788 26FC4788 .G•&.Wz.F¯.V½.F..á^.&.Gz.Fª.F..á 000160
 FFFA76FF 0A76FF0C 76FFF676 FFF876FF FE5689FC 4689FE57 8826FC47 88260E5E ^.&.G•&.Wz.F=.Vz.v½.v-.v..v..vª. 000180
 4683D88E 0004881E 56570000 0AC8C8C9 5F5E1F00 00E90000 FFFF9AFC 76FFFE76 vz.v•.....Ö...^_èùà...WV.¡à..Ä.F 0001A0
 4689FE47 88260E5E C4020E46 83F85689 F64689FE 578826FC 4788260E 5EC4040E ..á^.&.G=&.Wz.F¯.V½.F..á^.&.Gz.F 0001C0
 FF0C76FF F676FFF8 76FFFE56 89FC4689 FE578826 FC478826 0E5EC404 0E4683FA ª.F..á^.&.G•&.Wz.F•.Vz.v½.v-.v.. 0001E0

Dump of file SATURN:[PCCOMMON.DUMP.DLL]DMLGLOB.TMP;1 on 18-APR-1990 10:44:56.67
File ID (627,22,0)   End of file block 315 / Allocated 316

Virtual block number 19 (00000013), 512 (0200) bytes

 881E5657 000008C8 C8C95F5E 1F0000E9 0000FFFF 9AFC76FF FE76FFFA 76FF0A76 v..vª.vz.v•.....Ö...^_èùà...WV.¡ 000000
 0E5EC404 0E4683FA 5689F846 89FE5788 26FC4788 260E5EC4 040E4683 D88E013A :..Ä.F..á^.&.G•&.Wz.F¥.Vª.F..á^. 000020
 E90000FF FF9AFC76 FFFE76FF F876FFFA 76FFFE56 89FC4689 FE578826 FC478826 &.G•&.Wz.F•.Vz.vª.v½.vz.v•.....Ö 000040
 8826FC47 88260E5E C4040E46 83D88E01 A0881E56 57000008 C8C8C95F 5E1F0000 ...^_èùà...WV.¡...Ä.F..á^.&.G•&. 000060
 FE76FFFA 5689F846 89FE5788 26FC4788 260E5EC4 040E4683 FE5689FC 4689FE57 Wz.F=.Vz.F..á^.&.G•&.Wz.F½.Vª.vz 000080
 000008C8 C8C95F5E 1F0000E9 0000FFFF 9AF876FF FA76FF0A 76FF0C76 FFFC76FF .v•.v..v..vª.v½.....Ö...^_èùà... 0000A0
 0E4683FA 5689F846 89FE5788 26FC4788 260E5EC4 040E4683 D88E01EF 881E5657 WV.¡ÿ..Ä.F..á^.&.G•&.Wz.F¥.Vª.F. 0000C0
 89260789 260C5688 0A4688FC 5EC4FE56 89FC4689 FE578826 FC478826 0E5EC404 .á^.&.G•&.Wz.F•.Vzá^•.F..V.&..&. 0000E0
 0E5EC404 0E468308 8E024488 1E565700 000AC8C8 C95F5E1F 0000E900 00880257 W.¡..Ö...^_èùà...WV.¡D..Ä.F..á^. 000100
 040E4683 FE4689FE 4788260E 5EC4020E 4683F856 89F64689 FE578826 FC478826 &.G•&.Wz.F¯.V½.F..á^.&.Gz.Fz.F.. 000120
 FE76FF0A 76FF0C76 FFF676FF F876FFFC 5689FA46 89FE5788 26FC4788 260E5EC4 á^.&.G•&.Wz.Fª.V•.v½.v-.v..v..vz 000140
 83D88E02 95881E56 57000016 C8C8C95F 5E1F0000 E90000FF FF9AFA76 FFFC76FF .v•.vª.....Ö...^_èùà...WV.¡...Ä. 000160
 89FE4788 260E5EC4 020E4683 F05689EE 4689FE57 8826FC47 88260E5E C4040E46 F..á^.&.G•&.Wz.F¥.VÞ.F..á^.&.Gz. 000180
 88260E5E C4020E46 83F65689 F44689FE 578826FC 4788260E 5EC4040E 4683F246 F·.F..á^.&.G•&.Wz.F¶.V-.F..á^.&. 0001A0
 FFF676FF 271068EE 76FFF076 FF5016FC 4680FC46 89FE4689 000088EC 4689FE47 Gz.F&¡...Fz.F=.F=.P.vÞ.vŸh.'.v-. 0001C0
 46880058 E9EA4688 0006E903 7500EA7E 83EA4689 10C48300 00FFFF9A 006AF476 v¶j.......á..Fõ.-õ.u.Ö...FõÕX..F 0001E0

Dump of file SATURN:[PCCOMMON.DUMP.DLL]DMLGLOB.TMP;1 on 18-APR-19.. 10:44:56.67
File ID (627,22,0)   End of file block 315 / Allocated 316

Virtual block number 20 (00000014), 512 (0200) bytes

 0C563900 19E90374 0A4639FE 5688FC46 880047E9 84928800 06E90374 FE4608FC •.Fzt.Ö..¡..ÖG..F•.Vz9F.t.Ö..9V. 000000
 FF0C76FF EE76FFF0 76FF0003 07C726F8 5EC4F846 89FA4689 00008800 11E90374 t.Ö..¡...Fª.F½á^½&ù....vÞ.vŸ.v.. 000020
 57000012 C8C8C95F 5E1F0000 E90000FF FF9AEC76 FFFC76FF FE76FFF2 76FF0A76 v..v·.vz.v•.v$.....Ö...^_èùà...W 000040
 020E4683 F45689F2 4689FE57 8826FC47 88260E5E C4040E46 83D88E02 F8881E56 V.¡«..Ä.F..á^.&.G•&.Wz.F¯.V¶.F.. 000060
 83FA5689 F84689FE 578826FC 4788260E 5EC4040E 4683F646 89FE4788 260E5EC4 á^.&.Gz.F-.F..á^.&.G•&.Wz.F½.Vª. 000080
 76FFF476 FF5016FC 4680FC46 89FE4689 000088F0 4689FE47 88260E5E C4020E46 F..á^.&.Gz.FÞ¡...Fz.F•.F•.P.v¶.v 0000A0
 0006E903 7500EE7E 83EE4689 10C48300 0003659A 006AF876 FFFA76FF 271068F2 ·h.'.vª.v½j..e....á..FŸ.-Ÿ.u.Ö.. 0000C0
 0C76FFF2 76FFF476 FF0020E9 84928800 06E90374 FE4608FC 46880031 E9EE4688 .FŸÖ1..F•.Fzt.Ö..¡..Ö ..v¶.v·.v. 0000E0
 00000CC8 C8C95F5E 1F0000E9 0000FFFF 9AF076FF FC76FFFE 76FFF676 FF0A76FF .v..v-.vz.v•.vÞ.....Ö...^_èùà... 000100
 0E4683F8 5689F646 89FE5788 26FC4788 260E5EC4 040E4683 D88E03E3 881E5657 WV.¡D..Ä.F..á^.&.G•&.Wz.F¯.V½.F. 000120
 FE5689FC 4689FE57 8826FC47 88260E5E C4040E46 83FA4689 FE478826 0E5EC402 .á^.&.Gz.Fª.F..á^.&.G•&.Wz.F•.Vz 000140
 E9037503 F47E8300 00FFFF9A 5016F446 80FA76FF 0A76FF0C 76FFF676 FFF876FF .v½.v-.v..v..vª.F¶.P......-¶.u.Ö 000160
 FC76FFFE 76FFFA76 FF0A76FF 0C76FFF6 76FFF876 FF001DE9 037402F4 7E830009 ...-¶.t.Ö...v½.v-.v..v..vª.vz.v• 000180
 C8C95F5E 1F0000E9 00008807 89260247 89260000 88FC5EC4 0013E900 00018C9A .....Ö..á^•¡..&.G.&..¡..Ö...^_èù 0001A0
 5689F246 89FE5788 26FC4788 260E5EC4 040E4683 D88E04A4 881E5657 000022C8 à"..WV.¡È..Ä.F..á^.&.G.&.Wz.F¯.V 0001C0
 4689FE57 8826FC47 88260E5E C4040E46 83F64689 FE478826 0E5EC402 0E4683F4 ¶.F..á^.&.Gz.F-.F..á^.&.¯•&.Wz.F 0001E0
```

Dump of file SATURN:[PCCOMMON.DUMP.DLL]DMLGLOB.TMP;1 on 18-APR-1990 10:44:56.67
File ID (627,22,0)   End of file block 315 / Allocated 316

Virtual block number 21 (00000015), 512 (0200) bytes

```
578826FC 4788260E 5EC4040E 4683F046 89FE4788 260E5EC4 020E4683 FA5689F8 %.V°.F..á^.&.G±.FÞ.F..á^.&.G=&.W 000000
0A76FF0C 76FFF276 FFF476FF 07892602 47892600 0088FC5E C4FE5689 FC4689FE ±.F=.V±á^=¡..&.G.&...v¶.v·.v..v. 000020
FF00E7E9 EE468800 06E90375 00EE7E83 EE468900 0005F49A 5016EA46 8DF676FF .v-.Fõ.P.¶....FŸ.-Ÿ.u.Õ...FŸÖÕ.. 000040
7500EE7E 83EE.689 00000126 9A5016E2 468DF076 FFF876FF FA76FFF2 76FFF476 v¶.v·.v°.v½.vÞ.Fã.P.&....FŸ.-Ÿ.u 000060
FC5EC404 E6468300 04E9E856 89E64689 EC5688EA 468800BC E9EE4688 0006E903 .Õ...FŸÖŸ..Fõ.V‡.F|.VÕÕ...F|.á^= 000080
5688E246 88005DE9 03750247 08260788 26E65EC4 006CE903 7402470B 26078826 &..&.G.t.Õl.á^|&..&.G.u.Õ]..Fã.V 0000A0
DE5EC400 38E90375 02470826 0788260E 5EC404DE 46830004 E9E05689 DE4689E4 Õ.F8.VÅÕ...F8.á^8&..&.G.u.Õ8.á^8 0000C0
8826E65E C40017E9 03740257 39260020 E9037407 3926E65E C4025788 26078826 &..&.W.á^|&9.t.Õ .&9W.t.Õ..á^|&. 0000E0
76FFF276 FFF47 ·F FF81E9FF 85E90003 E9025789 26078926 FC5EC402 57882607 .&.W.á^=&..&.W.Õ..Õç.Õ...v¶.v·.v 000100
EE468900 0001D¤vA E276FFE4 76FFF276 FFF476FF EE468900 0006899A EA76FFEC &.võ.¿....FŸ.v¶.v·.võ.vã.Û....FŸ 000120
88260E5E C4040E46 83088E05 48881E56 57000064 C8C8C95F 5E1F0000 E9000088 ¡..Õ...^_èùàd..WV.¡N..Ã.F..á^.&. 000140
5EC4040E 4683FA46 89FE4788 260E5EC4 020E4683 F85689F6 4689FE57 8826FC47 G=&.W±.F-.V½.F..á^.&.G±.F°.F..á^ 000160
4689FE57 8826FC47 88260E5E C4040E46 839E5689 9C4689FE 578826FC 4788260E .&.G=&.W±.F..V..F..á^.&.G=&.W±.F 000180
68F676FF F876FFFA 76FF5016 EC468007 89260247 89260000 88F25EC4 F45689F2 ·.V¶á^·¡..&.G.&...F&.P.v°.v½.v-h 0001A0
46880006 E9037500 F07E83F0 468912C4 83000007 A19A006A 0A76FF0C 76FF2713 .'.v..v.j..Å....á..FÞ.-Þ.u.Õ...F 0001C0
47082607 8826FC5E C404FC46 830004E9 FE5689FC 4689EE56 88EC4688 008CE9F0 ÞÕŸ..F&.VŸ.F=.V±Õ...F=.á^=&..&.G 0001E0
```

Dump of file SATURN:[PCCOMMON.DUMP.DLL]DMLGLOB.TMP;1 on 18-APR-1990 10:44:56.67
File ID (627,22,0)   End of file block 315 / Allocated 316

Virtual block number 22 (00000016), 512 (0200) bytes

```
006A37FF 260277FF 26FC5EC4 271C68F6 76FFF876 FF5016A0 46800063 E9037502 .u.Õc..F..P.v½.v-h.'á^=&.w.&.7j. 000000
A04680 9C 76FF9E76 FFFF8CE9 0003E903 7500F07E 83F04689 10C48300 0008019A ......á..FÞ.-Þ.u.Õ..ÕŸ..v..v..F. 000020
26078926 F25EC4C2 57882607 8826FC5E C40017E9 03740000 300000FF FF9A5016 .P.....=..t.Õ..á^=&..&.W.á^·&..& 000040
006A0A76 FF0C76FF 271568F6 76FFF876 FFEC76FF EE76FFFF 8AE90003 E9025789 .W.Õ..Õ...vŸ.v‡.v½.v-h.'.v..v.j. 000060
0000E900 0088000C E9F04688 0006E903 7500F07E 83F04689 10C48300 00044D9A .M....á..FÞ.-Þ.u.Õ...FÞÕ..¡..Õ.. 000080
FE578826 FC478826 0E5EC404 0E468308 8E060388 1E565700 0008C8C8 C95F5E1F .^_èùà...WV.¡&..Ã.F..á^.&.G=&.W± 0000A0
C726F85E C4FA5689 F84689FE 578826FC 4788260E 5EC4040E 4683FE56 89FC4689 .F=.V±.F..á^.&.G=&.W±.F½.V°á^½&ú 0000C0
5EC4040E 4683088E 082D881E 56570000 14C8C8C9 5F5E1F00 00E90000 88000007 ...¡..Õ...^_èùà...WV.¡-..Ã.F..á^ 0000E0
0E4683F6 4689FE47 88260E5E C4020E46 83F45689 F24689FE 578826FC 4788260E .&.G=&.W±.F·.V¶.F..á^.&.G±.F-.F. 000100
0C76FF27 1368F676 FF5016FC 4680FA56 89F84689 FE578826 FC478826 0E5EC404 .á^.&.G=&.W±.F½.V°.F=.P.v-h.'.v. 000120
880059E9 F0468800 06E90375 00F07E83 F046890E C4830000 07489A00 6A0A76FF .v.j..K....á..FÞ.-Þ.u.Õ...FÞÔY.. 000140
E9037502 47082607 8826FC5E C4000007 C726F85E C4EE5689 EC4689FE 5688FC46 F=.V±.F&.VŸá^½&ú...á^=&..&.G.u.Õ 000160
000006A5 9AFC76FF FE76FFF2 76FFF476 FFFFE4E9 04FC4683 07FF26F8 5EC40000 ..á^Ÿ&...F=.ÕÕ..v¶.v·.v±.v=.É... 000180
0110C8C8 C95F5E1F 0000E900 00880006 E9F04688 0006E903 7500F07E 83F04689 .FÞ.-Þ.u.Õ...FÞÕ..¡..Õ...^_èùà.. 0001A0
FEF69689 FEF48689 FE578826 FC478826 0E5EC404 0E468308 8E087688 1E565700 .WV.¡v..Á.F..á^.&.G=&.W±..¶±..-± 0001C0
F84689FE 578826FC 4788260E 5EC4040E 4683FE46 89FE4788 260E5EC4 020E4683 .F..á^.&.G±.F±.F..á^.&.G=&.W±.F½ 0001E0
```

Dump of file SATURN:[PCCOMMON.DUMP.DLL]DMLGLOB.TMP;1 on 18-APR-1990 10:44:56.67
File ID (627,22,0)   End of file block 315 / Allocated 316

Virtual block number 23 (00000017), 512 (0200) bytes

```
FEF08689 00000230 9A5016FE F2868D0A 76FF0C76 FFFEF486 FFFEF686 FFFA5689 .V°.Ñ-±.Ñ¶±.v..v...·±.P.0.....Þ± 000000
FE76FFFE F286FFFE F486FFFE F686FF00 8AE9FEF0 86880007 E9037500 FEF08E83 ./Þ±.u.Õ....Þ±Õ¤..Ñ-±.Ñ¶±.Ñ·±.v± 000020
81008CE9 FEF08688 0007E903 7500FEF0 8E83FEF0 86890000 FFFF9A50 16FC468D .F=.P.......Þ±./Þ±.u.Õ....Þ±Õ... 000040
8DFE76FF 0A76FF0C 76FFFEF4 86FFFEF6 86FF0100 FC46C700 05E90377 0100FC7E ~=..w.Õ..úF=...Ñ-±.Ñ¶± v..v...v±. 000060
FF004CE9 FEF08688 0007E903 7500FEF0 8E83FEF0 86890000 00C09A50 16FEF886 .½±.P.á.....Þ±./Þ±.u.Õ. ..Þ±ÕL.. 000080
00880006 E9037400 00300AC4 83FFFF04 849A5016 FEF8868D F876FFFA 76FFFC76 v=.v°.v½..½±.P.Ç....á.=..·.Õ..¡. 0000A0
000002E7 9AF876FF FA76FFFE 76FF0A76 FF0C76FF FEF486FF FEF686FF 0027E900 .Õ'..Ñ-±.Ñ¶±.v..v..v±.v°.v½.Õ... 0000C0
681E006A D88E0945 881E5657 000002C8 C8C95F5E 1F0000E9 FEF08688 FEF08689 ..Þ±..Þ±Õ...^_èùà...WV.¡E..Ãj..h 0000E0
1F0000E9 FE468BFE 468912C4 830000FF FF9A006A 306A026A 006A006A 006A00A8 ·.j.j.j.j.j0j.......á..F±.F±Õ... 000100
02030165 00060490 02030158 000603CF 0203005E 000508C6 02030010 C8C95F5E ^_èù....ó...^...ù...(.......e... 000120
02030000 002E0A78 00020000 002C0A31 0002017D 00060998 02030171 0006091C ....q.......)...1.,.....x....... 000140
02030136 00060A5C 02030038 00050A8F 02030128 00060A06 0203011A 00. 005A Z...........(.......8...\...6... 000160
0203014E 00060521 020301C9 000609C6 02030142 000605C9 02030188 000. 04F5 %...¡...è...B...ó...è...I...N... 000180
1F02C483 FFFF0780 9A57D88E FFFF881E 00000000 00000000 0000039E 000C07C3 û.................¡...ÁW......á.. 0001A0
00000000 00000000 00000000 00000000 2E000200 02000000 03000A00 020002C8 û............................... 0001C0
88FC5689 FA468900 00FFFF9A 006A1076 FF1276FF D88EFFFF 881E5657 000082C8 àý..WV.¡...Á.v..v.j.......F°.V=. 0001E0
```

Dump of file SATURN:[PCCOMMON.DUMP.DLL]DMLGLOB.TMP;1 on 18-APR-1990 10:44:56.67
File ID (627,22,0)   End of file block 315 / Allocated 316

Virtual block number 24 (00000018), 512 (0200) bytes

```
FE578826 FC478826 F65EC404 F64683F8 5689F646 89085688 06468803 C2E90E46 F.Õõ..F..V..F-.V½.F-.á^-&.G=&.W± 000000
F64683FF 5096R9FF 4E8689FE 578826FC 478826F6 5EC404F6 4683EE56 89EC4689 .F$.VŸ.F-.á^-&.G=&.W±..N...P..F- 000020
83EA4689 0000FFFF 9A5016FA 46801C6A 106AF076 FFF04689 FE478826 F65EC402 .á^-&.G±.FÞ.vÞj.j..F°.P......Fõ. 000040
8688FA5E C4025789 26078926 EE5688EC 4688FA5E C40390E9 0003E903 7500EA7E ~õ.u.Õ..Õ..á^°.F$.VŸ&..&.W.á^°.. 000060
26F65EC4 04F64683 08478926 F04688FA 5EC40657 89260447 8926FF50 9688FF4E N...P.&.G.&.W.á^°.FÞ&.G..F-.á^-& 000080
FA5EC4FE 478826F6 5EC402F6 46830C57 89260A47 8926FA5E C4FE5788 26FC4788 .G=&.W±á^°&.G.&.W..F-.á^-&.G±á^° 0000A0
46831257 89261047 8926FA5E C4FE5788 26FC4788 26F65EC4 04F64683 0E478926 &.G..F-.á^-&.G=&.W±á^°&.G.&.W..F 0000C0
26F65EC4 04F64683 16578926 14478926 FA5EC4FE 578826FC 478826F6 5EC404F6 -.á^-&.G=&.W±á^°&.G.&.W..F-.á^-& 0000E0
02478926 00008818 5FC426FA 5EC41A57 89261847 8926FA5E C4FE5788 26FC4788 .G=&.W±á^°&.G.&.W.á^°&á_.|..&.G. 000100
26FA5EC4 0000FFFF 9A1077FF 261277FF 26FA5EC4 01076810 76FF1276 FF078926 &...v..v.h..á^°&.w.&.w......á^°& 000120
0002FA9A 5016F246 800A77FF 260C77FF 26FA5EC4 000002E5 9A0A77FF 260C77FF .w.&.w..|...á^°&.w.&.w..F·.P.°.. 000140
FF528680 026AF276 FFF476FF 0477FF26 0677FF26 FA5EC400 48E90374 00003000 .=..t.ÕK.á^°&.w.&.w..v¶.v·j...R. 000160
68010468 1076FF12 76FF0265 E90003E9 037500EA 7E83EA46 89000003 209A5016 .P. ....Fõ.-õ.u.Õ..Õe..v..v.h..h 000180
01646801 04681076 FF1276FF FF98E900 0001E99A 5016FF52 8680FE6A 006A0161 ●.j.j±..R..P.Õ...Õ...v..v.h..hd. 0001A0
0000FFFF 9AFA76FF FC76FF00 6A1076FF 1276FF00 00029E9A 016A006A 006A006A j.j.j.j.......v..v.j..v=.v°..... 0001C0
681E1076 FF1276FF 016A006A 0238E900 008A0000 880000FF FF9A1076 FF1276FF .v..v......|..¤..Õ;.j.j..v..v..h 0001E0
```

Dump of file SATURN:[PCCOMMON.DUMP.DLL]DMLGLOB.TMP;1 on 18-APR-1990 10:44:56.67
File ID (627,22,0)   End of file block 315 / Allocated 316

Virtual block n~ber 25 (00000019), 512 (0200) bytes

```
FE46890A 468801E1 E9998CEA 46C701E0 E90000FF FF9A206A 006A010E 681E0113 ...h..j.j .....ÕÁ.úFõŸ.ÕÁ..F..F± 000000
00FFFF9A 006A006A 016A006A 206A1076 FF1276FF 001BE90C 46880032 E9FE4688 .F±Õ2..F.Õ...v..v.j j.; j.j..... 000020
FFC6E903 7501043D 0008E900 0EE90000 E9FF0DE9 03750005 30000BE9 000EE900 .Õ..Õ..=..u.Õ1.Õ..Õ..Õ..=..u.Õ6. 000040
02D59A00 6A006A00 6A006A01 65680104 681076FF 1276FF01 20E90A46 880000E9 Õ...F.Õ ..v..v.h..he.j.j.j.j..f. 000060
68010468 1076FF12 76FF0165 E9998CEA 46C70008 E90374FF FE7E83FE 46890000 ...F±.-±.t.Õ..úFõŸ.Õe..v..v.h..h 000080
0C77FF26 FA5EC400 00FFFF9A 50169E46 8050524C CA830000 00D22BFE 46880168 h..F±+●....òLRP.F..P.....á^°&.w. 0000A0
00300000 FFFF9A50 16F24680 0A77FF26 0C77FF26 FA5EC400 00FFFF9A 0A77FF26 &.w......á^°&.w.&.w..F·.P.....=. 0000C0
9A5016FF 52868002 6AF276FF F476FF04 77FF2606 77FF26FA 5EC40072 E9037400 .t.Õr.á^°&.w.&.w..v¶.v·j...R..P. 0000E0
EA9A5016 FF528680 50169E46 8D00E8E9 0003E903 7500EA7E 83EA4689 0000FFFF .....Fõ.-õ.u.Õ..ÕÕ..F..P..R..P.õ 000100
5EC40000 FFFF9A0A 77FF260C 77FF26FA 5EC40027 E9037400 003008C4 83FFFF01 ....á.=..t.Õ'.á^°&.w.&.w......á^ 000120
26185FC4 26FA5EC4 FF71E900 03E90257 89260789 26F45688 F2468818 5FC426FA °&á_..F·.V¶&..&.V.Õ..Õq.á^°&á_.& 000140
998CEA46 C70080E9 9987EA46 C70005E9 0000EA46 C70008E9 03750247 08260788 ..&.G.u.Õ..úFõ..Õ..úFõñ.Õ..úFõŸ. 000160
E2E90375 01023DFF E2E90375 00023DFE D8E90375 00013000 1BE9001E E90078E9 Õx.Õ..Õ..=..u.ÕÁ±=..u.Õã.=..u.Õã 000180
00FFFF9A 0676FF08 76FF0A76 FF0C76FF 0E76FF10 76FF1276 FF0048E9 FFDFE9FF .ÕÕ.ÕK..v..v..v..v..v..v..v..... 0001A0
3DFE33E9 03750029 3DFE1DE9 03750022 3DFE94E9 03750020 30002BE9 006BE900 .Õk.Õ+.= .u.Õ.±=".u.Õ.±=).u.Õ3±= 0001C0
460BFA46 880034EV 00008A00 0088FF85 E9FC16E9 03750038 3DFE33E9 03750030 0.u.Õ3±=;.u.Õ.=Õç.|..¤..Õ4..F°.F 0001E0
```

Dump of file SATURN:[PCCOMMON.DUMP.DLL]DMLGLOB.TMP;1 on 18-APR-1990 10:44:56.67
File ID (627,22,0)   End of file block 315 / Allocated 316

Virtual block number 26 (0000001A), 512 (0200) bytes

```
76FF1076 FF1276FF 0000FFFF 9AFA76FF FC76FF08 77FF26FA 5EC40012 E90375FC ●u.Õ..á^°&.w..v●.v°......v..v..v 000000
0008881E 56570000 24C8000E CAC95F5E 1F0000E9 00008A00 00880000 FFFF9AEA õ.....|..¤..Õ...^_èõ..âS..WV.|.. 000020
56880646 8802D9E9 0E4688FE 5689FC46 89000000 159A006A 1076FF12 76FFD88E .Ä.v..v.j.......F=.V±.F.Õ1..F..V 000040
04F84683 EC5689EA 4689FE57 8826FC47 8826F85E C404F846 83FA5689 F8468908 ..F½.V°.F½.á^½&.G=&.W±.Fõ.V$.F½. 000060
FFEE4689 FE478826 F85EC402 F84683DE 56890C46 89FE5788 26FC4788 26F85EC4 á^½&.G=&.W±.FÉ.VB.F½.á^½&.G±.FŸ. 000080
C402A1E9 0003E903 7500E07E 83E04689 00000078 9A5016FC 4680166A 106AEE76 vŸj.j..F=.P.x....FÁ.-Á.u.Õ..ÕÁ.á 0000A0
06578926 04478926 0E56880C 4688FC5E C4025789 26078926 EC5688EA 4688FC5E ^=.Fõ.V$&..&.W.á^●.FÉ.VB&.G.&.W. 0000C0
0A478926 FC5EC4FE 578826FC 478826F8 5EC404F8 46830847 8926EE46 88FC5EC4 á^●.FŸ&.G..F½.á^½&.G=&.W±á^●&.G. 0000E0
478826F8 5EC404F8 46830E47 8926FC5E C4FE4788 26F85EC4 02F84683 0C578926 &.W..F½.á^½&.G±á^●&.G..F½.á^½&.G 000100
0C77FF26 FC5EC400 001447C7 26FC5EC4 12578926 10478926 FC5EC4FE 578826FC ●&.W±á^●&.G.&.W.á^●&úG...á^●&.w. 000120
00300000 017D9A50 16E2468D 0A77FF26 0C77FF26 FC5EC400 0001689A 0A77FF26 &.w..h...á^●&.w.&.w..Fã.P.)...=. 000140
FFFF9A50 16F4468D 156AE276 FFE476FF 37FF2602 77FF26FC 5EC40052 E9037400 .t.ÕR.á^●&.w.&.7.võ.vãj..F¶.P... 000160
26FC5EC4 0019E903 75F6460B F44688FF 88E90003 E9037500 E07E83E0 46890000 ...FÁ.-Á.u.Õ..Õ|..F¶.F-u.Õ..á^●& 000180
00147F83 26FC5EC4 FF91E900 00035A9A 0A77FF26 0C77FF26 FC5EC400 011447C7 úG...á^●&.w.&.w..Z...Õ..á^●&.... 0001A0
6AE676FF E876FFE8 5689E646 890000FF FF9A010A 681076FF 1276FF00 21E90374 t.Õl..v..v.h........F|.vÕ.vÕ.v|j 0001C0
FF000001 CD9A006A 006A016A 006A0125 68010968 1076FF12 76FF0000 FFFF9A00 .......v..v.h..hX.j.j.j.j..ë.... 0001E0
```

Dump of file SATURN:[PCCOMMON.DUMP.DLL]DMLGLOB.TMP;1 on 18-APR-1990 10:44:56.67
File ID (627,22,0)   End of file block 315 / Allocated 316

Virtual block number 27 (0000001B), 512 (0200) bytes

```
00008800 0002079A 1076FF12 76FF0000 01FC9AFC 76FFFE76 FF006A10 76FF1276 v..v.j..v±.v•.•....v..v......j.. 000000
0007019A 206A006A 012A681E 012F681E 1076FF12 76FF016A 006A016E E900008A ¤..Ôn.j.j..v..v..h/..h*.j.j .... 000020
006A0124 68010968 1076FF12 76FF00A4 E90A4688 0114E999 BCE046C7 0113E900 .Ô..úFÅ¥.Ô...F.ÔÉ..v..v.h..h$.j. 000040
5FC426FC 5EC40014 E9037401 F07E83F2 5689F046 89000006 C39A006A 006A006A j.j.j..û....FÞ.V·.-Þ.t.Ô..á^=&á_ 000060
006A006A 006A0124 68010A68 1076FF12 76FF0002 E90000E0 46C70000 07C72610 .&ú...úFÅ..Ô●..v..v.h..h$.j.j.j. 000080
07C72610 5FC426FC 5EC40014 E9037401 F07E83F2 5689F046 89000006 1B9A006A j.......FÞ.V·.-Þ.t.Ô..á^=&á_.&ú. 0000A0
206A006A 006A006A 0146681E 1076FF12 76FF016A 006A0096 E90000E0 46C70001 ..úFÅ..Ô..j.j..v..v..hF.j.j.j.j 0000C0
0230FF54 E9037500 0130001B E9001EE9 0070E999 BCE046C7 0029E900 0002289A .•...Ô).úFÅ¥.Ôp.Ô..Ô..=..u.Ôf.=. 0000E0
0C76FF0E 76FF1076 FF1276FF 0043E9FF DFE9FFE2 E9037501 0230FFE2 E9037500 .u.Ôã.=..u.Ôã.ÔÔ.ÔC..v..v..v..v. 000100
75002230 FF10E903 75002030 0023E900 63E90000 03D09A06 76FF0876 FF0A76FF .v..v..v..f...Ôc.Ô#.= .u.Ô..="'.u 000120
0034E900 00BA0000 BBFFBDE9 FD07E903 75003830 FEF8E903 75002930 FEE2E903 .Ôã±=).u.Ô½±=;.u.Ô.»Ô§.j..¤..Ô4. 000140
1276FF00 0004349A FC76FFFE 76FF0877 FF26FC5E C40012E9 0375FE46 0BFC4688 .F•.F±u.Ô..á^=&.w..v±.v•.4....v. 000160
570002C0 C8000ECA C95F5E1F 0000E900 00BA0000 B8000004 429AE076 FF1076FF .v..vÅ.B...j..¤..Ô...' èb..ââ..W 000180
E90E4688 FF649689 FF628689 0000046B 9A006A10 76FF1276 FFD88E04 5E881E56 V.j^..Å.v..v.j..k.....L ..d..F.Ô 0001A0
FF5E8689 04578826 02478826 FD409EC4 FD429689 FD408689 08568806 468807AB "..F..V...ə»..B»á.ə»&.G.&.W...^. 0001C0
04CC9A50 16FF6286 8D666A1D 6AFE4CB6 FFFE4C86 89078826 FD409EC4 FF609689 ..'.á.ə»&....L±.ÂL±j.jf..b..P.ä. 0001E0
```

Dump of file SATURN:[PCCOMMON.DUMP.DLL]DMLGLOB.TMP;1 on 18-APR-1990 10:44:56.67
File ID (627,22,0)   End of file block 315 / Allocated 316

Virtual block number 28 (0000001C), 512 (0200) bytes

```
86830789 26FE4C86 88FF629E C407BEE9 0003E903 7500FD48 BE83FD48 86890000 ....H».ƒH».u.Ô..Ô..á.b...L±&.... 000000
04FF5E86 83045789 26024789 26FF629E C4FE5788 26FC4788 26FF5E9E C404FF5E ^..á.^.&.G=&.W±á.b.&.G.&.W...^.. 000020
5E9EC404 FF5E8683 08578926 06478926 FF629EC4 FE578826 FC478826 FF5E9EC4 á.^.&.G=&.W±á.b.&.G.&.W...^..á.^ 000040
8826FF5E 9EC404FF 5E86830C 5789260A 478926FF 629EC4FE 578826FC 478826FF .&.G=&.W±á.b.&.G.&.W...^..á.^.&. 000060
26FC4788 26FF5E9E C404FF5E 86831057 89260E47 8926FF62 9EC4FE57 8826FC47 G=&.W±á.b.&.G.&.W...^..á.^.&.G=& 000080
9EC46247 89266447 89260000 88FF629E C4145789 26124789 26FF629E C4FE5788 .W±á.b.&.G.&.W.á.b.j..&.Gd&.Gbá. 0000A0
FF260477 FF26FF62 9EC45016 FF66868D 07892602 47892600 0088125F C426FF62 b.&á_.j..&.G.&....f..Pá.b.&.w.&. 0000C0
83FD4886 8910C483 0000FFFF 9A006A06 77FF2608 77FF26FF 629EC427 1C680277 w.h.¯á.b.&.w.&.w.j.......á...H». 0000E0
271C6802 77FF2604 77FF26FF 629EC450 16B24680 0695E900 03E90375 00FD488E ƒH».u.Ô..Ô...Fý.Pá.b.&.w.&.w.h.' 000100
7500FD48 BE83FD48 868910C4 8300000A 6F9A006A 0A77FF26 0C77FF26 FF629EC4 á.b.&.w.&.w.j..o....á...H».ƒH».u 000120
46800000 09FD9A50 16FD4A86 80010068 01466810 76FF1276 FF065AE9 0003E903 .Ô..ÔZ..v..v.hF.h....J».P.»....F 000140
1276FF10 C4830341 02569A50 16FE5686 805016FD 4A868050 16FF6686 805016B2 ý.P..f..P..J».P..V±.P.V.A..á..v. 000160
6A006A01 43680147 681076FF 1276FF00 0009E09A 5016FE56 86800146 681076FF .v.hF...V±.P.Å....v..v.hG.hC.j.j 000180
9A0E77FF 261077FF 26FF629E C4014768 1076FF12 76FF0000 0A169A00 6A006A4C Lj.j.......v..v.hG.á.b.&.w.&.w.. 0001A0
00FFFF9A 5052( 16 05FF6496 88FF6286 884C6A01 47681076 FF1276FF 00000C2A *....v..v.hG.jL..b...d....RP.... 0001C0
1076FF12 76FF0000 08D19A00 6A006A01 6A006A01 25680143 681076FF 1276FF00 ..v..v.hC.h%.j.j.j.j..1....v..v. 0001E0
```

Dump of file SATURN:[PCCOMMON.DUMP.DLL]DMLGLOB.TMP;1 on 18-APR-1990 10:44:56.67
File ID (627,22,0)   End of file block 315 / Allocated 316

Virtual block number 29 (0000001D), 512 (0200) bytes

```
8D00000A 829A006A FD44B6FF FD4686FF FD469689 FD448689 00000A9B 9A014868 hH........D»..F».ÂF».ÂD»j..ý.... 000000
44066802 77FF2604 77FF26FF 629EC406 77FF2608 77FF26FF 629EC450 16FE4AB6 .J±.Pá.b.&.w.&.w.á.b.&.w.&.w.h.D 000020
7500FD48 8E83FD48 868914C4 8300000B 199A006A 0A77FF26 0C77FF26 FF629EC4 á.b.&.w.&.w.j.......á...H».ƒH».u 000040
8900000C 8E9A0144 681076FF 1276FF00 28E90374 00FE4ABE 83053AE9 0003E903 .Ô..Ô:..ƒJ±.t.Ô(..v..v.hD....... 000060
37FF26FF 629EC400 89E90000 0CA59A00 6AFE4E86 FFFE5086 FFFE5096 89FE4E86 .N±..P±.ÂP±.ÂN±j..E...Ô..á.b.&.7 000080
0003E903 7500FD48 BE83FD48 86890000 FFFF9A50 52006205 FF649688 FF62868B ..b...d..b.RP.......H».ƒH».u.Ô.. 0000A0
26FF629E C40677FF 260877FF 26FF629E C46277FF 266477FF 26FF629E C404DEE9 ÔB.á.b.&.wd&.wbá.b.&.w.&.w.á.b.& 0000C0
14C48300 0009149A 006A0A77 FF260C77 FF26FF62 9EC44407 680277FF 260477FF .w.&.w.h.Dá.b.&.w.&.w.j.......á. 0000E0
E90000FF FF9A62/7 FF266477 FF26FF62 9EC40014 E9037500 FD488E83 FD488689 ..H».ƒH».u.Ô..á.b.&.wd&.wb.....Ô 000100
06399A10 76FF1276 FF000006 2E9AFF62 86FFFF64 B6FF006A 1076FF12 76FF047F ...v..v.j..Âd..Âb.......v..v..9. 000120
6A006A01 59681E01 5E681E10 76FF1276 FF016A00 6A04B1E9 00008A00 00880000 ..j..¤..ÔY.j.j..v..v..h^..hY.j.j 000140
46880286 E9FE468B FE46890A 468B042F E999BCFD 4886C704 2FE90000 065D9A20 .J...Ô/.ú.H»¥.Ô/..F..F±.F±Ô...F 000160
FF1276FF 0088E900 00025D9A 006A006A 016A006A 206A1076 FF1276FF 0090E90C .Ô...v..v.j j.j.j.j..1...Ô...v.. 000180
09E90374 FFFE7E83 FE468900 000C109A 006A006A 006A006A 01656801 48681076 v.hH.he.j.j.j.j.......F±.~±.t.Ô. 0001A0
CA830000 000228FE 46880168 68014868 1076FF12 76FF0307 E999BCFD 4886C700 .ú.H»¥.Ôa..v..v.hH.hh..F±+●....ò 0001C0
629EC401 47681076 FF1276FF 00000C80 9A0E77FF 261077FF 26FF629E C450524C LRPá.b.&.w.&.w.......v..v.hG.á.b 0001E0
```

```
Dump of file SATURN:[PCCOMMON.DUMP.DLL]DMLGLOB.TMP;1 on 18-APR-199. 10:44:56.67
File ID (627,22,0)    End of file block 315 / Allocated 316

Virtual block number 30 (0000001E), 512 (0200) bytes

75000530 FF80E903 75000130 0013E900 16E90000 0C679A0E 77FF2610 77FF26FF .&.w.&.w..g...Õ..Õ..=..u.Õ..=..u 000000
64968BFF 62868R01 47681076 FF1276FF 0084E90C 468801F5 E90000E9 FF60E903 .Õ'.Õ..Õ%..F.Õ...v..v.hG...b...d 000020
9A006A00 6A006A00 6A016E68 01486810 76FF1276 FF000001 589A5052 001605FF ....RP.X....v..v.hH.hn.j.j.j.j.. 000040
B6FFFD46 86FFFD46 9689FD44 86890000 05EF9A01 48681076 FF1276FF 00000687 .....v..v.hH..ÿ.....D»..F».ÑF».Ñ 000060
FFFF5C96 89FF5A86 89000000 179A0147 681076FF 1276FF00 0006029A 006AFD44 D»j.......v..v.hG........Z...\.. 000080
77000230 0008E903 73000130 0013E900 16E90000 002E9A01 6AFF5AB6 FFFF5CB6 Ñ\..ÑZ.j......Õ..Õ..=..s.Õ..=..w 0000A0
88FF6286 884C6A01 47681076 FF1276FF 011EE90C 46880155 E90000E9 FF6CE903 .Õl.Õ..ÕU..F.Õ...v..v.hG.jL..b.. 0000C0
89FD4486 89000000 3C9A0148 681076FF 1276FF00 000E609A 50520016 05FF6496 .d....RP.'....v..v.hH..<.....D». 0000E0
00000ECD 9A014768 1076FF12 76FF0000 00539A01 6AFD4486 FFFD4686 FFFD4696 .F».ÑF».ÑD»j..S....v..v.hG..ë... 000100
266477FF 26FF629E C400000A 389A006A FF5AB6FF FF5CB6FF FF5C9689 FF5A8689 ..Z...\..Ñ\..ÑZ.j..;...á.b.&.wd& 000120
30000005 7A9A5016 FE528680 6277FF26 6477FF26 FF629EC4 00000565 9A6277FF .wb.e...á.b.&.wd&.wb..R±.P.z...= 000140
1C680277 FF260477 FF26FF62 9EC45016 FD4A8680 00FD4A86 C60069E9 03740000 ..t.Õi.6.J»...J».Pá.b.&.w.&.w.h. 000160
006A0161 68FD4486 FFFD4686 FF10C483 0000094F 9A006AFE 5286FFFE 5486FF27 '.Ñl±.ÑR±j..O....á..ÑF».ÑD»ha.j. 000180
FE76FF00 6A016968 FD4486FF FD4686FF FE468900 0000E99A 5016FD4A 8680FE6A j±..J».P.Õ....F±.ÑF».ÑD»hi.j..v± 0001A0
6A006A00 6A016468 FD4486FF FD4686FF FF78E900 000E049A FE5286FF FE5486FF .Ñl±.ÑR±.....Õx..ÑF».ÑD»hd.j.j.j 0001C0
00E9FED2 E9037700 02300008 E9037300 01300013 E90016E9 00000EED 9A016A00 .j..Û...Õ..Õ..=..s.Õ..=..w.Õ0±Õ. 0001E0

Dump of file SATURN:[PCCOMMON.DUMP.DLL]DMLGLOB.TMP;1 on 18-APR-1990 10:44:56.67
File ID (627,22,0)    End of file block 315 / Allocated 316

Virtual block number 31 (0000001F), 512 (0200) bytes

E90000E9 FD62E903 75014830 FE86E903 75014430 FE1EE903 75014330 001BE900 .Õ..=C.u.Õ.±=D.u.ÕÑ±=H.u.Õb»Õ..Õ 000000
9A0677FF 261077FF 26FF629E C44C6A01 47681076 FF1276FF 0107E90A 46880176 v..F.Õ...v..v.hG.jLá.b.&.w.&.w.. 000020
56868900 000EAD9A 006A006A 006A006A 01246801 43681076 FF1276FF 0000097A z....v..v.hC.h$.j.j.j.j..Û.....V 000040
44681076 FF1276FF 0129E900 00FD4886 C70009E9 037401FF 56BE83FF 589689FF ...X../V..t.Õ..ú.H»..Õ)..v..v.hD 000060
037401FF 568E83FF 589689FF 56868900 0009C69A 006A006A 006A006A 01246801 .h$.j.j.j.j..ó.....V...X../V..t. 000080
44B6FFFD 46B6FFFD 469689FD 44868900 000A249A 01486810 76FF1276 FF0074E9 Õt..v..v.hH..$.....D»..F».ÑF».ÑD 0000A0
4886C700 09E90374 FFFE7E83 FE468900 000F1B9A 006A006A 006A006A 016568FD »he.j.j.j.j.......F±.~±.t.Õ..ú.H 0000C0
C40000FF FF9A006A 006AFE76 FF006A01 6A68FD44 B6FFFD46 B6FF008B E9998CFD »V.ÕE..ÑF».ÑD»hj.j..v±j.j......á 0000E0
0081E999 8CFD4886 C7008AE9 0000FD48 86C70257 89260789 26125FC4 26FF629E .b.&á_.&..&.W.ú.H»..Õ..ú.H»V.Õ.. 000100
30FFE1E9 03750002 30FEF1E9 03750001 30001BE9 001EE900 78E999BC FD4886C7 ú.H»V.Õx.Õ..Õ..=..u.Õp±=..u.ÕÅ.= 000120
FF0876FF 0A76FF0C 76FF0E76 FF1076FF 1276FF00 4BE9FF0F E9FFE2E9 03750102 ..u.Õã.ÕÕ.ÕK..v..v..v..v..v..v.. 000140
00293DFB CEE90375 00223DFE ADE90375 00203D00 28E90092 E9000007 4A9A0676 v..J...Õ..Õ+.= .u.ÕÜ±=".u.Õö«=). 000160
5BE90000 BA000088 FFB5E9F8 2DE90375 003B3DFB E5E90375 00303DFB E4E90375 u.ÕÕ«=0.u.Õ[«=;.u.Õ-½Õç.¡..¤..Õ[ 000180
C40011E9 03756447 08266247 8B26FF62 9EC40036 E90375FF 648608FF 62868800 ...b...d.u.Õ6.á.b.&.Gb&.Gdu.Õ..á 0001A0
9AFF6286 FFFF6486 FF37FF26 FF629EC4 00000838 9A6277FF 266477FF 26FF629E .b.&.wd&.wb.;...á.b.&.7.Ñd..Ñb.. 0001C0
C95F5E1F 0000E900 008A0000 88000007 A79AFD48 B6FF1076 FF1276FF 00000799 .....v..v..ÑH».I...¡..¤..Õ...^_è 0001E0

Dump of file SATURN:[PCCOMMON.DUMP.DLL]DMLGLOB.TMP;1 on 18-APR-1990 10:44:56.67
File ID (627,22,0)    End of file block 315 / Allocated 316

Virtual block number 32 (00000020), 512 (0200) bytes

89FC4689 000007D0 9A006A10 76FF1276 FFD88E07 C3881E56 5700025C C8000ECA ò..à\..WV.¡ù..Ä.v..v.j..Å....F•. 000000
88260247 8826FDA4 9EC4FDA6 9689FDA4 86890856 88064688 018DE90E 4688FE56 V±.F.Õ...F..V...Ê»..Ì»á.Ê»&.G.&. 000020
5016FC46 80086A10 6AFEF686 FFFEF686 89078826 FDA49EC4 FA5689F8 46890457 W..F½.V•á.Ê»&....-±.Ñ-±j.j..F•.P 000040
078926FE F68688FC 5EC40168 E90003E9 037500FD F48E83FD F4868900 00081E9A .......¶».∕¶».u.Õ..Õk.á^•..-±&.. 000060
5EC402F8 468304?7 89260247 8926FC5E C4FE5788 26FC4788 26F85EC4 04F84683 .F½.á^½&.G•&.W±á^•&.G.&.W..F½.á^ 000080
099A5016 FDF686: 01006801 23681076 FF1276FF 06478926 FC5EC4FE 478826F8 ½&.G±á^•&.G..v..v.h#.h....-».P.. 0000A0
A8868050 16FDA886 800000FF FF9A4C6A 5016FDA8 86800677 FF26FC5E C4000000 ...á^•&.w...`».PjL.......´».P..´ 0000C0
01236810 76FF1276 FF10C483 09980256 9A5016FE F8868050 16FDF686 805016FD ».P..-».P..½±.P.V....á..v..v.h#. 0000E0
76FF0000 08539AFC 76FFFE76 FF006A10 76FF1276 FF000009 AD9A5016 FEF88680 ..½±.P.Ù....v..v.j..v±.v•.S....v 000100
017A681E 1076FF12 76FF016A 006A00E3 E90000BA 00008800 00085E9A 1076FF12 ..v..^...¡..¤..ÕÕ.j.j..v..v..hz. 000120
C70018E9 0A468800 88E999BC FDF486C7 0088E900 0008829A 206A006A 0175681E .hu.j.j .....Õ..ú.¶»V.Õ...F.Õ..ú 000140
30FFE0E9 03750001 30001BE9 001EE900 70E999BC FDF486C7 0079E900 00FDF486 .¶»..Õy.ú.¶»V.Õp.Õ..Õ..=..u.ÕÅ.= 000160
76FF0E76 FF1076FF 1276FF00 43E9FFDF E9FFE2E9 03750102 3DFFE1E9 03750002 ..u.ÕÅ.=..u.Õã.ÕÕ.ÕC..v..v..v..v 000180
00223DFF 9CE90375 00203D00 23E90063 E900000F 839A0676 FF0876FF 0A76FF0C ..v..v..v......Õc.Õ#.= .u.Õ..=". 0001A0
34E90000 BA000088 FFBDE9FE 53E90375 003B30FF 83E90375 00293DFF 60E90375 u.Õm.=).u.Õ..=;.u.ÕS±Õ§.¡..¤..Õ4 0001C0
1276FF00 0010009A FC76FFFE 76FF37FF 26FC5EC4 0011E903 75FE4608 FC468800 ..F•.F±u.Õ..á^•&.7.v±.v•......v. 0001E0
```

Dump of file SATURN:[PCCOMMON.DUMP.DLL]DMLGLOB.TMP;1 on 18-APR-1990 10:44:56.67
File ID (627,22,0)   End of file block 315 / Allocated 316

Virtual block number 33 (00000021), 512 (0200) bytes

```
00007EC8 000ECAC9 5F5E1F00 00E90000 8A000088 0000100F 9AFDF4B6 FF1076FF .v..R¶».....|..¤..Ö...^_èb..à-.. 000000
D6E90E46 88FC5689 FA468900 0010389A 006A1076 FF1276FF D88E102B 881E5657 WV.|•..Ä.v..v.j..8....F".V•.F.Ö• 000020
89D84689 FE578826 FC478826 F65EC404 F64683F8 5689F646 89085688 06468806 ..F..V..F-.V%.F-.á^-&.G•&.W±.FÁ. 000040
0010819A 5016FA46 805A6A10 6ADC76FF 0C4689FE 478826F6 5EC402F6 46830A56 VÖ.F-.á^-&.G±.FÉ.vÉj.jZ.F".P.... 000060
02578926 0789260A 56880846 88FA5EC4 0688E900 03E90375 00D27E83 02468900 ..F@.-@.u.Ö..ÖE.á^".FÁ.VÖ&..&.W. 000080
0A478926 FA5EC4FE 578826FC 478826F6 5EC404F6 46830447 89260C46 88FA5EC4 á^".FÉ&.G..F-.á^-&.G•&.W±á^"&.G. 0000A0
4C6A0857 89260647 8926FA5E C4FE5788 26FC4788 26F65EC4 04F64683 0C578926 &.W..F-.á^-&.G•&.W±á^"&.G.&.W.jL 0000C0
76FF0AC4 83111202 2C9A5052 000E05FC 5688FA46 880A77FF 260C77FF 26FA5EC4 á^"&.w.&.w..F".V•...RP.,.....á..v 0000E0
FF1276FF 00001145 9A1076FF 1276FF00 00113A9A FA76FFFC 76FF006A 1076FF12 ..v.j..v•.v".:....v..v..E....v.. 000100
2568013A 681076FF 1276FF00 0011279A 5052000E 05FC5688 FA468801 38681076 v.h8..F".V•...RP.'....v..v.h:.h% 000120
15819A50 16E6468D 37FF2602 77FF26FA 5EC40000 14299A00 6A006A01 6 006A01 .j.j.j.j..)...á^"&.w.&.7.F|.P.Ÿ. 000140
77FF26FA 5EC4EE46 89F04689 00008805 DAE90003 E9037500 D27E83D2 46 70000 ...F@.-@.u.Ö..Öö.|...Fb.FŸá^"&.w 000160
74F0460B EE468802 46890000 059E9A50 16EE4680 186AE676 FFE876FF 37FF2602 .&.7.vò.v|j..FŸ.P......F@.FŸ.Fbt 000180
006AD476 FFD676FF D6568904 46890000 0CB39A01 38681076 FF1276FF 0021E903 .Ö|..v..v.h;..°....Få.V•.v•.våj. 0001A0
699A206A 006A0191 681E0196 681E1076 FF1276FF 016A006A 057AE900 000CCA9A .b...Öz.j.j..v..v..h...h..j.j .i 0001C0
01246801 3A681076 FF1276FF 00F2E90A 46880550 E9998CD2 46C7055C E9000011 ...Ö\.úF@¥.Ö]..F.Ö·..v..v.h:.h$. 0001E0
```

Dump of file SATURN:[PCCOMMON.DUMP.DLL]DMLGLOB.TMP;1 on 18-APR-1990 10:44:56.67
File ID (627,22,0)   End of file block 315 / Allocated 316

Virtual block number 34 (00000022), 512 (0200) bytes

```
46884C6A 01386810 76FF1276 FFE45689 E2468900 0014079A 006A006A 006A006A j.j.j.j..•....Fã.VÖ.v..v.h8.jL.F 000000
000E05FC 5688FA46 880068E9 037401E2 7E830000 10DF9A50 52000E05 FC5688FA ".V•...RP.Ô....~ã.t.Ök..F".V•... 000020
88FA4688 0677FF26 0877FF26 FA5EC437 FF260277 FF26FA5E C4005BE9 0375D008 .Åu.Ö[.á^"&.w.&.7á^"&.w.&.w..F". 000040
FA5EC404 CEE90003 E9037500 D27E83D2 46890000 FFFF9A00 6A505200 0E05FC56 V•...RPj.......F@.-@.u.Ö..Öö.á^" 000060
E90000FF FF9A01AD 681E37FF 260277FF 26FA5EC4 0000FFFF 9A37FF26 0277FF26 &.w.&.7.....á^"&.w.&.7.hÜ......Ö 000080
5689E246 89000015 609A006A 006A006A 006A0124 68013868 1076FF12 76FF04A9 `..v..v.h;.h$.j.j.j.j..'....Få.V 0000A0
0021E904 6EE999BC D246C700 2CE90479 E9000002 46C70008 E9037401 E27E83E4 ö.-ã.t.Ö..úF@..Öy.Ö..úF@¥.Ön.Öl. 0000C0
DCE9FEF6 E9037501 3030FFE7 E9037501 0230FFE7 E9037500 0230001B E9001EE9 Ö..Ö..=..u.ÖÖ.=..u.ÖÖ.==.u.Ö-±ÖÉ 0000E0
6A016A00 6A206A10 76FF1276 FF017FE9 0C468803 CFE9FE46 88FE4689 0A4688FF ..F..F±.F±Öü..F.Ö...v..v.j j.j.j 000100
9A006A00 6A006A00 6A016568 013C6810 76FF1276 FF017AE9 000008B5 9A006A00 .j..ç...Öz..v..v.h<.he.j.j.j.j.. 000120
3C681076 FF1276FF 03F3E999 8CD246C7 0008E903 74FFFE7E 83FE4689 00001590 .....F±.-±.t.Ö..úF@¥.Ö¤..v..v.h< 000140
000E799A 0A77FF26 0C77FF26 FA5EC450 524CCA83 00000002 28FE4688 01686801 .hh..F±•@....ÖLRPá^"&.w.&.w..y.. 000160
03E90375 00027E83 02468900 00FFFF9A 5016E646 8037FF26 0277FF26 FA5EC400 .á^"&.w.&.7.F|.P......F@.-@.u.Ö. 000180
00001766 9A5016F2 4680186A E676FFE8 76FF37FF 260277FF 26FA5EC4 03A7E900 .Ö].á^"&.w.&.7.vÖ.v|j..F·.P.f... 0001A0
46830004 E9E05689 DE4689F4 5688F246 88037CE9 0003E903 7500027E 83D24689 .F@.-@.u.Ö..Ö|..F·.V¶.FB.VÅÖ...F 0001C0
FF260E5E C437FF26 0277FF26 FA5EC400 6AE90375 02470826 078B260E 5EC4040E @.á^8&..&.G.u.Öj.á^"&.w.&.7á^8&. 0001E0
```

Dump of file SATURN:[PCCOMMON.DUMP.DLL]DMLGLOB.TMP;1 on 18-APR-1990 10:44:56.67
File ID (627,22,0)   End of file block 315 / Allocated 316

Virtual block number 35 (00000023), 512 (0200) bytes

```
0328E900 03E90375 00027E83 02468900 0017E79A 50168246 80026A37 FF260277 w.&.7j..F..P.Ö....F@.-@.u.Ö..Ö+. 000000
0018E903 7400003D 08C48313 1901EA9A 50168246 800A77FF 260C77FF 26FA5EC4 á^"&.w.&.w..F..P.ö....á.=..t.Ö.. 000020
FF26FA5E C4FF83E9 02578926 07892606 5FC426FA 5EC40257 88260788 260E5EC4 á^8&..&.W.á^"&á_.&..&.W.Ö..á^"&. 000040
0C77FF26 FA5EC401 38681076 FF1276FF 00001830 9AF276FF F476FF37 FF260277 w.&.7.v¶.v·.=....v..v.h8.á^"&.w. 000060
E9037500 0530FE91 E9037500 01300013 E90016E9 0019E900 0018949A 0A77FF26 &.w......Ö..Ö..Ö..=..u.Ö.±=..u.Ö 000080
05FC5688 FA46884C 6A013868 1076FF12 76FF017C E90C4688 024FE9FF E7E9FE71 q±ÖÖ.ÖÖ..F.Ö|..v..v.h8.jL.F".V•. 0000A0
D076FFD0 5689CE46 89000017 149A013C 681076FF 1276FF00 00144A9A 5052000E ..RP.J....v..v.h<.......Fö.VÅ.vÅ 0000C0
76FFEC56 89EA4689 00001792 9A013868 1076FF12 76FF0000 17279A01 6ACE76FF .vöj..'....v..v.h8.......Fô.V&.v 0000E0
89000013 7E9A5016 E6468037 FF260277 FF26FA5E C4000017 A59A006A EA76FFEC &.vöj..É...á^"&.w.&.7.F|.P.-.... 000100
186AE676 FFE876FF 37FF2602 77FF26FA 5EC40210 E90003E9 03750002 7E830246 F@.-@.u.Ö..Ö..á^"&.w.&.7.vÖ.v|j. 000120
26078826 F25EC401 F2E90003 E9037500 027E83D2 46890000 FFFF9A50 16F2468D .F·.P......F@.-@.u.Ö..Ö·.á^·&..& 000140
FFD676FF D6568904 46890000 18A29A01 38681076 FF1276FF 0021E903 7402470B .G.t.Ö|..v..v.h;..Å....Få.V•.v•. 000160
260E5EC4 040E4683 0004E9E0 5689DE46 89F45688 F2468800 0018859A 016AD476 våj..ç....F·.V¶.FB.VÅÖ...FB.á^8& 000180
6A37FF26 0277FF26 DE5EC437 FF260277 FF26FA5E C4004CE9 03750247 08260788 ..&.G.u.ÖL.á^"&.w.&.7á^8&.w.&.7j 0001A0
1076FF12 76FF0171 E90003E9 03750002 7E830246 89000001 A39A5016 82468002 ..F..P.È....F@.-@.u.Ö..Öq..v..v. 0001C0
013C6810 76FF1276 FFFFA1E9 0000182C 9A501682 4680FE6A 006A0161 68013C68 h<.h•.j.j±.F..P.,...ÖÀ..v..v.h<. 0001E0
```

```
Dump of file SATURN:[PCCOMMON.DUMP.DLL]DMLGLOB.TMP;1 on 18-APR-1990 10:44:56.67
File ID (627,22,0)   End of file block 315 / Allocated 316

Virtual block number 36 (00000024), 512 (0200) bytes

00FFFF9A F276FFF4 76FFD876 FFDA76FF 0000187B 9A016A00 6A006A00 6A016468 hd.j.j.j.j..(....vÖ.vÄ.v¶.v..... 000000
0087E9FF E7E9FE74 E9037700 0230FFF2 E9037300 01300013 E90016E9 0019E900 .Ö..Ö..Ö..=..s.Ö..=..w.Öt±Öö.Öñ. 000020
FF000013 6A9A006A 006A006A 006A016E 68013C68 1076FF12 76FF007D E90C4688 .F.Ö)..v..v.h<.hn.j.j.j.j..j.... 000040
3C681076 FF1276FF 00001351 9A505200 0E05FC56 88FA4688 01386810 76FF1276 v..v.h8..F*.V=...RP.Q....v..v.h< 000060
681076FF 1276FF00 0018D69A 006ACE76 FFD076FF D05689CE 46890000 18C39A01 ..ù....Fö.VÅ.vÅ.vöj..ø....v..v.h 000080
0016E900 19E90000 13E19A01 6ACE76FF D076FFD0 5689CE46 89000013 CE9A0138 8..ö....Fö.VÅ.vÅ.vöj..Å...Ö..Ö.. 0000A0
75013A3D 0018E900 1EE9FFE7 E9FF73E9 03770002 3DFFF2E9 03730001 300013E9 Ö..=..s.Ö..=..w.Ös.Öö.Ö..Ö..=:.u 0000C0
0E76FF10 76FF1276 FF0000E9 FC19E903 75013C3D FD8CE903 75013830 FF5CE903 .Ö\.=;.u.Öÿ»=<.u.Ö.=Ö...v..v..v. 0000E0
3DFACFE9 03750020 300028E9 006BE900 0011C89A 0676FF08 76FF0A76 FF0C76FF .v..v..v..v..ù...Ök.Ö+.= .u.Öü*= 000100
E9F902E9 03750038 3DF8CAE9 03750030 3DFAB7E9 03750029 3DFAA1E9 03750022 ".u.ÖÀ*=).u.Öñ*=0.u.Öö«=;.u.Ö.*Ö 000120
FC76FF04 77FF26FA 5EC40012 E90375FC 4608FA46 880034E9 00008A00 0088FF85 ç.j..¤..Ö4..F*.F«u.Ö..á^*&.w..v= 000140
1F0000E9 00008A00 00880000 12289AD2 76FF1076 FF1276FF 00001219 9AFA76FF .v*......v..v..v0.(...j..¤..Ö... 000160
89000012 519A006A 1076FF12 76FFD88E 1244881E 56570001 16C8000E CAC95F5E ^_èb..à...WV.¡D..Ä.v..v.j..Q.... 000180
8826F65E C404F646 83F85689 F6468908 56880646 88095FE9 0E4688FC 5689FA46 F¯.V=.F.Ö_..F..V..F-.V½.F-.á^-&. 0001A0
6A1D6A94 76FF9446 89FE4788 26F65EC4 02F64683 8E56898C 4689FE57 8826FC47 G=&.W±.F.¯V..F-.á^-&.G±.F..v.j.j 0001C0
8C4688FA 5EC40944 E90003E9 0375008A 7E838A46 89000012 9D9A5016 FA468064 d.F*.P......F..-..u.Ö..Öö.á^*.F. 0001E0

Dump of file SATURN:[PCCOMMON.DUMP.DLL]DMLGLOB.TMP;1 on 18-APR-1990 10:44:56.67
File ID (627,22,0)   End of file block 315 / Allocated 316

Virtual block number 37 (00000025), 512 (0200) bytes

26FC4788 26F65EC4 04F64683 04478926 94468BFA 5EC40257 89260789 ..9E5688 .V.&..&.W.á^*.F.&.G..F-.á^-&.G=& 000000
0A478926 FA5EC4FE 47882 6F6 5EC402F6 46830857 89260647 8926FA5E C4..5788 .W±á^*&.G.&.W..F-.á^-&.G±á^*&.G. 000020
5EC404F6 46830E57 89260C47 8926FA5E C4FE5788 26FC4788 26F65EC4 04F64683 .F-.á^-&.G=&.W±á^*&.G.&.W..F-.á^ 000040
26FC4788 26F65EC4 04F64683 16578926 14478926 FA5EC4FE 57882 6FC 47882 6F6 -&.G=&.W±á^*&.G.&.W..F-.á^-&.G=& 000060
5688FA46 880C77FF 260E77FF 26FA5EC4 4C6A1257 89261047 8926FA5E C4FE5788 .W±á^*&.G.&.W.jLá^*&.w.&.w..F*.V 000080
0013209A FA76FFFC 76FF006A 1076FF12 76FF0AC4 83165302 2C9A5052 001805FC =...RP.,.S..á..v..v.j..v=.v*.-.. 0000A0
006A006A 016A006A 01256801 20681076 FF1276FF 00001338 9A1076FF 1276FF00 ..v..v..8....v..v.h-.hX.j.j.j.j. 0000C0
C4EA76FF EC76FFEC 5689EA46 89000018 679A012E 681076FF 1276FF00 0018409A .ã....v..v.h...g....Fõ.V&.v&.võá 0000E0
9A006A00 6A016A00 6A012568 01266810 76FF1276 FF000017 069A0A77 FF26FA5E ^*&.w.......v..v.h&.hX.j.j.j.j.. 000100
1276FF00 0016A59A 0C77FF26 0E77FF26 FA5EC401 42681076 FF1276FF 00001C61 a....v..v.hB.á^*&.w.&.w..È....v. 000120
0000649A 0677FF26 0877FF26 FA5EC488 56898646 89000016 F39A0129 681076FF .v.h)..µ....F..V.á^*&.w.&.w..d.. 000140
5EC40063 E9037400 00300000 00789A50 16964680 0677FF26 0877FF26 FA5EC400 .á^*&.w.&.w..F..P.(...=..t.Öc.á^ 000160
7E838A46 89000016 209A5016 FEEA868D 026A9676 FF9876FF 37FF2602 77FF26FA *&.w.&.7.v..v.j...ö±.P.-....F..- 000180
18FA9A50 16FEEA86 80FE6A00 6A016168 8676FF88 76FF0794 E90003E9 0375008A ..u.Ö..Ö...v..v.ha.j.i±..ö±.P.*. 0001A0
80E90000 1C139A96 76FF9876 FFFE76FF 006A0169 688676FF 8876FFFE 46890000 ...F±.v..v.hi.j..v±.v..v......Ö. 0001C0
0772E900 008A0000 88000000 C99A016A 006A006A 006A0164 688676FF 8876FFFF ..v..v.hd.j.j.j.j..è...,..¤..Ör. 0001E0

Dump of file SATURN:[PCCOMMON.DUMP.DLL]DMLGLOB.TMP;1 on 18-APR-1990 10:44:56.67
File ID (627,22,0)   End of file block 315 / Allocated 316

Virtual block number 38 (00000026), 512 (0200) bytes

46C70717 E9000013 FF9A206A 006A01C6 681E01C8 681E1076 FF1276FF 016A006A j.j..v..v..hù..hó.j.j .....Ö..úF 000000
006A006A 006A006A 01246801 26681076 FF1276FF 0102E90A 46880718 E999BC8A .¥.Ö...F.Ö...v..v.h&.h$.j.j.j.j. 000020
52001805 FC5688FA 46884C6A 01426810 76FF1276 FFE85689 E6468900 0018109A ......F|.VÒ.v..v.hB.jL.F*.V=...R 000040
C4006EE9 0375D008 001805FC 5688FA46 88007EE9 037401E6 7E830000 16E59A50 P.|....-|.t.Ö-..F*.V=....Åu.Ön.á 000060
261277FF 26FA5EC4 006A006A 1477FF26 1677FF26 FA5EC437 FF260277 FF26FA5E ^*&.w.&.7á^*&.w.&.w.j.j.á^*&.w.& 000080
008A7E83 8A468900 00FFFF9A 016A006A 006A5052 001805FC 5688FA46 881077FF .w..F*.V=...RPj.j.j.......F..-.. 0000A0
FF260277 FF26FA5E C4000014 A89A37FF 260277FF 26FA5EC4 0676E900 03E90375 u.Ö..Öv.á^*&.w.&.7.`...á^*&.w.&. 0000C0
6A006A00 6A006A01 24680128 681076FF 1276FF06 51E90000 14889A01 E2681E37 7.hâ..£...ÖQ..v..v.h(.h$.j.j.j.j 0000E0
0029E906 21E90000 8A46C700 08E90374 01E67E83 E85689E6 46890000 10939A00 .......F|.VÒ.-|.t.Ö..úF...Ö|.Ö). 000100
4030FFEA E9037501 0230FEF6 E9037500 01300018 E9001EE9 0616E999 8C8A46C7 úF.¥.Ö..Ö..Ö..=..u.Ö-±=..u.Öõ.=ã 000120
76FF007D E90C4688 056FE9FE 4688FE46 890A4688 05E9E9FF DFE9FFDA E9037501 .u.Öö.Öö.Öö..F..F±.F±Öo..F.Ö)..v 000140
01426810 76FF1276 FF00001F 219A006A 006A006A 006A016E 68013268 1076FF12 ..v.h2.hn.j.j.j.j..!....v..v.hB. 000160
46890000 10089A01 32681076 FF1276FF 00001E2C 9A505200 1805FC56 88FA4688 .F*.V=...RP.,....v..v.h2..Ü....F 000180
8900001E 5B9A0142 681076FF 1276FF00 001DEE9A 006A8676 FF8876FF 88568986 ..V..v..v.j..Ÿ....v..v.hB..[.... 0001A0
03730001 3D0013E9 0016E900 19E90000 1F429A01 6A8676FF 8876FF88 56898646 F..V..v..v.j..B...Ö..Ö..Ö..=..s. 0001C0
01426810 76FF1276 FF0159E9 0C468804 F9E9FFE7 E9FF73E9 03770002 3DFFF2E9 Ö..=..w.Ös.Öö.Ö*..F.ÖY..v..v.hB. 0001E0
```

```
Dump of file SATURN:[PCCOMMON.DUMP.DLL]DMLGLOB.TMP;1 on 18-APR-1990 10:44:56.67
File ID (627,22,0)   End of file block 315 / Allocated 316

Virtual block number 39 (00000027), 512 (0200) bytes

 77FF26FA 5EC437FF 260277FF 26FA5EC4 00001859 9A0C77FF 260E77FF 26FA5EC4 á^°&.w.&.w..Y...á^°&.w.&.7á^°&.w 000000
 8900001F 2F9A0132 681076FF 1276FF00 00150C9A 5016EE46 8D156A14 77FF2616 .&.w.j..FŸ.P.É....v..v.h2../.... 000020
 5688EE46 8800001E D09A006A 006A006A 006A016E 688676FF 8876FF88 56898646 F..V..v..v.hn.j.j.j.j..Å....FŸ.V 000040
 FA5EC400 5AE90375 02470826 07882690 5EC40490 46830004 E9925689 904689F0 Þ.F..V.Õ...F..á^.&..&.G.u.Õz.á^° 000060
 8876FF00 0018879A 50169A46 8D026A37 FF260277 FF26905E C437FF26 0277FF26 &.w.&.7á^.&.w.&.7j..F..P.ñ....v. 000080
 01696886 76FF8876 FFFE4689 00001EF0 9A50169A 468DFE6A 006A0161 688676FF .v.hø.j.j±.F..P.Þ....F±.v..v.hi. 0000A0
 FF260277 FF26FA5E C4FF93E9 00001BDE 9A37FF26 0277FF26 905EC4FE 76FF006A j..v±á^.&.w.&.7.8...Õ..á^°&.w.&. 0000C0
 016A006A 006A006A 01646801 32681076 FF1276FF 0000168C 9AEE76FF F076FF37 7.vÞ.vŸ......v..v.h2.hd.j.j.j.j. 0000E0
 6A8676FF 8876F.88 56898646 8900001F 509A0132 681076FF 1276FF00 001F869A .Ñ....v..v.h2..P....F..V..v..v.j 000100
 8676FF88 76FF8856 89864689 0000180F 9A014268 1076FF12 76FF0000 1F639A01 ..c....v..v.h8.......F..V..v..v. 000120
 FE97E903 7700023D FFF2E903 7300013D 0013E900 16E90019 E9000018 279A006A j..'...Õ..Õ..Õ..=..s.Õ·.=..w.Õ.± 000140
 83E90000 15449A00 6A006A01 6A006A20 6A1076FF 1276FF00 88E90C46 88FFE7E9 ÕÕ..F.Õ¡..v..v.j j.j.j.j..D...Õ° 000160
 FE7E83FE 46890000 18019A00 6A006A00 6A006A01 65680132 681076FF 1276FF00 ..v..v.h2.he.j.j.j.j.......F±.~± 000180
 00022BFE 46880168 68013268 1076FF12 76FF0390 E999BC8A 46C70008 E90374FF .t.Õ..úF.¥.Õ...v..v.h2.hh..F±+Ø. 0001A0
 01326810 76FF1276 FF000020 0D9A0C77 FF260E77 FF26FA5E C450524C CA830000 ...ðLRPá^°&.w.&.w... ...v..v.h2. 0001C0
 FF025789 26078926 105FC426 FA5EC400 00208A9A 006A006A FE76FF00 6A016A68 hj.j..v±j.j... ..á^°&á_.&..&.W.. 0001E0

Dump of file SATURN:[PCCOMMON.DUMP.DLL]DMLGLOB.TMP;1 on 18-APR-1990 10:44:56.67
File ID (627,22,0)   End of file block 315 / Allocated 316

Virtual block number 40 (00000028), 512 (0200) bytes

 13E90016 E90019E9 00001DAC 9A0C77FF 260E77FF 26FA5EC4 01426810 76FF1276 v..v.h8.á^°&.w.&.w..¯...Õ..Õ..Õ. 000000
 1276FF02 71E90C46 880283E9 FFE7E9FF 38E90375 00053DFF 58E90375 00013000 .=..u.ÕX.=..u.Õ8.ÕÕ.Õ°..F.Õq..v. 000020
 65680129 681076FF 1276FF02 6CE90000 1F9A9A00 6A006A01 6A006A20 6A1076FF .v.j j.j.j.j......Õl..v..v.h).he 000040
 E999BC8A 46C70008 E90374FF FE7E83FE 46890000 20C29A00 6A006A00 6A006A01 .j.j.j.j..ö ...F±.-±.t.Õ..úF.¥.Õ 000060
 16FF3A86 8D50524C CA830000 0D022BFE 46880168 68012968 1076FF12 76FF02BC ¥..v..v.h).hh..F±+Ø... ðLRP..:.. 000080
 00002100 9A006A00 6AFE76FF 006A016A 68012968 1076FF12 76FF0000 20DC9A50 P.É ...v..v.h).hj.j..v±j.j...!.. 0000A0
 9A006A00 6A006A00 6A012468 01286810 76FF1276 FF165789 26144789 26FA5EC4 á^°&.G.&.W..v..v.h(.h$.j.j.j.j.. 0000C0
 6A1477FF 261677FF 26FA5EC4 37FF2602 77FF26FA 5EC4E856 89E64689 00002188 .!...F!.VÒá^°&.w.&.7á^°&.w.&.w.j 0000E0
 389689FF 36868900 0021E39A 01286810 76FF1276 FF000013 829A5016 F2468D15 ..F·.P.ÿ....v..v.h(..D!....6...8 000100
 FF3686FF FF3886FF 0012E903 7301F27E 830009E9 037E0020 E9037D00 F47E83FF ..~¶.).Õ .-.Õ...-·.s.Õ...Ñ8..Ñ6. 000120
 6A012568 01266810 76FF1276 FF002FE9 037401E6 7E830047 E9000021 AD9A016A j..Ù!..ÕG..-Ì.t.Õ/..v..v.h&.hX.j 000140
 21FF9A00 6A006A01 2668016A 306A1076 FF1276FF 000021C6 9A006A00 6A016A00 .j.j.j..ó!...v..v.j0j.h&.j.j...! 000160
 6A006A01 24680128 681076FF 1276FF00 001DCD9A 006AFF36 B6FFFF38 B6FF0000 ...Ñ8..Ñ6.j..ë....v..v.h(.h$.j.j 000180
 681076FF 1276FF00 F2E90374 01E67E83 E85689E6 46890000 1D229A00 6A006A00 .j.j..".....F!.VÒ.-Ì.t.Õ·..v..v.h 0001A0
 799A006A 006A006A 006A016E 688676FF 8876FF88 56898646 8900001D BA9A0132 2..¤....F..V..v..v.hn.j.j.j.j..y 0001C0
 9A5016EE 4680156A 1477FF26 1677FF26 FA5EC437 FF260277 FF26FA5E C4000022 "..á^°&.w.&.7á^°&.w.&.w.j..FŸ.P. 0001E0

Dump of file SATURN:[PCCOMMON.DUMP.DLL]DMLGLOB.TMP;1 on 18-APR-19' ' 10:44:56.67
File ID (627,22,0)   End of file block 315 / Allocated 316

Virtual block number 41 (00000029), 512 (0200) bytes

 470B2607 8B26905E C4049046 830004E9 92568990 4689F056 8BEE4688 00001E4D M....FŸ.VÞ.F..V.Õ...F..á^.&..&.G 000000
 169A4680 026A37FF 260277FF 26905EC4 37FF2602 77FF26FA 5EC4005A E9037502 .u.Õz.á^°&.w.&.7á^.&.w.&.7j..F.. 000020
 FE468900 0022999A 50169A46 8DFE6A00 6A016168 8676FF88 76FF0000 1EB99A50 P.¿....v..v.hø.j.j±.F..P.."...F± 000040
 FF93E900 0022C79A 37FF2602 77FF2690 5EC4FE76 FF006A01 69688676 FF8876FF .v..v.hi.j..v±á^.&.w.&.7.ú"..Õ.. 000060
 006A0164 688676FF 8876FF00 001F089A EE76FFF0 76FF37FF 260277FF 26FA5EC4 á^°&.w.&.7.vÞ.vŸ......v..v.hd.j. 000080
 00E9FD7F E9037500 053DFD9F E9037500 01300013 E900001E 779A016A 006A006A j.j.j..w...Õ..=..u.Õ.»=..u.Õ.»Õ. 0000A0
 3DF058E9 03750129 3DFB1AE9 03750128 3DFA89E9 03750126 3D0023E9 0026E900 .Õ&.Õ#.=&.u.Õ.°=(.u.Õ.«=).u.ÕX»= 0000C0
 9A0676FF 0876FF0A 76FF0C76 FF0E76FF 1076FF12 76FF0000 E9FC7CE9 03750132 2.u.Õ|=Õ...v..v..v..v..v..v..v.. 0000E0
 E9037500 293DF8E6 E9037500 223DF914 E9037500 2030002B E90068E9 00001920 ·...Õk.Õ+.= .u.Õ.°="..u.Õ!½=).u.Õ 000100
 46880034 E90000BA 000088FF 85E9F679 E9037500 383DFA22 E9037500 3030F8FC =½=0.u.Õ"°=;.u.Õy-Õç.|..¤..Õ4..F 000120
 76FF1276 FF000019 849AFA76 FFFC76FF 0477FF26 FA5EC400 12E90375 FC4608FA °.F=u.Õ..á^°&.w..v=.v°......v..v 000140
 1E565700 000CC800 0ECAC95F 5E1F0000 E90000BA 00008800 0019929A 8A76FF10 ..v......¡..¤..Õ...^_èÕ..å...WV. 000160
 5EC4020E 4683F856 89F64689 FE578826 FC478826 0E5EC404 0E468308 8E19AE88 ¡Û..Ä.F..á^.&.G=&.W±¯F-.V½.F..á^ 000180
 6A0A76FF 0C76FF27 1468F676 FFF876FF FA76FF50 16FC4680 FA4689FE 4788260E .&.G±.F°.F=.P.v°.v½.v-h.'.v..v.j 0001A0
 FE76FF08 6A00AFE9 F4468800 06E90375 00F47E83 F4468912 C4830000 24189A00 ...$...á..F¶.-¶.u.Õ...F¶ÕÉ.j..v± 0001C0
 8914C483 00002458 9A006A0A 76FF0C76 FF271968 F676FFF8 76FFFA76 FFFC76FF .v=.v°.v½.v-h.'.v..v.j..X$...á.. 0001E0
```

```
Dump of file SATURN:[PCCOMMON.DUMP.DLL]DMLGLOB.TMP;1 on 18-APR-1990 10:44:56.67
File ID (627,22,0)   End of file block 315 / Allocated 316

Virtual block number 42 (0000002A), 512 (0200) bytes

 76FF036A 0068E903 75FE4608 FC468800 79E9F446 880006E9 037500F4 7E83F446 F¶.-¶.u.Õ...F¶Õy..F•.F± ·.Õh.j..v 000000
 8914C483 00002488 9A006A0A 76FF0C76 FF271968 F676FFF8 76FF046A FC76FFFE ±.v•j..v½.v-h.'.v..v.j...$...á.. 000020
 FF27DA68 F676FFF8 76FF5016 FC468000 39E9F446 880006E9 037500F4 7E83F446 F¶.-¶.u.Õ...F¶Õ9..F•.P.v½.v-hÖ'. 000020
 09E9F446 880006[illegible] 037500F4 7E83F446 8910C483 000000AC 9A006AFC 76FFFE76 v±.v•j..¯....á..F¶.-¶.u.Õ...F¶Õ. 000040
 C4040E46 83D88E[illegible] A1881E56 5700000C C8C8C95F 5E1F0000 E9000088 FF8DE900 .Õ..¡..Õ...^_èùà...WV.¡À#.Ã.F...á 000060
 4683FA46 89FE4788 260E5EC4 020E4683 F85689F6 4689FE57 8826FC47 88260E5E ^.&.G=&.W±.F¯.V½.F..á^.&.G±.F•.F 000080
 00880006 E90374FE 4608FC46 88FE5689 FC4689FE 578826FC 4788260E 5EC4040E ..á^.&.G=&.W±.F•.V±.F•.F±t.Õ..¡. 0000A0
 76FF0A76 FF0C76FF 271868F6 76FFF876 FFFA76FF FC76FFFE 76FF086A 00ACE900 .Õ¯.j..v±.v•.vª.v½.v-h.'.v..v..v 0000C0
 0070E9F4 46880006 E9037500 F47E83F4 468918C4 83000025 609A006A 0676FF08 ..v.j..m%...á..F¶.-¶.u.Õ...F¶Õp. 0000E0
 76FF2718 68F676FF F876FF04 6AFC76FF FE76FF03 6A005FE9 0375FE46 08FC4688 .F•.F±u.Õ_.j..v±.v•j..v½.v-h.'.v 000100
 0006E903 7500F47E 83F44689 18C48300 00FFFF9A 006A0676 FF0876FF 0A76FF0C ..v..v..v.j......á..F¶.-¶.u.Õ.. 000120
 0023E29A 006AFC76 FFFE76FF 27DA68F6 76FFF876 FF5016FC 4680002A E9F44688 .F¶Õ*..F•.P.v½.v-hÖ'.v±.v•j..ã#. 000140
 8E2487B8 1E565700 0008C8C8 C95F5E1F 0000E900 0088FF96 E9F44689 10C48300 ..á..F¶Õ..¡..Õ...^_èùà...WV.¡ñ$. 000160
 4788260E 5EC4040E 4683FA56 89F84689 FE578826 FC478826 0E5EC404 0E4683D8 Ã.F..á^.&.G=&.W±.F%.Vª.F..á^.&.G 000180
 FF0C76FF 271468F8 76FFFA76 FF056AFC 76FFFE76 FFFE5689 FC4689FE 578826FC =&.W±.F•.V±.v±.v•j..vª.v½h.'.v.. 0001A0
 56570000 08C8C8C9 5F5E1F00 00E916C4 83000025 279A006A 0676FF08 76FF0A76 v..v..v.j..'%...á.Õ...^_èùà...WV 0001C0

Dump of file SATURN:[PCCOMMON.DUMP.DLL]DMLGLOB.TMP;1 on 18-APR-1990 10:44:56.67
File ID (627,22,0)   End of file block 315 / Allocated 316

Virtual block number 43 (0000002B), 512 (0200) bytes

 C4040E46 83FA5689 F84689FE 578826FC 4788260E 5EC4040E 4683088E 2580881E .¡§%.Ã.F..á^.&.G=&.W±.F%.Vª.F..á 000000
 FE76FF07 89260247 89260000 88FC5EC4 FE5689FC 4689FE57 8826FC47 88260E5E ^.&.G•&.W±.F•.V±á^•¡..&.G.&...v± 000000
 0026089A 006A0676 FF0876FF 0A76FF0C 76FF2714 68F876FF FA76FF06 6AFC76FF .v•j..vª.v½h.'.v..v..v..v.j...&. 000020
 260E5EC4 040E4683 D88E2622 881E5657 000014C8 C8C95F5E 1F0000E9 16C48300 ..á.Õ...^_èùà...WV.¡"&.Ã.F..á^.& 000040
 89FC4689 FE578826 FC478826 0E5EC404 0E4683F4 5689F246 89FE5788 26FC4788 .G=&.W±.F¯.V¶.F..á^.&.G=&.W±.F•. 000060
 271468F2 76FFF476 FF056A50 16F8468D F64689FE 4788260E 5EC4020E 4683FE56 V±.F..á^.&.G±.F-.F%.Pj..v¶.v·h.' 000080
 E9037500 EC7E83EC 468916C4 83000026 7D9A006A 0676FF08 76FF0A76 FF0C76FF .v..v..v..v.j..)&...á..F$.-$.u.Õ 0000A0
 76FF0A76 FF0C76FF 271468F2 76FFF476 FF036A50 16EE468D 0193E9EC 46880006 ...F$Õ...FŸ.Pj..v¶.v·h.'.v..v..v 0000C0
 0158E9EC 46880006 E9037500 EC7E83EC 468916C4 83000026 EF9A006A 0676FF08 ..v.j..ÿ&...á..F$.-$.u.Õ...F$Õ[. 0000E0
 76FF2719 68F276FF F476FF05 6AF876FF FA76FF06 6A0060E9 0375FA46 08F84688 .F%.F•u.Õm.j..vª.v½j..v¶.v·h.'.v 000100
 011BE9EC 46880006 E9037500 EC7E83EC 468914C4 83000027 9C9A006A 0A76FF0C ..v.j...'...á..F$.-$.u.Õ...F$Õ.. 000120
 000027E0 9A006AFC 76FFFE76 FF271868 F276FFF4 76FF056A F876FFFA 76FF066A j..vª.v½j..v¶.v·h.'.v±.v•j..Á'.. 000140
 0375F046 08EE4688 0077E900 E6E9EC46 880006E9 037500EC 7E83EC46 8914C483 .á..F$.-$.u.Õ...F$Õl.Õw..FŸ.FÞu. 000160
 9A006AEE 76FFF076 FF271968 F276FFF4 76FFF676 FF0A76FF 0C76FF08 6A006CE9 Õl.j..v..v..v-.v¶.v·h.'.vÞ.vŸj.. 000180
 76FFFE76 FF086A00 A2E9EC46 880006E9 037500EC 7E83EC46 8914C483 00002816 .(...á..F$.-$.u.Õ...F$ÕÁ.j..v±.v 0001A0
 EC468914 C4830000 2848 9A00 6AEE76FF F076FF27 1868F276 FFF476FF F676FFFC =.v-.v¶.v·h.'.vÞ.vŸj..K(...á..F$ 0001C0

Dump of file SATURN:[PCCOMMON.DUMP.DLL]DMLGLOB.TMP;1 on 18-APR-1990 10:44:56.67
File ID (627,22,0)   End of file block 315 / Allocated 316

Virtual block number 44 (0000002C), 512 (0200) bytes

 68F276FF F476FF06 6A0A76FF 0C76FF05 6A006CE9 EC468800 06E90375 00EC7E83 .-$.u.Õ...F$Õl.j..v..v.j..v¶.v·h 000000
 46880006 E9037500 EC7E83EC 468914C4 83000028 889A006A FC76FFFE 76FF2718 .'.v±.v•j...(...á..F$.-$.u.Õ...F 000000
 68F276FF F476FF04 6AFC76FF FE76FF03 6A0026E9 0375F046 08EE4688 0037E9EC $Õ7..FŸ.FÞu.Õ&.j..v±.v•j..v¶.v·h 000020
 C8C95F5E 1F0000E9 00008800 06E914C4 83000025 9D9A006A EE76FFF0 76FF2718 .'.vÞ.vŸj...%...á.Õ..¡..Õ...^ èù 000040
 5689F446 89FE5788 26FC4788 260E5EC4 040E4683 D88E2694 881E5657 000012C8 à...WV.¡.&.Ã.F..á^.&.G=&.W±.F¶.V 000060
 F676FF06 6A5016F8 4680FE56 89FC4689 FE578826 FC478826 0E5EC404 0E4683F6 -.F..á^.&.G=&.W±.F•.V±.F%.Pj..v- 000080
 83EE4689 16C48300 0029079A 006A0676 FF0876FF 0A76FF0C 76FF2714 [illegible]476FF .v¶h.'.v..v..v..v.j..=)...á..FŸ. 0000A0
 76FFFA76 FF056A00 6AE90375 FA4608F8 46880119 E9EE4688 0006E903 75[illegible]E7E -Ÿ.u.Õ...FŸÕ...F%.F•u.Õj.j..vª.v 0000C0
 83EE4689 14C48300 00296A9A 006A0A76 FF0C76FF 271968F4 76FFF676 FF06[illegible]AF8 %j..v-.v¶h.'.v..v.j..j)...á..FŸ. 0000E0
 1868F476 FFF676FF 066AF876 FFFA76FF 056A0009 E9EE4688 0006E903 7500EE7E -Ÿ.u.Õ...FŸÕl.j..vª.v½j..v-.v¶h. 000100
 EE468800 06E90375 00EE7E83 EE468914 C4830000 299F9A00 6AFC76FF FE76FF27 '.v±.v•j...)...á..FŸ.-Ÿ.u.Õ...FŸ 000120
 179A006A FC76FFFE 76FF2718 68F476FF F676FF05 6A0A76FF 0C76FF06 6A00A4E9 ÕÉ.j..v..v.j..v-.v¶h.'.v±.v•j... 000140
 FF036A50 16F0468D 006FE9EE 46880006 E9037500 EE7E83EE 468914C4 8300002A •...á..FŸ.-Ÿ.u.Õ...FŸÕo..FÞ.Pj.. 000160
 468916C4 83000027 279A006A 0676FF08 76FF0A76 FF0C76FF 271468F4 76FFF676 v-.v¶h.'.v..v..v..v.j..''...á..F 000180
 FE76FF03 6A0026E9 0375F246 08F04688 0037E9EE 46880006 E9037500 EE7E83EE Ÿ.-Ÿ.u.Õ...FŸÕ7..FÞ.F·u.Õ&.j..v± 0001A0
 06E914C4 83000027 679A006A F076FFF2 76FF2718 68F476FF F676FF04 6AFC76FF .v•j..v-.v¶h.'.v·.vÞj..g'...á.Õ. 0001C0
```

```
Dump of file SATURN:[PCCOMMON.DUMP.DLL]DMLGLOB.TMP;1 on 18-APR-1990 10:44:56.67
File ID (627,22,0)   End of file block 315 / Allocated 316

Virtual block number 45 (0000002D), 512 (0200) bytes

 260E5EC4 040E4683 088E28A8 881E5657 000014C8 CBC95F5E 1F0000E9 00008800 .¡..Õ...^_èüà...WV.¡´(.Ä.F..6^.& 000000
 5016EE46 80F64689 FE478826 0E5EC402 0E4683F4 5689F246 89FE5788 26FC4788 .G=&.Wz.F¯.V¶.F..6^.&.Gz.F-.FY.P 000020
 C4830000 2AB19A00 6A0676FF 0876FF0A 76FF0C76 FF271468 F276FFF4 76FF036A j..v¶.v·h.'.v..v..v..v.j..Ÿ*...6 000040
 68F276FF F476ᶠF03 6AEE76FF F076FF04 6A0029E9 0375F046 08EE4688 EC468916 ..F&.FY.FÞu.Õ).j..vÞ.vŸj..v¶.v·h 000060
 FF056A50 16FC4680 18C48300 002AD79A 006A0676 FF0876FF 0A76FF0C 76FF2719 .'.v..v..v..v.j..m*...6..F=.Pj.. 000080
 468D16C4 8300002A FD9A006A 0676FF08 76FF0A76 FF0C76FF 27146BF2 76FFF476 v¶.v·h.'.v..v..v..v.j..»*...6..F 0000A0
 002B319A 006A0676 FF0876FF 0A76FF0C 76FF2714 68F276FF F476FF06 6A5016F8 ℅.Pj..v¶.v·h.'.v..v..v..v.j..1+. 0000C0
 68F276FF F476FF05 6AFC76FF FE76FF06 6A0029E9 0375FE46 08FC4688 16C48300 ..6..F=.Fzu.Õ).j..vz.v•j..v¶.v·h 0000E0
 0375FA46 08F84688 18C48300 002B659A 006A0676 FF0876FF 0A76FF0C 76FF2719 .'.v..v..v..v.j..e+...6..F℅.F°u. 000100
 FF0876FF 0A76FF0C 76FF2719 68F276FF F476FF06 6AF876FF FA76FF05 6A0029E9 Õ).j..v°.v℅j..v¶.v·h.'.v..v..v.. 000120
 E90375FA 460BF846 880031E9 0375FE46 08FC4688 18C48300 002BF59A 006A0676 v.j..%(...6..F•.Fzu.Õ1..F℅.F°u.Õ 000140
 2B0B9A00 6AFC76FF FE76FF27 1868F276 FFF476FF 066AF876 FFFA76FF 056A0026 &.j..v°.v℅j..v¶.v·h.'.vz.v=j..Ü+ 000160
 086A0053 E90375F0 4608EE46 88005EE9 0374FE46 08FC4688 0069E914 C4830000 ...6.Õi..F=.Fzt.Õ^..FŸ.FÞu.ÕS.j. 000180
 8300002C 0A9A006A EE76FFF0 76FF2719 68F276FF F476FFF6 76FF0A76 FF0C76FF .v..v..v~.v¶.v·h.'.vÞ.vŸj...,... 0001A0
 1868F276 FFF476FF F676FFF8 76FFFA76 FF086A00 24E90375 FA460BF8 468814C4 6..F℅.F°u.Õ$.j..v°.v℅.v~.v¶.v·h. 0001C0
 000010C8 CBC95F5E 1F0000E9 00008814 C4830000 29359A00 6AEE76FF F076FF27 '.vÞ.vŸj..5)...6.¡..Õ...^_èüà... 0001E0
```

```
Dump of file SATURN:[PCCOMMON.DUMP.DLL]DMLGLOB.TMP;1 on 18-APR-1990 10:44:56.67
File ID (627,22,0)   End of file block 315 / Allocated 316

Virtual block m ber 46 (0000002E), 512 (0200) bytes

 0E4683F4 5689F246 89FE5788 26FC4788 260E5EC4 040E4683 088E2A34 881E5657 WV.¡4*:Ä.F..6^.&.G=&.Wz.F·.V¶.F. 000000
 F64689FE 4788260E 5EC4020E 4683FA56 89F84689 FE578826 FC478826 0E5EC404 .6^.&.G=&.Wz.F℅.V°.F..6^.&.Gz.F- 000020
 12C48300 00FFFF9A 006A4E6A 5016FC46 80F276FF F476FFF8 76FFFA76 FFF676FF .v~.v°.v℅.v¶.v·.F=.PjNj.......6. 000040
 FFF476FF 0A6AFC76 FFFE76FF 096A0026 E9F04688 0006E903 7500F07E 83F04689 .FÞ.-Þ.u.Õ...FÞÕ&.j..vz.v•j..v¶. 000060
 0008C8C8 C95F5E1F 0000E914 C4830000 289E9A00 6A0A76FF 0C76FF27 1868F276 v·h.'.v..v.j...+...6.Õ...^ èüà.. 000080
 4683FA56 89F84689 FE578826 FC478826 0E5EC404 0E468308 8E2C2488 1E565700 .WV.¡$,.Ä.F..6^.&.G=&.Wz.F℅.V°.F 0000A0
 76FF0022 E90375FE 460BFC46 88FE5689 FC4689FE 578826FC 4788260E 5EC4040E ..6^.&.G=&.Wz.F•.Vz.F•.Fzu.Õ"..v 0000C0
 0006E910 C4830000 2CAE9A00 6AFC76FF FE76FF27 E868F876 FFFA76FF 0A76FF0C ..v..v°.v℅hŠ'.vz.v•j..Ü,...6.Õ.. 0000E0
 88260E5E C4040E46 83088E2C C5881E56 57000020 C8CBC95F 5E1F0000 E9000088 ¡..Õ...^ èüà ..WV.¡é,.Ä.F..6^.&. 000100
 5689EC46 89FE5788 26FC4788 260E5EC4 040E4683 EA5689E8 4689FE57 8826FC47 G=&.Wz.FÕ.VÕ.F..6^.&.G=&.Wz.F&.V 000120
 4788260E 5EC4020E 4683F256 89F04689 FE578826 FC478826 0E5EC404 0E4683EE Ÿ.F..6^.&.G=&.Wz.FÞ.V·.F..6^.&.G 000140
 46805016 E24680F8 5689F646 89FE5788 26FC4788 260E5EC4 040E4683 F44689FE z.F¶.F..6^.&.G=&.Wz.F-.V℅.F&.P.F 000160
 83E04689 14C48300 002DEA9A 006A0A76 FF0C76FF 27E068E8 76FFEA76 FF5016E4 Õ.P.vÕ.vÕhÄ'.v..v.j..Õ-...6..FÄ. 000180
 E068E876 FFEA76FF 5016FC46 805016FA 46800008 E9E04688 0006E903 7500E07E ~Ä.u.Õ...FÄÕÄ..F°.P.F=.P.vÕ.vÕhÄ 0001A0
 E0468800 06E9037ᶳ 00E07E83 E0468914 C4830000 2D169A00 6AF076FF F276FF27 '.v·.vÞj...-...6..FÄ.-Ä.u.Õ...FÄ 0001C0
 6A0087E9 00008802 57892607 8926FE56 88FC4688 F65EC400 52E9F446 8800A3E9 ÕÉ..F¶ÕR.6^-.F•.Vz&..&.W.¡..Õ..j 0001E0
```

```
Dump of file SATURN:[PCCOMMON.DUMP.DLL]DMLGLOB.TMP;1 on 18-APR-1990 10:44:56.67
File ID (627,22,0)   End of file block 315 / Allocated 316

Virtual block number 47 (0000002F), 512 (0200) bytes

 E912C483 00002C79 9A006A4E 6AF676FF F876FFE8 76FFEA76 FFEC76FF EE76FF01 ..vŸ.v$.vÕ.vÕ.v℅.v~jNj..y,...6.Õ 000000
 03750231 30004BE9 004EE900 00880257 89260789 26E65688 E44688F6 5EC40064 d.6^-.FÕ.V|&..&.W.¡..ÕN.ÕK.=1.u. 000020
 FF9FE903 7502273D FF91E903 7502153D FFAFE903 7502083D 001BE903 7EFFBCE9 ÕŸ.-.Õ..=..u.ÕE.=..u.Õ..='.u.Õ.. 000040
 03750256 3DFF84E9 03750249 3DFF8CE9 03750246 3DFF94E9 03750235 3DFFBFE9 Õe.=5.u.Õ..=F.u.Õ..=I.u.Õ..=V.u. 000060
 88260E5E C4040E46 83088E2D 33881E56 5700000E C8C8C95F 5E1FFF9C E9FF7CE9 Õ|.Õ...^ èüà...WV.¡3·.Ä.F..6^.&. 000080
 5689FC46 89FE5788 26FC4788 260E5EC4 040E4683 F65689F4 4689FE57 8826FC47 G=&.Wz.F¶.V~.F..6^.&.G=&.Wz.F•.V 0000A0
 76FF0A6A FC76FFFE 76FFFA56 89F84689 FE578826 FC478826 0E5EC404 0E4683FE z.F..6^.&.G=&.Wz.F℅.V°.vz.v•j..v 0000C0
 037500F2 7E83F246 8912C483 00002F45 9A006A0A 76FF0C76 FF271468 F476FFF6 -.v¶h.'.v..v.j..E/...6..F·.-·.u. 0000E0
 260277FF 26FC5EC4 3E8068F4 76FFF676 FFF876FF FA76FF00 26E9F246 880006E9 Õ...F·Õ&..v°.v℅.v~.v¶h.>6^=&.w.& 000100
 D88E2EB3 881E5657 000010C8 CBC95F5E 1F0000E9 10C48300 002D859A 006A37FF .7j..ç·...6.Õ...^ èüà...WV.¡°..Ä 000120
 FC478826 0E5EC404 0E4683F2 5689F046 89FE5788 26FC4788 260E5EC4 040E4683 .F..6^.&.G=&.Wz.FÞ.V·.F..6^.&.G= 000140
 260E5EC4 040E4683 FA4689FE 4788260E 5EC4020E 4683F856 89F64689 FE578826 &.Wz.F-.V℅.F..6^.&.Gz.F°.F..6^.& 000160
 0003F446 C70139E9 0000F446 C7002BE9 FA4688FE 5689FC46 89FE5788 26FC4788 .G=&.Wz.F•.Vz.F°Õ+.úF¶..Õ9.úF¶.. 000180
 52300116 E90119E9 0002F446 C70121E9 0002F446 C70129E9 0001F446 C70131E9 Õ1.úF¶..Õ).úF¶..Õ!.úF¶..Õ..Õ..=R 0001A0
 03750203 3DFFC0E9 037C0228 30003BE9 037E022C 3D007EE9 037EFFE5 E9037502 .u.Õ1.~.Õ~.*,.-.Õ;.=+.|.Õà.*..u. 0001C0
 037F020E 3DFF88E9 037D0208 3DFFC0E9 FF8BE903 7501F53D 0008E903 7EFF88E9 Õ¡.-.Õ..=%.u.ÕE.Õà.*..}.Õ¡.*.... 0001E0
```

```
Dump of file SATURN:[PCCOMMON.DUMP.DLL]DMLGLOB.TMP;1 on 18-APR-1990 10:44:56.67
File ID (627,22,0)   End of file block 315 / Allocated 316

Virtual block number 48 (00000030), 512 (0200) bytes

 03750237 3D0008E9 037EFF95 E9037502 473DFFA5 E9FF98E9 03750224 3DFFA8E9 Ō´.=$.u.Ō..ŌE.=G.u.Ō..-.Ō..=7.u. 000000
 4E3DFF6D E9037F02 4C3DFF7D E9037D02 4B3DFF75 E9037502 4A3DFF8D E9FF88E9 Ō..Ō..=J.u.Ōu.=K.).Ō).=L...Ōm.=N 000020
 037EFF45 E9037J02 64300033 E9037EFF 4AE90375 027A3DFF 6AE9FF65 E9037502 .u.Ōe.Ōj.=z.u.ŌJ.-.Ō3.=d.u.ŌE.-. 000040
 743DFF35 E9037D02 723DFF25 E9037502 6D3DFF45 E9FF40E9 03750255 30008E9  Ō..=U.u.Ōa.ŌE.=m.u.Ō%.=r.).Ō5.=t 000060
 7D3DFF15 E9037D02 783D001B E9037EFF 1AE90375 028130FF 2AE9FF25 E9037F02 ...Ō%.Ō*.=..u.Ō..-.Ō..=(.).Ō..=) 000080
 F2E9037D 02903DFE F2E90375 028E3DFF 02E9FEE5 E9037502 803DFF05 E9037F02 ...Ō..=..u.Ō!±Ō..=..u.Ō·±=..).Ō· 0000A0
 F276FFF6 76FFF876 FFF476FF FEDFE9FE DAE90375 02973DFE E2E9037F 02913DFE ±=....Ōä±=..u.ŌÖ±ŌÖ±.v¶.v½.v-.v· 0000C0
 0016C8CB C95F5E1F 0000E912 C4830000 2E389A00 6A4E6AFC 76FFFE76 FFF076FF .vÞ.v±.v=jNj..8....á.Ō...^ èùà.. 0000E0
 4683FA56 89F84689 FE578826 FC478826 0E5EC404 0E46830B 8E2F5C88 1E565700 .WV.¡\/.Ä.F..á^.&.G=&.W±.F%.V*.F 000100
 880A4688 EE4689F0 46890000 88F65689 F44689FE 578826FC 4788260E 5EC4040E ..á^.&.G=&.W±.F¶.V-¡...FÞ.FŸ.F.. 000120
 E90375FE 460BFC46 88FE5689 FC4689EC 5688EA46 88000CE9 FE5689FC 46890C56 V..F=.V±Ō...FŌ.V&.F=.V±.F=.F±u.Ō 000140
 10C48300 00310D9A 006AFC76 FFFE76FF 27DA68F8 76FFFA76 FF5016EA 4680003F ?..FŌ.P.v*.v½hÓ'.v±.v=j..ï1...á. 000160
 AAE9F056 89EE4689 FE5688FC 46880035 E9F24688 0006E903 7500F27E 83F24689 .F·.-·.u.Ō...F·Ō5..F=.V±.FŸ.VÞŌ` 000180
 002F109A 006AEE76 FFF076FF 271868F8 76FFFA76 FF066AF4 76FFF676 FF056AFF .j..v-.v¶j..v*.v½h.'.vÞ.vŸj.../. 0001A0
 260E5EC4 040E4683 D88E3125 881E5657 000114C8 CBC95F5E 1F0000E9 14C48300 ..á.Ō...^ èùà...WV.¡X1.Ä.F..á^.& 0001C0
 C4020E46 83FE4689 FE478826 0E5EC402 0E4683F6 5689F446 89FE5788 26FC4788 .G=&.W±.F¶.V-.F..á^.&.G±.F±.F..á 0001E0

Dump of file SATURN:[PCCOMMON.DUMP.DLL]DMLGLOB.TMP;1 on 18-APR-1990 10:44:56.67
File ID (627,22,0)   End of file block 315 / Allocated 316

Virtual block number 49 (00000031), 512 (0200) bytes

 FEF29689 FEF08689 FE578826 FC478826 0E5EC404 0E4683FC 4689FE47 88260E5E ^.&.G±.F=.F..á^.&.G=&.W±..Þ±..·± 000000
 F676FF07 6A5016FE F48680FA 5689F846 89FE5788 26FC4788 260E5EC4 040E4683 .F..á^.&.G=&.W±.F%.V*..¶±.Pj..v- 000020
 8680FEF0 86FFFEF2 86FF12C4 83000032 A79A006A 0A76FF0C 76FF2712 68F476FF .v¶h.'.v..v.j..¦2...á..Ä ±.ÄÞ±.. 000040
 76FF27DA 68F476FF F676FF50 16FEEC86 800000FF FF9AF876 FFFA76FF 5016FEF4 ¶±.P.v*.v½.......$±.P.v-.v¶hÖ'.v 000060
 B6FFFC76 FF0044E9 0375FEEE 8608FEEC 868810C4 83000031 999A006A 0A76FF0C ..v.j...1...á...$±..Ÿ±u.ŌD..v=.Ä 000080
 FFFEF086 FFFEF286 FFF876FF FA76FF00 00FFFF9A F876FFFA 76FFFEF0 86FFFEF2 ·±.ÄÞ±.v*.v½......v*.v½.Ä ±.ÄÞ±. 0000A0
 8818C483 0000326F 9A006AFE EC86FFFE EE86FF27 1A68F476 FFF676FF 006AFC76 v=j..v-.v¶h.'.ÄŸ±.Ä$±j..o2...á.¡ 0000C0
 4788260E 5EC4040E 4683088E 31F4881E 56570000 14C8C8C9 5F5E1F00 00E90000 ..Ō...^_èùà...WV.¡¶1.Ä.F..á^.&.G 0000E0
 EE5689EC 4689FE57 8826FC47 88260E5E C4040E46 83F45689 F24689FE 578826FC =&.W±.F¯.V¶.F..á^.&.G=&.W±.F&.VŸ 000100
 FE478826 0E5EC402 0E4683FA 5689F846 89FE5788 26FC4788 260E5EC4 040E4683 .F..á^.&.G=&.W±.F%.V*.F..á^.&.G± 000120
 260E5EC4 020E46 ; FE5689FC 4689FE57 8826FC47 88260E5E C4040E46 83F64689 .F-.F..á^.&.G=&.W±.F=.V±.F..á^.& 000140
 99888808 8E3312.. 1E565700 0000C8C8 C95F5E1F 0000E999 8488F046 89FE4788 .G±.FÞ¡Ç.Ō...^_èùà...WV.¡.3.Ä¡¡. 000160
 26FC4788 260E5EC4 040E4683 088E3399 881E5657 000010C8 CBC95F5E 1F0000E9 Ō...^_èùà...WV.¡.3.Ä.F..á^.&.G=& 000180
 4683F256 89F04689 FE578826 FC478826 0E5EC404 0E4683FE 5689FC46 89FE5788 .W±.F=.V±.F..á^.&.G=&.W±.FÞ.V·.F 0001A0
 8826FC47 88260E5E C4040E46 83FA5689 F84689FE 578826FC 4788260E 5EC4040E ..á^.&.G=&.W±.F%.V*.F..á^.&.G=&. 0001C0
 83088E33 80881E56 5700000A C8CBC95F 5E1F0000 E9998988 F65689F4 4689FE57 W±.F¶.V-¡¿.Ō...^_èùà...WV.¡¯3.Ä. 0001E0

Dump of file SATURN:[PCCOMMON.DUMP.DLL]DMLGLOB.TMP;1 on 18-APR-1990 10:44:56.67
File ID (627,22,0)   End of file block 315 / Allocated 316

Virtual block number 50 (00000032), 512 (0200) bytes

 26FC4788 260E5EC4 040E4683 FC5689FA 4689FE57 8826FC47 88260E5E C4040E46 F..á^.&.G=&.W±.F*.V=.F..á^.&.G=& 000000
 5F5E1F00 00E90000 88FE4689 FE478826 0E5EC402 0E4683F8 5689F646 89FE5788 .W±.F-.V½.F..á^.&.G±.F±¡..Ō...^  000020
 F84689FE 578826FC 4788260E 5EC4040E 4683088E 3418881E 56570000 0CC8C8C9 èùà...WV.¡.4.Ä.F..á^.&.G=&.W±.F% 000040
 260E5EC4 040E4683 F65689F4 4689FE57 8826FC47 88260E5E C4040E46 83FA5689 .V*.F..á^.&.G=&.W±.F¶.V-.F..á^.& 000060
 881E5657 00000CC8 C8C95F5E 1F0000E9 998A88FE 5689FC46 89FE5788 26FC4788 .G=&.W±.F=.V±¡o.Ō...^ èùà...WV.¡ 000080
 0E5EC404 0E4683FA 5689F846 89FE5788 26FC4788 260E5EC4 040E4683 D88E346A j4.Ä.F..á^.&.G=&.W±.F%.V*.F..á^. 0000A0
 FC4689FE 578826FC 4788260E 5EC4040E 4683F656 89F44689 FE578826 FC478826 &.G=&.W±.F¶.V-.F..á^.&.G=&.W±.F= 0000C0
 5EC4040E 4683088E 34C0881E 56570000 0AC8CBC9 5F5E1F00 00E9998B 88FE5689 .V±¡£.Ō...^ èùà...WV.¡.·.Ä.F..á^ 0000E0
 0E4683FA 4689FE47 88260E5E C4020E46 83F85689 F64689FE 578826FC 4788260E .&.G=&.W±.F¯.V½.F..á^.&._±.F*.F. 000100
 001AC8CB C95F5E1F 0000E900 0088FE56 89FC4689 FE578826 FC478826 0E5EC404 .á^.&.G=&.W±.F=.V±¡..Ō...^ èùà.. 000120
 4683EE56 89EC4689 FE578826 FC478826 0E5EC404 0E46830B 8E351688 1E565700 .WV.¡.5.Ä.F..á^.&.G=&.W±.F%.VŸ.F 000140
 4689FE47 88260E5E C4020E46 83E85689 E64689FE 578826FC 4788260E 5EC4040E ..á^.&.G=&.W±.F¦.VÒ.F..á^.&.G±.F 000160
 4788260E 5EC4020E 4683F456 89F24689 FE578826 FC478826 0E5EC404 0E4683F0 Þ.F..á^.&.G=&.W±.F·.V¶.F..á^.&.G 000180
 578826FC 4788260E 5EC4040E 4683F646 89FE4788 260E5EC4 020E4683 EA4689FE ±.FŌ.F..á^.&.G±.F-.F..á^.&.G=&.W 0001A0
 88F85EC4 FE5689FC 4689FE57 8826FC47 88260E5E C4040E46 83FA5689 F84689FE ±.F%.V*.F..á^.&.G=&.W±.F=.V±á^½. 0001C0
 65881E56 57000000 C8C8C95F 5E1F0000 E9998388 02578926 0789260C 56880A46 F..V.&..&.W.¡*.Ō...^_èùà...WV.¡e 0001E0
```

```
Dump of file SATURN:[PCCOMMON.DUMP.DLL]DMLGLOB.TMP;1 on 18-APR-1990 10:44:56.67
File ID (627,22,0)   End of file block 315 / Allocated 316

Virtual block number 51 (00000033), 512 (0200) bytes

 5EC4040E 46830B8E 361FB81E 56570000 14C8C8C9 5F5E1F00 00E999BE 88D88E35 5.Ä¡/.Õ...^ èùà...WV.¡.6.Ä.F..á^ 000000
 0E4683EC 4689FE47 8B260E5E C4020E46 83F65689 F44689FE 578B26FC 4788260E .&.G•&.W±.F¶.V-.F..á^.&.G±.F&.F. 000020
 578B26FC 478A260E 5EC4040E 4683F256 89F04689 FE578B26 FC478B26 0E5EC404 .á^.&.G•&.W±.FÞ.V·.F..á^.&.G•&.W 000040
 FFF276FF FA5689F8 4689FE57 8B26FC47 8B260E5E C4040E46 83FE5689 FC4689FE ±.F•.V±.F..á^.&.G•&.W±.F%.Vª.v·. 000060
 EE468912 C4830000 36E99A00 6A0A76FF 0C76FF27 1468F476 FFF676FF 036AF076 vÞj..v-.v¶h.'.v..v.j..Õ6...á..FŸ 000080
 271468F4 76FFF676 FF056AFC 76FFFE76 FF0180E9 EE468B00 06E90375 00EE7E83 .-Ÿ.u.Õ...FŸÕ...v±.v•j..v-.v¶h.' 0000A0
 E9EE4688 0006E903 7500EE7E 83EE4689 12C48300 00371C9A 006A0A76 FF0C76FF .v..v.j...7...á..FŸ.-Ÿ.u.Õ...FŸÕ 0000C0
 00003764 9A006A0A 76FF0C76 FF271468 F476FFF6 76FF066A F876FFFA 76FF015A Z..vª.v%j..v-.v¶h.'.v..v.j..d7.. 0000E0
 7502470B 26078826 F05EC401 27E9EE46 880006E9 037500EE 7E83EE46 8912C483 .á..FŸ.-Ÿ.u.Õ...FŸÕ'.á^Þ&..&.G.u 000100
 76FF0C76 FF271968 F476FFF6 76FF036A 37FF2602 77FF26F0 5EC4046A 0082E903 .Õ..j.á^Þ&.w.&.7j..v-.v¶h.'.v..v 000120
 FC5EC400 0FE9EE46 880006E9 037500EE 7E83EE46 8914C483 000037AD 9A006A0A .j..U7...á..FŸ.-Ÿ.u.Õ...FŸÕÕ.á^• 000140
 76FFF676 FF086A37 FF260277 FF26F05E C4EC76FF 003AE903 7402470B 26078826 &..&.G.t.Õ:..v&á^Þ&.w.&.7j..v-.v 000160
 0006E903 7500EE7E 83EE4689 14C48300 0037F59A 006A0A76 FF0C76FF 271968F4 ¶h.'.v..v.j..%7...á..FŸ.-Ÿ.u.Õ.. 000180
 FF260277 FF26FC5E C4066A00 39E90375 02470B26 078B26FC 5EC40096 E9EE4688 .FŸÕ..á^•&..&.G.u.Õ9.j.á^•&.w.&. 0001A0
 83EE4689 14C48300 0038309A 006A0A76 FF0C76FF 271968F4 76FFF676 FF056A37 7j..v-.v¶h.'.v..v.j..=8...á..FŸ. 0001C0
 C4056A00 39E90375 0247026 078B26F8 5EC4004E E9EE4688 0006E903 7500EE7E -Ÿ.u.Õ...FŸÕN.á^Y&..&.G.u.Õ9.j.á 0001E0

Dump of file SATURN:[PCCOMMON.DUMP.DLL]DMLGLOB.TMP;1 on 18-APR-1990 10:44:56.67
File ID (627,22,0)   End of file block 315 / Allocated 316

Virtual block number 52 (00000034), 512 (0200) bytes

 0032F89A 006A0A76 FF0C76FF 271968F4 76FFF676 FF066A37 FF260277 FF26F85E ^Y&.w.&.7j..v-.v¶h.'.v..v.j..%2. 000000
 C95F5E1F 0000E900 00B80006 E9EE4688 0006E903 7500EE7E 83EE4689 14C48300 ..á..FŸ.-Ÿ.u.Õ...FŸÕ..¡..Õ...^ è 000020
 89F44689 FE578B26 FC478B26 0E5EC404 0E46830B 8E363688 1E565700 0014C8C8 ùà...WV.¡66.Ä.F..á^.&.G•&.W±.F¶. 000040
 89FE578B 26FC478B 260E5EC4 040E4683 EC4689FE 478B260E 5EC4020E 4683F656 V-.F..á^.&.G±.F&.F..á^.&.G•&.W±. 000060
 5EC4040E 4683FE56 89FC4689 FE578B26 FC478B26 0E5EC404 0E4683F2 5689F046 FÞ.V·.F..á^.&.G•&.W±.F•.V±.F..á^ 000080
 FFF276FF 046A0076 E90375F2 4608F046 8BFA5689 F84689FE 578B26FC 4788260E .&.G•&.W±.F%.Vª.FÞ.F·u.Õv.j..v·. 0000A0
 EE468914 C4830000 36B69A00 6A0A76FF 0C76FF27 1868F476 FFF676FF 036AF076 vÞj..v-.v¶h.'.v..v.j..Ñ6...á..FŸ 0000C0
 F276FFEC 76FF0036 E90374FE 4608FC46 8800C7E9 EE468800 06E90375 00EE7E83 .-Ÿ.u.Õ...FŸÕù..F•.F±t.Õ6..v&.v· 0000E0
 468914C4 83000039 779A006A 0A76FF0C 76FF2718 68F476FF F676FF08 6AF076FF .vÞj..v-.v¶h.'.v..v.j..w9...á..F 000100
 FE76FF06 6A0035E9 0375FE46 0BFC4688 00B6E9EE 46880006 E9037500 EE7E83EE Ÿ.-Ÿ.u.Õ...FŸÕ...F•.F±u.Õ5.j..v± 000120
 468914C4 83000039 B79A006A 0A76FF0C 76FF2718 68F476FF F676FF05 6AFC76FF .v•j..v-.v¶h.'.v..v.j..ñ9...á..F 000140
 FA76FF05 6A0035E9 0375FA46 0BF84688 0046E9EE 46880006 E9037500 EE7E83EE Ÿ.-Ÿ.u.Õ...FŸÕF..F%.Fªu.Õ5.j..vª 000160
 468914C4 83000038 F69A006A 0A76FF0C 76FF2718 68F476FF F676FF06 6AF876FF .v%j..v-.v¶h.'.v..v.j..-8...á..F 000180
 57000018 C8C8C95F 5E1F0000 E9000088 0006E9EE 46880006 E9037500 EE7E83EE Ÿ.-Ÿ.u.Õ...FŸÕ..¡..Õ...^ èùà...W 0001A0
 020E4683 F65689F4 4689FE57 8B26FC47 8B260E5E C4040E46 83D88E38 69881E56 V.¡i8.Ä.F..á^.&.G•&.W±.F¶.V-.F.. 0001C0
 80EE5689 EC4689FE 578B26FC 4788260E 5EC4040E 4683EA46 89FE478B 260E5EC4 á^.&.G±.FÕ.F..á^.&.G•&.W±.F&.VŸ. 0001E0

Dump of file SATURN:[PCCOMMON.DUMP.DLL]DMLGLOB.TMP;1 on 18-APR-1990 10:44:56.67
File ID (627,22,0)   End of file block 315 / Allocated 316

Virtual block number 53 (00000035), 512 (0200) bytes

 0A76FF0C 76FF27F7 68F476FF F676FFEA 76FF5016 F0468D50 16FC468D 5016F846 F%.P.F•.P.FÞ.P.vÕ.v-.v¶h%'.v..v. 000000
 FFFA76FF 0037E9E8 46880006 E9037500 E87E83E8 46891AC4 8300003A 839A006A j...:...á..FÕ.-Õ.u.Õ...FÕÕ7..vª. 000020
 EC76FFEE 76FF27F6 68F476FF F676FFEA 76FFF076 FFF276FF FC76FFFE 76FFF876 v%.v±.v•.v·.vÞ.vÕ.v-.v¶h-'.vŸ.v& 000040
 881E5657 000090C8 C8C95F5E 1F0000E9 E84688E8 46891AC4 83000039 379A006A j..79...á..FÕ.FÕÕ...^ èùà...WV.¡ 000060
 89FE578B 26FC4· B 260E5EC4 040E4683 FE5689FC 46891056 880E4688 D88E39E3 D9.Ä.F..V..F•.V±.F..á^.&.G•&.W±. 000080
 020E4683 FF729689 FF708689 FE578B26 FC478B26 0E5EC404 0E468306 56890446 F&.V•.F..á^.&.G•&.W±..p...r..F.. 0000A0
 83EE5689 EC4689FE 578B26FC 4788260E 5EC4040E 46830846 89FE478B 260E5EC4 á^.&.G±.FÄ.F..á^.&.G•&.W±.F&.VŸ. 0000C0
 89C44689 FE578B26 FC478B26 0E5EC404 0E4683C8 4689FE47 8B260E5E C4020E46 F..á^.&.G±.Fà.F..á^.&.G•&.W±.Fá. 0000E0
 8B260E5E C4040E46 83F65689 F44689FE 578B26FC 4788260E 5EC4040E 4683C656 Vó.F..á^.&.G•&.W±.F¶.V-.F..á^.&. 000100
 83CA4689 0000FFFF 9A5016E2 46800476 FFD676FF FA5689F8 4689FE57 8826FC47 G•&.W±.F%.Vª.v•.và.Fã.P......Fò. 000120
 FF9A5016 F0468D50 16CC468D 1D8468E2 76FF01E3 E9987B8 0006E903 7500CA7E -ò.u.Õ..¡ñ.ÕÕ..vãhÇ..Fä.P.FÞ.P.. 000140
 68F076FF F276FF01 6A006A01 8CE9CA46 880006E9 037500CA 7E83CA46 890000FF ....Fò.-ò.u.Õ...FòÕŸ.j.j..v·.vÞh 000160
 83CA4689 0000FFFF 9AFC76FF FE76FF01 00680202 36FF2627 CE068EFF FF68FFFF ..h....ö'&.6..h...v±.v•......Fò. 000180
 37FF2602 77FF26F8 5EC4FF70 B6FFFF72 B6FF0183 E99987B8 0006E903 7500CA7E -ò.u.Õ..¡ñ.Õ...Ñr..Ñp.á^Y&.w.&.7 0001A0
 8D0152E9 99B7B800 06E90375 00CA7E83 CA468900 0022629A 5016FF78 8680026A j...x..P.b"...Fò.-ò.u.Õ..¡ñ.ÕR.. 0001C0
 0A76FF0C 76FF2714 680476FF D676FF02 6A5016E8 46800000 FFFF9A50 16FF7886 .x..P......FÕ.Pj..v•.vàh.'.v..v. 0001E0
```

```
Dump of file SATURN:[PCCOMMON.DUMP.DLL]DMLGLOB.TMP;1 on 18-APR-1990 10:44:56.67
File ID (627,22,0)   End of file block 315 / Allocated 316

Virtual block number 54 (00000036), 512 (0200) bytes

 26F85EC4 0115E999 87B80006 E9037500 CA7E83CA 468912C4 8300003A 439A006A j..C:...á..fò.-ò.u.Õ..¡ñ.Õ..á^½& 000000
 6A4C6A50 160E468D D476FF06 76FFE876 FFEA76FF 5016FF78 868037FF 260277FF .w.&.7..x..P.võ.vÒ.v#.vå.FB.PjLj 000020
 50160A46 8D0006E9 99B78800 06E90375 00CA7E83 CA468918 C4830000 3CDE9A00 ..8<...á..fò.-ò.u.Õ..¡ñ.Õ#..FÕ.P 000040
 209A006A 0A76FF0C 76FF27F7 680476FF D676FFC8 76FF5016 00468050 16E4468D .fô.P.FÅ.P.vò.v#.våh%'.v..v.j..  000060
 76FF0A76 FF0C76FF 0079E999 87B80006 E9037500 CA7E83CA 46891AC4 8300003D =...á..fò.-ò.u.Õ..¡ñ.Õ...v..v..v 000080
 310E9A00 6A476A50 16FF7486 8D0476FF D676FFE8 76FFEA76 FF021568 D.^4FFE0 Å.v8h...võ.vÒ.v#.vå..t..PjGj...1 0000A0
 E676FFDA 76FFDC76 FF005AE9 99B78800 06E90375 00CA7E83 CA46891A C46 7000 ...á..fò.-ò.u.Õ..¡ñ.Õz..vÉ.vÕ.vÌ 0000C0
 9A006AFF 7486FFFF 7686FF27 F6680476 FFD676FF C876FFD0 76FFD276 FFE4 6FF .vô.v#.vÅ.vò.v#.våh-'.Ñv..Ñt.j.. 0000E0
 FF748688 F45EC400 18E999B7 880006E9 037500CA 7E83CA46 891AC483 00003C23 #<...á..fò.-ò.u.Õ..¡ñ.Õ..á^¶..t. 000100
 3AA0881E 56570000 E0C8CBC9 5F5E1F00 00E90000 88025789 26078926 FF76968B ..v.&..&.W.¡..Õ...^ èùàÅ..WV.¡.: 000120
 844689FE 57882 6FC 4788260E 5EC4040E 4683F656 89F44689 1056880E 4688088E .Ä.F..V..F¶.V-.F..á^.&.G=&.W±.F. 000140
 5EC4020E 4683FF22 9689FF20 8689FE57 8826FC47 88260E5E C4040E46 83865689 .V..F..á^.&.G=&.W±.. ...".F..á^ 000160
 0E4683EE 5689EC46 89FE5788 26FC4788 260E5EC4 040E4683 884689FE 4788260E .&.G±.F..F..á^.&.G=&.W±.F$.VŸ.F. 000180
 56898A46 89FE5788 26FC4788 260E5EC4 040E4683 FF768689 FE478826 0E5EC402 .á^.&.G±..v..F..á^.&.G=&.W±.F..V 0001A0
 1692468D 8476FF86 76FFFE56 89FC4689 FE578826 FC478826 0E5EC404 0E46838C ..f..á^.&.G=&.W±.F=.V± v..v..F.. 0001C0
 10846892 76FF0325 E99987B8 0006E903 7500FF74 8E83FF74 86890000 38589A50 P.X;....t../t..u.Õ..¡ñ.ÇX..v.hÇ. 0001E0
```

```
Dump of file SATURN:[PCCOMMON.DUMP.DLL]DMLGLOB.TMP;1 on 18-APR-1990 10:44:56.67
File ID (627,22,0)   End of file block 315 / Allocated 316

Virtual block number 55 (00000037), 512 (0200) bytes

 74868800 07E90375 00FF748E 83FF7486 8900003B 7F9A5016 F0468050 1680468D .F..P.FÞ.P..;....t../t..u.Õ....t 000000
 01086802 0236FF26 27CE068E FFFF683B A068F076 FFF276FF 016A006A 02F8E9FF .Õ«.j.j..v·.vÞh.;h....ö'&.6..h.. 000020
 02BFE9FF 74868800 07E90375 00FF748E 83FF7486 8900003B 889AF476 FFF676FF .v-.v¶.¡;....t../t..u.Õ....t.Õ¢. 000040
 688476FF 8676FF02 6A501694 468D02A0 E9000088 0006E903 74003F83 268A5EC4 á^.&.?.t.Õ..¡..ÕU..F..Pj..v..v.h 000060
 0007E903 7500FF74 8E83FF74 868912C4 8300003C 9F9A006A 0A76FF0C 76FF2714 .'.v..v.j...<...á...t../t..u.Õ.. 000080
 76FF0000 1B7D9AEC 76FFEE76 FFEA5689 E846890C 56880A46 88027BE9 FF748688 ..t.Õx..F..V..FÕ.Võ.vŸ.v$.)....v 0000A0
 FFFF2086 FFFF2286 FF0213E9 03740000 3000001B 929A5016 FF78868D EC76FFEE Ÿ.v$..x..P.....=..t.Õ...Ñ"..Ñ .. 0000C0
 E9037500 FF748E83 FF748689 00002220 9A5016FF 7C868D15 6AFF7886 FFFF7A86 Ñz..Ñx.j...|..P. "....t../t..u.Õ 0000E0
 0038E99A 50169846 8D026AFF 7886FFFF 7A86FFFF 2086FFFF 2286FFFF 89E90003 ..Õ¿..Ñ"..Ñ ..Ñz..Ñx.j..F..P.Õ;. 000100
 9AFF7C86 FFFF7E86 FFFF2086 FFFF2286 FF0018E9 037500FF 748E83FF 74868900 ...t../t..u.Õ...Ñ"..Ñ ..Ñ~..Ñ|.. 000120
 E9FA5689 F84689FF 7E9688FF 7C868800 003C069A 50169846 8DFF77E9 000022B1 Ÿ"..Õw..F..P..<....|...-..F%.V°Õ 000140
 984680FF 7886FFFF 7A86FF01 5DE90375 02470826 07882 6F8 5EC404F8 46830004 ...F%.á^½&..&.G.u.Õ|..Ñz..Ñx..F. 000160
 8918C483 00003C62 9A006A4C 6A50168E 46808476 FF8676FF 9476FF96 76FF5016 .P.v..v..v..v..F..PjLj..b<...á.. 000180
 260277FF 26F85EC4 FF2086FF FF2286FF FF82E900 03E90375 00FF748E 83FF7486 .t../t..u.Õ..Õý..Ñ"..Ñ .á^½&.w.& 0001A0
 FF82E900 03E90375 00FF748E 83FF7486 8900003F 309A5016 FF28868D 026A37FF .7j...(..P.=?....t../t..u.Õ..Õ.. 0001C0
 76FF9676 FF5016FF 28868037 FF260277 FF26F85E C400003F 609A5016 FF28868D ..(..P.m?..á^½&.w.&.7..(..P.v..v 0001E0
```

```
Dump of file SATURN:[PCCOMMON.DUMP.DLL]DMLGLOB.TMP;1 on 18-APR-1990 10:44:56.67
File ID (627,22,0)   End of file block 315 / Allocated 316

Virtual block number 56 (00000038), 512 (0200) bytes

 FF748E83 FF748689 18C48300 00406F9A 006A4D6A 5016E446 8D8476FF 8676FF94 ..v..v..Fõ.PjMj..oâ...á...t../t. 000000
 76FF9476 FF9676FF 0215688E 76FF9076 FFE476FF E676FFFF 39E90003 E9037500 .u.Õ..Õ9..v|.võ.v...v.h...v..v..v 000020
 7500FF74 8E83FF74 86891AC4 8300003F 889A006A 476A5016 FF24868D 8476FF86 ..v...$..PjGj..¡?...á...t../t..u 000040
 FC5EC400 12E90374 EA563900 1AE90374 E846390C 56880A46 88FEF8E9 0003E903 .Õ..Õ«±.F..V.9FÕt.Õ..9Võt.Õ..á^= 000060
 270C6884 76FF8676 FFFF2486 FFFF2686 FF025789 26078926 FF269688 FF248688 ..$...&.&..&.W..Ñ&..Ñ$..v..v.hÉ' 000080
 A1E90003 E9037500 FF748E83 FF748689 10C48300 003EAB9A 006AE876 FFEA76FF .võ.vÒj..'>...á...t../t..u.Õ..ÕÀ 0000A0
 86FFFF7E 86FFFF20 86FFFF22 86FFFE90 E9EA5689 E84689FF 269688FF 248688FE ±..$...&..FÕ.VõÕ.±.Ñ"..Ñ ..Ñ~..Ñ 0000C0
 00FFFF9A 006A0A76 FF0C76FF 8476FF86 76FFFF76 86FFFD04 E900003F 609AFF7C |..'?..Õå».Ñv..v..v..v..v.j..... 0000E0
 1F0000E9 00008800 06E9FF74 86880007 E9037500 FF748E83 FF748689 0CC48300 ..á...t../t..u.Õ....t.Õ..¡..Õ... 000100
 040E4683 DE56890C 46891056 880E4688 D88E3D5E 881E5657 000026C8 C8C95F5E ^ èùà&..WV.¡^=.Ä.F..V..FÉ.VB.F.. 000120
 FE578826 FC478826 0E5EC404 0E4683EC 5689EA46 89FE5788 26FC4788 260E5EC4 á".&.G=&.W±.Fõ.V$.F..á^.&.G=&.W± 000140
 C4040E46 83F65689 F44689FE 578826FC 4788260E 5EC4040E 4683F256 89F04689 .FÞ.V·.F..á^.&.G=&.W±.F¶.V-.F..á 000160
 89FE5788 26FC4788 260E5EC4 040E4683 E25689E0 4689FE57 8826FC47 88260E5E ^.&.G=&.W±.FÅ.Vã.F..á^.&.G=&.W±. 000180
 06E90375 00E47E83 E4468900 003E029A 5016EE46 8DEA76FF EC76FFFE 5689FC46 F=.V±.v$.võ.FŸ.P..>...Fõ.-õ.u.Õ. 0001A0
 83E44689 0000421E 9A5016F8 46805016 E646801D 8468EE76 FF0088E9 998C8800 .¡Ÿ.Õ...vŸhÇ..F|.P.F%.P..B...Fõ. 0001C0
 3E289A00 6A006A5^ 160A468D 1D8568EE 76FF0064 E9998C88 0006E903 7500E47E ~õ.u.Õ..¡Ÿ.Õd..vŸhç..FÕ.Pj.j..+> 0001E0
```

```
Dump of file SATURN:[PCCOMMON.DUMP.DLL]DMLGLOB.TMP;1 on 18-APR-1990 10:44:56.67
File ID (627,22,0)   End of file block 315 / Allocated 316

Virtual block number 57 (00000039), 512 (0200) bytes

 4F68F876 FFFA76FF 016A006A 003EE999 BC880006 E9037500 E47E83E4 46890000 ...Fô.-ô.u.Ô..¡V.Ô>.j.j..v'.vWhO 000000
 E47E83E4 46890000 3E679A50 160A4680 01086802 0236FF26 27CE068E FFFF683E >h....ö'&.6..h...FÖ.P.g>...Fô.-ô 000020
 4C881E56 57000018 C8C8C95F 5E1F0000 E9000088 0006E999 BC880006 E9037500 .u.Ô..¡V.Ô..¡..Ô...^_èüà...WV.¡L 000040
 4689FE57 8826FC47 88260E5E C4040E46 83EC5689 EA468910 56880E46 88088E41 A.Ä.F..V..Fõ.V$.F..ó*.&.G=&.W±.F 000060
 41D19A50 16F84680 F476FFF6 76FFFE46 89FE4788 260E5EC4 020E4683 F65689F4 ¶.V-.F..ó^.&.G±.F±.v-..¶.F%.P.ÌA 000080
 805016F0 46801084 68F876FF 0088E999 BC880006 E9037500 EE7E83EE 46890000 ...FŸ.-Ÿ.u.Ô..¡V.Ô...V¼Ç..FÞ.P. 0000A0
 8568F876 FF0064E9 998C8800 06E90375 00EE7E83 EE468900 00430B9A 5016FA46 Fª.P..C...FŸ.-Ÿ.u.Ô..¡V.Ôd..V½hç 0000C0
 3EE999BC 880006E9 037500EE 7E83EE46 89000041 FB9A006A 006A5016 E8468010 ..FÔ.Pj.j..¥A...FŸ.-Ÿ.u.Ô..¡V.Ô> 0000E0
 E8468D01 24680202 36FF2627 CE068EFF FF68423F 68FA76FF FC76FF01 6A006A00 .j.j..v•.vªh?8h....ö'&.6..h$..FÒ 000100
 1F0000E9 00008800 06E9998C 880006E9 037500EE 7E83EE46 89000042 569A5016 .P.VB...FŸ.-Ÿ.u.Ô..¡V.Ô..¡..Ô... 000120
 89FE5788 26FC4788 260E5EC4 040E4683 D88E427F 881E5657 00000EC8 C8C95F5E ^ èüà...WV.¡.B.Á.F..ó^.&.G=&.W±. 000140
 000088FC 5EC4FE56 89FC4689 FE578826 FC478826 0E5EC404 0E4683FA 5689F846 F%.V'.F..ó^.&.G=&.W±.F•.V±ó^•¡.. 000160
 9A006A0A 76FF0C76 FF271468 F876FFFA 76FF026A 5016F446 80078926 02478926 &.G.&...F¶.Pj..v'.vWh.'.v..v.j.. 000180
 74F64608 F4468800 39E90000 880006E9 037500F2 7E83F246 8912C483 00004402 .D...ó..F·-·.u.Ô..¡..Ô9..F¶.F-t 0001A0
 6AF476FF F676FF27 1E68F876 FFFA76FF FC76FFFE 76FF0028 E9000088 0006E903 .Ô..¡..Ô(..v±.v•.v'.vWh.'.v-.v¶j 0001C0
 6C881E56 5700000E C8C8C95F 5E1F0000 E9000088 F2468910 C4830000 40C99A00 ..èâ...Á..F·¡..Ô...^_èüà...WV.¡l 0001E0

Dump of file SATURN:[PCCOMMON.DUMP.DLL]DMLGLOB.TMP;1 on 18-APR-1990 10:44:56.67
File ID (627,22,0)   End of file block 315 / Allocated 316

Virtual block number 58 (0000003A), 512 (0200) bytes

 260E5EC4 040E4683 FA5689F8 4689FE57 8826FC47 88260E5E C4040E46 83,'0E43 C.Ä.F..ó^.&.G=&.W±.F%.V'.F..ó^.& 000000
 6A5016F4 46800789 26024789 26000088 FC5EC4FE 5689FC46 89FE5788 26F.4788 .G=&.W±.F•.V±ó^•¡..&.G.&...F¶.Pj 000020
 F27E83F2 468912C4 83000044 859A006A 0A76FF0C 76FF2714 68F876FF FA76FF02 ..v'.vWh.'.v..v.j..çD...ó..F·.-· 000040
 FE76FF00 28E90000 880006E9 0374F646 08F44688 0039E900 00880006 E9037500 .u.Ô..¡..Ô9..F¶.F-t.Ô..¡..Ô(..v± 000060
 88F24689 10C48300 0043C09A 006AF476 FFF676FF 27E968F8 76FFFA76 FFFC76FF .v•.v'.vWhÔ'.v-.v¶j..àC...ó..F·¡ 000080
 4788260E 5EC4040E 4683088E 441F881E 56570000 0AC8C8C9 5F5E1F00 00E90000 ..Ô...^_èüà...WV.¡.D.Á.F..ó^.&.G 0000A0
 F85689F6 4689FE57 8826FC47 88260E5E C4040E46 83FE5689 FC4689FE 578826FC •&.W±.F=.V±.F..ó^.&.G•&.W±.F-.V½ 0000C0
 C4830000 44739A00 6A0A76FF 0C76FF27 1268FC76 FFFE76FF 076AF676 FFF876FF .v½.v-j..v±.v=h.'.v..v.j..sD...ó 0000E0
 00880000 FFFF9AF6 76FFF876 FF0011E9 FA468800 06E90375 00FA7E83 FA468912 ..F'.-'.u.Ô...F'Ô...v½.v-.....¡. 000100
 5689FC46 8910568B 0E468808 8E440288 1E565700 001CC8C8 C95F5E1F 0000E900 .Ô...^_èüà...WV.¡ØD.Á.F..V..F•.V 000120
 4788260E 5EC4020E 4683EC56 89EA4689 FE578826 FC478826 0E5EC404 0E4683FE ±.F..ó*.&.G•&.W±.Fõ.V$.F..ó^.&.G 000140
 8DF676FF F876FFF8 5689F646 89FE5788 26FC4788 260E5EC4 040E4683 EE4689FE ±.FŸ.F..ó^.&.G•&.W±.F-.V½.v½.v-. 000160
 4680EA76 FFEC76FF 0088E999 83880006 E9037500 FA7E8300 00FFFF9A 5016FA46 F'.P......-'.u.Ô..¡°.Ô...v$.vô.F 000180
 10846BF0 76FF0066 E9998C88 0006E903 7500E47E 83E44689 0000428E 9A5016F0 Þ.P./B...Fô.-ô.u.Ô..¡V.Ôf..vÞhÇ. 0001A0
 3FE999BC 880006E9 037500E4 7E83E446 89000042 E59A5016 F2468050 16E64680 .Fl.P.F·.P.ÌB...Fô.-ô.u.Ô..¡V.Ô? 0001C0
 FE76FF01 25680202 36FF2627 CE068EFF FF68432C 68F276FF F476FF01 6A006A00 .j.j..v¶.v·h,Ch....ö'&.6..h%..v± 0001E0

Dump of file SATURN:[PCCOMMON.DUMP.DLL]DMLGLOB.TMP;1 on 18-APR-1990 10:44:56.67
File ID (627,22,0)   End of file block 315 / Allocated 316

Virtual block number 59 (0000003B), 512 (0200) bytes

 0000E900 00880006 E9998C88 0006E903 7500E47E 83E44689 00004343 9AFC76FF .v•.CC...Fô.-ô.u.Ô..¡V.Ô..¡..Ô.. 000000
 0E4683FE 5689FC46 8910568B 0E4688D8 8E4551B8 1E565700 001AC8C8 C95F5E1F .^ èüà...WV.¡OE.Ä.F..V..F•.V±.F. 000020
 F04689FE 4788260E 5EC4020E 4683EE56 89EC4689 FE578826 FC478826 0E5EC404 .ó*.&.G=&.W±.F$.VŸ.F..ó^.&.G±.FÞ 000040
 5016F646 8DEC76FF EE76FFF4 5689F246 89FE5788 26FC4788 260E5EC4 040E4683 .F..ó^.&.G=&.W±.F·.V¶.vŸ.v$.F-.P 000060
 E8468D10 8468F676 FF0066E9 998C8800 06E90375 00E67E83 E6468900 0045C49A .óE...Fl.-l.u.Ô..¡V.Ôf..v-hÇ..FÒ 000080
 006A003F E9998C88 0006E903 7500E67E 83E64689 000045E8 9A5016F8 46805016 .P.F%.P.ŜE...Fl.-l.u.Ô..¡V.Ô?.j. 0000A0
 FC76FFFE 76FF0133 68020236 FF2627CE 068EFFFF 68460C68 F876FFFA 76FF016A j..v'.vWh.Fh....ö'&.6..h3..v±.v• 0000C0
 5F5E1F00 00E90000 880006E9 998C8800 06E90375 00E67E83 E6468900 0046249A .$F...Fl.-l.u.Ô..¡V.Ô..¡..Ô...^_ 0000E0
 1E565700 0010C8C8 C95F5E1F 0000E999 848BD88E 464D881E 56570000 00C8C8C9 èüà...WV.¡MF.Á¡Ç.Ô...^_èüà...WV. 000100
 5EC4020E 4683F456 89F24689 FE578826 FC478826 0E5EC404 0E4683D8 8E472A88 ¡*G.Ä.F..ó^.&.G=&.W±.F·.V¶.F..ó^ 000120
 F85EC4FA 5689F846 89FE5788 26FC4788 260E5EC4 040E4683 F64689FE 4788260E .&.G±.F-.F..ó^.&.G=&.W±.F%.V'ó^½ 000140
 FF271468 F276FFF4 76FFF676 FF5016FC 4680FC46 89FE4689 00008800 0007C726 &ú...¡...F±.F•.F•.P.v-.v¶.v·h.'. 000160
 00018800 06E90375 FE4608FC 4688F046 8912C483 0000451A 9A006A0A 76FF0C76 v..v.j...E...ó..FÞ.F•.F±u.Ô..¡.. 000180
 41881E56 57000010 C8C8C95F 5E1F0000 E9000088 078926F8 5EC40000 880003E9 Ô..¡..ó^¥&..¡..Ô...^_èüà...WV.¡A 0001A0
 260E5EC4 020E4683 F85689F6 4689FE57 8826FC47 88260E5E C4040E46 83D88E47 G.Ä.F..ó^.&.G•&.W±.F=.V½.F..ó^.& 0001C0
 5016FC46 8DF45689 F24689FE 578826FC 4788260E 5EC4040E 4683FA46 89FE4788 .G±.F'.F..ó^.&.G•&.W±.F·.V¶.F•.P 0001E0
```

```
Dump of file SATURN:[PCCOMMON.DUMP.DLL]DMLGLOB.TMP;1 on 18-APR-1990 10:44:56.67
File ID (627,22,0)   End of file block 315 / Allocated 316

Virtual block number 60 (0000003C), 512 (0200) bytes

 83F04689 12C48300 00486E9A 006A0A76 FF0C76FF 271468F6 76FFF876 FFFA76FF .v•.v½.v-h.'.v..v.j..nH...á..Fþ. 000000
 FFF876FF FA76F¯00 4AE90375 FE4608FC 4688008F E9F04688 0006E903 7500F07E ~þ.u.Õ...FþÕ...F•.F±u.ÕJ..v•.v½. 000020
 06E90375 00F07E83 F046890E C4830000 47A89A00 6A0A76FF 0C76FF27 F968F676 v-h•'.v..v.j..´G...á..Fþ.-þ.u.Õ. 000040
 0CC48300 0041109° 006AFC76 FFFE76FF F676FFF8 76FFFA76 FF0056E9 F0468800 ..FþÕV..v•.v½.v-.v±.v•j...A...á. 000060
 48359A00 6A0A76FF 0C76FF27 D868F676 FFF876FF FA76FFF2 76FFF476 FFF04689 .Fþ.v¶.v·.v•.v½.v-hÄ'.v..v.j..5H 000080
 5F5E1F00 00E9F046 880006E9 F0468800 06E90375 00F07E83 F0468912 C4830000 ...á..Fþ.-þ.u.Õ...FþÕ...FþÕ...^_ 0000A0
 000002C8 C8C95F5E 1F0000E9 08568806 4688D88E 47DF881E 56570000 00C8C8C9 èùà...WV.¡ÕG.Ä.F..V.Õ...^_èùà..¯ 0000C0
 316A026A 006A006A 006A01F8 681E016A 306AFFFF 6846E968 D88E48EA 881E5657 WV.¡ÕH.ÄhÕFh..jÕj..h½.j.j¯j.j.j1 0000E0
 000A3EDA 02030035 C8C95F5E 1F0000E9 FE4688FE 468918C4 830000FF FF9A006A j.......á..F±.F±Õ...^_èù5...Õ>.. 000100
 00061CF3 0203033B 000A45A5 02030006 00061D06 0203005E 0005488E 020302B3 °...¡N..^.......#...EË..;...µ... 000120
 00064909 00020256 0008453A 02030456 00063E52 000502C4 000A05D1 020300E2 â...1...á...R>..V...:E..V....1.. 000140
 00041FF3 0103007E 00042385 0103007D 00044701 01030384 0000D1AE8 02030000 ....Õ...Ç....G..)....#..-...µ... 000160
 00042034 01030264 00084007 020348E2 0006490C 00050171 00064103 0203007F .....A..q....1..âH...a..d...4 .. 000180
 000746C8 020302D8 000A3EE8 02030087 00041C82 0103007E 00054031 02030086 ....1a..-...............Š>..Ä...àF.. 0001A0
 002C1AC9 0002000B 00042163 01030088 00041C37 010300FA 00061738 020301F0 þ...;...•...7.......c!......è.,. 0001C0
 000A0ACE 02030000 002E4904 0002008F 00054899 02030013 00042135 01030000 ....Š1.......H........!......ö... 0001E0

Dump of file SATURN:[PCCOMMON.DUMP.DLL]DMLGLOB.TMP;1 on 18-APR-1990 10:44:56.67
File ID (627,22,0)   End of file block 315 / Allocated 316

Virtual block number 61 (0000003D), 512 (0200) bytes

 00081A07 0203001F 000419B8 0103010E 000646A1 0203001E 00041AD0 010302EC &...1.......ÄF......£........... 000000
 00052A7A 0203011A 00062127 020302F7 000A0FEC 02030000 00063BA3 00050368 h...£;......$...%...'!......z*.. 000020
 0004219E 01030128 00063FE8 02030083 00042320 01030376 00082377 020300A2 Å...w#..v... #..°...Š?..(....!.. 000040
 000810F3 02030045 0004206E 01031023 0006432F 00050038 00054923 02030030 =...#!..8.../C..#...n ..E...µ... 000060
 00063F10 02030231 00083288 020303FC 000E148A 020319A6 0006460F 00050226 &....F..|.......•....2..1....7.. 000080
 000646EC 0005023C 000832C0 020307B8 00064242 00050409 000E1CD5 02030142 B...!.......BB..£...ë2..<...&F.. 0000A0
 88064688 D88EFFFF 881E5657 000000C8 00000000 00000000 00000000 0000123C <...............à...WV.¡...Ä.F.. 0000C0
 016A316A FFFF68FF FF68088E 0008881E 56570000 02C8C8C9 5F5E1F00 00E90856 V.Õ...^_èùà...WV.¡...Äh..h..j1j. 0000E0
 00E9FE46 88FE4689 18C48300 00FFFF9A 006A336A 026A006A 006A006A 02E8681E .hÕ.j.j¯j.j.j3j.......á..F±.F±Õ. 000100
 00380005 00410203 0000002E 00220002 00000007 00270002 0004C8C9 5F5E1F00 ..^_èù....'.......".......A...8. 000120
 88064688 D88EFFFF 881E5657 000000C8 00000000 00000000 00000007 002A0005 ..*...............à...WV.¡...Ä.F.. 000140
 016A316A FFFF68FF FF68D88E 0008881E 56570000 02C8C8C9 5F5E1F00 00E90856 V.Õ...^_èùà...WV.¡...Äh..h..j1j. 000160
 00E9FE46 88FE4689 18C48300 00FFFF9A 006A346A 026A006A 006A006A G.¯F681E .hŸ.j.j¯j.j.j4j.......á..F±.F±Õ. 000180
 0000002E 00220002 00000008 00270002 00000008 002A0005 0004C8C9 5F5 1F00 ..^_èù....*.......'.......". .... 0001A0
 040E4683 D88EFFFF 881E5657 000020C8 00000000 00000000 00380005 0041'203 ..A...8..........à ..WV.¡...Ä.F.. 0001C0
 FE578826 FC478826 0E5EC404 0E4683EA 5689E846 89FE5788 26FC4788 260E5EC4 á^.&.G=&.W±.FÕ.Võ.F..á^.&.G=&.W± 0001E0

Dump of file SATURN:[PCCOMMON.DUMP.DLL]DMLGLOB.TMP;1 on 18-APR-1990 10:44:56.67
File ID (627,22,0)   End of file block 315 / Allocated 316

Virtual block number 62 (0000003E), 512 (0200) bytes

 C4020E46 83F25689 F04689FE 578826FC 4788260E 5EC4040E 4683E456 89E24689 .Fã.VÕ.F..á^.&.G=&.W±.Fþ.V·.F..á 000000
 4683FA56 89F84689 FE578826 FC478826 0E5EC404 0E4683E0 4689FE47 88260E5E ^.&.G±.FÁ.F..á^.&.G=&.W±.F½.V•.F 000020
 8826FC47 88260E5E C4040E46 83F65689 F44689FE 578826FC 4788260E 5EC4040E ..á^.&.G=&.W±.F¶.V-.F..á^.&.G=&. 000040
 E79A006A F076FFF2 76FF2800 68E876FF EA76FF50 16EC4680 FE5689FC 4689FE57 W±.F•.V±.F§.P.võ.vÕh.(.v·.vþj..Õ 000060
 F276FF00 36E90374 EE4608EC 4688000B E9037400 E67E83E6 468910C4 83000000 ....á..F!.-!.t.Õ...F§.FŸt.Õ6..v· 000080
 468912C4 83000001 499A006A 0A76FF0C 76FF27D8 68E876FF EA76FF0E 6AF076FF .vþj..võ.vÕhÄ'.v..v.j..!....á..F 0000A0
 76FFF276 FFE876FF EA76FF00 6A005FE9 00F2E9E6 46880006 E9037500 E67E83E6 |.-|.u.Õ...F!Õ·.Õ_.j..võ.vÕ.v·.v 0000C0
 FF056A00 C5E9E646 880006E9 037500E6 7E83E646 890CC483 0000FFFF 9A006AF0 þj.......á..F!.-!¯u.Õ...F!Õé.j.. 0000E0
 14C48300 00017C9A 006A0A76 FF0C76FF 271868E8 76FFEA76 FF0E6AEC 76FFEE76 vŸ.v§j..võ.vÕh.'.v..v.j..|....á. 000100
 E876FFEA 76FF0F6A F876FFFA 76FF0090 E9E64688 0006E903 7500E67E 83E64689 .F|.-|.u.Õ...F!Õ...v•.v½j..võ.vÕ 000120
 880006E9 037500E6 7E83E646 8912C483 000001AF 9A006A0A 76FF0C76 FF27D868 hÄ'.v..v.j..£....á..F|.-|.u.Õ... 000140
 E29A006A 0A76FF0C 76FF27D8 68E876FF EA76FF10 6AF476FF F676FF00 50E9E646 F!Õ)..v-.v¶j..võ.vÕhÄ'.v..v.j..ã 000160
 116AFC76 FFFE76FF 002AE9E6 46880006 E9037500 E67E83E6 468912C4 83000001 ....á..F!.-!.u.Õ...F!Õ*..v±.v•j. 000180
 E9E64688 E6468912 C4830000 FFFF9A00 6A0A76FF 0C76FF27 D868E876 FFEA76FF .võ.vÕhÄ'.v..v.j.......á..F!.F!Õ 0001A0
 8826FC47 88260E5E C4040E46 83D88E00 08881E56 57000014 C8C8C95F 5E1F0000 ...^_èùà...WV.¡...Ä.F..á^.&.G=&. 0001C0
 4788260E 5EC4020E 4683FE46 89FE4788 260E5EC4 020E4683 F65689F4 4689FE57 W±.F¶.V-.F..á^.&.G±.F±.F..á^.&.G 0001E0
```

Dump of file SATURN:[PCCOMMON.DUMP.DLL]DMLGLOB.TMP;1 on 18-APR-1990 10:44:56.67
File ID (627,22,0)   End of file block 315 / Allocated 316

Virtual block number 63 (0000003F), 512 (0200) bytes

0E5EC404 0E4683F2 5689F046 89FE5788 26FC4788 260E5EC4 040E4683 FC4689FE ±.F•.F..ó^.&.G•&.W±.FÞ.V·.F..ó^. 000000
F076FFF2 76FF0214 6800EAE9 037400FE 7E83FA56 89F84689 FE578826 FC478826 &.G•&.W±.F½.V°.-±.t.Õõ.h...v·.vÞ 000020
FFF676FF 0E6A0204 68F076FF F276FFF8 76FFFA76 FF000002 859AF876 FFFA76FF .v°.v½.ç....v°.v½.v·.vÞh..j..v~. 000040
76FFF076 FFF2/.·F 02456818 C4830000 020C9A00 6A0A76FF 0C76FF27 1A68F476 v¶h.'.v..v.j..É....ó.hE..v·.vÞ.v 000060
F476FFF6 76FF0..A 020468F0 76FFF276 FFF876FF FA76FF00 0003479A F876FFFA °.v½.G....v°.v½.v·.vÞh..j..v~.v¶ 000080
68F076FF F276FFF8 76FFFA76 FF18C483 00000306 9A006A0A 76FF0C76 FF271A68 h.'.v..v.j.......ó..v°.v½.v·.vÞh 0000A0
FA76FF18 C4830000 03309A00 6A0A76FF 0C76FF27 1A68F476 FFF676FF 106A0204 ..j..v~.v¶h.'.v..v.j..0....ó..v° 0000C0
9A006A0A 76FF0C76 FF271A68 F476FFF6 76FF116A 020468F0 76FFF276 FFF876FF .v½.v·.vÞh..j..v~.v¶h.'.v..v.j.. 0000E0
C8E90000 88000003 999AF876 FFFA76FF F076FFF2 76FF0271 6818C483 00000368 k....ó.hq..v·.vÞ.v°.v½.....j..Õù 000100
83000000 AF9A006A 0A76FF0C 76FF2718 68F476FF F676FFFE 76FF5016 EC468000 ..F$.P.v±.v~.v¶h.'.v..v.j..£.... 000120
FFF276FF 02306800 48E9FE46 880099E9 00008800 06E90374 EE4608EC 468812C4 ó..F$.FŸt.Õ..j..Õ...F±ÕH.h=..v·. 000140
9AF876FF FA76FFF0 76FFF276 FF026068 004CE900 0003B09A F876FFFA 76FFF076 vÞ.v°.v½.¯...ÕL.h'..v·.vÞ.v°.v½. 000160
18E9001E E9000002 779AF876 FFFA76FF F076FFF2 76FF0250 680035E9 0000FFFF ....Õ5.hP..v·.vÞ.v°.v½.w...Õ..Õ. 000180
FFFA76FF 0000E9FF CEE90375 00113DFF 8FE90375 00103DFF 80E90375 000F3000 .=..u.Õ¯.=..u.Õ¢.=..u.Õö.Õ...v°. 0001A0
9E9A006A EC76FFEE 76FF271A 68F476FF F676FF00 6A020468 F076FFF2 76FFF876 v½.v·.vÞh..j..v~.v¶h.'.vŸ.v$j... 0001C0
0E4683D8 8E01FF88 1E565700 0016C8C8 C95F5E1F 0000E900 008818C4 83000002 ....ó.j..Õ...^_èùà...WV.j...Á.F. 0001E0

Dump of file SATURN:[PCCOMMON.DUMP.DLL]DMLGLOB.TMP;1 on 18-APR-1990 10:44:56.67
File ID (627,22,0)   End of file block 315 / Allocated 316

Virtual block number 64 (00000040), 512 (0200) bytes

578826FC 4788260E 5EC4040E 4683F856 89F64689 FE578826 FC478826 0E5EC404 .ó^.&.G•&.W±.F~.V½.F..ó^.&.G•&.W 000000
FE478826 0E5EC402 0E4683EA 4689FE47 88260E5E C4020E46 83F25689 F04689FE ±.FÞ.V·.F..ó^.&.G±.Fõ.F..ó^.&.G± 000020
880007C6 26F05EC4 FE5689FC 4689FE57 8826FC47 88260E5E C4040E46 83F44689 .F¶.F..ó^.&.G•&.W±.F•.V±ó^Þ&ó... 000040
76FF271A 68F676FF F876FF00 6A020468 F076FFF2 76FF5016 FA468DFA 4689EA46 Fõ.F°.F°.P.v·.vÞh..j..v½.v~h.'.v 000060
058E9AF0 76FFF276 FFF476FF FC76FFFE 76FF18C4 83000004 E89A006A 0A76FF0C ..v.j..$....ó..v±.v•.v¶.v·.vÞ... 000080
83000005 239A006A 0A76FF0C 76FF2718 68F676FF F876FF10 6A5016EC 468D0000 ...F$.Pj..v½.v~h.'.v..v.j..#.... 0000A0
76FFF276 FFEA76FF 5040F446 88FC76FF FE76FF00 4EE90375 EE4608EC 468812C4 ó..F$.FŸu.ÕN..v±.v•.F¶ªP.võ.v·.v 0000C0
FF5016EC 468D18C4 83000005 419A006A EC76FFEE 76FF27E6 68F676FF F876FFF0 Þ.v½.v~hl'.vŸ.v$j..A....ó..F$.P. 0000E0
C626F05E C4FFA7E9 10C48300 00040F9A 006AEC76 FFEE76FF 27DA68F6 76FFF876 v½.v~hÕ'.vŸ.v$j.......ó.ÕÏ.ó^Þ&ó 000100
76FF0214 68000005 7A9A5016 FA468DF0 76FFF276 FF022368 FA4689EA 46880007 ...Fõ.F°h#..v·.vÞ.F°.P.z...h...v 000120
FFFF9AF0 76FFF276 FFF476FF FC76FFFE 76FF0000 03C79A50 16FA468D F076FFF2 ·.vÞ.F°.P.ú....v±.v•.v¶.v·.vÞ... 000140
56570000 00C8C8C9 5F5E1F00 00E90000 88FA4689 EA468800 07C626F0 5EC40000 ..ó^Þ&ó...Fõ.F°j..Õ...^_èùà...WV 000160
D88E05B2 881E5657 000002C8 CBC95F5E 1F0000E9 08568806 4688D88E 042988 1E .j)..Á.F..V.Õ...^_èùà...WV.jÝ..Á 000180
830000FF FF9A006A 356A026A 006A006A 006A02F4 681E016A 316AFFFF 68FFFF68 h..h..j1j..h¶.j.j.j.j.j5j....... 0001A0
000804CE 0203005E 000504B7 02030008 CBC95F5E 1F0000E9 FE4688FE 468918C4 ó..F±.F±Õ...^_èù....ñ...^...ö... 0001C0
000905D4 00050000 002E05CC 0002008F 00050114 02030000 000905D1 00020246 F...l..................ä.......å... 0001E0

Dump of file SATURN:[PCCOMMON.DUMP.DLL]DMLGLOB.TMP;1 on 18-APR-1990 10:44:56.67
File ID (627,22,0)   End of file block 315 / Allocated 316

Virtual block number 65 (00000041), 512 (0200) bytes 00000000 00000000 00000000 0000023C 00080567 02030038 000505E8 020305AA ¯...$...8...g...<............... 000000
5689DE46 89FE5788 26FC4788 260E5EC4 040E4683 D88EFFFF 881E5657 000086C8 ð...WV.j...Á.F..ó^.&.G•&.W±.F8.V 000020
4788260E 5EC4040E 4683F256 89F04689 FE578826 FC478826 0E5EC404 0E4683E0 Á.F..ó^.&.G•&.W±.FÞ.V·.F..ó^.&.G 000040
D85689D6 4689FE57 8826FC47 88260E5E C4040E46 83CE5689 CC4689FE 578826FC •&.W±.Fä.Vö.F..ó^.&.G•&.W±.F¢.VÄ 000060
FC478826 0E5EC404 0E4683FE 5689FC46 89FE5788 26FC4788 260E5EC4 040E4683 .F..ó^.&.G•&.W±.F•.V±.F..ó^.&.G• 000080
260E5EC4 040E4683 EE4689FE 4788260E 5EC4020E 4683F656 89F44689 FE578826 &.W±.F¶.V~.F..ó^.&.G±.FŸ.F..ó^.& 0000A0
19E90374 E44608E2 46880224 E9037500 EE7E83E4 5689E246 89FE5788 26.·4788 .G•&.W±.Fä.Võ.-Ÿ.u.Õ$..Fã.Fõt.Õ. 0000C0
FFE076FF F076FFF2 76FF006A 006A096A 006A006A 0039E903 74F64608 F44.·802 ..F¶.F-t.Õ9.j.j.j.j.j..v·.vÞ.vÁ. 0000E0
880006E9 03750004 7E830446 891AC483 0000023A 9A006A48 6A5016F4 4680..76 v8.F¶.PjHj..:.....ó..Få.-å.u.Õ... 000100
014F9A00 6AF476FF F676FF27 E868DE76 FFE076FF 5016F846 8D096A03 81E90446 FåÕY.j..F½.P.vÁ.v8hÕ'..~.v¶j..O. 000120
E076FF50 16FF7A86 8D037FE9 D4468800 06E90375 00D47E83 D4468912 C4830000 ...ó..Få.-å.u.Õ...FåÕ.. .z..P.vÁ 000140
E9037500 D47E8304 468910C4 83000001 939A006A F076FFF2 76FF27E9 680E76FF .v8hÕ'.v·.vÞj.......ó..Få.-å.u.Õ 000160
FFF876FF FA76FF50 16FF7E86 8D0123E9 0374FE46 08FC4688 034EE904 46880006 ...FåÕN..F•.F±t.Õ#...~..P.v°.v½. 000180
D47E8304 468914C4 83000001 C59A006A FF7AB6FF FF7CB6FF 4404680E 76FFE076 vÁ.v8h.D.Ñ|..Ñz.j..é....ó..Få.-å 0001A0
B6FFFF7C B6FF271E 68DE76FF E076FF50 16D04680 030AE904 46880006 E9037500 .u.Õ...FåÕ...FÁ.P.vÁ.v8h.'.Ñ|..Ñ 0001C0
468002D8 E9D44688 0006E903 7500047E 83D44689 10C48300 0001FD9A 006AFF7A z.j..».....ó..Få.-å.u.Õ...FåÕÁ..F 0001E0

```
Dump of file SATURN:[PCCOMMON.DUMP.DLL]DMLGLOB.TMP;1 on 18-APR-1990 10:44:56.67
File ID (627,22,0)   End of file block 315 / Allocated 316

Virtual block number 66 (00000042), 512 (0200) bytes

00027A9A 006AD076 FFD276FF 2722680E 76FFE076 FF056A50 16FF7E86 8D5016EA ō.P..~..Pj..vÅ.vBh"'.v@.vÅj..z.. 000000
8680056A EA76F'EC 76FF02A0 E9D4468B 0006E903 7500047E 83044689 16C48300 ..á..Få.-å.u.Ō...FåŌ...vš.vōj... 000020
C4830000 FFFF9A00 6A486A50 16FC4680 DE76FFE0 76FFF076 FFF276FF 5016FF7E ~..P.v·.vÞ.vÅ.vB.F=.PjHj.......á 000040
7AB6FFFF 7CB6FFF8 76FFFA76 FF0263E9 D4468800 06E90375 00047E83 D446891A ..Få.-å.u.Ō...FåŌc..v".v%.Ñ|..Ñz 000060
C4830000 02C19A00 6AFC76FF FE76FF27 E8680E76 FFE076FF 5016EA46 8D056AFF .j..Fō.P.vÅ.vBhŌ'.vz.v=j..é....á 000080
16EA4680 5016FF7E 86800044 E90223E9 D4468800 06E90375 00047E83 D446891A ..Få.-å.u.Ō...FåŌ#.ŌD...~..P.Fō. 0000A0
006AFC76 FFFE76FF 2801680E 76FFE076 FFFF7AB6 FFFF7CB6 FFF876FF FA76FF50 P.v".v%.Ñ|..Ñz..vÅ.vBh.(.vz.v=j. 0000C0
CC76FFCE 76FF01DC E9D4468B 0006E903 7500047E 83044689 1CC48300 0002F49A .¶....á..Få.-å.u.Ō...FåŌÉ..vö.vä 0000E0
7E830446 8912C483 00000327 9A006A0A 76FF0C76 FF27D868 DE76FFE0 76FF0E6A j..vÅ.vBhÄ'.v..v.j..'....á..Få.- 000100
76FF27D8 680E76FF E076FF0F 6AD676FF D876FF01 A9E9D446 880006E9 03750004 å.u.Ō...FåŌ`..vÄ.v=j..vÅ.vBhÄ'.v 000120
0176E9D4 46880006 E9037500 D47E8304 468912C4 83000003 5A9A006A 0A76FF0C ..v.j..Z....á..Få.-å.u.Ō...FåŌv. 000140
C4830000 03809A00 6A0A76FF 0C76FF27 D8680E76 FFE076FF 106AFC76 FFFE76FF .vz.v=j..vÅ.vBhÄ'.v..v.j.......á 000160
76FFE076 FF116AF4 76FFF676 FF0143E9 D4468800 06E90375 00047E83 D4468912 ..Få.-å.u.Ō...FåŌC..v-.v¶j..vÅ.v 000180
0006E903 7500047E 83044689 12C48300 00FFFF9A 006A0A76 FF0C76FF 27D8680E 8hÄ'.v..v.j.......á..Få.-å.u.Ō.. 0001A0
76FFE076 FF126AE2 76FFE476 FF076A00 29E90375 E4460BE2 46880110 E9D4468B .FåŌ...Fä.Fōu.Ō).j..vŌ.väj..vÅ.v 0001C0
037500EE 7E8300^5 E9044689 14C48300 0004649A 006A0A76 FF0C76FF 2718680E 8h.'.v..v.j..d....á..FåŌ■..-Ÿ.u. 0001E0

Dump of file SATURN:[PCCOMMON.DUMP.DLL]DMLGLOB.TMP;1 on 18-APR-1990 10:44:56.67
File ID (627,22,0)   End of file block 315 / Allocated 316

Virtual block number 67 (00000043), 512 (0200) bytes

E246800E 76FFE076 FFEA76FF EC76FF50 16FF7E86 8D366A0A 76FF0C76 FF00CDE9 Ōë..v..v.j6..~..P.vš.vō.vÅ.vÑ.Fä 000000
0096E9D4 46880006 E9037500 D47E8304 46891AC4 83000000 EC9A006A 666A5016 .Pjfj..š....á..Få.-å.u.Ō...FåŌ.. 000020
16E6468D 0074E903 75DC460B DA468800 00CA46C7 DC5689DA 4689CE56 88CC4688 .Fä.Vō.FŌ.VÉúFò...FŌ.FÉu.Ōt..Fl. 000040
76FFDC76 FF280368 DE76FFE0 76FFEA76 FFEC76FF E276FFE4 76FF5016 CA468D50 P.Fò.P.vō.vä.vš.vō.vÅ.vBh.(.vÉ.v 000060
DA468D00 39E9D446 880006E9 03750004 7E830446 891CC483 00000494 9A006ADA Ōj.......á..Få.-å.u.Ō...FåŌ9..FŌ 000080
7E830446 8910C483 0000011E 9A006ADA 76FFDC76 FF27DA68 DE76FFE0 76FF5016 .P.vÅ.vBhŌ'.vÉ.vŌj........á..Få.- 0000A0
5700001E C8C8C95F 5E1F0000 E9D4468B FF81E900 09E9D446 880006E9 03750004 å.u.Ō...FåŌ..Ō...FåŌ.. ^_èùà...W 0000C0
020E4683 F25689F0 4689FE57 8826FC47 88260E5E C4040E46 83088E00 08881E56 V.i...Å.F..á^.&.G=&.Wz.iƀ.V·.F.. 0000E0
260E5EC4 040E4683 FC4689FE 4788260E 5EC4020E 4683FE46 89FE4788 260E5EC4 á^.&.Gz.Fz.F..á^.&.Gz.F=.F..á^.& 000100
89F44689 FE578826 FC478826 0E5EC404 0E4683EC 5689EA46 89FE5788 26FC4788 .G=&.Wz.Fō.Vš.F..á^.&.G=&.Wz.F¶. 000120
FF000006 BC9AF476 FFF676FF EA76FFEC 76FF0275 6800C2E9 037400FE 7E83F656 V-.-z.t.Ōò.hu..vš.vō.v-.v¶.W.... 000140
6A0A76FF 0C76FF27 1A68F076 FFF276FF 0E6A0204 68EA76FF EC76FFF4 76FFF676 v-.v¶.vš.vōh..j..v·.vÞh.'.v..v.j 000160
F076FFF2 76FF0F6A 020468EA 76FFEC76 FFF476FF F676FF18 C4830000 058C9A00 .......á..v-.v¶.vš.vōh..j..v·.vÞ 000180
68EA76FF EC76FFF4 76FFF676 FF18C483 00000586 9A006A0A 76FF0C76 FF271A68 h.'.v..v.j..Ñ....á..v-.v¶.vš.vōh 0001A0
F676FF18 C4830000 05E09A00 6A0A76FF 0C76FF27 1A68F076 FFF276FF 106A0204 ..j..v·.vÞh.'.v..v.j..Å....á..v- 0001C0
9A006A0A 76FF0C76 FF271A68 F076FFF2 76FF116A 020468EA 76FFEC76 FFF476FF .v¶.vš.vōh..j..v·.vÞh.'.v..v.j.. 0001E0

Dump of file SATURN:[PCCOMMON.DUMP.DLL]DMLGLOB.TMP;1 on 18-APR-1990 10:44:56.67
File ID (627,22,0)   End of file block 315 / Allocated 316

Virtual block number 68 (00000044), 512 (0200) bytes

0C76FF27 1468F076 FFF276FF 126A5016 F8468D01 EAE90000 8818C483 00000606 .....á.j..Ōō..F%.Pj..v·.vÞh.'.v. 000000
76FF0006 E9FE468B 00F7E903 75FA460B F8468B12 C4830000 063C9A00 6A0A76FF .v.j..<....á..F%.F"u.Ō%..FzŌ■..v 000020
00000667 9A006AF8 76FFFA76 FF272368 F076FFF2 76FFEA76 FFEC76FF F476FFF6 -.v¶.vš.vō.v·.vÞh#'.v".v%j..g... 000040
76FF2724 68F076FF F276FFEA 76FFEC76 FFF476FF F676FF01 8EE90000 8814C483 .á.j..Ō...v-.v¶.vš.vō.v·.vÞh$'.v 000060
68F076FF F276FF50 16E2468D 0163E900 008814C4 83000006 889A006A F876FFFA ".v%j.......á.j..Ōc..Fä.P.v·.vÞh 000080
46880008 E9037400 EE7E83EE 468910C4 83000006 E49A006A 0A76FF0C 76FF27E9 Ō'.v..v.j..Ō....á..FŸ.-Ÿ.t.Ō...F 0000A0
00000757 9AF476FF F676FFEA 76FFEC76 FF028668 0063E900 03E90374 E4460BE2 ä.Fōt.Ō..Ōc.h...vš.vŌ.v-.v¶.W... 0000C0
76FFFA76 FF272868 F076FFF2 76FFE276 FFE476FF EA76FFEC 76FFF476 FFF676FF .v-.v¶.vš.vō.vŌ.vä.v·.vÞh('.v".v 0000E0
7500103D FF22E903 75000E3D 0018E900 E6E90000 8818C483 00000729 9A006AF8 %j..)....á.j..Ōl.Ō..=..u.Ō".=..u 000100
271868F0 76FFF276 FFFE76FF 5016E646 800000E9 FF68E903 75001130 FF45E903 .ŌE.=..u.Ōh.Ō...Fl.P.vz.v·.vÞh.' 000120
96E90000 880006E9 0374E846 08E6468B 12C48300 0003C09A 006A0A76 FF0C76FF .v..v.j..ë....á..Fl.Fōt.Ō..j..Ō. 000140
8468004C E9000007 6E9AF476 FFF676FF EA76FFEC 76FF0294 680048E9 FE468800 ..FzŌH.h...vš.vō.v-.v¶.n...ŌL.h. 000160
76FFEA76 FFEC76FF 02866800 35E90000 FFFF9AF4 76FFF676 FFEA76FF EC76FF02 ..vš.vō.v-.v¶.....Ō5.h...vš.vŌ.v 000180
3DFFBFE9 03750010 3DFFB0E9 0375000F 300018E9 001EE900 0005389A F476FFF6 -.v¶.;...Ō..Ō..=..u.Ō¯.=..u.Ō€.= 0001A0
76FFF276 FF006A02 0468EA76 FFEC76FF F476FFF6 76FF0000 E9FFCEE9 03750011 ..u.Ōö.Ō...v-.v¶.vš.vōh..j..v·.v 0001C0
000008C8 C8C95F5E 1F0000E9 18C48300 0005629A 006AE676 FFE876FF 271A68F0 Þh.'.vŌ.vlj..b....á.Ō...^_èùà... 0001E0
```

Dump of file SATURN:[PCCOMMON.DUMP.DLL]DMLGLOB.TMP;1 on 18-APR-1990 10:44:56.67
File ID (627,22,0)   End of file block 315 / Allocated 316

Virtual block number 69 (00000045), 512 (0200) bytes

```
0E4683FA 5689F846 89FE578B 26FC478B 260E5EC4 040E4683 D88E04C3 8B1E5657 WV.¡Ú..Ä.F..á^.&.G=&.Wz.F%.V°.F. 000000
FFFA76FF 126AFC76 FFFE76FF 076AFE56 89FC4689 FE578B26 FC478B26 0E5EC404 .á^.&.G=&.Wz.F=.Vzj..vz.v=j..v°. 000020
0008C8CB C95F5E1F 0000E914 C4830000 07CD9A00 6A0A76FF 0C76FF27 1868F876 v%h.'.v..v.j..é....á.Ö...^_èùà.. 000040
4683FA56 89F84689 FE578B26 FC478B26 0E5EC404 0E46830B 8E07E48B 1E565700 .WV.¡Ö..Ä.F..á^.&.G=&.Wz.F%.V°.F 000060
FA76FF12 6AFC76FF FE76FF07 6AFE5689 FC4689FE 578B26FC 478B260E 5EC4040E ..á^.&.G=&.Wz.F=.Vzj..vz.v=j..v° 000080
12C8C8C9 5F5E1F00 00E914C4 83000008 2E9A006A 0A76FF0C 76FF2719 68F876FF .v%h.'.v..v.j.......á.Ö...^_èùà. 0000A0
83F85689 F64689FE 578B26FC 478B260E 5EC4040E 46830B8E 0845B81E 56570000 ..WV.¡É..Ä.F..á^.&.G=&.Wz.F=.V%. 0000C0
89FE478B 260E5EC4 020E4683 F25689F0 4689FE57 8B26FC47 8B260E5E C4040E46 F..á^.&.G=&.Wz.FÞ.V·.F..á^.&.Gz. 0000E0
89FE578B 26FC478B 260E5EC4 040E4683 F44689FE 478B260E 5EC4020E 4683EE46 FŸ.F..á^.&.Gz.F¶.F..á^.&.G=&.Wz. 000100
020468F0 76FFF276 FF5016FA 468DFA46 89EE468B 0007C626 F05EC4FE 5689FC46 F=.Vzá^Þ&ó...FŸ.F°.F°.P.v·.vÞh.. 000120
76FFFE76 FF18C483 0000088F 9A006A0A 76FF0C76 FF271A68 F676FFF8 76FF006A j..v%.v-h.'.v..v.j.......á..vz.v 000140
E900008B FA4689EE 46886F07 C626F05E C40000FF FF9AF076 FFF276FF F476FFFC =.v¶.v·.vÞ.....á^Þ&ó.o.FŸ.F°¡..Ö 000160
8B26FC47 8B260E5E C4040E46 83088E08 A6881E56 57000068 C8C8C95F 5E1F0000 ...^_èùàh..WV.¡Ï..Ä.F..á^.&.G=&. 000180
478B260E 5EC4040E 4683F246 89FE478B 260E5EC4 020E4683 F05689EE 4689FE57 Wz.FŸ.VÞ.F..á^.&.Gz.F·.F..á^.&.G 0001A0
F65689F4 4689FE57 8B26FC47 8B260E5E C4040E46 839A5689 9846B9FE 578B26FC =&.Wz.F..V..F..á^.&.G=&.Wz.F¶.V- 0001C0
FFF076FF 106A5016 F8468DFE 5689FC46 89FE578B 26FC478B 260E5EC4 040E4683 .F..á^.&.G=&.Wz.F=.Vz.F%.Pj..vÞ. 0001E0
```

Dump of file SATURN:[PCCOMMON.DUMP.DLL]DMLGLOB.TMP;1 on 18-APR-1990 10:44:56.67
File ID (627,22,0)   End of file block 315 / Allocated 316

Virtual block number 70 (00000046), 512 (0200) bytes

```
06E90375 00EC7E83 EC468912 C4830000 0A319A00 6A0A76FF 0C76FF27 1468EE76 vŸh.'.v..v.j..1....á..F&.-&.u.Ö. 000000
FF076A50 169C468D 0135E9EC 46880006 E90374FA 4608F846 880146E9 EC468800 ..F&Öf..F%.F°t.Ö...F&Ö5..F..Pj.. 000020
7500EC7E 83EC4689 12C48300 000A779A 006AF876 FFFA76FF 271268EE 76FFF076 vÞ.vŸh.'.v°.v%j..w....á..F&.-&.u 000040
FFF476FF F676FF50 169C468D 00000AD2 9A50169C 468D0103 E9EC468B 0006E903 .Ö...F&Ö...F..P.@....F..P.v-.v¶. 000060
468918C4 8300000A 839A006A 0A76FF0C 76FF27FB 68EE76FF F076FF98 76FF9A76 v..v..vÞ.vŸh«'.v..v.j..°....á..F 000080
6A50169C 468D0000 FFFF9A50 169C468D 008DE9EC 46880006 E9037500 EC7E83EC &.-&.u.Ö...F&Ö§..F..P......F..Pj 0000A0
EC7E83EC 468912C4 83000009 349A006A F876FFFA 76FF2717 68EE76FF F076FF07 ..vÞ.vŸh.'.v°.v%j..4....á..F&.-& 0000C0
76FFF076 FF5016E8 468D0000 FFFF9A50 169C468D 0081E9EC 46880006 E9037500 .u.Ö...F&Ö...F..P......FÖ.P.vÞ.v 0000E0
0006E903 7500EC7E 83EC4689 10C48300 0009EE9A 006A9876 FF9A76FF 271E68EE Ÿh.'.v..v.j..Ÿ....á..F&.-&.u.Ö.. 000100
F076FFEB 76FFEA76 FF9876FF 9A76FFF4 76FFF676 FF50169C 468D0047 E9EC4688 .F&ÖG..F..P.v-.v¶.v..v..vö.vÖ.vÞ 000120
06E90375 00EC7E83 EC46891C C4830000 04079A00 6A596AFC 76FFFE76 FFEE76FF .vŸ.vz.v=jŸj.......á..F&.-&.u.Ö. 000140
46830B8E 096FB 'E 56570000 0CC8C8C9 5F5E1F00 00E9EC46 880006E9 EC468800 ..F&Ö...F&Ö...^_èùà...WV.¡o..Ä.F 000160
4689FE47 8B260E5E C4020E46 83F85689 F64689FE 578B26FC 478B260E 5EC4040E ..á^.&.G=&.Wz.F=.V%.F..á^.&.Gz.F 000180
C4830000 08D49A00 6A0A76FF 0C76FF27 1468F676 FFF876FF 126A5016 FC468DFA °.F=.Pj..v%.v-h.'.v..v.j..&....á 0001A0
FC76FFFE 76FF076A 003FE903 75FE4608 FC468800 4AE90374 00F47E83 F4468912 ..F¶.-¶.t.ÖJ..F=.Fzu.Ö?.j..vz.v= 0001C0
76FFF446 8914C483 00000AE0 9A006A0A 76FF0C76 FF27196B F676FFF8 76FF126A j..v%.v-h.'.v..v.j..Ù....á..F¶.v 0001E0
```

Dump of file SATURN:[PCCOMMON.DUMP.DLL]DMLGLOB.TMP;1 on 18-APR-1990 10:44:56.67
File ID (627,22,0)   End of file block 315 / Allocated 316

Virtual block number 71 (00000047), 512 (0200) bytes

```
F676FFF8 76FFFA76 FFF44689 0AC48300 00FFFF9A 006AFC76 FFFE76FF F676FFF8 %.v-.vz.v=j.......á..F¶.v°.v%.v- 000000
00E9F446 88F44689 12C48300 00FFFF9A 006A0676 FF0876FF 0A76FF0C 76FF026A j..v..v..v..v.j.......á..F¶.F¶Ö. 000020
578B26FC 478B260E 5EC4040E 46830B8E 085A881E 56570000 10C8C8C9 5F5E1F00 ..^_èùà...WV.¡Z..Ä.F..á^.&.G=&.W 000040
020E4683 F25689F0 4689FE57 8B26FC47 8B260E5E C4040E46 83F85689 F64689FE z.F=.V%.F..á^.&.G=&.Wz.FÞ.V·.F.. 000060
8E0C2E88 1E565700 0010C8C8 C95F5E1F 0000E900 008BFA46 89FE478B 260E5EC4 á^.&.Gz.F°¡..Ö...^_èùà...WV.¡... 000080
478B260E 5EC402Ue 4683F456 89F24689 FE578B26 FC478B26 0E5EC404 0E46830B Ä.F..á^.&.G=&.Wz.F·.V¶.F..á^.&.G 0000A0
0007C726 F85EC4FA 5689F846 89FE578B 26FC478B 260E5EC4 040E4683 F64689FE z.F-.F..á^.&.G=&.Wz.F%.V°á^%&ú.. 0000C0
271468F2 76FFF476 FF126A50 16FC468D 006AE9F6 4688FC46 89FE4689 00008800 .¡...Fz.F=.F-Öj..F=.Pj..v¶.v·h.' 0000E0
5EC4000E E90375FE 4608FC46 88F04689 12C48300 00089A9A 006A0A76 FF0C76FF .v..v.j.......á..FÞ.F=.Fzu.Ö..á^ 000100
76FF2812 68F276FF F476FFF6 76FFF876 FFFA76FF 0049E900 00880001 07C726F8 %&ú...¡..Öl..v°.v%.v-.v¶.v·h.(.v 000120
E9037500 0E30001B E9001EE9 16C48300 000C119A 006A0676 FF0876FF 0A76FF0C ..v..v..v.j.......á.Ö..Ö..=..u.Ö 000140
56570000 00C8C8C9 5F5E1FFF B7E9FF7E E9037700 1130FFC2 E9037300 1030FF8E ..=..s.Öó.=..w.Ö-.Öñ..^_èùà...WV 000160
D88E0062 8B1E5657 000002C8 C8C95F5E 1F0000E9 08568806 4688D88E 0C7D881E .¡)..Ä.F..V.Ö...^_èùà...WV.¡b..Ä 000180
830000FF FF9A006A 366A026A 006A006A 006A030C 681E016A 316AFFFF 68FFFF68 h..h..j1j..h..j.j.j.j.jój....... 0001A0
0008094B 0203005E 00050CE9 0203000C C8C95F5E 1F0000E9 FE4688FE 468918C4 á..Fz.FzÖ...^_èù....Ö...^...K... 0001C0
00080A96 0203005A 000A0084 00050256 00080A50 02030068 0005002D 02030246 F...-...k...P...V.......Z....... 0001E0
```

```
Dump of file SATURN:[PCCOMMON.DUMP.DLL]DMLGLOB.TMP;1 on 18-APR-1990 10:44:56.67
File ID (627,22,0)   End of file block 315 / Allocated 316

Virtual block number 72 (00000048), 512 (0200) bytes

 002E007C 0002008F 000508ED 02030000 000A0081 0002007E 00050B2E 02030264 d.......-...........Ü.......|... 000000
 00000000 00000000 00000000 0000023C 00080785 02030038 00050098 02030000 ........8.......<............... 000020
 56890E46 89FE5788 26FC4788 260E5EC4 040E4683 D88EFFFF 881E5657 000086C8 å...WV.|...Å.F..ô^.&.G=&.W±.F8.V 000040
 4788260E 5EC4040E 4683F256 89F04689 FE578826 FC478826 0E5EC404 0E4683E0 Å.F..ô^.&.G=&.W±.FÞ.V·.F..ô^.&.G 000060
 D85689D6 4689FE57 8826FC47 88260E5E C4040E46 83CE5689 CC4689FE 578826FC =&.W±.Fä.Vö.F..ô^.&.G=&.W±.Fø.VÃ 000080
 FC478826 0E5EC404 0E4683FE 5689FC46 89FE5788 26FC4788 260E5EC4 040E4683 .F..ô^.&.G=&.W±.F=.V±.F..ô^.&.G= 0000A0
 260E5EC4 040E4683 EA4689FE 4788260E 5EC4020E 4683F656 89F44689 FE578826 &.W±.F¶.V-.F..ô^.&.G±.Fõ.F..ô^.& 0000C0
 19E90374 E4460BE2 46880224 E9037500 EA7E83E4 5689E246 89FE5788 26FC4788 .G=&.W±.Fã.Vô.-ð.u.Ô$..Fã.Fôt.Ô. 0000E0
 FFE076FF F076FFF2 76FF006A 006A096A 006A006A 0039E903 74F64608 F4468802 ..F¶.F-t.Ö9.j.j.j.j.j..v·.vÞ.vÅ. 000100
 880006E9 03750000 7E83D046 891AC483 0000023A 9A006A48 6A5016F4 46800E76 v8.F¶.PjHj..:.....ô..FÅ.-Å.u.Ö... 000120
 014F9A00 6AF476FF F676FF27 E868DE76 FFE076FF 5016F846 8D096A03 81E90046 FÅÖÝ.j..F½.P.vÅ.v8hÒ'.v-.v¶j..O. 000140
 E076FF50 16FF7A86 80037FE9 D0468800 06E90375 00007E83 D0468912 C4830000 ...ô..FÅ.-Å.u.Ö...FÅÖ....z..P.vÅ 000160
 E9037500 D07E8300 468910C4 83000001 939A006A F076FFF2 76FF27E9 680E76FF .v8hÒ'.v·.vÞj.......ô..FÅ.-Å.u.Ö 000180
 7AB6FFFF 7CB6FF50 16FF7E86 800123E9 0374FE46 08FC4688 034EE900 46880006 ...FÅÖN..F=.F±t.ÖN...-..P.Ñ|..Ñz 0001A0
 D07E8300 468914C4 83000001 C59A006A F876FFFA 76FF4404 680E76FF E076FFFF ..vÅ.v8h.D.v².v½j..é....ô..FÅ.-Å 0001C0
 B6FFFF7C B6FF271E 680E76FF E076FF50 16024680 030AE900 46880006 E9037500 .u.Ö...FÅÖ...F@.P.vÅ.v8h.'.Ñ|..Ñ 0001E0

Dump of file SATURN:[PCCOMMON.DUMP.DLL]DMLGLOB.TMP;1 on 18-APR-1990 10:44:56.67
File ID (627,22,0)   End of file block 315 / Allocated 316

Virtual block number 73 (00000049), 512 (0200) bytes

 468D02D8 E9D04688 0006E903 7500007E 83D04689 10C48300 0001FD9A 006AFF7A z.j..»....ô..FÅ.-Å.u.Ö...FÅÖÅ..F 000000
 00027A9A 006A0276 FFD476FF 2722680E 76FFE076 FF056A50 16FF7E86 805016EC &.P..-..Pj..vÅ.v8h"'.vå.v@j..z.. 000020
 8680056A EC76FFEE 76FF02A0 E9D04688 0006E903 7500007E 83D04689 16C48300 ..ô..FÅ.-Å.u.Ö...FÅÖ...vŸ.v$j... 000040
 C4830000 FFFF9A00 6A486A50 16FC4680 DE76FFE0 76FFF076 FFF276FF 5016FF7E -..P.v·.vÞ.vÅ.v8.F=.PjHj.......ô 000060
 76FFFA76 FFFF7AB6 FFFF7CB6 FF0263E9 D0468800 06E90375 00007E83 D046891A ..FÅ.-Å.u.Ö...FÅÖc..Ñ|..Ñz..v².v 000080
 C4830000 02C19A00 6AFC76FF FE76FF27 E868DE76 FFE076FF 5016EC46 80056AF8 ½j..F$.P.vÅ.v8hÒ'.v±.v=j..è....ô 0000A0
 16EC468D 5016FF7E 868D0044 E90223E9 D0468800 06E90375 00007E83 D046891A ..FÅ.-Å.u.Ö...FÅÖ#.ÖD...-..P.F$. 0000C0
 006AFC76 FFFE76FF 2801680E 76FFE076 FFF876FF FA76FFFF 7AB6FFFF 7CB6FF50 P.Ñ|..Ñz..v².v½.vÅ.v8h.(.v±.v=j. 0000E0
 CC76FFCE 76FF01DC E9D04688 0006E903 7500007E 83D04689 1CC48300 0002F49A .¶....ô..FÅ.-Å.u.Ö...FÅÖÉ..vö.vä 000100
 7E83D046 8912C483 00000327 9A006A0A 76FF0C76 FF27D868 DE76FFE0 76FF0E6A j..vÅ.v8hÄ'.v..v.j..'....ô..FÅ.- 000120
 76FF27D8 680E76FF E076FF0F 6AD676FF 0876FF01 A9E9D046 880006E9 03750000 Å.u.Ö...FÅÖ`..vÅ.v=j..vÅ.v8hÄ'.v 000140
 0176E900 46880006 E9037500 D07E8300 468912C4 83000003 5A9A006A 0A76FF0C ..v.j..Z....ô..FÅ.-Å.u.Ö...FÅÖv. 000160
 C4830000 03809A00 6A0A76FF 0C76FF27 D8680E76 FFE076FF 106AFC76 FFFE76FF .v±.v=j..vÅ.v8hÄ'.v..v.j.......ô 000180
 76FFE076 FF116AF4 76FFF676 FF0143E9 D0468800 06E90375 00007E83 D0468912 ..FÅ.-Å.u.Ö...FÅÖC..v-.v¶j..vÅ.v 0001A0
 0006E903 7500007E 83D04689 12C48300 00FFFF9A 006A0A76 FF0C76FF 27D8680E 8hÄ'.v..v.j.......ô..FÅ.-Å.u.Ö.. 0001C0
 76FFE076 FF126AE2 76FFE476 FF076A00 29E90375 E4460BE2 46880110 E9D04688 .FÅÖ...Fã.FÖu.Ö).j..vÕ.vãj..vÅ.v 0001E0

Dump of file SATURN:[PCCOMMON.DUMP.DLL]DMLGLOB.TMP;1 on 18-APR-1990 10:44:56.67
File ID (627,22,0)   End of file block 315 / Allocated 316

Virtual block number 74 (0000004A), 512 (0200) bytes

 037500EA 7E8300  E9D04689 14C48300 0004649A 006A0A76 FF0C76FF 2718680E 8h.'.v..v.j..d....ô..FÅÖ@..-ð.u. 000000
 E24680DE 76FFE076 FFEC76FF EE76FF50 16FF7E86 8D376A0A 76FF0C76 FF00CDE9 Öe..v..v.j7..-..P.vŸ.v$.vÅ.vÑ.Fã 000020
 0096E900 46880006 E9037500 D07E8300 46891AC4 83000000 EC9A006A 666A5016 .Pjfj..$....ô..FÅ.-Å.u.Ö...FÅÖ.. 000040
 16E64680 0074E903 750C4608 DA468800 00CA46C7 DC5689DA 4689CE56 88CC4688 .Fä.Vö.FÖ.VÉúFÒ...FÖ.FÉu.Öt..F|. 000060
 76FFDC76 FF280368 DE76FFE0 76FFEC76 FFEE76FF E276FFE4 76FF5016 CA468D50 P.FÒ.P.vÖ.vã.vŸ.v$.vÅ.v8h.(.vÉ.v 000080
 0A468000 39E9D046 880006E9 03750000 7E83D046 891CC483 00000494 9A006ADA Öj.......ô..FÅ.-Å.u.Ö...FÅÖ9..FÖ 0000A0
 7E83D046 8910C483 0000011E 9A006ADA 76FFDC76 FF27DA68 DE76FFE0 76FF5016 .P.vÅ.v8hÖ'.vÉ.vÖj.......ô..FÅ.- 0000C0
 5700001E C8C8C95F 5E1F0000 E9D04688 FF81E900 09E9D046 880006E9 03750000 Å.u.Ö...FÅÖ..Ö...FÅÖ...^_èùå...W 0000E0
 020E4683 F25689F0 4689FE57 8826FC47 88260E5E C4040E46 83088E00 08881E56 V.|...Å.F..ô^.&.G=&.W±.FÞ.V·.F.. 000100
 260E5EC4 040E4683 FC4689FE 4788260E 5EC4020E 4683FE46 89FE4788 260E5EC4 ô^.&.G±.F±.F..ô^.&.G±.F=.F..ô^.& 000120
 89F44689 FE578826 FC478826 0E5EC404 0E4683EC 5689EA46 89FE5788 26FC4788 .G=&.W±.FÕ.V$.F..ô^.&.G=&.W±.F¶. 000140
 FF000006 8C9AF476 FFF676FF EA76FFEC 76FF0268 6800C2E9 037400FE 7E83F656 V-.-±.t.Öö.hk..v$.võ.v-.v¶.V.... 000160
 6A0A76FF 0C76FF27 1A68F076 FFF276FF 0E6A0204 68EA76FF EC76FFF4 76FFF676 v-.v¶.v$.võh..j..v·.vÞh.'.v..v.j 000180
 F076FFF2 76FF0F6A 020468EA 76FFEC76 FFF476FF F676FF18 C4830000 058C9A00 ........ô..v-.v¶.v$.võh..j..v·.vÞ 0001A0
 68EA76FF EC76FFF4 76FFF676 FF18C483 000005B6 9A006A0A 76FF0C76 FF271A68 h.'.v..v.j..Ñ....ô..v-.v¶.v$.võh 0001C0
 F676FF18 C4830000 05E09A00 6A0A76FF 0C76FF27 1A68F076 FFF276FF 106A0204 ..j..v·.vÞh.'.v..v.j..Å....ô..v- 0001E0
```

Dump of file SATURN:[PCCOMMON.DUMP.DLL]DMLGLOB.TMP;1 on 18-APR-1990 10:44:56.67
File ID (627,22,0)   End of file block 315 / Allocated 316

Virtual block number 75 (0000004B), 512 (0200) bytes

9A006A0A 76FF0C76 FF271A68 F076FFF2 76FF116A 020468EA 76FFEC76 FFF476FF .v¶.v$.võh..j..v·.vÞh.'.v..v.j.. 000000
0C76FF27 1468F076 FFF276FF 126A5016 F8468D01 EAE90000 8818C483 00000606 .....á.¡..Õõ..F%.Pj..v·.vÞh.'.v. 000020
76FF0006 E9FE4688 00F7E903 75FA4608 F8468812 C4830000 063C9A00 6A0A76FF .v.j..<....á..F%.Fªu.Õ%..F±Õ•..v 000040
00000667 9A00.AF8 76FFFA76 FF272368 F076FFF2 76FFEA76 FFEC76FF F476FFF6 -.v¶.v$.võ.v·.vÞh#'.vª.v%j..g... 000060
76FF2724 68F076FF F276FFEA 76FFEC76 FFF476FF F676FF01 8EE90000 8814C483 .á.¡..Õ...v-.v¶.v$.võ.v·.vÞh$'.v 000080
68F076FF F276FF50 16E24680 0163E900 008814C4 83000006 8B9A006A "976FFFA •.v%j.......á.¡..Õc..Fã.P.v·.vÞh 0000A0
46880008 E9037400 EE7E83EE 468910C4 83000006 E49A006A 0A76FF0C 7L F27E9 Õ'.v..v.j..Õ....á..FŸ.~Ÿ.t.Õ...F 0000C0
00000757 9AF476FF F676FFEA 76FFEC76 FF023068 0063E900 03E90374 E44.08E2 â.Fõt.Õ..Õc.h0..v$.võ.v-.v¶.W... 0000E0
76FFFA76 FF272868 F076FFF2 76FFE276 FFE476FF EA76FFEC 76FFF476 FFF676FF .v-.v¶.v$.võ.võ.vã.v·.vÞh('.vª.v 000100
75001030 FF22E903 75000E30 001BE900 E6E90000 8818C483 00000729 9A006AF8 %j..)....á.¡..Õl.Õ..=..u.Õ".=..u 000120
271B68F0 76FFF276 FFFE76FF 5016E646 8D0000E9 FF68E903 75001130 FF45E903 .ÕE.=..u.Õh.Õ...F|.P.v±.v·.vÞh.' 000140
96E90000 8B0006E9 0374E846 08E64688 12C48300 0003CD9A 006A0A76 FF0C76FF .v..v.j..ë....á..F|.Fõt.Õ..¡..Õ. 000160
8468004C E9000007 6E9AF476 FFF676FF EA76FFEC 76FF0294 68004BE9 FE468800 ..F±ÕH.h...v$.võ.v-.v¶.n...ÕL.h. 000180
76FFEA76 FFEC76FF 02306800 35E90000 FFFF9AF4 76FFF676 FFEA76FF EC76FF02 ..v$.võ.v-.v¶.....Õ5.h0..v$.võ.v 0001A0
3DFFBFE9 03750010 3DFF80E9 0375000F 30001BE9 001EE900 00053B9A F476FFF6 -.v¶.;...Õ..Õ..=..u.Õ¯.=..u.Õ¢.= 0001C0
76FFF276 FF006A02 0468EA76 FFEC76FF F476FFF6 76FF0000 E9FFCEE9 03750011 ..u.Õõ.Õ...v-.v¶.v$.võh..j..v·.v 0001E0

Dump of file SATURN:[PCCOMMON.DUMP.DLL]DMLGLOB.TMP;1 on 18-APR-1990 10:44:56.67
File ID (627,22,0)   End of file block 315 / Allocated 316

Virtual block number 76 (0000004C), 512 (0200) bytes

000008C8 CBC95F5E 1F0000E9 18C48300 0005629A 006AE676 FFE876FF 271A68F0 Þh.'.vÕ.v|j..b....á.Õ...^_èùà... 000000
0E4683FA 5689F846 89FE5788 26FC4788 260E5EC4 040E4683 D88E04C3 881E5657 WV.¡ù..Ä.F..á^.&.G•&.W±.F%.Vª.F. 000020
FFFA76FF 126AFC76 FFFE76FF 076AFE56 89FC4689 FE578826 FC478826 0E5EC404 .á^.&.G•&.W±.F•.V±j..v±.v•j..vª. 000040
0008C8C8 C95F5E1F 0000E914 C4830000 07CD9A00 6A0A76FF 0C76FF27 1868F876 v%h.'.v..v.j..ë....á.Õ...^_èùà.. 000060
4683FA56 89F84689 FE578826 FC478826 0E5EC404 0E46830B 8E07E488 1E565700 .WV.¡Õ..Ä.F..á^.&.G•&.W±.F%.Vª.F 000080
FA76FF12 6AFC76FF FE76FF07 6AFE5689 FC4689FE 578826FC 4788260E 5EC4040E ..á^.&.G•&.W±.F•.V±j..v±.v•j..vª 0000A0
12C8CBC9 5F5E1F00 00E914C4 83000008 2E9A006A 0A76FF0C 76FF2719 68F876FF .v%h.'.v..v.j.......á.Õ...^_èùà. 0000C0
83F85689 F64689FE 578826FC 4788260E 5EC4040E 4683D88E 0845881E 56570000 ..WV.¡E..Ä.F..á^.&.G•&.W±.F¯.V%. 0000E0
89FE4788 260E5EC4 020E4683 F25689F0 4689FE57 8826FC47 88260E5E C4040E46 F..á^.&.G•&.W±.FÞ.V·.F..á^.&.G±. 000100
89FE5788 26FC4788 260E5EC4 040E4683 F44689FE 4788260E 5EC4020E 4683EE46 FŸ.F..á^.&.G±.F¶.F..á^.&.G•&.W±. 000120
020468F0 76FFF276 FF5016FA 4680FA46 89EE4688 0007C626 F05EC4FE 5689FC46 F•.V±á^Þ&ó...FŸ.Fª.Fª.P.v·.vÞh.. 000140
76FFFE76 FF18C483 0000088F 9A006A0A 76FF0C76 FF271A68 F676FFF8 76FF006A j..v%.v-h.'.v..v.j.......á..v±.v 000160
26F05EC4 FA4689EE 46880007 C626F05E C40000FF FF9AF076 FFF276FF F476FFFC •.v¶.v·.vÞ.....á^Þ&ó...FŸ.Fªá^Þ& 000180
D88E08A6 881E5657 00006EC8 CBC95F5E 1F0000E9 0000B8FA 4689EE46 880007C6 ó...FŸ.Fª¡..Õ...^_èùàn..WV.¡|..Ä 0001A0
FE478826 0E5EC402 0E4683EC 5689EA46 89FE5788 26FC4788 260E5EC4 040E4683 .F..á^.&.G•&.W±.FÕ.V$.F..á^.&.G± 0001C0
260E5EC4 040E4683 94568992 4689FE57 8826FC47 88260E5E C4040E46 83EE4689 .FŸ.F..á^.&.G•&.W±.F..V..F..á^.& 0001E0

Dump of file SATURN:[PCCOMMON.DUMP.DLL]DMLGLOB.TMP;1 on 18-APR-1990 10:44:56.67
File ID (627,22,0)   End of file block 315 / Allocated 316

Virtual block number 77 (0000004D), 512 (0200) bytes

89FC4689 FE578826 FC478826 0E5EC404 0E4683F6 5689F446 89FE5788 26FC4788 .G•&.W±.F¶.V-.F..á^.&.G•&.W±.F•. 000000
8300000A 3E9A006A 0A76FF0C 76FF2714 68EA76FF EC76FF10 6A5016F8 4680FE56 V±.F%.Pj..v$.võh.'.v..v.j..>.... 000020
8B0006E9 0374FA46 08F84688 0146E9E6 46880006 E9037500 E67E83E6 468912C4 á..F|.-|.u.Õ...F|ÕF..F%.Fªt.Õ... 000040
0A849A00 6AF876FF FA76FF27 1268EA76 FFEC76FF 076A5016 96468001 35E9E646 F|ÕS..F..Pj..v$.võh.'.vª.v%j.... 000060
00FFFF9A 50169646 8D0103E9 E6468800 06E90375 00E67E83 E6468912 C4830000 ...á..F|.-|.u.Õ...F|Õ...F..P.... 000080
76FF0C76 FF27FB68 EA76FFEC 76FFF476 FFF676FF 9276FF94 76FF5016 96468D00 ..F..P.v..v..v-.v¶.v$.võh«'.v..v 0000A0
96468000 8DE9E646 8B0006E9 037500E6 7E83E646 8918C483 00000AC0 9A006A0A .j..à....á..F|.-|.u.Õ...F|Õ$..F. 0000C0
9A006AF8 76FFFA76 FF271768 EA76FFEC 76FF076A 50169646 8D0000FF FF9A5016 .P......F..P|..v$.võh.'.vª.v%j.. 0000E0
5D9A5016 96468D00 81E9E646 8B0006E9 037500E6 7E83E646 8912C483 00000934 4....á..F|.-|.u.Õ...F|Õ...F..P.] 000100
C4830000 09F89A00 6A9276FF 9476FF27 1E68EA76 FFEC76FF 5016E246 8D00000A ....Fã.P.v$.võh.'.v..v.j..«....á 000120
76FF9276 FF9476FF 50169646 8D0047E9 E6468800 06E90375 00E67E83 E6468910 ..F|.-|.u.Õ...F|ÕG..F..P.v..v..v 000140
83000004 079A006A 596AFC76 FFFE76FF EA76FFEC 76FFE276 FFE476FF F476FFF6 -.v¶.võ.vã.v$.võ.v±.v•jYj....... 000160
C8CBC95F 5E1F0000 E9E64688 0006E9E6 46880006 E9037500 E67E83E6 46891CC4 á..F|.-|.u.Õ...F|Õ...F|Õ...^_èùà 000180
F85689F6 4689FE57 8826FC47 88260E5E C4040E46 83D88E09 7CB81E56 5700000C ...WV.¡|..Ä.F..á^.&.G•&.W±.F¯.V% 0001A0
76FF2714 68F676FF F876FF12 6A5016FC 4680FA46 89FE4788 260E5EC4 020E4683 .F..á^.&.G±.Fª.F•.Pj..v%.v-h.'.v 0001C0
FE4608FC 4688004A E9037400 F47E83F4 468912C4 83000008 E19A006A 0A76FF0C ..v.j..Ä....á..F¶.-¶.t.ÕJ..F•.F± 0001E0

```
Dump of file SATURN:[PCCOMMON.DUMP.DLL]DMLGLOB.TMP;1 on 18-APR-1990 10:44:56.67
File ID (627,22,0)   End of file block 315 / Allocated 316

Virtual block number 78 (0000004E), 512 (0200) bytes

 006A0A76 FF0C76FF 271968F6 76FFF876 FF126AFC 76FFFE76 FF076A00 3FE90375 u.Ō7.j..v±.v•j..v½.v-h.'.v..v.j. 000000
 C4830000 FFFF9A00 6AFC76FF FE76FFF6 76FFF876 FFF44689 14C48300 000AFA9A .•....ó..F¶.v½.v-.v±.v•j.......ó 000020
 FFFF9A00 6A0676FF 0876FF0A 76FF0C76 FF026AF6 76FFF876 FFFA76FF F446890A ..F¶.v•.v½.v-j..v..v..v..v.j.... 000040
 83D88E08 67881E56 57000010 C8C8C95F 5E1F0000 E9F44688 F4468912 C4830000 ...ó..F¶.F¶Ō...^_èùà...WV.¡g..Ä. 000060
 26FC4788 260E5EC4 040E4683 F85689F6 4689FE57 8826FC47 88260E5E C4040E46 F..ó^.&.G•&.W±.F-.V½.F..ó^.&.G•& 000080
 5F5E1F00 00E90000 88FA4689 FE478826 0E5EC402 0E4683F2 5689F046 89FE5788 .W±.FÞ.V·.F..ó^.&.G±.F•¡..Ō...^_ 0000A0
 F24689FE 578826FC 4788260E 5EC4040E 4683088E 0C38881E 56570000 10C8C8C9 èùà...WV.¡;..Ä.F..ó^.&.G•&.W±.F- 0000C0
 FE578826 FC478826 0E5EC404 0E4683F6 4689FE47 88260E5E C4020E46 83F45689 .V¶.F..ó^.&.G±.F-.F..ó^.&.G•&.W± 0000E0
 FC468000 6AE9F646 88FC4689 FE468900 00880000 07C726F8 5EC4FA56 89F84689 .F½.V•ó^Y&ú...¡...F±.F•.F-Ōj..F• 000100
 F0468912 C4830000 08A79A00 6A0A76FF 0C76FF27 1468F276 FFF476FF 126A5016 .Pj..v¶.v·h.'.v..v.j..Ï....ó..FÞ 000120
 FFF876FF FA76FF00 49E90000 88000107 C726F85E C4000EE9 0375FE46 08FC4688 .F•.F±u.Ō..ó^Y&ú...¡..Ōl..v•.v½. 000140
 C4830000 0C1E9A00 6A0676FF 0876FF0A 76FF0C76 FF281268 F276FFF4 76FFF676 v-.v¶.v·h.(.v..v..v..v.j.......ó 000160
 E9FF7EE9 03770011 30FFC2E9 03730010 30FF8EE9 0375000E 30001BE9 001EE916 .Ō..Ō..=..u.Ō..=..s.Ōö.=..w.Ō-.Ō 000180
 C95F5E1F 0000E908 56880646 88D88E0C 8A881E56 57000000 C8C8C95F 5E1FFFB7 ñ..^_èùà...WV.¡...Ä.F..V.Ō...^_è 0001A0
 6A006A00 6A034868 1E016A31 6AFFFF68 FFFF6808 8E006F88 1E565700 0002C8C8 ùà...WV.¡ò..Äh..h..j1j..hH.j.j-j 0001C0
 000C90CB C95F5E1F 0000E9FE 4688FE46 8918C483 0000FFFF 9A006A37 6A026A00 .j.j7j.......ó..F±.F±Ō...^_èù... 0001E0

Dump of file SATURN:[PCCOMMON.DUMP.DLL]DMLGLOB.TMP;1 on 18-APR-1^^0 10:44:56.67
File ID (627,22,0)   End of file block 315 / Allocated 316

Virtual block number 79 (0000004F), 512 (0200) bytes

 02560008 0ADF0203 00680005 003A0203 02460008 09480203 005E0005 0CF60203 ..-...^...K...F...:...k...Ō...V. 000000
 008F0005 08FA0203 00000008 008E0002 007E0005 08380203 02640008 0AA30203 ..È...d...;...-...........•..... 000020
 023C0008 07850203 00380005 00A80203 00670008 00910005 0000002E 00890002 .............g...-...8.......<. 000040
 5689F846 89FE5788 26FC4788 260E5EC4 040E4683 D88EFFFF 881E5657 000012C8 à...WV.¡...Ä.F..ó^.&.G•&.W±.F½.V 000060
 4788260E 5EC4020E 4683F456 89F24689 FE578826 FC478826 0E5EC404 0E4683FA •.F..ó^.&.G•&.W±.F·.V¶.F..ó^.&.G 000080
 578826FC 4788260E 5EC4040E 4683FC46 89FE4788 260E5EC4 020E4683 FE4689FE ±.F±.F..ó^.&.G±.F•.F..ó^.&.G•&.W 0000A0
 9A006A0A 76FF0C76 FF271768 F876FFFA 76FF0E6A 5016FC46 80F05689 EE4689FE ±.FŸ.VÞ.F•.Pj..v•.vŸh.'.v..v.j.. 0000C0
 6AEE76FF F076FF00 24E9F646 880006E9 037500F6 7E83F646 8912C483 00000083 •....ó..F-.--u.Ō...F-Ō$..vÞ.vŸj 0000E0
 5F5E1F00 00E912C4 830000FF FF9A006A 0A76FF0C 76FF27D8 68F876FF FA76FF0F ..v•.vŸhÄ'.v..v.j.......ó.Ō...^_ 000100
 F24689FE 578826FC 4788260E 5EC4040E 4683088E 0008881E 56570000 16C8C8C9 èùà...WV.¡...Ä.F..ó^.&.G•&.W±.F- 000120
 83FC4689 FE478826 0E5EC402 0E4683FE 4689FE47 88260E5E C4020E46 83F45689 .V¶.F..ó^.&.G±.F±.F..ó^.&.G±.F=. 000140
 26FC4788 260E5EC4 040E4683 F05689EE 4689FE57 8826FC47 88260E5E C4040E46 F..ó^.&.G•&.W±.FŸ.VÞ.F..ó^.&.G•& 000160
 76FFF876 FFEE76FF F076FF02 78680096 E9037400 FE7E83F8 5689F646 89FE5788 .W±.F-.V½.-±.t.Ō..hx..vÞ.vŸ.v½.v 000180
 271A68F2 76FFF476 FF0E6A02 0468EE76 FFF076FF F676FFF8 76FF0000 01809AF6 -......v½.v-.vÞ.vŸh..j..v¶.v·h.' 0001A0
 9AF676FF F876FFEE 76FFF076 FF024568 18C48300 0001A79A 006A0A76 FF0C76FF .v..v.j..Ï....ó.hE..vÞ.vŸ.v½.v-. 0001C0
 76FF271A 68F276FF F476FF0F 6A020468 EE76FFF0 76FFF676 FFF876FF 0000018E ƒ....v½.v-.vÞ.vŸh..j..v¶.v·h.'.v 0001E0

Dump of file SATURN:[PCCOMMON.DUMP.DLL]DMLGLOB.TMP;1 on 18-APR-1990 10:44:56.67
File ID (627,22,0)   End of file block 315 / Allocated 316

Virtual block number 80 (00000050), 512 (0200) bytes

 02029AF6 76FFF876 FFEE76FF F076FF02 716818C4 83000001 EB9A006A 0A76FF0C ..v.j..S....ó.hq..vÞ.vŸ.v½.v-... 000000
 68F276FF F476FFFE 76FF5016 FA468D00 38E90374 0EFE7E83 00A6E900 00880000 ..¡..Ōl..-±.t.Ō;..F•.P.v±.v¶.v·h 000020
 76FFF876 FFEE76FF F076FFFA 76FF12C4 83000002 269A006A 0A76FF0C 76FF2712 .'.v..v.j..&....ó..v•.vÞ.vŸ.v½.v 000040
 0C76FF27 1868F276 FFF476FF FE76FF50 16EA468D 0062E900 00880000 FFFF9AF6 -.....¡..Ōb..Fō.P.v±.v¶.v·h.'.v. 000060
 76FF0030 E9000088 0006E903 74EC4608 EA468812 C4830000 02619A00 6A0A76FF .v.j..•....ó..Fō.F$t.Ō..¡..ŌO..v 000080
 006AEA76 FFEC76FF 271A68F2 76FFF476 FF006A02 0468EE76 FFF076FF F676FFF8 ½.v-.vÞ.vŸh..j..v¶.v·h.'.v$.vōj. 0000A0
 83D88E00 CA881E56 57000012 C8C8C95F 5E1F0000 E9000088 18C48300 0000809A ......ó.¡..Ō...^_èùà...WV.¡ò..Ä. 0000C0
 26FC4788 260E5EC4 040E4683 F85689F6 4689FE57 8826FC47 88260E5E C4040E46 F..ó^.&.G•&.W±.F-.V½.F..ó^.&.G•& 0000E0
 88260E5E C4020E46 83EE4689 FE478826 0E5EC402 0E4683F2 5689F046 89FE5788 .W±.FÞ.V·.F..ó^.&.G±.FŸ.F..ó^.&. 000100
 07C626F0 5EC4FE56 89FC4689 FE578826 FC478826 0E5EC404 0E4683F4 4689FE47 G±.F¶.F..ó^.&.G•&.W±.F•.V±ó^Þ&ó. 000120
 271A68F6 76FFF876 FF006A02 0468F076 FFF276FF 5016FA46 80FA4689 EE468800 ..FŸ.F•.F•.P.v·.vÞh..j..v½.v-h.' 000140
 9AF076FF F276FFF4 76FFFC76 FFFE76FF 18C48300 0001699A 006A0A76 FF0C76FF .v..v.j..¡....ó..v±.v•.v¶.v·.vÞ. 000160
 000000C8 C8C95F5E 1F0000E9 000088FA 4689EE46 880007C6 26F05EC4 0000FFFF ....ó^Þ&ó...FŸ.F•¡..Ō...^_èùà... 000180
 0344881E 56570000 02C8C8C9 5F5E1F00 00E90856 88064688 D88E027B 881E5657 WV.¡(..Ä.F..V.Ō...^_èùà...-WV.¡D. 0001A0
 00FFFF9A 006A386A 026A006A 006A006A 0384681E 016A316A FFFF68FF FF68D88E .Äh..h..j1j..h..j.j-j.j.j8j..... 0001C0
 03200203 005E0005 03090203 0007C8C9 5F5E1F00 00E9FE46 88FE4689 18C48300 ..ó..F±.F±Ō...^_èù........^... . 0001E0
```

```
Dump of file SATURN:[PCCOMMON.DUMP.DLL]DMLGLOB.TMP;1 on 18-APR-1990 10:44:56.67
File ID (627,22,0)   End of file block 315 / Allocated 316

Virtual block number 81 (00000051), 512 (0200) bytes

 037D0203 033C000C 03660005 0000002E 035E0002 0000000C 03630002 02460008 ..F...c.......^.......f...<...). 000000
 040E4683 D88EFFFF B81E5657 00008AC8 00000000 023C0008 01420203 00380005 ..8...B...<.....å...WV.|...Ä.F.. 000020
 FE578826 FC473826 0E5EC404 0E4683E0 5689DE46 89FE5788 26FC4788 260E5EC4 å^.&.G=&.Wü.F8.VÅ.F..å^.&.G=&.Wü 000040
 C4040E46 83C85689 C64689FE 578826FC 4788260E 5EC4040E 4683F256 89F04689 .Fþ.V·.F..å^.&.G=&.Wü.Fó.Vå.F..å 000060
 89FE5788 26FC4788 260E5EC4 040E4683 D8568906 4689FE57 8826FC47 88260E5E ^.&.G=&.Wü.Fø.VÄ.F..å^.&.G=&.Wü. 000080
 5EC4040E 4683FA56 89F84689 FE578826 FC478826 0E5EC404 0E4683FE 5689FC46 F=.Vü.F..å^.&.G=&.Wü.F%.V°.F..å^ 0000A0
 0E4683EE 4689FE47 88260E5E C4020E46 83CE5689 CC4689FE 578826FC 4788260E .&.G=&.Wü.Fä.Vö.F..å^.&.Gü.FŸ.F. 0000C0
 4608E246 880224E9 037500EE 7E83E456 89E24689 FE578826 FC478826 0E5EC404 .å^.&.G=&.Wü.Fã.Vð.-Ÿ.u.Ö$..Fã.F 0000E0
 76FFF276 FF006A00 6A066A00 6A006A00 39E90374 CE4608CC 46880219 E90374E4 ðt.Ö...Fä.Föt.Ö9.j.j.j.j.j..v·.v 000100
 7500047E 83044689 1AC48300 00024F9A 006A486A 5016CC46 80DE76FF E076FFF0 Þ.vÅ.v8.Fä.PjHj..O....å..Få.-å.u 000120
 CC76FFCE 76FF27E8 680E76FF E076FF50 16F4468D 066A0425 E9044688 0006E903 .Ö...FåÖX.j..F¶.P.vÅ.v8hÖ'.vö.vä 000140
 FF76868D 03F3E904 46880006 E9037500 047E8304 468912C4 83000001 649A006A j..d....å..Få.-å.u.Ö...FåÖµ...v. 000160
 7E830446 8910C483 000001A8 9A006AF0 76FFF276 FF27E968 DE76FFE0 76FF5016 .P.vÅ.v8hÖ'.v·.vÞj..`....å..Få.- 000180
 76FF5016 FF7A8^8D 0123E903 74FA4608 F8468803 C2E90446 880006E9 03750004 å.u.Ö...FåÖö..F%.F°t.Ö#...z..P.v 0001A0
 8914C483 00000 'A 9A006AFF 7686FFFF 7886FF44 0468DE76 FFE076FF F476FFF6 -.v¶.vÅ.v8h.D.Åx..Åv.j..Ö....å.. 0001C0
 FF271E68 DE76FFE0 76FF5016 D0468003 7EE90446 880006E9 03750004 7E830446 Få.-å.u.Ö...FåÖ~..FÅ.P.vÅ.v8h.'. 0001E0

Dump of file SATURN:[PCCOMMON.DUMP.DLL]DMLGLOB.TMP;1 on 18-APR-1990 10:44:56.67
File ID (627,22,0)   End of file block 315 / Allocated 316

Virtual block number 82 (00000052), 512 (0200) bytes

 D4468800 06E90375 00047E83 D4468910 C4830000 02129A00 6AFF7686 FFFF7886 Åx..Åv.j.......å..Få.-å.u.Ö...Få 000000
 6A0076FF D276FF27 2268DE76 FFE076FF 056A5016 FF7A868D 5016EA46 80034CE9 ÖL..Fõ.P..z..Pj..vÅ.v8h"'.v8.vÅj 000020
 76FFEC76 FF0314E9 D4468800 06E90375 00047E83 D4468916 C4830000 028F9A00 .......å..Få.-å.u.Ö...FåÖ...vå.v 000040
 FF9A006A 486A5016 F84680DE 76FFE076 FFF076FF F276FF50 16FF7A86 80056AEA õj...z..P.v·.vÞ.vÅ.v8.F%.PjHj... 000060
 86FFF476 FFF676FF 02D7E904 46880006 E9037500 D47E83D4 46891AC4 830000FF ....å..Få.-å.u.Ö...FåÖ=..v~.v¶.Å 000080
 D69A006A F876FFFA 76FF27E8 680E76FF E076FF50 16EA468D 056AFF76 86FFFF78 x..Åv.j..Fõ.P.vÅ.v8hÖ'.v°.v%j..= 0000A0
 16FF7A86 800044E9 0297E904 46880006 E9037500 D47E83D4 46891AC4 83000002 ....å..Få.-å.u.Ö...FåÖ..ÖD...z.. 0000C0
 FA76FF28 0168DE76 FFE076FF FF7686FF FF7886FF F476FFF6 76FF5016 EA468050 P.Fõ.P.v~.v¶.Åx..Åv..vÅ.v8h.(.v° 0000E0
 FF0250E9 D44688GJ 06E90375 00047E83 D446891C C4830000 03099A00 6AF876FF .v%j.......å..Få.-å.u.Ö...FåÖP.. 000100
 12C48300 00033C9A 006A0A76 FF0C76FF 27D8680E 76FFE076 FF0E6AC6 76FFC876 vå.vój..vÅ.v8hÄ'.v..v.j..<....å. 000120
 DE76FFE0 76FF0F6A D676FFD8 76FF0210 E9D44688 0006E903 7500047E 83044689 .Få.-å.u.Ö...FåÖ...vÅ.v=j..vÅ.v8 000140
 880006E9 03750004 7E830446 8912C483 0000036F 9A006A0A 76FF0C76 FF27D868 hÄ'.v..v.j..o....å..Få.-å.u.Ö... 000160
 A29A006A 0A76FF0C 76FF27D8 680E76FF E076FF10 6AFC76FF FE76FF01 EAE90446 FåÖõ..vü.v=j..vÅ.v8hÄ'.v..v.j..Å 000180
 116AF876 FFFA76FF 0187E9D4 46880006 E9037500 D47E83D4 468912C4 83000003 ....å..Få.-å.u.Ö...FåÖñ..v°.v%j. 0001A0
 00047E83 D4468912 C4830000 FFFF9A00 6A0A76FF 0C76FF27 D8680E76 FFE076FF .vÅ.v8hÄ'.v..v.j.......å..Få.-å. 0001C0
 FF0C76FF 27D8680E 76FFE076 FF126ACC 76FFCE76 FF0184E9 D4468800 06E90375 u.Ö...FåÖ...vö.väj..vÅ.v8hÄ'.v.. 0001E0

Dump of file SATURN:[PCCOMMON.DUMP.DLL]DMLGLOB.TMP;1 on 18-APR-1990 10:44:56.67
File ID (627,22,0)   End of file block 315 / Allocated 316

Virtual block number 83 (00000053), 512 (0200) bytes

 46880151 E9D44688 0006E903 7500047E 83044689 12C48300 0004159A 006A0A76 v.j.......å..Få.-å.u.Ö...FåÖQ..F 000000
 FF0C76FF 271868DE 76FFE076 FF146AE2 76FFE476 FF076A00 29E90375 E44608E2 å.Fðu.Ö).j..vö.väj..vÅ.v8h.'.v.. 000020
 76FF0C76 FF010EE9 037500EE 7E830117 E9044689 14C48300 0004A19A 006A0A76 v.j..À....å..FåÖ...-Ÿ.u.Ö...v..v 000040
 019A006A 666A5016 E24680DE 76FFE076 FFEA76FF EC76FF50 16FF7A86 80396A0A .j9..z..P.vå.võ.vÅ.v8.Fã.Pjfj... 000060
 46890856 88D64688 0007E9D4 46880006 E9037500 D47E83D4 46891AC4 83000001 ....å..Få.-å.u.Ö...FåÖ=..F=.VÅ.F 000080
 FFEA76FF EC76FFE2 76FFE476 FF5016CA 46805016 E6468000 00CA46C7 DC56890A Ö.VÉúFb...F|.P.Fb.P.võ.vã.vå.võ. 0000A0
 7500047E 83044689 1CC48300 0004E09A 006AC676 FFC876FF 2803680E 76FFE076 vÅ.v8h.(.vå.vój..Ù....å..Få.-å.u 0000C0
 FF5016CA 46805016 E6468000 74E90375 DC4608DA 46880085 E9D44688 0006E903 .Ö...FåÖ...FÖ.FÊu.Öt..F|.P.Fb.P. 0000E0
 0005109A 006AOA76 FFDC76FF 2803680E 76FFE076 FFEA76FF EC76FFE2 76FFE476 vö.vã.vå.võ.vÅ.v8h.(.vÉ.vÖj..... 000100
 76FFE076 FF5016DA 46800039 E9044688 0006E903 7500047E 83044689 1CC48300 ..å..Få.-å.u.Ö...FåÖ9..FÖ.P.vÅ.v 000120
 0006E903 7500047E 83044689 10C48300 0001339A 006A0A76 FFDC76FF 27DA680E 8hÖ'.vÉ.vÖj..3....å..Få.-å.u.Ö.. 000140
 D88E0008 B81E5657 00001EC8 CBC95F5E 1F0000E9 D44688FF 81E90009 E9D44688 .FåÖ..Ö...FåÖ...^_èùå...WV.|...Å 000160
 FE478826 0E5EC402 0E4683F2 5689F046 89FE5788 26FC4788 260E5EC4 040E4683 .F..å^.&.G=&.Wü.FÞ.V·.F..å^.&.Gü 000180
 FE578826 FC478826 0E5EC404 0E4683FC 4689FE47 88260E5E C4020E46 83FE4689 .Fü.F..å^.&.Gü.F=.F..å^.&.G=&.Wü 0001A0
 7400FE7E 83F65689 F44689FE 578826FC 4788260E 5EC4040E 4683EC56 89EA4689 .Fõ.V$.F..å^.&.G=&.Wü.F¶.V-.-z.t 0001C0
 76FFF476 FFF676FF 0000079A 9AF476FF F676FFEA 76FFEC76 FF023F68 00ECE903 .Ö$.h?..v$.võ.v-.v¶......v-.v¶.v 0001E0
```

Dump of file SATURN:[PCCOMMON.DUMP.DLL]DMLGLOB.TMP;1 on 18-APR-1990 10:44:56.67
File ID (627,22,0) End of file block 315 / Allocated 316

Virtual block number 84 (00000054), 512 (0200) bytes 83000006 159A006A 0A76FF0C 76FF271A 68F076FF F276FF0E 6A020468 EA76FFEC &.vöh..j..v·.vÞh.'.v..v.j....... 000000
FF0C76FF 271A68F0 76FFF276 FF0F6A02 0468EA76 FFEC76FF F476FFF6 76FF18C4 &..v-.v¶.v&.vöh..j..v·.vÞh.'.v.. 000020
F276FF10 6A020468 EA76FFEC 76FFF476 FFF676FF 18C48300 00063F9A 006A0A76 v.j..?....&..v-.v¶.v&.vöh..j..v· 000040
FFEC76FF F476FFF6 76FF18C4 83000006 699A006A 0A76FF0C 76FF271A 68F076FF .vÞh.'.v..v.j..i....&..v-.v¶.v&. 000060
18C48300 0006939A 006A0A76 FF0C76FF 271A68F0 76FFF276 FF116A02 0468EA76 vöh..j..v·.vÞh.'.v..v.j.......&. 000080
0A76FF0C 76FF271A 68F076FF F276FF12 6A020468 EA76FFEC 76FFF476 FFF676FF .v-.v¶.v&.vöh..j..v·.vÞh.'.v..v. 0000A0
271468F0 76FFF276 FF146A50 16F84680 021DE900 008818C4 83000006 899A006A j..¿....&.¡..Õ...F%.Pj..v·.vÞh.' 0000C0
01E9FE46 88012AE9 0375FA46 08F84688 12C48300 0006EF9A 006A0A76 FF0C76FF .v..v.j..ÿ....&..F%.F°u.Õ°..F±Õ. 0000E0
1A9A006A F876FFFA 76FF2723 68F076FF F276FFEA 76FFEC76 FFF476FF F676FF01 ..v-.v¶.v&.vö.v·.vÞh#'.v°.v%j... 000100
2468F076 FFF276FF EA76FFEC 76FFF476 FFF676FF 01C1E900 008814C4 83000007 ....&.¡..Õé..v-.v¶.v&.vö.v·.vÞh$ 000120
EC76FFF4 76FFF676 FF0196E9 00008814 C4830000 07459A00 6AF876FF FA76FF27 '.v°.v%j..E....&.¡..Õ...v-.v¶.v& 000140
E9000088 14C48300 0007699A 006AF876 FFFA76FF 272668F0 76FFF276 FFEA76FF .vö.v·.vÞh&'.v°.v%j..i....&.¡..Õ 000160
10C48300 0003D59A 006A0A76 FF0C76FF 27E968F0 76FFF276 FF5016E2 46800168 k..Fã.P.v·.vÞhÕ'.v..v.j..1....&. 000180
EC76FF02 3B68006B E90003E9 0374E446 0BE2468B 000BE903 7400EE7E 83EE4689 .FŸ.-Ÿ.t.Õ...Fã.FÕt.Õ..Õk.h;..v& 0001A0
E276FFE4 76FFEA76 FFEC76FF F476FFF6 76FF0000 FFFF9AF4 76FFF676 FFEA76FF .vö.v-.v¶......v-.v¶.v&.vö.vö.vã 0001C0
E900EEE9 0000881B C4830000 080F9A00 6AF876FF FA76FF27 2868F076 FFF276FF .v·.vÞh('.v°.v%j.......&.¡..ÕŸ.Õ 0001E0

Dump of file SATURN:[PCCOMMON.DUMP.DLL]DMLGLOB.TMP;1 on 18-APR-1990 10:44:56.67
File ID (627,22,0) End of file block 315 / Allocated 316

Virtual block number 85 (00000055), 512 (0200) bytes

E9037500 1230FF12 E9037500 113DFEEF E9037500 0F3DFF4D E9037500 0E3D0023 #.=..u.ÕM.=..u.Õÿ±=..u.Õ..=..u.Õ 000000
B39A006A 0A76FF0C 76FF271B 68F076FF F276FFFE 76FF5016 E6468000 00E9FF60 '.Õ...F|.P.v±.v·.vÞh.'.v..v.j..° 000020
02A76800 48E9FE46 880096E9 00008800 06E90374 E8460BE6 468B12C4 83000008 ....&..F|.FÕt.Õ..j..Õ...F±ÕH.hÏ. 000040
F676FFEA 76FFEC76 FF028468 004CE900 0008549A F476FFF6 76FFEA76 FFEC76FF .v&.vö.v-.v¶.T...ÕL.h...v&.vö.v- 000060
E9000005 C49AF474 FFF676FF EA76FFEC 76FF023B 680035E9 0000086B 9AF476FF .v¶.k...Õ5.h;..v&.vö.v-.v¶.&...Õ 000080
0000E9FF CEE9037 00123DFF 8FE90375 00113DFF 80E90375 00103000 1BE9001E ..Õ..=..u.Õ¯.=..u.Õ¢.=..u.Õö.Õ.. 0000A0
E676FFE8 76FF271A 68F076FF F276FF00 6A020468 EA76FFEC 76FFF476 FFF676FF .v-.v¶.v&.vöh..j..v·.vÞh.'.vÕ.v| 0000C0
4683088E 054C881E 56570000 08C8C8C9 5F5E1F00 00E918C4 83000005 E89A006A j..§....&.Õ...^_èùà...WV.¡L..Ä.F 0000E0
8826FC47 88260E5E C4040E46 83FA5689 F84689FE 578826FC 4788260E 5EC4040E ..&^.&.G=&.W±.F%.V°.F..&^.&.G=&. 000100
76FF0C76 FF271868 F876FFFA 76FF146A FC76FFFE 76FF076A FE5689FC 4689FE57 W±.F=.V±j..v±.v=j..v°.v%h.'.v..v 000120
83088E08 CA881E56 57000008 C8C8C95F 5E1F0000 E914C483 000007C2 9A006A0A .j..õ....&.Õ...^ èùà...WV.¡õ..Ä. 000140
26FC4788 260E5EC4 040E4683 FA5689F8 4689FE57 8826FC47 88260E5E C4040E46 F..&^.&.G=&.W±.F%.V°.F..&^.&.G=& 000160
FF0C76FF 271968F8 76FFFA76 FF146AFC 76FFFE76 FF076AFE 5689FC46 89FE5788 .W±.F=.V±j..v±.v=j..v°.v%h.'.v.. 000180
D88E0928 881E5657 000016C8 C8C95F5E 1F0000E9 14C48300 0009149A 006A0A76 v.j.......&.Õ...^_èùà...WV.¡+..Ä 0001A0
FC478826 0E5EC404 0E4683F8 5689F646 89FE5788 26FC4788 260E5EC4 040E4683 .F..&^.&.G=&.W±.F-.V%.F..&^.&.G= 0001C0
260E5EC4 020E4683 EA4689FE 4788260E 5EC4020E 4683F256 89F04689 FE578826 &.W±.FÞ.V·.F..&^.&.G±.Fõ.F..&^.& 0001E0

Dump of file SATURN:[PCCOMMON.DUMP.DLL]DMLGLOB.TMP;1 on 18-APR-1990 10:44:56.67
File ID (627,22,0) End of file block 315 / Allocated 316

Virtual block number 86 (00000056), 512 (0200) bytes

C626F05E C4FE5689 FC4689FE 578826FC 4788260E 5EC4040E 4683F446 89FE4788 .G±.F¶.F..&^.&.G=&.W±.F=.V±&^Þ&6 000000
1A68F676 FFF876FF 006A0204 68F076FF F276FF50 16FA4680 FA4689EA 46880007 ...Fõ.F°.F°.P.v·.vÞh..j..v%.v-h. 000020
F076FFF2 76FFF476 FFFC76FF FE76FF18 C4830000 0A589A00 6A0A76FF 0C76FF27 '.v..v.j..[....&..v±.v=.v¶.v·.vÞ 000040
68F676FF F876FF13 6A5016EC 4680FA46 89EA4688 0007C626 F05EC400 000AFE9A .±...&^Þ&6...Fõ.F°.F&.Pj..v%.v-h 000060
FE76FF00 4EE90375 EE460BEC 468B12C4 8300000A 939A006A 0A76FF0C 76FF271B .'.v..v.j.......&..F&.FŸu.ÕN..v± 000080
EC76FFEE 76FF27E6 68F676FF F876FFF0 76FFF276 FFEA76FF 5040F446 88FC76FF .v=.F¶ƏP.vö.v·.vÞ.v%.v-h|'.vŸ.v& 0000A0
006AEC76 FFEE76FF 27DA68F6 76FFF876 FF5016EC 468018C4 8300000A 819A006A j..Ÿ....&..F&.P.v%.v-hÕ'.vŸ.v&j. 0000C0
76FFF276 FF022368 FA4689EA 46880007 C626F05E C4FFA7E9 10C48300 0009759A .u....&.ÕÏ.&^Þ&6...Fõ.F°h#..v·.v 0000E0
76FF0000 083D9A50 16FA4680 F076FFF2 76FF023F 6800000A EA9A5016 FA4680F0 Þ.F°.P.õ...h?..v·.vÞ.F°.P.=....v 000100
88FA4689 EA468800 07C626F0 5EC40000 FFFF9AF0 76FFF276 FFF476FF FC76FFFE ±.v=.v¶.v·.vÞ.....&^Þ&6...Fõ.F°¡ 000120
4788260E 5EC4040E 4683088E 098C881E 56570000 68C8C8C9 5F5E1F00 00E90000 ..Õ...^ èùàh..WV.¡...Ä.F..&^.&.G 000140
0E5EC404 0E4683F2 4689FE47 88260E5E C4020E46 83F05689 EE4689FE 578826FC =&.W±.FŸ.VÞ.F..&^.&.G±.F·.F..&^. 000160
F44689FE 578826FC 4788260E 5EC4040E 46839A56 89984689 FE578826 FC478826 &.G=&.W±.F..V..F..&^.&.^=&.W±.F¶ 000180
FF116A50 16F84680 FE5689FC 4689FE57 8826FC47 88260E5E C4040E46 83F65689 .V-.F..&^.&.G=&.W±.F=.V± F%.Pj.. 0001A0
7500EC7E 83EC4689 12C48300 000BE49A 006A0A76 FF0C76FF 271468EE 76FFF076 vÞ.vŸh.'.v..v.j..õ....&..r&.-&.u 0001C0
50169C46 800135E9 EC468800 06E90374 FA4608F8 46880146 E9EC4688 0006E903 .Õ...F&ÕF..F%.F°t.Õ...F&Õ5..F..P 0001E0

```
Dump of file SATURN:[PCCOMMON.DUMP.DLL]DMLGLOB.TMP;1 on 18-APR-1990 10:44:56.67
File ID (627,22,0)   End of file block 315 / Allocated 316

Virtual block number 87 (00000057), 512 (0200) bytes

 7E83EC46 8912C483 00000C2A 9A006AF8 76FFFA76 FF271268 EE76FFF0 76FF076A j..vÞ.vŸh.'.vº.v½j..º....á..F£.- 000000
 FFF676FF 50169C46 8D00000C 859A5016 9C468D01 03E9EC46 8B0006E9 037500EC £.u.Õ...F£Õ...F..P......F..P.v-. 000020
 C4830000 0C669A00 6A0A76FF 0C76FF27 FB68EE76 FFF076FF 9876FF9A 76FFF476 v¶.v..v..vÞ.vŸh«'.v..v.j..f....á 000040
 9C468D00 00FF.F9A 50169C46 8000BDE9 EC468800 06E90375 00EC7E83 EC468918 ..F£.-£.u.Õ...F£Õ§..F..P......F. 000060
 EC468912 C4830000 0CA09A00 6AF876FF FA76FF27 1768EE76 FFF076FF 076A5016 .Pj..vÞ.vŸh.'.vº.v½j.......á..F£ 000080
 76FF5016 E8468D00 00FFFF9A 50169C46 8D0081E9 EC468800 06E90375 00EC7E83 .-£.u.Õ...F£Õ...F..P......FÒ.P.v 0000A0
 037500EC 7E83EC46 8910C483 00000A1A 9A006A98 76FF9A76 FF271E68 EE76FFF0 Þ.vŸh.'.v..v.j.......á..F£.-£.u. 0000C0
 E876FFEA 76FF9876 FF9A76FF F476FFF6 76FF5016 9C468000 47E9EC46 880006E9 Õ...F£ÕG..F..P.v-.v¶.v..v..vÕ.vÒ 0000E0
 7500EC7E 83EC4689 1CC48300 00044F9A 006A596A FC76FFFE 76FFEE76 FFF076FF .vÞ.vŸ.v±.v•jYj..O....á..F£.-£.u 000100
 8E0B22B8 1E565700 000CC8CB C95F5E1F 0000E9EC 46880006 E9EC4688 0006E903 .Õ...F£Õ...F£Õ...^_èùà...WV.¡".. 000120
 4788260E 5EC4020E 4683F856 89F64689 FE578B26 FC478B26 0E5EC404 0E468308 Ä.F..á^.&.G=&.W±.F=.V½.F..á^.&.G 000140
 0000879A 006A0A76 FF0C76FF 271468F6 76FFF876 FF146A50 16FC468D FA4689FE ±.Fª.F•.Pj..v½.v-h.'.v..v.j..... 000160
 FE76FF07 6A003FE9 0375FE46 08FC4688 004AE903 7400F47E 83F44689 12C48300 ..á..F¶.-¶.t.ÕJ..F•.F±u.Õ?.j..v± 000180
 468914C4 8300000B A19A006A 0A76FF0C 76FF2719 68F676FF F876FF14 6AFC76FF .v•j..v½.v-h.'.v..v.j..À....á..F 0001A0
 F876FFFA 76FFF446 890AC483 0000FFFF 9A006AFC 76FFFE76 FFF676FF F876FFF4 ¶.v½.v-.v±.v•j........á..F¶.vº.v½ 0001C0
 4688F446 8912C483 0000FFFF 9A006A06 76FF0876 FF0A76FF 0C76FF02 6AF676FF .v-j..v..v..v..v.j.......á..F¶.F 0001E0

Dump of file SATURN:[PCCOMMON.DUMP.DLL]DMLGLOB.TMP;1 on 18-APR-1990 10:44:56.67
File ID (627,22,0)   End of file block 315 / Allocated 316

Virtual block number 88 (00000058), 512 (0200) bytes

 FC478B26 0E5EC404 0E468308 8E000088 1E565700 0030C8C8 C95F5E1F 0000E9F4 ¶Õ...^_èùàO..WV.¡...Ä.F..á^.&.G• 000000
 83025689 D04689FE 578B26FC 4788260E 5EC4040E 4683E456 89E24689 FE578B26 &.W±.Fã.VÕ.F..á^.&.G=&.W±.FÀ.V@. 000020
 0C76FF27 1468E276 FFE476FF 0E6A5016 EC468DE6 4689FE47 8B260E5E C4020E46 F..á^.&.G±.Fì.F£.Pj..vÕ.vãh.'.v. 000040
 74EE4608 EC468800 08E90374 00D47E83 D4468912 C4830000 0E849A00 6A0A76FF .v.j.......á..Fá.-á.t.Õ...F£.FŸt 000060
 FFD276FF 5016E846 8D0000FF FF9A5016 E8468DE6 76FF02FD E999B388 0006E903 .Õ..¡°.Õ»..vì.FÒ.P......FÒ.P.v@. 000080
 7E830446 8914C483 00000D4D 9A006AEC 76FFEE76 FF3E8068 E276FFE4 76FFD076 vÀ.vÕ.vãh.>.vŸ.v£j..M....á..Fá.- 0000A0
 FF0F6A50 16F0468D 02AFE999 83B80000 0EDB9AE8 76FFEA76 FF0011E9 03750004 á.u.Õ...vÕ.vÒ.Ù...¡°.ÕÉ..FÞ.Pj.. 0000C0
 7500047E 83044689 12C48300 000FFB9A 006A0A76 FF0C76FF 271468E2 76FFE476 vÕ.vãh.'.v..v.j..«....á..Fá.-á.u 0000E0
 0E639A50 160A468D E676FF02 72E99984 8800000F 059AE876 FFEA76FF 0011E903 .Õ...vÕ.vÒ.....¡Ç.Õr..vì.FÕ.P.c. 000100
 8B0248E9 99848800 00FFFF9A E876FFEA 76FF0011 E9037500 D47E8304 46890000 ...Fá.-á.u.Õ...vÕ.vÒ.....¡Ç.ÕH.. 000120
 0010AE9A E876FFEA 76FF00A2 E90374E0 4608DE46 88E05689 DE4689F2 5688F046 FÞ.V .F8.VÀ.F8.FÀt.ÕÀ..vÕ.vÒ.Û.. 000140
 FFD076FF D276FF00 7CE90374 00003000 0010BE9A 5016EC46 80E876FF EA76FF00 ..vÕ.vÒ.F£.P./...=..t.Õ|..v@.vÀ. 000160
 D446C700 08E90375 00D47E83 D4468900 00FFFF9A 50160646 8D156AEC 76FFEE76 vŸ.v£j..F•.P......Fá.-á.u.Õ..úFá 000180
 0B26078B 26FC5EC4 04FC4683 0004E9FE 5689FC46 89D8568B D6468801 C6E99984 Ç.Õó..F•.VA.F•.V±Õ...F•.á^•&..&. 0001A0
 D3E9D446 890000FF FF9A37FF 260277FF 26FC5EC4 50160A46 80001AE9 03750247 G.u.Õ...FÕ.Pá^•&.w.&.7......FàÕR 0001C0
 0375E046 08DE4688 007EE9FF 6CE90000 FFFF9A06 76FFD876 FFD076FF 0276FFFF ..v@.vÀ.vÀ.v•.....Õl.Õ-..F8.FÀu. 0001E0

Dump of file SATURN:[PCCOMMON.DUMP.DLL]DMLGLOB.TMP;1 on 18-APR-1990 10:44:56.67
File ID (627,22,0)   End of file block 315 / Allocated 316

Virtual block number 89 (00000059), 512 (0200) bytes

 68E276FF E476FFuu 76FFD276 FFE876FF EA76FFE6 76FF5016 DA468D0F 6A0073E9  Õs.j..FÕ.P.vì.vÕ.vÒ.v@.vÀ.vÕ.vãh 000000
 2AE90003 E9037500 D47E8304 46891CC4 83000010 289A006A DE76FFE0 76FF27EE Ÿ'.vÀ.v8j..(....á..Fá. \.u.Õ..Õº 000020
 8910C483 0000105F 9A006ADE 76FFE076 FF27DA68 E276FFE4 76FF5016 0E468D01 ..F8.P.vÕ.vãhÕ'.vÀ.v8j.. ....á.. 000040
 E476FF10 6A5016F8 468DFF82 E900F8E9 99840446 C70008E9 03750004 7E830446 Fá.-á.u.Õ..úFáÇ.Õ½.Õ...F½.Pj..vÕ 000060
 E9037500 D47E8304 468912C4 83000010 FF9A006A 0A76FF0C 76FF2714 68E276FF .vãh.'.v..v.j.......á..Fá.-á.u.Õ 000080
 0008E903 75F24608 F0468800 16E90374 FA4608F8 468800C1 E998BD04 46C70008 ..úFá§.Õè..F½.F"t.Õ...FÞ.F u.Õ.. 0000A0
 FFFF9ADA 76FFDC76 FFE05689 DE4689FA 5688F846 8800A0E9 00A3E999 8D0446C7 úFá§.ÕÉ.Õ...F½.Vº.F8.VÀ.vÉ.vÕ... 0000C0
 E0460BDE 4688005E E9037400 00300000 FFFF9A50 16F4468D DA76FFDC 76FF0000 ...vÉ.vÕ.F¶.P.....=..t.Õ^..F8.FÀ 0000E0
 E476FF50 160E4680 0053E999 8DD446C7 00001119 9ADA76FF DC76FF00 13E90374 t.Õ...vÉ.vÕ.....úFá§.ÕS..F8.P.vÕ 000100
 E9037500 D47E8304 468910C4 8300000E 369A006A DE76FFE0 76FF27DA 68E276FF .vãhÕ'.vÀ.v8j..6....á..Fá.-á.u.Õ 000120
 0375E046 080E4688 FF8AE900 16E9998D D446C700 00FFFF9A DA76FFDC 76FF0013 ...vÉ.vÕ.....úFá§.Õ..Õ...F8.FÀu. 000140
 000E9E9A DA76FFDC 76FF0000 11409AE8 76FFEA76 FF0000E9 99800446 C70008E9 Õ..úFá§.Õ...vÕ.vÕ.M....vÉ.vÕ.... 000160
 260E5EC4 040E4683 088E00E1 881E5657 000008C8 CBC95F5E 1F0000E9 D4468800 ..FàÕ...^_èùà...WV.¡À..Ä.F..á^.& 000180
 89F84689 FE578B26 FC478B26 0E5EC404 0E4683FE 5689FC46 89FE578B 26FC478B .G=&.W±.F=.V±.F..á^.&.G=&.W±.F½. 0001A0
 8E1164B8 1E565700 0030C8CB C95F5E1F 0000E900 00B80001 07C726F8 5EC4FA56 Vºá^½&ú...¡..Õ...^_èùàO..WV.¡d.. 0001C0
 4788260E 5EC4040E 4683E256 89E04689 FE578B26 FC478B26 0E5EC404 0E468308 Ä.F..á^.&.G=&.W±.FÃ.Vã.F..á^.&.G 0001E0
```

```
Dump of file SATURN:[PCCOMMON.DUMP.DLL]DMLGLOB.TMP;1 on 18-APR-1990 10:44:56.67
File ID (627,22,0)   End of file block 315 / Allocated 316

Virtual block number 90 (0000005A), 512 (0200) bytes

0E5EC404 0E4683D0 4689FE47 88260E5E C4020E46 83045689 024689FE 5²^926FC •&.W±.F0.Vå.F..á^.&.G±.FÅ.F..á^. 000000
26D25EC4 E6468SFE 4788260E 5EC4020E 4683F256 89F04689 FE578826 FC4 3826 &.G•&.W±.Fþ.V·.F..á^.&.G±.F|á^0& 000020
6A0A76FF 0C76FF27 1468E076 FFE276FF 146A5016 D6468DE4 46890046 8800.7C6 ó...FÅ.FÖ.F•.Pj..vã.vÅh.'.v..v.j 000040
4680E676 FF01C1E9 DE468800 06E90375 000E7E83 DE468912 C4830000 12889A00 .......á..F8.-ß.u.Õ...FßÕè..v|.F 000060
0044E903 75084608 D6468800 000EEE9A 5016F446 80E676FF 00001261 9A5016EC &.P.a....v|.F¶.P.Ÿ....F•.FÅu.Õo. 000080
8910C483 000012AA 9A006A06 76FFD876 FF514168 E076FFE2 76FFEC76 FFEE76FF .vŸ.v$.vã.vÅhAQ.vÅ.v•j..¨....á.. 0000A0
C4830000 135F9A00 6AD676FF D876FF51 4068E076 FFE276FF F476FFF6 76FFDE46 F8.v-.v¶.vã.vÅhaQ.vÅ.v•j.......á 0000C0
30000013 3C9A5016 DA4680F4 76FFF676 FF000013 2C9AF476 FFF676FF DE468910 ..F8.v-.v¶.,....v-.v¶.FÖ.P.<...= 0000E0
FFD476FF 026A0A76 FFDC76FF E076FFE2 76FF0007 C626025E C40119E9 03740000 ..t.Õ..á^0&ó...vã.vÅ.vÉ.vÖj..vå. 000100
1E0CC483 1320011E 9AF076FF F276FF03 9C681E02 76FFD476 FF000013 CE9AD276 v0.ö....vå.v0.h...v·.vþ.......á.. 000120
00000F20 9AEC76FF EE76FF0C C48313E5 011E9AF0 76FFF276 FF03A868 1E039F68 h...h´..v·.vþ...|..á..vŸ.v$.-... 000140
E276FF50 16FC4680 00A5E903 7400003D 00000F30 9A5016F8 4680EC76 FFEE76FF .vŸ.v$.F%.P.=...=..t.ÕE..F•.P.vå 000160
E9037500 DE7E830E 468910C4 8300000E C19A006A F876FFFA 76FF2710 68E076FF .vÅh.'.v•.v½j..è....á..F8.-ß.u.Õ 000180
0E468900 00FFFF9A 5016E846 800A6AFC 76FFFE76 FFE076FF E276FFFF 88E90003 ..ÕE..vã.vÅ.v±.v•j..FÖ.P......F8 0001A0
E90374EA 56390040 E90374E8 46390C56 880A4688 FF94E900 03E90375 000E7E83 .-ß.u.Õ..Õ...FÖ.VE9FÖt.Õa.9Vöt.Õ 0001C0
FFFF9AD2 76FFD476 FF026AFC 76FFFE76 FFE076FF E276FF00 07C62602 5EC40038 8.á^0&ó...vã.vÅ.v±.v•j..vå.v0... 0001E0
```

```
Dump of file SATURN:[PCCOMMON.DUMP.DLL]DMLGLOB.TMP;1 on 18-APR-1990 10:44:56.67
File ID (627,22,0)   End of file block 315 / Allocated 316

Virtual block number 91 (0000005B), 512 (0200) bytes

FECFE9FF 43E90CC4 83FFFF01 1E9AF076 FFF276FF 03A0681E D276FFD4 76FF0000 ...vå.v0.hÜ..v·.vþ......á.ÕC.Õü± 000000
C95F5E1F 0000E900 00880000 11429AF4 76FFF676 FF000014 029AEC76 FFEE76FF .vŸ.v$......v-.v¶.B...¡..Õ...^_è 000020
89FC4689 FE578826 FC478826 0E5EC404 0E468308 8E11AD88 1E565700 0008C8C8 ùå...WV.¡Ü..Ä.F..á^.&.G•&.W±.F=. 000040
FF146AF8 76FFFA76 FFFA5689 F84689FE 578826FC 4788260E 5EC4040E 4683FE56 V±.F..á^.&.G•&.W±.F%.V•.v•.v½j.. 000060
C8C95F5E 1F0000E9 12C48300 0012329A 006A0A76 FF0C76FF 271468FC 76FFFE76 v±.v•h.'.v..v.j..2....á.Õ...^_èù 000080
5689F846 89FE5788 26FC4788 260E5EC4 040E4683 D88E1419 881E5657 000008C8 å...WV.¡...Ä.F..á^.&.G•&.W±.F%.V 0000A0
D088023F 07C726FC 5EC4FE56 89FC4689 FE578826 FC478826 0E5EC404 0E4683FA •.F..á^.&.G•&.W±.F=.V±á^•&ú.?.¡. 0000C0
FC478826 0E5EC404 0E468308 8E147888 1E565700 000EC8C8 C95F5E1F 0000E900 .Õ...^_èùå...WV.¡x..Ä.F..á^.&.G= 0000E0
260E5EC4 040E4683 FE4689FE 4788260E 5EC4020E 4683FC56 89FA4689 FE578826 &.W±.F¯.V•.F..á^.&.G±.F±.F..á^.& 000100
89F24689 FE578826 FC478826 0E5EC404 0E4683F8 5689F646 89FE5788 26FC4788 .G•&.W±.F-.V%.F..á^.&.G•&.W±.F·. 000120
D88E14C1 881E5657 000014C8 C8C95F5E 1F0000E9 00008800 07C626F6 5EC4F456 V¶á^-&ó..¡..Õ...^_èùå...WV.¡è..Ä 000140
FC478826 0E5EC404 0E4683F0 5689EE46 89FE5788 26FC4788 260E5EC4 040E4683 .F..á^.&.G•&.W±.FŸ.Vþ.F..á^.&.G• 000160
260E5EC4 040E4683 F64689FE 4788260E 5EC4020E 4683F456 89F24689 FE578826 &.W±.F·.V¶.F..á^.&.G±.F-.F..á^.& 000180
0C76FF27 1468EE76 FFF076FF 026A5016 F84680FE 5689FC46 89FE5788 26FC4788 .G•&.W±.F•.V±.F%.Pj..vþ.vŸh.'.v. 0001A0
88012FE9 EC468800 06E90375 00EC7E83 EC468912 C4830000 16799A00 6A0A76FF .v.j..y....á..F$.-$.u.Õ...F$Õ/.. 0001C0
FA76FF00 6A006A00 6A006A00 6A006A00 6A006A00 6AF276FF F476FF00 86E9F646 F-Õ...v¶.v·j.j.j.j.j.j.j.j.j..v• 0001E0
```

```
Dump of file SATURN:[PCCOMMON.DUMP.DLL]DMLGLOB.TMP;1 on 18-APR-1990 10:44:56.67
File ID (627,22,0)   End of file block 315 / Allocated 316

Virtual block number 92 (0000005C), 512 (0200) bytes

E9EC4689 26C48300 0016259A 006AF676 FFFC76FF FE76FFEE 76FFF076 FFF876FF .v½.vþ.vŸ.v±.v=.v-j..X....á&.F$Õ 000000
76FF006A 006A006A 006A006A 006A006A 006A006A 006A006A F276FFF4 76FF005C \..v¶.v·j.j.j.j.j.j.j.j.j.j.j..v 000020
E9EC4689 2AC48300 000CE19A 006A386A FC76FFFE 76FFEE76 FFF076FF F876FFFA •.v½.vþ.vŸ.v±.v•j;j..Å....á•.F$Õ 000040
7E83FFE4 E9FFA7E9 0375003B 3DFF72E9 0375003A 300013E9 00A6E999 8D88001C ..¡§.Õ|.Õ..=:.u.Õr.=;.u.Õ|.Õõ..- 000060
27EA68EE 76FFF076 FF37FF26 0277FF26 FC5EC400 81E9EC46 880006E9 037500EC $.u.Õ...F$Õ..á^=&.w.&.7.vþ.vŸhõ' 000080
E9EC4688 0006E903 7500EC7E 83EC4689 10C48300 0016AA9A 006AF876 FFFA76FF .v•.v½j..¨....á..F$.-$.u.Õ...F$Õ 0000A0
C4830000 14619A00 6A0A76FF 0C76FF28 0268EE76 FFF076FF F276FFF4 76FF004C L..v¶.v·.vþ.vŸh.(.v..v.j..•....á 0000C0
76FF0C76 FFEE76FF F076FF10 6A001BE9 EC468800 06E90375 00EC7E83 EC468910 ..F$.-$.u.Õ...F$Õ..j..vþ.vŸ.v..v 0000E0
83088E15 2C881E56 57000010 C8C8C95F 5E1F0000 E90CC483 00000DA0 9A006A0A .j.......á.Õ...^_èùå...WV.¡...Ä. 000100
89FE4788 260E5EC4 020E4683 F45689F2 4689FE57 8826FC47 88260E5E C4040E46 F..á^.&.G=&.W±.F¯.V¶.F..á^.&.G±. 000120
88000007 C726F85F C4FA5689 F84689FE 578826FC 4788260E 5EC4040E 4683F646 F-.F..á^.&.G=&.W±.F%.V•á^½&ú...¡ 000140
76FF2714 68F276F' F476FF14 6A5016FC 4680006A E9F6468B FC4689FE 46890000 ...F±.F•.F-Õj..F•.Pj..v¶.v·h.'.v 000160
26F85EC4 000EE903 75FE4608 FC468BF0 468912C4 83000015 969A006A 0A76FF0C ..v.j.......á..Fþ.F•.F±u.Õ..á^½& 000180
FF0C76FF 281268F2 76FFF476 FFF676FF F876FFFA 76FF0051 E9000088 000107C7 ú...¡..Õo..v•.v½.v-.v¶.v·h.(.v.. 0001A0
FFCAE903 73000E30 0023E900 26E916C4 83000000 C49A006A 0676FF08 76FF0A76 v..v..v.j..á....á.Õ&.Õ#.=..s.Õõ. 0001C0
C8C95F5E 1FFFAFE9 FF76E903 77001230 FFBAE903 7300113D FF86E903 77000F30 =..w.Õ..=..s.Õa.=..w.Õv.ÕE..^_èù 0001E0
```

Dump of file SATURN:[PCCOMMON.DUMP.DLL]DMLGLOB.TMP;1 on 18-APR-1990 10:44:56.67
File ID (627,22,0) End of file block 315 / Allocated 316

Virtual block number 93 (0000005D), 512 (0200) bytes

```
56570000 02C8CBC9 5F5E1F00 00E90856 8B06468B D88E16EB B81E5657 000000C8 à...WV.¡Š..Ä.F..V.Ö...^_èùà...WV 000000
006A396A 026A006A 006A006A 038A681E 016A316A FFFF68FF FF68088E 17D8881E .¡Á..Ah..h..j1j..ho.j.j.j.j9j. 000020
02B3000A 12BBF203 0017CBC9 5F5E1F00 00E9FE46 8BFE4689 18C48300 00FFFF9A ......á..F±.F±Ö...^_èù....É...°. 000040
02C4000A 100C0203 00680005 17980203 02460008 0A310203 005E0005 17570203 ..W...^...1...F.......k...É...á. 000060
007E0005 15E50203 02640008 0C490203 01710006 0FBE0203 02560008 0C030203 ......V.../...q...I...d...!...-. 000080
008F0005 16D40203 0000000D 17F70002 0000002C 130A0002 02D8000A 12C80203 ..ù...Ä.....,.....%.......å..... 0000A0
01280006 12F30203 02F7000A 13F70203 02EC000A 12540203 0000002E 17F20002 ..........T...ś...%...%...µ...(. 0000C0
023C0008 0AD70203 01420006 0F5D0203 17D00000 17FA0005 00380005 18110203 ......ß...°...Å...]...B...■...<. 0000E0
040E4683 D88EFFFF 881E5657 000082C8 014E0006 13890203 032E000A 0FA70203 ..Ĭ...........N.à...WV.¡...Á.F.. 000100
FE578826 FC478826 0E5EC404 0E4683E4 5689E246 89FE5788 26FC4788 260E5EC4 á^.&.G•&.W±.Fã.VÕ.F..ć^.&.G•&.W± 000120
C4040E46 83005689 CE4689FE 578826FC 4788260E 5EC4040E 4683F656 89F44689 .F¶.V-.F..á^.&.G•&.W±..ɜ.VÂ.F..á 000140
89FE5788 26FC4788 260E5EC4 040E4683 FE5689FC 4689FE57 8826FC47 88260E5E ^.&.G•&.W±.F•.V±.F..á^.&.G•&.W±. 000160
5EC4020E 4683E056 89DE4689 FE578826 FC478826 0E5EC404 0E468306 56890446 Fà.V•.F..á^.&.G•&.W±.FB.VÂ.F..á^ 000180
DE4688E8 5689E646 89FE5788 26FC4788 260E5EC4 040E4683 EE4689FE 4788260E .&.G±.FŸ.F..á^.&.G•&.W±.FÎ.VÒ.F8 0001A0
FF27FE68 E276FFE4 76FF020F 68002EE9 0374E846 0BE64688 0039E903 74E04608 .FÀt.Ö9..FÌ.FÒt.Ö..h...vö.vâh±'. 0001C0
86E90C46 880006E9 0375000C 7E830C46 890EC483 00000162 9A006A0A 76FF0C76 v..v.j..b....á..FÉ.-É.u.Ö...FÉÖÑ 0001E0
```

Dump of file SATURN:[PCCOMMON.DUMP.DLL]DMLGLOB.TMP;1 on 18-APR-199L 10:44:56.67
File ID (627,22,0) End of file block 315 / Allocated 316

Virtual block number 94 (0000005E), 512 (0200) bytes

```
0039E903 74D64608 D4468802 11E90374 E84608E6 4688021C E9037500 EE7E8303 ..-Ÿ.u.Ö...FÌ.FÒt.Ö...Få.F•t.Ö9. 000000
9A006A48 6A501604 468DE276 FFE476FF F476FFF6 76FF006A 006A066A 006A006A j.j.j.j.j..v-.v¶.vö.vã.Få.PjHj.. 000020
5016F846 8D066A03 5EE90C46 880006E9 0375000C 7E830C46 891AC483 00000279 y....á..FÉ.-É.u.Ö...FÉÖ^.j..F%.P 000040
000C7E83 DC468912 C4830000 01939A00 6AD476FF D676FF27 E868E276 FFE476FF .vö.vâhÖ'.v•.våj.......á..FÉ.-É. 000060
F476FFF6 76FF27E9 68E276FF E476FF50 16FF7E86 8D032CE9 DC468800 06E90375 u.Ö...FÉÖ,...-..P.vö.vâhÖ'.v-.v¶ 000080
08FC4688 02F8E90C 46880006 E9037500 DC7E830C 468910C4 83000001 059A006A j..f....á..FÉ.-É.u.Ö...FÉÖ«..F•. 0000A0
86FF8076 FF440468 E276FFE4 76FFF876 FFFA76FF 50168246 8D011DE9 0374FE46 F±t.Ö...F..P.v°.v%.vö.vâh.D.v..Ñ 0000C0
468D0289 E90C4688 0006E903 75000C7E 830C4689 14C48300 0002069A 006AFF7E -.j.......á..FÉ.-É.u.Ö...FÉÖ¿..F 0000E0
DC468910 C4830000 02309A00 6AFF7E86 FF8076FF 271E68E2 76FFE476 FF5016D8 Å.P.vö.vâh.'.v..Ñ-.j..=....á..FÉ 000100
76FFE476 FF056A50 1682468D 5016F046 8D0288E9 DC468800 06E90375 000C7E83 .-É.u.Ö...FÉÖ...FÞ.P.F..Pj..vö.v 000120
0006E903 75000C7E 830C4689 16C48300 0002B89A 006AD876 FFDA76FF 272268E2 åh"'.vÖ.vÅj..¡....á..FÉ.-É.u.Ö.. 000140
8DE276FF E476FFF4 76FFF676 FF501682 4680056A F076FFF2 76FF0251 E90C4688 .FÉÖQ..v·.vÞj..F..P.v-.v¶.vö.vâ. 000160
E90C4688 0006E903 75000C7E 830C4689 1AC48300 00FFFF9A 006A486A 5016FC46 F•.PjHj.......á..FÉ.-É.u.Ö...FÉÖ 000180
FF27E868 E276FFE4 76FF5016 F046800S 6AFF7E86 FF8076FF F876FFFA 76FF0215 ...v°.v%.v..Ñ-.j..FÞ.P.vö.vâhÖ'. 0001A0
D6E90C46 880006E9 0375000C 7E830C46 891AC483 000002F0 9A006AFC 76FFFE76 v±.v•j..»....á..FÉ.-É.u.Ö...FÉÖ• 0001C0
76FFE476 FFFF7E86 FF8076FF F876FFFA 76FF5016 F0468D50 1682468D 0042E901 .Ö8..F..P.FÞ.P.v°.v%.v..Ñ-..vö.v 0001E0
```

Dump of file SATURN:[PCCOMMON.DUMP.DLL]DMLGLOB.TMP;1 on 18-APR-1990 10:44:56.67
File ID (627,22,0) End of file block 315 / Allocated 316

Virtual block number 95 (0000005F), 512 (0200) bytes

```
0006E903 75000C7E 830C4689 1CC48300 0003309A 006AFC76 FFFE76FF 280168E2 ãh.(.v±.v•j..0....á..FÉ.-É.u.Ö.. 000000
9A006A0A 76FF0C76 FF27D868 E276FFE4 76FF0E6A CE76FFD0 76FF0191 E90C4688 .FÉÖ...vÅ.vöj..vö.vâhÄ'.v..v.j.. 000020
6AFC76FF FE76FF01 5EE90C46 880006E9 0375000C 7E830C46 8912C483 00000363 c....á..FÉ.-É.u.Ö...FÉÖ^..v±.v•j 000040
DC7E830C 468912C4 83000003 969A006A 0A76FF0C 76FF27D8 68E276FF E476FF12 ..vö.vâhÄ'.v..v.j.......á..FÉ.-É 000060
0C76FF27 D868E276 FFE476FF 106AD476 FF0676FF 0128E90C 46880006 E9037500 .u.Ö...FÉÖ+..v•.våj..vö.vâhÄ'.v. 000080
FF00F8E9 DC468800 06E90375 000C7E83 DC468912 C4830000 FFFF9A00 6A0A76FF .v.j.......á..FÉ.-É.u.Ö...FÉÖ%.. 0000A0
12C48300 0004099A 006A0A76 FF0C76FF 27D868E2 76FFE476 FF0F6ADE 76FFE076 vÅ.vßj..vö.vâhÄ'.v..v.j.......á. 0000C0
FF076A00 29E90375 E84608E6 468800C5 E90C4688 0006E903 75000C7E 830C4689 .FÉ.-É.u.Ö...FÉÖé..FÌ.FÒu.Ö).j.. 0000E0
14C48300 0004889A 006A0A76 FF0C76FF 271868E2 76FFE476 FF136AE6 76FFE876 vÖ.vÌj..vö.vâh.'.v..v.j.......á. 000100
FFF276FF 50168246 8D3A6A0A 76FF0C76 FF0082E9 037500EE 7E83008B E90C4689 .FÉÖ...-Ÿ.u.Ö...v..v.j:.F..P.v·. 000120
000C7E83 DC46891A C4830000 01309A00 6A666A50 16E6468D E276FFE4 76FFF076 vÞ.vö.vã.FÌ.Pjfj..0....á..FÉ.-É. 000140
E676FFE8 76FF5016 D2468D50 16EA468D 00000246 C7004CE9 DC468800 06E90375 u.Ö...FÉÖL.úF●...FÖ.P.F●.P.vÖ.vÌ 000160
891CC483 00000008 9A006ACE 76FFD076 FF280368 E276FFE4 76FFF076 FFF276FF .v·.vÞ.vö.vâh.(.vÅ.vöj..Á....á.. 000180
00001EC8 C8C95F5E 1F0000E9 DC468800 06E90C46 880006E9 0375000C 7E830C46 FÉ.-É.u.Ö...FÉÖ...FÉÖ...^_èùà... 0001A0
0E4683F2 5689F046 89FE5788 26FC4788 260E5EC4 040E4683 D88E0008 B81E5657 WV.¡...Á.F..á^.&.G•&.W±.FÞ.V·.F. 0001C0
0E5EC404 0E4683FC 4689FE47 88260E5E C4020E46 83FE4689 FE478826 0E5EC402 .á^.&.G±.F±.F..á^.&.G±.F•.F..á^. 0001E0
```

Dump of file SATURN:[PCCOMMON.DUMP.DLL]DMLGLOB.TMP;1 on 18-APR-1990 10:44:56.67
File ID (627,22,0)   End of file block 315 / Allocated 316

Virtual block number 96 (00000060), 512 (0200) bytes

```
F44689FE 578B26FC 478B260E 5EC4040E 4683EC56 89EA4689 FE578B26 FC478B26 &.G=&.W±.Fõ.Vš.F..ó^.&.G=&.W±.F¶ 000000
000006AD 9AF476FF F676FFEA 76FFEC76 FF020F68 00C2E903 7400FE7E 83F65689 .v-.~±.t.Õõ.h...vš.võ.v-.v¶.Ù... 000020
0A76FF0C 76FF2.1A 68F076FF F276FF0E 6A020468 EA76FFEC 76FFF476 FFF676FF .v-.v¶.vš.võh..j..v·.vÞh.'.v..v. 000040
76FFF276 FF126A02 0468EA76 FFEC76FF F476FFF6 76FF18C4 83000005 7D9A006A j..}....ó..v-.v¶.vš.võh..j..v·.v 000060
EA76FFEC 76FFF476 FFF676FF 18C48300 0005A79A 006A0A76 FF0C76FF 271A68F0 Þh.'.v..v.j..]....ó..v-.v¶.vš.võ 000080
76FF18C4 83000005 019A006A 0A76FF0C 76FF271A 68F076FF F276FF10 6A020468 h..j..v·.vÞh.'.v..v.j..]....ó..v 0000A0
006A0A76 FF0C76FF 271A68F0 76FFF276 FF0F6A02 0468EA76 FFEC76FF F476FFF6 -.v¶.vš.võh..j..v·.vÞh.'.v..v.j. 0000C0
76FF2714 68F076FF F276FF13 6A5016F8 468D01EA E9000088 18C48300 0005F79A .%....ó.ı..Õõ..F½.Pj..v·.vÞh.'.v 0000E0
FF00D6E9 FE468800 F7E90375 FA4608F8 468812C4 83000006 2D9A006A 0A76FF0C ..v.j..-....ó..F½.F°u.Õ%..F±Õ•.. 000100
0006589A 006AF876 FFFA76FF 272668F0 76FFF276 FFEA76FF EC76FFF4 76FFF676 v-.v¶.vš.võ.v·.vÞh&'.v°.v½j..X.. 000120
FF272468 F076FFF2 76FFEA76 FFEC76FF F476FFF6 76FF018E E9000088 14C48300 ..ó.ı..Õ...v-.v¶.vš.võ.v·.vÞh$'. 000140
F076FFF2 76FF5016 E2468D01 63E90000 8814C483 0000067C 9A006AF8 76FFFA76 v°.v½j..|....ó.ı..Õc..Fã.P.v·.vÞ 000160
880008E9 037400EE 7E83EE46 8910C483 00000605 9A006A0A 76FF0C76 FF27E968 hÕ'.v..v.j..ı....ó..FŸ.-Ÿ.t.Õ... 000180
0007489A F476FFF6 76FFEA76 FFEC76FF 02386800 63E90003 E90374E4 4608E246 Fã.FÕt.Õ..Õc.h;..vš.võ.v-.v¶.H.. 0001A0
FFFA76FF 272868F0 76FFF276 FFE276FF E476FFEA 76FFEC76 FFF476FF F676FF00 ..v-.v¶.vš.võ.võ.vã.v·.vÞh('.v°. 0001C0
00103DFF 22E90375 000E3000 18E900E6 E9000088 18C48300 00071A9A 006AF876 v½j.......ó.ı..Õl.Õ..=..u.Õ".=.. 0001E0
```

Dump of file SATURN:[PCCOMMON.DUMP.DLL]DMLGLOB.TMP;1 on 18-APR-1990 10:44:56.67
File ID (627,22,0)   End of file block 315 / Allocated 316

Virtual block number 97 (00000061), 512 (0200) bytes

```
1B68F076 FFF276FF FE76FF50 16E6468D 0000E9FF 30E90375 00123DFF 70E90375 u.Õp.=..u.Õ=.Õ...F|.P.v±.v·.vÞh. 000000
E9000088 0006E903 74E84608 E6468812 C4830000 03C99A00 6A0A76FF 0C76FF27 '.v..v.j..è....ó..F|.FÕt.Õ..j..Õ 000020
68004CE9 0000075F 9AF476FF F676FFEA 76FFEC76 FF028468 0048E9FE 46880096 ...F±ÕH.h...vš.võ.v-.v¶._...ÕL.h 000040
FFEA76FF EC76FF02 38680035 E9000007 769AF476 FFF676FF EA76FFEC 76FF0294 ...vš.võ.v-.v¶.v...Õ5.h;..vš.võ. 000060
FFD6E903 7500103D FFC7E903 75000F3D 0018E900 1EE90000 FFFF9AF4 76FFF676 v-.v¶....Õ..Õ..=..u.Õú.=..u.Õ•. 000080
FFF276FF 006A0204 68EA76FF EC76FFF4 76FFF676 FF0000E9 FFA0E903 75001230 =..u.Õ..Õ...v-.v¶.vš.võh..j..v·. 0000A0
0008C8C8 C95F5E1F 0000E918 C4830000 05539A00 6AE676FF E876FF27 1A68F076 vÞh.'.vÕ.v|j..S....ó.Õ...^ èùà.. 0000C0
4683FA56 89F84689 FE578826 FC478826 0E5EC404 0E4683D8 8E0484B8 1E565700 .WV.|Ç..Ä.F..ó^.&.G=&.W±.F%.V°.F 0000E0
FA76FF13 6AFC76FF FE76FF07 6AFE5689 FC4689FE 578B26FC 478B260E 5E.'040E ..ó^.&.G=&.W±.F=.V±j..v±.v=j..v° 000100
08C8C8C9 5F5E1F00 00E914C4 83000007 8E9A006A 0A76FF0C 76FF2718 68F.'6FF .V½h.'.v..v.j..ƒ....ó.Õ...^ èùà. 000120
83FA5689 F84689FE 578B26FC 478B260E 5EC4040E 4683D88E 07D5B81E 5657L000 ..WV.|l..Ä.F..ó^.&.G=&.W±.F%.V°. 000140
76FF136A FC76FFFE 76FF076A FE5689FC 4689FE57 8B26FC47 8B260E5E C4040E46 F..ó^.&.G=&.W±.F=.V±j..v±.v=j..v 000160
C8C8C95F 5E1F0000 E914C483 0000081F 9A006A0A 76FF0C76 FF271968 F876FFFA °.V½h.'.v..v.j........ó.Õ...^ èùà 000180
F85689F6 4689FE57 8B26FC47 8B260E5E C4040E46 83D88E08 36881E56 57000016 ...WV.|6..Ä.F..ó^.&.G=&.W±.F=.V½ 0001A0
FE478B26 0E5EC402 0E4683F2 5689F046 89FE578B 26FC478B 260E5EC4 040E4683 .F..ó^.&.G=&.W±.FÞ.V·.F..ó^.&.G± 0001C0
FE578B26 FC478B26 0E5EC404 0E4683F4 4689FE47 8B260E5E C4020E46 83EA4689 .Fõ.F..ó^.&.G±.F¶.F..ó^.&.G=&.W± 0001E0
```

Dump of file SATURN:[PCCOMMON.DUMP.DLL]DMLGLOB.TMP;1 on 18-APR-1990 10:44:56.67
File ID (627,22,0)   End of file block 315 / Allocated 316

Virtual block number 98 (00000062), 512 (0200) bytes

```
0468F076 FFF276FF 5016FA46 8DFA4689 EA468800 07C626F0 5EC4FE56 89FC4689 .F=.V±ó^Þ&ó...Fõ.F°.F°.P.v·.vÞh. 000000
FFFE76FF 18C48300 0009669A 006A0A76 FF0C76FF 271A68F6 76FFFB76 FF006A02 .j..v½.v-h.'.v..v.j..f....ó..v±. 000020
EC4680FA 4689EA46 8B0007C6 26F05EC4 00000A09 9AF076FF F276FFF4 76FFFC76 v=.v¶.v·.vÞ.....ó^Þ&ó...Fõ.F°.F§ 000040
EC468812 C4830000 099E9A00 6A0A76FF 0C76FF27 1B68F676 FFFB76FF 116A5016 .Pj..v½.v-h.'.v..v.j.......ó..F§ 000060
FFFB76FF F076FFF2 76FFEA76 FF5040F4 468BFC76 FFFE76FF 004EE903 75EE4608 .FŸu.ÕN..v±.v=.F¶@P.võ.v·.vÞ.v½. 000080
F676FFF8 76FF5016 EC468018 C4830000 09BC9A00 6AEC76FF EE76FF27 E668F676 v-h|'.vŸ.vš j..Ÿ....ó..Fš.P.v½.v- 0000A0
EA468800 07C626F0 5EC4FFA7 E910C483 00000880 9A006AEC 76FFEE76 FF27DA68 hÕ'.vŸ.všj.......ó.Õl.ó^Þ&ó...Fõ 0000C0
8DF076FF F276FF02 0F680000 09F59A50 16FA468D F076FFF2 76FF0223 68FA4689 .F°h#..v·.vÞ.F°.P.%...h...v·.vÞ. 0000E0
F05EC400 00FFFF9A F076FFF2 76FFF476 FFFC76FF FE76FF00 00052C9A 5016FA46 F°.P.,....v±.v=.v¶.v·.vÞ.....ó^Þ 000100
8E0897B8 1E565700 0068C8C8 C95F5E1F 0000E900 0088FA46 89EA4688 0007C626 &ó...Fõ.F°|..Õ...^ èùàh..WV.|... 000120
478B260E 5EC4020E 4683F056 89EE4689 FE578B26 FC478B26 0E5EC404 0E468308 Ä.F..ó^.&.G=&.W±.FŸ.VÞ.F..ó^.&.G 000140
0E5EC404 0E46839A 56899846 89FE578B 26FC478B 260E5EC4 040E4683 F24689FE ±.F·.F..ó^.&.G=&.W±.F..V..F..ó^. 000160
FC4689FE 578B26FC 478B260E 5EC4040E 4683F656 89F44689 FE578B26 FC478B26 &.G=&.W±.F¶.V-.F..ó^.&.G=&.W±.F= 000180
00000AEF 9A006A0A 76FF0C76 FF271468 EE76FFF0 76FF126A 5016F846 8DFE5689 .V±.F½.Pj..vÞ.vŸh.'.v..v.j..ÿ... 0001A0
0006E903 74FA4608 F8468801 40E9EC46 880006E9 037500EC 7E83EC46 8912C483 .ó..F§.-§.u.Õ...FšÕ@..F½.F°t.Õ.. 0001C0
259A006A F876FFFA 76FF2712 68EE76FF F076FF07 6A50169C 468D012F E9EC4688 .FšÕ/..F..Pj..vÞ.vŸh.'.v°.v½j..% 0001E0
```

```
Dump of file SATURN:[PCCOMMON.DUMP.DLL]DMLGLOB.TMP;1 on 18-APR-1990 10:44:56.67
File ID (627,22,0)   End of file block 315 / Allocated 316

Virtual block number 99 (00000063), 512 (0200) bytes

 08909A50 169C468D 00FDE9EC 46880006 E9037500 EC7E83EC 468912C4 83000009 ....Á..F$.-$.u.Ô...F$Ô»..F..P... 000000
 FF0C76FF 27F868EE 76FFF076 FF9876FF 9A76FFF4 76FFF676 FF50169C 46800000 ...F..P.v-.v¶.v..v..vÞ.vŸh«'.v.. 000020
 46800087 E9EC4688 0006E903 7500EC7E 83EC4689 18C48300 0008719A 006A0A76 v.j..q....Á..F$.-$.u.Ô...F$Ôñ..F 000040
 006AF876 FFFA76FF 271768EE 76FFF076 FF076A50 169C4680 0000FFFF 9A50169C ..P......F..Pj..vÞ.vŸh.'.v°.v½j. 000060
 9A50169C 4680007B E9EC4688 0006E903 7500EC7E 83EC4689 12C48300 0008AB9A .¨....Á..F$.-$.u.Ô...F$Ô(..F..P. 000080
 8300000A AC9A006A 9876FF9A 76FF271E 68EE76FF F076FF50 16E84680 0000FFFF .....FÔ.P.vÞ.vŸh.'.v..v.j..¯.... 0000A0
 FFF476FF F676FF50 169C4680 0041E9EC 46880006 E9037500 EC7E83EC 468910C4 Á..F$.-$.u.Ô...F$ÔA..F..P.v-.v¶. 0000C0
 00000442 9A006A59 6AFC76FF FE76FFEE 76FFF076 FFE876FF EA76FF9B 76FF9A76 v..v..vð.vÔ.vÞ.vŸ.v±.v»jŸj..B... 0000E0
 56570000 0CC8CBC9 5F5E1F00 00E9EC46 880006E9 037500EC 7E83EC46 891CC483 .Á..F$.-$.u.Ô...F$Ô...^_èùà...WV 000100
 C4020E46 83F85689 F64689FE 578826FC 4788260E 5EC4040E 4683088E 0A2D881E .¡·..Ã.F..Á^.&.G»&.W±.F¯.V½.F..Á 000120
 6A0A76FF 0C76FF27 1468F676 FFF876FF 136A5016 FC4680FA 4689FE47 88260E5E ^.&.G±.F°.F».Pj..v½.v-h.'.v..v.j 000140
 003FE903 75FE460B FC468800 4AE90374 00F47E83 F4468912 C4830000 0C8C9A00 .......Á..F¶.-¶.t.ÔJ..F».F±u.Ô?. 000160
 00000835 9A006A0A 76FF0C76 FF271968 F676FFF8 76FF136A FC76FFFE 76FF076A j..v±.v»j..v½.v-h.'.v..v.j..5... 000180
 FFF44689 0AC483C? 00FFFF9A 006AFC76 FFFE76FF F676FFF8 76FFF446 8914C483 .Á..F¶.v½.v-.v±.v»j.......Á..F¶. 0001A0
 12C48300 00FFFF9A 006A0676 FF0876FF 0A76FF0C 76FF026A F676FFF8 76FFFA76 v°.v½.v-j.·.v..v..v..v.j.......Á. 0001C0
 5EC4040E 4683088C 0C12881E 56570000 18C8CBC9 5F5E1F00 00E9F446 88F44689 .F¶.F¶Ô...^_èùà...WV.¡...Ã.F..Á^ 0001E0

Dump of file SATURN:[PCCOMMON.DUMP.DLL]DMLGLOB.TMP;1 on 18-APR-1990 10:44:56.67
File ID (627,22,0)   End of file block 315 / Allocated 316

Virtual block number 100 (00000064), 512 (0200) bytes

 4689FE57 8826FC47 88260E5E C4040E46 83F45689 F24689FE 578826FC 4788260E .&.G»&.W±.F·.V¶.F..Á^.&.G»&.W±.F 000000
 68F276FF F476FF0E 6A5016FC 4680F646 89FE4788 260E5EC4 020E4683 EA5689E8 Ô.Vð.F..Á^.&.G±.F-.F».Pj..v¶.v·h 000020
 46880008 E9037400 EC7E83EC 468912C4 83000000 899A006A 0A76FF0C 76FF2714 .'.v..v.j.......Á..F$.-&.t.Ô...F 000040
 16F8468D 0000FFFF 9A5016F8 4680F676 FF00EEE9 99B3B800 06E90374 FE4608FC ».F±t.Ô..¡°.ÔŸ..v-.F½.P......F½. 000060
 14C48300 0000C69A 006AFC76 FFFE76FF 3E8068F2 76FFF476 FFE876FF EA76FF50 P.vð.vÔ.v¶.v·h.>.v±.v»j..ó....Á. 000080
 EE468D00 A0E99983 88000000 E09AF876 FFFA76FF 0011E903 7500EC7E 83EC4689 .F$.-$.u.Ô...v°.v½.Ã...¡°.Ô...FŸ 0000A0
 EC468912 C4830000 0E189A00 6A0A76FF 0C76FF27 1468F276 FFF476FF 0F6A5016 .Pj..v¶.v·h.'.v..v.j.......Á..F$ 0000C0
 F04608EE 46880063 E9998888 00000E32 9AF876FF FA76FF00 11E90375 00EC7E83 .-$.u.Ô...v°.v½.2...¡¡.Ôc..FŸ.FÞ 0000E0
 FF27EF68 F276FFF4 76FFE876 FFEA76FF F876FFFA 76FFF676 FF0F6A00 47E90375 u.ÔG.j..v-.v°.v½.vð.vÔ.v¶.v·hÿ'. 000100
 76FFFA76 FF0011E9 037500EC 7E83EC46 8918C483 00000C52 9A006AEE 76FFF076 vÞ.vŸj..R....Á..F$.-$.u.Ô...v°.v 000120
 5F5E1F00 00E9EC46 880000FF FF9AF876 FFFA76FF 0011E9EC 46880000 0E439AF8 ½.C....F$Ô...v°.v½......F$Ô...^_ 000140
 FC4689FE 578826FC 4788260E 5EC4040E 4683D88E 0CE6881E 56570000 08C8CBC9 èùà...WV.¡|..Ã.F..Á^.&.G»&.W±.F» 000160
 000107C7 26F85EC4 FA5689F8 4689FE57 8826FC47 88260E5E C4040E46 83FE5689 .V±.F..Á^.&.G»&.W±.F½.V°Á^½&ú... 000180
 88260E5E C4040E46 83088E0E 5A881E56 57000030 C8C8C95F 5E1F0000 E9000088 ¡..Ô...^_èùàO..WV.¡Z..Ã.F..Á^.&. 0001A0
 56890246 89FE5788 26FC4788 260E5EC4 040E4683 E25689E0 4689FE57 8826FC47 G»&.W±.FÃ.Vã.F..Á^.&.G»&.W±.F°.V 0001C0
 4689FE57 8826FC47 88260E5E C4040E46 83004689 FE478826 0E5EC402 0E468304 Á.F..Á^.&.G±.FÅ.F..Á^.&.G»&.W±.F 0001E0

Dump of file SATURN:[PCCOMMON.DUMP.DLL]DMLGLOB.TMP;1 on 18-APR-1990 10:44:56.67
File ID (627,22,0)   End of file block 315 / Allocated 316

Virtual block number 101 (00000065), 512 (0200) bytes

 8DE44689 00468800 07C62602 5EC4E646 89FE4788 260E5EC4 020E4683 ¡/^689F0 Þ.V·.F..Á^.&.G±.F¦Á^@&ó...FÅ.Fð. 000000
 8912C483 00000F7E 9A006A0A 76FF0C76 FF271468 E076FFE2 76FF136A 50150646 F».Pj..vã.vÁh.'.v..v.j..~....Á.. 000020
 76FF0000 0F579A50 16EC4680 E676FF02 0FE9DE46 880006E9 0375000E 7E830E46 FB.-B.u.Ô...FBÔ...v|.F$.P.W....v 000040
 FFE276FF EC76FFEE 76FF0044 E90375D8 46080646 88000000 689A5016 F4468DE6 |.F¶.P.h....F».FÅu.ÔD..vŸ.v$.vã. 000060
 76FFF476 FFF676FF 0E468910 C4830000 0FA09A00 6AD676FF D876FF51 4168E076 vÁhAQ.vÁ.v»j.......Á..FB.v-.v¶.v 000080
 F476FFF6 76FFDE46 8910C483 0000104A 9A006AD6 76FFD876 FF514068 E076FFE2 ã.vÁhaQ.vÁ.v»j..J....Á..FB.v-.v¶ 0000A0
 D25EC401 67E90374 00003000 0010809A 5016DA46 8DF476FF F676FF00 0010709A .p....v-.v¶.FÔ.P.....=..t.Ôg.Á^@ 0000C0
 D476FF00 0011129A D276FFD4 76FF026A DA76FFDC 76FFE076 FFE276FF 0007C626 &ó...vã.vÁ.vÉ.vÔj..vÁ.v@......vÁ 0000E0
 F276FF04 20681E04 17681E0C C4831016 011E9AF0 76FFF276 FF041468 1E0276FF .v@.h...v·.vÞ......Á..h...h ..v· 000100
 D476FF50 16E4468D E4468900 46880007 C626D25E C40CC483 1064011E 9AF076FF .vÞ...d..Á.Á^@&ó...FÅ.FÔ.FÔ.P.vÁ 000120
 C4830000 10A39A00 6A0A76FF 0C76FF27 1A68E076 FFE276FF 0F6A0204 680276FF .v@h..j..vã.vÁh.'.v..v.j..É....Á 000140
 9AEC76FF EE76FF0C C4831129 011E9AF0 76FFF276 FF042568 1ED276FF D476FF18 ..vÁ.v@.h%..v·.vÞ...)..Á..vŸ.v$. 000160
 16FC468D 00A5E903 74000030 0000FFFF 9A5016F8 4680EC76 FFEE76FF 0000FFFF .....vŸ.v$.F½.P.....=..t.ÔÉ..F». 000180
 DE7E830E 468910C4 83000000 3B9A006A F876FFFA 76FF2710 68E076FF E276FF50 P.vã.vÁh.'.v°.v½j..;....Á..FB.-B 0001A0
 00FFFF9A 5016E846 8D0A6AFC 76FFFE76 FFE076FF E276FFFF 88E90003 E9037500 .u.Ô..ÔÉ..vã.vÁ.v±.v»;..FÔ.P.... 0001C0
 56390040 E90374E8 4639DC56 88DA4688 FF94E900 03E90375 000E7E83 DE468900 ..FB.-B.u.Ô..Ô...FÔ.VÉ FÔt.Ôa.9V 0001E0
```

```
Dump of file SATURN:[PCCOMMON.DUMP.DLL]DMLGLOB.TMP;1 on 18-APR-1990 10:44:56.67
File ID (627,22,0)   End of file block 315 / Allocated 316

Virtual block number 102 (00000066), 512 (0200) bytes

 76FF0476 FF026AFC 76FFFE76 FFE076FF E276FF00 07C62602 5EC40038 E90374EA ôt.Ö8.á^ØÄó...vä.vÅ.v±.v•j..vå.v 000000
 43E90CC4 83FFFF01 1E9AF076 FFF276FF 0428681E 0276FF04 76FF0000 FFFF9AD2 Ø......vå.vØ.h+..v .vÞ......á.ÒC 000020
 0000E900 00880000 00A39AF4 76FFF676 FF000011 469AEC76 FFEE76FF FE81E9FF .Õ.±.vŸ.vš.F....v-.v¶.È...¡..Õ.. 000040
 FE578826 FC478826 0E5EC404 0E468308 8E0EA388 1E565700 0008C8C8 C95F5E1F .^_èüà...WV.¡È..Ä.F..á^.&.G•&.W± 000060
 76FFFA76 FFFA5689 F84689FE 578826FC 4788260E 5EC4040E 4683FE56 89FC4689 .F•.V±.F..á^.&.G•&.W±.F%.V°.v°.v 000080
 1F0000E9 12C48300 000F289A 006A0A76 FF0C76FF 271468FC 76FFFE76 FF136AF8 %j..v±.v•h.'.v..v.j..(....á.Õ... 0000A0
 89FE5788 26FC4788 260E5EC4 040E4683 D88E115D 881E5657 000008C8 CBC95F5E ^_èüà...WV.¡]..Ä.F..á^.&.G•&.W±. 0000C0
 07C726FC 5EC4FE56 89FC4689 FE578826 FC478826 0E5EC404 0E4683FA 5689F846 F%.V°.F..á^.&.G•&.W±.F•.V±á^•&ú. 0000E0
 0E5EC404 0E468308 8E118C88 1E565700 0014C8C8 C95F5E1F 0000E900 0088020F ..¡..Õ...^_èüà...WV.¡¥..Ä.F..á^. 000100
 040E4683 FE4689FE 4788260E 5EC4020E 4683F856 89F64689 FE578826 FC478826 &.G•&.W±.F-.V%.F..á^.&.G±.F±.F.. 000120
 FE578826 FC478826 0E5EC404 0E4683F2 5689F046 89FE5788 26FC4788 260E5EC4 á^.&.G•&.W±.FÞ.V·.F..á^.&.G•&.W± 000140
 B69A006A 0A76FF0  76FF2714 68F676FF F876FF0F 6A5016FA 468DEE56 89EC4689 .F±.VŸ.F°.Pj..V%.v-h.'.v..v.j..Ñ 000160
 0375FC46 08FA4688 004DE9F4 46880006 E9037500 F47E83F4 468912C4 83000012 ....á..F¶.-¶.u.Õ...F¶ÖM..F°.F•u. 000180
 FC76FF27 1A68F676 FFF876FF 006AFE76 FFF076FF F276FFEC 76FFEE76 FF002DE9 Õ-..vŸ.vš.v·.vÞ.v±j..v%.v-h.'.v• 0001A0
 B80006E9 F4468800 06E90375 00F47E83 F4468918 C4830000 11A59A00 6AFA76FF .v°j..È....á..F¶.-¶.u.Õ...F¶Õ..¡ 0001C0
 4788260E 5EC4040E 4683D88E 1205881E 56570000 14C8C8C9 5F5E1F00 00E90000 ..Õ...^_èüà...WV.¡...Ä.F..á^.&.G 0001E0

Dump of file SATURN:[PCCOMMON.DUMP.DLL]DMLGLOB.TMP;1 on 18-APR-1990 10:44:56.67
File ID (627,22,0)   End of file block 315 / Allocated 316

Virtual block number 103 (00000067), 512 (0200) bytes

 F45689F2 4689FE57 8826FC47 88260E5E C4040E46 83F05689 EE4689FE 578826FC •&.W±.FŸ.VÞ.F..á^.&.G•&.W±.F·.V¶ 000000
 FC4689FE 578826FC 4788260E 5EC4040E 4683F646 89FE4788 260E5EC4 020E4683 .F..á^.&.G±.F-.F..á^.&.G•&.W±.F• 000020
 00001432 9A006A0A 76FF0C76 FF271468 EE76FFF0 76FF026A 5016F846 80FE5689 .V±.F%.Pj..vÞ.vŸh.'.v..v.j..2... 000040
 76FFF476 FF0089E9 F6468801 32E9EC46 880006E9 037500EC 7E83EC46 8912C483 .á..F±.-±.u.Õ...F±Õ2..F-Õ...v¶.v 000060
 F076FFF8 76FFFA76 FF006A00 6A006A00 6A006A00 6A006A00 6A006A00 6A006AF2 ·j.j.j.j.j.j.j.j.j.j..v°.v%.vÞ 000080
 76FFF476 FF005CE9 EC46892A C4830000 130E9A00 6A396AFC 76FFFE76 FFEE76FF .vŸ.v±.v•j9j..B....á°.F±Õ\..v¶.v 0000A0
 F076FFF8 76FFFA76 FF006A00 6A006A00 6A006A00 6A006A00 6A006A00 6A006AF2 ·j.j.j.j.j.j.j.j.j.j..v°.v%.vÞ 0000C0
 A6E999B0 B8001CE9 EC46892A C4830000 08EC9A00 6A3B6AFC 76FFFE76 FFEE76FF .vŸ.v±.v•j;j..$....á°.F±Õ..¡§.Õ[ 0000E0
 0006E903 7500EC7E 83FFE4E9 FFA7E903 75003830 FF6FE903 7500393D 0013E900 .Õ..=9.u.Õo.=;.u.Õ[.Õö..-±.u.Õ.. 000100
 6AF876FF FA76FF27 EA68EE76 FFF076FF 37FF2602 77FF26FC 5EC40081 E9EC4688 .F±Õ..á^•&.w.&.7.vÞ.vŸhõ'.v°.v%j 000120
 76FFF476 FF004CE9 EC468800 06E90375 00EC7E83 EC468910 C4830000 14639A00 ..c....á..F$.-±.u.Õ...F±ÕL..v¶.v 000140
 EC7E83EC 468910C4 83000012 6F9A006A 0A76FF0C 76FF2802 68EE76FF F076FFF2 ·.vÞ.vŸh.(.v..v.j..o....á..F$.-± 000160
 000CA59A 006A0A76 FF0C76FF EE76FFF0 76FF106A 001BE9EC 46880006 E9037500 .u.Õ...F±Õ..j..vÞ.vŸ.v .v.j..È.. 000180
 260E5EC4 040E4683 D88E12E2 881E5657 000010C8 C8C95F5E 1F0000E9 0CC48300 ..á.Õ...^_èüà...WV.¡ä..°.F..á^.& 0001A0
 C4040E46 83F64689 FE478826 0E5EC402 0E4683F4 5689F246 89FE5788 26FC4788 .G•&.W±.F-.V¶.F..á^.&.G±.F-.F..á 0001C0
 4689FE46 89000088 000007C7 26F85EC4 FA5689F8 4689FE57 8826FC47 88260E5E ^.&.G•&.W±.F%.V°á^Y&ú...¡...F±.F 0001E0

Dump of file SATURN:[PCCOMMON.DUMP.DLL]DMLGLOB.TMP;1 on 18-APR-1990 10:44:56.67
File ID (627,22,0)   End of file block 315 / Allocated 316

Virtual block number 104 (00000068), 512 (0200) bytes

 9A006A0A 76FF0C76 FF271468 F276FFF4 76FF136A 5016FC46 8D006AE9 F64688FC •.F-Õj..F•.Pj..v¶.v·h.'.v..v.j.. 000000
 00008800 0107C726 F85EC400 0EE90375 FE4608FC 4688F046 8912C483 0000134C L....á..FÞ.F•.F±u.Õ..á^Y&ú...¡.. 000020
 76FF0876 FF0A76FF 0C76FF28 1268F276 FFF476FF F676FFF8 76FFFA76 FF0049E9 Õl..v°.v%.v-.v¶.v·h.(.v..v..v..v 000040
 86E90375 00103DFF 8EE90375 000E3000 1BE9001E E916C483 00000CC9 9A006A06 .j..è....á.Õ..Õ..=..u.Õ..=..u.Õ. 000060
 06468808 8E14A488 1E565700 0000C8C8 C95F5E1F FFB7E9FF 7EE90375 00123DFF .=..u.Õ-.Õñ..^_èüà...WV.¡È..Ä.F. 000080
 6A316AFF FF68FFFF 68D88E15 89881E56 57000002 C8C8C95F 5E1F0000 E9085688 .V.Õ...^_èüà...WV.¡...Äh..h..j1j 0000A0
 E9FE4688 FE468918 C4830000 FFFF9A00 6A3A6A02 6A006A00 6A006A04 38681E01 ..h8.j.j.j.j.j:j.......á..F±.F±Õ 0000C0
 0008093C 0203005E 00051510 02030283 000A0FB1 02030013 90C8C95F 5E1F0000 ...^_èü.....Ÿ...°.......^...<... 0000E0
 0005139E 02030264 00080854 02030256 0008080E 02030068 00051554 02030246 F...T...k.......V...T...d....... 000100
 002E15A3 0002008F 0005148D 02030000 002C1000 00020208 000A0FC1 0203007E -...é...Ä...................È... 000120
 000A113B 02031581 000E15AB 000502EC 000A0F4A 02030000 000E15A8 00020000 ...............J...ž........;... 000140
 000610C0 0203023C 000809E2 02030038 000515C2 02030128 00060FE9 020302F7 %...Õ...(...ò...8...ã...<...ë... 000160
 040E4683 D88EFFFF 88155657 00008AC8 00000000 00000000 00000000 0000014E N...............à...WV.¡...Ä.F.. 000180
 FE578826 FC478826 0E5EC404 0E4683E4 5689E246 89FE5788 26FC4788 260E5EC4 á^.&.G•&.W±.Fã.VÕ.F..á^.&.G•&.W± 0001A0
 C4040E46 83C85689 C64689FE 578826FC 4788260E 5EC4040E 4683F656 89F 689 .F¶.V-.F..á^.&.G•&.W±.Fó.Và.F..á 0001C0
 89FE5788 26FC4788 260E5EC4 040E4683 CE5689CC 4689FE57 8826FC47 8826 5E ^.&.G•&.W±.Fä.Vö.F..á^.&.G•&.W±. 0001E0
```

```
Dump of file SATURN:[PCCOMMON.DUMP.DLL]DMLGLOB.TMP;1 on 18-APR-1990 10:44:56.67
File ID (627,22,0)   End of file block 315 / Allocated 316

Virtual block number 105 (00000069), 512 (0200) bytes

 5EC4040E 46830256 89D04689 FE578826 FC478826 0E5EC404 0E4683FE 5689FC46 F•.V±.F..ó^.&.G=&.W±.FÅ.V@.F..ó^ 000000
 0E4683F2 4689FE47 88260E5E C4020E46 830C5689 DA4689FE 578826FC 4788260E .&.G=&.W±.FÖ.VÉ.F..ó^.&.G±.F·.F. 000020
 E6468800 39E90374 DC46080A 4688E856 89E64689 FE578826 FC478826 0E5EC404 .ó^.&.G=&.W±.F|.VÒ.FÖ.FÉt.Ö9..F| 000040
 0001779A 006A7A76 FF0C76FF 27FE68E2 76FFE476 FF028868 002EE903 74E84608 .FÒt.Ö..h...vÖ.väh±'.v..v.j..w.. 000060
 880224E9 037500F2 7E83047D E9D84688 0006E903 7500D87E 83084689 0EC48300 ..ó..FÅ.-Å.u.Ö...FÅÖ)..~·.u.Ö$.. 000080
 FF006A00 6A066A00 6A006A00 39E90374 D2460800 46880219 E90374E8 4608E646 f|.FÒt.Ö...FÅ.F@t.Ö9.j.j.j.j.j.. 0000A0
 83084689 1AC48300 0002939A 006A486A 50160046 80E276FF E476FFF4 76FFF676 v-.v¶.vÖ.vå.FÅ.PjHj.......ó..FÅ. 0000C0
 76FF27E8 68E276FF E476FF50 16F84680 066A0425 E9084688 0006E903 7500D87E -Å.u.Ö...FÅÖX.j..F%.P.vÖ.vähÖ'.v 0000E0
 03F3E908 46880006 E9037500 D87E8308 468912C4 83000001 A89A006A D076FFD2 @.vÅj..`....ó..FÅ.-Å.u.Ö...FÅÖ¤. 000100
 8910C483 000001EC 9A006AF4 76FFF676 FF27E968 E276FFE4 76FF5016 FF768680 ..v..P.vÖ.vähÖ'.v-.v¶j..&....ó.. 000120
 FF7A868D 0123E903 74FE4608 FC468803 C2E90846 880006E9 03750008 7E830846 FÅ.-Å.u.Ö...FÅÖó..f•.F±t.Ö#...±. 000140
 0000021E 9A006AFF 7686FFFF 7886FF44 0468E276 FFE476FF F876FFFA 76FF5016 .P.v°.v%.vÖ.väh.D.Åx..Åv.j...... 000160
 E276FFE4 76FF5016 D4468003 7EE90846 880006E9 03750008 7E830846 8914C483 .ó..FÅ.-Å.u.Ö...FÅÖ-..FÅ.P.vÖ.vä 000180
 06E90375 00087E83 D8468910 C4830000 02569A00 6AFF7686 FFFF7886 FF271E68 h.'.Åx..Åv.j..V....ó..FÅ.-Å.u.Ö. 0001A0
 D676FF27 2268E276 FFE476FF 056A5016 FF7A868D 5016EE46 8D034CE9 D8468800 ..FÅÖL..FŸ.P..±..Pj..vÖ.väh"'.v@ 0001C0
 FF0314E9 D8468800 06E90375 00087E83 D8468916 C4830000 02039A00 6AD476FF .vÅj..&....ó..FÅ.-Å.u.Ö...FÅÖ... 0001E0

Dump of file SATURN:[PCCOMMON.DUMP.DLL]DMLGLOB.TMP;1 on 18-APR-1990 10:44:56.67
File ID (627,22,0)   End of file block 315 / Allocated 316

Virtual block number 106 (0000006A), 512 (0200) bytes

 486A5016 FC4680E2 76FFE476 FFF476FF F676FF50 16FF7A86 8D056AEE 76FFF076 vÞ.vŸj...±..P.v-.v¶.vÖ.vä.F•.PjH 000000
 FFFA76FF 02D7E9D8 46880006 E9037500 D87E8308 46891AC4 830000FF FF9A006A j.......ó..FÅ.-Å.u.Ö...FÅÖ•..v°. 000020
 FC76FFFE 76FF27E8 68E276FF E476FF50 16EE4680 056AFF76 86FFFF78 86FFF876 v%.Åx..Åv.j..FŸ.P.vÖ.·ähÖ'.v±.v• 000040
 8D0044E9 0297E9D8 46880006 E9037500 D87E8308 46891AC4 83000003 1A9A006A j.......ó..FÅ.-Å.u.Ö...FÅÖ..ÖD.. 000060
 0168E276 FFE476FF FF7686FF FF7886FF F876FFFA 76FF5016 EE468D50 16FF7A86 .±..P.FŸ.P.v°.v%.Åx..Åv..vÖ.väh. 000080
 D8468800 06E90375 00087E83 D846891C C4830000 03409A00 6AFC76FF FE76FF28 (.v±.v•j..M....ó..FÅ.-Å.u.Ö...FÅ 0000A0
 0003809A 006A0A76 FF0C76FF 27D868E2 76FFE476 FF0E6AC6 76FFC876 FF0250E9 ÖP..vå.vój..vÖ.vähÅ'.v..v.j..... 0000C0
 76FF106A CC76FFCE 76FF021D E9D84688 0006E903 7500D87E 83084689 12C48300 ..ó..FÅ.-Å.u.Ö...FÅÖ...vö.väj..v 0000E0
 03750008 7E830846 8912C483 00000383 9A006A0A 76FF0C76 FF27D868 E276FFE4 Ö.vähÅ'.v..v.j..°....ó..FÅ.-Å.u. 000100
 0A76FF0C 76FF27D8 68E276FF E476FF13 6AFC76FF FE76FF01 EAE90846 880006E9 Ö...FÅÖô..v±.v•j..vÖ.vähÅ'.v..v. 000120
 FFD276FF 0187E9D8 46880006 E9037500 D87E8308 468912C4 830000FF FF9A006A j.......ó..FÅ.-Å.u.Ö...FÅÖñ..v@. 000140
 D8468912 C4830000 04199A00 6A0A76FF 0C76FF27 D868E276 FFE476FF 116AD076 vÅj..vÖ.vähÅ'.v..v.j.......ó..FÅ 000160
 27D868E2 76FFE476 FF0F6ADA 76FF0C76 FF0184E9 D8468800 06E90375 00087E83 .-Å.u.Ö...FÅÖ...vÉ.vÖj..vÖ.vähÅ' 000180
 E9D84688 0006E903 7500D87E 83084689 12C48300 0004599A 006A0A76 FF0C76FF .v..v.j..Y....ó..FÅ.-Å.u.Ö...FÅÖ 0001A0
 271868E2 76FFE476 FF146AE6 76FFE876 FF076A00 29E90375 E84608E6 46880151 Q..F|.FÖu.Ö).j..vÖ.v|j..vÖ.väh.' 0001C0
 FF010EE9 037500F2 7E830117 E9D84689 14C48300 0004E59A 006A0A76 FF0C76FF .v..v.j..|....ó..FAÖ...~·.u.Ö... 0001E0

Dump of file SATURN:[PCCOMMON.DUMP.DLL]DMLGLOB.TMP;1 on 18-APR-1990 10:44:56.67
File ID (627,22,0)   End of file block 315 / Allocated 316

Virtual block number 107 (0000006B), 512 (0200) bytes

 666A5016 E64680E2 76FFE476 FFEE76FF F076FF50 16FF7A86 803B6A0A 76FF0C76 v..v.j;..±..P.vÞ.vŸ.vÖ.vä.F|.Pjf 000000
 88CC4688 0007E9D8 46880006 E9037500 D87E8308 46891AC4 83000001 459A006A j..E....ó..FÅ.-Å.u.Ö...FÅÖ•..Fä. 000020
 F076FFE6 76FFE876 FF5016CA 46805016 EA468000 00CA46C7 E056890E 4689CE56 Vö.F8.VÅúFò...Fö.P.Fò.P.vÖ.v|.vÞ 000040
 83084689 1CC48300 0005319A 006AC676 FFC876FF 280368E2 76FFE476 FFEE76FF .vŸ.vÖ.väh.(.vå.vój..1....ó..FÅ. 000060
 46805016 EA468000 74E90375 E04608DE 46880085 E9D84688 0006E903 7500087E -Å.u.Ö...FÅÖ...F8.FÅu.Öt..Fö.P.F 000080
 006ADE76 FFE076FF 280368E2 76FFE476 FFEE76FF F076FFE6 76FFE876 FF5016CA ò.P.vÖ.v|.vÞ.vŸ.vÖ.väh.(.vÅ.v8j. 0000A0
 FF50160E 46800039 E9D84688 0006E903 7500087E 83084689 1CC48300 0005619A .•....ó..FÅ.-Å.u.Ö...FÅÖ9..F8.P. 0000C0
 7500087E 83084689 10C48300 0000ED9A 006ADE76 FFE076FF 270A68E2 76FFE476 vÖ.vähÖ'.vÅ.v8j..Ú....ó..FÅ.-Å.u 0000E0
 881E5657 00001EC8 CBC95F5E 1F0000E9 D84688FF 81E90009 E9D84688 0006E903 .Ö...FÅÖ..Ö...FÅÖ...^_èùà...WV.| 000100
 0E5EC402 0E4683F2 5689F046 89FE5788 26FC4788 260E5EC4 040E4683 D88E0008 ...Å.F..ó^.&.G=&.W±.FÞ.V·.F..ó^. 000120
 FC478826 0E5EC404 0E4683FC 4689FE47 88260E5E C4020E46 83FE4689 FE478826 &.G±.F±.F..ó^.&.G±.F=.F..ó^.&.G• 000140
 83F65689 F44689FE 578826FC 4788260E 5EC4040E 4683EC56 89EA4689 FE578826 &.W±.Fö.V$.F..ó^.&.G=&.W±.F¶.V-. 000160
 FFF676FF 00000725 9AF476FF F676FFEA 76FFEC76 FF028868 00ECE903 7400FE7E -±.t.Ö$.h...v$.vÖ.v-.v¶.X....v-. 000180
 599A006A 0A76FF0C 76FF271A 68F076FF F276FF0E 6A020468 EA76FFEC 76FFF476 v¶.v$.vöh..j..v·.vÞh.'.v..v.j..Y 0001A0
 271A68F0 76FFF276 FF106A02 0468EA76 FFEC76FF F476FFF6 76FF18C4 83000006 ....ó..v-.v¶.v$.vöh..j..v·.vÞh.' 0001C0
 6A020468 EA76FFEC 76FFF476 FFF676FF 18C48300 0006839A 006A0A76 FF0C76FF .v..v.j.......ó..v-.v¶.v$.vöh..j 0001E0
```

```
Dump of file SATURN:[PCCOMMON.DUMP.DLL]DMLGLOB.TMP;1 on 18-APR-1990 10:44:56.67
File ID (627,22,0)   End of file block 315 / Allocated 316

Virtual block number 108 (0000006C), 512 (0200) bytes

F476FFF6 76FF18C4 83000006 AD9A006A 0A76FF0C 76FF271A 68F076FF F276FF13 ..v·.vPh.'.v..v.j..Ù....ä..v-.v¶ 000000
0006079A 006A0A76 FF0C76FF 271A68F0 76FFF276 FF116A02 0468EA76 FFEC76FF .vš.võh..j..v·.vPh.'.v..v.j..■.. 000020
76FF271A 68F076FF F276FF0F 6A020468 EA76FFEC 76FFF476 FFF676FF 18C48300 ..å..v-.v¶.vš.võh..j..v·.vPh.'.v 000040
76FFF276 FF146A50 16F84680 0250E900 008818C4 83000006 F09A006A 0A76FF0C ..v.j..».....å.¡..ÕP..F½.Pj..v·.v 000060
88013EE9 0375FA46 08F84688 12C48300 0007479A 006A0A76 FF0C76FF 271468F0 Ph.'.v..v.j..G....é..F½.Fªu.Õ>.. 000080
FFF476FF F676FF00 00FFFF9A F476FFF6 76FFEA76 FFEC76FF 02776801 15E9FE46 FzÕ..hw..vš.võ.v-.v¶......v-.v¶. 0000A0
008814C4 83000007 729A006A F876FFFA 76FF2723 68F076FF F276FFEA 76FFEC76 vš.võ.v·.vPh#'.vª.v½j..r....é.¡. 0000C0
6AF876FF FA76FF27 2468F076 FFF276FF EA76FFEC 76FFF476 FFF676FF 01E0E900 .ÕÄ..v-.v¶.vš.võ.v·.vPh$'.vª.v½j 0000E0
76FFF276 FFEA76FF EC76FFF4 76FFF676 FF01B5E9 00008814 C4830000 07909A00 .......é.¡..Õç..v-.v¶.vš.võ.v·.v 000100
FF5016E2 4680018A E9000088 14C48300 0003E69A 006AF876 FFFA76FF 272668F0 Ph&'.vª.v½j..▌....å.¡..Õ...Fä.P. 000120
7400EE7E 83EE4689 10C48300 00081A9A 006A0A76 FF0C76FF 27E968F0 76FFF276 v·.vPhÕ'.v..v.j.......é..FŸ.-Ÿ.t 000140
76FFF676 FFEA76FF EC76FF02 38680068 E90003E9 0374E446 08E24688 0008E903 .Õ...Fä.Fõt.Õ..Õk.h;..vš.võ.v-.v 000160
2868F076 FFF276FF E276FFE4 76FFEA76 FFEC76FF F476FFF6 76FF0000 08959AF4 ¶......v-.v¶.vš.võ.vÕ.vã.v·.vPh( 000180
E9037500 0E300023 E90100E9 00008818 C4830000 08679A00 6AF876FF FA76FF27 '.vª.v½j..g....é.¡..Õ..Õ#.=..u.Õ 0001A0
E6468000 00E9FF0A E9037500 1330FF68 E9037500 1130FED8 E9037500 1030FF40 M.=..u.ÕÜ±=..u.Õh.=..u.Õ..Õ...F¦ 0001C0
468812C4 83000009 2A9A006A 0A76FF0C 76FF271B 68F076FF F276FFFE 76FF5016 .P.v±.v·.vPh.'.v..v.j..ª....é..F 0001E0

Dump of file SATURN:[PCCOMMON.DUMP.DLL]DMLGLOB.TMP;1 on 18-APR-1990 10:44:56.67
File ID (627,22,0)   End of file block 315 / Allocated 316

Virtual block num. :r 109 (00000060), 512 (0200) bytes

76FFEA76 FFEC76FF 02846800 5FE9FE46 880085E9 00008800 06E90374 E84608E6 ▌.Fõt.Õ..¡..Õç..FzÕ_.h...vš.võ.v 000000
000008C3 9AF476FF F676FFEA 76FFEC76 FF029468 0068E900 0008AC9A F476FFF6 -.v¶.¯...Õk.h...vš.võ.v-.v¶.ú... 000020
EC76FF02 38680030 E9000008 DA9AF476 FFF676FF EA76FFEC 76FF0277 680054E9 Õ[.hw..vš.võ.v-.v¶.Õ...Õ=.h;..vš 000040
75001030 FFB0E903 75000F30 0023E900 26E90000 06089AF4 76FFF676 FFEA76FF .võ.v-.v¶.....Õ&.Õ#.=..u.Õ¯.=..u 000060
EC76FFF4 76FFF676 FF0000E9 FF81E903 75001330 FFCEE903 75001130 FFBFE903 .Õ¢.=..u.Õö.=..u.Õ..Õ...v-.v¶.vš 000080
C4830000 062F9A00 6AE676FF E876FF27 1A68F076 FFF276FF 006A0204 68EA76FF .võh..j..v·.vPh.'.vÕ.v¦j../....é 0000A0
FC478826 0E5EC404 0E4683D8 8E059088 1E565700 0008C8C8 C95F5E1F 0000E918 .Õ...^_èùà...WV.¡...Ä.F..é^.&.G= 0000C0
6AFE5689 FC4689FE 578826FC 4788260E 5EC4040E 4683FA56 89F84689 FE578826 &.W±.F½.Vª.F..é^.&.G=&.W±.F=.V±j 0000E0
83000007 C19A006A 0A76FF0C 76FF2718 68F876FF FA76FF14 6AFC76FF FE76FF07 ..v±.v=j..vª.v½h.'.v..v.j..ê.... 000100
4788260E 5EC4040E 4683D88E 0941881E 56570000 08C8C8C9 5F5E1F00 00E914C4 é.Õ...^_èùà...WV.¡A..Ä.F..é^.&.G 000120
FE5689FC 4689FE57 8826FC47 88260E5E C4040E46 83FA5689 F84689FE 578826FC =&.W±.F½.Vª.F..é^.&.G=&.W±.F=.V± 000140
0000098B 9A006A0A 76FF0C76 FF271968 F876FFFA 76FF146A FC76FFFE 76FF076A j..v±.v=j..vª.v½h.'.v..v.j...... 000160
88260E5E C4040E46 83D88E09 A2881E56 57000016 C8C8C95F 5E1F0000 E914C483 .é.Õ...^_èùà...WV.¡Å..Ä.F..é^.&. 000180
5689F046 89FE5788 26FC4788 260E5EC4 040E4683 F85689F6 4689FE57 8826FC47 G=&.W±.F¯.V½.F..é^.&.G=&.W±.FP.V 0001A0
0E4683F4 4689FE47 98260E5E C4020E46 83EA4689 FE478826 0E5EC402 0E4683F2 ·.F..é^.&.G±.Fõ.F..é^.&.G±.F¶.F. 0001C0
80FA4689 EA468800 07C626F0 5EC4FE56 89FC4689 FE578826 FC478826 0E5EC404 .é^.&.G=&.W±.F=.V±é^P&ó...Fõ.Fª. 0001E0

Dump of file SATURN:[PCCOMMON.DUMP.DLL]DMLGLOB.TMP;1 on 18-APR-1990 10:44:56.67
File ID (627,22,0)   End of file block 315 / Allocated 316

Virtual block number 110 (0000006E), 512 (0200) bytes

006A0A76 FF0C76FF 271A68F6 76FFF876 FF006A02 0468F076 FFF276FF 5016FA46 Fª.P.v·.vPh..j..v½.v-h.'.v..v.j. 000000
26F05EC4 0000FFFF 9AF076FF F276FFF4 76FFFC76 FFFE76FF 18C48300 000A029A .■....é..v±.v=.v¶.v·.vP.....é^P& 000020
6A0A76FF 0C76FF27 1868F676 FFF876FF 126A5016 EC468DFA 4689EA46 880007C6 ó...Fõ.Fª.F$.Pj..v½.v-h.'.v..v.j 000040
FF5040F4 4688FC76 FFFE76FF 004EE903 75EE4608 EC468812 C4830000 080A9A00 .......é..F$.FŸu.ÕN..v±.v=.F¶aP. 000060
C4830000 08289A00 6AEC76FF EE76FF27 E668F676 FFF876FF F076FFF2 76FFEA76 võ.v·.vP.v½.v-h¦'.vŸ.vše¡..(....é 000080
E910C483 000009EC 9A006AEC 76FFEE76 FF270A68 F676FFF8 76FF5016 EC468018 ..F$.P.v½.v-hÕ'.vŸ.všj..å....é.Õ 0000A0
07F29A50 16FA4680 F076FFF2 76FF0223 68FA4689 EA468800 07C626F0 5EC4FFA7 [.é^P&ó...Fõ.Fªh#..v·.vP.Fª.P.·. 0000C0
76FFF476 FFFC76FF FE76FF00 00084E9A 5016FA46 80F076FF F276FF02 88680000 ..h...v·.vP.Fª.P.N....v±.v=.v¶.v 0000E0
C95F5E1F 0000E900 0088FA46 89EA4688 0007C626 F05EC400 000AA89A F076FFF2 ·.vP.·...é^P&ó...Fõ.Fª¡..Õ...^ è 000100
89EE4689 FE578826 FC478826 0E5EC404 0E4683D8 8E0A0388 1E565700 0068C8C8 ùàh..WV.¡...Ä.F..é^.&.G=&.W±.FŸ. 000120
89FE5788 26FC4788 260E5EC4 040E4683 F24689FE 4788260E 5EC4020E 4683F056 VP.F..é^.&.G±.F·.F..é^.&.G=&.W±. 000140
5EC4040E 4683F656 89F44689 FE578826 FC478826 0E5EC404 0E46839A 56899846 F..V..F..é^.&.G=&.W±.F¶.V-.F..é^ 000160
FF271468 EE76FFF0 76FF136A 5016F846 80FE5689 FC4689FE 578826FC 4788260E .&.G=&.W±.F=.V±.F½.Pj..vP.vŸh.'. 000180
40E9EC46 880006E9 037500EC 7E83EC46 8912C483 00000C58 9A006A0A 76FF0C76 v..v.j..[....é..F$.~$.u.Õ...F$Õã 0001A0
68EE76FF F076FF07 6A50169C 4680012F E9EC4688 0006E903 74FA4608 F8468801 ..F½.Fªt.Õ...F$Õ/..F..Pj..vP.vŸh 0001C0
46880006 E9037500 EC7E83EC 468912C4 8300000C A19A006A F876FFFA 76FF2712 .'.vª.v½j..À....é..F$.-$.u.Õ...F 0001E0
```

Dump of file SATURN:[PCCOMMON.DUMP.DLL]DMLGLOB.TMP;1 on 18-APR-1990 10:44:56.67
File ID (627,22,0)   End of file block 315 / Allocated 316

Virtual block number 111 (0000006F), 512 (0200) bytes

```
FF9876FF 9A76FFF4 76FFF676 FF50169C 46800000 0CFC9A50 169C468D 00FDE9EC šÕ»..F..P.•....F..P.v-.v¶.v..v.. 000000
7500EC7E 83EC4689 18C48300 000CDD9A 006A0A76 FF0C76FF 27F868EE 76FFF076 vÞ.vŸh«'.v..v.j..Ì....á..Fš.-š.u 000020
76FFF076 FF076A50 169C468D 0000FFFF 9A50169C 468000B7 E9EC468B 0006E903 .Õ...FšÕñ..F..P......F..Pj..vÞ.v 000040
0006E903 7500EC7E 83EC4689 12C48300 0000179A 006AF876 FFFA76FF 271768EE Ÿh.'.vº.v½j.......á..Fš.-š.u.Õ.. 000060
76FF271E 68EE76FF F076FF50 16E8468D 0000FFFF 9A50169C 4680007B E9EC468B .FšÕ(..F..P......FÕ.P.vÞ.vŸh.'.v 000080
0041E9EC 46880006 E9037500 EC7E83EC 468910C4 8300000A 919A006A 9876FF9A ..v.j.......á..Fš.-š.u.Õ...FšÕA. 0000A0
FE76FFEE 76FFF076 FFE876FF EA76FF98 76FF9A76 FFF476FF F676FF50 169C468D .F..P.v-.v¶.v..v..võ.vÕ.vÞ.vŸ.v± 0000C0
00E9EC46 8B0006E9 037500EC 7E83EC46 891CC483 00000493 9A006A59 6AFC76FF .v•jŸj.......á..Fš.-š.u.Õ...FšÕ. 0000E0
578826FC 4788260E 5EC4040E 4683D88E 0899B81E 56570000 0CC8C8C9 5F5E1F00 ..^_èùà...WV.¡...Ä.F..á^.&.G•&.W 000100
FFF876FF 146A5016 FC468DFA 4689FE47 88260E5E C4020E46 83F85689 F64689FE ±.F¯.V½.F..á^.&.G±.Fº.F•.Pj..v½. 000120
4AE90374 00F47E83 F4468912 C4830000 0DF89A00 6A0A76FF 0C76FF27 1468F676 v-h.'.v..v.j..½....á..F¶.-¶.t.ÕJ 000140
FF271968 F676FFF8 76FF146A FC76FFFE 76FF076A 003FE903 75FE460B FC468800 ..F•.F±u.Õ?.j..v±.v•j..v½.v-h.'. 000160
006AFC76 FFFE76FF F676FFF8 76FFF446 8914C483 00000C18 9A006A0A 76FF0C76 v..v.j.......á..F¶.v½.v-.v±.v•j. 000180
FF0876FF 0A76FF0C 76FF026A F676FFF8 76FFFA76 FFF44689 0AC48300 00FFFF9A ......á..F¶.vº.v½.v-j..v..v..v.. 0001A0
56570000 20C8C8C9 5F5E1F00 00E9F446 88F44689 12C48300 00FFFF9A 006A0676 v.j.......á..F¶.F¶Õ...^_èùà ..WV 0001C0
C4040E46 83F45689 F24689FE 578826FC 4788260E 5EC4040E 4683D88E 007E881E .¡-..Ä.F..á^.&.G•&.W±.F¯.V¶.F..á 0001E0
```

Dump of file SATURN:[PCCOMMON.DUMP.DLL]DMLGLOB.TMP;1 on 18-APR-1990 10:44:56.67
File ID (627,22,0)   End of file block 315 / Allocated 316

Virtual block number 112 (00000070), 512 (0200) bytes

```
4680F646 89FE4788 260E5EC4 020E4683 E25689E0 4689FE57 8826FC47 88260E5E ^.&.G•&.W±.FÀ.Vâ.F..á^.&.G±.F-.F 000000
468912C4 83000000 8E9A006A 0A76FF0C 76FF2714 68F276FF F476FF0E 6A5016FC •.Pj..v¶.v·h.'.v..v.j../....á..F 000020
4680F676 FF01C5E9 99838800 06E90374 FE4608FC 46880008 E9037400 E87E83E8 Õ.-Õ.t.Õ...F•.F±t.Õ..¡º.Õé..v-.F 000040
FFFE76FF 3E8068F2 76FFF476 FFE076FF E276FF50 16F8468D 0000FFFF 9A5016F8 ½.P......F½.P.vâ.vÀ.v¶.v·h.>.v±. 000060
4C9AF876 FFFA76FF 0011E903 7500E87E 83E84689 14C48300 000F329A 006AFC76 v•j..2....á..FÕ.-Õ.u.Õ...vº.v½.L 000080
6A0A76FF 0C76FF27 1468F276 FFF476FF 106A5016 E4468D01 77E999B3 8800000F ...¡º.Õw..FÕ.Pj..v¶.v·h.'.v..v.j 0000A0
00000FA8 9AF876FF FA76FF00 11E90375 00E87E83 E8468912 C4830000 0F8E9A00 .......á..FÕ.-Õ.u.Õ...vº.v½.´... 0000C0
F676FF00 83E90375 F0460BEE 4688F056 89EE4689 E65688E4 4688013A E998E888 ¡/.Õ:..FÕ.V¦.FŸ.vÞ.FŸ.FÞu.Õ...v- 0000E0
0FC99A00 6AEE76FF F076FF27 F468F276 FFF476FF E076FFE2 76FFF876 FFFA76FF .vº.v½.vâ.vÀ.v¶.v·h¶'.vÞ.vŸj..è. 000100
E999BEB8 00000FE3 9AF876FF FA76FF00 11E90375 00E87E83 E8468916 C4830000 ...á..FÕ.-Õ.u.Õ...vº.v½.D...¡/.Õ 000120
10C48300 0010099A 006AEE76 FFF076FF 270A68F2 76FFF476 FF5016EE 4680000E ß..FŸ.P.v¶.v·hÕ'.vÞ.vŸj.......á. 000140
FF72E900 A3E999BE 88000010 239AF876 FFFA76FF 0011E903 7500E87E 83E84689 .FÕ.-Õ.u.Õ...vº.v½.#...¡/.ÕÈ.Õr. 000160
12C48300 001058 9A 006A0A76 FF0C76FF 271468F2 76FFF476 FF0F6A50 16EA468D .Fõ.Pj..v¶.v·h.'.v..v.j..[....á. 000180
EA468800 63E99998 88000010 759AF876 FFFA76FF 0011E903 7500E87E 83E84689 .FÕ.-Õ.u.Õ...vº.v½.u...¡¡.Õc..Fõ 0001A0
68F276FF F476FF 0 76FFE276 FFF876FF FA76FFF6 76FF0F6A 0047E903 75EC460B .Fšu.ÕG.j..v-.vº.v½.vâ.vÀ.v¶.v·h 0001C0
76FF0011 E9037500 E87E83E8 46891 8C4 8300000E A79A006A EA76FFEC 76FF27EF ÿ'.vš.võj..Ì....á..FÕ.-Õ.u.Õ...v 0001E0
```

Dump of file SATURN:[PCCOMMON.DUMP.DLL]DMLGLOB.TMP;1 on 18-APR-1990 10:44:56.67
File ID (627,22,0)   End of file block 315 / Allocated 316

Virtual block number 113 (00000071), 512 (0200) bytes

```
0000E9E8 46880000 FFFF9AF8 76FFFA76 FF0011E9 E8468800 0010869A F876FFFA º.v½......FÕÕ...vº.v½......FÕÕ.. 000000
FE578826 FC478826 0E5EC404 0E46830B 8E0E5288 1E565700 0008C8C8 C95F5E1F .^_èùà...WV.¡R..Ä.F..á^.&.G•&.W± 000020
C726F85E C4FA5689 F84689FE 578826FC 4788260E 5EC4040E 4683FE56 89FC4689 .F•.V±.F..á^.&.G•&.W±.F½.Vºá^½&ú 000040
5EC4040E 4683088E 1090881E 56570000 14C8C8C9 5F5E1F00 00E90000 88000107 ...¡..Õ...^_èùà...WV.¡...Ä.F..á^ 000060
0E4683FE 4689FE47 88260E5E C4020E46 83F85689 F64689FE 578826FC 4788260E .&.G•&.W±.F¯.V½.F..á^.&.G±.F±.F. 000080
578826FC 4788260E 5EC4040E 4683F256 89F04689 FE578826 FC478826 0E5EC404 .á^.&.G•&.W±.FÞ.V·.F..á^.&.G•&.W 0000A0
9A006A0A 76FF0C76 FF271468 F676FFF8 76FF0F6A 5016FA46 80EE5689 EC4689FE ±.Fš.VŸ.Fº.Pj..v½.v-h.'.v..v.j.. 0000C0
75FC460B FA468800 40E9F446 880006E9 037500F4 7E83F446 8912C483 00001197 .....á..F¶.-¶.u.Õ...F¶ÕM..Fª.F•u 0000E0
76FF271A 68F676F+ F876FF00 6AFE76FF F076FFF2 76FFEC76 FFEE76FF 0020E903 .Õ·..vŸ.vš.v·.vÞ.v±j..v½.v-h.'.v 000100
0006E9F4 46880006 E9037500 F47E83F4 468918C4 8300000E F59A006A FA76FFFC •.vºj..%....á..F¶.-¶.u.Õ...F¶Õ.. 000120
88260E5E C4040E46 83088E10 E6881E56 57000008 C8C8C95F 5E1F0000 E9000088 ¡..Õ...^_èùà...WV.¡[..Ä.F..á^.&. 000140
5689F846 89FE5788 26FC4788 260E5EC4 040E4683 FE5689FC 4689FE57 8826FC47 G•&.W±.F•.V±.F..á^.&.G•&.W±.F½.V 000160
83000011 509A006A 0A76FF0C 76FF2714 68FC76FF FE76FF14 6AF876FF FA76FFFA º.vº.v½j..v±.v•h.'.v..v.j..P.... 000180
4788260E 5EC4040E 4683088E 11C3881E 56570000 08C8C8C9 5F5E1F00 00E912C4 á.Õ...^_èùà...WV.¡ú..Ä.F..á^.&.G 0001A0
FE5689FC 4689FE57 8826FC47 88260E5E C4040E46 83FA5689 F84689FE 578826FC •&.W±.F½.Vº.F..á^.&.G•&.W±.F•.V± 0001C0
83088E12 22881E56 57000014 C8C8C95F 5E1F0000 E9000088 028807C7 26FC5EC4 á^•&ú...¡..Õ...^_èùà...WV.¡"..À. 0001E0
```

```
Dump of file SATURN:[PCCOMMON.DUMP.DLL]DMLGLOB.TMP;1 on 18-APR-199. 10:44:56.67
File ID (627,22,0)   End of file block 315 / Allocated 316

Virtual block number 114 (00000072), 512 (0200) bytes

26FC478B 260E5EC4 040E4683 F05689EE 4689FE57 8B26FC47 8B260E5E C4040E46 F..ó^.&.G=&.Wt.FŸ.Vþ.F..ó^.&.G=& 000000
8B260E5E C4040F46 83F64689 FE478B26 0E5EC402 0E4683F4 5689F246 89FE578B .Wt.F..V¶.F..ó^.&.Gt.F-.F..ó^.&. 000020
FF0C76FF 27146dEE 76FFF076 FF026A50 16F8468D FE5689FC 4689FE57 8B26FC47 G=&.Wt.F=.Vt.F½.Pj..vþ.vŸh.'.v.. 000040
4688012F E9EC468B 0006E903 7500EC7E 83EC4689 12C48300 0013889A 006A0A76 v.j..j....ó..F$.-$.u.Õ...F$Õ/..F 000060
006A006A 006A006A 006A006A 006A006A 006A006A 006AF276 FFF476FF 0086E9F6 -Õ...v¶.v.j.j.j.j.j.j.j.j.j.j. 000080
46892AC4 83000013 649A006A 396AFC76 FFFE76FF EE76FFF0 76FFF876 FFFA76FF .vª.v½.vþ.vŸ.vt.v=j9j..d....óª.F 0000A0
FFFA76FF 006A006A 006A006A 006A006A 006A006A 006AF276 FFF476FF 0059E9EC $ÕY..v¶.v.j.j.j.j.j.j.j.j.j..vª. 0000C0
1CE9EC46 8926C483 00000D58 9A006AF6 76FFFC76 FFFE76FF EE76FFF0 76FFF876 v½.vþ.vŸ.vt.v=.v-j..X....ó&.F$Õ. 0000E0
EC7E83FF E4E9FFAA E9037500 3A30FF72 E9037500 393D0013 E900A6E9 998D8800 .i§.Õl.Õ..=9.u.Õr.=:.u.Õ¯.ÕÕ..-& 000100
FF27EA68 EE76FFF0 76FF37FF 260277FF 26FC5EC4 0081E9EC 46880006 E9037500 .u.Õ...F$Õ..ó^=&.w.&.7.vþ.vŸhõ'. 000120
4CE9EC46 880006E9 037500EC 7E83EC46 8910C483 000013E9 9A006AF8 76FFFA76 vª.v½j..Õ....ó..F$.-$.u.Õ...F$ÕL 000140
10C48300 0012089A 006A0A76 FF0C76FF 280268EE 76FFF076 FFF276FF F476FF00 ..v¶.v..vþ.vŸh.(.v..v.j.......ó. 000160
0A76FF0C 76FFEE76 FFF076FF 106A001B E9EC468B 0006E903 7500EC7E 83EC4689 .F$.-$.u.Õ...F$Õ..j..vþ.vŸ.v..v. 000180
4683D88E 1268881E 56570000 10C8CBC9 5F5E1F00 00E90CC4 8300000E 119A006A j.......ó.Õ...^_èùâ...WV.¡k..Ä.F 0001A0
4689FE47 8B260E5E C4020E46 83F45689 F24689FE 578B26FC 478B260E 5EC4040E ..ó^.&.G=&.Wt.F¯.V¶.F..ó^.&.Gt.F 0001C0
00880000 07C726F8 5EC4FA56 89F84689 FE578B26 FC478B26 0E5EC404 0E4683F6 -.F..ó^.&.G=&.Wt.F½.Vªó^½&ú...¡. 0001E0

Dump of file SATURN:[PCCOMMON.DUMP.DLL]DMLGLOB.TMP;1 on 18-APR-1990 10:44:56.67
File ID (627,22,0)   End of file block 315 / Allocated 316

Virtual block number 115 (00000073), 512 (0200) bytes

0C76FF27 1468F276 FFF476FF 146A5016 FC468000 6AE9F646 88FC4689 FE468900 ..Ft.F=.F-Õj..F=.Pj..v¶.v.h.'.v. 000000
C726F85E C4000EE9 0375FE46 08FC4688 F0468912 C4830000 12D59A00 6A0A76FF .v.j..(....ó..Fþ.F=.Ftu.Õ..ó^½&ú 000020
76FF0C76 FF281268 F276FFF4 76FFF676 FFF876FF FA76FF00 51E90000 88000107 ...|..ÕQ..vª.v½.v-.v¶.v.h.(.v..v 000040
30FF8EE9 0375000E 30D023E9 0026E916 C4830000 0E359A00 6A0676FF 0876FF0A ..v..v.j..5....ó.Õ£.Õ#.=..u.Õ..= 000060
C8C8C95F 5E1FFFAF E9FF76E9 03750013 30FF7EE9 03770011 30FFC2E9 03730010 ..s.Õõ.=..w.Õ-.=..u.Õv.Õ£..^_èùà 000080
1E565700 0002C8CB C95F5E1F 0000E908 56880646 8BD88E14 2AB81E56 57000000 ...WV.¡ª..Ä.F..V.Õ...^_èùâ..¯WV. 0000A0
9A006A3B 6A026A00 6A006A00 6A049268 1E016A31 6AFFFF68 FFFF6808 8E15178B ¡...Äh..h..j1j..h..j.j¯j.j.j;j.. 0000C0
005E0005 14960203 000E90CB C95F5E1F 0000E9FE 4688FE46 8918C483 0000FFFF .....ó..Ft.FtÕ...^_èù.........^. 0000E0
02640008 0CC00203 02560008 0C7A0203 00680005 140A0203 02460008 08750203 ..u...F...Õ...k...z...V...å...d. 000100
02EC000A 0E040203 0000002E 15310002 008F0005 14130203 007E0005 13270203 ..'...-.............1.......å...å. 000120
150F000F 15390005 00380005 15500203 02F7000A 0F0F0203 0000000F 15360002 ..6...........%...P...8...9..... 000140
040E4683 D88EFFFF 881E5657 0000A2C8 00000000 00000000 023C0008 08610203 ..a...<.........åÄ..WV.¡...Ä.F.. 000160
FE578B26 FC478B26 0E5EC404 0E4683D8 56890646 89FE578B 26FC478B 260E5EC4 ó^.&.G=&.Wt.F=.VÄ.F..ó^.&.G=&.Wt 000180
89FE478B 260E5EC4 020E4683 E84689FE 478B260E 5EC4020E 4683EC56 89EA4689 .Fõ.V$.F..ó^.&.Gt.FÕ.F..ó^.&.Gt. 0001A0
8B260E5E C4040E46 83C45689 C24689FE 578B26FC 478B260E 5EC4040E 4683EE46 FŸ.F..ó^.&.G=&.Wt.Fõ.Vó.F..ó^.&. 0001C0
5689F046 89FE578B 26FC478B 260E5EC4 040E4683 FE5689FC 4689FE57 8B26FC47 G=&.Wt.F=.Vt.F..ó^.&.G=&.Wt.Fþ.V 0001E0

Dump of file SATURN:[PCCOMMON.DUMP.DLL]DMLGLOB.TMP;1 on 18-APR-1990 10:44:56.67
File ID (627,22,0)   End of file block 315 / Allocated 316

Virtual block number 116 (00000074), 512 (0200) bytes

478B260E 5EC4040E 4683CC56 89CA4689 FE578B26 FC478B26 0E5EC404 0E4683F2 ..F..ó^.&.G=&.Wt.Fò.Vä.F..ó^.&.G 000000
C85689C6 4689FE57 8B26FC47 8B260E5E C4040E46 83865689 844689FE 578B26FC =&.Wt.FÇ.VÑ.F..ó^.&.G=&.Wt.Fó.Và 000020
FC478B26 0E5EC404 0E4683D0 5689CE46 89FE578B 26FC478B 260E5EC4 040E4683 .F..ó^.&.G=&.Wt.Fö.VÀ.F..ó^.&.G= 000040
838A5689 884689FE 578B26FC 478B260E 5EC4040E 46838056 89AE4689 FE578B26 &.Wt.FÜ.V¯.F..ó^.&.G=&.Wt.Fj.Va. 000060
89FE478B 260E5EC' 020E4683 F65689F4 4689FE57 8B26FC47 8B260E5E C4040E46 F..ó^.&.G=&.Wt.F¶.V-.F .ó^.&.Gt. 000080
0224E903 7500E67  830C5689 DA4689FE 578B26FC 478B260E 5EC4040E 4683E646 Fl.F..ó^.&.G=&.Wt.FÕ.Vt -l.u.Õ$. 0000A0
006A006A 066A006A 006A0039 E90374B6 460B8446 880219E9 03740C46 080A468B .FÕ.F£t.Õ...FÇ.FÑt.Õ9.j.,.j.j.j. 0000C0
C046891A C4830000 02D49A00 6A486A50 1684468D D676FFD8 76FFEA76 FFEC76FF .v$.võ.vÄ.v=.FÇ.PjHj..å....ó..Få 0000E0
FF27E868 D676FFD8 76FF5016 F8468D06 6A0553E9 C0468800 06E90375 00C07E83 .-å.u.Õ...FåÕS.j..F½.P.vÄ.v=hÕ'. 000100
21E9C046 880006E9 037500C0 7E83C046 8912C483 000001E9 9A006A84 76FFB676 vÑ.vÇj..Õ....ó..Få.-å.u.Õ...FåÕ! 000120
10C48300 0002209A 006AEA76 FFEC76FF 27E96806 76FFD876 FF5016FF 5E868005 ...^..P.vÄ.v=hÕ'.v$.võj..-....ó. 000140
62868001 23E90374 FE4608FC 468804F0 E9C0468B 0006E903 7500C07E 83C04689 .Få.-å.u.Õ...FåÕþ..F=.Ft.Õ#...b 000160
00025F9A 006AF876 FFFA76FF 440468D6 76FFD876 FFFF5E86 FFFF6086 FF5016FF ..P.Ñ'..Ñ^..vÄ.v=h.D.vª.v½j..... 000180
76FFD876 FF50168C 468D04AC E9C0468B 0006E903 7500C07E 83C04689 14C48300 ..ó..Få.-å.u.Õ...FåÕ¯..FŸ.P.vÄ.v 0001A0
E9037500 C07E83C0 468910C4 83000002 979A006A FF5E86FF FF6086FF 271E6806 =h.'.Ñ'..Ñ^.j.......ó..Få.-å.u.Õ 0001C0
76FF2722 680676FF 0876FF05 6A5016FF 62868050 16E2468D 047AE9C0 46880006 ...FåÕz..Fã.P..b..Pj..vÄ.v=h"'.v 0001E0
```

```
Dump of file SATURN:[PCCOMMON.DUMP.DLL]DMLGLOB.TMP;1 on 18-APR-1990 10:44:56.67
File ID (627,22,0)   End of file block 315 / Allocated 316

Virtual block number 117 (00000075), 512 (0200) bytes

0442E9C0 46880006 E9037500 C07E83C0 468916C4 83000003 149A006A 8C76FFBE ƒ.v¥j.......á..Fâ.-â.u.Õ...FâÕ8. 000000
6A5016FC 468D0676 FFD876FF EA76FFEC 76FF5016 FF628680 056AE276 FFE476FF .vÕ.vâj...b..P.vš.võ.vÁ.vø.F•.Pj 000020
60B6FF04 05E9C046 880006E9 037500C0 7E83C046 891AC483 0000FFFF 9A006A48 Ñj.......á..Fâ.-â.u.Õ...FâÕ...Ñ` 000040
76FFFE76 FF27E868 D676FF08 76FF5016 E2468005 6AF876FF FA76FFFF 5E86FFFF ..Ñ^..v•.v½j..Fã.P.vÄ.vøhÒ'.v±.v 000060
0044E903 C5E9C046 880006E9 037500C0 7E83C046 891AC483 00000358 9A006AFC •j..[....á..Fâ.-â.u.Õ...FâÕ¢.ÕD. 000080
68D676FF D876FFF8 76FFFA76 FFFF5E86 FFFF6086 FF5016E2 46805016 FF628680 ..b..P.Fã.P.Ñ`..Ñ^..v•.v½.vÄ.vøh 0000A0
46880006 E9037500 C07E83C0 46891CC4 83000003 8E9A006A FC76FFFE 76FF2801 .(.v±.v•j.......á..Fâ.-â.u.Õ...F 0000C0
FFFF9A00 6A0A76FF 0C76FF27 0D68D676 FFD876FF EA76FFEC 76FF046A 037EE9C0 âÕ~.j..vš.võ.vÁ.vøhì'.v..v.j.... 0000E0
76FF0F6A 5016EE46 80034BE9 C0468800 06E90375 00C07E83 C0468912 C4830000 ...á..Fâ.-â.u.Õ...FâÕK..F¥.Pj..v 000100
037500C0 7E83C046 8912C483 00000188 9A006A0A 76FF0C76 FF271768 D676FF08 Å.vøh.'.v..v.j..ı....á..Fâ.-â.u. 000120
0A76FF0C 76FF27D8 680676FF 0876FF10 6AC276FF C476FF03 19E9C046 . ^006E9 Õ...FâÕ...vé.vÕj..vÄ.vøhÁ'.v..v. 000140
FFF276FF 02E6E9C0 46880006 E9037500 C07E83C0 468912C4 83000004 26 `006A j..&....á..Fâ.-â.u.Õ...FâÕl..v·. 000160
C0468912 C4830000 04599A00 6A0A76FF 0C76FF27 D8680676 FFD876FF 0E6/5076 vÞj..vÁ.vøhÄ'.v..v.j..Y....á..Fâ 000180
27D868D6 76FFD876 FF186ACA 76FFCC76 FF0283E9 C0468800 06E90375 00C07E83 .-â.u.Õ...FâÕ°..vä.vÒj..vÄ.vøhÄ' 0001A0
E9C04688 0006E903 7500C07E 83C04689 12C48300 0004BC9A 006A0A76 FF0C76FF .v..v.j.ı.....á..Fâ.-â.u.Õ...FâÕ 0001C0
000004BF 9A006A0A 76FF0C76 FF27D868 D676FFD8 76FF1A6A FC76FFFE 76FF0280 ...v±.v•j..vÁ.vøhÁ'.v..v.j..¢... 0001E0

Dump of file SATURN:[PCCOMMON.DUMP.DLL]DMLGLOB.TMP;1 on 18-APR-1990 10:44:56.67
File ID (627,22,0)   End of file block 315 / Allocated 316

Virtual block number 118 (00000076), 512 (0200) bytes

D876FF17 6AB476FF B676FF02 4DE9C046 880006E9 037500C0 7E83C046 8912C483 .á..Fâ.-â.u.Õ...FâÕM..vÑ.vÇj..vÁ 000000
E9037500 C07E83C0 468912C4 83000004 F29A006A 0A76FF0C 76FF27D8 680676FF .vøhÁ'.v..v.j..·....á..Fâ.-â.u.Õ 000020
6A0A76FF 0C76FF27 D8680676 FFD876FF 116AC676 FFC876FF 021AE9C0 46880006 ...FâÕ...vè.vÓj..vÁ.vøhÁ'.v..v.j 000040
76FFD076 FF01E7E9 C0468800 06E90375 00C07E83 C0468912 C4830000 05259A00 ..X....á..Fâ.-â.u.Õ...FâÕÕ..vÁ.v 000060
83C04689 12C48300 0005589A 006A0A76 FF0C76FF 27D868D6 76FFD876 FF146ACE öj..vÁ.vøhÄ'.v..v.j..X....á..Fâ. 000080
FF27D868 D676FFD8 76FF166A AE76FF80 76FF0184 E9C04688 0006E903 7500C07E -â.u.Õ...FâÕÇ..v¯.vÜj..vÁ.vøhÁ'. 0000A0
81E9C046 880006E9 037500C0 7E83C046 8912C483 00000588 9A006A0A 76FF0C76 v..v.j.......á..Fâ.-â.u.Õ...FâÕ. 0000C0
83000005 BE9A006A 0A76FF0C 76FF27D8 680676FF D876FF15 6A8876FF 8A76FF01 ..vo.v¡j..vÄ.vøhÁ'.v..v.j..ƒ.... 0000E0
FFD876FF 196AF476 FFF676FF 014EE9C0 46880006 E9037500 C07E83C0 468912C4 á..Fâ.-â.u.Õ...FâÕM..v~.v¶j..vÁ. 000100
06E90375 00C07E83 C0468912 C4830000 05FE9A00 6A0A76FF 0C76FF27 D8680676 vøhÁ'.v..v.j..±....á..Fâ.-â.u.Õ. 000120
FFD876FF 1C6ADA76 FFDC76FF 076A0029 E90375DC 4608A046 880118E9 C0468800 ..FâÕ...FÖ.FÉu.Õ).j..vÉ.vÖj..vÁ. 000140
7500E67E 8300E1E9 C0468914 C4830000 06A09A00 6A0A76FF 0C76FF27 18680676 vøh.'.v..v.j.......á..FâÕÄ..-Ì.u 000160
E476FF50 16FF6286 80386A0A 76FF0C76 FF00CDE9 03740C46 080A4688 000BE903 .ÕÄ..FÖ.FÉt.Õë..v..v.j;..b..P.vÕ 000180
C07E83C0 46891AC4 83000001 869A006A 666A5016 DA468006 76FFD876 FFE276FF .vä.vÄ.vø.FÖ.Pjfj.......á..Fâ.-â 0001A0
D2468800 008246C7 04568902 4689C456 88C24688 0096E9C0 46880006 E9037500 .u.Õ...FâÕ...Fô.Vé.F@.VâúFý...F@ 0001C0
76FFE276 FFE476FF DA76FFDC 76FF5016 82468050 160E4680 0074E903 75D44608 .Fâu.Õt..FB.P.Fý.P.vÉ.vÖ.vÕ.vä.v 0001E0

Dump of file SATURN:[PCCOMMON.DUMP.DLL]DMLGLOB.TMP;1 on 18-APR-1990 10:44:56.67
File ID (627,22,0)   End of file block 315 / Allocated 316

Virtual block number 119 (00000077), 512 (0200) bytes

037500C0 7E83C046 891CC483 000006D0 9A006AD2 76FFD476 FF280368 D676FFD8 Å.vøh.(.vå.v@j..Å....á..Fâ.-â.u. 000000
9A006AD2 76FFD476 FF27DA68 D676FFD8 76FF5016 02468000 39E9C046 880006E9 Õ...FâÕ9..F@.P.vÄ.vøhÖ'.vå.v@j.. 000020
E9C04688 FF81E900 09E9C046 880006E9 037500C0 7E83C046 8910C483 000003C0 â....á..Fâ.-â.u.Õ...FâÕ..Õ...FâÕ 000040
8826FC47 88260E5E C4040E46 83088E00 08881E56 57000020 C8C8C95F 5E1F0000 ...^ èùâ ..WV.ı...Ä.F..á^.&.G=&. 000060
4788260E 5EC4020E 4683FE46 89FE4788 260E5EC4 020E4683 F05689EE 4689FE57 W±.F¥.VÞ.F..á^.&.G±.F±.F..á^.&.G 000080
0E5EC404 0E4683EA 5689E846 89FE5788 26FC4788 260E5EC4 040E4683 FA4689FE ±.F•.F..á^.&.G=&.W±.FÕ.VÕ.F..á^. 0000A0
E876FFEA 76FF026F 6801E8E9 037400FE 7E83F456 89F24689 FE578826 FC478826 &.G=&.W±.F·.V¶.~±.t.ÕÕ.ho..vÕ.vÒ 0000C0
FFF076FF 0F6A0204 68E876FF EA76FFF2 76FFF476 FF00000A 339AF276 FFF476FF .v¶.v·.3....v¶.v·.võ.vÒh..j..vÞ. 0000E0
76FFEA76 FFF276FF F476FF18 C4830000 07C89A00 6A0A76FF 0C76FF27 1A68EE76 vÝh.'.v..v.j..â....á..v¶.v·.võ.v 000100
FF18C483 000007F2 9A006A0A 76FF0C76 FF271A68 EE76FFF0 76FF106A 020468E8 Òh..j..vÞ.vÝh.'.v..v.j..·....á.. 000120
6A0A76FF 0C76FF27 1A68EE76 FFF076FF 0E6A0204 68E876FF EA76FFF2 76FFF476 v¶.v·.võ.vÒh..j..vÞ.vÝh.'.v..v.j 000140
EE76FFF0 76FF186A 020468E8 76FFEA76 FFF276FF F476FF18 C4830000 081C9A00 .......á..v¶.v·.võ.vÒh..j..vÞ.vÝ 000160
68E876FF EA76FFF2 76FFF476 FF18C483 00000846 9A006A0A 76FF0C76 FF271A68 h.'.v..v.j..F....á..v¶.v·.võ.vÒh 000180
F476FF18 C4830000 08709A00 6A0A76FF 0C76FF27 1A68EE76 FFF076FF 1A6A0204 ..j..vÞ.vÝh.'.v..v.j..p....á..v¶ 0001A0
9A006A0A 76FF0C76 FF271A68 EE76FFF0 76FF176A 020468E8 76FFEA76 FFF276FF .v·.võ.vÒh..j..vÞ.vÝh.'.v..v.j.. 0001C0
1A68EE76 FFF076FF 116A0204 68E876FF EA76FFF2 76FFF476 FF18C483 0000089A .....á..v¶.v·.võ.vÒh..j..vÞ.vÝh. 0001E0
```

```
Dump of file SATURN:[PCCOMMON.DUMP.DLL]DMLGLOB.TMP;1 on 18-APR-1990 10:44:56.67
File ID (627,22,0)   End of file block 315 / Allocated 316

Virtual block number 120 (00000078), 512 (0200) bytes

 020468E8 76FFEA76 FFF276FF F476FF18 C4830000 08C49A00 6A0A76FF 0C76FF27 '.v..v.j..á....á..v¶.v·.võ.vÒh.. 000000
 76FFF476 FF18C483 000008EE 9A006A0A 76FF0C76 FF271A68 EE76FFF0 76FF146A j..vÞ.vŸh.'.v..v.j..Ÿ....á..v¶.v 000020
 09189A00 6A0A76FF 0C76FF27 1A68EE76 FFF076FF 166A0204 68E876FF EA76FFF2 ·.võ.vÒh..j..vÞ.vŸh.'.v..v.j.... 000040
 FF271A68 EE76FFF0 76FF156A 020468E8 76FFEA76 FFF276FF F476FF18 C4830000 ...á..v¶.v·.võ.vÒh..j..vÞ.vŸh.'. 000060
 196A0204 68E876FF EA76FFF2 76FFF476 FF18C483 00000942 9A006A0A 76FF0C76 v..v.j..B....á..v¶.v·.võ.vÒh..j. 000080
 830319E9 00008818 C4830000 09719A00 6A0A76FF 0C76FF27 1A68EE76 FFF076FF .vÞ.vŸh.'.v..v.j..q....á.¡..Õ... 0000A0
 006A0A76 FF0C76FF 271268EE 76FFF076 FF0F6A50 16FC4680 0044E903 740FFE7E ~±.t.ÕD..F•.Pj..vÞ.vŸh.'.v..v.j. 0000C0
 76FFF476 FF04EC68 1EE876FF EA76FF00 15E90375 00FC7E83 12C48300 0009B59A .ç....á..~•.u.Õ...võ.vÒ.h‡..v¶.v 0000E0
 FF0C76FF 271468EE 76FFF076 FF1C6A50 16F64680 02CCE900 00880000 FFFF9AF2 ·.....¡..Õä..F-.Pj..vÞ.vŸh.'.v.. 000100
 F476FF01 15E9FE46 88013EE9 0375F846 08F64688 12C48300 0009E89A 006A0A76 v.j..Š....á..F-.F%u.Õ>..F±Õ...v¶ 000120
 8300000A 169A006A F676FFF8 76FF2723 68EE76FF F076FFE8 76FFEA76 FFF276FF .v·.võ.vÒ.vÞ.vŸh#'.v%.v-j....... 000140
 F876FF27 2468EE76 FFF076FF E876FFEA 76FFF276 FFF476FF 0270E900 008814C4 á.¡..Õp..v¶.v·.võ.vÒ.vÞ.vŸh$'.v% 000160
 FFF476FF E876FFEA 76FF0230 680245E9 00008814 C4830000 0A559A00 6AF676FF .v-j..U....á.¡..ÕE.hO..\õ.vÒ.v¶. 000180
 FFF876FF 272668EE 76FFF076 FFE876FF EA76FFF2 76FFF476 FF00000A AA9AF276 v·.¯....v¶.v·.võ.vÒ.vÞ.vi'h&'.v%. 0001A0
 27E968EE 76FFF076 FF5016E0 46800206 E9000088 14C48300 000A799A 006AF676 v-j..y....á.¡..Õ...FÅ.P.vÞ.vŸhÕ' 0001C0
 08E04688 0008E903 7400EC7E 83EC4689 10C48300 000AD29A 006A0A76 FF0C76FF .v..v.j..•....á..F‡.-‡.t.Õ...FÅ. 0001E0

Dump of file SATURN:[PCCOMMON.DUMP.DLL]DMLGLOB.TMP;1 on 18-APR-1990 10:44:56.67
File ID (627,22,0)   End of file block 315 / Allocated 316

Virtual block number 121 (00000079), 512 (0200) bytes

 76FF0000 FFFF9AF2 76FFF476 FFE876FF EA76FF02 38680068 E90003E9 03; ¯246 Fãt.Õ..Õk.h;..võ.vÒ.v¶.v·......v 000000
 6AF676FF F876FF27 2868EE76 FFF076FF E076FFE2 76FFE876 FFEA76FF F276; «4 ¶.v·.võ.vÒ.vã.vÂ.vÞ.vŸh('.v%.v-j 000020
 E9037500 1030FF39 E9037500 0E300023 E9018 9E9 00008818 C4830000 03F39A)0 ..µ....á.¡..Õ..Õ#.=..u.Õ9.=..u.Õ 000040
 F076FFFE 76FF5016 E4468D00 00E9FEF6 E9037500 1A3DFF68 E9037500 1730FED8 Ü±=..u.Õh.=..u.Õ-±Õ...FÕ.P.v±.vÞ 000060
 06E90374 E64608E4 468812C4 83000007 9E9A006A 0A76FF0C 76FF2718 68EE76FF .vŸh.'.v..v.j.......á..FÕ.F¦t.Õ. 000080
 0008649A F276FFF4 76FFE876 FFEA76FF 02846800 CFE9FE46 880131E9 00008800 ·¡..Õ1..F±Õü.h...võ.vÒ.v¶.v·.d.. 0000A0
 76FF02A8 680000E9 0000087B 9AF276FF F476FFE8 76FFEA76 FF023068 00E7E900 .ÕÕ.hO..võ.vÒ.v¶.v·.(...ÕÅ.h¯..v 0000C0
 76FFF476 FFE876FF EA76FF02 38680089 E9000008 929AF276 FFF476FF E876FFEA õ.vÒ.v¶.v·.....Õ¿.h;..võ.vÒ.v¶.v 0000E0
 0088E900 0008C09A F276FFF4 76FFE876 FFEA76FF 02946800 A2E90000 07779AF2 ·.w...ÕÅ.h...võ.vÒ.v¶.v·.à...Õ.. 000100
 E876FFEA 76FF025F 680074E9 000008D7 9AF276FF F476FFE8 76FFEA76 FF028868 h...võ.vÒ.v¶.v·.•...Õt.h_..võ.vÒ 000120
 E900000C 029AF276 FFF476FF E876FFEA 76FF01FF 68000008 E89AF276 FFF476FF .v¶.v·.Š...h...võ.vÒ.v¶.v̄·.....Õ 000140
 30000E20 002FE900 32E90000 084D9AF2 76FFF476 FFE876FF EA76FF02 8F680049 I.h...võ.vÒ.v¶.v·.M...Õ2.Õ/.·..= 000160
 380BC708 800C380C 3808990C 380C3808 540C1FA7 FF2E93C0 030024E9 03760000 ..v.Õ$..á...T..T.;.;...;.;.¯.ú.; 000180
 FFF076FF 006A0204 68E876FF EA76FFF2 76FFF476 FF086808 3D0BF20C 3808820C ...;.·.=.k...v¶.v·.võ.vÒh..j..vÞ. 0001A0
 0008C8C8 C95F5E1F 0000E918 C4830000 081F9A00 6AE476FF E676FF27 1A68EE76 vŸh.'.vl.võj.......á.Õ...^ èüà.. 0001C0
 4683FA56 89F84689 FE578826 FC478826 0E5EC404 0E468308 8E06FF88 1E565700 .WV.¡...Ä.F..á^.&.G•&.W±.F%.V'.F 0001E0

Dump of file SATURN:[PCCOMMON.DUMP.DLL]DMLGLOB.TMP;1 on 18-APR-1990 10:44:56.67
File ID (627,22,0)   End of file block 315 / Allocated 316

Virtual block number 122 (0000007A), 512 (0200) bytes

 FA76FF1C 6AFC76FF FE76FF07 6AFE5689 FC4689FE 578826FC 4788260E 5EC4040E ..á^.&.G•&.W±.F•.V±j..v±.v•j..v' 000000
 08C8C8C9 5F5E1F00 00E914C4 8300000C 5E9A006A 0A76FF0C 76FF2718 68F876FF .v%h.'.v..v.j..^....á.Õ...^ èüà. 000020
 83FA5689 F84689FE 578826FC 4788260E 5EC4040E 4683D88E 0C75881E 56570000 ..WV.¡U..Ä.F..á^.&.G•&.W±.F%.V'. 000040
 76FF1C6A FC76FFFE 76FF076A FE5689FC 4689FE57 8826FC47 88260E5E C4040E46 F..á^.&.G•&.W±.F•.V±j..v±.v•j..v 000060
 C8C8C95F 5E1F0000 E914C483 00000C8F 9A006A0A 76FF0C76 FF271968 F876FFFA '.v%h.'.v..v.j..¢....á.Õ...^_èüà 000080
 F85689F6 4689FE57 8826FC47 88260E5E C4040E46 83088E0C D6881E56 57000016 ...WV.¡ø..Ä.F..á^.&.G•&.W±.F-.V% 0000A0
 FE478826 0E5EC402 0E4683F2 5689F046 89FE5788 26FC4788 260E5EC4 040E4683 .F..á^.&.G•&.W±.FÞ.V·.F..á^.&.G± 0000C0
 FE578826 FC478826 0E5EC404 0E4683F4 4689FE47 88260E5E C4020E46 83EA4689 .Fõ.F..á^.&.G±.F¶.F..á^.&.G•&.W± 0000E0
 0468F076 FFF276FF 5016FA46 80FA4689 EA468800 07C626F0 5EC4FE56 89FC4689 .F•.V±á^Þ&ó...Fõ.F'.F'.P.v·.vÞh. 000100
 FFFE76FF 18C48300 000E069A 006A0A76 FF0C76FF 271A68F6 76FFF876 FF006A02 .j..v%.v-h.'.v..v.j.......á..v±. 000120
 EC4680FA 4689EA46 880007C6 26F05EC4 00000F22 9AF076FF F276FFF4 76FFFC76 v•.v¶.v·.vÞ."...á^Þ&ó...Fõ.F'.F‡ 000140
 EC468812 C4830000 0E3E9A00 6A0A76FF 0C76FF27 1B68F676 FFF876FF 126A5016 .Pj..v%.v-h.'.v..v.j..>....á..F‡ 000160
 FFF876FF F076FFF2 76FFEA76 FF5040F4 4688FC76 FFFE76FF 004EE903 75EE4608 .FŸu.ÕN..v±.v•.F¶@P.võ.v·.vÞ.v%. 000180
 F676FFF8 76FF5016 EC468D18 C4830000 0E5C9A00 6AEC76FF EE76FF27 E668F676 v-hl'.vŸ.vŠj..\....á..F‡.P.v%.v- 0001A0
 F876FF18 6A5016EC 468DFFA7 E910C483 00000E7F 9A006AEC 76FFEE76 FF27DA68 hÕ'.vŸ.vŠj.......á.ÕI..F‡.Pj..v% 0001C0
 4CE90375 EE4608EC 468812C4 8300000E 879A006A 0A76FF0C 76FF271B 68F676FF .v-h.'.v..v.j..ñ....á..F‡.FŸu.ÕN 0001E0
```

```
Dump of file SATURN:[PCCOMMON.DUMP.DLL]DMLGLOB.TMP;1 on 18-APR-1990 10:44:56.67
File ID (627,22,0)   End of file block 315 / Allocated 316

Virtual block number 123 (0000007B), 512 (0200) bytes

 76FF27E6 68F676FF F876FFF0 76FFF276 FFEA76FF 5040F446 88FC76FF FE76FF00 ..vz.v=.F¶aP.võ.v·.vÞ.v½.v-hl'.v 000000
 FFEE76FF 27DA68F6 76FFF876 FF5016EC 468D18C4 8300000E D59A006A EC76FFEE Ÿ.vŝj..Ì....é..Fŝ.P.v½.~hÖ'.vŸ. 000020
 FF022368 FA468vEA 46880007 C626F05E C4FFA7E9 10C48300 000D209A 006AEC76 vŝj.. ....é.ÕÏ.é^Þ&ó...ı^.F*h#.. 000040
 08A99A50 16FA468D F076FFF2 76FF026F 6800000F 0E9A5016 FA468DF0 76FFF276 v·.vÞ.F*.P.....ho..v·.vÞ.F*.P.`. 000060
 EA468800 07C626F0 5EC40000 FFFF9AF0 76FFF276 FFF476FF FC76FFFE 76FF0000 ...vz.v=.v¶.v·.vÞ.....é^Þ&ó...Fò 000080
 5EC4040E 4683088E 0037B81E 56570000 68C8C8C9 5F5E1F00 00E90000 88FA4689 .F*¡..Õ...^_èùàh..WV.¡7..Ä.F..é^ 0000A0
 0E4683F2 4689FE47 88260E5E C4020E46 83F05689 EE4689FE 578826FC 4788260E .&.G=&.Wz.FŸ.VÞ.F..é^.&.Gz.F·.F. 0000C0
 578826FC 4788260E 5EC4040E 46839A56 89984689 FE578826 FC478826 0E5EC404 .é^.&.G=&.Wz.F..V..F..é^.&.G=&.W 0000E0
 16F8468D FE5689FC 4689FE57 8826FC47 88260E5E C4040E46 83F65689 F44689FE ±.F¶.V~.F..é^.&.G=&.Wz.F=.Vz.F½. 000100
 83EC4689 12C48300 0010089A 006A0A76 FF0C76FF 271468EE 76FFF076 FF1A6A50 Pj..vÞ.vŸh.'.v..v.j.......é..Fŝ. 000120
 80012FE9 EC468800 06E90374 FA460BF8 46880140 E9EC4688 0006E903 7500EC7E -ŝ.u.Õ...FŝÕa..F½.F*t.Õ...FŝÕ/.. 000140
 8912C483 0000104E 9A006AF8 76FFFA76 FF27126B EE76FFF0 76FF076A 50169C46 F..Pj..vÞ.vŸh.'.v*.v½j..N....é.. 000160
 50169C46 80000010 A99A5016 9C468000 FDE9EC46 880006E9 037500EC 7E83EC46 Fŝ.~ŝ.u.Õ...FŝÕ»..F..P.`....F..P 000180
 108A9A00 6A0A76FF 0C76FF27 F868EE76 FFF076FF F476FFF6 76FF9876 FF9A76FF .v..v..v~.v¶.vÞ.vŸh«'.v..v.j.... 0001A0
 00FFFF9A 50169C46 8000B7E9 EC468800 06E90375 00EC7E83 EC468918 C4830000 ...é..Fŝ.~ŝ.u.Õ...FŝÕñ..F..P.... 0001C0
 C4830000 10C49A00 6AF876FF FA76FF27 1768EE76 FFF076FF 076A5016 9C468000 ..F..Pj..vÞ.vŸh.'.v*.v½j..é....é 0001E0

Dump of file SATURN:[PCCOMMON.DUMP.DLL]DMLGLOB.TMP;1 on 18-APR-1990 10:44:56.67
File ID (627,22,0)   End of file block 315 / Allocated 316

Virtual block number 124 (0000007C), 512 (0200) bytes

 E8468D00 00FFFF9A 50169C46 80007BE9 EC468800 06E90375 00EC7E83 EC468912 ..Fŝ.~ŝ.u.Õ...FŝÕ(..F..P......FÒ 000000
 7E83EC46 8910C483 000000C5 9A006A98 76FF9A76 FF271E68 EE76FFF0 76FF5016 .P.vÞ.vŸh.'.v..v.j..é....é..Fŝ.~ 000020
 76FFF476 FFF676FF 9876FF9A 76FF5016 9C468000 41E9EC46 880006E9 037500EC ŝ.u.Õ...FŝÕA..F..P.v..v..v~.v¶.v 000040
 83EC4689 1CC48300 0006439A 006A596A FC76FFFE 76FFEE76 FFF076FF E876FFEA õ.vÒ.vÞ.vŸ.vz.v=jŸj..C....é..Fŝ. 000060
 83D88E0F 46881E56 5700000C C8CBC95F 5E1F0000 E9EC4688 0006E903 7500EC7E ~ŝ.u.Õ...FŝÕ...^_èùà...WV.¡F..Ä. 000080
 89FE4788 260E5EC4 020E4683 F85689F6 4689FE57 8826FC47 88260E5E C4040E46 F..é^.&.G=&.Wz.F~.V½.F..é^.&.Gz. 0000A0
 83000011 A59A006A 0A76FF0C 76FF2714 68F676FF F876FF1C 6A5016FC 468DFA46 F*.F=.Pj..v½.v~h.'.v..v.j..Ë.... 0000C0
 76FFFE76 FF076A00 3FE90375 FE460BFC 4688004A E9037400 F47E83F4 468912C4 é..F¶.~¶.t.ÕJ..F=.Fzu.Õ?.j..vz.v 0000E0
 FFF44689 14C483[illegible]0 000FC59A 006A0A76 FF0C76FF 271968F6 76FFF876 FF1C6AFC =j..v½.v~h.'.v..v.j..é....é..F¶. 000100
 76FFF876 FFFA76FF F446890A C4830000 FFFF9A00 6AFC76FF FE76FFF6 76FFF876 v½.v~.vz.v=j.......é..F¶.v*.v½.v 000120
 E9F44688 F4468912 C4830000 FFFF9A00 6A0676FF 0876FF0A 76FF0C76 FF026AF6 ~j..v..v..v..v.j.......é..F¶.F¶Õ 000140
 8826FC47 88260E5E C4040E46 83D88E11 2B881E56 5700003A C8CBC95F 5E1F0000 ...^_èùà:..WV.¡+..Ä.F..é^.&.G=&. 000160
 0E4683C8 5689C646 89FE5788 26FC4788 260E5EC4 040E4683 EE5689EC 4689FE57 Wz.FŝVŸ.F..é^.&.G=&.Wz.Fó.Và.F. 000180
 76FF0C76 FF271468 EC76FFEE 76FF0E6A 5016FC46 8DF44689 FE478826 0E5EC402 .é^.&.Gz.F¶.F=.Pj..vŸ.vŝh.'.v..v 0001A0
 FC4688C5 79E90646 880006E9 03750006 7E830646 8912C483 00001168 9A006A0A .j..k....é..F=.~=.u.Õ...F=Õy..F= 0001C0
 5016CA46 80000FF FF9A5016 CA468DF4 76FF0568 E9998388 0006E903 74[illegible]608 .Fzt.Õ..¡*.Õh..v¶.Fò.P......Fò.P 0001E0

Dump of file SATURN:[PCCOMMON.DUMP.DLL]DMLGLOB.TMP;1 on 18-APR-1990 10:44:56.67
File ID (627,22,0)   End of file block 315 / Allocated 316

Virtual block number 125 (0000007D), 512 (0200) bytes

 8914C483 000012E5 9A006AFC 76FFFE76 FF3E8068 EC76FFEE 76FFC676 FFC876FF .và.vó.vŸ.vŝh.>.vz.v=j..Ì....é.. 000000
 16F6468D 051AE906 46880000 12FF9ACA 76FFCC76 FF0011E9 03750006 7E830646 F=.~=.u.Õ...vä.vò......F=Õ...F-. 000020
 83D64689 12C48300 0013729A 006A0A76 FF0C76FF 271468EC 76FFEE76 FF106A50 Pj..vŸ.vŝh.'.v..v.j..r....é..F=. 000040
 16084680 F476FF04 0DE90646 88000013 299ACA76 FFCC76FF 0011E903 7500067E ~=.u.Õ...vä.vò.)....F=ÕÌ..v¶.FÄ. 000060
 D6468800 00FFFF9A CA76FFCC 76FF0011 E9037500 D67E83D6 46890000 14F89A50 P.½....F=.~=.u.Õ...vä.vò......F= 000080
 1608468D 106A006E E90375E6 460BE446 88E65689 E44689F8 5688F646 8804B3E9 Õ*..F~.V½.Fõ.VÌ.Fõ.Flu.Õn.j..FÄ. 0000A0
 6AE476FF E676FF27 EE68EC76 FFEE76FF C676FFC8 76FFCA76 FFCC76FF F476FF50 P.v¶.vä.vò.và.vó.vŸ.vŝhŸ'.vÌ.võj 0000C0
 EE76FF50 16E4468D 0442E900 03E90375 00067E83 D646891C C4830000 139F9A00 .......é..F=.~=.u.Õ..Õ8..Fõ.P.vŸ 0000E0
 E9037500 D67E83D6 468910C4 83000013 D19A006A E476FFE6 76FF27DA 68EC76FF .vŝhÕ'.vÌ.võj..Ì....é..F=.~=.u.Õ 000100
 006A0A76 FF0C76FF 27146BEC 76FFEE76 FF116A50 16E0468D FF87E904 15E90003 ..Õ..Õ...FÄ.Pj..vŸ.vŝh.'.v..v.j. 000120
 E90375E2 460BE046 8803E3E9 0003E903 7500067E 83D64689 12C48300 0014159A ......é..F=.~=.u.Õ..ÕD..FÄ.Fåu.Õ 000140
 FFE276FF 27EF68EC 76FFEE76 FFC676FF C876FFCA 76FFCC76 FFF476FF 116A0039 9.j..v¶.vä.vò.và.vó.vŸ.vŝhÿ'.vä. 000160
 5016E846 80039FE9 0003E903 7500067E 83D64689 18C48300 0014449A 006AE076 vÅj..D....é..F=.~=.u.Õ..Õ...FÒ.P 000180
 7E830646 8912C483 00001488 9A006A0A 76FF0C76 FF271468 EC76FFEE 76FF146A j..vŸ.vŝh.'.v..v.j.......é..F=.~ 0001A0
 CA76FFCC 76FFF476 FF146A00 39E90375 EA460BE8 46880370 E90003E9 03750006 =.u.Õ..Õp..FÒ.Fõu.Õ9.j..v¶.vä.vò 0001C0
 8918C483 000014B7 9A006AE8 76FFEA76 FF27EF68 EC76FFEE 76FFC676 FFC876FF .và.vó.vŸ.vŝhÿ'.võ.vÒj..ñ....é.. 0001E0
```

```
Dump of file SATURN:[PCCOMMON.DUMP.DLL]DMLGLOB.TMP;1 on 18-APR-1990 10:44:56.67
File ID (627,22,0)   End of file block 315 / Allocated 316

Virtual block number 126 (0000007E), 512 (0200) bytes

 76FF2714 68EC76FF EE76FF16 6A5016D2 468D032C E90003E9 03750006 7E830646 F..-.u.Ō..Ō,..F.Pj..vŸ.všh.'.v 000000
 02468802 FDE90403 E9037500 D67E8306 468912C4 83000015 339A006A 0A76FF0C ..v.j..3....á..F.-.u.Ō..Ō»..F. 000020
 FF008AE9 0375E646 08E4468B E65689E4 46890456 8BD2468B 0184E903 75D4460B .Fåu.ŌÇ..F.Vå.FŌ.Vl.FŌ.Flu.Ō... 000040
 F0468D16 6A028FF  0003E903 7500067E 83064689 00001287 9A5016F0 468DF476 v¶.FÞ.P......F.-.u.Ō..Ō«.j..FÞ 000060
 E476FFE6 76FF27EE 68EC76FF EE76FFC6 76FFC876 FFCA76FF CC76FFF4 76FF5016 .P.v¶.vë.vö.vå.vó.vŸ.všhŸ'.vl.vö 000080
 76FF5016 E4468D01 2CE90003 E9037500 D67E8306 46891CC4 83000015 609A006A j..'....á..F.-.u.Ō..Ō,..FŌ.P.v 0000A0
 03750006 7E830646 8910C483 00001254 9A006AE4 76FFE676 FF270A68 EC76FFEE Ÿ.všhŌ'.vl.vŌj..T....á..F.-.u. 0000C0
 006AE903 75E6460B E4468BE6 5689E446 89F8568B F64688FF 68E900FF E90003E9 Ō..Ō..Ōk..F-.V¼.FŌ.Vl.FŌ.Flu.Ōj. 0000E0
 76FFE676 FF27F068 EC76FFEE 76FFC676 FFC876FF D876FFDA 76FFF076 FFF276FF .v·.vÞ.vŌ.vÁ.vå.vó.vŸ.všhÞ'.vl.v 000100
 FF5016E4 468000A8 E90003E9 03750006 7E830646 8918C483 000015E1 9A006AE4 Ōj..Å....á..F.-.u.Ō..Ō¨..FŌ.P. 000120
 7500067E 83064689 10C48300 00162F9A 006AE476 FFE676FF 270A68EC 76FFEE76 vŸ.všhŌ'.vl.vŌj../....á..F.-.u 000140
 64E90375 E6460BE4 4688E656 89E44689 D4568802 468BFF88 E9007EE9 0003E903 .Ō..Ō-.Ō...F.Vå.FŌ.Vl.FŌ.Flu.Ōd 000160
 5C9A006A E476FFE6 76FF27F1 68EC76FF EE76FFC6 76FFC876 FFD876FF DA76FF00 ..vŌ.vÁ.vå.vó.vŸ.všhÞ'.vl.vŌj..\ 000180
 EC76FFEE 76FF5016 E4468000 30E90003 E9037500 D67E8306 468914C4 83000016 ....á..F.-.u.Ō..Ō0..FŌ.P.vŸ.vš 0001A0
 E90003E9 03750006 7E830646 8910C483 000012A8 9A006AE4 76FFE676 FF270A68 hŌ'.vl.vŌj..¨....á..F.-.u.Ō..Ō 0001C0
 160C468D 013EE900 03E90375 00067E83 000012C2 9AF076FF F276FFFF 91E90003 ..Ō...v·.vÞ.ó....-.u.Ō..Ō>..FÉ. 0001E0
```

```
Dump of file SATURN:[PCCOMMON.DUMP.DLL]DMLGLOB.TMP;1 on 18-APR-1990 10:44:56.67
File ID (627,22,0)   End of file block 315 / Allocated 316

Virtual block number 127 (0000007F), 512 (0200) bytes

 83064689 12C48300 0017169A 006A0A76 FF0C76FF 271468EC 76FFEE76 FF156A50 Pj..vŸ.všh.'.v..v.j.......á..F. 000000
 7500067E 83064689 00001312 9A5016CE 468DF476 FF010FE9 0003E903 7500067E -.u.Ō..Ō...v¶.Fö.P......F.-.u 000020
 156A0078 E90375E6 460BE446 8BE65689 E44689DE 568BDC46 8B00F3E9 0003E903 .Ō..Ōµ..FÉ.V8.FŌ.Vl.FŌ.Flu.Ōx.j. 000040
 E676FF27 EE68EC76 FFEE76FF C676FFC8 76FFCA76 FFCC76FF F476FF50 16CE4680 .Fö.P.v¶.vë.vö.vå.vó.vŸ.všhŸ'.vl 000060
 8EE99988 D646C700 08E90375 00067E83 D646891C C4830000 17489A00 6AE476FF .vŌj..H....á..F.-.u.Ō..úF.£.Ō. 000080
 8910C483 000015B4 9A006AE4 76FFE676 FF270A68 EC76FFEE 76FF5016 E4468000 ..FŌ.P.vŸ.všhŌ'.vl.vŌj..Ç....á.. 0000A0
 00FFFF9A CE76FFD0 76FFFF7D E9005CE9 998BD646 C70008E9 03750006 7E830646 F.-.u.Ō..úF.£.Ō\.Ō)..vÅ.vö.... 0000C0
 FFD876FF DA76FF00 36E90374 00003D00 00FFFF9A 5016E446 80CE76FF D076FF00 ..vÅ.vö.FŌ.P.....=..t.Ōó..vŌ.vÁ. 0000E0
 7400FA7E 830009E9 03740006 7E830646 890000FF FF9A5016 FA468DE4 76FFE676 vl.vŌ.Fª.P......F.-.t.Ō...-ª.t 000100
 CA76FFCC 76FF0000 167C9ACE 76FFD076 FFFF82E9 0003E999 8B0646C7 0008E903 .Ō..úF.£.Ō..Ōÿ..vÅ.vö.|....vë.vö 000120
 57000000 C8C8C95F 5E1F0000 E906468B 000017C6 9AD876FF DA76FF00 0017DC9A .É....vŌ.vÄ.ó....F.Ō...^_èùà...W 000140
 260E5EC4 040E4683 D88E17F3 881E5657 000114C8 CBC95F5E 1FD88E11 FF881E56 V.¡...Ä.^_èùà...WV.¡µ..Ä¯F..á^.& 000160
 C4040E46 83F84689 FE478826 0E5EC402 0E4683F2 5689F046 89FE5788 26FC4788 .G.&.W±.FÞ.V·.F..á^.&.G±.F½.F..á 000180
 271468F0 76FFF276 FF196A50 16F4468D FC5689FA 4689FE57 8826FC47 88260E5E ^.&.G.&.W±.Fª.V=.F¶.Pj..v·.vÞh.' 0001A0
 4688000B E9037400 FEEC8E83 FEEC8689 12C48300 00192D9A 006A0A76 FF0C76FF .v..v.j..·....á...š±./š±.t.Ō...F 0001C0
 16FEF086 8D5016FE EE868038 A568F876 FF00C0E9 00008800 06E90375 F6460BF4 ¶.F-u.Ō..¡..Ōà..V½hE8..Ÿ±.P..Þ±. 0001E0
```

```
Dump of file SATURN:[PCCOMMON.DUMP.DLL]DMLGLOB.TMP;1 on 18-APR-1990 10:44:56.67
File ID (627,22,0)   End of file block 315 / Allocated 316

Virtual block number 128 (00000080), 512 (0200) bytes

 FF02149A 5016FEF0 86800099 E9998C88 0006E903 7400FEEE BE830000 FFFF9A50 P....../Ÿ±.t.Ō..¡Ÿ.Ō....Þ±.P.... 000000
 FFFF68FF FF685016 FE468050 16FEF086 80056AFA 76FFFC76 FFFE4689 04C483FF ..á..F±.v•.vªj...Þ±.P.F±.Ph..h.. 000020
 0374F646 08F4468B 0008E903 7400FEEC BE83FEEC 86890000 FFFF9A50 16F4468D .F¶.P.......š±./š±.t.Ō...F¶.F-t. 000040
 0375F646 08F4468B FF77E903 7400FEEC BE830000 FFFF9A00 C86800C8 680008E9 Ō..hà.hà......./š±.t.Ōw..F¶.F-u. 000060
 0016A59A 006A0A76 FF0C76FF 27D868F0 76FFF276 FF196AF4 76FFF676 FFFF6CE9 Ōl..v-.v¶j..v·.vÞhÁ'.v..v.j..É.. 000080
 D88E1804 881E5657 000008C8 CBC95F5E 1F0000E9 FEEC8688 FEEC8689 12C48300 ..á...š±..š±Ō...^_èùà...WV.¡...Ä 0000A0
 FC478826 0E5EC404 0E4683FE 5689FC46 89FE5788 26FC4788 260E5EC4 04.. 4683 .F..á^.&.G.&.W±.F=.V±.F..á^.&.G. 0000C0
 0008C8C8 C95F5E1F 0000E900 00880001 07C726F8 5EC4FA56 89F84689 FE5. 926 &.W±.F½.Vªá^½&ú...¡..Ō...^_èùà.. 0000E0
 4683FE56 89FC4689 FE578826 FC478826 0E5EC404 0E4683D8 8E194C88 1E565700 .WV.¡L..Ä.F..á^.&.G.&.W±.F=.V±.F 000100
 76FFFE76 FF1C6AF8 76FFFA76 FFFA5689 F84689FE 578826FC 4788260E 5EC4040E ..á^.&.G.&.W±.F½.Vª.vª.v½j..v±.v 000120
 000008C8 CBC95F5E 1F0000E9 12C48300 0018599A 006A0A76 FF0C76FF 271468FC .h.'.v..v.j..Ÿ....á.Ō...^_èùà... 000140
 0E4683FA 5689F846 89FE5788 26FC4788 260E5EC4 040E4683 D88E1995 881E5657 WV.¡...Ä.F..á^.&.G.&.W±.F½.Vª.F. 000160
 0000E900 0088026F 07C726FC 5EC4FE56 89FC4689 FE578826 FC478826 0E5EC404 .á^.&.G.&.W±.F•.V±á^•&ú.o.¡..Ō.. 000180
 FE578826 FC478826 0E5EC404 0E468308 8E19F488 1E565700 0014C8C8 C95F5E1F ._^_èùà...WV.¡¶..Ä.F..á^.&.G.&.W± 0001A0
 26FC4788 260E5EC4 040E4683 FE4689FE 4788260E 5EC4020E 4683F856 89F64689 .F¯.V½.F..á^.&.G±.F±.F..á^.&.G.& 0001C0
 4680EE56 89EC4689 FE578826 FC478826 0E5EC404 0E4683F2 5689F046 89FE5788 .W±.FÞ.V·.F..á^.&.G.&.W±.F£.VŸ.F 0001E0
```

```
Dump of file SATURN:[PCCOMMON.DUMP.DLL]DMLGLOB.TMP;1 on 18-APR-1990 10:44:56.67
File ID (627,22,0)   End of file block 315 / Allocated 316

Virtual block number 129 (00000081), 512 (0200) bytes

468912C4 8300001A EE9A006A 0A76FF0C 76FF2714 68F676FF F876FF11 6A5016FA *.Pj..vh.v-h.'.v..v.j..Y....á..F 000000
76FFEE76 FF002DE9 0375FC46 08FA4688 004DE9F4 46880006 E9037500 F47E83F4 ¶.-¶.u.Õ...F¶ÕM..F*.F=u.Õ-..vY.v 000020
19009A00 6AFA76FF FC76FF27 1A68F676 FFF876FF 006AFE76 FFF076FF F276FFEC á.v'.vþ.v±j..vh.v-h.'.v=.v*j..Ì. 000040
5F5E1F00 00E9L000 880006E9 F4468800 06E90375 00F47E83 F4468918 C4830000 ...á..F¶.-¶.u.Õ...F¶Õ..|..Õ...^_ 000060
F64689FE 578826FC 4788260E 5EC4040E 4683088E 1A30881E 56570000 14C8C8C9 èùà...WV.|*..Á.F..á^.&.G±.F±.F- 000080
FE578826 FC478826 0E5EC404 0E4683FE 4689FE47 88260E5E C4020E46 83F85689 .Vh.F..á^.&.G±.F±.F..á^.&.G=&.W± 0000A0
5016FA46 8DEE5689 EC4689FE 578826FC 4788260E 5EC4040E 4683F256 89F04689 .Fþ.V'.F..á^.&.G=&.W±.F&.VY.F*.P 0000C0
7E83F446 8912C483 00001BC8 9A006A0A 76FF0C76 FF271468 F676FFF8 76FF196A j..vh.v-h.'.v..v.j..ù....á..F¶.- 0000E0
76FFEC76 FFEE76FF 002DE903 75FC4608 FA468800 40E9F446 880006E9 037500F4 ¶.u.Õ...F¶ÕM..F*.F=u.Õ-..vY.v&.v 000100
8300001A A79A006A FA76FFFC 76FF271A 68F676FF F876FF00 6AFE76FF F076FFF2 '.vþ.v±j..vh.v-h.'.v=.v*j..Ì.... 000120
C8C8C95F 5E1F0000 E9000088 0006E9F4 46880006 E9037500 F47E83F4 468918C4 á..F¶.-¶.u.Õ...F¶Õ..|..Õ...^_èùà 000140
F45689F2 4689FE57 8826FC47 88260E5E C4040E46 83088E18 1A881E56 57000010 ...WV.|...Á.F..á^.&.G=&.W±.F¯.V¶ 000160
F84689FE 578826FC 4788260E 5EC4040E 4683F646 89FE4788 260E5EC4 020E4683 .F..á^.&.G±.F-.F..á^.&.G=&.W±.F% 000180
6A5016FC 468D006A E9F6468B FC4689FE 46890000 88000007 C726F85E C4FA5689 .V*á^%&ú...|...F±.F=.F-Õj..F=.Pj 0001A0
FC4688F0 468912C4 8300001B 849A006A 0A76FF0C 76FF2714 68F276FF F476FF1C ..v¶.v'h.'.v..v.j.......á..Fþ.F= 0001C0
FFF676FF F876FFFA 76FF0051 E9000088 000107C7 26F85EC4 000EE903 75FE4608 .F±u.Õ..á^%&ù...|..ÕQ..v*.vh.v-. 0001E0

Dump of file SATURN:[PCCOMMON.DUMP.DLL]DMLGLOB.TMP;1 on 18-APR-1990 10:44:56.67
File ID (627,22,0)   End of file block 315 / Allocated 316

Virtual block number 130 (00000082), 512 (0200) bytes

26E916C4 83000011 E29A006A 0676FF08 76FF0A76 FF0C76FF 281268F2 76FFF476 v¶.v'h.(.v..v..v..v.j..ã....á.Õ& 000000
75001A30 FF7EE903 75001730 FF86E903 75001030 FF8EE903 75000E3D 0023E900 .Õ#.=..u.Õ..=..u.Õ..=..u.Õ-.=..u 000020
00E90856 8B06468B D88E1BF7 881E5657 000000C8 CBC95F5E 1FFFAFE9 FF76E903 .Õv.ÕÉ..^_èùà...WV.|%..Ã.F..V.Õ. 000040
04F6681E 016A316A FFFF6818 C868D88E 1CE4881E 56570000 02C8C8C9 5F5E1F00 ..^_èùà..¯WV.|Õ..Ãhù.h..j1j..h-. 000060
5F5E1F00 00E9FE46 88FE4689 18C48300 00FFFF9A 006A3C6A 026A006A 006A006A j.j¯j.j.j<j.......á..F±.F±Õ...^_ 000080
1CA70203 02460008 00DC0203 005E0005 1C630203 02B3000A 17600203 0017C8C9 èù....m...*...c...^...É...F...Ì¯ 0000A0
177D0203 007E0005 11050203 02640008 10600203 02560008 10270203 00680005 ..k...'...V...m...d.......~...). 0000C0
1CFE0002 008F0005 11BE0203 0000002C 18AF0002 01F00007 18920203 0208000A ..Ã.......Þ...£.,...../........±. 0000E0
17D10203 027B0009 18D60203 00000010 10030002 02EC000A 16C40203 0000002E ........á...Å..........@...(...1. 000100
17980203 00380005 1D100203 1CDC0010 10060005 00320003 18FA0103 02F7000A ..%...*...2.......É.......8..... 000120
00000000 023C0008 0EF80203 02310008 09920203 17E80010 18CE0005 0311000A ......ó...Š.......1...«...<..... 000140
5689FA46 89FE5788 26FC4788 260E5EC4 040E4683 D88EFFFF 881E5657 000010C8 à...WV.|...Ã.F..á^.&.G=&.W±.F*.V 000160
4788260E 5EC4040E 4683F256 89F04689 FE578826 FC478826 0E5EC404 0E4683FC =.F..á^.&.G=&.W±.Fþ.V'.F..á^.&.G 000180
6AF676FF F876FFFF 4689FE47 88260E5E C4020E46 83F85689 F64689FE 578826FC =&.W±.F-.Vh.F..á^.&.G±.F±.vh.v-j 0001A0
F47E83F4 468912C4 83000000 A59A006A 0A76FF0C 76FF27D8 68FA76FF FC76FF0E ..v=.v*hÄ'.v..v.j..É....á..F¶.-¶ 0001C0
FF0C76FF 271768FA 76FFFC76 FF0F6A50 16FE4680 0023E9F4 46880006 E9037500 .u.Õ...F¶Õ#..F±.Pj..v=.v*h.'.v.. 0001E0

Dump of file SATURN:[PCCOMMON.DUMP.DLL]DMLGLOB.TMP;1 on 18-APR-1990 10:44:56.67
File ID (627,22,0)   End of file block 315 / Allocated 316

Virtual block number 131 (00000083), 512 (0200) bytes

D88E0008 881E5657 000016C8 CBC95F5E 1F0000E9 12C48300 00FFFF9A 006A0A76 v.j.......á.Õ...^_èùà...WV.|...Ã 000000
FE478826 0E5EC402 0E4683F4 5689F246 89FE5788 26FC4788 260E5EC4 040E4683 .F..á^.&.G=&.W±.F¯.V¶.F..á^.&.G± 000020
FE578826 FC478826 0E5EC404 0E4683FA 4689FE47 88260E5E C4020E46 83FC4689 .F=.F..á^.&.G±.F*.F..á^.&.G=&.W± 000040
5016EA46 8DF85689 F64689FE 578826FC 4788260E 5EC4040E 4683F056 89EE4689 .FY.Vþ.F..á^.&.G=&.W±.F-.Vh.Fõ.P 000060
4608EA46 8812C483 0000016F 9A006A0A 76FF0C76 FF271868 F276FFF4 76FF0E6A j..v¶.v'h.'.v..v.j..o....á..Fõ.F 000080
F476FF00 6AFA76FF EE76FFF0 76FFF676 FFF876FF 00CEE900 00880006 E90374EC &t.Õ..|..Õö..vh.v-.vþ.vY.v*j..v¶ 0000A0
F476FF0F 6A5016FE 468D18C4 83000001 8F9A006A EA76FFEC 76FF271A 68F276FF .v'h.'.v&.võj.......á..F±.Pj..v¶ 0000C0
680014E9 037500FE 7E8312C4 83000001 CA9A006A 0A76FF0C 76FF2712 68F276FF .v'h.'.v..v.j..ò....á.. ±.u.Õ..h 0000E0
DA68F276 FFF476FF 5016EA46 8D000001 EC9AF676 FFF876FF EE76FFF0 76FF0210 ...vþ.vY.vh.v-.&....Fõ.F.v¶.v'hö 000100
FFFA76FF 003EE903 75EC4608 EA468810 C4830000 02139A00 6A0A76FF 0C76FF27 '.v..v.j.......á..Fõ.F&u.Õ>..v*. 000120
6AFA76FF EE76FFF0 76FFF676 FFF876FF 0000FFFF 9AF676FF F876FFEE 76FFF076 vþ.vY.vh.v-......vh.v-.vþ.vY.v*j 000140
C8C8C95F 5E1F18C4 83000000 739A006A EA76FFEC 76FF271A 68F276FF F476FF00 ..v¶.v'h.'.vš.võj..s....á..^ èùà 000160
FA5689F8 4689FE57 8826FC47 88260E5E C4040E46 83088E00 8C881E56 57000012 ...WV.|Y..Á.F..á^.&.G=&.W±.F%.V* 000180
FC478826 0E5EC404 0E4683F0 5689EE46 89FE5788 26FC4788 260E5EC4 040E4683 .F..á^.&.G=&.W±.FY.Vþ.F..á^.&.G= 0001A0
0A76FF0C 76FF2714 68F876FF FA76FF0E 6A5016F4 4680FE56 89FC4689 FE578826 &.W±.F=.V±.F¶.Pj..v*.vYh.'.v..v. 0001C0
FFFE76FF 0028E999 88880006 E9037500 F27E83F2 468912C4 83000002 8A9A006A j..Þ....á..F'.-'.u.Õ..|É.Õ(..v±. 0001E0
```

Dump of file SATURN:[PCCOMMON.DUMP.DLL]DMLGLOB.TMP;1 on 18-APR-1990 10:44:56.67
File ID (627,22,0)   End of file block 315 / Allocated 316

Virtual block number 132 (00000084), 512 (0200) bytes

```
C4830000 01349A00 6AF476FF F676FF27 F268F876 FFFA76FF EE76FFF0 76FFFC76 v•.vÞ.vŸ.v•.v½h·'.v-.v¶j..4....á 000000
FC478826 0E5EC404 0E468308 8E0227B8 1E565700 001AC8C8 C95F5E1F 0000E914 .Õ...^_èùà...WV.¡'..Ä.F..á^.&.G= 000020
83E85689 E6468VFE 578826FC 4788260E 5EC4040E 4683F456 89F24689 FE578826 &.W±.F¯.V¶.F..á^.&.G=&.W±.F|.VÒ. 000040
89FE4788 260E5EC4 020E4683 FA5689F8 4689FE57 8826FC47 88260E5E C4040E46 F..á^.&.G=&.W±.F½.V•.F..á^.&.G±. 000060
88260E5E C4020E46 83FE5689 FC4689FE 578826FC 4788260E 5EC4040E 4683F646 F-.F..á^.&.G=&.W±.F=.V±.F..á^.&. 000080
03A09A00 6A0A76FF 0C76FF27 1468F276 FFF476FF 0E6A5016 EE468DEA 4689FE47 G±.Fõ.FŸ.Pj..v¶.v·h.'.v..v.j.... 0000A0
FFFC76FF FE76FF0E 6A0033E9 998488800 06E90375 00EC7E83 EC468912 C4830000 ...á..F$.-$.u.Õ..¡Ç.Õ3.j..v±.v=. 0000C0
9A006AEE 76FFF076 FF27EE68 F276FFF4 76FFE676 FFE876FF F876FFFA 76FFF676 v-.v•.v½.vÒ.vl.v¶.v·hŸ'.vÞ.vŸj.. 0000E0
56880646 88D88E02 D1881E56 57000000 C8C8C95F 5E1F0000 E91CC483 00000283 .....á.Õ...^_èùà...WV.¡l..Ä.F..V 000100
1E016A31 6AFFFF68 FFFF6808 8E038788 1E565700 0002C8C8 C95F5E1F 0000E908 .Õ...^_èùà..¯WV.¡ñ..Äh..h..j1j.. 000120
0000E9FE 4688FE46 8918C483 0000FFFF 9A006A3D 6A026A00 6A006A00 6A055668 hV.j.j¯j.j.j=j.......á..F±.F±Õ.. 000140
00000011 03060002 0000002E 03010002 005E0005 035E0203 000690C8 C95F5E1F .^_èù.....^...^...Ì.......•..... 000160
00000000 00000000 023C0008 01AF0203 00380005 03F00203 03AF0011 03090005 ..Ì...£...Þ...8...£...<......... 000180
5689FC46 89FE5788 26FC4788 260E5EC4 040E4683 D88EFFFF 881E5657 000012C8 à...WV.¡...Ä.F..á^.&.G=&.W±.F•.V 0001A0
4788260E 5EC4040E 4683F056 89EE4689 FE578826 FC478826 0E5EC404 0E4683FE ±.F..á^.&.G=&.W±.FŸ.VÞ.F..á^.&.G 0001C0
F45689F2 4689FE57 8826FC47 88260E5E C4040E46 83FA5689 F84689FE 578826FC =&.W±.F½.V•.F..á^.&.G=&.W±.F·.V¶ 0001E0
```

Dump of file SATURN:[PCCOMMON.DUMP.DLL]DMLGLOB.TMP;1 on 18-APR-1990 10:44:56.67
File ID (627,22,0)   End of file block 315 / Allocated 316

Virtual block number 133 (00000085), 512 (0200) bytes

```
C4830000 00AD9A00 6A0A76FF 0C76FF27 D868FC76 FFFE76FF 0E6AF876 FFFA76FF .v•.v½j..v±.v=hÄ'.v..v.j..Ù....á 000000
76FFFE76 FF0F6AF2 76FFF476 FF0024E9 F6468800 06E90375 00F67E83 F6468912 ..F-.--.u.Õ...F-Õ$..v¶.v·j..v±.v 000020
00001AC8 C8C95F5E 1F0000E9 12C48300 00FFFF9A 006A0A76 FF0C76FF 27D868FC •hÄ'.v..v.j.......á.Õ...^_èùà... 000040
0E4683F4 5689F246 89FE5788 26FC4788 260E5EC4 040E4683 D88E0008 881E5657 WV.¡...Ä.F..á^.&.G=&.W±.F¯.V¶.F. 000060
578826FC 4788260E 5EC4040E 4683E856 89E64689 FE578826 FC478826 0E5EC404 .á^.&.G=&.W±.F|.VÒ.F..5^.&.G=&.W 000080
FC478826 0E5EC404 0E4683F6 4689FE47 88260E5E C4020E46 83FA5689 F84689FE ±.F½.V•.F..á^.&.G±.F-.r .á^.&.G= 0000A0
FF0E6A50 16EE468D EC4689FE 4788260E 5EC4020E 4683FE56 89FC4689 FE578826 &.W±.F=.V±.F..á^.&.G±.F$.FŸ.Pj.. 0000C0
7500EA7E 83EA4689 12C48300 0001939A 006A0A76 FF0C76FF 271468F2 76FFF476 v¶.v·h.'.v..v.j.......á..Fõ.-õ.u 0000E0
76FFE876 FFF876FF FA76FFF6 76FFFC76 FFFE76FF 0E6A0033 E9998488 0006E903 .Õ..¡Ç.Õ3.j..v±.v=.v-.v•.v½.vÒ.v 000100
5F5E1F00 00E91CC4 83000000 7A9A006A EE76FFF0 76FF27EE 68F276FF F476FFE6 |.v¶.v·hŸ'.vÞ.vŸj..z....á.Õ...^ 000120
F84689FE 578826? 4788260E 5EC4040E 4683088E 00C4881E 56570000 12C8C8C9 èùà...WV.¡á..Ä.F..á^.&.G=&.W±.F½ 000140
260E5EC4 040E4683 F05689EE 4689FE57 8826FC47 88260E5E C4040E46 83FA5689 .V•.F..á^.&.G=&.W±.FŸ.VÞ.F..á^.& 000160
0C76FF27 1468F876 FFFA76FF 0F6A5016 F2468DFE 5689FC46 89FE5788 26FC4788 .G=&.W±.F=.V±.F·.Pj..v•.v½h.'.v. 000180
880039E9 998A8800 06E90375 00F67E83 F6468912 C4830000 024E9A00 6A0A76FF .v.j..N....á..F-.--.u.Õ..¡o.Õ9.. 0001A0
FFFA76FF EE76FFF0 76FFFC76 FFFE76FF 0028E900 00880006 E90374F4 460BF246 F·.F¶t.Õ..|..Õ(..v±.v•.vÞ.vŸ.v•. 0001C0
0014C8C8 C95F5E1F 0000E914 C4830000 01519A00 6AF276FF F476FF27 F168F876 v½hÞ'.v¶.v·j..Q....á.Õ...^_èùà.. 0001E0
```

Dump of file SATURN:[PCCOMMON.DUMP.DLL]DMLGLOB.TMP;1 on 18-APR-1990 10:44:56.67
File ID (627,22,0)   End of file block 315 / Allocated 316

Virtual block number 134 (00000086), 512 (0200) bytes

```
4683F656 89F44689 FE578826 FC478826 0E5EC404 0E468308 8E01AA88 1E565700 .WV.¡¯..Ä.F..á^.&.G=&.W±.F¶.V-.F 000000
5EC4040E 4683FC46 89FE4788 260E5EC4 020E4683 FE4689FE 4788260E 5EC4020E ..á^.&.G±.F±.F..á^.&.G±.F•.F..á^ 000020
4689FE57 8826FC47 88260E5E C4040E46 83F25689 F04689FE 578826FC 4788260E .&.G=&.W±.FÞ.V·.F..á^.&.G=&.W±.F 000040
0002F19A F876FFFA 76FFF076 FFF276FF 02346800 82E90374 00FE7E83 FA5689F8 ½.V•.-±.t.Õ..h4..v·.vÞ.v•.v½.Þ.. 000060
76FFF276 FFF876FF FA76FF00 0003979A F876FFFA 76FFF076 FFF276FF 01FF6800 .h...v·.vÞ.v•.v½......v•.v½.v·.v 000080
FF18C483 00000342 9A006A0A 76FF0C76 FF271A68 F476FFF6 76FF0E6A FC76FFF0 Þ.v•j..v-.v¶h.'.v..v.j..8....á.. 0000A0
6A0A76FF 0C76FF27 1A68F476 FFF676FF 0F6AFC76 FFF076FF F276FFF8 76FFFA76 v•.v½.v·.vÞ.v•j..v-.v¶h.'.v..v.j 0000C0
271868F4 76FFF676 FFFE76FF 5016EC46 80008DE9 00008818 C4830000 03699A00 ..i....á.¡..Õ...F$.P.v±.v-.v¶h.' 0000E0
58E90000 880006E9 0374EE46 08EC4688 12C48300 0002069A 006A0A76 FF0C76FF .v..v.j.......á..F$.FŸt.Õ..¡..Õ[ 000100
08E9000E E90000FF FF9AF876 FFFA76FF F076FFF2 76FF0236 68001AE9 FE468800 ..F±Õ..h6..v·.vÞ.v•.v½.....Õ..Õ. 000120
F676FF00 6A020468 F076FFF2 76FFF876 FFFA76FF 0000E9FF DEE90375 000F3000 .=..u.Õñ.Õ...v•.v½.v·.vÞh..j..v- 000140
C95F5E1F 0000E900 008818C4 83000003 189A006A EC76FFEE 76FF271A 68F476FF .v¶h.'.vŸ.v$j.......á.¡..Õ...^_è 000160
57000002 C8C8C95F 5E1F0000 E9085688 06468808 8E026588 1E565700 0000C8C8 ùà...WV.¡e..Ä.F..V.Õ...^_èùà..¯W 000180
6A3E6A02 6A006A00 6A006A05 74681E01 6A316AFF FF68FFFF 68088E03 E9881E56 V.¡Õ..Äh..h..j1j..ht.j.j¯j.j.j>j 0001A0
000503CF 02030006 90C8C95F 5E1F0000 E9FE4688 FE468918 C4830000 FFFF9A00 .......á..F±.F±Õ...^_èù.....ü... 0001C0
00050422 02030000 00120408 00020000 002E0403 000203E1 00120408 0005005E ^.......Ä.....................".. 0001E0
```

```
Dump of file SATURN:[PCCOMMON.DUMP.DLL]DMLGLOB.TMP;1 on 18-APR-1990 10:44:56.67
File ID (627,22,0)   End of file block 315 / Allocated 316

Virtual block number 135 (00000087), 512 (0200) bytes

 040E4683 D88EFFFF 881E5657 000012C8 00000000 0000023C 0008020D 02030038 8...Y...<.......à...WV.|...Ä.F.. 000000
 FE578826 FC478826 0E5EC404 0E4683F6 5689F446 89FE5788 26FC4788 260E5EC4 á^.&.G=&.W±.F¶.V-.F..á^.&.G=&.W± 000020
 C4040E46 83FE5689 FC4689FE 578826FC 4788260E 5EC4040E 4683F056 89EE4689 .FŸ.VÞ.F..á^.&.G=&.W±.F=.V±.F..á 000040
 D868F476 FFF6.6FF 0E6AFC76 FFFE76FF FA5689F8 4689FE57 8826FC47 88260E5E ^.&.G=&.W±.F½.V°.v±.v=j..v-.v¶hÄ 000060
 F2468800 06E90375 00F27E83 F2468912 C4830000 00AD9A00 6A0A76FF 0C76FF27 '.v..v.j..Ü....á..F·.-·.u.Õ...F· 000080
 00FFFF9A 006A0A76 FF0C76FF 27D868F4 76FFF676 FF0F6AF8 76FFFA76 FF0024E9 Õ$..v°.v½j..v-.v¶hÄ'.v..v.j..... 0000A0
 260E5EC4 040E4683 D88E0008 881E5657 000014C8 CBC95F5E 1F0000E9 12C48300 ..á.Õ...^_èùà...WV.|...Ä.F..á^.& 0000C0
 C4020E46 83FE4689 FE478826 0E5EC402 0E4683F6 5689F446 89FE5788 26FC4788 .G=&.W±.F¶.V-.F..á^.&.G±.F±.F..á 0000E0
 4683F256 89F04689 FE578826 FC478826 0E5EC404 0E4683FC 4689FE47 88260E5E ^.&.G±.F=.F..á^.&.G=&.W±.FÞ.V·.F 000100
 FF023968 0044E903 7400FE7E 83FA5689 F84689FE 578826FC 4788260E 5EC4040E ..á^.&.G=&.W±.F½.V°.-±.t.ÕD.h9.. 000120
 6A020468 F076FFF2 76FFF876 FFFA76FF 0000FFFF 9AF876FF FA76FFF0 76FFF276 v·.vÞ.v°.v½.......v°.v½.v·.vÞh..j 000140
 0062E900 008818C4 83000001 8A9A006A 0A76FF0C 76FF271A 68F476FF F676FF0E ..v-.v¶h.'.v..v.j.......á.|..Õb. 000160
 C4830000 01C59A00 6A0A76FF 0C76FF27 1B68F476 FFF676FF FE76FF50 16EC4680 .F&.P.v±.v-.v¶h.'.v..v.j..é....á 000180
 0468F076 FFF276FF F876FFFA 76FF0030 E9000088 0006E903 74EE4608 EC468812 ..F&.FŸt.Õ..|..ÕO..v°.v½.v·.vÞh. 0001A0
 E9000088 18C48300 00007A9A 006AEC76 FFEE76FF 271A68F4 76FFF676 FF006A02 .j..v-.v¶h.'.vŸ.vŝj..z....á.|..Õ 0001C0
 8826FC47 88260E5E C4040E46 83088E00 C4881E56 57000016 C8C8C95F 5E1F0000 ...^_èùà...WV.|á..Ä.F..á^.&.G=&. 0001E0

Dump of file SATURN:[PCCOMMON.DUMP.DLL]DMLGLOB.TMP;1 on 18-APR-1990 10:44:56.67
File ID (627,22,0)   End of file block 315 / Allocated 316

Virtual block number 136 (00000088), 512 (0200) bytes

 0E4683F2 5689F046 89FE5788 26FC4788 260E5EC4 040E4683 F85689F6 4689FE57 W±.F-.V½.F..á^.&.G=&.W±.FÞ.V·.F. 000000
 0E5EC404 0E4683F4 4689FE47 88260E5E C4020E46 83EA4689 FE478826 0E5EC402 .á^.&.G±.Fõ.F..á^.&.G±.F¶.F..á^. 000020
 5016FA46 8DFA4689 EA468800 07C626F0 5EC4FE56 89FC4689 FE578826 FC478826 &.G=&.W±.F=.V±á^Þ&ó...Fõ.F°.F°.P 000040
 0002AE9A 006A0A76 FF0C76FF 271A68F6 76FFF876 FF006A02 0468F076 FFF276FF .v·.vÞh..j..v½.v-h.'.v..v.j..O.. 000060
 880007C6 26F05EC4 00000351 9AF076FF F276FFF4 76FFFC76 FFFE76FF 18C48300 ..á..v±.v=.v¶.v·.vÞ.Q...á^Þ&ó... 000080
 02E69A00 6A0A76FF 0C76FF27 1868F676 FFF876FF 0F6A5016 EC468DFA 4689EA46 Fõ.F°.F&.Pj..v½.v-h.'.v..v.j..|. 0000A0
 76FFEA76 FF5040F4 4688FC76 FFFE76FF 004EE903 75EE4608 EC468812 C4830000 ...á..F&.FŸu.ÕN..v±.v=.F¶@P.vð.v 0000C0
 EC468D18 C4830000 03049A00 6AEC76FF EE76FF27 E668F676 FFF876FF F076FFF2 ·.vÞ.v½.v-hl'.vŸ.v&j.......á..F& 0000E0
 5EC4FFA7 E910C483 00000163 9A006AEC 76FFEE76 FF27DA68 F676FFF8 76FF5016 .P.v½.v-hÖ'.vŸ.v&j..c....á.Õl.á^ 000100
 39680000 03309A50 16FA468D F076FFF2 76FF0223 68FA4689 EA468800 07C626F0 Þ&ó...Fõ.F°h#..v·.vÞ.F°.P.=...h9 000120
 F076FFF2 76FFF476 FFFC76FF FE76FF00 00013C9A 5016FA46 8DF076FF F276FF02 ..v·.vÞ.F°.P.<....v±.v=.v¶.v·.vÞ 000140
 0000C8C8 C95F5E1F 0000E900 0088FA46 89EA4688 0007C626 F05EC400 00FFFF9A .....á^Þ&ó...Fõ.F°j..Õ...^_èùà.. 000160
 75881E56 57000002 C8C8C95F 5E1F0000 E9085688 06468808 8E010F88 1E565700 .WV.|Õ..Ä.F..V.Õ...^_èùà...WV.|u 000180
 FFFF9A00 6A3F6A02 6A006A00 6A006A05 92681E01 6A316AFF FF68FFFF 68D88E03 ..Äh..h..j1j..h..j.j.j.j.j?j.... 0001A0
 0203005E 00050260 02030007 90C8C95F 5E1F0000 E9FE4688 FE468918 C4830000 ...á..F±.F±Õ...^_èù.....m...^... 0001C0
 02030360 00130397 00050000 00130394 00020000 002E038F 00020246 00080284 ....F.......................m... 0001E0

Dump of file SATURN:[PCCOMMON.DUMP.DLL]DMLGLOB.TMP;1 on 18-APR-1990 10:44:56.67
File ID (627,22,0)   End of file block 315 / Allocated 316

Virtual block number 137 (00000089), 512 (0200) bytes

 040E4683 D88EFFFF 881E5657 000016C8 0000023C 0008032A 02030038 000503AE Û...8...*...<...à...WV.|...Ä.F.. 000000
 FE578826 FC478826 0E5EC404 0E4683F8 5689F646 89FE5788 26FC4788 260E5EC4 á^.&.G=&.W±.F-.V½.F..á^.&.G=&.W± 000020
 89FE4788 260E5EC4 020E4683 EA4689FE 4788260E 5EC4020E 4683F256 89F04689 .FÞ.V·.F..á^.&.G±.Fõ.F..á^.&.G±. 000040
 46880007 C626F05E C4FE5689 FC4689FE 578826FC 4788260E 5EC4040E 4683F446 F¶.F..á^.&.G=&.W±.F=.V±á^Þ&ó...F 000060
 0C76FF27 1A68F6 › FFF876FF 006A0204 68F076FF F276FF50 16FA468D FA4689EA õ.F°.F°.P.v·.vÞh..j..v½.v-h.'.v. 000080
 00FFFF9A F076FF.. 76FFF476 FFFC76FF FE76FF18 C4830000 00079A00 6A0A76FF .v.j..■....á..v±.v=.v¶.v·.vÞ.... 0000A0
 76FF2718 68F676FF F876FF0F 6A5016EC 468DFA46 89EA4688 0007C626 F05EC400 .á^Þ&ó...Fõ.F°.F&.Pj..v½.v-h.'.v 0000C0
 88FC76FF FE76FF00 4EE90375 EE4608EC 468812C4 83000001 0F9A006A 0A76FF0C ..v.j.......á..F&.FŸu.ÕN..v±.v=. 0000E0
 2D9A006A EC76FFEE 76FF27E6 68F676FF F876FFF0 76FFF276 FFEA76FF 5040F446 F¶@P.vð.v·.vÞ.v½.v-hl'.vŸ.v&j..· 000100
 00FFFF9A 006AEC76 FFEE76FF 27DA68F6 76FFF876 FF5016EC 468D18C4 83000001 ....á..F&.P.v½.v-hÖ'.vŸ.v&j..... 000120
 4683088E 0008881E 56570000 0CC8C8C9 5F5E1F00 00E90000 88FFA7E9 10C48300 ..á.Õl.|..Õ...^_èùà...WV.|...Ä.F 000140
 8826FC47 88260E5E C4040E46 83FA5689 F84689FE 578826FC 4788260E 5EC4040E ..á^.&.G=&.W±.F½.V°.F..á^.&.G=&. 000160
 F676FFF6 5689F446 89FE5788 26FC4788 260E5EC4 040E4683 FE5689FC 4689FE57 W±.F=.V±.F..á^.&.G=&.W±.F¶.V-.v- 000180
 00E912C4 83000000 969A006A 0A76FF0C 76FF27D8 68F876FF FA76FF0E 6AF476FF .v¶j..v°.v½hÄ'.v..v.j.......á.Õ. 0001A0
 578826FC 4788260E 5EC4040E 4683D88E 014A881E 56570000 20C8C8C9 5F5E1F00 ..^_èùà..WV.|J..Ä.F..á^.&.G=&.W 0001C0
 FE478826 0E5EC402 0E4683FA 4689FE47 88260E5E C4020E46 83EA5689 E84689FE ±.FÕ.Võ.F..á^.&.G±.F°.F..á^.&.G± 0001E0
```

```
Dump of file SATURN:[PCCOMMON.DUMP.DLL]DMLGLOB.TMP;1 on 18-APR-1990 10:44:56.67
File ID (627,22,0)   End of file block 315 / Allocated 316

Virtual block number 138 (0000008A), 512 (0200) bytes

 260E5EC4 040E4683 E65689E4 4689FE57 8826FC47 88260E5E C4040E46 83F44689 .f¶.F..ó^.&.G•&.Wz.Fô.V|.F..ó^.& 000000
 B8F04689 F2468900 008800FF E9037400 FA7E83EE 5689EC46 89FE5788 26FC4788 .G=&.Wz.Fš.VŸ.-'.t.Ö..|...F·.FÞ| 000020
 FF27DA68 E876FFEA 76FF5016 F0468DFC 4689FE46 89000088 F64689F8 46890000 ...F%.F-|...Fz.F•.FÞ.P.võ.vÖhö'. 000040
 0C76FF27 D968E876 FFEA76FF 5016F646 8D10C483 00000276 9A006A0A 76FF0C76 v..v.j..v....á..F~.P.võ.vÖh|'.v. 000060
 0C76FF27 1B68E876 FFEA76FF 0E6A5016 FC468D10 C4830000 02969A00 6A0A76FF .v.j.......á..F•.Pj..võ.vÖh.'.v. 000080
 76FFE676 FF022268 0L41E903 75FE4608 FC468812 C4830000 020F9A00 6A0A76FF .v.j..Ö....á..F•.Fzu.ÖA.h"..v|.v 0000A0
 EA76FF0E 6A020468 E476FFE6 76FFEC76 FFEE76FF 00000304 9AEC76FF L.76FFE4 ô.vŸ.vš......vŸ.vš.v|.vöh..j..võ 0000C0
 74F84608 F6468800 36E918C4 83000003 3F9A006A 0A76FF0C 76FF271A 68c 76FF .vÖh.'.v..v.j..7....á.Ö6..F-.F%t 0000E0
 76FF0221 680014E9 0000031B 9AEC76FF EE76FFE4 76FFE676 FF028368 001/ 903 .ô..h...v|.vö.vŸ.vš.....Ö..h|..v 000100
 EA76FFFA 76FF5016 E0468000 62E90000 880000FF FF9AEC76 FFEE76FF E476FFE6 |.vö.vŸ.vš.....|..Öb..FÅ.P.v'.võ 000120
 06E90374 E24608E0 468812C4 83000003 7A9A006A 0A76FF0C 76FF271B 68E876FF .vÖh.'.v..v.j..z....á..FÅ.Fãt.Ö. 000140
 1A68E876 FFEA76FF 006A0204 68E476FF E676FFEC 76FFEE76 FF0030E9 00008800 .|..ÖO..vŸ.vš.v|.vöh..j..võ.vÖh. 000160
 000000C8 CBC95F5E 1F0000E9 00008818 C4830000 01A79A00 6AE076FF E276FF27 '.vã.vÅj..Ï....á.|..Ö...^_èùà... 000180
 0394B81E 56570000 02C8CBC9 5F5E1F00 00E90856 8806468B D88E018E B81E5657 WV.|/..Å.F..V.Ö...^_èùà...WV.|.. 0001A0
 00FFFF9A 006A406A 026A006A 006A006A 05AA681E 016A316A FFFF68FF FF68088E .Áh..h..j1j..h^.j.j.j.j.jáj..... 0001C0
 00AD0203 005E0005 02580203 0007CBC9 5F5E1F00 00E9FE46 88FE4689 18C48300 ..á..Fz.FzÖ...^_èù....X...^...Ù. 0001E0

Dump of file SATURN:[PCCOMMON.DUMP.DLL]DMLGLOB.TMP;1 on 18-APR-1990 10:44:56.67
File ID (627,22,0)   End of file block 315 / Allocated 316

Virtual block number 139 (0000008B), 512 (0200) bytes

 03CD0203 00000014 03B30002 0000002E 03AE0002 038C0014 03B60005 02460008 ..F...Ñ.......Ü.......•.......ë. 000000
 040E4683 D88EFFFF B81E5657 00000CC8 00000000 023C0008 02B80203 00380005 ..8...|...<.....à...WV.|...Ä.F.. 000020
 FE578B26 FC478B26 0E5EC404 0E4683FE 5689FC46 89FE5788 26FC4788 260E5EC4 ó^.&.G•&.Wz.F•.Vz.F..ó^.&.G•&.Wz 000040
 76FFF676 FFF65689 F44689FE 578B26FC 478B260E 5EC4040E 4683FA56 89FB4689 .F%.V'.F..ó^.&.G•&.Wz.F¶.V-.v-.v 000060
 1F0000E9 12C48300 00FFFF9A 006A0A76 FF0C76FF 27D868FC 76FFFE76 FF106AF4 ¶j..vz.v•hÄ'.v..v.j.......á.Ö... 000080
 89FE5788 26FC4788 260E5EC4 040E4683 D88E0008 B81E5657 000014C8 CBC95F5E ^_èùà...WV.|...Ä.F..ó^.&.G•&.Wz. 0000A0
 4689FE47 8B260E5E C4020E46 83FE4689 FE478B26 0E5EC402 0E4683F6 5689F446 F¶.V-.F..ó^.&.Gz.Fz.F..ó^.&.Gz.F 0000C0
 478B260E 5EC4040E 4683F256 89F04689 FE578B26 FC478B26 0E5EC404 0E4683FC •.F..ó^.&.G•&.Wz.FÞ.V·.F..ó^.&.G 0000E0
 FA76FFF0 76FFF276 FF020168 0044E903 7400FE7E 83FA5689 F84689FE 578B26FC •&.Wz.F%.V'.-z.t.ÖO.h...v·.vÞ.v' 000100
 68F476FF F676FF10 6A020468 F076FFF2 76FFF876 FFFA76FF 0000FFFF 9AF876FF .v%......v'.v%.v·.vÞh..j..v-.v¶h 000120
 FE76FF50 16EC4680 005FE900 00B818C4 83000001 429A006A 0A76FF0C 76FF271A .'.v..v.j..B....á.|..Ö_..Fš.P.vz 000140
 74EE4608 EC468812 C4830000 017D9A00 6A0A76FF 0C76FF27 1B68F476 FFF676FF .v-.v¶h.'.v..v.j..)....á..Fš.FŸt 000160
 76FFF676 FF006A02 0468F076 FFF276FF F876FFFA 76FF002D E90000B8 0006E903 .Ö..|..Ö-..v'.v%.v·.vÞh..j..v-.v 000180
 000016C8 CBC95F5E 1F0000E9 18C48300 0000659A 006AEC76 FFEE76FF 271A68F4 ¶h.'.vŸ.všj..e....á.Ö...^_èùà... 0001A0
 0E4683F8 5689F646 89FE5788 26FC4788 260E5EC4 040E4683 D88E007C B81E5657 WV.||..Ä.F..ó^.&.G=&.Wz.F-.V%.F. 0001C0
 EA4689FE 478B260E 5EC4020E 4683F256 89F04689 FE578B26 FC478B26 0E5EC404 .ó^.&.G•&.Wz.FÞ.V·.F..ó^.&.Gz.Fõ 0001E0

Dump of file SATURN:[PCCOMMON.DUMP.DLL]DMLGLOB.TMP;1 on 18-APR-1990 10:44:56.67
File ID (627,22,0)   End of file block 315 / Allocated 316

Virtual block number 140 (0000008C), 512 (0200) bytes

 FC4689FE 578B26FC 478B260E 5EC4040E 4683F446 89FE4788 260E5EC4 020E4683 .F..ó^.&.Gz.F¶.F..ó^.&.G•&.Wz.F• 000000
 006A0204 68F076FF F276FF50 16FA468D FA4689EA 46880007 C626F05E C4FE5689 .Vzó^Þ&ó...Fõ.F'.F'.P.v·.vÞh..j. 000020
 FFFC76FF FE76FF18 C4830000 02639A00 6A0A76FF 0C76FF27 1A68F676 FFF876FF .v%.v-h.'.v..v.j..c....á..vz.v•. 000040
 6A5016EC 468DFA46 89EA4688 0007C626 F05EC400 0002F39A F076FFF2 76FFF476 v¶.v·.vÞ.µ...ó^Þ&ó...Fõ.F'.Fš.Pj 000060
 EE4608EC 468812C4 83000002 9B9A006A 0A76FF0C 76FF271B 68F676FF FB76FF0E ..v%.v-h.'.v..v.j.......á..Fš.FŸ 000080
 68F676FF F876FFF0 76FFF276 FFEA76FF 5040F446 8BFC76FF FE76FF00 4EE90375 u.ÖN..vz.v•.F¶aP.võ.v·.vÞ.v%.v-h 0000A0
 27DA68F6 76FFF876 FF5016EC 468D18C4 83000002 B99A006A EC76FFEE 76FF27E6 |'.vŸ.všj..¿....á..Fš.P.v%.v-hö' 0000C0
 FA4689EA 46880007 C626F05E C4FFA7E9 10C48300 0003109A 006AEC76 FFEE76FF .vŸ.všj.......á.Öl.ó^Þ&ó...Fõ.F' 0000E0
 FFF276FF F476FFFC 76FFFE76 FF000003 999A5016 FA468DF0 76FFF276 FF026268 hb..v·.vÞ.F'.P......vz.v•.v¶.v·. 000100
 76FFF876 FF0F6A50 16EC4680 FA4689EA 46880007 C626F05E C40000FF FF9AF076 vÞ.....ó^Þ&ó...Fõ.F'.Fš.Pj..v%.v 000120
 FF004EE9 0375EE46 08EC4688 12C48300 0003559A 006A0A76 FF0C76FF 271B68F6 -h.'.v..v.j..U....á..Fš.FŸu.ÖN.. 000140
 FFEE76FF 27E668F6 76FFF876 FFF076FF F276FFEA 76FF5040 F44688FC 76FFFE76 vz.v•.F¶aP.võ.v·.vÞ.v%.v-h|'.vŸ. 000160
 EC76FFEE 76FF27DA 68F676FF F876FF50 16EC468D 18C48300 0003739A 006AEC76 všj..s....á..Fš.P.v%.v-hö'.vŸ.vš 000180
 F276FF02 2368FA46 89EA4688 0007C626 F05EC4FF A7E910C4 83000001 189A006A j.......á.Öl.ó^Þ&ó...Fõ.F'h#..v· 0001A0
 000002DF 9A5016FA 468DF076 FFF276FF 02016800 0000F49A 5016FA46 8DF076FF .vÞ.F'.P.¶...h...v·.vÞ.F'.P.Ö... 0001C0
 4689EA46 880007C6 26F05EC4 00000239 9AF076FF F276FFF4 76FFFC76 FFFE76FF .vz.v•.v¶.v·.vÞ.9...ó^Þ&ó...Fõ.F 0001E0
```

```
Dump of file SATURN:[PCCOMMON.DUMP.DLL]DMLGLOB.TMP;1 on 18-APR-1990 10:44:56.67
File ID (627,22,0)   End of file block 315 / Allocated 316

Virtual block number 141 (0000008D), 512 (0200) bytes

00E90856 88064688 D88E0194 881E5657 000000C8 CBC95F5E 1F0000E9 0000B8FA *|..Õ...^_èuà...WV.|...Ä.F..V.Ö. 000000
05C2681E 016A316A FFFF68FF FF68D88E 03E4881E 56570000 02CBCBC9 5F5E1F00 ..^_èuà...WV.|ö..Äh..h..j1j..hö. 000020
5F5E1F00 00E9FE46 88FE4689 18C48300 00FFFF9A 006A416A 026A006A 006A006A j.j.j.j.jAj.......á..F±.F±Ö...^_ 000040
04030002 000C002E 03FE0002 02460008 03C00203 005E0005 02220203 0007CBC9 èù....".....^...á...F...±........ 000060
00000000 030C0015 04060005 023C0008 03AC0203 00380005 041D0203 00000015 ..........8...¯...<.......Ê..... 000080
5689F646 89FE5788 26FC4788 260E5EC4 040E4683 D88EFFFF 881E5657 000016C8 á...WV.|...Ä.F..á^.&.G=&.W±.F-.V 0000A0
4788260E 5EC4020E 4683F256 89F04689 FE578826 FC478826 0E5EC404 0E4683F8 %.F..á^.&.G=&.W±.FÞ.V·.F..á^.&.G 0000C0
578826FC 4788260E 5EC4040E 4683F446 89FE4788 260E5EC4 020E4683 EA4689FE ±.Fõ.F..á^.&.G±.F¶.F..á^.&.G=&.W 0000E0
68F076FF F276FF50 16FA468D FA4689EA 46880007 C626F05E C4FE5689 FC4689FE ±.F=.V±á^Þ&ó...Fõ.F°.F°.P.v·.vÞh 000100
FE76FF18 C4830000 00079A00 6A0A76FF 0C76FF27 1A68F676 FFF876FF 006A0204 ..j..v½.v-h.'.v..v.j..■....á..v± 000120
468DFA46 89EA4688 0007C626 F05EC400 00FFFF9A F076FFF2 76FFF476 FFFC76FF .v=.v¶.v·.vÞ.....á^Þ&ó...Fõ.F°.F 000140
468812C4 83000001 0F9A006A 0A76FF0C 76FF2718 68F676FF F876FF0F 6A5016EC &.Pj..v½.v-h.'.v..v.j.......á..F 000160
F876FFF0 76FFF276 FFEA76FF 5040F446 88FC76FF FE76FF00 4EE90375 EE4608EC &.FŸu.ÖN..v±.v=.F¶@P.võ.v·.vÞ.v½ 000180
76FFF876 FF5016EC 468D18C4 83000001 2D9A006A EC76FFEE 76FF27E6 68F676FF .v-hl'.vŸ.v&j..-....á..F&.P.v½.v 0001A0
5F5E1F00 00E90000 88FFA7E9 10C48300 00FFFF9A 006AEC76 FFEE76FF 27DA68F6 -hÖ'.vŸ.v&j.......á.ÖÏ.|..Ö...^  0001C0
F84689FE 578826FC 4788260E 5EC4040E 4683088E 0008881E 56570000 0CCBCBC9 èuà...WV.|...Ä.F..á^.&.G=&.W±.F% 0001E0

Dump of file SATURN:[PCCOMMON.DUMP.DLL]DMLGLOB.TMP;1 on 18-APR-1990 10:44:56.67
File ID (627,22,0)   End of file block 315 / Allocated 316

Virtual block number 142 (0000008E), 512 (0200) bytes

260E5EC4 040E4683 FE5689FC 4689FE57 8826FC47 88260E5E C4040E46 8. A5689 .V°.F..á^.&.G=&.W±.F=.V±.F..á^.& 000000
76FF27D8 68F876FF FA76FF0E 6AF476FF F676FFF6 5689F446 89FE5788 26. 4788 .G=&.W±.F¶.V-.v-.v¶j..v°.v½hÄ'.v 000020
014A881E 56570000 14CBCBC9 5F5E1F00 00E912C4 83000000 969A006A 0A76FF0C ..v.j.......á.Ö...^_èuà...WV.|J. 000040
88260E5E C4020E46 83F65689 F44689FE 578826FC 4788260E 5EC4040E 4683088E .Ä.F..á^.&.G=&.W±.F¶.V-.F..á^.&. 000060
8826FC47 88260E5E C4040E46 83FC4689 FE478826 0E5EC402 0E4683FE 4689FE47 G±.F±.F..á^.&.G±.F=.F..á^.&.G=&. 000080
FE7E83FA 5689F846 89FE5788 26FC4788 260E5EC4 040E4683 F25689F0 4689FE57 W±.FÞ.V·.F..á^.&.G=&.W±.F%.V°.-± 0000A0
271A68F4 76FFF676 FF0E6A02 0468F076 FFF276FF F876FFFA 76FF0044 E9037400 .t.ÖO..v°.v½.v·.vÞh..j..v-.v¶h.' 0000C0
9AF876FF FA76FFF0 76FFF276 FF020268 18C48300 0002849A 006A0A76 FF0C76FF .v..v.j.......á.h...v·.vÞ.v°.v½. 0000E0
76FF0C76 FF271868 F476FFF6 76FFFE76 FF5016EC 468D0062 E90000B8 0000FFFF ....|..Öb..F&.P.v±.v-.v¶h.'.v..v 000100
FFFA76FF 0030E900 00880006 E90374EE 4608EC46 8812C483 000002BF 9A006A0A .j..¢....á..F&.FŸt.Ö..|..ÖO..v°. 000120
A79A006A EC76FFEE 76FF271A 68F476FF F676FF00 6A020468 F076FFF2 76FFF876 v½.v·.vÞh..j..v-.v¶h.'.vŸ.v&j..l 000140
06468808 8E018E88 1E565700 0000C8CB C95F5E1F 0000E900 008818C4 83000001 ....á.|..Ö...^_èuà...WV.|/..Ä.F. 000160
6A316AFF FF68FFFF 68D88E02 09881E56 57000002 C8CBC95F 5E1F0000 E9085688 .V.Ö...^_èuà..¯WV.|l..Äh..h..j1j 000180
E9FE4688 FE468918 C4830000 FFFF9A00 6A426A02 6A006A00 6A006A05 DA681E01 ..hÖ.j.j.j.j.jBj.......á..F±.F±Ö 0001A0
001602F8 00050246 000800AD 0203005E 00050249 02030007 90CBC95F 5E1F0000 ...^_èü.....I...^...Ü...f...«... 0001C0
00080260 02030038 00050312 02030000 001602F8 00020000 002E02F3 00020201 l...µ.......%...........Ö...'... 0001E0

Dump of file SATURN:[PCCOMMON.DUMP.DLL]DMLGLOB.TMP;1 on 18-APR-1990 10:44:56.67
File ID (627,22,0)   End of file block 315 / Allocated 316

Virtual block number 143 (0000008F), 512 (0200) bytes

040E4683 D88EFFFF 881E5657 000012C8 00000000 00000000 00000000 0000023C <...............Á...WV.|...Ä.F.. 000000
FE578826 FC478826 0E5EC404 0E4683FA 5689F846 89FE5788 26FC4788 260E5EC4 á^.&.G=&.W±.F%.V°.F..á^.&.G=&.W± 000020
C4040E46 83FE5689 FC4689FE 578826FC 4788260E 5EC4040E 4683F056 89EE4689 .FŸ.VÞ.F..á^.&.G=&.W±.F=.V±.F..á 000040
D868F876 FFFA76FF 0E6AFC76 FFFE76FF F45689F2 4689FE57 8826FC47 88260E5E ^.&.G=&.W±.F·.V¶.v±.v=j..v°.v½hÄ 000060
F6468800 06E90375 00F67E83 F6468912 C4830000 00AD9A00 6A0A76FF 0C76FF27 '.v..v.j..Ü....á..F-.—.u.Ö...F- 000080
00FFFF9A 006A0A76 FF0C76FF 27D868F8 76FFFA76 FF0F6AF2 76FFF476 FF0024E9 Ö$..v¶.v·j..v°.v½hÄ'.v..v.j..... 0000A0
260E5EC4 040E4683 D88E0008 881E5657 000014C8 CBC95F5E 1F0000E9 12C48300 ..á.Ö...^_èuà...WV.|...Ä.F..á^.& 0000C0
C4020E46 83FE4689 FE478826 0E5EC402 0E4683F6 5689F446 89FE5788 26FC4788 .G=&.W±.F¶.V-.F..á^.&.G±.F±.F..á 0000E0
4683F256 89F04689 FE578826 FC478826 0E5EC404 0E4683FC 4689FE47 88260E5E ^.&.G±.F=.F..á^.&.G=&.W±.FÞ.V·.F 000100
FF027768 0082E903 7400FE7E 83FA5689 F84689FE 578826FC 4788260E 5EC4040E ..á^.&.G=&.W±.F%.V°.-±.t.Ö..hw.. 000120
6A020468 F076FFF2 76FFF876 FFFA76FF 0000017A 9AF876FF FA76FFF0 76FFF276 v·.vÞ.v°.v½.z....v°.v½.v·.vÞh..j 000140
F276FF02 276818C4 83000001 A19A006A 0A76FF0C 76FF271A 68F476FF F676FF0E ..v-.v¶h.'.v..v.j..À....á.h'..v· 000160
FF0F6A02 0468F076 FFF276FF F876FFFA 76FF0000 FFFF9AF8 76FFFA76 FFF076FF .vÞ.v°.v½......v°.v½.v·.vÞh..j.. 000180
46800062 E9000088 18C48300 0001C89A 006A0A76 FF0C76FF 271A68F4 76FFF676 v-.v¶h.'.v..v.j..à....á.|..Öb..F 0001A0
8812C483 00000203 9A006A0A 76FF0C76 FF271868 F476FFF6 76FFFE76 FF5016EC &.P.v±.v-.v¶h.'.v..v.j.......á.. 0001C0
6AFC76FF F076FFF2 76FFF876 FFFA76FF 0030E900 00880006 E90374EE 4608EC46 F&.FŸt.Ö..|..ÖO..v°.v½.v·.vÞ.v=j 0001E0
```

```
Dump of file SATURN:[PCCOMMON.DUMP.DLL]OMLGLOB.TMP;1 on 18-APR-1990 10:44:56.67
File ID (627,22,0)   End of file block 315 / Allocated 316

Virtual block number 144 (00000090), 512 (0200) bytes

 0000E900 008818C4 83000000 7A9A006A EC76FFEE 76FF271A 68F476FF F676FF00 ..v-.v¶h.'.vŸ.všj..z....á.¡..Õ.. 000000
 FE578826 FC47Cd26 0E5EC404 0E468308 8E00C488 1E565700 0012C8C8 C95F5E1F .^_èùà...WV.¡á..Ä.F..á^.&.G=&.W±  000020
 C4020E46 83F25689 F04689FE 578826FC 4788260E 5EC4040E 4683F856 89F64689 .F=.V%.F..á^.&.G=&.W±.FÞ.V·.F..á 000040
 88260E5E C4040E44 83F44689 FE478826 0E5EC402 0E4683EE 4689FE47 88260E5E ^.&.G±.FŸ.F..á^.&.G±.F¶.F..á^.&. 000060
 76FF5016 FA468DFA 4689EE46 880007C6 26F05EC4 FE5689FC 4689FE57 8826FC47 G=&.W±.F=.V±á^Þ&ó...FŸ.F°.F°.P.v 000080
 83000001 639A006A 0A76FF0C 76FF271A 68F676FF F876FF00 6A020468 F076FFF2 ·.vÞh..j..v%.v-h.'.v..v.j..c.... 0000A0
 EE468800 07C626F0 5EC40000 FFFF9AF0 76FFF276 FFF476FF FC76FFFE 76FF18C4 á..v±.v=.v¶.v·.vÞ.....á^Þ&ó...FŸ 0000C0
 57000000 C8C8C95F 5E1F0000 E9000088 FA4689EE 46880007 C626F05E C4FA4689 .F°á^Þ&ó...FŸ.F°¡..Õ...^_èùà...W 0000E0
 8E02F388 1E565700 0002C8C8 C95F5E1F 0000E908 56880646 88D88E02 1D881E56 V.¡...Ä.F..V.Õ...^_èùà...WV.¡æ.. 000100
 0000FFFF 9A006A43 6A026A00 6A006A00 6A05F268 1E016A31 6AFFFF68 FFFF68D8 Äh..h..j1j..h·.j.j.j.j.jCj...... 000120
 02C20203 005E0005 02A80203 000790C8 C95F5E1F 0000E9FE 4688FE46 8918C483 .á..F±.F±Õ...^_èù..... ...^...ô. 000140
 032C0203 00000017 03120002 02E80017 03150005 0000002E 03000002 02460008 ..F...............Š............, 000160
 040E4683 D88EFFFF 881E5657 000026C8 00000000 023C0008 013C0203 00380005 ..8...<...<.....à&..WV.¡...Ä.F.. 000180
 FE578826 FC478826 0E5EC404 0E4683FA 5689F846 89FE5788 26FC4788 260E5EC4 á^.&.G=&.W±.F%.V°.F..á^.&.G=&.W± 0001A0
 C4040E46 830C5689 DA4689FE 578826FC 4788260E 5EC4040E 4683E056 890E4689 .F8.VÅ.F..á^.&.G=&.W±.FÖ.VÉ.F..á 0001C0
 89FE5788 26FC4788 260E5EC4 040E4683 F65689F4 4689FE57 8826FC47 88260E5E ^.&.G=&.W±.F¶.V-.F..á^.&.G=&.W±. 0001E0

Dump of file SATURN:[PCCOMMON.DUMP.DLL]OMLGLOB.TMP;1 on 18-APR-1990 10:44:56.67
File ID (627,22,0)   End of file block 315 / Allocated 316

Virtual block number 145 (00000091), 512 (0200) bytes

 5EC4040E 4683EC56 89EA4689 FE578826 FC478826 0E5EC404 0E4683E8 5689E646 F].VÒ.F..á^.&.G=&.W±.Fõ.V$.F..á^ 000000
 4689FE57 8826FC47 88260E5E C4040E46 83E45689 E24689FE 578826FC 4788260E .&.G=&.W±.Fã.VÒ.F..á^.&.G=&.W±.F 000020
 6ADA76FF DC76FFF0 5689EE46 89FE5788 26FC4788 260E5EC4 040E4683 FE5689FC =.V±.F..á^.&.G=&.W±.FŸ.VÞ.vÉ.vÖj 000040
 F27E83F2 468912C4 83000001 169A006A 0A76FF0C 76FF27D8 68F876FF FA76FF0E ..v°.v%hÄ'.v..v.j.......á..F·.-· 000060
 0C76FF27 D868F876 FFFA76FF 0F6AF476 FFF676FF 0129E9F2 46880006 E9037500 .u.Õ...F·Õ)..v-.v¶j..v°.v%hÄ'.v. 000080
 FF00F6E9 F2468800 06E90375 00F27E83 F2468912 C4830000 01499A00 6A0A76FF .v.j..l....á..F·.-·.u.Õ...F·Õ-.. 0000A0
 12C48300 00017C9A 006A0A76 FF0C76FF 27D868F8 76FFFA76 FF106AE6 76FFE876 vÒ.vlj..v°.v%hÄ'.v..v.j..|....á. 0000C0
 F876FFFA 76FF136A EA76FFEC 76FF00C3 E9F24688 0006E903 7500F27E 83F24689 .F·.-·.u.Õ...F·Õù..v$.võj..v°.v% 0000E0
 880006E9 037500F2 7E83F246 8912C483 000001AF 9A006A0A 76FF0C76 FF27D868 hÄ'.v..v.j..£....á..F·.-·.u.Õ... 000100
 E29A006A 0A76FF0C 76FF27D8 68F876FF FA76FF15 6AE276FF E476FF00 90E9F246 F·Õ...vÕ.vãj..v°.v%hÄ'.v..v.j..å 000120
 116AFC76 FFFE76FF 005DE9F2 46880006 E9037500 F27E83F2 468912C4 83000001 ....á..F·.-·.u.Õ...F·Õ]..v±.v=j. 000140
 00F27E83 F2468912 C4830000 02159A00 6A0A76FF 0C76FF27 D868F876 FFFA76FF .v°.v%hÄ'.v..v.j.......á..F·.-·. 000160
 FF0C76FF 27D868F8 76FFFA76 FF126AEE 76FFF076 FF002AE9 F2468800 u.¯90375 u.Õ...F·Õ*..vÞ.vŸj..v°.v%hÄ'.v.. 000180
 56570000 14C8C8C9 5F5E1F00 00E9F246 88F24689 12C48300 00FFFF9A 00c 9A76 v.j.......á..F·.F·Õ...^_èùà...WV 0001A0
 C4020E46 83F65689 F44689FE 578826FC 4788260E 5EC4040E 4683088E 000E3B1E .¡...Ä.F..á^.&.G=&.W±.F¶.V-.F..á 0001C0
 88260E5E C4040E46 83FC4689 FE478826 0E5EC402 0E4683FE 4689FE47 88260E5E ^.&.G±.F±.F..á^.&.G±.F=.F..á^.&. 0001E0

Dump of file SATURN:[PCCOMMON.DUMP.DLL]OMLGLOB.TMP;1 on 18-APR-1990 10:44:56.67
File ID (627,22,0)   End of file block 315 / Allocated 316

Virtual block number 146 (00000092), 512 (0200) bytes

 5689F846 89FE5788 26FC4788 260E5EC4 040E4683 F25689F0 4689FE57 8826FC47 G=&.W±.FÞ.V·.F..á^.&.G=&.W±.F%.V 000000
 76FF0000 FFFF9AF8 76FFFA76 FFF076FF F276FF02 2F680140 E9037400 FE7E83FA °.-±.t.Õa.h/..v·.vÞ.v°.v%......v 000020
 006A0A76 FF0C76FF 271A68F4 76FFF676 FF0E6A02 0468F076 FFF276FF F876FFFA °.v%.v·.vÞh..j..v-.v¶h.'.v..v.j. 000040
 68F476FF F676FF0F 6A020468 F076FFF2 76FFF876 FFFA76FF 18C48300 0002F89A .«....á..v°.v%.v·.vÞh..j..v-.v¶h 000060
 0468F076 FFF276FF F876FFFA 76FF18C4 83000003 259A006A 0A76FF0C 76FF271A .'.v..v.j..X....á..v°.v%.v·.vÞh. 000080
 FFFA76FF 18C48300 00034F9A 006A0A76 FF0C76FF 271A68F4 76FFF676 FF106A02 .j..v-.v¶h.'.v..v.j..O....á..v°. 0000A0
 799A006A 0A76FF0C 76FF271A 68F476FF F676FF13 6A020468 F076FFF2 76FFF876 v%.v·.vÞh..j..v-.v¶h.'.v..v.j..y 0000C0
 271A68F4 76FFF676 FF156A02 0468F076 FFF276FF F876FFFA 76FF18C4 83000003 ....á..v°.v%.v·.vÞh..j..v-.v¶h.' 0000E0
 6A020468 F076FFF2 76FFF876 FFFA76FF 18C48300 0003A39A 006A0A76 FF0C76FF .v..v.j..È....á..v°.v%.v·.vÞh..j 000100
 F876FFFA 76FF18C4 83000003 C09A006A 0A76FF0C 76FF271A 68F476FF F676FF11 ..v-.v¶h.'.v..v.j..è....á..v°.v% 000120
 0003F49A 006A0A76 FF0C76FF 271A68F4 76FFF676 FF126A02 0468F076 FFF276FF .v·.vÞh..j..v-.v¶h.'.v..v.j..¶.. 000140
 76FF0C76 FF271B68 F476FFF6 76FFFE76 FF5016EC 46800140 E9000088 18C48300 ..á.¡..ÕM..Fš.P.v±.v-.v¶h.'.v..v 000160
 E9FE4688 0118E900 00880006 E90374EE 4608EC46 8812C483 000000E3 9A006A0A .j..D....á..Fš.FŸt.Õ..¡..Õ...F±Õ 000180
 FFF276FF 02966800 01E90000 04399AF8 76FFFA76 FFF076FF F276FF02 94680085 ç.h...v·.vÞ.v°.v%.9...Õl.h...v·. 0001A0
 9AF876FF FA76FFF0 76FFF276 FF025F68 008AE900 0004509A F876FFFA 76FFF076 vÞ.v°.v%.P...Õa.h_..v·.vÞ.v°.v%. 0001C0
 76FF0234 68008FE9 0000047B 9AF876FF FA76FFF0 76FFF276 FF01FF68 00000464 d...h...v·.vÞ.v°.v%.(...Õ..h4..v 0001E0
```

```
Dump of file SATURN:[PCCOMMON.DUMP.DLL]DMLGLOB.TMP;1 on 18-APR-1990 10:44:56.67
File ID (627,22,0)   End of file block 315 / Allocated 316

Virtual block number 147 (00000093), 512 (0200) bytes

A69AF876 FFFA76FF F076FFF2 76FF01FF 68000004 8F9AF876 FFFA76FF F076FFF2 ..vb.v*.vh.....h...v..vb.v*.vh.! 000000
028A6800 4DE90000 04BD9AF8 76FFFA76 FFF076FF F276FF02 95680064 E9000004 ...Õd.h...v..vb.v*.vh.§...ÕM.h.. 000020
30FF43E9 0375000F 300033E9 0036E900 0002AA9A F876FFFA 76FFF076 FFF276FF .v..vb.v*.vh.¯...Õ6.Õ3.=..u.ÕC.= 000040
30FF51E9 0375C( 3 30FFC6E9 03750012 30FF87E9 03750011 30FF52E9 03750010 ..u.ÕR.=..u.Õñ.=..u.Õ6.=..u.Õa.= 000060
76FFF676 FF006A02 0468F076 FFF276FF F876FFFA 76FF0000 E9FF74E9 03750015 ..u.Õt.Õ...v*.vh.v..vbh..j..v-.v 000080
000016C8 C8C95F5E 1F0000E9 18C48300 0002019A 006AEC76 FFEE76FF 271A68F4 ¶h.'.vŸ.v$j..|....á.Õ...^_èùà... 0000A0
0E4683F8 5689F646 89FE5788 26FC4788 260E5EC4 040E4683 D88E0232 881E5657 WV.¦2..Ä.F..á^.&.G•&.W±.F¯.Vh.F. 0000C0
EA4689FE 4788260E 5EC4020E 4683F256 89F04689 FE578826 FC478826 0E5EC404 .á^.&.G•&.W±.Fb.V..F..á^.&.G±.Fõ 0000E0
FC4689FE 578826FC 4788260E 5EC4040E 4683F446 89FE4788 260E5EC4 020E4683 .F..á^.&.G±.F¶.F..á^.&.G•&.W±.F• 000100
006A0204 68F076FF F276FF50 16FA468D FA4689EA 46880007 C626F05E C4FE5689 .V±á^Þ&ó...Fõ.F*.F*.P.v..vbh..j. 000120
FFFC76FF FE76FF18 C4830000 06039A00 6A0A76FF 0C76FF27 1A68F676 FFF876FF .vh.v-h.'.v..v.j.......á..v±.v•. 000140
6A5016EC 4680FA46 89EA4688 0007C626 F05EC400 00071F9A F076FFF2 76FFF476 v¶.v..vb.....á^Þ&ó...Fõ.F*.F$.Pj 000160
EE4608EC 468812C4 83000006 3B9A006A 0A76FF0C 76FF271B 68F676FF F876FF17 ..vh.v-h.'.v..v.j..;....á..F$.FŸ 000180
68F676FF F876FFF0 76FFF276 FFEA76FF 5040F446 88FC76FF FE76FF00 4EE90375 u.ÕN..v±.v•.F¶@P.võ.v..vb.vh.v-h 0001A0
270A68F6 76FFF876 FF5016EC 468018C4 83000006 599A006A EC76FFEE 76FF27E6 |'.vŸ.v$j..Y....á..F$.P.vh.v-hÕ' 0001C0
F676FFF8 76FF196A 5016EC46 80FFA7E9 10C48300 00067C9A 006AEC76 FFEE76FF .vŸ.v$j..|....á.ÕI..F$.Pj..vh.v- 0001E0

Dump of file SATURN:[PCCOMMON.DUMP.DLL]DMLGLOB.TMP;1 on 18-APR-1990 10:44:56.67
File ID (627,22,0)   End of file block 315 / Allocated 316

Virtual block number 148 (00000094), 512 (0200) bytes

76FF004E E90375EE 4608EC46 8812C483 00000684 9A006A0A 76FF0C76 FF271868 h.'.v..v.j..Ç....á..F$.FŸu.ÕN..v 000000
76FFEE76 FF27E668 F676FFF8 76FFF076 FFF276FF EA76FF50 40F44688 FC76FFFE ±.v•.F¶@P.võ.v..vb.vh.v-h|'.vŸ.v 000020
6AEC76FF EE76FF27 DA68F676 FFF876FF 5016EC46 8D18C483 00000602 9A006AEC $j..@....á..F$.P.vh.v-hÕ'.vŸ.v$j 000040
FFF276FF 022368FA 4689EA46 880007C6 26F05EC4 FFA7E910 C4830000 0510D9A00 .......á.ÕI.á^Þ&ó...Fõ.F*h#..v.. 000060
FF000004 229A5016 FA468DF0 76FFF276 FF022F68 0000070B 9A5016FA 4680F076 vb.F*.P.....h/..v..vb.F*.P."..... 000080
FA4689EA 46880007 C626F05E C40000FF FF9AF076 FFF276FF F476FFFC 76FFFE76 v±.v•.v¶.v..vb.....á^Þ&ó...Fõ.F* 0000A0
0000E908 56880646 88D88E05 34881E56 57000000 C8C8C95F 5E1F0000 E90000B8 |..Õ...^_èùà...WV.¦4..Ä.F..V.Õ.. 0000C0
6A060A68 1E016A31 6AFFFF68 FFFF6808 8E074388 1E565700 0002C8C8 C95F5E1F .^_èùà...WV.¦C..Äh..h..j1j..h..j 0000E0
C95F5E1F 0000E9FE 468BFE46 8918C483 0000FFFF 9A006A44 6A026A00 6A006A00 .j.j.j.jDj.......á..F±.F±Õ...^_è 000100
07650005 0000002E 07500002 02460008 05090203 005E0005 05C20203 000790C8 ù.....ó...^...l...F...¡ ......e. 000120
00000000 023C0008 06F80203 00000018 07620002 00380005 077C0203 07380018 ..;...|...8...b.......%...<..... 000140
56570000 02C8C8C9 5F5E1F00 00E90856 88064688 D88EFFFF 881E5657 000000C8 à...WV.¦...Ä.F..V.Õ...^_èùà...WV 000160
006A456A 026A006A 006A006A 0622681E 016A316A FFFF68FF FF6808BE 0008881E .¦...Äh..h..j1j..h".j.j.j.j.jEj. 000180
00000019 002A0005 0004C8C9 5F5E1F00 00E9FE46 88FE4689 18C48300 00FFFF9A ......á..F±.F±Õ...^_èù....*..... 0001A0
00000000 00000000 00000019 00270002 00380005 00410203 0000002E 00220002 .."........A...8...'............ 0001C0
5689F446 89FE5788 26FC4788 260E5EC4 040E4683 D88EFFFF 881E5657 000016C8 à...WV.¦...Ä.F..á^.&.G•&.W±.F¶.V 0001E0

Dump of file SATURN:[PCCOMMON.DUMP.DLL]DMLGLOB.TMP;1 on 18-APR-1990 10:44:56.67
File ID (627,22,0)   End of file block 315 / Allocated 316

Virtual block number 149 (00000095), 512 (0200) bytes

4788260E 5EC4040E 4683EC56 89EA4689 FE578826 FC478826 0E5EC404 0E4683F6 -.F..á^.&.G•&.W±.Fõ.V$.F..á^.&.G 000000
FA5689F8 4689FE57 8826FC47 88260E5E C4040E46 83FE5689 FC4689FE 578826FC •&.W±.F•.V±.F..á^.&.G•&.W±.Fh.V* 000020
F676FF0E 6AFC76FF FE76FFF0 5689EE46 89FE5788 26FC4788 260E5EC4 040E4683 .F..á^.&.G•&.W±.FŸ.Vb.v±.v•j..v- 000040
E9037500 F27E83F2 468912C4 83000000 C29A006A 0A76FF0C 76FF2708 68F476FF .v¶hÄ'.v..v.j..ó....á..F..-..u.Õ 000060
6A0A76FF 0C76FF27 DA68F476 FFF676FF 0F6AF876 FFFA76FF 005DE9F2 46880006 ...F.Õ]..v*.vhj..v-.v¶hÄ'.v..v.j 000080
76FFF076 FF002AE9 F2468800 06E90375 00F27E83 F2468912 C4830000 00F59A00 ..%....á..F..-..u.Õ...F.Õ*..vb.v 0000A0
88F24689 12C48300 00FFFF9A 006A0A76 FF0C76FF 27D868F4 76FFF676 FF 6AEE Ÿj..v-.v¶hÄ'.v..v.j.......á..F.. 0000C0
4788260E 5EC4040E 4683088E 0008881E 56570000 14C8C8C9 5F5E1F00 00E. 246 F.Õ...^_èùà...WV.¦...Ä.F..á^.&.G 0000E0
0E5EC402 0E4683FE 4689FE47 88260E5E C4020E46 83F65689 F44689FE 5788&6FC •&.W±.F¶.V-.F..á^.&.G±.F±.F..á^. 000100
040E4683 F25689F0 4689FE57 8826FC47 88260E5E C4040E46 83FC4689 FE478826 &.G±.F•.F..á^.&.G•&.W±.Fb.V..F.. 000120
F276FF02 48680098 E9037400 FE7E83FA 5689F846 89FE5788 26FC4788 260E5EC4 á^.&.G•&.W±.Fh.V*.-±.t.Õ..hH..v. 000140
FF0E6A02 0468F076 FFF276FF F876FFFA 76FF0000 025A9AF8 76FFFA76 FFF076FF .vb.v*.vh.Z....v*.v%.v..vbh..j.. 000160
76FFF876 FFFA76FF 18C48300 00010B9A 006A0A76 FF0C76FF 271A68F4 76FFF676 v-.v¶h.'.v..v.j..Ü....á..v*.vh.v 000180
83000002 059A006A 0A76FF0C 76FF271A 68F476FF F676FF0F 6A020468 F076FFF2 ..vbh..j..v-.v¶h.'.v..v.j....... 0001A0
FF0C76FF 271A68F4 76FFF676 FF106A02 0468F076 FFF276FF F876FFFA 76FF18C4 á..v*.vh.v..vbh..j..v-.v¶h.'.v.. 0001C0
F476FFF6 76FFFE76 FF5016EC 46800007 E90000B8 18C48300 00022C9A 006A0A76 v.j..,....á.¦..Õa..F$.P.v±.v-.v¶ 0001E0
```

Dump of file SATURN:[PCCOMMON.DUMP.DLL]DMLGLOB.TMP;1 on 18-APR-1990 10:44:56.67
File ID (627,22,0)   End of file block 315 / Allocated 316

Virtual block number 150 (00000096), 512 (0200) bytes

```
00880006 E90374EE 4608EC46 8812C483 00000281 9A006A0A 76FF0C76 FF271868 h.'.v..v.j..Ÿ....á..F§.FŸt.Õ..j. 000000
20E90000 02719A.8 76FFFA76 FFF076FF F276FF02 95680031 E9FE4688 00A5E900 .ÕE..F±Õ1.h...v·.vÞ.vª.v½.q...Õ- 000020
0375000F 300013E9 0016E900 0002CE9A F876FFFA 76FFF076 FFF276FF 028A6800 .h...v·.vÞ.vª.v½.ö...Õ..Õ..=..u. 000040
FF006A02 0468F076 FFF276FF F876FFFA 76FF0000 E9FFD6E9 03750010 30FFC7E9 Õú.=..u.Õ•.Õ...vª.v½.v·.vÞh..j.. 000060
8568001A E9FE4688 18C48300 00008F9A 006AEC76 FFEE76FF 271A68F4 76FFF676 v—.v¶h.'.vŸ.v§j.......á..F±Õ..h. 000080
FFDEE903 75000E3D 0008E900 0EE90000 FFFF9AF8 76FFFA76 FFF076FF F276FF02 ..v·.vÞ.vª.v½.....Õ..Õ..=..u.Õ8. 0000A0
5EC4040E 4683D88E 0112881E 56570000 16C8C8C9 5F5E1F00 00E90000 880000E9 Õ..¡..Õ...^_èùà...WV.¡...Å.F..á^ 0000C0
4689FE57 8826FC47 88260E5E C4040E46 83F85689 F64689FE 578826FC 4788260E .&.G=&.W±.F‾.V½.F..á^.&.G=&.W±.F 0000E0
F44689FE 4788260E 5EC4020E 4683EA46 89FE4788 260E5EC4 020E4683 F25689F0 Þ.V·.F..á^.&.G±.FÕ.F..á^.&.G±.F¶ 000100
89EA4688 0007C626 F05EC4FE 5689FC46 89FE5788 26FC4788 260E5EC4 040E4683 .F..á^.&.G=&.W±.F=.V±á^Þ&ó...Fõ. 000120
76FF0C76 FF271A68 F676FFF8 76FF006A 020468F0 76FFF276 FF5016FA 468DFA46 F•.F•.P.v·.vÞh..j..v½.v-h.'.v..v 000140
C4000004 E19AF076 FFF276FF F476FFFC 76FFFE76 FF18C483 000003C5 9A006A0A .j..é....á..v±.v=.v¶.v·.vÞ.Å...á 000160
FF0C76FF 271868F6 76FFF876 FF116A50 16EC468D FA4689EA 46880007 C626F05E ^Þ&ó...Fõ.F•.F§.Pj..v½.v-h.'.v.. 000180
F4468BFC 76FFFE76 FF004EE9 0375EE46 08EC4688 12C48300 0003FD9A 006A0A76 v.j..».....á..F§.FŸu.ÕN..v±.v=.F¶ 0001A0
000418 9A 006AEC76 FFEE76FF 27E668F6 76FFF876 FFF076FF F276FFEA 76FF5040 ƋP.võ.v·.vÞ.v½.v-hl'.vŸ.v§j..... 0001C0
83000004 3E9A006' EC76FFEE 76FF27DA 68F676FF F876FF50 16EC468D 18C48300 ..á..F§.P.v½.v-hÕ'.vŸ.v§j..>.... 0001E0
```

Dump of file SATURN:[PCCOMMON.DUMP.DLL]DMLGLOB.TMP;1 on 18-APR-1990 10:44:56.67
File ID (627,22,0)   End of file block 315 / Allocated 316

Virtual block number 151 (00000097), 512 (0200) bytes

```
04769A00 6A0A76FF 0C76FF27 1868F676 FFF876FF 126A5016 EC468DFF A7E910C4 á.Õl..F§.Pj..v½.v-h.'.v..v.j..v. 000000
76FFEA76 FF5040F4 4688FC76 FFFE76FF 004EE903 75EE4608 EC468812 C4830000 ...á..F§.FŸu.ÕN..v±.v=.F¶ƋP.võ.v 000020
EC468D18 C4830000 04949A00 6AEC76FF EE76FF27 E668F676 FFF876FF F076FFF2 ·.vÞ.v½.v-hl'.vŸ.v§j.......á..F§ 000040
5EC4FFA7 E910C483 000001B1 9A006AEC 76FFEE76 FF27DA68 F676FFF8 76FF5016 .P.v½.v-hÕ'.vŸ.v§j..Ÿ....á.Õl.á^ 000060
48680000 04CD9A50 16FA468D F076FFF2 76FF0223 68FA4689 EA468800 07C626F0 Þ&ó...Fõ.F•h#..v·.vÞ.F•.P.è...hN 000080
F076FFF2 76FFF476 FFFC76FF FE76FF00 00018A9A 5016FA46 80F076FF F276FF02 ..v·.vÞ.F•.P......v±.v=.v¶.v·.vÞ 0000A0
0000C8C8 C95F5E1F 0000E900 0088FA46 89EA4688 0007C626 F05EC400 00FFFF9A .....á^Þ&ó...Fõ.F•¡..Õ...^_èùà.. 0000C0
05881E56 57000002 C8C8C95F 5E1F0000 E9085688 064688D8 8E02F688 1E565700 .WV.¡-..Å.F..V.Õ...^_èùà..‾WV.¡. 0000E0
FFFF9A00 6A466A02 6A006A00 6A006A06 28681E01 6A316AFF FF68FFFF 68088E05 ..Áh..h..j1j..h(.j.j‾j.j.jFj.... 000100
0203005E 00050384 02030007 90C8C95F 5E1F0000 E9FE4688 FE468918 C4830000 ...á..F±.F±Õ...^_èù........^... 000120
00020038 0005053E 020304F0 001A0527 00050000 002E051F 00020246 00080398 ....F..........T...».....>...8... 000140
040E4683 D88EFFFF 881E5657 00001EC8 0000023C 000804BA 02030000 001A0524 $.......¤...<...à...WV.¡...Å.F.. 000160
FE578826 FC478826 0E5EC404 0E4683EA 5689E846 89FE5788 26FC4788 260E5EC4 á^.&.G=&.W±.FÒ.Võ.F..á^.&.G=&.W± 000180
5016EC46 80FA76FF 006A006A FA4689FE 4788260E 5EC4020E 4683F456 89F24689 .F·.V¶.F..á^.&.G±.F•j.j..vª.F§.P 0001A0
00ADE903 7400EC7E 83018FE9 E6468800 06E90375 00E67E83 E6468900 00FFFF9A ......Fl.-l.u.Õ...FlÕ...~§.t.ÕÜ. 0001C0
FC478826 0E5EC404 0E4683F0 5689EE46 89FE5788 26FC4788 260E5EC4 040E4683 .F..á^.&.G=&.W±.FŸ.VÞ.F..á^.&.G= 0001E0
```

Dump of file SATURN:[PCCOMMON.DUMP.DLL]DMLGLOB.TMP;1 on 18-APR-1990 10:44:56.67
File ID (627,22,0)   End of file block 315 / Allocated 316

Virtual block number 152 (00000098), 512 (0200) bytes

```
76FFF276 FFF476FF E276FFE4 76FFFA76 FF5016FC 468DE456 89E24689 FE578826 &.W±.Fã.VÕ.F=.P.vª.vÕ.vã.v¶.v·.v 000000
037500E6 7E83E646 891AC483 000000F5 9A006AEE 76FFF076 FF27DE68 E876FFEA õ.vÕhß'.vÞ.vŸj..‰....á..Fl.-l.u. 000020
FFF076FF 271868E8 76FFEA76 FF066AE2 76FFE476 FF056A01 1DE9E646 880006E9 Õ...FlÕ..j..vÕ.vãj..võ.vÕh.'.vÞ. 000040
468800E8 E9998188 0006E903 7500E67E 83E64689 14C48300 0001529A 006AEE76 vŸj..R....á..Fl.-l.u.Õ..¡Ÿ.ÕÕ..F 000060
89F64689 FE578826 FC478826 0E5EC404 0E468300 4EE9F856 89F64689 F05688EE Ÿ.VÞ.F-.V½ÕN..F..á^.&.G=&.W±.F-. 000080
6A0A76FF 0C76FF27 DF68E876 FFEA76FF F276FFF4 76FFFA76 FF5016FC 468DF856 V½.F=.P.vª.v¶.v·.võ.vÕhÕ'.v..v.j 0000A0
FE76FF09 6A008BE9 E6468800 06E90375 00E67E83 E6468916 C4830000 01879A00 ........á..Fl.-l.u.Õ...FlÕ..j..v± 0000C0
468914C4 83000001 B99A006A 0A76FF0C 76FF2718 68E876FF EA76FF0A 6AFC76FF .v•j..võ.vÕh.'.v..v.j..¿....á..F 0000E0
271768E8 76FFEA76 FF0F6A50 16FA4680 0056E9E6 46880006 E9037500 E67E83E6 l.-l.u.Õ...FlÕV..F•.Pj..võ.vÕh.' 000100
E9E64688 0006E903 7500E67E 83E64689 12C48300 0001EC9A 006A0A76 FF0C76FF .v..v.j..&....á..Fl.-l.u.Õ...FlÕ 000120
0000FFFF 9A006A0A 76FF0C76 FF27D868 E876FFEA 76FF106A F676FFF8 76FF0024 $..v½.v-j..võ.vÕhÄ'.v..v.j...... 000140
8B260E5E C4040E46 83D88E00 08881E56 5700001C C8C8C95F 5E1F0000 E912C483 .á.Õ...^_èùà...WV.¡...Å.F..á^.&. 000160
5EC4020E 4683FC46 89FE4788 260E5EC4 020E4683 F05689EE 4689FE57 8826FC47 G=&.W±.FŸ.VÞ.F..á^.&.G±.F=.F..á^ 000180
0E4683EA 5689E846 89FE5788 26FC4788 260E5EC4 040E4683 FA4689FE 4788260E .&.G±.F•.F..á^.&.G=&.W±.FÒ.Võ.F. 0001A0
7510FC7E 83000FE9 037500FC 7E83F456 89F24689 FE578826 FC478826 0E5EC404 .á^.&.G=&.W±.F·.V¶.-•.u.Õ...-•.u 0001C0
0A76FF0C 76FF2718 68EE76FF F076FF10 6A5016E4 468D01C3 E90000B8 0006E903 .Õ..¡..Õù..FÕ.Pj..vÞ.vŸh.'.v..v. 0001E0
```

Dump of file SATURN:[PCCOMMON.DUMP.DLL]DMLGLOB.TMP;1 on 18-APR-1990 10:44:56.67
File ID (627,22,0)   End of file block 315 / Allocated 316

Virtual block number 153 (00000099), 512 (0200) bytes

```
0A76FF0C 76FF2712 68EE76FF F076FF0F 6A5016FE 468012C4 83000002 839A006A j..°....á..Fz.Pj..vÞ.vŸh.'.v..v. 000000
7400F67E 83000000 519A5016 F6468DFE 76FF006A 006A12C4 83000003 389A006A j..8....á.j.j..vz.F-.P.Q....--.t 000020
16EC4680 FE76FF00 6A006A00 0002F29A 5016F846 8DFA76FF 006A006A 0080E903 .Ô..j.j..vª.F½.P.·...j.j..vz.F$. 000040
F276FFF4 76FFE876 FFEA76FF 02456800 14E9037F F84639EC 46880000 FFFF9A50 P......F$9F½..Ô..hE..vô.vÔ.v¶.v· 000060
FF271A68 EE76FFF0 76FF006A FE76FFE8 76FFEA76 FFF276FF F476FF00 00035A9A .Z....v¶.v·.vô.vÔ.vzj..vÞ.vŸh.'. 000080
EA76FF02 71680014 E9037FF8 4639EC46 8818C483 000000C0 9A006AE4 76FFE676 vl.vôj..á....á..F$9F½..Ô..hq..vō 0000A0
EA76FFFE 76FF0066 E9037401 F67E8300 6FE90000 037A9AF2 76FFF476 FFE876FF .vÔ.v¶.v·.z...Ôo..~-.t.Ôf..vz.vō 0000C0
FFFF9AF2 76FFF476 FFE876FF EA76FF02 45680000 038E9AF2 76FFF476 FFE876FF .vÔ.v¶.v·.....hE..vô.vÔ.v¶.v·... 0000E0
FFE676FF 271A68EE 76FFF076 FF006A02 0468E876 FFEA76FF F276FFF4 76FF0000 ...v¶.v·.vō.vÔh..j..vÞ.vŸh.'.vl. 000100
00000409 9AF276FF F476FFE8 76FFEA76 FF027168 18C48300 0003E79A 006AE476 vôj..Ô....á.hq..vô.vÔ.v¶.v·..... 000120
468810C4 83000004 309A006A 0A76FF0C 76FF270A 68EE76FF F076FF50 16E44680 .Fô.P.vÞ.vŸhÖ'.v..v.j..0....á..F 000140
F476FF00 0003119A F276FFF4 76FFE876 FFEA76FF FA76FF00 3EE90375 E6460BE4 ô.Flu.Ô>..vª.vô.vÔ.v¶.v·......v¶ 000160
9A006AE4 76FFE676 FF271A68 EE76FFF0 76FF006A FA76FFE8 76FFEA76 FFF276FF .v·.vô.vÔ.vªj..vÞ.vŸh.'.vl.vôj.. 000180
4683D88E 0203881E 56570000 7CC8C8C9 5F5E1F00 00E90000 8818C483 00000293 .....á.¡..Ô...^ èùà|..WV.¡...Á.F 0001A0
8B26FC47 88260E5E C4040E46 83E65689 E44689FE 578826FC 4788260E 5EC4040E ..á^.&.G•&.Wz.FÔ.Vl.F..á^.&.G•&. 0001C0
4788260E 5EC4040E 4683E846 89FE4788 260E5EC4 020E4683 86568984 4689FE57 Wz.F..V..F..á^.&.Gz.FÔ.F..á^.&.G 0001E0
```

Dump of file SATURN:[PCCOMMON.DUMP.DLL]DMLGLOB.TMP;1 on 18-APR-1990 10:44:56.67
File ID (627,22,0)   End of file block 315 / Allocated 316

Virtual block number 154 (0000009A), 512 (0200) bytes

```
0E5EC402 0E46830E 4689FE47 88260E5E C4020E46 83EC5689 EA4689FE 578826FC •&.Wz.Fô.V&.F..á^.&.Gz.F8.F..á^. 000000
040E4683 FE5689FC 4689FE57 8826FC47 88260E5E C4040E46 83EE4689 FE478826 &.Gz.FŸ.F..á^.&.G•&.Wz.F•.Vz.F.. 000020
5EC40789 26024789 260000B8 F85EC4FA 5689F846 89FE5788 26FC4788 260E5EC4 á^.&.G•&.Wz.F½.Vªá^½¡..&.G.&..á^ 000040
76FF2712 68E476FF E676FF0F 6A5016F2 46800257 89260789 260C5688 0A4688FC •.F..V.&..&.W..F·.Pj..vl.vôh.'.v 000060
1468E476 FFE676FF 106A5016 D44680D8 468912C4 83000005 3A9A006A 0A76FF0C ..v.j..:....á..FÁ.FÅ.Pj..vl.vôh. 000080
D8468800 06E90375 00D87E83 D8468912 C4830000 05889A00 6A0A76FF 0C76FF27 '.v..v.j.......á..FÁ.-Á.u.Ô...FÁ 0000A0
E876FFEA 76FFEC76 FF106A03 6A501604 46805016 DA4680D3 66E9F246 88037DE9 Ô)..F·Ôf..FÖ.P.FÅ.Pj.j..v$.vô.vÔ 0000C0
8922C483 000005B8 9A006AD4 76FFD676 FF27E268 E476FFE6 76FF8476 FF8676FF .v..v..vl.vôhã'.v•.vÅj..¡....á". 0000E0
FF27DA68 E476FF.· 76FF5016 E04680D3 2FE90846 880006E9 03750008 7E830846 FÁ.-Á.u.Ô...FÁÔ/..FÁ.P.vl.vôhö'. 000100
FFE90846 880006L, 03750008 7E830846 8910C483 00000632 9A006AD4 76FFD676 v•.vÅj..2....á..FÁ.-Á.u.Ô...FÁÔ. 000120
76FF0000 FFFF9ADA 76FFDC76 FF5016F4 46800000 FFFF9A50 16F44680 E876FF02 ..vÔ.F¶.P......F¶.P.vÉ.vÖ......v 000140
00087E83 D846890E C4830000 FFFF9A00 6AE076FF E276FF50 16F04680 E476FFE6 l.vÔ.FÞ.P.vã.vÅj.......á..FÄ.-Ä. 000160
6AE076FF E276FF27 1C68E476 FFE676FF 50168846 8D0285E9 99868800 06E90375 u.Ô..¡Ñ.Ôç..F..P.vl.vôh.'.vã.vÅj 000180
7448F07E 830285E9 99868800 06E90375 00D87E83 D8468910 C4830000 06989A00 .......á..FÁ.-Á.u.Ô..¡Ñ.Ô...-Þ͵t 0001A0
260C5688 DA4688F8 5EC40013 E9037400 897E8000 1CE90374 2A887E80 0025E903 .Ô%..-.*t.Ô...-..t.Ô..á^½.FÖ.VÉ& 0001C0
68E476FF E676FFF4 76FFF676 FFE876FF 106A5016 E04680D0 9AE90257 89260789 ..&.W.Ô...FÁ.Pj..vÔ.v-.v¶.vl.vôh 0001E0
```

Dump of file SATURN:[PCCOMMON.DUMP.DLL]DMLGLOB.TMP;1 on 18-APR-1990 10:44:56.67
File ID (627,22,0)   End of file block 315 / Allocated 316

Virtual block number 155 (0000009B), 512 (0200) bytes

```
76FF0011 E9037500 D87E8308 468918C4 83000006 EF9A006A E076FFE2 76FF280F .(.vã.vÅj..ÿ....á..FÄ.-Ä.u.Ô...v 000000
76FF106A 046A5016 E0468DF8 76FFFA76 FF0211E9 99838800 0007099A F476FFF6 -.v¶.....¡°.Ô...vª.v½.FÁ.Pj.j..v 000020
419A006A E076FFE2 76FF27E2 68E476FF E676FF84 76FF8676 FFE876FF F476FFF6 -.v¶.vÔ.v..v..vl.vôhã'.vã.vÅj..A 000040
99838800 0007589A F476FFF6 76FF0011 E9037500 D87E8308 468922C4 83000007 ....á".FÄ.-Á.u.Ô...v-.v¶.[...¡°. 000060
FF106A00 F1E90375 02573926 0009E903 74073926 0C56880A 4688F85E C40180E9 Ô§.á^½.FÖ.VÉ&9.t.Ô..&9W.u.Ôþ.j.. 000080
7500087E 83084689 0EC48300 0003859A 006A0A76 FF0C76FF 27F968E4 76FFE676 vl.vôh''.v..v.j..ç....á..FÄ.-Ä.u 0000A0
D676FFE4 76FFE676 FF106A01 68E99983 880000FF FF9AF476 FFF676FF 0011E903 .Ô...v-.v¶.....¡°.Ôk.j..vl.vô.v• 0000C0
9AF476FF F676FF00 11E90375 00087E83 D846890C C4830000 07EA9A00 6AD476FF .vÅj..ô....á..FÄ.-Ä.u.Ô...v-.v¶. 0000E0
FF0C76FF 27F868E4 76FFE676 FFDE76FF E076FFE2 76FF0136 E9998388 000007CF ü...¡°.Ô6..vã.vÅ.v8.vl.vôh%'.v.. 000100
049AF476 FFF676FF 0011E903 7500087E 83084689 12C48300 00086A9A 006A0A76 v.j..j....á..FÄ.-Ä.u.Ô...v-.v¶.. 000120
C4830000 FFFF9A00 6A0A76FF 0C76FFE4 76FFE676 FF006A00 F7E99983 88000008 ...¡°.Ô%.j..vl.vô.v..v.j.......á 000140
5EC400C2 E9998388 00000825 9AF476FF F676FF00 11E90375 00087E83 D846890C ..FÄ.-Ä.u.Ô...v-.v¶.X...¡°.Ôô.á^ 000160
8800A1E9 D8468800 0006859A F476FFF6 76FF0257 89260789 26E25688 E04688FC •.FÄ.Vã&..&.W..v-.v¶.ç....FÄÔÅ.. 000180
FFEA76FF EC76FF10 6A036A50 16E04680 F876FFFA 76FF007C E9037506 46080446 FÅ.F•u.Ô|..vª.v½.FÁ.Pj.j..v$.vô. 0001A0
C4830000 089A9A00 6A0476FF D676FF27 E268E476 FFE676FF 8476FF86 76FFE876 vÔ.v..v..vl.vôhã'.v•.vÅj.......á 0001C0
DA68E476 FFE676FF 50160446 80004DE9 00008800 06E90374 00087E83 D8468922 ".FÄ.-Ä.t.Ô..¡..ÔM..FÅ.P.vl.vôhÖ 0001E0
```

Dump of file SATURN:[PCCOMMON.DUMP.DLL]DMLGLOB.TMP;1 on 18-APR-1990 10:44:56.67
File ID (627,22,0)   End of file block 315 / Allocated 316

Virtual block number 156 (0000009C), 512 (0200) bytes

```
D8468800 06E90375 00087E83 D8468910 C4830000 05179A00 6AD476FF D676FF27 '.vø.vÅj.......á..FÄ.-Ä.u.Õ...FÄ 000000
0000E999 83B8FF45 E9FC92E9 03750215 3D0008E9 0014E999 83B8FF79 E9001DE9 Õ..Õy.¡°.Õ..Õ..=..u.Õ.•Õe.¡°.Õ.. 000020
FE578826 FC478826 0E5EC404 0E4683D8 8E044A88 1E565700 0030C8CB C95F5E1F .^_èùàÕ..WV.¡J..Ä.F..á^.&.G=&.W± 000040
C4040E46 83025689 D04689FE 578826FC 4788260E 5EC4040E 46830E56 89DC4689 .FË.V8.F..á^.&.G=&.W±.FÅ.V0.F..á 000060
4683E246 89FE4788 260E5EC4 020E4683 FA5689F8 4689FE57 8826FC47 88260E5E ^.&.G=&.W±.F%.Vª.F..á^.&.G±.Fä.F 000080
4689FE47 88260E5E C4020E46 83FE5689 FC4689FE 578826FC 4788260E 5EC4040E ..á^.&.G=&.W±.F=.V±.F..á^.&.G±.F 0000A0
C4830000 099C9A00 6A0A76FF 0C76FF27 1268DC76 FFDE76FF 0F6A5016 F64680DA Õ.F-.Pj..v8.vÉh.'.v..v.j.......á 0000C0
DC76FFDE 76FF106A 5016E846 800342E9 D8468800 06E90375 00087E83 D8468912 ..FÄ.-Ä.u.Õ...FÄÕ8..FÕ.Pj..v8.vÉ 0000E0
880006E9 03750008 7E830846 8912C483 000009EA 9A006A0A 76FF0C76 FF271468 h.'.v..v.j..õ....á..FÄ.-Ä.u.Õ... 000100
FFF876FF FA76FF10 6A036A50 160A4680 5016EC46 8D02FFE9 F6468803 10E90846 FÄÕ...F-Õ...F$.P.F..Pj.j..vª.v%. 000120
C4830000 0A409A00 6A0A76FF 0C76FF27 E2680C76 FFDE76FF D076FFD2 76FFE276 vä.v0.vÅ.v8.vÉhä'.v..v.j..M....á 000140
8DEC76FF EE76FFF8 76FFFA76 FF02C2E9 99868800 06E90375 00087E83 D8468922 ".FÄ.-Ä.u.Õ..¡Ñ.Õõ..vª.v%.vŸ.v$. 000160
86880006 E9037400 F47E8300 09E90374 00087E83 D8468900 00FFFF9A 5016F446 F¶.P......FÄ.-Ä.t.Õ...-¶.t.Õ..¡Ñ 000180
0007859A 006A0A76 FF0C76FF 2714680C 76FFDE76 FF106A50 16E84680 0291E999 .Õ...FÕ.Pj..v8.vÉh.'.v..v.j..ç.. 0001A0
76FFDE76 FF501604 468D025F E9998688 0006E903 7500087E 83084689 12C48300 ..á..FÄ.-Ä.u.Õ..¡Ñ.Õ_..Få.P.v8.v 0001C0
0006E903 7500087E 83084689 10C48300 000ADA9A 006AE876 FFEA76FF 27DA680C ÉhÖ'.võ.vÒj..Õ....á.¯FÄ.-Ä.u.Õ.. 0001E0
```

Dump of file SATURN:[PCCOMMON.DUMP.DLL]DMLGLOB.TMP;1 on 18-APR-1990 10:44:56.67
File ID (627,22,0)   End of file block 315 / Allocated 316

Virtual block number 157 (0000009D), 512 (0200) bytes

```
EA9AEC76 FFEE76FF 5016E446 8D000005 DA9A5016 E4468DE2 76FF022F E9998688 ¡Ñ.Õ/..vä.FÕ.P.Õ....FÕ.P.vŸ.v$.õ 000000
EE680C76 FFDE76FF D076FFD2 76FFE476 FFE676FF E276FFFC 76FFFE76 FF000005 ....v±.v=.vä.vl.vÕ.v0.vÅ.v8.vÉhŸ 000020
83000007 909AE476 FFE676FF D846891A C4830000 08159A00 6AD476FF D676FF27 '.vø.vÅj.......á..FÄ.vl.vÕ...... 000040
FFEA76FF 27DA680C 76FFDE76 FF5016F0 468001C7 E9998688 0006E903 7500087E -Ä.u.Õ..¡Ñ.Õù..FÞ.P.v8.vÉhÖ'.võ. 000060
46880197 E9998688 0006E903 7500087E 83084689 10C48300 0008589A 006AE876 vÒj..X....á..FÄ.-Ä.u.Õ..¡Ñ.Õ...F 000080
FF27F968 DC76FFDE 76FF106A 0085E903 75065639 0008E903 74044639 F25688F0 Þ.V·9Fåt.Õ..9Vøu.Õç.j..v8.vÉh"'. 0000A0
54E99983 880006E9 03750008 7E830846 890EC483 00000886 9A006A0A 76FF0C76 v..v.j..Ñ....á..FÄ.-Ä.u.Õ..¡°.Õï 0000C0
00087E83 D846890C C4830000 0BE09A00 6AE876FF EA76FF0C 76FFDE76 FF106A01 .j..v8.vÉ.võ.vÒj..Å....á..FÄ.-Ä. 0000E0
0C76FF27 F8680C76 FFDE76FF DA76FFF0 76FFF276 FF012AE9 99838800 06E90375 u.Õ..¡°.Õ°..v·.vÞ.vÖ.v8.vÉh%'.v. 000100
6A00F6E9 99838800 06E90375 00087E83 D8468912 C4830000 0C659A00 6A0A76FF .v.j..e....á..FÄ.-Ä.u.Õ..¡°.Õ-.j 000120
03750008 7E830846 890CC483 00000776 9A006A0A 76FF0C76 FFDC76FF DE76FF00 ..v8.vÉ.v..v.j..v....á..FÄ.-Ä.u. 000140
000002C7 9A5016E0 468DF676 FF006A00 6A00C6E9 D8468800 CCE99983 880006E9 Õ..¡°.Õä..FÄÕ6.j.j..v-.FÄ.P.ú... 000160
94E99985 880006E9 037400E0 7E8300A3 E9084688 0006E903 7500087E 83084689 .FÄ.-Ä.u.Õ...FÄÕÉ..-Ä.t.Õ..¡ç.Õ. 000180
D276FFF8 76FFFA76 FFE276FF FC76FFFE 76FF106A 0075E903 75EA4608 E8468800 ..FÕ.Fõu.Õu.j..v±.v=.vä.vª.v%.v0 0001A0
83084689 1CC48300 000C959A 006AE876 FFEA76FF 27EE680C 76FFDE76 FFD076FF .vÅ.v8.vÉhŸ'.võ.vÒj.......á..FA. 0001C0
FFEA76FF 27DA680C 76FFDE76 FF5016E8 46800047 E9084688 0006E903 7500087E -Ä.u.Õ...FÄÕG..FÕ.P.v8.vÉhÖ'.võ. 0001E0
```

Dump of file SATURN:[PCCOMMON.DUMP.DLL]DMLGLOB.TMP;1 on 18-APR-1990 10:44:56.67
File ID (627,22,0)   End of file block 315 / Allocated 316

Virtual block number 158 (0000009E), 512 (0200) bytes

```
80E90017 E9084662 0006E903 7500087E 83084689 10C48300 00096A9A 006AE876 vÒj..j....á..FÄ.-Ä.u.Õ...FÄÕ..Õ. 000000
56570000 34C8CBC7 5F5E1FFF 3AE9FCF9 E9037502 15300008 E9000EE9 000088FF .¡..Õ..Õ..=..u.Õ¹=Õ:..^ èùà4..WV 000020
C4040E46 83DE5689 DC4689FE 578B26FC 4788260E 5EC4040E 4683088E 08008B1E .¡¦..Ä.F..á^.&.G=&.W±.FË.V8.F..á 000040
89FE578B 26FC478B 260E5EC4 040E4683 CE5689CC 4689FE57 8826FC47 88260E5E ^.&.G=&.W±.Fä.VÖ.F..á^.&.G=&.W±. 000060
4689FE47 8B260E5E C4020E46 83E24689 FE478B26 0E5EC402 0E4683F8 5689F646 F-.V%.F..á^.&.G±.Fä.F..á^.&.G±.F 000080
C4830000 0A7D9A00 6A0A76FF 0C76FF27 1268DC76 FFDE76FF 0F6A5016 F4468004 &.F¶.Pj..v8.vËh.'.v..v.j..)....á 0000A0
DC76FFDE 76FF106A 5016D046 8D02D7E9 998BB800 06E90375 000A7E83 DA468912 ..FÕ.-Õ.u.Õ..¦¦.Õm..FÄ.Pj..v8.vÉ 0000C0
B80006E9 0375000A 7E830A46 8912C483 00000E82 9A006A0A 76FF0C76 FF271468 h.'.v..v.j........á..FÕ.-Õ.u.Õ..¦ 0000E0
7E830A46 890000FF FF9A5016 EC4680CC 76FFCE76 FF027EE9 F4468802 A5E99988 ¦.ÕE..F¶Õ-..vÖ.vä.F$.P......FÕ.- 000100
50160646 80186AEC 76FFEE76 FFCC76FF CE76FF02 7DE99988 B80006E9 0375000A Õ.u.Õ..¦¦.Õ)..vÖ.vä.vŸ.v$j..F=.P 000120
9A5016E4 4680E276 FF0253E9 998BB800 06E90375 000A7E83 DA468900 00FFFF9A ......FÕ.-Õ.u.Õ..¦¦.ÕS..vä.FÕ.P. 000140
89FC4689 085688D6 46880234 E9998888 0006E903 75000A7E 830A4689 00000A9F .....FÕ.-Õ.u.Õ..¦¦.Õ4..¦¹.VÄ.F=. 000160
FC5EC450 16E4468D 001AE903 7502470B 26078B26 FC5EC404 FC468300 04E9FE56 V±Õ...F=.á^=&..&.G.u.Õ...ïÕ.Pá^= 000180
FF9A0676 FFD876FF CC76FFCE 76FFFFD3 E90A4689 00000AAF 9A37FF26 0277FF26 &.w.&.7.£....FÕÕ£..vÖ.vä.vÄ.v=.. 0001A0
CC76FFCE 76FFE276 FFE476FF E676FF10 6A036A50 16F0468D 5016E846 800000FF ....FÕ.P.FÞ.Pj.j..vl.vÕ.vä.vÖ.vä 0001C0
FFE676FF DA468922 C4830000 004A9A00 6A0A76FF 0C76FF27 E268DC76 FFDE76FF .v8.vËhä'.v..v.j...J....á".FÕ.vl. 0001E0
```

```
Dump of file SATURN:[PCCOMMON.DUMP.DLL]DMLGLOB.TMP;1 on 18-APR-1990 10:44:56.67
File ID (627,22,0)   End of file block 315 / Allocated 316

Virtual block number 159 (0000009F), 512 (0200) bytes

FFEA76FF F676FFF8 76FF0194 E999888B 0006E903 75000A7E 8300000A E89AE476 vô.Š....-Ö.u.Õ..||.Õ...v½.v-.vö. 000000
7E83016C E9998888 0006E903 75000A7E 830A4689 00000A15 9A5016FA 4680E876 vÕ.F'.P......FÕ.-Ö.u.Õ..||.Õl..- 000020
106A006F E90375D2 46080046 880157E9 0000B801 50E99988 880006E9 037400FA '.t.Õ..||.Õ].|..ÕW..FÅ.F0u.Õo.j. 000040
006AD076 FFD276FF .7EF680C 76FFDE76 FFCC76FF CE76FFF6 76FFF876 FFE276FF .vã.v½.v-.vö.vä.v8.vÉhÿ'.v0.vÅj. 000060
FF5016D0 46800110 E90A4688 0006E903 75000A7E 830A4689 18C48300 ..7F419A .A....Á..FÖ.-Ö.u.Õ...FÖÕ...FÅ.P. 000080
75000A7E 830A4689 10C48300 000FC39A 006AD076 FFD276FF 270A680C 76 DE76 v8.vÉhÖ'.v0.vÅj..û....Á..FÖ.-Ö.u 0000A0
E0468DF4 76FF006A 006A00CE E90007E9 000088FF 86E900E0 E90A4688 000.E903 .Õ...FÖÕÅ.Õ..|..Õa.Õö.j.j..v¶.FÅ 0000C0
E9037401 E07E8300 81E90A46 880006E9 0375000A 7E830A46 8900000C 0C9A5016 .P......FÕ.-Ö.u.Õ...FÕÕÝ..-Å.t.Õ 0000E0
76FFCE76 FFF676FF F876FFE2 76FF106A 0070E903 75024608 D04688FF 4EE90003 ..ÕN..FÅ.F0u.Õp.j..vã.v½.v-.vö.v 000100
DA7E81DA 468918C4 8300000F F49A006A D076FFD2 76FF27EF 680C76FF DE76FFCC ä.v8.vÉhÿ'.v0.vÅj..¶....Á..FÖ.-Ö 000120
76FFD276 FF27DA68 DC76FFDE 76FF5016 00468000 50E90A46 880006E9 03759988 |.u.Õ...FÕÕ]..FÅ.P.v8.vÉhÖ'.v0.v 000140
FF85E900 2DE99988 880006E9 0375000A 7E830A46 8910C483 0000007C 9A006AD0 Åj..|....Á..FÖ.-Ö.u.Õ..||.Õ-.Õ.. 000160
82E90375 025E30FD 72E90375 021530FE C2E90375 01F63000 18E90024 E9998888 ||.Õ$.Õ..=-.u.Õö±=..u.Õr»=^.u.Õÿ 000180
C4040E46 83088E0C D2881E56 5700001A C8C8C95F 5E1F0000 E9998888 FF32E9FE ±Õ2.||.Õ...^ èüà...WV.|0..Ä.F..Á 0001A0
89FE5788 26FC4788 260E5EC4 040E4683 FA5689F8 4689FE57 8826FC47 88260E5E ^.&.G»&.W±.F%.V'.F..Á^.&.G»&.W±. 0001C0
5EC4040E 4683F456 89F24689 FE578826 FC478826 0E5EC404 0E4683E8 5689E646 F|.VÕ.F..Á^.&.G»&.W±.F .V¶.F..Á^ 0001E0

Dump of file SATURN:[PCCOMMON.DUMP.DLL]DMLGLOB.TMP;1 on 18-APR-1990 10:44:56.67
File ID (627,22,0)   End of file block 315 / Allocated 316

Virtual block number 160 (000000A0), 512 (0200) bytes

FF271268 F876FFFA 76FF0F6A 5016FE46 8DEC5689 EA4689FE 578826FC 4788260E .&.G»&.W±.FÕ.V$.F±.Pj..v'.v½h.'. 000000
E7E99989 880006E9 037500F6 7E83F646 8912C483 0000111C 9A006A0A 76FF0C76 v..v.j.......Á..F-.--.u.Õ..|¿.ÕÕ 000020
46880006 E9037500 F67E83F6 46890000 0F739A50 16FC468D FE76FF00 6A006A00 .j.j..v±.F».P.s....F-.--.u.Õ...F 000040
F876FFFA 76FF106A 5016EE46 8D0085E9 00008800 06E90374 01FC7E83 00C4E9F6 -Õá..-».t.Õ..|..Õç..FŸ.Pj..v'.v½ 000060
880006E9 037500F6 7E83F646 8912C483 00001152 9A006A0A 76FF0C76 FF271468 h.'.v..v.j..R....Á..F-.--.u.Õ..| 000080
6AEE76FF F076FF27 DA68F876 FFFA76FF 5016EE46 8D006CE9 FE468800 83E99989 ¿.Õ...F±Õl..FŸ.P.v'.v½hÖ'.vÞ.vŸj 0000A0
0006E903 74F04608 EE468800 08E90374 00F67E83 F6468910 C4830000 119A9A00 .......Á..F-.--.t.Õ...FŸ.FÞt.Õ.. 0000C0
F068F876 FFFA76FF E676FFE8 76FFF276 FFF476FF EA76FFEC 76FF0042 E99989B8 |¿.Õ8..v$.vö.v¶.v .vÕ.v|.v'.v½hÞ 0000E0
E9FF8CE9 03750215 30000BE9 0014E918 C4830000 0F119A00 6AEE76FF F076FF27 '.vÞ.vŸj.......Á.Õ..Õ..=..u.Õ..Õ 000100
0E5EC404 0E468308 8E1047B8 1E565700 0012C8C8 C95F5E1F 0000E999 89880000 ..|¿.Õ...^ èüà...WV.|G..Ä.F..Á^. 000120
EE4689FE 578826FC 4788260E 5EC4040E 4683FA56 89F84689 FE578826 FC478826 &.G»&.W±.F%.V'.F..Á^.&.G»&.W±.FŸ 000140
FF106A50 16F24680 FE5689FC 4689FE57 8826FC47 88260E5E C4040E46 83F05689 .VÞ.F..Á^.&.G»&.W±.F».V±.F .Pj.. 000160
7500F67E 83F64689 12C48300 0012639A 006A0A76 FF0C76FF 271468F8 76FFFA76 v'.v½h.'.v..v.j..c.....Á..F-.--.u 000180
76FFF076 FFFC76FF FE76FF00 68E90375 F44608F2 4688007C E999BAB8 0006E903 .Õ..|¤.Õ|..F .F¶u.Õk..v±.v».vÞ.v 0001A0
F67E81F6 468914C4 83000012 949A006A F276FFF4 76FF27F1 68F876FF FA76FFEE Ÿ.v'.v½hÞ'.v¶.v j.......Á..F-.-- 0001C0
76FFF476 FF27DA68 F876FFFA 76FF5016 F2468000 39E9F646 880006E9 037599BA ¤.u.Õ...F-Õ9..F .P.v'.v½hÖ'.v¶.v 0001E0

Dump of file SATURN:[PCCOMMON.DUMP.DLL]DMLGLOB.TMP;1 on 18-APR-1990 10:44:56.67
File ID (627,22,0)   End of file block 315 / Allocated 316

Virtual block number 161 (000000A1), 512 (0200) bytes

FF8AE900 09E9998A 880006E9 037500F6 7E83F646 8910C483 00001088 9A006AF2 ·j..|....Á..F-.--.u.Õ..¦¤.Õ..Õ.. 000000
88260E5E C4040E46 83088E11 C5881E56 57000016 C8C8C95F 5E1F0000 E9998A88 |¤.Õ...^ èüà...WV.|é..Å.r..Á^.&. 000020
5689EA46 89FE5788 26FC4788 260E5EC4 040E4683 F65689F4 4689FE57 8826FC47 G»&.W±.F¶.V-.F..Á^.&.G»&.W±.FÕ.V 000040
4788260E 5EC4020E 4683FE56 89FC4689 FE578826 FC478826 0E5EC404 0E4683EC $.F..Á^.&.G»&.W±.F».V±.F..Á^.&.G 000060
00135F9A 006A0A76 FF0C76FF 271268F4 76FFF676 FF0F6A50 16FA4680 F84689FE ±.F%.F'.Pj..v-.v¶h.'.v..v.j..._.. 000080
F676FF10 6A5016EE 46800094 E999BE88 0006E903 7500F27E 83F24689 12C48300 ..Á..F .-·.u.Õ..|/.Õ...FŸ.Pj..v- 0000A0
E9037500 F27E83F2 468912C4 83000012 219A006A 0A76FF0C 76FF2714 68F476FF .v¶h.'.v..v.j..|....Á..F .-·.u.Õ 0000C0
FFEA76FF EC76FFFC 76FFFE76 FFF876FF 106A004B E9FA4688 0062E999 8E880006 ..|/.Õb..F'ÕK.j..v½.v±.v».v$.vö. 0000E0
7500F27E 83F24689 18C48300 0013209A 006AEE76 FFF076FF 27EF68F4 76FFF676 v-.v¶hÿ'.vÞ.vŸj..-....Á..F .-·.u 000100
ADE90375 02273000 08E9000E E90017E9 00008800 06E90020 E999BE88 0009E903 .Õ..|/.Õ .Õ..|..Õ..Õ..Õ..=·.u.ÕÜ 000120
C4040E46 83088E12 C3881E56 57000020 C8C8C95F 5E1F0000 E999BE88 0000E9FF .Õ..|/.Õ...^ èüà ..WV.|û..Ä.F..Á 000140
89FE5788 26FC4788 260E5EC4 040E4683 E85689E6 4689FE57 8826FC47 88260E5E ^.&.G»&.W±.FT.VÕ.F..Á^.&.G»&.W±. 000160
5EC4040E 4683FE56 89FC4689 FE578826 FC478826 0E5EC404 0E4683EC 5689EA46 FÕ.V$.F..Á^.&.G»&.W±.F».V±.F..Á^ 000180
4689FE57 8826FC47 88260E5E C4040E46 83F05689 EE4689FE 578826FC 4788260E .&.G»&.W±.FŸ.VÞ.F..Á^.&.G»&.W±.F 0001A0
1268E676 FFE876FF 0F6A5016 FA468007 89260247 89260000 88EE5EC4 F85689F6 -.V%Á^Ÿ|..&.G.&...F'.Pj..vÕ.vlh. 0001C0
FA7E8100 0AE903   00E47E83 E4468912 C4830000 14869A00 6A0A76FF 0C76FF27 '.v..v.j..Ñ....Á..FÕ.-Õ.t.Õ...-' 0001E0
```

```
Dump of file SATURN:[PCCOMMON.DUMP.DLL]DMLGLOB.TMP;1 on 18-APR-1990 10:44:56.67
File ID (627,22,0)   End of file block 315 / Allocated 316

Virtual block number 162 (000000A2), 512 (0200) bytes

0C76FF27 1468E676 FFE876FF 106A5016 F2468000 E3E999BF 880006E9 03750215 ..u.ö..¡¢.öö..F·.Pj..vö.vlh.'.v. 000000
74F4460B F2468800 0BE90374 00E47E83 E4468912 C4830000 14F19A00 6A0A76FF .v.j..þ....á..Fö.~ö.t.ö...F·.F¶t 000020
006AF276 FFF47LFF 27DA68E6 76FFE876 FF5016E0 468000A6 E999BFB8 0006E903 .ö..¡¢.öl..FÅ.P.vö.vlhö'.v¶.v·j. 000040
B80006E9 0374E246 0BE0468B 000BE903 7400E47E 83E44689 10C48300 00153F9A .?....á..Fö.~ö.t.ö...FÅ.Fät.ö..¡ 000060
E876FFEA 76FFEC76 FFFC76FF FE76FFEE 76FFF076 FFF676FF F876FF00 68E999BF ¢.ök..v½.v~.vÞ.vŸ.v±.v•.vš.võ.vö 000080
E9037500 E47E83E4 46891EC4 83000015 709A006A F276FFF4 76FF2801 68E676FF .vlh.(.v¶.v·j..p....á..Fö.~ö.u.ö 0000A0
9A006AE0 76FFE276 FF271C68 E676FFE8 76FFF676 FFF876FF 0028E9E4 46880006 ...Föö(..v½.v~.vö.vlh.'.vä.vÅj.. 0000C0
8E13E788 1E565700 0026C8CB C95F5E1F 0000E9E4 468BE446 8910C483 000013A1 Å....á..Fö.Föö...^ èùà&..WV.¡ö.. 0000E0
478B260E 5EC4040E 4683E656 89E44689 FE578B26 FC478B26 0E5EC404 0E4683D8 Å.F..á^.&.G•&.W±.Fö.V].F..á^.&.G 000100
EA5689E8 4689FE57 8B26FC47 8B260E5E C4040E46 83F45689 F24689FE 578B26FC •&.W±.F·.V¶.F..á^.&.G•&.W±.Fö.Võ 000120
FC478B26 0E5EC404 0E4683E0 56890E46 89FE5788 26FC4788 260E5EC4 040E4683 .F..á^.&.G•&.W±.Fß.VÅ.F..á^.&.G• 000140
0A76FF0C 76FF2712 68E476FF E676FF0F 6A5016FA 4680FE56 89FC4689 FE578B26 &.W±.F•.V±.F*.Pj..vl.vöh.'.v..v. 000160
16F64680 0273E9E2 46880006 E9037500 E27E83E2 468912C4 83000016 459A006A j..E....á..Fä.~ä.u.ö...Fäös..F~. 000180
83E24689 12C48300 0016999A 006A0A76 FF0C76FF 271468E4 76FFE676 FF106A50 Pj..vl.vöh.'.v..v.j.......á..Fä. 0001A0
FF0217E9 FA468802 36E999B1 880006E9 0374F846 08F64688 000BE903 7400E27E ~ä.t.ö...F~.F½t.ö..¡Ÿ.ö6..F*ö... 0001C0
280368E4 76FFE676 FFF276FF F476FFE8 76FFEA76 FFDE76FF E076FFFC 76FFFE76 v±.v•.vÅ.vß.võ.vö.v¶.v·.vl.vöh.( 0001E0

Dump of file SATURN:[PCCOMMON.DUMP.DLL]DMLGLOB.TMP;1 on 18-APR-1990 10:44:56.67
File ID (627,22,0)   End of file block 315 / Allocated 316

Virtual block number 163 (000000A3), 512 (0200) bytes

68E476FF E676FF0A 76FF0C76 FFE24689 1CC48300 0016BF9A 006AF676 FFF876FF .v½.v~j..¢....á..Fä.v..v..vl.vöh 000000
E901D0E9 E2468BE2 468910C4 83000016 E99A006A 37FF2602 77FF26FC 5EC42725 %'á^•&.w.&.7j..ö....á..Fä.FäöÅ.ö 000020
10C48300 00147A9A 006AF676 FFF876FF 27DA68E4 76FFE676 FF50160A 468D01C7 ú..Fö.P.vl.vöhö'.v½.v~j..z....á. 000040
EC468D01 92E99981 880006E9 03740C46 08DA4688 000BE903 7400E27E 83E24689 .Fä.~ä.t.ö...Fö.Fět.ö..¡Ÿ.ö...F& 000060
F876FF28 0368E476 FFE676FF F276FFF4 76FFE876 FFEA76FF DE76FFE0 76FF5016 .P.vÅ.vß.võ.vö.v¶.v·.vl.vöh.(.v½ 000080
FF0150E9 E2468800 06E90375 00E27E83 E246891C C4830000 17799A00 6AF676FF .v~j..y....á..Fä.~ä.u.ö...FäöP.. 0000A0
280368E4 76FFE676 FFF276FF F476FFEC 76FFEE76 FFDE76FF E076FFFC 76FFFE76 v±.v•.vÅ.vß.vŸ.vš.v¶.v·.vl.vöh.( 0000C0
E9E2468B 0006E903 7500E27E 83E24689 1CC48300 0017FC9A 006A0A76 FF0C76FF .vÊ.vöj..•....á..Fä.~ä.u.ö...Fäö 0000E0
E9037500 E27E83E2 46890000 100E9A50 16F04680 FA76FF00 6A006A01 04E90100 ..ö..j.j..v*.Fÿ.P.ß....Fä.~ä.u.ö 000100
E90375F8 460BF646 88000BE9 99B58800 06E90374 00F07E83 00E7E9E2 46880006 ...Fäöö..~Þ.t.ö..¡ç.öÅ..F~.F¥u.ö 000120
E476FFE6 76FFF276 FFF476FF E876FFEA 76FFDE76 FFE076FF FC76FFFE 76FF00AB ¨..v±.v•.vÅ.vß.võ.vö.v¶.v·.vl.vö 000140
880006E9 037500E2 7E83E246 891CC483 00001831 9A006AF6 76FFF876 FF280368 h.(.v½.v~j..1....á..Fä.~ä.u.ö... 000160
006A37FF 260277FF 26FC5EC4 272568E4 76FFE676 FF0A76FF 0C76FF00 8AE9E246 Fäö...v..v..vl.vöh%'á^•&.w.&.7j. 000180
FF5016F6 46800055 E9E2468B 0006E903 7500E27E 83E24689 10C48300 0018619A .•....á..Fä.~ä.u.ö...FäöU..F~.P. 0001A0
7500E27E 83E24689 10C48300 0016139A 006AF676 FFF876FF 27DA68E4 76FFE676 vl.vöhö'.v½.v~j.......á..Fä.~ä.u 0001C0
273DFE44 E9037502 15300013 E9001CE9 000088FF 4AE90025 E9E2468B 0006E903 .ö...Fäö%.öJ.¡..ö..ö..=..u.öö±=' 0001E0

Dump of file SATURN:[PCCOMMON.DUMP.DLL]DMLGLOB.TMP;1 on 18-APR-1990 10:44:56.67
File ID (627,22,0)   End of file block 315 / Allocated 316

Virtual block number 164 (000000A4), 512 (0200) bytes

D88E158D 881E5657 000012C8 CBC95F5E 1F0000E9 000088FE FCE9FDD9 E9037502 .u.ö)»ö•±¡..ö...^ èùà...WV.¡...Å 000000
FC478B26 0E5EC404 0E4683F6 5689F446 89FE5788 26FC4788 260E5EC4 040E4683 .F..á^.&.G•&.W±.F¶.V~.F..á^.&.G• 000020
76FF0F6A 5016FE46 8D078926 02478926 000088FA 5EC4FC56 89FA4689 FE578B26 &.W±.F*.V•á^*¡..&.G.&...F±.Pj..v 000040
037500F2 7E83F246 8912C483 00001964 9A006A0A 76FF0C76 FF271268 F476FFF6 ~.v¶h.'.v..v.j..d....á..F·.~·.u. 000060
F27E83F2 46890000 17A29A50 16FB4680 FE76FF00 6A006A00 0BE90000 B80006E9 ö..¡..öU.j.j..v±.F½.P.Å....F·.~· 000080
5016EE46 8D00A9E9 00008800 06E90374 01F87E83 008BE9F2 46880006 E9037500 .u.ö...F·ö¡..~½.t.ö..¡..ö`..FŸ.P 0000A0
7E83F246 8912C483 0000199A 9A006A0A 76FF0C76 FF271468 F476FFF6 76FF106A j..v~.v¶h.'.v..v.j.......á..F·.~ 0000C0
DA68F476 FFF676FF 5016EE46 8D0060E9 FE468800 77E9F246 880006E9 037500F2 ·.u.ö...F·öw..F±ö'..FŸ.P.v~.v¶hö 0000E0
EE468800 0BE90374 00F27E83 F2468910 C4830000 19D69A00 6AEE76FF F076FF27 '.vÞ.vŸj..ø....á..F·.~·.t.ö...FŸ 000100
F076FF28 0068F476 FFF676FF FA76FFFC 76FF0036 E9F2468B 0006E903 74F0460B .Fÿt.ö...F ö6..v•.v*.v~.v¶h.(.vÞ 000120
00880000 E9FF98E9 03750215 30000BE9 0014E910 C4830000 17369A00 6AEE76FF .vŸj..6....á.ö..ö..«..u.ö..ö..¡. 000140
FC478B26 0E5EC404 0E4683D8 8E18ACB8 1E565700 007CC8CB C95F5E1F 0000E900 .ö...^ èùà¦..WV.¡¨..Å.F..á^.&.G• 000160
83F85689 F64689FE 578B26FC 478B260E 5EC4040E 4683DA56 89D84689 FE578B26 &.W±.FÃ.Vö.F..á^.&.G•&.W±.F~.V½. 000180
C4040E46 83D64689 FE478B26 0E5EC402 0E4683DE 4689FE47 8B260E5E C4020E46 F..á^.&.G±.Fß.F..á^.&.G±.F•.F..á 0001A0
271268D8 76FFDA76 FF0F6A50 16F24680 FC5689FA 4689FE57 8B26FC47 8B260E5E ^.&.G•&.W±.F*.V•.F·.Pj..vö.vÅh.' 0001C0
E9044688 0006E903 7500047E 83044689 12C48300 001AAB9A 006A0A76 FF0C76FF .v..v.j..¨....á..Få.~å.u.ö...Fåö 0001E0
```

Dump of file SATURN:[PCCOMMON.DUMP.DLL]DMLGLOB.TMP;1 on 18-APR-1990 10:44:56.67
File ID (627,22,0)   End of file block 315 / Allocated 316

Virtual block number 165 (000000A5), 512 (0200) bytes

```
8300001A F99A006A 0A76FF0C 76FF2714 68D876FF DA76FF10 6A5016E4 468003C8 ...F8.Pj..v0.vAh.'.v..v.j..*.... 000000
8D5016E8 4680037D E9F2468B 0396E9D4 46880006 E9037500 D47E8304 468912C4 ...F..~..u.O...F.O...F O)..FO.P. 000020
27E268D8 76FF^A76 FFD876FF DA76FFDE 76FFF676 FFF876FF 106A036A 50160A46 F..Pj.j..v%.v-.v..vO.vA.vO.vAha' 000040
E999B6B8 0006E90? 7500047E 83044689 22C48300 0018289A 006A0A76 FFOC76FF .v..v.j..+....A".F..-..u.O..i..O 000060
8300001B 5B9A006A 0A76FF0C 76FF2714 68D876FF DA76FF10 6A5016E4 46800348 H..F8.Pj..vO.vAh.'.v..v.j..[.... 000080
68D876FF DA76FF50 16004680 0316E999 B6880006 E9037500 D47E83D4 468912C4 ...F..-..u.O..i..O...FA.P.vO.vAh 0000A0
B6880006 E9037500 D47E8304 468910C4 8300001B B89A006A E476FFE6 76FF27DA O'.vl.vOj..j....A..F..~..u.O..iN 0000C0
890EC483 00000602 9A006AD0 76FFD276 FF5016F0 4680D876 FFDA76FF 02E6E999 .Ol..vO.vA.FP.P.v..vA;.......A.. 0000E0
FF271C68 D876FFDA 76FF5016 84468002 B9E999B6 B80006E9 03750004 7E830446 F..-..u.O..iN.O...F..F vO.vAh.'. 000100
89E999B6 B80006E9 03750004 7E830446 8910C483 00001C38 9A006AD0 76FFD276 v..vAj..8....A..FA.-..u.3..iN.O. 000120
8DDE76FF 0175E903 7400857E 80017EE9 03742A84 7E800187 E9037448 F07E8302 ..~pHt.O...-.*t.O-..-..t.Ou..v.. 000140
8DFA76FF FC76FF00 000E389A E876FFEA 76FF5016 E0468000 0000F09A 5016E046 FA.P.p....FA.P.vo.vO.B....v*.v*. 000160
FF27FA68 D876FFDA 76FFD876 FFDA76FF DE76FFE0 76FFE276 FF0676FF 5016FE46 Fz.P.v..va.vA.vB.vO.vA.vO.vAh**. 000180
D47E8300 000E939A E076FFE2 76FFD446 8920C483 00001C83 9A006A0A 76FF0C76 v..v.j.......A .FA.va.vA......~A 0001A0
6A5016F4 46800001 F446C701 F5E90446 880006E9 037500FE 7E830009 E9037400 .t.O...-t.u.O...FAO%.uF¶...F¶.Pj 0001C0
D47E8304 468912C4 8300001C B09A006A E476FFE6 76FF2717 68D876FF DA76FF0F ..vO.vAh.'.vl.vOj..¯....A..FA.~A 0001E0
```

Dump of file SATURN:[PCCOMMON.DUMP.DLL]DMLGLOB.TMP;1 on 18-APR-1990 10:44:56.67
File ID (627,22,0)   End of file block 315 / Allocated 316

Virtual block number 166 (000000A6), 512 (0200) bytes

```
9A006A0A 76FF0C76 FF27F968 D876FFDA 76FF106A 01BEE999 B6880006 E9037500 .u.O..iN.O/.j..vO.vAh"'.v..v.j.. 000000
76FFDA76 FF106A01 91E999B6 B80006E9 03750004 7E830446 890EC483 00001D0E .....A..FA.-A.u.O..iN.O..j..vO.v 000020
99B68800 06E90375 00047E83 D446890C C4830000 10389A00 6AD076FF D276FF08 A.v0.vAj..8....A..FA.-A.u.O..iN. 000040
19009A00 6A0A76FF 0C76FF27 F868D876 FFDA76FF D676FFE4 76FFE676 FF0167E9 Og..vl.vO.v..vO.vAh%'.v..v.j.... 000060
FFD876FF DA76FF00 6A0133E9 99B68800 06E90375 00D47E83 D4468912 C4830000 ...A..FA.-A.u.O..iN.O3.j..vO.vA. 000080
09E999B6 B80006E9 03750004 7E830446 890CC483 00000882 9A006A0A 76FF0C76 v..v.j.......A..FA.-A.u.O..iN.O. 0000A0
76FF106A 5016E446 8D00F3E9 D4468802 57892607 8926E656 8BE44688 FA5EC401 .A^*.F8.Vl&..&.W..FAO..F8.Pj..v 0000C0
18C48300 0010F29A 006AE476 FFE676FF 280F68D8 76FFDA76 FFF676FF F876FFDE B.v%.v-.vO.vAh.(.vl.vOj.......A. 0000E0
0006E903 7500D47E 83044689 00001926 9A50160C 468DF276 FF006A00 6A00C7E9 Ou.j.j..v..FE.P.&....FA.-A.u.O.. 000100
006EE903 75E6460B E:468800 95E999B5 880006E9 0374000C 7E8300A4 E9D44688 .FAOE..-E.t.O..iC.O...F8.Flu.On. 000120
6AE476FF E676FF28 0F68D876 FFDA76FF F676FFF8 76FFDE76 FF106A50 ''F44680 .F8.Pj..v8.v%.v-.vO.vAh.(.vl.vOj 000140
5016E446 8D004FE9 D4468800 06E90375 00047E83 D4468918 C4830000 1E 79A00 .."....A..FA.-A.u.O...FAOO..F8.P 000160
00047E83 D4468910 C4830000 1A799A00 6AE476FF E676FF27 DA68D876 FFD. 76FF .vO.vAhO'.vl.vOj..y....A..FA.-A. 000180
3DFC78E9 03750215 300013E9 0016E900 0088FF87 E9001FE9 D4468800 06E90375 u.O...FAO..O..j..O..O..=..u.O(== 0001A0
C4040E46 83D88E1A 01881E56 57000014 C8CBC95F 5E1FFF39 E9FF10E9 03750227 '.u.O..O9..^_euA...WV.j...A.F..A 0001C0
4683F846 89FE4788 260E5EC4 020E4683 F05689EE 4689FE57 8B26FC47 8B260E5E ^.&.G=&.Wz.FY.VP.F..A^.&.Gz.F%.F 0001E0
```

Dump of file SATURN:[PCCOMMON.DUMP.DLL]DMLGLOB.TMP;1 on 18-APR-1990 10:44:56.67
File ID (627,22,0)   End of file block 315 / Allocated 316

Virtual block number 167 (000000A7), 512 (0200) bytes

```
5689FA46 89FE5788 26FC4788 260E5EC4 040E4683 F64689FE 4788260E 5EC4020E ..A^.&.Gz.F-.F..A^.&.G=&.Wz.F*.V 000000
76FF2712 68EE76FF F076FF0F 6A5016FE 46800789 26024789 26000088 FA5EC4FC =A^*j..&.G.&...Fz.Pj..vP.vYh.'.v 000020
75021SFE 7E81000A E9037400 EC7E83EC 468912C4 8300001F 139A006A 0A76FF0C ..v.j.......A..F&.-&.t.O...-z..u 000040
0A76FF0C 76FF2714 68EE76FF F076FF10 6A5016F2 4680007A E999BFB8 0006E903 .O..je.Oz..F .Pj..vP.vYh.'.v..v. 000060
06E90374 F4460BF2 46880008 E9037400 EC7E83EC 468912C4 8300001F 559A006A j..U.....A..F&.-&.t.O...F .F¶t.O. 000080
FFF476FF 281168EE 76FFF076 FFF876FF F676FFFA 76FFFC76 FF0030E9 998FB800 .je.O=..v=.v*.v-.v%.vP.vYh.(.v¶. 0000A0
46880006 E9EC4688 0006E903 7500EC7E 83EC4689 14C48300 001D899A 006AF276 v j.......A..F&.-&.u.O...F&O...F 0000C0
5E1F0000 E9085688 06468808 8E1E6788 1E565700 0000C8C8 C95F5E1F 0000E9EC &O...^_euA...WV.jg..A.F..V.O...^ 0000E0
6A006A06 40681E01 6A316AFF FF68FFFF 68D88E1F 81881E56 57000002 C8CBC95F _euA...WV.j...Ah..h..j1j..ha.j.j 000100
90CBC95F 5E1F0000 E9FE4688 FE468918 C4830000 FFFF9A00 6A476A02 6A006A00 .j.j.jGj.......A..Fz.FzO...^_eu. 000120
00051CDA 020300FA 000600A7 02030171 00060E4F 0203005E 00051ED7 02030011 ....=...^...O...q...I...*...O... 000140
00091DA0 020302F7 000A1C49 020302EC 000A18F5 02030000 002E1F98 0002008F ...........¥...$...I...¥....... 000160
000A0E88 02030038 00051F8A 020300B3 00051888 02031F79 00181FA3 00050288 ....E...y.......*...a...8...j... 000180
000803CC 02030142 000600D1 02030000 00181FA0 000202A0 000902E1 02030311 ....A...............I...8...a... 0001A0
FF1276FF D88EFFFF 881E5657 00004CC8 00000000 0000032E 000A1C05 0203023C <...............aL..WV.j...A.v.. 0001C0
5689B446 89085688 06468805 A5E90E46 88FC5689 FA468900 00FFFF9A 006A1076 v.j.......F*.V=.F.OE..F..V..FC.V 0001E0
```

Dump of file SATURN:[PCCOMMON.DUMP.DLL]DMLGLOB.TMP;1 on 18-APR-1990 10:44:56.67
File ID (627,22,0)   End of file block 315 / Allocated 316

Virtual block number 168 (000000A8), 512 (0200) bytes

```
1D6AE676 FFE646C  07882684 5EC4F856 89F64689 04578826 02478826 845EC486 ŘÁ^Ç&.G.&.W..F-.V½á^Ç&...F].v]j. 000000
4688FA5E C40593E9 0003E903 7500E27E 83E24689 0000FFFF 9A5016FA 46805E6A j^.F*.P......Fā.-ā.u.Õ..Õ..á^*.F 000020
46830457 89260447 8926FA5E C4FE5788 26FC4788 26F65EC4 04F64683 078926E6 ]&...F-.á^-&.G•&.W±á^*&.G.&.W..F 000040
26F65EC4 04F64683 08578926 06478926 FA5EC4FE 578826FC 478826F6 5EC404F6 -.á^-&.G•&.W±á^*&.G.&.W..F-.á^-& 000060
578826FC 478826F6 5EC404F6 46830C57 89260A47 8926FA5E C4FE5788 26FC4788 .G•&.W±á^*&.G.&.W..F-.á^-&.G•&.W 000080
1276FF07 89260247 89260000 880E5FC4 26FA5EC4 10578926 0E478926 FA5EC4FE ±á^*&.G.&.W.á^*&á_.¡..&.G.&...v. 0000A0
C4011E68 1076FF12 76FF0000 014F9A00 6A006A4C 6A006A01 4368011E 681076FF .v.h..hC.j.jLj.j.¯O....v..v.h..á 0000C0
FC5688FA 46884C6A 011E6810 76FF1276 FF000003 0F9A0A77 FF260C77 FF26FA5E ^*&.w.&.w.......v..v.h..jL.F*.V• 0000E0
899A006A 006A016A 006A0125 68011068 1076FF12 76FF0000 FFFF9A50 52001205 ...RP......v..v.h..h%.j.j.j.j..¿ 000100
9A006ADA 76FFDC76 FFDC5689 DA468900 0001C09A 011F6810 76FF1276 FF000002 ....v..v.h...â....FÖ.VÉ.vÉ.vÖj.. 000120
0877FF26 FA5EC444 03680277 FF260477 FF26FA5E C4586A50 16E44680 00000103 &....FÖ.PjXá^*&.w.&.w.h.Dá^*&.w. 000140
E47E8304 51E90003 E9037500 E27E83E2 468912C4 830000FF FF9A006A 0677FF26 &.w.j.......á..Fā.-ā.u.Õ..ÕQ..-ô 000160
E876FFEA 76FFEA56 89E84689 0000FFFF 9A012068 1076FF12 76FF0021 E9037400 .t.Öl..v..v.h .......FÖ.Võ.võ.vÖ 000180
4680016A 006A0000 FFFF9AFA 76FFFC76 FF006A10 76FF1276 FF0000FF FF9A006A j.......v..v.j..v•.v*.....j.j..F 0001A0
4689C846 28D0468B 0000FFFF 9A5016C8 46801076 FF1276FF 00000204 9A501688 j.P......v..v..Fà.P......FÅ+Fà.F 0001C0
D84689E8 D10E462B C44688E0 4689E801 F44628C0 4688DE46 89CC462B D44688F4 ¶.FÅ+Fà.FB.Fà+F¶iÒ.FÅ.Fá+FåiÒ.FÅ 0001E0
```

Dump of file SATURN:[PCCOMMON.DUMP.DLL]DMLGLOB.TMP;1 on 18-APR-1990 10:44:56.67
File ID (627,22,0)   End of file block 315 / Allocated 316

Virtual block number 169 (000000A9), 512 (0200) bytes

```
008A0000 880000FF FF9A026A 006A006A D876FFE0 76FF036A 006A1076 FF1276FF .v..v.j.j..vÅ.vÅj.j.j......¡..o. 000000
E90000FF FF9A206A 006A0694 681E0699 681E1076 FF1276FF 016A006A 0300E900 .Õi.j.j..v..v..h...h..j.j .....Õ 000020
FF1276FF 008DE90C 468801F8 E9FE4688 FE46890A 46880384 E999BCE2 46C70383 ..úFā¥.Õ...F..F±.F±Õ½..F.Õ...v.. 000040
01656801 1F681076 FF1276FF 0088E900 00FFFF9A 006A006A 016A006A 206A1076 v.j j.j.j.j......Õ...v..v.h..he. 000060
2DE999BC E246C700 08E90374 FFFE7E83 FE468900 0002F69A 006A006A 006A006A j.j.j.j..-....F±.-±.t.Õ..úFā¥.Õ- 000080
77FF26FA 5EC45052 4CCA8300 0000022B FE468801 6868011F 681076FF 1276FF03 ..v..v.h..hh..F±+Ø....ÕLRPá^*&.w 0000A0
FF9A0A77 FF260C77 FF26FA5E C4011E68 1076FF12 76FF0000 FFFF9A0A 77FF260C .&.w.......v..v.h..á^*&.w.&.w... 0000C0
88016AE9 0000E9FF 63E90375 00053DFF 83E90375 00013000 13E90016 E90000FF ...Õ..Õ..=..u.Õ..=..u.Õc.Õ..Õj.. 0000E0
76FF0000 01189A50 52001205 FC5688FA 4688011E 681076FF 1276FF00 7AE90C46 F.Õz..v..v.h...F*.V•...RP......v 000100
011F6810 76FF1276 FF000004 D29A006A 006A006A 006A016E 68011F68 1076FF12 ..v.h..hn.j.j.j.j..Ø....v..v.h.. 000120
1E681076 FF1276FF 000003A5 9A006ADA 76FFDC76 FFDC5689 DA468900 0003929A ......FÖ.VÉ.vÉ.vÖj..E....v..v.h. 000140
3D0013E9 0016E900 0004039A 016AF076 FFF276FF F25689F0 46890000 03F09A01 ..Þ....FÞ.V·.v·.vÞj......Õ..Õ..= 000160
76FF1276 FF009DE9 0C468800 D4E90000 E9FF76E9 03770002 30000BE9 03730001 ..s.Õ..=..w.Õv.Õ..Õå..F.Õ...v..v 000180
9A011F68 1076FF12 76FF0000 04B99A50 52001205 FC5688FA 46884C6A 011E6810 .h..jL.F*.V•...RP.¿....v..v.h... 0001A0
011E6810 76FF1276 FF000004 249A016A DA76FFDC 76FFDC56 890A4689 00000411 .....FÖ.VÉ.vÉ.vÖj..$....v..v.h.. 0001C0
586ADA76 FFDC76FF 00000170 9A006AF0 76FFF276 FFF25689 F0468900 00051F9A ......FÞ.V·.v·.vÞj..p....vÉ.vÖjX 0001E0
```

Dump of file SATURN:[PCCOMMON.DUMP.DLL]DMLGLOB.TMP;1 on 18-APR-1990 10:44:56.67
File ID (627,22,0)   End of file block 315 / Allocated 316

Virtual block number 170 (000000AA), 512 (0200) bytes

```
00000558 9A006A06 77FF2608 77FF26FA 5EC44401 680277FF 260477FF 26FA5EC4 á^*&.w.&.w.h.Dá^*&.w.&.w.j..X... 000000
0008E903 7300013D 00:3E900 16E9019C E90003E9 037500E2 7E83E246 8912C483 .á..Fā.-ā.u.Õ..Õ..Õ..Õ..=..s.Õ.. 000020
203DFDF8 E9037501 1F3DFEA9 E9037501 1D300018 E90000E9 FF53E903 7.¨00230 =..w.ÕS.Õ..Õ..=..u.Õ`±=..u.Õ½»= 000040
FA5EC44C 6A011E68 1076FF12 76FF00EA E90A468B 0159E900 00E9FF2F E90:7501 .u.Õ/.Õ..ÕY..F.Õõ..v..v.h..jLá^* 000060
6A006A00 6A006A01 2468011D 681076FF 1276FF00 0001369A 0A77FF26 0C77r°26 &.w.&.w..6....v..v.h..h$.j.j.j.j 000080
1276FF01 11E90000 E246C700 08E90374 01EC7E83 EE5689EC 46890000 05029A00 .......F$.VŸ.-$.t.Õ..úFā..Õ...v. 0000A0
01EC7E83 EE5689EC 46890000 01029A00 6A006A00 6A006A01 24680120 681076FF .v.h .h$.j.j.j.j.......F$.VŸ.-$. 0000C0
1077FF26 FA5EC4DC 56890A46 89000001 5D9A011F 681076FF 1276FF00 61E90374 t.Õa..v..v.h...]....FÖ.VÉá^*&.w. 0000E0
77FF26FA 5EC44402 680277FF 260477FF 26FA5EC4 586ADA76 FFDC76FF 0E77FF26 &.w..vÉ.vÖjXá^*&.w.&.w.h.Dá^*&.w 000100
46C70090 E90003E9 037500E2 7E83E246 8916C483 00000197 9A006A06 77FF2608 .&.w.j.......á..Fā.-ā.u.Õ..Õ..úF 000120
7500013D 001BE900 1EE90078 E999BCE2 46C70080 E999BCE2 46C70088 E90000E2 â..Õ..úFā¥.Õ..úFā¥.Õx.Õ..Õ..=..u 000140
1076FF12 76FF004B E9FFDFE9 FFE2E903 7501023D FFE2E903 7500023D FF0EE903 .Õ..=..u.Õâ.=..u.Õâ.ÕÕ.ÕK..v..v. 000160
E9037500 2030002B E9006AE9 0000FFFF 9A0676FF 0876FF0A 76FF0C76 FF0E76FF .v..v..v..v..v......Õj.Õ+.= .u.Õ 000180
E9037500 3B3DFC90 E9037500 303DFC90 E9037500 293DFC7A E9037500 223DFECA Õ±="..u.Õz==).u.Õ.==0.u.Õ.==;.u.Õ 0001A0
FF37FF26 FA5EC400 11E90375 FC460BFA 46880033 E900008A 00008BFF B5E9FA33 3*Õç.¡..¤..Õ3..F*.F=u.Õ..á^*&.7. 0001C0
00E90000 8A000088 0000FFFF 9AE276FF 1076FF12 76FF0000 FFFF9AFA 76FFFC76 v=.v*......v..v..vā.....¡..¤..Õ. 0001E0
```

Dump of file SATURN:[PCCOMMON.DUMP.DLL]DMLGLOB.TMP;1 on 18-APR-1990 10:44:56.67
File ID (627,22,0)   End of file block 315 / Allocated 316

Virtual block number 171 (000000AB), 512 (0200) bytes 0000159A 006A1076 FF1276FF 088E0008 881E5657 000150C8 000ECAC9 5F5E1F00 ..^_èò..åP..WV.¡...Ä.v..v.j..... 000000
26FE809E C4FE8296 89FE8086 89085688 06468808 80E90E46 88FC5689 FA468900 ..F¯.V•.F.Õ...F_.V...¯±..Y±å.¯±& 000020
6268106A FEE686FF FEE68689 078826FE 809EC4F8 5689F646 8904578B 2602478B .G.&.W..F-.V%å.¯±&....|±.Ñ|±j.hb 000040
88FA5EC4 0865E900 03E90375 00FEDE8E 83FEDE86 89000000 589A5016 FA468001 ..F•.P.X.....ß±./ß±.u.Õ..Õe.å^•. 000060
04578926 0247d926 FA5EC4FE 578826FC 478826F6 5EC404F6 46830789 26FEE686 .|±&...F-.å^-&.G•&.W±å^•&.G.&.W. 000080
5EC404F6 46830857 89260647 8926FA5E C4FE5788 26FC4788 26F65EC4 04F64683 .F-.å^-&.G•&.W±å^•&.G.&.W..F-.å^ 0000A0
26FC4788 26F65EC4 04F64683 0C578926 0A478926 FA5EC4FE 578826FC 478826F6 -&.G•&.W±å^•&.G.&.W..F-.å^-&.G•& 0000C0
FA5EC4FE 578826FC 478826F6 5EC404F6 46831057 89260E47 8926FA5E C4FE5788 .W±å^•&.G.&.W..F-.å^-&.G•&.W±å^• 0000E0
681076FF 1276FF07 89260247 89260000 88125FC4 26FA5EC4 14578926 12478926 &.G.&.W.å^•&å_.¡..&.G.&...v..v.h 000100
FF26FA5E C4011068 1076FF12 76FF0000 07A89A00 6A006A4C 6A006A01 43680110 ..hC.j.jLj.j.. ....v..v.h..å^•&. 000120
52011605 FC5688FA 46884C6A 01106810 76FF1276 FF000008 F39A0A77 FF260C77 w.&.w..µ....v..v.h..jL.F•.V=...R 000140
FF000003 639A006A 006A016A 006A0125 68011A68 1076FF12 76FF0000 08C29A50 P.ò....v..v.h..h%.j.j.j.j..c.... 000160
9A006AFE D686FFFE D886FFFE D89689FE D6868900 0008249A 01136810 76FF1276 v..v.h...$.....ø±..Ä±.ÑÄ±.Ñø±j.. 000180
77FF26FA 5EC44403 680277FF 260477FF 26FA5EC4 576A5016 FEE0868D 00000838 ;.....Ä±.PjWå^•&.w.&.w.h.Då^•&.w 0001A0
0701E900 03E90375 00FEDE8E 83FEDE86 8912C483 00000863 9A006A06 77FF2608 .&.w.j..c....å...ß±./ß±.u.Õ..Õ.. 0001C0
FEEA9689 FEE88· 9 0000088F 9A011868 1076FF12 76FF0025 E9037400 FEE08E83 ./Ä±.t.Õ%..v..v.h.........Õ±..õ± 0001E0

Dump of file SATURN:[PCCOMMON.DUMP.DLL]DMLGLOB.TMP;1 on 18-APR-1990 10:44:56.67
File ID (627,22,0)   End of file block 315 / Allocated 316

Virtual block number 172 (000000AC), 512 (0200) bytes

FF260477 FF26FA5E C4566A50 16FEE086 80000008 A69A006A FEE886FF FEEAB6FF .Ñõ±.ÑÒ±j..Ì.....Ä±.PjVå^•&.w.&. 000000
8E83FEDE 868912C4 83000004 4C9A006A 0677FF26 0877FF26 FA5EC444 03680277 w.h.Då^•&.w.&.w.j..L....å...ß±./ 000020
719A0121 681076FF 1276FF00 25E90374 00FEE08E 830696E9 0003E903 7500FEDE ß±.u.Õ..Õ.../Ä±.t.Õ%..v..v.hl..q 000040
1076FF12 76FF0000 03849A00 6AFEE886 FFFEEAB6 FFFEEA96 89FEE886 89000003 .....Õ±..õ±.Ñõ±.ÑÒ±j.......v..v. 000060
FC5688FA 468806B0 681E0000 03E29A50 52001605 FC5688FA 46880100 68011468 h..h...F•.V•...RP.ã....h¯..F•.V• 000080
FEF0868D 01146810 76FF1276 FF0CC483 FFFF0256 9A5016FE F0868D50 52001605 ...RP..Þ±.P.V....å..v..v.h....Þ± 0000A0
8680016A 006A0000 01E69AFA 76FFFC76 FF006A10 76FF1276 FF000003 4A9A5016 .P.J....v..v.j..v•.v•.Ì...j.j... 0000C0
862BFECC 86880000 01F49A50 16FEC486 801076FF 1276FF00 0009269A 5016FE84 Ç±.P.&....v..v...å±.P.¶.....å±•. 0000E0
868BFEDC 8689E8D1 F4462BFE BC868BFE DA8689FE C8862BFE D0868BF4 4689FEC4 å±.F¶..Ä±•.å±..Ö±..V±•F¶ÌÒ..É±.. 000100
006AFED4 B6FFFED‿ B6FF036A 006A1076 FF1276FF FED48689 E8D1FEDA 862BFEC0 å±•.Õ±ÌÒ..å±.v..v.j.j..ÑÉ±.Ñå±j. 000120
0600681E 1076FF12 76FF016A 006A05C3 E90000BA 00008800 0002479A 026A006A j.j..G...¡..σ..Õù.j.j..v..v..hÄ. 000140
88FE4689 0A468805 68E999BC FEDE86C7 0568E900 0002689A 206A006A 06CB681E .hù.j.j .k...Õh.ú.ß±¥.Õh..F..F±. 000160
00000290 9A006A00 6A016A00 6A206A10 76FF1276 FF008EE9 0C468803 5EE9FE46 F±Õ^..F.Õ...v..v.j j.j.j.j...... 000180
83FE4689 00000A26 9A006A00 6A006A00 6A016568 01136810 76FF1276 FF0089E9 Õ...v..v.h..he.j.j.j.j..&....F±. 0001A0
FE468801 68680113 681076FF 1276FF05 10E999BC FEDE86C7 0009E903 74FFFE7E ~±.t.Õ..ú.ß±¥.Õ...v..v.h..hh..F± 0001C0
1076FF12 76FF0000 075E9A0A 77FF260C 77FF26FA 5EC45052 4CCA8300 0000D228 •®....òLRPå^•&.w.&.w..^....v..v. 0001E0

Dump of file SATURN:[PCCOMMON.DUMP.DLL]DMLGLOB.TMP;1 on 18-APR-1990 10:44:56.67
File ID (627,22,0)   End of file block 315 / Allocated 316

Virtual block number 173 (000000AD), 512 (0200) bytes

82E90375 00013000 13E90016 E900000A 9E9A0A77 FF260C77 FF26FA5E C4011068 h..å^•&.w.&.w......Õ..Õ..=..u.Õ. 000000
5707C726 0E5FC426 FA5EC400 43E90C46 8802DFE9 0000E9FF 62E90375 00053DFF .=..u.Õb.Õ..ÕÕ..F.ÕC.å^•&å_.&ú.W 000020
76FF0CC4 830AE802 569A5016 FEF0868D 50520016 05FC5688 FA468806 E7681E00 ..hÕ..F•.V•...RP..Þ±.P.V.Õ¯..å..v 000040
0008E903 73000130 0013E900 5CE90000 0AFD9A50 16FEF086 80011468 1076FF12 ..v.h....Þ±.P.»...Õ\.Õ..=..s.Õ.. 000060
005607C7 260E5FC4 26FA5EC4 008BE90C 46880280 E90000E9 FFADE903 77000230 =..w.ÕÙ.Õ..Õ...F.ÕE.å^•&å_.&ú.V. 000080
1276FF0C C483080E 02569A50 16FEF086 80505200 1605FC56 88FA4688 06F1681E .hÞ..F•.V•...RP..Þ±.P.V.&..å..v. 0000A0
FC5688FA 46880110 681076FF 1276FF00 0007779A 5016FEF0 86800114 681076FF .v.h....Þ±.P.w....v..v.h...F•.V• 0000C0
E89A006A 006A006A 006A016E 68011368 1076FF12 76FF0000 08049A50 52011605 ...RP.Å....v..v.h..hn.j.j.j.j..Õ 0000E0
D686FFFE D886FFFE D89689FE D6868900 0008629A 01136810 76FF1276 FF000009 ....v..v.h...b.....ø±..Ä±.ÑÄ±.Ñø 000100
FFF276FF F25689F0 46890000 07B99A01 10681076 FF1276FF 00000875 9A006AFE ±j..u....v..v.h...¿....FÞ.V·.v·. 000120
E9FF35E9 03770002 30000BE9 03730001 30013E9 0016E900 0007D09A 016AF076 vÞj..Å...Õ..Õ..=..s.Õ..=..w.Õ5.Õ 000140
5688FA46 88070C68 1E005707 C7260E5F C426FA5E C40043E9 0C468801 A9E90000 ..Õ`..F.ÕC.å^•&å_.&ú.W..h...F•.V 000160
F0868D01 14681076 FF1276FF 0CC4830C 1E02569A 5016FEF0 86805052 001605FC =...RP..Þ±.P.V....å..v..v.h....Þ 000180
00E9FFAD E9037700 02300008 E9037300 01300013 E9005CE9 00000C33 9A5016FE ±.P.3...Õ\.Õ..=..s.Õ..¬..w.ÕÙ.Õ. 0001A0
FC5688FA 46880716 681E0056 07C7260E 5FC426FA 5EC40103 E90C468B 014AE900 .ÕJ..F.Õ..å^•&å_.&ú.V.. ...F•.V= 0001C0
FEF0868D 01146810 76FF1276 FF0CC483 0A890256 9A5016FE F0868050 52001605 ...RP..Þ±.P.V....å..v..v.h....Þ± 0001E0

Dump of file SATURN:[PCCOMMON.DUMP.DLL]DMLGLOB.TMP;1 on 18-APR-1990 10:44:56.67
File ID (627,22,0)   End of file block 315 / Allocated 316

Virtual block number 174 (000000AE), 512 (0200) bytes

```
07929A50 52011605 FC5688FA 46884C6A 01106810 76FF1276 FF00000A 3F9A5016 .P.7....v..v.h..jL.F'.V=...RP... 000000
76FF1276 FF000008 2F9A006A 006A006A 006A016E 68011368 1076FF12 76FF0000 ...v..v.h..hn.j.j.j.j../....v..v 000020
00000CAD 9A016AFE D686FFFE D886FFFE D89689FE D6868900 000C9A9A 01136810 .h.........ø±..Ä±.ÑÄ±.Ñø±j..Ù... 000040
0008549A 006AF076 FFF276FF F25689F0 46890000 08309A01 10681076 FF1276FF .v..v.h...=....FÞ.V..v..vÞj..T.. 000060
01680277 FF260477 FF26FA5E C437FF26 0E5FC426 FA5EC4FE D686FFFE D886FF00 ..ÑÄ±.Ñø±á^'&á_.&.7á^'&.w.&.w.h. 000080
7500FEDE 8E83FEDE 868912C4 8300000E 669A006A 0677FF26 0877FF26 FA5EC444 Dá^'&.w.&.w.j..f.....á...ß±./ß±.u 0000A0
0000E9FE EDE90377 00023000 08E90373 00013000 13E90016 E9021AE9 0003E903 .Õ..Õ..Õ..Õ..=..s.Õ..=..w.ÕU±Õ.. 0000C0
0375011B 30FD93E9 0375011A 30FD3CE9 03750119 30FC9AE9 03750113 300028E9 Õ+.=..u.Õ.ø=..u.Õ<»=..u.Õ.»=..u. 0000E0
01106810 76FF1276 FF0158E9 0A468801 C7E90000 E9FE89E9 03750121 30FE62E9 Õb±=I.u.Õ¿±Õ..Õú..F.ÕX..v..v.h.. 000100
006A0124 68011A68 1076FF12 76FF0000 0C4E9A0A 77FF260C 77FF26FA 5EC44C6A jLá^'&.w.&.w..N....v..v.h..h$.j. 000120
6A012468 01196810 76FF1276 FFFEEE96 89FEEC86 89000000 989A006A 006A006A j.j.j........š±..Ÿ±.v..v.h..h$.j 000140
8E83000A E9037501 FEECBE83 FEE49689 FEE28689 00000006 9A006A00 6A006A00 .j.j.j..ø.....ã±..Õ±./š±.u.Õ.../ 000160
6A006A01 24680121 681076FF 1276FF01 50E90000 FEDE86C7 0009E903 7401FEE2 ã±.t.Õ..ú.ß±..ÕP..v..v.hl.h$.j.j 000180
006A0124 68011868 1076FF12 76FFFEEE 9689FEEC 86890000 00F79A00 6A006A00 .j.j..¥.....š±..Ÿ±.v..v.h..h$.j. 0001A0
E28E8300 0AE90375 01FEECBE 83FEE496 89FEE286 8900000C 679A006A 006A006A j-j-j..g.....ã±..Õ±./š±.u.Õ.../ã 0001C0
FA5EC4FE D89689FE D6868900 000C759A 01136810 76FF1276 FF0070E9 037401FE ±.t.Õp..v..v.h...u.....ø±..Ä±á^' 0001E0
```

Dump of file SATURN:[PCCOMMON.DUMP.DLL]DMLGLOB.TMP;1 on 18-APR-1990 10:44:56.67
File ID (627,22,0)   End of file block 315 / Allocated 316

Virtual block number 175 (000000AF), 512 (0200) bytes

```
77FF26FA 5EC437FF 260E5FC4 26FA5EC4 FED686FF FED886FF 1277FF26 1477FF26 &.w.&.w..ÑÄ±.Ñø±á^'&á_.&.7á^'&.w 000000
DE868916 C4830000 07F89A00 6A0677FF 260877FF 26FA5EC4 44026802 77FF2604 .&.w.h.Dá^'&.w.&.w.j..½....á...ß 000020
0081E999 BCFEDE86 C7008AE9 0000FEDE 86C70093 E90003E9 037500FE DEBE83FE ±./ß±.u.Õ..Õ..ú.ß±..Õ..ú.ß±¥.Õ.. 000040
30FFE1E9 03750002 30FEA0E9 03750001 30001BE9 001EE900 78E999BC FEDE86C7 ú.ß±¥.Õx.Õ..Õ..=..u.Õ.±=..u.ÕÅ.= 000060
FF0876FF 0A76FF0C 76FF0E76 FF1076FF 1276FF00 48E9FFDF E9FFE2E9 03750102 ..u.Õä.ÕÕ.ÕK..v..v..v..v..v..v.. 000080
00293DFA 95E90375 00223DFE 5CE90375 00203000 28E90068 E9000005 C09A0676 v..á...Õk.Õ+.= .u.Õ\±=".u.Õ.'=). 0000A0
34E90000 8A000081 FF85E9F7 58E90375 00383DFA ACE90375 00303DFA A8E90375 u.Õ¨'=0.u.Õ¯'=;.u.Õ×¼Õç.|..¤..Õ4 0000C0
1276FF00 0006169A FA76FFFC 76FF37FF 26FA5EC4 0011E903 75FC4608 FA468800 ..F'.F=u.Õ..á^'&.7.v=.v'......v. 0000E0
000060C8 000ECAC9 5F5E1F00 00E90000 8A000088 00000624 9AFEDE86 FF1076FF .v..Ñß±.$...|..¤..Õ...^_èÕ..á'.. 000100
0E4683F4 5689F246 89FE578B 26FC478B 260E5EC4 040E4683 D88E0640 8B1E5657 WV.|ə..Á.F..á^.&.G=&.W±_F·.V¶.F. 000120
578B26FC 478B260E 5EC4040E 4683FE56 89FC4689 FE578B26 FC478B26 0E5EC404 .á^.&.G=&.W±.F=.V±.F..(^.&.G=&.W 000140
FC478B26 0E5EC404 0E4683FA 4689FE47 8B260E5E C4020E46 83EE5689 EC4689FE ±.F&.VŸ.F..á^.&.G±.F'.F  á^.&.G= 000160
3E068307 3E36FF07 4036FF00 2CE90374 EE460BEC 4688F856 89F64689 FE578B26 &.W±.F~.V½.F§.FŸt.Õ,..6ə..6>...> 000180
568CEC46 89A04680 0CC48308 BF02569A 5016A046 80073168 1E000740 16830107 ....ə...h1..F..P.V.¢..á..F..F&.V 0001A0
8300000C DF9A006A 0A76FF0C 76FF2717 68F276FF F476FF07 6AEC76FF EE76FFEE Ÿ.vŸ.všj..v¶.v·h.'.v..v.j..Õ.... 0001C0
FF0022E9 0375F846 08F6468B 0061E9F0 46880006 E9037500 F07E83F0 468912C4 á..FÞ.~Þ.u.Õ...FÞÕa..F-.F½u.Õ".. 0001E0
```

Dump of file SATURN:[PCCOMMON.DUMP.DLL]DMLGLOB.TMP;1 on 18-APR-1990 10:44:56.67
File ID (627,22,0)   End of file block 315 / Allocated 316

Virtual block number 176 (000000B0), 512 (0200) bytes

```
468910C4 83000010 789A006A F676FFF8 76FF43FC 68F276FF F476FF0A 76FF0C76 v..v..v¶.v·h=C.v½.v-j..(....á..F 000000
68F276FF F476FFFC 76FFFE76 FFFA76FF 0025E9F0 46880006 E9037500 F07E83F0 Þ.-Þ.u.Õ...FÞÕ%..v'.v±.v=.v¶.v·h 000020
56570000 08C8C8C9 5F5E1F00 00E912C4 83000010 089A006A 0A76FF0C 76FF270D \'.v..v.j.......á.Õ...^ èùà...WV 000040
C4040E46 83FA5689 F84689FE 578B26FC 478B260E 5EC4040E 4683D88E 0F548B1E .|T..Á.F..á^.&.G=&.W±.F%.V'.F..á 000060
1468F876 FFFA76FF 0F6AFC76 FFFE76FF FE5689FC 4689FE57 8B26FC47 8B260E5E ^.&.G=&.W±.F=.V±.v±.v=j..v'.v½h. 000080
1E565700 0070C8C8 C95F5E1F 0000E912 C4830000 10479A00 6A0A76FF 0C76FF27 '.v..v.j..G....á.Õ...^ èùàp..WV. 0000A0
5EC4040E 4683EA56 89E84689 FE578B26 FC478B26 0E5EC404 0E46830B 8E10928B |...Á.F..á^.&.G=&.W±.FÕ.VÕ.F..á^ 0000C0
F85EC4E6 4689FE47 8B260E5E C4020E46 83FA5689 F84689FE 578B26FC 478B260E .&.G=&.W±.F½.V'.F..á^.&.G±.F|á^½ 0000E0
006A0A76 FF0C76FF 271E68E8 76FFEA76 FF5016E0 46800789 26024789 26000088 |..&.G.&...FÅ.P.võ.vÕh.'.v..v.j. 000100
6A501690 468003FD E9E4468B 0006E903 7500E47E 83E44689 10C48300 0011839A ......á..FÕ.-Õ.u.Õ...FÕÕ»..F..Pj 000120
E47E83E4 468912C4 83000011 BF9A006A 0A76FF0C 76FF2714 68E876FF EA76FF0F ..võ.vÕh.'.v..v.j..¢.....á..FÕ.-Õ 000140
EA76FF0A 76FF0C76 FF0031E9 03759246 08904688 03C8E9E4 46880006 E9037500 .u.Õ...FÕÕu..F..F.u.Õ1..v..v..võ 000160
E9037500 E47E83E4 468910C4 83000011 F49A006A 9076FF92 76FF43FD 68E876FF .vÕh»C.v..v.j..¶....á..FÕ.-Õ.u.Õ 000180
76FF0C76 FF27E068 E876FFEA 76FF5016 F4468050 16F24680 038FE9E4 46880006 ...FÕÕ...F·.P.F¶.P.võ.vÕhÁ'.v..v 0001A0
F27E8303 5AE9E446 880006E9 037500E4 7E83E446 8914C483 0000122F 9A006A0A .j../....á..FÕ.-Õ.u.Õ...FÕÕZ..-· 0001C0
679A006A F476FFF6 76FF2717 68E876FF EA76FF0E 6A5016E6 46800038 E903740A .t.Õ8..F|.Pj..võ.vÕh.'.v-.v¶j..g 0001E0
```

```
Dump of file SATURN:[PCCOMMON.DUMP.DLL]DMLGLOB.TMP;1 on 18-APR-1990 10:44:56.67
File ID (627,22,0)   End of file block 315 / Allocated 316

Virtual block number 177 (000000B1), 512 (0200) bytes

 4680F246 89E6468B 031FE9E4 46880006 E9037500 E47E83E4 468912C4 83000012 ....á..Fô.-ô.u.Ô...Fôô...Fl.F..F 000000
 468912C4 83000013 019A006A 0A76FF0C 76FF2712 68E876FF EA76FF07 6A501694 ..Pj..võ.vÒh.'.v..v.j.......á..F 000020
 026AE9F2 46880000 FFFF9A50 16944680 02E7E9E4 46880006 E9037500 E47E83E4 ô.-ô.u.Ô...Fôôô..F..P......F.Ôj. 000040
 468300CA E9025789 26078926 92568890 4688F85E C40013E9 03759246 08904688 .F..F.u.Ô..á^%.F..V.&..&.W.Ôò..F 000060
 8826FC47 88260E5E C4040E46 83F05689 EE4689FE 578826FC 4788260E 5EC4040E ..á^.&.G•&.W±.FŸ.VÞ.F..á^.&.G•&. 000080
 FFEE76FF F076FFFC 76FFFE76 FF501694 4680F876 FFFA76FF FE5689FC 4689FE57 W±.F•.V±.v'.v½.F..P.v±.v•.vÞ.vŸ. 0000A0
 7500E47E 83E44689 1CC48300 0010DA9A 006A0A76 FF0C76FF 27FB68E8 76FFEA76 vô.vÒh«'.v..v.j..Ö....á..Fô.-ô.u 0000C0
 76FF5016 94468000 4FE90374 02470826 078826F8 5EC4024D E9E4468B 0006E903 .Ô...FôÔM.á^¥&..&.G.t.ÔO..F..P.v 0000E0
 006A596A F876FFFA 76FFE876 FFEA76FF E076FFE2 76FFEE76 FFF076FF FC76FFFE ±.v•.vÞ.vŸ.vã.vÅ.võ.vÒ.v'.v½jYj. 000100
 E9037500 E47E8399 B2E446C7 0005E903 7401E47E 83E44689 1CC48300 00FFFF9A ......á..Fô.-ô.t.Ô..úFôý..-ô.u.Ô 000120
 2692568B 904688F8 5EC40013 E9037592 46089046 8801A2E9 01EFE9E4 46880006 ...FôÔý.ÔÅ..F..F.u.Ô..á^%.F..V.& 000140
 E876FFEA 76FFE076 FFE276FF 50169446 80F876FF FA76FF00 71E90257 89260789 ..&.W.Ôq..v'.v½.F..P.vã.vÅ.võ.vÒ 000160
 880006E9 037500E4 7E83E446 8918C483 00001151 9A006A0A 76FF0C76 FF27FC68 h•'.v..v.j..Q....á..Fô.-ô.u.Ô... 000180
 FFE076FF E276FF50 16944680 0026E903 7402470B 26078826 F85EC401 92E9E446 Fôô..á^¥&..&.G.t.Ô&..F..P.vã.vÅ. 0001A0
 EC46C701 10E9E446 8914C483 00001351 9A006A58 6AF876FF FA76FFE8 76FFEA76 võ.vÒ.v'.v½jXj..Q....á..Fôô..úF$ 0001C0
 5016EC46 80F876FF FA76FF00 AFE90374 92460890 46880056 EC46C700 05E90057 W.Ô..úF$V..F..F.t.ÔE..v'.v½.F$.P 0001E0

Dump of file SATURN:[PCCOMMON.DUMP.DLL]DMLGLOB.TMP;1 on 18-APR-1990 10:44:56.67
File ID (627,22,0)   End of file block 315 / Allocated 316

Virtual block number 178 (000000B2), 512 (0200) bytes

 0015579A 006A0A76 FF0C76FF 27FD68E8 76FFEA76 FFE076FF E276FF50 16944680 .F..P.vã.vÅ.võ.vÒh«'.v. v.j..W.. 000000
 02470826 078826F8 5EC40101 E9E4468B 0006E903 7500E47E 83E44689 1CC48300 ..á..Fô.-ô.u.Ô...Fôô..á^¥&..&.G. 000020
 76FFEA76 FFE076FF E276FF50 1694468D 016A002C E9037457 EC7E8300 5CE90374 t.Ô\..-$Wt.Ô,.j..F..P.vã.vÅ.võ.v 000040
 FF501694 46800027 E9E44689 16C48300 0014C79A 006AEC76 FFF876FF FA76FFE8 Ô.v'.v½.v$j..ú....á..FôÔ'..F..P. 000060
 468914C4 83000014 009A006A EC76FFF8 76FFFA76 FFE876FF EA76FFE0 76FFE276 vã.vÅ.võ.vÒ.v'.v½.v$j.......á..F 000080
 47892600 0088F85E C40036E9 02578926 07892692 56889046 88F85EC4 0010E9E4 ôÔ..á^%.F..V.&..&.W.Ôó.á^%¡..&.G 0000A0
 E9037500 0730FE71 E9037500 0630FD8E E9037500 05300023 E90026E9 07892602 .&..Ô&.Ô#.=..u.Ô.»=..u.Ôq±=..u.Ô 0000C0
 26F85EC4 003BE9E4 46880006 E9037500 E47E83FF CAE9FEF8 E9037500 0930FEF8 «±=..u.Ô«±Ôò..-ô.u.Ô...Fôô;.á^¥& 0000E0
 77FF26F8 5EC443FC 68E876FF EA76FF0A 76FF0C76 FF0026E9 03750247 0826078B ..&.G.u.Ô&..v..v..võ.vÒh•Cá^¥&.w 000100
 000022C8 CBC95F5E 1F0000E9 E44688E4 468910C4 83000013 BC9A006A 37FF2602 .&.7j..¥....á..Fô.Fôô...^ èúâ".. 000120
 26FC478B 260E5EC4 040E4683 E25689E0 46891056 880E468B 088E10F1 881E5657 WV.¡þ..Å.F..V..FÅ.Vã.F..á^.&.G•& 000140
 4683EA56 89E84689 FE578826 FC478826 0E5EC404 0E4683F4 5689F246 89FE578B .W±.F.V¶.F..á^.&.G•&.W±.FÒ.Võ.F 000160
 8826FC47 88260E5E C4040E46 83E65689 E44689FE 578826FC 4788260E 5EC4040E ..á^.&.G•&.W±.Fô.Vl.F..á^.&.G•&. 000180
 7500EC7E 83EC4689 0000FFFF 9A5016F6 4680F276 FFF476FF FE5689FC 4689FE57 W±.F•.V±.v¶.v.F-.P......F$.-$.u 0001A0
 89000016 319A5016 F8468050 16EE4680 1D8468F6 76FF0004 E999BC88 0006E903 .Ô..¡¥.Ôå..v-hÇ..FŸ.P.F½.P.1.... 0001C0
 006A006A 5016DE46 801D8568 F676FF00 ADE999BC 880006E9 037500EC 7E83EC46 F&.-&.u.Ô..¡¥.ÔÙ..v-hç..FB.Pj.j. 0001E0

Dump of file SATURN:[PCCOMMON.DUMP.DLL]DMLGLOB.TMP;1 on 18-APR-1990 10:44:56.67
File ID (627,22,0)   End of file block 315 / Allocated 316

Virtual block number 179 (000000B3), 512 (0200) bytes

 76FFFA76 FF016A00 6A0087E9 99BCB800 06E90375 00EC7E83 EC468900 00FFFF9A ......F$.-$.u.Ô..¡¥.Ô..j.j..v'.v 000000
 EC468900 00FFFF9A 5016DE46 80011568 020236FF 2627D006 8EFFFF68 FFFF68F8 ¥h..h....Å'&.6..h...FB.P......F$ 000020
 E476FFE6 76FF0000 FFFF9AE4 76FFE676 FF004FE9 99BCB800 06E90375 00EC7E83 .-$.u.Ô..¡¥.Ôo..vl.vô......vl.vô 000040
 7E83EC46 8912C483 0000144D 9A006A0A 76FF0C76 FF271768 F276FFF4 76FF076A j..v¶.v.h.'.v..v.j..M....á..F$.- 000060
 5E1F0000 E90000B8 000012B6 9AE476FF E676FF00 11E999BC 880006E9 037500EC &.u.Ô..¡¥.Ô...vl.vô.....¡..Ô...^ 000080
 C4040E46 830E5689 0C468910 56880E46 88088E15 74881E56 57000026 C8C8C95F  èúâ&..WV.¡t..Å.F..V..FÉ.VB.F..á 0000A0
 89FE5788 26FC4788 260E5EC4 040E4683 F05689EE 4689FE57 8826FC47 88260E5E ^.&.G•&.W±.FŸ.VÞ.F..á^.&.G•&.W±. 0000C0
 5EC4040E 4683E256 89E04689 FE578826 FC478826 0E5EC404 0E4683E6 5689E446 Fô.Vl.F..á^.&.G•&.W±.FÅ.Vã.F..á^ 0000E0
 4689FE57 8826FC47 88260E5E C4040E46 83F45689 F24689FE 578826FC 4788260E .&.G•&.W±.F.V¶.F..á^.&.G•&.W±.F 000100
 0006E903 7500E87E 83E84689 000015E4 9A5016F6 468DEE76 FFF076FF FE5689FC •.V±.vÞ.vŸ.F-.P.ô....fÒ.-Ò.u.Ô.. 000120
 7E83E846 89000017 AD9A5016 F8468D50 16EA4680 1D8468F6 76FF0004 E999BC88 ¡¥.Ôå..v-hÇ..Fô.P.F½.P.Ù....fÒ.- 000140
 0016089A 006A006A 5016DA46 801D8568 F676FF00 ADE999BC 880006E9 037500E8 Ô.u.Ô..¡¥.ÔÙ..v-hç..FÖ.Pj.j..... 000160
 165268F8 76FFFA76 FF016A00 6A0087E9 99BCB800 06E90375 00E87E83 E8468900 ..FÒ.-Ò.u.Ô..¡¥.Ô..j.j..v'.v½hR. 000180
 00E87E83 E8468900 0016699A 5016DA46 80010E68 020236FF 2627D006 8EFFFF68 h....Å'&.6..h...FÖ.P.Î....fÒ.-Ò. 0001A0
 76FF076A E076FFE2 76FF0000 16869AE0 76FFE276 FF004FE9 99BCB800 06E90375 u.Ô..¡¥.Ôo..vã.vÅ......vã.vÅj..v 0001C0
 037500E8 7E83E846 8912C483 000016A4 9A006A0A 76FF0C76 FF271768 EE76FFF0 Þ.vŸh.'.v..v.j..É....á..FÒ.-Ò.u. 0001E0
```

```
Dump of file SATURN:[PCCOMMON.DUMP.DLL]DMLGLOB.TMP;1 on 18-APR-1990 10:44:56.67
File ID (627,22,0)   End of file block 315 / Allocated 316

Virtual block number 180 (00000084), 512 (0200) bytes

 C8C8C95F 5E1F0000 E9000088 000016C4 9AE076FF E276FF00 11E9998C 8A0006E9 Ô..¡¥.Õ...vã.vÀ.á...¡..Õ...^ èùà 000000
 DC56890A 4689FE57 8826FC47 88260E5E C4040E46 83D88E16 D8881E56 5/ü 0028 (..WV.¡Ü..Ä.F..á^.&.G•&.W±.FÕ.VÉ 000020
 FC478826 0E5EC404 0E4683E0 56890E46 89FE5788 26FC4788 260E5EC4 040£ 583 .F..á^.&.G•&.W±.F8.VÀ.F..á^.&.G• 000040
 83E45689 E24689FE 578826FC 4788260E 5EC4040E 4683F656 89F44689 FE576J26 &.W±.F¶.V-.F..á^.&.G•&.W±.Fã.V8. 000060
 89260247 89260000 88E25EC4 E85689E6 4689FE57 8826FC47 88260E5E C4040E46 F..á^.&.G•&.W±.F|.VÒá^ã¡..&.G.&. 000080
 0019359A 006A0A76 FF0C76FF 27E0680A 76FFDC76 FF5016EC 468D5016 EA468D07 ..Fõ.P.F$.P.vÉ.vÖhÀ'.v..v.j..5.. 0000A0
 FF0033E9 03740AEA 7E8301F2 E998F88 0006E903 7500087E 83D84689 14C48300 ..á..FÄ.-Ä.u.Õ..¡¢.Õ·..-ö.t.Õ3.. 0000C0
 FF0C76FF 27E8680A 76FFDC76 FFE276FF E476FF05 6ADE76FF E076FFF4 76FFF676 v-.v¶.vÀ.v8j..vö.vã.vÉ.vÖhÖ'.v.. 0000E0
 76FFE476 FF015EE9 037405EA 7E83016C E9D84689 1AC48300 0019659A 006A0A76 v.j..e....á..FÄÕl..-ö.t.Õ^..vö.v 000100
 83D84689 12C48300 0019AA9A 006A0A76 FF0C76FF 2714680A 76FFDC76 FF0F6AE2 ãj..vÉ.vÖh.'.v..v.j..ˆ....á..FÄ. 000120
 F0468001 6BE999BF B80006E9 03740247 08260788 26E25EC4 000FE903 7400087E -Ä.t.Õ..á^ã&..&.G.t.Õ..¡¢.Õk..Fÿ 000140
 C4830000 19F69A00 6A37FF26 0277FF26 E25EC427 14680A76 FFDC76FF 036A5016 .Pj..vÉ.vÖh.'á^ã&.w.&.7j..-....á 000160
 0375F256 390008E9 0374F046 39E05688 0E468800 16E90374 00087E83 D8468912 ..FÄ.-Ä.t.Õ...F8.VÀ9Fÿt.Õ..9V·u. 000180
 0277FF26 E25EC427 13680A76 FFDC76FF 046A5016 F8468001 1FE998BF B80006E9 Õ..¡¢.Õ...F%.Pj..vÉ.vÖh.'á^ã&.w. 0001A0
 8800E9E9 998F8800 06E90375 00087E83 D8468912 C4830000 18209A00 6A37FF26 &.7j.. ....á..FÄ.-Ä.u.Õ..¡¢.ÕÕ.. 0001C0
 20E90375 02470826 078826FC 5EC404FC 46830004 E9FE5689 FC4689FA 5688F846 F%.V°.F•.V±Õ...F•.á^•&..&.G.u.Õ  0001E0

Dump of file SATURN:[PCCOMMON.DUMP.DLL]DMLGLOB.TMP;1 on 18-APR-1990 10:44:56.67
File ID (627,22,0)   End of file block 315 / Allocated 316

Virtual block number 181 (00000085), 512 (0200) bytes

 CDE90003 E90003E9 03740257 3926000C E9037407 3926F656 8BF4468B FC5EC400 .á^•.F¶.V-&9.t.Õ..&9W.t.Õ..Õ..Õë 000000
 001AD99A 006A37FF 260277FF 26E25EC4 2715680A 76FFDC76 FFF876FF FA76FFFF ..v°.v%.vÉ.vÖh.'á^ã&.w.&.7j..\.. 000020
 26F65688 F4468BFC 5EC40072 E998FB8 0006E903 7500087E 83D84689 10C48300 ..á..FÄ.-Ä.u.Õ..¡¢.Õr.á^•.F¶.V-& 000040
 7E8399BF D846C700 05E90052 E998FB8 0006E903 75025739 260009E9 03740739 9.t.Õ..&9W.u.Õ..¡¢.ÕR.Õ..úFÀ¢..- 000060
 26E25EC4 271C680A 76FFDC76 FFE676FF E876FF00 38E998BF B80006E9 03750008 Ä.u.Õ..¡¢.Õ;..vÕ.v|.vÉ.vÖh.'á^ã& 000080
 E998FB8 0006E903 7500087E 83D84689 10C48300 0018ED9A 006A37FF 260277FF .w.&.7j..Ù....á..FÄ.-Ä.u.Õ..¡¢.Õ 0000A0
 0E5EC404 0E468308 8E1857B8 1E565700 0062C8C8 C95F5E1F 0000E900 00880006 ..¡..Õ...^ èùàb..WV.¡W..Ä.F..á^. 0000C0
 020E4683 FE4689FE 4788260E 5EC4020E 4683F656 89F44689 FE578826 FC478826 &.G•&.W±.F¶.V-.F..á^.&.G±.F±.F.. 0000E0
 83A45689 A24689FE 578826FC 4788260E 5EC4040E 4683FC46 89FE4788 260E5EC4 á^.&.G±.F•.F..á^.&.G•&.W±.FÀ.VÉ. 000100
 9E46809E 4689A046 89000088 FA5689F8 4689FE57 8826FC47 88260E5E C4040E46 F..á^.&.G•&.W±.F%.V°¡...F..F..F. 000120
 9E468812 C4830000 18AF9A00 6A0A76FF 0C76FF27 1468F476 FFF676FF 0F6A5016 .Pj..v-.v¶h.'.v..v.j..£....á..F. 000140
 D59A006A 9E76FFA0 76FF271C 68F476FF F676FF50 16A84680 0024E903 75A04608 .F.u.Õ$..F˙.P.v-.v¶h.'.v..v.j..( 000160
 FF0C76FF 271268F4 76FFF676 FF076A50 16A84680 002AE9A6 468910C4 8300001B ....á..F|Õ•..F˙.Pj..v-.v¶h.'.v.. 000180
 16A84680 A276FFA4 76FF0000 18409A50 16A84680 12C48300 001C139A 006A0A76 v.j.......á..F˙.P.ə....vÉ.vÀ.F˙. 0001A0
 0A76FF0C 76FF27DA 68F476FF F676FF50 169E4680 0000FFFF 9AF876FF FA76FF50 P.v°.v%......F..P.v-.v¶hÖ'.v..v. 0001C0
 76FFA276 FFA476FF FC76FF00 3EE90375 A0460B9E 468810C4 8300001C 5C9A006A j..\....á..F..F.u.Õ>..v•.vÉ.vÀ.v 0001E0

Dump of file SATURN:[PCCOMMON.DUMP.DLL]DMLGLOB.TMP;1 on 18-APR-1990 10:44:56.67
File ID (627,22,0)   End of file block 315 / Allocated 316

Virtual block number 182 (00000086), 512 (0200) bytes

 F476FFF6 76FF006A FC76FFA2 76FFA476 FFF876FF FA76FF00 00FFFF9A F876FFFA •.v%......v°.v%.vÉ.vÀ.v•j..v-.v¶ 000000
 84C8C8C9 5F5E1F00 00E90000 8818C483 00001A60 9A006A9E 76FFA076 FF271A68 h.'.v..v.j..m....á.¡..Õ...^ èùà. 000020
 8826FC47 88260E5E C4040E46 83CA4689 CC468900 0088088E 1805881E 56570000 ..WV.¡...Ä¡...Fë.Fò.F..á^.&.G•&. 000040
 4788260E 5EC4020E 46830C46 89FE4788 260E5EC4 020E4683 DA568908 4689FE57 W±.FÀ.VÖ.F..á^.&.G±.FÉ.F..á^.&.G 000060
 0E5EC404 0E4683E0 56890E46 89FE5788 26FC4788 260E5EC4 040E4683 CE4689FE ±.Fö.F..á^.&.G•&.W±.F8.VÀ.F..á^. 000080
 46800257 89260789 260C5688 0A4688D0 5EC4D256 89004689 FE578826 FC478826 &.G•&.W±.FÀ.V8á^À.F..V.&..&.W..F 0000A0
 C4830000 104C9A00 6A0A76FF 0C76FF27 E0680876 FFDA76FF 5016F446 80501604 á.P.F¶.P.vÖ.vÄhÀ'.v..v.j..L....á 0000C0
 E9000088 0006E903 750AD47E 8301A2E9 C8468800 06E90375 00C87E83 C8468914 ..Fà.-à.u.Õ...FàÕÀ..-á.u.Õ..¡..Õ 0000E0
 00001886 9A006A0A 76FF0C76 FF271268 D876FFDA 76FF076A 5016FF7C 86800193 ....|..Pj..vÖ.vÄh.'.v..v.j...... 000100
 00FF7D8E 800010E9 03742AFF 7C8E8000 0018E29A 5016FF7C 868DC846 8912C483 .á..Fà..|..P.ã..../|.*t.Õ.../).. 000120
 16FF7C86 8DCA76FF CC76FF50 16FC468D 0000E246 C7014AE9 00008800 06E90374 t.Õ..¡..ÕJ.úFã...F•.P.vä.vò..|.. 000140
 E19A006A 0A76FF0  76FF2806 680876FF 0A76FFDC 76FFDE76 FFE076FF E276FF50 P.vã.vÀ.v8.vÉ.vÖ.vÄh.(.v..v.j..Ä 000160
 FF026A50 16EC468ι 00FDE9C8 46880006 E9037500 C87E83C8 468920C4 8300001D ....á .Fà.-à.u.Õ...FàÕ»..F$.Pj.. 000180
 7500C87E 83C84689 12C48300 001E889A 006A0A76 FF0C76FF 27146808 76FFDA76 vÖ.vÄh.'.v..v.j.......á..Fà.~á.u 0001A0
 FF9A5016 FF7C8680 026AFC76 FFFE76FF D876FFDA 76FF00C8 E9C8468B 0006E903 .Õ...FàÕù..vÖ.vÀ.v±.v•j...|..P.. 0001C0
 00001802 9A5016FF 7C868000 A0E9C846 880006E9 037500C8 7E83C846 890000FF ....Fà.-à.u.Õ...FàÕ....|..P..... 0001E0
```

```
Dump of file SATURN:[PCCOMMON.DUMP.DLL]DMLGLOB.TMP;1 on 18-APR-1990 10:44:56.67
File ID (627,22 ^)   End of file block 315 / Allocated 316

Virtual block number 183 (000000B7), 512 (0200) bytes

4D6AD076 FFD276FF D876FFDA 76FFEC76 FFEE76FF 5016FF7C 868DFC76 FFFE76FF .vŧ.v•..|..P.vŸ.vŝ.vÖ.vÁ.v®.vÅjM 000000
26D05EC4 0059E9C8 46880006 E9037500 C87E83C8 468918C4 83000014 9D9A006A j.......á..Fà.-à.u.Õ...FàÕY.á^Å& 000020
83000010 0A9AL06A 0A76FF0C 76FF27FB 68D876FF DA76FFCE 76FF37FF 260277FF .w.&.7.vö.vÕ.vAh½'.v..v.j....... 000040
FF0C76FF 0876FFDA 76FF046A 0021E9C8 46880006 E9037500 C87E83C8 468912C4 á..Fà.-à.u.Õ...FàÕl.j..vÕ.vÁ.v.. 000060
56570000 70C8C8C9 5F5E1F00 00E9C846 88C84689 0CC48300 00FFFF9A 006A0A76 v.j.......á..Fà.FàÕ...^ èùàp..WV 000080
C4040E46 83EE5689 EC4689FE 578826FC 4788260E 5EC4040E 4683088E 1C76881E .¡v..Å.F..á^.&.G•&.Wŧ.F$.VŸ.F..á 0000A0
89FE5788 26FC4788 260E5EC4 040E4683 92568990 4689FE57 8826FC47 88260E5E ^.&.G•&.Wŧ.F..V..F..á^.&.G•&.Wŧ. 0000C0
8826FC47 88260E5E C4040E46 83F04689 FE478826 0E5EC402 0E4683F6 5689F446 F¶.V-.F..á^.&.Gŧ.FÞ.F..á^.&.G•&. 0000E0
EE76FF07 6A501694 468DE646 89FE4788 260E5EC4 020E4683 FA5689F8 4689FE57 Wŧ.F½.V°.F..á^.&.Gŧ.Fl.F..Pj..vŸ 000100
E9037500 E07E83E0 468912C4 83000010 AF9A006A 0A76FF0C 76FF2712 68EC76FF .všh.'.v..v.j..É....á..FÁ.-Á.u.Õ 000120
F476FFF6 76FF00A1 E9037400 957E8000 AAE90374 2A947E80 0089E999 84880006 ..¡Ç.Õ¿..-.°t.Õ¯..-..t.ÕÁ..v-.v¶ 000140
9276FF00 78E90374 00003D00 00FFFF9A 5016E246 8DF476FF F676FF00 00FFFF9A ......v-.v¶.Fà.P.....=..t.Õx..v. 000160
03E90375 00E07E83 E0468900 00FFFF9A 5016E846 8D156AE2 76FFE476 FF9076FF .v..võ.vàj..FÕ.P......FÁ.-Á.u.Õ. 000180
47082607 8826FC5E C404FC46 830004E9 FE5689FC 4689EA56 88E84688 FFC1E900 .Õè..FÕ.Võ.F•.VŧÕ...F•.á^•&..&.G 0001A0
D2E9E046 890000FF FF9A37FF 260277FF 26FC5EC4 F876FFFA 76FF0018 E9037502 .u.Õ...v°.v½á^•&.w.&.7......FÁÕ® 0001C0
00E999B4 880006E9 000088FF 70E90000 FFFF9AE8 76FFEA76 FF9076FF 9276FFFF ..v..v..võ.vÕ.....Õp.¡..Õ..¡Ç.Õ. 0001E0

Dump of file SATURN:[PCCOMMON.DUMP.DLL]DMLGLOB.TMP;1 on 18-APR-1990 10:44:56.67
File ID (627,22,0)   End of file block 315 / Allocated 316

Virtual block number 184 (000000B8), 512 (0200) bytes

578826FC 4788260E 5EC4040E 4683D88E 1ED2881E 56570000 26C8C8C9 5F5E1F00 ..^ èùà&..WV.¡®..Á.F..á^.&.G•&.W 000000
020E4683 DC5689DA 4689FE57 8826FC47 88260E5E C4040E46 83EA5689 E84689FE ŧ.FÕ.Võ.F..á^.&.G•&.Wŧ.FÖ.VÉ.F.. 000020
83F05689 EE4689FE 578826FC 4788260E 5EC4040E 4683EC46 89FE4788 260E5EC4 á^.&.Gŧ.F&.F..á^.&.G•&.Wŧ.FŸ.VÞ. 000040
C4040E46 83F24689 FE478826 0E5EC402 0E4683E0 4689FE47 88260E5E C4020E46 F..á^.&.Gŧ.FÁ.F..á^.&.Gŧ.F·.F..á 000060
89FE5788 26FC4788 260E5EC4 040E4683 FA5689F8 4689FE57 8826FC47 88260E5E ^.&.G•&.Wŧ.F½.V°.F..á^.&.G•&.Wŧ. 000080
26024789 26000088 FC5EC402 57892607 89260C56 880A4688 F85EC4FE 5689FC46 F•.Vŧá^½.F..V.&..&.W.á^•¡..&.G.& 0000A0
280568E8 76FFEA76 FFEC76FF E076FFF8 76FFFA76 FF0110E9 037403F2 7E830789 ...-·.t.Õ...v°.v½.vÁ.vš.võ.vÕh.( 0000C0
E999B388 0006E903 7500E27E 83E24689 14C48300 00214F9A 006A0A76 FF0C76FF .v..v.j..Ol...á..Fã.-ã.u.Õ..¡°.Õ 0000E0
D59A006A 37FF2602 77FF26F8 5EC42714 68E876FF EA76FF10 6A5016F4 468D00EC &..F¶.Pj..võ.vÕh.'á^Y&.w.&.7}..¡ 000100
99838800 06E90374 F6460BF4 46880008 E9037400 E27E83E2 468912C4 83000021 ¡...á..Fã.-ã.t.Õ...F¶.F-t.Õ..¡°. 000120
00E27E83 E2468900 00FFFF9A 5016DE46 8DF476FF F676FFE8 76FFEA76 FF00A8E9 Õ¨..võ.vÕ.v-.v¶.F®.P......Fã.-ã. 000140
E65689E4 4689F656 88F44688 000FE903 7402DE7E 830083E9 99838800 06E90375 u.Õ..¡°.Õ...-®.t.Õ...F¶.V-.FÕ.Vl 000160
FFF676FF 271468E8 76FFEA76 FF026A50 16E4468D 0040E903 7417DE7E 83004FE9 ÕO..-®.t.Õa..FÕ.Pj..võ.vÕh.'.v-. 000180
0374E646 0BE44688 0008E903 7400E27E 83E24689 12C48300 001F5F9A 006AF476 v¶j.......á..Fã.-ã.t.Õ  .FÕ.Flt. 0001A0
89260789 26E65688 E44688FC 5EC4001C E999B388 0006E900 25E999B3 880006E9 Õ..¡°.Õ%.Õ..¡°.Õ..á^•.Fc Vl&..&. 0001C0
83D88E20 3E881E56 57000068 C8C8C95F 5E1F0000 E999B388 0006E900 00880257 W.¡..Õ..¡°.Õ..._èùàh..WV.¡> .Á. 0001E0

Dump of file SATURN:[PCCOMMON.DUMP.DLL]DMLGLOB.TMP;1 on 18-APR-1990 10:44:56.67
File ID (627,22,0)   End of file block 315 / Allocated 316

Virtual block number 185 (000000B9), 512 (0200) bytes

89FE4788 260E5EC4 020E4683 F05689EE 4689FE57 8826FC47 88260E5E C4C 0E46 F..á^.&.G•&.Wŧ.FŸ.VÞ.F..á^.&.Gŧ. 000000
89FE5788 26FC4788 260E5EC4 040E4683 E44689FE 4788260E 5EC4020E 4683 246 F·.F..á^.&.Gŧ.FÕ.F..á^.&.G•&.Wŧ. 000020
FF5016FC 46805016 EC468002 57892607 89260C56 880A4688 F45EC4F6 5689F446 F¶.V-á^¶.F..V.&..&.W..F&.P.F•.P. 000040
7500E67E 83E64689 14C48300 0022E29A 006A0A76 FF0C76FF 27E068EE 76FFF076 vÞ.vŸhÁ'.v..v.j..ã"...á..Fl.-l.u 000060
076A5016 98468D01 6EE90000 880006E9 03750AEC 7E83017D E9E64688 0006E903 .Õ...FlÕ)..-ã.u.Õ..¡..Õn..F..Pj. 000080
16984680 E6468912 C4830000 23159A00 6A0A76FF 0C76FF27 1268EE76 FFF076FF .vÞ.vŸh.'.v..v.j...#...á..Fl.F.. 0000A0
FF0C76FF 280868EE 76FFF076 FFF276FF 50169846 8D5016E8 468D0000 1D5D9A50 P.]....FÕ.P.F..P.v·.vÞ.vŸh.(.v.. 0000C0
46800109 E9E64688 0006E903 7500E67E 83E64689 16C48300 0023479A 006A0A76 v.j..G#...á..Fl.-l.u.Õ...FlÕ...F 0000E0
468912C4 83000023 EE9A006A 0A76FF0C 76FF2714 68EE76FF F076FF02 6A5016F8 ½.Pj..vÞ.vŸh.'.v..v.j..Ÿ#...á..F 000100
4680026A E876FFEA 76FFEE76 FFF076FF 0007E9E6 46880006 E9037500 E67E83E6 l.-l.u.Õ...FlÕ•..vÞ.vŸ.võ.vÕj..F 000120
9A501698 468D00AD E9E64688 0006E903 7500E67E 83E64689 00001E0F 9A501698 ..P......Fl.-l.u.Õ...FlÕU..F..P. 000140
76FFF676 FFEE76FF F076FFF8 76FFFA76 FF501698 4680E876 FFEA76FF 00001E2C .....võ.võ.F..P.v°.vÞ.vÞ.vŸ.v-.v 000160
C40068E9 E6468800 06E90375 00E67E83 E6468918 C4830000 1E539A00 6A4C6AF4 ¶jLj..S....á..Fl.-l.u.Õ...FlÕh.á 000180
21199A00 6A0A76FF 0C76FF27 F868EE76 FFF076FF E476FF37 FF260277 FF26F45E ^¶&.w.&.7.yÕ.vÞ.vŸh½'.v..v.j...l 0001A0
FFEE76FF F076FF10 6A0030E9 E6468800 06E90375 00E67E83 E6468912 C4830000 ...á..Fl.-l.u.Õ...FlÕÕ.j..vÞ.vŸ. 0001C0
06E9E646 880006E9 037500E6 7E83E646 890CC483 00001EB5 9A006A0A 76FF0C76 v..v.j..ç.....á..Fl.-l.u.Õ...FlÕ. 0001E0
```

```
Dump of file SATURN:[PCCOMMON.DUMP.DLL]DMLGLOB.TMP;1 on 18-APR-1990 10:44:56.67
File ID (627,22,0)   End of file block 315 / Allocated 316

Virtual block number 186 (0000008A), 512 (0200) bytes

 260E5EC4 040E4683 088E2228 881E5657 00000EC8 C8C95F5E 1F0000E9 E6468800 ..FIÕ...^_èùà...WV.¡+".Á.F..á^.& 000000
 89F64689 FE578826 FC478826 0E5EC404 0E4683F4 5689F246 89FE5788 26FC4788 .G•&.W±.F¯.V¶.F..á^.&.G•&.W±.F-. 000020
 68F276FF F476FF50 16FC4680 5016FA46 80078926 02478926 000088F6 5EC4F856 V½á^-¡..&.G.&...F".P.F•.P.V¶.v·h 000040
 24E90000 880006E9 03750BFA 7E8314C4 83000024 C89A006A 0A76FF0C 76FF27E0 Á'.v..v.j..ù$...á..-".u.Õ..¦..Õ$ 000060
 83000022 A19A006A 0A76FF0C 76FF2714 68F276FF F476FF0F 6AF676FF F876FF00 ..V½.v-j..v¶.v·h.'.v..v.j..Á"... 000080
 4788260E 5EC4040E 4683088E 2444881E 56570000 CCC8C8C9 5F5E1F00 00E912C4 á.Õ...^_èùàä..WV.¡D$.Á.F..á^.&.G 0000A0
 F45689F2 4689FE57 8826FC47 88260E5E C4040E46 83885689 864689FE 578826FC •&.W±.F¯.V..F..á^.&.G•&.W±.F·.V¶ 0000C0
 040E4683 804689FE 4788260E 5EC4020E 46838A46 89FE4788 260E5EC4 020E4683 .F..á^.&.G±.F..F..á^.&.G±.F..F.. 0000E0
 76FF8876 FF5016EE 46805016 E44680F8 5689F646 89FE5788 26FC4788 260E5EC4 á^.&.G•&.W±.F-.V½.FÕ.P.FŸ.P.v..v 000100
 0006E903 7500827E 83824689 14C48300 00259D9A 006A0A76 FF0C76FF 27E06886 .hÁ'.v..v.j...%...á..F..-..u.Õ.. 000120
 76FF8876 FF5016FF 34868D04 15E99984 880006E9 03750AE4 7E830424 E9824688 .F.Õ$..-õ.u.Õ..¡Ç.Õ....4..P.v..v 000140
 0006E903 750082? 83824689 10C48300 0026209A 006A0A76 FF0C76FF 271C6886 .h.'.v..v.j.. &...á..F. -..u.Õ.. 000160
 F276FFF4 76FF039? E9037400 FF358E80 0398E903 742AFF34 8E8003E4 E99984B8 ¡Ç.Õõ..ƒ4.*t.Õ...ƒ5..t.C...v¶.v· 000180
 50E90374 00E87E83 0159E903 7401E67E 830000FF FF9A5016 E6468DFF 6A7FFF68 h..j..FI.P......-Ì.t.ÕY..-Õ.t.ÕP 0001A0
 76FF8676 FF8876FF 8A76FFF2 76FFF476 FF8076FF 5016FE46 8DF676FF F876FF01 ..V½.v-.F±.P.v..v¶.v·.v..v..v..v 0001C0
 03740082 7E838246 8920C483 0000267B 9A006A0A 76FF0C76 FF27FA68 8676FF88 ..v.h"'.v..v.j..(&...á .F..-..t. 0001E0
```

```
Dump of file SATURN:[PCCOMMON.DUMP.DLL]DMLGLOB.TMP;1 on 18-APR-1990 10:44:56.67
File ID (627,22,0)   End of file block 315 / Allocated 316

Virtual block number 187 (0000008B), 512 (0200) bytes

 FFFF9A50 1690468D F276FFF4 76FF0358 E9824688 0006E903 7500FE7E 830009E9 Õ...-±.u.Õ...F.ÕX..v¶.v·.F..P... 000000
 688676FF 8876FF50 16984680 0336E982 46880006 E9037500 827E8382 46890000 ...F..-..u.Õ...F.Õ6..F..P.v..v.h 000020
 46880006 E9037500 827E8382 468910C4 83000026 879A006A 9076FF92 76FF271C .'.v..v.j..ñ&...á..F..-..u.Õ...F 000040
 76FF2714 688676FF 8876FF02 6A5016EA 46800000 23909A50 16984680 0306E982 .Õ...F..P..#...Fõ.Pj..v..v.h.'.v 000060
 02CAE982 46880006 E9037500 827E8382 468912C4 83000027 259A006A 0A76FF0C ..v.j..%'...á..F..-..u.Õ...F.Õò. 000080
 006A4C6A 50169446 308676FF 8876FFEA 76FFEC76 FF501698 46809076 FF9276FF .v..v..F..P.v$.võ.v..v..F..PjLj. 0000A0
 9476FF96 76FF0290 E9824688 0006E903 7500827E 83824689 18C48300 0023869A .Ñ#...á..F..-..u.Õ...F.Õ...v..v. 0000C0
 83824689 12C48300 0024989A 006A0A76 FF0C76FF 27F86886 76FF8876 FF8076FF .v..v..v.h½'.v..v.j...$...á..F.. 0000E0
 904680FC 5689FA46 890C5688 0A468801 A2E9025C E9824688 0006E903 7500827E ~..u.Õ...F.Õ\.ÕÅ..F..V..F".V=.F. 000100
 FF8676FF 8876FF8A 76FFF276 FFF476FF 8076FF50 16FF3486 805016FA 46805016 .P.F".P..4..P.v..v¶.v·.v..v..v.. 000120
 7500827E 83824689 24C48300 0027F89A 006A0A76 FF0C76FF 27F56886 76FF8876 v..v.h%'.v..v.j..%'...á$.F..-..u 000140
 03750082 7E838246 890000FF FF9A5016 8C468D8A 76FF0200 E9824688 0006E903 .Õ...F.Õ...v..F..P......F..-..u. 000160
 80F676FF F876FF00 0020079A 9076FF92 76FF5016 8C468001 E1E98246 880006E9 Õ...F.ÕÅ..F..P.v..v... ...V½.v-. 000180
 FF27FA68 8676FF88 76FF8676 FF8876FF 8A76FF8C 76FF8E76 FF8076FF 5016FE46 F±.P.v..v..v..v..v..v..v.h"'. 0001A0
 827E8300 00FFFF9A 8C76FF8E 76FF8246 8920C483 0000283E 9A006AFA 76FFFC76 v•.v"j..>(...á .F..v..v.......-. 0001C0
 FF8876FF 106A5016 94468001 75E98246 880006E9 037500FE 7E830009 E9037400 .t.Õ...-±.u.Õ...F.Õu..F..Pj..v.. 0001E0
```

```
Dump of file SATURN:[PCCOMMON.DUMP.DLL]DMLGLOB.TMP;1 on 18-APR-1990 10:44:56.67
File ID (627,22,0)   End of file block 315 / Allocated 316

Virtual block number 188 (0000008C), 512 (0200) bytes

 06E90375 00827E83 82468912 C4830000 28689A00 6AFA76FF FC76FF27 14688676 v.h.'.v•.v"j..k(...á..F..-..u.Õ. 000000
 83000028 9F9A006A FA76FFFC 76FF27F9 688676FF 8876FF10 6A0143E9 82468800 ..F.ÕC.j..v..v.h"'.v=.v"j...(... 000020
 8876FF80 76FF9476 FF9676FF 0116E982 46880006 E9037500 827E8382 46890EC4 á..F..~..u.Õ...F.Õ...v..v..v..v. 000040
 E9037500 827E8382 468912C4 83000029 2C9A006A FA76FFFC 76FF27F8 688676FF .v.h%'.v•.v"j..,)...á..F..~..u.Õ 000060
 C4830000 28F59A00 6AFA76FF FC76FF86 76FF8876 FF8076FF 00E2E982 46880006 ...F.Õã..v..v..v..v•.v"j..%(...á 000080
 FF0C76FF 8676FF88 76FF8076 FF0087E9 82468800 06E90375 00827E83 8246890C ..F..-..u.Õ...F.Õñ..v..v..v..v.. 0000A0
 46C7008C E9824688 0006E903 7500827E 83824689 0CC48300 0024189A 006A0A76 v.j...$...á..F..~..u.Õ...F.Õ..úF 0000C0
 0000298A 9A006A94 76FF9676 FF271768 8676FF88 76FF0F6A 50168446 80000184 ....F..Pj..v..v.h.'.v..v.j...).. 0000E0
 89269656 8894468B F65EC400 55E98246 880006E9 03750082 7E838246 8912C483 .á..F..-..u.Õ...F.ÕU.á^-.F..V.&. 000100
 FFF476FF F676FFF8 76FF0000 22F29A50 16FF3486 80003FE9 00008802 57892607 .&.W.¡..Õ?...4..P.·"...V½.v-.v¶. 000120
 C4830000 25509A00 6A0A76FF 0C76FF28 04688676 FF8876FF 8A76FF80 76FFF276 v·.v..v..v..v.h.(.v..v.j..]%...á 000140
 C4040E46 83088E24 E2881E56 5700000E C8C8C95F 5E1F0000 E9824688 82468918 ..F..F.Õ...^_èùà...WV.¡ã$.Á.F..á 000160
 89FE5788 26FC4788 260E5EC4 040E4683 FE5689FC 4689FE57 8826FC47 88260E5E ^.&.G•&.W±.F=.V±.F..á^.&.G•&.W±. 000180
 76FF2714 68FC76FF FE76FF0F 6A5016F2 4680F246 89F44689 000088F8 5689F646 F-.V½¡...F¶.F·.F·.Pj..v±.v•h.'.v 0001A0
 FFF676FF F876FF00 25E90375 F44608F2 468812C4 8300002A 219A006A 0A... FOC ..v.j..¡"...á..F·.F¶u.Õ%..V½.v-. 0001C0
 76FF002C E9FA4689 10C48300 002A489A 006AF276 FFF476FF 271C68FC 76FF. 76 v±.v•h.'.v¶.v·j..H"...á..F"Õ,..v 0001E0
```

Dump of file SATURN:[PCCOMMON.DUMP.DLL]DMLGLOB.TMP;1 on 18-APR-1990 10:44:56.67
File ID (627,22,0) End of file block 315 / Allocated 316

Virtual block number 189 (000000BD), 512 (0200) bytes

```
FF12C483 00002781 9A006A0A 76FF0C76 FF271268 FC76FFFE 76FF076A F676FFF8 %.v-j..v±.v=h.'.v..v.j  .'...á.. 000000
8E29A788 1E565700 002AC8C8 C95F5E1F 0000E900 00880000 29629AF6 76FFF876 v%.v-.b)..|..Õ...^_èùà*..WV.|I). 000020
4788260E 5EC4020E 4683E256 89E04689 FE578826 FC478826 0E5EC404 0E46830B Ä.F..á^.&.G=&.W±.FÃ.Vã.F..á^.&.G 000040
578826FC 4788260E 5EC4040E 4683E846 89FE4788 260E5EC4 020E4683 EA4689FE ±.Fõ.F..á^.&.G±.FÕ.F..á^.&.G=&.W 000060
0A4680F8 4689FA46 89000088 07892602 47892600 0088EC5E C4EE5689 EC4689FE ±.F§.VŸá^$|..&.G.&..|...F°.F%.FÖ 000080
14C48300 0028399A 006A0A76 FF0C76FF 27E068E0 76FFE276 FF5016F0 46805016 .P.FÞ.P.vã.vÁhÁ'.v..v.j..9+...á. 0000A0
CCE90000 880006E9 03740ADA 7E83020B E999BFB8 0006E903 75000C7E 830C4689 .FÉ.-É.u.Õ..|¢.ÕU..-Õ.t.Õ..|..Õä 0000C0
271468E0 76FFE276 FF0F6A50 16E4468D 02B0E999 BFB80006 E9037505 DA7E8382 ..-Õ.u.Õ..|¢.Õ§..FÕ.Pj..vã.vÁh.' 0000E0
08E44688 0008E903 74000C7E 830C4689 12C48300 002B769A 006A0A76 FF0C76FF .v..v.j..v+...á..FÉ.-É.t.Õ...FÕ. 000100
E676FF27 1468E076 FFE276FF 036A5016 F4468002 80E999BF B80006E9 0374E646 F|t.Õ..|¢.Õ...F¶.Pj..vã.vÁh.'.vl 000120
74F64608 F4468800 08E90374 000C7E83 DC468912 C4830000 28819A00 6AE476FF .võj..Ÿ+...á..FÉ.-É.t.Õ...F¶.F-t 000140
006A0A76 FF0C76FF 27E968E0 76FFE276 FF501606 468D0243 E999BF88 0006E903 .Õ..|¢.ÕC..F•.P.vã.vÁhÕ'.v..v.j. 000160
6A5016F8 46800213 E999BF88 0006E903 75000C7E 830C4689 10C48300 002BE39A .D+...á..FÉ.-É.u.Õ..|¢.Õ...F%.Pj 000180
DC7E830C 468912C4 83000029 F79A006A E476FFE6 76FF2713 68E076FF E276FF04 ..vã.vÁh.'.vl.võj..%)...á..FÉ.-É 0001A0
7500EA7E 830102E9 998F8800 06E90374 02470B26 078826F8 5EC4000F E9037400 .t.Õ..á^Y&..&.G.t.Õ..|¢.Õ#..-õ.u 0001C0
E999BFDC 46C70008 E90375F6 56390008 E90374F4 46390856 8806468B 008AE903 .Õo..F•.VA9F¶t.Õ..9V-u.Õ..úFÉ¢.Õ 0001E0
```

Dump of file SATURN:[PCCOMMON.DUMP.DLL]DMLGLOB.TMP;1 on 18-APR-1990 10:44:56.67
File ID (627,22,0) End of file block 315 / Allocated 316

Virtual block number 190 (000000BE), 512 (0200) bytes

```
7502470B 26078826 FC5EC404 FC468300 04E9FE56 89FC4689 FA5688F8 4688016C l..F%.V°.F•.V±Õ...F•.á^=&..&.G.u 000000
46890000 2D449A50 160E468D 37FF2602 77FF26FC 5EC4E076 FFE276FF 0063E903 .Õc..vã.vÁá^=&.w.&.7.F8.P.D-...F 000020
C70008E9 037521DE 7E830014 E9037406 E87E8301 21E90003 E9037500 DC7E830C É.-É.u.Õ..Õl..-Õ.t.Õ...-Blu.Õ..ú 000040
8FDC46C7 0008E903 75220E7E 830011E9 03751EDE 7E83001A E90107E9 998FDC46 FÉ¢.Õ..Õ...-B.u.Õ...-B"u.Õ..úFÉ¢ 000060
46880000 E90257?9 26078926 EC5EC402 57882607 8826F85E C4FF8AE9 00EAE999 .Õõ.Õ..á^Y&..&.W.á^$&..&.W.ÕÁ..F 000080
0020E903 75024?.3 26078826 FC5EC404 FC468300 04E9FE56 89FC4689 FA5688F8 %.V°.F•.V±Õ...F•.á^=&..&.G.u.Õ . 0000A0
FFCDE900 03E90003 E9037402 57392600 0CE90374 0739260B 5688D646 88FC5EC4 á^=.F•.VA&9.t.Õ..&9W.t.Õ..Õ..Õe. 0000C0
E999BFDC 46C70008 E9037502 57392600 09E90374 0739260B 5688D646 88FC5EC4 á^=.F•.VA&9.t.Õ..&9W.u.Õ..úFÉ¢.Õ 0000E0
75000C7E 830C4689 00002185 9A50160E 468DF476 FFF676FF E076FFE2 76FF006C l..vã.vÁ.v-.v¶.F8.P..l...FÉ.-É.u 000100
2DE999BF DC46C700 08E90375 21DE7E83 0014E903 7406E87E 830047E9 0003E903 .Õ..ÕG..-Õ.t.Õ...-Blu.Õ..úFÉ¢.Õ- 000120
5EC40010 E999BFDC 46C70008 E9037522 DE7E8300 11E90375 1EDE7E83 001AE900 .Õ...-B.u.Õ...-B"u.Õ..úFÉ¢.Õ..á^ 000140
FFF876FF FA76FF00 1FE90375 FA460BF8 46880257 89260789 26F6568B F44688EC &.F¶.V-&..&.W..F%.F°u.Õ...v°.v%. 000160
06E90375 000C7E83 10C48300 002AE99A 006AE476 FFE676FF 271568E0 76FFE276 vã.vÁh.'.vl.võj..Õ*...á..-É.u.Õ. 000180
4688D88E 2A60881E 56570000 00C8C8C9 5F5E1F00 00E90000 B80006E9 998FB800 .|¢.Õ..|..Õ...^_èùà...WV.|m°.Á.F 0001A0
316AFFFF 6817CE68 D88E2DEA 881E5657 000002C8 C8C95F5E 1F0000E9 08568806 ..V.Õ...^_èùà...WV.|Õ-.Áhö.h..j1 0001C0
FE4688FE 468918C4 830000FF FF9A006A 486A026A 006A006A 006A0742 681E016A j..hB.j.j.j.j.jHj.......á..F±.F± 0001E0
```

Dump of file SATURN:[PCCOMMON.DUMP.DLL]DMLGLOB.TMP;1 on 18-APR-1990 10:44:56.67
File ID (627,22,0) End of file block 315 / Allocated 316

Virtual block number 191 (000000BF), 512 (0200) bytes

```
000520C1 020302B3 000A1F91 02030000 001C1655 0005002B CBC95F5E 1F0000E9 Õ...^_èù+...U...........°...è-.. 000000
00040077 0103007E 00040F38 0103007D 000417E5 01030256 00082A56 0203005E ^...V³..V...[...)...8...~...w... 000020
000526F1 02030086 00040816 01030264 0008269A 02030171 0006201E 0203007F ..... ..q....&..d...........þ&.. 000040
000A1FA1 020301F0 00071787 02030008 00040975 01030087 0004005E 0103007E -...^.......u..........þ...Á... 000060
002C0FE3 0002017D 00062C6A 02030008 00040C8C 01030088 00040999 01030208 Ã....................j,..)...D.,. 000080
001C17D1 00050000 002E2E04 0002008F 000528CA 02030013 00040E21 01030000 ....l........Ê(...............!... 0000A0
00061760 0203001E 00040906 010302EC 000A27A3 0203001A 00040915 01030638 8...........É'..&............'... 0000C0
00080F29 020302F7 000A2809 02030368 00080697 0203001F 0004064D 0103010E ....M............h....(..%...)... 0000E0
00052E23 02030128 00062374 02030304 000A25D8 02030083 00040ED3 01030376 v...Ã....°...U%.......t#..(...#... 000100
000A264E 02030000 001C2E09 00020045 000409CC 01032DE2 001C2E0C 00050038 8.......ã-..ä...E...........N&.. 000120
000A27C5 0203023C 00081C35 02030142 00061FC1 02030231 00081BF8 02030320 ...%...1...è...B...5...<...é'.. 000140
040E4683 D88EFFFF 881E5657 000018C8 00000000 00000000 00000000 0000032E .................à...WV.|...Ä.F.. 000160
FE578826 FC478826 0E5EC404 0E4683F0 5689EE46 89FE5788 26FC4788 260E5EC4 á^.&.G=&.W±.FŸ.VÞ.F..á^.&.G=&.W± 000180
C4020E46 83EA5689 E84689FE 578826FC 4788260E 5EC4040E 4683FE56 89FC4689 .F•.V±.F..á^.&.G=&.W±.FÕ.Võ.F..á 0001A0
DABE1E07 16F088F2 7E800008 2D105688 0E468808 0E4683FA 4689FE47 88260E5E ^.&.G±.F°.F...F..V.-...~-.Þ....Ö 0001C0
C39A006A 0A76FF0C 76FF2717 68EE76FF F076FF07 6AE876FF EA76FF1F A5A5A5A5 ÉÉÉÉ..võ.vÕj..vÞ.vŸh.'.v..v.j..ù 0001E0
```

```
Dump of file SATURN:[PCCOMMON.DUMP.DLL]DMLGLOB.TMP;1 on 18-APR-1990 10:44:56.67
File ID (627,22,0)   End of file block 315 / Allocated 316

Virtual block number 192 (000000C0), 512 (0200) bytes

 76FFFE76 FFFA76FF 0057E9EC 46880006 E9037500 EC7E83EC 468912C4 83000000 ....á..F$.-$.u.Õ...F$ÕW..v°.v±.v 000000
 EC7E83EC 46891?C4 83000000 F59A006A 0A76FF0C 76FF27DD 68EE76FF F076FFFC ■.vÞ.vŸhÌ'.v..v.j..‰....á..F$.-$ 000020
 FF0C76FF 271768EE 76FFF076 FF0E6A50 16F24680 0023E9EC 46880006 E9037500 .u.Õ...F$Õ#..F·.Pj..vÞ.vŸh.'.v.. 000040
 D88E0008 881E5657 000000C8 CBC95F5E 1F0000E9 12C48300 00FFFF9A 006A0A76 v.j.......á.Õ...^_èùà...WV.¡...Ä 000060
 FFFF68FF FF68D88E 010C881E 56570000 02C8CBC9 5F5E1F00 00E90856 88064688 .F..V.Õ...^_èùà..¯WV.¡...Äh..h.. 000080
 88FE4689 18C48300 00FFFF9A 006A496A 026A006A 006A006A 07A2681E 016A316A j1j..hÄ.j.j¯j.j.j1j.......á..F±. 0000A0
 01260002 0104001D 012E0005 005E0005 008F0203 0005CBC9 5F5E1F00 00E9FE46 F±Õ...^_èù........^...........&. 0000C0
 00000000 00000000 00000000 0000001D 01280002 00380005 01450203 0000002E ......€¯...8...+................ 0000E0
 5689F046 89FE5788 26FC4788 260E5EC4 040E4683 D88EFFFF 881E5657 00001AC8 à...WV.¡...Ä.F..á^.&.G■&.W±.FÞ_V 000100
 4788260E 5EC4020E 4683F856 89F64689 FE578826 FC478826 0E5EC404 0E4683F2 ·.F..á^.&.G■&.W±.F-.V½.F..á^.&.G 000120
 FFEC5689 EA4689FE 578826FC 4788260E 5EC4040E 46830058 E9F44688 F44689FE ±.F¶.F¶ÕX..F..á^.&.G■&.W±.Fõ.V$. 000140
 83EE4689 10C48300 00FFFF9A 006A536A 5016FA46 80F076FF F276FFEA 76FFEC76 v$.võ_v·.vÞ.F°.PjSj.......á..FŸ. 000160
 E9FA4689 FC468900 00880016 E90003FE 46C7008A E9EE4688 0006E903 7500EE7E -Ÿ.u.Õ...FŸÕ..ùF±..Õ..¡...F■.F°Õ 000180
 76FF27DD 68F076FF F276FFF6 76FFF876 FFF476FF FFEAE9FF A1E90375 C008000A ...áu.ÕÀ.Õò..v¶.v½.v-.v·.vÞhÌ'.v 0001A0
 0038E9EE 46880006 E9037500 EE7E83EE 468912C4 83000001 089A006A 0A76FF0C ..v.j.......á..FŸ.-Ÿ.u.Õ...FŸÕ8. 0001C0
 FF271868 F076FFF2 76FF0E6A FA76FFFC 76FFFE76 FF0027E9 0375FC46 08FA4688 .F°.F■u.Õ'..v±.v■.v°j..v·.vÞh.'. 0001E0

Dump of file SATURN:[PCCOMMON.DUMP.DLL]DMLGLOB.TMP;1 on 18-APR-1990 10:44:56.67
File ID (627,22,0)   End of file block 315 / Allocated 316

Virtual block number 193 (000000C1), 512 (0200) bytes

 0014C8C8 C95F5E1F 0000E900 00880006 E914C483 0000FFFF 9A006A0A 76FF0C76 v..v.j.......á.Õ..¡..Õ...^_èùà.. 000000
 4683F656 89F44689 FE578826 FC478826 0E5EC404 0E4683D8 8E000888 1E565700 .WV.¡...Ä.F..á^.&.G■&.W±.F¶.V-.F 000020
 5EC4040E 4683FC46 89FE4788 260E5EC4 020E4683 FE4689FE 4788260E 5EC4020E ..á^.&.G±.F±.F..á^.&.G±.F■.F..á^ 000040
 4689FE57 8826FC47 88260E5E C4040E46 83F25689 F04689FE 578826FC 4788260E .&.G■&.W±.FÞ.V·.F..á^.&.G■&.W±.F 000060
 0001D89A 006A0A76 FF0C76FF 271868F4 76FFF676 FF0E6A50 16EC468D FA5689F8 ½.V°.Fá.Pj..v-.v¶h.'.v..v.j..Ä.. 000080
 76FFF276 FFF876FF FA76FF00 97E90000 880006E9 0374EE46 08EC4688 12C48300 ..á..F$.FŸt.Õ..¡..Õ...v°.v½.v·.v 0000A0
 8018C483 000001F6 9A006AEC 76FFEE76 FF271A68 F476FFF6 76FF006A 020468F0 Þh..j..v-.v¶h.'.vŸ.v$j..-....á.. 0000C0
 EC468810 C4830000 023F9A00 6A0A76FF 0C76FF27 DA68F476 FFF676FF 5016EC46 F$.P.v-.v¶hÕ'.v..v.j..?....á..F$ 0000E0
 FFFA76FF 0000FFFF 9AF876FF FA76FFF0 76FFF276 FFFC76FF 003EE903 75EE4608 .FŸu.Õ>..v■.v·.vÞ.v°.v½......v°. 000100
 C79A006A EC76FFEE 76FF271A 68F476FF F676FF00 6AFC76FF F076FFF2 76FFF876 v½.v·.vÞ.v■j..v-.v¶h.'.vŸ.v$j..ú 000120
 06468808 8E0125B8 1E565700 0000C8C8 C95F5E1F 0000E900 008818C4 83000000 ....á.¡..Õ...^_èùà...WV.¡X..Ä.F. 000140
 6A316AFF FF68FFFF 68D88E02 59881E56 57000002 C8CBC95F 5E1F0000 E9085688 .V.Õ...^_èùà..¯WV.¡Ÿ..Äh..h..j1j 000160
 E9FE4688 FE468918 C4830000 FFFF9A00 6A4A6A02 6A006A00 6A006A07 AE681E01 ..hÛ.j.j¯j.j.jJj.......á..F±.F±Õ 000180
 00050075 02030251 001E0278 0005005E 00050190 02030007 90C8C95F 5E1F0000 ...^_èù.........^...(...Q...u... 0001A0
 00080218 02030000 001E0278 00020038 00050292 02030000 002E0273 0002007E ~...$...........8...x........... 0001C0
 040E4683 D88EFFFF 881E5657 000010C8 00000000 00000000 00000000 0000023C <...............à...WV.¡...Ä.F.. 0001E0

Dump of file SATI N:[PCCOMMON.DUMP.DLL]DMLGLOB.TMP;1 on 18-APR-1990 10:44:56.67
File ID (627,22,0)   End of file block 315 / Allocated 316

Virtual block number 194 (000000C2), 512 (0200) bytes

 FE578826 FC478826 0E5EC404 0E4683FC 5689FA46 89FE5788 26FC4788 260E5EC4 á^.&.G■&.W±.F°.V■.F..á^.&.G■&.W± 000000
 26FC4788 260E5EC4 040E4683 FE4689FE 4788260E 5EC4020E 4683F256 89F04689 .FÞ.V·.F..á^.&.G±.F±.F..á^.&.G■& 000020
 6A0A76FF 0C76FF27 1768FA76 FFFC76FF 0E6A5016 FE468DF6 5689F446 89FE5788 .W±.F¶.V-.F±.Pj..v■.v°h.'.v..v.j 000040
 76FFF676 FF0024E9 F8468800 06E90375 00F87E83 F8468912 C4830000 00A59A00 ..E....á..F½.-½.u.Õ...F½Õ$..v-.v 000060
 1F0000E9 12C48300 00FFFF9A 006A0A76 FF0C76FF 27D868FA 76FFFC76 FF0F6AF4 ¶j..v■.v°hÄ'.v..v.j.......á.Õ... 000080
 89FE5788 26FC4788 260E5EC4 040E4683 D88E0008 881E5657 000016C8 CBC95F5E ^_èùà...WV.¡...Ä.F..á^.&.G■&.W±. 0000A0
 4689FE47 88260E5E C4020E46 83FE4689 FE478826 0E5EC402 0E4683F4 5689F246 F¯.V¶.F..á^.&.G±.F±.F..á^.&.G±.F 0000C0
 4788260E 5EC4040E 4683F056 89EE4689 FE578826 FC478826 0E5EC404 0E4683FC ■.F..á^.&.G■&.W±.FŸ.VÞ.F..á^.&.G 0000E0
 F876FFEE 76FFF076 FF029268 006EE903 7400FE7E 83F85689 F64689FE 578826FC ■&.W±.F-.V½.-±.t.Õn.h...vÞ.vŸ.v½ 000100
 68F276FF F476FF0E 6A020468 EE76FFF0 76FFF676 FFF876FF 000001CC 9AF676FF .v-.à....v½.v-.vÞ.vŸh..j..v¶.v·h 000120
 0468EE76 FFF076FF F676FFF8 76FF18C4 83000001 859A006A 0A76FF0C 76FF271A .'.v..v.j.......á..v½.v-.vÞ.vŸh. 000140
 E90000B8 18C48300 0001859A 006A0A76 FF0C76FF 271A68F2 76FFF476 FF0F6A02 .j..v¶.v·h.'.v..v.j..ç....á.¡..Õ 000160
 FF0C76FF 271268F2 76FFF476 FFFE76FF 5016FA46 80003BE9 03740EFE 7E8300FC ■..~±.t.Õ;..F°.P.v±.v¶.v·h.'.v.. 000180
 0000021E 9AF676FF F876FFEE 76FFF076 FFFA76FF 12C48300 0001F09A 006A0A76 v.j..Þ....á..v°.vÞ.vŸ.v½.v-..... 0001A0
 9A006A0A 76FF0C76 FF271868 F276FFF4 76FFFE76 FF5016EA 46800088 E9000088 ¡..Õ¡..Fõ.P.v±.v¶.v·h.'.v..v.j.. 0001C0
 4568001A E9FE4688 0086E900 00880006 E90374EC 4608EA46 8812C483 00000256 V....á..Fõ.F$t.Õ..¡..Õ...F±Õ..hE 0001E0
```

Dump of file SATURN:[PCCOMMON.DUMP.DLL]DMLGLOB.TMP;1 on 18-APR-1990 10:44:56.67
File ID (627,22,0)   End of file block 315 / Allocated 316

Virtual block number 195 (000000C3), 512 (0200) bytes

```
FFDEE903 75000F3D 0008E900 0EE90000 02739AF6 76FFF876 FFEE76FF , 76FF02 ..vÞ.vŸ.v½.v-.s...Ö..Ö..=..u.Öñ. 000000
EC76FF27 1A68F276 FFF476FF 006A0204 68EE76FF F076FFF6 76FFF876 FF 00E9 Ö...v½.v-.vÞ.vŸh..j..v¶.v h.'.v& 000020
FFF876FF EE76FFF0 76FF0271 68001AE9 FE468818 C4830000 00729A00 6AE.76FF .võj..r....á..F±Ö..hq..vÞ.vŸ.v½. 000040
5E1F0000 E900 3088 0000E9FF 0EE90375 000F3000 0BE9000E E90000FF FF9AF676 v-.....Ö..Ö..=..u.Öñ.Ö..|..Ö...^ 000060
4689FE57 8826FC47 8B260E5E C4040E46 83D88E00 8CB81E56 57000016 CBCBC95F _èùà...WV.|Ÿ..Á.F..á^.&.G=&.W±.F 000080
0E5EC402 0E4683F2 5689F046 89FE5788 26FC4788 260E5EC4 040E4683 F85689F6 =.V½.F..á^.&.G=&.W±.FÞ.V .F..á^. 0000A0
FC478826 0E5EC404 0E4683F4 4689FE47 8B260E5E C4020E46 83EA4689 FE478826 &.G±.Fö.F..á^.&.G±.F¶.F..á^.&.G= 0000C0
FFF276FF 5016FA46 8DFA4689 EA468800 07C626F0 5EC4FE56 89FC4689 FE578826 &.W±.F=.V±á^Þ&ó...Fö.F°.F°.P.v . 0000E0
18C48300 0001589A 006A0A76 FF0C76FF 271A68F6 76FFF876 FF006A02 0468F076 vÞh..j..v½.v-h.'.v..v.j..(....á. 000100
4689EA46 880007C6 26F05EC4 0000FFFF 9AF076FF F276FFF4 76FFFC76 FFFE76FF .v±.v=.v¶.v .vÞ.....á^Þ&ó...Fö.F 000120
C4830000 03A29A00 6A0A76FF 0C76FF27 1868F676 FFF876FF 106A5016 EC468DFA °.F&.Pj..v½.v-h.'.v..v.j..Á....á 000140
F076FFF2 76FFEA76 FF5040F4 4688FC76 FFFE76FF 004EE903 75EE4608 EC468812 ..F&.FŸu.ÖN..v±.v=.F¶@P.vö.v .vÞ 000160
76FF5016 EC468018 C4830000 03C09A00 6AEC76FF EE76FF27 E668F676 FFF876FF .v½.v-hl'.vŸ.v&j..à....á..F&.P.v 000180
07C626F0 5EC4FFA7 E910C483 00000329 9A006AEC 76FFEE76 FF270A68 F676FFF8 ½.v-hÖ'.vŸ.v&j..)....á.Öl.á^Þ&ó. 0001A0
F276FF02 92680000 03F99A50 16FA4680 F076FFF2 76FF0223 68FA4689 EA468800 ..Fö.F°h#..v .vÞ.F°.P.°...h...v  0001C0
0003409A F076FFF2 76FFF476 FFFC76FF FE76FF00 0001349A 5016FA46 8DF076FF .vÞ.F°.P.4....v±.v=.v¶.v .vÞ.ə.. 0001E0
```

Dump of file SATURN:[PCCOMMON.DUMP.DLL]DMLGLOB.TMP;1 on 18-APR-1990 10:44:56.67
File ID (627,22,0)   End of file block 315 / Allocated 316

Virtual block number 196 (000000C4), 512 (0200) bytes

```
1E565700 0000C8C8 C95F5E1F 0000E900 0088FA46 89EA4688 0007C626 F05EC400 .á^Þ&ó...Fö.F°|..Ö...^_èùà...WV. 000000
68D88E04 31881E56 57000002 CBCBC95F 5E1F0000 E9085688 06468808 8E029888 |...Ä.F..V.Ö...^_èùà...WV.|1..Áh 000020
C4830000 FFFF9A00 6A4B6A02 6A006A00 6A006A07 C0681E01 6A316AFF FF68FFFF ..h..j1j..há.j.j.j.j.jKj.......á 000040
00080400 0203005E 0005036A 02030007 90CBC95F 5E1F0000 E9FE4688 FE468918 ..F±.F±Ö...^_èù.....j...^....... 000060
000803E6 02030038 0005046A 02030000 002E0448 00020429 001F0453 00050246 F...S...)...R̄.......j...8...Ì... 000080
040E4683 D88EFFFF 881E5657 00001CC8 00000000 00000000 001F0450 0002023C <...P...........à...WV.|...Á.F.. 0000A0
FE578826 FC478826 0E5EC404 0E4683F4 5689F246 89FE5788 26FC4788 260E5EC4 á^.&.G=&.W±.F .V¶.F..á^.&.G=&.W± 0000C0
C4040E46 83E65689 E44689FE 578826FC 4788260E 5EC4040E 4683F856 89F64689 .F-.V½.F..á^.&.G=&.W±.Fö.Vl.F..á 0000E0
76FF271E 68F276FF F476FF50 16EE4680 EA5689E8 4689FE57 8826FC47 8B260E5E ^.&.G=&.W±.FÖ.Võ.FŸ.P.v¶.v h.'.v 000100
0171E9EC 46880006 E9037500 EC7E83EC 468910C4 83000000 879A006A F676FFF8 ½.v-j..ñ....á..F&.-&.u.Ö...F&Öq. 000120
76FF2718 68F276FF F476FF10 6AE876FF EA76FF1F 6A0029E9 0374F046 08EE4688 .FŸ.FÞt.Ö).j..võ.vÖj..v¶.v h.'.v 000140
76FFEA76 FF1A6A50 16FA4680 00A9E9EC 468914C4 83000000 E59A006A 0A76FF0C ..v.j..Ì....á..F&Ö`..F°.Pj..võ.v 000160
83EC4689 18C48300 0001259A 006AEE76 FFF076FF 272068F2 76FFF476 FF166AE8 Öj..v¶.v h '.vÞ.vŸj..X....á..F&. 000180
76FFFC76 FF066A00 29E90375 FC460BFA 46880103 E9EC4688 0006E903 7500EC7E -&.u.Ö...F&Ö...F°.F=u.Ö).j..v=.v 0001A0
E9EC4689 14C48300 0001879A 006A0A76 FF0C76FF 271868F2 76FFF476 FF106AFA °j..v¶.v h.'.v..v.j.......á..F&Ö 0001C0
6A5016FA 468DF276 FFF476FF 0A76FF0C 76FFE876 FFEA76FF EE76FFF0 76FF002C ,..vÞ.vŸ.võ.vÖ.v..v..v¶.v .F°.Pj 0001E0
```

Dump of file SATURN:[PCCOMMON.DUMP.DLL]DMLGLOB.TMP;1 on 18-APR-1990 10:44:56.67
File ID (627,22,0)   End of file block 315 / Allocated 316

Virtual block number 197 (000000C5), 512 (0200) bytes

```
E676FF00 94E9EC46 880006E9 037500EC 7E83EC46 8918C483 0000FFFF 9A006A73 sj.......á..F&.-&.u.Ö...F&Ö...vl 000000
468912C4 83000001 8A9A006A 0A76FF0C 76FF2717 68F276FF F476FF07 6AE476FF .vöj..v¶.v h.'.v..v.j..¤....á..F 000020
D068F276 FFF476FF F676FFF8 76FF036A 0061E9EC 46880006 E9037500 EC7E83EC &.-&.u.Ö...F&Öa.j..v½.v-.v¶.v hì 000040
EC468800 06E90375 00EC7E83 EC468912 C4830000 01F19A00 6A0A76FF 0C76FF27 '.v..v.j..Þ....á..F&.-&.u.Ö...F& 000060
006A0A76 FF0C76FF 271768F2 76FFF476 FF0F6A50 16FE4680 0000FE46 C7002EE9 Ö..úF±...F±.Pj..v¶.v h.'.v..v.j. 000080
0008881E 56570000 2AC8CBC9 5F5E1F00 00E9EC46 88EC4689 12C48300 00FFFF9A ......á..F&.F&Ö...^ èùà*..WV.|.. 0000A0
8B260E5E C4040E46 83E65689 E44689FE 578826FC 4788260E 5EC4040E 4683D88E .Ä.F..á^.&.G=&.W±.FÖ.V'.F..á^.&. 0000C0
5EC4040E 4683E846 89FE4788 260E5EC4 020E4683 D85689D6 4689FE57 8B26FC47 G=&.W±.F=.VÁ.F..á^.&.G± °Ö.F..á^ 0000E0
0E46830C 4689FE47 8B260E5E C4020E46 83EC5689 EA4689FE 578826FC 4788260E .&.G=&.W±.Fö.V&.F..á^.&.G±.FÉ.F. 000100
FA5689F8 4689FE57 8826FC47 8B260E5E C4040E46 83F24689 FE478826 0E5EC402 .á^.&.G±.F .F..á^.&.G=&.W±.F½.V° 000120
89260C56 880A44C°B F85EC4FE 5689FC46 89FE5788 26FC4788 260E5EC4 040E4683 .F..á^.&.G=&.W±.F=.V±á^½.F..V.&. 000140
03489A00 6A0A7C ° 0C76FF27 1468E476 FFE676FF 106A5016 F4468D02 57892607 .&.W..F¶.Pj..vl.vöh.'.v..v.j..K. 000160
E9998388 0006E903 74F64608 F4468800 08E90374 000E7E83 DE468912 C4830000 ...á..Fñ.-ñ.t.Ö...F¶.F-t.Ö..|°.Ö 000180
75000E7E 83DE4689 0000FFFF 9A50160A 4680F476 FFF676FF E476FFE6 76FF0093 ...vl.vö.v-.v¶.FÖ.P......Fñ.-ñ.u 0001A0
E9E25689 E04689F6 5688F446 88000FE9 0374020A 7E83006B E9DE4688 0006E903 .Ö...FñÖk..-Ö.t.Ö...F¶.V-.FÁ.VàÖ 0001C0
83000000 779A006A F476FFF6 76FF2714 68E476FF E676FF02 6A5016E0 46800030 =..FÁ.Pj..vl.vöh.'.v-.v¶j..w.... 0001E0
```

```
Dump of file SATURN:[PCCOMMON.DUMP.DLL]DMLGLOB.TMP;1 on 18-APR-1990 10:44:56.67
File ID (627,22,0)   End of file block 315 / Allocated 316

Virtual block number 198 (000000C6), 512 (0200) bytes

 C40016E9 99838800 06E90374 E24608E0 46880008 E9037400 DE7E830E 468912C4 á..Fß.-8.t.Õ...FÂ.Fât.Õ..¡°.Õ..á 000000
 56570000 18C8CE.9 5F5E1F00 00E90000 88025789 26078926 E25688E0 4688FC5E ^•.FÂ.Vã&..&.W.¡..Õ...^ èùà...WV 000020
 C4040E46 83F65689 F44689FE 578826FC 4788260E 5EC4040E 4683088E 020E881E .¡...Â.F..á^.&.G•&.W±.F¶.V-.F..á 000040
 89FE5788 26FC4788 260E5EC4 040E4683 EA5689E8 4689FE57 8826FC47 88260E5E ^.&.G•&.W±.FÒ.Võ.F..á^.&.G•&.W±. 000060
 271468F4 76FFF676 FF106A50 16F84680 0110E903 750C4608 0A4688FE 5689FC46 F•.V±.F..F.u.Õ...F½.Pj..v-.v¶h.' 000080
 08F84688 0008E903 7400EE7E 83EE4689 12C48300 0004769A 006A0A76 FFDC76FF .v..v.j..v....á..FŸ.-Ÿ.t.Õ...F½. 0000A0
 049A5016 EC4680F8 76FFFA76 FFF476FF F676FF00 D9E99983 880006E9 0374FA46 F°t.Õ..¡°.Õ1..v-.v¶.v°.v½.F§.P.. 0000C0
 4688000F E9037402 EC7E8300 B1E9EE46 880006E9 037500EE 7E83EE46 89000003 ....FŸ.-Ÿ.u.Õ...FŸÕŸ..-§.t.Õ...F 0000E0
 FA76FF27 1468F476 FFF676FF 026A5016 F0468D00 30E9F256 89F04689 FA5688F8 ½.V°.FÞ.V Õ=..FÞ.Pj..v-.v¶h.'.v° 000100
 74F24608 F0468800 08E90374 00EE7E83 EE468912 C4830000 04D49A00 6AF876FF .v½j..à....á..FŸ.-Ÿ.t.Õ...FÞ.F t 000120
 7E83EE46 890000FF FF9AF076 FFF276FF FC76FFFE 76FF005C E99983B8 0006E903 .Õ..¡°.Õ\..v±.v•.v .vÞ......FŸ.- 000140
 76FF0C76 FF27DA68 F4/6FFF6 76FF5016 0A468D00 39E9EE46 880006E9 037500EE Ÿ.u.Õ...FŸÕ9..F..P.v-.v¶hÕ'.v..v 000160
 FEE5E900 09E9EE46 880006E9 037500EE 7E83EE46 8910C483 000002CE 9A.˜6A0A .j..ö....á..FŸ.-Ÿ.u.Õ...FŸÕ..Õ1± 000180
 88260E5E C4040E46 83088E03 92881E56 57000064 C8C8C95F 5E1F0000 E90˜988 ¡..Õ...^ èùàd..WV.¡...Ä.F..á^.&. 0001A0
 5EC4020E 4683FE46 89FE4788 260E5EC4 020E4683 F65689F4 4689FE57 8826F:47 G•&.W±.F¶.V-.F..á^.&.G±.F±.F..á^ 0001C0
 0E4683A2 5689A046 89FE5788 26FC4788 260E5EC4 040E4683 FC4689FE 4788260E .&.G±.F•.F..á^.&.G•&.W±.F..VÅ.F. 0001E0

Dump of file SATURN:[PCCOMMON.DUMP.DLL]DMLGLOB.TMP;1 on 18-APR-1990 10:44:56.67
File ID (627,22,0)   End of file block 315 / Allocated 316

Virtual block number 199 (000000C7), 512 (0200) bytes

 50169C46 8D9C4689 9E468900 0088FA56 89F84689 FE578826 FC478826 0E5EC404 .á^.&.G•&.W±.F½.V°¡...F..F..F..P 000000
 46089C46 8812C483 000005AD 9A006A0A 76FF0C76 FF271468 F476FFF6 76FF106A j..v-.v¶h.'.v..v.j..Ù....á..F..F 000020
 0005039A 006A9C76 FF9E76FF 271C68F4 76FFF676 FF5016A8 46800024 E903759E .u.Õ$..F´.P.v-.v¶h.'.v. v.j..Æ.. 000040
 0A76FF0C 76FF2712 68F476FF F676FF07 6A5016A8 46800020 E9A44689 10C48300 ..á..FEÕ ..F´.Pj..v-.v¶r '.v..v. 000060
 FF5016A8 468DA076 FFA276FF 0000FFFF 9A5016A8 468D12C4 83000006 139A006A j.......á..F´.P......vÅ.v..F´.P. 000080
 0A76FF0C 76FF2712 68F476FF F676FF0F 6A5016A6 46800000 FFFF9AF8 76FFFA76 v°.v½......F|.Pj..v-.v¶h.'.v..v. 0000A0
 00A67E83 009EE9A4 46880006 E9037500 A47E83A4 468912C4 83000006 749A006A j..t....á..FÈ.-È.u.Õ...FÈÕ...-|. 0000C0
 FFA276FF 02546800 0006599A F876FFFA 76FFA076 FFA276FF 02156800 28E90375 u.Õ(.h...vÅ.v..v°.v½.Y...hT..vÅ. 0000E0
 76FF0C76 FF27DA68 F476FFF6 76FF5016 9C468D00 0006969A F876FFFA 76FFA076 v..v°.v½......F..P.v-.v¶hÕ'.v..v 000100
 FFA076FF A276FFFC 76FF003E E903759E 46089C46 8810C483 0000068D 9A006A0A .j..§....á..F..F.u.Õ>..v•.vÅ.v.. 000120
 76FFF676 FF006AFC 76FFA076 FFA276FF F876FFFA 76FF0000 FFFF9AF8 76FFFA76 v°.v½......v°.v½.vÅ.v..v•j..v-.v 000140
 C8C8C95F 5E1F0000 E9000088 18C48300 0003F99A 006A9C76 FF9E76FF 271A68F4 ¶h.'.v..v.j..°....á.¡..Õ...^ èùà 000160
 EC5689EA 4689FE57 8826FC47 88260E5E C4040E46 83088E05 03881E56 57000022 "..WV.¡...Â.F..á^.&.G•&.W±.FÕ.V± 000180
 FC478826 0E5EC404 0E4683F4 5689F246 89FE5788 26FC4788 260E5EC4 040E4683 .F..á^.&.G•&.W±.F .V¶.F..á^.&.G• 0001A0
 83E05689 DE4689FE 578826FC 4788260E 5EC4040E 4683F056 89EE4689 FE578826 &.W±.FŸ.VÞ.F..á^.&.G•&.W±.Fß.VÅ. 0001C0
 76FFEC76 FF106A50 16F64680 FE5689FC 4689FE57 8826FC47 88260E5E C4040E46 F..á^.&.G•&.W±.F•.V±.F-.Pj..v§.v 0001E0

Dump of file SATURN:[PCCOMMON.DUMP.DLL]DMLGLOB.TMP;1 on 18-APR-1990 10:44:56.67
File ID (627,22,0)   End of file block 315 / Allocated 316

Virtual block number 200 (000000C8), 512 (0200) bytes

 0006E903 7500E67E 83E64689 12C48300 0007A09A 006A0A76 FF0C76FF 271468EA õh.'.v..v.j.......á..F|.-|.u.Õ.. 000000
 76FF026A 5016E246 8D0181E9 00008800 06E90374 F84608F6 46880192 E9E64688 .F|Õ...F-.F½t.Õ..¡..Õ...Fâ.Pj..v 000020
 037500E6 7E83E646 8912C483 00000826 9A006AF6 76FFF876 FF271468 EA76FFEC &.võh.'.v½.v-j..&....á..F|.-|.u. 000040
 EA76FFEC 76FF013E E9000088 0006E903 74E44608 E2468801 4FE9E646 880006E9 Õ...F|ÕO..Fã.FÕt.Õ..¡..Õ>..v§.võ 000060
 E9E64688 0006E903 7500E67E 83E64689 0000042F 9A5016FA 468DEE76 FFF076FF .vÞ.vŸ.F°.P./....F|.-|.u.Õ...F|Õ 000080
 037429FA 7E83EA76 FFEC76FF F276FFF4 76FFE276 FFE476FF FC76FFFE 76FF0116 ...v±.v•.vÕ.vã.v¶.v .v§.võ.-°)t. 0000A0
 E6468918 C4830000 08619A00 6AEE76FF F076FF50 51428800 03E955F2 880006E9 Õ..¡ UÕ..¡BQP.vÞ.vŸj..a....á..F| 0000C0
 FF0F6A50 16E84680 0068E903 7529FA7E 8300C9E9 E6468800 06E90375 00E67E83 .-|.u.Õ...F|Õè..-°)u.Õh..FÕ.Pj.. 0000E0
 7500E67E 83E64689 12C48300 0008979A 006A0A76 FF0C76FF 271268EA 76FFEC76 v§.võh.'.v..v.j.......á..F|.-|.u 000100
 77FF26FC 5EC42717 68EA76FF EC76FF08 6A5016E8 468D008E E9E64688 0006E903 .Õ...F|Õ...FÕ.Pj..v§.võh.'á^•&.w 000120
 0058E9E6 46880006 E9037500 E67E83E6 468912C4 83000008 DF9A006A 37FF2602 .&.7j..Õ....á..F|.-|.u.Õ...F|ÕX. 000140
 68EA76FF EC76FF50 00068800 03E90006 880006E9 037429FA 7E830E76 FFE076FF .vÅ.vß.-°)t.Õ..¡..Õ..¡..P.v§.võh 000160
 83E05688 DE4688E6 468912C4 83000005 849A006A 37FF2602 77FF26FC 5EC42717 .'á^•&.w.&.7j.......á..F|.Fß.VÅ. 000180
 000AC8CB C95F5E1F 0000E9E6 46880006 E9E64688 0006E903 7500E67E 83020E46 Fß..-|.u.Õ...F|Õ...F|Õ...^ èùà.. 0001A0
 4683F856 89F64689 FE578826 FC478826 0E5EC404 0E468308 8E060788 1E565700 .WV.¡•..Â.F..á^.&.G•&.W±.F=.V½.F 0001C0
 5689FC46 89FE5788 26FC4788 260E5EC4 040E4683 FA4689FE 4788260E 5EC4020E ..á^.&.G±.F°.F..á^.&.G•&.W±.F•.V 0001E0
```

```
Dump of file SATURN:[PCCOMMON.DUMP.DLL]DMLGLOB.TMP;1 on 18-APR-1990 10:44:56.67
File ID (627,22,0`   End of file block 315 / Allocated 316

Virtual block number 201 (000000C9), 512 (0200) bytes

 000014C8 CBC95F5E 1F0000E9 00008802 57892607 89260C56 880A4688 FC5EC4FE ±á^•.F..V.&..&.W.j..Õ...^_èùà... 000000
 0E4683FA 5689F846 89FE5788 26FC4788 260E5EC4 040E4683 088E0915 881E5657 WV.j...Ã.F..á^.&.G•&.W±.F%.V•.F. 000020
 68F876FF FA76FF10 6A5016FC 4680EE56 89EC4689 FE578826 FC478826 0E5EC404 .á^.&.G•&.W±.F$.VŸ.F•.Pj..v•.v%h 000040
 46880006 E9037500 F47E83F4 468912C4 83000007 5D9A006A 0A76FF0C 76FF2714 .'.v..v.j..]....á..F¶.-¶.u.Õ...F 000060
 5016F646 80FC76FF FE76FFF8 76FFFA76 FF008FE9 0375FE46 08FC4688 01A1E9F4 ¶ÕÀ..F•.F±u.Õ...v•.v%.v±.v•.F-.P 000080
 0029E903 7402F67E 83016EE9 F4468800 06E90375 00F47E83 F4468900 0007DC9A .É....F¶.-¶.u.Õ...F¶Õn..--.t.Õ). 0000A0
 00000A55 9A006A0A 76FF0C76 FF271968 F876FFFA 76FF106A FC76FFFE 76FF1F6A j..v±.v•j..v•.v%h.'.v..v.j..U... 0000C0
 FF0C76FF 271968F8 76FFFA76 FF106AFC 76FFFE76 FF066A00 26E9F446 8914C483 .á..F¶Õ&.j..v±.v•j..v•.v%h.'.v.. 0000E0
 46800107 E9F44688 0006E903 7500F47E 83F44689 14C48300 000A859A 006A0A76 v.j.......á..F¶.-¶.u.Õ...F¶Õ...F 000100
 83F44689 10C48300 000AC59A 006A0A76 FF0C76FF 271E68F8 76FFFA76 FF5016F0 Þ.P.v•.v%h.'.v..v.j..é....á..F¶. 000120
 76FFEE76 FF1F6A00 2CE90374 F24608F0 46880007 E9F44688 0006E903 7500F47E -¶.u.Õ...F¶Õ•..FÞ.F t.Õ,.j..vŸ.v 000140
 88F44689 14C48300 000AF69A 006A0A76 FF0C76FF 271868F8 76FFFA76 FF106AEC $j..v•.v%h.'.v..v.j..-....á..F¶. 000160
 F276FF27 2068F876 FFFA76FF 166AEC76 FFEE76FF 1A6A5016 FC468000 A0E9F446 F¶Õ...F•.Pj..vŸ.v$j..v•.v%h '.v· 000180
 880066E9 F4468800 06E90375 00F47E83 F4468918 C4830000 08369A00 6AF076FF .vÞj..6....á..F¶.-¶.u.Õ...F¶Õf.. 0001A0
 0C76FF27 1868F876 FFFA76FF 106AFC76 FFFE76FF 066A0029 E90375FE 4608FC46 F•.F±u.Õ).j..v±.v•j..v•.v%h.'.v. 0001C0
 FFEC76FF EE76FFF0 76FFF276 FF002CE9 F4468914 C4830000 09889A00 6A0A76FF .v.j..É....á..F¶Õ,..v·.vÞ.vŸ.v$. 0001E0

Dump of file SATURN:[PCCOMMON.DUMP.DLL]DMLGLOB.TMP;1 on 18-APR-1990 10:44:56.67
File ID (627,22,0)   End of file block 315 / Allocated 316

Virtual block number 202 (000000CA), 512 (0200) bytes

 88F44689 18C48300 0001549A 006A736A 5016FC46 80F876FF FA76FF0A 76FF0C76 v..v..v•.v%.F•.Pjsj..T....á..F¶. 000000
 4788260E 5EC4040E 4683088E 0974881E 56570000 18C8CBC9 5F5E1F00 00E9F446 F¶Õ...^_èùà...WV.jt..Ã.F..á^.&.G 000020
 EA5689E8 4689FE57 8826FC47 88260E5E C4040E46 83F45689 F24689FE 578826FC •&.W±.F¯.V¶.F..á^.&.G•&.W±.FÕ.Võ 000040
 FE478826 0E5EC402 0E4683FA 5689F846 89FE5788 26FC4788 260E5EC4 040E4683 .F..á^.&.G•&.W±.F%.V•.F..á^.&.G± 000060
 260E5EC4 020E4683 FL5689FC 4689FE57 8826FC47 88260E5E C4040E46 83F64689 .F-.F..á^.&.G•&.W±.F•.V±.F..á^.& 000080
 2C9A006A 0A76FF0C 76FF2712 68F276FF F476FF0F 6A5016F0 4680EC46 L  ¢4788 .G±.F$.FÞ.Pj..v¶.v h.'.v..v.j... 0000A0
 06E90375 00F07E83 0015E999 84880006 E9037500 EE7E83EE 468912C4 83L ^00A ....á..FŸ.-Ÿ.u.Õ..¡Ç.Õ...-Þ.u.Õ. 0000C0
 4683088E 0882881E 56570000 14C8CBC9 5F5E1F00 00E99984 880006E9 0000`800 .j..Õ..¡Ç.Õ...^_èùà...WV.j...Ã.F 0000E0
 8826FC47 88260E5E C4040E46 83F45689 F24689FE 578826FC 4788260E 5EC4040E ..á^.&.G•&.W±.F¯.V¶.F..á^.&.G•&. 000100
 4788260E 5EC4020E 4683F646 89FE4788 260E5EC4 020E4683 FA5689F8 4689FE57 W±.F%.V•.F..á^.&.G±.F-.F..á^.&.G 000120
 880A4688 FC5EC4FE 5689FC46 89FE5788 26FC4788 260E5EC4 040E4683 EC4689FE ±.F$.F..á^.&.G•&.W±.F•.V±á^•.F.. 000140
 6A0A76FF 0C76FF27 1268F276 FFF476FF 0F6A5016 F0468002 57892607 89260C56 V.&..&.W..FÞ.Pj..v¶.v h.'.v..v.j 000160
 7500F07E 830015E9 99848800 06E90375 00EE7E83 EE468912 C4830000 0C0F9A00 .......á..FŸ.-Ÿ.u.Õ..¡Ç.Õ...-Þ.u 000180
 8E0C4A88 1E565700 0000C8C8 C95F5E1F 0000E999 84880006 E9000088 0006E903 .Õ..j..Õ..¡Ç.Õ...^_èùà...WV.jJ.. 0001A0
 FF68FFFF 68088E00 00881E56 57000002 C8CBC95F 5E1F0000 E9085688 064688D8 Ã.F..V.Õ...^_èùà...WV.j...Ãh..h. 0001C0
 FE468918 C4830000 FFFF9A00 6A4C6A02 6A006A00 6A006A07 D8681E01 6A316AFF .j1j..hÃ.j.j.j.j.jLj.......á..F± 0001E0

Dump of file SATURN:[PCCOMMON.DUMP.DLL]DMLGLOB.TMP;1 on 18-APR-1990 10:44:56.67
File ID (627,22,0)   End of file block 315 / Allocated 316

Virtual block number 203 (000000CB), 512 (0200) bytes

 02030005 0020002F 00050000 0020002C 00020008 90C8C95F 5E1F0000 E9FE4688 .F±Õ...^_èù.....,. ...../. ..... 000000
 0002017D 000609F1 0203007E 00050865 02030264 000805E0 0203005E 00050CD2 ®...^...Ã...d...e...-...Þ...)... 000020
 0203023C 00080645 02030231 000805F6 02030038 00050046 02030000 002E0027 '.......F...8...-...1...E...<... 000040
 040E4683 D88EFFFF 881E5657 00001AC8 00000000 00000000 0000032E 000A04A7 [...............à...WV.j...Ã.F.. 000060
 FE578826 FC478826 0E5EC404 0E4683F2 5689F046 89FE5788 26FC4788 260E5EC4 á^.&.G•&.W±.FÞ.V·.F..á^.&.G•&.W± 000080
 C4040E46 83E85689 E64689FE 578826FC 4788260E 5EC4040E 4683FA56 89F84689 .F%.V•.F..á^.&.G•&.W±.F|.VÕ.F..á 0000A0
 1768F076 FFF276FF 076AE676 FFE876FF FE5689FC 4689FE57 8826FC47 88260E5E ^.&.G•&.W±.F•.V±.vÕ.v|j..v·.vÞh. 0000C0
 EA468800 06E90375 00EA7E83 EA468912 C4830000 00AA9A00 6A0A76FF 0C76FF27 '.v..v.j..`....á..Fõ.-õ.u.Õ...Fõ 0000E0
 C4830000 00EA9A00 6AF876FF FA76FF27 1E68F076 FFF276FF 5016EC46 800131E9 Õ1..F$.P.v·.vÞh.'.v•.v%j..õ....á 000100
 1F6A0029 E90374EE 4608EC46 8B0101E9 EA468800 06E90375 00EA7E83 EA468910 ..Fõ.-õ.u.Õ...FõÕ...F$.FŸt.Õ).j. 000120
 C4830000 01189A00 6A0A76FF 0C76FF27 1868F076 FFF276FF 0E6AFC76 FFFE76FF .v±.v•j..v·.vÞh.'.v..v.j.......á 000140
 FF272068 F076FFF2 76FF176A FC76FFFE 76FF186A 5016F446 8000A9E9 EA468914 ..FõÕ`..F¶.Pj..v±.v•j..v·.vÞh '. 000160
 93E9EA46 880006E9 037500EA 7E83EA46 8918C483 00000158 9A006AEC 76FFEE76 vŸ.v$j..X....á..Fõ.-õ.u.Õ...FõÕ. 000180
 FF271868 F076FFF2 76FF0E6A F476FFF6 76FF066A 0029E903 75F64608 F4468800 ..F¶.F-u.Õ).j..v-.v¶j..v·.vÞh.'. 0001A0
 76FFFE76 FFEC76FF EE76FF00 2CE9EA46 8914C483 0000018A 9A006A0A 76FF0C76 v..v.j..□....á..FõÕ,..vŸ.v$.v±.v 0001C0
 468918C4 830000FF FF9A006A 746A5016 F4468DF0 76FFF276 FF0A76FF 0C76FFFC •.v..v..v·.vÞ.F¶.Pjtj.......á..F 0001E0
```

```
Dump of file SATURN:[PCCOMMON.DUMP.DLL]DMLGLOB.TMP;1 on 18-APR-1990 10:44:56.67
File ID (627,22,0)   End of file block 315 / Allocated 316

Virtual block number 204 (000000CC), 512 (0200) bytes

 D068F076 FFF276FF F876FFFA 76FF046A 0024E9EA 46880006 E9037500 EA7E83EA õ.-õ.u.Õ...FõÕ$.j..v*.v½.v·.vÞhÏ 000000
 1E565700 0032CPCB C95F5E1F 0000E912 C4830000 FFFF9A00 6A0A76FF 0C76FF27 '.v..v.j.......ó.Õ...^ èuà2..WV. 000020
 5EC4040E 46830C56 890A4689 FE578826 FC478826 0E5EC404 0E468308 8E000888 j...A.F..ó^.&.G=&.Wt.FÕ.VÉ.F..ó^ 000040
 0E4683DE 4689FE47 88260E5E C4020E46 83D05689 CE4689FE 578826FC 4788260E .&.G=&.Wt.Fo.VÀ.F..ó^.&.Gt.FB.F. 000060
 D24689FE 4788260E 5EC4020E 4683E256 89E04689 FE578826 FC478826 0E5EC404 .ó^.&.G=&.Wt.FÀ.Vã.F..ó^.&.Gt.F● 000080
 F24689FE 578826FC 4788260E 5EC4040E 4683F046 89FE4788 260E5EC4 020E4683 .F..ó^.&.Gt.FÞ.F..ó^.&.G=&.Wt.F· 0000A0
 56880A46 88F25EC4 F85689F6 4689FE57 8826FC47 88260E5E C4040E46 83F45689 .V¶.F..ó^.&.G•&.Wt.F-.V½ó^ .F..V 0000C0
 FFDC76FF 0E6A5016 E4468007 89260247 89260000 88F65EC4 02578926 0789260C .&..&.W.ó^-¡..&.G.&...FÕ.Pj..vÉ. 0000E0
 0BE90374 00047E83 D4468912 C4830000 03249A00 6A0A76FF 0C76FF27 14680A76 vÕh.'.v..v.j..$....ó..Få.-å.t.Õ. 000100
 4680E476 FFE676FF DA76FFDC 76FF016D E9998588 0006E903 74E64608 E4468800 ..FÕ.Flt.Õ..¡ç.Õm..vÉ.vÖ.vl.vÕ.F 000120
 037405FE 7E830145 E9998588 0006E903 7500047E 83044689 000003A0 9A5016FE ±.P......FÅ.-Å.u.Õ..¡ç.ÕE..~±.t. 000140
 5016FA46 800040E9 037418FE 7E83004F E9FC5689 FA4689E6 5688E446 88000FE9 Õ...FÕ.Vl.F*.V=ÕO..~±.t.Õ∂..F*.P 000160
 7E830446 8912C483 J000036A 9A006AE4 76FFE676 FF271468 DA76FFDC 76FF026A j..vÉ.vOh.'.vl.vÕj..j....ó..Få.~ 000180
 DEE99985 880006E9 00E7E999 85880006 E90374FC 4608FA46 88000BE9 03740004 Å.t.Õ...F*.F=t.Õ..¡ç.ÕÕ.Õ..¡ç.ÕB 0001A0
 C4830000 007A9A00 6AFA76FF FC76FF27 14680A76 FFDC76FF 0A6A5016 D6468000 ..F●.Pj..vÉ.vÕh.'.v●.v*j..z....ó 0001C0
 76FF00A1 E9998588 0006E903 7408460B D6468800 0BE90374 00047E83 D4468912 ..Få.-å.t.Õ...F●.FÅt.Õ..¡ç.ÕÀ..v 0001E0

Dump of file SATURN:[PCCOMMON.DUMP.DLL]DMLGLOB.TMP;1 on 18-APR-1990 10:44:56.67
File ID (627,22,0)   End of file block 315 / Allocated 316

Virtual block number 205 (000000CD), 512 (0200) bytes

 0006E903 7500047E 83044689 0000FFFF 9A5016EA 46800676 FF0876FF DA76FFDC É.vÕ.vÅ.v●.FÕ.P......FÅ.-Å.u.Õ.. 000000
 5016E846 800676FF D876FFE0 76FFE276 FF0038E9 037402EA 7E830079 E9998588 ¡ç.Õy..~õ.t.ÕB..vã.vÅ.vÅ.v●.FÕ.P 000020
 07892608 56880646 88F65EC4 0048E999 85880006 E9037400 E87E8300 00FFFF9A ......~Õ.t.Õ..¡ç.ÕK.ó^-.F●.VÅ&.. 000040
 00EE7E83 0000FFFF 9A5016EC 4680FF6A 7FFF68E0 76FFE276 FF0032E9 02578926 &.W.Õ2..vã.vÅh..j..F$.P......-Ÿ. 000060
 1F0000E9 00008800 06E99983 880006E9 037700EC 7E830009 E9037E00 14E9037D ).Õ..~.Õ...-$.w.Õ..¡°.Õ..¡..Õ... 000080
 89FE5788 26FC4788 260E5EC4 040E4683 D88E0101 881E5657 000008C8 C8C95F5E ^ èuà...WV.¡l..Ã.F..ó^.&.G=&.Wt. 0000A0
 0A4688FC 5EC4FE56 89FC4689 FE578826 FC478826 0E5FC404 0E4683FA 5689F846 F%.V*.F..ó^.&.G•&.Wt.F=.Vtó^=.F. 0000C0
 8E043C88 1E565700 00CEC8C8 C95F5E1F 0000E900 00880257 89260789 260C5688 .V.&..&.W.¡..Õ...^_èuàö..WV.¡<.. 0000E0
 4788260E 5EC4040E 46839456 89924689 FE578826 FC478826 0E5EC404 0E4683D8 Á.F..ó^.&.G•&.Wt.F¯.V..F..ó^.&.G 000100
 89F44689 FE578826 FC478826 0E5EC404 0E4683FF 349689FF 328689FE 578826FC =&.Wt..2...4..F..ó^.&.G=&.Wt.F¶. 000120
 89FE5788 26FC4788 260E5EC4 040E4683 E24689FE 4788260E 5EC4020E 4683F656 V-.F..ó^.&.Gt.Fã.F..ó^.&.G•&.Wt. 000140
 76FF9476 FF076A50 16FF3686 80844689 FE478826 0E5EC402 0E4683FA 5689F846 F%.V*.F..ó^.&.Gt.F...6..Pj..v..v 000160
 0006E903 7500827E 83824689 12C48300 00029E9A 006A0A76 FF0C76FF 27126892 .h.'.v..v.j.......ó..F..~..u.Õ.. 000180
 06059A50 16FF3686 805016FF 36868000 00FFFF9A 5016FF36 86800318 E9998488 ¡Ç.Õ....6..P.......6..P..6..P... 0001A0
 F476FFF6 76FF0000 FFFF9AF4 76FFF676 FF0000FF FF9A5016 E44680E2 76FF0000 ...vã.FÕ.P......v-.v¶......v-.v¶ 0001C0
 EC76FFEE 76FFFF32 86FFFF34 86FF00CE E9037400 00300000 FFFF9A50 16EC4680 .F$.P.....=..t.Õö..Ñ4..Ñ2..vŸ.v$ 0001E0

Dump of file SATURN:[PCCOMMON.DUMP.DLL]DMLGLOB.TMP;1 on 18-APR-1990 10:44:56.67
File ID (627,22,0)   End of file block 315 / Allocated 316

Virtual block number 206 (000000CE), 512 (0200) bytes

 468802A3 E9998488 0006E903 7500827E 83824689 0000FFFF 9A501686 4680156A j..F..P......F..~..u.Õ..¡Ç.ÕÉ..F 000000
 007DE903 75024708 26078826 FC5EC404 FC468300 04E9FE56 89FC4689 88568886 ..V..F=.VtÕ...F•.ó^=&..&.G.u.Õ). 000020
 46890000 FFFF9A50 16964680 026A37FF 260277FF 26FC5EC4 FF3286FF FF3486FF .Ñ4..Ñ2.ó^=&.w.&.7j..F..P......F 000040
 805016FF 36868000 00FFFF9A 50169646 80501696 46800050 E9037400 827E8382 ..-..t.ÕP..F..P.F..P.......6..P. 000060
 9AEC76FF EE76FF50 16E44680 0026E903 7400003D 08C483FF FF01EA9A 50169646 F..P.õ....ó.=..t.Õ&..FÕ.P.vŸ.v$. 000080
 FF1AE9FF 70E90003 E9905689 8E468902 57882607 8826FC5E C4824689 000006A2 Å....F.ó^=&..&.W..F..V.Õ..Õp.Õ.. 0000A0
 4680FF6A 7FFF68E4 76FFE676 FF0000FF FF9A8676 FF8876FF FF3286FF FF3486FF .Ñ4..Ñ2..v..v.......vl.vÕh..j..F 0000C0
 E476FFE6 76FF0025 E9037400 F27E8300 2EE90374 01F07E83 00000408 9A5016F0 Þ.P.......-Þ.t.Õ...-·.t.ÕX..vl.vÕ 0000E0
 8801A2E9 00008882 46890000 FFFF9A8E 76FF9076 FFF876FF FA76FF00 0006C19A .è....v*.v½.v..v.......F.¡..ÕÅ.. 000100
 16FF3686 800186E9 99848800 00FFFF9A E476FFE6 76FF0011 E90374F2 460BF046 FÞ.F·t.Õ...vl.vÕ.....¡Ç.Õ....6.. 000120
 83824689 12C48300 00073F9A 006A0A76 FF0C76FF 27126892 76FF9476 FF076A50 Pj..v..v.h.'.v..v.j..?....ó..F.. 000140
 46805016 EC468001 48E99983 88000007 989AE476 FFE676FF 0011E903 7500827E ~..u.Õ...vl.vÕ.....¡°.ÕH..F$.P.F 000160
 9476FFFF 3286FFFF 3486FFE2 76FFE476 FFE676FF 8476FF50 16FF3686 8050160A ..P..6..P.v..vl.vÕ.vã.Ñ4..Ñ2..v. 000180
 E9037400 827E8382 468924C4 83000005 109A006A 0A76FF0C 76FF27F5 689276FF .v.h¥'.v..v.j.......ó$.F..~..t.Õ 0001A0
 86FF0000 07F39A50 16FF3686 805016FF 36868000 0005309A 5016FF36 868000EE Ÿ...6..P.=.....6..P..6..P.µ....Ñ 0001C0
 7500827E 83824689 00000598 9A5016E8 4680156A EC76FFEE 76FFFF32 86FFFF34 4..Ñ2..vŸ.v$j..FÕ.P......F..~..u 0001E0
```

```
Dump of file SATURN:[PCCOMMON.DUMP.DLL]DMLGLOB.TMP;1 on 18-APR-1990 10:44:56.67
File ID (627,22,0)   End of file block 315 / Allocated 316

Virtual block number 207 (000000CF), 512 (0200) bytes

56898A46 89EA5688 E8468800 ACE99983 88000008 479AE476 FFE676FF 0011E903 .Ö...vI.vÖ.G...¡°.Ö¯..FÒ.Võ.F..V 000000
C4FF3286 FFFF3486 FF0066E9 03750247 08260788 268A5EC4 048A4683 0004E98C .Ö...F..á^.&..&.G.u.Öf..Ñ4..Ñ2.á 000020
96468050 1696/580 82468900 0005EA9A 50169646 80026A37 FF260277 FF268A5E ^.&.w.&.7j..F..P.õ....F..F..P.F. 000040
E9037400 003D08C4 83061701 EA9A5016 96468D50 16FF3686 80000005 4E9A5016 .P.N.....6..P.F..P.õ....á.=..t.Ö 000060
3486FFFF 87E90003 E9000006 309A37FF 260277FF 268A5EC4 F876FFFA 76FF0018 ...v°.v½á^.&.w.&.7.0...Ö..Ö...Ñ4 000080
00E98246 88000006 919AE476 FFE676FF 0000065F 9AE876FF EA76FFFF 32B6FFFF ..Ñ2..võ.vÒ._....vI.vÖ......F.Ö. 0000A0
578826FC 4788260E 5EC4040E 4683088E 048D881E 56570000 CEC8C8C9 5F5E1F80 ..^_èùàö..WV.¡...Á.F..á^.&.G=&.W 0000C0
020E4683 EE5689EC 4689FE57 8826FC47 88260E5E C4040E46 838C5689 8A4689FE ±.F..V..F..á^.&.G=&.W±.F&.VŸ.F.. 0000E0
0E5EC404 0E4683FF 7E8689FE 4788260E 5EC4020E 46830A46 89FE4788 260E5EC4 á^.&.G±.FÖ.F..á^.&.G±..-..F..á^. 000100
0C76FF27 1C688/‾6 FF8C76FF 5016FF32 868DF256 89F04689 FE578826 FC478826 &.G=&.W±.Fÿ.V·..2..P.v..v.h.'.v. 000120
8003E4E9 99848(.) 06E90375 00807E83 80468910 C4830000 06E59A00 6A0A76FF .v.j..I....á..F..-..u.Ö..¡Ç.Öò.. 000140
4680DA76 FF000009 8A9A5016 FF328680 5016FF32 86800000 07599A50 16FF3286 .2..P.Y.....2..P..2..P.¤....vO.F 000160
769A5016 E4468DEC 76FFEE76 FF000005 669AEC76 FFEE76FF 00000558 9A50160C É.P.(....vŸ.vš.f....vŸ.vš.Fõ.P.v 000180
849A5016 82468015 6AE476FF E676FF8A 76FF8C76 FF00CAE9 03740000 3D000005 ...=..t.Öò..v..v..vI.vÖj..F..P.. 0001A0
5689F446 89845688 82468803 6EE99984 880006E9 03750080 7E838046 89000007 ....F..~..u.Ö..¡Ç.Ön..F..V..F¶.V 0001C0
F45EC48A 76FF8C76 FF007BE9 03750247 08260788 26F45EC4 04F44683 0004E9F6 -Ö...F¶.á^¶&..&.G.u.Ö(..v..v.á^¶ 0001E0

Dump of file SATURN:[PCCOMMON.DUMP.DLL]DMLGLOB.TMP;1 on 18-APR-1990 10:44:56.67
File ID (627,22,0)   End of file block 315 / Allocated 316

Virtual block number 208 (000000D0), 512 (0200) bytes

800050E9 03740080 7E838046 89000007 E19A5016 8E468002 6A37FF26 0277FF26 &.w.&.7j..F..P.Ä....F..-..t.ÖP.. 000000
C4830805 01EA9A50 168E4680 5016FF32 86800000 076A9A50 168E4680 50168E46 F..P.F..P.j.....2..P.F..P.õ....á 000020
26F45EC4 80468900 0008239A E476FFE6 76FF5016 0C468000 26E90374 00003D08 .=..t.Ö&..FÉ.P.vI.vÖ.#....F.á^¶& 000040
76FF8476 FF8A76FF 8C76FFFF 1EE9FF72 E90003E9 FA5689F8 46890257 88260788 ..&.W..F½.V°Ö..Ör.Ö....v..v..v..v 000060
7401E87E 83000006 749A5016 E84680FF 6A7FFF68 0C76FFDE 76FF0000 083C9A82 ..<....vB.vÉh..j..FÒ.P.t....-Ö.t 000080
76FFF876 FFFA76FF 00000A7C 9ADC76FF DE76FF00 2DE90374 00EA7E83 0036E903 .Ö6..-õ.t.Ö-..vB.vÉ.|....v°.v½.v 0000A0
EA460BE8 46880269 E910C483 00000A9A 9A006A0A 76FF0C76 FF281068 8A76FF8C ..v.h.(.v..v.j.......á.Öi..FÒ.Fõ 0000C0
12688A76 FF8C76FF 076A5016 FF328680 0000086E 9ADC76FF DE76FF00 C5E90374 t.Öé..vB.vÉ.n.....2..Pj..v..v.h. 0000E0
80468800 06E90375 00807E83 80468912 C4830000 0AEA9A00 6A0A76FF 0C76FF27 '.v..v.j..õ....á..F..-..u.Ö...F. 000100
FF006A50 16FF3286 80006A00 6A5016F8 46800000 08039A50 16FF3286 800220E9 Ö ...2..P.£....F½.Pj.j...2..Pj.. 000120
C4830000 0B1B9A00 6A0A76FF 0C76FF28 06688A76 FF8C76FF DA76FFEC 76FFEE76 vŸ.vš.vÖ.v..v.h.(.v..v.j.......á 000140
688A76FF 8C76FFF8 76FFFA76 FF0100E9 80468800 06E90375 00807E83 80468920 .F..~..u.Ö...F.ÖÅ..v°.v½.v..v.h 000160
46880006 E9037500 807E8380 468910C4 83000008 549A006A 0A76FF0C 76FF2810 .(.v..v.j..T....á..F..-..u.Ö...F 000180
76FF0C76 FF271268 8A76FF8C 76FF076A 5016FF32 86800199 E9000088 019FE980 .Ö..¡..Ö....2..Pj..v..v.h.'.v..v 0001A0
0C139ADC 76FFDE76 FF0011E9 03750080 7E838046 8912C483 00000889 9A006A0A .j..¿....á..F..-..u.Ö...vB.vÉ... 0001C0
86805016 FC468D50 16E4468D FE5689FC 46890C56 880A4688 015BE999 83880000 ..¡°.Ö(..F..V..F=.V±.FÖ.P.F=.P.. 0001E0

Dump of file SATURN:[PCCOMMON.DUMP.DLL]DMLGLOB.TMP;1 on 18-APR-1990 10:44:56.67
File ID (627,22,0)   End of file block 315 / Allocated 316

Virtual block number 209 (000000D1), 512 (0200) bytes

27F5688A 76FF8C76 FF8A76FF 8C76FFDA 76FFDC76 FFDE76FF FF7E86FF 5016FF32 2..P.Ñ-..vB.vÉ.vÖ.v..v..v..v.h%' 000000
FF328680 00F6E903 7400807E 83804689 24C48300 000CA49A 006A0A76 FF0C76FF .v..v.j..É....á$.F..-..t.Ö-...2. 000020
76FF8A76 FF8C76FF 00000C69 9A5016FF 32868050 16FF3286 80000008 F69A5016 .P.-.....2..P..2..P.Ì....v..v..v 000040
FFDE76FF 0011E903 7500807E 83804689 0000094F 9A5016E0 4680156A E476FFE6 Ì.vÖj..FÅ.P.O....F..-..u.Ö...vB. 000060
04864683 0004E988 56898646 89E25688 E0468800 86E99983 8800000C C99ADC76 vÉ.è...¡°.ÖÑ..FÅ.Vã.F..V.Ö...F.. 000080
6A37FF26 0277FF26 865EC48A 76FF8C76 FF0072E9 03750247 08260788 26865EC4 á^.&..&.G.u.Ör..v..v.á^.&.w.&.7j 0000A0
32868000 0009079A 50168E46 8D50168E 46808046 89000009 9F9A5016 8E468002 ..F..P......F..F..P.F..P.......2 0000C0
260277FF 26865EC4 0026E903 7400030D 08C48309 CC01EA9A 50168E46 8D5016FF ..P.F..P.õ.ä..á.=..t.Ö&.á^.&.w.& 0000E0
78E90003 E910C483 00000806 9A006A0A 76FF0C76 FF281068 8A76FF8C 76FF37FF .7.v..v.h.(.v..v.j..ø....á.Ö..Ö( 000100
80468800 0006FF9A DC76FFDE 76FF0000 0A129AE0 76FFE276 FF8A76FF 8C76FFFF ..v..v..vã.vÅ......vB.vÉ......F. 000120
26FC4788 260E5EC4 040E4683 D88E085E 881E5657 000016C8 C8C95F5E 1F0000E9 Ö.:.^_èùà...WV.¡^..Á.F..á^.&.G=& 000140
4683EC56 89EA4689 FL578826 FC478826 0E5EC404 0E4683F8 5689F646 89FE5788 .W±.F¯.V½.F..á^.&.G=&.W±.Fõ.V&.F 000160
4689FE47 88260E5E C4020E46 83FE5689 FC4689FE 578826FC 4788260E 5.‾4040E ..á^.&.G=&.W±.F=.V±.F..á^.&.G±.F 000180
80F076FF 00000914 9A5016F2 4680FA76 FFF04689 FE478826 0E5EC402 0E4 93FA °.F..á^.&.G±.FÞ.v°.F·.P......vÞ. 0001A0
FF0C76FF 27EE68F6 76FFF876 FFEA76FF EC76FFFC 76FFFE76 FFFA76FF 5016 246 F·.P.v°.v±.v=.vš.vÖ.v½.v-hŸ'.v.. 0001C0
46880006 E9998888 0006E903 7500EE7E 83EE4689 1CC48300 000A609A 006A0A76 v.j..'....á..FŸ.-Ÿ.u.Ö..¡¡.Ö...F 0001E0
```

```
Dump of file SATURN:[PCCOMMON.DUMP.DLL]DMLGLOB.TMP;1 on 18-APR-1990 10:44:56.67
File ID (627,22,0)   End of file block 315 / Allocated 316

Virtual block number 210 (00000002), 512 (0200) bytes

FC478B26 0E5EC404 0E4683D8 8E0CE088 1E565700 00AEC8C8 C95F5E1F 0000E9EE YÖ...^_èùàÙ..WV.¡Á..Ä.F..á^.&.G= 000000
549689FF 52868^FE 578B26FC 478B260E 5EC4040E 46838256 89804689 FE578B26 &.W±.F¯.Vý.F..á^.&.G=&.W±..R...T 000020
478B260E 5EC4040E 4683A856 89A64689 FE578B26 FC478B26 0E5EC404 0E4683FF ..F..á^.&.G=&.W±.F¦.V'.F..á^.&.G 000040
76FF2712 688076FF B276FF07 6A5016FF 5AB68DFF 589689FF 568689FE 578B26FC =&.W±..V...X...Z..Pj..vý.v¯h.'.v 000060
0085E999 B9B80006 E9037500 AA7E83AA 468912C4 8300000D 759A006A 0A76FF0C ..v.j..u....á..F'.-'.u.Ö..¡¿.Öç. 000080
FF5886FF 00000EAA 9A5016FF 5AB68D50 16FF5A86 8000000A 8A9A5016 FF5A8680 ..Z..P.ª.....Z..P..Z..P.'....ÑX. 0000A0
03740000 30000009 2F9A5016 AC468DFF 5686FFFF 5886FF00 00091F9A FF5686FF .ÑV.......ÑX..ÑV..F¯.P./...=..t. 0000C0
AA468900 000C579A 5016B446 80026AAC 76FFAE76 FFFF5286 FFFF5486 FF006CE9 Öl..ÑT..ÑR..vÙ.v¯j..FÇ.P.W....F' 0000E0
86800000 08E49A50 16B4468D 5016B446 800046E9 99898800 06E90375 00AA7E83 .-'.u.Ö..¡¿.ÖF..FÇ.P.FÇ.P.Ö..... 000100
5686FFFF 5886FF00 13E90374 00003D08 C4830C78 01EA9A50 16B4468D 5016FF5A Z..P.FÇ.P.ö.(..á.=..t.Ö...ÑX..ÑV 000120
56570000 AAC8C8C9 5F5E1F00 00E99989 88FF7AE9 0009E900 00880000 FFFF9AFF ......|..Ö..Öz.¡¿.Ö...^_èùà'..WV 000140
C4040E46 83AE5689 AC4689FE 578B26FC 478B260E 5EC4040E 46830B8E 00A1881E .¡Á..Ä.F..á^.&.G=&.W±.F".VÙ.F..á 000160
578B26FC 478B260E 5EC4040E 4683FF58 9689FF56 8689FE57 8826FC47 88260E5E ^.&.G=&.W±..V...X..F..á^.&.G=&.W 000180
006A0A76 FF0C76FF 271268AC 76FFAE76 FF076A50 16FF5A86 80FE5689 FC4689FE ±.F=.V±..Z..Pj..vÙ.v¯h.'.v..v.j. 0001A0
5016FF5A 868000AF E999BAB8 0006E903 7500A67E 83A64689 12C48300 000E179A ......á..F|.~|.u.Ö..¡¤.ÖE...Z..P 0001C0
000E559A FC76FFFE 76FF0000 0FE09A50 16FF5A86 805016FF 5A868000 000E379A .7.....Z..P..Z..P.Á....v±.v=.U.. 0001E0

Dump of file SATURN:[PCCOMMON.DUMP.DLL]DMLGLOB.TMP;1 on 18-APR-1990 10:44:56.67
File ID (627,22,0)   End of file block 315 / Allocated 316

Virtual block number 211 (00000003), 512 (0200) bytes

5686FFFF 5886FFC  6AE90374 00003000 000E679A 5016A846 80FC76FF FE76FF00 ..v±.v=.F'.P.g...=..t.Öj..ÑX..ÑV 000000
B80006E9 037500A6 7E83A646 8900000E 899A5016 80468002 6AA876FF AA76FFFF ..v'.v'j..F¯.P......F|.-|.u.Ö..¡ 000020
9A5016B0 46805016 FF5A8680 00000E48 9A5016B0 46805016 B0468000 44E9998A ¤.ÖD..F¯.P.F¯.P.H.....Z..P.F¯.P. 000040
0009E900 00880000 0ED29AFC 76FFFE76 FF0011E9 03740000 3008C483 0E8C01EA ö.¥..á.=..t.Ö...v±.v=.@...|..Ö.. 000060
5EC4040E 46830B8E 0EF2881E 56570000 AAC8C8C9 5F5E1F00 00E9998A 88FF7EE9 Ö~.¡¤.Ö...^_èùà'..WV.¡'..Ä.F..á^ 000080
8689FE57 8826FC47 88260E5E C4040E46 83AE5689 AC4689FE 578B26FC 478B260E .&.G=&.W±.F".VÙ.F..á^.&.G=&.W±.. 0000A0
16FF5A86 80FE5689 FC4689FE 578B26FC 478B260E 5EC4040E 4683FF58 9689FF56 V...X..F..á^.&.G=&.W±.F=.V±..Z.. 0000C0
83A64689 12C48300 000F519A 006A0A76 FF0C76FF 271268AC 76FFAE76 FF076A50 Pj..vÙ.v¯h.'.v..v.j..Q....á..F|. 0000E0
805016FF 5A868000 000F719A 5016FF5A 868000AF E999B8B8 0006E903 7500A67E ~|.u.Ö..¡E.ÖE...Z..P.q.....Z..P. 000100
5016A846 80FC76FF FE76FF00 000F8D9A FC76FFFE 76FF0000 0F829A50 16FF5A86 .Z..P......v±.v=......v±.v=.F'.P 000120
B0468002 6AA876FF AA76FFFF 5686FFFF 5886FF00 6AE90374 00003000 000F9D9A .....=..t.Öj..ÑX..ÑV..v'.v'j..F¯ 000140
46805016 B0468000 44E9998B B80006E9 037500A6 7E83A646 8900000F 8F9A5016 .P.¢....F|.-|.u.Ö..¡E.ÖD..F¯.P.F 000160
03740000 3008C483 0FF201EA 9A5016B0 46805016 FF5A8680 00001086 9A5016B0 ¯.P.Ñ.....Z..P.F¯.P.õ.'..á.=..t. 000180
5F5E1F00 00E999B8 88FF7EE9 0009E900 00880000 10069AFC 76FFFE76 FF0011E9 Ö...v±.v=.....|..Ö..Ö~.¡E.Ö...^ 0001A0
F44689FE 578B26FC 478B260E 5EC4040E 46830B8E 1026B81E 56570000 62C8C8C9 èùàb..WV.¡&..Á.F..á^.&.G=&.W±.F¶ 0001C0
83FC4689 FE478B26 0E5EC402 0E4683FE 4689FE47 88260E5E C4020E46 83F65689 .V~.F..á^.&.G±.F±.F..á^.&.G±.F=. 0001E0

Dump of file SATURN:[PCCOMMON.DUMP.DLL]DMLGLOB.TMP;1 on 18-APR-1990 10:44:56.67
File ID (627,22,0)   End of file block 315 / Allocated 316

Virtual block number 212 (00000004), 512 (0200) bytes

26FC478B 260E5EC4 040E4683 A45689A2 4689FE57 8826FC47 88260E5E C4040E46 F..á^.&.G=&.W±.FÁ.VÊ.F..á^.&.G=& 000000
68F476FF F676FF0E 6A50169E 46809E46 89A04689 0000B8FA 5689F846 89FE578B .W±.F½.V*¡...F..F..F..Pj..v~.v¶h 000020
A8468D00 24E90375 A04609E 468B12C4 83000012 049A006A 0A76FF0C 76FF2714 .'.v..v.j.......á..F..F.u.Ö$..F' 000040
20E9A646 8910C483 0000122A 9A006A9E 76FFA076 FF271C68 F476FFF6 76FF5016 .P.v~.v¶h.'.v..v.j..*....á..F|Ö 000060
C4830000 12689A00 6A0A76FF 0C76FF27 1268F476 FFF676FF 076A5016 A8468D00 ..F'.Pj..v~.v¶h.'.v..v.j..h....á 000080
00FFFF9A F876FFFA 76FF5016 A8468DA2 76FFA476 FF0000FF FF9A5016 A8468D12 ..F'.P......vÊ.vÁ.F'.P.v*.v½.... 0000A0
8810C483 000012B1 9A006A0A 76FF0C76 FF27DA68 F476FFF6 76FF5016 9E468D00 ..F..P.v~.v¶hÖ'.v..v.j..¥....á.. 0000C0
76FF0000 FFFF9AFB 76FFFA76 FFA276FF A476FFFC 76FF003E E90375A0 46089E46 F..F.u.Ö>..v=.vÊ.vÁ.v*.v½......v 0000E0
006A9E76 FFA076FF 271A68F4 76FFF676 FF006AFC 76FFA276 FFA476FF F876FFFA *.v½.vÊ.vÁ.v=j..v~.v¶h.'.v..v.j. 000100
83D88E11 5AB81E56 57000020 C8C8C95F 5E1F0000 E90000B8 18C48300 0010859A ......á.¡..Ö...^_èùà..WV.¡Z..Á. 000120
26FC478B 260E5EC4 040E4683 EC5689EA 4689FE57 8826FC47 88260E5E C4040E46 F..á^.&.G=&.W±.FÕ.VÊ.F..á^.&.G=& 000140
4683F056 89EE4689 FE578B26 FC478B26 0E5EC404 0E4683F4 5689F246 89FE578B .W±.F'.V¶.F..á^.&.G=&.W±.FŸ.VÞ.F 000160
8826FC47 88260E5E C4040E46 83E65689 E44689FE 578B26FC 478B260E 5EC4040E ..á^.&.G=&.W±.FÖ.V|.F..á^.&.G=&. 000180
006A0A76 FF0C76FF 271468EA 76FFEC76 FF0E6A50 16F6468D FE5689FC 4689FE57 W±.F=.V±.F~.Pj..v$.võh.'.v..v.j. 0001A0
F84608F6 468800E9 E9E8468B 0006E903 7500E87E 83E84689 12C48300 0013949A ......á..FÖ.~Ö.u.Ö...FÖÖ..F~.F½ 0001C0
76FFF876 FF271468 EA76FFEC 76FF026A 5016E046 8D00D8E9 00008800 06E90374 t.Ö..¡..ÖÄ..FÁ.Pj..v$.võh.'.v½.v 0001E0
```

```
Dump of file SATURN:[PCCOMMON.DUMP.DLL]DMLGLOB.TMP;1 on 18-APR-1990 10:44:56.67
File ID (627,22,0)   End of file block 315 / Allocated 316

Virtual block number 213 (00000005), 512 (0200) bytes

 EC76FF00 A6E9E846 8B0006E9 037500E8 7E83E846 8912C483 000011D8 9A006AF6 -j..Ü....å..FÒ.-Ò.u.Õ...FÒÕI..vš 000000
 8B0006E9 037500E8 7E83E846 89000002 D49A5016 FA468DEE 76FFF076 FFEA76FF .vð.vÞ.vŸ.F*.P.å....FÒ.-Ò.u.Õ... 000020
 E276FFF2 76FFF476 FF0030E9 03742AFA 7E830009 E9037529 FA7E8300 7EE9E846 FÒÕ-..-*)u.Õ...~**t.ÕO..v¶.v·.vä 000040
 C4830000 14439A00 6A6E6AFC 76FFFE76 FFEA76FF EC76FFEE 76FFF076 FFE076FF .vÅ.vÞ.vŸ.v£.vð.v±.v•jnj..C....å 000060
 FFF076FF E076FFE2 76FFF276 FFF476FF 07FF2637 FF26E45E C40036E9 E8468918 ..FÒÕ6.å^ð£.7£...v¶.v·.vã.vÅ.vÞ. 000080
 E8468BE8 46891AC4 83000001 879A006A 686AFC76 FFFE76FF EA76FFEC 76FFEE76 vŸ.v£.vð.v±.v•jhj.......å..FÒ.FÒ 0000A0
 26FC4788 260E5EC4 040E4683 D88E12C8 881E5657 000010C8 C8C95F5E 1F0008E9 Õ...^_èüà...WV.¡ü..Ä.F..å^.£.G=£ 0000C0
 8B260E5E C4020E46 83FA4689 FE478826 0E5EC402 0E4683F8 5689F646 89FE5788 .W±.F-.V½.F..å^.£.G±.F*.F..å^.£. 0000E0
 5EC4040E 4683FE56 89FC4689 FE578826 FC478826 0E5EC404 0E4683F0 4689FE47 G±.FÞ.F..å^.£.G=£.W±.F•.V±.F..å^ 000100
 88025789 26078926 0C56880A 468BF25E C4F45689 F24689FE 578826FC 4788260E .£.G=£.W±.F·.V¶å^·.F..V.£..£.W.¡ 000120
 4788260E 5EC4040E 4683088E 1460881E 56570000 16C8C8C9 5F5E1F00 00E90000 ..Õ...^_èüà...WV.¡'..Ä.F..å^.£.G 000140
 FC5689FA 4689FE57 8826FC47 88260E5E C4040E46 83F25689 F04689FE 578826FC =£.W±.FÞ.V·.F..å^.£.G=£.W±.F*.V= 000160
 12C48300 0015B99A 006A0A76 FF0C76FF 271468F0 76FFF276 FF0E6A50 16F6468D .F-.Pj..v·.vÞh.'.v..v.j..¿....å. 000180
 4680F676 FFF876FF F076FFF2 76FF01B2 E9EE468B 0006E903 7500EE7E 83EE4689 .FŸ.-Ÿ.u.Õ...FŸÕý..v·.vÞ.v½.v-.F 0001A0
 0019E9FE 4688018A E9EE4688 0006E903 7500EE7E 83EE4689 000013BF 9A5016FE ±.P.€....FŸ.-Ÿ.u.Õ...FŸÕ...F±Õ.. 0001C0
 DFE90375 00053D00 13E9016E E99B4B8 001CE900 06F446C7 0024E900 1FF446C7 úF¶..Õ$.úF¶..Õ..¡Ç.Õn.Õ..=..u.ÕÕ 0001E0

Dump of file SATURN:[PCCOMMON.DUMP.DLL]DMLGLOB.TMP;1 on 18-APR-1990 10:44:56.67
File ID (627,22,0)   End of file block 315 / Allocated 316

Virtual block number 214 (00000006), 512 (0200) bytes

 271968F0 76FFF276 FF0E6AF6 76FFF876 FFF476FF FFE4E9FF DFE90375 001830FF .=..u.ÕÕ.Õð..v¶.v½.v-j..v·.vÞh.' 000000
 E99B4B88 0006E903 7500EE7E 83EE4689 14C48300 0015E99A 006A0A76 FF0C76FF .v..v.j..Õ....å..FŸ.-Ÿ.u.Õ..¡Ç.Õ 000020
 10C48300 0016299A 006A0A76 FF0C76FF 271E68F0 76FFF276 FF5016EA 46800122 "..Fð.P.v·.vÞh.'.v..v.j..)....å. 000040
 FF1F6A00 38E90374 EC4608EA 468800F2 E99B4B88 0006E903 7500EE7E 83EE4689 .FŸ.-Ÿ.u.Õ..¡Ç.Õ·..Fð.F$t.ÕB.j.. 000060
 14C48300 0016669A 006A0A76 FF0C76FF 271868F0 76FFF276 FF0E6AFA 76FFFC76 v•.v*j..v·.vÞh.'.v..v.j..f....å. 000080
 FFFC76FF 1B6A5016 F6468000 A9E900B2 E99B4B88 0006E903 7500EE7E 83EE4689 .FŸ.-Ÿ.u.Õ..¡Ç.Õý.Õ·..F-.Pj..v•. 0000A0
 EE468918 C4830000 16A69A00 6AEA76FF EC76FF27 2068F076 FFF276FF 176AFA76 v*j..v·.vÞh '.v£.vðj..!....å..FŸ 0000C0
 FFF876FF 066A0029 E90375F8 460BF646 880075E9 99B4B800 06E90375 00EE7E83 .-Ÿ.u.Õ..¡Ç.Õu..F-.F¾u.Õ;.j..v½. 0000E0
 EE468914 C4830000 13519A00 6A0A76FF 0C76FF27 1868F076 FFF276FF 0E6AF676 v-j..v·.vÞh.'.v..v.j..Q....å..FŸ 000100
 5016F646 80F076FF F276FF0A 76FF0C76 FFFA76FF FC76FFEA 76FFEC76 FF002CE9 Õ,..v£.vð.v•.v*.v..v..v·.vÞ.F-.P 000120
 00B80006 E99B4B88 0006E903 7500EE7E 83EE4689 18C48300 00140A9A 006A746A jtj.......å..FŸ.-Ÿ.u.Õ..¡Ç.Õ..¡. 000140
 5E1F0000 E9085688 06468808 8E14E288 1E565700 0000C8C8 C95F5E1F 0000E900 .Õ...^_èüà...WV.¡à..Ä.F..V.Õ...^ 000160
 6A006A08 14681E01 6A316AFF FF68FFFF 68D88E17 01881E56 57000002 C8C8C95F _èüà..¯WV.¡...Äh..h..j1j..h..j.j 000180
 90C8C95F 5E1F0000 E9FE4688 FE468918 C4830000 FFFF9A00 6A4D6A02 6A006A00 ¯j.j.jMj.......å..F±.F±Õ...^_èü. 0001A0
 000A113A 0203005E 00051529 02030000 00211720 00020283 000A10C1 02030018 ....è...•... .!.....)...^...:... 0001C0
 00081237 02030171 00060C8E 020316F9 00211723 00050256 000810A5 020302C4 å...E...V...#.!.•.../...q...7... 0001E0

Dump of file SA..RN:[PCCOMMON.DUMP.DLL]DMLGLOB.TMP;1 on 18-APR-1990 10:44:56.67
File ID (627,22,0)   End of file block 315 / Allocated 316

Virtual block number 215 (00000007), 512 (0200) bytes

 002C1126 0002017D 00061554 02030208 000A1001 0203007E 00051605 02030264 d...(...-...!...Ä...T...)...&.,. 000000
 000A0A27 020302F7 000A0A44 020302EC 000A0048 02030000 002E1718 00020000 ............H...$...D...%...'... 000020
 000C1114 02030311 000A03D1 02030038 0005173A 02030128 000610F3 02030304 ....#...(...:...8...1........... 000040
 000A09E5 0203023C 0008128A 02030142 000608FC 02030231 0008124D 0203038A ....H...1...•...B.......<...!... 000060
 040E4683 D88EFFFF 881E5657 00000AC8 00000000 00000000 00000000 0000032E .................å...WV.¡...Ä.F.. 000080
 FE578826 FC478826 0E5EC404 0E4683FC 5689FA46 89FE5788 26FC4788 260E5EC4 å^.£.G=£.W±.F*.V=.F..å^.£.G=£.W± 0000A0
 76FFFC76 FF0E6A50 16FE468D FE4689FE 4788260E 5EC4020E 4683F856 89F64689 .F-.V½.F..å^.£.G±.F±.Pj..v•.v 0000C0
 000008C8 C8C95F5E 1F0000E9 12C48300 00FFFF9A 006A0A76 FF0C76FF 271768FA *h.'.v..v.j.......å.Õ...^_èüà... 0000E0
 0E4683FA 5689F846 89FE5788 26FC4788 260E5EC4 040E4683 D88E0008 881E5657 WV.¡...Ä.F..å^.£.G=£.W±.F½.V*.F. 000100
 F876FFFA 76FF0E6A FC76FFFE 76FFFE56 89FC4689 FE578826 FC478826 0E5EC404 .å^.£.G=£.W±.F=.V±.v±.v•j..v*.v½ 000120
 57000000 C8C8C95? 5E1F0000 E912C483 0000005D 9A006A0A 76FF0C76 FF271268 h.'.v..v.j..]....å.Õ...^_èüà...W 000140
 8E000388 1E565700 0002C8C8 C95F5E1F 0000E908 56880646 88D88E00 74881E56 V.¡t..Ä.F..V.Õ...^_èüà..¯WV.¡£... 000160
 0000FFFF 9A006A4E 6A026A00 6A006A00 6A086868 1E016A31 6AFFFF68 FFFF6808 Äh..h..j1j..hh.j.j.j.j.jNj....... 000180
 00F20002 005E0005 008C0203 000590C8 C95F5E1F 0000E9FE 4688FE46 8918C483 .å..F±.F±Õ...^_èü.....Ÿ...^....·. 0001A0
 00000000 00380005 010C0203 0000002E 00ED0002 00C80022 00F50005 00000022 "....%.".ü...Ü...........8..... 0001C0
 5689F846 89FE5788 26FC4788 260E5EC4 040E4683 D88EFFFF 881E5657 00000CC8 å...WV.¡...Ä.F..å^.£.G=£.W±.F½.V 0001E0
```

```
Dump of file SATURN:[PCCOMMON.DUMP.DLL]DMLGLOB.TMP;1 on 18-APR-1990 10:44:56.67
File ID (627,22,0)   End of file block 315 / Allocated 316

Virtual block number 216 (00000008), 512 (0200) bytes

 47BB260E 5EC4040E 4683F656 89F44689 FE578826 FC478826 0E5EC404 0E4683FA •.F..á^.&.G•&.W±.F¶.V-.F..á^.&.G 000000
 FF0C76FF 27D868-8 76FFFA76 FF106AFC 76FFFE76 FFFE5689 FC4689FE 578826FC •&.W±.F•.V±.v±.v•j..v•.v½hÁ'.v.. 000020
 D88E0008 881E5657 000014C8 CBC95F5E 1F0000E9 12C48300 00FFFF9A 006A0A76 v.j.......á.Ö...^_èùà...WV.¡...Á 000040
 FE478826 0E5EC402 0E4683F6 5689F446 89FE5788 26FC4788 260E5EC4 040E4683 .F..á^.&.G•&.W±.F¶.V-.F .á^.&.G± 000060
 FE578826 FC478826 0E5EC404 0E4683FC 4689FE47 88260E5E C4020E46 83FE4689 .F±.F..á^.&.G±.F•.F..á^.&.G•&.W± 000080
 7400FE7E 83FA5689 F84689FE 578826FC 4788260E 5EC4040E 4683F256 89F04689 .FÞ.V·.F..á^.&.G•&.W±.F½.V•.~±.t 0000A0
 76FFF876 FFFA76FF 0000FFFF 9AF876FF FA76FFF0 76FFF276 FF025868 0044E903 .ÒD.hX..v·.vÞ.v•.v½......v•.v½.v 0000C0
 83000001 429A006A 0A76FF0C 76FF271A 68F476FF F676FF10 6A020468 F076FFF2 ·.vÞh..j..v-.v¶h.'.v..v.j..B.... 0000E0
 6A0A76FF 0C76FF27 1868F476 FFF676FF FE76FF50 16EC4680 0062E900 008818C4 á.¡..Öb..F§.P.v±.v-.v¶h.'.v..v.j 000100
 F876FFFA 76FF0030 E90000B8 0006E903 74EE4608 EC468812 C4830000 01709A00 ..)....á..F§.FŸt.Ö..¡..ÖO..v•.v½ 000120
 0000659A 006AEC76 FFEE76FF 271A68F4 76FFF676 FF006A02 0468F076 FFF276FF .v·.vÞh..j..v-.v¶h.'.vŸ.v§j..e.. 000140
 C4040E46 83D88E00 7C881E56 57000012 CBCBC95F 5E1F0000 E90000B8 18C48300 ..á.¡..Ö...^_èùà...WV.¡|..A.F..á 000160
 89FE5788 26FC4788 260E5EC4 040E4683 F85689F6 4689FE57 8826FC47 88260E5E ^.&.G•&.W±.F-.V½.F..á^.&.G•&.W±. 000180
 4689FE47 88260E5E C4020E46 83EE4689 FE478826 0E5EC402 0E4683F2 5689F046 FÞ.V·.F..á^.&.G±.FŸ.F..á^.&.G±.F 0001A0
 EE468800 07C626F0 5EC4FE56 89FC4689 FE578826 FC478826 0E5EC404 0E4683F4 ¶.F..á^.&.G•&.W±.F•.V±á^Þ&ó...FŸ 0001C0
 FF0C76FF 271A68F6 76FFF876 FF006A02 0468F076 FFF276FF 5016FA46 8DFA4689 .F•.F•.P.v·.vÞh..j..v½.v-h.'.v.. 0001E0

Dump of file SATURN:[PCCOMMON.DUMP.DLL]DMLGLOB.TMP;1 on 18-APR-1990 10:44:56.67
File ID (627,22,0)   End of file block 315 / Allocated 316

Virtual block number 217 (00000009), 512 (0200) bytes

 00000283 9AF076FF F276FFF4 76FFFC76 FFFE76FF 18C48300 0001189A 006A0A76 v.j.......á..v±.v•.v¶.v·.vÞ..... 000000
 0000026F 9A5016FA 468DF076 FFF276FF 022368FA 4689EE46 8B0007C6 26F05EC4 á^Þ&ó...FŸ.F•h#..v·.vÞ.F•.P.o... 000020
 FFF276FF F476FFFC 76FFFE76 FF000000 F49A5016 FA468DF0 76FFF276 FF025868 hX..v·.vÞ.F•.P.¶....v±.v•.v¶.v·. 000040
 CBCBC95F 5E1F0000 E90000B8 FA4689EE 468B0007 C626F05E C40000FF FF9AF076 vÞ.....á^Þ&ó...FŸ.F•¡..Ö...^_èùà 000060
 1E565700 0002C8CB C95F5E1F 0000E908 56880646 88D88E01 97881E56 57000000 ...WV.¡...Á.F..V.Ö...^_èùà...¯WV. 000080
 9A006A4F 6A026A00 6A006A00 6A087A68 1E016A31 6AFFFF68 FFFF68D8 8E02A788 ¡Ï..Äh..h..j1j..hz.j.j¯j.j.jOj.. 0000A0
 005E0005 02250203 000790CB C95F5E1F 0000E9FE 4688FE46 8918C483 0000FFFF .....á..F±.F±Ö...^_èù.....%...^. 0000C0
 00380005 02E00203 0000002E 02C10002 00000023 02C60002 02460008 023C0203 ..<...F...6.#.....Ë.......Å...8. 0000E0
 040E4683 D88EFFFF 881E5657 000008C8 029F0023 02C90005 023C0008 025C0203 ..\...<...è.#...à...WV.¡...Ä.F.. 000100
 FE578826 FC478826 0E5EC404 0E4683FE 5689FC46 89FE5788 26FC4788 260E5EC4 á^.&.G•&.W±.F•.V±.F..á^.&.G•&.W± 000120
 04C483FF FF02149A F876FFFA 76FF0A76 FF0C76FF FC76FFFE 76FFFA56 89F84689 .F½.V•.v±.v•.v..v..v•.v½......á. 000140
 8E000888 1E565700 0110C8CB C95F5E1F 0000E900 00FFFF9A F876FFFA 76FF5040 ∂P.v•.v½.....Ö...^_èùà...WV.¡... 000160
 4788260E 5EC4020E 4683F656 89F44689 FE578826 FC478826 0E5EC404 0E468308 Ä.F..á^.&.G•&.W±.F¶.V-.F..á^.&.G 000180
 578826FC 4788260E 5EC4040E 4683FC46 89FE4788 260E5EC4 020E4683 FE4689FE ±.F±.F..á^.&.G±.F•.F..á^.&.G•&.W 0001A0
 86C6FA56 89F84689 FE578826 FC478826 0E5EC404 0E4683FE F29689FE F08689FE ±..Þ±..±.F..á^.&.G•&.W±.F½.V•6. 0001C0
 F286FF00 00FFFF9A 5016FEF4 86800100 680A76FF 0C76FFF4 76FFF676 FF00FEF4 ¶±..v-.v¶.v..v.h....¶±.P......Ñ· 0001E0

Dump of file SATURN:[PCCOMMON.DUMP.DLL]DMLGLOB.TMP;1 on 18-APR-1990 10:44:56.67
File ID (627,22,0)   End of file block 315 / Allocated 316

Virtual block number 218 (0000000A), 512 (0200) bytes

 C95F5E1F 0000E900 00880000 FFFF9AF8 76FFFA76 FF5016FE F4868DFE F086FFFE ±.ÑÞ±..¶±.P.v•.v½.....¡..Ö...^_è 000000
 57000002 C8CBC95F 5E1F0000 E9085688 06468808 8E006D88 1E565700 0000C8CB ùà...WV.¡m..Ä.F..V.Ö...^_èùà..¯W 000020
 6A536A02 6A006A00 6A006A08 92681E01 6A306AFF FF68FFFF 68D88E01 19881E56 V.¡...Äh..h..jOj..h..j.j¯j.j.jSj 000040
 00240138 00020008 90CBC95F 5E1F0000 E9FE4688 FE468918 C4830000 FFFF9A00 .......á..F±.F±Ö...^_èù.....8.$. 000060
 000600E9 02030000 002E0133 00020000 002C0048 00020111 00240138 00050000 ....;.$.....K.,.....3.......Ö... 000080
 00000000 00000231 00080102 02030038 00050152 020301A8 00060059 0203019F ....Y...¨...R...8.......1....... 0000A0
 5689FC46 89FE578. 26FC4788 260E5EC4 040E4683 D88EFFFF 881E5657 000008C8 à...WV.¡...Ä.F..á^.&.G•&.W±.F•.V 0000C0
 C95F5E1F 0000E90. 0088FA56 89F84689 FE578826 FC478826 0E5EC404 0E4683FE ±.F..á^.&.G•&.W±.F½.V•¡..Ö...^_è 0000E0
 89F44689 FE578826 FC478826 0E5EC404 0E468308 8E000888 1E565700 0010C8CB ùà...WV.¡...Ä.F..á^.&.G•&.W±.F¶. 000100
 4683FC46 89FE4788 260E5EC4 020E4683 FE4689FE 4788260E 5EC4020E 4683F656 V-.F..á^.&.G±.F±.F..á^.&.G±.F•.F 000120
 8826FC47 88260E5E C4040E46 83F25689 F04689FE 578826FC 4788260E 5EC4040E ..á^.&.G•&.W±.FÞ.V·.F..á^.&.G•&. 000140
 E9000088 0000FFFF 9AF876FF FA76FFF0 76FFF276 FF027068 FA5689F8 4689FE57 W±.F½.V•hp..v·.vÞ.v•.v½.....¡..Ö 000160
 C95F5E1F 0000E908 56880646 88D88E00 49881E56 57000000 C8CBC95F 5E1F0000 ...^_èùà...WV.¡Ï..Ä.F..V.Ö...^_è 000180
 6A006A00 6A08A468 1E016A31 6AFFFF68 FFFF68D8 8E00CF88 1E565700 0002C8CB ùà..¯WV.¡ü..Äh..h..j1j..hÊ.j.j¯j 0001A0
 000590C8 C95F5E1F 0000E9FE 4688FE46 8918C483 0000FFFF 9A006A50 6A026A00 .j.jPj.......á..F±.F±Ö...^_èù... 0001C0
 00C70025 00F10005 00380005 01080203 0000002E 00E90002 00000025 00EE0002 ..Ÿ.%.....Ö...........8...þ.%.ú. 0001E0
```

```
Dump of file SATURN:[PCCOMMON.DUMP.DLL]DMLGLOB.TMP;1 on 18-APR-1990 10:44:56.67
File ID (627,22,0)   End of file block 315 / Allocated 316

Virtual block number 219 (000000DB), 512 (0200) bytes

040E4683 DBBEFFFF BB1E5657 000008C8 00000000 00000000 023C0008 00880203 ..|...<.........à...WV.|...Ä.F.. 000000
FE578B26 FC478B26 0E5EC404 0E4683FE 5689FC46 89FE578B 26FC478B 260E5EC4 á^.&.G=&.Wt.F•.Vt.F..á^.&.G•&.Wt 000020
0E46830B 8E0008B8 1E565700 0010C8CB C95F5E1F 0000E900 00BBFA56 89FB4689 .F%.V•|..Ö...^_èùà...WV.|...Ä.F. 000040
FE4689FE 478B260E 5EC4020E 4683F656 89F44689 FE578B26 FC478B26 0E5EC404 .á^.&.G•&.Wt.F¶.V-.F..á^.&.Gt.Ft 000060
F04689FE 578B26FC 478B260E 5EC4040E 4683FC46 89FE478B 260E5EC4 020E4683 .F..á^.&.Gt.F•.F..á^.&.G•&.Wt.Fþ 000080
76FFF276 FF020568 FA5689F8 4689FE57 8B26FC47 8B260E5E C4040E46 83F25689 .V·.F..á^.&.G•&.Wt.F%.V•h...v·.v 0000A0
49BB1E56 57000000 C8CBC95F 5E1F0000 E90000BB 0000FFFF 9AF876FF FA76FEF0 þ.v•.v%.....|..Ö...^_èùà...WV.|I 0000C0
FFFF6808 8E00CF8B 1E565700 0002C8CB C95F5E1F 0000E908 56880646 8BD88E00 ..Ä.F..V.Ö...^_èùà...WV.|ü..Ah.. 0000E0
8918C483 0000FFFF 9A006A51 6A026A00 6A006A00 6A08B668 1E016A31 6AFFFF68 h..j1j..hR.j.j.j.j.jQj.......á.. 000100
00000026 00EE0002 00C70026 00F10005 000590C8 C95F5E1F 0000E9FE 468BFE46 Ft.FtÖ...^_èù.....þ.&.ú...Ÿ.&... 000120
00000000 00000000 023C0008 00880203 00380005 01080203 0000002E 00E90002 ..Ö...........8...|...<......... 000140
5689FC46 89FE578B 26FC478B 260E5EC4 040E4683 DBBEFFFF BB1E5657 000008C8 à...WV.|...Ä.F..á^.&.G=&.Wt.F=.V 000160
C95F5E1F 0000E900 C?BBFA56 89FB4689 FE578B26 FC478B26 0E5EC404 0E4683FE t.F..á^.&.G•&.Wt.F%.V•|..Ö...^_è 000180
89F44689 FE578B26 FC478B26 0E5EC404 0E46830B 8E0008B8 1E565700 ^^10C8CB ùà...WV.|...Ä.F..á^.&.G•&.Wt.F¶. 0001A0
4683FC46 89FE478B 260E5EC4 020E4683 FE4689FE 478B260E 5EC4020E 46 ?F656 V-.F..á^.&.Gt.Ft.F..á^.&.Gt.F•.F 0001C0
8B26FC47 8B260E5E C4040E46 83F25689 F04689FE 578B26FC 478B260E 5EC.040E ..á^.&.G•&.Wt.Fþ.V·.F..á^.&.G•&. 0001E0

Dump of file SATURN:[PCCOMMON.DUMP.DLL]DMLGLOB.TMP;1 on 18-APR-1990 10:44:56.67
File ID (627,22,0)   End of file block 315 / Allocated 316

Virtual block number 220 (000000DC), 512 (0200) bytes

E90000B8 0000FFFF 9AF876FF FA76FFF0 76FFF276 FF026E68 FA5689F8 4689FE57 Wt.F%.V•hn..v·.vþ.v•.v%.....|..Ö 000000
C95F5E1F 0000E908 56880646 8BD88E00 49BB1E56 57000000 C8CBC95F 5E1F0000 ...^_èùà...WV.|I..Ä.F..V.Ö...^_è 000020
6A006A00 6A08C868 1E016A31 6AFFFF68 FFFF6808 8E00CF8B 1E565700 0002C8CB ùà...WV.|ü..Ah..h..j1j..hà.j.j.j 000040
000590C8 C95F5E1F 0000E9FE 468BFE46 8918C483 0000FFFF 9A006A52 6A026A00 .j.jRj.......á..Ft.FtÖ...^_èù... 000060
00380005 01080203 0000002E 00E90002 00C70027 00F10005 00000027 00EE0002 ..Ÿ.'.....þ.'.ú...Ö...........8. 000080
040E4683 DBBEFFFF BB1E5657 00005AC8 00000000 00000000 023C0008 00880203 ..|...<.........àZ..WV.|...Ä.F.. 0000A0
FE578B26 FC478B26 0E5EC404 0E4683F6 5689F446 89FE578B 26FC478B 260E5EC4 á^.&.G•&.Wt.F¶.V-.F..á^.&.G=&.Wt 0000C0
FE76FF04 6AFE5689 FC4689FE 578B26FC 478B260E 5EC4040E 4683FA56 89FB4689 .F%.V•.F..á^.&.G•&.Wt.F=.Vtj..vt 0000E0
468914C4 830000FF FF9A006A 0A76FF0C 76FF2718 68F476FF F676FF13 6AFC76FF .v•j..v-.v¶h.'.v..v.j.......á..F 000100
57000060 C8CBC95F 5E1F0000 E90000B8 0006E9A6 46880006 E9037500 A67E83A6 Î.~Î.u.Ö...F|Ö..|..Ö...^_èùà'..W 000120
020E4683 F65689F4 4689FE57 8B26FC47 8B260E5E C4040E46 83D88E00 08BB1E56 V.|...Ä.F..á^.&.G•&.Wt.F¶.V-.F.. 000140
260E5EC4 040E4683 FC4689FE 478B260E 5EC4020E 4683FE46 89FE478B 260E5EC4 á^.&.Gt.Ft.F..á^.&.Gt.F•.F..á^.& 000160
89FB4689 FE578B26 FC478B26 0E5EC404 0E4683F2 5689F046 89FE578B 26FC478B .G=&.Wt.Fþ.V·.F..á^.&.G•&.Wt.F%. 000180
FF000001 499AF876 FFFA76FF F076FFF2 76FF0299 6800EAE9 037400FE 7E83FA56 V•.-t.t.Öõ.h...v·.vþ.v•.v%.I.... 0001A0
6A0A76FF 0C76FF27 1A68F476 FFF676FF 136A0204 68F076FF F276FFF8 76FFFA76 v•.v%.v·.vþh..j..v-.v¶h.'.v..v.j 0001C0
FA76FF00 0001DB9A F876FFFA 76FFF076 FFF276FF 02456818 C4830000 01709A00 ..p....á.hE..v·.vþ.v•.v%.Ü....v• 0001E0

Dump of file SATURN:[PCCOMMON.DUMP.DLL]DMLGLOB.TMP;1 on 18-APR-1990 10:44:56.67
File ID (627,22,0)   End of file block 315 / Allocated 316

Virtual block number 221 (000000DD), 512 (0200) bytes

9A006A0A 76FF0C76 FF271A68 F476FFF6 76FF156A 020468F0 76FFF276 FFF876FF .v%.v·.vþh..j..v-.v¶h.'.v..v.j.. 000000
1A68F476 FFF676FF 166A0204 68F076FF F276FFF8 76FFFA76 FF18C483 0000019A .....á..v•.v%.v·.vþh..j..v-.v¶h. 000020
020468F0 76FFF276 FFF876FF FA76FF18 C4830000 01C49A00 6A0A76FF 0C76FF27 '.v..v.j..á....á..v•.v%.v·.vþh.. 000040
76FF0271 6818C483 000001FF 9A006A0A 76FF0C76 FF271A68 F476FFF6 76FF176A j..v-.v¶h.'.v..v.j.......á.hq..v 000060
F676FFFE 76FF5016 A0468D00 CBE90000 B8000002 209AF876 FFFA76FF F076FFF2 ·.vþ.v•.v%.·...|..Öù..F..P.vt.v- 000080
06E90374 A24608A0 46B812C4 83000002 A39A006A 0A76FF0C 76FF271B 68F476FF .v¶h.'.v..v.j..É....á..F..FÅt.Ö. 0000A0
0002449A F876FFFA 76FFF076 FFF276FF 02506800 48E9FE46 B80099E9 00008800 .|..Ö...FtÖH.hP..v·.vþ.v•.v%.D.. 0000C0
76FF0230 680035E9 0000025B 9AF876FF FA76FFF0 76FFF276 FF026068 004CE900 .Öt.h'..v·.vþ.v•.v%.[...Ö5.h=..v 0000E0
00163DFF DEE90375 00153000 1BE9001E E90000FF FF9AF876 FFFA76FF F076FFF2 ·.vþ.v•.v%.....Ö..Ö..=..u.ÖB.=.. 000100
6A020468 F076FFF2 76FFF876 FFFA76FF 0000E9FF A0E90375 00173DFF BFE90375 u.Öt.=..u.Ö..Ö...v•.v%.v·.vþh..j 000120
0000E900 008818C4 83000000 679A006A A076FFA2 76FF271A 68F476FF F676FF00 ..v-.v¶h.'.vÅ.v.j..g....á.|..Ö.. 000140
FE578B26 FC478B26 0E5EC404 0E46830B 8E00?3B8 1E565700 0062C8CB C95F5E1F .^_èùàb..WV.|...Ä.F..á^.&.G=&.Wt 000160
C4020E46 83A65689 A44689FE 578B26FC 478B260E 5EC4040E 4683F856 89F64689 .F-.V%.F..á^.&.G•&.Wt.FÊ.VÎ.F..á 000180
8B260E5E C4040E46 83A84689 FE478B26 0E5EC402 0E46839E 4689FE47 8B260E5E ^.&.Gt.F..F..á^.&.Gt.F´.F..á^.&. 0001A0
76FF5016 FA468DFA 46899E46 B80007C6 26A45EC4 FE5689FC 4689FE57 8B26FC47 G•&.Wt.F•.Vtá^È&ó...F..F•.F•.P.v 0001C0
83000003 8C9A006A 0A76FF0C 76FF271A 68F676FF F876FF00 6A020468 A476FFA6 Î.vÊh..j..v%.v-h.'.v..v.j....... 0001E0
```

```
Dump of file SATURN:[PCCOMMON.DUMP.DLL]DMLGLOB.TMP;1 on 18-APR-1990 10:44:56.67
File ID (627,22,0)   End of file block 315 / Allocated 316

Virtual block number 222 (000000DE), 512 (0200) bytes

 9E468800 07C626A4 5EC40000 FFFF9AA4 76FFA676 FFA876FF FC76FFFE 76FF18C4 á..v±.v=.v´.vl.vÊ.....á^Ê&6...F. 000000
 00000132 9A006A0A 76FF0C76 FF271B68 F676FFF8 76FF0F6A 5016A046 8DFA4689 .F*.F..Pj..v½.v-h.'.v..v.j..2... 000020
 FFA676FF 9E76FF30 40A8468B FC76FFFE 76FF004E E90375A2 4608A046 8B12C483 .á..F..FÂu.ÕN..v±.v=.F´∂P.v..vl. 000040
 5016A046 8D18C483 000003E2 9A006AA0 76FFA276 FF27E668 F676FFF8 76FFA476 vÊ.v½.v-hl'.vÂ.v.j..ä....á..F..P 000060
 16A0468D FFA7E910 C4830000 04059A00 6AA076FF A276FF27 DA68F676 FFF876FF .v½.v-hÕ'.vÂ.v.j.......á.Õl..F.. 000080
 0BA0468B 12C48300 0004309A 006A0A76 FF0C76FF 271B68F6 76FFF876 FF106A50 Pj..v½.v-h.'.v..v.j..=....á..F.. 0000A0
 76FFF876 FFA476FF A676FF9E 76FF5040 A84688FC 76FFFE76 FF004EE9 0375A246 FÂu.ÕN..v±.v=.F´∂P.v..vl.vÊ.v½.v 0000C0
 68F676FF F876FF50 16A0468D 18C48300 00045B9A 006AA076 FFA276FF 27E668F6 -hl'.vÂ.v.j..[....á..F..P.v½.v-h 0000E0
 899E4688 0007C626 A45EC4FF A7E910C4 83000004 9E9A006A A076FFA2 76FF27DA Õ'.vÂ.v.j.......á.Õl.á^Ê&6...F.. 000100
 FFF876FF 076A5016 AA468D00 00010B9A 5016FA46 8DA476FF A676FF02 2368FA46 F*h#..vl.vÊ.F*.P......F´.Pj..v½. 000120
 5016AA46 8DA476FF A676FF12 C4830000 03489A00 6A0A76FF 0C76FF27 1268F676 v-h.'.v..v.j..K....á..vl.vÊ.F´.P 000140
 5EC40000 03629AA4 76FFA676 FFA876FF FC76FFFE 76FF0000 FFFF9A50 16FA4680 .F*.P......v±.v=.v´.vl.vÊ.b...á^ 000160
 028D881E 56570000 08C8C8C9 5F5E1F00 00E90000 88FA4689 9E468800 07C626A4 Ê&6...F..F*¡..Õ...^ èùà...WV.¡§. 000180
 88260E5E C4040E46 83FA5689 F84689FE 578826FC 4788260E 5EC4040E 4683D88E .Ä.F..á^.&.G=&.W±.F¶.V*.F..á^.&. 0001A0
 0C76FF27 1468F876 FFFA76FF 136AFC76 FFFE76FF FE5689FC 4689FE57 8826FC47 G=&.W±.F=.V±.v±.v=j..v*.v½h.'.v. 0001C0
 8E04EE88 1E565700 000EC8C8 C95F5E1F 0000E912 C4830000 03C49A00 6A0A76FF .v.j..á....á.Õ...^_èùà...WV.¡Ÿ.. 0001E0

Dump of file SATURN:[PCCOMMON.DUMP.DLL]DMLGLOB.TMP;1 on 18-APR-1990 10:44:56.67
File ID (627,22,0)   End of file block 315 / Allocated 316

Virtual block number 223 (000000DF), 512 (0200) bytes

 4788260E 5EC4040E 4683FA56 89F84689 FE578826 FC478826 0E5EC404 0E4683D8 Â.F..á^.&.G=&.W±.F½.V*.F..á^.&.G 000000
 76FF0C76 FF271468 F876FFFA 76FF0F6A 5016FC46 80F65689 F44689FE 578826FC =&.W±.F¶.V-.F=.Pj..v*.v½h.'.v..v 000020
 FC468800 5CE9F246 880J06E9 037500F2 7E83F246 8912C483 000005D2 9A006A0A .j..@....á..F·.~·.u.Õ...F·Õ\..F= 000040
 6AFC76FF FE76FF27 D868F876 FFFA76FF F476FFF6 76FF0F6A 0027E903 75F·4608 .F±u.Õ'.j..v-.v¶.v*.v½hÜ'.v±.v=j 000060
 27D868F8 76FFFA76 FF0F6AF4 76FFF676 FF0024E9 F2468912 C4830000 05F\ \00 ..*....á..F·Õ$..v-.v¶j..v*.v½hÄ' 000080
 08C8C8C9 5F5E1F00 00E9F246 88F24689 12C48300 0005369A 006A0A76 FF0C7.FF .v..v.j..6....á..F·.F·Õ...^_èùà. 0000A0
 83FE5689 FC4689FE 578826FC 4788260E 5EC4040E 4683088E 054D881E 56570000 ..WV.¡M..Ä.F..á^.&.G=&.W±.F=.V±. 0000C0
 76FF146A F876FFFA 76FF026A FA5689F8 4689FE57 8826FC47 88260E5E C4040E46 F..á^.&.G=&.W±.F½.V*j..v*.v½j..v 0000E0
 C8C8C95F 5E1F0000 E914C483 00000594 9A006A0A 76FF0C76 FF271868 FC76FFFE ±.v=h.'.v..v.j.......á.Õ...^_èùà 000100
 1E565700 0002C8C8 C95F5E1F 0000E908 56880646 88088E06 16881E56 57000000 ...WV.¡...Ä.F..V.Õ...^_èùà..¯WV. 000120
 9A006A61 6A026A00 6A006A00 6A080A68 1E016A31 6AFFFF68 FFFF6808 8E0677B8 ¡w..Âh..h..j1j..hÕ.j.j¯j.j.j=j.. 000140
 005E0005 06600203 000890C8 C95F5E1F 0000E9FE 4688FE46 8918C483 0000FFFF .....á..F±.F±Õ...^_èù.....`...^. 000160
 00380005 06800203 0000002E 06910002 00000028 06960002 02460008 04CA0203 ..ò...F.....(.............¯...8. 000180
 00000000 00000000 023C0008 04810203 02310008 04860203 066F0028 06990005 ....(.o...Ñ...1.......<......... 0001A0
 5689FC46 89FE5788 26FC4788 260E5EC4 040E4683 D88EFFFF 881E5657 000008C8 à...WV.¡...Ä.F..á^.&.G=&.W±.F=.V 0001C0
 76FF026A F876FFFA 76FFFA56 89F84689 FE578826 FC478826 0E5EC404 0E4683FE ±.F..á^.&.G=&.W±.F½.V*.v*.v½j..v 0001E0

Dump of file SATURN:[PCCOMMON.DUMP.DLL]DMLGLOB.TMP;1 on 18-APR-1990 10:44:56.67
File ID (627,22,0)   End of file block 315 / Allocated 316

Virtual block number 224 (000000E0), 512 (0200) bytes

 C8C8C95F 5E1F0000 E912C483 0000FFFF 9A006A0A 76FF0C76 FF271268 FC76FFFE ±.v=h.'.v..v.j.......á.Õ...^_èùà 000000
 FA5689F8 4689FE57 8826FC47 88260E5E C4040E46 83088E00 08881E56 5700000A ...WV.¡...Ä.F..á^.&.G=&.W±.F¶.V* 000020
 FA76FF04 6AFC76FF FE76FFFE 5689FC46 89FE5788 26FC4788 260E5EC4 040E4683 .F..á^.&.G=&.W±.F=.V±.v±.v=j..v* 000040
 E9037500 F67E83F6 468912C4 83000000 509A006A 0A76FF0C 76FF2714 68F876FF .v½h.'.v..v.j..P....á..F-.--.u.Õ 000060
 83088E00 67881E56 57000008 C8C8C95F 5E1F0000 E9000088 0006E9F6 46880006 ...F-Õ..¡..Õ...^_èùà...WV.¡g..Ä. 000080
 26FC4788 260E5EC4 040E4683 FA5689F8 4689FE57 8826FC47 88260E5E C4040E46 F..á^.&.G=&.W±.F¶.V*.F..á^.&.G=& 0000A0
 FF0C76FF 271868F8 76FFFA76 FF056AFC 76FFFE76 FF0F6AFE 5689FC46 89FE5788 .W±.F=.V±j..v±.v=j..v*.v½h.'.v.. 0000C0
 D88E0008 881E5657 000008C8 C8C95F5E 1F0000E9 14C48300 0000AF9A 006A0A76 v.j..£....á.Õ...^_èùà...WV.¡Ü..Ä 0000E0
 FC478826 0E5EC404 0E4683FA 5689F846 89FE5788 26FC4788 260E5EC4 040E4683 .F..á^.&.G=&.W±.F¶.V*.F .á^.&.G= 000100
 0C76FF27 1968F876 FFFA76FF 056AFC76 FFFE76FF 0F6AFE56 89FC4689 FE578826 &.W±.F=.V±j..v±.v=j..v*. ½h.'.v. 000120
 8E013C88 1E565700 0062C8C8 C95F5E1F 0000E914 C4830000 01259A00 6A0A76FF .v.j..X....á.Õ...^_èùàb..WV.¡<.. 000140
 4788260E 5EC4020E 4683F656 89F44689 FE578826 FC478826 0E5EC404 0E4683D8 Ä.F..á^.&.G=&.W±.F¶.V-.F..á^.&.G 000160
 578826FC 4788260E 5EC4040E 4683FC46 89FE4788 260E5EC4 020E4683 FE4689FE ±.F±.F..á^.&.G±.F=.F..á^.&.G=&.W 000180
 16F0468D FA5689F8 4689FE57 8826FC47 88260E5E C4040E46 83EC5689 EA4689FE ±.Fõ.V§.F..á^.&.G=&.W±.F½.V*.FÞ. 0001A0
 83EE4689 12C48300 0002509A 006A0A76 FF0C76FF 271468F4 76FFF676 FF036A50 Pj..v-.v¶h.'.v..v.j..P....á..FŸ. 0001C0
 76FF5016 9E468000 96E90000 880006E9 0374F246 0BF0468B 0008E903 7400EE7E -Ÿ.t.Õ...FÞ.F·t.Õ..¡..Õ...F..P.v 0001E0
```

```
Dump of file SATURN:[PCCOMMON.DUMP.DLL]DMLGLOB.TMP;1 on 18-APR-1990 10:44:56.67
File ID (627,22,0)   End of file block 315 / Allocated 316

Virtual block number 225 (000000E1), 512 (0200) bytes

 0002AF9A 50169E46 8D10C483 000002A2 9A006AF0 76FFF276 FF271C68 F476FFF6 -.v¶h.'.v·.vÞj..Å....á..F..P.£.. 000000
 EA76FFEC 76FF0215 68000002 C59AF876 FFFA76FF 50169E46 8DEA76FF EC76FF00 ..vš.võ.F..P.vª.vh.é...h...vš.võ 000020
 6A0A76FF 0C76FF27 1C68F476 FFF676FF 50169E46 8D0000FF FF9AF876 FFFA76FF .vª.vh......F..P.v-.v¶h.'.v..v.j 000040
 76FF5016 9E468uEA 76FFEC76 FF0000FF FF9A5016 9E468D10 C4830000 01869A00 .......á..F..P......vš.võ.F..P.v 000060
 088E019D 881E5657 000000C8 CBC95F5E 1F0000E9 00008800 00FFFF9A F876FFFA ª.vh.....¡..Õ...^_èùà...WV.¡...Å 000080
 FFFF68FF FF68088E 02DC881E 56570000 02C8CBC9 5F5E1F00 00E90856 88064688 .F..V.Õ...^_èùà...WV.¡É..Äh..h.. 0000A0
 88FE4689 18C48300 00FFFF9A 006A606A 026A006A 006A006A 0904681E 016A306A jÒj..h..j.j.j.j.j'j.......á..F±. 0000C0
 02F80002 02640008 025D0203 005E0005 02150203 0008CBC9 5F5E1F00 00E9FE46 F±Õ...^_èù........^...]...d...«. 0000E0
 02FE0005 02310008 02730203 00380005 03150203 0000002E 02F60002 00000029 )......-...........8...s...1...±. 000100
 040E4683 D88EFFFF 881E5657 000106C8 00000000 023C0008 02870203 02D40029 ).Å.......<.....à...WV.¡...Ä.F.. 000120
 260E5EC4 040E4683 020A9789 26020887 89260A5E C4FE5788 26FC4788 260E5EC4 á^.&.G•&.W±á^.&....&.....F..á^.& 000140
 0A5EC4FE 4788260E 5EC4020E 46830657 89260447 89260A5E C4FE5788 26FC4788 .G•&.W±á^.&.G.&.W..F..á^.&.G±á^. 000160
 0A5EC400 00FFFF9A 50520513 050C5688 0A468805 1187FF26 0A5EC405 11878926 &....á^.&.ñ...F..V....RP.....á^. 000180
 00FFFF9A 50520519 050C5688 0A468802 6A000847 C6260A5E C4004E05 1887C726 &ú...N.á^.&6G..j..F..V....RP.... 0001A0
 260A5EC4 0A76FF0C 76FF01EE E9FEFA86 880007E9 037500FE FABE83FE FA868900 ...ª±./ª±.u.Õ....ª±ÕŸ..v..v.á^.& 0001C0
 068E006A 006A003F E9037500 FEFABE83 FEFA8689 06C483FF FF10E39A 051187FF .ñ...D....á...ª±./ª±.u.Õ?.j.j... 0001E0

Dump of file SATURN:[PCCOMMON.DUMP.DLL]DMLGLOB.TMP;1 on 18-APR-1990 10:44:56.67
File ID (627,22,0)   End of file block 315 / Allocated 316

Virtual block number 226 (000000E2), 512 (0200) bytes

 051387FF 260A5EC4 0000013B 9A5016FE FE868000 FF680452 68020236 FF2627D2 @'&.6..hR.h....±±.P.;...á^.&.ñ.. 000000
 6A006A01 6A006A01 88E9FEFA 86880000 01559A00 6A006A50 16FEFE86 8D108168 hŸ...±±.Pj.j..U.....ª±Õ..j.j.j.j 000020
 54680202 36FF2627 02068E00 6A006A00 00FFFF9A 50520000 FFFF9A00 6A036A01 .j.j......RP.....j.j...@'&.6..hT 000040
 5016FEFE 868D1D81 68051387 FF260A5E C4000001 A99A5016 FEFE868D 00FF6804 .h....±±.P.`...á^.&.ñ..hŸ...±±.P 000060
 08C483FF FF00EA9A 50520300 050C5688 0A468809 28681E00 00FFFF9A 006A006A j.j.......h(..F..V....RP.õ....á. 000080
 6A003FE9 03740517 87082605 15878826 0A5EC405 17978926 05158789 260A5EC4 á^.&....&....á^.&....&....t.Õ?.j 0000A0
 6A006A00 00FFFF9A 5016FEFE 868D00FF 68044E68 020236FF 26270206 8E006A00 .j...@'&.6..hN.h....±±.P.....j.j 0000C0
 006800C6 E9000188 0000FFFF 9A206A00 6A006A00 6A5016FE FE868001 6A006A01 .j.j...±±.Pj.j.j.j ......¡..Õ6.h. 0000E0
 00FEFABE 83FEFA86 890CC483 00000254 9A006A06 76FF0876 FF0A76FF 0C76FF64 d.v..v..v..v.j..Ţ....á...ª±./ª±. 000100
 037206FE FCBE83FE FC86FF00 04E90000 FEFC86C7 0098E9FE FA868800 07E90375 u.Õ....ª±Õ..ú.•±..Õ....•±./•±.r. 000120
 FE466802 00FEFC86 690018E9 037219FE 7E83FE46 FF0003E9 0000FE46 C7002FE9 Õ/.úF±..Õ...F±.~±.r.Õ..ÌÑ•±..kF± 000140
 76FF0876 FF0A76FF 0C76FF64 0168FFC3 E9FF0CE9 00052080 C6260A5E C4F00315 ..Þá^.&6.-..ÕÉ.Õù.h.d.v..v..v..v 000160
 0024E9FE FA868800 07E90375 00FEFABE 83FEFA86 890CC483 00000282 9A006A06 .j........á...ª±./ª±.u.Õ....ª±Õ$. 000180
 FA8688FE FA86890C C4830000 FFFF9A00 6A0676FF 0876FF0A 76FF0C76 FF640268 h.d.v..v..v..v.j........á...ª±..ª 0001A0
 FFFF9A05 1987FF26 0A5EC408 8E000888 1E565700 0100C8C8 C95F5E1F 0000E9FE ±Õ...^_èùà...WV.¡...Äá^.&.ñ..... 0001C0
 26270206 8E006A00 6A04C483 02F90010 9A051587 FF260517 87FF260A 5EC40000 ..á^.&.ñ..&.ñ.....ª..á.j.j...@'& 0001E0

Dump of file SATURN:[PCCOMMON.DUMP.DLL]DMLGLOB.TMP;1 on 18-APR-1990 10:44:56.67
File ID (627,22,0)   End of file block 315 / Allocated 316

Virtual block number 227 (000000E3), 512 (0200) bytes

 50520300 050C5688 0A468800 0000E49A 5016FF00 868D00FF 68045068 020236FF .6..hP.h........P.Õ....F..V....RP 000000
 6A5016FF 00868D1D 81680513 87FF260A 5EC408C4 83016801 6E9A5016 FF008680 .....P.n.k..á.á^.&.ñ..hŸ......Pj 000020
 0000011D 9A505200 0001169A 006A016A 016A006A 016A006A 000000FE 9A006A00 .j..±...j.j.j.j.j.j......RP..... 000040
 12051087 C7260A5E C4088E02 A1881E56 57000000 C8CBC95F 5E1F0000 E9000088 ¡..Õ...^_èùà...WV.¡Å..Äá^.&ú.... 000060
 C4000705 2387C726 0A5EC400 14052187 C7260A5E C4000A05 1F87C726 0A5EC400 .á^.&ú.....á^.&ú.!...á^.&ú.#...á 000080
 70C8C8C9 5F5E1F00 00E90000 88001205 2787C726 0A5EC400 05052587 C7260A5E ^.&ú.%...á^.&ú.'...¡..Õ...^_èùàp 0000A0
 C7FF3A96 89FF3886 89051797 88260515 8788260A 5EC4D88E 0343881E 56570001 ..WV.¡C..Äá^.&....&......8...:.ú 0000C0
 5EC45016 FE90868D 00FF3C86 C600FF2E 86C600FE E286C600 FE9086C6 004CFA46 FªL.ó..±.ó.ã±.ó....ó.<.....±.Pá^ 0000E0
 0000042C 9A006A04 77FF2606 77FF260A 5EC4271C 68020887 FF26020A 87FF260A .&.ñ..&.ñ..h.'á^.&.w.&.w.j..,... 000100
 5EC45016 FE0C868D 046FE9FE E0868800 07E90375 00FEE08E 83FEE086 8910C483 .á...Å±./Å±.u.Õ....Å±Õo...É±.Pá^ 000120
 00000469 9A006A04 77FF2606 77FF260A 5EC4271E 68020887 FF26020A 87FF260A .&.ñ..&.ñ..h.'á^.&.w.&.w.j..i... 000140
 5EC45016 FEE2868D 042FE9FE E0868800 07E90375 00FEE08E 83FEE086 8910C483 .á...Å±./Å±.u.Õ....Å±Õ/...ã±.Pá^ 000160
 10C48300 0004C89A 006AFEDC 86FFFEDE 86FF271C 68020887 FF26020A 87FF260A .&.ñ..&.ñ..h.'.Ñß±.ÑÉ±j..à....á. 000180
 0000FFFF 9A5016FF 2E868003 F2E9FEE0 86880007 E9037500 FEE08E83 FEE08689 ..Å±./Å±.u.Õ....Å±Õ·......P..... 0001A0
 87FF260A 5EC45016 FC468003 D2E9FEE0 86880007 E9037500 FEE08E83 FEE08689 ..Å±./Å±.u.Õ....Å±Õ@..F•.Pá^.&.ñ 0001C0
 8910C483 00000505 9A006A04 77FF2606 77FF260A 5EC427E9 68020887 FF26020A ..&.ñ..hÕ'á^.&.w.&.w.j.......á.. 0001E0
```

Dump of file SATURN:[PCCOMMON.DUMP.DLL]DMLGLOB.TMP;1 on 18-APR-1990 10:44:56.67
File ID (627,22,0)   End of file block 315 / Allocated 316

Virtual block number 228 (000000E4), 512 (0200) bytes

260A5EC4 5016FF3C 8680216A 0393E9FE E0868800 07E90375 00FEE08E 83FEE086 .Ât./Ât.u.Õ....ÂtÕ..j!..<..Pá^.& 000000
FEE08689 12C483F0 00FFFF9A 006AFC76 FFFE76FF 271F6802 08B7FF26 020AB7FF .ñ..&.ñ..h.'.vt.v•j.......á...Ât 000020
00053E9A FA76FF50 16AA4680 04B16803 56E9FEE0 86B80007 E9037500 FEE08E83 ./Ât.u.Õ....ÂtÕV.hY..F´.P.v*.>.. 000040
46805016 FF5E8680 5016FEE2 86800000 05739AFA 76FF5016 FF5E8680 04B66800 .hÑ...^..P.v*.s.....ãt.P..^..P.F 000060
FF5016AA 468004B5 6814C483 05A8011E 9AFF3886 FFFF3AB6 FF092A68 1E5016AA ´.P.h*..Ñ:..Ñ8....´..á.hç..F´.P. 000080
86805016 FF2E868C 000005CB 9AFA76FF 5016FF5E 868004B5 68000005 849AFA76 v*.....hç...^..P.v*.ù........P.. 0000A0
6A006A14 C48305B/ 011E9AFF 3886FFFF 3AB6FF09 35681E50 16AA4680 5016FF5E ^..P.F´.P.h5..Ñ:..Ñ8....Ç..á.j.j 0000C0
68000005 DC9AFA76 FF5016AA 468004B3 68F85689 F6468904 C48305E8 043C9A00 ..<.Õ..á..F-.VWh*..F´.P.v*.É...h 0000E0
9A505204 C48305F2 03B89A50 16F64680 00000630 9AFA76FF 5016FF5E 868004B4 Ç...^..P.v*.=....F-.P.¡.´..á.RP. 000100
FF3886FF FF3AB6FF 0942681E 5016AA46 805016FF 5E868050 5204C483 06130302 .....á.RP..^..P.F´.P.h8..Ñ:..Ñ8. 000120
C4830000 06F39A00 6A0676FF 0876FF0A 76FF0C76 FF640568 14C48306 58011E9A ...(..á.h.d.v..v..v..v.j..µ....á 000140
094E681E 5016AA46 805016FF 3C868000 00066C9A FA76FF50 16AA468D 04B7680C .hñ..F´.P.v*.l.....<..P.F´.P.hN. 000160
0000069B 9AFA76FF 5016AA46 8004B868 10C48306 8A011E9A FF3886FF FF3AB6FF .Ñ:..Ñ8.......á.h¡..F´.P.v*..... 000180
6810C483 0683011E 9AFF3886 FFFF3AB6 FF095868 1E5016AA 46805016 FE908680 ...t.P.F´.P.hX..Ñ:..Ñ8....*..á.h 0001A0
FF3886FF FF3AB6FF 0962681E 5016AA46 80000006 C49AFA76 FF5016AA 468004B9 ¿..F´.P.v*.á....F´.P.hb..Ñ:..Ñ8. 0001C0
66681E50 16AA468D 00000706 9AFA76FF 5016AA46 8004BA68 0CC48306 DC011E9A ...É..á.ho..F´.P.v*......F´.P.hf 0001E0

Dump of file SATURN:[PCCOMMON.DUMP.DLL]DMLGLOB.TMP;1 on 18-APR-1990 10:44:56.67
File ID (627,22,0)   End of file block 315 / Allocated 316

Virtual block number 229 (000000E5), 512 (0200) bytes

0676FF08 76FF0A76 FF0C76FF 6405680C C48302C2 011E9AFF 3886FFFF 3AB6FF09 ..Ñ:..Ñ8....ô..á.h.d.v..v..v..v. 000000
16AA468D 006A0000 07389AFA 76FF5016 AA468D04 B8680CC4 83000007 259A006A j..X....á.hE..F´.P.v*.8...j..F´. 000020
8004BC68 14C48300 0001E09A 006A0676 FF0876FF 0A76FF0C 76FF6404 68006A50 Pj.h.d.v..v..v..v.j..Â....á.h¥.. 000040
76FF0A76 FF0C76FF 64046801 6A5016AA 4680006A 0000FFFF 9AFA76FF 5016AA46 F´.P.v*.....j..F´.Pj.h.d.v..v..v 000060
006A0000 05209AFA 76FF5016 AA468D04 B06814C4 83000006 2A9A006A 0676FF08 ..v.j..*....á.h§..F´.P.v*.-...j. 000080
14C48300 0007BB9A 006A0676 FF0876FF 0A76FF0C 76FF6404 68026A50 16AA4680 .F´.Pj.h.d.v..v..v..v.j..£....á. 0000A0
FF0C76FF 64046803 6A5016AA 4680006A 000007CE 9AFA76FF 5016AA46 8004BE68 h/..F´.P.v*.ö...j..F´.Pj.h.d.v.. 0000C0
08009AFA 76FF5016 AA468004 BF6814C4 83000007 ED9A006A 0676FF08 76FF0A76 v..v..v.j..Ù....á.he..F´.P.v*... 0000E0
00081F9A 006A0676 FF0876FF 0A76FF0C 76FF6404 68046A50 16AA468D 006A0000 ..j..F´.Pj.h.d.v..v..v..v.j..... 000100
64046805 6A5016AA 4680006A 0000076A 9AFA76FF 5016AA46 8004C068 14C48300 ..á.hà..F´.P.v*.j...j..F´.Pj.h.d 000120
B7FF260A 5EC4096A 681E14C4 83000008 519A006A 0676FF08 76FF0A76 FF0C76FF .v..v..v..v.j..Q....á..hj.á^.&.ñ 000140
006A0676 FF0876FF 0A76FF0C 76FF6405 6808C483 086C011E 9A0515B7 FF260517 ..&.ñ.....l..á.h.d.v..v..v..v.j. 000160
C4830562 011E9A05 15B7FF26 0517B7FF 260A5EC4 096C681E 0CC48300 0007579A .W....á..hl.á^.&.ñ..&.ñ.....b..á 000180
260A5EC4 096F681E 088E0396 B81E5657 000002C8 CBC95F5E 1F0000E9 00008808 .¡..Õ...^_èùà...WV.¡...Á.ho.á^.& 0001A0
26FE46FF FE4680A 5EC40001 FE46C708 C48308D1 011E9A05 15B7FF26 0517B7FF .ñ..&.ñ.....¡..á.úFt..á^..Ft.Ft& 0001C0
1E9A0515 B7FF2605 17B7FF26 0A5EC409 73681E09 71681E00 20E90377 05188739 9...w.Õ ..hq..hs.á^.&.ñ..&.ñ.... 0001E0

Dump of file SATURN:[PCCOMMON.DUMP.DLL]DMLGLOB.TMP;1 on 18-APR-1990 10:44:56.67
File ID (627,22,0)   End of file block 315 / Allocated 316

Virtual block number 230 (000000E6), 512 (0200) bytes

83083A01 1E9A0515 B7FF2605 17B7FF26 0A5EC409 76681EFF C0E90CC4 8308ED01 .Ù..á.Õë..hv.á^.&.ñ..&.ñ.....:.. 000000
46880000 FE46C708 8E088488 1E565700 0002C8CB C95F5E1F 0000E900 008808C4 á.¡..Õ...^_èùà...WV.¡...ÄúFt...F 000020
83089C01 1E9A0676 FF0876FF 097B681E 0979681E 0019E903 720A463B FE46FFFE t.Ft;F.r.Õ...hy..h(..v..v....... 000040
46FF0003 E90000FE 46C7D88E 0905881E 56570000 02C8CBC9 5F5E1FFF D9E90CC4 á.Õ1..^_èùà...WV.¡...ÄúFt..Õ...F 000060
88260E76 C4FE5E88 008A2606 76C4FE5E 030A5E88 0018E903 72FE4639 0C4688FE t.F.9Ftr.Õ...^..^tâv.&...^tâv.&. 000080
83088E09 42881E56 57000008 C8CBC95F 5E1F0000 C6260E76 C40C5E88 FFDAE900 .ÕÕ..^.áv.&ó...^_èùà...WV.¡B..Á. 0000A0
0372F846 39FE4688 F846FF00 03E90000 F846C7FE 4689FE47 88260E5E C4020E46 F..á^.&.Gt.FtúF%.Õ...F%.Ft9F%r. 0000C0
89FA4689 0520050C 56630A46 03C10302 00F84E69 15052887 68260A5E C4007EE9 Õ~.á^.&k.+..iN%...è.F..V..-..F*. 0000E0
FF0C76FF 640468F8 76FFFA76 FFFC76FF 016A002E E9037500 3F8026FA 5E^'FC56 V=á^*&.?.u.Õ..j..v=.v*.v%h.d.v.. 000100
01F87688 0022E900 07C626FA 5EC414C4 83000007 899A006A 0676FF08 76F1 A76 v..v..v.j.......á.á^*&ó..Õ"..v%i 000120
74E906C4 83FFFF08 FD9A0515 B7FF2605 17B7FF26 0A5EC405 1DB0FF26 0A5EL E6 |á^.&.¯..á^.&.ñ..&.ñ...»....á.Õt 000140
05288788 260A5EC4 D88E0988 B81E5657 00000AC8 CBC95F5E 1F0000E9 000088FF .¡..Õ...^_èùà...WV.¡...Aá^.&..+. 000160
FF0003E9 0000F846 C70000F6 46C700FF E9037219 FE7E83FE 46FF0003 E9FE4689 .FtÕ...Ft¯-t.r.Õ..úF-..úF%..Õ... 000180
7500052D 8880260A 5EC4F003 15FE4668 0200F876 690021E9 037206F8 7E83F846 F%.-%.r.Õ!.iv%..kFt..Þá^.&.¡-..u 0001A0
0000F846 C7008CE9 00008800 06E90374 00F67E83 FFD3E900 01F646C7 0005E903 .Õ..úF-..Õ£..--.t.Õ..¡..Õ¥.úF%.. 0001C0
8880260A 5EC4F003 15FE4668 0200F876 690086E9 037206F8 7E83F846 FF0003E9 Õ...F%.-%.r.Õ..iv%..kFt..Þá^.&.¡ 0001E0

```
Dump of file SATURN:[PCCOMMON.DUMP.DLL]DMLGLOB.TMP;1 on 18-APR-1990 10:44:56.67
File ID (627,22,0)   End of file block 315 / Allocated 316

Virtual block number 231 (000000E7), 512 (0200) bytes

89FA4689 052D050C 5688OA46 03C10315 FE4E6802 00F84669 0048E903 7500052D -..u.ÕH.iF%..kN±..ê.F..V..·..F°. 000000
F89A006A 0676FF08 76FF0A76 FF0C76FF 640468F8 76FFFA76 FFFC76FF 016AFC56 V•j..v•.v°.v%h.d.v..v..v..v.j..« 000020
0A5EC405 1D80FF26 0A5EC4E6 01F8768B 0022E900 07C626FA 5EC414C4 83000009 ....á.á^°&ó..Õ"..v%ÌÌá^.&.¯..á^. 000040
17B7FF26 0A5EC409 7E681EFF 6EE906C4 830A2908 FD9A0515 B7FF2605 17B7FF26 &.ñ..&.ñ...».)..á.Õn..h~.á^.&.ñ. 000060
000004C8 CBC95F5E 1F0000E9 000088FE F5E908C4 83092001 1E9A0515 B7FF2605 .&.ñ.....·...Á.Õ%±¡..Õ...^_èuà... 000080
00388026 FC76881F C426065E C4FC46FF 0003E900 00FC46C7 D88E0A44 881E5657 WV.¡D..ÄúF•..Õ...F•á^.&á..v•&.8. 0000A0
070126FC 4688065E C4000CE9 03752038 8026FC76 881FC426 065EC400 21E90375 u.Õl.á^.&á..v•&.8 u.Õ..á^..F•&.. 0000C0
FF26065E C40045E9 0003E903 74003880 26FC7688 1FC42606 5EC4FFCA E90003E9 Õ..Õb.á^.&á..v•&.8.t.Õ..3£.á^.&. 0000E0
065EC4FC 4EFF0003 E9FC4689 48FE4688 FE468904 C4830859 02149A37 FF260277 w.&.7...Y..á..F±.F±H.F•Õ...H•á^. 000100
000140C6 2634C426 0676C4FC 5E88FFE8 E90003E9 03742038 8026FC76 881FC426 &á..v•&.8 t.Õ..ÕÕ..^•áv.&á&óa.. 000120
46890517 978B2605 15878826 0A5EC408 8E0874B8 1E565700 0016C8C8 C95F5E1F .^_èuà...WV.¡t..Äá^.&....&.....F 000140
578B26FC 478B260E 5EC4040E 4683F646 89FE4788 260E5EC4 020E4683 F25689F0 Þ.V·.F..á^.&.G±.F-.F..á^.&.G•&.W 000160
46800000 E9037503 F67E83FA 4689FE47 88260E5E C4020E46 83EC5689 EA4689FE ±.Fõ.V$.F..á^.&.G±.F°.--.u.Õ...F 000180
76FFEC76 FFF44689 051D8088 260A5EC4 E6D1F676 8804C483 0CE4086C 9A5016EA õ.P.l.õ..á..v-Ìlá^.&.....F¶.v$.v 0001A0
FC4689FE 462BF446 880094E9 0376FE46 39F4468B FE468904 C4830CD3 02149AEA õ...&..á..F±.F¶9F±v.Õ...F¶•F±.F• 0001C0
05158 7FF 260517B7 FF260A5E C4098068 1EEA76FF EC76FF00 33E90375 00FA7E83 .-°.u.Õ3..v$.võ.h..á^.&.ñ..&.ñ.. 0001E0

Dump of file SATURN:[PCCOMMON.DUMP.DLL]DMLGLOB.TMP;1 on 18-APR-1990 10:44:56.67
File ID (627,22,0)   End of file block 315 / Allocated 316

Virtual block number 232 (000000E8), 512 (0200) bytes

01FC468B 004CE9· · C4830CFB 08FD9AF0 76FFF276 FFFC76FF 0CC48300 1A011E9A ......ó..v•.v·.vÞ.».«..á.ÕL..F•l 000000
B7FF260A 5EC409B3 681EEA76 FFEC76FF 06C48300 3308FD9A F076FFF2 76FF50E8 ÒP.v·.vÞ.».3..á..v$.võ.h..á^.&.ñ 000020
F076FFF2 76FF50C1 28E9D1FC 4E88FC46 880CC483 0DE0011E 9A0515B7 FF260517 ..&.ñ.....Å..ó..F•.N•ÌÕ+èP.v·.vÞ 000040
89052887 88260A5E C4F84689 40F476F7 D228FE46 8800C3E9 06C48300 8008FD9A .».¯..á.Õù..F±•Ø¼v¶a.F%á^.&..+.. 000060
020DF676 690040E9 0377EE46 38F84603 05288788 260A5EC4 EE46FF00 03E9EE46 FŸÕ...FŸá^.&..+..F%;FŸw.ÕM.iv~.. 000080
0C56880A 4603C103 15EE4E68 0200F646 6900052D 80C6260A 5EC4F003 15EE4668 kFŸ..Þá^.&ó.·..iF-..kNŸ..è.F..V. 0000A0
093A9AEA 76FFEC76 FF50F466 F7052887 28260A5E C4EE4688 F476FF50 52052005 .-.RP.v¶.FŸá^.&+.+.%f¶P.v$.võ.:. 0000C0
20050C56 880A4603 C1030200 F64E6915 05288768 260A5EC4 FF9DE90C C4830830 =..ó.Õ..á^.&k.+..iN-...ê.F..V..- 0000E0
46691505 28876826 0A5EC40C C48308D8 011E9AF0 76FFF276 FF098668 1E505205 .RP.h...v·.vÞ...Å..á.á^.&kñ+..iF 000100
CBC95F5E 1F0000E9 00008800 07C626EA 5EC40005 2080C626 0A5EC4F0 03020DF6 -...Þá^.&ó.·..á^õ&ó..¡..Õ...^_èù 000120
5689F046 89FE5788 26FC4788 260E5EC4 040E4683 D88E0C1D 881E5657 00023CC8 â<..WV.¡...Å.F..á^.&.G•&.W±.FÞ.V 000140
88D45689 D2468902 0A978826 02088788 260A5EC4 E2468905 19878826 0A5EC4F2 ·á^.&.....Fãá^.&....&.....F•.V&. 000160
FF280968 D276FFD4 76FF5016 FDC48680 FDCE9689 FDCC8689 0008050C 56880A46 F..V......ä»..ö»..á».P.v&.v•h.(. 000180
A8E9D046 880006E9 03750000 7E83D046 8910C483 000003EC 9A006AFD 76FFF276 v·.vÞj..š....á..FÅ.~Å.u.Õ...FÅÕ´ 0001A0
08FDC486 8800000E 9A9A5016 E8468DE2 76FF0000 FFFF9A50 160E4680 E276FF04 ..vã.fñ.P......vâ.FÒ.P.......á». 0001C0
6AFDC486 FFFDC686 FF514168 D276FFD4 76FFDE76 FFE076FF 0048E903 75FDC686 .ó»u.ÕH..vÅ.vñ.v&.v•hAQ.Ñó».Ñá»j 0001E0

Dump of file SATURN:[PCCOMMON.DUMP.DLL]DMLGLOB.TMP;1 on 18-APR-1990 10:44:56.67
File ID (627,22,0)   End of file block 315 / Allocated 316

Virtual block number 233 (000000E9), 512 (0200) bytes

FFFDC686 FF514068 D276FFD4 76FFE876 FFEA76FF D0468910 C4830000 0EF69A00 ..-....á..FÅ.võ.vÕ.v&.v•haQ.Ñó». 000000
76FFEA76 FF000010 FE9AE876 FFEA76FF D0468910 C4830000 0F8F9A00 6AFDC486 Ñá»j.......á..FÅ.võ.vÕ.±....võ.v 000020
9EC40000 052887C7 260A5EC4 03F9E903 74000030 0000110E 9A5016FD C88680E8 Õ..å».P.....=..t.Õ°.á^.&ú.+...á. 000040
039AFDCC B6FFFDCE B6FF026A FDC886FF FDCA86FF D276FFD4 76FF0007 C626FDCC ä»&ó...vå.v•.Ñö».Ñä»j..Ñö».Ñä».. 000060
006A0676 FF0876FF 0A76FF0C 76FF6404 68006AFD CCB6FFFD CE86FF00 6A000012 ...j..Ñö».Ñä»j.h.d.v..v..v..v.j. 000080
FD9A006A F076FFF2 76FF280A 68D276FF D476FF50 16FE4680 14C48300 000FC79A .ú....á..F±.P.vå.v•h.(.v·.vÞj..» 0000A0
FFFDCEB6 FF006A00 00079C9A 020068FD CCB6FFFD CEB6FFFE 76FF10C4 8300000F ....á..v±.Ñö».Ñä»h.......j..Ñö». 0000C0
46C714C4 83000010 229A006A 0676FF08 76FF0A76 FF0C76FF 64046801 6AFDCCB6 Ñä»j.h.d.v..v..v..v.j.."....á.úF 0000E0
76FFD476 FF020468 FDCCB6FF FDCEB6FF 50160646 8D0007C6 26FDCC9E C4020006 •..á.ä»&ó...F•.P.Ñö».Ñä»h...vå.v 000100
026AFDCC B6FFFDCE B6FF006A 16C48300 0010589A 006AF076 FFF276FF 280C6802 •h.(.v·.vÞj..X....á.j..Ñö».Ñä»j. 000120
9EC40200 D646C714 C4830000 10A99A00 6A0676FF 0876FF0A 76FF0C76 FF640468 h.d.v..v..v..v.j..`....á.úF•..á. 000140
FF280868 D276FFD4 76FF0204 68FDCCB6 FFFDCEB6 FF501606 46800007 C626FDCC ä»&ó...F•.P.Ñö».Ñä»h...vå.v•h.(. 000160
D086C604 C4830C76 086C9A50 16FDCC86 8D16C483 00001131 9A006AF0 76FFF276 v·.vÞj..1....á...ä».P.l.v..á.ó.Å 000180
8D006A08 C4830C94 016E9A50 16FD0086 8DFDCC86 FFFDCEB6 FF00FD01 86C620FD » ó.l»..Ñö».Ñä»..Å».P.n....á.j.. 0001A0
14C48300 0010CA9A 006A0676 FF0876FF 0A76FF0C 76FF6404 68036A50 16FD0086 .Å».Pj.h.d.v..v..v..v.j..b....á. 0001C0
C4830000 12249A00 6A0676FF 0876FF0A 76FF0C76 FF640468 046A0989 681E006A j..h..j.h.d.v..v..v..v.j..$....á 0001E0
```

```
Dump of file SATURN:[PCCOMMON.DUMP.DLL]DMLGLOB.TMP;1 on 18-APR-1990 10:44:56.67
File ID (627,22,0)    End of file block 315 / Allocated 316

Virtual block number 234 (000000EA), 512 (0200) bytes

B7FF260A 5EC40008 E9037500 F47E8300 00FFFF9A 5016F446 8D0E76FF E076FF14 ..vÅ.vB.F¶.P......-¶.u.Õ..ó^.&.. 000000
FFFF9A50 16EC46JD DE76FFE0 76FF0000 FFFF9ADE 76FFE076 FF0001D8 46C7052B *.úFÁ...vÁ.vB......vÅ.vB.Fš.P... 000020
006AEC76 FFEE76FF 27106802 76FFD476 FF5016FA 46800185 E9037400 00300000 ..*..t.Õç..F*.P.vå.v@h.'.vŸ.vsj. 000040
76FF066A 5016E446 80FF8BE9 0003E903 7500007E 83004689 10C48300 0011609A .'....ó..FÅ.-Å.u.Õ..ÕE..FÕ.Pj..v 000060
03750000 7E83D046 8912C483 0000118F 9A006AFA 76FFFC76 FF271468 D276FFD4 å.v@h.'.v*.v*j.......ó..FÅ.-Å.u. 000080
789A006A E476FFE6 76FF2714 68D276FF D476FF02 6A5016F6 4680FF8C E90003E9 Õ..Õ...F-.Pj..vå.v@h.'.vl.vÕj..x 0000A0
76FFF876 FFD276FF D476FFFF 5DE90003 E9037500 D07E83D0 468912C4 8300000E ....ó..FÅ.-Å.u.Õ..Õ]..vå.v@.v½.v 0000C0
FDC8868B FF36E900 03E90375 00007E83 D0468900 00FFFF9A 5016DA46 8D0A6AF6 -j..FÕ.P......FÅ.-Å.u.Õ..Õ6...à» 0000E0
FFD476FF 0007C626 FDCC9EC4 00E8E903 740C5639 00F0E903 74DA4639 FDCA968B ..ò»9FÕt.Õÿ.9VÉt.ÕÕ.ó.ä»&ó...vå. 000100
0018E903 7400087E 830000FF FF9AFDCC B6FFFDCE B6FF026A F676FFF8 76FFD276 v@.v½.v-j..Ño».Ña»......-Å.t.Õ.. 000120
CEB6FF00 6A0EC483 00001249 9A006A06 76FF0876 FF0A76FF 0C76FF64 0668056A j.h.d.v..v..v..v.j..l....ó.j..Ñö 000140
14C48300 00080F9A 006A0676 FF0876FF 0A76FF0C 76FF6404 68056AFD CCB6FFFD ».Ña»j.h.d.v..v..v..v.j.......ó. 000160
2B87FF26 0A5EC408 C4831088 011E9A05 1587FF26 05178 7FF 260A5EC4 098A681E .h..ó^.&.ñ..&.ñ........ó.ó^.&..+ 000180
0C76FF64 0668066A 003FE903 75000F6E 8880260A 5EC41505 28876826 0A5EC405 .ó^.&kñ+..ó^.&.in..u.Õ7.j.h.d.v. 0001A0
26051787 FF260A5E C4098C68 1E0EC483 000012FA 9A006A06 76FF0876 FF0A76FF .v..v..v.j..*.....ó..h..ó^.&.ñ..& 0001C0
1EFE33E9 00000846 C7FFAAE9 052887FF 260A5EC4 08C48312 E3011E9A 051587FF .ñ.....D..ó.ó^.&..+.Õ'.úFÁ..Õ3±. 0001E0
```

```
Dump of file SATURN:[PCCOMMON.DUMP.DLL]DMLGLOB.TMP;1 on 18-APR-1990 10:44:56.67
File ID (627,22,0)    End of file block 315 / Allocated 316

Virtual block number 235 (000000EB), 512 (0200) bytes

76FF0C76 FF640768 08C48312 64011E9A 051587FF 26051787 FF260A5E C4098E68 h..ó^.&.ñ..&.ñ.....d..ó.h.d.v..v 000000
0676FF08 76FF0A76 FF0C76FF 6405680C C4830000 13139A00 6A0676FF 0876FF0A ..v..v.j........ó.h.d.v..v..v..v. 000020
FF9AE876 FFEA76FF 0000132F 9ADE76FF E076FFFB EEE90CC4 8300000F 719A006A j..q....ó.ÕŸ«.vÅ.vB./....võ.vÕ.. 000040
800000FA 46C7D88E 0E18881E 56570000 0AC8CBC9 5F5E1F00 00E90000 880000FF ...j..Õ...^_èùà...WV.j...ÁúF*... 000060
77FF2606 77FF260A 5EC42713 68020887 FF26020A B7FF260A 5EC4156A 5016FC46 F*.Pj.ó^.&.ñ..&.ñ..h.'ó^.&.w.&.w 000080
47082607 8826FC5E C4F85689 F64689FE 5688FC46 8812C483 00001388 9A006A04 .j..j.....ó..F*.V±.F-.V½á^*&..&.G 0000A0
FF26FC5E C4272768 020887FF 26020AB7 FF260A5E C45016FA 46800064 E9037502 .u.Õd..F*.Pá^.&.ñ..&.ñ..h''ó^*&. 0000C0
0023E903 7500FA7E 83000847 C6260A5E C410C483 00000ED2 9A006A37 FF260277 w.&.7j..@....ó.ó^.&6G...-*.u.Õ#. 0000E0
0000129C 9A006A06 76FF0876 FF0A76FF 0C76FF64 036837FF 260277FF 26FC5EC4 ó^*&.w.&.7h.d.v..v..v..v.j...... 000100
FFFF9AF6 76FFF876 FF0208B7 FF26020A B7FF260A 5EC4FF80 E904FC46 8310C483 .ó..F*.Õ..ó^.&.ñ..&.ñ...v½.v-... 000120
05085688 0646880B 8E134688 1E565700 0000C8CB C95F5E1F 0000E900 00B80000 ..j..Õ...^_èùà...WV.jF..Ä.F..V.. 000140
016A006A FFFF681^ 6868088E 1425881E 56570000 00C8CBC9 5F5E1F00 00E90002 ..Õ...^_èùã...WV.j%..Áhh.h..j.j. 000160
C95F5E1F 0000E91  C4830000 FFFF9A00 6A7E6A01 6A006A00 6A117868 0990681E .h..h(.j.j.j.j~j........ó.Õ...^_è 000180
10D00203 010A0006 048C0203 005E0005 13740203 0283000A 0F070203 001A90CB ù.........*...t...^.......Õ...Ï. 0001A0
14470002 01F00007 03140203 0348000B 00800203 01710006 140E0203 033B000A ..;.......g.......K.......Þ...G. 0001C0
12870002 00000028 00870002 00880004 01C40103 02D8000A 0F180203 0000002A *..........Á...ó........ñ.+.....ñ. 0001E0
```

```
Dump of file SATURN:[PCCOMMON.DUMP.DLL]DMLGLOB.TMP;1 on 18-APR-1990 10:44:56.67
File ID (627,22,0)    End of file block 315 / Allocated 316

Virtual block number 236 (000000EC), 512 (0200) bytes

02610103 02EC000A 0EA70203 0000002E 14420002 0359000B 02AE0203 0000002C ......Ù...Y...B........Ï...š...Å. 000000
0F4F0203 00A20005 13EC0203 02F7000A 13240203 020E0007 00690203 00900004 ......i........$...¥...š...Å...O. 000020
03250103 02260008 0FA50203 00380005 14620203 1410002A 144A0005 01280006 ..(...J.*.....b...8...E...&...X. 000040
00000000 00000000 00000000 014E0006 11890203 005C0004 032C0103 00580004 ..[.......\...¿...N.............. 000060
1076FF06 76FF0876 FF0014E9 03750846 0806468B D88EFFFF 881E5657 000000C8 å...WV.j...Ä.F..F.u.Õ...v..v..v. 000080
6002149A 0E76FF10 76FF001D E903750C 46080A46 8808C483 003F0184 9A0E76FF .v..Ç.?..ó..F..F.u.Õ...v..v....m 0000A0
0012E903 7400027F 80260E5E C4000DE9 03745CFF 7880260E 5EC4F088 04C48300 ..ó..Þá^.&.x.\t.Õ..ó^.&....t.Õ.. 0000C0
0C76FF00 14E90375 0C46080A 468808C4 83008C01 6E9A0E76 FF1076FF 0902681E .h@..v..v..n....ó..F..F.u.Õ...v. 0000E0
0008881E 56570001 1EC8CBC9 5F5E1F08 C483FFFF 016E9A0E 76FF1076 FF0A76FF .v..v..v..n....ó..^_èùà...WV.j.. 000100
685016FE E2868031 6A5016FE 46800676 FF0876FF FFFFFE46 C70001FA 46C7D88E .ÁúF*..úF±...v..v..F±.Pj1..ã±.Ph 000120
FC46C700 05E90374 899CFC7E 81FC4689 0000FFFF 9A006A00 6A5016FA 46800117 ...F*.Pj.j.......F*.-*..t.Õ..úF* 000140
03E90000 FE46C7D8 8E009E88 1E565700 0002C8CB C95F5E1F 0000E9FC 46880003 ...F*Õ...^_èùà...WV.j...ÁúF±..Õ. 000160
87F6FF2A 188A2606 76C4FE5E 880038E9 03750038 80260676 C4FE5E88 FE46FF00 ..F±.^±év.Ï.8.u.Õ8..^±áv.&..*.-. 000180
88008A26 0676C4FE 5E880009 E9202C00 8A260676 C4FE5E88 000EE903 75020A89 ...u.Õ...^±áv.&...Õ...^±áv.&... 0001A0
56570003 3EC8CBC9 5F5E1F00 00C6260A 76C4FE5E 88FFB6E9 0088260A 76C4FE5E ^±áv.&..ÕÑ..^±áv.&ó...^_èùà>..WV 0001C0
FF9A5016 FEDE8680 146A0E76 FF1076FF 0000FE46 C70001FA 46C7D88E 00F5881E .j%..ÁúF*..úF±...v..v.j...ß±.P.. 0001E0
```

```
Dump of file SATURN:[PCCOMMON.DUMP.DLL]DMLGLOB.TMP;1 on 18-APR-199  10:44:56.67
File ID (627,22,0)   End of file block 315 / Allocated 316

Virtual block number 237 (000000ED), 512 (0200) bytes

 00ED9A50 16FEDE86 8D5016FD DA868D01 C3E986ED B80006E9 03750000 300000FF ...=..u.Õ..¡Ù.Õù...Õ».P..ß±.P.Ù. 000000
 FF0676FF 0876FF00 00FFFF9A 5016FDDA 868D0A76 FF0676FF 0876FF08 C48301F5 %..á..v..v..v...O».P......v..v.. 000020
 FFFF9A50 16FEF286 8D5016FC 468D0000 02A79A00 6A006A00 6A006A01 6E680C76 v.hn.j.j.j.j..Ì....F•.P..'±.P... 000040
 80FFFFF8 46C70CC4 83FFFF00 009A0E76 FF1076FF 0904681E 5016FEF8 868D0000 ....½±.P.hå..v..v.......á.ÚF½... 000060
 CC9A006A 006A5016 FA468D01 17685016 FCC28680 106A5016 F8468D50 16FEF886 .½±.P.F½.Pj...ò•.Ph...F°.Pj.j..ä 000080
 E9037510 FC0686F6 FEDC968C FEDA8689 FCD98680 0098E903 7500FA7E 83000000 ....-°.u.Õ....l•..Ö±..É±-.ø=.u.Õ 0000A0
 681E004D E9037500 003D08C4 83026001 EA9AFEDA B6FFFEDC B6FF0908 681E0069 i..hÁ..ÑÉ±.ÑO±.ð.m..á.=..u.ÕM..h 0000C0
 B6FFFEDC B6FF0031 E9037500 003D08C4 83028B01 EA9AFEDA B6FFFEDC B6FF090B Ú..ÑÉ±.ÑO±.õ....á.=..u.Õ1..ÑÉ±.Ñ 0000E0
 FE6A006A 0161680C 76FF0676 FF0876FF 08C48303 3101849A 5016FD0A 868DFEDA Õ±..Õ».P.Ç.1..á..v..v..v.ha.j.j± 000100
 00FFFF9A 5016FA46 8D011768 5016FCC2 B68DF876 FF000002 EE9A5016 FDDA868D ..Õ».P.Ÿ....v½..ò•.Ph...F°.P.... 000120
 FF0676FF 0876FF00 19E90375 00037F80 260E5EC4 0000FFFF 9AF876FF FF5FE900 .Õ ..v½.....á^.£....u.Õ...v..v.. 000140
 AED1FEF6 86FE000C E941FEF6 86C60000 034D9A09 D0681E00 6A006A01 61680C76 v.ћa.j.j..hi..M...ó.-±AÕ..±.-±lÜ 000160
 F6868A00 34E90374 013C0124 FEF2868A 0044E903 765AFEF6 BE80FEF2 9ED1FEF4 ¶±ì. ±./-±Zv.ÕO...±$.<.t.Õ4...- 000180
 680C76FF 0676FF08 76FF0AC4 83002602 569A5016 FDDA8680 09E0681E 50E42AFE ±°ðP.hÁ...Õ».P.V.£..ó..v..v..v.h 0001A0
 1E565700 0320C8CB C95F5E1F FFA6E900 00FFFF9A 5016FDDA 868DFF6A 006A0161 a.j.j...O».P.....ÕÌ..^_èùà ..WV. 0001C0
 00FFFF9A 5016FCE0 868D0100 680A76FF 0676FF08 76FF0001 FC46C708 8E016288 |b..ÁúF•...v..v..v.h....Á•.P.... 0001E0

Dump of file SATURN:[PCCOMMON.DUMP.DLL]DMLGLOB.TMP;1 on 18-APR-1990 10:44:56.67
File ID (627,22,0)   End of file block 315 / Allocated 316

Virtual block number 238 (000000EE), 512 (0200) bytes

 7400FCE0 8E800000 04509A00 6A006A00 6A006A01 6E680C76 FF0676FF 0876FF00 ..v..v..v.hn.j.j.j.j..]..../Å=.t 000000
 76FF0676 FF0876FF 08C48302 5101B49A 5016FCE0 868D1276 FF1476FF 0028E903 .Õ(..v..v...Á=.P.Ç.Q..á..v..v..v 000020
 009A0E76 FF1076FF 5016FCE0 868D5016 FDE0868D 000001B5 9A5016FC E0868D0A ...Á•.P.ç.....Á».P..Á•.P.v..v... 000040
 17685016 FEE08680 176A5016 FE468D50 16FDE086 8DFFFFFE 46C70CC4 8301A000 ....á.ÚF±....Á».P.F±.Pj...Á±.Ph. 000060
 8CF84689 FEF78680 0062E903 7500FC7E 83000002 1F9A006A 006A5016 FC468D01 ..F•.Pj.j.......-=.u.Õb...½±.F½. 000080
 017F8026 F85EC400 0DE90374 2E3F8026 F85EC400 34E90374 1111FEF4 86F7FA56 V°%.¶±...t.Õ4.á^½£.?.t.Õ..á^½£... 0000A0
 0001CE9A F876FFFA 76FFFE6A 006A0161 680C76FF 0676FF08 76FF001B E9037500 .u.Õ...v..v..v.ha.j.j±.v°.v½.ö.. 0000C0
 02C89AFE 76FFFF95 E9000002 8D9A5016 FC468D01 17685016 FEE08680 FE76FF00 ..v±..Á±.Ph...F•.P.§...Õ...v±.à. 0000E0
 04B50486 9A0C76FF 0E76FF2A 6A088E03 61B81E56 57000164 C8C8C95F 5E1F0000 ...^ èùàd..WV.¡a..Áj°.v..v....ç. 000100
 11E90375 D00806C4 8304F904 869A0C76 FF0E76FF 3F6A0017 E9037400 0806C483 .á..Ãt.Õ..j?.v..v....°..á..Áu.Õ. 000120
 ED9A0C76 FF0E76FF 5016FE9C 868D0A46 8904C483 04E10096 9A0C76FF 0E76FF00 ..v..v....Á..á..F....±.P.v..v..Ù 000140
 006A08C4 83053001 6E9A5016 FE9C8680 09E6681E 0081E90A 468808C4 8303E100 .Á..á..F.ÕŸ..hl....±.P.n.O..á.j. 000160
 0015B800 0005509A 206A006A 1076FF12 76FF5016 FE9C8680 0676FF08 76FF016A j..v..v....±.P.v..v.j.j .P...j.. 000180
 800676FF 0876FF01 6A006A08 C4830565 016E9A50 16FE9C86 8009F868 1E008DE9 Õ§..h«....±.P.n.e..á.j.j..v..v.. 0001A0
 FF0E76FF 2A6A0086 E90015B8 0000FFFF 9A206A00 6A1076FF 1276FF50 16FE9C86 ..±.P.v..v.j.j .....j..Õ..j°.v.. 0001C0
 C48303B3 04869A0C 76FF0E76 FF3F6A00 17E90374 D00806C4 83057C04 869A0C76 v....|..á..Ãt.Õ..j?.v..v....°..á 0001E0

Dump of file SATURN:[PCCOMMON.DUMP.DLL]DMLGLOB.TMP;1 on 18-APR-1990 10:44:56.67
File ID (627,22,0)   End of file block 315 / Allocated 316

Virtual block number 239 (000000EF), 512 (0200) bytes

 00123D00 43E90046 E90A4688 004CE900 01B80052 E9000088 0006E903 75000806 ..Áu.Õ..¡..ÕR.¡..ÕL..F.ÕF.ÕC.=.. 000000
 001530FF D7E9FF32 E9037500 0330FFA8 E9037500 02300013 E90376FF 85E90375 u.Õç.v.Õ..=..u.Õ¨.=..u.Õ2.Õa.=.. 000020
 FFB4E9FF 46E90375 000030FF 4EE90375 00CE30FF 1FE90375 006B30FF 27E90375 u.Õ'.=k.u.Õ..=ö.u.ÕN.=Á.u.ÕF.ÕÇ. 000040
 E90E4688 FC9C8689 FC9E8689 00008808 8E048F88 1E565700 036AC8CB C95F5E1F .^_èùàj..WV.¡...Áj......=...=.F.Õ 000060
 52000006 CD9A006A 036A016A 006A016A 006AA656 89A44689 08568806 46880AA6 Ì..F..V..FÉ.VÌj.j.j.j.j.j..ë...R 000080
 9A0676FF 0876FF( 1 6A1076FF 1276FF00 00FFFF9A 1076FF12 76FF0000 06049A50 P.Å....v..v.......v..v.j..v..v.. 0000A0
 A4468B00 0003CB\. 50520300 05A65688 A4468B01 2E681076 FF1276FF 0000FFFF .....v..v.h...FÉ.VÌ...RP.à....FÉ 0000C0
 88A44688 0CC48306 A1015A9A 1076FF12 76FF0130 68013468 5052020C 05A65688 .VÌ...RPh4.hO..v..v..Z.Á..á..FÉ. 0000E0
 599A1076 FF1276FF 012E6801 32685052 020C05A6 5688A446 88505203 0005A656 VÌ...RP.FÉ.VÌ...RPh2.h...v..v..Y 000100
 00000396 9A006A00 6A010068 006A0143 68012E68 1076FF12 76FF10C4 8304CA03 .ò..á..v..v.h..hC.j.h..j.j...... 000120
 8E006A00 6A09F8E9 0000FFFF 9A505200 00FFFF9A 006A016A 016A006A 016A006A j.j.j.j.j.j......RP... .Õ½.j.j.. 000140
 76FF1276 FF016A00 6A0000FF FF9A5016 AA468D50 6A044F68 020236FF 26270406 .å'£.6..hO.jP.F¨.P.....'.j..v..v 000160
 006A206A 1076FF12 76FF098D E9000005 199A206A 006A006A 006A5016 AA468D10 ..F¨.Pj.j.j.j .....Õ§..v. v.j j. 000180
 7E81000A E9037501 34A87E81 A846890A 468809A5 E90000FF FF9A016A 006A026A j.j.j......ÕE..F..F¨.-¨4.u.Õ...- 0001A0
 76FF1276 FFA65689 A4468900 00FFFF9A 006A1076 FF1276FF 0054E903 740132A8 ¨2.t.ÕT..v..v.j.......FÉ.VÌ.v..v 0001C0
 A876FF10 76FF1276 FFFE4689 00000798 9A006A00 6A006A00 6A016568 A876FF10 ..v¨he.j.j.j.j.......F±.v..v..v¨ 0001E0
```

```
Dump of file SATURN:[PCCOMMON.DUMP.DLL]DMLGLOB.TMP;1 on 18-APR-1990 10:44:56.67
File ID (627,22,0)   End of file block 315 / Allocated 316

Virtual block number 240 (000000F0), 512 (0200) bytes

 E9A8468B 000009F4 9A5016FE A2868D50 520100CA 8100000D D228FE46 88016868 hh..F±+@....ò..RP..Å±.P.¶....F Ö 000000
 868A0015 E903745B FEA28E80 020EE900 03E90375 05A27E83 A246890C 46880200 i..F..FÅ.-Å.u.Õ..ÕR../Å±[t.Õ.... 000020
 868D5052 020C05A6 5688A446 8800FEA4 86C6FEA3 8688FEA4 868AFEA2 8688FEA3 È±..Å±..Ê±..Ê±6.Ê±..FÊ.VÍ...RP.. 000040
 868D5016 FEA2868D FC468900 0008D89A 5016FCA0 868D5016 FDA2868D 5016FEA2 Å±.P..Å».P...•.P.Ü....F=..Å±.P.. 000060
 FFFC76FF 5016FEA2 86800A14 681E0CC4 83082800 009A5016 FDA2868D 5016FCA0 .•.P..Å».P...(..á..h....Å±.P.v•. 000080
 1276FF01 6A006A00 1CE90375 00FC7E83 FC46890E C48308A1 04879A10 76FF1276 v..v....Å..á..F=.~•.u.Õ..j.j..v. 0000A0
 5688A446 885016FD A2?68D02 30E90000 0A009A50 5200000A 069A012E 681076FF .v.h........RP.....Õ=...Å».P.FÊ.V 0000C0
 020C05A6 5688A446 88013068 1076FF12 76FF08C4 83094001 849A5052 0??C05A6 Í...RP.Ç.ã..á..v..v.h0..FÊ.VÍ... 0000E0
 5A9A1076 FF1276FF 01306801 34685052 020C05A6 5688A446 88000009 789.?052 RP.(....FÊ.VÍ...RPh4.h0..v..v..Z 000100
 A4468800 00037D9A 5016FEA2 86800100 68012E68 1076FF12 76FF0CC4 8308.?01 .%..á..v..v.h..h....Å±.P.)....FÊ 000120
 890000FF FF9A5016 FCA0868D 5016FDA2 868D5016 FEA2868D 5052020C 05A6568B .VÍ...RP..Å±.P..Å».P...•.P...... 000140
 0A23681E 0CC48309 1200009A 5016FDA2 868D5016 FCA0868D 5016FEA2 868DFC46 F=..Å±.P...•.P..Å».P......á..h#. 000160
 037500FC 7E83FC46 890EC483 09990487 9A1076FF 1276FFFC 76FF5016 FEA2868D ..Å±.P.v•.v..v.......á..F=.~•.u. 000180
 01EA9A50 52020C05 A65688A4 46885016 FDA2868D 0083E903 7401FC7E 830009E9 Õ...~•.t.Õ°...Å».P.FÊ.VÍ...RP.õ. 0001A0
 849A5052 020C05A6 5688A446 885016FD A2868D00 51E90375 00003D08 C4830961 •..á.=..u.ÕQ...Å».P.FÊ.VÍ...RP.Ç 0001C0
 88000009 AE9A5052 020C05A6 5688A446 88013068 1076FF12 76FF08C4 83049E01 ....á..v..v.h0..FÊ.VÍ...RP.Ù.... 0001E0

Dump of file SATURN:[PCCOMMON.DUMP.DLL]DMLGLOB.TMP;1 on 18-APR-1990 10:44:56.67
File ID (627,22,0)   End of file block 315 / Allocated 316

Virtual block number 241 (000000F1), 512 (0200) bytes

 76FF0CC4 83090701 5A9A1076 FF1276FF 01306801 34685052 020C05A6 5688A446 FÊ.VÍ...RPh4.h0..v..v..Z.•..á..v 000000
 A4468850 52030D05 A65688A4 46880000 0A209A50 16FCA086 80012E68 1076FF12 ..v.h.....•.P.·....FÊ.VÍ...RP.FÊ 000020
 FF0035E9 10C48306 7703599A 1076FF12 76FF012E 68013268 5052020C 05A6568B .VÍ...RPh2.h...v..v..Y.w..á.Õ5.. 000040
 FF1276FF 016A006A 0000068C 9A006A00 6A006A00 6A016E68 01326810 76FF1276 v..v.h2.hn.j.j.j.j..¥...j.j..v.. 000060
 1276FF00 49E90C46 880078E9 007EE900 00FFFF9A 50520000 FFFF9A01 2E681076 v.h........RP.....Õ-.Õ(..f.ÕI..v. 000080
 A2868001 2E681076 FF1276FF 0045E900 000A449A 5016FEA2 8680012E 681076FF .v.h....Å±.P.D...ÕE..v..v.h....Å 0000A0
 0019E900 0007279A 016A006A 016A006A 206A1076 FF1276FF 00000659 9A5016FE ±.P.Y....v..v.j j.j.j.j..'...Õ.. 0000C0
 300013E9 0016E9FF E7E9FF8E E9037500 053DFFAF E9037500 01300013 E90016E9 Õ..Õ..=..u.ÕE.=..u.Õf.ÕÕ.Õ..Õ..= 0000E0
 8E006A00 6A05CCE9 0A468806 3EE90000 E9FD13E9 03750134 30FF90E9 03750132 2.u.Õ..=4.u.Õ.»Õ..Õ>..F.Õä.j.j.. 000100
 76FF1276 FF016A00 6A000006 F39A5016 AA468050 6A044F68 020236FF 26270406 .á'&.6..hO.jP.F¨.P.µ....;j..v..v 000120
 519A006A 1076FF12 76FF05AC E9000007 0F9A206A 006A006A 006A5016 AA468D10 ..F¨.Pj.j.j.j .....Õ¯..v..v.j..Q 000140
 00000889 9A5016FE A2868001 0068012E 681076FF 1276FFA6 5689A446 89000007 ....FÊ.VÍ.v..v.h..h....Å±.P.¿... 000160
 07F19A50 16FCA086 805016FD A2868050 16FEA286 80505202 0C05A656 88A44688 .FÊ.VÍ...RP..Å±.P..Å».P...•.P.þ. 000180
 1E0CC483 08550000 9A5016FD A2868D50 16FCA086 805016FE A2868DFC 46890000 ...F=..Å±.P...•.P..Å».P...U..á.. 0001A0
 FC4688FC 46890EC4 83089004 879A1076 FF1276FF FC76FF50 16FEA286 800A3268 h2...Å±.P.v•.v..v.......á..F=.F= 0001C0
 C40491E9 00000C37 9A505200 000C309A 012E6810 76FF1276 FF016A00 6A0493E9 Õ..j.j..v..v.h...0...RP.7...Õ..á 0001E0

Dump of file SATURN:[PCCOMMON.DUMP.DLL]DMLGLOB.TMP;1 on 18-APR-1990 10:44:56.67
File ID (627,22,0)   End of file block 315 / Allocated 316

Virtual block number 242 (000000F2), 512 (0200) bytes

 83006000 ED9A5016 FEA2868D 5052040E 05A6568B A4468800 01050F87 C726A45E ^Ê&ú......FÊ.VÍ...RP..Å±.P.Ú.'.. 000000
 6A00000C 019A5016 FC96868D 056A0451 68020236 FF2627D4 068E006A 006A08C4 á.j.j...á'&.6..hQ.j....•.P.....j 000020
 FC9C8688 FC9E9689 FC9C8689 06C4830C 4F04869A 5052040E 05A6568B A44688ZE ..FÊ.VÍ...RP...O..á....•...•...• 000040
 5016AA46 80506A04 53680202 36FF2627 04068E00 6A006A00 55E90374 FC9E8608 ...=t.ÕU.j.j...á'&.6..hS.jP.F¨.P 000060
 8900000C 8E9A206A 006A006A 006A5016 AA468001 6A006A01 6A006A00 000C749A .t...j.j.j.j..F¨.Pj.j.j.j ...... 000080
 86FF03D2 E900000C AA9A5052 00000CA3 9A012E68 1076FF12 76FF016A 006AA246 FÅj.j..v..v.h...Ê...RP.¯...Õ@..Ñ 0000A0
 006A006A 0055E903 7500003D 08C4830C EE01EA9A 5016FC96 8680FC9C B6FFFC9E .•.Ñ.•...•.P.õ.Y..á.=..u.ÕU.j.j. 0000C0
 016A006A 016A006A 00000AB3 9A5016AA 4680506A 04536802 0236FF26 27D4068E ..á'&.6..hS.jP.F¨.P.°...j.j.j.j. 0000E0
 681076FF 1276FF01 6A006AA2 46890000 0E659A20 6A006A00 6A006A50 16AA4680 .F¨.Pj.j.j.j .e....FÅj.j..v..v.h 000100
 0618 9A00 6A016A01 6A006A01 6A006A03 5FE90000 0E229A50 5200000E 1B9A012E .......RP."...Õ.j.j.j.j.j.j.... 000120
 037500FC A08E8003 37E90000 FFFF9A01 6A1076FF 1276FF00 0006229A 50520000 ..RP."....v..v.j......Õ7..f.=.u. 000140
 FCA0868D 2A6A0017 E9037400 0806C483 00050486 9A5016FC A086803F 6A002EE9 Õ..j?...=.P......á..Åt.Õ..j°...• 000160
 A4468850 16FDA286 800000FD A086C701 18E90375 D00806C4 83002804 869A5016 .P...•..á..Åu.Õ..ú..»....Å».P.FÊ 000180
 46885016 FDA2868D 0060E903 7500003D 08C48300 4C01EA9A 5052020C 05A6568B .VÍ...RP.õ.L..á.=..u.Õ'...Å».P.F 0001A0
 00ED9A50 16FDA286 805016FE A2868008 C48300B6 01849A50 52020C05 A65688A4 Ê.VÍ...RP.Ç.Ñ..á...Å±.P..Å».P.Ú. 0001C0
 05A6568B A4468800 0000F9A 5016FEA2 86800130 681076FF 1276FF08 C4830093 ...á..v..v.h0...Å±.P.Õ....FÊ.VÍ. 0001E0
```

```
Dump of file SATURN:[PCCOMMON.DUMP.DLL]DMLGLOB.TMP;1 on 18-APR-1990 10:44:56.67
File ID (627,22,0)   End of file block 315 / Allocated 316

Virtual block number 243 (000000F3), 512 (0200) bytes

 E9037400 FCA08E80 0CC4830D CA015A9A 1076FF12 76FF0130 68013468 5052020C ..RPh4.h0..v..v..Z.ò..á../.•.t.Õ 000000
 16FEA286 8D08C483 0E4801B4 9A5016FC A0868D50 52030005 A65688A4 46880019 ...FÊ.VÌ...RP...=.P.Ç.H..á...Å±. 000020
 839A5016 FEA2E680 012E6810 76FF1276 FF08C483 0E0800ED 9A5016FC A0868D50 P...=.P.Ú....á..v..v.h....Å±.P.. 000040
 FF012E68 01326850 52020C05 A65688A4 46885052 030005A6 5688A446 88000008 ....FÊ.VÌ...RP.FÊ.VÌ...RPh2.h... 000060
 52000008 479A012E 681076FF 1276FF01 6A006A10 C4830E37 03599A10 76FF1276 v..v..Y.7..á.j.j..v..v.h...G...R 000080
 0A41681E 08C48308 0000ED9A 5016FEA2 86805016 AA468001 E7E90000 084E9A50 P.N...ÕÓ..F¨.P..Å±.P.Ú....á..hA. 0000A0
 0A66681E 5016AA46 801076FF 1276FF01 6A006A08 C4830869 016E9A50 16AA4680 .F¨.P.n.i..á.j.j..v..v..F¨.P.hf. 0000C0
 5688A446 88000205 0F87C726 A45EC401 5AE90374 00013D00 000ACF9A 116A006A j.j..ú...=..t.ÕZ.á^Ê&ú......FÊ.V 0000E0
 0236FF26 27D4068E 006A006A 08C48308 3A00ED9A 5016FEA2 86805052 040E05A6 Ì...RP..Å±.P.Ú.:..á.j.j...á'&.6. 000100
 869A5052 040E05A6 5688A446 882E6A00 000EF39A 5016FC96 8680056A 04516802 .hQ.j....•.P.µ...j..FÊ.VÌ...RP.. 000120
 8E006A00 6A0055E9 0374FC9E 860BFC9C 868BFC9E 9689FC9C 868906C4 8308CF04 .ü..á....•...•...•...•t.ÒU.j.j.. 000140
 80016A00 6A016A00 6A000008 889A5016 AA468050 6A045368 020236FF 2627D406 .á'&.6..hS.jP.F¨.P.£...j.j.j.j.. 000160
 2E681076 FF1276FF 016A006A A2468900 000C1B9A 206A006A 006A006A 5016AA46 F¯.Pj.j.j.j ......FÅj.j..v..v.h. 000180
 EA9A5016 FC96868D FC9CB6FF FC9EB6FF 00E0E900 0008789A 50520000 08719A01 ..q...RP.x...ÕÅ..Ñ.•.Ñ.•...•.P.õ 0001A0
 506A0453 68020236 FF2627D4 068E006A 006A0055 E9037500 003D08C4 830EC101 .è..á.=..u.ÒU.j.j...á'&.6..hS.jP 0001C0
 9A206A00 6A006A00 6A5016AA 4680016A 006A016A 006A0000 0EAD9A50 16AA4680 .F¨.P.Ú...j.j.j.j..F¯.Pj.j.j.j . 0001E0

Dump of file SATURN:[PCCOMMON.DUMP.DLL]DMLGLOB.TMP;1 on 18-APR-1990 10:44:56.67
File ID (627,22,0)   End of file block 315 / Allocated 316

Virtual block number 244 (000000F4), 512 (0200) bytes

 00000FE0 9A505200 0?0FD99A 012E6810 76FF1276 FF016A00 6AA24689 00000F00 .....FÅj.j..v..v.h...Ì...RP.Å... 000000
 76FF1276 FF000010 4D9A5052 00001046 9A006A01 6A016A00 6A016A00 ?•0060E9 Õm.j.j.j.j.j.j..F...RP.M....v..v 000020
 9A505200 000F229A 012E6810 76FF1276 FF016A00 6A0019E9 0000105A 9A. '6A10 .j..Z...Õ..j.j..v..v.h...".. RP. 000040
 00013DFC DCE90375 C00B001A E9001DE9 00ECE9FF FFBA86E8 880029E9 000. )F29 )...Õ).¡Š.¤..Õš.Õ..Õ...âu.ÕÉ•=.. 000060
 00000ADF 9A006A10 76FF1276 FF006FE9 FFD7E9F8 56E90375 00153DF8 7AE9u375 u.Õz«=..u.ÕV«Õ¤.Õo..v..v.j..Õ... 000080
 6A006A01 6A006A00 03050F87 C726A45E C400040E 87C626A4 5EC4A656 89A44689 .FÊ.VÌ6^Ê&6....á^Ê&ú.....j.j.j.j 0000A0
 21E90000 0CD29A02 6A1076FF 1276FF00 000CC59A 50520000 0CBE9A00 6A016A01 .j.j../...RP.é....v..v.j..•...ÕI 0000C0
 E9FA1CE9 03750135 3DFF9CE9 03750002 3DFA67E9 03750001 30001BE9 001EE900 .Õ..Õ..=..u.Õg'=..u.Õ..=5.u.Õ.°Õ 0000E0
 E90000FF FF9A0676 FF0876FF 0A76FF0C 76FF0E76 FF1076FF 1276FF00 4EE9FFDF Õ.ÕN..v..v..v..v..v..v..v.....Õ 000100
 F656E903 7500293D F623E903 7500223D F9E5E903 7500203D 002BE900 2EE9003A :.Õ..Õ+.= .u.ÕI'=".u.Õ#-=).u.ÕV- 000120
 C95F5E1F 0000E900 008A0000 B8FFB2E9 F532E903 7500383D F666E903 7500303D =0.u.Õf-=;.u.Õ2%Õÿ.¡..¤..Õ...^_è 000140
 6A0676FF 0000FFFF 9A5016F8 46800676 FFD88E05 ED881E56 57000144 C8000ECA ò..àD..WV.¡Ú..Á.v..F%.P......v.j 000160
 00FFFF9A 5016E246 8D5016FE 8E868D06 76FF096A 0000FFFF 9A5016FE 8E868D09 .../±.P.....j..v.../±.P.Fã.P.... 000180
 16FC468D E276FFE4 76FF0251 E9FE8C86 880007E9 037500FE 8C8E83FE 8C868900 ...¥±./¥±.u.Õ....¥±ÕQ..vÕ.vã.F=. 0001A0
 C626085E C4022CE9 FE8C8688 0007E903 7500FE8C 8E83FE8C 86890000 FFFF9A50 P.......¥±./¥±.u.Õ....¥±Õ,.á^.&6 0001C0
 EE468900 0012319A 006A006A 5016F046 80505202 0C050A56 88084688 00020C87 .....F..V....RP.FÞ.Pj.j..Ì....F¥ 0001E0

Dump of file SATURN:[PCCOMMON.DUMP.DLL]DMLGLOB.TMP;1 on 18-APR-1990 10:44:56.67
File ID (627,22,0)   End of file block 315 / Allocated 316

Virtual block number 245 (000000F5), 512 (0200) bytes

 FEBC8689 0000FFFF 9A010168 5052020C 050A5688 08468801 19E90374 10F046F6 -FÞ.t.Õ...F..V....RPh.........¥± 000000
 04F4468A 085EC400 0012559A 5016E646 8D5016F4 46800058 E9037500 FEBC8E83 ./¥±.u.Õ[..F¶.P.FÌ.P.U...á^..F¶. 000020
 88006A01 00F646C7 5C020E87 C626085E C43A0200 87C62608 5EC4020C 87882640 ∂&....á^.&6...:á^.&6...\úF-..j.. 000040
 E986E888 0006E903 7500003D 0000FFFF 9A5016F6 46805052 020F050A 56880846 F..V....RP.F-.P.....=..u.Õ..¡Š.Õ 000060
 88084688 08C4830F 41016E9A 5052020C 050A5688 0846880A 75681E00 9DE90185 ..Õ...hu..F..V....RP.n.A..á..F.. 000080
 09E90374 00EE7E83 EE468900 00FFFF9A 006A006A 5016F046 8D505202 0C050A56 V....RP.FÞ.Pj.j.......F¥.~¥.t.Õ. 0000A0
 04F4468A 085EC400 0001DE9A 5016E646 8D5016F4 46800058 E9037410 F046F600 .-FÞ.t.ÕX..F¶.P.FÌ.P.B...á^..F¶. 0000C0
 88006A01 00F646C7 5C020E87 C626085E C43A0200 87C62608 5EC4020C 87882640 ∂&....á^.&6...:á^.&6...\úF-..j.. 0000E0
 E986E888 0006E903 7500003D 000011F0 9A5016F6 46805052 020F050A 56880846 F..V....RP.F-.P.Þ...=..u.Õ..¡Š.Õ 000100
 9AE276FF E476FF08 C483131F 01849A50 52030005 0A568808 46880A7D 681E00E5 Ì..h)..F..V....RP.Ç....á..vÕ.vã. 000120
 0E8F68F8 76FFFA76 FF016A00 6A0000F2 46C70003 050F87C7 26085EC4 0000FFFF ....á^.&ú.....úF·..j.j..vª.v½h.. 000140
 EC5689EA 46890000 FFFF9A08 76FF0A76 FF012C68 020236FF 2627D406 8EFFFF68 h....á'&.6..h,..v..v.......Fõ.V$ 000160
 4C01849A 5016FEE0 86805052 040E050A 56880846 880000FF FF9AEA76 FFEC76FF .v$.võ......F..V....RP..Å±.P.Ç.L 000180
 46885016 FEE0868D 0040E900 52E90452 88002EE9 050F8788 26085EC4 08C48313 ..á.á^.&....Õ..¡R.ÕR.Õ∂...Å±.P.F 0001A0
 00013D00 18E9002D E9FFFF88 0024E908 C4831217 01849A50 52030D05 0A568808 ..V....RP.Ç....á.Õ$.¡..Õ·.Õ..=.. 0001C0
 4DE90375 01F27E83 FFDCE9FF 8AE90375 00033DFF C8E90377 00023DFF EFE90373 s.Õy.=..w.Õù.=..u.Õ¤.ÕÉ..-·.u.ÕM 0001E0
```

Dump of file SATURN:[PCCOMMON.DUMP.DLL]DMLGLOB.TMP;1 on 18-APR-1990 10:44:56.67
File ID (627,22,0)   End of file block 315 / Allocated 316

Virtual block number 246 (000000F6), 512 (0200) bytes

```
0203007A 000412F6 01030420 000F1108 02030023 CBC95F5E 1F0000E9 000088FF .¡..Õ...^_èù#..................z... 000000
0103007E 00040FC4 010300ED 000612C0 0203007C 00041307 010303B4 0000062D ·...Ç.......|...â...Ú...á...~... 000020
02030017 000212v0 02030087 00040AFC 01030086 00040075 0103007F 00040770 p.......u.......•............... 000040
000203C4 0000017F 02030000 002B120E 00020088 00040F80 010300FA 00061142 B...*...........ß.+.........á... 000060
02030000 002E10EB 000201FB 000710F8 02030013 00040F95 01030000 002C12B4 Ç,...............%...«...Š....... 000080
0005001F 0004101C 7103001E 00040640 01030090 00040F66 01030304 000000B1E ....å...f.......@............... 0000A0
0103003F 0003047E 01030083 0004109B 010303E4 00001198 020305E5 002B12E1 Å.+.|.......Õ.......°...~...?... 0000C0
0103004B 00031179 C1030048 000311B5 01030041 00030473 01030040 0003040B ....@...s...A...ç...H...y...K... 0000E0
0103005B 00040F80 010300C8 0006111D 0203004D 00040F9C 01030045 00040A59 Y...E.......M.......à.......[... 000100
00000000 00000000 00000000 00000000 00000000 00000000 0000005C 00040FB7 ñ...\............................ 000120
0600ADE9 0374400A 47F62600 B7E90375 830A47F6 26065EC4 FFFFBE56 000012C8 à...V/..á^.&-G..u.Õñ.&-G.@t.ÕÙ.. 000140
46891C74 878B060B 6BF9F700 0CB99910 7C200646 88F08B04 C4B3005A 096C9A53 S.l.Z..á..Þ.F.-|..¿..%*kA...t..F 000160
C4830087 14CC9A50 E42A0B47 8A26065E C404C483 006C069A 9A0676FF 0876FFFA *.v..v....l..á.â^.&.G.*ÓP.ä....á 000180
89F2468D 08C48300 AB01849A 5016F046 800A8468 1E617400 FA7EB364 7CC00B02 ..à|d.-*.ta.h...FÞ.P.Ç.¨..á..F·. 0001A0
08C48300 C3016E9A 5016F046 800A8668 1E13745C FE7F8026 FC5EC4FE 568CFC46 F=.V±â^=&..±\t..h...FÞ.P.n.ù..á. 0001C0
197C9A50 16F0468D 08C48300 D014F69A FA76FFFC 76FFFE76 FF0A6AFC 4EFF03EB $..N=j..v±.v=.v*.-.Å..á..FÞ.P.|. 0001E0
```

Dump of file SATURN:[PCCOMMON.DUMP.DLL]DMLGLOB.TMP;1 on 18-APR-1990 10:44:56.67
File ID (627,22,0)   End of file block 315 / Allocated 316

Virtual block number 247 (000000F7), 512 (0200) bytes

```
769A0000 04C890C8 C95EC688 000A47C6 26065EC4 FFFF8E03 74C00B04 C483FFFF ...á..ât./..á^.&6G...ó^èù.à....v 000000
06E09A06 76FF0876 FF0A76FF 0C76FF50 FE76FF18 74D00BFE 5689FC46 89011014 ....F=.V±.Åt..v±P.v..v..v..v..Å. 000020
0876FFFC 568CFA46 890E468D 56570000 08C890C8 C999C02B 9004E80C C4830034 4..á.Š..+à.èù.à...WV.F..F*.V=.v. 000040
9A0676FF 0876FF0A 76FF0C76 FFFA76FF FC76FFF0 8804C483 015207F2 9A0676FF .v..·.R..á..Þ.v=.v*.v..v..v..v.. 000060
8855C8C9 5F5EC788 06C48300 F108C89A 560676FF 0876FFF8 880CC483 016309F2 ·.c..á..%.v...v.V.à.þ..á..ú^_èùU. 000080
8CF92BD1 F7AEF2FF FFB90A7E C4FF758D AEF2FFFF B9C03306 7EC41EDE 8BD78BEC $.m.ß.á-.3â¿.. Ù.u.á~.¿..·Ú%I+*. 0000A0
1FFA8BF3 8BA4F3C9 13A5F3E9 D149A402 740001C6 F706468B FEB70846 8ED88EC0 â.Ä.F..±.F.%ó..t.Ê|IÕµÊ.èµÊ.µ.*. 0000C0
7EC4D1F7 AEF2FFFF B9C033C0 8ED88CFE 880A76C5 1EDE8BD7 8BEC8B55 CB5DC28C .ô]ùU.$.m.ß.év..±.Å.â3â¿..·Ú%lá- 0000E0
8B078BEC 8B55CB5D C28C1FFA 8BF38BA4 F3C913A5 F3E90149 A4027401 A8C78B06 ..ú´.t.Ê|IÕµÊ.èµÊ.µ.*..ô]ùU.$.m. 000100
8BF38B1F FFFF10C0 180574A6 F3F92BD1 F7AEF2FF FFB9C033 0A7EC406 76C51EDE ß.év.á~.3â¿..·Ú%l+*µ!t..á.....µ. 000120
57EC8B55 00CB5DFA 8B914901 F7AEF2FF FFB9C033 067EC4D7 8BEC8B55 00CB5DFA *)ù.U.$.mâ-.3â¿..·Ú%ll..*)ù.U.$W 000140
1FC28CC3 8BAAF3C0 32F8E2AA 0374C00A AC0CE30E 4E8B0F8B 0A76C506 7EC41E56 V.á-.év..Ô.N.D.¯.ât.¨ê½2âµ¨.ù.ô. 000160
5EC4FE56 8CFC4689 0E468DFA 568CF846 89EC468D 56570000 16C8CB5D E58B5F5E ^ .|]ùà...WV.F$.F%.V*.F..F=.V±á^ 000180
FF0447C7 26025789 26078926 08578926 06478926 08568B06 4688420A 47C626F8 ¥&6G.B.F..V.&.G.&.W.&..&.W.&ùG.. 0001A0
1278044F FF26F85E C4F08B0C C48302CB 09F29A53 060A76FF 0C76FFFC 760 '67F ...v=.v..v..S.·.ù..á..Þá^¥&.O.x. 0001C0
06C48301 3605249A 006A53FA 76FF900F EB058826 02478E26 07FF263F 8B26 '2A *â&.7&..&.G.&..Š...v*Sj..$.6..á. 0001E0
```

Dump of file SATURN:[PCCOMMON.DUMP.DLL]DMLGLOB.TMP;1 on 18-APR-1990 10:44:56.67
File ID (627,22,0)   End of file block 315 / Allocated 316

Virtual block number 248 (000000F8), 512 (0200) bytes

```
8B460488 3004F9F7 000AB999 C78B047E 8B06768B 56570000 00C8C8C9 5F5EC68B .ó^_èùà...WV.v..~..ú.¿..%*.0..F. 000000
8B26065E C408BABE 56570000 08C80004 C2C95F5E C6884614 8830C280 F9F799C7 ú.%Ī.ó0..F.ó^_èõ..à...WV/..á^.&. 000020
8BD08BF8 7E8BC92B FA4689C2 03E00100 88084788 26F84689 C203E001 D08B0C47 G..ÀIÀ.ö.F%&.Č..ÀIÀ.ö.F*+è.-%.À. 000040
5605C683 FC4E89E6 7C03F983 46410444 880C3087 8AD9030A 8B04880C 1A818AD9 ).......Ö.)..O..O.AF.*.||.N=.ó.V 000060
26065EC4 5646F08B FF6EE804 77FF2606 5EC45646 F08BFF7C E80677FF 26065EC4 á^.&.w.Ò|..ÞFVá^.&.w.Òn..ÞFVá^.& 000080
B9990A47 8B26065E C45646F0 8BFF53E8 37FF2606 5EC45646 F08BFF60 E80277FF .w.Ò'..ÞFVá^.&.7ÒS..ÞFVá^.&.G..¿ 0000A0
B8FF27E8 52F9F700 64B9990A 47BB2606 5EC456F0 8BFF3BE8 50001305 F9F70064 d.%*...PÒ;..ÞVá^.&.G..¿d.%*RÒ'.¡ 0000C0
1B0C0C06 2B0257B8 26078B26 065EC403 E116CA9A 000008C8 CBC95F5E DABC08BA ...Ö^_èùà....ò.Å.á^.&..&.W.+.... 0000E0
0675000B FE5689FC 468904C4 83040615 129A5016 F8468DFA 5689F846 890C0E16 ....F%.V*.F%.P......ó..F=.V±.Åu. 000100
812574C0 0804C483 042017A4 9AFC76FF FE76FF37 74000C10 3E839045 EB99C02B +â.ŠE..>...t7.v±.v=.Ê. ..á..âtX. 000120
C726FC5E C4FE5689 FC468904 C48302A0 15129A50 16F84680 00FA5683 0E10F846 F%...V*..F%.P......á..F=.V±á^=&ú 000140
468A0084 0000FFFF 9A5016F4 46800CEC 83EC8B55 CBC9FE56 88FC4688 00011047 G....F=.V±èùU.$.$..F¶.P.....Ç..F 000160
C48303BF 18729A50 078C2DFA 468B50F9 468A50F8 468A50F4 468A50F5 468A50F6 -P.F%P.F¶P.F%P.F*P.F*-¥.P.r.¢..á 000180
330F8B06 7EC457EC 8B5500C8 5DE58B07 89260257 8926065E C40A7400 087E830C ..~..t.á^.&.W.&...|]ù.U.$Wá~..Ó3 0001A0
8B5FC28C C78BC78E FF330474 0538264F AEF2F8B8 0A468AD9 F741AEF2 FFFFB9C0 â¿..·ÙA%).F..«·ÙD&8.t.3..ú.ú.ò_. 0001C0
C22BD2F7 D78B48C1 880A7EC4 0676C556 571E4FE3 0E4E8BC0 33EC8B55 00CB5DE5 |]ù.U.$3â.N.DO.WVév.á-..êH.m%Ø÷ò 0001E0
```

```
Dump of file SATURN:[PCCOMMON.DUMP.DLL]DMLGLOB.TMP;1 on 18-APR-1990 10:44:56.67
File ID (627,22,0)   End of file block 315 / Allocated 316

Virtual block number 249 (000000F9), 512 (0200) bytes

75F60B10 E3911B75 A6F3C12B 9140C203 C3230B18 C22BD2F7 D68BC203 C3230B18 .UWú.ô.øX@+ô.UWú.ôə.+êµlu..D..-u 000000
56CB5D1F 5F5EFFFF 1DC01BC2 EBC08E04 F405C08C CB75FF08 D88EFFFF 05D88C07 ..Á....Ä..uù.ê.¶..êSô.ê...^_.]ùV 000020
478A260B 5EC45657 000008C8 00CB5E5F A5F3000A B90B04BF 08A48EC0 8ED88C57 W.Á.â/Ê.«ê.¿..µÊ_^ù.ê...WVá^.&.G 000040
26F84689 1C700^E0 D1C103E0 D1C88BF9 F7000CB9 99107C2D C38BFA46 89E42A08 .*ô.F*.ù-|..¿..X¯.âIÁ.èIÁ.p..F%& 000060
26085EC4 90012BE9 FFFFB820 0A4F8026 085EC40F 74400A47 F6260774 830A47F6 -G..t.&-G.ət.á^.&.O. ¡..Ö+..á^.& 000080
C02BEF0A 67802602 0A4F8026 90E2E800 000447C7 26200A4F 80260E74 010A47F6 -G..t.&.O. &úG...Sã.&.O..&.g.ý+â 0000A0
87F60608 68F9F7\ ' 0C899910 7C20C388 4C750C0A 47F626FC 7689F088 04478926 &.G..Þ.v•&-G..uL.ù-|..¿..X'kÁ.-. 0000C0
75FFFF0A 7E8116r> 1094087E 810E7405 CD0A7E81 07751088 087E8137 75011C70 p..u7.-...u..-.ë.t..-...u..-...u 0000E0
26085EC4 04C4831B E7E80876 FF0A76FF 0C75C008 02C48306 40286E9A FA76FF0F ..v*.n(ə..á..âu..v..v.ÔÔ..á.á^.& 000100
88260B5E 88677401 1C7087F6 06D86BF9 F7000CB9 99107C2D C3881575 080A47F6 -G..u..ù-|..¿..X'kÁ.-.p..tg.^.&. 000120
04478926 48024588 F87E8802 57892607 89264008 57882606 47882606 77282637 7&+w.&.G.&.W.ə&..&.W..-%.E.H&.G. 000140
0587F6FA 5E8819E8 FC468908 C483065E 24569AFA 76FF0677 FF265256 167EF608 .-~.VR&.w...v*.V$^..á..F•S..^*-.. 000160
07882606 468A065F C426085E C408C483 0681225A 9A53006A 006A026A 0F742023 # t.j.j.j.S.Z"...á.á^.&á_..F.&.. 000180
CCE90374 FC7639FC 468908C4 83046C24 569AFA76 FF501606 46805600 018E17E8 Š./..V.F..P.v*.V$l..á..F=9v•t.Ôä 0001A0
262E7408 0A47F626 3574830A 47F62606 5EC40000 00C8C8C9 5F5EE42A 06468AFE ±.F.*ô^_èùâ...á^.&-G..t5&-G..t.& 0001C0
57892607 892699C0 2BF70A67 8026065E C404C483 05D725E4 9A0677FF 260877FF .w.&.w.¯ôX=..á.á^.&.g.X•á.&..&.W 0001E0

Dump of file SATURN:[PCCOMMON.DUMP.DLL]DMLGLOB.TMP;1 on 18-APR-1990 10:44:56.67
File ID (627,22,0)   End of file block 315 / Allocated 316

Virtual block number 250 (000000FA), 512 (0200) bytes

74006130 98078A26 0A5EC456 00000AC8 90C8C904 47892608 57892606 47892602 .&.G.&.W.&.G.èù.à...Vá^.&...=a.t 000000
01BE9022 E8000189 01FC46C6 F6289000 EEE999C0 28137400 77300C74 00723027 '=r.t.=w.t.+à.ÔY..+-óF•.¿..$".f. 000020
FF80FC46 C6FEE683 3002CE81 43750002 C6F790F4 EB01098E 90F1E802 FC46C603 .óF=.Sp./..S¶.%ó..uC.ö...|±óF•.. 000040
00743D13 74006230 06740028 3098078A 263374C9 08377400 3F80260A 5EC40A46 F.á^.&.?.t7.èt3&...=+.t=b.t.=t. 000060
8000CE81 90C4E8C9 280574C0 00A9C688 9000E840 00CE810E 75C000A9 C6881575 u..ó`.áu..ö.əSÁ..ó`.ât.+èSá..ö.. 000080
6AE9037D C008FA46 8908C483 068A2298 9A0676FF 0876FF56 01A468FE 4E8980EB S§.N±hÊ.V.v..v..."o..á..F*.á).Ôj 0000A0
C103E001 C888F9F7 000C8999 107C20C3 88227206 FF0A4788 26FC468A 0E5EC4FF .á^..F=&.G...r".ù-|..¿..X'.âIÁ.è 0000C0
88000004 47C7F85E 88044789 260E5E88 980788F8 5E88C02A F846891C 7005E001 IÁ.p..F%*ä.^%....^.&.G..^YàG.... 0000E0
5EC28CC3 88084788 26FA468A 08578926 06478926 02578926 07892699 C0280E5E ^.+á.&..&.W.&.G.&.W..F*&.G..ù.ô^ 000100
13E80000 FE46C707 75081A08 7E810E75 1088067E 81227206 FF560000 04C8C8C9 èùâ...V..r".-...u..-...u.úF±..Š. 000120
20C38815 750C0A47 F626065E C40001FE 46C72475 058F087E 81287510 94067E81 .~...u+.-.e.u$úF±..á^.&-G..u..ù- 000140
C68102E6 C1FE7688 90907EEB C0280674 011C7087 F6060868 F9F7000C 8999107C |..¿..X'kÁ.-.p..t.+àS-...v±è|..ó 000160
06468805 74000802 54890489 02C48309 0525F99A 02006814 7502440B 04880888 ¡....D.u.h...*X...á....T..Àt(.F. 000180
02E6C1FE 7688065E C4FC4689 1C7005E0 D1C103E0 D1C888F9 F7000C89 99107C2D -|..¿..X'.âIÁ.èIÁ.p..F•á^..v±è|. 0001A0
02448902 0088FC76 88025789 26078926 08578926 06478926 088A9488 08888488 ..¡...o.&.G.&.W.&..&.W..v•¡...D. 0001C0
20084688 000004C8 90C8C95E 00018802 0A4F8026 065E8811 07C6DE88 04478926 &.G..86...^.&.O..¡..^èù.à....F.- 0001E0

Dump of file SATURN:[PCCOMMON.DUMP.DLL]DMLGLOB.TMP;1 on 18-APR-1990 10:44:56.67
File ID (627,22,0)   End of file block 315 / Allocated 316

Virtual block number 251 (000000FB), 512 (0200) bytes

C4517400 067E83FE 5E8CFC46 891C7005 E001C103 E001C888 F9F7000C 8999107C |..¿..X*.âIÁ.èIÁ.p..F•.^±.~..tQá 000000
76FF5C74 C00802C4 83091728 6E9A50E4 2A08478A 26085EC4 72741007 F626FC5E ^•&-..trá^.&.G.*ôP.n(...á..ât\.v 000020
2699C028 085EC400 000247C7 260007C6 26FC5EC4 04C48309 56096C9A 0876FF0A ..v..l.V..á.á^•&ó..&úG...á^.+à.& 000040
08478A26 085EC421 741007F6 26FC5EC4 2AE80857 89260647 89260257 89260789 ..&.W.&.G.&.W.$*á^=&-..tlá^.&.G. 000060
000004C8 C8C90782 096C9A08 76FF0A76 FF0874C0 0802C483 0968286E 9A50E42A *ôP.n(h..á..ât..v..v..l...èùà... 000080
000C8999 107C2DC3 88157508 0A47F626 5575023C 03240A47 8A26065E C4F62856 V+-á^.&.G.$.<.uU&-G..u..ù-|..¿.. 0000A0
FF265028 7EC00BFC 46890647 28260788 26065E88 3974011C 7087F606 D868F9F7 %*kÄ.-.p..t9.^.&..&+G..F•.ä-(P&. 0000C0
4F802606 5EC40874 FC463808 C483085F 24569A50 E42A0847 8A260677 FF260877 w.&.w.&.G.*ôP.V$ ..á.;F•t.á^.&.O 0000E0
5EC68800 000447C7 26U25789 26078926 08578826 06478826 065EC4FF FF8E200A . f..á^.&.G.&.W.&..&.W.&úG....ó^ 000100
2954A310 56880E46 88296616 8C2964A3 296A8809 C031BC9A 000A88EC 8W.'C8C9 èùU.&¡...¥1á.¡j)Èd)..f).F..V.ÈT) 000120
0380E900 00295E06 C7000029 6006C729 3C168929 3AA30856 88064688 295c 589 ..V).F..V.È:)..<)ú.')..ú.^)..Õ.. 000140
295AA329 42A3295C A32940A3 2944A3C0 28000129 6206C703 08E90374 25F67.80 .--Xt.Õ..ú.b)..+àÈD)Èə)È\)È8)ÈZ) 000160
C70A46FF 49753001 7F80260A 5EC40020 2ACA06C7 2952A329 38A3293E A32958A3 ÈX)È>)È8)ÈR)ú.ô* .á^.&...0ul.F.ú 000180
80269028 E8000029 5806C729 4406FF00 75283F80 260A5E88 903EE800 302ACA06 .ô*0.Š>..^.&.?+u...D)ú.X)..Š(.&. 0001A0
75203F80 260A5EC4 00E82938 06FF9014 E8295806 FF1A7500 29443E83 0E75203F ? u..>D).u...X)Š....8)Š.á^.&.?-u 0001C0
76FF0C76 FFD075C0 0802C483 0978E80E 5098078A 260A5E88 0A46FF29 5206FFC7 ú..R).F..^.&...P.Õx..á..âui.v..v 0001E0
```

```
Dump of file SATURN:[PCCOMMON.DUMP.DLL]DMLGLOB.TMP;1 on 18-APR-1990 10:44:56.67
File ID (627,22,0)   End of file block 315 / Allocated 316

Virtual block number 252 (000000FC), 512 (0200) bytes

 2968A129 5206FF0C 7D002968 3E830C56 890A4689 08C48308 C7E80E29 68681E0A ..hh).Òú..á..F..V..>h).)...R)Àh) 000000
 2E3F8026 0A5EC400 202ACA06 C7067530 2ACA3E83 00740029 523E8329 68A3D8F7 %AÊh).>R).t..>ò*0u.ú.ò* .á^.&.?. 000020
 3E830C56 890A4689 08C48308 7BE80E29 62681E0A 76FF060A 46FF295A 06FF2D75 u-..Z).F...v..hb).Ò(..á..F..V..> 000040
 4074004E 3D3D7400 463D9807 8A260A5E C4295A0E FF000129 6206C70A 7D002962 b).).ú.b)....Z)á^.&...=F.t==N.t@ 000060
 03754C3F 80260A5E C4097500 29423E83 00022942 06C70675 006C302B 7400683D =h.t+=(.u.ú.B)...>B).u.á^.&.7Lu. 000080
 D0E80010 294206C7 D8E80001 294206C7 90024EE9 1C75003F 80260A5E C40A46FF .F.á^.&.?.u.ÒN..ú.B)..$Aú.B)..$À 0000A0
 06FF0875 00583D05 74004730 0A740045 30F84689 98078A26 C8E80008 294206C7 ú.B)..$à&....F½=E.t.=G.t.=X.u... 0000C0
 0152E903 7E013FE9 03750063 300191E9 037E7874 00693DF8 468820F8 46832940 @).F½ .F½=i.tx-.Ò..=c.u.Ò?.-.ÒR. 0000E0
 07892629 5EA11FC4 2629541E C4157502 29423E83 900159E9 0140E903 7500253D =%.u.Ò@.ÒY...>B).u.á.T)&á.À^)&.. 000100
 75002960 3E830429 54068307 8926295E A11FC426 29541EC4 00E80000 0247C726 &úG...$.á.T)&á.À^)&....T)..>').u 000120
 E9FFFFB8 01AFE903 75200A47 F626293A 1EC401BD E9037400 295E3E83 0170E903 .Òp..>^).t.Ò§.á.:)&-G. u.ÒE.¡..Ò 000140
 293E06FF F2E8086A 90C3E802 C483019E E80E0A6A 00002938 06C7295C 06FF01AC ^...\)ú.B)..j..Ò...á.$ú.j.$ ..>) 000160
 287A7401 29423E83 0081E903 75082942 3E830004 296206C7 295A06FF 294006FF ..@)..Z)ú.b)...>B).u.Ò...>B).t±+ 000180
 00002968 06C70A74 0029523E 83FA4689 2968A128 74296806 39FA4689 2942A3C0 àÉB).F*9.h)t(Àh).F*.>R).t.ú.h).. 0001A0
 0130E80E 106A0229 54068329 68A3C028 027DC008 2968A105 29682E83 909013E8 $.....h).Àh).à).+àÉh)..T).j..Ò0. 0001C0
 A300052D FA468815 74002952 3E832274 00FA7E83 02C48304 8DE80E3A 6A02C483 .á.j:.Ò...á..-*.t".>R).t..F*-..È 0001E0

Dump of file SATUPN:[PCCOMMON.DUMP.DLL]DMLGLOB.TMP;1 on 18-APR-1990 10:44:56.67
File ID (627,22,0    End of file block 315 / Allocated 316

Virtual block number 253 (000000FD), 512 (0200) bytes

 8300F1E8 0E106A04 29542E83 00002968 06C79007 E82968A3 C028027D C0082968 h).á).+àÉh)$..ú.h)....T).j..Òp.. 000000
 76FFF4EB 016A90FF 39E9026E E80E006A 90FF3FE9 106AFF10 E9022954 068302C4 á...T).Ò..j.Ò?..j..Òn.Ò9..j.$¶.v 000020
 3D057C00 653DFF0C E9037500 643D90FF 21E90428 E80E256A FF2AE903 49E80EF8 %.Ò!.Ò*.j%.Ò(.Ò!..=d.u.Ò..=e.|.= 000040
 5689FC46 89400C56 880A4688 0A4EFF0C 56880A46 88097400 29423E83 DA7E0067 g.-Ò.>B).t..F..V..N..F..V.@.F•.V 000060
 7400733D FEE0E903 7500703D FEE4E903 75006F3D FE80E903 75006E3D 903AEBFE ±$:.=n.u.Ò.±=o.u.ÒÒ±=p.u.ÒÀ±=s.t 000080
 FC5EC4FC 46FF9034 E80A46FF 9081E8FF 79E90375 00783DFE 89E90375 0075308F .=u.u.Ò¿±=x.u.Òy.$Ÿ..F.$4..F•á^• 0000A0
 C483044C E80E0A76 FF0C76FF 500A4628 C388EC75 253C0474 C00AF646 88078A26 &...F-.át.<%u$.ú+F.P.v..v..ÒL..á 0000C0
 3A1EC4FC 63E90374 C00AF646 88078A26 0A5EC40C 56890A46 89FE5688 FC468806 ..F•.V±.F..V.á^.&...F-.át.Òc•á.: 0000E0
 CA06C706 7400295A 3E835657 000012C8 C8C9295E A1FE51E9 0374200A 47F62629 )&-G. t.ÒQ±À^)èúà...WV.>Z).t.ú.ò 000100
 2629541E C4197510 29423E83 07740229 423E8329 5C06FF04 740A067E 8300202A * ..-..t...\).>B).t..>B).u.á.T)& 000120
 2629541E C4117400 295C3E83 902CE804 29540683 FE5689FC 46890257 88260788 ..&.W..F•.V±..T).$,..>\).t.á.T)& 000140
 83022954 0683FE56 89FC4689 99078826 29541EC4 0EE80000 FE46C7FC 46890788 ...F•úF±..$.á.T)&....F•.V±..T).. 000160
 2966168B 2964A12A 48A3C028 9003E806 46880674 FE460BFC 46880E74 0029383E >B).t..F•.F±t..F.$..+àÉà*Àd)..f) 000180
 26F246FF F25EC41D 750A067E 83287D00 FE7E8331 7500295C 3E83F456 89F24689 .F·.V¶.>\).u1.-±.)+.-..u.á^·.F·& 0001A0
 46C79006 E80001F6 46C7FE56 89FC4689 DAF700D2 8308F7FE 5688FC46 882D07C6 ó.-.F•.V±%À.@.%Ò.F•.V±úF-..$..úF 0001C0
 830AC483 DEDF27D2 9AFC76FF FE76FF50 1E0676FF FA5E8CF8 46892946 880000F6 -..¡F).F½.^*.v..P.v±.v•.@'Ò..á.. 0001E0

Dump of file SATURN:[PCCOMMON.DUMP.DLL]DMLGLOB.TMP;1 on 18-APR-1990 10:44:56.67
File ID (627,22,0)   End of file block 315 / Allocated 316

Virtual block number 254 (000000FE), 512 (0200) bytes

 7EC908F0 4E89C82B 29620E88 04C48309 F802149A F876FFFA 76FF4574 00295A3E >Z).tE.v*.v½...«..á...b)+à.Nb.è- 000000
 C00849C1 88473005 C62605EB F27EC4F0 4E880000 2AC806C7 0675082A C83E8300 ..>à*.u.ú.à*...Nbá-·$.&¿ 0G.êl.à 000020
 74C90804 88078A26 F85EC4F2 76C5EE5E 8C29400E 88F04E89 F4468CF2 7E89F47F .¶.-·.F¶.Nb..@).^Ÿév·á^½&.....èt 000040
 00295C3E 83EE5E8E F45E8CF2 7689E375 003F8026 F846FF46 202C8003 7C613C07 .<@|.., F.F½&.?.u0.v·.^¶.^Y.>\). 000060
 02C48302 FFE80E50 C02802E8 00018805 7500F67E 83087429 58060829 44A11475 u.À0)..X)t..--.u.¡..$.+àP.Ò...á. 000080
 FA5689F8 46892956 16882954 A100018E 18740006 7E835657 000010C8 C8C95F5E ^_èúà...WV.-..t./..ÀT)..V).F½.V* 0000A0
 FA5689F8 46890257 88260788 2629541E C4137408 29423E83 008FE902 29540683 ..T).Ò...>B).t.á.T)&..&.W..F½.V* 0000C0
 46880E74 0829423E 83042954 0683FA5E 8CF84689 FC468907 88262954 1EC410EB $.á.T)&...F•.F½.^*..T)..>B).t..F 0000E0
 5688F846 88FA5E8C F8468908 C7880975 00FC7E83 900AEB08 C0881575 FA460BF8 %.F*u.¡á.$...-•.u.¡ú..F½.^*.F½.V 000100
 003F8026 F246FFF2 5EC4900E EB29620E 881C7429 5A3639F6 28F45689 F24689FA *.F·.V¶+-96Z)t...b)$..á^·.F·&.?. 000120
 523E83FE 2829683E 88F37500 3F8026F2 46FFF25E C44690ED EB107ECE 38461574 t.F;ö-.$ú.Fá^·.F·&.?.u«.>h)+±.>R 000140
 74002952 3E8306C4 830183E8 0EF876FF FA76FF56 02C48301 59E80E57 08750029 ).u.W.ÒY..á.V.v*.v½.Ò*..á..>R).t 000160
 83FE5689 FC468929 56168829 54A10000 06C890C8 C95F5E02 C483013C E80E5708 .W.Ò<..á.^_èú.à...ÀT)..V).F•.V±. 000180
 296206C7 06750029 5A3E83FA 4688C02A 9003E801 80057547 067E8306 7467067E -.gt..-.Gu¯.$..*á.F*.>Z).u.ú.b) 0001A0
 0676FF29 6236FF29 4036FF00 01296206 C7067500 29623E83 007400FA 7E800006 ...-*.t..>b).u.ú.b)...6@).6b).v. 0001C0
 187400FA 7E800EC4 8308D41E FF262706 068EFC76 FFFE76FF 296436FF 296636FF .6f).6d).v±.v•..ø'&..Å..á..-*.t. 0001E0
```

```
Dump of file SATURN:[PCCOMMON.DUMP.DLL]DMLGLOB.TMP;1 on 18-APR-1990 10:44:56.67
File ID (627,22,0)   End of file block 315 / Allocated 316

Virtual block number 255 (000000FF), 512 (0200) bytes

 0029383E 8304C483 08D81EFF 26270606 8E296436 FF296636 FF147500 29383E83 .>8).u..6f).6d)..ø'&..Á..á..>8). 000000
 54068304 C48308E0 1EFF2627 06068E29 6436FF29 6636FF14 75002962 3E831874 t..>b).u..6f).6d)..ø'&..Á..á...T 000020
 08E41EFF 26270606 8EFC76FF FE76FF1B 74295806 082944A1 00002AC8 06C70829 ).ú.à*..ÁD)..X)t..vt.v•..ø'&..ð. 000040
 0029603E 8356u000 00C890C8 C90129E8 0E50C028 02E80001 880574C0 0804C483 .á..át.¡..Š.+àP.Ò).èù.à...V.>'). 000060
 10E8E42A 04882602 478E2607 FF263788 2606468A 1478044F FF26293A 1EC43C75 u<á.:)&.O.x..F.&.7&..&.G.&..*ðŠ. 000080
 C95E295E 06FF9005 E8296006 FF077540 06C48311 8705249A 0676FF53 293C36FF .6<)$.v..$.ñ..á.ðu...')Š....^)^è 0000A0
 293A36FF 293C36FF 18E8507E F6080676 88577500 29603E83 56570000 02C890C8 ù.à...WV.>').uW.v..--P$..6<).6:) 0000C0
 FF26293A 1EC41E7E C0084EC6 88296006 FF047540 06C48312 1F05249A 2ACA36FF .6b*.$....á.ðu...').6N.á-.á.:)&. 0000E0
 88077500 29603E83 D4E8E42A 05882602 478E2607 FF263F88 262ACAA0 D478044F O.x&.b*&.7&..&.G.&..*ð$&.>').u.. 000100
 293C36FF 22E85E75 0029603E 830A7688 56570000 02C8C8C9 5F5E295E 06010646 F...^)^_èùà...WV.v..>').u^$".6<) 000120
 C6880646 FF296006 FF047540 06C48312 9105249A 5098078A 26065EC4 293A36FF .6:)á^.Ï...P.$....á.ðu...').F..6 000140
 2607FF26 3F882629 3A1EC407 8A26065E C4C07804 4FFF2629 3A1EC425 74C0084E N.át%á.:)&.O.xeá^.&..á.:)&.7&..& 000160
 00000CC8 C8C95F5E 295E0601 0A468807 75002960 3E83CAE8 E42A0588 2602478E .G.&..*ðŠð.>').u..F...^)^_èùà... 000180
 149AF476 FF522968 3688FA46 89FC4689 C028F656 89F44689 29661688 2964A156 VÁd)..f).F¶.V-+à.F•.F*.6h)R.v¶.. 0001A0
 75082AC8 3E8308E8 02EE8305 75102AC8 3E830676 28F028F8 468904C4 830ECA02 .ò..á..F%+Þ+v..>à*.u..Ÿ.Š..>à*.u 0001C0
 98078A26 F446FF12 75302ACA 3E831975 203F8026 F45EC422 75002952 3E834E01 .N.>R).u"á^¶&.?-u..>ò*Ou..F¶&... 0001E0

Dump of file SATURN:[PCCOMMON.DUMP.DLL]DMLGLOB.TMP;1 on 18-APR-1990 10:44:56.67
File ID (627,22,0)   End of file block 315 / Allocated 316

Virtual block number 256 (00000100), 512 (0200) bytes

 067E8318 74002952 3E83077E F6080874 302ACA3E 83F84EFF 02C483FE 71E80E50 P.Òqt.á..N%.>ò*0t..--..>R).t..~. 000000
 56297500 29523E83 0070E80E FC46FF07 74002AC8 3E830066 E80EFA46 FF077400 .t..F*.Òf..>à*.t..F•.Òp..>R).u)V 000020
 7E830A74 002AC83E 830039E8 0E047500 FA7E830A 7400067E 8302C483 FE7EE80E .Ò~±.á..~..t..~*.u..Ò9..>à*.t..- 000040
 C70E7400 29523E83 06C483FE 85E80EF4 76FFF676 FFF876FF 0040E80E 047500FC •.u..Òð..v%.v-.v¶.Òçt.á..>R).t.ú 000060
 50002088 03E8002B 88057400 29443E83 C8C95E02 C483FE38 E80E5600 202ACA06 .ò* .V.Ò8t.á.^èù.>D).t.¡+.Š.¡ .P 000080
 88057400 29403E83 1775102A C83E8302 C483FDC8 E80E306A C802C483 FDD2E80E .Ò0•.á.ùj0.Òà•.á..>à*.u..>ð).t.¡ 0000A0
 80260A5E C40001FE 46C75657 000006C8 C802C483 F0AAE80E 50007888 03E80058 X.Š.¡x.P.Ò`•.á.ùà...WVúFt..á^.&. 0000C0
 C7087520 3F80260A 5EC49060 E80A46FF 02295406 83378826 29541EC4 12752A3F ?*u.á.T)&.7..T)..F.Š'.á^.&.?-u.ú 0000E0
 0A75295A 3639387F 393C3F7C 303CFA46 88078A26 0A5E88F6 280A46FF FFFFFE46 Ft...F.+-.^.&...F*<0|?<9.;962)u. 000100
 01CE0302 E1C1CE88 98058A26 187F393D 802606E8 F8880030 2ACA06C7 0675303C <0u.ú.ò*0..«Š.&.=9..&....öèÁ..öl 000120
 26065EC4 F088EEF7 FE46880C 468C0A7E 89DF7D30 30802647 F18830E9 83C803E1 Å.à.ÒO.þG&.=0)Ò.-..F..F±%Ÿ.þá^.& 000140
 FC7EC406 4E8AFE[illegible] 8CFC4689 08CE8857 000004C8 C8C95F5E 0C56880A 46883789 .7.F..V.^_èùà...W¡ö..F•.^±.N.á~• 000160
 FE468CFC 7E8990 [illegible] E8FE468C FC7E8900 0188F475 00382611 74003080 264701E8 Š.G&.=.t.Ï8.u¶¡...-•.F:Š...-•.F± 000180
 26C02825 75830A47 F626FC5E C4FE5E8C FC468910 7C880000 04C890C8 C95FC028 +à_èù.à...¡|..F•.^±á^•&-Ç..uX+à& 0001A0
 C28CC388 FF0847C6 26025789 26078926 08578926 06478926 990A4788 26044789 .G.&.G..&.G.&.W.&..&.W.&6G...ü.ô 0001C0
 88EC8855 90C8C999 C028BD75 226C1638 C375226A 06380CFC 4683C28C C38817E8 Š..û.ô.F•.;.j"uù;.l"u§+à.èù.U.š. 0001E0

Dump of file SATURN:[PCCOMMON.DUMP.DLL]DMLGLOB.TMP;1 on 18-APR-1990 10:44:56.67
File ID (627,22,0)   End of file block 315 / Allocated 316

Virtual block number 257 (00000101), 512 (0200) bytes

 0587C6F3 75C08500 00FFFF9A 530C80E9 0CA4E9C0 3300098A 08722303 1E38065E ^.;..#r.o..3àÒÈ.Ò¯.S......áuæó.. 000000
 E9087EC5 1E990175 0AF98302 3306468B 0C4E8801 835756EC 8855C850 E5880023 #..[]ùU.$VW*..N..F.3Ø.'.u...é-.Ò 000020
 E999C028 0673A600 3F812607 7C0F7F12 CE027F81 26065EC4 56570000 0EC8149F ..à...WVá^.&...ö...|.&.7.|s.+à.Ò 000040
 04899940 51806801 6A08F8A3 15582A30 9A37FF26 0277FF26 33806801 E1680194 ..hÅ.h.3&.w.&.7.0*[.È%.j.h.Oð.¿. 000060
 F2468937 FF260277 FF26065E C4338068 01E16815 762ACC9A 505299F0 88F9F700 .%*.Þ.RP.ø*v.hÅ.h.3á^.&.w.&.7.F· 000080
 01E1FC56 813380FA 468126E8 FC5689FA 4689F456 18F2462B 16012800 9AF45689 .V¶..+..+F·.V¶.F*.V•S&.F*.3.V•Å. 0000A0
 00FC7E83 08F80EFF 4E01FC56 835180FA 46810A75 D208F9F7 00048999 4008F8A1 Å%.ð.¿..%*.Øu..F*.Q.V•.N..%..-•. 0000C0
 D208F9F7 00648999 08F8A11F 75D208F9 F70004B9 9908F8A1 07820BF8 0681D47C |à..%.ý.Å%..¿..%*.Øu.Å%..¿d.%*.Ø 0000E0
 F82E81F8 5E8CF646 89228E88 03E82274 880575D2 08F9F701 90899908 F8A10075 u.Å%..¿..%*.Øu.¡t"Š.¡.".F-.^%..% 000100
 5016FA46 80518068 016A08FC A316132A 309AFA76 FFFC76FF 51806801 6A076C08 .l.j.h.Q.v•.v*.0*..È•.j.h.Q.F*.P 000120
 46890002 05C28CC3 881F7D02 47392608 FCA1F65E C4000108 F606C716 6A2A089A ..*j.ú.-...á^-À•.&9G.)..ú.ô....F 000140
 F63E8808 F60EFF08 FCA1F17C 05392608 FCA108F6 06FF02C7 83F27EC4 F45689F2 ·.V¶á-·.ú...-.À•.&9.|þÀ•...-..>- 000160
 6A08F2A3 167C2A30 9AFA76FF FC76FF0E 1068006A 08F4A301 2826F65E C4E7D108 .1Óá^-&+.È¶.j.h...v•.v*.0*|.È·.j 000180
 08F0A316 902A309A FA76FFFC 76FF3C6A 006A1688 2A089A50 16FA4680 0E106800 .h...F*.P..*..j.j<.v•.v*.0*..Èþ. 0001A0
 CA2DC603 08FC0603 01600BF8 06690BEE A31178 2B 009AFA76 FFFC76FF 3C6A006A j.j<.v•.v*..+(.ÈŸ.l.%.m...•..6-ò 0001C0
 75002ACC 3E83C8C9 5F5EDA8C 08EE8800 0008FE06 C708FA16 89F9F700 07899963 c.¿..%*..*.ú.±...¡Ÿ..Ó^_èù.>ä*.u 0001E0
```

Dump of file SATURN:[PCCOMMON.DUMP.DLL]DMLGLOB.TMP;1 on 18-APR-1990 10:44:56.67
File ID (627,22,0)   End of file block 315 / Allocated 316

Virtual block number 258 (00000102), 512 (0200) bytes

5689FA46 8904C483 171327DC 9A0C0068 1E560000 06C8CB2A CC06FF00 05E80E08 ..Ô....a°ùà...V.h...É'...ó..F°.V 000000
0C1236FF 0C1436.F 5006036A 009CE903 75003F80 26FA5EC4 00A8E903 75D00BFC •.Åu.Ô´.ó^°&.?.u.Ô..j..P.6...6.. 000020
5204C4B3 17342684 9AFA76FF FC76FF03 FA46830E 1068006A 0AC48317 2A022C9A .,.°..ó.j.h...F°..v•.v°.Ç&4...ó.R 000040
87F60888 98008A26 1C740038 8026FA5E C4F6280C 0E16890C 0CA31782 2ACC9A50 P.ä°..È......+-ó^°&.8.t.&....Ä-. 000060
88036A10 74003880 26FA5EC4 DB7C03FE 83460675 20388026 FA5E8809 75040A89 ...u..^°&.8-u.F.±.|Üó^°&.8.t.j.. 000080
C6260C16 1EC49009 E80AC483 1542022C 9A0C1636 FF0C1836 FF5052C6 03C28CC3 ù.ò.óRP.6...6...,.8..ó.$..ó...&ó 0000A0
087F8326 065EC456 000006C8 90C8C95E 0C10A340 C01B013F 80260C16 1EC40007 ..ó...&.?..òəÈ..^èù.à...Vó^.&... 0000C0
81E9037D 09087F83 260A7E03 087F8326 00ADE903 7E09087F 83260087 E9037D03 .).Ôñ.&....~.ÔÜ.&....~.&....).Ô. 0000E0
228E8788 E301085F 88261075 03087F83 26177E07 C2FE8107 6CC6810A 77882600 .&.w..6l..±ò.-.&....u.&. .ìD...ª 000100
C4FA46FF 03750003 C6F7FA46 89229087 88E3D108 5F882606 5E88900E E8000705 ...$...^.&._.ìD...ª.F°%o .u..F°ó 000120
89990004 05C10301 60CE69FA 4603F9F7 0004B999 01448046 EE830A77 8B26065E ^.&.w..ŸF.D¯..¿..%°.F°iöm..¿....¿ 000140
02047F83 26227509 7F0E4739 26157503 087F8326 FE4689C2 28FA4688 F9F70007 ..%°.F°+ò.F±&....u.&9G...u"&.... 000160
5EC028E5 7C01047F 83260775 EE7C0E47 3926FE46 88065EC4 9018E800 01881B7C |.¡..$..ó^..F±&9G.|Ÿu.&....||+ã^ 000180
C02ACC9A 505299F9 F70004B9 99034480 51806801 6A06768B 56570000 20C8C8C9 èùà ..WV.v.j.h.Q.D..¿..%°.RP.à°à 0001A0
02087E83 0775D20B F9F70004 B999C688 228C8F88 E301085E 88EC5689 EA468918 ..Fõ.V$.^.ìO.¢.".ó.¿..%°.Øu..-.. 0001C0
52990A88 0C4688C8 880E1068 006A18DA 2ACC9A50 52990E46 883C6A00 6A47017E -.Gj.j<.F..RP.à°Ö.j.h...à.F..Ö.R 0001E0

Dump of file SATURN:[PCCOMMON.DUMP.DLL]DMLGLOB.TMP;1 on 18-APR-1990 10:44:56.67
File ID (627,22,0)   End of file block 315 / Allocated 316

Virtual block number 259 (00000103), 512 (0200) bytes

DA88C703 C3030160 DE690A46 88C88851 8068016A 18FC2ACC 9AE65E89 E44E8950 P.NÖ.^|.ä°•.j.h.O.à.F.ìßm..û.ú.Ö 000000
88104688 C888E656 13E44603 E25613E0 4603192F 2ACC9AE2 5E89E04E 89505299 .RP.NÅ.^ã.ä°/..FÅ.Vã.FÖ.V|.à.F.. 000020
6016CA9A FC4689C7 030A4688 EC5E11EA 4E0112CE D381A600 C181DA13 C803990A Ö..à.Ö.ê.|.Æö..Nõ.^$.F..ú.F•.ò.' 000040
46890C46 88F64689 48084688 F8468950 448DEC56 11EA4601 0C0E1688 0C0CA119 .Å.......Fõ.V$.DP.F%.F.H.F-.F..F 000060
5E830E10 EA6E8109 74C00804 C48316E6 17A49A50 16EE468D 1A74000C 103E83F2 ·.>...t..FŸ.P.Ê.|..ó..åt..nõ...^ 000080
C0850000 FFFF9A50 50C03306 76FF0876 FFEC8855 C8C95F5E EC5688EA 468800EC $..Fõ.V$^_èùU.$.v..v.3óPP......à 0000A0
010A8987 F6088898 078A2606 5EC45657 04EC83EC 885500C8 5DE58807 FEE90374 t.Ö±..|]ù.U.$.$.WVó^.&....Ä-.... 0000C0
058A2647 F8881674 00653098 078A2606 5E8807E8 00200598 078A2606 5E880C74 t..^.&.... .$..^.&...=e.t..«G&.. 0000E0
2E07C626 0646FFF0 8898078A 26065EC4 08468C06 7E89F275 040A8987 F6D88898 ..Ä-....u·.~..F.ó^.&....Þ.F.&ó.. 000100
C85DE588 5F5EFC7E 89E975C0 0A0646FF F7880788 26C688F8 8898078A 26065E88 .^.&....%.ó&...%.F..åuÔ.-•^_.|]ù 000120
468C067E 89F37500 30802647 07742E30 80269008 E8067EC4 565706EC 83EC8855 U.$.$.WVá-.$..&.=.t.G&.=.uµ¯-..F 000140
26470774 45308026 0074653D 8026900E E8067E88 6774003F 80260646 FFDF8808 ..Ô.F.&.?.tg.-.$..&.=et.&.=Et.G& 000160
264F9002 E8067E88 FE5689FC 4689064E FFC28CC7 8808468C 067E89ED 75003080 .=.uÜ.-..F..ú.ò.N..F•.V±.-.$..Ö& 000180
C40646FF FC76C5FA 5E8C064E FF03752E 3F8026DF 8808468C 067E89F9 74303080 .=Öt°.-..F..Ö&.7.u..N..^°évo.F.ó 0001A0
D81E8DEC 885590C8 5DE5885F 5EFA5E8E FE5E8CFC 7689F275 C00A0788 26AC065E ^.¯&...åu·.v•.^±.^°^_.|]ù.U.$..Ä 0001C0
8855C85D C028C85D 00018805 721AE530 929A1AC1 28F29A06 5EC41ABC 2C129A27 '..,V.ó^..·+è...O|.r¯.¡..]ù+à]ùÜ. 0001E0

Dump of file SATURN:[PCCOMMON.DUMP.DLL]DMLGLOB.TMP;1 on 18-APR-1990 10:44:56.67
File ID (627,22,0)   End of file block 315 / Allocated 316

Virtual block number 260 (00000104), 512 (0200) bytes

88F88808 5EC404C4 831B0926 889A0C76 FF0E76FF 24740006 7E835657 08EC83EC $.$.WV.-...t$.v..v..¡&...ó.ó^..«. 000000
7E8004C4 8318232¿ 889A0C76 FF0E76FF 90C85DE5 885F5E1F A5A5A5A5 DA8E1EF0 Þ..ÖEEEE.^ .|]ù..v..v..¡&#..ó..- 000020
885F5E18 9F2D659? 085EC418 282C129A F85E8D1F A5A5A5A5 DA8E1E07 16F088F8 %.Þ....ÖEEEE..^%..,+.ó^..e-..^_. 000040
FA5689F8 46892AD0 16882ACE A1477400 0C5C3E80 56570AEC 83EC8855 90C85DE5 |]ù.U.$.$.WV.>\..tGÅö°..Å°.F%.V̄° 000060
000E7E83 FE5689FC 46890C56 880A4603 C02802E8 00018805 752D3F83 26F85EC4 ó^%&.?-u.¡..$.+â.F..V..F•.V±.-.. 000080
77FF2606 5EC458E8 06C48304 5DE80EFC 76FFFE76 FF50C028 9003E800 0188067E -.¡..$..+âP.v±.v•,Ô]..ó.$Xó^.&.w 0000A0
400E4688 5052FA56 89F84689 08C4831B D031719A 37FF2602 77FF2604 77FF2606 .&.w.&.w.&.7.q1|..ó..F%.V°RP.F.ə 0000C0
C02802E8 00018805 752D3F83 26F888F8 5EC4C028 02E80001 88057E00 0E7E8350 P.-..-.¡..$.+âó^%.%&.?-u.¡..$.+â 0000E0
5EC4FE56 89FC4689 0C5688 0A 46880AC4 831C3727 0E9A5052 0C56880A 4603C703 .ú.F..V.RP..'7..ó..F..V..F•.V±ó^ 000100
88260147 8A26FC5E C4147E00 0E7E832D 07C626FC 46FFFC5E C40A752D 3F8326F8 %&.?-u.ó^•.F•&ó.-.-..-.ó^•&.G.&. 000120
88FC4603 0E46030B F7C01B01 0C5C3E80 501E0C56 882E07C6 26FC5E88 FC46FF07 ..F•.^•&ó..¡V..P.>\...ó%Ä.F..F•. 000140
FF4507C6 26FC5EC4 07740010 7E83FE56 89FC4689 08C4831D 7101849A 5052FE56 V±RP.Ç.q..ó..F•.V±.~..t.ó^•&ó.E. 000160
8808F708 7DF608F0 88480247 8826F85E C45E7430 3F802606 5FC426F8 5EC4FC46 F•ó^%&ó_.&.70t^ó^%&.G.H.Þ.-).%Ä. 000180
C6880700 26FC5EC4 F9F70064 8999C688 157C64FE 83FC46FF 2007C626 FC5EC4F0 Þó^•&ó.¯.F•.±d|..ó.¿d.%°ó^•&...ó 0001A0
F9F799C6 88070026 FC5EC4F9 F7000A89 99C68815 7C0AFE83 FC46FFF2 88F9F799 .%°. .F•.±.|..ó.¿..%°ó^•&...ó.%° 0001C0
04EC83EC 885590C8 5DE5885F 5E0C5688 0A468807 0026C688 FC5EC4FC 46FFF288 .·.F•ó^•.ó&...F..V.^_.|]ù.U.$.$. 0001E0

```
Dump of file SATURN:[PCCOMMON.DUMP.DLL]DMLGLOB.TMP;1 on 18-APR-1990 10:44:56.67
File ID (627,22,0)   End of file block 315 / Allocated 316

Virtual block number 261 (00000105), 512 (0200) bytes

 5689FC46 89FE49E8 0E0676FF 0876FF0A 76FF0C76 FF0E76FF 1076FF01 0C5C06C6 6.\...v..v..v..v..v..v..0ı±.F=.V 000000
 16882ACE A1517400 0C5C3E80 00F246C6 12EC83EC 8855CB5D E588000C 5C06C6FE ±6.\...|]ùW.$.$.6F ..>\..tQÀö*.. 000020
 46890C56 880A4603 C02802E8 00018805 75203F83 26F45EC4 F65689F4 46892AD0 Å*.F¶.V-6^¶&.?-u.¡..$.+à.F..V..F 000040
 26EE46FF EE5EC'F0 5689EE46 890C5E06 03FC4688 6A750E46 390C5EA1 FE5689FC =.V±Å^.9F.uj.F=..^..FŸ.Vbó^Ÿ.FŸ& 000060
 719A37FF 260277FF 260477FF 260677FF 26065EC4 4AE80007 Co26EE5E 883007C6 6.0.^Ÿ&6..$J6^.&.w.&.w.&.w.&.7.q 000080
 8805752D 3F832650 0E460302 478826F4 5EC45052 F65689F4 468908C4 831DA131 1À..6..F¶.V-RP6^¶&.G..F.P&.?-u.¡ 0000A0
 89FC4689 0C56880A 46880AC4 83188F27 0E9A5052 0C56880A 4603C028 02E80001 ..$.+à.F..V.RP..'...6..F..V..F=. 0000C0
 88107F00 027F8326 F45EC420 07C626FC 46FFFC5E C40A752D 3F8326F4 5ºr4FE56 V±6^¶&.?-u.6^=.F=&6.-6^¶&......| 0000E0
 26F45EC4 0AEB3007 C626FC46 FFFC5EC4 06C48302 05E80EFC 76FFFE76 FF: 0001 ..P.v±.v=.Ò...6.6^=.F=&6.0$.6^¶& 000100
 FC5EC406 C4830108 E80EFC76 FFFE76FF 50000188 687E000E 7E83FC46 010ʟ 788 .G..F=.~..~h|..P.v±.v=.ÒÀ..6.6^= 000120
 0EE808F7 02478826 0874000C 5C3E8043 7D00027F 8326F45E C42E07C6 26FC46FF .F=&6..6^¶&....)C.>\..t.&.G.%A$. 000140
 FF06C483 0196E80E FC76FFFE 76FF500E 46890E46 88037E0E 463808F7 02478826 &.G.%A;F.~..F..F.P.v±.v=.Ò...6.. 000160
 8855CB5D E5880C56 880A4688 08C4831E 88295C9A FC76FFFE 76FF5000 30880E76 v.¡0.P.v±.v=.\)¡..6..F..V..|]ùW. 000180
 89FC4689 FE6EE80E 0676FF08 76FF0A76 FF0C76FF 0E76FF01 0C5C06C6 04EC83EC $.$.6.\...v..v..v..v..v..Òn±.F=. 0001A0
 FF260477 FF260677 FF26065E C45606EC 83EC8855 90C85DE5 88000C5C 06C6FE56 V±6.\...|]ù.U.$.$.V6^.&.w.&.w.&. 0001C0
 0C5EA348 02478826 2ACE1EC4 2A001689 2ACEA308 C4831EF4 31719A37 FF260277 w.&.7.q1¶..à.Èö*..À*6.ö*&.G.HÈ^. 0001E0

Dump of file SATURN:[PCCOMMON.DUMP.DLL]DMLGLOB.TMP;1 on 18-APR-1990 10:44:56.67
File ID (627,22,0)   End of file block 315 / Allocated 316

Virtual block number 262 (00000106), 512 (0200) bytes

 520E76FF 5306FE56 89FC4689 0C56880A 4603C028 9003E800 01880675 203F8326 &.7-u.¡..$..+à.F..V..F=.V±.S.v.R 000000
 60A2C02A 02E80180 047D0C5E 36394E02 778B262A CE1EC40A C4831FF4 270E9A50 P..'¶..6.6.o*&.w.N96^.).¯.$.*àÀ' 000020
 0876FF0A 76FF0C76 FF0E76FF 1076FF1F 7F0E4639 C688077C FCFE830C 5E36890C ..6^..±=|..69F....v..v..v..v..v. 000040
 7C8046FC 76C5FA5E 8C1E7400 0C603E80 90C85DE5 885E0CC4 83FD93E8 0E0676FF .v..Ò.».6.^.|]ù..>'..t..^*évªF.| 000060
 76FF0A76 FF0C76FF 0E76FF00 FE47C626 FC5EC4FA 5E8EFE5E 8CFC7689 F97500FF ..u*.v=.^±.^*6^=&6G±..v..v..v..v 000080
 FF197545 0E7E8306 74650E7E 83EC8855 C85DE588 5E0AC483 FEF6E80E 0676FF08 ..v..Ò-±.6.^.|]ùW.$.-.et..~.Eu.. 0000A0
 76FF1875 660E7E83 9035E8F8 8FE80E06 76FF0876 FF0A76FF 0C76FF10 76FF1276 v..v..v..v..v..v..Ò.«$$..-.fu..v 0000C0
 FF0C76FF 1076FF12 76FFC85D 0AC483FD 39E80E06 76FF0876 FF0A76FF 0C76FF10 ..v..v..v..v..Ò9».6.]ù.v..v..v.. 0000E0
 76FF0876 FF297400 0A7E83EC 885590C8 500CC483 FEC0E80E 0676FF08 76FF0A76 v..v..v..Òà±.6.]ù.U.$.-..t).v..v 000100
 B428929A 50520856 88064603 0A468806 76FF0876 FF504004 C483200F 02149A06 ..... .6.@P.v..v..F..F..V.RP..(Ç 000120
 62681E0C 64681E22 FEA3E086 580000FF FF9A5016 C48850EC 8855CB5D 0AC4831A ..6.]ùW.$P.6.P.....X.ÀÈ±".hd..hb 000140
 029A203F 20A89A50 C85DE588 0001881E 5F32009A 11A4E800 21E80000 FFFF9A0C ......Òl.ÒÈ..À2_.¡...|]ùP.¨ ? .. 000160
 80264701 75003D80 267FFF89 0C64068E FF330000 881E0C6A 16FF00FF 68204C21 !L h....j..È..3...d.¿..&.=.u.G&. 000180
 8F1FF788 071E061C EBE774AE F2C03308 74CA88A6 F3C88801 88106E8E 31740030 =.t1/n..|.ùw|.òt.3à·ÙtÒ$.....%.e 0001A0
 9A5000FC 88EC8855 00C31FED E8AAC20A 0572412C AC9204E0 C00E7241 2CAC2305 .#¨,Ar.àÀ..¯,Ar..ô¨$Ù.û.U.$¡=.P. 0001C0
 E9000288 C85DE588 20822102 9A5000FF 88226E1E FF047400 22703E83 20512102 .IQ .>p".t...n"¡..P..1ý .|]ù¡..Ò 0001E0

Dump of file SATURN:[PCCOMMON.DUMP.DLL]DMLGLOB.TMP;1 on 18-APR-1990 10:44:56.67
File ID (627,22,0)   End of file block 315 / Allocated 316

Virtual block number 263 (00000107), 512 (0200) bytes

 C033970C 74964010 74C238AD 27E88E06 5688C08E 088E0805 885756EC 8855FF76 v.U.$VW|...À.à.V./Ò'Ù;ôt.@.t..3à 000000
 C00820C6 20029A06 76FF57EC 88550002 CA5DE588 5E5F96E8 E8F788AE F2FFFF89 ¿...Ù.%$$._^.|]ò..U.$W.v..● 6 .â 000020
 0000FFFF 9A501651 521E5300 0288C488 5049D1F7 AEF2FFFF 89C033FA 88921F74 t...*3à¿..¯Ù%||P.6E..S.RQ.P..... 000040
 160C0808 070A0C09 0C080C07 09060005 18040203 02021601 0002CA5D E5885F58 [_.|]ò........................... 000060
 09721C70 2060006C 08590057 00530052 02430041 02350212 12110010 120F1600 ..........S.A.C.R.S.W.Y.l.m p.r. 000080
 8899FFFF 8822FA16 892301A3 16080000 080702CE 08A40084 09820A81 0A801606 ..........Ê.ö.■.....Ê.#..*"¡.... 0000A0
 1674073A 2E1875E4 0A0024B9 21388823 01A3C850 E58899FF FF880008 E8CB5DE5 |]ùÒ..¡....|]ùÊ.#EB1¿$..Òu..:.t. 0000C0
 00C322FA A3980147 8A2E4301 76CA3C04 728C3C43 0A76243C 0472133C F7E24343 CCã%<.r.<$v.C<Vr.<Òv.C..G..Ê*"ù. 0000E0
 891C7005 E001C103 E001C888 F9F7000C 8999107C 20044688 227206FF 000004C8 à.....r".F.·|..¿..%*.àIÀ.èIÀ.p.. 000100
 26117400 08085789 26064789 26045EC4 02C48321 0C25F99A 020068FE 5E8CFC46 F=.^±h...*X.|.6.6^.&.G.&.W..Àt.& 000120
 2640FE56 88FC4688 040A4F80 26045EC4 9021E802 000247C7 26FC5EC4 080A4F80 .O..6^=&ùG...$1.6^.&.O...F=.V±@& 000140
 89260789 26085788 26064788 26045EC4 00010247 C726FC5E C4085789 26064789 .G.&.W.6^=&ùG...6^.&.G.&.W.&..&. 000160
 22E9FF16 E9C03300 098A0872 23031E38 065E88EC 8855C3C9 00000447 C7260257 W.&ùG...èùW.$.^.;..#r.α..3àÒ..Ò" 000180
 A78091E1 75C0855A 590000FF FF9A5116 0C76FF08 76FF0A76 FF53CC88 04EC83FF ..$..àS.v..v..v..Q.....YZ.àuÀ..I 0001A0
 52F8568D 1652FE56 80160676 FF0876FF 40870EEC 83EC8855 00C85DE5 88FD2305 .#=.|]ù.U.$.$.ñ@.v..v...V±R..V½R 0001C0
 80227402 00A92A75 0400A910 CA800874 0100A90A 4688018A E80C4E88 5252D233 3@RR.N.Ò...F.`..t..ò.`..u*`..t". 0001E0
```

```
Dump of file SATURN:[PCCOMMON.DUMP.DLL]DMLGLOB.TMP;1 on 18-APR-1990 10:44:56.67
File ID (627,22,0)   End of file block 315 / Allocated 316

Virtual block number 264 (00000108), 512 (0200) bytes

 EBFE4E88 087558C0 850000FF FF9A5050 C0335016 0676FF08 76FFFE46 8D5002CA ò.P.F±.v..v..P3àPP......âXu..N±$ 000000
 C2F60E75 006E3D16 74C00800 00FFFF9A 5050C033 50C70A00 03255251 01CA8003 ..ò.QR%...úP3àPP......ât.=n.u.-ô 000020
 188A0000 14E59A5L 0D722303 063BFE46 88008DE9 FE68E900 118A0374 00028AF0 Þn..t.n..Òh±Ô...F±;..#r.P.Ì...n. 000040
 C9330A46 886175C0 080000FF FF9A50F8 468D1653 F45E8D16 50D088E4 EBC03300 .3à$0.ÀP..^¶S..F½P......àua.F.3è 000060
 F446C607 75013CF4 468AF24E 8880B102 75802517 06F60775 4000A90E 758000A9 `..u.`.@u.-..%.u.Ý..N`.F¶<.u.óF¶ 000080
 52737400 020A46F7 7A74C90A F44688C0 320083E9 08F446C6 0775023C 008EE940 @Ò..<.u.óF¶.Ô..2à.F¶.èt±%F...tsR 0000A0
 33FDE4E9 03740083 300C74C0 08000022 839A50FA 468D1651 00028951 51FFFF89 ¿..00¿..Q..F*P.."...ât.=..t.Òõ»3 0000C0
 3274F846 392375C0 080000FF FF9A50F8 46801650 00018850 F6468016 524FE8C0 àSOR..F-P¡..P..F½P......àu#9F½t2 0000E0
 3352BE75 C00B0000 FFFF9AFA 76FFFC76 FF00FC5E 8301FA6E 83521875 1AF67E83 .~-.u.R.n*..^•..v•.v*......àu/R3 000100
 0676FF08 76FF2875 48C1F6F4 4EBAAA75 C0080000 239F9A50 FA468D16 505050C0 àPPP..F*P..#...àu`.N¶-èHu(.v..v. 000120
 80037400 080A46F7 10C98003 740001F8 46F70000 22E39A50 50C03350 F8468D16 ..F½P3àPP.0"..%F½..t..è.%F...t.. 000140
 7580A8C9 33C12300 F722FCA1 C85DE588 23058F88 D888C288 01C980F2 4E0A20C9 è .N`.è..ô.À...#.Ì]ùÀ•"%À#è3è´.u 000160
 0587F6FD 17E9C033 00098A08 7223031E 38065E88 0CEC83EC 885500C3 01C98003 ..è.û.U.$.$..^.;..#r.n..3àÕ.»-.. 000180
 FA5E8C66 74802305 87F60000 23FA9A50 16F44680 51414151 51C93353 12742023 # t.S3èQQAAQ.F¶.P.*#..-..#.tf.^* 0001A0
 F20AB049 E30C4E88 F86689F2 88FA8856 57FCFC46 89FE4689 C0330856 C50A468E .F.éV.3à.F±.F••WV.*.`.f½.N.DI¯.` 0001C0
 AA1A74FB 380D740A 3CAC0C4E 880716FA 88D488E2 2800808A DC8802EC 833875AE Ùu;.$..Éo..•ã.å.*...N.¯<.t.;«t.` 0001E0

Dump of file SATURN:[PCCOMMON.DUMP.DLL]DMLGLOB.TMP;1 on 18-APR-1990 10:44:56.67
File ID (627,22,0)   End of file block 315 / Allocated 316

Virtual block number 265 (00000109), 512 (0200) bytes

 5F5EE1E8 0014E8E2 E8FC46FF 0A80AA00 1FE80375 F8380080 009AE900 28E8F ¯2 â¶Ò+.Ô..¯.;«u.Ò..`¯..F•$àÒ..$Ã^_ 000000
 53065E88 1FE3CA28 CF881F06 1E515350 21F8318C 9AFFFC88 7AE80093 E9FA5E.E .^*Ò..$±¡•..¥1«IPSQ....ü+òD..^.$ 000020
 88585859 1F07740B 0BFE5E01 F45E8811 75C00800 00212C9A 5016F446 8051521E .RQ.F¶.P.,f...àu..^¶.^±.Ut..Y[X. 000040
 F900208A 03E8001C 8A087500 098A0001 30007400 60301874 C00808C4 831FC3FA *ü..á..ât.=m.t.=..n..u.n..$.n .* 000060
 F9C03300 1C8A0EE8 F803751A 3F80085E 880A5E8E 0E744023 0587F6FE 5E8E26E8 $&.^±-..#@t..^..^..?.u.½$.n..3à* 000080
 0475C908 0C4E88F8 F8E9C85D E5880472 FA5E8E5F 5EF8668B FC462BFE 468806EB $..F±•F•.f½^_.^*r..Ì)ùÒ««.N..èu. 0000A0
 00603017 74C0081F 071E0000 25199A50 16F4468D 51521E53 0856C51E EEE8C188 .è$Y.éV.S.RQ¯F¶.P..X......ât.=m. 0000C0
 40230587 F68775C0 08F4468B C2E80020 8AC7E800 1C8ACC75 00098A00 01300074 t.•..n..uàn..$ún .$ô.F¶.àuñ-..#@ 0000E0
 0574C308 C08C065E C4EC8855 00A3E8C0 33001C8A A6E80275 1A3F8026 DA880A74 t..O&.?.u.$Ìn..3à$È.U.$á^..á.ùt. 000100
 08750025 223E831E 73FFF13D 06468857 5602EC83 EC8855CB 5DE58801 FE4F8026 &.O±..Ì]ìU.$.$.VW.F.=þ.s..>"%.u. 000120
 8324FE34 2A9A0676 FF087500 78E80574 0018E815 750082E8 2522A312 740025E8 ÒX.t.È"%Ò..u.Ò..t.Òx.u..v..*4±$. 000140
 8050501E C033FE5E 89FEE383 43065E88 0776065E 3900F088 C85DE588 5E5F02C4 á._^.Ì)ùEÞ.9^.v..^.C.D±.^±3à.PP. 000160
 05740208 2526A325 241687C2 883874FF FA8308C4 83262036 2E9A5002 80510E4F O.Õ¯.P..6-&.á..*.t0.ô..$X€&X.0t. 000180
 01478000 02A30000 A3000A88 0C478948 480008A3 C0330B8E FE5E8800 08A30A8E .DÈ...^±.À3àÈ..HH.G.¡..È..È...G. 0001A0
 8C020800 C6E82526 1E8ED833 064E88C0 8ED88CC3 1FD88C00 06A30000 05000AA3 È.....È...À.ù.À.ã.N.3Ù..&XÒó..0. 0001C0
 080A8987 F6D8889B 058A2647 9002E806 7EC45657 000000C8 001069E9 C3098EC1 è.ÌùÒi..à...WVó~.$..G&....À-.... 0001E0

Dump of file SATURN:[PCCOMMON.DUMP.DLL]DMLGLOB.TMP;1 on 18-APR-1990 10:44:56.67
File ID (627,22,0)   End of file block 315 / Allocated 316

Virtual block number 266 (0000010A), 512 (0200) bytes

 26594560 9A570876 FF5004C4 8326EE02 149A5706 006A006A 08468C06 7E89F275 u`.-..F.j.j..W...Y&.ó.P.v.W.mEY& 000000
 0AC8C8C9 5F5EDA8C 2AD2881F A5A5A5A5 DA8E1E07 1EF0882A D28F0008 050AC483 .ó....«0*.Þ....ÒEEEE.¡0*.Ò^_èùà. 000020
 5689FC46 8908578B 2606478B 260C5EC4 FA5689F8 46890856 88064688 56570000 ..WV.F..V..F½.V*ó^.&.G.&.W.¯F•.V 000040
 3F8026FC 5EC4F876 C5F65E8C 0A4E882E 7E000A7E 833007C6 26F846FF F85EC4FE ±á^½.F½&ó.0.-..-..N..^-év½á^=&.7 000060
 C40A4E89 F65E8EFA 5E8CF876 89E7E246 04883080 9003E807 8A26FC46 FF097400 .t..F•&..$..¯0..FãÒ.v½.^*.^-.N.ó 000080
 C6269006 E8F87EC4 F84EFF1F 7C353F80 26FC5EC4 287C000A 7E830007 C626F85E ^½&ó...-..|(á^=&.?5|..N½ó~½$..&ó 0000A0
 0C5EC409 75313F80 26065EC4 07FE260F 88FA468C F87E89F5 74393080 264F3005 .00&.=9t%.-½.F*.Ò&±.á^.&.?1u.á^. 0000C0
 90C8C95F 5E08C483 26E10184 9A0676FF 52505240 08568806 46881 5E8 0247FF26 &.G.$..F..V.@RPR.v..Ç.À&.á.^_èù. 0000E0
 C208FC56 89FA4689 25001688 2508A156 000006C8 01C8E900 835756EC 88550000 ..U.&VW*.Òà.à...VÀ.%...%.F*.V̄=.ó 000100
 46839090 06E8F088 04C48328 2802149A 0676FF08 76FF6E74 08460806 46887674 tv.F..F.tn.v..v....((.ó..Þ$....F 000120
 7EC63804 C4832851 02149A37 FF260277 FF264A74 02470826 078826FA 5EC404FA *.ó^*&..&.G.tJ&.w.&.7...Q(.ó.;ó- 000140
 E49A37FF 260277FF 26FA5EC4 0676FF08 76FF56D1 75303880 261FC426 FA5EC4DD 1ó^*&ó.&.8=uÌV.v..v.á^*&.w.&.7.ô 000160
 8855C8C9 5E99C028 9004E8C2 8C014080 1FC426FA 5EC48475 C0080AC4 8327C636 66´.ó..àuÇá^*&ó..@..ô$..+ó.^èùJ. 000180
 50E588C0 3302E800 01880574 40230587 F60C7C00 F883117D 23031E38 065E88EC &.^.;..#)..«.|.-..#@t.¡..$.3ã.Ì] 0001A0
 0337769A 5706561E 067EC40A 76C55657 1E0085E9 0375C908 0E4E88EC 885500C8 ù.U.&.N..èu.Òç..WVév.ó-..´.W.v7. 0001C0
 8C0773F9 03D88E04 FF05D88C 0773F103 49507300 DA83C128 57780208 0E4E8828 (.N..0xW+è.Ò.sPI.þs..À.....*s.. 0001E0
```

```
Dump of file SATURN:[PCCOMMON.DUMP.DLL]DMLGLOB.TMP;1 on 18-APR-1990 10:44:56.67
File ID (627,22,0)   End of file block 315 / Allocated 316

Virtual block number 267 (0000010B), 512 (0200) bytes

 F3FDC128 9140C603 C323DB1B C628C703 C323DB1B C72B48C1 8B41C08E 28C705C0 å.ú(.åA.èH+ú.Û#û.ú+6.Û#û.6ã.+è»µ 000000
 8BC8EBC0 8E28FD2D C08CD175 FFFF8308 8E28D22D D88C0775 FFFE835C E391FCA4 Ê•.D\.±.u..Ä·Ø(.Ä...ul.å-»(.åŠå. 000020
 E9D1C128 9140C203 C323DB1B C22BD2F7 D68BC203 C323DB1B C22BD2F7 D78B48C1 éH.ø%Ø+ô.Û#û.ô.ø%Ø+ô.Û#û.6ã.+èÏÔ 000040
 EBC08E29 4005C08C C775FF08 D88E2909 05D88C07 75F60818 E391A4F3 C913A5F3 µÉ.èµÉ.D..-u..Ä..).Ä..uú.å.ã).åŠ 000060
 D12B0C74 DAF7D78B 067EC457 38E30C4E 8BEC8855 CB5D0856 8B06468B 1F5F5EBE /^_..F..V.]ûU.å.N.D8Wó-..ø%Öt.+1 000080
 48C381C3 8C10E3D1 87AAF3C9 13ABF3E9 D1E08A0A 46880128 D187D103 D323DB1B .ÛWÆ.1.1+1.F..ÅlÖµ¨.èµ^.1D..û.ûK 0000A0
 7EC51E08 568B0646 8B0E4E8B CB5D0856 8B06468B 5FAAF3C9 13ABF3E9 D1C3BE29 ).ûlÖµ¨.èµ^_.F..V.]ù.N..F..V..é- 0000C0
 92F78BDA F700D283 DBF7AA2D 800A7902 080E750A F9831374 C00A93FC 071E570A .W..•..åt..T.u..Øy.¯-^%Û.Ø.%Ö.%. 0000E0
 4F058BE2 75C30BC2 8BAA2704 0276393C 3004D387 92F1F793 F1F70274 C008D233 3Ø.åt.%þ.%þ..Æ.0<9v..'^.ô.ûuã..O 000100
 76FF065E C4EC8B55 00CB5DE5 8B5E5F1F 58DA8CF2 72C73B01 448DFF44 880586AC ¯...D..D.;ûr·.ÖX._^.[]ù.U.åá^..v 000120
 0008CA5D E58B07B9 26025789 26065EC4 28AF2800 9A37FF26 0277FF26 0A76FF0C ..v.&.w.&.7..+£(á¯.&.W.&...[]ò.. 000140
 06568908 46890000 1DDAF7D8 F706568B 471170C0 08084688 FF335356 57EC8855 U.$WVS3..F..å).G.V.%Ä%Ö....F..V. 000160
 8B0A4E8B 1575C008 0A56890C 46890000 1DDAF7D8 F70A568B 471170C0 080C4688 .F..å).G.V.%Ä%Ö....F..V..åu..N.. 000180
 D9D1EBD1 06468808 56880A4E 88D88838 EBD38BF1 F706468B D8BBF1F7 D2330846 F.3Ø%þ.Ä.F.%þ.ÆŠ8.Ä.N..V..F.ÌŠ1) 0001A0
 06720777 0856380C 72D103E6 F70A468B 910C66F7 F08BF1F7 F4750B08 D8D1EAD1 ÌõÌÄ.Ûu¶%þ.Þ%f...F.%l.Ìr.;V.w.r. 0001C0
 8BEC8855 0008CA5D E5885F5E 5B00DA83 D8F7DAF7 07754F96 D2334E01 7606463B ;F.v.N3Ø.Ou.%Ö%Ä.Ö.[^_.[]ò..U.Š. 0001E0

Dump of file SATURN:[PCCOMMON.DUMP.DLL]DMLGLOB.TMP;1 on 18-APR-1990 10:44:56.67
File ID (627,22,0)   End of file block 315 / Allocated 316

Virtual block number 268 (0000010C), 512 (0200) bytes

 66F70646 8BC888E3 F70008CA 5DE588E3 F706468B 08750A5E 8BD8080C 5E8B0846 F..^..Ä.^.u..F.%D.[]ò..%D.å.F.%f 000000
 8B47117D C0080846 8BFF3357 53EC8855 0008CA5D E58BD103 E3F70646 8BC8030C ..å.F.%D.[.[]ò..U.&SW3..F..å).G. 000020
 00001DDA F7D8F70A 568B107D C0080C46 8B065689 08468900 001DDAF7 D8F70656 V.%Ä%Ö....F..V..F..å)..V.%Ä%Ö... 000040
 43794FD2 33C28BF1 F706468B F1F7D233 0846880A 4E881875 C0080A56 890C4689 .F..V..åu..N..F.3Ø%þ.F.%þ.ô3ØOyC 000060
 0C66F7C8 8BF1F7F4 750B0808 D1EAD1D9 D1EBD106 46880856 880A4E8B D8BB48EB ŠH.Ä.N..V..F.ÌŠ11ÌõÌÄ.Ûu¶%þ.å%f. 000080
 08561806 462B0C56 1B0A462B 06760646 3B0B7207 7708563B 0C72D103 0A66F791 .%f..Ìr.;V.w.r.;F.v.+F..V.+F..V. 0000A0
 C3832780 1E8BF38B 5756C08E D08C0008 CA5DE58B 5B5F000A 8308F7DA F707794F Oy.%Ö%Ä.Ö._[.[]ò...Å.åVW.µ...'.û 0000C0
 880CC383 27801E8B F3885756 16EBF38B D98EA5A5 FCD88EC1 8ED98CC0 8CFB880C ..«.å.).è.Ä•ÊÊ.).µŠ.VW.µ...'.ú.. 0000E0
 D08CC85E 5F03FE47 C6FC7789 27801E89 4E74276C FB81F38B A5A5FCC1 8ED98CFB «.).è•ÊÊ.µ.«l'tN...'.w•6G±._^ù.Å 000100
 F38BD98E A5A5A5A5 FCD88EC1 8ED98CC0 8CFB880C C3832780 1E8BF38B 5756C08E .åVW.µ...'.û..«.å.).è.Ä•ÊÊÊÊ.).µ 000120
 0E74276C FB81F38B A5A5A5A5 FCC18ED9 8CFB880C C3832780 1E8BF38B 57561BEB Š.VW.µ...'.û..«.).è•ÊÊÊÊ.µ.«l't. 000140
 8EC18ED9 8CD88C57 5604EBD0 8C57560B 71E9CB5E 5FFC7789 07FE47C6 27801E89 ...'6G±..w•_^ûÕq.VW.ÅŠ.VW.Ä.).è. 000160
 89CF7427 6CFB81A5 A5027403 3CA5A5FE 4588ADFB 880CC383 27801E8B F38BFCD8 Ä•.µ...'.û.¯«Ù.E±ÊÊ<.t.ÊÊ.«l'tü. 000180
 99078B26 C08ED08C 14EB0257 8B26078B 26C08ED0 8CCB5E5F D98EFC5F 8927801E ..'._•.)_^ù.Å.åå..&.W.Š..Å.å&... 0001A0
 8B000B83 DAF7DBF7 07798024 C78AD08B DA8B5756 99078B03 EB02578B 078B0AEB Š....W.Š¯...VW.Ö.Å.ú$.y.%Û%Ö.Û.. 0001C0
 03FE45C6 0F7500FF 80C18ED9 8CFC7D89 27803E89 1C74276C FF810CC7 8327803E >.'.ú...l't..>.'.)•.).è...u.6E±. 0001E0

Dump of file SATURN:[PCCOMMON.DUMP.DLL]DMLGLOB.TMP;1 on 18-APR-1990 10:44:56.67
File ID (627,22,0)   End of file block 315 / Allocated 316

Virtual block number 269 (0000010D), 512 (0200) bytes

 CB5E5F5D 13F1E8FB 8BD833CB 8B87608D 5507FE45 C6FF63E9 CB5E5F10 92E89EB4 Ç.Ò.._^ûÕc.6E±.U§'..û3Û.«Óþ.]_^ù 000000
 FC7D8927 803E89B1 74276CFF 810CC783 FE458AFC 758B2780 3E8BC08E D88C5756 VW.Ä.ã.>.'.u•.E±.ú...l'tŸ.>.'¯)• 000020
 3E898C74 276CFF81 0CC78327 803E8B57 56CB5E5F A5A50274 033CA5A5 FCFE458B .E±•ÊÊ<.t.ÊÊ_^ûVW.>.'.ú...l't..> 000040
 8B5756C0 8ED88C02 EBD08CCB 5E5FABAB FCC033C0 8ED88C03 FE45C6FC 7D892780 .'.)•6E±..Ä.ã3å•¨¨_^ù.ÅŠ..Ä.åVW. 000060
 7F802780 1E8BFCFB 8B5756C0 8ED88C02 EBD08C11 EB0C2780 06832780 1E8BFCFB «•...'...'.Š..ÅŠ..Ä.åVW.«•...'.. 000080
 DE8B5F0A B4E857FC 778B2534 268955CB 5E5F0C27 802E83A5 A5FC778B 007503FE ±.u..w•ÊÊ...'._^ûU.&4%.w•WÒÇ._.ß 0000A0
 8C02EBD0 8C11EB0C 27800683 27801E8B FCFB8B57 56C08ED8 8C02EBD0 8CE4EB5D ]Šõ.ÅŠ..Ä.åVW.¯«•...'...'.Š..ÅŠ.. 0000C0
 5E5F0C27 802E83A5 A5A5A5FC 778B0F75 07FE7F80 27801E8B FCFB8B57 56C08ED8 Ä.åVW.«•...'..±.u..w•ÊÊÊÊ...'._^ 0000E0
 27800683 27801E8B FB8B5756 C08ED88C 02EBD08C E9EBDF87 F78B19E2 EBDF87C8 ù.ÒÒã..%.ÒŠÒ.ÅŠ..Ä.åVW.«...'..¯' 000100
 A5ABFC0C 27802EB3 FE478AF3 8827801E 8BFB8B57 56C08ED8 8C02EBD0 8C10EB0C .Š..ÅŠ..Ä.åVW.«...'.µ.G±...'.•¨E 000120
 9F2A1E2E 9B9A48EB 3960BA39 5B8850EB 39378A39 2D8BCB5E 5FA5A502 74033CA5 Ê<.t.ÊÊ_^ù¦-9¤79ŠP¦[9¤'9ŠH....*. 000140
 5DE89004 EB0B98E8 900AEB0B 4AE89010 EB0B48E8 36E82E42 8A2E3CB8 22C42688 .&ó"¦<.¤B.ŠóÒK.Š..ÒJ.Š..Ò..Š..Ò] 000160
 8A2E48B8 22C42688 9F2E2D2E 9B9AC30A F700D283 D8F70773 589E22C4 268A500B .P.&ó".Xs.%Ä.Ø.%Öû...-...&ó"¦H.¤ 000180
 FF047508 748B030A 7C802780 36890CEE 83278036 88515325 34268955 57562E4E N.VWU.&4%SQ.6.'.Ÿ..6.'.|...t.u.. 0001A0
 F6087403 F8801375 7F01F6FF 32FE5D8A 27803E8B 57CB5E5F 5D5B5902 FF02EBD0 ÅŠ..ØY[]_^ûW.>.'.]±2.-..u..«.t.- 0001C0
 FE5D8A27 803E8857 CBF9CBE4 0803755F 8001F6FB 7480FF41 F6CB5F08 75F0FF41 A.Þu._û-Ä..t½-.._u..ðû¹ûW.>.'.]± 0001E0
```

Dump of file SATURN:[PCCOMMON.DUMP.DLL]DMLGLOB.TMP;1 on 18-APR-1990 10:44:56.67
File ID (627,22,0)   End of file block 315 / Allocated 316

Virtual block number 270 (0000010E), 512 (0200) bytes

```
89CB5E5F 803180FF 320875F7 38FC7588 FE508A27 803E8857 56CB5F7F 2180FF32 2..!._ùVW.>.'.]±.u=;%u.2..1._^ù. 000000
56CB5E5F A880F480 ADA5A5CB 5E5FAB80 F480AD08 7503F880 A5FCC18E D98CFC7D )=.).Ē=Ē.«.u.Ù.¶.¨_^ùEEÙ.¶.¨¯^ùV 000020
5602EBC0 8ED08C57 5676EB00 0888F388 575604EB 186EE857 5602EBC0 8ED08C57 W.Ä.åŠ.VWòn.Š.VW.µ|..ŠvVW.Ä.åŠ.V 000040
575604EB 183EE857 5602EBC0 8ED08C57 565EEB00 0488F388 575604EB 1856E857 WòV.Š.VW.µ|..Š^VW.Ä.åŠ.VWò>.Š.VW 000060
562EEB00 1488F388 575604EB 1826E857 5602EBC0 8ED08C57 5646EB00 0C88F388 .µ|..ŠFVW.Ä.åŠ.VWò&.Š.VW.µ|..Š.V 000080
5602EBC0 8ED08C57 5616EB00 1088F388 575604EB 180EE857 5602EBC0 8ED08C57 W.Ä.åŠ.VWò..Š.VW.µ|..Š.VW.Ä.åŠ.V 0000A0
FC7D8710 7407FE7D 80C18ED9 8C27803E 88D88B00 0088F388 575604EB 17F6E857 Wò-.Š.VW.µ|...Ä.>.'.).ê.)±.t..)= 0000C0
57560FEB 27803E88 F7881801 E82602BF 02C383CB 5E5F5D22 A897FF25 34268955 U.&4%..´"]_^ù.û.¢.&ò...%.>.'ŠòVW 0000E0
575602EB C08ED08C 575676EB 000A88F3 88575604 EB17C5EB 575602EB C08ED08C .Ä.åŠ.VWòé¯Š.VW.µ|..ŠvVW.Ä.åŠ.VW 000100
88575604 EB1795EB 575602EB C08ED08C 57565EEB 000688F3 88575604 EB17ADEB òÙ.Š.VW.µ|..Š^VW.Ä.åŠ.VWò..Š.VW. 000120
57562EEB 001688F3 88575604 EB177DEB 575602EB C08ED08C 575646EB 000E88F3 µ|..ŠFVW.Ä.åŠ.VWò).Š.VW.µ|..Š.VW 000140
575602EB C08ED08C 575616EB 001288F3 88575604 EB1765EB 575602EB C08ED08C .Ä.åŠ.VWòe.Š.VW.µ|..Š.VW.Ä.åŠ.VW 000160
1748E856 057407FE 7D80C18E D98C2780 3E88D888 000288F3 88575604 EB174DEB òM.Š.VW.µ|...Ä.>.'.).ê.)±.t.VòH. 000180
0000BB00 EB0014BB 12EB0010 BB17EB00 0CBB1CEB 0008BB21 EB0004BB FF39E95E ^ö9.£..Š!£..Š.£..Š.£..Š.£..Š.£.. 0001A0
890CEF83 287407F2 7D803974 07FE7D80 27803E88 57560018 BB03EB00 1CBB08EB Š.£..Š.£..VW.>.'.)±.t9.)·.t+.ÿ.. 0001C0
FF253426 89553E73 18F8832F 731CF883 087D88FC 7D89FC75 8BC08ED8 8C27803E >.'.Ä.å.u=.)=.)..«.s/.«.s>U.&4%. 0001E0
```

Dump of file SATURN:[PCCOMMON.DUMP.DLL]DMLGLOB.TMP;1 on 18-APR-1990 10:44:56.67
File ID (627,22,0)   End of file block 315 / Allocated 316

Virtual block number 271 (0000010F), 512 (0200) bytes

```
E827803E 890CEF83 C47407F2 7D8002C3 83CDEB16 D8E802C3 83CB5E5F 5D22A897 .´"]_^ù.û.òÙ.Šë.û..)·.tá.ÿ..>.'ò 000000
2689550C 27802E83 CB5E5F5D 22A497FF 25342689 550C2780 2E83F787 BFEB16C6 6.Š¢¯%...'.U.&4%..Ê"]_^ù...'.U.& 000020
32DF02E7 D0FB8AE3 D0E3D0CB 9E5E5FE0 0AE4D0E8 D1410025 9F5D22A8 97FF2534 4%..´"].X.AìÒAð.Å_^.ùÄDÄD.«AÒ.Ö2 000040
FE448905 87AD0005 B9FB2BFE 884E4E27 803688FC C08ED88C 5756000C 8B03EBFF .Š.E..VW.Ä.å•.6.'ÑN.±+«¿..Ù...D± 000060
5DE5885E 5F164DE8 037407FE 7D802780 3E885756 EC8855CB 5E5FF4E2 47471D88 ..GGã¶_^ùU.ŠVW.>.'.)±.t.ÒM._^.[] 000080
14C2E855 22D08EA5 36A536A5 36A53622 D08F0676 8DC08ED8 8CFC5756 EC8855CB ùU.ŠVWē.Ä.å.v.¢Å"6E6E6E6E/Å"UÒð. 0000A0
8C22D806 45C70440 89025589 1D89FF32 22C68FAA 91A4F391 98ACC888 22D88F5D ]¢Ä".à¯..µÊ.´¢ó"2....U..M.ÚE.Ä". 0000C0
A1CB5152 E38B0572 22F01E38 0872D82B DC885A59 CB5DE588 5E5FC788 DA8C085D ]..Ö.ú_^.[]ùYZ.É+Är.;.Þ"r..DRQùÄ 0000E0
1653C488 50872305 A780D488 5200028B 22EC2EFF 5152EE6E E9C03305 754022EC ŝ"ǝu.3ŝÒnŸRQ..ŝ"E..R.å.Ĭ.#ñP.éS. 000100
4823058F 08088106 75000230 07740001 3D408112 7558C008 00002343 9A521650 P.R.C#...åXu.Ÿ@=..t.=..u.Ÿ....#K 000120
C28C27C8 06C4EEA2 E9037327 C01EFFDB 33C28C27 C406C41E E327C20E 8B5AD479 yåZ..ð'D.é.á'.ó3Ù..å's.ÕÅYé.à'.ð 000140
74278E3D 27BA8800 73E8278A BF27B68E 007CE827 CCBF27CC BE27C01E FF00038B Ē....à'/ä'¢ë'Ò|./Ñ'¢¤'Òs.¦¤'=/'t 000160
6A006A03 6A0051E8 27BEBF27 8ABED88E 20D888C3 0000FFFF 9A325D68 0E016A08 .j..h]2.....ûjÅ .Ä/¤'¢/'ÒQ.j.j.j 000180
EC885503 EB0031E8 27BEBF27 8ABE003A E82ADABF 2ADABEEC 88550000 32589A00 ..X2..U.ŝ/Ö*¢Ö*Ò:./¤'¢/'Ò1.Ŝ.U.ŝ 0001A0
0E880000 FFFF9A50 06468A50 C033001A E827CCBF 27CCBE00 23E827CC BF27CCBE /ä'¢ä'Ò#./ä'¢ä'Ò..3àP.F.P....... 0001C0
00C3EEEB 1DFFF274 02450805 8804EF83 0E73F738 C327C01E FF00028B 07E327C2 ð'D.£....â'û;%s..ÿ....E.t·..ŠŸû. 0001E0
```

Dump of file SATURN:[PCCOMMON.DUMP.DLL]DMLGLOB.TMP;1 on 18-APR-1990 10:44:56.67
File ID (627,22,0)   End of file block 315 / Allocated 316

Virtual block number 272 (00000110), 512 (0200) bytes

```
89F25689 F04689C0 280C6416 8800F0E9 03750C64 3639FF28 F6285657 000014C8 à...WV+-+.96d.u.Õþ...d.+á.Fþ.V·. 000000
FE814619 74C0080A C4833344 36E49A10 6E681EF6 76FFF876 FF0C6AF8 5689F646 F-.V½j..v½.v-.hn..ö6D3.á..ât.F.± 000020
003F8026 F646FFF6 5EC40CEB 47EA7500 3F8026F6 46FFF65E C4008CE9 03767FFF ..v.Ö¥.á^-.F-&.?.uõGŠ.á^-.F-&.?. 000040
56EE5689 EC468904 C4833353 35D69A04 6A500145 8D8A7500 3F8026F6 5E88F475 u¶.^-&.?.u¤.E.Pj..ø5S3.á..Fŝ.VŸV 000060
EC468866 74C208FC 46886074 EE4608EC 4688FE56 89FC4689 02C48333 8925F99A .'%.3.á..F=.V±.Fŝ.FŸtm.F=.ðtf.Fŝ 000080
C0080AC4 832E6536 E49A106E 681EF076 FFF276FF 0C6A2500 16892508 A3EE5688 .VŸÈ.X...%j..v·.vþ.hn..ð6e..á..å 0000A0
C4078A26 F046FFF0 5EC404EC 46830257 89260789 26FE5688 FC4688EC 5EC42C74 t,á^ŝ.F=.V±&..&.W..Fŝ.á^þ.Fþ&..á 0000C0
3F8026F0 5EC4F475 003F8026 F046FFF0 5EC4E8E8 0E74C00A 078826FC 46FFFC5E ^=.F=&...åt.ŠÒá^þ.Fþ&.?.u¶á^þ&.? 0000E0
47F626FA 5EC41CEB F628FC5E 8CFA4689 107C8856 000006C8 90C8C95F 5EA77500 .uÏ^_èù.à...V||..F*.^•+-Š.á^*&-G 000100
FA463922 6C168822 6AA10CFA 46834601 744004C4 83330409 6C9A5306 0E74830A ..t..S.l..3.á.àt.F.F*.Åj"..l"9F* 000120
8B5756EC 8855C85D E58801FE 4F800474 D808065E 88EC8855 90C8C95E C688D876 vÅ.á^èù.U.ŝ.^..Ût..O±..]jùU.ŝVWE 000140
96251AA3 2518A3FE 244024EB 99C03305 750176E8 0005B807 1E297500 3F832518 .%.?.u)..¡..Òv.u.3á.Š$@$±Ê.XÈ.X. 000160
CB5DE588 5E5F0009 E8C08ED8 8C064E88 251E3689 FFFEFE44 C704C683 000104C7 ú....ó.úD±±..6.X.N..Ä.åò.._^.[]ù 000180
D0881573 C13B4843 7401A8FE 8BADFC02 7788F273 EEF983FE E180FA74 41000DE9 ÕÅ.At*.Å±.'Ÿs·.w.=Ù.±´.tCH;ès..Å 0001A0
8948C128 FE4C89F9 030C74FE 8BE6E8FE 4489F788 000205C2 03357401 A8ADF003 .þÙ´.t5.ò....%.D±Šl.±t..'.L±+ëH. 0001C0
2A06C626 C3027F89 25261E8C 260574D1 3B325EB9 DA8CC688 FE4CFEF9 0305EB05 .Š..'±L±.6.Ö¿^2;ìt.&..&%...ùL6.* 0001E0
```

Dump of file SATURN:[PCCOMMON.DUMP.DLL]DMLGLOB.TMP;1 on 18-APR-1990 10:44:56.67
File ID (627,22,0)   End of file block 315 / Allocated 316

Virtual block number 273 (00000111), 512 (0200) bytes

```
E27401A8 ADF0030u 888C73C1 3B48FE88 F27401A8 ADF003FE 882574FF FE300225 %.=±.t%.±.ÞÙ¯.t¨.±H;ès¥.Å.ÞÙ¯.tã 000000
D88C1274 252A0EFE 2615E8D8 8E0474C0 08084788 E6EBFE44 89F78800 0205C203 .ô....%.D±Š].G..ât..AŠ.&±.*Xt..Â 000020
40400124 0074C638 0068E8C0 33067788 88E83788 25221E8E 260574C7 3834BD8F @§4;út.&.."%.7ŠÈ.w.3àÒk.;ót.$.ªª 000040
2526A326 0474C138 3511B908 8C98EB4E 4E960574 0010E8FE 40FE0074 005FE898 .Ò_.t.±M±Ò..t..NNŠ..Á¿.5;èt.&È&X 000060
04762528 1638267F FFBA4141 49C82B03 7401A8FE 458B51C3 99C03302 47890788 ...G.3à.úQ.E±´.t.+àIAAo..&;.(Xv. 000080
33E575EA D102F708 75000CE8 C628C223 D2F70D72 C2031572 C603C188 F575EAD1 lõu%.è.ór..ôr.%Ø#ö+6Ò..u.%Øiôul3 0000A0
55894AD7 28068806 7789FFFE FE44C7F2 03F088FE 88571874 001DE851 52C359C0 àYÚRÒÒ..t.W.±.Þ.¨úD±±..w..ø+aJ.U 0000C0
5A‡FFFFA 8308C483 33F9362E 9A1F0650 00018850 52521ED2 335053C3 5A5958FE ±XYZÚSP3Ø.RRP¦..P....6‡3.Å..*..Z 0000E0
FA5689F8 46893603 2ACC9A06 76FF006A 0876FF00 6A560000 0AC8C3D2 0802Z45B (t..Øúà...Vj..v.j..v..a*.6.F%.V* 000100
D00BFE56 89FC4689 02C48336 1C25F99A 56F87688 902FEB99 C0280674 FFFFC2F7 %ô..t.+à.$/..v%V.*X.6.6..F=.V±.Â 000120
885590C8 C95EFE56 88FC4688 9007EB08 C48335C6 295C9A50 FE76FF00 6A561274 t.Vj..v±P.\)65.Å.Š...F=.V±^èù.U. 000140
6C36884C E8277200 57E80775 48064688 08568B0C 6C8F3875 000A7E83 065756EC $VW..~..u8«l..V..F.Hu.ÒW.r'ŠL.6l 000160
02080473 106CFE81 04C68334 735E003E E8560E46 89024488 0074F738 11744810 .Ht.;%t..D..F.VÒ>.^s4.6 .±l.s..Ø 000180
5C891489 E675C085 F95B0000 FFFF9A50 C0335016 52C48850 21E899FF FF880675 u.¦...$ÍP.ÅR.P3äP.....[*.éul...\ 0001A0
6CFE8104 C6830C74 024C39F7 880E4E88 C850E588 5E5F07C0 33038810 6C368902 ..6l..Æ3á._^.]]ù.N..%9L.t..6..±l 0001C0
00FFFF9A 51531373 3C661E39 0675F738 C18ED388 26721C03 DA882CEB F9F27510 .u·*$,.Ö..r&.Æ.è;%u.9.f.s.SQ.... 0001E0
```

Dump of file SATURN.[PCCOMMON.DUMP.DLL]DMLGLOB.TMP;1 on 18-APR-1990 10:44:56.67
File ID (627,22,0)   End of file block 315 / Allocated 316

Virtual block number 274 (00000112), 512 (0200) bytes

```
8827E30E 4E881E56 57EC8855 00C30188 0487920C 66168904 75F738DE 75C08500 ..âuß;%u...f.....lû.U.$WV..N.0'. 000000
0477FF45 3A26C933 FF448AA6 F30A76C5 FE88C803 D9F7AEF2 C033F788 067EC4D9 1á-..%3à·Ù%1.ù.±év.µ].D.3è&:E.w. 000020
3CACDB33 99C03306 76C51E56 57EC8855 00C85DE5 885F5E1F C1880 1F7 49490474 t.ll%l.è.^_.|]ù.U.$WV.év.3á.3U¯< 000040
88CB88D2 D1E3D110 72302C1F 77393CAC 0175283C 04742D3C 50F77409 3CFB7420  t«<.t%P<-ť.<+u.¯<9w.,0r.1D1Ø.ù. 000060
F7000283 08F70775 93203C58 DCE8000Z 83080307 13090302 D1E30102 D1E301FA *1D1Ø1D1Ø.1.m.Á.Ø.ŠÉX<-.u.%Á.Ø.% 000080
E588031B 0A4628E8 D3EAD3FF FF890C5E 88085688 064688EC 8855CB5D 5F5E1FDA Ö.^_]ùU.$.F..V..^.¿..Æô&Š+F..Æ.| 0000A0
81803130 253006C7 12E88380 33302530 06C71CE8 84803430 253006C7 0008CA5D ]ò.¯ú.0%04¯.$.ú.0%03¯.$.ú.0%01¯. 0000C0
2A323125 3006C706 758C3C25 FE1EFF04 74002600 3E838A80 30312530 06C708E8 Š.ú.0%10¯..>.&.t...±%<.u.ú.0%12* 0000E0
FFE40525 32A137DF 21029A50 00FD8837 D748069A 252C8835 E820A89A 2532A3E4 ôÉ2%.´ ÒŠÉ,%..Hø7¦».P..1Ò7Å2%.ô. 000100
7F80C2F7 C0330254 880C88FC 27803E88 C337F432 769A2532 36FF37E8 21029A50 P..1Ò7.62%.v2¶7ù.>.'•...Ī.3ä%ô.. 000120
89000005 C73800C2 818FE680 08D10901 FAD10801 D9D1FAD1 08D10901 FAD12974 t)1*111Á1*111Á1*111Á.|..ô.8ú.... 000140
8AADD48A C80AADC8 88ADFC27 803E88EA E8D08AC8 88C3F788 06558904 40890245 E..M..U..%ù.à.ÁŠô.>.'«Ù.àU.à.àU. 000160
22EC8AF9 0A808101 CA800374 CD0AD301 E2010301 E2010301 E2D1F88A ADDC8AF0 Þ.ÉÙ.%Iãlæiãlæiãlæ.ët..ò.Ÿ..*.$" 000180
80107401 C6F61572 0777D13A E001E001 E0013872 38002D30 7747E03D 7FF025E9 ÒXÞ.=ÁGw=-.8r;ÍÁÍÁÍÁ:Íw.r.-ó.t.. 0001A0
8AE38A02 4589E50A C70A7FE7 801674C0 0817747F 80300080 05087300 D38301C6 6..Æ.s....=..t..ât..Ò..ú.Ì.E..D. 0001C0
33008810 E8C38800 880A8802 33C3F788 02458905 89C033FE D8E9C3F7 880589C6 6...%úÒÙ±3à...E..%ù3Ø.Ò.Á.ùŠ..Á3 0001E0
```

Dump of file SATURN:[PCCOMMON.DUMP.DLL]DMLGLOB.TMP;1 on 18-APR-1990 10:44:56.67
File ID (627,22,0)   End of file block 315 / Allocated 316

Virtual block number 275 (00000113), 512 (0200) bytes

```
9EB48024 C48A000B 830AF708 F70779C0 08C388D0 880A8811 E8DAF715 79D20BDB Ù.Øy.%ÒŠ..Ò.Á.ù.ây.%Ù%Ò.Ù..6$.Ç. 000000
08C388C8 880A8811 E8D9F715 79C90B08 33C88810 E8C388C8 880A8802 330474E9 Ôt.3Ø.Ò.à.ùŠ..à3Ù.èy.%1$..Ò.à.ù. 000020
002BE800 E8003AE8 0785E985 60800233 FF338024 C48A0008 8309F708 F70r ?C0 ày.%Ù%1.Ù..á$.3.3Ø§'.Òç.Ò:.$.Ò+. 000040
5DE808E8 003EE800 E8009CE8 C3C8D167 75000283 C0010026 E803E800 35E80. 8 $.Ò5.$.Ò&.1ä.Ø.ugiàùÒ..$.Ò>.$.Ò] 000060
08C93300 41E803E8 007BE808 E8002CE8 00E8002C E8C34E75 02080039 E803E8U0 .$.Ò9..ØuNúÒ,.$.Ò,.$.Ò(.$.ÒA.3è. 000080
E803E800 56E8C3CA 01217500 0183C201 00018300 0283F508 F7D2F7D1 F70079FF .y.%1%Ø%A%.Ø..1.1ò.Ì.ul1òùÒV.$.Ò 0000A0
92AD00A4 E9FDE9E9 C3017200 0283C313 D813F581 F980CD0A E82201B5 D833001C ..3Ùç."Ò.ë.*.%.Ù.û.Ø.r.ùÒÒ»ÒÈ.Ù. 0000C0
08E901E9 D1E901E9 D17FE580 10CE80F1 220F86F9 8808EE83 91AD91AD 93AD060A .øÙ.Ù.Ù..Ÿ..*Ñ."þ.ö..|.1Ò1Ò1Ò1Ò. 0000E0
C186ACC8 8AADF88A ACDA8AD2 332FEB25 E983CA7F 20F98378 7203FEE9 810874C9 ètÁ.Ò±.rx.* .ò.Ò%$/3Ø.Ò¯.%Ù.à¯.è 000100
83997F20 F9834772 7EE98040 74C908DC D0F90100 E4007FE1 83F988E9 8A04EE83 .Ÿ..Ò.*.Å.ÁÒÁ1*ÁÉ.ètM.Ò-rG.* ... 000120
E980F632 E68AC48A F88A0F8A D30A01E2 80020 0F5 01FA801A 7C08F980 D9F720E9 Ô %1.*.|..*.%ÁØ.ã..Æ.Ò.%.6.12-.Ò 000140
C388008B CA8AF3E2 0002800A D00801 08 D1EED000 DA8001B2 01FA8015 E3E1EB08 .$ÃD..*.ý..Ò.ÁYÍÁÍÙÁÒ.Ø.ãµ.ò.Á.û 000160
EF83067C 03278036 880131E8 07800068 E8FD35E9 C3D088C0 33000180 0081F9C3 û*Ÿ..Ì.3à.ÁùÒ5»Òh.¯.Ò1..6.'.|..ÿ 000180
80368801 08E80380 0087E8FD 0FE9C3FE 88067C89 E0737FF0 FA817FE6 80078810 ..ø.Ì..*Þ.sÁ.|..±ùÒ.»Ò..¯.Ò...6. 0001A0
27803688 001EE8C3 FE88027C 890F737F 80FA817F E6800788 0080EF81 027C0327 '.|..ÿ...ø.Ì..*..sÒ.|..±ùÒ...6.' 0001C0
8C27803E 88FCC3FE 88027C01 0080EF81 27803688 0053E8C3 FE88067C 0110EF83 .ÿ..|..±ùÒS..6.'.ÿ...|..±ù•.>.'. 0001E0
```

```
Dump of file SATURN:[PCCOMMON.DUMP.DLL]DMLGLOB.TMP;1 on 18-APR-1990 10:44:56.67
File ID (627,22,0)   End of file block 315 / Allocated 316

Virtual block number 276 (00000114), 512 (0200) bytes

 83064C89 CA0A0FE1 83F98806 4C880010 8A278036 88C08EA5 A5A5A5C1 8ED98CC0 å.).èEEEE.à.6.'ú...L..'.Å..ò.L.. 000000
 FC0082E9 3FE8D9F7 047D0433 E981E901 E901E901 E9D10035 887FE580 CF88F0E7 Óp.ü.|.¡5.iÕiÕiÕ.Õ3.).%!$?Õ..• 000020
 89CA0A7F E183F9u8 024C8800 808A2780 3688C08E A5A5C18E D98CC08C 27803E88 .>.'.à.).èEE.à.6.'ú...L..'.Å..ò. 000040
 7CEF88C8 38D9F748 7D0096E9 81ED32C0 8AE10100 18887FE5 80CF8880 E783024C L..Ó..ü.|.¡..1Å.è2Ü.Õ..)H%);à.ý| 000060
 F501FA80 147C08F9 800233EA 288000E5 81EF88C8 880A74C8 38FA0880 00E78114 ..Ó...";àt..à.ý.|..+õ3@.'.|..'.% 000080
 2C88E822 EE8AD7C1 8A25368B 0CE3348A E7E84608 E9800004 C6140A00 D28000B2 ý..@...ó...Õ.FSÓ.4D.£6%.èa.Ÿ"Ò., 0000A0
 81FA8003 0ADE2207 0AFAE207 00EAD106 E3E18AEF 8A0001B8 C3348A01 88C933C3 ù3è.).4ü£...ý.ÅD.1õÅaã'.a"8.Æ.'. 0000C0
 00148046 06E33488 F202CE28 C8039827 800E88E2 D3CC8AFD 88027400 DA8001B2 ý..Ö.t..».àÆã...'..à+ö.·.4D.F... 0000E0
 7F80A902 5D882602 4488C3E4 D07FCC80 F8C8E9C3 F5D3D14C 747F80C3 F7C3FAE2 ã'ú%ü..tL1Æ%üÕà«.ä.ÅÒü.D.&.].`.. 000100
 73E0D1E3 D1D578EF 32EC8AD8 74D3F77F 80C3F7D3 F7E274D0 F77F80A9 D0F7E174 tÅ%Å`..%Åtä%Æ%ü..%ÆtÅ.š2ýx(iDiÅs 000120
 C3F5D3D1 5E747FF. C3F7C305 38260488 0575C338 DA8EC18E D98CC28C F787930B ...%.ó.).è.Ó;úu...&;.ú%úp.t^1Æ%ü 000140
 D3F7E274 D0F77FFü A900F7E1 747FF0A9 06508826 064488C3 E4D07FCC 80FB75E9 Óu«.ä.ÅÒü.D.&.].`Þ.tÅ%Å`Þ.%ÅtäÆ%Æ 000160
 38DA8EC1 8ED98CC2 8CF78793 0873E0D1 E3D1D578 EF32EC8A D87403F7 7FF0C3F7 %úp.%ÆtÅ.š2ýx(iDiÅs...%.ó.).è.O; 000180
 02458BF7 87C3053B 26048805 7502453B 26024488 0E750445 38260444 881775C3 úu..D.&;E.u..D.&;E.u...&;.ù.%.E. 0001A0
 81FF00E7 8101748B FF7C8802 4C8880CF 80008235 8A015D88 02458803 E880F480 .¶.Š..E..]..5ý..ü..L..|..t..Ó... 0001C0
 7718FC80 DCF6E52A 91FA87F3 870573EC 3A5B74E4 0A6574ED 0AC0D1C1 D18000CE ö..1èiä.Üte.ôt[:šs..µ.'.'|-É.•.w 0001E0

Dump of file SATURN:[PCCOMMON.DUMP.DLL]DMLGLOB.TMP;1 on 18-APR-1990 10:44:56.67
File ID (627,22,0)   End of file block 315 / Allocated 316

Virtual block number 277 (00000115), 512 (0200) bytes

 E9800833 D38801C8 80037402 08127C0E F98055E3 00B5CD8A 91D900E8 D0C90049 1ÅèÅÒÅ)..èç.DU.'.|..@t..ù..Æ3U.Ó 000000
 23741777 08E980FD 8ADF8AF3 8AD68A01 CE800374 D20A287E 05F9803E 74107210 .r.t>.'.-+.@t..ö..@.µ.Ó.».Ó.w.t# 000020
 D1E8D120 CA800374 3FC2F600 97E9E800 C1880788 DE8819E8 F875C1FE D3D1E2D1 1ä1Æ±èu%$..8.@.êÅÒÕ..-ô?t..ò iŠ1 000040
 4575FFFC 80C4FEDA D1D8D150 73DE1307 031470E0 D020CA80 03743FC2 F6FAE2DA Ôä'-ô?t..ò ÅÅp..@.8sPiÜiÖ±á.•.uÆ 000060
 6A7610EC 800875D8 08D0F600 D383F50A F7D3F70A 73DE88D7 88F318FA 28FA41E9 ÒA'+'.µ.@.8s.%Æ%Ó%.Æ.-Å.Üu..$.vj 000080
 D14B74CC FE0A78FF 0AD232F2 8ADE8AF8 8A5B7608 EC800F75 FF0A6474 D8080A87 .Ó.Ütd..u..$.v[.«.8.·2@..x.±ätKi 0000A0
 D38301C6 800F7401 C5F61472 077780FA 80017CE9 03740025 3E3E80F6 71D3D1E2 ä1Æq-.>>X.t.Ó|..'.w.r.-ó.t..ó..Æ 0000C0
 45892780 3E88C70A 7FE78080 2417747F 80A9D801 E0D03A74 FFFC80C4 FE077300 .s.±á.•.t:ÅÅ1Å`..t.$..Ó..ú.>.'.E 0000E0
 88058902 45892780 3E88C033 017EE903 7400253E 3E80C3F7 880589C6 8AE38A02 ..D.ó...%ü.>>X.t.Õ-.3ä.>.'.E.... 000100
 88C874ED 0A09D0E1 01024088 D674E40A D8D0E0D1 963488AD FCF990E9 E679C3F7 %üý1Õ.'•Ü.4.1ÅÅÅ.ôt@.M.1ÅÅ).Ütü. 000120
 8080C880 EF8AFF32 50CD74FF FC8080C4 800370E5 027FED80 80EC80C1 32D8883D =.Å2è.$..Ü..|pÆ.á..•.teP2..ý.ü.. 000140
 13D803E6 F7C188FA 88000283 D803E7F7 C588509F C008DA88 E7F7C688 E88880C9 è..$.6%Ó.Ó.à.P.é%Ó.Å.@..'.è%|.Å. 000160
 69E90A75 E40AD3D1 E2D10878 FF0A5893 D388C703 E1F6C588 01C88003 749E58FA 'X.t..ù..é-Å.ú.Æ.X..x.1ä1Æ.ôu.Õi 000180
 0A5C74ED 0AD8D0E0 0102448B D9D0E1D1 024D88F7 87FF1AE9 AD74FFFC 80C4FEFF .±á.•.tÜÕ...%.M.1ÅÅ).D.1ÅÅÅ.Üt\. 0001A0
 015D88FF 78E90375 FFFC8080 C480FF78 E90371E5 2A7FED80 81EC80C1 320874E4 ôtÜ2è.$..Ü.'|q.Õ(..á..•.u.Õx..}. 0001C0
 CE80C032 248A0154 8850253E 3E020901 E8D10874 00253E3E 8080CF80 C93220BA .·2è.ü..>>X.t.1$1).>>XP.T..$2ä.ö 0001E0

Dump of file SATURN:[PCCOMMON.DUMP.DLL]DMLGLOB.TMP;1 on 18-APR-1990 10:44:56.67
File ID (627,22,0)   End of file block 315 / Allocated 316

Virtual block number 278 (00000116), 512 (0200) bytes

 D338F880 E9FF76E9 DD8801CA 800374D6 88C20800 11E8EE88 001AE8D8 D1EAD180 .1ó1AÒ...ŸÒ...ò.@t..ò..iÕv.Õ¬½;Æ 000000
 8EC3F973 0313C103 4E077307 88FA18D8 F7E1F7C6 88FA8815 E3C03396 F3F71D73 s.%µ.3àD..'.6%Å%Å.'.@s.N.ê.Æs'Ûf 000020
 0A3C77EC 3A0EED80 0774ED0A 25402E8A 00253E06 C6C3ED73 C188D003 C12BFFFF ..+è.Å.ésÜúó.>%...@%.Üt..Ü.:šw<. 000040
 25452780 06C7585B 5AFE4EE8 D8320233 52535025 41278006 C7278036 FF3874E4 ôt8.6.'ú..'A%PSR3@2ÜÒN±Z(Xú..'E% 000060
 C7278036 FF253EA2 02330833 C033FE33 E9278006 8F58585A FE0FE8FF 32525350 PSR2.Ò.±Z(X...'Õ3±3ä3U3@Å>%.6.'ú 000080
 1DE88000 F5810660 88F787D3 E82543A3 2541A3C0 33FE1AE8 52535025 45278006 ..'E%PSRÒ.±3äÊA%ÊC%Š%.%.m..%..$. 0000A0
 4488FC06 6D88C3FE 88278036 88A8E60A 80E6807F E480ADA5 A5A52780 3E88F788 .%.>.'ÉÉÉÜ.ó..|..|¨.6.'.±ú.m.•.D 0000C0
 C528C274 C008D686 95F78709 77E838E0 E583D274 FFE0250A D0E0D1DE D0E5D106 .11Å8iÅÅÒ%Å.t@.1Å;Òw..%..@.ätó+é 0000E0
 92C032E0 8AACF888 E086C0D1 C0D1C0D1 57DDD1E2 D0D0D1E6 D0897706 A03D08F7 %Å=..w¿Å1l1Åä11Wiäiä1ä.Å.%¯.Å2ä. 000100
 88C888D1 8801C980 0374D208 187C0EFF 836374FF 0810CC80 0FE480AD 93AD91AD Ü.Ü.Ü.ò..ä...tc...|..@t..è..1.ü. 000120
 E88AC08A F18AD68A 01CE8003 74D20A28 7C06FF83 23724874 E77710EF 83C033D8 Å3ä.ý.wÓtHr#...|+.@t..ö..@.þ.ë.$ 000140
 C2F6CF87 16E8F575 47D0D103 D1D1D1E2 D123740F 7708EF83 E432C48A F88ADF8A .Ó.%.á2ô.ý.w.t#1äi11Æ1ÅGu%$..ü-ò 000160
 3870E5D1 20CA8003 743FC2F6 975ECF87 F6E2DAD1 DFD1D8D1 E8D120CA 8003743F ?t..ò 1ÖiÜiÖiÖä-.ü^.-ô?t..ò 11p; 000180
 F7FE1358 9E581000 CE810FFF E6810574 88509F50 035C1301 4C133402 D8ú.¯5D1 1|ÅÅ.4.L..\.P.P.t..|...ö..X.X.±% 0001A0
 F6D800E5 D10088E9 F6ECE903 75E0FD83 20C5830A D1D901D8 D1DFD113 7420.'C7 ú. t.1ÕiÜi)iÖ.é .»Åu.Õš-Õ..i|ÅÅ- 0001C0
 D7F7D0F6 F6331373 FE1B9E10 00CE810F FFE6819F 05748803 5C18014C 18342?D0 Å'4.L..\..t...|...ö....±s.3--Å%a 0001E0
```

Dump of file SATURN:[PCCOMMON.DUMP.DLL]DMLGLOB.TMP;1 on 18-APR-1990 10:44:56.67
File ID (627,22,0)   End of file block 315 / Allocated 316

Virtual block number 279 (00000117), 512 (0200) bytes

40760200 ED811375 E0C7F618 75FF0800 04BEFCFE 130E13CE 13F5DAF7 D1F7D3F7 %Æ%Ì%Ö%.ö.ß.±•/....u.-úÂu..Ú..v@ 000000
FB8AC78A E08A9727 760100E0 8118751F E0C7F7E4 EBD233CA 88D988F8 8B3D744E Nt=.«.).ò3@SÒ%úÂ.u..Ú..v'..Â.ú.« 000020
EBEBD7D1 D301D1D1 E2017174 20ED8312 751000C7 F7970082 F28ACE8A E98ADD8A .Ï.Õ.ö.·ÿ..%ú..u..Ú tqiäÌÌÌ£Ì=$$ 000040
00018301 C6801A74 01C6F61F 72077780 FA800385 E9037400 25563E80 FC9065EB Še.•.>V%.t.Õ...ª.w.r.-ó.t..ó..Ì. 000060
E7808024 0E872780 3E88F788 3074E0FD 8320C583 08742000 C7F700D7 83000383 .Æ..■.%ú. t..é .»ÂtO.%.>.'.B$..Ô 000080
8805EF83 A8C688A8 C188AAC6 8A055D88 064589C7 0AC508C0 32E08622 74ED010F .ÌÚt".Â2ä.é.ú.E..)..ó¨.è¨.ó¨.ÿ.. 0000A0
FE88A8A8 A8A8F788 27803E88 C0330377 E9037400 25563E80 FCF5F0E9 0379C3F7 %úy.Õ»%•.>V%.t.Õw.3ä.>.'.%¨¨¨¨.± 0000C0
E9818000 2DE1D1E0 D1D0747F F0E181D1 33064D88 08747FF0 25D08806 4488FCC3 ú=.D..ÄXÞ.tU.M.3Ì.ÄÞ.tÄÌÂÌÄ-...Õ 0000E0
D8D0E5D1 5D01CA80 03740181 E850D8D1 E600B674 FFE03080 0005BC70 C1037FE0 Å..èpV...=Â.tÑÂÌÌÂPÒ..t..ò.)ÌÌÂÂ 000100
E9FF24E9 8874E0FD 8320C583 93E80A75 ED08D7D1 D301D1D1 E2010E75 1000C7F7 %ú..u.Ìäiii£Ì=.Úu.Š..é .»Ât.Õ$.Õ 000120
202DE1D1 E0019874 7FF025D0 33064488 EF747FF0 E181D188 064D88FC F787F58C .%.%•.M..Ì.ÄÞ.tÿ.D.3ÂXÞ.t.ÌÂÌÂ- 000140
AD92AD93 ADC932E8 8AAC5008 D1E60098 74FFE030 8000059B 70C1287F E0E98180 ..ÒÂ.+èp....=Â.t.ÂÌÌAP¯.Ò2èU.Ú.Ú 000160
C6FCA447 46A5A5AB 10CC800F E480ADFD 2554BF05 C683F788 509210CC 800FE480 .ô..ä..P.%.ó.¢Ì%»Ú.ô..ä. EEFGÈ=ó 000180
ADABD801 ADEDD1AB 25562602 E8D1E888 ADF78825 548FFD1F 74002556 3E800005 ...>V%.t.»¢Ì%.%Ú.ÒÌÒ.&V% ÌÚÚÌÂ Ú 0001A0
0033E857 0037E857 003BE857 003FE809 D1D8D1D8 D1EAD158 FCA8D801 ADA8D801 ÌÂ ÚÌÂ =XÌÒÌÂÌÚÌ)Ò7.WÒ;.WÒ7.WÒ3. 0001C0
DAD1D901 D8D1EFD1 08CA8003 7407C2F6 01CA8003 745F5859 D788C208 C108C308 .Ú.è.ô.=Y[_t..ò.-ó.t..ò.ÌÿÌÚÌÌÌÓ 0001E0

Dump of file SATURN:[PCCOMMON.DUMP.DLL]DMLGLOB.TMP;1 on 18-APR-1990 10:44:56.67
File ID (627,22,0)   End of file block 315 / Allocated 316

Virtual block number 280 (00000118), 512 (0200) bytes

75D2085C 730638FF 33255436 88FF08E9 DAD1D9D1 D8D1EFD1 DAD1D9D1 D8D1EFD1 ÌÿÌÚÌÌÌÒÌÿÌÚÌÌÌÓÕ...6Ì%3.;øs\.øu 000000
0674C008 2550A150 F288E7F7 0474C008 254EA1F5 88ED3397 52F6F73B 77F03804 .;Þw;%-R.3Ú.%ÂN%.ât.%Ó.·PÂP%.ât. 000020
95E81850 DD18CE18 DAF75A92 000283E8 03E7F708 74C00825 52A1EA13 F003E7F7 %Ó.Þ.õÂR%.ât.%Ó.Ò.Ò..Z%Ò.ö.Ì].Ò. 000040
1E18254E 0E284FC3 ED732554 16132552 06132550 1E13254E 0E034F13 73939192 ...▪.O..N%..P%..R%..Ì%sÚÙO+.N%.. 000060
100C0F24 E43206'' 8AC9E8F5 254E1688 C2132552 1E132550 0E032552 06182550 P%..R%..P%..R%.ô..N%%Šè.D.2ô$... 000080
CA88E888 E1F708' 0088911A E30C88E8 88D83325 4CA3100C 0F240645 8A254AA3 ÈJ%.E.$...ÈL%3Ú.Š..D....D.%Â.Ò.ò 0000A0
F70874D2 0815880E 74C00802 4488ED33 550A13C8 03E2F706 74D20802 55880488 ...U..@t.%ã.à.ÒU3Ú.D..ât....@t.% 0000C0
33EA1308 03E2F706 74D20802 55880074 C0080244 8850C108 5805D1DA 13C803E2 â.à.ÒÌÌX.èP.D..ât..U..@t.%ã.Ã.ò3 0000E0
0815880F 74C00804 44880101 EA130803 E2F70874 D2080455 880F74C0 080488C9 è...ât..U..@t.%ã.Â.òÌÌ.D..ât.... 000100
0588CA13 E803254C 26F70874 C0080488 50C30858 000183EA 130803E2 F70974D2 @t.%ã.Â.õ.Ì.X.úP...ât.%&L%.Ò.ò.. 000120
E803E2F7 0874020B 04558B0F 74C00802 4488D833 CA13E803 254A26F7 0874C008 .ât.%&J%.Ò.ò3Ú.D..ât..U..@t.%ã.Ò 000140
4588ED33 55000383 CA13E803 E2F70974 D2080255 881074C0 08044488 D3D1CA13 .òÌ£.D..ât..U..@t.%ã.Ò.ò.£.U3Ú.E 000160
08044488 DA13C803 254C26F7 0874C008 0244880A 13C80325 4A26F708 74C00802 ..ât.%&J%.à.Ö.D..ât.%&L%.à.Ö.D.. 000180
04458BEA 13D80325 4C26F704 44880501 DA13C803 E2F70874 D2080455 881A74C0 ât..U..@t.%ã.à.ÒÌÌ.D.%&L%.Â.õ.E. 0001A0
D1D7D1D3 D1D1D1E2 D15A97C5 03254C26 F6254AA0 EA130803 254A26F7 0874C008 .ât.%&J%.A.õ.J%-&L%.é.Zìãììì£ìaì 0001C0
0874F608 25573688 00255606 C6C3F608 5ED7D1D3 D1D1D1E2 D1D7D1D3 D1D1D1E2 ãììì£ìaìãììì£ìa^.-Úó.V%..6W%.-t. 0001E0

Dump of file SATURN:[PCCOMMON.DUMP.DLL]DMLGLOB.TMP;1 on 18-APR-1990 10:44:56.67
File ID (627,22,0)   End of file block 315 / Allocated 316

Virtual block number 281 (00000119), 512 (0200) bytes

C9330B33 57555352 51502559 278006C7 278036FF 4C74ED08 5077F538 04C0EE81 .Yå.;%wP.Utl.6.'ú..'Y%PQRSUW3U3è 000000
5A5B5D5F FBD1E8FF 33575553 52515025 61278006 C758595A 5B5D5FFC 3EE80233 3θÒ>▪_][ZYXú..'aXPQRSUW3.Òi«_][Z 000020
278006C7 278036FF 2556A2FF 33ED330B 330233C9 33C033FC 1AE92780 068F5859 YX...'7Ò.▪3ä3é3θ3U3U3.ÂV%.6.'ú..' 000040
0E5688D8 335756EC 8855C6E8 ABABABAB C0332559 8FFBF8E8 57555352 51502561 aXPQRSUWÒ%«¢Y%3è $6U.$VW3U.V. 000060
EC8B55C8 5DE5885E 5F0D8940 C9800573 0A763B00 278306C6 0028E801 278306C6 ó..'.Ò(.ó..'.;v.s..èã.._^.[]ìU.$ 000080
33408106 7664F983 0A4E88C0 8ED88CFC C85DE588 5E5F0006 E80E5E88 D2335756 VW3θ.^.Ò.. ^.]]ù=.Â.â.N.¹dv.Ÿ@3 0000A0
5525728F 064E010C 46880676 89257C8E 0A4E88D8 8EA4F325 7C8F0676 C527E8F6 -$'èv.e|%«È.Â.N./|%.v..F..N.er%U 0000C0
8A5653C3 DA8CC788 065D8904 45890275 890D8925 6A8F0A76 0306762B 5D0289E8 Ò¿.]+v..v.ej%...u..E..]..ú.ÒüSV. 0000E0
3B2E0488 02E88302 EE830005 890AC383 0AC68316 75C43A80 80250947 8A2E0964 d...G.%.:èu..6..ú.¿...Y..$....; 000100
D1F4E2DF D1D0D1DA D1D801E8 D1000589 FF33AD93 AD92AD95 AD56C35B 5EF3E107 .Âæ^[ùVÚ.Ú.Ú3.¿..ÌÒ1ÚÌÒ1Ì1Òã¶1 000120
FFFFFC66 C3084489 065C8904 5489026C 893C895E 03FE20D8 D1F50001 30D0D1E3 D1Ä=..%ìÚ-±.^.<.l..T..\..D.úf=.. 000140
5B40008B C0333001 44C60104 C625ECBE FFFDCCCC CCCCCCCC CCCD0000 FFFFFFFF ......eàààààààà».[$%6..6Ò.03ä.Åàl 000160
747FF0C1 F720837F 07648006 4C8B5EA5 F3000489 5725E08F FCC08ED8 8C06C307 .ú..Â.à=¢Â%W¿..µÈ^.l...d..° %èÞ.t 000180
4D10BAC8 8B3FFE05 ADF88A88 7480A8AC 25E78EFF 33FF78E8 532D8302 79C90806 ..èy.°-SÒ(.3./Ò%¯¨.tÈ.%Ü.±7.àö.M 0001A0
E08EDFF7 5713430F 8112F4E9 81FA13C8 03E7F69A 800713C8 03E4F64D 8091E2F7 %ä.¯M-ð.à.=¯.-Ò.à.°.Ò¶..ÒC.W%Ò/Â 0001C0
AD93AD92 AD95AD97 AD575F04 78E84636 88574709 725FFF13 E8462CB8 05EFE825 %Òy.£,FÒ..._r.GWE6FÒx._WÚ.Ú.Ú.Ú.Ú 0001E0

Dump of file SATURN:[PCCOMMON.DUMP.DLL]DMLGLOB.TMP;1 on 18-APR-1990 10:44:56.67
File ID (627,22,0) End of file block 315 / Allocated 316

Virtual block number 282 (0000011A), 512 (0200) bytes

```
D113E913 039AD68' 56C480F4 E2DCD00E D1DDD1DA D1EBD10C E3C033F7 8BD9F791 .%1.%3äD.iŠiÖi1iBÅÉä¶.äV.ø...Ö.I 000000
D6D1E4D0 D00003D1 02D1D5D1 D6D1E4D0 50565552 5351C032 00108925 EDBFD913 .1eÙ%¿..2äQSRUVPÅÖiøiÍiÖiÉÅÅÅÖiø 000020
D1D50106 D1E4D000 14D91359 D11359E9 1359F113 59E50259 D0D003D1 02D1D5D1 ÏÍiØiÉÅÅY.ÏY.þY.ÖY.ÏY.Ì..ÅÖiøiÍi 000040
5B5A0001 880C8825 EC8E12C1 83FCAEF3 FD308049 4FBDE259 AA3004D0 D003D1D2 øiÉÅÅ.O¨Yä§OI¨O»µÙ•.é./É%..¡..ZI 000060
FE0E8908 E8261027 8006C708 74127703 FB83088E 1EEC8855 4590088C C888C307 .û.à.Å.EU.$..Å.«.w.t.û..'.ßŠ...± 000080
8C2602BF F388C8F3 F60C8326 10202780 A1CB405D 1FE58802 ED83F826 00168925 %...ß%.Ù..Í.]MùÅ.'-.ß°.-µù.µ¢.ß. 0000A0
A5A5FCD8 8EC18ED9 8CC08C26 02BFF388 C326028E D98EA5A5 FCD88EC1 8ED98CC0 å.).è.Å=ÉÉ.\/.ßû.µ¢.ß.å.).è.Å=ÉÉ 0000C0
F7025488 0C88C033 FCFC7588 03E807FE 45C6FC7D 89FC7588 C326028E D98EA5A5 ÉÉ.\/.ßû.u•.)=6É±.Š..u••3á...Ï.% 0000E0
80044D89 02458908 D1D9D1FA D1D8D1D9 D1FAD1D8 D1D9D1FA D1058925 747F80C2 ò..t%..Ï°Ï)ÏÁÏ°ÏÏÏÁÏ°ÏÏÏÁ.E..M.. 000100
DC8B5301 578DE42A 078AC306 45890445 89024589 0589C306 55893800 C2818FE6 Ï..ô.8.U.û...E..E..E.û..°ô.W.S.É 000120
0185E8EF 88FF3307 8840C980 30C98058 CB580000 25A29A53 1650521E 510002B9 ¿..Q.RP.S.Å%..[ûX.è0.èã.ø3..ýÒ.. 000140
F8882790 26F7C788 50E07202 05E8F888 E172020C E8083327 901E8900 ACE9D833 3ÙÒ¯....'3ÙÒ..rÅ.%Ò..rÅP.ù%ß.'.% 000160
863E89FC 85E80873 000383F8 03588E72 0888C503 C4750208 27902EF7 C388EA88 .õ.ù%..'.øuá.é.År/X.%.ß.sÅŠç•.>. 000180
80037501 ADE89127 8EA3278A A3278CA3 C0332794 16892792 A327880E 89CE0327 '.ö...'È.'...'3äÈ.'È.'È.'.ÒÙ.u.. 0001A0
31740027 833E8012 74453C1C 74443C4E 417401FD E8D83300 E7E89F75 D80880CD ë..Ùu.ÒÓ.3ÙÒ».tAN<Dt.<Et..>.'.t1 0001C0
509F016C E8460000 279206C7 0EC98003 EB0402C9 814E2775 02742D3C 0674283C <•t.<-t.u'N.è..Š..è.ú..'..FÒl..P 0001E0
```

Dump of file SATURN:[PCCOMMON.DUMP.DLL]DMLGLOB.TMP;1 on 18-APR-1990 10:44:56.67
File ID (627,22,0) End of file block 315 / Allocated 316

Virtual block number 283 (0000011B), 512 (0200) bytes

```
80037418 72C1F706 75FF0B27 923E8808 F702759E 5840C980 037502C5 F60088E8 Ò..-é.u..èãX.u.%Ù.>.'..u.%èr.t.. 000000
880394E8 279ABE51 56507F01 90FF8127 943E2804 7510C5F6 278E3E03 F80330C9 è0.«.>.'-é.u.+>.'.....PVQ/.'Ò... 000020
F508F7D3 F7137480 C5F62798 1E882796 A138755E 5901ACE8 0027A406 C627863E >.'ó.É'.Ò¯.Y^uBÅ.'...'-é.t.%Å%Å% 000040
278C3E83 27A42E8A 08C98003 7607278C 3E838007 40800474 7FF00645 F7000383 .Æ.%E.Þ.t..M...>.'.v..è...É'.>.' 000060
CD80ED77 0CCCF881 177200E4 E80A2790 06C63FFF 88C301C9 80C302CD 80037500 .u..ë.û.è.ûÉ.7ó..'.Òð.r..«ë.wÙ.ë 000080
8AE85028 720006E8 D7880F88 EF88FF33 C3DFE80E 780803E3 D1E3D1C3 03E3D102 .1D.ûÏDÏD.ÅxßŠÒû3..ÿ.Ò.øÒø.r(PÒ. 0000A0
FF01CA80 0374C00A 007200B8 E8E57219 99FF8100 D7830005 83000383 D0035800 .X.Å.Æ..Í..ø.....rÏÒE.r..åt..ð.. 0000C0
08097580 00F8810F 7480C5F6 177480C7 F6167527 8E0608C5 08C788EE E8278E06 ..'$Ÿ.ú.é...'u.-ú.t.-é.t..«..u.. 0000E0
99FF811C 74C208C3 08C508C7 8827981E 89279616 8920C980 10C98006 EB0575D2 øu.Š..è..è ...'...'.ú.é.ú.ðt.... 000100
92279ABF F78856F6 E8002AE8 480678FF 08004088 F1E8278E 0EFF0025 E8097319 .s.ÒX....'Šþ¡ã...x.HÒ*.$-V.%¢.'. 000120
1358E813 58081358 00030008 E8000EE8 C2885355 57C35EA8 92A896A8 95A893A8 ¨.¨.¨.¨.¨^ûÅUS.ðÒ..Ò...ÅX.ÅX.ÒX. 000140
2C4A7400 4EE8C34E 46017528 3C06742D 3C087400 5EE8C307 01D5D1D3 D1E2D1F8 %ÏãÏÆÏÍÏøûÒ^.t.<-t.<+u.FNÙÒN.tJ, 000160
093C2A72 302C2074 2E3C3374 0037E81D E8397D27 90063A07 2C027E09 3C457230 0rE<.~.,.:..')9Š.Ò7.t3<.t ,0r*<. 000180
FF097510 C5F6F4E8 20C080C3 E432278C 06FF08CD 80278E0E FF0E7410 C5F62677 w&-é.t....'.ë....'2Òû.ë Š¶-é.u.. 0001A0
74093CEE 74203C10 74002782 3E80AC23 73278836 3BC3F94E C9EB10CD 80278A06 ..'.ë.ŠèN*û;6.'s#¯.>.'.r.< tŸ<.t 0001C0
8BAD95AD 91AD92AD ‘7C3C032 C35F2402 777A3C06 72613CE2 74003CE6 740A3CEA ð<.t]<.tä<ar.<zw.$_ù2äùÅù.Ù.Ù.Ù. 0001E0
```

Dump of file SATURN:[PCCOMMON.DUMP.DLL]DMLGLOB.TMP;1 on 18-APR-1990 10:44:56.67
File ID (627,22,0) End of file block 315 / Allocated 316

Virtual block number 284 (0000011C), 512 (0200) bytes

```
D7D1D5D1 D1D1E2D1 0005B8DF D1E8D1E7 D13E7803 FE05AD49 74C208C1 08C508F8 %.é.è.ôtlÙ.±.x>ÏÓÏÒÏÒÉ..ÏãÏÏÏÏÏø 000000
A9000780 C613FE13 EE13CE13 F58001FA 81F633D3 0AD92243 F075C8FE 07D00001 ÏÅÅø±ùùÞC"\.Æ3-.'..%.ö.Ÿ.±.ó.ø.` 000020
895FF788 F888E888 C888D888 C0330127 A40E800F E8000780 F57FF03D 0E74FFF0 Þ.t.=Þ.%.ø.Š...É'.3ä.Å.à.Ò.%.%_. 000040
08440108 47882EA8 F3C033FD 88000889 27A680C3 FF0A0645 89047589 02608900 ..ø..u..E...ù§Ï'¿...»3äµ¨..G..Ò. 000060
F10308C3 830F28D9 285653C8 88980404 D8F6C42A C42AE022 C7280004 880007BF ¢..¡..+ù"Å*ó*ó-Å....åSV+)+Ò.û..þ 000080
5EE6E202 C38302EE 83000456 833E0256 113E0046 013E27F7 2E048806 C683F728 +%.ó....%'>.F.>.V.>.V...Ÿ..û.ã|^ 0000A0
93AD91AD 97ADD10A 92ADCD0A C808ADC8 08AD91AD F5870EED 838C754F 02C58358 {.é.OuŸ.Ù..%Ù.Ù.åÙ.à.èÙ..ÏÙ.Ù.Ù. 0000C0
01FA81ED 33D508EF 230001BD D001D3D1 D1D1D7D1 E2D1084C FF0078C0 08F58BAD Ù.%.åx..L.ÏãÏøÏÏÏÆÏÅ§..#ÿ.Í3Ù.*. 0000E0
00C30644 89045C89 024C893C 89C508CD D1086C01 05D1C513 DD13CD13 FD13F580 .%.».ë.Ï.éÏÍ.Ï.Ïë.é.<.L..\..D.û. 000100
00000000 0E9C4000 00000000 000007C8 00000000 00000000 04A00000 00000000 .................à........ã...... 000120
49FFCFA6 D5006890 C5ADA828 70859E00 368E18C9 8F040000 000018BE 8C200000 .. Ÿ/......¢è..6..çþ+¨Ùé.k.ÍÏù.Ï 000140
CCCCCCCC CCCCCD03 534A7EE8 F89DF90E 8E01AA93 8A47C980 E98CE000 D5C2781F .xÒÏ.Å.Ò.èGo.¨..ß*.«Š-¨S.eääääää 000160
E6A8CC77 118461CE FDFFF3D1 871758E2 19652CFF FAA3D70A 3D70A3D7 0AFFFDCC ä»..æÉp=.æÉ*.,e.ãX.ñÏµ.»öa..wë¨] 000180
A1FF2CA8 7FEA27A5 39E9A5FF 96CFB11E A0453994 8AFFCBE6 9594BEC4 4DE15BFF .[ÅMá/..Ïù.o.9EÙ.Ÿù..ÉÒ9É'ö.¨,.Å 0001A0
830FF74C 49880579 FF084BEF 88FCAEC0 31432563 7A193AFE 57D00046 7C648CE4 ÒŸd|FÅÏWè:.zc%CÏâÙ=ÉÿK..y.ÉIL%Ò. 0001C0
05000332 AA010300 14C3ECE8 585FFE78 E85753F5 73EFD10D 74FF0B0A C3830AE8 Š..ù...t.ÏysXSWÒ(±_[Ššù....¨2... 0001E0
```

Dump of file SATURN:[PCCOMMON.DUMP.DLL]DMLGLOB.TMP;1 on 18-APR-1990 10:44:56.67
File ID (627,22,0)   End of file block 315 / Allocated 316

Virtual block number 285 (0000011D), 512 (0200) bytes

```
21000304 48010300 00002E35 46000200 00002C37 FD000200 07000332 72:*0300 ...r2......»7,.....F5......H...I 000000
37000223 2A020304 2F000223 01020300 26000336 CD010300 22000336 820``300 ....6..".. .é6..&....#../...*#..7 000020
49000223 C3020300 3C000319 8A010300 3A000324 82010304 40000248 1A02L304 ....H..a....$..:.......<...ü#..I 000040
87000337 83010,00 40000331 F4010300 48000324 1A010300 44000323 E6010304 ...|#..D....$..K...¶1..H....7... 000060
00000000 00000000 5C000320 1F010300 5B000320 32010300 88000329 8F010500 ....)......2 ..[.... ..\........ 000080
6F43202D 20797261 7262694C 20656D69 542D6E75 5220534D 00000000 00000000 ........MS Run-Time Library - Co 0000A0
70726F43 2074666F 736F7263 694D202C 38383931 20296328 20746867 69727970 pyright (c) 1988, Microsoft Corp 0000C0
00640088 271A005E 00000001 005804A2 27EA0052 044327E9 004C0568 27EB0011 ..$'k.L.Ò'C.R.ð'Å.X.....^..'..d. 0000E0
27EA0082 0496271E 007C0437 27E90076 05FF27EB 00000000 0000FFFF 021227E6 |'..........$'..v.Ö'7.|..'....ð' 000100
06FC0002 00A00206 27E6009A 0660271C 0094007C 271A008E 00000001 00880536 6..........'|....''...|'......•. 000120
00C400CC 2713008E 00662712 00B80000 27110082 023C2710 00000000 0000FFFF .........'<.y..'..|..'f./..'ä.å. 000140
271900E2 02F32718 000C028D 27170006 01E72716 00000198 271500CA 01322714 .'2.ò..'..Å..'ó.ø..'..Ê..'µ.å..' 000160
086E2729 01000825 272700FA 06C82722 00F40540 272000EE 049C2718 00E80308 Ü.ò..'..Ý. 'a.¶."'ù.•.''X...)'n. 000180
20746579 20746F6E 20706C65 4800706C 65480000 00000000 FFFF093D 272A0106 ..*'=.........Help.Help not yet  0001A0
69617661 20746579 20746F6E 20706C65 4800706C 65480065 6C62616C 69617661 available.Help.Help not yet avai 0001C0
65480070 6C654800 64657463 656C6573 20656369 6F686320 6F4E0065 6C62616C lable.No choice selected.Help.He 0001E0
```

Dump of file SATURN:[PCCOMMON.DUMP.DLL]DMLGLOB.TMP;1 on 18-APR-1990 10:44:56.67
File ID (627,22,0)   End of file block 315 / Allocated 316

Virtual block number 286 (0000011E), 512 (0200) bytes

```
6E20706C 65480070 6C654800 656C6261 6C696176 61207465 7920746F 6E20706C lp not yet available.Help.Help n 000000
7920746F 6E20706C 65480070 6C654800 656C6261 6C696176 61207465 7920746F ot yet available.Help.Help not y 000020
74617473 204C4450 20612067 6E697461 65724300 656C6261 6C696176 61207465 et available.Creating a PDL stat 000040
6C62616C 69617661 20746579 20746F6E 20706C65 4800706C 65480074 6E656065 ement.Help.Help not yet availabl 000060
27E10202 2C8D0001 0000746E 65606574 61747320 4C445020 65746165 72430065 e.Create PDL statement....§,..Å' 000080
3D5627FA 02204144 27F8021A 2A2C0002 0214261A 27DA020E 24AF27D8 02083110 .1..Å'£$..Ö'.&....,*..«'DA .•'V= 0000A0
0244390B 27F8023E 362E27F7 02384277 27FE0232 4364271E 022C3A98 27F50226 &.%'.:,..'dC2.±'wB8.%'.6>.%'U9D. 0000C0
27DC0262 268C27D8 025C2399 27F90256 25B527D9 0250355D 27E2024A 386127F6 -'a8J.ã'}5P.\'ç%V.•'.#\.Ù'.&b.É' 0000E0
31EC271A 02802EAB 27E0027A 2F5427DF 0274202B 27DE026E 2C1C27DD 026828A0 .(h.\'.,n.B'+-t.Ö'T/z.À'`....'$1 000100
02A43462 27F1029E 33A827F0 02983391 27EF0292 330A27EE 028C3488 27F20286 ..'¡4..Ÿ'.3..ÿ'.3..Þ'`3..þ'b4£. 000120
280602C2 44CA271C 028C2A2C 28000286 361727F4 0280350E 27F302AA 3413271D .'.4`.µ'.5¯.¶'.6Ñ..(,*¥..'òÒ6..( 000140
47D72813 02E04739 2812020A 4722280F 02044417 27E902CE 46452808 02C84549 |Eà..(EFo.Ö'.Då..("GÖ..(9GÁ..(æG 000160
03040000 000102FE 01F7271A 00000000 00000000 00000000 00000000 0000FFFF ...........................'%.±....... 000180
00010322 04B8271A 031C0967 27E50316 0C262710 00000000 0000FFFF 042127E6 |'I..........'&...|'g....'£."... 0001A0
0C752812 03400830 2802033A 07DC27FF 0334089E 27E6032E 08520002 03280000 ..(...R...|'..4..'É.:..(=.a..(u. 0001C0
0364085F 0002035E 00000001 035804B8 271A0352 0C33271D 00000000 0000FFFF .........'3.R..'£.X.....^..._.d. 0001E0
```

Dump of file SATURN:[PCCOMMON.DUMP.DLL]DMLGLOB.TMP;1 on 18-APR-1990 10:44:56.67
File ID (627,22,0)   End of file block 315 / Allocated 316

Virtual block number 287 (0000011F), 512 (0200) bytes

```
0000FFFF 0C822812 037C0830 28020376 07DC27FF 03700974 27E5036A 089E27E6 |'..j.|'t.p..'É.v..(*.|..(...... 000000
52007325 00000000 0000FFFF 027327E6 03940000 0001038E 00C2271A 00000000 .....'ó.........|'s.........%s.R 000020
03C40B1A 27E50000 0A090909 09090909 09732500 09097325 00455645 49525445 ETRIEVE.%s...%s...........|'..å. 000040
27FF03E2 0009271D 03DC0984 27E60306 00050002 03000000 000103CA 0544271A .'D.ò.....Å.....ø.|'..É..'1.ã..' 000060
1489280C 04001470 280A03FA 14112809 03F4115C 272703EE 09232802 03E808C2 ô.Ò..(#.Ÿ.''\.¶..(..•..(p....(¿. 000080
00455645 49525445 52007325 00000000 0000FFFF 16E32812 040C1524 280E0406 ...($....(D.........%s.RETRIEVE. 0000A0
271A0442 0A2527E5 00000A09 09090909 09090973 25000909 09732500 09097325 %s...%s....%s...........|'%.B..' 0000C0
07CD27FF 04600CDE 2710045A 088F27E6 04540C0A 0002044E 00000001 044804AC ¯.H.....N.....T.|'..Z..'B.`..'ë. 0000E0
048411FD 280C047E 11B4280A 04781155 28090472 0E522727 046C082E 28020466 f..(..l.''R.r..(U.x..(Ç.-..(»... 000100
000104A2 05B8271A 049C0B91 27E50000 00000000 FFFF149C 2812048A 120A280E .(Ö....(...........|'.....'..Å... 000120
093927FF 04C0099A 280204BA 0E4A2710 04B409FB 27E604AE 00760002 04A80000 ..`....v.Ü.|'«.Ç..'J.¤..(..å..'9. 000140
04E41263 280E040D 100E280C 04D8121A 280A0402 11BB2809 04CC1095 272704C6 6.''..ä..(£.@..(..Ä..(B.8..(c.Ô. 000160
11F7271D 050017FC 27F30000 54434E49 54534944 00000000 0000FFFF 14222812 .(".........DISTINCT..µ'•....'%. 000180
0524002F 27E6051E 06F7271A 05181123 00020512 00000001 050C0F3E 27E50506 ..|'>...........#....'%...|'/.$. 0001A0
28080542 19EC280A 053C1980 28090536 19442727 05300CCE 2802052A 0C6027FF .'m.*..(ö.0.''D.6..(..<..($.B..( 0001C0
02C927EE 0560021F 27F20000 00000000 FFFF1BEF 2812054E 1A35280C 05481812 ..H..(5.N..(ÿ.........`'..'.Ÿ'è. 0001E0
```

```
Dump of file SATURN:[PCCOMMON.DUMP.DLL]DMLGLOB.TMP;1 on 18-APR-1990 10:44:56.67
File ID (627,22,0)   End of file block 315 / Allocated 316

Virtual block number 288 (00000120), 512 (0200) bytes

 058401A2 27F1057E 025D271A 00000000 0000FFFF 00000001 056C0084 271A0566 f..'Ç.l..............':.-.þ'Å... 000000
 27E605A2 00000F01 059C008C 271A0000 00000000 FFFF0000 0001058A 008C27EE Ÿ'¥................'¥.......Å.|' 000020
 00000000 FFFF0000 27E605BA 01B6271A 05840142 00010000 00000000 FFFF0107 ■...........B.Ç..'Ñ.¤.|'........ 000040
 05E40142 00010000 00000000 FFFF018C 27E60502 00000001 05CC0074 271A0000 ...'t.ä.....●.|'............B.ð. 000060
 27E60602 00000001 05FC008C 271A0000 00000000 FFFF0000 27E605EA 01B6271A .'Ñ.ö.|'...........'¥.■.......|' 000080
 00000000 FFFF052C 27E6061A 022A271A 06140000 00010000 00000000 FFFF0215 ..................'*...|',....... 0000A0
 00000000 0000FFFF 02EE27E6 06380000 00010632 010A271A 00000000 00000000 .........'..2.....B.|'Ÿ......... 0000C0
 27E20662 0CCA27EF 065C080S 27EE0656 103F27F0 065011BD 27F1064A 128B27F4 ¶'Ê.J.þ'§.P.Þ'?.V.Ÿ'ſ.\.ÿ'ö.b.ã' 0000E0
 18A4280D 06801585 2803067A 01FB271A 0674130F 2801066E 00000001 06680442 B.h.....n..(Ô.t..'«.z..(.....(Ê. 000100
 6F6E2070 6C654800 706C6548 00000000 0000FFFF 1E5F2811 068C19F9 280F0686 ...('....( .........Help.Help no 000120
 6974616E 69747365 442F6563 72756F53 00656C62 616C6961 76612074 65792074 t yet available.Source/Destinati 000140
 61766120 74657920 74:F6E20 706C6548 00706C65 48007374 63656A62 4F206E6F on Objects.Help.Help not yet ava 000160
 74616E69 74736544 2F656372 756F5300 73657373 65636F72 5000656C 62'16C69 ilable.Processes.Source/Destinat 000180
 7365442F 65637275 6F530073 65737365 636F7250 00737463 656A624F 206.:F69 ion Objects.Processes.Source/Des 0001A0
 00000000 64353025 6E776F6E 6B6E5500 73746365 6A624F20 6E6F6974 616E.974 tination Objects.Unknown%05d.... 0001C0
 076410E9 27E8075E 108A27E7 07580F4C 00010752 156C27FC 074C1603 27FD0000 ..»'Æ.L.■'l.R...L.X.Ó'..^.Ò'Õ.d. 0001E0

Dump of file SATURN:[PCCOMMON.DUMP.DLL]DMLGLOB.TMP;1 on 18-APR-1990 10:44:56.67
File ID (627,22,0)   End of file block 315 / Allocated 316

Virtual block number 289 (00000121), 512 (0200) bytes

 28050782 1ECA27EE 077C2036 27E20776 1C6E2804 07701AFD 271A076A 184F2801 .(O.j..'».p..(n.v.â'6 |.Ÿ'ö....( 000000
 00000000 FFFF2A65 2811079A 299F271C 079424DA 280F078E 243C280D 07882223 #"...(<$...(O$...'.)...(e*...... 000020
 00000000 0000FFFF 00000001 07B8011D 271A0000 00000000 FFFF0000 00010000 ...............'..|.............. 000040
 27E207E2 038A3E80 00000000 0000FFFF 029327E6 07D00000 000107CA 0084271A .'Ç.ð.....Å.|'............>..å.ã' 000060
 096C2807 08000900 280507FA 06CF2803 07F404F8 271A07EE 00000001 07E80206 ..Ô.....Ÿ..'«.¶..(ü.'..(.....(l. 000080
 08240EEA 27F1081E 101E27F2 00000000 0000FFFF 087A27EE 080C0C42 280F0806 ...(B...Ÿ'z.........'....þ'ö.$. 0000A0
 00010842 01C927E2 083C0434 27ED0836 048527EE 08300CD8 27EF082A 009927F0 Þ'..*.ý'Á.0.Ÿ'..6.Ù'4.<.ã'è.B... 0000C0
 14DA2810 08600856 280F085A 14582804 085412C3 2803084E 1152271A 08480000 ..H..'R.N..(ù.T..(X.Z..(V.'..(Ö. 0000E0
 08840074 271A0000 00000000 FFFF006C 3E800872 00000001 00000000 0000FFFF ............r..>l..........'t... 000100
 0000FFFF 00000001 089C0065 271A0000 00000000 FFFF018F 27E6088A 00000001 ......|'...........'e........... 000120
 00000001 08C00041 271A0000 00000000 FFFF0000 000108AE 0041271A 00000000 .....'A.Ù..............'A.å..... 000140
 08E4060E 27E80000 00000000 FFFF0000 00010802 0041271A 00000000 0000FFFF ..........'A.●.............$'..ð. 000160
 0000FFFF 028527E6 08FC0088 271A08F6 00000001 08F00545 27EA08EA 04E627E9 Ô'|.ö.ö'E.Þ.....-..'..■.|'ç..... 000180
 0195271A 09200134 43FD091A 000343FC 0914005F 4400090E 0000271C 00000000 .....'.....D ...■CÆ...»C4. ..'.. 0001A0
 73253A09 73250909 09732500 0A73253A 09732509 73250077 00000000 0000FFFF ........w.%s.%s.:%s..%s...%s.:%s 0001C0
 73253A09 09097325 000A7325 3A090909 7325000A 73253A09 09732509 7325000A ..%s.%s..:%s..%s...:%s..%s...:%s 0001E0

Dump of file SATURN:[PCCOMMON.DUMP.DLL]DMLGLOB.TMP;1 on 18-APR-1990 10:44:56.67
File ID (627,22,0)   End of file block 315 / Allocated 316

Virtual block number 290 (00000122), 512 (0200) bytes

 000A0073 25002000 0A0A0073 25002000 0A000A0A 000A000A 7325000A 7325000A ..%s..%s.........-.%s.... .%s... 000000
 033B6400 09A00299 0002099A 00000001 000A000A 000A0000 73250073 25007325 %s.%s.%s......................d;. 000020
 09C4087C 640509BE 0C156404 09B80E10 640309B2 133E6402 09AC038E 640109A6 |..d..¯..d>.ÿ..d..¡..d../..d|.á. 000040
 002E2E00 2E002E2E 002A2E2A 005C0000 00000000 FFFF0A3C 640709CA 09836406 .d..ð..d<.........\.*.*......... 000060
 69662020 20002E68 74617020 64696C61 76206120 746F6E20 20200050 3A63255B [%c:]. - not a valid path.. - fi 000080
 6F706552 2040414C 204C4450 002E676E 6F6C206F 6F742073 69206560 616E656C lename is too long..PDL LAM Repo 0000A0
 74726F70 6552204D 414C204C 44500074 726F7065 5220404l 4C204C44 50007472 rt.PDL LAM Report.PDL LAM Report 0000C0
 6C706572 20656220 6C6C6977 2073746E 65746E6F 43202D20 73747369 78652000 . exists - Contents will be repl 0000E0
 522E2A00 534E4749 53454400 74726F70 6552204D 414C204C 44500021 64656361 acedl.PDL LAM Report.DESIGNS.*.R 000100
 20202020 20202020 20282828 28282020 20202020 20202000 005C005C 00005450 PT..\.\..        (((((           000120
 84848484 84848410 10101010 10101010 10101010 10104820 20202020 20202020          H..................... 000140
 01010101 01010101 01010101 01010101 81818181 81811010 10101010 10848484 ................................ 000160
 02020202 02020202 02020202 02020202 82828282 82821010 10101010 01010101 ................................ 000180
 00000000 00000000 00000000 00000000 00000000 00000020 10101010 02020202 ................................ 0001A0
 00000000 00000000 00000000 00000000 00000000 00000000 00000000 00000000 ................................ 0001C0
 00000000 00000000 00000000 00000000 00000000 00000000 00000000 00000000 ................................ 0001E0
```

```
Dump of file SATURN:[PCCOMMON.DUMP.DLL]DMLGLOB.TMP;1 on 18-APR-1990 10:44:56.67
File ID (627,22,0)   End of file block 315 / Allocated 316

Virtual block number 291 (00000123), 512 (0200) bytes

00000000 00000000 00000000 00000000 00000000 00000000 00000000 00000000 ................................ 000000
39312030 303A3030 3A303020 3130206E 614A2065 75540000 00000000 00000000 ..........Tue Jan 01 00:00:00 19 000020
00000000 00000700 0BB21AAA 0BAE199A 0BAA1ACE 0BA61A10 FFFF1F80 000A3037 70........Ì.o.¯...Ù.¯.ÿ......... 000040
0BDA20CC 0B0620CC 27B820CC 00002320 2D2B0029 6C6C756E 2800296C 6C756E28 (null).(null).+- #..ä ¡'ä ø.ä Ö. 000060
00000000 00000000 00000000 00000000 00000101 00000000 0BE220CC 0BDE20CC ä B.ä ä........................ 000080
6E6F4D6E 755327D6 0C080C18 0C040001 00004650 00544445 00545345 00005A54 TZ..EST.EDT.PF..........ø'SunMon 0000A0
4A796140 72704172 61406265 466E614A 00746153 69724675 68546465 57657554 TueWedThuFriSat.JanFebMarAprMayJ 0000C0
00000000 00303030 2B650000 63654476 6F4E7463 4F706553 6775416C 754A6E75 unJulAugSepOctNovDec..e+000..... 0000E0
00000000 00000000 00000000 00000000 0C142AE0 32B02AE0 2AE00000 00000800 ......À*À*.2À*.................. 000100
00000000 00000000 00000000 00000000 00000000 00000000 00000000 00000000 ................................ 000120
00000000 00000000 00000000 00000000 00000000 00000000 00000000 00000000 ................................ 000140
00000000 00000000 00000000 00000000 00000000 00000000 00000000 00000000 ................................ 000160
00000000 00000000 00000000 00000000 00000000 00000000 00000000 00000000 ................................ 000180
00000000 00000000 00000000 00000000 00000000 00000000 00000000 00000000 ................................ 0001A0
00000000 00000000 00000000 00000000 00000000 00000000 00000000 00000000 ................................ 0001C0
00000000 00000000 00000000 00000000 00000000 00000000 00000000 00000000 ................................ 0001E0

Dump of file SATURN:[PCCOMMON.DUMP.DLL]DMLGLOB.TMP;1 on 18-APR-1990 10:44:56.67
File ID (627,22,0)   End of file block 315 / Allocated 316

Virtual block number 292 (00000124), 512 (0200) bytes

00000000 00000000 00000000 00000000 00000000 00000000 00000000 00000000 ................................ 000000
00000000 00000000 00000000 00000000 00000000 00000000 00000000 00000000 ................................ 000020
00000000 00000000 00000000 00000000 00000000 00000000 00000000 00000000 ................................ 000040
00000000 00000000 00000000 00000000 00000000 00000000 00000000 00000000 ................................ 000060
00000000 00000000 00000000 00000000 00000000 00000000 00000000 00000000 ................................ 000080
00000000 00000000 00000000 00000000 00000000 00000000 00000000 00000000 ................................ 0000A0
00000000 00000000 00000000 00000000 00000000 00000000 00000000 00000000 ................................ 0000C0
00000000 00000000 00000000 00000000 00000000 00000000 00000000 00000000 ................................ 0000E0
00000000 00000000 00000000 00000000 00000000 00000000 00000000 00000000 ................................ 000100
00000000 00000000 00000000 00000000 00000000 00000000 00000000 00000000 ................................ 000120
00000000 00000000 00000000 00000000 00000000 00000000 00000000 00000000 ................................ 000140
00000000 00000000 00000000 00000000 00000000 00000000 00000000 00000000 ................................ 000160
00000000 00000000 00000000 00000000 00000000 00000000 00000000 00000000 ................................ 000180
00000000 00000000 00000000 00000000 00000000 00000000 00000000 00000000 ................................ 0001A0
00000000 00000000 00000000 00000000 00000000 00000000 00000000 00000000 ................................ 0001C0
00000000 00000000 00000000 00000000 00000000 00000000 00000000 00000000 ................................ 0001E0

Dump of file SATURN:[PCCOMMON.DUMP.DLL]DMLGLOB.TMP;1 on 18-APR-1990 10:44:56.67
File ID (627,22,0)   End of file block 315 / Allocated 316

Virtual block number 293 (00000125), 512 (0200) bytes

00000000 00000000 00000000 00000000 00000000 00000000 00000000 00000000 ................................ 000000
00000000 00000000 00000000 00000000 00000000 00000000 00000000 00000000 ................................ 000020
00000000 00000000 00000000 00000000 00000000 00000000 00000000 00000000 ................................ 000040
00000000 00000000 00000000 00000000 00000000 00000000 00000000 00000000 ................................ 000060
00000000 00000000 00000000 00000000 00000000 00000000 00000000 00000000 ................................ 000080
00000000 00000000 00000000 00000000 00000000 00000000 00000000 00000000 ................................ 0000A0
00000000 00000000 00000000 00000000 00000000 00000000 00000000 00000000 ................................ 0000C0
00000000 00000000 00000000 00000000 00000000 00000000 00000000 00000000 ................................ 0000E0
10840002 00304F46 4E495F45 4C49465F 435F0C6C 00000000 00000000 00000000 ............l._C_FILE_INFO*..... 000100
02020000 00000000 00000000 01020000 00000000 00000000 000127D4 00020000 ....Ô'.......................... 000120
00000000 00000000 00000000 00000000 00000000 00000000 00000000 00000000 ................................ 000140
00000000 00000000 00000000 00000000 00000000 00000000 00000000 00000000 ................................ 000160
00000000 00000000 00000000 00000000 00000000 00000000 00000000 00000000 ................................ 000180
00000000 00000000 00000000 00000000 00000000 00000000 00000000 00000000 ................................ 0001A0
00000000 00000000 00000000 00000000 00000000 00000000 00000000 00000000 ................................ 0001C0
00000000 00000000 00000000 00000000 00000000 00000000 00000000 00000000 ................................ 0001E0
```

```
Dump of file SATURN:[PCCOMMON.DUMP.DLL]DMLGLOB.TMP;1 on 18-APR-1990 10:44:56.67
File ID (627,22,0)   End of file block 315 / Allocated 316

Virtual block number 294 (00000126), 512 (0200) bytes

00000000 00000000 00000000 00000000 00000000 00000000 00000000 00000000 ................................ 000000
00000000 00000000 00000000 00000000 00000000 00000000 00000000 00000000 ................................ 000020
00000000 00000000 00000000 00000000 00000000 00000000 00000000 00000000 ................................ 000040
00000000 00000000 00000000 00000000 00000000 00000000 00000000 00000000 ................................ 000060
00000000 00000000 00000000 00000000 00000000 00000000 00000000 00000000 ................................ 000080
00000000 00000000 00000000 00000000 00000000 00000000 00000000 00000000 ................................ 0000A0
00000000 00000000 00000000 00000000 00000000 00000000 00000000 00000000 ................................ 0000C0
00000000 00000000 00000000 00000000 00000000 00000000 00000000 00000000 ................................ 0000E0
00000000 00000000 00000000 00000000 00000000 00000000 00000000 00000000 ................................ 000100
00000000 00000000 00000000 00000000 00000000 00000000 00000000 00000000 ................................ 000120
00000000 00000000 00000000 00000000 00000000 00000000 00000000 00000000 ................................ 000140
00000000 00000000 00000000 00000000 00000000 00000000 00000000 00000000 ................................ 000160
00000000 00000000 00000000 00000000 00000000 00000000 00000000 00000000 ................................ 000180
00000000 00000000 00000000 00000000 00000000 00000000 00000000 00000000 ................................ 0001A0
00000000 00000000 00000000 00000000 00000000 00000000 00000000 00000000 ................................ 0001C0
00000000 00000000 00000000 00000000 00000000 00000000 00000000 00000000 ................................ 0001E0

Dump of file SATURN:[PCCOMMON.DUMP.DLL]DMLGLOB.TMP;1 on 18-APR-1990 10:44:56.67
File ID (627,22,0)   End of file block 315 / Allocated 316

Virtual block number 295 (00000127), 512 (0200) bytes

00000000 00000000 00000000 00000000 00000000 00000000 00000000 00000000 ................................ 000000
00000000 00000000 00000000 00000000 00000000 00000000 00000000 00000000 ................................ 000020
00000000 00000000 00000000 00000000 00000000 00000000 00000000 00000000 ................................ 000040
00000000 00000000 00000000 00000000 00000000 00000000 00000000 00000000 ................................ 000060
00000000 00000000 00000000 00000000 00000000 00000000 00000000 00000000 ................................ 000080
00000000 00000000 00000000 00000000 00000000 00000000 00000000 00000000 ................................ 0000A0
00000000 00000000 00000000 00000000 00000000 00000000 00000000 00000000 ................................ 0000C0
00000000 00000000 00000000 00000000 00000000 00000000 00000000 00000000 ................................ 0000E0
00000000 00000000 00000000 00000000 00000000 00000000 00000000 00000000 ................................ 000100
00000000 00000000 00000000 00000000 00000000 00000000 00000000 00000000 ................................ 000120
00000000 00000000 00000000 00000000 00000000 00000000 00000000 00000000 ................................ 000140
00000000 00000000 00000000 00000000 00000000 00000000 00000000 00000000 ................................ 000160
00000000 00000000 00000000 00000000 00000000 00000000 00000000 00000000 ................................ 000180
00000000 00000000 00000000 00000000 00000000 00000000 00000000 00000000 ................................ 0001A0
00000000 00000000 00000000 00000000 00000000 00000000 00000000 00000000 ................................ 0001C0
00000000 00000000 00000000 00000000 00000000 00000000 00000000 00000000 ................................ 0001E0

Dump of file SATURN:[PCCOMMON.DUMP.DLL]DMLGLOB.TMP;1 on 18-APR-1990 10:44:56.67
File ID (627,22,0)   End of file block 315 / Allocated 316

Virtual block number 296 (00000128), 512 (0200) bytes

00000000 00000000 00000000 00000000 00000000 00000000 00000000 00000000 ................................ 000000
00000000 00000000 00000000 00000000 00000000 00000000 00000000 00000000 ................................ 000020
00000000 00000000 00000000 00000000 00000000 00000000 00000000 00000000 ................................ 000040
00000000 00000000 00000000 00000000 00000000 00000000 00000000 00000000 ................................ 000060
00000000 00000000 00000000 00000000 00000000 00000000 00000000 00000000 ................................ 000080
00000000 00000000 00000000 00000000 00000000 00000000 00000000 00000000 ................................ 0000A0
00000000 00000000 00000000 00000000 00000000 00000000 00000000 00000000 ................................ 0000C0
00000000 00000000 00000000 00000000 00000000 00000000 00000000 00000000 ................................ 0000E0
00000000 00000000 00000000 00000000 00000000 00000000 00000000 00000000 ................................ 000100
00000000 00000000 00000000 00000000 00000000 00000000 00000000 00000000 ................................ 000120
00000000 00000000 00000000 00000000 00000000 00000000 00000000 00000000 ................................ 000140
00000000 00000000 00000000 00000000 00000000 00000000 00000000 00000000 ................................ 000160
00000000 00000000 00000000 00000000 00000000 00000000 00000000 00000000 ................................ 000180
00000000 00000000 00000000 00000000 00000000 00000000 00000000 00000000 ................................ 0001A0
00000000 00000000 00000000 00000000 00000000 00000000 00000000 00000000 ................................ 0001C0
00000000 00000000 00000000 00000000 00000000 00000000 00000000 00000000 ................................ 0001E0
```

```
Dump of file SATURN:[PCCOMMON.DUMP.DLL]DMLGLOB.TMP;1 on 18-APR-1990 10:44:56.67
File ID (627,22,0)   End of file block 315 / Allocated 316

Virtual block number 297 (00000129), 512 (0200) bytes

00000000 00000000 00000000 00000000 00000000 00000000 00000000 00000000 ................................ 000000
00000000 00000000 00000000 00000000 00000000 00000000 00000000 00000000 ................................ 000020
00000000 00000000 00000000 00000000 00000000 00000000 00000000 00000000 ................................ 000040
00000000 00000000 00000000 00000000 00000000 00000000 00000000 00000000 ................................ 000060
00000000 00000000 00000000 00000000 00000000 00000000 00000000 00000000 ................................ 000080
00000000 00000000 00000000 00000000 00000000 00000000 00000000 00000000 ................................ 0000A0
00000000 00000000 00000000 00000000 00000000 00000000 00000000 00000000 ................................ 0000C0
00000000 00000000 00000000 00000000 00000000 00000000 00000000 00000000 ................................ 0000E0
00000000 00000000 00000000 00000000 00000000 00000000 00000000 00000000 ................................ 000100
00000000 00000000 00000000 00000000 00000000 00000000 00000000 00000000 ................................ 000120
00000000 00000000 00000000 00000000 00000000 00000000 00000000 00000000 ................................ 000140
00000000 00000000 00000000 00000000 00000000 00000000 00000000 00000000 ................................ 000160
00000000 00000000 00000000 00000000 00000000 00000000 00000000 00000000 ................................ 000180
00000000 00000000 00000000 00000000 00000000 00000000 00000000 00000000 ................................ 0001A0
00000000 00000000 00000000 00000000 00000000 00000000 00000000 00000000 ................................ 0001C0
00000000 00000000 00000000 00000000 00000000 00000000 00000000 00000000 ................................ 0001E0

Dump of file SATURN:[PCCOMMON.DUMP.DLL]DMLGLOB.TMP;1 on 18-APR-1990 10:44:56.67
File ID (627,22,0)   End of file block 315 / Allocated 316

Virtual block number 298 (0000012A), 512 (0200) bytes

00000000 00000000 00000000 00000000 00000000 00000000 00000000 00000000 ................................ 000000
00000000 00000000 00000000 00000000 00000000 00000000 00000000 00000000 ................................ 000020
00000000 00000000 00000000 00000000 00000000 00000000 00000000 00000000 ................................ 000040
00000000 00000000 00000000 00000000 00000000 00000000 00000000 00000000 ................................ 000060
00000000 00000000 00000000 00000000 00000000 00000000 00000000 00000000 ................................ 000080
00000000 00000000 00000000 00000000 00000000 00000000 00000000 00000000 ................................ 0000A0
00000000 00000000 00000000 00000000 00000000 00000000 00000000 00000000 ................................ 0000C0
00000000 00000000 00000000 00000000 00000000 00000000 00000000 00000000 ................................ 0000E0
00000000 00000000 00000000 00000000 00000000 00000000 00000000 00000000 ................................ 000100
00000000 00000000 00000000 00000000 00000000 00000000 00000000 00000000 ................................ 000120
00000000 00000000 00000000 00000000 00000000 00000000 00000000 00000000 ................................ 000140
00000000 00000000 00000000 00000000 00000000 00000000 00000000 00000000 ................................ 000160
00000000 00000000 00000000 00000000 00000000 00000000 00000000 00000000 ................................ 000180
00000000 00000000 00000000 00000000 00000000 00000000 00000000 00000000 ................................ 0001A0
00000000 00000000 00000000 00000000 00000000 00000000 00000000 00000000 ................................ 0001C0
00000000 00000000 00000000 00000000 00000000 00000000 00000000 00000000 ................................ 0001E0

Dump of file SATURN:[PCCOMMON.DUMP.DLL]DMLGLOB.TMP;1 on 18-APR-1990 10:44:56.67
File ID (627,22,0)   End of file block 315 / Allocated 316

Virtual block number 299 (0000012B), 512 (0200) bytes

00000000 00000000 00000000 00000000 00000000 00000000 00000000 00000000 ................................ 000000
00000000 00000000 00000000 00000000 00000000 00000000 00000000 00000000 ................................ 000020
00000000 00000000 00000000 00000000 00000000 00000000 00000000 00000000 ................................ 000040
00000000 00000000 00000000 00000000 00000000 00000000 00000000 00000000 ................................ 000060
00000000 00000000 00000000 00000000 00000000 00000000 00000000 00000000 ................................ 000080
00000000 00000000 00000000 00000000 00000000 00000000 00000000 00000000 ................................ 0000A0
00000000 00000000 00000000 00000000 00000000 00000000 00000000 00000000 ................................ 0000C0
00000000 00000000 00000000 00000000 00000000 00000000 00000000 00000000 ................................ 0000E0
00000000 00000000 00000000 02000001 00000000 00000000 00000000 00000000 ................................ 000100
00000000 00000000 00000000 00000000 00000000 00000000 00000000 00000000 ................................ 000120
00000000 00000000 00000000 00000000 00000000 00000000 00000000 00000000 ................................ 000140
00000000 00000000 00000000 00000000 00000000 00000000 00000000 00000000 ................................ 000160
00000000 00000000 00000000 00000000 00000000 00000000 00000000 00000000 ................................ 000180
00000000 00000000 00000000 00000000 00000000 00000000 00000000 00000000 ................................ 0001A0
00000000 00000000 00000000 00000000 00000000 00000000 00000000 00000000 ................................ 0001C0
00000000 00000000 00000000 00000000 00000000 00000000 00000000 00000000 ................................ 0001E0
```

```
Dump of file SATURN:[PCCOMMON.DUMP.DLL]DMLGLOB.TMP;1 on 18-APR-1990 10:44:56.67
File ID (627,22,0)    End of file block 315 / Allocated 316

Virtual block number 300 (0000012C), 512 (0200) bytes

00000000 00000000 00000000 00000000 00000000 00000000 00000000 00000000 ................................ 000000
00000000 000000C) 00000000 00000000 00000000 00000000 00000000 00000000 ................................ 000020
00000000 00000000 00000000 00000000 00000000 00000000 00000000 00000000 ................................ 000040
00000000 00000000 00000000 00000000 00000000 00000000 00000000 00000000 ................................ 000060
00000000 00000000 00000000 00000000 00000000 00000000 00000000 00000000 ................................ 000080
00000000 00000000 00000000 00000000 00000000 00000000 00000000 00000000 ................................ 0000A0
00000000 00000000 00000000 00000000 00000000 00000000 00000000 00000000 ................................ 0000C0
00000000 00000000 00000000 00000000 00000000 00000000 00000000 00000000 ................................ 0000E0
00000000 00000000 00000000 00000000 00000000 00000000 00000000 00000000 ................................ 000100
00000000 00000000 00000000 00000000 00000000 00000000 00000000 00000000 ................................ 000120
00000000 00000000 00000000 00000000 00000000 00000000 00000000 00000000 ................................ 000140
00000000 00000000 00000000 00000000 00000000 00000000 00000000 00000000 ................................ 000160
00000000 00000000 00000000 00000000 00000000 00000000 00000000 00000000 ................................ 000180
00000000 00000000 00000000 00000000 00000000 00000000 00000000 00000000 ................................ 0001A0
00000000 00000000 00000000 00000000 00000000 00000000 00000000 00000000 ................................ 0001C0
00000000 00000000 00000000 00000000 00000000 00000000 00000000 00000000 ................................ 0001E0

Dump of file SATURN:[PCCOMMON.DUMP.DLL]DMLGLOB.TMP;1 on 18-APR-1990 10:44:56.67
File ID (627,22,0)    End of file block 315 / Allocated 316

Virtual block number 301 (0000012D), 512 (0200) bytes

00000000 00000000 00000000 00000000 00000000 00000000 00000000 00000000 ................................ 000000
00000000 00000000 00000000 00000000 00000000 00000000 00000000 00000000 ................................ 000020
00000000 00000000 00000000 00000000 00000000 00000000 00000000 00000000 ................................ 000040
00000000 00000000 00000000 00000000 00000000 00000000 00000000 00000000 ................................ 000060
00000000 00000000 00000000 00000000 00000000 00000000 00000000 00000000 ................................ 000080
00000000 00000000 00000000 00000000 00000000 00000000 00000000 00000000 ................................ 0000A0
00000000 00000000 00000000 00000000 00000000 00000000 00000000 00000000 ................................ 0000C0
00000000 00000000 00000000 00000000 00000000 00000000 00000000 00000000 ................................ 0000E0
00000000 00000000 00000000 00000000 00000000 00000000 00000000 00000000 ................................ 000100
00000000 00000000 00000000 00000000 00000000 00000000 00000000 00000000 ................................ 000120
00000000 00000000 00000000 00000000 00000000 00000000 00000000 00000000 ................................ 000140
00000000 00000000 00000000 00000000 00000000 00000000 00000000 00000000 ................................ 000160
00000000 00000000 00000000 00000000 00000000 00000000 00000000 00000000 ................................ 000180
00000000 00000000 00000000 00000000 00000000 00000000 00000000 00000000 ................................ 0001A0
00000000 00000000 00000000 00000000 00000000 00000000 00000000 00000000 ................................ 0001C0
00000000 00000000 00000000 00000000 00000000 00000000 00000000 00000000 ................................ 0001E0

Dump of file SATURN:[PCCOMMON.DUMP.DLL]DMLGLOB.TMP;1 on 18-APR-1990 10:44:56.67
File ID (627,22,0)    End of file block 315 / Allocated 316

Virtual block number 302 (0000012E), 512 (0200) bytes

00000000 00000000 00000000 00000000 00000000 00000000 00000000 00000000 ................................ 000000
00000000 00000000 00000000 00000000 00000000 00000000 00000000 00000000 ................................ 000020
00000000 00000000 00000000 00000000 00000000 00000000 00000000 00000000 ................................ 000040
00000000 00000000 00000000 00000000 00000000 00000000 00000000 00000000 ................................ 000060
00000000 00000000 00000000 00000000 00000000 00000000 00000000 00000000 ................................ 000080
00000000 00000000 00000000 00000000 00000000 00000000 00000000 00000000 ................................ 0000A0
00000000 00000000 00000000 00000000 00000000 00000000 00000000 00000000 ................................ 0000C0
00000000 00000000 00000000 00000000 00000000 00000000 00000000 00000000 ................................ 0000E0
00970078 005A0038 001EFFFF 00000000 00000C6E 1C640000 00000000 00000000 ..........d.n...........;.Z.x... 000100
00F20003 00840096 00770059 003A001E FFFF016D 014E0130 011100F3 00040085 ç.Å.æ...0.N.m.....:.Y.w...Ç.Æ. . 000120
42123E7B 42143E7D 41B130F7 3F853C8B 3F873C8D 3FAA3C95 016C014D 012F0110 ../.M.l..<`?.<.?.<.?¼=ÿA)>.B(>.B 000140
00000000 00000000 00000000 00000000 00000000 00000000 00000000 3C393BE6 æ;9<............................ 000160
00000000 00000000 00000000 00000200 FFFFFFFF 00000000 00000000 00000000 ................................ 000180
00000000 00000000 00000000 00000000 00000000 00000000 81818101 00000001 ................................ 0001A0
00000000 00000000 00000000 00000000 00000000 00000000 00000000 00000000 ................................ 0001C0
00000000 00000000 00000000 00000000 00000000 00000000 00000000 00000000 ................................ 0001E0
```

```
Dump of file SATURN:[PCCOMMON.DUMP.DLL]DMLGLOB.TMP;1 on 18-APR-1990 10:44:56.67
File ID (627,22,0)   End of file block 315 / Allocated 316

Virtual block number 303 (0000012F), 512 (0200) bytes

00000000 00000000 00000000 00000000 00000000 00000000 00000000 00000000 ................................ 000000
00000000 00000000 00000000 00000000 00000000 00000000 00000000 00000000 ................................ 000020
00000000 00000000 00000000 00000000 00000000 00000000 00000000 00000000 ................................ 000040
00000000 00000:00 00000000 00000000 00000000 00000000 00000000 00000000 ................................ 000060
00000000 00000000 00000000 00000000 00000000 00000000 00000000 00000000 ................................ 000080
0A0A0A0A 0A0A0A0A 0A0A0A0A 0A0A0A0A 0A0A0A0A 0A0A0A0A 0A0A0A00 00000000 ................................ 0000A0
0A0A0A0A 0A0A0A0A 0A0A0A0A 0A0A0A0A 0A0A0A0A 0A0A0A0A 0A0A0A0A 0A0A0A0A ................................ 0000C0
0A0A0A0A 0A0A0A0A 0A0A0A0A 0A0A0A0A 0A0A0A0A 0A0A0A0A 0A0A0A0A 0A0A0A0A ................................ 0000E0
0A0A0A0A 0A0A0A0A 0A0A0A0A 0A0A0A0A 0A0A0A0A 0A0A0A0A 0A0A0A0A 0A0A0A0A ................................ 000100
0A0A0A0A 0A0A0A0A 0A0A0A0A 0A0A0A0A 0A0A0A0A 0A0A0A0A 0A0A0A0A 0A0A0A0A ................................ 000120
0A0A0A0A 0A0A0A0A 0A0A0A0A 0A0A0A0A 0A0A0A0A 0A0A0A0A 0A0A0A0A 0A0A0A0A ................................ 000140
0A0A0A0A 0A0A0A0A 0A0A0A0A 0A0A0A0A 0A0A0A0A 0A0A0A0A 0A0A0A0A 0A0A0A0A ................................ 000160
0A0A0A0A 0A0A0A0A 0A0A0A0A 0A0A0A0A 0A0A0A0A 0A0A0A0A 0A0A0A0A 0A0A0A0A ................................ 000180
00000000 00000000 00000000 00000000 00000000 00000000 0000000A 0A0A0A0A ................................ 0001A0
000080C0 E0F0F8FC FEFF0000 00007878 31364005 00002000 00000000 00000000 ......... ...M61xx.....z•½pÀà... 0001C0
00000000 00000000 00000000 00000000 00000000 00000000 00000000 00000000 ................................ 0001E0

Dump of file SATURN:[PCCOMMON.DUMP.DLL]DMLGLOB.TMP;1 on 18-APR-1990 10:44:56.67
File ID (627,22,0)   End of file block 315 / Allocated 316

Virtual block number 304 (00000130), 512 (0200) bytes

00000000 00000000 00000000 00000000 00000000 00000000 00000000 00000000 ................................ 000000
00000000 00000000 00000000 00000000 00000000 00000000 00000000 00000000 ................................ 000020
00000000 00000000 00000000 00000000 00000000 00000000 00000000 00000000 ................................ 000040
00000000 00000000 00000000 00000000 00000000 00000000 00000000 00000000 ................................ 000060
00000000 00000000 00000000 00000000 00000000 00000000 00000000 00000000 ................................ 000080
00000000 00000000 00000000 00000000 00000000 00000000 00000000 00000000 ................................ 0000A0
00000000 00000000 00000000 00000000 00000000 00000000 00000000 00000000 ................................ 0000C0
00000000 00000000 00000000 00000000 00000000 00000000 00000000 00000000 ................................ 0000E0
00000000 00000000 00000000 00000000 00000000 00000000 00000000 00000000 ................................ 000100
00000000 00000000 00000000 00000000 00000000 00000000 00000000 00000000 ................................ 000120
00000000 00000000 00000000 00000000 00000000 00000000 00000000 00000000 ................................ 000140
00000000 00000000 00000000 00000000 00000000 00000000 00000000 00000000 ................................ 000160
00000000 00000000 00000000 00000000 00000000 00000000 00000000 00000000 ................................ 000180
00000000 00000000 00000000 00000000 00000000 00000000 00000000 00000000 ................................ 0001A0
00000000 00000000 00000000 00000000 00000000 00000000 00000000 00000000 ................................ 0001C0
00000000 00000000 00000000 00000000 00000000 00000000 00000000 00000000 ................................ 0001E0

Dump of file SATURN:[PCCOMMON.DUMP.DLL]DMLGLOB.TMP;1 on 18-APR-1990 10:44:56.67
File ID (627,22,0)   End of file block 315 / Allocated 316

Virtual block number 305 (00000131), 512 (0200) bytes

00000000 00000000 00000000 00000000 00000000 00000000 00000000 00000000 ................................ 000000
00000000 00000000 00000000 00000000 00000000 00000000 00000000 00002610 .&.............................. 000020
000008E6 33080886 050F0000 00000000 00000000 00000000 00000000 00000000 ......................R.Ä3l... 000040
00000000 00000000 FFFF27D2 27D027CE 27CCFFFF 27C237C5 00000000 278C4752 RG¥'....é7ö'..ë'ö'Å'Ø'.......... 000060
6F6C6672 65766F20 68636174 73202D0A 0D303030 36520000 3E3E4753 4D4E3C3C <<NMSG>>..R6000..- stack overflo 000080
79622065 64697669 64207265 6765746E 69202D0A 0D333030 36520003 000A0D77 w.....R6003..- integer divide by 0000A0
65636170 73206867 756F6E65 20746F6E 202D0A00 38303036 52000800 0A0D3020  0.....R6008..- not enough space 0000C0
20746F6E 20200A00 39303036 52000900 0A0D7374 6E656075 67726120 726F6620  for arguments.....R6009..- not  0000E0
FC000A00 746E6560 6E6F7269 766E6520 726F6620 65636170 73206867 756F6E65 enough space for environment...▪ 000100
200A0032 30303652 00020020 726F7272 65206560 6974206E 757200FF 000A0000 ......run-time error ...R6002..- 000120
3A00FD00 0A0D6465 64616F6C 20746F6E 20746E69 6F702067 6E697461 6F6C6620  floating point not loaded...».: 000140
00203A72 6F727265 20746E69 6F702067 6E697461 6F6C6620 2D0A0D48 54414D20  MATH..- floating-point error: . 000160
766F0068 000A0030 20796220 65646976 69640067 000A0D64 696C6176 6E690065 e.invalid...g.divide by 0...h.ov 000180
78650070 000A0D77 6F6C6672 65766F20 68636174 73006E00 0A0D776F 6C667265 erflow...n.stack overflow...p.ex 0001A0
0020070C 00020028 FFFFFF00 0A0D6465 74617265 6E656720 796C7469 63696C70 plicitly generated......(...È. . 0001C0
0022086C 00020000 00020070 00020000 00210818 00020000 00010046 00020000 ....f.........l.....p.......l.". 0001E0
```

```
Dump of file SATURN:[PCCOMMON.DUMP.DLL]DMLGLOB.TMP;1 on 18-APR-19?? 10:44:56.67
File ID (627,22,0)   End of file block 315 / Allocated 316

Virtual block number 306 (00000132), 512 (0200) bytes

 002508A8 00020000 00240896 00020000 000400AC 00020000 0023087E 00020000 ....~.#.....¨.........$.....´.%. 000000
 0028080E 00020000 002708CC 00020000 0026088A 00020000 000601FC 00020000 ....•.......ü.&.....a.'.....@.(. 000020
 002A0994 00020000 000A0310 00020000 00290908 00020000 000902F8 00020000 ....%.........)...............•. 000040
 002D107E 00020000 002C27CA 00020000 000C0388 00020000 0008034C 00020000 ....L...............ð',.....-.-. 000060
 000F0496 00020000 002E226C 00020000 000E043C 00020000 0000038E 00020000 ..../.......<.......(".......... 000080
 00130596 00020000 00120578 00020000 0011055A 00020000 001004FA 00020000 ....'.......Z.......x........... 0000A0
 001705F6 00020000 001605DE 00020000 001505C6 00020000 001405AE 00020000 ....Û.......ó.......@.......-... 0000C0
 001C0746 00020000 00180644 00020000 001A062C 00020000 0018060E 00020000 ............,.......D.......F... 0000E0
 00000000 00000000 001F07C4 00020000 001E07B2 00020000 001D07A6 00020000 ....!.......ý.......å........... 000100
 6C694618 00010001 00010001 00010001 00010001 00010001 00010001 00010352 R...........................Fil 000120
 6F20726F 7272451D 00646569 66696365 70732065 62207473 75602065 60616E65 ename must be specified..Error o 000140
 20746F6E 20706C65 48170064 65696669 63657073 20656C69 6620676E 696E6570 pening file specified..Help not  000160
 726F7065 52204D41 4C204C44 50230352 00000065 6C62616C 69617661 20746579 yet available...R.#PDL LAM Repor 000180
 4C445019 00545052 2E050020 3A656C69 66206F74 20646574 656C706D 6F632074 t completed to file: ...RPT..PDL 0001A0
 7473756D 20656C69 461E0064 656C6C65 636E6163 2074726F 70657220 4D414C20  LAM report cancelled..File must 0001C0
 676E6974 74616072 6F461A00 6E6F6973 6E657478 65205450 522E2065 76616820  have .RPT extension..Formatting 0001E0

Dump of file SATURN:[PCCOMMON.DUMP.DLL]DMLGLOB.TMP;1 on 18-APR-1990 10:44:56.67
File ID (627,22,0)   End of file block 315 / Allocated 316

Virtual block number 307 (00000133), 512 (0200) bytes

 00010001 00010001 00010001 00010001 0074726F 70657220 4D414C20 4C445020  PDL LAM report................. 000000
 00000000 FFFF0001 000E0352 00000168 00000000 00000000 00000001 00010001 ................h...R........... 000020
 00000000 00F3FFFF 01080043 00010035 00309400 009000ED 00120001 00000006 ........Á.....=.5.İ.C.....µ..... 000040
 00000000 0000FFFF FFFF0101 000800C5 00340005 80014001 00F7002E 00050000 ......¥..a....4.é............... 000060
 00030000 00000000 FFFFFFFF 0109000A 00780029 00058002 00040126 00180003 ....&.......).x................. 000080
 00020003 00000000 0000FFFF FFFF010A 000A0074 001D0005 80020004 013F0019 ..?.........t................... 0000A0
 015C0006 00030000 00000000 FFFFFFFF 0001000C 0026000A 00268002 04000159 Y.....&...&...................\. 0000C0
 01000163 00040003 00000000 0000FFFF FFFF0002 000C0026 000A0056 80020000 ....V...&.....................c... 0000E0
 69726574 7361206E 6120656E 69666544 FFFFFFFF 0102000C 0026000A 00868002 ......&.........Define an asteri 000100
 20736968 74206E69 20292A28 20687369 72657473 61206568 54000000 03006873 sk.....The asterisk (*) in this  000120
 6973736F 70206C6C 417E003A 73746E65 73657270 65722074 6E656D65 74617473 statement represents:.~All possi 000140
 74612067 6E697473 69786520 796C6E4F 7E007365 74756269 72747461 20656C62 ble attributes.~Only existing at 000160
 00000000 00000000 00706C65 48006C65 636E6143 00484F00 73657475 62697274 tributes.OK.Cancel.Help......... 000180
 00189400 009000A4 001C0001 00000004 00000000 FFFF0001 000E0352 00000142 B...R...................Ê....... 0001A0
 00220005 80014001 00C50060 00050000 00000000 00C1FFFF 01240047 00ED0033 3.Ú.G.$...è.........m.é..a....". 0001C0
 0026000A 00648002 04000133 00060003 00000000 0000FFFF FFFF0123 002000E3 D. .#...............3.....d...&. 0001E0

Dump of file SATURN:[PCCOMMON.DUMP.DLL]DMLGLOB.TMP;1 on 18-APR-1990 10:44:56.67
File ID (627,22,0)   End of file block 315 / Allocated 316

Virtual block number 308 (00000134), 512 (0200) bytes

 000C0026 000A0034 80020000 013A0002 00030000 00000000 FFFFFFFF 0002000C ...................:.....4...&... 000000
 0102000C 0026000A 00948002 01000130 00040003 00000000 0000FFFF FFFF0001 ..............=.........&..... 000020
 65737561 6C632045 52454857 20676E69 7373696D 20607269 666E6F43 FFFFFFFF ....Confirm missing WHERE clause 000040
 20746E65 60657461 74732073 25207369 6854203A 676E696E 72615700 00000300 .....Warning: This Xs statement  000060
 60657461 74732065 68542020 2E657375 616C6320 45524548 57206F6E 20736168 has no WHERE clause.  The statem 000080
 65687420 666F2073 45636E61 74736E69 206C6C61 20732520 6C6C6977 20746E65 ent will Xs all instances of the 0000A0
 6C654800 4B4F006C 5636E61 43002E79 7469746E 65206465 69666963 65707320  specified entity..Cancel.OK.Hel 0000C0
 00000000 FFFF0001 000E0352 0000027D 00000000 00000000 00000000 00000070 p..............}...R............ 0000E0
 00000000 018CFFFF 010E008B 00E20009 00279400 00900194 00270001 0000000C ......'.......'...ã.£.....¥..... 000100
 00000000 0000FFFF FFFF010F 000A0097 00AC0005 80004001 01C00021 00050000 ....!.á..a....¯................. 000120
 00030000 00000000 FFFFFFFF 01010008 001E0068 00058000 000101E2 00050005 ....ã........h.................. 000140
 00150003 00000000 0000FFFF FFFF011A 000A009A 009F0005 80030004 01E80020  .Ò............................. 000160
 021F0023 00030000 00000000 FFFFFFFF 0119000A 00680092 00058002 00040209 ..........k..................#... 000180
 00040243 00180003 00000000 0000FFFF FFFF0121 000A00A5 00850005 80020004 .........Ê...!.................C... 0001A0
 80030008 025C0004 00060000 00000000 FFFFFFFF 0118000A 00920078 00058002 ....x......................\..... 0001C0
 00058002 00000261 00000007 00000000 0000FFFF FFFF0110 00080002 005B0007 ..[.@...................a....... 0001E0
```

```
Dump of file SATURN:[PCCOMMON.DUMP.DLL]DMLGLOB.TMP;1 on 18-APR-1990 10:44:56.67
File ID (627,22,0)    End of file block 315 / Allocated 316

Virtual block number 309 (00000135), 512 (0200) bytes

00490005 80000001 02620008 00050000 00000000 FFFFFFFF 01130028 0006001E ..•.(.................b.......!. 000000
0026000A 002E8003 0400026E 00020003 00000000 0000FFFF FFFF0114 00080007 •..................n.........&. 000020
000C0026 000A005E 80020000 02710006 00030000 00000000 FFFFFFFF 0001000C ..................q.....^...&... 000040
0102000C 0026U00A 008E8002 01000278 00040003 00000000 0000FFFF FFFF0002 ................x.........&..... 000060
2F656372 756F7320 726F2073 7365636F 72702061 20796669 63657053 FFFFFFFF ....Specify a process or source/ 000080
44502073 69687420 676E6979 6C707041 00000003 006E6F69 74616E69 74736564 destination.....Applying this PD 0000A0
20657461 6572437E 003A656D 614E003A 6C6C6977 20746E65 6D657461 7473204C L statement will:.Name:.~Create  0000C0
20657461 65724300 6E6F6974 616E6974 7365642F 65637275 6F732077 656E2061 a new source/destination.Create  0000E0
20676E69 74736978 65206E61 20657355 7E007373 65636F72 707E2077 656E2061 a new ~process.~Use an existing  000100
74736978 657E206E 61206573 55006E6F 6974616E 69747365 642F6563 72756F73 source/destination.Use an ~exist 000120
484F0073 2520676E 69747369 78450000 74786554 00737365 636F7270 20676E69 ing process.Text..Existing %s.OK 000140
00000000 FFFF0001 000E0352 00000215 00000000 706C6548 006C6563 6F614300 .Cancel.Help........R........... 000160
00000000 0175FFFF 0115009F 00E20026 00339400 00900158 001C0001 0U·0000A ........X.....3.&.ā.......u..... 000180
00000000 0000FFFF FFFF0116 000A0002 00900005 80014001 01790021 00C·0000 ....!.y..ә......•............... 0001A0
00030000 00000000 FFFFFFFF 01010008 001C0066 00058001 0001019B 0005J005 ...........f.................... 0001C0
00220003 00000000 0000FFFF FFFF0110 000A00A0 00830005 80020004 01A1001F ..À......:....................". 0001E0

Dump of file SATURN:[PCCOMMON.DUMP.DLL]DMLGLOB.TMP;1 on 18-APR-1990 10:44:56.67
File ID (627,22,0)    End of file block 315 / Allocated 316

Virtual block number 310 (00000136), 512 (0200) bytes

01E40004 00060000 00000000 FFFFFFFF 0120000A 00A30076 00068002 000401C1 ė.......v.Ė... ...............ð. 000000
000101E9 00180005 00000000 0000FFFF FFFF011E 00080002 005A0007 80030008 ......Z.•..................Ő... 000020
80020000 02050000 00070000 00000000 FFFFFFFF 01170008 00060048 00058001 ....H.•......................... 000040
002E8002 04000206 00020003 00000000 0000FFFF FFFF011F 00280006 001E0005 ....•.(......................... 000060
000A005F 80020000 02090006 00030000 00000000 FFFFFFFF 0001000C 0026000A ..&......................_... 000080
0026000A 008F8002 01000210 00040003 00000000 0000FFFF FFFF0002 000C0026 &..........................&. 0000A0
73206E6F 69746160 726F666E 69206E61 20796669 63657053 FFFFFFFF 0102000C ........Specify an information s 0000C0
65746174 73204C44 50207369 68742067 6E69796C 70704100 00000300 65726F74 tore.....Applying this PDL state 0000E0
69207765 6E206120 65746165 72437E00 3A656D61 4E003A6C 6C697720 746E656D ment will:.Name:.~Create a new i 000100
6E697473 69786520 6E612065 73557E00 65726F74 73206E6F 69746160 726F666E nformation store.~Use an existin 000120
6E697473 69784500 74786554 0065726F 7473206E 6F697461 6D726F66 6E692067 g information store.Text.Existin 000140
006C6563 6E614300 4B4F0000 7365726F 7473206E 6F697461 6D726F66 6E692067 g information stores..OK.Cancel. 000160
00000000 FFFF0001 000E0352 00000183 00000000 00000000 00000000 706C6548 Help............*...R........... 000180
00000000 012DFFFF 01000088 00CF0031 00809400 0290011C 00100001 00000008 ..................1.ü......-..... 0001A0
00000000 0000FFFF FFFF0001 000C0026 00050024 80020400 01310002 00030000 ......1.....$...&............... 0001C0
00030000 00000000 FFFFFFFF 0002000C 00260005 00548002 00000134 00060003 ....4.....T...&................. 0001E0

Dump of file SATURN:[PCCOMMON.DUMP.DLL]DMLGLOB.TMP;1 on 18-APR-1990 10:44:56.67
File ID (627,22,0)    End of file block 315 / Allocated 316

Virtual block number 311 (00000137), 512 (0200) bytes

00520005 00000000 0000FFFF FFFF0102 000C0026 00050084 80020100 01380004 ..;.........&.................R. 000000
01930000 00070000 00000000 FFFFFFFF 01030012 00C80073 00058001 40010140 ә..ә....s.à..................... 000020
00010194 000A0005 00000000 0000FFFF FFFF0104 004000C3 001A0005 80000000 ........Û.ә..................... 000040
80010001 019F0006 00050000 00000000 FFFFFFFF 01060008 002D0068 00058001 ....h.·......................... 000060
00338001 000101A6 000C0005 00000000 0000FFFF FFFF0105 0008001C 00500005 ..}.....................|.....3. 000080
00000300 79746974 6E65206E 61207463 656C6553 FFFFFFFF 01070008 00960068 h...........Select an entity.... 0000A0
69206574 75626972 74746120 73696854 00706C65 48006C65 636E6143 00484F00 .OK.Cancel.Help.This attribute i 0000C0
7469746E 6520656E 6F206E61 68742065 726F6D20 6E692064 656E6966 65642073 s defined in more than one entit 0000E0
7469746E 65206574 61697270 6F727070 61206568 74207463 656C6553 20202E79 y.  Select the appropriate entit 000100
5F455455 42495254 54410079 7469746E 45003A65 74756269 72747441 00002E79 y...Attribute:.Entity./TTRIBUTE_ 000120
00000000 FFFF0001 000E0352 00000185 00000000 00000000 00000000 00004449 ID.............Ç...R... ....... 000140
00000000 0156FFFF 01330071 00F90028 002F9400 09D0013A 00180001 00000009 ........:.À.../.+.*.q.3...V..... 000160
00000000 0000FFFF FFFF0137 00080038 005F0005 80010001 015A000C 00050000 ......Z........8...7............ 000180
00030000 00000000 FFFFFFFF 013A0008 00640050 00058003 00040167 00140003 ....g.......P.d...:............. 0001A0
00000007 00000000 0000FFFF FFFF0138 0008006C 00500075 80020004 017C0017 ..|.....u.P.l...;............... 0001C0
01950002 00030000 00000000 FFFFFFFF 013C0028 00F00019 00058003 00000194 ..........Þ.(.<................. 0001E0
```

```
Dump of file SATURN.[PCCOMMON.DUMP.DLL]DMLGLOB.TMP;1 on 18-APR-1990 10:44:56.67
File ID (627,22,0)   End of file block 315 / Allocated 316

Virtual block number 312 (00000138), 512 (0200) bytes

00000198 00060003 00000000 0000FFFF FFFF013D 000C0026 0005003A 80020400 ....:...&...=................... 000000
80030100 019F0034 00030000 00000000 FFFFFFFF 013E000C 00260005 006A8002 ..j...&...>..................... 000020
00418002 000801A4 00070006 00000000 0000FFFF FFFF013F 000C0026 0005009A ....&...?..............É.....A. 000040
00430005 80010001 01AC0008 00050000 00000000 FFFFFFFF 01380008 00AE0061 a.Ü...8......................C. 000060
65206E61 20657461 65726320 726F2079 66696365 7053FFFF FFFF0140 00080026 &...a.....Specify or create an e 000080
61206574 61657243 7E003A65 6D616E20 79746974 6E450000 00030079 7469746E ntity.....Entity name:.-Create a 0000A0
746E6520 676E6974 73697865 206E6120 6573557E 00797469 746E6520 77656E20  new entity.-Use an existing ent 0000C0
69746E45 00656D61 6E746E65 00706C65 48006C65 636E6143 004B4F00 00797469 ity..OK.Cancel.Help.entname.Enti 0000E0
00000000 FFFF0001 000E0352 00000289 00000000 00000000 00000000 73656974 ties............¿...R........... 000100
00000000 01E5FFFF 012500B8 00FA0017 009F9400 00900100 00140001 0000000E ........Å.........*.£.X...I..... 000120
00000000 0000FFFF FFFF0127 00080002 00AF0005 80014001 01E90021 00050000 ....I.Ö..a....£.@...'........... 000140
00030000 00000000 FFFFFFFF 01260008 006800A2 00848002 0004020B 00170003 ............Á.k...&............. 000160
00110005 00000000 0000FFFF FFFF0128 00070078 00A20005 80020004 0223001A ..#.......Á.x...(............... 000180
02500000 00070000 00000000 FFFFFFFF 012C0008 004B0038 00058001 0001023E >.......;.K...,...............P. 0001A0
00040251 00110003 00000000 0000FFFF FFFF0132 002000F0 00550004 80000000 ......U.Þ. .2...............Q... 0001C0
80020004 0263001C 00030000 00000000 FFFFFFFF 012D0008 00540048 00058002 ....H.T...-................c..... 0001E0

Dump of file SATURN:[PCCOMMON.DUMP.DLL]DMLGLOB.TMP;1 on 18-APR-1990 10:44:56.67
File ID (627,22,0)   End of file block 315 / Allocated 316

Virtual block number 313 (00000139), 512 (0200) bytes

00058001 00010280 000F0005 00000000 0000FFFF FFFF012E 00080086 0048005E ^.H............................. 000000
00890007 80020008 02900004 00060000 00000000 FFFFFFFF 01410008 00[illegible]30095 ..C...A......................... 000020
00060077 00058001 00010295 00130005 00000000 0000FFFF FFFF0142 00[illegible]0EC &...B......................w.@. 000040
002000F0 00190005 80000000 02A90000 00070000 00000000 FFFFFFFF 012B[illegible]08 ..+.......................Þ. . 000060
0001000C 00260005 003A8003 040002AA 00020003 00000000 0000FFFF FFFF0129 )...................:...&..... 000080
FFFF0140 000C0026 0005006A 80020000 02A00006 00030000 00000000 FFFFFFFF ..............Ù.....j...&...a... 0000A0
FFFFFFFF 0102000C 00260005 009A8002 01000284 00040003 00000000 0000FFFF ............Ç........& ........ 0000C0
6E69796C 70704100 00000300 65747562 69727474 61206E61 20796669 63657053 Specify an attribute.... Applyin 0000E0
61657243 7E003A6C 6C697720 746E656D 65746174 73204C44 50207369 68742067 g this PDL statement will:.-Crea 000100
74736978 65206E61 20657355 7E006574 75626972 74746120 77656E20 61206574 te a new attribute.-Use an exist 000120
00736569 7469746E 6520676E 69747369 78450065 74756269 72747461 20676E69 ing attribute.Existing entities. 000140
6E697E20 6F742068 63617474 41007974 69746E65 7E206F74 20686361 74744100 .Attach to ~entity.Attach to ~in 000160
003A656D 616E2065 74756269 72747441 006C6564 6F6D206E 6F697461 6D726F66 formation model.Attribute name:. 000180
6E614300 4B4F0000 73657475 62697274 74612067 6E697473 69784500 74786554 Text.Existing attributes..OK.Can 0001A0
00000000 FFFF0001 000E0352 0000023D 00000000 00000000 706C6548 006C6563 cel.Help........=...R........... 0001C0
00000000 0192FFFF 010B00AE 00E20012 00AD9400 00900176 00180001 0000000B ........v.....U...â.Ù........... 0001E0

Dump of file SATURN:[PCCOMMON.DUMP.DLL]DMLGLOB.TMP;1 on 18-APR-1990 10:44:56.67
File ID (627,22,0)   End of file block 315 / Allocated 316

Virtual block number 314 (0000013A), 512 (0200) bytes

00000000 0000FFFF FFFF0116 000800D2 00A10005 80014001 01960020 00050000 .... ....a....Á.@............... 000000
00030000 00000000 FFFFFFFF 01010008 001C0061 00058001 000101B7 00050005 ....ñ.......a................... 000020
00210003 00000000 0000FFFF FFFF0143 000800A0 0094000A 80020004 0180001E ..§.............C.............!. 000040
01FE0004 00060000 00000000 FFFFFFFF 01440008 00A30087 000A8002 000401DC É.........É...D...............*. 000060
00010203 001A0005 00000000 0000FFFF FFFF0147 00080004 00550007 80030008 ......U.Å...G................... 000080
80020000 021E0000 00070000 00000000 FFFFFFFF 01450008 00060043 00058001 ....C.@...E..................... 0000A0
002E8002 0400021F 00020003 00000000 0000FFFF FFFF0148 002800D8 00190005 ....Á.(.H....................... 0000C0
0005005E 80020000 02220006 00030000 00000000 FFFFFFFF 0001000C 00260005 ..&...................".....^... 0000E0
00260005 008E8002 01000229 00040003 00000000 0000FFFF FFFF0002 000C0026 &...................)........&. 000100
00100002 00710005 80014001 022E000E 00050000 00000000 FFFFFFFF 0102000C ......................a....q.@... 000120
6F6C6620 6E6F6974 616D726F 666E6920 6E612079 66696365 7053FFFF FFFF0146 F.....Specify an information flo 000140
6E656D65 74617473 204C4450 20736968 7420676E 69796C70 70410000 00030077 w.....Applying this PDL statemen 000160
726F666E 69207765 6E206120 65746165 72437E00 3A656D61 4E006C6C 69772074 t will.Name:.~Create a new infor 000180
666E6920 676E6974 73697865 206E6120 6573557E 00776F6C 66206E6F 69746160 mation flow.-Use an existing inf 0001A0
6F666E69 20676E69 74736978 45007478 65540077 6F6C6620 6E6F6974 616D726F ormation flow.Text.Existing info 0001C0
72660070 6C654800 6C65636E 6143004B 4F000073 776F6C66 206E6F69 74616D72 rmation flows..OK.Cancel.Help.fr 0001E0
```

```
Dump of file SATURN:[PCCOMMON.DUMP.DLL]DMLGLOB.TMP;1 on 18-APR-1990 10:44:56.67
File ID (627,22,0)   End of file block 315 / Allocated 316

Virtual block number 315 (0000013B), 512 (0200) bytes

00000000 FFFF0001 000E0352 0000010Z 00000000 3A732520 6F742073 2520606F om Xs to Xs:....@...R........... 000000
00000000 0185FFFF 012C007F 00D80010 004E9400 00900176 000E0001 00000008 ........v.....N...Á...,......... 000020
00000000 0000FFFF FFFF0120 00080036 00700008 80010001 0189000A 00050000 .............p.6...-............ 000040
00050000 0000L000 FFFFFFFF 012E0008 00400070 00488002 000C0194 00050006 ..........H.p.a................. 000060
00000005 00000000 0000FFFF FFFF012F 00080050 00640008 80010001 019A0013 ..........d.P.../............... 000080
01AF0005 00050000 00000000 FFFFFFFF 01300008 00840064 00548001 000101AE Ù.....1.d.....0...............£. 0000A0
000001B5 00000007 00000000 0000FFFF FFFF0131 00080020 0058000C 80010001 ......X.  ...1...............Ç... 0000C0
80010001 01B60008 00050000 00000000 FFFFFFFF 01320038 0058001C 000C8000 ......X.8.2................Ñ..... 0000E0
00748000 000001C2 00000007 00000000 0000FFFF FFFF0133 00080040 00580074 t.X.a...3...............ô......t. 000100
000C0028 8003040U 01C30002 00030000 00000000 FFFFFFFF 01340038 0058001C ..X.8.4...............ù.....(... 000120
0026000C 00588002 000001C6 00060003 00000000 0000FFFF FFFF0001 000C0026 &...................ó.....X...&. 000140
000C0026 000C0088 80020100 01C00004 00030000 00000000 FFFFFFFF 0002000C ...................é.........&... 000160
616E2065 6C694600 00000300 74726F70 6552204D 414C204C 4450FFFF FFFF0135 5.....PDL LAM Report.....File na 000180
46000020 3A79726F 74636572 69642074 6E657272 75430054 50522E2A 003A6560 me:.*.RPT.Current directory: ..F 0001A0
6C654800 6C65636E 61430048 4F000073 6569726F 74636572 69440000 73656C69 iles..Directories..OK.Cancel.Hel 0001C0
00000000 00000000 00000000 00000000 00000000 00000000 00000000 00000070 p............................... 0001E0

Dump of file SATURN:[PCCOMMON.DUMP.DLL]DMLLL.TMP;1 on 18-APR-1990 10:45:34.77
File ID (633,15,0)   End of file block 5 / Allocated 8

Virtual block number 1 (00000001), 512 (0200) bytes

00000000 00000040 00000000 00000088 0000FFFF 00000004 00000005 00F25A4D MZ..............!.......a....... 000000
00000080 00000000 00000000 00000000 00000000 00000000 00000000 00000000 ................................ 000020
6F6E6E61 63206061 72676F72 70207369 685421CD 4C01B821 CD09B400 0EBA1F0E ..o..Ç.ël¡.LèIThis program canno 000040
00000000 00000024 0A0D002E 65646F60 20534F44 206E6920 6E757220 65622074 t be run in DOS mode....$....... 000060
00020003 00000000 00000000 00000400 0003800A 313EE967 0025011C 0505454E NE....X.gÔ>1.................... 000080
00000000 00000000 00010000 00040000 000001C1 00D900D5 00580058 00400029 ).a.X.X.Í.l.è................... 0000A0
00006C6C 6C6D6405 00020E01 00000000 00480F00 0048008A 06740F00 0673001F ..s...t...H...H..........dmlll.. 0000C0
45524C4C 0A00034F 52455A4C 4C060002 5458454E 4C4C0600 014C4941 544C4C06 .LLTAIL...LLNEXT...LLZERO...LLRE 0000E0
504C4C0A 00064554 454C4544 4C4C0800 05444145 484C4C06 00044556 45495254 TRIEVE...LLHEAD...LLDELETE...LLP 000100
09594F52 54534544 4C4C0900 08444145 48444441 4C4C0900 0753554F 49564552 REVIOUS...LLADDHEAD...LLDESTROY. 000120
4143534F 44080000 0A000100 00084854 474E454C 4C4C0800 0A444441 4C4C0500 ..LLADD...LLLENGTH.........DOSCA 000140
48534045 4D114B43 4F4C4243 4F4C4C41 4552414B 53404540 124D4540 03534C4C LLS.MEN.MEMSHAREALLOCBLOCK.MEMSH 000160
A7030108 54524556 4E4F4345 52414853 4D45400F 48434F4C 42454552 46455241 AREFREEBLOCK.MEMSHARECONVERT...! 000180
00058603 01AE0306 1E030315 03012003 04280300 7F030170 03050703 00000300 ..Å..■..p.....+.. ........Ù..Ñ.. 0001A0
7573204C 40442072 6F662065 67616B63 61702074 73696C20 6465686E 694C2500 .%Linked list package for DML su 0001C0
6A0676FF D88EFFFF 881E5657 000008C8 00000000 00000000 00606574 73797362 bsystem.........à...WV.¡...A.v.j 0001E0

Dump of file SATURN:[PCCOMMON.DUMP.DLL]DMLLL.TMP;1 on 18-APR-199^ 10:45:34.77
File ID (633,15,0)   End of file block 5 / Allocated 8

Virtual block number 2 (00000002), 512 (0200) bytes

76FF004C E90000BA 00008800 09E90375 00003D00 00FFFF9A 5016FC46 80106A02 .j..F=.P.....=..u.Ö..¡..□..ÖL..v 000000
6A0028E9 00008A00 00880009 E9037500 00300000 FFFF9A50 16F84680 FC76FFFE ±.v=.F%.P.....=..u.Ö..¡..□..Ö+.j 000020
57892607 8926FE56 88FC4688 F85EC408 C483FFFF 00009AF8 76FFFA76 FF006A10 .j..v°.v%......á.á^%.F=.V±&..&.W 000040
8B26065E C4088E00 08881E56 57000000 C8CBC95F 5E1F0000 E9FA5688 F8468802 ..F%.V°Ö...^_èúà...WV.¡...Äó^.&. 000060
87881E56 57000000 C80004CA C95F5E1F 0A578926 08478926 065EC402 57882607 .&.W.á^.&.G.Ë.W..^_èò..à...WV.¡. 000080
0004CAC9 5F5E1F0A 57892608 47892606 5EC40657 88260447 8826065E C4088E00 ..Äó^.&.G.&.W.á^.&.G.&.W..^_èò.. 0000A0
0009E903 74064708 2604478B 26085FC4 26065EC4 D88E00AF 881E5657 000000C8 à...WV.¡£..Äó^.&ó_.&.G.&.G.ī.Ö.. 0000C0
26084789 26065EC4 06578826 04478826 085FC426 065EC400 20E90023 E9000088 ¡..Ö#.Ö .á^.&á_.&.G.&.W.á^.&.G.& 0000E0
26065EC4 D88E0008 881E5657 000000C8 0004CAC9 5F5E1F00 00E90001 880A5789 .W.¡..Ö...^_èò..à...WV.¡Á..Äó^.& 000100
085FC426 065EC400 20E90023 E9000088 0009E903 740A4708 2608478B 26085FC4 á_.&.G.&.G.ī.Ö..¡..Ö#.Ö .á^.&á_. 000120
0004CAC9 5F5E1F00 00E90001 880A5789 26084789 26065EC4 0A578826 08478826 &.G.&.W.á^.&.G.&.W.¡..Ö...^_èò.. 000140
26065EC4 0012E903 750A4708 2608478B 26065EC4 D88E0128 881E5657 000000C8 à...WV.¡(..Äó^.&.G.&.G.u.Ö..á^.& 000160
04C80004 CAC95F5E 1F0000E9 00008A00 00880006 E90E578B 260C478B 26085FC4 á_.&.G.&.W.Ö..¡..□..Ö...^_èò..à. 000180
E90374D0 0BFE5689 FC468902 C483FFFF 00009A0E 76FFD88E 0178881E 56570000 ..WV.¡x..Á.v.......á..F=.V±.Át.Ö 0001A0
0C478826 0A5EC40E 5789260C 47892608 56880646 88FC5EC4 0136E984 98880006 ..¡..Öó.á^=.F..V.&.G.&.W.á^.&.G. 0001C0
4789260A 5EC40A57 89260847 8926FE56 88FC4688 0A5EC400 5FE90374 0E470826 &.G.t.Ö_.á^..F=.V±&.G.&.W.á^.&.G 0001E0
```

```
Dump of file SATURN:[PCCOMMON.DUMP.DLL]DMLLL.TMP;1 on 18-APR-1990 10:45:34.77
File ID (633,15,0)   End of file block 5 / Allocated 8

Virtual block number 3 (00000003), 512 (0200) bytes

08478926 00008A00 0088085F C4260A5E C4025789 26078926 0A5EC406 57892604 .&.W.&^.&..&.W.&^.&&.¡..¤..&.G. 000000
0E47C726 00010C47 C7260A5E C4065789 26044789 26085FC4 260A5EC4 0A578926 &.W.&^.&&.&.G.&.W.&^.&ÚG...&ÚG. 000020
04478826 085FC426 0A5EC400 0E578326 010C4783 260A5EC4 0086E900 00880000 ..¡..ÕÑ.&^.&.G..&.W..&^.&&.&.G. 000040
478926FC 5EC40A57 88260847 88260A5E C4065789 26044789 26FC5EC4 06578826 &.W.&^•&.G.&.W.&^.&.G.&.W.&^•&.G 000060
06573926 001DE903 74044739 260A5EC4 0A578826 08478826 0A5EC40A 57892608 .&.W.&^.&.G.&.W.&^.&9G.t.Õ..&9W. 000080
085FC426 0A5EC400 19E90657 89260447 8926FE56 88FC4688 0A5EC400 14E90374 t.Õ..&^..F•.V±&.G.&.W.Õ..&^.&&.  0000A0
26FE5688 FC46880  5FC4260A 5EC40A57 89260847 8926FE56 88FC4688 045FC426 &&..F•.V±&.G.&.W.&^.&&..F•.V±&  0000C0
5E1F0000 E90000B. 0A578926 08478926 FE5688FC 46880A5E C4065789 26044789 .G.&.W.&^..F•.V±&.G.&.W.¡..Õ...^ 0000E0
89FC4689 02C48301 C000009A 0E76FF08 8E018688 1E565700 0004C800 0ACAC95F _èò..à...WV.¡Ñ..Á.v....à..à..F•. 000100
0E578926 0C478926 08568806 4688FC5E C400E5E9 84988800 06E90374 D008FE56 V±.Àt.Õ..¡..Õl.&^•.F..V.&.G.&.W. 000120
57892608 478926FE 5688FC46 880A5EC4 005FE903 740E4708 260C4788 260A5EC4 &^.&.G.&.G.t.Õ_.&^..F•.V±&.G.&.W 000140
00008808 5FC4260A 5EC40257 89260789 260A5EC4 06578926 04478926 0A5EC40A .&^.&.G.&.W.&^.&..&.W.&^.&&.¡..  000160
47C7260A 5EC40657 89260447 8926085F C4260A5E C40A5789 26084789 2600008A ¤..&.G.&.W.&^.&&.&.G.&.V.&^.&ÚG 000180
88FC5EC4 000E5783 26010C47 83260A5E C40065E9 00008800 000E47C7 2600010C ...&ÚG...¡..Õe.&^.&.G..&.W..&^•¡ 0001A0
C4065789 26044789 26FC5EC4 02578826 0788260A 5EC40847 89260A47 89260000 ..&.G.&.G.&^.&..&.W.&^•&.G.&.W.& 0001C0
26078926 FE5688FC 46880A5E C40A5789 26084789 26FE5688 FC46881F C4260A5E ^.&&..F•.V±&.G.&.W.&^..F•.V±&..& 0001E0

Dump of file SATURN:[PCCOMMON.DUMP.DLL]DMLLL.TMP;1 on 18-APR-1990 10:45:34.77
File ID (633,15,0)   End of file block 5 / Allocated 8

Virtual block number 4 (00000004), 512 (0200) bytes

57000008 C8000ACA C95F5E1F 0000E900 00880A57 89260847 89260A5E C4025789 .W.&^.&.G.&.W.¡..Õ...^_èò..à...W 000000
57392600 47E90374 08473926 065EC402 57882607 8826065E C4088E03 10881E56 V.¡...Ã&^.&..&.W.&^.&9G.t.ÕG.&9W 000020
57392600 27E90374 C4473926 065EC40A 57882608 47882606 5EC4003E E903740A .t.Õ>.&^.&.G.&.W.&^.&9G.t.Õ'.&9W 000040
57892607 8926065E C4065789 26044789 2600008A 00008806 5EC4001E E9037406 .t.Õ..&^.¡..¤..&.G.&.W.&^.&..&.W 000060
03740A57 39260035 E9037408 47392606 5EC40257 8826078B 26065EC4 00E6E902 .Õl.&^.&..&.W.&^.&9G.t.Õ5.&9W.t. 000080
C426065E C4025789 26078926 065EC406 57882604 4788261F C426065E C4002CE9 Õ,.&^.&&.&.G.&.W.&^.&..&.W.&^.&& 0000A0
47392606 5EC40A57 88260847 8826065E C4009BE9 08478926 0A478926 0000881F .¡..&.G.&.G.Õ..&^.&.G.&.W.&^.&9G 0000C0
5EC40A57 88260847 8826045F C426065E C4002FE9 03740657 39260038 E9037404 .t.Õ8.&9W.t.Õ/.&^.&&.&.G.&.W.&^ 0000E0
5EC4004C E9044789 26064789 26000088 045FC426 065EC406 57892604 47892606 .&.G.&.W.&^.&&.¡..&.G.&.G.ÕL.&^ 000100
88260447 8826085F C426065E C4FA5689 F846890A 57882608 47882608 5FC42606 .&&.&.G.&.W..F½.V•&^.&&.&.G.&. 000120
88F84688 FC5EC406 57892604 478926FE 5688FC46 88F85EC4 FE5689FC 46890657 W..F•.V±&^½.F•.V±&.G.&.W.&^•.F½. 000140
065EC400 00FFFF9A 37FF2602 77FF2608 5FC42606 5EC40A57 89260847 8926FA56 V•&.G.&.W.&^.&&.&.w.&.7.....&^. 000160
1F000E5F 8326010C 6F832606 5EC40A57 89260847 8926065E C402578B 26078826 &..&.W.&^.&.G.&.W.&^.&.o..&..... 000180
0000E90E 5788260C 47882606 5EC4088E 04338B1E 56570000 00C80004 CAC95F5E ^_èò..à...WV.¡3..Ã&^.&.G.&.W.Õ.. 0001A0
08478926 00008A00 0088065E C4088E05 8E881E56 57000000 C80004CA C95F5E1F .^_èò..à...WV.¡f..Ã&^.¡..¤..&.G. 0001C0
26000088 065EC402 57892607 8926065E C4065789 26044789 26065EC4 0A578926 &.Ü.&^.&.G.&.W.&^.&..&.W.&^.¡..& 0001E0

Dump of file SATURN:[PCCOMMON.DUMP.DLL]DMLLL.TMP;1 on 18-APR-1990 10:45:34.77
File ID (633,15,0)   End of file block 5 / Allocated 8

Virtual block number 5 (00000005), 512 (0200) bytes

0676FF08 76FFD88E 05DF881E 56570000 00C80004 CAC95F5E 1F0C4789 260E4789 .G.&.G..^_èò..à...WV.¡Õ..Á.v..v. 000000
05869A06 76FF0876 FF065000 7F9A0676 FF0876FF 002BE903 75000806 4505869A .Ñ.E..Àu.Õ+..v..v....P..v..v..Ñ. 000020
5F5E1F00 00E90000 B8FFE0E9 03270428 9A0676FF 0876FF00 0EE90375 D0080662 b..Àu.Õ...v..v..+.'.ÕÁ.¡..Õ...^_ 000040
19020300 00000306 26000200 00000200 5C000200 00000106 33000200 0604CAC9 èò.....3.......\.......&........ 000060
00000000 00000000 00000000 33000200 3A020300 21000205 89020300 0E000200 ...........!...:...3............ 000080
46880128 0187D103 0323D818 D1280C74 DAF7D788 067EC457 38E30C4E 88EC8855 U.&.N.D8W&-..■¼Õt.+1.Ü#&.1.i+1.F 0000A0
5FAAF3C9 13ABF3E9 D1C38EFF FFC381C3 8C10E301 87AAF3C9 13ABF3E9 D1E08A0A ..Àiõµ".èµ'.ÍD..ù.ù...ùiõµ".èµ'_ 0000C0
00000000 00000000 00000000 00000088 00010033 01050001 CB500856 88064688 .F..V.Jù....3.................. 0000E0
00000000 00000000 00000000 00000000 00000000 00000000 00000000 00000000 ................................ 000100
00000000 00000000 00000000 00000000 00000000 00000000 00000000 00000000 ................................ 000120
00000000 00000000 00000000 00000000 00000000 00000000 00000000 00000000 ................................ 000140
00000000 00000000 00000000 00000000 00000000 00000000 00000000 00000000 ................................ 000160
00000000 00000000 00000000 00000000 00000000 00000000 00000000 00000000 ................................ 000180
00000000 00000000 00000000 00000000 00000000 00000000 00000000 00000000 ................................ 0001A0
00000000 00000000 00000000 00000000 00000000 00000000 00000000 00000000 ................................ 0001C0
00000000 00000000 00000000 00000000 00000000 00000000 00000000 00000000 ................................ 0001E0
```

```
Dump of file SATURN:[PCCOMMON.DUMP.DLL]DMLUT.TMP;1 on 18-APR-1990 10:45:36.60
File ID (634,15,0)   End of file block 12 / Allocated 12

Virtual block number 1 (00000001), 512 (0200) bytes

00000000 00000040 00000000 00000088 0000FFFF 00000004 0000000C 01895A4D MZ..............|.......a....... 000000
00000080 00000000 00000000 00000000 00000000 00000000 00000000 00000000 ................................ 000020
6F6E6E61 63206C61 72676F72 70207369 685421CD 4C01B821 CD09B400 0EBA1F0E ..a..Ç.ë|.L.!This program canno 000040
00000000 00000024 0A0D0D2E 65646F60 20534F44 206E6920 6E757220 65622074 t be run in DOS mode....$....... 000060
00030003 00000000 00020000 00000800 0003800E 77B49EDC 00340343 0505454E NE..C.4.É.Çw.................... 000080
00000000 00000000 00010000 00040000 000003F7 01D601D0 00580058 00400000 ..a.X.X.À.ø.%................... 0000A0
00005455 4C4D4405 00020E01 00000000 000F0F00 000F0177 12800F00 12800041 A.¯...¯.w...............DMLUT.. 0000C0
52455453 49474552 54554C4D 44130001 41544144 58554154 45535455 4C4D440F .DMLUTSETAUXDATA...DMLUTREGISTER 0000E0
0352454C 444E4148 59464954 4F4E4548 414D5455 4C4D4416 00024554 454C4544 DELETE...DMLUTMAKENOTIFYHANDLER. 000100
58554159 52455551 54554C4D 44110004 4D544845 474E4148 4354554C 4D440E00 ..DMLUTCHANGEHTM...DMLUTQUERYAUX 000120
52454C44 4E414859 4649544F 4E594F52 54534544 54554C4D 44190005 41544144 DATA...DMLUTDESTROYNOTIFYHANDLER 000140
45525455 4C4D4413 00074554 414C4552 52455453 49474552 54554C4D 44130006 ...DMLUTREGISTERRELATE...DMLUTRE 000160
45444F4D 52455453 49474552 54554C4D 44160008 45544145 52435245 54534947 GISTERCREATE...DMLUTREGISTERMODE 000180
4C4D4410 000A4554 49525752 45545349 47455254 554C4044 12000945 4D414E4C LNAME...DMLUTREGISTERWRITE...DML 0001A0
59464954 4F4E5952 45555154 554C4D44 16000854 45535245 54534947 45525455 UTREGISTERSET...DMLUTQUERYNOTIFY 0001C0
00004554 414C4552 4E555245 54534947 45525455 4C4D4415 000C454C 444E4148 HANDLE...DMLUTREGISTERUNRELATE.. 0001E0

Dump of file SATURN:[PCCOMMON.DUMP.DLL]DMLUT.TMP;1 on 18-APR-1990 10:45:36.60
File ID (634,15,0)   End of file block 12 / Allocated 12

Virtual block number 2 (00000002), 512 (0200) bytes

4C4D441B 000E4554 454C4544 45544145 52435245 54534947 45525455 4C4D4419 .DMLUTREGISTERCREATEDELETE...DML 000000
54554C4D 4412000F 4554414C 45524E55 4554414C 45525245 54534947 45525455 UTREGISTERRELATEUNRELATE...DMLUT 000020
414D454D 0D4D454D 03000082 00200001 00001059 4649544F 4E535345 434F5250 PROCESSNOTIFY..... .....MEM.MEMA 000040
41424C54 55105455 44034B43 4F4C4245 4552464D 454D0C4B 434F4C42 434F4C4C LLOCBLOCK.MEMFREEBLOCK.DUT.UTLBA 000060
13524F53 52554345 5341454C 45524741 424C5455 13524F53 52554354 494E4947 GINITCURSOR.UTLBAGRELEASECURSOR. 000080
550C454B 414D5145 534C5455 0A524F53 52554345 54415245 54494741 424C5455 UTLBAGITERATECURSOR.UTLSEQMAKE.U 0000A0
4C4D4400 6C6D6403 4C454853 55505145 534C5455 0C454B41 4D4E5551 45534C54 TLSEQUNMAKE.UTLSEQPUSHEL.dml.DML 0000C0
4D441845 474E4148 43545845 4E595245 55514C4D 44124449 4C4D4459 52455551 QUERYDMLID.DMLQUERYNEXTCHANGE.DM 0000E0
44595245 55514C4D 44184F46 4E494547 4E414843 45544145 52435952 4555514C LQUERYCREATECHANGEINFO.DMLQUERYD 000100
474E4148 43544553 59524555 514C4D44 154F464E 4945474E 41484345 54454C45 ELETECHANGEINFO.DMLQUERYSETCHANG 000120
464E4945 474E4148 43545845 54455449 52575952 4555514C 4D44184F 464E4945 EINFO.DMLQUERYWRITETEXTCHANGEINF 000140
55514C4D 441A4F46 4E494547 4E414843 4554414C 45525952 4555514C 4D44184F O.DMLQUERYRELATECHANGEINFO.DMLQU 000160
4F4D5952 4555514C 4D44184F 464E4945 474E4148 43455441 4C45524E 55595245 ERYUNRELATECHANGEINFO.DMLQUERYMO 000180
59464954 4F4E5952 4555514C 4D44114F 464E4945 474E4148 43454D41 4E4C4544 DELNAMECHANGEINFO.DMLQUERYNOTIFY 0001A0
05DF0302 A90300C9 030F0803 1238030E D3030000 03036103 12050301 104D5448 HTM......a.....£..;.....è..`..Ô. 0001C0
4C442E74 756C6064 09000006 8D030240 03041903 01880312 7503046F 03053103 .1..o..u........M.......dmlut.DL 0001E0

Dump of file SATURN:[PCCOMMON.DUMP.DLL]DMLUT.TMP;1 on 18-APR-1990 10:45:36.60
File ID (634,15,0)   End of file block 12 / Allocated 12

Virtual block number 3 (00000003), 512 (0200) bytes

680E76FF D88EFFFF 881E5657 000006C8 00000000 00000000 00000000 0000004C L...............à...WV.|...Ä.v.h 000000
0092E9FA 46880006 E9037500 003DFA46 890000FF FF9A0676 FF0876FF 2A6A0086 ..j*.v..v.......F*=..u.Ô...F*Ô.. 000020
02578926 0789260C 56880A46 8BFC5EC4 FE5689FC 46890257 8B26078B 26065EC4 á^.&..&.W..F•.V±á^•.F..V.&..&.W. 000040
89260000 8BFC5EC4 0E478926 10478926 00008BFC 5EC40447 89260E46 8BFC5EC4 á^•.F.&.G.á^•|..&.G.&.G.á^•|..&. 000060
89261C47 89260000 8BFC5EC4 16478926 18478926 00008BFC 5EC41247 89261447 G.&.G.á^•|..&.G.&.G.á^•|..&.G.&. 000080
5EC42247 89262447 89260000 8BFC5EC4 1E478926 20478926 00008BFC 5EC41A47 G.á^•|..&.G &.G.á^•|..&.G$&.G"á^ 0000A0
1E565700 000AC800 0ACAC95F 5E1F0000 E9000088 26478926 28478926 000088FC •|..&.G(&.G&|..Ô...^ èò..à...WV. 0000C0
29E90374 10470826 0E478826 F85EC4FA 5689F846 89105688 0E4688D8 8E000888 |...Ä.F..V..F½.V*á^½&.G.&.G.t.Ô) 0000E0
7500F67E 83F64689 0000FFFF 9A505200 0E05FA56 88F8468B 0477FF26 F85EC400 .á^½&.w..F½.V*...RP......F-.—.u 000100
0000001B 9A5016FC 4680086A 00866804 77FF26F8 5EC4006A E9F6468B 0006E903 .Ô...F-Ôj.á^½&.w.h..j..F•.P..... 000120
0A4688FC 5EC40789 260C4688 FC5EC400 43E9F646 880006E9 03750000 3DF64689 .F-*..u.Ô...F-ÔC.á^•.F.&..á^•.F. 000140
5052000E 05FA568B F8468806 57892604 47892608 56880646 8BFC5EC4 02478926 &.G.á^•.F..V.&.G.&.W..F½.V*...RP 000160
5700000A C8000CCA C95F5E1F 0000E9F6 4688F646 890000FF FF9AFC76 FFFE76FF .v±.v•......F-.F-Ô...^ èò..à...W 000180
03741447 0B261247 8B26FC5E C4FE5689 FC468910 56880E46 8BD88E00 D1881E56 V.|1..Ä.F..V..F•.V±á^•Ï.G.&.G.t. 0001A0
F67E83F6 46890000 01049A50 52001205 FE5688FC 46880477 FF26FC5E C40029E9 Ô).á^•&.w..F•.V±...RP......F-.-- 0001C0
012C9A50 16F8468D 086A0086 680477FF 26FC5EC4 006AE9F6 46880006 E9037500 .u.Ô...F-Ôj.á^•&.w.h..j..F½.P.,. 0001E0
```

```
Dump of file SATURN:[PCCOMMON.DUMP.DLL]DMLUT.TMP;1 on 18-APR-1990 10:45:36.60
File ID (634,15,0)   End of file block 12 / Allocated 12

Virtual block number 4 (00000004), 512 (0200) bytes

 88F85EC4 0789260C 4688F85E C40043E9 F6468800 06E90375 00003DF6 46890000 ...F-=..u.Ö...F-ÖC.á^½.F.&..á^½. 000000
 001205FE 5688FC46 88065789 26044789 26085688 064688F8 5EC40247 89260A46 F.&.G.á^½.F..V.&.G.&.W..F•.V±... 000020
 0002C800 0CCACv5F 5E1F0000 E9F6468B F6468900 0001779A F876FFFA 76FF5052 RP.v*.v½.w....F-.F-Ö...^_èò..à.. 000040
 029700C9 9A0A76FF 0C76FF0E 76FF1076 FF1276FF 1476FF08 8E019388 1E565700 .WV.¡...Á.v..v..v..v..v..v..è... 000060
 76FF0E76 FF1076FF 1276FF14 76FF0020 E9FE468B 0006E903 7500FE7E 83FE4689 .F±.-±.u.Ö...F±Ö ..v..v..v..v..v 000080
 1E565700 000AC800 10CAC95F 5E1F0000 E9FE468B FE4689FF FF0189A 0676FF08 ..v.......F±.F±Ö...^ èò..à...WV. 0000A0
 29E90374 18470826 16478826 F85EC4FA 5689F846 890E5688 0C468808 8E025588 ¡U..Á.F..V..F½.V*á^½Ï.G.&.G.t.Ö) 0000C0
 7500F67E 83F64689 000001C6 9A505200 1605FA56 88F84688 0477FF26 F85EC400 .á^½&.w..F½.V*...RP.ó....F-.--.u 0000E0
 000001EE 9A5016FC 4680066A 00866804 77FF26F8 5EC40060 E9F64688 0006E903 .Ö...F-Ö'.á^½&.w.h..j..F•.P.Ÿ... 000100
 064688FC 5EC40789 260A4688 FC5EC400 39E9F646 880006E9 03750000 30F64689 .F-=..u.Ö...F-Ö9.á^•.F.&..á^•.F. 000120
 0002399A FC76FFFE 76FF5052 001605FA 5688F846 88045789 26024789 26085688 .V.&.G.&.W..F½.V*...RP.v±.v•.9.. 000140
 0C468808 8E028188 1E565700 000AC800 0ACAC95F 5E1F0000 E9F6468B F6468900 ..F-.F-Ö...^ èò..à...WV.¡Ÿ..Á.F. 000160
 0477FF26 F85EC400 29E90374 1C470826 1A478826 F85EC4FA 5689F846 890E5688 .V..F½.V*á^½Ï.G.&.G.t.Ö).á^½&.w. 000180
 E9F64688 0006E903 7500F67E 83F64689 000002E4 9A505200 1A05FA56 88F84688 .F½.V*...RP.ò....F-.--.u.Ö...F-Ö 0001A0
 03750000 30F64689 0000030C 9A5016FC 4680066A 00866804 77FF26F8 5EC40060 '.á^½&.w.h..j..F•.P......F-=..u. 0001C0
 26024789 26085688 064688FC 5EC40789 260A4688 FC5EC400 39E9F646 880006E9 Ö...F-Ö9.á^•.F.&..á^•.F..V.&.G.& 0001E0

Dump of file SATURN:[PCCOMMON.DUMP.DLL]DMLUT.TMP;1 on 18-APR-1990 10:45:36.60
File ID (634,15,0)   End of file block 12 / Allocated 12

Virtual block number 5 (00000005), 512 (0200) bytes

 E9F6468B F6468900 00034D9A FC76FFFE 76FF5052 001A05FA 5688F846 88045789 .W..F½.V*...RP.v±.v•.M....F-.F-Ö 000000
 76FF0E76 FF1076FF 1276FFD8 8E036988 1E565700 0002C800 0ACAC95F 5E1F0000 ...^_èò..à...WV.¡i..Á.v..v..v..v 000020
 76FF1276 FF001DE9 FE468800 06E90375 00FE7E83 FE468904 5D02A99A 0A76FF0C ..v..¯.]..F±.-±.u.Ö...F±Ö...v..v 000040
 C8000ECA C95F5E1F 0000E9FE 4688FE46 89026E03 619A0676 FF0876FF 0E76FF10 ..v..v..v..a.n..F±.F±Ö...^ èò..à 000060
 08261E47 8826F85E C4FA5689 F8468910 56880E46 88088E04 21881E56 5700000A ...WV.¡!..Á.F..V..F½.V*á^½Ï.G.&. 000080
 46890000 039C9A50 52001E05 FA5688F8 46880477 FF26F85E C40029E9 03742047 G t.Ö).á^½&.w..F½.V*...RP......F 0000A0
 16FC4680 086A0086 680477FF 26F85EC4 006AE9F6 46880006 E9037500 F67E83F6 -.--.u.Ö...F-Öj.á^½&.w.h..j..F•. 0000C0
 0789260C 4688FC5E C40043E9 F6468800 06E90375 00003DF6 46890000 03C49A50 P.á....F-=..u.Ö...F-ÖC.á^•.F.&.. 0000E0
 5688F846 88065789 26044789 26085688 064688FC 5EC40247 89260A46 88FC5EC4 á^•.F.&.G.á^•.F..V.&.G.&.W..F½.V 000100
 0CCAC95F 5E1F0000 E9F6468B F6468900 0004059A FC76FFFE 76FF5052 001E05FA *...RP.v±.v•......F-.F-Ö...^ èò. 000120
 22478826 FC5EC4FE 5689FC46 890C5688 0A4688D8 8E0477B8 1E565700 000AC800 .à...WV.¡w..Á.F..V..F•.V±á^•Ï.G" 000140
 000004AA 9A505200 2205FE56 88FC4688 0477FF26 FC5EC400 29E90374 24470826 &.G$t.Ö).á^•&.w..F•.V±.".RP.¯... 000160
 4680046A 00866804 77FF26FC 5EC40056 E9F64688 0006E903 7500F67E 83F64689 .F-.--.u.Ö...F-ÖV.á^•&.w.h..j..F 000180
 88064688 F85EC4(  2FE9F646 880006E9 03750000 30F64689 00000402 9A5016F8 ½.P.■....F-=..u.Ö...F-Ö/.á^½.F.. 0001A0
 89000005 1D9AF876 FFFA76FF 50520022 05FE5688 FC468802 57892607 89260856 V.&..&.W..F•.V±.".RP.v*.v½...... 0001C0
 56880A46 88D88E05 39881E56 5700000A C80008CA C95F5E1F 0000E9F6 4688F646 F-.F-Ö...^_èò..à...WV.¡9..Á.F..V 0001E0

Dump of file SATURN:[PCCOMMON.DUMP.DLL]DMLUT.TMP;1 on 18-APR-1990 10:45:36.60
File ID (634,15,0)   End of file block 12 / Allocated 12

Virtual block number 6 (00000006), 512 (0200) bytes

 46880477 FF26FC5E C40029E9 03742847 08262647 8826FC5E C4FE5689 FC46890C ..F•.V±á^•&.G&&.G(t.Ö).a`•&.w..F 000000
 0056E9FA 46880006 E9037500 FA7E83FA 46890000 056C9A50 52002605 FE5688FC •.V±.&.RP.l....F*.-*.u.Ö...F*ÖV. 000020
 06E90375 00003DFA 46890000 05949A50 16F6468D 046A0086 680477FF 26FC5EC4 á^•&.w.h..j..F-.P......F*=..u.Ö. 000040
 002605FE 5688FC46 88025789 26078926 08568806 4688F65E C4002FE9 FA468800 ..F*Ö/.á^-.F..V.&..&.W..F•.V±.&. 000060
 006AC800 08CAC95F 5E1F0000 E9FA468B FA468900 0005CB9A F676FFF8 76FF5052 RP.v½.v-.ü....F*.F*Ö...^_èò..àj. 000080
 5689E046 890C5688 0A4688DE 5689DC46 89105688 0E468808 8E05E788 1E565700 .WV.¡Ó..Ä.F..V..FÊ.V8.F.¯V..FÅ.V 0000A0
 8C468800 06E90375 008C7E83 8C468900 00FFFF9A 50160046 8DE076FF E276FFE2 ā.vā.vÅ.FÅ.P......F¥.-¥.u.Ö...F¥ 0000C0
 00008800 06E90375 02573926 0009E903 74073926 D2568800 4688DC5E C407F9E9 Ö*.á^Ê.FÅ.V0&9.t.Ö..&9W.u.Ö..¡.. 0000E0
 46890000 FFFF9A50 16E4468D 5016C046 80016AFF 6A006AE0 76FFE276 FF07D9E9 Öl..vā.vÅj.j.j..Fā.P.FÖ.P......F 000100
 57892606 478926E2 5688E046 88DC5EC4 07ACE9BC 46880006 E9037500 BC7E83BC ¥.-¥.u.Ö...F¥Ö¯.á^Ê.FÅ.Vā&.G.&.W 000120
 E9037418 47082616 47882 6DC 5EC40700 E9E44688 077CE903 75C24608 C0468808 ..Fā.Föu.Ö|..FöÖ..á^Ê&.G.&.G.t.Ö 000140
 03E90375 008C7E83 BC468900 00FFFF9A 5016CA46 8DC076FF C276FF07 30E90003 ..Öö..vö.vā.Fö.P......F¥.-¥.u.Ö. 000160
 46890000 FFFF9A50 16E6468D CA76FFCC 76FF37FF 260277FF 26DC5EC4 0711E900 .Ö..á^Ê&.w.&.7.vā.vö.f|.P......F 000180
 DC5EC400 00FFFF9A 1677FF26 1877FF26 DC5EC406 E8E90003 E9037500 BC7E83BC ¥.-¥.u.Ö..Öö.á^Ê&.w.&.w......á^Ê 0001A0
 E64688EC 5EC40053 E9037400 00300000 FFFF9A50 16EC468D 1677FF26 1877FF26 &.w.&.w..Fš.P.....=..t.ÖS.á^&.F| 0001C0
 5EC40E76 FF1076FF 37FF2602 77FF260C 5EC4CA76 FFCC76FF 0042E903 74073926 &9.t.Ö8..vā.vòá^Ê&.w.&.7.v..v.á^ 0001E0
```

Dump of file SATURN:[PCCOMMON.DUMP.DLL]DMLUT.TMP;1 on 18-APR-19. 10:45:36.60
File ID (634,15,0)   End of file block 12 / Allocated 12

Virtual block number 7 (00000007), 512 (0200) bytes

9A1677FF 261877FF 260C5EC4 0016E903 7500BC7E 83BC4689 0CC48302 5FFF26EC &&._..á..F¥.-¥.u.Õ..á^É&.w.&.w.. 000000
0003E903 741C4708 261A4788 260C5EC4 0665E9FF 9CE90682 E9BC4688 0000FFFF .....F¥Õy.Õ..Õe.á^É&.G.&.G.t.Õ.. 000020
7500BC7E 83BC4689 0000FFFF 9A5016CA 46805016 E6468DC0 76FFC276 FF0652E9 ÕR..vò.vä.F|.P.Fò.P......F¥.-¥.u 000040
FF261C77 FF26JC5E C4000009 799A1A77 FF261C77 FF260C5E C4062EE9 0003E903 .Õ..Õ..á^É&.w.&.w..y...á^É&.w.&. 000060
E9037407 3926E646 88E85EC4 0053E903 74000030 0000098E 9A5016E8 46801A77 w..Fò.P.....=..t.ÕS.á^Õ.F|&9.t.Õ 000080
83025FFF 26E85EC4 0E76FF10 76FF37FF 260277FF 260C5EC4 CA76FFCC 76FF0042 B..vä.vòá^É&.w.&.7.v..v.á^Õ&._.. 0000A0
46880000 09F89A1A 77FF261C 77FF260C 5EC40016 E9037500 BC7E83BC 46890CC4 á..F¥.-¥.u.Õ..á^É&.w.&.w..½....F 0000C0
C276FF05 98E90003 E9037410 4708260E 4788260C 5EC405A8 E9FF90E9 05F8E98C ¥Õ½.Õ..Õ¨.á^É&.G.&.G.t.Õ..Õ...vò 0000E0
838C4689 0000FFFF 9A5016C4 46805016 F8468050 16CE4680 5016FC46 80C076FF .vá.F=.P.Fö.P.F½.P.Fá.P......F¥. 000100
5016C646 80FC76FF FE76FF37 FF260277 FF260C5E C4056AE9 0003E903 7500BC7E -¥.u.Õ..Õj.á^É&.w.&.7.v±.v=.Fó.P 000120
76FF37FF 260277FF 260C5EC4 0541E900 03E90375 00BC7E83 BC468900 00095A9A .Z....F¥.-¥.u.Õ..ÕA.á^É&.w.&.7.v 000140
DC5EC405 18E90003 E9037500 BC7E838C 46890000 0AC79A50 168E4680 F876FFFA '.v½.F/.P.ú....F¥.-¥.u.Õ..Õ..á^É 000160
08249A50 16F44680 0E77FF26 1077FF26 DC5EC400 00080F9A 0E77FF26 1077FF26 &.w.&.w......á^É&.w.&.w..F¶.P.$. 000180
3926CE46 88F45EC4 005AE903 74073926 C64688F4 5EC40003 E9037400 003D0000 ..=..t.Õ&.á^¶.Fó&9.t.ÕZ.á^¶.Fo&9 0001A0
37FF2602 77FF260C 5EC4FC76 FFFE76FF F876FFFA 76FFC476 FF0048E9 03740247 G.t.ÕK..vá.v'.v½.v±.v=á^É&.w.&.7 0001C0
260C5EC4 0016E903 7500BC7E 838C4689 12C48304 5FFF26F4 5EC40E76 FF1076FF .v..v.á^¶&._..á..F¥.-¥.u.Õ..á^É& 0001E0

Dump of file SATURN:[PCCOMMON.DUMP.DLL]DMLUT.TMP;1 on 18-APR-1990 10:45:36.60
File ID (634,15,0)   End of file block 12 / Allocated 12

Virtual block number 8 (00000008), 512 (0200) bytes

005AE903 74073926 8E468BF4 5EC404CA E98C4688 00000A60 9A0E77FF 261077FF .w.&.w..'....F¥Õò.á^¶.F/&9.t.ÕZ. 000000
5EC4F876 FFFA76FF FC76FFFE 76FFCE76 FF0048E9 03740247 3926C446 88F45EC4 á^¶.Fá&9G.t.ÕK..vò.v±.v=.v'.v½á^ 000020
7500BC7E 838C4689 12C48304 5FFF26F4 5EC40E76 FF1076FF 37FF2602 77FF260C É&.w.&.7.v..v.á^¶&._..á..F¥.-¥.u 000040
0415E9FF 10E90462 E9BC4688 0000088E 9A0E77FF 261077FF 260C5EC4 0016E903 .Õ..á^É&.w.&.w.......F¥Õb.Õ..Õ.. 000060
46805016 FC4680C0 76FFC276 FF0402E9 0003E903 7414470B 2612478B 260C5EC4 á^É&.G.&.G.t.Õ..Õ...vò.vá.F=.P.F 000080
D4E90003 E9037500 BC7E838C 46890000 FFFF9A50 16C44680 5016F846 805016CE ö.P.F½.P.Fá.P......F¥.-¥.u.Õ..Õ& 0000A0
7E838C46 8900000A F09A5016 C64680FC 76FFFE76 FF37FF26 0277FF26 DC5EC403 .á^É&.w.&.7.v±.v=.Fó.P.Þ....F¥.- 0000C0
9A50168E 4680FB76 FFFA76FF 37FF2602 77FF260C 5EC403AB E90003E9 0375008C ¥.u.Õ..Õ¨.á^É&.w.&.7.v'.v½.F/.P. 0000E0
A99A1277 FF261477 FF260C5E C40382E9 0003E903 7500BC7E 838C4689 0000078A .....F¥.-¥.u.Õ..Õ..á^É&.w.&.w.. 000100
0003E903 7400030D 000007BE 9A501604 46801277 FF261477 FF260C5E C4000007 ...á^É&.w.&.w..Fá.P./...=..t.Õ&. 000120
C476FF00 48E90374 02473926 CE468804 5EC4005A E9037407 3926C646 88045EC4 á^á.Fó&9.t.ÕZ.á^á.Fo&9..t.ÕK..vá 000140
26045EC4 0E76FF10 76FF37FF 260277FF 260C5EC4 FC76FFFE 76FFFB76 FFFA76FF .v'.v½.v±.v=á^É&.w.&.7.v..v.á^á& 000160
08109A12 77FF2614 77FF260C 5EC40016 E9037500 BC7E83BC 468912C4 83045FFF ._..á..F¥.-¥.u.Õ..á^É&.w.&.w.... 000180
02473926 C44688D4 5EC4005A E9037407 39268E46 88045EC4 0334E98C 46880000 ...F¥Õ4.á^á.F/&9.t.ÕZ.á^á.Fá&9G. 0001A0
76FF37FF 260277FF 260C5EC4 F876FFFA 76FFFC76 FFFE76FF CE76FF00 48E90374 t.ÕK..vö.v±.v=.v'.v½á^É&.w.&.7.v 0001C0
77FF260C 5EC40016 E9037500 BC7E83BC 468912C4 83045FFF 26045EC4 0E76FF10 ..v.á^á&._..á..F¥.-¥.u.Õ..á^É&.w 0001E0

Dump of file SATURN:[PCCOMMON.DUMP.DLL]DMLUT.TMP;1 on 18-APR-1990 10:45:36.60
File ID (634,15,0)   End of file block 12 / Allocated 12

Virtual block number 9 (00000009), 512 (0200) bytes 4708261E 4788260C 5EC4027F E9FF10E9 02CCE98C 46880000 0CE49A12 77FF2614 .&.w..ö....F¥Õä.Õ..Õ..á^É&.G.&.G 000000
46890000 FFFF9A50 16C84680 5016CA46 80C076FF C276FF02 6CE90003 E9037420 t.Õ..Õl..vö.vä.Fò.P.Fà.P......F 000020
319A5016 E6468DCA 76FFCC76 FFC076FF C276FF02 48E90003 E9037500 BC7E838C ¥.-¥.u.Õ..ÕH..vò.vá.vä.vò.F|.P.1 000040
00329A1E 77FF2620 77FF260C 5EC40223 E90003E9 0375008C 7E838C46 89000009 ....F¥.-¥.u.Õ..Õ#.á^É&.w &.w..2. 000060
C40062E9 03740000 30000000 479A5016 F0468D1E 77FF2620 77FF260C 5EC40000 ..á^É&.w &.w..FÞ.P.G...=..t.Õb.á 000080
FFCC76FF 0042E903 74024739 26C84688 F05EC400 51E90374 073926E6 4688F05E ^Þ.F|&9.t.ÕQ.á^Þ.Fá&9G.t.Õ8..vä. 0000A0
838C4689 0CC48; 4 5FFF26F0 5EC40E76 FF1076FF 37FF2602 77FF260C 5EC4CA76 vòá^É&.w.&.7.v..v.á^Þ&._..á..F¥. 0000C0
81E901DE E98C46od 0000008A 9A1E77FF 262077FF 260C5EC4 0016E903 7500BC7E -¥.u.Õ..á^É&.w &.w.......F¥Õ8.Õ. 0000E0
CA468DC0 76FFC276 FF017EE9 0003E903 7424470B 2622478B 260C5EC4 0191E9FF .Õ..á^É&.G"&.G$t.Õ..Õ-..vò.vâ.Fò 000100
77FF2624 77FF260C 5EC4015F E90003E9 0375008C 7E838C46 890000FF FF9A5016 .P......F¥.-¥.u.Õ..Õ_.á^É&.w$&.w 000120
03740000 30000000 ED9A5016 D8468D22 77FF2624 77FF260C 5EC40000 00D89A22 ".Ä...á^É&.w$&.w".FÄ.P.U...=..t. 000140
831FFF26 D85EC40E 76FF1076 FF37FF26 0277FF26 DC5EC4CA 76FFCC76 FF0044E9 ÕD..vä.vòá^É&.w.&.7.v..v.á^Ä&... 000160
46880000 0E2F9A22 77FF2624 77FF260C 5EC40016 E9037500 BC7E83BC 46890CC4 á..F¥.-¥.u.Õ..á^É&.w$&.w"./....F 000180
C276FF00 D8E90003 E903742B 47082626 4788260C 5EC400E8 E9FF9FE9 0138E98C ¥Õ8.Õ..Õ$.á^É&.G&&.G(t.Õ..ÕA..vö 0001A0
260C5EC4 0089E900 03E90375 008C7E83 BC468900 00FFFF9A 50169646 80C076FF .vä.F..P......F¥.-¥.u.Õ..Õ¿.á^É& 0001C0
00087B9A 50168846 802677FF 262877FF 260C5EC4 00000863 9A2677FF 262877FF .w(&.w&.c...á^É&.w(&.w&.F|.P.x.. 0001E0

```
Dump of file SATURN:[PCCOMMON.DUMP.DLL]DMLUT.TMP;1 on 18-APR-1990 10:45:36.60
File ID (634,15,0)   End of file block 12 / Allocated 12

Virtual block number 10 (0000000A), 512 (0200) bytes

 5EC40E76 FF1076FF 37FF2602 77FF260C 5EC45016 96468000 43E90374 00003000 .*..t.ÕC..F..Pá^É&.w.&.7.v..v.á^ 000000
 CA9A2677 FF262177 FF260C5E C40016E9 0375008C 7E838C46 890CC483 1FFF2688 ¡&,..á..F¥.-¥.u.Õ..á^É&.w(&.w&.ò 000020
 30001 3E9 0376FA90 E9037500 04300043 E90046E9 FFA0E900 93E98C46 88000008 ....F¥Õ..Õ..ÕF.ÕC.=..u.Õ.*v.Õ..= 000040
 E9037500 1030FC06 E9037500 08300023 E9F9C1E9 03750002 30F8E8E9 03750001 ..u.ÕS½=..u.Õè*Õ#.=..u.Õ.==..u.Õ 000060
 6AFF6A00 6AE076FF E276FF00 00E9FF18 E9037500 4030FE7A E9037500 2030F094 .w* .u.Õz±=@.u.Õ..Õ...vã.vÁj.j.j 000080
 89000088 0009E903 75008C7E 838C4689 0000070A 9A5016E4 46805016 C0468000 ..Fá.P.FÕ.P......F¥.-¥.u.Õ..¡... 0000A0
 C95F5E1F 0000E900 0^880647 89260847 89260000 880C5EC4 F879E9C0 4689C246 FÕ.FãÕy½á^É¡..&.G.&.G.:..Õ...^_è 0000C0
 4688FC5E C4FE5689 FC46890C 56880A46 88088E06 95881E56 57000004 C8000CCA ò..à...WV.¡...Ä.F..V..¡·.V±á^=¯F 0000E0
 881E5657 00000AC8 0008CAC9 5F5E1F00 00E90000 88025789 26078926 0ò \8806 ..V.&..&.W.¡..Õ...^_èò......WV.¡ 000100
 0055E903 75104708 260E4788 26F85EC4 FA5689F8 46890856 88064688 088.)E08 Ü..Ä.F..V..F½.V*á^½Ï.G.&.G.u.ÕU. 000120
 5016FC46 800E77FF 261077FF 26F85EC4 00000FA1 9A0E77FF 261077FF 26F8>EC4 á^½&.w.&.w..À...á^½&.w.&.w..F•.P 000140
 8900000F D09AFC76 FFFE76FF 0477FF26 F85EC400 18E90374 00003000 000FB69A .Ñ...=..t.Õ..á^½&.w..v±.v•.Å.... 000160
 14470826 12478826 F85EC400 000FE69A 0E77FF26 1077FF26 F85EC4FF C8E9F646 F-Õü.á^½&.w.&.w..Ì...á^½&.G.&.G. 000180
 1277FF26 1477FF26 F85EC400 0010069A 1277FF26 1477FF26 F85EC400 55E90375 u.ÕU.á^½&.w.&.w......á^½&.w.&.w. 0001A0
 9AFC76FF FE76FF04 77FF26F8 5EC40018 E9037400 00300000 10189A50 16FC4680 .F•.P.....=..t.Õ..á^½&.w..v±.v•. 0001C0
 47882 6F8 5EC40000 10489A12 77FF2614 77FF26F8 5EC4FFC8 E9F64689 00001035 5....F-Õü.á^½&.w.&.w..K...á^½&.G 0001E0

Dump of file SATURN:[PCCOMMON.DUMP.DLL]DMLUT.TMP;1 on 18-APR-1990 10:45:36.60
File ID (634,15,0)   End of file block 12 / Allocated 12

Virtual block number 11 (0000000B), 512 (0200) bytes

 77FF26F8 5EC40000 10689A16 77FF2618 77FF26F8 5EC40055 E9037518 47082616 .&.G.u.ÕU.á^½&.w.&.w..k...á^½&.w 000000
 76FF0477 FF26F85E C40018E9 03740000 30000010 809A5016 FC468016 77FF2618 .&.w..F•.P.....=..t.Õ..á^½&.w..v 000020
 C4000010 809A1677 FF261877 FF26F85E C4FFC8E9 F6468900 00109A9A FC76FFFE ±.v•......F-Õü.á^½&.w.&.w..¯...á 000040
 C4000010 D09A1A77 FF261C77 FF26F85E C40055E9 03751C47 08261A47 8826F85E ^½&.G.&.G.u.ÕU.á^½&.w.&.w..À...á 000060
 26F85EC4 0018E903 7400003D 000010E5 9A5016FC 46801A77 FF261C77 FF26F85E ^½&.w.&.w..F•.P.Ì...=..t.Õ..á^½& 000080
 9A1A77FF 261C77FF 26F85EC4 FFC8E9F6 46890000 10FF9AFC 76FFFE76 FF0477FF .w..v±.v•......F-Õü.á^½&.w.&.w.. 0000A0
 9A1E77FF 262077FF 26F85EC4 0055E903 75204708 261E4788 26F85EC4 00001115 ....á^½&.G.&.G u.ÕU.á^½&.w &.w.. 0000C0
 18E90374 00003000 00114A9A 5016FC46 801E77FF 262077FF 26F85EC4 00001135 5...á^½&.w &.w..F•.P.J...=..t.Õ. 0000E0
 2077FF26 F85EC4FF C8E9F646 89000011 649AFC76 FFFE76FF 0477FF26 F85EC400 .á^½&.w..v±.v•.d....F-Õü.á^½&.w 000100
 2477FF26 F85EC400 55E90375 24470826 22478826 F85EC400 00117A9A 1E77FF26 &.w..±...á^½&.G"&.G$u.ÕU.á^½&.w$ 000120
 00300000 11AF9A50 16FC4680 2277FF26 2477FF26 F85EC400 00119A9A 2277FF26 &.w".....á^½&.w$&.w".F=.P.£...=. 000140
 5EC4FFC8 E9F64689 000011C9 9AFC76FF FE76FF04 77FF26F8 5EC40018 E9037400 .t.Õ..á^½&.w..v±.v•.è....F-Õü.á^ 000160
 5EC40055 E9037528 47082626 47882 6F8 5EC40000 110F9A22 77FF2624 77FF26F8 ½&.w$&.w".Õ...á^½&.G&&.G(u.ÕU.á^ 000180
 839A5016 FC468026 77FF2628 77FF26F8 5EC40000 0C6E9A26 77FF2628 77FF26F8 ½&.w(&.w&.n...á^½&.w(&.w&.F•.P.. 0001A0
 F6468900 0011F19A FC76FFFE 76FF0477 FF26F85E C40018E9 03740000 3D00000C ...=..t.Õ..á^½&.w..v±.v•.þ....F- 0001C0
 F876FFFA 76FF0477 FF26F85E C40000FF FF9A2677 FF262877 FF26F85E C4FFC8E9 Õü.á^½&.w(&.w&.....á^½&.w..v*.v½ 0001E0

Dump of file SATURN:[PCCOMMON.DUMP.DLL]DMLUT.TMP;1 on 18-APR-1990 10:45:36.60
File ID (634,15,0)   End of file block 12 / Allocated 12

Virtual block number 12 (0000000C), 512 (0200) bytes

 8E0F1088 1E565700 0004C800 04CAC95F 5E1F0000 E9F64688 F6468900 00FFFF9A ......F-.F-Õ...^_èò..à...WV.¡... 000000
 00880C57 89260A47 89260856 88064688 FC5EC4FE 5689FC46 890C5688 0A4688D8 Á.F..V..F•.V±á^=¯F..V.&.G.&.W.¡. 000020
 FC46890C 56880A46 88D88E12 00881E56 57000004 C80008CA C95F5E1F 0000E900 .Õ...^ èò..à...WV.¡...Ä.F..V..F= 000040
 5E1F0000 E9000088 02578926 07892606 5EC40C57 88260A47 8826FC5E C4FE5689 .V±á^=Ï.G.&.W.á^.&..&.W.¡..Õ...^ 000060
 FC5EC4FE 5689FC46 890C5688 0A4688D8 8E124388 1E565700 0004C800 08CAC95F  èò..à...WV.¡C..Ä.F..V..F•.V±á^= 000080
 900008CA C95F5E1F 0000E900 00880257 89260789 26065EC4 08578826 06478826 Ï.G.&.W.á^.&..&.W.¡..Õ..^_èò... 0000A0
 0003127D 000200EF 00030013 02030075 00020679 02030000 00010437 00020014 ....7.......y...u........ÿ.¯.}... 0000C0
 00030908 02030086 00030C4F 02030013 00010F68 02030005 00010642 02030000 ....B.......k.......O............ 0000E0
 00030761 02030124 00030A9E 02030024 00020F3C 02030094 00030E9C 0203010B ............<...$.......$...a... 000100
 00020F51 020300C0 00030844 0203013F 00030089 02030035 00020BF6 020300A7 Ì...-...5...¿...7...D...à...Q... 000120
 00020F81 0203015B 0003068D 02030009 00030C2A 0203005D 0002061A 02030049 Ì.......]...*...]...§...[....... 000140
 01CB0001 881F0000 3E89D88E FFFF881E 00000000 00000000 00000000 00000068 h................¡...Ä.>...¡..ù. 000160
 00000000 00000000 00000000 00000000 00000000 00008300 00000300 02000200 ................................ 000180
 00000000 00000000 00000000 00000000 00000000 00000000 00000000 00000000 ................................ 0001A0
 00000000 00000000 00000000 00000000 00000000 00000000 00000000 00000000 ................................ 0001C0
 00000000 00000000 00000000 00000000 00000000 00000000 00000000 00000000 ................................ 0001E0
```

```
Dump of file SATLRN:[PCCOMMON.DUMP.DLL]DUT.TMP;1 on 18-APR-1990 10:45:39.24
File ID (637,10,0)   End of file block 29 / Allocated 32

Virtual block number 1 (00000001), 512 (0200) bytes

00000000 00000040 00000000 00000088 0000FFFF 00000004 0000001D 010C5A4D MZ..............|.......ə....... 000000
00000080 00000000 00000000 00000000 00000000 00000000 00000000 00000000 ................................ 000020
6F6E6E61 63206D61 72676F72 70207369 685421CD 4C01B821 CD09B400 0E8A1F0E ..o..Ç.el|.LelThis program canno 000040
00000000 000L0024 0A0D002E 65646F6D 20534F44 206E6920 6E757220 65622074 t be run in DOS mode....$....... 000060
00030009 00000000 000704B8 00000000 0009B009 0013AD88 00E403B1 0505454E NE..Ÿ.ð..Ü..........|........... 000080
00000000 00000000 00010000 00040000 00000515 037B0375 00880088 00400022 ".ə.....u.(..................... 0000A0
07020F00 07020180 099E0F00 099E00E2 038C0F00 038C00A7 05140F00 05140054 T.......Ĭ.......å............... 0000C0
00020E21 00000000 0C160F00 0C16024F 04760F00 04760205 01040F00 010301F3 ≠.........v...v.O..........!... 0000E0
034D4554 4945564F 4D455251 45534C54 55100000 54554403 07A00F21 07920317 ....!....DUT...UTLSEQREMOVEITEM. 000100
41424C54 550C0005 444E554F 524C4C54 55090004 455A4953 5A535054 55440A00 ..DUTPSZSIZE...UTLLROUND...UTLBA 000120
52494B54 5145534C 54550000 07434E55 52544C4C 54550900 06454B41 4D4E5547 GUNMAKE...UTLLTRUNC...UTLSEQTHIR 000140
4E554F43 5145534C 54550000 09544341 52545845 5A535054 55440D00 084C4544 DEL...DUTPSZEXTRACT...UTLSEQCOUN 000160
5954504D 45514553 4C54550B 000B4C45 5453414C 5145534C 54550C00 0A4C4554 TEL...UTLSEQLASTEL...UTLSEQEMPTY 000180
4C454556 4F4D4552 5145534C 54550E00 004C4548 53555051 45534C54 550C000C ...UTLSEQPUSHEL...UTLSEQREMOVEEL 0001A0
104C4554 58454E51 45534C54 550C000F 4C455453 52494651 45534C54 5500000E ...UTLSEQFIRSTEL...UTLSEQNEXTEL. 0001C0
54551300 12454B41 4D514553 4C54550A 0011454B 414D4E55 5145534C 54550C00 ..UTLSEQUNMAKE...UTLSEQMAKE...UT 0001E0

Dump of file SATURN:[PCCOMMON.DUMP.DLL]DUT.TMP;1 on 18-APR-1990 10:45:39.24
File ID (637,10,0)   End of file block 29 / Allocated 32

Virtual block number 2 (00000002), 512 (0200) bytes

414D4E55 4B434154 534C5455 0E001352 4F535255 43455441 52455449 4741424C LBAGITERATECURSOR...UTLSTACKUNMA 000000
0C001647 4E494C49 45434C4C 54550B00 154D4554 49514553 4C54550A 0014454B KE...UTLSEQITEM...UTLLCEILING... 000020
18524F53 52554354 494E4947 41424C54 55100017 45544145 52435A53 ; 545544 DUTPSZCREATE...UTLBAGINITCURSOR. 000040
454C5145 534C5455 0C001952 4F535255 43455341 454C4552 4741424C 54 1300 ..UTLBAGRELEASECURSOR...UTLSEQLE 000060
45544954 5245534E 49514553 4C545510 00185342 414C4C54 5507001A 485.474E NGTH...UTLLABS...UTLSEQINSERTITE 000080
54494444 41474142 4C545500 001D4C4C 41544E55 4F434741 424C5455 0E001C4D M...UTLBAGCOUNTALL...UTLBAGADDIT 0000A0
54550E00 20584140 4C4C5455 07001F45 4B414D4B 43415453 4C54550C 001E4D45 EM...UTLSTACKMAKE...UTLLMAX ..UT 0000C0
550E0022 594F5254 5345445A 53505455 44000021 5245424D 454D5349 5145534C LSEQISMEMBER!..DUTPSZDESTROY"..U 0000E0
4D455449 45564F4D 45524741 424C5455 1000234C 45485355 504B4341 54534C54 TLSTACKPUSHEL#..UTLBAGREMOVEITEM 000100
54550000 2659504F 435A5350 5455440A 00254C45 48544E51 45534C54 550B0024 $..UTLSEQNTHEL%..DUTPSZCOPY&..UT 000120
5145534C 54550000 28524F4F 4C464C4C 54550900 274D4554 49594E41 4741424C LBAGANYITEM'..UTLLFLOOR(..UTLSEQ 000140
504B4341 54534C54 5500002A 54524F53 5145534C 54550A00 294D4554 49444441 ADDITEM)..UTLSEQSORT*..UTLSTACKP 000160
504F5448 43415453 4C545500 002C4C45 504F5051 45534C54 550B002B 4C45504F OPEL+..UTLSEQPOPEL,..UTLSTACKTOP 000180
41434E4F 435A5350 5455440C 002E5954 504D454B 43415453 4C545500 002D4C45 EL-..UTLSTACKEMPTY...DUTPSZCONCA 0001A0
4C45444E 4F434553 5145534C 54550E00 30595450 4D454741 424C5455 0B002F54 T/..UTLBAGEMPTY0..UTLSEQSECONDEL 0001C0
534F4408 00002900 0A000100 00324D45 5449544E 554F4347 41424C54 550F0031 1..UTLBAGCOUNTITEM2......)...DOS 0001E0

Dump of file SATURN:[PCCOMMON.DUMP.DLL]DUT.TMP;1 on 18-APR-1990 10:45:39.24
File ID (637,10,0)   End of file block 29 / Allocated 32

Virtual block number 3 (00000003), 512 (0200) bytes

42454552 464D454D 0C4B434F 4C42434F 4C4C414D 454D004D 454D0353 4C4C4143 CALLS.MEM.MEMALLOCBLOCK.MEMFREEB 000000
06310303 01000003 04010000 03010145 54495257 534F4408 4F495303 4B434F4C LOCK.SIO.DOSWRITE.............1. 000020
030901A4 03060102 83030301 00CA0301 01006003 040101CF 03010102 F6030601 ...¬....Ü....m....ð....*....Ê... 000040
06210304 01000003 00270302 DE03025D 0303EC03 03740304 2203017A 0300F903 .ª..z..".'..t..Þ..]..ß..'......!. 000060
48030301 05800304 DC030402 00000306 01040003 0101044C 03030100 24030501 ...$....L...............É..¯....H 000080
03030100 44030101 00000305 01020103 00E80304 02074D03 03010088 03010100 .........M....Š............D.... 0000A0
04730304 0100E203 060101C9 03030103 16030401 00450305 01009303 06010078 x.........E.........è....â....s. 0000C0
01000003 006C0305 0203A003 03010093 03050107 DD03050A 03030203 01030101 ............Ï...............l..Ï.. 0000E0
0A00004C 4C442E74 75640700 00013203 04010288 03030106 BE030401 03580306 ..X..../.........2....dut.DLL... 000100
00000000 00000000 00000001 4E494D4C 4C545507 0002454B 414D4741 424C5455 UTLBAGMAKE...UTLLMIN............ 000120
E9037E00 13E9037D 0C563810 56880E46 88065EC4 D88EFFFF 881E5657 000000C8 à...WV.|...Ä6^..F..V.;V.).Õ..-.Õ 000140
5F5E1F00 00E90000 88025789 26078926 0A46880C 56880006 E903770A 46380008 ..;F.w.Õ...V..F.&..&.W.|..Õ...^_ 000160
13E9037E 0C563810 56880E46 88065EC4 D88E0008 881E5657 000000C8 000CCAC9 èò..à...WV.|...Ä6^..F..V.;V.-.Õ. 000180
00E90000 88025789 26078926 0A46880C 56880006 E903720A 46380008 E9037D00 .).Õ..;F.r.Õ...V..F.&..&.W.|..Õ. 0001A0
0A468800 10E9037C 000C7E83 D88E004C 881E5657 000000C8 000CCAC9 5F5E1F00 ..^ èò..à...WV.|L..Á.-..|.Õ...F. 0001C0
00008802 57892607 8926065E C40C5688 0A468800 06E90AF7 00028308 F70C5688 .V.ŸÄ.@.%oÕ...F..V.6^.&..&.W.|.. 0001E0
```

Dump of file SATURN:[PCCOMMON.DUMP.DLL]OUT.TMP;1 on 18-APR-1990 10:45:39.24
File ID (637,10,0) End of file block 29 / Allocated 32

Virtual block number 4 (00000004), 512 (0200) bytes

```
06E90374 1046080E 4688D88E 0090881E 56570000 0AC80008 CAC95F5E 1F0000E9 Õ...^_èò..à...WV.¡...Á.F..F.t.Õ. 000000
00028308 F7145688 12468800 1EE9037C 00147E83 0000FE46 C700E1E9 00018800 .¡..ÕÃ.úF±...-..|.Õ...F..V.¾A.@. 000020
880E4688 001EEV03 7C00107E 83FE4689 08F7C018 01FE7E83 14568912 46890AF7 ¼Õ.F..V..-±..à¾Á.F±.-..|.Õ...F.. 000040
0E76FF10 76FFFE46 8908F7C0 1801FE7E 83105689 0E46890A F7000283 08F71056 V.¾A.@.¾Õ.F..V..-±..à¾A.F±.v..v. 000060
03C49A12 76FF1476 FF0E76FF 1076FFF8 5689F646 89016003 289A1276 FF1476FF .v..v..(.'..F-.V½.v..v..v..v..á. 000080
46890AF7 00028308 F7F85688 F6468800 26E90375 00FE7E83 FC5689FA 4689FFFF ...F*.V•.-±.u.Õ&..F-.V½¾Á.@.¾Õ.F 0000A0
F85688F6 46880A5E C4FC5689 FA46890A F7000283 08F7FC56 8BFA4688 F85689F6 -.V½.F*.V•¾Á.@.¾Õ.F*.V•á^..F-.V½ 0000C0
89260789 26FC5688 FA468806 5EC40010 E9037508 46080646 88025789 26078926 &..&.W..F..F.u.Õ..á^..F*.V•&..&. 0000E0
46080E46 88088E00 D2881E56 5700000E C80010CA C95F5E1F 0000E900 00880257 W.¡..Õ...^_èò..à...WV.¡@..Á.F..F 000100
14568812 4688001E E9037C00 147E8300 00FE46C7 010EE900 01880006 E9037410 .t.Õ..¡..Õ¯..úF±...-..|.Õ...F..V. 000120
1EE9037C 00107E83 FE46890B F7C01801 FE7E8314 56891246 890AF700 D28308F7 ¾Á.@.¾Õ.F..V..-±..à¾Á.F±.-..|.Õ. 000140
6AFE4689 08F7C018 01FE7E83 1056890E 46890AF7 00028308 F7105688 0E468800 ..F..V.¾A.@.¾Õ.F..V..-±..à¾A.F±j 000160
14561112 4601F456 8BF24688 F45689F2 4689026F 03289A0E 76FF1076 FF026A00 .j..v..v..(.o..F .V¶.F .V¶.F..V. 000180
1476FF0E 76FF1076 FFF85689 F6468902 8603289A 1276FF14 76FF0E76 FF1076FF .v..v..v..v..(....F-.V½.v..v..v. 0001A0
037500FE 7E83FC56 19FA4629 F45688F2 4688FC56 89FA4689 014903C4 9A1276FF .v..á.l..F*.V•.F .V¶)F*.V•.-±.u. 0001C0
D28308F7 FC5688FA 4688F856 89F64689 DAF70002 8308F7F8 5688F646 880026E9 Õ&..F-.V½¾A.@.¾Õ.F-.V½.F*.V•¾Á.@ 0001E0
```

Dump of file SATURN:[PCCOMMON.DUMP.DLL]OUT.TMP;1 on 18-APR-1990 10:45:39.24
File ID (637,10,0) End of file block 29 / Allocated 32

Virtual block number 5 (00000005), 512 (0200) bytes

```
75084608 06468802 57892607 8926F856 8BF64688 0A5EC4FC 5689FA46 890AF700 .¾Õ.F*.V•á^..F-.V½&..&.W..F..F.u 000000
10CAC95F 5E1F0000 E9000088 02578926 078926FC 5688FA46 88065EC4 0010E903 .Õ..á^..F*.V•&..&.W.¡..Õ...^_èò. 000020
76000E7E 830009E9 037D0014 E9037E00 107E8308 8E01D788 1E565700 000AC800 .à...WV.¡•..Á.-..-.Õ..).Õ...=..v 000040
08F71456 88124688 0018E903 7C00147E 830000FE 46C7000C E90001B8 0006E903 .Õ..¡..ÕE.úF±...-..|.Õ...F..V.¾Á 000060
7603289A 1276FF14 76FF0E76 FF1076FF 0001FE46 C7145689 1246890A F7000283 .@.¾Õ.F..V.úF±...v..v..v..v..(.v 000080
7E83FC56 89FA4689 024C03C4 9A1276FF 1476FF0E 76FF1076 FFF85689 F6468903 ..F-.V½.v..v..v..v..á.L..F*.V•.- 0000A0
890AF700 028308F7 F85688F6 46880016 E90374FC 4608FA46 88004EE9 037500FE ±.u.ÕN..F*.F•t.Õ...F-.V½¾Á.@.¾Õ. 0000C0
F646890A F7000283 08F700F8 568301F6 4683F856 88F64688 002DE9F8 5689F646 F-.V½Õ-..F-.V½.F-..V½.¾Á.@.¾Õ.F- 0000E0
8926F856 8BF64688 0A5EC4FC 5689FA46 89FC5618 FA462810 56880E46 88F85689 .V½.F..V.•F*.V•.F*.V•á^..F-.V½&. 000100
02578926 078926FC 5688FA46 88065EC4 0010E903 75084608 06468802 57892607 .&.W..F..F.u.Õ..á^..F*.V•&..&.W. 000120
E9037E00 107E8308 8E030988 1E565700 000AC800 10CAC95F 5E1F0000 E9000088 ¡..Õ...^_èò..à...WV.¡...Á.-..-.Õ 000140
7C00147E 830000FE 46C70006 E90001B8 0006E903 76000E7E 830009E9 037D0014 ..).Õ...=..v.Õ..¡..Õ•.úF±...-..| 000160
FF1076FF 0001FE46 C7145689 1246890A F7000283 08F71456 88124688 0018E903 .Õ...F..V.¾Á.@.¾Õ.F..V.úF±...v.. 000180
9A1276FF 1476FF0E 76:F1076 FFF85689 F6468904 8203289A 1276FF14 76FF0E76 v..v..v..(....F-.V½.v..v..v..v.. 0001A0
DAF70002 83D8F7F8 5688F646 880029E9 037500FE 7E83FC56 89FA4689 0.¯*03C4 á._..F*.V•.-±.u.Õ)..F-.V½¾Á.@.¾Õ 0001C0
08FA4688 001FE9FC 5689FA46 890AF700 D28308F7 FC5688FA 4688F856 89F.'689 .F=.V½.F*.V•¾Á.@.¾Õ.F*.V•Õ...F*. 0001E0
```

Dump of file SATURN:[PCCOMMON.DUMP.DLL]OUT.TMP;1 on 18-APR-1990 10:45:39.24
File ID (637,10,0) End of file block 29 / Allocated 32

Virtual block number 6 (00000006), 512 (0200) bytes

```
46880A5E C4FC5619 FA462910 56880E46 8800F856 8301F646 830014E9 0375FC46 F•u.Õ...F-..V½..F..V.)F*.V•á^..F 000000
26FC5688 FA468806 5EC40010 E9037508 46080646 88025789 26078926 F85688F6 -.V½&..&.W..F..F.u.Õ..á^..F*.V•& 000020
00020000 00070468 00020002 900010CA C95F5E1F 0000E900 00880257 89260789 ..&.W.¡..Õ...^_èò.......k....... 000040
6A0676FF D88EFFFF 881E5657 000002C8 00000000 00000000 00000000 00090415 ...............à...WV.¡...Á.v.j 000060
002DE9FE 46880006 E9037500 FE7E83FE 46890000 FFFF9A10 76FF1276 FF086A01 .j..v..v.......F±.-±.u.Õ...F±Õ-. 000080
0E56880C 46881FC4 26105EC4 06578926 04478926 0A568808 46881FC4 26105EC4 á^.&á..F..V.&.G.&.W.á^.&á..F..V. 0000A0
76FFD88E 0008881E 56570000 00C8CBC9 5F5E1F00 00E90000 88025789 26078926 &..&.W.¡..Õ...^_èùà...WV.¡...Á.v 0000C0
D88E006A 881E5657 000000C8 CBC95F5E 1F0000E9 0000FFFF 9A0876FF 0A76FF06 ..v..v......Õ..¯^_èùà...WV.¡j..Á 0000E0
C40257B8 26078826 065EC402 57892607 89260A5E C40657B8 26044788 26065EC4 á^.&.G.&.W.á^.&..Ï.W.á^.&..&.W.á 000100
0A568808 46880888 008C881E 56570000 08C8C8C9 5F5E1F02 57892607 89260E5E ^.&..&.W..^_èùà...WV.¡...Á.F..V. 000120
5689F846 89025788 26078826 FC5EC400 5CE90375 FE4608FC 4688FE56 89FC4689 .F•.V±.F•.F¯u.Õ\.á^•&..&.W..F½.V 000140
F8468806 C4830138 00629A06 76FFFC76 FFFE76FF 0030E903 75FA4608 F84688FA *.F½.F*u.ÕO..v±.v•.v..b.8..á..F½ 000160
FFFE76FF FFC5E9FA 5689F846 89025788 26078826 FC5EC4FE 5689FC46 89FA5688 .V*.F•.V±á^•&..&.W..F½ V*Õé..v±. 000180
8E00C688 1E565700 0008C8CB C95F5E1F 0000E906 C483FFFF 00629A06 76FFFC76 v•.v..b....á.Õ...^_èùà. .WV.¡á.. 0001A0
26078826 F85EC400 10E9FA56 89F84689 08568806 4688FC46 89FE4689 00008808 Á¡...F±.F•.F..V..F½.V*Õ..á^½&..& 0001C0
880A4688 00FE5683 01FC4683 0024E903 75FA4608 F84688FA 5689F846 89025788 .W..F½.V*.F½.F*u.Õ$..F•..V±..F.. 0001E0
```

```
Dump of file SATURN:[PCCOMMON.DUMP.DLL]DUT.TMP;1 on 18-APR-1990 10:45:39.24
File ID (637,10,0)   End of file block 29 / Allocated 32

Virtual block number 7 (00000007), 512 (0200) bytes

 00E9FE56 88FC4688 FFC1E900 03E90003 E90374FE 56390008 E90374FC 46390C56 V.9F=t.Ô..9V±t.Ô..Ô..Ôé..F=.V±Ô. 000000
 56880646 88FC4689 FE468900 0088088E 014D881E 56570000 0CC8CBC9 5F5E1F00 ..^ èúà...WV.¡M..Ä¡...F±.F=.F..V 000020
 F64608F4 468PF656 89F44689 02578826 078826F4 5EC40010 E9F65689 F4468908 ..F¶.V-Ô..á^¶&..&.W..F¶.V-.F¶.F- 000040
 0A468800 00E90374 D008FA56 89F84689 06578826 04478826 F45EC400 52E90375 u.ÔR.á^¶&.G.&.W..F½.V°.Ät.Ô...F. 000060
 56880E46 8800FE56 8301FC46 830021E9 0374FA56 390029E9 0374F846 390C5688 .V.9F½t.Ô).9V°t.Ôl..F•..V±..F..V 000080
 0000E9FE 5688FC46 88FF93E9 0003E900 03E90374 FE563900 08E90374 FC463910 .9F=t.Ô..9V±t.Ô..Ô..Ô...F•.V±Ô.. 0000A0
 08568806 4688FC46 89FE4689 00008808 8E018E88 1E565700 0008C8C8 C95F5E1F .^ èúà...WV.¡/..Ä¡...F±.F•.F..V. 0000C0
 75FA4608 F84688FA 5689F846 89025788 26078826 F85EC400 10E9FA56 89F84689 .F½.V°Ô..á^½&..&.W..F½.V°.F½.F°u 0000E0
 C95F5E1F 0000E9FE 5688FC46 88FFD6E9 FE5689FC 4689FA56 88F84688 000FE903 .Ô...F½.V°.F=.V±Ô•..F=.V±Ô...^_è 000100
 88FC4689 FE468900 0088F846 89FA4689 000088D8 8E025D88 1E565700 000CC8C8 ùà...WV.¡)..Ä¡...F°.F¥¡...F±.F=. 000120
 4688F656 89F44689 02578826 078826F4 5EC40010 E9F65689 F4468908 56880646 F..V..F¶.V-Ô..á^¶&..&.....F¶.V-.F 000140
 88000FE9 0374FE56 390017E9 0374FC46 390C5688 0A468800 30E90375 F64608F4 ¶.F-u.ÔO..F..V.9F=t.Ô..9V±t.Ô... 000160
 E9FA5688 F84688FF 85E900FE 568301FC 46830008 E9FA5689 F84689F6 5688F446 F¶.V-.F½.V°Ô...F•..V±.Ôç..F½.V°Ô 000180
 9A5016FC 4680086A 016A0676 FFD88E02 89881E56 57000004 C8C8C95F 5E1F0000 ...^_èúà...WV.¡¿..Á.v.j.j..F=.P. 0001A0
 07882608 5EC40657 89260447 8926FC5E C4065788 26044788 26085EC4 0000001A ....Ã^.&.G.&.W.á^=&.G.&.W.á^.&.. 0001C0
 00020004 C8C95F5E 1F0000E9 FE5688FC 46880257 89260789 26FC5EC4 02578826 &.W.á^=&..&.W..F=.V±Ô...^_èú.... 0001E0

Dump of file SATURN:[PCCOMMON.DUMP.DLL]DUT.TMP;1 on 18-APR-1990 10:45:39.24
File ID (637,10,0)   End of file block 29 / Allocated 32

Virtual block number 8 (00000008), 512 (0200) bytes

 0000001C 00020078 02030000 0009033F 0002000E 00020350 02030000 00020108 ........P.......?.......x....... 000000
 0000E900 0088FFFF 00009A06 76FF0876 FF0A76FF D88EFFFF 881E5657 000000C8 à...WV.¡...Á.v..v..v......¡..Ô.. 000020
 00E90018 00609A06 76FF0876 FFD88E00 08881E56 57000000 C80006CA C95F5E1F .^_èò..à...WV.¡...Á.v..v..m...Ô. 000040
 0A76FF0C 76FF0E76 FF1076FF D88E002F 881E5657 000000C8 0004CAC9 5F5E1F00 ..*_èò..à...WV.¡/..Á.v..v..v..v. 000060
 881E5657 000006C8 000CCAC9 5F5E1F00 00E90000 88003C00 E89A0676 FF0876FF .v..v..Š.<.¡..Ô...^_èò..à...WV.¡ 000080
 9A5016FC 46800E76 FF1076FF 00A204DC 9A0E76FF 1076FF00 00FA46C7 D88E0050 P..ÁúF°...v..v..É.Á..v..v..F=.P. 0000A0
 E90374FE 56390018 E90374FC 46390C56 880A4688 002CE903 7400030D 00D00621 l.Å.=..t.Ô,..F..V.9F=t.Ô..9V±t.Ô 0000C0
 03750846 08064688 FF8CE900 03E90069 05809A0E 76FF1076 FF0001FA 46C70013 ..úF°...v..v..¯.i.Ô..Ô¥..F..F.u. 0000E0
 1E565700 0008C800 0CCAC95F 5E1F0000 E90000B8 078926FA 4688065E C40009E9 Ô..á^..F°&..¡..Ô...^_èò..à...WV. 000100
 8D0E76FF 1076FF01 27040C9A 0E76FF10 76FFF846 89FA4689 00008808 8E00808B ¡...Á¡...F°.F½.v..v..É.'..v..v.. 000120
 390010E9 0374F 46 390C5688 0A468800 21E90374 00003000 9206219A 5016FC46 F=.P.l...=..t.Ôl..F..V.9F=t.Ô..9 000140
 065EC400 10E90>/5 08460806 4688FFC7 E900FA56 8301F846 830008E9 0374FE56 V±t.Ô...F½..V°.Ôú..F..F.u.Ô..á^. 000160
 56570000 04C8000C CAC95F5E 1F0000E9 00008802 57892607 8926FA56 88F84688 .F½.V°&..&.W.¡..Ô...^_èò..à...WV 000180
 1706219A 5016FC46 800A76FF 0C76FF01 9F040C9A 0A76FF0C 76FFD88E 0101881E .¡...Á.v..v..É....v..v..F=.P.l.. 0001A0
 E90000B8 02578926 078926FE 5688FC46 88065EC4 FFE5E900 03E90374 00003D01 .=..t.Ô..Ôl.á^..F=.V±&..&.W.¡..Ô 0001C0
 76FFF846 89FA4689 000088D8 8E0182B8 1E565700 0008C800 08CAC95F 5E1F0000 ...^_èò..à...WV.¡...Á¡...F°.F½.v 0001E0

Dump of file SATURN:[PCCOMMON.DUMP.DLL]DUT.TMP;1 on 18-APR-1990 10:45:39.24
File ID (637,10,0)   End of file block 29 / Allocated 32

Virtual block number 9 (00000009), 512 (0200) bytes

 42E90374 00003D02 2006219A 5016FC46 800E76FF 1076FF01 F7040C9A 0E76FF10 ..v..É.%..v..v..F=.P.l. .=..t.ÔB 000000
 05809A0E 76FF1076 FF0021E9 0374FA56 390029E9 0374F846 390C5688 0A468800 ..F..V.9F½t.Ô).9V°t.Ôl..v..v..¯. 000020
 00FA5683 01F84683 001EE900 00880257 89260789 26FE5688 FC468806 5EC4018F ..á^..F=.V±&..&.W.¡..Ô...F½..V°. 000040
 0000C800 0CCAC95F 5E1F0000 E90001B8 07892602 47892600 00B8065E C4FFA6E9 Ôl.á^.¡..&.G.&..¡..Ô...^_èò..à.. 000060
 00E9FFFF 01C99A06 76FF0876 FF006A00 6A0A76FF 0C76FF08 8E010188 1E565700 .WV.¡l..Á.v..v.j.j..v..v..è...Ô. 000080
 76FF016A 006A0A76 FF0C76FF D88E0265 881E5657 000000C8 0008CAC9 5F5E1F00 ..^_èò..à...WV.¡e..Á.v..v.j.j..v 0000A0
 FFD88E02 90881E56 57000000 C80008CA C95F5E1F 0000E902 7C01C99A 0676FF08 ..v..è.|.Ô...^_èò..à...WV.¡...Á. 0000C0
 06C80008 CAC95F5E 1F0000E9 02A701C9 9A0676FF 0876FF02 6A006A0A 76FF0C76 v..v.j.j..v..v..è.I.Ô...^_èò..à. 0000E0
 0E76FF10 76FF0308 040C9A0E 76FF1076 FF0000FA 46C7D88E 0288881E 56570000 ..WV.¡É..ÁúF°...v..v..É....v..v. 000100
 76FF1076 FF0021E9 037401FA 7E830048 E9037400 00300324 06219A50 16FC4680 .F=.P.l.$.=..t.ÔH..-°.t.Ôl..v..v 000120
 880A4688 0031E900 00880257 89260789 26FE5688 FC468806 5EC401E7 05809A0E ..¯.Ô.á^..F=.V±&..&.W.¡..Ôl..F.. 000140
 00008806 5EC4FFA0 E90001FA 46C70005 E90374FE 56390000 E90374FC 46390C56 V.9F=t.Ô..9V±t.Ô..úF°..Ô..á^.¡.. 000160
 D88E02E6 881E5657 000000C8 000CCAC9 5F5E1F00 00E90001 88078926 02478926 &.G.&..¡..Ô...^_èò..à...WV.¡l..Á 000180
 0008CAC9 5F5E1F00 00E90000 8802F802 019A006A 0676FF08 76FF0A76 FF0C76FF .v..v..v..v.j....%.¡..Ô...^_èò.. 0001A0
 D202509A 0676FF08 76FF37FF 260277FF 260A5EC4 D88E037C 881E5657 000004C8 à...WV.¡|..Áá^.&.w.&.7.v..v..].● 0001C0
 88039103 169A5016 FC468D01 6A006A37 FF260277 FF26065E C40A76FF 0C76FF02 ..v..v.á^.&.w.&.7j.j..F=.P.....¡ 0001E0
```

```
Dump of file SATURN:[PCCOMMON.DUMP.DLL]DUT.TMP;1 on 18-APR-1990 10:45:39.24
File ID (637,10,0)   End of file block 29 / Allocated 32

Virtual block number 10 (0000000A), 512 (0200) bytes

 76FF1276 FF1476FF D88E03A8 881E5657 000000C8 0008CAC9 5F5E1F00 00E90000 ..Õ...^_èò..à...WV.¡ˆ. Á.v..v..v 000000
 CAC95F5E 1F0000E9 0000B803 DD03169A 0676FF08 76FF0A76 FF0C76FF 0E76FF10 ..v..v..v..v..v....ì.¡..Ô...^_èò 000020
 B8041306 8E9A0676 FF0876FF 0A76FF0C 76FFD88E 03F4881E 56570000 00C80010 ..à...WV.¡¶..Á.v..v..v..v../...¡ 000040
 46891256 88104688 D88E042A 881E5657 00000EC8 0008CAC9 5F5E1F00 00E90000 ..Õ...^_èò..à...WV.¡*..Á.F..V..F 000060
 FA468804 3000E89A 5016FA46 8D006A00 6A1076FF 1276FF00 00FE46C7 F85689F6 -.VVúF±...v..v.j.j..F*.P.Š.=..F* 000080
 08E9037C 000E7E83 0009E903 720C4639 0008E903 7D0016E9 037E0E56 39FC5688 .V=9V.-.Õ..).Õ..9F.r.Õ...-..|.Õ. 0000A0
 01200E56 180C4628 FC5688FA 46880018 E9037400 0A7E8300 54E90001 FE46C700 .úF±..ÕI..-...t.Õ...F*.V=+F..V.-. 0000C0
 83FFFF02 B19A37FF 260277FF 26F65EC4 0C76FF0E 76FF0E56 890C4689 000A8300 ..Õ..F..V..v..v.6^-&.w.&.7.Ý.... 0000E0
 FE468802 57892607 8926065E C4065788 26044788 26F25EC4 F45689F2 468908C4 6..F .V¶6^ &.G.&.W.6^.&..&.W..F± 000100
 89F64689 12568810 4688D88E 0454881E 56570000 0EC8000E CAC95F5E 1F0000E9 Õ...^_èò..à...WV.¡T..Á.F..V..F-. 000120
 5688FA46 88047800 E89A5016 FA468000 6A006A10 76FF1276 FF0000FE 46C7F856 VVúF±...v..v.j.j..F*.P.Š.(..F*.V 000140
 C70008E9 037C000E 7E830009 E903760C 46390008 E9037D00 16E9037E 0E5639FC =9V.-.Õ..).Õ..9F.v.Õ...-..|.Õ..ú 000160
 890C4689 0E56180C 4628FC56 88FA4688 0012E903 74000A7E 83008DE9 0001FE46 F±..Õ§..-...t.Õ...F*.V=+F..V..F.. 000180
 0876FF37 FF260277 FF26F65E C4F676FF F876FF00 3AE90374 0E46080C 46880E56 V..F..F.t.Õ:..v½.v-6^-&.w.&.7.v. 0001A0
 46880006 E9037500 FE7E83FE 46890EC4 8305E200 009A0C77 FF26F65E C40676FF .v.á^-&.w....â..6..F±.-±.u.Õ...F 0001C0
 9A37FF26 0277FF26 F65EC450 52000A83 0001200E 56880C46 88005DE9 0066E9FE ±Õf.Õ]..F..V.-...Ö.RP6^-&.w.&.7. 0001E0

Dump of file SATURN:[PCCOMMON.DUMP.DLL]DUT.TMP;1 on 18-APR-1990 10:45:39.24
File ID (637,10,0)   End of file block 29 / Allocated 32

Virtual block number 11 (0000000B), 512 (0200) bytes

 0876FF37 FF260277 FF26F25E C4F276FF F476FFF4 5689F246 8908C483 060002B1 Ý....6..F .V¶.v¶.v.6^ &.w.&.7.v. 000000
 46880006 E9037500 FE7E83FE 46890EC4 83040000 009A0C77 FF26F65E C40676FF .v.á^-&.w....ì..6..F±.-±.u.Õ...F 000020
 0C4688D8 8E051288 1E565700 0012C800 0ECAC95F 5E1F0000 E9FE4688 0006E9FE ±Õ...F±Õ...^_èò..à...WV.¡...Á.F. 000040
 00E89A50 16F64680 006A006A 0C76FF0E 76FF0000 FA46C7F4 5689F246 890E5688 .V..F .V¶úF*...v..v.j.j..F-.P.Š. 000060
 0A7E8300 09E90372 08463900 08E9037D 0016E903 7E0A5639 F85688F6 46880539 9..F-.VV9V.-.Õ..).Õ..9F.r.Õ...-. 000080
 084628F8 5688F646 880018E9 03740006 7E830082 E90001FA 46C70008 E9037C00 .|.Õ..úF*..Õÿ..-..t.Õ...F-.V½+F. 0000A0
 078826F2 5EC40027 E903740A 46080846 880A5689 08468900 DA830001 200A5618 .V.-...Ö..F..V..F..F.t.Õ'.6^ &.. 0000C0
 4AE90257 89260789 26F25EC4 02578826 078826EE 5EC4F056 89EE4689 02578826 &.W..FÝ.VÞ6^Ý&..&.W.6^ &..&.W.ÕJ 0000E0
 C483073B 02819A37 FF260277 FF26F25E C4505200 DA830001 200A5688 08468800 ..F..V.-...Ö.RP6^ &.w.&.7.Ý.;..6 000100
 57882607 8826EE5E C4F05689 EE468902 57882607 8826FC5E C4FE5689 FC468908 ..F=.V±6^=&..&.W..FÝ.VÞ6^Ý&..&.W 000120
 06C48305 AD00629A 0C77FF26 F25EC4EE 76FFF076 FF025789 26078926 FC5EC402 .6^=&..&.W..vÞ.vÝ6^ &.w..b.Ù..6. 000140
 89FC4689 00008808 8E063988 1E565700 000AC800 0ACAC95F 5E1F0000 E9FA4688 .F*Õ...^_èò..à...WV.¡9..Ä¡...F=. 000160
 00003D07 AA06219A 5016F646 800E76FF 1076FF07 7804DC9A 0E76FF10 76FFFA46 F*.v..v.¯É.(..v..v..F-.P.I.ˆ.=.. 000180
 0EE9037D 00FE7E83 FE468908 C483065E FF50160A 46805016 F6468000 35E90374 t.Õ5..F-.P.F..P.^..6..F±.-±.).Õ. 0001A0
 0E76FF10 76FFFFB3 E900FC56 8301FA46 83000BE9 066005B0 9A0E76FF 1076FF00 ..v..v..¯.'.Õ...F*..V=.Õ°..v..v. 0001C0
 001AC800 0CCAC95F 5E1F0000 E903BF05 0A9A0A76 FF0C76FF 016AFA76 FFFC76FF .v=.v*j..v..v....¢.Õ...^_èò..à.. 0001E0

Dump of file SATURN:[PCCOMMON.DUMP.DLL]DUT.TMP;1 on 18-APR-1990 10:45:39.24
File ID (637,10,0)   End of file block 29 / Allocated 32

Virtual block number 12 (0000000C), 512 (0200) bytes

 8D006A00 6A0A76FF 0C76FFEE 5689EC46 890C5688 0A4688D8 8E0755B8 1E565700 .WV.¡U..A.F..V..F&.VÝ.v..v..j.j.. 000000
 77FF26EC 5EC4017C E90000B8 0006E903 74F2460B F04688D7 6800E89A 5016F046 FÞ.P.Š.k..FÞ.F t.Õ..¡..Õ|.á^š&.w 000020
 0006E903 7500E47E 83EA4689 0000FFFF 9A5016F4 46805002 E0C1F046 8808B6A0C .j..FÞèA.P.F¶.P......Fõ.-õ.u.Õ.. 000040
 0C76FF08 68040 ?A 0A76FF0C 76FFFA56 89F84689 F6568BF4 46880150 E9EA4688 .FõÕP..F¶.V-.F½.V*.v..v..É.k..v. 000060
 88FC4688 04F84683 F85EC400 17E90374 00003D08 0706219A 5016FC46 8D0A76FF .v..F=.P.!...=..t.Õ..á^½.F½..F=. 000080
 008E9A0C 77FF26EC 5EC437FF 260277FF 26EC5EC4 FFD1E902 57892607 8926FE56 V±&..&.W.Õl.á^š&.w.&.7á^š&.w../. 0000A0
 EC5EC404 77FF2606 77FF26EC 5EC40789 26024789 26000088 EC5EC406 C48308C7 ú..á.á^š¡..&.G.&..á^š&.w.&.w.á^š 0000C0
 77FF26EC 5EC40447 89260647 89260000 88EC5EC4 06C48308 EF008E9A 0C77FF26 &.w../.ÿ..á.á^š¡..&.G.&.G.á^š&.w 0000E0
 89260A47 89260000 88EC5EC4 06C48306 FC008E9A 0C77FF26 EC5EC408 77FF260A .&.w.á^š&.w../.=..á.á^š¡..&.G.&. 000100
 5688F046 880CC483 FFFF0010 9AF476FF F676FFF0 76FF046A 0676FF08 76FF0847 G..v..v.j..vÞ.v-.v¶......á..FÞ.V 000120
 83000CE9 FA5689F8 46890004 20F65688 F4460302 E0C1E646 88E85689 E64689F2 ·.F¦.VÕ.F¦èÁ..F¶.V-·...F½.V*Õ... 000140
 E9037700 E67E8300 09E9037E 0025E903 7D00E87E 8304F86E 8300E85E 8301E66E nl..^Õ..n½..-Õ.).ÕX.-.Õ...-l.w.Õ 000160
 5EC40000 EA46C7FF C6E907D1 03749A37 FF260277 FF26F85E C450160A 46800017 ...F..Pá^½&.w.&.7.t.l.Õõ.úFõ..á^ 000180
 00079000 08CAC95F 5E1F0000 E9EA4688 0000FFFF 9AF476FF F676FF0C 77FF26EC š&.w..v-.v¶......FõÕ...^_èò..... 0001A0
 00000007 09160002 00000004 08580002 00000003 09740002 00000002 08A00002 ..........t.........[............ 0001C0
 00000000 00000000 001C0002 098C0203 00000009 07E50002 000E0002 08300203 ..0.......|...................... 0001E0
```

```
Dump of file SATURN:[PCCOMMON.DUMP.DLL]DUT.TMP;1 on 18-APR-1990 10:45:39.24
File ID (637,10,0)   End of file block 29 / Allocated 32

Virtual block number 13 (0000000D), 512 (0200) bytes

FC5EC400 00FFFF9A 5016FC46 8D0E6A01 6A0A76FF D8BEFFFF 881E5657 000004C8 à...WV.j...Á.v.j.j..F•.P.....â^• 000000
89260000 88FC5EC4 04478926 06478926 000088FC 5EC40789 26024789 26000088 |..&.G.&..â^•|..&.G.&.G.â^•|..&. 000020
02578926 07F?26FE 5688FC46 88065EC4 0C478926 0A4688FC 5EC40847 89260A47 G.&.G.â^•.F.&.G.â^..F•.V‡&..&.W. 000040
89085688 0646880B 8E000888 1E565700 0006C800 06CAC95F 5E1F0000 E9000088 |..Õ...^_èò..à...WV.|...Ä.F..V.. 000060
B5008E9A FE76FF37 FF260277 FF26FA5E C4FE4689 0C478826 FA5EC4FC 5689FA46 F•.V•â^•Ï.G..F‡â^•&.w.&.7.v‡./.ç 000080
77FF26FA 5EC406C4 8300C800 8E9AFE76 FF0477FF 260677FF 26FA5EC4 06C48300 ..â.â^•&.w.&.w..v‡./.ù..â.â^•&.w 0000A0
00880000 FFFF9AFA 76FFFC76 FFFE76FF 06C483FF FF008E9A FE76FF08 `7FF260A .&.w..v‡./....â..v‡.v•.v•.....|. 0000C0
FC468910 56880E46 88088E00 75881E56 57000004 C80004CA C95F5E1F C 30E900 .Õ...^_èò..à...WV.|u..Ä.F..V..F• 0000E0
8926065E C408C483 009F0145 9A37FF26 0277FF26 FC5EC40A 76FF0C76 FF.E5689 .V‡.v..v.â^•&.w.&.7.E....â.â^.&. 000100
4688088E 00F3881E 56570000 04C8000C CAC95F5E 1F0000E9 00008802 57892607 .&.W.|..Õ...^_èò..à...WV.|µ..A.F 000120
37FF2602 77FF26FC 5EC40E76 FF1076FF 0A76FF0C 76FFFE56 89FC4689 14568812 ..V..F•.V‡.v..v..v..v.â^•&.w.&.7 000140
C80010CA C95F5E1F 0000E900 00880257 89260789 26065EC4 0CC48301 1601869A .Ñ....â.â^.&..&.W.|..Õ...^_èò..à 000160
C40010E9 FA5689F8 46890657 88260447 88260A5E C4088E01 3A881E56 57000008 ...WV.|:..Aâ^.&.G.&.W..F½.V•Õ..â 000180
47882 6F8 5EC40042 E90375FA 460BF846 88FA5689 F8468902 57882607 8826F85E ^½&..&.W..F½.V•.F½.F•u.Õ8.â^½&.G 0001A0
0019E903 74FC4639 0C56880A 46880000 E90374D0 08FE5689 FC468906 57882604 .&.W..f•.V‡.Ät.Õ...F..V.9F•t.Õ.. 0001C0
C95F5E1F FFA3E906 57892604 47892610 56880E46 88F85EC4 0011E903 74FE5639 9V‡t.Õ..â^½.F..V.&.G.&.W.ÕE..^_è 0001E0
```

```
Dump of file SATURN:[PCCOMMON.DUMP.DLL]DUT.TMP;1 on 18-APR-1990 10:45:39.24
File ID (637,10,0)   End of file block 29 / Allocated 32

Virtual block number 14 (0000000E), 512 (0200) bytes

084688FE 5689FC46 89025788 26078826 0C5EC4D8 8E0187B8 1E565700 000EC8C8 ùà...WV.|...Aâ^.&..&.W..F•.V‡.F. 000000
76FFF476 FF006A00 6A5016F6 46800090 E9037500 067E83F4 5689F246 890A5688 .V..F..V¶.-..u.Õ...F-.Pj.j..V¶.v 000020
E9FA4688 0006E903 7500FA7E 83FA4689 0EC48302 9100009A 0C77FF26 FC5EC4F2 ·â^•&.w........â..F•.-•.u.Õ...F•Õ 000040
57892607 8926F856 88F6468B FC5EC400 13E90374 02470826 078826FC 5EC400AD Ù.â^•&..&.G.t.Õ...â^•.F-.V½&..&.W 000060
F85688F6 4688C28E D8880 4C4 8302E202 559A37FF 260277FF 26FC5EC4 0023E902 .Õ#.â^•&.w.&.7.U.ã..â..Â.ò.F-.V½ 000080
E90CC483 FFFF017F 9AFC76FF FE76FF00 6A006AF6 76FFF876 FF025789 26078926 &..&.W..v½.v-j.j..v‡.v•.......â.Õ 0000A0
9A0C77FF 26FC5EC4 F276FFF4 76FF37FF 260277FF 26FC5EC4 FC76FFFE 76FF0037 7..v‡.v•â^•&.w.&.7.v¶.v·â^•&.w.. 0000C0
88FC4688 0C5EC400 16E9FA46 880006E9 037500FA 7E83FA46 890EC483 01630000 ..c..â..F•.-•.u.Õ...F•Õ..â^..F•. 0000E0
0209881E 56570000 1EC8000A CAC95F5E 1F0000E9 00008802 57892607 8926FE56 V‡&..&.W.|..Õ...^_èò..à...WV.|.. 000100
56880E46 88FC4689 FE468900 0088F056 89EE4689 02578826 07882612 5EC4D88E .Aâ^.&..&.W..FŸ.VÞ|...F‡.F•.F..V 000120
078826EE 5EC4F446 89F64689 000088F2 46890C47 8826EE5E C4E85689 E6468910 ..F|.VÕâ^Ÿ&.G..F·|...F-.F¶â^Ÿ&.. 000140
037EF656 390C5688 0A468800 D1E90375 E4460 8E2 4688E456 89E24689 02578826 &.W..Fã.VÕ.Fã.FÕu.Õ|..F..V.9V--. 000160
5689F846 89065788 26044788 26E25EC4 0086E903 72F44639 0008E903 7D00C3E9 Õù.).Õ..9F¶r.ÕÑ.â^â&.G.&.W..F½.V 000180
39006CE9 0374E646 39FA5688 F84688EC 5689EA46 89025788 26078826 E25EC4FA •â^â&..&.W..fõ.Vš.F½.V•9Flt.Õl.9 0001A0
C483028A 017F9AEE 76FFF076 FFE276FF E476FFEA 76FFEC76 FF0064E9 0374E856 VÕt.Õd..vš.vÕ.vÕ.vã.vÞ.v¶...¤..â 0001C0
C40010E9 02578926 078926EC 5688EA46 88EE5EC4 0013E903 74FE4608 FC46880C ..F•.F‡t.Õ..â^Ÿ.Fõ.Vš&..&.W.Õ..â 0001E0
```

```
Dump of file SATURN:[PCCOMMON.DUMP.DLL]DUT.TMP;1 on 18-APR-1990 10:45:39.24
File ID (637,10,0)   End of file block 29 / Allocated 32

Virtual block number 15 (0000000F), 512 (0200) bytes

F276FFE2 76FFE476 FF00F656 8301F446 83025789 26078926 EC5688EA 4688FC5E ^•.Fõ.V‡&..&.W..F¶..V-..võ.vã.v· 000000
E24689EC 5688EA46 88FE5689 FC4689E4 5688E246 88000CE9 06C48302 4800629A .b.K..â.Õ...Fã.VÕ.F•.V‡.Fõ.Vš.Fã 000020
26F05688 EE468812 5EC40257 89260789 26F65688 F4468806 5EC4FF24 E9E45689 .VÕÕ$.â^..F¶.V-&..&.W.â^..FŸ.VÞ& 000040
88088E03 1E881E56 57000008 C80010CA C95F5E1F 0000E900 00880257 89260789 ..&.W.|..Õ...^_èò..à...WV.|...Ä. 000060
4608F846 88FA5689 F8468902 57882607 8826FC5E C4FE5689 FC46890C 56880A46 F..V..F•.V‡â^•&..&.W..F½.V•.F½.F 000080
478826F8 5EC40015 E9037508 46080646 880026E9 0029E900 01880009 E90374FA •t.Õ..|..Õ).Õ&..F..F.u.Õ..â^½&.G 0000A0
00000AC8 0008CAC9 5F5E1F00 00E90000 88025789 26078926 065EC406 57882604 .&.W.â^.&..&.W.|..Õ...^_èò..à.... 0000C0
750A470B 26084788 26F85EC4 FA5689F8 46890856 88064688 D88E047B 881E5657 WV.|(..Ä.F..V..F½.V•â^½Ï.G.&.G.u 0000E0
C402578B 26078826 FC5EC4FE 5689FC46 890A5788 26084788 26F85EC4 0053E903 .ÕS.â^½&.G.&.W...F•.V‡â^•&..&.W.â 000100
C4025789 26078926 FC5EC406 57882604 47882 6F8 5EC40A57 89260847 8926F85E ^½&.G.&.W.â^½&.G.&.W.â^•&..&.W.â 000120
26F85EC4 5016FC46 8D003 8E9 06578926 04478926 FC5EC402 57882607 8826F85E ^½&..&.W.â^•&.G.&.W.Õ;..F•.Pâ^½& 000140
0EC48304 2300009A 0C77FF26 F85EC437 FF260277 FF26F85E C40477FF 260677FF .w.&.w.â^½&.w.&.7â^½&.w....#..â. 000160
26044789 26FE5688 FC4688F8 5EC40017 E9F64688 0006E903 7500F67E 83F64689 .F-.--.u.Õ...F-Õ..â^½.F•.V‡â.G.& 000180
88064688 D88E04E4 881E5657 000008C8 0004CAC9 5F5E1F00 00E90000 88065789 .W.|..Õ...^_èò..à...WV.|Õ..Ä.F.. 0001A0
26078826 FC5EC4FE 5689FC46 89065788 26044788 26F85EC4 FA5689F8 46890856 V..F½.V•â^½Ï.G.&.W..F•.V‡â^•&..& 0001C0
26078926 FC5EC40A 57882608 47882 6F8 5EC40657 89260447 8926F85E C4025788 .W.â^½&.G.&.W.â^½&.G.&.W.â^•&..& 0001E0
```

```
Dump of file SATURN:[PCCOMMON.DUMP.DLL]DUT.IMP;1 on 18-APR-1990 10:45:39.24
File ID (637,10,0)   End of file block 29 / Allocated 32

Virtual block number 16 (00000010), 512 (0200) bytes

 04CAC95F 5E1F0000 E9000088 0A578926 08478926 FE5688FC 4688F85E C4025789 .W.á^%.F•.V±&.G.&.W.¡..Õ...^_èò. 000000
 04478826 FC5E:4FE 5689FC46 890C5688 0A4688D8 8E058888 1E565700 0008C800 .à...WV.¡¡..Ä.F..V..F=.V±á^•Ï.G. 000020
 8826F85E C4005CE9 00028800 06E90374 FA4608F8 4688FA56 89F84689 06578826 &.W..F%.V°.F%.F°t.Õ..¡..Õ\.á^%&. 000040
 C40038E9 0038E900 0188030C 05809A0A 76FF0C76 FF0014E9 03740647 08260447 G.&.G.t.Õ...v..v..¯.É.¡..Õ;.Õ8.á 000060
 26045FC4 26F85EC4 02578926 07892606 5EC40657 88260447 8826045F C426F85E ^%&á_.&.G.&.W.á^.&..&.W.á^%&á_.& 000080
 04C80008 CAC95F5E 1F0000E9 00008806 57892604 478926F8 5EC40257 8826078B ..&.W̄.á^%&.G.&.W.¡..Õ...^_èò.¯à. 0000A0
 02470826 078826FC 5EC4FE56 89FC4689 0C56880A 4688088E 0629881E 56570000 ..WV.¡)..Ä.F..V..F•.V±á^•Ï..&.G. 0000C0
 08CAC95F 5E1F0000 E9000088 07892606 5EC40000 880003E9 00018800 06E90374 t.Õ..¡..Õ..¡..á^.&..¡..Õ...^_èò. 0000E0
 06C60002 000E0002 00190203 00000004 06740002 00000002 05780002 00059000 ......(.......t...............ó. 000100
 FF0A76FF D88EFFFF 881E5657 000000C8 00000000 001C0002 000A0203 00000009 ......Õ.........à...WV.¡...Ä.v.. 000120
 D88E0008 881E5657 000000C8 0006CAC9 5F5E1F00 00E9FFFF 00009A06 76FF0876 v..v......Õ...^_èò..à...WV.¡...Ä 000140
 8E002C88 1E565700 0000C800 04CAC95F 5E1F0000 E9001800 279A0676 FF0876FF .v..v..'...Õ...*_èò..à...WV.¡,.. 000160
 000000C8 0008CAC9 5F5E1F00 00E90039 03749A06 76FF0876 FF0A76FF 0C76FFD8 Ä.v..v..v..v..t.9̄.Õ...^_èò..à... 000180
 C95F5E1F 0000E900 6002509A 0676FF08 76FF0A76 FF0C76FF D88E004D 881E5657 WV.¡M..Ä.v..v..v..v..}.¯.Õ...^_è 0001A0
 6C9A5016 F8468037 FF260277 FF260A5E C4D88E00 74881E56 57000008 C80008CA ò..à...WV.¡t..Äá^.&.w.&.7.F%.P¯l 0001C0
 A09A5016 FC46800A 76FF0C76 FF025789 26078926 FA5688F8 4688065E C4FFFF00 ...á^..F%.V°&..&.W..v..v..F•.P.. 0001E0
```

```
Dump of file SATURN:[PCCOMMON.DUMP.DLL]DUT.IMP;1 on 18-APR-1990 10:45:39.24
File ID (637,10,0)   End of file block 29 / Allocated 32

Virtual block number 17 (00000011), 512 (0200) bytes

 FF0A76FF 0C76FFD8 8E009888 1E565700 0000C800 08CAC95F 5E1F0000 E90J8703 ...Õ...^_èò..à...WV.¡...Ä.v..v.. 000000
 81000200 00000300 F8000200 0308CAC9 5F5E1F00 00E90001 04229A06 76FF0876 v..v..".Ī.Õ...^_èò.....%.......Ý 000020
 000E7E83 D88EFFFF 881E5657 000004C8 00000000 00000900 E5000200 00000500 .......|........¯à...WV.¡...Ä.-.. 000040
 50400A46 88086A0E 76FF0066 E9889A88 0006E903 74084608 06468800 08E90375 u.Õ...F..F.t.Õ..¡..Õf..v.j..F.∂P 000060
 0C568301 0A468300 43E98899 880006E9 03750000 300000FF FF9A0676 FF0876FF .v..v......=..u.Õ..¡..ÕC..F...V. 000080
 46880007 C626FC46 FFFC5EC4 000AE9FE 5689FC46 89025788 26078826 065EC400 .á^.&..&.W..F•.V±Õ..á^•.F•&ó...F 0000A0
 C95F5E1F 0000E900 0088FFDE E90003E9 03750008 000C5E83 010A6E83 0C56880A ..V..n...^...Äu.Õ..Õ8.¡..Õ...^_è 0000C0
 0374000A 7E830009 E9037508 46080646 88D88E00 08881E56 57000000 C8000ACA ò..à...WV.¡...Ä.F..F.u.Õ...-..t̄. 0000E0
 880006E9 03750000 300000FF FF9A0676 FF0876FF 0A76FF00 22E9889A 880006E9 Õ..¡..Õ"..v..v..v......=..u.Õ..¡ 000100
 76FFD88E 0098881E 56570000 0CC80006 CAC95F5E 1F0000E9 00008800 06E98899 ..Õ..¡..Õ...^_èò..à...WV.¡...Ä.v 000120
 6A0E76FF 0091E988 9A880006 E9037500 003DFFFF 02F69A50 16F84680 0A76FF0C ..v..F%.P.-...=..u.Õ..¡..Õ...v.j 000140
 0088006F E98899B8 0006E903 75000030 00000037 9A5016F4 46805040 F846880B ..F%∂P.F¶.P.7...=..u.Õ..¡..Õo.¡. 000160
 0022E903 7EFE5639 FA5688F8 468800FE 568301FC 46830008 E9FC4689 FE468900 ..F±.F•Õ...F•..V±..F%.V°9V±-.Õ". 000180
 E9008826 F476C4FC 5E88008A 260A76C4 FC5E8800 15E90372 FC463900 08E9037D ).Õ..9F•r.Õ...^•áv.&...^•áv¶&..Õ 0001A0
 F65688F4 4688065E C40010E9 03750846 08064688 0000C626 F476C4F8 5E88FFC8 à..^%áv¶&ó...F..F.u.Õ..á^..F¶.V- 0001C0
 D88E00EA 881E5657 000010C8 000ACAC9 5F5E1F00 00E90000 88025789 26078926 &..&.W.¡..Õ...^_èò..à...WV.¡õ..Ä 0001E0
```

```
Dump of file SATURN:[PCCOMMON.DUMP.DLL]DUT.IMP;1 on 18-APR-1990 10:45:39.24
File ID (637,10,0)   End of file block 29 / Allocated 32

Virtual block number 18 (00000012), 512 (0200) bytes

 3D00FC02 F69A5016 F0468012 76FF1476 FF0130E9 889A8800 06E9037C 00107E83 .-..|.Õ..¡..ÕO..v..v..FÞ.P.-.•.= 000000
 77000A7E 830009E9 037E0044 E9037D00 0C7E8301 12E9889A 880006E9 03750000 ..u.Õ..¡..Õ...-..).ÕO.-.Õ...-..w 000020
 F0463800 08E9037D 0022E903 7EF25638 0C56130A 46031056 880E4688 0036E903 .Õ6..F..V..F..V.;V·-.Õ".).Õ..;FÞ 000040
 1056880E 46880027 E9F25689 F046890C 56130A46 03105688 0E468800 15E90372 r.Õ...F..V..F..V..FÞ.V·Õ'..F..V. 000060
 5689F046 89105688 0E468800 0CE90372 F0463900 08E9037D 0019E903 7EF25639 9V·-.Õ..).Õ..9FÞr.Õ...F..V..FÞ.V 000080
 0006E903 7500003D 0000011C 9A5016F4 46805040 0E4628F0 4688086A 1676FFF2 ·.v.j..FÞ•F.∂P.F¶.P... .=..u.Õ.. 0000A0
 46830008 E9FE5689 FC468910 56880E46 88F84689 FA468900 00880079 E98899B8 ¡..Õy.¡...F°.F%.F..V..F•.V±Õ...F 0000C0
 10E90372 FC463900 08E9037D 002AE903 7EFE5639 F25688F0 468800FE 568301FC •..V±..FÞ.V·9V±-.Õ*.).Õ..9F•r.Õ. 0000E0
 4688FFC0 E900FA56 8301F846 83008826 F476C4F8 5E88008A 261276C4 FC5E8800 ..^•áv.&...^%áv¶&...F%..V°.Õà..F 000100
 1F0000E9 00008802 57892607 8926F656 88F44688 065EC400 10E90375 08460806 ..F.u.Õ..á^..F¶.V-&..&.W.¡..Õ... 000120
 46080A46 88FC4689 FE468900 00880088E 01AC881E 56570000 04C80012 CAC95F5E ^_èò..à...WV.¡¯..Ä¡...F±.F•.F..F 000140
 FFE6E900 FE568301 FC468300 08E90375 00388026 0A76C4FC 5E88001A E903750C .ū.Õ...^•áv.&.8.u.Õ...F•..V±.Õl. 000160
 00E90000 88025789 26078926 FE5688FC 4688065E C40010E9 03750846 08064688 .F..F.u.Õ..á^..F•.V±&..&.W.¡..Õ. 000180
 9A5016F4 46800E76 FF1076FF 088E02FE 881E5657 000014C8 0008CAC9 5F5E1F00 ..^_èò..à...WV.¡±..Ä.v..v..F¶.P. 0001A0
 7500003D 038302F6 9A5016F0 46800A76 FF0C76FF 0018E903 7400003D 038A02F6 -..¯=..t.Õ...v..v..FÞ.P.-.°.=..u 0001C0
 5016EC46 805052F2 5613F046 03F65688 F4468812 76FF0004 E9889A88 0006E903 .Õ..¡..Õå..v..F¶.V-.FÞ.V·RP.F§.P 0001E0
```

Dump of file SATURN:[PCCOMMON.DUMP.DLL]DUT.TMP;1 on 18-APR-1990 10:45:39.24
File ID (637,10,0)   End of file block 29 / Allocated 32

Virtual block number 19 (00000013), 512 (0200) bytes

88F44688 FC4689FE 46890000 8800A8E9 88998800 06E90375 00003001 CD00009A ...ë.*..u.Õ..¡..Õ¨.¡...F±.F•.F¶. 000000
008A260E 76C4FC5E 88001DE9 0372FC46 390008E9 0370002A E9037EFE 5639F656 V-9V±-.Õ*.).Õ..9F•r.Õ...^•áv.&.. 000020
F04688F8 4689FA46 89000088 FFC8E900 FE568301 FC468300 8826EC76 C4FC5E88 .^•ávš&...F•..V±.Õà.¡...F•.F%.FÞ 000040
8A260A76 C4F85E88 0025E903 72F84639 0008E903 7D0032E9 037EFA56 39F25688 .V·9V•-.Õ2.).Õ..9F%r.Õ%..^%áv.&. 000060
064688FF C0E900FA 568301F8 468300FE 568301FC 46830088 26EC76C4 FC5E8800 ..^•ávš&...F•..V±..F%..V•.Õà..F. 000080
5E1F0000 E9000088 02578926 078926EE 5688EC46 88065EC4 0010E903 75084608 .F.u.Õ..á^..F$.VY&..&.W.¡..Õ...^ 0000A0
00000009 03600002 000E0002 02640203 00000006 03720002 00049000 0ECAC95F _èb.......r.......d.......`..... 0000C0
00000000 00000000 00000000 00000000 00000000 00000000 001C0002 00C30203 ..ú............................. 0000E0
4603022B 0C4688FA 5689F846 89085688 06468856 5700E105 4A9A0010 88EC8855 U.$¡...J.Ä.WV.F..V..F%.V•.F.•@.F 000100
0A7E8300 00F646C7 F4468948 0A4688FE 5689FC46 89085603 E20300A2 89021306 ..@¿Å.Æã.V..F•.V±.F.H.F¶úF-...-. 000120
76FFFE76 FFF67688 F47E8800 00F246C7 F046890C 46885874 C008F44E FF5F7400 .t_.N¶.àtX.F..FÞúF·...-¶.v-.v±.v 000140
FE5688FC 468828E8 F67689F4 7E894609 7EC00808 C4830E5E FFF876FF FA76FFFC •.v•.v%.^..á..ã-.F.-¶.v-$(.F•.V± 000160
0274C008 4FC788FE 4601E003 00EA89F2 4613FC4E 01F04E88 C028FA56 89F84689 .F%.V•+á.NÞ.N•.F·¿õ.ÆÅ.F±.úO.át@ 000180
76FF0876 FF004616 890044A3 1056880E 46880042 A30C4688 3E7400F6 7E8389E8 $¿.--.t>.F.ÉB..F..V.ÉD...F..v..v 0001A0
5603E203 01118900 02830646 03010304 849A5000 6A480A46 88004236 FF006A06 .j..6B..F.Hj.P......F..@.¿..Æã.V 0001C0
D2130446 03022800 42A15602 6F054A9A 000888EC 8855CBC9 5F5E0004 E8505208 .RPÒ..^_èüü.$¡...J.o.VÀB.•@.F..@ 0001E0

Dump of file SATURN:[PCCOMMON.DUMP.DLL]DUT.TMP;1 on 18-APR-1990 10:45:39.24
File ID (637,10,0)   End of file block 29 / Allocated 32

Virtual block number 20 (00000014), 512 (0200) bytes

FFFE76FF 60E8FE56 89FC4689 0A568808 4688FA56 89F84689 065603E2 D3015A89 ¿Z.Æã.V..F%.V•.F..V..F•.V±Sm.v±. 000000
1308F7D2 280042A1 0876FF0A 76FF9070 E80191E8 004236FF F876FFFA 76FFFC76 v•.v•.v%.6B.Ò..$p..v..v.ÀB.•@%Á. 000020
D213F846 03022800 42A1FF94 E85052FA 5603E203 01718900 0283F846 030AF7D2 @%Ö.F%.@.¿q.Æã.V•RPÒ..ÀB.•@.F%.@ 000040
E2030213 044603D2 280042A1 FE5689FC 46890A56 89084689 FA5603E2 D301C089 ¿á.Æã.V•.F..V..F•.V±ÀB.•@.F..@Æã 000060
19E90372 08463908 720123E9 03760A56 39065688 044688FA 5689F846 89065603 .V..F%.V•.F..V.9V.v.Õ#.r.9F.r.Õ. 000080
FE563906 56880446 88FE5E01 E3030205 B9DA13FC 4E01C888 DB28D228 0042A101 .ÀB.•@•Ü.à.N•.Õ¿..ÆD.^±.F..V.9V± 0000A0
C17EC008 08C48300 441EFFFC 76FFFE76 FF0876FF 0A76FF17 73FC4639 05721E77 w.r.9F•s..v..v..v±.v•..D..á..ã-è 0000C0
88084688 FA5E01E3 D3029689 DA13F84E 01C88808 280AF7D2 1308F7D2 280042A1 ÀB.•@%Á.@%Ö•Ü.à.N%.Õ¿..ÆD.^•.F.. 0000E0
C4830044 1EFFF876 FFFA76FF 0876FF0A 76FF1776 F8463905 771E72FA 56390A56 V.9V•r.w.9F%v..v..v..v•.v%..D..á 000100
0A76FFFE DFE90376 F8463908 72FEE9E9 0376FA56 39FE5688 FC468888 7DC00808 ..â)£.F•.V±9V•v.ÕÕ±r.9F%v.ÕÕ±.v. 000120
8204669A 0476FF06 76FFF876 FFFA76FF 0070E800 4236FFF8 76FFFA76 FF0876FF .v..v•.v%.6B.Òp..v•.v%.v..v..f.. 000140
D2280042 A1FEB7E9 037DC638 02090466 9AF088F8 76FFFA76 FF0876FF 0A76FF02 ..v..v..v•.v%.Þ.f.).;6).Õñ±ÀB.•@ 000160
1308F7D2 280042A1 FE52E804 76FF0676 FF5052FA 5603E203 028A89D2 13F84603 .F%.@¿¤.Æã.V•RP.v..v.ÒR±ÀB.•@%Á. 000180
900008C2 C95EFE54 E9065689 044689FA 5603E203 FFFF8900 0283F846 030AF7D2 @%Ö.F%.@.¿..Æã.V•.F..V.ÕI±^èö... 0001A0
8A26065E C4FE4688 078A260A 5EC49037 E8047688 56FFFF05 4A9A0002 ['EC8855 U.$¡...J...V.v.$7.á^.&...F±á^.&. 0001C0
01064683 078826FE 468A065E C40C4601 031325C0 18010A46 83078826 0[5EC407 .á^.&...F...ä%...F.á^..F±&...F.. 0001E0

Dump of file SATURN:[PCCOMMON.DUMP.DLL]DUT.TMP;1 on 18-APR-1990 10:45:39.24
File ID (637,10,0)   End of file block 29 / Allocated 32

Virtual block number 21 (00000015), 512 (0200) bytes

FF335356 57EC8855 90000AC2 C95E0476 89C375C0 084EC688 084601FF FF25C018 .à%...F..óN.àuü.v.^èò...U.$WVS3. 000000
47117DC0 080C4688 06568908 46890000 10DAF7D8 F7065688 47117DC0 08084688 .F..â).G.V.%Á%Ö....F..V..F..â).G 000020
088BF1F7 D2330846 880A4E88 1575C008 0A56890C 46890000 10DAF7D8 F70A5688 .V.%Á%Ö....F..V..àu..N..F.3@%Þ.Á 000040
F4750808 D8D1EAD1 09D1E8D1 06468808 56880A4E 88088838 E8D388F1 F7064688 .F.%Þ.¢5B.Á.N..V..F.¦$¦¦¦õ¦Á.Uu¶ 000060
D2334E01 76064638 06720777 08563B0C 720103E6 F70A4688 910C66F7 F088F1F7 %Þ.Þ%f...F.%I.Ir.;V.w.r.;F.v.N3@ 000080
C0080846 88FF3357 53EC8855 0008CA5D E5885F5E 58000A83 D8F7DAF7 07754F96 .Ou.%Õ%Á.Õ.[^_.¦]ò..U.$SW3..F..â 0000A0
F7D8F70A 5688107D C0080C46 88065689 08468900 0010DAF7 D8F70656 8847117D ).G.V.%Á%Ö....F..V..F..â)..V.%Á% 0000C0
33C288F1 F7064688 F1F7D233 0846880A 4E881875 C0080A56 890C4689 0000100A Õ....F..V..àu..N..F.3@%Þ.F.%Þ.ó3 0000E0
88F1F7F4 75D80808 D1EAD109 D1E8D106 46880856 880A4E88 08884BE8 43794FD2 @OyC$H.Ä.N..V..F.¦$¦¦¦õ¦Á.Uu¶%Þ. 000100
46280C56 180A4628 06760646 38087207 77085638 0C720103 0A66F791 0C66F7C8 à%f..%f..Ir.;V.w.r.;F.v.+F..V.+F 000120
88085688 064688EC 88550008 CA5DE588 585F000A 8308F7DA F707794F 08561806 ..V.Oy.%Õ%Á.Õ._[.¦]ò..U.$.F..V.. 000140
88D8080C 5E880846 88EC8855 0008CA5D E5880318 0A4628EB D3EAD300 34890C5E ^.¿4.ÆõÆ$+F..Æ.¦]ò..U.$.F..^..Á. 000160
E3F70646 88C8030C 66F70646 88C888E3 F70008CA 50E588E3 F7064688 08750A5E ^.u..F.%D.¦]ò..%D.à.F.%f..à.F.%D 000180
1E004A68 1E0478A3 E0865800 00FFFF9A 5016C488 50EC8855 0008CA5D E588D103 .¦.¦]ò..U.$P.á.P.....X.Àɛx..hJ.. 0001A0
04E1056E 9A50C85D E5880001 88001906 E89A011A E80021E8 0000FFFF 9A004868 hH......ÕI.Õ...Õ...¡...¦]üP.n.Á. 0001C0
47017500 3080267F FFB9004A 068EFF33 0000881E 005016FF 00FF6804 EE05C29A .ò.Ÿ.h....P..È..3...J.¿..&.=.u.G 0001E0

```
Dump of file SATURN:[PCCOMMON.DUMP.DLL]DUT.TMP;1 on 18-APR-1990 10:45:39.24
File ID (637,10,0)   End of file block 29 / Allocated 32

Virtual block number 22 (00000016), 512 (0200) bytes

 F788071E 061CEBE7 74AEF2C0 330874CA 8BA6F3CB 8BD18804 548E3174 00308026 &.=.t!/T..!.ù!.òt.3à·ÙtÓ$.....% 000000
 D8280C88 5A590 :3 1FEDEBAA C20A0572 412CAC92 04E0C00E 72412CAC 047F8F1F .«..¯,Ar.àÅ..¯,Ar..ô`ŠÚ.ú.YZ.É+Å 000020
 88550462 2EFF¸.¸2 FF82E9C0 33057540 0462A1CB 5152E388 05720466 1E380872 r.;.f.r..DRQùAb.âu.3àÕ..RQ..b.U. 000040
 E5880578 05C29A50 00FF8804 681EFF04 7400046A 3E8304F3 05C29A50 00FCB8EC š¡•.P.ô.µ..>j..t...h.¡..P.ô.x..! 000060
 C033970C 74964010 74C23BAD 068ABE06 5688C08E D88EFFFF 885756EC 8855CB5D ]ùU.šVW¡...Á.â.V.ƒ¤.Ù;ôt.â.t..3à 000080
 C008058C 05929A06 76FF57EC 88550002 CA5DE588 5E5F96EB EBF78BAE F2FFFFB9 ¿..·Ù.XŠŠ.¯^.|]ò..U.šW.v.......à 0000A0
 0000FFFF 9A501651 521E5300 028BC48B 50490 1F7 AEF2FFFF 89C033FA 8B921F74 t...*3à¿..¯Ù%11P.6É..S.RQ.P..... 0000C0
 0000FFFF 9A521650 1653C48B 5087047F A780048B 5200028B 0002CA5D E5885F5B [_.|]ò..£..R.&.I..ñP.6S.P.R..... 0000E0
 E306A80E 885A0479 48047F8F 08088106 75000230 07740001 30408112 7558C008 .ãXu.Ýâ=..t.=..u.Ý.....KyÅZ..´.D 000100
 BE06A61E FF00038B C28C06AE 06C401AE E9037306 A61EFFD8 33C28C06 AA06C41E .á.´..ô3Ù..!.s.ÕÙ.á.Ù..ôÉ....!.ƒ 000120
 9A067568 0E016A08 7406823D 06828800 73E80682 BF06828E 007CE806 828F0682 ý.«ý.Ô|.ƒý.«ý.Ôs.¡ý.=ý.t.j..hu.. 000140
 88550000 06709A00 6A006A03 6A0051E8 06828F06 828ED88E 059888C3 0000FFFF ....ù¡...Á/ý.«ý.Ôa.j.j.j..p...U. 000160
 23E80682 8F06828E EC885503 E80031E8 06828F06 828E003A E807928F 0792BEEC š/..«..Ô:./ý.«ý.Ô1.Š.U.š/ý.«ý.Ô# 000180
 FF00028B 07E306A8 0E880000 FFFF9A50 06468A50 C033001A E806828F 06828E00 ./ý.«ý.Ô..3àP.F.P.... ...´.D.É... 0001A0
 F62B5657 000014C8 00C3EEEB 1DFFF274 02450805 8804EF83 0E73F738 C306A61E .Ì.ù;%s..y....E.t·..ŠYu.à...WV+- 0001C0
 FF0C6AFB 5689F646 89F25689 F04689C0 28004A16 8800F0E9 0375004A 3639FF28 +.96J.u.ÔÞ...J.+â.FÞ.V·.F-.V½j.. 0001E0

Dump of file SATURN:[PCCOMMON.DUMP.DLL]DUT.TMP;1 on 18-APR-1990 10:45:39.24
File ID (637,10,0)   End of file block 29 / Allocated 32

Virtual block number 23 (00000017), 512 (0200) bytes

 C4008CE9 03767FFF FE814619 74C0080A C483075C 091E9A04 54681EF6 76FFF876 v½.v-.hT....\..á..àt.F.±..v.Õ¥.á 000000
 3F8026F6 5E88F475 003F8026 F646FFF6 5EC40CE8 47EA7500 3F8026F6 46FFF65E ^-.F-&.7.uõG$.á^-.F-&.?.u¶.^-&.? 000020
 02C48307 A108089A 56EE5689 EC468904 C483076B 08C69A04 6A500145 808A7500 .uo.E.Pj..6.k..á..F$.VÝV...Á..á. 000040
 16890685 A3EE568B EC468866 74C208FC 46886074 EE4608EC 468BFE56 89FC4689 .F•.V±.F$.FÝtm.F•.ôtf.F$.VÝÉ.... 000060
 FC4688EC 5EC42C74 C0080AC4 8305CC09 1E9A0454 681EF076 FFF276FF 0C6A0687 ..j..v·.vÞ.hT....à..á..àt,á^$.F• 000080
 078826FC 46FFFC5E C4078A26 F046FFF0 5EC404EC 46830257 89260789 26FE568B .V±&..&.W..F$.á^Þ.FÞ&..á^•.F=&.. 0000A0
 90C8C95F 5EA77500 3F8026F0 5EC4F475 003F8026 F046FFF0 5EC4E8E8 0E74C00A .àt.$Ôá^Þ.FÞ&.7.u¶á^Þ&.?.uT^_èù. 0000C0
 EC83EC88 55C85DE5 8801FE4F 80260574 C308C08C 065EC4EC 8855FCF4 E900028B ¡..Ô¶•U.$á^..â.ùt.&.O±..|]ùU¯.$.$ 0000E0
 E8157500 82E8069A A3127400 25E80875 00069A3E 831E73FF F13D0646 88575602 .VW.F.=Þ.s..>...u.ÕX.t.É..Ô..u.Ô 000100
 065E3900 F088C85D E5885E5F 02C48307 1C096C9A 0676FF08 750078E8 05740018 ..t.Õx.u..v..l....á._^.|]ùÉÞ.9^. 000120
 08C48308 3F08189A 50028051 0E4F8050 501EC033 FE5E89FE E3834306 5E880776 v..^.C.D±.^±3à.PP.O.Q¯.P...?..á. 000140
 08A3C033 D88EFE5E 880008A3 DA8E0574 D208069E A3069C16 87C28838 74FFFA83 .•.t8.ò....È...Øt..ÒÈ...^±.Ä3àÈ. 000160
 8CC31FD8 8C0006A3 00000500 0AA30147 800002A3 0000A300 0A880C47 89484800 .HH.G.¡..È..È...G.È.....È...Ä.ú. 000180
 0876FF00 6A560000 0AC8C309 8EC18CD2 0800F6E8 069E1E8E D833064E 88C08ED8 Ä.á.N.3Ù....Ò-..Ø.ê.|ùà...Vj..v. 0001A0
 56F8768B 902FEB99 C0280674 FFFFC2F7 FA5689F8 468908F3 04849A06 76FF006A j..v....µ..F½.V•%ô..t.+â.$/..v½V 0001C0
 C4830868 08CE9A50 FE76FF00 6A561274 D008FE56 89FC4689 02C48309 0C08089A ......á..F•.V±.Ät.Vj..v±P.ö.k..á 0001E0

Dump of file SATURN:[PCCOMMON.DUMP.DLL]DUT.TMP;1 on 18-APR-1990 10:45:39.24
File ID (637,10,0)   End of file block 29 / Allocated 32

Virtual block number 24 (00000018), 512 (0200) bytes

 F788067E C4D98827 E30E4E88 1E5657EC 885590C8 C95EFE56 88FC4688 9007E808 .$...F•.V±^èù.U.$WV..N.D'.1á~..% 000000
 D1F74949 04740477 FF453A26 C933FF44 8AA6F30A 76C5FE88 CB03D9F7 AEF2C033 3à·ÙÄ).ù.±év.µ!.D.3è&:E.w.t.II%I 000020
 56EC8855 CB5DE588 01FE4F80 0474D808 065E88EC 885500CB 5DE5885F 5E1FC188 .è.^_.|]ù.U.$.^..Ùt..O±..|]ùU.$V 000040
 92A30690 A3FE2440 24EB99C0 33057501 76E80005 88071E29 75003F83 06908857 WE...¯?.u)..¡..Òv.u.3à.$$â$±É..É. 000060
 E5885E5F 0009E8C0 8ED88C06 4E880696 3689FFFE FE44C704 C6830001 ˘ ˘79606 ..ú....6.ÙD±±..6...N..Ä.àÒ..^.| 000080
 1573C138 48437401 A8FE88AD FC02778B F273EEF9 83FEE180 FA744100 DL ?CB50 )ùÕÄ.At•.Ä±.•Ýs·.w.•Ù.±´.tCH;ès. 0000A0
 C128FE4C 89F9030C 74FE88E6 E8FE4489 F78B0002 05C20335 7401A8AD F0G˘D088 .Ä.ÞÙ´.t5.ô....¥.D±$!.±t..•.L±+è 0000C0
 C626C302 7F89069E 1E8C2605 74013806 76890A8C C688FE4C FEF90305 E8058948 H..Š..•±L±.6.Õ¿v.;!t.&.......ù&6 0000E0
 01A8ADF0 03D0888C 73C13848 FE88F274 01A8ADF0 03FE8825 74FFFE3D 0206A206 .Ä..=±.t%.±.ÞÙ´.t·.±H;ès¥.Ä.ÞÙ´. 000100
 127406A2 0EFE2615 E8D88E04 74C00808 4788E6E8 FE4489F7 88000205 C203E274 tâ.ô....¥.D±$!.G..ât..ÄŠ.&±.Ä.t. 000120
 01240074 C63B006B E8C03306 7788B8E8 3788069A 1E8E2605 74C73809 FF8FD88C .Ä«..;út.&.....7ŠE.w.3àÒk.;ôt.$. 000140
 A3260474 C13B0A53 B9D88C9B E84E4E96 0574001D E8FE4DFE 0074005F E8984040 ââ.Ò_.t.±M±Ò..t..NNŠ..Ä¿S.;èt.&È 000160
 06A0163B 267FFFBA 414149C8 28037401 A8FE4588 51C399C0 33024789 0788069E ....¯G.3à.ùQ.E±´.t.•à!AAo..&;... 000180
 75EAD1D2 F7087500 0CE8C62B C22302F7 0072C203 1572C603 C188F575 EAD10476 v.1õuK.ê.ór..ôr.%Ø#ô+6Ò..u.%Øiõu 0001A0
 4AD728D6 88067789 FFFEFE44 C7F203F0 88FE8857 1874001D E85152C3 59C033E5 |3àYùRQÒ..t.W.±.Þ.·ùD±±..w..ø+±J 0001C0
 FFFA8308 C48308D8 08189A1F 06500001 88505252 1ED23350 53C35A59 58FE5589 .U±XYZùSP3Ø.RRP¡..P.....Ä..á..•. 0001E0
```

```
Dump of file SATURN:[PCCOMMON.DUMP.DLL]DUT.TMP;1 on 18-APR-1990 10:45:39.24
File ID (637,10,0)   End of file block 29 / Allocated 32

Virtual block number 25 (00000019), 512 (0200) bytes

07754806 46880856 880052BF 3875000A 7E830657 56EC8855 C3D20802 745B5A1F .Z(t..ÐüU.$VW..~..uBèR..V..F.Hu. 000000
8334735E 003EE856 0E468902 44880074 F7381174 48045236 884CE827 720057E8 ÕW.r'$L.6R.Ht.;%t..D..F.VÒ>.^s4. 000020
0000FFFF 9A50C033 501652C4 885021EB 99FFFFB8 0675D208 04730452 FE8104C6 ó..±R.s..Ðu.|...ŠIP..?.P3šP..... 000040
39F7880E 4EL8CB5D E5885E5F 07C03303 88045236 89025C89 1489E675 C085F958 [ª.åul...\..6R..Æ3ä._ .l)ù.H..%9 000060
1E390675 F738C18E D3882672 1C030A88 2CEBF9F2 750452FE 8104C683 0C74024C L.t..6..±R.u·ª$,.Ö..r&.Æ.è;%u.9. 000080
885500C3 D1880487 92004C16 890475F7 38DE75C0 850000FF FF9A5153 1373004C L.s.SQ......åuÄ;%u...L.....lù.U. 0000A0
8A0A468B D128D187 D1030323 0B1BD128 0C740AF7 D788067E C45738E3 0C4E88EC Š.N.DBWå~..a%Ot.+l.ÙWÆ.l.1+l.F.. 0000C0
46885FAA F3C913A8 F3E9D1C3 8E02FEC3 81C38C10 E3D187AA F3C913A8 F3E9D1E0 ÀlÕµ¨.èµ´.lD..ù.ùz..ùlÕµ¨.èµ´_.F 0000E0
00000007 08080002 00070001 068A0103 00050001 06C20103 000CCB50 08568806 ..V.]ù....ó...................... 000100
00220001 086C0103 00880001 0C010105 00870001 04730105 00000009 0A880002 .........$..................l...". 000120
00580001 04040103 00400001 060C0103 00200003 05EC0203 00260001 08870103 ..ñ...&...&...·.......M...Å...[. 000140
54206E75 52205340 00000000 00000000 00000000 00000000 005C0001 04C10103 ..è...\.................MS Run-T 000160
38383931 20296328 20746867 69727970 6F432020 20797261 7262694C 20656D69 ime Library - Copyright (c) 1988 000180
07A007A0 00000000 00000000 00000011 70726F43 2074666F 736F7263 694D202C , Microsoft Corp................ 0001A0
00000000 00000000 00000000 00000000 00000000 00000000 0000FFFF 07A006A5 È................................ 0001C0
00000000 00000000 00000000 00000000 00000000 00000000 00000000 00000000 ................................ 0001E0

Dump of file S TURN:[PCCOMMON.DUMP.DLL]DUT.TMP;1 on 18-APR-1990 10:45:39.24
File ID (637,10,0)   End of file block 29 / Allocated 32

Virtual block number 26 (0000001A), 512 (0200) bytes

00000000 00000000 00000000 00000000 00000000 00000000 00000000 00000000 ................................ 000000
00000000 00000000 00000000 00000000 00000000 00000000 00000000 00000000 ................................ 000020
00000000 00000000 00000000 00000000 00000000 00000000 00000000 00000000 ................................ 000040
00000000 00000000 00000000 00000000 00000000 00000000 00000000 00000000 ................................ 000060
00000000 00000000 00000000 00000000 00000000 00000000 00000000 00000000 ................................ 000080
00000000 00000000 00000000 00000000 00000000 00000000 00000000 00000000 ................................ 0000A0
00000000 00000000 00000000 00000000 00000000 00000000 00000000 00000000 ................................ 0000C0
00000000 00000000 00000000 00000000 00000000 00000000 00000000 00000000 ................................ 0000E0
00000000 00000000 00000000 00000000 00000000 00000000 00000000 00000000 ................................ 000100
00000000 00000000 00000000 00000000 00000000 00000000 00000000 00000000 ................................ 000120
00000000 00000000 00000000 00000000 00000000 00000000 00000000 00000000 ................................ 000140
00000000 00000000 00000000 00000000 00000000 00000000 00000000 00000000 ................................ 000160
00000000 00000000 00000000 00000000 00000000 00000000 00000000 00000000 ................................ 000180
00000000 00000000 00000000 00000000 00000000 00000000 00000000 00000000 ................................ 0001A0
00000000 00000000 00000000 00000000 00000000 00000000 00000000 00000000 ................................ 0001C0
00000000 00000000 00000000 00000000 00000000 00000000 00000000 00000000 ................................ 0001E0

Dump of file SATURN:[PCCOMMON.DUMP.DLL]DUT.TMP;1 on 18-APR-1990 10:45:39.24
File ID (637,10,0)   End of file block 29 / Allocated 32

Virtual block number 27 (0000001B), 512 (0200) bytes

00000000 00000000 00000000 00000000 00000000 00000000 00000000 00000000 ................................ 000000
00000000 00000000 00000000 00000000 00000000 00000000 00000000 00000000 ................................ 000020
00000000 00000000 00000000 00000000 00000000 00000000 00000000 00000000 ................................ 000040
00000000 00000000 00000000 00000000 00000000 00000000 00000000 00000000 ................................ 000060
00000000 00000000 00000000 00000000 00000000 00000000 00000000 00000000 ................................ 000080
00000000 00000000 00000000 00000000 00000000 00000000 00000000 00000000 ................................ 0000A0
00000000 00000000 00000000 00000000 00000000 00000000 00000000 00000000 ................................ 0000C0
00000000 00000000 00000000 00000000 00000000 00000000 00000000 00000000 ................................ 0000E0
00000000 00000000 00000000 00000000 00000000 00000000 00000000 00000000 ................................ 000100
00000000 00000000 00000000 00000000 00000000 00000000 00000000 00000000 ................................ 000120
00000000 00000000 00000000 00000000 00000000 00000000 00000000 00000000 ................................ 000140
00000000 00000000 00000000 00000000 00000000 00000000 00000000 00000000 ................................ 000160
00000000 00000000 00000000 00000000 00000000 00000000 00000000 00000000 ................................ 000180
00000000 00000000 00000000 00000000 00000000 00000000 00000000 00000000 ................................ 0001A0
00000000 00000000 0200FFFF FFFF003D 4F464E49 5F454C49 465F435F 00520000 ..R._C_FILE_INFO=............... 0001C0
00000000 00000000 00000000 00008181 81010000 00010000 00000000 00000000 ................................ 0001E0
```

```
Dump of file SATURN:[PCCOMMON.DUMP.DLL]DUT.TMP;1 on 18-APR-1990 10:45:39.24
File ID (637,10,0)   End of file block 29 / Allocated 32

Virtual block number 28 (0000001C), 512 (0200) bytes

 00000000 00000000 00000000 00000000 00000000 00000000 00000000 00000000 ................................ 000000
 00000000 00000000 00000000 00000000 00000000 00000000 00000000 00000000 ................................ 000020
 00000000 00000000 00000000 00000000 00000000 00000000 00000000 00000000 ................................ 000040
 00000000 00000000 00000000 00000000 00000000 00000000 00000000 00000000 ................................ 000060
 00000000 00000000 00000000 00000000 00000000 00000000 00000000 00000000 ................................ 000080
 00000000 00000000 00000000 00000000 00000000 00000000 00000000 00000000 ................................ 0000A0
 0A0A0A0A 0A0A0A0A 0A0A0A0A 0A0A0A0A 0A000000 00000000 00000000 00000000 ................................ 0000C0
 0A0A0A0A 0A0A0A0A 0A0A0A0A 0A0A0A0A 0A0A0A0A 0A0A0A0A 0A0A0A0A 0A0A0A0A ................................ 0000E0
 0A0A0A0A 0A0A0A0A 0A0A0A0A 0A0A0A0A 0A0A0A0A 0A0A0A0A 0A0A0A0A 0A0A0A0A ................................ 000100
 0A0A0A0A 0A0A0A0A 0A0A0A0A 0A0A0A0A 0A0A0A0A 0A0A0A0A 0A0A0A0A 0A0A0A0A ................................ 000120
 0A0A0A0A 0A0A0A0A 0A0A0A0A 0A0A0A0A 0A0A0A0A 0A0A0A0A 0A0A0A0A 0A0A0A0A ................................ 000140
 0A0A0A0A 0A0A0A0A 0A0A0A0A 0A0A0A0A 0A0A0A0A 0A0A0A0A 0A0A0A0A 0A0A0A0A ................................ 000160
 0A0A0A0A 0A0A0A0A 0A0A0A0A 0A0A0A0A 0A0A0A0A 0A0A0A0A 0A0A0A0A 0A0A0A0A ................................ 000180
 0A0A0A0A 0A0A0A0A 0A0A0A0A 0A0A0A0A 0A0A0A0A 0A0A0A0A 0A0A0A0A 0A0A0A0A ................................ 0001A0
 00000000 00000000 00000000 00000000 000A0A0A 0A0A0A0A 0A0A0A0A 0A0A0A0A ................................ 0001C0
                                                                         ................................ 0001E0

Dump of file SATURN:[PCCOMMON.DUMP.DLL]DUT.TMP;1 on 18-APR-1990 10:45:39.24
File ID (637,10,0)   End of file block 29 / Allocated 32

Virtual block number 29 (0000001D), 512 (0200) bytes

 00000000 00000000 00000000 00002000 00000000 00000000 00000000 00000000 ................. ............. 000000
 66726576 6F206B63 61747320 2D0A0D30 30303652 00003E3E 4753404E 3C3C0000 ..<<NMSG>>..R6000..- stack overf 000020
 20656469 76696420 72656765 746E6920 2D0A0033 30303652 0003000A 0D776F6C low.....R6003..- integer divide  000040
 61707320 6867756F 6E652074 6F6E2020 0A003830 30365200 08000A0D 30207962 by 0.....R6008..- not enough spa 000060
 6F6E2020 0A0D3930 30365200 09000A00 73746E65 60756772 6120726F 66206563 ce for arguments.....R6009..- no 000080
 0A0D746E 65606E6F 7269766E 6520726F 66206563 61707320 6867756F 6E652074 t enough space for environment.. 0000A0
 00323030 36520002 0020726F 72726520 65606974 2D6E7572 00FF000A 0000FC00 .*......run-time error ...R6002. 0000C0
 FF000A00 64656461 6F6C2074 6F6E2074 6E696F70 20676E69 74616F6C 6620200A .- floating point not loaded.... 0000E0
 00000000 0000000( 00000000 00000000 00000000 00000009 00540002 0001FFFF ......T......................... 000100
 00000000 00000000 00000000 00000000 00000000 00000000 00000000 00000000 ................................ 000120
 00000000 00000000 00000000 00000000 00000000 00000000 00000000 00000000 ................................ 000140
 00000000 00000000 00000000 00000000 00000000 00000000 00000000 00000000 ................................ 000160
 00000000 00000000 00000000 00000000 00000000 00000000 00000000 00000000 ................................ 000180
 00000000 00000000 00000000 00000000 00000000 00000000 00000000 00000000 ................................ 0001A0
 00000000 00000000 00000000 00000000 00000000 00000000 00000000 00000000 ................................ 0001C0
                                                                         ................................ 0001E0
```

```
Dump of file SATURN:[PCCOMMON.DUMP.DLL]DA-FIND.DLL;1 on 18-APR-1990 10:38:55.60
File ID (390,14,0)   End of file block 46 / Allocated 48

Virtual block number 1 (00000001), 512 (0200) bytes

00000000 00000040 00000000 00000088 0000FFFF 00000004 00000028 007A5A4D MZz.+...........|.......a....... 000000
00000080 00000000 00000000 00000000 00000000 00000000 00000000 00000000 ................................ 000020
6F6E6E61 63206061 72676F72 70207369 685421CD 4C01B821 CD098400 0EBA1F0E ..¤..Ç.ël|.LélThis program canno 000040
00000000 00000024 0A0D002E 65646F6D 20534F44 206E6920 6E757220 45622074 t be run in DOS mode....$....... 000060
00080000 00000000 00060000 00000000 00098009 5FCF07EC 00190325 L 05454E NE..X...$.ü_..................... 000080
00000000 00000000 00010004 00040000 0000038E 01240114 008800A8 0L-0002F /.a.`.|...$./................... 0000A0
008E0F00 008E01B7 0E940F00 0E930086 02540F00 02540089 041C0F00 0418003F ?.........T...T.Ñ.......ñ....... 0000C0
02020E21 00000000 19080F00 190801FA 000F0F00 000F01F8 02E80F00 02E701C2 ó.Ò...Ò.%.......*...........|... 0000E0
01DE1EB1 01DE0581 01F71EB1 01F70561 015A1EB1 015A054B 1D200F21 18800391 ....|. .K.Z.Ý.Z.a.%.Ý.%...B.Ý.B. 000100
646E6966 2D616407 04800004 00140004 00330004 00110005 01901EB1 0190059F ....Ý.........3.......¯..da-find 000120
4A424F45 4E4F444E 49460000 02544345 4A424F44 4E494644 4E494641 44100000 ...DAFINDFINDOBJECT...FINDONEOBJ 000140
0004434F 5250474C 44535341 4C434553 4F4F4843 4D524F46 41441800 03544345 ECT...DAFORMCHOOSECLASSDLGPROC.. 000160
01A30174 00880010 00070001 00000543 4F525047 4C44454E 4F444E49 46414410 .DAFINDONEDLGPROC.........£.t.Ê. 000180
55514341 4C4D4400 6C6D6403 534C4C41 43534F44 084E4957 4D500500 01F401D2 Ø.¶...PMWIN.DOSCALLS.dml.DMLACQU 0001A0
4D440C4E 5854504F 54534C4D 440A4E58 54545241 54534C4D 44084D54 48455249 IREHTM.DMLSTARTTXN.DMLSTOPTXN.DM 0001C0
4408454C 444E4148 4C45444F 4D595245 55514C4D 44134C45 444F4D45 4552464C LFREEMODEL.DMLQUERYMODELHANDLE.D 0001E0
```

```
Dump of file SATURN:[PCCOMMON.DUMP.DLL]DA-FIND.DLL;1 on 18-APR-1990 10:38:55.60
File ID (390,14,0)   End of file block 46 / Allocated 48

Virtual block number 2 (00000002), 512 (0200) bytes

44595245 55514C4D 440D5453 494C4545 52464C4D 44084E4C 52595245 55514C4D MLQUERYRLN.DMLFREELIST.DMLQUERYD 000000
4D440F46 464F5245 544C4946 4C4D440C 4E4F5245 544C4946 4C4D4408 44494C4D MLID.DMLFILTERON.DMLFILTEROFF.DM 000020
034E4C52 59524555 51544345 4C45534C 4D441154 43454A42 4F544345 4C45534C LSELECTOBJECT.DMLSELECTQUERYRLN. 000040
470E4C4F 4F544C4C 49484954 47084C4F 4F544554 41455243 4954475F 0E495447 GTI. GTICREATETOOL.GTIKILLTOOL.G 000060
52455551 49544712 47534D44 4E455349 54470A43 4F52504C 4F4F5446 45444954 TIDEFTOOLPROC.GTISEND.¬SG.GTIQUER 000080
49544712 574F444E 49574C4F 4F545445 53495447 10574F44 4E49574C 4F4F5459 YTOOLWINDOW.GTISETTOOLWINDOW.GTI 0000A0
52545041 54414458 55415445 53495447 10525450 41544144 58554159 52455551 QUERYAUXDATAPTR.GTISETAUXDATAPTR 0000C0
4C4F4F54 54455349 54470F59 54494C49 42495349 564C4F4F 54544553 49544714 .GTISETTOOLVISIBILITY.GTISETTOOL 0000E0
4D454D0D 4D454D03 544E4552 41504C4F 4F545952 45555149 54471253 55434F46 FOCUS.GTIQUERYTOOLPARENT.MEM.MEM 000100
4C4C414D 454D0050 41454859 4F525453 45444D45 4D0E5041 45484554 41455243 CREATEHEAP.MEMDESTROYHEAP.MEMALL 000120
16454D41 4E535341 4C435445 47534C4E 41441173 6C6E6164 0548434F 4C42434F OCBLOCK.danls.DANLSGETCLASSNAME. 000140
45474D41 44106061 6403454D 414E5942 59414C50 53494454 524F5353 4C4E4144 DANLSSORTDISPLAYBYNAME.dam.DAMGE 000160
534F4408 4F495303 4A424F45 54454C45 444D4144 0C454D41 4E544345 4A424F54 TOBJECTNAME.DAMDELETEOBJ.SIO.DOS 000180
4F1A0000 02F00303 0101CF03 0101084E 03000003 03020000 03020145 54495257 WRITE...........N....ü....Þ....O 0001A0
49464144 0E000079 74696C69 63614620 7265646E 69462041 44204D50 20322F53 S/2 PM DA Finder Facility...DAFI 0001C0
E9000AB8 D88EFFFF B81E5657 000000C8 00000000 0001434F 52504C4F 4F54444E NDTOOLPROC......à...WV.|...Ä|..Õ 0001E0
```

```
Dump of file SATURN:[PCCOMMON.DUMP.DLL]DA-FIND.DLL;1 on 18-APR-1990 10:38:55.60
File ID (390,14,0)   End of file block 46 / Allocated 48

Virtual block number 3 (00000003), 512 (0200) bytes

5E8CFA46 89004288 0000F446 C7D88E00 08881E56 5700001A C8C8C95F 5E1F0000 ...^_èùà...WV.|...ÄúF¶..|B..F*.^ 000000
76FF1876 FF1676FF 1876FF00 0007C726 0A5EC4F8 5689F646 89085688 064688FC ª.F..V..F-.V%á^.&ú....v..v..v..v 000020
89EC4689 0000FFFF 9A5016F4 4680146A 020036FF 261A9806 8EFFFF68 FFFF6816 .h..h......&.6..j..F¶.P......F$. 000040
E9F04688 F25689F0 46890000 FFFF9A00 6A006A00 15E90374 EE460BEC 468BEE56 VÝ.F$.FÝt.Õ..j.j.......FÞ.V·.FÞÕ 000060
FFFF9A00 CA68EC76 FFEE76FF 016A006A 0000FFFF 9AEC76FF EE76FF1A 76FF0136 6..v..vÝ.v$.....j.j..vÝ.v$hò.... 000080
68726AEC 76FFEE76 FFE84689 0000FFFF 9AEC76FF EE76FF00 00FFFF9A 50520000 ..RP......vÝ.v$......FÒ.vÝ.v$jrh 0000A0
6A006A01 24686E6A EC76FFEE 76FFE646 89000000 F69A006A 006A006A 006A0124 $.j.j.j.j..-....Fl.vÝ.v$jnh$.j.j 0000C0
006A006A 006A006A 01246870 6AEC76FF EE76FFEA 46890000 01119A00 6A006A00 .j.j.......Fõ.vÝ.v$jph$.j.j.j.j. 0000E0
00EA7E83 0042E900 0007C726 0A5EC400 0BE90375 00E67E83 FE468900 00FFFF9A ......F±.-l.u.Õ..á^.&ú...ÕB..-õ. 000100
E9037500 EA7E8300 25E90002 07C7260A 5EC4000B E9037500 FE7E8300 14E90375 u.Õ...~±.u.Õ..á^.&ú...ÕX..~õ.u.Õ 000120
76FF0003 07C7260A 5EC40008 E9037500 FE7E8300 11E90001 07C7260A 5EC4000B ..á^.&ú...Õ...~±.u.Õ..á^.&ú....v 000140
07C72612 5EC40016 E9000107 C726125E C40016E9 E8468800 00FFFF9A EC76FFEE Ý.v$......FÒÕ..á^.&ú...Õ..á^.&ú. 000160
0107C726 125EC400 0BE9037C 00F47E83 FFEAE9FF E2E90375 00013000 0BE90000 ..Õ..=..u.Õã.Õõ..-¶.|.Õ..á^.&ú.. 000180
C80016CA C95F5F1F 0000E900 00880789 26004284 8B2AF476 680E5EC4 000EE900 .Õ..á^.kv¶*..B.&...|..Õ...^_èò..à 0001A0
50520000 00AE9 72 6A1076FF 1276FF02 08E90E46 88088E00 1F881E56 5700000E ...WV.|...Ä.F.Õ...v..v.jr.Ū...RP 0001C0
FF1276FF FC568vrA 46890856 88064688 00000289 9A006A00 6A016A00 6A012568 h%.j.j.j.j.......F..V..F*.V•.v.. 0001E0
```

```
Dump of file SATURN:[PCCOMMON.DUMP.DLL]DA-FIND.DLL;1 on 18-APR-1990 10:38:55.60
File ID (390,14,0)   End of file block 46 / Allocated 48

Virtual block number 4 (00000004), 512 (0200) bytes

 89085788 26064788 26FA5EC4 0000F846 C70000FF FF9AFA76 FFFC76FF 006A1076 v.j..v=.v*.....úF%..á^*&.G.&.W.. 000000
 FF1276FF 0023E903 7FF8463B 00520000 9A2AF446 83F846FF 0007E9F6 5689F446 F¶.V-Ö...F%.F¶*...R.;F%..Ö#..v.. 000020
 E9FFC9E9 0000000B 9A505200 0205F656 8BF4468B FF6A006A 01616800 CA681076 v.hò.ha.j.j..F¶.V-...RP.Ü...Öè.Ö 000040
 00ACE900 00FFFF9A 016A006A 656A006A 206A1076 FF1276FF 00B1E90C 4688019A ...F.ÖŸ..v..v.j j.jej.j......Ö¯. 000060
 006A0125 68505200 0002C79A 726A1076 FF1276FF 0069E9F2 4688F246 890A4688 .F..F·.F·Öi..v..v.jr.ú...RPhX.j. 000080
 01256850 52000002 E69A706A 1076FF12 76FF0062 E9000002 D99A006A 006A006A j.j.j..\...Öb..v..v.jp.!...RPhX. 0000A0
 6A012568 50520000 01EA9A6E 6A1076FF 1276FF00 0002F89A 006A006A 006A006A j.j.j.j..%....v..v.jn.ö...RPhX.j 0000C0
 00703DFF 8FE90375 006E3000 18E9001E E90021E9 000001FC 9A006A00 6A006A00 .j.j.j..=...Ö!.Ö..Ö..=n.u.Ö..=p. 0000E0
 5FE90375 00013000 13E90016 E90019E9 FFDFE9FF A1E90375 00723DFF 87E90375 u.Ö..=r.u.ÖÀ.ÖÖ.Ö..Ö..Ö..=..u.Ö_ 000100
 656800CA 681076FF 1276FF00 5EE90A46 8800CDE9 FFE7E9FF 3FE90375 00053DFF .=..u.Ö?.ÖÖ.Öë..F.Ö^..v..v.hò.hē 000120
 46890000 FFFF9A00 6A1076FF 1276FFFE 46890000 02689A00 6A006A00 6A006A01 .j.j.j.j..h....F±.v..v.j.......F 000140
 1276FF00 29E90000 03969A00 6A1076FF 1276FF07 8926FE46 8BFA5EC4 FC5689FA *.V=á^*.F±&...v..v.j......Ö)..v. 000160
 03750066 3DFF9AE9 03750065 3D0013E9 0016E900 19E90000 03C29A01 6A1076FF .v.j..ö...Ö..Ö..Ö..=e.u.Ö..=f.u. 000180
 FF1076FF 1276FF00 43E90000 FFFF9A01 6A1076FF 1276FF00 53E9FFE7 E9FFDAE9 ÖÖ.ÖÖ.ÖS..v..v.j......ÖC..v..v.. 0001A0
 4EE90375 00203D00 23E9002F E90000FF FF9A0676 FF0876FF 0A76FF0C 76FF0E76 v..v..v..v..v......Ö/.Ö#.= .u.ÖN 0001C0
 8A0000B8 FFBDE9FD D8E90375 00383DFE 71E90375 00303DFF C0E90375 00293DFF .=).u.Öå.=0.u.Öq±=;.u.ÖÀ»Ö§.j..¤ 0001E0

Dump of file SATURN:[PCCOMMON.DUMP.DLL]DA-FIND.DLL;1 on 18-APR-1990 10:38:55.60
File ID (390,14,0)   End of file block 46 / Allocated 48

Virtual block number 5 (00000005), 512 (0200) bytes

 C0010300 00000102 42000200 7A000100 68010300 100ECAC9 5F5E1F00 00E90000 ..Ö...^_èò.....h...z...B.......á 000000
 A5010300 07000101 75010300 7F000103 5A010300 7E000103 86010300 7C000100 ...|.......~...Z.......u.......Ê 000020
 6A010301 07000400 9C020300 1E000102 18010300 00000901 07000200 13000102 .......■.......................j 000040
 55000500 40000100 85010300 45000102 87010300 83000103 DF010300 1F000103 .......Ö...*...ñ...E...ç...M...U 000060
 E90E4688 088EFFFF 881E5657 00000CC8 00000000 F3000100 82010301 CF000100 ...ü.......µ....à...WV.|...Ä.F.Ö 000080
 0000BA00 01880156 E999F446 8BF44689 FFFF0187 9A0A76FF 0C76FF10 76FF013A :..v..v..v.......F¶.F¶.Öv.|..¤.. 0000A0
 6A1076FF 006A1DAE 682377FF 26F85EC4 000000F8 9A5016F8 46801076 FF014DE9 ÖM..v..F%.P.«...á^%&.w#hÜ.j..v.j 0000C0
 2705FA56 8BF8468B 50520002 05FA568B F8468B10 76FF016A 0000FFFF 9A016A00 .j......j..v..F%.V*...RP.F%.V*.' 0000E0
 FE468900 008800F6 E999F446 880007E9 03750000 3DF44689 0000FFFF 9A505200 .RP......F¶=..u.Ö...F¶.Ö-.|...F± 000100
 5688F846 8B006A00 6A37FF26 F85EC410 76FF2777 FF262977 FF26F85E C4FC4689 .F=á^%&.w)&.w'.v.á^%&.7j.j..F%.V 000120
 76FFF446 89FFFF00 009A5016 F6468050 16FC4680 FC76FFFE 76FF5052 002505FA *.X.RP.v±.v=.F=.P.F-.P......F¶.v 000140
 E900008A 00008800 0107C726 0A5EC400 9FE90000 BA0000B8 0000FFFF 9A006A10 .j......|..¤..Ö..á^.&ú...|..¤..Ö 000160
 6FE999F4 46880007 E9037500 003DF446 890000FF FF9A5016 F8468010 76FF008E ...v..F%.P......F¶=..u.Ö...F¶.Öo 000180
 FF0048E9 0000FFFF 9A37FF26 F85EC400 00FFFF9A 2777FF26 2977FF26 F85EC400 .á^%&.w)&.w'.....á^%&.7.....ÖH.. 0001A0
 7510013D 0028E900 37E90000 FFFF9A06 76FF0876 FF0A76FF 0C76FF0E 76FF1076 v..v..v..v..v..v......Ö7.Ö+.=..u 0001C0
 751DB030 FEC7E903 751DAD3D FF8EE903 75100430 FEB6E903 7510033D FED6E903 .Ö¤±=..u.ÖÑ±=..u.Ö..=Ù.u.Öú±=¯.u 0001E0

Dump of file SATURN:[PCCOMMON.DUMP.DLL]DA-FIND.DLL;1 on 18-APR-1990 10:38:55.60
File ID (390,14,0)   End of file block 46 / Allocated 48

Virtual block number 6 (00000006), 512 (0200) bytes

 08881E56 57000010 C8000CCA C95F5E1F 0000E900 008A0000 B8FFB8E9 FF6DE903 .Öm.Ö|.|..¤..Ö...^_èò..à...WV.|. 000000
 009CE9F0 46880006 E9037500 003DF046 890000FF FF9A5016 F2468000 6AD88E00 ..Äj..F·.P......FÞ=..u.Ö...FÞÖ.. 000020
 9AF276FF 000EE903 7500003D F0468900 00FFFF9A 5016FC46 8D286A36 6AF276FF .v·j6j+.F=.P......FÞ=..u.Ö...v·. 000040
 FF26FE77 FF26065E C4040646 83078926 F24688FC 5EC40072 E9F0468B 00000128 (....FÞÖr.á^=.F·&...F..á^.&.w±&. 000060
 26294789 260000B8 FC5EC408 C483FFFF 00109A50 52000205 FE5688FC 4688FC77 w=.F=.V±...RP......á.á^=|..&.G)& 000080
 2305FE56 8BFC4688 0A76FF25 478926FC 5EC4FE47 8B26065E C4020646 83274789 .G'.F..á^.&.G±á^=&.GX.v..F=.V±.# 0000A0
 C95F5E1F 0000E9F0 46880000 FFFF9AFC 76FFFE76 FF0A76FF 0000FFFF 9A505200 .RP......v..v±.v=......FÞÖ...^_è 0000C0
 000200E9 00040054 02030000 0002001E 00020161 00040234 0203000F 900006CA ò.......4...■...........T...Ö.¯. 0000E0
 02030000 0009018F 00020178 00050198 02030000 00070200 00020000 000300C9 è.......................x........ 000100
 02030195 000501BD 02030118 0004003C 02030186 000501D0 02030014 00030074 t........À.......<........§....... 000120
 0000000A 00040142 020300CE 00040004 02030039 0003011D 0203012B 00040242 B...+........9...À...ö...B...Ö... 000140
 16FC4680 1C76FF00 0007C726 065EC400 00EC46C7 D88EFFFF 881E5657 00001AC8 à...WV.|...ÄüF&..á^.&ú....v..F=. 000160
 800868F4 76FFF676 FF0000FF FF9A5016 F4468023 77FF26FC 5EC40000 FFFF9A50 P.....á^=&.w#.F¶.P......v-.v¶h.. 000180
 F84680F4 76FFF676 FF1C76FF 0052E903 7400167E 83F05689 EE468900 00FFFF9A ......FŸ.vÞ.~..t.ÖR..v..v-.v¶.F% 0001A0
 03750000 3DEA4689 FFFF0017 9A1E76FF 2076FF50 16EC4680 1276FF14 76FF5016 .P.v..v..F&.P.v .v.......Fò=..u. 0001C0
 00008800 0107C726 065EC400 0EE90375 00F87E83 0017E901 D5E9EA46 880009E9 Ö...FòÖ!.Ö...-%.u.Ö..á^.&ú...|.. 0001E0
```

```
Dump of file SATURN:[PCCOMMON.DUMP.DLL]DA-FIND.DLL;1 on 18-APR-1990 10:38:55.60
File ID (390,14,0)   End of file block 46 / Allocated 48

Virtual block number 7 (00000007), 512 (0200) bytes

 46890CC4 83FFFF00 009AEE76 FFF076FF 5016F846 805016EC 46800043 E901BBE9 ÕE.ÕC..F&.P.F%.P.vÞ.v¥......á..F 000000
 C726065E C40CJE.9 037500F8 7E830017 E9018FE9 EA468800 09E90375 000030EA õ=..u.Õ...Fõõ..Õ...-%.u.Õ..á^.&ú 000020
 C4E64689 E8468900 00B80789 26024789 26000088 0A5EC401 75E90001 B8000107 ...|..Õu.á^.|..&.G.&..|...FÕ.F|á 000040
 6A006A37 FF26125E C41A76FF 1C76FF1E 76FF2076 FF0033E9 0374013F 8326125E ^.&.7.t.Õ3..v .v..v..v.á^.&.7j.j 000060
 5EC400F1 E9EA4689 015F084E 9AEC76FF 006A0A76 FF0C76FF 5016FA46 80006A00 .j..F*.P.v..v.j..v$.N. ..FõÕþ.á^ 000080
 9302659A 37FF2612 5EC40045 E9037509 3F832612 5EC40051 E9037503 3F832612 .&.?.u.ÕQ.á^.&.?.u.ÕE.Ã^.&.7.e.. 0000A0
 F276FF00 6A006A37 FF26125E C41A76FF 1C76FF1E 76FF2076 FFF24689 02C48301 ..á..F .v .v..v..v.á^.&.7j.j..v 0000C0
 8326125E C40094E9 EA468901 0A084E9A EC76FF00 6A0A76FF 0C76FF50 16FA4680 .F*.P.v..v.j..v$.N.Õ..FõÕ..á^.&. 0000E0
 1A76FF1C 76FF1E76 FF2076FF 0013F246 C70005E9 0012F246 C70008E9 0374033F 7.t.Õ..úF ..Õ..úF ...v .v..v..v. 000100
 83EA4689 022A084E 9AEC76FF 016A5016 E6468050 16FA4680 186A006A 006A026A j.j.j.j..F*.P.Fl.Pj..v$.N.*..FÕ. 000120
 FF2076FF 0033E903 7515FA7E 83003CE9 0375E846 0BE64688 0047E903 7400EA7E -õ.t.ÕG..Fl.FÕu.Õ<..-*.u.Õ3..v . 000140
 FF0C76FF 5016FA46 8DF276FF E676FFE8 76FF37FF 26125EC4 1A76FF1C 76FF1E76 v..v..v.á^.&.7.vÕ.vl.v .F*.P.v.. 000160
 17E90020 E9EA4688 0009E903 7500EA7E 83EA4689 FFFF084E 9AEC76FF 006A0A76 v.j..v$.N....Fõ.-õ.u.Õ...FõÕ .Õ. 000180
 5E1F0000 E9000088 0006E900 00880001 07C72606 5EC4000E E9037415 FA7E8300 ..-*.t.Õ..á^.&ú...|..Õ..|..Õ...^ 0001A0
 00188800 33E9FE46 88FE4689 06468808 8E000888 1E565700 0002C800 1CCAC95F  èò..à...WV.|...Ã.F..F±.F±Õ3.|.. 0001C0
 4AE9002B B80050E9 00338800 56E90017 88005CE9 00168800 62E9001A B80068E9 Õh.|..Õb.|..Õ\.|..ÕV.|3.ÕP.|+.ÕJ 0001E0

Dump of file SATURN:[PCCOMMON.DUMP.DLL]DA-FIND.DLL;1 on 18-APR-1990 10:38:55.60
File ID (390,14,0)   End of file block 46 / Allocated 48

Virtual block number 8 (00000008), 512 (0200) bytes

 FF2E93C0 03FFECE9 03760013 30000220 003BE900 3EE90000 B80044E9 00188800 .|..ÕD.|..Õ>.Õ;.-..*..v.Õ$..á... 000000
 A702A702 A702A702 A7029802 A102A702 A7028F02 89028302 A702A702 7002C3A7 Ìú.).Ì.Ì.......Ì.Ì.À...Ì.Ì.Ì.Ì.Ì 000020
 E90E4688 D88E0260 881E5657 0000EEC8 C8C95F5E 1F029502 A702A702 A702A702 .Ì.Ì.Ì.Ì....^_èúàY..WV.|m..Ã.F.Õ 000040
 5EC4AE56 89AC4689 02578826 078826F8 5EC4FA56 89F84689 08568806 468804F8 «..F..V..F%.V¯á^%&..&.W..F¯.VÚá^ 000060
 FFFF9AF8 76FFFA76 FF006A10 76FF1276 FFFE5689 FC468916 57882614 478826F8 %&.G.&.W..F=.V±.v..v.j..v*.v%... 000080
 68505200 0003799A 00966810 76FF1276 FF000FE9 03750008 7F8326F8 5EC40000 ..á^%&....u.ÕÕ..v..v.h...y...RPh 0000A0
 6A505200 0003909A 00966810 76FF1276 FF000003 A29A006A 006A006A 006A0125 %.j.j.j.j..À....v..v.h.......RPj 0000C0
 6A006A00 6A006A01 25685052 00000380 9A008C68 1076FF12 76FF0000 03899A00 ..¿....v..v.h... ...RPh%.j.j.j.j 0000E0
 1276FF00 0003F09A ^006A5052 000003C7 9A008C68 1076FF12 76FF0000 03099A00 ..Ì....v..v.h...ú...RPj..Þ....v. 000100
 1276FF00 0004109A 006A006A 006A006A 01256850 52000003 E79A0084 681076FF .v.hÇ..Õ...RPh%.j.j.j.j.......v. 000120
 041E9A00 A0681076 FF1276FF 00000427 9A006A50 52000003 FE9A0084 6 1076FF .v.hÇ..±...RPj..'....v..v.h..... 000140
 04389A00 A0681076 FF1276FF 0000044A 9A006A00 6A006A00 6A012568 5C 20000 ..RPh%.j.j.j.j..J....v..v.h...8. 000160
 25685052 00000458 9A009668 1076FF12 76FF000C E9000004 619A006A 50520000 ..RPj..@...ÕÉ..v..v.h...X...RPh% 000180
 016A5052 0000046F 9A009668 1076FF12 76FF0000 04819A00 6A006A01 6A006A01 .j.j.j.j.......v..v.h...o...RPj. 0001A0
 006A006A 006A006A 01256850 52000004 8F9A008C 681076FF 1276FF00 0004989A ......v..v.h.......RPh%.j.j.j.j. 0001C0
 FF1276FF 000004CF 9A016A50 52000004 A69A008C 681076FF 1276FF00 0004889A .|....v..v.h...Ì...RPj..ü....v.. 0001E0

Dump of file SATURN:[PCCOMMON.DUMP.DLL]DA-FIND.DLL;1 on 18-APR-1990 10:38:55.60
File ID (390,14,0)   End of file block 46 / Allocated 48

Virtual block number 9 (00000009), 512 (0200) bytes

 FF1276FF 000004EF 9A006A00 6A006A00 6A012568 50520000 04C69A00 84681076 v.hÇ..ó...RPh%.j.j.j.j..ÿ....v.. 000000
 0004FD9A 00A06810 76FF1276 FF000005 069A016A 50520000 040D9A00 8C681076 v.h...Ì...RPj.......v..v.h...*.. 000020
 0000419A 00A06810 76FF1276 FF0000FF FF9A006A 006A006A 006A0125 68505200 .RPh%.j.j.j.j.......v..v.h...A.. 000040
 86800677 FF26F85E C40055E9 03750006 7F8326F8 5EC40000 FFFF9A01 6A505200 .RPj.......á^%&....u.ÕU.á^%&.W... 000060
 F9880003 E901E688 0006E903 7500087F 8326F85E C40000FF FF9A016A 5016FF5C \..Pj......á^%&....u.Õ..|l.Õ..|* 000080
 76FF1276 FF10C483 FFFF0046 9A5016FF 16868001 FA681E50 16FF5C86 80501E01 ..P..\..P.h*.......P.F....á..v..v 0000A0
 8826FC5E C4005CE9 03750247 08260788 26FC5EC4 0000FFFF 9A5016FF 16868010 ......P.....á^*&..&.G.u.Õ\.á^*&. 0000C0
 50168446 8037FF26 0277FF26 FC5EC4AC 76FFAE76 FFF45689 F2468902 57882607 .&.W..F .V¶.vÚ.v¯á^*&.w.&.7.F..P 0000E0
 68008268 1076FF12 76FF0273 E90000BA 00048800 09E90375 00003000 00FFFF9A .....=..u.Õ..|..¤..Õs..v..v.h..h 000100
 0094E90A 46880246 E9FF95E9 04FC4683 000005F8 9A501684 4680FF6A 006A0161 ■.j.j..F..P.«....F=.Õ..ÕF..F.Õ.. 000120
 89000006 219A006A 006A006A 006A0165 68008268 1076FF12 76FF0072 E90C4688 .F.Õr..v..v.h..he.j.j.j.j..l.... 000140
 50168046 80505242 CA830000 00D22BF6 46880168 680A76FF 1076FF12 76FFF646 F-.v..v..v.hh..F-+0....ÕBRP.F¯.P 000160
 1076FF12 76FF0031 E90000FF FF9A5016 8046806E 6A1076FF 1276FF00 00FFFF9A ......v..v.jn.F¯.P.....Õ1..v..v. 000180
 FF86E903 75000130 0013E900 16E90019 E90000FF FF9A016A 006A466A 006A206A j j.jFj.j......Õ..Õ..Õ..=..u.Õ.. 0001A0
 E9FFEFE9 FF64E903 75008230 0008E900 0EE90011 E9FFE7E9 FFD2E903 75000530 =..u.Õ0.ÕÕ.Õ..Õ..Õ..=..u.Õd.Õÿ.Õ 0001C0
 FF1276FF 0000FFFF 9A5016B0 4680426A 6E6A1076 FF1276FF 0125E90A 4688019E ...F.Õ%..v..v.jnjB.F¯.P......v.. 0001E0
```

```
Dump of file SATURN:[PCCOMMON.DUMP.DLL]DA-FIND.DLL;1 on 18-APR-1990 10:38:55.60
File ID (390,14,0)   End of file block 46 / Allocated 48

Virtual block number 10 (0000000A), 512 (0200) bytes

9689FF12 868· 657 88261447 8826F85E C4FA5689 F8468900 00FFFF9A 006A1076 v.j.......F%.V*6^%&.G.&.W....... 000000
26FF129E C404FF12 86830005 E9078926 02478926 00008818 5FC426F8 5EC4FF14 ..6^%&6_.|..&.G.&..Ö.......6...& 000020
37FF2602 77FF26FF 129EC437 FF260277 FF26F85E C40071E9 03750247 08260788 ..&.G.u.Öq.6^%&.w.&.76...&.w.&.7 000040
B0468028 6AU10EE9 0000BA00 04880009 E9037500 00300000 05A19A50 16844680 .F..P.À...=..u.Ö..|..¤..Ö..j(.F¯ 000060
88260788 26FF129E C40022E9 03740000 300AC483 055600C6 9A501684 46805016 .P.F..P.6.V..6.=..t.Ö".6...&..&. 000080
26F85EC4 FF7AE900 03E90257 89260789 26185FC4 26F85EC4 F45689F2 46890257 W..F .V¶6^%&6_.&..&.W.Ö..Öz.6^%& 0000A0
1276FF00 00E90000 FFFF9A02 6A016A00 6A000EE9 03740247 08260788 26185FC4 6_.&..&.G.t.Ö¯..j.j.j......Ö...v. 0000C0
00BA0000 8804C483 07CC0830 9A1076FF 1276FF00 33E90000 FFFF9A01 6A1076FF .v.j......Ö3..v..v..0.ë..6.|..¤. 0000E0
FFE7E9FF D0E90375 005030FE D3E90375 00463000 13E90016 E90019E9 0085E900 .Ö..Ö..Ö..Ö..=F.u.Öf±=P.u.ÖÀ.ÖÖ. 000100
1276FF00 43E9004F E90000BA 00008804 C4830136 08309A10 76FF1276 FF0050E9 Öl..v..v..0.6..6.|..¤..Öo.ÖC..v. 000120
00203000 23E9002F E90000FF FF9A0676 FF0876FF 0A76FF0C 76FF0E76 FF1076FF .v..v..v..v..v..v......Ö/.Ö#.= . 000140
FFBDE9FA E5E90375 003830FD C5E90375 003030FF 86E90375 00293DFE 7DE90375 u.Ö)±=).u.ÖÅ.=0.u.Öé»=;.u.Öl*Ö§. 000160
FF0876FF 088E02F8 881E5657 000000C8 000ECAC9 5F5E1F00 00E90000 8A000088 |..¤..Ö...^_èò..à...WV.|%..À.v.. 000180
07C7260E 5EC4088E 0838881E 56570001 5EC8C8C9 5F5E1F00 0007869A 156A0676 v.j.......^¯èùà^..WV.|8..À6^.&ú. 0001A0
46801E76 FF2076FF 0032E903 7401187E 83078926 02478926 0000880A 5EC40000 ..6^.|..&.G.&...-..t.Ö2..v .v..F 0001C0
468D8846 898A4689 0000888E 898C46C7 0005E903 75000030 000008C1 9A501684 Ç.P.è...=..u.Ö..úF¥¿.|...F¤.F|.F 0001E0

Dump of file SATURN:[PCCOMMON.DUMP.DLL]DA-FIND.DLL;1 on 18-APR-1990 10:38:55.60
File ID (390,14,0)   End of file block 46 / Allocated 48

Virtual block number 11 (0000000B), 512 (0200) bytes

5016AE46 8D1E76FF 2076FF00 21E90374 16460814 468801A0 E9D6568C D44689B4 Ç.FÅ.VøÖ...F..F.t.Öl..v .v..FÛ.P 000000
FF2076FF 013BE906 468805B7 E9000A88 0006E903 75000030 8C468900 00FFFF9A ......F¥=..u.Ö..|..Öñ..F.Ö;..v . 000020
06E91656 88144688 0009E903 75164608 144688 1E 76FF2076 FF0000FF FF9A1E76 v.......v .v..F..F.u.Ö...F..V.Ö. 000040
06E90375 0000308C 46890000 09609A50 16044680 1276FF50 52805688 AE468800 ..FÛ.V¯RP.v..FÅ.P.`....F¥=..u.Ö. 000060
46081446 881E76FF 2076FF01 04E90000 FFFF9A1E 76FF2076 FF0566E9 000A8800 .|..Öf..v .v......Ö...v .v..F..F 000080
9A501604 46801276 FF505280 5688AE46 880006E9 16568814 46880009 E9037516 .u.Ö...F..V.Ö...FÛ.V¯RP.v..FÅ.P. 0000A0
46881E76 FF2076FF 00C1E905 18E9000A 880006E9 03750000 308C4689 0000FFFF .....F¥=..u.Ö..|..Ö..Öè..v .v..F 0000C0
D4468D12 76FF5052 805688AE 46880006 E9165688 14468800 09E90375 16460814 ..F.u.Ö...F..V.Ö...FÛ.V¯RP.v..FÅ 0000E0
76FF2076 FF007EE9 040SE900 0A880006 E9037500 003D8C46 890000FF FF9A5016 .P......F¥=..u.Ö..|..Öl.Ö~..v .v 000100
0006E916 56881446 880009E9 03751646 08144688 1E76FF20 76FF0000 08E39A1E ..D....v .v..F..F.u.Ö...F..V.Ö.. 000120
0006E903 7500003D 8C468900 0009A39A 50160446 8D1276FF 50528056 88AE4688 .FÛ.V¯RP.v..FÅ.P.É....F¥=..u.Ö.. 000140
013DFE8E E90375C0 080022E9 0025E900 00092E9A 1E76FF20 76FF0487 E9000A88 |..Ö...v .v......ÖX.Ö"..àu.Ö/±=. 000160
FF1E76FF 2076FF00 00E9FF85 E9037500 0330FF4A E9037500 0230FF0F E9037500 .u.Ö..=..u.ÖJ.=..u.Ö..Ö...v .v.. 000180
89EC4689 D6568804 46880A56 89084689 2056881E 46880000 FFFF9AD4 76FFD676 vø.vÅ......F..V .FÅ.VÖ.FÅ.Vø.F&. 0001A0
F8468D1C 76FFE046 89084688 DE468918 4688F256 89F04689 0C56880A 4688EE56 VŸ.F..V..FÞ.V·.F..FB.F..FÅ.v..F% 0001C0
0868CE76 FFD076FF 00000033 9A5016CE 46802377 FF26F85E C4000000 229A5016 .P."...6^%&.w#.Fö.P.3....vÅ.vöh. 0001E0

Dump of file SATURN:[PCCOMMON.DUMP.DLL]DA-FIND.DLL;1 on 18-APR-1990 10:38:55.60
File ID (390,14,0)   End of file block 46 / Allocated 48

Virtual block number 12 (0000000C), 512 (0200) bytes

068EFFFF 68079668 C076FFC2 76FFC076 FFC276FF C25689C0 46890000 03599A80 ..Y....Få.Vö.vö.vå.vö.våh..h.... 000000
74C84608 C64688C8 5689C646 890000FF FF9A5016 D8468033 6A020036 FF261A9A ..&.6..j3.FÅ.P......Fö.Vå.Fö.Fåt 000020
FFC876FF 1C76FF03 94E9CA46 88CC5689 CA468900 00FFFF9A 006A006A ^015E903 .Ö..j.j.......Fò.Vä.FòÖ...v..vå. 000040
FF0000FF FF9A5052 00000AA2 9A6E6AC6 76FFC876 FF016A00 6A0000FF ⱶ 9AC676 vö.....j.j..vå.vöjn.À...RP...... 000060
6A006A00 6A006A01 24680096 68C676FF C876FFB2 46890000 FFFF9AC6 76ⱶFC876 vå.vö......Fý.vå.vöh..h$.j.j.j.j 000080
087A9A00 6A006A00 6A006A01 2468008C 68C676FF C876FFBE 46890000 085E9A00 ..^....Ff.vå.vöh..h$.j.j.j.j..z. 0000A0
46890000 08969A00 6A006A00 6A006A01 246800A0 68C676FF C876FFD2 46890000 ...F®.vå.vöh..h$.j.j.j.j.......F 0000C0
824688AC 46890000 05CC9A00 6A006A00 6A006A01 246800B4 68C676FF C876FFC4 6.vå.vöhÇ.h$.j.j.j.j..ä....F¯.Fý 0000E0
8800000B DD9AD476 FFD676FF 1E76FF20 76FF0000 08CC9AC6 76FFC876 FF02D7E9 Öø..vå.vö.ä....v .v..vø.vå.Ī...| 000100
00FFFF9A D476FFD6 76FF1E76 FF2076FF 0000FFFF 9AC676FF C876FF02 C8E9000B ..Öå..vå.vö......v .v..vø.vå.... 000120
66E90374 00C47E83 006FE903 7500BE7E 83029EE9 00008800 1507C726 0E5EC400 .6^.&ú...|..Ö...-f.u.Öo..~6.t.Öf 000140
76FF1676 FF0000FF FF9A5016 FE46801C 76FF0000 0A839A50 16F84680 1C76FF00 ..v..F%.P......v..F±.P......v..v 000160
FC468D50 52000205 FA5688F8 4688006A 006A37FF 260277FF 260A5EC4 1876FF14 ..v.6^.&.w.&.7j.j..F%.V*...RP.F• 000180
9AFC76FF 0000FFFF 9A016AFC 76FF8C46 891AC483 0000FFFF 9AFE76FF 356A5016 .PjS.v±......6..F¥.v=j.......v•. 0001A0
C41E76FF 2076FFA6 4689A846 890000B8 014BE903 7500C47E 8301EEE9 0000FFFF ....ÖY..-6.u.ÖK.|...F`.FÎ.v .v.6 0001C0
33E9AA46 88006CE9 03740000 300000FF FF9A5016 AA468037 FF260277 FF260A5E ^.&.w.&.7.F`.P.....=..t.Öl..F`Ö3 0001E0
```

```
Dump of file SATURN:[PCCOMMON.DUMP.DLL]DA-FIND.DLL;1 on 18-APR-1990 10:38:55.60
File ID (390,14,0)   End of file block 46 / Allocated 48

Virtual block number 13 (00000000), 512 (0200) bytes

46E90103 A446C700 4EE90102 A446C700 56E90101 A446C700 5EE90100 A446C700 .úFÉ..Õ^.úFÉ..ÕV.úFÉ..ÕN.úFÉ..ÕF 000000
75000330 FFC5F903 75000230 0033E900 36E90105 A446C700 3EE90104 A446C700 .úFÉ..Õ>.úFÉ..Õ6.Õ3.=..u.Õé.=..u 000020
75000930 FFCDE903 75000730 FFCDE903 75000630 FFCDE903 75000530 FFC5E903 .Õé.=..u.Õé.=..u.Õë.=..u.Õë.=..u 000040
FEA28680 010068A4 76FF0200 36FF261A 9A068EA6 76FFA876 FF0000E9 FFADE903 .ÕÙ.Õ...v´.v¦....&.6...vÉh....Å± 000060
0022E903 7500003D 0000FFFF 9A5016FE A2868D1E 76FF2076 FF0000FF FF9A5016 .P......v .v...Å±.P.....=..u.Õ". 000080
E9000088 000000AE 9AC676FF C876FF00 000DA39A D476FFD6 76FF1E76 FF2076FF .v .v..v¤.vå.É....vå.vó.0...|..Õ 0000A0
0375008C 7E83BC46 890000FF FF9A37FF 260277FF 260A5EC4 1E76FF20 76FF0128 +..v .v.á^.&.w.&.7......F¥.-¥.u. 0000C0
FFD676FF 1E76FF20 76FF0022 E9037500 00300000 FFFF9A1E 76FF2076 FF0000E9 Õ...v .v......=..u.Õ"..v .v..v¤. 0000E0
7500027E 83009AE9 0005E900 0AB80000 08AA9AC6 76FFC876 FF00000B BB9AD476 vå.É....vå.vó.¯...|..Õf.Õ...~@.u 000100
03750000 3D00000E 249A016A 37FF2602 77FF260A 5EC41E76 FF2076FF 0044E903 .ÕD..v .v.á^.&.w.&.7j..$...=..u. 000120
B800000E 489AC676 FFC876FF 00000E40 9AD476FF D676FF1E 76FF2076 FF0022E9 Õ"..v .v..v¤.vå.ã....vå.vó.K...| 000140
FF260277 FF260A5E C41E76FF 2076FF00 44E90375 00AC7E83 004DE900 88E90000 ..Õ..ÕM..-¯.u.ÕD..v .v.á^.&.w.&. 000160
9AD476FF D676FF1E 76FF2076 FF0022E9 03750000 3D8C4689 0000FFFF 9A006A37 7j.......F¥=..u.Õ"..v .v..v¤.vå. 000180
00000058 9AC67 FF C876FF00 38E9000A B800000E 5C9AC676 FFC876FF 00000E60 ¤....vå.vó.\...|..Õ8..vå.vó.X... 0001A0
E9037500 1530C '3 E90016E9 00008800 00004D9A D476FFD6 76FF1E76 FF2076FF .v .v..v¤.vå.M...|..Õ..Õ..=..u.Õ 0001C0
CF010301 6100040C 17020300 2E1CCAC9 5F5E1FFD 62E9FD19 E90375FF FF30FD43 C»=..u.Õ.»Õb».^_èò.........¤...ú 0001E0

Dump of file SATURN:[PCCOMMON.DUMP.DLL]DA-FIND.DLL;1 on 18-APR-1990 10:38:55.60
File ID (390,14,0)   End of file block 46 / Allocated 48

Virtual block number 14 (0000000E), 512 (0200) bytes

42010300 7E000108 45010300 7C000108 26010300 00000100 76000200 7A00010A ...z...v.......&...|...E...~...B 000000
06020300 86000106 33010300 0000030A B9000200 7200030C 8F020300 7F000108 ...........r...¿.......3........ 000020
82010300 8A000107 76010300 07000100 FB010300 87000106 98010301 D6000707 ...¤...........«.......v........ 000040
00020300 10000105 68010300 F400040A 94020300 00000500 B9000200 08000103 .......¿..........¶...h......... 000060
56000201 E7000700 73020300 00000707 2A000200 13000108 14010300 8000030A ..................•.......s...Õ...V 000080
A5010300 1E000103 3E010300 90000100 23010300 8C000309 C2020300 00000908 .......ò.......#.......>.......É 0000A0
34020301 1800040C 0A020300 99000300 07020301 07000408 03020300 1F000106 ................¤...............4 0000C0
8A020300 3D000103 68010300 A9000309 F1020300 B3000107 F3010300 22000300 ...".........Þ.........k...*.... 0000E0
27020300 4D000108 18010302 F000030A 8C000500 45000106 48010300 2E000300 .......K...E...¥...Þ.......H...' 000100
46020300 BF00040C 48020300 46000308 84020301 3C00040C 58020301 A9000605 .......X...<.......F...H...€...F 000120
F0020300 F300010A E9010300 5A000309 12020301 5100040C 60020301 BB00060A ...E...'...Q.......Z...Õ...¤...Þ 000140
FF0876FF D88EFFFF B81E5657 00002CCB 00000000 00000000 00000000 66000300 ...f............à...WV.|...Á.v.. 000160
FF000000 3B9A5016 D4468D01 6A006AFC 5689FA46 890000FF FF9A006A 056A0676 v.j.j.......F•.V•j.j..Få.P.;.... 000180
4689E846 2BF04688 FE4689E4 462BEC46 880000FF FF9A5016 E4468D06 76FF0876 v..v..FÕ.P......F$+FÕ.F±.FÞ+FÕ.F 0001A0
0876FFF4 4689F8D1 C22B99F6 462BE046 88F84689 F8D1C228 99FE4628 DC468BF6 -.FÉ+F±.+òI½.F½.FÅ+F-.+òI½.F¶.v. 0001C0
000490CB C95F5E1F 0000FFFF 9A026A00 6A006AF4 76FFF876 FF036A00 6A0676FF .v.j.j..v½.v¶j.j.j.......^_èù... 0001E0

Dump of file SATURN:[PCCOMMON.DUMP.DLL]DA-FIND.DLL;1 on 18-APR-1990 10:38:55.60
File ID (390,14,0)   End of file block 46 / Allocated 48

Virtual block number 15 (0000000F), 512 (0200) bytes

00000009 00080002 001A0001 00280103 00190001 00170103 00080001 00840103 ..................+............. 000000
0676FF08 76FF0676 FF0876FF 000007C7 260E5EC4 088EFFFF B81E5657 000010C8 à...WV.|...Áá^.&ú....v..v..v..v. 000020
5689F646 890000FF FF9A006A 006A04B0 68020036 FF261A9C 068EFFFF 68FFFF68 h..h......&.6..h¯.j.j.......F-.V 000040
F0E9FA46 8BFC5689 FA468900 00FFFF9A 006A006A 0015E903 74F8460B F6468BF8 ½.F-.F½t.Õ..j.j.......F•.V•.F•ÕÞ 000060
6A006A00 6A012468 046A68F6 76FFF876 FFF24689 0000FFFF 9AF676FF F876FF00 ..v½.v-......F·.v½.v-hj.h$.j.j.j 000080
9A006A00 6A006A00 6A012468 045668F6 76FFF876 FFF04689 000000A0 9A006A00 .j.......FÞ.v½.v-hV.h$.j.j.j.j.. 0000A0
0000FFFF 9A006A00 6A006A00 6A012468 046068F6 76FFF876 FFF44689 0000008C ¥....F¶.v½.v-h'.h$.j.j.j....... 0000C0
0014E903 7500F47E 830042E9 000007C7 260E5EC4 0008E903 7500F07E 83FE4689 .F±.-Þ.u.Õ..á^.&ú...Õ8..-¶.u.Õ.. 0000E0
0E5EC400 08E90375 00F47E83 0025E900 0207C726 0E5EC400 08E90375 00FE7E83 .-±.u.Õ..á^.&ú...ÕX..-¶.u.Õ..á^. 000100
9AF676FF F876FF00 0307C726 0E5EC400 08E90375 00FE7E83 0011E900 0107C726 &ú...Õ...-±.u.Õ..á^.&ú....v½.v-. 000120
0008E900 0007C726 0A5EC400 16E90001 07C7260A 5EC40016 E9F24688 0000FFFF .....F·Õ..á^.&ú...Õ..á^.&ú...Õ.. 000140
0008881E 56570000 00C8CBC9 5F5E1F00 00E90000 B8FFEAE9 FFE2E903 75000130 =..u.Õã.Õò.|..Õ...^_èùà...WV.|.. 000160
9A046A68 1076FF12 76FF04C4 83FFFF00 009A1076 FF1276FF 014DE90E 468BD88E .Ä.F.ÕM..v..v.......¯á..v..v.hj.. 000180
B80096E9 0C468B01 3FE90000 01C19A00 6A006A01 6A006A01 25685052 000001AF É...RPh%.j.j.j.j..è...Õ?..F.Õ... 0001A0
006A006A 006A006A 01256850 52000001 D29A046A 681076FF 1276FF00 6CE90A46 F.Õl..v..v.hj..@...RPh%.j.j.j.j. 0001C0
6A006A00 6A012568 53520000 01F29A04 60681076 FF1276FF 0064E900 0001E49A .Õ...Õd..v..v.h'..·...RPh%.j.j.j 0001E0
```

```
Dump of file SATURN:[PCCOMMON.DUMP.DLL]DA-FIND.DLL;1 on 18-APR-1990 10:38:55.60
File ID (390,14,0)   End of file block 46 / Allocated 48

Virtual block number 16 (00000010), 512 (0200) bytes

 6A006A00 6A012568 50520000 FFFF9A04 56681076 FF1276FF 00000204 9A006A00 .j.......v..v.hV......RPhX.j.j.j 000000
 84E90375 046030FF 8CE90375 04563000 1BE9001E E90021E9 0000FFFF 9A006A00 .j......Ōl.Ō..Ō..=V.u.Ō..=`.u.Ō. 000020
 FFEFE9FF 62E90375 00013000 0BE9000E E90011E9 FFDFE9FF 9FE90375 046A30FF .=j.u.Ō..ŌŌ.Ō..Ō..Ō..=..u.Ōb.Ōy. 000040
 6A1076FF 12.6FF00 29E90000 02629A00 6A1076FF 1276FF00 26E90A46 8B0095E9 Ō...F.Ō&..v..v.j..b...Ō)..v..v.j 000060
 E9FFDAE9 037503FC 30FFD2E9 037503F2 300013E9 0016E900 19E90000 FFFF9A01 ......Ō..Ō..Ō..=·.u.Ō@.=•.u.ŌŌ.Ō 000080
 76FF0E76 FF1076FF 1276FF00 43E90000 02529A01 6A1076FF 1276FF00 53E9FFE7 Ō.ŌS..v..v.j..R...ŌC..v..v..v..v 0000A0
 002930FF 86E90375 00203000 23E9002F E90000FF FF9A0676 FF0876FF 0A76FF0C ..v..v..v......Ō/.Ō#.= .u.Ō..=). 0000C0
 00E90000 8A0000B8 FF8DE9FE 93E90375 003B30FE CCE90375 003030FF C0E90375 u.Ōà.=0.u.Ōä±=;.u.Ō.±Ō§.|..ɑ..Ō. 0000E0
 7E000102 8E010300 7C000100 68010300 7A000100 37010300 000ECAC9 5F5E1F00 ..^_èb.....7...z...h...|.......~ 000100
 00000500 21000200 00000401 71000200 07000101 20010300 7F000100 84010300 ...........^........g.......!.... 000120
 45000101 92010300 83000102 A8010300 00000901 5E000200 13000101 80010300 ......................•.......E 000140
 00000000 00000000 00000000 00000000 F3000100 51010301 56000500 24000500 ...$...V...Q...µ................ 000160
 00000000 00000000 00000800 02000200 01CB0001 B81F0200 3E89D88E FFFFB81E .|...Ä.>...|..ù................. 000180
 8ED88CFE 880A76C5 1EDE8807 88EC8855 00000000 00000000 00000000 00000000 ................U.£.■.B.év..±.Ä. 0001A0
 88F388A4 F3C913A5 F3E90149 A4027401 A8C78806 7EC4D1F7 AEF2FFFF 89C033C0 à3à¿..ÚK1á-..ü´.t.Ė11ŌµĖ.èµĖ.µ. 0001C0
 5EC4FE56 8CFC4689 0E468DFA 568CF846 89EC4680 56570000 16C8C850 C28C1FFA •..Ō]ùà...WV.F£.F½.V•.F..F•.V±á^ 0001E0

Dump of file SATURN:[PCCOMMON.DUMP.DLL]DA-FIND.DLL;1 on 18-APR-1990 10:38:55.60
File ID (390,14,0)   End of file block 46 / Allocated 48

Virtual block number 17 (00000011), 512 (0200) bytes

 FF0447C7 26025789 26078926 08578926 06478926 08568806 4688420A 47C626F8 ½&6G.B.F..V.&.G.&.W.&..&.W.&ùG.. 000000
 1278044F FF26F85E C4F0880C C48300B8 02949A53 060A76FF 0C76FFFC 76FF167F ...v•.v..v..S...£..á..Þá^½&.O.x. 000020
 06C483FF FF011E9A 006A53FA 76FF900F E8058826 02478E26 07FF263F 8826C02A •à&.?&..&.G.&..$...v•Sj.......á. 000040
 26248A20 865AB341 873EE30E 4E880A7E C40676C5 1E5657EC 8855C8C9 5F5EC688 .6^ èùU.&WV.év.á~..N.D>ñA•ZŘ .$& 000060
 C6020277 C33A0672 C73AE602 0277E33A 0672E73A 47461C74 C00A2074 E40A058A ...Ōt .ât.FG:Ōr.:Ōw..İ:ür.:üw..ó 000080
 08C8CB5D E5885F5E 1FC18801 F7494902 72000089 0974E03A C93307E2 0875E03A :Âu.ãæ3è:Ât.¿..r.11%1.è.^ .İ]ùà. 0000A0
 03E001C8 88F9˜700 0C899906 5A2DC388 FA4689E4 2A08478A 26085EC4 56570000 ..WVá^.&.G.•Ō.F•.û-Z..¿..Ŝ•.àIÄ. 0000C0
 88200A4F 8026 ˋ5E C40F7440 0A47F626 0774830A 47F626F8 4689124E 05E0D1C1 èIÄ.N..F½&-G..t.&-G.ɑt.á^.&.O. ¡ 0000E0
 802690E2 E8000004 47C72620 0A4F8026 0E74010A 47F62608 5EC49001 2BE9FFFF ..Ō+..á^.&-G..t.&.O. ŹùG...Ŝã.&. 000100
 99065A2D C3884C75 0C0A47F6 26FC7689 F0880447 8926C028 EF0A6780 26020A4F O..&.g.ÿ+à&.G..Þ.v=&-G..uL.û-Z.. 000120
 087E810E 7401C70A 7E810775 0666087E 81377501 124E87F6 060868F9 F7000C89 ¿..%•kÄ.-.N..u7.-.f.u..-.ú.t..-. 000140
 0876FF0A 76FF0C75 C00802C4 83023A10 AC9AFA76 FF0F75FF FF0A7E81 16750672 r.u..-...u..v•.ˉ.:..á..âu..v..v. 000160
 87F60608 68F9F700 0C899906 5A2DC388 1575080A 47F62608 5EC404C4 830C51E8 ŌO..á.á^.&-G..u..û-Z..¿..%•kÄ.-. 000180
 88025789 26078926 40085788 26064788 26067728 26378826 085E8867 7401124E N..tg.^.&.7&+w.&.G.&.W.ɑ&..&.W.. 0001A0
 8908C483 025B0EFC 9AFA76FF 0677FF26 5256167E F6080447 89264802 458BF87E -½.E.H&.G..-~.VR&.W..v•.=.X..á.. 0001C0
 085EC408 C483027B 0EBE9A53 006A006A 026A0F74 20185F87 F6FA5E88 19EBFC46 F=Ŝ..^•-._. t.j.j.j.S./.(..á.á^. 0001E0

Dump of file SATURN:[PCCOMMON.DUMP.DLL]DA-FIND.DLL;1 on 18-APR-1990 10:38:55.60
File ID (390,14,0)   End of file block 46 / Allocated 48

Virtual block number 18 (00000012), 512 (0200) bytes

 08C48300 900EFC9A FA76FF50 1606468D 5600018E 17E80788 2606468A 065FC426 &á_..F.&..Ŝ./..V.F..P.v•.•....á. 000000
 88010110 D09A000A 88EC8855 C8C95F5E E42A0646 8AFECCE9 0374FC76 39FC4689 .F•9v=t.Ōä±.F.•Ō^_èùU.£|...Ä.1.| 000020
 891882A3 08568806 46881B9E 16891B9C A3105688 0E468818 AE1E8C18 ACA31882 ý.Ė¯...Ū..F..V.Ė¯......F..V.Ė... 000040
 0118AA06 C70308E9 037425F6 7E800380 E900001B A606C700 001BA806 C71B8416 ...ú.ˉ...ú.Ī...Ō...—%t.Ō..ú.ˉ.. 000060
 06C7189A A31880A3 1886A318 A0A318A2 A3188AA3 18A4A318 88A3188C A3C02800 .+àĖ..Ė..ĖĖ.Ė..ĖÄ.Ė..Ė..Ė..Ė..ú. 000080
 3F80260A 5E88903E E800301D 1206C70A 46FF4975 30017F80 260A5EC4 00201012 .. .á^.&...Ou|.F.ú...0.Ŝ>..^.&.7 0000A0
 A006FF1A 75001B8C 3E830E75 203F8026 9028E800 001BA006 C71B8C06 FF00752B +u.....ú.....$(.&.? u..>...u.... 0000C0
 078A260A 5E880A46 FF189A06 FFC7752D 3F80260A 5EC400E8 1B8006FF 9014E818 .Ŝ......Ŝ.á^.&.?-uú.....F..^.&.. 0000E0
 468908C4 8308C7E8 0E1B8068 1E0A76FF 0C76FFD0 75C00B02 C4830978 E80E5098 .P.Ōx..á..áuĪ.v..v..h¯..Ōú..á..F 000100
 3E830074 00189A3E 831880A3 D8F71880 A1189A06 FF0C7D00 18803E83 0C56890A ..V..>¯..).....Ä¯.%ÄĖ¯..>...t..> 000120
 1E0A76FF 060A46FF 1BA206FF 20752E3F 80260A5E C400201D 1206C706 75301012 ..Ou.ú... .á^.&.?.u-..Ä..F...v.. 000140
 A20EFF00 011BAA06 C70A7D00 18AA3E83 0C56890A 468908C4 83087BE8 0E18AA68 h¯..Ō(..á..F..V..>ˉ..).ú.ˉ.....Ä 000160
 188A06C7 0675006C 302B7400 68304074 004E3030 74004630 98078A26 0A5EC418 .á^.&...=F.t==N.tɑ=h.t+=(.u.ú... 000180
 4EE91C75 003F8026 0A5EC40A 46FF0375 4C3F8026 0A5EC409 75001B8A 3E830002 ...>...u.á^.&.?Lu..F.á^.&.?.u.ŌN 0001A0
 46899807 8A26C8EB 00081B8A 06C7D0EB 00101B8A 06C7D8EB 00011B8A 06C79002 ..ú.....ŜÄú.....ŜÄú.....Ŝà&....F 0001C0
 78740069 3DF8468B 20F84683 1B8806FF 08750058 30057400 47300A74 004530F8 ½=E.t.=G.t.=X.u......F½ .F½=i.tx 0001E0
```

```
Dump of file SATURN:[PCCOMMON.DUMP.DLL]DA-FIND.DLL;1 on 18-APR-1990 10:38:55.60
File ID (390,14,0)   End of file block 46 / Allocated 48

Virtual block number 19 (00000013), 512 (0200) bytes

3E839001 59E90140 E9037500 25300152 E9037E01 3FE90375 00633001 91E9037E -.Õ..=c.u.Õ?.-.ÕR.*%.u.Õ@.ÕY...> 000000
C426189C 1EC40UEB 00000247 C7260789 2618A6A1 1FC4261B 9C1EC415 75021B8A ...u.6...&6.Àl.&..&úG...$.6...&6 000020
01B0E903 74001BA6 3E830170 E9037500 18A83E83 04189C06 83078926 18A6A11F .Àl.&........>`..u.Õp..>l..t.Õ§. 000040
0A6A0000 188006C7 18A406FF 01ACE9FF FF8801AF E9037520 0A47F626 18821EC4 6...&-G. u.ÕE.|..Õ¯...É.ú.....j. 000060
00041BAA 06C718A2 06FF1888 06FF1886 06FFF2EB 086A90C3 E802C483 019EE80E .Õ...6.$ú.j.$.........Å.ú.`... 000080
A128741B 800639FA 46891B8A A3C0287A 74011B8A 3E830081 E9037508 188A3E83 .>...u.Õ...>...tz+àÉ...`+9.¯_t(À 0000A0
C00B1B80 A1051B80 2E839090 13E80000 188006C7 0A74001B 9A3E83FA 46891B80 ¯..F•.>...t.ú.¯...$.....Å¯..6 0000C0
7E8302C4 83048DE8 0E3A6A02 C4830130 E80E106A 02189C06 831880A3 C028027D ).+àÉ¯......j..ÕÕ..6.j:.Õ...6..~ 0000E0
9007EB1B 80A3C028 027DC008 1880A300 0520FA46 88157400 189A3E83 227400FA •.t".>...t..F•...É¯..6).+àÉ¯.$.. 000100
3FE9106A FF10E902 189C0683 02C48300 F1E80E10 6A04189C 2E830000 188006C7 ú.¯........j..Õp..6......Õ..j.Õ? 000120
0428E80E 256AFF2A E90349E8 0EF876FF F4E8016A 90FF39E9 026EE80E 006A90FF ..j..Õn.Õ9..j.$¶.v%.Õl.Õ•.j%.Õ(. 000140
0A468B09 74001B8A 3E830A7E 00673D05 7C00653D FF0CE903 75006430 90FF21E9 Õl..=d.u.Õ..=e.|.=g.~Õ.>...t..F. 000160
6F30FE80 E9037500 6E30903A EBFE5689 FC468940 0C56880A 46880A4E FF0C5688 .V..N..F..V.@.F•.V±$:.=n.u.Õ.±=o 000180
03750078 30FEB9E9 03750075 308F7400 7330FEE0 E9037500 7030FEE4 E9037500 .u.Õõ±=p.u.ÕÅ±=s.t.=u.u.Õ¿±=x.u. 0001A0
EC75253C 0474C00A F6468807 8A26FC5E C4FC46FF 9034E80A 46FF90B1 EBFF79E9 Õy.$Ÿ..F.$4..F•á^•&...F-.ât.<%u$ 0001C0
C40C5689 0A4689FE 5688FC46 8806C483 044CE80E 0A76FF0C 76FF500A 462BC38B .ú+F.P.v..v..ÕL..6..F•.V±.F..V.6 0001E0

Dump of file SATURN:[PCCOMMON.DUMP.DLL]DA-FIND.DLL;1 on 18-APR-1990 10:38:55.60
File ID (390,14,0)   End of file block 46 / Allocated 48

Virtual block number 20 (00000014), 512 (0200) bytes

1BA6A1FE 51E90374 200A47F6 2618821E C4FC63E9 0374C00A F6468807 8A260A5E ^.&...F-.ât.Õc=6...&-G. t.ÕQ±Àl. 000000
8318A406 FF04740A 067E8300 20101206 C7067400 18A23E83 56570000 12C8C8C9 èùà...WV.>Å..t.ú... ..~..t...É.. 000020
0683FE56 89FC4689 02578826 07882618 9C1EC419 75101B8A 3E830774 021B8A3E >...t..>...u.6...&..&.W..F•.V±.. 000040
1EC40EE8 0000FE46 C7FC4689 07882618 9C1EC411 74001BA4 3E83902C EB041B9C ...$,..>É..t.6...&...F•úF±..$.6. 000060
0674FE46 08FC4688 0E74001B 803E8302 189C0683 FE5689FC 46899907 8B26189C ..&....F=.V±.......>...t..F•.F±t. 000080
83317500 18A43E83 F45689F2 46891BAE 16881BAC A11D10A3 C0289003 EB06468B .F.$..+àÉ..À`...Û..F·.V¶.>É..ul. 0000A0
00028308 F7FE5688 FC46882D 07C626F2 46FFF25E C41D750A 067E8328 7D00FE7E -±.)+.-..u.6^`.F·&6.-.F=.V±%À.@. 0000C0
76FFFA5E 8CF84689 188E8800 00F646C7 9006E800 01F646C7 FE5689FC 46890AF7 %Õ.F=.V±úF-..$..úF-..|...F%.^•.v 0000E0
8A9AF876 FFFA76FF 4574001B A23E830A C4830781 10A29AFC 76FFFE76 FF501E06 ..P.v±.v•.Å....6..>Å..tE.v•.v%.. 000100
00001D10 06C70675 0810103E 83007EC9 08F04E89 C8281BAA 0E8804C4 83029010 ....6...`.+à.NÞ.è~..>...u.ú..... 000120
880E8BF0 4E89F446 8CF27E89 F47FC008 49C18847 3005C626 05E8F27E C4F04E8B .NÞ6-`$.&6.0G.èl.6.¶.-`.F¶.NÞ... 000140
8026F846 FF46202C 80037C61 3C0774C9 08048807 8A26F85E C4F276C5 EE5E8C18 ..^Ÿév·6^½&.....èt.<a|.., F.F½&. 000160
F67E8308 741BA006 08188CA1 1475001B A43E83EE 5E8EF45E 8CF27689 E375003F 7.uÕ.v·.^¶.^Ÿ.>É..u.À......t..~- 000180
00067E83 56570000 10C8C8C9 5F5E02C4 8302FFEB 0E50C028 02EB0001 88057500 .u.|..$.+àP.Õ...6.^_èùà...WV.-.. 0001A0
74081B8A 3E83008F E902189C 0683FA56 89F84689 189E1688 189CA100 018E1874 t./..À........F%.V•.....Õ...>...t 0001C0
4689FC46 89078826 189C1EC4 10EBFA56 89F84689 02578826 07882618 9C1EC413 .6...&..&.W..F%.V•$.6...&...F•.F 0001E0

Dump of file SATURN:[PCCOMMON.DUMP.DLL]DA-FIND.DLL;1 on 18-APR-1990 10:38:55.60
File ID (390,14,·   End of file block 46 / Allocated 48

Virtual block number 21 (00000015), 512 (0200) bytes

7E83900A E80208B8 1575FA46 08F84688 0E74081B 8A3E8304 189C0683 FA5E8CF8 %.^•......>...t..F%.F•u.|..$...~ 000000
741BA236 39F62BF4 5689F246 89FA568B F8468BFA 5E8CF846 89020F88 097500FC •.u.|...F%.^•.F%.V•.F·.V¶+-96Å.t 000020
F25EC446 90EDEB10 7ECE3846 1574003F 8026F246 FFF25EC4 900EEB18 AA0E881C ...`.$..&^`.F·&.?.t.F;ö~.$Ú.F&^· 000040
FF5602C4 830159E8 0E570875 00189A3E 83FE2B18 803E88F3 75003F80 26F246FF .F·&.7.uW.>`.+±.>...u.W.ÕY..&.V. 000060
90C8C95F 5E02C483 013CE80E 57087400 189A3E83 06C48301 83E80EF8 76FFFA76 v•.v%.Õ•..&..>...t.W.Õ<..&.^_èù. 000080
EB018005 7547067E 83067467 067E83FE 5689FC46 89189E16 88189CA1 000006C8 &...Å.......F•.V±.~.øt..~.Gu.¯.$ 0000A0
750018AA 3E830074 00FA7E80 00061BAA 06C70675 0018A23E 83FA4688 C02A9003 ..•&.F•.>Å..u.ú.`.....~•.t..>`..u 0000C0
FC76FFFE 76FF1BAC 36FF1BAE 36FF0676 FF18AA36 FF188836 FF00011B AA06C706 .ú.`....6...6`..v..6Õ..6`..v±.v• 0000E0
AC36FF1B AE36FF14 75001880 3E831874 00FA7E80 0EC48306 3A1EFF26 1A9E068E ....&..:..&..-•.t..>...u..6Ú..6` 000100
FF1BAE36 FF147500 18AA3E83 18740018 803E8304 C483063E 1EFF261A 9E068E18 .....&..>..&..>...t..>`..u...6Õ.. 000120
A006081B 8CA10000 1D1006C7 08189C06 8304C483 06461EFF 261A9E06 8E18AC36 6`.....&..F..&.........Å..... 000140
C02B02EB 00018805 74C00804 C483064A 1EFF261A 9E068EFC 76FFFE76 FF18741B .t..v±.v•......&...J...&...åt.|...$.+& 000160
468A1478 044FFF2C 18821EC4 3C75001B A83E8356 000000C8 90C8C901 29E80E50 P.Õ).èù.à....V.>`..u<&....&.0.x..F 000180
830A5901 1E9A0676 FF531884 36FF10EB E42A0488 2602478E 2607FF26 37882606 .&.7&..&.G.&..•0$..6..S.v......Y.. 0001A0
75001BA8 3E835657 000002C8 90C8C95E 18A606FF 9005EB1B A806FF07 754006C4 &.ðu...`.$....|.^èù.à...WV.>`..u 0001C0
754006C4 830AC101 1E9A1D12 36FF1882 36FF1884 36FF18EB 507EF608 06768857 W.v..--P$..6...6...6.....è..&.ðu 0001E0
```

Dump of file SATURN:[PCCOMMON.DUMP.DLL]DA-FIND.DLL;1 on 18-APR-1990 10:38:55.60
File ID (390,14,0)   End of file block 46 / Allocated 48

Virtual block number 22 (00000016), 512 (0200) bytes

```
2607FF26 3F88261D 12A00478 044FFF26 18821EC4 1E7EC008 4EC6881B A806FF04 ...'..6N.&~.&...&.O.x&...&.?&..& 000000
000002C8 CBC95F5E 1BA60601 06468807 75001BA8 3E8304EB E42A0588 2602478E .G.&..*6$&.>'..u..F...|.^ èùà... 000020
1E9A5098 078A2606 5EC41882 36FF1884 36FF22EB 5E75001B A83E830A ~4885657 WV.v..>'..u^$".6...6..&^.Ï...P.. 000040
78044FFF 261L821E C42574C0 084EC688 0646FF1B A806FF04 754006C4 8.?83301 .3..&.au...'..F..6N.&t%&...&.O.x 000060
18A83E83 CAE8E42A 05882602 478E2607 FF263F88 2618821E C4078A26 06:?C4CD ë&^.&..&...&.?&..&.G.&..*6$6.>'. 000080
F65689F4 46891BAE 16881BAC A1560000 0CC8CBC9 5F5E1BA6 06010A46 88077500 .u..F...|.^_èùà...VÂ¯...Û..F¶.V- 0000A0
06762BF0 28F84689 04C48307 6C108A9A F476FF52 18803688 FA4689FC 4689C02B +&.F=.F*.6¯.R.v¶...l..&..F½+Þ+v. 0000C0
8026F45E C4227500 189A3E83 4E017508 1D103E83 08EB02EE 83057510 1D103E83 .>...u..Y.$..>...u.N.>...u"&^¶&. 0000E0
123E83F8 4EFF02C4 83FE71E8 0E509807 8A26F446 FF127530 1D123E83 19752D3F ?-u..>..0u..F¶&...P.Ôq±.&..N½.>. 000100
1D103E83 0066E80E FA46FF07 7400067E 83187400 189A3E83 077EF608 0874301D .0t..--..>...t..-..t..F*.Ôf..>.. 000120
830A7400 067E8302 C483FE7E E80E5629 75001B9A 3E830070 E80EFC46 FF077400 .t..F=.Ôp..>...u)V.Ô-±.&..-..t.. 000140
F676FFF8 76FF0040 E80E0475 00FC7E83 0A74001D 103E8300 39E80E04 7500FA7E -*.u..Ô9..>...t..~•.u..Ôa..v½.v- 000160
5E02C483 FE38E80E 5600201D 1206C70E 7400189A 3E8306C4 83FE85E8 0EF476FF .v¶.Ôç±.&..>...t.ú... .V.Ô8±.&.^ 000180
FDC8E80E 306ACB02 C483FDD2 E80E5000 208803E8 00288805 7400188C 3E83C8C9 èù.>...t.¡+.$.¡ .P.Ô0».&.új0.Ôà» 0001A0
C483FDAA E80E5000 788803E8 00588805 74001888 3E831775 101D103E 8302C483 .&..>...u..>...t.¡X.$.¡x.P.Ô'».& 0001C0
9C068337 88261B9C 1EC41275 2A3F8026 0A5EC400 01FE46C7 56570000 06C8C802 .ùà...WVúF±..&^.&.?*u.&...&.7... 0001E0
```

Dump of file SATURN:[PCCOMMON.DUMP.DLL]DA-FIND.DLL;1 on 18-APR-1990 10:38:55.60
File ID (390,14,0)   End of file block 46 / Allocated 48

Virtual block number 23 (00000017), 512 (0200) bytes

```
8A260A5E 88F62B0A 46FFFFFF FE46C708 75203F80 260A5EC4 9060EB0A 46FF021B ...F.$'.&^.&.?-u.úF±...F.+-.^.&. 000000
06EBFB88 00301D12 06C70675 303C0A75 18A23639 387F393C 3F7C303C FA468807 ..F*<0|?<9.;96Â.u.<0u.ú...0..«$. 000020
7D303080 2647F188 30E983C8 03E1D1CE 0302E1C1 CE889805 8A2618 7F 39308026 &.=9..&....öèÂ..ö1Â.à.Ô0.þG&.=0) 000040
04C8C8C9 5F5E0C56 880A4688 37892606 5EC4F088 EEF7FE46 880C468C 0A7E89DF Ô.~..F..F±¥Y.Þ&^.&.7.F..V.^ èùà. 000060
F4750038 26117400 30802647 01EBFC7E C4064E8A FE5E8CFC 46890216 88570000 ..W¡...F=.^±.N.&~•$.G&.=.t.Ï8.u¶ 000080
5016C488 50EC8855 90C8C95F C02BFE46 8CFC7E89 9009E8FE 468CFC7E 890001B8 ¡...~•.F±$...~•.F±+à_èù.U.&P.&.P 0000A0
E49A0386 E80021E8 0000FFFF 9A021C68 1E021E68 1E1858A3 E0865800 00FFFF9A .....X.ÂEX..h...h.......Ô1.ÔÑ..ô 0000C0
0000881E 022416FF 00FF680D 4E0DFE9A 004100AA 9A50C850 E5880001 880A1D11 ...¡...|)úP.¯.A..±.N.h....$..£.. 0000E0
88A6F3C8 88D18806 288E3174 00308026 47017500 3080267F FF89021E 068EFF33 3.....¿..&.=.u.G&.=.t1ƒ(..1.ùµ1. 000100
412CAC92 04E0C00E 72412CAC 185F8F1F F788071E 061CE8E7 74AEF2C0 330874CA òt.3à·ÚtÔ$.....¥.¢_.¯,Ar.&Â..¯,A 000120
361EFF04 74000638 3E830053 00FE9A50 00FC88EC 885500C3 1FEDEBAA C20A0572 r..ô¨$Ú.Û.U.$¡=.P.±.S..>8..t...6 000140
1AA88E06 5688C08E D88E0189 885756EC 8855C85D E5880084 00FE9A50 00FF8806 .¡..P.±.Ç..|)ùW.&VW¡¿..Â.&.V.ƒ'. 000160
88550002 CA5DE588 5E5F96E8 E8F788AE F2FFFF89 C033970C 74964010 74C238AD Ú;ôt.ã.t..3&¿..·Û.¥$$_.^.|)ò..U. 000180
0288C488 50490 1F7 AEF2FFFF 89C033FA 88921F74 C00800C8 00CE9A06 76FF57EC &W.v..ö.à..ât...*3&¿..¯Ú¥|IP.&£. 0001A0
20044688 1A7006FF 000004C8 0002CA5D E5885F58 0000FFFF 9A501651 521E5300 .$.RQ.P.....(_.|)ò..à.....p..F.- 0001C0
08139F9A 020068FE 5E8CFC46 89124E05 E001C103 E001C888 F9F7000C 8999065A Z..¿..¥*.àiÂ.ēiÂ.N..F=.^±h...... 0001E0
```

Dump of file SATURN:[PCCOMMON.DUMP.DLL]DA-FIND.DLL;1 on 18-APR-1990 10:38:55.60
File ID (390,14,0)   End of file block 46 / Allocated 48

Virtual block number 24 (00000018), 512 (0200) bytes

```
000247C7 26FC5EC4 080A4F80 261174D0 08085789 26064789 26045EC4 02C4830E ..&.&^.&.G.&.W..Ât.&.O..&^=&úG.. 000000
C726FC5E C4085789 26064789 2640FE56 88FC4688 040A4F80 26045EC4 9021E802 .$!.&^.&.O...F=.V±a&.G.&.W.&^=&ú 000020
8855C3C9 00000447 C7260257 89260789 26085788 26064788 26045EC4 00010247 G...&^.&.G.&.W.&..&.W.&úG...èúU. 000040
76FF0A76 FF53CC88 04EC8304 78E9046C E9C03300 098A0872 185D1E38 065E88EC &.^.;.].r.¤..3àÔl.Ôx..&..&S.v..v 000060
83EC8855 00C85DE5 88FD185F A78091E1 75C0855A 590000FF FF9A5116 0C76FF08 ..v..Q.....YZ.&uÂ..Ï_.».|)ù.U.&. 000080
415151C9 33531274 20185F87 F6042BE9 C0330009 8A087218 5D1E3806 5E880CEC &..^.;.].r.¤..3àÔ+.-¯. t.S3èQQA 0000A0
4689C033 0856C50A 468EFA5E 8C667480 185F87F6 00000EE7 9A5016F4 46805141 AQ.F¶.P.Ô...-._..tf.^Ť.F.éV.3&.F 0000C0
808ADC88 02EC833B 75AEF20A 8049E30C 4E88F866 89F288FA 885657FC FC4689FE ±.F==WV.*.·.f½¯N.DI¯.·Ûu;.&..£¤. 0000E0
00B0009A E9002BE8 F4E2AA1A 74F83B0D 740A3CAC 0C4E8807 16FA88D4 88E22800 .+ã.&.*...N.¯<.t.;«t.¯ã¶Ô+.Ô..¯. 000100
FC887AEB 0093E9FA 5E8E5F5E E1E80014 E8E2E8FC 46FF0A80 AA001FE8 0375FB38 ;«u.Ô..'¯..F=$àÔ..$Â^ .^*Ô..$z¡= 000120
289A5016 F4468D51 521E5306 5E881FE3 CA28CF88 1F061E51 53500E5F 10009AFF ..Â. .PSQ....ú+ÔD..^.Ŝ.RQ.F¶.P.( 000140
1874C008 08C4831F C3FA8858 58591F07 74D808FE 5E01F45E 881175C0 0800000E ....Ŝu..^¶.^±.Ut..Y[X.*ù..&..&t. 000160
40185F87 F6FE5E8E 26E8F900 208A03E8 001CBA08 7500098A 00013000 74006030 =m.t.=..¤..u.¤..$.¤ .*$&.^±-._.ä 000180
6688FC46 28FE4¢ B 06EBF9C0 33001CBA 0EEBF803 751A3F80 085E880A 5E8E0E74 t..^..^..?.u.½$.¤..3&*$..F±+F=.f 0001A0
1E530856 C51EEEtd C1880475 C9080C4E 88030FE9 CB5DE588 0472FA5E 8E5F5EF8 ½^_.^*r..|)ùÔ...N..èu..é$Y.éV.S. 0001C0
CC750009 8A00013D 00740060 301774C0 081F071E 00000F8F 9A5016F4 46805152 RQ¯F¶.P.¢.......ât.=m.t.=..¤..uä 0001E0
```

```
Dump of file SATURN:[PCCOMMON.DUMP.DLL]DA-FIND.DLL;1 on 18-APR-1990 10:38:55.60
File ID (390,14,0)   End of file block 46 / Allocated 48

Virtual block number 25 (00000019), 512 (0200) bytes

02751A3F 80260A88 0A744018 5F87F687 75C008F4 4688C2EB 0020BAC7 EB001CBA ¤..Şú¤ .Şó.F¶.àuñ-. .ät..Õ&.?.u. 000000
5DFA8891 49D1F7AE F2FFFFB9 C033067E C4D788EC 885500A3 EBC03300 1CBAA6EB $l¤..3àŞÈ.U.£.æá-.3ä¿.. Ú%ll..•) 000020
5F87F60C 7C00FB83 117D185D 1E3B065E 88EC8855 0442E900 B35756EC 885500C8 ù.U.£VW°.Õ8.U.£.^.;.].)..«.|.-._ 000040
E3880572 06581E38 08720828 0C885A59 00C85DE5 88C03302 E8000188 05744018 .ät.¡..$.3ä.|]ù.YZ.È+Àr.;.X.r..Ð 000060
5087185F A78004B8 520002B8 06542EFF 5152FC5C E9C03305 75400654 A1C85152 RQùÀT.äu.3éÕ\•RQ..T.È..R.Å.Ï_.ñP 000080
08088106 75000230 07740001 30408112 7558C008 0000FFFF 9A521650 1653C488 .áS.P.R......âXu.Ýä=..t.=..u.Ý.. 0000A0
06C401AE E903731A 881EFFD8 33C28C1A 8C06C41E E31A8A0E 885AD479 48185F8F ._.KyåZ....D.á....ó3Ü....s.ÕÜ.á. 0000C0
1A948800 73E81A94 BF1A94BE 007CE81A 948F1A94 8E1A881E FF00038B C28C1A90 ...óÉ....../..¢..Ö|./..¢..Ös.|.. 0000E0
6A0051E8 1A988F1A 948E088E 0004B8C3 0000FFFF 9A117168 0E016A08 741A9830 =..t.j..hq......ù¡å..Å/..¢..Õq.j 000100
E80031E8 1A988F1A 948E003A E81D14BF 1D148EEC 88550000 116C9A00 6A006A03 .j.j..l...U.£/..¢..Õ:./..¢..Õ1.$ 000120
FFFF9A50 06468A50 C033001A E81A98BF 1A988E00 23E81A98 BF1A988E EC885503 .U.£/..¢..Õ#./..¢..Õ..3äP.F.P... 000140
1DFFF274 02450805 8804EF83 0E73F738 C31A881E FF0002B8 07E31A8A 0E880000 ......D.É......û;%s..ÿ....É.t.. 000160
F04689C0 28021E16 8800F0E9 0375021E 3639FF28 F62B5657 000014C8 00C3EEEB $Ýù.à...WV+-+.96..u.Õÿ.....+à.Fÿ 000180
74C0080A C4831258 14829A06 28681EF6 76FFF876 FF0C6AF8 5689F646 89F25689 .V..F-.V½j..v½.v-.h(..ý.X..á..ät 0001A0
F646FFF6 5EC40CEB 47EA7500 3F8026F6 46FFF65E C4008CE9 03767FFF :F814619 .F.±..v.Õ¥.á^-.F-&.?.uõG$.á^-.F- 0001C0
EC468904 C4831267 145A9A04 6A500145 80BA7500 3F8026F6 5E88F475 C 3F8026 &.?.u¶.^-&.?.u¤.E.Pj..Z.g..á..F$ 0001E0

Dump of file SATURN:[PCCOMMON.DUMP.DLL]DA-FIND.DLL;1 on 18-APR-1990 10:38:55.60
File ID (390,14,0)   End of file block 46 / Allocated 48

Virtual block number 26 (0000001A), 512 (0200) bytes

74C208FC 46886074 EE4608EC 4688FE56 89FC4689 02C48312 9D139F9A 56EE5689 .VÝV......á..F•.V±.F$.FÝtm.F•.ót 000000
830FA414 829A0628 681EF076 FFF276FF 0C6A1A67 16891A65 A3EE5688 EC468866 f.F$.VÝÈe...g.j..v..vÞ.h(..ý.È.. 000020
F046FFF0 5EC404EC 46830257 89260789 26FE5688 FC4688EC 5EC42C74 C0080AC4 á..ät,á^$.F•.V±&..&.W..F$.á^Þ.FÞ 000040
5EC4F475 003F8026 F046FFF0 5EC4E8E8 0E74C00A 078826FC 46FFFC5E C4078A26 &..á^•.F•&...ät.$Õá^Þ.FÞ&.?.u¶á^ 000060
0C070906 00051804 02030202 1601FA58 E90002B8 90C8C95F 5EA77500 3F8026F0 Þ&.?.u¦^_èù.|..ÕX•............. 000080
00570053 00520243 00410235 02121211 0010120F 1600160C 0808070A 0C090C08 ....................S.A.C.R.S.W. 0000A0
58A31608 000008D7 02CE08A4 00840982 0A810A80 16060972 1C702060 006C0859 Y.l.m p.r...........È.ö.•.....È( 0000C0
248912F2 BB185BA3 CB50E588 99FFFF88 0008E8C8 5DE58899 FFFF8818 54168918 ...T.|....|]ùÕ..|.....|]ùÈ[.É .¿$ 0000E0
430176CA 3C0472BC 3C430A76 243C0472 133CF7E2 43431674 073A2E18 75E40A00 ..ôu..:.t.CCã%<.r.<$v.C<¥r.<ôv.C 000100
55C850E5 8801FE4F 80260574 C308C08C 065EC4EC 885500C3 1854A398 01478A2E ..G..ÈT.û.U.£á^..å.ùt.&.O±..|]ùW 000120
82E81A7C A3127400 25E80875 001A7C3E 831E73FF F13D0646 88575602 EC83EC88 .$.$.VW.F.=þ.s..>|..u.ÕX.t.È|.Õ. 000140
F0B8C85D E5885E5F 02C48312 1815A49A 0676FF08 750078E8 05740018 E8157500 .u.Õ..t.Õx.u..v..È....á._^.|]ùÈÞ 000160
D317509A 50028051 0E4F8050 501EC033 FE5E89FE E3834306 5E880776 065E3900 .9^.v..^.C.D±.^±3ä.PP.O.Õ¯.P.P.Æ 000180
D88EFE5E 880008A3 0A8E0574 02081A80 A31A7E16 87C28838 74FFFA83 08C48313 ..á..•.t8.ó..-.È...•t..ÕÈ...^±.Å 0001A0
8C0006A3 00000500 0AA30147 800002A3 0000A300 0AB80C47 89484800 08A3C033 3äÈ..HH.G.|..È..È...G.È.....È... 0001C0
6A560000 0AC8C309 8EC18CD2 08019AE8 1A801E8E 0B33064E 88C08ED8 8CC31F08 Å.ú.Å.â.N.3Ü....Õ...•.è.lùà...Vj 0001E0

Dump of file SATURN:[PCCOMMON.DUMP.DLL]DA-FIND.DLL;1 on 18-APR-1990 10:38:55.60
File ID (390,14,0)   End of file block 46 / Allocated 48

Virtual block number 27 (0000001B), 512 (0200) bytes

902FE899 C0280674 FFFFC2F7 FA5689F8 46891487 184E9A06 76FF006A 0876FF00 ..v.j..v..N....F%.V•%ó..t.+à.$/. 000000
18069A50 FE76FF00 6A561274 D008FE56 89FC4689 02C48314 A0139F9A 56F87688 .v%V......á..F•.V±.Àt.Vj..v±P... 000020
C4D98827 E30E4E88 1E5657EC 885590C8 C95EFE56 88FC4688 9007E808 C48313FF ...á.$...F•.V±^èù.U.$WV..N.D'.lá 000040
04740477 FF453A26 C933FF44 8AA6F30A 76C5FE88 C803D9F7 AEF2C033 F788067E -..%3ä·Ú%).ù.±év.æ|.D.3è&:E.w.t. 000060
93FC071E 570A7EC5 1E085688 0646880E 4E8800C8 5DE5885F 5E1FC188 D1F74949 II%l.è.^_.|]ù..N..F..V..é-.W..•. 000080
0274C008 023392F7 880AF700 D2830BF7 AA2DB00A 79D2080E 750AF983 1374C00A .ät..•.u..•y.¯-`%Ü.•.%Õ.%.3•.át. 0000A0
FF448805 86AC4F05 88E275C3 08C288AA 27040276 393C3004 D38792F1 F793F1F7 %þ.%þ..Æ.0<9v..'`.ô.ùuã..O¯...D. 0000C0
FC5E8CFA 4689065A 88560000 06C800C8 5DE5885E 5F1F58DA 8CF272C7 38014480 .D.;úr·.ÕX._^.|]ù.à...V¡Z..F•.^• 0000E0
0CFA4683 46017440 04C48314 6C18829A 53060E74 830A47F6 26FA5EC4 1CE8F628 +-$.á^•&-G..t..S...l..á.ät.F.F•. 000100
01FE4F80 04740808 065E88EC 885590C8 C95EC688 D876FA46 39184A16 881848A1 ÀH...J.9F•vÅ.ó^èù.U.$.^..Ût..O±. 000120
24E899C0 33057501 76E80005 88071E29 75003F83 1A728857 56EC8855 CB5DE588 .|]ùW.$VWEr..?.u)..|..Õv.u.3ä.$$ 000140
8ED88C06 4E881A78 3689FFFE FE44C704 C6830001 04C7961A 74A31A72 A3FE2440 ä$±Èr.Èt..ú....ó.ùÕ±± .óx..N..Ä. 000160
A8FE8BA0 FC02778B F273EEF9 83FEE180 FA744100 D0E9CB5D E58B5E5F 0009E8C0 àÕ.._^.|]ùÕÅ.At•.Ä±.•½ .w.•Ú.± 000180
74FE88E6 E8FE4489 F7880002 05C20335 7401A8AD F003D088 1573C138 48437401 .tCH;ès..Å.þÚ'.t$.ó....%.D±$l.±t 0001A0
1E8C2605 74D13811 72890A8C C688FE4C FEF90305 E8058948 C128FE4C 89F9030C ..•.L±+èH..$..•±L±.ó.Õ¿r.;lt.&.. 0001C0
73C13848 FE88F274 01A8ADF0 03FE8825 74FFFE3D 021A8406 C626C302 7F891A80 .....ù&ó....=±.t%.±.þÚ'.t·.±H;ès 0001E0
```

```
Dump of file SATURN:[PCCOMMON.DUMP.DLL]DA-FIND.DLL;1 on 18-APR-1990 10:38:55.60
File ID (390,14,0)   End of file block 46 / Allocated 48

Virtual block number 28 (0000001C), 512 (0200) bytes

 EB088E04 74C00808 4788E6EB FE4489F7 88000205 C203E274 01ABADF0 03008BBC ¥.À.ÞÙ´.tâ.ò....¼.D±Ŝl.G..ât..ÀŜ 000000
 E8C03306 778888°8 37881A7C 1E8E2605 74C73816 378FD88C 12741A84 0EFE2615 .è±...t..Àè7.;út.&..|..7ŜE.w.3àò 000020
 89D88C98 EB4E4E96 0574001D E8FE4DFE 0D74005F E8984040 01240074 C638006B k.;ót.$.ãã.Ò_.t.±M±Ò..t..NNŜ..Àſ 000040
 414149C8 28037401 A8FE4588 51C399C0 33024789 07881A80 A3260474 C1381688 ..;èt.&È.....G.3à.ùQ.E±´.t.+àlAA 000060
 0CE8C628 C22302F7 0072C203 1572C603 C188F575 EAD10476 1A821638 267FFFBA ¤..&;...v.lõuŒ.ė.ór..ór.%ø#ò+6Ò. 000080
 FFFEFE44 C7F203F0 88FE8857 1874001D E85152C3 59C033E5 75EAD102 F7087500 .u.%ø1õul3àYûROÒ..t.W.±.Þ.´úD±±. 0000A0
 17509A1F 06500001 88505252 1ED23350 53C35A59 58FE5589 4AD72806 88067789 .W..ø+øJ.U±XYZûSP3ø.RRP¦..P...P. 0000C0
 880226BF 3875000A 7E830657 56EC8855 C3020802 74585A1F FFFA8308 C4831573 s..á..°..Z[t..øùU.$VW..~..uBe&.. 0000E0
 0E468902 44880074 F7381174 48062636 884CE827 720057E8 07754806 46880856 V..F.Hu.ÒW.r'ŜL.6&.Ht.;%t..D..F. 000100
 501652C4 885021E8 99FFFFB8 0675020B 04730626 FE8104C6 8334735E 003EE856 VÒ>.^s4.ó..±&.s..øu.¦...ŜIP.øR.P 000120
 E5885E5F 07C03303 88062636 89025C89 1489E675 C085F958 0000FFFF 9A50C033 3àP.....[°.ául...\..6&..Œ3â._^.l 000140
 D3882672 1C030A88 2CE8F9F2 750626FE 8104C683 0C74024C 39F7880E 4E88C85D lù.N..%9L.t..ó..±&.u·°Ŝ,.Ö..F&.Œ 000160
 92022016 890475F7 380E75C0 850000FF FF9A5153 13730220 1E390675 F738C18E .è;%u.9. .s.SQ......áu8;%u... .. 000180
 D1030323 D818D128 0C74DAF7 D788067E C45738E3 0C4E88EC 885500C3 D1880487 ...lú.U.$.N.D8Wá-..ø%Öt.+1.ÙWŒ.l 0001A0
 F3E9D1C3 8EFFFFC3 81C38C10 E30187AA F3C913AB F3E9D1E0 8A0A4688 D12B0187 .l+l.F..Àlõµ´.èµ˙.lD..ũ.ù...ùlõµ 0001C0
 46880875 0A5E8808 080C5E88 08468BEC 8855CB5D 08568806 46885FAA F3C913AB ¨.èµ˙_.F..V.]ùU.$.F..^..Ä.^.u..F 0001E0

Dump of file SATURN:[PCCOMMON.DUMP.DLL]DA-FIND.DLL;1 on 18-APR-1990 10:38:55.60
File ID (390,14,0)   End of file block 46 / Allocated 48

Virtual block number 29 (0000001D), 512 (0200) bytes

 CA5DE588 D103E3F7 064688C8 030C66F7 064688C8 88E3F700 08CA5DE5 88E3F706 .%D.l]ò..%D.à.F.%f..à.F.%D.l.l]ò 000000
 2DC38815 75080A47 F6265575 023C0324 0A478A26 065EC4F6 28560000 04C80008 ..à...V+-á^.&.G.$.<.uU&-G..u..ù· 000020
 08FC4689 06472826 07882606 5E883974 01124E87 F6060868 F9F7000C 8999065A Z..¿..%°kÀ.-.N..t9.^.&..&+G..F=. 000040
 0874FC46 3808C483 17400EFC 9A50E42A 08478A26 0677FF26 0877FF26 50287EC0 à-(P&.w.&.w.&.G.°ðP.ø.ã..á.;F=t. 000060
 47C72602 57892607 89260857 88260647 8826065E C4FFFFBE 200A4F80 26065EC4 á^.&.O. /..á^.&.G.&.W.&..&.W.&ùG 000080
 00071806 00020007 00021186 01030005 0002118E 0103000C CBC95EC6 88000004 ....ó^èù....ƒ...............ø... 0000A0
 00081048 02030026 000217EF 01030022 000217A4 01030000 000916C0 00020000 ....à.......É...ᴴ...ÿ...&...H... 0000C0
 00020034 0103004D 00021108 0103003A 00020F28 01030088 00021839 010501F8 ‰...9.......(...:.......H...4... 0000E0
 542D6E75 5220534D 00000000 00000000 00000000 0000005C 00020021 ˙103005B [...!...\...............MS Run-T 000100
 38383931 20296328 20746867 69727970 6F43202D 20797261 7262694C 2˙56069 ime Library - Copyright (c) 1988 000120
 206E6F69 74616D72 6F666E49 00010011 70726F43 2074666F 736F7263 69˙5202C , Microsoft Corp....Information 000140
 6E450002 00000000 00000000 00000000 00000000 00000000 0000006C 65646F6D model.........................En 000160
 00000000 00000000 00000000 00000000 00000000 00000000 00000000 79746974 tity............................ 000180
 00000000 00000000 00746573 20706968 7372656E 74726150 00030000 00000000 ........Partnership set......... 0001A0
 00000000 00657475 62697274 74410005 00000000 00000000 00000000 00000000 ...................Attribute..... 0001C0
 0079654B 00090000 00000000 00000000 00000000 00000000 00000000 00000000 ............................Key. 0001E0

Dump of file SATURN:[PCCOMMON.DUMP.DLL]DA-FIND.DLL;1 on 18-APR-1990 10:38:55.60
File ID (390,14,0)   End of file block 46 / Allocated 48

Virtual block number 30 (0000001E), 512 (0200) bytes

 00000000 00000000 00000000 00000000 00000000 00000000 00000000 00000000 ..................... .......... 000000
 00000000 00000000 00000000 00000000 006E6F69 736E656D 69440006 00000000 ......Dimension................. 000020
 00000000 00000000 00006E69 61606F44 00070000 00000000 00000000 00000000 ................Domain.......... 000040
 00006574 6F4E0015 00000000 00000000 00000000 00000000 00000000 00000000 ........................Note.. 000060
 00000000 00000000 00000000 00000000 00000000 00000000 00000000 00000000 ................................ 000080
 00000000 00000000 00000000 00000000 00000000 0060796E 6F6E7953 000A0000 ....Synonym..................... 0000A0
 6C626174 2065756C 61762064 65776F6C 6C41000B 00000000 00000000 00000000 ..............Allowed value tabl 0000C0
 7865746E 6F632073 61200000 00000000 00000000 00000000 00000000 00000065 e..................... as contex 0000E0
 2800296C 6C756E28 00007325 73252065 736F6F68 43250000 7463656A 626F2074 t object..%Choose %s%s..(null).( 000100
 00000000 00001A9E 1D2011A1 1D201D20 00000000 00002320 2D280029 6C6C756E null).+- #...... . .À. ......... 000120
 00000000 00000000 00000000 00000000 00000000 00000000 00000000 00000000 ................................ 000140
 00000000 00000000 00000000 00000000 00000000 00000000 00000000 00000000 ................................ 000160
 00000000 00000000 00000000 00000000 00000000 00000000 00000000 00000000 ................................ 000180
 00000000 00000000 00000000 00000000 00000000 00000000 00000000 00000000 ................................ 0001A0
 00000000 00000000 00000000 00000000 00000000 00000000 00000000 00000000 ................................ 0001C0
 00000000 00000000 00000000 00000000 00000000 00000000 00000000 00000000 ................................ 0001E0
```

```
Dump of file SATURN:[PCCOMMON.DUMP.DLL]DA-FIND.DLL;1 on 18-APR-1990 10:38:55.60
File ID (390,14,0)    End of file block 46 / Allocated 48

Virtual block number 31 (0000001F), 512 (0200) bytes

00000000 00000000 00000000 00000000 00000000 00000000 00000000 00000000 ................................ 000000
00000000 00000000 00000000 00000000 00000000 00000000 00000000 00000000 ................................ 000020
00000000 00000000 00000000 00000000 00000000 00000000 00000000 00000000 ................................ 000040
00000000 00000000 00000000 00000000 00000000 00000000 00000000 00000000 ................................ 000060
00000000 00000000 00000000 00000000 00000000 00000000 00000000 00000000 ................................ 000080
00000000 00000000 00000000 00000000 00000000 00000000 00000000 00000000 ................................ 0000A0
00000000 00000000 00000000 00000000 00000000 00000000 00000000 00000000 ................................ 0000C0
00000000 00000000 00000000 00000000 00000000 00000000 00000000 00000000 ................................ 0000E0
00000000 00000000 00000000 00000000 00000000 00000000 00000000 00000000 ................................ 000100
00000000 00000000 00000000 00000000 00000000 00000000 00000000 00000000 ................................ 000120
00000000 00000000 00000000 00000000 00000000 00000000 00000000 00000000 ................................ 000140
00000000 00000000 00000000 00000000 00000000 00000000 00000000 00000000 ................................ 000160
00000000 00000000 00000000 00000000 00000000 00000000 00000000 00000000 ................................ 000180
00000000 00000000 00000000 00000000 00000000 00000000 00000000 00000000 ................................ 0001A0
00000000 00000000 00000000 00000000 00000000 00000000 00000000 00000000 ................................ 0001C0
00000000 00000000 00000000 00000000 00000000 00000000 00000000 00000000 ................................ 0001E0

Dump of file SATURN:[PCCOMMON.DUMP.DLL]DA-FIND.DLL;1 on 18-APR-1990 10:38:55.60
File ID (390,14,0)    End of file block 46 / Allocated 48

Virtual block number 32 (00000020), 512 (0200) bytes

00000000 00000000 00000000 00000000 00000000 00000000 00000000 00000000 ................................ 000000
00000000 00000000 00000000 00000000 00000000 00000000 00000000 00000000 ................................ 000020
00000000 00000000 00000000 00000000 00000000 00000000 00000000 00000000 ................................ 000040
00000000 00000000 00000000 00000000 00000000 00000000 00000000 00000000 ................................ 000060
00000000 00000000 00000000 00000000 00000000 00000000 00000000 00000000 ................................ 000080
00000000 00000000 00000000 00000000 00000000 00000000 00000000 00000000 ................................ 0000A0
00000000 00000000 00000000 00000000 00000000 00000000 00000000 00000000 ................................ 0000C0
00000000 00000000 00000000 00000000 00000000 00000000 00000000 00000000 ................................ 0000E0
00000000 00000000 00000000 00000000 00000000 00000000 00000000 00000000 ................................ 000100
5F454C49 465F435F 02260000 00000000 00000000 00000000 00000000 00000000 ......................&. C FILE_ 000120
00000648 12EC0644 12EC0640 12EC063C 12ECFFFF 12EC0000 00000030 4F464E49 INFO=.....&...&.<.&.a.&.D.&.H... 000140
00000000 00000000 00000001 1A9C0000 00000662 00000200 FFFFFFFF 01010000 ............b................... 000160
00000000 00000000 00000000 00000000 00000202 00000000 00000000 00000102 ................................ 000180
00000000 00000000 00000000 00000000 00000000 00000000 00000000 00000000 ................................ 0001A0
00000000 00000000 00000000 00000000 00000000 00000000 00000000 00000000 ................................ 0001C0
00000000 00000000 00000000 00000000 00000000 00000000 00000000 00000000 ................................ 0001E0

Dump of file SATURN:[PCCOMMON.DUMP.DLL]DA-FIND.DLL;1 on 18-APR-1990 10:38:55.60
File ID (390,14,0)    End of file block 46 / Allocated 48

Virtual block number 33 (00000021), 512 (0200) bytes

00000000 00000000 00000000 00000000 00000000 00000000 00000000 00000000 ................................ 000000
00000000 00000000 00000000 00000000 00000000 00000000 00000000 00000000 ................................ 000020
00000000 00000000 00000000 00000000 00000000 00000000 00000000 00000000 ................................ 000040
00000000 00000000 00000000 00000000 00000000 00000000 00000000 00000000 ................................ 000060
00000000 00000000 00000000 00000000 00000000 00000000 00000000 00000000 ................................ 000080
00000000 00000000 00000000 00000000 00000000 00000000 00000000 00000000 ................................ 0000A0
00000000 00000000 00000000 00000000 00000000 00000000 00000000 00000000 ................................ 0000C0
00000000 00000000 00000000 00000000 00000000 00000000 00000000 00000000 ................................ 0000E0
00000000 00000000 00000000 00000000 00000000 00000000 00000000 00000000 ................................ 000100
00000000 00000000 00000000 00000000 00000000 00000000 00000000 00000000 ................................ 000120
00000000 00000000 00000000 00000000 00000000 00000000 00000000 00000000 ................................ 000140
00000000 00000000 00000000 00000000 00000000 00000000 00000000 00000000 ................................ 000160
00000000 00000000 00000000 00000000 00000000 00000000 00000000 00000000 ................................ 000180
00000000 00000000 00000000 00000000 00000000 00000000 00000000 00000000 ................................ 0001A0
00000000 00000000 00000000 00000000 00000000 00000000 00000000 00000000 ................................ 0001C0
00000000 00000000 00000000 00000000 00000000 00000000 00000000 00000000 ................................ 0001E0
```

```
Dump of file SATURN:[PCCOMMON.DUMP.DLL]DA-FIND.DLL;1 on 18-APR-1990 10:38:55.60
File ID (390,14,0)   End of file block 46 / Allocated 48

Virtual block number 34 (00000022), 512 (0200) bytes

00000000 00000000 00000000 00000000 00000000 00000000 00000000 00000000 ................................ 000000
00000000 00000000 00000000 00000000 00000000 00000000 00000000 00000000 ................................ 000020
00000000 00000000 00000000 00000000 00000000 00000000 00000000 00000000 ................................ 000040
00000000 00000000 00000000 00000000 00000000 00000000 00000000 00000000 ................................ 000060
00000000 00000000 00000000 00000000 00000000 00000000 00000000 00000000 ................................ 000080
00000000 00000000 00000000 00000000 00000000 00000000 00000000 00000000 ................................ 0000A0
00000000 00000000 00000000 00000000 00000000 00000000 00000000 00000000 ................................ 0000C0
00000000 00000000 00000000 00000000 00000000 00000000 00000000 00000000 ................................ 0000E0
00000000 00000000 00000000 00000000 00000000 00000000 00000000 00000000 ................................ 000100
00000000 00000000 00000000 00000000 00000000 00000000 00000000 00000000 ................................ 000120
00000000 00000000 00000000 00000000 00000000 00000000 00000000 00000000 ................................ 000140
00000000 00000000 00000000 00000000 00000000 00000000 00000000 00000000 ................................ 000160
00000000 00000000 00000000 00000000 00000000 00000000 00000000 00000000 ................................ 000180
00000000 00000000 00000000 00000000 00000000 00000000 00000000 00000000 ................................ 0001A0
00000000 00000000 00000000 00000000 00000000 00000000 00000000 00000000 ................................ 0001C0
00000000 00000000 00000000 00000000 00000000 00000000 00000000 00000000 ................................ 0001E0

Dump of file SATURN:[PCCOMMON.DUMP.DLL]DA-FIND.DLL;1 on 18-APR-1990 10:38:55.60
File ID (390,14,0)   End of file block 46 / Allocated 48

Virtual block number 35 (00000023), 512 (0200) bytes

00000000 00000000 00000000 00000000 00000000 00000000 00000000 00000000 ................................ 000000
00000000 00000000 00000000 00000000 00000000 00000000 00000000 00000000 ................................ 000020
00000000 00000000 00000000 00000000 00000000 00000000 00000000 00000000 ................................ 000040
00000000 00000000 00000000 00000000 00000000 00000000 00000000 00000000 ................................ 000060
00000000 00000000 00000000 00000000 00000000 00000000 00000000 00000000 ................................ 000080
00000000 00000000 00000000 00000000 00000000 00000000 00000000 00000000 ................................ 0000A0
00000000 00000000 00000000 00000000 00000000 00000000 00000000 00000000 ................................ 0000C0
00000000 00000000 00000000 00000000 00000000 00000000 00000000 00000000 ................................ 0000E0
00000000 00000000 00000000 00000000 00000000 00000000 00000000 00000000 ................................ 000100
00000000 00000000 00000000 00000000 00000000 00000000 00000000 00000000 ................................ 000120
00000000 00000000 00000000 00000000 00000000 00000000 00000000 00000000 ................................ 000140
00000000 00000000 00000000 00000000 00000000 00000000 00000000 00000000 ................................ 000160
00000000 00000000 00000000 00000000 00000000 00000000 00000000 00000000 ................................ 000180
00000000 00000000 00000000 00000000 00000000 00000000 00000000 00000000 ................................ 0001A0
00000000 00000000 00000000 00000000 00000000 00000000 00000000 00000000 ................................ 0001C0
00000000 00000000 00000000 00000000 00000000 00000000 00000000 00000000 ................................ 0001E0

Dump of file SATURN:[PCCOMMON.DUMP.DLL]DA-FIND.DLL;1 on 18-APR-1990 10:38:55.60
File ID (390,14,0)   End of file block 46 / Allocated 48

Virtual block number 36 (00000024), 512 (0200) bytes

00000000 00000000 00000000 00000000 00000000 00000000 00000000 00000000 ................................ 000000
00000000 00000000 00000000 00000000 00000000 00000000 00000000 00000000 ................................ 000020
00000000 00000000 00000000 00000000 00000000 00000000 00000000 00000000 ................................ 000040
00000000 00000000 00000000 00000000 00000000 00000000 00000000 00000000 ................................ 000060
00000000 00000000 00000000 00000000 00000000 00000000 00000000 00000000 ................................ 000080
00000000 00000000 00000000 00000000 00000000 00000000 00000000 00000000 ................................ 0000A0
00000000 00000000 00000000 00000000 00000000 00000000 00000000 00000000 ................................ 0000C0
00000000 00000000 00000000 00000000 00000000 00000000 00000000 00000000 ................................ 0000E0
00000000 00000000 00000000 00000000 00000000 00000000 00000000 00000000 ................................ 000100
00000000 00000000 00000000 00000000 00000000 00000000 00000000 00000000 ................................ 000120
00000000 00000000 00000000 00000000 00000000 00000000 00000000 00000000 ................................ 000140
00000000 00000000 00000000 00000000 00000000 00000000 00000000 00000000 ................................ 000160
00000000 00000000 00000000 00000000 00000000 00000000 00000000 00000000 ................................ 000180
00000000 00000000 00000000 00000000 00000000 00000000 00000000 00000000 ................................ 0001A0
00000000 00000000 00000000 00000000 00000000 00000000 00000000 00000000 ................................ 0001C0
00000000 00000000 00000000 00000000 00000000 00000000 00000000 00000000 ................................ 0001E0
```

```
Dump of file SATURN:[PCCOMMON.DUMP.DLL]DA-FIND.DLL;1 on 18-APR-1990 10:38:55.60
File ID (390,14,0)   End of file block 46 / Allocated 48

Virtual block number 37 (00000025), 512 (0200) bytes

00000000 00000000 00000000 00000000 00000000 00000000 00000000 00000000 ................................ 000000
00000000 00000000 00000000 00000000 00000000 00000000 00000000 00000000 ................................ 000020
00000000 00000000 00000000 00000000 00000000 00000000 00000000 00000000 ................................ 000040
00000000 00000000 00000000 00000000 00000000 00000000 00000000 00000000 ................................ 000060
00000000 00000000 00000000 00000000 00000000 00000000 00000000 00000000 ................................ 000080
00000000 00000000 00000000 00000000 00000000 00000000 00000000 00000000 ................................ 0000A0
00000000 00000000 00000000 00000000 00000000 00000000 00000000 00000000 ................................ 0000C0
00000000 00000000 00000000 00000000 00000000 00000000 00000000 00000000 ................................ 0000E0
00000000 00000000 00000000 00000000 00000000 00000000 00000000 00000000 ................................ 000100
00000000 00000000 00000000 00000000 00000000 00000000 00000000 00000000 ................................ 000120
00000000 00000000 00000000 00000000 00000000 00000000 00000000 00000000 ................................ 000140
00000000 00000000 00000000 00000000 00000000 00000000 00000000 00000000 ................................ 000160
00000000 00000000 00000000 00000000 00000000 00000000 00000000 00000000 ................................ 000180
00000000 00000000 00000000 00000000 00000000 00000000 00000000 00000000 ................................ 0001A0
00000000 00000000 00000000 00000000 00000000 00000000 00000000 00000000 ................................ 0001C0
00000000 00000000 00000000 00000000 00000000 00000000 00000000 00000000 ................................ 0001E0

Dump of file SATURN:[PCCOMMON.DUMP.DLL]DA-FIND.DLL;1 on 18-APR-1990 10:38:55.60
File ID (390,14,0)   End of file block 46 / Allocated 48

Virtual block number 38 (00000026), 512 (0200) bytes

00000000 00000000 00000000 00000000 00000000 00000000 00000000 00000000 ................................ 000000
00000000 00000000 00000000 00000000 00000000 00000000 00000000 00000000 ................................ 000020
00000000 00000000 00000000 00000000 00000000 00000000 00000000 00000000 ................................ 000040
00000000 00000000 00000000 00000000 00000000 00000000 00000000 00000000 ................................ 000060
00000000 00000000 00000000 00000000 00000000 00000000 00000000 00000000 ................................ 000080
00000000 00000000 00000000 00000000 00000000 00000000 00000000 00000000 ................................ 0000A0
00000000 00000000 00000000 00000000 00000000 00000000 00000000 00000000 ................................ 0000C0
00000000 00000000 00000000 00000000 00000000 00000000 00000000 00000000 ................................ 0000E0
00000000 00000000 00000000 00000000 00000000 00000000 00000000 00000000 ................................ 000100
00000000 00000000 00000000 00000000 00000000 00000000 00000000 00000000 ................................ 000120
00010000 00000000 00000000 00000000 00000000 00000000 00000000 00000000 ................................ 000140
00000000 00000000 00000000 00000000 00000000 00000000 00000000 00000200 ................................ 000160
00000000 00000000 00000000 00000000 00000000 00000000 00000000 00000000 ................................ 000180
00000000 00000000 00000000 00000000 00000000 00000000 00000000 00000000 ................................ 0001A0
00000000 00000000 00000000 00000000 00000000 00000000 00000000 00000000 ................................ 0001C0
00000000 00000000 00000000 00000000 00000000 00000000 00000000 00000000 ................................ 0001E0

Dump of file SATURN:[PCCOMMON.DUMP.DLL]DA-FIND.DLL;1 on 18-APR-1990 10:38:55.60
File ID (390,14,0)   End of file block 46 / Allocated 48

Virtual block number 39 (00000027), 512 (0200) bytes

00000000 00000000 00000000 00000000 00000000 00000000 00000000 00000000 ................................ 000000
00000000 00000000 00000000 00000000 00000000 00000000 00000000 00000000 ................................ 000020
00000000 00000000 00000000 00000000 00000000 00000000 00000000 00000000 ................................ 000040
00000000 00000000 00000000 00000000 00000000 00000000 00000000 00000000 ................................ 000060
00000000 00000000 00000000 00000000 00000000 00000000 00000000 00000000 ................................ 000080
00000000 00000000 00000000 00000000 00000000 00000000 00000000 00000000 ................................ 0000A0
00000000 00000000 00000000 00000000 00000000 00000000 00000000 00000000 ................................ 0000C0
00000000 00000000 00000000 00000000 00000000 00000000 00000000 00000000 ................................ 0000E0
00000000 00000000 00000000 00000000 00000000 00000000 00000000 00000000 ................................ 000100
00000000 00000000 00000000 00000000 00000000 00000000 00000000 00000000 ................................ 000120
00000000 00000000 00000000 00000000 00000000 00000000 00000000 00000000 ................................ 000140
00000000 00000000 00000000 00000000 00000000 00000000 00000000 00000000 ................................ 000160
00000000 00000000 00000000 00000000 00000000 00000000 00000000 00000000 ................................ 000180
00000000 00000000 00000000 00000000 00000000 00000000 00000000 00000000 ................................ 0001A0
00000000 00000000 00000000 00000000 00000000 00000000 00000000 00000000 ................................ 0001C0
00000000 00000000 00000000 00000000 00000000 00000000 00000000 00000000 ................................ 0001E0
```

```
Dump of file SATURN:[PCCOMMON.DUMP.DLL]DA-FIND.DLL;1 on 18-APR-1990 10:38:55.60
File ID (390,14,0)   End of file block 46 / Allocated 48

Virtual block number 40 (00000028), 512 (0200) bytes

00000000 00000000 00000000 00000000 00000000 00000000 00000000 00000000 ................................ 000000
00000000 00000000 00000000 00000000 00000000 00000000 00000000 00000000 ................................ 000020
00000000 00000000 00000000 00000000 00000000 00000000 00000000 00000000 ................................ 000040
00000000 00000000 00000000 00000000 00000000 00000000 00000000 00000000 ................................ 000060
00000000 00000000 00000000 00000000 00000000 00000000 00000000 00000000 ................................ 000080
00000000 00000000 00000000 00000000 00000000 00000000 00000000 00000000 ................................ 0000A0
00000000 00000000 00000000 00000000 00000000 00000000 00000000 00000000 ................................ 0000C0
00000000 00000000 00000000 00000000 00000000 00000000 00000000 00000000 ................................ 0000E0
00000000 00000000 00000000 00000000 00000000 00000000 00000000 00000000 ................................ 000100
00000000 00000000 00000000 00000000 00000000 00000000 00000000 00000000 ................................ 000120
00000000 00000000 00000000 00000000 00000000 00000000 00000000 00000000 ................................ 000140
00000000 00000000 00000000 00000000 00000000 00000000 00000000 00000000 ................................ 000160
00000000 00000000 00000000 00000000 00000000 00000000 00000000 00000000 ................................ 000180
00000000 00000000 00000000 00000000 00000000 00000000 00000000 00000000 ................................ 0001A0
00000000 00000000 00000000 00000000 00000000 00000000 00000000 00000000 ................................ 0001C0
00000000 00000000 00000000 00000000 00000000 00000000 00000000 00000000 ................................ 0001E0

Dump of file SATURN:[PCCOMMON.DUMP.DLL]DA-FIND.DLL;1 on 18-APR-1990 10:38:55.60
File ID (390,14,0)   End of file block 46 / Allocated 48

Virtual block number 41 (00000029), 512 (0200) bytes

00000000 00000000 00000000 00000000 00000000 00000000 00000000 00000000 ................................ 000000
00000000 00000000 00000000 00000000 00000000 00000000 00000000 00000000 ................................ 000020
00000000 00000000 00000000 00000000 00000000 00000000 00000000 00000000 ................................ 000040
00000000 00000000 00000000 00000000 00000000 00000000 00000000 00000000 ................................ 000060
00000000 00000000 00000000 00000000 00000000 00000000 00000000 00000000 ................................ 000080
00000000 00000000 00000000 00000000 00000000 00000000 00000000 00000000 ................................ 0000A0
00000000 00000000 00000000 00000000 00000000 00000000 00000000 00000000 ................................ 0000C0
00000000 00000000 00000000 00000000 00000000 00000000 00000000 00000000 ................................ 0000E0
00000000 00000000 00000000 00000000 00000000 00000000 00000000 00000000 ................................ 000100
00000000 00000000 00000000 00000000 00000000 00000000 00000000 00000000 ................................ 000120
00000000 02281242 00000000 00000000 00000000 00000000 00000000 00000000 ........................B.(..... 000140
00000000 00000000 00000000 00008181 81010000 00010000 00000000 00000000 ................................ 000160
00000000 00000000 00000000 00000000 00000000 00000000 00000000 00000000 ................................ 000180
00000000 00000000 00000000 00000000 00000000 00000000 00000000 00000000 ................................ 0001A0
00000000 00000000 00000000 00000000 00000000 00000000 00000000 00000000 ................................ 0001C0
00000000 00000000 00000000 00000000 00000000 00000000 00000000 00000000 ................................ 0001E0

Dump of file SATURN:[PCCOMMON.DUMP.DLL]DA-FIND.DLL;1 on 18-APR-1990 10:38:55.60
File ID (390,14,0)   End of file block 46 / Allocated 48

Virtual block number 42 (0000002A), 512 (0200) bytes

00000000 00000000 00000000 00000000 00000000 00000000 00000000 00000000 ................................ 000000
00000000 00000000 00000000 00000000 00000000 00000000 00000000 00000000 ................................ 000020
00000000 00000000 00000000 00000000 00000000 00000000 00000000 00000000 ................................ 000040
0A0A0A0A 0A0A0A0A 0A0A0A0A 0A0A0A0A 0A000000 00000000 00000000 00000000 ................................ 000060
0A0A0A0A 0A0A0A0A 0A0A0A0A 0A0A0A0A 0A0A0A0A 0A0A0A0A 0A0A0A0A 0A0A0A0A ................................ 000080
0A0A0A0A 0A0A0A0A 0A0A0A0A 0A0A0A0A 0A0A0A0A 0A0A0A0A 0A0A0A0A 0A0A0A0A ................................ 0000A0
0A0A0A0A 0A0A0A0A 0A0A0A0A 0A0A0A0A 0A0A0A0A 0A0A0A0A 0A0A0A0A 0A0A0A0A ................................ 0000C0
0A0A0A0A 0A0A0A0A 0A0A0A0A 0A0A0A0A 0A0A0A0A 0A0A0A0A 0A0A0A0A 0A0A0A0A ................................ 0000E0
0A0A0A0A 0A0A0A0A 0A0A0A0A 0A0A0A0A 0A0A0A0A 0A0A0A0A 0A0A0A0A 0A0A0A0A ................................ 000100
0A0A0A0A 0A0A0A0A 0A0A0A0A 0A0A0A0A 0A0A0A0A 0A0A0A0A 0A0A0A0A 0A0A0A0A ................................ 000120
0A0A0A0A 0A0A0A0A 0A0A0A0A 0A0A0A0A 0A0A0A0A 0A0A0A0A 0A0A0A0A 0A0A0A0A ................................ 000140
00000000 00000000 00000000 00000000 000A0A0A 0A0A0A0A 0A0A0A0A 0A0A0A0A ................................ 000160
00000000 00000000 00000000 20000000 00000000 00000000 00000000 00000000 ................................ 000180
0D303030 36520000 3E3E4753 4D4E3C3C FFFF1A9A 1A98FFFF 064C1552 00000000 ....R.L.........<<NMSG>>..R6000. 0001A0
6920200A 0D333030 36520003 000A0D77 6F6C6672 65766F20 6B636174 7320200A .- stack overflow.... R6003..- i 0001C0
202D0A00 38303036 52000800 0A0D3020 79622065 64697669 64207265 6765746E nteger divide by 0.... 96008..-  0001E0
```

```
Dump of file SATURN:[PCCOMMON.DUMP.DLL]DA-FIND.DLL;1 on 18-APR-1990 10:38:55.60
File ID (390,14,0)    End of file block 46 / Allocated 48

Virtual block number 43 (0000002B), 512 (0200) bytes

0A0D7374 6E656D75 67726120 726F6620 65636170 73206867 756F6E65 20746F6E not enough space for arguments.. 000000
726F6620 65636170 73206867 756F6E65 20746F6E 202D0A0D 39303036 52000900 ...R6009..- not enough space for 000020
65206560 697'206E 757200FF 000A0D00 FC000A0D 746E6560 6E6F7269 766E6520  environment...*......run-time e 000040
20746E69 6F702067 6E697461 6F6C6620 200A0032 30303652 00020020 726F7272 rror ...R6002..- floating point  000060
0008065C 00020000 00071A96 00020003 FFFFFF00 0A0D6465 64616F6C 20746F6E not loaded...................\... 000080
6F206574 656C6564 206C6C75 46350352 00000000 00000000 0009184A 00020000 ....J...........R.5Full delete o 0000A0
6E6F6974 616D726F 666E4920 65687420 6D6F7266 20732520 79746974 6E452066 f Entity %s from the Information 0000C0
20732520 74657350 20666F20 6574656C 6564206C 6C754633 002E6C65 646F4D20  Model..3Full delete of Pset %s  0000E0
6C754632 002E6C65 646F4D20 6E6F6974 616D726F 666E4920 65687420 6D6F7266 from the Information Model..2Ful 000100
6F666E49 20656874 206D6F72 66207325 2079654B 20666F20 6574656C 6564206C l delete of Key %s from the Info 000120
4120666F 20657465 6C656420 6C6C7546 37002E6C 65646F4D 206E6F69 74616D72 rmation Model..7Full delete of A 000140
206F6974 616D726F 666E4920 65687420 6D6F7266 20732520 65747562 69727474 ttribute %s from the Informatio 000160
6E6F6973 6E656D69 4420666F 20657465 6C656420 6C6C7546 38002E6C 65646F4D Model..8Full delete of Dimension 000180
002E6C65 646F4D20 6E6F6974 616D726F 666E4920 65687420 6D6F7266 20732520  %s from the Information Model.. 0001A0
7420606F 72662073 25206E69 616D6F44 20666F20 6574656C 6564206C 6C754635 5Full delete of Domain %s from t 0001C0
00010001 00010001 0001002E 6C65646F 4D206E6F 69746160 726F666E 49206568 he Information Model............ 0001E0

Dump of file SATURN:[PCCOMMON.DUMP.DLL]DA-FIND.DLL;1 on 18-APR-1990 10:38:55.60
File ID (390,14,0)    End of file block 46 / Allocated 48

Virtual block number 44 (0000002C), 512 (0200) bytes

00000000 FFFF0001 000E0352 000001F7 00000000 00000001 00010001 00010001 ................%...R........... 000000
00000000 01A5FFFF 003300AB 00E0FFD1 00359400 00900194 00100001 0000000C ..............5.1.A.".3...E..... 000020
00000000 0000FFFF FFFF0064 00080044 009B0000 80010001 01A9000C 00050000 ......`.........D...d........... 000040
00050000 00000000 FFFFFFFF 006E0008.00C0008E 000F8002 00080186 00000006 ....R.........A...n............. 000060
00000007 00000000 0000FFFF FFFF0078 00080028 007F000F 80010001 01B70007 ..n.........(...x............... 000080
01C00007 00050000 00000000 FFFFFFFF 00820032 00C2004C 00118002 000001BF e.........L.ö.2................A. 0000A0
000201C8 00050003 00000000 0000FFFF FFFF00C8 001A00C0 00250011 80030002 ......X.à...à...............à... 0000C0
80020002 01CE0007 00030000 00000000 FFFFFFFF 0096000A 001E002B 00198002 ....+....................ö...... 0000E0
006A8002 000201D6 00070003 00000000 0000FFFF FFFF00A0 00000027 002A003C <.*.'.....................*.....j. 000100
002B0099 80020002 01DE0009 00030000 00000000 FFFFFFFF 008C000A 0029002B +.).....................B.......+. 000120
00260005 001B8003 040001E8 00020003 00000000 0000FFFF FFFF0084 000A0033 3...Ç..............ò.........&. 000140
000C0026 0006005B 80030000 01E80006 00030000 00000000 FFFFFFF 0046000C ..F...............$.....[...&... 000160
005A000C 00260005 00978003 010001F2 00040003 00000000 0000FFFF FFFF0050 P...........................&...Z. 000180
20746365 6A62- 00 00000300 7463656A 626F206E 61206573 6F6F6843 FFFFFFFF ....Choose an object.....Object  0001A0
447E0074 69644;7E 00736E6F 69746341 00007374 63656A62 4F00003A 6560616E name:..Objects..Actions.-Edit.-D 0001C0
65636E61 43004B4F 00746365 6C657365 7E440074 63656C65 537E0065 74656C65 elete.-Select.D-eselect.OK.Cance 0001E0

Dump of file SATURN:[PCCOMMON.DUMP.DLL]DA-FIND.DLL;1 on 18-APR-1990 10:38:55.60
File ID (390,14,0)    End of file block 46 / Allocated 48

Virtual block number 45 (0000002D), 512 (0200) bytes

00000000 FFFF0001 000E0352 000001DE 00000000 00000000 0000706C 6548006C l.Help..........B...R........... 000000
00000000 0150FFFF 001400B8 00ECFFB8 00261400 0090013A 00150001 00000009 ........:......&.E.&.;.....P..... 000020
00000000 0000FFFF FFFF00CA 0047008D 00610013 80020000 01540000 00070000 ......T.......a.§.G.ò........... 000040
00030000 00000000 FFFFFFFF 00C90008 004A00A9 00138001 00010155 000F0005 ......U........`.J...è............ 000060
00060003 00000000 0000FFFF FFFF0065 000C0026 00050013 80020400 01650002 ..e.........&...e............... 000080
016F0004 00030000 00000000 FFFFFFFF 0066000C 00260005 00778002 00000168 h.......w...&...f...............o. 0000A0
00020174 00000005 00000000 0000FFFF FFFF0067 000C0026 000500A9 80020000 ....`...&...g.................t... 0000C0
80020002 01820C:1 00030000 00000000 FFFFFFFF 00780038 008C001F 00128003 ......¥.8.x..................... 0000E0
001F8002 00020194 00200003 00000000 0000FFFF FFFF0072 000A0051 0043001E ..C.Q...r....................... 000100
002A001F 80020002 01B50028 00030000 00000000 FFFFFFFF 0070000A 00910037 7.....p.............(.ç.......*. 000120
00657079 74207463 656A626F 206E6120 65736F6F 6843FFFF FFFF006E 000A00A7 I...n.....Choose an object type. 000140
48006C65 636E6143 004B4F00 73657079 74207463 656A626F 20414400 00000003 .....DA object types.OK.Cancel.H 000160
656A626F 206C6C61 7E207473 694C0061 69726574 69726320 7473694C 00706C65 elp.List criteria.List -all obje 000180
20746365 6C65737E 20656874 206E6F20 73746365 6A626F20 7473694C 00737463 cts.List objects on the -select  0001A0
68742065 6C626973 69762073 7463656A 626F206C 6C612074 73694C00 7473696C list.List all objects visible th 0001C0
00000000 FFFF0001 000E0352 00000190 00000072 65746C69 667E2068 67756F72 rough -filter.......R........... 0001E0
```

```
Dump of file SATURN:[PCCOMMON.DUMP.DLL]DA-FIND.DLL;1 on 18-APR 1990 10:38:55.60
File ID (390,14,0)   End of file block 46 / Allocated 48

Virtual block number 46 (0000002E), 512 (0200) bytes

 00000000 0113FFFF 04800063 00EC000C 00259400 009000FE 00140001 00000007 ........±.....X...&.c.¯......... 000000
 00000000 0000FFFF FFFF03E8 0038008C 001F0012 80030002 01170000 00050000 ..................¥.8.Ö........... 000020
 00030000 00000000 FFFFFFFF 046A000A 00510043 001E8002 00020125 00110003 ....X.......C.Q...j............. 000040
 00280003 00300000 0000FFFF FFFF0460 000A0091 0037001F 80020002 01370020  .7.......7.....'.............(. 000060
 01810002 00030000 00000000 FFFFFFFF 0456000A 00A7002A 001F8002 00020158 X.......*.1...V................. 000080
 00000184 00060003 00000000 0000FFFF FFFF03F2 000C0026 0008001B 80020400 ........&...·................... 0000A0
 80020000 01880004 00030000 00000000 FFFFFFFF 03FC000C 0026000C 00638002 ..c...&...•..................... 0000C0
 79742074 73696C20 65687420 65736F6F 6843FFFF FFFF0406 000C0026 000C00A1 Å...&.........Choose the list ty 0000E0
 6F206C6C 617E2074 73694C00 61697265 74697263 20747369 4C000000 03006570 pe.....List criteria.List ~all o 000100
 656C6573 7E206568 74206E6F 20737463 656A626F 20747369 4C007374 63656A62 bjects.List objects on the ~sele 000120
 656C6269 73697620 73746365 6A626F20 6C6C6120 7473694C 00747369 6C207463 ct list.List all objects visible 000140
 00706C65 48006C65 636E6143 00484F00 7265746C 69667E20 6867756F 72687420  through ~filter.OK.Cancel.Help. 000160
 00000000 00000000 00000000 00000000 00000000 00000000 00000000 00000000 ................................ 000180
 00000000 00000000 00000000 00000000 00000000 00000000 00000000 00000000 ................................ 0001A0
 00000000 00000000 00000000 00000000 00000000 00000000 00000000 00000000 ................................ 0001C0
 00000000 00000000 00000000 00000000 00000000 00000000 00000000 00000000 ................................ 0001E0

Dump of file SATURN:[PCCOMMON.DUMP.DLL]DA-IMPRT.DLL;1 on 18-APR-1990 10:39:02.20
File ID (459,7,0)   End of file block 93 / Allocated 96

Virtual block number 1 (00000001), 512 (0200) bytes

 00000000 00000040 00000000 00000088 0000FFFF 00000004 0000005D 01CE5A4D MZö.)...........|.... ..a....... 000000
 00000080 00000000 00000000 00000000 00000000 00000000 00000000 00000000 ................................ 000020
 6F6E6E61 63206D61 72676F72 70207369 685421CD 4C01B821 CD09B400 0EBA1F0E ..¤..Ç.èl|.LèlThis program canno 000040
 00000000 00000024 0A0D0D2E 65646F60 20534F44 206E6920 6E757220 65622074 t be run in DOS mode....$....... 000060
 000A0006 00000000 00030000 00000000 00068002 7411E4BC 00070209 0505454E NE..)...¥ö.t.................... 000080
 00000000 00000000 00010000 00040000 00000360 009B0087 00700070 00400010 ..a.p.p.....'................... 0000A0
 45470F00 4547053B 000F0F00 000F0539 308A0F00 308A021E 1DF00F00 1DF00037 7.Þ...Þ...¤0..¤09.......;.GE..GE 0000C0
 4D494144 08000074 72706069 2D616408 2A400F01 2014099A 02060E01 00000000 ........... ..a*.da-imprt...DAIM 0000E0
 574D5005 00021802 00016901 52012800 E4002F00 10000700 01000001 54524F50 PORT........./.ô.(.R.i.......PMW 000100
 45400C4B 434F4C42 434F4C4C 414D454D 0040454D 03534C4C 4143534F 44084E49 IN.DOSCALLS.MEM.MEMALLOCBLOCK.ME 000120
 54534C4D 440A4E58 54545241 54534C4D 44086C6D 64034B43 4F4C4245 4552464D MFREEBLOCK.dml.DMLSTARTTXN.DMLST 000140
 4555514C 4D440045 4C444E41 484C4544 4F405952 4555514C 4044134E 5854504F OPTXN.DMLQUERYMODELHANDLE.DMLQUE 000160
 4C454946 5445534C 4D440844 4C454946 59524555 514C4D44 00544E55 4F435952 RYCOUNT.DMLQUERYFIELD.DMLSETFIEL 000180
 49534C40 440F4E4C 52595245 55514C4D 44085445 53454C50 4D49534C 4D440C44 D.DMLSIMPLESET.DMLQUERYRLN.DMLSI 0001A0
 45544145 52434C4D 44115453 494C4545 52464C4D 44084554 414C4552 454C504D MPLERELATE.DMLFREELIST.DMLCREATE 0001C0
 03545845 54455449 52574C4D 440C4554 41455243 4C4D4409 4540414E 48544957 WITHNAME.DMLCREATE.DMLWRITETEXT. 0001E0

Dump of file SATURN:[PCCOMMON.DUMP.DLL]DA-IMPRT.DLL;1 on 18-APR-1990 10:39:02.20
File ID (459,7,0)   End of file block 93 / Allocated 96

Virtual block number 2 (00000002), 512 (0200) bytes

 55104D45 54494444 41474142 4C54550D 454B414D 4E554741 424C5455 0C545544 DUT.UTLBAGUNMAKE.UTLBAGADDITEM.U 000000
 52554345 54415245 54494741 424C5455 13524F53 52554354 494E4947 41424C54 TLBAGINITCURSOR.UTLBAGITERATECUR 000020
 55514954 4712574F 444E4957 4C4F4F54 59524555 51495447 12495447 03524F53 SOR.GTI.GTIQUERYTOOLWINDOW.GTIQU 000040
 51455345 4D414E53 4C4E4144 10736C6E 61640554 4E455241 504C4F4F 54595245 ERYTOOLPARENT.danls.DANLSNAMESEQ 000060
 53455441 4552434D 41440C54 4E454554 41455243 4D41440C 60616403 504C4155 UALP.dam.DAMCREATEENT.DAMCREATES 000080
 53525454 41544345 4E4E4F43 4D41440F 52545441 45544145 52434D41 44004E59 YN.DAMCREATEATTR.DAMCONNECTATTRS 0000A0
 52434D41 440C 349 44455441 4552434D 41440C59 454B4554 41455243 4D41440C .DAMCREATEKEY.DAMCREATEDIM.DAMCR 0000C0
 4F434544 4D414412 5345544F 4E414445 54414552 434D4144 10404F44 45544145 EATEDOM.DAMCREATEDANOTES.DAMDECO 0000E0
 4C414E41 06525245 594E4154 414D524F 46404144 0F44574B 45544F4E 41444544 DEDANOTEKWD.DAMFORMATANYERR.ANAL 000100
 084E4550 4F534F44 074F4953 0331334F 54313245 4D414E54 554C414E 41105455 UT.ANALUTNAME21T031.SIO.DOSOPEN. 000120
 00000000 01010144 41455253 4F440745 54495257 534F4408 45534F4C 43534F44 DOSCLOSE.DOSWRITE.DOSREAD....... 000140
 FEE486C7 D88EFFFF B81E5657 000230C8 0000004C 4C442E74 72706069 2061640C .da-imprt.DLL...à0..WV.|...Äú.Ö± 000160
 E9FE5286 880007E9 03750000 3D00461C C89A5016 FEE6868D 0C76FF0E 76FF0080 ...v..v...|±.P.à.F.=..u.Ö....R±Ö 000180
 30FE5286 8906C483 FFFF107C 9A1076FF 0042681E 0028E903 7400FEE6 8E830206 .../|±.t.Ö(..hB..v..|.....á...R±= 0001A0
 5016FEE8 86800676 FF0876FF 0104E900 008801DA E9FE5286 880007E9 03750000 ..u.Ö....R±ÖÖ.|..Öå..v..v...Ö±.P 0001C0
 FC5689FA 468908C4 8300CE00 EA9A5016 FEE88680 006E681E 08C48300 8502569A .V....á..hn...Ö±.P.ô.ö..á..f*.V= 0001E0
```

Dump of file SATURN:[PCCOMMON.DUMP.DLL]DA-IMPRT.DLL;1 on 18-APR-1990 10:39:02.20
File ID (459,7,0)   End of file block 93 / Allocated 96

Virtual block number 3 (00000003), 512 (0200) bytes

FE528689 0000FFFF 9A007068 1E0C76FF 0E76FF01 9BE90001 B80006E9 03740008 .Àt.Ö..¡..Ö...v..v..hp........R‡ 000000
00E00256 9A50.6FE 54868050 16FEE886 800179E9 FE52868B 0007E903 75000030 =..u.Ö....R‡Öy...Ö‡.P..T‡.P.V.Å. 000020
9A5016FE 54868000 79681E08 C48300F2 03D69A50 16FE5486 80007768 1E08C483 .á..hw...T‡.P.ø.·..á..hy...T‡.P. 000040
00A3261E A6068E08 C483FFFF 00EA9A50 16FE5486 80007E68 1E08C483 01040210 .....á..h-...T‡.P.Ö....á...Ì.&E. 000060
76FF0E76 FF0AC483 01930000 9A0C76FF 0E76FF50 160A4680 006A0002 16892600 .&....j..F..P.v..v.......á..v..v 000080
B6FF005C E9037500 0030FE52 86890AC4 83018502 3F9AFA76 FFFC76FF 0A76FF0C ..v..v=.vª.?....á...R‡=..u.Ö\..Ñ 0000A0
16FD0086 80008068 !55016FF 78868000 00FFFF9A 5016FF78 868DFEE4 B6FFFE52 R‡.ÑÖ‡..x..P.......x..P.h....Å». 0000C0
0C76FF0E 76FF06C4 8301E41D 7C9A1076 FF5016FF 7886800C C48301B3 03569A50 P.V.°..á...x..P.v..|.Ö..á..v..v. 0000E0
FA76FFFC 76FF008E E9FE5286 88000002 1B9A0C76 FF0E76FF 04C48302 U. 'A6D9A .mª...á..v..v........R‡Ö...v=.vª 000100
0C76FF0E 76FF0035 E9037500 02060826 0000A126 1EA6068E 04C48301 FAC.109A ...ª..á...Ì.&À..&....u.Ö5..v..v. 000120
36FF261E A6068E0A C4830021 023F9A00 0036FF26 000236FF 261EA606 8E0A76FF .v...Ì.&.6..&.6...?.!..á...Ì.&.6 000140
FF00009A 0C76FF0E 76FF5016 0A468012 6A04C483 00730010 9A000036 FF260002 ..&.6.....s..á.j..F..P.v..v..... 000160
E9FE5286 880007E9 03750000 30FE5286 890000FF FF9A0C76 FF0E76FF 0AC483FF ..á..v..v........R‡=..u.Ö....R‡Ö 000180
0000FC46 C7D88E00 08B81E56 57000016 C8000CCA C95F5E1F 0000E900 00880006 ..¡..Ö...^_èò..à...WV.¡...ÁúF=.. 0001A0
B80006E9 03750000 3D0000FF FF9A5016 EA468002 0068006A 0A76FF00 00EE46C7 úFŸ...v.j.ħ...Fö.P.....=..u.Ö..¡ 0001C0
C40000FA 46C7FE46 89F84689 0000B8F6 5689F446 89EC568B EA468B01 85E90001 ..Öç..Fö.V$.F¶.V-¡...F½.F‡úFª..á 0001E0

Dump of file SATURN:[PCCOMMON.DUMP.DLL]DA-IMPRT.DLL;1 on 18-APR-1990 10:39:02.20
File ID (459,7,0)   End of file block 93 / Allocated 96

Virtual block number 4 (00000004), 512 (0200) bytes

048A2602 478E2607 FF26378B 26065EC4 0013E903 7D00047F 8326044F FF26065E ^.&.O.&....).Ö..á^.&.7&..&.G.&.. 000000
7422F27E 80014BE9 0375C0FE F2468804 C4830174 011E9A06 76FF0876 FF000EE9 Ö...v..v....t..á..F·‡àu.ÖK..-·"t 000020
E90001EE 46C70005 E9037500 FC7E8301 FA768300 15E90374 00EE7E83 001EE903 .Ö...-Ÿ.t.Ö...vª..-e.u.Ö..úFŸ..Ö 000040
03880006 E9078826 F2468AF4 46FFF45E C4000FE9 037C01FF FE7E81FE 46FF0022 "..F‡.-‡..|.Ö..á^¶.F¶.F·&..Ö..¡. 000060
8800E4E9 03740AF2 7E800009 E9037500 FA7E8300 09E90374 2CF27E80 0116E900 .Ö...-·,t.Ö...-ª.u.Ö...-·.t.ÖÖ.. 000080
830007C6 26F45EC4 F44EFF00 03E90375 EC563900 08E90374 EA4639F6 568BF446 F¶.V-9Föt.Ö..9V$u.Ö...N¶á^¶&ó... 0000A0
EA5EC4FE 76880008 E9037F00 FE7E8300 14E90374 0AF27E80 0010E903 7500EE7E -Ÿ.u.Ö...-·.t.Ö...-‡...Ö...v‡á^ö 0000C0
83F04689 04C48303 C7042F9A EA76FFEC 76FF0020 E903740A F27E8000 FE40C626 &óø‡..-·.t.Ö ..v$.vö./.ú..á..Fþ. 0000E0
FF0000FE 46C7F656 89F44689 EC568BEA 4688008C E9F0468B 0006E903 7500F07E -þ.u.Ö...FþÖ...Fö.V$.F¶.V-úF‡... 000100
83F04689 0CC48304 01068A9A F846FFF8 76FFEA76 FFEC76FF 0A76FF0C 76FF0E76 v..v..v..v$.vö.V½.F½......á..Fþ. 000120
00FA46C7 0000F846 C70014E9 03740AF2 7E80004C E9F0468B 0006E903 7500F07E -þ.u.Ö...FþÖL..-·.t.Ö..úF½..úFª. 000140
46C70005 E9037500 003D02C4 83013009 A59AF876 FF0000EE 46C70000 FC46C700 .úF=..úFŸ...v½.Ë.=..á.=..u.Ö..úF 000160
C8C8C95F 5E1F0000 E90000B8 0000FFFF 9AEA76FF EC76FF0A 76FFFE79 E90001FC =..Öy‡.v..v$.vö.....|..Ö...^_èùà 000180
83047002 8C9A0676 FF0876FF 0092681E 0000FE46 C7D88E02 47B81E56 57000002 ...WV.¡G..ÁúF‡...h...v..v....p.. 0001A0
028C9A06 76FF0876 FF009D68 1E021CE9 00020090 06C70009 E9037400 003D08C4 á.=..t.Ö..ú.....Ö...h...v..v.... 0001C0
0676FF08 76FF00A8 681E01F9 E9000300 9006C700 09E90374 00003008 C4830493 ...á.=..t.Ö..ú.....Öª..h´..v..v. 0001E0

Dump of file SATURN:[PCCOMMON.DUMP.DLL]DA-IMPRT.DLL;1 on 18-APR-1990 10:39:02.20
File ID (459,7,0)   End of file block 93 / Allocated 96

Virtual block number 5 (00000005), 512 (0200) bytes

0876FF00 82681E01 D6E90007 009006C7 0009E903 7400003D 08C48304 86028C9A ...Ñ..á.=..t.Ö..ú.....Öø..hý..v. 000000
00BC681E 0183E900 06009006 C70009E9 03740000 3D08C483 04D9028C 9A0676FF .v....1..á.=..t.Ö..ú.....Ö°..h¥. 000020
1E0190E9 00080090 06C70009 E9037400 003D08C4 8304FC02 8C9A0676 FF0876FF .v..v....=..á.=..t.Ö..ú.....Ö... 000040
E9000900 9006C700 09E90374 00003D08 C483051F 028C9A06 76FF0876 FF00C468 há..v..v.......á.=..t.Ö..ú.....Ö 000060
009006C7 0009E903 7400003D 08C48305 42028C9A 0676FF08 76FF0000 681E0160 m..hÅ..v..v....B..á.=..t.Ö..ú... 000080
C70009E9 03740000 3D08C483 0565028C 9A0676FF 0876FF00 D0681E01 4AE9000A ..ÖJ..hÎ..v..v....e..á.=..t.Ö..ú 0000A0
E9037400 003D08C4 83058802 8C9A0676 FF0876FF 00E5681E 0127E900 04009006 .....Ö'..hÍ..v..v.......á.=..t.Ö 0000C0
00003D08 C48305AB 028C9A06 76FF0876 FF00F068 1E0104E9 00050090 06C70009 ..ú.....Ö...hþ..v..v....¨..á.=.. 0000E0
08C48305 CE028C9A 0676FF08 76FF00FD 681E00E1 E9000800 9006C700 09E90374 t.Ö..ú.....ÖÅ..h»..v..v....ö..á. 000100
05F1028C 9A0676FF 0876FF01 09681E00 8EE9000C 009006C7 0009E903 7400003D =..t.Ö..ú.....Öƒ..h...v..v....þ. 000120
8C9A0676 FF0876FF 0116681E 009BE900 00009006 C70009E9 03740000 3D08C483 .á.=..t.Ö..ú.....Ö...h...v..v... 000140
76FF0876 FF012268 1E0078E9 000E0090 06C70009 E9037400 003D08C4 83028C02 .¥..á.=..t.Ö..ú.....Öx..h"..v..v 000160
76FF0120 681E0055 E9000F00 9006C700 09E90374 00003D08 C4830637 028C9A06 ....7..á.=..t.Ö..ú.....ÖU..h·..v 000180
3A681E00 32E90010 009006C7 0009E903 7400003D 08C48306 5A028C9A 0676FF08 ..v....2..á.=..t.Ö..ú.....ÖZ..h: 0001A0
000FE900 11009006 C70009E9 03740000 3D08C483 044D028C 9A0676FF 0876FF01 ..v..v....M..á.=..t.Ö..ú.....Ö.. 0001C0
56570000 02C8C8C9 5F5E1F00 00E9FE46 880005FE 46C70005 E9037400 00903E83 .>...t.Ö..úF‡...F‡Ö...^_èùà...WV 0001E0

```
Dump of file SATURN:[PCCOMMON.DUMP.DLL]DA-IMPRT.DLL;1 on 18-APR-1990 10:39:02.20
File ID (459,7,0)   End of file block 93 / Allocated 96

Virtual block number 6 (00000006), 512 (0200) bytes

 76FF0C76 FF0E76FF 1076FF00 20E90374 0200903E 830000FE 46C7088E 0437B81E .¡7..ÄüF±...>...t.Õ ..v..v..v..v 000000
 FF0020E9 03740300 903E8302 D5E9FE46 890CC483 06E40860 9A0676FF 0876FF0A ..v..v..m.Õ..á..F±Õ{..>...t.Õ .. 000020
 8302A8E9 FE46890C C483070E 0CF99A06 76FF0876 FF0A76FF 0C76FF0E 76FF1076 v..v..v..v..v..v..⁴....á..F±Õ¨.. 000040
 07380E0E 9A0676FF 0876FF0A 76FF0C76 FF0E76FF 1076FF00 20E90374 0700903E >...t.Õ ..v..v..v..v..v..v....8. 000060
 FF0A76FF 0C76FF0E 76FF1076 FF0020E9 03740600 903E8302 81E9FE46 890CC483 .á..F±Õ...>...t.Õ ..v..v..v..v.. 000080
 1076FF00 20E90374 0800903E 830257E9 FE46890C C4830762 0F3C9A06 76FF0876 v..v..<.b..á..F±ÕW..>...t.Õ ..v. 0000A0
 903E8302 20E9FE46 890CC483 078C1095 9A0676FF 0876FF0A 76FF0C76 FF0E76FF .v..v..v..v..v.......á..F±Õ-..>. 0000C0
 C48307B6 117A9A06 76FF0876 FF0A76FF 0C76FF0E 76FF1076 FF0020E9 03740900 ..t.Õ ..v..v..v..v..v..v..z.Ñ..á 0000E0
 0876FF0A 76FF0C76 FF0E76FF 1076FF00 20E90374 0A00903E 830203E9 FE46890C ..F±Õ...>...t.Õ ..v..v..v..v..v. 000100
 76FF1076 FF0020E9 03740400 903E8301 D9E9FE46 890CC483 07E01228 9A0676FF .v..(.Å..á..F±Õ)..>...t.Õ ..v..v 000120
 0500903E 8301AFE9 FE46890C C483080A 12069A06 76FF0876 FF0A76FF 0C76FF0E ..v..v..v..v..ø....á..F±Õ£..>... 000140
 890CC483 083413A7 9A0676FF 0876FF0A 76FF0C76 FF0E76FF 1076FF00 20E90374 t.Õ ..v..v..v..v..v..v..Ì.4..á.. 000160
 76FF0876 FF0A76FF 0C76FF0E 76FF1076 FF0020E9 03740800 903E8301 85E9FE46 F±Õ...>...t.Õ ..v..v..v..v..v..v 000180
 FF0E76FF 1076FF00 20E90374 0C00903E 83015BE9 FE46890C C483085E 154C9A06 ..L.^..á..F±Õ(..>...t.Õ ..v..v.. 0001A0
 03740000 903E8301 31E9FE46 890CC483 08881683 9A0676FF 0876FF0A 76FF0C76 v..v..v..v..°....á..F±Õ1..>...t. 0001C0
 FE46890C C4830882 17379A06 76FF0876 FF0A76FF 0C76FF0E 76FF1076 FF0020E9 Õ ..v..v..v..v..v..v..7.ÿ..á..F± 0001E0

Dump of file SATURN:[PCCOMMON.DUMP.DLL]DA-IMPRT.DLL;1 on 18-APR-1990 10:39:02.20
File ID (459,7,0)   End of file block 93 / Allocated 96

Virtual block number 7 (00000007), 512 (0200) bytes

 9A0676FF 0876FF0A 76FF0C76 FF0E76FF 1076FF00 20E90374 0E00903E 830107E9 Õ...>...t.Õ ..v..v..v..v..v..v.. 000000
 0C76FF0E 76FF1076 FF0020E9 03740F00 903E8300 DDE9FE46 890CC483 080C1837 7.É..á..F±Õï..>...t.Õ ..v..v..v. 000020
 20E90374 1000903E 83008 3E9 FE46890C C4830906 19859A06 76FF087. ‹F0A76FF .v..v..v.......á..F±Õ°..>...t.Õ 000040
 89E9FE46 890CC483 09301A72 9A0676FF 0876FF0A 76FF0C76 FF0E76FF  ›76FF00 ..v..v..v..v..v..v..r.0..á..F±Õ. 000060
 18529A06 76FF0876 FF0A76FF 0C76FF0E 76FF1076 FF0020E9 03741100 9‰3E8300 ..>...t.Õ ..v..v..v..v..v..v..R. 000080
 76FF0C76 FF0E76FF 1076FF00 20E90374 0100903E 83005FE9 FE46890C C483095A Z..á..F±Õ_..>...t.Õ ..v..v..v..v 0000A0
 C70026E9 03740000 903E8300 35E9FE46 890CC483 098A0A7B 9A0676FF 0876FF0A ..v..v..(....á..F±Õ5..>...t.Õ&.ù 0000C0
 890CC483 03870A7B 9A0676FF 0876FF0A 76FF0C76 FF0E76FF 1076FF00 01009006 ......v..v..v..v..v..v..(....á.. 0000E0
 8E0692B8 1E565700 0000C8CB C95F5E1F 0000E9FE 46880005 FE46C700 05E9FE46 F±Õ..úF±...F±Õ...^_èùà...WV.¡... 000100
 0C067E83 00AAE900 00B80003 E9000188 0006E903 7401067E 83009CE9 0090A1D8 ÀÀ..Õ...~..t.Õ..¡..Õ..¡..Õ`..~.. 000120
 0003E900 01880006 E9037407 067E8300 95E90000 880003E9 00018800 06E90374 t.Õ..¡..Õ..¡..Õ...~..t.Õ..¡..Õ.. 000140
 7404067E 83006BE9 00008800 03E90001 880006E9 03740706 7E830080 E9000088 ¡..Õ...~..t.Õ..¡..Õ..¡..Õk..~..t 000160
 880003E9 00018800 06E90374 03067E83 0056E900 00B80003 E9000188 0006E903 .Õ..¡..Õ..¡..ÕV..~..t.Õ..¡..Õ..¡ 000180
 0026E900 0088002C E9000088 0003E900 01880006 E903740C 067E8300 41E90000 ..ÕA..~..t.Õ..¡..Õ..¡..Õ,.¡..Õ&. 0001A0
 0A350A20 09E109CC 09870A66 A7FF2E93 C003FFEC E9037600 07300001 200023E9 ÕW.·..=..v.Õ§..á...Ìf.ñ.ä.Å. .5. 0001C0
 E9064688 0000FE46 C7D88E09 ADB81E56 57000006 C8CBC95F 5E1F0A08 09F60A4A J.~....^_èùà...WV.¡Ü..ÄüF±...F.Õ 0001E0

Dump of file SATURN:[PCCOMMON.DUMP.DLL]DA-IMPRT.DLL;1 on 18-APR-1990 10:39:02.20
File ID (459,7,0)   End of file block 93 / Allocated 96

Virtual block number 8 (00000008), 512 (0200) bytes

 A32038A3 00008800 89E90AC4 830AD81C 669A2018 681E0876 FF0A76FF 216A008E ƒ.j!.v..v..h. .f.Ä..á.Õ¿.¡..È; È 000000
 76FF0A76 FF0C76FF 0018E903 7500003D 04C48306 1402869A 0876FF0A 76FF2039 9 .v..v..Ñ....á.=..u.Õ...v..v..v 000020
 0000FFFF 9A5016FA 46800E76 FF1076FF FE46890A C483068A 18F79A20 39681E08 ..h9 .¥.¤..á..F±.v..v..F°.P..... 000040
 2018681E 2F6AFA76 FFFC76FF 0E76FF10 76FF006A E9FE4688 0006E903 7500003D =..u.Õ...F±Õj..v..v..v=.v°j/.h. 000060
 36FFFA76 FFFC76FF 026A0042 E9FE4688 0006E903 7500003D FE468900 00FFFF9A ......F±=..u.Õ...F±ÕB.j..v=.v°.6 000080
 0012E900 18E90006 88001BE9 0EC48301 2629CA9A 0E76FF10 76FF2039 36FF2038 ; .69 .v..v..ò)&..á.Õ..¡..Õ..Õ.. 0000A0
 0002C8CB C95F5E1F 0000E9FE 4688FFE5 E9FF4AE9 03750001 30FF38E9 0375C008 .áu.Õ;.=..u.ÕJ.Õ!..F±Õ...^_èùà.. 0000C0
 1E0876FF 0A76FF21 6A0167E9 0140E906 46880000 FE46C7D8 8E0A8388 1E565700 .WV.¡...ÄüF±...F.ÕΩ.Õg.j!.v..v.. 0000E0
 89205FA3 04C4830B 8F02FC9A 0876FF0A 76FF0150 E90AC483 0C151C66 9A203E68 h> .f....á.ÕP..v..v..ø.¢..á.È_ . 000100
 76FF0120 E9206516 892063A3 04C4830B D702FC9A 0876FF0A 76FF0138 E9206116 .ø Õ8..v..v..=.ø..á.Èc ..e Õ ..v 000120
 8802F89A 0876FF0A 76FF0108 E9206916 892067A3 04C4830B EF02FC9A 0876FF0A ..v..ø.ÿ..á.Èg ..i Õ...v..v..¥.£ 000140
 681E0876 FF0A76FF 066A00E8 E92060A2 078A2608 5EC400F4 E92068A3 04C4830A ..á.Èk Õ¶.á^.&..Àm ÕÕ.j..v..v..h 000160
 76FF0A76 FF216A00 C5E92074 A2078A26 085EC400 D1E90AC4 830AA11C 669A206E n .f.À..á.Õ!.á^.&..Àt Õé.j!.v..v 000180
 96A304C4 830C5D02 F89A0876 FF0A76FF 00AEE90A C4830C97 1C669A20 75681E08 ..hu .f....á.ÕÜ..v..v..¥.]..á.È. 0001A0
 9AA3209C A3000088 0086E920 98A304C4 830C7A02 F89A0876 FF0A76FF 009AE920  Õ...v..v..¥.z..á.È. Õ..¡..È. È. 0001C0
 0876FF0A 76FF0C76 FF0018E9 03750000 3004C483 08A70286 9A0876FF 0A76FF20  .v..v..Ñ.Ì..á.=..u.Õ...v..v..v. 0001E0
```

```
Dump of file SATURN:[PCCOMMON.DUMP.DLL]DA-IMPRT.DLL;1 on 18-APR-1990 10:39:02.20
File ID (459,7,0)   End of file block 93 / Allocated 96

Virtual block number 9 (00000009), 512 (0200) bytes

00009A0E 76FF1076 FF203E68 1E009036 FFFE4689 0AC4830B 961BF79A 209A681E .h. .%....á..F±.6...h> .v..v.... 000000
2E93C003 FFEF-903 76000C30 002AE900 33E90007 B80033E9 FE46890A C48308 3F ?..á..F±Õ3.¡..Õ3.Õ*.=..v.Õÿ..á.. 000020
46880C68 0C540C40 0C290C1D 0C060BFA 0BE60BCE 0B860B9E 08870B84 0CD4A7FF .lå.......Ñ.ö.|.•.....).ã.T.h..F 000040
0003E906 46880000 FE46C7D8 8E0B75B8 1E565700 0002C8CB C95F5E1F 0000E9FE ±Õ...^_èùà...WV.¡u..ÄúF±...F.Õ€. 000060
FF0A76FF 216A0009 E90AC483 00391C66 9A209E68 1E0876FF 0A76FF21 6A00F0E9 Õp.j!.v..v..h. .f.9..á.Õ)-j!.v.. 000080
085EC400 B6E920_0 A2078A26 085EC400 C2E90AC4 8300681C 669A208F 681E0876 v..h€ .f.h..á.Õô.á^.&..ÄÄ ÕR.á^. 0000A0
0093E90A C483007F 1C669A20 E2681E08 76FF0A76 FF216A00 AAE920E1 A2078A26 &..ÄÄ Õ`.j!.v..v..hâ .f....á.Õ.. 0000C0
2124A321 26A3000J B8007CE9 0AC48300 861C669A 2103681E 0876FF0A 76FF216A j!.v..v..h.l.f.Ñ..á.Õ|.¡..È&!È$! 0000E0
1E0876FF 0A76FF0C 76FF0018 E9037500 003004C4 830C4902 869A0876 FF0A76FF .v..v..Ñ.l..á.=..u.Õ...v..v..v.. 000100
B000009A 0E76FF10 76FF209E 681E0090 36FFFE46 890AC483 0C3818F7 9A212468 h$l.%.8..á..F±.6...h. .v..v.... 000120
FF2E93C0 03FFEFE9 03760007 300020E9 0029E900 08880029 E9FE4689 0AC4830C ..á..F±Õ).¡..Õ).Õ .=..v.Õÿ..á... 000140
02C8C8C9 5F5E1F00 00E9FE46 88008700 70005900 4D004100 2A001300 1000F3A7 lµ.....•.A.M.Y.p....F±Õ...^_èùà. 000160
0876FF0A 76FF216A 0109E900 ECE90646 880000FE 46C7D88E 0001B81E 56570000 ..WV.¡...ÄúF±...F.Õ&.Õ..j!.v..v. 000180
00221C66 9A214968 1E0876FF 0A76FF21 6A00F2E9 0AC4830E 4E1C669A 2128681E .h(!.f.N..á.Õ`.j!.v..v..h!!.f.". 0001A0
76FF00C3 E9216C16 89216AA3 04C4830E 7702FC9A 0876FF0A 76FF000B E90AC483 .á.ÕÜ..v..v..•.W..á.Èj!..l!Õü..v 0001C0
C702FC9A 0876FF0A 76FF00AB E9217016 89216EA3 04C4830D 9902FC9A 0876FF0A ..v..•....á.Èn!..p!Õ`..v..v..•.ú 0001E0

Dump of file SATURN:[PCCOMMON.DUMP.DLL]DA-IMPRT.DLL;1 on 18-APR-1990 10:39:02.20
File ID (459,7,0)   End of file block 93 / Allocated 96

Virtual block number 10 (0000000A), 512 (0200) bytes

830EE41C 669A2176 681E0876 FF0A76FF 046A0093 E9217416 892172A3 04C4830E ..á.Èr!..t!Õ..j..v..v..hv!.f.Õ.. 000000
7500030D 04C4830E 5F02869A 0876FF0A 76FF217A A3217CA3 00008800 7CE90AC4 á.Õ|.¡..È|!Èz!.v..v..Ñ.  ..á.=..u 000020
009036FF FE46890A C4830E37 18F79A21 7A681E08 76FF0A76 FF0C76FF 0018E903 .Õ...v..v..v..hz!.%.7..Ž..F±.6.. 000040
20E90029 E9000988 0029E9FE 46890AC4 8300CF00 009A0E76 FF1076FF 2128681E .h(!.v..v....ü..á..F±Õ).¡..Õ).Õ 000060
850E9E0E 860E6E0E 560E3F0E 280E250F 21A7FF2E 93C003FF EFE90376 00073D00 .=..v.Õÿ..á...!!.X.(.7.V.n.....ç 000080
06468800 00FE46C7 D88E0E16 881E5657 000002C8 C8C95F5E 1F0000E9 FE46880E ..F±Õ...^_èùà...WV.¡...ÄúF±...F. 0000A0
FF216A01 1DE90AC4 830F7C1C 669A217E 681E0876 FF0A76FF 216A0134 E90111E9 Õ..Õ4.j!.v..v..h-!.f.|..á.Õ..j!. 0000C0
21C0681E 0876FF0A 76FF216A 0106E90A C4830F93 1C669A21 9F681E08 76FF0A76 v..v..h.!.f....á.Õ..j|.v..v..hà! 0000E0
E90AC483 0EAD1C66 9A21E168 1E0876FF 0A76FF21 6A00EFE9 0AC4830F AA1C669A .f.`..á.Õÿ.j!.v..v..hÃl.f.Ù..á.Õ 000100
0876FF0A 76FF00C0 E9220416 892202A3 04C4830F D302FC9A 0876FF0A 76FF0008 Á..v..v..•.£..á.È."..."Õà..v..v. 000120
04C48310 0302FC9A 0876FF0A 76FF00A8 E9220816 892206A3 04C4830F E802FC9A .•.Š..á.È."..."Õ`..v..v..•....á. 000140
E9221016 89220EA3 04C48310 1802FC9A 0876FF0A 76FF0090 E9220C16 89220AA3 È."..."Õ...v..v..•....á.È."..."Õ 000160
0876FF0A 76FF0060 F9221416 892212A3 04C48310 3302FC9A 0876FF0A 76FF0078 x..v..v..•.3..á.È."..."Õ'..v..v. 000180
00009A0E 76FF1076 FF217E68 1E009036 FF221816 892216A3 04C4830E "F02FC9A .•....á.È."...".6...h-!.v..v.... 0001A0
2E93C003 FFEFE903 76000A30 0026E900 2FE9000A B8002FE9 FE46890A L 130EFD •..á..F±Õ/.¡..Õ/.Õ&.=..v.Õÿ..á.. 0001C0
0000E9FE 468B102A 10120FFA 0FE20FCA 0F820F9B 0F840F6D 0F560F53 10. A7FF .It.S.V.m.....ý.Ò.ã.•...•..F±Õ.. 0001E0

Dump of file SATURN:[PCCOMMON.DUMP.DLL]DA-IMPRT.DLL;1 on 18-APR-1990 10:39:02.20
File ID (459,7,0)   End of file block 93 / Allocated 96

Virtual block number 11 (0000000B), 512 (0200) bytes

6A00C0E9 0099E906 46880000 FE46C7D8 8E0F44B8 1E565700 0002C8CB C95F5E1F .^_èùà...WV.¡D..ÄúF±...F.Õ..Õà.j 000000
681E0876 FF0A76FF 216A00A9 E90AC483 10D51C66 9A221A68 1E0876FF 0A76FF21 !.v..v..h.".f.!..á.Õ`.j!.v..v..h 000020
A3225FA3 00008800 86E9225C A2078A26 085EC400 92E90AC4 830F651C 669A2238 ;".f.e..á.Õ..á^.&..Ä\`Õ..¡..È_"È 000040
76FF0A76 FF0C76FF 0018E903 7500030D 04C4830F 8802869A 0876FF0A 76FF2250 }".v..v..Ñ.È..á.=..u.Õ. .v..v..v 000060
009A0E76 FF1076FF 221A681E 009036FF FE46890A C483108E 18F79A22 50681E08 ..h}".%.ƒ..á..F±.6...h.".v..v... 000080
75000130 FF60E903 75C00800 2AE90033 E9000888 0033E9FE 46890AC4 83105000 .P..á..F±Õ3.¡..Õ3.Õ*..âu.Õ'.=..u 0000A0
8BFFCDE9 FF7DE903 7500043D FF79E903 7500033D FF6AE903 7500023D FF5BE903 .Õ[.=..u.Õj.=..u.Õy.=..u.Õ).Õë.. 0000C0
6AE90646 880000FE 46C7D88E 109DB81E 56570000 02C8C8C9 5F5E1F00 00E9FE46 F±Õ...^_èùà...WV.¡...ÄúF±...F.Õj 0000E0
0A76FF21 6A0072E9 0AC48311 8A1C669A 2262681E 0876FF0A 76FF216A 0089E900 .Õ..j!.v..v..hb".f.¤..á.Õr.j!.v. 000100
669A22A4 681E0876 FF0A76FF 216A005B E90AC483 11D11C66 9A228368 1E0876FF .v..h.".f.!..á.Õ[.j!.v..v..hÉ".f 000120
E9FE4689 0AC48311 3100009A 0E76FF10 76FF2262 681E0090 36FF0AC4 8311181C ....á..6...hb".v..v....1..á..F±Õ 000140
E9037500 0230FF8A E9037500 0130FF8F E90375C0 080022E9 0028E900 0C88002B •.¡..Õ+.Õ"..âu.Õ..=..u.Õ..=..u.Õ 000160
B81E5657 000002C8 C8C95F5E 1F0000E9 FE4688FF 05E9FFA8 E9037500 0330FF99 ..=..u.Õ`.Õ!..F±Õ...^_èùà...WV.¡ 000180
669A22C6 681E0876 FF0A76FF 216A0089 E9006AE9 06468800 00FE46C7 D88E1182 ...ÄúF±...F.Õj.Õ..j!.v..v..hó".f 0001A0
005BE90A C483127F 1C669A22 E7681E08 76FF0A76 FF216A00 72E90AC4 8312681C .h..á.Õr.j!.v..v..hÓ".f....á.Õ[. 0001C0
FF1076FF 22C6681E 009036FF 0AC48311 A31C669A 2308681E 0876FF0A 76FF216A j!.v..v..h.#.f.È..á..6...hó".v.. 0001E0
```

Dump of file SATURN:[PCCOMMON.DUMP.DLL]DA-IMPRT.DLL;1 on 18-APR-1990 10:39:02.20
File ID (459,7,0)   End of file block 93 / Allocated 96

Virtual block number 12 (0000000C), 512 (0200) bytes

```
FF8FE903 75C00800 22E90028 E90000B8 002BE9FE 46890AC4 8311E700 009A0E76 v....Ô..á..F±Ô+.¡..Ô+..."..áu.Ô.. 000000
00E9FE46 8BF°D5E9 FFA8E903 75000330 FF99E903 75000230 FF8AE903 75000130 =..u.Ô..=..u.Ô..=..u.Ô´.Ôl..F±Ô. 000020
00ACE900 8DE90646 880000FE 46C7D88E 1230881E 56570000 02C8CBC9 5F5E1F00 ..^_èùà...WV.¡0..ÄúF±...F.Ô..Ô¯. 000040
1E0876FF 0A76FF21 6A0095E9 0AC48313 161C669A 232A681E 0876FF0A 76FF216A j!.v..v..h*#.f....á.Ô..j!.v..v.. 000060
02869A08 76FF0A76 FF236CA3 236EA300 0088007E E90AC483 134D1C66 9A234868 hK#.f.M..á.Ô-.¡..Èn#Èl#.v..v..Ñ. 000080
8312511B F79A236C 681E0876 FF0A76FF 0C76FF00 18E90375 00003004 C48310FB «..á.=..u.Ô...v..v..v..hl#.%.Q.. 0000A0
2BE9FE46 890AC483 12950000 9A0E76FF 1076FF23 2A681E00 9036FFFE 46890AC4 á..F±.6...h*#.v..v.......á..F±Ô+ 0000C0
76E90375 00023DFF 67E90375 00013DFF 6CE90375 C0080022 E9002BE9 000E8800 .¡..Ô+.Ô"..áu.Ôl.=..u.Ôg.=..u.Ôv 0000E0
DE881E56 57000002 C8CBC95F 5E1F0000 E9FE4688 FFD5E9FF 85E90375 00033DFF .=..u.Ô..Ôl..F±Ô...^_èùà...WV.¡8 000100
1C669A23 70681E08 76FF0A76 FF216A01 80E90159 E9064688 0000FE46 C7D88E12 ..ÄúF±...F.ÔY.Ô..j!.v..v..hp#.f. 000120
6A0152E9 0AC48313 FE1C669A 2391681E 0876FF0A 76FF216A 0169E90A C48313E7 Ô..á.Ôi.j!.v..v..h.#.f.±..á.ÔR.j 000140
681E0876 FF0A76FF 216A0138 E90AC483 14151C66 9A238268 1E0876FF 0A76FF21 !.v..v..hý#.f....á.Ô;.j!.v..v..h 000160
C4831443 1C669A23 F4681E08 76FF0A76 FF216A01 24E90AC4 83142C1C 669A2303 á#.f.,..á.Ô$.j!.v..v..h¶#.f.C..á 000180
0A76FF21 6A00F6E9 0AC48314 5A1C669A 2415681E 0876FF0A 76FF216A 0100E90A .Ô..j!.v..v..h.$.f.Z..á.Ô-.j!.v. 0001A0
04C48314 CD02F89A 0876FF0A 76FF000F E90AC483 14851C66 9A243668 1E0876FF .v..h6$.f....á.ÔÔ..v..v..%.ë..á. 0001C0
FF136A00 B4E90AC4 83149C1C 669A2459 681E0876 FF0A76FF 136A00C8 E92457A3 ÈW$Ôù.j..v..v..hY$.f....á.ÔÇ.j.. 0001E0
```

Dump of file SATURN:[PCCOMMON.DUMP.DLL]DA-IMPRT.DLL;1 on 18-APR-1990 10:39:02.20
File ID (459,7,0)   End of file block 93 / Allocated 96

Virtual block number 13 (0000000D), 512 (0200) bytes

```
247F681E 0876FF0A 76FF136A 0090E90A C48314B3 1C669A24 6C681E08 76FF0A76 v..v..hl$.f.°..á.Ô..j..v..v..h.$ 000000
83133002 B69A0876 FF0A76FF 2492A324 94A30000 B80086E9 0AC48314 EA1C669A .f.ö..á.Ô..¡..Ê.$Ê.$.v..v..Ñ.0.. 000020
890AC483 12FF18F7 9A249268 1E0876FF 0A76FF0C 76FF0018 E9037500 003D04C4 á.=..u.Ô...v..v..v..h.$.%....á.. 000040
0F880033 E9FE4689 0AC48313 6600009A 0E76FF10 76FF2370 681E0090 36FFFE46 F±.6...hp#.v..v....f..á..F±Ô3.¡. 000060
0613EF13 D813C113 BE1527A7 FF2E93C0 03FFEFE9 0376000C 30002AE9 0033E900 .Ô3.Ô*.=..v.Ôý..á...Ï'./.é.Ã.ÿ.. 000080
000002C8 CBC95F5E 1F0000E9 FE468814 B814A414 8D147614 62144814 34141D14 ...4.K.b.v...Ê.Ê..F±Ô...^_èùà... 0000A0
9A249668 1E0876FF 0A76FF13 6A011FE9 06468800 00FE46C7 D88E13AF B81E5657 WV.¡Ê..ÄúF±...F.Ô..j..v..v..h.$. 0000C0
17E90AC4 8315A01C 669A24A9 681E0876 FF0A76FF 216A012E E90AC483 15891C66 f....á.Ô..j!.v..v..h`$.f....á.Ô. 0000E0
0876FF0A 76FF216A 0100E90A C48315B7 1C669A24 CA681E08 76FF0A76 FF136A01 .j..v..v..hò$.f.ñ..á.Ô..j!.v..v. 000100
13001C66 9A24 :68 1E0876FF 0A76FF13 6A00E9E9 0AC48315 CE1C669A 24DD681E .hl$.f.ö..á.ÔÔ.j..v..v..h±$.f.Å. 000120
FF216A00 BBE9..C4 8315FC1C 669A2511 681E0876 FF0A76FF 216A0002 E90AC483 .á.Ô0.j!.v..v..h.%.f.=..á.ÔÉ.j!. 000140
2553681E 0876FF0A 76FF216A 00A4E90A C4831613 1C669A25 32681E08 76FF0A76 v..v..h2%.f....á.ÔÉ.j!.v..v..hS% 000160
E90AC483 16411C66 9A257468 1E0876FF 0A76FF21 6A008DE9 0AC48316 2A1C669A .f.*..á.Ô..j!.v..v..ht%.f.A..á.Ô 000180
76FF0A76 FF216A00 5FE90AC4 8316581C 669A2595 681E0876 FF0A76FF 216A0076 v.j!.v..v..h.%.f.X..á.Ô_.j!.v..v 0001A0
15030000 9A0E76FF 1076FF24 96681E00 9036FF0A C4831572 1C669A25 B6681E08 ..hÑ%.f.r..á..6...h.$.v¯.v...... 0001C0
A7FF2E93 C003FFEF E9037600 0A300026 E9002FE9 0010B800 2FE9FE46 890AC483 .á..F±Ô/.¡..Ô/.Ô&.=..v.Ôy..à...Ï 0001E0
```

Dump of file SATURN:[PCCOMMON.DUMP.DLL]DA-IMPRT.DLL;1 on 18-APR-1990 10:39:02.20
File ID (459,7,0)   End of file block 93 / Allocated 96

Virtual block number 14 (0000000E), 512 (0200) bytes

```
5E1F0000 E9FE4688 16491632 16181604 15E015D6 15BF15A8 1591157A 15631692 ..c.z...´.¢.ø.Û.....2.I..F±Ô...^ 000000
FF0A76FF 216A0050 E9064688 0000FE46 C7D88E15 54881E56 57000002 C8CBC95F _èùà...WV.¡T..ÄúF±...F.ÔP.j!.v.. 000020
1C669A25 F9681E08 76FF0A76 FF146A00 48E90AC4 8316F01C 669A2508 681E0876 v̄..hÀ%.f.Þ..á.ÔK.j..v..v..h¹%.f. 000040
18E9FE46 890AC483 166E0000 9A0E76FF 1076FF25 D8681E00 9036FF0A C48315E5 Í..á..6...hÀ%.v..v....n..á..F±Ô. 000060
E9FE4688 FFE5E9FF 88E90375 00013DFF A9E90375 C0080012 E9001BE9 00118800 .¡..Ô..Ô...áu.Ô`.=..u.Ô¡.Ôl..F±Ô 000080
216A00C0 E9064688 0000FE46 C7D88E16 88881E56 57000002 C8CBC95F 5E1F0000 ...^_èùà...WV.¡É..ÄúF±...F.Ôá.j! 0000A0
669A262F 681E0876 FF0A76FF 136A0AC4 8317711C 669A260E 681E0876 FF0A76FF .v..v̄..h.&.f.q..á.j..v..v..h/&.f 0000C0
009CE90A C483179F 1C669A26 42681E08 76FF0A76 FF216A00 83E90AC4 8317881C ....á.Ô°.j!.v..v..hB&.f....á.Ô.. 0000E0
1E0876FF 0A76FF21 6A0085E9 0AC48317 861C669A 2663681E 0876FF0A 76FF136A j..v..v..hc&.f.Ñ..á.Ô..j!.v..v.. 000100
8317E41C 669A2697 681E0876 FF0A76FF 136A006E E90AC483 17CD1C66 9A267668 hv&.f.è..á.Ôn.j..v..v..h.&.f.Ô.. 000120
0E681E00 9036FF0A C4831609 1C669A26 AA681E08 76FF0A76 FF216A00 57E90AC4 á.ÔW.j!.v..v..h¨&.f.\..á..6...h. 000140
0630001E E90027E9 00128800 27E9FE46 890AC483 17060000 9A0E76FF 1076FF26 &.v..v.......á..F±Ô'.¡..Ô'.Ô..=. 000160
E9FE4688 17D517BE 17A71790 17791762 174E181E A7FF2E93 C003FFEF E9037600 .v.Ôy..à...Ï..N.b.y...Ï./.1..F±Ô 000180
216A0108 E9064688 0000FE46 C7D88E17 3F881E56 57000002 C8CBC95F 5E1F0000 ...^_èùà...WV.¡?..ÄúF±...F.Ô..j! 0001A0
ED681E08 76FF0A76 FF216A01 15E90AC4 8318741C 669A26CC 681E0876 FF0A76FF .v..v̄..hä&.f.t..á.Ô..j!.v..v..hÙ 0001C0
0AC48318 A21C669A 270E681E 0876FF0A 76FF216A 00FEE90A C483188B 1C669A26 &.f....á.Ô±.j!.v..v..h.'.f.Å..á. 0001E0
```

Dump of file SATURN:[PCCOMMON.DUMP.DLL]DA-IMPRT.DLL;1 on 18-APR-1990 10:39:02.20
File ID (459,7,0)   End of file block 93 / Allocated 96

Virtual block number 15 (0000000F), 512 (0200) bytes

```
FF0A76FF 136A0000 E90AC483 18B91C66 9A272F68 1E0876FF 0A76FF21 6A00E7E9 ÕÕ.j!.v..v..h/'.f.¿..á.ÕÅ.j..v.. 000000
1C669A27 6368'E08 76FF0A76 FF216A00 B9E90AC4 8318D01C 669A2750 681E0876 v..hP'.f.Å..á.Õ¿.j!.v..v..hc'.f. 000020
6A008BE9 0AC48318 FE1C669A 2784681E 0876FF0A 76FF136A 00A2E90A C48318E7 Õ..á.ÕÅ.j..v..v..h.'.f.±..á.Õ..j 000040
681E0876 FF0A76FF 136A0074 E90AC483 19151C66 9A279768 1E0876FF 0A76FF21 !.v..v..h.'.f....á.Õt.j..v..v..h 000060
C483175D 1C669A27 CB681E08 76FF0A76 FF216A00 5DE90AC4 83192C1C 669A27B8 ¡'.f.,..á.Õ].j!.v..v..hú'.f.]..á 000080
0013B800 2DE9FE46 890AC483 17FA0000 9A0E76FF 1076FF26 CC681E00 9036FF0A ..6...há&.v..v....ª..á..F±Õ-.|.. 0000A0
18AA1893 187C1865 184E1966 A7FF2E93 C003FFEF E9037600 093D0024 E9002DE9 Õ-.Õ$.=..v.Õÿ..å...|f.N.e.|...¨. 0000C0
8E183FB8 1E565700 0002C8CB C95F5E1F 0000E9FE 46881910 190618EF 18D818C1 è.Á.ÿ......F±Õ...^_èüå...WV.¡7.. 0000E0
18501C66 9A27EC68 1E0876FF 0A76FF21 6A00C8E9 0099E906 46880000 FE46C7D8 ÄüF±...F.Õ..Õå.j!.v..v..h$'.f.]. 000100
76FF0099 E9280F16 892800A3 04C48319 D702FC9A 0876FF0A 76FF0081 E90AC483 .á.Õÿ..v..v..•.■..á.È.(...(Õ...v 000120
0702FC9A 0876FF0A 76FF0081 E9281316 892811A3 04C48319 EF02FC9A 0876FF0A ..v..•.ÿ..á.È.(...(Õ...v..v..•.. 000140
892819A3 04C48314 6802FC9A 0876FF0A 76FF0069 E9281716 892815A3 04C4831A ..á.È.(...(Õi..v..v..•.k..á.È.(. 000160
E90000B8 003BE90A C4831942 00009A0E 76FF1076 FF27EC68 1E009036 FF281816 ..(.6...h$'.v..v....B..á.Õ;.¡..Õ 000180
7500033D FF6AE903 7500023D FF5BE903 7500013D FF60E903 75C00800 32E9003B ;.Õ2..åu.Õ'.=..u.Õ[.=..u.Õj.=..u 0001A0
5F5E1F00 00E90000 B8FFC5E9 FF9AE903 7500053D FF8AE903 7500043D FF7AE903 .Õz.=..u.Õ..=..u.Õ..Õé.¡..Õ...^_ 0001C0
76FF216A 00B8E900 8CE90646 8B0000FE 46C7D88E 1980B81E 56570000 02C8CBC9 èüå...WV.¡...ÁüF±...F.Õ..ÕE.j!.v 0001E0
```

Dump of file SATURN:[PCCOMMON.DUMP.DLL]DA-IMPRT.DLL;1 on 18-APR-1990 10:39:02.20
File ID (459,7,0)   End of file block 93 / Allocated 96

Virtual block number 16 (00000010), 512 (0200) bytes

```
C4831AD7 02F89A08 76FF0A76 FF00A4E9 0AC48319 AE1C669A 281E681E 0876FF0A ..v..h.(.f.Û..á.ÕÉ..v..v..½.■..á 000000
76FF0079 E90AC483 1A9B1C66 9A284168 1E0876FF 0A76FF21 6A0090E9 283FA304 .È?(Õ..j!.v..v..hA(.f....á.Õy..v 000020
04C48319 BF02F89A 0876FF0A 76FF0065 E92862A3 04C4831A EB02F89A 0876FF0A ..v..½.Š..á.Èb(Õe..v..v..½.¢..á. 000040
E90000B8 003BE90A C4831A24 00009A0E 76FF1076 FF281E68 1E009036 FF2864A3 Èd(.6...h.(.v..v....$..á.Õ;.¡..Õ 000060
7500033D FF77E903 7500023D FF68E903 7500013D FF6DE903 75C00800 32E9003B ;.Õ2..åu.Õm.=..u.Õh.=..u.Õw.=..u 000080
5F5E1F00 00E90000 B8FFC5E9 FF9EE903 7500053D FF92E903 7500043D FF83E903 .Õ..=..u.Õ..=..u.Õ..Õé.¡..Õ...^_ 0000A0
76FF216A 0080E900 61E90646 8B0000FE 46C7D88E 1A7AB81E 56570000 02C8CBC9 èüå...WV.¡z..ÁüF±...F.Õ■.Õ..j!.v̄ 0000C0
C48318A0 02F89A08 76FF0A76 FF0069E9 0AC4831A C61C669A 2866681E 0876FF0A ..v..hf(.f.ó..á.Õi..v..v..½....á 0000E0
2866681E 009036FF 2889A304 C4831AAC 02F89A08 76FF0A76 FF0055E9 2887A304 .È.(ÕU..v..v..½.¯..á.È.(.6...hf( 000100
98E90375 C0080022 E9002BE9 00008B00 2BE90AC4 83180400 009A0E76 FF1076FF .v..v.......á.Õ+.¡..Õ+.Õ"..åu.Õ. 000120
E90000B8 FFD5E9FF AEE90375 00033DFF A2E90375 00023DFF 93E90375 00013DFF .=..u.Õ..=..u.ÕÀ.=..u.ÕÙ.Õ!.¡..Õ 000140
C4831C46 02B69A0A 76FF0C76 FFD88E18 5AB81E56 57000006 C8CBC95F 5E1F0000 ...^_èüå...WV.¡Z..Ä.v..v..Ñ.F..á 000160
06E90375 00003D00 0002639A 5016FA46 8DFE76FF FE46FF00 6A0E76FF FE468904 ..F±.v.j..F±.v±.Fª.P.c...=..u.Õ. 000180
4688065E C408C483 188C0256 9AFA76FF FC76FF0A 76FF0C76 FF002AE9 00018800 .¡..Õ*..v..v..v■.vª.V....á.á^..F 0001A0
18FFB81E 56570000 00C8CBC9 5F5E1F00 00E90000 B8025789 26078926 FC5688FA ª.V■&..&.W.¡..Õ...^_èüå...WV.¡.. 0001C0
76FF0A76 FF0C76FF 0017E903 720E463B 04C4831C 9702B69A 0A76FF0C 76FFD88E .Ä.v..v..Ñ....á.;F.r̄.Õ...v..v..v 0001E0
```

Dump of file SATURN:[PCCOMMON.DUMP.DLL]DA-IMPRT.DLL;1 on 18-APR-1990 10:39:02.20
File ID (459,7,0)   End of file block 93 / Allocated 96

Virtual block number 17 (00000011), 512 (0200) bytes

```
76FF0876 FF0A76FF 0C76FF0E 76FF0E4E FF0024E9 08C4831C B402569A 0676FF08 ..v..V.Ç..á.Õ$..N..v..v..v..v..v 000000
B81E5657 00000F"8 CBC95F5E 1F0000C6 260676C4 0E5E880A C4831C0C 02CE9A06 ..ö....á..^.áv.&ó...^_èüå...WV.¡ 000020
3DF84689 00000:·C 9A5016F4 468D0A76 FF0C76FF 000107C7 26065EC4 D88E1C6E n..Áá^.&ú....v..v..F¶.P.$....F½= 000040
5EE90372 0EFA7E83 FA46FF00 03E90000 FA46C700 78E9F846 880006E9 03750000 ..u.Õ...F½Õx.úFª..Õ...Fª.-ª.r.Õ^ 000060
16FC468D F276FFF4 76FFF676 FF0A76FF 0C76FFF2 46890146 878BE301 FA5E8800 ..^ª!D..F..F·.v..v..v-.v¶.v·.F•. 000080
001CE903 7D00FE7E 83002EE9 F8468B00 06E90375 00003DF8 46890000 FFFF9A50 P......F½=..u.Õ...F½Õ...-±.).Õ.. 0000A0
B8FF96E9 0009E900 00B80000 07C72606 5EC4000E E9037700 FC7E8300 09E9037E -.Õ...-•.w.Õ..á^.&ú...¡..Õ..Õ..¡ 0000C0
4689FC46 890000B8 D88E1CD0 B81E5657 000008C8 0008CAC9 5F5E1F00 00E90000 ..Õ...^_èò..å...WV.¡Å..Ä¡...F•.F 0000E0
7500F87E 83F84689 0000FFFF 9A5016FE 46800676 FF0000FE 46C70000 F846C7FA ªúF½..úF±...v..F±.P......F½.-½.u 000100
76FFFC76 FF016A00 6A0000FF FF9A5016 FA468DFE 76FF0030 E9F84688 0006E903 .Õ...F½ÕO..v±.Fª.P.....j.j..v•.v 000120
90CBC95F 5E1F0000 E90000B8 0000FFFF 9A206A00 6A0876FF 0A76FF01 62681EFA ª.hb..v..v.j.j .....¡..Õ...^_èü. 000140
00011DE0 01030000 00041C7B 00020000 00021BB9 00020000 00011B7B 0002000F ....(.......¿.......(.......Ã... 000160
0008015D 02030014 00031C25 02030086 00040811 02030000 0006108A 0002008B ...................%.......]... 000180
0004019F 0203012C 00061DC3 02030033 000400A8 02030022 00030420 020301F0 Þ... ..."...´...3...û...¸....... 0001A0
00000000 0000005E 00041D32 0203013F 00061DA4 0203004A 00041CE8 0203003F ?...Õ...J...È...7...2...^....... 0001C0
90A30788 260A5EC4 1C15E90E 46880000 FEF286C7 D88EFFFF B81E5657 000122C8 å"..WV.¡...Äü.·±...F.Õ..á^.&..È. 0001E0
```

```
Dump of file SATURN:[PCCOMMON.DUMP.DLL]DA-IMPRT.DLL;1 on 18-APR-1990 10:39:02.20
File ID (459,7,0)   End of file block 93 / Allocated 96

Virtual block number 18 (00000012), 512 (0200) bytes

 9A0676FF 0876FF28 8C36FF28 8E36FF1C 32E90000 FFFF9A28 8C681E28 9036FF28 (.6.(.h.(.....Ö2..6.(.6.(.v..v.. 000000
 2E86890C 56880A46 881C0CE9 0000FFFF 9A288C36 FF288E36 FF08C483 FFFF1F39 9....á..6.(.6.(.....Ö...F..V.... 000020
 0000FFFF 9A016AFF 2EB6FFFF 3086FF50 16FEDE86 800676FF 0876FFFF 309689FF ...0..v..v...ß±.P.Ñ0..Ñ..j...... 000040
 DEB6FFFE E0P5FF06 76FF0876 FF1BD7E9 FEF2868B 0007E903 7500003D FEF28689 ..·±=..u.Ö....·±Öm..v..v..ÑÁ±.Ñß 000060
 07E90375 00003DFE F2868900 0000E69A 50520021 05FF3096 88FF2E86 88036AFE ±j.......0..!.RP.!......±=..u.Ö. 000080
 FF309688 FF2E8688 046AFEDE 86FFFEE0 86FF0676 FF0876FF 18A2E9FE F2868800 ....±ÖÄ..v..v..ÑÁ±.Ñß±j.......0. 0000A0
 0876FF18 6DE9FEF2 86880007 E9037500 003DFEF2 86890000 0118 9A50 52002505 .%.RP.......·±=..u.Ö....·±Öm..v. 0000C0
 89000001 509A5052 002905FF 309688FF 2E868805 6AFEDEB6 FFFEE086 F0676FF .v..ÑÁ±.Ñß±j.......0..).RP.P.... 0000E0
 FEDEB6FF FEE086FF 0676FF08 76FF1838 E9FEF286 880007E9 03750000 3 FEF286 .·±=..u.Ö....·±Öß..v..v..ÑÁ±.Ñß± 000100
 0007E903 7500003D FEF28689 000001C8 9A505200 2005FF30 9688FF2E 86J8066A j.......0..·.RP.à......±=..u.Ö.. 000120
 59FF5A86 C60036E9 44FF5A86 C60023E9 982F478A 26FF2E9E C41803E9 FEF2868B ..·±Ö..á...&.G/.Ö#.6.Z.DÖ6.6.Z.Y 000140
 4D3DFFD5 E9037500 4430001B E9001EE9 59FF5A86 C60026E9 4DFF5A86 C6002EE9 Ö..6.Z.MÖ&.6.Z.YÖ..Ö..=D.u.Ö!.=M 000160
 6AFEDEB6 FFFEE086 FF0676FF 0876FFFF DAE9FFCD E9037500 5930FFDD E9037500 .u.Ö\.=Y.u.Öe.Öd..v..v..ÑÁ±.Ñß±j 000180
 C41A88E9 FEF2868B 0007E903 7500003D FEF28689 0000025F 9A5016FF 5A868D07 ...Z..P. ......·±=..u.Ö....·±Ö..á 0001A0
 31FEF086 C6004DE9 43FEF086 C60055E9 43FEF086 C60033E9 9830478A 26FF2E9E ...&.G0.Ö3.6.Þ±CÖU.6.Þ±CÖM.6.Þ±1 0001C0
 C008002A E90020E9 43FEF086 C60035E9 33FEF086 C60030E9 32FEF086 C60045E9 ÖE.6.Þ±2Ö=.6.Þ±3Ö5.6.Þ±CÖ·.Ö*..á 0001E0

Dump of file SATURN:[PCCOMMON.DUMP.DLL]DA-IMPRT.DLL;1 on 18-APR-1990 10:39:02.20
File ID (459,7,0)   End of file block 93 / Allocated 96

Virtual block number 19 (00000013), 512 (0200) bytes

 00433DFF CEE90375 00333DFF CEE90375 00323DFF CEE90375 00313DFF CEE90375 u.Öö.=1.u.Öö.=2.u.Öö.=3.u.Öö.=C. 000000
 FF9A5016 FEF0868D 086AFEDE B6FFFEE0 B6FF0676 FF0876FF FFCBE9FF A6E90375 u.Ö!.Öù..v..v..ÑÁ±.Ñß±j...Þ±.P.. 000020
 E9983647 8A26FF2E 9EC419F4 E9FEF286 880007E9 03750000 3DFEF286 890000FF .....·±=..u.Ö....·±Ö¶.á...&.G6.Ö 000040
 004E3000 13E90016 E94EFF24 86C6001E E94EFF24 86C60026 E959FF24 86C6001B ..6.$.YÖ&.6.$.NÖ..6.$.NÖ..Ö..=N. 000060
 096AFEDE B6FFFEE0 B6FF0676 FF0876FF FFE2E9FF D5E90375 00593DFF E5E90375 u.Ö!.=Y.u.Ö!.Öä..v..v..ÑÁ±.Ñß±j. 000080
 068E198C E9FEF286 880007E9 03750000 3DFEF286 89000000 819A5016 FF24868D ..$..P.Ý.....·±=..u.Ö....·±Ö.... 0000A0
 89E65689 E4468999 58478826 FF2E9EC4 0057E903 74000206 08260000 A1261EA8 ´.&Å..&.....t.ÖW.á...&.GX..FÖ.V!. 0000C0
 0676FF08 76FFE256 89E04689 EA5689E8 4689995A 478826FF 2E9EC4DE 56890C46 FÉ.VBá...&.GZ..FÖ.VÖ.FÁ.Vä.v..v. 0000E0
 0007E903 7500003D FEF28689 0000047E 9A50160C 468D0A6A FEDEB6FF FEE086FF .ÑÁ±.Ñß±j..FÉ.P.-......±=..u.Ö.. 000100
 7500003D 04C48303 BF02869A 50520037 05FF3096 88FF2E86 881923E9 FEF28688 ..·±Ö#.......0..7.RP.Ñ.€..á.=..u 000120
 E9037500 003DFEF2 86890000 FFFF9A50 16004680 276A006A 289036FF 0071E903 .Öq..6.(j.j'.FÅ.P.......±=..u.Ö 000140
 02478926 FEE09688 FEDE8688 D05EC400 0207C726 D05EC418 E1E9FEF2 86880007 ....·±ÖÄ.á^ÅLú...á^Å..ß±..Á±&.G. 000160
 FF02569A 50520006 05D25688 D0468850 52003705 FF309688 FF2E8688 04578926 &.W.......0..7.RP.FÅ.VØ...RP.V.. 000180
 C4FEDEB6 FFFEE086 FF0E6A00 00FFFF9A 006AD076 FFD276FF 288C681E 08C483FF ..á..h.(.vØ.vÅj......j..ÑÁ±.Ñß±á 0001A0
 880A4688 1867E90E C483045B 29CA9A06 76FF0876 FF5C77FF 265E77FF 26FF2E9E ...&.w^&.w\.v..v..Ö)[..á.Ög..F.. 0001C0
 25478826 F25EC40E 56890C46 89235788 26214788 26F25EC4 F45689F2 46890C56 V..F·.V¶á^·&.G!&.W#.FÉ.VBá^·&.GX 0001E0

Dump of file SATURN:[PCCOMMON.DUMP.DLL]DA-IMPRT.DLL;1 on 18-APR-1990 10:39:02.20
File ID (459,7,0)   End of file block 93 / Allocated 96

Virtual block number 20 (00000014), 512 (0200) bytes

 8826F25E C4E65689 E446892B 57882629 478826F2 5EC4E256 89E04689 27578826 &.W'.FÅ.Vää^·&.G)&.W+.FÖ.V!á^·&. 000000
 08C48304 C4221F9A 0676FF08 76FFF276 FFF476FF EA5689E8 46892F57 88262047 G-&.W/.FÖ.VÖ.v¶.v·.v..v..."á..á. 000020
 055E9A50 16DC468D 0A6AFEDE 86FFFEE0 B6FF0676 FF0876FF FEE09689 FEDE8689 ..ß±..Á±.v..v..ÑÁ±.Ññ±j..FÉ.P.^. 000040
 86890C56 880A468B 17C8E917 D5E9FEF2 86880007 E9037500 003DFEF2 86890000 ....·±=..u.Ö....·±Ö!.Öù..F..V... 000060
 76FF0876 FFFF4886 FFFF4A86 FF2177FF 26FF489E C4501696 468DFF4A 9689FF48 H...J..F..Pá.H.&.w!.ÑJ..ÑH..v..v 000080
 1686468D 178EE9FE F2868800 07E90375 00003DFE F286890E C48304FF 2F1A9A06 .../...á...±=..u.Ö....±Ö...F.. 0000A0
 A42F1A9A 0676FF08 76FF5052 002305FF 4A9688FF 48868844 77FF26FF 489EC450 Pá.H.&.wD..H...J..#.R! v..v.../É 0000C0
 9876FF06 76FF0876 FF1753E9 FEF2868B 0007E903 7500003D FEF28689 0EC48305 ..á...·±=..u.Ö....·±ÖS. v..v..v. 0000E0
 E9FEF286 880007E9 03750000 3D0000FF FF9A5016 8A468086 76FFB876 FF9676FF .v..v..v..F..P.....=..u.Ö....·±Ö 000100
 05089A50 52004605 FF4A9688 FF488688 026A8A76 FF8C76FF 0676FF08 76FF1728 (..v..v..v..v.j...H...J..F.RP.Ä. 000120
 86890C56 880A468B 16EBE916 F5E9FEF2 86880007 E9037500 003DFEF2 86890000 ....·±=..u.Ö....·±Ö%.ÖS..F..V... 000140
 76FF0876 FFFEF886 FFFEFA86 FF2177FF 26FEF89E C4501696 468DFEFA 9689FEF8 ½±..ª±.F..Pá.½±&.w!.Ñª±.Ñ½±.v..v 000160
 FF0876FF 16AEE9FE F2868800 07E90375 00003DFE F286890E C4830611 2F1A9A06 .../...á...±=..u.Ö....±ÖÜ..v.. 000180
 FEF28689 0000FFFF 9A505200 2305FEFA 9688FEF8 8688146A 9676FF98 76FF0676 v..v..v.j...½±..ª±.#.RP........± 0001A0
 FF089689 FF068689 0C56880A 46881671 E9167BE9 FEF2868B 0007E903 7500003D =..u.Ö....·±Ö(.Öq..F..V......... 0001C0
 76FFFEE0 9689FEDE 868908C4 83004222 1F9A0676 FF0876FF FF0686FF FF0886FF .Ñ...Ñ...v..v..."B..á...ß±..Á±.v 0001E0
```

```
Dump of file SATURN:[PCCOMMON.DUMP.DLL]DA-IMPRT.DLL;1 on 18-APR-1990 10:39:02.20
File ID (459,7,0)   End of file block 93 / Allocated 96

Virtual block number 21 (00000015), 512 (0200) bytes

002105FF 08968BFF 06868850 1696468D 006A006A FEDEB6FF FEE0B6FF 0676FF08 ..v..ÑÀ±.Ñ8±j.j..F..P.........!. 000000
160AE9FE F2868800 07E90375 00003DFE F2868900 00FFFF9A 016A006A 006A5052 RPj.j.j.........±=..u.Õ.....±Õ.. 000020
16E959EC 46CCJ010 E94EEC46 C60024E9 59EC46C6 0018E998 42478A26 FF069EC4 é...&.GB.Õ..óF$YÕ$.óF$NÕ..óF$YÕ. 000040
9876FF06 76FF0876 FFFFE3E9 FFD8E903 75005930 FFE7E903 75004E30 0013E900 .Õ..=N.u.ÕÕ.=Y.u.ÕÀ.ÕÕ..v..v..v. 000060
E9FEF286 880007E9 03750000 3DFEF286 89000007 1C9A5016 EC468D03 6A9676FF .v.j..F$.P.......±=..u.Õ.....±Õ 000080
4D9446C6 002CE944 9446C600 33E95394 46C6001F E9984347 8A26FF06 9EC415A8 ´.á...&.GC.Õ..óF.SÕ3.óF.DÕ..óF.M 0000A0
005330FF DFE90375 004D3DFF E0E90375 00443000 18E9001E E9409446 C60025E9 ÕX.óF.MÕ..Õ..=D.u.ÕÀ.=M.u.ÕÕ.=S. 0000C0
00000748 9A501694 4680046A 9676FF98 76FF0676 FF0876FF FFD8E9FF C9E90375 u.Õè.ÕÜ..v..v..v..v.j..F..P.K... 0000E0
9876FF06 76FF0876 FF53FE46 C61537E9 FEF28688 0007E903 75000030 FEF28689 ...±=..u.Õ.....±Õ7.óF±S.v..v..v. 000100
E9FEF286 880007E9 03750000 3DFEF286 89000002 C79A5016 FE468005 6A9676FF .v.j..F±.P.ú.....±=..u.Õ.....±Õ 000120
88001DE9 03740000 3D04C483 078F0286 9A505200 4405FF08 9688FF06 86881508 ..........D.RP.Ñ....á.=..t.Õ... 000140
289036FF 0098E903 75000030 04C48307 FA02B69A 50520065 05FF0896 88FF0686 ........e.RP.Ñ.'..á.=..u.Õ...6.( 000160
E9FEF286 880007E9 03750000 3DFEF286 89000003 729A5016 FF408680 486A006A j.jH..à..P.r.....±=..u.Õ.....±Õ 000180
06868804 57892602 47892698 56889646 88FF409E C4000307 C726FF40 9EC414A8 ´.á.à.&ú...á.à..F..V.&.G.&.W.... 0001A0
8808C483 081C0256 9A505200 0605FF42 9688FF40 86885052 004405FF 089688FF ......D.RP..à...B....RP.V.....á.. 0001C0
C4830357 02569A50 52002705 FF429688 FF408688 50520065 05FF0896 88FF0686 ........e.RP..à...B..'.RP.V.W..á 0001E0

Dump of file SATURN:[PCCOMMON.DUMP.DLL]DA-IMPRT.DLL;1 on 18-APR-1990 10:39:02.20
File ID (459,7,0)   End of file block 93 / Allocated 96

Virtual block number 22 (00000016), 512 (0200) bytes

FF069EC4 9676FF98 76FF006A 000003D1 9A006AFF 4086FFFF 42B6FF28 8C681E08 ..h.(.Ñ8..Ñà.j..!...j..v..v.á... 000000
56880A46 8B1408E9 0EC48308 7A29CA9A 0676FF08 76FF0086 87FF2600 88B7FF26 &.ñ..&.ñ...v..v..ò)z..á.Õ...F..V 000020
8908C483 03F4221F 9A0676FF 0876FFFE F4B6FFFE F6B6FFFE F69689FE F486890C ...¶±..-±.Ñ-±.Ñ¶±.v..v..."¶..á.. 000040
00003DFE F2868900 00FFFF9A 50168E46 8D036A06 76FF0876 FFFEE096 89FEDE86 .Ñ±..À±.v..v.j..F..P. .....±=.. 000060
9A5016FF 5C868050 52002105 FEF69688 FEF48688 138EE9FE F2868800 07E90375 u.Õ.....±Õ/...¶±..-±.!.?P..\..P. 000080
F2868900 00090C9A 5016FF5C 8680026A 8E76FF90 76FF0676 FF0876FF 0000FFFF .....v..v..v..v.j...\..P....... 0000A0
8688036A 8E76FF90 76FF0676 FF0876FF 137AE9FE F2868800 07E90375 00003DFE ±=..u.Õ.....±Õz..v..v..v..v.j... 0000C0
FEF28688 0007E903 75000030 FEF28689 0000093F 9A505200 4205FEF6 9688FEF4 ¶±..-±.B.RP.?......±=..u.Õ.....± 0000E0
729A5052 004A05FE F69688FE F4868804 6A8E76FF 9076FF06 76FF0876 FF1347E9 ÕG..v..v..v..v.j...¶±..-±.J.RP.r 000100
FF9076FF 0676FF08 76FF1314 E9FEF286 880007E9 03750000 3DFEF286 89000009 ......±=..u.Õ.....±Õ...v..v..v.. 000120
E9037500 0030FEF2 86890000 03309A50 52004605 FEF69688 FEF48688 056A8E76 v.j...¶±..-±.F.RP.0......±=..u.Õ 000140
EE86C600 36E949FE EE86C600 23E9984E 478A26FE F49EC412 E1E9FEF2 86880007 .....±ÕÀ.á.¶±&.GN.Õ#.ó.Y±IÕ6.ó.Y 000160
FFE5E903 75004130 0018E900 1EE949FE EE86C600 26E941FE EE86C600 2EE958FE ±XÕ..ó.Y±AÕ&.ó.Y±IÕ..Õ..=A.u.ÕI. 000180
6A8E76FF 9076FF06 76FF0876 FFFFDAE9 FFCDE903 75005830 FFCDE903 75004930 =I.u.Õe.=X.u.Õe.ÕÕ..v..v..v..v.j 0001A0
C6126BE9 FEF28688 0007E903 75000030 FEF28689 00000AF1 9A5016FE EE868006 ...Y±.P.þ......±=..u.Õ.....±Õk.ó 0001C0
F2868900 0006AB9A 5016FF26 8680076A 8E76FF90 76FF0676 FF0876FF 53FF2686 .&.S.v..v..v..v.j...&..P.¨ ..... 0001E0

Dump of file SATURN:[PCCOMMON.DUMP.DLL]DA-IMPRT.DLL;1 on 18-APR-1990 10:39:02.20
File ID (459,7,0)   End of file block 93 / Allocated 96

Virtual block number 23 (00000017), 512 (0200) bytes

1F9A0676 FF0876FF FEF4B6FF FEF6B6FF 123AE9FE F2868800 07E90375 00003DFE ±=..u.Õ.....±Õ:..Ñ-±.Ñ¶±.v..v... 000000
FEE086FF 106A8E76 FF9076FF 0676FF08 76FFFEE0 9689FEDE 868908C4 830A9822 "...á...B±..À±.v..v..v..v.j..ÑÀ± 000020
086A11EC E9FEF286 880007E9 03750000 3DFEF286 8900000C 529A126A FEDEB6FF .Ñ8±j..R......±=..u.Õ.....±Õ$.j. 000040
0EC4830C 2129CA9A 0676FF08 76FF5277 FF265477 FF26FEF4 9EC48E76 FF9076FF .v..v.á.¶±&.wT&.wR.v..v..ò)!..á. 000060
08959A50 16FEFC86 8D046A06 76FF0876 FF845689 8246890C 56880A46 8811C0E9 Õá..F..V..F..V..v..v.j...*±.P... 000080
FFFEFEB6 FF0676FF 0876FF11 95E9FEF2 86880007 E9037500 0030FEF2 86890000 .....±=..u.Õ.....±Õ...v..v..Ñ±±. 0000A0
07E90375 00003DFE F2868900 0008249A 50520084 0584568B 82468802 6AFEFC86 Ñ=±j..F..V....RP.$......±=..u.Õ. 0000C0
8C058456 8882468B 036AFEFC B6FFFEFE B6FF0676 FF0876FF 1162E9FE F2868800 ....±Õb..v..v..Ñ±±.Ñ=±j..F..V... 0000E0
76FF0876 FF112FE9 FEF28688 0007E903 75000030 FEF28689 00000857 9A505200 .RP.W......±=..u.Õ.....±Õ/..v..v 000100
30FEF286 8900000B 8A9A5052 00880584 56888246 88046AFE FCB6FFFE FE86FF06 ..Ñ±±.Ñ=±j..F..V....RP........±= 000120
4688056A FEFCB6FF FEFEB6FF 0676FF08 76FF10FC E9FEF286 880007E9 03750000 ..u.Õ.....±Õ•..v..v..Ñ±±.Ñ=±j..F 000140
C9E9FEF2 86880007 E9037500 0030FEF2 86890000 088D9A50 52009005 84568882 ..V....RP.§......±=..u.Õ.....±Õè 000160
0008F09A 50520098 0584568B 82468806 6AFEFCB6 FFFEFEB6 FF0676FF 0876FF10 ..v..v..Ñ±±.Ñ=±j..F..V....RP.Þ.. 000180
B6FFFEFE B6FF0676 FF0876FF 1096E9FE F2868800 07E90375 00003DFE F2868900 .....±=..u.Õ.....±Õ...v..v..Ñ±±.Ñ 0001A0
0007E903 75000030 FEF28689 00000809 9A505200 94058456 88824688 076AFEFC =±j..F..V....RP.\......±=..u.Õ.. 0001C0
6F9A0676 FF0876FF 8276FF84 76FF5052 00420584 56888246 881063E9 FEF28688 .....±Õc..F..V..B.RP.v..v..v..v..o 0001E0
```

```
Dump of file SATURN:[PCCOMMON.DUMP.DLL]DA-IMPRT.DLL;1 on 18-APR-1990 10:39:02.20
File ID (459,7,0)   End of file block 93 / Allocated 96

Virtual block number 24 (00000018), 512 (0200) bytes

 FF0676FF 0876FF10 31E90001 880006E9 0374D008 9056898E 46890CC4 830C881C ....á..F..V..At.Ō..¡..Ō1..v..v.. 000000
 E9037500 0030FEF2 86890000 0C899A0D 6AFEFCB6 FFFEFEB6 FF136A8E 76FF9076 v..v.j..Å±±.Å=±j..¿......±=..u.Ō 000020
 FF505200 21058456 88824688 50520063 05845688 82468810 01E9FEF2 86880007 ....±Ō...F..V..c.RP.F..V..I.RP. 000040
 0FCAE900 01L80006 E9037400 08905689 8E46890C C483002E 1C6F9A06 76FF0876 v..v..o....á..F..V..At.Ō..¡..Ōò. 000060
 F2868900 00FFFF9A 0E6AFEFC 86FFFEFE 86FF136A 8E76FF90 76FF0676 FF0876FF .v..v..v..v.j..Å±±.Å=±j........ 000080
 129689FF 10868v0C 56880A46 880F90E9 0F9AE9FE F2868800 07E90375 00003DFE ±=..u.Ō....±Ō..Ō...F..V........ 0000A0
 FEF28689 0000FFFF 9A016AFF 1086FFFF 1286FF50 16FF4C86 800676FF 0876FFFF ..v..v...L..P.Å...Å..j.........± 0000C0
 77FF26FF 109EC4FF 4C86FFFF 4E86FF04 6A0F58E9 FEF28688 0007E903 7500003D =..u.Ō....±Ō[.j..ÅN..ÅL.á...&.w 0000E0
 50520021 05FF1296 88FF1086 880EC483 085329CA 9A0676FF 0876FF42 77FF2644 D&.w8.v..v..ò)S..á...........I.RP 000100
 AB9A5016 FF7E868D 276A006A 289036FF 0076E903 7500003D 04C48307 7202869A .Å.r..á.=..u.Ōv..6.(j.j'..-..P.¨ 000120
 C4000407 C726FF7E 9EC40EF4 E9FEF286 880007E9 03750000 3DFEF286 89000007 ......±=..u.Ō....±Ō¶.á.~.&ú...á 000140
 50520021 05FF1296 88FF1086 88045789 26024789 26FF4E96 88FF4C86 88FF7E9E .~...L...N.&.G.&.W...........I.RP 000160
 6AFF7EB6 FF8076FF 288C681E 08C48300 4302569A 50520006 05805688 FF7E8688 ..~..V....RP.V.C..á..h.(.v..Å-.j 000180
 76FF0876 FFEE76FF F076FFF0 5689EE46 890C5688 0A46880E 9AE90000 08309A00 ..0...Ō...F..V..FŸ.VÞ.vÞ.vŸ.v..v 0001A0
 80FF4CB6 FFFF4EB6 FF0676FF 0876FFFF 4E9689FF 4C868908 C4830A41 26FA9A06 ..ªåA..á...L...N..v. v..ÅN..ÅL.. 0001C0
 03750000 30FEF286 890000FF FF9A016A 505200C6 05F05688 EE468850 16FF2886 .(..P.FŸ.VÞ.6.RPj....  ..±=..u. 0001E0

Dump of file SATURN:[PCCOMMON.DUMP.DLL]DA-IMPRT.DLL;1 on 18-APR-1990 10:39:02.20
File ID (459,7,0)   End of file block 93 / Allocated 96

Virtual block number 25 (00000019), 512 (0200) bytes

 F05688EE 4688066A FF2886FF FF2A86FF 0676FF08 76FF0E40 E9FEF286 880007E9 Ō....±Ōā..v..v..Å*..Å(.j..FŸ.VÞ 000000
 0000880E 00E9FEF2 86880007 E9037500 0030FEF2 86890000 0A199A50 5200E705 .Ō.RP.........±=..u.Ō....±Ō..¡.. 000020
 FF509E80 0E83053A 9A1EAA1E 8DFF3C86 89FF2C86 89FA4689 FF0E8689 FEE28689 ..â±.....F*..,...<..¯..:......P. 000040
 F4028C9A 505200E9 05F05688 EE468801 64681E0E 9F06039A 9A5E8D0E 8806889A .£....^..£....hd..FŸ.VÞ.Ō.RP...¶ 000060
 6AFF2886 FFFF2A86 FF0676FF 0876FF49 FEEC86C6 0036E903 7400003D 08C4830E ..á.=..t.Ō6.6.£±I.v..v..Å*..Å(.j 000080
 E90088E9 FEF28688 0007E903 7500003D FEF28689 00000F1D 9A5016FE EC868009 ...$±.P........±=..u.Ō....±Ō..Ō 0000A0
 36E90374 00003008 C4830F49 028C9A50 5200E905 F05688EE 4688016C 681E0209 l..hl..FŸ.VÞ.Ō.RP...l..á.=..t.Ō6 0000C0
 000F729A 5016FF32 8680096A FF2886FF FF2A86FF 0676FF08 76FF52FF 3286C600 .6.2.R.v..v..Å*..Å(.j...2..P.r.. 0000E0
 5688EE46 88017168 1E0284E9 0036E9FE F2868800 07E90375 00003DFE F2868900 .....±=..u.Ō....±Ō6.Ō...hq..FŸ.V 000100
 76FF0876 FF42FEE4 86C60036 E9037400 003008C4 830F9E02 8C9A5052 00E905F0 Þ.Ō.RP......á.=..t.Ō6.6.Ō±B.v..v 000120
 E9037500 0030FEF2 86890000 0FC79A50 16FEE486 8D096AFF 2886FFFF 2A86FF06 ..Å*..Å(.j...Ō±.P.ú......±=..u.Ō 000140
 0FF3028C 9A505200 E905F056 88EE4688 0179681E 022FE90C E1E9FEF2 86880007 .....±ŌÅ.Ō/..hy..FŸ.VÞ.Ō.RP...µ. 000160
 096AFF28 86FFFF2A 86FF0676 FF0876FF 4DFF3E86 C60036E9 03740000 3D08C483 .á.=..t.Ō6.6.>.M.v..v..Å*..Å(.j. 000180
 DAE90C8C E9FEF286 880007E9 03750000 30FEF286 89000010 1C9A501( FF3E8680 ..>..P........±=..u.Ō....±Ō..ŌŌ 0001A0
 0036E903 74000030 08C48310 48028C9A 505200E9 05F05688 EE468801  ¨681E01 ..h...FŸ.VÞ.Ō.RP...H..á.=..t.Ō6. 0001C0
 00001071 9A5016FF 58868009 6AFF2886 FFFF2A86 FF0676FF 0876FF55 F.5886C6 6.X.U.v..v..Å*..Å(.j...X..P.q... 0001E0

Dump of file SATURN:[PCCOMMON.DUMP.DLL]DA-IMPRT.DLL;1 on 18-APR-1990 10:39:02.20
File ID (459,7,0)   End of file block 93 / Allocated 96

Virtual block number 26 (0000001A), 512 (0200) bytes

 F05688EE 46880185 681E0185 E90C37E9 FEF28688 0007E903 7500003D FEF28689 ...±=..u.Ō.....±Ō7.Ō...h...FŸ.VÞ 000000
 0676FF08 76FF56FF 1E86C600 36E90374 00003008 C483109D 028C9A50 5200E905 .Ō.RP......á.=..t.Ō6.6...V.v..v. 000020
 07E90375 00003DFE F2868900 0010C49A 5016FF1E 8680096A FF2886FF FF2A86FF .Å*..Å(.j.......P.á......±=..u.Ō. 000040
 8310F002 8C9A5052 00E905F0 5688EE46 88018868 1E0130E9 08E2E9FE F2868800 ....±Ōā.ŌŌ..h...FŸ.VÞ.Ō.RP...Þ.. 000060
 4680096A FF2886FF FF2A86FF 0676FF08 76FF54FC 46C60034 E9037400 003008C4 á.=..t.Ō4.6F=T.v..v..Å*..Å(.j..F 000080
 681E000D E9088FE9 FEF28688 0007E903 7500003D FEF28689 00001119 9A5016FC =.P..........±=..u.Ō....±Ō..ŌI..h 0000A0
 0486C600 36E90374 00003008 C4831145 028C9A50 5200E905 F05688EE 46880196 ...FŸ.VÞ.Ō.RP...E..á.=..t.Ō6.6.. 0000C0
 F2868900 00116E9A 5016FF04 8680096A FF2886FF FF2A86FF 0676FF08 76FF4EFF .N.v..v..Å*..Å(.j.......P.n......· 0000E0
 00E905F0 5688EE46 8801A368 1E0088E9 083AE9FE F2868800 07E90375 00003DFE ±=..u.Ō.....±Ō:.Ō...hÈ..FŸ.VÞ.Ō. 000100
 2A86FF06 76FF0876 FF43FF04 86C60036 E9037400 003008C4 8311C002 8C9A5052 RP....ë..á.=..t.Ō6.6...C.v..v..Å* 000120
 86880007 E9037500 0030FEF2 86890000 11A49A50 16FF0486 80096AFF 2886FFFF ..Å(.j.......P.Ê......±=..u.Ō.... 000140
 04868009 6AFF2886 FFFF2A86 FF0676FF 0876FF43 FF0486C6 0033E90A E5E9FEF2 ·±ŌI.Ō3.6...C.v..v..Å*..Å(.j.... 000160
 8801A968 1E0AAFE9 FEF28688 0007E903 7500003D FEF28689 0000120C 9A5016FF ..P..........±=..u.Ō....±Ō€..h`.. 000180
 F05688EE 46880092 E9037400 003008C4 8311E802 8C9A5052 00E905F0 5688EE46 FŸ.VÞ.Ō.RP...Ō..á.=..t.Ō...FŸ.VÞ 0001A0
 FFFF2A86 FF0676FF 0876FFFF 029689FF 00868904 C48300AF 02FC9A50 5200FC05 .•.RP.•.£..á...........v..v..Å*.. 0001C0
 FEF28688 0007E903 7500003D FEF28689 00000E46 9A5016FF 0086800A 6AFF2886 Å(.j......P.F.......±=..u.Ō.....± 0001E0
```

```
Dump of file SATURN:[PCCOMMON.DUMP.DLL]DA-IMPRT.DLL;1 on 18-APR-1990 10:39:02.20
File ID (459,7,0)   End of file block 93 / Allocated 96

Virtual block number 27 (0000001B), 512 (0200) bytes

76FFFF02 9689F~.' 868904C4 830E7A02 FC9A5052 010F05F0 5688EE46 880A47E9 ÕG..FŸ.VÞ...RP.•.ƶ..á.........v 000000
00003DFE F2868900 0012FA9A 5016FF00 8680086A FF2886FF FF2A86FF 0676FF08 ..v..Ñ*..Ñ(.j......P.*.....±=.. 000020
1299028C 9A505200 E905F056 88EE4688 0186681E 09FEE9FE F2868800 07E90375 u.Õ.....±Õ±..hÑ..FŸ.VÞ.Õ.RP..... 000040
868904C4 8312AD02 FC9A5052 00FC05F0 5688EE46 880084E9 03740000 3008C483 .á.=..t.ÕÇ..FŸ.VÞ.•.RP.•.Ù..á... 000060
010F05F0 5688EE46 8812C506 039A9A5E 8D128505 A39AFF00 9E8DFF02 9689FF00 ..........Ê.ç..^..Æ.é..FŸ.VÞ... 000080
9AFF509E 8D12E205 A39AFF00 9E8DFF02 9689FF00 868904C4 83120902 FC9A5052 RP.•.l..á..............Ê.å...P.. 0000A0
86890000 13289A50 169A468D 006AFF28 86FFFF2A 86FF0676 FF0876FF 13510603 Æ.Q..v..v..Ñ*..Ñ(.j..F..P.(..... 0000C0
6AFF2886 FFFF2A86 FF0676FF 0876FF09 59E9FEF2 86880007 E9037500 003DFEF2 ·±*..u.Õ.....±ÕY..v..v..Ñ*..Ñ(.j 0000E0
1E0928E9 FEF28688 0007E903 75000030 FEF28689 000013B9 9A5016FF 5086800E ...P..P.¿.....±=..u.Õ.....±Õ+.. 000100
468800A0 E9037400 003008C4 83136C02 8C9A5052 00E905F0 5688EE46 8801BE68 h/..FŸ.VÞ.Õ.RP...l..á.=..t.Õ...F 000120
1FA5A5A5 A5DA8E1E 0716F088 9A7E8004 C483138E 03009A50 5200FC05 F05688EE Ÿ.VÞ.•.RP......á..−..Þ....ÕEEEE. 000140
A5A5DA8E 1E0716F0 88FF508E 8004C483 140C0300 9A505201 0F05F056 88EE4688 .FŸ.VÞ...RP......á../P..Þ....ÕEE 000160
F2868900 0013E79A 50169A46 8D006AFF 2886FFFF 2A86FF06 76FF0876 FF1FA5A5 ÉE..v..v..Ñ*..Ñ(.j..F..P.Õ.....· 000180
0E6AFF28 86FFFF2A 86FF0676 FF0876FF 089AE9FE F2868800 07E90375 000030FE ±=..u.Õ.....±Õ...v..v..Ñ*..Ñ(.j. 0001A0
4688086C E9FEF286 880007E9 03750000 3DFEF286 89000015 439A5016 FF50868D ..P..P.C.......±=..u.Õ.....±Õl..F 0001C0
6A006A28 9036FF00 76E90375 00003004 C4831477 02869A50 5200A505 F05688EE Ÿ.VÞ.E.RP.Ñ.w..á.=..u.Õv..6.(j.j 0001E0
```

```
Dump of file SATURP:[PCCOMMON.DUMP.DLL]DA-IMPRT.DLL;1 on 18-APR-1990 10:39:02.20
File ID (459,7,0)   End of file block 93 / Allocated 96

Virtual block number 28 (0000001C), 512 (0200) bytes

C4082BE9 FEF28688 0007E903 75000030 FEF28689 0000005F 9A5016FF 14868D27 '.....P.......±=..u.Õ.....±Õ+.á 000000
88EE4688 04578926 02478926 FF2A9688 FF288688 FF149EC4 000507C7 26FF149E ...&ú...Ӗ.....(...*.&.G.&.W..FŸ. 000020
288C681E 08C48312 3102569A 50520006 05FF1696 88FF1486 88505200 A505F056 VÞ.E.RP............RP.V.1..á..h.( 000040
FF229689 FF208689 0C56880A 468807D1 E9000000 C29A006A FF1486FF FF1686FF .Ñ...Ñ..j..ó...Õl..F..V... ...". 000060
76FFFEE0 9689FEDE 868908C4 83157722 1F9A0676 FF0876FF FF2086FF FF2286FF .Ñ"..Ñ ..v..v..."w..á...B±..A±.v 000080
016A5052 002105FF 229688FF 20868850 16084680 FEDE86FF FEE086FF 0676FF08 ..v..ÑA±.ÑB±.FÁ.P.. ..."..l.RPj. 0000A0
42478A26 FF209EC4 0772E9FE F2868800 07E90375 000030FE F2868900 00FFFF9A .......±=..u.Õ.....±Õr.á. .&.GB 0000C0
75004E30 0013E900 16E94E92 46C60010 E94E9246 C60024E9 599246C6 0018E998 .Õ..6F.YÕ$.6F.NÕ..6F.NÕ..Õ..=N.u 0000E0
92468D04 6AD876FF DA76FF06 76FF0876 FFFFE3E9 FFD8E903 75005930 FFE7E903 .ÕÕ.=Y.u.ÕA.ÕD..v..v..vÕ.vÁj..F. 000100
FFDA76FF 036A0710 E9FEF286 880007E9 03750000 3DFEF286 8900000E C89A5016 .P.å.......±=..u.Õ.....±Õ..j..vÕ. 000120
8806E4E9 0EC48315 A529CA9A 0676FF08 76FF4377 FF264577 FF26FF20 9EC40876 vÁá. .&.wE&.wC.v..v..Þ)E..á.ÕÕ.. 000140
FF0876FF C476FFC6 76FF5052 002105C6 5688C446 88C65689 C446890C 56880A46 F..V..Fá.V6.Fá.V6.l.RP.v6.vá.v.. 000160
C4468806 ADE90001 880006E9 0374000B DA568908 46890CC4 8315071E 489A0676 v..K.■..á..FÁ.VÕ.Ât.Õ..¡..ÕU..Fá 000180
89964689 0CC48300 E4105D9A 0676FF08 76FFC476 FFC676FF 50520042 05C65688 .V6.B.RP.v6.vá.v..v..].Õ..á..F.. 0001A0
9876FF08 6AD876FF DA76FF06 76FF0876 FF067BE9 00018800 06E90374 D0089856 V..Ât.Õ..¡..Õ(..v..v..vÕ.vÁj..v. 0001C0
0643E906 4DE9FEF2 86880007 E9037500 003DFEF2 86890000 0A679A11 6A9676FF .v.j..g......±=..u.Õ.....±ÕM.ÕC. 0001E0
```

```
Dump of file SATURN:[PCCOMMON.DUMP.DLL]DA-IMPRT.DLL;1 on 18-APR-1990 10:39:02.20
File ID (459,7,0)   End of file block 93 / Allocated 96

Virtual block number 29 (0000001D), 512 (0200) bytes

FFFF4686 FF505200 2105FF46 9688FF44 8688FF46 9689FF44 86890C56 880A4688 .F..V...D...F...D...F..l.RP.ÑF.. 000000
01880006 E90374D0 08DA5689 0846890C C4831682 1E489A06 76FF0876 FFFF4486 ÑD..v..v..K....á..FÁ.VÕ.Ât.Õ..¡. 000020
9A0676FF 0876FFFF 4486FFFF 4686FF50 52004205 FF469688 FF448688 C406E900 .Õ....D...F..B.RP.ÑF..ÑD..v..v.. 000040
0676FF08 76FF0500 E90001B8 0006E903 74D00890 56898E46 890CC483 17..1C6F o....á..F..V..Ât.Õ..¡..ÕÁ..v..v. 000060
07E90375 00003DFE F2868900 0016069A 126A8E76 FF9076FF 096AD876 FFDA'6FF .vÕ.vÁj..v..v.j.........±=..u.Õ. 000080
8D0676FF 0876FFFF 1A9689FF 1886890C 56880A46 880598E9 05A2E9FE F2868800 ....±ÕA.Õ...F..V..........v..v.. 0000A0
00008805 6DE9FEF2 86880007 E9037500 003DFEF2 86890000 19209A50 16FEE686 .l±.P. ......±=..u.Õ.....±Õm.l.. 0000C0
86880133 E904C483 17452FA2 9A505200 6805FF1A 9688FF18 8688F646 89F84689 .F%.f-.........h.RP.Á/E..á.Õ3... 0000E0
FF0876FF 5052007B 05FF1A96 88FF1886 880154E9 F85689F6 4689FEE8 9688FEE6 l±..Õ±.F-.V%ÕT.........(.RP.v.. 000100
0123E905 0DE90001 B80006E9 0374000B F85689F6 468908C4 83177626 FA9A0676 v..*&v..á..F-.V%.Ât.Õ..¡..Õ..Õ#. 000120
5689F646 8908C483 17A7221F 9A0676FF 0876FF50 52007B05 FF1A9688 FF188688 .........(.RP.v..v..."Ï..á..F-.V 000140
76FF5052 007805FF 1A9688FF 18868800 F2E904DC E90001B8 0006E903 74D008F8 %.Ât.Õ..¡..ÕÉ.Õ.........(.RP.v 000160
E904ABE9 00018800 06E90374 D008F856 89F64689 08C48317 D8260A9A 0676FF08 ..v...&Á..á..F-.V%.Ât.Õ..¡..Õ¨.Õ 000180
F6468908 C4831830 24AD9A06 76FF0876 FF505200 7805FF1A 9688FF18 868800C1 è..........(.RP.v..v..Ù$Õ..á..F- 0001A0
50520034 05FF1A96 88FF1886 880090E9 047AE900 01880006 E9037400 08F85689 .V%.Ât.Õ..¡..Õz.Õ...........4.RP 0001C0
9688FF18 86885052 006805FF 1A9688FF 18868850 52004705 FF1A9688 FF188688 .........G.RP.........h.RP...... 0001E0
```

Dump of file SATURN:[PCCOMMON.DUMP.DLL]DA-IMPRT.DLL;1 on 18-APR-1990 10:39:02.20
File ID (459,7,0)   End of file block 93 / Allocated 96

Virtual block number 30 (0000001E), 512 (0200) bytes

```
E90374D0 08F85689 F6468914 C4831945 230F9A06 76FF0876 FF505200 7B05FF1A ...(.RP.v..v...#E..ó..F-.V½.Ât.Õ 000000
FECFE903 7500013D FEC6E903 75C00800 32E90035 E90038E9 0422E900 01880006 ..¦..Õ".Õ8.Õ5.Õ2..åu.Õó±=..u.Õù± 000020
FF73E903 7500073D FF4AE903 7500043D FF21E903 7500033D FEF8E903 7500023D =..u.Õ½±=..u.ÕI.=..u.ÕJ.=..u.Õs. 000040
8B5016C8 4680F676 FFF876FF 0676FF08 76FF002C E90375F8 4608F646 8BFFC8E9 Õå..F-.F¾u.Õ,..v..v..v½.v-.Få.P. 000060
0000FEF2 86C/0006 E9FEF286 890000FF FF9A016A 5052009C 05FF1A96 8BFF1886 ..........RPj.........±Õ..ú..±.. 000080
0C86FF50 16FF3486 800676FF 0876FFFF 0C9689FF 0A86890C 56880A46 8803A0E9 Õ...F..V..........v..v...4..P.Ñ. 0000A0
46880365 E9FEF286 890000FF FF9A5052 002105FF 0C9688FF 0A8688FF 0AB6FFFF ..Ñ...........!.RP........±Õe..F 0000C0
9A5016FE E6868D06 76FF0876 FFF64689 T8468900 0088D656 89D44689 0C56880A ..V..Få.V¤¦...F½.F-.v..v...Ì±.P. 0000E0
00890506 56880446 880333E9 FEF28688 0007E903 7500003D FEF28689 0000FFFF .......±=..u.Õ.....±Õ3..Få.V¤... 000100
21FF1C86 C7F85689 F64689FE E89688FE E6868801 7CE904C4 8319782F A29A5052 RP.Å/x..ó.Õ|...Ì±..Õ±.F-.V¾ú...! 000120
F6468908 C48319AD 26FA9A06 76FF0876 FF505200 9C050656 88044688 0185E900 .Õ...Få.V¤...RP.v..v..ªÆÜ..ó..F- 000140
05065688 D4468801 50E9000A FF1C86C7 020AE900 01880006 E9037400 08F85689 .V½.Ât.Õ..¦..ÕÕ.ú.....ÕP..Få.V¤. 000160
B80006E9 0374000B F85689F6 468908C4 83148122 1F9A0676 FF0876FF 5052009C ..RP.v..v..."Ý..ó..F-.V½.Ât.Õ..¦ 000180
9A0676FF 0876FF50 52009C05 D6568804 4688011B E90017FF 1C86C702 A5E90001 ..ÕE.ú.....Õ...Få.V¤...RP.v..v.. 0001A0
0016FF1C 86C70270 E90001B8 0006E903 74D008F8 5689F646 8908C483 1A17260A .ß...ó..F-.V½.Ât.Õ..¦..Õp.ú..... 0001C0
89F64689 08C4831A 4C24AD9A 0676FF08 76FF5052 009C05D6 56880446 8800E6E9 ÕI..Få.V¤...RP.v..v..Ü$L..ó..F-. 0001E0
```

Dump of file SATURN:[PCCOMMON.DUMP.DLL]DA-IMPRT.DLL;1 on 18-APR-1990 10:39:02.20
File ID (459,7, )   End of file block 93 / Allocated 96

Virtual block number 31 (0000001F), 512 (0200) bytes

```
9C050656 88044688 0081E900 16FF1C86 C70238E9 00018800 06E90374 D008F856 V½.Ât.Õ..¦..Õ;.ú.....ÕÝ..Få.V¤.. 000000
01880006 E90374D0 08F85689 F6468908 C4831AA2 27EA9A06 76FF0876 FF505200 .RP.v..v..ó'Å..ó..F-.V½.Ât.Õ..¦. 000020
68050656 88044688 50520055 05065688 D4468800 7CE90018 FF1C86C7 0206E900 .Õ..ú.....Õ|..Få.V¤.U.RP.Få.V¤.h 000040
9A0676FF 0876FF50 52009C05 D6568804 46885052 008905D6 56880446 88505200 .RP.Få.V¤...RP.Få.V¤...RP.v..v.. 000060
0008FF1C 86C701B0 E90001B8 0006E903 74D008F8 5689F646 8914C483 164C230F .#L..ó..F-.V½.Ât.Õ..¦..Õ¯.ú..... 000080
CE199919 64194D1A D9A7FF2E 93C003FF F2E90376 00073000 20E90023 E90026E9 Õ£.Õ#.Õ .=..v.Õ·..å...Ï).M.d...ö 0000A0
FF9A5016 CC468D1F 6AFEE686 FFFEE886 FF0676FF 0876FF1A 6D1AC31A 381A0319 ...ß.û.m..v..v..ÑÕ±.Ñl±j..Fä.P.. 0000C0
C4FF3A96 89FF3886 89CE5688 CC468801 59E90001 B80006E9 03750000 3D0000FF ...=..u.Õ..¦..ÕY..Fä.Vö..ß...:.ó 0000E0
37FF2602 77FF26FF 389EC406 76FF0876 FF0071E9 03750247 0B260788 26FF389E .ß.&..&.G.u.Õq..v..v.ó.ß.&.w.&.7 000100
76FF0876 FF010FE9 00018800 17E90375 00003000 00FFFF9A 5016FEEA 868D026A j...Õ±.P.....=..u.Õ..¦..Õ...v..v 000120
D476FFD6 76FF0000 FFFF9A50 16A2468D FEEAB6FF 00001BC8 9ACC76FF CE76FF06 ..vö.vä.å....ÑÕ±.FÅ.P......v¤.vå 000140
FF7FE904 FF388683 0008E900 03E90374 00003008 C483127E 028C9A50 16A2468D .FÅ.P...-..ó.=..t.Õ..Õ....ß..Õ.. 000160
76FF0876 FF0017F9 03740247 08260788 26FF389E C40010E9 0375F846 08F64688 .F-.F¾u.Õ..ó.ß.&..&.G.t.Õ...v..v 000180
B6FFF676 FFF876FF 0676FF08 76FF0098 E90001B8 00001C09 9ACC76FF CE76FF06 ..vö.vä.....¦..Õ...v..v..v½.v-.Ñ 0001A0
FF0876FF 0017E90³ 7500003D 000016B1 9A056A37 FF260277 FF26FF38 9EC4FF1C ..ó.ß.&.w.&.7j..Ÿ...=..u.Õ...v.. 0001C0
9ACC76FF CE76FF06 76FF0876 FF0057E9 00018800 001C209A CC76FFCE 76FF0676 v..vö.vä. ...¦..ÕW..v..v..vö.vä. 0001E0
```

Dump of file SATURN:[PCCOMMON.DUMP.DLL]DA-IMPRT.DLL;1 on 18-APR-1990 10:39:02.20
File ID (459,7,0)   End of file block 93 / Allocated 96

Virtual block number 32 (00000020), 512 (0200) bytes

```
2700181C 3DA7FF2E 93C003FF F2E90376 00123D00 36E90039 E9003CE9 0000FFFF ....Õ<.Õ9.Õ6.=..v.Õ·..å...Ï=...' 000000
78049803 FC1C2718 FE18C316 C8162015 7F149208 5B0AA30D C90CD305 F200571C .W.·.Æ.è.È.[..... .ù.ù.±.'.=...x 000020
76FF1076 FFD88E00 08881E56 57000054 CBCBC95F 5E1F0000 E9FEF286 88003105 .1...·±Õ...^_èùàT..WV.¦...Ã.v..v 000040
8908C483 19E2221F 9A0676FF 0876FF0A 76FF0C76 FF000008 C09A5016 D646800E ..F¤.P.å....v̄..v..v..v..."ã..ó.. 000060
00003D00 001AFF9A 5016FC46 8D126AAC 76FFAE76 FF0676FF 0876FFAE 5689AC46 F¯.VÜ.v..v..vÜ.v¯j..F¤.P.....=.. 000080
078B26D2 5EC4D456 89024689 FE568BFC 4688008A E90000BA 00008800 09E90375 u.Õ..¦..¤..Õ...F¤.V±.FØ.Våó^Ø£.. 0000A0
8D026AF8 76FFFA76 FF0676FF 0876FF00 4DE90375 D008FA56 89F84689 02578826 &.W..F½.Vª.Åu.ÕM..v..v..vª.v½j.. 0000C0
8D5016D6 4680003E E90000BA 00008800 09E90375 00003000 0018499A 50168046 F¯.P.I...=..u.Õ..¦..¤..Õ>..F¤.P. 0000E0
76FFFF9C E904D246 830007E9 0003E903 7400003D 08C48318 88028C9A 50168046 F¯.P......ó.=..t.Õ..Õ...FØ.Õ...v 000100
0054C8CB C95F5E1F 0000E9FA 5688F846 8800001B 689AFC76 FFFE76FF 0676FF08 ..v..v±.v¤.h....F½.VªÕ...^_èùàT. 000120
FF0A76FF 0C76FF00 001C879A 50160646 800E76FF 1076FFD8 8E1C77B8 1E565700 .WV.¦W..Ã.v..v..F¤.P......v̄..v.. 000140
6AAC76FF AE76FF06 76FF0876 FFAE5689 AC468908 C4831C9A 221F9A06 76FF0876 v..v...".....ó..F¯.VÜ.v..v..vÜ.v¯j 000160
88FC4688 008AE900 008A0000 880009E9 03750000 3000001C 899A5016 FC468D15 ..F=.P.¿....=..u.Õ..¦..¤..Õ...F¤. 000180
FF004DE9 0375000B FA5689F8 46890257 88260788 26025EC4 D45689D2 4689FE56 V±.FØ.Våó^Ø£..&.W..F½.Vª.Åu.ÕM.. 0001A0
880009E9 03750000 3000001D 059A5016 B0468002 6AF876FF FA76FF06 76FF0876 v..v..vª.v½j..F¯.P.....=..u.Õ..¦ 0001C0
E9037400 003008C4 83102702 8C9A5016 B046805O 16064680 003EE900 008A0000 ..¤..Õ>..F¤.P.F¯.P...'..ó.=..t.Õ 0001E0
```

```
Dump of file SATURN:[PCCOMMON.DUMP.DLL]DA-IMPRT.DLL;1 on 18-APR-1990 10:39:02.20
File ID (459,7,0)   End of file block 93 / Allocated 96

Virtual block number 33 (00000021), 512 (0200) bytes

 F8468800 001D4B9A FC76FFFE 76FF0676 FF0876FF FF9CE904 D2468300 07E90003 ..Ö...F#.Ö...v..v..v±.v«.K....F% 000000
 D646800E 76FF1076 FFD88E1D 65B81E56 57000054 C8C8C95F 5E1F0000 E9FA568B .V*Ö...^_èùàT..WV.|e..Å.v..v..F# 000020
 5689AC46 8908C483 1D88221F 9A0676FF 0876FF0A 76FF0C76 FF00001D 759A5016 .P.u....v..v..v..v...".......F¯.V 000040
 09E90375 00003D00 001DA79A 5016FC46 8D136AAC 76FFAE76 FF0676FF 0876FFAE Ù.v..v..vÙ.v¯j..F«.P.|...=..u.Ö. 000060
 02578B26 078B2602 5EC40456 89024689 FE568BFC 4688008A E900008A 00008800 .|..¤..Ö...F«.V±.F#.Vàá^#&..&.W. 000080
 50168046 8D026AF8 76FFFA76 FF0676FF 0876FF00 4DE90375 D00BFA56 89F84689 .F%.V*.Åu.ÖM..v..v..v*.v%j..F¯.P 0000A0
 50168046 8D501606 4680003E E900008A 00008800 09E90375 00003D00 001DF39A .µ...=..u.Ö..|..¤..Ö>..F«.P.F¯.P 0000C0
 0676FF08 76FFFF9C E904D246 830007E9 0003E903 74000030 08C4831E 15028C9A ......á.=..t.Ö..Ö...F#.Ö...v..v. 0000E0
 1E565700 0024C8CB C95F5E1F 0000E9FA 568BF846 8B00001E 399AFC76 FFFE7BFF .v±.v«.9....F%.V*Ö...^_èùà$..WV. 000100
 76FF0000 FFFF9A0A 76FF0C76 FF04C483 1F9F2A6D 9A0676FF 0876FFD8 8E1E538B |S..Å.v..v..m*...á..v..v.......v 000120
 8801A1E9 078B26E4 5EC401D0 E9037400 00300000 FFFF9A50 16E4468D 0A76FF0C ..v..FÖ.P.....=..t.ÖÅ.á^Ö&..ÖÅ.. 000140
 ED221F9A 0676FF08 76FF5052 000605FE 568BFC46 88FE5689 FC4689E6 568BE446 FÖ.V|.F=.V±.F«.V±...RP.v..v..."Ù 000160
 DE76FF0F 6A0277FF 260477FF 26FC5EC4 0676FF08 76FFDE56 890C4689 08C4831F ..á..FÊ.VB.v..v.á^«&.w.&.w.j..vB 000180
 05F2568B F0468BF2 5689F046 89E6568B E4468801 76E90000 20149A14 6ADC76FF .vÊj... ..Öv..FÖ.V|.Fb.V·.Fb.V·. 0001A0
 76FF0676 FF0876FF F65689F4 468908C4 831E7626 FA9A0676 FF0876FF 50520006 ..RP.v..v..*&v..á..F¶.V-.v..v..v 0001C0
 2705F256 88F0468B 00001BF0 9A0B6A02 77FF2604 77FF26F0 5EC4086A F476FFF6 -.v¶j.á^b&.w.&.w.j..b....Fb.V·.' 0001E0

Dump of file SATURN:[PCCOMMON.DUMP.DLL]DA-IMPRT.DLL;1 on 18-APR-1990 10:39:02.20
File ID (459,7,0)   End of file block 93 / Allocated 96

Virtual block number 34 (00000022), 512 (0200) bytes

 74D00BEA 5689E846 890CC483 208A214E 9A0676FF 0876FFF4 76FFF676 FF505200 .RP.v-.v¶.v..v..NI. .á..FÖ.Võ.Åt 000000
 0277FF26 0477FF26 F05EC414 6AE876FF EA76FF06 76FF0876 FF00FCE9 0003E903 .Ö..Ö«..v..v..võ.vÖj.á^b&.w.&.w. 000020
 52000605 E2568BE0 4688E256 89E04689 E6568BE4 46880009 E9000020 BB9A0C6A j..£ ..Ö)..FÖ.V|.FÅ.Vã.FÅ.Vã...R 000040
 FF00A4E9 0003E903 74D00BEE 5689EC46 8908C483 20E2280A 9A0676FF 0876FF50 P.v..v..Ö(ã .á..F$.VŸ.Åt.Ö..ÖÈ.. 000060
 E9000021 139A036A 0277FF26 0477FF26 E05EC413 6AEC76FF EE76FF06 76FF0876 v..v..vŸ.v$j.á^Å&.w.&.w.j...|..Ö 000080
 9A0676FF 0876FF50 52000605 FA568BF8 4688FA56 89F84689 E6568BE4 46880081 ...FÖ.V|.F%.V*.F%.V*...RP.v..v.. 0000A0
 F85EC406 76FF0876 FF004CE9 0003E903 74D00BEA 5689E846 8908C483 1F4E280A Ö(N..á..FÖ.Võ.Åt.Ö..ÖL..v..v.á^% 0000C0
 0023E900 26E900?? E900001F C69A056A E876FFEA 76FF056A 0277FF26 0477FF26 &.w.&.w.j..võ.vÖj..ó...Ö).Ö&.Ö#. 0000E0
 FF2AE903 75000530 FF8AE903 75000430 FE9DE903 75000330 FE57E903 75000230 =..u.ÖW±=..u.Ö.±=..u.Ö..=..u.Ö*. 000100
 F6468900 00B8088E 1F41B81E 56570000 2EC8CBC9 5F5E1F00 00E9FE18 E9FFD7E9 Ö=.Ö.±Ö...^_èùà...WV.|A..Å|...F- 000120
 03750000 3D00001E 959A5016 FC468D09 6A0A76FF 0C76FF06 76FF0876 FFF44689 .F¶.v..v..v..v.j..F=.P......=..u. 000140
 8B26078B 26F85EC4 FA5689F8 4689FE56 8BFC468B 008EE900 008A0000 8B0009E9 Ö..|..¤..Ö...F«.V±.F%.V*á^%&..&. 000160
 D2468D02 6AF476FF F676FF06 76FF0876 FF0051E9 0375D008 F65689F4 46890257 W..F¶.V-.Åu.ÖQ..v..v..v-.v¶j..F# 000180
 50160246 8D0025E9 F44689F6 46890000 B8000CE9 03750000 3D00001E E19A5016 .P.Å...=..u.Ö..|...F-.F¶ÖX..F#.P 0001A0
 FF98E904 F8468300 07E90003 E9037400 003D08C4 831F0302 8C9A0E76 FF1076FF .v..v.......á.=..t.Ö..Ö...F%.Ö.. 0001C0
 C8C8C95F 5E1F0000 E9F6568B F4468800 001F279A FC76FFFE 76FF0676 FF0876FF .v..v..v±.v«.'....F¶.V-Ö...^_èùà 0001E0

Dump of file SATURN:[PCCOMMON.DUMP.DLL]DA-IMPRT.DLL;1 on 18-APR-1990 10:39:02.20
File ID (459,7,0)   End of file block 93 / Allocated 96

Virtual block number 35 (00000023), 512 (0200) bytes

 9A50160A 468D0A76 FF0C76FF AC4689AE 46890000 B8D88E21 56B81E56 57000054 T..WV.|VI.Å|...FÙ.F¯.v..v..FÖ.P. 000000
 B476FFB6 76FF0676 FF0876FF 000016E6 9A5016B4 468D0676 FF0876FF 00001E63 c....v..v..FÇ.P.|....v..v..vÑ.vÇ 000020
 FC468B00 8DE90000 BA000088 0009E903 7500003D 00002177 9A5016FC 468D186A j..F«.P.w|..=..u.Ö..|..¤..Ö...F« 000040
 0050E903 75D00BAE 5689AC46 8902578B 26078826 805EC4B2 56898046 89FE568B .V±.F¯.Vyá^¯&..&.W..F¯.VÙ.Åu.ÖP. 000060
 000CE903 7500003D 000021C3 9A5016B8 468D026A AC76FFAE 76FF0676 FF0876FF .v..v..vÙ.v¯j..F|.P.ùI..=..u.Ö.. 000080
 003D08C4 8321E902 8C9A5016 DA468D50 16B8468D 0024E9AC 4689AE46 89000088 |...FÙ.F¯Ö$..F|.P.FÖ.P...Ö|.á.=. 0000A0
 0022009A FC76FFFE 76FF0676 FF0876FF FF99E904 B0468300 07E90003 E9037400 .t.Ö..Ö...F¯.Ö...v..v..v±.v«..". 0000C0
 46890000 B8D88E22 27B81E56 57000060 C8C8C95F 5E1F0000 E9AE568B AC468800 ..F¯.VùÖ...^_èùà'..WV.|'".Å|...F 0000E0
 9A5016A8 468D0676 FF0876FF 00002240 9A5016D2 468D1276 FF1476FF A04689A2 Å.F..v..v..FÖ.P.ə"...v..v..F´.P. 000100
 7500003D 00002405 9A5016F4 468D186A A876FFAA 76FF0676 FF0876FF 00002250 P"...v..v..v¯.v´j..F¶.P..$..=..u 000120
 26078826 A45EC4A6 5689A446 89F6568B F4468801 38E90000 BA000088 0009E903 .Ö..|..¤..Ö;..F¶.V-.FÊ.V|á^Ê&..& 000140
 468D026A A076FFA2 76FF0676 FF0876FF 0050E903 75D00BA2 5689A046 8902578B .W..F..VÅ.Åu.ÖP..v..v..vÅ.v.j..F 000160
 16AC468D 0024E9A0 4689A246 89000088 000CE903 7500003D 00002451 9A5016AC ¯.P.Ö$..=..u.Ö..|...FÅ.F.Ö$..F¯. 000180
 FF99E904 A4468300 07E90003 E9037400 003D08C4 83247702 8C9A5016 D2468050 P.F#.P...w$.á.=..t.Ö..Ö...FÊ.Ö.. 0001A0
 8D136AA0 76FFA276 FF0676FF 0876FF00 002489BA F476FFF6 76FF0676 FF0876FF .v..v..v-.v¶..$...v..v..vÅ.v.j.. 0001C0
 D0568BCE 468B008E E900008A 00008800 09E90375 00003D00 0022689A 5016CE46 Fö.P.h"..=..u.Ö..|..¤..Ö...Fö.VÅ 0001E0
```

Dump of file SATURN:[PCCOMMON.DUMP.DLL]DA-IMPRT.DLL;1 on 18-APR-1990 10:39:02.20
File ID (459,7,0)   End of file block 93 / Allocated 96

Virtual block number 36 (00000024), 512 (0200) bytes

```
0876FF00 51E90375 D008FA56 89F84689 02578826 078826FC 5EC4FE56 89FC4689 .F•.V±á^=&..&.W..F%.V'.Åu.ÕQ..v. 000000
0000B800 0CE90375 00003000 0022B49A 5016AC46 8D026AF8 76FFFA76 FF0676FF .v..v'.v%j..F¯.P.Ç"..=..u.Õ..¡.. 000020
74000030 08C48322 D9028C9A 0A76FF0C 76FF5016 AC468000 25E9F846 89FA4689 .F'.F%Õ%..F¯.P.v..v....1".á.=..t 000040
88000022 FD9\CE76 FFD076FF 0676FF08 76FFFF98 E904FC46 830007E9 0003E903 .Õ..Õ...F•.Õ...v..v..vÅ.vö.»"... 000060
89A24689 00008808 8E2317B8 1E565700 0060C8CB C95F5E1F 0000E9FA 5688F846 F%.V'Õ...^_èùà'..WV.¡.#.Å¡...FÅ. 000080
76FF0876 FF000023 309A5016 D246800A 76FF0C76 FFF44689 F6468900 0088A046 F.¡...F-.F¶.v..v..F@.P.0#...v..v 0000A0
4B9A5016 CE468D18 6AA876FF AA76FF06 76FF0876 FF000023 409A5016 A8468D06 ..F¯.P.a#...v..v..v¯.v´j..Fö.P.K 0000C0
A65689A4 46890056 8BCE468B 00F1E900 008A0000 B80009E9 03750000 30000025 %..=..u.Õ..¡..¤..Õþ..Fö.VÅ.FÊ.VÌ 0000E0
A276FF06 76FF0876 FF00B4E9 0375D008 A25689A0 46890257 88260788 26A45EC4 á^Ê&..&.W..F..VÅ.Åu.ÕÇ..v..v..vÅ 000100
00A5E900 008A0000 B80009E9 03750000 30000023 589A5016 FC468D12 6AA076FF .v.j..F•.P.X#..=..u.Õ..¡..¤..ÕÉ. 000120
0375D008 F65689F4 46890257 88260788 26F85EC4 FA5689F8 4689FE56 8BFC4688 .F•.V±.F%.V'á^%&..&.W..F¶.V-.Åu. 000140
03750000 30000023 A49A5016 AC468D02 6AF476FF F676FF06 76FF0876 FF0050E9 ÕP..v..v..v-.v¶j..F¯.P.Ê#..=..u. 000160
C48323C9 028C9A50 16D24680 5016AC46 8D0024E9 F44689F6 46890000 B8000CE9 Õ..¡...F-.F¶Õ$..F¯.P.F@.P...è#.á 000180
9AFC76FF FE76FF06 76FF0876 FFFF99E9 04F84683 0007E900 03E90374 00003D08 .=..t.Õ..Õ...F%.Õ...v..v..v±.v•. 0001A0
8BF4468B 000025E0 9ACE76FF D076FF06 76FF0876 FFFF35E9 04A44683 000023ED Ù#...FÊ.Õ5..v..v..vÅ.vö.Å%...F¶. 0001C0
FFF84689 FA468900 00B8D88E 24B5B81E 56570000 54C8CBC9 5F5E1F00 00E9F656 V-Õ...^_èùàT..WV.¡ç$.Å¡...F'.F%. 0001E0
```

Dump of file SATURN:[PCCOMMON.DUMP.DLL]DA-IMPRT.DLL;1 on 18-APR-1990 10:39:02.20
File ID (459,7,0)   End of file block 93 / Allocated 96

Virtual block number 37 (00000025), 512 (0200) bytes

```
FF000024 E79A5016 AC468006 76FF0876 FF000024 D79A5016 0246800A 76FF0C76 v..v..F@.P.▪$...v..v..F¯.P.Ó$... 000000
B80009E9 03750000 30000024 FF9A5016 F4468D1A 6AAC76FF AE76FF06 76FF0876 v..v..vÙ.v¯j..F¶.P..$..=..u.Õ..¡ 000020
46890257 88260788 26FC5EC4 FE5689FC 4689F656 8BF4468B 008DE900 008A0000 ..¤..Õ...F¶.V-.F•.V±á^•&..&.W..F 000040
979A5016 B0468D02 6AF876FF FA76FF06 76FF0876 FF0050E9 0375D008 FA5689F8 %.V'.Åu.ÕP..v..v..v'.v%j..F¯.P.. 000060
16D24680 50168046 8D0024E9 F84689FA 46890000 B8000CE9 03750000 30000025 %..=..u.Õ..¡...F'.F%Õ$..F¯.P.F@. 000080
76FF0876 FFFF99E9 04FC4683 0007E900 03E90374 00003008 C483258C 028C9A50 P...¥%.á.=..t.Õ..Õ...F•.Õ...v..v 0000A0
56570000 54C8CBC9 5F5E1F00 00E9FA56 8BF8468B 000025F8 9AF476FF F676FF06 ..v-.v¶.%%...F%.V'Õ..^_èùàT..WV 0000C0
FF000026 2B9A5016 DA46800A 76FF0C76 FFD24689 D4468900 00B8D88E 26128B1E .¡.&.Å¡...FÅ.F@.v..v...5.P.+&... 0000E0
FC468D16 6AAC76FF AE76FF06 76FF0876 FF000026 3B9A5016 AC468006 76FF0876 v..v..F¯.P.;&...v..v..vÙ.v¯j..F• 000100
4689FE56 8BFC468B 008DE900 008A0000 B80009E9 03750000 30000026 539A5016 .P.S&..=..u.Õ..¡..¤..Õ...F•.V±.F 000120
76FF0876 FF0050E9 0375D008 D45689D2 46890257 88260788 26D65EC4 D85689D6 ▪.VÅá^▪&..&.W..F@.VÅ.Åu.ÕP..v..v 000140
46890000 B8000CE9 03750000 30000026 9F9A5016 B0468D02 6AD276FF D476FF06 ..vå.v@j..F¯.P..&..=..u.Õ..¡...F 000160
03E90374 00003008 C48326C4 028C9A50 160A4680 50168046 8D0024E9 D24689D4 Å.F@Õ$..F¯.P.FÕ.P...á&.á.=..t.Õ. 000180
88D24688 000026E8 9AFC76FF FE76FF06 76FF0876 FFFF99E9 04D64683 0007E900 .Õ...F▪.Õ...v..v..v±.v▪.Ò&...F@. 0001A0
FFD24689 D4468900 00B8D88E 2702B81E 56570000 54C8CBC9 5F5E1F00 00E90456 VåÕ...^_èùàT..WV.¡.'.Å¡...Få.F@. 0001C0
FF000027 2B9A5016 AC468006 76FF0876 FF000027 1B9A5016 DA46800A 76FF0C76 v..v..FÕ.P..'...v..v..F¯.P.+'... 0001E0
```

Dump of file SATURN:[PCCOMMON.DUMP.DLL]DA-IMPRT.DLL;1 on 18-APR-1990 10:39:02.20
File ID (459,7,0)   End of file block 93 / Allocated 96

Virtual block number 38 (00000026), 512 (0200) bytes

```
B80009E9 03750000 30000027 439A5016 FC468D17 6AAC76FF AE76FF06 76FF0876 v..v..vÙ.v¯j..F•.P.C'..=..u.Õ..¡ 000000
46890257 88260788 26D65EC4 D85689D6 4689FE56 8BFC4688 008DE900 008A0000 ..¤..Õ...F•.V±.F▪.VÅá^▪&..&.W..F 000020
8F9A5016 B0468D02 6AD276FF D476FF06 76FF0876 FF0050E9 0375D008 D45689D2 @.Vå.Åu.ÒP..v..v..vå.v@j..F¯.P.. 000040
160A4680 50168046 8D0024E9 D24689D4 46890000 B8000CE9 03750000 30000027 '..=..u.Õ..¡...Få.F@Õ$..F¯.P.FÕ. 000060
76FF0876 FFFF99E9 04D64683 0007E900 03E90374 00003008 C4832784 028C9A50 P...Ç'.á.=..t.Õ..Õ...F▪.Õ...v..v 000080
56570000 54C8CBC9 5F5E1F00 00E90456 88D24688 000027D8 9AFC76FF FE76FF06 ..v±.v▪.Å'...F@.VåÕ...^_èùàT..WV 0000A0
FF000028 089A5016 DA46800A 76FF0C76 FFD24689 D4468900 00B8D88E 27F2B81E .¡·'.Å¡...Få.F@.v..v..FÕ.P..(... 0000C0
FC468D17 6AAC76FF AE76FF06 76FF0876 FF000028 1B9A5016 AC468006 76FF0876 v..v..F¯.P..(...v..v..vÙ.v¯j..F• 0000E0
4689FE56 8BFC4688 008DE900 008A0000 B80009E9 03750000 30000028 339A5016 .P.3(..=..u.Õ..¡..¤..Õ...F•.V±.F 000100
76FF0876 FF0050E9 0375D008 D45689D2 46890257 88260788 26D65EC4 D85689D6 ▪.VÅá^▪&..&.W..F@.Vå.Åu.ÕP..v..v 000120
46890000 B8000CE9 03750000 30000028 7F9A5016 B0468D02 6AD276FF D476FF06 ..vå.v@j..F¯.P..(..=..u.Õ..¡...F 000140
03E90374 00003008 C48328A4 028C9A50 160A4680 50168046 8D0024E9 D24689D4 Å.F@Õ$..F¯.P.FÕ.P...É(.á.=..t.Õ. 000160
88D24688 000028C8 9AFC76FF FE76FF06 76FF0876 FFFF99E9 04D64683 0007E900 .Õ...F▪.Õ...v..v..v±.v▪.à(...F@. 000180
03E90374 0C4680A 4688D88E 28E2B81E 56570000 04C8CBC9 5F5E1F00 00E90456 VåÕ...^_èùà...WV.¡ã(.Ä.f..f.t.Õ. 0001A0
0876FF00 68E90003 E9037400 003004C4 832A5602 B69A0A76 FF0C76FF 0084E900 .Õ...v..v..Ñ.V*.á.=..t.Õ..Õk..v. 0001C0
0676FF08 76FF004E E90003E9 03750000 3000000A BE9A5016 FC468D12 6A0676FF .v.j..F•.P./...=..u.Õ..ÕN..v..v. 0001E0
```

```
Dump of file SATURN:[PCCOMMON.DUMP.DLL]DA-IMPRT.DLL;1 on 18-APR-1990 10:39:02.20
File ID (459,7,0)   End of file block 93 / Allocated 96

Virtual block number 39 (00000027), 512 (0200) bytes

 27E90003 E9037500 00300000 20639A03 6AFC76FF FE76FF12 76FF0E76 FF1076FF .v..v..v..v±.v▪j..c ..=..u.Ō..Ō' 000000
 0C76FF50 4004C483 29940286 9A0A76FF 0C76FFFC 76FFFE76 FF0676FF 0876FF00 ..v..v..v±.v▪.v..v..Ñ..).á.aP.v. 000020
 46C7002A C646C7D8 8E290288 1E565700 004EC8C8 C95F5E1F 0000FFFF 9A0A76FF .v.......^ èùàN..WV.|0).ÁúFó*.úF 000040
 8BDC4688 00000E46 C701900C 46C70000 C046C700 C88E46C7 0000FE46 L.`014FC ▪..úF±..úF7à.úFà..úFÉ. úFB...FÉ. 000060
 CE5689CC 46890002 83011805 C05688BE 46880256 89004689 00028301 18L`DE56 VB....0..FÅ.V0.F/.Vä....9..Fë.Vö 000080
 4680006A 8676FF88 76FF0676 FF0876FF 0000290B 9A501686 46800676 FF0L76FF .v..v..FÑ.P..)...v..v..v|.vÑj..F 0000A0
 8876FF06 76FF0876 FF028FE9 00008800 06E90374 2AC67E83 0000296F 9A5016C6 6.P.o)...−6*t.Ō..|..Ō...v..v..v| 0000C0
 46898C46 89000088 C24689C4 46890000 88000009 E89A5016 C6468D00 6A8676FF .vÑj..F6.P.Ō...|...Fá.Fó|...F¥.F 0000E0
 89E25688 E0468800 0029239A 5016E046 8D186A86 76FF8876 FF0676FF 0876FF8A ¤.v..v..v|.vÑj..FÅ.P.#)...FÅ.Vä. 000100
 77FF2682 5EC40676 FF0876FF 0071E903 7502470B 26078826 825EC484 56898246 Fý.VÇá^ý&..&.G.u.Ōq..v..v.á^ý&.w 000120
 037D0019 E9037EEE 5639C456 88C24688 00002C21 9A5016EC 46800A6A 37FF2602 .&.7j..F$.P.!,...Fó.Vá9VŸ−.Ō..). 000140
 F25639BC 5688BA46 88C45689 C24689EE 5688EC46 88000CE9 0372EC46 390008E9 Ō..9F$r.Ō...F$.VŸ.Fó.Vá.Fo.V¥9V· 000160
 46838C56 898A4689 F25688F0 4688000C E90372F0 46390008 E9037D00 19E9037E ~.Ō..).Ō..9FÞr.Ō...FÞ.V·.Fo.V¥.F 000180
 FF8876FF 0676FF08 76FF0000 20649AE0 76FFE276 FF0676FF 0876FFFF 80E90482 ý.Ō...v..v..vâ.vÅ.d·...v..v..v|. 0001A0
 07882682 5EC48456 89824689 E25688E0 46880000 2CC39A50 16E04680 186A8676 vÑj..FÅ.P.ù,...FÅ.Vâ.Fý.VÇá^ý&.. 0001C0
 5016EC46 800A6A37 FF260277 FF26825E C40676FF 0876FF01 66E90375 02470826 &.G.u.Ōf..v..v.á^ý&.w.&.7j..F$.P 0001E0

Dump of file SATURN:[PCCOMMON.DUMP.DLL]DA-IMPRT.DLL;1 on 18-APR-1990 10:39:02.20
File ID (459,7,0)   End of file block 93 / Allocated 96

Virtual block number 40 (00000028), 512 (0200) bytes

 89EC4689 C45613C2 46032C51 04829AEC 76FFEE76 FFD076FF D276FF00 002CFA9A .*,...v0.vÅ.vŸ.v$...Q,.Fó.Vá.F$. 000000
 88F25689 F04689BC 56138A46 0329ED04 829AF076 FFF276FF CC76FFCE 76FFEE56 VŸ.vö.vä.v·.vÞ...Ù).Fo.V¥.FÞ.V·. 000020
 F84689C0 56138E46 03F25688 F04688F6 5689F446 89DE5613 DC4603EE 5688EC46 F$.VŸ.FÉ.VB.F¶.V−.FÞ.V·.F/.Vá.F½ 000040
 88000020 349A5016 EC468D0A 6A37FF26 0277FF26 825EC406 76FF0876 FFFA5689 .V*.v..v.á^ý&.w.&.7j..F$.P.4-... 000060
 C8468D12 6A37FF26 0277FF26 825EC406 76FF0876 FFDA5689 D84689FE 5688FC46 F▪.V±.FÄ.VÖ.v..v.á^ý&.w.&.7j..Fà 000080
 E9037502 470B2607 8826045E C4D65689 D44689CA 5688C846 88000028 359A5016 .P.5+...Fà.Vó.Fà.V▪á^á&..&.G.u.Ō 0000A0
 46880000 2AE49A50 16E4468D 096A37FF 260277FF 26045EC4 0676FF08 76FF0075 u..v..v.á^á&.w.&.7j..FÓ.P.ō*...F 0000C0
 FF0876FF EA5689E8 4689FA56 88F84688 E65689E4 46890A56 13084603 EE5688EC &.VŸ.FÅ.VÖ.FÓ.V|.FÑ.V*.FÓ.VÖ.v.. 0000E0
 C888FE56 88FC4688 0000280B 9A5016E4 4680096A 37FF2602 77FF2604 5EC40676 v.á^á&.w.&.7j..FÓ.P..+...F▪.V±.à 000100
 CA76FF06 76FF0876 FFFF7CE9 04D44683 DA561108 46010313 C10302D1 E001DA88 .ÖlÅ10.è.Æ.FÅ.VÖ.Fà.Ō|..v..v..vò 000120
 000029B8 9AE076FF E276FF06 76FF0876 FFFE88E9 04824683 00002D7C 9AC876FF .vè.|·...Fý.Ō.±.v..v..vâ.vÅ.|).. 000140
 47892600 0088105E C4D88E2A 75881E56 57000032 C8C8C95F 5E1F0000 E9000088 |..Ō...^_èùà2..WV.|u*.Áá^.|..&.G 000160
 880006E9 03750000 30F44689 00002ACC 9A5016F0 46800676 FF0876FF 07892602 .&...v..v̄..FÞ.P.ä*...F¶=..u.Ō... 000180
 F4468900 0028EA9A 5016FA46 8D1A6AF0 76FFF276 FF0676FF 0876FF00 E2E9F446 F¶Ōä..v..v..v·.vÞj..F*.P.ō+...F¶ 0001A0
 F6468300 04E9F856 89F64689 FC5688FA 46880089 E9F44688 0006E903 75000030 *..u.Ō...F¶Ō¿..F*.V▪.F−.V½Ō...F− 0001C0
 37FF2602 77FF26F6 5EC40676 FF0876FF 0091E903 75024708 26078826 F65EC404 .á^−&..&.G.u.Ō...v..v.á^−&.w.&.7 0001E0

Dump of file SATURN:[PCCOMMON.DUMP.DLL]DA-IMPRT.DLL;1 on 18-APR-1990 10:39:02.20
File ID (459,7,0)   End of file block 93 / Allocated 96

Virtual block number 41 (00000029), 512 (0200) bytes

 0676FF08 76FF0060 E9F44688 0006E903 7500003D 00002E52 9A5016CE 4680026A j..Fö.P.R...=..u.Ō...F¶Ōm..v..v. 000000
 46880006 E9037500 00300000 2B6C9A50 16FE468D 156A37FF 260277FF 26F65EC4 á^−&.w.&.7j..F±.P.l+..=..u.Ō...F 000020
 390E4688 0022E903 7500003D 0000FFFF 9A0A76FF 0C76FF50 16CE4680 0043E9F4 ¶ŌC..Fö.P.v..v......=..u.Ō"..F.9 000040
 5CE90003 E9025789 26078926 105EC402 57882607 8826F65E C40017E9 0374FE46 F±t.Ō..á^−&..&.W.á^.&..&.W.Ō..Ō\ 000060
 056A0676 FF0876FF D88E2D93 881E5657 000002C8 C8C95F5E 1F0000E9 000088FF .|..Ō...^_èùà...WV.|.-.Ä.v..v.j. 000080
 E9FE4688 0006E903 75000030 FE468900 00FFFF9A 1076FF12 76FF0A76 FF0C76FF .v..v..v..v.......F±=..u.Ō...F±Ō 0000A0
 46890000 2C9B9A50 160E4680 156A37FF 260277FF 26105EC4 0676FF08 76FF0033 3..v..v.á^.&.w.&.7j..F..P...,...F 0000C0
 56570000 02C8C8C9 5F5E1F00 00E90000 880006E9 FE468800 06E90375 00003DFE ±=..u.Ō...F±Ō..|..Ō...^_èùà...WV 0000E0
 2F812088 9A0676FF 0876FF0A 76FF0C76 FF0E76FF 1076FF12 76FFD88E 2E84881E .|Ç..Ä.v..v..v..v..v..v..v...-./ 000100
 03750247 08260788 26105EC4 0049E9FE 46880006 E9037500 0030FE46 890EC483 .á..F±=..u.Ō...F±Ōl.á^.&..&.G.u. 000120
 AC9A0676 FF0876FF 0A76FF0C 76FF0E76 FF1076FF 1276FF00 34E90000 880006E9 Ō..|..Ō4..v..v..v..v..v..v..v..^ 000140
 5F5E1F00 00E90000 880006E9 FE468800 06E90375 00003DFE 46890EC4 8320322E .2 .á..F±=..u.Ō...F±Ō..|..Ō...^_ 000160
 08C4832F D8028C9A 0676FF08 76FF01C3 681ED88E 2F22881E 56570000 00C8C8C9 èùà...WV.|"/.Ä.hù..v..v....Ù/.á. 000180
 08C4832F F8028C § 0676FF08 76FF01D5 681E00E6 E9000088 0006E903 7400003D *..t.Ō..|..Ōl..hí..v..v....«/.á. 0001A0
 08C48330 18028C,., 0676FF08 76FF01DF 681E00C6 E9000188 0006E903 7400003D =..t.Ō..|..Ō6..hÒ..v..v....0.á. 0001C0
 08C48330 38028C9A 0676FF08 76FF01E6 681E00A6 E90002B8 0006E903 7400003D =..t.Ō..|..Ōl..hl..v..v....;0.á. 0001E0
```

```
Dump of file SATURN:[PCCOMMON.DUMP.DLL]DA-IMPRT.DLL;1 on 18-APR-1990 10:39:02.20
File ID (459,7,0)   End of file block 93 / Allocated 96

Virtual block number 42 (0000002A), 512 (0200) bytes

 08C48330 5B028C9A 0676FF08 76FF01F0 681E0086 E90003B8 0006E903 7400003D =..t.Õ..¡..Õ...hÞ..v..v....{0.á. 000000
 08C48330 7B028C9A 0676FF08 76FF0200 681E0066 E90004B8 0006E903 7400003D =..t.Õ..¡..Õf..h...v..v....(0.á. 000020
 08C48330 9B028C9A 0676FF08 76FF0207 681E0046 E90005B8 0006E903 7400003D =..t.Õ..¡..ÕF..h...v..v.....0.á. 000040
 08C4832C 34C28C9A 0676FF08 76FF0213 681E0026 E90006B8 0006E903 7400003D =..t.Õ..¡..Õ&..h...v..v....4,.á. 000060
 2F3E0002 001E90CB C95F5E1F 0000E900 0AB80006 E90007B8 0006E903 7400003D =..t.Õ..¡..Õ..¡..Õ...^_èü.....>/ 000080
 2FBB0002 00E80005 00500203 006C0004 2E280203 01CC0008 18F30203 00000002 ......µ...ä...(...l...Þ...Ò...£/ 0000A0
 14880203 007A0004 12550203 00000006 2FAA0002 01580007 2E700203 00000004 ......p...X...ˆ/......U...z..... 0000C0
 1F5A0203 00020005 002A0103 00860004 2EFA0203 01000008 18760203 00F50005 ..%...v...l...•.......*.......Z. 0000E0
 18AF0203 00930004 20090203 01600008 007C0203 00140003 14280203 01030005 ......(.......|...m...)-......£. 000100
 28FB0203 01870008 06490203 009F0004 2A320203 01140005 1F6A0203 017A0008 ..z...j.......2*......l.......«( 000120
 14E10203 00BB0004 2ECD0203 01950008 052F0203 00AF0004 28020203 02070009 ......®•..£.../.......ë...£...Ã. 000140
 2A640203 01B20008 0CFB0203 00CD0004 2A0B0203 004A0004 20B00203 01A50008 ..£...¯·..J....*..ë...%...ÿ...d* 000160
 01CB0001 B81F0204 3E89D88E FFFFB81E 00000000 01BF0008 0E130203 00070004 ..■.......«.......|...Ã.>...|..ù. 000180
 00000000 00000000 00000000 00000000 00000000 00000000 00000500 02000200 ................................ 0001A0
 0600ADE9 0374400A 47F62600 B7E90375 830A47F6 26065EC4 FFFFBE56 000012C8 à...V/..á^.&-G..u.Õñ.&-G.ât.ÕÜ.. 0001C0
 46891508 87880608 68F9F700 0CB99909 E02D0646 88F08804 C483005A 00F29A53 S.·.Z..á..Þ.F.-Å..¿..¥ªkÄ...Ä..F 0001E0

Dump of file SATURN:[PCCOMMON.DUMP.DLL]DA-IMPRT.DLL;1 on 18-APR-1990 10:39:02.20
File ID (459,7,0)   End of file block 93 / Allocated 96

Virtual block number 43 (0000002B), 512 (0200) bytes

 C4830087 19529A50 E42A0B47 8A26065E C404C483 006C0C10 9A0676FF 0876FFFA ª.v..v....l..á.á^.&.G.*ðP.R....á 000000
 89F2468D 08C48300 AB02569A 5016F046 8D021868 1E617400 FA7E8364 7CC00802 ..å|d.-ª.ta.h...FÞ.P.V.¨..á..F·. 000020
 08C48300 C302109A 5016F046 8D021A68 1E13745C FE7F8026 FC5EC4FE 568CFC46 F•.Vªá^•&..±\t..h...FÞ.P...û..á. 000040
 18329A50 16F0468D 08C48300 D01B169A FA76FFFC 76FFFE76 FF0A6AFC 4EFF03E8 Š..N•j..v±.v•.vª...Å..á..FÞ.P.2. 000060
 FC9A0000 04C890CB C95EC688 000A47C6 26065EC4 FFFFBE03 74C00804 C483FFFF ...á..ât.ƒ..á^.&6G...ó^èü.à....■ 000080
 0CE09A06 76FF0876 FF0A76FF 0C76FF50 FE76FF18 74000BFE 5689FC46 89011018 ....F•.V±.Åt..v±P.v..v..v..v..Å. 0000A0
 88F9F700 0CB99909 E02D0646 88560000 02C890CB C999C02B 9004E80C C4830034 4..á.Š..+à.èü.à...V.F.·Å..¿..¥ª. 0000C0
 FF880674 400A47F6 26077483 0A47F626 065EC4FE 46891504 05E001C1 03E001C8 àlÅ.èlÅ.à..F±á^.&-G..t.&-G.ât.¡. 0000E0
 2780FE5E 88010A4F 802690E9 EB200A4F 80260874 020A47F6 26065EC4 00B9E9FF .Õ¿.á^.&-G..t.&.O. ŠÕ.&.O...^±.ª 000100
 0C750115 0487F606 D868F9F7 000CB999 09E02DC3 8821750C 0A47F626 065E88FB «.^.&-G..ul.û·Å..¿..¥ªkÄ.-.å..u. 000120
 5E880257 89260789 26085788 26064788 26065EC4 12E804C4 830ABFE8 0676FF06 ..v.Òe..á.Š.á^.&.G.&.W.&..&.W..^ 000140
 5EC408C4 8300F119 7C9A50E4 2A0B478A 260677FF 260877FF 26065EC4 0277FFFE ±.w.á^.&.w.&.w.&.G.*ðP.|.Þ..á.á^ 000160
 0A470826 10809003 EB208005 7400047F 83261C75 FFFF3005 74C00804 47892606 .&.G..àt.=..u.&....t.¯ Š..¯.&.G. 000180
 CBC95EE4 2A048A26 02478E26 07FF2637 8826044F FF2690FF 55E90000 0447C726 &úG...ÕU..&.O.&.7&..&.G.&..*ð^èù 0001A0
 2B01F7AE F2FFFFB9 0A7EC4FF 758DAEF2 FFFFB9C0 33067EC4 1EDE88D7 88EC8855 U.$.■.8.á-.3á¿...Û.u.á-.¿...ÜK1+ 0001C0
 88F388A4 F3C913A5 F3E9D149 A4027400 01C6F706 4688FE87 08468ED8 8EC08CF9 ª.å.Ã.F...±.F.¥ó..t.ÉlîÕµÉ.èµÉ.µ. 0001E0

Dump of file SATURN:[PCCOMMON.DUMP.DLL]DA-IMPRT.DLL;1 on 18-APR-1990 10:39:02.20
File ID (459,7,0)   End of file block 93 / Allocated 96

Virtual block number 44 (0000002C), 512 (0200) bytes

 D1F7AEF2 FFFFB9C0 33C08E08 8CFE880A 76C51EDE 880788EC 8855CB5D C28C1FFA ª..ó]ïW.$.■.8.év..±.Ä.á3á¿...ÜK1 000000
 88EC8855 CB5DC28C 1FFA88F3 88A4F3C9 13A5F3E9 D149A402 7401A8C7 88067EC4 á-..ú´.t.ÉlîÕµÉ.èµÉ.µ.ª..ó]ïW.&. 000020
 881FFFFF 1DC01805 74A6F3F9 28D1F7AE F2FFFFB9 C0330A7E C40676C5 1EDE88D7 ■.8.év.á-.3á¿...ÜK1+ªµlt..à..... 000040
 885500CB 5DFA8891 49D1F7AE F2FFFFB9 C033067E C4D788EC 885500CB 5DFA88F3 µ.ª]ù.U.&.■á-.3á¿...ÜK1l..ª]ù.U. 000060
 8CC388AA F3C032F8 E2AA0374 C00AAC0C E30E4E88 DF880A76 C5067EC4 1E5657EC &WV.á-.év..Õ.N.D.¯.ât.¨ã½2áµ¨.û. 000080
 058A2647 9002E806 7EC45657 000000C8 0017C1E9 0017C5E9 CB5DE58B 5F5E1FC2 ð.^_.Í]üÕé..Õé..à...WVá-.Š..G&.. 0000A0
 FF5004C4 83033602 B69A5706 006A006A 08468C06 7E89F275 08028187 F6D88898 ..Ä¯....u·.-..F.j.j..W.Ñ.6..á.P. 0000C0
 2892881F A5A5A5A5 DA8E1E07 1EF08828 928F0008 050AC483 01C92928 9A570876 v.W.()è..á....«.(.Þ....ÕEEEE.¡.( 0000E0
 5EC4FE56 8CFC4689 0E4680FA 568CF846 89EC468D 56570000 16C8CBC9 5F5EDA8C .Õ^_èüà...WV.F&.F%.Vª.F..F•.V±á^ 000100
 FF0447C7 26025789 26078926 08578926 06478926 08568806 4688420A 47C626F8 ¥&óĜ.B.F..V.&.G.&.W.&..&.W.&úG.. 000120
 1278044F FF26F85E C4F0880C C48303CB 0E789A53 060A76FF 0C76FFFC 76FF167F ...v•.v..v..S.x.ù..á..Þá^¥&.O.x. 000140
 06C48303 290A9A9A 006A53FA 76FF900F EB058826 02478E26 07FF263F 8B26C02A *á&.?&..&.G.&..Š...vªSj....)..á. 000160
 76C5071E ABF3E07E 8DC03300 10B90716 D788DE88 20EC83EC 8855CBC9 5F5EC68B .ó^_èüW.$.§ .8.■..¿..3á.-Åµ¨..év 000180
 08D88C06 76C5E7EB E04308EF D30381E0 D207E180 0180C888 F8881474 C00AAC0A .¯.ãt..½.à¯..Ã.@ÁY.£ÿ.CÅŠÕév..Ã. 0001A0
 88F888B48 E8D88E02 1E1E8C26 021C3689 264E0F75 00FF25AC 021C36C5 260575C6 óu.&éó..¯X..u.N&.6..&.....ÃŠH.½. 0001C0
 FF25AC02 1E1E8C26 021CA326 FF448DD7 75E04322 EFD303B1 E00207E1 8001B0C8 à¯..Ã.@ÁY.£y"CÅum.D.&É..&....¯%. 0001E0
```

Dump of file SATURN:[PCCOMMON.DUMP.DLL]DA-IMPRT.DLL;1 on 18-APR-1990 10:39:02.20
File ID (459,7,0)   End of file block 93 / Allocated 96

Virtual block number 45 (0000002D), 512 (0200) bytes

```
96FF6488 E174E047 22EFD303 81E00207 E1800180 C888F888 18EBFF44 80057500 .u..D.$..½.à¯..Å.ØAŸ.&ÿ"CÁtÅ.d.. 000000
0A5E88D8 080C5188 084688EC 885500C8 5DE5881F 060A8CFA 88F38802 1C068726 &.....µ.ª.Ö...]]ù.U.‡.F..^..Å.^. 000020
D103E3F7 064688C8 030C66F7 064688C8 88E3F700 08CA5DE5 88E3F706 46880875 u..F.%D.]]ò..%D.à.F.%f..à.F.%D.] 000040
5756C08E D08CCB5E 5FA5F300 0A890266 8F02208E C08ED88C 57560008 CA5DE588 .[]ò..VW.Å.à/ .«f.¿..µE_^ù.Å.àVW 000060
F3885756 16E8F388 D98EA5A5 FCD88EC1 8ED98CC0 8CF8880C C38305C4 1E88F388 .µ..á..û..«.à.).ê.Å=ÉÉ.T.µ$.VW.µ 000080
C6FC7789 05C41E89 4E740580 F881F388 A5A5FCC1 8ED98CF8 880CC383 05C41E88 ..á..û..«.).ê=ÉÉ.µ.«¯.tN..á..w=ó 0000A0
FCD88EC1 8ED98CC0 8CF8880C C38305C4 1E88F388 5756C08E D08CCB5E 5F03FE47 G±. ^ù.Å.àVW.µ..á..û..«.à.).ê.Å= 0000C0
A5A5A5A5 FCC18ED9 8CF8880C C38305C4 1E88F388 575618E8 F388D98E A5A5A5A5 ÉÉÉÉ.).µ$.VW.µ..á..û..«.).ê=ÉÉÉÉ 0000E0
5604E8D0 8C575616 04E9CB5E 5FFC7789 07FE47C6 05C41E89 0E740580 F881F388 .µ.«¯.t...ó.óG±..w=_^ùÖ..VW.Å$.V 000100
A5027403 3CA5A5FE 4588ADF8 880CC383 05C41E88 F388FCD8 8EC18ED9 8CD88C57 W.Å.).ê.Å=.µ..á..û.¯«Ù.E±ÉÉ<.t.É 000120
14E80257 88260788 26C08ED0 8CC85E5F D98EFC5F 8905C41E 89CF7405 80F881A5 É.«¯.tü..á.._=.)_^ù.Å.à&..&.W.$. 000140
07798024 C78AD088 DA885756 99078803 E8025788 07880AE8 99078826 C08ED08C .Å.à&...$....W.$_...VW.Ö.Å.ú$.y. 000160
80C18ED9 8CFC7D89 05C43E89 1C740580 FF810CC7 8305C43E 88000883 DAF7D8F7 %ÙÜÖ.Ù..>á..ú...¯.t..>á..)=.).ê. 000180
880833C8 88876080 5507FE45 C6FF63E9 CB5E5F18 25E89E84 03FE45C6 0F7500FF ..u.6E±.Ç.Ö%._^ùÖc.6E±.U§'..ù3U. 0001A0
740580FF 810CC783 FE458AFC 758805C4 3E88C08E D88C5756 CB5E5F5D 1E84E8F8 «Ö..]_^ùVW.Å.ã.>á..u=.E±.ú...¯.t 0001C0
0CC78305 C43E8857 56C85E5F A5A50274 033CA5A5 FCFE4588 FC7D8905 C43E8981 Ÿ.>á..)=.E±=ÉÉ<.t.ÉÉ_^ùVW.>á..ú. 0001E0
```

Dump of file SATURN:[PCCOMMON.DUMP.DLL]DA-IMPRT.DLL;1 on 18-APR-1990 10:39:02.20
File ID (459,7,0)   End of file block 93 / Allocated 96

Virtual block number 46 (0000002E), 512 (0200) bytes

```
E8D08CC8 5E5FA8A8 FCC033C0 8ED88C03 FE45C6FC 7D8905C4 3E898C74 0580FF81 ..¯.t..>á..)=6E±..Å.à3à=¨¨_^ù.Å$ 000000
885756C0 8ED88C02 E8D08C11 E80C05C4 068305C4 1E88FCF8 885756C0 8ED88C02 ..Å.àVW.«=..á...á..$..Å$..Å.àVW. 000020
778B038A 268955C8 5E5F0C05 C42E83A5 A5FC7788 007503FE 7F8005C4 1E88FCF8 «=..á...±.u..w=ÉÉ..á.._^ùU.&...w 000040
05C40683 05C41E88 FCF88857 56C08ED8 8C02E800 8CE4E850 DE885F15 47E857FC =WÖG._.8)$ô.Å$..Å.àVW.«=..á...á. 000060
A5A5A5FC 778B0F75 07FE7F80 05C41E88 FCF88857 56C08ED8 8C02E800 8C11E80C .$..Å$..Å.àVW.«=..á...±.u..w=ÉÉÉ 000080
F8885756 C08ED88C 02E8008C E9E8DF87 F788296C E8DF87C8 5E5F0C05 C42E83A5 É..á.._^ù.ÖÖl).%.ÖSÖ.Å$..Å.àVW.« 0000A0
FE478AF3 8805C41E 88F88857 56C08ED8 8C02E800 8C10E80C 05C40683 05C41E88 ..á...Å..$..Å$..Å.àVW.«..á..µ.G± 0000C0
101B8A1D 168850E8 1CF2BA1C E888C85E 5FA5A502 74033CA5 A5ABFC0C 05C42E83 ..á..=¨ÉÉ<.t.ÉÉ_^ù|Ö.¤¨.$P|..¤.. 0000E0
900AE815 DDE89010 E8150EE8 36E8076A 8A076488 02502688 9F03A007 C39A48E8 $H.û.....&P.|d.¤j.$6Ö8.$..Ö1.$.. 000100
9F075507 C39AC30A F7000283 D8F70773 589E0250 268A5015 F0E89004 ¿Þ162BE8 Ö+.$..ÖÞ.P.&P..Xs.%Å.Ø.%Öû.û.U.. 000120
7C8005C4 36890CEE 8305C436 88515303 8A268955 57560776 8A077088 02¨¨2688 .&P.|p.¤v.VWU.&..SQ.6á..Y..6á..| 000140
7F01F6FF 32FE508A 05C43E88 57C85E5F 5D5B5902 FF02E800 FF047508 748Þ030A ...t.u..Å$..ØY[] ^ùW.>á..]±2.-.. 000160
C8F9C8E4 0803755F 8001F6F8 7480FF41 F6C85F08 75F0FF41 F6087403 F8801375 u..«.t.-A.Þu._û-Å..t½-.._u..ðû°û 000180
320875F7 38FC7588 FE5D8A05 C43E8857 56C85F7F 2180FF32 FE5D8A05 C43E8857 W.>á..]±2..!.¯ùVW.>á..]±.u=;%u.2 0001A0
ADA5A5C8 5E5FA880 F480AD08 7503F880 A5FCC18E D98CFC7D 89C85E5F 803180FF ..1._^ù.)=.).ê=É.«.u.Ù.¶._¯^ùÉÉÙ 0001C0
5676E800 0888F388 575604E8 27F8E857 5602E8C0 8ED08C57 56C85E5F A880F480 .¶._¯^ùVW.Å.à$.VWÖ½'$.VW.µ|..$vV 0001E0
```

Dump of file SATURN:[PCCOMMON.DUMP.DLL]DA-IMPRT.DLL;1 on 18-APR-1990 10:39:02.20
File ID (459,7,0)   End of file block 93 / Allocated 96

Virtual block number 47 (0000002F), 512 (0200) bytes

```
5602E8C0 8ED08C57 565EE800 0488F388 575604E8 27E0E857 5602E8C0 8ED08C57 W.Å.à$.VWÖÅ'$.VW.µ|..$^VW.Å.à$.V 000000
575604E8 2780E857 5602E8C0 8ED08C57 5646E800 0C88F388 575604E8 27C8E857 WÖà'$.VW.µ|..$FVW.Å.à$.VWÖ¯'$.VW 000020
5616E800 1088F388 575604E8 2798E857 5602E8C0 8ED08C57 562EE800 1488F388 .µ|..$.VW.Å.à$.VWÖ.'$.VW.µ|..$.V 000040
80C18ED9 8C05C43E 88D88800 0088F388 575604E8 2780E857 5602E8C0 8ED08C57 W.Å.à$.VWÖ.'$.VW.µ|...Å.>á..).ê. 000060
F7882788 E804468F 02C383C8 5E5F5002 3497FF03 8A268955 FC7D8710 7407FE7D )±.t..)=U.&....4.]_^ù.ù.«F.Ö.'.% 000080
575676E8 000A88F3 88575604 E8274FE8 575602E8 C08ED08C 57560FE8 05C43E88 .>á.$ÖVW.Å.à$.VWÖÖ¯$.VW.µ|..$vVW 0000A0
575602E8 C08ED08C 57565EE8 000688F3 88575604 E82737E8 575602E8 C08ED08C .Å.à$.VWÖ7'$.VW.µ|..$^VW.Å.à$.VW 0000C0
88575604 E82707E8 575602E8 C08ED08C 575646E8 000E88F3 88575604 E8271FE8 Ö.'$.VW.µ|..$FVW.Å.à$.VWÖ.'$.VW. 0000E0
575616E8 001288F3 88575604 E826EFE8 575602E8 C08ED08C 57562EE8 001688F3 µ|..$.VW.Å.à$.VWÖÿ&$.V. .µ|..$.VW 000100
7D80C18E D98C05C4 3E88D888 000288F3 88575604 E82607E8 575602E8 C08ED08C .Å.à$.VWÖ=&$.VW.µ|...Å.>á..).ê.) 000120
12E80010 8817E800 0C881CE8 00088821 E800048B FF39E95E 2602E856 057407FE ±.t.VÖØ&^Ö9.£..$!£..$.£..$.£..$. 000140
7D803974 07FE7D80 05C43E88 57560018 8803E800 1C8808E8 00008800 E800148B £..$.£..$.£..$.£..VW.>á..)±.t9.) 000160
18F8832F 731CF883 087D88FC 7D89FC75 88C08ED8 8C05C43E 890CEF83 287407F2 ·.t+.ÿ..>á..Å.à.u=.)=.)..«.s/.«. 000180
C47407F2 7D8002C3 83CDE826 65E802C3 83CB5E5F 5D023497 FF038A26 89553E73 s>U.&....4.]_^ù.û.Öe&$ë.û..)·.tó 0001A0
CB5E5F5D 023097FF 038A2689 550C05C4 2E83F787 8FE82650 E805C43E 890CEF83 .ÿ..>á.ÖP&$«¯%..á..U.&....0.]_^ù 0001C0
D0E3D0C8 9E5E5FE0 0AE4D0E8 D1410025 9F5D0234 97FF038A 2689550C 05C42E83 ..á..U.&....4.].%.AïÖÅÖ.Å_^.ùÅDÅ 0001E0
```

Dump of file SATURN:[PCCOMMON.DUMP.DLL]DA-IMPRT.DLL;1 on 18-APR-1990 10:39:02.20
File ID (459,7,0) End of file block 93 / Allocated 96

Virtual block number 48 (00000030), 512 (0200) bytes

```
89FB2BFE 8B4E4E05 C4368BFC C08ED88C 5756000C 8B03EBFF 32DF02E7 D0FB8AE3 D.=AÓ.02.Š.£..VW.Å.â=.6â.NN.±+«¿ 000000
037407FE 7D8 )5C4 3E8B5756 EC8B55C8 5E5FF4E2 47471D8B FE448905 87AD0005 ..Ü...D±..GGã¶ ^ùU.£VW.>á..)±.t. 000020
E02DC38B FA4‿9E4 2A0B478A 26085EC4 56570000 08C800CB 5DE58B5E 5F25D7E8 ÕmX_^.Í]ù.à...ÜVá^.&.G.*ð.F*.û-Á 000040
0A47F626 0774830A 47F626F8 468915D4 05E0D1C1 03E0D1C8 8BF9F700 0CB99909 ..¿..%*.âÍÁ.èÍÁ.Å..F¥&-G..t.&-G. 000060
0A4F8026 0E/4010A 47F62608 5EC49001 2BE9FFFF 8B200A4F 8026085E C40F7440 ât.á^.&.O. ¡..Õ+..á^.&-G..t.&.O. 000080
26FC7689 F08B0447 8926C02B EF0A6780 26020A4F 802690E2 E8000004 47C72620 &úG...Sâ.&.O..&.g.ÿ+â&.G..Þ.v=& 0000A0
09EC087E 81377501 15D487F6 06086BF9 F7000CB9 9909E02D C3884C75 0C0A47F6 -G..uL.û-Á..¿..%*kÄ.-.Å..u7.-.&. 0000C0
830BB637 9A9AFA76 FFDF75FF FF0A7E81 167509F8 087E810E 7408430A 7E810775 u..-.C.t..-.%.u..-...u..v*..7Ñ.. 0000E0
E02DC38B 1575080A 47F62608 5EC404C4 8300F7E8 0876FF0A 76FF0C75 C00802C4 á..âu..v..v.Õ%..á.á^.&-G..u..û-Á 000100
26064788 26067728 26378826 085E8867 74011504 87F60608 6BF9F700 0CB99909 ..¿..%*kÄ.-.Å..tg.^.&.7&+w.&.G.& 000120
0677FF26 5256167E F6080447 89264802 4588F87E 88025789 26078926 4008578B .W.a&..&.W..-%.E.H&.G..-~.VR&.w. 000140
006A006A 026A0F74 201C3887 F6FA5E88 19E8FC46 8908C483 0804346E 9AFA76FF .v*.n4â..á..F=$..^*-.;. t.j.j.j. 000160
1606468D 560001BE 17EB0788 2606468A 065FC426 085EC408 C48308F7 32729A53 S.r2%..á.á^.áá_..F.&..Š./..V.F.. 000180
CBC95F5E E42A0646 8AFECCE9 0374FC76 39FC4689 08C48307 8D346E9A FA76FF50 P.v*.n4...á..F=9v=t.Õä±.F.*ð^_èù 0001A0
35FC9A06 77FF2608 77FF262E 74080A47 F6263574 830A47F6 26065EC4 000000C8 à...á^.&-G..t5&-G..t.&.w.&.w.¯=5 0001C0
26085789 26064789 26025789 26078926 99C02BF7 0A678026 065EC404 C48308 4D M..á.á^.&.g.%+ä.&..&.W.&.G.&.W.& 0001E0
```

Dump of file SA"URN:[PCCOMMON.DUMP.DLL]DA-IMPRT.DLL;1 on 18-APR-1990 10:39:02.20
File ID (459,7,0) End of file block 93 / Allocated 96

Virtual block number 49 (00000031), 512 (0200) bytes

```
C103E001 C888F9F7 000CB999 09E02D04 46881806 06FF0000 04C890CB C90447B9 .G.èù.à.....ø..F.-Á..¿..%*.âÍÁ.é 000000
57892606 47892604 5EC402C4 830C3036 119A0200 68FE5E8C FC468915 D405E0D1 ÌÁ.Å..F=.^±h....60..á.á^.&.G.&.W 000020
4688040A 4F802604 5EC49021 E8020002 47C726FC 5EC4080A 4F802611 74000808 ..Åt.&.O..á^=&úG...$Í.á^.&.O...F 000040
57882606 47882604 5EC40001 0247C726 FC5EC408 57892606 47892640 FE5688FC =.V±a&.G.&.W.á^=&úG...á^.&.G.&.W 000060
7400613D 98078A26 0A5EC456 00000AC8 C3C90000 0447C726 02578926 07892608 .&..&.W.&úG...èùà...Vá^.&...=a.t 000080
01BE9022 E80001B9 01FC46C6 F6289000 EEE999C0 28137400 77300C74 00723027 '=r.t.=w.t.+á.ÕY..+-óF=.¿..$".ƒ. 0000A0
FF80FC46 C6FEE683 0002CE81 43750002 C6F790F4 E80109BE 90F1E802 FC46C603 .óF=.Şþ.ƒ..$¶.%ó..uC.ö...Ì±óF=.. 0000C0
00743013 74006230 06740028 3098078A 263374C9 08377400 3F80260A 5EC40A46 F.á^.&.?.t7.èt3&...=+.t=b.t.=t. 0000E0
8000CE81 90C4EBC9 280574C0 00A9C688 900DEB40 00CE810E 75C000A9 C6881575 u..ó`.âu..ö.âŠÅ..ó`.ât.+èŠá..ö.. 000100
6AE9037D C008FA46 8908C483 0C8132B0 9A0676FF 0876FF56 01A468FE 4E8980EB Š§.N±hÊ.V.v..v..¯2...á..F*.â).Õj 000120
C103E0D1 C888F9F7 000CB999 09E02DC3 881B0606 FF0A4788 26FC468A 0E5EC4FF .á^..F=&.G...ø..û-Á..¿..%*.âÍÁ.é 000140
88000004 47C7F85E 88044789 260E5E88 980788F8 5E88C02A F8468915 D405E0D1 ÌÁ.Å..F%*â.^%....^.&.G..^%úG.... 000160
5EC28CC3 88084788 26FA468A 08578926 06478926 02578926 07892699 C02B0E5E ^.+á.&..&.W.&.G.&.W..F*&.G..û.ó^ 000180
2DC38815 75080A47 F6265575 023C0324 0A478A26 065EC4F6 28560000 04C8CBC9 èùà...V+-á^.&.G.$.<.uU&-G..u..û- 0001A0
08FC4689 06472826 07882606 5E883974 01150487 F606086B F9F7000C B99909E0 Å..¿..%*kÄ.-.Å..t9.^.&..&+G..F=. 0001C0
0874FC46 3808C483 0082346E 9A50E42A 08478A26 0677FF26 0877FF26 50287EC0 á-(P&.w.&.w.&.G.*ðP.n4...á.;F=t. 0001E0
```

Dump of file SATURN:[PCCOMMON.DUMP.DLL]DA-IMPRT.DLL;1 on 18-APR-1990 10:39:02.20
File ID (459,7,0) End of file block 93 / Allocated 96

Virtual block number 50 (00000032), 512 (0200) bytes

```
47C72602 57892607 89260857 88260647 8826065E C4FFFFBE 200A4F80 26065EC4 á^.&.O. ƒ..á^.&.G.&.W.&..&.W.&úG 000000
0E468828 C81E8C28 C6A328CC 880E463C 869A000A 88EC8855 CBC95EC6 88000004 ....ó^èùU.&¡...Ñ<F.¡ä(Èó(..À(.F. 000020
C006C700 0028C206 C7289E16 89289CA3 08568806 46882888 16892886 A3105688 .V.ÈÑ(..¡(.F..V.È.(...(ú.ò(..ú.à 000040
288EA328 A2A328A6 A3C02800 0128C406 C7030BE9 037425F6 7E80038D ˁ9000028 (..Õ...~-Xt.Õ..ú.á(..+âÈ](ÈÀ(È/( 000060
30017F80 260A5EC4 00202A2C 06C72884 A3289AA3 28A0A328 8AA3288C A.·8A4A3 ÈÈ(È¥(Èo(È.(È.(ÈÇ(ú.,* .á^.&...0 000080
00288A06 C728A606 FF007528 3F80260A 5E88903E E800302A 2C06C70A 46‹‹4975 uÍ.F.ú.,*0.Š>..^.&.?+u...Í(ú.¤(. 0000A0
5EC400E8 289A06FF 9014EB28 BA06FF1A 750028A6 3E830E75 203F8026 9026E800 .Š(.&.? u..>Í(.u...¤(Š.....(Š.á^ 0000C0
75C00802 C4830978 E80E5098 078A260A 5E880A46 FF288406 FFC7752D 3F80260A .&.?-uú..Ç(.F..^.&...P.Õx..á..âu 0000E0
FF0C7D00 28CA3E83 0C56890A 468908C4 8308C7E8 0E28CA68 1E0A76FF 0C76FFD0 Í.v..v..hò(.Õú..á..F..V..>ò(.).. 000100
C400202A 2C06C706 75302A2C 3E830074 00288843E 8328CAA3 D8F728CA A1288406 .Ç(Àò(%ÀÈò(.>Ç(.t..>,*0u.ú.,* .á 000120
468908C4 83087BE8 0E28C468 1E0A76FF 060A46FF 288C06FF 20752E3F 80260A5E ^.&.?.u-..¥(.F...v..há(.Õ(..á..F 000140
74004630 98078A26 0A5EC428 8C0EFF00 0128C406 C70A7D00 28C43E83 0C56890A ..V..>á(.).ú.á(....¥(á^.&...=F.t 000160
0A5EC409 750028A4 3E830002 28A406C7 0675006C 30287400 68304074 004E3030 ==N.t∂=h.t+=Í.u.ú.È(...>È(.u.á^. 000180
06C7D8E8 000128A4 06C79002 4EE91C75 003F8026 0A5EC40A 46FF0375 4C3F8026 &.?Lu..F.á^.&.?.u.ÕN..ú.È(..ŠÀú. 0001A0
30057400 47300A74 00453DF8 46899807 8A26C8EB 000828A4 06C7D0EB 001028A4 È(..ŠÀú.È(..Šà&....F½=E.t.=G.t.= 0001C0
3FE90375 00633001 91E9037E 78740069 3DF8468B 20F84683 28A206FF 08750058 X.u...Â(.F½ .F½=i.tx~.Õ..=c.u.Õ7 0001E0
```

```
Dump of file SATURN:[PCCOMMON.DUMP.DLL]DA-IMPRT.DLL;1 on 18-APR-1990 10:39:02.20
File ID (459,7,0)   End of file block 93 / Allocated 96

Virtual block number 51 (00000033), 512 (0200) bytes

 1FC42628 861EC415 750228A4 3E839001 59E90140 E9037500 25300152 E9037E01 .-.ÕR.=%.u.Õa.ÕY...>É(.u.á.Ñ(&á. 000000
 04288606 83078926 28C0A11F C4262886 1EC400EB 00000247 C7260789 2628C0A1 Àá(&..&úG...Š.á.Ñ(&á.Àá(&....Ñ(. 000020
 E9037520 0A47F626 289C1EC4 0180E903 740028C0 3E830170 E9037500 28C23E83 .>á(.u.Õp..>á(.t.Õ§.á..(&-G. u.Õ 000040
 086A90C3 EB02C483 019EE80E 0A6A0000 289A06C7 288E06FF 01ACE9FF FF8801AF É.¡..Õ¯.../(ú..(..j..Õ...á.Šü.j. 000060
 3E830081 E9037508 28A43E83 000428C4 06C7288C 06FF28A2 06FF28A0 06FFF2EB Š....(..Ä(..¥(ú.á(...>É(.u.Õ...> 000080
 0A740028 843E83FA 468928CA A1287428 CA0639FA 468928A4 A3C0287A 740128A4 É(.tz+áÉÉ(.F*9.ò(t(Àò(.F*.>Ç(.t. 0000A0
 02288606 8328CAA3 C028027D C00828CA A10528CA 2E839090 13EB0000 28CA06C7 ú.ò(..Š.....ò(.Àò(.á).+áÉò(..Ñ(. 0000C0
 88157400 28843E83 227400FA 7E8302C4 83048DE8 0E3A6A02 C4830130 E80E106A j..òO..á.j:.Õ...á..-*.t".>Ç(.t.. 0000E0
 6A042886 2E830000 28CA06C7 9007E828 CAA3C028 027DC008 28CAA300 0520FA46 F*-..Éò(.á).+áÉò(Š..ú.ò(....Ñ(.j 000100
 90FF39E9 026EE80E 006A90FF 3FE9106A FF10E902 28860683 02C48300 F1E80E10 ..Õþ..á...Ñ(.Õ..j.Õ?..j..Õn.Õ9.. 000120
 FF0CE903 75006430 90FF21E9 0428E80E 256AFF2A E90349E8 0EF876FF F4EB016A j.Š¶.v%.Õl.Õ*.j%.Õ(.Õl..=d.u.Õ.. 000140
 0C5688OA 46880A4E FF0C5688 0A468809 740028A4 3E83DA7E 00673D05 7C00653D =e.|.=g.-Õ.>É(.t..F..V..N..F..V. 000160
 E9037500 703DFEF4 E9037500 6F3DFE80 E9037500 6E3D903A EBFE5689 FC468940 a.F=.V±Š:.=n.u.Õ.±=o.u.Õõ±=p.u.Õ 000180
 9034E80A 46FF90F EBFF79E9 03750078 3DFE89E9 03750075 308F7400 7330FEE0 Á±=s.t.=u.u.Õ¿±=x.u.Õy.ŠŸ..F.Š4. 0001A0
 0A76FF0C 76FF500A 462BC388 EC75253C 0474C00A F6468807 8A26FC5E C4FC46FF .F=á^=&..,F-.át.<%uš.ú+F.P.v..v. 0001C0
 0374C00A F6468807 8A260A5E C40C5689 0A4689FE 568BFC46 8806C483 044CE80E .ÒL..á..F=.V±.F..V.á^.&...F-.át. 0001E0

Dump of file SATURN:[PCCOMMON.DUMP.DLL]DA-IMPRT.DLL;1 on 18-APR-1990 10:39:02.20
File ID (459,7,0)   End of file block 93 / Allocated 96

Virtual block number 52 (00000034), 512 (0200) bytes

 288C3E83 56570000 12C8CBC9 28C0A1FE 51E90374 200A47F6 26289C1E C4FC63E9 Õc=á..(&-G. t.Õq±Àá(èùà...WV.>¥( 000000
 751028A4 3E830774 0228A43E 83288E06 FF04740A 067E8300 202A2C06 C7067400 .t.ú.,* ..-..t.../(.>É(.t..>É(.u 000020
 740028BE 3E83902C E8042886 0683FE56 89FC4689 02578826 07882628 861EC419 .á.Ñ(&..&.W..F=.V±..Ñ(.Š,..>f(.t 000040
 FE5689FC 46899907 88262886 1EC40EEB 0000FE46 C7FC4689 07882628 861EC411 .á.Ñ(&...F=úF±..Š.á.Ñ(&....F=.V± 000060
 A12A2AA3 C0289003 E806468B 0674FE46 0BFC468B 0E740028 9A3E8302 28860683 ..Ñ(..>.(.t..F=.F±t..F.Š..+áÉ**À 000080
 C410750A 067E8328 7D00FE7E 83317500 288E3E83 F45689F2 468928C8 168828C6 ó(..à(.F·.V¶.>f(.ul.-±.)+.-..u.á 0000A0
 01F646C7 FE5689FC 4689DAF7 00028308 F7FE568B FC46882D 07C626F2 46FFF25E ^·.F·&ó.-.F=.V±%À.@.%Õ.F=.V±úF-. 0000C0
 37909AFC 76FFFE76 FF501E06 76FFFA5E 8CF84689 28A88800 00F646C7 9006E800 .Š..úF-..¡´(.F%.^*.v..P.v±.v=..7 0000E0
 C82828C4 0E8804C4 830E8102 869AF876 FFFA76FF 45740028 8C3E830A C4831365 e..á..>¥(.tE.v*.v%.Ñ....á...á(+à 000100
 3005C626 05E8F27E C4F04E88 00002A2A 06C70675 082A2A3E 83007EC9 0BF04E89 .Nþ.è-..>**.u.ú.**...Nþá-·Š.&6.0 000120
 8A26F85E C4F276C5 EE5E8C28 A20E88F0 4E89F446 8CF27E89 F47FC00B 49C18847 G.èl.à.¶.-·.F¶.Nþ..Ä(.^Ÿév·á^%&. 000140
 5E8EF45E 8CF27689 E375003F 8026F846 FF46202C 80037C61 3C0774C9 08048807 ....èt.<a|.., F.F%&.?.uD.v·.^¶.^ 000160
 0E50C02B 02E80001 88057500 F67E8308 74288A06 0828A6A1 14750028 8E3E83EE Ÿ.>f(.u.Ä|(..¤(t..-.u.¡..Š.+áP. 000180
 28881688 2886A100 018E1874 00067E83 56570000 10C8CBC9 5F5E02C4 8302FFE8 Õ...á.^_èùà...WV.-..t./..ÀÑ(..¡( 0001A0
 02578826 07882628 861EC413 740828A4 3E83008F E9022886 0683FA56 89F84689 .F%.V*..Ñ(.Õ...>É(.t.á.Ñ(&..&.W. 0001C0
 A43E8304 28860683 FA5E8CF8 4689FC46 89078826 28861EC4 10EBFA56 89F84689 .F%.V*Š.á.Ñ(&...F=.F%.^*..Ñ(..>É 0001E0

Dump of file SATURN:[PCCOMMON.DUMP.DLL]DA-IMPRT.DLL;1 on 18-APR-1990 10:39:02.20
File ID (459,7,0)   End of file block 93 / Allocated 96

Virtual block number 53 (00000035), 512 (0200) bytes

 5E8CF846 890259B8 097500FC 7E83900A E80252B8 1575FA46 08F8468B 0E740828 (.t..F%.F*u.¡R.Š...-=.u.¡Y..F%.^ 000000
 FFF25EC4 900EE828 C40E8B1C 74288C36 39F628F4 5689F246 89FA568B F84688FA *.F%.V*.F·.V¶+-96¥(t...á(Š..á^·. 000020
 CA3E88F3 75003F80 26F246FF F25EC446 90EDE810 7ECE3846 1574003F 8026F246 F·&.?.t.F;ö-.ŠÚ.Fá^·.F·&.?.uµ.>ò 000040
 06C48301 83E80EF8 76FFFA76 FF5602C4 830159E8 0E570875 0028843E 83FE2828 (+±.>Ç(.u.W.ÕY..á.V.v*.v%.Õ*..á. 000060
 89288816 882886A1 000006C8 90C8C95F 5E02C483 013CE80E 57087400 28843E83 .>Ç(.t.W.Õ<..á.^_èù.à...ÀÑ(..¡(. 000080
 00288C3E 83FA4688 C02A9003 E8018005 7547067E 83067467 067E83FE 5689FC46 F=.V±.-.gt..-.Gu.¯.Š..*á.F*.>¥(. 0000A0
 FF28A236 FF000128 C406C706 750028C4 3E830074 00FA7E80 000628C4 06C70675 u.ú.á(...-*.t..>á(.u.ú.á(...6À(. 0000C0
 0EC48302 661EFF26 1E82068E FC76FFFE 76FF28C6 36FF28C8 36FF0676 FF28C436 6á(.v..6à(.6ó(.v±.v=..ý.&..f..á. 0000E0
 C483026A 1EFF261E 82068E28 C636FF28 C836FF14 7500289A 3E831874 00FA7E80 .-*.t..>.(.u..6à(.6ó(..ý.&..j..á 000100
 02721EFF 261E8206 8E28C636 FF28C836 FF147500 28C43E83 18740028 9A3E8304 ..>.(.t..>á(.u..6à(.6ó(..ý.&..r. 000120
 82068EFC 76FFFE76 FF187428 8A060828 A6A10000 2A2A06C7 08288606 8304C483 .á...Ñ(.ú.**..À|(..¤(t..v±.v=..ÿ 000140
 000000C8 90C8C901 29E80E50 C02802E8 00018805 74C00804 C4830276 1EFF261E .&..v..á..át.¡..Š.+áP.Õ).èù.à... 000160
 2602478E 2607FF26 37882606 468A1478 044FFF26 289C1EC4 3C750028 C23E8356 V.>ò(.u<á..(&.O.x..F.&.7&..&.G.& 000180
 9005E828 C206FF07 754006C4 8316300A 9A9A0676 FF53289E 36FF10EB E42A0488 ..*òŠ..6.(Š.v....=..á.au...ò(Š.. 0001A0
 36FF18EB 507EF60B 06768857 750028C2 3E835657 000002C8 90C8C95E 28C006FF ..á(^èù.à...WV.>ò(.uW.v..--PŠ..6 0001C0
 3E7EC008 4EC68828 C206FF04 754006C4 8316A50A 9A9A2A2C 36FF289C 3<<F289E .(.6.(.6,*...E..á.au...ò(.6N.á-. 0001E0
```

Dump of file SATURN:[PCCOMMON.DUMP.DLL]DA-IMPRT.DLL;1 on 18-APR-1990 10:39:02.20
File ID (459,7,0)   End of file block 93 / Allocated 96

Virtual block number 54 (00000036), 512 (0200) bytes

```
3E8304E8 E42A0588 2602478E 2607FF26 3F88262A 2CA00478 044FFF26 289C1EC4 á..(&.O.xá.,*&.7&..&.G.&..*ōŠá.> 000000
5E750028 C23E830A 768B5657 000002C8 C8C95F5E 28C00601 06468807 750028C2 ô(.u..F...à(^_èùà...WV.v..>ô(.u^ 000020
C206FF04 754006C4 8317170A 9A9A5098 078A2606 5EC4289C 36FF289E 36FF22E8 Š".6.(.6.(á^.Ì...P......á.àu...ô 000040
26289C1E C4078A26 065EC4CD 78044FFF 26289C1E C42574C0 084EC688 0646FF28 (.F..ôN.àt%á..(&.O.xëá^.&..á..(& 000060
5F5E28C0 06010A46 88077500 28C23E83 CAEBE42A 05882602 478E2607 FF263F88 .7&..&.G.&..*ōŠô.>ô(.u..F...á(^_ 000080
28CA3688 FA4689FC 4689C028 F65689F4 468928C8 168828C6 A1560000 0CC8CBC9 èùà...VÀô(..à(.F¶.V-+á.F=.F*.ôô( 0000A0
08E802EE 83057510 2A2A3E83 06762BF0 28F84689 04C48313 5002869A F476FF52 R.v¶.Ñ.P..á..F½+Þ+v..~**.u..Ÿ.Š. 0000C0
FF127530 2A2C3E83 19752D3F 8026F45E C4227500 28843E83 4E017508 2A2A3E83 .>**.u.N.>Ç(.u"á^¶&.?  ..>,*Ou.. 0000E0
28843E83 077EF608 0874302A 2C3E83F8 4EFF02C4 83FE71E8 0E509807 8A26F446 F¶&...P.Ôq±.á..N½.>,*O¢..--..>Ç( 000100
3E830070 E80EFC46 FF077400 2A2A3E83 0066E80E FA46FF07 7400067E 83187400 .t..-..t..F*.Ôf..>**.t..F•.Ôp..> 000120
2A3E8300 39E80E04 7500FA7E 830A7400 067E8302 C483FE7E E80E5629 75002884 Ç(.u)V.Ô-±.á..-..t..-*.u..Ô9..>* 000140
3E8306C4 83FE85E8 0EF476FF F676FFF8 76FF0040 E80E0475 00FC7E83 0A74002A *.t..-•.u..ôà..v½.v-.v¶.Ôç±.á..> 000160
00288805 740028A6 3E83C8C9 5E02C483 FE38E80E 5600202A 2C06C70E 74002884 Ç(.t.ú.,* .V.Ô8±.á.^èù.>Ì(.t.¡*. 000180
3E831775 102A2A3E 8302C483 FDC8E80E 306AC802 C483FD02 E80E5000 208803E8 Š.¡ .P.Ô@».á.ùj0.Ôà».á..>**.u..> 0001A0
01FE46C7 56570000 06C8C802 C483FDAA E80E5000 788803E8 00588805 740028A2 Ä(.t.¡X.Š.¡x.P.Ô`».á.ùà...WVúF±. 0001C0
260A5EC4 9060E80A 46FF0228 86068337 88262886 1EC41275 2A3F8026 0A5EC400 .á^.&.?*u.á.Ñ(&.7..Ñ(..F.Š'.á^.& 0001E0
```

Dump of file SATURN:[PCCOMMON.DUMP.DLL]DA-IMPRT.DLL;1 on 18-APR-1990 10:39:02.20
File ID (459,7,0)   End of file block 93 / Allocated 96

Virtual block number 55 (00000037), 512 (0200) bytes

```
387F393C 3F7C303C FA468807 8A260A5E 88F6280A 46FFFFFF FE46C708 752D3F80 .?-u.úF±...F.+-.^.&...F*<0|?<9.; 000000
CE889805 8A26187F 39308026 06E8F888 00302A2C 06C70675 303C0A75 288C3639 96¥(u.<0u.ú.,*0..«Š.&.=9..&....ò 000020
EEF7FE46 880C468C 0A7E89DF 7D303080 2647F188 30E983C8 03E1D1CE 0302E1C1 êÀ..öÌÀ.à.ÔO.þG&.=0)Ô.~..F..F±¥Ÿ 000040
FE5E8CFC 46890260 88570000 04C8C8C9 5F5E0C56 880A4688 37892606 5EC4F088 .Þá^.&.7.F..V.^_èùà...W¡'..F•.^± 000060
9009E8FE 468CFC7E 89000188 F4750038 26117400 30802647 01E8FC7E C4064E8A .N.á-=Š.G&.=.t.Ì8.u¶¡...-•.F±Š.. 000080
0A47F626 FC5EC4FE 5E8CFC46 8909E088 000004C8 90C8C95F C028FE46 8CFC7E89 .-=.F±+à_èù.à...¡À..F•.^±á^•&-G. 0000A0
47C62602 57892607 89260857 89260647 8926990A 47882604 478926C0 28257583 .uX+á&.G.&.G..&.G.&.W.&..&.W.&6G 0000C0
C999C028 B0751‾00 1638C375 18CE0638 0CFC4683 C28CC388 17E8C28C C388FF08 ...ú.ôŠ..ú.ô.F=.;.ö.uú;.À.u§+à.è 0000E0
850000FF FF9A5 '8 CCE918C0 E9C03300 098A0872 1C391E38 065E88EC 885590C8 ù.U.Š.^.;.9.r.α..3àÔà.Ôà.S...... 000100
0C4E883F 731C391E 38065E88 C03308EC 83EC8855 C85DE588 001C3887 C6F375C0 àµµô.;...Ì]ùú.Š.Š.3à.^.;.9.s?.N. 000120
740A3C1D 38878A10 74081C38 87F6087E C40C4E88 D2335745 75021C38 87F64CE3 DL-.;..uEW3@.N.á-.-.;..t...;.<.t 000140
E900098A 0674C008 5F0000FF FF9A5016 FA468051 5706530A 1D3887C6 4942AA08 .`BIô.;..S.WQ.F*.P........àt.α..Ô 000160
FE880876 C5071E57 56F81C38 A780C850 E5880475 801C3887 F6C203FA 46881854 T..F*.ô-.;..u..Ì]ù.Ì;.«W..év..± 000180
021C388F 80260875 1A3C1E74 C43AAC04 1C388F80 2606750A 3C8000B4 28E3C888 .àD(Ç..<.u.&..;..‾:át.<.u.&..;.. 0001A0
E2EBE774 0A3C8007 7401F983 C850E588 5E5F1F06 08462BC7 88EAE247 058805E8 Š...Gàô.ú+F..._^.Ì]ù.*.t..<.tÔŠà 0001C0
74C00800 0019C39A 5016FA46 80515016 F9468053 1C750808 2474401C 3887F626 &-.;.àt$.Ùu.S.F*.PQ.F*.P.ù....àt 0001E0
```

Dump of file SATURN:[PCCOMMON.DUMP.DLL]DA-IMPRT.DLL;1 on 18-APR-1990 10:39:02.20
File ID (459,7,0)   End of file block 93 / Allocated 96

Virtual block number 56 (00000038), 512 (0200) bytes

```
001A499A 5016FA46 80515016 F9468053 00F946C6 86E80A80 17DDE95E 5F1F0607 ..._^ôI.‾.ŠÑôF*.S.F*.PQ.F*.P.I.. 000000
5050FFFF 88531C75 081C3887 F6263574 010C7E83 3674FFFF FA46F7DC 75C00800 ..àûÉ¥F*..t6.-..t5&-.;..u.S¡..PP 000020
0A3C1D38 878826F9 468AFF6F E90F750A F97E8000 00FFFF9A 5016FC46 805008F7 ¥ÀP.F=.P......-*.u.Ôo..F*&..;.<. 000040
3CACD833 99C03306 76C51E56 57EC8855 0099E8C5 750AF97E 80FF58E9 00800274 t.‾.Ô(..-*.uéŠ..U.&WV.év.3à.3Ù‾< 000060
88C888D2 D1E3011B 72302C1F 77393CAC 01752B3C 04742D3C 50F77409 3CF87420 t«<.t¥P<-t.<+u.‾<9w.,0r.1D1@.ù. 000080
F7000283 D8F70775 93203C58 0CE80002 83D80307 13090302 D1E301D2 D1E301FA *1D1@1D1@.).@.Ä.@.ŠÉX<-.u.¥Ä.@.¥ 0000A0
E9087EC5 1E990175 0AF98302 33064688 0C4E8801 835756EC 8855C850 5F5E1FDA Ô.^_]ùU.&VW*..N..F.3@.*.u...é~.Ô 0000C0
C7C850E5 8816EAE9 0374C085 0000FFFF 9A5050C0 330676FF 0876FFEC 88551DA8 ¨.U.&.v..v.3àPP.......àt.Ôô..Ì]ùú 0000E0
8606C708 E8818031 30038606 C712E883 80333003 8606C71C E8848034 30038606 ...04‾.Š.ú...03‾.Š.ú...01‾.Š.ú.. 000100
9A0388A3 E42A3231 038606C7 06758C3C 04421EFF 04740004 443E838A 80303103 .10‾..>D..t...B.<.u.ú...12*ôÈ... 000120
A331A49A 50FFE405 0388A11B 9A31A49A 5000FD88 18923934 9A03828B 1601314A J1..É...49..¡».P.É1..À...ô.P.É1É 000140
01FAD129 747F80C2 F7C03302 54880C88 FC05C43E 8BC31BAF 30709A03 8836FF1B ..6...p=£.ù.>á.•...1.3à%ô..t)Ì*1 000160
044D8902 45890000 05C73800 C2818FE6 80080109 D1FAD108 D1D901FA D1D80109 ÌÌÀÌ*ÌÌÌÀÌ*ÌÌÌÀ.Ì..ô.Bú....E..M. 000180
8AADDC8A F08AAD04 8AC80AAD C888ADFC 05C43E88 EAE8D08A C888C3F7 88065589 .U..¥ú.à.ÀŠô.>á.=Ù.àU.à.ÀÙ.Þ.ÉU. 0001A0
307FF025 E922EC8A F90A8081 01CA8003 74C00A03 D1E2D103 D1E2D103 D1E201F8 ¾ÌàÌÆÌàÌÆÌàÌÆ.ët..ô.Ÿ..*.Š"Ô%Þ.= 0001C0
00038301 C6801074 01C6F615 720777D1 3AE001E0 D1E00138 72380020 307747E0 ÁGw=-.8r;ÌÀÌÀÌÀ:Ìw.r.-6.t..6..Æ. 0001E0
```

```
Dump of file SATURN:[PCCOMMON.DUMP.DLL]DA-IMPRT.DLL;1 on 18-APR-1990 10:39:02.20
File ID (459,7,0)   End of file block 93 / Allocated 96

Virtual block number 57 (00000039), 512 (0200) bytes

F78B0589 C68AE38A 024589E5 0AC70A7F E7801674 C0081774 7F803D00 80050873 s....=..t..ât..Ô..ú.|.E..D.ó...% 000000
15790208 DB3300d8 10E8C38B D08BDA8B D233C3F7 8B024589 0589C033 FED8E9C3 ûÒÛ±3â...E..%û3Ø.Ö.Å.ú$..Å3Ü.Øy. 000020
D2330474 E99EB480 24C48A00 DB83DAF7 D8F70779 C008C38B D08BDA8B 11EBDAF7 %Ö$..Ö.Å.û.ây.%Ü%Ö.Ü..á$.Ç.Öt.3Ø 000040
D8F70779 C008C38B C88BDA8B 11EBD9F7 1579C908 DB33C88B 10E8C38B C88BDA8B .Ö.â.ú$..â3Ü.èy.%1$..Ö.â.û.ây.%Ü 000060
0035E808 EB0028EB 00EB003A E807B5E9 8560BD02 33FF3380 24C48A00 DB83D9F7 %1.Ü..á$.3.3Ø§`.Öç.Ö:.$.Ö+.$.ÖS. 0000080
39E803EB 005DE808 EB003EEB 00EB009C E8C3C8D1 67750002 83C00100 26E803EB $.Ö&.1â.Ø.ug1âûÒ..$.Ò>.$.Ò].$.Ò9 0000A0
D1F70079 FF08C933 0041E803 EB007BEB 08EB002C E800E800 2CE8C34E 75D20B00 ..ØuNûÒ,.$.Ö,.$.Ö(.$.ÖA.3è..y.%1 0000C0
85DB3300 1CE803EB 0056E8C3 CAD12175 000183C2 D1000183 000283F5 D8F7D2F7 %Ø%Å%.Ø..1.1ó.1.ul1óûÖV.$.Ö..3Üç 0000E0
AD93AD06 0A92AD00 A4E9FDE9 E9C30172 000283C3 130B13F5 81F980CD 0AE82201 ."Ö.ë.'.%.Ü.û.Ø.r.ûÖÖ»ÖE.Ü..øÜ.Ü 000100
E981D874 C908E9D1 E9D1E9D1 E9D17FE5 8010CE80 F1220F86 F98808EE 8391AD91 .Ü..Ÿ..'Ñ."Þ.ö..|.1Ö1Öi Ö1Ö.ètÁ.Ö 000120
E98A04EE 83C186AC C88AADF8 8AACDA8A D2332FE8 25E983CA 7F20F983 787203FE ±.rx.' .ò.ÖX$/3Ø.Ö¯.%Ú.â¯.ê.Ÿ..Ö 000140
8009F720 E983997F 20F98347 727EE980 4074C908 DCD0F901 D0E4D07F E183F98B .'.Å.ÅÖÅ|'ÅÉ.ètM.Ö~rG.' ...Ö %1. 000160
15E3E1EB 08E980F6 32E68AC4 8AF88ADF 8AD30A01 E2800200 F501FA80 1A7C08F9 '.|..'.%ÅØ.ã..Æ.Ö.%.á.12-.Ö.$ÅD. 000180
800081F9 C3C38BD0 8BCA8AF3 E2000280 DAD0DBD1 D8D1EED0 000A8001 8201FA80 .'.ÿ..Ö.ÅŸiÅ1ÜÅÖ.Ø.ãµ.ò.Å.ûü'Ÿ.. 0001A0
E680D78B 10EF8306 7C0305C4 36880131 E8078000 68E8F035 E9C3D08B C0330001 ì.3â.ÅûÖ5»Öh.¯.Ö1..6á..|..ÿ..■.| 0001C0
81027C03 05C4368B 0108E803 B00087E8 F00FE9C3 FE8B067C 89E0737F F0FA817F ..'Þ.sÅ.|..±ûÖ.»Ö..¯.Ö...6á..|.. 0001E0

Dump of file SATURN:[PCCOMMON.DUMP.DLL]DA-IMPRT.DLL;1 on 18-APR-1990 10:39:02.20
File ID (459,7,0)   End of file block 93 / Allocated 96

Virtual block number 58 (0000003A), 512 (0200) bytes

7C0110EF 8305C436 88001EE8 C3FE8802 7C89DF73 7F80FA81 7FE680D7 880080EF ÿ...■.|..'..sÒ.|..±ûÒ...6á..ÿ..| 000000
C18ED98C C08C05C4 3E88FCC3 FE88027C 010080EF 8105C436 880053E8 C3FE8806 ..±ûÒS..6á..ÿ...|..±ü■.>á..â.1.è 000020
80CF88F0 E783064C 89CA0A0F E183F988 064C8800 108A05C4 3688C08E A5A5A5A5 EEEE.â.6á.o...L..'.Å..ò.L..ÓÞ.ú. 000040
8C05C43E 88FC0082 E93FE809 F7047D04 33E981E9 D1E9D1E9 D1E9D100 35887FE5 |.¡5.1Ö1Ö1Ö1Ö.Ö3.).%1$?Ö..■.>á.. 000060
80E78302 4C89CA0A 7FE183F9 8B024C88 00808A05 C43688C0 8EA5A5C1 8ED98CC0 â.1.ëEE.ã.6á.o...L..'.Å..ò.L..Ö. 000080
8000E781 147CEF8B C83809F7 48700096 E981ED32 CD8AE1D1 0018887F E580CF8B .ú.|.¡..1Å.e2Ü.Ö..)H%1;â.ÿ|..Ö.. 0000A0
00028000 82F501FA 80147C08 F9800233 EA288000 E581EF8B C88B0A74 C838FA08 .';ât..â.ÿ.|..+ö3Ø.'.|..'.Åÿ..Ø. 0000C0
D188C933 C32C88E8 22EE8A07 C18A038C 880CE334 8AE7E846 08E98000 04C6140A ..ó...Ö.FŠÖ.4D.E...ê■.Ÿ"Ö.,û3è.1 0000E0
000A8001 8281FA80 D30ADE22 D70AFAE2 0700EAD1 06E3E18A EF8A0001 88C3348A .4ûE...ÿ.ÅD.1öÅ■ä'.■"B.Æ.'.ÿ..Ö. 000100
C3F7C3FA E2001480 4606E334 88F202CE 28C80398 05C40E88 E2D3CC8A FD880274 t..».øÆò..ó...â+ö.¨.4D.F...ã'ûXû 000120
A900F7E1 747F80A9 025D8826 02448BC3 E4D07FCC 80F8C8E9 C3F50301 4C747F80 ..tLiÆ%ûÖâ«.â.ÅÖû.D.&.).`..tÅ%Å` 000140
8CF78793 0873E0D1 E3010578 EF32EC8A D87403F7 7F80C3F7 D3F7E274 00F77F80 ..%Åtã%Æ%û..%ÆtÅ.$2yx|iDiÅs...%. 000160
CC80FB75 E9C3F503 D15E747F F0C3F7C3 05382604 880575C3 3BDA8EC1 8ED98CC2 ö.1.ê.Ö;ûu...&;.Û%ÛÞ.t^1Æ%ûÖu«.ã 000180
F77FF0C3 F7D3F7E2 7400F77F F0A900F7 E1747FF0 A9065D88 26064488 C3E4007F ,ÅÖû.D.&.).`Þ.tÅ%Å`Þ.%Åtã%Æ%ûÞ.% 0001A0
44881775 C338DA8E C18ED98C C28CF787 930873E0 D1E301D5 78EF32EC 8AD874D3 ÆtÅ.$2yx|iDiÅs...%.ò.1.ê.Ö;ûu..D 0001C0
03E880F4 8002458B F787C305 3B260488 05750245 3B260244 880E7504 45382604 .&;E.u..D.&;E.u...&;.û.%.E..¶.$. 0001E0

Dump of file SATUF":[PCCOMMON.DUMP.DLL]DA-IMPRT.DLL;1 on 18-APR-1990 10:39:02.20
File ID (459,7,0)   End of file block 93 / Allocated 96

Virtual block number 59 (0000003B), 512 (0200) bytes

C1D18000 CE81FF00 E7810174 8BFF7C8B 024C8B80 CF800082 358A015D 8B02458B .E..]..5ý..ü..L..|..t..Ô...ö..1è 000000
E8D0C900 497718FC 800CF6E5 2A91FA87 F3870573 EC3A5874 E40A6574 ED0AC0D1 1â.Üte.Öt[:$s..µ.'.'|-É.■.w1ÅèÅÖ 000020
3E741D72 10E9800B 33D38B01 C8800374 D20B127C 0EF98055 E30085CD 8A91D900 Å1..èç.ÐU.'.|..Øt..ü..Æ3Ü.Ö.r.t> 000040
FED3D1E2 D1237417 7708E980 FD8ADF8A F38AD68A 01CE8003 74D20A2B 7E05F980 .'.~+.Øt..ö..■.µ.Ö.».Ö.w.t#iâ1Æ± 000060
C2F6FAE2 DAD1E8D1 20CA8003 743FC2F6 0097E9E8 D0C18807 88DE8819 E8F875C1 èu%$..ß.■.êÅÖÖ..-Ö?t..ò 1$1Öã'-ò 000080
FA2BFA41 E94575FF FC80C4FE DAD1D8D1 50730E13 D7031470 E0D020CA 8003743F ?t..ò ÅÅp..■.ßsP1Û1Ö±á.■.uÉÖA'·' 0000A0
740B0BDA 876A7610 EC800875 D8080DF6 000383F5 DAF7D3F7 0A730E88 D788F31B .µ.■.ßs.%Æ%Ö%.Æ.-Å.Ûu..$.vj.Ö.Üt 0000C0
F671D301 E2D14874 CCFE0A78 FF0AD232 F28ADE8A FB8A5B76 08ECB00F 75FF0A64 d..u..$.v[.«.B.`2Ø..x.±ätK1â1Æq- 0000E0
C4FE0773 00D38301 C6800F74 01C6F614 72077780 FA80017C E9037400 03943E80 .>...t.Ö|..'.w.r.-ó.t..ó..Æ.s.±á 000100
C68AE38A 02458905 C43E88C7 0A7FE780 80241774 7F80A908 D1E0D03A 74FFFC80 .■.t:ÅÅ1Å`..t.$..Ö..ú.>á..E..Ö.ó 000120
E9E679C3 F7880589 02458905 C43E88C0 33017EE9 03740003 943E80C3 F7880589 ...%ú.>...t.Ö-.3â.>á..E....%ûy1Ö 000140
C132D888 30B8CB74 F00AD900 E1D1024D 8BD674E4 0AD8D0E0 D1963488 ADFCF990 .'■û.4.1ÅÅÅ.Öt■.M.1ÅÅ1.Ûtù.■.Å2è 000160
88E88880 C98080C8 80EF8AFF 3250CD74 FFFC8080 C4800370 E5027FED 8080EC80 .$..Û..|pÆ.á..■.têP2..ÿ.ù..è..$. 000180
03749E58 FA130803 E5F7C188 FA880002 830803E7 F7C58850 9FC008DA 88E7F7C6 ÓXÖ.Ö.â.P.êXÖ.Å.Ø..'.è%1.Å.'X.t. 0001A0
FC80C4FE FF69E90A 75E40AD3 D1E2D108 78FF0A58 930388C7 03E1F6C5 8801C880 .ù..è-Å.ú.Æ.X..x.1â1Æ.Öu.Öi.±á.■ 0001C0
C132D874 E40A5C74 ED0AD800 E0D10244 8BD9D0E1 D1024D88 F787FF1A E9AD74FF .tûÖ...%.M.1ÅÅ1.D.1ÅÅÅ.Üt\.ÖtÛ2è 0001E0
```

```
Dump of file SATURN:[PCCOMMON.DUMP.DLL]DA-IMPRT.DLL;1 on 18-APR-1990 10:39:02.20
File ID (459,7,0)   End of file block 93 / Allocated 96

Virtual block number 60 (0000003C), 512 (0200) bytes

80C9322D 8A015D88 FF78E903 75FFFC80 80C480FF 78E90371 E52A7FED 8081EC80 .§..Ù.*Iq.Õ(..ó..•.u.Õx..)..-2è. 000000
D8D1EAD1 80CE80C0 3?248A01 54885003 943E02D9 D1E8D108 74000394 3E8080CF ü..>...t.ISI).>..P.T..$2à.ö.1ôIÄ 000020
96F3F71D 73D338F8 80E9FF76 E9DD8801 CA800374 D688C208 0011E8EE ^R001AE8 Ò...YÒ...ò.øt..ò..IÕv.Õ¯½;Æs.¥µ. 000040
03C128FF FF8EC3F9 730313C1 034E0773 D788FA18 D8F7E1F7 C688FA88 1>'3C033 3àD..'.ó¥Ä¥Ä.'.øs.N.ê.Æs'ù/..+è. 000060
36FF3874 E40A3C77 EC3A0EED 800774ED 0A03962E 8A000394 06C6C3E0 73C 38D0 Ä.èsÙÙó.........Ùt..Ù.:Åw<.ôt8.6 000080
FF325253 50039805 C406C758 585AFE4E E8D83202 33525350 039705C4 06C7U5C4 ó.ú.ó...PSR3ø2ÜÒN±Z[Xú.ó...PSR2. 0000A0
039805C4 06C705C4 36FF0394 A2D2330B 33C033FE 33E905C4 068F585B 5AFE0FE8 Ò.±Z[X..ó.Õ3±3à3U3øÄ...6ó.ú.ó... 0000C0
C43E88F7 881DE880 00F58106 6D88F787 D3E80399 A30397A3 C033FE1A E8525350 PSRÒ.±3óÈ..È..Ŝ£.¥.m..¥..Ŝ..¥.>ó 0000E0
DED0E5D1 06448BFC 06608BC3 FE8805C4 3688ABE6 0A80E680 7FE480AD A5A5A505 .ÈÈÈÙ.ô..Ì..Ì¨.6ó..±ù.m.•.D.ÌÌÄ8 000100
06A03008 F7C528C2 74C00B06 8695F787 0977E838 E0E58302 74FFE025 DAD0E0D1 ÌÄÄÖXÄ.tø.ÌÄ;Ów..¥..ø.ótô+é¥Ä*.. 000120
AD93AD91 AD92C032 E08AACF8 88E086C0 D1C0D1C0 0157DDD1 E2000001 E600B977 w¿ÄÌÌÌÄàÌÌWÌàÌàÌà.Ä.½¯.Ä2à.Ù.Ù.Ù 000140
EF83C033 D888C888 D18801C9 80037402 08187C0E FF836374 FF0810CC 800FE480 .ô..ä...tc...|..øt..è..Ì.ù.Ä3ó.ÿ 000160
8AF88ADF 8AE88ACD 8AF18AD6 8A01CE80 0374D20A 287C06FF 83237248 74E77710 .wÔtHr#...|+.øt..ö..ø.þ.ë.Ŝ.Õ.½. 000180
CA800374 3FC2F6CF 8716E8F5 7547D001 03D1D1D1 E2D12374 0F7708EF 83E432C4 á2ô.ÿ.w.t#ÌàÌÌÌÆÌÄGu¥Ŝ..ü-ó?t..ò 0001A0
02D8D0E5 D13870E5 D120CA80 03743FC2 F6975ECF 87F6E2DA D1DFD1D8 D1E80120  ÌòÌÙÌòÌòã-.ü^.-ó?t..ò Ìlp;ÌÌÄÄ. 0001C0
13742000 C7F7FE13 589E5810 00CE810F FFE68105 7488509F 50035C13 014C1334 4.t..\.P.P.t..Ì...ö..X.X.±¥ú. t. 0001E0

Dump of file SATURN:[PCCOMMON.DUMP.DLL]DA-IMPRT.DLL;1 on 18-APR-1990 10:39:02.20
File ID (459,7,0)   End of file block 93 / Allocated 96

Virtual block number 61 (0000003D), 512 (0200) bytes

4C18342A D0F6D8D0 E5D10088 E9F6ECE9 0375E0FD 8320C583 DAD109D1 D8D1DFD1 ÌÔÌÜÌÌÌÖ.é .»Äu.Õ$-Õ..ÌÌÄÄ-Ä*4.L 000000
F7D1F7D3 F7D7F7D0 F6F63313 73FE189E 1000CE81 0FFFE681 9F057488 035C1801 ..\..t...Ì...ö....±s.3--Ä¥m¥Æ¥Ì¥ 000020
F8883D74 4E407602 00ED8113 75E0C7F6 1875FF0B 0004BEFC FE130E13 CE13F5DA Õ¥.ö.B.±•/....u.-úÄu..Û..vãNt=.« 000040
8AE98AD0 8AF88AC7 8AE08A97 27760100 ED811875 1FE0C7F7 E4E8D233 CA8BD988 .Ì.ò3øŜô¥úÄ.u..Ù..v'..Ä.ú.«.Ì.Õ. 000060
80FC9065 EBEBE8D7 D1D3D1D1 D1E2D171 7420ED83 12751000 C7F79700 82F28ACE ö.·ÿ..¥ú..u..Ù tqÌàÌÌÌÆÌøŜŜSe.•. 000080
D7830003 83000183 01C6801A 7401C6F6 1F720777 80FA8003 85E90374 0003AC3E >¯..t.Õ...'.w.r.-ó.t..ó..Ì..Æ..• 0000A0
2274EDD1 0FE78080 24DE8705 C43E88F7 883074E0 FD8320C5 83087420 00C7F700 .¥ú. t..é .»ÄtO.¥.>ó..8$..Õ.ÌÙt" 0000C0
E90379C3 F78805EF 83ABC688 ABC188AA C68A055D 88064589 C70AC508 C032E086 .Ä2à.é.ú.E..]..ó˙.é¨.ó˙.ÿ..¥ùy.Õ 0000E0
06448BFC C3FE88AB ABABABF7 8805C43E 88C03303 77E90374 0003AC3E 80FCF5FD »¥•.>¯..t.Õw.3à.>ó..¥     .±ù•.D. 000100
70C1037F E0E98180 002DE1D1 E0D1D074 7FF0E181 D133064D 88D8747F F025D088 .Ä¥Þ.tÜ.M.3Ì.ÄÞ.tÄÌÄÌÄ-...ÕÄ..èp 000120
751000C7 F7D800E5 D15D01CA 80037401 81E85008 D1E60086 74FFE030 8000058C ¥...=Ä.tÑÄÌÌÄPÒ..t..ò.]ÌÌÄÄ¥ú..u 000140
FCF787F5 8CE9FF24 E98874E0 FD8320C5 8393E80A 75ED0BD7 D1D3D1D1 D1E2D10E .ÌàÌÌÌÆÌø.Ùu.Ŝ..é .»Ät.Õ$.Õ.¥.¥= 000160
7FE0E981 80202DE1 D1E0D198 747FF025 D0330644 88EF747F F0E181D1 88064D88 .M..Ì.ÄÞ.tÿ.D.3Ä¥Þ.t.ÌÄÌÄ· ..ÕÄ. 000180
CC800FE4 80AD92AD 93ADC932 E88AAC50 D8D1E6D0 9874FFE0 30800005 9870C128 +èp....=Ä.t.ÄÌÌÄP¯.Õ2èU.Ù.Ù.Õ..ä 0001A0
AC3E8000 05C6FCA4 4746A5A5 AB10CC80 0FE480AD FD03AABF 05C683F7 88509210 ..P.¥.ó.e˙.»Ù.Õ..ä.¨ÈÈFGÈ•ó...>¯ 0001C0
D1ADAB08 D1ADAB08 D1ADED01 AB03AC26 02E8D1E8 88ADF788 03AABFFD 1F740003 ..t.»«¯..¥Ù.ÒÌÒ.Æ¯.¨ÌÙÙÌÄ ÙÌÄ ÙÌ 0001E0

Dump of file SATURN:[PCCOMMON.DUMP.DLL]DA-IMPRT.DLL;1 on 18-APR-1990 10:39:02.20
File ID (459,7,0)   End of file block 93 / Allocated 96

Virtual block number 62 (0000003E), 512 (0200) bytes

08C108C3 080033E8 570037E8 570038E8 57003FE8 D9D1D801 D8D1EAD1 58FCA8D8 Ä¨•XÌõÌÄÌÙÌÌÒ?.WÒ;.WÒ7.WÒ3..û.è. 000000
D1D8D1EF D1ADD1D9 D1D8D1EF D1D8CA80 037407C2 F601CA80 03745F58 59D788C2 ô.øY[ t..ò.-ô.t..ò.ÌÿÌÙÌÌÌÒÌÿÌÙÌ 000020
3877F038 0475D208 5C73063B FF3303AA 3688FF08 E9AD1D09 D1D8D1EF D1DAD1D9 ÌÌÒÌÿTÙÌÌÌÒÕ...ó˙.3.;øs\.øu.;Þw; 000040
13F003E7 F70674C0 0803A6A1 50F288E7 F70474C0 0803A4A1 F588ED33 9752F6F7 ¥-R.3Ù.¥ÄÈ..át.¥Õ.·PÄÌ..át.¥Õ.Þ. 000060
13739391 9295E818 5DDD1BCE 180AF75A 92000283 E803E7F7 0874C008 03A8A1EA õÄ´..Ät.¥Õ.Õ.ø..Z¥Õ.ö.Ì].Õ....s. 000080
A8061803 A61E1803 A40E284F C3ED7303 AA161303 A8061303 A61E1303 A40E034F O..È...Ì...˙...˙.sÙÙO+.È...Ì...˙ 0000A0
458A03A0 A3100C0F 24E43206 448AC9EB F503A416 88C21303 A81E1303 A60E0303 ...Ì...˙..ó..È.¥Ŝè.D.2ó$...È...E 0000C0
02558804 88CA88E8 88E1F708 E30D8891 1AE30C88 E888B833 03A2A310 0C0F2406 .$...ÈÄ.3Ù.Ŝ..D....D.¥Ä.Õ.ò...U. 0000E0
DA13C803 E2F70874 0208158B 0E74C008 02448BED 33550A13 C803E2F7 0674D208 .øt.¥ã.à.ÕU3Ú.D..ât....øt.¥ã.à.Õ 000100
C0080488 C933EA13 D803E2F7 0674D208 02558800 74C00802 44885OC1 08580501 ÌÌX.èP.D..ât..U..øt.¥ã.Ä.õ3è...ä 000120
E2F70974 0208158B 0F74C008 04448801 D1EA1308 03E2F708 74D20804 55880F74 t..U..øt.¥ã.Ä.õÌÌ.D..át....øt.¥ã 000140
F70874C0 08058BCA 13E80303 A226F708 74C00804 8850C308 58000183 EA130803 .Ä.õ.Ì.X.ùP...ât.¥&Ä..Õ.ò...ât.¥ 000160
88D3D1CA 13E803E2 F70874D2 08045588 0F74C008 02448BD8 33CA13E8 0303A026 &...Õ.ò3Ù.D..ât..U..øt.'ã.Õ.òÌÆ. 000180
0874C008 02458B( 33550003 83CA13E8 03E2F709 74D20802 55881074 C0080444 D..ât..U..øt.¥ã.Õ.ò.Æ.U:i.E..ât. 0001A0
55881A74 C00804. 88DA13C8 0303A226 F70874C0 08024488 DA13C803 03A026F7 ¥&...à.Ö.D..ât.¥&Ä..à.Õ.D..ât..U 0001C0
F70874C0 0804458B EA130803 03A226F7 04448805 D1DA13C8 03E2F708 74D20804 ..øt.¥ã.à.ÕÌÌ.D.¥&Ä..Ä.õ.E..ât.¥ 0001E0
```

Dump of file SATURN:[PCCOMMON.DUMP.DLL]DA-IMPRT.DLL;1 on 18-APR-1990 10:39:02.20
File ID (459,7,0)   End of file block 93 / Allocated 96

Virtual block number 63 (0000003F), 512 (0200) bytes

```
                                                                        &...Ã.õ...-&Å..é.Z1ã111Æ1■1ã111Æ 000000
D3D1D1D1 E2D1D7D1 D3D1D1D1 E2D15A97 C50303A2 26F603A0 A0EA1308 0303A026 1■1ã111Æ1■^.-úó.¯...óÙ..-t..Ÿá.; 000020
3B04C0EE 81087;F6 0B03AD36 8B0003AC 06C6C3F6 0B5ED7D1 D3D1D1D1 E2D1D7D1 %wP.ÜtL.6á.ú.á.É.PQRSUW3Ü3è3Bò>• 000040
FC3EE8D2 33C9330B 33575553 52515003 AF05C406 C705C436 FF4C74ED 0B5077F5 _]{ZYXú.á.ñ.PQRSUW3.Òl=_]{ZYX..á 000060
C4068F58 595A5B5D 5FFBD1E8 FF335755 53525150 03B705C4 06C75859 5A5B505F ¯Ô.•3á3è3Ø3Ü3Ü3.Â¯..6á.ũ.á.ñ.PQR 000080
52515003 B705C406 C705C436 FF03ACA2 FF33ED33 DB330233 C933C033 FC1AE905 SUWÒ%«€.3á      $óU.$VW3Ü.V.6.... 0000A0
0118FF06 C60E5688 DB335756 EC8B55C6 EBABABAB ABC03303 AFBFFBF8 E8575553 Ò(.6....;v.■..èã.._^.[}ÙU.$VW3Ø. 0000C0
8BD23357 56EC8B55 CB5DE58B 5E5F0D89 40C98005 730A7638 001BFF06 C60028E8 ^.Ô..^.[]ü•.Å.á.N..•dv.Ÿã3-Ş'év 0000E0
76C527E8 F63340B1 067664F9 830A4E88 C0BED88C FCCB5DE5 8B5E5F00 06E80E5E .«Ø.µÉ.Å.N./Ø..v..F..N.«á.UÒw.]+ 000100
2B5D1077 E85503C8 BF064E01 0C468B06 76890302 BE0A4E8B D88EA4F3 0302BF06 v..v.«á....u..E..}..ú.ÕÙ.$.$.WV 000120
565704EC 83EC8B55 C30A8CC7 8B065D89 04458902 75890089 03C0BF0A 76030676 á^.&....Å-....t..^.&.... .$..^.& 000140
26065E8B 07E80020 0598078A 26065E8B 0C740102 8187F608 8B98078A 26065EC4 ...=e.t..«G&....Å-....u'.-..F.á^ 000160
5EC40B46 8C067E89 F2750402 8187F608 8B98058A 2647F888 16740065 3D98078A .&....Þ.F.&6...^.&....%.6&...%.F 000180
46FFF788 078826C6 8BF8B898 078A2606 5E8B2E07 C6260646 FFF08898 078A2606 ..áuÔ.-•^_.[]ÙU.$.$.WVá-.$..&.=. 0001A0
2E3D8026 9008E806 7ŁC45657 06EC83EC 8B55CB5D E58B5F5E FC7E89E9 75C00A06 t.G&.=.uµ.-..F..Ô.F.&.7.tg.-.$.. 0001C0
900EEB06 7E8B6774 003F8026 0646FFDF 8B08468C 067E89F3 75003D80 2c 70774 &.=et.&.=Et.G&.=.uÙ.-..F..ú.õ.N. 0001E0
064EFFC2 8CC78808 468C067E 89ED7500 3D802647 07744530 80260074 65; 9026
```

Dump of file SATURN:[PCCOMMON.DUMP.DLL]DA-IMPRT.DLL;1 on 18-APR-1990 10:39:02.20
File ID (459,7,0)   End of file block 93 / Allocated 96

Virtual block number 64 (00000040), 512 (0200) bytes

```
752E3F80 260F8B08 468C067E 89F97430 3D80264F 9002EB06 7E8BFE56 89FC4689 .F•.V±.-.$..0&.=0t•.-..F..Ô&.?.u 000000
5E8EFE5E 8CFC7689 F275C00A 078826AC 065EC406 46FFFC76 C5FA5E8C 064EFF03 ..N..^•év•.F.á^.¯&...âu·.v•.^±.^ 000020
D3098A9A 2AAF051A 9A065EC4 2AAA053A 9A1E841E 8DEC8B55 90CB5DE5 8B5F5EFA •^_.[]ù.U.$..Ç..:.`•á^....£•.¤.& 000040
0C76FF0E 76FF2474 00067E83 565708EC 83EC8B55 CB5DC02B CB5D0001 8805722A •r.|..]ù+á]ÙU.$.$.WV.-..t$.v..v. 000060
76FF90CB 5DE58B5F 5E1FA5A5 A5A5DA8E 1EF08BFB 8B085EC4 04C4832A F703009A ...%•.á.á^..«.Þ..ÖEEEE.^_.[]ù..v 000080
3A9AF85E 8D1FA5A5 A5A5DA8E 1E0716F0 8BF87E8D 04C4832B 1103009A 0C76FF0E ..v.....+.á..~%.Þ....ÖEEEE..^%.: 0000A0
7400043C 3E805657 0AEC83EC 8B5590CB 5DE58B5F 5E2B8D06 8D9A085E C42B1905 ..+á^.....+^_.[]ù.U.$.$.WV.><..t 0000C0
4603C02B 02EB0001 B8057520 3F8326F8 5EC4FA56 89F84689 2A30168B 2A2EA147 GÀ.•..0•.F%.V•á^¥&.?-u.|..$.+á.F 0000E0
0EFC76FF FE76FF50 C0289003 EB0001B8 067E000E 7E83FE56 89FC4689 0C56880A ..V..F•.V±.-..-.|..$..+áP.v±.v•. 000100
832BCB39 4E9A37FF 260277FF 260477FF 260677FF 26065EC4 5BE806C4 83045DE8 Ò]..á.$Xá^.&.w.&.w.&.w.ť.7.N9ù+. 000120
8BF85EC4 C02802EB 0001B805 7E000E7E 8350400E 46885052 FA5689F8 468908C4 á..F%.V•RP.F.ãP.-..-.|..S.+áá^%. 000140
0AC4832C 2536CC9A 50520C56 8B0A4603 C703C02B 02EB0001 B805752D 3F8326F8 ¥&.?-u.|..$.+á.ú.F...V.RP.áõX,.á. 000160
832D07C6 26FC46FF FC5EC40A 752D3F83 26F85EC4 FE5689FC 46890C56 8B0A468B .F..V..F•.V±á^¥&.?-u.á^•.F=&ó.-. 000180
3E80501E 0436882E 07C626FC 5E8BFC46 FF078826 01478A26 FC5EC414 7E000E7E -..-.á^=&.G.&...F=.^•&ó..|6..P.> 0001A0
FE5689FC 468908C4 832D5F02 569A5052 FE568BFC 46030E46 03D8F7C0 1801043C <...áXÅ.F..F•.V±RP.V._-.á..F=.V± 0001C0
F85EC45E 74303F80 26065FC4 26F85EC4 FC46FF45 07C626FC 5EC40774 00107E83 .-..t.á^•&ó.E.F•á^¥&á_.&.?0t^á^% 0001E0
```

Dump of file SATURN:[PCCOMMON.DUMP.DLL]DA-IMPRT.DLL;1 on 18-APR-1990 10:39:02.20
File ID (459,7,0)   End of file block 93 / Allocated 96

Virtual block number 65 (00000041), 512 (0200) bytes

```
C68B157C 64FE83FC 46FF2D07 C626FC5E C4F08BD8 F70B7DF6 0BF08848 02478B26 &.G.H.Þ.-).%Å.Þá^•&ó.-.F=.±d|..ó 000000
DAB999C6 8B157C0A FE83FC46 FFF28BF9 F799C68B 070026FC 5EC4F9F7 0064B999 .¿d.%•á^=&...ó.%•..F=.±.|..ó.ζ. 000020
56880A46 8B070026 C68BFC5E C4FC46FF F28BF9F7 99C68B07 0026FC5E C4F9F700 .%•á^=&...ó.%•..F=á^•.6&...F..V 000040
FF0A76FF 0C76FF0E 76FF1076 FF01043C 06C604EC 83EC8B55 90CB5DE5 8B5F5E0C .^_.[]ù.U.$.$.ó.<...v..v..v..v.. 000060
46C612EC 83EC8B55 CB5DE58B 00043C06 C6FE5689 FC4689FE 49E80E06 76FF0876 v..v..Òl±.F=.V±ó.<...[]ÙU.$.$.6F 000080
B805752D 3F8326F4 5EC4F656 89F44689 2A30168B 2A2EA151 7400043C 3E8000F2 ·..><..tOÀ.•..0•.F¶.V-á^¶&.?-u.| 0000A0
3E0603FC 46886A75 0E463904 3EA1FE56 89FC4689 0C56880A 4603C02B 02EB0001 ..$.+á.F..V..F=.V±Å>.9F.uj.F•..> 0000C0
77FF2606 5EC44AEB 0007C626 EE5E8B30 07C626EE 46FFEE5E C4F05689 EE468904 ..FŸ.VÞá^Ÿ.FŸ&ó.0.^Ÿ&ó..$Já^.&.w 0000E0
26F45EC4 5052F656 89F44689 08C4832D 8F394E9A 37FF2602 77FF2604 77FF2606 .&.w.&.w.&.7.N9.-.á..F¶.V-RPá^¶& 000100
8836CC9A 50520C56 880A4603 C02802EB 0001B805 752D3F83 26500E46 0302478B .G..F.P&.?-u.|..$.+á.F..V.RP.äó| 000120
26FC46FF FC5EC40A 752D3F83 26F45EC4 FE5689FC 46890C56 880A468B 0AC4831B ..á..F..V..F=.V±á^¶&.?-u.á^•.F=& 000140
5EC406C4 830205E8 0EFC76FF FE76FF50 0001B81D 7F00027F 8326F45E C42007C6 ó.-á^¶&......|..P.v±.v•.Ô...á.á^ 000160
76FF5000 01B8687E 000E7E83 FC460102 47B826F4 5EC40AEB 3007C626 FC46FFFC •.F=&ó.0$.á^¶&.G..F•.-..-h|..P.v 000180
80437D00 027F8326 F45EC42E 07C626FC 46FFFC5E C406C483 0108E80E FC76FFFE ±.v•.ÒÀ..á.á^•.F=&ó..á^¶&....)C. 0001A0
500E4689 0E468803 7E0E4638 D8F70247 88260EEB D8F70247 88260874 00043C3E ><..t.&.G.%À$.&.G.%Å;F.-..F..F.P 0001C0
832EA638 889AFC76 FFFE76FF 50003088 0E76FF06 C4830196 E80EFC76 FFFE76FF .v±.v•.Ô...á..v.|0.P.v±.v•..8Ï.. 0001E0
```

```
Dump of file SATURN:[PCCOMMON.DUMP.DLL]DA-IMPRT.DLL;1 on 18-APR-1990 10:39:02.20
File ID (459,7,0)   End of file block 93 / Allocated 96

Virtual block number 66 (00000042), 512 (0200) bytes

 0A76FF0C 76FF0E76 FF01043C 06C604EC 83EC8855 CB50E588 0C5688OA 468808C4 á..F..V..[]ùU.&.&.6.<...v..v..v. 000000
 06EC83EC 885590CB 5DE58800 043C06C6 FE5689FC 4689FE6E E80E0676 FF0876FF .v..v..Ònt.F=.Vt6.<...[]ù.U.&.&. 000020
 16892A2E A303C483 2EE2394E 9A37FF26 0277FF26 0477FF26 0677FF26 065EC456 Vâ^.&.w.&.w.&.w.&.7.N9â..á.È.*.. 000040
 880A4603 C0289003 E80001B8 06752D3F 8326043E A3480247 88262A2E 1EC42A30 0*á..*&.G.HÈ>.&.?-u.¡..Š..+á.F.. 000060
 4E027788 262A2E1E C40AC483 2FE236CC 9A50520E 76FF5306 FE5689FC 46890C56 V..F=.Vt.S.v.RP.àóâ/.á.á..*&.w.N 000080
 FF1F7F0E 4639C688 077CFCFE 83043E36 890440A2 C02A02EB 0180047D 043E3639 96>.).¯.Š.*àÀâ..6>..t•|..69F.... 0000A0
 3E8090C8 5DE5885E 0CC483FD 93E80E06 76FF0876 FF0A76FF 0C76FF0E 76FF1076 v..v..v..v..v..v..Ò.».á.^.[]ù..> 0000C0
 C626FC5E C4FA5E8E FE5E8CFC 7689F975 00FF7C80 46FC76C5 FA5E8C1E 74000440 â..t..^*év=F.|..u*.v=.^t.^*á^=&ó 0000E0
 8855C85D E5885E0A C483FEF6 E80E0676 FF0876FF 0A76FF0C 76FF0E76 FF00FE47 Gt..v..v..v..v..v..Ò-t.á.^.[]ùU. 000100
 0E0676FF 0876FF0A 76FF0C76 FF1076FF 1276FF19 75450E7E 83067465 0E7E83EC &.-.et..-.Éu..v..v..v..v..v..v.. 000120
 83FD39E8 0E0676FF 0876FF0A 76FF0C76 FF1076FF 1875660E 7E839035 E8FB8FE8 Ò.«Š5..-.fu..v..v..v..v..v..Ò9». 000140
 90CB500C C483. C0 E80E0676 FF0876FF 0A76FF0C 76FF1076 FF1276FF CB500AC4 á.]ù.v..v..v..v..v..v..Òât.á.]ù. 000160
 880676FF 0876↑,50 4004C483 2FF002B6 9A0676FF 0876FF29 74000A7E 83EC8855 U.&.-..t).v..v..Å.»/.á.âP.v..v.. 000180
 D88E1EEC 88554590 D88CC888 CB500AC4 832AA237 8E9A5052 08568806 46030A46 F..F..V.RP./7Å*.á.]ù.à.Á.EU.&..Ä 0001A0
 405D1FE5 8802ED83 F8044416 8904420E 8908E804 5405C406 C7087412 7703FB83 .«.w.t.ú.á.T.Š...B...D.½.Ù..Í.]M 0001C0
 468ED98E A5A5FC08 8EC18ED9 8CC08C04 468FF388 C8F3F60C B304542D 05C4A1CB ùÀá.-T.*.-µù.µ¢F..à.).è.Á=ÉÈ.)/F 0001E0

Dump of file SATURN:[PCCOMMON.DUMP.DLL]DA-IMPRT.DLL;1 on 18-APR-1990 10:39:02.20
File ID (459,7,0)   End of file block 93 / Allocated 96

Virtual block number 67 (00000043), 512 (0200) bytes

 FC7D89FC 758BC304 468ED98E A5A5A5A5 FCD88EC1 8ED98CC0 8C04468F F38BC304 .ù.µ¢F..à.).è.Á=ÉÉÉÉ.)/F.ù.u=.)= 000000
 D1D8D1D9 D1FAD105 8925747F 80C2F702 54880C88 C033FCFC 758B03E8 07FE45C6 6Èt.Š..u••3à...T.%ó..t%..]*]]ÍÀÍ 000020
 45890589 C3065589 3800C281 8FE68004 4D890245 89D8D1D9 D1FAD1D8 D1D9D1FA *]]ÍÀ]*]]ÍÁ.E..M..].ó.8.U.û...E 000040
 1E05C868 1E1C34A3 E0865800 00FFFF9A 5016C488 50EC8855 C3064589 04458902 ..E..E.ùU.&P.á.P.....X.ÀE4..hà.. 000060
 30E1314A 9A50CB5D E5880001 B82E4030 CA9A08FC E80021E8 0000FFFF 9A05C668 hó......Ò1.Ò•..ò=M.¡...[]ùP.J1À0 000080
 47017500 308026?F FFB905C8 068EFF33 0000B81E 05CE16FF 00FF6830 EE31A49A .È1Ÿ0h....ö..£..3...à.¿..&.=.u.G 0000A0
 F7B8071E 061CEBE7 74AEF2C0 330874CA 88A6F3C8 88D18809 D28E3174 00308026 &.=.t1/0..].ùµ].ôt.3à·ÙtÓŠ.....% 0000C0
 00FCB8EC 885500C3 1FEDE8AA C20A0572 412CAC92 04E0C00E 72412CAC 1C38BF1F .¢;.¯,Ar.àÀ..¯,Ar..ó¯ŠÙ.û.U.&¡=. 0000E0
 0288CB5D E5883154 31A49A50 00FFB81B D21EFF04 74001BD4 3E8330F3 31A49A50 P.É1µÒ.>à..t...0.¡..P.É1T1.[]ù¡. 000100
 970C7496 401074C2 3BAD1EC4 8E0656B8 C08ED88E 08358857 56EC8855 FF76E900 .Òv.U.&VW¡S..Ä.á.V./á.Ù;ôt.â.t.. 000120
 31683174 9A0676FF 57EC8855 0002CA5D E5885E5F 96E8E8F7 88AEF2FF FFB9C033 3á¿....Ù.%ŠŠ._^.[]ò..U.&W.v..t1h1 000140
 FFFF9A50 1651521E 530002B8 C4885049 D1F7AEF2 FFFF89C0 33FA8892 1F74C008 .àt...*3à¿..¯ÙÁ1IP.áE..S.RQ.P... 000160
 0808070A 0C090C08 0C070906 00051804 02030202 16010002 CA5DE588 5F5B0000 ..(_.[]ò........................ 000180
 1C70206D 006C0859 00570053 00520243 00410235 02121211 0010120F 1600160C ............5.A.C.R.S.W.Y.l.m p. 0001A0
 FFFFB81C 3016891C 37A31608 00000807 02CE08A4 00840982 0A810A80 16060972 r...........É.ö.■.....È7...0.¡.. 0001C0
 073A2E1B 75E40A00 24B931DA 8B1C37A3 CB5DE588 99FFFF88 0008E8CB 5DE58899 ..[]ùÒ..¡....[]ùÈ7.ÉÒ1¿$..Òu..:. 0001E0

Dump of file SATURN:[PCCOMMON.DUMP.DLL]DA-IMPRT.DLL;1 on 18-APR-1990 10:39:02.20
File ID (459,7,0)   End of file block 93 / Allocated 96

Virtual block number 68 (00000044), 512 (0200) bytes

 1C30A398 01478A2E 430176CA 3C04728C 3C430A76 243C0472 133CF7E2 43431674 t.CCâ¼<.r.<$v.C<¥r.<òv.C..G..È0. 000000
 FF53CC88 04EC83FF ACE9FFA0 E9C03300 098A0872 1C391E38 065E88EC 885500C3 ù.U.&.^.;.9.r.¤..3àÓ..Ó¯..&..âS. 000020
 00C850E5 88FD1C38 A78091E1 75C0855A 5900001A 999A5116 0C76FF08 76FF0A76 v..v..v..Q.....Y2.áuÅ..];.».[]ù. 000040
 E80C4E88 52520233 52F8568D 1652FE56 80160676 FF0876FF 40870EEC 83EC8855 U.&.&.ñâ.v..v...Vt R..V¥R3ØRR.N.Ò 000060
 76FFFE46 805002CA 80227402 00A92A75 0400A910 CA800874 0100A90A 468B018A ...F.`..t..ò.`..u*`..t".ò.P.Ft.v 000080
 03255251 01CA8003 E8FE4E88 087558C0 850000FF FF9A5050 C0335016 0676FF08 ..v..P3âPP......âXu..Nt$..ò.QR%. 0000A0
 118A0374 00028AF0 C2F60E75 006E3D16 74C00800 00FFFF9A 5050C033 50C70A00 ..úP3âPP......åt.=n.u.-òÞ¤..t.¤. 0000C0
 50008BE4 EBC03300 188A0000 19689A50 00721C39 063BFE46 880080E9 FEF2E900 .Ò·tÒ...Ft;.9.r.P.k...¤..3âŠÒ.ÀP 0000E0
 4000A90E 758000A9 C9330A46 886175C0 080000FF FF9A50F8 468D1653 F45E8D16 ..^¶S..F¥P......áuâ.F.3è`..u.`.â 000100
 0775023C 908EE940 F446C607 75013CF4 468AF24E 8880B102 75801E4D 06F60775 u.-.M..u.Ÿ..N·.F¶<.u.óF¶âÒ..<.u. 000120
 00028951 51FFFFB9 52737400 020A46F7 7A74C90A F44688C0 320083E9 08F446C6 óF¶.Ò..2à.F¶.ètz%F...t¤R¿..QQ¿.. 000140
 F6468016 524FEBC0 33FE6EE9 03740083 300C74C0 08000032 989A50FA 46801651 Q..F*P..2...åt.=..t.Òn‡3âŠOR..F- 000160
 83521875 1AF67E83 3274F846 392375C0 0800001A 609A50F8 46801650 00018850 P¡..P..F¥P.m....âu#9F½t2.--.u.R. 000180
 FA468016 505050C0 33528E75 C0080000 FFFF9AFA 76FFFC76 FF00FC5E 8301FA6E n*..^=..v=.v*......âu/R3âPPP..F* 0001A0
 50C03350 F8468016 0676FF08 76FF2875 48C1F6F4 4E8AAA75 C0080000 . '179A50 P.ñ3...âu`.N¶-èHu(.v..v...F¥P3âP 0001C0
 01C980F2 4E0A20C9 80037400 080A46F7 10C98003 740001F8 46F70000 3z '9A50 P.«2..%F½..t..è.%F...t..è .N·.è. 0001E0
```

```
Dump of file SATURN:[PCCOMMON.DUMP.DLL]DA-IMPRT.DLL;1 on 18-APR-1990 10:39:02.20
File ID (459,7,0)   End of file block 93 / Allocated 96

Virtual block number 69 (00000045), 512 (0200) bytes

 8B5500C3 01C98003 7580A8C9 33C123D0 F71C32A1 CB5DE588 1C3B8F88 D88BC288 .ò.Ä..;..Í)ûÂ2.%Â#è3è´.u..è.û.U. 000000
 51C93353 1274201C 3B87F6FD A1E9C033 00098A08 721C391E 38065E88 0CEC83EC $.$..^.;.9.r.¤..3àÔÂ»-.;. t.S3èQ 000020
 C0330856 C50A4.8E FA5E8C66 74801C38 87F60000 34129A50 16F4468D 51414151 QAAQ.F¶.P..4..-.;..tf.^*.F.éV.3à 000040
 DC8B02EC 833B75AE F20A8049 E30C4E88 F86689F2 8BFA8856 57FCFC46 89FE4689 .F±.f==WV.*.·.f%.N.DÍ¯.·Üü;.$..É 000060
 009AE900 2BE8F4E2 AA1A74F8 3B0D740A 3CAC0C4E 880716FA 8B0488E2 2B00808A ¤..+ã.Â.*.-.N.¯<.t.;«t.¯ã¶Ó+.Ó.. 000080
 7AEB0093 E9FA5E8E 5F5EE1EB 0014E8E2 EBFC46FF 0AB0AA00 1FE80375 FB3B0080 ¯.;«u.Ò..¯..F=$ãÒ..$Â^ .^*Ó..$z 0000A0
 5016F446 8D51521E 53065E8B 1FE3CA2B CF8B1F06 1E515350 31AE3CB6 9AFFFCB8 ¡•..Ñ<Ú1PSQ....ú+òD..^.$.RQ.F¶.P 0000C0
 C00B08C4 831FC3FA 8B585B59 1F0774DB 08FE5E01 F45E8B11 75C00800 0031CE9A .ö1...àu..^¶.^±.Üt..Y[X.*û..á..á 0000E0
 3B87F6FE 5E8E26EB F90020BA 03EB001C 8A087500 09BA0001 30007400 603D1874 t.=m.t.=..¤..u.¤..$.¤ .*$&.^±-.; 000100
 FC462BFE 468B06EB F9C03300 1CBA0EEB F803751A 3F80085E 8B0A5E8E 0E74401C .ât..^..^..?.u.%$.¤..3à*$..F±+F= 000120
 0856C51E EEEBC18B 0475C90B 0C4E8BFC 85E9CB5D E5880472 FA5E8E5F 5EF8668B .f%^_.^*r..Í)ùÒ.•.N..èu..è$Ÿ.éV. 000140
 00098A00 01300074 00603017 74C0081F 071E0000 35319A50 16F4468D 51521E53 S.RQ.F¶.P.15......ât.=m.t.=..¤.. 000160
 1A3F8026 DA8B0A74 401C3B87 F6B775C0 08F4468B C2EB0020 8AC7EB00 1CBACC75 uæo..$ùo .$ò.f¶.àuñ-.;.ãt..Ö&.?. 000180
 5DE58801 FE4F8026 0574C30B C08C065E C4EC8B55 00A3EBC0 33001CBA A6EB0275 u.$Ío..3à$È.U.$á^..à.ût.&.O±..Í) 0001A0
 1E58A312 740025E8 0875001E 583E831E 73FFF13D 06468857 5602EC83 EC8B55CB ùU.$.$.VW.F.=þ.s..>X..u.ÒX.t.ÈX. 0001C0
 CB5DE588 5E5F02C4 8335163F 249A0676 FF087500 78E80574 0018E815 750082E8 Ò..u.Ò..t.Òx.u..v..$?.5.á._^.Í)ù 0001E0

Dump of file SATURN:[PCCOMMON.DUMP.DLL]DA-IMPRT.DLL;1 on 18-APR-1990 10:39:02.20
File ID (459,7,0)   End of file block 93 / Allocated 96

Virtual block number 70 (00000046), 512 (0200) bytes

 289A5002 80510E4F 8D50501E C033FE5E 89FEE383 43065E88 0776065E 3900F08B Êþ.9^.v..^.C.D±.^±3à.PP.O.Q¯.P.( 000000
 FE5E8800 08A30A8E 0574020B 1E5CA31E 5A1687C2 8B3874FF FA8308C4 83364541 AE6.á..*.t8.ò..Z.È\..@t..ÒÈ...^± 000020
 06A30000 05000AA3 01478D00 02A30000 A3000A88 0C478948 480008A3 C0330B8E .Â3àÈ..HH.G.¡..È..È...G.È.....È. 000040
 00000AC8 C3D98E 1 8CD20808 A8E81E5C 1E8ED833 064E88C0 8ED88CC3 1FD88C00 ..Â.û.Â.á.N.3Ü..\.Ò´..@.è.Íùà... 000060
 C4FE5689 FC4689 ` 57882606 4788260C 5EC4FA56 89F84689 08568B06 46885657 WV.F..V..F%.V*á^.&.G.&.W..F•.V±á 000080
 74003F80 26FC5EC4 F876C5F6 5E8C0A4E 8B2E7E00 0A7E8330 07C626F8 46FFF85E ^%.F%&6.0.~..-..N..^-évVá^•&.7.t 0000A0
 F85EC40A 4E89F65E 8EFA5E8C F87689E7 E2460488 30809003 E8078A26 FC46FF09 ..F=&..$..¯O..FãÒ.v%.^*.^-.N.á^% 0000C0
 3005C626 9006EBF8 7EC4FB4E FF1F7C35 3F8026FC 5EC4287C 000A7E83 0007C626 &ó...-..|(á^•&.?5|..N%á-%$..&6.0 0000E0
 FF260C5E C4097531 3F802606 5EC407FE 26DF8BFA 468CF87E 89F57439 3D80264F O&.=9t%.-%.F*.Ò&±.á^.&.?1u.á^.&. 000100
 000090CB C95F5E08 C4833671 02569A06 76FF5250 52400856 88064688 15EB0247 G.$..F..V.ãRPR.v..V.qó.á.^_èù... 000120
 401C3B87 F60C7C00 FB83117D 1C391E38 065E88EC 88550136 E9008357 56EC8855 U.$VW*.Ò6.U.$.^.;.9.)..«.|.-.;.ã 000140
 76C55657 1E0085E9 0375C90B 0E4E88EC 8B5500CB 5DE588C0 3302EB00 01B80574 t.¡..$.3à.Í)ù.U.$.N..èu.Òç..WVév 000160
 0773F103 49507300 DA83C12B 5778D20B 0E4E8837 84421A9A 5706561E 067EC40A .á-..V.W..B.7.N..@xW+è.Ö.sPÍ.þs. 000180
 C628C703 C323D81B C72848C1 8B41C08E 37F305C0 8C0773F9 03D88EFF FF05D88C .Á....Á.*s..à.µ7.àA.èH+ú.Uñù.ú+ó 0001A0
 FFFF8308 8E37FE2D D88C0775 FFFE835C E391FCA4 F3FDC12B 9140C603 C323D81B .Uñù.6ã.+è»µÈ•.D\.±.u..Á-±7.Á... 0001C0
 C22BD2F7 D688C203 C323D81B C22BD2F7 D7B848C1 8BC8EBC0 8E38292D C08CD175 uÍ.à-)8.à$à.èH.ø%@+ò.Uñù.ò.ø%@+ò 0001E0

Dump of file SATURN:[PCCOMMON.DUMP.DLL]DA-IMPRT.DLL;1 on 18-APR-1990 10:39:02.20
File ID (459,7,0)   End of file block 93 / Allocated 96

Virtual block number 71 (00000047), 512 (0200) bytes

 D88E3835 05D88C07 75F60B18 E391A4F3 C913A5F3 E9D1C12B 9140C203 C323D81B .Uñù.óã.+èÍÒµÈ.èµÈ.D..-u..Ä.5B.Ä 000000
 38E30C4E 8BEC8B55 CB5D0856 8B06468B 1F5F5EBE EBC08E38 6C05C08C C775FF0B ..uú.â.Í8.à$/^ ..F..V.!ùU.$.N.D8 000020
 13ABF3E9 D1E08A0A 468BD12B D187D103 D323D81B D1280C74 DAF7D78B 067EC457 Wá~..ø%Öt.+Í.Uø&.Í.Í+Í.;..ÂÍÖµ¨. 000040
 CB5D0856 8B06468B 5FAAF3C9 13ABF3E9 D1C38E38 77C381C3 8C10E3D1 87AAF3C9 èµ´.ÍD..ú.ùw8.úÍÖµ¨.èµ´_.F..V.)ù 000060
 B00A79D2 0B0E750A F9831374 C00A93FC 071E570A 7EC51E08 56880646 880E4E88 .N..F..V..é~.W..•..ât..¯.u..@y.¯ 000080
 0276393C 30040387 92F1F793 F1F70274 C00BD233 92F788DA F7000283 DBF7AA2D -¨%Ù.@.%Ö.%.3@.ât.%þ.%þ..Æ.0<9v. 0000A0
 885E5F1F 58DA8CF2 72C73B01 448DFF44 880586AC 4F0588E2 75C308C2 8BAA2704 .'´.ò.ûuã..O¯...D..D.;úr·.ÖX._^. 0000C0
 8855CB58 0000358A 9A531650 521E5100 0289DC8B 5301578D E42A078A 00C850E5 Í)ù...*Ò.W.S.É¿..Q.RP.S.¤5..[ùU. 0000E0
 EABF5D09 50E8551B E28EA536 A536A536 A5361BE2 8F06768D C08ED88C FC5756EC &VW=.Ä.à.v.«à.6É6É6É6É/à.UÒP.)«ò 000100
 8C08508C 1BEA0645 C7044D89 0255891D 89FF321B D8BFAA91 A4F39198 ACC8881B ..à¯..µÈ.¯«Ä.2....U..M.úÈ.õ..]... 000120
 1E8900AC E9083301 85E8EF88 FF330788 40C98030 C98058CB 5DE5885E 5FC788DA Õ.ú ^.Í)ùX.èO.èã.ø3..ÿÒ..3ÙÖ¯... 000140
 0C2EF7C3 8BEA88F8 881C0C26 F7C78850 E0720205 E8F888E1 72020CE8 D8331C0C ..3ÙÒ..rÄ.%Ò..rÂP.ú%&...%.õ.ú%.. 000160
 1C040E89 CE031C02 3E89FC85 E8D87300 D383F803 58BE7208 8BC503C4 75020B1C ..@uá.é.År/X.%.Æ.sÄ$ç•.>...ö.... 000180
 E89F7508 0880CD80 037501AD E8911C0A A31C06A3 1C08A3C0 331C1016 891C0EA3 È......3àÈ..È..È...ÒÙ.u..ë..Ùu.Ò 0001A0
 74203C06 742B3C31 74001BFF 3E801274 453C1C74 443C4E41 7401FDE8 DB3300E7 Ò.3ÙÒ».tAN<Dt.<Et..>...tÍ<+t.<-t 0001C0
 7502C5F6 0088E850 9F016CE8 4600001C 0E06C70E C98003EB 0402C981 4E277502 .u'N.è..$..è.ú.....FÒÍ..PÒ..-é.u 0001E0
```

Dump of file SATURN:[PCCOMMON.DUMP.DLL]DA-IMPRT.DLL;1 on 18-APR-1990 10:39:02.20
File ID (459,7,0) End of file block 93 / Allocated 96

Virtual block number 72 (00000048), 512 (0200) bytes

```
0A3E03FB 0330C980 03741872 C1F70675 FF0B1C0E 3E8BDBF7 02759E58 40C98003 ..è@X.u.%U.>....u.%ër.t..è0.«.>. 000000
1C2006C6 1C023E8B 0A9BE81C 16BE5156 507F0190 FF811C10 3E2B0475 10C5F61C .-é.u.+>.......PVQƒ..Ô...>..6. . 000020
F00645F7 000383F5 D8F7D3F7 137480C5 F61C141E 881C12A1 38755E59 01ACE800 .Ô¯.Y^uBÀ......-é.t.%Æ%À%.Æ.%E.Þ 000040
C302CD80 037<001C 083E831C 202E8A08 C9800376 071C083E 83800740 8004747F .t..M...>...v..è... ..>...u..ë.ú 000060
E301C303 E30102CD 80ED770C CCFB8117 7200E4E8 0A1C0C06 C63FFFBB C301C980 .è.úE.76....ÒÒ.r..«ä.wÚ.ë.ÌD.úÌD 000080
00038300 0358008A E8502872 0006E807 8BDFABEF 8BFF33C3 DFEBDE78 DB03E301 ÌD.ÀxBŠÔú3..ÿ.Ô.æÒø.r(PÒ..X.Å.Æ. 0000A0
C78BEEEB 1C0A06FF 01CA8003 74C00A00 72008BE8 E5721999 FF810007 83000583 .Ï..æ.....rÌÒE.r..åt..ò.....$Y.ú 0000C0
C98006E8 0575D208 09758000 F8810F74 80C5F617 7480C7F6 16751C0A 0608C508 .é....u.-ú.t.-é.t..«..u..Øu.Š..è 0000E0
FF0025E8 09731999 FF811C74 C20BC30B C50BC78B 1C141E89 1C121689 20C98010 ..è .........ú.é.ú.ôt.....ß.ÒX.. 000100
AB96AB95 AB93AB92 1C16BFF7 8B56F6EB 002AE848 0678FF0B 00408BF1 EB1C0A0E ...$þ¡ə...x.HÒ*.Š-V.%e...¨.¨.¨.¨ 000120
D5D1D3D1 E2D1F813 58E81358 D81358D0 03000BE8 000EE8C2 8B535557 C35EAB92 .¨^úAUS.óò..Ò...ÀX.ÀX.ÒX.%íãíÆíí 000140
027E093C 4572302C 4A74004E E8C34E46 0175283C 0674203C 0874005E E8C307D1 ÌøúÒ^.t.<-t.<+u.FNÚÒN.tJ,0rE<.-. 000160
0E7410C5 F6267709 3C2A7230 2C20742E 3C337400 37E81DEB 397D1C0C 063A072C ,.:...)9Š.Ò7.t3<.t ,0r*<.w&-é.t. 000180
EB10CD80 1C0606FF 097510C5 F6F4EB20 CD80C3E4 321C0806 FF08CD80 1C0A0EFF .....ë.....2ôü.ë Š¶-é.u......ë.Š 0001A0
003CE674 0A3CEA74 093CEE74 203C1074 001BFE3E 80AC2373 1C043638 C3F94EC9 èN*ù;6..s#¨.>±...t.< tŸ<.tô<.tÌ<. 0001C0
C20BC10B C50BF88B AD95AD91 AD92AD57 C3C032C3 5F240277 7A3C0672 613CE274 tã<ar.<zw.$_ú2àúAÙ.Ù.Ù.Ù.%.é.è.ô 0001E0
```

Dump of file SATURN:[PCCOMMON.DUMP.DLL]DA-IMPRT.DLL;1 on 18-APR-1990 10:39:02.20
File ID (459,7,0) End of file block 93 / Allocated 96

Virtual block number 73 (00000049), 512 (0200) bytes

```
75CBFED7 D0D001D7 D1D5D101 D1E2D100 05B8DFD1 E8D1E7D1 3E7803FE 05AD4974 tÌÙ.±.x>ìÒìÒìÒÉ..ìãìììììæìÀÂæ±ùu 000000
7FF0300E 74FFF0A9 000780C6 13FE13EE 13CE13F5 8001FA81 F633D30A D9224 3F0 ÞC"Ì.Æ3-.ª..%.ö.Ÿ.±.6.ø.`Þ.t.=Þ. 000020
04758902 6D890089 5FF788F8 8BE888C8 8BD888C0 33011C20 0E800FE8 000780F5 %.ø.Š... ..3è.Ä.à.Ò.%.%_...m..u. 000040
33057540 1C22A1C8 5152E388 05721C26 1E3B0872 DB2BDC8B 5A59C3FF 0A064589 .E...úYZ.Ê+Ãr.;.&.r..DRÕúÀ".@u.3 000060
335B9A52 16501653 C4885087 1C3BA780 D4885200 02881C22 2EFF5152 F416E9C0 àÕ.¶RQ..".E..R.Å.Ì;.ñP.áS.P.R.(3 000080
980E885A D4794B1C 388F0808 81067500 02300774 00013040 81127558 C0080000 ...áXu.Ÿə=..t.=..u.Ÿ...;.KyåZ... 0000A0
961EFF00 03B8C28C 1E9E06C4 F44AE903 731E961E FF0B33C2 8C1E9A06 C41EE31E .D.á...ó3Ù....s.ÕJ¶á....óE..... 0000C0
57680E01 6A0B741E A6301EA2 B80073E8 1E94BF1E 90BE007C E81EA6BF 1EA6BE1E ./Ì.«Ì.Ò|./..«..Òs.¡Å.=Ì.t.j..hW 0000E0
00003052 9A006A00 6A036A00 51E81EA6 BF1EA2BE 088E317A B8C30000 FFFF9A3D =.....û¡±1.Å/Å.«Ì.ÒQ.j.j.j..R=.. 000100
1EA6BF1E A6BEEC8B 5503E800 31E81EA6 BF1EA2BE 003AE82A 328F2A32 BEEC8B55 U.$/2*«2*Ò:./Å.«Ì.Ò1.Š.U.$/Ì.«Ì. 000120
02BB07E3 1E980E8B 0000FFFF 9A500646 8A50C033 001AE81E A6BF1EA6 BE0023E8 Ò#./Ì.«Ì.Ò..3àP.F.P.........D.E. 000140
56570000 14C800C3 EEEB1DFF F2740245 0B058B04 EF830E73 F73BC31E 961EFF00 .....û;%s..ÿ....E.t·..ŠŸú.à...WV 000160
6AF85689 F64689F2 5689F046 89C02B05 C8168800 F0E90375 05C83639 FF2BF62B +-+.96à.u.ÒÞ...à.+à.Fł· V·.F-.V%j 000180
BCE90376 7FFFFE81 461974C0 080AC483 3E3E41DE 9A090268 1EF676FF FB76FF0C ..V%.v-.h@..BA>>.á..ât.Ŝ.±...v.ÒŸ 0001A0
26F65E8B F475003F 8026F646 FFF65EC4 0CEB47EA 75003F80 26F646FF F65EC400 .á^-.F-&.?.uöGŠ.á^-.F-&.?.u¶.^-& 0001C0
833E8336 119A56EE 5689EC46 8904C483 3E404000 9A046A50 014580BA 75003F80 .?.uø.E.Pj..ÀəM>.á..F$.VŸV..6.>. 0001E0
```

Dump of file SATURN:[PCCOMMON.DUMP.DLL]DA-IMPRT.DLL;1 on 18-APR-1990 10:39:02.20
File ID (459,7,0) End of file block 93 / Allocated 96

Virtual block number 74 (0000004A), 512 (0200) bytes

```
1E41A3EE 5688EC46 886674C2 0BFC4688 6D74EE46 0BEC4688 FE5689FC 468902C4 á..F=.V±.F$.FŸtm.F=.ôtf.F$.VŸÊA. 000000
8BEC5EC4 2C74C008 0AC48337 D841DE9A 0902681E F076FFF2 76FF0C6A 1E431689 ..C.j..v·.vÞ.h@..BAU7.á..ât,á^$. 000020
26FC46FF FC5EC407 8A26F046 FFF05EC4 04EC4683 02578926 078926FE 5688FC46 F=.V±&..&.W..F$.á^Þ.FÞ&..á^=.F=& 000040
C95F5EA7 75003F80 26F05EC4 F475003F 8026F046 FFF05EC4 E8EB0E74 C00A0788 ...ât.$0á^Þ.FÞ&.7.u¶á^Þ&.7.uÌ^_è 000060
53060E74 830A47F6 26FA5EC4 1CEBF62B FC5E8CFA 468909E0 88560000 06C890C8 ù.à...V¡Å..F*.^=+-Š.á^*&-G..t.¯S 000080
C95EC688 D876FA46 391BD016 881BCEA1 0CFA4683 46017440 04C4833D FE0DF29A ,·.±=.á.@t.F.F*.Àö...Å.9F*vÅ.ó^è 0000A0
75003F83 1E4EBB57 56EC8B55 CB5DE58B 01FE4F80 04740B08 065E8BEC 8B5590CB ù.U.á.^..Ùt..O±..Ì]úU.$VWEN..?.u 0000C0
C6830001 04C7961E 50A31E4E A3FE2440 24E899C0 33057501 76E80005 88071E29 )..¡..Òv.u.3à.$$ə$±ÊN.ÊP..ú....ó 0000E0
FA744100 D0E9C85D E5885E5F 0009E8C0 8ED88C06 4E881E54 3689FFFE FE44C704 .úD±±..óT..N..Ä.àÒ.._^.Ì]úÒÅ.At* 000100
7401A8AD F0030088 1573C13B 48437401 A8FE88AD FC02778B F273EEF9 83FEE180 .Ä±.*Ÿs·.w.=Ù.±¨.tCH;ês..Å.ÞÙ´.t 000120
FEF90305 E8058948 C128FE4C 89F9030C 74FE88E6 EBFE4489 F78B0002 05C20335 5.ô....%.D±ŠÌ.±t..*.L±+êH..Š..*± 000140
74FFFE3D 021E6006 C626C302 7F891E5C 1E8C2605 74D13830 5889DA8C C68BFE4C L±.6.Ò¿X=;Ìt.&..\....ú&6.'..=±.t 000160
88000205 C203E27· 01A8ADF0 03D0888C 73C13848 FE88F274 01A8ADF0 03FE8825 X.±.ÞÙ´.t·.±H;ês¥.Å.ÞÙ´.tâ.ô.... 000180
74C73B3F B7BFD88C 12741E60 0EFE2615 E8D88E04 74C00808 4788E6EB FE4489F7 %.D±ŠÌ.G..ât..ÅŠ.&±.'.t..Äeñ?;út 0001A0
0D74005F E8984040 01240D74 C63B0068 E8C03306 778888E8 37881E58 1E8E2605 .&..X..7ŠE.w.3àÒk.;ót.$.əə.Ò_.t. 0001C0
33024789 07881E5C A3260474 C138400B 89D88C98 EB4E4E96 0574001D E8FE4DFE ±M±Ò..t..NNŠ..Ä¿.ə;èt.&È\....¯G.3 0001E0
```

Dump of file SATURN:[PCCOMMON.DUMP.DLL]DA-IMPRT.DLL;1 on 18-APR-1990 10:39:02.20
File ID (459,7,0)   End of file block 93 / Allocated 96

Virtual block number 75 (0000004B), 512 (0200) bytes

```
C1B8F575 EAD10476 1E5E163B 267FFFBA 414149C8 2B037401 A8FE4588 51C379C0 å.ùQ.E±´.t.•àIAAa..&;.^.v.Iõu%.è 000000
E85152C3 59C033E5 75EAD1D2 F7087500 0CE8C62B C22302F7 0072C203 1572C603 .ór..ór.%@#ô+öÒ..u.%@iõu|3àYúRQò 000020
53C35A59 58FE5589 4AD72BD6 8B067789 FFFEFE44 C7F203F0 8BFE8B57 18740010 ..t.W.±.Þ.·úD±±..w..ø•øJ.U±XYZùS 000040
C3D20B02 745B5A1F FFFA830B C4833EF3 41289A1F 06500001 B8505252 1E023350 P3@.RRP|..P...(Aµ>.ó..•..Z[t..@ù 000060
0674FFFF C2F7FA56 89F84689 40FD0482 9A0676FF 006A0876 FF006A56 00000AC8 à...Vj..v.j..v....»ã.F%.V•%ö..t. 000080
FF006A56 1274000B FE5689FC 468902C4 83411636 119A56F8 7688902F E899C02B +à.$/..v%V..6.A.á..F=.V±.At.Vj.. 0000A0
7E830657 56EC8B55 90C8C95E FE568BFC 46889007 E808C483 40C03888 9A50FE76 v±P..8àã.ó.$...F•.V±^èù.U.$VW..~ 0000C0
F7381174 48090036 8B4CEB27 720057E8 07754806 46880856 8805008F 3875000A ..uB¢Å..V..F.Hu.ÒW.r'$L.6Å.Ht.;% 0000E0
99FFFFB8 06750208 04730900 FE8104C6 8334735E 003EE856 0E468902 44880074 t..D..F.VÒ>.^s4.6..±Å.s..@u.|... 000100
8B090036 89025C89 1489E675 C085F95B 0000FFFF 9A50C033 501652C4 8B5021EB $IP.ÁR.P3àP.....[•.àul. .\..6Å.. 000120
2CEBF9F2 750900FE 8104C683 0C74024C 39F7880E 4E88C85D E58B5E5F 07C03303 Á3à._^.]]ù.N..%9L.t..6..±Å.u·•$, 000140
380E75C0 850000FF FF9A5153 137305CA 1E390675 F73BC18E D3882672 1C030A88 .Ò..r&.&.ê;%u.9.ò.s.SQ......àuB; 000160
F788067E C4D98827 E30E4E88 1E5657EC 885500C3 D1880487 9205CA16 890475F7 %u...ò.....Iù.U.$WV..N.D'.Iá-..% 000180
D1F74949 04740477 FF453A26 C933FF44 8AA6F30A 76C5FE88 C80309F7 AEF2C033 3à·Ù%).ù.±év.µI.D.3è&:E.w.t.II%i 0001A0
0A4628E8 D3EAD3FF FF890C5E 88085688 064688EC 885500C8 50E5885F 5E1FC188 .è.^_.I]ù.U.$.F..V..^.¿..&õ&$+F. 0001C0
05890AC3 830AC683 1675C43A 80802509 478A2E09 648A5653 0008CA5D E58B031B .&.I]ò..SV.d...G.X..:áu..6..ù.¿. 0001E0
```

Dump of file SATURN:[PCCOMMON.DUMP.DLL]DA-IMPRT.DLL;1 on 18-APR-1990 10:39:02.20
File ID (459,7,0)   End of file block 93 / Allocated 96

Virtual block number 76 (0000004C), 512 (0200) bytes

```
E8D10005 B9FF33AD 93AD92AD 95AD56C3 5B5EF3E1 073B2E04 8802E883 02EE8300 ..Y..$....;.Åµ^(ùVÙ.Ù.Ù.Ù3.¿..Iò 000000
04548902 6C893C89 5E03FE20 DBD1F500 0130D001 E301F4E2 DFD1D001 DAD1DBD1 IÙIÒIIIÒà¶IÒIÅ=..%IÙ-±.^.<.[..T. 000020
04C61E6E 8EFFFDCC CCCCCCCC CCCCCD00 00FFFFFF FFFFFFFC 66C30844 89065C89 .\..D.ùf=........èèèèèèè».ƒn.ó. 000040
064C8B5E A5F30004 B9571E62 8FFCC08E 088C06C3 07584000 8BC03330 0144C601 .6O.03à.Àã(.ù..Å.â••b.W¿..µÊ^.L. 000060
8B7480A8 AC1E69BE FF33FF7B E8532083 0279C908 06747FF0 C1F72083 7F076480 .d..• ¥èÞ.t..èY.•-SÒ(.3.ƒi.¯´.t£ 000080
E981FA13 C803E7F6 9AB00713 C803E4F6 4D8091E2 F74D108A C8883FFE 05ADF88A .¥Ù.±7.àα.M%ã. M-ö.à.■¯.-Ö.à.•.Õ 0000A0
0080E842 A1885747 09725FFF 13E84297 880204E8 1E628EDF F7571343 DF8112F4 ¶..ÒC.WÁÒ/b.Ò..£.BÒ.. r.GWEÀBÒ.. 0000C0
F4E20CD0 DED1D001 DAD1E8D1 0CE3C033 F78809F7 91AD93AD 92AD95AD 97AD575F _WÙ.Ù.Ù.Ù.Ù.%).%3àD.I$IÒIIIàÀÉà¶ 0000E0
D1D601E4 00505655 525351C0 32001089 1E6F8F09 130113E9 13039AD6 8156C480 ¯ÁV.■...Ö.I.I¢o.¿..2àOSRUVPÀÒI■I 000100
59011359 E91359F1 1359E502 59000003 D1D20105 D1D601E4 00000003 D1D20105 IIÒIÆÀÀÀÒI■IIIÒIÆÀÀY.IY.ÞY.ÒY.IY 000120
C183FCAE F3FD3080 494F80E2 59AA3004 D0000301 D201D501 D601E400 00140913 .\..ÀÒI■IIIÒIÆÀÀ.O¯YàSOI¯O»µÙ•.è 000140
08440108 47882EAB F3C033FD 88000889 1E80B0C3 07585A00 01880C88 1E6EBE12 ./n...|..Z[.ù$..¿...»3àµ¨..G..D. 000160
F10308C3 830F2809 285653C8 88980404 0BF6C42A C42AE022 C7280004 8800078F ¢..|..+ù"Å"á"á-Å....àSV+)+Ò.ù..Þ 000180
5EE6E202 C38302EE 83000456 833E0256 113E0046 013E27F7 2E048806 C683F728 •%.ó....%'>.F.>.V.>.V...Y..ù.àI^ 0001A0
93AD91AD 97AD010A 92ADCD0A C808ADC8 08AD91AD F5870EED 838C754F 02C58358 [.é.Ou¥.Ù..%Ù.Ù.àÙ.à.èÙ..IÙ.Ù.Ù. 0001C0
01FA81ED 330508EF 23000180 00010301 D1D107D1 E201084C FF0078C0 0BF588AD Ù.%.áx..L.IàI■IIIÆIÅ$..#y.I3Ù.•. 0001E0
```

Dump of file SATURN:[PCCOMMON.DUMP.DLL]DA-IMPRT.DLL;1 on 18-APR-1990 10:39:02.20
File ID (459,7,0)   End of file block 93 / Allocated 96

Virtual block number 77 (0000004D), 512 (0200) bytes

```
00C30644 89045C89 024C893C 89C508CD D1086C01 05D1C513 D013CD13 FD13F580 .%.».ë.I.éII.l.Iè.é.<.L..\..D.ù. 000000
00000000 0E9C4000 00000000 000007C8 00000000 00000000 04A00000 00000000 ................à........ã...... 000020
49FFCFA6 05006890 C5ADA828 70859E00 368E18C9 8F040000 00001B8E 8C200000 .. ¥/......¢è..6..çp+¨Ùé.k.IIù.I 000040
CCCCCCCC CCCCCD03 53AA7EEB FB9DF90E 8E01AA93 0A47C980 E98CE000 D5C2781F .xòI.Å.Ò.èGα.¨..8•.«$-¨S.ëèèèèèè 000060
E6A8CC77 118461CE FDFFF301 B71758E2 19652CFF FAA3D70A 3070A3D7 0AFFFDCC à»..■£p=.■£•.,e.ãX.ñIµ.»öa..wä¨| 000080
A1FF2CA8 7FEA27A5 39E9A5FF 96CFB11E AD453994 8AFFCBE6 95948EC4 4DE15BFF .[ÅM6ƒ..Iù.o.9EÙ.¥Ù..ÉÒ9E'ð.¨..Å 0000A0
83DFF744 C9880579 FF08446F 8BFCAEC0 31432563 7A193AFE 57D00046 7C648CE4 Ò¥d|FÅIW±:.zc%C1àÙ•£oD..y.£èÒ%Ò. 0000C0
36000A33 D8020300 13C3ECE8 585FFE7B E85753F5 73EFD100 74FF080A C3830AE8 $..ù...t.Iÿs%SWÒ(±_[$$ù....Ù3..6 0000E0
00000640 400002(.) 07000230 6C010300 05000230 A4010300 00000440 E2000202 ...ãã......Ê=......I•......ãã... 000100
88000238 8801050. 87000242 27010500 26000241 C7010300 22000241 7C010300 ...|A..".. .ùA..&...'B......£8... 000120
48000234 32010300 44000233 FE010300 3C00021B 40010300 3A000234 9A010300 ....4..:...ã...<...±3..D...24..K 000140
1C000A33 19020300 5C000230 C1010300 58000230 D4010300 4D00023C EE010300 ...¥<..M...àO..[...èO..\....3... 000160
00000000 00000000 00000000 00000002 20000A39 48020302 24000A33 42020302 ...B3..$...H9..·................ 000180
6F432020 20797261 7262694C 20656D69 54206E75 52205340 00000000 00000000 ........MS Run-Time Library · Co 0001A0
70726F43 2074666F 736F7263 694D202C 38383931 20296328 20746867 69727970 pyright (c) 1988, Microsoft Corp 0001C0
6E61206F 746E6920 6465776F 6C6C6120 796C6E6F 20736920 74726F70 60490011 ..Import is only allowed into an 0001E0
```

Dump of file SATURN:[PCCOMMON.DUMP.DLL]DA-IMPRT.DLL;1 on 18-APR-1990 10:39:02.20
File ID (459,7,0)   End of file block 93 / Allocated 96

Virtual block number 78 (0000004E), 512 (0200) bytes

```
 00720072 78762E00 2E007472 6F706D49 0072006E 67697365 64207974 70606520  empty design.r.Import....vxr.r. 000000
 612A2A00 2A2A7974 69746E65 2A2A0000 0020202E 726F7272 65207472 6F706D49 Import error.  ...**entity**.**a 000020
 65682A2A 002A2A70 69687370 2A2A002A 2A746573 2D702A2A 002A2A62 69727474 ttrib**.**p-set**.**pship**.**ke 000040
 642A2A00 2A2..7465 73702D79 65682A2A 002A2A74 74612D79 65682A2A 002A2A79 y**.**key-att**.**key-pset**.**d 000060
 642A2A00 2A2A736D 796E6F6E 79732A2A 002A2A6E 6961606F 642A2A00 2A2A6D69 im**.**domain**.**synonyms**.**d 000080
 2A6A626F 2D706160 2A2A002A 2A6A626F 2065746F 6E2A2A00 2A2A7365 746F6E61 anotes**.**note-obj**.**map-obj* 0000A0
 72747461 2A2A002A 2A747365 6E727474 612A2A00 2A2A786F 62746E65 2A2A002A *.**entbox**.**attrnest**.**attr 0000C0
 00320031 002B002A 00290028 0020001B 001A0019 00180017 0016002A 2A747865 ext**............. .(.).*.+.1.2. 0000E0
 41004547 414D4900 4E41454C 4F4F4200 4C414552 00524547 45544E49 00000033 3...INTEGER.REAL.BOOLEAN.IMAGE.A 000100
 52454055 4E414850 4C410043 49544542 4148504C 41004F45 44495600 4F494455 UDIO.VIDEO.ALPHABETIC.ALPHANUMER 000120
 45520052 45474554 4E490043 4952454D 554E4148 504C4100 5241454C 43004349 IC.CLEAR.ALPHANUMERIC.INTEGER.RE 000140
 65006E6F 69736E65 6D696400 6C65646F 6D2D6E6F 69746160 726F666E 69004C41 AL.information-model.dimension.e 000160
 00746573 2D706968 7372656E 74726170 00657475 62697274 74610079 7469746E ntity.attribute.partnership-set. 000180
 00000000 005C005C 90007965 68007069 68737265 6E747261 70006E69 61606F64 domain.partnership.key..\.\..... 0001A0
 23402046 23422048 23652050 022E2A98 022A2988 02262ABC 022229FE ʿFFF2F6E n/..±)".¥*&..)*..*..P e#H B#F ə# 0001C0
 00296C6C 756E2800 296C6C75 6E280000 1FF41FA1 25CD2236 25CF2238 ¿ 6C2182 ÿi(%8"u%6"e%À.¶...(null).(null). 0001E0
```

Dump of file SATURN:[PCCOMMON.DUMP.DLL]DA-IMPRT.DLL;1 on 18-APR-1990 10:39:02.20
File ID (459,7,0)   End of file block 93 / Allocated 96

Virtual block number 79 (0000004F), 512 (0200) bytes

```
 01010000 00000274 316E0270 316E026C 316E0268 316E1E92 316E0000 23202028 +- #..n1..n1h.n1l.n1p.n1t....... 000000
 20202020 20202020 20202020 20202020 20282828 28282020 20202020 20202000 .          (((((                000020
 10101010 10848484 84848484 84848410 10101010 10101010 10101010 10104820  H............................... 000040
 10101010 01010101 01010101 01010101 01010101 01010101 81818181 81811010 ................................ 000060
 10101010 02020202 02020202 02020202 02020202 02020202 82828282 82821010 ................................ 000080
 00000000 00000000 00000000 00000000 00000000 00000000 00000000 00000020  ............................... 0000A0
 00000000 00000000 00000000 00000000 00000000 00000000 00000000 00000000 ................................ 0000C0
 00000000 00000000 00000000 00000000 00000000 00000000 00000000 00000000 ................................ 0000E0
 00000000 00000000 00000000 00000000 00000000 00000000 00000000 00000000 ................................ 000100
 00000000 00000000 00000000 80C0E0F0 F8FCFEFF 00000000 78783136 40050000 ...M61xx.....±=½ÞÀ@............. 000120
 00000000 00000000 00000000 00000000 00000000 00000000 00000000 00000000 ................................ 000140
 00000000 00000000 00000000 00000000 00000000 00000000 00000000 00000000 ................................ 000160
 00000000 00000000 00000000 00000000 00000000 00000000 00000000 00000000 ................................ 000180
 00000000 00000000 00000000 00000000 00000000 00000000 00000000 00000000 ................................ 0001A0
 00000000 00303030 28650000 00000000 00000000 00000000 00000000 00000000 ......................e+000..... 0001C0
 00000000 00000000 00000000 00000000 00000000 00000000 00000000 00000000 ................................ 0001E0
```

Dump of file SATURN:[PCCOMMON.DUMP.DLL]DA-IMPRT.DLL;1 on 18-APR-1990 10:39:02.20
File ID (459,7,0)   End of file block 93 / Allocated 96

Virtual block number 80 (00000050), 512 (0200) bytes

```
 00000000 00000000 00000000 00000000 00000000 00000000 00000000 00000000 ................................ 000000
 00000000 00000000 00000000 00000000 00000000 00000000 00000000 00000000 ................................ 000020
 00000000 00000000 00000000 00000000 00000000 00000000 00000000 00000000 ................................ 000040
 00000000 00000000 00000000 00000000 00000000 00000000 00000000 00000000 ................................ 000060
 00000000 00000000 00000000 00000000 00000000 00000000 00000000 00000000 ................................ 000080
 00000000 00000000 00000000 00000000 00000000 00000000 00000000 00000000 ................................ 0000A0
 00000000 00000000 00000000 00000000 00000000 00000000 00000000 00000000 ................................ 0000C0
 00000000 00000000 00000000 00000000 00000000 00000000 00000000 00000000 ................................ 0000E0
 00000000 00000000 00000000 00000000 00000000 00000000 00000000 00000000 ................................ 000100
 00000000 00000000 00000000 00000000 00000000 00000000 00000000 00000000 ................................ 000120
 00000000 00000000 00000000 00000000 00080000 00000000 00000000 00000000 ................................ 000140
 00000000 00000000 00000000 1EB22A40 30B72A40 2A400000 00000454 00000000 ....T.....ə*ə*.=ə*ÿ............. 000160
 00000000 00000000 00000000 00000000 00000000 00000000 00000000 00000000 ................................ 000180
 00000000 00000000 00000000 00000000 00000000 00000000 00000000 00000000 ................................ 0001A0
 00000000 00000000 00000000 00000000 00000000 00000000 00000000 00000000 ................................ 0001C0
 00000000 00000000 00000000 00000000 00000000 00000000 00000000 00000000 ................................ 0001E0
```

```
Dump of file SATURN:[PCCOMMON.DUMP.DLL]DA-IMPRT.DLL;1 on 18-APR-1990 10:39:02.20
File ID (459,7,0)    End of file block 93 / Allocated 96

Virtual block number 81 (00000051), 512 (0200) bytes

00000000 00000000 00000000 00000000 00000000 00000000 00000000 00000000 ................................ 000000
00000000 00000000 00000000 00000000 00000000 00000000 00000000 00000000 ................................ 000020
00000000 00000000 00000000 00000000 00000000 00000000 00000000 00000000 ................................ 000040
00000000 00000000 00000000 00000000 00000000 00000000 00000000 00000000 ................................ 000060
00000000 00000000 00000000 00000000 00000000 00000000 00000000 00000000 ................................ 000080
00000000 00000000 00000000 00000000 00000000 00000000 00000000 00000000 ................................ 0000A0
00000000 00000000 00000000 00000000 00000000 00000000 00000000 00000000 ................................ 0000C0
00000000 00000000 00000000 00000000 00000000 00000000 00000000 00000000 ................................ 0000E0
00000000 00000000 00000000 00000000 00000000 00000000 00000000 00000000 ................................ 000100
00000000 00000000 00000000 00000000 00000000 00000000 00000000 00000000 ................................ 000120
00000000 00000000 00000000 00000000 00000000 00000000 00000000 00000000 ................................ 000140
00000000 00000000 00000000 00000000 00000000 00000000 00000000 00000000 ................................ 000160
00000000 00000000 00000000 00000000 00000000 00000000 00000000 00000000 ................................ 000180
00000000 00000000 00000000 00000000 00000000 00000000 00000000 00000000 ................................ 0001A0
00000000 00000000 00000000 00000000 00000000 00000000 00000000 00000000 ................................ 0001C0
00000000 00000000 00000000 00000000 00000000 00000000 00000000 00000000 ................................ 0001E0

Dump of file SATURN:[PCCOMMON.DUMP.DLL]DA-IMPRT.DLL;1 on 18-APR-1990 10:39:02.20
File ID (459,7,0)    End of file block 93 / Allocated 96

Virtual block number 82 (00000052), 512 (0200) bytes

00000000 00000000 00000000 00000000 00000000 00000000 00000000 00000000 ................................ 000000
00000000 00000000 00000000 00000000 00000000 00000000 00000000 00000000 ................................ 000020
00000000 00000000 00000000 00000000 00000000 00000000 00000000 00000000 ................................ 000040
00000000 00000000 00000000 00000000 00000000 00000000 00000000 00000000 ................................ 000060
00000000 00000000 00000000 00000000 00000000 00000000 00000000 00000000 ................................ 000080
00000000 00000000 00000000 00000000 00000000 00000000 00000000 00000000 ................................ 0000A0
00000000 00000000 00000000 00000000 00000000 00000000 00000000 00000000 ................................ 0000C0
00000000 00000000 00000000 00000000 00000000 00000000 00000000 00000000 ................................ 0000E0
00000000 00000000 00000000 00000000 00000000 00000000 00000000 00000000 ................................ 000100
00000000 00000000 00000000 00000000 00000000 00000000 00000000 00000000 ................................ 000120
00000000 00000000 00000000 00000000 00000000 00000000 00000000 00000000 ................................ 000140
003D4F46 4E495F45 4C49465F 435F05D0 00000000 00000000 00000000 00000000 ................Ð._C_FILE_INFO=. 000160
00000000 00000000 01020000 00000000 00000000 00011EA8 00040000 09E80004 ..è.....¨....................... 000180
00000000 00000000 00000000 00000000 00000000 00000000 00000000 02020000 ................................ 0001A0
00000000 00000000 00000000 00000000 00000000 00000000 00000000 00000000 ................................ 0001C0
00000000 00000000 00000000 00000000 00000000 00000000 00000000 00000000 ................................ 0001E0

Dump of file SATURN:[PCCOMMON.DUMP.DLL]DA-IMPRT.DLL;1 on 18-APR-1990 10:39:02.20
File ID (459,7,0)    End of file block 93 / Allocated 96

Virtual block number 83 (00000053), 512 (0200) bytes

00000000 00000000 00000000 00000000 00000000 00000000 00000000 00000000 ................................ 000000
00000000 00000000 00000000 00000000 00000000 00000000 00000000 00000000 ................................ 000020
00000000 00000000 00000000 00000000 00000000 00000000 00000000 00000000 ................................ 000040
00000000 00000000 00000000 00000000 00000000 00000000 00000000 00000000 ................................ 000060
00000000 00000000 00000000 00000000 00000000 00000000 00000000 00000000 ................................ 000080
00000000 00000000 00000000 00000000 00000000 00000000 00000000 00000000 ................................ 0000A0
00000000 00000000 00000000 00000000 00000000 00000000 00000000 00000000 ................................ 0000C0
00000000 00000000 00000000 00000000 00000000 00000000 00000000 00000000 ................................ 0000E0
00000000 00000000 00000000 00000000 00000000 00000000 00000000 00000000 ................................ 000100
00000000 00000000 00000000 00000000 00000000 00000000 00000000 00000000 ................................ 000120
00000000 00000000 00000000 00000000 00000000 00000000 00000000 00000000 ................................ 000140
00000000 00000000 00000000 00000000 00000000 00000000 00000000 00000000 ................................ 000160
00000000 00000000 00000000 00000000 00000000 00000000 00000000 00000000 ................................ 000180
00000000 00000000 00000000 00000000 00000000 00000000 00000000 00000000 ................................ 0001A0
00000000 00000000 00000000 00000000 00000000 00000000 00000000 00000000 ................................ 0001C0
00000000 00000000 00000000 00000000 00000000 00000000 00000000 00000000 ................................ 0001E0
```

```
Dump of file SATURN:[PCCOMMON.DUMP.DLL]DA-IMPRT.DLL;1 on 18-APR-1990 10:39:02.20
File ID (459,7,0)   End of file block 93 / Allocated 96

Virtual block number 84 (00000054), 512 (0200) bytes

00000000 00000000 00000000 00000000 00000000 00000000 00000000 00000000 ................................ 000000
00000000 00000000 00000000 00000000 00000000 00000000 00000000 00000000 ................................ 000020
00000000 00000000 00000000 00000000 00000000 00000000 00000000 00000000 ................................ 000040
00000000 00000000 00000000 00000000 00000000 00000000 00000000 00000000 ................................ 000060
00000000 00000000 00000000 00000000 00000000 00000000 00000000 00000000 ................................ 000080
00000000 00000000 00000000 00000000 00000000 00000000 00000000 00000000 ................................ 0000A0
00000000 00000000 00000000 00000000 00000000 00000000 00000000 00000000 ................................ 0000C0
00000000 00000000 00000000 00000000 00000000 00000000 00000000 00000000 ................................ 0000E0
00000000 00000000 00000000 00000000 00000000 00000000 00000000 00000000 ................................ 000100
00000000 00000000 00000000 00000000 00000000 00000000 00000000 00000000 ................................ 000120
00000000 00000000 00000000 00000000 00000000 00000000 00000000 00000000 ................................ 000140
00000000 00000000 00000000 00000000 00000000 00000000 00000000 00000000 ................................ 000160
00000000 00000000 00000000 00000000 00000000 00000000 00000000 00000000 ................................ 000180
00000000 00000000 00000000 00000000 00000000 00000000 00000000 00000000 ................................ 0001A0
00000000 00000000 00000000 00000000 00000000 00000000 00000000 00000000 ................................ 0001C0
00000000 00000000 00000000 00000000 00000000 00000000 00000000 00000000 ................................ 0001E0

Dump of file SATURN:[PCCOMMON.DUMP.DLL]DA-IMPRT.DLL;1 on 18-APR-1990 10:39:02.20
File ID (459,7,0)   End of file block 93 / Allocated 96

Virtual block number 85 (00000055), 512 (0200) bytes

00000000 00000000 00000000 00000000 00000000 00000000 00000000 00000000 ................................ 000000
00000000 00000000 00000000 00000000 00000000 00000000 00000000 00000000 ................................ 000020
00000000 00000000 00000000 00000000 00000000 00000000 00000000 00000000 ................................ 000040
00000000 00000000 00000000 00000000 00000000 00000000 00000000 00000000 ................................ 000060
00000000 00000000 00000000 00000000 00000000 00000000 00000000 00000000 ................................ 000080
00000000 00000000 00000000 00000000 00000000 00000000 00000000 00000000 ................................ 0000A0
00000000 00000000 00000000 00000000 00000000 00000000 00000000 00000000 ................................ 0000C0
00000000 00000000 00000000 00000000 00000000 00000000 00000000 00000000 ................................ 0000E0
00000000 00000000 00000000 00000000 00000000 00000000 00000000 00000000 ................................ 000100
00000000 00000000 00000000 00000000 00000000 00000000 00000000 00000000 ................................ 000120
00000000 00000000 00000000 00000000 00000000 00000000 00000000 00000000 ................................ 000140
00000000 00000000 00000000 00000000 00000000 00000000 00000000 00000000 ................................ 000160
00000000 00000000 00000000 00000000 00000000 00000000 00000000 00000000 ................................ 000180
00000000 00000000 00000000 00000000 00000000 00000000 00000000 00000000 ................................ 0001A0
00000000 00000000 00000000 00000000 00000000 00000000 00000000 00000000 ................................ 0001C0
00000000 00000000 00000000 00000000 00000000 00000000 00000000 00000000 ................................ 0001E0

Dump of file SATURN:[PCCOMMON.DUMP.DLL]DA-IMPRT.DLL;1 on 18-APR-1990 10:39:02.20
File ID (459,7,0)   End of file block 93 / Allocated 96

Virtual block number 86 (00000056), 512 (0200) bytes

00000000 00000000 00000000 00000000 00000000 00000000 00000000 00000000 ................................ 000000
00000000 00000000 00000000 00000000 00000000 00000000 00000000 00000000 ................................ 000020
00000000 00000000 00000000 00000000 00000000 00000000 00000000 00000000 ................................ 000040
00000000 00000000 00000000 00000000 00000000 00000000 00000000 00000000 ................................ 000060
00000000 00000000 00000000 00000000 00000000 00000000 00000000 00000000 ................................ 000080
00000000 00000000 00000000 00000000 00000000 00000000 00000000 00000000 ................................ 0000A0
00000000 00000000 00000000 00000000 00000000 00000000 00000000 00000000 ................................ 0000C0
00000000 00000000 00000000 00000000 00000000 00000000 00000000 00000000 ................................ 0000E0
00000000 00000000 00000000 00000000 00000000 00000000 00000000 00000000 ................................ 000100
00000000 00000000 00000000 00000000 00000000 00000000 00000000 00000000 ................................ 000120
00000000 00000000 00000000 00000000 00000000 00000000 00000000 00000000 ................................ 000140
00000000 00000000 00000000 00000000 00000000 00000000 00000000 00000000 ................................ 000160
00000000 00000000 00000000 00000000 00000000 00000000 00000000 00000000 ................................ 000180
00000000 00000000 00000000 00000000 00000000 00000000 00000000 00000000 ................................ 0001A0
00000000 00000000 00000000 00000000 00000000 00000000 00000000 00000000 ................................ 0001C0
00000000 00000000 00000000 00000000 00000000 00000000 00000000 00000000 ................................ 0001E0
```

```
Dump of file SATURN:[PCCOMMON.DUMP.DLL]DA-IMPRT.DLL;1 on 18-APR-1990 10:39:02.20
File ID (459,7,0)   End of file block 93 / Allocated 96

Virtual block number 87 (00000057), 512 (0200) bytes

00000000 00000000 00000000 00000000 00000000 00000000 00000000 00000000 ................................ 000000
00000000 00000000 00000000 00000000 00000000 00000000 00000000 00000000 ................................ 000020
00000000 00000000 00000000 00000000 00000000 00000000 00000000 00000000 ................................ 000040
00000000 00000000 00000000 00000000 00000000 00000000 00000000 00000000 ................................ 000060
00000000 00000000 00000000 00000000 00000000 00000000 00000000 00000000 ................................ 000080
00000000 00000000 00000000 00000000 00000000 00000000 00000000 00000000 ................................ 0000A0
00000000 00000000 00000000 00000000 00000000 00000000 00000000 00000000 ................................ 0000C0
00000000 00000000 00000000 00000000 00000000 00000000 00000000 00000000 ................................ 0000E0
00000000 00000000 00000000 00000000 00000000 00000000 00000000 00000000 ................................ 000100
00000000 00000000 00000000 00000000 00000000 00000000 00000000 00000000 ................................ 000120
00000000 00000000 00000000 00000000 00000000 00000000 00000000 00000000 ................................ 000140
00000000 00000000 00000000 00000000 00000000 00000000 00000000 00000000 ................................ 000160
00000000 00000000 00000000 00000000 00000000 00000000 00000000 00000000 ................................ 000180
00000000 00000000 00000000 00000000 00000000 00000000 00000000 00000000 ................................ 0001A0
00000000 00000000 00000000 00000000 00000000 00000000 00000000 00000000 ................................ 0001C0
00000000 00000000 00000000 00000000 00000000 00000000 00000000 00000000 ................................ 0001E0

Dump of file SATURN:[PCCOMMON.DUMP.DLL]DA-IMPRT.DLL;1 on 18-APR-1990 10:39:02.20
File ID (459,7,0)   End of file block 93 / Allocated 96

Virtual block number 88 (00000058), 512 (0200) bytes

00000000 00000000 00000000 00000000 00000000 00000000 00000000 00000000 ................................ 000000
00000000 00000000 00000000 00000000 00000000 00000000 00000000 00000000 ................................ 000020
00000000 00000000 00000000 00000000 00000000 00000000 00000000 00000000 ................................ 000040
00000000 00000000 00000000 00000000 00000000 00000000 00000000 00000000 ................................ 000060
00000000 00000000 00000000 00000000 00000000 00000000 00000000 00000000 ................................ 000080
00000000 00000000 00000000 00000000 00000000 00000000 00000000 00000000 ................................ 0000A0
00000000 00000000 00000000 00000000 00000000 00000000 00000000 00000000 ................................ 0000C0
00000000 00000000 00000000 00000000 00000000 00000000 00000000 00000000 ................................ 0000E0
00000000 00000000 00000000 00000000 00000000 00000000 00000000 00000000 ................................ 000100
00000000 00000000 00000000 00000000 00000000 00000000 00000000 00000000 ................................ 000120
00000000 00000000 00000000 00000000 00000000 00000000 00000000 00000000 ................................ 000140
00000000 00000000 00000000 00000000 00000000 00000000 00000000 00000000 ................................ 000160
00000000 00000000 02000001 00000000 00000000 00000000 00000000 00000000 ................................ 000180
00000000 00000000 00000000 00000000 00000000 00000000 00000000 00000000 ................................ 0001A0
00000000 00000000 00000000 00000000 00000000 00000000 00000000 00000000 ................................ 0001C0
00000000 00000000 00000000 00000000 00000000 00000000 00000000 00000000 ................................ 0001E0

Dump of file SATURN:[PCCOMMON.DUMP.DLL]DA-IMPRT.DLL;1 on 18-APR-1990 10:39:02.20
File ID (459,7,0)   End of file block 93 / Allocated 96

Virtual block number 89 (00000059), 512 (0200) bytes

00000000 00000000 00000000 00000000 00000000 00000000 00000000 00000000 ................................ 000000
00000000 00000000 00000000 00000000 00000000 00000000 00000000 00000000 ................................ 000020
00000000 00000000 00000000 00000000 00000000 00000000 00000000 00000000 ................................ 000040
00000000 00000000 00000000 00000000 00000000 00000000 00000000 00000000 ................................ 000060
00000000 00000000 00000000 00000000 00000000 00000000 00000000 00000000 ................................ 000080
00000000 00000000 00000000 00000000 00000000 00000000 00000000 00000000 ................................ 0000A0
00000000 00000000 00000000 00000000 00000000 00000000 00000000 00000000 ................................ 0000C0
00000000 00000000 00000000 00000000 00000000 00000000 00000000 00000000 ................................ 0000E0
00000000 00000000 00000000 00000000 00000000 00000000 00000000 00000000 ................................ 000100
00000000 00000000 00000000 00000000 00000000 00000000 00000000 00000000 ................................ 000120
00000000 00000000 00000000 00000000 00000000 00000000 00000000 00000000 ................................ 000140
00000000 00000000 00000000 00000000 00000000 00000000 00000000 00000000 ................................ 000160
00000000 00000000 00000000 00000000 00000000 00000000 00000000 00000000 ................................ 000180
00000000 00000000 00000000 00000000 00000000 00000000 00000000 00000000 ................................ 0001A0
00000000 00000000 00000000 00000000 00000000 00000000 00000000 00000000 ................................ 0001C0
00000000 00000000 00000000 00000000 00000000 00000000 00000000 00000000 ................................ 0001E0
```

```
Dump of file SATURN:[PCCOMMON.DUMP.DLL]DA-IMPRT.DLL;1 on 18-APR-1990 10:39:02.20
File ID (459,7,0)   End of file block 93 / Allocated 96

Virtual block number 90 (0000005A), 512 (0200) bytes

00000000 00000000 00000000 00000000 00000000 00000000 00000000 00000000 ................................ 000000
00000000 00000000 00000000 00000000 00000000 00000000 00000000 00000000 ................................ 000020
00000000 00000000 00000000 00000000 00000000 00000000 00000000 00000000 ................................ 000040
00000000 00000000 00000000 00000000 00000000 00000000 00000000 00000000 ................................ 000060
00000000 00000000 00000000 00000000 00000000 00000000 00000000 00000000 ................................ 000080
00000000 00000000 00000000 00000000 00000000 00000000 00000000 00000000 ................................ 0000A0
00000000 00000000 00000000 00000000 00000000 00000000 00000000 00000000 ................................ 0000C0
00000000 00000000 00000000 00000000 00000000 00000000 00000000 00000000 ................................ 0000E0
00000000 00000000 00000000 00000000 00000000 00000000 00000000 00000000 ................................ 000100
00000000 00000000 00000000 00000000 00000000 00000000 00000000 00000000 ................................ 000120
00000000 00000000 00000000 00000000 00000000 00000000 00000000 00000000 ................................ 000140
00000000 00000000 00000000 00000000 00000000 00000000 00000000 00000000 ................................ 000160
00000000 00000000 00000000 00000000 00000000 00000000 00000000 00000000 ................................ 000180
00000000 00000000 00000000 00000000 00000000 00000000 00000000 00000000 ................................ 0001A0
00000000 00000000 00000000 00000000 00000000 00000000 00000000 00000000 ................................ 0001C0
00000000 00000000 00000000 00000000 00000000 00000000 00000000 00000000 ................................ 0001E0

Dump of file SATURN:[PCCOMMON.DUMP.DLL]DA-IMPRT.DLL;1 on 18-APR-1990 10:39:02.20
File ID (459,7,0)   End of file block 93 / Allocated 96

Virtual block number 91 (0000005B), 512 (0200) bytes

00000000 00000000 00000000 00000000 00000000 00000000 00000000 00000000 ................................ 000000
00000000 00000000 00000000 00000000 00000000 00000000 00000000 00000000 ................................ 000020
00000000 00000000 00000000 00000000 00000000 00000000 00000000 00000000 ................................ 000040
00000000 00000000 00000000 00000000 00000000 00000000 00000000 00000000 ................................ 000060
00000000 00000000 00000000 00000000 00000000 00000000 00000000 00000000 ................................ 000080
00000000 00000000 00000000 00000000 00000000 00000000 00000000 00000000 ................................ 0000A0
00000000 00000000 00000000 00000000 00000000 00000000 00000000 00000000 ................................ 0000C0
00000000 00000000 00000000 00000000 00000000 00000000 00000000 00000000 ................................ 0000E0
00000000 00000000 00000000 00000000 00000000 00000000 00000000 00000000 ................................ 000100
00000000 00000000 00000000 00000000 00000000 00000000 00000000 00000000 ................................ 000120
00000000 00000000 00000000 00000000 00000000 00000000 00000000 00000000 ................................ 000140
00000000 00000000 00000000 000005D2 15C80000 00000000 00000000 00000000 ..............à.@............... 000160
00000000 00000000 00000000 00000000 00000000 00000000 00000000 00000000 ................................ 000180
00000000 00000000 00000000 00000000 00000000 00000000 00000000 00000000 ................................ 0001A0
00008181 81010000 00010000 00000000 00000000 00000000 0200FFFF FFFF0000 ................................ 0001C0
00000000 00000000 00000000 00000000 00000000 00000000 00000000 00000000 ................................ 0001E0

Dump of file SATURN:[PCCOMMON.DUMP.DLL]DA-IMPRT.DLL;1 on 18-APR-1990 10:39:02.20
File ID (459,7,0)   End of file block 93 / Allocated 96

Virtual block number 92 (0000005C), 512 (0200) bytes

00000000 00000000 00000000 00000000 00000000 00000000 00000000 00000000 ................................ 000000
00000000 00000000 00000000 00000000 00000000 00000000 00000000 00000000 ................................ 000020
00000000 00000000 00000000 00000000 00000000 00000000 00000000 00000000 ................................ 000040
00000000 00000000 00000000 00000000 00000000 00000000 00000000 00000000 ................................ 000060
00000000 00000000 00000000 00000000 00000000 00000000 00000000 00000000 ................................ 000080
00000000 00000000 00000000 00000000 00000000 00000000 00000000 00000000 ................................ 0000A0
0A0A0A0A 0A000000 00000000 00000000 00000000 00000000 00000000 00000000 ................................ 0000C0
0A0A0A0A 0A0A0A0A 0A0A0A0A 0A0A0A0A 0A0A0A0A 0A0A0A0A 0A0A0A0A 0A0A0A0A ................................ 0000E0
0A0A0A0A 0A0A0A0A 0A0A0A0A 0A0A0A0A 0A0A0A0A 0A0A0A0A 0A0A0A0A 0A0A0A0A ................................ 000100
0A0A0A0A 0A0A0A0A 0A0A0A0A 0A0A0A0A 0A0A0A0A 0A0A0A0A 0A0A0A0A 0A0A0A0A ................................ 000120
0A0A0A0A 0A0A0A0A 0A0A0A0A 0A0A0A0A 0A0A0A0A 0A0A0A0A 0A0A0A0A 0A0A0A0A ................................ 000140
0A0A0A0A 0A0A0A0A 0A0A0A0A 0A0A0A0A 0A0A0A0A 0A0A0A0A 0A0A0A0A 0A0A0A0A ................................ 000160
0A0A0A0A 0A0A0A0A 0A0A0A0A 0A0A0A0A 0A0A0A0A 0A0A0A0A 0A0A0A0A 0A0A0A0A ................................ 000180
0A0A0A0A 0A0A0A0A 0A0A0A0A 0A0A0A0A 0A0A0A0A 0A0A0A0A 0A0A0A0A 0A0A0A0A ................................ 0001A0
00000000 000A0A0A 0A0A0A0A 0A0A0A0A 0A0A0A0A 0A0A0A0A 0A0A0A0A 0A0A0A0A ................................ 0001C0
20000000 00000000 00000000 00000000 00000000 00000000 00000000 00000000 ................................ 0001E0
```

Dump of file SATURN:[PCCOMMON.DUMP.DLL]DA-IMPRT.DLL;1 on 18-APR-1990 10:39:02.20
File ID (459,7,0)   End of file block 93 / Allocated 96

Virtual block number 93 (0000005D), 512 (0200) bytes

```
00000000 00000000 00000000 00000000 00000000 00000000 00000000 00000000 ................................ 000000
18800000 00000278 30040000 023204B6 00000000 00000000 00000000 00000000 ................Ñ.2....0x....... 000020
4D4E3C3C 00000000 00000000 FFFF0000 00000000 00001EA6 FFFF1EA0 3ED21E98 ..Ø>....¦...................<<NM 000040
6520746E 696F7020 676E6974 616F6C66 20200A00 4854414D 203A00FD 3E3E4753 SG>>».: MATH..· floating-point e 000060
30207962 20656469 76696400 67000A00 64696C61 766E6900 6500203A 726F7272 rror: .e.invalid...g.divide by 0 000080
776F6C66 7265766F 20686361 7473006E 000A0077 6F6C6672 65766F00 68000A00 ...h.overflow...n.stack overflow 0000A0
36520000 000A0064 65746172 656E6567 20796C74 6963696C 70786500 70000A00 ...p.explicitly generated.....R6 0000C0
00333030 36520003 000A0077 6F6C6672 65766F20 6B636174 7320200A 00303030 000..· stack overflow.....R6003. 0000E0
38303036 52000800 0A003020 79622065 64697669 64207265 6765746E 6920200A .· integer divide by 0.....R6008 000100
6E656D75 67726120 726F6620 65636170 73206867 756F6E65 20746F6E 20200A00 ..· not enough space for argumen 000120
65636170 73206867 756F6E65 20746F6E 20200A00 39303036 52000900 0A007374 ts.....R6009..· not enough space 000140
6974206E 757200FF 000A0D00 FC000A00 746E656D 6E6F7269 766E6520 726F6620  for environment...•......run-ti 000160
6F702067 6E697461 6F6C6620 200A0032 30303652 00020020 726F7272 6520656D me error ...R6002..· floating po 000180
00020000 00041EA4 00020003 FFFFFF00 0A006465 64616F6C 20746F6E 20746E69 int not loaded.........£....... 0001A0
00000000 00000000 00000000 00000000 00000000 000618D0 00020000 000509E2 â.......Å...................... 0001C0
00000000 00000000 00000000 00000000 00000000 00000000 00000000 00000000 ................................ 0001E0
```

Dump of file SATURN:[PCCOMMON.DUMP.DLL]DA-NORM.DLL;1 on 18-APR-1990 10:39:14.45
File ID (391,21,0)   End of file block 51 / Allocated 52

Virtual block number 1 (00000001), 512 (0200) bytes

```
00000000 00000040 00000000 00000088 0000FFFF 00000004 00000029 01C25A4D MZó.)...........¦.......a....... 000000
00000080 00000000 00000000 00000000 00000000 00000000 00000000 00000000 ................................ 000020
6F6E6E61 63206061 72676F72 70207369 685421CD 4C01B821 CD09B400 0EBA1F0E ..¤..Ç.el¦.LèIThis program canno 000040
00000000 00000024 0A0D002E 65646F6D 20534F44 206E6920 6E757220 65622074 t be run in DOS mode....$....... 000060
000B000E 00000000 00040000 00000000 00068009 4D8A4232 000C0400 0505454E NE......2B.M.................... 000080
00000000 00000000 00010007 00040000 0000048C 010000EA 00CC0080 00400024 $.a.¯.ä.õ....................... 0000A0
000F0F00 000F04E9 08D00F00 0800044E 022A0F00 02290422 3C140F00 3C13004B K..<...<".)...•.N.Å...Å.Õ....... 0000C0
00E51EB1 00E50522 00020E21 00000000 02B00F21 02A804F6 00A50E00 00A504EB $.E...E.-.´.¦.¯.....¦...".¦.Ý.¦. 0000E0
02841EB1 028405C9 034C1EB1 034C0594 03A41EB1 03A40559 02751EB1 02750531 1.u.Ý.u.Y.É.Ý.É...L.Ý.L.è...Ý... 000100
022C0004 01900004 012C0004 028C0004 02AA1EB1 02AA0620 03A41EB1 03A405F2 ·.É.Ý.É.-.´.Ý.¯...¥...,........, 000120
445F4D52 4F4E5F41 44100000 4D524F4E 20414407 00800004 02880004 03200004 .. ..........DA-NORM...DA_NORM_D 000140
02E802BC 0289022D 01D50150 00AC004A 00360007 00010000 0230434F 5250474C LGPROCO.......6.J.¯.P.¦.-...¥.Š. 000160
5345444D 45400E50 41454845 54414552 434D454D 00404540 034E4957 4D500500 ..PMWIN.MEM.MEMCREATEHEAP.MEMDES 000180
45434C54 550F4C54 55034B43 4F4C4243 4F4C4C41 4D454000 50414548 594F5254 TROYHEAP.MEMALLOCBLOCK.UTL.UTLCE 0001A0
13524F53 5255435 .494E4947 41424C54 55105455 4403574F 444E4957 5245544E NTERWINDOW.DUT.UTLBAGINITCURSOR. 0001C0
54415245 54494741 424C5455 13524F53 52554345 5341454C 45524741 424C5455 UTLBAGRELEASECURSOR.UTLBAGITERAT 0001E0
```

Dump of file SATURN:[PCCOMMON.DUMP.DLL]DA-NORM.DLL;1 on 18-APR-1990 10:39:14.45
File ID (391,21,0)   End of file block 51 / Allocated 52

Virtual block number 2 (00000002), 512 (0200) bytes

```
0C454B41 4D4E5551 45534C54 550C454B 41405145 534C5455 0A524F53 52554345 ECURSOR.UTLSEQMAKE.UTLSEQUNMAKE. 000000
44084D54 48455249 55514341 4C4D4400 6C6D6403 4C454853 55505145 534C5455 UTLSEQPUSHEL.dml.DMLACQUIREHTM.D 000020
444F4045 4552464C 4D440C4E 5854504F 54534C40 440A4E58 54545241 54534C4D MLSTARTTXN.DMLSTOPTXN.DMLFREEMOD 000040
43595245 55514C40 440D454C 444E4148 4C45444F 4D595245 55514C4D 44134C45 EL.DMLQUERYMODELHANDLE.DMLQUERYC 000060
4408444C 45494654 45534C4D 4408444C 45494659 52455551 4C4D4400 544E554F OUNT.DMLQUERYFIELD.DMLSETFIELD.D 000080
4552454C 504D4953 4C4D440F 4554414C 45524C4D 44094E4C 52595245 55514C4D MLQUERYRLN.DMLRELATE.DMLSIMPLERE 0000A0
4C4F4F54 4C4C494B 4954470B 49544703 5453494C 45455246 4C4D4408 4554414C LATE.DMLFREELIST.GTI.GTIKILLTOOL 0000C0
45534954 47104753 4D444E45 53495447 0A434F52 504C4F4F 54464544 4954470E .GTIDEFTOOLPROC.GTISENDMSG.GTISE 0000E0
47124C4F 4F54574F 444E4957 59524555 51495447 12574F44 4E49574C 4F4F5454 TTOOLWINDOW.GTIQUERYWINDOWTOOL.G 000100
50415441 44585541 54455349 54471052 54504154 41445855 41595245 55514954 TIQUERYAUXDATAPTR.GTISETAUXDATAP 000120
4E450E53 44455250 41440754 4E455241 504C4F4F 54595245 55514954 47125254 TR.GTIQUERYTOOLPARENT.DAPREDS.EN 000140
54410B59 454B5254 54414954 4C554D57 544E4510 5359454B 54554F48 54495754 TWITHOUTKEYS.ENTWMULTIATTRKEY.AT 000160
4954414C 45521352 54544149 544C554D 53414859 454B0F59 454B4E49 4B4F5254 TROKINKEY.KEYHASMULTIATTR.RELATI 000180
4415544E 45455441 4552434D 41440C6D 61640359 454B4E49 4B4F5049 48534E4F ONSHIPOKINKEY.dam.DAMCREATEENT.D 0001A0
454B4554 41455243 4D41440C 50494853 4E4F4954 414C4552 45544145 52434D41 AMCREATERELATIONSHIP.DAMCREATEKE 0001C0
4D41440C 524F5252 454D4144 53494D41 440D4A42 4F455445 4C45444D 41440C59 Y.DAMDELETEOBJ.DAMISDAMERROR.DAM 0001E0
```

```
Dump of file SATURN·[PCCOMMON.DUMP.DLL]DA-NORM.DLL;1 on 18-APR-1990 10:39:14.45
File ID (391,21,0)   End of file block 51 / Allocated 52

Virtual block number 3 (00000003), 512 (0200) bytes

 4D414411 52545441 59504F43 4D41440B 79706F63 61640652 52455441 4D524F46 FORMATERR.decopy.DAMCOPYATTR.DAM 000000
 414E4106 544C5053 4B504545 52464D41 440D544C 50534B50 4C4C554E 54494E49 INITNULLPKSPLT.DAMFREEPKSPLT.ANA 000020
 4E54554C 414E4112 45434150 53504952 5453454D 414E5455 4C414E41 1454554C LUT.ANALUTNAMESTRIPSPACE.ANALUTN 000040
 58414D54 45535054 45474D44 50004241 54404450 06455441 44494C41 56454D41 AMEVALIDATE.PDMTAB.PDMGETPSETMAX 000060
 440E0000 4D524F4E 20414420 4D502032 2F534F0F 00000000 03010100 00030201 .............OS/2 PM DA NORM...D 000080
 FF1276FF D88EFFFF B81E5657 000006C8 00000143 4F52504C 4F4F544D 524F4E41 ANORMTOOLPROC...à...WV.|...Ä.v.. 0000A0
 0000FFFF 9A1076FF 1276FF00 FEE90E46 88FC5689 FA468900 00FFFF9A 006A1076 v.j.......F*.V=.F.Õ±..v..v...... 0000C0
 FF0085E9 0A468800 FDE90100 E90000FF FF9A0676 FF0876FF 006A1076 FF1276FF .v..v.j..v..v......Õ..Õ»..f.Õ... 0000E0
 C4000CE9 0375000B 0000FFFF 9A006A00 6A006A00 6A012468 028E6810 76FF1276 v..v.h/.h$.j.j.j.j.......Äu.Õ..á 000100
 9A5016FE 468D1076 FF1276FF 00002D47 C726FA5E C40009E9 00012047 C726FA5E ^*&úG·..Õ..á^*&úG·...v..v..F±.P. 000120
 00BE9A01 6A1076FF 1276FF06 C483FFFF 00009AFA 76FFFC76 FFFE76FF 0000FFFF .....v±.v=.v*......á..v..v.j..ſ. 000140
 16E90019 E90084E9 0000BA00 00B80000 00F39A01 6A1076FF 1276FF00 32E90000 ..Õ2..v..v.j..µ...|..¤..Õ..Õ..Õ. 000160
 1076FF12 76FF005C E9FFE7E9 FFD1E903 7502C230 FF73E903 7502C030 0013E900 .Õ..=á.u.Õs.=ó.u.Õ1.ÕÕ.Õ\..v..v. 000180
 FF0C76FF 0E76FF10 76FF1276 FF0043E9 004FE900 008A0000 B80000FF FF9A016A j......|..¤..ÕO.ÕC..v..v..v..v.. 0001A0
 03750029 30FF1EE9 03750020 300023E9 002FE900 00FFFF9A 0676FF08 76FF0A76 v..v..v......Õ/.Õ#.= .u.Õ..=).u. 0001C0
 1F0000E9 0000BA00 008BFF8D E9FEE2E9 0375003B 30FF0BE9 03750030 30FFB7E9 Õñ.=0.u.Õ..=;.u.Õâ±Õ§.|..¤..Õ... 0001E0

Dump of file SATURN:[PCCOMMON.DUMP.DLL]DA-NORM.DLL;1 on 18-APR-1990 10:39:14.45
File ID (391,21,0)   End of file block 51 / Allocated 52

Virtual block number 4 (00000004), 512 (0200) bytes

 89000001 A29A006A 1076FF12 76FFD88E 0008881E 56570000 60C8000E CAC95F5E ^_èò..à'..WV.|...Ä.v..v.j..Â.... 000000
 76FF006A 1076FF12 76FF0000 002C9A10 76FF1276 FF030FE9 0E4688FC 5689FA46 F¯.V=.F.Õ...v..v..,....v..v.j..v 000020
 26FA5EC4 FC5689FA 46890000 00159A00 6A1076FF 1276FF00 00003F9A 0676FF08 ..v..?....v..v.j.......F*.V=á^*& 000040
 46890000 02CD9A50 16A0468D 026A2577 FF262777 FF26FA5E C42177FF 262377FF .w#&.wIá^*&.w'&.w%j..F..P.e....F 000060
 9A5016A0 468D0130 681076FF 1276FF02 D5E999EC 46880007 E9037500 EC7E83EC &.-&.u.Õ...F&.ÕI..v..v.h0..F..P. 000080
 FFFF0B3C 9A1076FF 1276FF01 3E68006A 006A006A 016AFA76 FFFC76FF 0000FFFF .....v=.v'j.j.j.j.h>..v..v..<... 0000A0
 2177FF26 2377FF26 FA5EC402 91E999EC 46880007 E9037500 0030EC46 8912C483 .á..F&=..u.Õ...F&.Õ..á^*&.w#&.wI 0000C0
 037500EC 7E83EC46 890000FF FF9A5016 EE468D12 6A2577FF 262777FF 26FA5EC4 á^*&.w'&.w%j..FŸ.P......F&.-&.u. 0000E0
 02470B26 078B26F2 5EC4F456 89F24689 F0568BEE 46880250 E999EC46 8B0007E9 Õ...F&.Õ\..FŸ.Vþ.F·.V¶á^·&..&.G. 000100
 9A5016FE 468D37FF 260277FF 26F25EC4 2177FF26 2377FF26 FA5EC400 B3E90375 u.Õ*.á^*&.w#&.wIá^·&.w.&.7.F±.P. 000120
 0071E903 7500FE7E 83020FE9 99EC4688 0007E903 7500EC7E 83EC4689 0000FFFF .....F&.-&.u.Õ...F&.Õ...~±.u.Õq. 000140
 00FFFF9A 5016A046 8D026A37 FF260277 FF26F25E C42177FF 262377FF 26FA5EC4 á^*&.w#&.wIá^·&.w.&.7j..F..P.... 000160
 01616801 40681076 FF1276FF 01D2E999 EC468800 07E90375 00EC7E83 EC468900 ..F&.-&.u.Õ...F&.Õ@..v..v.hə.ha. 000180
 FF006A01 69680140 681076FF 1276FFF8 46890000 03109A50 16A0468D FE6A006A j.j±.F..P......F½.v..v.hə.hi.j.. 0001A0
 262377FF 26FA5EC4 FF3EE904 F2468300 0003539A 37FF2602 77FF26F2 5EC4F876 v½á^·&.w.&.7.S....F·.Õ>.á^*&.w#& 0001C0
 006AFF6A 006A0164 68014068 1076FF12 76FF0000 FFFF9AEE 76FFF076 FF2177FF .wI.vþ.vŸ......v..v.hə.hd.j.j.j. 0001E0

Dump of file SATURN:[PCCOMMON.DUMP.DLL]DA-NORM.DLL;1 on 18-APR-1990 10:39:14.45
File ID (391,21,0)   End of file block 51 / Allocated 52

Virtual block number 5 (00000005), 512 (0200) bytes

 00000064 9A006A00 6AFF6A00 6A016468 013E6810 76FF1276 FF000003 6C9A006A j..l....v..v.h>.hd.j.j.j.j..d... 000000
 011DE90C C48303AA 07959A10 76FF1276 FF0A76FF 0C76FFFA 76FFFC76 FF013AE9 Õ:..v=.v*.v..v..v..v....`..á.Õ.. 000020
 890CC483 040204BD 9A1076FF 1276FFFA 76FFFC76 FF5016F6 468D0090 E90A468B .F.Õ...F-.P.v=.v*.v..v..§....á.. 000040
 26FA5EC4 0082E900 00030E9A EC76FF10 76FF1276 FF000EE9 037401F6 7E83EC46 F&.--.t.Õ...v..v..v&.8...Õ..á^*& 000060
 468D0060 E900CBE9 0000BA00 00B80000 04269A00 6A1076FF 1276FF00 012F47C7 úG/...v..v.j..&...|..¤..Õù.Õ'..F 000080
 037401F6 7E83EC46 890CC483 020E048D 9A1076FF 1276FFFA 76FFFC76 FF5016F6 -.P.v=.v*.v..v..§....á..F&.--.t. 0000A0
 001EE900 21E90000 045A9AEC 76FF1076 FF1276FF 00013147 C726FA5E C40017E9 Õ..á^*&úG1...v..v..v$.Z...ÕI.Õ.. 0000C0
 5CE9FFDF E9FF81I` 0375014C 3DFF53E9 0375014A 3DFFB3E9 03750138 30001BE9 Õ..=8.u.Õ*.=J.u.ÕS.=L.u.Õ..ÕÕ.Õ\ 0000E0
 1076FF12 76FF00._ E9004FE9 0000BA00 00B80000 00AE9A00 6A1076FF 1276FF00 ..v..v.j..Û...|..¤..ÕO.ÕC..v..v. 000100
 E9037500 203D0023 E9002FE9 00000119 9A0676FF 0876FF0A 76FF0C76 FF0E76FF .v..v..v..v..v......Õ/.Õ#.= .u.Õ 000120
 0000B8FF 8DE9FCD1 E9037500 3B30FED1 E9037500 303DFFB7 E9037500 293DFEFE ±±=).u.Õñ.=0.u.ÕI±=;.u.ÕI=Õ§.|.. 000140
 0107C726 0E5EC408 8E015EB8 1E565700 00AEC800 0ECAC95F 5E1F0000 E900008A ¤..Õ...^_èò..àÛ..WV.|^..Áá^.&ú.. 000160
 9A5016B2 468D0000 681E0000 FFFF9A50 16B2468D 4B6A0156 680676FF 0876FF00 ..v..v.hV̄.jK.Fý.P......h...Fý.P. 000180
 E90000FF FF9A5016 FF62868D 50168246 800013E9 03750000 3008C483 051F007C |....á.=..u.Õ...Fý.P..b..P.....Õ 0001A0
 7C9A5016 FF62868D 0002681E 08C48305 3100469A 5016FF62 868D0001 681E0012 ...h....b..P.F.1..á..h....b..P.| 0001C0
 006AFF6A 006A0165 68014068 0676FF08 76FF01EF E9037500 003D08C4 83FFFF00 ....á.=..u.Õÿ..v..v.hə.he.j.j.j. 0001E0
```

```
Dump of file SATURN:[PCCOMMON.DUMP.DLL]DA-NORM.DLL;1 on 18-APR-1990 10:39:14.45
File ID (391,21,0)   End of file block 51 / Allocated 52

Virtual block number 6 (00000006), 512 (0200) bytes

9A006A00 6AFF6A00 6A016568 013E6806 76FF0876 FFFF5686 89000005 709A006A j..p.....V..v..v.h>.he.j.j.j.j.. 000000
016A006A 002EE903 74FFFF52 8E830038 E90374FF FF56BE83 FF528689 000002FA •.....R../V..t.Ö8../R..t.Ö..j.j. 000020
260E5EC4 0000FFFF 9A306A00 6A000368 1E000468 1E3877FF 263077FF 260A5EC4 á^.&.w=&.w;.h...h..j.j0.....á^.& 000040
2577FF26 2777FF26 0A5EC421 77FF2623 77FF260A 5EC40106 E90000B8 000007C7 ú...¡..Öø.á^.&.w#&.wIá^.&.w'&.wX 000060
B6FF0021 E9037500 003DFF54 86890000 FFFF9A00 6A5016FF 62868050 16AE468D .fÜ.P..b..Pj........T.=..u.Öl..Ñ 000080
C70181E9 0000B800 0007C726 0E5EC403 8838629A 0045681E 0A76FF0C 76FFFF54 T..v..v..hE..b;..á^.&ú...¡..Ö..ú 0000A0
46890000 06409A00 6A006AFE 76FF006A 01656801 3E680676 FF0876FF FFFFFE46 f±...v..v.h>.he.j..v±j.j..M....F 0000C0
0006B99A 006A006A FE76FF00 6A016A68 013E6806 76FF0876 FF0067E9 037540FE ±âu.Ög..v..v.h>.hj.j..v±j.j..¿.. 0000E0
77FF2623 77FF260A 5EC40035 E90375FF 60860BFF 5E8688FF 609689FF 5E868900 ...^...'...^...'.u.ÖS.á^.&.w#&.w 000100
75000030 FF548689 00000713 9A116AFF 5E86FFFF 6086FF08 6AAE76FF 8076FF21 I.v¯.vÙj..Ñ'..Ñ^.j........T.=..u 000120
6A016568 01406806 76FF0876 FFFFFFFE 46C7FF76 E900F5E9 FF54868B 0007E903 .Ö....T.ÖX.Öv.úF±...v..v.hâ.he.j 000140
68014068 0676FF08 76FF0067 E9037540 FE468900 00060C9A 006A006A ¯<76FF00 ..v±j.j..É....F±âu.Ög..v..v.hâ.h 000160
FF5C860B FF5A8688 FF5C9689 FF5A8689 00000742 9A006A00 6AFE76FF 0.'A016A j.j..v±j.j..8.....Z...\...Z...\. 000180
FF5AB6FF FF5CB6FF 096AAE76 FF8076FF 2177FF26 2377FF26 0A5EC400 35E?0375 u.ÖS.á^.&.w#&.wI.v¯.vÙj..Ñ\..ÑZ. 0001A0
0876FFFF 76E90066 E9FF5486 880007E9 03750000 30FF5486 890000FF FF9A126A j........T.=..u.Ö....T.Öf.Öv..v. 0001C0
5886C600 30E90375 D00B0000 05539A00 6A006A00 6A006A01 24680134 680676FF .v.h4.h$.j.j.j.j..S....Äu.Ö=.6.X 0001E0

Dump of file SATURN:[PCCOMMON.DUMP.DLL]DA-NORM.DLL;1 on 18-APR-1990 10:39:14.45
File ID (391,21,0)   End of file block 51 / Allocated 52

Virtual block number 7 (00000007), 512 (0200) bytes

5016FF58 8680096A 2577FF26 2777FF26 0A5EC421 77FF2623 77FF260A 5EC459FF .Yá^.&.w#&.wIá^.&.w'&.wXj...X..P 000000
0000E900 00B80006 E9FF5486 880007E9 037500FF 54BE83FF 54868900 00FFFF9A .......T../T..u.Ö....T.Ö..¡..Ö.. 000020
012FE90A 4688014B E9037401 0C7E8308 8E04C588 1E565700 0054C8CB C95F5E1F .^_èûàT..WV.¡é..Ä.~..t.ÖH..F.Ö/. 000040
FFAE7E83 AE468900 0007E89A 006A006A FF6A006A 01656801 3E680676 FF0876FF .v..v.h>.he.j.j.j.j..$....FÜ.~Û. 000060
89000008 6E9A006A 006AAE76 FF006A01 6A68013E 680676FF 0876FF00 81E90375 u.Ö...v..v.h>.hj.j..vÙj.j..n.... 000080
4680005E 681E0000 08869A50 1684468D 486A0156 680676FF 0876FFB2 56898046 F¯.Vÿ.v..v.hV.jK.FÇ.P......h^..F 0000A0
76FF2177 FF262377 FF260E5E C40033E9 03740000 3008C483 0896007C 9A501684 Ç.P.|....á.=..t.Ö3.á^.&.w#&.wI.v 0000C0
1684468D 01566806 76FF0876 FFAC4689 000001CA 9A501684 4680026A 8076FFB2 ÿ.v¯j..FÇ.P.ò....F¯.v..v.hV..FÇ. 0000E0
08C29A00 6A006A00 6A006A01 65680140 680676FF 0876FF00 99E90000 08059A50 P.í...Ö...v..v.hâ.he.j.j.j.j..ò. 000100
4680005F 681E0000 04E29A50 1684468D 486A0156 680676FF 0876FFAE 46890000 ...FÜ.v..v.hV.jK.FÇ.P.ä....h_..F 000120
88016868 01406806 76FF0876 FF0036E9 03740000 3008C483 04F2007C 9A501684 Ç.P.|.·..á.=..t.Ö6..v..v.hâ.ћh.. 000140
80015668 0676FF08 76FF0000 062A9A50 1684468D 50524BCA 83000000 D228AE46 FÜ+Ø....ÖKRP.FÇ.P.*....v..v.hV.. 000160
E9FF6AE9 03750140 30FEC9E9 0375013E 300013E9 0016E900 0001F09A 50168446 FÇ.P.Þ...Ö..Ö..=>.u.Öè±=â.u.Öj.Ö 000180
00000963 9A006A10 76FF1276 FFD88E07 90881E56 57000054 C8C8C95F 5E1F0000 ...^_èûàT..WV.¡...Ä.v..v.j..c... 0001A0
FF006A10 76FF1276 FF000001 829A1076 FF1276FF 01EDE90E 4688FE56 89FC4689 .F•.V±.F.ÖU..v..v.......v..v.j.. 0001C0
6A006A01 25685052 0000FFFF 9A01A068 1076FF12 76FF0000 01959A06 76FF0876 v..v.......v..v.h..... .RPhX.j.j 0001E0

Dump of file SATURN:[PCCOMMON.DUMP.DLL]DA-NORM.DLL;1 on 18-APR-1990 10:39:14.45
File ID (391,21,0)   End of file block 51 / Allocated 52

Virtual block number 8 (00000008), 512 (0200) bytes

FC5EC4FE 5689FC46 89000001 689A006A 1076FF12 76FF0000 FFFF9A00 6A006A01 .j.j.......v..v.j..k....F•.V±á^= 000000
89000008 3C9A5016 AC468002 6A2577FF 262777FF 26FC5EC4 2177FF26 2377FF26 &.w#&.wIá^•&.w'&.wXj..F¯.P.<.... 000020
9A5016AC 468D0194 681076FF 1276FF01 94E999FA 46880007 E9037500 003DFA46 F•=..u.Ö...F•.Ö...v..v.h...F¯.P. 000040
76FFFE76 FF0161E9 08C48305 FF0DF89A 1076FF12 76FFFC76 FFFE76FF 00000852 R....v±.v•.v..v..½....á.Ö•..v±.v 000060
468D00BC E90A4688 0144E90C C4830A02 13199A10 76FF1276 FF0A76FF 0C76FFFC •.v..v..v..v.......á.ÖD..F.Ö¥..F 000080
037401F8 7E83FA46 890CC483 0A380E75 9A1076FF 1276FFFC 76FFFE76 FF5016F8 ½.P.v±.v•.v..v..u.8..á..F•.~½.t. 0000A0
FFFC76FF FE76FF50 16F84680 00A9E900 000A7B9A FA76FF10 76FF1276 FF000EE9 Ö...v..v..v•.(...Ö`..F½.P.v±.v•. 0000C0
76FFFC76 FFFE76FF 5016F846 80008AE9 FA46890C C4830A57 0E759A10 76FF1276 v..v..u.W..á..F•Ö...F½.P.v±.v•.v 0000E0
013147C7 26FC5EC4 0017E903 7401F87E 83FA4689 0CC48309 C30E759A 1076FF12 ..v..u.ú..á..F•.~½.t.Ö..á^=&úG1. 000100
76FF1276 FF00012F 47C726FC 5EC4004B E900000A 949AFA76 FF1076FF 1276FF00 ..v..v..v•.....ÖK.á^=&úG/...v..v 000120
E9037501 B43D0023 E90026E9 0029E900 94E90000 BA0000B8 00000AD9 9A006A10 .j..\...¡..¤..Ö..Ö).Ö&.Ö#.=Ç.u.Ö 000140
005CE9FF D7E9FF24 E9037501 C630FF81 E9037501 C43DFF6A E9037501 B630FFD0 Â.=Ñ.u.Öj.=á.u.Ö..=ó.u.Ö$.Ö•.Ö\. 000160
FF1076FF 1276FF00 43E9004F E90000BA 00008800 0003C59A 006A1076 FF1276FF .v..v.j..é...¡..¤..ÖO.ÖC..v..v.. 000180
D7E90375 00203000 23E9002F E9000004 809A0676 FF0876FF 0A76FF0C 76FF0E76 v..v..v..v..v......Ö/.Ö#.= .u.Ö• 0001A0
BA0000B8 FF8DE9FD F3E90375 003830FE AAE90375 003030FF B7E90375 00293DFE ±=).u.Öñ.=0.u.Ö`±=;.u.Öµ~Ö§.¡..¤ 0001C0
76FF0676 FF0876FF D88E08FF 881E5657 0000ACC8 000ECAC9 5F5E1F00 00E90000 ..Ö...^_èò..à¯..WV.¡...Ä.v..v..v 0001E0
```

```
Dump of file SATURN:[PCCOMMON.DUMP.DLL]DA-NORM.DLL;1 on 18-APR-1990 10:39:14.45
File ID (391,21,0)   End of file block 51 / Allocated 52

Virtual block number 9 (00000009), 512 (0200) bytes

 83003600 469A5016 A6468D00 60681E00 0008999A 006A006A 006A006A 016E680A .hn.j.j.j.j.......h'..Fl.P.F.6.. 000000
 0165680C 76FF0676 FF0876FF 0073E903 75000C7E 83007CE9 03750010 7E8308C4 á..-...u.Õ|..-...u.Õs..v..v..v.he. 000020
 FF0676FF 0876FF00 4EE90375 FFF67E83 F6468900 0008BF9A 006A006A FF6A006A j.j.j.j..é....F-.~-.u.ÕN..v..v.. 000040
 2377FF26 145EC4F4 5689F246 89000007 C59A006A 006AF676 FF006A01 6A680C76 v.hj.j..v~j.j..é....F·.V¶á^.&.w# 000060
 06E90375 000030A4 46890000 0CFD9A50 16A6468D 026AF276 FFF476FF 2177FF26 &.wl.v¶.v·j..Fl.P.»....Fé=..u.Õ. 000080
 80156A25 77FF2627 77FF2614 5EC42177 FF262377 FF26145E C401FCE9 A4468800 ..FÉÕ•.á^.&.w#&.wlá^.&.w'&.w%j.. 0000A0
 FA568BF8 468801C9 E9A4468B 0006E903 7500003D A4468900 0002439A 5016F846 F%.P.C....FÉ=..u.Õ...FÉÕè..F%.V° 0000C0
 016EE903 75024708 26078826 FF549EC4 04FF5486 830005E9 FF569689 FF548689 ..T...V.Õ....T..á.T.&..&.G.u.Õn. 0000E0
 0000FFFF 9A5016FE 468D37FF 260277FF 26FF549E C42177FF 262377FF 26145EC4 á^.&.w#&.wlá.T.&.w.&.7.F±.P..... 000100
 000CD49A F876FFFA 76FF2177 FF262377 FF26145E C4001CE9 03750000 3DA44689 .FÉ=..u.Õ..á^.&.w#&.wl.v°.v%.á.. 000120
 FC468D37 FF260277 FF26FF54 9EC42177 FF262377 FF26145E C4015CE9 A4468800 ..FÉÕ\.á^.&.w#&.wlá.T.&.w.&.7.F• 000140
 FA76FF21 77FF2623 77FF2614 5EC4001C E9037500 0030A446 8909E032 BA9A5016 .P.α2Á..FÉ=..u.Õ..á^.&.w#&.wl.v° 000160
 77FF26FF 549EC421 77FF2623 77FF2614 5EC40115 E9A4468B 0000001E 9AF876FF .v%......FÉÕ..á^.&.w#&.wlá.T.&.w 000180
 26145EC4 001CE903 7500003D A4468900 0009889A 5016FF58 8680026A 37FF2602 .&.7j...X..P......FÉ=..u.Õ..á^.& 0001A0
 46805016 FF588680 00CBE9A4 46880000 033A9AF8 76FFFA76 FF2177FF 262377FF .w#&.wl.v°.v%.:....FÉÕù...X..P.F 0001C0
 830009E9 037500FE 7E83FEF5 E90003E9 03740000 3008C483 0816007C 9A5016A6 l.P.|....á.=..t.Õ..Õ%±.~±.u.Õ... 0001E0

Dump of file SATURN:[PCCOMMON.DUMP.DLL]DA-NORM.DLL;1 on 18-APR-1990 10:39:14.45
File ID (391,21,0)   End of file block 51 / Allocated 52

Virtual block number 10 (0000000A), 512 (0200) bytes

 0374000E 7E830009 E9037500 FC7E8300 5AE90374 00127E83 0009E903 7400127E -..t.Õ...-..t.ÕZ..-•.u.Õ...-..t. 000000
 FF58868D FE6A006A 0161680A 76FF0676 FF0876FF 003FE903 74000E7E 830009E9 Õ...~..t.Õ?..v..v..v.ha.j.j±..X. 000020
 26FF549E C4F676FF 006A0169 680A76FF 0676FF08 76FFF646 89000000 B79A5016 .P.ñ....F-.v..v..v.hi.j..v-á.T.& 000040
 9AF876FF FA76FF21 77FF2623 77FF2614 5EC4FE7D E9000000 E99A37FF 760277FF .w.&.7.Õ...Õ)±á^.&.w#&.wl.v°.v%. 000060
 00008800 00085D9A 006A006A FF6A006A 0164680A 76FF0676 FF0876FF C 900C8D .....v..v..v.hd.j.j.j.j..]...|.. 000080
 61681E01 C9680676 FF0876FF D88E0844 881E5657 000002C8 CBC95F5E 1F.000E9 Õ.._^_èùà...WV.|D..Ä.v...v.hè..ha 0000A0
 083C9A06 76FF0876 FF01BA68 006A016A 006A006A 0A76FF0C 76FF0000 09809A00 ..¯....v..v.j.j.j.j.ha..v..v..<. 0000C0
 6A006A0A 76FF0C76 FF0029E9 99FE468B 0007E903 7500003D FE468912 C4830E61 a...á..F±=..u.Õ...F±.Õ)..v..v.j.j 0000E0
 0000E999 FE4688FE 468912C4 830C850B 3C9A0676 FF0876FF 01B86800 6A016A00 .j.j.h|..v..v..<.ç...á..F±.F±.Õ.. 000100
 680676FF 0876FF00 0107C726 0E5EC4D8 8E0E0088 1E565700 00FCC8C8 C95F5E1F .^_èùà•..WV.|...Áá^.&ú....v..v.h 000120
 C4830ED8 007C9A50 16FF5C86 80006268 1E000008 069A5016 FF5C868D 486A01C9 è.]K..\..P......hb...\..P.|.Á..á 000140
 0063681E 0011E900 0005089A 50168046 805016FF 5C868D00 13E90375 00003D08 .=..u.Õ....\..P.F¯.P.....Õ...hc. 000160
 003D08C4 83086000 7C9A5016 80468D00 64681E08 C4830EE9 00469A50 1680468D .F¯.P.F.Õ..á..hd..F¯.P.|.m..á.•. 000180
 8900000D 939A006A 006AFF6A 006A0165 68018A68 0676FF08 76FF02F9 E9037500 .u.Õ°..v..v.ha.he.j.j.j.j....... 0001A0
 0066681E 3877FF26 3D77FF26 0A5EC401 6A006A00 2EE90374 FFFF0C8E 83FF0C86 ..../...t.Õ..j.j.á^.&.w=&.w;.hf. 0001C0
 FF260A5E C403C9E9 00008800 0007C726 0E5EC400 0005A89A 306A006A 0065681E .he.j.j0.´...á^.&ú...|..Õè.á^.&. 0001E0

Dump of file SATURN:[PCCOMMON.DUMP.DLL]DA-NORM.DLL;1 on 18-APR-1990 10:39:14.45
File ID (391,21,0)   End of file block 51 / Allocated 52

Virtual block number 11 (0000000B), 512 (0200) bytes

 03750000 3DFF0A86 890000FF FF9A006A 50168046 805016FC 468D2177 FF262377 w#&.wl.F•.P.F¯.Pj..........=..u. 000000
 00880000 07C7260E 5EC40FC1 38629A00 8E681E0A 76FF0C76 FFFF0A86 FF0021E9 Õl..Ñ...v..v..h...b;è.á^.&ú...|. 000020
 0676FF08 76FF0000 FFFF9AFC 76FFFE76 FF505200 35050C56 880A468B 0380E900 .Õ...F..V..S.RP.v±.v•......v..v. 000040
 C4001DE9 03750000 3DFF0A86 89115230 DF9A0A76 FF0C76FF 5016FC46 80018A68 ho..F=.P.v..v..ÕOR.....=..u.Õ..á 000060
 260A5EC4 032BE9FF 0A868800 0010279A A876FFAA 76FF2177 FF262377 FF260A5E ^.&.w#&.wl.v¯.v¯.'.......Õ(.á^.& 000080
 00003DFF 0A868900 000C159A 5016A846 80156AFC 76FFFE76 FF2177FF 262377FF .w#&.wl.v±.v•j..F´.P.........=.. 0000A0
 E9FF0A86 8B000010 729AA876 FFAA76FF 2177FF26 2377FF26 0A5EC400 10E90375 u.Õ..á^.&.w#&.wl.v¯.v¯.r.......Õ 0000C0
 9A5016FF 10868D02 6A37FF26 0277FF26 A85EC421 77FF2623 77FF260A 5EC402E2 ã.á^.&.w#&.wlá^´&.w.&.7j......P. 0000E0
 76FFAA76 FF2177FF 262377FF 260A5EC4 0010E903 7500003D FF0A8689 00000BE2 ã.......=..u.Õ..á^.&.w#&.wl.v`.v 000100
 4680FC76 FFFE76FF 2177FF26 2377FF26 0A5EC402 97E9FF0A 86880000 108E9AA8 ´./.......Õ..á^.&.w#&.wl.v±.v=.F 000120
 260A5EC4 0010E903 7500003D FF0A8689 0000050E 9A016A50 16FF1086 805016AC ¯.P.....Pj..ß.......=..u.Õ..á^.& 000140
 2377FF26 0A5EC402 4BE9FF0A 86880000 11089AA8 76FFAA76 FF2177FF 262377FF .w#&.wl.v¯.v´........ÕK.á^.&.w# 000160
 0A868900 0011829A 086AAC76 FFAE76FF 116A37FF 260277FF 26A85EC4 2177FF26 &.wlá^´&.w.&.7j..vÛ.v¯j......... 000180
 88000011 289AA876 FFAA76FF 2177FF26 2377FF26 0A5EC400 10E90375 00003DFF .=..u.Õ..á^.&.w#&.wl.v`.v´.(.... 0001A0
 FF04868D 00000000 9AA876FF AA76FF21 77FF2623 77FF260A 5EC401FE E9FF0A86 ...Õ±.á^.&.w#&.wl.v`.v´.Å....... 0001C0
 9A0676FF 0876FF25 77FF2627 77FF260A 5EC4FC76 FFFE76FF 0A76FF0C 76FF5016 .P.v..v..v±.v=á^.&.w'&.w%.v..v.. 0001E0
```

Dump of file SATURN:[PCCOMMON.DUMP.DLL]DA-NORM.DLL;1 on 18-APR-1990 10:39:14.45
File ID (391,21,0)   End of file block 51 / Allocated 52

Virtual block number 12 (0000000C), 512 (0200) bytes

```
FF2177FF 262377FF 260A5EC4 0022E903 75FF0686 08FF0486 8814C483 0E30338C .30..6.........u.Ö".6^.t.w#&.wl. 000000
8D018868 0676FF08 76FF0000 FFFF9A09 6AAC76FF AE76FF12 6AFF0486 FFFF0686 Ä...Ä..j..vÜ.v¯j........ .v.hl.. 000020
FF260A5E C4001DE9 03750000 30FF0A86 89110730 DF9A0A76 FF0C76FF 5016FC46 F=.P.v..v..Ö0=.....=..u.C..6^.&. 000040
76FF0A76 FF0C76FF 014CE9FF 0A868800 000FE19A A876FFAA 76FF2177 FF262377 w#&.wl.v`.v`.Ä.......ÖL..v..v..v 000060
FF0125E9 FF0A8688 0007E903 7500003D FF0A8689 08C4830F 8400F89A 0676FF08 ..v..½....å.....=..u.Ö......Ö%.. 000080
C60038E9 0375D008 0000125F 9A006A00 6A006A00 6A012468 01A66806 76FF0876 v..v.hl.h$.j.j.j.j.._....Åu.Ö;.6 0000A0
FF0E868D 096A2577 FF262777 FF260A5E C42177FF 262377FF 260A5EC4 59FF0E86 ...Yá^.&.w#&.wlå^.&.w'&.wXj..... 0000C0
0676FF08 76FF1312 08A59A00 05E90375 00FF0A8E 83FF0A86 89000012 FD9A5016 .P.»......../...u.Ö...É....v..v. 0000E0
FF43FF08 86C60005 E9037500 08000012 849A006A 006A006A 006A0124 68019C68 h..h$.j.j.j.j.......Åu.Ö..6...C. 000100
C60005E9 0375D008 000012A9 9A006A00 6A006A00 6A012468 01A06806 76FF0876 v..v.h..h$.j.j.j.j..`....Åu.Ö..6 000120
75D00800 0012CE9A 006A006A 006A006A 01246801 A2680676 FF0876FF 31FF0886 ...1.v..v.hÅ.h$.j.j.j.j..ö....Åu 000140
0F0B9A00 6A006A00 6A006A01 246801A4 680676FF 0876FF32 FF0886C6 0005E903 .Ö..6...2.v..v.hÉ.h$.j.j.j.j.... 000160
2777FF26 0A5EC421 77FF2623 77FF260A 5EC433FF 0886C600 05E90375 D00B0000 ...Åu.Ö..6...3á^.&.w#&.wlå^.&.w' 000180
9A0005E9 037500FF 0ABE83FF 0A868900 0007719A 5016FF08 8680086A 2577FF26 &.wXj......P.q......../...u.Ö... 0001A0
468800EF E9037401 0C7E8308 8E0E7D88 1E565700 0054C8CB C95F5E1F 00A008A5 É....^_èüåT..WV.¡)..Å.-..t.Öy..F 0001C0
AE468900 00136F9A 006A006A FF6A006A 01656801 8A680676 FF0876FF 00DEE90A .Ö8..v¯.v.ho.he.j.j.j.j..o....FÜ 0001E0
```

Dump of file SATURN:[PCCOMMON.DUMP.DLL]DA-NORM.DLL;1 on 18-APR-1990 10:39:14.45
File ID (391,21,0)   End of file block 51 / Allocated 52

Virtual block number 13 (0000000D), 512 (0200) bytes

```
419A006A 006AAE76 FF006A01 6A68018A 680676FF 0876FF00 81E90375 FFAE7E83 .-Ü.u.Ö...v..v.ho.hj.j..vÜj.j..A 000000
681E0000 0E9B9A50 16B0468D 4B6A01C9 680676FF 0876FFFE 5689FC46 89000014 ....F=.V±.v..v.hè.jK.F¯.P......h 000020
FF262377 FF260E5E C40033E9 03740000 3D08C483 0EAC007C 9A501680 468D00A7 l..F¯.P.|.¯..å.=..t.Ö3.á^.&.w#&. 000040
01C96806 76FF0876 FFAC4689 00001050 9A501680 468D026A FC76FFFE 76FF2177 wl.v±.v=j..F¯.P.P....F¯.v..v.hè. 000060
FF0876FF 01B86801 8A68016A 016A006A 0E76FF10 76FF0000 0E129A50 16804680 .F¯.P......v..v.j.j.j.ho.h|..v.. 000080
E9000EE9 01E5E999 AC468800 07E90375 000030AC 468912C4 83119D08 3C9A0676 v..<....å..F¯=..u.Ö...F¯.Ö|.Ö..Ö 0000A0
FF0876FF 01A2E90A 468801C8 E9037401 0C7E8300 00E9FF1A E9037501 8A3D0008 ..=o.u.Ö..Ö...-..t.Öü..F.ÖÅ..v.. 0000C0
256801A2 680676FF 0876FF00 00145A9A 006A006A 006A006A 01256801 A0680676 v.h..h%.j.j.j.j..Z....v..v.hÅ.h% 0000E0
006A006A 006A0125 6801A468 0676FF08 76FF0000 14739A00 6A006A00 6A006A01 .j.j.j.j..s....v..v.hÉ.h%.j.j.j. 000100
000014A8 9A006A00 6A016A00 6A012568 019C6806 76FF0876 FF000014 8C9A006A j.......v..v.h..h%.j.j.j.j..´... 000120
FF0876FF 000014C1 9A006A00 6A016A00 6A012568 01A06806 76FF0876 FF015EE9 Ö^..v..v.h..h%.j.j.j.j..è....v.. 000140
256801A4 680676FF 0876FF00 0014DA9A 006A006A 006A006A 01256801 A2680676 v.hÅ.h%.j.j.j.j..Ö....v..v.hÉ.h% 000160
006A006A 006A0125 68019C68 0676FF08 76FF0000 14F39A00 6A006A00 6A006A01 .j.j.j.j..■....v..v.h..h%.j.j.j. 000180
289A006A 006A006A 006A0125 6801A068 0676FF08 76FF00F7 E9000015 0F9A006A j......Ö¼..v..v.h..h%.j.j.j.j..( 0001A0
FF0876FF 00001541 9A006A00 6A016A00 6A012568 01A26806 76FF0876 FF000015 ....v..v.hÅ.h%.j.j.j.j..A....v.. 0001C0
2568019C 680676FF 0876FF00 0012049A 006A006A 006A006A 01256801 A4680676 v.hÉ.h%.j.j.j.j.......v..v.h..h% 0001E0
```

Dump of file SATURN:[PCCOMMON.DUMP.DLL]DA-NORM.DLL;1 on 18-APR-1990 10:39:14.45
File ID (391,21,0)   End of file block 51 / Allocated 52

Virtual block number 14 (0000000E), 512 (0200) bytes

```
6A006A01 256801A0 680676FF 0876FF00 90E90000 15769A00 6A006A00 6A006A01 .j.j.j.j..v...Ö...v..v.h..h%.j.j 000000
A89A006A 006A006A 006A0125 6801A268 0676FF08 76FF0000 158F9A00 6A006A00 .j.j.......v..v.hÅ.h%.j.j.j.j..` 000020
FF0876FF 000015C1 9A006A00 6A016A00 6A012568 01A46806 76FF0876 FF000015 ....v..v.hÉ.h%.j.j.j.j..è....v.. 000040
9C300023 E90026E9 0029E900 0013499A 006A006A 006A006A 01256801 9C680676 v.h..h%.j.j.j.j..I...Ö).Ö&.Ö#.=. 000060
D7E9FF73 E9037501 A430FF14 E9037501 A230FEB5 E9037501 A03DFE56 E9037501 .u.ÖV±=..u.Öç±=Å.u.Ö..=É.u.Ös.Ö■ 000080
89000016 629A006A 1076FF12 76FF088E 1321B81E 56570000 52C8CBC9 5F5E1FFF ..^_èüåR..WV.¡l..Ä.v..v.j..b.... 0000A0
76FF006A 1076FF12 76FF0000 09239A10 76FF1276 FF01DAE9 0E468BFE 5689FC46 F=.V±.F.ÖÖ..v..v..#....v..v.j..v 0000C0
016A006A 01256850 52000009 449A0206 681076FF 1276FF00 0009369A 0676FF08 ..v..6....v..v.h...D...RPh%.j.j. 0000E0
26FC5EC4 FE5689FC 46890000 090C9A00 6A1076FF 1276FF00 0009569A 006A006A j.j..V....v..v.j.......F=.V±á^=& 000100
46890000 13C09A50 16AE4680 026A2577 FF262777 FF26FC5E C42177FF 262377FF .w#&.wlá^=&.w'&.wXj..FÜ.P.å....F 000120
D69A5016 AE468D01 F8681076 FF1276FF 0181E999 FA468800 07E90375 000030FA ª=..u.Ö...Fª.Ö...v..v.h%..FÜ.P.ø 000140
E9037500 0030FA46 8908C483 16F11828 9A1076FF 1276FFFC 76FFFE76 FF000013 ....v±.v=.v..v..(.þ..å..Fª=..u.Ö 000160
4C9A1076 FF1276FF 0A76FF0C 76FFFC76 FFFE76FF 013CE901 48E999FA 46880007 ...Fª.ÖH.Ö<..v±.v=.v..v..v..v..L 000180
17251988 9A1076FF 1276FFFC 76FFFE76 FF0097E9 0A468801 1FE90CC4 83170E1B ....å.Ö...F.Ö...v±.v=.v..v....%. 0001A0
1276FFFA 468908C4 83174C19 889A1076 FF1276FF FC76FFFE 76FF00A3 E908C483 .å.ÖÉ..v±.v=.v..v....L..å..Fª.v. 0001C0
C48313F5 19889A10 76FF1276 FFFC76FF FE76FF00 7CE90000 17679A00 6A1076FF .v.j..g...Ö|..v±.v=.v..v....%..å 0001E0
```

```
Dump of file SATURN:[PCCOMMON.DUMP.DLL]DA-NORM.DLL;1 on 18-APR-1990 10:39:14.45
File ID (391,21,0)   End of file block 51 / Allocated 52

Virtual block number 15 (0000000F), 512 (0200) bytes

 5EC4004B E9000017 809AFA76 FF1076FF 1276FF00 013147C7 26FC5EC4 FA468908 ..F*á^•&úG1...v..v..v*.....ÕK.á^ 000000
 0029E900 94E90000 8A000088 000017C5 9A006A10 76FF1276 FF00012F 47C726FC •&úG/...v..v.j..é...|..¤..Õ..Õ). 000020
 4230FF8F E9037502 4030FFC8 E9037502 2830FF61 E9037502 26300023 E90026E9 Õ&.Õ#.=&.u.Õa.=(.u.Õà.=ã.u.Õ..=B 000040
 E900008A 000C8800 000A1D9A 006A1076 FF1276FF 005CE9FF D7E9FF60 E9037502 .u.Õ'.Õ•.Õ\..v..v.j......|..¤..Õ 000060
 E900000A FF9A0676 FF0876FF 0A76FF0C 76FF0E76 FF1076FF 1276FF00 43E9004F O.ÕC..v..v..v..v..v..v..v......Õ 000080
 003B30FE CFE90375 003030FF 87E90375 002930FE FCE90375 00203000 23E9002F /.Õ#.= .u.Õ=±•).u.Õñ.=0.u.Õü±=;. 0000A0
 881E5657 00005AC8 000ECAC9 5F5E1F00 00E90000 8A000088 FF8DE9FE 06E90375 u.Õ.±Õ§.|..¤..Õ...^_èÒ..àZ..WV.| 0000C0
 0876FF00 0018679A 006A006A 006A006A 016E6802 1C680676 FF0876FF D88E15FE ±..Å.v...v.h..hn.j.j.j.j..b....v. 0000E0
 77FF2623 77FF? 0A 5EC40000 155A9A00 6A006A00 6A006A01 6E68021A 680676FF .v.h..hn.j.j.j.j..Z...á^.&.w#&.w 000100
 03750000 3DF64689 00001005 9A5016FC 468D136A 2577FF26 2777FF26 0A5EC421 |á^.&.w'&.w%j..F•.P......F-=..u. 000120
 F25EC404 F2468300 04E9F456 89F24689 FE5688FC 468800E9 E999F646 880007E9 Õ...F-.ÕÕ..F•.V±.F·.V¶Õ...F·.á^· 000140
 FF260277 FF26F25E C42177FF 262377FF 260A5EC4 0081E903 7502470B 26078B26 &..&.G.u.Õÿ.á^.&.w#&.w|á^·&.w.&. 000160
 C42177FF 262377FF 260A5EC4 0086E903 7500FA7E 830000FF FF9A5016 FA468D37 7.F*.P......-*.u.Õ..á^.&.w#&.w|á 000180
 001DE903 75000030 F6468900 00168A9A 5016A646 80026A37 FF260277 FF26F25E ^·&.w.&.7j..F|.P......F-=..u.Õ.. 0001A0
 0876FF00 56E999F6 46880000 197F9AFC 76FFFE76 FF2177FF 262377FF 260A5EC4 á^.&.w#&.wl.v±.v=......F-.ÕV..v. 0001C0
 0676FF08 76FFF846 89000019 669A5016 A6468DFE 6A006A01 6168021A 680676FF .v.h..ha.j.j±.F|.P.f....F½.v..v. 0001E0

Dump of file SATURN:[PCCOMMON.DUMP.DLL]DA-NORM.DLL;1 on 18-APR-1990 10:39:14.45
File ID (391,21,0)   End of file block 51 / Allocated 52

Virtual block number 16 (00000010), 512 (0200) bytes

 0A5EC4FF 3CE90000 18499A37 FF260277 FF26F25E C4F876FF 006A0169 68021A68 h..hi.j..v½á^·&.w.&.7.I...Õ<.á^. 000000
 881E5657 00000CC8 C8C95F5E 1F000011 8D9AFC76 FFFE76FF 2177FF26 2377FF26 &.w#&.wl.v±.v=.§....^_èúà...WV.| 000020
 75D00800 001A005A 006A006A 006A006A 01246802 0A680676 FF0876FF D88E1830 0..Å.v...v.h..h$.j.j.j.j.......Åu 000040
 096A2577 FF262777 FF260A5E C42177FF 262377FF 260A5EC4 59F846C6 0037E903 .Õ7.6F½Yá^.&.w#&.w|á^.&.w'&.w%j. 000060
 76FF0876 FF1AAC06 A59A0005 E9037500 F67E83F6 46890000 1A999A50 16F8468D .F½.P......F-.--.u.Õ...£.¯..v..v 000080
 FF43F446 C60004E9 0375D008 00001A24 9A006A00 6A006A00 6A012468 02006806 .h..h$.j.j.j.j..$....Åu.Õ..6F¶C. 0000A0
 C60004E9 0375D008 00001A48 9A006A00 6A006A00 6A012468 02046806 76FF0876 v..v.h..h$.j.j.j.j..H....Åu.Õ..6 0000C0
 0375D008 00001A6C 9A006A00 6A006A00 6A012468 02066806 76FF0876 FF31F446 F¶1.v..v.h..h$.j.j.j.j..l....Åu. 0000E0
 00001AC3 9A006A00 6A006A00 6A012468 02086806 76FF0876 FF32F446 C60004E9 Õ..6F¶2.v..v.h..h$.j.j.j.j..û... 000100
 77FF2627 77FF260A 5EC42177 FF262377 FF260A5E C433F446 C60004E9 0375D008 .Åu.Õ..6F¶3á^.&.w#&.w|á^.&.w'&.w 000120
 76FF1248 08A59A00 05E90375 00F67E83 F6468900 0012339A 5016F446 80086A25 %j..F¶.P.3....F-.--.u.Õ...£.H..v 000140
 0375FFFA 7E83FA46 8900001A E99A006A 006AFF6A 006A0165 68021A68 0676FF08 ..v.h..he.j.j.j.j..Õ....F*.-*.u. 000160
 FC468900 0019439A 006A006A FA76FF00 6A016A68 021A6806 76FF0876 FF006EE9 Õn..v..v.h..hj.j..v*j.j..C....F= 000180
 263D77FF 260A5EC4 016A006A 28578926 29478926 FE5688FC 46880A5E C4FE5689 .V±á^..F=.V±&.G)&.W+j.j.á^.&.w=& 0001A0
 0000FFFF 9A0A76FF 0C76FF03 20680000 36FF2602 A2068EFF FF6816C2 683877FF .w;hó.h....Å.&.6..h ..v..v...... 0001C0
 00005CC8 C8C95F5E 1F0000E9 00008800 06E9F646 880006E9 03750000 3DF64689 .F-=..u.Õ...F-Õ..|..Õ...^_èúà\.. 0001E0

Dump of file SATURN:[PCCOMMON.DUMP.DLL]DA-NORM.DLL;1 on 18-APR-1990 10:39:14.45
File ID (391,21,0)   End of file block 51 / Allocated 52

Virtual block number 17 (00000011), 512 (0200) bytes

 021A6806 76FF0876 FF0183E9 0A468801 94E90374 010C7E83 D88E1990 881E5657 WV.|...Å.-..t.Õ...F.Õ...v..v.h.. 000000
 FF0876FF 015BE903 75FFF67E 83F64689 00001BA2 9A006A00 6AFF6A00 6A016568 he.j.j.j.j..Å....F-.~-.u.Õ(..v.. 000020
 260E5EC4 FE5689FC 46890000 1BF09A00 6A006AF6 76FF006A 016A6802 1A680676 v.h..hj.j..v-j.j..Þ....F•.V±á^.& 000040
 7500003D F4468900 001C629A 5016A846 80026AFC 76FFFE76 FF2177FF 262377FF .w#&.wl.v±.v=j..F´.P.b....F¶=..u 000060
 9A006A00 6A006A00 6A016E68 021C6806 76FF0876 FF02EEE9 99F4468B 0007E903 .Õ...F¶.ÕY..v..v.h..hn.j.j.j.j.. 000080
 0018849A 5016F846 8D086AFC 76FFFE76 FF2177FF 262377FF 260E5EC4 000019A9 ¯...á^.&.w#&.wl.v±.v•j..F½.P.... 0000A0
 E9A65689 A44689FA 5688F846 8B02A6E9 99F4468B 0007E903 7500003D F4468900 ..F¶=..u.Õ...F¶.Õ|..F½.V*.FÊ.V|Õ 0000C0
 2177FF26 2377FF26 0E5EC400 89E90375 02470B26 078B26A4 5EC404A4 46830004 ...FÊ.á^Ê&..&.G.u.Õ..á^.&.w#&.wl 0000E0
 1DE90375 00003DF4 46890000 19019A50 16A8468D 026A37FF 260277FF 26A45EC4 á^Ê&.w.&.7j..F¯.P......F¶=..u.Õ. 000100
 76FF023B E999F446 8F00001C E09AF876 FFFA76FF 2177FF26 2377FF26 0E5EC400 .á^.&.w#&.wl.v*.v½.Å....F¶.Õ;..v 000120
 76FF0876 FFF64689 00001CC7 9A5016A8 468DFE6A 006A0161 68021C68 C.?6FF08 ..v.h..ha.j.j±.F´.P.ú....F-.v..v 000140
 5EC4FF64 E900001D 199A37FF 260277FF 26A45EC4 F676FF00 6A016968 021 ?806 .h..hi.j..v-á^Ê&.w.&.7.....Õd.á^ 000160
 E9037502 1A30000B E9000EE9 00001922 9AF876FF FA76FF21 77FF2623 77FF?60E .&.w#&.wl.v*.v½."...Õ..Õ..=..u.Õ 000180
 01256802 04680676 FF0876FF 01A2E90A 468801C8 E9037401 0C7E8300 00E9FE75 u±Õ...-..t.Õù..F.ÕÅ..v..v.h..h%. 0001A0
 6A006A00 6A006A01 25680206 680676FF 0876FF00 0010329A 006A006A 006A006A j.j.j.j..2....v..v.h..h%.j.j.j.j 0001C0
 FF00001D 649A006A 006A006A 006A0125 68020868 0676FF08 76FF0000 1D489A00 ..K....v..v.h..h%.j.j.j.j..d.... 0001E0
```

```
Dump of file SATURN:[PCCOMMON.DUMP.DLL]DA-NORM.DLL;1 on 18-APR-1990 10:39:14.45
File ID (391,21,0)   End of file block 51 / Allocated 52

Virtual block number 18 (00000012), 512 (0200) bytes

76FF0876 FF015EE9 00001D80 9A006A00 6A016A00 6A012568 02006806 76FF0876 v..v.h..hX.j.j.j.j......Ô^..v..v 000000
01256802 06680676 FF0876FF 00001D99 9A006A00 6A016A00 6A012568 02046806 .h..hX.j.j.j.j.......v..v.h..hX. 000020
6A006A00 6A006AJ1 25680208 680676FF 0876FF00 001DB29A 006A006A 006A006A j.j.j.j..ý....v..v.h..hX.j.j.j.j 000040
E900001D E79A006A 006A006A 006A0125 68020068 0676FF08 76FF0000 1DCB9A00 ..ù....v..v.h..hX.j.j.j.j..Ô...Ô 000060
76FF0876 FF00001E 009A006A 006A006A 006A0125 68020468 0676FF08 76FF00F7 %..v..v.h..hX.j.j.j.j.......v..v 000080
01256802 08680676 FF0876FF 00001E19 9A006A00 6A016A00 6A012568 02066806 .h..hX.j.j.j.j.......v..v.h..hX. 0000A0
6A006A00 6A006A01 25680200 680676FF 0876FF00 001E329A 006A006A 006A006A j.j.j.j..2....v..v.h..hX.j.j.j.j 0000C0
1E679A00 6A006A00 6A006A01 25680204 680676FF 0876FF00 90E90000 1E4E9A00 ..N...Ô...v..v.h..hX.j.j.j.j..g. 0000E0
76FF0876 FF00001E 809A006A 006A006A 006A0125 68020668 0676FF08 76FF0000 ...v..v.h..hX.j.j.j.j.......v..v 000100
01256802 00680676 FF0876FF 00001E99 9A006A00 6A016A00 6A012568 02086806 .h..hX.j.j.j.j.......v..v.h..hX. 000120
043DFE56 E9037502 00300023 E90026E9 0029E900 001B7C9A 006A006A 006A006A j.j.j.j..|...Ô).Ô&.Ô#.=..u.ÔV±=. 000140
58C8C8C9 5F5E1FFF D7E9FF73 E9037502 0830FF14 E9037502 063DFEB5 E9037502 .u.Ôç±=..u.Ô..=..u.Ôs.Ô..^_èùàX 000160
0E4688FE 5689FC46 8900001F 1A9A006A 1076FF12 76FF088E 1854B81E 56570000 ..WV.¡T..Á.v..v.j.......F=.V±.F. 000180
0016359A 0676FF08 76FF006A 1076FF12 76FF0000 16229A10 76FF1276 FF0175E9 Ôu..v..v.."....v..v.j..v..v..5.. 0001A0
C42177FF 262377FF 26FC5EC4 FE5689FC 46890000 16089A00 6A1076FF 1276FF00 ..v..v.j.......F=.V±á^=&.w#&.wIá 0001C0
07E90375 00003DF4 46890000 18C59A50 16A8468D 026A2577 FF262777 FF26FC5E ^=&.w'&.wXj..F´.P.é....F¶=..u.Ô. 0001E0

Dump of file SATURN:[PCCOMMON.DUMP.DLL]DA-NORM.DLL;1 on 18-APR-1990 10:39:14.45
File ID (391,21,0)   End of file block 51 / Allocated 52

Virtual block num?er 19 (00000013), 512 (0200) bytes

76FFFE76 FF000016 AF9A5016 A8468003 24681076 FF1276FF 013CE999 F4468800 ..F¶.Ô<..v..v.h$..F´.P.£....v±.v 000000
88F6468B 0009E903 75D008F8 5689F646 8908C483 1FAD209B 9A1076FF 1276FFFC =.v..v... Ù..á..F-.V½.Åu.Ô...F-. 000020
831FCF25 729A1076 FF1276FF 0A76FF0C 76FFFC76 FFFE76FF 00F3E900 FFE9F856 V½Ô..Ôµ..v±.v=.v..v..v..v..rXù.. 000040
1421C69A 1076FF12 76FFFC76 FFFE76FF 5016FA46 8D005EE9 0A468800 D6E90CC4 á.Ô=..F.Ô^..F¹.P.v±.v=.v..v..6I. 000060
3BE90000 17369AF4 76FF1076 FF1276FF 000EE903 7500FA7E 83F44689 0CC4831B ..á..F¶.-¹.u.Ô...v..v..v¶.6...Ô; 000080
0084E900 008A0000 88000020 389A006A 1076FF12 76FF0001 2F47C726 FC5EC400 .á^=&ùG/...v..v.j..8 ..¡..□..Ô.. 0000A0
FF005CE9 FFE7E9FF C8E90375 033A30FF 9AE90375 03383000 13E90016 E90019E9 Ô..Ô..Ô..=8.u.Ô..=:.u.Ôà.ÔÔ.Ô\.. 0000C0
76FF1076 FF1276FF 0043E900 4FE90000 8A000088 00001FEA 9A006A10 76FF1276 v..v.j..ð...¡..□..ÔO.ÔC..v..v..v 0000E0
FF45E903 7500203D 0023E900 2FE90000 17EB9A06 76FF0876 FF0A76FF 0C76FF0E ..v..v..v..v..$...Ô/.Ô#.= .u.ÔE. 000100
008A0000 B8FFBDE9 FE68E903 75003B30 FF18E903 75003030 FFB7E903 7500293D =).u.Ôñ.=0.u.Ô..=;.u.Ôk±Ô§.¡..□. 000120
034C6806 76FF0876 FFD88E1E D6B81E56 57000058 C8000ECA C95F5E1F 0000E900 .Ô...^_èò..àX..WV.¡=..Ä.v..v.hL. 000140
6A2977FF 262B77FF 260A5EC4 2177FF26 2377FF26 0A5EC400 001F679A 00A8681E .h´..g...á^.&.w#&.wIá^.&.w+&.w)j 000160
FC468800 D4E999F8 46880007 E9037500 0030F846 8900001C 009A5016 FC468008 ..F=.P......F½=..u.Ô...F½.Ôà..F= 000180
C40089E9 03750247 08260788 26AB5EC4 04A84683 0004E9AA 5689A846 89FE5688 .V±.F´.V´Ô...F´.á^´&..&.G.u.Ô..á 0001A0
00001F42 9A5016AC 4680026A 37FF2602 77FF26A8 5EC42177 FF262377 FF260A5E ^.&.w#&.wIá^´&.w.&.7j..F¯.P.B... 0001C0
001C839A FC76FFFE 76FF2177 FF262377 FF260A5E C4001DE9 03750000 3DF84689 .F½=..u.Ô..á^.&.w#&.wI.v±.v=.... 0001E0

Dump of file SATURN:[PCCOMMON.DUMP.DLL]DA-NORM.DLL;1 on 18-APR-1990 10:39:14.45
File ID (391,21,0)   End of file block 51 / Allocated 52

Virtual block number 20 (00000014), 512 (0200) bytes

21919A50 16AC468D FE6A006A 01616803 32680676 FF0876FF 0069E999 F8468800 ..F½.Ôi..v..v.h2.h=.j.j±.F¯.P..! 000000
37FF2602 77FF26A8 5EC4FA76 FF006A01 69680332 680676FF 0876FFFA 46890000 ...F¹.v..v.h2.hi.j..v¹á^´&.w.&.7 000020
9A0676FF 0876FF03 3668006A 016A006A 006A0A76 FF0C76FF FF64E900 001CA49A .È...Ôd..v..v.j.j.j.j.h6..v..v.. 000040
20A3881E 56570000 FAC8C8C9 5F5E1F00 00E999F8 4688F846 8912C483 1F7A0B3C <.z..á..F½.F½.Ô...^_èùà¹..WV:¡È 000060
0000138A 9A5016FF 5C86804B 6A034C68 0676FF08 76FF0001 07C7260E 5EC4D88E .Äá^.&ú....v..v.hL.jK..\..P..... 000080
5016FF5C 8680013 E9037500 003D08C4 83222900 7C9A5016 FF5C8680 00A9681E .h¯...\..P.|.)".á.=..u.Ô....\..P 0000A0
681E08C4 83223A00 469A5016 80468000 AA681E00 11E90000 0EC59A50 16B0468D .F¯.P.é...Ô...h¯..F¯.P.F.:".á..h 0000C0
03326806 76FF0876 FF0320E9 03750000 3008C483 139A007C 9A501680 468D00AB ¨..F¯.P.|....á.=..u.Ô . v..v.h2. 0000E0
01656803 36680676 FF0876FF FF0E8689 00002279 9A006A00 6AFF6A00 6A016568 he.j.j.j.j..y".......v....h6.he. 000100
FFFF0ABE 83000AE9 0375FFFF 0E8E83FF 0A868900 00216E9A 006A006A FF6A006A j.j.j.j..n!......ƒ...u.Ô...ƒ... 000120
306A006A 00AC681E 00AD681E 3B77FF26 3D77FF26 0A5EC401 6A006A00 2EE90374 t.Ô..j.j.á^.&.w=&.w;.hÙ..h¯.j.j0 000140
46802177 FF262377 FF260A5E C402AAE9 00008800 0007C726 0E5EC400 000F399A .9...á^.&ú...¡..Ô¯.á^.&.w#&.wI.F 000160
FFFF0C86 FF0021E9 03750000 3DFF0C86 8900000F 639A006A 50168046 805016FC =.P.F¯.Pj..c.......=..u.ÔI..Ñ... 000180
880A468B 0261E900 00880000 07C7260E 5EC42339 38629A01 07681E0A 76FF0C76 v..v..h...b;9#á^.&ú...¡..Ô=..F.. 0001A0
5016FC46 80033268 0676FF08 76FF0000 0FA69AFC 76FFFE76 FF505200 35050C56 V..5.RP.v±.v=.[....v..v.h2..F=.P 0001C0
FF262377 FF260A5E C4001DE9 03750000 3DFF0C86 89218230 DF9A0A76 FF0C76FF .v..v..ÔOýI....=..u.Ô..á^.&.w#&. 0001E0
```

Dump of file SATURN:[PCCOMMON.DUMP.DLL]DA-NORM.DLL;1 on 18-APR-1990 10:39:14.45
File ID (391,21,0)   End of file block 51 / Allocated 52

Virtual block number 21 (00000015), 512 (0200) bytes

```
FF2177FF 262377FF 260A5EC4 0209E9FF 0C868800 00239F9A A876FFAA 76FF2177 wl.v^.v^..#......Õ..á^.&.w#&.wl. 000000
0A5EC400 1DE90375 00003DFF 0C868900 0020D79A 5016A846 80156AFC 76FFFE76 v±.v=j..F´.P.■ ......=..u.Õ..á^. 000020
77FF260A 5EC401C3 E9FF0C86 88000021 409AA876 FFAA76FF 2177FF26 2377FF26 &.w#&.wl.v^.v^.Ml......Õû.á^.&.w 000040
FF0C8689 0000212C 9A5016FF 10868D02 6A37FF26 0277FF26 A85EC421 77FF2623 #&.wlá^´&.w.&.7j......P.,l...... 000060
86880000 24369AA8 76FFAA76 FF2177FF 262377FF 260A5EC4 0010E903 7500003D =..u.Õ..á^.&.w#&.wl.v^.v´.6$.... 000080
16FF1086 8D5016AC 468DFC76 FFFE76FF 2177FF26 2377FF26 0A5EC401 78E9FF0C ..Õx.á^.&.w#&.wl.v±.v=.F¯.P..... 0000A0
FF2177FF 262377FF 260A5EC4 001DE903 7500003D FF0C8689 0000109C 9A016A50 Pj..........=..u.Õ..á^.&.w#&.wl. 0000C0
26A85EC4 2177FF26 2377FF26 0A5EC401 2CE9FF0C 86880000 24839AA8 76FFAA76 v^.v´..$......Õ,.á^.&.w#&.wlá^´& 0000E0
1DE90375 000030FF 0C868900 0024FA9A 086AAC76 FFAE76FF 116A37FF 260277FF .w.&.7j..vÛ.v¯j..ª$......=..u.Õ. 000100
5EC4000F E9FF0C86 88000024 A09AA876 FFAA76FF 2177FF26 2377FF26 0A5EC400 .á^.&.w#&.wl.v^.v´..$......ÕÕ.á^ 000120
0A76FF0C 76FF5016 FF06868D 00002535 9AA876FF AA76FF21 77FF2623 77FF260A .&.w#&.wl.v^.v´.5%.......P.v..v. 000140
8B14C483 2515338C 9A0676FF 0876FF25 77FF2627 77FF260A 5EC4FC76 FFFE76FF .v±.v=á^.&.w'&.w%.v..v...3.%.á.. 000160
6AFF0686 FFFF0886 FF2177FF 262377FF 260A5EC4 0022E903 75FF0886 08FF0686 .......u.Õ".á^.&.w#&.wl.Ñ...Ñ..j 000180
FF0C76FF 5016FC46 8D03366B 0676FF08 76FF0000 10E99A09 6AAC76FF AE76FF12 ..vÛ.v¯j..Õ....v..v.h6..F=.P.v.. 0001A0
76FF2177 FF262377 FF260A5E C4001DE9 03750000 3DFF0C86 89254F30 DF9A0A76 v..ÕÕ0%....=..u.Õ..á^.&.w#&.wl.v 0001C0
FC2098 9A 0676FF08 76FF0A76 FF0C76FF 002DE9FF 0C868800 0023599A A876FFAA ^.v´.Y#......Õ-..v..v..v..v... = 0001E0
```

Dump of file SATURN:[PCCOMMON.DUMP.DLL]DA-NORM.DLL;1 on 18-APR-1990 10:39:14.45
File ID (391,21,0)   End of file block 51 / Allocated 52

Virtual block number 22 (00000016), 512 (0200) bytes

```
5F5E1F00 00E90000 880006E9 FF0C8688 0007E903 7500003D FF0C8689 08C48322 ".á.....=..u.Õ......Õ..|..Õ...^_ 000000
0876FF00 BFE90A46 8800D0E9 0374010C 7E83D08E 21CEB81E 56570000 A0C8CBC9 èùà...WV.|öl.Ä.~..t.ÕÅ..F.Õ¢..v. 000020
E90375FF AE7E83AE 46890000 25C89A00 6A006AFF 6A006A01 65680332 680676FF .v.h2.he.j.j.j.j..à%...FÕ.~Õ.u.Õ 000040
89FC4689 0000225C 9A006A00 6AAE76FF 006A016A 68033268 0676FF08 76FF0094 ...v..v.h2.hj.j..vÛj.j..\"...F=. 000060
000023C8 9A5016FF 62868D02 6AFC76FF FE76FF21 77FF2623 77FF260E 5EC4FE56 V±á^.&.w#&.wl.v±.v=j...b..P.à#.. 000080
80486A03 4C680676 FF0876FF 0053E999 FF60868B 0008E903 75000030 FF608689 ..'.=..u.Õ....'..ÕS..v..v.hL.jK. 0000A0
E9037400 003008C4 8321FD00 7C9A5016 80468D01 20681E00 0021EC9A 50168046 F¯.P.±l...h ..F¯.P.|.»l.á.=.:t.Õ 0000C0
75033230 0008E900 0EE90000 20859A50 16FF6286 8D034C68 0676FF08 76FF0014 ...v..v.hL...b..P.ç ..Õ..Õ..=2.u 0000E0
006A1076 FF1276FF D88E257A B81E5657 000058C8 CBC95F5E 1F0000E9 FF39E903 .Õ9.Õ...^_èùàX..WV.|z%.Ä.v..v.j. 000100
FF1276FF 00001EFA 9A1076FF 1276FF02 00E90E46 88FE5689 FC468900 0026C89A .à&...F=.V±.F.Õ...v..v..ª....v.. 000120
68505200 0016439A 026C6810 76FF1276 FF00001F 0D9A0676 FF0876FF 006A1076 v.j..v..v.......v..v.hl..C...RPh 000140
89FC4689 00001EE3 9A006A10 76FF1276 FF000016 559A006A 006A016A 006A0125 %.j.j.j.j..U....v..v.j..D....F=. 000160
9A5016A8 4680026A 2577FF26 2777FF26 FC5EC421 77FF2623 77FF26FC 5EC4FE56 V±á^=&.w#&.wlá^=&.w'&.wXj..F´.P. 000180
025C6810 76FF1276 FF01A6E9 99F4468B 0007E903 7500F47E 83F44689 000025EC ±%...F¶.~¶.u.Õ...F¶.Õl..v..v.h\. 0001A0
468908C4 83275C28 B49A1076 FF1276FF FC76FFFE 76FF0000 26429A50 16A8468D .F´.P.B&...v±.v=.v..v..Ç(\'.á..F 0001C0
0C76FFFC 76FFFE76 FF015DE9 0169E9F8 5688F646 880009E9 0375D008 F85689F6 -.V½.Åu.Õ...F-.V½Õi.Õ]..v±.v=.v. 0001E0
```

Dump of file SATURN:[PCCOMMON.DUMP.DLL]DA-NORM.DLL;1 on 18-APR-1990 10:39:14.45
File ID (391,21,0)   End of file block 51 / Allocated 52

Virtual block number 23 (00000017), 512 (0200) bytes

```
FF5016FA 46800088 E90A468B 0140E90C C48324CA 2E029A10 76FF1276 FF0A76FF .v..v..v....ò$.á.Õª..F.Õ|..Fª.P. 000000
76FFFE76 FF5016FA 468D008F E90CC483 279A2931 9A1076FF 1276FFFC 76FFFE76 v±.v=.v..v..1).'.á.Õ¢..Fª.P.v±.v 000020
76FF1276 FF000EE9 037500FA 7E83F446 890CC483 27D02931 9A1076FF 1276FFFC =.v..v..1)Å'.á..F¶.~ª.u.Õ...v..v 000040
29319A10 76FF1276 FFFC76FF FE76FF50 16FA468D 0089E900 0027F39A F476FF10 ..v¶.µ'..Õ...Fª.P.v±.v=.v..v..1) 000060
1076FF12 76FF0001 3147C726 FC5EC400 16E90375 00FA7E83 F446890C C4832729 )'.á..F¶.~ª.u.Õ..á^=&úG1...v..v. 000080
00002851 9A006A10 76FF1276 FF00012F 47C726FC 5EC4004B E9000028 0C9A006A j...(..ÕK.á^=&úG/...v..v.j..Q(.. 0000A0
E9037502 8430FF40 E9037502 823D0023 E90026E9 0029E900 94E90000 BA000088 |..¤..Õ..Õ).Õ&.Õ#.=..u.Õª.=..u.Õ 0000C0
006A1076 FF1276FF 005CE9FF D7E9FF7A E9037502 A630FF4C E9037502 A430FFC8 à.=Ê.u.ÕL.=l.u.Õz.Õ■.Õ\..v..v.j. 0000E0
0A76FF0C 76FF0E76 FF1076FF 1276FF00 43E9004F E90000BA 00008800 0020039A .. ..|..¤..ÕO.ÕC..v..v..v..v..v. 000100
87E90375 002930FE D8E90375 00203D00 23E9002F E9000020 5E9A0676 FF0876FF .v..v..^ ..Õ/.Õ#.= .u.ÕÛ±=).u.Õñ 000120
5F5E1F00 00E90000 BA000088 FF8DE9FD E0E90375 003B30FE AEE90375 003030FF .=0.u.ÕÕ±=;.u.ÕÅ»Õ§.|..¤..Õ...^_ 000140
27169A01 21681E02 AA680676 FF0876FF 088E2664 B81E5657 000002C8 000ECAC9 èò..à...WV.|d&.Ä.v..v.h^..hl...⁷ 000160
C483291D 083C9A06 76FF0876 FF027E68 006A016A 006A006A 0A76FF0C 76FF0000 ...v..v.j.j.j.j.h~..v..v..<..).á 000180
6A016A00 6A006A0A 76FF0C76 FF0029E9 99FE468B 0007E903 7500003D FE468912 ..F±=..u.Õ...F±.Õ)..v..v.j.j.j.j 0001A0
C95F5E1F 0000E999 FE468BFE 468912C4 83277E0B 3C9A0676 FF0876FF 02806800 .h...v..v..<.~'.á..F±.F±.Õ...^_è 0001C0
4B6A02AA 680676FF 0876FF00 0107C726 0E5EC408 8E288C88 1E565700 00FEC8CB ÙÀ±..WV.|¥(.Äá^.&ú....v..v.h¯.]K 0001E0
```

Dump of file SATURN:[PCCOMMON.DUMP.DLL]DA-NORM.DLL;1 on 18-APR-1990 10:39:14.45
File ID (391,21,0)   End of file block 51 / Allocated 52

Virtual block number 24 (00000018), 512 (0200) bytes

```
00003008 C4832994 007C9A50 16FF5C86 8D012268 1E000026 159A5016 FF5C868D ..\..P..&...h"...\..P.|..).6.=.. 000000
16804680 0123681E 0011E900 0022169A 50168046 805016FF 5C868D00 13E90375 u.Õ....\..P.F¯.P..".Õ...h#..F¯. 000020
E9037500 003D08C4 83262500 7C9A5016 80468D01 24681E08 C48329A5 00469A50 P.F.E).6..h$..F¯.P.|.%&.6.=..u.Õ 000040
FFFF0C86 89000029 E49A006A 006AFF6A 006A0165 68028068 0676FF08 76FF0320 ..v..v.h..he.j.j.j.j..Õ)....... 000060
FF0C8E83 FF088689 000025A2 9A006A00 6AFF6A00 6A016568 027E6806 76FF0876 v..v.h-.he.j.j.j.j..ÀX.......f.. 000080
1E3877FF 263077FF 260A5EC4 016A006A 002EE903 74FFFF08 8E83000A E90375FF .u.Õ...f...t.Õ..j.j.6^.&.w=&.w;. 0000A0
5EC403CF E9000088 000007C7 260E5EC4 0000228 1 9A306A00 6A012568 1E012668 h&..h%.j.j0.Ÿ"..6^.&ú...|..Õü.6^ 0000C0
003DFF0A 86890000 22D89A00 6A5016B0 46805016 FC468021 77FF2623 77FF260A .&.w#&.wl.F=.P.F¯.Pj..Ü"......=. 0000E0
0007C726 0E5EC42A A438629A 0165681E 0A76FF0C 76FFFF0A 86FF0021 E9037500 .u.Õl..Ñ...v..v..he..b;Ê*6^.&ú.. 000100
0876FF00 00231E9A FC76FFFE 76FF5052 0035050C 56880A46 880386E9 00008800 .|..Õ...F..V..5.RP.v±.v=..#...v. 000120
E9037500 003DFF0A 868928EC 300F9A0A 76FF0C76 FF5016FC 4680027E 680676FF .v.h-..F=.P.v..v..ÕÕ&(....=..u.Õ 000140
C4032EE9 FF0A8688 000023EA 9AA876FF AA76FF21 77FF2623 77FF260A 5EC4001D ..6^.&.w#&.wl.v¯.v¯.õ#......Õ..6 000160
FF0A8689 0000237D 9A5016A8 4680156A FC76FFFE 76FF2177 FF262377 FF260A5E ^.&.w#&.wl.v±.v=j..F´.P.)#...... 000180
86880000 28559AA8 76FFAA76 FF2177FF 262377FF 260A5EC4 001DE903 75000030 =..u.Õ..6^.&.w#&.wl.v¯.v¯.U+.... 0001A0
FF108680 026A37FF 260277FF 26A85EC4 2177FF26 2377FF26 0A5EC402 E8E9FF0A ..ÕÕ.6^.&.w#&.wl6^´&.w.&.7j..... 0001C0
76FF2177 FF262377 FF260A5E C4001DE9 03750000 30FF0A86 89000026 F09A5016 .P.Þ&......=..u.Õ..6^.&.w#&.wl.v 0001E0
```

Dump of file SATURN:[PCCOMMON.DUMP.DLL]DA-NORM.DLL;1 on 18-APR-1990 10:39:14.45
File ID (391,21,0)   End of file block 51 / Allocated 52

Virtual block number 25 (00000019), 512 (0200) bytes

```
76FFFE76 FF2177FF 262377FF 260A5EC4 029DE9FF 0A868800 0028A19A A876FFAA ´.v´.À+......Õ..6^.&.w#&.wl.v±.v 000000
C4001DE9 03750000 30FF0A86 89000024 149A016A 5016FF10 868D5016 AC4680FC =.F¯.P.....Pj...$......=..u.Õ..6 000020
260A5EC4 0251E9FF 0A868800 0028EE9A A876FFAA 76FF2177 FF262377 FF260A5E ^.&.w#&.wl.v´.v´.Ÿ+......ÕQ.6^.& 000040
00002C65 9A086AAC 76FFAE76 FF116A37 FF260277 FF26A85E C42177FF 262377FF .w#&.wl6^´&.w.&.7j..v0.v¯j..e,.. 000060
2C089AA8 76FFAA76 FF2177FF 262377FF 260A5EC4 001DE903 75000030 FF0A8689 ....*..u.Õ..6^.&.w#&.wl.v´.v´.., 000080
8000002C A09AA876 FFAA76FF 2177FF26 2377FF26 0A5EC402 04E9FF0A 86880000 ......Õ..6^.&.w#&.wl.v´.v´.,.... 0000A0
FF0876FF 2577FF26 2777FF26 0A5EC4FC 76FFFE76 FF0A76FF 0C76FF50 16FF0286 ....P.v..v..v±.v=6^.&.w'&.wX.v.. 0000C0
FF262377 FF260A5E C40022E9 0375FF04 8608FF02 868814C4 832C8033 8C9A0676 v...3.,.6.........u.Õ".6^.&.w#&. 0000E0
680676FF 0876FF00 0024619A 096AAC76 FFAE76FF 126AFF02 86FFFF04 86FF2177 wl.Ñ...Ñ..j..v0.v¯j..a$...v..v.h 000100
5EC4001D E9037500 003DFF0A 86892C8A 300F9A0A 76FF0C76 FF5016FC 46800280 ...F=.P.v..v..Õ0a,....=..u.Õ..6^ 000120
76FF0C76 FF0152E9 FF0A8688 00002AC4 9AA876FF AA76FF21 77FF2623 77FF260A .&.w#&.wl.v´.v´.6*......ÕR..v..v 000140
E9FF0A86 880007E9 03750000 30FF0A86 8908C483 2A672884 9A0676FF 0876FF0A ..v..v..Ç(g*.6.....=..u.Õ......Õ 000160
E90375D0 08000020 429A006A 006A006A 006A0124 68026E68 0676FF08 76FF012B +..v..v.hn.h$.j.j.j.j..B-...Àu.Õ 000180
8D096A25 77FF2627 77FF260A 5EC42177 FF262377 FF260A5E C459FF0E 86C6003B ;.6...Y6^.&.w#&.wl6^.&.w'&.wXj.. 0001A0
0876FF20 F508A59A 0005E903 7500FF0A 8E83FF0A 86890000 2DE09A50 16FF0E86 ....P.À-.......f...u.Õ...E.%-.v. 0001C0
0686C600 05E90375 D0080000 20679A00 6A006A00 6A006A01 24680264 680676FF .v.hd.h$.j.j.j.j..g-...Àu.Õ..6.. 0001E0
```

Dump of file SATURN:[PCCOMMON.DUMP.DLL]DA-NORM.DLL;1 on 18-APR-1990 10:39:14.45
File ID (391,21,0)   End of file block 51 / Allocated 52

Virtual block number 26 (0000001A), 512 (0200) bytes

```
E90375D0 0800002D 8C9A006A 006A006A 006A0124 68026868 0676FF08 76FF43FF .C.v..v.hh.h$.j.j.j.j...-...Àu.Õ 000000
00002D81 9A006A00 6A006A00 6A012468 026A6806 76FF0876 FF31FF06 86C60005 ..6...1.v..v.hj.h$.j.j.j.j..Ÿ-.. 000020
006A006A 006A006A 01246802 6C680676 FF0876FF 32FF0686 C60005E9 0375000B .Àu.Õ..6...2.v..v.hl.h$.j.j.j.j. 000040
260A5EC4 2177FF26 2377FF26 0A5EC433 FF0686C6 0005E903 75000800 0029C79A .û)...Àu.Õ..6...36^.&.w#&.wl6^.& 000060
E9037500 FF0A8E83 FF0A8689 000019D6 9A5016FF 06868D08 6A2577FF 262777FF .w'&.wX].......P.ø........f...u.Õ 000080
7E83D88E 2939881E 56570000 54C8C8C9 5F5E1F00 00E90000 8819E908 A59A0005 ...Ê.Õ.|..Õ...^_èüàT..WV.(9).Ã.- 0000A0
6A006AFF 6A006A01 6568027E 680676FF 0876FF00 DEE90A46 8800EFE9 0374010C ..t.Õÿ..F.Õ8..v..v.h-.he.j.j.j.j 0000C0
006A016A 68027E68 0676FF08 76FF0081 E90375FF AE7E83AE 46890000 2E589A00 ..X....FÜ.-Õ.u.Õ...v..v.h-.hj.j. 0000E0
80468D48 6A02AA68 0676FF08 76FFFE56 89FC4689 00002CE7 9A006A00 6AAE76FF .vÕj.j..Ó,...F=.V±.v..v.h¯.jK.F¯ 000100
0033E903 74000030 08C48329 68007C9A 50168046 8D017E68 1E000029 579A5016 .P.W)...h-..F¯.P.|.h).6.=..t.Õ3. 000120
AC468900 0028339A 50168046 8D026AFC 76FFFE76 FF2177FF 262377FF 260E5EC4 6^.&.w#&.wl.v±.v=j..F¯.P.3+...F¯ 000140
68016A01 6A006A0E 76FF1076 FF000028 CE9A5016 80468D02 AA680676 FF0876FF .v..v.h¯..F¯.P.ö(...v..v.j.j.j.h 000160
46880007 E9037500 003DAC46 8912C483 2C35083C 9A0676FF 0876FF02 8068027E -.h...v..v..<.5,.6..F¯=..u.Õ...F 000180
8801CBE9 0374010C 7E830000 E9FF1AE9 0375027E 3D0008E9 000EE901 E5E999AC ¯.Õ[.Õ..Õ..=-.u.Õ..Õ...-..t.Õù.. 0001A0
76FF0000 2F439A00 6A006A00 6A006A01 25680268 680676FF 0876FF01 A2E90A46 F.ÕÀ..v..v.hh.h%.j.j.j.j..C/...v 0001C0
026C6806 76FF0876 FF00002F 5C9A006A 006A006A 006A0125 68026A68 0676FF08 ..v.hj.h%.j.j.j.j..\/...v..v.hl. 0001E0
```

```
Dump of file SATURN:[PCCOMMON.DUMP.DLL]DA-NORM.DLL;1 on 18-APR-1990 10:39:14.45
File ID (391,21,0)   End of file block 51 / Allocated 52

Virtual block number 27 (0000001B), 512 (0200) bytes

 016A006A 01256802 64680676 FF0876FF 00002F75 9A006A00 6A006A00 6A012568 h%.j.j.j.j..u/...v..v.hd.h%.j.j. 000000
 006A006A 016A006A 01256802 68680676 FF0876FF 015EE900 002F919A 006A006A j.j.../..Ő^..v..v.hh.h%.j.j.j.j. 000020
 76FF0000 2FC39A00 6A006A00 6A006A01 2568026A 680676FF 0876FF00 002FAA9A .¯/...v..v.hj.h%.j.j.j.j..ú/...v 000040
 02646806 76FF0876 FF00002F DC9A006A 006A006A 006A0125 68026C68 0676FF08 ..v.hl.h%.j.j.j.j..É/...v..v.hd. 000060
 6A012568 02686806 76FF0876 FF00F7E9 00002FF8 9A006A00 6A006A00 6A012568 h%.j.j.j.j..%/..Ő%..v..v.hh.h%.j 000080
 006A006A 016A006A 01256802 6A680676 FF0876FF 00003011 9A006A00 6A006A00 .j.j.j...0...v..v.hj.h%.j.j.j.j. 0000A0
 76FF0000 30439A00 6A006A00 6A006A01 2568026C 680676FF 0876FF00 00302A9A .*0...v..v.hl.h%.j.j.j.j..C0...v 0000C0
 0676FF08 76FF0090 E9000030 5F9A006A 006A006A 006A0125 68026468 0676FF08 ..v.hd.h%.j.j.j.j.._0..Ő...v..v. 0000E0
 6A012568 026A6806 76FF0876 FF000030 789A006A 006A006A 006A0125 68026868 hh.h%.j.j.j.j..x0...v..v.hj.h%.j 000100
 006A006A 016A006A 01256802 6C680676 FF0876FF 00003091 9A006A00 6A006A00 .j.j.j...0...v..v.hl.h%.j.j.j.j. 000120
 29E90000 2E329A00 6A006A00 6A006A01 25680264 680676FF 0876FF00 0030AA9A .^0...v..v.hd.h%.j.j.j.j..2...Ő) 000140
 3DFF14E9 0375026A 3DFEB5E9 03750268 3DFE56E9 03750264 300023E9 0026E900 .Ő&.Ő#.=d.u.ŐV±=h.u.Őç±=j.u.Ő..= 000160
 FFFFFA46 C7D88E2E 0AB81E56 57000054 C8C8C95F 5E1FFFD7 E9FF73E9 0375026C l.u.Ős.Ős..^_èùàT..WV.¡...ÄúF*.. 000180
 E9037540 FA468900 0031289A 006A006A FF6A006A 0165680E 76FF1076 FF1276FF .v..v..v.he.j.j.j.j..(1...F*âu.Ő 0001A0
 89FC4689 000031AC 9A006A00 6AFA76FF 006A016A 680E76FF 1076FF12 76FF00C8 à..v..v..v.hj.j..v*j.j..¯1...F•. 0001C0
 8900002E A99A5016 AE468002 6AFC76FF FE76FF21 77FF2623 77FF2606 5EC4FE56 V±á^.&.w#&.wl.v±.v•j..FÛ.P.`.... 0001E0

Dump of file SATURN:[PCCOMMON.DUMP.DLL]DA-NORM.DLL;1 on 18-APR-1990 10:39:14.45
File ID (391,21,0)   End of file block 51 / Allocated 52

Virtual block number 28 (0000001C), 512 (0200) bytes

 2577FF26 2777FF26 065EC450 16FC4680 0080E9AC 46880006 E9037500 0030AC46 F¯=..u.Ő...F¯Ő...F•.Pá^.&.w'&.w% 000000
 0006E903 75000030 AC46892E DE31E79A 0676FF08 76FF37FF 260277FF 260A5EC4 á^.&.w.&.7.v..v..Ó1ß..F¯=..u.Ő.. 000020
 00002F2A 9A006A00 6AFA76FF 006A0163 680E76FF 1076FF12 76FF004A E9AC4688 .F¯ŐJ..v..v..v.hc.j..v*j.j..*/.. 000040
 06E90375 00003DAC 46890000 FFFF9AFC 76FFFE76 FF2177FF 262377FF 26065EC4 á^.&.w#&.wl.v±.v•......F¯=..u.Ő. 000060
 E7881E56 57000010 C8000ECA C95F5E1F 0000E900 0088FF16 E90009E9 AC468800 ..F¯Ő..Ő..¡..Ő...^_èò..à...WV.¡Ó 000080
 77FF2606 5EC4F646 89F84689 000088FC 4689FE46 89000088 0000F046 C7D88E30 0.ÄúFÞ..¡...F±.F•¡...F½.F-á^.&.w 0000A0
 26065EC4 0087E9FA 46880006 E9037500 0030FA46 890000FF FF9A5016 F24680 3F ?.F·.P......F*=..u.Ő...F*Ő..á^.& 0000C0
 FF0E76FF 1076FF21 77FF2623 77FF2606 5EC42177 FF262377 FF26065E C43F77FF .w?á^.&.w#&.wlá^.&.w#&.wl.v..v.. 0000E0
 8D5016F0 468DF276 FFF476FF 5016F646 8D37FF26 0277FF26 125EC40A 76FF0C76 v..v.á^.&.w.&.7.F-.P.v¶.v·.FÞ.P. 000100
 77FF2606 5EC40029 E9FA4688 0006E903 7500003D FA468900 00FFFF9A 5016FC46 F•.P......F*=..u.Ő...F*Ő).á^.&.w 000120
 00008800 06E9FA46 880006E9 03750000 3DFA4689 0000FFFF 9AF276FF F476FF3F ?.v¶.v·......F*=..u.Ő...F*Ő..¡.. 000140
 76FF0001 07C72606 5EC4D88E 31EF881E 56570000 0CC80010 CAC95F5E 1F0000E9 Ő...^_èò..à...WV.¡ÿ1.Äá^.&ú....v 000160
 06E90375 000030F8 46890000 2AE89A50 16FA4680 116A0A76 FF0C76FF 0E76FF10 ..v..v̄..v.j..F*.P.Ő*...F½=..u.Ő. 000180
 078826F4 5EC404F4 46830004 E9F65689 F44689FC 5688FA46 8B008EE9 F8468800 ..F½Ő...F*.V•.F¶.V-Ő...F¶.á^¶&.. 0001A0
 5016FE46 8D046A37 FF260277 FF26F45E C40E76FF 1076FF00 55E90375 02470B26 &.G.u.ŐU..v..v.á^¶&.w.&.7j..F±.P 0001C0
 00337B9A FA76FFFC 76FF0E76 FF1076FF 0017E903 7500003D F8468900 003148 9A .K1...F½=..u.Ő...v..v..v•.v*.(3. 0001E0

Dump of file SATURN:[PCCOMMON.DUMP.DLL]DA-NORM.DLL;1 on 18-APR-1990 10:39:14.45
File ID (391,21,0)   End of file block 51 / Allocated 52

Virtual block number 29 (0000001D), 512 (0200) bytes

 76FFFF98 E90003E9 000007C7 26065EC4 0008E903 7459FE7E 80002EE9 F8468800 ..F½Ő...~±Yt.Ő..á^.&ú...Ő..Ő...v 000000
 00015EC8 000CCAC9 5F5E1F00 00E90000 B800002B 0A9AFA76 FFFC76FF 0E76FF10 ..v..v•.v*..+..¡..Ő...^_èò..à^.. 000020
 8826125E C4FEBE96 89FEBC86 89235788 26214788 26125EC4 D88E32C2 B81E5657 WV.¡ô2.Äá^.&.GI&.W#..¥±¯.ƒ±á^.&. 000040
 9A5016FF 0E868D02 6A0E76FF 1076FF21 77FF2623 77FF2612 5EC4FEC0 86893F47 G7..â±á^.&.w#&.wl.v..v.j......P. 000060
 FF262377 FF26125E C402AEE9 FEA68688 0007E903 7500003D FEA68689 00003401 .4....Ì±=..u.Ő....Ì±ŐÛ.á^.&.w#&. 000080
 07E90375 00003DFE A6868900 0033319A 5016FEC2 8680026A 0A76FF0C 76FF2177 wl.v..v.j...ô±.P.13....Ì±=..u.Ő. 0000A0
 16FF0E86 8D08C483 343A0046 9A5016A6 468D5016 FEC28680 027DE9FE A6868800 ...Ì±Ő)...ô±.P.FÌ.P.F.:4.á...... 0000C0
 4689FA46 89000088 F44689F6 46890000 B808C483 2E830046 9A5016FF 5A868D50 P..Z..P.F....á.¡...F-.F¶¡...F*.F 0000E0
 8D5016F4 46800E76 FF1076FF 0A76FF0C 76FFFEBC B6FFFEBE 86FF0001 F246C7F8 %úF·...Ñ/±.Ñ¥±.v..v..v..v..F¶.P. 000100
 FEA68689 0000FFFF 9A016A50 16FEA886 8D5016A6 468D5016 FF5A868D 5016F846 F%.P..Z..P.FÌ.P..´±.PJ........Ì± 000120
 FFFF9A50 16FEB086 8DFEBCB6 FFFEBEB6 FF01F6E9 FEA68688 0007E903 7500003D =..u.Ő....Ì±Ő-..Ñ/±.Ñ¥±..¯±.P... 000140
 00FEAE86 C70001FE AC86C701 D0E9FEA6 86880007 E9037500 0030FEA6 86890000 ....Ì±=..u.Ő....Ì±ŐÄ.ú.¯±..ú.Ű±. 000160
 FEB29688 FEB08688 0000FEB6 86C70001 FEB486C7 FEB88689 FEBA8689 00008800 .¡....¤±..¡±ú.Ç±..ú.Ñ±....¯±..ý± 000180
 F476FFF6 76FFFEBC B6FFFEBE B6FF0000 FE46C700 01FC46C7 FEA49689 FEA28689 ..Ã±..Ê±úF•..úF±...Ñ/±.Ñ¥±.v-.v¶ 0001A0
 0165E9FE A6868800 07E90375 00003DFE A6868900 0035479A 5016FEB8 8680036A j...¡±.P.G5....Ì±=..u.Ő....Ì±Őe. 0001C0
 3DFEA686 89000035 759A5016 FEB0868D 046AF476 FFF676FF FEBCB6FF FEBEB6FF .Ñ/±.Ñ¥±.v-.v¶j...¯±.P.u5....Ì±= 0001E0
```

```
Dump of file SATURN:[PCCOMMON.DUMP.DLL]DA-NORM.DLL;1 on 18-APR-1990 10:39:14.45
File ID (391,21,0)   End of file block 51 / Allocated 52

Virtual block number 30 (0000001E), 512 (0200) bytes

 8680056A F476FFF6 76FFFEBC B6FFFEBE B6FF0137 E9FEA686 8B0007E9 03750000 ..u.Ö....Ì±Ö7..Ñ/±.Ñ¥±.v~.v¶j... 000000
 FEBEB6FF 0109E9FE A6868B00 07E90375 00003DFE A6868900 0035A39A 5016FEA2 Å±.P.È5....Ì±=..u.Ö....Ì±Ö...Ñ/± 000020
 03750000 30FEA686 89000035 019A5016 FEB4868D 036AF876 FFFA76FF FEBCB6FF .Ñ¥±.vª.v½j...Ç±.P.15....Ì±=..u. 000040
 5016FEAC 8680046A F876FFFA 76FFFEBC B6FFFEBE 86FF000B E9FEA686 8B0007E9 Ö....Ì±ÖÙ..Ñ/±.Ñ¥±.vª.v½j...¯±.P 000060
 FEBCB6FF FEBEB6FF 00ADE9FE A6868B00 07E90375 000030FE A6868900 0035FE9A .±5....Ì±=..u.Ö....Ì±ÖÙ..Ñ/±.Ñ¥± 000080
 86880007 E9037500 003DFEA6 86890000 2D169A50 16FC468D 056AF876 FFFA76FF .vª.v½j..F=.P..-....Ì±=..u.Ö.... 0000A0
 00003DFE A6868908 C4833183 369A9A06 76FF0876 FF5016FE BC868D00 80E9FEA6 Ì±Ö....¥±.P.v..v...6.1.á...Ì±=.. 0000C0
 00FEB286 C70001FE B086C700 3AE90374 00F27E83 0059E9FE A6868B00 07E90375 u.Ö....Ì±ÖY..~-.t.Ö:.ú.¯±..ú.ý±. 0000E0
 FEA68689 00003519 9A5016FE B0868D04 6AF476FF F676FFFE BCB6FFFE BEB6FF00 ..Ñ/±.Ñ¥±.v~.v¶j...¯±.P..5....Ì± 000100
 B8025789 26078926 FA5688F8 4688165E C40016E9 FEA68688 0007E903 7500003D =..u.Ö....Ì±Ö..á^..F½.Vª&..&.W.| 000120
 006A056A 0676FF08 76FFD88E 3394881E 56570000 0AC8CBC9 5F5E1F00 00E90000 ..Ö...^ èùà...WV.|.3.Ä.v..v.j.j. 000140
 A2068EFF FF683624 680676FF 0876FFF8 76FFFA76 FFFA5689 F8468900 00FFFF9A ......f%.Vª.vª.v½.v...v.h$6h....Â 000160
 FFFF9AFC 76FFFE76 FFF64689 00001B2C 9A0A76FF 0C76FF00 80680000 36FF2602 .&.6..h...v..v.,....F-.v±.v=... 000180
 8B034BE9 0E4688D8 8E36A2B8 1E565700 000AC8CB C95F5E1F 0000E9F6 46880000 ...F-Ö...^ èùà...WV.|Â6.Ä.F.ÖK.. 0001A0
 76FF006A 1076FF12 76FF0000 26889A10 76FF1276 FFF85689 F6468908 56880646 F..V..F-.V%.v..v...&...v..v.j..v 0001C0
 37679A50 52000605 F85688F6 46880085 681076FF 1276FF00 0026989A F676FFF8 ½.v~..&...v..v.h...F-.V½...RP.g7 0001E0

Dump of file SATURN:[PCCOMMON.DUMP.DLL]DA-NORM.DLL;1 on 18-APR-1990 10:39:14.45
File ID (391,21,0)   End of file block 51 / Allocated 52

Virtual block number 31 (0000001F), 512 (0200) bytes

 76FF1276 FF000037 829A5052 005205F8 5688F646 88008668 1076FF12 76FF0000 ...v..v.h...F-.V½.R.RP.ÿ7...v..v 000000
 01436800 84681076 FF1276FF 00003799 9A006A00 6A4C6A00 6A014368 00836810 .h..hC.j.jLj.j...7...v..v.h..hC. 000020
 52009E05 F85688F6 46880083 681076FF 1276FF00 0037E49A 006A006A 4C6A006A j.jLj.j..ä7...v..v.h...F-.V½...R 000040
 FF00002E BF9A5052 00EA05F8 5688F646 88008468 1076FF12 76FF0000 37CB9A50 P.ù7...v..v.h...F-.V½.Ö.RP.e.... 000060
 80E90000 BA000088 00003105 9A006A00 6A016A00 6A012568 00806810 76FF1276 v..v.h..h%.j.j.j.j...1..¡..¤..Ö. 000080
 6A012568 008D6810 76FF1276 FF0060E9 0A468800 86E90374 010C7E83 0281E902 .Ö...-..t.Ö...F.Öm..v..v.h..h%.j 0000A0
 006A006A 006A006A 01256800 8F681076 FF1276FF 00003831 9A006A00 6A016A00 .j.j.j..18...v..v.h..h%.j.j.j.j. 0000C0
 0038669A 006A006A 006A006A 01256800 8D681076 FF1276FF 004BE900 00384D9A .M8..ÖK..v..v.h..h%.j.j.j.j..f8. 0000E0
 0013E900 16E90000 38D79A00 6A006A01 6A006A01 2568008F 681076FF 1276FF00 ..v..v.h..h%.j.j.j.j..ø8..Ö..Ö.. 000100
 FF1276FF 0198E90A 468801EF E90000E9 FF88E903 75008F3D FF88E903 75008D3D =..u.Ö..=..u.Ö|.Ö..Öÿ..F.Ö...v.. 000120
 FF0188E9 000027B5 9A006A10 76FF1276 FFFE5689 FC468900 0038889A 006A1076 v.j..¡8...F=.V±.v..v.j..ç'..Ö... 000140
 006A0124 68008F68 1076FF12 76FFFE56 89FC4689 00002671 9A006A10 76FF1276 v..v.j..g&...F=.V±.v..v.h..h$.j. 000160
 FF1276FF 00000136 87C726FC 5EC4000A E9037500 08000037 809A006A 006A006A j.j.j...7...Àu.Ö..á^=&ú.6....v.. 000180
 00846810 76FF1276 FF000039 1E9A5052 009E05FE 5688FC46 884C6A00 83681076 v.h..jL.F=.V±...RP..9...v..v.h.. 0001A0
 26FC5EC4 37FF2602 77FF26FC 5EC40000 2E739A50 5200EA05 FE5688FC 46884C6A jL.F=.V±.Ö.RP.s...á^=&.w.&.7á^=& 0001C0
 0030FA46 89000039 999A5052 009E05FE 5688FC46 88026A01 38B7FF26 013AB7FF .ñ:.&.ñ8.j..F=.V±...RP..9...Fª=. 0001E0

Dump of file SATURN:[PCCOMMON.DUMP.DLL]DA-NORM.DLL;1 on 18-APR-1990 10:39:14.45
File ID (391,21,0)   End of file block 51 / Allocated 52

Virtual block number 32 (00000020), 512 (0200) bytes

 00398F9A 306A006A 017F681E 0180681E 1076FF12 76FF016A 006A001E E9037500 .u.Ö..j.j..v..v..h...h..j.j0.¢9. 000000
 FC468802 6A013CB7 FF26013E B7FF26FC 5EC437FF 260277FF 26FC5EC4 00C3E900 .Öû.á^=&.w.&.7á^=&.ñ>.&.ñ<.j..F= 000020
 FF1276FF 016A006A 001EE903 7500003D FA468900 0036689A 505200EA 05FE5688 .V±.Ö.RP.h6...Fª=..u.Ö..j.j..v.. 000040
 5200EA05 FE5688FC 46880071 E900002A 1C9A306A 006A01C5 681E01C6 681E1076 v..h6..hé.j.j0..*..Ög..F=.V±.Ö.R 000060
 FE5688FC 4688004D E90003E9 03750000 30FA4689 39FE3A85 9A1076FF 1276FF50 P.v..v...:±9.Fª=..u.Ö..ÖM..F=.V± 000080
 76FF0029 E90003E9 03750000 30FA4689 36C83A85 9A1076FF 1276FF50 52009E05 ...RP.v..v...:à6.Fª=..u.Ö..Ö)..v 0000A0
 75008830 FE83E903 75008730 0013E900 16E90019 E9000038 A89A006A 1076FF12 ..v.j..´8..Ö..Ö..Ö..=..u.Ö.±=..u 0000C0
 9A0676FF 0876FF0A 76FF0C76 FF0E76FF 1076FF12 76FF003B E9FFE7E9 FE58E903 .ÖX±ÖÖ.Ö;..v..v..v..v..v..v..v.. 0000E0
 E9037500 3B30FD8A E9037500 3030FE24 E9037500 2030001B E90027E9 00002877 w(..Ö'.Ö..= .u.Ö$±=0.u.Ö.»=;.u.Ö 000100
 8E3705B8 1E565700 022EC800 0ECAC95F 5E1F0000 E900008A 000088FF C5E9FC90 .=Öé.|..¤..Ö...^_èb..à...WV.|.7. 000120
 00008800 60E9FEFE 868BFEFE 86890000 FFFF9A50 16F00286 8D0A76FF 0C76FFD8 Ä.v..v...@».P.......±±..±±Ö`.|.. 000140
 80021C68 1E006CE9 08C4833A D800469A 5016FF00 86800206 681E0081 E900A8E9 Ö´.Ö...h.......P.F.Ä:.á.Öl..h... 000160
 83380200 469A5016 FF00868D 0244681E 0057E908 C4833AED 00469A50 16FF0086 ....P.F.Ü:.á.ÖW..hD......P.F..;. 000180
 94303D00 2AE9002D E908C483 34260046 9A5016FF 00868D02 5C681E00 42E908C4 á.ÖB..h\......P.F.&4.á.Ö-.Ö*.=0. 0001A0
 75C008FF C8E90375 943330FF 8BE90375 943230FF AEE90375 94313DFF A1E90375 u.ÖÀ.=1.u.ÖÙ.=2.u.ÖE.=3.u.Öà..áu 0001C0
 9A306A00 6A027868 1E5016FF 00868D06 76FF0876 FF016A00 6A0000E9 FF79E903 .Öy.Ö..j.j..v..v......P.hx.j.j0. 0001E0
```

```
Dump of file SATURN:[PCCOMMON.DUMP.DLL]DA-NORM.DLL;1 on 18-APR-1990 10:39:14.45
File ID (391,21,0)   End of file block 51 / Allocated 52

Virtual block number 33 (00000021), 512 (0200) bytes

 76FFD88E 3A8DB81E 56570001 00C80008 CAC95F5E 1F0000E9 FEFE868B 0000396D m9....±±Õ...^_èò..à...WV.¡.:.Ä.v 000000
 77FF2630 77FF260A 5EC4016A 006A39DA 3BB19A06 76FF0876 FF5016FF 0086800E ......P.v..v.¯Ý;Ö9j.j.á^.&.w=&.w 000020
 0ACAC95F 5E1F0000 E90000B8 00003B50 9A306A00 6A027968 1E5016FF 00868D3B ;.....P.hy.j.j0.P;..¡..Õ...^_èò. 000040
 0E76FF00 14E90375 00003000 00FFFF9A 0E76FFD8 8E3B6AB8 1E565700 0000C800 .à...WV.¡j;.Ä.v......=..u.Õ.¯.v. 000060
 3C020046 9A0A76FF 0C76FF02 7A681E00 26E90000 FFFF9A0A 76FF0C76 FF00FF68 h...v..v......Õ&..hz..v..v..F..< 000080
 5F5E1F00 00E90000 B808C483 3AC30000 9A0A76FF 0C76FF06 76FF0876 FF08C483 .á..v..v..v..v....Û:.á.¡..Õ...^_ 0000A0
 18010300 7E00013A 17010300 7D000136 E0010300 0000013B 80000200 2B0ACAC9 èò.+....;......Á6..)....:..~... 0000C0
 EE010300 87000139 03010300 86000137 4E010300 0000032D 2B000200 7F000138 8......+-......N7.......9......Ÿ 0000E0
 EE000202 5400082B 7F020302 C3000A29 81020300 8B00013B A0010300 07000136 6.......;.......)..Û....+..T...Ÿ 000100
 C2020336 FD000136 CB000500 13000126 A9010300 0000063B B9000200 0000053B ;.......¿;......`&......Ù6..»6..ô 000120
 9E020300 1F000138 95010300 1E000137 35010300 19000136 B1010302 61000831 1..•...Ý6......57.......8....... 000140
 47020301 FD00070C 6C020302 6E00083B C1020301 04000533 D0020302 D8000A3A :..Ä...Á3......è;..n...l...»...G 000160
 89020302 7C00083B DA020301 8B000600 90020300 B300013A 50010301 12000539 9......P:..°..........Ö;..|.... 000180
 BB010302 F200083A AE020301 1E000532 E2020302 09000718 D7020300 9F00042A *.......■.......â2......Ü4..·...£ 0001A0
 75020301 2A00052B CC020308 3A000337 22020302 19000702 90020300 45000126 &..E...........“7..:...ë+..*...u 0001C0
 17000501 44000533 4D020302 9C000932 17020301 34000506 84020302 90000932 2..........4....2......M3..D.... 0001E0

Dump of file SATURN:[PCCOMMON.DUMP.DLL]DA-NORM.DLL;1 on 18-APR-1990 10:39:14.45
File ID (391,21,0)   End of file block 51 / Allocated 52

Virtual block number 34 (00000022), 512 (0200) bytes

 00000002 3E000834 88020302 AE000932 98020302 3100082A 4602031E CE00011B ...ö...F*..1....2..Õ....4..>.... 000000
 FFFF0134 9A0A76FF 0C76FF10 76FF000F E90E4688 D88EFFFF B81E5657 000006C8 à...WV.¡...Ä.F.ÕÕ..v..v..v..4... 000020
 07892602 47892600 00B80A5E C400FAE9 00008A00 01B80103 E999FA46 8BFA4689 .Fª.Fª.Õ..¡..¤..Õª.á^.¡..&.G.&.. 000040
 76FF00CF E90000BA 00008802 57892607 8926065E C4305788 26384788 26FC5EC4 á^=&.G;&.W=á^.&..&.W.¡..¤..ÕÜ..v 000060
 9A016A00 6A505299 10468B1D AE683977 FF26FC5E C4000000 C19A5016 FC468010 ..F=.P.è...á^=&.w9hÛ..F..RPj.j.. 000080
 00B80000 FFFF9A00 6A1076FF 0000FFFF 9A3B77FF 263D77FF 26FC5EC4 0000FFFF ....á^=&.w=&.w;......v.j......¡. 0000A0
 5016FC46 8D1076FF 0075E900 00BA0000 B8000107 C7260A5E C40086E9 0000BA00 .¤..Õ..á^.&ú...¡..¤..Õu..v..F=.P 0000C0
 0A76FF0C 76FF0E76 FF1076FF 0050E900 00FFFF9A 3F77FF26 FC5EC400 00FFFF9A .....á^=&.w?.....ÕP..v..v..v..v. 0000E0
 11E90375 10033DFF 31E90375 10013D00 33E9003F E90000FF FF9A0676 FF0876FF .v..v......Õ7.Õ3.=...u.Õ1.=..u.Õ. 000100
 12E90375 1D843DFF 8EE90375 1D803DFF 4DE90375 1DAD3DFF AFE90375 10043DFF .=..u.Õ£.=Ù.u.ÕM.=¯.u.Õ..=Ç.u.Õ. 000120
 D88E0008 B81E5657 00000EC8 000CCAC9 5F5E1F00 00E90000 BA0000B8 FFB0E9FF .Õ¯.¡..¤..Õ...^_èò..à...WV.¡...Ä 000140
 FC5EC400 00FFFF9A 5016FC46 8D416A3D 6AF276FF 0000FFFF 9A5016F2 468D026A j..F·.P......v·]=jA.F=.P.....á^= 000160
 FF00469A FC76FFFE 76FFFC77 FF26FE77 FF26065E C4040646 833F4789 26F2468B .F·&.G?.F..á^.&.w±&.w=.v±.v=.F.. 000180
 FFFF68FF FF68016A 006A016A 006A2147 89262347 89260000 B8FC5EC4 08C483FF ..á.á^=¡..&.G#&.G!j.j.j.j.h..h.. 0001A0
 FC5EC4FA 5689F846 890000FF FF9AFC76 FFFE76FF 02BC6800 0036FF26 02A4068E ..Ê.&.6..h¥..v±.v=......F½.Vªá^= 0001C0
 FFFF9A00 6A006A00 15E90374 FA4608F8 46883057 89263B47 8926FA56 88F8468B .F½.Vª&.G;&.W=.F½.Fªt.Õ..j.j.... 0001E0

Dump of file SATURN:[PCCOMMON.DUMP.DLL]DA-NORM.DLL;1 on 18-APR-1990 10:39:14.45
File ID (391,21,0)   End of file block 51 / Allocated 52

Virtual block number 35 (00000023), 512 (0200) bytes

 FF0A76FF 0000FFFF 9AF876FF FA76FF0A 76FF0035 E9F4468B F65689F4 46890000 ...F¶.V-.F¶Õ5..v..vª.v½......v.. 000000
 00008800 00FFFF9A 50520039 05FE568B FC46880A 76FF0000 FFFF9AFC 76FFFE76 v±.v=......v..F=.V±.9.RP.....¡.. 000020
 01009001 03015400 06009A02 03007A00 01018301 03001206 CAC95F5E 1F0000E9 Õ...^_èò.....°...z.......T...... 000040
 05017F00 02016000 0600E702 03000000 02001E00 02000000 01019800 02007C00 .|....................Ó...‘...... 000060
 01019E00 05016F00 06008002 03000800 02014802 03000000 06013C00 02000000 .....<.......H...........o...... 000080
 06006702 03002800 02015902 03017A00 0601F802 03001900 0200CD02 03000000 .....ë.......½...z...Y...(...g.. 0000A0
 00000000 0000F300 0101DE01 0301C200 06021902 03018100 06020602 03019E00 .........Ÿ.......ô...B...µ...... 0000C0
 16EA468D 0676FF08 76FF0A76 FF016A00 00E846C7 D88EFFFF B81E5657 000018C8 à...WV.¡...ÄúFÒ..j..v..v..v..Fõ. 0000E0
 FF9A5016 F8468DEA 76FFEC76 FF004E08 A59A0005 E9037500 003D0000 FFFF9A50 P.....=..u.Õ...Ê.N..vš.võ.F½.P.. 000100
 FF0000FF FF9A0288 681EEA76 FFEC76FF 008608A5 9A0005E9 03750000 3D0000FF ...=..u.Õ...Ê....vš.võ.h........ 000120
 037500E8 7E83E846 890000FF FF9A5016 FC468D18 6AF876FF FA76FFEA 76FFEC76 vš.võ.vª.v½j..F=.P......FÒ.-Ò.u. 000140
 89FE568B FC468823 57892621 478926EC 5688EA46 88065EC4 00F708A5 9A0005E9 Õ...E.¥.á^..Fõ.Vš&.GI&.W#.F=.V±. 000160
 8326065E C40157E9 03750247 08260788 26FC5EC4 04FC4683 0004E9F6 5689F446 F¶.V-Õ...F=.á^=&..&.G.u.ÕW.á^.&. 000180
 468D096A 37FF2602 77FF26FC 5EC4EA76 FFEC76FF 4EEE46C6 0031E903 7401207F .-.t.Õ1.áFŸN.vš.võá^=&.w.&.7j..F 0001A0
 3F77FF26 065EC401 4008A59A 0005E903 7500E87E 83E84689 0000FFFF 9A5016EE Ÿ.P......FÒ.-Ò.u.Õ...Ê.ə.á^.&.w? 0001C0
 47892606 5EC40257 88260788 26FC5EC4 0000FFFF 9A505200 35050856 88064688 .F..V..5.RP.....á^=&..&.W.á^.&.G 0001E0
```

```
Dump of file SATURN:[PCCOMMON.DUMP.DLL]DA-NORM.DLL;1 on 18-APR-1990 10:39:14.45
File ID (391,21,0)   End of file block 51 / Allocated 52

Virtual block number 36 (00000024), 512 (0200) bytes

03809A06 76FF0876 FF000031 47C72606 5EC40000 2F47C726 065EC427 57892625 X&.W'á^.&úG/..á^.&úG1...v..v.... 000000
0003E903 74012F7F 8326065E C401BC08 A59A0005 E9037500 E87E83E8 46890151 Q..FÒ.-Ò.u.Õ...E.¥.á^.&../.t.Õ.. 000020
46803577 FF263777 FF26065E C40000FF FF9A3577 FF263777 FF26065E C400AFE9 ÕE.á^.&.w7&.w5.....á^.&.w7&.w5.F 000040
57892625 478926F2 568BF046 88065EC4 005FE903 74000030 0000FFFF 9A5016F0 Þ.P.....=..t.Õ_.á^..FÞ.V·&.GX&.W 000060
468901CD 03809A06 76FF0876 FF000031 47C72606 5EC40000 2F47C726 065EC427 'á^.&úG/..á^.&úG1...v..v....ë..F 000080
26065EC4 0010E903 74012F7F 8326065E C4FFFF08 A59A0005 E9037500 E87E83E8 Ò.-Ò.u.Õ...E...á^.&../.t.Õ..á^.& 0000A0
C40000FF FF9A3577 FF263777 FF26065E C4FF84E9 0000FFFF 9A3577FF 263777FF .w7&.w5.....Õ..á^.&.w7&.w5.....á 0000C0
FF9AF476 FFF676FF EA76FFEC 76FFFE96 E90003E9 0003E903 74012F7F 8326065E ^.&../.t.Õ..Õ..Õ.±.vê.võ.v-.v¶.. 0000E0
14C8C8C9 5F5E1F00 00FFFF9A EA76FFEC 76FF0000 FFFF9AEA 76FFEC76 FF0000FF ....vê.võ......vê.võ......^_èùà. 000100
FFFF9A50 16F6468D 156A0A76 FF0C76FF 0E76FF10 76FFD88E 0008881E 56570000 ..WV.|...Ã.v..v..v..v.j..F-.P... 000120
6A0A76FF 0C76FF0E 76FF1076 FF0113E9 F4468800 06E90375 000030F4 46890000 ...F¶=..u.Õ...F¶Õ...v..v..v..v.j 000140
88FA4688 00EAE9F4 46880006 E9037500 0030F446 89000000 739A5016 FA468013 ..F'.P.s....F¶=..u.Õ...F¶Õõ..F'. 000160
F05EC40E 76FF1076 FF00B8E9 03750247 08260788 26F05EC4 F25689F0 4689FC56 V=.FÞ.V·á^Þ&..&.G.u.Õ|..v..v.á^Þ 000180
76FF0017 E9037500 0030F446 890000FF FF9A5016 FE468004 6A37FF26 0277FF26 &.w.&.7j..F±.P......F¶=..u.Õ...v 0001A0
76FF006A E9037459 FE7E8000 91E9F446 88000003 329AFA76 FFFC76FF 0E76FF10 ..v..v=.v'.2....F¶Õ...~±Yt.Õj..v 0001C0
000030F4 46890000 025E9A50 16EC468D 086A37FF 260277FF 26F05EC4 0E76FF10 ..v.á^Þ&.w.&.7j..Fš.P.^....F¶=.. 0001E0
```

```
Dump of file SATURN:[PCCOMMON.DUMP.DLL]DA-NORM.DLL;1 on 18-APR-1990 10:39:14.45
File ID (391,21,0)   End of file block 51 / Allocated 52

Virtual block number 37 (00000025), 512 (0200) bytes

88EC4688 004AE9F4 46880000 037C9AFA 76FFFC76 FF0E76FF 1076FF00 17E90375 u.Õ...v..v..v=.v'.|....F¶ÕJ..Fš. 000000
065EC400 08E90001 07C72606 5EC40008 E90375F8 56390008 E90374F6 4639EE56 VŸ9F-t.Õ..9V¼u.Õ..á^.&ú...Õ..á^. 000020
0000021F 9AFA76FF FC76FF0E 76FF1076 FFFF39E9 04F04683 0007E900 0007C726 &ú...Õ...FÞ.Õ9..v..v..v=.v'..... 000040
2377FF26 065EC4D8 8E024688 1E565700 000EC800 0CCAC95F 5E1F0000 E9000088 |..Õ...^_èò..à...WV.|F..Ãá^.&.w# 000060
7E83F646 89000003 EA9A5016 F4468008 6A2577FF 262777FF 26065EC4 2177FF26 &.w|á^.&.w'&.wXj..F¶.P.õ....F-.- 000080
FF262777 FF26065E C42177FF 262377FF 26065EC4 03FD08A5 9A0005E9 037500F6 -.u.Õ...E.».á^.&.w#&.w|á^.&.w'&. 0000A0
C4042F08 A59A0005 E9037500 F67E83F6 46890000 02CF9A50 16F8468D 096A2577 wXj..F%.P.ü....F-.--.u.Õ...E./.á 0000C0
0003169A 5016FC46 8D156A25 77FF2627 77FF2606 5EC42177 FF262377 FF26065E ^.&.w#&.w|á^.&.w'&.wXj..F=.P.... 0000E0
E90000B8 0006E903 74FE4608 FC468800 3108A59A 0005E903 7500003D F6468900 ..F-=..u.Õ...E.1..F=.F±t.Õ..|..Õ 000100
FFFF9A50 16F2468D 2577FF26 2777FF26 065EC421 77FF2623 77FF2606 5EC4045C \.á^.&.w#&.w|á^.&.w'&.wX.F·.P... 000120
263077FF 26065EC4 016A006A 0063E903 744EF87E 80006CE9 037401F2 7E830000 ...-·.t.Õl..-¥Nt.Õc.j.j.á^.&.w=& 000140
000005F2 9A0676FF 0876FF01 2C680000 36FF2602 A6068EFF FF68FFFF 683B77FF .w;h..h....Î.&.6..h,..v..v..·... 000160
00880006 E9037401 2F7F8326 065EC405 0708A59A 0005E903 7500F67E 83F64689 .F-.--.u.Õ...E...á^.&../.t.Õ..|. 000180
FF262377 FF26065E C403C7E9 00008800 06E90374 01317F83 26065EC4 030AE900 .ÕÕ.á^.&..1.t.Õ..|..Õú.á^.&.w#&. 0001A0
7500003D F6468900 00041D9A 5016FC46 8D156A25 77FF2627 77FF2606 5EC42177 w|á^.&.w'&.wXj..F=.P......F-=..u 0001C0
77FF2606 5EC40384 E9000088 0006E903 74FE4608 FC468805 7A08A59A 0005E903 .Õ...E.z..F=.F±t.Õ..|..Õ..á^.&.w 0001E0
```

```
Dump of file SATURN:[PCCOMMON.DUMP.DLL]DA-NORM.DLL;1 on 18-APR-1990 10:39:14.45
File ID (391,21,0)   End of file block 51 / Allocated 52

Virtual block number 38 (00000026), 512 (0200) bytes

037500F2 7E830000 045E9A50 16F2468D 2577FF26 2777FF26 065EC421 77FF2623 #&.w|á^.&.w'&.wX.F·.P.^....-·.u. 000000
6A2577FF 262777FF 26065EC4 2177FF26 2377FF26 065EC403 55E90000 B80006E9 Õ..|..ÕU.á^.&.w#&.w|á^.&.w'&.wXj 000020
26065EC4 05A008A5 9A0005E9 037500F6 7E83F646 89000005 9A9A5016 F4468008 ..F¶.P......F-.--.u.Õ...E.Ù.á^.& 000040
46890000 03B79A50 16F8468D 096A2577 FF262777 FF26065E C42177FF 262377FF .w#&.w|á^.&.w'&.wXj..F%.P.ñ....F 000060
6CE90374 43F47E80 0009E903 7543F47E 8003CA08 A59A0005 E9037500 F67E83F6 -.--.u.Õ...E.ò..-¶Cu.Õ...-¶Ct.Õl 000080
8EFFFF68 0484683B 77FF2630 77FF2606 5EC4016A 006A0063 E903744E F87E8000 ..-¥Nt.Õc.j.j.á^.&.w=&.w;h..h... 0000A0
E9037500 F67E83F6 46890000 FFFF9A06 76FF0876 FF019068 000036FF 2602A606 .Î.&.6..h...v..v.......F-.--.u.Õ 0000C0
7F832606 5EC40284 E9000088 0006E903 74012F7F 8326065E C4065D08 A59A0005 ...E.].á^.&../.t.Õ..|..Õ..á^.&.. 0000E0
262777FF 26065EC4 2177FF26 2377FF26 065EC402 71E90000 B80006E9 03740131 1.t.Õ..|..Õq.á^.&.w#&.w|á^.&.w'& 000100
8806A108 A59A0005 E9037500 0030F646 89000007 AC9A5016 FC468D15 6A2577FF .wXj..F=.P.¯....F-=..u.Õ...E.À.. 000120
FF26065E C42177FF 262377FF 26065EC4 022EE900 00880006 E90374FE 4608FC46 F=.F±t.Õ..|..Õ..á^.&.w#&.w|á^.&. 000140
A59A0005 E9037500 F67E83F6 46890000 06C19A50 16F4468D 086A2577 FF262777 w'&.wXj..F¶.P.è....F-.--.u.Õ...E 000160
5016F846 8D096A25 77FF2627 77FF2606 5EC42177 FF262377 FF26065E C406D408 .å.á^.&.w#&.w|á^.&.w'&.wXj..F%.P 000180
77FF2623 77FF2606 5EC40705 08A59A00 05E90375 00F67E83 F6468900 0007EF9A .ÿ....F-.--.u.Õ...E...á^.&.w#&.w 0001A0
E9037500 F67E83F6 46890000 FFFF9A50 16FA4680 2577FF26 2777FF26 065EC421 |á^.&.w'&.wX.F'.P......F-.--.u.Õ 0001C0
E9037431 F47E8000 09E90375 43F47E80 007EE903 7500FA7E 83076608 A59A0005 ...E.f..-'.u.Õ-..-¶Cu.Õ...-¶1t.Õ 0001E0
```

Dump of file SATURN:[PCCOMMON.DUMP.DLL]DA-NORM.DLL;1 on 18-APR-1990 10:39:14.45
File ID (391,21,0)   End of file block 51 / Allocated 52

Virtual block number 39 (00000027), 512 (0200) bytes

```
FFFF6808 68683877 FF263077 FF26065E C4016A00 6A0063E9 03744EF8 7EB0006C l..-½Nt.Õc.j.j.á^.&.w=&.w;hk.h.. 000000
037500F6 7E83F646 89000008 839A0676 FF0876FF 022C6800 0036FF26 02A6068E ..Ì.&.6..h,..v..v.......F-.--.u. 000020
8326065E C40123E9 00008800 06E90374 012F7F83 26065EC4 07BE08A5 9A0005E9 Õ...Ê./.á^.&../.t.Õ..¡..Õ#.á^.&. 000040
2777FF26 065EC421 77FF2623 77FF2606 5EC40110 E90000B8 0006E903 7401317F .1.t.Õ..¡..Õ..á^.&.w#&.wlá^.&.w' 000060
080208A5 9A0005E9 03750000 3DF64689 000004F5 9A5016FC 4680156A 2577FF26 &.w%j..F=.P.%....F-=..u.Õ...Ê... 000080
26065EC4 2177FF26 2377FF26 065EC400 CDE90000 B80006E9 0374FE46 0BFC468B .F=.F±t.Õ..¡..Õë.á^.&.w#&.wlá^.& 0000A0
9A0005E9 037500F6 7E83F646 89000008 229A5016 F4468D08 6A2577FF 262777FF .w'&.w%j..F¶.P."....F-.--.u.Õ... 0000C0
16F8468D 096A2577 FF262777 FF26065E C42177FF 262377FF 26065EC4 083508A5 Ê.5.á^.&.w#&.wlá^.&.w'&.w%j..F½. 0000E0
0012E903 7543F47E 80089608 A59A0005 E9037500 F67E83F6 46890000 05679A50 P.g....F-.--.u.Õ...Ê....-¶Cu.Õ.. 000100
C4016A00 6A0030E9 03744EF8 7E800046 E9037432 F47E8000 09E90375 31F47E80 .-¶1u.Õ...-¶2t.ÕF..-½Nt.Õ=.j.j.á 000120
FF0876FF 02886800 0036FF26 02A6068E FFFF6805 DA683877 FF263077 FF26065E ^.&.w=&.w;hÒ.h....Ì.&.6..h...v.. 000140
5E1F0000 E90000B8 04AF08A5 9A0005E9 037500F6 7E83F646 89000004 9C9A0676 v.......F-.--.u.Õ...Ê.£.¡..Õ...^ 000160
92681E02 A0681E01 6A006A01 6A006AD8 8E0395B8 1E565700 0000C800 04CAC95F _èò..à...WV.¡...Äj.j.j.j..h...h. 000180
00010753 01030000 00010738 0002001A 90C8C95F 5E1F0000 FFFF9A20 6A006A02 ¯j.j ......^_èù.....;.......S... 0001A0
000108C6 01030073 00040184 02030000 00030605 000200E2 0005003F 0203007D )...?...ã................s...ó... 0001C0
000608AD 000208F7 000105D0 000515F6 0001073E 000501DD 00070536 0203008B ....6...Ì...>...-...Ì...½...Ù... 0001E0
```

Dump of file SATURN:[PCCOMMON.DUMP.DLL]DA-NORM.DLL;1 on 18-APR-1990 10:39:14.45
File ID (391,21,0)   End of file block 51 / Allocated 52

Virtual block number 40 (00000028), 512 (0200) bytes

```
0005068E 02030087 0004010C 020301EC 000706F2 020300F6 0005064B 02030000 ....K...-...·...ã............... 000000
00050022 0203011E 00050287 02030112 000500E4 02030092 000401FB 02030104 ....«.......õ..............."... 000020
0005022A 0203004E 0004016F 02030144 000502E8 0203008E 0005005B 02030080 ¯...[.../...Š...D...o...N...*... 000040
000401E8 02030005 00050235 0203265C 0001086E 00050156 00010487 000500CA ò.......V...n...\&..5...f...Ò... 000060
01C80001 881F0000 3E89D88E FFFFB81E 00000000 00000000 00000000 0000005F _................¡...Ä.>...¡..ù. 000080
FFFFB9C0 33067EC4 1EDE88D7 88EC8855 00000000 00000000 00000700 02000200 ¯...............U.ã.¤.B.ó-.3à¿.. 0000A0
01C6F706 4688FE87 08468ED8 8EC08CF9 2BD1F7AE F2FFFFB9 0A7EC4FF 758DAEF2 ·Ò.u.ó-.¿..·Ù%l+ª.à.Ä.F..±.F.%ó. 0000C0
76C51EDE 88D788EC 8855C85D C28C1FFA 88F388A4 F3C913A5 F3E9D149 A4027400 .t.Êl lÕµÊ.èµÊ.µ.ª..ô]ùU.ã.¤.B.év 0000E0
13A5F3E9 D149A402 7401A8C7 88067EC4 D1F7AEF2 FFFFB9C0 33C08ED8 8CFE8B0A ..±.Ä.à3à¿..·Ù%ló-..ú .t.Êl lÕµÊ. 000100
F2FFFFB9 C0330A7E C40676C5 1EDE88D7 88EC8855 C850C28C 1FFA88F3 88A4F3C9 èµÊ.µ.ª..ô]ùU.ã.¤.B.év.ó-.3à¿..· 000120
00000000 00000000 000000CB 5DFA88F3 881FFFFF 1DC01805 74A6F3F9 2BD1F7AE Ù%l+ªµlt..à.....µ.ª]ù.......... 000140
732D7020 6120726F 20657475 62697274 7461206E 61207265 68746945 00000000 ....Either an attribute or a p-s 000160
20612065 74616572 63206F74 20646574 63656C65 73206562 20747375 6D207465 et must be selected to create a  000180
00000031 736E6F69 74634165 7A696C61 6D726F4E 73736563 6F725000 2E79656B key..ProcessNormalizeActions1... 0001A0
74737560 20657475 62697274 74612067 6E697461 65706572 20410000 00000000 ......A repeating attribute must 0001C0
6341657A 696C6160 726F4E73 7365636F 7250002E 64657463 656C6573 20656220  be selected..ProcessNormalizeAc 0001E0
```

Dump of file SATURN:[PCCOMMON.DUMP.DLL]DA-NORM.DLL;1 on 18-APR-1990 10:39:14.45
File ID (391,21,0)   End of file block 51 / Allocated 52

Virtual block number 41 (00000029), 512 (0200) bytes

```
696D7265 74656420 65726F6D 20726F20 656E4F00 00000000 00003273 6E6F6974 tions2.......One or more determi 000000
2065726F 6D20726F 20656E6F 20646E61 20736574 75626972 74746120 746E616E nant attributes and one or more  000020
6C657320 65622074 73756D20 73657475 62697274 74612074 6E65646E 65706564 dependent attributes must be sel 000040
0035736E 6F697463 41657A69 6C616D72 6F4E7373 65636F72 50002E64 65746365 ected..ProcessNormalizeActions5. 000060
64206120 646E6120 746E616E 696D7265 74656420 61206874 6F420000 00000000 ......Both a determinant and a d 000080
63656C65 73206562 20747375 6D206574 75626972 74746120 746E6564 6E657065 ependent attribute must be selec 0000A0
00000038 736E6F69 74634165 7A696C61 6D726F4E 73736563 6F725000 2E646574 ted..ProcessNormalizeActions8... 0000C0
68742072 6F662065 6D616E20 64696C61 76206120 7265746E 65206573 61656C50 Please enter a valid name for th 0000E0
2D706968 7372656E 74726170 20732779 7469746E 65206C61 6E696769 726F2065 e original entity's partnership- 000100
20656061 6E206469 6C617620 61207265 746E6520 65736165 6C500000 2E746573 set...Please enter a valid name  000120
70696873 72656E74 72617020 73277974 69746E65 2077656E 20656874 20726F66 for the new entity's partnership 000140
20656854 002E676E 6F6C206F 6F742073 6920656D 616E2065 6854002E 7465732D -set..The name is too long..The  000160
74636172 61686320 64696C61 766E6920 6E612073 6E696174 6E6F6320 6560616E name contains an invalid charact 000180
6E206F4E 002E7365 63617073 206C6C61 20736920 6560616E 20656854 002E7265 er..The name is all spaces..No n 0001A0
7245206C 6D440000 002E6465 69666963 65707320 6E656562 20736168 20656061 ame has been specified....Dml Er 0001C0
00217475 6F20776F 6C42204C 4D440065 7A696C61 6D726F4E 00206E69 20726F72 ror in .Normalize.DML Blow out!. 0001E0
```

```
Dump of file SATURN:[PCCOMMON.DUMP.DLL]DA-NORM.DLL;1 on 18-APR-1990 10:39:14.45
File ID (391,21,0)   End of file block 51 / Allocated 52

Virtual block number 42 (0000002A), 512 (0200) bytes

00000000 00000000 00000000 00000000 000702A6 00020001 02A402A2 FFFF0000 ....Â.È.....1................... 000000
00641400 009000A4 000F0001 00000004 00000000 FFFF0001 000E0352 000000E5 Í...R....................È.....d. 000020
00240006 80020002 00B8001A 00030000 00000000 00B4FFFF 02BC0039 00A40063 c.È.9.¥...Ç...........ì........$. 000040
0026000A 000F8002 04000003 00050003 00000000 0000FFFF FFFF028E 000A008B ..../................È..........&. 000060
000C0026 000A003F 80020000 00090006 00030000 00000000 FFFFFFFF 02C0000C ..à...............\.....?...&... 000080
02C4000C 0026000A 006F8002 010000E0 00040003 00000000 0000FFFF FFFF02C2 ò...............Â.....o...&...á. 0000A0
6469736E 6F636552 00000003 006C6564 6F6D2065 7A696C61 6D726F4E FFFFFFFF ....Normalize model.....Reconsid 0000C0
006C6563 6E614300 2E2E2E4B 4F00736B 72616D20 657A696C 616D726F 6E207265 er normalize marks.OK....Cancel. 0000E0
00000000 FFFF0001 000E0352 00000275 00000000 00000000 00000000 706C6548 Help............u...R........... 000100
00000000 01E8FFFF 012C009E 015A0031 00339400 009001D0 00170001 0000000E ........Á.....3.1.Z....,...Ò..... 000120
00000000 0000FFFF FFFF012E 00080019 008C0005 80000001 01EC0007 00050000 ......å......................... 000140
00050000 00000000 FFFFFFFF 01300008 0122008C 00218000 000001F4 00080006 ....¶.....!....".....O.......... 000160
00090005 00000000 0000FFFF FFFF015A 005B0150 00280005 80010002 01FD0000 ..».......(.P.[.Z................ 000180
02150000 00060000 00000000 FFFFFFFF 01540008 002E006E 000D8000 00010208 .........n....T................. 0001A0
00010216 000A0005 00000000 0000FFFF FFFF0156 000800A5 006E0041 80020008 ....A.n.È...V................... 0001C0
80020001 02210000 00070000 00000000 FFFFFFFF 013A0008 002B005E 00008000 ....^.+...:................!..... 0001E0

Dump of file SATURN:[PCCOMMON.DUMP.DLL]DA-NORM.DLL;1 on 18-APR-1990 10:39:14.45
File ID (391,21,0)   End of file block 51 / Allocated 52

Virtual block number 43 (0000002B), 512 (0200) bytes

00898000 00010222 00100005 00000000 0000FFFF FFFF013E 00300092 002D000D ..-...0.>...............".....¿. 000000
002D0089 80020001 02330000 00070000 00000000 FFFFFFFF 013C0008 004C005E ^.L...<...............3.....¿.-. 000020
00920019 00058003 00020234 001E0003 00000000 0000FFFF FFFF0140 00300092 ..0.à...............4........... 000040
000C0026 0009003C 80030400 02530005 00030000 00000000 FFFFFFFF 0134000A ..4.................S.....<...&... 000060
0138000C 004C000A 006C8002 00000259 000F0003 00000000 0000FFFF FFFF014A J...............Y.....l...L...8. 000080
FFFF014C 000C0026 000A00C2 80020000 02690006 00030000 00000000 FFFFFFFF ..............i.....ò...&...L... 0000A0
FFFFFFFF 014E000C 0026000A 00F28002 01000270 00040003 00000000 0000FFFF ..............p.......&...N..... 0000C0
69746E45 00000003 00796568 20796669 63657073 203A2065 7A696C61 6D726F4E Normalize : specify key.....Enti 0000E0
6E207965 4B007965 68206120 79666963 65705300 656D616E 74736574 00207974 ty .testname.Specify a key.Key n 000100
65732070 69687372 656E7472 61500000 73657475 62697274 74410000 3A656D61 ame:..Attributes..Partnership se 000120
7A696C61 6D726F6E 20796C65 74617571 65646120 73612068 72614D7E 00007374 ts..~Mark as adequately normaliz 000140
006C6563 6E614300 2E2E2E79 7469746E 65207478 654E7E00 2E2E2E4B 4F006465 ed.OK....~Next entity....Cancel. 000160
00000000 FFFF0001 000E0352 000003A4 00000000 00000000 00000000 706C6548 Help............È...R........... 000180
00000000 02A3FFFF 01900083 017C001A 001E9400 00900284 001E0001 00000014 .................|.°.....È..... 0001A0
00000000 0000FFFF FFFF0192 00080018 00A00005 80010001 02A70006 00050000 ......1......................... 0001C0
00050000 00000000 FFFFFFFF 01940009 015200A0 00208000 000002AE 00000006 ....Ò.....  ...R................ 0001E0

Dump of file SATURN:[PCCOMMON.DUMP.DLL]DA-NORM.DLL;1 on 18-APR-1990 10:39:14.45
File ID (391,21,0)   End of file block 51 / Allocated 52

Virtual block number 44 (0000002C), 512 (0200) bytes

00040003 00000000 0000FFFF FFFF01C8 00180008 00820005 80010002 02AF001B ..È.........Â...à............... 000000
02D00004 00030000 00000000 FFFFFFFF 01A0000A 00200086 00648002 000302C8 Ù.....d... ....................Â. 000020
00030205 00040003 00000000 0000FFFF FFFF01A2 000A0020 0086008E 80020003 ........ ...Â...............Í.... 000040
80020003 02DA000F 00030000 00000000 FFFFFFFF 01A4000A 00200086 00888002 ..|.. ...È.................Ö.... 000060
00058001 000202EA 001C0005 00000000 0000FFFF FFFF019C 000A0050 0086000A ....P..................ô....... 000080
0068000A 80000001 03070010 00050000 00000000 FFFFFFFF 01CA0058 01740025 %.t.X.ò.........................h. 0000A0
00FC0068 00588002 000C0318 00000006 00000000 0000FFFF FFFF019F 0008004A J.........................X.h.=. 0000C0
00080086 005A008E 80000001 0319002C 00050000 00000000 FFFFFFFF 01C90008 ..è..................../.Z.Ñ... 0000E0
01BA0030 00A00028 000A8002 00000346 00000007 00000000 0000FFFF FFFF01BC ¥...............F........(...0.¤. 000100
FFFF01B0 00080056 005A000A 80000001 03470013 00050000 00000000 FFFFFFFF ................G.......Z.V...¯... 000120
FFFFFFFF 01B80030 00A00028 008E8002 0001035B 00000007 00000000 0000FFFF ............[.....f.(...0.|..... 000140
0000FFFF FFFF01A6 000A009A 00190005 80030002 035C001E 00030000 00000000 ..........\..............Í...... 000160
00000000 FFFFFFFF 01B6000C 0026000A 00698003 0000037B 00060003 00000000 ........{.....i...&...Ñ......... 000180
00000000 0000FFFF FFFF01C6 000C0026 000A0037 80020400 03820005 00030000 ...........7...&...ó............ 0001A0
00030000 00000000 FFFFFFFF 01C4000C 004C000A 00988002 00000388 000F0003 ..............L...á............ 0001C0
00040003 00000000 0000FFFF FFFF0184 000C0026 000A00EE 80020000 03980006 ........Y...&...Ç............... 0001E0
```

```
Dump of file SATURN:[PCCOMMON.DUMP.DLL]DA-NORM.DLL;1 on 18-APR-1990 10:39:14.45
File ID (391,21,0)   End of file block 51 / Allocated 52

Virtual block number 45 (0000002D), 512 (0200) bytes

 6F742065 7A696C61 6D726F4E FFFFFFFF 01B2000C 0026000A 011E8002 0100039F ..........&...ý.....Normalize to 000000
 53000079 7469746E 45000000 03006D72 6F66206C 616D726F 6E205453 52494620  FIRST normal form.....Entity..S 000020
 00464E31 7E006D72 6F66206C 616D726F 6E20746E 65727275 63207966 69636570 pecify current normal form.-1NF. 000040
 66696365 70530064 657A696C 616D726F 6E20747E 6F4E0046 4E337E00 464E327E -2NF.-3NF.No-t normalized.Specif 000060
 7469746E 65207765 4E007365 74756269 72747461 20676E69 74616570 65722079 y repeating attributes.New entit 000080
 20746165 70657220 74616874 20736574 75626972 74744100 003A6560 616E2079 y name:..Attributes that repeat  0000A0
 676E6974 61657065 52000065 74756269 72747461 206E6573 6F686320 68746977 with chosen attribute..Repeating 0000C0
 20796C65 74617571 65646120 7361206B 72614D7E 00006574 75626972 74746120  attribute..-Mark as adequately  0000E0
 6E652074 78654E7E 002E2E2E 4B4F0079 6C707041 7E006465 7A696C61 6D726F6E normalized.-Apply.OK....-Next en 000100
 00000000 00000000 00000000 00706C65 48006C65 636E6143 002E2E2E 79746974 tity....Cancel.Help............. 000120
 00239400 00900248 001F0001 00000012 00000000 FFFF0001 000E0352 0000034C L...R...................H.....#. 000140
 00960005 80010001 026C0006 00050000 00000000 026BFFFF 022C00A3 01720027 '.r.È.,...h...........l......... 000160
 01480096 00218000 00000273 00000006 00000000 0000FFFF FFFF01F6 00080019 ....-...............s.....|...H. 000180
 00140005 007D0006 80010002 0274001B 00050000 00000000 FFFFFFFF 01F80008 ..½...............t.......).ƒ... 0001A0
 0206000A 00200080 008C8002 00030290 00040003 00000000 0000FFFF FFFF023C <........................ ..... 0001C0
 FFFF0208 000A0020 00800084 80020003 02950004 00030000 00000000 FFFFFFFF ....................Ç... ....... 0001E0

Dump of file SATURN:[PCCOMMON.DUMP.DLL]DA-NORM.DLL;1 on 18-APR-1990 10:39:14.45
File ID (391,21,0)   End of file block 51 / Allocated 52

Virtual block number 46 (0000002E), 512 (0200) bytes

 FFFFFFFF 0200000A 004E0080 000A8002 0003029A 000F0003 00000000 0000FFFF .......................N......... 000000
 0000FFFF FFFF0204 000A0020 00800064 80020003 02AA0004 00030000 00000000 ..........ˆ.....d... ........... 000020
 00000000 FFFFFFFF 023E004C 0168002D 00058001 000202AF 00200005 00000000 ...... .€.......-.h.L.>......... 000040
 00000000 0000FFFF FFFF0214 00080056 0066000A 80000001 02D00014 00050000 ......Å.......f.V............... 000060
 00050000 00000000 FFFFFFFF 021A0032 00AA0032 000A8002 000002E5 00000007 ....Ì.......2.ˆ.2............... 000080
 00000007 00000000 0000FFFF FFFF0218 00080085 006600BE 80000001 02E6001C ..Ì...../.f..................... 0000A0
 0304001E 00030000 00000000 FFFFFFFF 021C0032 00AA0032 00BE8002 00000303 ....../.2.ˆ.2................... 0000C0
 00000323 00060003 00000000 0000FFFF FFFF020A 000A009A 001E0005 80030002 ............................#... 0000E0
 80020400 032A0005 00030000 00000000 FFFFFFFF 0226000C 0026000A 00658003 ..e...&...&...............*..... 000100
 00958002 00000330 000F0003 00000000 0000FFFF FFFF0242 000C0026 000A0035 5...&...B...............0....... 000120
 000A00EB 80020000 03400006 00030000 00000000 FFFFFFFF 0240000C 004C000A ..L...@...............@.....$... 000140
 0026000A 011B8002 01000347 00040003 00000000 0000FFFF FFFF0228 000C0026 &...(...............G.........&. 000160
 6D726F6E 20444E4F 43455320 6F742065 7A696C61 6D726F4E FFFFFFFF 022A000C ..*.....Normalize to SECOND norm 000180
 72727563 20796669 63657053 00007974 69746E45 00000003 006D726F 66206C61 al form.....Entity..Specify curr 0001A0
 6E20747E 6F4E0046 4E337E00 464E327E 006D726F 66206C61 6D726F6E 20746E65 ent normal form.-2NF.-3NF.No-t n 0001C0
 6B2D6C61 69747261 70207966 69636570 5300464E 317E0064 657A696C 616D726F ormalized.-1NF.Specify partial-k 0001E0

Dump of file SATURN:[PCCOMMON.DUMP.DLL]DA-NORM.DLL;1 on 18-APR-1990 10:39:14.45
File ID (391,21,0)   End of file block 51 / Allocated 52

Virtual block number 47 (0000002F), 512 (0200) bytes

 20657475 62697274 74612D69 746C754D 00736569 636E6564 6E657065 64207965 ey dependencies.Multi-attribute  000000
 6B206E65 736F6863 20656874 20666F20 73746E65 6E6F706D 6F430000 73796568 keys..Components of the chosen k 000020
 7A696C61 6D726F6E 20796C65 74617571 65646120 7361206B 72614D7E 00007965 ey..-Mark as adequately normaliz 000040
 002E2E2E 79746974 6E652074 78654E7E 002E2E2E 4B4F0079 6C707041 7E006465 ed.-Apply.OK....-Next entity.... 000060
 00000000 FFFF0001 000E0352 00000284 00000000 00706C65 48006C65 636E6143 Cancel.Help.........R........... 000080
 00000000 01F7FFFF 032000A3 015E0025 00079400 009001D0 00260001 0000000E ......&.Å.......%.^.È. ...¥..... 0000A0
 00000000 0000FFFF FFFF0322 00080019 00960005 80010001 01FB0006 00050000 ......«.............".......... 0000C0
 00050000 00000000 FFFFFFFF 0324000C 01360094 00218000 00000202 00000006 ..........|...6...$............. 0000E0
 00000006 00000000 0000FFFF FFFF0326 00080012 00870005 80010001 02030003 ................&............... 000100
 02080012 00050000 00000000 FFFFFFFF 0328000C 01380085 001A8000 00000207 ..........8...(................. 000120
 00010218 00180005 00000000 0000FFFF FFFF0348 00640154 001E0005 80010002 ........T.d.H................... 000140
 80020000 02370000 00070000 00000000 FFFFFFFF 032C0008 00820057 000A8000 ....W....,................7..... 000160
 00B48000 40010238 00350005 00000000 0000FFFF FFFF0332 003200A0 0023000A ..#...2.2.............5.8..@..Ç. 000180
 002300B2 80020001 026E0000 00070000 00000000 FFFFFFFF 032E0010 008B0057 W......................n.....ý.#. 0001A0
 0026000A 00718003 0400026F 00020003 00000000 0000FFFF FFFF0336 003200A0 ..2.6...............o.....q...&. 0001C0
 000C0026 000A00A1 80020000 02720006 00030000 00000000 FFFFFFFF 0338000C ..8...............r.....À...&... 0001E0
```

```
Dump of file SATURN:[PCCOMMON.DUMP.DLL]DA-NORM.DLL;1 on 18-APR-1990 10:39:14.45
File ID (391,21,0)   End of file block 51 / Allocated 52

Virtual block number 48 (00000030), 512 (0200) bytes

 033E000C 0026000A 00018002 01000279 00040003 00000000 0000FFFF FFFF033A :...............y.....!...&...>. 000000
 FFFF034A 0008001D 006E000A 80010001 027E0004 00050000 00000000 FFFFFFFF ..............~.......n.....J... 000020
 FFFFFFFF 034C0008 0128006E 00298002 00080283 00000006 00000000 0000FFFF ..................).n.(...L..... 000040
 6160726F 6E20444E 4F434553 206F7420 79746974 6E652065 7A696C61 6D726F4E Normalize entity to SECOND norma 000060
 20796669 63657053 00007965 48000079 7469746E 45000000 03006D72 6F66206C l form.....Entity..Key..Specify  000080
 6F706D6F 63207965 6B20746E 616E6960 72657465 44007974 69746E65 2077656E new entity.Determinant key compo 0000A0
 69646E65 70656420 796C6C75 66207365 74756269 72747441 00003A73 746E656E nents:..Attributes fully dependi 0000C0
 4F00003A 746E616E 69607265 74656420 6E65736F 68632065 6874206E 6F20676E ng on the chosen determinant:..O 0000E0
 00000000 00000000 00000000 0000656D 614E0070 6C654800 6C65636E 6143004B K.Cancel.Help.Name.............. 000100
 00109400 00900284 001E0001 00000014 00000000 FFFF0001 000E0352 000003A4 É...R........................... 000120
 00A50005 80010001 02A70006 00050000 00000000 02A3FFFF 02880085 017C001A ..|.ç.....È...........Ï.......É. 000140
 015100A5 00218000 000002AE 00000006 00000000 0000FFFF FFFF025A 00080018 ....Z...............Û.....!.É.Q. 000160
 00140004 008C0005 80010002 02AF001B 00050000 00000000 FFFFFFFF 025C000A ..\...............£.........å... 000180
 026C000A 0020008E 00AD8002 000302CB 00040003 00000000 0000FFFF FFFF02A0 ..................Ù.....Ù... ...l. 0001A0
 FFFF0264 000A0050 008E000A 80020003 02D0000F 00030000 00000000 FFFFFFFF ...............Å.........P...d... 0001C0
 FFFFFFFF 0268000A 0023008E 005F8002 000302E0 00040003 00000000 0000FFFF ...........Å....._...#...h..... 0001E0

Dump of file SATURN:[PCCOMMON.DUMP.DLL]DA-NORM.DLL;1 on 18-APR-1990 10:39:14.45
File ID (391,21,0)   End of file block 51 / Allocated 52

Virtual block number 49 (00000031), 512 (0200) bytes

 0000FFFF FFFF026A 000A0020 008E0087 80020003 02E50004 00030000 00000000 ..........!......... ...j....... 000000
 00000000 FFFFFFFF 02A2005A 0172002D 00058001 000202EA 001F0005 00000000 ........õ.......-.r.Z.Å......... 000020
 00000000 0000FFFF FFFF02A8 0008001C 0073000A 80000001 030A0004 00050000 ..............s.....´........... 000040
 00050000 00000000 FFFFFFFF 02AA0008 01280073 00298002 0008030F 00000006 ..........).s.(...˙............. 000060
 00000007 00000000 0000FFFF FFFF0278 00080086 0064000A 80000001 0310001F ..........d.....x............... 000080
 03310029 00050000 00000000 FFFFFFFF 027E0032 00A00032 000A8002 00000330 0.......2...2.~..............).1. 0000A0
 0001035B 00000007 00000000 0000FFFF FFFF027C 000800B1 006400BE 80000001 ..../.d.Ÿ...|...............[... 0000C0
 80030002 035C001E 00030000 00000000 FFFFFFFF 02800032 00A00032 00B08002 ..§.2...2................\..... 0000E0
 00628003 0000037B 00060003 00000000 0000FFFF FFFF026E 000A0099 001E0006 .........n...............(.....b. 000100
 000A0032 80020400 03820005 00030000 00000000 FFFFFFFF 0282000C 0026000A ..&.........................2... 000120
 004C000A 00928002 00000388 000F0003 00000000 0000FFFF FFFF02A4 000C0026 &...Ê.........................L. 000140
 000C0026 000A00E8 80020000 03980006 00030000 00000000 FFFFFFFF 02A6000C ..Î.....................Ò...&... 000160
 0286000C 0026000A 01188002 0100039F 00040003 00000000 0000FFFF FFFF0284 ...........................&..... 000180
 6F66206C 6160726F 6E204452 49485420 6F742065 7A696C61 6D726F4E FFFFFFFF ....Normalize to THIRD normal fo 0001A0
 6E20746E 65727275 63207966 69636570 53000079 7469746E 45000000 03006D72 rm.....Entity..Specify current n 0001C0
 0064657A 696C616D 726F6E20 747E6F4E 00464E33 7E006D72 6F66206C 6160726F ormal form.~3NF.No~t normalized. 0001E0

Dump of file SATURN:[PCCOMMON.DUMP.DLL]DA-NORM.DLL;1 on 18-APR-1990 10:39:14.45
File ID (391,21,0)   End of file block 51 / Allocated 52

Virtual block number 50 (00000032), 512 (0200) bytes

 70656420 65766974 69736E61 72742079 66696365 70530046 4E327E00 464E317E ~1NF.~2NF.Specify transitive dep 000000
 6E6F6E20 2C657461 6E696D72 65746544 0000656D 614E0073 6569636E 65646E65 endencies.Name..Determinate, non 000020
 6C6C7566 20736574 75626972 74744100 00736574 75626972 74746120 7965682D -key attributes..Attributes full 000040
 7261407E 00006574 616E6960 72657465 64206E6F 20676E69 646E6570 65642079 y depending on determinate..~Mar 000060
 6C707041 7E006465 7A696C61 6D726F6E 20796C65 74617571 65646120 7361206B k as adequately normalized.~Appl 000080
 48006C65 636E6143 002E2E2E 79746974 6E652074 78654E7E 002E2E2E 484F0079 y.OK....~Next entity....Cancel.H 0000A0
 00000000 FFFF0001 000E0352 000002AA 00000000 00000000 00000000 00706C65 elp.............˙...R........... 0000C0
 00000000 01C6FFFF 00800055 01300063 00559400 019001B2 00130001 0000000D .........ÿ.....U.c.0.U.....ó..... 0000E0
 00000000 0000FFFF FFFF0082 00080030 00460005 80000001 01CA000F 00050000 ......ò.......F.=................ 000100
 00050000 00000000 FFFFFFFF 00850008 0077003C 00058000 000101DA 00380005 ..8.Ö.......<.w.................. 000120
 003F0005 00000000 0000FFFF FFFF0091 0008002F 00460084 80000001 0213000A ........Ç.F./.................?. 000140
 025E0015 00050000 00000000 FFFFFFFF 00860008 0078003C 00848000 0001021E ......Ç.<.x.....................^. 000160
 00C0274 00040006 00000000 0000FFFF FFFF0081 0008005E 002D0005 80010001 ......-.^....................t... 000180
 00010002 02790005 00050000 00000000 FFFFFFFF 00830008 00740020 00078002 .... .t.....................y..... 0001A0
 008A8002 0003027F 00040003 00000000 0000FFFF FFFF008C 001E0023 001E0087 ....#........................... 0001C0
 0020008A 80020003 02840004 00030000 00000000 FFFFFFFF 00800008 001B002B +............................ . 0001E0
```

```
Dump of file SATURN:[PCCOMMON.DUMP.DLL]DA-NORM.DLL;1 on 18-APR-1990 10:39:14.45
File ID (391,21,0)   End of file block 51 / Allocated 52

Virtual block number 51 (00000033), 512 (0200) bytes

00540020 00848001 00010289 00130005 00000000 0000FFFF FFFF008F 0009001B ........................Ç.-.T. 000000
00080074 00200086 8002000C 02900004 00060000 00000000 FFFFFFFF 00920008 ......................Ñ. .t... 000020
0087000C 0026000A 00608003 040002A2 00020003 00000000 0000FFFF FFFF0084 ...............Å.....m...&..... 000040
FFFF0089 000C0026 000A009D 80020000 02A50004 00030000 00000000 FFFFFFFF ..............É.........&....... 000060
6E696769 724F0000 00030070 6968736E 6F697461 6C655220 65746165 7243FFFF ..Create Relationship.....Origin 000080
20202020 20202020 20202020 20202020 20202020 20200079 7469746E 65206C61 al entity.                       0000A0
20202020 20202020 20202020 20202020 20202020 20202020 20202020 20202020                                  0000C0
20202020 20202020 20202020 20202020 20200079 7469746E 65207765 4E002020   .New entity.                   0000E0
20202020 20202020 20202020 20202020 20202020 20202020 20202020 20202020                                  000100
73207069 68737265 6E747261 7020606F 72460020 20202020 20202020 20202020             .From partnership-s 000120
74726170 206F5400 313A317E 00407E3A 31007265 64724F00 74786554 003A7465 et:.Text.Order.1:~M.~1:1.To part 000140
00000000 00000070 6C654800 484F0074 78655400 3A746573 20706968 7372656E nership-set:.Text.OK.Help....... 000160
00000000 00000000 00000000 00000000 00000000 00000000 00000000 00000000 ................................ 000180
00000000 00000000 00000000 00000000 00000000 00000000 00000000 00000000 ................................ 0001A0
00000000 00000000 00000000 00000000 00000000 00000000 00000000 00000000 ................................ 0001C0
00000000 00000000 00000000 00000000 00000000 00000000 00000000 00000000 ................................ 0001E0

Dump of file SATURN:[PCCOMMON.DUMP.DLL]DA-XPORT.DLL;1 on 18-APR-1990 10:39:21.68
File ID (400,27,0)   End of file block 81 / Allocated 84

Virtual block number 1 (00000001), 512 (0200) bytes

00000000 00000040 00000000 00000088 0000FFFF 00000004 00000050 01E65A4D MZ!.P...........|.......ə....... 000000
00000080 00000000 00000000 00000000 00000000 00000000 00000000 00000000 ................................ 000020
6F6E6E61 63206061 72676F72 70207369 685421CD 4C018821 CD098400 0EBA1F0E ..¤..Ç.ël|.LëlThis program canno 000040
00000000 00000024 0A0D0D2E 65646F60 20534F44 206E6920 6E757220 65622074 t be run in DOS mode....$........ 000060
00090007 00000000 00030000 00000000 00068002 8E0DC77F 00070202 0505454E NE.......ú...................... 000080
00000000 00000000 00010001 00040000 00000289 00A50093 007C0078 00400010 ..ə.x.|...É..................... 0000A0
43F80F00 43F8037C 00140F00 00140379 01E20F00 01E20353 32040F00 3204002A *..2...2S.â...â.y.......|.«C..«C 0000C0
2D616408 02580004 011D1E81 011D0A00 25200F01 237C07C6 02120E01 00000000 ........ó.|#.. %....Ý.....X..da- 0000E0
1100E700 CB00A100 10000A00 01000001 54524F50 58454144 08000074 726F7078 xport...DAEXPORT.........Å.ù.ó.. 000100
4555514C 4D44136C 6D64034E 49574D50 05534C4C 4143534F 44080001 37011F01 ...7...DOSCALLS.PMWIN.dml.DMLQUE 000120
0D454D41 4E4C4544 4F4D5952 4555514C 4D441145 4C444E41 484C4544 4F4D5952 RYMODELHANDLE.DMLQUERYMODELNAME. 000140
534C4D44 08444C45 49465952 4555514C 4D440054 4E554F43 59524555 514C4D44 DMLQUERYCOUNT.DMLQUERYFIELD.DMLS 000160
314E4C52 59524555 514C4D44 0C444C52 59524555 514C4D44 0C444C52 49465445 ETFIELD.DMLQUERYRLN.DMLQUERYRLN1 000180
45524C4D 44084449 4C4D4459 52455551 4C4D4400 5453494C 45455246 4C4D4408 .DMLFREELIST.DMLQUERYDMLID.DMLRE 0001A0
5447124C 4F4F5457 4F444E49 57595245 55514954 47124954 47035458 45544441 ADTEXT.GTI.GTIQUERYWINDOWTOOL.GT 0001C0
4449524D 41441265 66646972 6D616408 52545041 54414458 55415952 45555149 IQUERYAUXDATAPTR.damridfe.DAMRID 0001E0

Dump of file SATURN:[PCCOMMON.DUMP.DLL]DA-XPORT.DLL;1 on 18-APR-1990 10:39:21.68
File ID (400,27,0)   End of file block 81 / Allocated 84

Virtual block number 2 (00000002), 512 (0200) bytes

45544F4E 41444544 4F434544 4D414412 6D616403 474E4952 54534441 4F4C4546 FELOADSTRING.dam.DAMDECODEDANOTE 000000
524C4C54 55095455 44034352 5345544F 4E414445 444F4345 444D4144 1244574B KWD.DAMDECODEDANOTESRC.DUT.UTLLR 000020
4F495303 31324F54 3133454D 414E5455 4C414E41 1054554C 414E4106 444E554F OUND.ANALUT.ANALUTNAME31TO21.SIO 000040
4552534F 44074554 49525753 4F440845 534F4C43 534F4408 4E45504F 534F4407 .DOSOPEN.DOSCLOSE.DOSWRITE.DOSRE 000060
00000000 00000000 00004C4C 442E7472 6F70782D 61640C00 00000001 01014441 AD........da-xport.DLL.......... 000080
FF000216 89260000 A3260856 88064688 2214068E D88EFFFF 881E5657 000114C8 à...WV.|...Ä...".F..V.&È..&..... 0000A0
FF368688 0007E903 7500003D FF368689 0000FFFF 9A5016FF 04868D0E 76FF1076 v..v.......P........6.=..u.ö....6. 0000C0
9A501684 46800042 681E08C4 83006202 DA9A5016 84468D0A 76FF0C76 FF1411E9 ö...v..v..F..P.ö.b..6..h8..F..P. 0000E0
06060826 0004A126 2216068E 00061689 260004A3 26221606 8E08C483 FFFF0210 .....&....."&È..&......."&Å..&... 000100
6A08C483 00A902DA 9A501684 46800A76 FF0C76FF 13C8E900 01880006 E9037400 .t.ö..|..öà..v..v..F..P.ö.`..6.j 000120
C626FF2E 9EC4FF2E 86FFFF30 9689FF2E 868906C4 8300CE03 289A5016 84468D2E ..F..P.(.ö..6........0......&..&6 000140
5102109A 50168446 8D004868 1E08C483 00DF0294 9A501684 46800044 681E0007 ...hD..F..P...Ö..6..hH..F..P...Q 000160
0374000A 06082600 08A12622 18068E00 0A168926 0008A326 2218068E 08C48300 ..6....."&È..&........"&Å..&....t. 000180
8E04C483 01402CF5 9A000436 FF260006 36FF2622 16068E13 4BE90001 880006E9 ö..|..öK....."&.6..&.6....%,ə..6.. 0001A0
2BF89A0E 76FF1076 FFFF0486 FFFF0686 FF026A00 0436FF26 000636FF 26221606 .."&.6..&.6..j...Ñ...Ñ...v..v..½+ 0001C0
0000FFFF 9A5016FE FC868018 6AFF04B6 FFFF0686 FF0E76FF 1076FF0E C48301D8 Ä..6..v..v..Ñ...Ñ..j....=±.P..... 0001E0
```

```
Dump of file SATURN:[PCCOMMON.DUMP.DLL]DA-XPORT.DLL;1 on 18-APR-1990 10:39:21.68
File ID (400,27,0)   End of file block 81 / Allocated 84

Virtual block number 3 (00000003), 512 (0200) bytes

000636FF 26221606 8E004A68 1E12E1E9 FF36868B 0007E903 75000030 FF368689 ..6.=..u.Õ....6.ÕÄ..hJ....^&.6.. 000000
9A000836 FF26000A 36FF2622 18068E00 56681E08 C48301A2 02449A00 0436FF26 &.6...D.Ä..á..hV....^&.6..&.6... 000020
0826078B 26FEEC9E C4FEEE96 89FEEC86 89FEFE96 8BFEFC86 8B08C483 009A0244 D....á...=±..±±..ã±..Ý±á.ã±&..&. 000040
16068E04 C4830201 2CF59A00 0436FF26 000636FF 26221606 8E0370E9 03750247 G.u.Õp....^&.6..&.6...%,....á.... 000060
839A0E76 FF1076FF 37FF2602 77FF26FE EC9EC402 6A000436 FF260006 36FF2622 ^&.6..&.6..j.á.ã±&.w.&.7.v..v... 000080
26FEEC9E C4036A12 3BE9FF36 86880007 E9037500 0030FF36 86890EC4 83022F2C ,/..á...6.=..u.Õ....6.Õ;.j.á.ã±& 0000A0
36FF2600 0636FF26 2216068E 0AC48302 582A7B9A 0E76FF10 76FF37FF 260277FF .w.&.7.v..v..(*X..á....^&.6..&.6 0000C0
16068E0E C4830281 28789A0E 76FF1076 FF37FF26 0277FF26 FEEC9EC4 066A0004 ..j.á.ã±&.w.&.7.v..v..x+...á.... 0000E0
B79A0E76 FF1076FF 37FF2602 77FF26FE EC9EC407 6A000436 FF260006 36FF2622 ^&.6..&.6..j.á.ã±&.w.&.7.v..v..Ñ 000100
9A5016FF 4C868D08 6A37FF26 0277FF26 FEEC9EC4 0E76FF10 76FF0EC4 8303472B +G..á..v..v.á.ã±&.w.&.7j...L..P. 000120
32868900 68B80074 E9FF349E 8CFF3286 890062B8 0057E99B FF4C868A 00000366 f.....L..ÕW.|b...2...4.Õt.|h...2 000140
349E8CFF 32868900 70B80058 E9FF349E 8CFF3286 89006CB8 0066E9FF 349E8CFF ...4.Õf.|l...2...4.ÕX.|p...2...4 000160
002EE9FF 349E8CFF 32868900 7888003C E9FF349E 8CFF3286 89007488 004AE9FF .ÕJ.|t...2...4.Õ<.|x...2...4.Õ.. 000180
03750034 3DFFB8E9 03750033 30FFB5E9 03750032 3DFFAFE9 03750031 30002BE9 Õ+.=1.u.Õ£.=2.u.Õç.=3.u.Õ£.=4.u. 0001A0
FF34B6FF 000436FF 26000636 FF262216 068EFFC4 E9FF81E9 03750043 3DFFC1E9 Õé.=C.u.Õ..Õá....^&.6..&.6...Ñ4. 0001C0
B0096A37 FF260277 FF26FEEC 9EC40E76 FF1076FF 08C483FF FF2D269A FF32B6FF .Ñ2..&-...á..v..v.á.ã±&.w.&.7j.. 0001E0

Dump of file SATURN:[PCCOMMON.DUMP.DLL]DA-XPORT.DLL;1 on 18-APR-1990 10:39:21.68
File ID (400,27,0)   End of file block 81 / Allocated 84

Virtual block number 4 (00000004), 512 (0200) bytes

E9FF349E 8CFF3286 89007EB8 000EE903 7459FF4C BE800000 FFFF9A50 16FF4C86 .L..P....../L.Yt.Õ..|~...2...4.Õ 000000
32868900 85B80008 E9FF349E 8CFF3286 890082B8 000EE903 744EFF4C BE800023 #../L.Nt.Õ..|....2...4.Õ..|....2 000020
04002026 9AFF32B6 FFFF34B6 FF000436 FF260006 36FF2622 16068EFF 349E8CFF ...4....^&.6..&.6...Ñ4..Ñ2..&-.. 000040
6A37FF26 0277FF26 FEEC9EC4 0E76FF10 76FFFF08 8689FF0A 86890000 8B08C483 .á.|...........v..v.á.ã±&.w.&.7j 000060
FF0AB6FF 026A0004 36FF2600 0636FF26 2216068E 0000FFFF 9A5016FF 08868D0F ......P........^&.6..&.6..j..Ñ.. 000080
86880007 E9037500 003DFF36 86890EC4 8305112C 839A0E76 FF1076FF FF0886FF .Ñ...v..v...,...á...6.=..u.Õ.... 0000A0
A09A5016 FF52868D 0A6A37FF 260277FF 26FEEC9E C40E76FF 1076FF10 2FE9FF36 6.Õ/..v..v.á.ã±&.w.&.7j...R..P.. 0000C0
05DA5688 D8468800 00FF4286 C700C8FF 4086C700 00DA46C7 01900846 C7000002 ...úFÄ..úFÖ..ú.@.à.ú.B....FÄ.VÖ. 0000E0
89FF7486 89000283 011805FF 429688FF 408688FF 7A9689FF 78868900 02830118 ...@...x...z...@...B.....@...t.. 000100
8F9A5016 FC468D50 16FF5286 8DFF7886 FFFF7A86 FFFF5286 FFFF5486 FFFF7696 .v..ÑT..ÑR..Ñz..Ñx...R..P.F=.P.¢ 000120
FF9A5016 FC468D50 16FF5686 8DFF7486 FFFF7686 FFFF5686 FFFF5886 FF000004 ....ÑX..Ñv..Ñv..Ñt...V..P.F=.P.. 000140
000636FF 26221606 8E008868 1EFF5286 FFFF5486 FFFF5686 FFFF5886 FF0000FF ....ÑX..Ñv..ÑT..ÑR..h.....^&.6.. 000160
EC9EC40E 6A000436 FF260006 36FF2622 16068E10 C4830575 02449A00 0436FF26 &.6...D.u..á....^&.6..&.6..j.á.ã 000180
FF260277 FF26FEEC 9EC40EC4 83052A2B F89A0E76 FF1076FF 37FF2602 77FF26FE ±&.w.&.7.v..v..½+*..á.á.ã±&.w.&. 0001A0
FFFF04B6 FFFF0686 FFFC80E9 04FEEC86 8308C483 05481864 9A0E76FF 1076FF37 7.v..v..d.H..á...ã±.Õ.=.Ñ...Ñ... 0001C0
0EF4E9FF 36868800 07E90375 00003DFF 36868908 C48305AE 1DFF9A0E 76FF1076 v..v....0..á...6.=..u.Õ....6.Õ¶. 0001E0

Dump of file SATURN:[PCCOMMON.DUMP.DLL]DA-XPORT.DLL;1 on 18-APR-1990 10:39:21.68
File ID (400,27,0)   End of file block 81 / Allocated 84

Virtual block number 5 (00000005), 512 (0200) bytes

9688FEFC 868808C4 83060802 449A0004 36FF2600 0636FF26 2216068E 008F681E .h.....^&.6..&.6...D....á...=±.. 000000
FF26FEEC 9EC40034 E9037502 47082607 8B26FEEC 9EC4FEEE 9689FEEC 8689FEFE ±±..ã±..Ý±á.ã±&..&.G.u.Õ4.á.ã±&. 000020
8B0007E9 03750000 3DFF3686 8908C483 050F21C0 9A0E76FF 1076FF37 FF260277 w.&.7.v..v..ãlÕ..á...6.=..u.Õ... 000040
4123739A 0E76FF10 76FFFF04 B6FFFF06 B6FFFF8C E904FEEC 86830E8E E9FF3686 .6.Õ....ã±.Õ¥..Ñ...Ñ...v..v..s#A 000060
000636FF 26221606 8E009A68 1E0E61E9 FF36868B 0007E903 75000030 08C48306 ..á.=..u.Õ....6.Õa..h......^&.6.. 000080
EC9EC4FE EE9689FE EC8689FE FE9688FE FC868808 C4830672 02449A00 0436FF26 &.6...D.r..á...=±..±±..ã±..Ý±á.ã 0000A0
C69A0E76 FF1076FF 37FF2602 77FF26FE EC9EC400 30E90375 02470826 078B26FE ±&..&.G.u.Õ0.á.ã±&.w.&.7.v..v..6 0000C0
A3681EFF C0E904FE EC868300 FFE9FF36 86880007 E9037500 003D08C4 8306AB25 %¨..á.=..u.Õ....6.Õ....ã±.Õã..hÈ 0000E0
89FEFE96 8BFEFC86 8B08C483 060C0244 9A000436 FF260006 36FF2622 16068E00 ....^&.6..&.6...D.É..á...=±..±±. 000100
260277FF 26FEEC9E C40030E9 03750247 0826078B 26FEEC9E C4FEEE96 89FEEC86 .ã±..Ý±á.ã±&..&.G.u.Õ0.á.ã±&.w.& 000120
830095E9 FF36868B 0007E903 7500003D 08C48307 1527079A 0E76FF10 76FF37FF .7.v..v...'...á.=..u.Õ....6.Õ... 000140
C4830188 02449A00 0436FF26 000636FF 26221606 8E008068 1EFFC0E9 04FEEC86 .ã±.Õã..h¯....^&.6..&.6...D....á 000160
30E90375 02470826 078B26FE EC9EC4FE EE9689FE EC8689FE FE9688FE FC868B08 ...=±..±±..ã±..Ý±á.ã±&..&.G.u.Õ0 000180
E9037500 003D08C4 83011A2B C19A0E76 FF1076FF 37FF2602 77FF26FE EC9EC400 .á.ã±&.w.&.7.v..v..è(...á.=..u.Õ 0001A0
6AFF04B6 FFFF0686 FF0E76FF 1076FFFF C0E904FE EC868300 2BE9FF36 86880007 ....6.Õ+...ã±.Õã..v..v..Ñ...Ñ..j 0001C0
681E0CF6 E9FF3686 8B0007E9 03750000 3DFF3686 89000001 5C9A5016 D4468D16 ..Fã.P.\.....6.=..u.Õ....6.Õ-..h 0001E0
```

```
Dump of file SATURN:[PCCOMMON.DUMP.DLL]DA-XPORT.DLL;1 on 18-APR-1990 10:39:21.68
File ID (400,27,0)   End of file block 81 / Allocated 84

Virtual block number 6'(00000006), 512 (0200) bytes

46890656 88044688 08C48308 C802449A 000436FF 26000636 FF262216 068E008E f...."&.6..&.6...D.à..á..Få.Vø.F 000000
0436FF26 000636FF 26221606 8E00E1E9 03750247 08260788 26805EC4 82568980 ..V.á^.&..&.G.u.ÕÄ...."&.6..&.6. 000020
0277FF26 805EC402 6A000436 FF260006 36FF2622 16068E04 C48307CC 2CF59A00 ..%,á..á...."&.6..&.6..j.á^.&.w. 000040
36868800 07E90375 00003DFF 3686890E C483082D 2C839A0E 76FF1076 FF37FF26 &.7.v..v...,-..á...6.=..u.Õ....6 000060
6A37FF26 0277FF26 805EC40E 76FF1076 FFFF6486 89FF6686 89000088 0C70E9FF .Õp.|....f...d..v..v.á^.&.w.&.7j 000080
FF6686FF 026A0004 36FF2600 0636FF26 2216068E 0000093C 9A5016FF 64868005 ...d..P.<......"&.6..&.6..j..Ñf. 0000A0
86880007 E9037500 0030FF36 86890EC4 8308682C 839A0E76 FF1076FF FF6486FF .Ñd..v..v...,h..á...6.=..u.Õ.... 0000C0
FF37FF26 0277FF26 805EC404 6A000436 FF260006 36FF2622 16068E0C 0FE9FF36 6.Õ....."&.6..&.6..j.á^.&.w.&.7. 0000E0
0476FFD6 76FF0E76 FF1076FF FF10E904 8046830E C4830909 28F89A0E 76FF1076 v..v..%+1..á..F..Õ...v..v..vø.vå 000100
00000747 9A5016FF 6C868017 6AFF0486 FFFF0686 FF0E76FF 1076FF00 00FFFF9A ......v..v..Ñ...Ñ..j...l..P.G... 000120
000636FF 26221606 8E00C768 1E08A1E9 FF368688 0007E903 75000030 FF368689 ..6.=..u.Õ....6.ÕÄ..hú...."&.6.. 000140
689EC4FF 6A9689FF 688689FF 6E9688FF 6C868808 C48304E8 02449A00 0436FF26 &.6...D.Ò..á...l...n...h...j.á.h 000160
FEFA9689 FEF88689 0257B826 078826FF 689EC407 97E90375 024708 26 078826FF .&..&.G.u.Õ..á.h.&..&.W...½±..ª± 000180
448689FE FA9688FE F8868800 3DE90375 FEFA8608 FEF88688 FF469689 FF448689 ..D...F...½±..ª±u.Õ=...½±..ª±..D 0001A0
00000969 9A5016FE F8868003 6AFF4486 FFFF4686 FF0E76FF 1076FFFF 469689FF ...F..v..v..ÑF..ÑD.j...½±.P.Ï... 0001C0
FF4486FF FF4686FF 0E76FF10 76FFFFB6 E90805E9 FF368688 0007E903 75000030 =..u.Õ....6.Õ..ÕÑ..v..v..ÑF..ÑD. 0001E0

Dump of file SATURN:[PCCOMMON.DUMP.DLL]DA-XPORT.DLL;1 on 18-APR-1990 10:39:21.68
File ID (400,27,0)   End of file block 81 / Allocated 84

Virtual block number 7 (00000007), 512 (0200) bytes

FF7C8688 0AD8E9FF 36868800 07E90375 00003000 0009F89A 5016FF7C 8680046A j...|..P.½...=..u.Õ....6.ÕÄ...|. 000000
FFFF9A50 16FF5086 80FF7CB6 FFFF7EB6 FF0E76FF 1076FF00 2FE90375 FF7E8608 ..~.u.Õ/..v..v..Ñ~..Ñ|...P..P... 000020
8E830000 FF5086C7 0006E90A 9FE9FF36 86880007 E9037500 0030FF36 86890000 ....6.=..u.Õ....6.Õ..Ó..ú.P....f 000040
76FF04C4 830A302C F59A0004 36FF2600 0636FF26 2216068E 0684E903 7406FF50 P..t.ÕÇ...."&.6..&.6...%,0..á..v 000060
FF368689 00000ACA 9A5016FF 7C868004 6A37FF26 0277FF26 FF689EC4 0E76FF10 ..v.á.h.&.w.&.7j...|..P.Ò.....6. 000080
FF026A00 0436FF26 000636FF 26221606 8E0A45E9 FF368688 0007E903 75000030 =..u.Õ....6.ÕE...."&.6..&.6..j.. 0000A0
07E90375 00003DFF 3686890E C4830A50 2C839A0E 76FF1076 FFFF7CB6 FFFF7EB6 Ñ~..Ñ|..v..v...,]..á...6.=..u.Õ. 0000C0
830A772D 269A0003 681E0004 36FF2600 0636FF26 2216068E 0A0CE9FF 36868800 ...6.Õ....."&.6..&.6...hÆ..&-w.. 0000E0
2216068E 08C4830A 912D269A 0004681E 000436FF 26000636 FF262216 068E08C4 á...."&.6..&.6...hå..&-...á....» 000100
26000636 FF262216 068E08C4 830AA820 269A0005 681E0004 36FF2600 0636FF26 &.6..&.6...hÍ..&-¨..á...."&.6..& 000120
FF260277 FF26FF68 9EC40E76 FF1076FF 08C4830B 022D269A 0006681E 000436FF .6...hø..&-...á..v..v.á.h.&.w.&. 000140
73E9FF36 86880007 E9037500 0030FF36 86890000 03E89A50 16FF7086 80036A37 7j...p..P.Ò.....6.=..u.Õ....6.Õs 000160
9A0E76FF 1076FFFF 7086FFFF 7286FF02 6A000436 FF260006 36FF2622 16068E09 ...."&.6..&.6..j..Ñr..Ñp..v..v.. 000180
FF262216 068E093A E9FF3686 880007E9 03750000 30FF3686 890EC483 038E2C83 .,f..á...6.=..u.Õ....6.Õ:...."&. 0001A0
087A2C83 9A0E76FF 1076FF37 FF260277 FF26FF68 9EC4026A 000436FF 26000636 6..&.6..j.á.h.&.w.&.7.v..v...,z. 0001C0
26000636 FF262216 068E08FE E9FF3686 880007E9 03750000 30FF3686 890EC483 .á...6.=..u.Õ....6.Õ±...."&.6..& 0001E0

Dump of file SATURN:[PCCOMMON.DUMP.DLL]DA-XPORT.DLL;1 on 18-APR-1990 10:39:21.68
File ID (400,27,0)   End of file block 81 / Allocated 84

Virtual block number 8 (00000008), 512 (0200) bytes

FF0EC483 08C92B78 9A0E76FF 1076FF37 FF260277 FF26FF68 9EC4066A 000436FF .6..j.á.h.&.w.&.7.v..v..x+è..á.. 000000
4C868A00 00043F9A 5016FF4C 868D096A 37FF2602 77FF26FF 689EC40E 76FF1076 v..v.á.h.&.w.&.7j...L..P.?.....L 000020
B6FF0004 36FF2600 0636FF26 2216068E FF349E8C FF328689 0007B804 66E998FF ..Õf.|ø...2...4...."&.6..&.6...Ñ 000040
6A37FF26 0277FF26 FF689EC4 0E76FF10 76FF08C4 8307A420 269AFF32 B6FFFF34 4..Ñ2..&-È..á..v..v.á.h.&.w.&.7j 000060
0636FF26 2216068E 00E4681E FF3CB6FF FF3EB6FF 00000C28 9A5016FF 3C86800A ...<..P.(....Ñ>..Ñ<..hÕ...."&.6. 000080
6A37FF26 0277FF26 FF689EC4 0E76FF10 76FF0CC4 830C4902 449A0004 36FF2600 .&.6...D.I..á..v..v.á.h.&.w.&.7j 0000A0
0636FF26 2216068E 00E9681E FF3CB6FF FF3EB6FF 00000C93 9A5016FF 3C868008 ...<..P......Ñ>..Ñ<..hÕ...."&.6. 0000C0
2216068E FF349E8C FF328689 00EEB803 F7E90CC4 830C9002 449A0004 36FF2600 .&.6...D....á.Õ%.¡Ÿ...2...4....» 0000E0
0E76FF10 76FF08C4 8300492D 269AFF32 B6FFFF34 B6FF0004 36FF2600 0636FF26 &.6..&.6...Ñ4..Ñ2..&-I..á..v..v. 000100
9A0CA204 7A9ADC5E 8000000C E79A5016 DC46800D 6A37FF26 0277FF26 FF689EC4 á.h.&.w.&.7j..FÉ.P.Ô....^É.z.Å.. 000120
0636FF26 2216068E 00F6681E FF3CB6FF FF3EB6FF FF3E9689 FF3C8689 0CC906EE Ÿ.è...<...>..Ñ>..Ñ<..h-...."&.6. 000140
6A37FF26 0277FF26 FF689EC4 0E76FF10 76FF0CC4 830CF102 449A0004 36FF2600 .&.6...D.þ..á..v..v.á.h.&.w.&.7j 000160
FF3E9689 FF3C8689 001D06EE 9A0CF604 7A9ADC5E 80000000 679A5016 DC46800E ..FÉ.P.g....^É.z.-..Ÿ.....<...>. 000180
83008C02 449A0004 36FF2600 0636FF26 2216068E 00FD681E FF3CB6FF FF3EB6FF .Ñ>..Ñ<..h»...."&.6..&.6...D.... 0001A0
B6FF0004 36FF2600 0636FF26 2216068E FF349E8C FF328689 0104B803 23E90CC4 á.Õ#.|....2...4...."&.6..&.6...Ñ 0001C0
6A37FF26 0277FF26 FF689EC4 0E76FF10 76FF08C4 8300FB20 269AFF32 B6FFFF34 4..Ñ2..&-«..á..v..v.á.h.&.w.&.7j 0001E0
```

```
Dump of file SATURN:[PCCOMMON.DUMP.DLL]DA-XPORT.DLL;1 on 18-APR-1990 10:39:21.68
File ID (400,27,0)   End of file block 81 / Allocated 84

Virtual block number 9 (00000009), 512 (0200) bytes

26221606 8E010968 1EDC76FF DE76FFE0 76FFE276 FF00000D AA9A5016 DC46800D ..FÉ.P.¨....vã.vÁ.v8.vÉ.h....."& 000000
260277FF 26FF689E C40E76FF 1076FF10 C4830DCF 02449A00 0436FF26 000636FF .6..&.6...D.ü..á..v..v.á.h.&.w.& 000020
068E010F 681EDC76 FFDE76FF E076FFE2 76FF0000 08999A50 16DC468D 0E6A37FF .7j..FÉ.P......vã.vÁ.v8.vÉ.h.... 000040
9E8CFF32 86890115 880271E9 10C48307 7302449A 000436FF 26000636 FF262216 ."&.6..&.6...D.s..á.Õq.|....2... 000060
08C4830E 152D269A FF32B6FF FF34B6FF 000436FF 26000636 FF262216 068EFF34 4...."&.6..&.6...Ñ4..Ñ2..&-...á. 000080
FF262216 068E08C4 830E2F2D 269A011D 681E0004 36FF2600 0636FF26 2216068E ..."&.6..&.6...h...&-/..á...."&. 0000A0
9E8CFF32 8689011F 880211E9 08C4830E 5B2D269A 011E681E 000436FF 26000636 6..&.6...h...&-[..á.Õ..|....2... 0000C0
08C4830E 752D269A FF32B6FF FF34B6FF 000436FF 26000636 FF262216 068EFF34 4...."&.6..&.6...Ñ4..Ñ2..&-u..á. 0000E0
FF262216 068E08C4 830E8F2D 269A0125 681E0004 36FF2600 0636FF26 2216068E ..."&.6..&.6...h%..&-....á...."&. 000100
9E8CFF32 86890127 8801B1E9 08C4830E BB2D269A 0126681E 000436FF 26000636 6..&.6...h&..&-£..á.ÕÝ.|'...2... 000120
08C4830E D52D269A FF32B6FF FF34B6FF 000436FF 26000636 FF262216 068EFF34 4...."&.6..&.6...Ñ4..Ñ2..&-Í..á. 000140
FF262216 068E08C4 830EEF2D 269A012D 681E0004 36FF2600 0636FF26 2216068E ..."&.6..&.6...h-..&-ÿ..á...."&. 000160
9E8CFF32 8689012F 880151E9 08C48308 3E2D269A 012E681E 000436FF 26000636 6..&.6...h...&->..á.ÕQ.|/...2... 000180
08C4830F 352D269A FF32B6FF FF34B6FF 000436FF 26000636 FF262216 068EFF34 4...."&.6..&.6...Ñ4..Ñ2..&-5..á. 0001A0
FF262216 068E08C4 830F4F2D 269A013A 681E0004 36FF2600 0636FF26 2216068E ..."&.6..&.6...h:..&-O..á...."&. 0001C0
9E8CFF32 8689013C 8800F1E9 08C4830F 7B2D269A 013B681E 000436FF 26000636 6..&.6...h;..&-(..á.Õþ.|<...2... 0001E0

Dump of file SATURN:[PCCOMMON.DUMP.DLL]DA-XPORT.DLL;1 on 18-APR-1990 10:39:21.68
File ID (400,27,0)   End of file block 81 / Allocated 84

Virtual block number 10 (0000000A), 512 (0200) bytes

08C4830F 952D269A FF32B6FF FF34B6FF 000436FF 26000636 FF262216 068EFF34 4...."&.6..&.6...Ñ4..Ñ2..&-...á. 000000
FF262216 068E08C4 830FAF2D 269A0142 681E0004 36FF2600 0636FF26 2216068E ..."&.6..&.6...hB..&-£..á...."&. 000020
000636FF 26221606 8E0091E9 08C4830F CC2D269A 0143681E 000436FF 26000636 6..&.6...hC..&-Ì..á.Õ....."&.6.. 000040
1E000436 FF260006 36FF2622 16068E08 C4830FE6 2D269A01 44681E00 0436FF26 &.6...hD..&-Ì..á...."&.6..&.6... 000060
2D269A01 46681E00 0436FF26 000636FF 26221606 8E08C483 10002D26 9A014568 hE..&-...á...."&.6..&.6...hF..&- 000080
0007101E A7FF2E93 C003FFA1 E9037600 14300042 2D0030E9 0040E908 C4830C75 u..á.Õ@.Õ=.-B.=..v.ÕÀ..á...Ì..=. 0000A0
00250FB7 0FB70FB7 08A50E37 0FB70FB7 0FB70C51 0FB70FB7 0FB70FB7 0FB70FB7 ñ.ñ.ñ.ñ.ñ.ñ.Q.ñ.ñ.ñ.7.E.ñ.ñ.ñ.%. 0000C0
83118020 269A0147 681E0004 36FF2600 0636FF26 2216068E 0E970F57 0EF70FB7 ñ.%.W......"&.6..&.6...hG..&-... 0000E0
FF688683 08C48310 BF02449A 000436FF 26000636 FF262216 068E0148 681E08C4 á..hH...."&.6..&.6...D.¢..á...h. 000100
FE86FF0E 76FF1076 FF000010 A69AFF6C B6FFFF6E B6FF0E76 FF1076FF F859E904 .ÕY%.v..v..Ñn..Ñl..Ì....v..v..Ñ± 000120
CE02449A 000436FF 26000636 FF262216 068E014A 681E0000 113D9AFE FCB6FFFE ±.Ñ=±.=....hJ...."&.6..&.6...D.ö 000140
00300000 11249A50 16E44680 1B6AFF04 B6FFFF06 B6FF0E76 FF1076FF 08C48311 ..á..v..v..Ñ...Ñ..j..FÕ.P.$...=. 000160
8826FF00 9EC4FF02 9689FF00 8689E656 88E44688 0368E900 01880006 E9037500 .u.Õ..|..Õh..FÕ.Vl........á...&. 000180
F0868003 6A37FF26 0277FF26 FF009EC4 0E76FF10 76FF009E E9037502 47082607 .&.G.u.Õ...v..v.á...&.w.&.7j...Þ 0001A0
00119C9A E476FFE6 76FF0E76 FF1076FF 0017E903 7500003D 000011EA 9A5016FE ±.P.õ...=..u.Õ...v..v..vl.vÕ.... 0001C0
88260788 26FF389E C4FF3A96 89FF3886 89FEF296 88FEF086 880300E9 00018800 .|..Õ....Þ±..·±..8...:.á.8.&..&. 0001E0

Dump of file SATURN:[PCCOMMON.DUMP.DLL]DA-XPORT.DLL;1 on 18-APR-1990 10:39:21.68
File ID (400,27,0)   End of file block 81 / Allocated 84

Virtual block number 11 (0000000B), 512 (0200) bytes

2D4F9A0E 76FF1076 FFFF00B6 FFFF02B6 FFFF38B6 FFFF3AB6 FF0026E9 03750247 G.u.Õ&..Ñ:..Ñ8..Ñ...Ñ...v..v..O- 000000
80001185 9AFEF0B6 FFFEF2B6 FF0E76FF 1076FFFF CAE904FF 3886830C C48313D2 ®..á...8..Õò..v..v..Ñ·±.Ñþ±.ç.... 000020
16068E01 58681E00 0012CD9A E476FFE6 76FF0E76 FF1076FF FF52E904 FF008683 .....ÕR..v..v..vl.vÕ.ë....hX.... 000040
8486FFFF 0686FF0E 76FF1076 FF08C483 12810244 9A000436 FF260006 36FF2622 "&.6..&.6...D.Ý..á..v..v..Ñ...Ñ. 000060
FEF0868B 025BE900 01880006 E9037500 00300000 13029A50 16FEF086 8D1F6AFF .j...Þ±.P.....=..u.Õ..|..ÕX...Þ± 000080
FF1076FF 00A2E903 7502470B 26078826 FF389EC4 FF3A9689 FF388689 FEF2968B ..·±..8...:.á.8.&..&.G.u.ÕÀ..v.. 0000A0
E9037500 00300000 12629A50 16FF6286 8D026A37 FF260277 FF26FF38 9EC40E76 v.á.8.&.w.&.7j...b..P.b...=..u.Õ 0000C0
16FF4E86 8D036A37 FF260277 FF26FF38 9EC40E76 FF1076FF 020CE900 01880006 ..|..Õ...v..v.á.8.&.w.&.7j...N.. 0000E0
FFFF9A50 16E8468D FF4EB6FF 01E0E900 01880006 E9037500 00300000 08E89A50 P.Õ...=..u.Õ..|..ÕÀ..ÑN..FÕ.P... 000100
8165681E 5016FF0C 868D5016 E8468D00 00FFFF9A 5016FF0C 868DFF62 86FF0000 ...Ñb......P......FÕ.P.....P.he. 000120
76FFFF4E E904FF38 868310C4 8312E602 449A0004 36FF2600 0636FF26 2216068E ..."&.6..&.6...D.Ì..á...8..ÕN..v 000140
FF260006 36FF2622 16068E01 70681E00 0013699A FEF0B6FF FEF2B6FF 0E76FF10 ..v..Ñ·±.Ñþ±.l....hp...."&.6..&. 000160
16FEF086 8D1F6AFF 0486FFFF 0686FF0E 76FF1076 FF08C483 0C090244 9A000436 6...D....á..v..v..Ñ...Ñ..j...Þ±. 000180
FF388689 FEF2968B FEF0868B 0140E900 01880006 E9037500 00300000 134E9A50 P.N...=..u.Õ..|..Õ@...Þ±..·±..8. 0001A0
FF26FF38 9EC40E76 FF1076FF 0004E903 7502470B 26078826 FF389EC4 FF3A9689 ..:.á.8.&..&.G.u.Õá..v..v.á.8.&. 0001C0
8E76FF10 76FF0019 E9037500 00300000 089C9A50 16FEF486 8D056A37 FF260277 w.&.7j...¶±.P.....=..u.Õ...v..v. 0001E0
```

Dump of file SATURN:[PCCOMMON.DUMP.DLL]DA-XPORT.DLL;1 on 18-APR-1990 10:39:21.68
File ID (400,27,0)   End of file block 81 / Allocated 84

Virtual block number 12 (0000000C), 512 (0200) bytes

```
89FF4886 89FEF696 88FEF486 8800E1E9 0001B800 0013EE9A FEF086FF FEF2B6FF .Ñ·±.Ñÿ±.Ÿ...¡..ÕÅ...¶±..−±..H.. 000000
77FF26FF 489EC40E 76FF1076 FF006DE9 03750247 0B260788 26FF489E C4FF4A96 .J.é.H.&..&.G.u.Õm..v..v.é.H.&.w 000020
FF26FF48 9EC437FF 260277FF 26FF389E C4000009 9E9A5016 FF508680 37FF2602 .&.7..P..P.....é.8.&.w.&.7é.H.&. 000040
FF0019E9 03750000 300EC483 0F1B145B 9A0E76FF 1076FFFF 5086FF37 FF260277 w.&.7.ÑP..v..v..[....é.=..u.Õ... 000060
FF83E904 FF488683 005CE900 01B80000 08819AFE F4B6FFFE F6B6FF0E 76FF1076 v..v..Ñ−±.Ñ¶±.....¡..Õ\...H..Õ.. 000080
83143302 449A0004 36FF2600 0636FF26 2216068E 017E681E FF1CE904 FF388683 ..8..Õ...h−...."&.6..&.6...D.3.. 0000A0
0A36FF26 2218068E 04C48314 4901369A 000436FF 26000636 FF262216 068E08C4 é...."&.6..&.6...6.I..é...."&.6. 0000C0
570000FA C8000CCA C95F5E1F 0000E900 00B804C4 83107701 369A0008 36FF2600 .&.6...6.w..é.¡..Õ...^_èò..à°..W 0000E0
16FF4C86 8D026A10 76FF1276 FF0676FF 0876FF00 00FF2886 C7D88E00 08881E56 V.¡...Äú.(....v..v..v.¯v.j...L.. 000100
5016FF2A 868D0676 FF0876FF 03C8E900 01B80006 E9037500 00300000 150A9A50 P.....=..u.Õ..¡..Õù..v..v...*..P 000120
FF06868D FF4CB6FF 03A7E900 01B80006 E9037500 00300000 FFFF9A50 1606468D .F#.P.....=..u.Õ..¡..ÕÏ..ÑL..... 000140
16068E01 88681E50 16FF0686 8D5016FF 2A868003 66E90A46 88000012 8D9A5016 .P......F.Õf...*..P.....P.h..... 000160
FF0E76FF 0676FF08 76FF0362 E910C483 15420244 9A000436 FF260006 36FF2622 "&.6..&.6...D.B..é.Õb..v..v..v.. 000180
160A468D 0343E900 01B80006 E9037500 00300000 155F9A50 160A468D 026A0C76 v.j..FÕ.P._...=..u.Õ..¡..ÕC..FÕ. 0001A0
9A000436 FF260006 36FF2622 16068E01 B6681E50 16FF0686 8D5016FF 2A868D50 P..*..P....¯P.hÑ...."&.6..&.6... 0001C0
E59A5016 FF70868D 026A0C76 FF0E76FF 0676FF08 76FF030E E914C483 16230244 D.#..é.Õ...v..v..v..v.j...p..P.Ï 0001E0
```

Dump of file SATURN:[PCCOMMON.DUMP.DLL]DA-XPORT.DLL;1 on 18-APR-1990 10:39:21.68
File ID (400,27,0)   End of file block 81 / Allocated 84

Virtual block number 13 (0000000D), 512 (0200) bytes

```
8D0A6A0C 76FF0E76 FF0676FF 0876FF02 EEE90001 B80006E9 03750000 3D000015 ...=..u.Õ..¡..ÕŸ..v..v..v..v.j.. 000000
FC5EC406 76FF0876 FF02C8E9 0001B800 06E90375 00003D00 0016979A 5016FC46 F=.P.....=..u.Õ..¡..Õà..v..v.é^= 000020
B802A0E9 0001B800 06E90375 00003D00 0013AB9A 50160A46 8037FF26 0277FF26 &.w.&.7.F..P.¨...=..u.Õ..¡..Õ..¡ 000040
8D026A37 FF260277 FF26FC5E C40676FF 0876FF00 61E90375 00003D0A 46890002 ...F.=..u.Õa..v..v.é^=&.w.&.7j.. 000060
DA468D50 16FF7086 8D0268E9 0001B800 06E90375 00003D00 0016719A 50160A46 FÕ.P.q...=..u.Õ..¡..Õh...p..P.FÕ 000080
000436FF 26000636 FF262216 068E01E9 681E5016 FF068680 5016FF2A 86805016 .P..*..P.....P.hÕ...."&.6..&.6.. 0000A0
5016FF06 868D5016 FF2A8680 5016FF70 86800231 E9000088 18C48316 5502449A .D.U..é.¡..Õ1...p..P..*..P.....P 0000C0
0876FF01 FBE914C4 8316FE02 449A0004 36FF2600 0636FF26 2216068E 0227681E .h'...."&.6..&.6...D.±..é.Õ«..v. 0000E0
0001B800 06E90375 00003D00 0016C19A 50168446 8D026A0C 76FF0E76 FF0676FF .v..v..v.j..FÇ.P.ê...=..u.Õ..¡.. 000100
03750000 3D000017 409A5016 FC468D06 6A0C76FF 0E76FF06 76FF0876 FF01DCE9 ÕÉ..v..v..v..v.j..F=.P.@...=..u. 000120
50160A46 8D026A37 FF260277 FF26FC5E C40676FF 0876FF01 B6E90001 B80006E9 Õ..¡..ÕÑ..v..v.é^=&.w.&.7j..FÕ.P 000140
2A868D50 160A468D 50168446 8D018CE9 0001B800 06E90375 00003D00 00171A9A .....=..u.Õ..¡..Õ...FÇ.P.FÕ.P..* 000160
17780244 9A000436 FF260006 36FF2622 16068E02 5D681E50 16FF0686 8D5016FF ..P.....P.h]...."&.6..&.6...D.x. 000180
003D0000 17949A50 1692468D 026A0C76 FF0E76FF 0676FF08 76FF0152 E918C483 .é.ÕR..v..v..v..v.j..F..P.....=. 0001A0
9A5016FC 468D066A 0C76FF0E 76FF0676 FF0876FF 0133E900 01B80006 E9037500 .u.Õ..¡..Õ3..v..v..v..v.j..F=.P. 0001C0
06868D50 16FF2A86 8D501692 468D010D E90001B8 0006E903 7500003D 0000100A Õ...=..u.Õ..¡..Õ...F..P..*..P... 0001E0
```

Dump of file SATURN:[PCCOMMON.DUMP.DLL]DA-XPORT.DLL;1 on 18-APR-1990 10:39:21.68
File ID (400,27,0)   End of file block 81 / Allocated 84

Virtual block number 14 (0000000E), 512 (0200) bytes

```
0008E914 C483141D 02449A00 0436FF26 000636FF 26221606 8E029568 1E5016FF ..P.h....."&.6..&.6...D....é.ÕÅ. 000000
0006E903 7500003D 00001236 9A501692 468D026A 0C76FF0E 76FF0676 FF0876FF .v..v..v..v.j..F..P.6...=..u.Õ.. 000020
003D0000 15859A50 16FC468D 106A0C76 FF0E76FF 0676FF08 76FF00B9 E90001B8 ¡..Õ¿..v..v..v..v.j..F=.P.....=. 000040
468D026A 37FF2602 77FF26FC 5EC40676 FF0876FF 0093E900 01B80006 E9037500 .u.Õ..¡..Õ...v..v.é^=&.w.&.7j..F 000060
160A468D 5016FF4E 868D0069 E90001B8 0006E903 7500003D 00001482 9A50160A Õ.P.....=..u.Õ..¡..Õi...N..P.FÕ. 000080
9A000436 FF260006 36FF2622 16068E02 CB681E50 16FF0686 8D5016FF 2A868D50 P..*..P.....P.hù...."&.6..&.6... 0000A0
C003001A E9037600 083D0001 2D0025E9 0028E900 28E9002E E918C483 14EE0244 D.Ÿ..é.Õ..Õ+.Õ(.Õ%.-..=..v.Õ...é 0000C0
1F0000E9 FF288688 16501858 182A1706 154A182D 178014F6 14C01846 A7FF2E93 ...ÏF.ë.−...-.J...*.X.}...(.Õ... 0000E0
C700C894 46C70000 EE46C701 90EC46C7 D88E1463 881E5657 00006CC8 CBC95F5E ^_èùàl..WV.¡c..ÄúFå..úFŸ..úF.à.ú 000100
83011805 96568894 46889E56 899C4689 00D28301 1805EE56 88EC4688 00009646 F¯...Få.VŸ....@..F..V..F..V..... 000120
00001956 9A5016F0 46800A6A 0A76FF0C 76FF0676 FF0876FF 9A568998 46890002 @..F..V..v..v..v..v.j..Fþ.P.V... 000140
18EF0356 9A5016F4 46809876 FF9A76FF 180E0356 9A5016F0 46809C76 FF9E76FF .v..v..Fþ.P.V.8..v..v..F¶.P.V.ÿ. 000160
9A76FFFA 5689F846 89F25613 F0460319 0C037E9A EC76FFEE 76FF9C76 FF9E76FF .v..v..vŸ.vš.−....Fþ.V·.F½.V°.v. 000180
FF262214 068EFE56 89FC4689 F65613F4 4603193D 037E9A94 76FF9676 FF9876FF .v..v..v..−.=..F¶.V−.F=.V±..."&. 0001A0
83197402 449A0008 36FF2600 0A36FF26 2218068E 030F681E 000036FF 26000236 6..&.6...h....."&.6..&.6...D.t.. 0001C0
1E5016A0 468D0000 17E49A50 16A0468D 026A0A76 FF0C76FF 0676FF08 76FF0CC4 é..v..v..v..v.j..F..P.Õ....F..P. 0001E0
```

Dump of file SATURN:[PCCOMMON.DUMP.DLL]DA-XPORT.DLL;1 on 18-APR-1990 10:39:21.68
File ID (400,27,0)   End of file block 81 / Allocated 84

Virtual block number 15 (0000000F), 512 (0200) bytes

```
1EF076FF F276FF0C C4831994 02449A00 0836FF26 000A36FF 26221806 8E031468 h....."&.6..&.6...D....á..v·.vÞ. 000000
1EF476FF F676FF0C C48319B4 02449A00 0836FF26 000A36FF 26221806 8E031A68 h....."&.6..&.6...D.Ç..á..v-.v¶. 000020
1EF876FF FA76FF0C C48319D4 02449A00 0836FF26 000A36FF 26221806 8E031F68 h....."&.6..&.6...D.Ô..á..v'.v½. 000040
1EFC76FF FE76FF0C C48319F4 02449A00 0836FF26 000A36FF 26221806 8E032468 h$...."&.6..&.6...D.¶..á..v±.v=. 000060
18CBCBC9 5F5E1F0C C4831822 02449A00 0836FF26 000A36FF 26221806 8E032968 h)...."&.6..&.6...D."..á..^_èùà. 000080
1AD09A50 16FC468D 1A6A0A76 FF0C76FF 0676FF08 76FFD88E 186CB81E 56570000 ..WV.¦l..Ä.v..v..v..v.j..F=.P.Å. 0000A0
000A36FF 26221806 8E032F68 1E0238E9 E8468800 06E90375 000030E8 46890000 ...Fò=..u.Ô...FòÒ;..h/....."&.6.. 0000C0
07E90000 EA46C7F6 5689F446 89FE5688 FC468808 C4831C41 02449A00 0836FF26 &.6...D.A..á..F=.V±.F¶.V-úFô..Ô. 0000E0
F45EC406 76FF0876 FF001FE9 03750247 0826078B 26F45EC4 EA46FF04 F4468300 ..F¶..Fôá^¶&..&.G.u.Ô...v..v.á^¶ 000100
89F44689 FE5688FC 4688FFC8 E90000FF FF9A5016 EA468015 6A37FF26 0277FF26 &.w.&.7j..Fô.P.....Ôù..F=.V±.F¶. 000120
5EC40676 FF0876FF 01A5E903 7502470B 26078B26 F45EC404 F4468300 04E9F656 V-Ô...F¶.á^¶&..&.G.u.ÔE..v..v.á^ 000140
880006E9 03750000 30E84689 000017BA 9A5016F8 468D086A 37FF2602 77FF26F4 ¶&.w.&.7j..F½.P.¤....Fò=..u.Ô... 000160
0826078B 26F45EC4 04F44683 0004E9F2 5689F046 89FE5688 FC468801 89E9E846 FòÒ...F=.V±.FÞ.V·Ô...F¶.á^¶&..&. 000180
089A5016 EC468D04 6A37FF26 0277FF26 F05EC406 76FF0876 FF0142E9 03750247 G.u.ÔB..v..v.á^Þ&.w.&.7j..F&.P.. 0001A0
36FF2600 0A36FF26 2218068E 013AE9E8 46880006 E9037500 003DE846 89000008 ....Fò=..u.Ô...FòÒ:....."&.6..&.6 0001C0
77FF26F4 5EC4026A 000836FF 26000A36 FF262218 068E04C4 8318602C F59A0008 ...%,m..á....."&.6..&.6..j.á^¶&.w 0001E0
```

Dump of file SATURN:[PCCOMMON.DUMP.DLL]DA-XPORT.DLL;1 on 18-APR-1990 10:39:21.68
File ID (400,27,0)   End of file block 81 / Allocated 84

Virtual block number 16 (00000010), 512 (0200) bytes

```
E8468800 06E90375 00003DE8 46890EC4 831BA62C 839A0676 FF0876FF 37FF2602 .&.7.v..v....1..á..Fò=..u.Ô...Fò 000000
0876FF37 FF260277 FF26F45E C4156A00 0836FF26 000A36FF 26221806 8E00EBE9 Ô$....."&.6..&.6..j.á^¶&.w.&.7.v. 000020
76FFEE76 FF026A00 0836FF26 000A36FF 26221806 8E0EC483 1BCA2B78 9A0676FF .v..x+Ð..á....."&.6..&.6..j..vŸ.v 000040
008EE9E8 46880006 E9037500 003DE846 890EC483 1BFF2C83 9A0676FF 0876FFEC &.v..v........á..Fò=..u.Ô...FòÒ.. 000060
272B789A 0676FF08 76FFEC76 FFEE76FF 156A0008 36FF2600 0A36FF26 2218068E ..."&.6..&.6..j..vŸ.v&.v..v..x+' 000080
76FF37FF 260277FF 26F05EC4 026A0008 36FF2600 0A36FF26 2218068E 0EC4831C ..á....."&.6..&.6..j.á^Þ&.w.&.7.v 0000A0
449A0008 36FF2600 0A36FF26 2218068E 0330681E 0EC48310 5028789A 0676FF08 ..v..x+]..á..h=....."&.6..&.6...D 0000C0
0876FFFE 48E90000 1C6A9AF8 76FFFA76 FF0676FF 0876FFFE A8E908C4 8318CE02 .Ô..á.Ô¨±.v..v..v'.v½.j...ÔH±.v. 0000E0
FFD88E1A 06881E56 5700000C C8CBC95F 5E1F0000 10939AFC 76FFFE76 FF0676FF .v..v±.v=......^_èùà...WV.¦...Ä. 000100
E9037500 0030F446 8900001A 1E9A5016 FC468D1A 6A0A76FF 0C76FF06 76FF0876 v..v..v..v.j..F=.P......F¶=..u.Ô 000120
831D9802 449A0008 36FF2600 0A36FF26 2218068E 033F681E 0152E9F4 46880006 ...F¶ÔR..h?....."&.6..&.6...D.... 000140
7502470B 2607B826 F85EC404 F8468300 04E9FA56 89F84689 FE5688FC 468808C4 á..F=.V±.F½.V'Ô...F½.á^½&..&.G.u 000160
FF262218 068E04C4 831D1D2C F59A0008 36FF2600 0A36FF26 2218068E 00BCE903 .ÔŸ....."&.6..&.6...%,...á....."&. 000180
831D562C 839A0676 FF0876FF 37FF2602 77FF26F8 5EC4026A 000836FF 26000A36 6..&.6..j.á^½&.w.&.7.v..v....,V.. 0001A0
0836FF26 000A36FF 26221806 8E00C7E9 F4468800 06E90375 000030F4 46890EC4 á..F¶=..u.Ô...F¶Ôú....."&.6..&.6. 0001C0
26221806 8E0EC483 1D7E2B78 9A0676FF 0876FF37 FF260277 FF26F85E C4156A00 .j.á^½&.w.&.7.v..v..x+-..á....."& 0001E0
```

Dump of file SATURN:[PCCOMMON.DUMP.DLL]DA-XPORT.DLL;1 on 18-APR-1990 10:39:21.68
File ID (400,27,0)   End of file block 81 / Allocated 84

Virtual block number 17 (00000011), 512 (0200) bytes

```
1B452B78 9A0676FF 0876FF37 FF260277 FF26F85E C4146A00 0836FF26 000A36FF .6..&.6..j.á^½&.w.&.7.v..v..x+E. 000000
FF31E90B C4831A4B 02449A00 0836FF26 000A36FF 26221806 8E034C68 1E0EC483 .á..hL....."&.6..&.6...D.H..á.Ô1. 000020
8B26F85E C4F646FF 04F84683 0007E900 00F646C7 FA5689F8 4689FE56 8BFC4688 .F=.V±.F½.V'úF-..Ô...F½..F-á^½&. 000040
16F6468D 156A37FF 260277FF 26F85EC4 0676FF08 76FF001F E9037502 47082607 .&.G.u.Ô...v..v.á^½&.w.&.7j..F-. 000060
C8CBC95F 5E1F0000 1C569AFC 76FFFE76 FF0676FF 0876FFFF CBE90000 1A8F9A50 P.....Ôù..v..v..v±.v=.V....^_èùà 000080
939A5016 FC468D1A 6A0A76FF 0C76FF06 76FF0876 FFD88E1C 78B81E56 5700001A ...WV.¦(..Ä.v..v..v..v.j..F=.P.. 0000A0
0636FF26 2216068E 034E681E 02A0E9EA 46880006 E9037500 003DEA46 8900001C ....Fô=..u.Ô...FôÒ...hN....."&.6. 0000C0
078B26F8 5EC4FA56 89F84689 FE5688FC 468808C4 831C8002 449A0004 36FF2600 .&.6...D.$..á..F=.V±.F½.V'á^½&.. 0000E0
5016E646 800A6A37 FF260277 FF26F85E C40676FF 0876FF02 5AE90375 02470B26 &.G.u.ÔZ..v..v.á^½&.w.&.7j..F¦.P 000100
7402EE7E 83000015 AD9A5016 EE468DE6 76FFE876 FF0676FF 0876FF00 001FA29A .Å....v..v..vÒ.v¦.FŸ.P.Ù....~Ÿ.t 000120
FF262216 068E04C4 831ED92C F59A0004 36FF2600 0636FF26 2216068E 021BE903 .Ô....."&.6..&.6...%,\..á....."&. 000140
46890EC4 831F122C 839A0676 FF0876FF E676FFE8 76FF026A 000436FF 26000636 6..&.6..j..vÒ.v¦.v..v.........á..F 000160
C4026A00 0436FF26 000636FF 26221606 8E01E5E9 EA468800 06E90375 000030EA ô=..u.Ô...FôÒ¦....."&.6..&.6..j.á 000180
E9037500 0030EA46 890EC483 1F482C83 9A0676FF 0876FF37 FF260277 FF26F85E ^½&.w.&.7.v..v....K..á..Fô=..u.Ô 0001A0
260277FF 26F85EC4 036A0004 36FF2600 0636FF26 2216068E 01ACE9EA 46880006 ...FôÒ¯....."&.6..&.6..j.á^½&.w.& 0001C0
046A0004 36FF2600 0636FF26 2216068E 0EC4831F 7328B79A 0676FF08 76FF37FF .7.v..v..ñ+s..á....."&.6..&.6..j. 0001E0
```

```
Dump of file SATURN:[PCCOMMON.DUMP.DLL]DA-XPORT.DLL;1 on 18-APR-1990 10:39:21.68
File ID (400,27,0)   End of file block 81 / Allocated 84

Virtual block number 18 (00000012), 512 (0200) bytes

46890000 8A0000B8 0EC4831F C52BB79A 0676FF08 76FF37FF 260277FF 26F85EC4 á^½&.w.&.7.v..v..ñ+é..á.¡..¤...F 000000
16F4468D 086A37FF 260277FF 26F85EC4 0676FF08 76FFF656 89F44689 F25689F0 Þ.V·.F¶.V-.v..v.á^½&.w.&.7j..F¶. 000020
FF0876FF F476FFF6 76FF026A 000436FF 26000636 FF262216 068E0000 1FF39A50 P.µ......"&.6..&.6..j..v-.v¶.v.. 000040
76FF0876 FF00F9E9 EA468800 06E90375 00003DEA 46890EC4 8320182C 839A0676 v....  .á..Fõ=..u.Õ...FõÕ'..v..v 000060
08F04688 0001EC46 C700001B 1F9A5016 F0468D0C 6A37FF26 0277FF26 F85EC406 .á^½&.w.&.7j..FÞ.P.....úF&...FÞ. 000080
EA468920 5720099A 5016EC46 8DF076FF F276FF06 76FF0876 FF0027E9 0375F246 F·u.Õ'..v..v..v·.vÞ.F&.P.) W .Fõ 0000A0
E9037500 EC7E8300 09E90375 F2460BF0 468800A6 E9EA4688 0006E903 75000030 =..u.Õ...FõÕl..FÞ.F·u.Õ...-&.u.Õ 0000C0
8E0035E9 08C48320 7E2D269A 035A681E 000436FF 26000636 FF262216 068E001D ....."&.6..&.6...hZ..&-~ .á.Õ5.. 0000E0
20872C83 9A0676FF 0876FFF0 76FFF276 FF026A00 0436FF26 000636FF 26221606 .."&.6..&.6..j..v·.vÞ.v..v...,ñ 000100
36FF2600 0636FF26 2216068E 0040E9EA 46880006 E9037500 003DEA46 890EC483 .á..Fõ=..u.Õ...FõÕa...,"&.6..&.6 000120
04F84683 0EC4831C F52BF89A 0676FF08 76FF37FF 260277FF 26F85EC4 0D6A0004 ..j.á^½&.w.&.7.v..v..½+%..á..F½. 000140
1E565700 0010C8CB C95F5E1F 00001DF6 9AFC76FF FE76FF06 76FF0876 FFFD97E9 Õ.».v..v..v±.v=.-....^_èùà...WV. 000160
E90375F2 460BF046 88F85689 F64689F2 5689F046 890C5688 0A468808 8E1E07B8 ¡...Ã.F..V..FÞ.V·.F-.V½.FÞ.F·u.Õ 000180
16F0468D 036AF676 FFF876FF 0E76FF10 76FFF856 89F64689 F25688F0 46880038 8..FÞ.V·.F-.V½.v..v..v½.v-j..FÞ. 0001A0
0E76FF10 76FFFF8D E90082E9 F4468800 06E90375 00003DF4 46890000 214E9A50 P.NI...F¶=..u.Õ...F¶Õ..Õ§..v..v. 0001C0
F4468800 06E90375 00003DF4 46890000 1E819A50 16FC468D 046AF676 FFF876FF .v½.v-j..F=.P......F¶=..u.Õ...F¶ 0001E0

Dump of file SATURN:[PCCOMMON.DUMP.DLL]DA-XPORT.DLL;1 on 18-APR-1990 10:39:21.68
File ID (400,27,0)   End of file block 81 / Allocated 84

Virtual block number 19 (00000013), 512 (0200) bytes

9A5016FA 468DFC76 FFFE76FF 0E76FF10 76FF002A E90375FE 4608FC46 880056E9 ÕV..F=.F±u.Õ*..v..v..v±.v=.F*.P. 000000
FA7E8300 00FA46C7 0005E900 24E9F446 880006E9 03750000 3DF44689 00001E97 .....F¶=..u.Õ...F¶Õ$.Õ..úF*...-* 000020
000CCAC9 5F5E1F00 0107C726 065EC400 08E90000 07C72606 5EC40008 E9037406 .t.Õ..á^.&ú...Õ..á^.&ú....^_èò.. 000040
9A5016FC 4680126A 0A76FF0C 76FF0676 FF0876FF 088E20E1 881E5657 000010C8 à...WV.¡Ã .Ã.v..v..v..v.j..F=.P. 000060
5689F846 89FE5688 FC468801 79E9F446 880006E9 03750000 3DF44689 00001E1F .....F¶=..u.Õ...F¶Õy..F=.V±.F½.V 000080
F59A0004 36FF2600 0636FF26 2216068E 014DE903 7502470B 26078826 F85EC4FA *á^½&..&.G.u.ÕM...."&.6..&.6...% 0000A0
FF0876FF 0A76FF0C 76FF026A 000436FF 26000636 FF262216 068E04C4 8322452C ,E".á....."&.6..&.6..j..v..v..v.. 0000C0
26221606 8E0113E9 F4468800 06E90375 00003DF4 46890EC4 83227E2C 839A0676 v...,~".á..F¶=..u.Õ...F¶Õ....."& 0000E0
22A92C83 9A0676FF 0876FF37 FF260277 FF26F85E C4026A00 0436FF26 000636FF .6..&.6..j.á^½&.w.&.7.v..v....,`" 000100
37FF2602 77FF26F8 5EC4036A 00DAE9F4 46880006 E9037500 003DF446 890EC483 .á..F¶=..u.Õ...F¶ÕÕ.j.á^½&.w.&.7 000120
066A37FF 260277FF 26F85EC4 0676FF08 76FF0AC4 8323292A 7B9A0676 FF0876FF .v..v..(*)#.á..v..v.á^½&.w.&.7j. 000140
800033E9 F25E8CF0 4689035B B8000CE9 037449F6 7E800000 188C9A50 16F6468D .F-.P.¥....--It.Õ..¡[..FÞ.^·Õ3.. 000160
03638800 0CE90374 58F67E80 001EE9F2 5E8CF046 89035F88 000CE903 7441F67E --At.Õ..|_..FÞ.^·Õ...--Xt.Õ..¡c. 000180
000436FF 26000636 FF262216 068EF25E 8CF04689 03678800 09E9F25E 8CF04689 .FÞ.^·Õ..¡g..FÞ.^·...."&.6..&.6.. 0001A0
5EC4086A 000436FF 26000636 FF262216 068E08C4 83235120 269AF076 FFF276FF .v·.vÞ.&-Q#.á....."&.6..&.6..j.á^ 0001C0
0876FFFE A4E904F8 46830EC4 831E8528 F89A0676 FF0876FF 37FF2602 77FF26F8 ½&.w.&.7.v..v..½+ç..á..F½.ÕE±.v. 0001E0

Dump of file SATURN:[PCCOMMON.DUMP.DLL]DA-XPORT.DLL;1 on 18-APR-1990 10:39:21.68
File ID (400,27,0)   End of file block 81 / Allocated 84

Virtual block number 20 (00000014), 512 (0200) bytes

FFD88E21 C8881E56 5700001A C8C8C95F 5E1F0000 20D09AFC 76FFFE76 FF0676FF .v..v±.v=.Ã ...^_èùà...WV.¡à!.Ã. 000000
E9037500 003DEA46 89000021 E09A5016 EC468019 6A0A76FF 0C76FF06 76FF0876 v..v..v..v.j..F&¯P.Ãl...Fõ=..u.Õ 000020
0636FF26 2216068E 0368681E E85689E6 4689EE56 88EC4688 0219E9EA 46880006 ...FõÕ...F&.VŸ.Fl.VÒ.hk...."&.6. 000040
0876FF01 D3E90375 02470826 078826E6 5EC408C4 831E4902 449A0004 36FF2600 .&.6...D.I..á.á^l&..&.G.u.Õ£..v. 000060
FF0676FF 0876FF00 0021229A 5016F446 8D0D6A37 FF260277 FF26E65E C40676FF .v.á^l&.w.&.7j..F¶.P."|...v..v.. 000080
FF260277 FF26E65E C40676FF 0876FF00 0024299A 5016FC46 8D106AF4 76FFF676 v-.v¶j..F=.P.)$...v..v.á^l&.w.&. 0000A0
5016F846 8D106AF0 76FFF276 FF0676FF 0876FF00 0024419A 5016F046 8D0E6A37 7j..FÞ.P.A$...v..v..v·.vÞj..F½.P 0000C0
4608F046 88014EE9 0375FE46 08FC4688 0159E903 75F64608 F4468800 0023F59A .%#...F¶.F-u.ÕY..F=.F±u.ÕN..FÞ.F 0000E0
9A000436 FF260006 36FF2622 16068E01 38E90375 FA4608F8 46880143 E90375F2 ·u.ÕC..F½.F*u.Õ8...."&.6..&.6... 000100
0876FFFC 76FFFE76 FF026A00 0436FF26 000636FF 26221606 8E04C483 24A62CF5 %,l$.á...."&.6..&.6..j..v±.v=.v. 000120
2216068E 0105E9EA 46880006 E9037500 003DEA46 890EC483 24D82C83 9A0676FF .v...,Ù$.á..Fõ=..u.Õ...FõÕ....." 000140
0EC48325 102C839A 0676FF08 76FFF876 FFFA76FF 026A0004 36FF2600 0636FF26 &.6..&.6..j..v*.v½.v..v...,.%.á. 000160
6A000436 FF260006 36FF2622 16068E00 D0E9EA46 880006E9 03750000 3DEA4689 .Fõ=..u.Õ...FõÕÃ...."&.6..&.6..j 000180
0006E903 75000030 EA46890E C4832545 2C839A06 76FF0876 FFF476FF F676FF02 ..v-.v¶.v..v...,E%.á..Fõ=..u.Õ.. 0001A0
FF0876FF F076FFF2 76FF026A 000436FF 26000636 FF262216 068E009B E9EA4688 .FõÕ....."&.6..&.6..j..v·.vÞ.v.. 0001C0
E65EC402 6A0066E9 EA468800 06E90375 00003DEA 46890EC4 8325702C 839A0676 v...,p%.á..Fõ=..u.Õ...FõÕf.j.á^l 0001E0
```

Dump of file SATURN:[PCCOMMON.DUMP.DLL]DA-XPORT.DLL;1 on 18-APR-1990 10:39:21.68
File ID (400,27,0)   End of file block 81 / Allocated 84

Virtual block number 21 (00000015), 512 (0200) bytes

```
FF260277 FF26E65E C4056A0A C483258A 2A7B9A06 76FF0876 FF37FF26 0277FF26 &.w.&.7.v..v..(*.%.6.j.6^|&.w.&. 000000
0436FF26 000636FF 26221606 8E037668 1E0AC483 22212A7B 9A0676FF 0876FF37 7.v..v..(*|".6..hv...."&.6..&.6. 000020
00236A9A EC76FFEE 76FF0676 FF0876FF FE1EE904 E6468308 C48323C9 02449A00 ..D.è#.6..F|.Ö.±.v..v..vŸ.v&.j#. 000040
136A0A76 FF0C76FF 0676FF08 76FFD88E 237B881E 56570000 0AC8CBC9 5F5E1F00 ..^_èùà...WV.|(#.Ä.v..v..v..v.j. 000060
568BFC46 8B0107E9 F6468B00 06E90375 00003DF6 46890000 23939A50 16FC468D .F=.P..#...F-=..u.Ö...F-Ö...F=.V 000080
26000636 FF262216 068E000B E9037502 47082607 8826F85E C4FA5689 F84689FE ±.F%.V*6^%&..&.G.u.ÖU...."&.6..& 0000A0
FF0C76FF 026A0004 36FF2600 0636FF26 2216068E 04C48326 4B2CF59A 000436FF .6...%,K&.6...."&.6..&.6..j..v.. 0000C0
A1E9F646 8B0006E9 03750000 30F64689 0EC48326 842C839A 0676FF08 76FF0A76 v..v..v....,&.6..F-=..u.Ö...F-ÖÀ 0000E0
76FF0876 FF37FF26 0277FF26 F85EC402 6A000436 FF260006 36FF2622 16068E00 ...."&.6..&.6..j.6^%&.w.&.7.v..v 000100
FF262216 068E0068 E9F6468B 0006E903 75000030 F646890E C483268D 2C839A06 ...§&.6..F-=..u.Ö...F-Öh...."&. 000120
8326E52B B79A0676 FF0876FF 37FF2602 77FF26F8 5EC4046A 000436FF 26000636 6..&.6..j.6^%&.w.&.7.v..v..ñ+|&. 000140
FF0876FF 37FF2602 77FF26F8 5EC4036A 000436FF 26000636 FF262216 068E0EC4 6...."&.6..&.6..j.6^%&.w.&.7.v.. 000160
25B09AFC 76FFFE76 FF0676FF 0876FFFF 16E904F8 46830EC4 8324822B F89A0676 v..%+.$.6..F%.Ö...v..v..v±.v=.§% 000180
6A0A76FF 0C76FF06 76FF0876 FF088E25 CEB81E56 57000016 C8CBC95F 5E1F0000 ...^_èùà...WV.|öX.Ä.v..v..v..v.j 0001A0
8BFC468B 0180E9EA 46880006 E9037500 0030EA46 89000027 969A5016 FC468D13 ..F=.P..'...Fö=..u.Ö...Föö...F=. 0001C0
F45EC406 76FF0876 FF0154E9 03750247 08260788 26F45EC4 F65689F4 4689FE56 V±.F¶.V-6^¶&..&.G.u.ÖT..v..v.6^¶ 0001E0
```

Dump of file SATURN:[PCCOMMON.DUMP.DLL]DA-XPORT.DLL;1 on 18-APR-1990 10:39:21.68
File ID (400,27,0)   End of file block 81 / Allocated 84

Virtual block number 22 (00000016), 512 (0200) bytes

```
76FF0126 E90375FA 460BF846 8B0000FF FF9A5016 F8468D08 6A37FF26 0277FF26 &.w.&.7j..F%.P......F%.F*u.Ö&..v 000000
F2568BF0 46880000 25E69A50 16F0468D 086A37FF 260277FF 26F45EC4 0676FF08 ..v.6^¶&.w.&.7j..FÞ.P.|X...FÞ.V· 000020
FF260006 36FF2622 16068E00 DEE90375 02470826 078826EC 5EC4EE56 89EC4689 .F&.VŸ6^&&..&.G.u.Ö8...."&.6..&. 000040
76FF0C76 FF026A00 0436FF26 000636FF 26221606 8E04C483 27EA2CF5 9A000436 6...%,ö'.6...."&.6..&.6..j..v..v 000060
008CE9EA 46880006 E9037500 0030EA46 890EC483 28232C83 9A0676FF 0876FF0A ..v..v...,#(.6..Fö=..u.Ö...FöÖ¥. 000080
0676FF08 76FF37FF 260277FF 26F45EC4 026A0004 36FF2600 0636FF26 2216068E ..."&.6..&.6..j.6^¶&.w.&.7.v..v. 0000A0
36FF2622 16068E00 83E9EA46 8B0006E9 03750000 30EA4689 0EC48326 272C839A ...'&.6..Fö=..u.Ö...Föö....."&.6 0000C0
C48327C6 2C839A06 76FF0876 FF37FF26 0277FF26 EC5EC402 6A000436 FF260006 ..&.6..j.6^&&.w.&.7.v..v...,ó'.6 0000E0
26000636 FF262216 068E0378 681E004A E9EA4688 0006E903 75000030 EA46890E ..Fö=..u.Ö...FöÖJ..hx...."&.6..& 000100
9AF076FF F276FF06 76FF0876 FFFF13E9 04EC4683 08C48325 A402449A 000436FF .6...D.ÊX.6..F&.Ö...v..v..v·.vÞ. 000120
C95F5E1F 000026FE 9AFC76FF FE76FF06 76FF0876 FFFE90E9 04F44683 00002888 |(...F¶.Ö.±.v..v..v±.v=.±&...^_è 000140
5016FC46 8D136A0A 76FF0C76 FF0676FF 0876FF08 8E270FB8 1E565700 0016C8CB ùà...WV.|.'.Ä.v..v..v..v.j..F=.P 000160
89F44689 FE5688FC 46880180 E9EA4688 0006E903 75000030 EA468900 0029509A .P)...Fö=..u.Ö...FöÖ...F=.V±.F¶. 000180
FF260277 FF26F45E C40676FF 0876FF01 54E90375 02470826 078826F4 5EC4F656 V-6^¶&..&.G.u.ÖT..v..v.6^¶&.w.&. 0001A0
5EC40676 FF0876FF 0126E903 75FA460B F8468B00 00276F9A 5016F846 8D096A37 7j..F%.P.o'...F%.F*u.Ö&..v..v.6^ 0001C0
EE5689EC 4689F256 88F04688 00002727 9A5016F0 468D096A 37FF2602 77FF26F4 ¶&.w.&.7j..FÞ.P.''...FÞ.V·.F&.VŸ 0001E0
```

Dump of file SATURN:[PCCOMMON.DUMP.DLL]DA-XPORT.DLL;1 on 18-APR-1990 10:39:21.68
File ID (400,27,0)   End of file block 81 / Allocated 84

Virtual block number 23 (00000017), 512 (0200) bytes

```
2CF59A00 0436FF26 000636FF 26221606 8E000EE9 03750247 08260788 26EC5EC4 6^&&..&.G.u.Ö8...."&.6..&.6...%, 000000
76FF0876 FF0A76FF 0C76FF02 6A000436 FF260006 36FF2622 16068E04 C48329A4 É).6...."&.6..&.6..j..v..v..v..v 000020
FF262216 068E008C E9EA4688 0006E903 75000030 EA46890E C4832900 2C839A06 ....|).6..Fö=..u.Ö...FöÖ¥...."&. 000040
832A162C 839A0676 FF0876FF 37FF2602 77FF26F4 5EC4026A 000436FF 26000636 6..&.6..j.6^¶&.w.&.7.v..v.....*. 000060
0436FF26 000636FF 26221606 8E0083E9 EA468B00 06E90375 00003DEA 46890EC4 6..Fö=..u.Ö...Föö....."&.6..&.6. 000080
0030EA46 890EC483 285C2C83 9A0676FF 0876FF37 FF260277 FF26EC5E C4026A00 .j.6^&&.w.&.7.v..v....,\(.6..Fö=. 0000A0
449A0004 36FF2600 0636FF26 2216068E 037A681E 004AE9EA 46880006 E9037500 .u.Ö...FöÖJ..hz...."&.6..&.6...D 0000C0
46830000 2A729AF0 76FFF276 FF0676FF 0876FFFF 13E904EC 468308C4 83288702 ..(.6..F&.Ö...v..v..v·.vÞ.r*...F 0000E0
57000008 C8C8C95F 5E1F0000 28A09AFC 76FFFE76 FF0676FF 0876FFFE 90E904F4 ¶.Ö.±.v..v..v±.v=..(...^_èùà...W 000100
809A5016 FC468D0A 76FF0C76 FF0676FF 0876FFFE 46890E46 88D88E28 C9B81E56 V.|è(.Ä.F..F±.v..v..v..v..F=.P.. 000120
FFFA76FF 00002804 9A5016F8 468DFE76 FF0A76FF 0C76FF06 76FF0876 FF000021 |...v..v..v..v..v±.F%.P..+...v*. 000140
02FC7E83 0CC4832B 2302449A 000436FF 26000636 FF262216 068E037C 681EF876 v½.h|...."&.6..&.6...D.#+.6..-=. 000160
468DFE76 FF0A76FF 0C76FF06 76FF0876 FF02FE46 830004E9 FE46FF00 06E90374 t.Ö...F±Ö...F±..v..v..v..v..v±.F 000180
000436FF 26000636 FF262216 068E0381 681EF876 FFFA76FF 0000284F 9A5016F8 %.P.O+...v*.v½.h....."&.6..&.6.. 0001A0
0676FF08 76FFFE4E FF0003E9 FE46FF00 06E90374 02FC7E83 0CC4832B 6E02449A .D.n+.6..~=.t.Ö...F±Ö...N±.v..v. 0001C0
16068E03 86681EF8 76FFFA76 FF000022 C69A5016 F8468DFE 76FF0A76 FF0C76FF .v..v..v±.F%.P.ó"...v*.v½.h..... 0001E0
```

```
Dump of file SATURN:[PCCOMMON.DUMP.DLL]DA-XPORT.DLL;1 on 18-APR-1990 10:39:21.68
File ID (400,27,0)   End of file block 81 / Allocated 84

Virtual block number 24 (00000018), 512 (0200) bytes

 881E5657 000002C8 CBC95F5E 1F0CC483 2A410244 9A000436 FF260006 36FF2622 "&.6..&.6...D.A*.á..^_èùà...WV.¡ 000000
 FE76FF00 002AB89A 5016FE46 8D0E76FF 0A76FF0C 76FF0676 FF0876FF D88E2A83 .*.Ä.v..v..v..v..v..F±.P.¡*...v± 000020
 80881E56 57000002 C8CBC95F 5E1F0AC4 832AD702 449A1076 FF1276FF 0388681E .h...v..v..D.®*.á..^_èùà...WV.¡. 000040
 98FE468A 00002899 9A5016FE 468D0E76 FF0A76FF 0C76FF06 76FF0876 FFD88E28 +.Ä.v..v..v..v..v..F±.P..+...F±. 000060
 881E5657 0000FAC8 CBC95F5E 1F0AC483 28AD0244 9A1076FF 1276FF03 8F681E50 P.h...v..v..D.Ù+.á..^_èùà"..WV.¡ 000080
 FC468800 0029299A 5016FC46 8D0E76FF 0A76FF0C 76FF0676 FF0876FF D88E2B8F ¢+.Ä.v..v..v..v..v..F=.P.))...F• 0000A0
 24009A50 16FF0686 8D0E76FF 0A76FF0C 76FF0676 FF0876FF 0039E903 75FE4608 .F±u.Õ9..v..v..v..v..v......P..$ 0000C0
 05E90000 FFFF9A50 16FF0A86 8D00F168 FF0686FF FF0886FF 0676FF08 76FF0000 ...v..v..Ñ...Ñ..hþ......P.....Õ. 0000E0
 5E1F0CC4 832BEE02 449A1076 FF1276FF 0395681E 5016FF0A 868000FF 0A86C600 .6.........P.h...v..v..D.Ÿ+.á..^ 000100
 76FF0676 FF0876FF FF668688 82468800 80088E2C 00881E56 5700009A C8CBC95F _èùà...WV.¡.,.Ä¯..Fý..f..v..v..v 000120
 FFFF9A50 16824680 5016FF66 86800000 28089A50 16FF6686 800E76FF 0A76FF0C ¯..v..v...f..P.Ä+....f..P.Fý.P... 000140
 FF1276FF 039C681E 50168246 80001DE9 FE468800 06E90375 000030FE 46890000 ...F±=..u.Õ...F±Õ...Fý.P.h...v.. 000160
 8E2C88B8 1E565700 0000C8CB C95F5E1F 0000E900 00880CC4 832C7902 449A1076 v..D.y,.á.¡..Õ...^_èùà...WV.|.,. 000180
 C4832CE5 02449A06 76FF0876 FF03A268 1E000036 FF260002 36FF2622 14068ED8 Ä..."&.6..&.6...hÄ¯.v..v..D.Ì,.á 0001A0
 FF0C76FF 03A7681E 0676FF08 76FFD88E 2CFD881E 56570000 00C8CBC9 5F5E1F0C ..^_èùà...WV.|»,.Ä.v..v..hÌ..v.. 0001C0
 76FF0876 FFD88E2D 2E881E56 57000070 C8CBC95F 5E1F0CC4 83201C02 449A0A76 v..Ð..-.á..^_èùàp..WV.¡.-.Ä.v..v 0001E0
```

```
Dump of file SATURN:[PCCOMMON.DUMP.DLL]DA-XPORT.DLL;1 on 18-APR-1990 10:39:21.68
File ID (400,27,0)   End of file block 81 / Allocated 84

Virtual block number 25 (00000019), 512 (0200) bytes

 047FE900 03E90375 00003000 002A9F9A 50169046 8D37FF26 0277FF26 0E5EC406 .á^.&.w.&.7.F..P..*..=..u.Õ..Õ.. 000000
 6A37FF26 0277FF26 0A5EC406 76FF0876 FF044BE9 904688FA 568CF846 89FC468D .F=.F½.V*.F.ÕK..v..v.á^.&.w.&.7j 000020
 26221406 8E501684 468D0449 E90003E9 03750000 3D00002D FE9A5016 84468D02 ..FÇ.P.±-..=..u.Õ..ÕI..FÇ.P..."& 000040
 2E610244 9A000436 FF260006 36FF2622 16068E03 AD681E00 0036FF26 000236FF .6..&.6...hÙ...."&.6..&.6...D.●. 000060
 2E259A50 1692468D 026A37FF 260277FF 260E5EC4 0676FF08 76FF0419 E910C483 .á.Õ...v..v.á^.&.w.&.7j..F..P.X. 000080
 8D026A37 FF260277 FF260A5E C40676FF 0876FF03 F2E90003 E9037500 003D0000 ..=..u.Õ..Õ·..v..v.á^.&.w.&.7j.. 0000A0
 068E5016 92468D50 1684468D 03CBE900 03E90375 00003000 002E819A 50168446 FÇ.P.....=..u.Õ..Õù..FÇ.P.F..P.. 0000C0
 449A0004 36FF2600 0636FF26 2216068E 03E4681E 000036FF 26000236 FF262214 ."&.6..&.6...hõ...."&.6..&.6...D 0000E0
 50169246 8D026A37 FF260277 FF260E5E C40676FF 0876FF03 96E914C4 832EE402 .Õ..á.Õ...v..v.á^.&.w.&.7j..F..P 000100
 37FF2602 77FF260A 5EC40676 FF0876FF 036FE900 03E90375 00003000 002EA89A .´...=..u.Õ..Õo..v..v.á^.&.w.&.7 000120
 1692468D 50168446 8D0348E9 0003E903 7500003D 00002F04 9A501684 468D026A j..FÇ.P../..=..u.Õ..ÕH..FÇ.P.F.. 000140
 0436FF26 000636FF 26221606 8E042368 1E000036 FF260002 36FF2622 14068E50 P..."&.6..&.6...h#...."&.6..&.6. 000160
 468D026A 37FF2602 77FF260E 5EC40676 FF0876FF 0313E914 C4832D45 02449A00 ..D.E-.á.Õ...v..v.á^.&.w.&.7j..F 000180
 0277FF26 0A5EC406 76FF0876 FF02ECE9 0003E903 7500003D 00002CAE 9A501692 ..P.Ö,..=..u.Õ..Õ&..v..v.á^.&.w. 0001A0
 0676FF08 76FF02C5 E90003E9 03750000 3D00002F A79A5016 84468002 6A37FF26 &.7j..FÇ.P.Ï/..=..u.Õ..Õé..v..v. 0001C0
 9EE90003 E9037500 003D0000 30889A50 16F8468D 0A6A37FF 260277FF 260E5EC4 á^.&.w.&.7j..F½.P..0..=..u.Õ..Õ. 0001E0
```

```
Dump of file SATURN:[PCCOMMON.DUMP.DLL]DA-XPORT.DLL;1 on 18-APR-1990 10:39:21.68
File ID (400,27,0)   End of file block 81 / Allocated 84

Virtual block number 26 (0000001A), 512 (0200) bytes

 03750000 3D00002D 719A5016 90468D37 FF260277 FF26F85E C40676FF 0876FF02 ..v..v.á^½&.w.&.7.F..P.q-..=..u. 000000
 6A37FF26 0277FF26 F85EC406 76FF0876 FF0061E9 03740290 7E830279 E90003E9 Õ..Õy..~..t.Õa..v..v.á^½&.w.&.7j 000020
 50169246 8D501684 468D0249 E90003E9 03750000 3D000030 309A5016 D6468D02 ..Fø.P.=0..=..u.Õ..ÕI..FÇ.P.F..P 000040
 000636FF 26221606 8E046568 1E000036 FF260002 36FF2622 14068E50 16D6468D .Fø.P..."&.6..&.6...he...."&.6.. 000060
 FF262214 068E5016 92468D50 1684468D 020FE918 C483301D 02449A00 0436FF26 &.6...D..0.á.Õ...FÇ.P.F..P..."&. 000080
 8330F302 449A0004 36FF2600 0636FF26 2216068E 04AF681E 000036FF 26000236 6..&.6...h£...."&.6..&.6...D.µ0. 0000A0
 0030649A 50169246 8D026A37 FF260277 FF260E5E C40676FF 0876FF01 DAE914C4 á.ÕÖ..v..v.á^.&.w.&.7j..F..P.d0. 0000C0
 468D026A 37FF2602 77FF260A 5EC40676 FF0876FF 01B3E900 03E90375 00003000 .=..u.Õ..Õ*..v..v.á^.&.w.&.7j..F 0000E0
 0277FF26 0E5EC406 76FF0876 FF018CE9 0003E903 75000030 000030B2 9A501684 Ç.P.ý0..=..u.Õ..Õ...v..v.á^.&.w. 000100
 0676FF08 76FF0165 E90003E9 03750000 3D000031 619A5016 F8468D06 6A37FF26 &.7j..F½.P.a1..=..u.Õ..Õe..v..v. 000120
 3EE90003 E9037500 003D0000 31139A50 16D6468D 026A37FF 260277FF 26F85EC4 á^½&.w.&.7j..Fø.P..1..=..u.Õ..Õ> 000140
 681E0000 36FF2600 0236FF26 2214068E 5016D646 8D501692 468D5016 84468D01 ..FÇ.P.F..P.Fø.P..."&.6..&.6...h 000160
 76FF0876 FF0104E9 18C48331 C902449A 000436FF 26000636 FF262216 068E04EE Ÿ...."&.6..&.6...D.è1.á.Õ...v..v 000180
 E90003E9 03750000 3D000031 3A9A5016 92468D02 6A37FF26 0277FF26 0E5EC406 .á^.&.w.&.7j..F..P.:1..=..u.Õ..Õ 0001A0
 003D0000 31889A50 1684468D 026A37FF 260277FF 260A5EC4 0676FF08 76FF000D Ì..v..v.á^.&.w.&.7j..FÇ.P..1..=. 0001C0
 5016F846 8D106A37 FF260277 FF260E5E C40676FF 0876FF00 B6E90003 E9037500 .u.Õ..ÕÑ..v..v.á^.&.w.&.7j..F½.P 0001E0
```

```
Dump of file SATURN:[PCCOMMON.DUMP.DLL]DA-XPORT.DLL;1 on 18-APR-1990 10:39:21.68
File ID (400,27,0)   End of file block 81 / Allocated 84

Virtual block number 27 (0000001B), 512 (0200) bytes

37FF2602 77FF26F8 5EC40676 FF0876FF 008FE900 03E90375 00003000 0028E19A .Ã(..=..u.Õ..Õ...v..v.á^¥&.w.&.7 000000
16924680 50168446 8D0068E9 0003E903 7500003D 000020A7 9A501606 4680026A j..F#.P.Ī-..=..u.Õ..Õh..FÇ.P.F.. 000020
0636FF26 2216068E 0532681E 000036FF 26000236 FF262214 068E5016 D6468050 P.F#.P..."&.6..&.6...h2...."&.6. 000040
00083000 012D0025 E90028E9 0028E900 2EE918C4 832D0E02 449A0004 36FF2600 .&.6...D.8-.á.Õ..Õ+.Õ(.Õ%.-..=.. 000060
1F302531 D431D12E 692EEC31 D430F820 E62D8F31 EDA7FF2E 93C003FF EFE90376 v.Õÿ..à...ÌÙ1.-Ì-«0å1§.Ì.11å1%0. 000080
02030000 00042FE8 0002006E 00032C3E 02030000 00012980 00020011 CBC95F5E ^_èü.....)......>,..n...Ò/...... 0000A0
02030087 00032F77 020300EB 000614C3 02030000 00062057 0002007B 00032A5A Z"..(...W-......Û...Š...w/...... 0000C0
02030028 000314A6 020300FE 0006127E 02030095 00032C5A 02030014 0003002C ........Z,......~...±...Ì...(... 0000E0
02030126 00082C8E 02030048 00032F28 0203003A 00032C19 02030115 0007049F .........,..:...+/..H...f,..&... 000100
FF1276FF D88EFFFF B81E5657 00000EC8 00000062 00032F52 02030056 00031DE2 â...V...R/..b...à...WV.|...Ã.v.. 000120
FF0114E9 0E468800 00FFFF9A 5016FA46 8DFE76FF 0000FFFF 9A5016FE 46801076 v..F±.P......v±.F".P......F.Õ... 000140
006A0143 68026C68 1076FF12 76FF0000 FFFF9A06 76FF0876 FF006A10 76FF1276 v..v.j..v..v.......v..v.hl.hC.j. 000160
008A0000 88000000 E49A016A 1076FF12 76FF0108 E90000FF FF9A006A 006A086A j.j.j......Õ...v..v.j..õ...|..¤. 000180
FFFF9A50 16F2468D 086A026C 681076FF 1276FF00 90E90A46 8800EFE9 00F8E900 .Õ«.Õÿ..F.Õ...v..v.hl.j..F·.P... 0001A0
FF1276FF 026C6824 6A001CE9 03740000 3D04C483 00060310 9A5016F2 46800000 ...F·.P...ø..á.=..t.Õ..j$hl..v.. 0001C0
3205FC56 88FA4688 5016F246 8D00ACE9 00008A00 008808C4 83FFFF01 769A1076 v..v....á.|..¤..Õ¨..F·.P.F".V=.2 0001E0

Dump of file SATURN:[PCCOMMON.DUMP.DLL]DA-XPORT.DLL;1 on 18-APR-1990 10:39:21.68
File ID (400,27,0)   End of file block 81 / Allocated 84

Virtual block number 28 (0000001C), 512 (0200) bytes

7EE90000 8A0000B8 000000FA 9A006A10 76FF1276 FF08C483 FFFF02DA 9A505200 .RP.Õ....á..v..v.j..ª...|..¤..Õ~ 000000
02763D00 13E90016 E90068E9 00008A00 00880000 FFFF9A01 6A1076FF 1276FF00 ..v..v.j......j..¤..Õh.Õ..Õ..=v. 000020
FF0C76FF 0E76FF10 76FF1276 FF0043E9 FFE7E9FF D4E90375 02803DFF 68E90375 u.Õh.=..u.Õâ.ÕÕ.ÕC..v..v..v..v.. 000040
03750022 3DFF2CE9 03750020 3D0023E9 002FE900 00FFFF9A 0676FF08 76FF0A76 v..v..v......Õ/.Õ#.= .u.Õ,.="u. 000060
1F0000E9 00008A00 00B8FF8D E9FECCE9 0375003B 3DFF03E9 03750029 3DFF21E9 Õ!.=).u.Õ..=;.u.Õâ±Õ§.|..¤..Õ... 000080
00019C9A 50169C46 8D646A0C 76FFD88E 0008881E 56570000 C8C8000E CAC95F5E ^_èò..àà..WV.|...Ã.v.jd.F..P.... 0000A0
8D50169C 46800676 FF0876FF 016A006A 0000FFFF 9A5016FF 38868D64 6A256A00 .j%jd..8..P.....j.j..v..v..F..P. 0000C0
0000FFFF 9A0A76FF 0676FF08 76FF016A 006A0000 FFFF9A00 6A006A50 16FF3886 .8..Pj.j......j.j..v..v..v...... 0000E0
00670103 00000002 00850002 000ECBC9 5F5E1F00 00E90000 880000FF FF9A5052 RP.....|..Õ...^_èü....Ç.......g. 000100
017E0002 00870002 008E0103 00000004 009A0002 007F0002 00570103 007E0002 ..~...W......................~. 000120
01390103 001E0002 003E0103 00130002 01CC0103 00880002 01BA0103 00000006 .......¤.......ä.......>.......9. 000140
01800203 00400002 01030103 00880004 00250203 00A50004 00180203 00830002 ..*.........É...%...|...Æ...M..... 000160
1FFFFF00 109A020C 3E89088E FFFF881E 00000000 00000000 00000000 00040005 ..â..............|...Ä.>........ 000180
00000000 00000000 00000000 00050002 00020000 00040000 00020002 C80001B8 |..ù............................ 0001A0
5016C488 50088EFF FF88601E 06EC8855 00000000 00000000 00000000 00000000 ..................U.ã..'|...XP.á.P 0001C0
EE9A09C0 E80024E8 0000FFFF 9A058268 1E058468 1E09E2A3 E0865800 00FFFF9A .....X.ÀÈã..h...h.......Ò$.Òâ..Ÿ 0001E0

Dump of file SATURN:[PCCOMMON.DUMP.DLL]DA-XPORT.DLL;1 on 18-APR-1990 10:39:21.68
File ID (400,27,0)   End of file block 81 / Allocated 84

Virtual block number 29 (0000001D), 512 (0200) bytes

1E058A16 FF00FF68 00510100 9A004100 AC9A50CB 5DE58800 01B8071F 61FFFF0A ...■..|...Ì]ùP.¨.A....Q.h....... 000000
C8880188 098EBE31 74003D80 26470175 003D8026 7FFFB905 84068EFF 33000088 É..3.....¿..&.=.u.G&.=.t1/....Ì.ù 000020
9204E0C0 0E72412C AC09E9BF 1FF78807 1E061CEB E774AEF2 C0330874 CA88A6F3 µÌ.òt.3ã·ÕtÕŠ.....%.¢Õ.¯,Ar.âÁ.. 000040
FF047400 099E3E83 00560100 9A5000FC B8EC8855 C31FEDEB AAC20A05 72412CAC ¯,Ar..ó˙ŠÚ.ÜU.ã|=.P...V..>...t.. 000060
BE065688 C08ED88E 0017B857 56EC8855 CB5DE58B 00B60100 9A5000FF 88099C1E ...|..P...Ñ..Ì]ÜU.ãVW|...Ã.ã.V.ƒ 000080
0002CA5D E5885E5F 96EBEBF7 88AEF2FF FFB9C033 970C7496 401074C2 38AD222C ,"Ü;ôt.ã.t..3â¿..·Õ.%Š§._^.Ì]ò.. 0000A0
C4885049 D1F7AEF2 FFFFB9C0 33FA8892 1F74C008 00CA00D0 9A0676FF 57EC8855 Ù.ãW.v..Ã.ò..ât...ª3â¿..¯Õ%ÌÌP.á 0000C0
5EC4FFFF 8E560000 12C80002 CA5DE588 5F580000 FFFF9A50 1651521E 530002B8 £..S.RQ.P.....[_.Ì]ò..à...Vƒ..á^ 0000E0
8804C483 01800ECE 9A530600 ADE90374 400A47F6 260087E9 0375830A 47F62606 .&-G..u.ÕÑ.&-G.ãt.ÕÜ..S.ö....á.. 000100
08FC9A06 76FF0876 FFFA4689 19F68788 06D868F9 F7000CB9 9900FE2D 064688F0 Þ.F.-±..¿..%ªkÄ...-..Fª.v..v..■. 000120
7400FA7E 83647CC0 0802C483 01AD1A2E 9A50E42A 08478A26 065EC404 C4830192 ...á.á^.&.G.*ÕP...Ü..á..ã|d.-ª.t 000140
8026FC5E C4FE568C FC4689F2 468D08C4 8301D102 DA9A5016 F046800D9 A0681E61 a.h...FÞ.P.Ö.Ì..á..F·.F=.V±á^=&. 000160
FE76FF0A 6AFC4EFF 03E808C4 8301E902 949A5016 F0468009 A2681E13 745CFE7F .±\t..hÅ..FÞ.P...Õ..á.Š..N=j..v± 000180
8E0374C0 0804C483 010A1808 9A5016F0 468008C4 8301F618 BC9AFA76 FFFC76FF .v=.vª.¥.-..á..FÞ.P.Ã....á..ât.ƒ 0001A0
08FE5689 FC468902 3619089A 000004C8 90CBC95E C688000A 47C62606 5EC4FFFF ..á^.&6G...ó^èù.à....Ã.6..F=.V±. 0001C0
C02B9004 EB0CC483 015A0C42 9A0676FF 0876FF0A 76FF0C76 FF50FE76 FF1874D0 Ãt..v±P.v..v..v..v..B.Z..á.Š..+â 0001E0
```

Dump of file SATURN:[PCCOMMON.DUMP.DLL]DA-XPORT.DLL;1 on 18-APR-1990 10:39:21.68
File ID (400,27,0)   End of file block 81 / Allocated 84

Virtual block number 30 (0000001E), 512 (0200) bytes

```
C4830278 00549A06 76FF0876 FFFC568C FA46890E 468D5657 000008C8 90CBC999 .èù.à...WV.F..F°.V=.v..v..T.x..á 000000
FFF8880C C4830289 0F549A06 76FF0876 FF0A76FF 0C76FFFA 76FFFC76 FFF08804 ..Þ.v=.v°.v..v..v..v..T....á..½. 000020
33067EC4 1EDE88D7 88EC8855 CBC95F5E C78806C4 8302170E 2A9A5606 76FF0876 v..v.V.*....á..ú^ èùU.ã.=.8.á~.3 000040
4688FE87 08468ED8 8EC08CF9 2801F7AE F2FFFFB9 0A7EC4FF 758DAEF2 FFFFB9C0 å¿..·Ö.u.á~.¿..·Ö¾1+°.á.Ä.F..±.F 000060
880788EC 8855C850 C28C1FFA 88F388A4 F3C913A5 F3E9D149 A4027400 01C6F706 .¾ó..t.Ê11Ö¤Ê.è¤Ê.¤.°..ó]ùU.ã.=. 000080
D149A402 7401A8C7 88067EC4 D1F7AEF2 FFFFB9C0 33C08ED8 8CFE880A 76C51EDE 8.év..±.Ä.å3å¿..·Ö¾1á~..ú´.t.Ê11 0000A0
F7AEF2FF FFB9C033 067EC407 88EC8855 CB50C28C 1FFA88F3 88A4F3C9 13A5F3E9 Ö¤Ê.è¤Ê.¤.°..ó]ùU.ã.=á~.3å¿..·Ö¾ 0000C0
F8880A46 8AD9F741 AEF2FFFF B9C033DF 88067EC4 57EC8855 00CB50FA 889149D1 11..°]ù.U.ãWá~..Ö3å¿..·ÖA¾).F..« 0000E0
FF0C76FF 065EC4EC 885500C8 5DE5885F C28CC788 C78EFF33 04740538 264FAEF2 ·Ö&8.t.3..ú.ú.ð_.[]ù.U.ãá^..v.. 000100
88550008 CA50E588 07892602 57892606 5EC4025C 037E9A37 FF260277 FF260A76 v.&.w.&.7.~.\.á^.&.W.&...[]ò..U. 000120
46880656 89084689 00001D0A F7D8F706 56884711 7DC00808 4688FF33 535657EC åWVS3..F..å).G.V.¾ÄÄÖ....F..V..F 000140
0846880A 4E881575 C0080A56 890C4689 00001DDA F7D8F70A 56884711 7DC0080C ..å).G.V.¾ÄÄÖ....F..V..åu..N..F. 000160
EAD10901 E8D10646 88085688 0A4E88D8 8838E8D3 88F1F706 46880888 F1F7D233 3Ø¾þ.Ä.F.¥þ.Æ$8.Ä.N..V..F.1$1118 000180
46380672 07770856 380C7201 03E6F70A 4688910C 66F7F088 F1F7F475 D80808D1 1Ä.Ùu¶¾þ.Þ¾f...F.¾1.1r.;V.w.r.;F 0001A0
C08ED88C 57560008 CA50E588 5F5E5800 DA83D8F7 DAF70775 4F960233 4E017606 .v.N3Ø.Ou.¾Ö¾Ä.Ö.[^_.[]ò..VW.Ä.å 0001C0
8CFB880C C38300FC 1E88F388 5756C08E D08CC85E 5FA5F300 0AB90C16 8F09A48E /Ê.¢..¿..µÊ_^ù.Ä.åVW.µ..=..ù..«. 0001E0
```

Dump of file SATURN:[PCCOMMON.DUMP.DLL]DA-XPORT.DLL;1 on 18-APR-1990 10:39:21.68
File ID (400,27,0)   End of file block 81 / Allocated 84

Virtual block number 31 (0000001F), 512 (0200) bytes

```
8ED98CF8 880CC383 00FC1E88 F3885756 16E8F388 D98EA5A5 FCD88EC1 8ED98CC0 å.).ê.Ä=ÊÊ.).µŠ.VW.µ..=..û..«.). 000000
5756C08E D08CC85E 5F03FE47 C6FC7789 00FC1E89 4E7400E8 F881F388 A5A5FCC1 ê=ÊÊ.µ.«Ö.tN..=..w=6G±. ^ù.Ä.åVW 000020
575618E8 F388D98E A5A5A5A5 FCD88EC1 8ED98CC0 8CF8880C C38300FC 1E88F388 .µ..=..û..«.å.).ê.Ä=ÊÊÊÊ.).µŠ.VW 000040
00FC1E89 0E7400E8 F881F388 A5A5A5A5 FCC18ED9 8CF8880C C38300FC 1E88F388 .µ..=..û..«.).ê=ÊÊÊÊ.µ.«Ö.t...=. 000060
F388FCD8 8EC18ED9 8CD88C57 5604E800 8C575617 46E9C85E 5FFC7789 07FE47C6 6G±..w=_^ùÖF.VW.ÄŠ.VW.Ä.).ê.Ä=.µ 000080
8900FC1E 89CF740D E8F881A5 A5027403 3CA5A5FE 4588ADF8 880CC383 00FC1E88 ..=..û..«Ù.E±ÊÊ<.t.ÊÊ.«Ö.tÙ..=.. 0000A0
07880AE8 99078826 C08ED08C 14E80257 88260788 26C08ED0 8CC85E5F D98EFC5F _=.)_^ù.Ä.å&..&.W.Š..Ä.å&...Š... 0000C0
830DFC3E 8800D883 DAF7D8F7 07798024 C78AD088 DA885756 99078803 E8025788 ¯W.Š....VW.Ö.Ä.ú$.y.¾ÙÄÖ.Ù..>=.. 0000E0
67E89E84 03FE45C6 0F7500FF 80C18ED9 8CFC7D89 00FC3E89 1C7400E8 FF810CC7 ú...Ö.t..>=..)=.).ê...u.6E±.Ç.Ög 000100
D88C5756 C85E5F50 1FC6E8F8 880833C8 88876080 5507FE45 C6FF63E9 C85E5F1C ._^ùÖc.6E±.U$'..ù3Ù.«Ö6.]_^ùVW.Ä 000120
FCFE4588 FC7D890D FC3E8981 740DE8FF 810CC783 FE458AFC 758800FC 3E88C08E .Ä.>=..u=.E±.ú...Ö.tŸ.>=..)=.E±= 000140
7D8900FC 3E898C74 00E8FF81 0CC78300 FC3E8857 56C85E5F A5A50274 033CA5A5 ÊÊ<.t.ÊÊ_^ùVW.>=..û...Ö.t..>=..) 000160
1E88FCF8 885756C0 8ED88C02 E800C8C8 5E5FA8A8 FCC033C0 8ED88C03 FE45C6FC =6E±..Ä.Ä3å=¨¨_^ù.ÄŠ..Ä.åVW.«=.. 000180
007503FE 7F800DFC 1E88FCF8 885756C0 8ED88C02 E8008C11 E80C00FC 06830DFC =...=..Š..ÄŠ..Ä.åVW.«=..=...±.u. 0001A0
8CE4E85D DE885F16 89E857FC 77880C38 268955C8 5E5F0C00 FC2E83A5 A5FC7788 .w=ÊÊ..=.._^ùU.&8..w=WÖ.._.8]Š8. 0001C0
56C08ED8 8C02E800 8C11E80C 00FC0683 00FC1E88 FCF88857 56C08ED8 8C02E800 ÄŠ..Ä.åVW.«=..=...=..Š..ÄŠ..Ä.åV 0001E0
```

Dump of file SATURN:[PCCOMMON.DUMP.DLL]DA-XPORT.DLL;1 on 18-APR-1990 10:39:21.68
File ID (400,27,0)   End of file block 81 / Allocated 84

Virtual block number 32 (00000020), 512 (0200) bytes

```
E8DF87C8 5E5F0C00 FC2E83A5 A5A5A5FC 77880F75 07FE7F80 00FC1E88 FCF88857 W.«=..=...±.u..w=ÊÊÊÊ..=.._^ù.ÖÒ 000000
8C10E80C 00FC0683 00FC1E88 F8885756 C08ED88C 02E8008C E9E80F87 F7882A28 (*.¾.ÖŠÖ.ÄŠ..Ä.åVW.«..=...=..Š.. 000020
74033CA5 A5A8FC0C 00FC2E83 FE478AF3 8800FC1E 88F88857 56C08ED8 8C02E800 ÄŠ..Ä.åVW.«..=..µ.G±..=..=¨ÊÊ<.t 000040
09042688 9F036C07 279A48E8 1DC18A1D 8C8850E8 10988A1D 8E88C85E 5FA5A502 .ÊÊ_^ù|..¤..$P|¥.¤é.ŠH.'.l...åå. 000060
268A5017 32E89004 E81760E8 900AE817 1FE89010 E81720E8 36E806CE 8A06C888 |à.¤ö.Š6Ö .Š..Ö..Š..Öm.Š..Ö2.P.& 000080
575606DA 8A060488 09042688 9F068907 279AC30A F7000283 08F70773 589E0904 å..Xe.¾Ä.Ø.¾Öù.'.¿...åå.|à.¤Ö.VW 0000A0
FF02E800 FF047508 7488030A 7C800DFC 36890CEE 8300FC36 8851530C 38268955 U.&8.SQ.6=..Ÿ..6=..|...t.u..ÄŠ.. 0000C0
75F0FF41 F6087403 F8801375 7F01F6FF 32FE508A 00FC3E88 57C85E5F 505B5902 ØY[]_^ùW.>=..]±2.-..u..«.t.-A.Þu 0000E0
2180FF32 FE508A00 FC3E8857 C8F9C8E4 0803755F 8001F6F8 7480FF41 F6C85F08 ._Ù-Ä..t½-..u..ðù°ùW.>=..]±2..| 000100
D98CFC7D 89C85E5F 803180FF 320875F7 38FC7588 FE508A0D FC3E8857 56C85F7F .¯ùVW.>=..]±.u=;¾u.2..1._^ù.)=.) 000120
8ED08C57 56C85E5F A880F480 ADA5A5C8 5E5FA880 F480AD08 7503F880 A5FCC18E .Ê=Ê.«.u.Ù.¶.¨ ^ùÊÊÙ.¶.¨¯^ùVW.Ä. 000140
289CE857 5602E8C0 8ED08C57 5676E800 0888F388 575604E8 2884E857 5602E8C0 åŠ.VWÖÇ(Š.VW.µ|..ŠvVW.Ä.ÄŠ.VWÖ.( 000160
0C88F388 575604E8 2884E857 5602E8C0 8ED08C57 565EE800 0488F388 575604E8 Š.VW.µ|..Š^VW.Ä.åŠ.VWÖ.(Š.VW.µ|. 000180
8ED08C57 562EE800 1488F388 575604E8 286CE857 5602E8C0 8ED08C57 5646E800 .ŠFVW.Ä.åŠ.VWÖl(Š.VW.µ|..Š.VW.Ä. 0001A0
283CE857 5602E8C0 8ED08C57 5616E800 1088F388 575604E8 2854E857 5602E8C0 åŠ.VWÖT(Š.VW.µ|..Š.VW.Ä.åŠ.VWÖ<( 0001C0
38268955 FC7D8710 7407FE7D 80C18ED9 8C0DFC3E 88088800 0088F388 575604E8 Š.VW.µ|...Ä.>=..).ê.)±.t..)=U.&8 0001E0
```

Dump of file SATURN:[PCCOMMON.DUMP.DLL]DA-XPORT.DLL;1 on 18-APR-1990 10:39:21.68
File ID (400,27,0)   End of file block 81 / Allocated 84

Virtual block number 33 (00000021), 512 (0200) bytes

```
C08ED08C 5756DFEB 00FC3E8B F7882847 E80C7EBF 02C383CB 5E5F5009 8897FF0C ...|.]_^ù.û.¢~.ÒG(.%.>ø.ŠÔVW.Å.å 000000
EB27F3E8 575602EB C08ED08C 575676EB 000AB8F3 88575604 EB2808E8 575602EB Š.VWÒ.(Š.VW.µ|..ŠvVW.Å.åŠ.VWÒµ'Š 000020
000EB8F3 88575604 EB27D8E8 575602EB C08ED08C 57565EEB 0006B8F3 88575604 .VW.µ|..Š^VW.Å.åŠ.VWÒÙ'Š.VW.µ|.. 000040
C08ED08C 57562EEB 0016B8F3 88575604 EB27C3E8 575602EB C08ED08C 575646EB ŠFVW.Å.åŠ.VWÒÙ'Š.VW.µ|..Š.VW.Å.å 000060
EB2793E8 575602EB C08ED08C 575616EB 0012B8F3 88575604 EB27A8E8 575602EB Š.VWÒ''Š.VW.µ|..Š.VW.Å.åŠ.VWÒ.'Š 000080
FF39E95E 278EE856 057407FE 7D80C18E D98C00FC 3E880888 000288F3 88575604 .VW.µ|...Å.>ø..].é.)±.t.VÒ.'^Õ9. 0000A0
1C8808EB 00008800 EB001488 12EB0010 8817EB00 0C881CEB 00088821 EB00048B £..Š!£..Š.£..Š.£..Š.£..Š.£..Š.£. 0000C0
8C00FC3E 890CEF83 287407F2 7D803974 07FE7D80 00FC3E8B 57560018 8803EB00 .Š.£..VW.>ø..)±.t9.)·.t+.ÿ..>ø.. 0000E0
50098897 FF0C3826 89553E73 18F8832F 731CF883 087D88FC 7D89FC75 88C08ED8 Å.å.uø.)ø.)..«.ø/.«.ø>U.å8...|.] 000100
8FE8270C E80DFC3E 890CEF83 C47407F2 7D8002C3 83CDE827 21E802C3 83CB5E5F _^ù.û.Òl'Š¢.Û..)·.tá.ÿ..>ø.Ò.'Š¢ 000120
97FF0C38 2689550C 00FC2E83 CB5E5F5D 098497FF 0C382689 550C00FC 2E83F787 ¬%..ø..U.å8...Ç.]_^ù..ø..U.å8... 000140
8803E8FF 320F02E7 D0F88AE3 D0E300C8 9E5E5FE0 0AE400E8 01410025 9F5D0988 |.].X.AIÒÅõ.Å_^.ùÃDÅD.«ÅÒ.Ò2.Š.£ 000160
47471088 FE448905 87AD0005 89F828FE 884E4E00 FC3688FC C08ED88C 5756000C ..VW.Ã.åø.6ø.ÑN.±+«¿..Ù...D±..GG 000180
028800C8 5DE5885E 5F2693E8 037407FE 7D8000FC 3E885756 EC8855CB 5E5FF4E2 å¶_^ùU.ŠVW.>ø..)±.t.Ò.å_^.|]ù.£. 0001A0
00013040 B1127558 C0080000 FFFF9A52 16501653 C4885087 09E9A780 D4885200 .R¯å.IÕ.ñP.ŏS.P.R......ÃXu.Ÿə=.. 0001C0
FFD833C2 8C220806 C41EE322 060E885A D4794809 E98F0808 81067500 023D0774 t.=..u.Ÿ.:..Õ.Kyåz..."D.á..".ó3Ù. 0001E0
```

Dump of file SATURN:[PCCOMMON.DUMP.DLL]DA-XPORT.DLL;1 on 18-APR-1990 10:39:21.68
File ID (400,27,0)   End of file block 81 / Allocated 84

Virtual block number 34 (00000022), 512 (0200) bytes

```
FE8E007C E82210BF 22108E22 041EFF00 0388C28C 220C06C4 01AEE903 7322041E .."s.ÕO.á..".ô£....."ƒ."¢."Ò|.ƒ± 000000
D88E00D6 88C30000 FFFF9A0A 78680E01 6A087422 14302210 880073E8 2202BF21 l¢."Òs.|."ø."t.j..h(......Ùiø..Ã 000020
003AE825 1C8F251C 8EEC8855 00000A76 9A006A00 6A036A00 51E82214 8F22108E ƒ."¢."ÒQ.j.j.j..v...U.åƒ.%¢.%Ò:. 000040
001AE822 148F2214 8E0023E8 22148F22 148EEC88 5503E800 31E82214 8F22108E ƒ."¢."Ò1.Š.U.åƒ."¢."Ò#.ƒ."¢."Ò.. 000060
EF830E73 F738C322 041EFF00 028807E3 22060E88 0000FFFF 9A500646 8A50C033 3åP.F.P........"D.£....."Ù;%s..ÿ 000080
F0E90375 05843639 FF28F628 56570000 14C800C3 EEE810FF F2740245 08058804 ....E.t·..ŠŸù.à...WV+-+.96..u.Õb 0000A0
9A098E68 1EF676FF F876FF0C 6AF85689 F64689F2 5689F046 89C02805 84168800 .....+å.Fb.V·.F-.V%j..V½.v-.h... 0000C0
75003F80 26F646FF F65EC400 8CE90376 7FFFFE81 461974C0 080AC483 08621880 ..b..á..åt.F.±..v.Õ¥.á^-.F-&.?.u 0000E0
9A046A50 01458D8A 75003F80 26F65E88 F475003F 8026F646 FFF65EC4 0CE847EA ÕGŠ.á^-.F-&.?.u¶.^-&.?.uø.E.Pj.. 000100
08EC4688 FE5689FC 468902C4 8308A71A 609A56EE 5689EC46 8904C483 087118 2B (.q..á..FŠ.VŸV.m.Ì..á..Fø.V±.FŠ. 000120
F076FFF2 76FF0C6A 08F11689 08EFA3EE 5688EC46 886674C2 08FC4688 6074EE46 FŸtm.Fø.ôtf.FŠ.VŸEÿ...b.j..v·.vb 000140
02578926 078926FE 5688FC46 88EC5EC4 2C74C008 0AC48306 F11B809A 098E681E .h.....b..á..åt,á^Š.Fø.V±&..&.W. 000160
FFF05EC4 E8E80E74 C00A0788 26FC46FF FC5EC407 8A26F046 FFF05EC4 04EC4683 .FŠ.á^b.Fb&..á^ø.Fø&...åt.ŠÒá^b. 000180
000000C8 F451E900 028890C8 C95F5EA7 75003F80 26F05EC4 F475003F 8026F046 Fb&.?.u¶á^b&.?.uÌ^_èù.|..ÕQ¶à... 0001A0
C4830822 1A589A06 77FF2608 77FF262E 74080A47 F6263574 830A47F6 26065EC4 á^.&-G..t5&-G..t.&.w.&.w..X."..á 0001C0
C9044789 26085789 26064789 26025789 26078926 99C028F7 0A678026 065EC404 .á^.&.g.%+á.&..&.W.&.G.&.W.&.G.è 0001E0
```

Dump of file SATURN:[PCCOMMON.DUMP.DLL]DA-XPORT.DLL;1 on 18-APR-1990 10:39:21.68
File ID (400,27,0)   End of file block 81 / Allocated 84

Virtual block number 35 (00000023), 512 (0200) bytes

```
99C02813 7400773D 0C740072 3D277400 61309807 8A260A5E C4560000 0AC890C8 Ù.à...Vá^.&...=ø.t'=r.t.=w.t.+å. 000000
90F4E801 098E90F1 E802F546 C60301BE 9022E800 018901FC 46C6F628 9000EEE9 ÕŸ..+-óFø.¿..Š".ƒ..óFø.Šb.ƒ..Š¶. 000020
74C90837 74003F80 260A5EC4 0A46FF80 FC46C6FE E6830002 CE814375 0002C6F7 %ó..uC.õ...|±óFø..F.á^.&.?.t7.èt 000040
EB4000CE 810E75C0 00A9C688 15750074 30137400 62300674 00283098 078A2633 3&...=+.tø=b.t.=t.u..ó`.åu..õ.əŠ 000060
76FF0876 FF5601A4 68FE4E89 8DE88000 CE8190C4 E8C92805 74C000A9 C688900D Å..ó`.åt.+èŠá..õ..Š§.N±h£.V.v..v 000080
F006FF0A 478826FC 468A0E5E C4FF6AE9 037DC008 FA468908 C4830C1C 32E69A06 ..|2...á..F°.å).Õj.á^..Fø&.G...b 0000A0
88F85E88 C02AF846 8919F205 E001C103 E001C888 F9F7000C 899900FE 20C3881F ..Û-±..¿..%°.àIÅ.èIÅ.·..F½*å.^%. 0000C0
89260257 89260789 2699C028 0E5E8800 000447C7 F85E8804 4789260E 5E889807 ...^.&.G..^%úG....^.+å.&..&.W.&. 0000E0
067E811F F006FF56 000004C8 C8C95EC2 8CC38808 478826FA 468A0857 89260647 G.&.W..F°&.G..Û.õ^èÙå...V..b..-. 000100
24750A7C 087E8128 750E1606 7E8113E8 0000FE46 C707750D 7C087E81 0E750E0A ..u..~.|.u.úF±..Š..~...u+.~.|.uŠ 000120
F287F606 D868F9F7 000C8999 0DFE2DC3 8815750C 0A47F626 065EC400 01FE46C7 úF±..á^.&-G..u..Û-±..¿..%°kÃ.-.· 000140
609A0200 68147502 4408048B 08FAC681 02E6C1FE 76889090 7EE8C028 06740119 ..t.+åŠ~...v±è|..ó°....D.u.h...m 000160
03E0D1C8 88F9F700 0C899900 FE2D0646 88057400 08025489 048902C4 830E671A .g..á....T..Åtf.F.-±..¿..%°.àIÅ. 000180
89260647 892608FC 948808FA 848802E6 C1FE7688 065EC4FC 468919F2 05E0D1C1 èIÅ.·..Føá^..v±è|...°...ø.&.G.&. 0001A0
8026065E 881107C6 DE880447 89260244 89020088 FC768802 57892607 89260857 W.&...&.W..vø|...D.&.G..Bó...^.&. 0001C0
C103E0D1 C888F9F7 000C8999 0DFE2D08 46880000 04C890C8 C95E0001 88020A4F O..|..^èù.à....F.-±..¿..%°.àIÅ.è 0001E0
```

```
Dump of file SATURN:[PCCOMMON.DUMP.DLL]DA-XPORT.DLL;1 on 18-APR-1990 10:39:21.68
File ID (400,27,0)   End of file block 81 / Allocated 84

Virtual block number 36 (00000024), 512 (0200) bytes

 478A2608 5EC47274 1007F626 FC5EC451 7400067E 83FE5E8C FC468919 F205E0D1 ìÅ.·..F•.^±.-..tQá^•&-..trá^.&.G 000000
 5EC404C4 830EB80E CE9A0876 FF0A76FF 5C74C008 02C4830E 7939CA9A 50E42A0B .*ðP.ò9y..á..ât\.v..v..ö.¡..á.á^ 000020
 08578926 06478926 02578926 07892699 C028085E C4000002 47C72600 07C626FC •&ó..&úG...á^.+ô.&..&.W.&.G.&.W. 000040
 74C00802 C4830ECA 39CA9A50 E42A0B47 8A26085E C4217410 07F626FC 5EC42AEB Š*á^•&-..t!á^.&.G.*ðP.ò9ò..á..ât 000060
 023C0324 0A478A26 065EC4F6 28560000 04C8C8C9 0CE40ECE 9A0876FF 0A76FF08 ..v..v..ö.ö.èùà...V+-á^.&.G.$.<. 000080
 5E883974 0119F287 F6060868 F9F7000C 899900FE 20C38815 75080A47 F6265575 uU&-G..u..û-±..¿..%ªkÄ.-.·..t9.^ 0000A0
 9A50E42A 08478A26 0677FF26 0877FF26 50287EC0 08FC4689 06472826 07882606 .&..&+G..F•.å-(P&.w.&.w.&.G.*ðP. 0000C0
 88260647 8826065E C4FFFF8E 200A4F80 26065EC4 0874FC46 3808C483 0DC134A4 Ê4è..á.;F•t.á^.&.O. ƒ..á^.&.G.&. 0000E0
 880F2238 FE9A000A 88EC8855 C8C95EC6 88000004 47C72602 57892607 89260857 W.&..&.W.&úG....ó^èùU.&¡...±;".¡ 000100
 89237EA3 08568806 4688239A 16892398 A3105688 0E468823 AA1E8C23 A8A323AE Ò#È´#..˝#.F..V.È.#...#.F..V.È-#. 000120
 0123A606 C7030BE9 037425F6 7E80038D E9000023 A206C700 0023A406 C7238016 ..#ú.È#..ú.Å#..Ö...—%t.Ö..ú.Ì#. 000140
 06C72396 A3237CA3 2382A323 9CA3239E A32386A3 23A0A323 84A32388 A3C02800 .+âÈ.#È.#È.#È.#È.#È.#È.#È|#È.#ú. 000160
 3F80260A 5E88903E E8003025 0E06C70A 46FF4975 30017F80 260A5EC4 0020250E .% .á^.&...0uI.F.ú..%0.Š>..^.&.? 000180
 9C06FF1A 75002388 3E830E75 203F8026 9028E800 00239C06 C7238806 FF0D7528 +u....#ú..#..Š(.&.? u..>.#.u.... 0001A0
 078A260A 5E880A46 FF239606 FFC7752D 3F80260A 5EC400E8 237C06FF 9014E823 #Š....|#Š.á^.&.?-uù...#.F..^.&.. 0001C0
 468908C4 8308C7E8 0E23AC68 1E0A76FF 0C76FFDD 75C00802 C4830978 E80E5098 .P.Òx..á..áuI.v..v..h˜#.Òú..á..F 0001E0

Dump of file SATURN:[PCCOMMON.DUMP.DLL]DA-XPORT.DLL;1 on 18-APR-1990 10:39:21.68
File ID (400,27,0)   End of file block 81 / Allocated 84

Virtual block number 37 (00000025), 512 (0200) bytes

 3E830D74 0023963E 8323ACA3 D8F723AC A1239606 FF0C7D00 23AC3E83 0C56890A ..V..>˜#.)....#À˜#¼ÀÈ˜#.>.#.t..> 000000
 1E0A76FF 060A46FF 239E06FF 2D752E3F 80260A5E C4002025 0E06C706 7530250E .%0u.ú..% .á^.&.?.u-...#.F...v.. 000020
 9E0EFF00 0123A606 C70A7D00 23A63E83 0C56890A 468908C4 83087BE8 0E23A668 hÌ#.Ò(..á..F..V..>Ì#.).ú.Ì#..... 000040
 238606C7 0675006C 30287400 683D4074 004E303D 7400463D 98078A26 0A5EC423 #á^.&...=F.t==N.t@=h.t+=l.u.ú..# 000060
 4EE91C75 003F8026 0A5EC40A 46FF0375 4C3F8026 0A5EC409 75002386 3E830002 ...>.#.u.á^.&.?Lu..F.á^.&.?.u.ÕN 000080
 46899807 8A26C8E8 00082386 06C7D0E8 00102386 06C7D8E8 00012386 06C79002 ..ú..#..ŠÀú..#..ŠÀú..#..Šà&....F 0000A0
 78740069 30F8468B 20F84683 238406FF 08750058 30057400 47300A74 00453DF8 ½=E.t.=G.t.=X.u....#.F½ .F½=i.tx 0000C0
 3E839001 59E90140 E9037500 25300152 E9037E01 3FE90375 00633001 91E9037E ~.Õ..=c.u.Õ?.-.ÕR.=%.u.Õ@.ÕY...> 0000E0
 C4262398 1EC400E8 00000247 C7260789 2623A2A1 1FC42623 981EC415 75022386 .#.u.á..#&á.ÀÀ#&..&úG...Š.á..#&á 000100
 018DE903 740023A2 3E830170 E9037500 23A43E83 04239806 83078926 23A2A11F .ÀÀ#&.....#..>È#.u.Õp..>À#.t.Õ§. 000120
 0A6A0000 237C06C7 23A006FF 01ACE9FF FF8801AF E9037520 0A47F626 237E1EC4 á.~#&-G. u.ÕÈ.¡..Õ˜....#ú.|#..j. 000140
 000423A6 06C7239E 06FF2384 06FF2382 06FFF2E8 086A90C3 E802C483 019EE80E .Ò...á.Šû.j.Š·...#...#...#ú.Ì#.. 000160
 A1287423 AC0639FA 46892386 A3C02B7A 74012386 3E830081 E9037508 23863E83 .>.#.u.Õ...>.#.tz+âÈ.#.Fª9.˜#t(À 000180
 C00823AC A10523AC 2E839090 13E80000 23AC06C7 0A740023 963E83FA 468923AC ˜#.Fª.>.#.t.ú.˜#..Š.....˜#.À˜#.â 0001A0
 7E8302C4 83048DE8 0E3A6A02 C4830130 E80E106A 02239806 8323ACA3 C028027D ).+âÈ˜#...#.j..ÒO..á.j:.Ò...á..- 0001C0
 9007E823 ACA3C028 0270C008 23ACA300 052DFA46 88157400 23963E83 227400FA ª.t".>.#.t..Fª-..È˜#.â).+âÈ˜#Š.. 0001E0

Dump of file SATURN:[PCCOMMON.DUMP.DLL]DA-XPORT.DLL;1 on 18-APR-1990 10:39:21.68
File ID (400,27,0)   End of file block 81 / Allocated 84

Virtual block number 38 (00000026), 512 (0200) bytes

 3FE9106A FF10E902 23980683 02C48300 F1E80E10 6A042398 2E830000 23AC06C7 ú.˜#.....#.j..Òp..á....#.Õ..j.Õ? 000000
 0428E80E 256AFF2A E90349E8 0EF876FF F4E8016A 90FF39E9 026EE80E 006A90FF ..j..Òn.Õ9..j.Š¶.v½.ÕI.Õ*.j%.Õ(. 000020
 0A468809 74002386 3E830A7E 00673005 7C00653D FF0CE903 75006430 90FF21E9 ÕI..=d.u.Õ..=e.|.=g.-Õ.>.#.t..F. 000040
 6F3DFE80 E9037500 6E30903A E8FE5689 FC468940 0C56880A 46880A4E FF0C5688 .V..N..F..V.@.F•.V±Š:.=n.u.Õ.±=o 000060
 03750078 30FEB9E9 03750075 308F7400 7330FEE0 E9037500 703DFEE4 E9037500 .u.Õõ±=p.u.ÕÀ±=s.t.=u.u.Õ¿±=x.u. 000080
 EC75253C 0474C00A F6468807 8A26FC5E C4FC46FF 9034E80A 46FF9081 E8FF79E9 Õy.ŠY..F.Š4..F•á^•&...F-.ât.<%u& 0000A0
 C40C5689 0A4689FE 5688FC46 8806C483 044CE80E 0A76FF0C 76FF500A 462BC388 .Ò+F.P.v..v..ÒL..á..F•.V±.F..V.á 0000C0
 23A2A1FE 51E90374 200A47F6 26237E1E C4FC63E9 0374C00A F6468807 8A260A5E ^.&...F-.ât.Õc•á.-#&-G. t.ÕQ±ÀÀ# 0000E0
 8323A006 FF04740A 067E8300 20250E06 C7067400 239E3E83 56570000 12C8C8C9 èùà...WV.>.#.t.ú..% ..~..t....#. 000100
 0683FE56 89FC4689 02578826 07882623 981EC419 75102386 3E830774 0223863E >.#.t..>.#.u.á..#&..&.W..F•.V±.. 000120
 1EC40EE8 0000FE46 C7FC4689 07882623 981EC411 740023A0 3E83902C E8042398 .#.Š,..>.#.t.á..#&...F•úF±..Š.á. 000140
 0674FE46 08FC4688 0E740023 7C3E8302 23980683 FE5689FC 46899907 88262398 .#&....F•.V±...#..>|#.t..F•.F±t. 000160
 83317500 23A03E83 F45689F2 468923AA 168823A8 A1250CA3 C0289003 E806468B .F.Š..+âÈ.%À˜#..˜#.F·.V¶.>.#.u1. 000180
 00D283D8 F7FE5688 FC468820 07C626F2 46FFF25E C41D750A 067E8328 7D00FE7E ~±.)+.~..u.á^·.F·&ó.-.F•.V±%Ä.#. 0001A0
 76FFFA5E 8CF84689 238A8800 00F646C7 9006E800 01F646C7 FE5689FC 46890AF7 %Ö.F•.V±úF-..Š..úF-..¡.#.F½.^ª.v 0001C0
 109AF876 FFFA76FF 45740023 9E3E830A C4831441 39C09AFC 76FFFE76 FF501E06 ..P.v±.v•.â9A..á..>.#.tE.vª.v½.. 0001E0
```

```
Dump of file SATURN:[PCCOMMON.DUMP.DLL]DA-XPORT.DLL;1 on 18-APR-1990 10:39:21.68
File ID (400,27,0)   End of file block 81 / Allocated 84

Virtual block number 39 (00000027), 512 (0200) bytes

                                                                        .]..á...I#+à.Nb.è—..>.%.u.ú..%.. 000000
 0000250C 06C70675 08250C3E 830D7EC9 08F04E89 C8B23A6 0E8804C4 830F5003 .Nbá~·Š.&6.0G.èI.á.¶.–·.F¶.Nb... 000020
 840E88F0 4E89F446 8CF27E89 F47FC008 49C18847 3005C626 05E8F27E C4F04E88 #.^Ÿév·á^½&.....èt.<¤|..., F.F½&. 000040
 8026F846 FF46202C 80037C61 3C0774C9 08048807 8A26F85E C4F276C5 EE5E8C23 ?.uÐ.v·.^¶.^Ÿ.>.#.u.À.#...#t..— 000060
 F67E8308 74239C06 082388A1 14750023 A03E83EE 5E8EF45E 8CF27689 E375003F .u.|..Š.+áP.Ò...á.^_èùà...WV.–.. 000080
 00067E83 56570000 10C8C8C9 5F5E02C4 8302FFE8 0E50C02B 02E80001 88057500 t./..À.#...#.F½.V°..._#.Ö...>.#.t 0000A0
 74082386 3E83008F E9022398 0683FA56 89F84689 239A1688 2398A100 01BE1874 .á..#&..&.W..F½.V°Š.á..#&...F=.F 0000C0
 4689FC46 89078826 23981EC4 10E8FA56 89F84689 02578826 07882623 981EC413 ½.^°...#..>.#.t..F½.F°u.|..Š...~ 0000E0
 7E83900A E80C0288 1575FA46 08F84688 0E740823 863E8304 23980683 FA5E8CF8 =.u.|...F½.^°.F½.V°.F·.V¶+–96.#t 000100
 74239E36 39F628F4 5689F246 89FA5688 F84688FA 5E8CF846 890C0988 097500FC ...I#Š..á^·.F·&.7.t.F;ö–.ŠÚ.Fá^· 000120
 F25EC446 90EDE810 7ECE3846 1574003F 8026F246 FFF25EC4 900EE823 A60E881C .F·&.7.u¤.>¯#+±.>.#.u.W.ÒY..á.V. 000140
 FF5602C4 830159E8 0E570875 0023963E 83FE2823 AC3E88F3 75003F80 26F246FF v°.v½.Ò°..á..>.#.t.W.Ò<..á.^_èÙ. 000160
 90C8C95F 5E02C483 013CE80E 57087400 23963E83 06C48301 83E80EF8 76FFFA76 à...À.#...#.F=.V±.–.gt..–.Gu.¯.Š 000180
 E8018005 7547067E 83067467 067E83FE 5689FC46 89239A16 882398A1 000006C8 ..*å.F°.>.#.u.ú.I#...–°.t..>I#.u 0001A0
 750023A6 3E830074 00FA7E80 000623A6 06C70675 00239E3E 83FA4688 C02A9003 .ú.I#...6.#.6I#.v..6¨#.6¨#.v±.v= 0001C0
 FC76FFFE 76FF23A8 36FF23AA 36FF0676 FF23A636 FF238436 FF000123 A606C706 ..."&.....á..–°.t..>|#.u..6¨#.6´ 0001E0
 A836FF23 AA36FF14 7500237C 3E831874 00FA7E80 0EC4830C 161EFF26 221A068E

Dump of file SATURN:[PCCOMMON.DUMP.DLL]DA-XPORT.DLL;1 on 18-APR-1990 10:39:21.68
File ID (400,27,0)   End of file block 81 / Allocated 84

Virtual block number 40 (00000028), 512 (0200) bytes

                                                                        #..."&.....á..>|#.t..>I#.u..6¨#. 000000
 FF23AA36 FF147500 23A63E83 18740023 7C3E8304 C4830C1A 1EFF2622 1A068E23 6¨#..."&..".á....#.ú..%..À.#... 000020
 9C060823 88A10000 250C06C7 08239806 8304C483 0C221EFF 26221A06 8E23A836 #t..v±.v=..."&..&..á..át.|..Š.+á 000040
 C02802E8 00018805 74C00804 C4830C26 1EFF2622 1A068EFC 76FFFE76 FF187423 P.Ò).èù.à...V.>Ê#.u<á.–#&.O.x..F 000060
 468A1478 044FFF26 237E1EC4 3C750023 A43E8356 000000C8 90C8C901 29E80E50 .&.7&..&.G.&..*ðŠ..6.#S.v..p1... 000080
 83171931 709A0676 FF532380 36FF10E8 E42A0488 2602478E 2607FF26 37882606 á.ðu...Ê#Š....À#^èù.à...WV.>Ê#.u 0000A0
 750023A4 3E835657 000002C8 90C8C95E 23A206FF 9005E823 A406FF07 754006C4 U.v..––PŠ..6.#.6–#.6.%.p1...á.ðu 0000C0
 754006C4 83178131 709A250E 36FF237E 36FF2380 36FF18E8 507EF608 06768857 ...Ê#.6N.à–.á.–#&.O.xá..%&.?&..& 0000E0
 2607FF26 3F882625 0EA0D478 044FFF26 237E1EC4 1E7EC008 4EC68823 A406FF04 .G.&..*ðŠà.>Ê#.u..F...À#^ èùà... 000100
 000002C8 C8C95F5E 23A20601 06468807 750023A4 3E8304E8 E42A0588 2602478E WV.v..>Ê#.u^Š".6.#.6–#á^.Ž...P.p 000120
 709A5098 078A2606 5EC4237E 36FF2380 36FF22E8 5E750023 A43E830A 76885657 1µ..á.ðu...Ê#.F..6N.átXá.–#&.O.x 000140
 78044FFF 26237E1E C42574C0 084EC688 0646FF23 A406FF04 754006C4 8317F331 ëá^.&..á.–#&.7&..&.G.&..*ðŠò.>Ê# 000160
 23A43E83 CAE8E42A 05882602 478E2607 FF263F88 26237E1E C4078A26 065EC4CD .u..F...À#^ èùà...VÀ¨#..¨#.F¶.V– 000180
 F65689F4 468923AA 168823A8 A1560000 0CC8C8C9 5F5E23A2 06010A46 88077500 +á.F=.F°.6¯ŦR.V¶...,..á..F½+Þ+v. 0001A0
 067628F0 28F84689 04C48314 2C03109A F476FF52 23AC3688 FA4689FC 4689C028 .>.%.u..Ÿ.Š..>.%.u.N.>.#.u"á^¶&. 0001C0
 8026F45E C4227500 23963E83 4E017508 250C3E83 08E802EE 83057510 250C3E83 ?-u..>.%0u..F¶&...P.Òq±.á..N½.>. 0001E0
 0E3E83F8 4EFF02C4 83FE71E8 0E509807 8A26F446 FF127530 250E3E83 1975203F

Dump of file SATURN:[PCCOMMON.DUMP.DLL]DA-XPORT.DLL;1 on 18-APR-1990 10:39:21.68
File ID (400,27,0)   End of file block 81 / Allocated 84

Virtual block number 41 (00000029), 512 (0200) bytes

                                                                        %0t..–—..>.#.t..–..t..F°.Òf..>.% 000000
 250C3E83 0066E80E FA46FF07 7400067E 831B7400 23963E83 077EF608 08743025 .t..F=.Òp..>.#.u)V.Ò-±.á..–..t.. 000020
 830A7400 067E8302 C483FE7E E80E5629 75002396 3E830070 E80EFC46 FF077400 –=.u..Ò9..>.%.t..–=.u..Ò0..V½.v– 000040
 F676FFF8 76FF0040 E80E0475 00FC7E83 0A740025 0C3E8300 39E80E04 7500FA7E .v¶.Òç±.á..>.#.t.ú..% .V.Ò8±.á.^ 000060
 5E02C483 FE38E80E 56002025 0E06C70E 74002396 3E8306C4 83FE85E8 0EF476FF èù.>.#.t.|+.Š.| .P.Ò8».á.ÙJ0.Òà» 000080
 FDC8E80E 306ACB02 C483FDD2 E80E5000 208803E8 002BB805 74002388 3E83C8C9 .á..>.%.u..>.#.t.|X.Š.|X.P.Ò^».á 0000A0
 C483FDAA E80E5000 788803E8 00588805 74002384 3E831775 10250C3E 8302C483 .Ùà...WVúF±..á^.&.7ªu.á..#&.7... 0000C0
 98068337 88262398 1EC41275 2A3F8026 0A5EC400 01FE46C7 56570000 06C8C802 #..F.Š'.á^.&.7-u.úF±...F.+–.^.&. 0000E0
 8A260A5E 88F62B0A 46FFFFFF FE46C708 752D3F80 260A5EC4 9060E80A 46FF0223 ..F°<0|?<9.;96.#u.<Òu.Ù..%0...«Š. 000100
 06E8F888 0030250E 06C70675 303C0A75 239E3639 3B7F393C 3F7C303C FA468807 &.=9..&.....ÒèX..ÒÌX.à.ÒÒ.þG&.=0) 000120
 7D303D80 2647F188 30E983C8 03E1D1CE 0302E1C1 CE889805 8A261B7F 39308026 Ò.–..F..F±¥Ý.Þá^.&.7.F..V.^ èùà. 000140
 04C8C8C9 5F5E0C56 880A4688 37892606 5EC4F088 EEF7FE46 880C468C 0A7E890F ..W¦...F=.^±.N.á–=Š.G&.=.t.Ì8.u¶ 000160
 F4750038 26117400 30802647 01E8FC7E C4064E8A FE5E8CFC 46890C10 88570000 |...–=.F±Š...–=.F±+á èù.à...|±.. 000180
 890DFE88 000004C8 90C8C95F C028FE46 8CFC7E89 9009E8FE 468CFC7E 890001B8 F=.^±á^=á-G..u%+&&.G.&.G...&.G.&. 0001A0
 89260647 8926990A 47882604 478926C0 28257583 0A47F626 FC5EC4FE 5E8CFC46 W.&..&.W.&6G....ù.ÒŠ..ù.Ò.F=.;.&. 0001C0
 1FEC0638 0CFC4683 C28CC388 17E8C28C C388FF08 47C62602 57892607 89260857 uù;.Ÿ.u§+á.èù.U.š.^.;.Ò.r.¤..3áÒ 0001E0
 E9C03300 098A0872 09E71E38 065E88EC 885590C8 C999C028 8D751FEE 1638C375
```

Dump of file SATURN:[PCCOMMON.DUMP.DLL]DA-XPORT.DLL;1 on 18-APR-1990 10:39:21.68
File ID (400,27,0)   End of file block 81 / Allocated 84

Virtual block number 42 (0000002A), 512 (0200) bytes

```
C08C065E C4EC8855 C850E588 0009E987 C6F375C0 850000FF FF9A5316 EEE916E2 å.ÕŸ.S......åuµó.Õ...[]ùÙ.‡á^..å 000000
FC3E831E 73FFF13D 06468857 5602EC83 EC8855C8 50E58801 FE4F8026 0574C308 .Ût.å.O±..[]ùÙ.ä.å.VW.F.=þ.±..>= 000020
449A0676 FF087500 78E80574 0018E815 750082E8 1FFCA312 740025E8 0875001F ..u.Ò%.t.È=.Ò..u.Ò..t.Òx.u..v..D 000040
C033FE5E 89FEE383 43065E88 0776065E 3900F088 C850E588 5E5F02C4 83160D36 6Ï..á._^.[]ùÈþ.9^.v..^.C.D±.^±3å 000060
2000A31F FE1687C2 883874FF FA8308C4 831AA137 F09A5002 80510E4F 8D50501E .PP.O.Õ¯.P.þ7À..á..ª.t8.ô..±.È. 000080
02A30000 A3000A88 0C478948 480008A3 C033D88E FE5E8800 08A30A8E 0574020B .ªt..ÕÈ...^±.Ã3åÈ..HH.G.¦..È..È. 0000A0
6CE82000 1E8ED833 064E88C0 8ED88CC3 1FD88C00 06A3000D 05000AA3 01478000 ..G.È.....È...Ã.O.Ã.å.N.3Ù... Òl 0000C0
89F84689 1855387E 9A0676FF 006A0876 FF006A56 00000AC8 C3098EC1 8CD2081B ..ª.è.\Ûà...Vj..v.j..v..~;U..F%. 0000E0
FE5689FC 468902C4 831B6E1A 6D9A56F8 768B902F EB99C02B 0674FFFF C2F7FA56 V¹%ô..t.+å.Š/..v%V.m.n..á..F=.V± 000100
90C8C95E FE5688FC 46889007 EB08C483 1ACD3A88 9A50FE76 FF006A56 1274D008 .Àt.Vj..v±P.¡:ë..á.Š...F=.V±^èù. 000120
F30A76C5 FE88C803 D9F7AEF2 C033F788 067EC4D9 8827E30E 4E881E56 57EC8855 U.ÈWV..N.D'.\á-..%3á·Ò%).ù.±év.µ 000140
56EC8855 00C850E5 885F5E1F C188D1F7 49490474 0477FF45 3A26C933 FF448AA6 Ì.D.3èå:E.w.t.II%Ì.è.^ .[]ù.U.åV 000160
76FF0876 FFEC8855 1F35E908 7EC51E99 01750AF9 83023306 46880C4E 8801B357 W°..N..F.3ø.ª.u...é~.Õ5.U.å.v..v 000180
C71CE884 8034300C 3406C7C8 50E58815 42E90374 C0850000 FFFF9A50 50C03306 .3áPP......åt.Õ8..[]ùú.4.04¯.Š.ú 0001A0
000C7C3E 838A8030 310C3406 C708E881 8031300C 3406C712 E8838033 300C3406 .4.03¯.Š.ú.4.01¯.Š.ú.4.10¯..>|.. 0001C0
38649A0C 30881B3A 00AC9A0C 36A3E42A 32310C34 06C70675 8C3C0C7A 1EFF0474 t...z.<.u.ú.4.12*ôÈ6..¯.:.£0..d; 0001E0
```

Dump of file SATURN:[PCCOMMON.DUMP.DLL]DA-XPORT.DLL;1 on 18-APR-1990 10:39:21.68
File ID (400,27,0)   End of file block 81 / Allocated 84

Virtual block number 43 (0000002B), 512 (0200) bytes

```
1C550A94 9A0C3636 FF1C4901 009A50FF E4050C36 A11C4001 009A5000 FD881C38 8.¡=.P...@.À6..õ.P...Ì..66....U. 000000
D1D8D1D9 D1FAD1D8 D1D9D1FA D129747F 80C2F7C0 33025488 0C88FC00 FC3E88C3 Û.>=.=...T.3å%ô..t)Ì¹ÌÌÌÃÌ¹ÌÌÌÃÌ 000020
D08AC888 C3F78806 55890440 89024589 000005C7 3800C281 8FE68008 D1D9D1FA ¹ÌÌÌÃ.Ì..ô.8ù....E..M..U..%û.à.Ã 000040
D1D3D1E2 D1D3D1E2 D1F88AAD DC8AF08A AD048AC8 0AADC888 ADFC0DFC 3E88EAEB Šõ.>=.=Ù.åÙ.à.åÙ.þ.ÈÙ.%ÌåÌ£ÌåÌ£Ì 000060
D1387238 002D3077 47E03D7F F025E922 EC8AF90A 808101CA 800374C0 0AD3D1E2 åÌ£.ët..ò.Ÿ..ª.‡"Õ%þ.=ÁGw=-.8r;Ì 000080
17747F80 30008005 08730003 8301C680 107401C6 F6157207 77D13AE0 D1E0D1E0 ÀÌÀÌÁ:Ìw.r.-6.t..ó..Æ.s....=..t. 0000A0
45890589 C033FED8 E9C3F788 0589C68A E38A0245 89E50AC7 0A7FE780 1674C008 .åt..Ó..ú.Ì.E..D.6...%ûÕÙ±3å...E 0000C0
C388D088 DA8811E8 DAF71579 D208D833 D0881DE8 C388008B DA88D233 C3F78802 ..%û3ø.Ö.Ã.ûŠ..Ã3Ù.øy.%ÕŠ..Ö.Ã.û 0000E0
C8881DE8 C388C888 DA88D233 0474E99E 848024C4 8A000883 DAF7D8F7 0779C008 .åy.%Ù%Ö.Ù..á$.Ç.Õt.3ø.Ö.à.ûŠ..à 000100
338024C4 8A000883 D9F7D8F7 0779C008 C388C888 DA8811E8 D9F71579 C908D833 3Ù.èy.%ÌŠ..Ö.à.û.åy.%Ù%Ì.Ù..á$.3 000120
00D283C0 D10026E8 03E80035 E808E800 28E800E8 003AE807 85E98560 8DD233FF .3ø§'.Õç.Ò:.Š.Ò+.Š.Ò5.Š.Ò&.Ìå.ø. 000140
E8002CE8 C34E7502 080039E8 03E8005D E808E800 3EE800E8 009CE8C3 C8D16775 ugÌàûÒ..Š.Ò>.Š.Ò].Š.Ò9..øuNûÒ,.Š 000160
D1830002 83F508F7 02F7D1F7 0D79FF08 C9330041 E803E800 78E808E8 002CE800 .Ò,.Š.Ò(.Š.ÒA.3è..y.%Ì%ø%Ã%.ø..Ì 000180
13F581F9 80CD0AE8 2201850B 33001CE8 03E80056 E8C3CAD1 21750001 83C20100 .Ìô.Ì.ulÌòûÒV.Š.Ò..3Ùç."Ò.ë.ª.%. 0001A0
0FB6F988 08EE8391 AD91AD93 AD060A92 AD00A4E9 FDE9E9C3 01720002 83C3130B Ù.û.ø.r.ûÕÕ»ÕÈ.Ù..øÙ.Ù.Ù..Ÿ..ªÑ. 0001C0
83CA7F20 F9837872 03FEE981 D874C908 E9D1E9D1 E9D1E9D1 7FE58010 CE80F122 "þ.ð..Ì.ÌÕÌÕÌÕÌÕ.ètÃ.Õ±.rx.ª .Ò. 0001E0
```

Dump of file SATURN:[PCCOMMON.DUMP.DLL]DA-XPORT.DLL;1 on 18-APR-1990 10:39:21.68
File ID (400,27,0)   End of file block 81 / Allocated 84

Virtual block number 44 (0000002C), 512 (0200) bytes

```
F9D100E4 D07FE183 F988E98A 04EE83C1 86ACC88A ADF88AAC DA8AD233 2FE825E9 Õ%Š/3ø.Õ¯.%Ù.à¯.è.Ÿ..Õ.ª.Ã.ÃõÃÌª 000000
D200F501 FA801A7C 08F980D9 F720E983 997F20F9 8347727E E9804D74 C908DCD0 ÃÈ.ètM.Õ-rG.ª ...Õ %).ª.|..ª.%Ã@ 000020
EED0000A 80018201 FA8015E3 E1E808E9 80F632E6 8AC48AF8 8ADF8AD3 0A01E280 .ã..Æ.Õ.%.á.Ì2-.Õ.ŠÃD..ª.ÿ..Õ.ÃŸ 000040
FD35E9C3 D088C033 00D18000 81F9C3C3 880088CA 8AF3E200 D280DAD0 D8D1D8D1 ÌÃÌÙÃÕ.ø.ãµ.ò.Ã.ûûªŸ..Ì.3å.ÃûÕ5» 000060
067C89E0 737FF0FA 817FE680 D78810EF 83067C03 0DFC3688 0131E807 800068E8 Õh.¯.Õ1..6=..|..ÿ..=.Ì..ªþ.sÃ.|. 000080
FA817FE6 80D78800 80EF8102 7C030DFC 36880108 E8038000 87E8FD0F E9C3FE88 .±ûÕ.»Õ..¯.Õ...6=..|..ÿ...=.Ì..ª 0000A0
FC368800 53E8C3FE 88067C01 10EF8300 FC368800 1EE8C3FE 88027C89 DF737F80 ..=Õ.|..±ûÕ...6=..ÿ..|..±ûÕS..6= 0000C0
0DFC3688 C08EA5A5 A5A5C18E D98CC08C 0DFC3E88 FCC3FE88 027C0100 80EF8100 ..ÿ...|..±û=.>=..å.\.èEEEE.á.6=. 0000E0
D1E9D1E9 D10035B8 7FE580CF 88F0E783 064C89CA 0A0FE183 F988064C 8800108A ¤...L..ª.Ã..ò.L..Õþ.Ù.Ì.¡5.ÌÕÌÕÌ 000100
88C08EA5 A5C18ED9 8CC08C0D FC3E88FC 0082E93F E8D9F704 7D0433E9 81E9D1E9 ÕÌÕ.Õ3.).%ÌŠ?Õ..=.>=..á.\.èÈÈ.á. 000120
E1D10018 887FE580 CF8880E7 83024C89 CA0A7FE1 83F98802 4C880080 8A0DFC36 6=.¤...L..ª.Ã..ò.L..Õ..Ù.Ì.¡..ÌÃ 000140
EF88C888 0A74C838 FA088000 E781147C EF88C838 D9F7487D 0096E981 ED32CD8A .ë2Ù.Õ..)H%Ì;à.ÿ|..Õ...ª;àt..à.ÿ 000160
E84608E9 800004C6 140A00D2 800082F5 01FA8014 7C08F980 D233EA28 8000E581 .Ì..+õ3ø.ª.|..ª.%ÿ..ø...6...Õ.FŠ 000180
E18AEF8A 00018BC3 348AD188 C933C32C 88E822EE 8AD7C18A 0C3A8B0C E3348AE7 Õ.4D.£:..èa.Ÿ"Ò.,û3è.Ì.4ûÈ...ÿ.Ã 0001A0
0E88E2D3 CC8AF088 027400DA 8001B281 FA80D30A DE22D70A FAE2D7D0 EAD106E3 D.ÌõÃaäª.a"8.Æ.ª.ÿ..Õ.t..».åÆå.. 0001C0
C8E9C3F5 D3014C74 7F80C3F7 C3FAE200 14804606 E33488F2 02CE2BC8 039800FC =...à+ö.·.4D.F...ãªÙ%û..tLÌÆ%ûÕà 0001E0
```

Dump of file SATURN:[PCCOMMON.DUMP.DLL]DA-XPORT.DLL;1 on 18-APR-1990 10:39:21.68
File ID (400,27,0)    End of file block 81 / Allocated 84

Virtual block number 45 (0000002D), 512 (0200) bytes

```
C3F7D3F7 E274D0F7 7F80A900 F7E1747F 80A9025D 88260244 88C3E400 7FCC80FB «.ä.Àõû.D.&.].`..tÃ%Ã`..%Àtã%Æ%û 000000
75C3380A 8EC18ED9 8CC28CF7 87930873 E0D1E301 D578EF32 EC8AD874 D3F77F80 ..%ÆtÃ.ã2ÿx{(D1Ås...%.ô.).ê.Ö;ûu 000020
50882606 4488C3E4 D07FCC80 FB75E9C3 F5D3D15E 747FF0C3 F7C30538 26048805 ...&;.û%ûþ.t^1Æ%ûÕu«.ä.Àõû.D.&.) 000040
D1D578EF 32EC8AD8 74D3F77F F0C3F7D3 F7E27400 F77FF0A9 D0F7E174 7FF0A906 .`þ.tÃ%Ã`þ.%Àtã%Æ%ûþ.%ÆtÃ.ã2ÿx{( 000060
0244880E 75044538 26044488 1775C338 DA8EC18E D98CC28C F7879308 73E0D1E3 D1Ås...%.ô.).ê.Ö;ûu..D.&;E.u..D. 000080
0082358A 015D8802 458803E8 80F48002 4588F787 C3053826 04880575 02453826 &;E.u...&;.û.%.E..¶.Š..E..]..5ý. 0000A0
5874E40A 6574ED0A C0D1C1D1 8000CE81 FF00E781 017488FF 7C88024C 8880CF80 .Ü..L..|..t..Ô...ö..1é1ã.Üte.ôt[ 0000C0
8055E300 85CD8A91 D900E8D0 C9004977 18FC800C F6E52A91 FA87F387 0573EC3A :ãs..µ.¹.*[-É.¤.w[ÀèÀÔÀ]..ëç.DU. 0000E0
80037402 0A287E05 F9803E74 1D7210E9 800B3303 8801C880 0374D208 127C0EF9 ª.|..ët..ù..Æ3Ü.Õ.r.t>.ª.-+.ët.. 000100
88D788DE 8819E8F8 75C1FED3 D1E2D123 74177708 E980FD8A DF8AF38A D68A01CE õ..ø.µ.Ô.».Õ.w.t#1ã1Æ±ëuhŠ..ß.¤. 000120
1470E000 20CA8003 743FC2F6 FAE20AD1 E8D120CA 8003743F C2F60097 E9E80DC1 èÀÕÕ..-ô7t..ò 1Š1Õäª-ô7t..ò ÀÀp. 000140
D3F70A73 DE88D788 F318FA28 FA41E945 75FFFC80 C4FEDAD1 08D15073 0E130703 .¤.ãsP1Ü1Õ±á.¤.uÉÕÀª+ª.µ.¤.ßs.%Æ 000160
5B7608EC 800F75FF 0A6474D8 08DA876A 7610EC80 08750808 D0F60003 83F5DAF7 %Ö%.Æ.-Ã.Üu..ã.vj.Ö.Ütd..u..ã.v[ 000180
017CE903 74000C42 3E80F671 D301E2D1 4874CCFE 0A78FF0A D232F28A DE8AF88A .«.ß.`2ë..x.±ätK1ã1Æq—.>B..t.Õ|. 0001A0
A908D1E0 D03A74FF FC80C4FE 07730003 8301C680 0F7401C6 F6147207 7780FA80 .ª.w.r.-ô.t..ô..Æ.s.±á.¤.t:ÀÀ1À` 0001C0
000C423E 80C3F788 0589C68A E38A0245 8900FC3E 88C70A7F E7808024 17747F80 ..t.$..Ô..ú.>¤..E..D.ô...%ù.>B.. 0001E0
```

Dump of file SATURN:[PCCOMMON.DUMP.DLL]DA-XPORT.DLL;1 on 18-APR-1990 10:39:21.68
File ID (400,27,0)    End of file block 81 / Allocated 84

Virtual block number 46 (0000002E), 512 (0200) bytes

```
D0E00196 3488ADFC F99DE9E6 79C3F788 05890245 8900FC3E 88C03301 7EE90374 t.Õ-.3ä.>¤..E....%ûy1Õ.ª¤Ù.4.1ÀÀ 000000
D370E502 7FED8080 EC80C132 D88B3D88 C874ED0A D900E1D1 024D8806 74E40AD8 Ã.ôtø.M.1ÃÀ).Ùtù.¤.Ã2è.ã..Ù..[pÆ 000020
88509FC0 08DA88E7 F7C688E8 8880C980 80C880EF 8AFF3250 CD74FFFC 8080C480 .á..¤.tëP2..ÿ.ù..è..Š.6%Ô.Ö.á.P. 000040
88C703E1 F6C58801 C8800374 9E58FA13 D803E6F7 C188FA88 00D28308 03E7F7C5 6%Ô.Ã.ë..ª.ë%1.Ã.ªX.t..ù..é-Ã.ú. 000060
4088F787 FF1AE9AD 74FFFC80 C4FEFF69 E90A75E4 0AD301E2 D10878FF 0A589303 Æ.X..x.1ã1Æ.õu.Õi.±á.¤.tÜÕ...%.M 000080
0371E52A 7FED8081 EC80C132 D874E40A 5C74ED0A D8D0E0D1 02448809 D0E1D102 .1ÃÀ).D.1ÀÀÃ.Üt\.ôtÜ2è.ã..Ù.ª1q. 0000A0
D1087400 0C423E80 80CF80C9 3220BA01 5088FF78 E90375FF FC8080C4 80FF78E9 Õ(..á..¤.u.Õx..]..-2è.Ü..>B..t.1 0000C0
C2080011 E8EE8800 1AE8D8D1 EAD180CE 80C03224 8A01548B 500C423E 02D901EB Š11.>B.P.T..$2ã.ö.1ö1ÀÕ...ŸÕ...ô 0000E0
E1F7C688 FA8815E3 C03396F3 F71D7303 38F880E9 FF76E90D 8801CA80 03740688 .øt..ò..1Õv.Õ¯½;Æs.%µ.3ãÕ..ª.6%Ã 000100
0C4206C6 C3ED73C1 880003C1 28FFFF8E C3F97303 13C1034E 07730788 FA1808F7 %Ã.ª.ws.N.è.Æsªû/..+ë.Ã.èsÜÕô.B. 000120
53500C45 0DFC06C7 0DFC36FF 3874E40A 3C77EC3A 0EED8007 74ED0A0C 442E8A00 ...D..Üt..Ü.:ãw<.ôt8.6¤.ú.¤.E.PS 000140
0DFC068F 58585AFE 0FE8FF32 5253500C 4900FC06 C758585A FE4EE808 32D23352 R3ø2ÜÕN±Z[Xú.¤.1.PSR2.Õ.±Z[X..¤. 000160
45A3C033 FE1AE852 53500C49 0DFC06C7 0DFC36FF 0C42A2D2 330833C0 33FE33E9 Õ3±3ã3Ü3øÀß..6¤.ú.¤.].PSRÕ.±3ãÉE 000180
E6807FE4 80ADA5A5 A500FC3E 88F7881D E88000F5 81066D88 F787D3E8 0C47A30C .ÉG.ŠÆ.¥.m..¥..Š..¥.>¤.ÉÉÉÜ.Õ..] 0001A0
830274FF E0250AD0 E0D1DED0 E5D10644 88FC0660 88C3FE88 0DFC3688 ABE60A80 ..|¯.6¤..±Ü.m.¤.D.11ÀB1ÀÀÖXÀ.tø. 0001C0
D0D1E2D0 DDD1E6D0 897706A0 3008F7C5 28C274C0 08D68695 F7870977 E838E0E5 1À;Õw..¥..ø.ãtÕ+é%Ã=..w¿Ã1¡1Àã11 0001E0
```

Dump of file SATURN:[PCCOMMON.DUMP.DLL]DA-XPORT.DLL;1 on 18-APR-1990 10:39:21.68
File ID (400,27,0)    End of file block 81 / Allocated 84

Virtual block number 47 (0000002F), 512 (0200) bytes

```
6374FF08 10CC800F E480AD93 AD91AD92 C032E08A ACF888E0 86C0D1C0 D1C00157 W1ã1ã1ã.À.½¯.Ã2ã.Ù.Ù.Ù.ô..ä...tc 000000
06FF8323 724874E7 7710EF83 C033D888 C888D188 01C98003 74D20818 7C0EFF83 ...|..øt..è..1.û.Ã3ã.ÿ.wÕtHr#... 000020
23740F77 08EF83E4 32C48AF8 8ADF8AE8 8ACD8AF1 8AD68A01 CE800374 D20A287C |+.øt..ö..ø.þ.ä.Š.Ô.½.á2ã.ÿ.w.t# 000040
E2DAD10F D10BD1E8 D120CA80 03743FC2 F6CF8716 E8F57547 D0D1D301 D1D1E2D1 1ã111Æ1ÀGu%Š..ü-ô7t..ò 1Õ1Ü1Õ1Õã 000060
509F5003 5C13014C 133402D8 D0E5D138 70E5D120 CA800374 3FC2F697 5ECF87F6 -.Û^.-ô7t..ò 11p;11ÀÀ.4.L..\.P.P 000080
C5830AD1 D9D10801 DFD11374 2000C7F7 FE13589E 581000CE 810FFFE6 81057488 .t..1...ö..X.X.±%ú. t.1Õ1Ü111Õ.é 0000A0
E6819F05 7488035C 18014C18 342AD0F6 D8D0E5D1 0088E9F6 ECE90375 E0FD8320 .»Àu.Õã-Õ..11ÀÃ-ê*4.L..\..t...1 0000C0
8EFCFE13 DE13CE13 F50AF7D1 F7D3F7D7 F700F6F6 331373FE 189E1000 CE810FFF ...ö....±s.3--Ã%¤%Æ%1%Õ%.ö.ß.±¤/ 0000E0
C7F7E4E8 D233CA88 D988F888 3D744E40 760200ED 811375E0 C7F61875 FF080004 ....u.-úÀu..Ü..vøNt¤.«.).ô3øŠô%ú 000100
1000C7F7 970082F2 8ACE8AE9 8AD08AF8 8AC78AE0 8A972776 0100ED81 18751FE0 À.u..Ü..v'..À.ú.«.1.Õ.ö.·ÿ..%ú.. 000120
800385E9 0374000C 5A3E80FC 9065E8E8 E8D70103 D1D1D1E2 D1717420 ED831275 u..Ü tq1ã111Æ1¤ŠŠŠe.¤.>Z..t.Õ... 000140
20C58308 742000C7 F7000783 00038300 D18301C6 801A7401 C6F61F72 077780FA ª.w.r.-ô.t..ô..1..Æ..¤.%ú. t..é 000160
4589C70A C508C032 E0862274 ED010FE7 8080240E 8700FC3E 88F78830 74E0FD83 .»Àt0.%.>¤..ß$..Õ.1Üt".Ã2ã.é.ú.E 000180
0374000C 5A3E80FC F5FDE903 79C3F788 05EF83A8 C688ABC1 88AAC68A 05508806 ..]..ô¨.ê¨.ô¨.ÿ..%ûy.Õ»¥¤.>Z..t. 0001A0
06408808 747FF025 00880644 88FCC3FE 88A8A8A8 A8F78800 FC3E88C0 330377E9 Õw.3ã.>¤..%¨¨¨¨.±û¤.D..ÀXþ.tÜ.M. 0001C0
D08674FF E03D8000 058C70C1 037FE0E9 81800020 E1D1E0D1 D0747FF0 E181D133 31.Àþ.tÀ1À1Ã-...ÕÀ..ëp¥...=À.tÑÀ 0001E0
```

```
Dump of file SATURN:[PCCOMMON.DUMP.DLL]DA-XPORT.DLL;1 on 18-APR-1990 10:39:21.68
File ID (400,27,0)   End of file block 81 / Allocated 84

Virtual block number 48 (00000030), 512 (0200) bytes

 0807D1D3 D1D1D1E2 D10E7510 00C7F7D8 00E50150 01CA8003 740181E8 50D8D1E6 [1ÄPÒ..t..ò.]![ÄÄ%ú..u.1ã11!£1■. 000000
 747FF0E1 81D18806 4088FCF7 87F58CE9 FF24E988 74E0FD83 20C58393 EB0A75ED Ùu.Š..é .»Åt.Õ$.Õ.%.%■.M..1.Äþ.t 000020
 FFE03D80 00059870 C12B7FE0 E9818020 2DE1D1E0 D198747F F025D033 06448BEF ÿ.D.3ÄXþ.t.1Ä1Ä- ..ÕÄ.+èp....■Ä. 000040
 588F05C6 83F78850 9210CC80 0FE480AD 92AD93AD C932E88A AC5008D1 E6009874 t.Ä11ÄP¯.Ò2èÙ.Ù.Ù.Õ..ã..P.%.6.¢X 000060
 F788OC58 8FFD1F74 000C5A3E 800005C6 FCA44746 A5A5A810 CC800FE4 80ADFD0C .»Ù.Õ..ã.¨ÊÉFGÊ•6...>Z..t.»¢X..% 000080
 D8010801 EAD158FC A8D8D1AD A8D8D1AD A8D8D1AD ED01A80C 5A2602E8 D1E888AD Ù.ÕÌÒ.&Z.¨1ÚÙ1Ä¨Ù1Ä¨Ù1Ä¨■X1Õ1Ä1Ù 0000A0
 CA800374 5F585907 88C208C1 08C30800 33E85700 37E85700 38E85700 3FE8D9D1 11Ò7.WÒ;.WÒ7.WÒ3..Ò.è.Ò.■Y[_t..ò 0000C0
 D1090108 D1EFD1DA D1090108 D1EFD1DA D1D9D1D8 D1EFD108 CA800374 07C2F601 .-Ò.t..Ò.1ÿ1Ù11Õ1ÿ1Ù11Õ1ÿÌÙ111 0000E0
 52A1F588 ED339752 F6F73877 F0380475 D2085C73 0638FF33 0C58368B FF08E9DA ÕÕ...6X.3.;øs\.Øu.;þw;%-R.3Ù.%ÄR 000100
 E7F70874 C0080C56 A1EA13F0 03E7F706 74C0080C 54A150F2 88E7F704 74C0080C ..åt.%Ò.·PÅT..åt.%Ò.þ.ÕÄV..åt.%Ò 000120
 130C541E 130C520E 034F1373 93919295 E8185D00 18CE18DA F75A9200 D283E803 .Ò.Ø..Z%Õ.Ò.1].Ò....■.O..R...T.. 000140
 130C561E 130C540E 030C5606 180C541E 180C520E 284FC3ED 730C5816 130C5606 .V...X.sÙÙO+.R...T...V...T...V.. 000160
 D8330C50 A3100C0F 2406458A 0C4EA310 0C0F24E4 3206448A C9E8F50C 521688C2 Ò..R.%Šè.D.2Õ$...ÈN..E.$...ÈP.3Ù 000180
 DA13C803 E2F70674 D2080255 88048BCA 88E888E1 F708E300 88911AE3 0C88E888 .Š..D....D.%Ä.Ò.ò...U..Øt.%ã.à.Ö 0001A0
 08024488 50C10858 D5D1DA13 C803E2F7 0874D208 15880E74 C0080244 88ED3355 U3Ù.D..Ät....Øt.%ã.à.Ö11X.èP.D.. 0001C0
 F70874D2 08045588 0F74C008 0488C933 EA13D803 E2F70674 D2080255 880074C0 åt..U..Øt.%ã.Ä.õ3è...át..U..Øt.% 0001E0
```

```
Dump of file SATURN:[PCCOMMON.DUMP.DLL]DA-XPORT.DLL;1 on 18-APR-1990 10:39:21.68
File ID (400,27,0)   End of file block 81 / Allocated 84

Virtual block number 49 (00000031), 512 (0200) bytes

 C3085800 D183EA13 D803E2F7 0974D208 15880F74 C0080444 88D1D1EA 130803E2 å.Ä.õ11.D..åt....Øt.%ã.Ä.õ.1.X.û 000000
 880B33CA 13E8030C 4E26F708 74C00805 88CA13E8 030C5026 F70874C0 08048850 P...åt.%&P..Ò.ò...åt.%&N..Ò.ò3Ù. 000020
 08025588 1074C008 04448803 D1CA13E8 03E2F708 74D20804 55880F74 C0080244 D..åt..U..Øt.%ã.Ò.ò1£.D..åt..U.. 000040
 44880A13 C8030C4E 26F70874 C0080245 88ED3355 000383CA 13E803E2 F70974D2 Øt.%ã.Ò.ò.£.U3Ù.E..åt.%&N..à.Ö.D 000060
 13C803E2 F7087402 08045588 1A74C008 0444880A 13C8030C 5026F708 74C00802 ..åt.%&P..à.Ö.D..åt..U..Øt.%ã.à. 000080
 0C4EA0EA 1308030C 4E26F708 74C00804 4588EA13 D8030C50 26F70444 88D5D1DA Õ11.D.%&P..Ä.õ.E..åt.%&N..Ä.õ.N. 0000A0
 D7D1D3D1 D1D1E2D1 D7D1D3D1 D1D1E2D1 D7D1D3D1 D1D1E2D1 5A97C503 0C5026F6 -&P..é.Z1ã111£1■1ã111£1■1ã111£1■ 0000C0
 FC36FF4C 74ED0850 77F53804 C0EE8108 74F6080C 58368800 0C5A06C6 C3F6085E ^.-û6.Z...6[..-t..Ÿå.;%wP.ÙtL.6■ 0000E0
 00FC06C7 58595A58 505FFC3E E8D233C9 33083357 55535251 500C500D FC06C700 .û.■.].PQRSUW3Ù3è3ØÒ>■_][ZYXû.■. 000100
 0233C933 C033FC1A E900FC06 8F58595A 58505FF8 D1E8FF33 57555352 51500C65 e.PQRSUW3.Õ1«_][ZYX..■.Õ.■3å3è3Ø 000120
 330C508F F8F8E857 55535251 500C6500 FC06C700 FC36FF0C 5AA2FF33 ED330833 3Ù3Ù3.ÄZ..6■.Ù.■.e.PQRSUWÒ½«¢].3 000140
 0C740120 0787F608 8898078A 26065EC4 565704EC 83EC8855 00C6E8A8 A8A8A8C0 å¨¨¨¨¨Š6.U.$.$.WVé^.&....Ä-.. .t. 000160
 8898058A 2647F888 16740065 3098078A 26065E88 07E80020 0598078A 26065E88 .^.&.... .Š..^.&...■e.t..«G&.... 000180
 5E882E07 C6260646 FFF08898 078A2606 5EC40846 8C067E89 F2750420 0787F608 Ä-.. .u·.-..F.é^.&....þ.F.&6...^ 0001A0
 8855C85D E5885F5E FC7E89E9 75C00A06 46FFF788 078826C6 88F88898 078A2606 .&....%.6&...%.F..åuÕ.-■^_.[]ùU. 0001C0
 8808468C 067E89F3 75003D80 26470774 2E308026 9008E806 7EC45657 06EC83EC $.$.WVé-.Š..&.*.t.G&.=.uµ¯-..F.. 0001E0
```

```
Dump of file SATURN:[PCCOMMON.DUMP.DLL]DA-XPORT.DLL;1 on 18-APR-1990 10:39:21.68
File ID (400,27,0)   End of file block 81 / Allocated 84

Virtual block number 50 (00000032), 512 (0200) bytes

 30802647 0774453D 80260D74 65308026 900EE806 7E886774 003F8026 0646FFDF Ô.F.&.?.tg.-.Š..&.■et.&.■Et.G&.■ 000000
 3080264F 9002E806 7E88FE56 89FC4689 064EFFC2 8CC78808 468C067E 89ED7500 .uÙ.-..F..ú.ô.N..F■.V±.-.Š..O&.■ 000020
 065EC406 46FFFC76 C5FA5E8C 064EFF03 752E3F80 26DF8808 468C067E 89F97430 Òt!.-..F..Ò&.?.u..N..^!év■.F.é^. 000040
 9A221C1E 80EC8855 90C850E5 885F5EFA 5E8EFE5E 8CFC7689 F275C00A 078826AC ¯&...åu·.v■.^±.^!^_.[]ù.U.ã...". 000060
 83EC8855 C850C028 C8500001 8805722A F3091E9A 2ACF047E 9A065EC4 2ACA049E ..ò*é^..-.Ù*...µ*r¯.|..]ù+å]ùU.ã. 000080
 1EF088F8 88085EC4 04C4832B 1738A69A 0C76FF0E 76FF2474 00067E83 565708EC $.WV.-..t$.v..v..[8.+.é.é^..«.þ. 0000A0
 88F87E8D 04C4832B 3138A69A 0C76FF0E 76FF90C8 5DE5885F 5E1FA5A5 A5A5DA8E .ÕÈÈÈÈ.^_.[]ù..v..v..[81+.é..-½. 0000C0
 5DE5885F 5E28AD05 F19A085E C4283904 9E9AF85E 8D1FA5A5 A5A5DA8E 1E0716F0 þ....ÕÈÈÈÈ..^½...9+é^..þ.Ù+^_.[] 0000E0
 5EC4FA56 89F84689 25121688 2510A147 74000C74 3E805657 0AEC83EC 885590C8 ù.U.$.$.WV.>t..tGÀ.%...%.F½.V̄!é^ 000100
 067E000E 7E83FE56 89FC4689 0C5688 0A 4603C028 02E80001 8805752D 3F8326F8 ½&.?-u.|..Š.+å.F..V..F■.V±.-..-. 000120
 260677FF 26065EC4 58E806C4 83045DE8 0EFC76FF FE76FF50 C0289003 E80001B8 |..Š..+åP.v±.v■.Ò]..é.ŠXé^.&.w.& 000140
 8350400E 46885052 FA5689F8 468908C4 832BE838 829A37FF 260277FF 260477FF .w.&.w.&.?.ý;Š+.é..F½.V!RP.F.ãP. 000160
 C703C028 02E80001 8805752D 3F8326F8 88F85EC4 C02802E8 00018805 7E000E7E -..-.|..Š.+åé^½.½&.?-u.|..Š.+å.ú 000180
 26F85EC4 FE5689FC 46890C56 880A4688 0AC4832C 4538FC9A 50520C56 880A4603 .F..V.RP.■BE,.é..F..V..F■.V±é^½& 0001A0
 FF078826 01478A26 FC5EC414 7E000E7E 832D07C6 26FC46FF FC5EC40A 75203F83 .?-u.é^■.F■&6.-.-..-.é^■&.G.&... 0001C0
 FE5688FC 46030E46 0308F7C0 18010C74 3E80501E 0C6E882E 07C626FC 5E88FC46 F■.^■&6..|n..P.>t...åKÄ.F..F■.V± 0001E0
```

```
Dump of file SATURN:[PCCOMMON.DUMP.DLL]DA-XPORT.DLL;1 on 18-APR-1990 10:39:21.68
File ID (400,27,0)   End of file block 81 / Allocated 84

Virtual block number 51 (00000033), 512 (0200) bytes

FC46FF45 07C626FC 5EC40774 00107E83 FE5689FC 468908C4 83207F02 DA9A5052 RP.Ö..-.á..F=.V±.-..t.á^=&ó.E.F= 000000
C4F08B08 F7087DF6 08F08848 02478826 F85EC45E 74303F80 26065FC4 26F85EC4 á^%&á_.&.?0t^á^%&.G.H.Þ.-).%Ä.Þá 000020
F799C688 070026FC 5EC4F9F7 00648999 C688157C 64FE83FC 46FF2007 C626FC5E ^=&ó.-.F=.±d|..ó.¿d.%ªá^=&...ó.% 000040
F288F9F7 99C68807 0026FC5E C4F9F700 0AB999C6 88157C0A FE83FC46 FFF288F9 ª.·.F=.±.|..ó.¿..%ªá^=&...ó.%ª.· 000060
06C604EC 83EC8855 90CB5DE5 885F5E0C 56880A46 88070026 C688FC5E C4FC46FF .F=á^=.ó&...F..V.^_.Î]ù.U.å.å.ó. 000080
C6FE5689 FC4689FE 49E80E06 76FF0876 FF0A76FF 0C76FF0E 76FF1076 FF010C74 t...v..v..v..v..v..v..Òl±.F=.V±ó 0000A0
25121688 2510A151 74000C74 3E8000F2 46C612EC 83EC8855 CB50E588 000C7406 .t...Î]ùU.å.å.óF·..>t..tQÅ.X...X 0000C0
89FC4689 0C56880A 4603C028 02E80001 88057520 3F8326F4 5EC4F656 89F44689 .F¶.V-á^¶&.?-u.¦..Š.+å.F..V..F=. 0000E0
07C626EE 46FFEE5E C4F05689 EE46890C 760603FC 46886A75 0E46390C 76A1FE56 V±Åv.9F.u].F=..v..FŸ.VÞá^Ÿ.FŸ&ó. 000100
AF38829A 37FF2602 77FF2604 77FF2606 77FF2606 5EC44AE8 0007C626 EE5E8830 0.^Ÿ&ó..ŠJá^.&.w.&.w.&.w.&.7.ý;£ 000120
00018805 75203F83 26500E46 03024788 26F45EC4 5052F656 89F44689 08C48320 -.á..F¶.V-RPá^¶&.G..F.P&.?-u.¦.. 000140
FE5689FC 46890C56 880A4688 0AC4831C 5E38FC9A 50520C56 880A4603 C02802E8 Š.+å.F..V.RP.=B^..á..F..V..F=.V± 000160
0001881D 7F00027F 8326F45E C42007C6 26FC46EF FC5EC40A 75203F83 26F45EC4 á^¶&.?-u.á^=.F=&ó.-á^¶&......¦.. 000180
47882GF4 5EC40AE8 3007C626 FC46FFFC 5EC406C4 830205E8 DEFC76FF FE76FF50 P.v±.v=.Ò...á.á^=.F=&ó.OŠ.á^¶&.G 0001A0
46FFFC5E C406C483 01D8E80E FC76FFFE 76FF5000 01886B7E 000E7E83 FC460102 ..F=.-..-h¦..P.v±.v=.ÒÄ..á.á^=.F 0001C0
88260EEB D8F70247 88260874 000C743E 80437D00 027F8326 F45EC42E 07C626FC =&ó..á^¶&....)C.>t..t.&.G.%ÄS.&. 0001E0

Dump of file SATURN:[PCCOMMON.DUMP.DLL]DA-XPORT.DLL;1 on 18-APR-1990 10:39:21.68
File ID (400,27,0)   End of file block 81 / Allocated 84

Virtual block number 52 (00000034), 512 (0200) bytes

0E76FF06 C4830196 E80EFC76 FFFE76FF 500E4689 0E468803 7E0E463B D8F70247 G.%Ä;F.-..F..F.P.v±.v=.Ò...á..v. 000000
83EC8855 CB5DE588 0C56880A 468808C4 832EC63A 889AFC76 FFFE76FF 500030B8 ¦0.P.v±.v=.¦:ó..á..F..V..Î]ùU.å. 000020
FE5689FC 4689FE6E E80E0676 FF0876FF 0A76FF0C 76FF0E76 FF010C74 06C604EC å.ó.t...v..v..v..v..v..Òn±.F=.V± 000040
0277FF26 0477FF26 0677FF26 065EC456 06EC83EC 885590CB 5DE58800 0C7406C6 ó.t...Î]ù.U.å.å.Vá^.&.w.&.w.&.w. 000060
83260C76 A3480247 88262510 1EC42512 16892510 A308C483 2F023882 9A37FF26 &.7.ý;./.á.È.X...Xá..X&.G.HÈv.&. 000080
9A50520E 76FF5306 FE5689FC 46890C56 880A4603 C0289003 E8000188 0675203F ?-u.¦..Š..+å.F..V..F=.V±.S.v.RP. 0000A0
890C78A2 C02A02EB 0180047D 0C763639 4E027788 2625101E C40AC483 300238FC =8.0.á.á..X&.w.N96v.).¯.Š.*åÅx.. 0000C0
76FF0876 FF0A76FF 0C76FF0E 76FF1076 FF1F7F0E 4639C688 077CFCFE 830C7636 6v..±=|..69F....v..v..v..v..v..v 0000E0
00FF7C80 46FC76C5 FA5E8C1E 74000C78 3E8090C8 50E5885E 0CC483FD 93E80E06 ..Ò.».å.^.Î]ù..>x..t..^ªév=F.|.. 000100
FF0876FF 0A76FF0C 76FF0E76 FF00FE47 C626FC5E C4FA5E8E FE5E8CFC 7689F975 uª.v=.^±.^ªá^=&óG±..v..v..v..v.. 000120
1276FF19 75450E7E 83067465 0E7E83EC 8855C850 E5885E0A C483FEF6 E80E0676 v..Ò-±.á.^.Î]ùU.å.-.et..-.Eu..v. 000140
FF1076FF 1875660E 7E839035 E8F888FE8 0E0676FF 0876FF0A 76FF0C76 FF1076FF .v..v..v..v..v..Ò.«ŠS..-.fu..v.. 000160
0A76FF0C 76FF1076 FF1276FF C85D0AC4 83FD39E8 0E0676FF 0876FF0A 76FF0C76 v..v..v..v..Ò9».á.]ù.v..v..v..v. 000180
9A0676FF 0876FF29 74000A7E 83EC8855 90CB5D0C C483FEC0 E80E0676 FF0876FF .v..v..Òå±.á.]ù.U.å.-..t).v..v.. 0001A0
832AC239 EE9A5052 08568806 46030A46 880676FF 0876FF50 4004C483 30100310 ...0.á.@P.v..v..F..F..V.RP.Ÿ9ó*. 0001C0
8908E80C 8C0DFC06 C7087412 7703FB83 D88E1EEC 88554590 D88CC888 CB5D0AC4 á.]ù.à.Ä.EU.Š..Ä.«.w.t.ú.=...Š.. 0001E0

Dump of file SATURN:[PCCOMMON.DUMP.DLL]DA-XPORT.DLL;1 on 18-APR-1990 10:39:21.68
File ID (400,27,0)   End of file block 81 / Allocated 84

Virtual block number 53 (00000035), 512 (0200) bytes

7E8FF388 CBF3F60C 830C8C2D 0DFCA1C8 4D5D1FE5 8802ED83 F80C7C16 890C7A0E .z...|.%.Û..Í.]MùÅ=.-..°.-µù.µ¢- 000000
FCD88EC1 8ED98CC0 8C0C7E8F F388C30C 7E8ED98E A5A5FCD8 8EC18ED9 8CC08C0C ..å.\.è.Ä=ÈÈ.\/~.Û.µ¢-..å.\.è.Ä= 000020
54880C88 C033FCFC 758803E8 07FE45C6 FC7D89FC 7588C30C 7E8ED98E A5A5A5A5 ÈÈÈÈ.\/~.û.u=.}=óE±.Š..u==3á...T 000040
40890245 89080109 D1FAD1D8 D1D901FA D1D8D1D9 D1FAD105 8925747F 80C2F702 .%ó..tX..Ï=ÏÏÏÃÏ=ÏÏÏÃÏ=ÏÏÏÃ.E..M 000060
18040203 02021601 C3064589 04458902 45890589 C3065589 3800C281 8FE68004 ..Ì..ô.ß.U.Û...E..E..E.Û........ 000080
02430041 02350212 12110010 120F1600 160C0808 070A0C09 0C080C07 09060005 ..........................S.A.C. 0000A0
080702CE 08A40084 09820A81 0A801606 09721C70 20600D6C 08590057 00530052 R.S.W.Y.l.m p.r...........È.ô.=. 0000C0
E5A3C850 E58899FF FF880008 E8C85DE5 8899FFFF 88090E16 8909E5A3 16080000 ....ÈÍ...ß.¦....Î]ùÒ..¦....Î]ùÈÍ 0000E0
728C3C43 0A76243C 0472133C F7E24343 1674073A 2E1875E4 0A002489 3008B809 .ÈÄÛ¿$..Ôu..:.t.CCâ%<.r.<$v.C<¥r 000100
89E42A08 478A2608 5EC45657 000008C8 00C3090E A3980147 8A2E4301 76CA3C04 .<òv.C..G..Èß.Û.à...WVá^.&.G.*ô. 000120
830A47F6 26F84689 19F205E0 D1C103E0 D1C888F9 F7000C89 9900FE20 C388FA46 Fª.Û-±..¿..%ª.àÏÅ.èÏÅ.·..F%&-G.. 000140
010A47F6 26085EC4 900128E9 FFFF8820 0A4F8026 085EC40F 74400A47 F6260774 t.&-G.@t.á^.&.O. ¦..Ö+..á^.&-G.. 000160
04478926 C028EF0A 67802602 0A4F8026 90E2E800 000447C7 26200A4F 80260E74 t.&.O. &ùG...Šå.&.O..&.g.ÿ+å&.G. 000180
750119F2 87F60608 68F9F700 0C899900 FE2DC388 4C750C0A 47F626FC 7689F08B .Þ.v=&-G..uL.Û-±..¿..%ªkÅ.-.·..u 0001A0
FA76FF0F 7500670A 7E811675 0E16087E 810E7432 190A7E81 07750E0A 087E8137 7.-...u..-..2t..-...u..-.g.u..vª 0001C0
080A47F6 26085EC4 04C4830A 2DE80876 FF0A76FF 0C75C008 02C48332 8C39CA9A .ò9.2.á..áu..v..v.Ò-..á.á^.&-G.. 0001E0
```

```
Dump of file SATURN:[PCCOMMON.DUMP.DLL]DA-XPORT.DLL;1 on 18-APR-1990 10:39:21.68
File ID (400,27,0)   End of file block 81 / Allocated 84

Virtual block number 54 (00000036), 512 (0200) bytes

 772B2637 8826085E 88677401 19F287F6 06D868F9 F7000C89 990DFE2D C3881575 u..Û-±..¿..¥ªkÅ.-.·..tg.^.&.7&+w 000000
 167EF608 04478926 48024588 F87E8802 57892607 89264008 57882606 47882606 .&.G.&.W.@&..&.W..-¥.E.H&.G..--. 000020
 0F742009 E987F6FA 5E8819E8 FC468908 C48332AA 34A49AFA 76FF0677 FF265256 VR&.w..vª.É4¨2.6..F=§..^ª-.Õ. t. 000040
 018E17E8 07882606 468A065F C426085E C408C483 32CD3CEC 9A53006A 006A026A j.j.J.S.š<ë2.6.6^.&6_..F.&..$./. 000060
 06468AFE CCE90374 FC7639FC 468908C4 832E6D34 A49AFA76 FF501606 46805600 .V.F..P.vª.É4m..6..F=9vet.Õä±.F. 000080
 D23352F8 56801652 FE568016 0676FF08 76FF4087 0EEC83EC 8855C8C9 5F5EE42A *ð^ èüU.š.š.ñ@.v...v...V±R..V¥R3@ 0000A0
 02CA8022 740200A9 2A750400 A910CA80 08740100 A90A4688 018AE80C 4E885252 RR.Ñ.Ò...F.`..t..ò.`..u*`..t".ò. 0000C0
 8003E8FE 4E880875 58C08500 00FFFF9A 5050C033 50160676 FF0876FF FE468D50 P.F±.v..v..P3ãPP......ãXu..N±Š.. 0000E0
 8AF0C2F6 0E75006E 3D1674C0 080000FF FF9A5050 C03350C7 0A000325 525101CA ò.QRX...úP3ãPP......ãt.=n.u.-ðÞ¤ 000100
 3300188A 00001A47 9A500072 09E70638 FE468800 8DE9FD8A E900118A 03740002 ..t.¤..Õ¤»Õ...F±;.Ó.r.P.G...¤..3 000120
 00A9C933 0A468861 75C00800 000A129A 50F8468D 1653F45E 8D1650D0 88E4E8C0 ãŠõ.ÃP..^¶S..F¥P......ãue.F.3è`. 000140
 E940F446 C6077501 3CF4468A F24E8880 81027580 213506F6 07754000 A90E7580 .u.`.ãu.-.5!.u.Ý..N·.F¶<.u.6F¶ãõ 000160
 FF895273 7400020A 46F77A74 C90AF446 88C03200 83E908F4 46C60775 023C008E ..<.u.6F¶.Õ..2ã.F¶.ètz¥F...t±R¿. 000180
 E8C033FD 36E90374 0083300C.74C00800 00FFFF9A 50FA468D 16510002 895151FF .QQ¿..Q..FªP......ãt.=..t.Õ6»3ãŠ 0001A0
 7E833274 F8463923 75C00800 00FFFF9A 50F8468D 16500001 8850F646 8D16524F OR..F-P¡..P..F¥P......ãu#9F¥t2.- 0001C0
 50C03352 8E75C008 0000FFFF 9AFA76FF FC76FF00 FC5E8301 FA6E8352 18751AF6 -.u.R.nª..^=..v=.vª.:.....ãu/R3ãP 0001E0

Dump of file SATURN:[PCCOMMON.DUMP.DLL]DA-XPORT.DLL;1 on 18-APR-1990 10:39:21.68
File ID (400,27,0)   End of file block 81 / Allocated 84

Virtual block number 55 (00000037), 512 (0200) bytes

 8D160676 FF0876FF 287548C1 F6F44E8A AA75C008 000033ED 9A50FA46 8D165050 PP..FªP.Ú3...ãu^.N¶-èHu(.v..v... 000000
 20C98003 7400080A 46F710C9 80037400 01F846F7 00003331 9A5050C0 3350F846 F¥P3ãPP.13..¥F½..t..è.¥F...t..è 000020
 80037580 A8C933C1 2300F709 E0A1C85D E58809E9 8F880888 C28801C9 80F24E0A .N·.è..ö.Ä..Õ..[]üÀÅ.¥Å#ë3è´.u.. 000040
 2009E987 F6FC69E9 C0330009 8A087209 E71E3806 5E880CEC 83EC8855 00C301C9 è.Û.U.š.š..^.;.Ó.r.¤..3ãÕ!=-.Õ. 000060
 468EFA5E 8C667480 09E987F6 00003448 9A5016F4 46805141 415151C9 33531274 t.S3èQQAAQ.F¶.P.H4..-.Õ..tf.^ª.F 000080
 75AEF20A 8049E30C 4E88F866 89F288FA 885657FC FC4689FE 4689C033 0856C50A .éV.3ã.F±.F==WV.ª.·.f½.N.DI¯.·Õu 0000A0
 F4E2AA1A 74F8380D 740A3CAC 0C4E8807 16FA8804 88E22800 808ADC88 02EC8338 ;.š..É¤..+ã.å.ª.¸.N.¯<.t.;«t.`ã¶ 0000C0
 5E8E5F5E E1E80014 E8E2E8FC 46FF0A80 AA001FE8 0375F838 00800009A E90028E8 Õ+.Õ..¯.;«u.Õ..`¯..F=Šãõ..ŠÃ^_.^ 0000E0
 521E5306 5E881FE3 CA28CF88 1F061E51 53503223 38FE9AFF FC887AE8 0093E9FA ªÕ..Šz¡=..±;#2PSQ....ü+õD..^.Š.R 000100
 C3FA8858 58591F07 74D808FE 5E01F45E 881175C0 08000001 2A9A5016 F446805I Q.F¶.P.ª....ãu..^¶.^±.Út..Y(X.ªû 000120
 26E8F900 208A03E8 001C8A08 7500098A 0001300D 74006030 1874C008 08C4831F ..6..ãt.=m.t.=..¤..u.¤..$.¤ .ªŠ& 000140
 06E8F9C0 33001C8A 0EE8F803 751A3F80 085E880A 5E8E0E74 4009E987 F6FE5E8E .^±-.Õ.@t..^..^..7.u.½Š.¤..3ãªŠ. 000160
 C1880475 C9080C4E 88F840E9 C850E588 0472FA5E 8E5F5EF8 6688FC46 28FE4688 .F±+F=.f½^_.^ªr..[]üÕM«.N..èu..è 000180
 0074006D 301774C0 081F071E 00003567 9A5016F4 46805152 1E530856 C51EEEEB ŠŸ.éV.S.RQ.F¶.P.g5......ãt.=m.t. 0001A0
 0A744009 E987F687 75C008F4 4688C2E8 00208AC7 E8001C8A CC750009 8A00013D =..¤..uã¤..Šú¤ .Šõ.F¶.ãuñ-.Õ.@t. 0001C0
 01FE4F80 04740808 065E88EC 885500A3 E8C03300 1C8AA6E8 02751A3F 80260A88 .Õ&.7.u.Š|¤..3ãŠÈ.U.š.^..Út..O±. 0001E0

Dump of file SATURN:[PCCOMMON.DUMP.DLL]DA-XPORT.DLL;1 on 18-APR-1990 10:39:21.68
File ID (400,27,0)   End of file block 81 / Allocated 84

Virtual block number 56 (00000038), 512 (0200) bytes

 24E899C0 33057501 76E80005 88071E29 75003F83 1FF28857 56EC8855 C850E588 .[]üU.šVWE·..?.u)..¡..Òv.u.3ã.Š$ 000000
 8E088C06 4E881FF8 3689FFFE FE44C704 C6830001 04C7961F F4A31FF2 A3FE2440 @$±È·.È¶..ú....6.úD±±..6½..N..Ä. 000020
 A8FE88AD FC02778B F273EEF9 83FEE180 FA744100 D0E9C85D E5885E5F 0009E8C0 ãÒ.._^.[]üÕÅ.Atª.Ã±.ªŸs·.w.=Û.±´ 000040
 74FE88E6 E8FE4489 F7880002 05C20335 7401A8AD F0030088 1573C138 48437401 .tCH;ãs..Å.ÞÜ´.t5.ö....¥.D±Š!.±t 000060
 1E8C2605 74D13832 08890A8C C688FE4C FEF90305 E8058948 C128FE4C 89F9030C ..ª.L±+èH..Š..ª±L±.6.Õ¿.2;!t.&.. 000080
 73C13848 FE88F274 01A8ADF0 03FE8825 74FFFE3D 02200406 C626C302 7F892000 . ...Û&6.. .=±.t¥.±.ÞÜ´.t·.±H;è± 0000A0
 E8D88E04 74C00808 4788E6E8 FE4489F7 88000205 C203E274 01A8ADF0 03008BBC Ÿ.Å.ÞÜ´.tã.õ....¥.D±Š!.G..ãt..ÃŠ 0000C0
 E8C03306 778888E8 37881FFC 1E8E2605 74C73836 078FD88C 12742004 0EFE2615 .&±.. t..Ã¢m6;út.&..=..7ŠÉ.w.3ãÕ 0000E0
 89D88C98 E84E4E96 0574001D E8FE4DFE 0D74005F E8984040 01240074 C6380068 k.;6t.$.@@.Ò_.t.±M±Ò..t..NNŠ..Ã¿ 000100
 414149C8 28037401 A8FE4588 51C399C0 33024789 07882000 A3260474 C1383728 +7;èt.&È. ..¯G.3ã.ÚQ.E±´.t.+ã!AA 000120
 0CE8C628 C223D2F7 0D72C203 1572C603 C188F575 EAD10476 2002163B 267FFF8A ¤..&;.. v.!õuÑ.è.6r..6r.¥@#6+6Ò. 000140
 FFFEFE44 C7F203F0 88FE8857 1874001D E85152C3 59C033E5 75EAD102 F7087500 .u.¥@!ãu[3ãYÜRQÒ..t.W.±.Þ.·ÚD±±. 000160
 37F09A1F 06500001 88505252 1ED23350 53C35A59 58FE5589 4AD72806 88067789 .w..@+mJ.U±XYZÜSP3@.RRP¡..P...Þ7 000180
 88058C8F 3875000A 7E830657 56EC8855 C3D20802 74585A1F FFFA8308 C483354C L5.6..ª..Z[t..@ÜU.šVW..-..uße... 0001A0
 0E468902 44880074 F7381174 48098C36 884CE827 720057E8 07754806 46880856 V..F.Hu.ÒW.r'ŠL.6..Ht.;¥t..D..F. 0001C0
 501652C4 885021E8 99FFFF88 0675D208 0473098C FE8104C6 8334735E 003EE856 VÒ>.^s4.6..±..s..@u.¡...Š!P.6R.P 0001E0
```

Dump of file SATURN:[PCCOMMON.DUMP.DLL]DA-XPORT.DLL;1 on 18-APR-1990 10:39:21.68
File ID (400,27,0)   End of file block 81 / Allocated 84

Virtual block number 57 (00000039), 512 (0200) bytes

```
E5805E5F 07C03303 88098C36 89025C89 1489E675 C085F958 0000FFFF 9A50C033 3&P.....[*.àu]...\..6...£3à._^.[ 000000
D3882672 1C030A88 2CE8F9F2 75098CFE 8104C683 0C74024C 39F7880E 4E88C85D ]ù.N..%9L.t..6..±..u·*§,.Ö..r&.£ 000020
92058616 890475F7 380E75C0 850000FF FF9A5153 13730586 1E390675 F738C18E .è;%u.9...s.SQ......àuß;%u...... 000040
F2750820 0787F608 8898058A 26479002 E8067EC4 56570000 00C800C3 D1880487 ...1ù.à...WVá-.Š..G&....Ä-.. .u· 000060
C48337E0 306F9A57 0876FF50 04C48338 DC03109A 5706006A 006A0846 8C067E89 .~..F.j.j..W...Ė8.á.P.v.W.o=Ä7.á 000080
00000AC8 C8C95F5E DA8C2514 881FA5A5 A5A50A8E 1E071EF0 882514BF 0008050A ....¢.X.Þ....ÖEEEE.¦.X.Ö^_èùà... 0000A0
C4FE5689 FC468908 57882606 4788260C 5EC4FA56 89F84689 08568806 46885657 WV.F..V..F%.V*á^.&.G.&.W.¯F=.V±á 0000C0
74003F80 26FC5EC4 F876C5F6 5E8C0A4E 882E7E00 0A7E8330 07C626F8 46FFF85E ^%.F%&6.0.-..~..N..^-év%á^=&.?.t 0000E0
F85EC40A 4E89F65E 8EFA5E8C F87689E7 E2460488 30809003 E8078A26 FC46FF09 ..F=&..Š..¯0..F&Ó.v%.^*.^-.N.á^% 000100
3005C626 9006E8F8 7EC4F84E FF1F7C35 3F8026FC 5EC4287C 000A7E83 0007C626 &6...-..|(á^=&.?5|..N%á-%Š..&6.0 000120
FF260C5E C4097531 3F802606 5EC407FE 260F88FA 468CF87E 89F57439 3080264F O&.=9t%.-%.F*.Ö&±.á^.&.?1u.á^.&. 000140
000090C8 C95F5E08 C48338CF 02DA9A06 76FF5250 52400856 88064688 15E80247 G.$..F..V.@RPR.v..Ö.ü8.á.^_èù... 000160
4009E987 F60C7C00 F883117D 09E71E38 065E88EC 88550136 E9008357 56EC8855 U.$VW*.Ö6.U.$.^.;.Ó.)..«.|¯-.Ö.@ 000180
76C55657 1E0085E9 0375C908 0E4E88EC 885500C8 50E588C0 3302E800 01880574 t.¦..Š.3à.[]ù.U.$.N..èu.Öç..WVév 0001A0
0773F103 49507300 DA83C128 5778D208 0E4E8839 843D2A9A 5706561E 067EC40A .á-..V.W.*=Ç9.N..@xW+è.Ö.sPI.þs. 0001C0
C628C703 C32308 18 C72848C1 8841C08E 3A2305C0 8C0773F9 03D88EFF FF05D88C .Ä....Ä.*s..à.#:.àA.èH+ú.ÜWù.ú+ó 0001E0
```

Dump of file SATURN:[PCCOMMON.DUMP.DLL]DA-XPORT.DLL;1 on 18-APR-1990 10:39:21.68
File ID (400,27,0)   End of file block 81 / Allocated 84

Virtual block number 58 (0000003A), 512 (0200) bytes

```
FFFF8308 8E3A2E2D D88C0775 FFFE835C E391FCA4 F3FDC128 9140C603 C323081B .ÜWù.6@.+è»µÊ=.D\.±.u..Ä-.:.Ä... 000000
C22802F7 D688C203 C323081B C22802F7 D78848C1 88C8E8C0 8E3A592D C08CD175 u1.à-Y:.àSà.èH.mX@+ó.ÜWù.ó.mX@+ó 000020
D88E3A65 05D88C07 75F60818 E391A4F3 C913A5F3 E9D1C128 9140C203 C323081B .ÜWù.6@.+è1ÖµÊ.èµÊ.D..-u..Ä.e:.Ä 000040
38E30C4E 88EC8855 C8500856 88064688 1F5F5E8E E8C08E3A 9C05C08C C775FF08 ..uú.à..:.àS/^ ..F..V.]ìW.$.N.D8 000060
13A8F3E9 D1E08A0A 4688012B D187D103 D323081B D12B0C74 DAF7D788 067EC457 Wá~..mXÖt.+1.ÜW£.1.1+1.F..Ä1Öµ¯. 000080
C8500856 88064688 5FAAF3C9 13A8F3E9 D1C38E3A A7C381C3 8C10E301 87AAF3C9 èµ¯.1D..Û.ûI:.û1Öµ¯.èµ¯.F..V.]ü 0000A0
800A79D2 080E750A F9831374 C00A93FC 071E570A 7EC51E08 56880646 880E4E88 .N..F..V..é-.W..=..àt..T.u..@y.¯ 0000C0
0276393C 30040387 92F1F793 F1F70274 C008D233 92F7880A F7000283 D8F7AA2D -¯XÜ.@.XÖ.X.3@.àt.Xþ.Xþ..£.0<9v. 0000E0
885E5F1F 58DA8CF2 72C73801 448DFF44 880586AC 4F0588E2 75C308C2 88AA2704 .'^.ó.Ûuä..O¯...D..D.;úr·.ÖX._^. 000100
8855C858 000035F0 9A531650 521E5100 0289DC88 53015780 E42A078A 00C85DE5 []ù...*Ö.W.S.É¿..Q.RP.S.þS..[ÜU. 000120
064688C8 88E3F700 08CA50E5 88E3F706 46880875 0A5E8808 080C5E88 084688EC &.F..^..Ä.^.u..F.XD.[]ò..XD.à.F. 000140
8F06768D C08ED88C FC5756EC 88550008 CA5DE588 D103E3F7 064688C8 030C66F7 %f..à.F.XD.1.[]ò..U.$VW=.Ä.$.v.¢ 000160
088FAA91 A4F39198 ACC88821 1A8F5D02 83E85521 128EA536 A536A536 A5362112 .16E6E6E6E/.1UÒ..]¢.1.à¯..µÊ.¯¢. 000180
5A5900C8 5DE5885E 5FC788DA 8C08508C 211A0645 C7044D89 0255891D 89FF3221 12....U..M.úE..!.]..Ö.ú ^.[]ù.YZ 0001A0
2EFF5152 C431E9C0 33057540 212EA1C8 5152E388 05722132 1E380872 D828DC88 .É+Är.;.21r..DRQÙÀ.1@u.3àÖ16RQ.. 0001C0
53060E74 830A47F6 26FA5EC4 1CE8F628 FC5E8CFA 468900FE 88560000 06C8212E .1à...V|±..F*.^=+-Š.á^*&-G..t..S 0001E0
```

Dump of file SATURN:[PCCOMMON.DUMP.DLL]DA-XPORT.DLL;1 on 18-APR-1990 10:39:21.68
File ID (400,27,0)   End of file block 81 / Allocated 84

Virtual block number 59 (0000003B), 512 (0200) bytes

```
C95EC688 D876FA46 391FEE16 881FECA1 0CFA4683 46017440 04C4833A 080ECE9A .Ö..:.á.@t.F.F*.À$...Ÿ.9F*vÄ.ó^è 000000
F205E0D1 C103E0D1 C888F9F7 000C8999 0DFE2D04 46881FF0 06FF0000 04C890C8 ù.à.....Þ..F.-±..¿..X*.à1À.à1À.· 000020
74000808 57892606 47892604 5EC402C4 833C431A 6D9A0200 68FE5E8C FC468919 ..F=.^±h...m.C<.á.á^.&.G.&.W..Ät 000040
FE5688FC 4688040A 4F802604 5EC49021 E8020002 47C726FC 5EC4080A 4F802611 .&.O..á^=&úG...Š1.á^.&.O...F=.V± 000060
07892608 57882606 47882604 5EC40001 0247C726 FC5EC408 57892606 47892640 @&.G.&.W.á^=&úG...á^.&.G.&.W.&.. 000080
F424E9C0 3300098A 087209E7 1E38065E 88EC8855 C3C90000 0447C726 02578926 &.W.&úG...èÜU.$.^.;.Ô.r.¤..3àÖ$¶ 0000A0
91E175C0 855A5900 0034009A 51160C76 FF0876FF 0A76FF53 CC8804EC 83F430E9 Ö0¶.$..&S.v..v..v..Q.Ä4..YZ.àuÄ. 0000C0
0A4628E8 D3EAD3FF FF890C5E 88085688 064688EC 885500C8 5DE588FD 09E9A780 .1Ö.».[]ù.U.$.F..V..^.¿..£Ö£Š+F. 0000E0
380021C8 06C60028 E80121C8 06C60E56 88083357 56EC8855 0008CA50 E588031B .£.[]ò..U.$VW3Ü.V.ó.ùl.Ö(.ó.ùl.; 000100
E5805E5F 0006E80E 5E880233 5756EC88 55C85DE5 885E5F0D 8940C980 05730A76 v.s..è@.._^.[]ìW.$VW3@.^.Ö.._^.] 000120
880880EA4 F321488F 0676C527 E8F63340 81067664 F9830A4E 88C08ED8 8CFCC85D ]ù=.Ä.à.N..*dv.Ÿà3-Š'év.¢H|µÊ.Ä. 000140
8921368F 0A760306 76285001 E8E85521 3E8F064E 010C4688 06768921 488E0A4E N./H!.v..F..N.¢>|UÒŠ.]+v..v.¢6!. 000160
831675C4 3A808025 09478A2E 09648A56 53C30A8C C7880650 89044589 02758900 ..u..E..]..ú.ÖüSV.d...G.X..:áu.. 000180
AD93AD92 AD95AD56 C3585EF3 E107382E 048802E8 8302EE83 0005890A C3830AC6 ó..Û.¿...Ÿ..Š....;.Äµ^(ÛVÙ.Û.Û.Û 0001A0
895E03FE 20080D1F5 00013000 D1E3D1F4 E2DFD100 D1DAD1D8 D1E8D100 0589FF33 3.¿..1Ö1Ü1Ö1110ä¶1Ö1À=..X1Ü-±.^. 0001C0
CCCCCCCC CCCCCCCD 0000FFFF FFFFFFFF FC66C308 4489065C 89045489 026C893C <.l..T..\..D.Üf=........èäääääää 0001E0
```

```
Dump of file SATURN:[PCCOMMON.DUMP.DLL]DA-XPORT.DLL;1 on 18-APR-1990 10:39:21.68
File ID (400,27,0)   End of file block 81 / Allocated 84

Virtual block number 60 (0000003C), 512 (0200) bytes

04B95721 ACBFFCC0 8ED88C06 C3075B40 D088C033 300144C6 0104C621 B8BEFFFD ».ƒ¦16..6Ð.03à.Àa[.û..Ä.à«¢¯!W¿. 000000
BEFF33FF 7BE8532D 830279C9 0B06747F F0C1F720 837F0764 80064C8B 5EA5F300 .µÈ^.L..d..° ¼èÞ.t..èy.°-SÒ(.3.ƒ 000020
F69AB0D7 13C803E4 F64D8091 E2F74D10 BAC8883F FE05ADF8 8AB87480 ABAC21B3 °I¯´.tÈ.¼Ù.±?.àº.M¼ã.¯M-ö.à.ª¯.- 000040
4709725F FF13E83E 2E880521 E821ACBE DFF75713 430F8112 F4E981FA 13C803E7 Ô.à.ª.Ö¶..ÖC.W¼Ö/¯!Ö!.£.>Ò.._r.G 000060
D10AD1E8 D10CE3C0 33F78809 F791AD93 AD92AD95 AD97AD57 5F03AAE8 3E38BB57 WÈ8>Ò¯._WÙ.Ù.Ù.Ù.Ù.¼1.¼3àD.!§1Ö1 000080
55525351 C0320010 8921B98F D913D113 E913039A D68156C4 80F4E2DC D0DED1DD T18ÀÈä¶.6V.ø...Ö.1.)¢¿!¿..2à0SRU 0000A0
F11359E5 0259D0D0 D3D1D2D1 D5D1D6D1 E4D0D0D0 D3D1D2D1 D5D1D6D1 E4D05056 VPÄÖ1ø111Ø1ÆÀÀÀÖ1ø111Ø1ÆÀÀY.ÌY.þ 0000C0
B0494FBD E259AA30 04D000D3 D1D2D1D5 D1D6D1E4 D00014D9 1359D113 59E91359 Y.ÖY.ÌY.Ì..ÀÖ1ø111Ø1ÆÀÀ.0¯Yã§OI¯ 0000E0
8BFF3307 8840C980 30C98058 C3075B5A 0001B80C 8821B88E 12C183FC AEF3FD30 0»µ0«.è./¦l..¦..Z[.ÜX.èO.èa.m3.. 000100
26F7C788 50E07202 05E8F888 E172020C E8DB3321 D81E8900 ACE9DB33 0185E8EF ýÒ..3ÙÖ¯...À!3ÙÒ..rÄ.¼Ò..rÀP.Ü¼& 000120
B5E80873 000383F8 0358BE72 D888C503 C475D208 21D82EF7 C388EA88 F88B21D8 À!.¼.ö.Ü¼.À!.Øuá.é.Àr/X.¼.Æ.øÀ§ç 000140
ADE89121 D6A321D2 A321D4A3 C03321DC 168921DA A321D00E 89CE0321 CE3E89FC ª.>Ö!.Ö..À!ÈÖ!..È!3àÈà!È@!Èø!.ÖÙ 000160
C83E8012 74453C1C 74443C4E 417401FD E8DB3300 E7E89F75 DB0880CD 80037501 .u..ë..Ùu.ÒÖ.3ÙÒ».tAN<Dt.<Et..>ù 000180
E8460000 21DA06C7 0EC98003 EB0402C9 814E2775 0274203C 0674283C 31740021 !.t1<+t.<-t.u'N.è..Š..è.ú.Ö!..FÒ 0001A0
72C1F706 75FF0B21 DA3E88D8 F702759E 5840C980 037502C5 F60088E8 509F016C l..PÒ..-é.u..èaX.u.¼Ù.>Ö!..u.¼èr 0001C0
21E2BE51 56507F01 90FF8121 DC3E2B04 7510C5F6 21D63E03 FB0330C9 80037418 .t..èO.«.>ø!-é.u.+>É!.....PVQ/ã! 0001E0

Dump of file SATURN:[PCCOMMON.DUMP.DLL]DA-XPORT.DLL;1 on 18-APR-1990 10:39:21.68
File ID (400,27,0)   End of file block 81 / Allocated 84

Virtual block number 61 (0000003D), 512 (0200) bytes

F7137480 C5F621E0 1E8821DE A138755E 5901ACE8 0021EC06 C621CE3E 880394E8 Ò...>ö!6.ß!.Ò¯.Y^ußÀ8!..À!-é.t.¼ 000000
21EC2E8A 08C98003 760721D4 3E838007 4D800474 7FF00645 F700D383 F5D8F7D3 Æ¼À¼.Æ.¼E.Þ.t..M...>à!.v..è...ß! 000020
0CCCF881 177200E4 E80A21D8 06C63FFF 8BC301C9 80C302CD 80037500 21043E83 .>à!.u..ë.û.è.ûÈ.?6.À!.ÒÖ.r..«ä. 000040
720006E8 D788DF88 EF88FF33 C3DFE8DE 78D803E3 D1E3D1C3 03E3D102 CD80E077 wÛ.ë.1Ð.Û1Ð1Ð.Àx8§ÒÛ3..ÿ.Ö.mÒø.r 000060
0374C00A 00720088 E8E57219 99FF8100 07830005 8300D383 D0035800 8AE85028 (PÒ..X.À.Æ..f..ª.....r1ÖÈ.r..àt. 000080
00F8810F 7480C5F6 177480C7 F6167521 D60608C5 08C788EE EB21D606 FF01CA80 .ò...ø!§Ÿ.ú.é..ø!u.-ú.t.-é.t..«. 0000A0
74C208C3 08C508C7 8821E01E 8921DE16 8920C980 10C98006 E80575D2 08097580 .u..@u.Š..è..è ..B!..À!.ú.é.Ö.ôt 0000C0
F78856F6 E8002AE8 480678FF 08004088 F1E821D6 0EFF0025 E8097319 99FF811C .....ª.ÖX...ø!Šþ¦@...x.HÒ*.$-V.¼ 0000E0
58D81358 D003000B E8000EE8 C2885355 57C35EAB 92AB96AB 95AB93AB 9221E28F ¢ß!.¨.¨.¨.¨.¨^ÛWUS.ðÒ..Ò...ÀX.ÀX 000100
4EE8C34E 46017528 3C06742D 3C087400 5EE8C307 D1D5D1D3 D1E2D1F8 1358E813 .ÒX.¼!ã!Æ!!!mÛÒ^.t.<-t.<+u.FNÛÒN 000120
302C2074 2E3C3374 0037E81D E8397D21 D8063A07 2C027E09 3C457230 2C4A7400 .tJ,0rE<.~.,.:.À!)9Š.Ò7.t3<.t ,0 000140
C5F6F4E8 20CD80C3 E43221D4 06FF08CD 8021D60E FF0E7410 C5F62677 093C2A72 r*<.w&-é.t...ø!.ë...à!2ðû.ë Š¶-é 000160
74203C10 740021CA 3E80AC23 73210036 38C3F94E C9E810CD 8021D206 FF097510 .u...@!.ë.ŠèN°û;6À!s#¯.>Ö!.t.< t 000180
91AD92AD 57C3C032 C35F2402 777A3C06 72613CE2 740D3CE6 740A3CEA 74093CEE Ÿ<.tõ<.t!<.tã<ar.<zw.$_ûâÛWÙ.Ù. 0001A0
D1D1E2D1 0005B8DF D1E8D1E7 D13E7803 FE05AD49 74C208C1 08C508F8 88AD95AD Ù.Ù.¼.é.è.ôt!Ù.±.x>1Ö1Ö1ÖÈ..1ã!! 0001C0
C613FE13 EE13CE13 F58001FA 81F633D3 0AD92243 F075CBFE D7D0D001 D7D1D501 1!1ø1ÀÀø±ÙuÞC"].Æ3-.°..¼.ö.Ÿ.±.6 0001E0

Dump of file SATURN:[PCCOMMON.DUMP.DLL]DA-XPORT.DLL;1 on 18-APR-1990 10:39:21.68
File ID (400,27,0)   End of file block 81 / Allocated 84

Virtual block number 62 (0000003E), 512 (0200) bytes

F888E88B C888D88B C0330121 EC0E800F EB00D780 F57FF03D 0E74FFF0 A9000780 .ª.`Þ.t.=Þ.¼.ª.Š...ß!.3à.Ä.à.Ò.¼ 000000
47882EAB F3C033FD 88000889 21EEBDC3 FF0A0645 89047589 02608900 895FF788 .¼ ...m..u..E...Û§Ÿ!¿...»3àµ¨..G 000020
830F2809 2B5653C8 88980404 D8F6C42A C42AE022 C7280004 880007BF 08440108 ..Ð.e..¦..+ú"Å*á*á-Ä....àSV+)+Ö. 000040
C38302EE 83000456 833E0256 113E0046 013E27F7 2E048806 C683F728 F10308C3 Û..þ+¼.ó....¼'>.F.>.V.>.V...Ÿ..û 000060
97AD010A 92ADCD0A C808ADC8 08AD91AD F5870EED 838C754F 02C5835B 5EE6E202 .ã]^[.é.Ou¥.Ù..¼Ù.Ù.àÙ.à.ëÙ..1Ù. 000080
33D508EF 230001BD D0D10301 D1D1D7D1 E2D1084C FF0078C0 08F588AD 93AD91AD Ù.Ù.Ù.¼.àx..L.!ã!ª111Æ!À§..#ÿ.!3 0000A0
89045C89 024C893C 89C508CD D1086C01 D5D1C513 D013CD13 FD13F580 01FA81ED Ù.ª..¼.».ë.1.é!!.l.!ë.é.<.L..\.. 0000C0
0E9C4000 00000000 000007C8 00000000 00000000 04A00000 00000000 00C30644 D.û.................à........ã.. 0000E0
D5006B9D C5ADA82B 70B59E00 368E1BC9 BF040000 00001B8E 8C200000 00000000 ...... ¥f......¢è..6..çþ+´Ùé.k.í 000100
CCCCCD03 53AA7EEB FB9DF9DE 8E01AA93 BA47C980 E98CE000 D5C2781F 49FFCFA6 ÌÙ.Ì.xÖí.Á.Ö.èGo.¨..B°.«Š-¨S.ëää 000120
118461CE FDFFF3D1 B71758E2 19652CFF FAA3070A 3070A307 0AFFFDCC CCCCCCCC ääääà»..ªÈþ=.ªÈ°.,e.ãX.ñ¦µ.»öª.. 000140
7FEA27A5 39E9A5FF 96CFB11E AD453994 BAFFCBE6 9594BEC4 4DE15BFF E6ABCC77 wä¨].[ÅM6ƒ..Ìù.¤.9ÈÙ.Ÿü..ÈÖ9È'ö. 000160
7DBB0579 FF084323 8BFCAEC0 31432563 7A193AFE 57D00046 7C64BCE4 A1FF2CA8 ´,.ÀÖ¥d|FÀ!W±:.zcXC1àÙ=£#C..y.£) 000180
4F020300 13C3ECEB 5B5FFE7B E85753F5 73EFD100 74FF0B0A C3830AEB 830FF743 C¼Ö.Š..û...t.ÌÿsXSWÖ(±_[Šàû....O 0001A0
8D000200 0700010A 90010300 0500010A C8010301 43000933 78020301 3B000933 3..;...x3..C...à................ 0001C0
37010501 55000934 11020300 00000637 60000201 4C00093B 78020300 0000043C <......x;..L...`7.......4..U...7 0001E0
```

Dump of file SATURN:[PCCOMMON.DUMP.DLL]DA-XPORT.DLL;1 on 18-APR-1990 10:39:21.68
File ID (400,27,0)   End of file block 81 / Allocated 84

Virtual block number 63 (0000003F), 512 (0200) bytes

```
                                                                        =......$:......D8..".....8..&.... 000000
15010300 26000138 8F010300 22000138 44010300 8800013A EB010500 87000130 =..:...|...<...44..D...h4..K.... 000020
91010300 4B000134 68010300 44000134 34010300 3C00011B E6010300 3A000130 3..M...4...[...|...\........... 000040
00000000 00000000 00000000 5C000100 21010300 58000100 34010300 40000133 ........MS Run-Time Library - Co 000060
6F43202D 20797261 7262694C 20656069 54206E75 5220534D 00000000 00000000 pyright (c) 1988, Microsoft Corp 000080
70726F43 2074666F 736F7263 694D202C 38383931 20296328 20746867 69727970 ..w.vxr.w.**entity**..**entbox** 0000A0
2A2A786F 62746E65 2A2A000A 2A2A7974 69746E65 2A2A0077 00727876 00770011 ..CLEAR.1NF.2NF.3NF.3NF.CLEAR.YE 0000C0
45590052 41454C43 00464E33 00464E33 00464E32 00464E31 00524145 4C43000A S.NO.NO.,%d,%d.**p-set**..**key* 0000E0
2A796568 2A2A000A 2A2A7465 732D702A 2A006425 2C64252C 004F4E00 4F4E0053 *..**key-att**..**key-pset**..** 000100
2A2A000A 2A2A7465 73702D79 65682A2A 000A2A2A 74746120 7965682A 2A000A2A dim**..**domain**......ALPHANUME 000120
4540554E 4148504C 41000000 00000A2A 2A6E6961 6D6F642A 2A000A2A 2A606964 RIC.,%ld.,%ld.INTEGER.,"%ld".,"% 000140
25222C00 22646C25 222C0052 45474554 4E490064 6C252C00 646C252C 00434952 ld".REAL.,"%f".,"%f".BOOLEAN...I 000160
49000000 4E41454C 4F4F4200 22662522 2C002266 25222C00 4C414552 0022646C MAGE...VIDEO...ALPHABETIC...AUDI 000180
49445541 00000043 49544542 4148504C 41000000 4F454449 56000000 4547414D O.........**synonyms**..**denote 0001A0
65746F6E 61642A2A 000A2A2A 7360796E 6F6E7973 2A2A000A 00000000 0000004F s**.."%s","%s"..**note-obj**..** 0001C0
2A2A000A 2A2A6A62 6F2D6574 6F6E2A2A 000A2273 25222C22 73252200 0A2A2A73 map-obj**.."%s","","","","","inf 0001E0
666E6922 2C22222C 22222C22 222C2222 2C227325 22000A2A 2A6A626F 2D706160
```

Dump of file SATURN:[PCCOMMON.DUMP.DLL]DA-XPORT.DLL;1 on 18-APR-1990 10:39:21.68
File ID (400,27,0)   End of file block 81 / Allocated 84

Virtual block number 64 (00000040), 512 (0200) bytes

```
                                                                        ormation-model","%s".."%s","","" 000000
22222C22 222C2273 2522000A 22732522 2C226C65 646F6D2D 6E6F6974 616D726F ,"information-model","%s","entit 000020
7469746E 65222C22 7325222C 226C6564 6F6D2D6E 6F697461 6D726F66 6E69222C y","%s".."%s","information-model 000040
6C65646F 6D2D6E6F 69746160 726F666E 69222C22 73252200 0A227325 222C2279 ","%s","entity","%s","attribute" 000060
22657475 62697274 7461222C 22732522 2C227974 69746E65 222C2273 25222C22 ,"%s".."%s","","","information-m 000080
6D2D6E6F 69746160 726F666E 69222C22 222C2222 2C227325 22000A22 7325222C odel","%s","attribute","%s".."%s 0000A0
73252200 0A227325 222C2265 74756269 72747461 222C2273 25222C22 6C65646F ","information-model","%s","enti 0000C0
69746E65 222C2273 25222C22 6C65646F 6D2D6E6F 69746160 726F666E 69222C22 ty","%s","key","%s".."%s","","", 0000E0
2C22222C 22222C22 73252200 0A227325 222C2279 656B222C 22732522 2C227974 "information-model","%s","dimens 000100
736E6560 6964222C 22732522 2C226C65 646F6D2D 6E6F6974 616D726F 666E6922 ion","%s".."%s","information-mod 000120
646F6D2D 6E6F6974 616D726F 666E6922 2C227325 22000A22 7325222C 226E6F69 el","%s","entity","%s","partners 000140
7372656E 74726170 222C2273 25222C22 79746974 6E65222C 22732522 2C226C65 hip-set","%s".."%s".,"%s".,%ld., 000160
2C00646C 252C0022 7325222C 00227325 22000A22 7325222C 22746573 2D706968 %ld.,%ld.,%ld..**attrnest**....* 000180
2A000A00 0A2A2A74 73656E72 7474612A 2A000A64 6C252C00 646C252C 00646C25 *attrext**....**attrib**...IOR.A 0001A0
4100524F 4900000A 2A2A6269 72747461 2A2A000A 000A2A2A 74786572 7474612A ND.XOR.IOR.**pship**........,%ld 0001C0
646C252C 000A000A 000A000A 2A2A7069 6873702A 2A00524F 4900524F 5800444E .,%ld.,%ld.,%d.,"%c".,"%s"..,"%s 0001E0
7325222C 000A2273 25222C00 22632522 2C006425 2C00646C 252C0064 6C252C00
```

Dump of file SATURN:[PCCOMMON.DUMP.DLL]DA-XPORT.DLL;1 on 18-APR-1990 10:39:21.68
File ID (400,27,0)   End of file block 81 / Allocated 84

Virtual block number 65 (00000041), 512 (0200) bytes

```
                                                                        ","%s".,"%s"."","","","","inform 000000
6D726F66 6E69222C 22222C22 222C2222 2C222200 22732522 2C002273 25220022 ation-model","%s","%s","","","", 000020
2C22222C 22222C22 222C2273 25222C22 7325222C 226C6564 6F6D2D6E 6F697461 "".."","","information-model","% 000040
25222C22 6C65646F 6D2D6E6F 69746160 726F666E 69222C22 222C2222 000A2222 s","entity","%s","%s","","","" 000060
222C2222 2C22222C 22222C22 7325222C 22732522 2C227974 69746E65 222C2273 ".."","","information-model","%s 000080
7325222C 226C6564 6F6D2D6E 6F697461 6D726F66 6E69222C 22222C22 22000A22 ","dimension","%s","%s","","","" 0000A0
22222C22 222C2222 2C227325 222C2273 25222C22 6E6F6973 6E656069 64222C22 ,"".."information-model","%s","e 0000C0
65222C22 7325222C 226C6564 6F6D2D6E 6F697461 6D726F66 6E692200 0A22222C ntity","%s","attribute","%s","%s 0000E0
7325222C 22732522 2C226574 75626972 74746122 2C227325 222C2279 7469746E ","","","",".."","","informatio 000100
6F697461 6D726F66 6E69222C 22222C22 22000A22 222C2222 2C22222C 22222C22 n-model","%s","entity","%s","%s" 000120
22732522 2C227325 222C2279 7469746E 65222C22 7325222C 226C6564 6F6D2D6E ,"","","",""..information-model 000140
6C65646F 6D2D6E6F 69746160 726F666E 6922000A 22222C22 222C2222 2C22222C ","%s","entity","%s","key","%s", 000160
2C227325 222C2279 656B222C 22732522 2C227974 69746E65 222C2273 25222C22 "%s","","","","".."information-m 000180
6D2D6E6F 69746160 726F666E 6922000A 22222C22 222C2222 2C22222C 22732522 odel","%s","entity","%s","partne 0001A0
656E7472 6170222C 22732522 2C227974 69746E65 222C2273 25222C22 6C65646F rship-set","%s","%s","","","","" 0001C0
22222C22 222C2222 2C22222C 22732522 2C227325 222C2274 65732D70 69687372 ...... % %". %.................. 0001E0
00000000 00000000 00000000 00000000 FFFF2520 0AAB2520 25200000 0000000A
```

```
Dump of file SATURN:[PCCOMMON.DUMP.DLL]DA-XPORT.DLL;1 on 18-APR-1990 10:39:21.68
File ID (400,27,0)   End of file block 81 / Allocated 84

Virtual block number 66 (00000042), 512 (0200) bytes

 00000000 00000000 00000000 00000000 00000000 00000000 00000000 00000000 ................................ 000000
 00000000 00000000 00000000 00000000 00000000 00000000 00000000 00000000 ................................ 000020
 00000000 00000000 00000000 00000000 00000000 00000000 00000000 00000000 ................................ 000040
 00000000 00000000 00000000 00000000 00000000 00000000 00000000 00000000 ................................ 000060
 00000000 00000000 00000000 00000000 00000000 00000000 00000000 00000000 ................................ 000080
 00000000 00000000 00000000 00000000 00000000 00000000 00000000 00000000 ................................ 0000A0
 00000000 00000000 00000000 00000000 00000000 00000000 00000000 00000000 ................................ 0000C0
 00000000 00000000 00000000 00000000 00000000 00000000 00000000 00000000 ................................ 0000E0
 00000000 00000000 00000000 00000000 00000000 00000000 00000000 00000000 ................................ 000100
 00000000 00000000 00000000 00000000 00000000 00000000 00000000 00000000 ................................ 000120
 00000000 00000000 00000000 00000000 00000000 00000000 00000000 00000000 ................................ 000140
 00000000 00000000 00000000 00000000 00000000 00000000 00000000 00000000 ................................ 000160
 00000000 00000000 00000000 00000000 00000000 00000000 00000000 00000000 ................................ 000180
 00000000 00000000 00000000 00000000 00000000 00000000 00000000 00000000 ................................ 0001A0
 00000000 00000000 00000000 00000000 00000000 00000000 00000000 00000000 ................................ 0001C0
 00000000 00000000 00000000 00000000 00000000 00000000 00000000 00000000 ................................ 0001E0

Dump of file SATURN:[PCCOMMON.DUMP.DLL]DA-XPORT.DLL;1 on 18-APR-1990 10:39:21.68
File ID (400,27,0)   End of file block 81 / Allocated 84

Virtual block number 67 (00000043), 512 (0200) bytes

 00000000 00000000 00000000 00000000 00000000 00000000 00000000 00000000 ................................ 000000
 00000000 00000000 00000000 00000000 00000000 00000000 00000000 00000000 ................................ 000020
 00000000 00000000 00000000 00000000 00000000 00000000 00000000 00000000 ................................ 000040
 00000000 00000000 00000000 00000000 00000000 00000000 00000000 00000000 ................................ 000060
 00000000 00000000 00000000 00000000 00000000 00000000 00000000 00000000 ................................ 000080
 00000000 00000000 00000000 00000000 00000000 00000000 00000000 00000000 ................................ 0000A0
 00000000 00000000 00000000 00000000 00000000 00000000 00000000 00000000 ................................ 0000C0
 00000000 00000000 00000000 00000000 00000000 00000000 00000000 00000000 ................................ 0000E0
 00000000 00000000 00000000 00000000 00000000 00000000 00000000 00000000 ................................ 000100
 00000000 00000000 00000000 00000000 00000000 00000000 00000000 00000000 ................................ 000120
 00000000 00000000 00000000 00000000 00000000 00000000 00000000 00000000 ................................ 000140
 00000000 00000000 00000000 00000000 00000000 00000000 00000000 00000000 ................................ 000160
 00000000 00000000 00000000 00000000 00000000 00000000 00000000 00000000 ................................ 000180
 00000000 00000000 00000000 00000000 00000000 00000000 00000000 00000000 ................................ 0001A0
 00000000 00000000 00000000 00000000 00000000 00000000 00000000 00000000 ................................ 0001C0
 00000000 00304F46 4E495F45 4C49465F 435F058C 00000000 00000000 00000000 ..............._C_FILE_INFO=..... 0001E0

Dump of file SATURN:[PCCOMMON.DUMP.DLL]DA-XPORT.DLL;1 on 18-APR-1990 10:39:21.68
File ID (400,27,0)   End of file block 81 / Allocated 84

Virtual block number 68 (00000044), 512 (0200) bytes

 23E820EE 240B20F6 09B22AB8 09AE29A8 09AA2ADC 09A62A1E FFFF2FBE 005C005C \.\../...*[.£*¨.´)0.¦*ý.- .$Y Ò# 000000
 00000000 00000000 00000000 209A2047 2673220C 2675220E 26122258 23E620EC & ]#X".&B"u&£"s&G . ............ 000020
 00000000 00000000 00000000 00000000 00000000 81818101 00000001 00000000 ................................ 000040
 00000000 00000000 00000000 00000000 00000000 00000000 00000000 00000000 ................................ 000060
 00000000 00000000 00000000 00000000 00000000 00000000 00000000 00000000 ................................ 000080
 00000000 00000000 00000000 00000000 00000000 00000000 00000000 00000000 ................................ 0000A0
 00000000 00000000 00000000 00000000 00000000 00000000 00000000 00000000 ................................ 0000C0
 00000000 00000000 00000000 00000000 00000000 00000000 00000000 00000000 ................................ 0000E0
 00000000 00000000 00000000 00000000 00000000 00000000 00000000 00000000 ................................ 000100
 00000000 00000000 00000000 00000000 00000000 00000000 00000000 00000000 ................................ 000120
 0A0A0A0A 0A0A0A0A 0A0A0A0A 0A0A0A0A 0A0A0A0A 0A0A0A00 00000000 00000000 ................................ 000140
 0A0A0A0A 0A0A0A0A 0A0A0A0A 0A0A0A0A 0A0A0A0A 0A0A0A0A 0A0A0A0A 0A0A0A0A ................................ 000160
 0A0A0A0A 0A0A0A0A 0A0A0A0A 0A0A0A0A 0A0A0A0A 0A0A0A0A 0A0A0A0A 0A0A0A0A ................................ 000180
 0A0A0A0A 0A0A0A0A 0A0A0A0A 0A0A0A0A 0A0A0A0A 0A0A0A0A 0A0A0A0A 0A0A0A0A ................................ 0001A0
 0A0A0A0A 0A0A0A0A 0A0A0A0A 0A0A0A0A 0A0A0A0A 0A0A0A0A 0A0A0A0A 0A0A0A0A ................................ 0001C0
 0A0A0A0A 0A0A0A0A 0A0A0A0A 0A0A0A0A 0A0A0A0A 0A0A0A0A 0A0A0A0A 0A0A0A0A ................................ 0001E0
```

```
Dump of file SATURN:[PCCOMMON.DUMP.DLL]DA-XPORT.DLL;1 on 18-APR-1990 10:39:21.68
File ID (400,27,0)   End of file block 81 / Allocated 84

Virtual block number 69 (00000045), 512 (0200) bytes

 0A0A0A0A 0A0A0A0A 0A0A0A0A 0A0A0A0A 0A0A0A0A 0A0A0A0A 0A0A0A0A 0A0A0A0A ................................ 000000
 0A0A0A0A 0A0A0A0A 0A0A0A0A 0A0A0A0A 0A0A0A0A 0A0A0A0A 0A0A0A0A 0A0A0A0A ................................ 000020
 00000000 00000000 00000000 00000000 00000000 0000000A 0A0A0A0A 0A0A0A0A ................................ 000040
 0BF60C18 0BF62200 0BF60000 2320202B 00296C6C 756E2800 296C6C75 6E280000 ..(null).(null).+- #..-.."-...-. 000060
 E0F0F8FC FEFF0000 00007878 31364D05 01010000 00000C24 0BF60C20 0BF60C1C ..-. .-.$........M61xx.....±•½pÀ 000080
 00000000 00000000 00000000 00000000 00000000 00000000 00000000 000080C0 À............................... 0000A0
 00000000 00000000 00000000 00303030 2B650000 00000000 00000000 00000000 .............e+000.............. 0000C0
 00000000 00000000 00000000 00000000 00000000 00000000 00000000 00000000 ................................ 0000E0
 00000000 00000000 00000000 00000000 00000000 00000000 00000000 00000000 ................................ 000100
 00000000 00000000 00000000 00000000 00000000 00000000 00000000 00000000 ................................ 000120
 00000000 00000000 00000000 00000000 00000000 00000000 00000000 00000000 ................................ 000140
 00000000 00000000 00000000 00000000 00000000 00000000 00000000 00000000 ................................ 000160
 00000000 00000000 00000000 00000000 00000000 00000000 00000000 00000000 ................................ 000180
 00000000 00000000 00000000 00000000 00000000 00000000 00000000 00000000 ................................ 0001A0
 00000000 00000000 00000000 00000000 00000000 00000000 00000000 00000000 ................................ 0001C0
 00000000 00000000 00000000 00000000 00000000 00000000 00000000 00000000 ................................ 0001E0

Dump of file SATURN:[PCCOMMON.DUMP.DLL]DA-XPORT.DLL;1 on 18-APR-1990 10:39:21.68
File ID (400,27,0)   End of file block 81 / Allocated 84

Virtual block number 70 (00000046), 512 (0200) bytes

 00000000 00000000 00000000 00000000 00000000 00000000 00000000 00000000 ................................ 000000
 00000000 00000000 00000000 00000000 00000000 00000000 00000000 00000000 ................................ 000020
 000C0C8C 00000000 00000000 00000000 00000000 00000000 00000000 00000000 ................................ 000040
 00000000 00000000 00000102 00000000 00000000 00000001 2218000C 00000E06 ......."........................ 000060
 00000000 00000000 00000000 00000000 00000000 00000000 00000000 00000202 ................................ 000080
 00000000 00000000 00000000 00000000 00000000 00000000 00000000 00000000 ................................ 0000A0
 00000000 00000000 00000000 00000000 00000000 00000000 00000000 00000000 ................................ 0000C0
 00000000 00000000 00000000 00000000 00000000 00000000 00000000 00000000 ................................ 0000E0
 00000000 00000000 00000000 00000000 00000000 00000000 00000000 00000000 ................................ 000100
 00000000 00000000 00000000 00000000 00000000 00000000 00000000 00000000 ................................ 000120
 00000000 00000000 00000000 00000000 00000000 00000000 00000000 00000000 ................................ 000140
 00000000 00000000 00000000 00000000 00000000 00000000 00000000 00000000 ................................ 000160
 00000000 00000000 00000000 00000000 00000000 00000000 00000000 00000000 ................................ 000180
 00000000 00000000 00000000 00000000 00000000 00000000 00000000 00000000 ................................ 0001A0
 00000000 00000000 00000000 00000000 00000000 00000000 00000000 00000000 ................................ 0001C0
 00000000 00000000 00000000 00000000 00000000 00000000 00000000 00000000 ................................ 0001E0

Dump of file SATURN:[PCCOMMON.DUMP.DLL]DA-XPORT.DLL;1 on 18-APR-1990 10:39:21.68
File ID (400,27,0)   End of file block 81 / Allocated 84

Virtual block number 71 (00000047), 512 (0200) bytes

 00000000 00000000 00000000 00000000 00000000 00000000 00000000 00000000 ................................ 000000
 00000000 00000000 00000000 00000000 00000000 00000000 00000000 00000000 ................................ 000020
 00000000 00000000 00000000 00000000 00000000 00000000 00000000 00000000 ................................ 000040
 00000000 00000000 00000000 00000000 00000000 00000000 00000000 00000000 ................................ 000060
 00000000 00000000 00000000 00000000 00000000 00000000 00000000 00000000 ................................ 000080
 00000000 00000000 00000000 00000000 00000000 00000000 00000000 00000000 ................................ 0000A0
 00000000 00000000 00000000 00000000 00000000 00000000 00000000 00000000 ................................ 0000C0
 00000000 00000000 00000000 00000000 00000000 00000000 00000000 00000000 ................................ 0000E0
 00000000 00000000 00000000 00000000 00000000 00000000 00000000 00000000 ................................ 000100
 00000000 00000000 00000000 00000000 00000000 00000000 00000000 00000000 ................................ 000120
 00000000 00000000 00000000 00000000 00000000 00000000 00000000 00000000 ................................ 000140
 00000000 00000000 00000000 00000000 00000000 00000000 00000000 00000000 ................................ 000160
 00000000 00000000 00000000 00000000 00000000 00000000 00000000 00000000 ................................ 000180
 00000000 00000000 00000000 00000000 00000000 00000000 00000000 00000000 ................................ 0001A0
 00000000 00000000 00000000 00000000 00000000 00000000 00000000 00000000 ................................ 0001C0
 00000000 00000000 00000000 00000000 00000000 00000000 00000000 00000000 ................................ 0001E0
```

```
Dump of file SATURN:[PCCOMMON.DUMP.DLL]DA-XPORT.DLL;1 on 18-APR-1990 10:39:21.68
File ID (400,27,0)    End of file block 81 / Allocated 84

Virtual block number 72 (00000048), 512 (0200) bytes

00000000 00000000 00000000 00000000 00000000 00000000 00000000 00000000 ................................ 000000
00000000 00000000 00000000 00000000 00000000 00000000 00000000 00000000 ................................ 000020
00000000 00000000 00000000 00000000 00000000 00000000 00000000 00000000 ................................ 000040
00000000 00000000 00000000 00000000 00000000 00000000 00000000 00000000 ................................ 000060
00000000 00000000 00000000 00000000 00000000 00000000 00000000 00000000 ................................ 000080
00000000 00000000 00000000 00000000 00000000 00000000 00000000 00000000 ................................ 0000A0
00000000 00000000 00000000 00000000 00000000 00000000 00000000 00000000 ................................ 0000C0
00000000 00000000 00000000 00000000 00000000 00000000 00000000 00000000 ................................ 0000E0
00000000 00000000 00000000 00000000 00000000 00000000 00000000 00000000 ................................ 000100
00000000 00000000 00000000 00000000 00000000 00000000 00000000 00000000 ................................ 000120
00000000 00000000 00000000 00000000 00000000 00000000 00000000 00000000 ................................ 000140
00000000 00000000 00000000 00000000 00000000 00000000 00000000 00000000 ................................ 000160
00000000 00000000 00000000 00000000 00000000 00000000 00000000 00000000 ................................ 000180
00000000 00000000 00000000 00000000 00000000 00000000 00000000 00000000 ................................ 0001A0
00000000 00000000 00000000 00000000 00000000 00000000 00000000 00000000 ................................ 0001C0
00000000 00000000 00000000 00000000 00000000 00000000 00000000 00000000 ................................ 0001E0

Dump of file SATURN:[PCCOMMON.DUMP.DLL]DA-XPORT.DLL;1 on 18-APR-1990 10:39:21.68
File ID (400,27,0)    End of file block 81 / Allocated 84

Virtual block number 73 (00000049), 512 (0200) bytes

00000000 00000000 00000000 00000000 00000000 00000000 00000000 00000000 ................................ 000000
00000000 00000000 00000000 00000000 00000000 00000000 00000000 00000000 ................................ 000020
00000000 00000000 00000000 00000000 00000000 00000000 00000000 00000000 ................................ 000040
00000000 00000000 00000000 00000000 00000000 00000000 00000000 00000000 ................................ 000060
00000000 00000000 00000000 00000000 00000000 00000000 00000000 00000000 ................................ 000080
00000000 00000000 00000000 00000000 00000000 00000000 00000000 00000000 ................................ 0000A0
00000000 00000000 00000000 00000000 00000000 00000000 00000000 00000000 ................................ 0000C0
00000000 00000000 00000000 00000000 00000000 00000000 00000000 00000000 ................................ 0000E0
00000000 00000000 00000000 00000000 00000000 00000000 00000000 00000000 ................................ 000100
00000000 00000000 00000000 00000000 00000000 00000000 00000000 00000000 ................................ 000120
00000000 00000000 00000000 00000000 00000000 00000000 00000000 00000000 ................................ 000140
00000000 00000000 00000000 00000000 00000000 00000000 00000000 00000000 ................................ 000160
00000000 00000000 00000000 00000000 00000000 00000000 00000000 00000000 ................................ 000180
00000000 00000000 00000000 00000000 00000000 00000000 00000000 00000000 ................................ 0001A0
00000000 00000000 00000000 00000000 00000000 00000000 00000000 00000000 ................................ 0001C0
00000000 00000000 00000000 00000000 00000000 00000000 00000000 00000000 ................................ 0001E0

Dump of file SATURN:[PCCOMMON.DUMP.DLL]DA-XPORT.DLL;1 on 18-APR-1990 10:39:21.68
File ID (400,27,0)    End of file block 81 / Allocated 84

Virtual block number 74 (0000004A), 512 (0200) bytes

00000000 00000000 00000000 00000000 00000000 00000000 00000000 00000000 ................................ 000000
00000000 00000000 00000000 00000000 00000000 00000000 00000000 00000000 ................................ 000020
00000000 00000000 00000000 00000000 00000000 00000000 00000000 00000000 ................................ 000040
00000000 00000000 00000000 00000000 00000000 00000000 00000000 00000000 ................................ 000060
00000000 00000000 00000000 00000000 00000000 00000000 00000000 00000000 ................................ 000080
00000000 00000000 00000000 00000000 00000000 00000000 00000000 00000000 ................................ 0000A0
00000000 00000000 00000000 00000000 00000000 00000000 00000000 00000000 ................................ 0000C0
00000000 00000000 00000000 00000000 00000000 00000000 00000000 00000000 ................................ 0000E0
00000000 00000000 00000000 00000000 00000000 00000000 00000000 00000000 ................................ 000100
00000000 00000000 00000000 00000000 00000000 00000000 00000000 00000000 ................................ 000120
00000000 00000000 00000000 00000000 00000000 00000000 00000000 00000000 ................................ 000140
00000000 00000000 00000000 00000000 00000000 00000000 00000000 00000000 ................................ 000160
00000000 00000000 00000000 00000000 00000000 00000000 00000000 00000000 ................................ 000180
00000000 00000000 00000000 00000000 00000000 00000000 00000000 00000000 ................................ 0001A0
00000000 00000000 00000000 00000000 00000000 00000000 00000000 00000000 ................................ 0001C0
00000000 00000000 00000000 00000000 00000000 00000000 00000000 00000000 ................................ 0001E0
```

```
Dump of file SATURN:[PCCOMMON.DUMP.DLL]DA-XPORT.DLL;1 on 18-APR-1990 10:39:21.68
File ID (400,27,0)   End of file block 81 / Allocated 84

Virtual block number 75 (0000004B), 512 (0200) bytes

00000000 00000000 00000000 00000000 00000000 00000000 00000000 00000000 ................................ 000000
00000000 00000000 00000000 00000000 00000000 00000000 00000000 00000000 ................................ 000020
00000000 00000000 00000000 00000000 00000000 00000000 00000000 00000000 ................................ 000040
00000000 00000000 00000000 00000000 00000000 00000000 00000000 00000000 ................................ 000060
00000000 00000000 00000000 00000000 00000000 00000000 00000000 00000000 ................................ 000080
00000000 00000000 00000000 00000000 00000000 00000000 00000000 00000000 ................................ 0000A0
00000000 00000000 00000000 00000000 00000000 00000000 00000000 00000000 ................................ 0000C0
00000000 00000000 00000000 00000000 00000000 00000000 00000000 00000000 ................................ 0000E0
00000000 00000000 00000000 00000000 00000000 00000000 00000000 00000000 ................................ 000100
00000000 00000000 00000000 00000000 00000000 00000000 00000000 00000000 ................................ 000120
00000000 00000000 00000000 00000000 00000000 00000000 00000000 00000000 ................................ 000140
00000000 00000000 00000000 00000000 00000000 00000000 00000000 00000000 ................................ 000160
00000000 00000000 00000000 00000000 00000000 00000000 00000000 00000000 ................................ 000180
00000000 00000000 00000000 00000000 00000000 00000000 00000000 00000000 ................................ 0001A0
00000000 00000000 00000000 00000000 00000000 00000000 00000000 00000000 ................................ 0001C0
00000000 00000000 00000000 00000000 00000000 00000000 00000000 00000000 ................................ 0001E0

Dump of file SATURN:[PCCOMMON.DUMP.DLL]DA-XPORT.DLL;1 on 18-APR-1990 10:39:21.68
File ID (400,27,0)   End of file block 81 / Allocated 84

Virtual block number 76 (0000004C), 512 (0200) bytes

00000000 00000000 00000000 00000000 00000000 00000000 00000000 00000000 ................................ 000000
00000000 00000000 00000000 00000000 00000000 00000000 00000000 00000000 ................................ 000020
00000000 00000000 00000200 00010000 00000000 00000000 00000000 00000000 ................................ 000040
00000000 00000000 00000000 00000000 00000000 00000000 00000000 00000000 ................................ 000060
00000000 00000000 00000000 00000000 00000000 00000000 00000000 00000000 ................................ 000080
00000000 00000000 00000000 00000000 00000000 00000000 00000000 00000000 ................................ 0000A0
00000000 00000000 00000000 00000000 00000000 00000000 00000000 00000000 ................................ 0000C0
00000000 00000000 00000000 00000000 00000000 00000000 00000000 00000000 ................................ 0000E0
00000000 00000000 00000000 00000000 00000000 00000000 00000000 00000000 ................................ 000100
00000000 00000000 00000000 00000000 00000000 00000000 00000000 00000000 ................................ 000120
00000000 00000000 00000000 00000000 00000000 00000000 00000000 00000000 ................................ 000140
00000000 00000000 00000000 00000000 00000000 00000000 00000000 00000000 ................................ 000160
00000000 00000000 00000000 00000000 00000000 00000000 00000000 00000000 ................................ 000180
00000000 00000000 00000000 00000000 00000000 00000000 00000000 00000000 ................................ 0001A0
00000000 00000000 00000000 00000000 00000000 00000000 00000000 00000000 ................................ 0001C0
00000000 00000000 00000000 00000000 00000000 00000000 00000000 00000000 ................................ 0001E0

Dump of file SATURN:[PCCOMMON.DUMP.DLL]DA-XPORT.DLL;1 on 18-APR-1990 10:39:21.68
File ID (400,27,0)   End of file block 81 / Allocated 84

Virtual block number 77 (0000004D), 512 (0200) bytes

00000000 00000000 00000000 00000000 00000000 00000000 00000000 00000000 ................................ 000000
00000000 00000000 00000000 00000000 00000000 00000000 00000000 00000000 ................................ 000020
00000000 00000000 00000000 00000000 00000000 00000000 00000000 00000000 ................................ 000040
00000000 00000000 00000000 00000000 00000000 00000000 00000000 00000000 ................................ 000060
00000000 00000000 00000000 00000000 00000000 00000000 00000000 00000000 ................................ 000080
00000000 00000000 00000000 00000000 00000000 00000000 00000000 00000000 ................................ 0000A0
00000000 00000000 00000000 00000000 00000000 00000000 00000000 00000000 ................................ 0000C0
00000000 00000000 00000000 00000000 00000000 00000000 00000000 00000000 ................................ 0000E0
00000000 00000000 00000000 00000000 00000000 00000000 00000000 00000000 ................................ 000100
00000000 00000000 00000000 00000000 00000000 00000000 00000000 00000000 ................................ 000120
00000000 00000000 00000000 00000000 00000000 00000000 00000000 00000000 ................................ 000140
00000000 00000000 00000000 00000000 00000000 00000000 00000000 00000000 ................................ 000160
00000000 00000000 00000000 00000000 00000000 00000000 00000000 00000000 ................................ 000180
00000000 00000000 00000000 00000000 00000000 00000000 00000000 00000000 ................................ 0001A0
00000000 00000000 00000000 00000000 00000000 00000000 00000000 00000000 ................................ 0001C0
00000000 00000000 00000000 00000000 00000000 00000000 00000000 00000000 ................................ 0001E0
```

```
Dump of file SATURN:[PCCOMMON.DUMP.DLL]DA-XPORT.DLL;1 on 18-APR-1990 10:39:21.68
File ID (400,27,0)   End of file block 81 / Allocated 84

Virtual block number 78 (0000004E), 512 (0200) bytes

00000000 00000000 00000000 00000000 00000000 00000000 00000000 00000000 ................................ 000000
00000000 00000000 00000000 00000000 00000000 00000000 00000000 00000000 ................................ 000020
00000000 00000000 00000000 00000000 00000000 00000000 00000000 00000000 ................................ 000040
00000000 00000000 00000000 00000000 00000000 00000000 00000000 00000000 ................................ 000060
00000000 00000000 00000000 00000000 00000000 00000000 00000000 00000000 ................................ 000080
00000000 00000000 00000000 00000000 00000000 00000000 00000000 00000000 ................................ 0000A0
00000000 00000000 00000000 00000000 00000000 00000000 00000000 00000000 ................................ 0000C0
00000000 00000000 00000000 00000000 00000000 00000000 00000000 00000000 ................................ 0000E0
00000000 00000000 00000000 00000000 00000000 00000000 00000000 00000000 ................................ 000100
00000000 00000000 00000000 00000000 00000000 00000000 00000000 00000000 ................................ 000120
00000000 00000000 00000000 00000000 00000000 00000000 00000000 00000000 ................................ 000140
00000000 00000000 00000000 00000000 00000000 00000000 00000000 00000000 ................................ 000160
00000000 00000000 00000000 00000000 00000000 00000000 00000000 00000000 ................................ 000180
00000000 00000000 00000000 00000000 00000000 00000000 00000000 00000000 ................................ 0001A0
00000000 00000000 00000000 00000000 00000000 00000000 00000000 00000000 ................................ 0001C0
00000000 00000000 00000000 00000000 00000000 00000000 00000000 00000000 ................................ 0001E0

Dump of file SATURN:[PCCOMMON.DUMP.DLL]DA-XPORT.DLL;1 on 18-APR-1990 10:39:21.68
File ID (400,27,0)   End of file block 81 / Allocated 84

Virtual block number 79 (0000004F), 512 (0200) bytes

00000000 00000000 00000000 00000000 00000000 00000000 00000000 00000000 ................................ 000000
00000000 00000000 00000000 00000000 00000000 00000000 00000000 00000000 ................................ 000020
00000000 00000000 00000000 00000000 221A19E6 00000000 00000000 00000000 ............Ì..*................ 000040
20202020 20202020 20202028 28282828 20202020 20202020 20000000 20000000 ... ...        (((((            000060
84848484 84848484 84101010 10101010 10101010 10101010 48202020 20202020          H....................... 000080
01010101 01010101 01010101 01010101 01018181 81818181 10101010 10101084 ................................ 0000A0
02020202 02020202 02020202 02020202 02028282 82828282 10101010 10100101 ................................ 0000C0
00000000 00000000 00000000 00000000 00000000 00000000 00201010 10100202 ...... ......................... 0000E0
00000000 00000000 00000000 00000000 00000000 00000000 00000000 00000000 ................................ 000100
00000000 00000000 00000000 00000000 00000000 00000000 00000000 00000000 ................................ 000120
00000000 00000000 00000000 00000000 00000000 00000000 00000000 00000000 ................................ 000140
00000000 00000000 00000000 00000000 00000000 00000000 00000000 00000000 ................................ 000160
00000000 00000000 00000000 0200FFFF FFFF0000 00000000 00000000 00000000 ................................ 000180
00000000 00000000 00000000 00000000 00000000 00000000 00000000 00000000 ................................ 0001A0
00000080 00000000 00000000 00000000 00000000 00000000 00000000 00000000 ................................ 0001C0
00000000 00000000 00000000 00000000 00000000 00000000 00000000 00000000 ................................ 0001E0

Dump of file SATURN:[PCCOMMON.DUMP.DLL]DA-XPORT.DLL;1 on 18-APR-1990 10:39:21.68
File ID (400,27,0)   End of file block 81 / Allocated 84

Virtual block number 80 (00000050), 512 (0200) bytes

00000000 00000000 00000000 00000000 00000000 00000000 00000000 00000000 ................................ 000000
00000000 00000000 00000000 00000000 00000000 00000000 00000000 00000000 ................................ 000020
041A0000 00000000 00000000 00000000 00000000 00000000 00000000 00000000 ................................ 000040
00000000 058E2216 2214FFFF 220E3C22 22061C26 00000000 0C283024 00000986 Ñ...$0(.....&.."".<."...".".... 000060
65766F20 68636174 73202D0A 0D303030 36520000 3E3E4753 404E3C3C 00000000 ....<<NMSG>>..R6000..- stack ove 000080
64697669 64207265 6765746E 69202D0A 0D333030 36520003 000A0D77 6F6C6672 rflow.....R6003..- integer divid 0000A0
73206867 756F6E65 20746F6E 202D0A0D 38303036 52000800 0A0D3020 79622065 e by 0.....R6008..- not enough s 0000C0
202D0A0D 39303036 52000900 0A0D7374 6E656075 67726120 726F6620 65636170 pace for arguments.....R6009..-  0000E0
746E6560 6E6F7269 766E6520 726F6620 65636170 73206867 756F6E65 20746F6E not enough space for environment 000100
30303652 00020020 726F7272 65206560 69742D6E 757200FF 000A0000 FC000A0D ...*......run-time error ...R600 000120
0A0D6465 64616F6C 20746F6E 20746E69 6F702067 6E697461 6F6C6620 2D0A0032 2..- floating point not loaded.. 000140
6F727265 20746E69 6F702D67 6E697461 6F6C6620 2D0A0D48 54414020 3A00FD00 .».: MATH..- floating-point erro 000160
000A0D30 20796220 65646976 69640067 000A0D64 696C6176 6E690065 00203A72 r: .e.invalid...g.divide by 0... 000180
000A0D77 6F6C6672 65766F20 68636174 73006E00 0A0D776F 6C667265 766F0068 h.overflow...n.stack overflow... 0001A0
00020003 FFFFFF00 0A0D6465 74617265 6E656720 796C7469 63696C70 78650070 p.explicitly generated.......... 0001C0
00000000 00000000 00000000 00061FEE 00020000 00050E00 00020000 00042212 .*.............Ÿ............... 0001E0
```

```
Dump of file SATURN:[PCCOMMON.DUMP.DLL]DA-XPORT.DLL;1 on 18-APR-1990 10:39:21.68
File ID (400,27,0)   End of file block 81 / Allocated 84

Virtual block number 81 (00000051), 512 (0200) bytes

00101400 009000E0 00180001 00000006 00000000 FFFF0001 000E0352 0000011D ....R.....................Å....... 000000
0023000F 80010001 00FD000A 00050000 00000000 00F9FFFF 02580033 00B10025 %.Ý.3.X...*...........».......#. 000020
003F0023 00468002 00080108 00000006 00000000 0000FFFF FFFF0262 00080030 0...b.....................F.#.?. 000040
000C0026 0005000F 80020400 01090002 00030000 00000000 FFFFFFFF 026C0008 ..l..........................&... 000060
0280000C 00260005 00498002 0000010C 00060003 00000000 0000FFFF FFFF0276 v......................I...&..... 000080
FFFF028A 000C0026 0005007F 80020100 01130004 00030000 00000000 FFFFFFFF .........................&....... 0000A0
FFFFFFFF 01580008 00140023 008B8000 00010118 00040005 00000000 0000FFFF ....................#.....X...... 0000C0
6C694600 00000300 6C65646F 60206E6F 69746160 726F666E 69207472 6F707845 Export information model.....Fil 0000E0
00000000 5241562E 00706C65 48006C65 636E6143 0048F00 003A6560 616E2065 e name:..OK.Cancel.Help..VAR.... 000100
00000000 00000000 00000000 00000000 00000000 00000000 00000000 00000000 ................................ 000120
00000000 00000000 00000000 00000000 00000000 00000000 00000000 00000000 ................................ 000140
00000000 00000000 00000000 00000000 00000000 00000000 00000000 00000000 ................................ 000160
00000000 00000000 00000000 00000000 00000000 00000000 00000000 00000000 ................................ 000180
00000000 00000000 00000000 00000000 00000000 00000000 00000000 00000000 ................................ 0001A0
00000000 00000000 00000000 00000000 00000000 00000000 00000000 00000000 ................................ 0001C0
00000000 00000000 00000000 00000000 00000000 00000000 00000000 00000000 ................................ 0001E0

Dump of file SATURN:[PCCOMMON.DUMP.MSG]DAFORM.MSG;1 on 18-APR-1990 10:53:52.42
File ID (965,33,0)   End of file block 1 / Allocated 4

Virtual block number 1 (00000001), 512 (0200) bytes

25000000 00000000 00000000 00000000 01000000 0353454D 00464753 404B4DFF .MKMSGF.MES.....................% 000000
206F7420 64656075 73736120 73692031 25206560 616E2065 68544900 86007300 .s.Ñ.IThe name X1 is assumed to  000020
616E6572 206E6565 62207361 68206863 69687720 2C322520 6F742072 65666572 refer to X2, which has been rena 000040
20312520 6560616E 20656854 490A0D2E 796C676E 696C6472 6F636361 2064656D med accordingly...IThe name X1  000060
68203225 20202E32 25206F74 20726566 6572206F 74206465 60757373 61207369 is assumed to refer to X2.  X2 h 000080
64206F74 2079616B 4F490A00 2E646560 616E6572 206E6565 6220544F 4E207361 as NOT been renamed...IOkay to d 0000A0
00000000 00000000 00000000 00000000 0A000A0D 3F322520 31252065 74656C65 elete X1 X2?.................... 0000C0
00000000 00000000 00000000 00000000 00000000 00000000 00000000 00000000 ................................ 0000E0
00000000 00000000 00000000 00000000 00000000 00000000 00000000 00000000 ................................ 000100
00000000 00000000 00000000 00000000 00000000 00000000 00000000 00000000 ................................ 000120
00000000 00000000 00000000 00000000 00000000 00000000 00000000 00000000 ................................ 000140
00000000 00000000 00000000 00000000 00000000 00000000 00000000 00000000 ................................ 000160
00000000 00000000 00000000 00000000 00000000 00000000 00000000 00000000 ................................ 000180
00000000 00000000 00000000 00000000 00000000 00000000 00000000 00000000 ................................ 0001A0
00000000 00000000 00000000 00000000 00000000 00000000 00000000 00000000 ................................ 0001C0
00000000 00000000 00000000 00000000 00000000 00000000 00000000 00000000 ................................ 0001E0

Dump of file SATURN:[PCCOMMON.DUMP.DLL]DAINDF.TMP;1 on 18-APR-1990 10:41:20.28
File ID (570,8,0)   End of file block 71 / Allocated 72

Virtual block number 1 (00000001), 512 (0200) bytes

00000000 00000040 00000000 000000B8 0000FFFF 00000004 00000040 01BC5A4D MZ¥.a...........i.......a....... 000000
00000080 00000000 00000000 00000000 00000000 00000000 00000000 00000000 ................................ 000020
6F6E6E61 63206061 72676F72 70207369 685421CD 4C01B821 CD09B400 0EBA1F0E ..¤..Ç.ëi|.LëIThis program canno 000040
00000000 00000024 0A0D0D2E 65646F60 20534F44 206E6920 6E757220 65622074 t be run in DOS mode....$....... 000060
000A0009 00000000 00030000 00000000 00068009 55873098 00070533 0505454E NE..3....0.U.................... 000080
00000000 00000000 00010003 00040000 000005BA 0082009E 00940088 00400038 8.a.......ý.¤................... 0000A0
18FE0F00 18FE04C0 000F0F00 000F04BE 12A60F00 12A60380 2E540F00 2E540060 '.T...T...İ...İ./.......å.±...±. 0000C0
00D01EF1 00D00821 02141EF1 021407FF 1C000F21 1A6A0656 03980E21 00000000 ....!...V.j.!.......þ...!.Å.þ.Å. 0000E0
00010000 0046444D 49414406 00080004 00040005 00030005 0A051EB1 0A05082E ....ý.................DAINDF..... 000100
4C414353 4F44084E 49574050 05000474 0404030F 018300F0 00D9002F 00100007 ..../.Ì.Þ.......t...PMWIN.DOSCAL 000120
434F4C42 45455246 4D454D0C 4B434F4C 42434F4C 4C414D45 4D004D45 4D03534C LS.MEM.MEMALLOCBLOCK.MEMFREEBLOC 000140
4C4D4413 4E585450 4F54534C 4D440A4E 58545452 4154534C 4D44086C 6D64034B K.dml.DMLSTARTTXN.DMLSTOPTXN.DML 000160
4C4D440D 49544759 52455551 4C4D440B 454C444E 41484C45 444F4D59 52455551 QUERYMODELHANDLE.DMLQUERYGTI.DML 000180
46544553 4C4D440B 444C4549 46595245 55514C4D 4400544E 554F4359 52455551 QUERYCOUNT.DMLQUERYFIELD.DMLSETF 0001A0
4D440831 4E4C5259 52455551 4C4D440C 4E4C5259 52455551 4C4D440B 444C4549 IELD.DMLQUERYRLN.DMLQUERYRLN1.DM 0001C0
4C4D440E 4B434142 4C4C4F52 4E585450 4F54534C 4D441254 53494C45 4552464C LFREELIST.DMLSTOPTXNROLLBACK.DML 0001E0
```

```
Dump of file SATURN:[PCCOMMON.DUMP.DLL]DAIMDF.TMP;1 on 18-APR-1990 10:41:20.28
File ID (570,8,0)   End of file block 71 / Allocated 72

Virtual block number 2 (00000002), 512 (0200) bytes

 50415441 44585541 59524555 51495447 12495447 034C4C41 5443454C 45534544 DESELECTALL.GTI.GTIQUERYAUXDATAP 000000
 54544145 54414552 43404144 00544E45 45544145 52434041 440C6061 64035254 TR.dam.DAMCREATEENT.DAMCREATEATT 000020
 4C4D4144 0F4D4F44 45544145 52434D41 440C4D49 44455441 4552434D 41440C52 R.DAMCREATEDIM.DAMCREATEDOM.DAML 000040
 454C4544 4D41440D 544E4545 54454C45 44404144 0C544345 4A424F50 55484F4F OOKUPOBJECT.DAMDELETEENT.DAMDELE 000060
 4554454C 45444D41 440E4E49 414D4F44 4554454C 45444D41 440F5254 54414554 TEATTR.DAMDELETEDOMAIN.DAMDELETE 000080
 53494C4D 46440E4D 46440352 5245594E 4154414D 524F464D 41440F4E 45404944 DIMEN.DAMFORMATANYERR.DFM.DFMLIS 0000A0
 45544345 4C45534D 45544959 52455551 5453494C 4D464418 4D455449 44444154 TADDITEM.DFMLISTQUERYITEMSELECTE 0000C0
 5355444C 45494659 52455551 4D464415 4D524F46 53534543 4F52504D 46440E44 D.DFMPROCESSFORM.DFMQUERYFIELDUS 0000E0
 44485952 4555514D 46440F50 41454842 48595245 55514D46 440E4154 41445245 ERDATA.DFMQUERYHBHEAP.DFMQUERYHD 000100
 4C44444E 57485952 4555514D 46440F4D 54485952 4555514D 4644084A 424F4C4D MLOBJ.DFMQUERYHTM.DFMQUERYHWNDDL 000120
 4F545952 4555514D 46440C53 55544154 53544649 48535952 4555514D 46441347 G.DFMQUERYSHIFTSTATUS.DFMQUERYTO 000140
 46524554 53494745 52404644 10415441 44524553 55595245 55514D46 44104C4F OL.DFMQUERYUSERDATA.DFMREGISTERF 000160
 444E414D 4D4F4354 45534D46 440F4E46 45534F4C 43544553 4D464400 444C4549 IELD.DFMSETCLOSEFN.DFMSETCOMMAND 000180
 54414749 56414E54 45534D46 44104E46 4C4F5254 4E4F4354 45534D46 440F4E46 FN.DFMSETCONTROLFN.DFMSETNAVIGAT 0001A0
 54414452 45535554 45534D46 440E4E46 59464954 4F4E5445 53404644 0E4E4645 EFN.DFMSETNOTIFYFN.DFMSETUSERDAT 0001C0
 53534543 4F52504D 4644194D 524F4647 4E4F4C45 54414749 56414E4D 46441341 A.DFMNAVIGATELONGFORM.DFMPROCESS 0001E0

Dump of file SATURN:[PCCOMMON.DUMP.DLL]DAIMDF.TMP;1 on 18-APR-1990 10:41:20.28
File ID (570,8,0)   End of file block 71 / Allocated 72

Virtual block number 3 (00000003), 512 (0200) bytes

 44455453 494C5353 45434F52 50404644 194C4F52 544E4F43 54494445 5453494C LISTEDITCONTROL.DFMPROCESSLISTED 000000
 45544345 4C455358 4F425453 494C5952 4555514D 46441744 4E414D4D 4F435449 ITCOMMAND.DFMQUERYLISTBOXSELECTE 000020
 4F464144 0E4F464E 49524553 5554494E 494D524F 46414412 4D524F46 41440644 D.DAFORM.DAFORMINITUSERINFO.DAFO 000040
 41445055 4A424F0F 5443454C 45535449 4E494A42 4F0D454C 54495454 45534D52 RMSETTITLE.OBJINITSELECT.OBJUPDA 000060
 45445449 4E494A42 4F0B4353 45444554 41445055 4A424F0D 5443454C 45534554 TESELECT.OBJUPDATEDESC.OBJINITDE 000080
 59534C45 444A424F 094E5953 4444414A 424F094E 59535449 4E494A42 4F0A4353 SC.OBJINITSYN.OBJADDSYN.OBJDELSY 0000A0
 4F4E4444 414A424F 0A45544F 4E54494E 494A424F 0B4E5953 5045524A 424F094E N.OBJREPSYN.OBJINITNOTE.OBJADDNO 0000C0
 5F4D524F 46414413 45544F4E 5045524A 424F0A45 544F4E4C 45444A42 4F0A4554 TE.OBJDELNOTE.OBJREPNOTE.DAFORM_ 0000E0
 424D4444 414A424F 0952424D 54494E49 4A424F0A 42415456 415F4554 41455243 CREATE_AVTAB.OBJINITMBR.OBJADDMB 000100
 4C4D4416 54554C4D 44055242 4D504552 4A424F09 3152424D 4C45444A 424F0A52 R.OBJDELMBR1.OBJREPMBR.DMLUT.DML 000120
 45545349 47455254 554C4D44 1052454C 444E414B 59464954 4F4E454B 414D5455 UTMAKENOTIFYHANDLER.DMLUTREGISTE 000140
 4F525054 554C4D44 12455449 52575245 54534947 45525455 4C4D4412 54455352 RSET.DMLUTREGISTERWRITE.DMLUTPRO 000160
 4E554554 414C4552 52455453 49474552 54554C4D 441B5946 49544F4E 53534543 CESSNOTIFY.DMLUTREGISTERRELATEUN 000180
 20322F53 4F260000 27A70301 01455449 5257534F 44084F49 53034554 414C4552 RELATE.SIO.DOSWRITE...]'..&OS/2  0001A0
 726F4620 676E6F4C 206C6564 6F4D206E 6F697461 6D726F66 6D492041 44204D50 PM DA Imformation Model Long For 0001C0
 00000000 00000000 00000000 00000000 01504152 5453544F 4F424D49 0800006D m...IMBOOTSTRAP................. 0001E0

Dump of file SATURN:[PCCOMMON.DUMP.DLL]DAIMDF.TMP;1 on 18-APR-1990 10:41:20.28
File ID (570,8,0)   End of file block 71 / Allocated 72

Virtual block number 4 (00000004), 512 (0200) bytes

 F6E90374 01E47E83 E446890C 468BE246 890A468B D88EFFFF 881E5657 00001EC8 à...WV.¡...Ä.F..Fâ.F..Fõ.-õ.t.õ- 000000
 E9E6468B 0006E903 7500003D E6468900 00FFFF9A 5016E846 8D0E76FF 1076FF00 ..v..v..Fò.P......F|=..u.õ...F|õ 000020
 E6468B00 06E90375 00003DE6 46890000 FFFF9A50 16F2468D 0E76FF10 76FF01DE ß..v..v..F·.P......F|=..u.õ...F| 000040
 890AC483 FFFF263D 9A0E76FF 1076FFE2 76FF5016 FC468D00 63E9E246 8801BDE9 õ§..Fãõc..F=.P.vã.v..v..=&...é.. 000060
 7401F27E 830028E9 0375FE46 08FC468B 0190E9E6 468B0006 E9037500 003DE646 F|=..u.õ...F|õ...F=.F±u.õ(..-·.t 000080
 E6468B00 06E90375 00003DE6 46890000 FFFF9AE8 76FFEA76 FF001CE9 0003E903 .õ..õ...võ.võ......F|=..u.õ...F| 0000A0
 88E90375 00743000 18E90376 FF95E903 7500003D 004BE900 4EE90051 E9015DE9 õ].õQ.õN.õK.=Ä.u.õ..v.õ..=t.u.õ. 0000C0
 7500DA3D FF6DE903 7500053D FFD2E9FF 78E90375 009030FF 80E90375 008630FF .=..u.õ..=..u.õx.õ@.=í.u.õm.=õ.u 0000E0
 1076FF00 45E9E246 8BFFAFE9 FF55E903 7500EA3D FF5DE903 75000F3D FF65E903 .õe.=õ.u.õ].=õ.u.õU.õ£..FãõE..v. 000100
 16F8468D E276FF0E 76FF1076 FF00AAE9 00000142 9A5016F4 468DE276 FF0E76FF .v..vã.F¶.P.B...õ^..v..v..vã.F%. 000120
 E900C1E9 0000B800 84E9F656 89F44689 02578B26 078B26F8 5EC40000 FFFF9A50 P.....é^¼&..&.W..F¶.V-õ..¡..õé.õ 000140
 3DFF9EE9 03750074 3DFFA6E9 03750071 30002BE9 0376FF83 E9037500 D030007B (.=Å.u.õ°.v.õ+.=q.u.õl.=t.u.õ..= 000160
 E9037500 D830FFBF E9FF86E9 037500CE 3DFF8EE9 03750090 3DFF96E9 0375008E ..u.õ..=..u.õ..=ö.u.õ..õe.=Ä.u.õ 000180
 E9037500 DA3DFF9F E9FF66E9 03750005 3DFF6EE9 03750003 300013E9 0376FF7B (.v.õ..=£.u.õn.=í.u.õf.õ..=õ.u.õ 0001A0
 1076FFFF 7CE9FF59 E9037500 EA3DFF4B E9037500 DF3DFF53 E9037500 DD3DFF5B [.=í.u.õS.=õ.u.õK.=õ.u.õY.õ|..v. 0001C0
 F076FF00 00FFFF9A 5016EE46 8D0E76FF 1076FF00 00FFFF9A 5016EC46 8D0E76FF .v..Fî.P......v..v..FŸ.P......vÞ 0001E0
```

```
Dump of file SATURN:[PCCOMMON.DUMP.DLL]DAIMDF.TMP;1 on 18-APR-1990 10:41:20.28
File ID (570,8,0)    End of file block 71 / Allocated 72

Virtual block number 5 (00000005), 512 (0200) bytes

 0000E900 00FFFF9A EC76FFF4 76FFF676 FF0676FF 0876FF0A 76FF0C76 FFEE76FF .vŸ.v..v..v..v..v¬.v¶.v§.....Õ.. 000000
 FF0045E9 EC468BEC 46890A46 8B088E00 08881E56 57000014 C8000CCA C95F5E1F .^_èò..à...WV.|...Ä.F..Fê.FêÖE.. 000020
 468DEC76 FF0E76FF 1076FF00 62E90000 02649A50 16F8468D EC76FF0E 76FF1076 v..v..v§.F½.P.d...Õb..v..v..v§.F 000040
 89E90000 8B003CE9 FA5689F8 46890257 88260788 26FC5EC4 0000012C 9A5016FC ■.P.,...á^■&..&.W..F½.V¹Õ<.|..Õ. 000060
 7700ED3D FFDFE903 7300EB3D FFABE903 7700933D FFEFE903 7300913D 0033E900 .Õ3.=..s.Õÿ.=..w.Õ¨.=§.s.ÕÕ.=Ü.w 000080
 F2468D0E 76FF1076 FFFFC4E9 FF8BE903 77013A3D FFCFE903 73012C3D FFB1E903 .ÕŸ.=,.s.Õü.=:.w.Õ..Õá..v..v..F· 0000A0
 EE468D0E 76FF1076 FF000001 F99A5016 F4468D0E 76FF1076 FF000001 E99A5016 .P.Õ....v..v..F¶.P.¹....v..v..FŸ 0000C0
 FFF876FF FA76FF06 76FF0876 FF0A76FF 0C76FFF4 76FFF676 FF000000 2D9A5016 .P.-....v¬.v¶.v..v..v..v..v¹.v½. 0000E0
 0A76FFD8 8E022FB8 1E565700 0004C800 0CCAC95F 5E1F0000 E90000FF FF9AF276 v·.....Õ...^_èò..àå..WV.|/..Ä.v. 000100
 46890000 FFFF9A06 76FFFF30 B6FFFF32 B6FF0000 02D39A50 16FF3086 8D0876FF .v...0..P.Æ....Ñ2..Ñ0..v.......F 000120
 09E90375 23FF348E 800000FF FF9A5016 FF34868D 406AF876 FFFA76FF FA5689F8 ½.V¹.v¹.v½jə..4..P....../4.#u.Õ. 000140
 8689FFCA 83000000 04C483FF FF00529A 5016FF35 86800009 E900008A 00008800 .|..¤..Õ)...5..P.R....á.....ò... 000160
 B6FFFF32 B6FF001C E90374FF FF76BE83 0026E903 7407FF74 BE83FF76 9689FF74 t...v../t..t.Õ&../v..t.Õ...Ñ2..Ñ 000180
 0026E903 7406FF74 BE830039 E90000FF FF9A0080 685016FF 78868006 76FFFF30 0..v...x..Ph.......Õ9../t..t.Õ&. 0001A0
 FF9A5016 FF78868D 00806806 76FFFF30 B6FFFF32 B6FF001C E90374FF FF76BE83 ./v..t.Õ...Ñ2..Ñ0..v.h....x..P.. 0001C0
 0000FFFF 9A5016FF 2E868008 76FF0A76 FF0054E9 0000BA00 00B80009 E90000FF ...Õ..|..¤..ÕT..v..v......P..... 0001E0

Dump of file SATURN:[PCCOMMON.DUMP.DLL]DAIMDF.TMP;1 on 18-APR-1990 10:41:20.28
File ID (570,8,0)    End of file block 71 / Allocated 72

Virtual block number 6 (00000006), 512 (0200) bytes

 E9037500 0030FF2C 86890AC4 83007A26 309A0876 FF0A76FF 0676FF50 16FC468D .F■.P.v..v..v..=&z..á....,■..u.Õ 000000
 0000FFFF 9A5016FF 78868DFC 76FFFE76 FFFF2E86 FF0018E9 0000BA00 00B80009 ..|..¤..Õ...Ñ...v±.v■..x..P..... 000020
 FF004AE9 03740C08 7E83D88E 0319B81E 56570000 0AC80006 CAC95F5E 1F0000E9 Õ...^_èò..à...WV.|...Ä.-..t.ÕJ.. 000040
 00B9E9F6 46880006 E9037500 0030F646 890000FF FF9A5016 FC468D0E 76FF1076 v..v..F■.P......F-=..u.Õ...F-Õ¿. 000060
 FF9A656A 0E76FF10 76FF0000 E903740C 56390015 E903740A 4639FE56 88FC4688 .F■.V±9F.t.Õ..9V.t.Õ...v..v.je.. 000080
 7500003D F6468900 00FFFF9A 5016F846 8D0E76FF 1076FF00 90E90000 B80000FF ...|..Õ...v..v..F½.P......F-=..u 0000A0
 76FF1677 FF261877 FF26F85E C4000114 47C726F8 5EC4006F E9F64688 0006E903 .Õ...F-Õo.á^½&úG...á^½&.w.&.w..v 0000C0
 0039E9F6 46880006 E9037500 0030F646 890000FF FF9A0676 FF0876FF 0A76FF0C ..v..v..v.......F-=..u.Õ...F-Õ9. 0000E0
 00A1680E 76FF1076 FF000005 219A00A0 680E76FF 1076FF00 001447C7 26F85EC4 á^½&úG....v..v.h...!....v..v.hÀ. 000100
 000CCAC9 5F5E1F00 00E90000 B80000FF FF9A009F 680E76FF 1076FF00 00052F9A ./....v..v.h.......|..Õ...^_èò.. 000120
 9A5016F8 46800A76 FF0C76FF 000107C7 26065EC4 D8BE0452 B81E5657 00000EC8 à...WV.|R..Äá^.&ú....v..v..F½.P. 000140
 9A5016F4 46800A76 FF0C76FF 000002C3 9A5016FC 46800A76 FF0C76FF 0000032A *....v..v..F■.P.û....v..v..F¶.P. 000160
 FFFF9AF4 76FFF676 FFFC76FF 000003FC 9A5016FE 46800A76 FF0C76FF 000004B5 ç....v..v..F±.P.■....v■.v¬.v¶... 000180
 56570000 5AC80008 CAC95F5E 1F0000E9 00008800 00E90375 000030F2 46890000 ...F·=..u.Õ..|..Õ...^_èò..àZ..WV 0001A0
 0005609A 5016AC46 8D0876FF 0A76FF00 00FFFF9A 0876FF0A 76FFD88E 0548881E .¡H..Ä.v..v.........v..v..F¯.P.'.. 0001C0
 02E39A50 16A8468D 0876FF0A 76FF009D E9A64688 0006E903 75000030 A6468900 ..F!■..u.Õ...F!Õ...v..v..F´.P.D. 0001E0

Dump of file SATURN:[PCCOMMON.DUMP.DLL]DAIMDF.TMP;1 on 18-APR-1990 10:41:20.28
File ID (570,8,0)    End of file block 71 / Allocated 72

Virtual block number 7 (00000007), 512 (0200) bytes

 689A5016 FC468D08 76FF0A76 FF007CE9 A6468B00 06E90375 000030A6 46890000 ...F!■..u.Õ...F[Õ]..v..v..F■.P.k 000000
 FC76FFFE 76FFA876 FFAA76FF 005BE9A6 46880006 E9037500 0030A646 89000004 ....F!■..u.Õ...F!Õ[..v˙.v´.v±.v■ 000020
 AE76FF00 32E9A646 880006E9 03750000 30A64689 0000FFFF 9A501680 46802F6A j/.F¯.P......F!■..u.Õ...F!Õ2..v0 000040
 8D0676FF AC76FFAE 76FF0000 FFFF9A00 6A006A4B 6A006A01 43680676 FFAC76FF .v¯.v.hC.j.jKj.j.......v0.v¯.v.. 000060
 05C2B81E 56570000 A6C80006 CAC95F5E 1F0000E9 00008800 00FFFF9A 50168046 F¯.P.....|..Õ...^_èò..à!..WV.¡ò. 000080
 D09A5016 FC468D14 76FF1676 FF000407 C7260E5E C4078926 12468B06 5EC4D88E .Äá^..F.&..á^.&ú....v..v..F■.P.! 0000A0
 FF60868D 1476FF16 76FF01B8 E9FF5E86 880007E9 03750000 30FF5E86 89000005 .....^.=..u.Õ....^.ÕE..v..v...'. 0000C0
 B6FFFF62 B6FF0197 E9FF5E86 880007E9 03750000 30FF5E86 89000005 FE9A5016 .P.±.....^.=..u.Õ....^.Õ...Ñb..Ñ 0000E0
 0171E9FF 5E868800 07E90375 000030FF 5E868900 00FFFF9A 5016FF5A 8680FF60 '...Z..P.......^.=..u.Õ....^.Õg. 000100
 5CB6FFFF 60B6FFFF 62B6FF00 0003DF9A 5016FF64 86804B6A 6E6AFC76 FFFE76FF .v±.v■jnjK..d..P.Õ....Ñb..Ñ'..Ñ\ 000120
 5E868800 07E90375 000030FF 5E868900 0006489A 50168046 8D2F6AFF 5AB6FFFF ..ÑZ.j/.F¯.P.N.....^.=..u.Õ....^ 000140
 880006E9 03740000 3008C483 03730010 9A5016FF 64868050 16804680 0120E9FF .Õ-..F¯.P..d..P...s..á.=..t.Õ..| 000160
 9A505207 B0BA0200 B8019668 2E6A0396 36FF2619 86068E00 6A006A01 0CE90000 ..Õ..j.j.....&.6..j.h..|..¤¯.RP. 000180
 000030FF 5E868900 00FFFF9A 5052FFFF BA020088 FF6086FF FF62B6FF 0000FFFF .....Ñb..Ñ'.|..¤..RP.......^.=.. 0001A0
 B6FF0083 E9FF5E86 88000008 4D9A0A76 FF0C76FF 019668FF 5EB6FF00 19E90375 u.Õ...Ñ^.h...v..v..M.....^.Õ°..Ñ 0001C0
 30FF5E86 890000FF FF9A5016 FF64868D 2F6AFF5A B6FFFF5C B6FFFF60 B6FFFF62 b..Ñ'..Ñ\..ÑZ.j/..d..P.......^.= 0001E0
```

```
Dump of file SATURN:[PCCOMMON.DUMP.DLL]DAIMDF.TMP;1 on 18-APR-1990 10:41:20.28
File ID (570,8,0)   End of file block 71 / Allocated 72

Virtual block number 8'(00000008), 512 (0200) bytes

 76FF1676 FF0076E9 FF5E8688 0000FFFF 9AFF6086 FFFF6286 FF0014E9 03750000 ..u.Ō...Ñb..Ñ'.........^.Ōv..v..v 000000
 FF0019E9 03750000 3DFF5E86 890000FF FF9AFF60 86FFFF62 B6FF0000 05CD9A14 ..ë....Ñb..Ñ'.........^.=..u.Ō... 000020
 A0681476 FF1676FF 0039E9FF 5E868800 00FFFF9A 0A76FF0C 76FF0196 68FF5EB6 Ñ^.h...v..v.........^.Ō9..v..v.h. 000040
 05139A00 9F681476 FF1676FF 0000087E 9A00A168 1476FF16 76FF0000 08709A00 ..p....v..v.hÀ..~....v..v.h..... 000060
 8B1E5657 000062C8 0012CAC9 5F5E1F00 00E9FF5E 86880001 07C7260E 5EC40000 ..á^.&ú.....^.Ō...^_èò..àb..WV.| 000080
 8800006E9 03750000 3DA64689 0000068F 9A5016AC 46800876 FF0A76FF D88E069E ...Ä.v..v..F¯.P.¢....Fl=..u.Ō... 0000A0
 0006E903 7500003D A6468900 0006E39A 5016A846 800876FF 0A76FF01 3EE9A646 FlŌ>..v..v..F´.P.D....Fl=..u.Ō.. 0000C0
 06E90375 000030A6 46890000 07099A50 16A2468D A876FFAA 76FF011D E9A64688 .FlŌ...v^.v´.FÅ.P......Fl=..u.Ō. 0000E0
 890000FF FF9A5016 9E468D18 6AA276FF A476FFA8 76FFAA76 FF00FCE9 A6468800 ..FlŌ=..v^.v^.vÊ.vÅj..F..P...... 000100
 4B6A006A 01436800 CE68AC76 FFAE76FF 00D3E9A6 46880006 E9037500 0030A646 Fl=..u.Ō...FlŌ«..vÛ.v¯hö.hC.j.jK 000120
 26805EC4 04B04683 0004E9B2 5689B046 89A05688 9E468800 0006729A 006A006A j.j..r....F..V..F¯.VÿŌ...F¯.á^¯& 000140
 B4468002 6A37FF26 0277FF26 805EC4A8 76FFAA76 FF0081E9 03750247 08260788 ..&.G.u.Ō...v^.v´á^¯&.w.&.7j..FÇ 000160
 DF9A9E76 FFA076FF A876FFAA 76FF0017 E9037500 0030A646 89000007 4D9A5016 .P.M....Fl=..u.Ō...v^.v´.v..v..Ō 000180
 260277FF 26805EC4 5016B446 80005868 1EAC76FF AE76FF00 5AE9A646 88000009 ....FlŌZ..vÛ.v¯.hX..FÇ.Pá^¯&.w.& 0001A0
 F99A9E76 FFA076FF A876FFAA 76FF0017 E9037500 0030A646 890000FF FF9A37FF .7......Fl=..u.Ō...v^.v´.v..v..' 0001C0
 00008800 00FFFF9A 9E76FFA0 76FFA876 FFAA76FF FF6CE900 1AE9A646 88000009 ....FlŌ..Ōl..v¯.v´.v..v......|.. 0001E0

Dump of file SATURN:[PCCOMMON.DUMP.DLL]DAIMDF.TMP;1 on 18-APR-1990 10:41:20.28
File ID (570,8,0)   End of file block 71 / Allocated 72

Virtual block number 9 (00000009), 512 (0200) bytes

 5EC400CE 07C72606 5EC4088E 08A0881E 56570000 5AC80006 CAC95F5E 1F0000E9 Ō...^_èò..àZ..WV.|...Äá^.&ú.ö.á^ 000000
 06E90375 00003DAA 46890000 08809A50 16FC468D 1476FF16 76FF0004 07C7260E .&ú.¯..v..v..F=.P.¯.....F¯=..u.Ō. 000020
 E9037500 003DAA46 89000006 1F9A5016 A6468D14 76FF1676 FF01B4E9 AA468800 ..F¯ŌÇ..v..v..Fl.P......F¯=..u.Ō 000040
 03750000 3DAA4689 000008D1 9A5016AC 468D1476 FF1676FF 0193E9AA 46880006 ...F¯Ō...v..v..F¯.P.1....F¯=..u. 000060
 8D000007 319A5016 B0468D48 6A005A36 FFFC76FF FE76FF01 72E9AA46 880006E9 Ō...F¯Ōr..v±.v=.6Z.jK.F¯.P.1.... 000080
 9636FF26 1986068E 006A006A 010FE903 7500003D 04C48307 72003A9A 5016B046 F¯.P.:.r..á.=..u.Ō..j.j.....&.6. 0000A0
 5207988A 020088AC 76FFAE76 FF000007 A09A5052 0AD0BA02 00B80196 68216A03 .j!h..|..¤!.RP......vÛ.v¯|..¤..R 0000C0
 08459A0A 76FF0C76 FF019668 AA76FF00 1AE90375 00003DAA 46890000 07B59A50 P.ç....F¯=..u.Ō...v¯h...v..v..E. 0000E0
 FFFF9A00 6A5016B0 468D5016 A6468DAC 76FFAE76 FF00B8E9 00F3E9AA 46880000 ...F¯Ō±.Ō|..vÛ.v¯.Fl.P.F¯.Pj.... 000100
 76FF0196 68AA76FF 0000087B 9AAC76FF AE76FF00 22E90375 00003DAA 46890000 ...F¯=..u.Ō"..vÛ.v¯.(....v¯h...v 000120
 76FF5016 B0468D00 58681EFC 76FFFE76 FF00ACE9 AA468800 00088C9A 0A76FF0C ..v.......F¯Ō¯..v±.v=.hX..F¯.P.v 000140
 FF000008 109AAC76 FFAE76FF 0022E903 7500003D AA468900 0009C39A A676FFA8 ´.vl.ú....F¯=..u.Ō"..vÛ.v¯...... 000160
 00082F9A AC76FFAE 76FF0065 E9AA4688 000008B9 9A0A76FF 0C76FF01 9668AA76 v¯h...v..v..¿....F¯Ōe..vÛ.v¯./.. 000180
 AA468800 0007D39A 0A76FF0C 76FF0196 68AA76FF 0017E903 7500003D AA468900 ..F¯=..u.Ō...v¯h...v..v..£....F¯ 0001A0
 681476FF 1676FF00 0008E39A 00A06814 76FF1676 FF000307 C7260E5E C40038E9 Ō8.á^.&ú....v..v.h...D....v..v.h 0001C0
 CAC95F5E 1F0000E9 AA468800 0008629A 009F6814 76FF1676 FF00000B F19A00A1 À..þ....v..v.h...b....F¯Ō...^_èò 0001E0

Dump of file SATURN:[PCCOMMON.DUMP.DLL]DAIMDF.TMP;1 on 18-APR-1990 10:41:20.28
File ID (570,8,0)   End of file block 71 / Allocated 72

Virtual block number 10 (0000000A), 512 (0200) bytes

 FF078926 12468806 5EC40004 07C7260E 5EC4088E 0A12881E 56570000 02C80012 ..à...WV.|...Äá^.&ú...á^..F.&... 000000
 1121999A 1476FF16 76FFA5F2 00088907 16FC8800 588E16EC 83026A0A 76FF0C76 v..v.j..&./fX..=..¿...·Ê.v..v...|. 000020
 1676FF00 0107C726 0E5EC400 38E9FE46 880006E9 03750000 3DFE4689 20C48304 ..á .F±=..u.Ō...F±Ō8.á^.&ú....v. 000040
 681476FF 1676FF00 000C839A 00A16814 76FF1676 FF00000C 759A00A0 681476FF .v.h...u....v..v.hÀ........v..v.h 000060
 D88E0C0A 881E5657 00000EC8 0012CAC9 5F5E1F00 00E9FE46 8800000B D59A009F ...f.....F±Ō...^_èò..à...WV.|...Ä 000080
 16EC8302 6A5016F2 468D0A76 FF0C76FF 000207C7 260E5EC4 00CE07C7 26065EC4 á^.&ú.ö.á^.&ú....v..v..F·.Pj..&. 0000A0
 000030F6 468924C4 830C3F1F E79A1476 FF1676FF A5F20008 890716FC 8800588E fX..=..¿...·Ê.v..v..Ó.?..á$.F-=.. 0000C0
 0030F646 8900000A 749A5016 F8468D14 76FF1676 FF013CE9 F6468800 06E90375 u.Ō...F-Ō<..v..v..F½.P.t....F-=. 0000E0
 30F64689 00000A32 9A5016FC 46801476 FF1676FF 011BE9F6 46880006 E9037500 .u.Ō...F-Ō...v..v..F=.P.2....F-= 000100
 88019668 236A0396 36FF2619 86068E00 6A006A00 FAE9F646 880006E9 03750000 ..u.Ō...F-Ō'.j.j.....&.6..j#h..| 000120
 8900000A E29A5052 0ACA8A02 0088F876 FFFA76FF 00000ACF 9A505200 568A0200 ..¤V.RP.Ù....v'.v½j..¤ò.RP.ã.... 000140
 A6E9F646 8800000D 889A0A76 FF0C76FF 019668F6 76FF001A E9037500 003DF646 F-=..u.Ō...v-h...v..v..|....F-Ōl 000160
 0022E903 7500003D F6468900 00FFFF9A F276FFF4 76FFF876 FFFA76FF 0068E900 .Ōk..v'.v½.v¶.v·.......F-=..u.Ō". 000180
 E9F64688 000000E5 9A0A76FF 0C76FF01 9668F676 FF00000B 349AF876 FFFA76FF .v'.v½.4....v-h...v..v..í....F-Ō 0001A0
 76FF0196 68F676FF 0017E903 7500003D F6468900 0008909A F876FFFA 76FF0065 e..v'.v½......F-=..u.Ō...v-h...v 0001C0
 00A06814 76FF1676 FF000107 C7260E5E C40038E9 F6468800 000AFE9A 0A76FF0C ..v..±....F-Ō8.á^.&ú....v..v.h.. 0001E0
```

```
Dump of file SATURN:[PCCOMMON.DUMP.DLL]DAIMDF.TMP;1 on 18-APR-1990 10:41:20.28
File ID (570,8,0)   End of file block 71 / Allocated 72

Virtual block number 11 (0000000B), 512 (0200) bytes

 000C679A 009F6814 76FF1676 FF00000E 1D9A00A1 681476FF 1676FF00 000E0F9A ......v..v.hÀ.......v..v.h...g.. 000000
 0876FF0A 76FFD88E 0C9CB81E 56570000 62C80012 CAC95F5E 1F0000E9 F6468800 ..F-Õ...^_èò..àb..WV.|...Ä.v..v. 000020
 76FF0A76 FF013EE9 A2468800 06E90375 00003DA2 46890000 0D189A50 16F84680 .F½.P.....FÂ=..u.Õ...FÂÕ>..v..v 000040
 FFA676FF 0110E9A2 46880006 E9037500 0030A246 8900000C F79A5016 A4468D08 ..FÈ.P.%....FÂ=..u.Õ...FÂÕ...vÌ. 000060
 A676FF00 FCE9A246 880006E9 03750000 30A24689 000008F2 9A50169E 468DA476 vÈ.F..P.·....FÂ=..u.Õ...FÂÕ=..vÌ 000080
 0006E903 7500003D A2468900 000918 9A 5016FC46 8D136A9E 76FFA076 FFA476FF .vÈ.v..v.j..F=.P......FÂ=..u.Õ.. 0000A0
 88000009 459A006A 006A4B6A 006A0143 68000368 F876FFFA 76FF00D3 E9A2468B .FÂÕ£..vª.v½h£.hC.j.jKj.j..E.... 0000C0
 81E90375 02470B26 078B26A8 5EC404A8 46830004 E9AA5689 A84689FE 568BFC46 F=.V±.F´.V¨Õ...F´.á^´&..&.G.u.Õ. 0000E0
 A2468900 0009839A 5016AC46 8D026A37 FF260277 FF26A85E C4A476FF A676FF00 ..vÌ.vÈá^´&.w.&.7j..F¯.P......FÂ 000100
 FF005AE9 A2468800 000F759A FC76FFFE 76FFA476 FFA676FF 0017E903 7500003D =..u.Õ...vÌ.vÈ.v±.v=.u....FÂÕZ.. 000120
 A2468900 0008659A 37FF2602 77FF26A8 5EC45016 AC468D00 6E681EF8 76FFFA76 vª.v½.hn..F¯.Pá^´&.w.&.7.e....FÂ 000140
 E9001AE9 A2468800 000F8F9A FC76FFFE 76FFA476 FFA676FF 0017E903 7500003D =..u.Õ...vÌ.vÈ.v±.v=......FÂÕ..Õ 000160
 0006CAC9 5F5E1F00 00E90000 88000009 9F9AFC76 FFFE76FF A476FFA6 76FFFF6C Ì..vÌ.vÈ.v±.v=.....|..Õ...^_èò.. 000180
 FF1676FF 000407C7 260E5EC4 000307C7 26065EC4 D88E0E36 881E5657 00005EC8 à^..WV.¡6..Äá^.&ú.£.á^.&ú....v.. 0001A0
 1676FF01 C1E9A246 880006E9 03750000 30A24689 00000E46 9A5016FC 468D1476 v..F=.P.F....FÂ=..u.Õ...FÂÕè..v. 0001C0
 76FF01A0 E9A2468B 0006E903 7500003D A2468900 000A539A 5016F846 8D1476FF .v..F½.P.S....FÂ=..u.Õ...FÂÕ...v 0001E0

Dump of file SATURN:[PCCOMMON.DUMP.DLL]DAIMDF.TMP;1 on 18-APR-1990 10:41:20.28
File ID (570,8,0)   End of file block 71 / Allocated 72

Virtual block number 12 (0000000C), 512 (0200) bytes

 FF017FE9 A2468B00 06E90375 00003DA2 46890000 0E679A50 16F04680 1476FF16 ..v..Fþ.P.g....FÂ=..u.Õ...FÂÕ... 000000
 830AA700 3A9A5016 A4468D00 000A9B9A 5016A446 8D486A00 7036FFFC 76FFFE76 v±.v=.6p.jK.FÈ.P......FÈ.P.:.Ì.. 000020
 8A02008B 01966824 6A039636 FF261986 068E006A 006A011C E9037500 003004C4 á.=..u.Õ..j.j.....&.6..j$h..|..¤ 000040
 30A24689 0000058B 9A505200 438A0200 8BF076FF F276FF00 0000489A 50521073 s.RP.H....v·.vþ|..¤C.RP.[....FÂ= 000060
 C5E90100 E9A2468B 000010E8 9A0A76FF 0C76FF01 9668A276 FF001AE9 03750000 ..u.Õ...vÂh...v..v..Ò....FÂÕ..Õé 000080
 006A5016 F4468D50 16A4468D 5016F846 8D006A00 6A006A00 6AF076FF F276FF00 ..v·.vþj.j.j.j..F½.P.FÈ.P.F¶.Pj. 0000A0
 9668A276 FF000011 1E9AF076 FFF276FF 0022E903 7500003D A2468900 00FFFF9A ......FÂ=..u.Õ"..v·.vþ......vÂh. 0000C0
 16A4468D 006E681E FC76FFFE 76FF00AC E9A2468B 0000112F 9A0A76FF 0C76FF01 ..v..v../....FÂÕ¯..v±.v=.hn..FÈ. 0000E0
 0DA79AF0 76FFF276 FF0022E9 03750000 3DA24689 00000F59 9AF876FF FA76FF50 P.vª.v½.Y....FÂ=..u.Õ"..v·.vþ.Ì. 000100
 9AF076FF F276FF00 65E9A246 88000011 5C9A0A76 FF0C76FF 019668A2 76FF0000 ...vÂh...v..v..\....FÂÕe..v·.vþ. 000120
 00000D77 9A0A76FF 0C76FF01 9668A276 FF0017E9 03750000 3DA24689 000000C9 è....FÂ=..u.Õ...vÂh...v..v..w... 000140
 FF1676FF 00001186 9A00A068 1476FF16 76FF0003 07C7260E 5EC40038 E9A2468B .FÂÕ8.á^.&ú....v..v.h.......v.. 000160
 5E1F0000 E9A2468B 00000E01 9A009F68 1476FF16 76FF0000 11949A00 A1681476 v.hÀ.......v..v.h........FÂÕ...^ 000180
 2612468B 065EC400 0407C726 0E5EC4D8 8E0FA888 1E565700 0002C800 12CAC95F _èò..à...WV.|´..Äá^.&ú...á^..F.& 0001A0
 9A1476FF 1676FFA5 F20008B9 0716FC8B 006E8E16 EC83056A 0A76FF0C 76FF0789 ...v..v.j..$.ƒn..=..¿..·E.v..v.. 0001C0
 000107C7 260E5EC4 0038E9FE 46880006 E9037500 003DFE46 8920C483 0CD52199 .Ìí..á .F±=..u.Õ...F±Õ8.á^.&ú... 0001E0

Dump of file SATURN:[PCCOMMON.DUMP.DLL]DAIMDF.TMP;1 on 18-APR-1990 10:41:20.28
File ID (570,8,0)   End of file block 71 / Allocated 72

Virtual block number 13 (0000000D), 512 (0200) bytes

 FF1676FF 00001226 9A00A168 1476FF16 76FF0000 12189A00 A0681476 FF1676FF .v..v.h........v..v.hÀ..&....v.. 000000
 AD881E56 57000014 C80012CA C95F5E1F 0000E9FE 46880000 11789A00 9F681476 v.h...x....F±Õ...^_èò..à...WV.¡Ù 000020
 468D0A76 FF0C76FF 000307C7 26065EC4 000207C7 260E5EC4 0000FA46 C7D88E11 ..ÄúFª..á^.&ú...á^.&ú.£..v..v..F 000040
 8311E21F E79A1476 FF1676FF A5F2000B 890716FC 88006E8E 16EC8305 6A5016F2 ·.Pj..$./n..=..¿..·E.v..v..Ó.ä.. 000060
 0A9A5016 EE468D14 76FF1676 FF01B1E9 EC468800 06E90375 000030EC 468924C4 á$.F$=..u.Õ...F$ÕŸ..v..v..FŸ.P.. 000080
 9A5016F6 468D1476 FF1676FF 0190E9EC 46880006 E9037500 003DEC46 89000010 ....F$=..u.Õ...F$Õ...v..v..F-.P. 0000A0
 76FFF476 FFEE76FF F076FF01 6FE9EC46 880006E9 03750000 3DEC4689 00000FC8 à....F$=..u.Õ...F$Õo..vþ.vŸ.v¶.v 0000C0
 7E830146 E9EC468B 0006E903 7500003D EC468900 00FFFF9A 5016FC46 8D086AF2 ·j..F=.P......F$=..u.Õ...F$ÕF..- 0000E0
 068E006A 006A0001 FA46C700 05E90377 00FC7E83 0009E903 7E0013E9 037D00FE ±.}.Õ..-.Õ...-=.w.Õ..úFª..j.j... 000100
 88EE76FF F076FF00 0010659A 50521343 8A02008B 01966826 6A039636 FF261986 ..&.6..j&h..|..¤C.RP.e....vþ.vŸ| 000120
 0C76FF01 9668EC76 FF001AE9 03750000 3DEC4689 00001078 9A505210 608A0200 ..¤'.RP.x....F$=..u.Õ...v$h...v. 000140
 FFFF9AF2 76FFF476 FFEE76FF F076FF00 68E90006 E9EC468B 000013A5 9A0A76FF .v..È....F$Õ=.Õk..vþ.vŸ.v¶.v·... 000160
 76FF0196 68EC76FF 000010D7 9AEE76FF F076FF00 22E90375 000030EC 46890000 ...F$=..u.Õ"..vþ.vŸ.=....v$h...v 000180
 000030EC 46890000 11409AEE 76FFF076 FF0095E9 EC468800 0010949A 0A76FF0C ..v.......F$Õ...vþ.vŸ.a....F$=.. 0001A0
 260E5EC4 0068E9EC 46880000 13649A0A 76FF0C76 FF019668 EC76FF00 17E90375 u.Õ...v$h...v..v..d....F$Õh.á^.& 0001C0
 0000140A 9A00A168 1476FF16 76FF0000 13FC9A00 A0681476 FF1676FF 000107C7 ú....v..v.h...=....v..v.hÀ...... 0001E0
```

Dump of file SATURN:[PCCOMMON.DUMP.DLL]DAIMDF.TMP;1 on 18-APR-1990 10:41:20.28
File ID (570,8,0)   End of file block 71 / Allocated 72

Virtual block number 14 (0000000E), 512 (0200) bytes

```
000568F6 76FFF876 FF0027E9 037401FA 7E830000 120A9A00 9F681476 FF1676FF .v..v.h........~*.t.Ö'..v½.v~hf. 000000
4688127D 0E2E9A00 D5681476 FF1676FF 00000ED8 9A006A00 6A006A00 6A016E68 hn.j.j.j.j..Ü....v..v.hf....)..F 000020
F8468D08 76FF0A76 FFD88E12 3F881E56 57000062 C80012CA C95F5E1F 0000E9EC ªÕ...^_èò..àb..WV.¡?..Ä.v..v..F½ 000040
468D0876 FF0A76FF 013EE9F2 46880006 E9037500 003DF246 89000012 C09A5016 .P.&....F·=..u.Õ...F·Õ>..v..v..F 000060
8DF476FF F676FF01 1DE9F246 880006E9 03750000 3DF24689 0000129F 9A5016F4 ¶.P......F·=..u.Õ...F·Õ...v~.v¶. 000080
F476FFF6 76FF00FC E9F24688 0006E903 7500003D F2468900 000E889A 50169E46 F..P......F·=..u.Õ...F·Õ=..v~.v¶ 0000A0
F2468800 06E90375 00003DF2 46890000 0EB19A50 16FC468D 176A9E76 FFA076FF .v..v.j..F=.P.Ý....F·=..u.Õ...F· 0000C0
88FC4688 0000142C 9A006A00 6A4B6A00 6A014368 00D868F8 76FFFA76 FF0003E9 ÕÆ..v*.v%hÄ.hC.j.jKj.j.......F=. 0000E0
76FF0081 E9037502 47082607 8826A25E C404A246 830004E9 A45689A2 4689FE56 V±.FÅ.VÉÕ...FÅ.á^ÄÆ..&.G.u.Õ...v 000100
00003DF2 46890000 0F199A50 16A6468D 026A37FF 260277FF 26A25EC4 F476FFF6 ~.v¶á^ÄÆ.w.&.7j..Fl.P......F·=.. 000120
FFFA76FF 005AE9F2 46880000 15929AFC 76FFFE76 FFF476FF F676FF00 17E90375 u.Õ...v~.v¶.v±.v=......F·ÖZ..v*. 000140
00003DF2 46890000 11089A37 FF260277 FF26A25E C45016A6 468D0084 681EF876 v½.h...Fl.Pá^ÄÆ.w.&.7......F·=.. 000160
FFFF6CE9 001AE9F2 46880000 15AC9AFC 76FFFE76 FFF476FF F676FF00 17E90375 u.Õ...v~.v¶.v±.v=.¯....F·Õ..Õl.. 000180
005EC800 06CAC95F 5E1F0000 E90000B8 00000F35 9AFC76FF FE76FFF4 76FFF676 v~.v¶.v±.v=.5...¡..Õ...^_èò..à^. 0001A0
8D1476FF 1676FF00 0407C726-0E5EC400 D807C726 065EC408 8E145388 1E565700 .WV.¡S..Äá^.&ú.Ä.á^.&ú.¯..v..v.. 0001C0
1476FF16 76FF01C5 E9F24688 0006E903 7500003D F2468900 0014639A 5016FC46 F=.P.c....F·=..u.Õ...F·Õé..v..v. 0001E0
```

Dump of file SATURN:[PCCOMMON.DUMP.DLL]DAIMDF.TMP;1 on 18-APR-1990 10:41:20.28
File ID (570,8,0)   End of file block 71 / Allocated 72

Virtual block number 15 (0000000F), 512 (0200) bytes

```
76FF1676 FF01A4E9 F2468800 06E90375 00003DF2 46890000 14849A50 16F4468D .F¶.P......F·=..u.Õ...F·ÕE..v..v 000000
FFFE76FF 0183E9F2 46880006 E9037500 003DF246 8900000F E99A5016 EE468D14 ..FŸ.P.Õ....F·=..u.Õ...F·Õ...v±. 000020
3D04C483 1030003A 9A5016A2 468D0000 10319A50 16A2468D 4B6A0086 36FFFC76 v=.6..jK.FÅ.P.1....FÅ.P.:.=..á.= 000040
5216908A 02008801 9668276A 039636FF 26198606 8E006A00 6A0120E9 03750000 ..u.Õ .j.j.....&.6..j'h..¡..¤..R 000060
7500003D F2468900 0013489A 50521330 BA020088 F476FFF6 76FF0000 13359A50 P.5....v~.v¶¡..¤0.RP.H....F·=..u 000080
76FF00C9 E90104E9 F2468800 0016FE9A 0A76FF0C 76FF0196 68F276FF 001AE903 .Õ...v·h...v..v..±....F·Õ..Õè..v 0000A0
003DF246 890000FF FF9A006A 5016A246 805016F8 468DEE76 FFF076FF F476FFF6 ~.v¶.vÞ.vŸ.F½.P.FÅ.Pj.......F·=. 0000C0
13D29A0A 76FF0C76 FF019668 F276FF00 0013949A F476FFF6 76FF0022 E9037500 .u.Õ"..v~.v¶......v·h...v..v..@. 0000E0
15769AF8 76FFFA76 FF5016A2 468D0084 681EFC76 FFFE76FF 0087E9F2 46880000 ...F·Õñ..v±.v=.h...FÅ.P.v*.v½.v. 000100
76FF0196 68F276FF 0000176C 9AF476FF F676FF00 22E90375 00003DF2 46890000 ...F·=..u.Õ"..v~.v¶.l....v·h...v 000120
00003DF2 46890000 13B69AF4 76FFF676 FF0070E9 F2468800 00177D9A 0A76FF0C ..v..)....F·Õp..v~.v¶.Ñ....F·=.. 000140
0016819A 0A76FF0C 76FF0196 68F276FF 000016ED 9AF476FF F676FF00 22E90375 u.Õ"..v~.v¶.Ú....v·h...v..v..Ý.. 000160
1676FF00 0017A79A 00A06814 76FF1676 FF000307 C7260E5E C40038E9 F2468800 ..F·Õ8.á^.&ú....v..v.h...Ï....v. 000180
1F0000E9 F2468800 0013EE9A 009F6814 76FF1676 FF000017 B59A00A1 681476FF .v.hÀ..ç....v..v.h...Ÿ....F·Õ... 0001A0
12468806 5EC40004 07C7260E 5EC4D88E 15C5B81E 56570000 02C80012 CAC95F5E ^_èò..à...WV.¡é..Äá^.&ú...á^..F. 0001C0
1476FF16 76FFA5F2 00088907 16FC8800 84BE16EC 83076A0A 76FF0C76 FF078926 &¯...v..v.j..š.ƒ...=..¿...·Ê.v..v. 0001E0
```

Dump of file SATURN:[PCCOMMON.DUMP.DLL]DAIMDF.TMP;1 on 18-APR-1990 10:41:20.28
File ID (570,8,0)   End of file block 71 / Allocated 72

Virtual block number 16 (00000010), 512 (0200) bytes

```
0107C726 0E5EC400 38E9FE46 880006E9 03750000 3DFE4689 20C48314 3C21999A ..!<..á .F±=..u.Õ...F±Õ8.á^.&ú.. 000000
1676FF00 0018479A 00A16814 76FF1676 FF000018 399A00A0 681476FF 1676FF00 ..v..v.h...9....v..v.hÀ..G....v. 000020
881E5657 000014C8 0012CAC9 5F5E1F00 00E9FE46 88000017 999A009F 681476FF .v.h........F±Õ...^_èò..à...WV.¡ 000040
8D0A76FF 0C76FF00 D8070726 065EC400 0207C726 0E5EC400 00FA46C7 D88E17CE õ..ÄúF*..á^.&ú...á^¯.&ú.Ä..v..v.. 000060
18031FE7 9A1476FF 1676FFA5 F20008B9 0716FC88 0084BE16 EC83076A 5016F246 F·.Pj..š.ƒ...=..¿..·Ê.v..v..Õ... 000080
9A5016EE 468D1476 FF1676FF 01AEE9EC 46880006 E9037500 0030EC46 8924C483 .á$.Fš=..u.Õ...FšÕÕ..v..v..FŸ.P. 0000A0
5016F646 8D1476FF 1676FF01 8DE9EC46 880006E9 03750000 3DEC4689 00001606 .....Fš=..u.Õ...FšÕ...v..v..F~.P 0000C0
FFF476FF EE76FFF0 76FF016C E9EC4688 0006E903 7500003D EC468900 0015E59A .Ï....Fš=..u.Õ...FšÕl..vÞ.vŸ.v¶. 0000E0
830143E9 EC468800 06E90375 00003DEC 46890000 12E99A50 16FC4680 136AF276 v·j..F=.P.Õ....Fš=..u.Õ...FšÕC.. 000100
8E006A00 6A0001FA 46C70005 E9037700 FC7E8300 09E9037E 0013E903 7000FE7E ~±.).Õ..-.Õ...~=.w.Õ..úF*..j.j.. 000120
EE76FFF0 76FF0000 16829A50 5219648A 02008801 9668296A 039636FF 26198606 ...&.6..j)h..¡..¤d.RP......vÞ.vŸ 000140
76FF0196 68EC76FF 0017E903 7500003D EC468900 0016959A 5052167D BA020088 ¡..¤).RP......Fš=..u.Õ...všh...v 000160
0000FFFF 9AF276FF F476FFEE 76FFF076 FF0003E9 EC468800 0019C39A 0A76FF0C ..v..û....FšÕÆ..vÞ.vŸ.v¶.v·..... 000180
FF0C76FF 019668EC 76FF0000 17349AEE 76FFF076 FF0022E9 03750000 3DEC4689 .Fš=..u.Õ"..vÞ.vŸ.4....všh...v.. 0001A0
03750000 3DEC4689 00001756 9AEE76FF F076FF00 95E9EC46 88000019 F09A0A76 v..Þ....FšÕ...vÞ.vŸ.V....Fš=..u. 0001C0
07C7260E 5EC40068 E9EC4688 00001745 9A0A76FF 0C76FF01 9668EC76 FF0017E9 Õ...všh...v..v..E....FšÕh.á^.&ú. 0001E0
```

```
Dump of file SATURN:[PCCOMMON.DUMP.DLL]DAIMDF.TMP;1 on 18-APR-1990 10:41:20.28
File ID (570,8,0)   End of file block 71 / Allocated 72

Virtual block number 17 (00000011), 512 (0200) bytes

76FF0000 1A289A00 A1681476 FF1676FF 0000182B 9A00A068 1476FF16 76FF0001 ...v..v.h...+....v..v.hÀ..(....v 000000
6E68000A 68F676FF F876FF00 27E90374 01FA7E83 00001A0C 9A009F68 1476FF16 ..v.h........-*.t.Ö'..v½.v-hÖ.hn 000020
E9EC468B 189E1448 9A00DA6B 1476FF16 76FF0000 14F89A00 6A006A00 6A006A01 .j.j.j.j..½....v..v.hÖ..K....F‡Ö 000040
5016AC46 8D0876FF 0A76FFD8 8E18608B 1E565700 0062C800 12CAC95F 5E1F0000 ...^_èò..àb..WV.|'..Ä.v..v..F¯.P 000060
16A8468D 0876FF0A 76FF013E E9A2468B 0006E903 75000030 A2468900 0018E19A .Ä....FÅ=..u.Ö...FÅÖ>..v..v..F´. 000080
9E468DA8 76FFAA76 FF011DE9 A2468B00 06E90375 000030A2 46890000 18C09A50 P.à....FÅ=..u.Ö...FÅÖ...v¯.v¯.F. 0000A0
76FFA876 FFAA76FF 00FCE9A2 46880006 E9037500 0030A246 89000014 A59A5016 .P.È....FÅ=..u.Ö...FÅÖ•..v¯.v´.v 0000C0
D3E9A246 8B0006E9 03750000 30A24689 000014CE 9A5016FC 468D166A 9E76FFA0 ..v.j..F=.P.ö....FÅ=..u.Ö...FÅÖÆ 0000E0
FE5688FC 46880000 1A4A9A00 6A006A4B 6A006A01 43680000 68AC76FF AE76FF00 ..vÖ.v¯hÏ.hC.j.jKj.j..J....F=.V± 000100
FFAA76FF 0081E903 7502470B 26078826 A45EC404 A4468300 04E9A656 89A44689 .FÈ.VÏÖ...FÈ.á^È£..&.G.u.Ö...v´. 000120
03750000 3DA24689 00001536 9A501680 468D026A 37FF2602 77FF26A4 5EC4A876 v´á^È£.w.&.7j..F_.P.6....FÅ=..u. 000140
AC76FFAE 76FF005A E9A2468B 00001880 9AFC76FF FE76FFA8 76FFAA76 FF0017E9 Ö...v¯.v´.v±.v=.¯....FÅÖZ..vÖ.v¯ 000160
03750000 3DA24689 0000171E 9A37FF26 0277FF26 A45EC450 16804680 009A681E .h...F¯.Pá^È£.w.&.7......FÅ=..u. 000180
AA76FFFF 6CE9001A E9A2468B 00001BCA 9AFC76FF FE76FFA8 76FFAA76 FF0017E9 Ö...v¯.v´.v±.v=.ò....FÅÖ..Öl..v´ 0001A0
5700005A C80006CA C95F5E1F D000E900 00880000 15529AFC 76FFFE76 FFA876FF .v´.v±.v=.R...|..Ö...^_èò..àZ..W 0001C0
FC468D14 76FF1676 FF000D07 C726065E C4000407 C7260E5E C4D88E1A 71881E56 V.|q..Äá^.&ú...á^.&ú.Ï..v..v..F= 0001E0

Dump of file SATURN:[PCCOMMON.DUMP.DLL]DAIMDF.TMP;1 on 18-APR-1990 10:41:20.28
File ID (570,8,0)   End of file block.71 / Allocated 72

Virtual block number 18 (00000012), 512 (0200) bytes

468D1476 FF1676FF 0193E9A6 46880006 E9037500 0030A646 8900001A 819A5016 .P......F|=..u.Ö...F|Ö...v..v..F 000000
FFFC76FF FE76FF01 72E9A646 8B0006E9 03750000 30A64689 00001AA2 9A5016A8 ´.P.Å....F|=..u.Ö...F|Ör..v±.v=. 000020
75000030 04C48316 5A003A9A 5016AC46 80000016 4E9A5016 AC468D4B 6A009C36 6..jK.F¯.P.N....F¯.P.:.Z..á.=..u 000040
569A5052 1C8DBA02 00880196 682A6A03 9636FF26 1986068E 006A006A 010FE903 .Ö..j.j.....&.6..j*h..|..¤..RP.V 000060
1AE90375 00003DA6 46890000 19699A50 5219518A 020088A8 76FFAA76 FF000019 ....v´.v´|..¤Ω.RP.Ï....F|=..u.Ö. 000080
76FFAA76 FF0088E9 00F3E9A6 46880000 1CF59A0A 76FF0C76 FF019668 A676FF00 ..vÏh...v..v..%....F|Ö¤.Ö|..v´.v 0000A0
AA76FF00 22E90375 000030A6 46890000 FFFF9A00 6A5016AC 46805016 F8468DA8 ´.F½.P.F¯.Pj.......F|=..u.Ö"..v´ 0000C0
FF00ACE9 A6468B00 001D3C9A 0A76FF0C 76FF0196 68A676FF 00001D28 9AA876FF .v´.+....vÏh...v..v..<....F|Ö¯.. 0000E0
75000030 A6468900 001B949A F876FFFA 76FF5016 AC468D00 9A681EFC 76FFFE76 v±.v=.h...F¯.P.v°.v½......F|=..u 000100
00001D69 9A0A76FF 0C76FF01 9668A676 FF000019 B29AA876 FFAA76FF 0022E903 .Ö"..v¯.v´.ÿ....vÏh...v..v..Ï... 000120
68A676FF 0017E903 75000030 A6468900 0019D49A A876FFAA 76FF0065 E9A6468B .F|Öe..v¯.v´.à....F|=..u.Ö...vÏh 000140
76FF1676 FF000307 C7260E5E C40038E9 A6468B00 0019859A 0A76FF0C 76FF0196 ...v..v.......F|Ö8.á^.&ú....v..v 000160
009F6814 76FF1676 FF00001D A19A00A1 681476FF 1676FF00 001D939A 00A06814 .h........v..v.hÀ..À....v..v.h.. 000180
5EC4D88E 18E3881E 56570000 02C80012 CAC95F5E 1F0000E9 A6468B00 001A1A9A ......F|Ö...^_èò..à...WV.|D..Äá^ 0001A0
83066A0A 76FF0C76 FF000D07 C726065E C4000407 C7260E5E C4078926 12468B06 ..F.&..á^.&ú...á^.&ú.Ï..v..v.j.. 0001C0
3DFE4689 20C4831A 5A21999A 1476FF16 76FFA5F2 00088907 16FC8800 9A8E16EC å./...=..¿..·È.v..v...|Z..á .F±= 0001E0

Dump of file SATURN:[PCCOMMON.DUMP.DLL]DAIMDF.TMP;1 on 18-APR-1990 10:41:20.28
File ID (570,8,0)   End of file block 71 / Allocated 72

Virtual block number 19 (00000013), 512 (0200) bytes

2D9A00A0 681476FF 1676FF00 0107C726 0E5EC400 38E9FE46 8B0006E9 03750000 ..u.Ö...F±Ö8.á^.&ú....v..v.h...- 000000
8800001D 859A009F 681476FF 1676FF00 001E389A 00A16814 76FF1676 FF00001E ....v..v.hÀ..;....v..v.h........ 000020
000207C7 260E5EC4 D88E1D8A B81E5657 00000EC8 0012CAC9 5F5E1F00 00E9FE46 F±Ö...^_èò..à...WV.|¤..Äá^.&ú... 000040
0716FC8B 009A8E16 EC83066A 5016F846 8D0A76FF 0C76FF07 89261246 88065EC4 á^..F.&...v..v..F½.Pj..å./...=.. 000060
46880006 E9037500 003DF246 8924C483 1DF71FE7 9A1476FF 1676FFA5 F2000889 ¿..·È.v..v..Ö.%..á$.F·=..u.Ö...F 000080
880006E9 03750000 3DF24689 00001C24 9A5016F4 468D1476 FF1676FF 013CE9F2 ·Ö<..v..v..F¶.P.$....F·=..u.Ö... 0000A0
0006E903 75000030 F2468900 001C039A 5016FC46 8D1476FF 1676FF01 18E9F246 F·Ö...v..v..F•.P......F·=..u.Ö.. 0000C0
50521F0F 8A020088 0196682C 6A039636 FF261986 068E006A 006A00FA E9F2468B .F·Ö°.j.j.....&.6..j,h..|..¤..RP 0000E0
03750000 3DF24689 00001C92 9A50521C 7A8A0200 B8F476FF F676FF00 001C7F9A ......v¬.v¶|..¤z.RP......F·=..u. 000100
F676FF00 68E900A6 E9F2468B 00001F71 9A0A76FF 0C76FF01 9668F276 FF001AE9 Ö...v·h...v..v..q....F·Ö|.Ök..v¬ 000120
9AF476FF F676FF00 22E90375 000030F2 46890000 FFFF9AF8 76FFFA76 FFF476FF .v¶.v°.v½......F·=..u.Ö"..v¬.v¶. 000140
76FFF676 FF0065E9 F2468800 001F9E9A 0A76FF0C 76FF0196 68F276FF 00001CE4 ö....v·h...v..v.......F·Öe..v¬.v 000160
1CAE9A0A 76FF0C76 FF019668 F276FF00 17E90375 000030F2 46890000 1D4D9AF4 ¶.M....F·=..u.Ö...v·h...v..v..Ö. 000180
76FF0000 1FC89A00 A0681476 FF1676FF 000107C7 260E5EC4 0038E9F2 46880000 ...F·Ö8.á^.&ú....v..v.h...à....v 0001A0
0000E9F2 46880000 1E1F9A00 9F681476 FF1676FF 00001FD6 9A00A168 1476FF16 ..v.hÀ..ø....v..v.h........F·Ö.. 0001C0
D19A5016 FC468D06 76FF0876 FFD88E1E 54881E56 570000A6 C80012CA C95F5E1F .^_èò..àÏ..WV.|T..Ä.v..v..F=.P.Ï 0001E0
```

Dump of file SATURN:[PCCOMMON.DUMP.DLL]DAIMDF.TMP;1 on 18-APR-1990 10:41:20.28
File ID (570,8,0)   End of file block 71 / Allocated 72

Virtual block number 20 (00000014), 512 (0200) bytes

```
2276FF24 76FF0676 FF0876FF 0180E9A6 46880006 E9037500 0030A646 8900001E ....Fl=..u.Õ...FlÕ...v..v..v$.v" 000000
16F6468D 0676FF08 76FF015E E9A6468B 0006E903 7500003D A6468900 0016279A .'.....Fl=..u.Õ...FlÕ^..v..v..F-. 000020
0E76FFFC 76FFFE76 FF0130E9 A6468800 06E90375 00003DA6 46890000 1EB09A50 P.¯....Fl=..u.Õ...FlÕ=..v±.v=.v. 000040
006A006A 0023L903 74FFFA7E 83FA4689 0000181 6 9A006A00 6A006A00 6A016568 he.j.j.j.j.......F'.~'.t.Õ#.j.j. 000060
FF00F5E9 00018800 0020FE9A 2676FF28 76FF0196 68326A03 9636FF26 1986068E ....&.6..j2h...v(.v&.± ..¡..Õ%.. 000080
468D0E76 FFFC76FF FE76FF00 001C4B9A 5016FF5A 868D486A 0C76FFFC 76FFFE76 v±.v=.v.jK..Z..P.K....v±.v=.v..F 0000A0
00003008 C4831C57 00109A50 16FF5A86 805016AA 46800000 03AF9A4B 6A5016AA ˆ.PjK.€....F˙.P..Z..P...W..á.=.. 0000C0
1F019A26 76FF2876 FF019668 336A0396 36FF2619 86068E00 6A006A00 23E90375 u.Õ#.j.j.....&.6..j3h...v(.v&... 0000E0
46C7003E E90013A8 46C70046 E90018A8 46C7002B E920468B 008CE900 01880000 ..¡..Õ...F Õ+.úF˙..ÕF.úF˙..Õ>.úF 000100
CDE90375 00023000 23E90026 E90000A8 46C7002E E90017A8 46C70036 E90016A8 ˙..Õ6.úF˙..Õ..úF˙..Õ&.Õ#.=..u.Õë 000120
FFF876FF FFD2E9FF CDE90375 00073DFF CDE90375 00063DFF CDE90375 00053DFF .=..u.Õë.=..u.Õë.=..u.Õë.Õ0..v%. 000140
A6468900 00FFFF9A 2276FF24 76FF006A 006AA876 FF5016FF 5A868D20 76FFF676 v~.v ..Z..P.v´j.j..v$.v"......Fl 000160
1E565700 0242C8C8 C95F5E1F 0000E9A6 46880006 E9A6468B 0006E903 7500003D =..u.Õ...FlÕ...FlÕ...^_èùàB..WV. 000180
07E90375 00003DFE 0A868900 001FFF9A 5016F646 800676FF 0876FFD8 8E1FEFB8 ¡ÿ..Ä.v..v..F-.P........±=..u.Õ. 0001A0
7500003D FE0A8689 00002021 9A5016FC 468D0676 FF0876FF 02FEE9FE 0A868800 ....±Õ±..v..v..F=.P.l .....±=..u 0001C0
FE0A8689 00002042 9A5016FE 5A868D06 76FF0876 FF020BE9 FE0A868B 0007E903 .Õ.....±ÕÜ..v..v...Z±.P.B .....± 0001E0
```

Dump of file SATURN:[PCCOMMON.DUMP.DLL]DAIMDF.TMP;1 on 18-APR-1990 10:41:20.28
File ID (570,8,0)   End of file block 71 / Allocated 72

Virtual block number 21 (00000015), 512 (0200) bytes

```
6A006A00 6A016568 0E76FFF6 76FFF876 FF02B7E9 FE0A868B 0007E903 7500003D =..u.Õ.....±Õñ..v%.v~.v.he.j.j.j 000000
FF261986 068E006A 006A0023 E90374FF FE5EBE83 FE5E8689 0000206C 9A006A00 .j..l ....^±.ƒ^±.t.Õ#.j.j.....&. 000020
FFF676FF F876FF02 6DE90001 B8000020 959A2276 FF2476FF 01966832 6A039636 6..j2h...v$.v".. ..¡..Õm..v%.v~. 000040
4B6A5016 FE0E868D 0E76FFF6 76FFF876 FF000020 B19A5016 FDBE868D 4B6A0C76 v.jK..ƒ».P.Ÿ ...v%.v~.v....±.PjK 000060
06E90374 00003D08 C4832008 00109A50 16FDBE86 805016FE 0E868D00 0020C69A .6 .....±.P..ƒ».P...Ä .á.=..t.Õ. 000080
13FE0C86 C7005FE9 0002FA46 C70018FE 0C86C700 4AE92046 88021FE9 00008800 .¡..Õ...F ÕJ.ú..±..úF'..Õ_.ú..±. 0000A0
FA46C700 17FE0C86 C70043E9 0002FA46 C70016FE 0C86C700 51E90002 FA46C700 .úF'..ÕQ.ú..±..úF'..ÕC.ú..±..úF' 0000C0
3DFFAEE9 03750002 300023E9 0026E9FA 46892046 880000FE 0C86C700 35E90002 ..Õ5.ú..±...F .F'Õ&.Õ#.=..u.ÕÜ.= 0000E0
B6FFFE5C B6FFFFCB E9FFC0E9 03750007 30FFBAE9 03750006 30FFB4E9 03750005 ..u.ÕÇ.=..u.Õ¤.=..u.Õä.Õù..Ñ\±.Ñ 000100
0A868900 0023B79A 5016FC46 80006A00 6AFE0C86 FF5016FD BE868020 76FFFE5A Z±.v ..ƒ».P.Ñ.±j.j..F=.P.ñ#..... 000120
8E006A00 6A003DE9 0375FE46 0BFC468B 0176E9FE 0A868800 07E90375 00003DFE ±=..u.Õ.....±Õv..F=.F±u.Õ=.j.j.. 000140
86805016 FDBE868D 000023F4 9A5016FE 60868D01 96682F6A 039636FF 26198606 ...&.6..j/h....'±.P.¶#....ƒ».P.. 000160
FE5AB6FF FE5CB6FF 012EE9FF FFB80CC4 8324B400 569A2276 FF2476FF 5016FE60 '±.P.v$.v".V.Ç$.á.¡..Õ...Ñ\±.ÑZ± 000180
3DFE0A86 89000021 799A5016 FC468000 6A006AFE 0CB6FF50 16FE0E86 802076FF .v ....±.P.Ñ.±j.j..F=.P.yl.....±= 0001A0
86068E00 6A006A00 A9E90375 FE460BFC 468800F8 E9FE0A86 880007E9 03750000 ..u.Õ.....±Õ%..F=.F±u.Õ`.j.j.... 0001C0
FE5AB6FF FE5CB6FF 0000249B 9A505224 04BA0200 88019668 316A0396 36FF2619 .&.6..j1h..¡..¤.$RP..$. .Ñ\±.ÑZ± 0001E0
```

Dump of file SATURN:[PCCOMMON.DUMP.DLL]DAIMDF.TMP;1 on 18-APR-1990 10:41:20.28
File ID (570,8,0)   End of file block 71 / Allocated 72

Virtual block nu ber 22 (00000016), 512 (0200) bytes

```
00A6E9FE 0A868800 0AE90375 00003DFE 0A868900 001F149A 50521EFC 8A020088 ¡..¤=.RP........±=..u.Õ.....±Õl. 000000
89000007 F79A5016 FDBE868D FA76FFFC 76FFFE76 FFFE5AB6 FFFE5CB6 FF005CE9 Õ\..Ñ\±.ÑZ±.v±.v=.v'..ƒ».P.¥.... 000020
FF0067E9 FE0A868B 00001F60 9AFE5AB6 FFFE5CB6 FF0014E9 03750000 30FE0A86 ..±=..u.Õ...Ñ\±.ÑZ±.'......±Õg.. 000040
E90047E9 FE0A868B 0007E903 75000030 FE0A8689 00001F82 9AFE5AB6 FFFE5CB6 Ñ\±.ÑZ±........±=..u.Õ.....±ÕG.Õ 000060
80000022 4F9A5016 FE60868D 01966830 6A039636 FF261986 068E006A 006A0030 =.j.j.....&.6..j0h....'±.P.O"... 000080
880007E9 FFFFB80C C4832294 00569A22 76FF2476 FF5016FE 60868050 16FE0E86 ..±.P..'±.P.v$.v".V..".á.¡..Õ... 0000A0
FC468006 76FF0876 FFD88E21 A1B81E56 5700000A C8C8C95F 5E1F0000 E9FE0A86 ..±Õ...^_èùà...WV.¡Àl.Ä.v..v..F= 0000C0
46C7007F E90A468B 0140E9F8 46880006 E9037500 0030F846 89000021 F89A5016 .P.%l...F½=..u.Õ...F½Õ¤..F.Õ..úF 0000E0
FA46C700 17F646C7 00E8E900 05FA46C7 0013F646 C700F5E9 0002FA46 C70018F6 ~..úF'..Õ%.úF~..úF'..ÕÕ.úF~..úF' 000100
C700C1E9 002BF646 C7000BFA 46C700CE E90006FA 46C70016 F646C700 DBE90007 ..ÕÜ.úF~..úF'..Õò.úF'..úF~+.Õë.ú 000120
FFFC76FF FE76FF00 A7E90015 FA46C700 33F646C7 00B4E900 0AFA46C7 0018F646 F~..úF'..ÕÇ.úF~3.úF'..Õl..v±.v=. 000140
00003D00 83E900B6 E90000FA 46C70000 F646C700 CBE90000 1AC39A10 76FF1276 v..v..û...Õù.úF~..úF'..Õ..Õ..=Á. 000160
E9037500 743DFFA5 E9037500 713DFFC7 E9037500 6E3D0033 E90376FF 79E90375 u.Õy.v.Õ3.=n.u.Õú.=q.u.ÕE.=t.u.Õ 000180
00D83DFF B0E9FF44 E9037500 CE3DFF9A E9037500 903DFFA2 E9037500 8E3DFF90 ..=..u.ÕÀ.=..u.Õ..=ö.u.Õ0.Õ¯.=Á. 0001A0
000A3DFF 90E9FF3' E9037500 053DFF39 E9037500 D33D0013 E90376FF 53E90375 u.ÕS.v.Õ..=Æ.u.Õ9.=l.u.Õ1.Õ..=Õ. 0001C0
FF60E9FF 35E90375 00EA3DFF 30E90375 000F3DFF 38E90375 000D3DFF 33E90375 u.Õ3.=l.u.Õ8.=Õ.u.Õ0.=ò.u.Õ5.Õm. 0001E0
```

Dump of file SATURN:[PCCOMMON.DUMP.DLL]DAIMDF.TMP;1 on 18-APR-1990 10:41:20.28
File ID (570,8,0)   End of file block 71 / Allocated 72

Virtual block number 23 (00000017), 512 (0200) bytes

```
0023399A 1076FF12 76FF006A 006AF676 FF0C76FF 0E76FFFA 76FFFC76 FFFE76FF .v±.v=.v'.v..v..v-j.j..v..v..9#. 000000
0058C8CB C95F5E1F 0000E9FB 46880006 E9F8468B 0006E903 7500003D F??68900 ..FY=..u.Ô...F%Ô...F%Ô...^_èuàX. 000020
7500003D F6468700 0021B19A 5016F846 8D0676FF 0876FFD8 8E2403B8 1E? 5700 .WV.¡A$.A.v..v..F%.P.Ÿ!...F-=..u 000040
0021D49A 0C76FF0E 76FF0676 FF0876FF 007EE90A 46880138 E9F6468B 0006?903 .Ô...F-Ô8..F.Ô-..v..v..v..v..å!. 000060
89005888 0090E9FE 5E8CFC46 89000288 00A9E9FE 5E8CFC46 89004288 011EE900 .Ô..¡B..F=.^±Ô`.¡@..F=.^±Ô..¡X.. 000080
0079E9FE 5E8CFC46 89008488 0085E9FE 5E8CFC46 89006E88 0091E9FE 5E8CFC46 F=.^±Ô..¡n..F=.^±Ô..¡...F=.^±Ôy. 0000A0
89260000 B80C5EC4 0061E9FE 5E8CFC46 89008088 0060E9FE 5E8CFC46 89009A88 ¡...F=.^±Ôm.¡¯..F=.^±Ôa.å^.¡..å. 0000C0
0375006E 30001BE9 0376FFA6 E9037500 D030004B E9008?E9 00008807 89260247 G.å..¡..Ôñ.ÔK.=A.u.Ô!.v.Ô..=n.u. 0000E0
DA30FF8A E9037500 0530FFC2 E9FF7DE9 03750090 30FF79E9 03750074 30FF60E9 Ôm.=t.u.Ôy.=..u.Ô).Ôó.=!.u.Ô..=ó 000100
FFF876FF FA76FFFF 9FE9FF96 E9037500 EA30FF92 E9037500 DF30FF8E E9037500 .u.Ô..=Ô.u.Ô..=ô.u.Ô..Ô...v'.v%. 000120
00003DF6 46890000 FFFF9A0C 76FF0E76 FF5016A8 46805016 F4468DFC 76FFFE76 v±.v=.F¶.P.F'.P.v..v.......F-=.. 000140
0C76FF0E 76FF0022 E9037402 470B2607 88260C5E C40037E9 F6468800 06E90375 u.Ô...F-Ô7.å^.å..å.G.t.Ô"..v..v. 000160
E90000B8 0006E900 09E90EC4 831E8E24 CB9A0676 FF0876FF 0A76FF50 16A84680 .F`.P.v..v..v..ù$...å.C .Ô..¡..Ô 000180
559A5016 F6468006 76FF0876 FFD88E26 45881E56 57000014 C8C8C95F 5E1F0000 ...^_èuà..WV.¡E&.Å.v..\  F-.P.U 0001A0
E39A5016 F2468006 76FF0876 FF000005 709A5016 FA468006 76FF0876 FF000026 &...v..v..F'.P.p....v..v..F`.P.D 0001C0
880006E9 03750000 30EC4689 0000FFFF 9A5016EE 46801A6A 1E6AFA76 FF000024 $...v'j.j..FŸ.P......F$=..u.Ô... 0001E0
```

Dump of file SATURN:[PCCOMMON.DUMP.DLL]DAIMDF.TMP;1 on 18-APR-1990 10:41:20.28
File ID (570,8,0)   End of file block 71 / Allocated 72

Virtual block number 24 (00000018), 512 (0200) bytes

```
FF0876FF 50520014 05FE5688 FC468BFE 5689FC46 89F05688 EE468800 8BE9EC46 F$ÔE..FŸ.Vb.F=.V±.F=.V±...RP.v.. 000000
76FF08C4 83285628 C79A0676 FF0876FF FC76FFFE 76FF08C4 83FFFF0F 4C9A0676 v..L....á..v±.v=.v..v..ú(V(.á..v 000020
0000FFFF 9AFFFF68 28676806 76FF0876 FF0000FF FF9AEE76 FFF076FF 0676FF08 ..v..vb.vŸ......v..v.hg(h....... 000040
FFFF9AFF FF682889 680676FF 0876FF00 00FFFF9A FFFF6828 78680676 FF0876FF .v..v.hx(h........v..v.h.(h..... 000060
9AFFFF68 27916806 76FF0876 FF0000FF FF9AFFFF 68289A68 0676FF08 76FF0000 ...v..v.h.(h........v..v.h.'h... 000080
0000E900 00880000 FFFF9A03 9636FF26 1986068E 086A0676 FF0876FF 0000FFFF .....v..v.j.....£.6.......¡..Ô.. 0000A0
FFFE5689 FC46890C 56880A46 88D88E27 AF881E56 57000004 C80004CA C95F5E1F .^_èò..à...WV.¡E'.Å.F..V..F=.V±. 0000C0
76FF0000 29199A00 6A006A00 6AFFFF68 FFFF68FF FF68FFFF 68656A06 76FF0876 v..v.jeh..h..h..h..j.j.j...)...v 0000E0
0876FF00 0029389A 006A006A 016AFFFF 6829F468 FFFF6829 00686E6A 0676FF08 ..v.jnh.)h..h¶)h..j.j.j..8)...v. 000100
FF0876FF 00002953 9A006A00 6A006AFF FF68FFFF 68FFFF68 FFFF687A 6A0676FF .v.jzh..h..h..h..j.j.j..S)...v.. 000120
68746A06 76FF0876 FF000029 709A0042 681E016A 006A006A 006A006A 716A0676 v.jqj.j.j.j.j..hB..p)...v..v.jth 000140
6A006A01 2C680676 FF0876FF 0000298E 9A004268 1E016A00 6A006AFF FF68FFFF ..h..j.j.j..hB...)...v..v.h,.j.j 000160
68006A00 6A012D68 0676FF08 76FF0000 29AC9A00 42681E00 6AFFFF68 FFFF6800 .h..h..j..hB..¯)...v..v.h-.j.j.h 000180
FFFF6800 6A006A01 2E680676 FF0876FF 000029CA 9A004268 1E006AFF FF68FFFF ..h..j..hB..Ô)...v..v.h..j.j.h.. 0001A0
6A006A00 6A006A00 6A00CE68 0676FF08 76FF0000 29E69A00 42681E00 6AFFFF68 h..j..hB..Î)...v..v.hö.j.j.j.j.j 0001C0
1E016A00 6A006AFF FF682A16 68000068 0676FF08 76FF0000 2A049A00 58681E01 ..hX...*...v..v.hÅ.h.*h..j.j.j.. 0001E0
```

Dump of file SATURN:[PCCOMMON.DUMP.DLL]DAIMDF.TMP;1 on 18-APR-1990 10:41:20.28
File ID (570,8,0)   End of file block 71 / Allocated 72

Virtual block number 25 (00000019), 512 (0200) bytes

```
58681E00 6AFFFF68 2A346800 6A006A01 2F680676 FF0876FF 00002A22 9A005868 hX.."*...v..v.h/.j.j.h4*h..j..hX 000000
9A005868 1E006AFF FF682A52 68006A00 6A013068 0676FF08 76FF0000 2A409A00 ..@*...v..v.h0.j.j.hR*h..j..hX.. 000020
2A7A9A00 58681E00 6AFFFF68 2A886800 6A006A01 31680676 FF0876FF 00002A5E ^*...v..v.h1.j.j.h.*h..j..hX..z* 000040
76FF0000 2A989A00 6E681E01 6A006A00 6A006A00 6A00D368 0676FF08 76FF0000 ...v..v.h£.j.j.j.j.j..hn...*...v 000060
FF0876FF 00002AB6 9A006E68 1E016A00 6A006AFF FF682AAA 6800D568 0676FF08 ..v.hî.h`*h..j.j.j..hn..R*...v.. 000080
0676FF08 76FF0000 2AD49A00 6E681E00 6AFFFF68 2AC86800 6A006A01 32680676 v.h2.j.j.hà*h..j..hn..Å*...v..v. 0000A0
34680676 FF0876FF 00002AF2 9A006E68 1E006AFF FF682AE6 68006A00 6A013368 h3.j.j.hl*h..j..hn..·*...v..v.h4 0000C0
6A000868 0676FF08 76FF0000 2B0E9A00 6E681E00 6AFFFF68 2B1C6800 6A006A01 .j.j.h.+h..j..hn...+...v..v.hÅ.j 0000E0
FF682B3E 68000A68 0676FF08 76FF0000 2B2C9A00 84681E01 6A006A00 6A006A00 .j.j.j.j..h...,+...v..v.hÖ.h>+h. 000100
2B5C6800 6A006A01 35680676 FF0876FF 00002B4A 9A008468 1E016A00 6A006AFF .j.j.j..h...J+...v..v.h5.j.j.h\+ 000120
FF682B7A 68006A00 6A013668 0676FF08 76FF0000 2B689A00 84681E00 6AFFFF68 h..j..h...h+...v..v.h6.j.j.hz+h. 000140
6AFFFF68 2B8068C^ 6A006A01 37680676 FF0876FF 00002B86 9A008468 1E006AFF .j..h....+...v..v.h7.j.j.h¯+h..j 000160
9A681E01 6A006AC  6A006A00 6A000068 0676FF08 76FF0000 2BA29A00 84681E00 ..h...Å+...v..v.hî.j.j.j.j.j..h. 000180
9A009A68 1E016A00 6A006AFF FF682B02 6800F68 0676FF08 76FF0000 2BC09A00 ..å+...v..v.hÖ.h@+h..j.j.j..h... 0001A0
FFFF9A00 9A681E00 6AFFFF68 2BF06800 6A006A01 38680676 FF0876FF 00002BDE B+...v..v.h8.j.j.hÞ+h..j..h..... 0001C0
00002C1A 9A009A68 1E006AFF FF682B39 68006A00 6A013968 0676FF08 76FF0000 ...v..v.h9.j.j.h9(h..j..h...,.. 0001E0
```

```
Dump of file SATURN:[PCCOMMON.DUMP.DLL]DAIMDF.TMP;1 on 18-APR-1990 10:41:20.28
File ID (570,8,0)   End of file block 71 / Allocated 72

Virtual block number 26 (0000001A), 512 (0200) bytes

 5EC40000 2C6E9A00 9A681E00 6AFFFF68 29076800 6A006A01 3A680676 FF0876FF .v..v.h:.j.j.h.)h..j..h...n,..á^ 000000
 078B26FC 5EC40E5F 8C260C47 892600C6 880A5EC4 0A5F8C26 08478926 0080880A .¦¯.&.G.&._.á^.¦ó.&.G..._.á^=&.. 000020
 006A006A 006A006A 00E86806 76FF0876 FF125789 26104789 260A5EC4 02578826 &.W.á^.&.G¯&.W..v..v.hG.¯.j.j.j. 000040
 FF68FFFF 6800EA68 0676FF08 76FF0000 2C939A50 52000805 0C56880A 4688016A j..F..V....RP..,...v..v.hõ.h..h. 000060
 00E86806 76FF0876 FF00002C 889A5052 0008050C 56880A46 88016A00 6A006AFF .j.j.j..F..V....RP.¦,...v..v.h$. 000080
 FF0876FF 00002CDD 9A505200 08050C56 880A4688 006AFFFF 68FFFF68 006A006A j.j.h..h..j..F..V....RP.¦,...v.. 0000A0
 002D029A 50520008 050C5688 0A468800 6AFFFF68 FFFF6800 6A006A00 EC680676 v.h&.j.j.h..h..j..F..V....RP..-. 0000C0
 52000805 0C56880A 4688006A FFFF68FF FF68006A 006A00ED 680676FF 0876FF00 ..v..v.hÚ.j.j.h..h..j..F..V....R 0000E0
 2D3C9A00 02681E01 6A006A00 6A006A00 6A008E68 0676FF08 76FF0000 2D1E9A50 P..-...v..v.h..j.j.j.j.j..h@..<- 000100
 00002D5A 9A000268 1E016A00 6A006AFF FF68FFFF 68009068 0676FF08 76FF0000 ...v..v.h..h..h..j.j.j..h@..Z-.. 000120
 76FF0000 20789A00 02681E00 6AFFFF68 FFFF6800 6A006A00 91680676 FF0876FF .v..v.h..j.j.h..h..j..h@..x-...v 000140
 FF0876FF 00002D96 9A000268 1E006AFF FF68FFFF 68006A00 6A009268 0676FF08 ..v.h..j.j.h..h..j..h@...-...v.. 000160
 0676FF08 76FF0000 20849A00 02681E00 6AFFFF68 FFFF6800 6A006A00 93680676 v.h..j.j.h..h..j..h@..Ç-...v..v. 000180
 9E680676 FF0876FF 00002D02 9A006A00 6A006A00 6A006A2D C5682DC2 68009068 h..hó-hé-j.j.j.j.j..@-...v..v.h. 0001A0
 68009C68 0676FF08 75FF0000 2DF09A00 6A006A00 6A006A00 6A2DE368 2DE06800 .hÀ-hD-j.j.j.j.j..Þ-...v..v.h..h 0001C0
 2E1C6800 A0680676 FF0876FF 00002E0E 9A006A00 6A006A00 6A006A2E ^1682DFE ±-h..j.j.j.j.j.......v..v.h..h.. 0001E0

Dump of file SATURN:[PCCOMMON.DUMP.DLL]DAIMDF.TMP;1 on 18-APR-1990  0:41:20.28
File ID (570,8,0)   End of file block 71 / Allocated 72

Virtual block number 27 (0000001B), 512 (0200) bytes

 FF68FFFF 6800A168 0676FF08 76FF0000 2E2C9A00 6A006A00 6A006A00 6A2E1F68 h..j.j.j.j.j..,.....v..v.hÀ.h..h. 000000
 6A20A768 2DA46800 9F680676 FF0876FF 000028FA 9A006A00 6A006A00 6A006AFF .j.j.j.j.j..•(...v..v.h..hÉ-hÏ-j 000020
 02030000 00012C0E 00020074 90CBC95F 5E1F0000 2BFC9A00 6A006A00 6A006A00 .j.j.j.j..•+...^_èù.t...,....... 000040
 010303E5 00082CA5 02020385 000829C1 02050364 00082926 02020154 0006199C ....T...&)..d...ĕ)......£,..Ī... 000060
 0203006A 0C04190A 02031A69 00012BB3 00050000 00022825 0002007F 00012224 $"........X(......•+..i.......j... 000080
 01030445 000904EB 02030004 00010353 01030104 000727CF 02030252 00072860 m(..R...u'..Å...S.......Š...E... 0000A0
 000203EF 00082CEF 0202038F 000829A3 02050087 00012268 01030086 00010685 ........k".......É)......y,..ÿ... 0000C0
 02030164 00061F4A 02030000 000523EF 00020370 00082960 02020000 00042380 .#......')..p...y#......J...d... 0000E0
 02030078 00041B54 02030000 000628CF 00020316 00082E30 0205020D 00070303 ....Ì...=.......u(.......T...x... 000100
 02030013 0001033A 010303FA 00082CCA 02020399 0008202F 02050260 0007288F .(..'.../-.......ò,..•...:....... 000120
 02030C02 00012A37 00050000 0001287B 0005037B 00082982 020201E3 0007267D )&..D....)..(...((......7•...... 000140
 02050385 0008298E 0202009D 00012374 010300F4 00060B1E 02030173 00061F30 0...s........¶...t#......ƒ)...... 000160
 02030A0A 00012A19 00050270 0007287E 02030086 0004243B 020303A5 00082D51 Q-..É...;$......~(..p....•...... 000180
 0205038F 000829A0 020202F7 00072281 02030014 000327F0 020301F3 0007270F Ô'..µ...Þ'........"..¥....)...... 0001A0
 00050092 00041AEC 02030311 0001289D 00050101 000610C1 020303B0 00082080 .-..¯...ė........(......$....... 0001C0
 020301FF 000727BF 02030316 00082E3A 02020696 00012910 00050C94 00012A55 U•........).........:.......¢'...... 0001E0

Dump of file SATURN:[PCCOMMON.DUMP.DLL]DAIMDF.TMP;1 on 18-APR-1990 10:41:20.28
File ID (570,8,0)   End of file block 71 / Allocated 72

Virtual block number 28 (0000001C), 512 (0200) bytes

 02030399 0008202C 02020338 000828EB 02050898 000129F7 00050280 000728A0 .(......¼)......Š(..8...,-...... 000000
 0005010F 00061CCE 02030187 00071D15 020303BB 0008206F 02050022 0003059E ....".. o-..£............ö....... 000020
 02030346 000828F1 020503A5 0008204E 020211A5 00012ACB 00050FA0 00012AAD Ù•......ù•..É...N-..É...þ(..F... 000040
 020300AB 00041B70 02030291 0007285C 02030227 0001288C 0005020F 0007004E N........(..'...\(......p..¨.... 000060
 000503B0 000820BA 02020E2E 00012A88 00050196 00072756 0203011C 00061607 ■.......V'........•.......-..-... 000080
 02030356 0008292F 02050316 00081FBA 02030033 00042409 02031D82 00012BF3 µ•..ý....$..3...¤......./)..V... 0000A0
 02030338 000828E8 020202A0 0007284B 02031237 00012AE9 00050087 00042454 T$..ñ...Ô•..7...K(.......Ò(..8... 0000C0
 02020223 00070590 0203030A 00082C7F 020505BA 0001290A 00050129 0006261D .&..)....)..¤.......Ö.......#... 0000E0
 02050540 0001286A 0005003F 00042468 020315BD 00012841 000503B8 0008206C (-..£...A+..§...h$..7...¡(..ə... 000100
 02030346 000828EE 020217C6 0001285F 000503E5 00082CA8 02050364 00082929 ))..d....¯...Ì..._+..ó...Ÿ(..F... 000120
 02030329 00080822 02030230 00070580 020301AF 000728B6 020302AF 0007043C <...£...Ñ(..£.........0..."....)... 000140
 0005044A 00012859 0005004A 00042566 020300CA 000400AE 02030139 00060091 ....9...Û...ò...fX..J...Y(..J... 000160
 02030370 00082963 020503EF 00082CF2 02051E4C 00012C11 0005144B 00012B1F .+..K.......L...·,..ÿ...c)..p... 000180
 00050338 0008049F 02030356 0008292C 02020146 0006137E 020301BE 0007024E N...ƒ...-...F...,)..V.......8... 0001A0
 0203030A 00082C7C 020203FA 00082CCD 02050241 00072E4A 02031858 000128 7D )+..X...J...A...ë,..•...|,..Ö... 0001C0
 00000000 00000000 0000037B 00082985 02051B08 00012805 000502C3 00070219 ....ù...(+..Ù....)..(.......... 0001E0
```

Dump of file SATURN:[PCCOMMON.DUMP.DLL]DAIMOF.TMP;1 on 18-APR-1990 10:41:20.28
File ID (570,8,0)   End of file block 71 / Allocated 72

Virtual block number 29 (0000001D), 512 (0200) bytes

```
3DF84689 0000FFFF 9A5016FA 46800A76 FF0C76FF D88EFFFF 881E5657 00000CC8 à...WV.¡...Ä.v..v..F•.P......F½= 000000
000030F8 46893000 FFFF9A50 16F4468D FA76FF00 6BE9F846 880006E9 03750000 ..u.Õ...F½Ök..v•.F¶.P......F½=.. 000020
0030F846 890000FF FF9A5016 FC468DF4 76FFF676 FF004DE9 F8468800 06E90375 u.Õ...F½ÕM..v-.v¶.F•.P......F½=. 000040
E9037510 56390008 E903740E 4639FE56 8BFC4688 002CE9F8 46880006 E9037500 .u.Õ...F½Õ,..F•.V±9F.t.Õ..9V.u.Õ 000060
0010C8C8 C95F5E1F 0000E9FF FF05BA9A 6E6AF476 FFF676FF 0010E900 00880006 ..¡..Õ...v-.v¶jn.¤...Õ...^_èùà.. 000080
75000030 F4468900 0000189A 5016F646 8D0A76FF 0C76FFD8 8E0008B8 1E565700 .WV.¡...Ä.v..v..F-.P......F¶=..u 0000A0
E9037500 0030F446 89000000 369A5016 F0468DF6 76FF0094 E9F44688 0006E903 .Õ...F¶Õ...v-.Fÿ.P.6....F¶=..u.Õ 0000C0
03750000 3DF44689 00000057 9A5016FC 468DF076 FFF276FF 0076E9F4 46880006 ...F¶Õv..v·.vÞ.F=.P.W....F¶=..u. 0000E0
00FFFF9A 5016F846 8D026AFC 76FFFE76 FF0A76FF 0C76FF00 55E9F446 880006E9 Õ...F¶ÕU..v..v..v±.v•j..F½.P.... 000100
0008E903 740E4639 FA5688F8 4688002C E9F44688 0006E903 75000030 F4468900 ..F¶=..u.Õ...F¶Õ,..F½.V•9F.t.Õ.. 000120
5E1F0000 E90000FF FF9A7A6A F076FFF2 76FF0010 E9000088 0006E903 75105639 9V.u.Õ..¡..Õ...v·.vÞjz.....Õ...^ 000140
89000000 B59A5016 FA46800A 76FF0C76 FFD88E00 A5881E56 57000010 C8C8C95F _èùà...WV.¡Ë..Ä.v..v..F•.P.ç.... 000160
F0468900 0000039A 5016F246 8DFA76FF 00C8E9F0 46880006 E9037500 0030F046 FÞ=..u.Õ...FÞÕù..v•.F·.P.Æ....FÞ 000180
46890000 00F49A50 16FC468D F276FFF4 76FF00AD E9F04688 0006E903 75000030 =..u.Õ...FÞÕU..v¶.v·.F•.P.¶....F 0001A0
890000FF FF9A5016 F6468DF2 76FFF476 FF008CE9 F0468800 06E90375 00003DF0 Þ=..u.Õ...FÞÕ...v¶.v·.F-.P...... 0001C0
56390008 E903740E 4639FE56 8BFC468B 0068E9F0 46880006 E9037500 0030F046 FÞ=..u.Õ...FÞÕk..F•.V±9F.t.Õ..9V 0001E0
```

Dump of file SATURN:[PCCOMMON.DUMP.DLL]DAIMOF.TMP;1 on 18-APR-1990 10:41:20.28
File ID (570,8,0)   End of file block 71 / Allocated 72

Virtual block number 30 (0000001E), 512 (0200) bytes

```
E9000088 0006E903 75145639 0008E903 74124639 FE5688FC 4688001C E9037510 .u.Õ...F•.V±9F.t.Õ..9V.u.Õ..¡..Õ 000000
006A016E 68746AF6 76FFF876 FF0000FF FF9A00E8 681E716A F676FFF8 76FF0039 9..v½.v-jq.hÕ.......v½.v-jthn.j. 000020
CBC95F5E 1F0000E9 0000FFFF 9A746AF2 76FFF476 FF0000FF FF9A006A 006A006A j.j.j.......v¶.v·jt.....Õ...^_èù 000040
30EC4689 0000017B 9A5016F6 46800A76 FF0C76FF D88E016B 881E5657 000018C8 à...WV.¡k..Ä.v..v..F-.P.(....F$= 000060
00003DEC 46890000 01999A50 16E8468D F676FF01 29E9EC46 880006E9 03750000 ..u.Õ...F$Õ)..v-.FÕ.P......F$=.. 000080
003DEC46 89000001 BA9A5016 FC468DE8 76FFEA76 FF0108E9 EC468800 06E90375 u.Õ...F$Õ...vÕ.vÕ.F•.P.¤....F$=. 0000A0
30EC4689 000001D8 9A5016F2 468DE876 FFEA76FF 00EAE9EC 46880006 E9037500 .u.Õ...F$Õõ..vÕ.vÕ.F·.P.Ü....F$= 0000C0
5016F846 8D126AFC 76FFFE76 FF0A76FF 0C76FF00 C9E9EC46 880006E9 03750000 ..u.Õ...F$Õè..v..v..v±.v•j..F½.P 0000E0
89EE4689 FA5688F8 468800A0 E9EC4688 0006E903 75000030 EC468900 00FFFF9A ......F$=..u.Õ...F$Õ...F½.V•.FŸ. 000100
56880E46 88EE5EC4 0067E903 7502470B 26078826 EE5EC404 EE468300 04E9F056 VÞÕ...FŸ.&^Y&..&.G.u.Õg.&^Ÿ.F..V 000120
AC9AF876 FFFA76FF 0A76FF0C 76FF004A E9037402 57392600 53E90374 07392610 .&9.t.ÕS.&9W.t.ÕJ..v..v..v•.v½.¯ 000140
6A016E68 746AF276 FFF476FF 0000022F 9A00E968 1E716AF2 76FFF476 FF000003 ....v¶.v·jq.hÕ../....v¶.v·jthn.j 000160
FFFF86E9 001AE900 0002549A 746AE876 FFEA76FF 00000247 9A006A00 6A006A00 .j.j.j..G....vÕ.vÕjt.T...Õ..Õ... 000180
57000010 C8C8C95F 5E1F0000 E9000088 0000FFFF 9AF876FF FA76FF0A 76FF0C76 v..v..v•.v½.....¡..Õ...^_èùà...W 0001A0
E9037500 0030F046 89000002 789A5016 FA46800A 76FF0C76 FFD88E02 68881E56 V.¡h..Ä.v..v..F•.P.x....FÞ=..u.Õ 0001C0
0006E903 75000030 F0468900 0002969A 5016F246 8DFA76FF 00CEE9F0 46880006 ...FÞÕö..v•.F·.P......FÞ=..u.Õ.. 0001E0
```

Dump of file SATURN:[PCCOMMON.DUMP.DLL]DAIMOF.TMP;1 on 18-APR-1990 10:41:20.28
File ID (570,8,0)   End of file block 71 / Allocated 72

Virtual block number 31 (0000001F), 512 (0200) bytes

```
06E90375 000030F0 46890000 02B79A50 16FC468D F276FFF4 76FF0080 E9F04688 .FÞÕ¯..v¶.v·.F•.P.ñ....FÞ=..u.Õ. 000000
E9037500 0030F046 89000002 D89A5016 F6468DF2 76FFF476 FF008FE9 F0468800 ..FÞÕ...v¶.v·.F-.P.Ä....FÞ=..u.Õ 000020
4688001C E9037510 56390008 E903740E 4639FE56 8BFC4688 006EE9F0 46880006 ...FÞÕn..F•.V±9F.t.Õ..9V.u.Õ...F 000040
F676FFF8 76FF003C E9000088 0006E903 75145639 0008E903 74124639 FE5688FC •.V±9F.t.Õ..9V.u.Õ..¡..Õ<..v½.v- 000060
006A006A 006A006A 016E6800 0068F676 FFF876FF 00000370 9A00EA68 1E00CE68 hö..hÕ..p....v½.v-hÅ.hn.j.j.j.j. 000080
5700000C C8C8C95F 5E1F0000 E9009308 989A0000 68F276FF F476FF00 0003889A ......v¶.v·hÅ......Õ...^_èùà...W 0000A0
E9037500 0030F846 89000003 D39A5016 FE46800A 76FF0C76 FFD88E03 C3881E56 V.¡û..Ä.v..v..F±.P.Æ....F½=..u.Õ 0000C0
0006E903 75000030 F8468900 0003F19A 5016F446 8DFE76FF 007BE9F8 46880006 ...F½Õ(..v±.F¶.P.þ....F½=..u.Õ.. 0000E0
06E90375 000030F8 46890000 04339A50 16FA468D F476FFF6 76FF005D E9F84688 .F½Õ]..v-.v¶.F•.P.3....F½=..u.Õ. 000100
68FA76FF FC76FF00 0004889A 00E8681E 00CE68FA 76FFFC76 FF003CE9 F8468800 ..F½Õ<..v•.v•hö..hŠ.......v•.v•h 000120
04B10898 9A000068 F476FFF6 76FF0000 04A19A00 6A006A00 6A006A01 6E680000 Å.hn.j.j.j.j..Å....v-.v¶hÅ....Ÿ. 000140
9A5016FA 46800A76 FF0C76FF D88E04C3 881E5657 000010C8 C8C95F5E 1F0000E9 Õ...^_èùà...WV.¡û..Ä.v..v..F•.P. 000160
04F19A50 16F2468D FA76FF00 CEE9F046 880006E9 03750000 3DF04689 00000403 Æ....FÞ=..u.Õ...FÞÕö..v•.F·.P.þ. 000180
129A5016 FC468DF2 76FFF476 FF0080E9 F0468800 06E90375 00003DF0 46890000 ...FÞ=..u.Õ...FÞÕ¯..v¶.v·.F•.P.. 0001A0
9A5016F6 468DF276 FFF476FF 008FE9F0 46880006 E9037500 0030F046 89000004 ....FÞ=..u.Õ...FÞÕ...v¶.v·.F-.P. 0001C0
03740E46 39FE568B FC468800 6EE9F046 880006E9 03750000 3DF04689 00000512 .....FÞ=..u.Õ...FÞÕn..F•.V±9F.t. 0001E0
```

```
Dump of file SATURN:[PCCOMMON.DUMP.DLL]DAIMDF.TMP;1 on 18-APR-1990 10:41:20.28
File ID (570,8,0)   End of file block 71 / Allocated 72

Virtual block number 32 (00000020), 512 (0200) bytes

 06E90375 14563900 08E90374 124639FE 5688FC46 88001CE9 03751056 390008E9 Ō..9V.u.Ō...F▪.V±9F.t.Ō..9V.u.Ō. 000000
 68F676FF F876FF00 0005359A 00EC681E 000368F6 76FFF876 FF003CE9 00008800 .|..Ō<..v½.v-h£..hš..5....v½.v-h 000020
 055E0E2E 9A000568 F276FFF4 76FF0000 054E9A00 6A006A00 6A006A01 6E680005 ł.hn.j.j.j.j..N....v¶.v·hł....^. 000040
 9A5016FA 46800A76 FF0C76FF D88E0570 881E5657 000018C8 CBC95F5E 1F0000E9 Ō...^_èùà...WV.|p..Ã.v..v..F°.P. 000060
 059E9A50 16EC4680 FA76FF01 2CE9F046 880006E9 03750000 3DF04689 00000580 .....F̄Þ=..u.Ō...FÞŌ,..v°.F£.P... 000080
 BF9A5016 FC4680EC 76FFEE76 FF010EE9 F0468800 06E90375 00003DF0 46890000 ...FÞ=..u.Ō...FÞŌ...vŸ.v$.F▪.P.e 0000A0
 9A5016F6 4680EC76 FFEE76FF 00EDE9F0 46880006 E9037500 003DF046 89000005 ....FÞ=..u.Ō...FÞŌÜ..vŸ.v$.F-.P. 0000C0
 76FFFE76 FF0A76FF 0C76FF00 CCE9F046 880006E9 03750000 3DF04689 000005E0 Å....FÞ=..u.Ō...FÞŌä..v..v..v±.v 0000E0
 468800A3 E9F04688 0006E903 7500003D F0468900 0003019A 5016F246 8D136AFC ▪j..F·.P......FÞ=..u.Ō...FÞŌÉ..F 000100
 006AE903 75024708 26078826 E85EC404 E8468300 04E9EA56 89E84689 F4568BF2 ·.V¶.FŌ.VōŌ...FŌ.á^Ō£..£.G.u.Ōj. 000120
 0A76FF0C 76FF004D E9037402 57392600 56E90374 07392610 56880E46 8BE85EC4 á^Ō.F..V.&9.t.ŌV.&9W.t.ŌM..v..v. 000140
 F876FF00 0006359A 00ED681E 000368F6 76FFF876 FF000007 879AF276 FFF476FF .v¶.v·.ñ....v½.v-h£..hÜ..5....v½ 000160
 9A000568 EC76FFEE 76FF0000 064E9A00 6A006A00 6A006A01 6E680005 68F676FF .v-hł.hn.j.j.j.j..N....vŸ.v$hł.. 000180
 00E90000 88000003 5F9AF276 FFF476FF 0A76FF0C 76FFFF83 E9001AE9 065E0E2E ..^.Ō..Ō...v..v..v¶.v ._....|..Ō. 0001A0
 06809A50 16FA4680 0A76FF0C 76FFD88E 0670881E 56570000 10C8CBC9 5F5E1F00 ..^_èùà...WV.|p..Ã.v.. ¯.F°.P... 0001C0
 0000069E 9A5016F2 4680FA76 FF00CEE9 F0468800 06E90375 00003DF0 46890000 ...F̄Þ=..u.Ō...FÞŌò..v°.F .P..... 0001E0

Dump of file SATURN:[PCCOMMON.DUMP.DLL]DAIMDF.TMP;1 on 18-APR-1990 10:41:20.28
File ID (570,8,0)   End of file block 71 / Allocated 72

Virtual block number 33 (00000021), 512 (0200) bytes

 0006BF9A 5016FC46 8DF276FF F476FF00 B0E9F046 880006E9 03750000 3DF04689 .FÞ=..u.Ō...FÞŌ¯..v¶.v·.F▪.P.¢.. 000000
 06E09A50 16F64680 F276FFF4 76FF008F E9F04688 0006E903 7500003D F0468900 ..FÞ=..u.Ō...FÞŌ...v¶.v·.F-.P.Å. 000020
 08E90374 0E463. E 5688FC46 88006EE9 F0468800 06E90375 00003DF0 46890000 ..FÞ=..u.Ō...FÞŌn..F▪.V±9F.t.Ō. 000040
 880006E9 037514.6 390008E9 03741246 39FE5688 FC468800 1CE90375 10563900 .9V.u.Ō...F▪.V±9F.t.Ō..9V.u.Ō..| 000060
 009068F6 76FFF876 FF000007 799A00EE 681E008E 68F676FF F876FF00 3CE90000 ..Ō<..v½.v-h...hŸ..y....v½.v-h.. 000080
 00E90000 FFFF9A00 9068F276 FFF476FF 00000792 9A006A00 6A006A00 6A016E68 hn.j.j.j.j.......v¶.v·h.......Ō. 0000A0
 07DE9A50 16F24680 0A76FF0C 76FFD88E 07CE881E 56570000 18C8CBC9 5F5E1F00 ..^_èùà...WV.|ö..Ã.v..v..F·.P.8. 0000C0
 000007FC 9A5016E8 4680F276 FF012CE9 EC468800 06E90375 00003DEC 46890000 ...F̄£=..u.Ō...F$Ō,..v·.FŌ.P.▪... 0000E0
 0008109A 5016FC46 8DE876FF EA76FF01 0EE9EC46 880006E9 03750000 3DEC4689 .F£=..u.Ō...F$Ō...vŏ.vŌ.F▪.P.... 000100
 083E9A50 16EE4680 E876FFEA 76FF00ED E9EC4688 0006E903 7500003D EC468900 ..F$=..u.Ō...F$ŌÜ..vŏ.vŌ.FŸ.P.>. 000120
 6AFC76FF FE76FF0A 76FF0C76 FF00CCE9 EC468800 06E90375 00003DEC 46890000 ...F£=..u.Ō...F$Ōä..v..v..v±.v▪j 000140
 8BF84688 00A3E9EC 46880006 E9037500 0030EC46 89000007 099A5016 F8468022 ".F½.P......F£=..u.Ō...F$ŌÉ..F½. 000160
 5EC4006A E9037502 470B2607 8826F45E C404F446 830004E9 F65689F4 4689FA56 V°.F¶.V-Ō...F¶.á^¶£..£.G.u.Ōj.á^ 000180
 76FF0A76 FF0C76FF 004DE903 74025739 260056E9 03740739 2610568B 0E4688F4 ¶.F..V.&9.t.ŌV.&9W.t.ŌM..v..v..v 0001A0
 76FFF076 FF000008 939A00EF 681E008E 68EE76FF F076FF00 000A159A F876FFFA °.v½......vÞ.vŸh...hÿ.......vÞ.v 0001C0
 088A9A00 9068E876 FFEA76FF 000008AC 9A006A00 6A006A00 6A016E68 009068EE Ÿh..hn.j.j.j.j..¯....vŏ.vŌh...o. 0001E0

Dump of file SATURN:[PCCOMMON.DUMP.DLL]DAIMDF.TMP;1 on 18-APR-1990 10:41:20.28
File ID (570,8,0)   End of file block 71 / Allocated 72

Virtual block number 34 (00000022), 512 (0200) bytes

 1F0000E9 00008800 0007679A F876FFFA 76FF0A76 FF0C76FF FF83E900 1AE90000 ..Ō..Ō...v..v..v°.v½.g...|..Ō... 000000
 000008DE 9A5016FA 46800A76 FF0C76FF D88E08CE 881E5657 000010C8 CBC95F5E ^_èùà...WV.|ö..Ã.v..v..F°.P.8... 000020
 46890000 08FC9A50 16F24680 FA76FF00 CEE9F046 880006E9 03750000 3DF04689 .F̄Þ=..u.Ō...FÞŌö..v°.F·.P.▪....F 000040
 89000009 1D9A5016 FC4680F2 76FFF476 FF0080E9 F0468800 06E90375 00003DF0 Þ=..u.Ō...FÞŌ¯..v¶.v·.F▪.P...... 000060
 0000093E 9A5016F6 4680F276 FFF476FF 008FE9F0 46880006 E9037500 003DF046 FÞ=..u.Ō...FÞŌ,..v¶.v·.F-.P.>... 000080
 390008E9 03740E46 39FE5688 FC468800 6EE9F046 880006E9 03750000 3DF04689 .FÞ=..u.Ō...FÞŌn..F=.V±9F.t.Ō..9 0000A0
 00008800 06E90375 14563900 08E90374 124639FE 5688FC46 88001CE9 03751056 V.u.Ō...F▪.V±9F.t.Ō..9V.u.Ō..|.. 0000C0
 6E68000A 68F676FF F876FF00 0009079A 00F0681E 000868F6 76FFF876 FF003CE9 Ō<..v½.v-hÃ..hÞ..▪....v½.v-hŌ.hn 0000E0
 1F0000E9 07A2144E 9A090A68 F276FFF4 76FFD000 09F09A00 6A006A00 6A006A01 .j.j.j.j..Þ....v¶.v·hŌ..K.Ã.Ō... 000100
 00000A3C 9A5016FA 46800A76 FF0C76FF D88E0A2C 881E5657 000010C8 CBC95F5E ^_èùà...WV.|,..Ã.v..v..F°.P.<... 000120
 46890000 0A5A9A50 16F04680 FA76FF00 9CE9F446 880006E9 03750000 3DF44689 .F¶=..u.Ō...F¶Ō...v°.FÞ.P.Z....F 000140
 8900000A 789A5016 FC4680F0 76FFF276 FF007EE9 F4468800 06E90375 00003DF4 ¶=..u.Ō...F¶Ō-..v·.vÞ.F▪.P.(.... 000160
 00000A9C 9A5016F6 4680F076 FFF276FF 005DE9F4 46880006 E9037500 0030F446 F¶=..u.Ō...F¶Ō]..v·.vÞ.F-.P..... 000180
 F19A00F1 681E0008 68F676FF F876FF00 3CE9F446 880006E9 03750000 3DF44689 .F¶=..u.Ō...F¶Ō<..v½.v-hÃ..hÞ..Þ 0001A0
 FFF276FF 0000080A 9A006A0C 6A006A00 6A016E68 000A68F6 76FFF876 FF00000A ....v½.v-hŌ.hn.j.j.j.j.......v·. 0001C0
 76FFD88E 0B2C881E 56570000 10C8CBC9 5F5E1F00 00E9081A 14489A00 DA68F076 vÞhŌ..K...Ō...^_èùà...WV.|,..Ã.v 0001E0
```

```
Dump of file SATURN:[PCCOMMON.DUMP.DLL]DAIMDF.TMP;1 on 18-APR-1990 10:41:20.28
File ID (570,8,0)   End of file block 71 / Allocated 72

Virtual block number 35 (00000023), 512 (0200) bytes

FF00CEE9 F0468800 06E90375 000030F0 46890000 083C9A50 16FA4680 0A76FF0C ..v..F.P.<....Fb=..u.Ö...FbÖö.. 000000
F476FF00 80E9FJ46 880006E9 03750000 30F04689 0000085A 9A5016F2 4680FA76 v.F..P.Z....Fb=..u.Ö...FbÖ..v¶ 000020
76FF008F E9F04688 0006E903 7500003D F0468900 00087B9A 5016FC46 80F276FF .v..F=.P.(....Fb=..u.Ö...FbÖ...v 000040
88006EE9 F0468800 06E90375 000030F0 46890000 089C9A50 16F64680 F276FFF4 ¶.v..F-.P.....Fb=..u.Ö...FbÖn.. 000060
03741246 39FE5688 FC468800 1CE90375 10563900 08E90374 0E4639FE 5688FC46 F=.V±9F.t.Ö..9V.u.Ö...F=.V±9F.t. 000080
BF9A00F2 681E000D 68F676FF F876FF00 3CE90000 880006E9 03751456 390008E9 Ö..9V.u.Ö..¡..Ö<..v½.v-hì..h...¢ 0000A0
FFF476FF 00000808 9A006A00 6A006A00 6A016E68 000F68F6 76FFF876 FF00000B ....v½.v-hÖ.hn.j.j.j.j..Å....v¶. 0000C0
76FFD08E 0BFA881E 56570000 0CC8C8C9 5F5E1F00 00E908E8 1A699A00 DF68F276 v.hÖ..i.Ö.Ö...^_èùà...WV.¡°..Å.v 0000E0
FF007BE9 F8468800 06E90375 00003DF8 46890000 0C0A9A50 16FE4680 0A76FF0C ..v..F±.P......F½=..u.Ö...F½Ö(.. 000100
F676FF00 5DE9F846 880006E9 03750000 30F84689 00000C28 9A5016F4 4680FE76 v±.F¶.P.(....F½=..u.Ö...F½Ö]..v- 000120
76FF003C E9F84688 0006E903 7500003D F8468900 000C6A9A 5016FA46 80F476FF .v¶.F°.P.j....F½=..u.Ö...F½Ö<..v 000140
006A006A 016E6800 DF68FA76 FFFC76FF 00000C8F 9A00F368 1E000068 FA76FFFC •.v°hì..hµ..¢....v=.v°hÖ.hn.j.j. 000160
C8C8C95F 5E1F0000 E90CE81A 699A000F 68F476FF F676FF00 000CD89A 006A006A j.j..Å....v-.v¶hÖ..i.Ö.Ö...^_èùà 000180
0030F046 89000000 0A9A5016 FA4680DA 76FF0C76 FFD88E0C FA881E56 57000010 ...WV.¡°..Å.v..v..F°.P......Fb=. 0001A0
7500003D F0468900 0000289A 5016F246 80FA76FF 00CEE9F0 46880006 E9037500 .u.Ö...FbÖo..v°.F..P.(....Fb=..u 0001C0
000030F0 46890000 0C499A50 16FC4680 F276FFF4 76FF0080 E9F04688 0006E903 .Ö...FbÖ¯..v¶.v..F=.P.l....Fb=.. 0001E0

Dump of file SATURN:[PCCOMMON.DUMP.DLL]DAIMDF.TMP;1 on 18-APR-1990 10:41:20.28
File ID (570,8,0)   End of file block 71 / Allocated 72

Virtual block number 36 (00000024), 512 (0200) bytes

0030F046 89000000 499A5016 F64680F2 76FFF476 FF008FE9 F0468800 06E90375 u.Ö...FbÖ...v¶.v..F-.P.l....Fb=. 000000
E9037510 56390008 E903740E 4639FE56 88FC4688 006EE9F0 46880006 E9037500 .u.Ö...FbÖn..F=.V±9F.t.Ö..9V.u.Ö 000020
76FF003C E9000088 0006E903 75145639 0008E903 74124639 FE5688FC 4688001C ...F=.V±9F.t.Ö..9V.u.Ö..¡..Ö<..v 000040
006A006A 016E6800 EA68F676 FFF876FF 0000006C 9A00F468 1E00E868 F676FFF8 ½.v-hÖ..h¶..l....v½.v-hö.hn.j.j. 000060
C8C8C95F 5E1F0000 E90000FF FF9A00EA 68F276FF F476FF00 0000859A 006A006A j.j.......v¶.v.hö......Ö...^_èùà 000080
0030F846 89000000 879A5016 FE4680DA 76FF0C76 FFD88E00 A7881E56 5700000C ...WV.¡Ì..Å.v..v..F±.P.ñ....F½=. 0000A0
7500003D F8468900 0000059A 5016F446 80FE76FF 007BE9F8 46880006 E9037500 .u.Ö...F½Ö(..v±.F¶.P.f....F½=..u 0000C0
00003DF8 46890000 0E179A50 16FA4680 F476FFF6 76FF005D E9F84688 0006E903 .Ö...F½Ö]..v-.v¶.F°.P......F½=.. 0000E0
FC76FF00 000E6C9A 00F5681E 00E868FA 76FFFC76 FF003CE9 F8468800 06E90375 u.Ö...F½Ö<..v=.v°hÖ..h%..l....v= 000100
9A00EA68 F476FFF6 76FF0000 0E859A00 6A006A00 6A006A01 6E6800EA 68FA76FF .v°hö.hn.j.j.j.j.......v-.v¶hö.. 000120
46800676 FF0876FF D88E0EA7 881E5657 000008C8 C8C95F5E 1F0000E9 00000E93 ....Ö...^_èùà...WV.¡Ì..Å.v..v..F 000140
800676FF 0876FF03 27E9F846 880006E9 03750000 30F84689 0000FFFF 9A5016FE ±.P......F½=..u.Ö...F½Ö'..v..v.. 000160
FC76FFFE 76FF0306 E9F84688 0006E903 7500003D F8468900 00FFFF9A 5016FA46 F°.P......F½=..u.Ö...F½Ö...v±.v= 000180
46880006 E9037500 0030F846 890000FF FF9A5052 0002050C 56880A46 88FA76FF .v°.F..V....RP......F½=..u.Ö...F 0001A0
46890000 1050-9AFF FF680FFB 682F6A01 6A0277FF 260477FF 260A5EC4 02DCE9F8 ½ÖÉ.á^.&.w.&.w.j.j/h«.h...]....F 0001C0
FFFF6810 26680277 FF260477 FF260A5E C40281E9 F8468800 06E90375 00003DF8 ½=..u.Ö...F½ÖŸ.á^.&.w.&.w.h&.h.. 0001E0

Dump of file SATURN:[PCCOMMON.DUMP.DLL]DAIMDF.TMP;1 on 18-APR-1990 10:41:20.28
File ID (570,8,0)   End of file block 71 / Allocated 72

Virtual block number 37 (00000025), 512 (0200) bytes

77FF2604 77FF260A 5EC4028A E9F84688 0006E903 7500003D F8468900 00FFFF9A ......F½=..u.Ö...F½Ö..á^.&.w.&.w 000000
06E90375 00003DF8 46890000 108E9AFF FF681057 68102F68 102C6812 6A016A02 .j.j.h,.h/.hW.h........F½=..u.Ö. 000020
0010899A FFFF6810 8268026A 0A6A0277 FF260477 FF260A5E C40259E9 F8468800 ..F½ÖŸ.á^.&.w.&.w.j.j.h..h...¿.. 000040
6A016A02 77FF2604 77FF260A 5EC4022E E9F84688 0006E903 7500003D F8468900 ..F½=..u.Ö...F½Ö..á^.&.w.&.w.j.j 000060
F8468800 06E90375 00003DF8 46890000 10EA9AFF FF6810B3 68108868 10886818 .h..h..h°.h...ö....F½=..u.Ö...F½ 000080
F8468900 00FFFF9A FFFF6810 DE68026A 026A0277 FF260477 FF260A5E C401FDE9 Ö».á^.&.w.&.w.j.j.h8.h........F½ 0000A0
10E4681A 6A016A02 77FF2604 77FF260A 5EC40102 E9F84688 0006E903 7500003D =..u.Ö...F½Ö®.á^.&.w.&.w.j.j.hÖ. 0000C0
C401A1E9 F8468800 06E90375 00003DF8 46890000 FFFF9AFF FF68FFFF 6810E768 hÖ.h..h........F½=..u.Ö...F½ÖÀ.á 0000E0
7500003D F8468900 0011719A FFFF6811 3A68026A 056A0277 FF260477 FF260A5E ^.&.w.&.w.j.j.h:.h...q....F½=..u 000100
68114368 11406817 6A016A02 77FF2604 77FF260A 5EC40176 E9F84688 0006E903 .Ö...F½Öv.á^.&.w.&.w.j.j.hâ.hC.h 000120
FF260A5E C40145E5 F8468800 06E90375 000030F8 46890000 11A29AFF FF681168 k.h...Å....F½=..u.Ö...F½ÖE.á^.&. 000140
0006E903 7500003D F8468900 0011CD9A FFFF6811 9668026A 076A0277 FF260477 w.&.w.j.j.h..h...ë....F½=..u.Ö.. 000160
FF6811C7 68119F68 119C6816 6A016A02 77FF2604 77FF260A 5EC4011A E9F84688 .F½Ö..á^.&.w.&.w.j.j.h..h..hú.h. 000180
FF260477 FF260A5E C400E9E9 F8468800 06E90375 00003DF8 46890000 11FE9AFF ..±....F½=..u.Ö...F½ÖÖ.á^.&.w.&. 0001A0
E9F84688 0006E903 7500003D F8468900 0012299A FFFF6811 F268026A 066A0277 w.j.j.h..h...)....F½=..u.Ö...F½Ö 0001C0
125A9AFF FF681223 6811F868 11F8682B 6A016A02 77FF2604 77FF260A 5EC400BE ƒ.á^.&.w.&.w.j.j+h½.h«.h#.h...Z. 0001E0
```

```
Dump of file SATURN:[PCCOMMON.DUMP.DLL]DAINDF.TMP;1 on 18-APR-1990 10:41:20.28
File ID (570,8,0)   End of file block 71 / Allocated 72

Virtual block number 38 (00000026), 512 (0200) bytes

 0B6A0277 FF260477 FF260A5E C400B0E9 F8468800 06E90375 000030F8 \890000 ...F½=..u.Ô...F½Ô..6^.&.w.&.w.j. 000000
 5EC40062 E9F8468B 0006E903 7500003D F8468900 0012859A FFFF6812 4L\8046A j.hN.h........F½=..u.Ô...F½Ôb.6^ 000020
 46890000 10329AFF FF68127F 68125768 12546822 6A016A02 77FF2604 77FF260A .&.w.&.w.j.j"hT.hW.h..h...2....F 000040
 0468026A 15(\0277 FF260477 FF260A5E C40031E9 F8468800 06E90375 000030F8 ½=..u.Ô...F½Ô1.6^.&.w.&.w.j.j.hå 000060
 0000E9F8 46880006 E9F8468B 0006E903 75000030 F8468900 000FDA9A FFFF680F .h...Ô....F½=..u.Ô...F½Ô...F½Ô.. 000080
 08C60002 12820005 00000005 0ED50203 00000001 00950002 002690CB C95F5E1F .^ èù.&............f...\.......6. 0000A0
 01D40007 0F640203 00000002 110F0002 007F0001 0F320103 07C60002 12510005 ..Ô...6...2...............d...å. 0000C0
 01E30007 0DF60203 030A0008 0F400203 00000006 0F540002 00860001 0F190103 ..........T.......ä...Ö...-...D. 0000E0
 03640008 01570203 01630002 10290005 02600002 105A0005 04580009 11460203 ..f...X...Z...'...)...c...W...d. 000100
 03700008 03950203 01F30007 0F850203 06680002 11120005 05680002 10E10005 ..Å...h.......h.......µ.......p. 000120
 01FF0007 0EF60203 08F20002 11990005 0CF20002 11CA0005 00920004 09670203 ..g.......ò...·.......·...-..... 000140
 040A0009 0FAF0203 00A80004 09C50203 00000002 0FD70005 009E0004 011D0203 ..........■.......é...¨...£..... 000160
 009F0002 11F50005 0E9F0002 12260005 00900002 0FFE0005 03990008 09FE0203 ..±.......±.......&.......¥..... 000180
 04320009 10010203 04210009 11150203 0A240002 11300005 08240002 116E0005 ..n...$...=...$.......|.......2. 0001A0
 00000000 00000000 005E0004 0EB70203 03880002 10850005 04880002 10860005 ..Ñ...£.......£...ñ...^......... 0001C0
 00000000 00000000 00000500 02000200 01C80001 B81F0396 3EB9D88E FFFFB81E .¡...Á.>...¡..ù................. 0001E0

Dump of file SATURN:[PCCOMMON.DUMP.DLL]DAINDF.TMP;1 on 18-APR-1990 10:41:20.28
File ID (570,8,0)   End of file block 71 / Allocated 72

Virtual block number 39 (00000027), 512 (0200) bytes

 C0330A7E C40676C5 1EDE8807 88EC8855 00000000 00000000 00000000 00000000 ................U.&.■.8.év.6~.3à 000000
 C4D788EC 885500C8 5DFA88F3 881FFFFF 10C01805 74A6F3F9 28D1F7AE F2FFFFB9 ¿..ÚŁl+¹µÎt..à.....µ.*]ù.U.&.■6 000020
 89EC4680 56570000 16C8000C 7BE900CB 5DFA8891 49D1F7AE F2FFFFB9 C033067E -.3à¿..ÚŁll..*]ù.Õ(..à...WV.F&. 000040
 06478926 08568806 4688420A 47C626F8 5EC4FE56 8CFC4689 0E4680FA 568CF846 F½.V*.F..F•.V±6^½&6G.B.F..V.&.G. 000060
 024C9A53 060A76FF 0C76FFFC 76FF167F FF0447C7 26025789 26078926 08578926 &.W.&..&.W.&ùG.....v•.v..v..S.L. 000080
 E8058826 02478E26 07FF263F 8826C02A 1278044F FF26F85E C4F0880C C48300C8 ù..6..Þ6^½&.O.x.*â&.7&..&.G.&..$ 0000A0
 26085EC4 56570000 08C8C8C9 5F5EC688 06C483FF FF00069A 006A53FA 76FF900F ...v*Sj..ø....6..6^_èùà...WV6^.& 0000C0
 4689113C 05E001C1 03E001C8 8BF9F700 0CB99905 482DC388 FA4689E4 2A08478A .G.*8.F*.û-H..¿..X*.à1À.é1À.<..F 0000E0
 5EC49001 28E9FFFF 88200A4F 8026085E C40F7440 0A47F626 0774B30A 47F626F8 ½&-G..t.&-G.@t.6^.&.O. ¡..Ô+..6^ 000100
 EF0A67B0 26020A4F 802690E2 E8000004 47C72620 0A4F8026 0E74010A 47F62608 .&-G..t.&.O. &ùG...$ä.&.O..&.g.ÿ 000120
 06D868F9 F7000C89 9905482D C3884C75 0C0A47F6 26FC7689 F0880447 8926C028 +à&.G..Þ.v•&-G..uL.û-H..¿..X*kÁ. 000140
 FF0A7E81 16750560 087E810E 74017F0A 7E810775 0554087E 81377501 113C87F6 -.<..u7.-.T.u..-...t..-.'.u..-.. 000160
 5EC404C4 830CA7E8 0876FF0A 76FF0C75 C00802C4 8301F210 A29AFA76 FF0F75FF .u..v*.Å.·..Á..âu..v..v.ÒÏ..6.6^ 000180
 085E8867 7401113C 87F60608 68F9F700 0CB99905 482DC388 1575080A 47F62608 .&-G..u..û-H..¿..X*kÁ.-.<..tg.^. 0001A0
 89264802 4588F87E 88025789 26078926 40085788 26064788 2606772B 26378B26 &.7&+w.&.G.&.W.@&..&.W..-½.E.H&. 0001C0
 F6FA5E88 19EBFC46 8908C483 02100F0A 9AFA76FF 0677FF26 5256167E F6080447 G..-~.VR&.w..v*......6..F•Š..^*- 0001E0

Dump of file SATURN:[PCCOMMON.DUMP.DLL]DAINDF.TMP;1 on 18-APR-1990 10:41:20.28
File ID (570,8,0)   End of file block 71 / Allocated 72

Virtual block number 40 (00000028), 512 (0200) bytes

 2606468A 065FC426 085EC408 C4830233 0ECC9A53 006A006A 026A0F74 20174D87 .M. t.j.j.j.S.ä.3..6.6^.&6_..F.& 000000
 0374FC76 39FC4689 08C48300 A00F0A9A FA76FF50 1606468D 5600018E 17E80788 ..$.ƒ..V.F..P.v*......6..F•9v•t. 000020
 981E8C1A 96A31A9C 88018910 C69A000A 88EC8855 C8C95F5E E42A0646 8AFECCE9 Ôä±.F.*ô^_èùU.&¡...6...¡..È..... 000040
 001A9206 C71A6E16 891A6CA3 08568806 46881A88 16891A86 A310568B 0E46881A ..F..V.È.......F..V.Èl...n.ú.... 000060
 72A31A76 A3C02800 011A9406 C7030BE9 037425F6 7E80038D E900001A 9006C700 .ú.....Õ...--Xt.Ô..ú.....+âÈv.Èr 000080
 260A5EC4 002018FC 06C71A84 A31A6AA3 1A70A31A 8AA31A8C A31A74A3 1A8EA31A .È..Èt.È..È..Èp.Èj.È..ú.=. .6^.& 0000A0
 C71A7606 FF007528 3F80260A 5E88903E E800301B FC06C70A 46FF4975 30017F80 ...Oul.F.ú.•.0.$>..^.&.?+u...v.ú 0000C0
 1A6A06FF 9014E81A 8A06FF1A 75001A76 3E830E75 203F8026 9028EB00 001A8A06 .....$(.&.? u..>v..u.....$....j. 0000E0
 C4830978 E80E5098 078A260A 5E880A46 FF1A8406 FFC7752D 3F80260A 5EC400EB $.6^.&.?-uú.....F..^.&...P.Òx..6 000100
 1A9A3E83 0C56890A 468908C4 8308C7E8 0E1A9A68 1E0A76FF 0C76FFDD 75C00802 ..âul.v..v..h...Òù..6..F..V..>.. 000120
 FC06C706 7530 (FC 3E830D74 001A843E 831A9AA3 D8F71A9A A11A8406 FF0C7D00 .).....Á..XÀÈ...>...t..>•.Ou.ú.• 000140
 83087BE8 0E1A\468 1E0A76FF 060A46FF 1A8C06FF 20752E3F 80260A5E C400201B . .6^.&.?.u-.....F...v..h...Ò(.. 000160
 98078A26 0A5EC41A 8C0EFF00 011A9406 C70A7D00 1A943E83 0C56890A 468908C4 6..F..V..>...}.ú.........6^.&... 000180
 75001A74 3E830002 1A7406C7 0675006C 30287400 68304074 004E303D 74004630 =F.t==N.t@=h.t+=l.u.ú.t....>t..u 0001A0
 00011A74 06C79002 4EE91C75 003F8026 0A5EC40A 46FF0375 4C3F8026 0A5EC409 .6^.&.?Lu..F.6^.&.?.u.ÔN..ú.t... 0001C0
 47300A74 004530F8 46899807 8A26C8EB 00081A74 06C7D0EB 00101A74 06C7D8EB $Àú.t...$Àú.t...$ä&....F½=E.t.=G 0001E0
```

```
Dump of file SATURN:[PCCOMMON.DUMP.DLL]DAIMDF.TMP;1 on 18-APR-1990 10:41:20.28
File ID (570,8,0)   End of file block 71 / Allocated 72

Virtual block number 41 (00000029), 512 (0200) bytes

00633001 91E9037E 78740069 3DF8468B 20F84683 1A7206FF 08750058 3D057400 .t.=X.u...r..F% .F%=i.tx-.Õ..=c. 000000
861EC415 75021A74 3E839001 59E90140 E9037500 253D0152 E9037E01 3FE90375 u.Õ7.-.ÕR.=%.u.Õ∂.ÕY...>t..u.á.. 000020
83078926 1A90A11F C4261A86 1EC400EB 00000247 C72607B9 261A90A1 1FC4261A .&á.À..&..&úG...Š.á...&á.À..&... 000040
0A47F626 1A6C1EC4 01BDE903 74001A90 3E830170 E9037500 1A923E83 041A8606 .....>...u.Õp..>...t.Õ§.á.l.&-G. 000060
E802C483 019EE80E 0A6A0000 1A6A06C7 1A8E06FF 01ACE9FF FF8801AF E9037520  u.Õ£.¡..Õ¯.....ú.j...j..Õ...á.$ 000080
E9037508 1A743E83 00041A94 06C71A8C 06FF1A72 06FF1A70 06FFF2E8 086A90C3 ú.j.Š·..p...r.....ú.......>t..u.Õ 0000A0
843E83FA 46891A9A A128741A 9A0639FA 46891A74 A3C0287A 74011A74 3E830081 ...>t..tz+áÈt..F*9...t(À...F*.>. 0000C0
831A9AA3 C028027D C0081A9A A1051A9A 2E839090 13E80000 1A9A06C7 0A74001A ..t.ú.....Š........À...á).+áÈ... 0000E0
1A843E83 227400FA 7E8302C4 83048DE8 0E3A6A02 C4830130 E80E106A 021A8606 ....j..ÕO..á.j:.Õ...á..-*.t".>.. 000100
2E830000 1A9A06C7 9007E81A 9AA3C028 027DC008 1A9AA300 052DFA46 88157400 .t..F*-..È...á).+áÈ..Š..ú....... 000120
026EE80E 006A90FF 3FE9106A FF10E902 1A860683 02C48300 F1E80E10 6A041A86 ...j..Õp..á......Õ..j.Õ7..j..Õn. 000140
75006430 90FF21E9 0428E80E 256AFF2A E90349E8 0EF876FF F4E8016A 90FF39E9 Õ9..j.$¶.v%.Õl.Õ*.jX.Õ(.Õl..=d.u 000160
46880A4E FF0C5688 0/468809 74001A74 3E830A7E 00673005 7C006530 FF0CE903 .Õ..=e.|.=g.-Õ.>t..t..F..V..N..F 000180
703DFEE4 E9037500 6F3DFE80 E9037500 6E3D903A EBFE5689 FC468940 (¯56880A ..V.@.F=.V±$:.=n.u.Õ.±=o.u.Õõ±=p 0001A0
46FF90B1 EBFF79E9 03750078 3DFEB9E9 03750075 3D8F7400 733DFEE0 E9.¨7500 .u.ÕA±=s.t.=u.u.Õ¿±=x.u.Õy.ŠŸ..F 0001C0
76FF500A 4628C388 EC75253C 0474C00A F6468807 8A26FC5E C4FC46FF 9034-80A .S4..F=á^=&...F-.ãt.<%uš.ú+F.P.v 0001E0
```

```
Dump of file SATURN:[PCCOMMON.DUMP.DLL]DAIMDF.TMP;1 on 18-APR-1990 10:41:20.28
File ID (570,8,0)   End of file block 71 / Allocated 72

Virtual block number 42 (0000002A), 512 (0200) bytes

F6468807 8A260A5E C40C5689 0A4689FE 5688FC46 8806C483 044CE80E 0A76FF0C ..v..ÕL..á..F=.V±.F..V.á^.&...F- 000000
56570000 12C8C8C9 1A90A1FE 51E90374 200A47F6 261A6C1E C4FC63E9 0374C00A .ãt.Õc=á.l.&-G. t.Õõ±À..èùà...WV 000020
3E830774 021A743E 831A8E06 FF04740A 067E8300 201BFC06 C7067400 1A8C3E83 .>...t.ú.=. ..~..t......>t..t..> 000040
3E83902C E8041A86 0683FE56 89FC4689 02578826 078B261A 861EC419 75101A74 t..u.á...&..&.W..F=.V±.....$,..> 000060
46899907 88261A86 1EC40EEB 0000FE46 C7FC4689 078B261A 861EC411 74001A8E ...t.á...&...F=úF±..Š.á...&....F 000080
C0289003 E806468B 0674FE46 08FC468B 0E74001A 6A3E8302 1A860683 FE5689FC =.V±......>j..t..F=.F±t..F.Š..+á 0000A0
067E8328 7D00FE7E 83317500 1A8E3E83 F45689F2 46891A98 168B1A96 A11BFAA3 È*.À.......F·.V¶.>...ul.-±.)+.-. 0000C0
FE5689FC 46890AF7 000283D8 F7FE568B FC46882D 07C626F2 46FFF25E C41D750A .u.á^·.F·&6.-.F=.V±%À.Ø.%Õ.F=.V± 0000E0
76FFFE76 FF501E06 76FFFA5E 8CF84689 1A78B800 00F646C7 9006E800 01F646C7 úF-..Š..úF-..¦x..F%.^*.v..P.v±.v 000100
0E8804C4 83025500 3A9AF876 FFFA76FF 4574001A 8C3E830A C4830739 10989AFC =...9..á..>...tE.v*.v%.:.U..á... 000120
05E8F27E C4F04E88 00001BFA 06C70675 0B1BFA3E 83007EC9 08F04E89 C8281A94 ..+à.NÞ.è-..>*..u.ú.*....NÞá-·Š. 000140
C4F276C5 EE5E8C1A 720E88F0 4E89F446 8CF27E89 F47FC008 49C18847 3005C626 &6.0G.è!.ä.¶.-··.F¶.NÞ..r..^Ÿév·á 000160
8CF27689 E375003F 8026F846 FF46202C 80037C61 3C0774C9 08048807 8A26F85E ^%&.....èt.<a|.., F.F%&.7.uD.v·. 000180
02E80001 88057500 F67E8308 741A8A06 0B1A76A1 1475001A 8E3E83EE 5E8EF45E ^¶.^Ÿ.>...u.Àv.....t..--.u.¡..Š. 0001A0
1A86A100 018E1874 00067E83 56570000 10C8C8C9 5F5E02C4 8302FFE8 0E50C028 +áP.Õ...á.^_èùà...WV.-..t./..À.. 0001C0
078B261A 861EC413 74081A74 3E83008F E9021A86 0683FA56 89F84689 1A881688 .....F%.V*.....Õ...>t..t.á...&.. 0001E0
```

```
Dump of file SATURN:[PCCOMMON.DUMP.DLL]DAIMDF.TMP;1 on 18-APR-1990 10:41:20.28
File ID (570,8,0)   End of file block 71 / Allocated 72

Virtual block number 43 (0000002B), 512 (0200) bytes

1A860683 FA5E8CF8 4689FC46 89078826 1A861EC4 10E8FA56 89F84689 02578826 &.W..F%.V*Š.á...&...F=.F%.^*.... 000000
8900FD88 097500FC 7E83900A E800F688 1575FA46 08F8468B 0E74081A 743E8304 ..>t..t..F%.F*u.¡-.Š...~=.u.¡=.. 000020
900EE81A 940E881C 741A8C36 39F628F4 5689F246 89FA5688 F84688FA 5E8CF846 F%.^*.F%.V*.F·.V¶+-96..t.....Š.. 000040
75003F80 26F246FF F25EC446 90E0E810 7ECE3846 1574003F 8026F246 FFF25EC4 á^·.F·&.7.t.F;ó-.ŠÙ.Fá^·.F·&.7.u 000060
83E80EF8 76FFFA76 FF5602C4 830159E8 0E570875 001A843E 83FE281A 9A3E88F3 µ.>..+±.>...u.W.ÕY..á.V.v*.v%.Õ* 000080
881A86A1 000006C8 90C8C95F 5E02C483 013CE80E 57087400 1A843E83 06C48301 ..á..>...t.W.Õ<..á.^_èù.à...À... 0000A0
83FA4688 C02A9003 E8018005 7547067E 83067467 067E83FE 5689FC46 891A8816 ....F=.V±.-.gt..-.Gu¯.Š..*à.F*. 0000C0
FF00011A 9406C706 75001A94 3E830074 00FA7E80 00061A94 06C70675 001A8C3E >...u.ú......-*.t..>...u.ú...... 0000E0
281EFF26 1988068E FC76FFFE 76FF1A96 36FF1A98 36FF0676 FF1A9436 FF1A7236 6r..6...v..6...6...v±.v=.....&..( 000100
1EFF2619 88068E1A 9636FF1A 9836FF14 75001A6A 3E831874 00FA7E80 0EC48305 ..á..-*.t..>j..u..6...6......&.. 000120
26198806 8E1A9636 FF1A9836 FF147500 1A943E83 1874001A 6A3E8304 C483052C ,..á..>j..t..>...u..6...6......& 000140
76FFFE76 FF18741A 8A060B1A 76A10000 18FA06C7 081A8606 8304C483 05341EFF ..4..á......ú.*...Àv.....t..v±.v 000160
90C8C901 29E80E50 C02802E8 00018805 74C00804 C4830538 1EFF2619 88068EFC =....&..B..á..ät.¡..Š.+àP.Õ).èù. 000180
2607FF26 37882606 468A1478 044FFF26 1A6C1EC4 3C75001A 923E8356 000000C8 à...V.>...u<á.l.&.0.x..F.&.7&..& 0001A0
9206FF07 754006C4 830A1100 069A0676 FF531A6E 36FF10EB E42A0488 2602478E .G.&..*ÕŠ..6n.S.v..ø....á.@u.... 0001C0
507EF608 06768857 75001A92 3E835657 000002C8 90C8C95E 1A9006FF 9005E81A .Š......^èù.à...WV.>...uW.v..--P 0001E0
```

Dump of file SATURN:[PCCOMMON.DUMP.DLL]DAIMDF.TMP;1 on 18-APR-1990 10:41:20.28
File ID (570,8,0) End of file block 71 / Allocated 72

Virtual block number 44 (0000002C), 512 (0200) bytes

```
4EC6881A 9206FF04 754006C4 830A7900 D69A1BFC 36FF1A6C 36FF1A6E 36FF1BEB $..6n..6l..6•..•.y..á.au......6N 000000
E42A05B8 2602478E 2607FF26 3F88261B FCA0047B 044FFF26 1A6C1EC4 1E7EC00B .á~.á.l.&.0.xá.•.&.?&..&.G.&..*8 000020
923E830A 76885657 000002C8 CBC95F5E 1A900601 06468807 75001A92 3E8304EB $á.>...u..F.....^_èùà...WV.v..>. 000040
754006C4 830AEB00 D69A5098 078A2606 5EC41A6C 36FF1A6E 36FF22EB 5E75001A ..u^$".6n..6l.á^.Ì...P.•.$..á.au 000060
C4078A26 065EC4CD 78044FFF 261A6C1E C42574C0 084EC688 0646FF1A 9206FF04 ......F..6N.átXá.l.&.0.xeá^.&..á 000080
06010A46 88077500 1A923E83 CAEBE42A 05882602 478E2607 FF263F88 261A6C1E .l.&.?&..&.G.&..*0$ò.>...u..F... 0000A0
FA4689FC 4689C028 F65689F4 46891A98 16881A96 A1560000 0CC8CBC9 5F5E1A90 ..^_èùà...VÀ.......F¶.V~+á.F•.F* 0000C0
83057510 1BFA3E83 06762BF0 2BF84689 04C48307 24003A9A F476FF52 1A9A3688 .6._R.v¶.:.$..á..F%+Þ+v..>*..u.. 0000E0
1BFC3E83 19752D3F 8026F45E C4227500 1A843E83 4E017508 1BFA3E83 08EB02EE Ÿ.$..>*..u.N.>...u"á^¶&.?-u..>•. 000100
077EF608 0874301B FC3E83F8 4EFF02C4 83FE71E8 0E509807 8A26F446 FF127530 0u..F¶&...P.Òq±.á..N%.>•.0t..~-. 000120
E80EFC46 FF077400 1BFA3E83 0066E80E FA46FF07 7400067E 83187400 1A843E83 .>...t..~..t..F*.Òf..>*..t..F•.Ò 000140
39E80E04 7500FA7E 830A7400 067E8302 C483FE7E E80E5629 75001A84 3E830070 p..>...u)V.Ò-±.á..~..t..~*.u..Ò9 000160
83FEB5E8 0EF476FF F676FFF8 76FF0040 E80E0475 00FC7E83 0A74001B FA3E8300 ..>*..t..-•.u..Òa..v%.v-.v¶.Òç±. 000180
74001A76 3E83CBC9 5E02C483 FE38E80E 5600201B FC06C70E 74001A84 3E8306C4 á..>...t.ú.•. .V.Ò8±.á.^èù.>v..t 0001A0
101BFA3E 8302C483 FDC8E80E 306ACB02 C483FD02 E80E5000 208803EB 00288805 .|+.$.| .P.Ò0».á.ùj0.Òà».á..>*.. 0001C0
56570000 06C8CB02 C483FDAA E80E5000 788803EB 00588805 74001A72 3E831775 u..>r..t.|X.$.|x.P.Ò¯».á.ùà...WV 0001E0
```

Dump of file SATURN:[PCCOMMON.DUMP.DLL]DAIMDF.TMP;1 on 18-APR-1990 10:41:20.28
File ID (570,8,0) End of file block 71 / Allocated 72

Virtual block number 45 (0000002D), 512 (0200) bytes

```
9060EB0A 46FF021A 86068337 88261A86 1EC41275 2A3F8026 0A5EC400 01FE46C7 úF±..á^.&.?*u.á...&.7......F.$'. 000000
3F7C303C FA468807 8A260A5E 88F6280A 46FFFFFF FE46C708 75203F80 260A5EC4 á^.&.7-u.úF±...F.+-.^.&...F*<0|? 000020
8A26187F 39308026 06EBF888 00301BFC 06C70675 303C0A75 1A8C3639 387F393C <9.;96..u.<0u.ú.•.0..«$.&.=9..&. 000040
880C468C 0A7E890F 7D303080 2647F188 30E983C8 03E1D1CE 0302E1C1 CE889805 ...òeÀ..ö1À.à.Ò0.þG&.=0}Ò.~..F.. 000060
46890104 88570000 04C8CBC9 5F5E0C56 880A4688 37892606 5EC4F088 EEF7FE46 F±%Ÿ.Þá^.&.7.F..V.^_èùà...W|...F 000080
468CFC7E 89000188 F4750038 26117400 30802647 01EBFC7E C4064E8A :¯5E8CFC •.^±.N.á-•$.G&.=.t.Ì8.u¶|...~•.F 0000A0
3CAC0833 99C03306 76C51E56 57EC8855 90C8C95F C02BFE46 8CFC7E89 9??9EBFE ±$...-•.F±+á_èù.U.$WV.év.3à.3U¯< 0000C0
88C888D2 D1E3D11B 72302C1F 77393CAC 01752B3C 04742D3C 50F77409 3CF37420 t«<.t%P<-t.¯<+u.¯<9w..?r.1D1•.ù. 0000E0
F7000283 08F70775 93203C58 0CEB0002 83080307 13090302 D1E30102 D1E301FA *1D1•1D1•.1.•.À.•.$ÉX<-.u.%À.•.% 000100
0A681E01 0C681E17 46A3E086 580000FF FF9A5016 C48850EC 8855CB5D 5F5E1FDA Ò.^_]ùU.$P.á.P.....X.ÀÉF..h...h. 000120
0C9A004F 00889A50 CB50E588 00018809 D511DA9A 039EE800 21E80000 FFFF9A01 ......Ò!.Ò...Ò.{.|...|]ùP.|.0... 000140
80264701 75003080 267FFFB9 010C068E FF330000 881E0112 16FF00FF 68005C0E .\.h.......£..3.....¿...&.=.u.G&. 000160
BF1FF788 071E061C E8E774AE F2C03308 74CA88A6 F3C88801 8805168E 31740030 =.t1/...1.ùµ|.Òt.3à·UtÒ$.....¥.¢ 000180
9A5000FC 88EC8855 00C31FED EBAAC20A 0572412C AC9204E0 C00E7241 2CAC174D M.¯,Ar.àÀ..¯,Ar..Ò¨$U.ù.U.$|•.P. 0001A0
56EC8855 CB50E588 00C20E0C 9A5000FF 8805241E FF047400 05263E83 00610E0C ..•..>&..t...$.|..P...Ò..|]ùU.$V 0001C0
88AEF2FF FF89C033 970C7496 401074C2 38AD1992 8E06568B C08ED88E 01718857 W|q..À.à.V./..Ù;Òt.a.t..3à¿...Û. 0001E0
```

Dump of file SATURN:[PCCOMMON.DUMP.DLL]DAIMDF.TMP;1 on 18-APR-1990 10:41:20.28
File ID (570,8,0) End of file block 71 / Allocated 72

Virtual block number 46 (0000002E), 512 (0200) bytes

```
33FA8892 1F74C008 0D600DC 9A0676FF 57EC8855 0002CA50 E5885E5F 96E8EBF7 %$$._^.|]ò..U.$W.v..É.•..àt...*3 000000
CA5DE588 5F580000 FFFF9A50 1651521E 530002B8 C4885049 D1F7AEF2 FFFFB9C0 à¿..¯U%1|P.áE..S.RQ.P.....[_.|]ò 000020
3C05E001 C103E001 C88BF9F7 000CB999 05482004 4688195E 06FF0000 04C80002 ..à.....^..F.-H..¿..%*.àIÀ.ëIÀ.< 000040
74D00808 57892606 47892604 5EC402C4 830E1613 959A0200 68FE5E8C FC468911 ..F•.^±h........á.á^.&.G.&.W..Àt 000060
FE5688FC 4688040A 4F802604 5EC49021 E8020002 47C726FC 5EC4080A 4F802611 .&.0..á^•&úG...$1.á^.&.0...F•.V± 000080
07892608 57882606 47882604 5EC40001 0247C726 FC5EC408 57892606 47892640 a&.G.&.W.á^•&úG...á^.&.G.&.W.&.. 0000A0
0454E9C0 3300098A 0872174B 1E38065E 88EC8855 C3C90000 0447C726 02578926 &.W.&úG...èùU.$.^.;.K.r.¤..3àÒT. 0000C0
91E175C0 855A5900 00FFFF9A 51160C76 FF0876FF 0A76FF53 CC8804EC 830460E9 Ò'..$..àS.v..v..v..Q.....YZ.àuÀ. 0000E0
13E9C033 00098A08 7217481E 38065E88 0CEC83EC 885500C8 5DE588FD 174DA780 .ÌM.».|]ù.U.$.$..^.;.K.r.¤..3àÒ. 000100
74801740 87F60000 0EF59A50 16F4468D 51414151 51C93353 12742017 4087F604 .~.M. t.$3èQQAAQ.F¶.P.%...-.M..t 000120
E30C4E88 F86689F2 88FA8856 57FCFC46 89FE4689 C0330856 C50A468E FA5E8C66 f.^*.F.éV.3à.F±.F••WV.*.·.f%.N.D 000140
3B0D740A 3CAC0C4E 880716FA 88D488E2 280080BA DC8802EC 833875AE F20A8049 |¯.·Ùu;.$..Éu..+ã.à.*.;..N.¯<.t.; 000160
0014E8E2 E8FC46FF 0AB0AA00 1FE80375 F83B0D80 009AE900 2BE8F4E2 AA1A74F8 «t.¯ã¶Ò+.Ò..¯.;«u.Ò..·¯..F•$àÒ.. 000180
1FE3CA28 CF881F06 1E515350 0E6D10C6 9AFFFC88 7AEB0093 E9FA5E8E 5F5EE1EB $À^ .^*Ò..$z|•..ó.m.PSQ....ù+òD. 0001A0
1F0774D8 08FE5E01 F45E8811 75C00800 000E369A 5016F446 8051521E 53065E88 .^.$.RQ.F¶.P.6....àu..^¶.^±.Ut.. 0001C0
03E8001C 8A087500 098A0001 30007400 60301874 C00808C4 831FC3FA 88585859 Y(X.*ù..á..àt.=m.t.=..¤..u.¤..$. 0001E0
```

Dump of file SATURN:[PCCOMMON.DUMP.DLL]DAIMDF.TMP;1 on 18-APR-1990 10:41:20.28
File ID (570,8,0)   End of file block 71 / Allocated 72

Virtual block number 47 (0000002F), 512 (0200) bytes

```
1CBA0EEB F803751A 3F80085E 880A5E8E 0E744017 4D87F6FE 5E8E26E8 F900208A 000000
0C4E8802 F7E9CE5D E58B0472 FA5E8E5F 5EF8668B FC462BFE 46880 6EB F9C03300 000020
74C0081F 071E0000 0FCD9A50 16F44680 51521E53 0856C51E EEE8C188 0475C908 000040
F68775C0 08F4468B C2E80020 8AC7EB00 1CBACC75 00098A00 01300074 00603017 000060
E9008357 56EC8855 00A3E8C0 33001C8A A6E80275 1A3F8026 DA880A74 40174D87 000080
3302E800 01880574 40174087 F60C7C00 F883117D 17481E38 065E88EC 88550442 0000A0
33057540 0542A1CB 5152E388 05720546 1E380872 08280C88 5A5900CB 5DE588C0 0000C0
FFFF9A52 16501653 C48850B7 1740A780 D4885200 02880542 2EFF5152 FC74E9C0 0000E0
780E885A D4794817 4D8F0808 81067500 02300774 00013040 81127558 C0080000 000100
761EFF00 0388C28C 197E06C4 01AEE903 7319761E FFD833C2 8C197A06 C41EE319 000120
67680E01 6A087419 863D1982 880073E8 19828F19 828E007C E819828F 19828E19 000140
00001162 9A006A00 6A036A00 51E81986 8F19828E D88E00E2 88C30000 FFFF9A11 000160
19868F19 868EEC88 5503E800 31E81986 8F19828E 003AE818 FE8F18FE 8EEC8855 000180
02880 7E3 19780E88 0000FFFF 9A500646 8A50C033 001AE819 868F1986 8E0023E8 0001A0
56570000 14C800C3 EEE81DFF F2740245 08058804 EF830E73 F738C319 761EFF00 0001C0
6AF85689 F64689F2 5689F046 89C02801 0C168800 F0E90375 010C3639 FF28F628 0001E0
```

Dump of file SATURN:[PCCOMMON.DUMP.DLL]DAIMDF.TMP;1 on 18-APR-1990 10:41:20.28
File ID (570,8,0)   End of file block 71 / Allocated 72

Virtual block number 48 (00000030), 512 (0200) bytes

```
8CE90376 7FFFFE81 461974C0 080AC483 124E14A8 9A051668 1EF676FF F876FF0C 000000
26F65E88 F475003F 8026F646 FFF65EC4 0CE847EA 75003F80 26F646FF F65EC400 000020
83129313 959A56EE 5689EC46 8904C483 125D1450 9A046A50 014580BA 75003F80 000040
1953A3EE 5688EC46 886674C2 08FC4688 6D74EE46 08EC4688 FE5689FC 468902C4 000060
88EC5EC4 2C74C008 0AC4830F 8214A89A 0516681E F076FFF2 76FF0C6A 19551689 000080
26FC46FF FC5EC407 8A26F046 FFF05EC4 04EC4683 02578926 078926FE 5688FC46 0000A0
C95F5EA7 75003F80 26F05EC4 F475003F 8026F046 FFF05EC4 E8E80E74 C00A0788 0000C0
160C0808 070A0C09 0C080C07 09060005 18040203 02021601 FA70E900 028890C8 0000E0
09721C70 2060006C 08590057 00530052 02430041 02350212 12110010 120F1600 000100
8899FFFF 88174216 891749A3 16080000 080702CE 08A40084 09820A81 0A801606 000120
1674073A 2E1875E4 0A0024 89 12E88817 49A3C850 E58899FF FF880008 E8C850E5 000140
00C31742 A3980147 8A2E4301 76CA3C04 728C3C43 0A76243C 0472133C F7E24343 000160
06468857 5602EC83 EC8855C8 50E58801 FE4F8026 0574C308 C08C065E C4EC8855 000180
78E80574 0018E815 750082E8 196AA312 740025E8 08750019 6A3E831E 73FFF13D 0001A0
43065E88 0776065E 3900F088 C85DE588 5E5F02C4 83120E15 9A9A0676 FF087500 0001C0
883874FF FA8308C4 8313C917 469A5002 80510E4F 8050501E C033FE5E 89FEE383 0001E0
```

Dump of file SATURN:[PCCOMMON.DUMP.DLL]DAIMDF.TMP;1 on 18-APR-1990 10:41:20.28
File ID (570,8,0)   End of file block 71 / Allocated 72

Virtual block number 49 (00000031), 512 (0200) bytes

```
0C478948 480008A3 C033088E FE5E8800 08A30A8E 0574D208 196EA319 6C1687C2 000000
064E88C0 8ED88CC3 1FD88C00 06A30000 05000AA3 01478D00 02A30000 A3000A88 000020
9A0676FF 006A0876 FF006A56 00000AC8 C3D98EC1 8CD20801 9AE8196E 1E8ED833 000040
83149613 959A56F8 7688902F E899C028 0674FFFF C2F7FA56 89F84689 147D1844 000060
46889007 E808C483 13F517FC 9A50FE76 FF006A56 1274000B FE5689FC 468902C4 000080
D9F7AEF2 C033F788 067EC4D9 8827E30E 4E881E56 57EC8855 90C8C95E FE5688FC 0000A0
885F5E1F C188D1F7 49490474 0477FF45 3A26C933 FF448AA6 F30A76C5 FE88C803 0000C0
080E750A F9831374 C00A93FC 071E570A 7EC51E08 56880646 880E4E88 00C850E5 0000E0
3004D387 92F1F793 F1F70274 C008D233 92F788DA F7000283 08F7AA2D 800A7902 000100
580A8CF2 72C73801 448DFF44 880586AC 4F0588E2 75C308C2 88AA2704 0276393C 000120
47F626FA 5EC41CE8 F628FC5E 8CFA4689 05488856 000006C8 00C850E5 885E5F1F 000140
FA463917 38168817 36A10CFA 46834601 744004C4 83146218 789A5306 0E74830A 000160
885756EC 8855C850 E58801FE 4F800474 D808065E 88EC8855 90C8C95E C6880876 000180
961962A3 1960A3FE 244024E8 99C03305 750176E8 00058807 1E297500 3F831960 0001A0
C85DE588 5E5F0009 E8C08E08 8C064E88 19663689 FFFEFE44 C704C683 000104C7 0001C0
D0881573 C1384843 7401A8FE 88ADFC02 7788F273 EEF983FE E180FA74 410000E9 0001E0
```

Dump of file SATURN:[PCCOMMON.DUMP.DLL]DAIMDF.TMP;1 on 18-APR-1990 10:41:20.28
File ID (570,8,0)   End of file block 71 / Allocated 72

Virtual block number 50 (00000032), 512 (0200) bytes

```
8948C128 FE4C89F9 030C74FE 8BE6EBFE 4489F788 000205C2 03357401 A8ADF003 .ÞU´.t5.ó....%.D±$].±t..*.L±+èH. 000000
7206C626 C3027F89 196E1E8C 260574D1 3B116889 DABCC688 FE4CFEF9 0305E805 .$..*±L±.6.Ö¿h.;ìt.&..n....ú&ó.r 000020
E27401A8 ADF00300 888C73C1 3848FE88 F27401A8 ADF003FE 882574FF FE300219 ..=±.tX.±.ÞU´.t·.±H;ès¥.Å.ÞU´.tä 000040
D88C1274 19723EFE 2615E808 8E0474C0 08084788 E6EBFE44 89F78800 0205C203 .ó....%.D±$].G..ât..Å$.&±.r.t..Ä 000060
40400124 0074C638 0068E8C0 33067788 8BEB3788 196A1E8E 260574C7 3816208F ¢-.;út.&..j..7$E.w.3àÓk.;ót.$.ãã 000080
196EA326 0474C138 1681B908 8C98EB4E 4E960574 0010E8FE 4DFE0074 005FE898 .ó_.t.±M±Ó..t..NN$..Ä¿..;èt.&Èn. 0000A0
04761970 1638267F FFBA4141 49C82803 7401A8FE 458851C3 99C03302 4789078B ...G.3à.úQ.E±´.t.+àIAÅα..&;.p.v. 0000C0
33E575EA D1D2F708 75000CE8 C628C223 D2F70072 C2031572 C603C188 F575EAD1 ÌôuK.è.ór..ór.%@#ó+6Ó..u.%@ÌôuI3 0000E0
55894AD7 28D68806 7789FFFE FE44C7F2 03F088FE 88571874 0010E851 52C359C0 àYÜRQÓ..t.W.±.Þ.·úD±±..W..ø+øJ.U 000100
5A1FFFFA 8308C'33 15691746 9A1F0650 00018850 52521ED2 335053C3 5A5958FE ±XYZûSP3@.RRP|..P...F.i..á..*..Z 000120
57E80775 48064 18 08568801 148F3875 000A7E83 065756EC 8855C3D2 0802745B [t..@ÙU.&VW..-..u8¢...V..F.Hu.ÒW 000140
04C68334 735E003E E8560E46 8902448B 0074F73B 11744805 1436884C EB277200 .r'$L.6..Ht.;%t..D..F.VÒ>.^s4.6. 000160
F95B0000 FFFF9A50 C0335016 52C48850 21EB99FF FFB80675 D2080473 0514FE81 .±..s..@u.|...$IP.áR.P3àP.....[* 000180
024C39F7 880E4E88 CB5DE588 5E5F07C0 33038805 14368902 5C891489 E675C085 .âul...\..6...Æ3à._^.I]ù.N..%9L. 0001A0
010E1E39 0675F738 C18ED388 26721C03 DA882CE8 F9F27505 14FE8104 C6830C74 t..6..±...u·*$,.Ö..r&.Æ.è;%u.9... 0001C0
88EC8855 00C30188 04879201 0E168904 75F73BDE 75C08500 00FFFF9A 51531373 s.SQ......âu8;%u.........ìû.U.$. 0001E0
```

Dump of file SATURN:[PCCOMMON.DUMP.DLL]DAIMDF.TMP;1 on 18-APR-1990 10:41:20.28
File ID (570,8,0)   End of file block 71 / Allocated 72

Virtual block number 51 (00000033), 512 (0200) bytes

```
D1E08A0A 4688D128 D187D103 D323D818 D1280C74 DAF7D788 067EC457 38E30C4E N.D8Wá~..øXÓt.+ì.ÙW£.ì.ì+ì.F..Àì 000000
88064688 5FAAF3C9 13ABF3E9 D1C38EFF FFC381C3 8C10E301 87AAF3C9 13ABF3E9 Óµ¨.èµ¨.ÌD..û.û...ûiÓµ¨.èµ¨.F.. 000020
F70008CA 5DE588E3 F7064688 08750A5E 88D8080C 5E880846 88EC8855 C85D0856 V.]ùU.$.F..^..Ä.^.u..F.%D.[]ò..% 000040
C4F62856 000004C8 0008CA50 E5880103 E3F70646 88C8030C 66F70646 88C888E3 D.à.F.%f..à.F.%D.[.[]ò..à...V+-á 000060
D868F9F7 000C8999 05482DC3 88157508 0A47F626 5575023C 03240A47 8A26065E ^.&.G.$.<.ùU&-G..u..û-H..¿..%*kÁ 000080
FF260877 FF26502A 7EC008FC 46890647 28260788 26065E88 39740111 3C87F606 .-.<..t9.^.&..&+G..F=.á-(P&.w.&. 0000A0
FFBE200A 4F802606 5EC40874 FC463808 C4831736 0F0A9A50 E42A0847 8A260677 w.&.G.*8P...6..á.;F=t.á^.&.O. ƒ. 0000C0
000CCBC9 5EC68800 000447C7 26025789 26078926 08578826 06478826 065EC4FF .á^.&.G.&.W.&..&.W.&ùG....ó^èù.. 0000E0
00000006 16860002 00070002 117C0103 00050002 11840103 00000004 18CC0002 ..à.......Ç.......|.......Ñ..... 000100
00880002 182F0105 0478000A 10560203 00260002 17E50103 00220002 179A0103 ......"...Ì...&...V...x.../..... 000120
005C0002 002F0103 00580002 00420103 00400002 10FE0103 003A0002 0F360103 ..6...:...±...M...B...[.../...\. 000140
6F43202D 20797261 7262694C 20656069 54206E75 5220534D 00000000 00000000 ........MS Run-Time Library - Co 000160
70726F43 2074666F 736F7263 694D202C 38383931 20296328 20746867 69727970 pyright (c) 1988, Microsoft Corp 000180
012F0000 00CE0048 00000000 00000000 0000012E 012D012C 00740071 00480011 ..K.q.t.,.-.............K.ö.Å./. 0001A0
00000000 00000134 01330132 00050003 00800000 00000000 00000000 01310130 0.1.............Æ.[.2.3.4....... 0001C0
000F000D 00800000 00000000 00000000 01370136 0135000A 00080080 00000000 ......Á.Ö.5.6.7.............Ì.Ö. 0001E0
```

Dump of file SATURN:[PCCOMMON.DUMP.DLL]DAIMDF.TMP;1 on 18-APR-1990 10:41:20.28
File ID (570,8,0)   End of file block 71 / Allocated 72

Virtual block number 52 (00000034), 512 (0200) bytes

```
00000000 00ED00EC 00EB00EA 00E80048 00000000 00000000 0000013A 01390138 8.9.:...........K.Ò.ô.$.$.Ù..... 000000
00000093 00920091 0090008E 00480000 FFFF0004 00060028 00080000 00000000 ........+.........K............. 000020
756E2800 296C6C75 6E280000 00000000 00000000 00000000 00000000 00000000 ......................(null).(nu 000040
00000000 00000000 19881C00 11971C00 1C000000 00000000 23202D28 00296C6C ll).+- #........................ 000060
00000000 00000000 00000000 00000000 00000000 00000000 00000000 00000000 ................................ 000080
00000000 00000000 00000000 00000000 00000000 00000000 00000000 00000000 ................................ 0000A0
00000000 00000000 00000000 00000000 00000000 00000000 00000000 00000000 ................................ 0000C0
00000000 00000000 00000000 00000000 00000000 00000000 00000000 00000000 ................................ 0000E0
00000000 00000000 00000000 00000000 00000000 00000000 00000000 00000000 ................................ 000100
00000000 00000000 00000000 00000000 00000000 00000000 00000000 00000000 ................................ 000120
00000000 00000000 00000000 00000000 00000000 00000000 00000000 00000000 ................................ 000140
00000000 00000000 00000000 00000000 00000000 00000000 00000000 00000000 ................................ 000160
00000000 00000000 00000000 00000000 00000000 00000000 00000000 00000000 ................................ 000180
00000000 00000000 00000000 00000000 00000000 00000000 00000000 00000000 ................................ 0001A0
00000000 00000000 00000000 00000000 00000000 00000000 00000000 00000000 ................................ 0001C0
00000000 00000000 00000000 00000000 00000000 00000000 00000000 00000000 ................................ 0001E0
```

```
Dump of file SATURN:[PCCOMMON.DUMP.DLL]DAIMDF.TMP;1 on 18-APR-1990 10:41:20.28
File ID (570,8,0)   End of file block 71 / Allocated 72

Virtual block number 53 (00000035), 512 (0200) bytes

00000000 00000000 00000000 00000000 00000000 00000000 00000000 00000000 ................................ 000000
00000000 00000000 00000000 00000000 00000000 00000000 00000000 00000000 ................................ 000020
00000000 00000000 00000000 00000000 00000000 00000000 00000000 00000000 ................................ 000040
00000000 00000000 00000000 00000000 00000000 00000000 00000000 00000000 ................................ 000060
00000000 00000000 00000000 00000000 00000000 00000000 00000000 00000000 ................................ 000080
00000000 00000000 00000000 00000000 00000000 00000000 00000000 00000000 ................................ 0000A0
00000000 00000000 00000000 00000000 00000000 00000000 00000000 00000000 ................................ 0000C0
00000000 00000000 00000000 00000000 00000000 00000000 00000000 00000000 ................................ 0000E0
00000000 00000000 00000000 00000000 00000000 00000000 00000000 00000000 ................................ 000100
00000000 00000000 00000000 00000000 00000000 00000000 00000000 00000000 ................................ 000120
00000000 00000000 00000000 00000000 00000000 00000000 00000000 00000000 ................................ 000140
00000000 00000000 00000000 00000000 00000000 00000000 00000000 00000000 ................................ 000160
00000000 00000000 00000000 00000000 00000000 00000000 00000000 00000000 ................................ 000180
00000000 00000000 00000000 00000000 00000000 00000000 00000000 00000000 ................................ 0001A0
00000000 00000000 00000000 00000000 00000000 00000000 00000000 00000000 ................................ 0001C0
00000000 00000000 00000000 00000000 00000000 00000000 00000000 00000000 ................................ 0001E0

Dump of file SATURN:[PCCOMMON.DUMP.DLL]DAIMDF.TMP;1 on 18-APR-1990 10:41:20.28
File ID (570,8,0)   End of file block 71 / Allocated 72

Virtual block number 54 (00000036), 512 (0200) bytes

00000000 00000000 00000000 00000000 00000000 00000000 00000000 00000000 ................................ 000000
00000000 00000000 00000000 00000000 00000000 00000000 00000000 00000000 ................................ 000020
00000000 00000000 00000000 00000000 00000000 00000000 00000000 00000000 ................................ 000040
4E495F45 4C49465F 435F0114 00000000 00000000 00000000 00000000 00000000 .......................C_FILE_IN 000060
00000000 053612E2 053212E2 052E12E2 052A12E2 FFFF12E2 00000000 00304F46 FO=.....ã...ã.*.ã...ã.2.ã.6..... 000080
01020000 00000000 00000000 00011986 00000000 05500000 0200FFFF FFFF0101 ..........P..................... 0000A0
00000000 00000000 00000000 00000000 00000000 02020000 00000000 00000000 ................................ 0000C0
00000000 00000000 00000000 00000000 00000000 00000000 00000000 00000000 ................................ 0000E0
00000000 00000000 00000000 00000000 00000000 00000000 00000000 00000000 ................................ 000100
00000000 00000000 00000000 00000000 00000000 00000000 00000000 00000000 ................................ 000120
00000000 00000000 00000000 00000000 00000000 00000000 00000000 00000000 ................................ 000140
00000000 00000000 00000000 00000000 00000000 00000000 00000000 00000000 ................................ 000160
00000000 00000000 00000000 00000000 00000000 00000000 00000000 00000000 ................................ 000180
00000000 00000000 00000000 00000000 00000000 00000000 00000000 00000000 ................................ 0001A0
00000000 00000000 00000000 00000000 00000000 00000000 00000000 00000000 ................................ 0001C0
00000000 00000000 00000000 00000000 00000000 00000000 00000000 00000000 ................................ 0001E0

Dump of file SATURN:[PCCOMMON.DUMP.DLL]DAIMDF.TMP;1 on 18-APR-1990 10:41:20.28
File ID (570,8,0)   End of file block 71 / Allocated 72

Virtual block number 55 (00000037), 512 (0200) bytes

00000000 00000000 00000000 00000000 00000000 00000000 00000000 00000000 ................................ 000000
00000000 00000000 00000000 00000000 00000000 00000000 00000000 00000000 ................................ 000020
00000000 00000000 00000000 00000000 00000000 00000000 00000000 00000000 ................................ 000040
00000000 00000000 00000000 00000000 00000000 00000000 00000000 00000000 ................................ 000060
00000000 00000000 00000000 00000000 00000000 00000000 00000000 00000000 ................................ 000080
00000000 00000000 00000000 00000000 00000000 00000000 00000000 00000000 ................................ 0000A0
00000000 00000000 00000000 00000000 00000000 00000000 00000000 00000000 ................................ 0000C0
00000000 00000000 00000000 00000000 00000000 00000000 00000000 00000000 ................................ 0000E0
00000000 00000000 00000000 00000000 00000000 00000000 00000000 00000000 ................................ 000100
00000000 00000000 00000000 00000000 00000000 00000000 00000000 00000000 ................................ 000120
00000000 00000000 00000000 00000000 00000000 00000000 00000000 00000000 ................................ 000140
00000000 00000000 00000000 00000000 00000000 00000000 00000000 00000000 ................................ 000160
00000000 00000000 00000000 00000000 00000000 00000000 00000000 00000000 ................................ 000180
00000000 00000000 00000000 00000000 00000000 00000000 00000000 00000000 ................................ 0001A0
00000000 00000000 00000000 00000000 00000000 00000000 00000000 00000000 ................................ 0001C0
00000000 00000000 00000000 00000000 00000000 00000000 00000000 00000000 ................................ 0001E0
```

```
Dump of file SATURN:[PCCOMMON.DUMP.DLL]DAIMDF.TMP;1 on 18-APR-1990 10:41:20.28
File ID (570,8,0)   End of file block 71 / Allocated 72

Virtual block number 56 (00000038), 512 (0200) bytes

00000000 00000000 00000000 00000000 00000000 00000000 00000000 00000000 ................................ 000000
00000000 00000000 00000000 00000000 00000000 00000000 00000000 00000000 ................................ 000020
00000000 00000000 00000000 00000000 00000000 00000000 00000000 00000000 ................................ 000040
00000000 00000000 00000000 00000000 00000000 00000000 00000000 00000000 ................................ 000060
00000000 00000000 00000000 00000000 00000000 00000000 00000000 00000000 ................................ 000080
00000000 00000000 00000000 00000000 00000000 00000000 00000000 00000000 ................................ 0000A0
00000000 00000000 00000000 00000000 00000000 00000000 00000000 00000000 ................................ 0000C0
00000000 00000000 00000000 00000000 00000000 00000000 00000000 00000000 ................................ 0000E0
00000000 00000000 00000000 00000000 00000000 00000000 00000000 00000000 ................................ 000100
00000000 00000000 00000000 00000000 00000000 00000000 00000000 00000000 ................................ 000120
00000000 00000000 00000000 00000000 00000000 00000000 00000000 00000000 ................................ 000140
00000000 00000000 00000000 00000000 00000000 00000000 00000000 00000000 ................................ 000160
00000000 00000000 00000000 00000000 00000000 00000000 00000000 00000000 ................................ 000180
00000000 00000000 00000000 00000000 00000000 00000000 00000000 00000000 ................................ 0001A0
00000000 00000000 00000000 00000000 00000000 00000000 00000000 00000000 ................................ 0001C0
00000000 00000000 00000000 00000000 00000000 00000000 00000000 00000000 ................................ 0001E0

Dump of file SATURN:[PCCOMMON.DUMP.DLL]DAIMDF.TMP;1 on 18-APR-1990 10:41:20.28
File ID (570,8,0)   End of file block 71 / Allocated 72

Virtual block number 57 (00000039), 512 (0200) bytes

00000000 00000000 00000000 00000000 00000000 00000000 00000000 00000000 ................................ 000000
00000000 00000000 00000000 00000000 00000000 00000000 00000000 00000000 ................................ 000020
00000000 00000000 00000000 00000000 00000000 00000000 00000000 00000000 ................................ 000040
00000000 00000000 00000000 00000000 00000000 00000000 00000000 00000000 ................................ 000060
00000000 00000000 00000000 00000000 00000000 00000000 00000000 00000000 ................................ 000080
00000000 00000000 00000000 00000000 00000000 00000000 00000000 00000000 ................................ 0000A0
00000000 00000000 00000000 00000000 00000000 00000000 00000000 00000000 ................................ 0000C0
00000000 00000000 00000000 00000000 00000000 00000000 00000000 00000000 ................................ 0000E0
00000000 00000000 00000000 00000000 00000000 00000000 00000000 00000000 ................................ 000100
00000000 00000000 00000000 00000000 00000000 00000000 00000000 00000000 ................................ 000120
00000000 00000000 00000000 00000000 00000000 00000000 00000000 00000000 ................................ 000140
00000000 00000000 00000000 00000000 00000000 00000000 00000000 00000000 ................................ 000160
00000000 00000000 00000000 00000000 00000000 00000000 00000000 00000000 ................................ 000180
00000000 00000000 00000000 00000000 00000000 00000000 00000000 00000000 ................................ 0001A0
00000000 00000000 00000000 00000000 00000000 00000000 00000000 00000000 ................................ 0001C0
00000000 00000000 00000000 00000000 00000000 00000000 00000000 00000000 ................................ 0001E0

Dump of file SATURN:[PCCOMMON.DUMP.DLL]DAIMDF.TMP;1 on 18-APR-1990 10:41:20.28
File ID (570,8,0)   End of file block 71 / Allocated 72

Virtual block number 58 (0000003A), 512 (0200) bytes

00000000 00000000 00000000 00000000 00000000 00000000 00000000 00000000 ................................ 000000
00000000 00000000 00000000 00000000 00000000 00000000 00000000 00000000 ................................ 000020
00000000 00000000 00000000 00000000 00000000 00000000 00000000 00000000 ................................ 000040
00000000 00000000 00000000 00000000 00000000 00000000 00000000 00000000 ................................ 000060
00000000 00000000 00000000 00000000 00000000 00000000 00000000 00000000 ................................ 000080
00000000 00000000 00000000 00000000 00000000 00000000 00000000 00000000 ................................ 0000A0
00000000 00000000 00000000 00000000 00000000 00000000 00000000 00000000 ................................ 0000C0
00000000 00000000 00000000 00000000 00000000 00000000 00000000 00000000 ................................ 0000E0
00000000 00000000 00000000 00000000 00000000 00000000 00000000 00000000 ................................ 000100
00000000 00000000 00000000 00000000 00000000 00000000 00000000 00000000 ................................ 000120
00000000 00000000 00000000 00000000 00000000 00000000 00000000 00000000 ................................ 000140
00000000 00000000 00000000 00000000 00000000 00000000 00000000 00000000 ................................ 000160
00000000 00000000 00000000 00000000 00000000 00000000 00000000 00000000 ................................ 000180
00000000 00000000 00000000 00000000 00000000 00000000 00000000 00000000 ................................ 0001A0
00000000 00000000 00000000 00000000 00000000 00000000 00000000 00000000 ................................ 0001C0
00000000 00000000 00000000 00000000 00000000 00000000 00000000 00000000 ................................ 0001E0
```

```
Dump of file SATURN:[PCCOMMON.DUMP.DLL]DAIMDF.TMP;1 on 18-APR-1990 10:41:20.28
File ID (570,8,0)   End of file block 71 / Allocated 72

Virtual block number 59 (0000003B), 512 (0200) bytes

00000000 00000000 00000000 00000000 00000000 00000000 00000000 00000000 ................................ 000000
00000000 00000000 00000000 00000000 00000000 00000000 00000000 00000000 ................................ 000020
00000000 00000000 00000000 00000000 00000000 00000000 00000000 00000000 ................................ 000040
00000000 00000000 00000000 00000000 00000000 00000000 00000000 00000000 ................................ 000060
00000000 00000000 00000000 00000000 00000000 00000000 00000000 00000000 ................................ 000080
00000000 00000000 00000000 00000000 00000000 00000000 00000000 00000000 ................................ 0000A0
00000000 00000000 00000000 00000000 00000000 00000000 00000000 00000000 ................................ 0000C0
00000000 00000000 00000000 00000000 00000000 00000000 00000000 00000000 ................................ 0000E0
00000000 00000000 00000000 00000000 00000000 00000000 00000000 00000000 ................................ 000100
00000000 00000000 00000000 00000000 00000000 00000000 00000000 00000000 ................................ 000120
00000000 00000000 00000000 00000000 00000000 00000000 00000000 00000000 ................................ 000140
00000000 00000000 00000000 00000000 00000000 00000000 00000000 00000000 ................................ 000160
00000000 00000000 00000000 00000000 00000000 00000000 00000000 00000000 ................................ 000180
00000000 00000000 00000000 00000000 00000000 00000000 00000000 00000000 ................................ 0001A0
00000000 00000000 00000000 00000000 00000000 00000000 00000000 00000000 ................................ 0001C0
00000000 00000000 00000000 00000000 00000000 00000000 00000000 00000000 ................................ 0001E0

Dump of file SATURN:[PCCOMMON.DUMP.DLL]DAIMDF.TMP;1 on 18-APR-1990 10:41:20.28
File ID (570,8,0)   End of file block 71 / Allocated 72

Virtual block number 60 (0000003C), 512 (0200) bytes

00000000 00000000 00000000 00000000 00000000 00000000 00000000 00000000 ................................ 000000
00000000 00000000 00000000 00000000 00000000 00000000 00000000 00000000 ................................ 000020
00000000 00000000 00000000 00000000 00000000 00000000 00000000 00000000 ................................ 000040
00000000 00000000 00000000 00000000 00000000 00000000 00000000 00000000 ................................ 000060
02000001 00000000 00000000 00000000 00000000 00000000 00000000 00000000 ................................ 000080
00000000 00000000 00000000 00000000 00000000 00000000 00000000 00000000 ................................ 0000A0
00000000 00000000 00000000 00000000 00000000 00000000 00000000 00000000 ................................ 0000C0
00000000 00000000 00000000 00000000 00000000 00000000 00000000 00000000 ................................ 0000E0
00000000 00000000 00000000 00000000 00000000 00000000 00000000 00000000 ................................ 000100
00000000 00000000 00000000 00000000 00000000 00000000 00000000 00000000 ................................ 000120
00000000 00000000 00000000 00000000 00000000 00000000 00000000 00000000 ................................ 000140
00000000 00000000 00000000 00000000 00000000 00000000 00000000 00000000 ................................ 000160
00000000 00000000 00000000 00000000 00000000 00000000 00000000 00000000 ................................ 000180
00000000 00000000 00000000 00000000 00000000 00000000 00000000 00000000 ................................ 0001A0
00000000 00000000 00000000 00000000 00000000 00000000 00000000 00000000 ................................ 0001C0
00000000 00000000 00000000 00000000 00000000 00000000 00000000 00000000 ................................ 0001E0

Dump of file SATURN:[PCCOMMON.DUMP.DLL]DAIMDF.TMP;1 on 18-APR-1990 10:41:20.28
File ID (570,8,0)   End of file block 71 / Allocated 72

Virtual block number 61 (0000003D), 512 (0200) bytes

00000000 00000000 00000000 00000000 00000000 00000000 00000000 00000000 ................................ 000000
00000000 00000000 00000000 00000000 00000000 00000000 00000000 00000000 ................................ 000020
00000000 00000000 00000000 00000000 00000000 00000000 00000000 00000000 ................................ 000040
00000000 00000000 00000000 00000000 00000000 00000000 00000000 00000000 ................................ 000060
00000000 00000000 00000000 00000000 00000000 00000000 00000000 00000000 ................................ 000080
00000000 00000000 00000000 00000000 00000000 00000000 00000000 00000000 ................................ 0000A0
00000000 00000000 00000000 00000000 00000000 00000000 00000000 00000000 ................................ 0000C0
00000000 00000000 00000000 00000000 00000000 00000000 00000000 00000000 ................................ 0000E0
00000000 00000000 00000000 00000000 00000000 00000000 00000000 00000000 ................................ 000100
00000000 00000000 00000000 00000000 00000000 00000000 00000000 00000000 ................................ 000120
00000000 00000000 00000000 00000000 00000000 00000000 00000000 00000000 ................................ 000140
00000000 00000000 00000000 00000000 00000000 00000000 00000000 00000000 ................................ 000160
00000000 00000000 00000000 00000000 00000000 00000000 00000000 00000000 ................................ 000180
00000000 00000000 00000000 00000000 00000000 00000000 00000000 00000000 ................................ 0001A0
00000000 00000000 00000000 00000000 00000000 00000000 00000000 00000000 ................................ 0001C0
00000000 00000000 00000000 00000000 00000000 00000000 00000000 00000000 ................................ 0001E0
```

```
Dump of file SATURN:[PCCOMMON.DUMP.DLL]DAIMDF.TMP;1 on 18-APR-1990 10:41:20.28
File ID (570,8,0)    End of file block 71 / Allocated 72

Virtual block number 62 (0000003E), 512 (0200) bytes

00000000 00000000 00000000 00000000 00000000 00000000 00000000 00000000 ................................ 000000
00000000 00000000 00000000 00000000 00000000 00000000 00000000 00000000 ................................ 000020
00000000 00000000 00000000 00000000 00000000 00000000 00000000 00000000 ................................ 000040
00000000 0000:000 00000000 00000000 00000000 00000000 00000000 00000000 ................................ 000060
00000000 00000000 00000000 00000000 00000000 00000000 00000000 00000000 ................................ 000080
00000000 00000000 00000000 00000000 00000000 00000000 00000000 00000000 ................................ 0000A0
00000000 00000000 00000000 00000000 00000000 00000000 00000000 00000000 ................................ 0000C0
00000000 00000000 00000000 00000000 00000000 00000000 00000000 00000000 ................................ 0000E0
00000000 00000000 00000000 00000000 00000000 00000000 00000000 00000000 ................................ 000100
00000000 00000000 00000000 00000000 00000000 00000000 00000000 00000000 ................................ 000120
00000000 00000000 00000000 00000000 00000000 00000000 00000000 00000000 ................................ 000140
00000000 00000000 00000000 00000000 00000000 00000000 00000000 00000000 ................................ 000160
00000000 00000000 00000000 00000000 00000000 00000000 00000000 00000000 ................................ 000180
00000000 00000000 00000000 00000000 00000000 00000000 00000000 00000000 ................................ 0001A0
00000000 00000000 00000000 00000000 00000000 00000000 00000000 00000000 ................................ 0001C0
00000000 00000000 00000000 00000000 00000000 00000000 00000000 00000000 ................................ 0001E0

Dump of file SATURN:[PCCOMMON.DUMP.DLL]DAIMDF.TMP;1 on 18-APR-1990 10:41:20.28
File ID (570,8,0)    End of file block 71 / Allocated 72

Virtual block number 63 (0000003F), 512 (0200) bytes

00000000 00000000 00000000 00000000 00000000 00000000 00000000 00000000 ................................ 000000
00000000 00000000 00000000 00000000 00000000 00000000 00000000 00000000 ................................ 000020
00000000 00000000 00000000 00000000 00000000 00000000 00000000 00000000 ................................ 000040
00000000 00000000 00000000 00000000 00000000 00000000 00000000 00000000 ................................ 000060
00000000 00000116 11300000 00000000 00000000 00000000 00000000 00000000 ......................0......... 000080
00000000 00000000 00000000 00000000 81818101 00000001 00000000 00000000 ................................ 0000A0
00000000 00000000 00000000 00000000 00000000 00000000 00000000 00000000 ................................ 0000C0
00000000 00000000 00000000 00000000 00000000 00000000 00000000 00000000 ................................ 0000E0
00000000 00000000 00000000 00000000 00000000 00000000 00000000 00000000 ................................ 000100
00000000 00000000 00000000 00000000 00000000 00000000 00000000 00000000 ................................ 000120
00000000 00000000 00000000 00000000 00000000 00000000 00000000 00000000 ................................ 000140
00000000 00000000 00000000 00000000 00000000 00000000 00000000 00000000 ................................ 000160
00000000 00000000 00000000 00000000 00000000 00000000 00000000 00000000 ................................ 000180
0A0A0A0A 0A0A0A0A 0A0A0A0A 0A0A0A0A 0A0A0A00 00000000 00000000 00000000 ................................ 0001A0
0A0A0A0A 0A0A0A0A 0A0A0A0A 0A0A0A0A 0A0A0A0A 0A0A0A0A 0A0A0A0A 0A0A0A0A ................................ 0001C0
0A0A0A0A 0A0A0A0A 0A0A0A0A 0A0A0A0A 0A0A0A0A 0A0A0A0A 0A0A0A0A 0A0A0A0A ................................ 0001E0

Dump of file SATURN:[PCCOMMON.DUMP.DLL]DAIMDF.TMP;1 on 18-APR-1990 10:41:20.28
File ID (570,8,0)    End of file block 71 / Allocated 72

Virtual block number 64 (00000040), 512 (0200) bytes

0A0A0A0A 0A0A0A0A 0A0A0A0A 0A0A0A0A 0A0A0A0A 0A0A0A0A 0A0A0A0A 0A0A0A0A ................................ 000000
0A0A0A0A 0A0A0A0A 0A0A0A0A 0A0A0A0A 0A0A0A0A 0A0A0A0A 0A0A0A0A 0A0A0A0A ................................ 000020
0A0A0A0A 0A0A0A0A 0A0A0A0A 0A0A0A0A 0A0A0A0A 0A0A0A0A 0A0A0A0A 0A0A0A0A ................................ 000040
0A0A0A0A 0A0A0A0A 0A0A0A0A 0A0A0A0A 0A0A0A0A 0A0A0A0A 0A0A0A0A 0A0A0A0A ................................ 000060
0A0A0A0A 0A0A0A0A 0A0A0A0A 0A0A0A0A 0A0A0A0A 0A0A0A0A 0A0A0A0A 0A0A0A0A ................................ 000080
00000000 00000000 00000000 00000000 0000000A 0A0A0A0A 0A0A0A0A 0A0A0A0A ................................ 0000A0
00000000 00000000 00000000 00002000 00000000 00000000 00000000 00000000 ................................ 0000C0
61747320 2D0A0030 30303652 00003E3E 47534D4E 3C3CFFFF FFFF053A 15480000 ..H.:.....<<NMSG>>..R6000..- sta 0000E0
72656765 746E6920 2D0A0033 30303652 0003000A 00776F6C 66726576 6F206B63 ck overflow.....R6003..- integer 000100
6E652074 6F6E202D 0A003830 30365200 08000A0D 30207962 20656469 76696420  divide by 0.....R6008..- not en 000120
30365200 09000A00 73746E65 6D756772 6120726F 66206563 61707320 6867756F ough space for arguments.....R60 000140
7269766E 6520726F 66206563 61707320 6867756F 6E652074 6F6E202D 0A0D3930 09..- not enough space for envir 000160
0020726F 72726520 656D6974 2D6E7572 00FF000A 0000FC00 0A0D746E 656D6E6F onment...•......run-time error . 000180
6F6C2074 6F6E2074 6E696F70 20676E69 74616F6C 6620200A 00323030 36520002 ..R6002..- floating point not lo 0001A0
054A0002 00000004 19840002 03C60008 00CE0203 0004FFFF FF000A00 64656461 aded..........ö...6..........J. 0001C0
20797469 746E4520 64644118 00010352 00000000 00000006 17380002 00000005 ......8.........R....Add Entity  0001E0
```

```
Dump of file SATURN:[PCCOMMON.DUMP.DLL]DAIMDF.TMP;1 on 18-APR-1990 10:41:20.28
File ID (570,8,0)   End of file block 71 / Allocated 72

Virtual block number 65 (00000041), 512 (0200) bytes

20797469 746E4520 6563616C 7065521F 006D726F 4620676E 6F4C204D 49206E69 in IM Long Form..Replace Entity  000000
69207974 69746E75 20657465 6C65441E 006D726F 4620676E 6F4C204D 49206E69 in IM Long Form..Delete Entity i 000020
6E692065 74756269 72747441 20646441 1E006D72 6F462067 6E6F4C20 4D49206E n IM Long Form..Add Attribute in 000040
65747562 69727474 41206563 616C7065 5222006D 726F4620 676E6F4C 204D4920  IM Long Form."Replace Attribute 000060
75626972 74744120 6574656C 65442100 6D726F46 20676E6F 4C204D49 206E6920  in IM Long Form.!Delete Attribu 000080
69206E69 616D6F44 20646441 1B006D72 6F462067 6E6F4C20 4D49206E 69206574 te in IM Long Form..Add Domain i 0000A0
69206E69 616D6F44 20656361 6C706552 1F006D72 6F462067 6E6F4C20 4D49206E n IM Long Form..Replace Domain i 0000C0
6E69206E 6961606F 44206574 656C6544 1E006D72 6F462067 6E6F4C20 4D49206E n IM Long Form..Delete Domain in 0000E0
206E6920 6E6F6973 6E656D69 44206464 411E006D 726F4620 676E6F4C 204D4920  IM Long Form..Add Dimension in  000100
206E6F69 736E656D 69442065 63616C70 65522200 6D726F46 20676E6F 4C204D49 IM Long Form."Replace Dimension  000120
6F69736E 656D6944 20657465 6C654421 006D726F 4620676E 6F4C204D 49206E69 in IM Long Form.!Delete Dimensio 000140
65686369 6C632067 6E696464 4149006D 726F4620 676E6F4C 204D4920 6E69206E n in IM Long Form.IAdding clicke 000160
73696C20 7463656C 6573206F 74206D65 74692078 6F622074 73696C20 6E6F2064 d-on list box item to select lis 000180
6168431E 006D726F 6620676E 6F6C206C 65646F6D 20617461 6420606F 72662074 t from data model long form..Cha 0001A0
656A624F 28006C65 646F4D20 61746144 20666F20 656D616E 20656874 2065676E nge the name of Data Model.(Obje 0001C0
646F6D20 73696874 206E6920 73747369 78652079 64616572 6C612073 25207463 ct %s already exists in this mod 0001E0

Dump of file SATURN:[PCCOMMON.DUMP.DLL]DAIMDF.TMP;1 on 18-APR-1990 10:41:20.28
File ID (570,8,0)   End of file block 71 / Allocated 72

Virtual block number 66 (00000042), 512 (0200) bytes

656F6420 73252074 63656A62 4F280352 00000000 00000000 00000000 002E6C65 el..............R.(Object %s doe 000000
656A624F 28002E6C 65646F6D 20736968 74206E69 20747369 78652074 6F6E2073 s not exist in this model..+Obje 000020
77656E20 68746977 20646563 616C7065 72206E65 65622073 61682073 25207463 ct %s has been replaced with new 000040
63656C65 73206E65 65622073 61682074 63656A62 6F206F4E 2F002E65 6D616E20  name../No object has been selec 000060
72612073 656D614E 30002E6E 6F697461 7265706F 20656874 20726F66 20646574 ted for the operation..0Names ar 000080
696C2064 6E612079 72746E65 206E6565 77746562 20746E65 72656666 69642065 e different between entry and li 0000A0
00010001 00010001 00010001 00010001 00010001 00010001 002E786F 62207473 st box.......................... 0000C0
00981400 00900824 00000001 00000044 00000000 FFFF0001 000E0352 00000A05 ....R...........D.......$....... 0000E0
03190005 80010001 08290010 00050000 00000000 0825FFFF 00080335 00FAFFBB £.*.5.....X...........)......... 000100
0080030E 00058002 000C083A 00000006 00000000 0000FFFF FFFF0060 00080054 T...m................:.......... 000120
00080034 02FE0005 80010001 0838000C 00050000 00000000 FFFFFFFF 006E0008 ..n..............;........±.4... 000140
007A0030 00F002CC 00058003 00070848 0000000A 00000000 0000FFFF FFFF0079 y..............H........ä.Þ.0.z. 000160
FFFF0070 0008002A 028C0005 80010001 08490008 00050000 00000000 FFFFFFFF ...............I......_.¥.*...p... 000180
FFFFFFFF 00710008 00C10280 00078002 000C0852 00000006 00000000 0000FFFF ............R........¯.è...q..... 0001A0
0000FFFF FFFF0073 00080064 02A40005 80010001 08530009 00050000 00000000 ..........S.......Ê.d...s....... 0001C0
00000000 FFFFFFFF 00740030 00C50272 00058000 00000850 00000007 00000000 ........]........r.é.0.t........ 0001E0

Dump of file SATURN:[PCCOMMON.DUMP.DLL]DAIMDF.TMP;1 on 18-APR-1990 10:41:20.28
File ID (570,8,0)   End of file block 71 / Allocated 72

Virtual block number 67 (00000043), 512 (0200) bytes

00000000 0000FFFF FFFF012C 000C0026 029600CF 80020400 085E0003 00030000 ......^.....ü...&...,........... 000000
00030000 00000000 FFFFFFFF 012D000C 00260284 00CF8002 00000862 00070003 ....b.....ü...&...-............. 000020
00070005 00000000 0000FFFF FFFF012E 000C0026 027200CF 80020000 086A0006 ..j.....ü.r.&................... 000040
08790000 00060000 00000000 FFFFFFFF 00CD0008 002C0262 00058001 00010871 q.......b.,...ë...............y. 000060
0001087A 00090005 00000000 0000FFFF FFFF00CE 000800C1 02560007 8002000C ......V.è...ö...............z... 000080
80000000 08840000 00070000 00000000 FFFFFFFF 00CF0008 0064024A 00058001 ....J.d...ü..................... 0000A0
00CF8002 04000885 00030003 00000000 0000FFFF FFFF0000 003000C5 02180005 ....é.0.Å.....................ü. 0000C0
022A00CF 80020000 08890007 00030000 00000000 FFFFFFFF 012F000C 0026023C <.&.../...................ü.*. 0000E0
00260218 00CF8002 00000891 00060003 00000000 0000FFFF FFFF0130 000C0026 &...0.....................ü...&. 000100
00080050 02080005 80010001 0898000F 00050000 00000000 FFFFFFFF 0131000C ..1.........................P... 000120
00030008 00C101FC 00078002 000C08AB 00000006 00000000 0000FFFF FFFF0002 ●..............´.......•.è...Æ. 000140
FFFF0004 00080064 01F00005 80010001 08A90010 00050000 00000000 FFFFFFFF ..............`.......Þ.d...å... 000160
FFFFFFFF 00050030 00C5018F 00058000 0000088A 00000007 00000000 0000FFFF ............¤.......€.é.0.ſ..... 000180
0000FFFF FFFF0132 000C0026 01E300CF 80020400 08B80003 00030000 00000000 ..........£.....ü.D.&...2....... 0001A0
00000000 FFFFFFFF 0133000C 002601D1 00CF8002 0000088F 00070003 00000000 ........¢.....ü.Ñ.&...3......... 0001C0
00000000 0000FFFF FFFF0134 000C0026 01BF00CF 80020000 08C70006 00030000 ......ú.....ü.¢.&...4........... 0001E0
```

```
Dump of file SATURN:[PCCOMMON.DUMP.DLL]DAIMDF.TMP;1 on 18-APR-1990 10:41:20.28
File ID (570,8,0)   End of file block 71 / Allocated 72

Virtual block number 68 (00000044), 512 (0200) bytes

 00060000 00000000 FFFFFFFF 00070008 002C01AF 00058001 000108CE 00070005 ....ö.......£.,...■............. 000000
 00080005 00000000 0000FFFF FFFF00D8 000800C1 01A40007 8002000C 08D60000 ..■.......Ê.ê...Á................ 000020
 08E00000 00070000 00000000 FFFFFFFF 00090009 00640197 00058001 000108D7 ■.........d...\................Á. 000040
 040008E1 0003L003 00000000 0000FFFF FFFF000A 003000C5 01650005 80000000 ......e.é.0.Ö...............Å... 000060
 80020000 08E50007 00030000 00000000 FFFFFFFF 0135000C 00260189 00CF8002 ..ü...&...5................|..... 000080
 00CF8002 000008ED 00060003 00000000 0000FFFF FFFF0136 000C0026 017700CF ü.w.&...6...............Ú.....ü. 0000A0
 01550005 80010001 08F4000A 00050000 00000000 FFFFFFFF 0137000C 00260165 e.&...7...............¶.......U. 0000C0
 00C10149 00078002 000C08FF 00000006 00000000 0000FFFF FFFF000C 00080037 7...É........................I.é. 0000E0
 00080064 013000C; 80010001 09000008 00050000 00000000 FFFFFFFF 000D0008 ..T......................=.d... 000100
 000F0030 00C5010C 00058000 0000090C 00000007 00000000 0000FFFF FFFF000E 8.........................é.0.Ô. 000120
 FFFF0138 000C0026 013000CF 80020400 090D0003 00030000 00000000 FFFFFFFF ......................ü.0.&...8... 000140
 FFFFFFFF 0139000C 0026011E 00CF8002 00000911 00070003 00000000 0000FFFF ....................ü...&...9..... 000160
 0000FFFF FFFF013A 000C0026 010C00CF 80020000 09190006 00030000 00000000 ..................ü...&...:........ 000180
 00000000 FFFFFFFF 00E70008 006800FC 00058001 00010920 00140005 00000000 ........ ........■.h...Ô.......... 0001A0
 00000000 0000FFFF FFFF00E8 000800C1 00F00007 8002000C 09350000 00060000 ......5.......Þ.è...Ô............ 0001C0
 00070000 00000000 FFFFFFFF 00E90008 006400E4 00058001 00010936 00150005 ....6.......ð.d...Ö............. 0001E0

Dump of file SATURN:[PCCOMMON.DUMP.DLL]DAIMDF.TMP;1 on 18-APR-1990 10:41:20.28
File ID (570,8,0)   End of file block 71 / Allocated 72

Virtual block number 69 (00000045), 512 (0200) bytes

 00030003 00000000 0000FFFF FFFF00EA 003000C5 00820005 80000000 094C0000 ..L.......ý.é.0.õ................ 000000
 09510007 00030000 00000000 FFFFFFFF 00EB000C 00260006 00CF8002 0400094D M.....ü.■.&...Š.................Q. 000020
 00000959 00060003 00000000 0000FFFF FFFF00EC 000C0026 00C400CF 80020000 ....ü.ó.&...&...............Y... 000040
 80010001 09600008 00050000 00000000 FFFFFFFF 00ED000C 00260082 00CF8002 ..ü.ý.&...Ü.................'..... 000060
 00078002 000C0969 00000006 00000000 0000FFFF FFFF00CA 0008002C 00A20005 ..Å.....ò...............i....... 000080
 00840005 80010001 096A0005 00050000 00000000 FFFFFFFF 00CB0008 00C10096 ..é...ù...............j.......... 0000A0
 00C10078 00078002 000C0970 00000006 00000000 0000FFFF FFFF0080 00080025 %.....................p.......x.è. 0000C0
 003000C5 003A0005 80000000 09710000 00070000 00000000 FFFFFFFF 008E0008 ....................q.......:.é.0. 0000E0
 0091000C 0026005E 00CF8002 04000972 00030003 00000000 0000FFFF FFFF0090 ....................r......ü.^.&..... 000100
 FFFF0092 000C0026 004C00CF 80020000 09760007 00030000 00000000 FFFFFFFF ................v.....ü.L.&....... 000120
 FFFFFFFF 0093000C 0026003A 00CF8002 0000097E 00060003 00000000 0000FFFF ..............~.....ü.:.&......... 000140
 0000FFFF FFFF0096 002D00F0 00050005 80010002 09850010 00050000 00000000 ......................Þ.-.......... 000160
 00000000 FFFFFFFF 00970008 0019001F 00388001 00010996 00040005 00000000 ..............8................... 000180
 00000000 0000FFFF FFFF0098 0008001A 001F0078 80010001 09980004 00050000 .............x.................... 0001A0
 00050000 00000000 FFFFFFFF 00990008 001A001F 00888001 000109A0 00040005 ..........|....................... 0001C0
 00070005 00000000 0000FFFF FFFF009A 00080028 0014000A 80010001 09A50007 ..È.........(..................... 0001E0

Dump of file SATURN:[PCCOMMON.DUMP.DLL]DAIMDF.TMP;1 on 18-APR-1990  0:41:20.28
File ID (570,8,0)   End of file block 71 / Allocated 72

Virtual block number 70 (00000046), 512 (0200) bytes

 09B5000A 00050000 00000000 FFFFFFFF 00980008 00280009 000A8001 000109AD Ù.........(.....................ç. 000000
 000109C0 000A0005 00000000 0000FFFF FFFF009C 00080036 00140038 80010001 ....8...6.....................â... 000020
 80010001 09CB000A 00050000 00000000 FFFFFFFF 00900008 00360014 00788001 ..x...6......................ù..... 000040
 00388001 000109D6 000A0005 00000000 0000FFFF FFFF009E 00080036 001400B8 |...6.....................■......8. 000060
 00090078 80010001 09E1000A 00050000 00000000 FFFFFFFF 009F0008 00360009 ..6....................Å......x... 000080
 00360009 00B88001 000109EC 000A0005 00000000 0000FFFF FFFF00A0 00080036 6.....................$.....|...6. 0000A0
 0008003E 03290005 80020002 09F70006 00030000 00000000 FFFFFFFF 00A10008 ..Å...................¥.......).>... 0000C0
 008F0008 0022006C 00058001 000109FE 00060005 00000000 0000FFFF FFFF0065 e...................±.......l."..... 0000E0
 72637365 4400003A 6560616E 206C6564 6F602061 74614400 00000000 FFFFFFFF .........Data model name:..Descr 000100
 64410000 7360796E 6F6E7953 2A00003A 60796E6F 6E795300 003A6E6F 69747069 iption:..Synonym:..*Synonyms..Ad 000120
 7469746E 452A0000 3A797469 746E4500 6574656C 65440065 63616C70 65520064 d.Replace.Delete.Entity:..*Entit 000140
 74746120 65657246 00657465 6C654400 6563616C 70655200 64644100 00736569 ies..Add.Replace.Delete.Free att 000160
 52006464 41000073 65747562 69727474 61206565 72462A00 003A6574 75626972 ribute:..*Free attributes..Add.R 000180
 00736E69 61606F44 2A00003A 6E69616D 6F440065 74656C65 44006563 616C7065 eplace.Delete.Domain:..*Domains. 0001A0
 00003A6E 6F69736E 656D6944 00657465 6C654400 6563616C 70655200 64644100 .Add.Replace.Delete.Dimension:.. 0001C0
 00657465 6C654400 6563616C 70655200 64644100 00736E6F 69736E65 6069442A *Dimensions..Add.Replace.Delete. 0001E0
```

```
Dump of file SATURN:[PCCOMMON.DUMP.DLL]DAIMDF.TMP;1 on 18-APR-1990 10:41:20.28
File ID (570,8,0)    End of file block 71 / Allocated 72

Virtual block number 71 (00000047), 512 (0200) bytes

76206465 776F6C6C 412A0000 3A656C62 61742065 756C6176 20646577 6F6C6C41 Allowed value table:..*Allowed v 000000
00657465 6C654400 6563616C 70655200 64644100 0073656C 62617420 65756C61 alue tables..Add.Replace.Delete. 000020
65440065 63616C70 65520064 64410000 003A6574 6F4E0000 3A72656E 69666544 Definer:..Note:...Add.Replace.De 000040
00656069 54006574 6144006E 6F697461 60726F66 6E692072 65735500 6574656C lete.User information.Date.Time. 000060
005F5F5F 5F5F5F5F 5F5F5F00 64657461 64705500 64657461 65724300 72657355 User.Created.Updated.________. 000080
5F5F5F5F 5F5F5F5F 5F5F005F 5F5F5F5F 5F5F5F5F 5F005F5F 5F5F5F5F 5F5F5F5F ________.________.___ 0000A0
4E2A0074 63656C65 53005F5F 5F5F5F5F 5F5F5F5F 005F5F5F 5F5F5F5F 5F5F5F00 .________.________.Select.*N 0000C0
00000000 00000000 00000000 00000000 00000000 00000000 00000000 7365746F otes............................ 0000E0
00000000 00000000 00000000 00000000 00000000 00000000 00000000 00000000 ................................ 000100
00000000 00000000 00000000 00000000 00000000 00000000 00000000 00000000 ................................ 000120
00000000 00000000 00000000 00000000 00000000 00000000 00000000 00000000 ................................ 000140
00000000 00000000 00000000 00000000 00000000 00000000 00000000 00000000 ................................ 000160
00000000 00000000 00000000 00000000 00000000 00000000 00000000 00000000 ................................ 000180
00000000 00000000 00000000 00000000 00000000 00000000 00000000 00000000 ................................ 0001A0
00000000 00000000 00000000 00000000 00000000 00000000 00000000 00000000 ................................ 0001C0
00000000 00000000 00000000 00000000 00000000 00000000 00000000 00000000 ................................ 0001E0

Dump of file SATURN:[PCCOMMON.DUMP.MSG]DAM.MSG;1 on 18-APR-1990 10:53:55.42
File ID (978,18,0)    End of file block 11 / Allocated 12

Virtual block number 1 (00000001), 512 (0200) bytes

75000000 00000000 00000000 00000000 01000000 2B53454D 00464753 4D4B4DFF .MKMSGF.MES+...................u 000000
8F080B07 8606E706 4805E805 6A04D604 5203CC03 4802CF02 5701DE01 6500ED00 .U.e.B.W.u.H.a.R.a.j.O.H.O...... 000020
9010F910 740FEC0F 6E0E830E 3700400C 970C030B 7E0AFA0A 7509F009 CF091608 ...u.P.u.*.-.....a.7...n.$.t.*.. 000040
79746974 6E652072 6F464915 89158A15 2514C114 5C13F713 93132E12 B8121B11 ...|.....%.\.e.%...¿.IFor entity 000060
756C6F76 20606960 696E696D 20656874 20676E69 676E6168 63202C27 31252720  '%1', changing the minimum volu 000080
20646573 75616320 73616820 27332527 206F7420 27322527 20606F72 66206560 me from '%2' to '%3' has caused  0000A0
6E616863 206F7420 27342527 20656075 6C6F7620 64657463 65707865 20656874 the expected volume '%4' to chan 0000C0
202C2731 25272079 7469746E 6520726F 4620490A 002E2735 2527206F 74206567 ge to '%5'...I For entity '%1',  0000E0
606F7266 20656075 6C6F7620 60756069 6E696020 65687420 676E6967 6E616863 changing the minimum volume from 000100
78616020 65687420 64657375 61632073 61682027 33252720 6F742027 32252720  '%2' to '%3' has caused the max 000120
2527206F 74206567 6E616863 206F7420 27342527 20656075 6C6F7620 60756069 imum volume '%4' to change to '% 000140
676E6967 6E616863 202C2731 25272079 7469746E 6520726F 4620490A 002E2735 5'...I For entity '%1', changing 000160
74202732 2527206D 6F726620 6560756C 6F762064 65746365 70786520 65687420  the expected volume from '%2' t 000180
6F762060 7560696E 69602065 68742064 65737561 63207361 68202733 2527206F o '%3' has caused the minimum vo 0001A0
20490A00 2E273525 27206F74 2065676E 61686320 6F742027 34252720 6560756C lume '%4' to change to '%5'...I  0001C0
78652065 68742067 6E69676E 61686320 2C273125 27207974 69746E65 20726F46 For entity '%1', changing the ex 0001E0

Dump of file SATURN:[PCCOMMON.DUMP.MSG]DAM.MSG;1 on 18-APR-1990 10:53:55.42
File ID (978,18,0)    End of file block 11 / Allocated 12

Virtual block number 2 (00000002), 512 (0200) bytes

20273325 27206F74 20273225 27206D6F 72662065 60756C6F 76206465 74636570 pected volume from '%2' to '%3'  000000
25272065 60756C6F 76206075 60697861 60206568 74206465 73756163 20736168 has caused the maximum volume '% 000020
746E6520 726F4620 490A002E 27352527 206F7420 65676E61 6863206F 74202734 4' to change to '%5'...I For ent 000040
76206075 60697861 60206568 7420676E 69676E61 6863202C 27312527 20797469 ity '%1', changing the maximum v 000060
73756163 20736168 20273325 27206F74 20273225 2720606F 72662065 60756C6F olume from '%2' to '%3' has caus 000080
6863206F 74202734 25272065 60756C6F 76206075 60696E69 60206568 74206465 ed the minimum volume '%4' to ch 0000A0
27312527 20797469 746E6520 726F4620 490A002E 27352527 206F7420 65676E61 ange to '%5'...I For entity '%1' 0000C0
72662065 60756C6F 76206075 60697861 60206568 7420676E 69676E61 6863202C , changing the maximum volume fr 0000E0
65206568 74206465 73756163 20736168 20273325 27206F74 20273225 2720606F om '%2' to '%3' has caused the e 000100
6F742065 676E6168 63206F74 20273425 27206560 756C6F76 20646574 6363'078 xpected volume '%4' to change to 000120
6E206568 74202C27 31252720 79746974 6E652072 6F462049 0A002E27 3525 '20  '%5'...I For entity '%1', the n 000140
61602027 73657079 74627573 20657461 69646560 60692066 6F206075 73207765 ew sum of immediate subtypes' ma 000160
20646573 75616320 73616820 2C273225 27202C73 6560756C 6F762060 75606978 ximum volumes, '%2', has caused  000180
676E6168 63206F74 20273325 27206560 756C6F76 20607560 69786160 20656874 the maximum volume '%3' to chang 0001A0
74202C27 31252720 79746974 6E652072 6F462049 0A002E27 34252720 6F742065 e to '%4'...I For entity '%1', t 0001C0
73657079 74627573 20657461 69646560 60692066 6F206075 73207765 6E206568 he new sum of immediate subtypes 0001E0
```

```
Dump of file SATURN:[PCCOMMON.DUMP.MSG]DAM.MSG;1 on 18-APR-1990 10:53:55.42
File ID (978,18,0)   End of file block 11 / Allocated 12

Virtual block number 3 (00000003), 512 (0200) bytes

 61632073 6168202C 27322527 202C7365 60756C6F 76206465 74636570 78652027 ' expected volumes, '%2', has ca 000000
 6F742027 33252720 6560756C 6F762064 65746365 70786520 65687420 64657375 used the expected volume '%3' to 000020
 27207974 69746E65 20726F46 20490A00 2E273425 27206F74 2065676E 61686320  change to '%4'...I For entity ' 000040
 75732065 74616964 65606069 20666F20 60757320 77656E20 65687420 2C273125 %1', the new sum of immediate su 000060
 68202C27 32252720 2C73656D 756C6F76 2060756D 696E696D 20277365 70797462 btypes' minimum volumes, '%2', h 000080
 33252720 6560756C 6F762060 7560696E 69602065 68742064 65737561 63207361 as caused the minimum volume '%3 0000A0
 69746E65 20726F46 20490A00 2E273425 27206F74 2065676E 61686320 6F742027 ' to change to '%4'...I For enti 0000C0
 676E6168 63207361 77202733 25272079 6568206E 65687720 2C273125 27207974 ty '%1', when key '%3' was chang 0000E0
 20796568 202C7965 68207972 61606972 70206E6F 6E206120 6562206F 74206465 ed to be a non-primary key, key  000100
 68207972 61606972 70206568 74206564 6160206E 65656220 73617720 27322527 '%2' was been made the primary k 000120
 606F6320 74736577 65662065 68742073 61682074 69206573 75616365 62207965 ey because it has the fewest com 000140
 65687720 2C273125 27207974 69746E65 20726F46 20490A00 2E73746E 656E6F70 ponents...I For entity '%1', whe 000160
 68202C64 65766F6D 65722073 61772079 65682079 72616069 72702065 6874206E n the primary key was removed, k 000180
 79656820 79726160 69727020 65687420 65646160 20736177 20273225 27207965 ey '%2' was made the primary key 0001A0
 6F70606F 63207473 65776566 20656874 20736168 20746920 65737561 63656220  because it has the fewest compo 0001C0
 27207965 68202C27 31252720 79746974 6E652072 6F462049 0A0D2E73 746E656E nents...I For entity '%1', key ' 0001E0

Dump of file SATURN:[PCCOMMON.DUMP.MSG]DAM.MSG;1 on 18-APR-1990 10:53:55.42
File ID (978,18,0)   End of file block 11 / Allocated 12

Virtual block nu~er 4 (00000004), 512 (0200) bytes

 65682079 72616069 72702065 68742065 64616020 6E656562 20736168 20273125 %1' has been made the primary ke 000000
 6C6E6F20 73277974 69746E65 20656874 20736920 74692065 73756163 65622079 y because it is the entity's onl 000020
 206E6568 77202C27 31252720 79746974 6E652072 6F462049 0A0D2E79 65682079 y key...I For entity '%1', when  000040
 20796568 206F7420 64656464 61207361 77202733 25272065 74756269 72747461 attribute '%3' was added to key  000060
 20646567 6E616863 20736177 20657475 62697274 74612065 6874202C 27322527 '%2', the attribute was changed  000080
 69757165 72207361 20272C64 65776F6C 6C612074 6F6E2073 6C6C754E 27206F74 to 'Nulls not allowed,' as requi 0000A0
 206E6920 64656E69 61746E6F 63207365 74756269 72747461 20726F66 20646572 red for attributes contained in  0000C0
 70206E65 6877202C 27312527 20797469 746E6520 726F4620 490A002E 73796568 keys...I For entity '%1', when p 0000E0
 20656075 6C6F7620 60756069 6E696020 73746920 64616820 27322527 20746573 set '%2' had its minimum volume  000100
 766F6065 72207361 77207465 73702065 6874202C 30206F74 20646567 6E616863 changed to 0, the pset was remov 000120
 6E616020 796C6E6F 2065636E 6973202C 27332527 2079656B 20606F72 66206465 ed from key '%3', since only man 000140
 6B20666F 20737265 62606560 20656220 6E616320 73746573 70207972 6F746164 datory psets can be members of k 000160
 27207974 69746E65 206E6920 27322527 20746573 7020726F 46490A00 2E737965 eys...IFor pset '%2' in entity ' 000180
 6560756C 6F762060 7560696E 69602065 68742067 6E69676E 61686320 2C273125 %1', changing the minimum volume 0001A0
 68742064 6573756: 63207361 68202734 2527206F 74202733 2527206D 6F726620  from '%3' to '%4' has caused th 0001C0
 65676E61 6863206F 74202735 25272065 60756C6F 76206465 74636570 78652065 e expected volume '%5' to change 0001E0

Dump of file SATURN:[PCCOMMON.DUMP.MSG]DAM.MSG;1 on 18-APR-1990 10:53:55.42
File ID (978,18,0)   End of file block 11 / Allocated 12

Virtual block number 5 (00000005), 512 (0200) bytes

 746E6520 6E692027 32252720 74657370 20726F46 490A002E 27362527 206F7420  to '%6'...IFor pset '%2' in ent 000000
 76206075 60696E69 60206568 7420676E 69676E61 6?63202C 27312527 20797469 ity '%1', changing the minimum v 000020
 73756163 20736168 20273425 27206F74 20273325 2720606F 72662065 60756C6F olume from '%3' to '%4' has caus 000040
 6863206F 74202735 25272065 60756C6F 76206075 60697861 60206568 74206465 ed the maximum volume '%5' to ch 000060
 2C273125 27207974 69746E65 20726F46 490A002E 27362527 206F7420 65676E61 ange to '%6'...IFor entity '%1', 000080
 61632079 72616069 7270206F 74202732 25272079 65682067 6E69676E 61686320  changing key '%2' to primary ca 0000A0
 69727020 6E6F6E20 65646160 20656220 6F742027 33252720 79656820 64657375 used key '%3' to be made non-pri 0000C0
 6820796C 6E6F206E 61632079 7469746E 65206E61 2065636E 6973202C 79726160 mary, since an entity can only h 0000E0
 7469746E 6520726F 46490A00 2E79656B 20797261 60697270 20656E6F 20657661 ave one primary key...IFor entit 000100
 206E6F6E 206F7420 27322527 2079656B 20676E69 74746573 202C2731 25272079 y '%1', setting key '%2' to non- 000120
 6E697320 2C6E6564 64697272 65766F20 6E656562 20736168 20797261 60697270 primary has been overridden, sin 000140
 20797469 746E6520 6E692079 656B2079 6C6E6F20 65687420 73692074 69206563 ce it is the only key in entity  000160
 20656E6F 20796C6E 6F207361 68207974 69746E65 206E6120 66692820 27312527 '%1' (if an entity has only one  000180
 20656874 20646572 65646973 6E6F6320 73692079 656B2074 61687420 2C79656B key, that key is considered the  0001A0
 27322527 28202731 25272072 6F727245 490A002E 2979656B 20797261 60697270 primary key)...IError '%1' ('%2' 0001C0
 69202732 25272074 65737020 726F4649 0A0D2E64 65726574 6E756F63 6E652029 ) encountered...IFor pset '%2' i 0001E0
```

```
Dump of file SATURN:[PCCOMMON.DUMP.MSG]DAM.MSG;1 on 18-APR-1990 10:53:55.42
File ID (978,18,0)   End of file block 11 / Allocated 12

Virtual block number 6 (00000006), 512 (0200) bytes

65707865 20656874 20676E69 676E6168 63202C27 31252720 79746974 6E65206E n entity '%1', changing the expe 000000
61682027 34252720 6F742027 33252720 6D6F7266 20656D75 6C6F7620 64657463 cted volume from '%3' to '%4' ha 000020
27352527 20656D75 6C6F7620 6D756D69 6E696D20 65687420 64657375 61632073 s caused the minimum volume '%5' 000040
27207465 73702072 6F46490A 0D2E2736 2527206F 74206567 6E616863 206F7420  to change to '%6'...IFor pset ' 000060
65687420 676E6967 6E616863 202C2731 25272079 7469746E 65206E69 20273225 %2' in entity '%1', changing the 000080
2527206F 74202733 2527206D 6F726620 656D756C 6F762064 65746365 70786520  expected volume from '%3' to '% 0000A0
656D756C 6F76206D 75uD6978 61602065 68742064 65737561 63207361 68202734 4' has caused the maximum volume 0000C0
7020726F 46490A0D 2E273625 27206F74 2065676E 61686320 6F742027 3: '52720  '%5' to change to '%6'...IFor p 0000E0
6E69676E 61686320 2C273125 27207974 69746E65 206E6920 27322527 20? '573 set '%2' in entity '%1', changin 000100
74202733 25272060 6F726620 656D756C 6F762060 75606978 61602065 6874.067 g the maximum volume from '%3' t 000120
6F76206D 7560696E 69602065 68742064 65737561 63207361 68202734 2527206F o '%4' has caused the minimum vo 000140
46490A0D 2E273625 27206F74 2065676E 61686320 6F742027 35252720 656D756C lume '%5' to change to '%6'...IF 000160
61686320 2C273125 27207974 69746E65 206E6920 27322527 20746573 7020726F or pset '%2' in entity '%1', cha 000180
2527206D 6F726620 656D756C 6F762060 75606978 61602065 68742067 6E69676E nging the maximum volume from '% 0001A0
74636570 78652065 68742064 65737561 63207361 68202734 2527206F 74202733 3' to '%4' has caused the expect 0001C0
27362527 206F7420 65676E61 6863206F 74202735 25272065 6D756C6F 76206465 ed volume '%5' to change to '%6' 0001E0

Dump of file SATURN:[PCCOMMON.DUMP.MSG]DAM.MSG;1 on 18-APR-1990 10:53:55.42
File ID (978,18,0)   End of file block 11 / Allocated 12

Virtual block number 7 (00000007), 512 (0200) bytes

68202731 25272065 74756269 72747461 2079656B 206E6769 65726F46 490A0D2E ...IForeign key attribute '%1' h 000000
20273225 27207465 73702072 6F662064 65746172 656E6567 206E6565 62207361 as been generated for pset '%2'  000020
206E6F69 7463656A 6F727020 61207361 202C2733 25272079 7469746E 65206E69 in entity '%3', as a projection  000040
79656B20 79726160 69727020 6E692027 34252720 65747562 69727474 6120666F of attribute '%4' in primary key 000060
206E6769 65726F46 490A0D2E 27362527 20797469 746E6520 666F2027 35252720  '%5' of entity '%6'...IForeign  000080
656E6567 206E6565 62207361 68202731 25272065 74756269 72747461 2079656B key attribute '%1' has been gene 0000A0
25272079 7469746E 65206E69 20273225 27207465 73702072 6F662064 65746172 rated for pset '%2' in entity '% 0000C0
61207965 6B206E67 6965726F 6620606F 72662067 6E696461 63736163 202C2733 3', cascading from foreign key a 0000E0
7270206E 69202735 25272074 65737020 666F2027 34252720 65747562 69727474 ttribute '%4' of pset '%5' in pr 000100
0A0D2E27 37252720 79746974 6E652066 6F202736 25272079 65682079 72616069 imary key '%6' of entity '%7'... 000120
20666F20 656D756C 6F76206D 75606978 61602065 68742067 6E69676E 61684349 IChanging the maximum volume of  000140
27207974 69746E65 206E6565 77746562 20706968 7372656E 74726170 20656874 the partnership between entity ' 000160
7469746E 65206465 74616C65 7220646E 61202732 25272074 65737020 2C273125 %1', pset '%2' and related entit 000180
61657267 206F7420 3120606F 72662027 34252720 74657370 202C2733 25272079 y '%3', pset '%4' from 1 to grea 0001A0
64206568 74207372 65676769 72742029 27352527 28203120 6E616874 20726574 ter than 1 ('%5') triggers the d 0001C0
65747562 69727474 61207965 6B206E67 6965726F 6620666F 206E6F69 74656C65 eletion of foreign key attribute 0001E0

Dump of file SATURN:[PCCOMMON.DUMP.MSG]DAM.MSG;1 on 18-APR-1990 10:53:55.42
File ID (978,18,0)   End of file block 11 / Allocated 12

Virtual block number 8 (00000008), 512 (0200) bytes

746E6528 20746573 70207369 68742068 74697720 64657461 69636F73 73612073 s associated with this pset (ent 000000
206E6769 65726F46 490A0D2E 29273225 27207465 7370202C 27312527 20797469 ity '%1', pset '%2')...IForeign  000020
27322527 20746573 7020726F 66202731 25272065 74756269 72747461 20796568 key attribute '%1' for pset '%2' 000040
64657465 6C656420 6E656562 20736168 20273325 27207974 69746E65 206E6920  in entity '%3' has been deleted 000060
20656D75 6C6F7620 6D756D69 78616D20 65687420 676E6967 6E616843 490A0D2E ...IChanging the maxim. volume  000080
7469746E 65206E65 65777465 62207069 68737265 6E747261 70206568 7420666F of the partnership between entit 0000A0
6E652064 6574616C 65722064 6E612027 32252720 74657370 202C2731 25272079 y '%1', pset '%2' and related en 0000C0
65746165 72672060 6F726620 27342527 20746573 70202C27 33252720 79746974 tity '%3', pset '%4' from greate 0000E0
68742073 72656767 69727420 31206F74 20292735 25272820 31206E61 68742072 r than 1 ('%5') to 1 triggers th 000100
62697274 74612079 6568206E 67696572 6F662066 6F206E6F 69746165 72632065 e creation of foreign key attrib 000120
2C273125 27207974 69746E65 28207465 73702073 69687420 726F6620 73657475 utes for this pset (entity '%1', 000140
20273125 27207965 6B20676E 69747465 53490A0D 2E292732 25272074 65737020  pset '%2')...ISetting key '%1'  000160
20797469 746E6520 666F2079 65682079 72616069 72702065 68742065 62206F74 to be the primary key of entity  000180
6F662066 6F206E6F 69746165 72632065 68742073 72656767 69727420 27322527 '%2' triggers the creation of fo 0001A0
64657461 6C657220 726F6620 73657475 62697274 74612079 6568206E 67696572 reign key attributes for related 0001C0
6F742027 31252720 79656B20 676E6974 74655349 0A0D2E73 65697469 746E6520  entities...ISetting key '%1' to 0001E0
```

```
Dump of file SATURN:[PCCOMMON.DUMP.MSG]DAM.MSG;1 on 18-APR-1990 10:53:55.42
File ID (978,18,0)   End of file block 11 / Allocated 12

Virtual block number 9 (00000009), 512 (0200) bytes

 666F2079 65682079 72616069 72702065 68742065 62207265 676E6F6C 206F6E20  no longer be the primary key of 000000
 6974656C 65642065 68742073 72656767 69727420 27322527 20797469 746E6520  entity 'X2' triggers the deleti 000020
 726F6620 73657475 62697274 74612079 6568206E 67696572 6F662066 6F206E6F on of foreign key attributes for 000040
 72747461 2067.E69 64644149 0A002E73 65697469 746E6520 64657461 6C657220  related entities...IAdding attr 000060
 25272079 65682079 72616069 72702065 6874206F 74202731 25272065 74756269 ibute 'X1' to the primary key 'X 000080
 63206568 74207372 65676769 72742027 33252720 79746974 6E652066 6F202732 2' of entity 'X3' triggers the c 0000A0
 65747562 69727474 61207965 68206E67 6965726F 6620666F 206E6F69 74616572 reation of foreign key attribute 0000C0
 69766F60 6552490A 002E7365 69746974 6E652064 6574616C 65722072 6F662073 s for related entities...IRemovi 0000E0
 61606972 70206568 7420606F 72662027 31252720 65747562 69727474 6120676E ng attribute 'X1' from the prima 000100
 67676972 74202733 25272079 7469746E 6520666F 20273225 27207965 68207972 ry key 'X2' of entity 'X3' trigg 000120
 6E69646E 6F707365 72726F63 20666F20 6E6F6974 656C6564 20656874 20737265 ers the deletion of correspondin 000140
 6C657220 726F6620 73657475 62697274 74612079 6568206E 67696572 6F662067 g foreign key attributes for rel 000160
 7372656E 74726170 20676E69 64644149 0A002E73 65697469 746E6520 64657461 ated entities...IAdding partners 000180
 2079656B 20797261 60697270 20656874 206F7420 27312527 20746573 20706968 hip-set 'X1' to the primary key  0001A0
 65687420 73726567 67697274 20273325 27207974 69746E65 20666F20 27322527 'X2' of entity 'X3' triggers the 0001C0
 75626972 74746120 79656B20 6E676965 726F6620 666F206E 6F697461 65726320  creation of foreign key attribu 0001E0

Dump of file SATURN:[PCCOMMON.DUMP.MSG]DAM.MSG;1 on 18-APR-1990 10:53:55.42
File ID (978,18,0)   End of file block 11 / Allocated 12

Virtual block number 10 (0000000A), 512 (0200) bytes

 6F606552 490A002E 73656974 69746E65 20646574 616C6572 20726F66 20736574 tes for related entities...IRemo 000000
 7420606F 72662027 31252720 7465732D 70696873 72656E74 72617020 u.6E6976 ving partnership-set 'X1' from t 000020
 25272079 7469746E 6520666F 20273225 27207965 68207972 61606972 70..6568 he primary key 'X2' of entity 'X 000040
 72726F63 20666F20 6E6F6974 656C6564 20656874 20737265 67676972 742C2733 3' triggers the deletion of corr 000060
 73657475 62697274 74612079 6568206E 67696572 6F662067 6E69646E 6F707365 esponding foreign key attributes 000080
 676E6974 74655349 0A002E73 65697469 746E6520 64657461 6C657220 726F6620  for related entities...ISetting 0000A0
 20706968 7372656E 74726170 20524F49 20666F20 6560756C 6F762027 31252720  'X1' volume of IOR partnership- 0000C0
 20646573 75616320 20273325 27207974 69746E65 206E6920 27322527 20746573 set 'X2' in entity 'X3'  caused  0000E0
 35252720 606F7266 20646567 6E616863 20656220 6F742027 34252720 73277469 it's 'X4' to be changed from 'X5 000100
 6C206075 60696E69 6020676E 69747465 53490A00 2020272E 36252720 6F742027 ' to 'X6.'  ..ISetting minimum l 000120
 73277469 20646573 75616320 27312527 206E6961 606F6420 666F2068 74676E65 ength of domain 'X1' caused it's 000140
 66206465 676E6168 63206562 206F7420 6874676E 656C2064 65746365 70786520  expected length to be changed f 000160
 696E6960 20676E69 74746553 490A002E 27332527 206F7420 27322527 20606F72 rom 'X2' to 'X3'...ISetting mini 000180
 64657375 61632027 31252720 6E69616D 6F642066 6F206874 676E656C 20607560 mum length of domain 'X1' caused 0001A0
 676E6168 63206562 206F7420 6874676E 656C2060 75606978 61602073 27746920  it's maximum length to be chang 0001C0
 20676E69 74746553 490A002E 27332527 206F7420 27322527 20606F72 66206465 ed from 'X2' to 'X3'....Setting  0001E0

Dump of file SATURN:[PCCOMMON.DUMP.MSG]DAM.MSG;1 on 18-APR-1990 10:53:55.42
File ID (978,18,0)   End of file block 11 / Allocated 12

Virtual block number 11 (0000000B), 512 (0200) bytes

 63202731 2527206E 6961606F 6420666F 20687467 6E656C20 64657463 65707865 expected length of domain 'X1' c 000000
 20656220 6F742068 74676E65 6C206075 60696E69 60207327 74692064 65737561 aused it's minimum length to be  000020
 74655349 0A002E27 33252720 6F742027 32252720 606F7266 20646567 6E616863 changed from 'X2' to 'X3'...ISet 000040
 27206E69 61606F64 20666F20 6874676E 656C2064 65746365 70786520 676E6974 ting expected length of domain ' 000060
 74206874 676E656C 20607560 69786160 20732774 69206465 73756163 20273125 X1' caused it's maximum length t 000080
 002E2733 2527206F 74202732 25272060 6F726620 6465676E 61686320 6562206F o be changed from 'X2' to 'X3'.. 0000A0
 61606F64 20666F20 6874676E 656C2060 75606978 61602067 6E697474 6553490A .ISetting maximum length of doma 0000C0
 676E656C 20607560 696E6960 20732774 69206465 73756163 20273125 27206E69 in 'X1' caused it's minimum leng 0000E0
 2527206F 74202732 25272060 6F726620 6465676E 61686320 6562206F 74206874 th to be changed from 'X2' to 'X 000100
 20666F20 6874676E 656C2060 75606978 61602067 6E697474 6553490A 002E2733 3'...ISetting maximum length of  000120
 64657463 65707865 20732774 69206465 73756163 20273125 27206E69 61606F64 domain 'X1' caused it's expected 000140
 20273225 2720606F 72662064 65676E61 68632065 62206F74 20687467 6E656C20  length to be changed from 'X2'  000160
 25272065 74756269 72747461 20676E69 766F6065 52490A00 2E273325 27206F74 to 'X3'...IRemoving attribute 'X 000180
 69766F60 6552490A 002E2732 2527206E 6F69736E 65606964 20606F72 66202731 1' from dimension 'X2'...IRemovi 0001A0
 2527206E 6961606F 6420606F 72662027 31252720 65747562 69727474 6120676E ng attribute 'X1' from domain 'X 0001C0
 00000000 00000000 00000000 00000000 00000000 00000000 00006F0A 002E2732 2'...o.......................... 0001E0
```

```
Dump of file SATURN:[PCCOMMON.DUMP.DLL]DAMERGE.TMP;1 on 18-APR-1990 10:42:05.48
File ID (575,19,0)   End of file block 101 / Allocated 104

Virtual block number 1 (00000001), 512 (0200) bytes

 00000000 00000040 00000000 00000088 0000FFFF 00000004 00000061 01665A4D MZf.a...........|.......a....... 000000
 00000080 00000r00 00000000 00000000 00000000 00000000 00000000 00000000 ................................ 000020
 6F6E6E61 63206061 72676F72 70207369 685421CD 4C018821 CD098400 0EBA1F0E ..a..Ç.el¡.LeIThis program canno 000040
 00000000 00000024 0A0D002E 65646F6D 20534F44 206E6920 6E757220 65622074 t be run in DOS mode....$....... 000060
 000E0010 00000000 00020000 00000000 000C8009 95824648 004106FB 0505454E NE..«.A.HFý..................... 000080
 00000000 00000000 00010004 00040000 0000078C 01CC0180 000000C0 00400054 T.a.à.À.¯.à.¥................... 0000A0
 33180F00 33180195 06AA0F00 06AA011D 000F0F00 000F0118 08760F00 08760081 ..v...v...........´...´....3...3 0000C0
 07E00F00 07E0050C 02E40F00 02E305A5 007A0F00 007A059C 0ADE0F00 0ADE04E2 ã.8...8...z...z.Ê.D...Ô.Ê.Â...Â. 0000E0
 1FE00F21 1E3C0A34 02020E21 00000000 002C0F00 002A0A30 3C920F00 3C920660 '..<...<0.*..,.....|...4.<.|.Â. 000100
 02351EB1 02350C5F 01551EB1 01550C49 002E1EB1 002E0C46 02B51EB1 02B50C1A ..ç.Ý.ç.F...Ý...I.U.Ý.U._.5.Ý.5. 000120
 4F434752 400E0000 45475245 40414407 01020004 012C0004 00410005 00010005 ......À...,.......DAMERGE¯..MRGCO 000140
 45404752 400A0003 434F5250 474C4447 52405245 0C000253 4A424F54 5845544E NTEXTOBJS...ERMRGDLGPRO...MRGME 000160
 544F4C53 544E4547 52400800 05534452 4F575945 4847524D 08000453 444F4854 THODS...MRGKEYWORDS...MRGENTSLOT 000180
 52400700 08534C45 52544E45 4752400A 00075346 4552544E 4547524D 0A000653 S...MRGENTREFS...MRGENTRELS...MR 0001A0
 08535254 54415945 48464752 400C000A 5345544F 4E47524D 08000953 59454847 GKEYS...MRGNOTES...MRGFKEYATTRS. 0001C0
 40080000 53455341 494C4147 52400A00 0C534E4F 49534E45 40494447 52400000 ..MRGDIMENSIONS...MRGALIASES...M 0001E0

Dump of file SATURN:[PCCOMMON.DUMP.DLL]DAMERGE.TMP;1 on 18-APR-1990 10:42:05.48
File ID (575,19,0)   End of file block 101 / Allocated 104

Virtual block number 2 (00000002), 512 (0200) bytes

 4941404F 4447524D 0A000F53 54455350 47524008 000E5449 4E494C4F 4F544752 RGTOOLINIT...MRGPSETS...MRGDOMAI 000000
 023501F9 01560142 00140008 00050001 00001153 52545441 47524008 0010534E NS...MRGATTRS...........B.V.'.S. 000020
 534C4C41 43534F44 084E4957 40500547 53400300 052204BF 04A8047C 02C7028A ..ú.|.´.¢."...MSG.PMWIN.DOSCALLS 000040
 44084054 48455249 55514341 4C404400 5249444C 45444F4D 4C404408 6C606403 .dml.DMLMODELDIR.DMLACQUIREHTM.D 000060
 444F4045 4552464C 40440C4E 5854504F 54534C4D 440A4E58 54545241 54534C4D MLSTARTTXN.DMLSTOPTXN.DMLFREEMOD 000080
 47595245 55514C4D 4408454C 444E4148 4C45444F 4D595245 55514C4D 44134C45 EL.DMLQUERYMODELHANDLE.DMLQUERYG 0000A0
 4F435952 4555514C 40440045 40414E4E 47495345 44595245 55514C4D 44124954 TI.DMLQUERYDESIGNNAME.DMLQUERYCO 0000C0
 4D440844 4C454946 5445534C 4D440844 4C454946 59524555 514C4D44 00544E55 UNT.DMLQUERYFIELD.DMLSETFIELD.DM 0000E0
 4554414C 45524C4D 4409314E 4C525952 4555514C 40440C4E 4C525952 4555514C LQUERYRLN.DMLQUERYRLN1.DMLRELATE 000100
 4C404411 4554414C 45524E55 4C4D4408 4554414C 4552454C 50404953 4C40440F .DMLSIMPLERELATE.DMLUNRELATE.DML 000120
 55514C40 44005453 494C4545 52464C4D 44084554 414C4552 4E55454C 50404953 SIMPLEUNRELATE.DMLFREELIST.DMLQU 000140
 494C4044 124B4341 424C4C4F 524E5854 504F5453 4C404412 44494C40 44595245 ERYDMLID.DMLSTOPTXNROLLBACK.DMLI 000160
 444E4957 5245544E 45'34C54 550F4C54 55034445 54454C45 44544345 4A424F53 SOBJECTDELETED.UTL.UTLCENTERWIND 000180
 4F52504C 4F4F5446 45444954 470E4C4F 4F544C4C 494B4954 47084954 4703574F OW.GTI.GTIKILLTOOL.GTIDEFTOOLPRO 0001A0
 59524555 51495447 1247534D 444E4553 4954470A 47534054 534F5049 544 0A43 C.GTIPOSTMSG.GTISENDMSG.GTIQUERY 0001C0
 51495447 12574F44 4E49574C 4F4F5454 45534954 4710574F 444E4957 4C4F4F54 TOOLWINDOW.GTISETTOOLWINDOW.GTIQ 0001E0

Dump of file SATURN:[PCCOMMON.DUMP.DLL]DAMERGE.TMP;1 on 18-APR-1990 10:42:05.48
File ID (575,19,0)   End of file block 101 / Allocated 104

Virtual block number 3 (00000003), 512 (0200) bytes

 54504154 41445855 41595245 55514954 47124C4F 4F54574F 444E4957 59524555 UERYWINDOWTOOL.GTIQUERYAUXDATAPT 000000
 504C4F4F 54595245 55514954 47125254 50415441 44585541 54455349 54471052 R.GTISETAUXDATAPTR.GTIQUERYTOOLP 000020
 52545345 4440454D 0E504145 48455441 4552434D 4540004D 454D0354 4E455241 ARENT.MEM.MEMCREATEHEAP.MEMDESTR 000040
 434F4C42 45455246 4D454D0C 4B434F4C 42434F4C 4C414D45 4D005041 4548594F OYHEAP.MEMALLOCBLOCK.MEMFREEBLOC 000060
 4C455247 41424C54 5513524F 53525543 54494E49 4741424C 54551054 5544034B K.DUT.UTLBAGINITCURSOR.UTLBAGREL 000080
 550A524F 53525543 45544152 45544947 41424C54 5513524F 53525543 45534145 EASECURSOR.UTLBAGITERATECURSOR.U 0000A0
 45474D41 44106061 64034C45 48535550 5145534C 54550C45 48414051 45534C54 TLSEQMAKE.UTLSEQPUSHEL.dam.DAMGE 0000C0
 41455243 40414400 544E4545 54414552 43404144 0C454D41 4E544345 4A424F54 TOBJECTNAME.DAMCREATEENT.DAMCREA 0000E0
 4F434D41 44167970 6F636164 064A424F 4554454C 45444D41 440C5254 54414554 TEATTR.DAMDELETEOBJ.dacopy.DAMCO 000100
 4D41440B 59454B59 504F434D 41440A4D 54485353 4F524341 59544954 4E455950 PYENTITYACROSSHTM.DAMCOPYKEY.DAM 000120
 4554454C 50404F43 40414413 54455350 59504F43 4D41440B 52545441 59504F43 COPYATTR.DAMCOPYPSET.DAMCOMPLETE 000140
 41441C41 54414454 45535050 49485350 59504F43 4D414414 59504F43 54455350 PSETCOPY.DAMCOPYPSHIPPSETDATA.DA 000160
 4F434D41 440A4D54 4853534F 52434150 4948534E 4F495441 4C455259 504F434D MCOPYRELATIONSHIPACROSSHTM.DAMCO 000180
 0E534149 4C415950 4F434D41 440C4E45 4D494459 504F434D 41440C4D 4F445950 PYDOM.DAMCOPYDIMEN.DAMCOPYALIAS. 0001A0
 4E474945 524F4654 45475445 53504D41 44174452 4F575945 4B59504F 43404144 DAMCOPYKEYWORD.DAMPSETGETFOREIGN 0001C0
 45455246 4D41440D 544C5053 4B504C4C 554E5449 4E494D41 44115954 49544E45 ENTITY.DAMINITNULLPKSPLT.DAMFREE 0001E0
```

```
Dump of file SATURN:[PCCOMMON.DUMP.DLL]DAMERGE.TMP;1 on 18-APR-1990 10:42:05.48
File ID (575,19,0)   End of file block 101 / Allocated 104

Virtual block number 4 (00000004), 512 (0200) bytes

44454950 4F435354 4E45544C 50534850 45544144 50554D41 4419544C 50534850 PKSPLT.DAMUPDATEPKSPLT=NTSCOPIED 000000
45505558 49464D41 44114F44 4F545245 50555354 4E454554 41445055 4D414415 .DAMUPDATEENTSUPERTODO.'AMFIXUPE 000020
49504F43 5359434B 544C5053 48504554 41445055 4D414419 53524550 5553544E NTSUPERS.DAMUPDATEPKSPLTKEYSCOPI 000040
4853504B 43454L 3 4D414413 4C455250 5544524F 46484345 48434D41 44114445 ED.DAMCHECKFORDUPREL.DAMCHECKPSH 000060
41441444 4547524J 4D59504F 43594441 45524C41 4D414414 4E494749 524F5049 IPORIGIN.DAMALREADYCOPYMERGED.DA 000080
54544159 504F4354 45474D41 44154A42 4F444549 504F4356 49555145 5445474D MGETEQUIVCOPIEDOBJ.DAMGETCOPYATT 0000A0
5241504D 4F43454D 414E5455 4C414E41 1154554C 414E4106 54584554 4E4F4352 RCONTEXT.ANALUT.ANALUTNAMECOMPAR 0000C0
41530045 4752454D 20415308 45544144 494C4156 454D414E 54554C41 4E411245 E.ANALUTNAMEVALIDATE.SA-MERGE.SA 0000E0
4354414D 4E454754 45474D44 50134241 544D4450 06534D50 54414345 4752454D MERGECATPMS.PDMTAB.PDMGETGENMATC 000100
45474D44 50115441 52545348 4354414D 42555354 45474D44 50135441 52545348 HSTRAT.PDMGETSUBMATCHSTRAT.PDMGE 000120
500F5441 52545353 45524255 53544547 4D445011 54415254 53534552 4E454754 TGENRESSTRAT.PDMGETSUBRESSTRAT.P 000140
00000301 01455449 5257534F 44084F49 53035441 52545342 4D4F4354 45474D44 DMGETCOMBSTRAT.SIO.DOSWRITE..... 000160
38032734 031A6403 31540315 EF032775 0331D703 040A0000 03030100 00030401 .............al.u'.ÿ..T1.d..4'.; 000180
20414442 00002E4D 032A3D03 1D020304 03020203 01011BE7 03289003 31F00331 1.Þ1..(.Ó............=*.M...BDA  0001A0
646E6120 6C6F6F74 20656772 65602029 6C65646F 6D205220 4528206C 65646F4D Model (E-R model) merge tool and 0001C0
00736569 74696C69 74752065 67726560 20746365 6A626F20 63697265 6E656720  generic object merge utilities. 0001E0

Dump of file SATURN:[PCCOMMON.DUMP.DLL]DAMERGE.TMP;1 on 18-APR-1990 10:42:05.48
File ID (575,19,0)   End of file block 101 / Allocated 104

Virtual block number 5 (00000005), 512 (0200) bytes

E90E4688 D88EFFFF 881E5657 00000CC8 00000143 4F52504C 4F4F5447 524D0800 ..MRGTOOLPROC...à...WV.|...Ä.F.Õ 000000
0000BA00 01B801D1 E999FE46 8BFE4689 FFFF0202 9A0A76FF 0C76FF10 76FF01AD Ü..v..v..v.......F±.F±.Õl.|..¤.. 000020
065EC407 89260247 89260000 880A5EC4 0000FFFF 9A5016FA 46801076 FF01C8E9 Õà..v..F*.P.....á^.|..&.G.&..á^. 000040
1076FF00 00FFFF9A 5016F646 8D1076FF 0192E902 57892607 8926FC56 8BFA4688 .F*.V=&..&.W.Õ...v..F-.P......v. 000060
FF0000FF FF9A016A 006A5052 99104688 1DAE68FA 76FF0000 FFFF9A50 16FA468D .F*.P......v*hÜ..F..RPj.j....... 000080
9A006A01 6A016A00 6A016A00 6AF44689 06C48300 DE03C79A 1076FFF6 76FFF876 v½.v-.v..ú.B..á..F¶j.j.j.j.j.j.. 0000A0
F476FF00 16E90375 01F47E83 001FE903 7500F47E 830000FF FF9A5052 0000FFFF ....RP.......¶.u.Õ...-¶.u.Õ...v¶ 0000C0
00FFFF9A F676FFF8 76FF1076 FF06C483 001E07E7 9A4477FF 264677FF 26F65EC4 á^-&.wF&.wO.Õ....á..v..v½.v-.... 0000E0
0000BA00 00B80001 07C7260A 5EC400F9 E999F446 8B0000FF FF9A006A 1076FF00 ..v.j........F¶.Õ*.á^.&ú...|..¤.. 000100
0010E903 7552470B 26504788 26F65EC4 00000069 9A5016F6 46801076 FF00E8E9 ÕÕ..v..F-.P.i....á^-&.GP&.GRu.Õ.. 000120
0010E903 754E470B 264C4788 26F65EC4 0000015C 9A5077FF 265277FF 26F65EC4 á^-&.wR&.wP.\...á^-&.GL&.GNu.Õ.. 000140
0017E903 7556470B 26544788 26F65EC4 0000FFFF 9A4C77FF 264E77FF 26F65EC4 á^-&.wN&.wL.....á^-&.GT&.GVu.Õ.. 000160
46894247 8B26F65E C40000FF FF9A5477 FF265677 FF26F65E C44277FF 26F65EC4 á^-&.wBá^-&.wV&.wT.....á^-&.GB.F 000180
76FF0A76 FF0C76FF 0E76FF10 76FF0059 E90000BA 0000B800 00FFFF9A F476FFF4 ¶.v¶.....|..¤..ÕY..v..v..v..v..v 0001A0
30FE43E9 03751003 30FE63E9 03751001 300033E9 003FE900 00FFFF9A 0676FF08 ..v......Õ?.Õ3.=..u.Õc±=..u.ÕC±= 0001C0
E9FE44E9 03751084 30FF1BE9 03751D80 30FE81E9 03751DAD 30FF3CE9 03751004 ..u.Õ<.=Ü.u.Õ.±=¯.u.Õ..=Ç.u.ÕÐ±Õ 0001E0

Dump of file SATURN:[PCCOMMON.DUMP.DLL]DAMERGE.TMP;1 on 18-APR-1990 10:42:05.48
File ID (575,19,0)   End of file block 101 / Allocated 104

Virtual block number 6 (00000006), 512 (0200) bytes

00B8D88E 0008881E 56570000 0EC8000C CAC95F5E 1F0000E9 0000BA00 00B8FF80 ¯.|..¤..Õ...^_èò..à...WV.|...Ä|. 000000
46880006 E9037500 003DF246 890000FF FF9A5016 F8468000 6AF44689 F6468900 ..F-.F¶j..F½.P......F·=..u.Õ...F 000020
000EE903 7500003D F2468900 00FFFF9A 5016FA46 80586A34 6AF876FF 018CE9F2 ·Õ...v½j4jX.F*.P......F·=..u.Õ.. 000040
FFFC77FF 26FE77FF 26065EC4 04064683 216A0162 E9F24688 000002EC 9AF876FF .v½.&....F·Õb.jl.F..á^.&.w±&.w=. 000060
009A5052 002105FC 568BFA46 88004268 1E216A0A C4830291 00009AFA 76FFFC76 v=.v*......á.jl.hB..F*.V=.l.RP.. 000080
5EC45047 89265247 89260000 8BFA5EC4 42478926 F8468BFA 5EC40AC4 83FFFF00 ....á.á^*.F½&.GBá^*|..&.GR&.GPá^ 0000A0
FA468BF8 76FF5447 89265647 89260000 8BFA5EC4 4C478926 4E478926 0u.'B8FA *|..&.GN&.GLá^*|..&.GV&.GT.v½.F* 0000C0
00000195 9AF876FF 000EE903 7500003D F2468900 00FFFF9A 50520054 05F.'688 .V=.T.RP......F·=..u.Õ...v½..... 0000E0
52004405 FC568BFA 4688FE76 FF000000 769A5016 FE46800A 76FF00CA E9F24688 .F·Õò..v..F±.P.v....v±.F*.V=.D.R 000100
68FFFF68 4477FF26 4677FF26 FA5EC444 77FF2646 77FF26FA 5EC40000 003C9A50 P.<....á^*&.wF&.wDá^*&.wF&.wOh..h 000120
48478926 FA5EC400 00FFFF9A FA76FFFC 76FF012C 68020036 FF261CCA 068EFFFF ....ò.&.6..h,..v=.v*.....á^*&.GH 000140
890000FF FF9AF476 FFF676FF 0035E903 744A470B 26484788 26FA5EC4 4A578926 &.WJá^*&.GH&.GJt.Õ5..v-.v¶...... 000160
FF9AFA76 FFFC76FF F876FF00 0001839A 5477FF26 5677FF26 FA5EC4F8 76FFF246 F·.v½á^*&.wV&.wT......v½.v=.v*.. 000180
FF0A76FF 0000FFFF 9A4B77FF 264A77FF 26FA5EC4 0A76FF00 27E9F246 880000FF ....F·Õ'..v.á^*&.wJ&.wH......v.. 0001A0
0AB81E56 57000214 C80006CA C95F5E1F 0000E900 00B80000 00ED9AFA 76FFFC76 v=.v*.Ü...|..Õ...^_èò..à...WV.|. 0001C0
86890000 FFFF9A48 77FF264A 77FF2608 5EC4FDF2 8689FDF4 86890000 B8D88E02 ..Ä|....¶»..·»á^.&¯wJ&.wH....... 0001E0
```

```
Dump of file SATURN:[PCCOMMON.DUMP.DLL]DAMERGE.TMP;1 on 18-APR-1990 10:42:05.48
File ID (575,19,0)   End of file block 101 / Allocated 104

Virtual block number 7 (00000007), 512 (0200) bytes

52002105 0A568808 46880676 FF016A03 E1E9FDF0 86880007 E9037500 0030FDF0 Þ»=..u.Õ....Þ»ÕÅ.j..v..F..V..!.R 000000
F0868800 07E903?5 00003DFD F0868900 000489A 50520050 050A5688 08468850 P.F..V..P.RP.K.....Þ»=..u.Õ....Þ 000020
890000FF FF9A5052 004C050A 56880846 880876FF 0A76FF06 76FF016A 03AEE9FD »ÕÜ.j..v..v..v..F..V..L.RP...... 000040
B09A006A 036A016A 006A016A 006A0380 E9FDF086 880007E9 03750000 30FDF086 .Þ»=..u.Õ....Þ»Õ..j.j.j.j.j.j..¯ 000060
000004B5 9A5016FD EC868050 77FF2652 77FF2608 5EC40000 00879A50 52000000 ...RP.ñ...á^.&.wR&.wP..&».P.ç... 000080
868D4C77 FF264E77 FF26085E C4033FE9 FDF08688 0007E903 75000030 FDF08689 ..Þ»=..u.Õ....Þ»Õ7.á^.&.wN&.wL.. 0000A0
88084688 0316E9FD F0868800 07E90375 000030FD F0868900 00FFFF9A 5016FDF6 -».P.......Þ»=..u.Õ....Þ»Õ...F.. 0000C0
77FF2608 5EC45077 FF265277 FF26085E C4FDECB6 FFFDEE86 FF505200 54050A56 V..T.RP.ÑY».Ñ$»á^.&.wR&.wPá^.&.w 0000E0
FDF4B6FF 02D6E9FD F0868800 07E90375 000030FD F086890E C483FFFF 06E19A42 B.Å....á...Þ»=..u.Õ....Þ»Õ•..Ñ¶» 000100
08468800 0005A39A 5016FDFA 86800101 68046A02 0036FF26 1CCA068E FDF286FF .Ñ·»..ò.&.6..j.h....*».P.È....F. 000120
805016FD FA868050 52002105 0A568808 46880876 FF0A76FF 50520021 050A5688 .V..!.RP.v..v..F..V..!.RP..*».P. 000140
DE9A5016 FEFC868D 5077FF26 5277FF26 085EC414 C48305C7 00109A50 16FEFC86 .•±.P...ú..á.á^.&.wR&.wP..•±.P.B 000160
068EFDF2 B6FFFDF4 B6FF025C E9FDF086 880007E9 03750000 30FDF086 89000005 .....Þ»=..u.Õ....Þ»Õ\..Ñ¶».Ñ·».. 000180
08468808 76FF0A76 FF0000FF FF9A5016 FDFA868D 01016805 6A020036 FF261CCA ò.&.6..j.h....*».P......v..v..F. 0001A0
26085EC4 10C483FF FF00109A 5016FEFC 86805016 FDFA8680 50520021 050A5688 .V..!.RP..*».P..•±.P......á.á^.& 0001C0
5EC40017 E9037500 0030FDF0 86890000 FFFF9A50 16FEFC86 804C77FF 264E77FF .wN&.wL..•±.P.......Þ»=..u.Õ..á^ 0001E0

Dump of file SATU V:[PCCOMMON.DUMP.DLL]DAMERGE.TMP;1 on 18-APR-1990 10:42:05.48
File ID (575,19,0)   End of file block 101 / Allocated 104

Virtual block number 8 (00000008), 512 (0200) bytes

02FF9A50 16FE4680 0676FF01 00E9FDF0 86880000 06909A50 77FF2652 77FF2608 .&.wR&.wP.......Þ»Õï..v..F±.P... 000000
16FEFC86 8D1D8168 FE76FF01 8DE9FDF0 86880007 E9037500 0030FDF0 86890000 ....Þ»=..u.Õ....Þ»Õ§..v±hÝ...•±. 000020
26085EC4 5077FF26 5277FF26 085EC442 77FF2608 5EC40000 00889A00 6A006A50 Pj.j......á^.&.wBá^.&.wR&.wPá^.& 000040
6A006A00 6A006A00 6AFDF686 FFFDF8B6 FFFDECB6 FFFDEEB6 FF4C77FF 264E77FF .wN&.wL.ÑY».Ñ$».Ñ½».Ñ-»j.j.j.j.j 000060
35E90375 000030FD F08689FF FF10AE9A 5477FF26 5677FF26 085EC401 6A006A00 .j.j.á^.&.wV&.wT.Û.....Þ»=..u.Õ5 000080
0006EE9A 4C77FF26 4E77FF26 085EC400 0006AD9A 5077FF26 5277FF26 085EC400 .á^.&.wR&.wP.Û...á^.&.wN&.wL.Ÿ.. 0000A0
77FF264E 77FF2608 5EC4011C E9FDF086 88544789 26564789 26000088 085EC400 .á^.¡..&.GV&.GT..Þ»Õ..á^.&.wN&.w 0000C0
06FE9A4C 77FF264E 77FF2608 5EC40027 E9037500 0030FDF0 86890000 FFFF9A4C L.......Þ»=..u.Õ'.á^.&.wN&.wL.±. 0000E0
5277FF26 085EC400 D9E9FDF0 86880000 07159A50 77FF2652 77FF2608 5EC40000 ..á^.&.wR&.wP.......Þ»Õ1.á^.&.wR 000100
26085EC4 0086E9FD F0868800 07E90375 00003DFD F0868900 00FFFF9A 5077FF26 &.wP.......Þ»=..u.Õ....Þ»ÕÑ.á^.& 000120
0375849F FDF08E81 0012E903 75000030 FDF08689 0000013C 9A5077FF 265277FF .wR&.wP.<.....Þ»=..u.Õ.../Þ»..u. 000140
264E77FF 26085EC4 50478926 52478926 00008808 5EC40088 E9FDF086 880007E9 Õ....Þ»Õ..á^.¡..&.GR&.GPá^.&.wN& 000160
880007E9 0375849F FDF08E81 0012E903 75000030 FDF08689 00000738 9A4C77FF .wL.8.....Þ»=..u.Õ.../Þ»..u.Õ... 000180
FF26085E C44277FF 26085EC4 4C478926 4E478926 00008808 5EC4004C E9FDF086 .Þ»ÕL.á^.¡..&.GN&.GLá^.&.wB6^.&. 0001A0
5EC40014 E9FDF086 880007E9 03750000 30FDF086 89000003 819A5477 FF265677 wV&.wT.......Þ»=..u.Õ....Þ»Õ..á^ 0001C0
CFB81E56 5700040C CBCBC95F 5E1F0000 E9000088 54478926 56478926 00008808 .¡..&.GV&.GT¡..Õ...^_èùà...WV.¡ü 0001E0

Dump of file SATURN:[PCCOMMON.DUMP.DLL]DAMERGE.TMP;1 on 18-APR-1990 10:42:05.48
File ID (575,19,0)   End of file block 101 / Allocated 104

Virtual block number 9 (00000009), 512 (0200) bytes

6A020036 FF261CCA 068EFBF4 B6FFFBF6 B6FFFBF4 8689FBF6 86890000 88D88E03 ..Å¡....-«..¶«.Ñ-«.Ñ¶«..ò.&.6..j 000000
109A5016 FBFC868D 5016FDFE 868D0A76 FF000005 299A5016 FDFE868D 02016806 .h....±».P.)....v...±».P..•«.P.. 000020
FAB6FFFB FA9689FB F8868900 00FFFF9A 006A056A 0676FF08 76FF0AC4 83055800 .X..á..v..v.j.j........¥«..*«.Ñ' 000040
00E90000 FFFF9A00 6A006A00 6A006A50 16FBFCB6 800676FF 0876FFFB F886FFFB «.Ñ¼«.v..v...•«.Pj.j.j.j......Õ. 000060
01D50006 03860203 00000001 00980002 00F30002 03680103 0024CBC9 5F5E1F00 ..^_èù$...k...µ...........Ñ...f. 000080
007C0002 03EA0103 00000003 03200002 007A0002 03450103 015A0006 00F70203 ..¥¯..Z...E...z...·.......ö...|. 0000A0
01660006 01850203 01E60006 060E0203 00000005 04F40002 00000004 06830002 ..........¶...........l...ç...f. 0000C0
00190002 08410103 00000009 08310002 00880002 086A0103 00000006 02780002 ..x.......j.......1.......A..... 0000E0
01FD0007 021F0203 01800006 06360203 0000000C 07EF0002 00900002 08180103 ..........ÿ.......6..........». 000100
00240004 041D0203 02080007 02540203 011C0004 05FA0203 01880006 03120203 ..........*.......T...........$. 000120
003E0004 06020203 00320004 056F0203 021A0007 02410203 019E0006 03A80203 ..˙.......A.......o...2...•...>. 000140
039A000A 02090203 00490004 07740203 02280007 038F0203 00000003 03300005 ..0...........(...t...l...\..... 000160
00560004 048C0203 01C20006 011C0203 005C0002 04760103 00580002 046F0103 ..o...[...v...\.......ò.......V. 000180
01C80001 881F0200 3E89D88E FFFF881E 00000000 00000000 03AC000A 07870203 ..ñ...˜...........¡...Å.>...|..ù. 0001A0
E90E4688 D88EFFFF 881E5657 000006C8 00000000 00000000 00000800 02000200 ................à...WV.¡...Å.F.Õ 0001C0
006A486A 006A0143 68014068 1076FF12 76FFFE56 89FC4689 08568806 468801EF ÿ..F..V..F•.V±.v..v.hª.hC.j.jKj. 0001E0
```

```
Dump of file SATURN:[PCCOMMON.DUMP.DLL]DAMERGE.TMP;1 on 18-APR-1990 10:42:05.48
File ID (575,19,0)   End of file block 101 / Allocated 104

Virtual block number 10 (0000000A), 512 (0200) bytes

 003DFA46 8908C483 FFFF023C 9A1076FF 1276FFFC 76FFFE76 FF0000FF FF9A006A j.......v±.v•.v..v..<....á..F°=. 000000
 1276FF01 C8E90000 BA000088 0000FFFF 9AFA76FF 1076FF12 76FF0017 E9037500 .u.Ö...v..v..v¹.....|..¤..Öà..v. 000020
 FF9A5016 FC468010 76FF1276 FF01A9E9 0000FFFF 9AFC76FF FE76FF00 6A1076FF .v.j..v±.v•.....Ö`..v..v..F•.P.. 000040
 FF0C76FF 505299FC 46881DAE 68FA76FF 0000FFFF 9A5016FA 468DFC76 FF0000FF ....v•.F°.P......v°hÛ..F•.RP.v.. 000060
 00FFFF9A 0676FF08 76FF0A76 FF0C76FF 0E76FF10 76FF1276 FF0000FF FF9A0A76 v.......v..v..v..v..v..v..v..... 000080
 003DFA46 8908C483 004603E7 9A1076FF 1276FF0A 76FF0C76 FF0155E9 0161E900 .Ö•.ÖU..v..v..v..v..Ö.F..á..F°=. 0000A0
 011CE901 28E90000 BA000088 00000060 9AFA76FF 1076FF12 76FF0017 E9037500 .u.Ö...v..v..v°.`...|..¤..Ö(.Ö.. 0000C0
 468908C4 8300E604 9F9A1076 FF1276FF 5016FC46 800000FC 46C70072 E90A4688 .F.Ör.úF•...F•.P.v..v....Ì..á..F 0000E0
 00E5E900 008A0000 88000001 629AFA76 FF1076FF 1276FF00 17E90375 000030FA °=..u.Ö...v..v..v°.b...|..¤..Öl. 000100
 6A1076FF 1276FF00 32E90000 01009A00 6A1076FF 1276FF00 00E90375 00FC7E83 .~•.u.Ö...v..v.j.......Ö2..v..v.j 000120
 FF86E903 75015E30 0013E900 16E90019 E900B6E9 00008A00 00B80000 01439A01 ..C...|..¤..ÖÑ.Ö..Ö..Ö..=^.u.Ö.. 000140
 76FF0000 008F9A50 16FA468D 1076FF12 76FF008E E9FFE7E9 FFD1E903 75016830 =h.u.Öl.ÖÖ.Ö...v..v..F°.P......v 000160
 006AFA76 FF000AE9 037500FC 7E830000 FFFF9A00 6A006A50 16FC468D 1DB068FA °h¯..F•.Pj.j.......~•.u.Ö...v°j. 000180
 0A76FF0C 76FF0E76 FF1076FF 1276FF00 48E90057 E90000BA 0000B800 00FFFF9A .....|..¤..ÖW.ÖK..v..v..v..v..v. 0001A0
 FFE90375 00203DFE 7AE90375 00003000 28E90037 E9000000 CD9A0676 FF0876FF .v..v..ë...Ö7.Ö+.=..u.Öz±= .u.Ö. 0001C0
 BA000088 FFB5E9FD E9E90375 003B3DFE B6E90375 003030FF 85E90375 00293DFE ±=).u.Ö..=0.u.ÖÑ±=;.u.ÖÖ»Öç.|..¤ 0001E0
```

```
Dump of file SATURN:[PCCOMMON.DUMP.DLL]DAMERGE.TMP;1 on 18-APR-1990 10:42:05.48
File ID (575,19,0)   End of file block 101 / Allocated 104

Virtual block number 11 (0000000B), 512 (0200) bytes

 89FED886 89000088 D88E0008 B81E5657 000232C8 000ECAC9 5F5E1F00 00E90000 ..Ö...^_èò..â2..WV.|...Ã|....Ã±. 000000
 FED48E83 FED48689 000002B9 9A5016FE DA868001 6A016A00 00FEFC86 C7FED686 .ø±ú.=±¯..j.j...Ö±.P.¿.....å±./å± 000020
 FF001FE9 03750000 300000FF FF9A5016 FEDA868D 0A76FF0C 76FF004E E9037400 .t.ÖN..v..v...Ö±.P.....=..u.Ö... 000040
 016A0000 00339A50 16FEDA86 80FE6A00 6A016168 01366806 76FF0876 FFFEFC86 .=±.v..v.h6.he.j.j±..Ö±.P.3...j. 000060
 8B0007E9 0375849D FED48E81 FFA8E9FE D4868900 00FFFF9A 5016FEDA 8680006A j...Ö±.P.......å±Ö´../å±..u.Ö... 000080
 890000FF FF9A006A 056A0676 FF0876FF 0068E903 7400FEFC 8E83010C E9FED486 .å±Ö.../=±.t.Öh..v..v.j.j....... 0000A0
 FE868001 01680A6A 020036FF 261CCC06 8EFED686 FFFED886 FFFD0096 89FDCE86 .ö»..Å».ÑÅ±.Ñø±..ä.&.6..j.h....± 0000C0
 80006A00 6AFDCE86 FFFD0086 FF0000FF FF9A026A 016A006A 0000FFFF 9A5016FE ±.P.....j.j.j.......ÑÅ».Ño»j.j.. 0000E0
 36680676 FF0876FF 009AE900 01880000 FFFF9A20 6A006A00 6A006A50 16FEFE86 .±±.Pj.j.j.j .....|..Ö...v..v.h6 000100
 FEDA868D 01406806 76FF0876 FF000003 8C9A5016 FEDA868D 006A216A 01686801 .hh.j!j...Ö±.P......v..v.hâ...Ö± 000120
 000002AA 9A016A ] 6A006A00 6A016468 01366806 76FF0876 FF0000FF FF9A5016 .P......v..v.h6.hd.j.j.j.j..¯... 000140
 0003149A 5016FEr. 86800101 68076A02 0036FF26 1CCC068E FED686FF FED886FF .ÑÅ±.Ñø±..ä.&.6..j.h....±±.P.... 000160
 76FF0876 FF0CC483 FFFF0010 9A5016FD D2868D50 16FEFE86 800A76FF 0C76FF00 ..v..v...±±.P..Ø».P......á..v..v 000180
 44881E56 57000026 C8CBC95F 5E1F0000 E9000088 0000FFFF 9A5016FD D2868D06 ...Ø».P.....|..Ö...^_èùå&..WV.¡D 0001A0
 6A006A00 6A016568 01366806 76FF0876 FF0071E9 0C468800 90E90A46 88D88E02 ..Á.F.Ö...F.Öq..v..v¯h6.he.j.j.j 0001C0
 83000000 D228FC46 88016868 01366806 76FF0876 FFFC4689 0000043A 9A006A00 .j..:....F•.v..v.h6.hh..F=+Ø.... 0001E0
```

```
Dump of file SATURN:[PCCOMMON.DUMP.DLL]DAMERGE.TMP;1 on 18-APR-1990 10:42:05.48
File ID (575,19,0)   End of file block 101 / Allocated 104

Virtual block number 12 (0000000C), 512 (0200) bytes

 0003739A 50160A46 80014068 0676FF08 76FF0000 035F9A50 160A468D 505221CA ò!RP.FÖ.P._....v..v.hâ..FÖ.P.s.. 000000
 0013E900 16E90000 FFFF9A01 6A006A01 5E68006A 206A0676 FF0876FF 002FE900 .Ö/..v..v.¯j j.h^.j.j......Ö..Ö.. 000020
 68E90375 01363000 0BE9000E E90000E9 FFD4E903 75000530 FF87E903 75000130 =..u.Ö..=..u.Öå.Ö..Ö..Ö..=6.u.Öh 000040
 C7260A5E C4D88E03 EF881E56 57000454 C8CBC95F 5E1F0000 E9000088 0000E9FF .Ö..|..Ö...^_èùåT..WV.|ÿ..Äá^.&ù 000060
 6A006A50 168C468C 0000FFFF 9A50168C 468D216A 01406806 76FF0876 FF000007 ....v..v.hâ.¯j!.F¥.P......F¥.Pj.j 000080
 00B846C7 001EE900 02B846C7 0026E900 01B846C7 001BE98A 46890000 FFFF9A00 .......F¤Ö..úF|..Ö&.úF|..Ö..úF|. 0000A0
 037500B8 7E83FFE2 E9FFDDE9 03759431 30FFDDE9 03759430 300013E9 0016E900 .Ö..Ö..=0.u.Öl.=1.u.Öl Ôã..~|.u. 0000C0
 FF020036 FF261CCC 068EFDAE B6FFFD80 B6FFFDAE 8689FD80 86890000 B8008FE9 Ö..|....¯»..Û».Ñ¯».ÑÛ». ¤.&.6... 0000E0
 16FBAC86 805016FD B6868D50 168C468D 000003AD 9A5016FD B6868002 01688876 v|h....Ñ».P.Û....F¥.P..Ñ».P..¯«. 000100
 E89A006A 056A0676 FF0876FF 0000031F 9A026A01 6A006A0C C48303C6 00109A50 P...6..á.j.j.j.......v..v.j.j..$ 000120
 6A5016F8 AC868D06 76FF0876 FFFD8286 FFFD8486 FFFD8496 89FD8286 89000002 .....ý»..Ç».ÑÇ».Ñý».v..v...¯«.Pj 000140
 FF6A0168 68013668 0676FF08 76FF0102 E9000088 0000033E 9A206A00 6A006A00 .j.j.j .>...|..Ö...v..v.h6.hk.j. 000160
 CDE90006 E98A4688 0009E903 74FD8A7E 838A4689 00000414 9A50168C 4680046A j..F¥.P......F¤.~¤»t.Ö...F¤Ö•.Öë 000180
 CC068EFD 8286FFFD 8486FFFD 828689FD 84868900 00880088 E90374FF BA7E8300 ..~¤.t.Ö..|....Ç»..ý».ÑÇ».Ñý»..ä 0001A0
 16FBAC86 8050168C 46800000 053C9A50 16FBAC86 80020168 036A0200 36FF261C .&.6..j.h....¯«.P.<....F¥.P..¯«. 0001C0
 0676FF08 76FF0000 05609A02 6A016A00 6A0CC483 05540010 9A5016FD B6868D50 P..Ñ».P...T..á.j.j.j..'....v..v. 0001E0
```

```
Dump of file SATURN:[PCCOMMON.DUMP.DLL]DAMERGE.TMP;1 on 18-APR-1990 10:42:05.48
File ID (575,19,0)   End of file block 101 / Allocated 104

Virtual block number 13 (0000000D), 512 (0200) bytes

B00676FF 0876FFFD AEB6FFFD B0B6FFFD B09689FD AE868900 00056F9A 006A056A j.j..o.....Ù»..¯».Ä¯».ÄÙ».v..v.. 000000
FFFF9A00 6A0676FF 0876FF00 39E90000 05989A20 6A006A00 6A006A50 16FD8686 .Ä».Pj.j.j.j .....Õ9..v..v.j.... 000020
009A5052 002105FB AE968BFB AC868850 16BC468D 216AFBAE 9689FBAC 86890000 ....¯«..Ù«j!.F¥.P..¯«..Ù«.!.RP.. 000040
01010203 001990CB C95F5E1F 0000E900 00880001 07C7260A 5EC40AC4 83FFFF00 ....&.á^.&ú...|..Õ...^_èù.....!. 000060
009C0203 007F0002 05880103 007E0002 01720103 00000003 01290002 015A0006 ..Z...).......r...~...|......... 000080
06260103 00000006 06910002 00870002 04C40103 00860002 04400103 01E60006 ..|...M.......á...............&. 0000A0
00830203 00000009 061A0002 00100002 03D80103 00880002 065E0103 008A0002 ......^.......Ä...............*. 0000C0
066E0103 001E0002 007C0103 00900002 06020103 00190002 06350103 01750006 ..u...5...............|.......n. 0000E0
01F70103 00180004 02640203 01800006 018E0203 0000000C 04A70002 001F0002 .......I......./.......d.......¥. 000100
04D20203 01AF0006 01AA0203 04830008 02830203 00450002 04660103 00830002 ..*...f...E..........`...€...®. 000120
26065EC4 D88EFFFF 881E5657 00001EC8 00000000 00000000 00000000 04950008 .................à...WV.|...Äá^.& 000140
2476FF20 76FF2276 FF1B76FF 1A76FF06 76FF0876 FF002EE9 03740247 08260788 ..&.G.t.Õ...v..v..v..v..v".v .v$ 000160
FF2076FF 2276FF03 E1E9E846 8B0006E9 03750000 30E84689 0EC48303 8A06E19A .Ä....á..FÒ=..u.Õ...FÒÕÄ..v".v . 000180
2476FF00 25E90375 000030E8 46890000 00A79A50 16F84680 1276FF18 76FF1A76 v..v..v..F½.P.I....FÒ=..u.ÕX..v$ 0001A0
E9E84688 07892602 47892600 0088065E C4000000 C49A37FF 260277FF 26065EC4 á^.&.w.&.7.á...á^.|..&.G.&...FÒÕ 0001C0
0030E846 890000FF FF9A5016 EC468D12 76FF1476 FF1676FF 1C76FF1E 76FF0398 ...v..v..v..v..v..F&.P......FÒ=. 0001E0

Dump of file SATURN:[PCCOMMON.DUMP.DLL]DAMERGE.TMP;1 on 18-APR-1990 10:42:05.48
File ID (575,19,0)   End of file block 101 / Allocated 104

Virtual block number 14 (0000000E), 512 (0200) bytes

89260000 B8065EC4 00000148 9A37FF26 0277FF26 065EC424 76FF0025 E9037500 .u.ÕX..v$á^.&.w.&.7.H...á^.|..&. 000000
5EC404FC 46830004 E9FE5689 FC4689FA 5688F846 8B034FE9 E8468807 89260247 G.&...FÒÕÕ..F½.V*.F=.V±Õ...F=.á^ 000020
76FF2276 FF0000EA 46C7E246 89E44689 00008802 E3E90375 02470826 078826FC =&..&.G.u.ÕO.|...FÕ.FàúFõ...v".v 000040
890000FF FF9A5016 EA468037 FF260277 FF26065E C437FF26 0277FF26 FC5EC420 á^=&.w.&.7á^.&.w.&.7.F.P...... 000060
B8065EC4 00000101 9A37FF26 0277FF26 065EC424 76FF0036 E9037500 0030E846 FÒ=..u.Õ6..v$á^.&.w.&.7. ..á^.| 000080
028AE9E8 46880000 01EF9AF8 76FFFA76 FF2076FF 2276FF07 89260247 89260000 ..&.G.&...v".v .v*.v½.ÿ....FÒÕn. 0000A0
C404F446 830004E9 F65689F4 4689EE56 88EC4688 FF6EE900 03E90375 00EA7E83 .-õ.u.Õ..Õn..F&.V¥.F¶.V-Õ...F¶.á 0000C0
468037FF 260277FF 26F45EC4 1C76FF1E 76FF0108 E9037502 47082607 8826F45E ^¶&..&.G.u.Õ...v..v.á^¶&.w.&.7.F 0000E0
37FF2602 77FF2606 5EC42476 FF0047E9 03750000 30E84689 0000FFFF 9A5016E6 |.P......FÒ=..u.ÕG..v$á^.&.w.&.7 000100
009AF876 FFFA76FF 2076FF22 76FF0789 26024789 26000088 065EC400 00025F9A ._...á^.|..&.G.&...v".v .v*.v½.. 000120
037500E6 7E830220 E9E8468B 0000027D 9AEC76FF EE76FF1C 76FF1E76 FF000002 ....v..v..v¥.v$.)....FÒÕ ..-|.u. 000140
260277FF 26FC5EC4 37FF2602 77FF26F4 5EC40E76 FF5016E2 4680FF75 E90003E9 Õ..Õu..Fã.P.v.á^¶&.w.&.7á^=&.w.& 000160
47E90375 00003DE8 468916C4 8302F804 319A2076 FF2276FF 1C76FF1E 76FF37FF .7.v..v..v".v .1.«..á..FÒ=..u.ÕG 000180
07892602 47892600 0088065E C4000003 199A37FF 260277FF 26065EC4 2476FF00 ..v$á^.&.w.&.7.....á^.|..&.G.&.. 0001A0
03379AEC 76FFEE76 FF1C76FF 1E76FF00 00028E9A F876FFFA 76FF2076 FF2276FF .v".v .v*.v½......v..v..v¥.v$.7. 0001C0
75E44608 E24688FE E2E90003 E90003E9 0375E446 08E2468B 0192E9E8 46880000 ...FÒÕ...Fã.FÕu.Õ..Õ..Õà±.Fã.FÕu 0001E0

Dump of file SATURN:[PCCOMMON.DUMP.DLL]DAMERGE.TMP;1 on 18-APR-1990 10:42:05.48
File ID (575,19,0)   End of file block 101 / Allocated 104

Virtual block number 15 (0000000F), 512 (0200) bytes

1676FF12 76FF1076 FF0E76FF 0A76FF0C 76FF37FF 260277FF 26065EC4 0090E903 .Õ..á^.&.w.&.7.v..v..v..v..v..v. 000000
FF1C76FF 1E76FF37 FF260277 FF26FC5E C4E276FF E476FF18 76FF1A76 FF1476FF .v..v..v..vÕ.vãá^=&.w.&.7.v..v.. 000020
5EC42476 FF0036E9 03750000 30E84689 28C483FF FF09249A 2476FF20 76FF2276 v".v .v$.$....á(.FÒ=..u.Õ6..v$á^ 000040
2076FF22 76FF0789 26024789 26000088 065EC400 0003859A 37FF2602 77FF2606 .&.w.&.7.ç...á^.|..&.G.&...v".v 000060
F0468DF0 4689F246 89000088 0099E900 E9E9E846 880000FF FF9AF876 FFFA76FF .v*.v½......FÒÕÕ.Õ..|...F·.FÞ.FÞ 000080
5EC41876 FF1A76FF 1476FF16 76FF1276 FF1076FF 37FF2602 77FF2606 5EC45016 .Pá^.&.w.&.7.v..v..v..v..v..v.á^ 0000A0
8922C483 FFFF0000 9A2476FF 2076FF22 76FF1C76 FF1E76FF 37FF2602 77FF26FC =&.w.&.7.v..v..v".v .v$......á". 0000C0
77FF2606 5EC42476 FFFD43E9 0003E903 7494FFE8 7E810043 E9037500 0030E846 FÒ=..u.ÕC..-Õ..t.Õ..ÕC».v$á^.&.w 0000E0
FFFA76FF 2076FF22 76FF0789 26024789 26000088 065EC400 00FFFF9A 37FF2602 .&.7.....á^.|..&.G.&...v".v .v*. 000100
00040F9A EC76FFEE 76FF1C76 FF1E76FF FD0AE900 40E9E846 88000003 ED9AF876 v½.Ù....FÒÕM.Õ.».v..v..v¥.v$.... 000120
669AF876 FFFA76FF 2076FF22 76FF0028 E9E8468B 0006E903 75000030 E8468900 ..FÒ=..u.Õ...FÒÕ(..v".v .v*.v½.f 000140
20CAC95F 5E1F0000 E90000B8 0006E9E8 46880006 E9037500 0030E846 89000001 ....FÒ=..u.Õ...FÒÕ..|..Õ...^_èò 000160
03750016 7E830789 26024789 26000088 185EC408 8E000888 1E565700 009CC800 .à...WV.|...Äá^.|..&.G.&...~..u. 000180
46880006 E9037500 0030B046 890000FF FF9A5016 B2468D0A 76FF0C76 FF0024E9 Õ$..v..v..Fý.P......F¯=..u.Õ...F 0001A0
E9037500 0030B046 890000FF FF9A5016 B2468D0A 76FF0C76 FF0021E9 017EE9B0 ¯Õ-.ÕI..v..v..Fý.P......F¯=..u.Õ 0001C0
16FF6486 8D0E76FF 1076FF06 76FF0876 FF013AE9 9B82468A 015AE9B0 46880006 ...F¯ÕZ..Fý.Õ:..v..v..v..v...d.. 0001E0
```

Dump of file SATURN:[PCCOMMON.DUMP.DLL]DAMERGE.TMP;1 on 18-APR-1990 10:42:05.48
File ID (575,19,0)   End of file block 101 / Allocated 104

Virtual block number 16 (00000010), 512 (0200) bytes

```
1476FF0A 76FF0C76 FF012BE9 80468800 06E90375 00003080 46890000 04D99A50 P.\....F¯=..u.Ō...F¯Ō+..v..v..v. 000000
86800104 E9804688 0006E903 75000030 80468900 0005359A 50168446 8D1276FF .v..FÇ.P.5....F¯=..u.Ō...F¯Ō.... 000020
880006E9 14568312 46880009 E9037400 00300000 05709A50 16844680 5016FF64 d..P.FÇ.P.)...=..t.Ō...F..V.Ō..¡ 000040
86800E76 FF1076FF 0676FF08 76FF00CA E9025789 26078926 185EC400 008A0000 ..o..á^.&..&.W.Ōb..v..v..v..v... 000060
0A76FF0C 76FF00A8 E9804688 0006E903 75000030 80468900 00055C9A 5016FF64 d..P.\....F¯=..u.Ō...F¯Ō´..v..v. 000080
81E98046 880006E9 03750000 30804689 0000FFFF 9A501684 46801276 F¯¹476FF .v..v..FÇ.P......F¯=..u.Ō...F¯Ō. 0000A0
88124688 185EC400 13E90374 00003000 00FFFF9A 50168446 8D5016FF 64L 9000 ...d..P.FÇ.P.....=..t.Ō..á^..F.. 0000C0
76FF0E76 FF1076FF 1276FF14 76FF1876 FF1A76FF 0037E902 57892607 8926 456 V.&..&.W.Ō7..v..v..v..v..v..v..v 0000E0
80468800 06E90375 00003080 468914C4 83024105 F79A0676 FF0876FF 0A76FF0C ..v..v..v..¾.A..á..F¯=..u.Ō...F¯ 000100
E9000088 0000E9FF 39E90375 00533DFE 8EE90375 004E3D00 13E90016 E9001FE9 Ō..Ō..Ō..=N.u.Ō/±=S.u.Ō9.Ō..¡..Ō 000120
76FF0E76 FF1076FF 5016AA46 8D088E04 39881E56 570000AC C8C8C95F 5E1F0000 ...^_èùà¯..WV.¡9..Å.F¨.P.v..v..v 000140
0676FF08 76FF022F E9A04688 0006E903 75000030 0CC48305 8D085E9A 0676FF08 ..v.¯^.§..á.=..u.Ō...F.Ō/..v..v. 000160
08E9A046 880000E9 03750000 30000006 669A5016 AC468DAA 76FF0E76 FF1076FF .v..v..v´.F¨.P.f...=..u.Ō...F.Ō. 000180
E9037500 00300000 005E9A50 16A2468D AA76FF12 76FF1476 FF0A76FF 0C76FF02 ..v..v..v..v..v¯.FÅ.P.^...=..u.Ō 0001A0
26000088 165EC401 00E9A046 88000006 E89AAC76 FFAE76FF 0676FF08 76FF0000 ...v..v..vÙ.v¯.Š....F.¹¼.á^.¡..& 0001C0
26078826 FC5EC404 FC468300 04E9FE56 89FC4689 AE5688AC 46880789 26024789 .G.&...F¯.VÙ.F=.V±Ō...F·.á^=&..& 0001E0
```

Dump of file SATURN:[PCCOMMON.DUMP.DLL]DAMERGE.TMP;1 on 18-APR-1990 10:42:05.48
File ID (575,19,0)   End of file block 101 / Allocated 104

Virtual block number 17 (00000011), 512 (0200) bytes

```
3E9A5016 FF54868D 37FF2602 77FF26FC 5EC40676 FF0876FF 0146E903 7502470B .G.u.ŌF..v..v.á^=&.w.&.7..T..P.> 000000
FF000006 FC9AAC76 FFAE76FF 0676FF08 76FF0028 E9037500 0030A046 89000007 ....F.=..u.Ō(..v..v..vÙ.v¯.•.... 000020
89A64689 A45688A2 46880153 E9A04688 00000303 9AA276FF A476FF0A 76FF0C76 v..v..vÊ.vÅ.Æ....F.ŌS..FÅ.VÊ.FÌ. 000040
5EC40A76 FF0C76FF 0003E903 7502470B 26078826 A65EC404 A6468300 04E9A856 V´Ō...FÌ.á^Ì&..&.G.u.ŌÆ..v..v.á^ 000060
0876FF00 28E90375 000030A0 46890000 04829A50 1680468D 37FF2602 77FF26A6 Ì&.w.&.7.F¯.P.ý....F.=..u.Ō(..v. 000080
88000007 AA9AA276 FFA476FF 0A76FF0C 76FF0000 07689AAC 76FFAE76 FF0676FF .v..vÙ.v¯.k....v..v..vÊ.vÅ.¯.... 0000A0
165EC400 68E90374 00003000 0004FA9A 50168046 8D5016FF 5486800 E4E9A046 F.Ōō...T..P.F¯.P.•...=..t.Ōk.á^. 0000C0
46890000 07C69AAC 76FFAE76 FF0676FF 0876FF02 57892607 89261456 88124688 .F..V.&..&.W..v..v..vÙ.v¯.ó....F 0000E0
0089E9A0 46880000 07DD9AA2 76FFA476 FF0A76FF 0C76FF00 17E90375 000030A0 .=..u.Ō...v..v..vÊ.vÅ.Ì....F.Ō.. 000100
E9A04688 0006E903 75000030 A0468900 00080B9A A676FFA8 76FF0A76 FF0C76FF .v..v..v´.vÌ......F.=..u.Ō...F.Ō 000120
89000008 279AAC76 FFAE76FF 0676FF08 76FFFEA7 E9FF1AE9 0061E900 00880067 g.¡..Ōa.Ō..ŌÌ±.v..v..vÙ.v¯.´.... 000140
28E9A046 88000008 3E9AA676 FFA876FF 0A76FF0C 76FF0017 E9037500 0030A046 F.=..u.Ō...v..v..v´.vÌ.>....F.Ō( 000160
A0468800 06E90375 000030A0 46890000 067F9AA6 76FFA876 FF0A76FF 0C76FF00 ..v..v..v´.vÌ......F.=..u.Ō...F. 000180
0676FF08 76FFD88E 05FF881E 56570000 04C8CBC9 5F5E1F00 00E90000 880006E9 Ō..¡..Ō...^_èùà...WV.¡...Å.v..v. 0001A0
8EE9FC46 880006E9 03750000 30FC4689 0000FFFF 9A5016FE 46800A76 FF0C76FF .v..v..F±.P¯.....F==..u.Ō...F=Ō. 0001C0
0E5EC400 6CE90011 07C7260E 5EC40077 E9000707 C7260E5E C40053E9 FE468800 ..F±ŌS.á^.&ú...Ōw.á^.&ú...ŌÌ.á^. 0001E0
```

Dump of file SATURN:[PCCOMMON.DUMP.DLL]DAMERGE.TMP;1 on 18-APR-1990 10:42:05.48
File ID (575,19,0)   End of file block 101 / Allocated 104

Virtual block number 18 (00000012), 512 (0200) bytes

```
5EC4004B E9001107 C7260E5E C40056E9 001207C7 260E5EC4 0061E900 1007C726 &ú...Ōa.á^.&ú...ŌV.á^.&ú...ŌK.á^ 000000
00003000 0220002F E90032E9 0035E900 0407C726 0E5EC400 40E90007 07C7260E .&ú...Ōa.á^.&ú...Ō5.Ō2.Ō/.-..=.. 000020
E408E408 CE08E408 88089708 AD08E408 C308A208 FDA7FF2E 93C003FF EFE90376 v.Ōÿ..á...Ì».Å.ū.Ō.Ù...¡.Ō.ö.Ō.Ō 000040
D88E0866 881E5657 000008C8 CBC95F5E 1F0000E9 00008808 D908E408 E408E408 .Ō.Ō.Ō.1.¡..Ō...^_èùà...WV.¡f..Å 000060
75000030 FE468900 00FFFF9A 5016FC46 8D0C76FF 0E76FF00 24E90375 00247E83 .-$.u.Ō$..v..v..F=.P......F±=..u 000080
FE468900 00FFFF9A 5016FC46 8D0C76FF 0E76FF00 21E90289 E9FE4688 0006E903 .Ō...F±Ō..ŌÌ..v..v..F•.P......F± 0000A0
76FFF846 89FA4689 00008802 35E998FC 468A0265 E9FE4688 0006E903 75000030 =..u.Ō...F±Ōe..F=.Ō5.¡...F'.F½.v 0000C0
FF0676FF 0040E903 75000030 0000FFFF 9A5016F8 46802A76 FF2C76FF 1076FF12 ..v..v,.v*.F½.P.....=..u.Ōa..v.. 0000E0
2C76FFF8 76FFFA76 FF1076FF 1276FF1C 76FF1E76 FF0C76FF 0E76FF08 76FF0A76 v..v..v..v..v..v..v..v..v*.v½.v, 000100
FF0E76FF 01F1E901 FAE9FE46 880006E9 03750000 30FE4689 0000FFFF 9A2A76FF .v*......F±=..u.Ō...F±Ō'.Ōþ..v.. 000120
75000030 FE468900 00FFFF9A 2076FF1C 76FF1E76 FF2276FF 1476FF16 76FF0C76 v..v..v..v".v..v..v ......F±=..u 000140
76FF1E76 FF2076FF 2276FF2A 76FF2C76 FF5016F8 468001C9 E9FE4688 0006E903 .Ō...F±Ōè..F½.P.v,.v*.v".v .v..v 000160
3300009A 0676FF08 76FF0A76 FF0C76FF 0E76FF10 76FF1276 FF1876FF 1A76FF1C ..v..v..v..v..v..v..v..v..v....3 000180
76FF1676 FF0C76FF 0E76FF01 7EE9FE46 880006E9 03750000 30FE4689 22C48300 ..á".F±=..u.Ō...F±Ō~..v..v..v..v 0001A0
FE468800 06E90375 00003DFE 46890000 FFFF9A20 76FF1C76 FF1E76FF 2276FF14 ..v".v..v..v ......F±=..u.Ō...F± 0001C0
880006E9 03750000 30FE4689 0000FFFF 9A1476FF 1676FF0C 76FF0E76 FF0150E9 ŌP..v..v..v..v.......F±=..u.Ō... 0001E0
```

Dump of file SATURN:[PCCOMMON.DUMP.DLL]DAMERGE.TMP;1 on 18-APR-1990 10:42:05.48
File ID (575,19,0)   End of file block 101 / Allocated 104

Virtual block number 19 (00000013), 512 (0200) bytes

```
46890000 087C9A50 16F84680 1076FF12 76FF0876 FF0A76FF 0125E901 2EE9FE46 F±Õ..ÕX..v..v..v..v..F%.P.|....F 000000
76FF1076 FF127.FF 0028E903 7402F87E 830104E9 FE468800 06E90375 000030FE ±=..u.Õ...F±Õ...~%.t.Õ(..v..v..v 000020
0003E9FE 46880006 E9037500 0030FE46 890000FF FF9A2A76 FF2C76FF 1476FF16 ..v..v,.v*......F±=..u.Õ...F±Õ&. 000040
76FF1476 FF1676FF 1076FF12 76FF0C76 FF0E76FF 0876FF0A 76FF0676 FF00CAE9 Õò..v..v..v..v..v..v..v..v..v..v 000060
3DFE4689 265EFF2A 76FF2C76 FF2476FF 2276FF20 76FF1C76 FF1E76FF 1876FF1A ..v..v..v..v .v".v$.v,.v*.^&.F±= 000080
76FF5016 F8468DF8 4689FA46 89000088 007DE900 86E9FE46 880006E9 03750000 ..u.Õ...F±Õ..Õ).|...F*.F%.F%.P.v 0000A0
FF0E76FF 1076FF12 76FF1876 FF1A76FF 1C76FF1E 76FF2076 FF2276FF 2A76FF2C ,.v*.v".v .v..v..v..v..v..v..v.. 0000C0
46880006 E9037500 0030FE46 8922C483 0A4F0692 9A0676FF 0876FF0A 76FF0C76 v..v..v..v....0..á".F±=..u.Õ...F 0000E0
E9037500 5330FF96 E9037500 4830FF51 E9037500 43300023 E90026E9 002FE9FE ±Õ/.Õ&.Õ#.=C.u.ÕQ.=K.u.Õ..=S.u.Õ 000100
881E5657 000074C8 CBC95F5E 1F0000E9 00008800 00E9FEDE E9037500 5430FD83 *»=T.u.Õ8±Õ..|..Õ...^_èùàt..WV.| 000120
00888C46 898E4689 000088FF FF02AD9A C05E8D0C 0301149A 1CCE1E8D D88E092C ,..Ä..ö.......^à.Ù...ĩ...F..F.|. 000140
00880000 A846C700 CC46C600 9046C600 00A646C7 0000AE46 C7C84689 CA468900 ..Fò.FàúFÙ..úFĩ..óF..óFà.úF´..|. 000160
899C5689 9A4689A0 56899E46 89A45689 A2468900 008A0000 88AA4689 AC468900 ..F¯.F´|..□...FÅ.VÉ.F..V..F..V.. 000180
9446800A 76FF0C76 FFD05689 CE468904 56890246 8900008A 00008898 56899646 F..V.|..□..,F@.VÀ.Fö.VÅ.v..v..F. 0001A0
06E90374 54947E80 0147E992 46880006 E9037500 003D9246 890000FF FF9A5016 .P......F.=..u.Õ...F.ÕG..~.Tt.Õ. 0001C0
8CAA4689 8C468000 CAE9AC56 8CAA4689 C0468000 ACE91846 880138E9 00008800 .|..Õ8..F.Õ¯..Fà.F¯.V¯Õò..F..F¯. 0001E0
```

Dump of file SATURN:[^CCOMMON.DUMP.DLL]DAMERGE.TMP;1 on 18-APR-1990 10:42:05.48
File ID (575,19,0)   End of file block 101 / Allocated 104

Virtual block number 20 (00000014), 512 (0200) bytes

```
A6468000 A6E9AC56 8CAA4689 AE468000 82E9AC56 8CAA4689 C8468000 BEE9AC56 V¯Õ/..Fà.F¯.V¯Õý..FÙ.F¯.V¯ÕI..FI 000000
82E9AC56 8CAA4689 CC468000 8EE9AC56 8CAA4689 90468000 9AE9AC56 8CAA4689 .F¯.V¯Õ...F..F¯.V¯Õ...Fà.F¯.V¯Õ. 000020
8CAA4689 96468000 6AE9AC56 8CAA4689 80468000 76E9AC56 8CAA4689 A8468000 ..F¯.F¯.V¯Õv..F¯.F¯.V¯Õj..F..F¯. 000040
FF00009A 50160646 80004468 1E296A00 52E9AC56 8CAA4689 CE468000 5EE9AC56 V¯Õ^..Fö.F¯.V¯ÕR.j).hD..F@.P.... 000060
F2E90376 000C3000 2AE9002D E90030E9 0033E9AC 568CAA46 89064680 0AC483FF ..á..F@.F¯.V¯Õ3.Õ0.Õ-.Õ*.=..v.Õ· 000080
90002100 1500090C FD0CF10C E50CD90C CD0CC10C 850CA900 59A7FF2E 93C003FF ..à...ÌY.`.ç.é.ë.).Í.þ.».....I.. 0000A0
92468900 00FFFF9A AA76FFAC 76FF1676 FF0E76FF 1076FF06 76FF0876 FF00400C .ã..v..v..v..v..v..v¯.v¯......F. 0000C0
AC76FF16 76FF1276 FF1476FF 0A76FF0C 76FF0031 E992468B 0006E903 75000030 =..u.Õ...F.Õ1..v..v..v..v..v..v¯ 0000E0
1F0000E9 00008800 06E99246 880006E9 03750000 30924689 0000FFFF 9AAA76FF .v¯......F.=..u.Õ...F.Õ..|..Õ... 000100
46800F6A 0E76FF10 76FF0676 FF0876FF D88E0BF0 881E5657 00000EC8 CBC95F5E ^_èùà...WV.|Þ..Ä.v..v..v..v.j..F 000120
FF0A76FF 0C76FF01 65E9F646 880006E9 03750000 30F64689 00000E1D 9A5016F2 ·¯P......F-=..u.Õ...F-Õe..v..v.. 000140
E9F6468B 0006E903 7500003D F6468900 00FFFF9A 5016FC46 800F6A12 76FF1476 v..v.j..F@.P......F-=..u.Õ...F-Õ 000160
00880120 E90000B8 0006E903 74FE4608 FC468800 11E90374 F44608F2 4688013C <..F·.F¶t.Õ...F@.F±t.Õ..|..Õ .|. 000180
76FFF276 FFF476FF FC76FFFE 76FF5016 F8468016 76FF1876 FFF84689 FA468900 ..F*.F%.v..v..F%.P.v±.v=.v¶.v·.v 0001A0
468920C4 83FFFF00 009A0676 FF0876FF 0A76FF0C 76FF0E76 FF1076FF 1276FF14 ..v..v..v..v..v..v..v.........á .F 0001C0
FE5688FC 4688007C E90375FA 4608F846 8800CFE9 F6468800 06E90375 000030F6 -=..u.Õ...F-Õù..F%.F*u.Õ|..F=.V± 0001E0
```

Dump of file SATURN:[PCCOMMON.DUMP.DLL]DAMERGE.TMP;1 on 18-APR-1990 10:42:05.48
File ID (575,19,0)   End of file block 101 / Allocated 104

Virtual block number 21 (00000015), 512 (0200) bytes

```
76FF0C76 FF002CE9 0375FE46 08FC4688 0066E903 75FA5639 0008E903 74F84639 9F%t.Õ..9V*u.Õf..F=.F±u.Õ,..v..v 000000
06E90375 000030F6 46890000 0F539A14 6AFC76FF FE76FF0F 6A1276FF 1476FF0A ..v..v.j..v±.v=j..S....F-=..u.Õ. 000020
FFFF9A14 6AF876FF FA76FF0F 6A1276FF 1476FF0A 76FF0C76 FF0077E9 F6468800 ..F-Õw..v..v..v..v.j..v*.v%j.... 000040
37E90374 FA4608F8 46880042 E9004BE9 F6468800 06E90375 000030F6 46890000 ...F-=..u.Õ...F-ÕK.Õ8..F%.F*t.Õ7 000060
FC76FFFE 76FF0F6A 1276FF14 76FF0A76 FF0C76FF 002CE903 75FE4608 FC468800 ..F=.F±u.Õ,..v..v..v..v.j..v±.v= 000080
5E1F0000 E90000B8 0006E9F6 46880006 E9037500 0030F646 890000FF FF9A146A j.......F-=..u.Õ...F-Õ..|..Õ...^ 0000A0
8900000C 739A5016 FE46800A 76FF0C76 FFD88E00 DC881E56 5700000A C8C8C95F _èùà...WV.|É..Ä.v..v..F±.P.s.... 0000C0
FF00FAE9 00008800 06E90374 54FE7E80 0109E9FC 46880006 E9037500 0030FC46 F==..u.Õ...F=Õ...-±Tt.Õ..|..Õ*.. 0000E0
30FC4689 00000EE2 9A2076FF 1276FF14 76FF1E76 FF1A76FF 1C76FF0A 76FF0C76 v..v..v..v..v..v..v..v .ã....F== 000100
03740856 390039E9 03740646 390C5688 0A468800 CCE9FC46 880006E9 03750000 ..u.Õ...F=Õa..F..V.9F.t.Õ9.9V.t. 000120
00000F0E 9A2076FF 1276FF14 76FF1E76 FF1676FF 1876FF0A 76FF0C76 FF0031E9 Õ1..v..v..v..v..v..v..v..v ..... 000140
1676FF18 76FF0676 FF0876FF 007FE900 88E9FC46 880006E9 03750000 30FC4689 .F==..u.Õ...F=Õ..Õ...v..v..v..v. 000160
76FF1876 FF005EE9 FC468800 06E90375 000030FC 46890000 0ACA9A50 16FA4680 .F*.P.ò....F==..u.Õ...F=Õ^..v..v 000180
880006E9 03750000 30FC4689 0000FFFF 9A5016F6 46802276 FF2476FF FA76FF16 ..v*.v$.v".F-.P......F==..u.Õ... 0001A0
100C9A20 76FF1276 FF1476FF 1E76FFF6 76FFF876 FF0A76FF 0C76FF00 34E9FC46 F=Õ4..v..v..v%.v-.v..v..v..v ... 0001C0
02C8CBC9 5F5E1F00 00E90000 B80006E9 FC468800 06E90375 00003DFC 46890000 ...F==..u.Õ...F=Õ..|..Õ...^_èùà. 0001E0
```

```
Dump of file SATURN:[PCCOMMON.DUMP.DLL]DAMERGE.TMP;1 on 18-APR-1990 10:42:05.48
File ID (575,19,0)   End of file block 101 / Allocated 104

Virtual block number 22 (00000016), 512 (0200) bytes

 FF1C76FF 1E76FF20 76FF2276 FF2476FF 2676FF28 76FFD88E 0F7BBB1E 56570000 ..WV.¡(..Ä.v(.v&.v$.v".v .v..v.. 000000
 0030FE46 89113C00 009A5016 06468DFF FF6810E9 68016A10 6A186A18 76FF1A76 v..v.j.j.j.hÕ.h...F..P...<..F±=. 000020
 FE468900 00FF.F9A 0676FF08 76FF2076 FF2276FF 04ECE9FE 46880006 E9037500 .u.Õ...F±Õ$..v".v .v..v.......F± 000040
 1E76FF20 76FF22.6 FF2476FF 2676FF28 76FF04CA E9FE4688 0006E903 7500003D =..u.Õ...F±Õò..v(.v&.v$.v".v .v. 000060
 FF0499E9 FE468800 06E90375 00003DFE 46891171 1A649A06 76FF0876 FF1C76FF .v..v..v..d.q..F±=..u.Õ...F±Õ... 000080
 016A0A6A 136A1876 FF1A76FF 1C76FF1E 76FF2076 FF2276FF 2476FF26 76FF2876 v(.v&.v$.v".v .v..v..v..v.j.j.j. 0000A0
 57E9FE46 880006E9 03750000 3DFE4689 11830000 9A501606 4680FFFF 68117E68 h-.h...F..P...°..F±=..u.Õ...F±ÕW 0000C0
 046A236A 1876FF1A 76FF1C76 FF1E76FF 2076FF22 76FF2476 FF2676FF 2876FF04 ..v(.v&.v$.v".v .v..v..v..v.j#j. 0000E0
 FE468800 06E90375 00003DFE 468911F5 00009A50 1606468D FFFF6811 C068016A j.hå.h...F..P...%..F±=..u.Õ...F± 000100
 126A1876 FF1A76FF 1C76FF1E 76FF2076 FF2276FF 2476FF26 76FF2876 FF0415E9 Õ...v(.v&.v$.v".v .v..v..v..v.j. 000120
 880006E9 03750000 3DFE4689 12340000 9A501606 4680FFFF 68120268 006A036A j.j.h..h...F..P...4..F±=..u.Õ... 000140
 76FF2676 FF2076FF 2276FF1C 76FF1E76 FF1876FF 1A76FF03 6A076A03 D3E9FE46 F±Õ£.j.j..v..v..v..v..v".v .v&.v 000160
 76FF046A 066A039E E9FE4688 0006E903 7500003D FE468914 C4831269 0BE89A24 $.Õ.i..á..F±=..u.Õ...F±Õ..j.j..v 000180
 468914C4 83129E0B E89A2476 FF2676FF 2076FF22 76FF1C76 FF1E76FF 1876FF1A ..v..v..v..v".v .v&.v$.Õ....á..F 0001A0
 FF1C76FF 1E76FF18 76FF1A76 FF056A03 6A0369E9 FE468800 06E90375 00003DFE ±=..u.Õ...F±Õi.j.j..v..v..v..v.. 0001C0
 46880006 E9037500 003DFE46 8914C483 12D30BE8 9A2476FF 2676FF20 76FF2276 v".v .v&.v$.Õ.£..á..F±=..u.Õ...F 0001E0

Dump of file SATURN:[PCCOMMON.DUMP.DLL]DAMERGE.TMP;1 on 18-APR-1990 10:42:05.48
File ID (575,19,0)   End of file block 101 / Allocated 104

Virtual block number 23 (00000017), 512 (0200) bytes

 2476FF26 76FF2076 FF2276FF 1C76FF1E 76FF1876 FF1A76FF 066A036A 0334E9FE ±Õ4.j.j..v..v..v..v..v".v .v&.v$ 000000
 1A76FF07 6A036A02 FFE9FE46 880006E9 03750000 3DFE4689 14C48313 080BE89A .Õ....á..F±=..u.Õ...F±Õ..j.j..v. 000020
 FE468914 C483133D 0BE89A24 76FF2676 FF2076FF 2276FF1C 76FF1E76 FF1876FF .v..v..v..v".v .v&.v$.Õ.=..á..F± 000040
 76FF1C76 FF1E76FF 1876FF1A 76FF086A 036A02CA E9FE4688 0006E903 7500003D =..u.Õ...F±Õò.j.j..v..v..v..v..v 000060
 FE468800 06E90375 00003DFE 468914C4 8313720B E89A2476 FF2676FF 2076FF22 ".v .v&.v$.Õ.r..á..F±=..u.Õ...F± 000080
 9A2476FF 2676FF20 76FF2276 FF1C76FF 1E76FF18 76FF1A76 FF096A03 6A0295E9 Õ..j.j..v..v..v..v..v".v .v&.v$. 0000A0
 FF1A76FF 0A6A036A 0260E9FE 46880006 E9037500 003DFE46 8914C483 13A70BE8 Õ.Ï..á..F±=..u.Õ...F±Õ'.j.j..v.. 0000C0
 3DFE4689 14C48313 DC0BE89A 2476FF26 76FF2076 FF2276FF 1C76FF1E 76FF1876 v..v..v..v".v .v&.v$.Õ.Ê..á..F±= 0000E0
 2276FF1C 76FF1E76 FF1876FF 1A76FF08 6A036A02 2BE9FE46 880006E9 03750000 ..u.Õ...F±Õ+.j.j..v..v..v..v..v" 000100
 E9FE4688 0006E903 7500003D FE468914 C4831411 0BE89A24 76FF2676 FF2076FF .v .v&.v$.Õ....á..F±=..u.Õ...F±Õ 000120
 E89A2476 FF2676FF 2076FF22 76FF1C76 FF1E76FF 1876FF1A 76FF0C6A 036A01F6 -.j.j..v..v..v..v..v".v .v&.v$.Õ 000140
 76FF1A76 FF006A03 6A01C1E9 FE468800 06E90375 00003DFE 468914C4 A314460B .F..á..F±=..u.Õ...F±Õé.j.j..v..v 000160
 003DFE46 8914C483 06170BE8 9A2476FF 2676FF20 76FF2276 FF1C76FF 1C76FF18 ..v..v..v".v .v&.v$.Õ....á..F±=. 000180
 FF2276FF 1C76FF1E 76FF1876 FF1A76FF 0E6A036A 018CE9FE 46880006 E9037500 .u.Õ...F±Õ..j.j..v..v..v..v..v". 0001A0
 57E9FE46 880006E9 03750000 3DFE4689 14C48314 800BE89A 2476FF26 76FF2076 v .v&.v$.Õ.¯..á..F±=..u.Õ...F±ÕW 0001C0
 0BE89A24 76FF2676 FF2076FF 2276FF1C 76FF1E76 FF1876FF 1A76FF0F 6A036A01 .j.j..v..v..v..v..v".v .v&.v$.Õ. 0001E0

Dump of file SATURN:[PCCOMMON.DUMP.DLL]DAMERGE.TMP;1 on 18-APR-1990 10:42:05.48
File ID (575,19,0)   End of file block 101 / Allocated 104

Virtual block number 24 (00000018), 512 (0200) bytes

 1876FF1A 76FF106A 036A0122 E9FE4688 0006E903 7500003D FE468914 C48314E5 Í..á..F±=..u.Õ...F±Õ".j.j..v..v. 000000
 00003DFE 468914C4 83151A0B E89A2476 FF2676FF 2076FF22 76FF1C76 FF1E76FF .v..v..v".v .v&.v$.Õ....á..F±=.. 000020
 76FF2276 FF1C76FF 1E76FF18 76FF1A76 FF116A03 6A00EDE9 FE468800 06E90375 u.Õ...F±ÕÚ.j.j..v..v..v..v..v".v 000040
 00BBE9FE 46880006 E9037500 003DFE46 8914C483 15520BE8 9A2476FF 2676FF20  .v&.v$.Õ.R..á..F±=..u.Õ...F±Õ¡. 000060
 6A066A16 6A1876FF 1A76FF1C 76FF1E76 FF2076FF 2276FF24 76FF2676 FF2876FF .v(.v&.v$.v".v .v..v..v..v.j.j.j 000080
 E9FE4688 0006E903 7500003D FE468915 9400009A 50160646 80FFFF68 155F6801 .h_.h...F..P......F±=..u.Õ...F±Õ 0000A0
 6A226A18 76FF1A76 FF1C76FF 1E76FF20 76FF2276 FF2476FF 2676FF28 76FF0076 v..v(.v&.v$.v".v .v..v..v..v.j"j 0000C0
 46880006 E9037500 003DFE46 89100C00 009A5016 06468DFF FF6815A1 68006A05 .j.hÅ.h...F..P...É..F±=..u.Õ...F 0000E0
 00FFFF9A 1876FF1A 76FF1C76 FF1E76FF 2076FF22 76FF2476 FF2676FF 0034E9FE ±Õ4..v&.v$.v".v .v..v..v..v..... 000100
 C80024CA C95F5E1F 0000E900 00880006 E9FE4688 0006E903 7500003D FE468900 ..F±=..u.Õ...F±Õ..¡..Õ...^_èò$.à 000120
 76FF2276 FF1C76FF 1E76FF18 76FF1A76 FF036A00 6AD88E10 B6B81E56 57000004 ...WV.¡Ñ..Äj.j..v..v..v..v..v".v 000140
 042DE9FC 46880006 E9037500 003DFC46 8914C483 164F0BE8 9A2476FF 2676FF20  .v&.v$.Õ.O..á..F==..u.Õ...F=Õ-. 000160
 840BE89A 2476FF26 76FF2076 FF2276FF 1C76FF1E 76FF1876 FF1A76FF 046A006A j.j..v..v..v..v..v".v .v&.v$.Õ.. 000180
 FF1876FF 1A76FF05 6A006A03 F8E9FC46 880006E9 03750000 3DFC4689 14C48316 ..á..F==..u.Õ...F=Õ%.j.j..v..v.. 0001A0
 7500003D FC468914 C4831689 0BE89A24 76FF2676 FF2076FF 2276FF1C 76FF1E76 v..v..v".v .v&.v$.Õ.¿..á..F==..u 0001C0
 2076FF22 76FF1C76 FF1E76FF 1876FF1A 76FF066A 026A03C3 E9FC4688 0006E903 .Õ...F=ÕÚ.j.j..v..v..v..v..v".v  0001E0
```

```
Dump of file SATURN:[PCCOMMON.DUMP.DLL]DAMERGE.TMP;1 on 18-APR-1990 10:42:05.48
File ID (575,19,0)   End of file block 101 / Allocated 104

Virtual block number 25 (00000019), 512 (0200) bytes

6A038EE9 FC46880' 06E90375 00003DFC 468914C4 8316EE08 E89A2476 FF2676FF .v&.v$.Ō.Y..é..F==..u.Ō...F=Ō..j 000000
17AA0BE8 9A2476°F 2676FF20 76FF2276 FF1C76FF 1E76FF18 76FF1A76 FF076A04 .j..v..v..v..v..v".v .v&.v$.Ō.`. 000020
76FF2076 FF2276FF 43FE46C6 0359E9FC 46880006 E9037500 003DFC46 8914C483 .é..F==..u.Ō...F=ŌY.óF±C.v".v .v 000040
2CE9FC46 8B0006E9 03750000 3DFC4689 00001749 9A5016FE 4680086A 1876FF1A ..v.j..F±.P.I....F==..u.Ō...F=Ō, 000060
FC468900 0017769A 5016FE46 8D096A18 76FF1A76 FF2076FF 2276FF4E FE46C603 .óF±N.v".v .v..v.j..F±.P.v....F= 000080
0C6A1876 FF1A76FF 2076FF22 76FF01FE 46C602FF E9FC4688 0006E903 7500003D =..u.Ō...F=Ō..óF±..v".v .v..v.j. 0000A0
FF0A6A08 6A02D2E9 FC468800 06E90375 00003DFC 46890000 00849A50 16FE4680 .F±.P.Ç....F==..u.Ō...F=Ō∅.j.j.. 0000C0
8914C483 17DF0BE8 9A2476FF 2676FF20 76FF2276 FF1C76FF 1E76FF18 76FF1A76 v..v..v..v..v".v .v&.v$.Ō.Ō..é.. 0000E0
1C76FF1E 76FF1876 FF1A76FF 0B6A006A 029DE9FC 46880006 E9037500 003DFC46 F==..u.Ō...F=Ō..j.j..v..v..v..v. 000100
8B0006E9 03750000 3DFC4689 14C48318 140BE89A 2476FF26 76FF2076 FF2276FF .v".v .v&.v$.Ō....é..F==..u.Ō... 000120
76FF2676 FF2076FF 2276FF1C 76FF1E76 FF1876FF 1A76FF0D 6A076A02 68E9FC46 F=Ōh.j.j..v..v..v..v..v".v .v&.v 000140
0676FF08 76FF0233 E9FC4688 0006E903 7500003D FC468914 C4831848 0BE89A24 $.Ō.K..é..F==..u.Ō...F=Ō3..v..v. 000160
14C48318 8300D49A 2476FF26 76FF2076 FF2276FF 1C76FF1E 76FF1876 FF1A76FF .v..v..v..v..v".v .v&.v$.à....é. 000180
2076FF22 76FF2476 FF2676FF 2876FF01 FCE9FC46 8B0006E9 03750000 3DFC4689 .F==..u.Ō...F=Ō=..v(.v&.v$.v".v 0001A0
00009A50 16064680 11F86818 9068006A 036A116A 1876FF1A 76FF1C76 FF1E76FF .v..v..v..v.j.j.j.h..h%..F..P... 0001C0
FF2276FF 2476FF26 76FF2876 FF01BAE9 FC468800 06E90375 00003DFC 468918C5 é..F==..u.Ō...F=Ōo..v(.v&.v$.v". 0001E0

Dump of file SATURN:[PCCOMMON.DUMP.DLL]DAMERGE.TMP;1 on 18-APR-1990 10:42:05.48
File ID (575,19,0)   End of file block 101 / Allocated 104

Virtual block number 26 (0000001A), 512 (0200) bytes

9A501606 4680FFFF 68180268 006A066A 136A1876 FF1A76FF 1C76FF1E 76FF2076 v .v..v..v..v.j.j.j.h∅.h...F..P. 000000
76FF2476 FF2676FF 2876FF01 78E9FC46 8B0006E9 03750000 3DFC4689 19070000 .....F==..u.Ō...F=Ōx..v(.v&.v$.v 000020
16064680 FFFF6819 1468006A 036A166A 1876FF1A 76FF1C76 FF1E76FF 2076FF22 ".v .v..v..v..v.j.j.j.h..h...F.. 000040
2476FF26 76FF2876 FF0136E9 FC468800 06E90375 00003DFC 46891949 00009A50 P...I..F==..u.Ō...F=Ō6..v(.v&.v$ 000060
46801174 68195668 006A0A6A 156A1876 FF1A76FF 1C76FF1E 76FF2076 FF2276FF .v".v .v..v..v..v.j.j.j.hV.ht..F 000080
FF2676FF 2876FF00 F4E9FC46 8B0006E9 03750000 3DFC4689 147B0000 9A501606 ..P...(..F==..u.Ō...F=Ō¶..v(.v&. 0000A0
15976819 9868006A 056A186A 1876FF1A 76FF1C76 FF1E76FF 2076FF22 76FF2476 v$.v".v .v..v..v..v.j.j.j.h..h.. 0000C0
76FF2876 FF00B2E9 FC468800 06E90375 00003DFC 468919CD 00009A50 16064680 .F..P...ë..F==..u.Ō...F=Ōÿ..v(.v 0000E0
68190A68 006A036A 196A1876 FF1A76FF 1C76FF1E 76FF2076 FF2276FF 2476FF26 &.v$.v".v .v..v..v..v.j.j.j.hÖ.h 000100
2876FF00 70E9FC46 8B0006E9 03750000 3DFC4689 1A0F0000 9A501606 4680FFFF ...F..P......F==..u.Ō...F=Ōp..v( 000120
1C68006A 026A1A6A 1876FF1A 76FF1C76 FF1E76FF 2076FF22 76FF2476 FF2676FF .v&.v$.v".v .v..v..v..v.j.j.j.h. 000140
FF002EE9 FC468800 06E90375 00003DFC 4689161A 00009A50 16064680 FFFF681A .h...F..P......F==..u.Ō...F=Ō... 000160
06E90375 00003DFC 46890000 0AFB9A06 76FF0876 FF1876FF 1A76FF1C 76FF1E76 v..v..v..v..v..v..«....F==..u.Ō. 000180
D88E15F7 881E5657 000010C8 0024CAC9 5F5E1F00 00E90000 8B0006E9 FC468800 ..F=Ō..|..Ō...^_èô$.à...WV.|K..Á 0001A0
FF0C76FF 1276FF14 76FF015A E9000088 0006E903 74104708 260E4788 26065EC4 á^.&.G.&.G.t.Ō..|..ŌZ..v..v..v.. 0001C0
8B0131E9 F0468800 06E90375 00003DF0 46890000 063F9A50 16F44680 186A0A76 v.j..F¶.P.?....Fÿ=..u.Ō...FÞŌ1.. 0001E0

Dump of file SATURN:[PCCOMMON.DUMP.DLL]DAMERGE.TMP;1 on 18-APR-1990 10:42:05.48
File ID (575,19,0)   End of file block 101 / Allocated 104

Virtual block number 27 (0000001B), 512 (0200) bytes

E7E90375 02470B26 078B26FC 5EC404FC 46830004 E9FE5689 FC4689F6 568BF446 F¶.V-.F=.V±Ō...F=.á^=&..&.G.u.ŌŌ 000000
77FF2610 77FF2606 5EC40000 FFFF9A0E 77FF2610 77FF2606 5EC40001 F246C700 .úF·..á^.&.w.&.w......á^.&.w.&.w 000020
F85EC402 578B2607 8B26FC5E C40036E9 03740000 300000FF FF9A5016 F846800E ..F%.P.....=..t.Ō6.á^=&..&.W.á^% 000040
77FF2610 77FF2606 5EC40000 F246C700 15E90374 02573926 001EE903 740?3926 &9.t.Ō..&9W.t.Ō..úF·..á^.&.w.&.w 000060
A89AF476 FFF676FF 1276FF14 76FF0017 E9037500 F27E83FF ADE90000 FFFF?A0E ......ŌU..~·.u.Ō...v..v..v-.v¶.  000080
260277FF 26FC5EC4 0E76FF10 76FF1276 FF1476FF 1676FF00 87E9A8A1 8B00001B ...|À Ō...v..v..v..v..v.á^=&.w.& 0000A0
009A5016 064680FF FF681B91 68006A10 6A126A04 77FF2606 77FF26F8 5EC437FF .7á^¥&.w.&.w.j.j.j.h..h...F..P.. 0000C0
8B00001B C59AF476 FFF676FF 1276FF14 76FF0017 E9037500 003DF046 89198800 ....FÞ=..u.Ō...v..v..v-.v¶.é.... 0000E0
7500003D F0468900 00075A9A F476FFF6 76FF1276 FF1476FF FF06E900 2BE9F046 FÞŌ+.Ō...v..v..v-.v¶.Z....FÞ=..u 000100
6C881E56 5700000C C80012CA C95F5E1F 0000E900 00880006 E9F04688 0006E903 .Ō...FÞŌ..|..Ō...^_èò..à...WV.|l 000120
46880006 E9037500 003DFC46 8900000F 889A5016 FE468020 76FF2276 FF088E1A ..Á.v".v .F±.P......F==..u.Ō...F 000140
FF1A76FF 2076FF22 76FFF446 89F64689 00008800 D8E90374 53FE7E80 00E7E9FC =ŌŌ..-±St.ŌÁ.|...F-.F¶.v".v .v.. 000160
46880006 E9037500 003DFC46 8900000F C89A0E76 FF1076FF 1276FF0C 76FF1876 v..v..v..v..v..à....F==..u.Ō...F 000180
3DFC4689 0000FFFF 9A5016F8 4680036A 1876FF1A 76FF2076 FF2276FF 00A7E9FC =ŌI..v".v .v..v.j..F%.P......F== 0001A0
76FF2076 FF2276FF 0022E903 74FA4608 F8468800 7EE9FC46 8B0006E9 03750000 ..u.Ō...F=Ō-..F%.F°t.Ō"..v".v .v 0001C0
FF5016F4 46800051 E9FC4688 0006E903 7500003D FC468900 000AA09A 1876FF1A ..v.......F==..u.Ō...F=ŌQ..F¶.P. 0001E0
```

```
Dump of file SATURN:[PCCOMMON.DUMP.DLL]DAMERGE.TMP;1 on 18-APR-1990 10:42:05.48
File ID (575,19,0)   End of file block 101 / Allocated 104

Virtual block number 28 (0000001C), 512 (0200) bytes

 2276FF1C 76FF1E76 FF1476FF 1676FF10 76FF1276 FF0E76FF 0C76FF06 76FF0876 v..v..v..v..v..v..v..v..v..v..v" 000000
 880006E9 03750000 30FC4689 22C48308 9E00009A 2876FF24 76FF2676 FF2076FF .v .v&.v$.v(......á".F•=..u.Ô... 000020
 46C7D88E 1BEFB81E 56570000 04C80024 CAC95F5E 1F0000E9 0000B800 06E9FC46 F•Ô..¡..Ô...^_èò$.à...WV.¡ÿ..ÀúF 000040
 1C76FF1E 76FF>016 18468014 76FF1676 FF1076FF 1276FF06 76FF0876 FF00000A ....v..v..v..v..v..v..F..P.v..v. 000060
 880006E9 03750000 30FC4689 1CC48310 7420E29A 2476FF26 76FF2076 FF2276FF .v".v .v&.v$.â t..á..F•=..u.Ô... 000080
 76FF2676 FF2076FF 2276FF1C 76FF1E76 FF1876FF 1A76FF03 6A006A03 86E9FC46 F=Ô..j.j..v..v..v..v..v".v .v&.v 0000A0
 76FF046A 006A0351 E9FC4688 0006E903 7500003D FC468914 C4831DA9 0BE89A24 $.Ô.`..á..F•=..u.Ô...F•ÔQ.j.j..v 0000C0
 468914C4 8310DE08 E89A2476 FF2676FF 2076FF22 76FF1C76 FF1E76FF 1876FF1A ..v..v..v..v".v .v&.v$.Ô.8..á..F 0000E0
 FF1C76FF 1E76FF18 76FF1A76 FF056A00 6A031CE9 FC468800 06E90375 00003DFC •=..u.Ô...F•Ô..j.j..v..v..v..v.. 000100
 46880006 E9037500 003DFC46 8914C483 1E130BE8 9A2476FF 2676FF20 76FF2276 v".v .v&.v$.Ô....á..F•=..u.Ô...F 000120
 2476FF26 76FF2076 FF2276FF 1C76FF1E 76FF1876 FF1A76FF 066A046A 02E7E9FC •ÔÔ.j.j..v..v..v..v..v".v .v&.v$ 000140
 1A76FF07 6A046A02 B2E9FC46 880006E9 03750000 30FC4689 14C4831E 480BE89A .Ô.H..á..F•=..u.Ô...F•Ôý.j.j..v. 000160
 FC468914 C4831EAA 0BE89A24 76FF2676 FF2076FF 2276FF1C 76FF1E76 FF1876FF .v..v..v..v".v .v&.v$.Ô.`..á..F• 000180
 0E6A1876 FF1A76FF 2076FF22 76FF01FE 46C6027D E9FC4688 0006E903 7500003D =..u.Ô...F•Ô).6F±..v".v .v..v.j. 0001A0
 FF096A09 6A0250E9 FC468800 06E90375 00003DFC 46890000 171C9A50 16FE468D .F±.P......F•=..u.Ô...F•ÔP.j.j.. 0001C0
 8914C483 1EDF0BE8 9A2476FF 2676FF20 76FF2276 FF1C76FF 1E76FF18 76FF1A76 v..v..v..v..v".v .v&.v$.Ô.Ô..á.. 0001E0

Dump of file SA 'RN:[PCCOMMON.DUMP.DLL]DAMERGE.TMP;1 on 18-APR-1990 10:42:05.48
File ID (575,19,0)   End of file block 101 / Allocated 104

Virtual block number 29 (0000001D), 512 (0200) bytes

 1C76FF1E 76FF1876 FF1A76FF 0A6A066A 021BE9FC 46880006 E9037500 003DFC46 F•=..u.Ô...F•Ô..j.j..v..v..v..v. 000000
 880006E9 03750000 30FC4689 14C4831F 140BE89A 2476FF26 76FF2076 FF2276FF .v".v .v&.v$.Ô....á..F•=..u.Ô... 000020
 76FF2676 FF2076FF 2276FF1C 76FF1E76 FF1876FF 1A76FF08 6A096A01 E6E9FC46 F•Ô|.j.j..v..v..v..v..v".v .v&.v 000040
 76FF0C6A 056A01B1 E9FC4688 0006E903 7500003D FC468914 C4831F49 0BE89A24 $.Ô.1..á..F•=..u.Ô...F•ÔÝ.j.j..v 000060
 468914C4 831F7E08 E89A2476 FF2676FF 2076FF22 76FF1C76 FF1E76FF 1876FF1A ..v..v..v..v".v .v&.v$.Ô.-..á..F 000080
 FF1C76FF 1E76FF18 76FF1A76 FF0D6A00 6A017CE9 FC468800 06E90375 00003DFC •=..u.Ô...F•Ô|.j.j..v..v..v..v.. 0000A0
 46880006 E9037500 003DFC46 8914C483 1FB30BE8 9A2476FF 2676FF20 76FF2276 v".v .v&.v$.Ô.°..á..F•=..u.Ô...F 0000C0
 2476FF26 76FF2076 FF2276FF 1C76FF1E 76FF1876 FF1A76FF 0F6A076A 0147E9FC •ÔG.j.j..v..v..v..v..v'.v .v&.v$ 0000E0
 FF2676FF 2876FF01 12E9FC46 880006E9 03750000 30FC4689 14C4831F EC0BE89A .Ô.$..á..F•=..u.Ô...F•O...v(.v&. 000100
 B6681FF9 680A76FF 036A116A 1876FF1A 76FF1C76 FF1E76FF 2076FF22 76FF2476 v$.v".v .v..v..v..v.j.j..v.h°.h. 000120
 FF2876FF 00CFE9FC 46880006 E9037500 003DFC46 89202F00 009A5016 06468D18 ..F..P.../ .F•=..u.Ô...F•Ôu..v(. 000140
 3C680A76 FF096A12 6A1876FF 1A76FF1C 76FF1E76 FF2076FF 2276FF24 76FF2676 v&.v$.v".v .v..v..v..v.j.j..v.h< 000160
 FF008CE9 FC468800 06E90375 00003DFC 46892072 00009A50 16064680 18C86820  hà..F..P...r .F•=..u.Ô...F•Ô... 000180
 76FF036A 146A1876 FF1A76FF 1C76FF1E 76FF2076 FF2276FF 2476FF26 76FF2876 v(.v&.v$.v".v .v..v..v..v.j.j..v 0001A0
 E9FC4688 0006E903 7500003D FC468920 8500009A 50160646 8D190A68 207F680A .h. h...F..P...ç .F•=..u.Ô...F•Ô 0001C0
 6A176A18 76FF1A76 FF1C76FF 1E76FF20 76FF2276 FF2476FF 2676FF28 76FF0049 I..v(.v&.v$.v".v .v..v..v..v.j.j 0001E0

Dump of file SATURN:[PCCOMMON.DUMP.DLL]DAMERGE.TMP;1 on 18-APR-1990 10:42:05.48
File ID (575,19,0)   End of file block 101 / Allocated 104

Virtual block number 30 (0000001E), 512 (0200) bytes

 880006E9 03750000 30FC4689 18840000 9A501606 46801 98E 6820C268 0A76FF05 ..v.hô h...F..P......F•=..u.Ô... 000000
 76FFD88E 1D0AB81E 56570000 2CC80024 CAC95F5E 1F0000E9 0000B800 06E9FC46 F•Ô..¡..Ô...^_èò$.à,..WV.¡...À.v 000020
 FF0394E9 DE468800 06E90375 00003DDE 46890000 1BFF9A50 16E4468D 0A76FF0C ..v..FÔ.P......F8=..u.Ô...FBÔ... 000040
 E9037500 003DDE46 8900001A 9A9A5016 F8468D13 6A0E76FF 1076FF06 76FF0876 v..v..v..v.j..F½.P......FB=..u.Ô 000060
 8826DA5E C404DA46 830004E9 DC5689DA 4689FA56 8BF84688 036BE9DE 46880006 ...FBÔk..F½.V•.FÖ.VÉÔ...FÖ.á^Ô&. 000080
 8A000088 FE5689FC 4689F256 89F04689 00008A00 00880321 E9037502 470B2607 .&.G.u.Ô!.¡..¤...FÞ.V·.F•.V±|..¤ 0000A0
 E25689E0 4689F656 89F44689 00008A00 00880856 89064689 EC5689EA 46890000 ...Fõ.V$.Fø.VÁ¡..¤...F¶.V-.FÀ.Vä 0000C0
 FF260277 FF260A5E C40E76FF 1076FF06 76FF0876 FF0000EE 46C7E856 89E64689 .F|.VÒúFŸ...v..v..v..v.á^Ô&.w.&. 0000E0
 890000FF FF9A5016 F4468D50 16E0468D 5016E646 8D5016EA 46805016 D6468D37 7.Fø.P.Fõ.P.F|.P.FÁ.P.F¶.P...... 000100
 B2E9DE46 8800001B 4F9AF876 FFFA76FF 0676FF08 76FF0017 E9037500 003DDE46 F8=..u.Ô...v..v..v•.v½.O....FBÔÿ 000120
 76FFD876 FF37FF26 0277FF26 125EC450 16F0468D 5016EE46 8D1E76FF 2076FF02 ..v .v..FŸ.P.FÞ.Pá^.&.w.&.7.vÁ.v 000140
 C4831D3F 24AB9A06 76FF0876 FF0A76FF 0C76FFEA 76FFEC76 FF1A76FF 1C76FFD6 ø.v..v..v$.vÖ.v..v..v..v..`$?..á 000160
 DE468800 0021E79A F876FFFA 76FF0676 FF0876FF 0017E903 7500003D DE468924 $.FB=..u.Ô...v..v..v•.v½.Ô!...FB 000180
 0085E903 75F2460B F0468801 50E90374 53E47E80 015CE903 7400EE7E 830250E9 ÔP..-Ÿ.t.Ô\..-ÔSt.ÔP..FÞ.F·u.Ô.. 0001A0
 FF0876FF 0017E903 7500003D DE468900 001C959A F076FFF2 76FF0A76 FF0C76FF .v..v..v·.vÞ.....FB=..u.Ô...v.. 0001C0
 0277FF26 125EC40A 76FF0C76 FF0200E9 DE468800 0022D59A F876FFFA 76FF0676 v..v•.v½.Í"...FBÔ...v..v.á^.&.w. 0001E0
```

```
Dump of file SATURN:[PCCOMMON.DUMP.DLL]DAMERGE.TMP;1 on 18-APR-1990 10:42:05.48
File ID (575,19,0)   End of file block 101 / Allocated 104

Virtual block number 31 (0000001F), 512 (0200) bytes

 76FF0676 FF0876FF 0017E903 7500003D DE468900 0001B49A 50160446 8D37FF26 &.7.FÅ.P.Ç....FB=..u.Ö...v..v..v 000000
 89260000 B8125EC4 0000E903 7500047E 8301C4E9 DE468800 0022499A F876FFFA *.vh.I"...FBÖÅ..-Å.u.Ö..Å^.|..&. 000020
 1076FF1A 76FF1C76 FF1676FF 1876FF0A 76FF0C76 FF0676FF 0876FF07 89260247 G.&...v..v..v..v..v..v..v..v..v. 000040
 F29A1E76 FF2076FF 5016FC46 8D1276FF 1476FF37 FF260277 FF260A5E C40E76FF .v.Å^O&.w.&.7.v..v..F=.P.v .v..' 000060
 76FF0876 FFFDFCE9 0003E903 7494FFDE 7E810024 E9037500 0030DE46 89000023 #...FB=..u.Ö$..-B..t.Ö..Þ==.v..v 000080
 76FF0A76 FF0C76FF 0676FF08 76FF0141 E9DE4688 000023AB 9AF876FF FA76FF06 ..v*.vh.`#...FBÖA..v..v..v..v..v 0000A0
 529AFC76 FFFE76FF 37FF2602 77FF260A 5EC437FF 260277FF 26125EC4 0E76FF10 ..v.Å^.&.w.&.7Å^O&.w.&.7.v±.v=.R 0000C0
 88000024 1B9AF876 FFFA76FF 0676FF08 76FF0017 E9037500 0030DE46 89000024 $...FB=..u.Ö...v..v..v*.vh..$... 0000E0
 1A76FF1C 76FF1676 FF1876FF 0A76FF0C 76FF0676 FF0876FF 00C0E900 EEE9DE46 FBÖY.Öà..v..v..v..v..v..v..v..v. 000100
 76FF2076 FF5016FC 46801276 FF1476FF 37FF2602 77FF260A 5EC40E76 FF1076FF .v..v.Å^O&.w.&.7.v..v..F=.P.v .v 000120
 76FFFD39 E90003E9 037494FF DE7E8100 24E90375 00003DDE 46890000 FFFF9A1E .......FB=..u.Ö$..-B..t.Ö..Ö9=.v 000140
 76FF0C76 FF0676FF 0876FF00 7EE9DE46 88000024 6E9AF876 FFFA76FF 0676FF08 ..v..v*.vh.n$...FBÖ~..v..v..v..v 000160
 76FFFE76 FF37FF26 0277FF26 DA5EC437 FF260277 FF26125E C40E76FF 1076FF0A ..v..v.Å^.&.w.&.7Å^O&.w.&.7.v±.v 000180
 24889AF8 76FFFA76 FF0676FF 0876FF00 17E90375 0000300E 46890000 FFFF9AFC =......FB=..u.Ö...v..v..v*.vh..$ 0001A0
 3DDE4689 00002299 9AF876FF FA76FF06 76FF0876 FFFCCCE9 002BE9DE 46880000 ...FBÖ+.Öa=.v..v..v*.vh.."...FB= 0001C0
 B81E5657 000022C8 CBC95F5E 1F0000E9 00008800 06E9DE46 880006E9 03750000 ..u.Ö...FBÖ..|..Ö...^_èUà"..WV.| 0001E0

Dump of file SATURN:[PCCOMMON.DUMP.DLL]DAMERGE.TMP;1 on 18-APR-1990 10:42:05.48
File ID (575,19,0)   End of file block 101 / Allocated 104

Virtual block number 32 (00000020), 512 (0200) bytes

 FF0A76FF 0C76FF07 89260247 89260000 B81E5EC4 000007C7 26225EC4 D88E20EA ð .Äå^"&ú...Å^.|..&.G.&...v..v.. 000000
 E9DE4688 0006E903 7500003D DE468900 0021239A 5016E846 8D136A1A 76FF1C76 v..v.j..FÖ.P.#!...FB=..u.Ö...FBÖ 000020
 75024708 26078B26 F05EC404 F0468300 04E9F256 89F04689 EA568BE8 46880230 =..FÖ.Vö.FÞ.V Ö...FÞ.Å^Þ&..&.G.u 000040
 03E90375 00003000 00FFFF9A 2676FF28 76FF37FF 260277FF 26F05EC4 01EBE903 .Ö$.Å^Þ&.w.&.7.v(.v&.....=..u.Ö. 000060
 BA0000B8 FE5689FC 4689E656 89E44689 F65689F4 46890000 BA0000B8 FFCDE900 .Öe.|..¤...F¶.V-.FÖ.V|.F=.V±|..¤ 000080
 1C76FF0A 76FF0C76 FFE04689 E2468900 008BEE56 89EC4689 FA5689F8 46890000 ...F%.V*.F$.VY|...Fâ.FÅ.v..v..v. 0000A0
 16F44680 5016FC46 8D5016F8 46805016 EC468037 FF260277 FF26F05E C41A76FF .v.Å^Þ&.w.&.7.F&.P.F%.P.F=.P.F¶. 0000C0
 FFEA76FF 0A76FF0C 76FF0017 E9037500 0030DE46 89000021 CB9A5016 E4468050 P.FÖ.P.ùI...FB=..u.Ö...v..v..vö. 0000E0
 1676FF18 76FFEC76 FFEE76FF 006A5016 E0468001 72E9DE46 88000025 FC9AE876 vÖ.=X...FBÖr..FÅ.Pj..vY.v&.v..v. 000100
 FF0017E9 03750000 300E4689 16C48322 2C04319A 0676FF08 76FF0A76 FF0C76FF .v..v..v..v..1.,".Å..FB=..u.Ö... 000120
 EBE90375 E24608E0 46880129 E9DE4688 00002358 9AE876FF EA76FF0A 76FF0C76 v..v..vö.vÖ.X#...FBÖ)..FÅ.Fâu.Ö$ 000140
 57882607 8B26F05E C4003CE9 03741456 390044E9 03741246 39FA5688 F8468800 ..F%.V*9F.t.ÖD.9V.t.Ö<.Å^Þ&..&.W 000160
 300E4689 000026AB 9AE876FF EA76FF0A 76FF0C76 FF025789 26078926 1E5EC402 .Å^.&..&.W..v..v..vö.vÖ. &...FB= 000180
 16E04680 E04689E2 46890000 8800CCE9 00008800 D2E9DE46 880006E9 03750000 ..u.Ö...FBÖ®.|..Öa.|...Fâ.FÅ.FÅ. 0001A0
 25DF0431 9A0676FF 0876FF0A 76FF0C76 FF0E76FF 1076FFF8 76FFFA76 FF006A50 Pj..v*.vh.v..v..v..v..v..v..1.Ö% 0001C0
 88000026 E19AE876 FFEA76FF 0A76FF0C 76FF0017 E9037500 0030DE46 8916C483 .Å..FB=..u.Ö...v..v..vö.vÖ.Ä&... 0001E0

Dump of file SATURN:[PCCOMMON.DUMP.DLL]DAMERGE.TMP;1 on 18-APR-1990 10:42:05.48
File ID (575,19,0)   End of file block 101 / Allocated 104

Virtual block number 33 (00000021), 512 (0200) bytes

 0789261E 5EC40257 88260788 26F05EC4 003CE903 75E24608 E0468800 7AE9DE46 FBÖz..FÅ.Fâu.Ö<.Å^Þ&..&.W.Å^.&.. 000000
 0006E903 7500003D DE468900 00270C9A E876FFEA 76FF0A76 FF0C76FF 02578926 &.W..v..v..vö.vÖ..'...FB=..u.Ö.. 000020
 000025B3 9AE876FF EA76FF0A 76FF0C76 FFFE02E9 0033E900 00880039 E9DE4688 .FBÖ9.|..Ö3.Ö.±.v..v..vö.vÖ.°X.. 000040
 1F0000E9 00008800 0107C726 225EC400 0EE9DE46 880006E9 03750000 30DE4689 .FB=..u.Ö...FBÖ..Å^"&ú...|..Ö... 000060
 FF0876FF 1C76FF1E 76FF1C76 FF1E76FF D88E24B0 B81E5657 000002C8 CBC95F5E ^_èUà...WV.|¯$.Å.v..v..v..v..v.. 000080
 5E1F0000 E90000B8 0006E9FE 46880006 E9037500 0030FE46 890000FF FF9A0676 v.......F±=..u.Ö...F±Ö..|..Ö...^ 0000A0
 0020FA9A 5016FC46 8D2076FF 2276FF08 8E273C88 1E565700 000CC800 24CAC95F _èÖ$.Å...WV.|<'.Ä.v".v .F=.P.* . 0000C0
 46890000 B8000BE9 037453FC 7E8000E7 E9FE4688 0006E903 7500003D FE468900 ..F±=..u.Ö...F±ÖÖ..-=St.ÖÄ.|...F 0000E0
 001C3F9A 0E76FF10 76FF1276 FF0C76FF 1876FF1A 76FF2076 FF2276FF F44689F6 -.F¶.v".v .v..v..v..v..v..v..?.. 000100
 036A1876 FF1A76FF 2076FF22 76FF00A7 E9FE4688 0006E903 75000030 FE468900 ..F±=..u.Ö...F±ÖI..v".v .v..v.j. 000120
 4608F846 88007EE9 FE468800 06E90375 00003DFE 46890000 1C689A50 16F84680 .F%.P.h....F±=..u.Ö...F±Ö-..F%.F 000140
 E9037500 0030FE46 89000022 7D9A1876 FF1A76FF 2076FF22 76FF0022 E90374FA *t.Ö"..v".v .v..v..)"...F±=..u.Ö 000160
 FF1076FF 1276FF0E 76FF0C76 FF0676FF 0876FF50 16F4468D 0051E9FE 46880006 ...F±ÖQ..F¶.P.v..v..v..v..v..v.. 000180
 831CDF00 009A2876 FF2476FF 2676FF20 76FF2276 FF1C76FF 1E76FF14 76FF1676 v..v..v..v..v".v .v&.v$.v(...Ö.. 0001A0
 0024CAC9 5F5E1F00 00E90000 880006E9 FE468800 06E90375 00003DFE 468922C4 Å".F±=..u.Ö...F±Ö..|..Ö...^_èÖ$. 0001C0
 76FF1E76 FF1876FF 1A76FF03 6A076A00 000A46C7 D88E277D B81E5657 000002C8 à...WV.|)'.ÄùF...j.j..v..v..v..v 0001E0
```

```
Dump of file SATURN:[PCCOMMON.DUMP.DLL]DAMERGE.TMP;1 on 18-APR-1990 10:42:05.48
File ID (575,19,0)   End of file block 101 / Allocated 104

Virtual block number 34 (00000022), 512 (0200) bytes

0006E903 7500003D FE468914 C48328F9 08E89A24 76FF2676 FF2076FF 2276FF1C ..v".v .v&.v$.Ô.*(.á..F±=..u.Ô.. 000000
76FF1A76 FF1C76FF 1E76FF20 76FF2276 FF2476FF 2676FF28 76FF0160 E9FE4688 .F±Ô'..v(.v&.v$.v".v .v..v..v..v 000020
03750000 3DFE4689 293C0000 9A501606 468D1186 68290668 0A76FF04 6A096A18 .j.j..v.h.)hÑ..F..P...<).F±=..u. 000040
76FF1C76 FF1E76FF 2076FF22 76FF2476 FF2676FF 2876FF01 1DE9FE46 880006E9 Ô...F±Ô...v(.v&.v$.v".v .v..v..v 000060
003DFE46 89268E00 009A5016 06468D1F EF682949 680A76FF 036A076A 1876FF1A ..v.j.j..v.hI)hÿ..F..P....&.F±=. 000080
E9037426 56390040 E9037424 46392256 88204688 000AE9FE 46880006 E9037500 .u.Ô...F±ÔÔ..F .V"9F$t.Ôa.9V&t.Ô 0000A0
099A2476 FF2676FF 1C76FF1E 76FF1876 FF1A76FF 086A086A 0676FF08 76FF0038 8..v..v.j.j..v..v..v..v..v&.v$.. 0000C0
2676FF28 76FF0043 E9008FE9 FE468800 06E90375 00003DFE 468914C4 8329CD32 2ë).á..F±=..u.Ô...F±Ô..ÔC..v(.v& 0000E0
68290A68 0A76FF08 6A086A18 76FF1A76 FF1C76FF 1E76FF20 76FF2276 FF2476FF .v$.v".v .v..v..v..v.j.j..v.hÔ)h 000100
2876FF00 49E9FE46 880006E9 03750000 3DFE4689 2A100000 9A501606 4680194C L..F..P....*.F±=..u.Ô...F±ÔI..v( 000120
680A76FF 056A086A 1876FF1A 76FF1C76 FF1E76FF 2076FF22 76FF2476 FF2676FF .v&.v$.v".v .v..v..v..v.j.j..v.h 000140
0006E9FE 46880006 E9037500 003DFE46 8928C000 009A5016 06468D20 B8682A1D .*h| .F..P...à(.F±=..u.Ô...F±Ô.. 000160
036A0000 0A46C7D8 8E289888 1E565700 0002C800 24CAC95F 5E1F0000 E90000B8 |..Ô...^_èÔ$.à...WV.|.(.ÁúF...j. 000180
832AA208 E89A2476 FF2676FF 2076FF22 76FF1C76 FF1E76FF 1876FF1A 76FF066A j..v..v..v..v..v".v .v&.v$.Ô.Å*. 0001A0
1E76FF18 76FF1A76 FF096A04 6A03C3E9 FE468800 06E90375 00003DFE 468914C4 á..F±=..u.Ô...F±Ôù.j.j..v..v..v. 0001C0
E9037500 003DFE46 8914C483 2AD708E8 9A2476FF 2676FF20 76FF2276 FF1C76FF .v..v".v .v&.v$.Ô.ø*.á..F±=..u.Ô 0001E0

Dump of file SATURN:[PCCOMMON.DUMP.DLL]DAMERGE.TMP;1 on 18-APR-1990 10:42:05.48
File ID (575,19,0)   End of file block 101 / Allocated 104

Virtual block number 35 (00000023), 512 (0200) bytes

76FF2076 FF2276FF 1C76FF1E 76FF1876 FF1A76FF 0A6A036A 038EE9FE 46880006 ...F±Ô..j.j..v..v..v..v..v".v .v 000000
6A036A03 59E9FE46 880006E9 03750000 3DFE4689 14C4832B 0C08E89A 2476FF26 &.v$.Ô..+.á..F±=..u.Ô...F±ÔY.j.j 000020
C4832B41 08E89A24 76FF2676 FF2076FF 2276FF1C 76FF1E76 FF1876FF 1A76FF08 ..v..v..v..v..v".v .v&.v$.Ô.A+.á 000040
FF1E76FF 1876FF1A 76FF0C6A 036A0324 E9FE4688 0006E903 7500003D FE468914 ..F±=..u.Ô...F±Ô$.j.j..v..v..v.. 000060
06E90375 00003DFE 468914C4 832B7608 E89A2476 FF2676FF 2076FF22 76FF1C76 v..v".v .v&.v$.Ô.v+.á..F±=..u.Ô. 000080
2676FF20 76FF2276 FF1C76FF 1E76FF18 76FF1A76 FF006A08 6A02EFE9 FE468800 ..F±Ôÿ.j.j..v..v..v..v..v".v .v& 0000A0
0E6A086A 028AE9FE 46880006 E9037500 003DFE46 8914C483 28AB08E8 9A2476FF .v$.Ô.¨+.á..F±=..u.Ô...F±Ôa.j.j. 0000C0
14C4832B E008E89A 2476FF26 76FF2076 FF2276FF 1C76FF1E 76FF1876 FF1A76FF .v..v..v..v..v".v .v&.v$.Ô.Å+.á. 0000E0
76FF1E76 FF1876FF 1A76FF0F 6A036A02 85E9FE46 880006E9 03750000 3DFE4689 .F±=..u.Ô...F±Ô..j.j..v..v..v..v 000100
0006E903 7500003D FE468914 C4832C15 08E89A24 76FF2676 FF2076FF 2276FF1C ..v".v .v&.v$.Ô..,.á..F±=..u.Ô.. 000120
FF2676FF 2076FF22 76FF1C76 FF1E76FF 1876FF1A 76FF106A 036A0250 E9FE4688 .F±ÔP.j.j..v..v..v..v..v".v .v&. 000140
FF116A07 6A021BE9 FE468800 06E90375 00003DFE 468914C4 832C4A08 E89A2476 v$.Ô.J,.á..F±=..u.Ô...F±Ô..j.j.. 000160
8914C483 2C830BE8 9A2476FF 2676FF20 76FF2276 FF1C76FF 1E76FF18 76FF1A76 v..v..v..v..v".v .v&.v$.Ô..,.á.. 000180
FF2076FF 2276FF24 76FF2676 FF2876FF 01E6E9FE 46880006 E9037500 003DFE46 F±=..u.Ô...F±ÔI..v(.v&.v$.v".v . 0001A0
00009A50 1606468D 293F682C 90680A76 FF036A12 6A1876FF 1A76FF1C 76FF1E76 v..v..v..v.j.j..v.h.,h?).F..P... 0001C0
FF2276FF 2476FF26 76FF2876 FF01A3E9 FE468800 06E90375 00003DFE 46892CC6 ó,.F±=..u.Ô...F±ÔÉ..v(.v&.v$.v". 0001E0

Dump of file SATURN:[PCCOMMON.DUMP.DLL]DAMERGE.TMP;1 on 18-APR-1990 10:42:05.48
File ID (575,19,0)   End of file block 101 / Allocated 104

Virtual block number 36 (00000024), 512 (0200) bytes

50160646 8D28FC68 2CD3680A 76FF036A 136A1876 FF1A76FF 1C76FF1E 76FF2076 v .v..v..v..v.j.j..v.h&,h«(.F..P 000000
74244639 2256882` 46880160 E9FE4688 0006E903 7500003D FE46892D 1800009A ....-.F±=..u.Ô...F±Ô'..F .V"9F$t 000020
FF1E76FF 1876FF1A 76FF146A 0C6A0676 FF0876FF 0038E903 74265639 0040E903 .Ôa.9V&t.Ô8..v..v.j.j..v..v..v.. 000040
15E9FE46 880006E9 03750000 3DFE4689 14C4832D 5732099A 2476FF26 76FF1C76 v..v&.v$..2W-.á..F±=..u.Ô...F±Ô. 000060
6A1876FF 1A76FF1C 76FF1E76 FF2076FF 2276FF24 76FF2676 FF2876FF 0043E901 .ÔC..v(.v&.v$.v".v .v..v..v..v.j 000080
06E90375 00003DFE 4689209A 00009A50 1606468D 2900682D 64680A76 FF0C6A14 .j..v.hd-hÅ).F..P....-.F±=..u.Ô. 0000A0
FF1A76FF 1C76FF1E 76FF2076 FF2276FF 2476FF26 76FF2876 FF00CFE9 FE468800 ..F±Ôü..v(.v&.v$.v".v .v..v..v.. 0000C0
7500003D FE46892D D000009A 50160646 8D207568 2DA7680A 76FF036A 156A1876 v.j.j..v.hÏ-hu .F..P...Í-.F±=..u 0000E0
FF1C76FF 1E76FF20 76FF2276 FF2476FF 2676FF28 76FF008C E9FE4688 0006E903 .Ô...F±Ô...v(.v&.v$.v".v .v..v.. 000100
3DFE4689 29910000 9A501606 468D2A13 682DEA68 0A76FF05 6A196A18 76FF1A76 v..v.j.j..v.hö-h.*.F..P....).F±= 000120
FF1E76FF 2076FF22 76FF2476 FF2676FF 2876FF00 49E9FE46 880006E9 03750000 ..u.Ô...F±ÔI..v(.v&.v$.v".v .v.. 000140
892A6000 009A5016 0646801 9 D0682E2D 680A76FF 036A1A6A 1876FF1A 76FF1C76 v..v..v.j.j..v.h-.hÅ..F..P...m*. 000160
0002C800 24CAC95F 5E1F0000 E90000B8 0006E9FE 46880006 E9037500 003DFE46 F±=..u.Ô...F±Ô..|..Ô...^_èÔ$.à.. 000180
76FF1C76 FF1E76FF 1876FF1A 76FF036A 046A0000 0A46C7D8 8E2A45B8 1E565700 .WV.|E*.ÁúF...j.j..v..v..v..v..v 0001A0
FE468800 06E90375 00003DFE 468914C4 832E2008 E89A2476 FF2676FF 2076FF22 ".v .v&.v$.Ô. ..á..F±=..u.Ô...F± 0001C0
9A2476FF 2676FF20 76FF2276 FF1C76FF 1E76FF18 76FF1A76 FF046A04 6A02A1E9 ÔÅ.j.j..v..v..v..v..v".v .v&.v$. 0001E0
```

```
Dump of file SATURN:[PCCOMMON.DUMP.DLL]DAMERGE.TMP;1 on 18-APR-1990 10:42:05.48
File ID (575,19,0)   End of file block 101 / Allocated 104

Virtual block number 37 (00000025), 512 (0200) bytes

 FF1A76FF 056A046A 026FE9FE 46880006 E9037500 003DFE46 8914C483 2EE70BE8 Ò.Ò..á..F±=..u.Õ...F±Õl.j.j..v.. 000000
 30FE4689 14C4832F 1C0BE89A 2476FF26 76FF2076 FF2276FF 1C76FF1E 76FF1876 v..v..v..v".v .v&.v$.Õ../.á..F±= 000020
 2276FF1C 76FF1E76 FF1876FF 1A76FF06 6A0A6A02 37E9FE46 880006E9 03/: 000 ..u.Õ...F±Õ7.j.j..v..v..v..v..v" 000040
 E9FE4688 0006E903 75000030 FE468914 C4832F51 08E89A24 76FF2676 FF20. FF .v .v&.v$.Õ.Q/.á..F±=..u.Õ...F±Õ 000060
 E89A2476 FF2676FF 2076FF22 76FF1C76 FF1E76FF 1876FF1A 76FF076A 076A02J2 ..j.j..v..v..v..v..v".v .v&.v$.Õ 000080
 2476FF26 76FF2876 FF01CDE9 FE468800 06E90375 000030FE 468914C4 832F8A08 ../.á..F±=..u.Õ...F±Õë..v(.v&.v$ 0000A0
 802C8668 2F97680A 76FF036A 106A1876 FF1A76FF 1C76FF1E 76FF2076 FF2276FF .v".v .v..v..v..v.j.j..v.h./h... 0000C0
 2676FF28 76FF018A E9FE4688 0006E903 75000030 FE46892F CD00009A 50160646 F..P...ë/.F±=..u.Õ...F±Õ...v(.v& 0000E0
 682FDA68 0A76FF08 6A116A18 76FF1A76 FF1C76FF 1E76FF20 76FF2276 FF2476FF .v$.v".v .v..v..v..v.j.j..v.hÕ/h 000100
 2876FF01 47E9FE46 880006E9 03750000 30FE4689 30100000 9A501606 46802032 2 .F..P....0.F±=..u.Õ...F±ÕG..v( 000120
 680A76FF 036A126A 1876FF1A 76FF1C76 FF1E76FF 2076FF22 76FF2476 FF2676FF .v&.v$.v".v .v..v..v..v.j.j..v.h 000140
 0104E9FE 46880006 E9037500 0030FE46 89304F00 009A5016 06468031 1168301D .0h.1.F..P...00.F±=..u.Õ...F±Õ.. 000160
 880BE89A 2476FF26 76FF2076 FF2276FF 1C76FF1E 76FF1876 FF1A76FF 146A036A j.j..v..v..v..v..v".v .v&.v$.Õ.. 000180
 76FF2476 FF2676FF 2876FF00 CFE9FE46 880006E9 03750000 30FE4689 14C48330 0.á..F±=..u.Õ...F±Õü..v(.v&.v$.v 0001A0
 06468020 E0683095 680A76FF 056A176A 1876FF1A 76FF1C76 FF1E76FF 2076FF22 ".v .v..v..v..v.j.j..v.h.0hÀ-.F. 0001C0
 76FF2676 FF2876FF 008CE9FE 46880006 E9037500 0030FE46 8930CB00 009A5016 .P...ÙO.F±=..u.Õ...F±Õ...v(.v&.v 0001E0

Dump of file SATURN:[PCCOMMON.DUMP.DLL]DAMERGE.TMP;1 on 18-APR-1990 10:42:05.48
File ID (575,19,0)   End of file block 101 / Allocated 104

Virtual block number 38 (00000026), 512 (0200) bytes

 FFFF6830 D8680A76 FF056A1A 6A1876FF 1A76FF1C 76FF1E76 FF2076FF 2276FF24 $.v".v .v..v..v..v.j.j..v.hA0h.. 000000
 76FF2876 FF0049E9 FE468800 06E90375 00003DFE 4689310E 00009A50 16064680 .F..P....1.F±=..u.Õ...F±Õl..v(.v 000020
 311B680A 76FF026A 1B6A1876 FF1A76FF 1C76FF1E 76FF2076 FF2276FF 2476FF26 &.v$.v".v .v..v..v..v.j.j..v.h.1 000040
 00880006 E9FE4688 0006E903 7500003D FE46892E 7000009A 50160646 80209068 h.-.F..P...)..F±=..u.Õ...F±Õ..|. 000060
 5F5E1F00 00E90000 B8088E2E 55B81E56 57000004 C80024CA C95F5E1F 0000E900 .Õ...^_èÒ$.à...WV.¡U..Ä¡..Õ...^_ 000080
 1C76FF1E 76FF1876 FF1A76FF 076A006A D88E3143 B81E5657 000002C8 0024CAC9 èÒ$.à...WV.¡C1.Äj.j..v..v..v..v. 0000A0
 880006E9 03750000 30FE4689 14C48331 B40BE89A 2476FF26 76FF2076 FF2276FF .v".v .v&.v$.Õ.Ç1.á..F±=..u.Õ... 0000C0
 76FF2676 FF2076FF 2276FF1C 76FF1E76 FF1876FF 1A76FF08 6A006A00 38E9FE46 F±Õ;.j.j..v..v..v..v..v".v .v&.v 0000E0
 0000E900 00880006 E9FE4688 0006E903 7500003D FE468914 C4832EB2 08E89A24 $.Õ.ÿ..á..F±=..u.Õ...F±Õ..|..Õ.. 000100
 0024CAC9 5F5E1F00 00E90000 B8D88E31 5CB81E56 57000000 C80024CA C95F5E1F .^_èÒ$.à...WV.|\1.Ä|..Õ...^_èÒ$. 000120
 1E565700 000AC800 24CAC95F 5E1F0000 E90000B8 D88E31DF B81E5657 000000C8 à...WV.|Õ1.Ä|..Õ...^_èÒ$.à...WV. 000140
 46890000 24009A50 16F84680 1276FF0A 76FF0C76 FF0676FF 0876FF08 8E31F888 |%1.Á.v..v..v..v..v..F½.P.ï$...F 000160
 46830004 E9FE5689 FC4689FA 5688F846 880003E9 F6468800 06E90375 000030F6 -=..u.Õ...F-Õ£..F½.V°.F=.V±Õ...F 000180
 1276FF0A 76FF0C76 FF0676FF 0876FF00 89E90375 02470826 078826FC 5EC404FC =.á^=&..&.G.u.Õ...v..v..v..v..v. 0001A0
 0876FF00 17E90375 000030F6 46890000 27CD9A14 76FF37FF 260277FF 26FC5EC4 á^=&.w.&.7.v..ë'...F-=..u.Õ...v. 0001C0
 0E76FF10 76FF0676 FF0876FF 006EE9F6 46880000 32D09AF8 76FFFA76 FF0676FF .v..v°.v½.i2...F-Õn..v..v..v..v. 0001E0

Dump of file SATURN:[PCCOMMON.DUMP.DLL]DAMERGE.TMP;1 on 18-APR-1990 10:42:05.48
File ID (575,19,0)   End of file block 101 / Allocated 104

Virtual block number 39 (00000027), 512 (0200) bytes

 0017E903 7500003D F6468900 0010BE9A 1476FF37 FF260277 FF26FC5E C41276FF .v.á^=&.w.&.7.v.......F-=..u.Õ.. 000000
 0676FF08 76FFFF64 E9002BE9 F6468800 0032F79A F876FFFA 76FF0676 FF0876FF .v..v..v°.v½.%2...F-Õ•.Õd..v..v. 000020
 E9000088 0006E9F6 46880006 E9037500 0030F646 89000026 489AF876 FFFA76FF .v°.v½.H&...F-=..u.Õ...F-Õ..|..Õ 000040
 00041B87 000502BA 00092823 02030331 000A232F 02030036 90CBC95F 5E1F0000 ...^_èü.6.../#..1...#(..¤....... 000060
 000A0128 0203024A 00081B32 0203038A 000A1A42 020300E4 0004327E 02031D02 ....-2..Õ...B...¤...2...J...+... 000080
 000C15CD 02032890 00041555 000500F0 00040A05 02030000 0004317F 0002043C <....1..........Þ...U....(..e... 0000A0
 00080E89 0002025E 00081AF7 02030000 0006002F 00020000 0005286D 00020481 Ÿ...m(....../.......¥...^....... 0000C0
 000427F6 02030000 00090BFB 00020102 0004329A 02030451 000A1060 02030000 ....'...Q....2.......«.......-'.. 0000E0
 00042FD0 00050000 000C3211 0002010E 00041036 020304C6 0000045F 02030089 ...._...6...6.........2......Å/.. 000100
 00042CC9 0005313B 00043088 000503EA 000A1109 02030097 00040D89 02032734 4'..............õ....0..·1..è,.. 000120
 0004205A 000503FC 000A2753 020300A5 00041E76 020304DA 00000483 02032A3D =*.......Õ...v...E...S'..•...Z·.. 000140
 00041A12 00050382 000A2597 02030081 0004322A 0203012F 00042289 02032E4D M...¿"../...*2..Ÿ....X.......... 000160
 000A0904 020331D7 )0042E23 000504EE 00000945 0203028E 000906CF 02033154 T1..ü.......E...Ÿ...#...■1..å... 000180
 00042F80 00050416 000A09A0 0203008D 000400F4 02030483 00080781 02030308 ............¶...§............/.. 0001A0
 0004100F 0005031C 000A238F 020300CA 000432C1 02030500 00000969 02031BE7 Ó...i.......è2..Þ....#......Ô... 0001C0
 000A2525 02032775 00043013 00050004 00040A7E 020331F0 000430CE 000515EF ÿ...ö0..Þ1..-...å....0..u'..%%.. 0001E0
```

```
Dump of file SATURN:[PCCOMMON.DUMP.DLL]DAMERGE.TMP;1 on 18-APR-1990 10:42:05.48
File ID (575,19,0)   End of file block 101 / Allocated 104

Virtual block number 40 (00000028), 512 (0200) bytes

 00000000 000003AC 000A007B 02030512 0000278D 02030239 00081AE2 0203042B (...ã...9....'......(...¯....... 000000
 FFFF9A50 16FE468D 1076FF12 76FF0876 FF0A76FF 088EFFFF 881E5657 000004C8 È...WV.¡...Å.v..v..v..v..F±.P... 000020
 FF2476FF 2676FF02 22E9FE46 88026FE9 FC468800 06E90375 000030FC 46890000 ...F•=..u.Ô...F•Ôo..F±Ô"..v&.v$. 000040
 0E76FF10 76FF1276 FF1476FF 1676FF18 76FF1A76 FF1C76FF 1E76FF20 76FF2276 v".v .v..v..v..v..v..v..v..v..v. 000060
 2476FF26 76FF0222 E9022BE9 22C48300 B003439A 0676FF08 76FF0A76 FF0C76FF .v..v..v..v..C.¯..á"Ô+.Ô"..v&.v$ 000080
 76FF1076 FF1276FF 1476FF16 76FF1876 FF1A76FF 1C76FF1E 76FF2076 FF2276FF .v".v .v..v..v..v..v..v..v..v..v 0000A0
 76FF2676 FF01E1E9 01EAE922 C48300F1 04719A06 76FF0876 FF0A76FF 0C76FF0E ..v..v..v..v..q.þ..á"Ôõ.ÔÅ..v&.v 0000C0
 FF1076FF 1276FF14 76FF1676 FF1876FF 1A76FF1C 76FF1E76 FF2076FF 2276FF24 $.v".v .v..v..v..v..v..v..v..v.. 0000E0
 FF2276FF 01A0E901 A9E922C4 83011D02 A79A0676 FF0876FF 0A76FF0C 76FF0E76 v..v..v..v..v..Ì....á"Ô`.Ô...v". 000100
 83015505 559A0876 FF0A76FF 0C76FF0E 76FF1076 FF1276FF 2476FF26 76FF2076 v .v&.v$.v..v..v..v..v..v..U.U.. 000120
 1876FF1A 76FF1C76 FF1E76FF 2476FF26 76FF2076 FF2276FF 0174E901 7DE914C4 á.Ô).Ôt..v".v .v&.v$.v..v..v..v. 000140
 013CE901 45E91CC4 83018705 8C9A0876 FF0A76FF 0C76FF0E 76FF1076 FF1276FF .v..v..v..v..v..v.......á.ÔE.Ô<. 000160
 76FF0C76 FF0E76FF 1076FF12 76FF1876 FF1A76FF 2476FF26 76FF2076 FF2276FF .v".v .v&.v$.v..v..v..v..v..v..v 000180
 FBE900FE E90101E9 0104E901 07E9010A E90113E9 18C48301 CB060F9A 0876FF0A ..v....ü..á.Ô..Ô..Ô..Ô..Ô..Ô±.Ô« 0001A0
 FF0E76FF 1076FF12 76FF1876 FF1A76FF 1C76FF24 76FF2676 FF2076FF 2276FF00 ..v".v .v&.v$.v..v..v..v..v..v.. 0001C0
 FF2276FF 2476FF26 76FF00C6 E900CFE9 1AC48302 0605CF9A 0876FF0A 76FF0C76 v..v..v..ü....á.Ôù.Ô6..v&.v$.v". 0001E0

Dump of file SATURN:[PCCOMMON.DUMP.DLL]DAMERGE.TMP;1 on 18-APR-1990 10:42:05.48
File ID (575,19,0)   End of file block 101 / Allocated 104

Virtual block number 41 (00000029), 512 (0200) bytes

 0A76FF0C 76FF0E76 FF1076FF 1276FF14 76FF1676 FF1876FF 1A76FF1C 76FF2076 v .v..v..v..v..v..v..v..v..v..v. 000000
 390036E9 03740846 390E568B 0C468800 8BE90094 E91EC483 FFFF064C 9A0876FF .v..L....á.Ô..Ô...F..V.9F.t.Ô6.9 000020
 9A1C76FF 1876FF1A 76FF1E76 FF1076FF 1276FF0C 76FF0E76 FF002EE9 03740A56 V.t.Ô...v..v..v..v..v..v..v..v.. 000040
 163D0002 200041E9 0044E900 4DE9FC46 880006E9 03750000 3DFC4689 0000FFFF .....F•=..u.Ô...F•ÔM.ÔD.ÔA.-..=. 000060
 01A10160 0211012B 00FC0039 0211007A 00BB026E A7FF2E93 C003FFAB E9037600 .v.Ô`..á...În.£.z...9.•.(...'.Å. 000080
 E90000B8 019E019B 01980211 02110211 02110211 02110195 019201D6 02110211 ....ø......................¡..Ô 0000A0
 8D1076FF 1276FF08 76FF0A76 FFD88E00 08881E56 5700004E C8CBC95F 5E1F0000 ...^_èùàN..WV.¡...Å.v..v..v..v.. 0000C0
 0C76FF0E 76FF0064 E9B2468B 0006E903 75000030 B2468900 00FFFF9A 5016B446 FÇ.P¯.....Fý=..u.Ô...FýÔd..v..v. 0000E0
 B2468800 06E90375 000030B2 46890000 FFFF9A01 6A501684 46802476 FF2676FF .v&.v$.FÇ.Pj.......Fý=..u.Ô...Fý 000100
 76FF1876 FF1A76FF 1476FF16 76FF0C76 FF0E76FF 0876FF0A 76FF0676 FF003BE9 Ô;..v..v..v..v..v..v..v..v..v..v 000120
 5E1F0000 E9B2468B B2468900 00FFFF9A 2476FF26 76FF2076 FF2276FF 1076FF12 ..v..v".v .v&.v$......Fý.FýÔ...^ 000140
 0A76FFFC 4689FE46 89000088 0000AE46 C7D88E02 AFB81E56 57000056 C8CBC95F _èùàV..WV.¡£..ÀùFÛ..¡...F±.F•.v. 000160
 46880006 E9037500 0030AA46 89000002 C59A5016 80468D10 76FF1276 FF0876FF ¯v..v..v..F¯.P.é....F`=..u.Ô...F 000180
 000030AA 46890000 001E9A50 16AC468D 1876FF1A 76FF0C76 FF0E76FF 00E8E9AA `ÔÔ..v..v..v..v..F¯.P......F`=.. 0001A0
 0A76FF00 33E90375 01AC7E83 003CE903 7502AC7E 8300C1E9 AA468800 06E90375 u.Ô...F`Ôè..~¯.u.Ô<..~¯.u.Ô3..v. 0001C0
 890000FF FF9A5016 18468D20 76FF2276 FF1076FF 1276FF0C 76FF0E76 FF0876FF .v..v..v..v..v..v".v .F..P...... 0001E0

Dump of file SATURN:[PCCOMMON.DUMP.DLL]DAMERGE.TMP;1 on 18-APR-1990 10:42:05.48
File ID (575,19,0)   End of file block 101 / Allocated 104

Virtual block number 42 (0000002A), 512 (0200) bytes

 006A006A 1876FF1A 76FF0C76 FF0E76FF 007CE9AA 46880006 E9037500 003DAA46 F`=..u.Ô...F`Ô|..v..v..v..v.j.j. 000000
 06E90375 00003DAA 46890000 FFFF9A01 6A006A00 6A501680 46802476 FF2676FF .v&.v$.F¯.Pj.j.j.......F`=..u.Ô. 000020
 FF1A76FF 1476FF16 76FF0C76 FF0E76FF 0876FF0A 76FF0676 FF0045E9 AA468800 ..F`ÔE..v..v..v..v..v..v..v..v.. 000040
 FF9A5016 FC468D50 16AE4680 2076FF22 76FF2476 FF2676FF 1076FF12 76FF1876 v..v..v..v&.v$.v".v .FÛ.P.F•.P.. 000060
 FA46C7DB 8E0348B8 1E565700 0008C8CB C95F5E1F 0000E9AA 4688AA46 890000FF ....F¯.F`Ô...^_èùà...WV.¡K..ÀùF' 000080
 76FF0A76 FF0676FF 07892602 47892600 00B8245E C4FC4689 FE468900 00B80000 ..¡...F±.F•á^$¡..&.G.&...v..v..v 0000A0
 FF2076FF 2276FF10 76FF1276 FF1876FF 1A76FF14 76FF1676 FF0C76FF 0E76FF08 ..v..v..v..v..v..v..v..v..v".v . 0000C0
 5F5E1F00 00E9F846 88F84689 0000FFFF 9A5016FC 46805016 FA468D24 76FF2676 v&.v$.F'.P.F•.P......F½.F½Ô...^_ 0000E0
 1276FF1C 76FF1476 FF1676FF 0C76FF0E 76FFD88E 0479B81E 56570000 02C8CBC9 èùà...WV.¡y..Å.v..v..v..v..v..v¯ 000100
 FF0E76FF 0034E9FE 46880006 E9037500 003DFE46 890000FF FF9A1E76 FF1076FF .v..v.......F±=..u.Ô...F±Ô4..v.. 000120
 7500003D FE468900 00FFFF9A 1E76FF10 76FF1276 FF1C76FF 1876FF1A 76FF0C76 v..v..v..v..v..v..v.......F±=..u 000140
 8E04EAB8 1E565700 0000C8CB C95F5E1F 0000E900 00B80006 E9FE468B 0006E903 .Ô...F±Ô..¡..Ô...^_èùà...WV.¡Ô.. 000160
 9A1676FF 1876FF12 76FF1476 FF0E76FF 1076FF0A 76FF0C76 FF0676FF 0876FFD8 Å.v..v..v..v..v..v¯.v..v..v..v.. 000180
 76FF0676 FF0876FF D88E055D 881E5657 000000C8 CBC95F5E 1F0000E9 0000FFFF ....Ô...^_èùà...WV.¡]..Å.v..v..v 0001A0
 FF2076FF 1A76FF1C 76FF1876 FF1676FF 0E76FF10 76FF1276 FF1476FF 0A76FF0C ..v..v..v¯.v..v..v..v..v..v..v . 0001C0
 76FF0876 FFD88E05 94B81E56 57000000 C8CBC95F 5E1F0000 E90000FF FF9A1E76 v......Ô...^_èùà...WV.¡...Å.v..v 0001E0
```

```
Dump of file SATURN:[PCCOMMON.DUMP.DLL]DAMERGE.TMP;1 on 18-APR-1990 10:42:05.48
File ID (575,19,0)   End of file block 101 / Allocated 104

Virtual block number 43 (0000002B), 512 (0200) bytes

FF1A76FF 1C76FF1E 76FF1676 FF1276FF 1476FF0E 76FF1076 FF0A76FF 0C76FF06 ..v..v..v..v..v..v..v..v..v..v.. 000000
76FF0876 FF088E05 D7881E56 57000000 C8CBC95F 5E1F0000 E90000FF FF9A1876 v......Ô...^_èùà...WV.|▪..Ä.v..v 000020
9A1A76FF 1C76FF1› 7^FF1876 FF1276FF 1476FF0E 76FF1076 FF0A76FF 0C76FF06 ..v..v..v..v..v..v..v..v..v..v.. 000040
76FF0676 FF0876FF D88E0617 BB1E5657 000000C8 CBC95F5E 1F0000E9 0000FFFF ....Ô...^_èùà...WV.|...Ä.v..v..v 000060
FF1C76FF 1E76FF1A 76FF1676 FF1876FF 1276FF14 76FF0E76 FF1076FF 0A76FF0C ..v..v..v..v..v..v..v..v..v..v.. 000080
76FFD88E 0654881E 56570000 00CBCBC9 5F5E1F00 00E90000 FFFF9A20 76FF2276 v".v .....Ô...^_èùà...WV.|T..Ä.v 0000A0
FF1276FF 1476FF16 76FF1876 FF1A76FF 1C76FF1E 76FF2076 FF2276FF 2476FF26 &.v$.v".v .v..v..v..v..v..v..v.. 0000C0
C95F5E1F 0000E922 C483006F 00009A06 76FF0876 FF0A76FF 0C76FF0E 76FF1076 v..v..v..v..v..v....o..é"Ô...^_è 0000E0
0030FC46 890000FF FF9A1076 FF1276FF 0676FFD8 8E069AB8 1E565700 000CC8CB ùà...WV.|...Ä.v..v..v.......F▪=. 000100
03969A50 16FE4680 0C76FF0E 76FF0876 FF0A76FF 0164E9FC 46880006 E9037500 .u.Ô...F▪Ôd..v..v..v..v..F±.P... 000120
880000FF FF9A37FF 260277FF 26105EC4 0676FF00 18E90375 00003DFC 46890000 ...F▪=..u.Ô...v.é^.&.w.&.7...... 000140
16F44680 186A0C76 FF0E76FF 0876FF0A 76FF000B E9037401 FE7EB301 2BE9FC46 F▪Ô+..-±.t.ÔU..v..v..v..v.j..F¶. 000160
F84689F6 5688F446 8800F9E9 FC468800 06E90375 00003DFC 46890000 FFFF9A50 P.......F▪=..u.Ô...F▪Ô'..F¶.V-.F½ 000180
0277FF26 105EC400 59E90375 02470826 078826F8 5EC404F8 46830004 E9FA5689 .V'Ô...F½.é^Y&..&.G.u.ÔY.é^.&.w. 0001A0
0030FC46 890CC483 06040875 9A0876FF 0A76FF37 FF260277 FF26F85E C437FF26 &.7é^Y&.w.&.7.v..v..u.&..é..F▪=. 0001C0
77FF2610 5EC40676 FF000007 FF9AF476 FFF676FF 0876FF0A 76FF0029 E9037500 .u.Ô)..v..v..v-.v¶......v.é^.&.w 0001E0

Dump of file SATURN:[PCCOMMON.DUMP.DLL]DAMERGE.TMP;1 on 18-APR-1990 10:42:05.48
File ID (575,19,0)   End of file block 101 / Allocated 104

Virtual block number 44 (0000002C), 512 (0200) bytes

FF9AF476 FFF676FF 0876FF0A 76FFFF94 E90081E9 FC468800 000738 9A 37FF2602 .&.7.;....F▪Ô..Ô...v..v..v-.v¶.. 000000
000007E5 9A37FF26 0277FF26 105EC406 76FF0018 E9037500 003DFC46 890000FF ....F▪=..u.Ô...v.é^.&.w.&.7.|... 000020
9A0876FF 0A76FF0C 76FF0E76 FF37FF26 0277FF26 105EC400 41E9004A E9FC4688 .F▪ÔJ.ÔA.é^.&.w.&.7.v..v..v..v.. 000040
9A37FF26 0277FF26 105EC406 76FF0018 E9037500 0030FC46 890CC483 07860875 u.Ñ..é..F▪=..u.Ô...v.é^.&.w.&.7. 000060
8E06E988 1E565700 000AC8CB C95F5E1F 0000E900 00880006 E9FC4688 0000081C .....F▪Ô..|..Ô...^_èùà...WV.|Ô.. 000080
75000030 F6468900 0009CD9A 5016FC46 8D156A0A 76FF0C76 FF0676FF 0876FFD8 Á.v..v..v..v.j..F▪.P.ë....F-=..u 0000A0
5688FC46 88021DE9 F6468800 000918 9A 0E76FF10 76FF37FF 260E5EC4 0017E903 .Ô..é^.&.7.v..v.......F-Ô...F▪.V 0000C0
0E5EC400 A9E90375 02470826 078826FC 5EC404FC 46830004 E9FA5689 F84689FE ±.F½.V'Ô...F▪.é^▪&..&.G.u.Ô`.é^. 0000E0
379A5052 00020510 5686 0E46 8837FF26 0E5EC400 49E90374 04470826 02478826 &.G.&.G.t.Ôl.é^.&.7.F..V....RP.7 000100
FF000009 689A0E76 FF1076FF 37FF260E 5EC40028 E9037500 0030F646 89C^00A ....F-=..u.Ô(.é^.&.7.v..v..h.... 000120
52000205 1056880E 468801A2 E9F64688 00000979 9AF876FF FA76FF06 76FF\^76 v..v..v'.v½.y....F-ÔÄ..F..V....R 000140
FF260E5E C40028E9 03750000 30F64689 00000A84 9A37FF26 0277FF26 FC5EC450 Pé^▪&.w.&.7......F-=..u.Ô(.é^.&. 000160
F6468800 0009939A F876FFFA 76FF0676 FF0876FF 000009AF 9A0E76FF 1076FF37 7.v..v..É....v..v..v'.v½......F- 000180
E9037500 0030F646 8900000A 649AF876 FFFA76FF 0676FF08 76FFFF44 E90155E9 ÔU.Ô0..v..v..v'.v½.d....F-=..u.Ô 0001A0
FF0676FF 0876FF01 1FE9F646 88000009 E99A0E76 FF1076FF 37FF260E 5EC40017 ..é^.&.7.v..v..Ô....F-Ô...v..v.. 0001C0
260E5EC4 0017E903 7500003D F6468900 0007629A 5016FC46 8D126A0A 76FF0C76 v..v.j..F▪.P.b....F-=..u.Ô..é^.& 0001E0

Dump of file SATURN:[PCCOMMON.DUMP.DLL]DAMERGE.TMP;1 on 18-APR-1990 10:42:05.48
File ID (575,19,0)   End of file block 101 / Allocated 104

Virtual block number 45 (0000002D), 512 (0200) bytes

E9FA5689 F84689FE 5688FC46 8800E5E9 F6468800 000A539A 0E76FF10 76FF37FF .7.v..v..S....F-Ôl..F▪.V±.F½.V'Ô 000000
08470826 06478826 0E5EC400 A9E90375 02470826 078826FC 5EC404FC 46830004 ...F▪.é^=?▪.&.G.u.Ô`.é^.&.G.&.G. 000020
0030F646 890000FF FF9A5052 00060510 5688 0E46 8837FF26 0E5EC400 49E90374 t.Ôl.é^.&.7.F..V....RP......F-=. 000040
FA76FF06 76FF0876 FF00000A A09A0E76 FF1076FF 37FF260E 5EC40028 E9037500 .u.Ô(.é^.&.7.v..v.......v..v..v' 000060
0277FF26 FC5EC450 52000605 1056880E 4688006A E9F64688 00000AB1 9AF876FF .v½.Ý....F-Ôj..F..V....RPé^▪&.w. 000080
9A0E76FF 1076FF37 FF260E5E C40028E9 03750000 30F64689 0000FFFF 9A37FF26 &.7......F-=..u.Ô(.é^.&.7.v..v.. 0000A0
76FFFF44 E9001DE9 F6468800 000AC89A F876FFFA 76FF0676 FF0876FF 00000860 '....v..v..v'.v½.ù....F-Ô..Ô0..v 0000C0
001890C8 C95F5E1F 0000E9F6 4688F646 89000007 D39AF876 FFFA76FF 0676FF08 ..v..v'.v½.É....F-.F-Ô...^_èù... 0000E0
034E000A 05C30203 02CE000A 03310203 00000005 08420002 00F00004 05070203 ......Þ...B........1...ö...ŭ...N. 000100
0000000C 08700002 010E0004 071E0203 0359000A 05800203 01020004 092C0203 ..,...........Y............)..... 000120
0366000A 06030203 0466000A 03080203 02E5000A 06400203 02720008 08FF0203 ......r...ã...|...Ü...f.......f. 000140
02FC000A 04000203 0373000A 06860203 02F0000A 045F0203 02700008 094C0203 ..L...)..._...Þ.......s...Å...▪. 000160
00CA0004 02400203 029F0009 02EE0203 028E0009 036F0203 00810004 08950203 ......Ý...õ.......Ý.......ã...ò. 000180
03AC000A 08810203 00040004 05350203 02AC0009 04120203 039A000A 06F70203 ..¥..........-...5...å...Ý...¯. 0001A0
390017E9 03750038 80260A5E C4460001 E900008E D88EFFFF 881E5657 000004C8 à...WV.|...Ä/..Ô...Fé^.&.8.u.Ô..9 0001C0
7F0E7E39 470001E9 FE88FFDC E9008826 065EC400 8A260A5E C4000FE9 037F0E76 v...Ô..é^.&..é^.&..ÔÉ..±Ô..G9~.. 0001E0
```

```
Dump of file SATURN:[PCCOMMON.DUMP.DLL]DAMERGE.TMP;1 on 18-APR-1990 10:42:05.48
File ID (575,19,0)   End of file block 101 / Allocated 104

Virtual block number 46 (0000002E), 512 (0200) bytes

 0EE90375 00FF7F[illegible] 2608468E 065E030E 5E88FFED E90001C6 26065EC4 000AE903 .Õ..6^.&6..ÕÙ..^..^..F.&....u.Õ. 000000
 00080002 000190CB C95F5E1F 0000E9C6 8800FF47 C6260846 8E065E03 0E5E8800 ..^..^..F.&6G...6Õ...^_èù....... 000020
 890000B8 D88EFFFF 881E5657 000410C8 00000000 00000000 00000000 0000000C ................À...WV.|...À|... 000040
 46880AC4 83FFFF00 009A5016 FBF68680 0A76FF0C 76FF0401 68FBF286 89FBF486 .¶«...«h...v..v...-«.P......À..F 000060
 261CD606 8EFFFF68 FFFF6806 76FF0876 FF0676FF 0876FF00 03F946C7 F746890E ..F%úF*...v..v..v..v.h..h....ø.& 000080
 0374FE46 08FC4688 FE5689FC 46890000 FFFF9A50 16FBF686 80010268 020036FF .6..h....-«.P......F».V±.F».F±t. 0000A0
 76FFFE76 FF0020E9 FBF08688 FBF08689 0000FFFF 9AFBF286 FFFBF486 FF0018E9 Õ...Ñ¶«.Ñ.«.......Þ«..Þ«Õ-..v±.v 0000C0
 26F94688 105EC400 0FE9FBF0 86880007 E9037500 003DFBF0 86890000 FFFF9AFC ».......Þ«=..u.Õ....Þ«Õ .6^..F*& 0000E0
 8801EAE9 0E4688D8 8E000888 1E565700 0004C8CB C95F5E1F 0000E900 00880789 ..|..Õ...^_èùÀ...WV.|...^.F.Õõ.. 000100
 76FF006A 1076FF12 76FF0000 FFFF9A10 76FF1276 FFFE5689 FC468908 56880646 F..V..F».V±.v..v.......v..v.j..v 000120
 FC5EC400 00FFFF9A FC76FFFE 76FF0101 681076FF 1276FF00 00FFFF9A FC76FFFE ±.v»......v..v.h...v±.v».....6^» 000140
 0001609A 006A006A 016A006A 01256801 04681076 FF1276FF 0085E904 01878826 &....Õ...v..v.h..hX.j.j.j.j..'.. 000160
 76FF1276 FF006DE9 00000177 9A006A50 52000001 6E9A0105 681076FF 1276FF00 ..v..v.h...n...RPj..w...Õm..v..v 000180
 FFFF9A01 04681076 FF1276FF 00000193 9A006A00 6A016A00 6A012568 01056810 .h..hX.j.j.j.j.......v..v.h..... 0001A0
 006A016A 006A0125 68010468 1076FF12 76FF003A E90000FF FF9A006A 50520000 ..RPj......Õ:..v..v.h..hX.j.j.j. 0001C0
 00033DFF 9EE90375 00023DFF 73E90375 00013000 1BE9001E E90000FF FF9A006A j......Õ..Õ..=..u.Õs.=..u.Õ..=.. 0001E0

Dump of file SATURN:[PCCOMMON.DUMP.DLL]DAMERGE.TMP;1 on 18-APR-1990 10:42:05.48
File ID (575,19,0)   End of file block 101 / Allocated 104

Virtual block number 47 (0000002F), 512 (0200) bytes

 46890000 FFFF9A00 6A1076FF 1276FF00 ACE90A46 880119E9 0000E9FF C9E90375 u.Õè.Õ..Õ...F.Õ¯..v..v.j.......F 000000
 75D00800 0002169A 006A006A 006A006A 01246801 04681076 FF1276FF FE5689FC ».V±.v..v.h..h$.j.j.j.j.......Àu 000020
 6A006A01 24680105 681076FF 1276FF00 37E90001 040387C7 26FC5EC4 0000E903 .Õ..6^»&ú.....Õ7..v..v.h..h$.j.j 000040
 5EC4000A E9000204 0387C726 FC5EC400 00E90375 00080000 01209A00 6A006A00 .j.j..-....Àu.Õ..6^»&ú.....Õ..6^ 000060
 2FE9008F E900008A 00008800 00FFFF9A 006A1076 FF1276FF 00030403 87C726FC »&ú.......v..v.j......|..¤..Õ..Õ/ 000080
 01073000 13E90016 E90076E9 00008A00 00880000 028C9A01 6A1076FF 1276FF00 ..v..v.j......|..¤..Õv.Õ..Õ..=.. 0000A0
 00000241 9A016A10 76FF1276 FF0051E9 0000E9FF D4E90375 01093DFF 4CE90375 u.ÕL.»..u.ÕÀ.Õ..Õ¤..v..v.j..A... 0000C0
 FF9A0676 FF0876FF 0A76FF0C 76FF0E76 FF1076FF 1276FF00 44E90000 BA0000B8 |..¤..ÕD..v..v..v..v..v..v..v... 0000E0
 FEE90375 003B3DFF BAE90375 00293DFE FAE90375 00203000 1BE90027 E90000FF ...Õ'.Õ..= .u.Õ'±»).u.Õ¤.»;.u.Õ± 000100
 5E010300 F3000200 7C010300 100ECAC9 5F5E1F00 00E90000 BA0000B8 FFC5E9F0 »Õé.|..¤..Õ...^_èÕ.....|...µ...^ 000120
 09010300 7F000201 E9010300 7E000202 5A010300 7C000200 92010300 7A000200 ...z.......|...Z...-...Õ........ 000140
 49000500 00000700 46000200 08000201 44010300 00000600 29000200 86000201 ........).......D.......F.......| 000160
 C5000200 1F000201 CA010300 1E000200 F5010300 13000201 38010300 8D000700 ...§...;........%........ò.......é 000180
 00000000 00000000 00000001 46000500 E2020300 B3000202 AF010300 00000C00 .......£...•...ã...f............ 0001A0
 3DF84689 0000FFFF 9A5016FA 46800A76 FF0C76FF D88EFFFF 881E5657 000008C8 à...WV.|...A.v..v..F*.P......F½= 0001C0
 00003DF8 46890000 FFFF9A50 16FC4680 FA76FF01 40E9F846 880006E9 03750000 ..u.Õ...F½Õ¤..v*.F».P......F½=.. 0001E0

Dump of file SATURN:[PCCOMMON.DUMP.DLL]DAMERGE.TMP;1 on 18-APR-1990 10:42:05.48
File ID (575,19,0)   End of file block 101 / Allocated 104

Virtual block number 48 (00000030), 512 (0200) bytes

 57E90375 1C46081A 46880062 E9037518 46081646 880122E9 F8468800 06E90375 u.Õ...F½Õ"..F..F.u.Õb..F...F.u.ÕW 000000
 FF1276FF 1476FF16 76FF1876 FF1A76FF 1C76FF1E 76FF2076 FF2276FF 2476FF00 ..v$.v".v .v..v..v..v..v..v..v.. 000020
 F501729A 4477FF26 4677FF26 FC5EC406 76FF0876 FF0A76FF 0C76FF0E 76FF1076 v..v..v..v..v..v.6^»&.wF&.wO.r.% 000040
 03751C46 081A4688 00AFE900 B8E9F846 880006E9 03750000 3DF84689 24C[illegible]300 ..6$.F½=..u.Õ...F½Õ|.ÕE..F..F.u. 000060
 76FF0C76 FF0E76FF 1076FF12 76FF1476 FF1A76FF 1C76FF1E 76FF2076 FF00[illegible]1E9 ÕK..v .v..v..v..v..v..v..v..v..v 000080
 00003DF8 46891CC4 83015103 9E9A4477 FF264677 FF26FC5E C40676FF 0876FF0A ..v..v.6^»&.wF&.wO...Q..6..F½=.. 0000A0
 FF2276FF 2476FF00 4EE90375 18460816 46880059 E90062E9 F8468800 06E90375 u.Õ...F½Õb.ÕY..F..F.u.ÕN..v$.v". 0000C0
 0876FF0A 76FF0C76 FF0E76FF 1076FF12 76FF1476 FF1676FF 1876FF1E 76FF2076 v .v..v..v..v..v..v..v..v..v..v. 0000E0
 06E90375 00003DF8 468920C4 83FFFF05 2A9A4477 FF264677 FF26FC5E C40676FF .v.6^»&.wF&.wO.*....6 .F½=..u.Õ. 000100
 76FFD88E 0008881E 56570005 7AC8C8C9 5F5E1F00 00E90000 880006E9 F8468800 ..F½Õ..|..Õ...^_èùÀz..WV.|...À.v 000120
 E9FB1E86 880007E9 03750000 3DFB1E86 89000002 029A5016 FB208680 0A76FF0C ..v... «.P.........«=..u.Õ.....«Õ 000140
 00003DFB 1E868900 00010F9A 5016FA86 86801276 FF1476FF 0A76FF0C 76FF01F7 %..v..v..v..v....*.P.Õ.......«=.. 000160
 2C9A5016 FA02868D 1A76FF1C 76FF0A76 FF0C76FF 01CDE9FB 1E868800 07E90375 u.Õ.....«Õe..v..v..v..v...Ø*.P., 000180
 160C4680 0E76FF10 76FF01A3 E9FB1E86 880007E9 03750000 3DFB1E86 89000002 ......«=..u.Õ.....«ÕE..v..v..FÉ. 0001A0
 FF0E76FF 1076FF01 80E9FB1E 86880007 E9037500 0030FB1E 86890000 FFFF9A50 P........«=..u.Õ....«Õ...v..v.. 0001C0
 FB1E8688 0007E903 75000030 FB1E8689 00000255 9A5016FB 42868016 76FF1876 v..v...B«.P.U......«=..u.Õ.....« 0001E0
```

```
Dump of file SATURN:[PCCOMMON.DUMP.DLL]DAMERGE.TMP;1 on 18-APR-1990 10:42:05.48
File ID (575,19,0)   End of file block 101 / Allocated 104

Virtual block number 49 (00000031), 512 (0200) bytes

00003DFB 1E868900 00FFFF9A 50169046 8D1E76FF 2076FF0E 76FF1076 FF0156E9 ÔV..v..v..v .v..F..P.........«=.. 000000
FAD28680 50160C4C 805016FB 42868050 16904680 012DE9FB 1E868800 07E90375 u.Õ.....«Õ-..F..P..B«.P.FÉ.P..@' 000020
009F0700 9A016A50 16FB8E86 80040168 066A5016 FB208680 5016FA86 86805016 .P...'.P.. «.Pj.h.....«.Pj...... 000040
8E868D03 6A5016FE 468D00E3 E9FB1E86 880007E9 03750000 3DFB1E86 8922C483 .á"...«=..u.Õ.....«ÕO..F±.Pj.... 000060
1E868800 07E90375 00003DFB 1E86890E C483FFFF 00009A06 76FF0876 FF5016FB «.P.v..v........á....«=..u.Õ..... 000080
FF9A2276 FF2476FF 2676FF28 76FF026A 1A76FF1C 76FF008E E9FE4688 0085E9FB «Õç..F±Õ...v..v.j..v(.v&.v$.v"... 0000A0
02470826 07882622 5EC40083 E9FB1E86 880007E9 03750000 3DFB1E86 890000FF .......«=..u.Õ.....«Õ..á^"&..&.G. 0000C0
FB1E8689 0000FFFF 9A2676FF 2876FF16 76FF1876 FF1A76FF 1C76FF00 2AE90374 t.Õ*..v..v..v..v..v(.v&.........« 0000E0
89260789 2620568B 1E468822 5EC40041 E9004AE9 FB1E868B 0007E903 75000030 =..u.Õ.....«ÕJ.ÕA.á^".F..V &..&. 000100
FF6AE903 7500013D 001BE900 1EE90789 26024789 260000B8 225EC400 2EE90257 W.Õ..á^"|..&.G.&..Õ..Õ..=..u.Õj. 000120
2EC8CBC9 5F5E1F00 00E90000 880000E9 FF05E903 7500033D FFCAE903 7500023D =..u.Õð.=..u.Õï.Õ..|..Õ...^_èuà. 000140
3DFB1E86 89000001 C89A5016 FB208680 0A76FF0C 76FFD88E 017A881E 56570005 ..WV.|±..Ä.v..v... «.P.........«= 000160
5016FAD2 868D1276 .F1476FF 0A76FF0C 76FF0157 E9FB1E86 880007E9 03750000 ..u.Õ.....«ÕW..v..v..v..v...@'.P 000180
46800E76 FF1076FF 012DE9FB 1E868800 07E90375 00003DFB 1E868900 0001B59A .ç.......«=..u.Õ.....«Õ-..v..v..F 0001A0
76FF1076 FF010AE9 FB1E868B 0007E903 7500003D FB1E8689 000003B7 9A5016DC É.P.ñ.......«=..u.Õ.....«Õ...v..v 0001C0
86880007 E9037500 003DFB1E 86890000 04579A50 16FB4286 8D1676FF 1876FF0E ..v..v...B«.P.W.......«=..u.Õ.... 0001E0

Dump of file SATURN:[PCCOMMON.DUMP.DLL]DAMERGE.TMP;1 on 18-APR-1990 10:42:05.48
File ID (575,19,0)   End of file block 101 / Allocated 104

Virtual block number 50 (00000032), 512 (0200) bytes

3DFB1E86 89000003 E19A5016 9046801A 76FF1C76 FF0E76FF 1076FF00 E0E9FB1E .«ÕÁ..v..v..v..v..F..P.Ä.......«= 000000
86805016 DC468050 16FB4286 80501690 468000B7 E9FB1E86 880007E9 03750000 ..u.Õ.....«Õñ..F..P..B«.P.FÉ.P.. 000020
891EC483 029E0700 9A026A50 16FB8E86 80040168 056A5016 FB208680 5016FAD2 @'.P.. «.Pj.h.....«.Pj........á.. 000040
FF5016FB 8E868D02 6A5016FE 46800073 E9FB1E86 880007E9 03750000 3DFB1E86 ..«=..u.Õ.....«Õs..F±.Pj.....«.P. 000060
0045E9FB 1E868800 07E90375 00003DFB 1E86890E C48302CC 00009A06 76FF0876 v..v.....à..á.....«=..u.Õ......«ÕE. 000080
260000B8 1E5EC400 2^E90257 89260789 261C568B 1A468B1E 5EC40026 E9FE4688 .F±Õ&.á^..F..V.&..&.W.Õ&.á^.|..& 0000A0
880000E9 FFDDE903 7500033D FFD2E903 7500023D 0013E900 16E90789 26024789 .G.&..Õ..Õ..=..u.Õ@.=..u.Õï.Õ..| 0000C0
FB6C8680 0A76FF0C 76FFD88E 03A6881E 56570005 2EC8CBC9 5F5E1F00 00E90000 ..Õ...^_èuà...WV.|l..Ä.v..v...l« 0000E0
0A76FF0C 76FF01AE E9FB6A86 880007E9 03750000 3DFB6A86 89000005 BA9A5016 .P.¤.....j«=..u.Õ....j«ÕÚ..v..v. 000100
6A868800 07E90375 00003DFB 6A868900 0005979A 5016FAD2 868D1276 FF1476FF .v..v...@'.P........j«=..u.Õ....j 000120
3DFB6A86 89000005 E49A5016 FB1E8680 1A76FF1C 76FF0A76 FF0C76FF 0184E9FB «Õ...v..v..v..v.....«.P.Õ.....j«= 000140
86890000 04049A50 160C4680 0E76FF10 76FF015A E9FB6A86 880007E9 03750000 ..u.Õ....j«ÕZ..v..v..FÉ.P....... 000160
8E868D16 76FF1876 FF0E76FF 1076FF01 37E9FB6A 86880007 E9037500 003DFB6A j«=..u.Õ....j«Õ7..v..v..v..v.... 000180
16FB8E86 8D0100E9 FB6A868B 0007E903 75000030 FB6A8689 0000042E 9A5016FB «.P........j«=..u.Õ....j«Õ......«. 0001A0
DA868D04 0168056A 5016FB6C 86805016 FAD28680 5016FB1E 86805016 DC468050 P.FÉ.P....«.P..@'.P..l«.Pj.h.....Õ 0001C0
00C8E9FB 6A868800 07E90375 00003DFB 6A86891E C483049A 07009A03 6A5016FB «.Pj........á...j«=..u.Õ....j«Õà. 0001E0

Dump of file SATURN:[PCCOMMON.DUMP.DLL]DAMERGE.TMP;1 on 18-APR-1990 10:42:05.48
File ID (575,19,0)   End of file block 101 / Allocated 104

Virtual block number 51 (00000033), 512 (0200) bytes

3DFB6A86 890EC483 04C80000 9A0676FF 0876FF50 16FBDA86 8D016A50 16FE4680 .F±.Pj...Õ«.P.v..v.....à..á....j«= 000000
FF2476FF 026A1A76 FF1C76FF 007BE9FE 4638009A E9FB6A86 880007E9 03750000 ..u.Õ....j«Õ...F±Õ(..v..v.j..v$. 000020
0068E9FB 6A868800 07E90375 00003DFB 6A868900 0002FF9A 1E76FF20 76FF2276 v".v .v.........j«=..u.Õ....j«Õh. 000040
76FF2476 FF1676FF 1876FF1A 76FF1C76 FF002AE9 03740247 0B26078B 261E5EC4 á^.&..&.G.t.Õ*..v..v..v..v..v$.v 000060
881E5EC4 0026E900 2FE9FB6A 86880007 E9037500 003DFB6A 86890000 03389A22 ".8.....j«=..u.Õ....j«Õ/.Õ&.á^.| 000080
E9FFD0E9 03750003 3DFF7DE9 03750001 3D0013E9 0016E907 89260247 89260000 ..&.G.&..Õ..Õ..=..u.Õ).=..u.Õï.Õ 0000A0
FED28689 00008808 8E05328B 1E565700 0132C8CB C95F5E1F 0000E900 00B80000 ..|..Õ...^_èuà2..WV.|2..Ä|.....@± 0000C0
001FE903 770E4639 C68B4600 01E90000 8EFED696 8CFED486 89104680 FED08689 ..Ä±.F....â±..@±/..Õ..F.69F.w.Õ.. 0000E0
E9FFD6E9 DA5389D8 438902E7 C1FE8BFE 578B26FC 478B26FE D49EC404 FED48683 ..á±.á.á±&.G=&.W±.±èÕ..CÄ.SÖÕ@.Õ 000100
FED286FF FFE6E908 43890A43 890000B8 02E7C1FE 880011E9 037C09FE 83460001 ..F.±.|.Õ....±èÕ.|....CÕ.CÄÕl..Ñ@± 000120
46800000 FFFF9A50 16FED886 8D010068 04006802 0036FF26 1CD8068E FED086FF .ÑÄ±..Ä.&.6..h..h.....Ä±.P.......F 000140
00109A50 16FE4680 5016FED8 868D0676 FF0C76FF 0876FF0A 76FF0E76 FF50160B Ä.P.v..v..v..v..v...Ä±.P.F±.P... 000160
CBC95F5E 1F0000E9 00008800 06E9FECE 86880007 E9037500 003DFECE 8689FFFF ....ö±=..u.Õ....ö±Õ..|..Õ...^_èu 000180
00080628 00020000 0007J656 00020076 00040543 0203006A 00040018 02030008 ........j....C...v....V.........(.... 0001A0
0002079A 01030000 000A07C0 000203D4 000A06C2 02030451 000A0689 020[illegible]000 ........Q...ô...Â...â.............. 0001C0
00000000 000001C2 00060036 0203028E 0009056D 02030000 000C0715 0002[illegible] ..............m........6...ö........ 0001E0
```

Dump of file SATURN:[PCCOMMON.DUMP.DLL]DAMERGE.TMP;1 on 18-APR-1990 10:42:05.48
File ID (575,19,0)   End of file block 101 / Allocated 104

Virtual block number 52 (00000034), 512 (0200) bytes

```
8DFA568C F84689EC 46805657 000016C8 00000000 00000000 00000000 00000000 ..................à...WV.F&.F%.V•. 000000
89260857 89260647 89260856 8B064688 420A47C6 26F85EC4 FE568CFC 46890E46 F..F•.V±á^%&6G.B.F..V.&.G.&.W.&. 000020
880CC483 008507EA 9A53060A 76FF0C76 FFFC76FF 167FFF04 47C72602 57892607 .&.W.&úG.....v•.v..v..S.õ....á.. 000040
53FA76FF 900FE805 88260247 8E2607FF 263F8826 C02A1278 044FFF26 F85EC4F0 Þá^%&.O.x.*á&.?&..&.G.&..$...v*S 000060
F3000AB9 008CB+00 468EC08E D88C5756 CBC95F5E C68806C4 83FFFF06 749A006A j..t....á..ó^_èùVW.Ä.á/F.¢..¿..µ 000080
A5A5FCD8 8EC18ED9 8CC08CFB 880CC383 02721E88 F3885756 C08ED08C CB5E5FA5 Ê ^ù.Ä.áVW.µ..r..û..«.á.).è.Ä•ÊÊ 0000A0
025EFB81 F388A5A5 FCC18ED9 8CFB880C C3830272 1E88F388 575616EB F388098E .T.µ$.VW.µ..r..û..«.).è•ÊÊ.µ.«^. 0000C0
880CC383 02721E88 F3885756 C08ED08C CB5E5F03 FE47C6FC 77890272 1E894E74 tN..r..w•6G±._^ù.Ä.âVW.µ..r..û.. 0000E0
880CC383 02721E88 F3885756 18E8F388 D98EA5A5 A5A5FCD8 8EC18ED9 8CC08CFB «.á.).è.Á•ÊÊÊÊ.).µ$.VW.µ..r..û.. 000100
CB5E5FFC 778907FE 47C60272 1E890E74 025EF881 F388A5A5 A5A5FCC1 8ED98CFB «.).è•ÊÊÊÊ.µ.«^.t...r.6G±..w•_^ù 000120
ADF8880C C3830272 1E88F388 FCD88EC1 8ED98CD8 8C575604 E8D08C57 561149E9 ÕI.VW.Ä$.VW.Ä.).è.Ä•.µ..r..û.¯«U 000140
8ED08CCB 5E5FD98E FC5F8902 721E89CF 74025EFB 81A5A502 74033CA5 A5FE4588 .E±ÊÊ<.t.ÊÊ.«^.tü..r.._•.)_^ù.Ä. 000160
57569907 8803E802 57880788 0AE89907 8826C08E D08C14EB 02578826 078826C0 á&..&.W.$..Ä.á&...$...¯W.$¯...VW 000180
3E891C74 025EFF81 0CC78302 723E8800 D8830AF7 D8F70779 8024C78A D0880A88 .Õ.Ä.ú$.y.%U¼Ö.Ù..>r..û...^.t..> 0001A0
FE45C6FF 63E9C85E 5F166AE8 9E8403FE 45C60F75 00FF80C1 8ED98CFC 7D890272 r..)•.).è...u.6E±.Ç.Õj._^ùÕc.6E± 0001C0
8AFC7588 02723E88 C08ED88C 5756C85E 5F5D19C9 E8F888D8 33C88887 60805507 .U§'..ù3Ù.«Òè.]_^ùVW.Ä.ã.>r..u•. 0001E0
```

Dump of file SATURN:[PCCOMMON.DUMP.DLL]DAMERGE.TMP;1 on 18-APR-1990 10:42:05.48
File ID (575,19,0)   End of file block 101 / Allocated 104

Virtual block number 53 (00000035), 512 (0200) bytes

```
5E5FA5A5 0274033C A5A5FCFE 4588FC7D 8902723E 89817402 5EFF810C C783FE45 E±.ú...^.tÝ.>r..)•.E±•ÊÊ<.t.ÊÊ ^ 000000
33C08ED8 8C03FE45 C6FC7D89 02723E89 8C74025E FF810CC7 8302723E 885756C8 ùVW.>r..ú...^.t..>r..)=6E±..Ä.ã3 000020
8C11EB0C 02720683 02721E88 FCF88857 56C08ED8 8C02EBD0 8CCB5E5F ABABFCC0 á•¨¨ ^ù.Ä$..Ä.âVW.«•..r...r..$.. 000040
0C02722E 83A5A5FC 77880D75 03FE7F80 02721E88 FCF88857 56C08ED8 8C02EBD0 Ä$..Ä.âVW.«•..r...±.u..w•ÊÊ..r.. 000060
885756C0 8ED88C02 EBD08CE4 EB5D0E88 5F108CE8 57FC7788 00AE2689 55CB5E5F _^ùW.&Ù..w•WÒ...8}Sõ.Ä$..Ä.âVW. 000080
7F800272 1E88FCF8 885756C0 8ED88C02 EBD08C11 E80C0272 06830272 1E88FCF8 ¯•..r...r..$..Ä$..Ä.âVW.«•..r... 0000A0
D08CE9E8 DF87F788 242AE8DF 87C85E5F 0C02722E 83A5A5A5 A5FC7788 0F7507FE ±.u..w•ÊÊÊÊ..r..._^ù.ÕÕ*$.%.ÕSÕ.Ä 0000C0
885756C0 8ED88C0. EBD08C10 E80C0272 06830272 1E88F888 5756C08E D88C02EB $..Ä.âVW.«..r...r..$..Ä$..Ä.âVW. 0000E0
8A1407B8 CB5E5FA. A5027403 3CA5A5AB FC0C0272 2E83FE47 8AF38802 721E88FB «..r..µ.G±..r...•¨ÊÊ<.t.ÊÊ_^ù|..¤ 000100
23E836E8 0344BA03 3E880076 26889F00 5A03909A 48E8143A 8A143588 50E81411 ..$P|S.¤:.$H...Z...&v.|>.¤D.$6Ö# 000120
D28308F7 0773589E 0076268A 501135E8 9004E811 70E8900A E81122E8 9010E811 .$..Ö".$..Öp.$..ÖS.P.&v..Xs.%Ä.@ 000140
72368851 5300AE26 89555756 03508A03 4A880076 26889F03 2F03909A C30AF700 .%Öù.../...&v.|J.¤P.VWJ.&Ù.SQ.6r 000160
3E8857C8 5E5F5D5B 5902FF02 E8D0FF04 75087488 030A7C80 02723689 0CEE8302 ..Ý..6r..|...t.u..Ä$..@Y[]_^ùW.> 000180
F6F87480 FF41F6CB 5F0875F0 FF41F608 7403F880 13757F01 F6FF32FE 5D8A0272 r..]±2.-..u..«.t.-A.Þu._ù-Ä..t½- 0001A0
8A02723E 885756C8 5F7F2180 FF32FE5D 8A02723E 8857C8F9 CBE40803 755F8001 .._u..ÕùªùW.>r..]±2..|._ùVW.>r.. 0001C0
AD087503 F880A5FC C18ED98C FC7D89C8 5E5F8031 80FF3208 75F738FC 7588FE50 }±¯u•;%u.2..1._^ù.)•.).ẽ•E.«.u.Ù 0001E0
```

Dump of file SATURN:[PCCOMMON.DUMP.DLL]DAMERGE.TMP;1 on 18-APR-1990 10:42:05.48
File ID (575,19,0)   End of file block 101 / Allocated 104

Virtual block number 54 (00000036), 512 (0200) bytes

```
04EB2286 E8575602 EBC08ED0 8C5756C8 5E5FA880 F480ADA5 A5CB5E5F A880F480 .¶.¨_^ùÊÊÙ.¶.¨_^ùVW.Ä.á$.VWÕÑ"$. 000000
EB0004B8 F3885756 C4EB229E E8575602 EBC08ED0 8C575676 EB000888 F3885756 VW.µ|..$vVW.Ä.ã$.VWÕ."$.VW.µ|..$ 000020
EBC08ED0 8C575646 EB000CB8 F3885756 04EB2286 E8575602 EBC08ED0 8C57565E ^VW.Ä.á$.VWÕ."$.VW.µ|..$FVW.Ä.á$ 000040
04EB2256 E8575602 E3C08ED0 8C57562E EB0014B8 F3885756 04EB226E E8575602 .VWÕn"$.VW.µ|..$.VW.Ä.á$.VWÕV"$. 000060
88000088 F3885756 04EB223E E8575602 EBC08ED0 8C575616 EB001088 F3885756 VW.µ|..$.VW.Ä.á$.VWÕ>"$.VW.µ|... 000080
83C85E5F 5D005A97 FF00AE26 8955FC7D 87107407 FE7D80C1 8ED98C02 723E88D8 Ä.>r..).è.)±.t..)•U.&O...Z.)_^ù. 0000A0
5604E822 0DE85756 02E8C08E D08C5756 DFE80272 3E88F788 2249E800 F48F02C3 û.¢¶.ÕI".%.>r.$ÕVW.Ä.á$.VWÕ.ª$.V 0000C0
5EE80006 88F38857 5604E821 F5E85756 02E8C08E D08C5756 76E8000A 88F38857 W.µ|..$vVW.Ä.á$.VWÕ%!$.VW.µ|..$^ 0000E0
02E8C08E D08C5756 46E8000E 88F38857 5604E821 DDE85756 02E8C08E D08C5756 VW.Ä.á$.VWÕ!!$.VW.µ|..$FVW.Ä.á$. 000100
5604E821 ADE85756 02E8C08E D08C5756 2EE80016 88F38857 5604E821 C5E85756 VWÕ¢!$.VW.µ|..$.VW.Ä.á$.VWÕU!$.V 000120
D8880002 88F38857 5604E821 95E85756 02E8C08E D08C5756 16E80012 88F38857 W.µ|..$.VW.Ä.á$.VWÕ.!$.VW.µ|...Ä 000140
1CEB0008 8821E800 04B8FF39 E95E2190 E8560574 07FE7D80 C18ED98C 02723E88 .>r..).è.)±.t.VÒ.!^Õ9.£..$!£..$. 000160
3E885756 00188803 E8001C88 08E80000 880DE800 14881 2E8 00108817 E8000C88 £..$.£..$.£..$.£..$.£..$ £..VW.> 000180
88FC7D89 FC7588C0 8ED88C02 723E890C EF832874 07F27D80 397407FE 7D800272 r..)±.t9.)·.t•.ÿ..>r..Ä.¿ u•.)•. 0001A0
E82123E8 02C383C8 5E5F5D00 5A97FF00 AE268955 3E7318F8 832F731C F883087D )..«.s/.«.s>U.&Ù...Z.]_^ù.u.Õ#!$ 0001C0
2689550C 02722E83 F787BFE8 210EE802 723E890C EF83C474 07F27D80 02C383CD ë.û..)·.tá.ÿ..>r.Õ.!$¢¯%..r..U.& 0001E0
```

Dump of file SATURN:[PCCOMMON.DUMP.DLL]DAMERGE.TMP;1 on 18-APR-1990 10:42:05.48
File ID (575,19,0) End of file block 101 / Allocated 104

Virtual block number 55 (00000037), 512 (0200) bytes

```
00E80141 00259F5D 005A97FF 00AE2689 550C0272 2E83CB5E 5F5D0056 97FF00AE Û...V.] ^ù..r..U.&Û...Z.].X.AlÔA 000000
8BFCC08E D88C575> 000C8803 EBFF32DF 02E7D0F8 8AE3D0E3 D0CB9E5E 5FE00AE4 ô.Å ^.ùÃDÀD.«ÀÓ.Ô2.Š.Ê..VW.Ã.à». 000020
5756EC88 55CB5E5F F4E24747 1D8BFE44 890587AD 0005B9F8 28FE8B4E 4E027236 6r.ÑN.±+«¿..Û...D±..GGô¶_^ùU.$VW 000040
478A2608 5EC45657 000008C8 00CB5DE5 885E5F20 95E80374 07FE7D80 02723E88 .>r..)±.t.Ò. _^.[]ù.à...WVô^.&.G 000060
26F84689 138405E0 D1C103E0 D1C888F9 F7000CB9 9907C02D C388FA46 89E42A08 .*ô.F*.û-à..¿..X*.àlÂ.ëlÂ.Ç..F%& 000080
26085EC4 900128E9 FFFF8820 0A4F8026 085EC40F 74400A47 F6260774 830A47F6 -G..t.&-G.ât.ô^.&.O. |..Ô+..ô^.& 0000A0
C028EF0A 67802602 0A4F8026 90E2E800 000447C7 26200A4F 80260E74 010A47F6 -G..t.&.O. &ùG...Šâ.&.O..&.g.ÿ+à 0000C0
87F60608 68F9F700 0CB99907 C02DC388 4C750C0A 47F626FC 7689F088 04478926 &.G..Þ.v=&-G..uL.ù·à..¿..X*kÃ.-. 0000E0
75FFFF0A 7E811675 07D8087E 810E7407 1D0A7E81 077507CC 087E8137 75011384 Ç..u7.~.ä.u..~...t..~.Â.u..~...u 000100
26085EC4 04C48321 39E80876 FF0A76FF 0C75C008 02C48307 902C3A9A FA76FF0F ..v*.:,...ô..âu..v..v.Ô91.ô.ô^.& 000120
8B26085E 88677401 138487F6 060868F9 F7000CB9 9907C02D C3881575 080A47F6 -G..u..ù-à..¿..X*kÃ.-.Ç..tg.^.&. 000140
04478926 48024588 F87E8802 57892607 89264008 57882606 47882606 77282637 7&+w.&.G.&.W.a&..&.W..~½.E.H&.G. 000160
C587F6FA 5E8819EB FC468908 C48307AE 293A9AFA 76FF0677 FF265256 167EF608 .--.VR&.w..v*.:)Ù..ô..F•Š..^•-.é 000180
07882606 468A065F C426085E C408C483 07D128FC 9A53006A 006A026A 0F742019 . t.j.j.j.S.=(1..ô.ô^.&ô_..F.&.. 0001A0
CCE90374 FC7639FC 468908C4 83036729 3A9AFA76 FF501606 46805600 018E17EB Š.ƒ..V.F..P.v*.:)g..ô..F=9v•t.Ôë 0001C0
881E6A1E 8C1E68A3 1E6E8807 272D069A 000A88EC 8855CBC9 5F5EE42A 06468AFE ±.F.*ô^_èùU.$|...ø-'.|n.Êh...j.. 0001E0
```

Dump of file SATURN:[PCCOMMON.DUMP.DLL]DAMERGE.TMP;1 on 18-APR-1990 10:42:05.48
File ID (575,19,0) End of file block 101 / Allocated 104

Virtual block number 56 (00000038), 512 (0200) bytes

```
C700001E 6406C71E 4016891E 3EA30856 8806468B 1E5A1689 1E58A310 56880E46 F..V.ÊX...Z..F..V.Ê>...@.ú.d...ú 000000
A31E44A3 1E48A3C0 2800011E 6606C703 08E90374 25F67E80 038DE900 001E6206 .b...Õ...—Xt.Õ..ú.f...+âÊN.ÊD.È 000020
7F80260A 5EC40020 1FCE06C7 1E56A31E 3CA31E42 A31E5CA3 1E5EA31E 46A31E60 '.ÊF.Ê^.Ê\.ÊB.Ê<.ÊV.ú.ö. .ô^.&.. 000040
5C06C71E 4806FF00 752B3F80 260A5E88 903EE800 301FCE06 C70A46FF 49753001 .0ul.F.ú.ö.0.$>..^.&.?+u...H.ú.\ 000060
00EB1E3C 06FF9014 EB1E5C06 FF1A7500 1E483E83 0E75203F 80269028 EB00001E ...Š(.&.? u..>H..u...\.Š....<.Š. 000080
0802C483 0978E80E 5098078A 260A5E88 0A46FF1E 5606FFC7 75203F80 260A5EC4 ô^.&.?·uù..V..F..^.&...P.Òx..ô.. 0000A0
7D001E6C 3E830C56 890A4689 08C48308 C7E80E1E 6C681E0A 76FF0C76 FF0D75C0 àul.v..v..hl..Òù..ô..F..V..>l..) 0000C0
201FCE06 C7067530 1FCE3E83 0074001E 563E831E 6CA308F7 1E6CA11E 5606FF0C ...V.Àl.XÀÊl..>V..t..>ö.0u.ú.ö. 0000E0
08C48308 78E80E1E 66681E0A 76FF060A 46FF1E5E 06FF2075 2E3F8026 0A5EC400 .ô^.&.?.u-..^..F...v..ht .Ò(..ô. 000100
46309807 8A260A5E C41E5E0E FF00011E 6606C70A 7D001E66 3E830C56 890A4689 .F..V..>f..).ú.f.....^.ô' &...=F 000120
C4097500 1E463E83 00021E46 06C70675 006C3028 74006830 4074004E 3D3D7400 .t==N.t@=h.t+=l.u.ú.F....>F..u.ô 000140
D8EB0001 1E4606C7 90024EE9 1C75003F 80260A5E C40A46FF 03754C3F 80260A5E ^.&.7Lu..F.ô^.&.?.u.ÕN..ú.F...ŠÀ 000160
74004730 0A740045 3DFB4689 98078A26 C8E80008 1E4606C7 D0EB0010 1E4606C7 ú.F...$Àú.F...Šâ&....F½=E.t.=G.t 000180
03750063 3D0191E9 037E7874 006930F8 468820F8 46831E44 06FF0875 00583005 .=X.u...D..F½ .F½=i.tx-.Õ..=c.u. 0001A0
261E581E C4157502 1E463E83 900159E9 0140E903 75002530 0152E903 7E013FE9 Ô?.-.ÕR.=X.u.Õ@.ÕY...>F..u.ô.X.& 0001C0
58068307 89261E62 A11FC426 1E581EC4 00E80000 0247C726 0789261E 62A11FC4 ô.Àb.&..&ùG...Š.ô.X.&ô.Àb.&....X 0001E0
```

Dump of file SATURN:[PCCOMMON.DUMP.DLL]DAMERGE.TMP;1 on 18-APR-1990 10:42:05.48
File ID (575,19,0) End of file block 101 / Allocated 104

Virtual block number 57 (00000039), 512 (0200) bytes

```
75200A47 F6261E3E 1EC401B0 E9037400 1E623E83 0170E903 75001E64 3E83041E ...>d..u.Òp..>b..t.Ò§.ô.>.&-G. u 000000
90C3EB02 C483019E E80E0A6A 00001E3C 06C71E60 06FF01AC E9FFFFB8 01AFE903 .ÒÊ.|..Ò¯...'.ú.<...j..Ò...ô.$ú. 000020
0081E903 75081E46 3E830004 1E6606C7 1E5E06FF 1E4406FF 1E4206FF F2EB086A j.Š`..B...D...^.ú.f....>F..u.Õ.. 000040
001E563E 83FA4689 1E6CA128 741E6C06 39FA4689 1E46A3C0 287A7401 1E463E83 .>F..t±+àÊF..F*9.l.t(Àl..F*.>V.. 000060
5806831E 6CA3C028 027DC00B 1E6CA105 1E6C2E83 909013E8 00001E6C 06C70A74 t.ú.l...Š.....l..Àl..ô).+âÊl...X 000080
74001E56 3E832274 00FA7E83 02C48304 80E80E3A 6A02C483 0130E80E 106A021E ..j..ÒO..ô.j:.Ò...ô..-*.t".>V..t 0000A0
1E582E83 00001E6C 06C79007 EB1E6CA3 C028027D C0081E6C A300052D FA468815 ..F*-..Êl..à).+âÊl.Š..ú.l.....X. 0000C0
39E9026E E80E006A 90FF3FE9 106AFF10 E9021E58 068302C4 8300F1EB 0E106A04 .j..Òp..ô...X..Õ..j.Ò?..j..Òn.Õ9 0000E0
E9037500 643D90FF 21E90428 E80E256A FF2AE903 49E80EF8 76FFF4EB 016A90FF ..j.Š¶.v½.Òl.Ò*.jX.Ò(.Òl..=d.u.Õ 000100
880A4688 0A4EFF0C 56880A46 88097400 1E463E83 DA7E0067 3D057C00 653DFF0C ..=e.|.=g.-Õ.>F..t..F..V..N..F.. 000120
75007030 FEE4E903 75006F3D FE80E903 75006E3D 903AEBFE 5689FC46 89400C56 V.@.F•.V±Š:.=n.u.Õ.±=o.u.Õõ±=p.u 000140
EB0A46FF 90B1EBFF 79E90375 007B3DFE 89E90375 00753D8F 7400733D FEE0E903 .ÒÀ±=s.t.=u.u.Õ¿±=x.u.Õy.ŠŸ..F.Š 000160
FF0C76FF 500A462B C388EC75 253C0474 C00AF646 88078A26 FC5EC4FC 46FF9034 4..F=ô^=&...F-.ât.<Xuš.û+F.P.v.. 000180
C00AF646 88078A26 0A5EC40C 56890A46 89FE5688 FC468806 C483044C E80E0A76 v..ÒL..ô..F•.V±.F..V.ô^.&...F-.â 0001A0
3E835657 000012C8 CBC91E62 A1FE51E9 0374200A 47F6261E 3E1EC4FC 63E90374 t.Òc=ô.>.&-G. t.Òò±Àb.èùà...WV.> 0001C0
1E463E83 0774021E 463E831E 6006FF04 740A067E 8300201F CE06C706 74001E5E ^..t.ú.ö. ..~..t...'..>F..t..>F. 0001E0
```

Dump of file SATURN:[PCCOMMON.DUMP.DLL]DAMERGE.TMP;1 on 18-APR-1990 10:42:05.48
File ID (575,19,0)   End of file block 101 / Allocated 104

Virtual block number 58 (0000003A), 512 (0200) bytes

```
1E603E83 902CE804 1E580683 FE5689FC 46890257 8826078B 261E581E C4197510 .u.&.X.&..&.W..F=.V±..X..$,..>'. 000000
89FC4689 99078826 1E581EC4 0EE80000 FE46C7FC 4689078B 261E581E C4 `7400 .t.&.X.&...F=úF±..$.&.X.&....F=. 000020
CCA3C028 9003E806 46880674 FE4608FC 46880E74 001E3C3E 83021E58 068. `E56 V±..X...><..t..F=.F±t..F.$..+âÊä 000040
750A067E 83287u00 FE7E8331 75001E60 3E83F456 89F24689 1E6A1688 1E68A11F .Àh...j..F`.V¶.>'..u1.-±.)+.-..u 000060
46C7FE56 89FC4689 DAF70002 8308F7FE 5688FC46 882D07C6 26F246FF F25EC41D .&^`.F`&ó.-.F=.V±%Á.#.%Ö.F=.V±úF 000080
9AFC76FF FE76FF50 1E0676FF FA5E8CF8 46891E4A 880000F6 46C79006 E80001F6 -..$..úF-..¡J..F%.^".v..P.v±.v=. 0000A0
1E660E88 04C48307 F32AFE9A F876FFFA 76FF4574 001E5E3E 830AC483 0CD72C30 0,=..&..>^..tE.v".v%.±*µ..&...f. 0000C0
C62605E8 F27EC4F0 4E880000 1FCC06C7 0675081F CC3E8300 7EC908F0 4E89C828 +à.NÞ.è~..>ä..u.ú.ä....NÞá-`$.&ó 0000E0
F85EC4F2 76C5EE5E 8C1E440E 88F04E89 F4468CF2 7E89F47F C00849C1 88473005 .0G.éI.&.¶.-`.F¶.NÞ..D..^Ÿév`&^% 000100
F45E8CF2 7689E375 003F8026 F846FF46 202C8003 7C613C07 74C90804 88078A26 &.....èt.<a|.., F.F%&.?.uD.v`.^¶ 000120
C02802E8 0001B805 7500F67E 8308741E 5C06081E 48A11475 001E603E 83EE5E8E .^Ÿ.>'..u.ÀH...\.t..—.u.¡..$.+& 000140
16881E58 A10001BE 18740006 7E835657 000010C8 CBC95F5E 02C48302 FFE80E50 P.Ò...&.^_èùà...WV.-..t./..ÀX... 000160
8826078B 261E581E C4137408 1E463E83 008FE902 1E580683 FA5689F8 46891E5A Z..F%.V".¯X..Ö...>F..t.ó.X.&..&. 000180
83041E58 0683FA5E 8CF84689 FC468907 88261E58 1EC410EB FA5689F8 46890257 W..F%.V"$.&.X.&...F=.F%.^"..X... 0001A0
F8468900 7F880975 00FC7E83 900AE800 78881575 FA4608F8 46880E74 081E463E >F..t..F%.F"u.¡x.$...~=.u.¡...F% 0001C0
5EC4900E E81E660E 881C741E 5E3639F6 28F45689 F24689FA 5688F846 88FA5E8C .^".F%.V".F`.V¶+-96^.t...f.$..&^ 0001E0
```

Dump of file SATURN:[PCCOMMON.DUMP.DLL]DAMERGE.TMP;1 on 18-APR-1990 10:42:05.48
File ID (575,19,0)   End of file block 101 / Allocated 104

Virtual block number 59 (0000003B), 512 (0200) bytes

```
88F37500 3F8026F2 46FFF25E C44690ED E8107ECE 38461574 003F8026 F246FFF2 `.F`&.?.t.F;ó-.$Ú.Fá^``.F`&.?.uµ. 000000
830183E8 0EF876FF FA76FF56 02C48301 59E80E57 0875001E 563E83FE 281E6C3E >l.+±.>V..u.W.ÒY..&.V.v".v%.Ò"..  000020
5A16881E 58A10000 06C890C8 C95F5E02 C483013C E80E5708 74001E56 3E8306C4 &..>V..t.W.Ò<..&.^_èù.à...ÀX...Z 000040
5E3E83FA 4688C02A 9003E801 80057547 067E8306 7467067E 83FE5689 FC46891E ..F=.V±.-.gt..-.Gu.¯.$..*à.F".>^ 000060
4436FF00 011E6606 C7067500 1E663E83 007400FA 7E800006 1E6606C7 0675001E ..u.ú.f....-*.t..>f..u.ú.f....6D 000080
83008C1E FF261CDA 068EFC76 FFFE76FF 1E6836FF 1E6A36FF 0676FF1E 6636FF1E ..6f..v..6j..6h..v±.v=..Ö.&..... 0000A0
00901EFF 261CDA06 8E1E6836 FF1E6A36 FF147500 1E3C3E83 187400FA 7E800EC4 &..-*.t..><..u..6j..6h...Ö.&.... 0000C0
1EFF261C DA068E1E 6836FF1E 6A36FF14 75001E66 3E831874 001E3C3E 8304C483 .&..><..t..>f..u..6j..6h...Ö.&.. 0000E0
8EFC76FF FE76FF18 741E5C06 081E48A1 00001FCC 06C7081E 58068304 C4830098 ...&...X..ú.ä...ÀH...\.t..v±.v=. 000100
00C890C8 C90129E8 0E50C028 02E80001 880574C0 0804C483 009C1EFF 261CDA06 .Ö.&.....&..&t.¡..$.+âP.Ò).èù.à. 000120
478E2607 FF26378B 2606468A 1478044F FF261E3E 1EC43C75 001E643E 83560000 ..V.>d..u<&.>.&.O.x..F.&.7&..&.G 000140
E81E6406 FF077540 06C4830F AF06749A 0676FF53 1E4036FF 10EBE42A 04882602 .&..*ó$..6a.S.v..t.€..&.au...d.$ 000160
18E8507E F6080676 88577500 1E643E83 56570000 02C890C8 C95E1E62 06FF9005 ....b.^èù.à...WV.>d..uW.v..--P$. 000180
C0084EC6 881E6406 FF047540 06C48310 1706749A 1FCE36FF 1E3E36FF 1E4036FF .6a..6>..6ö..t....&.au...d..6N.à 0001A0
D4EBE42A 05882602 478E2607 FF263F88 261FCEA0 D478044F FF261E3E 1EC41E7E -.&.>.&.O.x&.ö.&.?&..&.G.&..*ó$à 0001C0
001E643E 830A768B 56570000 02C8C8C9 5F5E1E62 06010646 88077500 1E643E83 .>d..u..F...b.^_èùà...WV.v..>d.. 0001E0
```

Dump of file SATURN:[PCCOMMON.DUMP.DLL]DAMERGE.TMP;1 on 18-APR-1990 10:42:05.48
File ID (575,19,0)   End of file block 101 / Allocated 104

Virtual block number 60 (0000003C), 512 (0200) bytes

```
FF047540 06C48310 8906749A 5098078A 26065EC4 1E3E36FF 1E4036FF 22E85E75 u^$".6a..6>.&^.&...P.t....&.au.. 000000
3E1EC407 8A26065E C4CD7804 4FFF261E 3E1EC425 74C0084E C6880646 FF1E6406 .d..F..6N.&t%&.>.&.O.xë&^.&..&.> 000020
1E620601 0A468807 75001E64 3E83CAE8 E42A0588 2602478E 2607FF26 3F88261E .&.7&..&.G.&..*ó$ò.>d..u..F...b. 000040
3688FA46 89FC4689 C028F656 89F44689 1E6A1688 1E68A156 00000CC8 C8C95F5E ^_èùà...VÀh...j..F¶.V-+&.F=.F".6 000060
02EE8305 75101FCC 3E830676 28F028F8 468904C4 830CC22A FE9AF476 FF521E6C l¯R.v¶.±*ó..&..F%+Þ+v..>à..u..Ÿ. 000080
75301FCE 3E831975 203F8026 F45EC422 75001E56 3E834E01 75081FCC 3E8308E8 $..>ä..u.N.>V..u"&^¶&.?-u..>ó.0u 0000A0
3E83077E F6080874 301FCE3E 83F84EFF 02C483FE 71E80E50 98078A26 F446FF12 ..F¶&...P.Òq±.&..N%.>ö.0t..-~..> 0000C0
0070E80E FC46FF07 74001FCC 3E830066 E80EFA46 FF077400 067E8318 74001E56 V..t..-..t..F*.Òf..>ä..t..F=.Òp. 0000E0
830039E8 0E047500 FA7E830A 7400067E 8302C483 FE7EE80E 56297500 1E563E83 .>V..u)V.Ò-±.&..-..t..-*.u..Ò9.. 000100
06C483FE 85E80EF4 76FFF676 FFF876FF 0040E80E 047500FC 7E830A74 001FCC3E >ä..t..-=.u..Òa..v%.v-.v¶.Òç±.&. 000120
88057400 1E483E83 C8C95E02 C483FE38 E80E5600 201FCE06 C70E7400 1E563E83 .>V..t.ú.o. .V.Ò8±.&.^èù.>H..t.¡ 000140
1775101F CC3E830* C483FDC8 E80E306A C802C483 FD02E80E 50002088 03E8002B +.$.¡ .P.Ò0».&.ùjO.Òà».&..>ä..u. 000160
46C75657 000006C: C802C483 FDAAE80E 50007888 03E80058 88057400 1E443E83 .>D..t.¡X.$.¡x.P.Ò`».&.ùà...WVúF 000180
5EC49060 E80A46FF 021E5806 83378826 1E581EC4 12752A3F 80260A5E C40001FE ±..&^.&.7*u.&.X.&.7..X...F.$'.&^ 0001A0
393C3F7C 303CFA46 88078A26 0A5E88F6 280A46FF FFFFFE46 C708752D 3F80260A .&.?-u.úF±...F.+-.^.&...F*<0|?<9 0001C0
98058A26 187F3930 802606E8 F8880030 1FCE06C7 0675303C 0A751E5E 36393B7F .;96^.u.<0u.ú.ö.0..«$.&.=9..&... 0001E0
```

Dump of file SATURN:[PCCOMMON.DUMP.DLL]DAMERGE.TMP;1 on 18-APR-1990 10:42:05.48
File ID (575,19,0)   End of file block 101 / Allocated 104

Virtual block number 61 (0000003D), 512 (0200) bytes

```
FE468B0C 468C0A7E 89DF7D30 30802647 F18B30E9 83C803E1 01CE0302 E1C1CE8B .öèÅ..öIÅ.à.Ö0.þG&.=0)Ô.-..F..F± 000000
8CFC4689 00868857 000004C8 CBC95F5E 0C568B0A 46883789 26065EC4 F088EEF7 ¼Y.Þ6^.&.7.F..V.^ èüà...W¦...F=. 000020
E8FE468C FC7E8900 0188F475 00382611 74003D80 264701E8 FC7EC406 4E8AFE5E ^±.N.6-=Š.G&.=.t.Ẍ8.uf¦...-=.F±Š 000040
83B03330 00AA06C7 1CEB8480 343000AA 06C790C8 C95FC028 FE468CFC 7E899009 ...-=.F±+ã èù.ú.ˆ.04¯.Š.ú.ˆ.03¯. 000060
3C00F01E FF047400 00F23E83 8A803031 00AA06C7 08E88180 313000AA 06C712E8 Š.ú.ˆ.01¯.Š.ú.ˆ.10¯..>·..t...Þ.< 000080
9A5000FD 8812B120 709A00A6 8B0F7327 E29A00AC A3E42A32 3100AA06 C706758C .u.ú.ˆ.12*0È¯..ã's.£Ì..p-Ÿ.¦».P. 0000A0
8BFC0272 3E88C312 CE2E909A 00AC36FF 12C2283C 9A50FFE4 0500ACA1 1289283C <(¿.Å¯..ð.P.<(ö..6¯....ö.ü.>r.=. 0000C0
E6800801 D901FAD1 D801D901 FAD1D8D1 D901FAD1 29747F80 C2F7C033 0254880C ..T.3à¼ö..t)Ì°ÌÌÌÄÌ°ÌÌÌÄÌ°ÌÌÌÄ.Ì 0000E0
FC02723E 88EAEBD0 8AC888C3 F78B0655 89044D89 02458900 0005C738 00C2818F ..ö.ðú....E..N..U..¼ú.à.ÅŠö.>r.= 000100
0374CD0A D301E201 D301E201 D301E201 F88AADDC 8AF08AAD D48AC80A ADC888AD Ú.àÚ.à.ÅÚ.Þ.ÉÚ.½Ìãì£Ìãì£Ìãì£.èt. 000120
D13AE0D1 E001E001 38723800 2D307747 E03D7FF0 25E922EC 8AF90A80 8101CA80 .ð.Ÿ..'.$"ÕXÞ.=ÅGw=-.8r;ÌÅÌÅÌÅ:Ì 000140
7FE78016 74C00817 747F8030 00800508 73000383 01C68010 7401C6F6 15720777 w.r.-ó.t..6..Æ.s....=..t..át..Ó. 000160
8BD233C3 F78B0245 89059CD 33FEDBE9 C3F78B05 89C68AE3 8A024589 E50AC70A .ú.Ì.E..D.6...¼úÖÛ±3à...E..¼ú3®. 000180
F7D8F707 79C008C3 8BD08B0A 8B11EBDA F71579D2 08D833D0 8B1DEBC3 8B0??8DA Ö.Å.úŠ..Å3Ú.®y.¼ÖŠ..Ö.Å.ú.ày.¼Ú¼ 0001A0
F71579C9 08D833C8 8B1DEBC3 8BC88B0A 8BD23304 74E99EB4 8024C48A 000B? ?A Ö.Ú..á$.Ç.Öt.3®.Ö.à.úŠ..à3Ú.èy.¼ 0001C0
E985608D D233FF33 8024C48A 00D883D9 F7D8F707 79C008C3 8BC888DA 8811E? 9 ÌŠ..Ö.à.ú.ày.¼Ú¼Ì.Ú..á$.3.30§'.Ö 0001E0
```

Dump of file SATURN:[PCCOMMON.DUMP.DLL]DAMERGE.TMP;1 on 18-APR-1990 10:42:05.48
File ID (575,19,0)   End of file block 101 / Allocated 104

Virtual block number 62 (0000003E), 512 (0200) bytes

```
9CE8C3C8 D1677500 D283C001 0026E803 EB0035E8 08E8002B E800EB00 3AE807B5 ç.Ö:.Š.Ö+.Š.Ö5.Š.Ö&.Ìá.®.ugÌàúÖ. 000000
E808EB00 2CE800EB 002CE8C3 4E75D208 0039E803 EB005DE8 03EB003E E800EB00 .Š.Ö>.Š.Ö1.Š.Ö9..®uNúÖ,.Š.Ö,.Š.Ö 000020
75000183 C2010001 83000283 F5D8F7D2 F7D1F700 79FF08C9 330041E8 03EB0078 (.Š.ÖA.3è..y.¼Ì¼Ø¼A¼.®..Ì.Ìö.Ì.u 000040
72000283 C3130B13 F581F980 CD0AE822 01B50B33 001CE803 EB0056E8 C3CAD121 ÌÌöúÖV.Š.Ö..3Úç."Ö.è.'.¼.Ú.ú.®.r 000060
E58010CE 80F1220F B6F98B08 EE8391AD 91AD93AD D60A92AD 00A4E9FD E9E9C301 .úÖÖ»ÖÈ.Ú..®Ú.Ú.Ú..Ÿ..'Ñ."þ.ö..Ì 000080
8AD2332F EB25E983 CA7F20F9 83787203 FEE981D8 74C908E9 D1E9D1E9 D1E9017F .ÌöÌÖÌöÌÖ.ètÅ.Ö±.rx.' .ð.ÖX5/3®. 0000A0
804D74C9 08DCD0F9 D100E400 7FE183F9 8BE98A04 EE83C186 ACC88AAD F88AACDA Ö¯.ŸÚ.à¯.è.Ÿ..Ö.'.Å.ÅÖÅÌ'ÅÈ.ètM. 0000C0
DF8AD30A 01E28002 D0F501FA 801A7C08 F98009F7 20E98399 7F20F9B3 47727EE9 Ö-rG.' ...Ö ¼1.'.|..'.¼Å®.ã..Æ.Ö 0000E0
800AD00B D1D8D1EE D0000A80 01B201FA 8015E3E1 EB08E980 F632E68A C48AF88A .¼.6.12-.Ö.ŠÅD..'.ÿ..Ö.ÅŸÌÅÌÚÅÖ. 000100
31E807B0 0068E8FD 35E9C300 88C03300 D18000B1 F9C3C38B D088CA8A F3E20002 ®.ãµ.ð.Å.úü'Ÿ..Ì.3à.ÅúÖ5»Öh.¯.Ö1 000120
E8FD0FE9 C3FE8806 7C89E073 7FF0FA81 7FE680D7 8B10EF83 067C0302 72368801 ..6r..|..ÿ..®.Ì..'Þ.sÅ.|..±úÖ.»Ö 000140
027C890F 737F80FA 817FE680 D78B0080 EF81027C 03027236 8B010BE8 03800087 ..¯.Ö...6r..|..ÿ...®.Ì..'..sÖ.|. 000160
7C010080 EF810272 36880053 E8C3FE8B 067C0110 EF830272 3688001E E8C3FE8B .±úÖ...6r..ÿ..|..±úÖS..6r..ÿ...| 000180
88064C8B 00108A02 723688C0 8EA5A5A5 A5C18ED9 8CC08C02 723E8BFC C3FE8B02 ..±ú=.>r..à.Ì.èÈÈÈÈ.à.6r.□...Ì.. 0001A0
0433E981 E901E901 E901E901 0035887F E580CF88 F0E78306 4C89CA0A 0FE183F9 '.Å..ð.Ì..Öþ.ú.Ì.¦5.ÌÖÌÖÌÖÌÖ.Ö3. 0001C0
8B0080BA 0272368B C08EA5A5 C18ED98C C08C0272 3E88FC00 82E93FE8 D9F7047D ).¼ÌŠ7Ö..=.>r..à.Ì.èÈÈ.à.6r.□... 0001E0
```

Dump of file SATURN:[PCCOMMON.DUMP.DLL]DAMERGE.TMP;1 on 18-APR-1990 10:42:05.48
File ID (575,19,0)   End of file block 101 / Allocated 104

Virtual block number 63 (0000003F), 512 (0200) bytes

```
96E981ED 32CD8AE1 D1001888 7FE580CF 8880E783 024C89CA 0A7FE183 F988024C L..'.Å..ð.L..Ö..ú.Ì.¦..ÌÅ.è2Ú.Ö. 000000
33EA2880 00E581EF 88C8880A 74C83BFA 088000E7 81147CEF 88C83BD9 F7487D00 .)H¼Ì;à.ÿ|..Ö...';àt..à.ÿ.|..+ö3 000020
B0BB0CE3 348AE7EB 4608E980 0004C614 0A000280 00B2F501 FA80147C 08F98002 ®.'.|..'.¼ÿ..®...ö...Ö.FŠÖ.4Ö.E¯ 000040
E207D0EA D106E3E1 8AEF8A00 018BC334 8AD18BC9 33C32C88 E822EE8A 07C18A00 ..èa.Ÿ"Ö.,ú3è.Ì.4úE...ÿ.ÅD.ÌöÅaã 000060
CE28C803 9802720E 88E2D3CC 8AFD8802 74000A80 01B2B1FA 80030ADE 22070AFA '.a"8.Æ.'.ÿ..Ö.t..».ãÆã..r...à+ö 000080
C3E4007F CC80F8C8 E9C3F503 014C747F 80C3F7C3 FAE20014 804606E3 3488F202 .·.4D.F...ã'ÚÅú..tLÌÆ¼úÖà«.ã.ÅÖú 0000A0
8AD87403 F77F80C3 F7D3F7E2 740DF77F 80A9D0F7 E1747F80 A9025D88 26024488 .D.&.].ˆ..tÅ¼Å`..¼ÅtãŸÅ¼ú..¼ÆtÅ. 0000C0
C3053826 04880575 C338DA8E C18ED98C C28CF787 930873E0 D1E301D5 78EF32EC $2yx¦ÌDÌÅs...¼.ô.).è.Ö;úu...&;.û 0000E0
F7E1747F F0A9065D 88260644 88C3E400 7FCC80FB 75E9C3F5 D3015E74 7FF0C3F7 ¼úÞ.t^ÌÆ¼úÖu«.ã.ÅÖú.D.&.].`Þ.tÅ¼ 000100
87930873 E001E301 D578EF32 EC8AD874 D3F77FF0 C3F7D3F7 E2740DF7 7FF0A9D0 Å`Þ.¼ÅtãŸÆ¼úÞ.¼ÆtÅ.$2yx¦ÌDÌÅs... 000120
88057502 45382602 44880E75 04453826 04448817 75C338DA 8EC18ED9 8CC28CF7 ¼.ô.).è.Ö;úu..D.&;E.u..D.&;E.u.. 000140
88024C88 80CF8000 B2358A01 50880245 8803E880 F4800245 88F787C3 05382604 .&;.ú.¼.E..¶.Š..E..]..Šÿ..ü..L.. 000160
87F38705 73EC3A58 74E40A65 74ED0AC0 D1C10180 00CE81FF 00E78101 748BFF7C |..t..Ö...ö..Ìèlà.Úte.Öt[:ŠS..µ. 000180
74D20812 7C0EF980 55E300B5 CD8A91D9 D0E8D0C9 D0497718 FC800CF6 E52A91FA '.ª|-É.=.wlÅèÅÖÅ)..èç.DU.'.|..®t 0001A0
8AF38AD6 8A01CE80 0374D20A 287E05F9 803E741D 7210E980 DB330388 01C88003 ..ù..Æ3Ú.Ö.r.t>.'.-+.®t..ö..®.µ. 0001C0
F60097E9 E800C188 D788DE88 19E8F875 C1FED301 E2D12374 177708E9 80FD8ADF Ö.».Ö.w.t#ìãìÆ±èu½Š..8.=.èÅÖÖ..- 0001E0
```

```
Dump of file SATURN:[PCCOMMON.DUMP.DLL]DAMERGE.TMP;1 on 18-APR-1990 10:42:05.48
File ID (575,19,0)   End of file block 101 / Allocated 104

Virtual block number 64 (00000040), 512 (0200) bytes

 D150730E 13070314 70E00020 CA800374 3FC2F6FA E20AD1EB D120CA80 03743FC2 ô?t..ò 1Š1Öã*-ô?t..ò ÅÅp..■.ßsP1 000000
 F6000383 F50AF7D3 F70A730E 8B078BF3 1BFA2BFA 41E94575 FFFC80C4 FEDAD1DB Ü1Ö±á.■.uEÕA*•*.µ.■.ßs.%Æ%Ö%.Æ.- 000020
 32F28ADE 8AF8BA58 7608EC80 0F75FF0A 64740808 DA876A76 10EC8008 75D80800 Å.Üu..ß.vj.Ö.Ütd..u..ß.v[.«.8..2 000040
 14720777 80FA8U01 7CE90374 0000883E 80F671D3 D1E2014B 74CCFE0A 78FF0AD2 ■..x.±ätKlãlÆq-.>¡..t.Ö|..*.w.r. 000060
 80802417 747F80A9 D8D1E000 3A74FFFC 80C4FE07 73000383 01C6800F 7401C6F6 -ô.t..ô..Æ.s.±á.=.t:ÅÅ1Å..t.$.. 000080
 C033017E E9037400 00883E80 C3F78805 89C68AE3 8A024589 02723E88 C70A7FE7 Ô..ú.>r..E..D.ó...%ú.>¡..t.Õ-.3á 0000A0
 4D880674 E40AD800 E0019634 8BADFCF9 9DE9E679 C3F78805 89024589 02723E88 .>r..E....%úy|Ô.*•ú.4.|ÅÅÅ.ôt■.M 0000C0
 74FFFC80 80C48003 70E5027F ED8080EC 80C13208 8B3088C8 74ED0A09 D0E1D102 .1ÅÅ1.Ütú.=.Å2è.ß..Ú..1pÆ.á..=.t 0000E0
 D2830803 E7F7C588 509FC00B DA8BE7F7 C688E888 80C98080 C880EF8A FF3250CD èP2..ÿ.ù..è..Š.6%Ö.Ö.à.P.é%Ö.Å.■ 000100
 0878FF0A 58930388 C703E1F6 C58801C8 8003749E 58FA13D8 03E6F7C1 88FA8800 ..*.è%1.Ä.*X.t..ù..é-Ä.ú.Æ.X..x. 000120
 44880900 E1D1024D 8BF787FF 1AE9AD74 FFFC80C4 FEFF69E9 0A75E40A D3D1E201 1ã1Æ.ôu.Öi.±á.=.tÚÖ...%.M.1ÅÅ1.D 000140
 8080C480 FF7BE903 71E52A7F ED8081EC 80C13208 74E40A5C 74ED0AD8 D0E00102 .1ÅÅÅ.Üt\.ôtÜ2è.ß..Ú.*lq.Ô(..á.. 000160
 00883E02 D901E801 08740000 883E8080 CF80C932 2D8A015D 88FF78E9 0375FFFC =.u.Õx..]..-2è.ü..>¡..t.1Š11.>¡. 000180
 01CA8003 74D688C2 080011E8 EE88001A E8D8D1EA D180CE80 C032248A 01548850 P.T..$2á.ö.1ò1ÅÖ...ŸÖ...ô.øt..ò. 0001A0
 730788FA 1808F7E1 F7C688FA 8815E3C0 3396F3F7 1D73D33B F880E9FF 76E900B8 .1Öv.Õ¯½;Æs.¥µ.3áD..*.6%Å%Å.*.■s 0001C0
 E00A008A 2E8A0000 8806C6C3 ED73C18B D003C12B FFFFBEC3 F973D313 C1034E07 .N.è.Æs*úf..•ê.Å.êsÜÜó.¡....o..Ú 0001E0

Dump of file SATURN:[PCCOMMON.DUMP.DLL]DAMERGE.TMP;1 on 18-APR-1990 10:42:05.48
File ID (575,19,0)   End of file block 101 / Allocated 104

Virtual block number 65 (00000041), 512 (0200) bytes

 4EE8DB32 D2335253 5000B802 7206C702 7236FF38 74E40A3C 77EC3A0E ED800774 t..Ú.:ßw<.ôt8.6r.ú.r.€.PSR3■2ÜÖN 000000
 D833C033 FE33E902 72068F58 5B5AFE0F EBFF3252 5350008F 027206C7 585B5AFE ±Z[Xú.r.€.PSR2.Ò.±Z[X..r.Ö3±3á3Ü 000020
 87D3EB00 B0A300BB A3C033FE 1AE85253 50008F02 7206C702 7236FF00 B8A2D233 3■Å¡..6r.ú.r.€.PSRÒ.±3áEE.E§.SÆ. 000040
 723688AB E60A80E6 807FE480 ADA5A5A5 02723E88 F7881DEB 8000F581 06608BF7 ¥.m..¥..$..¥.>r.EEEÜ.ô..|..|¨.6r 000060
 870977E8 3BE0E583 D274FFE0 25DAD0E0 D1DED0E5 D106448B FC066088 C3FE8802 ..±Ü.m.=.D.11Å81ÅÅÖXÅ.t■.1Å;Ôw.. 000080
 C001C001 C0015700 D1E20000 D1E60089 7706A030 D8F7C528 C274C008 D68695F7 ¥..■.âtò+é¼Å=..w¿Å111Åã1ïw1ã1ã1ã 0000A0
 D20B187C 0EFF8363 74FF0B10 CC800FE4 80AD93AD 91AD92C0 32E08AAC F888E086 .Å.½ˆ.Å2à.Ü.Ü.Ü.ô..ä...tc...|..■ 0000C0
 800374D2 0A287C06 FF832372 4874E777 10EF83C0 330888C8 88D18801 C^800374 t..è..1.ù.A3á.ÿ.wÔtHr#...|•.■t.. 0000E0
 D1D3D101 D1E20123 740F7708 EF83E432 C48AF88A DF8AE88A CD8AF18A D68¨11CE ö..■.þ.e.$.Ô.½.620.ÿ.w.t#1ã111Æ1 000100
 C2F6975E CF87F6E2 DAD1DFD1 D8D1E8D1 20CA8003 743FC2F6 CF8716EB F575..7D0 ÅGu%$..ú-ô?t..ò 1Ö1Ü1Ö1Öã-.ú^.-ô 000120
 0FFFE681 05748850 9F50035C 13014C13 34020800 E5D13870 E5D120CA 8003743F ?t..ò 11p;i1ÅÅ.4.L..\.P.P.t..|.. 000140
 E90375E0 F08320C5 830AD1D9 D1D8D1DF D1137420 00C7F7FE 13589E58 1000CE81 .ö..X.X.±¼ú. t.1Ö1Ü11iÖ.é .»Åu.Ô 000160
 9E1000CE 810FFFE6 819F0574 88035C1B 014C1834 2AD0F6D8 D0E5D100 88E9F6EC ß-Ö..11ÅÅ-Å*4.L..\..t...|...ö... 000180
 F61875FF 0800048E FCFE130E 13CE13F5 DAF7D1F7 D3F7D7F7 D0F6F633 1373FE1B .±s.3--Å¥■¼Æ¥1¥Ö%.ö.8.±•/....u.- 0001A0
 00ED8118 751FE0C7 F7E4E8D2 33CA88D9 88F8883D 744E4076 0200ED81 1375E0C7 úÅu..Ú..v@Nt=.«.1.ò3■ŠÖ¼úÅ.u..Ú. 0001C0
 717420ED 83127510 00C7F797 0082F28A CE8AE98A DD8AF88A C78AE08A 97277601 .v'..Å.ú.«.1.Ô.ö.·ý..¥ú..u..Ú tq 0001E0

Dump of file SATURN:[PCCOMMON.DUMP.DLL]DAMERGE.TMP;1 on 18-APR-1990 10:42:05.48
File ID (575,19,0)   End of file block 101 / Allocated 104

Virtual block number 66 (00000042), 512 (0200) bytes

 F61F7207 7780FA80 0385E903 74000000 3E80FC90 65EBEBEB D7D1D301 D1D1E201 1ã111Æi■$$$e.■.>Å..t.Ö...*.w.r.- 000000
 F7883074 E0FD8320 C5830874 2000C7F7 00078300 03830001 8301C680 1A7401C6 ó.t..ó..1..Æ..■.%ú. t..é .»Åt0.% 000020
 AAC68A05 50880645 89C70AC5 08C032E0 862274ED D10FE780 8024DE87 02723E88 .>r..B$..Ó.1Üt".Å2à.é.ú.E..]..ó¨ 000040
 3E88C033 0377E903 74000000 3E80FCF5 FDE90379 C3F78805 EF83A8C6 88A8C188 .ê¨.ó¨.y..%úy.Ô»%■.>Å..t.Ôw.3á.> 000060
 747FF0E1 81D13306 4D880874 7FF025D0 88064488 FCC3FE88 ABABABAB F7880272 r..%  .±ú•.D..Å%þ.tÜ.M.31.Åþ.t 000080
 0181E850 D8D1E600 8674FFE0 30800005 8C70C103 7FE0E981 80002DE1 D1E0D1D0 Å1Å1Å-...ÔÅ..êp¥...=Å.tÑÅ11ÅPÔ.. 0000A0
 C58393E8 0A75ED08 D7D1D301 D1D1E201 0E751000 C7F7D800 E5D15001 CA800374 t..ò.)11ÅÅ¼ú..u.1ã111Æ1■.Üu.Š..é 0000C0
 25D03306 448BEF74 7FF0E181 D1880640 8BFCF787 F58CE9FF 24E98874 E0FD8320 .»Åt.Ô$.Ô.%.¼=.M..1.Åþ.ty.D.3Å% 0000E0
 500801E6 D09B74FF E0308000 059B70C1 287FE0E9 8180202D E1D1E001 98747FF0 þ.t.1Å1Å ..ÔÅ.•êp....=Å.t.Å11ÅP 000100
 800FE480 ADFD00CE 8F05C683 F7885092 10CC800F E480AD92 AD93ADC9 32E88AAC ¯.Ô2èÜ.Ü.Ü.Ô..ë..P.%.ó.€ö.»Ü.Ô.. 000120
 2602E801 E888ADF7 8800CE8F FD1F7400 00003E80 0005C6FC A44746A5 A5AB10CC ä.¨EEFGE•ó...>Å..t.»€ö..%Ü.ÔiÔ.& 000140
 E857003F E8D9D1D8 D1D8D1EA D158FCAB D8D1ADA8 D8D1ADA8 D8D1ADED D1A80000 Å.¨1UU1Å Ü1Å Ü1Å =X1ó1Å1Ü11Ö?.WÖ 000160
 80037407 C2F601CA 8003745F 5B590788 C208C108 C3080033 E8570037 E857003B ;.WÔ7.WÔ3..ú.ê.ó.■Y[ t..ò.-ô.t.. 000180
 CE3688FF 08E90AD1 D9D1D8D1 EFD10AD1 D9D1D8D1 EFD10AD1 D9D1D801 EFD108CA ò.1ÿiÜ11iÖiÿiÜ11iÖiÿÏÜ111ÖÖ...6ö 0001A0
 E7F70474 C00800C8 A1F588ED 339752F6 F73877F0 38047502 085C7306 38FF3300 .3.;■s\.■u.;þw;¥-R.3Ü.%Åà..ât.¥ó 0001C0
 5A920002 83E803E7 F70874C0 0800CCA1 EA13F003 E7F70674 C00800CA A150F288 .·PÅò..ât.¥Ô.þ.ôÅà..ât.¥Ô.Ô.■..Z 0001E0
```

Dump of file SATURN:[PCCOMMON.DUMP.DLL]DAMERGE.TMP;1 on 18-APR-1990 10:42:05.48
File ID (575,19,0)   End of file block 101 / Allocated 104

Virtual block number 67 (00000043), 512 (0200) bytes

```
00CE1613 00CC0613 00CA1E13 00C80E03 4F137393 919295E8 185DDD18 CE1BDAF7 %Ö.ö.ì].Ò....s.O..à...ò...ë...ö. 000000
EBF500C8 168BC213 00CC1E13 00CA0E03 00CC0618 00CA1E18 00C80E28 4FC3ED73 sÚÜO+.à...ò...a...ò...a..ó..à.%S 000020
911AE30C 8BE888D8 3300C6A3 100C0F24 06458A00 C4A3100C 0F24E432 06448AC9 è.D.20$...Eà..E.$...Eó.3Ú.$..D.. 000040
0802448B ED3355DA 13C803E2 F70674D2 0802558B 048BCA8B E8BE1F7 08E30088 ..D.%Ã.Ò.ò...U..@t.%ã.à.ÐU3Ú.D.. 000060
0802558B 0074C008 02448B50 C10B5805 D1DA13C8 03E2F708 74D20815 8B0E74C0 àt....@t.%ã.à.ÒïïX.èP.D..àt..U.. 000080
D1D1EA13 0B03E2F7 0874D208 04558B0F 74C00804 8BC933EA 130B03E2 F70674D2 @t.%ã.Ã.ò3è...àt..U..@t.%ã.Ã.òïï 0000A0
0874C008 048B50C3 08580001 83EA1308 03E2F709 74D20815 8B0F74C0 08044488 .D..àt....@t.%ã.Ã.ò.ï.X.ùP...àt. 0000C0
8B0F74C0 08024488 DB33CA13 E80300C4 26F70874 C008058B CA13E803 00C626F7 %&ó..ò.ò...àt.%&á..ò.ò3Ú.D..àt.. 0000E0
E803E2F7 09740208 02558B10 74C00804 44880301 CA13E803 E2F70874 D2080455 U..@t.%ã.Ò.òï£.D..àt..U..@t.%ã.Ò 000100
26F70874 C0080244 8BDA13C8 0300C426 F70874C0 08024588 ED335500 D383CA13 .ò.£.U3Ú.E...àt.%&á..à.Ò.D..àt.%& 000120
F7044488 D5D1DA13 C803E2F7 0874D208 04558B1A 74C00804 448BDA13 C80300C6 ó..à.Ò.D..àt..U..@t.%ã.à.Òïï.D.% 000140
97C50300 C626F600 C4A0EA13 DB0300C4 26F70874 C0080445 8BEA13D8 0300C626 &ó..Ã.ò.E...àt.%&á..Ã.ò.á.-&ó..è. 000160
D006C6C3 F60B5E07 D1D3D1D1 D1E2D107 D1D3D1D1 D1E2D1D7 D1D3D1D1 D1E2D15A Zïàïïï£ïøïàïïï£ïøïàïïï£ïø^.-ùó.Ã 000180
00030272 06C70272 36FF4C74 ED0B5077 F53B04C0 EE810874 F60B0001 36880000 ...6ï..-t..Yà.;%wP.ÜtL.6r.ú.r.£. 0001A0
55535251 50000B02 7206C758 595A5B50 5FFC3EE8 D233C933 DB335755 53525150 PQRSUV3Ú3è3Ð>=_][ZYXú.r.Ú.PQRSU 0001C0
A2FF33ED 330B33D2 33C933C0 33FC1AE9 0272068F 58595A5B 5D5FFBD1 E8FF3357 W3.Òï«_][ZYX..r.Ò.=3à3è3ð3Ú3Ú3.Ã 0001E0
```

Dump of file SATURN:[PCCOMMON.DUMP.DLL]DAMERGE.TMP;1 on 18-APR-1990 10:42:05.48
File ID (575,19,0)   End of file block 101 / Allocated 104

Virtual block number 68 (00000044), 512 (0200) bytes

```
C6EBABA8 ABA8C033 000[illegible]BFF8 F8E85755 53525150 00080272 06C70272 36FF0000 Ã..6r.ú.r.Ù.PQRSUWÖ%«€£.3ó [illegible] $6 000000
0598078A 26065E88 0C740106 9387F608 8898078A 26065EC4 565704EC 83E[illegible]8855 U.$.$.WVá^.&....Ã-....t..^.&.... 000020
F2750406 9387F608 8898058A 2647F888 16740065 3098078A 26065E88 07EB [illegible]20 .Š..^.&...=e.t..«G&....Ã-....u· 000040
8BF88898 078A2606 5E882E07 C6260646 FFF08898 078A2606 5EC40846 8C067[illegible]39 .-..F.á^.&....Þ.F.&ó...^.&....%. 000060
7EC45657 06EC83EC 8855CB5D E5885F5E FC7E89E9 75C00A06 46FFF788 078826C6 ó&...%.F..àuÖ.~•^_.[]ùW.$.$.WVá- 000080
003F8026 0646FFDF 8808468C 067E89F3 75003D80 26470774 2E308026 9008E806 .Š..&.*.t.G&.=.uµ.~..F..Ö.F.&.?. 0000A0
468C067E 89ED7500 30802647 07744530 80260074 65308026 900EE806 7E886774 tg.-.Š..&.=et.&.*Et.G&.=.uÚ.~..F 0000C0
468C067E 89F97430 3080264F 9002E806 7E88FE56 89FC4689 064EFFC2 8CC78808 ..ù.ô.N..F•.V±.-.Š..O&.=0t•.-..F 0000E0
F275C00A 078826AC 065EC406 46FFFC76 C5FA5E8C 064EFF03 752E3F80 260F8808 ..Ö&.?.u..N..^•èv=.F.á^.¯&...àu· 000100
9A065EC4 21420114 9A1CDC1E 8DEC8855 90CB50E5 885F5EFA 5E8EFE5E 8CFC7689 .v•.^±.^•^_.[]ù.U.$..É....Blá^.. 000120
00067E83 565708EC 83EC8855 C850C02B C8500001 88057221 6B05949A 214700F4 ¶.GI...klr.|..]ù+à]ùW.$.$.WV.-.. 000140
5E1FA5A5 A5A5DA8E 1EF088FB 88085EC4 04C48321 8F28169A 0C76FF0E 76FF2474 t$.v..v...+.l.á.á^..«.Þ..ÖEEEE.^ 000160
A5A5DA8E 1E0716F0 88F87E8D 04C48321 A928169A 0C76FF0E 76FF90C8 5DE5885F .|]ù..v..v...+`l.á..-%.Þ....ÖEE 000180
0AEC83EC 885590CB 5DE5885F 5E222502 679A085E C4218101 149AF85E 801FA5A5 ÉE..^%...Yïá^..g.X"^_.[]ù.U.$.$. 0001A0
88057520 3F8326F8 5EC4FA56 89F84689 1FD21688 1FD0A147 740000EA 3E805657 WV.>ö..tGÀÀ...@..F%.V•á^Y&.?·u.| 0001C0
C0289003 E80001B8 067E000E 7E83FE56 89FC4689 0C5688OA 4603C028 02E80001 ..Š.+á.F..V..F•.V±.-..-.|..Š..+à 0001E0
```

Dump of file SATURN:[PCCOMMON.DUMP.DLL]DAMERGE.TMP;1 on 18-APR-1990 10:42:05.48
File ID (575,19,0)   End of file block 101 / Allocated 104

Virtual block number 69 (00000045), 512 (0200) bytes

```
260277FF 260477FF 260677FF 26065EC4 58EB06C4 83045DE8 0EFC76FF FE76FF50 P.v±.v•.Ò]..á.$Xá^.&.w.\.w.&.w.& 000000
00018805 7E000E7E 8350400E 46885052 FA5689F8 468908C4 8322632D 8A9A37FF .7..·c".á..F%.V•RP.F.@P. ..~.|.. 000020
50520C56 880A4603 C703C028 02E80001 88057520 3F8326F8 88F85EC4 C02802E8 $.+àá^%.Y&.?·u.|..$.+à.ú....V.RP 000040
FC5EC40A 75203F83 26F85EC4 FE5689FC 46890C56 880A4688 0AC48322 802B6C9A .l+§".á..F..V..F•.V±á^Y&.?·u.á^• 000060
07C626FC 5E88FC46 FF078826 01478A26 FC5EC414 7E000E7E 832007C6 26FC46FF .F•&ó.-.-..-.á^•&.G.&...F•.^•&ó. 000080
8323F72A C89A5052 FE568BFC 46030E46 0308F7C0 180100EA 3E80501E 00E48B2E .|ô..P.>ô...à%Ã.F..F•.V±RP.à•%#. 0000A0
26065FC4 26F85EC4 FC46FF45 07C626FC 5EC40774 00107E83 FE5689FC 468908C4 à..F•.V±.-..t.á^•&ó.E.F=á^Y&ó_.& 0000C0
46FF2007 C626FC5E C4F088D8 F70B7DF6 08F08848 02478826 F85EC45E 74303F80 .?0t^á^Y&.G.H.Þ.-).%Ã.Þá^=&ó.-.F 0000E0
FE83FC46 FFF288F9 F799C688 070026FC 5EC4F9F7 00648999 C688157C 64FE83FC •.±d|..ó.¿d.%•á^•&...ó.%•.·.F•.± 000100
C688FC5E C4FC46FF F288F9F7 99C68807 0026FC5E C4F9F700 0A8999C6 88157C0A .|..ô.¿..%•á^=&...ó.%•.·.F•á^=.ó 000120
76FF1076 FF0100EA 06C604EC 83EC8855 90C850E5 885F5E0C 56880A46 88070026 &...F..V.^_.[]ù.U.$.$.ó.ô...v..v 000140
C85DE588 0000EA06 C6FE5689 FC4689FE 49E80E06 76FF0876 FF0A76FF 0C76FF0E ..v..v..v.¯v..Òl±.F•.V±ó.ô...[]ù 000160
5EC4F656 89F44689 1FD21688 1FD0A151 740000EA 3E8000F2 46C612EC 83EC8855 U.$.$.óF·..>ô..tQÀÀ...@..F¶.V-á^ 000180
0E463900 ECA1FE56 89FC4689 0C56880A 4603C028 02E80001 88057520 3F8326F4 ¶&.?-u.|..$.+à.F..V..F•.V±Ã$.9F. 0001A0
0007C626 EE5E8830 07C626EE 46FFEE5E C4F05689 EE468900 EC0603FC 46886A75 uj.F•..$..FY.VÞá^Y.FY&ó.0.^Y&ó.. 0001C0
89F44689 08C48324 27208A9A 37FF2602 77FF2604 77FF2606 77FF2606 5EC44AEB $Já^.&.w.&.w.&.w.&.7..-'$.á..F¶. 0001E0
```

```
Dump of file SATURN:[PCCOMMON.DUMP.DLL]DAMERGE.TMP;1 on 18-APR-1990 10:42:05.48
File ID (575,19,0)   End of file block 101 / Allocated 104

Virtual block number 70 (00000046), 512 (0200) bytes

 880A4603 C02802E8 00018805 75203F83 26500E46 03024788 26F45EC4 5052F656 V-RPá^¶&.G..F.P&.?-u.|..$.+á.F.. 000000
 75203F83 26F45EC4 FE5689FC 46890C56 880A4688 0AC48312 D7286C9A 50520C56 V.RP.l+■..á..F..V..F■.V±á^¶&.?-u 000020
 0EFC76FF FE76FF50 0001881D 7F00027F 8326F45E C42D07C6 26FC46FF FC5EC40A .á^■.F■&ó.-á^¶&......|..P.v±.v■. 000040
 000E7E83 FC460102 478826F4 5EC40AE8 3007C626 FC46FFFC 5EC406C4 830205E8 Ò...á.á^■.F■&ó.0$.á^¶&.G..F■.~.. 000060
 F45EC42E 07C626FC 46FFFC5E C406C483 01D8E80E FC76FFFE 76FF5000 0188687E ~h|..P.v±.v■.ÒÄ..á.á^■.F■&ó..á^¶ 000080
 7E0E463B D8F70247 88260EE8 D8F70247 88260874 0000EA3E 80437D00 027F8326 &....)C.>ô..t.&.G.%Å$.&.G.%Å;F.- 0000A0
 FFFE76FF 50003088 0E76FF06 C4830196 E80EFC76 FFFE76FF 500E4689 0E468803 ..F..F.P.v±.v■.Ò...á..v.|0.P.v±. 0000C0
 FF0100EA 06C604EC 83EC8855 C850E588 0C5688 0A 468808C4 83253E2D 289AFC76 v■.(->%.á..F..V..[]ùU.&.&.6.õ... 0000E0
 5DE58800 00EA06C6 FE5689FC 4689FE6E E80E0676 FF0876FF 0A76FF0C 76FF0E76 v..v..v..v..v..Òn±.F■.V±6.õ...[] 000100
 257A208A 9A37FF26 0277FF26 0477FF26 0677FF26 065EC456 06EC83EC 885590C8 ù.U.&.&.Vá^.&.w.&.w.&.w.&.7..-z% 000120
 E80001B8 0675203F 832600EC A3480247 88261FD0 1EC41F02 16891FD0 A308C483 .á.ÈÅ...●.á.Å.&.G.HÈ&.&.?-u.|..$ 000140
 C40AC483 267A286C 9A50520E 76FF5306 FE5689FC 46890C56 880A4603 C0289003 ..+á.F..V..F■.V±.S.v.RP.l+z&.á.á 000160
 077CFCFE 8300EC36 8900EEA2 C02A02E8 0180047D 00EC3639 4E027788 261FD01E .Å.&.w.N96&.).¯.$.^áÅY..6á..±■|. 000180
 0CC483FD 93E80E06 76FF0876 FF0A76FF 0C76FF0E 76FF1076 FF1F7F0E 4639C688 .69F....v..v..v..v..v..v..Ò.».á. 0001A0
 FE5E8CFC 7689F975 00FF7C80 46FC76C5 FA5E8C1E 740000EE 3E8090C8 5DE58B5E ^.[]ù..>Ÿ..t..^ªév■F.|..uª.v■.^± 0001C0
 C483FEF6 E80E0676 FF0876FF 0A76FF0C 76FF0E76 FF00FE47 C626FC5E C4FA5E8E .^ªá^■&6G±..v..v..v..v..v..Ò-±.á 0001E0
```

```
Dump of file SATURN:[PCCOMMON.DUMP.DLL]DAMERGE.TMP;1 on 18-APR-1990 10:42:05.48
File ID (575,19,0)   End of file block 101 / Allocated 104

Virtual block number 71 (00000047), 512 (0200) bytes

 76FF0C76 FF1076FF 1276FF19 75450E7E 83067465 0E7E83EC 8855CB50 E5885E0A .^.[]ùU.&.-.et..-.Eu..v..v..v..v 000000
 0876FF0A 76FF0C76 FF1076FF 1875660E 7E839035 EBF88FE8 0E0676FF 0876FF0A ..v..v..Ò.«$5..-.fu..v..v..v..v. 000020
 E80E0676 FF0876FF 0A76FF0C 76FF1076 FF1276FF C8500AC4 83F039E8 0E0676FF .v..Ò9».á.]ù.v..v..v..v..v..v..Ò 000040
 4004C483 26952AFE 9A0676FF 0876FF29 74000A7E 83EC8855 90C8500C C483FEC0 â±.á.]ù.U.&.-..t).v..v..±*.&.á.a 000060
 D88CC888 C8500AC4 83213A2C 5E9A5052 08568806 46030A46 880676FF 0876FF50 P.v..v..F..F..V.RP.^,:|.á.]ù.à.Ä 000080
 F800F216 8900F00E 8908E801 02027206 C7087412 7703F883 D88E1EEC 88554590 .EU.&..Å.«.w.t.ù.r...$...Þ...·.½ 0000A0
 8EC18ED9 8CC08C00 F48FF388 CBF3F60C 8301022D 0272A1C8 4D501FE5 8802ED83 .Ù..[.]MùÅr.-..°.-µù.µ¢¶..á.\.é. 0000C0
 F48ED98E A5A5A5A5 FC088EC1 8E098CC0 8C00F48F F388C300 F48ED98E A5A5FC08 Å•ÈÈ.\/¶.ù.µ¢¶..á.\.é.Å•ÈÈÈÈ.\/¶ 0000E0
 8925747F 80C2F702 54880C88 C033FCFC 758803E8 07FE45C6 FC7089FC 7588C300 .ù.u■.)•6E±.$..u••3á...T.%ô..t%. 000100
 3800C281 8FE68004 40890245 89080109 01FAD108 D1D901FA D1D8D109 D1FAD105 .1ª1\1Å1ª1\1Å1ª1\1Å.E..M..Ì..ô.8 000120
 E0865800 00FFFF9A 5016C488 50EC8855 C3064589 04458902 45890589 C3065589 .U.ù...E..E..E.ùU.$P.á.P.....X.Å 000140
 E5880001 8824E52E EA9A0684 E80021E8 0000FFFF 9A027468 1E027668 1E198EA3 È/..hv..ht......Òl.Ò...õ.[$¡...[ 000160
 FF890276 068EFF33 0000881E 027C16FF 00FF6827 86283C9A 277927E2 9A50C850 ]ùP.ã'y'.<(.'h....|..£ .3...v.¿. 000180
 74AEF2C0 330874CA 88A6F3C8 88018806 808E3174 003D8026 47017500 3080267F .&.=.u.G&.=.t1/...|.ùµ| òt.3á·ùt 0001A0
 1FEDEBAA C20A0572 412CAC92 04E0C00E 72412CAC 19C58F1F F788071E 061CE8E7 Ò$.....%.¢é.¯,Ar.àÅ..¯,A:..ô¯$Ù. 0001C0
 283C9A50 00FF8806 8E1EFF04 74000690 3E832788 283C9A50 00FC888C 885500C3 ù.U.&|•.P.<(.'.>...t.....|..P.<( 0001E0
```

```
Dump of file SATURN:[PCCOMMON.DUMP.DLL]DAMERGE.TMP;1 on 18-APR-1990 10:42:05.48
File ID (575,19,0)   End of file block 101 / Allocated 104

Virtual block number 72 (00000048), 512 (0200) bytes

 38AD1CEC 8E065688 C08ED88E 070F8857 56EC8855 FF76E900 0288CB50 E58827EC &'.[]ù|..Òv.U.&VW|...Á.á.V./&.Ù; 000000
 57EC8855 0002CA5D E5885E5F 96E8E8F7 88AEF2FF FF89C033 970C7496 401074C2 òt.ã.t..3á¿..·Ù.%$$._^.[]ò..U.&W 000020
 53000288 C4885049 D1F7AEF2 FFFF89C0 33FA8892 1F74C008 2800280C 9A0676FF .v...(.(.át...ª3á¿..¯Ù4\1P.áE..S 000040
 07C02D04 46881806 06FF0000 04C80002 CA5DE588 5F580000 FFFF9A50 1651521E .RQ.P.....[_.[]ò..à......●..F.-á. 000060
 83284630 9F9A0200 68FE5E8C FC468913 8405E001 C103E001 C888F9F7 000CB999 .¿..%ª.àIÅ.ÈIÅ.Ç..F■.^±h....0F(. 000080
 E8020002 47C726FC 5EC4080A 4F802611 74000808 57892606 47892604 5EC402C4 á.á^.&.G.&.W..Åt.&.O..á^•&ùG...$ 0000A0
 0247C726 FC5EC408 57892606 47892640 FE5688FC 4688040A 4F802604 5EC49021 |.á^.&.O...F■.V±ã&.G.&.W.á^•&ùG. 0000C0
 88EC8855 C3C90000 0447C726 02578926 07892608 57882606 47882604 5EC40001 ..á^.&.G.&.W.&..&.W.&ùG...èùU.&. 0000E0
 FF0876FF 0A76FF53 CC8804EC 83073AE9 072EE9C0 3300098A 087219C3 1E38065E ^.;.ù.r.¤..3áÒ..Ò:..&..äS.v..v.. 000100
 0CEC83EC 885500C8 50E588FD 19C5A780 91E175C0 855A5900 00FFFF9A 51160C76 v..Q.....YZ.áuÅ..Ìé.».[]ù.U.&.&. 000120
 51414151 51C93353 12742019 C587F606 EDE9C033 00098A08 7219C31E 38065E88 .^.;.ù.r.¤..3áÒÙ.-.é. t.S3èQQAAQ 000140
 89FE4689 C0330856 C50A468E FA5E8C66 748019C5 87F60000 29259A50 16F44680 .F¶.P.%)..-.é..tf.^ª.F.éV.3á.F±. 000160
 2800808A DC8802EC 833875AE F20A8049 E30C4E88 F86689F2 88FA8856 57FCFC46 F••VV.ª.·.f%.N.DI¯.·Ùu;.&..Éo..+ 000180
 F8380080 009AE900 28E8F4E2 AA1A74F8 3800740A 3CAC0C4E 880716FA 88D488E2 ã.á.ª...N.¯<.t.;«t.¯ã¶Ò+.Ò..¯.;« 0001A0
 9AFFFC88 7AE80093 E9FA5E8E 5F5EE1E8 0014E8E2 E8FC46FF 0A80AA00 1FE80375 u.Ò..¯¯..F■$ãÒ..$Å^_.^ªÒ..$z|■.. 0001C0
 0028669A 5016F446 8051521E 53065E88 1FE3CA28 CF881F06 1E515350 28902D06 ●-.(PSQ....u+òD..^.$.RQ.F¶.P.f(. 0001E0
```

```
Dump of file SATURN:[PCCOMMON.DUMP.DLL]DAMERGE.TMP;1 on 18-APR-1990 10:42:05.48
File ID (575,19,0)   End of file block 101 / Allocated 104

Virtual block number 73 (00000049), 512 (0200) bytes

6D3D1874 C00808C4 831FC3FA 88585859 1F0774D8 08FE5E01 F45E8811 75C00800 ..àu..^¶.^±.Ut..Y(X.ªù..ó..åt.=m 000000
0E744019 C587F6FE 5E8E26E8 F900208A 03E8001C 8A087500 098A0001 3D007400 .t.=..¤..u.¤..$.¤ .ª$&.^±-.é.ât. 000020
5EF8668B FC4628F3 468806EB F9C03300 1CBA0EEB F803751A 3F80085E 880A5E8E .^..^..?.u.½$.¤..3àª$..F±+F•.f½^ 000040
51521E53 0856C51E EEE8C188 0475C908 0C4E8805 D1E9C85D E5880472 FA5E8E5F _.^ªr..[]ùÕi..N..èu..é$Y.éV.S.RQ 000060
1CBACC75 00098A00 01300074 006D3017 74C0081F 071E0000 29FD9A50 16F44680 .F¶.P.»)......åt.=m.t.=..¤..uéo. 000080
A6EB0275 1A3F8026 DA880A74 4019C587 F68775C0 08F4468B C2E80020 8AC7E800 .$ù¤ .$ó.F¶.éuñ-.é.ât..Ö&.?.u.$[ 0000A0
AEF2FFFF B9C033C0 3ED88CFE 880A76C5 1E0E88D7 88EC8855 00A3E8C0 33001CBA ¤..3à$È.U.$.¤.B.év..±.Å.ä3à¿..·Û 0000C0
8B55C85D C28C1FFA 88F388A4 F3C913A5 F3E90149 A4027401 A8C78806 7EC4D1F7 %ià-..ú'.t.Él]ÕµÉ.èµÉ.µ.ª..ó]ùW. 0000E0
EB067EC4 56570000 00C800CB 5DFA8891 49D1F7AE F2FFFFB9 C033067E C4D788EC $.•á-.3à¿..·Ü%ll..ª]ù.à...WVá-.$ 000100
4C2AFE9A 5706006A 006A0846 8C067E89 F2750806 9387F608 88980S8A 26479002 ..G&....Å-....u·.-..F.j.j..W.±ªL 000120
A5A5DA8E 1E071EF0 881FD48F 0008050A C48329E2 32969A57 0876FF50 04C4832B +.á.P.v.W..2ä).á....¢å. Þ....ÕEE 000140
5EC4FA56 89F84689 08568806 46885657 00000ACB C8C95F5E DA8C1F04 881FA5A5 ÉE.¡å..Ö^_èùà...WV.F..V. F½.Vªá^ 000160
8B2E7E00 0A7E8330 07C626F8 46FFF85E C4FE5689 FC468908 578B2606 478B260C .&.G.&.W._F=.V±á^½.F½&ó.0.-..-.. 000180
E2460488 30809003 E8078A26 FC46FF09 74003F80 26FC5EC4 F876C5F6 5E8C0A4E N..^-év½á^•&.?.t..F•&..$..¯0..Fã 0001A0
3F8026FC 5EC4287C 000A7E83 0007C626 F85EC40A 4E89F65E 8EFA5E8C F87689E7 Ó.v½.^ª.^-.N.á^½&ó...-..|(á^•&.? 0001C0
260F88FA 468CF87E 89F57439 3D80264F 3005C626 9006E8F8 7EC4F84E FF1F7C35 5|..N½á-½$..&ó.OO&.=9t½.-½.Fª.Ö& 0001E0

Dump of file SATURN:[PCCOMMON.DUMP.DLL]DAMERGE.TMP;1 on 18-APR-1990 10:42:05.48
File ID (575,19,0)   End of file block 101 / Allocated 104

Virtual block number 74 (0000004A), 512 (0200) bytes

76FF5250 52400856 43064688 15E80247 FF260C5E C4097531 3F802606 5EC407FE ±.á^.&.?1u.á^.&.G.$..F..V.ƏRPR.v 000000
065E88EC 88550502 E9008357 56EC8855 000090C8 C95F5E08 C48328 3F 2AC89A06 ..à*?+.á.^_èù...U.$VW*.Ö@.U.$.^. 000020
885500C8 50E588C0 3202E800 01880574 4019C587 F60C7C00 F883117D 19C31E38 ;.ù.)..«.|.-.é.ât.¡..$.3à.[]ù.U. 000040
0E4E882C 2431EE9A 5706561E 067EC40A 76C55657 1E0085E9 0375C908 0E4E88EC &.N..èu.Öç..WVév.á-..V.W.Y1$,.N. 000060
2C9305C0 8C0773F9 03D88EFF FF05D88C 0773F103 49507300 DA83C128 5778D208 .ØxW+è.Ö.sPl.þs..Ä....Ä.ªs..ä.., 000080
E391FCA4 F3FDC128 9140C603 C323D818 C628C703 C323D818 C72848C1 8841C08E .àA.èH+ú.Uwú.ú+ó.Uwú.óƏ.+è»µÉ•.D 0000A0
078848C1 88C8E8C0 8E2CC92D C08C0175 FFFF8308 8E2C9E2D D88C0775 FFFE835C \.±.u..Ä-.,.Ä...ui.à-è,.å$à.èH.■ 0000C0
C913A5F3 E9D1C128 9140C203 C323D818 C22802F7 D688C203 C323D818 C22802F7 %@+ó.Uwú.ó.ø%@+ó.Uwú.óƏ.+èiÕµÉ.è 0000E0
1F5F5E8E E8C08E2D 0C05C08C C775FF08 D88E2CD5 05D88C07 75F60818 E391A4F3 µÉ.D..-u..Á.[,.Á..uú.à..-.à$/^ . 000100
D323D818 D1280C74 DAF7D788 067EC457 38E30C4E 88EC8855 C85D0856 8806468B .F..V.]ùW.$.N.D8Wá-..ø%Öt.+1.UWé 000120
D1C38E20 17C381C3 8C10E301 87AAF3C9 13A8F3E9 D1E08A0A 4688D128 D187D103 .1.1+1.F..ÅiÖµ¨.èµ¨.1D..ù.ù.-.ùl 000140
521E5100 02890C88 53015780 E42A078A C8500856 88064688 5FAAF3C9 13A8F3E9 Öµ¨.èµ¨_.F..V.]ù..*ó.W.S.É¿..Q.R 000160
A536A536 A536079E 8F06768D C08ED88C FC5756EC 8855C858 00002A86 9A531650 P.S..*..[ùW.$VW•.Á.ä.v.¢..6É6É6É 000180
0255891D 89FF3207 948FAA91 A4F39198 ACC88807 A68F5D05 D2E85507 9E8EA536 6É/..UÖ@.]¢l..à¨..µÉ.¨¢..2....U. 0001A0
1E380872 D828DC88 5A5900C8 5DE5885E 5FC7880A 8C085D8C 07A60645 C7044D89 .M.ùE.[..]..Ö.ú ^.[]ù.Y2.É+Är.;. 0001C0
D4885200 02880788 2EFF5152 F98EE9C0 33057540 078AA1C8 5152E388 057207BE ƒ.r..DRQùÅ¤.ƏU.3àÖ.ªRQ..¤.E..R.å 0001E0

Dump of file SATURN:[PCCOMMON.DUMP.DLL]DAMERGE.TMP;1 on 18-APR-1990 10:42:05.48
File ID (575,19,0)   End of file block 101 / Allocated 104

Virtual block number 75 (0000004B), 512 (0200) bytes

02300774 00013040 81127558 C0080000 FFFF9A52 16501653 C4885087 19C5A780 .Ïé.ñP.áS.P.R......åXu.ŸƏ=..t.=. 000000
731CBA1E FFD833C2 8C1C8E06 C41EE31C 8C0E885A 04794819 C58F0808 81067500 .u.Ÿ...é.Kyå2..¥.D.á.ƒ..ó3U..¤.s 000020
1C888F1C 848E007C E81CC68F 1CC68E1C 8A1EFF00 0388C28C 1CC206C4 F9C2E903 .Öó'á.ó..óE....¤./ó.¢ó.Ö|./Ç.¢¡. 000040
8F1CC68E D88E2812 88C30000 FFFF9A2E 77680E01 6A08741C CA3D1CC6 880073E8 Ós.¡ó.=ò.t.j..hw......ù[.(.Å/ó.¢ 000060
8F1CC68E 003AE81F DC8F1FDC 8EEC8855 00002E72 9A006A00 6A036A00 51E81CCA ò.ÖQ.j.j.j..r...U.$/É.¢É.Ö:./ó.¢ 000080
8A50C033 001AE81C CA8F1CCA 8E0023E8 1CCA8F1C CA8EEC88 5503E800 31E81CCA ò.01.$.U.&/ò.¢ò.Ö#./ò.¢ò.Ö..3åP. 0000A0
C8058804 EF830E73 F738C31C 8A1EFF00 028807E3 1C8C0E88 0000FFFF 9A500646 F.P.......¥.D.£....¤.ù;%s..ÿ.... 0000C0
76168800 F0E90375 027<3639 FF28F628 56570000 14C800C3 EEE810FF F2740245 E.t·..$Ÿù.à...WV+-+.96v.u.Öb...v 0000E0
2F5E3182 9A068068 1EF676FF F876FF0C 6AF85689 F64689F2 5689F046 89C02802 .+ä.Fb.V·.F-.V½j..V½.v-.h...ÿ1^/ 000100
0CE847EA 75003F80 26F646FF F65EC400 8CE90376 7FFFFE81 461974C0 080A.·83 .á..åt.F.±..v.ÖŸ.á^-.F-&.?.uóG$. 000120
2F60315A 9A046A50 01458D8A 75003F80 26F65E88 F475003F 8026F646 FFF65.:4 á^-.F-&.?.u¶.^-&.?.u¤.E.Pj..Z1m/ 000140
4074EE46 08EC4688 FE5689FC 468902C4 832FA330 9F9A56EE 5689EC46 8904C4ú3 .á..F$.VŸV..OE/.á..F=.V±.F$.FŸtm 000160
0680681E F076FFF2 76FF0C6A 18CD1689 18C8A3EE 5688EC46 886674C2 08FC4688 .F•.òtf.F$.VŸÉù...ë.j..v·.vÞ.h.. 000180
04EC4683 02578926 078926FE 5688FC46 88EC5EC4 2C74C008 0AC4832C 7831829A .ÿ1(,.á..åt,á^$.F•.V±&..&.W..F$. 0001A0
8026F046 FFF05EC4 E8E80E74 C00A0788 26FC46FF FC5EC407 8A26F046 FFF05EC4 á^Þ.FÞ&..á^•.F•&...åt.$Öá^Þ.FÞ&. 0001C0
0C070906 00051804 02030202 160190C8 C95F5EA7 75003F80 26F05EC4 F475003F ?.u¶á^Þ&.?.ul^_èù............... 0001E0
```

```
Dump of file SATURN:[PCCOMMON.DUMP.DLL]DAMERGE.TMP;1 on 18-APR-1990 10:42:05.48
File ID (575,19,0)   End of file block 101 / Allocated 104

Virtual block number 76 (0000004C), 512 (0200) bytes

00570053 00520243 00410235 02121211 0010120F 1600160C 0808070A 0C090C08 ....................S.A.C.R.S.W. 000000
C1A31608 000008D7 02CE0BA4 00840982 0A810A80 16060972 1C70206D 006C0859 Y.l.m p.r...........E.ö.m.....£è 000020
24892FF2 8819C'A3 CB5DE588 99FFFFB8 0008E8C8 5DE58899 FFFF8819 8A168919 ...a.|....|]ùò..|....|]ùÉè.É'/¿$ 000040
430176CA 3C0472BC 3C430A76 243C0472 133CF7E2 43431674 073A2E18 75E40A00 ..ðu..:.t.CCä%<.r.<$v.C<¥r.<ðv.C 000060
55C85DE5 8801FE4F 80260574 C308C08C 065EC4EC 885500C3 198AA398 01478A2E ..G..Eo.ù.U.&ó^..â.ùt.&.O±..|]ùU 000080
82E81C76 A3127400 25E80875 001C763E 831E73FF F1300646 88575602 EC83EC88 .â.â.VW.F.=þ.s..>v..u.ðX.t.£v.ð. 0000A0
F08BC85D E58B5E5F 02C4832F 1E34CE9A 0676FF08 750078E8 05740018 E8157500 .u.ð..t.ðx.u..v..ö4./.á._^.|]ùEÞ 0000C0
D3367A9A 50028051 0E4F8D50 501EC033 FE5E89FE E3834306 5E880776 065E3900 .9^.v..^.C.D±.^±3â.PP.O.Q¯.P.z6£ 0000E0
D88EFE5E 880008A3 DA8E0574 D2081C7A A31C7816 87C28838 74FFFA83 08C48330 0.á..ª.t8.ò..x.£z..Øt..ÒÉ...^±.Ä 000100
8C0006A3 00000500 0AA30147 800002A3 0000A300 0A880C47 89484800 08A3C033 3àÉ..HH.G.|...É...É...G.É.....É... 000120
6A560000 0AC8C309 8EC18CD2 0803C4E8 1C7A1E8E DB33064E 88C08ED8 8CC31FD8 Ä.ù.Ä.à.N.3Ù..z.ðá..ø.é.lùà...Vj 000140
902FE899 C02B0674 FFFFC2F7 FA5689F8 46893187 37309A06 76FF006A 0876FF00 ..v.j..v..07.1.F%.V*%ö..t.+à.$/. 000160
20289A50 FE76FF00 6A561274 D008FE56 89FC4689 02C48331 A0309F9A 56F87688 .v%V..0.1.á..F=.V±.Ät.Vj..v±P.(- 000180
C4098827 E30E4E88 1E5657EC 885590C8 C95EFE56 88FC4688 9007EB08 C48330FF .0.á.Š...f=.V±^èù.U.$WV..N.D'.1á 0001A0
04740477 FF453A26 C933FF44 8AA6F30A 76C5FE88 CB0309F7 AEF2C033 F788067E ~..%3à·Ù%1.ù.±év.µl.D.3é&:E.w.t. 0001C0
D3EAD3FF FF890C5E 88085688 064688EC 885500C8 5DE5885F 5E1FC188 D1F74949 I|%1.è.^_.|]ù.U.$.F..V..^.¿..ÆÒÆ 0001E0

Dump of file SATURN:[PCCOMMON.DUMP.DLL]DAMERGE.TMP;1 on 18-APR-1990 10:42:05.48
File ID (575,19,0)   End of file block 101 / Allocated 104

Virtual block num' er 77 (0000004D), 512 (0200) bytes

C00A93FC 071E570A 7EC51E08 56880646 880E4E88 0008CA5D E5880318 0A4628EB $+F..Æ.|]ò...N..F..V..é-.W..=..á 000000
F1F70274 C0080233 92F788DA F7000283 D8F7AA2D B00A7902 080E750A F9831374 t..*.u..øy.¯-¯%Ù.ø.%ö.%.3ø.ät.%þ 000020
448DFF44 880586AC 4F0588E2 75C308C2 88AA2704 0276393C 3004D387 92F1F793 .%þ..Æ.0<9v..'¯.ö.ùuä..O¯...D..D 000040
28E8011C 8106C60E 56880833 5756EC88 55C850E5 885E5F1F 580A8CF2 72C73801 .;úr·.ðX._^.|]ùU.£VW3Ù.V.ó....ð( 000060
0E5E88D2 335756EC 8855C850 E5885E5F 008940C9 8005730A 7638001C 8106C600 .ó....;v.Š..èâ.._^.|]ùU.£VW3ø.^. 000080
BF0676C5 27EBF633 40810676 64F9830A 4E88C08E D88CFCCB 5DE5885E 5F0006E8 ò.._^.|]ù».Ä.à.N¯.ªdv.Ÿä3-$'év.¢ 0000A0
0676285D 04D4E855 18E08F06 4E010C46 88067689 18EA8E0A 4E88D88E A4F318EA ò.µÈ.Ä.N./ô..v..F..N.¢Ä.Uðá.]+v. 0000C0
2509478A 2E09648A 5653C30A 8CC78806 50890445 89027589 00891808 8F0A7603 .v.¢Ä....u..E..]..ú.ðùSV.d...G.% 0000E0
56C35B5E F3E1073B 2E048802 E88302EE 830005B9 0AC3830A C6831675 C43A8080 ..:áu..ó..ù.¿...Ý..Š....;.Äµ^[ùV 000100
F5000130 D001E301 F4E2DFD1 DDD1DAD1 D8D1E801 0005B9FF 33AD93AD 92AD95AD Ù.Ù.Ù.Ù3.¿..1Ö1Ú1Ö1110ä¶1Ð1Ä=..% 000120
CD0000FF FFFFFFFF FFFC66C3 08448906 5C890454 89026C89 3C895E03 FE2D08D1 1Ù-±.^.<.l..T..\..D.úf=........é 000140
C08ED88C 06C3075B 400088C0 33300144 C60104C6 1C5ABEFF FDCCCCCC CCCCCCCC àààààààà».[Z.ó..6Ð.03à.Äa(.ù..Ä.à 000160
2D830279 C9080674 7FF0C1F7 20837F07 6480064C 885EA5F3 00048957 1C4E8FFC •¢N.W¿..µÈ^.L..d..° %èÞ.t..èy.°- 000180
E4F64D80 91E2F74D 108AC888 3FFE05AD F88A8874 80A8AC1C 558EFF33 FF78E853 SÒ(.3./U.¯´.t£.%U.±?.ào.M%ä.¯M-ð 0001A0
33558808 0AE81C4E 8EDFF757 13430F81 12F4E981 FA13C803 E7F69A80 D713C803 .à.ª¯-ó.à.ª.Ò¶..ðC.W%Ö/N.Ò..£U3 0001C0
C033F788 D9F791AD 93AD92AD 95AD97AD 575F0693 E8335F88 57470972 5FFF13E8 ò.._r.GWÉ_3ò.._WÙ.Ù.Ù.Ù.Ù.%1.%3à 0001E0

Dump of file SATURN:[PCCOMMON.DUMP.DLL]DAMERGE.TMP;1 on 18-APR-1990 10:42:05.48
File ID (575,19,0)   End of file block 101 / Allocated 104

Virtual block number 78 (0000004E), 512 (0200) bytes

10891C58 8FD91301 13E91303 9AD68156 C480F4E2 DCD0DED1 DDD1DAD1 E8D10CE3 D.1Š1Ö111ØÄÉä¶.äV.ø...Ö.1.1¢(.¿. 000000
D0030102 D1D5D1D6 D1E4D000 D0030102 D105D1D6 D1E4D050 56555253 51C03200 .2àQSRUVPÄÖ1ø111Ø1ÆÄÄÄÖ1ø111Ø1ÆÄ 000020
3004D000 D3010201 D5D106D1 E4D00014 D9135901 1359E913 59F11359 E5025900 ÄY.|Y.þY.ÒY.|Y.).ÄÖ1ø111Ø1ÆÄÄ.0 000040
000006C8 00C3075B 5A0001B8 0C881C5A 8E12C183 FCAEF3FD 3080494F BDE259AA ·YäŠOI D=µÙ=.è./Z...|..Z[.ù.à... 000060
83316C3C 0C9A5306 0E74830A 47F626FA 5EC41CE8 F628FC5E 8CFA4689 07C08856 V|á..F*.^=+-Š.á^*&-G..t..S..<l1. 000080
88EC8855 90C8C95E C6880876 FA463919 80168819 AEA10CFA 46834601 744004C4 á.ät.F.F*.ÄÙ...¯.9F*vÄ.ó^èù.U.&. 0000A0
00058807 1E297500 3F831C6C 885756EC 8855C85D E58801FE 4F800474 D8080650 ^..Ùt..O±..|]ùU.£VWÈl..?.u)..|.. 0000C0
FFFEFE44 C704C683 000104C7 961C6EA3 1C6CA3FE 244024E8 99C03305 750176E8 ðv.u.3à.Š$äŠ±£l.£n..ú....ó.úÐ±±. 0000E0
EEF983FE E180FA74 410000E9 CB5DE588 5E5F0009 E8C08ED8 8C064E88 1C723689 .6r..N..Ä.àð.._^.|]ùÐÄ.At*.Ä±.*Ÿ 000100
000205C2 03357401 A8ADF003 00881573 C1384643 7401A8FE 88ADFC02 778BF273 a·.w.=ù.±¯.tCH¯ès..Ä.ÞÙ´.t5.ó... 000120
0A8CC688 :24CFEF9 0305E805 8948C128 FE4C89F9 030C74FE 88E6E8FE 4489F788 .%.D±Š1.±t..ª.L±+èH..Š..ª±L±.ó.ð 000140
ADF003FE 882574FF FE30021C 7E06C626 C3027F89 1C7A1E8C 260574D1 382E7889 ¿x.;1t.&..±....ù&ó.~..=±.t%.±.ÞÙ 000160
E6EBFE44 89F78800 0205C203 E27401A8 ADF00300 888C73C1 3848FE88 F27401A8 ´.t·.±H;ès¥.Ä.ÞÙ´.tä.ó....%.D±Š1 000180
1C761E8E 260574C7 3835618F D88C1274 1C7E0EFE 2615E8D8 8E0474C0 0808478B .G..ät..ÄŠ.&±.-.t..Ä¢a5;ùt.&..v. 0001A0
001DE8FE 4DFE0074 005FE898 40400124 0074C638 006BE8C0 33067788 88E8378B .7Š£.w.3àðk.;ót.$.àa.ð_.t.±M±ð.. 0001C0
458851C3 99C03302 47890788 1C7AA326 0474C138 35858908 8C98EB4E 4E960574 t..NNŠ..Ä¿ç5;èt.&£z....¯G.3à.ùQ.E 0001E0
```

Dump of file SATURN:[PCCOMMON.DUMP.DLL]DAMERGE.TMP;1 on 18-APR-1990 10:42:05.48
File ID (575,19,0)   End of file block 101 / Allocated 104

Virtual block number 79 (0000004F), 512 (0200) bytes

```
C2031572 C603C188 F575EAD1 04761C7C 1638267F FFBA4141 49C82B03 7401A8FE ±´.t.+àlAAo..&;.|.v.1õuX.ê.ór..ô 000000
8B571B74 001DE85; 52C359C0 33E575EA D1D2F708 75000CE8 C62BC223 D2F70072 r.X@#ö+6Ò..u.X@lõul3àYÚRQÒ..t.W. 000020
52521ED2 335053C3 5A5958FE 55894AD7 2BD68806 7789FFFE FE44C7F2 03F088FE ±.Þ.´ÚDx±..w..@+@J.U±XYZÚSP3@.RR 000040
065756EC 8855C302 0802745B 5A1FFFFA 8308C483 3490367A 9A1F0650 00018850 P¡..P...z6.4.Á..*..Z[t..@ÚU.$VW. 000060
11744806 7E36884C E8277200 57E80775 4806468B 08568802 7E8F3875 000A7E83 .-..uB¢-..V..F.Hu.ÒW.r'$L.6-.Ht. 000080
FF880675 D2080473 067EFE81 04C68334 735E003E E8560E46 8902448B 0074F738 ;Xt..D..F.VÒ>.^s4.6..±-.s..@u.|. 0000A0
7E368902 5C891489 E675C085 F9580000 FFFF9A50 C0335016 52C48850 21E899FF ..$IP.@R.P3àP.....[*.àul...\..6- 0000C0
F9F27506 7EFE8104 C6830C74 024C39F7 880E4E88 CB5DE588 5E5F07C0 33038806 ..Æ3à._^.|]ù.N..X9L.t..6..±-.u·* 0000E0
75C08500 00FFFF9A 51531373 02781E39 0675F738 C18ED388 26721C03 DA882CE8 $,.Ö..r&.Æ.è;Xu.9.x.s.SQ......@u 000100
08750A5E 88D8080C 5E880846 88EC8855 00C3018B 04879202 78168904 75F7380E B;Xu...x.....lù.U.£.F..^..Ã.^.u. 000120
E5880103 E3F70646 88C8030C 66F70646 88C888E3 F70008CA 5DE588E3 F706468B .f.XD.|]ò..XD.à.F.Xf..à.F.XD.1.| 000140
E808331C 8E1E8900 ACE90833 0185E8EF 88FF3307 8840C980 30C98058 0008CA5D ]ò..X.è0.èà.@3..ýÒ..3ÚÒ¯.....3ÚÒ 000160
C475020B 1C8E2EF7 C388EA88 F8881C8E 26F7C788 50E07202 05E8F888 E172020C ..rÃ.YÒ..rÁP.Ú4£...%.õ.Ú%....@uè 000180
16891C90 A31C860E 89CE031C 843E89FC 85E80873 000383F8 03588E72 D888C503 .é.Ar/X.%.Æ.sÁ$ç•.>...o.....È.... 0001A0
E8083300 E7E89F75 D80880CD 80037501 ADE8911C 8CA31C88 A31C8AA3 C0331C92 ..3àÈ..È..È...ÒU.u..ë..Úu.ÒÒ.3ÚÒ 0001C0
814E2775 02742D3C 0674283C 3174001C 813E8012 74453C1C 74443C4E 417401FD ».tAN<Dt.<Et..>...t1<+t.<·t.u'N. 0001E0
```

Dump of file SATURN:[PCCOMMON.DUMP.DLL]DAMERGE.TMP;1 on 18-APR-1990 10:42:05.48
File ID (575,19,0)   End of file block 101 / Allocated 104

Virtual block number 80 (00000050), 512 (0200) bytes

```
5840C980 037502C5 F60088E8 509F016C E8460000 1C9006C7 0EC98003 EB0402C9 è..$..è.ú.....FÒl..PÒ..-é.u..èàX 000000
7510C5F6 1C8C3E03 F80330C9 80037418 72C1F706 75FF081C 903E88D8 F702759E .u.XÚ.>....u.Xër.t..è0.«.>..-é.u 000020
5901ACE8 001CA206 C61C843E 880394E8 1C988E51 56507F01 90FF811C 923E2B04 .+>.......PVQ/..Ò...>..ó.Á..Ò¯.Y 000040
4D800474 7FF00645 F7000383 F5D8F7D3 F7137480 C5F61C96 1E881C94 A138755E ^uBÀ......-é.t.XÆXÀX.Æ.XE.Þ.t..M 000060
88C301C9 80C302C0 80037500 1C8A3E83 1CA22E8A 08C98003 76071C8A 3E838007 ...>...v..è...Á..>...u..ë.ú.è.ÚE 000080
78D803E3 D1E3D1C3 03E3D102 CD80ED77 0CCCFB81 177200E4 E80A1C8E 06C63FFF .7ó....Òò.r..«ä.wÚ.ë.1D.ÚlD1D.Àx 0000A0
D7830005 83000383 00035800 8AE85028 7200D6E8 D7880F88 EF88FF33 C3DFE8DE BSÒú3..ÿ.Ò.@Ò@.r(PÒ..X.Á.Æ..f..@ 0000C0
8C0608C5 08C788EE E81C8C06 FF01CA80 0374C00A 0072008B E8E57219 99FF8100 .....r|ÒE.r..àt..ò.....$Y.ú.é... 0000E0
8920C980 10C98006 E80575D2 08097580 00F8810F 7480C5F6 177480C7 F616751C .u.-ú.t.-é.t..«..u..@u.$..è..è . 000100
F1E81C8C 0EFF0025 E8097319 99FF811C 74C208C3 08C508C7 881C961E 891C9416 ........ú.é.ú.ót.....s.ÒX.....$þ 000120
57C35EA8 92A896A8 95A893A8 921C988F F78856F6 EB002AE8 480678FF 08004088 ¡ä...x.HÒ*.$-V.X¢.........^ÚW 000140
5EE8C307 D1D5D1D3 )1E201F8 1358E813 58081358 00030008 E8000EE8 C2885355 US.õÒ..Ò...ÀX.ÀX.ÒX.%iäiÆiilæÚÒ^ 000160
8E063A07 2C027E09 3C457230 2C4A7400 4EE8C34E 46017528 3C06742D 3C087400 .t.<-t.<+u.FNÚÒN.tJ,OrE<.-.,.:.. 000180
801C8C0E FF0E7410 C5F62677 093C2A72 302C2074 2E3C3374 0037E81D E8397D1C .)9$.Ò7.t3<.t ,Or*<.w&-é.t...... 0001A0
38C3F94E C9E810CD 801C8806 FF097510 C5F6F4E8 20CD80C3 E4321C8A 06FF08CD é.....2òú.é $¶-é.u......è.$èN*ú; 0001C0
72613CE2 740D3CE6 740A3CEA 74093CEE 74203C10 74001C80 3E80AC23 731C8636 6..s#¯.>...t.< tY<.tõ<.tl<.tã<ar 0001E0
```

Dump of file SATURN:[PCCOMMON.DUMP.DLL]DAMERGE.TMP;1 on 18-APR-1990 10:42:05.48
File ID (575,19,0)   End of file block 101 / Allocated 104

Virtual block number 81 (00000051), 512 (0200) bytes

```
FE05AD49 74C20BC1 08C508F8 88AD95AD 91AD92AD 57C3C032 C35F2402 777A3C06 .<zw.$ Ú2ëÚAÚ.Ú.Ú.Ú.%.é.ê.ôtlÚ.± 000000
0AD92243 F075CBFE D7D00001 D7D1D5D1 D1D1E2D1 0005B8DF D1E8D1E7 D13E7803 .x>ïÒïÕïÒE..ïäïïïïïæïÀÀæ±ÚuÞC"}. 000020
EB000780 F57FF03D 0E74FFF0 A9000780 C613FE13 EE13CE13 F58001FA 81F63303 Æ3-.*..X.ö.Y.±.ó.ø.`Þ.t.=Þ.X.ø.$ 000040
FF0A0645 89047589 02608900 895FF788 F888E888 C888D888 C033011C A20E800F ...Á..3ä.Ä.à.Ò.%.X_...m..u..E... 000060
C42AE022 C72B0004 8B00078F 08440108 47882EAB F3C033FD 88000889 1CA48DC3 ú$E.¿...»3äæ¨..G..D̄.¢..¡..+ú"Á*á 000080
013E27F7 2E048806 C683F728 F10308C3 83DF2BD9 285653C8 88980404 D8F6C42A *á-Á....àSV+1+Ò.Ú..þ+X.ó....X'>. 0000A0
F5870EED 838C754F 02C5835B 5EE6E202 C38302EE 83000456 833E0256 113E0046 f.>.V.>.V...Y..ú.äl^[.é.OuY.Ú..% 0000C0
E2D1084C FF0078C0 08F58BAD 93AD91AD 97AD010A 92ADC00A C808ADC8 0BAD91AD Ú.Ú.ÀÚ.à.èÚ..lÚ.Ú.Ú.Ú.X.àx..L.là 0000E0
D5D1C513 DD13C013 FD13F580 01FA81ED 33D508EF 230001BD 0001D301 D1D1D701 ïæïïïÆïÀ$..#ý.f3Ú.*..%.».è.ï.éïf 000100
00000000 04A00000 00000000 00C30644 89045C89 024C893C 89C508CD D1086C01 .l.le.é.<.L..\..D.ú............. 000120
8F040000 00001B8E 8C200000 00000000 0E9C4000 00000000 000007C8 00000000 ....à.........@.........¥/......¢ 000140
BA47C980 E98CE000 D5C2781F 49FFCFA6 D50068ƏD C5ADA828 70859E00 368E18C9 è..6..çp+´Úé.k.ïlú.ï.xôï.À.Ò.èGø 000160
FAA3070A 3070A307 0AFFF0CC CCCCCCCC CCCCCD03 53AA7EEB FB9DF90E 8E01AA93 .¯..B*.«Š-´S.ëëëëëëë»..øÉp=.øÉ* 000180
BAFFCBE6 9594BEC4 4DE15BFF E6A8CC77 118461CE FDFFF301 B71758E2 19652CFF .,e.äX.ñlæ.»òø..wä¨|.(ÀM6/..lù.o 0001A0
7A193AFE 57DDD046 7C64BCE4 A1FF2CA8 7FEA27A5 39E9A5FF 96CF811E A0453994 .9EÚ.Yú..EÒ9E'õ.´,.ÀÒ¥d|FÀïW±:.z 0001C0
73EF0100 74FF080A C3830AEB 83DFF738 8D880579 FF083833 B8FCAEC0 31432563 cXC1àÚ•E3;..y.E.;XÒ.$..·...t.lÿs 0001E0
```

```
Dump of file SATURN:[PCCOMMON.DUMP.DLL]DAMERGE.TMP;1 on 18-APR-19^^ 10:42:05.48
File ID (575,19,0)    End of file block 101 / Allocated 104

Virtual block number 82 (00000052), 512 (0200) bytes

5575023C 03240A47 8A26065E C4F62B56 000004C8 00C3ECEB 5B5FFE7B E85753F5 %SWÖ(±_(Š$Ú.À...V+-Á^.&.G.$.<.uU 000000
26065E88 39740113 B487F606 D868F9F7 000C8999 07C020C3 88157508 0A47F626 &-G..u..ù-â..¿..%*kÄ.-.Ç..t9.^.& 000020
293A9A50 E42A0B47 8A260677 FF260877 FF265028 7EC008FC 46890647 28260788 ..&+G..F=.Â-(P&.w.&.w.&.G.*ÕP.:) 000040
08578B26 06478L26 065EC4FF FFBE200A 4F802606 5EC40874 FC463808 C483366A j6.Á.;F=t.Á^.&.O. /..Á^.&.G.&.W. 000060
2EC40103 0526000E 20840203 0000CBC9 5EC68800 000447C7 26025789 26078926 &..&.W.&ÚG....Ó^èù.....-..&...Á. 000080
36CE0103 0000000C 35EA0002 00000009 3C600002 00070003 2E8C0103 00050003 ..............'<......ðS......ö6 0000A0
31FB0105 00400003 2E0E0103 003A0003 29660103 00260003 37190103 00220003 ..".....7..&...f)..:........M...«1 0000C0
00000000 005C0003 27590103 005B0003 276C0103 00880003 20580105 00870003 ......[-......('..[...Y'..\..... 0000E0
08468702 46870646 87EC8855 0E50C033 002A0000 00010047 45534753 4D4B4DFF .MKMSGSEG.....*.3ÀP.U.&.F..F..F. 000100
00000000 00000000 00000000 00020001 00250103 0001FF00 00FFFFEA 50044689 .F.]õ.........%................. 000120
6F432020 20797261 7262694C 20656069 54206E75 52205340 00000000 00000000 .........MS Run-Time Library - Co 000140
70726F43 2074666F 736F7263 694D202C 38383931 20296328 20746867 69727970 pyright (c) 1988, Microsoft Corp 000160
17671A84 176F0054 21300050 2020004C 21540048 2096FFFF 26060000 00000011 .......&... H.TIL.  P.OIT.o...g. 000180
2800296C 6C756E28 00001713 16C01CEC 19551CEE 19571C88 18D11A5F 17651A61 a.e...i...W.Ý.U.&.à.....(null).( 0001A0
009A2306 00962806 00922806 008E2806 1CB62806 00002320 202B0029 6C6C756E null).+- #...(Ñ..(...(...(...(.. 0001C0
00000000 00000000 80C0E0F0 F8FCFEFF 00000000 78783136 40050101 00000000 .......M61xx.....±=½pÅâ......... 0001E0

Dump of file SATURN:[PCCOMMON.DUMP.DLL]DAMERGE.TMP;1 on 18-APR-1990 10:42:05.48
File ID (575,19,0)    End of file block 101 / Allocated 104

Virtual block number 83 (00000053), 512 (0200) bytes

00000000 00000000 00000000 00000000 00000000 00000000 00000000 00000000 ................................ 000000
00000000 00000000 00000000 00000000 00000000 00000030 30302865 00000000 ....e+000....................... 000020
00000000 00000000 00000000 00000000 00000000 00000000 00000000 00000000 ................................ 000040
00000000 00000000 00000000 00000000 00000000 00000000 00000000 00000000 ................................ 000060
00000000 00000000 00000000 00000000 00000000 00000000 00000000 00000000 ................................ 000080
00000000 00000000 00000000 00000000 00000000 00000000 00000000 00000000 ................................ 0000A0
00000000 00000000 00000000 00000000 00000000 00000000 00000000 00000000 ................................ 0000C0
00000000 00000000 00000000 00000000 00000000 00000000 00000000 00000000 ................................ 0000E0
00000000 00000000 00000000 00000000 00000000 00000000 00000000 00000000 ................................ 000100
00000000 00000000 00000000 00000000 00000000 00000000 00000000 00000000 ................................ 000120
00000000 00000000 00000000 00000000 00000000 00000000 00000000 00000000 ................................ 000140
00000000 00000000 00000000 00000000 00000000 00000000 00000000 00000000 ................................ 000160
00000000 00000000 00000000 00000000 00000000 00000000 00000000 00000000 ................................ 000180
1FE02EA7 1FE01FE0 00000000 01020000 00000000 00000000 00000000 00000000 .......................Â.Â.Ì.Â. 0001A0
00000000 00000000 00000000 00000000 00000000 00000000 00000000 00001CDA Ö............................... 0001C0
00000000 00000000 00000000 00000000 00000000 00000000 00000000 00000000 ................................ 0001E0

Dump of file SATURN:[PCCOMMON.DUMP.DLL]DAMERGE.TMP;1 on 18-APR-1990 10:42:05.48
File ID (575,19,0)    End of file block 101 / Allocated 104

Virtual block number 84 (00000054), 512 (0200) bytes

00000000 00000000 00000000 00000000 00000000 00000000 00000000 00000000 ................................ 000000
00000000 00000000 00000000 00000000 00000000 00000000 00000000 00000000 ................................ 000020
00000000 00000000 00000000 00000000 00000000 00000000 00000000 00000000 ................................ 000040
00000000 00000000 00000000 00000000 00000000 00000000 00000000 00000000 ................................ 000060
00000000 00000000 00000000 00000000 00000000 00000000 00000000 00000000 ................................ 000080
00000000 00000000 00000000 00000000 00000000 00000000 00000000 00000000 ................................ 0000A0
00000000 00000000 00000000 00000000 00000000 00000000 00000000 00000000 ................................ 0000C0
00000000 00000000 00000000 00000000 00000000 00000000 00000000 00000000 ................................ 0000E0
00000000 00000000 00000000 00000000 00000000 00000000 00000000 00000000 ................................ 000100
00000000 00000000 00000000 00000000 00000000 00000000 00000000 00000000 ................................ 000120
00000000 00000000 00000000 00000000 00000000 00000000 00000000 00000000 ................................ 000140
00000000 00000000 00000000 00000000 00000000 00000000 00000000 00000000 ................................ 000160
00000000 00000000 00000000 00000000 00000000 00000000 00000000 00000000 ................................ 000180
00000000 00000000 00000000 00000000 00000000 00000000 00000000 00000000 ................................ 0001A0
00000000 00000000 00000000 00000000 00000000 00000000 00000000 00000000 ................................ 0001C0
00000000 00000000 00000000 00000000 00000000 00000000 00000000 00000000 ................................ 0001E0
```

```
Dump of file SATURN:[PCCOMMON.DUMP.DLL]DAMERGE.TMP;1 on 18-APR-1990 10:42:05.48
File ID (575,19,0)   End of file block 101 / Allocated 104

Virtual block number 85 (00000055), 512 (0200) bytes

00000000 00000000 00000000 00000000 00000000 00000000 00000000 00000000 ................................ 000000
00000000 00000000 00000000 00000000 00000000 00000000 00000000 00000000 ................................ 000020
00000000 00000000 00000000 00000000 00000000 00000000 00000000 00000000 ................................ 000040
00000000 00000000 00000000 00000000 00000000 00000000 00000000 00000000 ................................ 000060
00000000 00000000 00000000 00000000 00000000 00000000 00000000 00000000 ................................ 000080
00000000 00000000 00000000 00000000 00000000 00000000 00000000 00000000 ................................ 0000A0
00000000 00000000 00000000 00000000 00000000 00000000 00000000 00000000 ................................ 0000C0
00000000 00000000 00000000 00000000 00000000 00000000 00000000 00000000 ................................ 0000E0
00000000 00000000 00000000 00000000 00000000 00000000 00000000 00000000 ................................ 000100
00000000 00000000 00000000 00000000 00000000 00000000 00000000 00000000 ................................ 000120
00000000 00000000 00000000 00000000 00000000 00000000 00000000 00000000 ................................ 000140
00000000 00000000 00000000 00000000 00000000 00000000 00000000 00000000 ................................ 000160
00000000 00000000 00000000 00000000 00000000 00000000 00000000 00000000 ................................ 000180
027E0000 00000000 00000000 00000000 00000000 00000000 00000000 00000000 ..............................~. 0001A0
28282828 20202020 20202020 20000000 00000030 4F464E49 5F454C49 465F435F _C_FILE_INFO=......         (((( 0001C0
10101010 10101010 10101010 48202020 20202020 20202020 20202020 20202028 (                  H............ 0001E0

Dump of file SATURN:[PCCOMMON.DUMP.DLL]DAMERGE.TMP;1 on 18-APR-1990 10:42:05.48
File ID (575,19,0)   End of file block 101 / Allocated 104

Virtual block number 86 (00000056), 512 (0200) bytes

01010101 01018181 81818181 10101010 10101084 84848484 84848484 84101010 ................................ 000000
02020202 02028282 82828282 10101010 10100101 01010101 01010101 01010101 ................................ 000020
00000000 00000000 00000000 00201010 10100202 02020202 02020202 02020202 ................................ 000040
00000000 00000000 00000000 00000000 00000000 00000000 00000000 00000000 ................................ 000060
00000000 00000000 00000000 00000000 00000000 00000000 00000000 00000000 ................................ 000080
00000000 00000000 00000000 00000000 00000000 00000000 00000000 00000000 ................................ 0000A0
00000000 00000000 00000000 00000000 00000000 00000000 00000000 00000000 ................................ 0000C0
00000000 00000000 00000000 00000000 00000000 00000000 00000000 00000000 ................................ 0000E0
0200FFFF FFFF0000 00000000 00000000 00000000 00000000 00000000 00000000 ................................ 000100
00000000 00000000 01020000 00000000 00000000 00011C08 00000000 07C80000 ..à.....À....................... 000120
00000000 00000000 00000000 00000000 00000000 00000000 00000000 02020000 ................................ 000140
00000000 00000000 00000000 00000000 00000000 00000000 00000000 00000000 ................................ 000160
00000000 00000000 00000000 00000000 00000000 00000000 00000000 00000000 ................................ 000180
00000000 00000000 00000000 00000000 00000000 00000000 00000000 00000000 ................................ 0001A0
00000000 00000000 00000000 00000000 00000000 00000000 00000000 00000000 ................................ 0001C0
00000000 00000000 00000000 00000000 00000000 00000000 00000000 00000000 ................................ 0001E0

Dump of file SATURN:[PCCOMMON.DUMP.DLL]DAMERGE.TMP;1 on 18-APR-1990 10:42:05.48
File ID (575,19,0)   End of file block 101 / Allocated 104

Virtual block number 87 (00000057), 512 (0200) bytes

00000000 00000000 00000000 00000000 00000000 00000000 00000000 00000000 ................................ 000000
00000000 00000000 00000000 00000000 00000000 00000000 00000000 00000000 ................................ 000020
00000000 00000000 00000000 00000000 00000000 00000000 00000000 00000000 ................................ 000040
00000000 00000000 00000000 00000000 00000000 00000000 00000000 00000000 ................................ 000060
00000000 00000000 00000000 00000000 00000000 00000000 00000000 00000000 ................................ 000080
00000000 00000000 00000000 00000000 00000000 00000000 00000000 00000000 ................................ 0000A0
00000000 00000000 00000000 00000000 00000000 00000000 00000000 00000000 ................................ 0000C0
00000000 00000000 00000000 00000000 00000000 00000000 00000000 00000000 ................................ 0000E0
00000000 00000000 00000000 00000000 00000000 00000000 00000000 00000000 ................................ 000100
00000000 00000000 00000000 00000000 00000000 00000000 00000000 00000000 ................................ 000120
00000000 00000000 00000000 00000000 00000000 00000000 00000000 00000000 ................................ 000140
00000000 00000000 00000000 00000000 00000000 00000000 00000000 00000000 ................................ 000160
00000000 00000000 00000000 00000000 00000000 00000000 00000000 00000000 ................................ 000180
00000000 00000000 00000000 00000000 00000000 00000000 00000000 00000000 ................................ 0001A0
00000000 00000000 00000000 00000000 00000000 00000000 00000000 00000000 ................................ 0001C0
00000000 00000000 00000000 00000000 00000000 00000000 00000000 00000000 ................................ 0001E0
```

```
Dump of file SATURN:[PCCOMMON.DUMP.DLL]DAMERGE.TMP;1 on 18-APR-1990 10:42:05.48
File ID (575,19,0)   End of file block 101 / Allocated 104

Virtual block number 88 (00000058), 512 (0200) bytes

 00000000 00000000 00000000 00000000 00000000 00000000 00000000 00000000 ................................ 000000
 00000000 00000000 00000000 00000000 00000000 00000000 00000000 00000000 ................................ 000020
 00000000 00000000 00000000 00000000 00000000 00000000 00000000 00000000 ................................ 000040
 00000000 00000000 00000000 00000000 00000000 00000000 00000000 00000000 ................................ 000060
 00000000 00000000 00000000 00000000 00000000 00000000 00000000 00000000 ................................ 000080
 00000000 00000000 00000000 00000000 00000000 00000000 00000000 00000000 ................................ 0000A0
 00000000 00000000 00000000 00000000 00000000 00000000 00000000 00000000 ................................ 0000C0
 00000000 00000000 00000000 00000000 00000000 00000000 00000000 00000000 ................................ 0000E0
 00000000 00000000 00000000 00000000 00000000 00000000 00000000 00000000 ................................ 000100
 00000000 00000000 00000000 00000000 00000000 00000000 00000000 00000000 ................................ 000120
 00000000 00000000 00000000 00000000 00000000 00000000 00000000 00000000 ................................ 000140
 00000000 00000000 00000000 00000000 00000000 00000000 00000000 00000000 ................................ 000160
 00000000 00000000 00000000 00000000 00000000 00000000 00000000 00000000 ................................ 000180
 00000000 00000000 00000000 00000000 00000000 00000000 00000000 00000000 ................................ 0001A0
 00000000 00000000 00000000 00000000 00000000 00000000 00000000 00000000 ................................ 0001C0
 00000000 00000000 00000000 00000000 00000000 00000000 00000000 00000000 ................................ 0001E0

Dump of file SATURN:[PCCOMMON.DUMP.DLL]DAMERGE.TMP;1 on 18-APR-1990 10:42:05.48
File ID (575,19,0)   End of file block 101 / Allocated 104

Virtual block number 89 (00000059), 512 (0200) bytes

 00000000 00000000 00000000 00000000 00000000 00000000 00000000 00000000 ................................ 000000
 00000000 00000000 00000000 00000000 00000000 00000000 00000000 00000000 ................................ 000020
 00000000 00000000 00000000 00000000 00000000 00000000 00000000 00000000 ................................ 000040
 00000000 00000000 00000000 00000000 00000000 00000000 00000000 00000000 ................................ 000060
 00000000 00000000 00000000 00000000 00000000 00000000 00000000 00000000 ................................ 000080
 00000000 00000000 00000000 00000000 00000000 00000000 00000000 00000000 ................................ 0000A0
 00000000 00000000 00000000 00000000 00000000 00000000 00000000 00000000 ................................ 0000C0
 00000000 00000000 00000000 00000000 00000000 00000000 00000000 00000000 ................................ 0000E0
 00000000 00000000 00000000 00000000 00000000 00000000 00000000 00000000 ................................ 000100
 00000000 00000000 00000000 00000000 00000000 00000000 00000000 00000000 ................................ 000120
 00000000 00000000 00000000 00000000 00000000 00000000 00000000 00000000 ................................ 000140
 00000000 00000000 00000000 00000000 00000000 00000000 00000000 00000000 ................................ 000160
 00000000 00000000 00000000 00000000 00000000 00000000 00000000 00000000 ................................ 000180
 00000000 00000000 00000000 00000000 00000000 00000000 00000000 00000000 ................................ 0001A0
 00000000 00000000 00000000 00000000 00000000 00000000 00000000 00000000 ................................ 0001C0
 00000000 00000000 00000000 00000000 00000000 00000000 00000000 00000000 ................................ 0001E0

Dump of file SATURN:[PCCOMMON.DUMP.DLL]DAMERGE.TMP;1 on 18-APR-1990 10:42:05.48
File ID (575,19,0)   End of file block 101 / Allocated 104

Virtual block number 90 (0000005A), 512 (0200) bytes

 00000000 00000000 00000000 00000000 00000000 00000000 00000000 00000000 ................................ 000000
 00000000 00000000 00000000 00000000 00000000 00000000 00000000 00000000 ................................ 000020
 00000000 00000000 00000000 00000000 00000000 00000000 00000000 00000000 ................................ 000040
 00000000 00000000 00000000 00000000 00000000 00000000 00000000 00000000 ................................ 000060
 00000000 00000000 00000000 00000000 00000000 00000000 00000000 00000000 ................................ 000080
 00000000 00000000 00000000 00000000 00000000 00000000 00000000 00000000 ................................ 0000A0
 00000000 00000000 00000000 00000000 00000000 00000000 00000000 00000000 ................................ 0000C0
 00000000 00000000 00000000 00000000 00000000 00000000 00000000 00000000 ................................ 0000E0
 00000000 00000000 00000000 00000000 00000000 00000000 00000000 00000000 ................................ 000100
 00000000 00000000 00000000 00000000 00000000 00000000 00000000 00000000 ................................ 000120
 00000000 00000000 00000000 00000000 00000000 00000000 00000000 00000000 ................................ 000140
 00000000 00000000 00000000 00000000 00000000 00000000 00000000 00000000 ................................ 000160
 00000000 00000000 00000000 00000000 00000000 00000000 00000000 00000000 ................................ 000180
 00000000 00000000 00000000 00000000 00000000 00000000 00000000 00000000 ................................ 0001A0
 00000000 00000000 00000000 00000000 00000000 00000000 00000000 00000000 ................................ 0001C0
 00000000 00000000 00000000 00000000 00000000 00000000 00000000 00000000 ................................ 0001E0
```

```
Dump of file SATURN:[PCCOMMON.DUMP.DLL]DAMERGE.TMP;1 on 18-APR-1990 10:42:05.48
File ID (575,19,0)   End of file block 101 / Allocated 104

Virtual block number 91 (0000005B), 512 (0200) bytes

00000000 00000000 00000000 00000000 00000000 00000000 00000000 00000000 ................................ 000000
00000000 00000000 00000000 00000000 00000000 00000000 00000000 00000000 ................................ 000020
00000000 00000000 00000000 00000000 00000000 00000000 00000000 00000000 ................................ 000040
00000000 00000000 00000000 00000000 00000000 00000000 00000000 00000000 ................................ 000060
00000000 00000000 00000000 00000000 00000000 00000000 00000000 00000000 ................................ 000080
00000000 00000000 00000000 00000000 00000000 00000000 00000000 00000000 ................................ 0000A0
00000000 00000000 00000000 00000000 00000000 00000000 00000000 00000000 ................................ 0000C0
00000000 00000000 00000000 00000000 00000000 00000000 00000000 00000000 ................................ 0000E0
00000000 00000000 00000000 00000000 00000000 00000000 00000000 00000000 ................................ 000100
00000000 00000000 00000000 00000000 00000000 00000000 00000000 00000000 ................................ 000120
00000000 00000000 00000000 00000000 00000000 00000000 00000000 00000000 ................................ 000140
00000000 00000000 00000000 00000000 00000000 00000000 00000000 00000000 ................................ 000160
00000000 00000000 00000000 00000000 00000000 00000000 00000000 00000000 ................................ 000180
00000000 00000000 00000000 00000000 00000000 00000000 00000000 00000000 ................................ 0001A0
00000000 00000000 00000000 00000000 00000000 00000000 00000000 00000000 ................................ 0001C0
00000000 00000000 00000000 00000000 00000000 00000000 00000000 00000000 ................................ 0001E0

Dump of file SATUPN:[PCCOMMON.DUMP.DLL]DAMERGE.TMP;1 on 18-APR-1990 10:42:05.48
File ID (575,19,0   End of file block 101 / Allocated 104

Virtual block number 92 (0000005C), 512 (0200) bytes

00000000 00000000 00000000 00000000 00000000 00000000 00000000 00000000 ................................ 000000
00000000 00000000 00000000 00000000 00000000 00000000 00000000 00000000 ................................ 000020
00000000 00000000 00000000 00000000 00000000 00000000 00000000 00000000 ................................ 000040
00000000 00000000 00000000 00000000 00000000 00000000 00000000 00000000 ................................ 000060
00000000 00000000 00000000 00000000 00000000 00000000 00000000 00000000 ................................ 000080
00000000 00000000 00000000 00000000 00000000 00000000 00000000 00000000 ................................ 0000A0
00000000 00000000 00000000 00000000 00000000 00000000 00000000 00000000 ................................ 0000C0
00000000 00000000 02000001 00000000 00000000 00000000 00000000 00000000 ................................ 0000E0
00000000 00000000 00000000 00000000 00000000 00000000 00000000 00000000 ................................ 000100
00000000 00000000 00000000 00000000 00000000 00000000 00000000 00000000 ................................ 000120
00000000 00000000 00000000 00000000 00000000 00000000 00000000 00000000 ................................ 000140
00000000 00000000 00000000 00000000 00000000 00000000 00000000 00000000 ................................ 000160
00000000 00000000 00000000 00000000 00000000 00000000 00000000 00000000 ................................ 000180
00000000 00000000 00000000 00000000 00000000 00000000 00000000 00000000 ................................ 0001A0
00000000 00000000 00000000 00000000 00000000 00000000 00000000 00000000 ................................ 0001C0
00000000 00000000 00000000 00000000 00000000 00000000 00000000 00000000 ................................ 0001E0

Dump of file SATURN:[PCCOMMON.DUMP.DLL]DAMERGE.TMP;1 on 18-APR-1990 10:42:05.48
File ID (575,19,0)   End of file block 101 / Allocated 104

Virtual block number 93 (0000005D), 512 (0200) bytes

00000000 00000000 00000000 00000000 00000000 00000000 00000000 00000000 ................................ 000000
00000000 00000000 00000000 00000000 00000000 00000000 00000000 00000000 ................................ 000020
00000000 00000000 00000000 00000000 00000000 00000000 00000000 00000000 ................................ 000040
00000000 00000000 00000000 00000000 00000000 00000000 00000000 00000000 ................................ 000060
00000000 00000000 00000000 00000000 00000000 00000000 00000000 00000000 ................................ 000080
00000000 00000000 00000000 00000000 00000000 00000000 00000000 00000000 ................................ 0000A0
00000000 00000000 00000000 00000000 00000000 00000000 00000000 00000000 ................................ 0000C0
00000000 00000000 00000000 00000000 00000000 00000000 00000000 00000000 ................................ 0000E0
00000000 00000000 00000000 00000000 00000000 00000000 00000000 00000000 ................................ 000100
00000000 00000000 00000000 00000000 00000000 00000000 00000000 00000000 ................................ 000120
00000000 00000000 00000000 00000000 00000000 00000000 00000000 00000000 ................................ 000140
00000000 00000000 00000000 00000000 00000000 00000000 00000000 00000000 ................................ 000160
00000000 00000000 00000000 00000000 00000000 00000000 00000000 00000000 ................................ 000180
00000000 00000000 00000000 00000000 00000000 00000000 00000000 00000000 ................................ 0001A0
00000000 00000000 00000000 00000000 00000000 00000000 00000000 00000000 ................................ 0001C0
00000000 00000000 00000000 00000000 00000000 00000000 00000000 00000000 ................................ 0001E0
```

```
Dump of file SATURN:[PCCOMMON.DUMP.DLL]DAMERGE.TMP;1 on 18-APR-1990 10:42:05.48
File ID (575,19,0)   End of file block 101 / Allocated 104

Virtual block number 94 (0000005E), 512 (0200) bytes

00000000 00000000 00000000 00000000 00000000 00000000 00000000 00000000 ................................ 000000
00000000 00000000 00000000 00000000 00000000 00000000 00000000 00000000 ................................ 000020
00000000 00000000 00000000 00000000 00000000 00000000 00000000 00000000 ................................ 000040
00000000 00000000 00000000 00000000 00000000 00000000 00000000 00000000 ................................ 000060
00000000 00000000 00000000 00000000 00000000 00000000 00000000 00000000 ................................ 000080
00000000 00000000 00000000 00000000 00000000 00000000 00000000 00000000 ................................ 0000A0
00000000 00000000 00000000 00000000 00000000 00000000 00000000 00000000 ................................ 0000C0
00000000 00000000 00000000 00000000 00000000 00000000 00000000 00000000 ................................ 0000E0
00000000 00000000 00000000 00000000 00000000 00000000 00000000 00000000 ................................ 000100
00000000 00000000 00000000 00000000 00000000 00000000 00000000 00000000 ................................ 000120
00000000 00000000 00000000 00000000 00000000 00000000 00000000 00000000 ................................ 000140
00000000 00000000 00000000 00000000 00000000 00000000 00000000 00000000 ................................ 000160
00000000 00000000 00000000 00000000 00000000 00000000 00000000 00000000 ................................ 000180
00000000 00000000 00000000 00000000 00000000 00000000 00000000 00000000 ................................ 0001A0
00000000 00000000 00000000 00000000 00000000 00000000 00000000 00000000 ................................ 0001C0
00000000 00000000 00000000 00000000 00000000 00000000 00000000 00000000 ................................ 0001E0

Dump of file SATURN:[PCCOMMON.DUMP.DLL]DAMERGE.TMP;1 on 18-APR-1990 10:42:05.48
File ID (575,19,0)   End of file block 101 / Allocated 104

Virtual block number 95 (0000005F), 512 (0200) bytes

00000000 00000000 00000000 00000000 00000000 00000000 00000000 00000000 ................................ 000000
00000000 00000000 00000000 00000000 00000000 00000000 00000000 00000000 ................................ 000020
00000000 00000000 00000000 00000000 00000000 00000000 00000000 00000000 ................................ 000040
00000000 00000000 00000000 00000000 00000000 00000000 00000000 00000000 ................................ 000060
00000000 00000000 00000000 00000000 00000000 00000000 00000000 00000000 ................................ 000080
00000000 00000000 00000000 00000000 00000000 00000000 00000000 00000000 ................................ 0000A0
00000000 00000000 00000000 00000000 00000000 00000000 00000000 00000000 ................................ 0000C0
00000000 00000000 00000000 00000280 13A80000 00000000 00000000 00000000 ................................ 0000E0
00000000 00000000 00000000 00000000 00000000 00000000 81818101 00000001 ................................ 000100
00000000 00000000 00000000 00000000 00000000 00000000 00000000 00000000 ................................ 000120
00000000 00000000 00000000 00000000 00000000 00000000 00000000 00000000 ................................ 000140
00000000 00000000 00000000 00000000 00000000 00000000 00000000 00000000 ................................ 000160
00000000 00000000 00000000 00000000 00000000 00000000 00000000 00000000 ................................ 000180
00000000 00000000 00000000 00000000 00000000 00000000 00000000 00000000 ................................ 0001A0
00000000 00000000 00000000 00000000 00000000 00000000 00000000 00000000 ................................ 0001C0
00000000 00000000 00000000 00000000 00000000 00000000 00000000 00000000 ................................ 0001E0

Dump of file SATURN:[PCCOMMON.DUMP.DLL]DAMERGE.TMP;1 on 18-APR-1990 10:42:05.48
File ID (575,19,0)   End of file block 101 / Allocated 104

Virtual block number 96 (00000060), 512 (0200) bytes

0A0A0A0A 0A0A0A0A 0A0A0A0A 0A0A0A0A 0A0A0A0A 0A0A0A0A 0A0A0A00 00000000 ................................ 000000
0A0A0A0A 0A0A0A0A 0A0A0A0A 0A0A0A0A 0A0A0A0A 0A0A0A0A 0A0A0A0A 0A0A0A0A ................................ 000020
0A0A0A0A 0A0A0A0A 0A0A0A0A 0A0A0A0A 0A0A0A0A 0A0A0A0A 0A0A0A0A 0A0A0A0A ................................ 000040
0A0A0A0A 0A0A0A0A 0A0A0A0A 0A0A0A0A 0A0A0A0A 0A0A0A0A 0A0A0A0A 0A0A0A0A ................................ 000060
0A0A0A0A 0A0A0A0A 0A0A0A0A 0A0A0A0A 0A0A0A0A 0A0A0A0A 0A0A0A0A 0A0A0A0A ................................ 000080
0A0A0A0A 0A0A0A0A 0A0A0A0A 0A0A0A0A 0A0A0A0A 0A0A0A0A 0A0A0A0A 0A0A0A0A ................................ 0000A0
0A0A0A0A 0A0A0A0A 0A0A0A0A 0A0A0A0A 0A0A0A0A 0A0A0A0A 0A0A0A0A 0A0A0A0A ................................ 0000C0
0A0A0A0A 0A0A0A0A 0A0A0A0A 0A0A0A0A 0A0A0A0A 0A0A0A0A 0A0A0A0A 0A0A0A0A ................................ 0000E0
00000000 00000000 00000000 00000000 00000000 00000000 0000000A 0A0A0A0A ................................ 000100
00000000 00000000 00000000 00000000 00000000 00000000 00000000 00000000 ................................ 000120
00000000 00000000 00000000 00000000 00000000 00000000 00000000 00000000 ................................ 000140
00000000 00000000 00000000 00000000 00000000 00000000 00000000 00000000 ................................ 000160
00000000 00000000 00000000 00000000 00000000 00000000 00000000 00000000 ................................ 000180
00002000 00000000 00000000 00000000 00000000 00000000 00000000 00000000 ................................ 0001A0
00000000 00000000 00000000 00000000 00000000 00000000 00000000 00000000 ................................ 0001C0
0000009E 269C0000 00580090 00000000 00000000 00000000 00000000 00000000 ......................X....&.... 0001E0
```

Dump of file SATURN:[PCCOMMON.DUMP.DLL]DAMERGE.TMP;1 on 18-APR-1990 10:42:05.48
File ID (575,19,0)   End of file block 101 / Allocated 104

Virtual block number 97 (00000061), 512 (0200) bytes

```
00000000 FFFF1CD6 1CCC0000 00000000 00001CCA FFFF1CC4 347C1C8C 129F0000 ....¥.|44...ò.........ä.ø....... 000000
676E6974 616F6C'6 20200A00 48544140 203A00FD 3E3E4753 4D4E3C3C 00000000 ....<<NMSG>>».: MATH..· floating 000020
76696400 67000A00 64696C61 766E6900 6500203A 726F7272 6520746E 696F702D -point error: .e.invali. ..g.div 000040
20686361 7473006E 000A0077 6F6C6672 65766F00 68000A00 30207962 20656469 ide by 0...h.overflow...n.stack  000060
65746172 656E6567 20796C74 6963696C 70786500 70000A00 776F6C66 7265766F overflow...p.explicitly generate 000080
000A0077 6F6C6672 65766F20 68636174 7320200A 00303030 36520000 000A0064 d.....R6000..- stack overflow... 0000A0
0A003020 79622065 64697669 64207265 6765746E 6920200A 00333030 36520003 ..R6003..- integer divide by 0.. 0000C0
726F6620 65636170 73206867 756F6E65 20746F6E 20200A00 38303036 52000800 ...R6008..- not enough space for 0000E0
756F6E65 20746F6E 20200A00 39303036 52000900 0A007374 6E656075 67726120  arguments.....R6009..- not enou 000100
000A0000 FC000A00 746E656D 6E6F7269 766E6520 726F6620 65636170 73206867 gh space for environment...=.... 000120
6F6C6620 2D0A0032 30303652 00020020 726F7272 65206560 6974206E 757200FF ..run-time error ...R6002..- flo 000140
00020003 FFFFFF00 0A006465 64616F6C 20746F6E 20746E69 6F702067 6E697461 ating point not loaded.......... 000160
00000000 00000000 00000000 000C1980 00020000 000807C2 00020000 00091CC8 à.......ò....... ............... 000180
2C656061 6E206C65 646F6020 61746164 20656372 756F7320 65685471 00010352 R...qThe source data model name, 0001A0
7463656C 65732065 7361656C 5020202E 676E6F6C 206F6F74 20736920 2C732520  %s, is too long.  Please select 0001C0
6C206568 7420606F 7266206C 65646F6D 20617461 64206563 72756F73 206E6120  an source data model from the l 0001E0
```

Dump of file SATURN:[PCCOMMON.DUMP.DLL]DAMERGE.TMP;1 on 18-APR-1990 10:42:05.48
File ID (575,19,0)   End of file block 101 / Allocated 104

Virtual block number 98 (00000062), 512 (0200) bytes

```
6372756F 73206568 5480002E 736C6564 6F6D2065 76697463 6120666F 20747369 ist of active models...The sourc 000000
20736E69 61746E6F 63202C73 25202C65 6D616E20 6C65646F 6D206174 61642065 e data model name, %s, contains  000020
656C6573 20657361 656C5020 202E7372 65746361 72616863 2064696C 61766E69 invalid characters.  Please sele 000040
20656874 20606F72 66206C65 646F6020 61746164 20656372 756F7320 61207463 ct a source data model from the  000060
72756F73 20656854 78002E73 6C65646F 6D206576 69746361 20666F20 7473696C list of active models..xThe sour 000080
20746F6E 20736168 202C7325 202C6560 616E206C 65646F6D 20617461 64206563 ce data model name, %s, has not  0000A0
6F732061 20746365 6C657320 65736165 6C502020 2E646564 616F6C20 6E656562 been loaded.  Please select a so 0000C0
666F2074 73696C20 65687420 6D726F66 206C6564 6F6D2061 74616420 65637275 urce data model form the list of 0000E0
20656372 756F7320 676E6967 72654D4F 002E736C 65646F6D 20657669 74636120  active models..OMerging source  000100
6D206174 61642074 65677261 74206F74 6E692073 25206C65 646F6020 61746164 data model %s into target data m 000120
002E6465 676E6168 636E7520 6562206C 6C697720 73252020 2E732520 6C65646F odel %s.  %s will be unchanged.. 000140
6E692073 25206C65 646F6020 61746164 20656372 756F7320 676E6967 72654D3D =Merging source data model %s in 000160
4520002E 7325202C 6C65646F 6D206174 61642065 76697463 61206568 74206F74 to the active data model, %s.. E 000180
22002E73 6C65646F 6D206174 61642067 6E696772 6560203E 64253C20 726F7272 rror <%d> merging data models.." 0001A0
25206F74 6E69206C 65646F6D 20617461 64206465 7463656C 65732065 6772654D Merge selected data model into % 0001C0
666F7270 20676E69 74746553 1D007365 756C6156 65677265 4D656B61 46100073 s..FakeMergeValues..Setting prof 0001E0
```

Dump of file SATURN:[PCCOMMON.DUMP.DLL]DAMERGE.TMP;1 on 18-APR-1990 10:42:05.48
File ID (575,19,0)   End of file block 101 / Allocated 104

Virtual block number 99 (00000063), 512 (0200) bytes

```
6F206F6E 20657261 20657265 68543900 7325206E 69207365 756C6176 20656C69 ile values in %s.9There are no o 000000
74636120 65687420 68746977 20656772 6560206F 7420736C 65646F60 206E6570 pen models to merge with the act 000020
00000000 00000000 00000000 01000100 01000100 01002E6C 65646F60 20657669 ive model....................... 000040
00010001 00010001 00010001 00010001 00677360 2E677360 67726061 64000352 R..damrgmsg.msg................. 000060
00000000 FFFF0001 000E0352 00000155 00000001 00010001 00010001 00010001 ................U...R........... 000080
00000000 0121FFFF 012C0067 00BD003F 007E1400 019000FE 00220001 00000007 ......".±.....-.?.§.g.,...!..... 0000A0
00000000 0000FFFF FFFF014A 00080060 00590005 80010001 0125000F 00050000 ......X.......Y.m...J........... 0000C0
00050000 00000000 FFFFFFFF 01400008 00A5004D 00078002 000C0135 00000006 ....5.......M.E...@............. 0000E0
00000007 00000000 0000FFFF FFFF0154 00090069 003B0005 80010001 0136000E ..6.......;.i...T............... 000100
01460002 00030000 00000000 FFFFFFFF 01360020 00AA0019 00058002 00000145 E.......... . .6..............F. 000120
04000149 00060003 00000000 0000FFFF FFFF015E 000C0026 0005001A 80030000 ........&...^...............I... 000140
80020100 01500004 00030000 00000000 FFFFFFFF 0168000C 00260005 004A8002 ..J...&...h...............P..... 000160
6020522D 45206563 72756F73 20656772 6540FFFF FFFF0172 000C0026 0005007A z...&...r.....Merge source E-R m 000180
6E204044 20656372 756F5300 00000300 74656772 6174206F 746E6920 6C65646F odel into target.....Source DM n 0001A0
006C6563 6E614300 4B4F0000 736C6564 6F6D2040 44206E65 704F0000 3A656061 ame:..Open DM models..OK.Cancel. 0001C0
00000000 FFFF0001 000E0352 00000235 00000000 00000000 00000000 706C6548 Help............5...R........... 0001E0
```

```
Dump of file SATURN:[PCCOMMON.DUMP.DLL]DAMERGE.TMP;1 on 18-APR-1990 10:42:05.48
File ID (575,19,0)   End of file block 101 / Allocated 104

Virtual block number 100 (00000064), 512 (0200) bytes

 00000000 012AFFFF 010200AC 00E9001F 00401400 0190011C 00000001 00000008 ..............a...O.¯.....*..... 000000
 00000000 0000FFFF FFFF0101 00400000 00630000 80014001 012E0087 00050000 .........a....c.A.a............. 000020
 00030000 00000000 FFFFFFFF 01030037 00000024 00008001 000201B6 001C0005 ....A.......$.A.7............... 000040
 001E0003 00000000 0000FFFF FFFF0104 000A0098 0043001C 80020004 01D3001C ..A.......C..................... 000060
 020F0016 00030000 00000000 FFFFFFFF 0105000A 00970037 001B8002 000401F0 Þ.......7....................... 000080
 04000226 00020003 00000000 0000FFFF FFFF0106 000A0076 002A001B 80020004 ......*.v....................&... 0000A0
 80020000 02290006 00030000 00000000 FFFFFFFF 01070000 0026000C 00¿ 9002 ..+...&....................)..... 0000C0
 009F8002 01000230 00040003 00000000 0000FFFF FFFF0109 00000026 000C )65 e...&....................0....... 0000E0
 6F530000 00030072 6F736976 64412065 6772654D FFFFFFFF 01080000 00260J00 ..&.........Merge Advisor.....So 000100
 616E616C 70786520 676E6F6C 202C676E 6F6C2079 6C626964 6572636E 6920656D me incredibly long, long explana 000120
 6F206573 61632065 6874206E 69206F64 206F7420 74616877 20666F20 6E6F6974 tion of what to do in the case o 000140
 61202C65 73756665 72207473 756A2074 61687420 73657079 74726570 75732066 f supertypes that just refuse, a 000160
 6D207427 6E6F6420 6E69616C 70207473 756A202C 7364726F 77207265 68746F6E nother words, just plain don't m 000180
 6F697470 6F206E6F 6974756C 6F736572 20657079 74726570 75530021 68637461 atch!.Supertype resolution optio 0001A0
 00657079 74726570 75732073 61206563 72756F73 7E207765 6E206573 5500736E ns.Use new ~source as supertype. 0001C0
 44006570 79747265 70757320 74656772 61747E20 676E6974 73697865 20657355 Use existing ~target supertype.D 0001E0

Dump of file SATURN:[PCCOMMON.DUMP.DLL]DAMERGE.TMP;1 on 18-APR-1990 10:42:05.48
File ID (575,19,0)   End of file block 101 / Allocated 104

Virtual block number 101 (00000065), 512 (0200) bytes

 006C6563 6E614300 484F0065 70797462 75732061 20656861 6D20746F 6E7E206F o ~not make a subtype.OK.Cancel. 000000
 00000000 00000000 00000000 00000000 00000000 00000000 00003C00 706C6548 Help.<.......................... 000020
 00000000 00000000 00000000 00000000 00000000 00000000 00000000 00000000 ................................ 000040
 00000000 00000000 00000000 00000000 00000000 00000000 00000000 00000000 ................................ 000060
 00000000 00000000 00000000 00000000 00000000 00000000 00000000 00000000 ................................ 000080
 00000000 00000000 00000000 00000000 00000000 00000000 00000000 00000000 ................................ 0000A0
 00000000 00000000 00000000 00000000 00000000 00000000 00000000 00000000 ................................ 0000C0
 00000000 00000000 00000000 00000000 00000000 00000000 00000000 00000000 ................................ 0000E0
 00000000 00000000 00000000 00000000 00000000 00000000 00000000 00000000 ................................ 000100
 00000000 00000000 00000000 00000000 00000000 00000000 00000000 00000000 ................................ 000120
 00000000 00000000 00000000 00000000 00000000 00000000 00000000 00000000 ................................ 000140
 00000000 00000000 00000000 00000000 00000000 00000000 00000000 00000000 ................................ 000160
 00000000 00000000 00000000 00000000 00000000 00000000 00000000 00000000 ................................ 000180
 00000000 00000000 00000000 00000000 00000000 00000000 00000000 00000000 ................................ 0001A0
 00000000 00000000 00000000 00000000 00000000 00000000 00000000 00000000 ................................ 0001C0
 00000000 00000000 00000000 00000000 00000000 00000000 00000000 00000000 ................................ 0001E0

Dump of file SATURN:[PCCOMMON.DUMP.DLL]DAMERROR.TMP;1 on 18-APR-1990 10:42:18.73
File ID (577,10,0)   End of file block 2 / Allocated 4

Virtual block number 1 (00000001), 512 (0200) bytes

 00000000 00000040 00000000 00000088 0000FFFF 00080004 00000002 00445A4D MZD.............¦........a....... 000000
 00000080 00000000 00000000 00000000 00000000 00000000 00000000 00000000 ................................ 000020
 6F6E6E61 63206D61 72676F72 70207369 685421CD 4C01B821 CD09B400 0EBA1F0E ..¤..Ç.ë|¦.L!This program canno 000040
 00000000 00000024 0A0D0D2E 65646F6D 20534F44 206E6920 6E757220 65622074 t be run in DOS mode....$....... 000060
 00000003 00000000 00000000 00000400 0003800A 18CC3971 001A00CC 0505454E NE..Ì...q9Ì..................... 000080
 00000000 00000000 00010000 00040000 00000166 00CC00CC 00580058 00400017 ..a.X.X.Ì.Ì.f................... 0000A0
 6F727265 6D616408 01030E01 00000000 007A0F00 007A001C 002C0F00 002B0018 ..+...,...z...z..........damerro 0000C0
 0002474F 4C45534F 4C434D41 44080001 474E4952 5453474F 4C4D4144 0C000072 r...DAMLOGSTRING...DAMCLOSELOG.. 0000E0
 54534D4F 5246474F 4C455449 52574D41 44150003 474F4C45 54495257 4D414408 .DAMWRITELOG...DAMWRITELOGFROMST 000100
 440A0005 5252455F 4C4D445F 524F5F44 45544345 5058454E 55150004 474E4952 RING...UNEXPECTED_OR_DML_ERR...D 000120
 01000003 01010033 03000003 00630300 19030204 00000647 4F4C4E45 504F4D41 AMOPENLOG.........c.....3....... 000140
 00000000 00006666 75745320 726F7272 45206174 654D2041 44130000 004C0302 ..L....DA Meta Error Stuff...... 000160
 B80006E9 0009E906 46880009 E903748E B9067E81 D88EFFFF B81E5657 000000C8 È...WV.¦...Ä.~.¿.t.Ö...F.Ö..Ö..¦ 000180
 00000000 00000000 00000000 00000300 08000200 0102CAC9 5F5E1F00 00E98EB8 ¸.Ö...^_ÉÊ...................... 0001A0
 1E565700 0000C800 04CAC95F 5E1F0000 E9000088 D88EFFFF B81E5657 000000C8 È...WV.¯|...Ä¦..Ö...^_ÉÊ..È...WV. 0001C0
 B8D88E00 21B81E56 57000000 C8CBC95F 5E1F0000 E900088A 0004B8D8 8E002988 ¦)..Ä¦..¤..Ö...^_ÉËÈ...WV.¦!..Ä¦ 0001E0
```

```
Dump of file SATURN:[PCCOMMON.DUMP.DLL]DAMERROR.TMP;1 on 18-APR-1990 10:42:18.73
File ID (577,10,0)   End of file block 2 / Allocated 4

Virtual block number 2 (00000002), 512 (0200) bytes

5E1F0000 E9000088 D88E0038 B81E5657 000000C8 0004CAC9 5F5E1F00 00E90000 ..Ô...^_èò..à...WV.|;..Ä|..Ô...^ 000000
00680002 0001CBC5 5F5E1F00 00E90000 B8D88E00 54B81E56 57000000 CBCBC95F _èuà...WV.|T..Ä|..Ô...^_èù....k. 000020
00000000 00000000 00000000 00000000 00000000 00000000 00000000 00000003 ................................ 000040
00000000 00000000 00000000 00000000 00000000 00000000 00000000 00000000 ................................ 000060
00000000 00000000 00000000 00000000 00000000 00000000 00000000 00000000 ................................ 000080
00000000 00000000 00000000 00000000 00000000 00000000 00000000 00000000 ................................ 0000A0
00000000 00000000 00000000 00000000 00000000 00000000 00000000 00000000 ................................ 0000C0
00000000 00000000 00000000 00000000 00000000 00000000 00000000 00000000 ................................ 0000E0
00000000 00000000 00000000 00000000 00000000 00000000 00000000 00000000 ................................ 000100
00000000 00000000 00000000 00000000 00000000 00000000 00000000 00000000 ................................ 000120
00000000 00000000 00000000 00000000 00000000 00000000 00000000 00000000 ................................ 000140
00000000 00000000 00000000 00000000 00000000 00000000 00000000 00000000 ................................ 000160
00000000 00000000 00000000 00000000 00000000 00000000 00000000 00000000 ................................ 000180
00000000 00000000 00000000 00000000 00000000 00000000 00000000 00000000 ................................ 0001A0
00000000 00000000 00000000 00000000 00000000 00000000 00000000 00000000 ................................ 0001C0
00000000 00000000 00000000 00000000 00000000 00000000 00000000 00000000 ................................ 0001E0

Dump of file SATURN:[PCCOMMON.DUMP.MSG]DAMRGMSG.MSG;1 on 18-APR-1990 10:53:57.93
File ID (981,15,0)   End of file block 2 / Allocated 4

Virtual block number 1 (00000001), 512 (0200) bytes

25000000 00000000 00000000 00000000 01000100 0353454D 00464753 4D4B40FF .MKMSGF.MES....................% 000000
69746E65 20732731 25206C65 646F6D20 65637275 6F732065 68544902 74015800 .X.t.IThe source model %1's enti 000020
20657079 74726570 7573206F 74206465 7463656E 6E6F6320 73692032 25207974 ty %2 is connected to supertype  000040
2C352520 79746974 6E652073 27342520 2E312520 6E692033 25207974 69746E65 entity %3 in %1. %4's entity %5, 000060
65677265 6D207369 68742066 6F207974 69746E65 20746567 72617420 65687420  the target entity of this merge 000080
69746E65 20657079 74726570 7573206F 74206465 7463656E 6E6F6320 7369202C , is connected to supertype enti 0000A0
61206E61 2065736F 6F686320 65736165 6C502020 2E342520 6E692036 25207974 ty %6 in %4.  Please choose an a 0000C0
74204B4F 20737365 72702064 6E61206E 6F697463 61206574 61697270 6F727070 ppropriate action and press OK t 0000E0
20322520 73273125 20666F20 65677265 6D206568 74206574 656C706D 6F63206F o complete the merge of %1's %2  000100
63206F74 204C4543 4E414320 73736572 5020202E 36252073 27352520 68746977 with %5's %6.  Press CANCEL to c 000120
756F7320 65685449 0A002E65 67726560 206C6564 6F6D2065 6874206C 65636E61 ancel the model merge...IThe sou 000140
20746F6E 20736920 32252079 7469746E 65207327 3125206C 65646F6D 20656372 rce model %1's entity %2 is not  000160
20797469 746E6520 65707974 72657075 73206120 6F742064 65746365 6E6E6F63 connected to a supertype entity  000180
79746974 6E652073 27332520 6C65646F 6D207465 67726154 20202E31 25206E69 in %1.  Target model %3's entity 0001A0
6E652065 70797472 65707573 206F7420 64657463 656E6E6F 63207369 20342520  %4 is connected to supertype en 0001C0
6F727070 61206E61 2065736F 6F686320 65736165 6C502020 2E352520 79746974 tity %5.  Please choose an appro 0001E0

Dump of file SATURN:[PCCOMMON.DUMP.MSG]DAMRGMSG.MSG;1 on 18-APR-1990 10:53:57.93
File ID (981,15,0)   End of file block 2 / Allocated 4

Virtual block number 2 (00000002), 512 (0200) bytes

6F63206F 74204B4F 20737365 72702064 6E61206E 6F697463 61206574 61697270 priate action and press OK to co 000000
68746977 20322520 73273125 20666F20 65677265 6D206568 74206574 656C706D mplete the merge of %1's %2 with 000020
65636E61 63206F74 204C4543 4E414320 73736572 5020202E 35252073 27342520  %4's %5.  Press CANCEL to cance 000040
20656372 756F7320 65685449 0A002E65 67726560 206C6564 6F6D2065 6874206C l the model merge...IThe source  000060
65746365 6E6E6F63 20736920 32252079 7469746E 65207327 3125206C 65646F6D model %1's entity %2 is connecte 000080
202E3125 206E6920 33252079 7469746E 65206570 79747265 70757320 6F742064 d to supertype entity %3 in %1.  0000A0
64657463 656E6E6F 6320746F 6E207369 20352520 79746974 6E652073 27342520  %4's entity %5 is not connected 0000C0
2065736F 6F686320 65736165 6C502020 2E657079 74726570 75732061 206F7420  to a supertype.  Please choose  0000E0
20737365 72702064 6E61206E 6F697463 61206574 61697270 6F727070 61206E61 an appropriate action and press  000100
73273125 20666F20 65677265 6D206568 74206574 656C706D 6F63206F 74204B4F OK to complete the merge of %1's 000120
204C4543 4E414320 73736572 5020202E 35252073 27342520 68746977 20322520  %2 with %4's %5.  Press CANCEL  000140
00000000 0A002E65 67726560 206C6564 6F6D2065 6874206C 65636E61 63206F74 to cancel the model merge....... 000160
00000000 00000000 00000000 00000000 00000000 00000000 00000000 00000000 ................................ 000180
00000000 00000000 00000000 00000000 00000000 00000000 00000000 00000000 ................................ 0001A0
00000000 00000000 00000000 00000000 00000000 00000000 00000000 00000000 ................................ 0001C0
00000000 00000000 00000000 00000000 00000000 00000000 00000000 00000000 ................................ 0001E0
```

```
Dump of file SATURN:[PCCOMMON.DUMP.DLL]DAMRIDFE.TMP;1 on 18-APR-1990 10:42:20.25
File ID (582,20,0)   End of file block 2 / Allocated 4

Virtual block number 1 (00000001), 512 (0200) bytes

00000000 00000040 00000000 000000B8 0000FFFF 00000004 00000002 001C5A4D MZ.............|........a....... 000000
00000080 00000000 00000000 00000000 00000000 00000000 00000000 00000000 ................................ 000020
6F6E6E61 63206D61 72676F72 70207369 685421CD 4C01B821 CD09B400 0EBA1F0E ..a..Ç.el|.LeiThis program canno 000040
00000000 00000024 0A0D0D2E 65646F6D 20534F44 206E6920 6E757220 65622074 t be run in DOS mode....$....... 000060
00010006 0000000C 00020000 00000000 00038009 5ACA72A6 000000CA 0505454E NE..ò...|ròZ.................... 000080
00000000 00000000 00010002 00040000 00000157 00C300C1 00780070 00400014 ..a.p.x.é.ù.W................... 0000A0
00040E21 00000000 00100F21 00020022 000F0F00 000F0020 007E0F00 007D0017 ..}...~. ......."...!.......!... 0000C0
66646972 6D616408 00030005 00020005 00A11EF1 00A10028 00751EF1 00750023 #.u.þ.u.+.À.þ.À..........damridf 0000E0
46444952 4D414412 0001474E 49525453 44414F4C 4644504C 45484144 12000065 e...DAHELPDFLOADSTRING...DAMRIDF 000100
0003464C 4553444F 4D484546 4449524D 41441000 02474E49 52545344 414F4C45 ELOADSTRING...DAMRIDFEHMODSELF.. 000120
20405020 322F534F 10000000 0003001C 03004D03 01034E49 57405005 00000100 .....PMWIN...M..........OS/2 PM  000140
0000068E D88EFFFF B81E5657 000000C8 00000000 00000000 45464449 52404144 DAMRIDFE........à...WV.|...À.... 000160
0000068E 006A006A D88E0008 B81E5657 000000C8 CBC95F5E 1F0000E9 0000A126 &À..Ô...^_èuà...WV.|...Àj.j..... 000180
0000C800 08CAC95F 5E1F0000 FFFF9A06 76FF0876 FF0A76FF 0C76FF00 0036FF26 &.6...v..v..v..v.......^_èò..à.. 0001A0
FF0876FF 0A76FF0C 76FF0000 36FF2600 00068E00 6A006AD8 8E0024B8 1E565700 .WV.|$..Àj.j.....&.6...v..v..v.. 0001C0
00009D00 01007301 03000000 03005500 02000208 CAC95F5E 1F000000 429A0676 v..B....^_èò.....U.......s...... 0001E0

Dump of file SATURN:[PCCOMMON.DUMP.DLL]DAMRIDFE.TMP;1 on 18-APR-1990 10:42:20.25
File ID (582,20,0)   End of file block 2 / Allocated 4

Virtual block number 2 (00000002), 512 (0200) bytes

00000000 00000000 00000400 02000200 01C80001 B81F0000 3E89088E FFFFB81E .|...À.>...|..ù................. 000000
69617274 736E6F63 20656D61 4E160352 00000000 00000004 00000002 0001FFFF ................R..Name constrai 000020
48230070 6C654820 3A07006D 726F4620 6C696174 65440C00 726F7272 6520746E nt error..Detail Form..: Help.#H 000040
72656820 73656F67 206D726F 46206C69 61746544 20726F66 2067736D 20706C65 elp msg for Detail Form goes her 000060
01000100 01000100 01000100 01000100 6F540300 20676E69 676E6168 430A0065 e..Changing ..To................ 000080
746F6E20 65727574 6165461C 00010352 00000000 00000000 00000000 01000100 ................R....Feature not 0000A0
43203A10 00726F72 7245204C 4D440A00 74657920 6465746E 656D656C 706D6920  implemented yet..DML Error..: C 0000C0
63617261 68632038 20312061 20726574 6E452B00 6E6F6974 61636966 6972616C larification.+Enter a 1-8 charac 0000E0
74726F70 78450700 74726F70 78652072 6F662065 6D616E20 656C6966 20726574 ter file name for export..Export 000100
01007265 6E696665 6420726F 6620726F 72726520 746E6961 7274736E 6F431D00 ..Constraint error for definer.. 000120
00000000 00000000 00000000 0000FF00 01000100 01000100 01000100 01000100 ................................ 000140
00000000 00000000 00000000 00000000 00000000 00000000 00000000 00000000 ................................ 000160
00000000 00000000 00000000 00000000 00000000 00000000 00000000 00000000 ................................ 000180
00000000 00000000 00000000 00000000 00000000 00000000 00000000 00000000 ................................ 0001A0
00000000 00000000 00000000 00000000 00000000 00000000 00000000 00000000 ................................ 0001C0
00000000 00000000 00000000 00000000 00000000 00000000 00000000 00000000 ................................ 0001E0

Dump of file SATURN:[PCCOMMON.DUMP.DLL]DANLS.TMP;1 on 18-APR-1990 10:42:21.78
File ID (583,24,0)   End of file block 35 / Allocated 36

Virtual block number 1 (00000001), 512 (0200) bytes

00000000 00000040 00000000 00000088 0000FFFF 00000004 00000023 00645A4D MZd.#...........|........a....... 000000
00000080 00000000 00000000 00000000 00000000 00000000 00000000 00000000 ................................ 000020
6F6E6E61 63206D61 72676F72 70207369 685421CD 4C01B821 CD09B400 0EBA1F0E ..a..Ç.el|.LeiThis program canno 000040
00000000 00000024 0A0D0D2E 65646F6D 20534F44 206E6920 6E757220 65622074 t be run in DOS mode....$....... 000060
00070005 00000000 00030DB8 00000400 0005800A 8CF79DD0 00250291 0505454E NE....X.À.%¥........|........... 000080
00000000 00000000 00010000 00040000 00000336 01680150 00680068 00400027 '.a.h.h.).k.6................... 0000A0
02000E01 00000000 19900F00 199000E4 000A0F00 000A0003 094A0F00 09490036 6.!....J.Æ.Ô...Ô.Ô............... 0000C0
414C5053 49445452 4F53534C 4E414416 0000736C 6E616405 3DA00F01 1C0A0284 .......=.danls...DANLSSORTDISPLA 0000E0
494D454D 414E5443 454A424F 4B434548 43534C4E 41441000 01454D41 4E594259 YBYNAME...DANLSCHECKOBJECTNAMEMI 000100
41441000 03454D41 4E535341 4C435445 47534C4E 41441100 02485447 4E454C4E NLENGTH...DANLSGETCLASSNAME...DA 000120
41441500 04485447 4E454C58 414D454D 414E5443 454A424F 4B434548 43534C4E NLSCHECKOBJECTNAMEMAXLENGTH...DA 000140
53454D41 4E534C4E 41441000 05454D41 4E594245 5551494E 5554524F 53534C4E NLSSORTUNIQUEBYNAME...DANLSNAMES 000160
434C4147 454C454D 414E4A42 4F4B4345 4843534C 4E41441B 0006504C 41555145 EQUALP...DANLSCHECKOBJNAMELEGALC 000180
414E5353 414C4352 4F4A424F 45544152 454E4547 534C4E41 441B0007 53524148 HARS...DANLSGENERATEOBJORCLASSNA 0001A0
0A000100 0009454D 414E5445 53504554 4152454E 4547534C 4E414415 0008454D ME...DANLSGENERATEPSETNAME...... 0001C0
50410F74 726F7362 70610753 4C4C4143 534F4408 00011900 EF008D00 70002200 .".p.§.y.....DOSCALLS.apbsort.AP 0001E0
```

Dump of file SATURN:[PCCOMMON.DUMP.DLL]DANLS.TMP;1 on 18-APR-1990 10:42:21.78
File ID (583,24,0)   End of file block 35 / Allocated 36

Virtual block number 2 (00000002), 512 (0200) bytes

```
4C455449 52574D41 440B726F 7272656D 61640859 41525241 4A424F54 524F5342 BSORTOBJARRAY.damerror.DAMWRITEL 000000
534D4F52 46474F4C 45544952 574D4144 15474E49 52545347 4F4C4D41 440C474F OG.DAMLOGSTRING.DAMWRITELOGFROMS 000020
136C6D64 03525245 5F4C4D44 5F524F5F 44455443 45505845 4E551547 4E495254 TRING.UNEXPECTED_OR_DML_ERR.dml. 000040
4C454946 59524555 514C4D44 00454C44 4E41484C 45444F4D 59524555 514C4D44 DMLQUERYMODELHANDLE.DMLQUERYFIEL 000060
55514C4D 4400314E 4C525952 4555514C 4D440C44 4C454946 5445534C 4D440844 D.DMLSETFIELD.DMLQUERYRLN1.DMLQU 000080
55454D41 4E4E5953 4E4F4E4B 43454843 4D41441C 6D616403 44494C4D 44595245 ERYDMLID.dam.DAMCHECKNONSYNNAMEU 0000A0
554C414E 4106454D 414E5443 454A424F 5445474D 41441053 53454E45 5551494E NIQUENESS.DAMGETOBJECTNAME.ANALU 0000C0
404F4345 4D414E54 554C414E 41113133 4F543132 454D414E 54554C41 4E411054 T.ANALUTNAME21T031.ANALUTNAMECOM 0000E0
00030704 0300C703 01030020 03020145 54495257 534F4408 4F495303 45524150 PARE.SIO.DOSWRITE...·....ú...... 000100
6175676E 614C2041 44230000 04E10302 ED0301A4 03035F03 01040000 03020100 .........._..É..Ú..Ã...#DA Langua 000120
00000000 00007974 696C616E 6F697463 6E754620 746E6564 6E657065 64206567 ge-dependent Functionality...... 000140
09E90375 003F8326 085EC400 00FFFF9A 0042681E D88EFFFF B81E5657 000000C8 à...WV.|...Á.hB......á^.&.?.u.Õ. 000160
E9037700 4B3D04C4 83007000 B69A5052 12568B10 46880006 E90E5688 0C468800 ..F..V.Õ...F..V.RP.Ñ.)..á.=K.w.Õ 000180
750E5639 0008E903 740C4639 12568B10 46880034 E9037400 3F832608 5EC40078 x.á^.&.?.t.Õ4..F..V.9F.t.Õ..9V.u 0001A0
83009E00 CE9A0C76 FF0E76FF 1076FF12 76FF486A 000107C7 26085EC4 001EE903 .Õ..á^.&ú...jK.v..v..v..v..ó.... 0001C0
FFFF00F8 9A505200 00FFFF9A 0060681E 0C76FF0E 76FF004B 47C6260C 5EC40AC4 á.á^.&ÓGK..v..v..h'......RP.%... 0001E0
```

Dump of file SATURN:[PCCOMMON.DUMP.DLL]DANLS.TMP;1 on 18-APR-1990 10:42:21.78
File ID (583,24,0)   End of file block 35 / Allocated 36

Virtual block number 3 (00000003), 512 (0200) bytes

```
0000E900 00880006 E98EB888 0006E903 7400067E 830000FF FF9A5052 990CC483 .á..RP......~..t.Õ..||.Õ..|..Õ.. 000000
26085EC4 00000011 9A007A68 1ED88E00 08B81E56 57000000 C8000ECA C95F5E1F .^_èò..à...WV.|...Á.hz......á^.& 000020
C4830142 00869A50 52125688 10468800 06E90E56 880C4688 0009E903 75003F83 .?.u.Õ...F..V.Õ...F..V.RP.Ñ.B..á 000040
03740C46 39125688 10468800 32E90374 003F8326 085EC400 8EE90372 00013D04 .=..r.Õ..á^.&.?.t.Õ2..F..V.9F.t. 000060
9A0C76FF 0E76FF10 76FF1276 FF000107 C726085E C4001CE9 03750E56 390008E9 Õ..9V.u.Õ..á^.&ú....v..v..v..v.. 000080
FF0E76FF 1676FF18 76FF1A76 FF1C76FF 1E76FF20 76FF2276 FF08C483 017B0056 V.(..á..v".v .v..v..v..v..v..v.. 0000A0
0CC48300 3500F89A 50520000 00959A00 98681E0C 76FF0E76 FFFFFF02 ED9A0C76 v..Ú....v..v..h.......RP.%.5..á. 0000C0
5F5E1F00 00E90000 B80006E9 8ECAB800 06E90374 00067E83 000000A7 9A505299 .RP.Ì....~..t.Õ..¡ò.Õ..|..Õ...^ 0000E0
C40001F6 46C70000 F446C700 00FA46C7 D88E00CF B81E5657 00000CC8 001ECAC9 èò..à...WV.|ü..ÀúF*..úF¶..úF~..Ã 000100
FC00B69A 50521256 88104688 0006E90E 56880C46 880009E9 0375003F 8326085E ^.&.?.u.Õ...F..V.Õ...F..V.RP.Ñ.= 000120
085EC400 4BE9037C FC4639FE 4688FC46 FF0003E9 0000FC46 C7FE4689 04C48300 ..á..F±úF=..Õ...F=.F±9F=|.ÕK.á^. 000140
4688008A 261076C4 FC5E8800 09E9008A 260C76C4 FC5E8800 0CE90375 003F8326 &.?.u.Õ...^=áv.&..Õ...^=áv.&...F 000160
880006E9 037500F4 7E83F446 8906C483 01650264 9A5098F8 468A5016 F64680F8 %.F-.P.F%.P.d.e..á..F¶.~¶.u.Õ... 000180
5F5E1F00 00E90000 B80006E9 8EC8B800 06E90375 00F67E83 FFA7E900 18E9F446 F¶Õ..Õl..-~.u.Õ..|à.Õ..|..Õ...^_ 0001A0
000EE903 75070197 87F60888 9806468A D88E01AC B81E5657 000000C8 000ECAC9 èò..à...WV.|¯..Á.F...Á-....u.Õ.. 0001C0
0000B800 0007C726 085EC400 17E99806 468A005A E9000088 000007C7 26085EC4 á^.&ú...|..ÕZ..F..Õ..á^.&ú...|.. 0001E0
```

Dump of file SATURN:[PCCOMMON.DUMP.DLL]DANLS.TMP;1 on 18-APR-1990 10:42:21.78
File ID (583,24,0)   End of file block 35 / Allocated 36

Virtual block number 4 (00000004), 512 (0200) bytes

```
75002030 FF09E903 7C00233D 0013E903 7E002430 0036E900 3FE98EC3 B80045E9 ÕE.|ú.Õ?.Õ6.=$.-.Õ..=#.|.Õ).= .u 000000
E9FFB6E9 0375005F 30FFBEE9 03750020 30FFC6E9 03750026 30FFDCE9 FFD9E903 .Õ).ÕÉ.=&.u.Õ6.=-.u.Õ/.=_.u.ÕÑ.Õ 000020
75124608 10468808 8E0¿5C88 1E565700 000CC8C8 C95F5E1F 0000E98E B888FFC1 è.|É.Õ...^_èùà...WV.|l..Ã.F..F.u 000040
F67E83F6 46890000 FFFF9A50 16F8468D 1076FF12 76FF1476 FF1676FF 002BF903 .Õ+..v..v..v..v..F%.P......F-.— 000060
76FF1276 FF1476FF 1676FFF8 46890E46 880006E9 002CE98E B9B80006 E903,¯00 .u.Õ..|¿.Õ,.Õ...F..F%.v..v..v..v 000080
C80012CA C95F5E1F 0000E902 2E05D49A 0676FF08 76FF0A76 FF0C76FF F876FF'0 ..v%.v..v..v..v..à...Õ...^_èò..à 0000A0
F983C888 0000FFFF 9A0676FF 0876FF0A 76FF0C76 FFD88E02 F5B81E56 57000000 ...WV.|%..Ã.v..v..v..v.......à.' 0000C0
46880646 8AD88E03 67B81E56 57000006 C80008CA C95F5E1F 0000E9D8 F7C01801 ..à%ÀÕ...^_èò..à...WV.|g..Ã.F..F 0000E0
00018800 0FE99808 468A0050 E9980646 8A00F846 C6FA4688 08468A00 FD46C6FC =óF»..F..F¯óF«..F..Õl..F..Õ..|.. 000100
75005F3D FFE1E903 75002030 FFE9E903 7500203D 001BE900 65E90000 B80068E9 Õk.|..Õe.Õ..= .u.ÕÕ.=-.u.ÕÃ.=_.u 000120
7400003D FE468908 C483010F 01789A50 16FC468D 5016FA46 80FFDCE9 FFD9E903 .Õ).ÕÉ..F'.P.F=.P.x.Õ..á..F±=..t 000140
03750020 30FF98E9 03750020 30001BE9 001EE900 00880024 E9000188 0006E903 .Õ..|..Õ$.|..Õ..Õ..= .u.Õ..=-.u. 000160
FFD88E03 97B81E56 57000006 C8C8C95F 5E1FFF89 E9FF88E9 0375005F 30FF93E9 Õ..=_.u.Õ..Õ¿..^_èùà...WV.|...Ã. 000180
0876FF00 7FE9FE46 880006E9 03750000 300000FF FF9A5016 FA468D06 76FF0876 v..v..F'.P.....=..u.Õ...F±Õ...v. 0001A0
46880006 E9037500 00300000 FFFF9A0A 76FF0C76 FF346AFA 76FFFC76 FF0676FF .v..v=.v'j4.v..v......=..u.Õ...f 0001C0
300008E9 03760015 E9037301 FA83022B 0788260A 5EC407FF 260A5EC4 0058E9FE ±ÕX.á^.&..á^.&..+@.'.s.Õ..v.Õ..= 0001E0
```

```
Dump of file SATURN:[PCCOMMON.DUMP.DLL]DANLS.TMP;1 on 18-APR-1990 10:42:21.78
File ID (583,24,0)   End of file block 35 / Allocated 36

Virtual block number 5 (00000005), 512 (0200) bytes

 0C76FF34 6AFA76FF FC76FF06 76FF0876 FF000007 C7260A5E C40008E9 0377869F ..w.Ö..á^.&ú....v..v..v=.v*j4.v. 000000
 C95F5E1F 0000E900 00880006 E9FE4688 0006E903 7500003D 0000FFFF 9A0A76FF .v......=..u.Ö...F±Ö..|..Ö...^_è 000020
 76FF1276 FF1476FF 0020E903 7510460B 0E4688D8 8E043B88 1E565700 000EC8C8 ùà...WV.|;..A.F...F.u.Ö·..v..v.¯v 000040
 E98EB988 0006E903 7500F27E 83F24689 0000FFFF 9A5016F6 4680106A 0E76FF10 ..v.j..F~.P......F·.~·.u.Ö..|¿.Ö 000060
 FF026AF6 76FFF876 FF1276FF 1476FFF8 5689F646 890C5688 0A468800 0CE900AB ¨.Ö...F..V..F~.V%.v..v..v%.v~j.. 000080
 1476FF50 16F44680 0075E98E 89880006 E9037500 00300000 04729A06 76FF0876 v..v..r...=..u.Ö..|¿.Öu  F¶.P.v. 0000A0
 E90000FF FF9AF276 FF000BE9 037500F2 7E83F246 8908C483 03530433 9A1276FF .v..3.S..á..F·.~·.u.Ö...\ .....Ö 0000C0
 004747C6 26065EC4 0008E903 7700473D 04C48305 AF00B69A 0676FF08 76FF004B K..v..v..Ñ.£..á.*G.w.Ö..á^.&6GG. 0000E0
 9A0676FF 0876FF50 16FA4680 0AC48305 C200F89A 5016FA46 80008568 1EF476FF .v¶.hç..F*.P.%.ò..á..F*.P.v..v.. 000100
 D88E04E9 881E5657 00005AC8 0010CAC9 5F5E1F00 00E90000 8808C483 03F40010 ..¶..á.|..Ö...^_èò..àZ..WV.|Ö..Ä 000120
 9A0676FF 0876FF06 76FF0876 FF08C483 06120056 9A5016AC 46800676 FF0876FF .v..v..F¯.P.V..¯.á..v..v..v..v.. 000140
 880006E9 03750000 3008C483 062E008C 9A5016AC 46800676 FF0876FF 0000FFFF .....v..v..F¯.P......á.=..u.Ö..| 000160
 C626065E C40008E9 03770018 3004C483 064C0086 9A0676FF 0876FF00 08E90000 ..ÖA..v..v..Ñ.L..á.=..w.Ö..á^.&ó 000180
 9A1476FF 1676FF50 16A8468D FE468904 C4830697 00869A06 76FF0876 FF001847 G...v..v..Ñ....á..F±.F´.P.v..v.. 0001A0
 5E88007F E9000005 7B9AA676 FF0008E9 037500A6 7E83A646 8908C483 05660433 3.f..á..fI.~I.u.Ö...vI.(...Ö...^ 0001C0
 16F8468D 0AC48306 AA00F89A 5016F846 80008868 1EA876FF 0000C626 0676C4FE ±áv.&ó...v´.h|..F%.P.%.¨..á..F%. 0001E0

Dump of file SATURN:[PCCOMMON.DUMP.DLL]DANLS.TMP;1 on 18-APR-1990 10:42:21.78
File ID (583,24,0)   End of file block 35 / Allocated 36

Virtual block number 6 (00000006), 512 (0200) bytes

 1076FF12 76FF1476 FF1676FF 0000AA46 C708C483 05880010 9A0676FF 0876FF50 P.v..v.......á.úF`...v..v..v..v. 000000
 00FFFF9A 006A5016 AA468006 76FF0876 FF0676FF 0876FF0A 76FF0C76 FF0E76FF .v..v..v..v..v..v..v..F`.Pj..... 000020
 5F5E1F00 00E90000 B8FF5DE9 0009E9A6 46880006 E903758E C0A67E81 A6468900 ..fI.-Ià.u.Ö...fIÖ..Öl.|..Ö...^_ 000040
 00067E83 01EEE9FE 4688FE46 890C4688 D88E05DC B81E5657 000002C8 0012CAC9 èò..à...WV.|É..Ä.F...F±.F±ÖY..-.¯ 000060
 B80003E9 00018800 06E90375 00067E83 501E00C6 B80003E9 00888800 06E90375 u.Ö..|É.Ö..|ó..P.~..u.Ö..|1.Ö..| 000080
 E9037500 067E8301 EAE910C4 83078E00 F89A0876 FF0A76FF 0005681E 501E0004 à..P.hf..v..v..%....á.Öõ..-..u.Ö 0000A0
 1E00EC88 0003E900 E8880006 E9037500 067E8350 1E00E188 0003E900 0AB80006 ..|Ö.Ö..|Ä..P.~..u.Ö..|Ö.Ö..|è.. 0000C0
 B80006E9 03750006 7E8301AD E910C483 07CB00F8 9A0876FF 0A76FF00 ED681E50 P.hÜ..v..v..%.ù..á.ÖÜ..-..u.Ö..| 0000E0
 681E501E 01158800 03E90112 B80006E9 03750006 7E83501E 01028800 03E900F2 ·.Ö..|...P.~..u.Ö..|..Ö..|...P.h 000100
 E9011B88 0006E903 7500067E 830170E9 10C48308 0800F89A 0876FF0A 76FF0116 ...v..v..%....á.Öp..-..u.Ö..|..Ö 000120
 FF013468 1E501E01 33880003 E9012F88 0006E903 7500067E 83501E01 25880003 ..|%..P.~..u.Ö..|/.Ö..|3..P.h4.. 000140
 B80003E9 01398800 06E90375 00067E83 0133E910 C4830845 00F89A08 76FF0A76 v..v..%.E..á.Ö3..-..u.Ö..|9.Ö..| 000160
 FF0A76FF 0145681E 501E0144 B80003E9 01418800 06E90375 00067E83 501E013D =..P.-..u.Ö..|A.Ö..|D..P.hE..v.. 000180
 1E0154B8 0003E901 4AB80006 E9037500 067E8300 F6E910C4 83088200 F89A0876 v..%....á.Ö-..-..u.Ö..|J.Ö..|T.. 0001A0
 9A0876FF 0A76FF01 62681E50 1E0161B8 0003E901 5EB80006 E9037500 067E8350 P.-..u.Ö..|^.Ö..|a..P.hb..v..v.. 0001C0
 7E83501E 016EB800 03E90167 B80006E9 03750006 7E830089 E910C483 088F00F8 %.¢..á.Ö¿..-..u.Ö..|g.Ö..|n..P.- 0001E0

Dump of file SATURN:[PCCOMMON.DUMP.DLL]DANLS.TMP;1 on 18-APR-1990 10:42:21.78
File ID (583,24,0)   End of file block 35 / Allocated 36

Virtual block number 7 (00000007), 512 (0200) bytes

 FC00F89A 0876FF0A 76FF0179 681E501E 01788800 03E90175 B80006E9 03750006 ..u.Ö..|u.Ö..|x..P.hy..v..v..%.= 000000
 7500067E 83501E01 85880003 E9017E88 0006E903 7500067E 83007CE9 10C48308 ..á.Ö|..~..u.Ö..|~.Ö..|...P.~..u 000020
 C48305EE 00F89A08 76FF0A76 FF019068 1E501E01 8F880003 E9018C88 0006E903 .Ö..|..Ö..|...P.h...v..v..%.Y..á 000040
 59071C09 1DA7FF2E 93C003FF EFE90376 00123D00 01200039 E9003CE9 003FE910 .Ö7.Ö<.Ö9.·..*..v.Öy..à...I....Y 000060
 04090409 04090409 04090409 04090409 04081009 04088A08 40070309 04079607 .....£.M........................ 000080
 05070C00 02000000 03075100 02000000 01066200 02000F08 CAC95F5E 1F08C709 .ú..^_èò.....b.......Q.......... 0000A0
 0404C402 03008800 04054602 0300F600 06060002 03007400 04044B02 03000000 .....R...t.......-...F........á.. 0000C0
 03017202 03002800 03000802 0300A200 04050C02 03010700 06037802 03009600 .....x............Ä...Ä...+...r.. 0000E0
 03067702 0300C100 05060002 03004400 03018402 0300AF00 04031602 03003700 .7.......£.......D...Ì...è...w.. 000100
 FF0C76FF D88EFFFF B81E5657 000000C8 00000000 00000000 00000000 00005A00 .Z...............à...WV.|...Ä.v.. 000120
 0000C800 08CAC95F 5E1F0000 E90000FF FF9AFFFF 68FFFF68 0676FF08 76FF0A76 v..v..v.h..h.......Ö...^_èò..à.. 000140
 0000001F 9A001C68 00196806 76FF0876 FF0A76FF 0C76FFD8 8E000888 1E565700 .WV.|...Ä.v..v..v..v.h..ñ....... 000160
 FF0C76FF 0676FF08 76FFD88E 0035B81E 56570000 9AC80008 CAC95F5E 1F0000E9 Ö...^_èò..à...WV.|5..Ä.v..v..v.. 000180
 76FF0046 E9824688 0006E903 7500003D 82468900 0000A09A 5016FF66 86800A76 v...f¯..P......Fý=..u.Ö...FýÖF..v 0001A0
 880006E9 03750000 30824689 0000FFFF 9A501684 46800E76 FF1076FF 0676FF08 ..v..v..v..FÇ.P......Fý=..u.Ö... 0001C0
 00880789 26125EC4 08C483FF FF01789A 5016FF66 86805016 B4468000 1FE98246 FýÖ...FÇ.P..f..P.x....á.á^.&..|. 0001E0
```

```
Dump of file SATURN:[PCCOMMON.DUMP.DLL]DANLS.TMP;1 on 18-APR-1990 10:42:21.78
File ID (583,24,0)   End of file block 35 / Allocated 36

Virtual block number 8 (00000008), 512 (0200) bytes

00C30002 00000002 00460002 000E0005 00790203 000690CB C95F5E1F 0000E900 .Ô...^_èù.....y...B...F.......ù. 000000
00000000 001200C2 004C0203 005A0002 00490005 00000005 00620002 00000003 ......b.......I...Z...L......... 000020
FFFFB9C0 33067EC4 1EDE88D7 88EC8855 00000000 00000000 00000000 00000000 ................U.$.m.B.á~.3à¿.. 000040
01C6F706 4688FE87 08468ED8 8EC08CF9 28D1F7AE F2FFFFB9 0A7EC4FF 7580AEF2 ·Ù.u.á~.¿...Ü%I+*.à.Ä.F...±.F.%ó. 000060
76C51EDE 88078BEC 8B55C850 C28C1FFA 8BF38BA4 F3C913A5 F3E90149 A4027400 .t.Ê1IÔµÊ.èµÊ.µ.*..ô]ùU.$.m.B.év 000080
13A5F3E9 D149A402 7401A8C7 88067EC4 D1F7AEF2 FFFFB9C0 33C08ED8 8CFE880A ..±.Á.à3à¿...Ü%Iá-..ú´.t.Ê1IÔµÊ. 0000A0
F2FFFFB9 C0330A7E C40676C5 1EDE88D7 88EC8855 CB5DC28C 1FFA8BF3 88A4F3C9 èµÊ.µ.*..ô]ùU.$.m.B.év.á~.3à¿..· 0000C0
C033067E C4D78BEC 885500CB 5DFA88F3 881FFFFF 10C01805 74A6F3F9 28D1F7AE Ü%I+*µIt..à.....µ.*]ù.U.$.má~.3á 0000E0
E30E4E8B DF880A76 C5067EC4 1E5657EC 885500CB 5DFA8891 49D1F7AE F2FFFFB9 ¿..·Ü%II..*]ù.U.$WV.á~.év..Ô.N.D 000100
46805657 000016C8 CB5DE588 5F5E1FC2 8CC388AA F3C032F8 E2AA0374 C00AACOC .¯.àt.¯à½2àµ¯.ù.ô.^_.I]ùà...WV.F 000120
89260856 88064688 420A47C6 26F85EC4 FE568CFC 46890E46 8DFA568C F84689EC $.F½.V*.F..F=.V±á^%Ë6G.B.F..V.&. 000140
9A53060A 76FF0C76 FFFC76FF 167FFF04 47C72602 57892607 89260857 89260647 G.&.W.&..&.W.&úG.....v=.v..v..S. 000160
89260247 8E2607FF 263F8826 C02A1278 044FFF26 F85EC4F0 880CC483 01600334 4.m..á..Þá^½&.O.x.*àÆ.?&..&.G.&. 000180
76C51ED6 88EC8855 CBC95F5E C68806C4 83FFFF01 BE9A006A 53FA76FF 900FEB05 .Š..v'Sj..ƒ....á..ó^_èùU.$.ø.év 0001A0
4104C102 20E180C9 1A1A3C41 2CF374E0 3A43278A 26AC2D74 C00AFFB0 065EC40A .á^.¯..àt-¯&.'C:Àtµ,A<..è.Ä .è.A 0001C0
08C800CB 5DF28B1F 98FF1CC0 1AD374C4 3A4104C1 0220E180 C91A1A3C 412CE086 .Á,A<..è.Ä .è.A:àtÆ.á.....·]ù.à. 0001E0

Dump of file SATURN:[PCCOMMON.DUMP.DLL]DANLS.TMP;1 on 18-APR-1990 10:42:21.78
File ID (583,24,0)   End of file block 35 / Allocated 36

Virtual block number 9 (00000009), 512 (0200) bytes

03E001C8 88F9F700 0CB99906 EA2DC388 FA4689E4 2A08478A 26085EC4 56570000 ..WVá^.&.G.*ô.F*.ù-ô..¿..¥*.à1Á. 000000
88200A4F 8026085E C40F7440 0A47F626 0774830A 47F626F8 4689120E 05E001C1 è1Á.B..F½&-G..t.&-G.ªt.á^.&.O. | 000020
802690E2 EB000004 47C72620 0A4F8026 0E74010A 47F62608 5EC49001 28E9FFFF ..Ô+..á^.&-G..t.&.O. &úG...Šã.&. 000040
9906EA2D C3884C75 0C0A47F6 26FC7689 F0880447 8926C028 EF0A6780 26020A4F O..&.g.ÿ+à&.G..Þ.v=&-G..uL.ù-ô.. 000060
087E810E 7402670A 7E810775 06F6087E 81377501 12DE87F6 06086BF9 F7000CB9 ¿..¥*kÄ.-.B..u7.-.-.u..-.g.t..-. 000080
0876FF0A 76FF0C75 C00802C4 83020A11 349AFA76 FF0F75FF FF0A7E81 16750702 ..u..-...u..v'.4.Ô..á..àu..v..v. 0000A0
87F60608 6BF9F700 ¯CB99906 EA2DC388 1575080A 47F62608 5EC404C4 830C51E8 ÒQ..á.á^.&-G..u..ù-ô..¿..¥*kÄ.-. 0000C0
88025789 26078926 ·0085788 26064788 2606772B 26378826 085E8867 7401120E 8..tg.^.&.7&+w.&.G.&.W.ª&..&.W.. 0000E0
8908C483 02F80F9C 9AFA76FF 0677FF26 5256167E F6080447 89264802 4588F87E -½.E.H&.G..--.VR&.W..v'...½..á.. 000100
085EC408 C4830318 0F5E9A53 006A006A 026A0F74 2018EF87 F6FA5E88 19E8FC46 F=Š..^*-.ÿ. t.j.j.j.S.^....á.á^. 000120
08C48301 420F9C9A FA76FF50 1606468D 560001BE 17E80788 2606468A 065FC426 &á..F.&..Š.ƒ..V.F..P.v'...B..á. 000140
88027111 589A000A 88EC8855 CBC95F5E E42A0646 8AFECCE9 0374FC76 39FC4689 .F=9v=t.Ôà±.F.*ô^_èùU.$|...X.q.| 000160
891C0CA3 08568806 46881C28 16891C26 A310568B 0E46881C 381E8C1C 36A31C3C <.É6...B..F..V.ÉÆ¯..(..F..V.É... 000180
011C3406 C7030BE9 037425F6 7E80038D E900001C 3006C700 001C3206 C71C0E16 ...ú.2...ú.0...Ô...--%t.Ô..ú.4.. 0001A0
06C71C24 A31C0AA3 1C10A31C 2AA31C2C A31C14A3 1C2EA31C 12A31C16 A3C02800 .+àÉ..É..É..É..É,.É*.É..É..É$.ú. 0001C0
3F80260A 5E88903E EB00301D 9C06C70A 46FF4975 30017F80 260A5EC4 00201D9C .. .á^.&...0uI.F.ú...0.$>..^.&.? 0001E0

Dump of file SATURN:[PCCOMMON.DUMP.DLL]DANLS.TMP;1 on 18-APR-1990 10:42:21.78
File ID (583,24,0)   End of file block 35 / Allocated 36

Virtual block number 10 (0000000A), 512 (0200) bytes

2A06FF1A 75001C16 3E830E75 203F8026 9028E800 001C2A06 C71C1606 FF00752B +u.....ú.*...$(.&.? u..>...u...* 000000
078A260A 5E880A46 FF1C2406 FFC77520 3F80260A 5EC400EB 1C0A06FF 9014EB1C .Š......Š.á^.&.?·uú..$..F..^.&.. 000020
468908C4 8308C7E8 0E1C3A68 1E0A76FF 0C76FFDD 75C00802 C4830978 E80E5098 .P.Òx..á..àuf.v..v..h:..Ôú..á..F 000040
3E830074 001C243E 831C3AA3 08F71C3A A11C2406 FF0C7D00 1C3A3E83 0C56890A ..V..>:..)...$.À:.%ÀÉ:..>$..t..> 000060
1E0A76FF 060A46FF 1C2C06FF 20752E3F 80260A5E C4002010 9C06C706 75301D9C ..Ou.ú... .á^.&.?.u-..,..F...v.. 000080
2C0EFF00 011C3406 C70A7D00 1C343E83 0C56890A 468908C4 83087BE8 0E1C3468 h4..Ô(..á..F..V..>4..).ú.4......, 0000A0
1C1406C7 0675006C 3D287400 68304074 004E3030 74004630 98078A26 0A5EC41C .á^.&...=f.t==N.t@=h.t+=l.u.ú... 0000C0
4EE91C75 003F8026 0A5EC40A 46FF0375 4C3F8026 0A5EC409 75001C14 3E830002 ...>...u.á^.&.?Lu..F.á^.&.?.u.ÔN 0000E0
46899807 8A26C8E8 00081C14 06C700EB 00101C14 06C708EB 00011C14 06C79002 ..ú.....ŠÀú.....ŠÀú.....Š&&....F 000100
78740069 30F8468B 20F84683 1C1206FF 08750058 3D057400 47300A74 00453DF8 ½=E.t.=G.t.=X.u......F½ .F½=i.tx 000120
3E839001 59E90140 E9037500 25300152 E9037E01 3FE90375 00633001 91E9037E -.Ô..=c.u.Ô?.-.ÔR.=X.u.Ôª.ÔY...> 000140
C4261C26 1EC400EB 00000247 C7260789 261C30A1 1FC4261C 261EC415 75021C14 ...u.á.&.&á.À0.&..&úG...Š.á.&.&á 000160
01B0E903 74001C30 3E830170 E9037500 1C323E83 041C2606 83078926 1C30A11F .À0.&....&...>2..u.Ôp..>0..t.Ô§. 000180
0A6A0000 1C0A06C7 1C2E06FF 01ACE9FF FF8801AF E9037520 0A47F626 1C0C1EC4 á...&-G. u.ÔÉ.|..Ô¯.....ú.....j. 0001A0
00041C34 06C71C2C 06FF1C12 06FF1C10 06FFF2E8 086A90C3 E802C483 019EE80E .Ô...á.Šù.j.Š·............ú.4... 0001C0
A128741C 3A0639FA 46891C14 A3C0287A 74011C14 3E830081 E9037508 1C143E83 .>...u.Ô...>...tz+àÉ...F*9.:.t(À 0001E0
```

```
Dump of file SATURN:[PCCOMMON.DUMP.DLL]DANLS.TMP;1 on 18-APR-1990 10:42:21.78
File ID (583,24,0)   End of file block 35 / Allocated 36

Virtual block number 11 (0000000B), 512 (0200) bytes

 C00B1C3A A1051C3A 2E839090 13EB0000 1C3A06C7 0A74001C 243E83FA 46891C3A :..F*.>$..t.ú.:...$.....:..À:..å 000000
 7E8302C4 83048DEB 0E3A6A02 C4830130 EB0E106A 021C2606 831C3AA3 C028027D ).+àÈ:...&..j..ÒO..á.j:.Ò...á..- 000020
 9007EB1C 3AA3C02B 027DC00B 1C3AA300 0520FA46 8B157400 1C243E83 227400FA *.t".>$..t..F*...È:..à).+àÈ:.$.. 000040
 3FE9106A FF10E9^2 1C260683 02C48300 F1EB0E10 6A041C26 2E830000 1C3A06C7 ú.:.....&..j..Òp..á...&..Ò..j.Ò? 000060
 0428EB0E 256AFF2A E90349E8 0EFB76FF F4EB016A 90FF39E9 026EEB0E 006A90FF ..j..Òn.Ò9..j.$¶.v%.ÒI.Ò*.j%.Ò(. 000080
 0A468809 74001C14 3E830A7E 00673005 7C006530 FF0CE903 75006430 90FF21E9 ÒI..=d.u.Ò..=e.|.=g.-Ò.>...t..F. 0000A0
 6F30FE80 E9037500 6E30903A EBFE5689 FC468940 0C56880A 46880A4E FF0C5688 .V..N..F..V.à.F=.V±$:.=n.u.Ò.±=o 0000C0
 03750078 30FEB9E9 03750075 308F7400 7330FEE0 E9037500 7030FEE4 E9037500 .u.Òò±=p.u.ÒÀ±=s.t.=u.u.Ò¿±=x.u. 0000E0
 EC75253C 0474C00A F6468807 8A26FC5E C4FC46FF 9034EB0A 46FF90B1 EBFF79E9 Òy.$Ý..F.$4..F=á^=&...F-.àt.<%u& 000100
 C40C5689 0A4689FE 568BFC46 8806C483 044CEB0E 0A76FF0C 76FF500A 4628C388 .Ù+F.P.v..v..ÒL..á..F=.V±.F..V.á 000120
 1C30A1FE 51E90374 200A47F6 261C0C1E C4FC63E9 0374C00A F6468807 8A260A5E ^.&...F-.àt.Òc=á...&-G. t.ÒQ±ÀO. 000140
 831C2E06 FF04740A 067E8300 201D9C06 C7067400 1C2C3E83 56570000 12C8CBC9 èùà...WV.>,..t.ú... ..~..t...... 000160
 0683FE56 89FC4689 02578826 0788261C 261EC419 75101C14 3E830774 021C143E >...t..>...u.á.&.&..&.W..F=.V±.. 000180
 1EC40EEB 0000FE46 C7FC4689 0788261C 261EC411 74001C2E 3E83902C EB041C26 &..$,..>...t.á.&.&...F=úF±..$.á. 0001A0
 0674FE46 0BFC4688 0E74001C 0A3E8302 1C260683 FE5689FC 46899907 8B261C26 &.&....F=.V±..&...>...t..F=.F±t. 0001C0
 83317500 1C2E3E83 F45689F2 46891C38 16881C36 A11D9AA3 C0289003 EB064688 .F.$..+àÈ..À6...8..F·.V¶.>...u1. 0001E0

Dump of file SATURN:[PCCOMMON.DUMP.DLL]DANLS.TMP;1 on 18-APR-1990 10:42:21.78
File ID (583,24,0)   End of file block 35 / Allocated 36

Virtual block number 12 (0000000C), 512 (0200) bytes

 00028308 F7FE5688 FC46882D 07C626F2 46FFF25E C410750A 067E8328 7D00FE7E -±.)+.-..u.á^·.F·&6.-.F=.V±%Ä.@. 000000
 76FFFA5E 8CF84689 1C188800 00F646C7 9006EB00 01F646C7 FE5689FC 46890AF7 %Ö.F=.V±úF-..$..úF-..¡...F%.^*.v 000020
 B69AF876 FFFA76FF 4574001C 2C3E830A C4830821 112A9AFC 76FFFE76 FF501E06 ..P.v±.v=.*.I..á..>,..tE.v*.v%.Ñ 000040
 0000109A 06C70675 081D9A3E 83007EC9 0BF04E89 C82B1C34 0E8B04C4 83033000 .*..á...4.+à.NÞ.è-..>...u.ú..... 000060
 120E8BF0 4E89F446 8CF27E89 F47FC008 49C18847 3005C626 05EBF27E C4F04E88 .NÞá-·$.&6.0G.èI.à.¶.-·.F¶.NÞ... 000080
 8026F846 FF46202C 80037C61 3C0774C9 0B048807 8A26F85E C4F276C5 EE5E8C1C ..^Ÿév·á^Ÿ&.....èt.<a|.., F.FŸ&. 0000A0
 F67E830B 741C2A06 0B1C16A1 1475001C 2E3E83EE 5EBEF45E 8CF27689 E375003F ?.uÐ.v·.^¶.^Ÿ.>...u.À....*.t..-- 0000C0
 00067E83 56570000 10C8CBC9 5F5E02C4 8302FFE8 0E50C028 02EB0001 88057500 .u.¡..$.+àP.Ò...á.^_èùà...WV.-.. 0000E0
 74081C14 3E83008F E9021C26 0683FA56 89F84689 1C281688 1C26A100 018E1874 t.ƒ..À&...(..F%.V*.¯&..Ò...>...t 000100
 4689FC46 89078826 1C261EC4 10EBFA56 89F84689 02578826 0788261C 261EC413 .á.&.&..&.W..F%.V*$.á.&.&...F=.F 000120
 7E83900A EB029B88 1575FA46 08F84688 0E74081C 143E8304 1C260683 FA5E8CF8 %.^*..&...>...t..F%.F*u.¡..$...- 000140
 741C2C36 39F62BF4 5689F246 89FA5688 F84688FA 5E8CF846 89029FB8 097500FC =.u.¡...F%.^*.F%.V*.F·.V¶+-96,.t 000160
 F25EC446 90EDEB10 7ECE3B46 1574003F 8026F246 FFF25EC4 900EEB1C 340E8B1C ...4.$..á^·.F·&.7.t.F;ö~.$Ù.Fá^· 000180
 FF5602C4 830159E8 0E570875 001C243E 83FE2B1C 3A3E88F3 75003F80 26F246FF .F·&.7.uµ.>:.+±.>$..u.W.ÒY..á.V. 0001A0
 90C8C95F 5E02C483 013CEB0E 57087400 1C243E83 06C48301 B3EB0EF8 76FFFA76 v*.v%.Ò*..á..>$..t.W.Ò<..á.^_èù. 0001C0
 EB01B005 7547067E 83067467 067E83FE 5689FC46 891C2816 881C26A1 000006C8 à...À&...(..F=.V±.-.gt..-.Gu¯.$ 0001E0

Dump of file SATURN:[PCCOMMON.DUMP.DLL]DANLS.TMP;1 on 18-APR-1990 10:42:21.78
File ID (583,24,0)   End of file block 35 / Allocated 36

Virtual block number 13 (0000000D), 512 (0200) bytes

 75001C34 3E83007; 00FA7E80 00061C34 06C70675 001C2C3E 83FA4688 C02A9003 ..*à.F*.>,..u.ú.4....-*.t..>4..u 000000
 FC76FFFE·76FF1C3; 36FF1C38 36FF0676 FF1C3436 FF1C1236 FF00011C 3406C706 .ú.4....6...64..v..68..66..v±.v= 000020
 3636FF1C 3836FF14 75001C0A 3E831B74 00FA7E80 0EC48306 CA1EFF26 1B28068E ..(.&..ò..á..-*.t..>...u..68,.66 000040
 FF1C3836 FF147500 1C343E83 1B74001C 0A3E8304 C48306CE 1EFF261B 28068E1C ...(.&..ö..á..>...t..>4..u..68.. 000060
 2A06081C 16A10000 1D9A06C7 081C2606 8304C483 06D61EFF 261B2806 8E1C3636 66...(.&..ø..á...&..ú.....À....* 000080
 C02B02EB 0001B805 74C00B04 C48306DA 1EFF261B 28068EFC 76FFFE76 FF1B741C .t..v±.v=..(.&..Ö..á..àt.¡..$.+á 0000A0
 468A1478 044FFF26 1C0C1EC4 3C75001C 323E8356 000000C8 90CBC901 29EB0E50 P.Ò).èù.à...V.>2..u<á...&.O.x..F 0000C0
 830AF901 BE9A0676 FF531C0E 36FF10EB E42A0488 2602478E 2607FF26 378B2606 .&.7&..&.G.&..*Ò$..6..S.v..ƒ.*.. 0000E0
 75001C32 3E835657 000002C8 90CBC95E 1C3006FF 9005EB1C 3206FF07 754006C4 á.àu...2.$....0.^èù.à...WV.>2..u 000100
 754006C4 830B6101 BE9A1D9C 36FF1C0C 36FF1C0E 36FF1BEB 507EF60B 06768857 W.v..--P$..6...6...6...ƒ.a..á.àu 000120
 2607FF26 3F8B261D 9CA00478 044FFF26 1C0C1EC4 1E7EC00B 4EC68B1C 3206FF04 ...2..6N.à-.á...&.O.xà...&.?&..& 000140
 000002C8 CBC95F5E 1C300601 06468807 75001C32 3E8304EB E42A0588 2602478E .G.&..*Ò$à.>2..u..F...C ^ èùà... 000160
 BE9A5098 078A2606 5EC41C0C 36FF1C0E 36FF22E8 5E75001C 323E830A 768B5657 WV.v..>2..u^$".6...6..á· ¶...P.ƒ 000180
 78044FFF 261C0C1E C42574C0 084EC688 0646FF1C 3206FF04 754006C4 830B0301 .&..á.àu...2..F..ÒN.àt%á...&.O.x 0001A0
 1C323E83 CAEBE42A 05882602 478E2607 FF263F88 261C0C1E C4078A26 065EC4C0 èá^.&..á...&.7&..&.G.&..*Ò$Ò.>2. 0001C0
 F65689F4 46891C38 16881C36 A1560000 0CC8CBC9 5F5E1C30 06010A46 88077500 .u..F...0.^_èùà...VÀ6...8..F¶.V- 0001E0
```

```
Dump of file SATURN:[PCCOMMON.DUMP.DLL]DANLS.TMP;1 on 18-APR-1990 10:42:21.78
File ID (583,24,0)   End of file block 35 / Allocated 36

Virtual block number 14 (0000000E), 512 (0200) bytes

06762BF0 2BF84689 04C48308 0C00B69A F476FF52 1C3A368B FA4689FC 4689C02B +â.F•.F*.6:.R.v¶.Ñ....á..F½+Þ+v. 000000
8026F45E C422750n 1C243E83 4E017508 1D9A3E83 08EB02EE 83057510 1D9A3E83 .>...u..Y.$..>...u.N.>$..u"á^¶&. 000020
9C3E83F8 4EFF02C4 83FE71E8 0E509807 8A26F446 FF127530 1D9C3E83 1975203F ?-u..>..0u..F¶&...P.Òq±.á..N½.>. 000040
1D9A3E83 0066E80E FA46FF07 7400067E 83187400 1C243E83 077EF60B 0B74.11D .0t..--..>$..t..-..t..F*.Òf..>.. 000060
830A7400 067E8302 C483FE7E E80E5629 75001C24 3E830070 E80EFC46 FF077.10 .t..F•.Òp..>$..u)V.Ò-±.á..~..t.. 000080
F676FFF8 76FF0040 E80E0475 00FC7E83 0A740010 9A3E8300 39E80E04 7500FA/E -*.u..Ò9..>...t..-•.u..Òa..v½.v- 0000A0
5E02C4B3 FE38E80E 56002010 9C06C70E 74001C24 3E8306C4 83FEB5E8 0EF476FF .v¶.Òç±.á..>$..t.ú... .V.Ò8±.á.^ 0000C0
FDC8E80E 306AC802 C483FDD2 E80E5000 20B803E8 002B8805 74001C16 3E83CBC9 èù.>...t.¡*.$.¡ .P.Ò0».á.ùj0.Òá» 0000E0
C483FDAA E80E5000 788803E8 00588805 74001C12 3E831775 101D9A3E 8302C483 .á..>...u..>...t.¡X.$.¡x.P.Ò^».á 000100
26068337 8B261C26 1EC41275 2A3F8026 0A5EC400 01FE46C7 56570000 06C8CB02 .ùà...WVúF±..á^.&.7*u.á.&.&.7..& 000120
8A260A5E 8BF6280A 46FFFFFF FE46C708 752D3F80 260A5EC4 9060E80A 46FF021C ...F.$'.á^.&.7-u.úF±...F.+-.^.&. 000140
06E8F8B8 0030109C 06C70675 303C0A75 1C2C3639 387F393C 3F7C303C FA468807 ..F*<0|7<9.;96,.u.<0u.ú...0..«$. 000160
7D303080 2647F188 30E983C8 03E1D1CE 0302E1C1 CE889805 8A26187F 39308026 &.=9..&....oèÄ..ôlÄ.à.Ò0.þG&.=0) 000180
04C8CBC9 5F5E0C56 880A4688 37892606 5EC4F088 EEF7FE46 880C468C 0A7E89DF Ò.-..F..F±¼Y.Þá^.&.7.F..V.^ èùà. 0001A0
F4750038 26117400 30802647 01EBFC7E C4064E8A FE5E8CFC 468902A6 88570000 ..W¡l..F•.^±.N.á-=$.G&.=.t.Ï8.u¶ 0001C0
5016C488 50EC8855 90C8C95F C028FE46 8CFC7E89 9009EBFE 468CFC7E 89000188 ¡...-•.F±$...-•.F±+â_èù.U.$P.á.P 0001E0
```

```
Dump of file SATURN:[PCCOMMON.DUMP.DLL]DANLS.TMP;1 on 18-APR-1990 10:42:21.78
File ID (583,24,0)   End of file block 35 / Allocated 36

Virtual block number 15 (0000000F), 512 (0200) bytes

6C9A039E E80021E8 0000FFFF 9A02AC68 1E02AE68 1E18E8A3 E0865800 00FFFF9A .....X.ÀÉÒ..hÛ..h¯......Òl.Ò...l 000000
000D8B1E 028416FF 00FF6800 EE0E9E9A 00E10E4A 9A50CB5D E5880001 B80AB012 .§.¡...l]ùP.J.Å....Y.h....Ç..É.. 000020
88A6F3C8 88018806 888E3174 00308026 47017500 3080267F FFB902AE 068EFF33 3...Ù.¿..&.=.u.G&.=.t1/¡..l.ùµl. 000040
412CAC92 04E0C00E 72412CAC 18EFBF1F F788071E 061CEBE7 74AEF2C0 330874CA ôt.3à·ÙtÒ$.....¼.¢y.¯,Ar.àÀ..¯,A 000060
C61EFF04 740006C8 3E8300F3 0E9E9A50 00FCB8EC 885500C3 1FEDEBAA C20A0572 r..ô^$Ù.ù.U.$¡•.P...µ..>à..t...ó 000080
1832BE06 5688C08E D88E0259 885756EC 8855CB5D E5880E54 0E9E9A50 00FFB806 .l..P...T..l]ùü.$VW¡Y..Á.ã.V./2. 0000A0
88550002 CA5DE588 5E5F96EB EBF788AE F2FFFFB9 C033970C 74964010 74C238AD Ù;ôt.ä.t..3à¿..·Ù.X$$._^.l)ò..U. 0000C0
0288C488 504901F7 AEF2FFFF B9C033FA 88921F74 C0080E68 0E6E9A06 76FF57EC &W.v..n.h..ât...*3à¿..¨Ù%llP.áE. 0000E0
20044688 180006FF 000004C8 0002CA5D E5885F5B 0000FFFF 9A501651 521E5300 .S.RQ.P.....(_.l)ò..à...  ...F.- 000100
AB14279A 020068FE 5E8CFC46 89120E05 E001C103 E001C888 F9F7000C 899906EA ô..¿..¾*.àlÁ.ÈlÁ.B..F=.^±h...'.. 000120
000247C7 26FC5EC4 080A4F80 261174D0 08085789 26064789 26045EC4 02C4830E ..á.á^.&.G.&.W..Àt.&.O..á^•&ùG.. 000140
C726FC5E C4085789 26064789 2640FE56 88FC4688 040A4F80 26045EC4 9021E802 .$l.á^.&.O...F=.V±à&.G.&.W.á^•&ú 000160
8855C3C9 00000447 C7260257 89260789 26085788 26064788 26045EC4 00010247 G...á^.&.G.&.W.&..&.W.&ùG...èùW. 000180
76FF0A76 FF53CC88 04EC8304 60E90454 E9C03300 098A0872 18ED1E38 065E88EC $.^.;.Ù.r.¤..3àÒT.Ò'..$..äS.v..v 0001A0
83EC8855 00CB50E5 88FD18EF A78091E1 75C0855A 590000FF FF9A5116 0C76FF08 ..v..Q.....YZ.àuÄ..Iÿ.».l)ù.U.$. 0001C0
415151C9 33531274 2018EF87 F60413E9 C0330009 BA087218 ED1E3806 5E880CEC $..^.;.Ù.r.¤..3àÒ..-.ÿ. t.S3èQQA 0001E0
```

```
Dump of file SATURN:[PCCOMMON.DUMP.DLL]DANLS.TMP;1 on 18-APR-1990 10:42:21.78
File ID (583,24,0)   End of file block 35 / Allocated 36

Virtual block number 16 (00000010), 512 (0200) bytes

4689C033 0856C50A 46BEFA5E 8C667480 18EF87F6 00000F87 9A5016F4 46805141 AQ.F¶.P.....-.ÿ..tf.^*.F.éV.3à.F 000000
808ADC88 02EC833B 75AEF20A 8049E30C 4E8BF866 89F288FA 885657FC FC4689FE ±.F••WV.*.·.f½.N.DI¯.·Ùu;.$..Éo. 000020
0080009A E90028E8 F4E2AA1A 74FB380D 740A3CAC 0C4E8807 16FA88D4 88E22800 .+ã.á.*...N.¯<.t.;«t.¨ã¶Ò+.Ò..¯. 000040
FC887AEB 0093E9FA 5E8E5F5E E1E80014 E8E2E8FC 46FF0A80 AA001FE8 0375F838 ;«u.Ò..·¯..F•$àÒ..$Ä^_.^*Ò..$z¡• 000060
C89A5016 F4468051 521E5306 5E881FE3 CA28CF88 1F061E51 53500EFF 11589AFF ..X...PSQ....ü+òD..^.$.RQ.F¶.P.à 000080
1874C008 08C4831F C3FA8858 58591F07 740808FE 5E01F45E 881175C0 0800000E ....àu..^¶.^±.Ùt..Y(X.*ú..á..ât. 0000A0
4018EF87 F6FE5E8E 26E8F900 208A03E8 001C8A08 7500098A 00013000 74006030 =m.t.=..¤..u.¤..$.¤ .*$&.^±-.ÿ.ä 0000C0
6688FC46 28FE4688 06E8F9C0 33001CBA 0EE8F803 751A3F80 085E880A 5E8E0E74 t..^..^..?.u.¾$.¤..3à*$..F±+F•.f 0000E0
1E530856 C51EEEE8 C1880475 C9080C4E 8802F7E9 C85DE588 0472FA5E 8E5F5EF8 ½^_.^*r..l]ùÒ%..N..èu..è$Y.éV.S. 000100
CC750009 BA00013D 0074006D 301774C0 081F071E 0000105F 9A5016F4 46805152 RQ.F¶.P. .......ât.=m.t.=..¤..uä 000120
02751A3F 80260A88 0A744018 EF87F687 75C008F4 4688C2EB 00208AC7 E8001CBA ¤..$ù¤ .$ò.F¶.àuñ-.ÿ.ät..Ò&.?.u. 000140
117D18ED 1E38065E 88EC8855 0442E900 835756EC 885500A3 E8C03300 1C8AA6EB $l¤..3à$È.U.$VW".ÒB.U.$.^.;.Ù.). 000160
08720828 0C885A59 00C850E5 88C03302 E8000188 05744018 EF87F60C 7C00F883 .«.|.-.ÿ.ät.¡..$.3à.l)ù.YZ.É+Ár. 000180
520002B8 06E42EFF ·152FC74 E9C03305 754006E4 A1C85152 E3880572 06E81E38 ;.Ò.r..DRQùÀÒ.âu.3àÒt•RQ..Ò.£..R 0001A0
07740001 30408112 ,558C008 0000FFFF 9A521650 1653C488 508718EF A780D488 .Á.Iÿ.ñP.áS.P.R......àXu.Yâ=..t. 0001C0
181EFFD8 33C28C18 1C06C41E E3181A0E 885AD479 4818EF8F 08088106 7500023D =..u.Ÿ...ÿ.Kyâ2....D.á....ô3Ù... 0001E0
```

Dump of file SATURN:[PCCOMMON.DUMP.DLL]DANLS.TMP;1 on 18-APR-1990 10:42:21.78
File ID (583,24,0)   End of file block 35 / Allocated 36

Virtual block number 17 (00000011), 512 (0200) bytes

```
BF1824BE 007CE81B 248F1B24 BE1B181E FF00038B C28C1B20 06C401AE E903731B .s.ÕÙ.á. ..ô£....../$.¢$.Õ|./$.¢ 000000
248ED88E 0E748BC3 0000FFFF 9A11F968 0E016A08 741B283D 1B248800 73E81B24 $.Õs.¡$.=(.t.j..h•......ù¡t..Å/$ 000020
248E003A E81D9EBF 1D9EBEEC 88550000 11F49A00 6A006A03 6A0051E8 1B288F1B .¢(.õo.j.j.j..¶...U.$/..¢..Õ:./$ 000040
C033001A E81B2E3F 1B288E00 23E81B28 BF1B288E EC885503 EB0031E8 1B288F1B .¢(.Õ1.Š.U.&/(.¢(.Õ#./(.¢(.Õ..3ä 000060
8B04EF83 0E73F73B C31B181E FF0002B8 07E31B1A 0E880000 FFFF9A50 06468A50 P.F.P.........D.£......ú¡Ks..ÿ.. 000080
8B00F0E9 037502AE 3639FF2B F6285657 000014C8 00C3EEEB 1DFFF274 02450B05 ..E.t...$Ÿú.à...WV+-+.96Ù.u.Õþ.. 0000A0
153A9A06 B8681EF6 76FFF876 FF0C6AF8 5689F646 89F25689 F04689C0 2B02AE16 .Û.+á.Fþ.V..F-.Vhj..vh.v-.h¡..:. 0000C0
47EA7500 3F8026F6 46FFF65E C4008CE9 03767FFF FE814619 74C0080A C48312E0 Á..á..ât.F.±..v.Õ¥.á^-.F-&.?.uõG 0000E0
14E29A04 6A500145 8D8A7500 3F8026F6 5E88F475 003F8026 F646FFF6 5EC40CEB $.á^-.F-&.?.u¶.^-&.?.uo.E.Pj..ã. 000100
EE460BEC 468BFE56 89FC4689 02C48313 2514279A 56EE5689 EC468904 C48312EF ÿ..á..F$.VŸV.'.X..á..F=.V±.F$.FŸ 000120
681EF076 FFF276FF 0C6A1AF7 16891AF5 A3EE5688 EC468866 74C208FC 46886D74 tm.F•.ôtf.F$.VŸÉ%...%.j..v..vþ.h 000140
46830257 89260789 26FE5688 FC4688EC 5EC42C74 C0080AC4 83104415 3A9A0688 ¡..:.D..á..ât,á^$.F=.V±&..&.W..F 000160
F046FFF0 5EC4E8EB 0E74C00A 078826FC 46FFFC5E C4078A26 F046FFF0 5EC404EC $.á^þ.Fþ&..á^•.F•&...ât.$Õá^þ.Fþ 000180
02030202 1601FA70 E90002B8 90C8C95F 5EA77500 3F8026F0 5EC4F475 003F8026 &.?.u¶á^þ&.?.uÏ^_èù.¡..Õp•...... 0001A0
00410235 02121211 0010120F 1600160C 0808070A 0C090C08 0C070906 00051804 ...........................5.A. 0001C0
02CE08A4 00840982 0A810A80 16060972 1C702060 006C0859 00570053 00520243 C.R.S.W.Y.l.m p.r...........£.ö. 0001E0
```

Dump of file SATURN:[PCCOMMON.DUMP.DLL]DANLS.TMP;1 on 18-APR-1990 10:42:21.78
File ID (583,24,0)   End of file block 35 / Allocated 36

Virtual block number 18 (00000012), 512 (0200) bytes

```
CB5DE588 99FFFF88 0008E8CB 5DE58899 FFFF8818 E4168918 E8A31608 00000807 •.....È$...ð.¡....[]ùÕ..¡....[]ù 000000
3C430A76 243C0472 133CF7E2 43431674 073A2E18 75E40A00 2489137A 8818EBA3 È$.£±.¿$..ðu..:.t.CCã%<.r.<$v.C< 000020
80260574 C308C08C 065EC4EC 885500C3 18E4A398 01478A2E 430176CA 3C04728C ¥r.<ðv.C..G..Èð.û.U.$á^..â.ût.&. 000040
25E80875 00180C3E 831E73FF F13D0646 88575602 EC83EC88 55C85DE5 8801FE4F O±..[]ùW.$.$.VW.F.=þ.s..>...u.Õ% 000060
02C48312 A0162C9A 0676FF08 750078E8 05740018 E8157500 82E8180C A3127400 .t.È..Õ..u.Õ..t.Õx.u..v.,.....á. 000080
0E4F8D50 501EC033 FE5E89FE E3834306 5E880776 065E3900 F088CB5D E5885E5F _^.[]ùÉþ.9^.v..^.C.D±.^±3â.PP.O. 0000A0
DA8E0574 D2081810 A3180E16 87C28838 74FFFA83 08C48314 5817D89A 50028051 Q¯.P.Ä.[..á..•.t8.ò....È...@t..Ö 0000C0
0AA30147 8D0002A3 0000A300 0A880C47 89484800 08A3C033 D88EFE5E 880008A3 È...^±.Ä3åÈ..HH.G.¡..È..È...G.È. 0000E0
8EC18CD2 08019AE8 18101E8E D833064E 88C08ED8 8CC31FD8 8C0006A3 00000500 ....È...Á.û.Á.â.N.3Ù....Õ...@.è. 000100
FFFFC2F7 FA5689F8 4689150F 18D69A06 76FF006A 0876FF00 6A560000 0AC8C309 ]ùà...Vj..v.j..v..•....F½.V•%ô.. 000120
6A561274 D008FE56 89FC4689 02C48315 2814279A 56F87688 902FEB99 C02B0674 t.+â.$/..v½v.'.(..á..F•.V±.Ät.Vj 000140
1E5657EC 885590CB C95EFE56 88FC4688 9007E808 C4831487 188E9A50 FE76FF00 ..v±P......á.$...F•.V±^èù.U.$WV. 000160
C933FF44 8AA6F30A 76C5FE88 C80309F7 AEF2C033 F788067E C4D98827 E30E4E88 .N.D'.1á-..%3ä.Ù%).ù.±év.µ[.D.3è 000180
1E085688 0646880E 4E8800CB 5DE5885F 5E1FC188 01F74949 04740477 FF453A26 &:E.w.t.II%Ì.ë.^_.[]ù..N..F..V.. 0001A0
88DAF700 D2830BF7 AA2D800A 7902080E 750AF983 1374C00A 93FC071E 570A7EC5 é-,W..•..ât..•.u¯.@y.¯-^%Ù.@.%Õ. 0001C0
88E275C3 08C288AA 27040276 393C3004 038792F1 F793F1F7 0274C008 D23392F7 ¥.3@.ât.%þ.%þ..Æ.0<9v..'¯.ô.ùuã. 0001E0
```

Dump of file SATURN:[PCCOMMON.DUMP.DLL]DANLS.TMP;1 on 18-APR-1990 10:42:21.78
File ID (583,24,0)   End of file block 35 / Allocated 36

Virtual block number 19 (00000013), 512 (0200) bytes

```
88560000 06C800C8 5DE5885E 5F1F580A 8CF272C7 38014480 FF448805 86AC4F05 .O¯...D..D.;úr..ÕX._^.[]ù.à...V¡ 000000
04C48314 F4190A9A 53060E74 830A47F6 26FA5EC4 1CE8F628 FC5E8CFA 468906EA õ..F•.^=+-Š.á^•&-G.¯t..S...¶..á. 000020
065E88EC 885590C8 C95EC688 0876FA46 39180A16 881808A1 0CFA4683 46017440 ât.F.F•.ÄÄ...Ö.9F•vÄ.ó^èù.U.$.^. 000040
76E80005 88071E29 75003F83 18028857 56EC8855 C85DE588 01FE4F80 04740808 .Ùt..O±..[]ùW.$VWE...?.u)..¡..Õv 000060
3689FFFE FE44C704 C6830001 04C7961B 04A31B02 A3FE2440 24E899C0 33057501 .u.3ã.$$@$±È..È...ù....ó.ùD±±..6 000080
F273EEF9 83FEE180 FA744100 D0E9C85D E5885E5F 0009E8C0 8ED88C06 4E881808 ...N..Á.àÕ.._^.[]ùÕÄ.At•.Ä±.•Ÿs. 0000A0
F7880002 05C20335 7401A8AD F003D088 1573C138 48437401 A8FE88AD FC02778B .w.•Ù.±´.tCH;ès..Å.þÙ´.t5.ô....% 0000C0
FA890A8C C688FE4C FEF90305 EB058948 C128FE4C 89F9030C 74FE88E6 E8FE4489 .D±$].±t..•.L±+èH..Š..•±L±.6.Õ¿• 0000E0
01A8ADF0 03FE8825 74FFFE30 021B1406 C626C302 7F891810 1E8C2605 74D13811 .;]t.&.......ù&ó....=±.t%.±.þÙ´. 000100
4788E6E8 FE4489F7 88000205 C203E274 01A8ADF0 03008880 73C13848 FE88F274 t´.±H;ès¥.Å.þÙ´.tã.ô....%.D±$].G 000120
37881B0C 1E8E2605 74C73816 8F8FD8CC 12741814 0EFE2615 E8D88E04 74C00808 ..ât..Ä$.&±...t..Ä¢¢.;ùt.&.....7 000140
0574001D E8FE4DFE 0074005F E8984040 01240074 C638006B E8C03306 778888EB $£.w.3àÕk.;ôt.$.ãã.Ò_.t.±M±Ò..t. 000160
A8FE4588 51C399C0 33024789 07881810 A3260474 C1381713 89088C98 EB4E4E96 .NN$..Ä¿..;êt.&£....¯G.3ã.ùQ.£±´ 000180
0072C203 1572C603 C188F575 EAD10476 18121638 267FFF8A 414149C8 28037401 .t.+â]AAo..&;...v.]õu%.ê.ór..ôr. 0001A0
88FE8857 1874001D E85152C3 59C033E5 75EAD1D2 F7087500 0CE8C628 C22302F7 %@#ô+óÕ..u.%@]õu]3äYÚRQÕ..t.W.±. 0001C0
88505252 1ED23350 53C35A59 58FE5589 4AD72BD6 88067789 FFFEFE44 C7F203F0 þ..ùD±±..w..•+•J.U±XYZÚSP3@.RRP¡ 0001E0
```

```
Dump of file SATURN:[PCCOMMON.DUMP.DLL]DANLS.TMP;1 on 18-APR-1990 10:42:21.78
File ID (583,24,0)   End of file block 35 / Allocated 36

Virtual block number 20 (00000014), 512 (0200) bytes

7E830657 56EC8855 C3D20802 74585A1F FFFA8308 C48315FB 17D89A1F 06500001 ..P...Ä.«..6..*..Z[t..ÐÙU.$VW..- 000000
F73B1174 4806B634 884CEB27 720057E8 07754806 46880856 8802B6BF 3875000A ..uB«Ñ..V..F.Hu.ÒW.r'$L.6Ñ.Ht.;% 000020
99FFFF88 0675D208 04730686 FE8104C6 8334735E 003EE856 0E468902 44880074 t..D..F.VÒ>.^s4.6..±Ñ.s..Ðu.|... 000040
8806B636 89025C89 14B9E675 C085F958 0000FFFF 9A50C033 501652C4 885021EB $!P.6R.P3àP.....[*.àu|...\..6Ñ.. 000060
2CEBF9F2 750686FE 8104C683 0C74024C 39F7880E 4E88CB50 E5885E5F 07C03303 £3à._^.|]ù.N..%9L.t..6..±Ñ.u·*$, 000080
38DE75C0 850000FF FF9A5153 13730280 1E390675 F73BC18E D3882672 1C03DA88 .Ö..r£.£.é;%u.9.¯.s.SQ......àu8; 0000A0
0C74DAF7 D788067E C45738E3 0C4E88EC 885500C3 D1880487 9202B016 890475F7 %u...¯.....|ù.U.$.N.D8W6~..■%Ot. 0000C0
81C38C10 E30187AA F3C913AB F3E9D1E0 8A0A4688 D12B0187 D1030323 D81B012B +1.U##.|.|+|.F..ÀiÒµ¨.èµ¨.iD..ù. 0000E0
080C5E88 084688EC 8855C850 08568806 46885FAA F3C913AB F3E9D1C3 8EFFFFC3 û...ùiÒµ¨.èµ¨..F..V.]ùU.$.F..^.. 000100
064688C8 030C66F7 064688C8 88E3F700 08CA5DE5 88E3F706 46880875 0A5E88D8 Å.^.u..F.%D.[]ò..%D.à.F.%f..à.F. 000120
F6265575 023C0324 0A478A26 065EC4F6 28560000 04C80008 CA50E588 D103E3F7 %D.|.|]ò..à...V+-á^.£.G.$.<.ùU&- 000140
07882606 5E883974 01120E87 F6060868 F9F7000C B99906EA 20C38815 75080A47 G..u..ù·ö..¿..%*kÀ.-.B..t9.^.£.. 000160
17C80F9C 9A50E42A 08478A26 0677FF26 0877FF26 50287EC0 08FC4689 06472826 &+G..F=.à-(P£.w.£.w.£.G.*ÒP...à. 000180
89260857 88260647 88260656 C4FFFF8E 200A4F80 26065EC4 0874FC46 3808C483 .6.;F=t.á^.£.O. ƒ..á^.£.G.£.W.£. 0001A0
00011246 01030000 0003195E 0002000C C8C95EC6 88000004 47C72602 57892607 .£.W.£ùG....ó^èù....^.......F... 0001C0
0001182C 01030088 000118C1 01050000 00051748 00020007 0001120E 01030005 ...........H.......è.......,... 0001E0

Dump of file SATURN:[PCCOMMON.DUMP.DLL]DANLS.TMP;1 on 18-APR-1990 10:42:21.78
File ID (583,24,0)   End of file block 35 / Allocated 36

Virtual block number 21 (00000015), 512 (0200) bytes

00011190 0103011D 000710E8 0203003A 00010FC8 01030026 00011877 01030022 "...w...£...à...:...Ò........... 000000
00000000 00000000 00000000 0000005C 000100C1 0103005B 00010004 0103004D M...å...[...è...\............... 000020
6F432020 20797261 7262694C 20656069 54206E75 5220534D 00000000 00000000 ........MS Run-Time Library - Co 000040
70726F43 2074666F 736F7263 694D202C 38383931 20296328 20746867 69727970 pyright (c) 1988, Microsoft Corp 000060
00687467 6E654C78 614D6560 614E7463 656A624F 68636568 43736C6E 61440011 ..DanlsCheckObjectNameMaxLength. 000080
43736C6E 61440000 00000A73 25206F74 20656061 6E20676E 69746163 6E757254 Truncating name to %s.....DanlsC 0000A0
6E696361 6C706552 00687467 6E654C6E 69406560 614E7463 656A624F 68636568 heckObjectNameMinLength.Replacin 0000C0
20617461 64006425 0064-2500 0A732520 68746977 20656D61 6E206C6C 756E2067 g null name with %s..%d.%d.data  0000E0
79746974 6E650073 25732500 00206100 6C65646F 6D206174 6144006C 65646F6D model.Data model.a ..%s%s.entity 000100
65732070 69687372 656E7472 61700073 25732500 00206E61 00797469 746E..00 .Entity.an ..%s%s.partnership se 000120
69727474 61007325 73250000 20610074 65732070 69687372 656E7472 615000'4 t.Partnership set.a ..%s%s.attri 000140
79654800 79656800 73257325 0000206E 61006574 75626972 74744100 65747562 bute.Attribute.an ..%s%s.key.Key 000160
2061006E 6F69736E 65606944 006E6F69 736E6560 69640073 25732500 00206100 .a ..%s%s.dimension.Dimension.a  000180
69660073 25732500 00206100 6E696160 6F44006E 6961606F 64007325 73250000 ..%s%s.domain.Domain.a ..%s%s.fi 0001A0
20202020 20202020 20000000 73257325 00002061 00726574 6C694600 7265746C lter.Filter.a ..%s%s...          0001C0
10101010 10101010 48202020 20202020 20202020 20202020 20202028 28282828 (((((             H........ 0001E0

Dump of file SATURN:[PCCOMMON.DUMP.DLL]DANLS.TMP;1 on 18-APR-1990 10:42:21.78
File ID (583,24,0)   End of file block 35 / Allocated 36

Virtual block number 22 (00000016), 512 (0200) bytes

01018181 81818181 10101010 10101084 84848484 84848484 84101010 10101010 ................................ 000000
02028282 82828282 10101010 10100101 01010101 01010101 01010101 01010101 ................................ 000020
00000000 00000000 00201010 10100202 02020202 02020202 02020202 02020202 ......................... ...... 000040
00000000 00000000 00000000 00000000 00000000 00000000 00000000 00000000 ................................ 000060
00000000 00000000 00000000 00000000 00000000 00000000 00000000 00000000 ................................ 000080
00000000 00000000 00000000 00000000 00000000 00000000 00000000 00000000 ................................ 0000A0
00000000 00000000 00000000 00000000 00000000 00000000 00000000 00000000 ......................(null).( 0000C0
2800296C 6C756E28 00000000 00000000 00000000 00000000 00000000 00000000 null).+- #..........)...(....... 0000E0
00000000 00001828 1DA01229 1DA01DA0 00000000 00002320 20280029 6C6C756E ................................ 000100
00000000 00000000 00000000 00000000 00000000 00000000 00000000 00000000 ................................ 000120
00000000 00000000 00000000 00000000 00000000 00000000 00000000 00000000 ................................ 000140
00000000 00000000 00000000 00000000 00000000 00000000 00000000 00000000 ................................ 000160
00000000 00000000 00000000 00000000 00000000 00000000 00000000 00000000 ................................ 000180
00000000 00000000 00000000 00000000 00000000 00000000 00000000 00000000 ................................ 0001A0
00000000 00000000 00000000 00000000 00000000 00000000 00000000 00000000 ................................ 0001C0
00000000 00000000 00000000 00000000 00000000 00000000 00000000 00000000 ................................ 0001E0
```

```
Dump of file SATURN:[PCCOMMON.DUMP.DLL]DANLS.TMP;1 on 18-APR-1990 10:42:21.78
File ID (583,24,0)   End of file block 35 / Allocated 36

Virtual block number 23 (00000017), 512 (0200) bytes

00000000 00000000 00000000 00000000 00000000 00000000 00000000 00000000 ................................ 000000
00000000 00000000 00000000 00000000 00000000 00000000 00000000 00000000 ................................ 000020
00000000 00000000 00000000 00000000 00000000 00000000 00000000 00000000 ................................ 000040
00000000 00000000 00000000 00000000 00000000 00000000 00000000 00000000 ................................ 000060
00000000 00000000 00000000 00000000 00000000 00000000 00000000 00000000 ................................ 000080
00000000 00000000 00000000 00000000 00000000 00000000 00000000 00000000 ................................ 0000A0
00000000 00000000 00000000 00000000 00000000 00000000 00000000 00000000 ................................ 0000C0
00000000 00000000 00000000 00000000 00000000 00000000 00000000 00000000 ................................ 0000E0
00000000 00000000 00000000 00000000 00000000 00000000 00000000 00000000 ................................ 000100
00000000 00000000 00000000 00000000 00000000 00000000 00000000 00000000 ................................ 000120
00000000 00000000 00000000 00000000 00000000 00000000 00000000 00000000 ................................ 000140
00000000 00000000 00000000 00000000 00000000 00000000 00000000 00000000 ................................ 000160
00000000 00000000 00000000 00000000 00000000 00000000 00000000 00000000 ................................ 000180
00000000 00000000 00000000 00000000 00000000 00000000 00000000 00000000 ................................ 0001A0
00000000 00000000 00000000 00000000 00000000 00000000 00000000 00000000 ................................ 0001C0
00000000 00000000 00000000 00000000 00000000 00000000 00000000 00000000 ................................ 0001E0

Dump of file SATURN:[PCCOMMON.DUMP.DLL]DANLS.TMP;1 on 18-APR-1990 10:42:21.78
File ID (583,24,0)   End of file block 35 / Allocated 36

Virtual block number 24 (00000018), 512 (0200) bytes

00000000 00000000 00000000 00000000 00000000 00000000 00000000 00000000 ................................ 000000
00000000 00000000 00000000 00000000 00000000 00000000 00000000 00000000 ................................ 000020
00000000 00000000 00000000 00000000 00000000 00000000 00000000 00000000 ................................ 000040
00000000 00000000 00000000 00000000 00000000 00000000 00000000 00000000 ................................ 000060
00000000 00000000 00000000 00000000 00000000 00000000 00000000 00000000 ................................ 000080
00000000 00000000 00000000 00000000 00000000 00000000 00000000 00000000 ................................ 0000A0
00000000 00000000 00000000 00000000 00000000 00000000 00000000 00000000 ................................ 0000C0
5F454C49 465F435F 02860000 00000000 00000000 00000000 00000000 00000000 .....................Ñ. C_FILE_ 0000E0
00000608 137406D4 137406D0 137406CC 1374FFFF 13740000 0000003D 4F464E49 INFO=.....t...t.à.t.Å.t.Ã.t.Å... 000100
00000000 00000000 00000001 FFFF0000 000006F2 00000200 FFFFFFFF 01010000 ................................ 000120
00000000 00000000 00000000 00000000 00000202 00000000 00000000 00000102 ................................ 000140
00000000 00000000 00000000 00000000 00000000 00000000 00000000 00000000 ................................ 000160
00000000 00000000 00000000 00000000 00000000 00000000 00000000 00000000 ................................ 000180
00000000 00000000 00000000 00000000 00000000 00000000 00000000 00000000 ................................ 0001A0
00000000 00000000 00000000 00000000 00000000 00000000 00000000 00000000 ................................ 0001C0
00000000 00000000 00000000 00000000 00000000 00000000 00000000 00000000 ................................ 0001E0

Dump of file SATURN:[PCCOMMON.DUMP.DLL]DANLS.TMP;1 on 18-APR-1990 10:42:21.78
File ID (583,24,0)   End of file block 35 / Allocated 36

Virtual block number 25 (00000019), 512 (0200) bytes

00000000 00000000 00000000 00000000 00000000 00000000 00000000 00000000 ................................ 000000
00000000 00000000 00000000 00000000 00000000 00000000 00000000 00000000 ................................ 000020
00000000 00000000 00000000 00000000 00000000 00000000 00000000 00000000 ................................ 000040
00000000 00000000 00000000 00000000 00000000 00000000 00000000 00000000 ................................ 000060
00000000 00000000 00000000 00000000 00000000 00000000 00000000 00000000 ................................ 000080
00000000 00000000 00000000 00000000 00000000 00000000 00000000 00000000 ................................ 0000A0
00000000 00000000 00000000 00000000 00000000 00000000 00000000 00000000 ................................ 0000C0
00000000 00000000 00000000 00000000 00000000 00000000 00000000 00000000 ................................ 0000E0
00000000 00000000 00000000 00000000 00000000 00000000 00000000 00000000 ................................ 000100
00000000 00000000 00000000 00000000 00000000 00000000 00000000 00000000 ................................ 000120
00000000 00000000 00000000 00000000 00000000 00000000 00000000 00000000 ................................ 000140
00000000 00000000 00000000 00000000 00000000 00000000 00000000 00000000 ................................ 000160
00000000 00000000 00000000 00000000 00000000 00000000 00000000 00000000 ................................ 000180
00000000 00000000 00000000 00000000 00000000 00000000 00000000 00000000 ................................ 0001A0
00000000 00000000 00000000 00000000 00000000 00000000 00000000 00000000 ................................ 0001C0
00000000 00000000 00000000 00000000 00000000 00000000 00000000 00000000 ................................ 0001E0
```

```
Dump of file SATURN:[PCCOMMON.DUMP.DLL]DANLS.TMP;1 on 18-APR-1990 10:42:21.78
File ID (583,24,0)   End of file block 35 / Allocated 36

Virtual block number 26 (0000001A), 512 (0200) bytes

00000000 00000000 00000000 00000000 00000000 00000000 00000000 00000000 ................................ 000000
00000000 0000000C 00000000 00000000 00000000 00000000 00000000 00000000 ................................ 000020
00000000 00000000 00000000 00000000 00000000 00000000 00000000 00000000 ................................ 000040
00000000 00000000 00000000 00000000 00000000 00000000 00000000 00000000 ................................ 000060
00000000 00000000 00000000 00000000 00000000 00000000 00000000 00000000 ................................ 000080
00000000 00000000 00000000 00000000 00000000 00000000 00000000 00000000 ................................ 0000A0
00000000 00000000 00000000 00000000 00000000 00000000 00000000 00000000 ................................ 0000C0
00000000 00000000 00000000 00000000 00000000 00000000 00000000 00000000 ................................ 0000E0
00000000 00000000 00000000 00000000 00000000 00000000 00000000 00000000 ................................ 000100
00000000 00000000 00000000 00000000 00000000 00000000 00000000 00000000 ................................ 000120
00000000 00000000 00000000 00000000 00000000 00000000 00000000 00000000 ................................ 000140
00000000 00000000 00000000 00000000 00000000 00000000 00000000 00000000 ................................ 000160
00000000 00000000 [illegible] 00000000 00000000 00000000 00000000 00000000 ................................ 000180
00000000 00000000 00000000 00000000 00000000 00000000 00000000 00000000 ................................ 0001A0
00000000 00000000 00000000 00000000 00000000 00000000 00000000 00000000 ................................ 0001C0
00000000 00000000 00000000 00000000 00000000 00000000 00000000 00000000 ................................ 0001E0

Dump of file SATURN:[PCCOMMON.DUMP.DLL]DANLS.TMP;1 on 18-APR-1990 10:42:21.78
File ID (583,24,0)   End of file block 35 / Allocated 36

Virtual block number 27 (0000001B), 512 (0200) bytes

00000000 00000000 00000000 00000000 00000000 00000000 00000000 00000000 ................................ 000000
00000000 00000000 00000000 00000000 00000000 00000000 00000000 00000000 ................................ 000020
00000000 00000000 00000000 00000000 00000000 00000000 00000000 00000000 ................................ 000040
00000000 00000000 00000000 00000000 00000000 00000000 00000000 00000000 ................................ 000060
00000000 00000000 00000000 00000000 00000000 00000000 00000000 00000000 ................................ 000080
00000000 00000000 00000000 00000000 00000000 00000000 00000000 00000000 ................................ 0000A0
00000000 00000000 00000000 00000000 00000000 00000000 00000000 00000000 ................................ 0000C0
00000000 00000000 00000000 00000000 00000000 00000000 00000000 00000000 ................................ 0000E0
00000000 00000000 00000000 00000000 00000000 00000000 00000000 00000000 ................................ 000100
00000000 00000000 00000000 00000000 00000000 00000000 00000000 00000000 ................................ 000120
00000000 00000000 00000000 00000000 00000000 00000000 00000000 00000000 ................................ 000140
00000000 00000000 00000000 00000000 00000000 00000000 00000000 00000000 ................................ 000160
00000000 00000000 00000000 00000000 00000000 00000000 00000000 00000000 ................................ 000180
00000000 00000000 00000000 00000000 00000000 00000000 00000000 00000000 ................................ 0001A0
00000000 00000000 00000000 00000000 00000000 00000000 00000000 00000000 ................................ 0001C0
00000000 00000000 00000000 00000000 00000000 00000000 00000000 00000000 ................................ 0001E0

Dump of file SATURN:[PCCOMMON.DUMP.DLL]DANLS.TMP;1 on 18-APR-1990 10:42:21.78
File ID (583,24,0)   End of file block 35 / Allocated 36

Virtual block number 28 (0000001C), 512 (0200) bytes

00000000 00000000 00000000 00000000 00000000 00000000 00000000 00000000 ................................ 000000
00000000 00000000 00000000 00000000 00000000 00000000 00000000 00000000 ................................ 000020
00000000 00000000 00000000 00000000 00000000 00000000 00000000 00000000 ................................ 000040
00000000 00000000 00000000 00000000 00000000 00000000 00000000 00000000 ................................ 000060
00000000 00000000 00000000 00000000 00000000 00000000 00000000 00000000 ................................ 000080
00000000 00000000 00000000 00000000 00000000 00000000 00000000 00000000 ................................ 0000A0
00000000 00000000 00000000 00000000 00000000 00000000 00000000 00000000 ................................ 0000C0
00000000 00000000 00000000 00000000 00000000 00000000 00000000 00000000 ................................ 0000E0
00000000 00000000 00000000 00000000 00000000 00000000 00000000 00000000 ................................ 000100
00000000 00000000 00000000 00000000 00000000 00000000 00000000 00000000 ................................ 000120
00000000 00000000 00000000 00000000 00000000 00000000 00000000 00000000 ................................ 000140
00000000 00000000 00000000 00000000 00000000 00000000 00000000 00000000 ................................ 000160
00000000 00000000 00000000 00000000 00000000 00000000 00000000 00000000 ................................ 000180
00000000 00000000 00000000 00000000 00000000 00000000 00000000 00000000 ................................ 0001A0
00000000 00000000 00000000 00000000 00000000 00000000 00000000 [illegible] ................................ 0001C0
00000000 00000000 00000000 00000000 00000000 00000000 00000000 [illegible] ................................ 0001E0
```

```
Dump of file SATURN:[PCCOMMON.DUMP.DLL]DANLS.TMP;1 on 18-APR-1990 10:42:21.78
File ID (583,24,0)   End of file block 35 / Allocated 36

Virtual block number 29 (0000001D), 512 (0200) bytes

00000000 00000000 00000000 00000000 00000000 00000000 00000000 00000000 ................................ 000000
00000000 00000000 00000000 00000000 00000000 00000000 00000000 00000000 ................................ 000020
00000000 00000000 00000000 00000000 00000000 00000000 00000000 00000000 ................................ 000040
00000000 00000000 00000000 00000000 00000000 00000000 00000000 00000000 ................................ 000060
00000000 00000000 00000000 00000000 00000000 00000000 00000000 00000000 ................................ 000080
00000000 00000000 00000000 00000000 00000000 00000000 00000000 00000000 ................................ 0000A0
00000000 00000000 00000000 00000000 00000000 00000000 00000000 00000000 ................................ 0000C0
00000000 00000000 00000000 00000000 00000000 00000000 00000000 00000000 ................................ 0000E0
00000000 00000000 00000000 00000000 00000000 00000000 00000000 00000000 ................................ 000100
00000000 00000000 00000000 00000000 00000000 00000000 00000000 00000000 ................................ 000120
00000000 00000000 00000000 00000000 00000000 00000000 00000000 00000000 ................................ 000140
00000000 00000000 00000000 00000000 00000000 00000000 00000000 00000000 ................................ 000160
00000000 00000000 00000000 00000000 00000000 00000000 00000000 00000000 ................................ 000180
00000000 00000000 00000000 00000000 00000000 00000000 00000000 00000000 ................................ 0001A0
00000000 00000000 00000000 00000000 00000000 00000000 00000000 00000000 ................................ 0001C0
00000000 00000000 00000000 00000000 00000000 00000000 00000000 00000000 ................................ 0001E0

Dump of file SATURN:[PCCOMMON.DUMP.DLL]DANLS.TMP;1 on 18-APR-1990 10:42:21.78
File ID (583,24,0)   End of file block 35 / Allocated 36

Virtual block number 30 (0000001E), 512 (0200) bytes

00000000 00000000 00000000 00000000 00000000 00000000 00000000 00000000 ................................ 000000
00000000 00000000 00000000 00000000 00000000 00000000 00000000 00000000 ................................ 000020
00000000 00000000 00000000 00000000 00000000 00000000 00000000 00000000 ................................ 000040
00000000 00000000 00000000 00000000 00000000 00000000 00000000 00000000 ................................ 000060
00000000 00000000 00000000 00000000 00000000 00000000 00000000 00000000 ................................ 000080
00000000 00000000 00000000 00000000 00000000 00000000 00000000 00000000 ................................ 0000A0
00000000 00000000 00000000 00000000 00000000 00000000 00000000 00000000 ................................ 0000C0
00000000 00000000 00000000 00000000 00000000 00000000 00000000 00000000 ................................ 0000E0
00010000 00000000 00000000 00000000 00000000 00000000 00000000 00000000 ................................ 000100
00000000 00000000 00000000 00000000 00000000 00000000 00000000 00000200 ................................ 000120
00000000 00000000 00000000 00000000 00000000 00000000 00000000 00000000 ................................ 000140
00000000 00000000 00000000 00000000 00000000 00000000 00000000 00000000 ................................ 000160
00000000 00000000 00000000 00000000 00000000 00000000 00000000 00000000 ................................ 000180
00000000 00000000 00000000 00000000 00000000 00000000 00000000 00000000 ................................ 0001A0
00000000 00000000 00000000 00000000 00000000 00000000 00000000 00000000 ................................ 0001C0
00000000 00000000 00000000 00000000 00000000 00000000 00000000 00000000 ................................ 0001E0

Dump of file SATURN:[PCCOMMON.DUMP.DLL]DANLS.TMP;1 on 18-APR-1990 10:42:21.78
File ID (583,24,0)   End of file block 35 / Allocated 36

Virtual block number 31 (0000001F), 512 (0200) bytes

00000000 00000000 00000000 00000000 00000000 00000000 00000000 00000000 ................................ 000000
00000000 00000000 00000000 00000000 00000000 00000000 00000000 00000000 ................................ 000020
00000000 00000000 00000000 00000000 00000000 00000000 00000000 00000000 ................................ 000040
00000000 00000000 00000000 00000000 00000000 00000000 00000000 00000000 ................................ 000060
00000000 00000000 00000000 00000000 00000000 00000000 00000000 00000000 ................................ 000080
00000000 00000000 00000000 00000000 00000000 00000000 00000000 00000000 ................................ 0000A0
00000000 00000000 00000000 00000000 00000000 00000000 00000000 00000000 ................................ 0000C0
00000000 00000000 00000000 00000000 00000000 00000000 00000000 00000000 ................................ 0000E0
00000000 00000000 00000000 00000000 00000000 00000000 00000000 00000000 ................................ 000100
00000000 00000000 00000000 00000000 00000000 00000000 00000000 00000000 ................................ 000120
00000000 00000000 00000000 00000000 00000000 00000000 00000000 00000000 ................................ 000140
00000000 00000000 00000000 00000000 00000000 00000000 00000000 00000000 ................................ 000160
00000000 00000000 00000000 00000000 00000000 00000000 00000000 00000000 ................................ 000180
00000000 00000000 00000000 00000000 00000000 00000000 00000000 00000000 ................................ 0001A0
00000000 00000000 00000000 00000000 00000000 00000000 00000000 00000000 ................................ 0001C0
00000000 00000000 00000000 00000000 00000000 00000000 00000000 00000000 ................................ 0001E0
```

```
Dump of file SATURN:[PCCOMMON.DUMP.DLL]DANLS.TMP;1 on 18-APR-1990 10:42:21.78
File ID (583,24,0)   End of file block 35 / Allocated 36

Virtual block number 32 (00000020), 512 (0200) bytes

00000000 00000000 00000000 00000000 00000000 00000000 00000000 00000000 ................................ 000000
00000000 00000000 00000000 00000000 00000000 00000000 00000000 00000000 ................................ 000020
00000000 00000000 00000000 00000000 00000000 00000000 00000000 00000000 ................................ 000040
00000000 00000000 00000000 00000000 00000000 00000000 00000000 00000000 ................................ 000060
00000000 00000000 00000000 00000000 00000000 00000000 00000000 00000000 ................................ 000080
00000000 00000000 00000000 00000000 00000000 00000000 00000000 00000000 ................................ 0000A0
00000000 00000000 00000000 00000000 00000000 00000000 00000000 00000000 ................................ 0000C0
00000000 00000000 00000000 00000000 00000000 00000000 00000000 00000000 ................................ 0000E0
00000000 00000000 00000000 00000000 00000000 00000000 00000000 00000000 ................................ 000100
00000000 00000000 00000000 00000000 00000000 00000000 00000000 00000000 ................................ 000120
00000000 00000000 00000000 00000000 00000000 00000000 00000000 00000000 ................................ 000140
00000000 00000000 00000000 00000000 00000000 00000000 00000000 00000000 ................................ 000160
00000000 00000000 00000000 00000000 00000000 00000000 00000000 00000000 ................................ 000180
00000000 00000000 00000000 00000000 00000000 00000000 00000000 00000000 ................................ 0001A0
00000000 00000000 00000000 00000000 00000000 00000000 00000000 00000000 ................................ 0001C0
00000000 00000000 00000000 00000000 00000000 00000000 00000000 00000000 ................................ 0001E0

Dump of file SATURN:[PCCOMMON.DUMP.DLL]DANLS.TMP;1 on 18-APR-1990 10:42:21.78
File ID (583,24,0)   End of file block 35 / Allocated 36

Virtual block number 33 (00000021), 512 (0200) bytes

00000000 00000000 00000000 00000000 00000000 00000000 00000000 00000000 ................................ 000000
00000000 00000000 00000000 00000000 00000000 00000000 00000000 00000000 ................................ 000020
00000000 00000000 00000000 00000000 00000000 00000000 00000000 00000000 ................................ 000040
00000000 00000000 00000000 00000000 00000000 00000000 00000000 00000000 ................................ 000060
00000000 00000000 00000000 00000000 00000000 00000000 00000000 00000000 ................................ 000080
00000000 00000000 00000000 00000000 00000000 00000000 00000000 00000000 ................................ 0000A0
00000000 00000000 00000000 00000000 00000000 00000000 00000000 00000000 ................................ 0000C0
00000000 00000000 00000000 00000000 00000000 00000000 00000000 00000000 ................................ 0000E0
00000000 02B812D2 00000000 00000000 00000000 00000000 00000000 00000000 ......................●.|...... 000100
00000000 00000000 00000000 00008181 81010000 00010000 00000000 00000000 ................................ 000120
00000000 00000000 00000000 00000000 00000000 00000000 00000000 00000000 ................................ 000140
00000000 00000000 00000000 00000000 00000000 00000000 00000000 00000000 ................................ 000160
00000000 00000000 00000000 00000000 00000000 00000000 00000000 00000000 ................................ 000180
00000000 00000000 00000000 00000000 00000000 00000000 00000000 00000000 ................................ 0001A0
00000000 00000000 00000000 00000000 00000000 00000000 00000000 00000000 ................................ 0001C0
00000000 00000000 00000000 00000000 00000000 00000000 00000000 00000000 ................................ 0001E0

Dump of file SATURN:[PCCOMMON.DUMP.DLL]DANLS.TMP;1 on 18-APR-1990 10:42:21.78
File ID (583,24,0)   End of file block 35 / Allocated 36

Virtual block number 34 (00000022), 512 (0200) bytes

00000000 00000000 00000000 00000000 00000000 00000000 00000000 00000000 ................................ 000000
0A0A0A0A 0A0A0A0A 0A0A0A0A 0A0A0A0A 0A000000 00000000 00000000 00000000 ................................ 000020
0A0A0A0A 0A0A0A0A 0A0A0A0A 0A0A0A0A 0A0A0A0A 0A0A0A0A 0A0A0A0A 0A0A0A0A ................................ 000040
0A0A0A0A 0A0A0A0A 0A0A0A0A 0A0A0A0A 0A0A0A0A 0A0A0A0A 0A0A0A0A 0A0A0A0A ................................ 000060
0A0A0A0A 0A0A0A0A 0A0A0A0A 0A0A0A0A 0A0A0A0A 0A0A0A0A 0A0A0A0A 0A0A0A0A ................................ 000080
0A0A0A0A 0A0A0A0A 0A0A0A0A 0A0A0A0A 0A0A0A0A 0A0A0A0A 0A0A0A0A 0A0A0A0A ................................ 0000A0
0A0A0A0A 0A0A0A0A 0A0A0A0A 0A0A0A0A 0A0A0A0A 0A0A0A0A 0A0A0A0A 0A0A0A0A ................................ 0000C0
0A0A0A0A 0A0A0A0A 0A0A0A0A 0A0A0A0A 0A0A0A0A 0A0A0A0A 0A0A0A0A 0A0A0A0A ................................ 0000E0
0A0A0A0A 0A0A0A0A 0A0A0A0A 0A0A0A0A 0A0A0A0A 0A0A0A0A 0A0A0A0A 0A0A0A0A ................................ 000100
00000000 00000000 00000000 00000000 000A0A0A 0A0A0A0A 0A0A0A0A 0A0A0A0A ................................ 000120
00000000 00000000 00000000 20000000 00000000 00000000 00000000 00000000 ................... ............ 000140
61747320 200A0030 30303652 00003E3E 4753404E 3C3CFFFF 060C150A 00000000 ....Ö.É...<<NMSG>>..R6000..- sta 000160
72656765 746E6920 200A0033 30303652 0003000A 00776F6C 66726576 6F206863 ck overflow.....R6003..- integer 000180
6E652074 6F6E202D CA003830 30365200 08000A00 30207962 20656469 76696420  divide by 0.....R6008..- not en 0001A0
30365200 09000A00 73746E65 60756772 6120726F 66206563 61707320 6867756F ough space for arguments.....R60 0001C0
7269766E 6520726F 66206563 61707320 6867756F 6E652074 6F6E202D 0A0D3930 09..- not enough space for envir 0001E0
```

Dump of file SATURN:[PCCOMMON.DUMP.DLL]DANLS.TMP;1 on 18-APR-1990 10:42:21.78
File ID (583,24,0)   End of file block 35 / Allocated 36

Virtual block number 35 (00000023), 512 (0200) bytes

```
0020726F 72726520 656D6974 206E7572 00FF000A 0D00FC00 0A00746E 6.'^6E6F onment...=......run-time error . 000000
6F6C2074 6F6E2074 6E696F70 20676E69 74616F6C 6620200A 00323030 365.'002 ..R6002..- floating point not lo 000020
18DA0002 00000034 06EC0002 00000003 1B260002 0003FFFF FF000A00 6465c'61 aded..........&.......&.......Ö. 000040
00000000 00000000 00000000 00000000 00000000 00000000 00000000 00000005 ................................ 000060
00000000 00000000 00000000 00000000 00000000 00000000 00000000 00000000 ................................ 000080
00000000 00000000 00000000 00000000 00000000 00000000 00000000 00000000 ................................ 0000A0
00000000 00000000 00000000 00000000 00000000 00000000 00000000 00000000 ................................ 0000C0
00000000 00000000 00000000 00000000 00000000 00000000 00000000 00000000 ................................ 0000E0
00000000 00000000 00000000 00000000 00000000 00000000 00000000 00000000 ................................ 000100
00000000 00000000 00000000 00000000 00000000 00000000 00000000 00000000 ................................ 000120
00000000 00000000 00000000 00000000 00000000 00000000 00000000 00000000 ................................ 000140
00000000 00000000 00000000 00000000 00000000 00000000 00000000 00000000 ................................ 000160
00000000 00000000 00000000 00000000 00000000 00000000 00000000 00000000 ................................ 000180
00000000 00000000 00000000 00000000 00000000 00000000 00000000 00000000 ................................ 0001A0
00000000 00000000 00000000 00000000 00000000 00000000 00000000 00000000 ................................ 0001C0
00000000 00000000 00000000 00000000 00000000 00000000 00000000 00000000 ................................ 0001E0
```

Dump of file SATURN:[PCCOMMON.DUMP.DLL]DANOTEDF.TMP;1 on 18-APR-1990 10:42:27.12
File ID (585,9,0)   End of file block 22 / Allocated 24

Virtual block number 1 (00000001), 512 (0200) bytes

```
00000000 00000040 00000000 00000088 0000FFFF 00000004 00000014 01625A40 MZb.............|.......a....... 000000
00000080 00000000 00000000 00000000 00000000 00000000 00000000 00000000 ................................ 000020
6F6E6E61 63206D61 72676F72 70207369 685421CD 4C01B821 CD09B400 0EBA1F0E ..a..Ç.el|.LeíThis program canno 000040
00000000 00000024 0A0D002E 65646F6D 20534F44 206E6920 6E757220 65622074 t be run in DOS mode....$....... 000060
00080008 00000000 00030000 00000000 00058009 C60660DE 0007048A 0505454E NE.......mø6.................... 000080
00000000 00000000 00010002 00040000 00000511 00A40094 00880080 0040003A :.a.......E..................... 0000A0
009C0E00 009C026A 000F0F00 000F0268 0A640F00 0A640180 13280F00 13280055 U.(...(.¯.d...d.h.......j....... 0000C0
04001EB1 0400027F 00701EF1 00700278 00080E21 00000000 00300F21 00280274 t.(.!.0.....!...x.p.þ.p.....ÿ... 0000E0
017F0118 00F80019 00070001 00000046 4445544F 4E414408 00640004 00020005 ......d..DANOTEDF.........%..... 000100
6D64034B 434F4C42 434F4C4C 414D454D 004D454D 034E4957 4D500500 036202E3 D.b...PMWIN.MEM.MEMALLOCBLOCK.dm 000120
52455551 4C4D4413 4E585450 4F54534C 4D440A4E 58545452 4154534C 4D44086C l.DMLSTARTTXN.DMLSTOPTXN.DMLQUER 000140
52455551 4C4D440B 49544759 52455551 4C4D440B 454C444E 41484C45 444F4D59 YMODELHANDLE.DMLQUERYGTI.DMLQUER 000160
554C4044 08455441 4C45524C 4D440931 4E4C5259 52455551 4C4D440C 4E4C5259 YRLN.DMLQUERYRLN1.DMLRELATE.DMLU 000180
4D440845 54414552 434C4044 09545349 4C454552 464C4044 08455441 4C45524E NRELATE.DMLFREELIST.DMLCREATE.DM 0001A0
5854504F 54534C4D 44125458 45544554 4952574C 4D440C54 58455444 4145524C LREADTEXT.DMLWRITETEXT.DMLSTOPTX 0001C0
4555514C 4D441354 43454A42 4F544345 4C45534C 4D440F4B 4341424C 4C4F524E NROLLBACK.DMLSELECTOBJECT.DMLQUE 0001E0
```

Dump of file SATURN:[PCCOMMON.DUMP.DLL]DANOTEDF.TMP;1 on 18-APR-1990 10:42:27.12
File ID (585,9,0)   End of file block 22 / Allocated 24

Virtual block number 2 (00000002), 512 (0200) bytes

```
49544703 4C4C4154 43454C45 5345444C 4D440E45 54415453 5443454C 45535952 RYSELECTSTATE.DMLDESELECTALL.GTI 000000
03525450 41544144 58554159 52455551 49544712 4C4F4F54 4C4C494B 4954470B .GTIKILLTOOL.GTIQUERYAUXDATAPTR. 000020
4F4E4554 41455243 4D41440D 454D414E 5443454A 424F5445 47404144 10606164 dam.DAMGETOBJECTNAME.DAMCREATENO 000040
134A424F 4554454C 45444D41 440C5443 454A424F 505548 4F 4F4C4D41 440F4554 TE.DAMLOOKUPOBJEC` DAMDELETEOBJ. 000060
594E4154 4140524F 46404144 0F525245 4D41444E 4F4E5941 4C505349 444D4144 DAMDISPLAYNONDAMERR.DAMFORMATANY 000080
46595245 55514046 44154052 4F465353 45434F52 50404644 0E4D4644 03525245 ERR.DFM.DFMPROCESSFORM.DFMQUERYF 0000A0
514D4644 0F504145 48424859 52455551 4D46440E 41544144 52455355 444C4549 IELDUSERDATA.DFMQUERYHBHEAP.DFMQ 0000C0
59524555 514D4644 0F4D5448 59524555 514D4644 0B4A424F 4C4D4448 59524555 UERYHDMLOBJ.DFMQUERYHTM.DFMQUERY 0000E0
514D4644 0C535554 41545354 46494853 59524555 514D4644 13474C44 444E5748 HWNDDLG.DFMQUERYSHIFTSTATUS.DFMQ 000100
4745524D 46441041 54414452 45535559 52455551 4D464410 4C4F4F54 59524555 UERYTOOL.DFMQUERYUSERDA'A.DFMREG 000120
43544553 4D46440F 4E464553 4F4C4354 45534D46 4400444C 45494652 45545349 ISTERFIELD.DFMSETCLOSEF. DFMSETC 000140
4E544553 4D46441I 4E464C4F 52544E4F 43544553 4D46440F 4E46444E 414D4D4F OMMANDFN.DFMSETCONTROLFN.J:MSETN 000160
55544553 4D46440E 4E465946 49544F4E 5445534D 46440E4E 46455441 47495641 AVIGATEFN.DFMSETNOTIFYFN.DFMSETU 000180
50404644 194D524F 46474E4F 4C455441 47495641 4E404644 13415441 44524553 SERDATA.DFMNAVIGATELONGFORM.DFMP 0001A0
53534543 4F52504D 4644194C 4F52544E 4F435449 44455453 494C5353 45434F52 ROCESSLISTEDITCONTROL.DFMPROCESS 0001C0
53584F42 5453494C 59524555 514D4644 17444E41 4D4D4F43 54494445 5453494C LISTEDITCOMMAND.DFMQUERYLISTBOXS 0001E0
```

Dump of file SATURN:[PCCOMMON.DUMP.DLL]DANOTEDF.TMP;1 on 18-APR-1990 10:42:27.12
File ID (585,9,0)   End of file block 22 / Allocated 24

Virtual block number 3 (00000003), 512 (0200) bytes

```
464E4952 45535554 494E494D 524F4641 44124D52 4F464144 06444554 43454C45 ELECTED.DAFORM.DAFORMINITUSERINF 000000
4F085443 454C4553 54494E49 4A424F00 454C5449 54544553 40524F46 41440E4F O.DAFORMSETTITLE.OBJINITSELECT.O 000020
424F0A45 4D414E53 55434F46 45544144 50554A42 4F12454D 414E5449 4E494A42 BJINITNAME.OBJUPDATEFOCUSNAME.OB 000040
4A424F09 44574B4C 45444A42 4F094457 4B444441 4A424F09 44574B54 494E494A JINITKWD.OBJADDKWD.OBJDELKWD.OBJ 000060
444E4148 59464954 4F4E454B 41405455 4C4D4416 54554C4D 44054457 4B504552 REPKWD.DMLUT.DMLUTMAKENOTIFYHAND 000080
47455254 554C4D44 10455445 4C454452 45545349 47455254 554C4D44 1352454C LER.DMLUTREGISTERDELETE.DMLUTREG 0000A0
554C4D44 12455449 52575245 54534947 45525455 4C4D4412 54455352 45545349 ISTERSET.DMLUTREGISTERWRITE.DMLU 0000C0
414C4552 52455453 49474552 54554C4D 44185946 49544F4E 53534543 4F525054 TPROCESSNOTIFY.DMLUTREGISTERRELA 0000E0
66604920 41442040 5020322F 534F2600 000F3B03 01014554 414C4552 4E554554 TEUNRELATE...;...&OS/2 PM DA Imf 000100
4245544F 4E000000 6D726F46 20676E6F 4C206C65 646F4D20 6E6F6974 6160726F ormation Model Long Form...NOTEB 000120
890A4688 D8BEFFFF 881E5657 00009AC8 00000000 00000001 50415254 53544F4F OOTSTRAP........à...WV.|...Ä.F.. 000140
5016FF6C 86800E76 FF1076FF 00F6E903 7401FF68 8E83FF68 86890C46 8BFF6686 .f..F...h../h..t.Ö-..v..v...l..P 000160
86800E76 FF1076FF 0154E9FF 6A868800 07E90375 00003DFF 6A868900 00FFFF9A .......j.=..u.Ö....j.ÖT..v..v... 000180
FF668688 0130E9FF 6A868800 07E90375 000030FF 6A868900 00FFFF9A 5016FF76 v..P.......j.=..u.Ö....j.Ö0...f. 0001A0
FF6686FF FF72B6FF FF7486FF 00000154 9A5016FF 7286800E 76FF1076 FF009CE9 Ö...v..v...r..P.T....Ñt..Ñr..Ñf. 0001C0
1076FFFF 66B6FF50 16FF7C86 8D5016FC 46800000 FFFF9A00 80685016 FF7?3680 ..|..Ph........F=.P..|..P.Ñf..v. 0001E0
```

Dump of file SATURN:[PCCOMMON.DUMP.DLL]DANOTEDF.TMP;1 on 18-APR-1990 1):42:27.12
File ID (585,9,0)   End of file block 22 / Allocated 24

Virtual block number 4 (00000004), 512 (0200) bytes

```
468800CE E9FF6A86 880007E9 03750000 3DFF6A86 890EC483 FFFF11F8 9A0E76FF .v..½....é...j.=..u.Ö....j.Öö..F 000000
FF9AFF6C B6FFFF6E B6FF0020 E90003E9 037401FF 768E8300 2DE90375 FE4608FC =.F±u.Ö-../v..t.Ö..Ö ..Ñn..Ñl... 000020
30000BE9 000EE900 11E90096 E9FF6A86 880007E9 03750000 3DFF6A86 890000FF .....j.=..u.Ö....j.Ö..Ö..Ö..Ö..= 000040
16FF7886 8DFF6686 FF0E76FF 1076FF00 68E9FF66 8688FFEF E9FF5CE9 03750086 ..u.Ö\.Öÿ...f.Öh..v..v..Ñf...x.. 000060
7286800E 76FF1076 FF0000FF FF9A5016 FF708680 0E76FF10 76FF0000 FFFF9A50 P......v..v...p..P......v..v...r 000080
FF7AB6FF 0676FF08 76FF0A76 FF0C76FF FF72B6FF FF7486FF 0000FFFF 9A5016FF ..P......Ñt..Ñr..v..v..v..v..Ñz. 0000A0
90E90375 00843000 13E90016 E90000B8 001CE900 00FFFF9A FF7086FF FF7886FF .Ñx..Ñp......Ö..|..Ö..Ö..=..u.Ö. 0000C0
88D88E00 08881E56 57000012 C8000CCA C95F5E1F FFE4E9FF 88E90375 008630FF .=..u.Ö..Öð..^_èò..à...WV.|...Ä. 0000E0
329A5016 FC4680F0 76FF0E76 FF1076FF 004FE9F0 46880001 EE46C7F0 46890A46 F...FÞúFŸ...FÞÖÕ..v..v..vÞ.F=.P.2 000100
809A5016 F846800E 76FF1076 FF000001 439A5016 F646800E 76FF1076 FF000001 ....v..v..F-.P.C....v..v..F½.P.. 000120
300013E9 0039E900 00B8001C E9000000 319A5016 F246800E 76FF1076 FF000000 ....v..v..F·.P.1...Ö..|..Ö9.Ö..= 000140
76FF0A76 FF0C76FF F876FFFA 76FFFFE4 E9FFA1E9 03770089 3DFFEFE9 03730087 ..s.Öÿ.=..w.ÖÀ.Öð..v'.v½.v..v..v 000160
000004C8 000CCAC9 5F5E1F00 00E90000 FFFF9AF6 76FFFC76 FFFE76FF 0676FF08 ..v..v±.v=.v-.....Ö...^_èò..àÅ.. 000180
3086FFFF 3286FF00 0001EF9A 5016FF30 86800876 FF0A76FF D88E01AB 881E5657 WV.|¨..Ä.v..v...0..P.ÿ....Ñ2..Ñ0 0001A0
FFFF9A50 16FF3486 80406AF8 76FFFA76 FFFA5689 F8468900 00FFFF9A 0676FFFF ..v.......F½.V'.v'.v½jä..4..P... 0001C0
FFFF0042 9A5016FF 35868000 DFE90000 8A0000B8 0009E903 7523FF34 8E800000 .../4.Ñu.Ö..|..¤..ÖÖ...5..P.B... 0001E0
```

Dump of file SATURN:[PCCOMMON.DUMP.DLL]DANOTEDF.TMP;1 on 18-APR-1990 10:42:27.12
File ID (585,9,0)   End of file block 22 / Allocated 24

Virtual block number 5 (00000005), 512 (0200) bytes

```
FFFF768E 830026E9 037407FF 748E83FF 769689FF 748689FF CA830000 0004C483 .é.....ò...t...v../t..t.Ö&..fv.. 000000
39E90000 009A9A00 80685016 FF788680 0676FFFF 3086FFFF 3286FF00 1CE90374 t.Ö...Ñ2..Ñ0..v...x..Ph.......Ö9 000020
0676FFFF 3086FFFF 3286FF00 1CE90374 FFFF768E 830026E9 037406FF 748E8300 ../t..t.Ö&../v..t.Ö...Ñ2..Ñ0..v. 000040
0876FF0A 76FF005A E90000BA 00008800 09E90000 FFFF9A50 16FF7886 8D008068 h....x..P.....Ö..|..¤..ÖZ..v..v. 000060
9A0876FF 0A76FF06 76FF5016 FF788680 5016FC46 8D0000FF FF9A5016 FF2E8680 .....P......f=.P..x..P.v..v..v.. 000080
FF2EB6FF 0018E900 00BA0000 880009E9 03750000 3DFF2C86 890EC483 008611F8 ½.Ñ..é...,.=..u.Ö..|..¤..Ö...Ñ.. 0000A0
5700000A C80006CA C95F5E1F 0000E900 00FFFF9A 5016FF78 868DFC76 FFFE76FF .v±.v=..x..P.....Ö...^_èò..à...W 0000C0
E9037500 003DF646 890000FF FF9A5016 FC46800E 76FF1076 FFD88E02 54881E56 V.|T..Ä.v..v..F=.P......F-=..u.Ö 0000E0
00FFFF9A 5016F846 800E76FF 1076FF00 4AE90374 0C087E83 00C0E9F6 46880006 ...F-Öé..-..t.ÖJ..v..v..F½.P.... 000100
0015E903 740A4639 FA5688F8 46880096 E9F64688 0006E903 75000030 F6468900 ..F-=..u.Ö...F-Ö...F½.V'9F.t.Ö.. 000120
C726FC5E C40060E9 00008800 00FFFF9A 656A0E76 FF1076FF 0000E903 740C5639 9V.t.Ö...v..v.je.....|..Öm.é^=&ú 000140
890000FF FF9A0676 FF0876FF 0A76FF0C 76FF0277 FF260477 FF26FC5E C4000107 ...é^=&.w.&.w..v..v..v..v....... 000160
A0680E76 FF1076FF 000007C7 26FC5EC4 0038E9F6 46880006 E9037500 003DF646 F-=..u.Ö...F-Ö8.é^=&ú....v..v.h. 000180
FFFF9A00 9F680E76 FF1076FF 0000046E 9A00A168 0E76FF10 76FF0000 04609A00 ..`....v..v.hÀ..n....v..v.h..... 0001A0
76FF0A76 FFD88E03 93881E56 57000010 C8000CCA C95F5E1F 0000E900 00880000 ..|..Ö...^_èò..à...WV.|...Ä.v..v 0001C0
F6468D08 76FF0A76 FF00B1E9 F4468800 06E90375 00003DF4 46890000 FFFF9A08 .......F¶=..u.Ö...F¶ÖŸ..v..v..F- 0001E0
```

```
Dump of file SATURN:[PCCOMMON.DUMP.DLL]DANOTEDF.TMP;1 on 18-APR-1990 10:42:27.12
File ID (585,9,0)   End of file block 22 / Allocated 24

Virtual block number 6 (00000006), 512 (0200) bytes

 46800876 FF0A76FF 0090E9F4 46880006 E9037500 003DF446 89000001 FF9A5016 .P......F¶=..u.Ô...F¶Ô...v..v..F 000000
 8D0876FF 0A76FF00 6FE9F446 880006E9 03750000 30F44689 00000265 9A5016FA ª.P.e....F¶=..u.Ô...F¶Ôo..v..v.. 000020
 F676FFF8 76FF004E E9F4468B 0006E903 75000030 F4468900 0003CD9A 5016F046 FÞ.P.ë....F¶=..u.Ô...F¶ÔN..v½.v— 000040
 27E9F446 880006E9 03750000 30F44689 0000FFFF 9A5016FE 4680F076 FFF276FF .v .vÞ.F±.P......F¶=..u.Ô...F¶Ô' 000060
 FFFF9A00 6A006A01 6A006A01 2568656A FA76FFFC 76FF0018 E9037401 FE7E8300 ..-±.t.Ô...v•.vªjeh%.j.j.j.j.... 000080
 C7260E5E C4088E04 87B81E56 570001A4 C80006CA C95F5E1F 0000E9F4 46880000 ...F¶Ô...^_èò..àÈ..WV.¡...Àá^.&ú 0000A0
 46880006 E9037500 0030F646 89000004 B39A5016 F8468014 76FF1676 FF000207 ....v..v..F½.P.ª....F-=..u.Ô...F 0000C0
 880006E9 03750000 30F64689 000004D4 9A5016FC 46801476 FF1676FF 0131E9F6 -Ô1..v..v..F•.P.å....F-=..u.Ô... 0000E0
 06E90375 000030F6 46890000 04F59A50 16FE5C86 8D1476FF 1676FF01 10E9F646 F-Ô...v..v...\±.P.%....F-=..u.Ô. 000100
 9A5016FE 60868001 9568106A 000036FF 26002606 8E006A00 6A00EEE9 F6468800 ..F-ÔŸ.j.j...&.&.6..j.h....'±.P. 000120
 0006E903 75000030 F6468900 00FFFF9A 5016FE60 8680F876 FFFA76FF 0000FFFF .....vª.v½..'±.P......F-=..u.Ô.. 000140
 00300000 054E9A00 6A006A00 6A006A01 2468656A FC76FFFE 76FF00AF E9F6468B .F-ÔÉ..v±.v•jeh$.j.j.j.j..N...•. 000160
 0030F646 890000FF FF9A016A FE5CB6FF FE5EB6FF F876FFFA 76FF0034 E9037500 .u.Ô4..vª.v½.Â^±.Â\±j.......F-=. 000180
 F876FFFA 76FF0031 E9005EE9 F6468800 0006919A F876FFFA 76FF0011 E9037500 .u.Ô...vª.v½......F-Ô^.Ô1..vª.v½ 0001A0
 F876FFFA 76FF0011 E9037500 0030F646 89000006 479A006A FE5CB6FF FE5EB6FF .Â^±.Â\±j..G....F-=..u.Ô...vª.v½ 0001C0
 06E90375 000030F6 46890000 FFFF9AF8 76FFFA76 FF002AE9 F6468800 00FFFF9A ......F-Ôª..vª.v½......F-=..u.Ô. 0001E0

Dump of file SATURN:[PCCOMMON.DUMP.DLL]DANOTEDF.TMP;1 on 18-APR-1990 10:42:27.12
File ID (585,9,0)   End of file block 22 / Allocated 24

Virtual block number 7 (00000007), 512 (0200) bytes

 000002C8 0012CAC9 5F5E1F00 00E90000 88000107 C7260E5E C4000EE9 F6468800 ..F-Ô..á^.&ú...¡..Ô...^_èò..à... 000000
 0876FF0A 76FF0C76 FF0E76FF 1076FF12 76FF1476 FF1676FF D88E0567 881E5657 WV.¡g..Ä.v..v..v..v..v..v..v..v. 000020
 FF0030E9 FE468800 06E90375 000030FE 46890000 FFFF9AFF FF680352 680676FF .v.hR.h........F±=..u.Ô...F±ÔO.. 000040
 76FF1676 FF000007 359A00A1 681476FF 1676FF00 0007279A 00A06814 76FF1676 v..v.h...'....v..v.hÀ..5....v..v 000060
 06D4881E 56570000 0AC80012 CAC95F5E 1F0000E9 FE468800 0004529A 009F6814 .h...R....F±Ô...^_èò..à...WV.¡å. 000080
 FFFF9A50 16F6468D FC76FFFE 76FF0000 057F9A50 16FC468D 0E76FF10 76FFD88E .Ä.v..v..F•.P......v±.v•.F-.P... 0000A0
 FFF676FF F876FFFC 76FFFE76 FF0022E9 FA468800 06E90375 000030FA 46890000 ...Fª=..u.Ô...FªÔ"..v±.v•.v½.v—. 0000C0
 000064C8 000CCAC9 5F5E1F00 00E90000 FFFF9A00 6A0A76FF 0C76FF06 76FF0876 v..v..v..v.j......Ô...^_èò..àd.. 0000E0
 03750000 30EC4689 000005A0 9A5016F2 46800876 FF0A76FF D88E074E 881F5657 WV.¡N..Ä.v..v..F .P......F$=..u. 000100
 75000030 EC468900 00075E9A 5016EE46 8D0876FF 0A76FF01 37E9EC46 880C 6E9 Ô...F$Ô7..v..v..FŸ.P.^....F$=..u 000120
 E9037500 00300000 05C29A50 169C468D 0876FF0A 76FF0116 E9EC4688 0006E 03 .Ô...F$Ô...v..v..F..P.ô...=..u.Ô 000140
 FFEE76FF F076FF00 E7E90000 880006E9 03749E46 089C4688 00F8E9EC 46880006 ...F$Ô½..F..F.t.Ô..¡..ÔÔ..vÞ.vŸ. 000160
 E9EC4688 0006E903 75000030 EC468900 00FFFF9A 5016FC46 8D056A9C 76FF9E76 v..v.j..F•.P......F$=..u.Ô...F$Ô 000180
 F85EC4F6 46FF04F8 46830007 E90000F6 46C7FA56 89F84689 FE568BFC 468800BE ƒ..F•.V±.F½.VªúF-..Ô...F½..F-á^½ 0001A0
 16A0468D 37FF2602 77FF26F8 5EC4EE76 FFF076FF 007DE903 75024708 26078826 &..&.G.u.Ô)..vÞ.vŸá^½&.w.&.7.F.. 0001C0
 09069AFC 76FFFE76 FFEE76FF F076FF00 17E90375 000030EC 46890000 FFFF9A50 P......F$=..u.Ô...vÞ.vŸ.v±.v•... 0001E0

Dump of file SATURN:[PCCOMMON.DUMP.DLL]DANOTEDF.TMP;1 on 18-APR-1990 10:42:27.12
File ID (585,9,0)   End of file block 22 / Allocated 24

Virtual block number 8 (00000008), 512 (0200) bytes

 08EE9A50 16A0468D FF6A006A 01616806 76FFF276 FFF476FF 0058E9EC 46880000 ...F$ÔX..v¶.v .v.ha.j.j..F..P.Ÿ. 000000
 062A9A37 FF260277 FF26F85E C4F676FF 006A0169 680676FF F276FFF4 76FF0000 ...v¶.v .v.hi.j..v-á^½&.w.&.7.ª. 000020
 0000E900 00B80000 FFFF9AFC 76FFFE76 FFEE76FF F076FFFF 6DE900A0 46C60000 ..óF..Ôm..vÞ.vŸ.v±.v•.....¡..Ô.. 000040
 FC748689 00008800 03FC6686 C7D88E07 B4B81E56 5700039A C80006CA C95F5E1F .^_èò..à...WV.¡Ç..Äú.f•..¡....t• 000060
 16FC6A86 8D0876FF 0A76FF00 0007C49A 5016FC6E 86800876 FF0A76FF FC728689 ..r•.v..v...n•.P.á....v..v...j•. 000080
 76FFFC6E B6FFFC70 B6FF0000 08069A50 16FC4680 0876FF0A 76FF0000 07E59A50 P.¦....v..v..F•.P......Âp•.Ân•.v 0000A0
 00008800 06E90374 FE4608FC 46880000 08CE9A00 6A006A03 8468006A 01436806 .hC.j.h..j.j..ö....F•.F±t.Ô..¡.. 0000C0
 0000FFFF 9A5016FC 72868DFC 6686FFFC 76FFFE76 FFFC6AB6 FFFC6CB6 FF00B6E9 ÔÂ..Âl•.Âj•.v±.v•.Âf•..r•.P..... 0000E0
 005FE903 75FC7486 08FC7286 880086E9 FC68868B 0007E903 75000030 FC688689 ..h••..u.Ô....h•Ô....r•..t•u.Ô_. 000100
 86890000 FFFF9A50 16FC7686 80038468 FC72B6FF FC74B6FF FC6AB6FF FC6CB6FF .Âl•.Âj•.Ât•.Âr•h....v•.P....... 000120
 880000FF FF9A0016 681EFC68 B6FFFC6E B6FFFC70 B6FF001C E9037500 0030FC68 h••..u.Ô...Âp•.Ân•.Âh•.h........ 000140
 FF0014E9 00000A3F 9A5016FC 76868006 76FFFC6E B6FFFC70 B6FF0033 E9FC6886 .h•Ô3..Âp•.Ân•.v...v•.P.?...Ô... 000160
 0006CAC9 5F5E1F00 00E90000 880000FF FF9A0022 681E0676 FFFC6E86 FFFC7086 Âp•.Ân•.v..h"......¡..Ô...^_èò.. 000180
 E486C7F8 E88689F8 EA868900 00B80003 F73E86C7 D88E091F 881E5657 0008C2C8 àó..WV.¡...Äú.>%..¡....ô½..Ô½ú.ô 0001A0
 C6F80686 89F80886 89000088 FC728689 FC748689 00008800 00F8E686 C70384F8 ½..ú.¦½..¡....t•..r•¡....Ä½..ø½ó 0001C0
 419A5016 F8E0868D 1476FF16 76FF0789 26124688 065EC400 FC7686C6 00F8EC86 .$½.ó.v•.á^..F.&...v..v...Ä½.P.A 0001E0
```

```
Dump of file SATURN:[PCCOMMON.DUMP.DLL]DANOTEDF.TMP;1 on 18-APR-1990 10:42:27.12
File ID (585,9,0)   End of file block 22 / Allocated 24

Virtual block number 9 (00000009), 512 (0200) bytes

 9A5016FC 468D1476 FF1676FF 00000952 9A5016F8 DC868D14 76FF1676 FF000009 ....v..v...£½.P.R....v..v..Fe.P. 000000
 868DF73E B6FFFC76 FFFE76FF F8DCB6FF F8DEB6FF 000407C7 260E5EC4 00000962 b...á^.&ú....Ñ8½.ÑE½.vz.v=.Ñ>½.. 000020
 FF0C76FF 019668F8 DAB6FF00 19E90375 000030F8 DA868900 0009AC9A 5016F8E8 Ö½.P.¯.....Ö½=..u.Ö...ÑÖ½h...v.. 000040
 FFF8DEB6 FF0043E9 0375F8EA 860BF8E8 868B0416 E9F8DA86 8800000B 639A0A76 v..c.....Ö½Ö....Ö½..ö½u.ÖC..Ñ8½. 000060
 000030F8 DA868900 0009EA9A 5016FC76 868D0384 68F8E886 FFF8EA86 FFF8DCB6 ÑE½.Ñö½.ÑÖ½h....v=.P.ö.....Ö½=.. 000080
 B6FF03C6 E9F8DA86 8800000C 969A0A76 FF0C76FF 019668F8 DAB6FF00 19E90375 u.Ö...ÑÖ½h...v..v........Ö½Öó..Ñ 0000A0
 F8E286FF 00000BA3 9A038468 006A5016 F8EC868D 01C26812 76FFF8E0 B6FFF8E2 ä½.ÑÄ½.v.hò...$½.Pj.h...È....Ñä½ 0000C0
 E686C703 84F8E486 C700000B D99A006A 006A016A 006A01C1 681276FF F8E0B6FF .ÑÄ½.v.hè.j.j.j.j..1...ú.ø½..ú.1 0000E0
 F8D6868D 01C46812 76FFF8E0 B6FFF8E2 86FFF8D6 8689F8D8 86890000 B80000F8 ½..|....Ä½..ø½.Ñä½.ÑÄ½.v.há...ø½ 000100
 868B00F8 EC82C6FC 72B688FC 749689FC 72868900 00097E9A 5016F8E4 86805016 .P..Ö½.P.-......r=..t=.Ñr=ó.$½... 000120
 3008C483 0C310000 9A5016F8 EC868D50 16FC7686 80002DE9 0375F8EA 860BF8E8 Ö½..ö½u.Ö-....v=.P..$½.P...1..á.= 000140
 2A9A5016 F8EC868D 0024E903 0FE90000 88000107 C7260E5E C4000EE9 03740000 ..t.Ö..á^.&ú...|..Ö..Ö$...$½.P.* 000160
 006A006A 02E8E900 ^0880001 07C7260E 5EC4000E E9037400 003D04C4 830CAA00 .¯..á.=..t.Ö..á^.&ú...|..ÖÖ.j.j. 000180
 DCB6FFF8 DEB6FF00 0005F09A 5016F740 868D0195 68116A00 0036FF26 0026068E ..&.&.6..j.h....ø½.P.þ....Ñ8½.ÑE 0001A0
 FF019668 F8DAB6FF 0019E903 75000030 F8DA8689 00000601 9A5016F7 40868DF8 ½..ø½.P.......Ö½=..u.Ö...ÑÖ½h... 0001C0
 3004C483 02AE002A 9A5016F8 EC868D02 93E9F8DA 86880000 FFFF9A0A 76FF0C76 v..v........Ö½Ö....$½.P.*.Û..á.= 0001E0
```

```
Dump of file SATURN:[PCCOMMON.DUMP.DLL]DANOTEDF.TMP;1 on 18-APR-1990 10:42:27.12
File ID (585,9,0)   End of file block 22 / Allocated 24

Virtual block number 10 (0000000A), 512 (0200) bytes

 FFFE76FF F8DCB6FF F8DEB6FF 0002E903 75F8EA86 08F8E886 8800DFE9 03740000 ..t.ÖÖ...Ö½..ö½u.Öe..Ñ8½.ÑE½.vz. 000000
 26E90375 000030F8 DA868900 00FFFF9A 036AF8E8 B6FFF8EA B6FFF73E B6FFFC76 v=.Ñ>½.Ñö½.ÑÖ½j........Ö½=..u.Ö& 000020
 00000053 9AF8DCB6 FFF8DEB6 FF00000D 469A0A76 FF0C76FF 019668F8 DAB6FF00 ..ÑÖ½h...v..v..F....Ñ8½.ÑE½.S... 000040
 F8DA8689 0000FFFF 9AF8E886 FFF8EA86 FFF8DCB6 FFF8DEB6 FF021DE9 F8DA8688 ..Ö½Ö...Ñ8½.ÑE½.Ñö½.ÑÖ½.......Ö½ 000060
 B6FFF8DE B6FF0000 0DE89A0A 76FF0C76 FF019668 F8DAB6FF 0026E903 75000030 =..u.Ö&..ÑÖ½h...v..v..Ö....Ñ8½.Ñ 000080
 9A00A068 1476FF16 76FF0001 07C7260E 5EC401D6 E9F8DA86 88000000 F59AF8DC É½.½.....Ö½Öe.á^.&ú....v..v.h... 0000A0
 00000F0E 9A009F68 1476FF16 76FF0000 008C9A00 A1681476 FF1676FF 0000007E -....v..v.hÀ........v..v.h....... 0000C0
 F8E8868B 00A7E903 75000030 04C4830E 79002A9A 5016F8EC 868D019E E90000B8 |..Ö....$½.P.*.y..á.=..u.Ö1...Ö½ 0000E0
 86890000 FFFF9A50 16F8E886 80126AF8 DCB6FFF8 DEB6FF00 9AE90374 F8EA8608 ..Ö½t.Ö...Ñ8½.ÑE½j...Ö½.P....... 000100
 F8DEB6FF 00000E38 9A0A76FF 0C76FF01 9668F8DA B6FF0026 E9037500 0030F8DA Ö½=..u.Ö&..ÑÖ½h...v..v..;....Ñ8½ 000120
 B6FFFC76 FFFE76FF F8DCB6FF F8DEB6FF 0134E9F8 DA868800 000E489A F8DCB6FF .ÑE½.H.....Ö½Ö4..Ñ8½.ÑE½.vz.v=.Ñ 000140
 DAB6FF00 26E90375 000030F8 DA868900 00FFFF9A 036AF8E8 B6FFF8EA B6FFF73E >½.Ñö½.ÑÖ½j........Ö½=..u.Ö&..ÑÖ 000160
 F8DA8688 00000E82 9AF8DCB6 FFF8DEB6 FF00000E A59A0A76 FF0C76FF 019668F8 ½h...v..v..È....Ñ8½.ÑE½.ý.....Ö½ 000180
 F8E886FF F8EA86FF F8DCB6FF F8DEB6FF 0050E903 75F8EA86 08F8E886 8800E1E9 ÖÄ...Ö½..ö½u.Ö]..Ñ8½.ÑE½.Ñö½.ÑÖ½ 0001A0
 30F8DA86 890000FF FF9A5016 F8EC868D 504004C4 830C0A00 2A9A5016 F8EC868D ..$½.P.*....ó.ØP..$½.P.......Ö½= 0001C0
 DCB6FFF8 DEB6FF00 000EE49A 0A76FF0C 76FF0196 68F8DAB6 FF0026E9 03750000 ..u.Ö&..ÑÖ½h...v..v..ö....Ñ8½.ÑE 0001E0
```

```
Dump of file SATURN:[PCCOMMON.DUMP.DLL]DANOTEDF.TMP;1 on 18-APR-1990 10:42:27.12
File ID (585,9,0)   End of file block 22 / Allocated 24

Virtual block number 11 (0000000B), 512 (0200) bytes

 0030F8DA 86890000 06A29AF8 DCB6FFF8 DEB6FF00 77E9F8DA 86880000 0EF19̇F8 ½.þ.....Ö½Öw..Ñ8½.ÑE½.Á.....Ö½=. 000000
 F8DCB6FF F8DEB6FF 00000B13 9A0A76FF 0C76FF01 9668F8DA B6FF0026 E90375̇0 .u.Ö&..ÑÖ½h...v..v........Ñ8½.ÑE½ 000020
 0F1C9A00 A0681476 FF1676FF 000107C7 260E5EC4 0038E9F8 DA868800 0006509A .]......Ö½Ö8.á^.&ú....v..v.h..... 000040
 00B80000 07199A00 9F681476 FF1676FF 00000F2A 9A00A168 1476FF16 76FF0000 ...v..v.hÀ..*....v..v.h.......|. 000060
 FA468D06 76FF0876 FFD88E0A 58881E56 57000008 C80012CA C95F5E1F 0000E900 .Ö...^_èò..à...WV.|X..Ä.v..v..F* 000080
 03750000 30F84689 0000FFFF 9A5016FC 468D066A 1E6AFA76 FF000001 DF9A5016 .P.Ö....v*j.j..Fe.P.......F½=..u. 0000A0
 0876FFFC 76FFFE76 FF04C483 0FB31022 9A0676FF 0876FF00 A2E9F846 880006E9 Ö...F½ÖÄ..v..v..".*..á..vz.v=.v. 0000C0
 FF0876FF 0000FFFF 9AFC76FF FE76FF06 76FF0876 FF08C483 FFFF07AC 9A0676FF .v..¯....á..v..v..vz.v=......v.. 0000E0
 FF0876FF 0000FFFF 9A006A00 6A0676FF 0876FF00 00FFFF9A FFFF680F D3680676 v.h&.h........v..v.j.j........v.. 000100
 76FF0000 FFFF9AFF FF680FF5 680676FF 0876FF00 00FFFF9A FFFF680F E4680676 v.hõ.h........v..v.h%.h.........v 000120
 000036FF 26002606 8E646A06 76FF0876 FF0000FF FF9AFFFF 6806F468 0676FF08 ..v.h¶.h........v..v.jd..&.&.6.. 000140
 76FFD88E 0F43B81E 56570000 00C80004 CAC95F5E 1F0000E9 00008800 00FFFF9A .....|..Ö...^_èò..à...WV.|C..Ä.v 000160
 0876FF00 0010689A 006A006A 006AFFFF 68105C68 FFFF6810 3D68656A 0676FF08 ..v.jeh=.h..h\.h..j.j.j..h....v. 000180
 FF0876FF 00001085 9A006A00 6A016AFF FF681075 68FFFF68 FFFF6867 6A0676FF .v.jgh..h..hu.h..j.j.j.......v.. 0001A0
 6A0676FF 0876FF00 0010A49A 006A006A 016A006A 006AFFFF 68109268 6F6A0676 v.joh..h..j.j.j.j.j..È....v..v.j 0001C0
 B4680676 FF0876FF 000010C0 9A006A00 6A006AFF FF680F82 68FFFF68 10986879 yh..h..h..h..j.j.j..á....v..v.h. 0001E0
```

```
Dump of file SATURN:[PCCOMMON.DUMP.DLL]DANOTEDF.TMP;1 on 18-APR-1990 10:42:27.12
File ID (585,9,0)   End of file block 22 / Allocated 24

Virtual block number 12 (0000000C), 512 (0200) bytes

 FFFF6800 86680676 FF0876FF 0000100E 9A000068 1E016A00 6A006A00 6A006A00 .j.j.j.j..h...........v..v.h..h.. 000000
 68006A00 6A008768 0676FF08 76FF0000 10FC9A00 00681E01 6A006A00 6AFFFF68 h..j.j.j..h...e....v..v.h..j.j.h 000020
 FFFF6800 6A006A00 88680676 FF0876FF 0000111A 9A000068 1E006AFF FF68FFFF ..h..j..h........v..v.h..j.j.h.. 000040
 FF68FFFF 68006A00 6A008968 0676FF08 76FF0000 11389A00 00681E00 6AFFFF68 h..j..h...8....v..v.h..j.j.h..h. 000060
 6A006A00 6A116768 11646800 90680676 FF0876FF 00001156 9A000068 1E006AFF .j..h...V....v..v.h..hd.hg.j.j.j 000080
 6A006A00 6A006A11 85681182 68009E68 0676FF08 76FF0000 11749A00 6A006A00 .j.j..t....v..v.h..h..h..j.j.j.j 0000A0
 6A006A00 6A006A00 6A11A368 11A06800 9C680676 FF0876FF 00001192 9A006A00 .j.......v..v.h..h..hÊ.j.j.j.j.j 0000C0
 9A006A00 6A006A00 6A006A11 C16811BE 6800A068 0676FF08 76FF0000 11809A00 .. ....v..v.h..h/.hè.j.j.j.j.j.. 0000E0
 11EC9A00 6A006A00 6A006A00 6A11DF68 11DC6800 A1680676 FF0876FF 000011CE ö....v..v.hÀ.hÉ.hÖ.j.j.j.j.j..ß. 000100
 0000FFFF 9A006A00 6A006A00 6A006AFF FF68FFFF 68009F68 0676FF08 76FF0000 ...v..v.h..h..h..j.j.j.j.j...... 000120
 89260247 89260000 88105EC4 D88E102A 881E5657 000010C8 CBC95F5E 1F0000E9 Ô...^_èuà...WV.j°..Åé^.j..&.G.&. 000140
 E9F04688 0006E9C  75000030 F0468900 000AC09A 5016F446 800676FF 0876FF07 ..v..v..F¶.P.à....Fÿ=..u.Ô...FÞÖ 000160
 F0468800 06E9037> 000030F0 46890000 0AAF9A50 16FA4680 0676FF08 76FF00F0 Þ..v..v..F°.P.É....FÞ=..u.Ô...FÞ 000180
 FC76FF00 85E90000 0AD09A10 76FF1276 FF0676FF 0876FF00 6EE90A46 8800CFE9 Öü..F.Ön..v..v..v..v..Å...Öç..v= 0001A0
 6F6AFA76 FFFC76FF FE468900 00129D9A 006A006A 006A006A 0165686F 6AFA76FF .v°johe.j.j.j.j.......Fz.v=.v°jo 0001C0
 71E90000 88025789 26078926 105EC400 0008889A 006A006A FE76FF00 6A016A68 hj.j..vzj.j......é^.&..&.W.j..Öq 0001E0

Dump of file SATURN:[PCCOMMON.DUMP.DLL]DANOTEDF.TMP;1 on 18-APR-1990 10:42:27.12
File ID (585,9,0)   End of file block 22 / Allocated 24

Virtual block number 13 (00000000), 512 (0200) bytes

 30FFBAE9 03750067 30023E9 005EE900 00B8002C E9000DF2 46C70020 F846C700 .úF% .úF ..Ô..j..Ô^.Ö#.=g.u.Ô..= 000000
 F476FFF6 76FFFFD4 E9FFCAE9 03750086 30FFD2E9 03750084 30FF96E9 0375006F o.u.Ô..=..u.Ö#.=..u.Öò.Ö#..v-.v¶ 000020
 0030F046 890000FF FF9A1076 FF1276FF 006A006A F876FF0C 76FF0E76 FFF276FF .v .v..v..v%j.j..v..v.......FÞ=. 000040
 000300EF 02030050 90CBC95F 5E1F0000 E9000088 0006E9F0 46880006 E9037500 .u.Ô...FÞÖ..j..Ô...^_èu.P...ÿ... 000060
 00060FFB 02030000 00011037 0002015B 00050A08 020301D3 0006123E 020300E9 Ô...>...Æ........[...7.......«... 000080
 00020F96 0002007F 00011281 010302EA 00071146 02020060 00030E1D 02030254 T.......m...F...ö................ 0000A0
 00030CE1 02030087 0001031A 01030086 00010A28 01030004 0001028E 01030000 ............(..............Å... 0000C0
 00060FB9 02030000 J0051200 000201E3 00060055 02030000 0004009F 00020077 w...........U...D.............¿... 0000E0
 000308AE 02030013 00010275 01030339 00071001 0205016F 00050CFF 02030265 e.......o...l...9...u.........Ù... 000100
 00070070 02030000 00010FD6 0005047F 0001103A 00050008 00020F64 02030083 ....d.......:.........#.......p... 000120
 00060337 02030090 00010C65 01030344 000710F3 02050274 00060FA8 020302EA ö...-...t...µ...D...e.........7... 000140
 00030845 0203034E 0007112F 02050388 00010FB6 0005008F 000300CA 020301F7 %...ò.........Ñ......./...N...E... 000160
 00070492 02030204 000603A3 02030183 00061011 02030283 0006037D 02030099 ....)...............È............. 000180
 00071111 02050917 00011095 0005031A 00071056 0202001D 00030C78 020302FD »...x.......V..................... 0001A0
 00010FE7 00050192 000601CF 02030029 00030EC6 020300A5 00030E87 02030358 X.......É...ó...)...ü.......Ö... 0001C0
 00050892 02030297 00060179 02030215 00061049 0203030C 00070401 020301A3 È...........I.......y............ 0001E0

Dump of file SATURN:[PCCOMMON.DUMP.DLL]DANOTEDF.TMP;1 on 18-APR-1990 10:42:27.12
File ID (585,9,0)   End of file block 22 / Allocated 24

Virtual block number 14 (0000000E), 512 (0200) bytes

 00011078 00050034 0003076E 020302EA 00071149 02050082 0003000C 0203011F ........ý...I...ö...n...4...x... 000000
 0005079E 020301A8 00060F53 02030226 00060FC8 02030339 000710CE 020207AC  ...ö...9...à...&...S...  ........ 000020
 0006023E 02030344 000710F0 02020326 000706FA 020300C5 00030678 02030130 0...(...é...°...&...Þ...D...>... 000040
 00061266 0203013E 00051307 02030746 000106F7 00050234 00060FEA 020302B1 Ý...ð...4...%...F.......>...f... 000060
 0001105F 0005024C 00010FF8 00050054 00030830 0203034E 0007112C 020201B7 Ñ...,...N...*...T...%...L..._... 000080
 0007110E 02020244 00060F09 02030A50 0001109B 00050005 0003051C 020306CC à.......f.......P...\...D....... 0000A0
 00030AF5 020303B7 00080428 020301C7 0006121D 0203014E 00050028 02030358 X...(...N.......ú...+...ñ...%... 0000C0
 00000000 0000055F 00011040 000502C8 000602EA 0203031A 00071059 02050060 '...Y.......õ...ù...a..._........ 0000E0
 30F84689 0000FFFF 9A5016FA 46800A76 FF0C76FF D88EFFFF 881E5657 00000CC8 à...WV.j...Å.v..v..F°.P......F%= 000100
 00003DF8 46890000 FFFF9A50 16F4468D FA76FF00 68E9F846 880006E9 03750000 ..u.Ô...F%Ök..v°.F¶.P......F%=.. 000120
 0030F846 890000FF FF9A5016 FC468DF4 76FFF676 FF004DE9 F8468800 06E90375 u.Ô...F%ÖM..v-.v¶.F=.P......F%=. 000140
 E9037510 56390008 E903740E 4639FE56 88FC4688 002CE9F8 46880006 E9037500 .u.Ô...F%Ô,..F=.Vz9F.t.Ô..9V.u.Ô 000160
 0010C8CB C95F5E1F 0000E900 00FFFF9A 676AF476 FFF676FF 0010E900 00880006 ..j..Ô...v-.v¶jg.....Ô...^_èuà.. 000180
 7500003D F4468900 0000189A 5016FA46 800A76FF 0C76FFD8 8E000888 1E565700 .WV.j...Å.v..v..F°.P.......F¶=..u 0001A0
 E9037500 003DF446 89000000 369A5016 F0468DFA 76FF0094 E9F44688 00.. 903 .Ô...F¶Ô...v°.FÞ.P.6....F¶=..u.Ô 0001C0
 03750000 3DF44689 00000057 9A5016FC 468DF076 FFF276FF 0076E9F4 4688. 06 ...F¶Öv..v .vÞ.F=.P.W....F¶=..u. 0001E0
```

```
Dump of file SATURN:[PCCOMMON.DUMP.DLL]DANOTEDF.TMP;1 on 18-APR-1990 10:42:27.12
File ID (585,9,0)   End of file block 22 / Allocated 24

Virtual block number 15 (0000000F), 512 (0200) bytes

00FFFF9A 5016F646 8D036AFC 76FFFE76 FF0A76FF 0C76FF00 55E9F446 880006E9 Õ...F¶ÕU..v..v..vt.v=j..F-.P.... 000000
0008E903 740E4639 F85688F6 4688002C E9F44688 0006E903 7500003D F4468900 ..F¶=..u.Õ...F¶Õ,..F-.V½9F.t.Õ.. 000020
5E1F0000 E9FFFF09 179A796A F076FFF2 76FF0010 E9000088 0006E903 75105639 9V.u.Õ..¡..Õ...v·.vÞjy.....Õ...^ 000040
89000000 859A5016 FA46800A 76FF0C76 FFD88E00 A5881E56 5700000C CBCBC95F  èùà...WV.¡Ê..Ä.v..v..F².P.ç.... 000060
F8468900 0000039A 5016F446 8DFA76FF 0068E9F8 46880006 E9037500 003DF846 F½=..u.Õ...F½Õk..v².F¶.P.¢....F½ 000080
46890000 00F49A50 16FC4680 F476FFF6 76FF004D E9F84688 0006E903 7500003D =..u.Õ...F½ÕM..v-.v¶.F=.P.¶....F 0000A0
10563900 08E90374 0E4639FE 5688FC46 88002CE9 F8468800 06E90375 00003DF8 ½=..u.Õ...F½Õ,..F=.V±9F.t.Õ..9V. 0000C0
CBC95F5E 1F0000E9 FFFF8800 00FFFF9A 006AFA76 FF0010E9 00008800 06E90375 u.Õ..¡..Õ...v²j......¡..Õ...^_èù 0000E0
3DF04689 0000017B 9A5016FA 4680DA76 FF0C76FF D88E016B 881E5657 000010C8 à...WV.¡k..Ä.v..v..F².P.(....FÞ= 000100
000030F0 46890000 01999A50 16F24680 FA76FF00 8AE9F046 880006E9 03750000 ..u.Õ...FÞÕ¤..v².F·.P......FÞ=.. 000120
0030F046 89000001 8A9A5016 FC4680F2 76FFF476 FF009CE9 F0468800 06E90375 u.Õ...FÞÕ...v¶.v·.F=.P.¤....FÞ=. 000140
30F04689 0000FFFF 9A5016F6 4680F276 FFF476FF 007BE9F0 46880006 E9037500 .u.Õ...FÞÕ(..v¶.v·.F-.P......FÞ= 000160
03751056 390008E9 03740E46 39FE5688 FC468800 5AE9F046 880006E9 03750000 ..u.Õ...FÞÕZ..F=.V±9F.t.Õ..9V.u. 000180
FF0028E9 00008800 06E90375 14563900 08E90374 124639FE 5688FC46 88001CE9 Õ...F=.V±9F.t.Õ..9V.u.Õ..¡..Õ(.. 0001A0
9A6F6AF2 76FFF476 FF0000FF FF9A006A 006A006A 006A016E 686F6AF6 76FFF876 v½.v-john.j.j.j.j........v¶.v·jo. 0001C0
76FF0E76 FF1076FF D88E0208 881E5657 000000C8 CBC95F5E 1F0000E9 015907AC ¯.Y.Õ...^_èùà...WV.¡...Ä.v..v..v 0001E0

Dump of file SATURN:[PCCOMMON.DUMP.DLL]DANOTEDF.TMP;1 on 18-APR-1990 10:42:27.12
File ID (585,9,0)   End of file block 22 / Allocated 24

Virtual block number 16 (00000010), 512 (0200) bytes

D88E02F4 881E5657 000000C8 CBC95F5E 1F0000E9 08C483FF FF04049A 0A76FF0C ..v.......á.Õ...^_èùà...WV.¡¶..Ä 000000
000000C8 CBC95F5E 1F0000E9 08C48303 0704049A 0A76FF0C 76FF0E76 FF1076FF .v..v..v..v.......á.Õ...^_èùà... 000020
1F0000E9 08C48303 7F04049A 0A76FF0C 76FF0E76 FF1076FF D88E031C 881E5657 WV.¡...Ä.v..v..v..v..v...../.¯á.Õ... 000040
5704049A 0A76FF0C 76FF0E76 FF1076FF D88E0344 881E5657 000000C8 CBC95F5E ^_èùà...WV.¡D..Ä.v..v..v..v..v...W 000060
76FF0E76 FF1076FF D88E036C 881E5657 000000C8 CBC95F5E 1F0000E9 08C48303 ..¯á.Õ...^_èùà...WV.¡l..Ä.v..v..v 000080
D88E0394 881E5657 000000C8 CBC95F5E 1F0000E9 08C48303 7F04049A 0A76FF0C ..v.......á.Õ...^_èùà...WV.¡...Ä 0000A0
000000C8 CBC95F5E 1F0000E9 08C48303 A704049A 0A76FF0C 76FF0E76 FF1076FF .v..v..v..v.....§..¯á.Õ...^_èùà... 0000C0
1F0000E9 08C48303 CF04049A 0A76FF0C 76FF0E76 FF1076FF D88E03BC 881E5657 WV.¡¼..Ä.v..v..v..v..v.....ü..¯á.Õ... 0000E0
00000218 9A5016FA 4680D676 FF0876FF D88E03E4 881E5657 000018C8 CBC95F5E ^_èùà...WV.¡Õ..Ä.v..v..F².P..... 000100
46890000 02369A50 16EC4680 FA76FF01 18E9F046 880006E9 03750000 3DF04689 .FÞ=..u.Õ...FÞÕ...v².F±.P.6....F 000120
89000002 579A5016 FC4680EC 76FFFE76 FF00FAE9 F0468800 06E90375 00003DF0 Þ=..u.Õ...FÞÕ²..vŸ.v±.F=.P.W.... 000140
00000278 9A5016F6 4680EC76 FFEE76FF 0009E9F0 46880006 E9037500 003DF046 FÞ=..u.Õ...FÞÕ¡..vŸ.v±.F-.P.x... 000160
8D056AFC 76FFFE76 FF0676FF 0876FF00 88E9F046 880006E9 03750000 3DF04689 .FÞ=..u.Õ...FÞÕ¡..v..v..vt.v=j.. 000180
F45688F2 4688008F E9F04688 0006E903 7500003D F0468900 00FFFF9A 5016F246 F·.P......FÞ=..u.Õ...FÞÕ...F·.V¶ 0001A0
88E85EC4 0056E903 7502470B 26078826 E85EC404 E8468300 04E9EA56 89E84689 .FÕ.VÕÕ...FÕ.á^Õ8..&.G.u.ÕV.á^Õ. 0001C0
FFF476FF 0676FF08 76FF0039 E9037402 57392600 42E90374 0739260C 56880A46 F..V.&9.t.Õ8.&9W.t.Õ9..v..v..v¶. 0001E0

Dump of file SATURN:[PCCOMMON.DUMP.DLL]DANOTEDF.TMP;1 on 18-APR-1990 10:42:27.12
File ID (585,9,0)   End of file block 22 / Allocated 24

Virtual block number 17 (00000011), 512 (0200) bytes

FF000002 D39A006A 006A006A 006A016E 686F6AF6 76FFF876 FF000005 3F9AF276 v·.?....v½.v-john.j.j.j.j..¢.... 000000
FF9AF276 FFF476FF 0676FF08 76FFFF97 E9001AE9 02E207AC 9A6F6AEC 76FFEE76 vŸ.vŝjo.¯.ä.Õ..Õ...v..v..v¶.v·.. 000020
0A76FF0C 76FFD88E 040C881E 56570000 10C8C8C9 5F5E1F00 00E90000 880000FF ...¡..Õ...^_èùà...WV.¡...Ä.v..v. 000040
4680FA76 FF00CEE9 F0468800 06E90375 000030F0 46890000 041C9A50 16FA4680 .F².P......FÞ=..u.Õ...FÞÕö..v².F 000060
8DF276FF F476FF00 80E9F046 880006E9 03750000 30F04689 0000043A 9A5016F2 ·.P.:....FÞ=..u.Õ...FÞÕ¯..v¶.v·. 000080
F276FFF4 76FF008F E9F04688 0006E903 7500003D F0468900 0004589A 5016FC46 F=.P.[....FÞ=..u.Õ...FÞÕ...v¶.v· 0000A0
5688FC46 88006EE9 F0468800 06E90375 000030F0 46890000 047C9A50 16F64680 .F-.P.|....FÞ=..u.Õ...FÞÕn..F=.V 0000C0
390008E9 03741246 39FE5688 FC468800 1CE90375 10563900 08E90374 0E4639FE ±9F.t.Õ..9V.u.Õ...F=.V±9F.t.Õ..9 0000E0
FF0000FF FF9A0024 681E0084 68F676FF F876FF00 3CE90000 880006E9 03751456 V.u.Õ..¡..Õ<..v½.v-h...h§....... 000100
8668F276 FFF476FF 00000518 9A006A00 6A006A00 6A016E68 008668F6 76FFF876 v½.v-h..hn.j.j.j.j........v¶.v·h. 000120
0A76FF0C 76FFD88E 0556881E 56570000 18C8C8C9 5F5E1F00 00E90000 FFFF9A00 ......Õ...^_èùà...WV.¡V..Ä.v..v. 000140
4680F276 FF012CE9 EC468800 06E90375 000030EC 46890000 05669A50 16F24680 .F·.P.f....F§=..u.Õ...F§Õ,..v·.F 000160
80E876FF EA76FF01 0EE9EC46 880006E9 03750000 30EC4689 00000584 9A5016E8 Õ.P......F§=..u.Õ...F§Õ...vÕ.vÕ. 000180
E876FFEA 76FF00ED E9EC4688 0006E903 7500003D EC468900 0005A59A 5016FC46 F=.P.Ê....F§=..u.Õ...F§ÕÜ..vÕ.vÕ 0001A0
76FF0C76 FF00CCE9 EC468800 06E90375 000030EC 46890000 05C69A50 16EE4680 .FŸ.P.Ó....F§=..u.Õ...F§Õä..v..v 0001C0
46880006 E9037500 003DEC46 89000004 A59A5016 F8468004 6AFC76FF FE76FF0A ..vt.v=j..F½.P.Ê....F§=..u.Õ...F 0001E0
```

```
Dump of file SATURN:[PCCOMMON.DUMP.DLL]DANOTEDF.TMP;1 on 18-APR-1990 10:42:27.12
File ID (585,9,0)   End of file block 22 / Allocated 24

Virtual block number 18 (00000012), 512 (0200) bytes

 470B2607 8826F45E C404F446 830004E9 F65689F4 4689FA56 8BF8468B 00A3E9EC àÕÉ..F½.V'.F¶.V-Õ...F¶.á^¶&..&.G 000000
 004DE903 74025739 260056E9 03740739 2610568B 0E4688F4 5EC4006A E9037502 .u.Õj.á^¶.F..V.&9.t.ÕV.&9W.t.ÕM. 000020
 1B9A0025 681E00A4 68EE76FF F076FF00 00079D9A F876FFFA 76FF0A76 FF0C76FF .v..v..v'.v½......vÞ.vÝh...h%... 000040
 FFEA76FF 00000634 9A006A00 6A006A00 6A016E68 008668EE 76FFF076 FF000006 ....vÞ.vÝh..hn.j.j.j.j..4....vð. 000060
 0005039A F876FFFA 76FF0A76 FF0C76FF FF83E900 1AE90000 06429A00 8668E876 vÕh...B...Õ..Õ...v..v..v'.v½.... 000080
 46800676 FF0876FF D88E0656 881E5657 000008C8 CBC95F5E 1F0000E9 00008800 .¡..Õ...^_èúà...WV.¡V..Ã.v..v..F 0000A0
 800676FF 0876FF02 86E9F846 880006E9 03750000 30F84689 0000FFFF 9A5016FE ±.P......F½=..u.Õ...F½Õ...v..v.. 0000C0
 FC76FFFE 76FF0265 E9F8468B 0006E903 7500003D F8468900 00FFFF9A 5016FA46 F'.P......F½=..u.Õ...F½Õe..v±.v• 0000E0
 46880006 E9037500 0030F846 890000FF FF9A5052 0002050C 56880A46 88FA76FF .v'.F..V....RP......F½=..u.Õ...F 000100
 46890000 08E69AFF FF68085D 68026A15 6A0277FF 260477FF 260A5EC4 023BE9F8 ½Õ;.á^.&.w.&.w.j.j.h].h...|....F 000120
 68088468 156A0277 FF260477 FF260A5E C40210E9 F8468800 06E90375 000030F8 ½=..u.Õ...F½Õ..á^.&.w.&.w.j.h..h 000140
 260477FF 260A5EC4 01E7E9F8 46880006 E9037500 0030F846 890000FF FF9AFFFF ........F½=..u.Õ...F½ÕÕ.á^.&.w.& 000160
 C401C0E9 F8468800 06E90375 000030F8 46890000 FFFF9AFF FF6808AF 680277FF .w.hÉ.h........F½=..u.Õ...F½Õà.á 000180
 890000FF FF9AFFFF 6808E068 08886808 8568056A 156A0277 FF260477 FF260A5E ^.&.w.&.w.j.j.hç.h¡.hÅ.h........ 0001A0
 68026A02 6A0277FF 260477FF 260A5EC4 018FE9F8 46880006 E9037500 0030F846 F½=..u.Õ...F½Õ..á^.&.w.&.w.j.j.h 0001C0
 FF260A5E C40164E9 F8468800 06E90375 000030F8 46890000 09119AFF FF68090B ..h........F½=..u.Õ...F½Õd.á^.&. 0001E0

Dump of file SATURN:[PCCOMMON.DUMP.DLL]DANOTEDF.TMP;1 on 18-APR-1990 10:42:27.12
File ID (585,9,0)   End of file block 22 / Allocated 24

Virtual block number 19 (00000013), 512 (0200) bytes

 0006E903 7500003D F8468900 00093C9A FFFF6809 36682F6A 016A0277 FF260477 w.&.w.j.j/h6.h...<....F½=..u.Õ.. 000000
 00000967 9AFFFF68 09616802 6A066A02 77FF2604 77FF260A 5EC40139 E9F8468B .F½Õ9.á^.&.w.&.w.j.j.ha.h...g... 000020
 026A076A 0277FF26 0477FF26 0A5EC401 0EE9F846 880006E9 03750000 3DF84689 .F½=..u.Õ...F½Õ..á^.&.w.&.w.j.j. 000040
 260A5EC4 00E3E9F8 46880006 E9037500 0030F846 89000009 929AFFFF 68098C68 h..h........F½=..u.Õ...F½Õ0.á^.& 000060
 06E90375 000030F8 46890000 09BD9AFF FF6809B7 68026A05 6A0277FF 260477FF .w.&.w.j.j.hñ.h...§....F½=..u.Õ. 000080
 00FFFF9A FFFF6803 F768026A 036A0277 FF260477 FF260A5E C40088E9 F8468800 ..F½Õ¡.á^.&.w.&.w.j.j.h%.h...... 0000A0
 6A096A02 77FF2604 77FF260A 5EC4008D E9F8468B 0006E903 7500003D F8468900 ..F½=..u.Õ...F½Õ..á^.&.w.&.w.j.j 0000C0
 0A5EC400 62E9F846 880006E9 03750000 30F84689 00000A44 9AFFFF68 0A006802 .h..h...D....F½=..u.Õ...F½Õb.á^. 0000E0
 F8468900 00088B9A FFFF680A 3E680A16 680A1368 046A156A 0277FF26 0477FF26 &.w.&.w.j.j.h..h..h>.h...£....F½ 000100
 08346802 6A006A02 77FF2604 77FF260A 5EC40031 E9F8468B 0006E903 7500003D •..u.Õ...F½Õ1.á^.&.w.&.w.j.j.h4. 000120
 1F0000E9 F8468800 06E9F846 880006E9 03750000 30F84689 0000083A 9AFFFF68 h...:....F½=..u.Õ...F½Õ...F½Õ... 000140
 0002007F 00010778 01030000 0001052A 000201D3 000606C6 02030023 CBC95F5E ^_èú#...ó...&...•.......x....... 000160
 0005064E 00020A41 00050086 0001075F 010303CA 00080A19 02030000 000209E2 â............ò..._.......A...N... 000180
 000500FC 000401F1 02030083 0003074D 02030000 000507B4 0002054E 00020A10 ....N...Ç.......M.......þ...•... 0001A0
 02030108 00040684 02030364 00020964 00050163 00020860 0005030C 000209E5 |...É...'...c...d...d........... 0001C0
 00050200 00020882 0005037F 00080863 020302EC 000208E3 00050368 0008080F ....h...D...&...c.......ý....... 0001E0

Dump of file SATURN:[PCCOMMON.DUMP.DLL]DANOTEDF.TMP;1 on 18-APR-1990 10:42:27.12
File ID (585,9,0)   End of file block 22 / Allocated 24

Virtual block number 20 (00000014), 512 (0200) bytes

 00050393 000809E8 0203031A 00070091 0203038C 0002098F 00050000 00020837 7........................Ò....... 000000
 02030048 00030666 02030090 00020887 000501A8 000607C4 02030314 0002090E .........á...`..........f...H... 000020
 00050339 00070786 02030054 000306EF 020301B7 000606A5 020303A4 0008088A ....É...É...ñ...ÿ...1.......9... 000040
 0000033C 00020939 00050060 0003011D 020301C7 000607E5 02030384 0002098A a...Ç...Í...ú.......'...9...<... 000060
 00000000 00000000 00000600 02000200 01CB0001 881F0000 3E89D88E FFFFB81E .|...Ã.>...|..ù................. 000080
 1DC01B05 74A6F3F9 2BD1F7AE F2FFFFB9 C0330A7E C40676C5 1EDE88D7 88EC8855 U.Å.®.B.év.á-.3à¿..·ÛÅ1+ªµ|t..Å. 0000A0
 5DFA8891 49D1F7AE F2FFFFB9 C033067E C4D788EC 885500CB 5DFA88F3 881FFFFF ....µ.ª]ù.U.Å.®á-.3à¿..·ÛÅ1|..ª] 0000C0
 2D3C50F7 74093CFB 74203CAC 083399C0 330676C5 1E5657EC 88550000 01E900CB ù.Õ...U.$WV.év.3à.3Ü¯< t«<.t¼P<- 0000E0
 0302D1E3 D1D2D1E3 D1FA88C8 8802D1E3 D11B7230 2C1F7739 3CAC0175 2B3C0474 t.<+u.¯<9w.,0r.ÑDÑ.ù.ªÑDÑÑDÑ. 000100
 00000000 CB505F5E 1FDAF700 028308F7 0775932D 3C58DCE8 00028308 03071309 \.®.Ã.®.SÉX<·.u.%Ã.®.%Õ.^ ]ù.... 000120
 73654474 696E496A 624F0000 00000000 00000000 00890088 00870086 00840008 ........................ObjInitDes 000140
 00000000 00000000 00000000 00000000 00060026 00020001 FFFF0000 00000063 c...........&................... 000160
 2065746F 6E20666F 20737574 61747320 7463656C 65732065 74616470 552F0352 R./Update select status of note  000180
 6F20747B 65742065 74616470 55210060 726F6620 676E6F6C 2065746F 6E206E69 in note long form.!Update text o 0001A0
 00010001 00010001 00010001 0060726F 6620676E 6F6C2065 746F6E20 6E692066 f in note long form............ 0001C0
 00000000 FFFF0001 000E0352 00000400 00010001 00010001 00010001 00010001 ....................R........... 0001E0
```

```
Dump of file SATURN:[PCCOMMON.DUMP.DLL]DANOTEDF.TMP;1 on 18-APR-1990 10:42:27.12
File ID (585,9,0)   End of file block 22 / Allocated 24

Virtual block number 21 (00000015), 512 (0200) bytes

00000000 0339FFFF 00640130 00FAFFCC 00921400 00900338 00000001 00000001 ........8.......ä.*.=.d...9..... 000000
00000000 0000FFFF FFFF0065 00080028 01300005 80020002 03300006 00030000 ......=.......0.(...e........... 000020
00060000 00000000 FFFFFFFF 00660008 003C0120 00058001 00010344 000A0005 ....D....... .<...f............ 000040
000E0005 00000000 0000FFFF FFFF0067 000800EC 01150007 8002000C 034F0000 ..O.........ì...g............... 000060
035F0000 00070000 00000000 FFFFFFFF 006E0008 00640103 00058001 00010350 P.........d...n................_. 000080
00010360 00050005 00000000 0000FFFF FFFF006F 002C00F0 00D60005 80000000 ......ø.Þ.,.o................`... 0000A0
80030007 03660000 000A0000 00000000 FFFFFFFF 00780008 003400C6 00058001 ....6.4...x...............f..... 0000C0
00058001 00010367 00080005 00000000 0000FFFF FFFF0079 003000F0 00940005 ....Þ.0.y..............ç....... 0000E0
00780007 80020008 03700000 00060000 00000000 FFFFFFFF 00830008 002A0084 ..*....................p.. ....x. 000100
0064006C 00058001 00010371 00080005 00000000 0000FFFF FFFF0084 000800C0 à....................q........l.d. 000120
003000C5 003A0005 80000000 037A0000 00070000 00000000 FFFFFFFF 00850008 ...................z........:.é.0. 000140
0087000C 0026005E 00CF8002 0400037B 00030003 00000000 0000FFFF FFFF0086 .................(.....ü.^.&..... 000160
FFFF0088 000C0026 004C00CF 80020000 037F0007 00030000 00000000 FFFFFFFF ......................ü.L.&....... 000180
FFFFFFFF 0089000C 0026003A 00CF8002 00000387 00060003 00000000 0000FFFF ....................ü.:.&......... 0001A0
0000FFFF FFFF0096 002000F0 00050005 80010002 038E0010 00050000 00000000 .....................Þ.-.......... 0001C0
00000000 FFFFFFFF 00970008 0019001F 00388001 0001039F 00040005 00000000 ..............8.................. 0001E0

Dump of file SATURN:[PCCOMMON.DUMP.DLL]DANOTEDF.TMP;1 on 18-APR-1990 10:42:27.12
File ID (585,9,0)   End of file block 22 / Allocated 24

Virtual block number 22 (00000016), 512 (0200) bytes

00000000 0000FFFF FFFF0098 0008001A 001F0078 80010001 03A40004 00050000 ......È.....x..................... 000000
00050000 00000000 FFFFFFFF 00990008 001A001F 00888001 000103A9 00040005 ....`.....|...................... 000020
00070005 00000000 0000FFFF FFFF009A 00080028 0014000A 80010001 03AE0007 ..Û.........(..................... 000040
03BE000A 00050000 00000000 FFFFFFFF 00980008 00280009 000A8001 000103B6 Ñ.........(...................¶. 000060
000103C9 000A0005 00000000 0000FFFF FFFF009C 00080037 00140038 80010001 ....8...7....................è... 000080
80010001 0304000A 00050000 00000000 FFFFFFFF 00900008 00370014 00788001 ..x...7....................Á..... 0000A0
00388001 0001030F 000A0005 00000000 0000FFFF FFFF009E 00080037 00140088 |...7......................Ô.....8. 0000C0
00090078 80010001 03EA000A 00050000 00000000 FFFFFFFF 009F0008 00360009 ..6......................õ.....x... 0000E0
00360009 00888001 000103F5 000A0005 00000000 0000FFFF FFFF00A0 00080036 6......................¥.....|...6. 000100
00003A65 6D616E20 65746F4E 00746365 6C655300 00000000 FFFFFFFF 00A10008 ..Å..........Select.Note name:.. 000120
003A6472 6F777965 4800003A 74786554 00007962 20646563 6E657265 6665522A *Referenced by..Text:..Keyword:. 000140
73550065 74656C65 44006563 616C7065 52006464 41000073 64726F77 79654800 .Keywords..Add.Replace.Delete.Us 000160
72430072 65735500 65606954 00657461 44006E6F 69746160 726F666E 69207265 er information.Date.Time.User.Cr 000180
5F5F5F5F 5F5F5F00 5F5F5F5F 5F5F5F5F 5F5F0064 65746164 70550064 65746165 eated.Updated.__________.________ 0001A0
5F5F5F5F 5F5F005F 5F5F5F5F 5F5F5F5F 5F005F5F 5F5F5F5F 5F5F5F5F 005F5F5F ___.___________.___________.______ 0001C0
00000000 00000000 00000000 00000000 005F5F5F 5F5F5F5F 5F5F5F00 5F5F5F5F ____.____________................ 0001E0

Dump of file SATURN:[PCCOMMON.DUMP.DLL]DAPICK.TMP;1 on 18-APR-1990 10:42:30.89
File ID (589,27,0)   End of file block 9 / Allocated 12

Virtual block number 1 (00000001), 512 (0200) bytes

00000000 00000040 00000000 00000088 0000FFFF 00000004 00000007 01EC5A40 MZ&.............|........a....... 000000
00000080 00000000 00000000 00000000 00000000 00000000 00000000 00000000 ................................ 000020
6F6E6E61 63206D61 72676F72 70207369 685421CD 4C01B821 CD09B400 0EBA1F0E ..¤..Ç.ël|.LëlThis program canno 000040
00000000 00000024 0A0D0D2E 65646F6D 20534F44 206E6920 6E757220 65622074 t be run in DOS mode....$....... 000060
00040008 00000000 00030000 00000000 00058009 6439FF2E 0012014D 0505454E NE..M.....9d..................... 000080
00000000 00000000 00010002 00040000 000001DF 00ED00E5 00880080 0040001E ..a.....|.Ù.Ô.................... 0000A0
00480F00 00480009 000F0F00 000F0007 06D20F00 06D20060 036E0F00 036D0020 .m...n.'.Ø...Ø.¤........l.H...H. 0000C0
0138IEB1 013B00F4 013B1E81 013B00E0 00020E21 00000000 00100F21 0002000F Ô...|.........|...Å.;.Ý.;.¶.;.Ý.;. 0000E0
01544345 4A424F45 4"4F4843 49500000 00484349 50414406 00340004 00330004 ..3...4..DAPICK...PICKONEOBJECT. 000100
4E414D45 534F4F48 4 '14418 00025453 494C4D4F 5246594E 414D4843 49501000 ..PICKMANYFROMLIST...DACHOOSEMAN 000120
43454A42 4F594E41 4D484349 500F0003 434F5250 474C4454 53494C4D 4F524659 YFROMLISTDLGPROC...PICKMANYOBJEC 000140
6D640353 4C4C4143 534F4408 4E49574D 50050000 4E001000 07000100 00045354 TS.........N...PMWIN.DOSCALLS.dm 000160
49465952 4555514C 4D440D45 4C444E41 484C4544 4F4D5952 4555514C 4D44136C l.DMLQUERYMODELHANDLE.DMLQUERYFI 000180
004D454D 03545349 4C454552 464C4D44 084E4C52 59524555 514C4D44 08444C45 ELD.DMLQUERYRLN.DMLFREELIST.MEM. 0001A0
1A000001 06030330 0305FD03 0203021E 03010148 434F4C42 434F4C4C 414D454D MEMALLOCBLOCK........».0..ø.... 0001C0
00000000 00007974 696C6963 61462065 736F6F68 43204144 204D5020 322F534F OS/2 PM DA Choose Facility...... 0001E0
```

```
Dump of file SATURN:[PCCOMMON.DUMP.DLL]DAPICK.TMP;1 on 18-APR-1990 10:42:30.89
File ID (589,27,0)    End of file block 9 / Allocated 12

Virtual block number 2 (00000002), 512 (0200) bytes

 5EC4FA56 89F84689 08568806 468801E1 E90E4688 D88EFFFF 881E5657 000078C8 àx..WV.|...Ä.F.ÕÄ..F..V..F%.V*á^ 000000
 FFFE5689 FC468912 57882610 478826F8 5EC48256 89804689 02578826 078826F8 ½&..&.W..F¯.Vý á^½&.G.&.W..F=.V±. 000020
 4EE90375 02470826 078826FC 5EC40000 FFFF9AF8 76FFFA76 FF006A10 76FF1276 v..v.j..v'.v½.....á^=&..&.G.u.ÕN 000040
 00003000 00FFFFyA 50168846 80026A37 FF260277 FF26FC5E C4B076FF B276FF00 ..vý.v¯á^=&.w.&.7j..F..P.....=.. 000060
 468DFF6A 006A0161 68008268 1076FF12 76FF0189 E900008A 0004B800 09E90375 u.Õ..|..¤..Õ...v..v.h..he.j.j..F 000080
 76FF0057 E90C4688 0071E90A 4688015C E9FFA3E9 04FC4683 00000003 9A501688 ..P.&....F=.ÕE.Õ\..F.Õq..F.ÕW..v 0000A0
 1076FF12 76FFF646 89000000 F99A006A 006A006A 006A0165 68008268 1076FF12 ..v.h..he.j.j.j.j..*....F-.v..v. 0000C0
 1276FF00 0001529A 50168446 80505242 CA830000 00022BF6 46880168 680A76FF .v.hh..F-+@....ðBRP.FÇ.P.R....v. 0000E0
 FFEFE9FF A1E90375 00013000 08E9000E E90000FF FF9A5016 B4468D6E 6A1076FF .v.jn.FÇ.P.....Õ..Õ..*..u.ÕÄ.Õÿ. 000100
 1276FF00 80E90A46 880007E9 FFEFE9FF 87E90375 00823000 08E9000E E90011E9 Õ..Õ..Õ..*..u.Õ..Õÿ.Õ=..F.Õ...v. 000120
 6A1076FF 1276FFF6 46890000 FFFF9A00 6A006A00 6A006A01 65680082 681076FF .v.h..he.j.j.j.j.......F-.v..v.j 000140
 02508826 00882610 5FC426F8 5EC402E6 C1F6768B FA5689F8 46890000 FFFF9A00 .......F½.V*.v-êl.á^½&á_.&..&.P. 000160
 76FF0032 E9000001 A79A016A 1076FF12 76FF0257 89260789 26145FC4 26F85EC4 á^½&á_.&..&.W..v..v.j..T...Õ2..v 000180
 00463000 13E90016 E90019E9 0063E900 008A0000 880000FF FF9A156A 107o F12 ..v.j¯.....|..¤..Õc.Õ..Õ..Õ..=F. 0001A0
 FF0C76FF 0E76FF10 76FF1276 FF0038E9 FFE7E9FF D1E90375 005030FF 78E9L 75 u.Õx.=P.u.Õl.ÕÕ.Õ;..v..v..v..v.. 0001C0
 03750030 30FF3CE9 03750020 30001BE9 0027E900 00FFFF9A 0676FF08 76FF0A76 v..v..v......Õ'.Õ..* .u.Õ<.=0.u. 0001E0

Dump of file SATURN:[PCCOMMON.DUMP.DLL]DAPICK.TMP;1 on 18-APR-1990 10:42:30.89
File ID (589,27,0)    End of file block 9 / Allocated 12

Virtual block number 3 (00000003), 512 (0200) bytes

 30C8000E CAC95F5E 1F0000E9 00008A00 0088FFC5 E9FE07E9 03750038 30FEAFE9 ÕE±=;.u.Õ.±Õé.|..¤..Õ...^_èð..à0 000000
 FFFF9A50 160C468D 1076FF12 76FF0000 07C7260A 5EC4D88E 0008881E 56570000 ..WV.|...Äá^.&ú....v..v..FE.P... 000020
 FFDC76FF DE76FF10 76FF1276 FF0114E9 000A8800 06E90375 00003002 46890000 ...F@=..u.Õ..|..Õ...v..v..vB.vÊ. 000040
 E05EC400 EAE9000A B80006E9 03750000 30D24689 0000FFFF 9A5016E0 46800E76 v..FÁ.P......F@=..u.Õ..|..Õð.á^Á 000060
 12568810 468800CD E90000B8 001407C7 260A5EC4 000EE903 74024708 26078826 &..&.G.t.Õ..á^.&ú...|..Õë..F..V. 000080
 006AFA56 89F84689 08568806 4688F656 89F44689 E25688E0 4688E656 89E44689 .FÕ.Vl.FÁ.Vã.F¶.V-.F..V..F½.V*j. 0000A0
 00FFFF9A 5016E446 8D336A00 0036FF26 0000068E FFFF68FF FF68016A 006A016A j.j.j.h..h......&.6..j3.FÕ.P.... 0000C0
 56890846 890000FF FF9A006A 006A0015 E90374D6 460B0446 88D65689 D4468900 ..FÅ.V¤.FÅ.F¤t.Õ..j.j.......FÄ.V 0000E0
 0000FFFF 9AD476FF D676FFD0 46890000 FFFF9AD4 76FFD676 FF0060E9 D84688DA Ö.FÄÕ'..v¤.vå.......FÅ.v¤.vå..... 000100
 0A5EC400 2AE9000B B8001DE9 00468800 00FFFF9A E076FFE2 76FF1076 FF1276FF .v..v..võ.vÅ......FÄÕ..|..Õ*.á^. 000120
 75FFFF30 FFE1E903 75001530 0013E900 16E90000 88001CE9 00008800 1507C726 &ú...|..Õ..|..Õ..Õ..=..u.ÕÄ.*..u 000140
 03000000 0102C700 02007A00 01020001 0300110E CAC95F5E 1FFFE4E9 FFD3E903 .Õ£.ÕÕ..^_èð.....|...z...ú...... 000160
 03008600 01010801 03007F00 0100A401 03007E00 01019701 03007C00 01030E01 .....|.........-...£............... 000180
 03001E00 01004E01 03000000 0102CA00 05000000 05022600 02000700 01031C01 ..........&........ð........N...... 0001A0
 03002800 03007902 03008300 0101E901 03001400 03023E02 03001F00 01016201 .b.......>........Õ...°...y...(.. 0001C0
 00000000 00000000 0000F300 0102F701 03004200 03032D02 03003600 03026802 .h...6...-...B...¥...µ........... 0001E0

Dump of file SATURN:[PCCOMMON.DUMP.DLL]DAPICK.TMP;1 on 18-APR-1990 10:42:30.89
File ID (589,27,0)    End of file block 9 / Allocated 12

Virtual block number 4 (00000004), 512 (0200) bytes

 5EC4FA56 89F84689 08568806 46880199 E90E4688 D88EFFFF 881E5657 000038C8 à8..WV.|...Ä.F.Õ...F..V..F½.V*á^ 000000
 FFFE5689 FC468912 57882610 478826F8 5EC4F456 89F24689 02578826 078826F8 ½&..&.W..F .V¶á^½&.G.&.W..F=.V±. 000020
 4EE90375 02470826 078826FC 5EC40000 FFFF9AF8 76FFFA76 FF006A10 76FF1276 v..v.j..v'.v½.....á^=&..&.G.u.ÕN 000040
 00003000 00FFFF9A 5016C846 80026A37 FF260277 FF26FC5E C4F276FF F476FF00 ..v¶.v á^=&.w.&.7j..Fà.P.....=.. 000060
 468DFF6A 006A0161 68008268 1076FF12 76FF0141 E90000BA 0004B800 09E90375 u.Õ..|..¤..ÕA..v..v.h..he.j.j..F 000080
 76FF1276 FF00BAE9 0A468801 11E90114 E9FFA3E9 04FC4683 00000000 9A5016C8 à.P.Ä....F=.ÕE.Õ..Õ...F.Õ¤..v..v 0000A0
 9A006A10 76FF1276 FFF64689 00000139 9A006A00 6AFF6A00 6A016568 00826810 .h..he.j.j.j.j..9....F-.v..v.j.. 0000C0
 5EC402E6 C1F6768B 004EE903 75FFF67E 830000F0 46C7FA56 89F84689 0000FFFF .....F½.V*úFÞ...—.u.ÕN..v-êl.á^ 0000E0
 26008926 1FC42618 5FC426F8 5EC402E6 C1F0768B 02508826 00882610 5FC426F8 ½&á_.&..&.P..vÞê!.á^½&á_.&á.&..& 000100
 F6468900 00FFFF9A 006A006A F676FF00 6A016568 00826810 76FF1276 FF025089 .P..v..v.h..he.j..v-j.j.......F- 000120
 FF9A016A 1076FF12 76FF0032 E9000001 5F9A016A 1076FF12 76FFFFA9 E9F046FF .FÞÕ`..v..v.j.......Õ2..v..v.j... 000140
 005030FF 3EE90375 00463000 13E90016 E90019E9 0063E900 008A0000 880000FF ...|..¤..Õc.Õ..Õ..Õ..=F.u.Õ>.=P. 000160
 0676FF08 76FF0A76 FF0C76FF 0E76FF10 76FF1276 FF0038E9 FFE7E9FF D1E90375 u.Õl.ÕÕ.Õ;..v..v..v..v..v..v..v. 000180
 03750038 30FEF7E9 03750030 30FF02E9 03750020 30001BE9 0027E900 00FFFF9A .....Õ'.Õ..* .u.Õ..=0.u.Õ%±=;.u. 0001A0
 0008881E 56570000 32C8000E CAC95F5E 1F0000E9 00008A00 0088FFC5 E9FE4FE9 ÕO±Õé.|..¤..Õ...^_èð..à2..WV.|.. 0001C0
 00008A00 01880009 E9037500 00300000 FFFF9A50 16CE468D 1276FF14 76FFD88E .Ä.v..v..Fö.P.....=..u.Õ..|..¤.. 0001E0
```

```
Dump of file SATURN [PCCOMMON.DUMP.DLL]DAPICK.TMP;1 on 18-APR-1990 10:42:30.89
File ID (589,27,0)   End of file block 9 / Allocated 12

Virtual block number 5 (00000005), 512 (0200) bytes

 7500003D 0000FFFF 9A5016E0 46801076 FFCE76FF D076FF12 76FF1476 FF0126E9 Ö&..v..v..vÅ.vö.v..FÅ.P.....=..u 000000
 8A000388 0009E903 7402470B 26078826 E05EC400 FCE90000 8A000288 0009E903 .Õ..|..¤..Ö=.á^Å&..&.G.t.Õ..|..¤ 000020
 05880009 E9037500 00300000 FFFF9A50 16044680 286A006A 0676FF00 E4E90000 ..Õõ..v.j.j(.FÅ.P.....=..u.Õ..|. 000040
 89145688 12468808 C483FFFF 00009A04 76FFD676 FF006A28 6A00C2E9 00008A00 .¤..Õö.j(j..vø.vÅ......á..F..V.. 000060
 57892607 8926D656 88D44688 085EC4F6 5689F446 89E25688 E04688E6 5689E446 Fõ.V|.FÅ.Vä.F¶.V-á^..FÅ.Vø&..&.W 000080
 0036FF26 0002068E FFFF68FF FF68016A 006A016A 006AFE56 8CFC4689 D4468002 ..FÅ.F•.V±j.j.j.j.h..h......&.6. 0000A0
 006A0018 E90374DA 46080846 880A5689 D8468900 00FFFF9A 5016E446 80346A00 .j4.FÕ.P......FÅ.VÖ.FÅ.FÖt.Õ..j. 0000C0
 00FFFF9A 0876FFDA 76FF0033 E9DE5688 DC4688DE 56890C46 890000FF FF9A006A j.......FÉ.V8.FÉ.V8Õ3..vÖ.vÅ.... 0000E0
 0000FFFF 9AE076FF E276FF12 76FF1476 FF0000FF FF9AD876 FFDA76FF D2468900 ..F●.vÖ.vÅ......v..v..vä.vÅ..... 000100
 E90E4688 D88E01DE 881E5657 00003EC8 0010CAC9 5F5E1F00 00E90000 8A000088 |..¤..Õ...^_èò..à>..WV.|8..Å.F.Õ 000120
 5EC4F456 89F24689 02578826 078826F8 5EC4FA56 89F84689 08568806 46880290 ...F..V..F½.V¹á^½&..&.W..F .V¶á^ 000140
 004E9AF8 76FFFA76 FF006A10 76FF1276 FFFE5689 FC468912 57882610 478826F8 ½&.G.&.W..F•.V±.v..v.j..v¹.v½.N. 000160
 FF260277 FF26FC5E C4F276FF F476FF00 53E90375 02470826 078826FC 5EC40000 ..á^•&..&.G.u.ÕS..v¶.v á^•&.w.&. 000180
 00008A00 04880009 E9037500 00300000 00799A50 16C24680 0677FF26 F85EC437 7á^½&.w..Fõ.P.y...=..u.Õ..|..¤.. 0001A0
 FC468300 00041D9A 5016C246 80FF6A00 6A016168 00826810 76FF1276 FF0233E9 Õ3..v..v.h..he.j.j..Fõ.P......F• 0001C0
 F8468900 0005679A 006A1076 FF1276FF 01ACE90A 46880203 E90206E9 FF9EE904 .Õ..Õ..Õ...F.Õ¯..v..v.j..g....F½ 0001E0

Dump of file SATURN:[PCCOMMON.DUMP.DLL]DAPICK.TMP;1 on 18-APR-1990 10:42:30.89
File ID (589,27,0)   End of file block 9 / Allocated 12

Virtual block number 6 (00000006), 512 (0200) bytes

 0004469A 006A006A FF6A006A 01656800 82681076 FF1276FF 0000F046 C7FA5689 .V¹úFÞ...v..v.h..he.j.j.j.j..F.. 000000
 76FF006A 01656800 82681076 FF1276FF F046FF00 23E90375 FFF67E83 F6468900 ..F-.--.u.Õ#..FÞ.v..v.h..he.j..v 000020
 085FC426 F85EC400 22E90374 00F07E83 FFD4E9F6 46890000 04E69A00 6A006AF6 -j.j..!....F-ÕÅ..-Þ.t.Õ".á^½&á_. 000040
 FF26F85E C4017BE9 00008A00 04880000 05579A01 6A1076FF 1276FF00 0107C726 &ú....v..v.j..W...|..¤..Õ(.á^½Ž. 000060
 00058800 09E90375 00003D00 0002529A 5016EA46 8D5002E0 C1F04688 006A 677 w.j..FÞèÅ.P.Fõ.P.R...=..u.Õ..|.. 000080
 02E0C1F0 46880257 89260789 26EC5688 EA46880C 5FC426F8 5EC40150 E9000 7A ¤..ÕP.á^½&á_..Fõ.V$&..&.W..FÞèÅ. 0000A0
 6A006A01 65680082 681076FF 1276FF08 C4830274 00009AEA 76FFEC76 FF006A J0 Pj..v$.võ...t..á..v..v.h..he.j.j 0000C0
 E6C1F676 880047E9 0375FFF6 7E830000 EE46C7F6 46890000 05359A00 6A006AFF .j.j..5....F-úFŸ...—.u.ÕG..v-èl 0000E0
 FF025089 26008926 EA76C402 E3C1EE5E 88025088 26008826 105FC426 F85EC402 .á^½&á_.&..&.P..^Ÿèõ.ávõ&..&.P.. 000100
 E9EE46FF F6468900 0000A49A 006A006A F676FF00 6A016568 00826810 76FF1276 v..v.h..he.j..v-j.j..Ê....F-.FŸÕ 000120
 76FF0051 E9000005 869A016A 1076FF12 76FF0000 07C72608 5FC426F8 5EC4FFB0 ¯.á^½&á_.&ú....v..v.j......Õ¤..v 000140
 1276FF00 0107C726 085FC426 F85EC4FA 5689F846 89000000 E09A006A 1076FF12 ..v.j..Ã....F½.V¹á^½&á_.&ú....v. 000160
 75004630 0013E900 16E90019 E90063E9 00008A00 00880000 014F9A01 6A1076FF .v.j..O...|..¤..Õc.Õ..Õ..Õ..=F.u 000180
 76FF0C76 FF0E76FF 1076FF12 76FF0038 E9FFE7E9 FF82E903 7500503D FE4CE903 .ÕL±=P.u.Õÿ.ÕÕ.Õ;..v..v..v..v..v 0001A0
 E9037500 3030FE10 E9037500 20300018 E90027E9 000001A1 9A0676FF 0876FF0A ..v..v..Å...Õ'.Õ..= .u.Õ.±=0.u.Õ 0001C0
 0026C800 0ECAC95F 5E1F0000 E900008A 000088FF C5E9FD58 E9037500 3830FE05 .±=;.u.ÕX»Õé.|..¤..Õ...^_èò..Å&. 0001E0

Dump of file SATURN:[PCCOMMON.DUMP.DLL]DAPICK.TMP;1 on 18-APR-1990 10:42:30.89
File ID (589,27,0)   End of file block 9 / Allocated 12

Virtual block number 7 (00000007), 512 (0200) bytes

 0006E903 7402470B 26078826 125EC400 0107C726 0A5EC4D8 8E0338B8 1E565700 .WV.|8..Åá^.&ú...á^.&..&.G.t.Õ.. 000000
 4688F656 89F44689 14568812 4688E656 89E44689 18568816 468800A4 E90000B8 |..ÕÉ..F..V..FÕ.V|.F..V..F¶.V-.F 000020
 89F04689 08568806 4688E846 890E4688 EA468910 4688EE56 89EC4689 0C56880A ..V..F$.VŸ.F..Fõ.F..FÕ.F..V..FÞ. 000040
 5016E446 80346A00 0036FF26 0002068E FFFF6802 8368016A 006A016A 006AF256 V j.j.j.j.h°.h......&.6..j4.FÕ.P 000060
 89000002 E39A006A 006A0015 E90374DE 46080C46 880E5689 DC468900 0002C99A .è....FÉ.V8.FÉ.F8t.Õ..j.j..D.... 000080
 9ADC76FF DE76FFDA 46890000 02FD9ADC 76FFDE76 FF001FE9 E04688E2 5689E046 FÅ.Vä.FÅÕ...v8.vÉ.»....FÖ.v8.vÉ. 0000A0
 06820103 007A0001 06810103 00139000 14CAC95F 5E1F0000 E90000B8 00000308 ....|..Õ...^_èò..........z...ý. 0000C0
 06C00103 00000002 06680002 007F0001 03D90103 007E0001 046E0103 007C0001 ..|...n...-...\.......k.......â. 0000E0
 03F90103 001E0001 037E0103 00000005 06050002 00000004 04CC0002 00070001 ......ä.....................-.......•. 000100
 02860005 00280003 03AE0203 00830001 05C80103 00140003 01EE0203 001F0001 ......Y.......à...°...Ù...(...Ñ. 000120
 04910203 03300002 066E0005 00420003 031C0203 00360003 02180203 00000002 ..........6.......B...n...0..... 000140
 01C80001 881F0000 3E89088E FFFFB81E 00000000 00F30001 06980103 00520004 ..R.......µ......|...Å.>...|..ù. 000160
 0AF7D788 067EC457 38E30C4E 88EC8855 00000000 00000000 00000600 02000200 ...............U.$.N.Õ8Wá-..ø%Õ 000180
 8C10E301 87AAF3C9 13A8F3E9 D1E08A0A 4688012B D187D103 D3230818 D1280C74 t.+1.ÜWÆ.1.1+1.F..ÅiÕµ¨.·±¨.iD.. 0001A0
 00020033 01050001 C85D0856 88064688 5FAAF3C9 13A8F3E9 D1C38EFF FFC381C3 û.û...ûiÕµ¨.èµ´_.F..V.)ù.. .3... 0001C0
 00000000 00000006 00020002 0001FFFF 00000000 00000000 00000000 00000088 ................................ 0001E0
```

```
Dump of file SATURN:[PCCOMMON.DUMP.DLL]DAPICK.TMP;1 on 18-APR-1990 10:42:30.89
File ID (589,27,0)   End of file block 9 / Allocated 12

Virtual block number 8 (00000008), 512 (0200) bytes

000F9400 009000FE 00100001 00000007 00000000 FFFF0001 000E0352 00000138 ;...R....................*....... 000000
00970021 80010001 01130005 00050000 00000000 010FFFFF 003300AA 01140005 ....`.3.......................I... 000020
00840097 00478C)2 00080119 00040006 00000000 0000FFFF FFFF0064 0008001E ....d......................G...Ç. 000040
00080028 006F001A 80010001 011E0008 00050000 00000000 FFFFFFFF 006E0008 ..n........................o.(... 000060
00820049 0086002E 00478000 00000127 00000007 00000000 0000FFFF FFFF0078 x...............'.....G...Ñ.I... 000080
FFFF0046 000C0026 00100034 80020400 01280006 00030000 00000000 FFFFFFFF ..............(.....4...&...F... 0000A0
FFFFFFFF 0050000C 00260010 007E8002 0000012F 00060003 00000000 0000FFFF ............/.....~...&...P..... 0000C0
6843FFFF FFFF005A 000C0026 001000C8 80020100 01360004 00030000 00000000 ..........6.....à...&...Z.....Ch 0000E0
68430074 78655400 3A656061 4E000000 03007463 656A624F 206E6120 65736F6F oose an Object.....Name:.Text.Ch 000100
00000000 0000706C 6548006C 65636E61 43006573 6F6F6843 00003A73 6563696F oices:..Choose.Cancel.Help...... 000120
00009400 009000FE 00100001 00000007 00000000 FFFF0001 000E0352 00000138 ;...R....................*....... 000140
00970021 80010001 01130005 00050000 00000000 010FFFFF 003400AA 01140001 ....`.4.......................I... 000160
00840097 00478002 00080119 00040006 00000000 0000FFFF FFFF0064 0008001E ....d......................G...Ç. 000180
00080028 006F001A 80010001 011E0008 00050000 00000000 FFFFFFFF 006E0008 ..n........................o.(... 0001A0
00820049 0086002E 00478000 00010127 00000007 00000000 0000FFFF FFFF0078 x...............'.....G...Ñ.I... 0001C0
FFFF0046 000C0026 00100034 80020400 01280006 00030000 00000000 FFFFFFFF ..............(.....4...&...F... 0001E0

Dump of file SATURN:[PCCOMMON.DUMP.DLL]DAPICK.TMP;1 on 18-APR-1990 10:42:30.89
File ID (589,27,0)   End of file block 9 / Allocated 12

Virtual block number 9 (00000009), 512 (0200) bytes

FFFFFFFF 0050000C 00260010 007E8002 0000012F 00060003 00000000 0000FFFF ............/.....~...&...P..... 000000
6843FFFF FFFF005A 000C0026 001000C8 80020100 01360004 00030000 00000000 ..........6.....à...&...Z.....Ch 000020
68430074 78655400 3A656061 4E000000 03007463 656A624F 206E6120 65736F6F oose an Object.....Name:.Text.Ch 000040
00000000 C400706C 6548006C 65636E61 43006573 6F6F6843 00003A73 6563696F oices:..Choose.Cancel.Help.Ä.... 000060
00000000 00000000 00000000 00000000 00000000 00000000 00000000 00000000 ................................ 000080
00000000 00000000 00000000 00000000 00000000 00000000 00000000 00000000 ................................ 0000A0
00000000 00000000 00000000 00000000 00000000 00000000 00000000 00000000 ................................ 0000C0
00000000 00000000 00000000 00000000 00000000 00000000 00000000 00000000 ................................ 0000E0
00000000 00000000 00000000 00000000 00000000 00000000 00000000 00000000 ................................ 000100
00000000 00000000 00000000 00000000 00000000 00000000 00000000 00000000 ................................ 000120
00000000 00000000 00000000 00000000 00000000 00000000 00000000 00000000 ................................ 000140
00000000 00000000 00000000 00008000 00000000 00000000 00000000 00000000 ................................ 000160
00000000 00000000 00000000 00000000 00000000 00000000 00000000 00000000 ................................ 000180
00000000 00000000 00000000 00000000 00000000 00000000 00000000 00000000 ................................ 0001A0
00000000 00000000 00000000 00000000 00000000 00000000 00000000 00000000 ................................ 0001C0
00000000 00000000 00000000 00000000 00000000 00000000 00000000 00000000 ................................ 0001E0

Dump of file SATURN:[PCCOMMON.DUMP.DLL]DAPREDS.TMP;1 on 18-APR-1990 10:42:33.29
File ID (599,29,0)   End of file block 49 / Allocated 52

Virtual block number 1 (00000001), 512 (0200) bytes

00000000 00000040 00000000 00000088 0000FFFF 00000004 00000031 010F5A4D MZ..1...........|.......@....... 000000
00000080 00000000 00000000 00000000 00000000 00000000 00000000 00000000 ................................ 000020
6F6E6E61 63206061 72676F72 70207369 685421CD 4C01B821 CD098400 0EBA1F0E ..o..Ç.èl|.LèIThis program canno 000040
00000000 00000024 0A0D0D2E 65646F6D 20534F44 206E6920 6E757220 65622074 t be run in DOS mode....$....... 000060
0007000B 00000000 00000000 00000000 000A8009 DC90B55D 00E20623 0505454E NE..#.â.]ç.É.................... 000080
00000000 00000000 00010000 00040000 00000785 04820474 00980098 00400019 ..@.....t....................... 0000A0
08640F00 086404E7 194C0F00 194C0349 0AC00F00 0AC00296 211C0F00 211C007A z..I...I..À...À.I.L...L.Ö.d...d. 0000C0
024A0F00 024905DE 006C0F00 006805D6 00080F00 000705C7 01FE0F00 01FD05A4 É.»...±.ú.■...Ã.ø.k...l.B.I...J. 0000E0
53444552 50414407 00020E21 00000000 00500E21 004F060C 005E0E00 005D0606 ..]...^...O.I.P.....!....DAPREDS 000100
54495754 4E451300 01595449 544E454B 4F4F4854 49574D31 50494853 50140000 ...PSHIP1MWITHOOKENTITY...ENTWIT 000120
0003474E 49505041 4C524556 4F59454B 0E000253 5945B845 4C504954 4C554D48 HMULTIPLEKEYS...KEYOVERLAPPING.. 000140
524E5554 45535000 00045952 4F544144 4E414D59 4C4C5546 31315049 48535015 .PSHIP11FULLYMANDATORY...PSETUNR 000160
4F495441 56495245 444C4450 54554F48 54495752 54544118 00054445 54414C45 ELATED...ATTRWITHOUTPDLDERIVATIO 000180
59544255 53454C47 4E495354 4E451000 0759454B 4E494B4F 52545441 0800064E N...ATTROKINKEY...ENTSINGLESUBTY 0001A0
54554F48 54495754 4E450E00 0959454B 4E474945 524F4652 5454410E 00084550 PE...ATTRFOREIGNKEY...ENTWITHOUT 0001C0
15000850 4948534E 4F495441 4C455254 554F4854 4957544E 4516000A 5359454B KEYS...ENTWITHOUTRELATIONSHIP... 0001E0
```

```
Dump of file SATURN:[PCCOMMON.DUMP.DLL]DAPREDS.TMP;1 on 18-APR-1990 10:42:33.29
File ID (599,29,0)   End of file block 49 / Allocated 52

Virtual block number 2 (00000002), 512 (0200) bytes

504D4F43 54455350 18000C54 58455448 54474E45 4C454C42 41495241 56544E45 ENTVARIABLELENGTHTEXT...PSETCOMP 000000
59454B4B 5449574B 4F4F544E 450E0000 4E4F4954 43455445 44524549 4858454C LEXHIERDETECTION...ENTOOKWITHKEY 000020
4F575456 410C000F 4C455247 4E495241 45424F46 4E494E4F 4E544E45 14000E53 S...ENTNONINFOBEARINGREL...AVTWO 000040
0C001159 454B4E49 4B4F5049 48534E4F 4954414C 45521300 10534E49 414D4F44 DOMAINS...RELATIONSHIPOKINKEY... 000060
55424952 54544154 554F4854 4957544E 45130012 4C4F4F50 4D494E49 52545441 ATTRININPOOL...ENTWITHOUTATTRIBU 000080
444B5449 57525454 41150014 544E4549 43494646 55534E49 5945480F 00134554 TE...KEYINSUFFICIENT...ATTRWITHD 0000A0
16544E45 5945B50 5544444E 4946544E 45100015 454D414E 45544143 494C5055 UPLICATENAME...ENTFINDDUPKEYENT. 0000C0
504F594C 4C554650 49485350 12001744 45434E45 52454645 524E5554 4E450F00 ..ENTUNREFERENCED...PSHIPFULLYOP 0000E0
4E544E45 18001944 455A494C 414D524F 4E544F4E 544E4510 00184C41 4E4F4954 TIONAL...ENTNOTNORMALIZED...ENTN 000100
49484550 5954544E 4516001A 45505954 42555347 4E495241 45424F46 4E494E4F ONINFOBEARINGSUBTYPE...ENTTYPENI 000120
1C454D41 4E544C55 41464544 54455350 0F001853 4953594C 414E414E 45425245 ERBENANALYSIS...PSETDEFAULTNAME. 000140
45434E45 52454645 524E5552 54544110 001D5359 454B4648 54495754 4E450C00 ..ENTWITHFKEYS...ATTRUNREFERENCE 000160
504D4F43 54455350 59524153 53454345 4E594C4E 4F444E49 46594548 1C001E44 D...KEYFINDONLYNECESSARYPSETCOMP 000180
4C504D4F 434E494D 4F440000 20455441 43494C50 55444D31 50494853 5010001F ...PSHIPINDUPLICATE ..DOMINCOMPL 0001A0
4D49444F 574D4F44 0E002252 54544149 544C554D 53414859 4540F00 21455445 ETEI..KEYHASMULTIATTR"..DOMWODIM 0001C0
24504D4F 43595241 53534543 454E4E55 48544957 59454816 00234E4F 49534E45 ENSION#..KEYWITHUNNECESSARYCOMP$ 0001E0

Dump of file SATURN:[PCCOMMON.DUMP.DLL]DAPREDS.TMP;1 on 18-APR-1990 10:42:33.29
File ID (599,29,0)   End of file block 49 / Allocated 52

Virtual block number 3 (00000003), 512 (0200) bytes

52545441 16002559 45484049 52505254 5441494C 54554D48 54495754 4E451700 ..ENTWITHMUTLIATTRPRIMKE.%..ATTR 000000
50505544 48544957 544E4511 00265354 4E455945 484E4749 45524F46 444E4946 FINDFOREIGNKEYENTS&..ENTWITHDUPP 000020
57544E45 11002859 43485254 54414954 4C554D57 544E4510 00275945 4B4D4952 RIMKEY'..ENTWMULTIATTRKEY(..ENTW 000040
4E451000 2A534241 5456414F 574D4F44 08002953 444F4854 454D5455 4F485449 ITHOUTMETHODS)..DOMWOAVTABS*..EN 000060
414D4F44 54554F48 54495752 54544111 002B5353 454C544E 454E4F50 4D4F4354 TCOMPONENTLESS+..ATTRWITHOUTDOMA 000080
54414F57 4D49440F 00205948 43524152 4549484E 4948F4F 544E4511 002C4E49 IN,..ENTOOKINHIERARCHY-..DIMWOAT 0000A0
49535445 53501700 2F534E49 414D4F44 4F574D49 440C002E 53455455 42495254 TRIBUTES...DIMWODOMAINS/..PSETSI 0000C0
015F013A 011800A8 00870001 0000304E 4F495443 45544544 52454948 454C504D MPLENIERDETECTIONO......´...:._. 0000E0
45444F4D 59524555 514C4044 134E5854 54524154 534C4044 086C6D64 03000187 ....dml.DMLSTARTTXN.DMLQUERYMODE 000100
49465952 4555514C 4D440054 4E554F43 59524555 514C4044 0D454C44 4E414B4C LHANDLE.DMLQUERYCOUNT.DMLQUERYFI 000120
4C4D4408 314E4C52 59524555 514C4044 0C4E4C52 59524555 514C4D44 08444C45 ELD.DMLQUERYRLN.DMLQUERYRLN1.DML 000140
5854504F 54534C4D 44124449 4C4D4459 52455551 4C4D4400 5453494C 45455246 FREELIST.DMLQUERYDMLID.DMLSTOPTX 000160
444D454D 0E504145 48455441 4552434D 454D004D 454D034B 4341424C 4C4F524E NROLLBACK.MEM.MEMCREATEHEAP.MEMD 000180
13524F53 52554354 494E4947 41424C54 55105455 44035041 4548594F 52545345 ESTROYHEAP.DUT.UTLBAGINITCURSOR. 0001A0
54415245 54494741 424C5455 13524F53 52554345 5341454C 45524741 424C5455 UTLBAGRELEASECURSOR.UTLBAGITERAT 0001C0
4545564F 4D455251 45534C54 550E4548 41405145 534C5455 0A524F53 52554345 ECURSOR.UTLSEQMAKE.UTLSEQREMOVEE 0001E0

Dump of file SATURN:[PCCOMMON.DUMP.DLL]DAPREDS.TMP;1 on 18-APR-1990 10:42:33.29
File ID (599,29,0)   End of file block 49 / Allocated 52

Virtual block number 4 (00000004), 512 (0200) bytes

440C6D61 64035954 504D4551 45534C54 55084C45 48535550 5145534C 54550C4C L.UTLSEQPUSHEL.UTLSEQEMPTY.dam.D 000000
63616406 59454B59 52414D49 52505445 47404144 10544E45 45544145 52434D41 AMCREATEENT.DAMGETPRIMARYKEY.dac 000020
4C505348 504C4C55 4E54494E 494D4144 11544553 5059504F 434D4144 0879706F opy.DAMCOPYPSET.DAMINITNULLPKSPL 000040
45474D44 500E5449 46454E45 42524549 48544547 4D445011 4241544D 44500654 T.PDMTAB.PDMGETHIERBENEFIT.PDMGE 000060
52454948 4F544C45 524D524F 4658114D 524F4658 41440754 43455445 444B4654 TFKDETECT.DAXFORM.XFORMRELTOHIER 000080
01006C03 02010970 03051903 03020000 03040114 05030101 00000303 01495041 API....................p....l.. 0000A0
01021100 03030106 03030E23 030EE403 010305B3 03020100 00030101 000E0308 ..8.........*....õ..#.......... 0000C0
0102AF03 0401002B 03010104 90030201 01D00308 01000003 07010233 03148003 ....3.........f.........(....€.. 0000E0
DC030301 00730301 44030FA5 03010308 6C030301 12640316 43030102 01170302 .......C..d....l....E..D..s....É 000100
01017003 08010000 0305^102 33030301 08CC0304 01054703 02011DC7 03010109 ....ú....G....ä....3........p.. 000120
03010100 00030801 15F00301 01060703 02011541 03010101 A3030401 00A_^405 ..¨....È....A........=........ 000140
0301006C 03000003 06021168 03010100 00030201 08AA0301 01014C03 05011.^9 .....L....¯.........h.......l... 000160
00000000 00534554 41434944 45525020 4144204D 5020322F 534F1500 0008E1[illegible] .Ã....OS/2 PM DA PREDICATES..... 000180
07C72606 5EC4FC46 89FE4689 0000B800 00FA46C7 D88EFFFF B81E5657 000006C8 à...WV.¡...ÄüF*..¡...Fz.F•á^.&ú. 0001A0
FA7E83FA 46890000 FFFF9A50 16FC468D 146A0A76 FF0C76FF 0E76FF10 76FF0001 ...v..v..v..v.j..F•.P......F*.-* 0001C0
000007C7 26065EC4 000EE903 7500FE7E 830009E9 037401FC 7E830012 E9037400 .t.Õ...-=.t.Õ...~z.u.Õ..á^.&ú... 0001E0
```

```
Dump of file SATURN:[PCCOMMON.DUMP.DLL]DAPREDS.TMP;1 on 18-APR-1990 10:42:33.29
File ID (599,29,0)   End of file block 49 / Allocated 52

Virtual block number 5 (00000005), 512 (0200) bytes

 C7D88E00 08881E56 5700000E C8000CCA C95F5E1F 0000E900 00880006 E9FA4688 .F*Ō..|..Ō...^_èò..à...WV.|...Àú 000000
 C4FC4689 FE468900 0088F846 89FA4689 000088F2 4689F446 89000088 0000F646 F-..|...F¶.F.|...F*.F½|...F±.F•á 000020
 89000000 369A5016 F2468D14 6A0A76FF 0C76FF0E 76FF1076 FF000107 C726065E ^.&ú....v..v..v..v.j..F.P.6.... 000040
 46880000 07C72606 5EC4000E E90374F4 4608F246 88000BE9 037400F6 7E83F646 F-.—.t.Ō...F..F¶t.Ō..á^.&ú....F 000060
 83FFFF20 2D9A0E76 FF1076FF 0A76FF0C 76FF5016 FC468D50 16F84680 0059E9F6 -ŌY..F½.P.F•.P.v..v..v..v..- ... 000080
 08E9037E 0018E903 7DFE5639 FA5688F8 46880018 E9037400 F67E83F6 468910C4 á..F-.—.t.Ō...F½.V*9V±).Ō..-.Ō. 0000A0
 5F5E1F00 00E90000 880006E9 F6468800 0007C726 065EC400 0EE90373 FC463900 .9F=a.Ō..á^.&ú....F-Ō..|..Ō...^_ 0000C0
 0088F646 89F84689 00008800 00FA46C7 D88E007B 881E5657 00000AC8 000CCAC9 èò..à...WV.|(..ÀúF*..|...F½.F-|. 0000E0
 F646800F 6A0A76FF 0C76FF0E 76FF1076 FF000107 C726065E C4FC4689 FE468900 ..F±.F•á^.&ú....v..v..v..v.j..F- 000100
 5EC4000E E90374F8 4608F646 88000BE9 037400FA 7E83FA46 890000FF FF9A5016 .P......F*.-*.t.Ō...F-.F½t.Ō..á^ 000120
 9A5016FC 4680156A 0A76FF0C 76FF0E76 FF1076FF 0080E9FA 46880000 07C72606 .&ú....F*Ō...v..v..v..v.j..F•.P. 000140
 C726065E C4000EE9 0375FE46 08FC4688 0008E903 7400FA7E 83FA4689 000001FD =....F*.-*.t.Ō...F=.F±u Ō..á^.&ú 000160
 0000B89A 5016FC46 8D126A0A 76FF0C76 FF0E76FF 1076FF00 43E9FA46 88000007 ....F*ŌC..v..v..v..v.j..F•.P.£.. 000180
 000007C7 26065EC4 000EE903 75FE4608 FC468800 08E90374 00FA7E83 FA468900 ..F*.-*.t.Ō...F=.F±u.Ō..á^.&ú... 0001A0
 C7D88E01 4CB81E56 57000024 C8000CCA C95F5E1F 0000E900 00880006 E9FA4688 .F*Ō..|..Ō...^_èò..à$..WV.|L..Àú 0001C0
 46890000 88F44689 F6468900 0088DE46 89E04689 00008800 000C46C7 0000E246 Fã..úFÈ..|...FĀ.F8|...F-.F¶|...F 0001E0

Dump of file SATURN:[PCCOMMON.DUMP.DLL]DAPREDS.TMP;1 on 18-APR-1990 10:42:33.29
File ID (599,29,0)   End of file block 49 / Allocated 52

Virtual block number 6 (00000006), 512 (0200) bytes

 B8E44689 E64689C^ 0088EC46 89EE4689 000088E8 4689EA46 89000088 F04689F2 ·.FÞ|...Fõ.FÒ|...FŸ.F£|...FÌ.FÒ| 000000
 FF0E76FF 1076FFC  0107C726 065EC4FC 4689FE46 89000088 F84689FA 46890000 ...F*.F½|...F±.F•á^.&ú....v..v.. 000020
 DE468800 08E90374 00E27E83 E2468900 0004619A 5016DE46 800F6A0A 76FF0C76 v..v.j..F8.P.a....Fã.-ã.t.Ō...F8 000040
 FF0C76FF 0E76FF10 76FF0326 E9E24688 000007C7 26065EC4 000EE903 75E04608 .FÀu.Ō..á^.&ú....FãŌ&..v..v..v.. 000060
 F64608F4 4688000B E9037400 E27E83E2 46890000 03279A50 16F44680 146A0A76 v.j..F¶.P.'....Fã.-ã.t.Ō...F¶.F- 000080
 6A0A76FF 0C76FF0E 76FF1076 FF02E9E9 E2468800 0007C726 065EC400 0EE90375 u.Ō..á^.&ú....FãŌŌ..v..v..v..v.j 0000A0
 E90375F6 4608F446 88000BE9 037400E2 7E83E246 89000003 649A5016 F4468D15 ..F¶.P.d....Fã.-ã.t.Ō...F¶.F-u.Ō 0000C0
 4680126A 0A76FF0C 76FF0E76 FF1076FF 02ACE9E2 46880000 07C72606 5EC4000E ..á^.&ú....FãŌ^..v..v..v..v.j..F 0000E0
 F67E8300 09E90374 02F47E83 0012E903 7400E27E 83E24689 000003E0 9A5016F4 ¶.P.Ù....Fã.-ã.t.Ō...-¶.t.Ō...— 000100
 0A76FF0C 76FF0E76 FF1076FF 0268E9E2 46880000 07C72606 5EC4000E E9037500 .u.Ō..á^.&ú....FãŌh..v..v..v..v. 000120
 EA5688E8 468801D4 E90003E9 03750000 30E24689 00000437 9A5016E8 4680126A j..FÒ.P.7....Fã=..u.Ō..Ō&..FÒ.Vō 000140
 FF26F05E C40E76FF 1076FF01 89E90375 02470826 078826F0 5EC4F256 89F04689 .FÞ.V·á^Þ&..&.G.u.Ō¿..v..v.á^Þ&. 000160
 F67E8300 17E90374 00E27E83 E2468900 0004CB9A 5016F446 80136A37 FF260277 w.&.7j..F¶.P.ù....Fã.-ã.t.Ō...— 000180
 FF016FE9 000007C7 26065EC4 0008E903 7701F47E 830009E9 037E0019 E9037D00 .).Ō..-.Ō...-¶.w.Ō..á^.&ú...Ōo.. 0001A0
 0030E246 890000FF FF9A5016 E4468D13 6A37FF26 0277FF26 F05EC40E 76FF1076 v..v.á^Þ&.w.&.7j..FÒ.P......Fã=. 0001C0
 5016EC46 80006A37 FF260277 FF26E45E C40E76FF 1076FF01 45E90003 E9037500 .u.Ō..ŌE..v..v.á^Ō&.w.&.7j..F$.P 0001E0

Dump of file SATURN:[PCCOMMON.DUMP.DLL]DAPREDS.TMP;1 on 18-APR-1990 10:42:33.29
File ID (599,29,0)   End of file block 49 / Allocated 52

Virtual block number 7 (00000007), 512 (0200) bytes

 74073926 EE5688EC 4688F05E C4011BE9 0003E903 7500003D E2468900 0004A59A .É....Fã=..u.Ō..Ō..á^Þ.F£.VY&9.t 000000
 8D0E6A37 FF260277 FF26E45E C40E76FF 1076FF00 2AE90374 02573926 0033E903 .Ō3.&9W.t.Ō*..v..v.á^Ō&.w.&.7j.. 000020
 EE76FF0E 76FF1076 FF00D7E9 0003E903 7500003D E2468900 0001B39A 5016EC46 F£.P......Fã=..u.Ō..Ō■..v..v..vŸ 000040
 7D00F67E 830017E9 037400E2 7E83E246 89000001 C09A5016 F4468013 6AEC76FF .v£j..F¶.P.à....Fã.-ã.t.Ō...—.) 000060
 1076FF00 91E90000 07C72606 5EC4000B E9037701 F47E8300 09E9037E 0019E903 .Ō..-.Ō...-¶.w.Ō..á^.&ú...Ō...v. 000080
 00E27E83 E2468900 00055A9A 5016F846 8D046A37 FF260277 FF26F05E C40E76FF .v.á^Þ&.w.&.7j..F½.P.Z....Fã.-ã. 0000A0
 E9000007 C726065E C4000BE9 037500FA 7E830009 E9037401 F87E8300 12E90374 t.Ō...-½.t.Ō...-*.u.Ō..á^.&ú...Ō 0000C0
 46890000 FFFF9A50 16FC4680 036A37FF 260277FF 26F05EC4 0E76FF10 76FF004C L..v..v.á^Þ&.w.&.7j..F=.P......F 0000E0
 26065EC4 0008E903 7500FE7E 830009E9 037401FC 7E830012 E9037400 E27E83E2 ã.-ã.t.Ō...-•.t.Ō...-±.u.Ō..á^.& 000100
 FF0E76FF 1076FF00 29E90375 EA4608E8 4688FE38 E904F046 830007E9 000007C7 ú...Ō...FÞ.Ō8±.FÒ.FÒu.Ō)..v..v.. 000120
 890C4688 0003E9E2 46880006 E9037500 E27E830C 46890000 FFFF9AE8 76FFEA76 vō.vÒ......FÉ.-ã.u.Ō...FãŌ...FÉ. 000140
 46890000 05A69AE4 76FFE676 FF0E76FF 1076FF00 29E90375 E6460BE4 4688E246 Fã.FÒ.F|u.Ō)..v..v..vÌ.vō.Ì....F 000160
 C95F5E1F 0000E9E2 4688E246 890C4688 0003E9E2 46880006 E9037500 E27E830C É.-ã.u.Ō...FãŌ...FÉ.Fã.FãŌ...^ è 000180
 89CC4689 00008800 00C846C7 00000046 C7D88E02 38881E56 57000038 C8000CCA ò..à8..WV.|;..ÀúFÀ..úFà..|...Fã. 0001A0
 000088E0 4689E246 89000088 E44689E6 46890000 88F44689 F6468900 0088CA46 FÒ|...F-.F¶|...FÌ.FÒ|...Fã.FÀ|.. 0001C0
 46890446 89000088 E84689EA 46890000 88EC4689 EE468900 00880C46 890E4689 .F8.FÉ|...FŸ.F$|...Fō.FÒ|...Fã.F 0001E0
```

```
Dump of file SATURN:[PCCOMMON.DUMP.DLL]DAPREDS.TMP;1 on 18-APR-1990 10:42:33.29
File ID (599,29,0)   End of file block 49 / Allocated 52

Virtual block number 8 (00000008), 512 (0200) bytes

890000B8 FC4689FE 46890000 B8F04689 F2468900 00B8F846 89FA4689 0000B8D2 ®|...F°.F½|...F·.FÞ|...F±.F=|... 000000
FF0C76FF 0E76FF10 76FF0001 07C72606 5EC40000 CE46C700 0646C608 4689DA46 FÖ.FÄ6F@.ÚFö..&^.&ú....v..v..v.. 000020
CC4608CA 4688000E E9037400 D07E8300 46890000 08019A50 16CA468D 0F6A0A76 v.j..Fò.P......FÅ.-Å.t.Õ...Fò.F@ 000040
6A0A76FF 0C76FF0E 76FF1076 FF0400E9 D0468800 0007C726 065EC400 0EE90375 u.Õ..&^.&ú....FÅÕÅ..v..v..v..v.j 000060
E90375F6 460BF446 880008E9 03740000 7E83D046 89000007 249A5016 F4468D14 ..F¶.P.$....FÅ.-Å.t.Õ...F¶.F-u.Õ 000080
4680126A 0A76FF0C 76FF0E76 FF1076FF 0493E900 46880000 07C72606 5EC4000E ..&^.&ú....FÅÕ...v..v..v..v.j..F 0000A0
F67E8300 09E90374 01F47E83 0012E903 7400007E 83004689 00000792 9A5016F4 ¶.P......FÅ.-Å.t.Õ...-¶.t.Õ...— 0000C0
0A76FF0C 76FF0E76 FF1076FF 044FE900 46880000 07C72606 5EC4000E E9037500 .u.Õ..&^.&ú....FÅÕO..v..v..v..v. 0000E0
0E76FF10 76FF0353 E90003E9 03750000 30004689 000007D7 9A5016E4 4680126A j..FÕ.P.@....FÅ=..u.Õ..ÕS..v..v. 000100
E9037400 D07E83D0 46890000 02EA9A50 16F4468D 136A37FF 260277FF 26E45EC4 &^Õ&.w.&.7j..F¶.P.Õ....FÅ.-Å.t.Õ 000120
FF030EE9 000007C7 26065EC4 0008E903 7500F67E 830009E9 037401F4 7E830012 ...-¶.t.Õ...~.u.Õ..&^.&ú...Õ... 000140
00300046 89000003 A89A5016 D2468D13 6A37FF26 0277FF26 E45EC40E 76FF1076 v..v.&^Õ&.w.&.7j..F@.P.´....FÅ=. 000160
5016E046 80006A37 FF260277 FF26025E C40E76FF 1076FF02 E4E90003 E9037500 .u.Õ..ÕÕ..v..v.&^@&.w.&.7j..FÅ.P 000180
74073926 E25688E0 4688E45E C4028AE9 0003E903 7500003D D0468900 0008459A .E....FÅ=..u.Õ..Õ¤.&^Õ.FÅ.Vã&9.t 0001A0
800E6A37 FF260277 FF26025E C40E76FF 1076FF00 81E90374 02573926 008AE903 .Õ..&9W.t.Õ...v..v.&^@&.w.&.7j.. 0001C0
D25EC40E 76FF1076 FF0276E9 0003E903 75000030 D0468900 0002AD9A 50160C46 FÊ.P.Ù....FÅ=..u.Õ..Õv..v..v.&^@ 0001E0
```

```
Dump of file SATURN:[PCCOMMON.DUMP.DLL]DAPREDS.TMP;1 on 18-APR-1990 10:42:33.29
File ID (599,29,0)   End of file block 49 / Allocated 52

Virtual block number 9 (00000009), 512 (0200) bytes

4CE90003 E9037500 00300046 89000005 159A5016 EC468D06 6A37FF26 0277FF26 &.w.&.7j..F&.P......FÅ=..u.Õ..ÕL 000000
D0468900 0008029A 5016E846 80036A37 FF260277 FF26025E C40E76FF 1076FF02 ..v..v.&^@&.w.&.7j..FÕ.P.@....FÅ 000020
0E76FF10 76FFDE56 89DC4689 E25688E0 46880060 E90222E9 0003E903 7500003D =..u.Õ..Õ".Õ`..FÅ.Vã.FÊ.V8.v..v. 000040
03E90375 00003D00 46890000 08FC9A50 16EC468D 036A37FF 260277FF 26025EC4 &^@&.w.&.7j..F&.P.=....FÅ=..u.Õ. 000060
00000A68 9A5016E8 4680066A 37FF2602 77FF2602 5EC40E76 FF1076FF 01E9E900 .ÕÕ..v..v.&^@&.w.&.7j..FÕ.P.h... 000080
01EC7E83 0009E903 7D0025E9 037E00EE 7E83018F E90003E9 03750000 30D04689 .FÅ=..u.Õ..Õ¢..-Ý.~.Õ%.).Õ...-$. 0000A0
26065EC4 0008E903 7601E87E 830009E9 037D0019 E9037E00 EA7E8300 17E90376 v.Õ...-õ.-.Õ..).Õ...-Õ.v.Õ..&^.& 0000C0
8900000A 2E9A5016 F8468010 6ADC76FF DE76FF0E 76FF1076 FF0186E9 000007C7 ú...Õ...v..v..v8.vÊj..F½.P...... 0000E0
5016F446 80156AF8 76FFFA76 FF0E76FF 1076FF01 60E90003 E9037500 0030D046 FÅ=..u.Õ..Õ`..v..v..v°.v½j..F¶.P 000100
037500F6 7E830009 E9037401 F47E8300 12E90374 00007E83 D0468900 0006E79A .Õ....FÅ.-Å.t.Õ...-¶.t.Õ...—.u. 000120
16F0468D 156AF876 FFFA76FF 0E76FF10 76FF011F E9000007 C726065E C40008E9 Õ..&^.&ú...Õ...v..v..v°.v½j..FÞ. 000140
77FF26F0 5EC40E76 FF1076FF 00F9E900 03E90375 00003D00 46890000 09EC9A50 P.§....FÅ=..u.Õ..Õ°..v..v.&^Þ&.w 000160
26FC5EC4 000FE903 7400D07E 83004689 00000768 9A5016FC 4680116A 37FF2602 .&.7j..F=.P.h....FÅ.-Å.t.Õ..&^=& 000180
26F05EC4 0E76FF10 75FF00B7 E9000007 C726065E C4000BE9 03750247 0B260788 ..&.G.u.Õ..&^.&ú...Õñ..v..v.&^Þ& 0001A0
4688000B E9037400 [illegible]7E8300 46890000 06AA9A50 16D8468D 0C6A37FF 260277FF .w.&.7j..FÅ.P.¯....FÅ.-Å.t.Õ...F 0001C0
D876FFDA 76FF0E76 FF1076FF 0079E900 0007C726 065EC400 0BE90374 DA4608D8 Å.FÕt.Õ..&^.&ú...Õy..v..v..vÕ.vÅ 0001E0
```

```
Dump of file SATURN:[PCCOMMON.DUMP.DLL]DAPREDS.TMP;1 on 18-APR-1990 10:42:33.29
File ID (599,29,0)   End of file block 49 / Allocated 52

Virtual block number 10 (0000000A), 512 (0200) bytes

14E90375 4ED67E80 0012E903 7400007E 83004689 00000AA9 9A501606 4680096A j..F@.P.`....FÅ.-Å.t.Õ...-@Nu.Õ. 000000
76FF0A76 FF0E76FF 1076FF00 38E90000 07C72606 5EC40008 E9037554 067E8000 ..-@fu.Õ..&^.&ú...Õ8..v..v..vÕ.v 000020
E9037628 CE7E8300 09E90374 00007E83 D0468900 00086F9A 5016CE46 80086AD8 Åj..Fö.P.o....FÅ.-Å.t.Õ...-ö(v.Õ 000040
76FF0E76 FF1076FF 0029E903 75E64608 E4468800 00E90000 07C72606 5EC40008 ..&^.&ú...Õ...FÕ.F|u.Õ)..v..v..v 000060
4689C846 880003E9 D0468800 06E90375 00007E83 C8468900 0008199A E476FFE6 ].vÕ......Fà.-Å.u.Õ...FÅÕ...Fà.F 000080
C8468900 00084D9A D276FF04 76FF0E76 FF1076FF 0029E903 75D44608 D2468800 Å.F@.Fåu.Õ)..v..v..vå.v@.M....Fà 0000A0
0029E903 75F24608 F0468800 4689C846 880003E9 D0468800 06E90375 00007E83 .-Å.u.Õ...FÅÕ...Fà.FÅ.FÞ.F·u.Õ). 0000C0
D0468800 06E90375 00007E83 C8468900 0008819A F076FFF2 76FF0E76 FF1076FF .v..v..v·.vÞ......Fà.-Å.u.Õ...FÅ 0000E0
FC76FFFE 76FF0E76 FF1076FF 0029E903 75FE4608 FC468800 4689C846 880003E9 Õ...Fà.FÅ.F=.F±u.Õ)..v..v..v±.v= 000100
D0468800 4689C846 880003E9 D0468800 06E90375 00007E83 C8468900 00050A9A .Õ....Fà.-Å.u.Õ...FÅÕ...Fà.FÅ.FÅ 000120
46890000 880000F6 46C7D88E 06088B1E 56570000 0EC8000C CAC95F5E 1F0000E9 Õ...^_èÒ..à...WV.|...ÄúF-..|...F 000140
76FF0001 07C72606 5EC4FC46 89FE4689 000088F8 4689FA46 89000088 F24689F4 ¶.F·|...F°.F½|...F±.F=&^.&ú....v 000160
E9037400 F67E83F6 46890000 09589A50 16F2468D 0F6A0A76 FF0C76FF 0E76FF10 ..v..v..v.j..F·.P.[....F-.--.t.Õ 000180
76FF1076 FF0106E9 F6468800 0007C726 065EC400 0EE90375 F44608F2 46880008 ...F·.F¶u.Õ..&^.&ú....F-Õ...v..v 0001A0
880008E9 037400F6 7E83F646 8900000C 6C9A5016 F8468D14 6A0A76FF 0C76FF0E ..v..v.j..F½.P.l....F-.--.t.Õ... 0001C0
76FF0E76 FF1076FF 00C9E9F6 46880000 07C72606 5EC4000E E90375FA 460BF846 F½.F°u.Õ..&^.&ú....F-Õè..v..v..v 0001E0
```

Dump of file SATURN:[PCCOMMON.DUMP.DLL]DAPREDS.TMP;1 on 18-APR-1990 10:42:33.29
File ID (599,29,0)   End of file block 49 / Allocated 52

Virtual block number 11 (0000000B), 512 (0200) bytes

```
0BF84688 0008E903 7400F67E 83F64689 00000CA9 9A5016F8 4680156A 0A76FF0C ..v.j..F%.P.`....F-.--.t.Õ...F%. 000000
76FF0C76 FF0E76FF 1076FF00 8CE9F646 88000007 C726065E C4000EE9 0375FA46 F*u.Õ..á^.&ú....F-Õ...v..v..v..v 000020
75FA4608 F8468BCJ 08E90374 00F67E83 F6468900 0009819A 5016F846 8D126A0A .j..F%.P......F-.--.t.Õ...F%.F*u 000040
046A0A76 FF0C76FF 0E76FF10 76FF004F E9F64688 000007C7 26065EC4 000EE903 .Õ..á^.&ú....F-ÕO..v..v..v..v.j. 000060
7D001CE9 037E00FE 7E830017 E9037400 F67E83F6 46890000 08999A50 16FC468D .F*.P......F-.--.t.Õ...-±.-.Õ..) 000080
00E90000 880006E9 F6468800 0007C726 065EC400 0EE90376 01FC7E83 0009E903 .Õ...-*.v.Õ..á^.&ú....F-Õ..|..Õ. 0000A0
89F84689 00008800 00FA46C7 088E0882 881E5657 00000AC8 000CCAC9 5F5E1F00 ..^_èò..à...WV.|ÿ..ÄúF*..|...F%. 0000C0
6A0A76FF 0C76FF0E 76FF1076 FF000107 C726065E C4FC4689 FE468900 008BF646 F-|...F±.F*á^.&ú....v..v..v..v.j 0000E0
E90375F8 4608F646 88000BE9 037400FA 7E83FA46 8900000B F29A5016 F646800F ..F-.P.`....F*.-*.t.Õ...F-.F%u.Õ 000100
4680156A 0A76FF0C 76FF0E76 FF1076FF 008CE9FA 46880000 07C72606 5EC4000E ..á^.&ú....F*Õ...v..v..v..v.j..F 000120
C4000EE9 0375FE46 08FC4688 0008E903 7400FA7E 83FA4689 000000E1 9A5016FC *.P.Ä....F*.-*.t.Õ...F*.F±u.Õ..á 000140
5016FC46 8D126A0A 76FF0C76 FF0E76FF 1076FF00 4FE9FA46 88000007 C726065E ^.&ú....F*ÕO..v..v..v..v.j..F*.P 000160
830009E9 037E001C E9037D00 FE7E8300 17E90374 00FA7E83 FA468900 000C2F9A ./....F*.-*.t.Õ...-±.).Õ..-.Õ... 000180
C95F5E1F 0000E900 00880006 E9FA4688 000007C7 26065EC4 000EE903 7303FC7E ~*.s.Õ..á^.&ú....F*Õ..|..Õ...^_è 0001A0
000088F8 4689FA46 89000088 0000F646 C7D88E00 30881E56 5700000A C8000CCA ò..à...WV.|0..ÄúF-..|...F*.F%|.. 0001C0
16F8468D 046A0A76 FF0C76FF 0E76FF10 76FF0001 07C72606 5EC4FC46 89FE4689 .F±.F*á^.&ú....v..v..v..v.j..F%. 0001E0
```

Dump of file SATURN:[PCCOMMON.DUMP.DLL]DAPREDS.TMP;1 on 18-APR-1990 10:42:33.29
File ID (599,29,0)   End of file block 49 / Allocated 52

Virtual block number 12 (0000000C), 512 (0200) bytes

```
0009E903 7D001CE9 037E00FA 7E830017 E9037400 F67E83F6 46890000 0CE69A50 P.|....F-.--.t.Õ...-*.-.Õ..).Õ.. 000000
76FF126A 5016FC46 8D0046E9 F6468800 0007C726 065EC400 0EE90376 01F87E83 .-%.v.Õ..á^.&ú....F-ÕF..F*.Pj..v 000020
46880008 E9037400 F67E83F6 46890EC4 8300FD1F 429A0E76 FF1076FF 0A76FF0C ..v..v..v..B.*..á..F-.--.t.Õ...F 000040
5F5E1F00 00E90000 880006E9 F6468800 0007C726 065EC400 0EE90375 FE4608FC *.F±u.Õ..á^.&ú....F-Õ..|..Õ...^_ 000060
008BF846 89FA4689 00008800 00F646C7 D88E0E2B 881E5657 00000AC8 000CCAC9 èò..à...WV.|+..ÄúF-..|...F*.F%|. 000080
F8468D04 6A0A76FF 0C76FF0E 76FF1076 FF000107 C726065E C4FC4689 FE468900 ..F±.F*á^.&ú....v..v..v..v.j..F% 0000A0
09E9037D 001CE903 7E00FA7E 830017E9 037400F6 7E83F646 8900000E 629A5016 .P.b....F-.--.t.Õ...-*.-.Õ..).Õ. 0000C0
FF136A50 16FC468D 0046E9F6 46880000 07C72606 5EC4000E E9037601 F87E8300 ..-%.v.Õ..á^.&ú....F-ÕF..F*.Pj.. 0000E0
880008E9 037400F6 7E83F646 890EC483 0EAD1F42 9A0E76FF 1076FF0A 76FF0C76 v..v..v..v..B.Ü..á..F-.--.t.Õ... 000100
5E1F0000 E9000088 0006E9F6 46880000 07C72606 5EC4000E E90375FE 4608FC46 F*.F±u.Õ..á^.&ú....F-Õ..|..Õ...^ 000120
8800F246 C60000EE 46C70000 F046C7D8 8E0EEC88 1E565700 0012C800 0CCAC95F _èò..à...WV.|ê..ÄúFÞ..úFŸ..ÕF·.| 000140
07C72606 5EC4F446 89F64689 000088F8 4689FA46 89000088 FC4689FE 46890000 ...F±.F*|...F*.F%|...F-.F¶á^.&ú. 000160
F07E83F0 46890000 10319A50 16F2468D 086A0A76 FF0C76FF 0E76FF10 76FF0001 ...v..v..v..v.j..F·.P.1....FÞ.-Þ 000180
1076FF01 44E9F046 88000007 C726065E C4000EE9 037433F2 7E800009 E9037400 .t.Õ...-·3t.Õ..á^.&ú....FÞÕD..v. 0001A0
09E90374 00F07E83 F0468900 000F239A 5016F246 8D096A0A 76FF0C76 FF0E76FF .v..v..v.j..F·.P.#....FÞ.-Þ.t.Õ. 0001C0
76FF0E76 FF1076FF 0109E9F0 46880000 07C72606 5EC4000E E9037459 F27E8000 ..-·Yt.Õ..á^.&ú....FÞÕ...v..v..v 0001E0
```

Dump of file SATURN:[PCCOMMON.DUMP.DLL]DAPREDS.TMP;1 on 18-APR-1990 10:42:33.29
File ID (599,29,0)   End of file block 49 / Allocated 52

Virtual block number 13 (0000000D), 512 (0200) bytes

```
00FE7E83 0017E903 7400F07E 83F04689 000010FA 9A5016FC 4680156A 0A76FF0C ..v.j..F*.P.*....FÞ.-Þ.t.Õ...-±. 000000
C0E9F046 88000007 C726065E C4000EE9 037202FC 7E830009 E9037D00 1CE9037E -.Õ..).Õ...-*.r.Õ..á^.&ú....FÞÕà 000020
75000030 F0468900 0009C29A 5016F446 8D156A0A 76FF0C76 FF0E76FF 1076FF00 ..v..v..v..v.j..F¶.P.ô....FÞ=..u 000040
E9037502 47082607 8826F85E C4FA5689 F84689F6 5688F446 880060E9 0003E903 .Õ..Õ'..F¶.V-.F%.V*á^%&..&.G.u.Õ 000060
46890000 00A49A50 16FC468D 116A37FF 260277FF 26F85EC4 0E76FF10 76FF003D *..v..v.á^%&.w.&.7j..F*.P.Ê....F 000080
C4FF84E9 04F84683.000FE900 03E90374 FE4608FC 46880008 E9037400 F07E83F0 Þ.-Þ.t.Õ...F*.F±t.Õ..Õ...F%.ÕÇ.á 0000A0
E59AF476 FFF676FF )E76FF10 76FF0029 E90375F6 460BF446 88000007 C726065E ^.&ú....F¶.F-u.Õ)..v..v..v-.v¶.| 0000C0
00E9F046 88F04689 εE468800 03E9F046 880006E9 037500F0 7E83EE46 8900000A ....FŸ.-Þ.u.Õ...FÞÕ...FŸ.FÞ.FÞÕ. 0000E0
89FA4689 00008800 00F646C7 D88E0FAD 881E5657 00000EC8 000CCAC9 5F5E1F00 ..^_èò..à...WV.|Ü..ÄúF-..|...F*. 000100
FF1076FF 000107C7 26065EC4 FC4689FE 46890000 88F24689 F4468900 0088F846 F%|...F¶.F·|...F±.F*á^.&ú....v.. 000120
0017E903 7400F67E 83F64689 00000FF6 9A5016F8 4680046A 0A76FF0C 76FF0E76 v..v..v.j..F%.P.-....F-.--.t.Õ.. 000140
88000007 C726065E C4000EE9 037701F8 7E830009 E9037E00 1CE9037D 00FA7E83 .-*.).Õ..-.Õ...-%.w.Õ..á^.&ú.... 000160
F6468900 0000679A 5016F246 800F6A0A 76FF0C76 FF0E76FF 1076FF00 78E9F646 F-Õx..v..v..v..v.j..F·.P.g....F- 000180
FC468014 6A0A76FF 0C76FF0E 76FF1076 FF004EE9 F6468800 06E90375 00F67E83 .--.u.Õ...F-ÕN..v..v..v..v.j..F* 0001A0
46880019 E90374F4 460BF246 880016E9 037400F6 7E83F646 89000010 6C9A5016 .P.l....F-.--.t.Õ...F·.F¶t.Õ...F 0001C0
5F5E1F00 00E90000 880006E9 F6468800 0007C726 065EC400 0EE90374 FE460BFC *.F±t.Õ..á^.&ú....F-Õ..|..Õ...^_ 0001E0
```

```
Dump of file SATURN:[PCCOMMON.DUMP.DLL]DAPREDS.TMP;1 on 18-APR-1990 10:42:33.29
File ID (599,29,0)   End of file block 49 / Allocated 52

Virtual block number 14 (0000000E), 512 (0200) bytes

FE468900 00B80000 F046C700 00F246C7 D8BE1170 B81E5657 000010C8 000CCAC9 èò..à...WV.|p..ÄúF·..úFÞ..|...F± 000000
1076FF00 0107C726 065EC4F4 4689F646 89000088 F84689FA 46890000 B8FC4689 .F=|...F*.F½|...F-.F¶á^.&ú....v. 000020
08E90374 00F27E83 F2468900 0012239A 5016FC46 8D1A6A0A 76FF0C76 FF0E76FF .v..v..v.j..F•.P.#....F·.~·.t.Ö. 000040
0E76FF10 76FF0088 E9F2468B 000007C7 26065EC4 000EE903 75FE460B FC468800 ..F=.F±u.Ö..á^.&ú....F·Ö|..v..v. 000060
0058E900 03E90375 000030F2 46890000 10B59A50 16F44680 156A0A76 FF0C76FF .v..v.j..F¶.P.ç....F·=..u.Ö..ÖX. 000080
76FF1076 FF0030E9 03750247 0B260788 26F85EC4 FA5689FB 4689F656 8BF4468B .F¶.V-.F½.V•á^½&..&.G.u.Ö=..v..v 0000A0
E9037400 F27E83F2 4689FFFF 05479A06 76FF0876 FF37FF26 0277FF26 F85EC40E .á^½&.w.&.7.v..v..G....F·.-·.t.Ö 0000C0
0375F646 08F4468B FFB4E904 F8468300 07E90003 E9037400 3F832606 5EC4000C ..á^.&.?.t.Ö..Ö...F½.ÖÇ..F¶.F-u. 0000E0
0006E903 7500F27E 83F04689 0000113F 9AF476FF F676FF0E 76FF1076 FF0029E9 Ö)..v..v..v-.v¶.?....FÞ.-·.u.Ö.. 000100
1E565700 0006C800 0CCAC95F 5E1F0000 E9F2468B F24689F0 46B80003 E9F2468B .F·Ö...FÞ.F·.F·Ö...^_èò..à...WV. 000120
76FF1076 FF000107 C726065E C4FC4689 FE468900 00880000 FA46C7D8 8E1. CB8 |l..ÄúF*..|...F±.F•á^.&ú....v..v 000140
88000BE9 037400FA 7E83FA46 89000012 819A5016 FC468D19 6A0A76FF 0C76. 0E ..v..v.j..F•.P.Ý....F*.~*.t.Ö... 000160
5E1F0000 E9000088 0006E9FA 46880000 07C72606 5EC4000E E90375FE 460BFC46 F=.F±u.Ö..á^.&ú....F*Ö..|..Ö...^ 000180
C4FC4689 FE468900 00880000 FA46C7D8 8E13A1B8 1E565700 0006C800 0CCAC95F _èò..à...WV.|À..ÄúF*..|...F±.F•á 0001A0
830F6E1F 429A0E76 FF1076FF 0A76FF0C 76FF136A 5016FC46 80000107 C726065E ^.&ú....F=.Pj..v..v..v..v..B.n.. 0001C0
02FC7E83 0009E903 7D001CE9 037E00FE 7E830017 E9037400 FA7E83FA 46890EC4 á..F*.-*.t.Ö...-±.-.Ö..).Ö...-=. 0001E0

Dump of file SATURN:[PCCOMMON.DUMP.DLL]DAPREDS.TMP;1 on 18-APR-1990 10:42:33.29
File ID (599,29,0)   End of file block 49 / Allocated 52

Virtual block number 15 (0000000F), 512 (0200) bytes

000CCAC9 5F5E1F00 00E90000 B80006E9 FA468800 0007C726 065EC400 0EE90372 r.Ö..á^.&ú....F*Ö..|..Ö...^_èò.. 000000
FE468900 0088F846 89FA4689 00008800 00F646C7 D88E1400 B81E5657 00000AC8 à...WV.|...ÄúF-..|...F*.F½|...F± 000020
B09A5016 F8468D04 6A0A76FF 0C76FF0E 76FF1076 FF000107 C726065E C4FC4689 .F•á^.&ú....v..v..v..v.j..F½.P.¯ 000040
F87E8300 09E9037E 001CE903 7D00FA7E 830017E9 037400F6 7E83F646 89000011 ....F-.--.t.Ö...-*.).Ö..-.Ö...-½ 000060
76FF0C76 FF136A50 16FC468D 0046E9F6 46880000 07C72606 5EC4000E E9037701 .w.Ö..á^.&ú....F-ÖF..F•.Pj..v..v 000080
460BFC46 88000BE9 037400F6 7E83F646 890EC483 14301F42 9A0E76FF 1076FF0A ..v..v..B.=..á..F-.--.t.Ö...F•.F 0000A0
0CCAC95F 5E1F0000 E9000088 0006E9F6 46880000 07C72606 5EC4000E E90374FE ±t.Ö..á^.&ú....F-Ö..|..Ö...^_èò. 0000C0
46890000 B8FC4689 FE468900 00B80000 F646C7D8 8E148888 1E565700 000AC800 .à...WV.|...ÄúF-..|...F±.F•|...F 0000E0
FFFF9A50 16FC468D 0A76FF0C 76FF0E76 FF1076FF 000107C7 26065EC4 F84689FA *.F½á^.&ú....v..v..v..v..F=.P... 000100
0007C726 065EC400 0EE90374 FE460BFC 46880008 E9037400 F67E83F6 46890000 ...F-.--.t.Ö...F•.F±t.Ö..á^.&ú.. 000120
89000013 CF9A5016 F8468008 6AFC76FF FE76FF0E 76FF1076 FF004FE9 F6468800 ..F-ÖO..v..v..v±.v•j..F½.P.ü.... 000140
E9037601 F87E8300 09E9037D 001CE903 7E00FA7E 830017E9 037400F6 7E83F646 F-.--.t.Ö...-*.-.Ö..).Ö...-½.v.Ö 000160
0006C800 0CCAC95F 5E1F0000 E90000B8 0006E9F6 46880000 07C72606 5EC4000E ..á^.&ú....F-Ö..|..Ö...^_èò..à.. 000180
0C76FF0E 76FF1076 FFFA4689 FC468900 00B80000 FE46C7D8 8E154988 1E565700 .WV.|l..ÄúF±..|...F=.F*.v..v..v. 0001A0
C95F5E1F 0000E9FE 468BFE46 89150A16 439A0676 FF0876FF 5016FA46 800A76FF .v..F*.P.v..v..C....F±.F:`...^_è 0001C0
46890000 B80000FF 7486C700 00FF7C86 C7D88E16 05B81E56 570000E0 C8000CCA ò..àÀ..WV.|...Äú.|...ú.t...|...F 0001E0

Dump of file SATURN:[PCCOMMON.DUMP.DLL]DAPREDS.TMP;1 on 18-APR-1990 10:42:33.29
File ID (599,29,0)   End of file block 49 / Allocated 52

Virtual block number 16 (00000010), 512 (0200) bytes

000088FF 208689FF 22868900 00880000 8646C798 46899A46 89000088 A44689A6 I.FÈ|...F..F.úF...|....".... .|.. 000000
46899246 89000088 8C46898E 46890000 889C4689 9E468900 00888046 89824689 .fÿ.F¯|...F..F.|...F..F.|...F..F 000020
000088FF 7E868980 46890000 88824689 84468900 00888846 898A4689 00008890 .|...F..F.|...F..F.|...F..-.|.. 000040
89000088 A84689AA 46890000 88FF2486 89FF2686 89000088 FF768689 FF788689 ..x...v.|.....&....$.|....F·.F·|.. 000060
065EC400 00FF7A86 C7944689 96468900 0088A046 89A24689 000088AC 4689AE46 FÜ.F¯|...FÀ.F.|...F..F.ú.z...á^. 000080
46800E76 FF1076FF 1276FF14 76FF0789 26024789 26000088 0A5EC400 0107C726 &ú...á^.|.&.G.&...v..v..v..v..F 0000A0
0FE90374 A64608A4 46880008 E9037400 FF7C8E83 FF7C8689 0000157E 9A5016A4 E.P.-.....|..f|..t.Ö...FÈ.F|t.Ö. 0000C0
FF7C8689 0000FFFF 9A501686 46800 26A 0670E9FF 7C868800 0007C726 065EC400 .á^.&ú.....|.Öp.j..F..P.......|. 0000E0
00003DFF 7C868900 0018319A 5016FF20 86808676 FF0575E9 0003E903 7500003D =..u.Ö..Öu..v.....P.1.......|.=.. 000100
00001858 9A50168C 46800 86A A476FFA6 76FF1276 FF1476FF 0558E900 03E90375 u.Ö..ÖX..v..v..v|.vÉj..F..P.X... 000120
88269C5E C49E5689 9C46898E 5688BC46 880531E9 0003E903 7500003D FF7C8689 ..|.=..u.Ö..Ö1..F..V..F..V.á^.&. 000140
89000018 969A37FF 260277FF 269C5EC4 5016FF20 86800033 E9037502 470B2607 .&.G.u.Ö3.....Pá^.&.w.&.7....... 000160
1476FFFF 8EE9049C 46830084 56830182 468304F2 E90003E9 03750000 3DFF7C86 .|.=..u.Ö..Ö...F...V...F..Öf..v. 000180
00FF7C8E 838C4689 8E468900 0088FF7C 86890000 13709A8C 76FF8E76 FF1276FF .v..v..v..p.....|.|...F..F../|.. 0001A0
03E90375 00003DFF 7C868900 00FFFF9A 50168046 808676FF 04B8E900 03E90375 u.Ö..Ö|..v..F¯.P.......|.=..u.Ö. 0001C0
FF7C8689 000012EE 9A501688 46800 96A A476FFA6 76FF1276 FF1476FF 049CE900 .Ö...v..v..v|.vÉj..F..P.Ý.....|. 0001E0
```

```
Dump of file SATURN:[PCCOMMON.DUMP.DLL]DAPREDS.TMP;1 on 18-APR-1990 10:42:33.29
File ID (599,29,0)   End of file block 49 / Allocated 52

Virtual block number 17 (00000011), 512 (0200) bytes

 47082607 8826905E C4925689 9046898A 56888846 880475E9 0003E903 75000030 *..u.Ö..Öu..F..V..F..V.á^.&..&.G 000000
 0030FF7C 86890000 FFFF9A37 FF260277 FF26905E C4501680 46800033 E9037502 .u.Ö3..F¯.Pá^.&.w.&.7.......|.=. 000020
 FF1276FF 1476FFFF 8EE90490 46830080 568301FF 7E868304 37E90003 E9037500 .u.Ö..Ö7...~...V...F..Öƒ..v..v.. 000040
 03E90375 00FF7CBE 83884689 8A468900 0088FF7C 86890000 180A9A88 76FF8A76 v..v.........|.|...F..F..ƒ|..u.Ö. 000060
 03E90375 00003DFF 7C868900 00FFFF9A 5016FF76 86801276 FF1476FF 03FCE900 .Ö•..v..v...v..P.......|.=..u.Ö. 000080
 86890000 1A339A50 16A8468D 186AFF76 86FFFF78 86FF1276 FF1476FF 030CE900 .ÖÉ..v..v..Äx..Äv.j..F´.P.3..... 0000A0
 26FF249E C4FF2696 89FF2486 89AA5688 A8468803 83E90003 E9037500 0030FF7C |.=..u.Ö..Ö°..F´.V´..$...&.á.$.& 0000C0
 57392600 0CE90374 07392610 56880E46 88FF249E C4038DE9 03750247 08260788 ..&.G.u.Ö..á.$..F..V.&9.t.Ö..&9W 0000E0
 9A501698 468D37FF 260277FF 26FF249E C41276FF 1476FF02 D6E90003 E9037402 .t.Ö..Ö•..v..v.á.$.&.w.&.7.F..P. 000100
 029FE900 03E90374 9A460898 46880008 E9037400 FF7CBE83 FF7C8689 00001724 $.....|..ƒ|..t.Ö...F..F.t.Ö..Ö.. 000120
 FF7CBE83 FF7C8689 000019F3 9A5016AC 4680086A 9876FF9A 76FF1276 FF1476FF .v..v..v..v.j..F¯.P.¤.....|..ƒ|. 000140
 FF0260E9 0003E903 75AE5639 0008E903 74AC4639 84568882 46880016 E9037400 .t.Ö...F..V.9F¯t.Ö..9VÚu.Ö..Ö°.. 000160
 00FF7CBE 83FF7C86 89000015 889A5016 AC468D09 6A9876FF 9A76FF12 76FF1476 v..v..v..v.j..F¯.P.E.....|..ƒ|.. 000180
 FF0220E9 0003E903 75AE5639 0008E903 74AC4639 805688FF 7E868800 17E90374 t.Ö....~..V.9F¯t.Ö..9VÚu.Ö..Ö .. 0001A0
 03750000 30FF7C86 8900001B 3A9A5016 8C468008 6A9876FF 9A76FF12 76FF1476 v..v..v..v.j..F..P.:.....|.=..u. 0001C0
 C5E90375 02470826 0788269C 5EC49E56 899C4689 8E56888C 4688029A E90003E9 Ö..Ö...F..V..F..V.á^.&..&.G.u.Öé 0001E0

Dump of file SATURN:[PCCOMMON.DUMP.DLL]DAPREDS.TMP;1 on 18-APR-1990 10:42:33.29
File ID (599,29,0)   End of file block 49 / Allocated 52

Virtual block number 18 (00000012), 512 (0200) bytes

 7C868900 001ACE9A 50168446 8D026A37 FF260277 FF269C5E C41276FF 1476FF00 ..v..v.á^.&.w.&.7j..FÇ.P.ó.....| 000000
 FF00001B A09AFF20 86FFFF22 86FF0000 FF7A86C7 0254E900 03E90375 00003DFF .=..u.Ö..ÖT.ú.z....Ä"..Ä ....... 000020
 FF1276FF 1476FF00 59E90374 00003000 0018809A 5016A046 80FF2086 FFFF2286 Ä"..Ä ..F..P.¯...=..t.Č´..v..v.. 000040
 FFE90003 E9037500 0030FF7C 86890000 18809A50 16FF2886 8D026AA0 76F. \276 vÅ.v.j...(..P.......|.=..u.Ö..Ö. 000060
 FF7A86C7 0013E903 74000030 08C483FF FF00009A 5016FF28 86805016 8446 ^01 ..FÇ.P..(..P......á.=..t.Ö..ú.z. 000080
 830120E9 0003E903 7400FF7A 8E83FF80 E90000FF FF9AFF20 86FFFF22 86FF0.01 ...Ä"..Ä ......Ö...ƒz..t.Ö..Ö .. 0000A0
 86890000 179C9A50 1688468D 096A9876 FF9A76FF 1276FF14 76FFFF2C E9049C46 F..Ö,..v..v..v..v.j..F..P....... 0000C0
 26078826 905EC492 56899046 898A5688 88468801 93E90003 E9037500 003DFF7C |.=..u.Ö..Ö...F..V..F..V.á^.&..& 0000E0
 9A5016B4 4680026A 37FF2602 77FF2690 5EC41276 FF1476FF 008FE903 7502470B .G.u.Öé..v..v.á^.&.w.&.7j..FÇ.P. 000100
 9AB076FF B276FF00 00FF7A86 C7014DE9 0003E903 75000030 FF7C8689 0000148F é.....|.=.-.u.Ö..ÖM.ú.z....vý.v¯. 000120
 FF1476FF 0057E903 74000030 0000FFFF 9A501694 4680B076 FFB276FF 0000FFFF .....vý.v¯.F..P.....=..t.ÖW..v.. 000140
 03E90375 00003DFF 7C868900 001A799A 5016FF28 8680026A 9476FF96 76FF1276 v..v..v.j...(..P.y.....|.=..u.Ö. 000160
 C70011E9 03740000 3008C483 1AEF0000 9A5016FF 28868050 1684468D 00FCE900 .Ö•..FÇ.P..(..P...ÿ..á.=..t.Ö..ú 000180
 001FE900 03E90374 00FF7ABE 83FF91E9 00001808 9AB076FF B276FF00 01FF7A86 .z....vý.v¯.....Ö...ƒz..t.Ö..Ö.. 0001A0
 8800A1E9 02578926 0789260A 5EC40257 88260788 26FF249E C4FF32E9 04904683 .F..Ö2.á.$.&..&.W.á^.&..&.W.ÖÀ.. 0001C0
 83FF7486 8900001C 999A8C76 FF8E76FF 1276FF14 76FF0037 E903758E 46088C46 F..F.u.Ö7..v..v..v..v........t.. 0001E0

Dump of file SATURN:[PCCOMMON.DUMP.DLL]DAPREDS.TMP;1 on 18-APR-1990 10:42:33.29
File ID (599,29,0)   End of file block 49 / Allocated 52

Virtual block number 19 (00000013), 512 (0200) bytes

 46898E46 890000B8 FF7C8689 FF748688 0004E9FF 7C868800 07E90375 00FF7CBE ƒ|..u.Ö....|.Ö....t...|.|...F..F 000000
 74868900 0018C69A 8876FF8A 76FF1276 FF1476FF 0037E903 758A4608 8846888C ..F..F.u.Ö7..v..v..v..v..ó.....t 000020
 8A468900 0088FF7C 8689FF74 86880004 E9FF7C86 880007E9 037500FF 7CBE83FF ..ƒ|..u.Ö....|.Ö....t...|.|...F. 000040
 000007C7 26065EC4 FC63E904 FF248683 0010E900 03E90375 00FF7CBE 83884689 .F..ƒ|..u.Ö..Ö....$..Öc•á^.&ú... 000060
 880007E9 037500FF 7CBE83FF 74868900 00FFFF9A 8676FF00 25E90375 00867E83 .~..u.Ö%..v.........t..ƒ|..u.Ö... 000080
 FF1276FF 1476FF00 2EE90375 8E46088C 4688FF7C 8689FF74 86880004 E9FF7C86 .|.Ö....t...|..F..F.u.Ö...v..v.. 0000A0
 880004E9 FF7C8688 0007E903 7500FF7C 8E83FF74 86890000 1D5F9A8C 76FF8E76 v..v.._......t..ƒ|..u.Ö...|.Ö... 0000C0
 989A8876 FF8A76FF 1276FF14 76FF002E E903758A 46088846 88FF7C86 89FF7486 .t...|..F..F.u.Ö...v..v..v..v... 0000E0
 FF7C8689 FF748688 0004E9FF 7C868800 07E90375 00FF7CBE 83FF7486 8900001D .....t..ƒ|..u.Ö....|.Ö....t...|. 000100
 FF748689 00001C57 9AA876FF AA76FF12 76FF1476 FF002EE9 0375AA46 08A84688 .F´.F¯u.Ö...v..v..v´.v´.W.....t. 000120
 0000E9FF 7C8688FF 7C8689FF 74868800 04E9FF7C 86880007 E9037500 FF7CBE83 .ƒ|..u.Ö....|.Ö....t...|...|.Ö.. 000140
 76FF1076 FF000007 C726065E C4D88E16 48881E56 57000016 C80010CA C95F5E1F .^_èÒ..á...WV.¡K..Äá^.&u....v..v 000160
 46880006 E9037500 003DEE46 89000019 1A9A5016 F0468012 6A0A76FF 0C76FF0E ..v..v.j..FÞ.P......FŸ=..u.Ö...F 000180
 47082607 8826EA5E C404EA46 830004E9 EC5689EA 4689F256 88F04688 0137E9EE ŸÖ7..FÞ.V·.FÖ.VšÖ...FÖ.á^Ö&..&.G 0001A0
 1E7C9A50 16F84680 036A37FF 260277FF 26EA5EC4 0E76FF10 76FF00FE E9037502 .u.Ö±..v..v.á^Ö&.w.&.7j..F½.P.|. 0001C0
 46880000 1E989AF0 76FFF276 FF0E76FF 1076FF00 17E90375 00003DEE 46890000 ...FŸ=..u.Ö...v..v..v·.vÞ......F 0001E0
```

Dump of file SATURN:[PCCOMMON.DUMP.DLL]DAPREDS.TMP;1 on 18-APR-1990 10:42:33.29
File ID (599,29,0)   End of file block 49 / Allocated 52

Virtual block number 20 (00000014), 512 (0200) bytes

```
00001B01 9A5016F4 4680046A 37FF2602 77FF26EA 5EC40E76 FF1076FF 0007E9EE Yõ...v..v.á^õ&.w.&.7j..F¶.P.ì... 000000
E9EE468B 00001ED6 9AF076FF F276FF0E 76FF1076 FF0017E9 03750000 30EE4689 .FY=..u.Õ...v..v..v·.vÞ......FYÕ 000020
46890000 19B49A50 16FC4680 136A37FF 260277FF 26EA5EC4 0E76FF10 76FF0099 ...v..v.á^õ&.w.&.7j..F=.f ç....F 000040
005BE9EE 46880000 1D269AF0 76FFF276 FF0E76FF 1076FF00 17E90375 00003DEE Y=..u.Õ...v..v..v·.vÞ.&....FYÕ[. 000060
7400FA7E 830026E9 037401F8 7E83002F E9037400 F67E8300 38E90374 01F47E83 .~¶.t.Õ8..~.t.Õ/..~½.t.Õ&..~ª.t 000080
03E90001 07C72606 5EC40008 E9037400 FE7E8300 14E90374 01FC7E83 001DE903 .Õ...~•.t.Õ...~±.t.Õ..á^.&ú...Õ. 0000A0
CAC95F5E 1F0000E9 00008800 001E5A9A F076FFF2 76FF0E76 FF1076FF FEEFE900 .Õy±.v..v..v·.vÞ.Z...¡..Õ...^_èò 0000C0
89000088 FC4689FE 46890000 880000FA 46C7088E 10CF881E 56570000 0EC8000C ..Ã...WV.¡ü..ÁúF•..¡...F±.F•¡... 0000E0
FC46800E 76FF0A76 FF0C76FF 0676FF08 76FFF646 89F84689 000088F2 4689F446 F¶.F·¡...F½.F-.v..v..v..v..v..F= 000100
76FF0676 FF0876FF 0090E9FA 46880006 E9037500 0030FA46 8900001E BA9A5016 .P.□....F•=..u.Õ...F•Õ...v..v..v 000120
67E9FA46 880006E9 03750000 30FA4689 000011F9 9A5016F6 46800F6A 0A76FF0C ..v.j..F-.P.•....F•=..u.Õ...F•Õg 000140
800043E9 02578926 078926FE 5688FC46 88105EC4 0013E903 74F84608 F6468800 ..F-.F½t.Õ..á^..F=.V±&..&.W.ÕC.. 000160
0030FA46 890EC483 16311F42 9A0676FF 0876FFF6 76FFF876 FF0E76FF 5016F246 F·.P.v..v½.v-.v..v..B.1..á..F•=. 000180
89260789 26F45613 F24603FE 5688FC46 88105EC4 001CE9FA 46880006 E9037500 .u.Õ...F•Õ..á^..F•.V±.F·.V¶&..&. 0001A0
00880000 F646C7D8 8E1F4A88 1E565700 000EC8C8 C95F5E1F 0000E900 00880257 W.¡..Õ...^_èùà...WV.¡J..ÁúF-..¡. 0001C0
FF0676FF 0876FFF8 4689FA46 89000088 FC4689FE 46890000 88F24689 F4468900 ..F¶.F·¡...F±.F=¡...F•.F½.v..v.. 0001E0
```

Dump of file SATURN:[PCCOMMON.DUMP.DLL]DAPREDS.TMP;1 on 18-APR-1990 10:42:33.29
File ID (599,29,0)   End of file block 49 / Allocated 52

Virtual block number 21 (00000015), 512 (0200) bytes

```
E9F6468B 0006E903 75000030 F6468900 0020969A 5016F246 8D146A0A 76FF0C76 v..v.j..F·.P.. ...F-=..u.Õ...F-Õ 000000
00003DF6 46890000 208F9A50 16FC468D 156A0A76 FF0C76FF 0676FF08 76FF0095 ...v..v..v..v.j..F=.P.¢ ...F-=.. 000020
839A5016 FB468D12 6A0A76FF 0C76FF06 76FF0876 FF006CE9 F6468800 06E90375 u.Õ...F-Õl..v..v..v..v.j..F½.P.. 000040
FE5688FC 4688F276 FFF476FF 0043E9F6 46880006 E9037500 0030F646 8900001F ....F-=..u.Õ...F-ÕC..v¶.v·.F=.V± 000060
0876FF02 57892607 89260E5E C4F4561B F246281B F2002A9A 5052FA56 13F84603 .F½.V•RP.*.·.+F·.V¶á^.&..&.W..v. 000080
00020013 CBC95F5E 1F0000E9 F64688F6 46890000 FFFF9A12 76FF1476 FF0676FF .v..v..v.......F-.F-Õ...^_èù.... 0000A0
020300FF 000317D8 02030166 0006210A 02030000 00021334 00020000 00011FF6 -.......4........!..f...Ü....... 0000C0
02030000 000A2035 00020000 000920E8 00020088 00021758 02030011 000118F1 þ.......X.......Š ......5 ....... 0000E0
020300AC 00031A98 02030033 00011E3E 02030025 00012060 02030099 00021CED Ú.......m ..X...>...3.......¯... 000100
02030080 00031C0C 0203004D 00011FAC 02030129 00041980 02030041 00011DEF ÿ...A.......)...¯...M.......§... 000120
00000000 00000000 000000E5 00031775 02030001 00031AAD 0203005A 00011F31 1...Z...Ù...1...u...1........... 000140
07C72606 5EC4FC46 89FE4689 00008800 00FA46C7 D88EFFFF 881E5657 000006C8 Ã...WV.¡...ÁúF•..¡...F±.F•á^.&ú. 000160
FA7E83FA 46890000 FFFF9A50 16FC468D 0C6A0A76 FF0C76FF 0E76FF10 76FF0001 ...v..v..v..v.j..F=.P......F•.~• 000180
880006E9 FA468800 0007C726 065EC400 0EE90375 FE4608FC 46880008 E9037400 .t.Õ...F=.F±u.Õ..á^.&ú....F•Õ..¡ 0001A0
FA46C600 00F846C7 D88E0008 881E5657 000008C8 000CCAC9 5F5E1F00 00E90000 ..Õ...^_èò..à...WV.¡...ÁúF½..ÕF• 0001C0
046A0A76 FF0C76FF 0E76FF10 76FF0001 07C72606 5EC4FC46 89FE4689 00008800 .¡...F±.F•á^.&ú....v..v..v..v.j. 0001E0
```

Dump of file SATUR :[PCCOMMON.DUMP.DLL]DAPREDS.TMP;1 on 18-APR-1990 10:42:33.29
File ID (599,29,0)   End of file block 49 / Allocated 52

Virtual block number 22 (00000016), 512 (0200) bytes

```
C4000EE9 037544FA 7E800009 E9037400 F87E83F8 46890000 FFFF9A50 16FA468D .F•.P......F½.~½.t.Õ...~•Du.Õ..á 000000
5016FC46 8D186A0A 76FF0C76 FF0E76FF 1076FF00 43E9F846 88000007 C726065E ^.&ú....F½ÕC..v..v..v..v.j..F•.P 000020
26065EC4 000EE903 75FE4608 FC468800 08E90374 00F87E83 F8468900 0000369A .6....F½.~½.t.Õ...F=.F±u.Õ..á^.& 000040
74881E56 570000C0 C8000CCA C95F5E1F 0000E900 00880006 E9F8468B 000007C7 ú....F½Õ..¡..Õ...^_èò..àá..WV.¡t 000060
46890000 88000098 46C79446 89964689 00008800 008C46C7 00009246 C7088E00 ..ÃúF...úF...¡...F..F.úF...¡...F 000080
88A24689 A4468900 00888E46 89904689 000088AA 4689AC46 89000088 AE468980 ¯.FÙ¡...F¯.F¯¡...F..F.¡...FÈ.FÅ¡ 0000A0
00009A46 C7000082 46C70000 A046C79C 46899E46 89000088 A64689A8 46890000 ...F´.FÌ¡...F..F.úF...úFý..úF... 0000C0
000000E1 9A501694 46800A6A 0A76FF0C 76FF0E76 FF1076FF 000107C7 26065EC4 á^.&ú....v..v..v..v.j..F..P.Ã... 0000E0
88000007 C726065E C4000EE9 03749646 08944688 000BE903 7400927E 83924689 .F..~..t.Õ...F..F.t.Õ..á^.&ú.... 000100
7E839246 890000FF FF9A5016 98468D94 76FF9676 FF0E76FF 1076FF02 D1E99246 F.Õì..v..v..v..v..F..P......F..~ 000120
76FF0298 E9924688 000007C7 26065EC4 000EE903 7502987E 830009E9 03740092 ..t.Õ...~..u.Õ..á^.&ú....F.Õ...v 000140
880006E9 03750000 ʖ0924689 0000FFFF 9A5016AE 46809476 FF9676FF 0E76FF10 ..v..v..v..FÛ.P......F.=..u.Õ... 000160
4680096A AE76FFB0 76FF0E76 FF1076FF 0084E903 75804608 AE468802 71E99246 F.Õq..FÛ.F¯u.ÕÇ..v..v..v¯.vÛj..F 000180
74AC4608 AA468802 3ʟE99246 880006E9 03750000 30924689 0000FFFF 9A5016AA ¯.P......F.=..u.Õ...F.Õ=..F`.F¯t 0001A0
30924689 00000244 9A5016AA 46800B6A AE76FFB0 76FF0E76 FF1076FF 0080E903 .Õ...v..v..v¯.vÛj..F¯.P.D....F.= 0001C0
FF0045E9 037400AC 7E83004E E9037401 AA7E8302 09E99246 880006E9 03750000 ..u.Õ...F.Õ...~`.t.ÕN..~¯.t.ÕE.. 0001E0
```

```
Dump of file SATURN:[PCCOMMON.DUMP.DLL]DAPREDS.TMP;1 on 18-APR-1990 10:42:33.29
File ID (599,29,0)   End of file block 49 / Allocated 52

Virtual block number 23 (00000017), 512 (0200) bytes

 E9037500 00309246 89000003 6A9A5016 A2468D08 6AAE76FF 8076FF0E 76F: 076 v..v..v¯.vÙj..FÅ.P.j....F.=..u.Ő 000000
 C70005E9 03740257 3926000E E9037407 39260C56 8B0A468B A25EC401 63E9U003 ..Őc.á^Å.F..V.&9.t.Ő..&9W.t.Ő..ú 000020
 B39A5016 B246800A 76FF0C76 FF0E76FF 1076FF00 24E90375 00A07E83 0001A046 F....~..u.Ő$..v..v..v..v..Fý.P.* 000040
 80026A0A 76FF0C76 FF0E76FF 1076FF01 17E90003 E9037500 00309246 89FFFF05 ....F.=..u.Ő..Ő...v..v..v..v.j.. 000060
 46800E76 FF1076FF 00F0E900 03E90375 00003092 46890000 03009A50 16FF4086 .a..P.Å....F.=..u.Ő..Őb..v..v..F 000080
 FF9076FF 0E76FF10 76FF0002 E90003E9 03750000 30924689 0000FFFF 9A50168E ..P......F.=..u.Ő..Ő..v..v..v.. 0000A0
 889C4688 00ACE900 03E90375 00003092 46890000 FFFF9A50 169C468D 1A6A8E76 v.j..F..P......F.=..u.Ő..Ő¯..F.. 0000C0
 0C56880A 4688A65E C40089E9 03750247 08260788 26A65EC4 A85689A6 46899E56 V..Fl.V'á^l&..&.G.u.Ő..á^l.F..V. 0000E0
 5EC40E76 FF1076FF FFD0E904 A6468300 07E90374 02573926 0010E903 74073926 &9.t.Ő..&9W.t.Ő...Fl.ŐÅ..v..v.á^ 000100
 E90003E9 03750000 30924689 000000A6 9A501684 4680026A 37FF2602 77FF26A6 l&.w.&.7j..FÇ.P.l....F.=..u.Ő..Ő 000120
 A6468300 07E90375 00003008 C483FFFF 00009A50 16FF4086 80501684 46800046 F..FÇ.P..a..P......á.=..u.Ő...Fl 000140
 FF68E904 A6468300 0FE90003 E9037500 827E8300 09E90375 00A07E83 FF84E904 .Ő...~..u.Ő...~ý.u.Ő..Ő...Fl.Őh. 000160
 9AA276FF A476FF0E 76FF1076 FF0029E9 0375A446 08A2468B 000007C7 26065EC4 á^.&ú....FÅ.FÊu.Ő)..v..v..vÊ.vÅ. 000180
 089C4688 9246898C 46880003 E9924688 0006E903 7500927E 838C4689 00000474 t....F..~..u.Ő...F.Ő...F..F..F.. 0001A0
 7500927E 838C4689 0000FFFF 9A9C76FF 9E76FF0E 76FF1076 FF0029E9 03759E46 F.u.Ő)..v..v..v..v.......F..~..u 0001C0
 0008C800 0CCAC95F 5E1F0000 E9924688 9246898C 46880003 E9924688 0006E903 .Ő...F.Ő...F..F..F.Ő...^_èò..à.. 0001E0

Dump of file SATURN:[PCCOMMON.DUMP.DLL]DAPREDS.TMP;1 on 18-APR-1990 10:42:33.29
File ID (599,29,0)   End of file block 49 / Allocated 52

Virtual block number 24 (00000018), 512 (0200) bytes

 26065EC4 0000FE46 C7FA4689 FC468900 00B80000 F846C7D8 8E011FB8 1E565700 .WV.|...ÅúF%..|...F•.F*úF±..á^.& 000000
 83F84689 0000019C 9A5016FA 46800A6A 0A76FF0C 76FF0E76 FF1076FF 000107C7 ú....v..v..v..v.j..F*.P......F%. 000020
 3FE9F846 88000007 C726065E C4000EE9 0374FC46 08FA4688 0008E903 7400F87E -%.t.Ő...F*.F•t.Ő..á^.&ú....F%Ő7 000040
 037400F8 7E83F846 89000001 079A5016 FE4680FA 76FFFC76 FF0E76FF 1076FF00 ..v..v..v=.v*.F±.P.■....F%.-%.t. 000060
 0000E900 00B80006 E9F84688 000007C7 26065EC4 000EE903 7501FE7E 830009E9 Ő...~±.u.Ő..á^.&ú....F%Ő..|..Ő.. 000080
 4689FE46 89000088 0000FA46 C7D88E04 A5881E56 57000006 C8000CCA C95F5E1F .^_èò..à...WV.|É..ÅúF*..|...F±.F 0000A0
 0002789A 5016FC46 8D186A0A 76FF0C76 FF0E76FF 1076FF00 0107C726 065EC4FC •á^.&ú....v..v..v..v.j..F•.P.x.. 0000C0
 000007C7 26065EC4 000EE903 75FE460B FC468800 08E90374 00FA7E83 FA468900 ..F*.-*.t.Ő...F=.F±u.Ő..á^.&ú... 0000E0
 C7D88E05 4F881E56 5700000A C8000CCA C95F5E1F 0000E900 00B80006 E9FA4688 .F*Ő..|..Ő...^_èò..à...WV.|O..Åú 000100
 FF0C76FF 0E76FF10 76FFF846 89FA4689 000088FC 4689FE46 89000088 0000F646 F~..|...F±.F•|...F*.F%.v..v..v.. 000120
 0000E9F6 4688F646 89030106 079A0676 FF0876FF 5016F846 805016FC 46800A76 v..F•.P.F%.P.v..v.......F~.F-Ő.. 000140
 00B80000 FF3AB6C7 00008C46 C7D88E05 BBB81E56 570000CC C8000CCA C95F5E1F .^_èò..àa..WV.|É..ÅúF...ú.:...|. 000160
 96468900 00889846 899A4689 00008800 FF3486C6 00009246 C78E4689 90468900 ..F..F.úF...6.4..|...F..F.|...F. 000180
 00888846 898A4689 0000889C 46899E46 89000088 A44689A6 46890000 88944689 .F.|...Fl.FÊ|...F..F.|...F..F.|. 0001A0
 46890000 88A84689 AA468900 0088AC46 89AE4689 000088FF 368689FF 38868900 ...8...6.|...FÜ.F¯|...F¯.F´|...F 0001C0
 76FF1476 FF1676FF 1876FF00 0107C726 065EC480 46898246 890000B8 A04689A2 Å.F.|...Fý.F¯á^.&ú....v..v..v..v 0001E0

Dump of file SATURN:[PCCOMMON.DUMP.DLL]DAPREDS.TMP;1 on 18-APR-1990 10:42:33.29
File ID (599,29,0)   End of file block 49 / Allocated 52

Virtual block number 25 (00000019), 512 (0200) bytes

 7490460B 8E468800 08E90374 008C7E83 8C468900 0004D89A 50168E46 800A6A12 .j..F..P.Å....F..~..t.Ő...F..F.t 000000
 46808E76 FF9076FF 1676FF18 76FF03E6 E98C4688 000007C7 26065EC4 000EE903 .Ő..á^.&ú....F.Ől..v..v..v..v..F 000020
 065EC400 0EE90375 02927E83 0009E903 74008C7E 838C4689 00000513 9A501692 ..P......F..~..t.Ő...~..u.Ő..á^. 000040
 76FF1876 FF025789 26078926 9056888E 46880E5E C403ADE9 8C468800 0007C726 &ú....F.ŐU.á^..F..V.&..&.W..v..v 000060
 34868A03 78E98C46 880006E9 03750000 308C4689 0000FFFF 9A5016FF 34868016 ...4..P......F.=..u.Ő...F.Ő(...4 000080
 46890000 03269A50 16FF3C86 80026A12 76FF1476 FF1676FF 1876FF00 8EE998FF ..Ő...v..v..v..v.j...<..P.&....F 0000A0
 0C6A1276 FF1476FF 1676FF18 76FF007C E90349E9 8C468800 06E90375 0000308C .=..u.Ő...F.Ől.Ő|..v..v..v..v.j. 0000C0
 76FF0050 E9031DE9 8C468800 06E90375 0000308C 46890000 07829A50 16984680 .F..P.ý....F.=..u.Ő...F.Ő..ŐP..v 0000E0
 06E90375 0000308C 46890000 09719A50 16A44680 086A1276 FF1476FF 1676FF18 ..v..v..v.j..FÊ.P.q....F.=..u.Ő. 000100
 03750049 30FF6AE 03750041 30001BE9 02E8E900 01880024 E902F1E9 8C468800 ..F.Őp.Ő$.|..ŐŐ.Ő..=A.u.Őj.=l.u. 000120
 46890000 03449A5. 16884680 1676FF18 76FFFFDC E9FF87E9 0375004F 30FFBBE9 ŐÉ.=O.u.Ő..ŐÉ..v..v..F..P.D....F 000140
 AC468018 6A8876FF 8A76FF16 76FF1876 FF02A9E9 8C468800 06E90375 0000308C .=..u.Ő...F.Ő`..v..v..v..v.j..F¯ 000160
 89FF3686 89AE5688 AC468802 11E90003 E9037500 00308C46 89000008 B89A5016 .P.|....F.=..u.Ő..Ő...F¯.VÜ..6.. 000180
 77FF26FF 369EC416 76FF1876 FF01E8E9 03750247 08260788 26FF369E C4FF3896 .8.á.6.&..&.G.u.Ő$..v..v.á.6.&.w 0001A0
 08804688 01CAE900 03E90375 0000308C 46890000 02109A50 16804680 37FF2602 .&.7.F¯.P......F.=..u.Ő..Őò..F¯. 0001C0
 0789260A 5EC40257 88260788 26FF369E C4FFB4E9 04FF3686 830008E9 0374B246 Fýt.Ő....6..ŐÇ.á.6.&..&.W.á^.&.. 0001E0
```

```
Dump of file SATURN:[PCCOMMON.DUMP.DLL]DAPREDS.TMP;1 on 18-APR-1990 10:42:33.29
File ID (599,29,0)   End of file block 49 / Allocated 52

Virtual block number 26 (0000001A), 512 (0200) bytes

 3D8C4689 000002B3 9A5016A0 468D086A 8076FFB2 76FF1676 FF1876FF 02578926 &.W..v..v..vý.v¯j..F..P.*....F.= 000000
 02470B26 07882 6A8 5EC4AA56 89A84689 A25688A0 4688017C E90003E9 03750000 ..u.Ö..Ö|..F..VÅ.F´.V´ó^´&..&.G. 000020
 830007E9 03740257 39260010 E9037407 39261456 8B12468B A85EC401 28E90375 u.Ö(.ó^´.F..V.&9.t.Ö..&9W.t.Ö... 000040
 026A37FF 260277FF 26A85EC4 1676FF18 76FF000D E998FF34 868AFFD0 E904A846 F´.ÖÅ...4..ÖI..v..v.ó^´&.w.&.7j. 000060
 3C868D50 16844680 010EE900 03E90375 0000308C 46890000 075A9A50 16844680 .FÇ.P.Z....F.=..u.Ö..Ö...FÇ.P..< 000080
 C41676FF 1876FF00 ADE900F0 E90003E9 03740000 3D08C483 03F00000 9A5016FF ..P...Þ..ó.=..t.Ö..ÖÞ.ÖÜ..v..v.ó 0000A0
 0003E903 75000030 8C468900 0009B79A 50169446 8D0C6A37 FF260277 FF26A85E ^´&.w.&.7j..F..P.ñ....F.*..u.Ö.. 0000C0
 FF0067E9 00AAE900 03E90374 9A563900 08E90374 98463996 56889446 8800C3E9 Öü..F..V.9F.t.Ö..9V.t.Ö..Ö´.Ög.. 0000E0
 00308C46 89000006 A99A5016 9C468008 6A37FF26 0277FF26 A85EC416 76FF1876 v..v.ó^´&.w.&.7j..F..P.´....F.=. 000100
 E90003E9 0374A656 39000BE9 0374A446 399E5688 9C468800 7DE90003 E9037500 .u.Ö..Ö)..F..V.9FÉt.Ö..9VIt.Ö..Ö 000120
 0375004F 30FFA4E9 03750049 30FF1BE9 03750041 30001BE9 001EE900 21E90064 d.ÖI.Ö..Ö..=A.u.Ö..=I.u.ÖE.=O.u. 000140
 46890000 04409AA0 76FFA276 FF1676FF 1876FFFE C9E904A8 4683FFDF E9FF56E9 ÖV.ÖÖ..F´.Öè±.v..v..vÅ.v..a....F 000160
 5EC4FE05 E904FF36 86830010 E90003E9 0375008C 7E83A046 89A24689 00v 988C .|...FÅ.F..~..u.Ö..Ö....ó..Ö.±ó^ 000180
 0A949AA0 76FFA276 FF1676FF 1876FF00 28E90375 A24608A0 46880000 07C, 506 .&ú....F..FÅu.Ö+..v..v..vÅ.v.... 0001A0
 08AC4688 8C4689FF 3A868800 04E98C46 880006E9 0375008C 7E83FF3A 86896J00 ....:..~..u.Ö...F.Ö....:..F..F¯. 0001C0
 008C7E83 FF3A8689 00000A1A 9AAC76FF AE76FF16 76FF1876 FF002BE9 0375AE46 FÜu.Ö+..v..v..vÜ.v¯.......:..~.. 0001E0

Dump of file SATURN:[PCCOMMON.DUMP.DLL]DAPREDS.TMP;1 on 18-APR-1990 10:42:33.29
File ID (599,29,0)   End of file block 49 / Allocated 52

Virtual block number 27 (0000001B), 512 (0200) bytes

 900014CA C95F5E1F 0000E98C 46888C46 89FF3A86 880004E9 8C468800 06E90375 u.Ö...F.Ö....:..F..F.Ö...^_èò... 000000
 000A060F 00020000 00090946 00020011 000107FA 02030000 000205F5 0002000C ....%.......*.......F........... 000020
 0004086A 02030033 00010926 02030025 0001057D 02030178 00060728 02030000 ....(...x...)...%...&...3...j... 000040
 000106E4 0203005A 00010A5E 0203004D 00010786 02030041 00010823 02030129 )...#...A.......M...^...Z...Ö... 000060
 00EE46C7 D88EFFFF B81E5657 000016C8 00000000 00000000 00000000 00000066 f...............à...WV.|...ÄúFŸ. 000080
 89000088 FC4689FE 46890000 88F04689 F2468900 0088F846 89FA4689 00008800 .|...F*.F%|...F·.FÞ|...F±.F=|... 0000A0
 FF0C76FF 0E76FF10 76FF0001 07C72606 5EC4EA46 89EC4689 000088F4 4689F646 F-.F¶|...F&.Föó^.&ú....v..v..v.. 0000C0
 FF01BDE9 EE468800 06E90375 00003DEE 46890000 00839A50 16F84680 036A0A76 v.j..F%.P......FŸ=..u.Ö...FŸÖ§.. 0000E0
 E9037500 003DEE46 89000001 689A5016 F0468006 6A0A76FF 0C76FF0E 76FF1076 v..v..v..v.j..FÞ.P.h....FŸ=..u.Ö 000100
 830017E9 037601F8 7E830009 E9037D00 25E9037E 00FA7E83 0194E9EE 46880006 ...FŸÖ...-*.-.Ö%.).Ö...-%.v.Ö... 000120
 7E0033E9 037D00FA 7E83002E E9037701 F07E8300 09E9037E 003CE903 7D00F27E -·.).Ö<.-.Ö...-Þ.w.Ö...-*.).Ö3.- 000140
 7701F07E 830009E9 037E001C E9037D00 F27E8300 25E90377 01F87E83 0009E903 .Ö...-%.w.Ö%..-·.).Ö..-.Ö...-Þ.w 000160
 006A0A76 FF0C76FF 0E76FF10 76FF012A E9000088 000007C7 26065EC4 000EE903 .Ö..ó^.&ú...|..Ö*..v..v..v..v.j. 000180
 76FF1076 FF0101E9 EE468800 06E90375 00003DEE 46890000 013F9A50 16F44680 .F¶.P.?....FŸ=..u.Ö...FŸÖ...v..v 0001A0
 46880006 E9037500 003DEE46 89000001 A49A5016 EA468010 6AF476FF F676FF0E ..v-.v¶j..Fö.P.Ê....FŸ=..u.Ö...F 0001C0
 83EE4689 000001F6 9A5016FC 468D046A EA76FFEC 76FF0E76 FF1076FF 0008E9EE ŸÖÅ..v..v..vš.vÖj..F=.P.-....FŸ. 0001E0

Dump of file SATURN:[PCCOMMON.DUMP.DLL]DAPREDS.TMP;1 on 18-APR-1990 10:42:33.29
File ID (599,29,0)   End of file block 49 / Allocated 52

Virtual block number 28 (0000001C), 512 (0200) bytes

 009CE9EE 46880006 E9037400 FE7E8300 0FE90374 01FC7E83 0012E903 7400EE7E -Ÿ.t.Ö...-=.t.Ö...-±.t.Ö...FŸÖ.. 000000
 03750000 30EE4689 000001CD 9A5016F4 468D0E6A 0A76FF0C 76FF0E76 FF1076FF .v..v..v..v.j..F¶.P.ë....FŸ=..u. 000020
 00FFFF9A 5016EA46 8D106AF4 76FFF676 FF0E76FF 1076FF00 73E9EE46 880006E9 Ö...FŸÖs..v..v..v-.v¶j..Fö.P.... 000040
 046AEA76 FFEC76FF 0E76FF10 76FF004A E9EE4688 0006E903 75000030 EE468900 ..FŸ=..u.Ö...FŸÖJ..v..v..vš.vÖj. 000060
 83000FE9 037401FC 7E830012 E9037400 EE7E83EE 46890000 FFFF9A50 16FC468D .F=.P......FŸ.-Ÿ.t.Ö...-=.t.Ö... 000080
 C95F5E1F 0000E900 00B80000 07C72606 5EC4000E E9EE4688 0006E903 7400FE7E -±.t.Ö...FŸÖ..ó^.&ú...|..Ö...^_è 0000A0
 89FE4689 00008800 00E046C7 0000E246 C7D88E00 08881E56 57000024 C8000CCA ò..à$..WV.|...ÄúFã..úFÅ. |...F±. 0000C0
 000088EC 4689EE46 89000088 F84689FA 46890000 88F04689 F2468900 0088FC46 F=|...F·.FÞ|...F*.F%|...Fí.F&|.. 0000E0
 46890E46 89000088 E44689E6 46890000 88E84689 EA468900 0088F446 89F64689 .F-.F¶|...Fõ.FÖ|...FÌ.FÖ|...F8.F 000100
 02F5086C 9A0676FF 0876FF0A 76FF0C76 FF0E76FF 1076FF00 0107C726 065EC40C Éó^.&ú....v..v..v..v..v..v..l.%. 000120
 000007C7 26065EC4 000EE903 75003F83 26065EC4 000CE903 7400E27E 83E24689 .Fã.-ã.t.Ö..ó^.&.?.u.Ö..ó^.&ú... 000140
 FF1076FF 0A76FF0C 76FF5016 FC468D50 16F04680 0676FF08 76FF023C E9E2468B .FãÖ<..v..v..FÞ.P.F=.P.v..v..v.. 000160
 E9037400 3F832606 5EC4000C E9037400 E27E83E2 468914C4 83FFFF16 099A0E76 v.......ó..Fã.-ã.t.Ö..ó^.&.?.t.Ö 000180
 0000FFFF 9A5016E8 468D126A FC76FFFE 76FF0E76 FF1076FF 01FAE9E2 46880006 ...FãÖ*..v..v..v±.v=j..FÒ.P..... 0001A0
 078826F4 5EC4F656 89F44689 EA5688E8 46880166 E90003E9 03750000 30E24689 .Fã=..u.Ö..Öf..FÒ.VÖ.F¶.V-ó^¶&.. 0001C0
 50160C46 80136A37 FF260277 FF26F45E C40E76FF 1076FF01 43E90375 02470826 &.G.u.ÖC..v..v.ó^¶&.w.&.7j..FÉ.P 0001E0
```

Dump of file SATURN:[PCCOMMON.DUMP.DLL]DAPREDS.TMP;1 on 18-APR-1990 10:42:33.29
File ID (599,29,0) End of file block 49 / Allocated 52

Virtual block number 29 (0000001D), 512 (0200) bytes

```
C4E65689 E446890E 56880C46 880121E9 0003E903 7500003D E2468900 00032C9A .,....Fã=..u.Õ..Õl..FÉ.V8.FÕ.Vl6 000000
260009E9 03740739 260C5688 0A4688E4 5EC400CE E9037502 47082607 8826E45E ^Õ&..&.G.u.Õö.6^õ.F..V.&9.t.Õ..& 000020
6C9A0676 FF0876FF 37FF2602 77FF26E4 5EC40E76 FF1076FF 00ADE903 75025739 9W.u.ÕÙ..v..v.6^Õ&.w.&.7.v..v..l 000040
E4468300 07E9C375 003F8326 065EC400 C3E90003 E9037500 003DE246 89041708 ....Fã=..u.Õ..Õú.6^.&.?.u.Õ...FÕ 000060
76FF37FF 260277FF 26E45EC4 5016F846 805016EC 46800676 FF0876FF FF9BE904 .Õ...v..v..F&.P.F%.P6^Õ&.w.&.7.v 000080
3F832606 5EC4007A E90003E9 03750000 30E24689 14C48302 AE16099A 0E76FF10 ..v....Ù..6..Fã=..u.Õ..Õz.6^.&.? 0000A0
88EC4688 0019E903 74FE5639 0021E903 74FC4639 FA5688F8 4688002F E9037500 .u.Õ/..F%.V*9F•t.Õl.9V±t.Õ...F&. 0000C0
FF1076FF FF23E904 E4468300 3FE90003 E90374F2 56390008 E90374F0 4639EE56 VŸ9FÞt.Õ..9V·t.Õ..Õ?..FÕ.Õ#..v.. 0000E0
E9037500 E27E830C 46890E46 89000088 E2468900 00FFFF9A DC76FFDE 76FF0E76 v..v8.vÉ......Fã|...F8.FÉ.~ã.u.Õ 000100
FF0029E9 03750E46 080C4688 000007C7 26065EC4 FEAEE904 F4468300 0FE90003 ..Õ...F¶.ÕÙ±6^.&ú....FÉ.F8u.Õ).. 000120
E9E24688 0006E903 7500E27E 83E04689 000004F0 9ADC76FF DE76FF0E 76FF1076 v..v..v8.vÉ.Þ....FÀ.~ã.u.Õ...FãÕ 000140
9AE876FF EA76FF0E 76FF1076 FF0029E9 0375EA46 08E84688 E24689E0 46880003 ...FÀ.Fã.FÒ.Fõu.Õ)..v..v..vÕ.vÒ. 000160
E9E24688 E24689E0 46880003 E9E24688 0006E903 7500E27E 83E04689 00000479 y....FÀ.~ã.u.Õ...FãÕ...FÀ.Fã.FãÕ 000180
EE468900 00880000 E646C7D8 8E023888 1E565700 001AC800 0CCAC95F 5E1F0000 ...^_èò..à...WV.|;..ÀúF!..|...FŸ 0001A0
0088E846 89EA4689 000088F0 4689F246 89000088 F84689FA 46890000 88EC4689 .F&|...F*.F%|...F·.FÞ|...FÕ.FÒ|. 0001C0
76FF0E76 FF1076FF 000107C7 26065EC4 F44689F6 46890000 88FC4689 FE468900 ..F±.F=|...F-.F¶6^.&ú....v..v..v 0001E0
```

Dump of file SATURN:[PCCOMMON.DUMP.DLL]DAPREDS.TMP;1 on 18-APR-1990 10:42:33.29
File ID (599,29,0) End of file block 49 / Allocated 52

Virtual block number 30 (0000001E), 512 (0200) bytes

```
00EE7E83 0017E903 7400E67E 83E64689 000005C5 9A5016EC 4680036A 0A76FF0C ..v.j..F&.P.é....Fl.-l.t.Õ...-Ÿ. 000000
84E9E646 88000007 C726065E C4000EE9 037701EC 7E830009 E9037E00 1CE9037D ).Õ..-.Õ...-&.w.Õ..6^.&ú....FlÕÇ 000020
00E67E83 E6468900 00005A9A 5016EC46 80066A0A 76FF0C76 FF0E76FF 1076FF02 ..v..v..v..v.j..F&.P.Z....Fl.-l. 000040
26065EC4 000EE903 7701EC7E 830009E9 037E001C E9037D00 EE7E8300 17E90374 t.Õ...-Ÿ.).Õ..-.Õ...-&.w.Õ..6^.& 000060
07089A50 16E84680 0C6A0A76 FF0C76FF 0E76FF10 76FF0268 E9E64688 000007C7 ú....FlÕk..v..v..v..v.j..FÒ.P... 000080
6AE876FF EA76FF0E 76FF1076 FF0242E9 E6468800 06E90375 00003DE6 4[illegible]0000 ...Fl=..u.Õ...FlÕ8..v..v..vÕ.vÒj 0000A0
001CE903 7D00F27E 830017E9 037400E6 7E83E646 89000007 5A9A5016 F04[illegible]013 ..FÞ.P.Z....Fl.-l.t.Õ...-·.).Õ.. 0000C0
FF1076FF 01F9E9E6 46880000 07C72606 5EC4000E E9037701 F07E8300 09E9[illegible]37E -.Õ...-Þ.w.Õ..6^.&ú....FlÕ*..v.. 0000E0
0012E903 7400E67E 83E64689 000006C4 9A5016F8 4680036A E876FFEA 76FF0E76 v..vÕ.vÒj..F%.P.6....Fl.-l.t.Õ.. 000100
0185E9E6 46880000 07C72606 5EC4000E E9037500 FA7E8300 09E90374 01F87E83 .-%.t.Õ...-*.u.Õ..6^.&ú....FlÕç. 000120
7400E67E 83E64689 000007A3 9A5016EC 4680046A E876FFEA 76FF0E76 FF1076FF .v..v..vÕ.vÒj..F&.P.È....Fl.-l.t 000140
46880000 07C72606 5EC4000E E9037500 EE7E8300 09E90374 01EC7E83 0012E903 .Õ...-&.t.Õ...-Ÿ.u.Õ..6^.&ú....F 000160
30E64689 00000731 9A5016FC 4680106A E876FFEA 76FF0E76 FF1076FF 0171E9E6 lÕq..v..v..vÕ.vÒj..F•.P.1....Fl= 000180
5016E846 800E6A0A 76FF0C76 FF0E76FF 1076FF01 48E9E646 880006E9 03750000 ..u.Õ...FlÕH..v..v..v..v.j..FÒ.P 0001A0
FFEA76FF 0E76FF10 76FF011F E9E64688 0006E903 7500003D E6468900 0008289A .+....Fl=..u.Õ...FlÕ...v..v..vÕ. 0001C0
037D00F2 7E830017 E9037400 E67E83E6 46890000 FFFF9A50 16F04680 136AE876 vÒj..FÞ.P......Fl.-l.t.Õ...-·.). 0001E0
```

Dump of file SATURN:[PCCOMMON.DUMP.DLL]DAPREDS.TMP;1 on 18-APR-1990 10:42:33.29
File ID (599,29,0). End of file block 49 / Allocated 52

Virtual block number 31 (0000001F), 512 (0200) bytes

```
FF00D6E9 E6468800 0007C726 065EC400 0EE90377 01F07E83 0009E903 7E001CE9 Õ..-.Õ...-Þ.w.Õ..6^.&ú....FlÕ•.. 000000
037400E6 7E83E646 89000007 E79A5016 F8468003 6AE876FF EA76FF0E 76FF1076 v..v..vÕ.vÒj..F%.P.Ó....Fl.-l.t. 000020
E6468800 0007C726 065EC400 0EE90375 00FA7E83 0009E903 7401F87E 830012E9 Õ...-%.t.Õ...-*.u.Õ..6^.&ú....Fl 000040
7E83E646 89000005 7C9A5016 EC468004 6AE876FF EA76FF0E 76FF1076 FF0092E9 Õ...v..v..vÕ.vÒj..F&.P.|....Fl.- 000060
0007C726 065EC400 0EE90375 00EE7E83 0009E903 7401EC7E 830012E9 037400E6 l.t.Õ...-&.t.Õ...-Ÿ.u.Õ..6^.&ú.. 000080
89000001 169A5016 F4468010 6AE876FF EA76FF0E 76FF1076 FF004EE9 E6468800 ..FlÕN..v..v..vÕ.vÒj..F¶.P...... 0000A0
0EE90374 FE563900 16E90374 FC4639F6 5688F446 880016E9 037400E6 7E83E646 Fl.-l.t.Õ...F¶.V-9F•t.Õ..9V±t.Õ. 0000C0
00000AC8 000CCAC9 5F5E1F00 00E90000 880006E9 E6468800 0007C726 065EC400 .6^.&ú....FlÕ..|..Õ...^_èò..à... 0000E0
C4FC4689 FE468900 0088F846 89FA4689 00008800 00F646C7 D88E0521 881E5657 WV.|!..ÀúF-..|...F*.F%|...F±.F•6 000100
89000009 119A5016 F846800D 6A0A76FF 0C76FF0E 76FF1076 FF000107 C726065E ^.&ú....v..v..v..v.j..F%.P...... 000120
4680036A F876FFFA 76FF0E76 FF1076FF 00A9E9F6 46880006 E9037500 003DF646 F-=..u.Õ...F-Õ`..v..v..v*.v%j..F 000140
C4000EE9 0375FE46 08FC4688 0008E903 7400F67E 83F64689 0000093A 9A5016FC •.P.:....F-.--.t.Õ...F•.F±u.Õ..6 000160
5016F846 800E6A0A 76FF0C76 FF0E76FF 1076FF00 6CE9F646 88000007 C726065E ^.&ú....F-Õl..v..v..v..v.j..F%.P 000180
FFFA76FF 0E76FF10 76FF0043 E9F64688 0006E903 7500003D F6468900 00060E9A .......F-=..u.Õ...F-ÕC..v..v..v*. 0001A0
FE4608FC 46880008 E9037400 F67E83F6 46890000 06809A50 16FC4680 036AF876 v%j..F•.P......F-.--.t.Õ...F•.F± 0001C0
000CCAC9 5F5E1F00 00E90000 880006E9 F6468800 0007C726 065EC400 0EE90375 u.Õ..6^.&ú....F-Õ..|..Õ...^_èò.. 0001E0
```

```
Dump of file SATURN:[PCCOMMON.DUMP.DLL]DAPREDS.TMP;1 on 18-APR-1990 10:42:33.29
File ID (599,29,0)   End of file block 49 / Allocated 52

Virtual block number 32 (00000020), 512 (0200) bytes

07C72606 5EC4FC46 89FE4689 00008800 00FA46C7 D88E0874 B81E5657 000006C8 à...WV.¡t..ÁúF*..¡...F±.F•á^.&ú. 000000
FA7E83FA 46890000 06379A50 16FC468D 136A0A76 FF0C76FF 0E76FF10 76FF0001 ...v..v..v..v.j..F=.P.7....F*.-* 000020
B80006E9 FA4688U0 0007C726 065EC400 0EE90375 FE4608FC 46880008 E9037400 .t.Õ...F•.F±u.Õ..á^.&ú....F*Õ..¡ 000040
F446C700 00F646C7 D88E0978 B81E5657 000014C8 000CCAC9 5F5E1F00 00E90000 ..Õ...^ èò..à...WV.¡x..ÄúF-..úF¶ 000060
000088F0 4689F246 89000088 F84689FA 46890000 B8EC4689 EE468900 00880000 ..¡...FŸ.F&¡...F*.F½¡...F·.Fþ¡.. 000080
16EC468D 106A0A76 FF0C76FF 0E76FF10 76FF0001 07C72606 5EC4FC46 89FE4689 .F±.F•á^.&ú....v..v..v..v.j..F&. 0000A0
EE76FF06 76FF0876 FF0193E9 F6468800 06E90375 00003DF6 46890000 0ADE9A50 P.B....F-=..u.Õ...F-Õ...v..v..vŸ 0000C0
037400F6 7E83F646 8910C483 0B7118AE 9A0E76FF 1076FF0A 76FF0C76 FFEC76FF .v&.v..v..v..v..Õ.q..á..F-.—.t. 0000E0
76FF0C76 FF0E76FF 1076FF01 55E9F646 880006E9 0375003F 8326065E C4000CE9 Õ..á^.&.?.u.Õ...F-ÕU..v..v..v..v 000100
568BF046 8800F5E9 3003E903 75000030 F6468900 0003719A 5016F046 8D136A0A .j..Fþ.P.q....F-=..u.Õ..ÕX..Fþ.V 000120
26F85EC4 0E76FF10 76FF0002 E9037502 470B2607 8826F85E C4FA5689 F84689F2 ·.F½.V*á^½&..&.G.u.Õ0..v..v.á^½& 000140
00B0E900 03E90375 U0003DF6 46890000 0B1E9A50 16FC468D 006A37FF 260277FF .w.&.7j..F•.P......F-=..u.Õ..Õ¯. 000160
26F85EC4 0E76FF10 76FF002A E90374FE 56390032 E90374FC 46390C56 880A4688 .F..V.9F•t.Õ2.9V±t.Õ*..v..v.á^½& 000180
0070E900 03E90375 00003DF6 46890000 08449A50 16FC468D 0E6A37FF 260277FF .w.&.7j..F•.P.D....F-=..u.Õ..Õp. 0001A0
03750000 3DF64689 000008AB 9A5016EC 4680106A FC76FFFE 76FF0E76 FF1076FF .v..v..v±.v•j..F&.P.¨....F-=..u. 0001C0
AE9A0E76 FF1076FF 0A76FF0C 76FFEC76 FFEE76FF 0676FF08 76FF004A E90003E9 Õ..ÕJ..v..v..vŸ.v&.v..v..v..v..Û 0001E0
```

```
Dump of file SATURN:[PCCOMMON.DUMP.DLL]DAPREDS.TMP;1 on 18-APR-1990 10:42:33.29
File ID (599,29,0)   End of file block 49 / Allocated 52

Virtual block number 33 (00000021), 512 (0200) bytes

0FE90003 E9037500 3F832606 5EC4000C E9037400 F67E83F6 468910C4 8303011B .¶..á..F-.~-.t.Õ..á^.&.?.u.Õ..Õ. 000000
76FF1076 FF0029E9 0375F246 08F04688 000007C7 26065EC4 FF1FE904 F8468300 ..F½.Õ..á^.&ú....Fþ.F·u.Õ)..v..v 000020
46880003 E9F64688 0006E903 7500F67E 83F44689 0000048C 9AF076FF F276FF0E ..v·.vþ.¥....F¶.——.u.Õ...F-Õ...F 000040
D446C708 8E09E488 1E565700 003AC800 0CCAC95F 5E1F0000 E9F64688 F64689F4 ¶.F-.F-Õ...^_èò..à:..WV.¡Õ..ÄúFà 000060
000088EC 4689EE46 89000088 F84689FA 46890000 B8000A46 C60000CE 46C70000 ..úFö..óFÕ.¡...F*.F½¡...FŸ.F&¡.. 000080
4689FE46 890000B8 F44689F6 46890000 B8004689 D2468900 0088C646 89C84689 .Fà.Fó¡...F0.FÁ¡...F-.F¶¡...F±.F 0000A0
00E646C7 CA4689CC 46890000 B8064689 D8468900 0088E846 89EA4689 000088FC •¡...Fö.FÒ¡...FÁ.Fø¡...Fä.FòúFÌ. 0000C0
4689E246 890000B8 DC46890E 46890000 B8F04689 F2468900 00880000 E446C700 .úFÕ..¡...F·.Fþ¡...F8.FÊ¡...Fã.F 0000E0
0000119A 50160A46 80066A0A 76FF0C76 FF0E76FF 1076FF00 0107C726 065EC4E0 Áá^.&ú....v..v..v..v.j..FÕ.P.... 000100
46880000 07C72606 5EC4000E E9037558 DA7E8000 09E90374 00047E83 D4468900 ..Fà.-à.t.Õ...~ÕXu.Õ..á^.&ú....F 000120
83044689 000009A6 9A5016F0 4680136A 0A76FF0C 76FF0E76 FF1076FF 0445E9D4 àÕE..v..v..v..v.j..Fþ.P.Ì....Fà. 000140
C4000EE9 037601F0 7E830009 E9037000 1CE9037E 00F27E83 0017E903 7400047E ~à.t.Õ...~·.~.Õ..).Õ...~þ.v.Õ..á 000160
5016F846 8D036A0A 76FF0C76 FF0E76FF 1076FF03 FCE90446 88000007 C726065E ^.&ú....FàÕ=..v..v..v..v.j..F½.P 000180
037500FA 7E830009 E9037401 F87E8300 12E90374 00047E83 D4468900 0000559A .U....Fà.-à.t.Õ...-½.t.Õ...~*.u. 0001A0
80046A0A 76FF0C76 FF0E76FF 1076FF03 B8E90446 88000007 C726065E C4000EE9 Õ..á^.&ú....FàÕ¡..v..v..v..v.j.. 0001C0
7E830009 E9037401 EC7E8300 12E90374 00047E83 D4468900 000E969A 5016EC46 F&.P......Fà.-à.t.Õ...-&.t.Õ...~ 0001E0
```

```
Dump of file SATURN:[PCCOMMON.DUMP.DLL]DAPREDS.TMP;1 on 18-APR-1990 10:42:33.29
File ID (599,29,0)   End of file block 49 / Allocated 52

Virtual block number 34 (00000022), 512 (0200) bytes

76FF0C76 FF0E76FF 1076FF03 74E90446 88000007 C726065E C4000EE9 037500EE Ÿ.u.Õ..á^.&ú....FàÕt..v..v..v..v 000000
76FF034B E9044688 0006E903 7500003D D4468900 000DC29A 5016C646 8D106A0A .j..Fó.P.ò....Fà=..u.Õ...FàÕK..v 000020
06E90375 00003DD4 46890000 0E309A50 16D0468D 0F6AC676 FFC876FF 0E76FF10 ..v..và.vój..FÀ.P.O....Fà=..u.Õ. 000040
8900000A 999A5016 CA46801З 6A0A76FF 0C76FF0E 76FF1076 FF0322E9 D4468800 ..FàÕ"..v..v..v..v.j..Fò.P...... 000060
26078826 D65EC4D8 56890646 89CC5688 CA468802 60E90003 E9037500 003D0446 Fà=..u.Õ..Õm..Fò.Vä.Fø.VÄá^ø&..& 000080
9A5016E8 4680006A 37FF2602 77FF2606 5EC40E76 FF1076FF 0193E903 75024708 .G.u.Õ...v..v.á^ø&.w.&.7j..FÕ.P. 0000A0
0032E903 74E84639 0C56880A 46880228 E90003E9 03750000 30044689 00000E70 p....Fà=..u.Õ..Õ(..F..V.9FÕt.Õ2. 0000C0
9A5016E8 4680E6A 37FF2602 77FF2606 5EC40E76 FF1076FF 002AE903 74EA5639 9VÕt.Õ*..v..v.á^ø&.w.&.7j..FÕ.P. 0000E0
D36AE876 FFEA76FF 0E76FF10 76FF01E8 E90003E9 03750000 30044689 00000A32 2....Fà=..u.Õ..ÕÕ..v..v..vÕ.vÕj. 000100
830009E9 037401F8 7E830012 E9037400 D47E8304 46890000 0ED79A50 16F8468D .F½.P.■....Fà.-à.t.Õ...-½.t.Õ... 000120
6AE876FF EA76FF0E 76FF1076 FF01A7E9 000007C7 26065EC4 0008E903 7500FA7E -*.u.Õ..á^.&ú...ÕÌ..v..v..vÕ.vÕj 000140
0009E903 7401EC7E 830012E9 03740004 7E830446 89000008 D49A5016 EC468004 ..F&.P.à....Fà.-à.t.Õ...-&.t.Õ.. 000160
E876FFEA 76FF0E76 FF1076FF 0166E900 0007C726 065EC400 08E90375 00EE7E83 .~Ÿ.u.Õ..á^.&ú...Õf..v..v..vÕ.vÕ 000180
4639F656 88F44688 002CE903 7400047E 83044689 00000F73 9A5016F4 4680106A j..F¶.P.s....Fà.-à.t.Õ,..F¶.V-9F 0001A0
74F65639 0013E903 74F44639 D25688D0 46880016 E90375C8 56390008 E90374C6 ót.Õ..9Vàu.Õ...FÀ.VØ9F¶t.Õ..9V-t 0001C0
FC46800F 6AF476FF F676FF0E 76FF1076 FF0108E9 000007C7 26065EC4 0008E903 .Õ..á^.&ú...Õ...v..v..v-.v¶j..F• 0001E0
```

Dump of file SATURN:[PCCOMMON.DUMP.DLL]DAPREDS.TMP;1 on 18-APR-1990 10:42:33.29
File ID (599,29,0)   End of file block 49 / Allocated 52

Virtual block number 35 (00000023), 512 (0200) bytes

```
13E90374 C64639FE 5688FC46 880016E9 03740004 7E830446 89000000 999A5016 .P......Få.-å.t.Ö...F=.V±9Fót.Ö. 000000
E6468002 6AFE5EE9 04D64683 00C6E900 0007C726 065EC400 08E90374 C8563900 .9Vàt.Ö..á^.&ú...Öó..F=.Ö^±j..F| 000020
9A000068 1E0E76FF 1076FF00 A5E90003 E9037500 00300446 890000FF FF9A5016 .P......Få=..u.Ö..ÖE..v..v..h... 000040
0E76FF10 76FFE676 FF0001E4 46C70088 E90003E9 03750000 30044689 0000FFFF .....Få=..u.Ö..Ö..úFö...v|.v..v. 000060
E90374BA 81047E81 0012E903 75000030 D4468900 00FFFF9A 016A0A76 FF0C76FF .v..v.j.......Få=..u.Ö...-å.¤t.Ö 000080
0E76FF10 76FFC676 FFC876FF 5016DC46 805016E0 46800050 E9000004 46C70005 ..úFå..ÖP..FÅ.P.FÉ.P.và.vó.v..v. 0000A0
E9037EDE 5639E256 88E04688 001BE903 7400047E 83044689 10C483FF FF20209A .- ...å..Få.-å.t.Ö...FÅ.Vä9V8~.Ö 0000C0
CC460BCA 46880000 E9000007 C726065E C4000BE9 03760C46 390008E9 037D0018 ..).Ö..9FÉv.Ö..á^.&ú...Ö...Fò.Fä 0000E0
E9037500 D47E83°E 46890000 08B89ACA 76FFCC76 FF0E76FF 1076FF00 29E90375 u.Ö)..v..v..vä.vò.|....Fö.-å.u.Ö 000100
890000FF FF9AE¢ 5 FF0020E9 037500E6 7E830446 89CE4688 0003E904 46880006 ...FåÖ...Fö.Få.-|.u.Ö ..v|...... 000120
0023E903 7500E47E 83044689 CE468800 03E90446 880006E9 03750004 7E83CE46 Fö.-å.u.Ö...FåÖ...Fö.Få.-ö.u.Ö#. 000140
CE468800 03E90446 880006E9 03750004 7E83CE46 890000FF FF9A0E76 FF1076FF .v..v.......Fö.-å.u.Ö...FåÖ...Fö 000160
008646C7 D88E08E9 881E5657 000090C8 000CCAC9 5F5E1F00 00E90446 88D44689 .Få.FåÖ...^_èò..à...WV.|Ö..ÄúF.. 000180
7A8689FF 7C868900 0088FF70 8689FF72 86890000 88008C46 C60000FF 7886C700 .ú.x...óF..|....r...p.|....|...± 0001A0
890000B8 EC4689EE 46890000 88FC4689 FE468900 0088F846 89FA4689 000088FF .|...F°.F½|...F±.F=|...FŸ.Få|... 0001C0
F6468900 00880000 9646C700 009C46C7 FF748689 FF768689 00008888 46898A46 F..F.|....v...t.úF...úF...|...F- 0001E0
```

Dump of file SATURN:[PCCOMMON.DUMP.DLL]DAPREDS.TMP;1 on 18-APR-1990 10:42:33.29
File ID (599,29,0)   End of file block 49 / Allocated 52

Virtual block number 36 (00000024), 512 (0200) bytes

```
00889846 899A4689 0000B892 46899446 89000088 8E468990 46890000 88F44689 .F¶|...F..F.|...F..F.|...F..F.|. 000000
C4F04689 F2468900 00880000 9E46C782 46898446 89000088 FF7E8689 80468900 ..F...~.|...F..F.úF...|...F .F▶á 000020
89000014 479A5016 8C468006 6A0A76FF 0C76FF0E 76FF1076 FF000107 C726065E ^.&ú....v..v..v..v.j..F..P.G.... 000040
065EC400 0EE9037> 588C7E80 0017E903 75498C7E 800012E9 03740086 7E838646 F..~..t.Ö...~.Iu.Ö...~.Xu.Ö..á^. 000060
C89A5016 F4468013 6A0A76FF 0C76FF0E 76FF1076 FF0407E9 86468800 0007C726 &ú....F.Ö...v..v..v..v.j..F¶.P.à 000080
F47E8300 09E90370 001CE903 7E00F67E 830017E9 03740086 7E838646 8900000C ....F..~..t.Ö...—.~.Ö..).Ö...~¶ 0000A0
0A76FF0C 76FF0E76 FF1076FF 03BEE986 46880000 07C72606 5EC4000E E9037601 .v.Ö..á^.&ú....F.Öƒ..v..v..v..v. 0000C0
76FF0394 E9864688 0006E903 75000030 86468900 0012859A 5016FF70 8680106A j...p..P......F.=..u.Ö...F.Ö...v 0000E0
75000030 86468900 0012F69A 5016FF7A 86800F6A FF7086FF FF7286FF 0E76FF10 ..v..Ñr..Ñp.j...z..P.-....F.=..u 000100
E89A5016 FF74868D 136A0A76 FF0C76FF 0E76FF10 76FF0368 E9864688 0006E903 .Ö...F.Öh..v..v..v..v.j...t..P.$ 000120
C48A5689 884689FF 769688FF 74868802 A8E90003 E9037500 00308646 89000000 ....F.=..u.Ö..Ö´...t...v..F..V.á 000140
006A37FF 260277FF 26885EC4 0E76FF10 76FF0117 E9037502 470B2607 8826885E ^.&..&.G.u.Ö...v..v.á^.&.w.&.7j. 000160
46390C56 880A4688 0261E900 03E90375 00003086 46890000 13369A50 16EC4680 .F&.P.6....F.=..u.Ö..Öa..F..V.9F 000180
0E6A37FF 260277FF 26885EC4 0E76FF10 76FF002A E90374EE 56390032 E90374EC &t.Ö2.9VŸt.Ö°..v..v.á^.&.w.&.7j. 0001A0
76FF0E76 FF1076FF 0221E900 03E90375 00003086 46890000 135C9A50 16EC4680 .F&.P.\....F.=..u.Ö..Ö|..v..v..v 0001C0
88F84688 0030E903 7400867E 83864689 0000138B 9A5016F8 4680106A EC76FFEE Ÿ.v&j..F½.P.£....F..~..t.ÖÖ..F½. 0001E0
```

Dump of file SATURN:[PCCOMMON.DUMP.DLL]DAPREDS.TMP;1 on 18-APR-1990 10:42:33.29
File ID (599,29,0)   End of file block 49 / Allocated 52

Virtual block number 37 (00000025), 512 (0200) bytes

```
74F84639 FF7C9688 FF7A8688 0018E903 75FF7296 390009E9 0374FF70 8639FA56 V°9.p.t.Ö..9.r.u.Ö....z...|.9F½t 000000
FA76FF0E 76FF1076 FF01C2E9 000007C7 26065EC4 000BE903 74FA5639 0013E903 .Ö..9V°t.Ö..á^.&ú...Öö..v..v..v° 000020
5688FC46 880018E9 03740086 7E838646 8900000F 189A5016 FC46800F 6AF876FF .V½j..F=.P......F..~..t.Ö...F=.V 000040
4683017B E9000007 C726065E C4000BE9 0374FF72 96390014 E90374FF 708639FE ±9.p.t.Ö..9.r.t.Ö..á^.&ú...Ö(..F 000060
FF015AE9 0003E903 75000030 86468900 000F839A 50169C46 80026AFE DAE90488 ..Öö±j..F..P.°....F.=..u.Ö..Ö2.. 000080
019646C7 0130E900 03E90375 00003086 46890000 0FD09A00 28681E0E 76FF1076 v..v..h(..Å....F.=..u.Ö..Ö=.úF.. 0000A0
00308646 8900000C 809A5016 A0468002 6AFF7086 FFFF7286 FF0E76FF 1076FF00 ..v..v..Ñr..Ñp.j..F..P......F.=. 0000C0
0000FFFF 9A016A50 16A0468D 50169846 800E76FF 1076FF01 10E90003 E9037500 .u.Ö..Ö...v..v..F..P.F..Pj...... 0000E0
30864689 0000FFFF 9A5016FF 7E86809C 76FF00EB E90003E9 03750000 30864689 .F.=..u.Ö..ÖS..v...-..P......F.= 000100
7086FFFF 7286FF0E 76FF1076 FF0E76FF 1076FF9C 76FF00CF E90003E9 03750000 ..u.Ö..Öu..v..v..v..v..v..Ñr..Ñp 000120
46805016 9E468050 1¢524680 FF7EB6FF 8076FF0A 76FF0C76 FF9876FF 9A76FFFF ..v..v..v..v..v..Ñ-..F..P.F..P.F 000140
FF0E76FF 1076FF9C 76FF0083 E90003E9 03750000 30864689 0000FFFF 9·5016F0 ▶.P......F.=..u.Ö..Ö...v..v..v.. 000160
05E90374 8A81867E 810012E9 03750000 30864689 00000FF9 9A016A82 76⊦ 9476 v..v.j..°....F.=..u.Ö...-..¤t.Ö. 000180
9A0E76FF 1076FF98 76FF9A76 FF50168E 46805016 92468000 50E90000 8646.700 .úF...ÖP..F..P.F..P.v..v..v..v.. 0001A0
18E9037E 90563994 56889246 88001BE9 03740086 7E838646 8910C483 10332020 - 3..á..F..~..t.Ö...F..V.9V.-.Ö. 0001C0
76860BFF 74868800 00E90000 07C72606 5EC4000B E903768E 46390008 E9037D00 .).Ö..9F.v.Ö..á^.&ú...Ö....t...v 0001E0
```

```
Dump of file SATURN:[PCCOMMON.DUMP.DLL]DAPREDS.TMP;1 on 18-APR-1990 10:42:33.29
File ID (599,29,0)   End of file block 49 / Allocated 52

Virtual block number 38 (00000026), 512 (0200) bytes

867E83FF 78868900 0010829A FF7486FF FF7686FF 0E76FF10 76FF002D E90375FF .u.Õ·..v..v..Åv..Åt........x..~. 000000
9A9C76FF 0022E9)3 75009C7E 83864689 FF788688 0004E986 46880006 E9037500 .u.Õ...F.Õ....x..F..~..u.Õ"..v.. 000020
7E838646 89FF7886 880004E9 86468800 06E90375 00867E83 FF788689 000010A8 "......x..-..u.Õ...F.Õ....x..F..- 000040
880006E9 03750086 7E83FF78 86890000 10079A0E 76FF1076 FF0025E9 03750096 ..u.Õ%..v..v..■.....x..-..u.Õ... 000060
1E565700 0012C800 0CCAC95F 5E1F0000 E9864688 864689FF 78868800 04E98646 F.Õ....x..F..F.Õ...^_èò..à...WV. 000080
89000088 F04689F2 46890000 88F84689 FA468900 00880000 EE46C7D8 8E110888 ¡...ÄúFŸ..¡...F'.F%¡...F·.FÞ¡... 0000A0
FF0C76FF 0676FF08 76FF0001 07C72616 5EC4FC46 89FE4689 000088F4 4689F646 F-.F¶¡...F±.F•á^.&ú....v..v..v.. 0000C0
FF023AE9 EE468800 06E90375 00003DEE 46890000 16839A50 16F8468D 036A0A76 v.j..F%.P......FŸ=..u.Õ...FŸÕ:.. 0000E0
037400EE 7E83EE46 89000011 C89A5016 F0468006 6A0A76FF 0C76FF06 76FF0876 v..v..v..v.j..FÞ.P.ù....FŸ.-Ÿ.t. 000100
037E00F2 7E830017 E9037701 F87E8300 09E9037E 0025E903 7D00FA7E 83005CE9 Õ\..-'.).Õ%.~.Õ...-%.w.Õ...~·.~. 000120
830009E9 037D0033 E9037E00 FA7E8300 2EE90376 01F07E83 0009E903 7D003CE9 Õ<.).Õ...-Þ.v.Õ...-'.-.Õ3.).Õ... 000140
C4000EE9 037601F0 7E830009 E9037D00 1CE9037E 00F27E83 0025E903 7601F87E -%.v.Õ%..-·.-.Õ..).Õ...-Þ.v.Õ..á 000160
5016F446 8D006A0A 76FF0C76 FF0676FF 0876FF01 ACE9EE46 88000007 C726165E ^.&ú....FŸÕ¯..v..v..v..v.j..F¶.P 000180
FFF676FF 0676FF08 76FF0183 E9EE4688 0006E903 7500003D EE468900 0017989A ......FŸ=..u.Õ...FŸÕ...v..v..v-. 0001A0
037D00FE 7E830017 E9037400 EE7E83EE 46890000 18009A50 16FC468D 136AF476 v¶j..F•.P......FŸ.-Ÿ.t.Õ...-±.). 0001C0
83013AE9 EE468800 0007C726 165EC400 0EE90377 01FC7E83 0009E903 7E001CE9 Õ..-.Õ...-•.w.Õ..á^.&ú....FŸÕ:.. 0001E0

Dump of file SATURN:[PCCOMMON.DUMP.DLL]DAPREDS.TMP;1 on 18-APR-1990 10:42:33.29
File ID (599,29,0)   End of file block 49 / Allocated 52

Virtual block number 39 (00000027), 512 (0200) bytes

FFF676FF 0676FF08 76FF001F E9037601 F07E8300 09E9037D 002DE903 7E00F27E -·.-.Õ-.).Õ...-Þ.v.Õ...v..v..v-. 000000
76FFF676 FF0676FF 0876FF00 1CE9EE46 89000017 BA9A0E76 FF1076FF 106AF476 v¶j..v..v..□....FŸÕ...v..v..v-.v 000020
0009E9EE 46880006 E9037500 EE7E83EE 46890000 17E49A12 76FF1476 FF106AF4 ¶j..v..v..Õ....FŸ.-Ÿ.u.Õ...FŸÕ1. 000040
03750000 3DEE4689 0000186E 9A5016F4 468D0E6A 0A76FF0C 76FF0676 FF0876FF .v..v..v..v.j..F¶.P.n....FŸ=..u. 000060
00120F9A 5016FC46 80136AF4 76FFF676 FF0676FF 0876FF00 B0E9EE46 880006E9 Õ...FŸÕ¯..v..v..v-.v¶j..F•.P.... 000080
7701FC7E 830009E9 037E001C E9037D00 FE7E8300 17E90374 00EE7E83 EE468900 ..FŸ.-Ÿ.t.Õ...-±.).Õ..-.Õ...-•.w 0000A0
0009E903 7D002DE9 037E00FA 7E830067 E9EE4688 000007C7 26165EC4 000EE903 .Õ..á^.&ú....FŸÕg..-'.-.Õ·.).Õ.. 0000C0
18809A0E 76FF1076 FF106AF4 76FFF676 FF0676FF 0876FF00 1FE90376 01F87E83 .-%.v.Õ...v..v..v-.v¶j..v..v.... 0000E0
0012599A 1276FF14 76FF106A F476FFF6 76FF0676 FF0876FF 001CE9EE 46890000 ...FŸÕ...v..v..v-.v¶j..v..v..Ÿ.. 000100
9AC8CBC9 5F5E1F00 00E90000 880006E9 EE468800 06E90375 00EE7E83 EE468900 ..FŸ.-Ÿ.u.Õ...FŸÕ..¡..Õ...^_èùà. 000120
66868D02 6A0A76FF 0C76FF06 76FF0876 FF0000B2 46C7088E 1611881E 56570000 ..WV.¡...ÁúFý...v..v..v..v.j...f 000140
FF0676FF 0876FF00 5DE98246 880006E9 03750000 3D824689 000018FD 9A5016FF ..P.»....Fý=..u.Õ...FýÕ]..v..v.. 000160
E982468B 0006E903 75000030 B2468900 00165A9A 5016B446 8D026A0E 76FF1076 v..v.j..FÇ.P.Z....Fý=..u.Õ...FýÕ 000180
125EC400 0BE90375 00003008 C483FFFF 00009A50 16FF6686 8D501684 46800034 4..FÇ.P..f..P......á.=..u.Õ..á^. 0001A0
00020011 90CBC95F 5E1F0000 E9000088 000107C7 26125EC4 0008E900 0007C726 &ú...Õ..á^.&ú...¡..Õ...^_èù..... 0001C0
00020088 000213F0 U2030005 0001141A 02030000 00030A62 00020000 00011532 2.......b................»....... 0001E0

Dump of file SATURN:[PCCOMMON.DUMP.DLL]DAPREDS.TMP;1 on 18-APR-1990 10:42:33.29
File ID (599,29,0)   End of file block 49 / Allocated 52

Virtual block number 40 (00000028), 512 (0200) bytes

02030025 0001173A 02030099 000215B0 02030000 000A1886 00020000 00091920  .......Å.......¯.......:...X... 000000
02030041 000112AF 0203018F 000714F8 0203011C 0004146C 02030033 000118D4 å...3...l........%.......£...A... 000020
0203014D 000514B8 02030141 000514D4 0203005A 00011585 0203004D 00011711 ....M.......Z...å...A.......M... 000040
00F446C7 D88EFFFF 881E5657 000012C8 00000000 00000000 00000074 000115DE B...t...........à...WV.¡...ÄúF¶. 000060
4689FA46 890000B8 FC4689FE 46890000 88EE4689 F0468900 00880000 F246C700 .úF·..¡...FÞ.FŸ¡...F±.F•¡...F'.F 000080
16EE468D 066A0A76 FF0C76FF 0E76FF10 76FF0001 07C72606 5EC40000 F646C7F8 %úF-..á^.&ú....v..v..v..v.j..FŸ. 0000A0
065EC400 0EE90374 F0460BEE 4688000B E9037400 F47E83F4 46890000 FFFF9A50 P......F¶.-¶.t.Õ...FŸ.FÞt.Õ..á^. 0000C0
FF9A5016 F8468013 6AEE76FF F076FF0E 76FF1076 FF0121E9 F4468800 0007C726 &ú....F¶Õ1..v..v..vÞ.vŸj..F%.P.. 0000E0
FC5EC4FE 5689FC46 89FA5688 F8468800 C1E90003 E9037500 0030F446 890000FF ....F¶=..u.Õ..Õè..F%.V'.F•.V±á^• 000100
57392600 10E90374 0739260C 56880A46 88FC5EC4 009EE903 7502470B 26078826 &..&.G.u.Õ..á^•.F..V.&9.t.Õ..&9W 000120
FF0C76FF 37FF2602 77FF26FC 5EC45016 F6468DFF D0E904FC 46830007 E9037402 .t.Õ...F•.ÕÅ..F-.Pá^•&.w.&.7.v.. 000140
00F67E83 0009E903 7400F47E 83F44689 10C48301 3605359A 0E76FF10 76FF0A76 v..v..v..5.6..á..F¶.-¶.t.Õ...--. 000160
1076FF37 FF260277 FF26FC5E C40A76FF 0C76FF50 16F6468D 004AE900 03E90375 u.Õ..ÕJ..F-.P.v..v.á^•&.w.&.7.v. 000180
0003E903 7500F67E 830009E9 037400F4 7E83F446 8910C483 FFFF0535 9A0E76FF .v..5....á..F¶.-¶.t.Õ...--.u.Õ.. 0001A0
1076FF00 29E90375 FA460BF8 46880000 07C72606 5EC4FF53 E904FC46 83000FE9 Õ...F•.ÕS.á^.&ú....F%.F'u.Õ)..v. 0001C0
0003E9F4 46880006 E9037500 F47E83F2 46890000 FFFF9AF8 76FFFA76 FF0E76FF .v..v'.v%......F·.-¶.u.Õ...F¶Õ.. 0001E0
```

```
Dump of file SATURN:[PCCOMMON.DUMP.DLL]DAPREDS.TMP;1 on 18-APR-1990 10:42:33.29
File ID (599,29,0)   End of file block 49 / Allocated 52

Virtual block number 41 (00000029), 512 (0200) bytes

C7D88E00 08881E56 5700000E C8000CCA C95F5E1F 0000E9F4 4688F446 89F24688 .F·.F¶.F¶Ö...^_èb..å...WV.¡...Äú 000000
C4F84689 FA468900 0088F446 89F64689 000088FC 4689FE46 89000088 0000F246 F·..¡...Fz.F•¡...F-.F¶¡...F•.F¼á 000020
89000002 289A5C16 FC468D09 6A0A76FF 0C76FF0E 76FF1076 FF000107 C726065E ^.&ú....v..v..v..v.j..F•.P.(.... 000040
46880000 07C72606 5EC4000E E90374FE 4608FC46 88000BE9 037400F2 7E83F246 F·.-·.t.Ö...F•.Fzt.Ö..á^.&ú....F 000060
83F24689 0000FFFF 9A5016F4 4680086A 0A76FF0C 76FF0E76 FF1076FF 0094E9F2 ·Ö...v..v..v..v.j..F¶.P......F·. 000080
08E9037D 0018E903 7E00FA83 F65613F4 4603FE56 88FC4688 0021E903 7400F27E ~·.t.Ö¡..F•.Vz.F¶.V-.•.-.Ö..).Ö. 0000A0
0C76FF0E 76FF1076 FF0041E9 F2468800 0007C726 065EC400 0EE90372 00023000 .•..r.Ö..á^.&ú....F·ÖA..v..v..v. 0000C0
74FA4608 F8468800 08E90374 00F27E83 F2468900 FB08CC9A 5016F846 800A76FF .v..F½.P.ä.«..F·.-·.t.Ö...F½.F•t 0000E0
C8000CCA C95F5E1F 0000E900 00880006 E9F24688 000007C7 26065EC4 000EE903 .Ö..á^.&ú....F·Ö..¡..Ö...^_èb..å 000100
0088F846 89FA4689 0000B800 00E846C7 0000EA46 C7D88E01 A8881E56 57000018 ...WV.¡¨..ÄúFð..úFÖ..¡...F¯.F½¡. 000120
89FE4689 000088F4 4689F646 89000088 EC4689EE 46890000 88F04689 F2468900 ..F·.FÞ¡...FŸ.F&¡...F-.F¶¡...Fz. 000140
03489A50 16F84680 086A0A76 FF0C76FF 0E76FF10 76FF0001 07C72606 5EC4FC46 F•á^.&ú....v..v..v..v.j..F½.P.K. 000160
0007C726 065EC400 0EE90375 FA4608F8 46880008 E9037400 EA7E83EA 4685000 ...Fð.-ð.t.Ö...F½.F•u.Ö..á^.&ú.. 000180
89000003 899A5016 F8468D09 6A0A76FF 0C76FF0E 76FF1076 FF01F7E9 EA468800 ..FðÖ%..v..v..v..v.j..F½.P.¿.... 0001A0
065EC400 0EE90375 00FA7E83 0009E903 7401F87E 830012E9 037400EA 7E83EA46 Fð.-ð.t.Ö...-½.t.Ö...-•.u.Ö..á^. 0001C0
FE9A5016 F0468D09 6A0A76FF 0C76FF0E 76FF1076 FF0183E9 EA468800 0007C726 &ú....FðÖ°..v..v..v..v.j..FÞ.P.z 0001E0

Dump of file SATURN:[PCCOMMON.DUMP.DLL]DAPREDS.TMP;1 on 18-APR-1990 10:42:33.29
File ID (599,29,0)   End of file block 49 / Allocated 52

Virtual block number 42 (0000002A), 512 (0200) bytes

FF260277 FF26F05E C40E76FF 1076FF01 1FE90003 E9037500 003DEA46 89000003 ....Fõ=..u.Ö..Ö...v..v.á^Þ&.w.&. 000000
E9037401 F87E8300 12E90374 00EA7E83 EA468900 0001E89A 5016F846 8D136A37 7j..F½.P.Š....Fð.-ð.t.Ö...-½.t.Ö 000020
26F05EC4 0E76FF10 76FF000A E9000007 C726065E C4000BE9 037500FA 7E830009 ...-•.u.Ö..á^.&ú...ÖÖ..v..v.á^Þ& 000040
0080E900 03E90375 00003DEA 46890000 008F9A50 16EC4680 136A37FF 260277FF .w.&.7j..F&.P......Fð=..u.Ö..Ö¯. 000060
3DEA4689 00000052 9A5016F4 4680006A 37FF2602 77FF26EC 5EC40E76 FF1076FF .v..v.á^š&.w.&.7j..F¶.P.R....Fð= 000080
74025739 26002BE9 03740739 26F65688 F44688F0 5EC40086 E90003E9 03750000 ..u.Ö..Ö..á^Þ.F¶.V-&9.t.Ö+.&9w.t 0000A0
0000048E 9A5016FC 4680066A 37FF2602 77FF26EC 5EC40E76 FF1076FF 0022E903 .Ö"..v..v.á^š&.w.&.7j..F•.P..... 0000C0
FFFF9A50 16FC4680 036A37FF 260277FF 26EC5EC4 0E76FF10 76FF001F E9EA4689 .FðÖ...v..v.á^š&.w.&.7j..F•.P... 0000E0
01FC7E83 0009E903 7D0019E9 037E00FE 7E830017 E9037400 EA7E83EA 46890000 ...Fð.-ð.t.Ö...-z.-.Ö..).Ö...-•. 000100
76FF1076 FF0029E9 0375F246 08F04688 0000E900 0007C726 065EC400 08E90376 v.Ö..á^.&ú...Ö...FÞ.F·u.Ö)..v..v 000120
46880003 E9EA4688 0006E903 7500EA7E 83E84689 0000050C 9AF076FF F276FF0E ..v·.vÞ......FÖ.-ð.u.Ö...FðÖ...F 000140
0000017A 9AEC76FF EE76FF0E 76FF1076 FF0029E9 0375EE46 08EC4688 EA4689E8 Ö.Fð.F$.FŸu.Ö)..v..v..vŸ.v$.z... 000160
5E1F0000 E9EA4688 EA4689E8 46880003 E9EA4688 0006E903 7500EA7E 83E84689 .FÖ.-ð.u.Ö...FðÖ...FÖ.Fð.FðÖ...^ 000180
0000E446 C70000E0 46C70000 E246C708 8E02B7B8 1E565700 0020C800 0CCAC95F _èb..å ..WV.¡ñ..ÄúFä..úFÅ..úFÖ.. 0001A0
46890000 88F64689 F8468900 0088EA46 89EC4689 000088F2 4689F446 89000088 ¡...F¶.F·¡...F&.Fð¡...F½.F-¡...F 0001C0
C726125E C40000FE 46C7FA46 89FC4689 000088EE 4689F046 89000088 E64689E8 Ö.F¡¡...FÞ.FŸ¡...F•.F•úFz..á^.&ú 0001E0

Dump of file SATURN:[PCCOMMON.DUMP.DLL]DAPREDS.TMP;1 on 18-APR-1990 10:42:33.29
File ID (599,29,0)   End of file block 49 / Allocated 52

Virtual block number 43 (0000002B), 512 (0200) bytes

E476FF02 83E90003 E9037500 0030E246 890000FF FF9A5016 E4468D02 6A000107 ...j..Fð.P......Fã=..u.Ö..Ö...vð 000000
76FF0676 FF0876FF 0268E900 03E90375 00003DE2 46890000 FFFF9A50 16F24680 .F·.P......Fã=..u.Ö..Öh..v..v..v 000020
46880242 E90003E9 03750000 3DE24689 0000066F 9A5016EA 4680086A 0A76FF0C ..v.j..Fð.P.o....Fã=..u.Ö..ÖB..F 000040
5EC45016 F2468D00 29E90375 02470B26 07B826F6 5EC4F856 89F64689 EC5688EA ð.V$.F-.V½á^-&..&.G.u.Ö)..F·.Pá^ 000060
E904F646 830205E9 0003E903 75000030 E2468900 0006AC9A 37FF2602 77FF26F6 -&.w.&.7.¯....Fã=..u.Ö..Ö...F-.Ö 000080
83EA4689 EC468900 0088E246 89000006 D29AEA76 FFEC76FF 0676FF08 76FFFFC8 å..v..v..v$.vð.•....Fã¡...F$.Fð. 0000A0
029A5016 E6468D09 6A0A76FF 0C76FF06 76FF0876 FF01D5E9 0003E903 7500E27E ~ã.u.Ö..Ö(..v..v..v..v.j..F|.P.. 0000C0
EE5EC4F0 5689EE46 89E85688 E64688C1 AFE90003 E9037500 0030E246 89000007 ....Fã=..u.Ö..ÖE..F|.VÖ.FŸ.VÞá^Ÿ 0000E0
0000FFFF 9A37FF26 0277FF26 EE5EC450 16F24680 0029E903 75024708 26078826 &..&.G.u.Ö)..F·.Pá^Ÿ&.w.&.7..... 000100
76FFEB76 FF0676FF 0876FFFF C8E904EE 46830172 E90003E9 03750000 30E24689 .Fã=..u.Ö..Ör..FŸ.ÖA..v..v..vÖ.v 000120
76FF0142 E90003E9 037500E2 7E83E646 89E84689 000088E2 46890000 04D89AE6 |.Ä....Fã¡...FÖ.F|.-ã.u.Ö..ÖB..v 000140
03E90375 00003DE2 46890000 079F9A50 16EA4680 086A0E76 FF1076FF 0676FF08 ..v..v..v.j..Fõ.P......Fã=..u.Ö. 000160
80005CE9 03750247 08260788 26F65EC4 F85689F6 4689EC56 88EA4688 011CE900 .Ö...Fõ.V$.F-.V½á^-&..&.G.u.Ö\.. 000180
30E24689 000007E5 9A5016FA 4680016A 006A37FF 260277FF 26F65EC4 5016F246 F·.Pá^-&.w.&.7j.j..F•.P.|....Fã= 0001A0
00003DE2 46890000 08039A50 16FE4680 F276FFF4 76FF0006 E90003E9 03750000 ..u.Ö..Ö•..v¶.v·.Fz.P......Fã=.. 0001C0
76FF0876 FFFF95E9 04F64683 00ACE900 03E90375 00FE7E83 0088E900 03E90375 u.Ö..Ö¡..~z.u.Ö..Ö¯..F-.Ö...v..v 0001E0
```

```
Dump of file SATURN:[PCCOMMON.DUMP.DLL]DAPREDS.TMP;1 on 18-APR-1990 10:42:33.29
File ID (599,29,0)   End of file block 49 / Allocated 52

Virtual block number 44 (0000002C), 512 (0200) bytes

 7FE90003 E9037500 003DE246 89000003 8F9A5016 E6468D09 6A0E76FF 1076FF06 ..v..v.j..F|.P......Fã=..u.Õ..Õ. 000000
 16F2468D 005CE903 75024708 26078826 EE5EC4F0 5689EE46 89E85688 E6468800 ..F|.VÒ.FŸ.Vþá^Ÿ&..&.G.u.Õ\..F·. 000020
 7500003D E2468900 00FFFF9A 5016FA46 8D006A00 6A37FF26 0277FF26 EE5EC450 Pá^Ÿ&.w.&.7j.j..F".P......Fã*..u 000040
 E9037500 003DE246 890000FF FF9A5016 FE468DF2 76FFF476 FF0039E9 0003E903 .Õ..Õ9..v¶.v·.F±.P......Fã=..u.Õ 000060
 000007C7 26125EC4 FF95E904 EE468300 0FE90003 E9037500 FE7E8300 18E90003 ..Õ...-±.u.Õ..Õ...FŸ.Õ..á^.&ú... 000080
 E2468800 06E90375 00E27E83 E0468900 00FFFF9A E476FF00 20E90375 00E47E83 .-ã.u.Õ ..vã......FÂ.-ã.u.Õ...Fã 0000A0
 EA76FFEC 76FF0676 FF0876FF 0029E903 75EC4608 EA4688E2 4689E046 880003E9 Õ...FÂ.Fã.Fõ.F$u.Õ)..v..v..v$.võ 0000C0
 E64688E2 4689E046 880003E9 E2468800 06E90375 00E27E83 E2468900 0008A59A .É....Fã.-ã.u.Õ...FãÕ...FÂ.Fã.F| 0000E0
 00E27E83 E2468900 00063F9A E676FFE8 76FF0676 FF0876FF 0029E903 75E84608 .FÒu.Õ)..v..v..vÒ.v|.?....Fã.-ã. 000100
 000020C8 CBC95F5E 1F0000E9 E24688E2 4689E046 880003E9 E2468800 06E90375 u.Õ...FãÕ...FÂ.Fã.FãÕ...^_èùà .. 000120
 46890000 88F04689 F2468900 00880000 E446C700 00E646C7 D88E0530 881E5657 WV.¡=..ÃúF|..úFÕ..¡...F·.Fþ¡...F 000140
 88F44689 F6468900 0088E046 89E24689 000088E8 4689EA46 89000088 EC4689EE Ÿ.F$¡...Fõ.FÒ¡...Fã.FÂ¡...F-.F¶¡ 000160
 76FF0789 26024789 26000088 065EC4FC 4689FE46 89000088 F84689FA 46890000 ...F".F½¡...F±.F=á^.¡..&.G.&...v 000180
 03E90375 00003DE6 46890000 09CF9A50 16EC468D 096A0A76 FF0C76FF 0E76FF10 ..v..v..v.j..F$.P.ü....F|=..u.Õ. 0001A0
 FF017FE9 03750247 08260788 26F05EC4 F25689F0 4689EE56 88EC4688 019AE900 .Õ...F$.VŸ.Fþ.V·á^þ&..&.G.u.Õ... 0001C0
 003DE646 8900000A 7E9A5016 FC468D03 6A37FF26 0277FF26 F05EC40E 76FF1076 v..v.á^þ&.w.&.7j..F•.P.-....F|=. 0001E0

Dump of file SATURN:[PCCOMMON.DUMP.DLL]DAPREDS.TMP;1 on 18-APR-1990 10:42:33.29
File ID (599,29,0)   End of file block 49 / Allocated 52

Virtual block number 45 (0000002D), 512 (0200) bytes

 0007E903 7600FC7E 830009E9 037D0015 E9037E00 FE7E8301 55E90003 E9037500 .u.Õ..ÕU..-±.-.Õ..).Õ...-•.v.Õ.. 000000
 DC9A5016 E0468D13 6A37FF26 0277FF26 F05EC40E 76FF1076 FFFFA9E9 04F04683 .Fþ.Õ`..v..v.á^þ&.w.&.7j..FÂ.P.É 000020
 E85EC4EA 5689E846 89E25688 E0468801 00E90003 E9037500 003DE646 890C 005 ....F|=..u.Õ..Õ...FÂ.Vã.FÒ.VÒá^Ò 000040
 4680006A 37FF2602 77FF26E8 5EC40E76 FF1076FF 00C2E903 75024708 2607C 26 &..&.G.u.Õò..v..v.á^Õ&.w.&.7j..F 000060
 26F6568B F44688F0 5EC400C8 E90003E9 03750000 30E64689 00000A58 9A5016F4 ¶.P.X....F|=..u.Õ..Õà.á^þ.F¶.V-& 000080
 37FF2602 77FF26E8 5EC40E76 FF1076FF 002AE903 74025739 260033E9 03740739 9.t.Õ3.&9W.t.Õ*..v..v.á^Õ&.w.&.7 0000A0
 0E76FF10 76FF0084 E90003E9 03750000 30E64689 00000428 9A5016F4 4680E6A j..F¶.P.(....F|=..u.Õ..Õ...v..v. 0000C0
 7E830012 E9037400 E67E83E6 46890000 046C9A50 16F8468D 046AF476 FFF676FF .v-.v¶j..F½.P.l....F|.-|.t.Õ...- 0000E0
 07892606 5EC40257 88260788 26F05EC4 0017E903 7400FA7E 830020E9 037401F8 ½.t.Õ ..-".t.Õ..á^þ&..&.W.á^.&.. 000100
 89000008 719AE076 FFE276FF 0E76FF10 76FFFF2F E904E846 830037E9 02578926 &.W.Õ7..FÒ.Õ/..v..v..vã.vÂ.g.... 000120
 4688FE72 E904F046 830007E9 0003E903 7500E67E 83E04689 E2468900 0088E646 F|¡...Fã.FÂ.-|.u.Õ..Õ...Fþ.Õr±.F 000140
 E67E83E4 46890000 083A9AE0 76FFE276 FF0E76FF 1076FF00 29E90375 E24608E0 Â.Fãu.Õ)..v..v..vã.vÂ.:....FÕ.-| 000160
 1076FF00 29E90375 EE4608EC 4688E646 89E44688 0003E9E6 46880006 E9037500 .u.Õ...F|Õ...FÕ.F|.F$.FŸu.Õ)..v. 000180
 0003E9E6 46880006 E9037500 E67E83E4 46890000 0ACB9AEC 76FFEE76 FF0E76FF .v..vŸ.v$.ù....FÕ.-|.u.Õ...F|Õ.. 0001A0
 000200F0 00030748 02030000 90000CCA C95F5E1F 0000E9E6 4688E646 89E44688 .FÕ.F|.F|Õ...^_èò.......N...þ... 0001C0
 0002010C 00030766 02030088 0002059B 020300FF 00030619 02030000 00040278 (.........................f....... 0001E0

Dump of file SATURN:[PCCOMMON.DUMP.DLL]DAPREDS.TMP;1 on 18-APR-1990 10:42:33.29
File ID (599,29,0)   End of file block 49 / Allocated 52

Virtual block number 46 (0000002E), 512 (0200) bytes

 02030033 00010987 02030025 0001030E 02030099 0002083D 02030000 000A08D4 å.......=...........%.......3... 000000
 000000E5 00030586 0203005A 00010806 0203004D 00010A14 02030041 00010942 B...A.......M.......Z...Ñ...!... 000020
 5EC400FA 46C6FC46 89FE4689 00008800 00F846C7 D88EFFFF 881E5657 000008C8 à...WV.¡...ÃúF½..¡...F±.F=óF".á^ 000040
 46890000 FFFF9A50 16FC468D 136A0A76 FF0C76FF 0E76FF10 76FF0001 07C72606 .&ú....v..v..v..v.j..F=.P......F 000060
 F8468800 0007C726 065EC400 0EE90375 FE4608FC 46880008 E9037400 F87E83F8 ½.-½.t.Õ...F•.F±u.Õ..á^.&ú....F½ 000080
 7E83F846 890000FF FF9A5016 FA468D09 6A0A76FF 0C76FF0E 76FF1076 FF0041E9 ÕA..v..v..v..v.j..F".P......F½.- 0000A0
 00880006 E9F8468B 000007C7 26065EC4 000EE903 7543FA7E 800009E9 037400F8 ½.t.Õ...-"Cu.Õ..á^.&ú....F½Õ..¡. 0000C0
 89000088 0000F846 C7D88E00 08881E56 57000008 C8000CCA C95F5E1F 0000E900 .Õ...^_èò..à...WV.¡...ÃúF½..¡... 0000E0
 046A0A76 FF0C76FF 0E76FF10 76FF0001 07C72606 5EC40000 FE46C7FA 4689FC46 F=.F"úF±..á^.&ú....v..v..v..v.j. 000100
 76FF1076 FF004AE9 F8468800 06E90375 00003DF8 46890000 FFFF9A50 16FA468D .F".P......F½=..u.Õ...F½ÕJ..v..v 000120
 FE7E8300 14E90374 00F87E83 F8468900 00FFFF9A 5016FE46 8DFA76FF FC76FF0E ..v•.v".F±.P......F½.-½.t.Õ...-± 000140
 880006E9 F8468800 0007C726 065EC400 0EE90375 FC4608FA 46880019 E9037406 .t.Õ...F".F•u.Õ..á^.&ú....F½Õ..¡ 000160
 00008800 00F646C7 D88E0083 881E5657 00000AC8 000CCAC9 5F5E1F00 00E90000 ..Õ...^_èò..à...WV.¡°..ÃúF-..¡.. 000180
 0C76FF0E 76FF1076 FF000107 C726065E C4F84689 FA468900 0088FC46 89FE4689 .F±.F=¡...F".F½á^.&ú....v..v..v. 0001A0
 4608FC46 88000BE9 037400F6 7E83F646 89000000 3A9A5016 FC468013 6A0A76FF .v.j..F=.P.:....F-.--.t.Õ...F=.F 0001C0
 0A76FF0C 76FF0E76 FF1076FF 0043E9F6 46880000 07C72606 5EC4000E E90375FE ±u.Õ..á^.&ú....F-ÕC..v..v..v..v. 0001E0
```

```
Dump of file SATURN:[PCCOMMON.DUMP.DLL]DAPREDS.TMP;1 on 18-APR-1990 10:42:33.29
File ID (599,29,0)    End of file block 49 / Allocated 52

Virtual block number 47 (0000002F), 512 (0200) bytes

 0375FA46 08F84688 0008E903 7400F67E 83F64689 000000E6 9A5016F8 4680076A |..F%.P.|....F-.—.t.Õ...F%.F*u. 000000
 0200050C CAC95F5E 1F0000E9 00008800 06E9F646 88000007 C726065E C4000EE9 Õ..á^.&ú....F-Õ..|..Õ...^_èò.... 000020
 03004000 0101C802 03003300 01007702 03002500 01018802 03000000 0A015400 .T...........X...W...3...Ã...M.. 000040
 00FA46C7 D88EF.FF 881E5657 000006C8 00000000 00000000 00006600 01010002 .....f..........à...WV.|...ÁúF*. 000060
 086A0A76 FF0C76FF 0E76FF10 76FF0001 07C72606 5EC4FC46 89FE4689 00008800 .|...F±.F=á^.&ú....v..v..v..v.j. 000080
 0EE90375 FE460BFC 46880008 E9037400 FA7E83FA 46890000 FFFF9A50 16FC4680 .F=.P......F*.-*.t.Õ...F•.F±u.Õ. 0000A0
 000006C8 000CCAC9 5F5E1F00 00E90000 B80006E9 FA468800 0007C726 065EC400 .á^.&ú....F*Õ..|..Õ...^_èò..à... 0000C0
 76FF0001 07C72606 5EC4FC46 89FE4689 00008800 00FA46C7 D88E0008 881E5657 WV.|...ÁúF*..|...F±.F•á^.&ú....v 0000E0
 E9037400 FA7E83FA 46890000 00369A50 16FC4680 096A0A76 FF0C76FF 0E76FF10 ..v..v..v.j..F•.P.ó....F*.-*.t.Õ 000100
 00E90000 B80006E9 FA468800 0007C726 065EC400 0EE90375 FE460BFC 46880008 ...F•.F±u.Õ..á^.&ú....F*Õ..|..Õ. 000120
 00000000 00000000 25000100 A2020300 00000A00 74000200 020CCAC9 5F5E1F00 ..^_èò.....t.......Ã...X........ 000140
 07C72606 5EC4FC46 89FE4689 00008800 00FA46C7 D88EFFFF 881E5657 000006C8 à...WV.|...ÁúF*..|...F±.F•á^.&ú. 000160
 FA7E83FA 46890000 FFFF9A50 16FC4680 026A0A76 FF0C76FF 0E76FF10 76FF0001 ...v..v..v..v.j..F•.P......F*.-* 000180
 B80006E9 FA468800 0007C726 065EC400 0EE90375 FE460BFC 46880008 E9037400 .t.Õ...F•.F±u.Õ..á^.&ú....F*Õ..| 0001A0
 00000000 25000100 36020300 00000A00 08000200 020CCAC9 5F5E1F00 00E90000 ..Õ...^_èò............ó...X..... 0001C0
 9A5016FC 4680136A 0A76FF0C 76FF0E76 FF1076FF D88EFFFF 881E5657 00000CC8 à...WV.Ī...Á.v..v..v..v.j..F•.P. 0001E0

Dump of file SATURN:[PCCOMMON.DUMP.DLL]DAPREDS.TMP;1 on 18-APR-1990 10:42:33.29
File ID (599,29,0)    End of file block 49 / Allocated 52

Virtual block number 48 (00000030), 512 (0200) bytes

 46C70000 07C72606 5EC400A1 E9F44688 0006E903 7500F47E 83F44689 0000FFFF .....F¶.-¶.u.Õ...F¶ÕÀ.á^.&ú...úF 000000
 76FF003F E9037502 47082607 8826F85E C4FA5689 F84689FE 5688FC46 880000F6 -...F•.V±.F%.V*á^½&..&.G.u.Õ?..v 000020
 7500F47E 83F44689 FFFF0170 9A5016F6 468037FF 260277FF 26F85EC4 0E76FF10 ..v.á^½&.w.&.7.F-.P.p....F¶.-¶.u 000040
 1076FFFF 82E904F8 46830007 E90003E9 037500F6 7E83004D E9F44688 0006E903 .Õ...F¶ÕM..—.u.Õ..Õ...F%.Õý..v. 000060
 0017E9F4 46880006 E9037500 F47E83F4 46890000 FFFF9AFC 76FFFE76 FF0E76FF .v..v±.v•......F¶.-¶.u.Õ...F¶Õ.. 000080
 06C8000C CAC95F5E 1F0000E9 00008800 0107C726 065EC400 08E90375 00F67E83 .—.u.Õ..á^.&ú...|..Õ...^_èò..à. 0000A0
 01289A50 16FA4680 056A0A76 FF0C76FF 0E76FF10 76FFD88E 0008881E 56570000 ..WV.|...Ã.v..v..v..v.j..F*.P.(. 0000C0
 0A76FF0C 76FF0E76 FF1076FF 0055E9FC 46880006 E9037500 FC7E83FC 46890000 ...F•.-•.u.Õ...F•ÕU..v..v..v..v. 0000E0
 7E80002B E9FC4688 0006E903 7500FC7E 83FC4689 0000FFFF 9A5016FE 4680046A j..F±.P......F•.-•.u.Õ...F•Õ+..- 000100
 C726065E C40008E9 000107C7 26065EC4 0008E903 7544FE7E 800009E9 037553FA *Su.Õ...-±Du.Õ..á^.&ú...Õ..á^.&ú 000120
 FF1076FF D88E00E6 881E5657 000006C8 000CCAC9 5F5E1F00 00E90000 88000007 ...|..Õ...^_èò..à...WV.|Ī..Ã.v.. 000140
 0006E903 7500FA7E 83FA4689 0000FFFF 9A5016FC 4680086A 0A76FF0C 76FF0E76 v..v..v.j..F•.P......F*.-*.u.Õ.. 000160
 065EC400 08E90377 01FC7E83 0009E903 7E0019E9 037D00FE 7E830030 E9FA4688 .F*ÕO..-±.).Õ..-.Õ...-•.w.Õ..á^. 000180
 0006C800 0CCAC95F 5E1F0000 E90000B8 000007C7 26065EC4 0008E900 0107C726 &ú...Õ..á^.&ú...|..Õ...^_èò..à.. 0001A0
 0000FE9A 5016FC46 80036A0A 76FF0C76 FF0E76FF 1076FFD8 8E0178B8 1E565700 .WV.|x..Ã.v..v..v..v.j..F•.P.±.. 0001C0
 09E9037E 0019E903 7D00FE7E 830030E9 FA468800 06E90375 00FA7E83 FA468900 ..F*.-*.u.Õ...F*ÕO..-±.).Õ..-.Õ. 0001E0

Dump of file SATURN:[PCCOMMON.DUMP.DLL]DAPREDS.TMP;1 on 18-APR-1990 10:42:33.29
File ID (599,29,0)    End of file block 49 / Allocated 52

Virtual block number 49 (00000031), 512 (0200) bytes

 00008800 0007C726 065EC400 08E90001 07C72606 5EC4000B E9037700 FC7E8300 ..-•.w.Õ..á^.&ú...Õ..á^.&ú...|.. 000000
 01019002 03000000 0A01E500 02000000 08007600 0200060C CAC95F5E 1F0000E9 Õ...^_èò.....v.......Ī.......... 000020
 00000000 00005A00 0100AA02 03004100 01002002 03003300 0101FD02 03002500 .X...ª...3... ...A... ...Z...... 000040
 10C01805 74A6F3F9 28D1F7AE F2FFFFB9 C0330A7E C40676C5 1EDE88D7 88EC8855 U.&.•.B.év.á-.3àL..ÛK1+*µlt..á. 000060
 88E3F706 46880875 0A5E88D8 080C5E88 084688EC 885500C8 5DFA88F3 881FFFFF ....µ.*]ù.U.&.F..^..Ã.^.u..F.%D. 000080
 00000008 CA5DE588 0103E3F7 064688C8 030C66F7 064688C8 88E3F700 08CA5DE5 |]ò..%D.à.F.%f..à.F.%D.1.|]ò.... 0000A0
 7274206E 6F206863 61626C6C 6F72206F 64206F74 20747261 74732073 75676F42 Bogus start to do rollback on tr 0000C0
 61626C6C 6F72206F 64206F74 20747261 74732073 75676F42 0060726F 66736E61 ansform.Bogus start to do rollba 0000E0
 00000000 00000000 00000000 00000000 0060726F 66736E61 7274206E 6F206863 ck on transform................. 000100
 00000000 00000000 00000000 00000000 00000000 00000000 00000000 00000000 ................................ 000120
 00000000 00000000 00000000 00000000 00000000 00000000 00000000 00000000 ................................ 000140
 00000000 00000000 00000000 00000000 00000000 00000000 00000000 00000000 ................................ 000160
 00000000 00000000 00000000 00000000 00000000 00000000 00000000 00000000 ................................ 000180
 00000000 00000000 00000000 00000000 00000000 00000000 00000000 00000000 ................................ 0001A0
 00000000 00000000 00000000 00000000 00000000 00000000 00000000 00000000 ................................ 0001C0
 00000000 00000000 00000000 00000000 00000000 00000000 00000000 00000000 ................................ 0001E0
```

```
Dump of file SATURN:[PCCOMMON.DUMP.DLL]DAPROF.TMP;1 on 18-APR-1990 10:42:40.96
File ID (603,31,0)   End of file block 2 / Allocated 4

Virtual block number 1 (00000001), 512 (0200) bytes

00000000 00000040 00000000 000000B8 0000FFFF 00020004 00000002 00D15A4D MZ!.............|.......@....... 000000
00000080 00000000 00000000 00000000 00000000 00000000 00000000 00000000 ................................ 000020
6F6E6E61 63206061 72676F72 70207369 685421C0 4C01B821 CD09B400 0EBA1F0E ..a..Ç.é!|.L!This program canno 000040
00000000 00000024 nA0D002E 65646F6D 20534F44 206E6920 6E757220 65622074 t be run in DOS mode....$....... 000060
00010003 00000000 ' 000000 00000400 0003800A 6CF6E250 000D00C8 0505454E NE..à...]â-l.................... 000080
00000000 00000000 00010000 00040000 00000155 00B500B3 00580058 0040000F ..@.X.X.°.ç.U................... 0000A0
00666F72 70616406 00120E01 0011002C 00360E00 00360028 00E80F00 00E80017 ..Ò...Ò.(.6...6.,........daprof. 0000C0
4F525041 44180001 58494645 5250454D 414E4A42 4F544547 464F5250 41441600 ..DAPROFGETOBJNAMEPREFIX...DAPRO 0000E0
42544547 464F5250 41441A00 02584946 45525045 4D414E53 53414C43 54454746 FGETCLASSNAMEPREFIX...DAPROFGETB 000100
55514C4D 44006C60 64030000 01000003 45524F43 53554E45 48505948 4B4E414C LANKHYPHENUSCORE.......dml.DMLQU 000120
656C6966 6F725020 41440B00 00000003 00690300 17030103 44494C4D 44595245 ERYDMLID......i.......DA Profile 000140
E90020B8 D88EFFFF 881E5657 000000C8 00000000 00000000 00000000 00000073 s...............à...WV.|...Ä|·.Õ 000160
B00A76FF 0C76FF0E 76FF1076 FFD88E00 08881E56 57000004 C8C8C95F 5E1F0000 ...^_èùà...WV.|...Ä.v..v..v..v.. 000180
76FF1076 FF0017E9 8E898800 06E90375 00FC7E83 FC468900 00FFFF9A 5016FE46 F±.P.......F=.~=.u.Õ..|¿.Õ...v..v 0001A0
1E565700 0004C800 0CCAC95F 5E1F0000 E9FFFF00 699A0676 FF0B76FF FE76FF0E ..v±.v..v..i...Õ...^_èò..à...WV. 0001C0
FE5E8CFC 46890004 B8003FE9 FE5E8CFC 46890000 B80030E9 0A4688D8 8E001FB8 |...Ä.F.ÕO.|...F=.^±Õ7.|...F=.^± 0001E0
```

```
Dump of file SATURN:[PCCOMMON.DUMP.DLL]DAPROF.TMP;1 on 18-APR-1990 10:42:40.96
File ID (603,31,0)   End of file block 2 / Allocated 4

Virtual block number 2 (00000002), 512 (0200) bytes

03750002 3D001BE9 FE5E8CFC 4689000E B80027E9 FE5E8CFC 46890009 B80033E9 Õ3.|...F=.^±Õ'.|...F=.^±Õ..=..u. 000000
FF0876FF FC76FFFE 76FFFFD9 E9FFD0E9 03750005 3DFFCCE9 03750003 3DFFC8E9 Õà.=..u.Õa.=..u.ÕÀ.Õ1..v±.v=.v.. 000020
0001005D 00020004 90000ACA C95F5E1F 0000E900 008808C4 83FFFF00 009A0676 v.......á.|..Õ...^_èò.......]... 000040
00000000 00000005 00010035 02030000 00030071 00020000 00020005 00020000 ....í.......q.......5........... 000060
A8C78806 7EC401F7 AEF2FFFF 89C033C0 8ED88CFE 880A76C5 1EDE88D7 88EC8855 U.$.=.B.év..±.Ä.à3à¿...ÜÄ1á~..ú´ 000080
00000000 00000000 0000C85D C28C1FFA 88F38BA4 F3C913A5 F3E90149 A4027401 .t.É!lÕµE.èµÊ.µ.°..ò]ü.......... 0000A0
00000000 00000000 00000000 0000204A 424F0052 54544100 54455350 00544E45 ENT.PSET.ATTR.OBJ .............. 0000C0
00000000 00000000 00000000 00000000 00000000 00000000 00000000 00000000 ................................ 0000E0
00000000 00000000 00000000 00000000 00000000 00000000 00000000 00000000 ................................ 000100
00000000 00000000 00000000 00000000 00000000 00000000 00000000 00000000 ................................ 000120
00000000 00000000 00000000 00000000 00000000 00000000 00000000 00000000 ................................ 000140
00000000 00000000 00000000 00000000 00000000 00000000 00000000 00000000 ................................ 000160
00000000 00000000 00000000 00000000 00000000 00000000 00000000 00000000 ................................ 000180
00000000 00000000 00000000 00000000 00000000 00000000 00000000 00000000 ................................ 0001A0
00000000 00000000 00000000 00000000 00000000 00000000 00000000 00000000 ................................ 0001C0
00000000 00000000 00000000 00000000 00000000 00000000 00000000 00000000 ................................ 0001E0
```

```
Dump of file SATURN:[PCCOMMON.DUMP.DLL]DAPROFDF.TMP;1 on 18-APR-1990 10:42:42.58
File ID (604,30,0)   End of file block 88 / Allocated 88

Virtual block number 1 (00000001), 512 (0200) bytes

00000000 00000040 00000000 000000B8 0000FFFF 00000004 00000050 019E5A4D MZ..P...........|.......@....... 000000
00000080 00000000 00000000 00000000 00000000 00000000 00000000 00000000 ................................ 000020
6F6E6E61 63206061 72676F72 70207369 685421C0 4C01B821 CD09B400 0EBA1F0E ..a..Ç.el|.L!This program canno 000040
00000000 00000024 0A00002E 65646F6D 20534F44 206E6920 6E757220 65622074 t be run in DOS mode....$....... 000060
00070007 00000000 00020000 00000000 00058009 4E303FF6 00070250 0505454E NE..P...-7=N.................... 000080
00000000 00000000 0001C902 00040000 000002D7 009A008C 00800078 0040002D -.@.x.......=................... 0000A0
02020E21 C0000000 190E0F00 190E0685 000F0F00 000F0683 645A0F00 645An031 1.2d..Zd°.......ç...........!... 0000C0
01000004 00020005 0F821E81 0F820A03 00651E81 006509FC 1C800F21 1AE40. ·C L.Õ.!...=.e.Ý.e...ý.Ý.ý......... 0000E0
49574D50 050001A9 019E017C 01150010 00070001 00000046 44464F52 504144. 1 .DAPROFDF...........|...`...PMWI 000100
46440E4D 524F4653 5345434F 52504D46 440E4D46 4403534C 4C414353 4F44084E N.DOSCALLS.DFM.DFMPROCESSFORM.DF 000120
4D46440B 4A424F4C 4D444859 52455551 4D46440F 50414548 42485952 4555514D MQUERYHBHEAP.DFMQUERYHDMLOBJ.DFM 000140
52455551 4D46440C 474C4444 4E574859 52455551 4D46440F 4D544859 52455551 QUERYHTM.DFMQUERYHWNDDLG.DFMQUER 000160
4F4C4354 45534D46 440D444C 45494652 45545349 4745524D 4644104C 4F4F5459 YTOOL.DFMREGISTERFIELD.DFMSETCLO 000180
52544E4F 43544553 4D46440F 4E46444E 414D4D4F 43544553 4D46440F 4E464553 SEFN.DFMSETCOMMANDFN.DFMSETCONTR 0001A0
47495641 4E544553 4D464410 454C5449 544D524F 46544553 4D46440F 4E464C4F OLFN.DFMSETFORMTITLE.DFMSETNAVIG 0001C0
44524553 55544553 4D46440E 4E465946 49544F4E 5445534D 46440E4E 46455441 ATEFN.DFMSETNOTIFYFN.DFMSETUSERD 0001E0
```

```
Dump of file SATURN:[PCCOMMON.DUMP.DLL]DAPROFDF.TMP;1 on 18-APR-1990 10:42:42.58
File ID (604,30,0)   End of file block 88 / Allocated 88

Virtual block number 2 (00000002), 512 (0200) bytes

 59524555 514D4644 174D524F 46474E4F 4C455441 47495641 4E4D4644 13415441 ATA.DFMNAVIGATELONGFORM.DFMQUERY 000000
 574E5854 54524154 534C4D44 166C6D64 03444554 43454C45 53584F42 5453494C LISTBOXSELECTED.dml.DMLSTARTTXNW 000020
 4F4D5952 4555514C 4D44134E 5854504F 54534C4D 440A4F44 4E555455 4F485449 ITHOUTUNDO.DMLSTOPTXN.DMLQUERYMO 000040
 49465445 534C4D.4 08444C45 49465952 4555514C 4D440045 4C444E41 484C4544 DELHANDLE.DMLQUERYFIELD.DMLSETFI 000060
 44500042 41544D44 50064B43 41424C4C 4F524E58 54504F54 534C4D44 12444C45 ELD.DMLSTOPTXNROLLBACK.PDMTAB.PD 000080
 4F525006 4F525003 47534D52 52455445 474D4450 0C455A49 4C414954 494E494D MINITIALIZE.PDMGETERRMSG.PRO.PRO 0000A0
 204D5020 322F534F 1700005B 56030101 45544952 57534F44 084F4953 03444E45 END.SIO.DOSWRITE...V{...OS/2 PM  0000C0
 41525453 544F4F42 464F5250 41440F00 0060726F 4620656C 69666F72 50204144 DA Profile Form...DAPROFBOOTSTRA 0000E0
 890A468B D88EFFFF 881E5657 000002C8 00000000 00000000 00000000 00000150 P...............à...WV.|...Ä.F.. 000100
 5700000E C8000CCA C95F5E1F FFF4E900 03E90006 E9000088 0009E9FE 468BFE46 F±.F±Ö..|..Ö..Ö..Ö¶..^_èò..à...W 000120
 FFFF9A50 16FA468D 0E76FF10 76FF0001 F246C7F4 46890A46 88088E00 08881E56 V.|...Ä.F..F¶úF·...v..v̄..F'.P... 000140
 FFFF9A50 16F6468D 0E76FF10 76FF0000 FFFF9A50 16FC4680 0E76FF10 76FF0000 ...v..v..F=.P......v..v..F-.P... 000160
 0CCAC95F 5E1F0000 E9000088 FFF4E900 03E9000C E9000088 0009E9F4 46880000 ...F¶Ö..|..Ö..Ö..Ö¶.|..Ö...^_èò. 000180
 86FF0000 005E9A50 16FF3486 8D0876FF 0A76FFD8 8E0033B8 1E565700 00CEC800 .àö..WV.|3..Ä.v..v...4..P.^_...Å 0001A0
 FF38868D 406AFC76 FFFE76FF FE5689FC 46890000 FFFF9A06 76FFFF34 86FFFF36 6..Å4..v.......F=.V±.v±.v=jâ..8. 0001C0
 5016FF39 868D00AC E900008A 00008800 09E90375 23FF388E 800000FF FF9A5016 .P....../8.#u.Ö..|..¤..Ö¯...9..P 0001E0

Dump of file SATURN:[PCCOMMON.DUMP.DLL]DAPROFDF.TMP;1 on 18-APR-1990 10:42:42.58
File ID (604,30,0)   End of file block 88 / Allocated 88

Virtual block number 3 (00000003), 512 (0200) bytes

 0026E903 7407FF76 8E83FF7A 9689FF78 8689FFCA 83000000 04C483FF FF00629A .b....á.....ò...x...z..ƒx..t.Ö&. 000000
 FF9A0080 685016FF 7C868D06 76FFFF34 86FFFF36 86FF001C E90374FF FF7A8E83 .ƒz..t.Ö...Å6..Å4..v...|..Ph.... 000020
 86FFFF36 86FF001C E90374FF FF7A8E83 0026E903 7406FF78 8E830039 E90000FF ...Ö9..ƒx..t.Ö&..ƒz..t.Ö...Å6..Å 000040
 FF0027E9 00008A00 00880009 E90000FF FF9A5016 FF7C8680 00806806 76FFFF34 4..v.h....|..P.....Ö..|..¤..Ö'.. 000060
 FF9A5016 FF7C8680 006A006A FF3286FF 0000FFFF 9A5016FF 32868008 76FF0A76 v..v...2..P......Å2.j.j...|..P.. 000080
 0107C726 065EC4D8 8E009988 1E565700 0008C800 06CAC95F 5E1F0000 E90000FF ...Ö...^_èò..à...WV.|...Äá^.&ú.. 0000A0
 00004E9A 5016FC46 8D0A76FF 0C76FF00 0000AA9A 5016F846 8D0A76FF 0C76FF00 ..v..v..F̄½.P.¯....v..v..F=.P.N.. 0000C0
 5AC80008 CAC95F5E 1F0000E9 00008800 00017C9A 5016FE46 8D0A76FF 0C76FF00 ..v..v..F±.P.|...|..Ö...^_èò..àZ 0000E0
 0876FF0A 76FF0000 01B09A50 16F8468D 0876FF0A 76FFD88E 01A5881E 56570000 ..WV.|É..Ä.v..v..F½.P.§..¯.v..v. 000100
 F876FFFA 76FF0000 FFFF9A50 16FC468D 0876FF0A 76FF0000 006E9A50 16F4468D .F¶.P.n....v..v..F=.P... ..v'.v½ 000120
 681E0014 E90374FE 4608FC46 880000FF FF9A006A 006A4B6A 006A0143 680676FF .v.hC.j.jKj.j.......F=.F±‹.Ö...h 000140
 016AFC76 FFFE76FF F476FFF6 76FF0029 E908C483 00F30010 9A5016A6 468D0042 B..FÌ.P...µ..á.Ö)..v-.v¶.v±.v=j. 000160
 76FFFA76 FF0019E9 00008800 06E90375 000030F2 46890000 FFFF9A50 16A6468D .FÌ.P......F·=..u.Ö..|..Ö...v'.v 000180
 5700005C C80006CA C95F5E1F 0000E900 00880000 FFFF9A50 16A64680 0676FFF8 ½.v..FÌ.P.....|..Ö...^_èò..à\..W 0001A0
 46801476 FF1676FF 08568C06 46891246 80000107 C7260E5E C4D88E01 F6881E56 V.|-..Äá^.&ú....F..F..V̄..v..v..F 0001C0
 46801476 FF1676FF ?0000206 9A5016F6 46801476 FF1676FF 000001C0 9A5016FA '.P.ë....v..v..F-.P......v..v..F 0001E0

Dump of file SATURN:[PCCOMMON.DUMP.DLL]DAPROFDF.TMP;1 on 18-APR-1990 10:42:42.58
File ID (604,30,0)   End of file block 88 / Allocated 88

Virtual block number 4 (00000004), 512 (0200) bytes

 76FFF676 FFF876FF 00000226 9A5016FC 468D1476 FF1676FF 00000216 9A5016F2 ·.P......v..v..F=.P.&....v½.v-.v 000000
 76FFF276 FFF476FF 0000FFFF 9AF276FF F476FF00 00015F9A 5016A446 8D4C6A12 .jL.FÈ.P._....v¶.v·......v¶.v·.v 000020
 9668F076 FF002AE9 03750000 30F04689 0000FFFF 9A5016A4 4680016A FC76FFFE ±.v=j..FÈ̄.P......FÞ=..u.Ö*..vÞh. 000040
 88000207 C7260E5E C40000FF FF9AF276 FFF476FF 0000FFFF 9A0A76FF 0C76FF01 ..v..v.......v¶.v·.....á^.&ú...| 000060
 0014C800 12CAC95F 5E1F0000 E9000088 0000FFFF 9AF276FF F476FF00 11E90000 ..Ö...v¶.v·.....|..Ö...^_èò..à.. 000080
 800876FF 0A76FF00 0002E49A 5016F646 800876FF 0A76FFD8 8E02B3B8 1E565700 .WV.|°..Ä.v..v..F-.P.Ö....v..v.. 0000A0
 FFF676FF F876FF00 0003049A 5016FC46 800876FF 0A76FF00 0002F49A 5016F246 F·.P.¶....v..v..F=.P......v½.v-. 0000C0
 43681E00 14E90374 FE4608FC 46880000 023F9A00 6A006A03 6A006A01 43680676 v.hC.j.j.j.j..?....F=.F±t.Ö...hC 0000E0
 8D036AFC 76FFFE76 FFF276FF F476FF00 29E908C4 83043900 109A5016 EC468D00 ..Få.P...9..á.Ö)..v¶.v·.v±.v=j.. 000100
 44681EFA 76FF002D E9000088 0006E903 7500003D F0468900 0002769A 5016FA46 F'.P.v....FÞ=..u.Ö..|..Ö-..v'.hD 000120
 00029A9A 5016EC46 8D0676FF F676FFF8 76FF0AC4 83025A00 669A5016 EC468D00 ..Få.P.f.Z..á..v½.v-.v..Få.P.... 000140
 07C7260E 5EC4D88E 0395B81E 56570000 16C80006 CAC95F5E 1F0000E9 00008800 .|..Ö...^_èò..à...WV.|...Äá^.&ú. 000160
 76FF1676 FF000002 049A5016 F6468D14 76FF1676 FF078926 12468B06 5EC40001 ..á^..F.&_...v..v..F-.P.å....v..v 000180
 76FF1676 FF000003 B59A5016 EE468D14 76FF1676 FF000003 A59A5016 F2468D14 ..F·.P.È....v..v..FŸ.P.ç....v..v 0001A0
 00FFFF9A FE76FF50 16F8468D 1276FFF2 76FFF476 FF000003 C59A5016 FA468D14 ..F'.P.é....v¶.v·.v..F½.P.v±.... 0001C0
 F076FF00 0003249A EE76FFF0 76FFFC19 F846C700 05E90374 00EA7E83 EA468900 ..Fð.~ö.t.Ö..úF½.=.vÞ.vŸ.$....vÞ 0001E0
```

```
Dump of file SATURN:[PCCOMMON.DUMP.DLL]DAPROFDF.TMP;1 on 18-APR-1990 10:42:42.58
File ID (604,30,0)   End of file block 88 / Allocated 88

Virtual block number 5 (00000005), 512 (0200) bytes

 002AE903 75000030 EC468900 00033C9A 5016F846 80036AFA 76FFFC76 FFEE76FF .vŸ.v=.vªj..F%.P.<....F‡=..u.Õ*. 000000
 260E5EC4 00000358 9A0A76FF 0C76FF01 9668EC76 FF000003 639AEE76 FFF076FF .vÞ.vŸ.c....všh...v..v..X...á^.& 000020
 CAC95F5E 1F0000E9 00008800 00037C9A EE76FFF0 76FF0011 E9000088 000207C7 ú...|..Õ...vÞ.vŸ.|...|..Õ...^_èò 000040
 76FF0000 04979A50 16F84680 0876FF0A 76FFD88E 0466881E 56570000 14C80012 ..à...WV.¡f..Á.v..v..F%.P......v 000060
 76FF0000 04879A50 16FC4680 0876FF0A 76FF0000 04A79A50 16F44680 0876FF0A ..v..F¶.P.Ï....v..v..F•.P.ñ....v 000080
 E90374FE 4608FC46 88000003 DE9A006A 006A036A 006A0143 680676FF F876FFFA *.v½.v.hC.j.j.j.j..ß....F•.F±t.Õ 0000A0
 FFFE76FF F476FFF6 76FF0029 E908C483 05FE0010 9A5016EE 46800048 681E0014 ...hH..FŸ.P...±..á.Õ)..\-.v¶.v±. 0000C0
 FF002DE9 00008800 06E90375 00003DF2 46890000 04159A50 16EC4680 026AFC76 v=j..F‡.P......F·=..u.Õ..| .Õ·.. 0000E0
 16EE4680 0676FFF8 76FFFA76 FF0AC483 03F90066 9A5016EE 46800049 681EEC76 v‡.hI..FŸ.P.f.ª..á..vª.v½.v..FŸ. 000100
 C4D88E05 5A881E56 57000016 C80006CA C95F5E1F 0000E900 00880000 0440D9A50 P.M...|..Õ...^_èò..à...WV.¡Z..Äá 000120
 00000487 9A5016FA 46801476 FF1676FF 07892612 4688065E C4000107 C7260E5E ^.&ú...á^..F.&...v..v..Fª.P..... 000140
 0000057A 9A5016F2 46801476 FF1676FF 0000056A 9A5016F6 46801476 FF1676FF .v..v..F-.P.j....v..v..F·.P.±... 000160
 5016EA46 80046A12 76FFF676 FFF876FF 0000058A 9A5016FC 46801476 FF1676FF .v..v..F•.P......v½.v-.v.j..Fõ.P 000180
 9A5016EA 46800013 E9037500 003D04C4 83FFFF63 EA9A5016 EA468000 0003199A ......Fõ.P.õc...á.=..u.Õ...Fõ.P. 0001A0
 F476FF00 0004E99A F276FFF4 76FFFFFF F046C700 05E9F046 8904C483 05BE005E ^./..á..FÞÕ..úFÞ...v¶.v·.Õ....v¶ 0001C0
 002AE903 75000030 EE468900 0005019A 5016F046 80026AFC 76FFFE76 FFF276FF .v·.v±.v=j..FÞ.P......FŸ=..u.Õ*. 0001E0

Dump of file SATURN:[PCCOMMON.DUMP.DLL]DAPROFDF.TMP;1 on 18-APR-1990 10:42:42.58
File ID (604,30,0)   End of file block 88 / Allocated 88

Virtual block number 6 (00000006), 512 (0200) bytes

 260E5EC4 00000528 9A0A76FF 0C76FF01 9668EE76 FF000005 179AF276 FFF476FF .v¶.v·......vŸh...v..v..(...á^.& 000000
 CAC95F5E 1F0000E9 00008800 0005419A F276FFF4 76FF0011 E9000088 000207C7 ú...|..Õ...v¶.v·.A...|..Õ...^_èò 000020
 76FF0000 065C9A50 16F64680 0876FF0A 76FFD88E 062B881E 56570000 10C80012 ..à...WV.|+..Ä.v..v..F-.P.\....v 000040
 76FF0000 067C9A50 16FC4680 0876FF0A 76FF0000 066C9A50 16F24680 0876FF0A ..v..F·.P.l....v..v..F•.P.|....v 000060
 06E90375 00003DF0 46890000 05DA9A50 16FA4680 056AFC76 FFFE76FF F276FFF4 ¶.v·.v±.v=j..Fª.P.Õ....FÞ=..u.Õ. 000080
 016A006A 01256801 3E68F676 FFF876FF 001CE903 7459FA7E 800044E9 00008800 .|..ÕÐ..~ªYt.Õ...v½.v-h>.h%.j.j. 0000A0
 006A006A 006A006A 01256801 3E68F676 FFF876FF 0019E900 0007D19A 006A006A j.j..1...Õ...v½.v-h>.h%.j.j.j.j. 0000C0
 5EC4D88E 073A881E 56570000 14C80006 CAC95F5E 1F0000E9 00008800 0005A39A .È...|..Õ...^_èò..à...WV.|:..Àá^ 0000E0
 FF000006 4C9A5016 FC468014 76FF1676 FF078926 12468806 5EC40001 07C7260E .&ú...á^..F.&...v..v..F•.P.L.... 000100
 FF000007 5A9A5016 F4468014 76FF1676 FF000007 4A9A5016 F8468014 76FF1676 v..v..F%.P.J....v..v..F¶.P.Z.... 000120
 6A006A00 6A012468 1276FFF8 76FFFA76 FF000007 6A9A5016 EC468014 76FF1676 v..v..F$.P.j....vª.v½.v.h$.j.j.j 000140
 0001F246 C70009E9 :EFE46C6 0000F246 C7000CE9 0375D008 000007B5 9A006A00 .j..ç....Âu.Õ..úF·..óF±NÕ..úF·.. 000160
 FE468005 6AEC76FF EE76FFF4 76FFF676 FF000006 C99AF476 FFF676FF 59FE46C6 óF±Y.v-.v¶.è....v-.v¶.vŸ.v$j..F± 000180
 F076FF00 0006F79A F476FFF6 76FF002A E9037500 003DF046 89000006 E19A5016 .P.Ä....FÞ=..u.Õ*..v-.v¶.%....vÞ 0001A0
 FFF676FF 002DE900 00B80002 07C7260E 5EC40000 07089A0A 76FF0C76 FF019668 h...v..v......á^.&ú...|..Õ-..v-. 0001C0
 549A006A 006A5052 0228F246 88012568 013E68F8 76FFFA76 FF000007 219AF476 v¶.!....vª.v½h>.h%..F·+ØRPj.j..T 0001E0

Dump of file SATURN:[PCCOMMON.DUMP.DLL]DAPROFDF.TMP;1 on 18-APR-1990 10:42:42.58
File ID (604,30,0)   End of file block 88 / Allocated 88

Virtual block number 7 (00000007), 512 (0200) bytes

 FF0A76FF D88E07EA 881E5657 000010C8 0012CAC9 5F5E1F00 00E90000 B8000008 ...|..Õ...^_èò..à...WV.¡õ..Ä.v.. 000000
 FF0A76FF 0000082B 9A5016F2 46800876 FF0A76FF 0000081B 9A5016F6 46800876 v..F-.P.......v..v..F·.P.+....v.. 000020
 9A5016FA 4680046A FC76FFFE 76FFF276 FFF476FF 0000083B 9A5016FC 46800876 v..F•.P.;....v¶.v·.v±.v=j..Fª.P. 000040
 FFF876FF 013BE998 FA468A01 63E90000 B80006E9 03750000 3DF04689 00000782 .....FÞ=..u.Õ..|..Õc..Fª.Õ;..v½. 000060
 25680140 68F676FF F876FF00 00099A9A 006A006A 016A006A 01256801 3F68F676 v-h?.h%.j.j.j.j.......v½.v-hª.h% 000080
 006A006A 006A0125 68014168 F676FFF8 76FF0000 09B39A00 6A006A00 6A006A01 .j.j.j.j..°....v½.v-hA.h%.j.j.j. 0000A0
 E89A006A 006A006A 006A0125 68013F68 F676FFF8 76FF0108 E9000009 CF9A006A j..ü...Õ...v½.v-h?.h%.j.j.j.j..Õ 0000C0
 FFF876FF 00000A01 9A006A00 6A006A00 6A012568 014068F6 76FFF876 FF000009 ....v½.v-hª.h%.j.j.j.j.......v½. 0000E0
 3F68F676 FFF876FF 00BAE900 000A109A 006A006A 016A006A 01256801 4168F676 v-hA.h%.j.j.j.j......Õ¤..v½.v-h? 000100
 6A006A01 25680140 68F676FF F876FF00 000A369A 006A006A 006A006A 01256801 .h%.j.j.j.j..6....v½.v-hª.h%.j.j 000120
 6B9A006A 006A006A 006A0125 68014168 F676FFF8 76FF0000 0A4F9A00 6A006A01 .j.j..O....v½.v-hA.h%.j.j.j.j..k 000140
 FF00000A 849A006A 006A016A 006A0125 68013F68 F676FFF8 76FF006C E900000A ...Öl..v½.v-h?.h%.j.j.j.j....... 000160
 4168F676 FFF876FF 00000A90 9A006A00 6A006A00 6A012568 014068F6 76FFF876 v½.v-hª.h%.j.j.j.j.......v½.v-hA 000180
 3DFE8DE9 03750041 30001BE9 001EE900 0008EF9A 006A006A 006A006A 01256801 .h%.j.j.j.j..ÿ...Õ..Õ..=A.u.Õ§±= 0001A0
 C80006CA C95F5E1F 0000E900 0088FF94 E9FEFBE9 0375004F 3DFF51E9 03750049 Ê.u.ÕQ.=O.u.Õ«±Õ..|..Õ...^_èò..à 0001C0
 FF1676FF 07892612 4688065E C4000107 C7260E5E C4D88E09 08881E56 57000012 ...WV.|...Äá^.&ú...á^..F.&...v.. 0001E0
```

Dump of file SATURN:[PCCOMMON.DUMP.DLL]DAPROFDF.TMP;1 on 18-APR-199 10:42:42.58
File ID (604,30,0) End of file block 88 / Allocated 88

Virtual block number 8 (00000008), 512 (0200) bytes

FF1676FF 00000918 9A5016F4 46801476 FF1676FF 00000808 9A5016F8 46801476 v..F½.P......v..v..F¶.P......v.. 000000
FFF676FF 00000938 9A5016FC 46801476 FF1676FF 00000928 9A5016F0 46801476 v..Fþ.P.(....v..v..F=.P.8....v-. 000020
25680140 68F47'FF F676FF00 00085A9A 006A006A 016A006A 01256801 3F68F476 v¶h?.hX.j.j.j.j..Z....v-.v¶hа.hX 000040
006A006A 006A0125 68014168 F476FFF6 76FF0000 08739A00 6A006A00 6A006A01 .j.j.j.j..s....v-.v¶hA.hX.j.j.j. 000060
FFFE76FF F076FFF2 76FF0000 08789AF0 76FFF276 FF41FA46 C6000009 819A006A j......óF*A.v·.vþ.(....v·.vþ.v±. 000080
9AF076FF F276FF00 2AE90375 00003DEE 46890000 08939A50 16FA468D 046AFC76 v=j..F*.P......F¥=..u.Ô*..v·.vþ. 0000A0
00008800 0207C726 0E5EC400 00088A9A 0A76FF0C 76FF0196 68EE76FF 000008A9 `....vŸh...v..v..ɒ...á^.&ú...¡.. 0000C0
57000012 C80012CA C95F5E1F 0000E900 00880000 08039AF0 76FFF276 FF0011E9 Ô...v·.vþ.Æ...¡..Ô...^_èò..à...W 0000E0
46801476 FF1676FF 07892612 4688065E C4000107 C7260E5E C4D88E0A D7881E56 V.¡Ø..Ää^.&ú...á^..F.&¯..v..v..F 000100
46801476 FF1676FF 00000808 9A5016F4 46801476 FF1676FF 00000AF8 9A5016F8 ½.P.½....v..v..F¶.P......v..v..F 000120
3F68F476 FFF676FF 00000828 9A5016FC 46801476 FF1676FF 00000818 9A5016F0 þ.P......v..v..F=.P.(....v-.v¶h? 000140
6A006A01 25680140 68F476FF F676FF00 000C769A 006A006A 006A006A 01256801 .hX.j.j.j.j..v....v-.v¶hа.hX.j.j 000160
419A006A 006A006A 006A0125 68014168 F476FFF6 76FF0000 0C8F9A00 6A006A01 .j.j.......v-.v¶hA.hX.j.j.j.j..A 000180
046AFC76 FFFE76FF F076FFF2 76FF0000 08829AF0 76FFF276 FF49FA46 C6000008 ...óF*|.v·.vþ......v·.vþ.v±.v=j. 0001A0
000008B0 9AF076FF F276FF00 2AE90375 00003DEE 46890000 089A9A50 16FA468D .F*.P......F¥=..u.Ô*..v·.vþ.¯... 0001C0
FF0011E9 00008800 0207C726 0E5EC400 0008C19A 0A76FF0C 76FF0196 68EE76FF .vŸh...v..v..ē...á^.&ú...¡..Ô... 0001E0

Dump of file SATURN:[PCCOMMON.DUMP.DLL]DAPROFDF.TMP;1 on 18-APR-1990 10:42:42.58
File ID (604,30,0) End of file block 88 / Allocated 88

Virtual block number 9 (00000009), 512 (0200) bytes

F3B81E56 57000012 C80012CA C95F5E1F 0000E900 00B80000 0BDA9AF0 76FFF276 v·.vþ.Ô...¡..Ô...^_èò..à...WV.¡x 000000
9A5016F8 46801476 FF1676FF 07892612 4688065E C4000107 C7260E5E C4D88E0B ..Ää^.&ú...á^..F.&¯..v..v..F½.P. 000020
9A5016F0 46801476 FF1676FF 00000C24 9A5016F4 46801476 FF1676FF 00000C14 .....v..v..F¶.P.$....v..v..Fþ.P. 000040
01256801 3F68F476 FFF676FF 00000C44 9A5016FC 46801476 FF1676FF 00000C34 4....v..v..F=.P.D....v-.v¶h?.hX. 000060
6A006A00 6A006A01 25680140 68F476FF F676FF00 0000929A 006A006A 006A006A j.j.j.j.......v-.v¶hа.hX.j.j.j.j 000080
C600000C 5D9A006A 006A016A 006A0125 68014168 F476FFF6 76FF0000 0DAB9A00 .. ....v-.v¶hA.hX.j.j.j.j..j...ó 0000A0
16FA468D 046AFC76 FFFE76FF F076FFF2 76FF0000 0C9E9AF0 76FFF276 FF4FFA46 F*O.v·.vþ......v·.vþ.v±.v=j..F*. 0000C0
68EE76FF 00000CCC 9AF076FF F276FF00 2AE90375 00003DEE 46890000 0C869A50 P.Ŕ....F¥=..u.Ô*..v·.vþ.ä....vŸh 0000E0
76FFF276 FF0011E9 00008800 0207C726 0E5EC400 000CDD9A 0A76FF0C 76FF0196 ...v..v..Ĭ...á^.&ú...¡..Ô...v·.v 000100
FFD88E0D 0FB81E56 57000010 C80012CA C95F5E1F 0000E900 00880000 0CF69AF0 þ.-...¡..Ô...^_èò..à...WV.¡...Ä. 000120
FF000000 509A5016 F4468008 76FF0A76 FF000000 409A5016 F8468008 76FF0A76 v..v..F½.P.а....v..v..F¶.P.P.... 000140
F2468006 6AFC76FF FE76FFF4 76FFF676 FF000000 609A5016 FC468008 76FF0A76 v..v..F=.P.'....v-.v¶.v±.v=j..F· 000160
FF013BE9 98F2468A 0163E900 00880006 E9037500 0030F046 89000009 509A5016 .P.P....Fþ=..u.Ô..¡..Ôc..F·.Ô;.. 000180
4368F876 FFFA76FF 00000EB0 9A006A00 6A016A00 6A012568 014268F8 76FFFA76 v*.v½hB.hX.j.j.j.j..§....v*.v½hC 0001A0
6A006A01 25680144 68F876FF FA76FF00 000E069A 006A006A 006A006A 01256801 .hX.j.j.j.j..ø....v*.v½h0.hX.j.j 0001C0
6A006A00 6A006A01 25680142 68F876FF FA76FF01 08E90000 0EF29A00 6A006A00 .j.j.. ...Ô...v*.v½hB.hX.j.j.j.j 0001E0

Dump of file SATURN:[PCCOMMON.DUMP.DLL]DAPROFDF.TMP;1 on 18-APR-1990 10:42:42.58
File ID (604,30,0) End of file block 88 / Allocated 88

Virtual block number 10 (0000000A), 512 (0200) bytes

FF00000F 249A006A 006A016A 006A0125 68014368 F876FFFA 76FF0000 0F089A00 .......v*.v½hC.hX.j.j.j.j..$.... 000000
76FFFA76 FF00BAE9 00000F40 9A006A00 6A006A00 6A012568 014468F8 76FFFA76 v*.v½hD.hX.j.j.j.j..а...Ôɒ..v*.v 000020
01256801 4368F876 FFFA76FF 00000F59 9A006A00 6A006A00 6A012568 014268F8 ½hB.hX.j.j.j.j..Y....v*.v½hC.hX. 000040
6A006A01 6A006A01 25680144 68F876FF FA76FF00 000F729A 006A006A 006A006A j.j.j.j..r....v*.v½hD.hX.j.j.j.j 000060
0FA79A00 6A006A1 6A006A01 25680142 68F876FF FA76FF00 6CE90000 0F8E9A00 ......Ôl..v*.v½hB.hX.j.j.j.j..Ĭ. 000080
76FFFA76 FF0000 C09A006A 006A006A 006A0125 68014368 F876FFFA 76FF0000 ...v*.v½hC.hX.j.j.j.j..å....v*.v 0000A0
E9037500 4E30001B E9001EE9 00000079 9A006A00 6A006A00 6A012568 014468F8 ½hD.hX.j.j.j.j..y...Ô..Ô..=N.u.Ô 0000C0
CAC95F5E 1F0000E9 000088FF 94E9FEFB E9037500 5430FF51 E9037500 533DFEBD §±=S.u.ÔQ.=T.u.Ô«±Ô..¡..Ô...^_èò 0000E0
FF078926 12468806 5EC40001 07C7260E 5EC4D88E 0E2BB81E 56570000 12C80006 ..à...WV.¡+..Ää^.&ú...á^..F.&¯... 000100
FF00000E 3B9A5016 F6468014 76FF1676 FF000000 309A5016 FA468014 76FF1676 v..v..F*.P.0....v..v..F-.P.;.... 000120
FF00000E 5B9A5016 FC468014 76FF1676 FF00000E 4B9A5016 F2468014 76FF1676 v..v..F·.P.K....v..v..F=.P.(.... 000140
4368F676 FFF876FF 0000107D 9A006A00 6A016A00 6A012568 014268F6 76FFF876 v½.v-hB.hX.j.j.j.j..)....v½.v-hC 000160
6A006A01 25680144 68F676FF F876FF00 0010969A 006A006A 006A006A 01256801 .hX.j.j.j.j.......v½.v-hD.hX.j.j 000180
FFF276FF F476FF00 0000BA9A F276FFF4 76FF4EF0 46C60000 0EA49A00 6A006A00 .j.j..Ê...óFþN.v¶.v·.ɒ....v¶.v·. 0001A0
FFF476FF 002AE903 7500003D EE468900 0000029A 5016F046 8D066AFC 76FFFE76 v±.v=j..Fþ.P.Ø....F¥=..u.Ô*..v¶. 0001C0
000207C7 260E5EC4 000000F9 9A0A76FF 0C76FF01 9668EE76 FF000000 E89AF276 v·.Ô....vŸh...v..v..*...á^.&ú... 0001E0

```
Dump of file SATURN:[PCCOMMON.DUMP.DLL]DAPROFDF.TMP;1 on 18-APR-1990 10:42:42.58
File ID (604,30,0)   End of file block 88 / Allocated 88

Virtual block number 11 (0000000B), 512 (0200) bytes

 12C80012 CAC95F5E 1F0000E9 00008800 000E129A F276FFF4 76FF0011 E9000088 |..Ô...v¶.v·.....|..Ô...^_èò..à. 000000
 76FF1676 FF078975 12468806 5EC40001 07C7260E 5EC4D88E 0FFAB81E 56570000 ..WV.|*..Äá^.&ú...á^..F.&¯...v..v 000020
 76FF1676 FF000010 2B9A5016 F6468014 76FF1676 FF000010 1B9A5016 FA468014 ..F*.P......v..v..F-.P.+....v..v 000040
 76FFF876 FF000010 4B9A5016 FC468014 76FF1676 FF000010 3B9A5016 F2468014 ..F·.P.;....v..v..F=.P.K....v½.v 000060
 01256801 4368F676 FFF876FF 00001199 9A006A00 6A006A00 6A012568 014268F6 -hB.h%.j.j.j.j.......v½.v-hC.h%. 000080
 6A006A00 6A006A01 25690144 68F676FF F876FF00 0011B29A 006A006A 016A006A j.j.j.j..ý....v½.v-hD.h%.j.j.j.j 0000A0
 76FFFE76 FFF276FF F476FF00 0010A59A F276FFF4 76FF54F0 46C60000 10''9A00 ..d...óFÞT.v¶.v·.E....v¶.v·.v±.v 0000C0
 D39AF276 FFF476FF 002AE903 75000030 EE468900 0010BD9A 5016F046 800c AFC •j..FÞ.P.§....FŸ=..u.Ô*..v¶.v·.Æ 0000E0
 E90000B8 000207C7 260E5EC4 000010E4 9A0A76FF 0C76FF01 9668EE76 FF00u·10 ....vŸh...v..v..Ô...á^.&ú...|..Ô 000100
 56570000 12C80012 CAC95F5E 1F0000E9 00008800 0010FD9A F276FFF4 76FF0011 ...v¶.v·.»...|..Ô...^_èò..à...WV 000120
 FA468D14 76FF1676 FF078926 12468806 5EC40001 07C7260E 5EC4D88E 1116B81E .|...Äá^.&ú...á^..F.&¯...v..v..F* 000140
 F2468D14 76FF1676 FF000011 479A5016 F6468014 76FF1676 FF000011 379A5016 .P.7....v..v..F-.P.G....v..v..F· 000160
 014268F6 76FFF876 FF000011 679A5016 FC468014 76FF1676 FF000011 579A5016 .P.W....v..v..F=.P.g....v½.v-hB. 000180
 006A006A 01256801 4368F676 FFF876FF 000012B5 9A006A00 6A006A00 6A012568 h%.j.j.j.j..ç....v½.v-hC.h%.j.j. 0001A0
 11809A00 6A006A01 6A006A01 25680144 68F676FF F876FF00 0012CE9A 006A006A j.j..ö....v½.v-hD.h%.j.j.j.j.... 0001C0
 80066AFC 76FFFE76 FFF276FF F476FF00 0011C19A F276FFF4 76FF53F0 46C60000 ..óFÞS.v¶.v·.ė....v¶.v·.v±.v•j.. 0001E0

Dump of file SATURN:[PCCOMMON.DUMP.DLL]DAPROFDF.TMP;1 on 18-APR-1990 10:42:42.58
File ID (604,30,0)   End of file block 88 / Allocated 88

Virtual block number 12 (0000000C), 512 (0200) bytes

 FF000011 EF9AF276 FFF476FF 002AE903 75000030 EE468900 0011D99A 5016F046 FÞ.P.l....FŸ=..u.Ô*..v¶.v·.y.... 000000
 76FF0011 E90000B8 000207C7 260E5EC4 00001200 9A0A76FF 0C76FF01 9668EE76 vŸh...v..v......á^.&ú...|..Ô...v 000020
 1232B81E 56570000 10C80012 CAC95F5E 1F0000E9 00008800 0012199A F276FFF4 ¶.v·.....|..Ô...^_èò..à...WV.|2. 000040
 12739A50 16F2468D 0876FF0A 76FF0000 12639A50 16F6468D 0876FF0A 76FFD88E .Á.v..v..F-.P.c....v..v..F·.P.s. 000060
 076AFC76 FFFE76FF F276FFF4 76FF0000 12839A50 16FC468D 0876FF0A 76FF0000 ...v..v..F•.P......v¶.v·.v±.v•j. 000080
 E998FA46 8A0163E9 00008800 06E90375 00003DF0 46890000 0E739A50 16FA468D .F*.P.s....FÞ=..u.Ô..|..Ôc..F*.Ô 0000A0
 76FFF876 FF000013 E09A006A 006A016A 006A0125 68014568 F676FFF8 76FF0138 ;..v½.v-hE.h%.j.j.j.j..Á....v½.v 0000C0
 01256801 4768F676 FFF876FF 000013F9 9A006A00 6A006A00 6A012568 014668F6 -hF.h%.j.j.j.j..*....v½.v-hG.h%. 0000E0
 006A006A 01256801 4568F676 FFF876FF 0108E900 0014159A 006A006A 006A006A j.j.j.j......Ô...v½.v-hE.h%.j.j. 000100
 14479A00 6A006A01 6A006A01 25680146 68F676FF F876FF00 00142E9A 006A006A j.j.......v½.v-hF.h%.j.j.j.j..G. 000120
 76FF00BA E9000014 639A006A 006A006A 006A0125 68014768 F676FFF8 76FF0000 ...v½.v-hG.h%.j.j.j.j..c...Ôo..v 000140
 014668F6 76FFF876 FF000014 7C9A006A 006A006A 006A0125 68014568 F676FFF8 ½.v-hE.h%.j.j.j.j..|....v½.v-hF. 000160
 016A006A 01256801 4768F676 FFF876FF 00001495 9A006A00 6A006A00 6A012568 h%.j.j.j.j.......v½.v-hG.h%.j.j. 000180
 006A006A 016A006A 01256801 4568F676 FFF876FF 006CE900 0014B19A 006A006A j.j..Y...Ôl..v½.v-hE.h%.j.j.j.j. 0001A0
 76FF0000 14E39A00 6A006A00 6A006A01 25680146 68F676FF F876FF00 0014CA9A .ò....v½.v-hF.h%.j.j.j.j..D....v 0001C0
 004E3000 1BE9001E E9000012 9C9A006A 006A006A 006A0125 68014768 F676FFF8 ½.v-hG.h%.j.j.j.j......Ô..Ô..=N. 0001E0

Dump of file SATURN:[PCCOMMON.DUMP.DLL]DAPROFDF.TMP;1 on 18-APR-1990 10:42:42.58
File ID (604,30,0)   End of file block 88 / Allocated 88

Virtual block number 13 (0000000D), 512 (0200) bytes

 5E1F0000 E90000B8 FF94E9FE FBE90375 005430FF 51E90375 005330FE 8DE90375 u.Ô§±=S.u.ÔQ.=T.u.Ô«±Ô..|..Ô...^ 000000
 2612468B 065EC400 0107C726 0E5EC4D8 8E134E88 1E565700 0012C800 06CAC95F _èò..à...WV.|N..Äá^.&ú...á^..F.& 000020
 135E9A50 16F4468D 1476FF16 76FF0000 12539A50 16F8468D 1476FF16 76FF0789 ¯...v..v..F½.P.S....v..v..F¶.P.^. 000040
 137E9A50 16FC468D 1476FF16 76FF0000 136E9A50 16F0468D 1476FF16 76FF0000 ...v..v..FÞ.P.n....v..v..F•.P.~. 000060
 76FFF676 FF000015 A09A006A 006A016A 006A0125 68014568 F476FFF6 76FF0000 ...v~.v¶hE.h%.j.j.j.j.......v~.v 000080
 01256801 4768F476 FFF676FF 000015B9 9A006A00 6A006A00 6A012568 014668F4 ¶hF.h%.j.j.j.j..¿....v~.v¶hG.h%. 0000A0
 FFF276FF 00001200 9AF076FF F276FF4E FA46C600 0013C79A 006A006A 006A006A j.j.j.j..ú...óF*N.v·.vÞ.T....v·. 0000C0
 FF002AE9 03750000 30EE4689 000012F5 9A5016FA 4680076A FC76FFFE 76FFF076 vÞ.v±.v=j..F*.P.%....FŸ=..u.Ô*.. 0000E0
 C7260E5E C4000013 1C9A0A76 FF0C76FF 019668EE 76FF0000 13089AF0 76FFF276 v·.vÞ......vŸh...v..v......á^.&ú 000100
 12CAC95F 5E1F0000 E90000B8 00001335 9AF076FF F276FF00 11E90000 B8000207 ...|..Ô...v·.vÞ.5...|..Ô...^_èò. 000120
 76FF0789 2612468B 065EC400 0107C726 0E5EC4D8 8E151D88 1E565700 0012C800 .à...WV.|...Äá^.&ú...á^..F.&¯...v 000140
 76FF0000 154E9A50 16F4468D 1476FF16 76FF0000 153E9A50 16F8468D 1476FF16 ..v..F½.P.>....v..v..F¶.?.N....v 000160
 76FF0000 156E9A50 16FC468D 1476FF16 76FF0000 155E9A50 16F0468D 1476FF16 ..v..FÞ.P.^....v..v..F•.ı n....v 000180
 014668F4 76FFF676 FF000016 BC9A006A 006A0C6A 006A0125 68014568 F476FFF6 -.v¶hE.h%.j.j.j.j..¥....v~.v¶hF. 0001A0
 006A006A 01256801 4768F476 FFF676FF 000016D5 9A006A00 6A016A00 6A012568 h%.j.j.j.j..Í....v~.v¶hG.h%.j.j. 0001C0
 76FFF076 FFF276FF 000015C8 9AF076FF F276FF54 FA46C600 0015879A 006A006A j.j......óF*T.v·.vÞ.à....v·.vÞ.v 0001E0
```

Dump of file SATURN:[PCCOMMON.DUMP.DLL]DAPROFDF.TMP;1 on 18-APR-1990 10:42:42.58
File ID (604,30,0)   End of file block 88 / Allocated 88

Virtual block number 14 (0000000E), 512 (0200) bytes

76FFF276 FF002AE9 03750000 3DEE4689 000015E0 9A5016FA 468D076A FC76FFFE ±.v•j..F°.P.Å....FŸ=..u.Õ*..v·.v 000000
88000207 C7260E5E C4000016 079A0A76 FF0C76FF 019668EE 76FF0000 15F69AF0 Þ.-....vŸh...v..v......á^.&ú...¡ 000020
0012C800 12CAC95F 5E1F0000 E90000B8 00001620 9AF076FF F276FF00 11E90000 ..Ȯ...v·.vÞ. ...¡..Ö...^_èò..à.. 000040
1476FF16 76FF0:89 26124688 065EC400 0107C726 0E5EC408 8E163988 1E565700 .WV.¡9..Äá^.&ú...á^..F.&¯...v..v. 000060
1476FF16 76FF0000 166A9A50 16F44680 1476FF16 76FF0000 165A9A50 16F84680 .F%.P.Z....v..v..F¶.P.j....v..v. 000080
F476FFF6 76FF0000 168A9A50 16FC4680 1476FF16 76FF0000 167A9A50 16F04680 .FÞ.P.z....v..v..F•.P......v-.v¶ 0000A0
6A012568 014668F4 76FFF676 FF000016 A39A006A 006A006A 006A0125 68014568 hE.hX.j.j.j.j..£....v-.v¶hF.hX.j 0000C0
006A006A 016A006A 01256801 4768F476 FFF676FF 000017F1 9A006A00 6A006A00 .j.j.j..þ....v-.v¶hG.hX.j.j.j.j. 0000E0
FC76FFFE 76FFF076 FFF276FF 000016E4 9AF076FF F276FF53 FA46C600 0017BF9A .¢...óF°S.v·.vÞ.ð....v·.vÞ.v±.v• 000100
17129AF0 76FFF276 FF002AE9 03750000 3DEE4689 000016FC 9A5016FA 468D076A ¦..F°.P.•....FŸ=..u.Õ*..v·.vÞ... 000120
11E90000 88000207 C7260E5E C4000017 239A0A76 FF0C76FF 019668EE 76FF0000 ...vŸh...v..v..#...á^.&ú...¡..Õ. 000140
1E565700 0010C800 12CAC95F 5E1F0000 E90000B8 0000173C 9AF076FF F276FF00 ..v·.vÞ.<...¡..Õ...^_èò..à...WV. 000160
5016F446 800876FF 0A76FF00 0017869A 5016F846 800876FF 0A76FFD8 8E1755B8 ¡U..Å.v..v..F%.P.......v..v..F¶.P 000180
76FFFE76 FFF476FF F676FF00 0017A69A 5016FC46 800876FF 0A76FF00 0017969A ......v..v..F•.P.¦....v-.v¶.v±.v 0001A0
468A0236 E90000B8 0006E903 7500003D F0468900 0013969A 5016F246 8D086AFC •j..F·.P......FÞ=..u.Õ..¡..Õ6..F 0001C0
76FF0000 19039A00 6A006A01 6A006A01 25680148 68F876FF FA76FF02 06E998F2 ·.Õ...v°.v½hH.hX.j.j.j.j.......v 0001E0

Dump of file SATURN:[PCCOMMON.DUMP.DLL]DAPROFDF.TMP;1 on 18-APR-1990 10:42:42.58
File ID (604,30,0)   End of file block 88 / Allocated 88

Virtual block number 15 (0000000F), 512 (0200) bytes

014A68F8 76FFFA76 FFU00019 1C9A006A 006A006A 006A0125 68014968 F876FFFA °.v½hI.hX.j.j.j.j.......v°.v½hJ. 000000
006A006A 01256801 4B68F876 FFFA76FF 00001935 9A006A00 6A006A00 6Au ?568 hX.j.j.j.j..5....v°.v½hK.hX.j.j. 000020
006A006A 006A006A 01256801 4B68F876 FFFA76FF 01C2E900 0019519A 006A J6A j.j..Q...Öö..v°.v½hH.hX.j.j.j.j. 000040
76FF0000 19B39A00 6A006A01 6A006A01 25680149 68F876FF FA76FF00 00196A9A .j....v°.v½hI.hX.j.j.j.j.......v 000060
014B68F8 76FFFA76 FF000019 9C9A006A 006A006A 006A0125 68014A68 F876FFFA °.v½hJ.hX.j.j.j.j.......v°.v½hK. 000080
6A012568 014B68F8 76FFFA76 FF015BE9 00001988 9A006A00 6A006A00 6A012568 hX.j.j.j.j..¡...Ö[..v°.v½hH.hX.j 0000A0
006A006A 006A006A 01256801 4968F876 FFFA76FF 000019D1 9A006A00 6A006A00 .j.j.j..Ñ....v°.v½hI.hX.j.j.j.j. 0000C0
76FF0000 1A039A00 6A006A01 6A006A01 2568014A 68F876FF FA76FF00 0019EA9A .ð....v°.v½hJ.hX.j.j.j.j.......v 0000E0
F876FFFA 76FF00F4 E900001A 1F9A006A 006A006A 006A0125 68014B68 F876FFFA °.v½hK.hX.j.j.j.j......ô¶..v°.v½ 000100
6A012568 014968F8 76FFFA76 FF00001A 389A006A 006A006A 006A0125 68014B68 hH.hX.j.j.j.j..8....v°.v½hI.hX.j 000120
006A006A 006A006A 01256801 4A68F876 FFFA76FF 00001A51 9A006A00 6A006A00 .j.j.j..Q....v°.v½hJ.hX.j.j.j.j. 000140
8DE90000 1A869A00 6A006A01 6A006A01 2568014B 68F876FF FA76FF00 001A6A9A .j....v°.v½hK.hX.j.j.j.j......Ö. 000160
F876FFFA 76FF0000 1A9F9A00 6A006A01 6A006A01 2568014B 68F876FF FA76FF00 ..v°.v½hH.hX.j.j.j.j.......v°.v½ 000180
6A012568 014A68F8 76FFFA76 FF00001A B89A006A 006A006A 006A0125 68014968 hI.hX.j.j.j.j..¡....v°.v½hJ.hX.j 0001A0
006A006A 006A006A 01256801 4B68F876 FFFA76FF 00001AD1 9A006A00 6A006A00 .j.j.j..Ñ....v°.v½hK.hX.j.j.j.j. 0001C0
03750053 3DFE51E9 03750048 3DFDF2E9 03750043 300023E9 0026E900 0017D89A .Å...Ö&.Ö#.=C.u.Õ·»=K.u.Öö±=S.u. 0001E0

Dump of file SATURN:[PCCOMMON.DUMP.DLL]DAPROFDF.TMP;1 on 18-APR-1990 10:42:42.58
File ID (604,30,0)   End of file block 88 / Allocated 88

Virtual block number 16 (00000010), 512 (0200) bytes

57000012 C80006CA C95F5E1F 0000E900 0088FF73 E9FF0FE9 03750054 3DFEB0E9 Õ¯±=T.u.Õ..Õs.¡..Õ...^_Þò..à...W 000000
46801476 FF1676FF 07892612 4688065E C4000107 C7260E5E C4088E18 71B81E56 V.jq..Äá^.&ú...á^..F.&¯.. v..v..F 000020
46801476 FF1676FF 00001881 9A5016F6 46801476 FF1676FF 00001776 9A5016FA °.P.v....v..v..F-.P.......v..v..F 000040
4868F676 FFF876FF 000018A1 9A5016FC 46801476 FF1676FF 00001891 9A5016F2 ·.P......v..v..F•.P.Å....v½.v-hH 000060
6A006A01 25680149 68F676FF F876FF00 001B969A 006A006A 016A006A 01256801 .hX.j.j.j.j.......v½.v-hI.hX.j.j 000080
C89A006A 006A006A 006A0125 68014A68 F676FFF8 76FF0000 1BAF9A00 6A006A00 .j.j..£....v½.v-hJ.hX.j.j.j.j..à 0000A0
43F046C6 000018EA 9A006A00 6A006A00 6A012568 014B68F6 76FFF876 FF00001B ....v½.v-hK.hX.j.j.j.j..ð...óFÞC 0000C0
189A5016 F0468D08 6AFC76FF FE76FFF2 76FFF476 FF000018 009AF276 FFF476FF .v¶.v·......v¶.v·.v±.v•j..FÞ.P.. 0000E0
FF019668 EE76FF00 0018E9A F276FFF4 76FF002A E9037500 003DEE46 89000018 ....FŸ=..u.Õ*..v¶.v·......vŸh... 000100
589AF276 FFF476FF 0011E900 00880002 07C7260E 5EC40000 183F9A0A 76FF0C76 v..v..?...á^.&ú...¡..Õ...v¶.v·.X 000120
260E5EC4 D88E1B13 881E5657 000012C8 0012CAC9 5F5E1F00 00E90000 88000018 ...¡..Õ...^_èò..à...WV.¡...Äá^.& 000140
1676FF00 001B349A 5016FA46 801476FF 1676FF07 89261246 88065EC4 000107C7 ú...á^..F.&¯...v..v..F°.P.4....v. 000160
1676FF00 0018549A 5016F246 801476FF 1676FF00 0018449A 5016F646 801476FF .v..F-.P.D....v..v..F·.P.T....v. 000180
6A006A00 6A006A01 25680148 68F676FF F876FF00 0018649A 5016FC46 801476FF .v..F•.P.d....v½.v-hH.hX.j.j.j.j 0001A0
FF00001C E49A006A 006A016A 006A0125 68014968 F676FFF8 76FF0000 1CC89A00 ..ù....v½.v-hI.hX.j.j.j.j..ð.... 0001C0
4868F676 FFF876FF 00001CFD 9A006A00 6A006A00 6A012568 014A68F6 76FFF876 v½.v-hJ.hX.j.j.j.j..»....v½.v-hK 0001E0

```
Dump of file SATURN:[PCCOMMON.DUMP.DLL]DAPROFDF.TMP;1 on 18-APR-1990 10:42:42.58
File ID (604,30,0)   End of file block 88 / Allocated 88

Virtual block number 17 (00000011), 512 (0200) bytes

00001BD7 9AF276FF F476FF4B F046C600 0018709A 006A006A 006A006A 01256801 .h%.j.j.j.j..)...6FPK.v¶.v..■... 000000
03750000 30EE4689 000018EF 9A5016F0 4680086A FC76FFFE 76FFF276 FFF476FF .v¶.v..v±.v▪j..FP.P.ÿ....FY=..u. 000020
C400001C 169A0A76 FF0C76FF 019668EE 76FF0000 1C059AF2 76FFF476 FF002AE9 Ö*..v¶.v.......vYh...v..v......é 000040
5E1F0000 E90000B8 00001C2F 9AF276FF F476FF00 11E90000 B8000207 C7260E5E ^.&ú...¡..Ö...v¶.v../...¡..Ö...^ 000060
26124688 065EC400 0^07C726 0E5EC4D8 8E1C4888 1E565700 0012C800 12CAC95F _èò..à...WV.¡H..Äé^.&ú...é^..F.& 000080
1C799A50 16F64680 1476FF16 76FF0000 1C699A50 16FA4680 1476FF16 76FF0789 ...v..v..F*.P.i....v..v..F-.P.y. 0000A0
1C999A50 16FC4680 1476FF16 76FF0000 1C899A50 16F24680 1476FF16 76FF0000 ...v..v..F..P.......v..v..F=.P... 0000C0
76FFF876 FF00001E 009A006A 006A006A 006A0125 68014868 F676FFF8 76FF0000 ...v½.v-hH.h%.j.j.j.j.......v½.v 0000E0
01256801 4A68F676 FFF876FF 00001E19 9A006A00 6A006A00 6A012568 014968F6 -hI.h%.j.j.j.j.......v½.v-hJ.h%. 000100
6A006A00 6A006A01 2568014B 68F676FF F876FF00 001E329A 006A006A 016A006A j.j.j.j..2....v½.v-hK.h%.j.j.j.j 000120
76FFFE76 FFF276FF F476FF00 001D0C9A F276FFF4 76FF53F0 46C60000 1CB29A00 ..ÿ...6FPS.v¶.v.......v¶.v..v±.v 000140
3A9AF276 FFF476FF 002AE903 7500003D EE468900 001D249A 5016F046 80086AFC ▪j..FP.P.$....FY=..u.Ö*..v¶.v..: 000160
E90000B8 000207C7 260E5EC4 00001D4B 9A0A76FF 0C76FF01 9668EE76 FF00001D ....vYh...v..v..K...é^.&ú...¡..Ö 000180
56570000 12C80012 CAC95F5E 1F0000E9 0000B800 0010649A F276FFF4 76FF0011 ...v¶.v..d...¡..Ö...^_èò..à...WV 0001A0
FA468014 76FF1676 FF078926 1246B806 5EC40001 07C7260E 5EC4D88E 1D7D881E .¡)..Aé^.&ú...é^..F.&...v..v..F* 0001C0
F2468014 76FF1676 FF00001D AE9A5016 F6468014 76FF1676 FF00001D 9E9A5016 .P.......v..v..F-.P.Û....v..v..F. 0001E0

Dump of file SATURN:[PCCOMMON.DUMP.DLL]DAPROFDF.TMP;1 on 18-APR-1990 10:42:42.58
File ID (604,30,0)   End of file block 88 / Allocated 88

Virtual block number 18 (00000012), 512 (0200) bytes

014868F6 76FFF876 FF00001D CE9A5016 FC468014 76FF1676 FF00001D BE9A5016 .P./....v..v..F=.P.ö....v½.v-hH. 000000
006A006A 01256801 4968F676 FFF876FF 00001F35 9A006A00 6A006A00 6A012568 h%.j.j.j.j..5....v½.v-hI.h%.j.j. 000020
1F679A00 6A006A00 6A006A01 2568014A 68F676FF F876FF00 001F4E9A 006A006A j.j..N....v½.v-hJ.h%.j.j.j.j..g. 000040
FF54F046 C600001D E79A006A 006A016A 006A0125 68014B68 F676FFF8 76FF0000 ...v½.v-hK.h%.j.j.j.j..Ö...6FPT. 000060
1E599A50 16F04680 086AFC76 FFFE76FF F276FFF4 76FF0000 1E419AF2 76FFF476 v¶.v..A....v¶.v..v±.v▪j..FP.P.Y. 000080
76FF0196 68EE76FF 00001E6F 9AF276FF F476FF00 2AE90375 00003DEE 46890000 ...FY=..u.Ö*..v¶.v..o....vYh...v 0000A0
1E999AF2 76FFF476 FF0011E9 0000B800 0207C726 0E5EC400 001E809A 0A76FF0C ..v.......é^.&ú...¡..Ö...v¶.v.... 0000C0
76FF0A76 FFD88E1E 82B81E56 57000010 C80012CA C95F5E1F 0000E900 00B80000 ..¡..Ö...^_èò..à...WV.¡ý..Å.v..v 0000E0
76FF0A76 FF00001E F39A5016 F2468008 76FF0A76 FF00001E E39A5016 F6468008 ..F-.P.Ð....v..v..F..P.µ....v..v 000100
B99A5016 FA468009 6AFC76FF FE76FFF2 76FFF476 FF00001F 039A5016 FC468008 ..F▪.P......v¶.v..v±.v▪j..F*.P.¿ 000120
76FFF876 FF0206E9 98FA468A 0236E900 00B80006 E9037500 0030F046 89000018 ....FP=..u.Ö..¡..Ö6..F*.Ö...v½.v 000140
01256801 4068F676 FFF876FF 00002079 9A006A00 6A016A00 6A012568 014C68F6 -hL.h%.j.j.j.j..y ...v½.v-hM.h%. 000160
6A006A00 6A006A01 2568014E 68F676FF F876FF00 0020929A 006A006A 006A006A j.j.j.j... ...v½.v-hN.h%.j.j.j.j 000180
E9000020 C79A006A 006A006A 006A0125 68014F68 F676FFF8 76FF0000 20A0.. 00 ..^ ...v½.v-hO.h%.j.j.j.j..ú ..Ö 0001A0
76FFF876 FF000020 E09A006A 006A006A 006A0125 68014C68 F676FFF8 76FF01 ? ö..v½.v-hL.h%.j.j.j.j..Å ...v½.v 0001C0
01256801 4E68F676 FFF876FF 000020F9 9A006A00 6A016A00 6A012568 014D68F. -hM.h%.j.j.j.j..* ...v½.v-hN.h%. 0001E0

Dump of file SATURN:[PCCOMMON.DUMP.DLL]DAPROFDF.TMP;1 on 18-APR-1990 10:42:42.58
File ID (604,30,0)   End of file block 88 / Allocated 88

Virtual block number 19 (00000013), 512 (0200) bytes

6A006A00 6A006A01 2568014F 68F676FF F876FF00 0021129A 006A006A 006A006A j.j.j.j...!...v½.v-hO.h%.j.j.j.j 000000
21479A00 6A006A00 6A006A01 2568014C 68F676FF F876FF01 5BE90000 212E9A00 ...!..Ö[..v½.v-hL.h%.j.j.j.j..G! 000020
76FFF876 FF000021 609A006A 006A006A 006A0125 68014D68 F676FFF8 76FF0000 ...v½.v-hM.h%.j.j.j.j..'!...v½.v 000040
01256801 4F68F676 FFF876FF 00002179 9A006A00 6A016A00 6A012568 014E68F6 -hN.h%.j.j.j.j..y!...v½.v-hO.h%. 000060
006A006A 01256801 4C68F676 FFF876FF 00F4E900 0021959A 006A006A 006A006A j.j.j.j...!..Ö¶..v½.v-hL.h%.j.j. 000080
1F1C9A00 6A006A00 6A006A01 25680140 68F676FF F876FF00 0021AE9A 006A006A j.j..Û!...v½.v-hM.h%.j.j.j.j.... 0000A0
76FFF876 FF000021 E09A006A 006A006A 006A0125 68014E68 F676FFF8 76FF0000 ...v½.v-hN.h%.j.j.j.j..Å!...v½.v 0000C0
014C68F6 76FFF876 FF0080E9 000021FC 9A006A00 6A016A00 6A012568 014F68F6 -hO.h%.j.j.j.j..▪!..Ö...v½.v-hL. 0000E0
006A006A 01256801 4D68F676 FFF876FF 00002215 9A006A00 6A016A00 6A012568 h%.j.j.j.j..."...v½.v-hM.h%.j.j. 000100
22479A00 6A006A00 6A006A01 2568014E 68F676FF F876FF00 00222E9A 006A006A j.j..."...v½.v-hN.h%.j.j.j.j..G" 000120
23E90026 E9000020 609A006A 006A006A 006A0125 68014F68 F676FFF8 76FF0000 ...v½.v-hO.h%.j.j.j.j..' ..Ö&.Ö# 000140
0FE90375 00543DFE 80E90375 00533DFE 51E90375 004B30FD F2E90375 00433000 .=C.u.Ö.▪=K.u.Ö0±=S.u.Ö¯±=T.u.Ö. 000160
0E5EC4D8 8E1FE7B8 1E565700 0012C800 06CAC95F 5E1F0000 E90000B8 FF73E9FF .Ös.¡..Ö...^_èò..à...WV.¡Ö..Äé^. 000180
76FF0000 1E039A50 16F84680 1476FF16 76FF0789 26124688 065EC400 0107C726 &ú...é^..F.&...v..v..F½.P.Æ....v 0001A0
76FF0000 20079A50 16F04680 1476FF16 76FF0000 1FF79A50 16F44680 1476FF16 ..v..F¶.P.¥....v..v..FP.P.. ...v 0001C0
006A016A 006A0125 68014C68 F476FFF6 76FF0000 20179A50 16FC4680 1476FF16 ..v..F▪.P.. ...v-.v¶hL.h%.j.j.j. 0001E0
```

Dump of file SATURN:[PCCOMMON.DUMP.DLL]DAPROFDF.TMP;1 on 18-APR-1990 10:42:42.58
File ID (604,30,0)   End of file block 88 / Allocated 88

Virtual block number 20 (00000014), 512 (0200) bytes

```
00002325 9A006A00 6A006A00 6A012568 014D68F4 76FFF676 FF000023 0C9A006A j...#...v~.v¶hM.hX.j.j.j.j..X#.. 000000
68F476FF F676FF00 00233E9A 006A006A 006A006A 01256801 4E68F476 FFF676FF .v~.v¶hN.hX.j.j.j.j..>#...v~.v¶h 000020
001F769A F076FFF? 76FF43FA 46C60000 21C79A00 6A006A00 6A006A01 2568014F O.hX.j.j.j.j..úl..óF*C.v·.vÞ.v.. 000040
75000030 EE46890C 001F8E9A 5016FA46 8D096AFC 76FFFE76 FFF076FF F276FF00 ..v·.vÞ.vt.vej..F*.P......FY=..u 000060
00001FB5 9A0A76FF 1C76FF01 9668EE76 FF00001F A49AF076 FFF276FF 002AE903 .Õ*..v·.vÞ.Ê....vYh...v..v..ç... 000080
1F0000E9 00008800 001FCE9A F076FFF2 76FF0011 E9000088 000207C7 260E5EC4 á^.&ú...|..Õ...v·.vÞ.ó...|..Õ... 0000A0
12468806 5EC40001 07C7260E 5EC4088E 22B9881E 56570000 12C80012 CAC95F5E ^_èò..à...WV.|."Äá^.&ú...á^..F. 0000C0
8A9A5016 F4468014 76FF1676 FF000022 AA9A5016 F8468014 76FF1676 FF078926 &...v..v..F%.P.`"...v..v..F¶.P.a 0000E0
DA9A5016 FC468014 76FF1676 FF000022 CA9A5016 F0468014 76FF1676 FF000022 "...v..v..FÞ.P.ò"...v..v..F=.P.Ö 000100
FFF676FF 00002441 9A006A00 6A006A00 6A012568 014C68F4 76FFF676 FF000022 "...v~.v¶hL.hX.j.j.j.j..'$...v~. 000120
2568014E 68F476FF F676FF00 00245A9A 006A006A 016A006A 01256801 4D68F476 v¶hM.hX.j.j.j.j..Z$...v~.¶hN.hX 000140
006A006A 006A0125 68014F68 F476FFF6 76FF0000 24739A00 6A006A00 6A006A01 .j.j.j.j..s$...v~.v¶hO.hX.j.j.j. 000160
FFFE76FF F076FFF2 76FF0000 234D9AF0 76FFF276 FF4BFA46 C6000022 F39A006A j..µ"..óF*K.v·.vÞ.M#...v·.vÞ.vt. 000180
9AF076FF F276FF00 2AE90375 000030EE 46890000 23659A50 16FA4680 096AFC76 v=j..F*.P.e#...FY=..u.Õ*..v·.vÞ. 0001A0
00008800 0207C726 0E5EC400 00238C9A 0A76FF0C 76FF0196 68EE76FF 0000237B (#...vYh...v..v...#..á^.&ú...|.. 0001C0
57000012 C80012CA C95F5E1F 0000E900 00880000 23A59AF0 76FFF276 FF0011E9 Õ...v·.vÞ.E#..|..Õ...^_èò..à...W 0001E0
```

Dump of file SATURN:[PCCOMMON.DUMP.DLL]DAPROFDF.TMP;1 on 18-APR-1990 10:42:42.58
File ID (604,30,0)   End of file block 88 / Allocated 88

Virtual block number 21 (00000015), 512 (0200) bytes

```
46801476 FF1676FF 07892612 4688065E C4000107 C7260E5E C4D88E23 BEB81E56 V.|/#.Äá^.&ú...á^..F.&...v..v..F 000000
46801476 FF1676FF 000023EF 9A5016F4 46801476 FF1676FF 000023DF 9A5016F8 %.P.Õ#...v..v..F¶.P.y#...v..v..F 000020
4C68F476 FFF676FF 0000240F 9A5016FC 46801476 FF1676FF 000023FF 9A5016F0 Þ.P..#...v..v..F=.P..$...v~.v¶hL 000040
6A006A01 2568014D 68F476FF F676FF00 0025769A 006A006A 006A006A 01256801 .hX.j.j.j.j..vX...v~.v¶hM.hX.j.j 000060
A89A006A 006A016A 006A0125 68014E68 F476FFF6 76FF0000 258F9A00 6A006A00 .j.j...X...v~.v¶hN.hX.j.j.j.j..` 000080
53FA46C6 00002428 9A006A00 6A006A00 6A012568 014F68F4 76FFF676 FF000025 X...v~.v¶hO.hX.j.j.j.j..($..óF*S 0000A0
9A9A5016 FA468D09 6AFC76FF FE76FFF0 76FFF276 FF000024 829AF076 FFF276FF .v·.vÞ..$...v·.vÞ.vt.vej..F*.P.. 0000C0
FF019668 EE76FF00 0024809A F076FFF2 76FF002A E9037500 0030EE46 89000024 $...FY=..u.Õ*..v·.vÞ.¯$...vYh... 0000E0
DA9AF076 FFF276FF 0011E900 00880002 07C7260E 5EC40000 24C19A0A 76FF0C76 v..v..è$..á^.&ú...|..Õ...v·.vÞ.Ö 000100
260E5EC4 D88E24F3 B81E5657 000012C8 0012CAC9 5F5E1F00 00E90000 88000024 $..|..Õ...^_èò..à...WV.|µ$.Äá^.& 000120
1676FF00 0025149A 5016F846 8D1476FF 1676FF07 89261246 88065EC4 000107C7 ú...á^..F.&...v..v..F%.P..X...v. 000140
1676FF00 0025349A 5016F046 8D1476FF 1676FF00 0025249A 5016F446 8D1476FF .v..F¶.P.$X...v..v..FÞ.P.4X...v. 000160
6A006A00 6A006A01 2568014C 68F476FF F676FF00 0025449A 5016FC46 8D1476FF .v..F=.P.DX...v~.v¶hL.hX.j.j.j.j 000180
FF000026 C49A006A 006A006A 006A0125 68014D68 F476FFF6 76FF0000 26AB9A00 ..`&...v~.v¶hM.hX.j.j.j.j..á&... 0001A0
4F68F476 FFF676FF 000026DD 9A006A00 6A006A00 6A012568 014E68F4 76FFF676 v~.v¶hN.hX.j.j.j.j..\&...v~.v¶hO 0001C0
000025B7 9AF076FF F276FF54 FA46C600 00255D9A 006A006A 016A006A 01256801 .hX.j.j.j.j..]X..óF*T.v·.vÞ.ñX.. 0001E0
```

Dump of file SATURN:[PCCOMMON.DUMP.DLL]DAPROFDF.TMP;1 on 18-APR-1990 10:42:42.58
File ID (604,30,0)   End of file block 88 / Allocated 88

Virtual block number 22 (00000016), 512 (0200) bytes

```
03750000 30EE4689 000025CF 9A5016FA 468D096A FC76FFFE 76FFF076 FFF276FF .v·.vÞ.vt.vej..F*.P.üX...FY=..u. 000000
C4000025 F69A0A76 FF0C76FF 019668EE 76FF0000 25E59AF0 76FFF276 FF002AE9 Õ*..v·.vÞ.|X...vYh...v..v..-X..á 000020
5E1F0000 E9000088 0000260F 9AF076FF F276FF00 11E90000 88000207 C7260E5E ^.&ú...|..Õ...v·.vÞ..&..|..Õ...^ 000040
0026599A 5016F646 8D0876FF 0A76FFD8 8E262888 1E565700 0010C800 12CAC95F _èò..à...WV.|(&.Ä.v..v..F-.P.Y&. 000060
0026799A 5016FC46 8D0876FF 0A76FF00 0026699A 5016F246 8D0876FF 0A76FF00 ..v..v..F·.P.i&...v..v..F=.P.y&. 000080
7500003D F0468900 002C?F9A 5016FA46 8D0A6AFC 76FFFE76 FFF276FF F476FF00 ..v¶.v·.vt.vej..F*.P./ ...FÞ=..u 0000A0
6A006A01 25680159 68F676FF F876FF00 A2E998FA 468A00C2 E9000088 000``903 .Õ..|..Õò..F*.ÕÅ..v%.v-hY.hX.j.j 0000C0
089A006A 006A006A 006A0125 68015A68 F676FFF8 76FF0000 26929A00 6A00< 01 .j.j...&...v%.v-hZ.hX.j.j.j.j... 0000E0
FF000028 249A006A 006A006A 006A0125 68015968 F676FFF8 76FF0080 E9000_8 (..Õ...v%.v-hY.hX.j.j.j.j..$(... 000100
76FFF876 FF004BE9 00002840 9A006A00 6A016A00 6A012568 015A68F6 76FFF876 v%.v-hZ.hX.j.j.j.j..@(..ÕK..v%.v 000120
01256801 5A68F676 FFF876FF 00002859 9A006A00 6A016A00 6A012568 015968F6 -hY.hX.j.j.j.j..Y(...v%.v-hZ.hX. 000140
03750054 3DFF56E9 03750053 300013E9 0016E900 0027D69A 006A006A 006A006A j.j.j.j..ø'..Õ..Õ..=S.u.ÕV.=T.u. 000160
C4D88E27 5DB81E56 57000012 C80006CA C95F5E1F 0000E900 0088FFB5 E9FF83E9 Õ..Õç.|..Õ...^_èò..à...WV.|]'.Äá 000180
00002649 9A5016F8 46801476 FF1676FF 07892612 4688065E C4000107 C7260E5E ^.&ú...á^..F.&...v..v..F%.P.I&.. 0001A0
0000277D 9A5016F0 46801476 FF1676FF 0000276D 9A5016F4 46801476 FF1676FF .v..v..F¶.P.m'...v..v..FÞ.P.}'.. 0001C0
FF000026 EC9AF076 FFF276FF 53FA46C6 0000278D 9A5016FC 46801476 FF1676FF .v..v..F=.P..'..óF*S.v·.vÞ.ì&... 0001E0
```

Dump of file SATURN:[PCCOMMON.DUMP.DLL]DAPROFDF.TMP;1 on 18-APR-1990 10:42:42.58
File ID (604,30,0)   End of file block 88 / Allocated 88

Virtual block number 23 (00000017), 512 (0200) bytes

```
E9037500 0030EE46 89000027 049A5016 FA468D0A 6AFC76FF FE76FFF0 76FFF276 v·.vÞ.v±.v•j..F*.P..'...FŸ=..u.Õ 000000
5EC40000 2728 9A0A 76FF0C76 FF019668 EE76FF00 00271A9A F076FFF2 76FF002A *..v·.vÞ..'...vŸh...v..v..+'..á^ 000020
015968F4 76FFF6/6 FF000027 449AF076 FFF276FF 0043E900 00880002 07C7260E .&ú...¡..ÕC..v·.vÞ.D'...v-.v¶hY. 000040
006A006A 01256801 5A68F476 FFF676FF 00002975 9A006A00 6A016A00 6A012568 hX.j.j.j.j..u)...v-.v¶hZ.hX.j.j. 000060
288B881E 56570000 12C80012 CAC95F5E 1F0000E9 00008800 0027EF9A 006A006A j.j..y'..¡..Õ...^_èÒ..à...WV.¡.( 000080
AC9A5016 F8468D14 76FF1676 FF078926 12468806 5EC40001 07C7260E 5EC4D88E .Áá^.&ú...á^..F.&...v..v..F½.P.¯ 0000A0
CC9A5016 F0468D14 76FF1676 FF000028 8C9A5016 F4468D14 76FF1676 FF000028 (...v..v..F¶.P.¥(...v..v..FÞ.P.à 0000C0
28E89AF0 76FFF276 FF54FA46 C6000028 DC9A5016 FC468D14 76FF1676 FF000028 (...v..v..F•.P.É(..óF*T.v·.vÞ.Š( 0000E0
00003DEE 46890000 29039A50 16FA468D 0A6AFC76 FFFE76FF F076FFF2 76FF0000 ...v·.vÞ.v±.v•j..F*.P..)...FŸ=.. 000100
00292A9A 0A76FF0C 76FF0196 68EE76FF 00002919 9AF076FF F276FF00 2AE90375 u.Õ*..v·.vÞ..)...vŸh...v..v..*). 000120
F476FFF6 76FF0000 29439AF0 76FFF276 FF0043E9 00008800 0207C726 0E5EC400 .á^.&ú...¡..ÕC..v·.vÞ.C)...v-.v¶ 000140
6A012568 015A68F4 76FFF676 FF00002A 789A006A 006A006A 006A0125 68015968 hY.hX.j.j.j.j..x*...v-.v¶hZ.hX.j 000160
1E565700 0010C800 12CAC95F 5E1F0000 E90000B8 0000295C 9A006A00 6A016A00 .j.j.j..\)..¡..Õ...^_èÒ..à...WV. 000180
5016F446 8D0876FF 0A76FF00 0029BF9A 5016F846 8D0876FF 0A76FFD8 8E298E88 ¡.).Á.v..v..F½.P.¢)...v..v..F¶.P 0001A0
76FFFE76 FFF476FF F676FF00 00290F9A 5016FC46 8D0876FF 0A76FF00 0029CF9A .u)...v..v..F•.P.Ô)...v-.v¶.v±.v 0001C0
7E800044 E90000B8 0006E903 7500003D F0468900 0027A59A 5016F246 800B6AFC •j..F·.P.É'...FÞ=..u.Õ..¡..ÕD..~ 0001E0
```

Dump of file SATUR-:[PCCOMMON.DUMP.DLL]DAPROFDF.TMP;1 on 18-APR-1990 10:42:42.58
File ID (604,30,0)   End of file block 88 / Allocated 88

Virtual block number 24 (00000018), 512 (0200) bytes

```
00002828 9A006A00 6A016A00 6A012568 012168F8 76FFFA76 FF001CE9 037459F2 ·Yt.Õ...v*.v½hl.hX.j.j.j.j..(+.. 000000
E9000088 00002A5F 9A006A00 6A006A00 6A012568 012168F8 76FFFA76 FF0019E9 Õ...v*.v½hl.hX.j.j.j.j.._*..¡..Õ 000020
065EC400 0107C726 0E5EC4D8 8E2A9188 1E565700 0014C800 06CAC95F 5E1F0000 ...^_èÒ..à...WV.¡.*.Ää^.Ëú...á^. 000040
16F8468D 1476FF16 76FF0000 29AF9A50 16FC468D 1476FF16 76FF0789 2612468B .F.&...v..v..F•.P.£)...v..v..F½. 000060
16EC468D 1476FF16 76FF0000 2AB19A50 16F4468D 1476FF16 76FF0000 2AA19A50 P.Å*...v..v..F¶.P.Ý*...v..v..Fâ. 000080
0800002C 469A006A 006A006A 006A0124 681276FF F876FFFA 76FF0000 2AC19A50 P.é*...v*.v½.v.h$.j.j.j.j..F,... 0000A0
76FFF676 FF59F246 C60001FE 46C70009 E94EF246 C60000FE 46C7000C E9037500 Åu.Õ..úF±..óF·NÕ..úF±..óF·Y.v-.v 0000C0
46890000 2A069A50 16F2468D 086AEC76 FFEE76FF F476FFF6 76FF0000 29EE9AF4 ¶.Ÿ)...v-.v¶.vŸ.vâj..F·.P..*...F 0000E0
0A76FF0C 76FF0196 68F076FF 00002A1C 9AF476FF F676FF00 2AE90375 00003DF0 Þ=..u.Õ*..v-.v¶..*...vÞh...v..v. 000100
76FF0000 2A469AF4 76FFF676 FF002DE9 00008800 0207C726 0E5EC400 002A2D9A .-*..á^.&ú...¡..Õ-..v-.v¶.F*...v 000120
0000E900 00880000 2B0C9A00 6A006A50 52D228FE 46880125 68012168 F876FFFA *.v½hl.hX..F±+®RPj.j...+..¡..Õ.. 000140
729A5016 F6468D08 ~5FF0A76 FFD88E28 41881E56 57000010 C80012CA C95F5E1F .^_èÒ..à...WV.¡A+.Á.v..v..F-.P.r 000160
9A5016F2 46800876 FF0A76FF 00E1E9F0 46880006 E9037500 0030F046 8900002B +..¯FÞ=..u.Õ...FÞÕÄ..v..v..F·.P. 000180
5016FC46 8D0876FF 0.:76FF00 C0E9F046 880006E9 03750000 30F04689 00002882 .+...FÞ=..u.Õ...FÞÕä..v..v..F=.P 0001A0
FFFE76FF F276FFF4 76FF009F E9F0468B 0006E903 7500003D F0468900 0028929A ..+...FÞ=..u.Õ...FÞÕ...v¶.v·.v±. 0001C0
800076E9 F0468B00 06E90375 000030F0 46890000 2AD99A50 16FA468D 0C6AFC76 v=j..F*.P.)*...FÞ=..u.Õ...FÞÕv.. 0001E0
```

Dump of file SATURN:[PCCOMMON.DUMP.DLL]DAPROFDF.TMP;1 on 18-APR-1990 10:42:42.58
File ID (604,30,0)   End of file block 88 / Allocated 88

Virtual block number 25 (00000019), 512 (0200) bytes

```
002D269A 006A006A 016A006A 01256801 5F68F676 FFF876FF 0035E903 7441FA7E -*At.Õ5..v½.v-h_.hX.j.j.j.j..&-. 000000
F876FF00 32E90000 2D429A00 6A006A00 6A006A01 25680160 68F676FF F876FF00 ..v½.v-h'.hX.j.j.j.j..B-..Õ2..v½ 000020
68016068 F676FFF8 76FF0000 2D5B9A00 6A006A00 6A006A01 2568015F 68F676FF .v-h_.hX.j.j.j.j..[-...v½.v-h'.h 000040
000010C8 0006CAC9 5F5E1F00 00E90000 8800002B AB9A006A 006A016A 006A0125 %.j.j.j.j..¨+..¡..Õ...^_èÒ..à... 000060
801476FF 1676FF07 89261246 88065EC4 000107C7 260E5EC4 D88E2C5F 881E5657 WV.¡_,.Áá^.&ú...á^..F.&...v..v.. 000080
801476FF 1676FF00 002C909A 5016F246 801476FF 1676FF00 002C6F9A 5016F646 F-.P.o,...v..v..F·.P..,...v..v.. 0000A0
880006E9 03750000 30F04689 00002BD2 9AF276FF F476FF00 002C819A 5016FC46 F=.P.Ÿ,...v¶.v·.®+...FÞ=..u.Õ... 0000C0
00080000 2D0D9A00 6A006A00 6A006A01 2468015F 68F676FF F876FF00 C8E9F046 FÞÕu..v½.v-h_.h$.j.j.j.j...-...Á 0000E0
FA468D0C 6AFC76FF FE76FFF2 76FFF476 FFFA4688 40800002 E9418000 05E90375 u.Õ..¯AÕ..¯M.F*.v¶.v·.v±.v•j..F* 000100
F076FF00 002E699A F276FFF4 76FF002A E9037500 0030F046 8900002B EA9A5016 .P.ö+...FÞ=..u.Õ*..v¶.v·.¡....vÞ 000120
FFF476FF 0054E900 00880002 07C7260E 5EC40000 2C119A0A 76FF0C76 FF019668 h...v..v...,..á^.&ú...¡..ÕT..v¶. 000140
0E5EC400 002C009A F276FFF4 76FF0019 E9037500 0030F046 8900002C 2A9AF276 v·.*,...FÞ=..u.Õ...v¶.v·..,..á^. 000160
7500003D F0468906 902C579A 1276FF14 76FF1676 FF0025E9 F0468800 0207C726 &ú....FÞÕX..v..v..v..W,...FÞ=..u 000180
74B81E56 5700001C C80012CA C95F5E1F 0000E900 00880006 E9F0468B 0006E903 .Õ...FÞÕ..¡..Õ...^_èÒ..à...WV.¡t 0001A0
A59A5016 F0468008 76FF0A76 FF00002D 959A5016 F4468008 76FF0A76 FFD88E2D -.Á.v..v..F¶.P..-¯..v..v..FÞ.P.É 0001C0
6A014368 0676FFF4 76FFF676 FF00002D B59A5016 FC468008 76FF0A76 FF00002D -...v..v..F•.P.ç-...v-.v¶.v.hC.j 0001E0
```

Dump of file SATURN:[PCCOMMON.DUMP.DLL]DAPROFDF.TMP;1 on 18-APR-1990 10:42:42.58
File ID (604,30,0)   End of file block 88 / Allocated 88

Virtual block number 26 (0000001A), 512 (0200) bytes

```
9A5016F8 46800D6A FC76FFFE 76FFF076 FFF276FF 00002DEA 9A006A00 6A096A00 .j.j.j..ð·...v·.vÞ.v±.v▪j..F½.P. 000000
8D004D68 1EF876FF FA76FF00 30E90000 B80006E9 03750000 30EE4689 00002CDA Õ....FŸ=..u.Õ..¡..ÕO..v*.v½.hM.. 000020
B8000006 129A5016 E446B006 76FFF476 FFF676FF 0CC48306 B200669A 5016E446 FÕ.P.f.ý..á..v-.v¶.v..FÕ.P.....¡ 000040
000107C7 260E5E:4 D88E2EAF B81E5657 00001EC8 0006CAC9 5F5E1F00 00E90000 ..Õ...^_èò..à...WV.¡£..Äá^.&ú... 000060
8D1476FF 1676FF00 002B629A 5016F646 8D1476FF 1676FF07 89261246 88065EC4 á^..F.&¯..v..v..F-.P.b+...v..v.. 000080
8D1476FF 1676FF00 002ECF9A 5016E446 8D1476FF 1676FF00 002EBF9A 5016F246 F·.P.¢....v..v..FÕ.P.ü...v..v.. 0000A0
468D0000 06919A50 16E8468D 0A6A1276 FFF276FF F476FF00 002EDF9A 5016FC46 F=.P.Õ....v¶.v·.v.j..FÕ.P......F 0000C0
04C4832F 3700629A 5016E846 8D0016E9 03750000 3D04C483 307263EA 9A5016E8 Õ.P.õcr0.á.=..u.Õ...FÕ.P.b.7/.á. 0000E0
76FF0000 2DC09AE4 76FFE676 FFFFFFFA 46C7FFFF F846C700 0AE9FA56 89F84689 .F½.V*Õ..úF½..úF*...v¦.vÕ.á-...v 000100
2AE90375 00003DE2 46890000 2E139A50 16F8468D 006AFC76 FFFE76FF E476FFE6 Ì.vÕ.v±.v▪j..F½.P......Fã=..u.Õ* 000120
0E5EC400 002E3A9A 0A76FF0C 76FF0196 68E276FF 00002E29 9AE476FF E676FF00 ..v¦.vÕ.)....vãh...v..v..:...á^. 000140
9A012568 1476FF16 76FF0000 2E539AE4 76FFE676 FF002DE9 0000B800 0207C726 &ú...¡..Õ-..v¦.vÕ.S....v..v.h%.. 000160
C80012CA C95F5E1F 0000E900 00B82E87 32779A01 27681476 FF1676FF 3080308F .0.0.v..v.h'..w2..¡..Õ...^_èò..à 000180
76FF0A76 FF00002F 959A5016 F4468D08 76FF0A76 FFD88E2F 64B81E56 5700001C ...WV.¡d/.Ä.v..v..F¶.P../...v..v 0001A0
76FFF676 FF00002F 859A5016 F8468D08 76FF0A76 FF00002F A59A5016 F0468D08 ..FÞ.P.E/...v..v..F½.P.ç/...v-.v 0001C0
F876FFFA 76FFF076 FFF276FF 00002EF8 9A006A00 6A096A00 6A014368 0676FFF4 ¶.v.hC.j.j.j.j..½....v·.vÞ.v*.v½ 0001E0
```

Dump of file SATURN:[PCCOMMON.DUMP.DLL]DAPROFDF.TMP;1 on 18-APR-1990 10:42:42.58
File ID (604,30,0)   End of file block 88 / Allocated 88

Virtual block number 27 (0000001B), 512 (0200) bytes

```
FE76FF00 30E90000 B80006E9 03750000 30EE4689 00002F10 9A5016FC 46800F6A j..F=.P../...FŸ=..u.Õ..¡..ÕO..v± 000000
E4468006 76FFF476 FFF676FF 0CC4832F EB00669A 5016E446 8D005168 1EFC76FF .v=.hQ..FÕ.P.f.Š/.á..v-.v¶.v..FÕ 000020
D88E3097 B81E5657 00001EC8 0006CAC9 5F5E1F00 00E90000 B800002F 4B9A5016 .P.K/..¡..Õ...^_èò..à...WV.¡.0.Ä 000040
002F859A 5016EC46 8D1476FF 1676FF07 89261246 88065EC4 000107C7 260E5EC4 á^.&ú...á^..F.&¯..v..v..F£.P../. 000060
0030879A 5016E446 8D1476FF 1676FF00 0030A79A 5016E846 8D1476FF 1676FF00 ..v..v..FÕ.P.Ì0...v..v..FÕ.P.ñ0. 000080
16EE468D 0A6A1276 FFE876FF EA76FF00 0030C79A 5016FC46 8D1476FF 1676FF00 ..v..v..F=.P.ú0...vÕ.vÒ.v.j..FŸ. 0000A0
5016EE46 8D0016E9 03750000 3D04C483 325A63EA 9A5016EE 46800000 2FCA9A50 P.ò/...FŸ.P.õcZ2.á.=..u.Õ...FŸ.P 0000C0
76FFE676 FFFFFFFA 46C7FFFF F846C700 0AE9FA56 89F84689 04C48331 1F00629A .b..1.á..F½.V*Õ..úF½..úF*...v¦.v 0000E0
46890000 30229A50 16F8468D 0F6AFC76 FFFE76FF E476FFE6 76FF0000 300A9AE4 Õ..0...v¦.vÕ.v±.v▪j..F½.P."0...F 000100
0A76FF0C 76FF0196 68E276FF 00003038 9AE476FF E676FF00 2AE90375 00003DE2 ã*..u.Õ*..v¦.vÕ.80...vãh...v..v. 000120
76FF0000 30629AE4 76FFE676 FF002DE9 0000B800 0207C726 0E5EC400 0030499A .I0..á^.&ú...¡..Õ-..v¦.vÕ.b0...v 000140
0000E900 00B82F0  32779A01 27681476 FF1676FF 32682EA7 9A012368 1476FF16 ..v.h#..Ì.h2.v..v.h'..w2ø/¡..Õ.. 000160
7D9A5016 F8468D0J 76FF0A76 FFD88E31 4CB81E56 5700001C C80012CA C95F5E1F .^_èò..à...WV.¡L1.Ä.v..v..F½.P.) 000180
909A5016 FC468D08 76FF0A76 FF000031 8D9A5016 F0468D08 76FF0A76 FF000031 1¯..v..v..FÞ.P..1...v..v..F=.P.. 0001A0
FFF276FF 000030E0 9A006A00 6A096A00 6A014368 0676FFF8 76FFFA76 FF000031 1...v*.v½.v.hC.j.j.j.j..À0...v·. 0001C0
B80006E9 03750000 30EE4689 000030F8 9A5016F4 46800E6A FC76FFFE 76FFF076 vÞ.v±.v▪j..F¶.P.½0...FŸ=..u.Õ..¡ 0001E0
```

Dump of file SATURN:[PCCOMMON.DUMP.DLL]DAPROFDF.TMP;1 on 18-APR-1990 10:42:42.58
File ID (604,30,0)   End of file block 88 / Allocated 88

Virtual block number 28 (0000001C), 512 (0200) bytes

```
FFFA76FF 0CC48331 D300669A 5016E446 8D005568 1EF476FF F676FF00 30E90000 ..ÕO..v-.v¶.hU..FÕ.P.f.Æ1.á..v*. 000000
00001EC8 0006CAC9 5F5E1F00 00E90000 B8000031 339A5016 E4468006 76FFF876 v½.v..FÕ.P.31..¡..Õ...^_èò..à... 000020
8D1476FF 1676FF00 89261246 88065EC4 000107C7 260E5EC4 D88E327F B81E5657 WV.¡.2.Äá^.&ú...á^..F.&¯..v..v.. 000040
8D1476FF 1676FF00 00328F9A 5016F646 8D1476FF 1676FF00 0031609A 5016FA46 F*.P.m1...v..v..F-.P..2...v..v.. 000060
FFF676FF F876FF00 0032AF9A 5016FC46 8D1476FF 1676FF00 00329F9A 5016F246 F·.P..2...v..v..F=.P.£2...v½.v-. 000080
03750000 3D04C483 31BE63EA 9A5016E4 46800000 31829A50 16E4468D 0A6A1276 v.j..FÕ.P.ý1...FÕ.P.õc(1.á.=..u. 0000A0
46C7FFFF EE46C700 0AE9F056 89EE4689 04C48333 0700629A 5016E446 8D0016E9 Õ...FÕ.P.b..3.á..FŸ.vÞÕ..úFŸ..úF 0000C0
16EE468D 0E6AFC76 FFFE76FF F276FFF4 76FF0000 31F29AF2 76FFF476 FFFFFFF0 Þ...v¶.v·.·1...v¶.v·.v±.v▪j..FŸ. 0000E0
68E276FF 00003220 9AF276FF F476FF00 2AE90375 00003DE2 46890000 320A9A50 P..2...Fã=..u.Õ*..v¶.v·. 2...vãh 000100
76FFF476 FF002DE9 0000B800 0207C726 0E5EC400 0032319A 0A76FF0C 76FF0196 ...v..v..12..á^.&ú...¡..Õ-..v¶.v 000120
2EA79A01 23681476 FF1676FF 3450308F 9A012568 1476FF16 76FF0000 324A9AF2 ·.J2...v..v.h%...0P4.v..v.h#..Ì. 000140
76FF0A76 FFD88E33 34B81E56 57000016 C80012CA C95F5E1F 0000E900 00B833A6 13¡..Õ...^_èò..à...WV.¡43.Ä.v..v 000160
76FF0A76 FF000033 759A5016 F2468D08 76FF0A76 FF000033 659A5016 F6468D08 ..F-.P.e3...v..v..F·.P.u3...v..v 000180
9A006A00 6A046A00 6A014368 0676FFF6 76FFF876 FF000033 859A5016 FC468D08 ..F=.P..3...v½.v-.v.hC.j.j.j.j.. 0001A0
08C48335 0B00109A 5016EA46 8D005968 1E0014E9 0374FE46 0BFC468B 000032C8 à2...F=.F±t.Õ...hY..FÕ.P....5.á. 0001C0
003DF046 89000032 E09A5016 FA468D10 6AFC76FF FE76FFF2 76FFF476 FF0029E9 Õ)..v¶.v·.v±.v▪j..F*.P..2...FÞ=. 0001E0
```

```
Dump of file SATURN:[PCCOMMON.DUMP.DLL]DAPROFDF.TMP;1 on 18-APR-1990 10:42:42.58
File ID (604,30,0)   End of file block 88 / Allocated 88

Virtual block number 29 (0000001D), 512 (0200) bytes

 0AC48333 8B00669A 5016EA46 80005A68 1EFA76FF 002DE900 00B80006 E9037500 .u.Ô..¡..Ô-..v*.hZ..Fõ.P.f.£3.á. 000000
 0006CAC9 5F5E1F00 00E90000 88000033 1B9A5016 EA468006 76FFF676 FFF876FF .v½.v-.v..Fõ.P..3..¡..Ô...^_èò.. 000020
 1676FF07 89261246 88065EC4 000107C7 260E5EC4 D88E3467 881E5657 000016C8 à...WV.¡g4.Äá^.&ú...á^..F.&¯..v. 000040
 1676FF00 0034779A 5016F446 801476FF 1676FF00 0033559A 5016F846 8D1476FF .v..F½.P.U3...v..v..F¶.P.w4...v. 000060
 F676FF00 0034979A 5016FA46 8D1476FF 1676FF00 0034879A 5016F046 8D1476FF .v..FÞ.P..4...v..v..F*.P..4...v- 000080
 C70005E9 037400EA 7E83EA46 89000004 CD9AFE76 FF5016EE 46801276 FFF476FF .v¶.v..FŸ.P.v±.ë....Fõ.-ð.t.Ô..ú 0000A0
 EE468010 6AFA76FF FC76FFF0 76FFF276 FF000033 DA9AF076 FFF276FF FC19EE46 FŸ.•.v·.vÞ.Ö3...v·.vÞ.v=.v*j..FŸ 0000C0
 00008800 0034089A F076FFF2 76FF002A E9037500 003DEC46 89000033 F29A5016 .P.·3...F$=..u.Ô*..v·.vÞ..4..¡.. 0000E0
 FFF276FF 000207C7 260E5EC4 00003419 9A0A76FF 0C76FF01 9668EC76 FF002AE9 Ô*..v$h...v..v...4..á^.&ú....v·. 000100
 D88E3538 881E5657 000010C8 0012CAC9 5F5E1F00 00E90000 88000034 329AF076 vÞ.24..¡..Ô...^_èò..à...WV.¡85.Ä 000120
 00003579 9A5016F4 46800876 FF0A76FF 00003569 9A5016F8 46800876 FF0A76FF .v..v..F½.P.i5.¯.v..v..F¶.P.y5.. 000140
 4680126A FC76FFFE 76FFF476 FFF676FF 00003589 9A5016FC 46800876 FF0A76FF .v..v..F•.P..5...v-.v¶.v±.v=j..F 000160
 E9037459 F27E8000 44E90000 880006E9 03750000 3DF04689 000034E7 9A5016F2 ·.P.Ô4.,.FÞ=..u.Ô..¡..ÔD..-·Yt,Ô 000180
 76FF0019 E9000036 C39A006A 006A016A 006A0125 68011868 F876FFFA 76FF001C ...v*.v½h..h%.j.j.j.j..ú6..Ô...v 0001A0
 5F5E1F00 00E90000 88000034 809A006A 006A006A 006A0125 68011868 F876FFFA *.v½h..h%.j.j.j.j..¯4..¡..Ô...^_ 0001C0
 89261246 88065EC4 000107C7 260E5EC4 D88E362C 881E5657 000014C8 0006CAC9 èò..à...WV.¡,6.Äá^.&ú...á^..F.&¯ 0001E0

Dump of file SATURN:[PCCOMMON.DUMP.DLL]DAPROFDF.TMP;1 on 18-APR-1990 10:42:42.58
File ID (604,30,0)   End of file block 88 / Allocated 88

Virtual block number 30 (0000001E), 512 (0200) bytes

 00363C9A 5016F846 8D1476FF 1676FF00 0035599A 5016FC46 8D1476FF 1676FF07 ..v..v..F•.P.Y5...v..v..F½.P.<6. 000000
 00365C9A 5016EC46 8D1476FF 1676FF00 00364C9A 5016F446 8D1476FF 1676FF00 ..v..v..F¶.P.L6...v..v..F$.P.\6. 000020
 0CE90375 00080000 37C89A00 6A006A00 6A006A01 24681276 FFF876FF FA76FF00 ..v*.v½.v.h$.j.j.j.j..à7...Äu.Ô. 000040
 00358B9A F476FFF6 76FF59F2 46C60001 FE46C700 09E94EF2 46C60000 FE46C700 .úF±..6F·NÔ..úF±..6F·Y.v-.v¶.£5. 000060
 7500003D F0468900 0035D39A 5016F246 80126AEC 76FFEE76 FFF476FF F676FF00 ..v-.v¶.vŸ.v$j..F·.P.Æ5...FÞ=..u 000080
 00003613 9AF476FF F676FF00 2DE9F046 88000035 E99AF476 FFF676FF 0011E903 .Ô...v-.v¶.Ö5...FÞÔ-..v-.v¶..6.. 0000A0
 E90000B8 000036A7 9A006A00 6A5052D2 28FE4688 01256801 1868F876 FFFA76FF .v*.v½h..h%..F±+ØRPj.j..Ï6..¡..Ô 0000C0
 5016F646 8D0876FF 0A76FF08 8E360C88 1E565700 0010C800 12CAC95F 5E1F0000 ...^_èò..à...WV.¡É6.Ä.v..v..F-.P 0000E0
 5016FC46 8D0876FF 0A76FF00 00371D9A 5016F246 8D0876FF 0A76FF00 0037009A ..7.¯.v..v..F·.P..7...v..v..F•.P 000100
 F0468900 0036749A 5016FA46 80116AFC 76FFFE76 FFF276FF F476FF00 003720 9A ..7...v¶.v·.v±.v=j..F*.P.t6...FÞ 000120
 2568012D 68F676FF F876FF01 3BE998FA 468A0163 E90000B8 0006E903 7500003D =..u.Ô..¡..Ôc..F*.Ô;..v½.v-h·.h% 000140
 006A006A 006A0125 68012C68 F676FFF8 76FF0000 38739A00 6A006A01 6A006A01 .j.j.j.j..s8...v½.v-h,.h%.j.j.j. 000160
 000038A8 9A006A00 6A006A00 6A012568 012B68F6 76FFF876 FF000038 8C9A006A j...8...v½.v-h+.h%.j.j.j.j..¨8.. 000180
 FFF876FF 000038C1 9A006A00 6A006A00 6A012568 012D68F6 76FFF876 FF0108E9 Ô...v½.v-h·.h%.j.j.j.j..eã...v½. 0001A0
 2568012B 68F676FF F876FF00 00380A9A 006A006A 016A006A 01256801 2C68F676 v-h,.h%.j.j.j.j..Ô8...v½.v-h+.h% 0001C0
 6A006A01 2568012D 68F676FF F876FF00 8AE90000 38F69A00 6A006A00 6A006A01 .j.j.j.j..-8..Ôα..v½.v-h·.h%.j.j 0001E0

Dump of file SATURN:[PCCOMMON.DUMP.DLL]DAPROFDF.TMP;1 on 18-APR-1990 10:42:42.58
File ID (604,30,0)   End of file block 88 / Allocated 88

Virtual block number 31 (0000001F), 512 (0200) bytes

 289A006A 006A006A 006A0125 68012C68 F676FFF8 76FF0000 390F9A00 6A006A00 .j.j...9...v½.v-h,.h%.j.j.j.j..( 000000
 FF006CE9 00003944 ?A006A00 6A016A00 6A012568 012B68F6 76FFF876 FF000039 9...v½.v-h+.h%.j.j.j.j..D9..Ôl.. 000020
 2C68F676 FFF876FF 0000395D 9A006A00 6A006A00 6A012568 012D68F6 76FFF876 v½.v-h·.h%.j.j.j.j..]9...v½.v-h, 000040
 6A006A01 2568012B 68F676FF F876FF00 0039769A 006A006A 006A006A 01256801 .h%.j.j.j.j..v9...v½.v-h+.h%.j.j 000060
 FF03E903 75004030 FE8DE903 75004430 001BE900 1EE90000 37469A00 6A006A01 .j.j..F7..Ô..Ô..=D.u.Ô§±=H.u.Ô.. 000080
 881E5657 000012C8 0006CAC9 5F5E1F00 00E90000 88FF94E9 FF49E903 75005930 =Y.u.Ôl.Ô..¡..Ô...^_èò..à...WV.¡ 0000A0
 5016F846 8D1476FF 1676FF07 89261246 88065EC4 000207C7 260E5EC4 D88E37E1 Ä7.Äá^.&ú...á^..F.&¯..v..v..F½.P 0000C0
 5016F046 8D1476FF 1676FF00 0037F19A 5016F446 8D1476FF 1676FF00 0036FD9A .»6...v..v..F¶.P.þ7...v..v..FÞ.P 0000E0
 2568012D 68F476FF F676FF00 0038119A 5016FC46 8D1476FF 1676FF00 0038019A ..8...v..v..F•.P..8...v-.v¶h-.h% 000100
 006A006A 006A0125 68012C68 F476FFF6 76FF0000 3A339A00 6A006A00 6A006A01 .j.j.j.j..3:...v-.v¶h,.h%.j.j.j. 000120
 0000385A 9A006A00 6A016A00 6A012568 012B68F4 76FFF676 FF00003A 4C9A006A j..L:...v-.v¶h+.h%.j.j.j.j..Z8.. 000140
 FA468011 6AFC76FF FE76FFF0 76FFF276 FF000037 6D9AF076 FFF276FF 59FA46C6 6F*Y.v·.vÞ.m7...v·.vÞ.v±.v=j..F* 000160
 EE76FF00 0037989A F076FFF2 76FF002A E9037500 003DEE46 89000037 859A5016 .P..7...FŸ=..u.Ô*..v·.vÞ..7...vŸ 000180
 FFF276FF 0011E900 00B80002 07C7260E 5EC40000 36009A0A 76FF0C76 FF019668 h...v..v...6..á^.&ú...¡..Ô...v·. 0001A0
 D88E3980 881E5657 000012C8 0012CAC9 5F5E1F00 00E90000 88000037 AC9AF076 vÞ.¯7..¡..Ô...^_èò..à...WV.¡¯9.Ä 0001C0
 0039D19A 5016F846 8D1476FF 1676FF07 89261246 88065EC4 000107C7 260E5EC4 á^.&ú...á^..F.&¯..v..v..F½.P.Ì9. 0001E0
```

```
Dump of file SATURN:[PCCOMMON.DUMP.DLL]DAPROFDF.TMP;1 on 18-APR-1990 10:42:42.58
File ID (604,30,0)   End of file block 88 / Allocated 88

Virtual block number 32 (00000020), 512 (0200) bytes

 0039F19A 5016F046 8D1476FF 1676FF00 0039E19A 5016F446 8D1476FF 1676FF00 ..v..v..F¶.P.Å9...v..v..FÞ.P.þ9. 000000
 6A006A01 2568012D 68F476FF F676FF00 003A019A 5016FC46 8D1476FF 1676FF00 ..v..v..F=.P..:...v-.v¶h-.hX.j.j 000020
 689A006A 006A016A 006A0125 68012C68 F476FFF6 76FF0000 3B4F9A00 6A006A00 .j.j..O;...v-.v¶h,.hX.j.j.j.j..h 000040
 4DFA46C6 00003..1A 9A006A00 6A006A00 6A012568 012B68F4 76FFF676 FF00003B ;...v-.v¶h+.hX.j.j.j.j...:..óF*M 000060
 739A5016 FA468011 6AFC76FF FE76FFF0 76FFF276 FF00003A 5B9AF076 FFF276FF .v·.vÞ.[:...v·.vÞ.v±.v=j..F*.P.s 000080
 FF019668 EE76FF00 0C3A899A F076FFF2 76FF002A E9037500 0030EE46 8900003A :...FŸ=..u.Ö*..v·.vÞ..:...vŸh... 0000A0
 B39AF076 FFF276FF 0011E900 00880002 07C7260E 5EC40000 3A9A9A0A 7.¯F0E76 v..v...:..á^.&ú...|..Ö...v·.vÞ.* 0000C0
 260E5EC4 D88E3ACC 881E5657 000012C8 0012CAC9 5F5E1F00 00E90000 88C.703A :..|..Č...^_èò..à...WV.|ä:.Äá^.& 0000E0
 1676FF00 003AED9A 5016F846 8D1476FF 1676FF07 89261246 88065EC4 0001.7C7 ú...á^..F.&¯...v..v..F%.P.Ü:...v. 000100
 1676FF00 0038009A 5016F046 8D1476FF 1676FF00 003AFD9A 5016F446 8D1476FF .v..F¶.P.»:...v..v..FÞ.P..;...v. 000120
 6A006A01 6A006A01 25680120 68F476FF F676FF00 003B1D9A 5016FC46 8D1476FF .v..F=.P..;...v-.v¶h-.hX.j.j.j.j 000140
 FF00003C 849A006A 006A006A 006A0125 68012C68 F476FFF6 76FF0000 3C6B9A00 ..k<...v-.v¶h,.hX.j.j.j.j...<... 000160
 FFF276FF 44FA46C6 00003B36 9A006A00 6A006A00 6A012568 012B68F4 76FFF676 v-.v¶h+.hX.j.j.j.j..6;..óF*D.v·. 000180
 8900003B 8F9A5016 FA468011 6AFC76FF FE76FFF0 76FFF276 FF00003B 779AF076 vÞ.w;...v·.vÞ.v±.v=j..F*.P..;... 0001A0
 76FF0C76 FF019668 EE76FF00 003BA59A F076FFF2 76FF002A E9037500 003DEE46 FŸ=..u.Ö*..v·.vÞ.£;...vŸh...v..v 0001C0
 B800003B CF9AF076 FFF276FF 0011E900 00880002 07C7260E 5EC40000 3B869A0A ..Ñ;..á^.&ú...|..Ö...v·.vÞ.ü;..| 0001E0

Dump of file SATURN:[PCCOMMON.DUMP.DLL]DAPROFDF.TMP;1 on 18-APR-1990 10:42:42.58
File ID (604,30,0)   End of file block 88 / Allocated 88

Virtual block number 33 (00000021), 512 (0200) bytes

 46800876 FF0A76FF D88E3BE8 881E5657 000010C8 0012CAC9 5F5E1F00 00E90000 ..Ö...^_èò..à...WV.|Ö;.Ä.v..v..F 000000
 46800876 FF0A76FF 00003C29 9A5016F2 46800876 FF0A76FF 00003C19 9A5016F6 -.P..<...v..v..F·.P.)<...v..v..F 000020
 00003829 9A5016FA 4680136A FC76FFFE 76FFF276 FFF476FF 00003C39 9A5016FC •.P.9<...v¶.v·.v±.v•j..Þ*.P.)8.. 000040
 1D68F676 FFF876FF 013BE998 FA468A01 63E90000 880006E9 03750000 30F04689 .FÞ=..u.Ö..|..Öc..F*.Ö;..v½.v-h. 000060
 6A006A01 2568011E 68F676FF F876FF00 0030969A 006A006A 016A006A 01256801 .hX.j.j.j.j...=...v½.v-h..hX.j.j 000080
 CB9A006A 006A006A 006A0125 68011F68 F676FFF8 76FF0000 30AF9A00 6A006A00 .j.j..£=...v½.v-h..hX.j.j.j.j..ü 0000A0
 FF00003D E49A006A 006A016A 006A0125 68011E68 F676FFF8 76FF0108 E900003D =..Ö...v½.v-h..hX.j.j.j.j..ö=... 0000C0
 1F68F676 FFF876FF 000030FD 9A006A00 6A006A00 6A012568 011D68F6 76FFF876 v½.v-h..hX.j.j.j.j..»=...v½.v-h. 0000E0
 01256801 1F68F676 FFF876FF 008AE900 003E199A 006A006A 006A006A 01256801 .hX.j.j.j.j...>..Ö¤..v½.v-h..hX. 000100
 6A006A00 6A006A01 2568011D 68F676FF F876FF00 003E329A 006A006A 016A006A j.j.j.j..2>...v½.v-h..hX.j.j.j.j 000120
 E900003E 679A006A 006A006A 006A0125 68011E68 F676FFF8 76FF0000 3E489A00 ..K>...v½.v-h..hX.j.j.j.j..g>..Ö 000140
 76FFF876 FF00003E 809A006A 006A016A 006A0125 68011D68 F676FFF8 76FF006C l..v½.v-h..hX.j.j.j.j...>...v½.v 000160
 01256801 1F68F676 FFF876FF 00003E99 9A006A00 6A006A00 6A012568 011E68F6 -h..hX.j.j.j.j...>...v½.v-h..hX. 000180
 0375004D 30FF59E9 03750044 30001BE9 001EE900 003C529A 006A006A 006A006A j.j.j.j..R<..Ö..Ö..=D.u.ÖY.=M.u. 0001A0
 57000012 C80006CA C95F5E1F 0000E900 0088FF94 E9FEFBE9 03750053 30FEB5E9 Öç±=S.u.Ö«±Ö..|..Ö...^_èò..à...W 0001C0
 46801476 FF1676FF 07892612 4688065E C4000107 C7260E5E C4D88E30 04881E56 V.|.=.Äá^.&ú...á^..F.&¯...v..v..F 0001E0

Dump of file SATURN:[PCCOMMON.DUMP.DLL]DAPROFDF.TMP;1 on 18-APR-1990 10:42:42.58
File ID (604,30,0)   End of file block 88 / Allocated 88

Virtual block number 34 (00000022), 512 (0200) bytes

 46801476 FF1676FF 00003014 9A5016F4 46801476 FF1676FF 00003C09 9A5016F8 %.P..<...v..v..F¶.P..=...v..v..F 000000
 1D68F476 FFF676FF 00003034 9A5016FC 46801476 FF1676FF 00003024 9A5016F0 Þ.P.$=...v..v..F=.P.4=...v-.v¶h. 000020
 6A006A01 2568011E 68F476FF F676FF00 003F569A 006A006A 016A006A 01256801 .hX.j.j.j.j..V?...v-.v¶h..hX.j.j 000040
 7D9A006A 006A006A 006A0125 68011F68 F476FFF6 76FF0000 3F6F9A00 6A006A00 .j.j..o?...v-.v¶h..hX.j.j.j.j..) 000060
 136AFC76 FFFE76FF F076FFF2 76FF0000 3C939AF0 76FFF276 FF4DFA46 C600003D =..óF*M.v·.vÞ..<...v·.vÞ.v±.v=j. 000080
 00003CC1 9AF076FF F276FF00 2AE90375 00003DEE 46890000 3CAB9A50 16FA468D .F*.P.¨<...FŸ=..u.Ö*..v·.vÞ.é<.. 0000A0
 FF0011E9 00008800 0207C726 0E5EC400 003CD29A 0A76FF0C 76FF0196 68EE76FF .vŸh...v..v..Ø<..á^.&ú...|..Ö... 0000C0
 D3881E56 57000012 C80012CA C95F5E1F 0000E900 00880000 3CEB9AF0 76FFF276 v·.vÞ.Š<..|..Ö...^_èò..à...WV.|Æ 0000E0
 9A5016F8 46801476 FF1676FF 07892612 4688065E C4000107 C7260E5E C4D88E3E >.Äá^.&ú...á^..F.&¯...v..v..F%.P. 000100
 9A5016F0 46801476 FF1676FF 00003F04 9A5016F4 46801476 FF1676FF 00003EF4 ¶>...v..v..F¶.P..?...v..v..FÞ.P. 000120
 01256801 1068F476 FFF676FF 00003F24 9A5016FC 46801476 FF1676FF 00003F14 .?...v..v..F=.P.$?...v-.v¶h..hX. 000140
 6A006A01 6A006A01 2568011E 68F476FF F676FF00 0040729A 006A006A 006A006A j.j.j.j..r@...v-.v¶h..hX.j.j.j.j 000160
 C600003F 309A006A 006A006A 006A0125 68011F68 F476FFF6 76FF0000 40B89A00 ...@...v-.v¶h..hX.j.j.j.j..=?..ó 000180
 16FA468D 136AFC76 FFFE76FF F076FFF2 76FF0000 3F7E9AF0 76FFF276 FF53FA46 F*S.v·.vÞ.-?...v·.vÞ.v±.v=j..F*. 0001A0
 68EE76FF 00003FAC 9AF076FF F276FF00 2AE90375 00003DEE 46890000 3F969A50 P..?...FŸ=..u.Ö*..v·.vÞ.¯?...vŸh 0001C0
 76FFF276 FF0011E9 00008800 0207C726 0E5EC400 003FBD9A 0A76FF0C 76FF0196 ...v..v..§?..á^.&ú...|..Ö...v·.v 0001E0
```

```
Dump of file SATURN:[PCCOMMON.DUMP.DLL]DAPROFDF.TMP;1 on 18-APR-1990 10:42:42.58
File ID (604,30,0)    End of file block 88 / Allocated 88

Virtual block number 35 (00000023), 512 (0200) bytes

 C4D88E3F EF881E56 57000012 C80012CA C95F5E1F 0000E900 00B80000 3FD69AF0 Þ.ø?..|..Õ...^_èÒ..à...WV.|y?.Áà 000000
 00004010 9A5016FC 46801476 FF1676FF 07892612 468B065E C4000107 C7260E5E ^.&ú...á^..F.&...v..v..F%.P..ð.. 000020
 00004030 9A5016F0 46801476 FF1676FF 00004020 9A5016F4 46801476 FF1676FF .v..v..F¶.P. ð...v..v..FÞ.P.0ð.. 000040
 006A006A 01256801 1D68F476 FFF676FF 00004040 9A5016FC 46801476 FF1676FF .v..v..F•.P.ðð...v-.v¶h..hX.j.j. 000060
 41A79A00 6A006A00 6A006A01 2568011E 68F476FF F676FF0D 0041BE9A 006A006A j.j...A...v-.v¶h..hX.j.j.j.j..¦A 000080
 FF44FA46 C6000040 599A006A 006A016A 006A0125 68011F68 F476FFF6 76FF0000 ...v-.v¶h..hX.j.j.j.j..Yð..ôF*D. 0000A0
 40829A50 16FA468D 136AFC76 FFFE76FF F076FFF2 76FF0000 409A9AF0 76FFF276 v·.vÞ..ð...v·.vÞ.v±.v•j..F*.P.ÿð 0000C0
 76FF0196 68EE76FF 000040C8 9AF076FF F276FF00 2AE90375 00003DEE 46890000 ...FY=..u.Õ*..v·.vÞ.àð...vYh...v 0000E0
 40F29AF0 76FFF276 FF0011E9 00008800 0207C726 0E5EC400 0040D99A 0A76FF0C ..v..!ð..á^.&ú...|..Õ...v·.vÞ.·ð 000100
 76FF0A76 FFD88E41 08881E56 57000010 C80012CA C95F5E1F 0000E900 00B80000 ..|..Õ...^_èÒ..à...WV.|.A.Ã.v..v 000120
 76FF0A76 FF000041 4C9A5016 F4468008 76FF0A76 FF000041 3C9A5016 F8468008 ..F%.P.<A...v..v..F¶.P.LA...v..v 000140
 4C9A5016 F2468D14 6AFC76FF FE76FFF4 76FFF676 FF000041 5C9A5016 FC468D08 ..F•.P.\A...v-.v¶.v±.v•j..F·.P.L 000160
 76FFFA76 FF013BE9 98F2468A 0163E900 00B80006 E9037500 003DF046 89000030 =...FÞ=..u.Õ..|..Õc..F·.Õ;..v*.v 000180
 01256801 1768F876 FFFA76FF 00004175 9A006A00 6A016A00 6A012568 011568F8 Yh..hX.j.j.j.j..uA...v*.vYh..hX. 0001A0
 6A006A00 6A006A01 25680116 68F876FF FA76FF00 0042D29A 006A006A 006A006A j.j.j.j..ØB...v*.vYh..hX.j.j.j.j 0001C0
 43079A00 6A006A01 6A006A01 25680117 68F876FF FA76FF01 08E90000 42EE9A00 ..ÝB..Õ...v*.vYh..hX.j.j.j.j...C 0001E0

Dump of file SATURN:[PCCOMMON.DUMP.DLL]DAPROFDF.TMP;1 on 18-APR-1990 10:42:42.58
File ID (604,30,0)    End of file block 88 / Allocated 88

Virtual block number 36 (00000024), 512 (0200) bytes

 76FFFA76 FF000043 209A006A 006A006A 006A0125 68011568 F876FFFA 76FF0000 ...v*.vYh..hX.j.j.j.j.. C...v*.v 000000
 011668F8 76FFFA76 FF00BAE9 0000433C 9A006A00 6A006A00 6A012568 011668F8 Yh..hX.j.j.j.j..<C..Õº..v*.vYh.. 000020
 006A006A 01256801 1768F876 FFFA76FF 00004355 9A006A00 6A016A00 6A012568 hX.j.j.j.j..UC...v*.vYh..hX.j.j. 000040
 438A9A00 6A006A00 6A006A01 25680115 68F876FF FA76FF00 00436E9A 006A006A j.j..nC...v*.vYh..hX.j.j.j.j...C 000060
 76FF0000 43A39A00 6A006A01 6A006A01 25680115 68F876FF FA76FF00 6CE90000 ..Õl..v*.vYh..hX.j.j.j.j..ÈC...v 000080
 011668F8 76FFFA76 FF000043 BC9A006A 006A006A 006A0125 68011768 F876FFFA *.vYh..hX.j.j.j.j..¼C...v*.vYh.. 0000A0
 4930FF59 E9037500 41300018 E9001EE9 000042A0 9A006A00 6A006A00 6A012568 hX.j.j.j.j...B..Õ..Õ..•A.u.ÕY.=I 0000C0
 12C80006 CAC95F5E 1F0000E9 000088FF 94E9FEF8 E9037500 5830FEB5 E9037500 .u.Õç±=X.u.Õ«±Õ..|..Õ...^_èÒ..à. 0000E0
 76FF1676 FF078926 12468806 5EC40001 07C7260E 5EC4D88E 4227B81E 56570000 ..WV.|'B.Ãá^.&ú...á^..F.&...v..v 000100
 76FF1676 FF000042 379A5016 F6468D14 76FF1676 FF000041 2C9A5016 FA468D14 ..F*.P.,A...v..v..F-.P.7B...v..v 000120
 76FFF876 FF000042 579A5016 FC468014 76FF1676 FF000042 479A5016 F2468D14 ..F·.P.GB...v..v..F•.P.WB...v%.v 000140
 01256801 1768F676 FFF876FF 00004479 9A006A00 6A016A00 6A012568 011568F6 -h..hX.j.j.j.j..yD...v%.v-h..hX. 000160
 6A006A00 6A006A01 25680116 68F676FF F876FF00 0044929A 006A006A 006A006A j.j.j.j...D...v%.v-h..hX.j.j.j.j 000180
 76FFFE76 FFF276FF F476FF00 0041B69A F276FFF4 76FF49F0 46C60000 42B99A00 ..¿B..ÕFÞI.v¶.v·.ÑA...v¶.v·.v±.v 0001A0
 E49AF276 FFF476FF 002AE903 7500003D EE468900 0041CE9A 5016F046 80146AFC •j..FÞ.P.ÕA...FY=..u.Õ*..v¶.v·.Õ 0001C0
 E9000088 000207C7 260E5EC4 000041F5 9A0A76FF 0C76FF01 9668EE76 FF000041 A...vYh...v..v..%A..á^.&ú...|..Õ 0001E0

Dump of file SATURN:[PCCOMMON.DUMP.DLL]DAPROFDF.TMP;1 on 18-APR-1990 10:42:42.58
File ID (604,30,0)    End of file block 88 / Allocated 88

Virtual block number 37 (00000025), 512 (0200) bytes

 56570000 12C80012 CAC95F5E 1F0000E9 00008800 00420E9A F276FFF4 76FF0011 ...v¶.v·..B..|..Õ...^_èÒ..à...WV 000000
 FA468D14 76FF1676 FF078926 12468806 5EC40001 07C7260E 5EC4D88E 43F6881E .|-C.Ãá^.&ú...á^..F.&...v..v..F* 000020
 F2468D14 76FF1676 FF000044 279A5016 F6468D14 76FF1676 FF000044 179A5016 .P..D...v..v..F-.P.'D...v..v..F· 000040
 011768F6 76FFF876 FF000044 479A5016 FC468D14 76FF1676 FF000044 379A5016 .P.7D...v..v..F•.P.GD...v%.v-h.. 000060
 006A006A 01256801 1568F676 FFF876FF 00004595 9A006A00 6A016A00 6A012568 hX.j.j.j.j...E...v%.v-h..hX.j.j. 000080
 44609A00 6A006A00 6A006A01 25680116 68F676FF F876FF00 0045AE9A 006A006A j.j..ÜE...v%.v-h..hX.j.j.j.j..'D 0000A0
 80146AFC 76FFFE76 FFF276FF F476FF00 0044A19A F276FFF4 76FF58F0 46C60000 ..ÕFÞX.v¶.v·.ÀD...v¶.v·.v±.v•j.. 0000C0
 FF000044 CF9AF276 FFF476FF 002AE903 7500003D EE468900 0044B99A 5016F046 FÞ.P.¿D...FY=..u.Õ*..v¶.v·.ÚD... 0000E0
 76FF0011 E9000088 000207C7 260E5EC4 000044E0 9A0A76FF 0C76FF01 9668EE76 vYh...v..v..ÀD..á^.&ú...|..Õ...v 000100
 4512B81E 56570000 12C80012 CAC95F5E 1F0000E9 00008800 0044F99A F276FFF4 ¶.v·.ªD..|..Õ...^_èÒ..à...WV.|.E 000120
 339A5016 FA468D14 76FF1676 FF078926 12468806 5EC40001 07C7260E 5EC4D88E .Ãá^.&ú...á^..F.&...v..v..F*.P.3 000140
 539A5016 F2468D14 76FF1676 FF000045 439A5016 F6468D14 76FF1676 FF000045 E...v..v..F-.P.CE...v..v..F·.P.S 000160
 6A012568 011668F6 76FFF876 FF000045 639A5016 FC468D14 76FF1676 FF000045 E...v..v..F•.P.cE...v%.v-h..hX.j 000180
 006A006A 006A006A 01256801 1768F676 FFF876FF 00004681 9A006A00 6A016A00 .j.j.j..ÝF...v%.v-h..hX.j.j.j.j. 0001A0
 46C60000 457C9A00 6A006A00 6A006A01 25680115 68F676FF F876FF00 0046CA9A .ÕF...v%.v-h..hX.j.j.j.j..|E..ÕF 0001C0
 5016F046 80146AFC 76FFFE76 FFF276FF F476FF00 0045BD9A F276FFF4 76FF41F0 ÞA.v¶.v·.§E...v¶.v·.v±.v•j..FÞ.P 0001E0
```

```
Dump of file SATURN:[PCCOMMON.DUMP.DLL]DAPROFDF.TMP;1 on 18-APR-1990 10:42:42.58
File ID (604,30,0)   End of file block 88 / Allocated 88

Virtual block number 38 (00000026), 512 (0200) bytes

 9668EE76 FF000045 E89AF276 FFF476FF 002AE903 75000030 EE468900 0045D59A .fE...FŸ=..u.Õ*..v¶.v·.$E...vŸh. 000000
 F276FFF4 76FF0011 E90000B8 000207C7 260E5EC4 000045FC 9A0A76FF 0C76FF01 ..v..v..•E..á^.&ú...|..Õ...v¶.v· 000020
 76FFD88E 462EB81E 56570000 1CC80012 CAC95F5E 1F0000E9 00008800 0046159A ..F..|..Õ...^_èò..à...WV.|.F.Ä.v 000040
 76FF0000 466F9A.0 16F4468D 0876FF0A 76FF0000 465F9A50 16F8468D 0876FF0A ..v..F%.P._F...v..v..F¶.P.oF...v 000060
 006A096A 006A0143 680676FF F876FFFA 76FF0000 467F9A50 16FC468D 0876FF0A ..v..F=.P..F...v*.v%.v.hC.j.j.j. 000080
 89000042 6F9A5016 F4468D15 6AFC76FF FE76FFF4 76FFF676 FF000046 989A006A j...F...v-.v¶.vz.v=j..Fõ.P.oß... 0000A0
 9A5016E8 4680005E 681EE476 FFE676FF 0030E900 00880006 E9037500 0030F246 F·=..u.Õ..|..ÕÕ..vl.võ.h^..FÕ.P. 0000C0
 0000E900 00880000 351F9A50 16E8468D 0676FFF8 76FFFA76 FF0CC483 34C80066 f.ù4.á..v*.v%.v..FÕ.P..5..|..Õ.. 0000E0
 4688065E C4000107 C7260E5E C4D88E47 4A881E56 5700001E C80006CA C95F5E1F .^_èò..à...WV.|JG.Äá^.&ú...á^..F 000100
 9A5016EC 46801476 FF1676FF 0000464F 9A5016F0 46801476 FF1676FF 07892612 .&...v..v..FÞ.P.OF...v..v..F&.P. 000120
 9A5016F2 46801476 FF1676FF 0000476A 9A5016E8 46801476 FF1676FF 0000475A ZG...v..v..FÕ.P.jG...v..v..F·.P. 000140
 EA9A5016 F6468D00 00339A9A 5016F646 8D0A6A12 76FFEC76 FFEE76FF 0000477A zG...vŸ.v$.v.j..F-.P..3...F-.P.õ 000160
 5689E246 8904C483 47D20062 9A5016F6 46800016 E9037500 003004C4 83344263 cB4.á.=..u.Õ...F-.P.b.ØG.á..Fã.V 000180
 FFE876FF EA76FF00 0046D99A E876FFEA 76FFFFFF E446C7FF FFE246C7 000AE9E4 ðÕ..úFã..úFð...võ.vÕ.1F...võ.vÕ. 0001A0
 FFEA76FF 002AE903 75000030 E6468900 0046F19A 5016E246 8D156AF2 76FFF476 v¶.v·j..Fã.P.þF...Fl=..u.Õ*..võ. 0001C0
 000207C7 260E5EC4 00004718 9A0A76FF 0C76FF01 9668E676 FF000047 079AE876 vÕ..G...vlh...v..v...G..á^.&ú... 0001E0

Dump of file SATURN:[PCCOMMON.DUMP.DLL]DAPROFDF.TMP;1 on 18-APR-1990 10:42:42.58
File ID (604,30,0)   End of file block 88 / Allocated 88

Virtual block number 39 (00000027), 512 (0200) bytes

 10C80012 CAC95F5E 1F0000E9 00008800 0047319A E876FFEA 76FF0011 E90000B8 |..Õ...võ.vÕ.1G..|..Õ...^_èò..à. 000000
 0876FF0A 76FF0000 48309A50 16F6468D 0876FF0A 76FFD88E 47FFB81E 56570000 ..WV.|.G.Ä.v..v..F-.P.0H...v..v. 000020
 F276FFF4 76FF0000 48509A50 16FC468D 0876FF0A 76FF0000 48409A50 16F2468D .F·.P.@H...v..v..F=.P.PH...v¶.v· 000040
 00008800 06E90375 000030F0 46890000 47AB9A50 16FA468D 166AFC76 FFFE76FF .vz.v=j..F*.P.·G...FÞ=..u.Õ..|.. 000060
 006A006A 016A006A 01256801 0F68F676 FFF876FF 0035E903 7454FA7E 800076E9 Õv..-*Tt.Õ5..v%.v-h..hX.j.j.j.j. 000080
 32E90000 49C69A00 6A006A00 6A006A01 2568010E 68F676FF F876FF00 0049AA9A .·I...v%.v-h..hX.j.j.j.j..ól..Õ2 0000A0
 F676FFF8 76FF0000 49DF9A00 6A006A01 6A006A01 2568010E 68F676FF F876FF00 ..v%.v-h..hX.j.j.j.j..Õl...v%.v- 0000C0
 0006CAC9 5F5E1F00 00E90000 88000047 939A006A 006A006A 006A0125 68010F68 h..hX.j.j.j.j...G..|..Õ...^_èò.. 0000E0
 1676FF07 89261246 88065EC4 000107C7 260E5EC4 D88E4916 B81E5657 000012C8 à...WV.|.I.Äá^.&ú...á^..F.&...v. 000100
 1676FF00 0049269A 5016F446 801476FF 1676FF00 0048209A 5016F846 801476FF .v..F%.P. H...v..v..F¶.P.&I...v. 000120
 FA46C600 0049469A 5016FC46 801476FF 1676FF00 0049369A 5016F046 801476FF .v..FÞ.P.6I...v..v..F=.P.FI..óF* 000140
 F476FFF6 76FF0000 4A7.9A00 6A006A01 6A006A01 2568010E 68F476FF F676FF4E N.v-.v¶h..hX.j.j.j.j...J...v-.v¶ 000160
 76FF0000 48A59AF0 76FFF276 FF000049 919A006A 006A006A 006A0125 68..0F68 h..hX.j.j.j.j...I...v·.vÞ.EH...v 000180
 2AE90375 000030EE 46890000 48809A50 16FA468D 166AFC76 FFFE76FF F076.·F2 ·.vÞ.vz.v=j..F*.P.§H...FŸ=..u.Õ* 0001A0
 0E5EC400 0048E49A 0A76FF0C 76FF0196 68EE76FF 000048D3 9AF076FF F276F..0 ..v·.vÞ.ÆH...vŸh...v..v..ÕH..á^. 0001C0
 C95F5E1F 0000E900 00880000 48FD9AF0 76FFF276 FF0011E9 00008800 0207C726 &ú...|..Õ...v·.vÞ.»H..|..Õ...^_è 0001E0

Dump of file SATURN:[PCCOMMON.DUMP.DLL]DAPROFDF.TMP;1 on 18-APR-1990 10:42:42.58
File ID (604,30,0)   End of file block 88 / Allocated 88

Virtual block number 40 (00000028), 512 (0200) bytes

 07892612 4688065E C4000107 C7260E5E C4D88E49 F8B81E56 57000012 C80012CA ò..à...WV.|%I.Äá^.&ú...á^..F.&.. 000000
 00004A29 9A5016F4 46801476 FF1676FF 00004A19 9A5016F8 46801476 FF1676FF .v..v..F%.P..J...v..v..F¶.P.)J.. 000020
 00004A49 9A5016FC 46801476 FF1676FF 00004A39 9A5016F0 46801476 FF1676FF .v..v..FÞ.P.9J...v..v..F=.P.IJ.. 000040
 F676FF00 0048829A 006A006A 016A006A 01256801 0F68F476 FFF676FF 54FA46C6 óF*T.v-.v¶h..hX.j.j.j.j...K...v- 000060
 004A8A9A F076FFF2 76FF0000 4A669A00 6A006A00 6A006A01 2568010E 68F476FF .v¶h..hX.j.j.j.j..fJ...v·.vÞ..J. 000080
 75000030 EE468900 004AA29A 5016FA46 80166AFC 76FFFE76 FFF076FF F276FF00 ..v·.vÞ.vz.v=j..F*.P.ÅJ...FŸ=..u 0000A0
 00004AC9 9A0A76FF 0C76FF01 9668EE76 FF00004A B89AF076 FFF276FF 002AE903 .Õ*..v·.vÞ.|J...vŸh...v..v..èJ.. 0000C0
 1F0000E9 00008800 004AE29A F076FFF2 76FF0011 E90000B8 000207C7 260E5EC4 á^.&ú...|..Õ...v·.vÞ.âJ..|..Õ... 0000E0
 4B2C9A50 16F4468D 0876FF0A 76FFD88E 4AF8B81E 56570000 1CC80012 CAC95F5E ^_èò..à...WV.|«J.Ä.v..v..F¶.P.,K 000100
 4B4C9A50 16F8468D 0876FF0A 76FF0000 4B3C9A50 16F0468D 0876FF0A 76FF0000 ...v..v..FÞ.P.<K...v..v..F%.P.LK 000120
 76FFF276 FF00004B 699A006A 006A096A 006A0143 680676FF F476FFF6 76FF0000 ...v-.v¶.v.hC.j.j.j.j..iK...v·.v 000140
 00880006 E9037500 0030EE46 89000049 5E9A5016 FC468D17 6AF876FF FA76FFF0 Þ.v*.v%j..F=.P.^I...FŸ=..u.Õ..|. 000160
 76FFF676 FF0CC483 48860066 9A5016E4 46800062 681EFC76 FFFE76FF 0030E900 .ÕÕ..vz.v=.hb..FÕ.P.f..H.á..v-.v 000180
 5700001E C80006CA C95F5E1F 0000E900 00880000 47E69A50 16E4468D 0676FFF4 ¶.v..FÕ.P.lG..|..Õ...^_èò..à...W 0001A0
 46801476 FF1676FF 07892612 4688065E C4000107 C7260E5E C4D88E4B FEB81E56 V.|zK.Äá^.&ú...á^..F.&...v..v..F 0001C0
 46801476 FF1676FF 00004C0E 9A5016E8 46801476 FF1676FF 00004B1C 9A5016EC &.P..K...v..v..FÕ.P..L...v..v..F 0001E0
```

```
Dump of file SATURN:[PCCOMMON.DUMP.DLL]DAPROFDF.TMP;1 on 18-APR-1990 10:42:42.58
File ID (604,30,0)   End of file block 88 / Allocated 88

Virtual block number 41 (00000029), 512 (0200) bytes

 76FFE876 FFEA76FF  0004C2E 9A5016F8 468D1476 FF1676FF 00004C1E 9A5016E4 ô.P..L...v..v..F½.P..L...võ.vÒ.v 000000
 E9037500 003D04C4 o34DC163 EA9A5016 EE468D00 0048659A 5016EE46 8D0A6A12 .j..FŸ.P.eH...FŸ.P.ôcèM.á.=..u.Ô 000020
 FE46C7FF FFFC46C7 000AE9FE 5689FC46 8904C483 4C860062 9A5016EE 468D0016 ...FŸ.P.b..L.á..F=.V±Ô..úF•..úF± 000040
 5016FC46 8D176AF8 76FFFA76 FFE476FF E676FF00 004BBD9A E476FFE6 76FFFFFF ...vl.vô..K...vl.vô.v°.v½j..F•.P 000060
 9668E276 FF00004B BB9AE476 FFE676FF 002AE903 7500003D E2468900 004BA59A .ÊK...Fã=..u.Ô*..vl.vô.ÊK...vâh. 000080
 E476FFE6 76FF002D E9000088 000207C7 260E5EC4 000048CC 9A0A76FF 0C76FF01 ..v..v..àK..á^.&ú...¡..Ô-..vl.vô 0000A0
 714FC69A 010A6814 76FF1676 FF4DCF4D DE9A0108 681476FF 1676FF00 004BE59A .ÍK...v..v.h...ÞMuM.v..v.h...óOq 0000C0
 0876FF0A 76FFD88E 4CB3B81E 56570000 1CC80012 CAC95F5E 1F0000E9 0000B848 H¡..Ô...^_èò..à...WV.¡°L.Ä.v..v. 0000E0
 0876FF0A 76FF0000 4CF49A50 16F0468D 0876FF0A 76FF0000 4CE49A50 16FB4680 .F½.P.ôL...v..v..Fþ.P.¶L...v..v. 000100
 479A006A 006A096A 006A0143 680676FF F876FFFA 76FF0000 4D049A50 16FC4680 .F•.P..M...v°.v½.v.hC.j.j.j.j..G 000120
 0030EE46 8900004C 5F9A5016 F4468D19 6AFC76FF FE76FFF0 76FFF276 FF00004C L...v·.vþ.v±.v•j..F¶.P._L...FŸ=. 000140
 4D3A0066 9A5016E4 46800066 681EF476 FFF676FF 0030E900 00880006 E9037500 .u.Ô..¡..ÔO..v-.v¶.hf..FÔ.P.f.:M 000160
 C95F5E1F 0000E900 00880000 4C9A9A50 16E4468D 0676FFF8 76FFFA76 FF0CC483 .á..v°.v½.v..FÔ.P..L..¡..Ô...^_è 000180
 07892612 4688065E C4000107 C7260E5E C4D88E4D E6881E56 5700001E C80006CA ò..à...WV.¡ÍM.Ää^.&ú...á^..F.&.. 0001A0
 00004DF6 9A5016F6 468D1476 FF1676FF 00004CD4 9A5016FA 468D1476 FF1676FF .v..v..F°.P.ÂL...v..v..F-.P.-M.. 0001C0
 00004E16 9A5016FC 468D1476 FF1676FF 00004E06 9A5016EE 468D1476 FF1676FF .v..v..FŸ.P..N...v..v..F•.P..N.. 0001E0

Dump of file SATURN:[PCCOMMON.DUMP.DLL]DAPROFDF.TMP;1 on 18-APR-1990 10:42:42.58
File ID (604,30,0)   End of file block 88 / Allocated 88

Virtual block number 42 (0000002A), 512 (0200) bytes

 834FA963 EA9A5016 E4468000 004D199A 5016E446 8D0A6A12 76FFF676 FFF876FF .v½.v-.v.j..FÔ.P..M...FÔ.P.ôc`O. 000000
 000AE9F4 5689F246 8904C483 4E6E0062 9A5016E4 46800016 E9037500 003D04C4 á.=..u.Ô...FÔ.P.b.nN.á..F·.V¶Ô.. 000020
 76FFFE76 FFEE76FF F076FF00 004D599A EE76FFF0 76FFFFFF F446C7FF FFF246C7 úF·..úF¶...vþ.vŸ.YM...vþ.vŸ.v±.v 000040
 879AEE76 FFF076FF 002AE903 7500003D E2468900 004D719A 5016F246 8D196AFC •j..F .P.qM...Fâ=..u.Ô*..vþ.vŸ.. 000060
 E90000BB 000207C7 260E5EC4 00004D98 9A0A76FF 0C76FF01 9668E276 FF00004D M...vâh...v..v...M..á^.&ú...¡..Ô 000080
 76FF1676 FF4FB74B F69A0153 681476FF 1676FF00 004DB19A EE76FFF0 76FF002D -..vþ.vŸ.ŸM...v..v.hS..-KñO.v..v 0000A0
 4E9BB81E 56570000 1CC80012 CAC95F5E 1F0000E9 0000B84D 254FC69A 010A6814 .h...óO%M¡..Ô...^_èò..à...WV.¡.N 0000C0
 4EDC9A50 16F0468D 0876FF0A 76FF0000 4ECC9A50 16F4468D 0876FF0A 76FFD88E .Ä.v..v..F¶.P.àN...v..v..Fþ.P.ÊN 0000E0
 006A0143 680676FF F476FFF6 76FF0000 4EEC9A50 16FC468D 0876FF0A 76FF0000 ...v..v..F•.P.$N...v-.v¶.v.hC.j. 000100
 479A5016 F8468D18 6AFC76FF FE76FFF0 76FFF276 FF00004E 2F9A006A 006A096A j.j.j../N...v·.vþ.v±.v•j..F½.P.G 000120
 4680006A 681EF876 FFFA76FF 0030E900 00880006 E9037500 003DEE46 8900004E N...FŸ=..u.Ô..¡..ÔO..v°.v½.hj..F 000140
 00880000 4E829A50 16E4468D 0676FFF4 76FFF676 FF0CC483 4F220066 9A5016E4 ô.P.f."O.á..v-.v¶.v..FÔ.P..N..¡. 000160
 C4000107 C7260E5E C4D88E4F CE881E56 5700001E C80006CA C95F5E1F 0000E900 .Ô...^_èò..à...WV.¡öO.Ää^.&ú...á 000180
 468D1476 FF1676FF 00004EBC 9A5016EC 46801476 FF1676FF 07892612 4688065E ^..F.&...v..v..F$.P.ŸN...v..v..F 0001A0
 468D1476 FF1676FF 00004FEE 9A5016E4 46801476 FF1676FF 00004FDE 9A5016E8 Ô.P.ÞO...v..v..FÔ.P.ŸO...v..v..F 0001C0
 EE468D00 004F019A 5016EE46 800A6A12 76FFE876 FFEA76FF 00004FFE 9A5016FC •.P.±O...võ.vÒ.v.j..FŸ.P..O...FŸ 0001E0

Dump of file SATURN:[PCCOMMON.DUMP.DLL]DAPROFDF.TMP;1 on 18-APR-1990 10:42:42.58
File ID (604,30,0)   End of file block 88 / Allocated 88

Virtual block number 43 (0000002B), 512 (0200) bytes

 8904C483 50560062 9A5016EE 46800016 E9037500 003D04C4 83519163 EA9A5016 .P.ôc.Q.á.=..u.Ô...FŸ.P.b.VP.á.. 000000
 E676FF00 004F419A E476FFE6 76FFFFFF FA46C7FF FFF846C7 000AE9FA 5689F846 F½.V°Ô..úF½..úF°...vl.vô.AO...vl 000020
 002AE903 7500003D E2468900 004F599A 5016F846 8D186AFC 76FFFE76 FFE476FF .vô.v±.v•j..F½.P.YO...Fã=..u.Ô*. 000040
 260E5EC4 00004F80 9A0A76FF 0C76FF01 9668E276 FF00004F 6F9AE476 FFE6/ 'F .vl.vô.oO...vâh...v..v...O..á^.& 000060
 F69A0153 681476FF 1676FF00 004F999A E476FFE6 76FF002D E9000088 000207.? ú...¡..Ô-..vl.vô..O...v... hS..- 000080
 20C80012 CAC95F5E 1F0000E9 0000B84F 004DDE9A 01086814 76FF1676 FF519F4# K.Q.v..v.h...ÞM.O¡..Ô...^_èò..à  0000A0
 0876FF0A 76FF0000 50849A50 16F8468D 0876FF0A 76FFD88E 5083B81E 56570000 ..WV.¡.P.Ä.v..v..F½.P.ÇP...v..v. 0000C0
 F876FFFA 76FF0000 50049A50 16FC4680 0876FF0A 76FF0000 50C49A50 16F4468D .F¶.P.áP...v..v..F•.P.àP...v°.v½ 0000E0
 6AFC76FF FE76FFF4 76FFF676 FF000050 179A006A 006A116A 006A0143 680676FF .v.hC.j.j.j.j...P...v-.v¶.v±.v•j 000100
 FFFA76FF 0019E900 00880006 E9037500 003DF246 89000050 2F9A5016 E046801A ..FÂ.P./P...F·=..u.Ô..¡..Ô...v°. 000120
 000022C8 0006CAC9 5F5E1F00 00E90000 88000050 6A9A5016 E0468006 76FFF876 v½.v..FÂ.P.jP..¡..Ô...^_èò..à".. 000140
 801476FF 1676FF07 89261246 88065EC4 000107C7 260E5EC4 D88E5186 881E5657 WV.¡ÑO.Ää^.&ú...á^..F.&...v..v.. 000160
 801476FF 1676FF00 0051C69A 5016F646 801476FF 1676FF00 0050A49A 5016FA46 F°.P.ÊP...v..v..F-.P.óQ...v..v.. 000180
 FFF676FF F876FF00 0051E69A 5016FC46 801476FF 1676FF00 0051D69A 5016E046 FÂ.P.øQ...v..v..F•.P.ÌQ...v½.v-. 0001A0
 FFE076FF E276FF00 0051299A E076FFE2 76FF0000 50E99A50 16E4468D 126A1276 v.j..FÔ.P.ÔP...vã.vÂ.)Q...vã.vÂ. 0001C0
 FFE276FF 002AE903 7500003D DE468900 0051419A 5016E446 8D1A6AFC 76FFFE76 v±.v•j..FÔ.P.AQ...Fß=..u.Ô*..vã. 0001E0
```

```
Dump of file SATURN:[PCCOMMON.DUMP.DLL]DAPROFDF.TMP;1 on 18-APR-1990 10:42:42.58
File ID (604,30,0)   End of file block 88 / Allocated 88

Virtual block number 44 (0000002C), 512 (0200) bytes

 000207C7 260E5EC4 00005168 9A0A76FF 0C76FF01 9668DE76 FF000051 579AE076 vÅ.WQ...v8h...v..v..hQ. á^.&ú... 000000
 FF533B53 4A9A0155 681476FF 1676FF00 0051819A E076FFE2 76FF002D E9000088 ¡..Ô-..vã.vÅ..Q...v..v.h!..JS;S. 000020
 56570000 20C80012 CAC95F5E 1F0000E9 00008850 F554E69A 01066814 76FF1676 v..v.h...ÌTÆP¡..Ô...^_èò..à ..WV 000040
 16F4468D 0876FF0A 76FF0000 52859A50 16F8468D 0876FF0A 76FFD88E 5254B81E .¡TR.Ä.v..v..F%.P..R...v..v..F¶. 000060
 680676FF F876FFFA 76FF0000 52A59A50 16FC468D 0876FF0A 76FF0000 52959A50 P..R...v..v..F=.P.ÉR...v*.v½.v.h 000080
 E046801B 6AFC76FF FE76FFF4 76FFF676 FF000051 FF9A006A 006A116A 006A0143 C.j.j.j.j...Q...v~.v¶.v±.v•j..FÅ 0000A0
 76FFF876 FFFA76FF 0019E900 00880006 E9037500 003DF246 89000052 179A5016 .P..R...F·=..u.Ô..¡..Ô...v*.v½.v 0000C0
 B81E5657 000022C8 0006CAC9 5F5E1F00 00E90000 88000052 3B9A5016 E0468006 ..FÅ.P.;R..¡..Ô...^_èò..à"..WV.¡ 0000E0
 5016E846 8D1476FF 1676FF07 89261246 88065EC4 000107C7 260E5EC4 D88E5352 RS.Äá^.&ú...á^..F.&...v..v..FÒ.P 000100
 5016E046 8D1476FF 1676FF00 0053629A 5016E446 8D1476FF 1676FF00 0052759A .uR...v..v..FÒ.P.bS...v..v..FÅ.P 000120
 126A1276 FFE476FF E676FF00 0053829A 5016FC46 8D1476FF 1676FF00 0053729A .rS...v..v..F•.P..S...vǀ.vô.v.j. 000140
 76FFFE76 FFE076FF E276FF00 0052C59A E076FFE2 76FF0000 528A9A50 16EA468D .Fõ.P.¤R...vã.vÅ.éR...vã.vÅ.v±.v 000160
 F39AE076 FFE276FF 002AE903 7500003D DE468900 00520D9A 5016EA46 8D1B6AFC •j..Fõ.P.1R...FB=..u.Ô*..vã.vÅ.µ 000180
 E9000088 000207C7 260E5EC4 00005304 9A0A76FF 0C76FF01 9668DE76 FF000052 R...v8h...v..v...S..á^.&ú...¡..Ô 0001A0
 76FF1676 FF54D751 AE9A010C 681476FF 1676FF00 0053109A E076FFE2 76FF002D -...vã.vÅ..S...v..v.h...ÜQ®T.v..v 0001C0
 53F0B81E 56570000 20C80012 CAC95F5E 1F0000E9 00008853 2D54E69A 01066814 .h...ÌT-S¡..Ô...^_èò..à ..WV.¡ÞS 0001E0

Dump of file SATURN:[PCCOMMON.DUMP.DLL]DAPROFDF.TMP;1 on 18-APR-1990 10:42:42.58
File ID (604,30,0)   End of file block 88 / Allocated 88

Virtual block number 45 (0000002D), 512 (0200) bytes

 54319A50 16F4468D 0876FF0A 76FF0000 54219A50 16F8468D 0876FF0A 76FFD88E .Ä.v..v..F%.P.!T...v..v..F¶.P.1T 000000
 006A0143 680676FF F876FFFA 76FF0000 54419A50 16FC468D 0876FF0A 76FF0000 ...v..v..F=.P.AT...v*.v½.v.hC.j. 000020
 B39A5016 E046801C 6AFC76FF FE76FFF4 76FFF676 FF000053 9B9A006A 006A116A j.j.j...S...v~.v¶.v±.v•j..FÅ.P.* 000040
 E0468006 76FFF876 FFFA76FF 0019E900 00880006 E9037500 003DF246 89000053 S...F·=..u.Ô..¡..Ô...v*.v½.v..FÅ 000060
 D88E54EE 881E5657 000022C8 0006CAC9 5F5E1F00 00E90000 88000053 D79A5016 .P.■S..¡..Ô...^_èò..à"..WV.¡YT.Ä 000080
 0054119A 5016FA46 8D1476FF 1676FF07 89261246 88065EC4 000107C7 260E5EC4 á^.&ú...á^..F.&...v..v..F*.P..T. 0000A0
 00550E9A 5016F246 8D1476FF 1676FF00 0054FE9A 5016F646 8D1476FF 1676FF00 ..v..v..F-.P.±T...v..v..F·.P..U. 0000C0
 16E04680 126A1276 FFF676FF F876FF00 00551E9A 5016FC46 8D1476FF 1676FF00 ..v..v..F•.P..U...v½.v~.v.j..FÅ. 0000E0
 8D1C6AFC 76FFFE76 FFF276FF F476FF00 0054619A F276FFF4 76FF0000 54569A50 P.VT...v¶.v·.aT...v¶.v·.v±.v•j.. 000100
 FF000054 8F9AF276 FFF476FF 002AE903 7500003D DE468900 0054799A 5016E046 FÅ.P.yT...FB=..u.Ô*..v¶.v·..T... 000120
 76FF002D E9000088 000207C7 260E5EC4 000054A0 9A0A76FF 0C76FF01 9668DE76 v8h...v..v...T..á^.&ú...¡..Ô-..v 000140
 01556814 76FF1676 FF567351 AE9A010C 681476FF 1676FF00 0054B99A F276FFF4 ¶.v·.¿T...v..v.h...ÜQsV.v..v.hU. 000160
 76FFD88E 558CB81E 56570000 20C80012 CAC95F5E 1F0000E9 00008854 C9534A9A .JSèT¡..Ô...^_èò..à ..WV.¡.U.Ä.v 000180
 76FF0000 55CD9A50 16F4468D 0876FF0A 76FF0000 55BD9A50 16F8468D 0876FF0A ..v..F%.P.§U...v..v..F¶.P.èU...v 0001A0
 006A116A 006A0143 680676FF F876FFFA 76FF0000 55DD9A50 16FC468D 0876FF0A ..v..F=.P.\U...v*.v½.v.hC.j.j.j. 0001C0
 89000055 4F9A5016 E046801D 6AFC76FF FE76FFF4 76FFF676 FF000055 379A006A j..7U...v~.v¶.v±.v•j..FÅ.P.OU... 0001E0

Dump of file SATURN:[PCCOMMON.DUMP.DLL]DAPROFDF.TMP;1 on 18-APR-1990 10:42:42.58
File ID (604,30,0)   End of file block 88 / Allocated 88

Virtual block numb - 46 (0000002E), 512 (0200) bytes

 739A5016 E0468006 76FFF876 FFFA76FF 0019E900 00880006 E9037500 003DF246 F·=..u.Ô..¡..Ô...v*.v½.v..FÅ.P.s 000000
 260E5EC4 D88E568A B81E5657 000022C8 0006CAC9 5F5E1F00 00E90000 88000055 U..¡..Ô...^_èò..à"..WV.¡.V.Äá^.& 000020
 1676FF00 0055AD9A 5016E846 8D1476FF 1676FF07 89261246 88065EC4 000107C7 ú...á^..F.&...v..v..FÒ.P.ÜU...v. 000040
 1676FF00 0056AA9A 5016E046 8D1476FF 1676FF00 00569A9A 5016E446 8D1476FF .v..FÒ.P..V...v..v..FÅ.P.¨V...v. 000060
 55F29A50 16EA468D 126A1276 FFE476FF E676FF00 0056BA9A 5016FC46 8D1476FF .v..F•.P.¤V...vǀ.vô.v.j..Fõ.P.·U 000080
 5016EA46 8D1D6AFC 76FFFE76 FFE076FF E276FF00 0055F09A E076FFE2 76FF0000 ...vã.vÅ.wU...vã.vÅ.v±.v•j..Fõ.P 0000A0
 9668DE76 FF000056 289AE076 FFE276FF 002AE903 7500003D DE468900 0056159A ..V...FB=..u.Ô*..vã.vÅ.+V...v8h. 0000C0
 E076FFE2 76FF002D E9000088 000207C7 260E5EC4 0000563C 9A0A76FF 0C76FF01 ..v..v..<V..á^.&ú...¡..Ô-..vã.vÅ 0000E0
 65581E9A 01576814 76FF1676 FF580F59 9A9A0102 681476FF 1676FF00 0056559A .UV...v..v.h...¤Y.X.v..v.hW...Xe 000100
 0876FF0A 76FFD88E 5728B81E 56570000 20C80012 CAC95F5E 1F0000E9 00008856 V¡..Ô...^_èò..à ..WV.¡(W.Ä.v..v. 000120
 0876FF0A 76FF0000 57699A50 16F4468D 0876FF0A 76FF0000 57599A50 16F8468D .F%.P.YW...v..v..F¶.P.iW...v..v. 000140
 039A006A 006A116A 006A0143 680676FF F876FFFA 76FF0000 57799A50 16FC468D .F•.P.yW...v*.v½.v.hC.j.j.j.j..& 000160
 003DF246 89000056 EB9A5016 E046801E 6AFC76FF FE76FFF4 76FFF676 FF000056 V...v~.v¶.v±.v•j..FÅ.P.ŠV...F·=. 000180
 88000057 0F9A5016 E0468006 76FFF876 FFFA76FF 0019E900 00880006 E9037500 .u.Ô..¡..Ô...v*.v½.v..FÅ.P..W..¡ 0001A0
 000107C7 260E5EC4 D88E5826 B81E5657 000024C8 0006CAC9 5F5E1F00 00E90000 ..Ô...^_èò..à$..WV.¡&X.Äá^.&ú... 0001C0
 8D1476FF 1676FF00 0057499A 5016FA46 8D1476FF 1676FF07 89261246 88065EC4 á^..F.&...v..v..F*.P.IW...v..v.. 0001E0
```

```
Dump of file SATURN:[PCCOMMON.DUMP.DLL]DAPROFDF.TMP;1 on 18-APR-1990 10:42:42.58
File ID (604,30,0)   End of file block 88 / Allocated 88

Virtual block number 47 (0000002F), 512 (0200) bytes

 8D1476FF 1676FF00 0058469A 5016F246 8D1476FF 1676FF00 0058369A 5016F646 F-.P.6X...v..v..F·.P.FX...v..v.. 000000
 76FF0000 578E9A5C 160E468D 146A1276 FFF676FF F876FF00 0058569A 5016FC46 F•.P.VX...v½.v-.v.j..FB.P..W...v 000020
 0057819A 5016DE46 8D1E6AFC 76FFFE76 FFF276FF F476FF00 0057999A F276‹ F4 ¶.v·..W...v¶.v·.v±.v•j..FB.P.ŸW. 000040
 0C76FF01 96680C76 FF000057 C79AF276 FFF476FF 002AE903 7500003D DC468· 0 ..FÊ=..u.Ô*..v¶.v·.úW...vÉh...v. 000060
 0057F19A F276FFF4 76FF0020 E9000088 000207C7 260E5EC4 000057D8 9A0A76FF .v..ÄW..é^.&ú...|..Ô-..v¶.v·.þW. 000080
 00008858 0156829A 01046814 76FF1676 FF59AB59 BA9A0102 681476FF 1676FF00 ..v..v.h...oY Y.v..v.h....V.X|.. 0000A0
 16F8468D 0876FF0A 76FFD88E 58C4B81E 56570000 22C80012 CAC95F5E 1F0000E9 Ö...^_èò..à"..WV.|éX.Ä.v..v..F%. 0000C0
 16FC468D 0876FF0A 76FF0000 59059A50 16F4468D 0876FF0A 76FF0000 58F59A50 P.XX...v..v..F¶.P..Y...v..v..F=. 0000E0
 FF000058 6F9A006A 006A126A 006A0143 680676FF F876FFFA 76FF0000 59159A50 P..Y...v°.v½.v.hC.j.j.j.j..oX... 000100
 E9037500 003DF246 89000058 879A5016 DE468D1F 6AFC76FF FE76FFF4 76FFF676 v-.v¶.v±.v•j..FB.P..X...F·=..u.Ô 000120
 00E90000 B8000058 AB9A5016 DE468D06 76FFF876 FFFA76FF 0019E900 00880006 ..|..Ô...v°.v½.v..FB.P. X..|..Ô. 000140
 88065EC4 000107C7 260E5EC4 D88E59C2 881E5657 000022C8 0006CAC9 5F5E1F00 ..^_èò..à"..WV.|ÖY.Äé^.&ú...é^.. 000160
 5016E446 8D1476FF 1676FF00 0058E59A 5016E846 8D1476FF 1676FF07 89261246 F.&...v..v..FÒ.P.[X...v..v..FÒ.P 000180
 5016FC46 8D1476FF 1676FF00 0059E29A 5016E046 8D1476FF 1676FF00 0059D29A .ØY...v..v..FÀ.P.âY...v..v..F•.P 0001A0
 E076FFE2 76FF0000 592A9A50 16EA468D 126A1276 FFE476FF E676FF00 0059F29A .·Y...v|.vò.v.j..Fõ.P.*Y...vä.vÅ 0001C0
 DE468900 0059409A 5016EA46 8D1F6AFC 76FFFE76 FFE076FF E276FF00 0059359A .5Y...vä.vÅ.v±.v•j..Fõ.P.MY...FB 0001E0
```

```
Dump of file SATURN:[PCCOMMON.DUMP.DLL]DAPROFDF.TMP;1 on 18-APR-1990 10:42:42.58
File ID (604,30,0)   End of file block 88 / Allocated 88

Virtual block number 48 (00000030), 512 (0200) bytes

 9A0A76FF 0C76FF01 96680E76 FF000059 639AE076 FFE276FF 002AE903 7500003D =..u.Ô*..vã.vÅ.cY...vBh...v..v.. 000000
 1676FF00 00598D9A E076FFE2 76FF0020 E9000088 000207C7 260E5EC4 00005974 tY..é^.&ú...|..Ô-..vä.vÅ..Y...v. 000020
 1F0000E9 00008859 9D56829A 01046814 76FF1676 FF584758 1E9A0157 681476FF .v.hW...XG[.v..v.h....V.Y|..Ô... 000040
 0876FFFE A08689FE A2868900 0088088E 5A60881E 56570001 62C80012 CAC95F5E ^_èò..åb..WV.|'Z.Ä|...._Å±...±.v. 000060
 FF00005A 819A5016 FEB0868D 0676FF08 76FF0000 5A919A50 16FEAC86 800676FF .v...¯±.P..Z...v..v...¯±.P..Z... 000080
 0036FF26 1A00068E FEA0B6FF FEA2B6FF 00005AA1 9A5016FE A4868D06 76FF0876 v..v...Ê±.P.ÀZ...ÑÅ±.Ñ.±....&.6. 0000A0
 86890000 5AD19AFE A4B6FFFE A6B6FF00 005C589A 5016FEB2 86800101 68116A02 .j.h....ý±.P.X\...Ñ|±.ÑÉ±.12.... 0000C0
 86890000 FFFF9AFE A4B6FFFE A6B6FF01 71E9FE9E 86880007 E9037500 003DFE9E .±=..u.Ô.....±Ôq..Ñ|±.ÑÉ±....... 0000E0
 86FF0144 E9FE9E86 8800005C 309AFEA4 B6FFFEA6 B6FF0014 E9037500 003DFE9E .±=..u.Ô...Ñ|±.ÑÉ±.0\.....±ÔD..Ñ 000100
 9AFEA4B6 FFFEA6B6 FF0014E9 03750000 3DFE9EB6 8900005B 299AFEA4 B6FFFEA6 |±.ÑÉ±.)[.....±=..u.Ô...Ñ|±.ÑÉ±. 000120
 0168126A 020036FF 261A0006 8EFEA0B6 FFFEA2B6 FF0117E9 FE9E868B 00005AFF .Z.....±Ô...ÑÅ±.Ñ.±....&.6..j.h. 000140
 890000FF FF9A5016 FEA8868D FEA4B6FF FEA6B6FF 0000FFFF 9A5016FE B2868D01 ...ý±.P......Ñ|±.ÑÉ±..¨±.P...... 000160
 B6FFFEAA B6FFFEA4 B6FFFEA6 B6FF0000 E9FE9EB6 880007E9 03750000 3DFE9EB6 ..±=..u.Ô.....±ÔÅ..Ñ|±.ÑÉ±.Ñ¨±.Ñ 000180
 A1E9FE9E 86880007 E9037500 003DFE9E 86890000 5A239A50 16844680 016AFEA8 ¨±j..FÇ.P.#Z.....±=..u.Ô.....±ÔÅ 0001A0
 50599A06 76FF0876 FF0000FF FF9A5016 84468D50 16FE8286 8D0676FF 0876FF00 ..v..v...ý±.P.FÇ.P......v..v..Y] 0001C0
 FF9A006A 006A0676 FF0876FF 0000FFFF 9A006A00 6A0676FF 0876FF04 C4835D08 .}.é..v..v.j.j.......v..v.j.j... 0001E0
```

```
Dump of file SATURN:[PCCOMMON.DUMP.DLL]DAPROFDF.TMP;1 on 18-APR-1990 10:42:42.58
File ID (604,30,0)   End of file block 88 / Allocated 88

Virtual block number 49 (00000031), 512 (0200) bytes

 FFFF685D 1C680676 FF0876FF 0000FFFF 9AFFFF68 FFFF6806 76FF0876 FF0000FF ....v..v.h..h........v..v.h.]h.. 000000
 006A006A 0676FF08 76FF0000 FFFF9AFF FF685B39 680676FF 0876FF00 00FFFF9A ......v..v.h9[h........v..v.j.j. 000020
 E90000B8 0000FFFF 9A020036 FF261A00 068E0100 680676FF 0876FF00 00FFFF9A ......v..v.h......&.6.......|..Ô 000040
 75680151 680676FF 0876FFD8 8E5B5EB8 1E565700 0000C800 04CAC95F 5E1F0000 ...^_èò..å...WV.|^[.Ä.v..v.hQ.hu 000060
 9568013B 680676FF 0876FF00 005DA19A 006A006A 006AFFFF 685D8F68 FFFF685D ]h..h̄.]h..j.j.j..Å]...v..v.h;.h. 000080
 95680139 680676FF 0876FF00 00FFFF9A 006A006A 006AFFFF 685CD068 FFFF685D ]h..hÅ\h..j.j.j.......v..v.h9.hç 0000A0
 D568013E 680676FF 0876FF00 005DE19A 006A006A 006AFFFF 685DCF68 FFFF685D ]h..hú]h..j.j.j..Å]...v..v.h>.hÏ 0000C0
 F568013F 680676FF 0876FF00 005E019A 006A006A 006AFFFF 685DEF68 FFFF685D ]h..hÿ]h..j.j.j...^...v..v.h?.h% 0000E0
 15680140 680676FF 0876FF00 005E219A 006A006A 006AFFFF 685E0F68 5E12685D ]h.^h.^h..j.j.j..!^...v..v.h@.h. 000100
 35680141 680676FF 0876FF00 005E419A 006A006A 006AFFFF 685E2F68 5E32685E ^h2^h/^h..j.j.j..A^...v..v.hA.h5 000120
 55680143 680676FF 0876FF00 005E619A 006A006A 006AFFFF 685E4F68 FFFF685E ^h..hO^h..j.j.j..a^...v..v.hC.hU 000140
 75680142 680676FF 0876FF00 005E819A 006A006A 006AFFFF 685E6F68 5E72685E ^hr^ho^h..j.j.j...^...v..v.hB.hu 000160
 95680144 680676FF  }76FF00 005EA19A 006A006A 006AFFFF 685E8F68 5E92685E ^h.^h.^h..j.j.j..Å^...v..v.hD.h. 000180
 B5680146 680676FF uu76FF00 005EC19A 006A006A 006AFFFF 685EAF68 FFFF685E ^h..hÉ^h..j.j.j..è^...v..v.hF.hç 0001A0
 D5680145 680676FF 0876FF00 005EE19A 006A006A 006AFFFF 685ECF68 5ED2685E ^h®^hú^h..j.j.j..Ã^...v..v.hE.hÏ 0001C0
 F5680147 680676FF 0876FF00 005F019A 006A006A 006AFFFF 685EEF68 5EF2685E ^h·^hÿ^h..j.j.j..._...v..v.hG.h% 0001E0
```

```
Dump of file SATURN:[PCCOMMON.DUMP.DLL]DAPROFDF.TMP;1 on 18-APR-1990 10:42:42.58
File ID (604,30,0)   End of file block 88 / Allocated 88

Virtual block number 50 (00000032), 512 (0200) bytes

 15680148 680676FF 0876FF00 005F219A 006A006A 006AFFFF 685F0F68 FFFF685E ^h..h._h..j.j.j..!_...v..v.hM.h. 000000
 35680149 680676FF 0876FF00 005F419A 006A006A 006AFFFF 685F2F68 5F32685F _h2_h/_h..j.j.j..A_...v..v.hI.h5 000020
 5568014A 680676FF 0876FF00 005F619A 006A006A 006AFFFF 685F4F68 5F52685F _hR_hO_h..j.j.j..a_...v..v.hJ.hU 000040
 7568014B 680676FF 0876FF00 005F819A 006A006A 006AFFFF 685F6F68 5F72685F _hr_ho_h..j.j.j..._...v..v.hK.hu 000060
 9568014C 680676FF 0876FF00 005FA19A 006A006A 006AFFFF 685F8F68 FFFF685F _h..h._h..j.j.j..À_...v..v.hL.h. 000080
 B568014D 680676FF 0876FF00 005FC19A 006A006A 006AFFFF 685FAF68 5FB2685F _hý_h£_h..j.j.j..ê_...v..v.hM.hç 0000A0
 D568014E 680676FF 0876FF00 005FE19A 006A006A 006AFFFF 685FCF68 5FD2685F _h@_hü_h..j.j.j..Ã_...v..v.hN.hí 0000C0
 F568014F 680676FF 0876FF00 0060019A 006A006A 006AFFFF 685FEF68 5FF2685F _h·_hÿ_h..j.j.j...¯...v..v.hO.h% 0000E0
 15680159 680676FF 0876FF00 005D819A 006A006A 006AFFFF 68600F68 FFFF685F _h..h.`h..j.j.j...]...v..v.hY.h. 000100
 3568015A 680676FF 0876FF00 0060419A 006A006A 006AFFFF 685D6F68 FFFF6860 `h..ho]h..j.j.j..A`...v..v.hZ.h5 000120
 55680121 680676FF 0876FF00 0060619A 006A006A 006AFFFF 68604F68 60126860 `h.`hO`h..j.j.j..a`...v..v.hI.hU 000140
 7568015F 680676FF 0876FF00 0060819A 006A006A 006AFFFF 68606F68 FFFF6860 `h..ho`h..j.j.j...`...v..v.h_.hu 000160
 95680160 680676FF 0876FF00 0060A19A 006A006A 006A6098 68608F68 60926860 `h.`h.`h.`j.j.j..À`...v..v.h¯.h. 000180
 B5680123 680676FF 0876FF00 0060C19A 006A006A 006AFFFF 6860AF68 FFFF6860 `h..h£`h..j.j.j..ê`...v..v.h#.hç 0001A0
 D5680127 680676FF 0876FF00 0060E19A 006A006A 006AFFFF 6860CF68 FFFF6860 `h..hü`h..j.j.j..Ã`...v..v.h'.hí 0001C0
 F5680125 680676FF 0876FF00 0061019A 006A006A 006AFFFF 6860EF68 FFFF6860 `h..hÿ`h..j.j.j...a...v..v.hX.h% 0001E0

Dump of file SATURN:[P_COMMON.DUMP.DLL]DAPROFDF.TMP;1 on 18-APR-1990 10:42:42.58
File ID (604,30,0)   End of file block 88 / Allocated 88

Virtual block number 51 (00000033), 512 (0200) bytes

 15680129 680676FF 0876FF00 0061219A 006A006A 006AFFFF 68610F68 FFFF6860 `h..h.ah..j.j.j..!a...v..v.h).h. 000000
 3568012D 680676FF 0876FF00 0061419A 006A006A 006AFFFF 68612F68 FFFF6861 ah..h/ah..j.j.j..Aa...v..v.h-.h5 000020
 5568012C 680676FF 0876FF00 0061619A 006A006A 006AFFFF 68614F68 61526861 ahRahOah..j.j.j..aa...v..v.h,.hU 000040
 7568012B 680676FF 0876FF00 0061819A 006A006A 006AFFFF 68616F68 61726861 ahrahoah..j.j.j...a...v..v.h+.hu 000060
 9568011B 680676FF 0876FF00 0061A19A 006A006A 006AFFFF 68618F68 FFFF6861 ah..h.ah..j.j.j..Àa...v..v.h..h. 000080
 B568011D 680676FF 0876FF00 0061C19A 006A006A 006AFFFF 6861AF68 FFFF6861 ah..h£ah..j.j.j..èa...v..v.h..hç 0000A0
 D568011E 680676FF 0876FF00 0061E19A 006A006A 006AFFFF 6861CF68 61D26861 ah@ahüah..j.j.j..Ãa...v..v.h..hí 0000C0
 F568011F 680676FF 0876FF00 0062019A 006A006A 006AFFFF 6861EF68 61F26861 ah·ahÿah..j.j.j...b...v..v.h..h% 0000E0
 15680115 680676FF 0876FF00 0062219A 006A006A 006AFFFF 68620F68 FFFF6861 ah..h.bh..j.j.j..!b...v..v.h..h. 000100
 35680117 680676FF 0876FF00 0062419A 006A006A 006AFFFF 68622F68 62326862 bh2bh/bh..j.j.j..Ab...v..v.h..h5 000120
 55680116 680676FF 0876FF00 0062619A 006A006A 006AFFFF 68624F68 62526862 bhRbhObh..j.j.j..ab...v..v.h..hU 000140
 75680113 680676FF 0876FF00 0062819A 006A006A 006AFFFF 68626F68 FFFF6862 bh..hobh..j.j.j...b...v..v.h..hu 000160
 9568010F 680676FF 0876FF00 005DC19A 006A006A 006AFFFF 68628F68 FFFF6862 bh..h.bh..j.j.j..è]...v..v.h..h. 000180
 B568010E 680676FF 0876FF00 0062C19A 006A006A 006AFFFF 685DAF68 FFFF6862 bh..h£]h..j.j.j..éb...v..v.h..hç 0001A0
 D5680153 680676FF 0876FF00 0062E19A 006A006A 006AFFFF 6862CF68 62926862 bh.bhübh..j.j.j..Àb...v..v.hS.hí 0001C0
 F5680108 680676FF 0876FF00 0063019A 006A006A 006AFFFF 6862EF68 FFFF6862 bh..hybh..j.j.j...c...v..v.h..h% 0001E0

Dump of file SATURN:[PCCOMMON.DUMP.DLL]DAPROFDF.TMP;1 on 18-APR-1990 10:42:42.58
File ID (604,30,0)   End of file block 88 / Allocated 88

Virtual block number 52 (00000034), 512 (0200) bytes

 1568010A 680676FF 0876FF00 0063219A 006A006A 006AFFFF 68630F68 FFFF6862 bh..h.ch..j.j.j..!c...v..v.h..h. 000000
 3568010C 680676FF 0876FF00 0063419A 006A006A 006AFFFF 68632F68 FFFF6863 ch..h/ch..j.j.j..Ac...v..v.h..h5 000020
 55680155 680676FF 0876FF00 0063619A 006A006A 006AFFFF 68634F68 FFFF6863 ch..hOch..j.j.j..ac...v..v.hU.hU 000040
 75680106 680676FF 0876FF00 0063819A 006A006A 006AFFFF 68636F68 FFFF6863 ch..hoch..j.j.j...c...v..v.h..hu 000060
 95680104 680676FF 0876FF00 0063A19A 006A006A 006AFFFF 68638F68 FFFF6863 ch..h.ch..j.j.j..Àc...v..v.h..h. 000080
 B5680157 680676FF 0876FF00 0063C19A 006A006A 006AFFFF 6863AF68 FFFF6863 ch..h£ch..j.j.j..èc...v..v.hW.hç 0000A0
 D5680102 680676FF 0876FF00 0063E19A 006A006A 006AFFFF 6863CF68 FFFF6863 ch..hüch..j.j.j..Ãc...v..v.h..hí 0000C0
 56570000 04C8CBC9 5F5E1F00 0060219A 006A006A 006AFFFF 68602F68 FFFF6863 ch..h/`h..j.j.j..!`...^_^ùà...WV 0000E0
 0003E900 00FE46C7 004CE900 00B80006 E9037400 3F802606 5EC4D88E 5D61B81E .¡a].Àá^.&.?.t.Õ..¡..ÕL¯ü^±..Õ.. 000100
 260676C4 FE5E8B00 25E90377 FE463B04 C483510A 00469A06 76FF0876 FFFE46FF .F±.v..v..F..Q.á.;F±w.ÕX..^±óv.& 000120
 018BFFC2 E90009E9 00008B00 06E90374 04006F87 F6088B98 FC468AFC 4688008A ...F=.F=..Ã-.o..t.Õ..¡..Õ..Õó.¡. 000140
 5DD80005 00E90003 018F0203 3BE00001 61380005 007890CB C95F5E1F 0000E900 .Õ...^_èù.x...8a..Á;......Õ...À] 000160
 5A080103 54E60001 63720005 00000001 62AF0002 00680003 62A10203 07E20001 ..ã...Ãb..k...£b......rc..ÌT...Z 000180
 359F0103 01690004 5C030203 53E80001 63580005 3FE70001 61D80005 007F0001 ......Áa..Ó?..Xc..ÕS...\..i....5 0001A0
 641C0002 0BE80001 5E180005 24E80001 5FD80005 18690001 5F120005 00810001 ......._..i...Ã_..$$...^..Š....d 0001C0
 5D720005 00860001 5A470103 206C0001 60780005 00040001 00D30103 00000003 ......Æ.......x¯..l-..GZ......r] 0001E0
```

```
Dump of file SATURN:[PCCOMMON.DUMP.DLL]DAPROFDF.TMP;1 on 18-APR-1990 10:42:42.58
File ID (604,30,0)   End of file block 88 / Allocated 88

Virtual block number 53 (00000035), 512 (0200) bytes

 5E780005 49F00001 62780005 00870001 5AC60103 43EE0001 62180005 01EE0001 ..Y....b..YC..6Z......ib..Þl..x^ 000000
 012F0203 007C0003 5D000203 00000005 63F20002 4AF30001 62980005 0FF20001 ........b..µJ...c.......}..|.../. 000020
 60D20005 47F70001 62780005 4BF60001 62D20005 1D750001 5F580005 00FD0003 ..»...X_..u...@b..-K..xb..%G..@' 000040
 5D0E0005 3CFC0001 61B20005 507B0001 63180005 00130001 008A0103 32770001 ..w2..¤........c..(P..ÿa..•<...] 000060
 63920005 008A0003 5D220203 22810001 5F980005 09000001 50F20005 00000001 .......]......._..."..."]......c 000080
 58B00103 55840001 63780005 41030001 61F80005 28830001 60180005 56820001 ...V...'...(..%a...A..xc...U..§[ 0000A0
 62380005 2A890001 60520005 00070001 5E380005 29860001 60380005 00900001 ......8'...)..8^.......R'...*..8b 0000C0
 50920005 00140003 50480203 180B0001 5F180005 01830005 58EA0203 450A0001 ...E..ð[..............H].......] 0000E0
 5D110203 308F0001 60F20005 490E0001 62820005 110E0001 5E580005 03800001 ......X^......ýb...I...'...0...] 000100
 58CA0203 01910005 58100203 15150001 5E080005 4E930001 62F80005 009A0003 ......%b...N..Â^.......[......b[ 000120
 62120005 581E0001 63B20005 00230003 5B8B0203 01A20006 5CFA0202 01190004 ......'\..Å....[..#...ýc...X...b 000140
 5E520005 00AA0003 5CC30203 57200001 63980005 26200001 5FF80005 421F0001 ...B..%_.. &...c.. W..ú\.....R^ 000160
 60820005 46260001 62580005 36240001 61920005 06230001 5DB80005 0E230001 ..#...¡]..#....a..$6..Xb..&F..ÿ' 000180
 5E980005 1EAA0001 5F790005 00320003 5AB10203 39A80001 61780005 2EA70001 ..I...xa...9..Ý2..2...x ........^ 0001A0
 60080005 4CAB0001 62D80005 02AB0001 5D780005 00280001 5D1F0005 122A0001 ..*....]..+...x]........AБ...L..A' 0001C0
 5EB80005 35300001 61180005 01300004 5C170203 51AE0001 63320005 332C0001 ..,3..2c..ÛQ...\..0....a..05..¡^ 0001E0

Dump of file SATURN:[PCCOMMON.DUMP.DLL]DAPROFDF.TMP;1 on 18-APR-1990 10:42:42.58
File ID (604,30,0)   End of file block 88 / Allocated 88

Virtual block number 54 (00000036), 512 (0200) bytes

 60580005 23860001 5FB80005 07320001 50D20005 008A0003 50310203 16310001 ..1...1]..¤...@]..2...|_..Ä#..X' 000000
 63880005 01380004 5C6B0203 59BA0001 63D20005 00420003 589C0203 28390001 ..9+...[..B...@c..¤Y..k\..;...|c 000020
 5CEF0203 47420001 62720005 01A20006 5CFD0205 1C400001 5F380005 588C0001 ..YX..B_..a...»\..Å...rb..BG..ý\ 000040
 5EB20005 004E0003 5B7A0203 31440001 60F80005 3AC40001 61580005 00CB0003 ..ü...Xa..6:..%'..D1..z[..N...ÿ^ 000060
 63380005 3ECB0001 61880005 534A0001 63520005 4FC60001 63120005 13460001 ..F....c..6O..Rc..JS..|a. ù>..8c 000080
 5CE00203 0ACF0001 50F80005 014F0004 5C9A0203 17400001 5EF80005 524C0001 ..LR..%^..M....\..O...%]..ü...Å\ 0000A0
 01D00203 27550001 60320005 36D40001 61980005 05520001 50B20005 000A0003 ..Ô...ý]..R....a..Â6..2'..U'..\. 0000C0
 60B80005 37D90001 61320005 5A580001 63080005 2C570001 60720005 005E0003 ..^...r'..W,..Äc..XZ..2a..17..|' 0000E0
 5F920005 4DDE0001 62F20005 045E0001 50980005 01500004 5AE90203 2F5C0001 ..\/..ÔZ..}....}..^....b..8M..._ 000100
 01CB0001 8B1F0200 3E89088E FFFFB81E 00000000 345F0001 61120005 1FDF00 1 ..Ô....a.._4.....|...Å.>....|..ù. 000120
 00000000 00000000 00000000 00000000 00000000 00000000 00000400 0200026  ................................ 000140
 A8C78806 7EC4D1F7 AEF2FFFF B9C033C0 8ED08CFE 880A76C5 1EDE8807 8BEC8855 U.$.a.B.év..z.Ä.à3á¿...Û%ía-..ú' 000160
 C033067E C4D788EC 8855CB5D C28C1FFA 8BF38BA4 F3C913A5 F3E9D149 A4027401 .t.Ê|lÕµE.èµÉ.µ.*..ò]ùU.$.aá~.3à 000180
 B9EC4680 56570000 16C8000C 7BE9000C 7FE900CB 5DFA8B91 49D1F7AE F2FFFFB9 ¿...Û%I]..*]ù.Õ...Õ(..à...WV.F$. 0001A0
 06478926 08568806 4688420A 47C626F8 5EC4FE56 8CFC4689 0E4680FA 568CF846 F%.V*.F..F•.Vtá^Ý&6G.B.F..V.&.G. 0001C0
 025C9A53 060A76FF 0C76FFFC 76FF167F FF0447C7 26025789 26078926 08578926 &.W.&..&.W.&üG.....v•.v..v..S.\. 0001E0

Dump of file SATURN:[PCCOMMON.DUMP.DLL]DAPROFDF.TMP;1 on 18-APR-1990 10:42:42.58
File ID (604,30,0)   End of file block 88 / Allocated 88

Virtual block number 55 (00000037), 512 (0200) bytes

 E8058826 02478E26 07FF263F 8826C02A 1278044F FF26F85E C4F0880C C483000B Û..á..Þá^%&.O.x.*á&.7&..&.G.&..$ 000000
 26085EC4 56570000 08C8CBC9 5F5EC688 06C483FF FF00E69A 006A53FA 76FF900F ...v*Sj..Ì....á..6^_èùà...WVá^.& 000020
 46891186 05E001C1 03E001C8 8BF9F700 0CB99905 C220C388 FA4689E4 2AD8478A .G.*ð.F*.ú-ð..¿..%*.àÍÅ.èÍÅ.Ñ..F 000040
 5EC49001 28E9FFFF 88200A4F 8026085E C40F7440 0A47F626 0774830A 47F626F8 Ý&-G..t.&-G.@t.á^.&.O. |..Ô+..á^ 000060
 EF0A6780 26020A4F 802690E2 E8000004 47C72620 0A4F8026 0E74010A 47F62608 .&-G..t.&.O. &üG...$ã.&.O..&.g.ÿ 000080
 060868F9 F7000CB9 9905C22D C3884C75 0C0A47F6 26FC7689 F0880447 8926C02B +à&.G..Þ.v•&-G..uL.ù-ô..¿..%*kÄ. 0000A0
 FF0A7E81 1675050A 087E810E 74018F0A 7E810775 05CE087E 81377501 11B687F6 -.Ñ..u7.-.ö.u..-...t..-.Ô.u..-.. 0000C0
 5EC404C4 830CA7E8 0876FF0A 76FF0C75 C00802C4 83020210 829AFA76 FF0F75FF .u..v*.ý....á..àu..v...v.Ôl..á.á^ 0000E0
 085E8867 740111B6 87F606D8 68F9F700 0CB99905 C220C388 1575080A 47F62608 .&-G..u..ü-ô..¿..%*kÄ.-.Ñ..tg.^. 000100
 89264802 4588F87E 88025789 26078926 40085788 26064788 2606772B 26378826 &.7&+w.&.G.&.W.@&..&.W..-%.E.H&. 000120
 F6FA5E88 19E8FC46 8908C483 02200F1A 9AFA76FF 0677FF26 5256167E F60B0447 G..--.VR&.W..v*... ..á..F•$..^*- 000140
 2606468A 065FC426 085EC408 C4830243 0EDC9A53 006A006A 026A0F74 2017C787 .ú. t.j.j.j.S.É.C..á.á^.&á_..F.& 000160
 0374FC76 39FC4689 08C48300 B00F1A9A FA76FF50 16064680 560001BE 17E80788 ..Š./..V.F..P.v*...-..á..F=9v•t. 000180
 121E8C18 10A31B16 88019910 D69A000A 88EC8855 C8C95F5E E42A0646 8AFECCE9 Õàz.F.*ð^_èùU.$|...•...|..Ê..... 0001A0
 001B0C06 C71AE816 891AE6A3 08568806 46881802 16891800 A3105688 0E4688 18 ..F..V.Ê.......F..V.Êl...Ô.ú.... 0001C0
 ECA31AF0 A3C02800 011B0E06 C7030BE9 037425F6 7E80038D E900001B 0A06C700 .ú.....Ô...--Xt.Ô..ú.....+àÊÞ.Ê$ 0001E0
```

```
Dump of file SATURN:[PCCOMMON.DUMP.DLL]DAPROFDF.TMP;1 on 18-APR-1990 10:42:42.58
File ID (604,30,0)   End of file block 88 / Allocated 88

Virtual block numbe  56 (00000038), 512 (0200) bytes

 260A5EC4 00201C76 06C71AFE A31AE4A3 1AEAA31B 04A31B06 A31AEEA3 1B08A31A .Ê..ÊŸ.Ê..Ê..Êõ.Êð.Ê±.ú.v. .á^.& 000000
 C71AF006 FF00752B 3F80260A 5E88903E EB00301C 7606C70A 46FF4975 30017F80 ...0uI.F.ú.v.0.$>..^.&.?+u...Þ.ú 000020
 1AE406FF 9014EB1P 0406FF1A 75001AF0 3E830E75 203F8026 9028E800 001B0406 .....$(.&.? u..>Þ..u.....$....ð. 000040
 C483097B E80E5098 078A260A 5E880A46 FF1AFE06 FFC7752D 3F80260A 5EC400EB $.á^.&.?-uú..±..F..^.&...P.Ðx..á 000060
 1B143E83 0C56890A 468908C4 8308C7E8 0E1B1468 1E0A76FF 0C76FFDD 75C00B02 ..áuI.v..v..h...Ðú..á..F..V..>.. 000080
 7606C706 75301C76 3E830074 001AFE3E 831B14A3 D8F71B14 A11AFE06 FF0C7D00 .)...±.À..¥ÀÊ...>±..t..>v.0u.ú.v 0000A0
 83087BE8 0E1B0E68 1E0A76FF 060A46FF 1B0606FF 20752E3F 80260A5E C400201C . .á^.&.?.u-.....F...v..h...Ò(.. 0000C0
 98078A26 0A5EC41B 060EFF00 011B0E06 C70A7D00 1B0E3E83 0C56890A 468908C4 á..F..V..>...).ú........á^.&... 0000E0
 75001AEE 3E830002 1AEE06C7 0675006C 3D287400 68304074 004E303D 7400463D =F.t==N.t@=h.t+=I.u.ú.Ÿ....>Ÿ..u 000100
 00011AEE 06C79002 4EE91C75 003F8026 0A5EC40A 46FF0375 4C3F8026 0A5EC409 .á^.&.?Lu..F.á^.&.?.u.ÒN..ú.Ÿ... 000120
 47300A74 00453DF8 46899807 8A26C8EB 00081AEE 06C7D0EB 00101AEE 06C7D8EB $Àú.Ÿ...$Àú.Ÿ...$à&....F½=E.t.=G 000140
 00633D01 91E9037E 78740069 3DF8468B 20F84683 1AEC06FF 08750058 3D057400 .t.=X.u...š..F½ .F½=i.t×-.Õ..=c. 000160
 001EC415 75021AEE 3E839001 59E90140 E9037500 25300152 E9037E01 3FE90375 u.Õ?.-.ÒR.=X.u.Õa.ÒŸ...>Ÿ..u.á.. 000180
 83078926 1B0AA11F C4261B00 1EC400EB 00000247 C7260789 261B0AA1 1FC4261B .&á.À..&..&úG...$.á...&á.À..&... 0001A0
 0A47F626 1AE61EC4 0*BDE903 74001B0A 3E830170 E9037500 1B0C3E83 041B0006 .....>...u.Òp..>...t.Ò§.4.Ì.&-G. 0001C0
 EB02C483 019EE80E 0A6A0000 1AE406C7 1B0806FF 01ACE9FF FFB801AF E9037520  u.Ò€.j..Ò¯.....ú.Ò...j..^...á.$ 0001E0

Dump of file SATURN:[PCCOMMON.DUMP.DLL]DAPROFDF.TMP;1 on 18-APR-1990 10:42:42.58
File ID (604,30,0)   End of file block 88 / Allocated 88

Virtual block number 57 (00000039), 512 (0200) bytes

 E9037508 1AEE3E83 0004180E 06C71B06 06FF1AEC 06FF1AEA 06FFF2EB 086A90C3 ú.j.$·..õ...š.....ú......>Ÿ..u.Ò 000000
 FE3E83FA 46891B14 A128741B 140639FA 46891AEE A3C02B7A 74011AEE 3E830081 ...>Ÿ..t±+àÊŸ..F*9...t(À...F*.>± 000020
 831B14A3 C02B027D C00B1B14 A1051B14 2E839090 13EB0000 1B1406C7 0A74001A ..t.ú.....$........À...à).+àÊ... 000040
 1AFE3E83 227400FA 7E8302C4 83048DE8 0E3A6A02 C4830130 E80E106A 02180006 ....j..ÒO..á.j:.Ò...á..-*.t".>±. 000060
 2E830000 1B1406C7 9007EB18 14A3C02B 0270C00B 1B14A300 052DFA46 8B157400 .t..F*-..Ê...á).+àÊ..$..ú....... 000080
 026EE80E 006A90FF 3FE9106A FF10E902 1B000683 02C48300 F1E80E10 6A041B00 ...j..Òþ..á......Ò..j.Ò?..j..Òn. 0000A0
 75006430 90FF21E9 0428E80E 256AFF2A E90349E8 0EF876FF F4E8016A 90FF39E9 Ò9..j.$¶.v½.ÒI.Ò*.jX.Ò(.ÒI..=d.u 0000C0
 46880A4E FF0C568B 0A468809 74001AEE 3E830A7E 00673005 7C006530 FF0CE903 .Ò..=e.|.=g.-Ò.>Ÿ..t..F..V..N..F 0000E0
 7030FEE4 E9037500 6F30FE80 E9037500 6E30903A EBFE5689 FC468940 0C56880A ..V.a.F•.V±$:.=n.u.Ò.±=o.u.ÒÒ±=p 000100
 46FF90B1 E8FF79E9 03750078 30FEB9E9 03750075 308F7400 7330FEE0 E9037500 .u.ÒÀ±=s.t.=u.u.Ò¿±=x.u.Òy.$Ÿ..F 000120
 76FF500A 4628C388 EC75253C 0474C00A F6468807 8A26FC5E C4FC46FF 9034EB0A .$4..F•á^=&...F-.àt.<%u$.ú+F.P.v 000140
 F6468807 8A260A5E C40C5689 0A4689FE 5688FC46 8B06C483 044CE80E 0A76FF0C ..v..ÒL..á..F•.V±.F..V.á^.&...F- 000160
 56570000 12C8CBC9 1B0AA1FE 51E90374 200A47F6 261AE61E C4FC63E9 0374C00A .àt.Òc•á.Ì.&-G. t.ÒO±À..èúà...WV 000180
 3E830774 021AEE3E 831B0806 FF04740A 067E8300 201C7606 C7067400 1B063E83 ,>...t.ú.v. ..~..t......>Ÿ..t..> 0001A0
 3E83902C EB041B00 0683FE56 89FC4689 02578826 07882618 001EC419 75101AEE Ÿ..u.á...&..&.W..F•.V±.....$,..> 0001C0
 46899907 88261B00 1EC40EEB 0000FE46 C7FC4689 0788261B 001EC411 74001B08 ...t.á...&...F•uF±..$.á...&....F 0001E0

Dump of file SATURN:[PCCOMMON.DUMP.DLL]DAPROFDF.TMP;1 on 18-APR-1990 10:42:42.58
File ID (604,30,0)   End of file block 88 / Allocated 88

Virtual block number 58 (0000003A), 512 (0200) bytes

 C0289003 EB06468B 0674,E46 08FC468B 0E74001A E43E8302 18000683 FE5689FC •.V±......>Ò..t..F•.F±t..F.$..+â 000000
 067E832B 7D00FE7E 83317500 18083E83 F45689F2 46891812 168B1810 A11C  A3 Êt.À.......F·.V¶.>...uI.-±.)+.-. 000020
 FE5689FC 46890AF7 00028308 F7FE568B FC46882D 07C626F2 46FFF25E C41D7. 4 .u.á^·.F·&ó.-.F•.V±¥À.Ò.¥Ò.F•.V± 000040
 76FFFE76 FF501E06 76FFFA5E 8CF84689 1AF28800 00F646C7 9006E800 01F646C' úF-..$..úF-..|·..F½.^*.v..P.v±.v 000060
 0E8804C4 83026500 469AF876 FFFA76FF 4574001B 063E830A C4830749 10A89AFC •.·.I..á..>...tE.v*.v½.F..e..á... 000080
 05E8F27E C4F04E88 00001C74 06C70675 081C743E 83007EC9 08F04E89 C8281B0E ..+à.NÞ.è-..>t..u.ú.t....NÞá-·$. 0000A0
 C4F276C5 EE5E8C1A EC0E88F0 4E89F446 8CF27E89 F47FC008 49C18B47 3005C626 &ó.0G.êI.à.¶.-·.F¶.NÞ..š..^Ÿèv·á 0000C0
 8CF27689 E375003F 8026F846 FF46202C 80037C61 3C0774C9 08048807 8A26FB5E ^½&.....èt.<a|.., F.F½&.?.uÒ.v·. 0000E0
 02EB0001 88057500 F67E8308 741B0406 081AF0A1 1475001B 083E83EE 5E8EF45E ^¶.^Ÿ.>...u.ÀÞ.....t..--.u.|..$. 000100
 1800A100 01BE1874 00067E83 56570000 10C8CBC9 5F5E02C4 8302FFE8 0E50C02B +àP.Ò...á.^_èúà...WV.-..t./..À.. 000120
 0788261B 001EC413 74081AEE 3E83008F E9021B00 0683FA56 89F84689 1B02168B .....F½.V*.....Ò...>Ÿ..t.á...&.. 000140
 18000683 FA5E8CF8 4689FC46 89078826 18001EC4 10EBFA56 89F84689 02578826 &.W..F½.V*$.á...&...F•.F½.^*.... 000160
 890177B8 097500FC 7E83900A EB0170B8 1575FA46 08F8468B 0E74081A EE3E8304 ..>Ÿ..t..F½.F*u.|Þ.$...-•.u.|W.. 000180
 900EEB1B 0E0E8B1C 741B0636 39F62BF4 5689F246 89FA568B F8468BFA 5E8CF846 F½.^*.F½.V*.F·.V¶+-96..t.....$.. 0001A0
 75003F80 26F246FF F25EC446 90EDEB10 7ECE3B46 1574003F 8026F246 FFF25EC4 á^·.F·&.?.t.F;ó-.$U.Fá^·.F·&.7.u 0001C0
 B3E80EF8 76FFFA76 FF5602C4 830159E8 0E570875 001AFE3E 83FE2B1B 143E8BF3 ¤.>..+±.>±..u.W.ÒŸ..á.V.v*.v½.Ò* 0001E0
```

```
Dump of file SATURN:[PCCOMMON.DUMP.DLL]DAPROFDF.TMP;1 on 18-APR-1990 10:42:42.58
File ID (604,30,0)   End of file block 88 / Allocated 88

Virtual block number 59 (0000003B), 512 (0200) bytes

881800A1 000006C8 90C8C95F 5E02C483 013CE80E 57087400 1AFE3E83 06C48301 ..á..>±..t.W.Ò<..á.^_èù.à...À... 000000
83FA4688 C02A9003 C8018005 7547067E 83067467 067E83FE 5689FC46 89180216 ....F=.V±.~.gt..~.Gu. .S..*á.F*. 000020
FF00011B 0E06C706 75001B0E 3E830D74 00FA7E80 00061B0E 06C70675 0018063E >...u.ù......~*.t..>...u.ù...... 000040
A21EFF26 1A02068E FC76FFFE 76FF1B10 36FF1B12 36FF0676 FF1B0E36 FF1AEC36 6$..6...v..6...6...v±.v=....&..À 000060
1EFF261A 02068E1B 1036FF1B 1236FF14 75001AE4 3E831B74 00FA7E80 0EC48305 ..á..~*.t..>ò..u..6...6......&.. 000080
261A0206 8E1B1036 FF1B1236 FF147500 1B0E3E83 1B74001A E43E8304 C48305A6 |..á..>ò..t..>...u..6...6......& 0000A0
76FFFE76 FF1B741B 0406081A F0A10000 1C7406C7 081B0006 8304C483 05AE1EFF ..Û..á......ú.t...Àþ......t..v±.v 0000C0
90C8C901 29E80E50 C02B02E8 00018805 74C00804 C48305B2 1EFF261A 02068EFC •....&..ÿ..á..át.|..$.+áP.Ò).èù. 0000E0
2607FF26 37882606 468A1478 044FFF26 1AE61EC4 3C75001B 0C3E8356 000000C8 à...V.>...u<á.|.&.O.x..F.&.7&..& 000100
0C06FF07 754006C4 830A2100 E69A0676 FF531AE8 36FF10EB E42A0488 2602478E .G.&..*ôS..6Ò.S.v..|.|..á.ǝu.... 000120
507EF60B 06768857 7500180C 3E835657 000002C8 90C8C95E 180A06FF 9005E818 .S......^èù.à...WV.>...uW.v..~-P 000140
4EC6881B 0C06FF04 754006C4 830A8900 E69A1C76 36FF1AE6 36FF1AEB 36FF18EB $..6Ò..6|..6v..|....á.ǝu......6N 000160
E42A0588 2602478E ? 37FF26 3F88261C 76A00478 044FFF26 1AE61EC4 1E7EC008 .á-.á.|.&.O.xá.v.&.?&..&.G.&..*ô 000180
0C3E830A 76885657 0UJ002C8 CBC95F5E 180A0601 06468807 7500180C 3E8304EB $á.>....u..F.....^_èùà...WV.v..>. 0001A0
754006C4 830AF800 E69A5098 078A2606 5EC41AE6 36FF1AE8 36FF22EB 5E75001B ..u^$".6Ò..6|.á^.Ï...P.|.«..á.ǝu 0001C0
C4078A26 065EC4CD 78044FFF 261AE61E C42574C0 084EC688 0646FF1B 0C06FF04 ......F..6N.át%á.|.&.O.xeá^.&..á 0001E0

Dump of file SATURN:[PCCOMMON.DUMP.DLL]DAPROFDF.TMP;1 on 18-APR-1990 10:42:42.58
File ID (604,30,0)   End of file block 88 / Allocated 88

Virtual block number 60 (0000003C), 512 (0200) bytes

06010A46 88077500 180C3E83 CAEBE42A 05882602 478E2607 FF263F88 261AE61E .|.&.?&..&.G.&..*ô$ò.>...u..F... 000000
FA4689FC 4689C02B F65689F4 46891812 16881810 A1560000 0CC8C8C9 5F5E180A ..^_èùà...VÀ.......F¶.V-+á.F=.F* 000020
83057510 1C743E83 06762BF0 28F84689 04C48307 3400469A F476FF52 1B14368B .6..R.v¶.F.4..á..F½+þ+v..>t..u.. 000040
1C763E83 1975203F 8026F45E C4227500 1AFE3E83 4E017508 1C743E83 08EB02EE Ÿ.$..>t..u.N.>±..u"á^¶&.?-u..>v. 000060
077EF60B 0874301C 763E83F8 4EFF02C4 83FE71E8 0E509807 8A26F446 FF127530 0u..F¶&...P.Òq±.á..N%.>v.0t..--. 000080
E80EFC46 FF077400 1C743E83 0066E80E FA46FF07 7400067E 83187400 1AFE3E83 .>±..t..~..t..F*.Òf..>t..t..F=.Ò 0000A0
39E80E04 7500FA7E 83CA7400 067E8302 C483FE7E E80E5629 75001AFE 3E830070 p..>±..u)V.Ò~±.á..~..t..~*.u..09 0000C0
83FEB5E8 0EF476FF F676FFF8 76FF0040 E80E0475 00FC7E83 0A74001C 743E8300 ..>t..t..~=.u..Òǝ..v½.v~.v¶.Òç±. 0000E0
74001AF0 3E83C8C9 5E02C483 FE38E80E 5600201C 7606C70E 74001AFE 3E8306C4 á..>±..t.ú.v. .V.Ò8±.á.^èù.>þ..t 000100
101C743E 8302C483 FDC8E80E 306AC802 C483F002 E80E5000 208803E8 00288805 .|+.$.| .P.Ò0».á.ùj0.Òá».á..>t.. 000120
56570000 06C8C802 C483FDAA E80E5000 788803E8 00588805 74001AEC 3E831775 u..>$..t.|X.$.|x.P.Ò`».á.ùá...WV 000140
9060E80A 46FF021B 00068337 88261800 1EC41275 2A3F8026 0A5EC400 01FE46C7 úF±..á^.&.?*u.á...&.7......F.$'. 000160
3F7C303C FA468807 BA260A5E 88F6280A 46FFFFFF FE46C708 75203F80 260A5EC4 á^.&.?-u.úF±...F.+-.^.&...F*<0|? 000180
8A2618 7F 39308026 06EBFB8B 00301C76 06C70675 303C0A75 18063639 3B7F393C <9.;96..u.<0u.ù.v.0..«$.&.=9..&. 0001A0
880C468C 0A7E890F 7D303080 2647F188 30E983C8 03E1D1CE 0302E1C1 CE889805 ...öeÀ..ölÀ.à.Ò0.þG&.=0)Ò.~..F.. 0001C0
4689017E 88570000 04C8C8C9 5F5E0C56 880A4688 37892606 5EC4F088 EEF7FE46 F±%Ÿ.Þá^.&.7.F..V.^_èùà...W¡~..F 0001E0

Dump of file SATURN:[PCCOMMON.DUMP.DLL]DAPROFDF.TMP;1 on 18-APR-1990 10:42:42.58
File ID (604,30,0)   End of file block 88 / Allocated 88

Virtual block number 61 (0000003D), 512 (0200) bytes

468CFC7E 890001B8 F4750038 26117400 30802647 01E8FC7E C4064E8A FE5E8CFC •.^±.N.á~•$.G&.=.t.&8.u¶|...~=.F 000000
3CACD833 99C03306 76C51E56 57EC8855 90C8C95F C02BFE46 8CFC7E89 9009E8FE ±$...~=.F±+à_èù.U.$WV.év.3á.3Ù¯< 000020
88C888D2 D1E3D11B 72302C1F 77393CAC 0175283C 04742D3C 50F77409 3CFB7420  t«<.t%P<-t.<+u.¯<9w.,0r.1D1•.ù. 000040
F7000283 08F70775 932D3C58 0CE80002 83D803D7 13090302 D1E3D102 D1E3D1FA *1D1•1D1•.\.=.X.•.$EX<-.u.%À.•.% 000060
84681E01 86681E17 C0A3E086 580000FF FF9A5016 C48850EC 8855C85D 5F5E1F0A Ò.^_]ùW.$P.á.P.....X.ÀEá..h...h. 000080
1C9A005F 00C89A50 C850E588 00018809 E511EA9A 039EE800 21E80000 FFFF9A01 ......Ò|.Ò...ò.|.|...|]ùP.à._... 0000A0
80264701 75003D80 267FFFB9 0186068E FF330000 8B1E018C 16FF00FF 68006C0E .l.h.......E..3.....¿..&.=.u.G&. 0000C0
8F1FF78B 071E061C E8E774AE F2C03308 74CA88A6 F3C88801 8805908E 31740030 =.t1ƒ...1.ùµ|.òt.3á ÙtÒ$.....%.¢ 0000E0
9A5000FC 88EC8855 00C31FED E8AAC20A 0572412C AC9204E0 C00E7241 2CAC17C7 ú.¯,Ar.áÀ..¯,Ar..ò¯$U.ù.U.&|=.P. 000100
96EC8855 C85DE588 00D20E1C 9A5000FF 88059E1E FF047400 05A03E83 0D710E1C ..q..>...t.....|..P...•..|]ùW.$V 000120
88AEF2FF FF89C033 970C7496 401074C2 38AD1A0C 8E06568B C08ED88E 01818857 W|...À.á.V.ƒ..Ù;òt.ǝ.t..3á¿..·Ò. 000140
33FA8892 1F74C008 00E600EC 9A0676FF 57EC8855 0002CA5D E5885E5F 96EBEBF7 %$$._^.|]ò..U.$W.v..$.|..át...*3 000160
CA5DE588 5F580000 FFFF9A50 1651521E 530002B8 C4885049 D1F7AEF2 FFFF89C0 à¿..¯Ù%11P.áE..S.RQ.P.....[_.|]ò 000180
8605E0D1 C103E0D1 C888F9F7 000C8999 05C22004 46881908 06FF0000 04C80002 ..à.....À..F.-ò..¿..%*.àìÀ.ĒìÀ.Ñ 0001A0
74000808 57892606 47892604 5EC402C4 830E2613 A59A0200 68FE5E8C FC468911 ..F=.^±h...E.&..á.á^.&.G.&.W..Àt 0001C0
FE5688FC 4688040A 4F802604 5EC49021 E8020002 47C726FC 5EC4080A 4F802u 1 .&.O..á^•&ùG...$|.á^.&.O...F=.V± 0001E0
```

Dump of file SATURN:[PCCOMMON.DUMP.DLL]DAPROFDF.TMP;1 on 18-APR-1990 10:42:42.58
File ID (604,30,0)   End of file block 88 / Allocated 88

Virtual block number 62 (0000003E), 512 (0200) bytes

```
07892608 57882606 47882604 5EC40001 0247C726 FC5EC408 57892606 47892640 a&.G.&.W.á^=&úG...á^.&.G.&.W.&.. 000000
0454E9C0 3300098A 087217C5 1E38065E 88EC8855 C3C90000 0447C726 02578926 &.W.&úG...èúJ.&.^.;.é.r.¤..3áÔI. 000020
91E175C0 855A5900 00FFFF9A 51160C76 FF0876FF 0A76FF53 CC8804EC 830460E9 Ô'..&..àS.v..v..v..Q.....YZ.âuÅ. 000040
13E9C033 00098A0E 7217C51E 38065E88 0CEC83EC 885500CB 5DE588FD 17C7A780 .Iú.».[]ù.U.&.&..^.;.é.r.¤..3àÔ. 000060
748017C7 87F60000 0F059A50 16F4468D 51414151 51C93353 12742017 C787F604 .-.ú. t.S3èQQAAQ.F¶.P.....-.ú..t 000080
E30C4E88 F86689F2 88FA8856 57FCFC46 89FE4689 C0330856 C50A468E FA5E8C66 f.^*.F.éV.3à.F±.F==WV.*.·.f%.N.D 0000A0
3800740A 3CAC0C4E 880716FA 88D488E2 2800808A DC8802EC 833875AE F20A8049 I¯.·Ôu;.&..Éo..+ã.å.*..N.¯<.t.; 0000C0
0014E8E2 E8FC46FF 0A80AA00 1FE80375 F8380080 009AE900 28E8F4E2 AA1A74F8 «t.¨ä¶Ô+.Ô..¯.;«u.Ô..¯¯..F=Šäô.. 0000E0
1FE3CA28 CF881F06 1E515350 0E7D1006 9AFFFC88 7AE80093 E9FA5E8E 5F5EE1EB ŠÅ^_.^*Ô..Šz¡=..ø.).PSQ....ü+ðÔ. 000100
1F0774D8 08FE5E01 F45E8811 75C00800 000E469A 5016F446 8D51521E 53065E88 .^.Š.RQ.F¶.P.F....ôu..^¶.^±.Ut.. 000120
03E8001C 8A087500 098A0001 30007400 60301874 C00808C4 831FC3FA 88585859 Y[X.*ù..á..át.=m.t.=..¤..u.¤..$. 000140
1C8A0EE8 F803751A 3F80085E 880A5E8E 0E744017 C787F6FE 5E8E26E8 F900208A ¤ .*$&.^±-.ú.ât..^..^..?.u.½$.¤. 000160
0C4E8802 F7E9C85D E5880472 FA5E8E5F 5EF8668B FC462BFE 468806E8 F9C03300 .3à*$..F±+F=.f%^_.^*r..[]ùÔ%..N. 000180
74C0081F 071E0000 0FD09A50 16F4468D 51521E53 0856C51E EEE8C188 0475C908 .èu..èŠY.éV.S.RQ¯F¶.P.¦.......át 0001A0
F68775C0 08F44688 C2E80020 BAC7E800 1C8ACC75 00098A00 01300074 00603017 .=m.t.=..¤..uà¤..Šú¤ .Šô.F¶.âuñ- 0001C0
E9008357 56EC8855 00A3E8C0 33001C8A A6E80275 1A3F8026 DA880A74 4017C787 .ú.ât..Ô&.?.u.Š!¤..3àŠÉ.U.ŠVW°.Ô 0001E0
```

Dump of file SATURN:[PCCOMMON.DUMP.DLL]DAPROFDF.TMP;1 on 18-APR-1990 10:42:42.58
File ID (604,30,0)   End of file block 88 / Allocated 88

Virtual block number 63 (0000003F), 512 (0200) bytes

```
3302E800 01880574 4017C787 F60C7C00 F883117D 17C51E38 065E88EC 88550442 8.U.&.^.;.é.)..«.|.-.ú.ât.¡..$.3 000000
33057540 058CA1C8 5152E388 057205C0 1E380872 08280C88 5A5900C8 5DE588C0 å.[]ù.YZ.É+År.;.å.r..DRQùÅ¥.âu.3 000020
FFFF9A52 16501653 C4885087 17C7A780 D4885200 028805BC 2EFF5152 FC74E9C0 äÔt=RQ..¥.£..R.å.Iú.ñP.éS.P.R... 000040
F20E885A D4794817 C78F0808 81067500 02300774 00013040 81127558 C0080000 ...áXu.Ýa=..t.=..u.Ý...ú.KyÅZ..· 000060
F01EFF00 0388C28C 19F806C4 01AEE903 7319F01E FFD833C2 8C19F406 C41EE319 .D.á.¶..ó3Û..Þ.s.ÔÛ.á.%..óÉ....Þ 000080
77680E01 6A08741A ¯03019FC 880073E8 19FC8F19 FC8E007C E819FC8F 19FC8E19 ./=.¢=.Ô|./=.¢=.Ôs.¡=.=..t.j..hw 0000A0
00001172 9A006A00 ·036A00 51E81A00 8F19FC8E D88E00F2 88C30000 FFFF9A11 ......ú¡`..Á/=.¢..ÔQ.j.j.j..r... 0000C0
1A008F1A 008EEC88 5503E800 31E81A00 8F19FC8E 003AE81C 788F1C78 8EEC8855 U.&/x.¢x.Ô:./=.¢..Ô1.Š.U.&/..¢.. 0000E0
02880FE3 19F20E88 0000FFFF 9A500646 8A50C033 001AE81A 008F1A00 8E0023E8 Ô#./..¢..Ô..3àP.F.P........·.D.É. 000100
56570000 14C800C3 EEE810FF F2740245 08058804 EF830E73 F738C319 F01EFF00 ...Þ.ú;%s..y....E.t·..ŠYû.à...WV 000120
6AF85689 F64689F2 5689F046 89C02801 86168800 F0E90375 01863639 FF28F628 +-+.96..u.ÔÞ.....+à.FÞ.V·.F-.V%j 000140
8CE90376 7FFFFE81 461974C0 080AC483 125E1488 9A059068 1EF676FF F876FF0C ..v%.v-.h...¡.^..á..ât.F.±..v.Ô¥ 000160
26F65E88 F475003F 8026F646 FFF65EC4 0CE847EA 75003F80 26F646FF F65EC400 .á^-.F-&.?.uÔGŠ.á^-.F-&.?.u¶.^-& 000180
8312A313 A59A56EE 5689EC46 8904C483 12601460 9A046A50 0145808A 75003F80 .?.uø.E.Pj..'.m..á..F&.VÝV.É.É.. 0001A0
19CDA3EE 5688EC46 886674C2 08FC4688 6074EE46 08EC4688 FE5689FC 468902C4 á..F=.V±.F&.FÝtm.F=.ôtf.F&.VÝÉe. 0001C0
88EC5EC4 2C74C008 0AC4830F C214889A 0590681E F076FFF2 76FF0C6A 19CF1689 ..ü.j..v·.vÞ.h...¡.ô..á..ât,á^&. 0001E0
```

Dump of file SATURN:[PCCOMMON.DUMP.DLL]DAPROFDF.TMP;1 on 18-APR-1990 10:42:42.58
File ID (604,30,0)   End of file block 88 / Allocated 88

Virtual block number 64 (00000040), 512 (0200) bytes

```
26FC46FF FC5EC407 8A26F046 FFF05EC4 04EC4683 02578926 078926FE 5688FC46 F=.V±&..&.W..F&.á^Þ.FÞ&..á^=.F=& 000000
C95F5EA7 75003F80 26F05EC4 F475003F 8026F046 FFF05EC4 E8E80E74 C00A0788 ...át.ŠÔá^Þ.FÞ&.?.u¶á^Þ&.?.ul^_è 000020
160C0808 070A0C09 0C080C07 09060005 18040203 02021601 FA70E900 028890C8 ù.¡..Ôp*......................... 000040
09721C70 2060006C 08590057 00530052 02430041 02350212 12110010 120F1600 ..........5.A.C.R.S.W.Y.l.m p.r. 000060
8899FFFF 88178C16 8917C3A3 16080000 080702CE 08A40084 09820A81 0A801606 ..........É.ö.m.....Èú...¥.¡.... 000080
1674073A 2E1875E4 0A0024B9 12F88817 C3A3C850 E58899FF FF880008 E8C85DE5 []úÔ..¡....[]úÈú.É%.¿$..ôu..:.t. 0000A0
00C317BC A3980147 8A2E4301 76CA3C04 728C3C43 0A76243C 0472133C F7E24343 CCàK<.r.<$v.C<¥r.<ôv.C..G..É¥.ù. 0000C0
06468857 5602EC83 EC8855C8 5DE58801 FE4F8026 0574C308 C08C065E C4EC8855 U.$á^..å.ût.&.O±..[]úW.&.&.VW.F. 0000E0
78E80574 0018E815 750082E8 19E4A312 740025E8 08750019 E43E831E 73FFF130 =Þ.s..>ô..u.ÔX.t.Èô.Ô..u.Ô..t.Ôx 000100
43065E88 0776065E 3900F088 C85DE588 5E5F02C4 83121E15 AA9A0676 FF087500 .u..v..¯....á._^.[]úÈÞ.9^.v..^.C 000120
883874FF FA8308C4 83130917 569A5002 80510E4F 8050501E C033FE5E 89FEE383 .D±.^±3à.PP.O.Ô¯.P.V.}..á..*.tÔ. 000140
0C47894B 480008A3 C033088E FE5E8800 08A30A8E 05740208 19E8A319 E61687C2 ô..|.ÈÔ..Ôt..ÔÉ...^±.Ä3àÉ..HH.G. 000160
064E88C0 8ED88CC3 1FD88C00 06A30000 05000AA3 01478000 02A30000 A3000A88 |..È..È...G.È.....È...Ä.û.Ä.â.N. 000180
9A0676FF 006A0876 FF006A56 00000AC8 C3098EC1 8CD20801 9AE819E8 1E8E0833 3Û..Ô.Ô...Ô.é.}ùà...Vj..v.j..v.. 0001A0
8314A613 A59A56F8 7688902F E899C028 0674FFFF C2F7FA56 89F84689 14801854 T....F%.V*Kô..t.+á.Š/..v½V.É.Ï.. 0001C0
46889007 E808C483 1405180C 9A50FE76 FF006A56 1274D008 FE5689FC 468902C4 á..F=.V±.Åt.Vj..v±P......á.Š...F 0001E0
```

```
Dump of file SATURN:[PCCOMMON.DUMP.DLL]DAPROFDF.TMP;1 on 18-APR-1990 10:42:42.58
File ID (604,30,0)   End of file block 88 / Allocated 88

Virtual block number 65 (00000041), 512 (0200) bytes

 D9F7AEF2 C033F78B 067EC409 8B27E30E 4E8B1E56 57EC8B55 90CBC95E FE568BFC =.V±^èu.U.$WV..N.D'.1á-..%3á·Ü%) 000000
 8B5F5E1F C18BD1F7 49490474 0477FF45 3A26C933 FF448AA6 F30A76C5 FE8BCB03 .ü.±év.µ].D.3è&:E.w.t.II%I.è.^_. 000020
 080E750A F9831374 :00A93FC 071E570A 7EC51E08 568B0646 8B0E4E8B 00CB5DE5 ]]ù..N..F..V..é~.W..•..ât..ª.u.. 000040
 3004D3B7 92F1F793 F1F70274 C00BD233 92F78BDA F7000283 DBF7AA2D B00A79D2 Øy.¯-¯%U.Ø.%Ö.%.3Ø.ât.%þ.%þ..Æ.0 000060
 58DA8CF2 72C73B01 448DFF44 8B0586AC 4F0588E2 75C30BC2 8BAA2704 0276393C <9v..'´.ò.ùuä..O¯...D..D.;úr·.ÕX 000080
 47F626FA 5EC41CEB F62BFC5E 8CFA4689 05C28856 000006C8 00CB5DE5 8B5E5F1F ._^.]]ù.â...V|ò..Fª.^•±-$.á^ª&-G 0000A0
 FA463917 82168B17 B0A10CFA 46834601 744004C4 83147218 889A5306 0E74830A ..¯t..S...r..á.ât.F.Fª.Ä¯...ý.9Fª 0000C0
 BB5756EC 8B55CB50 E58B01FE 4F800474 D8DB065E 8BEC8B55 90CBC95E C68BD876 vÁ.ó^èù.U.$.^..Üt..O±..]]ùU.$VWE 0000E0
 96190CA3 19DAA3FE 244024EB 99C03305 750176E8 0005B807 1E297500 3F83190A Ö..?.u)..¡..Öv.u.3á.$$@$±ËÖ.ÉÉ.. 000100
 CB50E58B 5E5F0009 E8C08ED8 8C064E8B 19E03689 FFFEFE44 C704C683 000104C7 ù....ó.ùD±±..6Á..N..Á.âÒ.._^.]]ù 000120
 D08B1573 C1384843 7401ABFE 8BADFC02 778BF273 EEF9B3FE E180FA74 41000DE9 ÕÅ.Atª.Ä±.ªYs·.w.•Ü.±´.tCH;ès..Á 000140
 8948C128 FE4C89F9 030C74FE 8BE6EBFE 4489F788 000205C2 03357401 A8ADF003 .ÞÜ´.tS.ó....%.D±$|.±t..ª.L±+èH. 000160
 EC06C626 C3027F89 19E81E8C 26057401 38117BB9 DA8CC68B FE4CFEF9 0305EB05 .$..ª±L±.ó.Õ¿x.;]t.&..Ò....ù&6.& 000180
 E27401A8 ADF003D0 888C73C1 3B48FE8B F27401AB ADF003FE 882574FF FE300219 ..=±.t%.±.ÞÜ´.t·.±H;ès¥.Å.ÞÜ´.tã 0001A0
 D88C1274 19EC0EFE 2615EBD8 8E0474C0 08D8478B E6EBFE44 89F78B00 0205C203 .ò....%.D±$|.G..ât..Ä$.&±.&.t..Ä 0001C0
 40400124 0074C638 0068E8C0 33067788 8BE83788 19E41E8E 260574C7 38163DBF e•.;út.&..ð..7$E.w.3áÒk.;ót.$.ãã 0001E0

Dump of file SATURN:[PCCOMMON.DUMP.DLL]DAPROFDF.TMP;1 on 18-APR-1990 10:42:42.58
File ID (604,30,0)   End of file block 88 / Allocated 88

Virtual block number 66 (00000042), 512 (0200) bytes

 19E8A326 0474C13B 16918908 8C98EB4E 4E960574 001DE8FE 4DFE0074 005FE898 .Ò_.t.±M±Ò..t..NN$..Ä¿..;èt.&EÒ. 000000
 047619EA 163B267F FFBA4141 49C82B03 7401A8FE 458851C3 99C03302 47890788 ...G.3á.ùQ.E±´.t.+âIAAo..&;.õ.v. 000020
 33E575EA D1D2F708 75000CE8 C628C223 D2F70072 C2031572 C603C18B F575EAD1 ]ðu%.è.ór..ór.%Ø#ò+6Ò..u.%Ø]ðu]3 000040
 55894AD7 2BD68806 7789FFFE FE44C7F2 03F088FE 88571874 001DE851 52C359C0 âYùRQÒ..t.W.±.Þ.·ùD±±..w..ø+■J.U 000060
 5A1FFFFA 8308C483 15791756 9A1F0650 0001B850 52521ED2 335053C3 5A5958FE ±XY2ùSP3Ø.RRP¡..P...V.y..á..ª..Z 000080
 57E80775 48064688 08568B01 8EBF3875 000A7E83 065756EC 8B55C302 0B02745B [t..ØùU.$VW..~..uß¢...V..F.Hu.ÒW 0000A0
 04C68334 735E003E E8560E46 89024488 0074F73B 11744805 8E368B4C E8277200 .r'$L.ó..Ht.;%t..D..F.VÒ>.^s4.ó. 0000C0
 F95B0000 FFFF9A50 C0335016 52C48850 21EB99FF FFB80675 D20B0473 058EFE81 .±..s..Øu.¡...$IP.ÆR.P3âP.....(ª 0000E0
 024C39F7 8B0E4E8B CB5DE58B 5E5F07C0 33038805 8E368902 5C891489 E675C085 .âu]...\..ó...Æ3á._^.]]ù.N..%9L. 000100
 01881E39 0675F73B C18ED38B 26721C03 DA8B2CEB F9F27505 8EFE8104 C6830C74 t..ó..±..u·ª$,.Ö..r&.Æ.è;%u.9... 000120
 8BEC8B55 00C3D188 04879201 88168904 75F73BDE 75C08500 00FFFF9A 51531373 s.SQ......âuß;%u.........]ù.U.$. 000140
 D1E08A0A 4688012B D187D103 D3230B1B D12B0C74 DAF7D78B 067EC457 38E30C4E N.DBWá-..■%Òt.+].ÙW#.].]+].F..Ä] 000160
 88064688 5FAAF3C9 13A8F3E9 D1C38EFF FFC381C3 8C10E3D1 87AAF3C9 13ABF3E9 Õµ¨.èµ´.ID..û.û...ûIÕµ¨.èµ¯.F.. 000180
 F70008CA 5DE58BE3 F7064688 08750A5E 8BD8080C 5E880846 8BEC8B55 CB5D0856 V.]ùU.$.F..^..Á.^.u..F.%D.]Ìò..% 0001A0
 C4F62B56 000004C8 0008CA50 E58BD103 E3F70646 8BC8030C 66F70646 8BC88BE3 D.â.F.%f..â.F.%D.].]]ò..â...V+-6 0001C0
 D86BF9F7 000C8999 05C220C3 88157508 0A47F626 5575023C 03240A47 8A26065E ^.&.G.$.<.ùU&-G..u..û-ò..¿..%ªkÄ 0001E0

Dump of file SATURN:[PCCOMMON.DUMP.DLL]DAPROFDF.TMP;1 on 18-APR-1990 10:42:42.58
File ID (604,30,0)   End of file block 88 / Allocated 88

Virtual block number 57 (00000043), 512 (0200) bytes

 FF260877 FF265028 7EC00BFC 46890647 28260788 26065E8B 39740111 B687F606 .-.Å..t9.^.&..&+G..F=.â-(P&.w.&. 000000
 FFBE200A 4F802606 5EC40B74 FC463B08 C4831746 0F1A9A50 E42A0B47 8A260677 w.&.G.*ðP...F..á.;Fªt.á^.&.O. /. 000020
 000CCBC9 5EC68B00 000447C7 26025789 26078926 08578B26 06478826 065EC4FF .á^.&.G.&.W.&..&.W.&ùG....ó^èù.. 000040
 00070002 118C0103 00050002 11C40103 00000005 16C60002 00000003 18DC0002 ..€.......ó.......á............. 000060
 003A0002 0F460103 00880002 183F0105 00260002 17F50103 00220002 17AA0103 ..`...".....%...&...?.......F...:. 000080
 005C0002 003F0103 005B0002 00520103 01AD0007 10660203 00400002 110E0103 ......M...f...Ü...R...[...?...\. 0000A0
 6F432020 20797261 7262694C 20656D69 54206E75 5220534D 00000000 00000000 ........MS Run-Time Library · Co 0000C0
 70726F43 2074666F 736F7263 69D0202C 38383931 20296328 20746867 69727970 pyright (c) 1988, Microsoft Corp 0000E0
 6C250075 68250000 646C2500 646C2500 646C2500 75682500 00646825 00000011 ....%hd..%hu.%ld.%ld.%ld..%hu.%l 000100
 20202028 28282828 20202020 20202020 20000064 6C250064 6C250064 6C250064 d.%ld.%ld.%ld..         (((((    000120
 84101010 10101010 10101010 10101010 48202020 20202020 20202020 20202020                H................ 000140
 01010101 01010101 01018181 81818181 10101010 10101084 84848484 84848484 ................................ 000160
 02020202 02020202 02028282 82828282 10101010 10100101 01010101 01010101 ................................ 000180
 00000000 00000000 00000000 00000000 00201010 10100202 02020202 02020202 ................................ 0001A0
 00000000 00000000 00000000 00000000 00000000 00000000 00000000 00000000 ................................ 0001C0
 00000000 00000000 00000000 00000000 00000000 00000000 00000000 00000000 ................................ 0001E0
```

```
Dump of file SATURN:[PCCOMMON.DUMP.DLL]DAPROFDF.TMP;1 on 18-APR-1990 10:42:42.58
File ID (604,30,0)    End of file block 88 / Allocated 88

Virtual block number 68 (00000044), 512 (0200) bytes

00000000 00000000 00000000 00000000 00000000 00000000 00000000 00000000 ................................ 000000
20280029 6C6C756E 2800296C 6C756E28 00000000 00000000 00000000 0000u 30 ...............(null).(null).+- 000020
00000000 00000000 00000000 00001A02 1C8011A7 1C801C80 00000000 000023.3 #..........I.................... 000040
00000000 00000000 00000000 00000000 00000000 00000000 00000000 00000000 ................................ 000060
00000000 00000000 00000000 00000000 00000000 00000000 00000000 00000000 ................................ 000080
00000000 00000000 00000000 00000000 00000000 00000000 00000000 00000000 ................................ 0000A0
00000000 00000000 00000000 00000000 00000000 00000000 00000000 00000000 ................................ 0000C0
00000000 00000000 00000000 00000000 00000000 00000000 00000000 00000000 ................................ 0000E0
00000000 00000000 00000000 00000000 00000000 00000000 00000000 00000000 ................................ 000100
00000000 00000000 00000000 00000000 00000000 00000000 00000000 00000000 ................................ 000120
00000000 00000000 00000000 00000000 00000000 00000000 00000000 00000000 ................................ 000140
00000000 00000000 00000000 00000000 00000000 00000000 00000000 00000000 ................................ 000160
00000000 00000000 00000000 00000000 00000000 00000000 00000000 00000000 ................................ 000180
00000000 00000000 00000000 00000000 00000000 00000000 00000000 00000000 ................................ 0001A0
00000000 00000000 00000000 00000000 00000000 00000000 00000000 00000000 ................................ 0001C0
00000000 00000000 00000000 00000000 00000000 00000000 00000000 00000000 ................................ 0001E0

Dump of file SATURN:[PCCOMMON.DUMP.DLL]DAPROFDF.TMP;1 on 18-APR-1990 10:42:42.58
File ID (604,30,0)    End of file block 88 / Allocated 88

Virtual block number 69 (00000045), 512 (0200) bytes

00000000 00000000 00000000 00000000 00000000 00000000 00000000 00000000 ................................ 000000
00000000 00000000 00000000 00000000 00000000 00000000 00000000 00000000 ................................ 000020
00000000 00000000 00000000 00000000 00000000 00000000 00000000 00000000 ................................ 000040
00000000 00000000 00000000 00000000 00000000 00000000 00000000 00000000 ................................ 000060
00000000 00000000 00000000 00000000 00000000 00000000 00000000 00000000 ................................ 000080
00000000 00000000 00000000 00000000 00000000 00000000 00000000 00000000 ................................ 0000A0
00000000 00000000 00000000 00000000 00000000 00000000 00000000 00000000 ................................ 0000C0
00000000 00000000 00000000 00000000 00000000 00000000 00000000 00000000 ................................ 0000E0
00000000 00000000 00000000 00000000 00000000 00000000 00000000 00000000 ................................ 000100
00000000 00000000 00000000 00000000 00000000 00000000 00000000 00000000 ................................ 000120
00000000 00000000 00000000 00000000 00000000 00000000 00000000 00000000 ................................ 000140
00000000 00000000 00000000 00000000 00000000 00000000 00000000 00000000 ................................ 000160
00000000 00000000 00000000 00000000 00000000 00000000 00000000 00000000 ................................ 000180
00000000 00000000 00000000 00000000 00000000 00000000 00000000 00000000 ................................ 0001A0
00000000 00000000 00000000 00000000 00000000 00000000 00000000 00000000 ................................ 0001C0
00000000 00000000 00000000 00000000 00000000 00000000 00000000 00000000 ................................ 0001E0

Dump of file SATURN:[PCCOMMON.DUMP.DLL]DAPROFDF.TMP;1 on 18-APR-1990 10:42:42.58
File ID (604,30,0)    End of file block 88 / Allocated 88

Virtual block number 70 (00000046), 512 (0200) bytes

00000000 00000000 00000000 00000000 00000000 00000000 00000000 00000000 ................................ 000000
00000000 00000000 00000000 00000000 00000000 00000000 00000000 00000000 ................................ 000020
00000030 4F464E49 5F454C49 465F435F 018E0000 00000000 00000000 00000000 ................C_FILE_INFO=... 000040
FFFFFFFF 01010000 000005B0 12F205AC 12F205A8 12F205A4 12F2FFFF 12F20000 ..........E..................... 000060
00000000 00000102 00000000 00000000 00000001 1A000000 000005CA 00000200 ....b........................... 000080
00000000 00000000 00000000 00000000 00000000 00000000 00000202 00000000 ................................ 0000A0
00000000 00000000 00000000 00000000 00000000 00000000 00000000 00000000 ................................ 0000C0
00000000 00000000 00000000 00000000 00000000 00000000 00000000 00000000 ................................ 0000E0
00000000 00000000 00000000 00000000 00000000 00000000 00000000 00000000 ................................ 000100
00000000 00000000 00000000 00000000 00000000 00000000 00000000 00000000 ................................ 000120
00000000 00000000 [illegible] 00000000 00000000 00000000 00000000 00000000 ................................ 000140
00000000 00000000 [illegible] 00000000 00000000 00000000 00000000 00000000 ................................ 000160
00000000 00000000 00000000 00000000 00000000 00000000 00000000 00000000 ................................ 000180
00000000 00000000 00000000 00000000 00000000 00000000 00000000 00000000 ................................ 0001A0
00000000 00000000 00000000 00000000 00000000 00000000 00000000 00000000 ................................ 0001C0
00000000 00000000 00000000 00000000 00000000 00000000 00000000 00000000 ................................ 0001E0
```

```
Dump of file SATURN:[PCCOMMON.DUMP.DLL]DAPROFDF.TMP;1 on 18-APR-1990 10:42:42.58
File ID (604,30,0)   End of file block 88 / Allocated 88

Virtual block number 71 (00000047), 512 (0200) bytes

00000000 00000000 00000000 00000000 00000000 00000000 00000000 00000000 ................................ 000000
00000000 00000000 00000000 00000000 00000000 00000000 00000000 00000000 ................................ 000020
00000000 00000000 00000000 00000000 00000000 00000000 00000000 00000000 ................................ 000040
00000000 00000000 00000000 00000000 00000000 00000000 00000000 00000000 ................................ 000060
00000000 00000000 00000000 00000000 00000000 00000000 00000000 00000000 ................................ 000080
00000000 00000000 00000000 00000000 00000000 00000000 00000000 00000000 ................................ 0000A0
00000000 00000000 00000000 00000000 00000000 00000000 00000000 00000000 ................................ 0000C0
00000000 00000000 00000000 00000000 00000000 00000000 00000000 00000000 ................................ 0000E0
00000000 00000000 00000000 00000000 00000000 00000000 00000000 00000000 ................................ 000100
00000000 00000000 00000000 00000000 00000000 00000000 00000000 00000000 ................................ 000120
00000000 00000000 00000000 00000000 00000000 00000000 00000000 00000000 ................................ 000140
00000000 00000000 00000000 00000000 00000000 00000000 00000000 00000000 ................................ 000160
00000000 00000000 00000000 00000000 00000000 00000000 00000000 00000000 ................................ 000180
00000000 00000000 00000000 00000000 00000000 00000000 00000000 00000000 ................................ 0001A0
00000000 00000000 00000000 00000000 00000000 00000000 00000000 00000000 ................................ 0001C0
00000000 00000000 00000000 00000000 00000000 00000000 00000000 00000000 ................................ 0001E0

Dump of file SATURN:[PCCOMMON.DUMP.DLL]DAPROFDF.TMP;1 on 18-APR-1990 10:42:42.58
File ID (604,30,0)   End of file block 88 / Allocated 88

Virtual block number 72 (00000048), 512 (0200) bytes

00000000 00000000 00000000 00000000 00000000 00000000 00000000 00000000 ................................ 000000
00000000 00000000 00000000 00000000 00000000 00000000 00000000 00000000 ................................ 000020
00000000 00000000 00000000 00000000 00000000 00000000 00000000 00000000 ................................ 000040
00000000 00000000 00000000 00000000 00000000 00000000 00000000 00000000 ................................ 000060
00000000 00000000 00000000 00000000 00000000 00000000 00000000 00000000 ................................ 000080
00000000 00000000 00000000 00000000 00000000 00000000 00000000 00000000 ................................ 0000A0
00000000 00000000 00000000 00000000 00000000 00000000 00000000 00000000 ................................ 0000C0
00000000 00000000 00000000 00000000 00000000 00000000 00000000 00000000 ................................ 0000E0
00000000 00000000 00000000 00000000 00000000 00000000 00000000 00000000 ................................ 000100
00000000 00000000 00000000 00000000 00000000 00000000 00000000 00000000 ................................ 000120
00000000 00000000 00000000 00000000 00000000 00000000 00000000 00000000 ................................ 000140
00000000 00000000 00000000 00000000 00000000 00000000 00000000 00000000 ................................ 000160
00000000 00000000 00000000 00000000 00000000 00000000 00000000 00000000 ................................ 000180
00000000 00000000 00000000 00000000 00000000 00000000 00000000 00000000 ................................ 0001A0
00000000 00000000 00000000 00000000 00000000 00000000 00000000 00000000 ................................ 0001C0
00000000 00000000 00000000 00000000 00000000 00000000 00000000 00000000 ................................ 0001E0

Dump of file SATURN:[PCCOMMON.DUMP.DLL]DAPROFDF.TMP;1 on 18-APR-1990 10:42:42.58
File ID (604,30,0)   End of file block 88 / Allocated 88

Virtual block number 73 (00000049), 512 (0200) bytes

00000000 00000000 00000000 00000000 00000000 00000000 00000000 00000000 ................................ 000000
00000000 00000000 00000000 00000000 00000000 00000000 00000000 00000000 ................................ 000020
00000000 00000000 00000000 00000000 00000000 00000000 00000000 00000000 ................................ 000040
00000000 00000000 00000000 00000000 00000000 00000000 00000000 00000000 ................................ 000060
00000000 00000000 00000000 00000000 00000000 00000000 00000000 00000000 ................................ 000080
00000000 00000000 00000000 00000000 00000000 00000000 00000000 00000000 ................................ 0000A0
00000000 00000000 00000000 00000000 00000000 00000000 00000000 00000000 ................................ 0000C0
00000000 00000000 00000000 00000000 00000000 00000000 00000000 00000000 ................................ 0000E0
00000000 00000000 00000000 00000000 00000000 00000000 00000000 00000000 ................................ 000100
00000000 00000000 00000000 00000000 00000000 00000000 00000000 00000000 ................................ 000120
00000000 00000000 00000000 00000000 00000000 00000000 00000000 00000000 ................................ 000140
00000000 00000000 00000000 00000000 00000000 00000000 00000000 00000000 ................................ 000160
00000000 00000000 00000000 00000000 00000000 00000000 00000000 00000000 ................................ 000180
00000000 00000000 00000000 00000000 00000000 00000000 00000000 00000000 ................................ 0001A0
00000000 00000000 00000000 00000000 00000000 00000000 00000000 00000000 ................................ 0001C0
00000000 00000000 00000000 00000000 00000000 00000000 00000000 00000000 ................................ 0001E0
```

```
Dump of file SATURN:[PCCOMMON.DUMP.DLL]DAPROFDF.TMP;1 on 18-APR-1990 10:42:42.58
File ID (604,30,0)   End of file block 88 / Allocated 88

Virtual block number 74 (0000004A), 512 (0200) bytes

00000000 00000000 00000000 00000000 00000000 00000000 00000000 00000000 ................................ 000000
00000000 00000000 00000000 00000000 00000000 00000000 00000000 00000000 ................................ 000020
00000000 00000000 00000000 00000000 00000000 00000000 00000000 00000000 ................................ 000040
00000000 00000000 00000000 00000000 00000000 00000000 00000000 00000000 ................................ 000060
00000000 00000000 00000000 00000000 00000000 00000000 00000000 00000000 ................................ 000080
00000000 00000000 00000000 00000000 00000000 00000000 00000000 00000000 ................................ 0000A0
00000000 00000000 00000000 00000000 00000000 00000000 00000000 00000000 ................................ 0000C0
00000000 00000000 00000000 00000000 00000000 00000000 00000000 00000000 ................................ 0000E0
00000000 00000000 00000000 00000000 00000000 00000000 00000000 00000000 ................................ 000100
00000000 00000000 00000000 00000000 00000000 00000000 00000000 00000000 ................................ 000120
00000000 00000000 00000000 00000000 00000000 00000000 00000000 00000000 ................................ 000140
00000000 00000000 00000000 00000000 00000000 00000000 00000000 00000000 ................................ 000160
00000000 00000000 00000000 00000000 00000000 00000000 00000000 00000000 ................................ 000180
00000000 00000000 00000000 00000000 00000000 00000000 00000000 00000000 ................................ 0001A0
00000000 00000000 00000000 00000000 00000000 00000000 00000000 00000000 ................................ 0001C0
00000000 00000000 00000000 00000000 00000000 00000000 00000000 00000000 ................................ 0001E0

Dump of file SATURN:[PCCOMMON.DUMP.DLL]DAPROFDF.TMP;1 on 18-APR-1990 10:42:42.58
File ID (604,30,0)   End of file block 88 / Allocated 88

Virtual block number 75 (0000004B), 512 (0200) bytes

00000000 00000000 00000000 00000000 00000000 00000000 00000000 00000000 ................................ 000000
00000000 00000000 00000000 00000000 00000000 00000000 00000000 00000000 ................................ 000020
00000000 00000000 00000000 00000000 00000000 00000000 00000000 00000000 ................................ 000040
00000000 00000000 00000000 00000000 00000000 00000000 00000000 00000000 ................................ 000060
00000000 00000000 00000000 00000000 00000000 00000000 00000000 00000000 ................................ 000080
00000000 00000000 00000000 00000000 00000000 00000000 00000000 00000000 ................................ 0000A0
00000000 00000000 00000000 00000000 00000000 00000000 00000000 00000000 ................................ 0000C0
00000000 00000000 00000000 00000000 00000000 00000000 00000000 00000000 ................................ 0000E0
00000000 00000000 00000000 00000000 00000000 00000000 00000000 00000000 ................................ 000100
00000000 00000000 00000000 00000000 00000000 00000000 00000000 00000000 ................................ 000120
00000000 00000000 00000000 00000000 00000000 00000000 00000000 00000000 ................................ 000140
00000000 00000000 00000000 00000000 00000000 00000000 00000000 00000000 ................................ 000160
00000000 00000000 00000000 00000000 00000000 00000000 00000000 00000000 ................................ 000180
00000000 00000000 00000000 00000000 00000000 00000000 00000000 00000000 ................................ 0001A0
00000000 00000000 00000000 00000000 00000000 00000000 00000000 00000000 ................................ 0001C0
00000000 00000000 00000000 00000000 00000000 00000000 00000000 00000000 ................................ 0001E0

Dump of file SATURN:[PCCOMMON.DUMP.DLL]DAPROFDF.TMP;1 on 18-APR-1990 10:42:42.58
File ID (604,30,0)   End of file block 88 / Allocated 88

Virtual block number 76 (0000004C), 512 (0200) bytes

00000000 00000000 00000000 00000000 00000000 00000000 00000000 00000000 ................................ 000000
00000000 00000000 00000000 00000000 00000000 00000000 00000000 00000000 ................................ 000020
00000000 00000000 00000000 00000000 00000000 00000000 00000000 00000000 ................................ 000040
00000000 00000200 00010000 00000000 00000000 00000000 00000000 00000000 ................................ 000060
00000000 00000000 00000000 00000000 00000000 00000000 00000000 00000000 ................................ 000080
00000000 00000000 00000000 00000000 00000000 00000000 00000000 00000000 ................................ 0000A0
00000000 00000000 00000000 00000000 00000000 00000000 00000000 00000000 ................................ 0000C0
00000000 00000000 00000000 00000000 00000000 00000000 00000000 00000000 ................................ 0000E0
00000000 00000000 00000000 00000000 00000000 00000000 00000000 00000000 ................................ 000100
00000000 00000000 00000000 00000000 00000000 00000000 00000000 00000000 ................................ 000120
00000000 00000000 00000000 00000000 00000000 00000000 00000000 00000000 ................................ 000140
00000000 00000000 00000000 00000000 00000000 00000000 00000000 00000000 ................................ 000160
00000000 00000000 00000000 00000000 00000000 00000000 00000000 00000000 ................................ 000180
00000000 00000000 00000000 00000000 00000000 00000000 00000000 00000000 ................................ 0001A0
00000000 00000000 00000000 00000000 00000000 00000000 00000000 00000000 ................................ 0001C0
00000000 00000000 00000000 00000000 00000000 00000000 00000000 00000000 ................................ 0001E0
```

```
Dump of file SATURN:[PCCOMMON.DUMP.DLL]DAPROFDF.TMP;1 on 18-APR-1990 10:42:42.58
File ID (604,30,0)    End of file block 88 / Allocated 88

Virtual block number 77 (0000004D), 512 (0200) bytes

00000000 00000000 00000000 00000000 00000000 00000000 00000000 00000000 ................................ 000000
00000000 00000000 00000000 00000000 00000000 00000000 00000000 00000000 ................................ 000020
00000000 00000000 00000000 00000000 00000000 00000000 00000000 00000000 ................................ 000040
00000000 00000000 00000000 00000000 00000000 00000000 00000000 00000000 ................................ 000060
00000000 00000000 00000000 00000000 00000000 00000000 00000000 00000000 ................................ 000080
00000000 00000000 00000000 00000000 00000000 00000000 00000000 00000000 ................................ 0000A0
00000000 00000000 00000000 00000000 00000000 00000000 00000000 00000000 ................................ 0000C0
00000000 00000000 00000000 00000000 00000000 00000000 00000000 00000000 ................................ 0000E0
00000000 00000000 00000000 00000000 00000000 00000000 00000000 00000000 ................................ 000100
00000000 00000000 00000000 00000000 00000000 00000000 00000000 00000000 ................................ 000120
00000000 00000000 00000000 00000000 00000000 00000000 00000000 00000000 ................................ 000140
00000000 00000000 00000000 00000000 00000000 00000000 00000000 00000000 ................................ 000160
00000000 00000000 00000000 00000000 00000000 00000000 00000000 00000000 ................................ 000180
00000000 00000000 00000000 00000000 00000000 00000000 00000000 00000000 ................................ 0001A0
00000000 00000000 00000000 00000000 00000000 00000000 00000000 00000000 ................................ 0001C0
00000000 00000000 00000000 00000000 00000000 00000000 00000000 00000000 ................................ 0001E0

Dump of file SATURN:[PCCOMMON.DUMP.DLL]DAPROFDF.TMP;1 on 18-APR-1990 10:42:42.58
File ID (604,30,0)    End of file block 88 / Allocated 88

Virtual block number 78 (0000004E), 512 (0200) bytes

00000000 00000000 00000000 00000000 00000000 00000000 00000000 00000000 ................................ 000000
00000000 00000000 00000000 00000000 00000000 00000000 00000000 00000000 ................................ 000020
00000000 00000000 00000000 00000000 00000000 00000000 00000000 00000000 ................................ 000040
00000000 00000000 00000000 00000000 00000000 00000000 00000000 00000000 ................................ 000060
00000000 00000000 00000000 00000000 00000000 00000000 00000000 00000000 ................................ 000080
00000000 00000000 00000000 00000000 00000000 00000000 00000000 00000000 ................................ 0000A0
00000000 00000000 00000000 00000000 00000000 00000000 00000000 00000000 ................................ 0000C0
00000000 00000000 00000000 00000000 00000000 00000000 00000000 00000000 ................................ 0000E0
00000000 00000000 00000000 00000000 00000000 00000000 00000000 00000000 ................................ 000100
00000000 00000000 00000000 00000000 00000000 00000000 00000000 00000000 ................................ 000120
00000000 00000000 00000000 00000000 00000000 00000000 00000000 00000000 ................................ 000140
00000000 00000000 00000000 00000000 00000000 00000000 00000000 00000000 ................................ 000160
00000000 00000000 00000000 00000000 00000000 00000000 00000000 00000000 ................................ 000180
00000000 00000000 00000000 00000000 00000000 00000000 00000000 00000000 ................................ 0001A0
00000000 00000000 00000000 00000000 00000000 00000000 00000000 00000000 ................................ 0001C0
00000000 00000000 00000000 00000000 00000000 00000000 00000000 00000000 ................................ 0001E0

Dump of file SATURN:[PCCOMMON.DUMP.DLL]DAPROFDF.TMP;1 on 18-APR-1990 10:42:42.58
File ID (604,30,0)    End of file block 88 / Allocated 88

Virtual block number 79 (0000004F), 512 (0200) bytes

00000000 00000000 00000000 00000000 00000000 00000000 00000000 00000000 ................................ 000000
00000000 00000000 00000000 00000000 00000000 00000000 00000000 00000000 ................................ 000020
00000000 00000000 00000000 00000000 00000000 00000000 00000000 00000000 ................................ 000040
00000000 00000000 00000000 019011AA 00000000 00000000 00000000 00000000 ................................ 000060
00000000 00000000 00000000 00000000 00000000 00008181 81010000 00010000 ................................ 000080
00000000 00000000 00000000 00000000 00000000 00000000 00000000 00000000 ................................ 0000A0
00000000 00000000 00000000 00000000 00000000 00000000 00000000 00000000 ................................ 0000C0
00000000 00000000 00000000 00000000 00000000 00000000 00000000 00000000 ................................ 0000E0
00000000 00000000 00000000 00000000 00000000 00000000 00000000 00000000 ................................ 000100
00000000 00000000 00000000 00000000 00000000 00000000 00000000 00000000 ................................ 000120
00000000 00000000 00000000 00000000 00000000 00000000 00000000 00000000 ................................ 000140
00000000 00000000 00000000 00000000 00000000 00000000 00000000 00000000 ................................ 000160
0A0A0A0A 0A0A0A0A 0A0A0A0A 0A0A0A0A 0A0A0A0A 0A0A0A0A 0A000000 00000000 ................................ 000180
0A0A0A0A 0A0A0A0A 0A0A0A0A 0A0A0A0A 0A0A0A0A 0A0A0A0A 0A0A0A0A 0A0A0A0A ................................ 0001A0
0A0A0A0A 0A0A0A0A 0A0A0A0A 0A0A0A0A 0A0A0A0A 0A0A0A0A 0A0A0A0A 0A0A0A0A ................................ 0001C0
0A0A0A0A 0A0A0A0A 0A0A0A0A 0A0A0A0A 0A0A0A0A 0A0A0A0A 0A0A0A0A 0A0A0A0A ................................ 0001E0
```

```
Dump of file SATURN:[PCCOMMON.DUMP.DLL]DAPROFDF.TMP;1 on 18-APR-1990 10:42:42.58
File ID (604,30,0)   End of file block 88 / Allocated 88

Virtual block number 80 (00000050), 512 (0200) bytes

 0A0A0A0A 0A0A0A0A 0A0A0A0A 0A0A0A0A 0A0A0A0A 0A0A0A0A 0A0A0A0A 0A0A0A0A ................................ 000000
 0A0A0A0A 0A0A0A0A 0A0A0A0A 0A0A0A0A 0A0A0A0A 0A0A0A0A 0A0A0A0A 0A0A0A0A ................................ 000020
 0A0A0A0A 0A0A0A0A 0A0A0A0A 0A0A0A0A 0A0A0A0A 0A0A0A0A 0A0A0A0A 0A0A0A0A ................................ 000040
 0A0A0A0A 0A0A0A^A 0A0A0A0A 0A0A0A0A 0A0A0A0A 0A0A0A0A 0A0A0A0A 0A0A0A0A ................................ 000060
 00000000 00000000 00000000 00000000 00000000 00000000 000A0A0A 0A0A0A0A ................................ 000080
 05B41558 00000000 00000000 00000000 00000000 20000000 00000000 00000000 ..........  ................X.Ç. 0000A0
 65766F20 68636174 7320200A 00303030 36520000 3E3E4753 4D4E3C3C FFFFFFFF ....<<NMSG>>..R6000..- stack ove 0000C0
 64697669 64207265 6765746E 6920200A 00333030 36520003 000A0077 6F6C6672 rflow.....R6003..- integer divid 0000E0
 73206867 756F6E65 20746F6E 20200A00 38303036 52000800 0A003020 79622065 e by 0.....R6008..- not enough s 000100
 20200A00 39303036 52000900 0A007374 6E656075 67726120 726F6620 65636170 pace for arguments.....R6009..-  000120
 746E656D 6E6F7269 766E6520 726F6620 65636170 73206867 756F6E65 20746F6E not enough space for environment 000140
 30303652 0002002( 726F7272 6520656D 6974206E 757200FF 000A0000 FC000A00 ...=......run-time error ...R600 000160
 0A006465 64616F6C 20746F6E 20746E69 6F702067 6E697461 6F6C6620 200A0032 2..- floating point not loaded.. 000180
 00000000 000517B2 00020000 000405C4 00020000 000319FE 00020003 FFFFFF00 ........ı.......á.......ý....... 0001A0
 444E551A 006D726F 4620676E 6F4C206E 69206570 79746275 53206464 41190352 R..Add Subtype in Long Form..UND 0001C0
 646F4D20 61746144 1300656C 69666F72 5020676E 697A696C 61697469 6E493A4F O:Initializing Profile..Data Mod 0001E0

Dump of file SATURN:[PCCOMMON.DUMP.DLL]DAPROFDF.TMP;1 on 18-APR-1990 10:42:42.58
File ID (604,30,0)   End of file block 88 / Allocated 88

Virtual block number 81 (00000051), 512 (0200) bytes

 01000100 01000100 01000100 01000100 01000100 0100656C 69666F72 50206C65 el Profile...................... 000000
 00000000 FFFF0001 000E0352 00000F82 00000000 00000000 00000000 01000100 ................ý...R........... 000020
 00000000 0A41FFFF 01000334 00FAFD5B 00919400 00900A40 00000001 00000056 V.......@.......[»ª.4.....A..... 000040
 00000000 0000FFFF FFFF0150 0008001E 03260005 80010001 0A450005 00050000 ......E.......&.....P........... 000060
 00050000 00000000 FFFFFFFF 01510008 00EC031A 00078002 00080A48 00000006 ....K..........ì...Q............ 000080
 00100005 00000000 u000FFFF FFFF0137 006700F0 02A90005 80030002 0A4C0016 ..L.......`.Þ.g.7............... 0000A0
 0A810000 00060000 00000000 FFFFFFFF 01380008 008002FA 000A8000 00010A63 c........ª.....8................ 0000C0
 00010A82 00250005 0u000000 0000FFFF FFFF0139 0008001E 02FC008F 80020008 ........■.....9.............Ø..... 0000E0
 80020008 0AA80000 00060000 00000000 FFFFFFFF 00000008 009A02EA 000A8000 ....õ......................´..... 000100
 000A8000 00010AA9 00100005 00000000 0000FFFF FFFF0138 0008001E 02EC00A8 ¨.ì.....;...............˙....... 000120
 02010014 80020003 0AC70015 00030000 00000000 FFFFFFFF 013C0008 0081020C É.....<...............ú.......ı. 000140
 007E02C6 00148002 00030ADD 00150003 00000000 0000FFFF FFFF013F 00080074 t...?...............Ï.......ó.~. 000160
 0008007B 02BB0014 80020003 0AF30012 00030000 00000000 FFFFFFFF 01400008 ..@................µ.......É.(... 000180
 013E0008 00C302AC 000A8002 00010B06 00170003 00000000 0000FFFF FFFF0141 A...................¯.Û...>. 0001A0
 FFFF012E 00FB00F0 01A60005 80030002 081E0010 00050000 00000000 FFFFFFFF .......................¦.Þ.«..... 0001C0
 FFFFFFFF 01330008 00B10231 000A8000 00010B2F 00220005 00000000 0000FFFF ..........".\/........1.Ý...3..... 0001E0

Dump of file SATURN:[PCCOMMON.DUMP.DLL]DAPROFDF.TMP;1 on 18-APR-1990 10:42:42.58
File ID (604,30,0)   End of file block 88 / Allocated 88

Virtual block number 82 (00000052), 512 (0200) bytes

 0000FFFF FFFF0130 00080074 028D000A 80000001 0B52001A 00050000 00000000 ..........R.........t...u ...... 000000
 00000000 FFFFFFFF 01420008 00640282 00148002 00030B60 00120003 00000000 ........m.........d...B......... 000020
 00000000 0000FFFF FFFF0143 00080082 02770014 80020003 0B80001D 00030000 ..............w.ý...C........... 000040
 00050000 00000000 FFFFFFFF 01440008 0084026C 00148002 0003089E 00180003 .............l.....D............ 000060
 00120003 00000000 0000FFFF FFFF0132 00080089 025F000A 80010001 0BB7001E ..ñ.......·_.....2............... 000080
 0BE9001D 00030000 00000000 FFFFFFFF 01450008 007A0254 00148002 00030BD6 é.......T.z̄...E...............Ö. 0000A0
 00030C07 00180003 00000000 0000FFFF FFFF0146 0008009E 02490014 80020003 ......I.....F................... 0000C0
 80030003 0C200019 00030000 00000000 FFFFFFFF 01470008 009E023E 00148002 ....>.....G............. ...... 0000E0
 00148002 00030C3A 00170003 00000000 0000FFFF FFFF0148 0008008E 02260014 ..&.....H...............:....... 000100
 02100014 80020003 0C520019 00030000 00000000 FFFFFFFF 01490008 007E021B ..~...I...............R......... 000120
 00820205 00148002 00030C6C 00190003 00000000 0000FFFF FFFF014A 00080080 ....J................l.......... 000140
 000800AE 01F8000A 80010001 0C860026 00050000 00000000 FFFFFFFF 01480008 ..K.............&.........®.Û... 000160
 014C0008 008601ED 0014°002 00030CAD 00190003 00000000 0000FFFF FFFF0135 5...............Û.......Û.....L. 000180
 FFFF014D 0008007C 01E20014 80020003 0CC70017 00030000 00000000 FFF:¯FFF ..............ú.......â.|...M... 0001A0
 FFFFFFFF 014E0008 00860107 00148002 00030CDF 00190003 00000000 0000F.¨F .............Ô.......■.....N..... 0001C0
 0000FFFF FFFF014F 0008007C 01CC0014 80020003 0CF90019 00030000 000000u1 ..........ª.......ä.|...O....... 0001E0
```

```
Dump of file SATURN:[PCCOMMON.DUMP.DLL]DAPROFDF.TMP;1 on 18-APR-1990 10:42:42.58
File ID (604,30,0)   End of file block 88 / Allocated 88

Virtual block number 83 (00000053), 512 (0200) bytes

00000000 FFFFFFFF 01580008 006401BF 000A8001 00010013 00150005 00000000 ...............¢.d...X......... 000000
00000000 0000FFFF F.FF0159 0008005E 01840014 80020003 00290011 00030000 ......).......Ç.^...Y........... 000020
00050000 00000000 FFFFFFFF 015A0008 006101A9 00148002 00030038 00110003 ....;....... .a...Z............. 000040
00280003 00000000 0000FFFF FFFF0120 006A00F0 01340005 80010002 00400008 ..M.......4.Þ.j. ..............(. 000060
007F000A 00030000 00000000 FFFFFFFF 01210008 00C50167 000A8002 00010056 V.......g.é...!.................. 000080
00040D8A 000C0003 00000000 0000FFFF FFFF015F 00080047 017F0014 80000004 ........G..._................... 0000A0
80010001 0097000F 00050000 00000000 FFFFFFFF 01600008 00560174 00148000 ....t.V...'..................... 0000C0
005E8002 00080DA7 00000006 00000000 0000FFFF FFFF0122 0008004E 0157000A ..W.N...".................!.....^. 0000E0
0147000A 80000001 00A80010 00050000 00000000 FFFFFFFF 01230008 004C0159 Y.L...#.........................G. 000100
004C0149 005E8002 000800B9 00000006 00000000 0000FFFF FFFF0124 0008004C L...$...............¿.....^.I.L. 000120
00080051 0137000A 80000001 00BA000F 00050000 00000000 FFFFFFFF 01250008 ..%...............¤.......7.Q... 000140
01270008 004C0139 005E8002 000800CA 00000006 00000000 0000FFFF FFFF0126 &...............ò.....^.9.L...'. 000160
FFFF0128 00080067 01200005 80000001 00CB0017 00050000 00000000 FFFFFFFF ................ù........g...(... 000180
FFFFFFFF 01290008 00160122 00748002 00080DE3 00000006 00000000 0000FFFF ............Ð.....t.".....)..... 0001A0
0000FFFF FFFF012A 00080058 01100005 80000001 0DE40013 00050000 00000000 ..........ð.........X...ª....... 0001C0
00000000 FFFFFFFF 01280008 00220110 00628002 00030DF8 00040003 00000000 ........%.....b..."...+......... 0001E0

Dump of file SATURN:[PCCOMMON.DUMP.DLL]DAPROFDF.TMP;1 on 18-APR-1990 10:42:42.58
File ID (604,30,0)   End of file block 88 / Allocated 88

Virtual block number 84 (00000054), 512 (0200) bytes

00000000 0000FFFF FFFF012C 00080028 01100080 80020003 0DFD0005 00030000 ......"..........(...,.......... 000000
00050000 00000000 FF'*FFFF 01200008 00200110 008D8002 00030E03 00030003 ..........§... ...-............ 000020
00000003 00000000 00 'FFFF FFFF0119 002500F0 00E30005 80010002 0E07000A ..........D.Þ.X................. 000040
0E200007 00050000 00000000 FFFFFFFF 01180008 004900F4 00148002 00010E12 .........¶.I.................. . 000060
00030E28 00060003 00000000 0000FFFF FFFF011C 00080023 00E60014 80010001 ......Ì.#......................(... 000080
80020003 0E2F0006 00030000 00000000 FFFFFFFF 01100008 002E00E6 00388002 ..;.Ì.......................7..... 0000A0
00A68002 00030E36 00070003 00000000 0000FFFF FFFF011E 0008002E 00E60071 q.Ì....................6.....Ì. 0000C0
00050005 80010002 0E3E000A 00050000 00000000 FFFFFFFF 011F0008 002E00E6 Ì.......................>........ 0000E0
002C0098 000A8000 00010E49 000A0005 00000000 0000FFFF FFFF0110 00A700F0 Þ.Ì...................Ì.......... 000100
0008004C 00980041 80020003 0E54000C 00030000 00000000 FFFFFFFF 01180008 ....................T.....A...L... 000120
010F0008 003A0098 00938002 00030E61 000A0003 00000000 0000FFFF FFFF010E ...................a........:..... 000140
FFFF0107 00080074 0078000A 80000001 0E6C001A 00050000 00000000 FFFFFFFF ...................l.......x.t....... 000160
FFFFFFFF 01080008 0038007A 00888002 00080E87 00000006 00000000 0000FFFF ........................z.8......... 000180
0000FFFF FFFF0109 00080077 0068000A 80000001 0E880019 00050000 00000000 ........................h.w........... 0001A0
00000000 FFFFFFFF 010A0008 0038006A 00888002 00080EA2 00000006 00000000 ........À.......j.8............. 0001C0
00000000 0000FFFF FFFF0152 00080076 0088000A 80010001 0EA30019 00050000 ......È.........v...R........... 0001E0

Dump of file SATURN:[PCCOMMON.DUMP.DLL]DAPROFDF.TMP;1 on 18-APR-1990 10:42:42.58
File ID (604,30,0)   End of file block 88 / Allocated 88

Virtual block number 85 (00000055), 512 (0200) bytes

00050000 00000000 FFFFFFFF 01530008 0038008A 00888002 00080E8D 00000006 ....§.........8...S............. 000000
000F0005 00000000 0000FFFF FFFF0111 002700F0 00840007 80010002 0EBE0010 ../.......Ç.Þ.'................. 000020
0EDF0000 00060000 00000000 FFFFFFFF 01120008 005100B7 00148000 00010ECF ü.......ñ.Q...................Ö. 000040
00010EE0 00110005 00000000 0000FFFF FFFF0113 0008003C 00890068 80020008 ....k.¿.<...................À... 000060
80020003 0EF20003 00030000 00000000 FFFFFFFF 01140008 004C00C7 00148001 ....ú.L........................ 000080
008C8002 00030EF6 00030003 00000000 0000FFFF FFFF0115 00080020 00C70066 f.ú. ...................-....... 0000A0
00C70083 80020003 0EFA0003 00030000 00000000 FFFFFFFF 01160008 002000C7 ú. ...................'.....".ú. 0000C0
00680058 000A8000 00010EFE 00160005 00000000 0000FFFF FFFF0117 00080020  .......................±.......X.h. 0000E0
00080060 005A0088 80020008 0F150000 00060000 00000000 FFFFFFFF 01080008 ...........................Z.'... 000100
01540008 00650048 000A8000 00010F16 00170005 00000000 0000FFFF FFFF010C ..........................H.e...T. 000120
FFFF0155 00080060 004A0088 80020008 0F2E0000 00060000 00000000 FFFFFFFF ..........................J.'...U... 000140
FFFFFFFF 01050008 006A0038 000A8000 00010F2F 00160005 00000000 0000FFFF ............/.......8.j......... 000160
0000FFFF FFFF0106 00080061 003A0088 80020008 0F460000 00060000 00000000 ..........F.......:.a........... 000180
00000000 FFFFFFFF 01030008 005E0028 000A8000 00010F47 00130005 00000000 ........G.......(.^............ 0001A0
00000000 0000FFFF FFFF0104 00080060 002A0088 80020008 0F580000 00060000 ......[.......*.'............... 0001C0
00060000 00000000 FFFFFFFF 01560008 005E0018 000A8001 00010F5C 00140005 ....\.........^...V............. 0001E0
```

```
Dump of file SATURN:[PCCOMMON.DUMP.DLL]DAPROFDF.TMP;1 on 18-APR-1990 10:42:42.58
File ID (604,30,0)    End of file block 88 / Allocated 88

Virtual block number 86 (00000056), 512 (0200) bytes

00130005 00000000 0000FFFF FFFF0157 00080060 001A0088 80020008 0F710000 ..q.........'...W............... 000000
0F860000 00060000 00000000 FFFFFFFF 01010008 00600008 000A8000 00010F72 r.........'...................... 000020
00010F87 002A0005 00000000 0000FFFF FFFF0102 00080060 000A0088 80020008 .........'.................*..... 000040
69736544 00003A65 60614E00 00000000 FFFFFFFF 01620008 0089018A 000A8001 ......¿...b..........Name:..Desi 000060
65637265 70207061 6C726576 4F007372 65746560 61726170 20687361 74206E67 gn task parameters.Overlap perce 000080
68736572 68742074 6966656E 65420000 3A736570 79746275 7320726F 6620746E nt for subtypes:..Benefit thresh 0000A0
6E676965 726F4600 003A7968 63726172 65696820 65707974 20726F66 20646C6F old for type hierarchy:..Foreign 0000C0
7461206E 6F6D6D6F 43003A64 6F687465 6D206E6F 69746365 74656420 79656820  key detection method:.Co.non at 0000E0
616E206E 6F6F736E 65606964 206E6F6D 6D6F4300 65606 16E 20657475 62697274 tribute name.Common dimens:.n na 000100
20726F66 20686365 68430065 6D616E20 6E696160 6F64206E 6F6D6D6F 43006560 me.Common domain name.Check for  000120
47007372 65746560 61726170 20656772 654D006E 6F697461 7A696C61 6D726F6E normalization.Merge parameters.G 000140
79676574 61727473 206E6F69 74756C6F 73657220 68637461 6D206C61 72656E65 eneral match resolution strategy 000160
6D6F4300 3A796765 74617274 7320676E 69686374 616D206C 6172656E 6547003A :.General matching strategy:.Com 000180
726F2065 6D616E20 6574656C 70606F43 00796C6E 6F20656D 616E2065 74656C70 plete name only.Complete name or 0001A0
7320726F 20656061 6E206574 656C706D 6F43006E 65686F74 206E6F6D 6D6F6320  common token.Complete name or s 0001C0
61727473 20676E69 68637461 6D206574 616E6964 726F6275 53006D79 6E6F6E79 ynonym.Subordinate matching stra 0001E0

Dump of file SATURN:[PCCOMMON.DUMP.DLL]DAPROFDF.TMP;1 on 18-APR-1990 10:42:42.58
File ID (604,30,0)    End of file block 88 / Allocated 88

Virtual block number 87 (00000057), 512 (0200) bytes

74656C70 6D6F4300 796C6E6F 20656D61 6E206574 656C706D 6F43003A 79676574 tegy:.Complete name only.Complet 000000
20657465 6C706D6F 43006E65 686F7420 6E6F6D6D 6F632072 6F20656D 616E2065 e name or common token.Complete  000020
61206563 72756F73 20656E69 62606F43 0060796E 6F6E7973 20726F20 6560616E name or synonym.Combine source a 000040
65677261 74207065 65682F65 6372756F 73207065 654B0074 65677261 7420646E nd target.Keep source/keep targe 000060
6F6E6749 00746567 72617420 6574656C 65642F65 6372756F 73207065 654B0074 t.Keep source/delete target.Igno 000080
74616E69 64726F62 75530074 65677261 74207065 65682F65 6372756F 73206572 re source/keep target.Subordinat 0000A0
6D6F4300 3A796765 74617274 73206E6F 6974756C 6F736572 20686374 616D2065 e match resolution strategy:.Com 0000C0
72756F73 20706565 4B007465 67726174 20646E61 20656372 756F7320 656E6962 bine source and target.Keep sour 0000E0
74656C65 642F6563 72756F73 20706565 4B007465 67726174 20706565 682F6563 ce/keep target.Keep source/delet 000100
67726174 20706565 682F6563 72756F73 2065726F 6E674900 74656772 61742065 e target.Ignore source/keep targ 000120
756F7320 65735500 3A796765 74617274 73206E6F 6974616E 6962606F 43007465 et.Combination strategy:.Use sou 000140
746E4500 7365756C 61762074 65677261 74206573 55007365 756C6176 20656372 rce values.Use target values.Ent 000160
206F7420 7365676E 61686320 6560616E 20657461 6761706F 72500073 65697469 ities.Propagate name changes to  000180
6C61756E 61400065 63616C70 206F7475 41007374 65732D70 20646574 616C6572 related p-sets.Auto place.Manual 0001A0
64657463 65707845 00003A65 6D756C6F 76206D75 6D696E69 4D006563 616C7020  place.Minimum volume:..Expected 0001C0
74776F72 4700003A 656D756C 6F76206D 756D6978 614D0000 3A656D75 6C6F7620  volume:..Maximum volume:..Growt 0001E0

Dump of file SATURN: ?CCOMMON.DUMP.DLL]DAPROFDF.TMP;1 on 18-APR-1990 10:42:42.58
File ID (604,30,0)    End of file block 88 / Allocated 88

Virtual block number 88 (00000058), 512 (0200) bytes

20657461 72206874 776F7247 00003A65 6761746E 65637265 70206574 61722068 h rate percentage:..Growth rate  000000
65747562 69727474 41007961 44006874 6E6F4D00 72616559 003A646F 69726570 period:.Year.Month.Day.Attribute 000020
53006C61 756E614D 003A6563 72756F53 00646577 6F6C6C61 20736C6C 754E0073 s.Nulls allowed.Source:.Manual.S 000040
74636172 61684300 73657079 74206174 61440064 65766972 65440060 65747379 ystem.Derived.Data types.Charact 000060
72616843 00636974 65626168 706C4100 63697265 6D756E61 68706C41 003A7265 er:.Alphanumeric.Alphabetic.Char 000080
65746361 72616843 00003A68 74676E65 6C206465 74636570 78652072 65746361 acter expected length:..Characte 0000A0
6E696D20 72657463 61726168 4300003A 6874676E 656C206D 75606978 616D2072 r maximum length:..Character min 0000C0
4D007374 65732D70 69687372 656E7472 61500000 3A687467 6E656C20 6D756069 imum length:..Partnership-sets.M 0000E0
726F7461 7265706F 206C6163 69676F4C 00003A65 6D756C6F 76206D75 6D697861 aximum volume:..Logical operator 000100
61762060 756D696E 696D2072 65676574 6E490052 4F580044 4E410052 4F49003A :.IOR.AND.XOR.Integer minimum va 000120
4900003A 65756C61 76206465 74636570 78652072 65676574 6E490000 3A65756C lue:..Integer expected value:..I 000140
696E696D 206C6165 5200003A 65756C61 76206D75 6D697861 6D207265 6765746E nteger maximum value:..Real mini 000160
3A65756C 61762064 65746365 70786520 6C616552 00003A65 756C6176 206D756D mum value:..Real expected value: 000180
6C702079 7469746E 4500003A 65756C61 76206D75 6D697861 6D206C61 65520000 ..Real maximum value:..Entity pl 0001A0
65747465 6C617020 61697620 64657461 65726320 6E656877 20746E65 6D656361 acement when created via palette 0001C0
00000000 00000000 00000000 00000000 00000000 00000000 00000000 0000003A :............................... 0001E0
```

```
Dump of file SATURN:[PCCOMMON.DUMP.DLL]DAPSEIDF.TMP;1 on 18-APR-1990 10:42:54.27
File ID (609,9,0)   End of file block 85 / Allocated 88

Virtual block number 1 (00000001), 512 (0200) bytes

 00000000 00000040 00000000 000000B8 0000FFFF 00000004 0000004C 00945A4D MZ..L...........|.......a....... 000000
 00000080 00000000 00000000 00000000 00000000 00000000 00000000 00000000 ................................ 000020
 6F6E6E61 6320606; 72676F72 70207369 685421CD 4C01B821 CD09B400 0EBA1F0E ..o..Ç.el|.LeIThis program canno 000040
 00000000 00000024 0A00002E 65646F60 20534F44 206E6920 6E757220 65622074 t be run in DOS mode....$....... 000060
 000A0008 00000000 00020000 00000000 00058009 00CC6F45 000704FC 0505454E NE..•...EoaÅ.................... 000080
 00000000 00000000 00010003 00040000 00000583 00AC0098 008C0080 00400037 7.a......^...................... 0000A0
 02020E21 00000000 19840F00 198405A1 000F0F00 000F059F 506A0F00 506A005C \.jP..jP.......Å...........!... 0000C0
 0B541EB1 0B5409CE 03911EF1 03910994 02731EF1 0273096C 24300F21 229A0740 a.."|.0$l.s.þ.s.....þ...ö.T.Ý.T. 0000E0
 002F0010 00070001 00000046 44544553 50414408 00000004 00030005 00020005 .............DAPSEIDF........./. 000100
 4D454D03 534C4C41 43534F44 084E4957 4D500500 04430372 0189019C 010200F2 ·.....¿.r.C...PMWIN.DOSCALLS.MEM 000120
 086C6D64 034B434F 4C424545 52464D45 4D0C4B43 4F4C4243 4F4C4C41 4D454D00 .MEMALLOCBLOCK.MEMFREEBLOCK.dml. 000140
 46595245 55514C4D 44D04E58 54504F54 534C4D44 0A4E5854 54524154 534C4D44 DMLSTARTTXN.DMLSTOPTXN.DMLQUERYF 000160
 4C4D440C 4E4C5259 52455551 4C4D440B 444C4549 46544553 4C4D440B 444C4549 IELD.DMLSETFIELD.DMLQUERYRLN.DML 000180
 0B455441 4C45524E 554C4D44 0B455441 4C45524C 4D440931 4E4C5259 52455551 QUERYRLN1.DMLRELATE.DMLUNRELATE. 0001A0
 4F54534C 4D441244 494C4D44 59524555 514C4D44 0D545349 4C454552 464C4D44 DMLFREELIST.DMLQUERYDMLID.DMLSTO 0001C0
 4C4D440E 5443454A 424F5443 454C4553 4C4D440F 4B434142 4C4C4F52 4E585450 PTXNROLLBACK.DMLSELECTOBJECT.DML 0001E0

Dump of file SATURN:[PCCOMMON.DUMP.DLL]DAPSEIDF.TMP;1 on 18-APR-1990 10:42:54.27
File ID (609,9,0)   End of file block 85 / Allocated 88

Virtual block number 2 (00000002), 512 (0200) bytes

 47034445 54454C45 44544345 4A424F53 494C4D44 124C4C41 5443454C 45534544 DESELECTALL.DMLISOBJECTDELETED.G 000000
 4E544345 4A424F54 45474D41 44106D61 64034C4F 4F544C4C 494B4954 470B4954 TI.GTIKILLTOOL.dam.DAMGETOBJECTN 000020
 5945484D 41440F50 4948534E 4F495441 4C455245 54414552 434D4144 15454D41 AME.DAMCREATERELATIONSHIP.DAMKEY 000040
 4C45444D 41440C54 43454A42 4F50554B 4F4F4C4D 41440F59 52414D49 52505349 ISPRIMARY.DAMLOOKUPOBJECT.DAMDEL 000060
 53494D41 44005252 454D4144 4E4F4E59 414C5053 49444D41 44134A42 4F455445 ETEOBJ.DAMDISPLAYNONDAMERR.DAMIS 000080
 53505952 4555514D 41441252 52455441 4D524F46 4D41440C 524F5252 454D4144 DAMERROR.DAMFORMATERR.DAMQUERYPS 0000A0
 4259414C 50534944 54524F53 534C4E41 4416736C 6E616405 544E554F 43504948 HIPCOUNT.danls.DANLSSORTDISPLAYB 0000C0
 5453494C 4D464411 4D455449 44444154 53494C4D 46440E4D 46440345 4D414E59 YNAME.DFM.DFMLISTADDITEM.DFMLIST 0000E0
 4C4D4644 124D4554 49595245 55515453 494C4D46 44104D45 54494554 454C4544 DELETEITEM.DFMLISTQUERYITEM.DFML 000100
 4644154D 524F4653 5345434F 52504D46 440E4D45 54494543 414C5045 52545349 ISTREPLACEITEM.DFMPROCESSFORM.DF 000120
 4548424B 59524555 514D4644 0E415441 44524553 55444C45 49465952 4555514D MQUERYFIELDUSERDATA.DFMQUERYHBHE 000140
 440F4D54 48595245 55514D46 440B4A42 4F4C4D44 48595245 55514D46 440F5041 AP.DFMQUERYHDMLOBJ.DFMQUERYHTM.D 000160
 54415453 5446494B 53595245 55514D46 4413474C 44444E57 48595245 55514D46 FMQUERYHWNDDLG.DFMQUERYSHIFTSTAT 000180
 41544144 52455355 59524555 514D4644 104C4F4F 54595245 55514D46 440C5355 US.DFMQUERYTOOL.DFMQUERYUSERDATA 0001A0
 0F4E4645 534F4C43 5445534D 46440044 4C454946 52455453 49474552 4D464410 .DFMREGISTERFIELD.DFMSETCLOSEFN. 0001C0
 0F4E464C 4F52544E 4F435445 534D4644 0F4E4644 4E414D4D 4F435445 534D4644 DFMSETCOMMANDFN.DFMSETCONTROLFN. 0001E0

Dump of file SATURN:[PCCOMMON.DUMP.DLL]DAPSEIDF.TMP;1 on 18-APR-1990 10:42:54.27
File ID (609,9,0)   End of file block 85 / Allocated 88

Virtual block number 3 (00000003), 512 (0200) bytes

 4E464554 41474956 414E5445 534D4644 10454C54 49544D52 4F465445 534D4644 DFMSETFORMTITLE.DFMSETNAVIGATEFN 000000
 44134154 41445245 53555445 534D4644 0E4E4659 4649544F 4E544553 4D46440E .DFMSETNOTIFYFN.DFMSETUSERDATA.D 000020
 53494C53 5345434F 52504D46 44194D52 4F46474E 4F4C4554 41474956 414E4D46 FMNAVIGATELONGFORM.DFMPROCESSLIS 000040
 43544944 45545349 4C535345 434F5250 4D464419 4C4F5254 4E4F4354 49444554 TEDITCONTROL.DFMPROCESSLISTEDITC 000060
 44064445 5443454C 4553584F 42545349 4C595245 55514D46 4417444E 414D4D4F OMMAND.DFMQUERYLISTBOXSELECTED.D 000080
 54494E49 4A424F0D 4F464E49 52455355 54494E49 4D524F46 4144124D 524F4641 AFORM.DAFORMINITUSERINFO.OBJINIT 0000A0
 45544144 50554A42 4F0D5443 454C4553 45544144 50554A42 4F0F5443 454C4553 SELECT.OBJUPDATESELECT.OBJUPDATE 0000C0
 414A424F 094E5953 54494E49 4A424F0A 43534544 54494E49 4A424F0B 43534544 DESC.OBJINITDESC.OBJINITSYN.OBJA 0000E0
 494E494A 424F0A4E 7535045 524A424F 094E5953 4C45444A 424F094E 59534444 DDSYN.OBJDELSYN.OBJREPSYN.OBJINI 000100
 4B504552 4A424F09 ..574B4C 45444A42 4F094457 4B444441 4A424F09 44574B54 TKWD.OBJADDKWD.OBJDELKWD.OBJREPK 000120
 4C45444A 424F0A45 544F4E44 44414A42 4F0A4554 4F4E5449 4E494A42 4F0B4457 WD.OBJINITNOTE.OBJADDNOTE.OBJDEL 000140
 53030101 45544952 57534F44 084F4953 0345544F 4E504552 4A424F0A 45544F4E NOTE.OBJREPNOTE.SIO.DOSWRITE...S 000160
 46205445 53205049 48535245 4E545241 50204144 204D5020 322F534F 1F000031 1...OS/2 PM DA PARTNERSHIP-SET F 000180
 00000000 00000000 01504152 5453544F 4F424644 54455350 41441100 004D524F ORM...DAPSEIDFBOOTSTRAP......... 0001A0
 D4468906 46890000 880000FF 7C86C700 00CC46C7 D88EFFFF 881E5657 000084C8 à...WV.¡...ÁúFä..ú.|...¡...Fø.Få 0001C0
 800E76FF 1076FF00 0001F69A 5016E046 800E76FF 1076FFF8 4689FA46 890000B8 ¡...F°.F½.v..v..FÀ.P.-....v..v.. 0001E0
```

```
Dump of file SATURN:[PCCOMMON.DUMP.DLL]DAPSETDF.TMP;1 on 18-APR-1990 10:42:54.27
File ID (609,9,0)   End of file block 85 / Allocated 88

Virtual block number 4 (00000004), 512 (0200) bytes

 8D0E76FF 1076FF00 00FFFF9A 50160846 8D0E76FF 1076FF00 0002069A 5016E246 Fā.P......v..v..FÁ.P......v..v.. 000000
 FF0150E9 037401D0 7E83D046 890C4688 FF7E8689 0A468800 00FFFF9A 5016F446 F¶.P......F...~..F..FÁ.-Å.t.ÕP.. 000020
 04ACE9CC 46880006 E9037500 0030CC46 890000FF FF9A5016 E84680OE 76FF1076 v..v..FÒ.P......Fä=..u.Õ...FäÕ¯. 000040
 0030CC46 89FFFF36 749A5016 F8468DFF 7E86FF0E 76FF1076 FF00E5E9 FF7E8688 ..-.Õl..v..v..Ñ-..F%.P.t....Fä=. 000060
 42681ED8 76FFDA76 FF00ACE9 0375FA46 0BF84688 0480E9CC 46880006 E9037500 .u.Õ...FäÕ...F%.F"u.Õ¯..vÕ.vÁ.h8 000080
 0027E903 7401E87E 830455E9 CC468800 06E90375 000030CC 46890000 FFFF9A00 .......Fä=..u.Õ...FäÕU..~Õ.t.Õ'. 0000A0
 46880006 E9037500 0030CC46 89000001 529A016A F876FFFA 76FFD876 FFDA76FF .vÕ.vÁ.v".v½j..R....Fä=..u.Õ...F 0000C0
 CC468800 06E90375 000030CC 46890000 FFFF9AD8 76FFDA76 FF0040E9 0428E9CC äÕ(.Õä..vÕ.vÁ......Fä=..u.Õ...Fä 0000E0
 06E90375 000030CC 46890000 FFFF9A01 6AF876FF FA76FFD8 76FFDA76 FF0409E9 Õ...vÕ.vÁ.v".v½j.......Fä=..u.Õ. 000100
 CC468800 06E90375 000030CC 46890000 FFFF9AD8 76FFDA76 FF03E5E9 CC468800 ..FäÕl..vÕ.vÁ......Fä=..u.Õ...Fä 000120
 06E90375 00733D00 13E90376 FF13E903 7500813D 0043E900 46E90049 E903C9E9 Õè.Õl.ÕF.ÕC.=..u.Õ..v.Õ..=s.u.Õ. 000140
 7500CC3D FEEBE903 7500CA3D FEF3E903 7500873D FFDAE9FE FEE90375 00763DFF .=v.u.Õ±±ÕÕ.=..u.Õµ±=ò.u.ÕS±=ä.u 000160
 FF7EB6FF 0E76FF10 76FF031D E9FF7E86 B8FFB7E9 FEDBE903 75000D30 FEE3E903 .ÕD±=1.u.ÕU±Õñ...~.Õ...v..v..Ñ-. 000180
 0E76FF10 76FF0000 025D9A50 16E0468D 0E76FF10 76FF0000 02309A50 16EE468D .FY.P.=....v..v..FÁ.P.]....v..v. 0001A0
 FFF076FF 0676FF08 76FF0A76 FF0C76FF E276FFE4 76FF0000 02609A50 16E2468D .Fä.P.m....vÕ.vä.v..v..v..v..vP. 0001C0
 0002A49A 5016FC46 8DFF7E86 FF0E76FF 1076FF03 1FE90000 02809AE0 76FFEE76 vY.vÁ.....Õ...v..v..Ñ-..F=.P.É.. 0001E0

Dump of file SATURN:[PCCOMMON.DUMP.DLL]DAPSETDF.TMP;1 on 18-APR-1990 10:42:54.27
File ID (609,9,0)   End of file block 85 / Allocated 88

Virtual block number 5 (00000005), 512 (0200) bytes

 0002C49A 5016E046 8D0E76FF 1076FFF0 5689EE46 89025788 26078826 FC5EC400 .á^=&..&.W..FY.VP.v..v..FÁ.P.á.. 000000
 0876FF0A 76FF0C76 FFE276FF E476FF00 0002D49A 5016E246 8D0E76FF 1076FF00 ..v..v..Fā.P.å....vÕ.vä.v..v..v. 000020
 468DFF7E B6FF0E76 FF1076FF CC468900 00FFFF9A E076FFEE 76FFF076 FF0676FF .v..vP.vY.vÁ......Fä.v..v..Ñ-..F 000040
 468D0E76 FF1076FF F05689EE 46890257 8826078B 26FC5EC4 0000FFFF 9A5016FC =.P.....á^=&..&.W..FY.VP.v..v..F 000060
 5CE90374 01D07E83 0000FFFF 9A5016E2 468D0E76 FF1076FF 0000FFFF 9A5016E0 Å.P......v..v..Fā.P......~Å.t.Õ\ 000080
 46890000 FFFF9A00 6A006A00 6A006A01 65680477 FF26EE5E C4E276FF E476FF01 ..vÕ.vää^Y&.w.he.j.j.j.j.......F 0000A0
 46890000 FFFF9A50 16D44680 006A006A CE76FFEE 76FFF076 FFE276FF E476FFCE ö.vÕ.vä.vP.vY.vöj.j..Få.P......F 0000C0
 468D0476 FFD676FF D876FFDA 76FF021A E90000B8 0006E903 74D64608 D4468BCC ä.Få.Fæt.Õ..|..Õ...vÕ.vÁ.v=.vå.F 0000E0
 681EFF7C B6FFE276 FFE476FF 0019E903 75000030 FF7C8689 0000FFFF 9A501602 ø.P.......|.=..u.Õ...vÕ.vä.Ñ|..h 000100
 FFD676FF D876FFDA 76FF00C1 E9037409 D27E8301 DFE90000 88000003 A99A0052 R..`...|..ÕÕ..-ø.t.Õè..vÕ.vÁ.v=. 000120
 E276FFE4 76FF0019 E9037500 0030FF7C 86890000 03F79A50 16E6468D 046AD476 vå|..F|.P.%.....|.=..u.Õ...vÕ.vä 000140
 01F246C7 0008E903 7459E67E 800199E9 00008800 0004169A 0067681E FF7CB6FF .Ñ|..hg......|..Õ...~|Yt.Õ..úF·. 000160
 8E9A006A 006AF276 FF006A01 2568000F 68E276FF E476FF00 00F246C7 0005E900 .Õ..úF·...vÕ.vähÕ.h%.j..v·j.j... 000180
 30FF7C86 890000FF FF9A5016 80468D02 6AD476FF D676FFD8 76FFDA76 FF000004 ....vÕ.vÁ.v=.vå|..F..P.......|.= 0001A0
 012CE900 00880000 FFFF9A00 7C681EFF 7CB6FFE2 76FFE476 FF0019E9 03750000 ..u.Õ...vÕ.vä.Ñ|..h|.......|..Õ,. 0001C0
 0106E901 0FE9CC46 880000FF FF9A5016 80468D02 77FF26EE 5EC4E276 FFE476FF .vÕ.väá^Y&.w..F..P......FäÕ..Õ.. 0001E0

Dump of file SATURN:[PCCOMMON.DUMP.DLL]DAPSETDF.TMP;1 on 18-APR-1990 10:42:54.27
File ID (609,9,0)   End of file block 85 / Allocated 88

Virtual block number 6 (00000006), 512 (0200) bytes

 FF1076FF 0083E9D0 4688D046 890C4688 00000045 9A5016E2 468D0E76 FF1076FF .v..v..Fâ.P.E....F..FÁ.FÀÕ...v.. 000000
 B6FFE276 FFE476FF EC5689EA 4689DE56 880C4688 0000FFFF 9A50160C 468D0E76 v..FÉ.P......FÉ.V8.Fõ.V$.vÕ.vä.Ñ 000020
 015C8789 26CE4688 EA5EC4CE 46890000 04879A00 6A006A00 6A006A01 6568FF7E ~.he.j.j.j.j..ñ....Föá^õ.Fö&..\. 000040
 8926EA5E C4000002 FA9A006A 006ACE76 FF006A01 6A68FF7E B6FFE276 FFE476FF .vÕ.vä.Ñ-.hj.j..vöj.j..'...á^õ&. 000060
 30000BE9 000EE900 11E900B9 45719ACE 76FF0E76 FF1076FF 015A9789 26015887 .X.&..Z..v..v..vö.qE¿.Õ..Õ..Õ..= 000080
 0023E903 76FCD8F  03750085 300053E9 0056E900 59E9FFEF E9FF75E9 03750001 ..u.Õu.Õy.ÕY.ÕV.ÕS.=..u.ÕU=v.Õ#. 0000A0
 FCB6E903 7700813D FFD5E903 7300803D FCC6E903 7500733D FCCEE903 7500703D =p.u.Õö==s.u.Õó==..s.Õf.=..w.ÕÑ= 0000C0
 0375000D 30FCF2E9 0375000C 30FF00E9 0375000A 30FCABE9 03750087 30FFCAE9 Õò.=..u.Õ·==Õ.u.Õ..=É.u.Õ·==1.u. 0000E0
 FFD88E00 08881E56 57000002 C8000CCA C95F5E1F 0000E900 00B8FFA7 E9F051E9 ÕO»Õl.|..Õ...^_èò..à@..WV.|...Á. 000100
 0000FFFF 9A0676FF FF3086FF FF3286FF 0000044C 9A5016FF 30868D08 76FF0A76 v..v...0..P.L....Ñ2..ÑO..v...... 000120
 037523FF 348E8000 00FFFF9A 5016FF34 8680406A F876FFFA 76FFFA56 89F84689 .F%.V".v".v½jà..4..P......f4.#u. 000140
 FFCA8300 000004C4 83FFFF00 CE9A5016 FF35868D 00C1E900 008A0000 B80009E9 Õ..|..¤..Õè...5..P.ö....á.....ò. 000160
 FF3286FF 001CE903 74FFFF76 8E830026 E9037407 FF748E83 FF769689 FF748689 ..t...v../t..t.Õ&../v..t.Õ...Ñ2. 000180
 E9037406 FF748E83 0039E900 00FFFF9A 00806850 16FF7886 8D0676FF FF3086FF .ÑO..v...x..Ph.......Õ>../t..t.Õ 0001A0
 5016FF78 86800080 680676FF FF3086FF FF3286FF 001CE903 74FFFF76 8E830026 &../v..t.Õ...Ñ2..ÑO..v.......x..P 0001C0
 9A5016FC 468D0676 FF0876FF 0A76FF00 3CE90000 8A0000B8 0009E900 00FFFF9A .....Õ..|..¤..Õ<..v..v..v..F=.P. 0001E0
```

```
Dump of file SATURN:[PCCOMMON.DUMP.DLL]DAPSETDF.TMP;1 on 18-APR-1990 10:42:54.27
File ID (609,9,0)   End of file block 85 / Allocated 88

Virtual block number 7 (00000007), 512 (0200) bytes

8DFC76FF FE76FFFF 2E86FF00 00FFFF9A 5016FF2E 868D0876 FF0A76FF 04D40674 t.Å..v..v......P......Ñ...v±.v=. 000000
088E0558 881E5657 000062C8 0006CAC9 5F5E1F00 00E90000 FFFF9A50 16FF7886 .x..P.....Õ...^_èò..Àb..WV.¡(..Á 000020
F7E9EC46 880006E9 03750000 30EC4689 00000055 9A5016F0 468D0C76 FF0E76FF .v..v..fÞ.P.U....F$=..u.Õ...F$Õ% 000040
E9EC468B 0006E903 7500003D EC468900 0000659A 5016F846 8D0C76FF 0E76FF01 ..v..v..F½.P.e....F$=..u.Õ...F$Õ 000060
EC468800 06E90375 00003DEC 46890000 056C9A50 16F4468D 0C76FF0E 76FF01D6 ø..v..v..F¶.P.l....F$=..u.Õ...F$ 000080
169E468D 0A76FFF4 76FFF676 FF0011EA 46C7000A EE46C701 33E90A46 880185E9 Õç..F.Õ3.úF¥..úFõ...v-.v¶.v..F.. 0000A0
468D0A76 FFF476FF F676FF00 14EA46C7 000DEE46 C70154E9 00000726 9A486A50 PjK.&...ÕT.úF¥..úFõ...v-.v¶.v..F 0000C0
0A76FFF4 76FFF676 FF0017EA 46C70015 EE46C701 32E90000 07489A48 6A5C..9E ..PjK.H...Õ2.úF¥..úFõ...v-.v¶.v. 0000E0
468D0A76 FFF476FF F676FFF0 76FFF276 FF0110E9 000005F1 9A486A50 169E4C.D .F..PjK.Þ...Õ...v·.vÞ.v-.v¶.v..F 000100
0A76FFF4 76FFF676 FF0121E9 EC4688EC 468907D7 089F9A06 76FF0876 FF50169 ..P.v..v....■..F$.F$ÕI..v-.v¶.v. 000120
0676FF08 76FF106A F876FFFA 76FFF076 FFF276FF 000007BF 9A50169E 468D486A jK.F..P.¢....v·.vÞ.v°.v½j..v..v. 000140
F39A5016 9E468D4B 6A0A76FF F476FFF6 76FF00EA E9EC468B EC468900 00FFFF9A ......F$.F$Õõ..v-.v¶.v.jK.F..P.µ 000160
E9EC468B EC468908 0848229A 0676FF08 76FF5016 FC468D0C 76FF0E76 FF000007 ....v..v..F■.P.v..v.."H...F$.F$Õ 000180
0876FF0C 76FF0E76 FF000006 219A5016 9E468D4B 6A0A76FF F476FFF6 76FF00B6 Ñ..v-.v¶.v.jK.F..P.I....v..v..v. 0001A0
75008130 0043E900 46E90082 E9EC468B EC468906 4248229A 5016FC46 8D0676FF .v..F■.P."HB..F$.F$Õ..ÕF.ÕC.=..u 0001C0
7500873D FFDAE9FF 3EE90375 007630FE 88E90375 00733D00 13E90376 FF09E903 .Õ..v.Õ..=s.u.Õ¡±=v.u.Õ>.ÕÕ.=..u 0001E0

Dump of file SATURN:[PCCOMMON.DUMP.DLL]DAPSETDF.TMP;1 on 18-APR-1990 10:42:54.27
File ID (609,9,0)   End of file block 85 / Allocated 88

Virtual block number 8 (00000008), 512 (0200) bytes

FFFFB7E9 FEF3E903 7500003D FF5AE903 7500CC3D FF96E903 7500CA3D FEC7E903 .Õú±=ò.u.Õ..=a.u.ÕZ.=ï.u.Õµ±Õñ.. 000000
00FFFF9A 0676FF08 76FFF876 FFFA76FF EA76FF50 169E468D EE76FFF0 76FFF276 v·.vÞ.v¥.F..P.võ.v°.v½.v..v..... 000020
C8000ACA C95F5E1F 0000E9EC 46880006 E9EC468B 0006E903 7500003D EC468900 ..F$=..u.Õ...F$Õ...F$Õ...^_èò..À 000040
006A006A 0165680E 76FF1076 FF1276FF 0000FC46 C7D88E06 7CB81E56 57000004 ...WV.¡|..ÁúF■...v..v..v.hẽ.j.j. 000060
6A006AFE 76FF006A 016A680E 76FF1076 FF1276FF FE468900 0008E29A 006A006A j.j..ã....F±.v..v..v.hj.j..v±j.j 000080
37FF2602 77FF2606 5EC41476 FF1676FF 02578926 07892606 5EC40000 03DF9A00 ..Õ...á^.&..&.W..v..v.á^.&.w.&.7 0000A0
0012C800 12CAC95F 5E1F0000 E9FC468B FC468900 00038A9A 0A76FF0C 76FF026A j..v..v.......F■.F■Õ...^_èò..À.. 0000C0
CE9A5016 F6468D0E 76FF1076 FF0000F0 46C70000 EE46C708 8E08A788 1E565700 .WV.¡I..ÁúF¥..úFÞ...v..v..F-.P.ö 0000E0
519A5016 FA468D0E 76FF1076 FF000006 8C9A5016 F2468D0E 76FF1076 FF000006 ....v..v..F·.P......v..v..F°.P.Q 000100
8DFC76FF FE76FFF2 76FFF476 FF000006 AD9A5016 FC468D0E 76FF1076 FF000006 ....v..v..F■.P.Ù....v¶.v·.v±.v■. 000120
46880000 FFFF9A00 6AFA76FF 0010E903 7500003D F0468900 00FFFF9A 5016EE46 F¥.P......FÞ=..u.Õ...v°j.......F 000140
1076FF01 68E9F046 88000009 9A9A006A FA76FF00 10E90375 00EE7E83 0184E9F0 ÞÕ...-¥.u.Õ...v°j.......F±Õk..v. 000160
9A6E6A0E 76FF1076 FF09E21B 209A766A 0E76FF10 76FF0000 FFFF9A77 6A0E76FF .v.jw......v..v.jv.·.ã..v..v.jn. 000180
FF1076FF 00000A1E 9A006A00 6A006A00 6A016E68 736AF676 FFF876FF 0A2E103F ?....v½.v-jshn.j.j.j.j.......v.. 0001A0
0A459A00 6A006A00 6A006A01 6E68000A 68F676FF F876FF00 00FFFF9A 736A0E76 v.js......v½.v-hÕ.hn.j.j.j.j..£. 0001C0
006A006A 016E6800 DD68F676 FFF876FF 0A55404C 9A000A68 0E76FF10 76FF0000 ...v..v.hÕ..L@U..v½.v-hi.hn.j.j. 0001E0

Dump of file SATURN:[PCCOMMON.DUMP.DLL]DAPSETDF.TMP;1 on 18-APR-1990 10:42:54.27
File ID (609,9,0)   End of file block 85 / Allocated 88

Virtual block number 9 (00000009), 512 (0200) bytes

00E6680E 76FF1076 FF0A6336 AC9A000D 680E76FF 1076FF00 000A889A 006A006A j.j.......v..v.hï..¯6c..v..v.hl. 000000
6A016E68 008768F6 76FFF876 FF076C26 879A00E1 680E76FF 1076FF0A 7125659A .e%q..v..v.hÅ..ñ&l..v½.v-h..hn.j 000020
F676FFF8 76FF0000 FFFF9A00 87680E76 FF1076FF 00000AAF 9A006A00 6A006A00 .j.j.j..£....v..v.h........v½.v- 000040
00FFFF9A 0081680E 76FF1076 FF000008 C59A006A 006A006A 006A016E 68008168 h..hn.j.j.j.j..é....v..v.h...... 000060
FF1076FF 00000AE6 9A009068 0E76FF10 76FF0000 FFFF9A79 6A0E76FF 1076FF00 ..v..v.jy......v..v.h...l....v.. 000080
A0680E76 FF1076FF 00000802 9A009C68 0E76FF10 76FF0000 0AF49A00 9E680E76 v.h...¶....v..v.h........v..v.h. 0000A0
FFFF9A00 9F680E76 FF1076FF 0000081E 9A00A168 0E76FF10 76FF0000 08109A00 .......v..v.hÀ.......v..v.h..... 0000C0
00FD6686 C7D88E09 25B81E56 570002E8 C8000CCA C95F5E1F 0000E900 00880000 ..¡..Õ...^_èò..ÀÕ..WV.¡%..Àú.f». 0000E0
89FE6A86 890000B8 FF5A8689 FF5C8689 00008800 00FE7486 C70000FD 1886C700 .ú..»..ú.t±..¡....\...Z.¡....j±. 000100
16FE1686 8D0E76FF 1076FFFE 0C86890A 4688FD6C 8689FD6E 86890000 88FE6886 .h±¡....n»..l».F....±.v..v....±. 000120
12868D0E 76FF1076 FF000009 3F9A5016 FE18868D 0E76FF10 76FF0000 00359A50 P.5....v..v....±.P.?....v..v.... 000140
800E76FF 1076FF00 00096F9A 5016FF5E 868D0E76 FF1076FF 0000094F 9A5016FE ±.P.O....v..v...^..P.o....v..v.. 000160
93E9FE0C 8688FE6E 9689FE6C 8689FE10 9688FE0E 86880000 04689A50 16FE0E86 ..±.P.h......±...±..l±..n±...±Õ. 000180
76FFFE18 86FFFE1A 86FF0000 0C2F9A50 16FE7086 8DFE0CB6 FF0E76FF 1076FF0E ..v..v..Ñ.±..p±.P./....Ñ.±.Ñ.±.v 0001A0
76FF0E8F E90000FF FF9AFE16 86FFFE70 86FFFE72 86FF0676 FF0876FF 0A76FF0C ..v..v..v..Ñr±.Ñp±.Ñ.±.....Õ...v 0001C0
86890257 88260788 26FF629E C4000001 E69A5016 FF62868D FE0C86FF 0E76FF10 ..v..Ñ.±..b..P.l...á.b.&..&.W... 0001E0
```

```
Dump of file SATURN:[PCCOMMON.DUMP.DLL]DAPSETDF.TMP;1 on 18-APR-1990 10:42:54.27
File ID (609,9,0)   End of file block 85 / Allocated 88

Virtual block number 10 (0000000A), 512 (0200) bytes

 260039E9 03746347 3926FE6C 9EC41657 88261447 8B26FE6C 9EC4FE72 9689FE70 p±..r±é.l±&.G.&.W.é.l±&9Gct.Ö9.& 000000
 0C900056 9A5016FD 1A868D50 52006705 FE6E9688 FE6C8688 0030E903 74655739 9Wet.ÖO...l±..n±.g.RP...».P.V... 000020
 FE6E9688 FE6C8688 0018E908 C4830CAE 00109A50 16FD1A86 8D00F668 1E08C483 .é..h-....».P...Ü..é.Ö....l±..n± 000040
 7516470B 2614478B 26FE6C9E C408C483 05850056 9A5016FD 1A868D50 52006705 .g.RP...».P.V.ç..é.é.l±&.G.&.G.u 000060
 57392600 09E90374 14473926 FE6C9EC4 65578826 63478B26 FE6C9EC4 0004E903 .Öé.é.l±&.Gc&.Weé.l±&9G.t.Ö..&9W 000080
 6A006A00 6A006A01 60680477 FF26FE70 9EC4FE18 B6FFFE1A B6FF00B2 E9037516 .u.Öý..Ñ.±.Ñ.±é.p±&.w.h'.j.j.j.j 0000A0
 FF0079E9 037300FD 688E83FD 688EFF00 04E9FD68 8EFFFD68 86890000 00309A00 ..*.....h»..h»Ö....h».fh».s.Öy.. 0000C0
 00008E9A 006A006A FD6886FF 006A016A 680477FF 26FE709E C4FE1886 FFFE1A86 Ñ.±.Ñ.±é.p±&.w.hj.j..Ñh»j.j..... 0000E0
 39260037 E9037414 473926FE 0A968BFE 088688FE 6C9EC4FE 0A9689FE 08868900 ....±...±é.l±...±...±&9G.t.Ö7.&9 000100
 FD6886FF 006A0166 680477FF 26FE709E C4FE1886 FFFE1A86 FF002EE9 03741657 W.t.Ö...Ñ.±.Ñ.±é.p±&.w.hf.j..Ñh» 000120
 FE1886FF FE1AB6FF FF79E900 03E90000 00FA9A50 52001805 FE6E9688 FE6C8688 ..l±..n±...RP.*...Ö..Öy..Ñ.±.Ñ.± 000140
 890000FF FF9A6377 FF266577 FF26FE6C 9EC45016 FD1A868D FE70B6FF FE72B6FF .Ñr±.Ñp±...».Pé.l±&.we&.wc...... 000160
 00FE7486 C7006747 C626FE6C 9EC46347 89266547 89260000 B8FE6C9E C4FD6686 .f»é.l±j..&.Ge&.Gcé.l±&6Gg.ú.t±. 000180
 86880000 0EED9A00 6A006AFE 7486FF00 6A012568 00DF68FE 1886FFFE 1A86FF00 ..Ñ.±.Ñ.±hÖ.hX.j..Ñt±j.j..Ü..... 0001A0
 8B26FF62 9EC40000 10069A50 16FF6286 8DFE0C86 FF0E76FF 1076FF0C A8E9FD66 f»Ö'..v..v..Ñ.±..b..P.....é.b.&. 0001C0
 873926FE 6C9EC416 57882614 47B826FE 6C9EC4FE 729689FE 70868902 57882607 .&.W...p±..r±é.l±&.G.&.W.é.l±&9. 0001E0

Dump of file SATURN:[PCCOMMON.DUMP.DLL]DAPSETDF.TMP;1 on 18-APR-1990 10:42:54.27
File ID (609,9,0)   End of file block 85 / Allocated 88

Virtual block number 11 (0000000B), 512 (0200) bytes

 868D5052 008605FE 6E968BFE 6C868800 30E90374 00849739 26003AE9 03740.`2 ý.t.Ö:.&9.Ç.t.ÖO...l±..n±.Ñ.RP.. 000000
 1BE908C4 830E9700 109A5016 FD1A8680 0105681E 08C4830E 7900569A 5016FD.' .».P.V.y..é..h.....».P......é.Ö. 000020
 FE6C9EC4 08C4830C 7E00569A 5016FD1A 868D5052 008605FE 6E968BFE 6C868800 ...l±..n±.Ñ.RP...».P.V.-..é.é.l± 000040
 26FE6C9E C400B497 8B2600B2 878826FE 6C9EC400 D6E90375 16470B26 14478826 &.G.&.G.u.Ö».é.l±&..ý.&..Ç.é.l±& 000060
 77FF26FE 709EC4FE 1886FFFE 1AB6FF00 82E90375 16573926 0009E903 74144739 9G.t.Ö..&9W.u.Öý..Ñ.±.Ñ.±é.p±&.w 000080
 FD688EFF 0004E9FD 688EFFFD 68868900 000F289A 006A006A 006A006A 01606804 .h'.j.j.j.j..(.....h»..h»Ö....h» 0000A0
 FF006A01 6A680477 FF26FE70 9EC4FE18 B6FFFE1A B6FF0079 E9037300 FD688E83 .fh».s.Öy..Ñ.±.Ñ.±é.p±&.w.hj.j.. 0000C0
 FE0A9688 FE088688 FE6C9EC4 FE0A9689 FE088689 00000F79 9A006A00 6AFD6886 Ñh»j.j..y......±...±é.l±...±...± 0000E0
 FF26FE70 9EC4FE18 B6FFFE1A B6FF002E E9037416 57392600 37E90374 14473926 &9G.t.Ö7.&9W.t.Ö...Ñ.±.Ñ.±é.p±&. 000100
 0003E900 000FEA9A 50520018 05FE6E96 88FE6C86 88FD6886 FF006A01 66680477 w.hf.j..Ñh»..l±..n±...RP.ö...Ö.. 000120
 B7FF26FE 6C9EC450 16FD1A86 8DFE70B6 FFFE72B6 FFFE1886 FFFE1AB6 FFFF79E9 Öy..Ñ.±.Ñ.±.Ñr±.Ñp±...».Pé.l±&.ñ 000140
 82878926 00848789 26000088 FE6C9EC4 FD668689 0000FFFF 9A0082B7 FF2600B4 Ç.&.ñý........f»é.l±j..&..Ç.&..ý 000160
 6A012568 000F68FE 1886FFFE 1AB6FF00 00FE7486 C7000086 87C626FE 6C9EC400 .é.l±&ó.Ñ..ú.t±...Ñ.±.Ñ.±hÖ.hX.j 000180
 8DFE0CB6 FF0E76FF 1076FF0A B8E9FD66 86880000 10559A00 6A006AFE 7486FF00 ..Ñt±j.j..U.....f»Ö¡..v..v..Ñ.±. 0001A0
 1AB6FFFE 729689FE 70868902 57882607 8B26FF62 9EC40000 08F29A50 16FF6286 .b..P.·...é.b.&..&.W...p±..r±.Ñ. 0001C0
 FE1AB6FF 0000FE74 86C7FD66 86890000 FFFF9AFE 70B6FFFE 72B6FFFE 1886FFFE ±.Ñ.±.Ñr±.Ñp±.......f»ü.t±...Ñ.± 0001E0

Dump of file SATURN:[PCCOMMON.DUMP.DLL]DAPSETDF.TMP;1 on 18-APR-1990 10:42:54.27
File ID (609,9,0)   End of file block 85 / Allocated 88

Virtual block number 12 (0000000C), 512 (0200) bytes

 0A4DE9FD 66868800 0009F89A 006A006A FE74B6FF 006A0125 68000F68 FE18B6FF .Ñ.±hÖ.hX.j..Ñt±j.j..%.....f»ÖM. 000000
 FF001AE9 03750000 30109148 229A5016 FE68868D 5016FF5A 868D0E76 FF1076FF .v..v...Z..P..h±.P."M..=..u.Ö... 000020
 6A860BFE 6886880A 14E90000 B810FB41 889A015C B7FF26FE 6C9EC40E 76FF1076 v..v.é.l±&.ñ\...A«.¡..Ö....h±..j 000040
 FEC2868D 012A681E 08C48310 C500569A 5016FEC2 86800114 681E005D E90375FE ±u.Ö)..h....ó±.P.V.é..é..h*...ó± 000060
 0151681E 5016FEC2 8680FE18 B6FFFE1A B6FF016A 006A08C4 830E6700 109A5016 .P...g..é.j.j..Ñ.±.Ñ.±..ó±.P.hQ. 000080
 00008809 D541889A 015CB7FF 26FE6C9E C40E76FF 1076FF00 00FFFF9A 206A006A j.j ......v..v.é.l±&.ñ\...Af.¡.. 0000A0
 FFFE14B6 FF000007 889A5016 FD70868D 4B6A00CC 68FE1BB6 FFFE1AB6 FF09AAE9 Ö¨..Ñ.±.Ñ.±hä.jK..p».P......Ñ.±. 0000C0
 7500003D FD668689 00000909 9A5016FD 8C868D02 6AFF5EB6 FFFF60B6 FFFE12B6 Ñ.±.Ñ'..Ñ^.j...¥».P.......f»=..u 0000E0
 FFFE1AB6 FF016A00 6A118850 069A015E 681E5016 FEC2868D FD66B6FF 004CE903 .ÖL..Ñf»..ó±.P.h^...P..j.j..Ñ.±. 000100
 FE6C9EC4 0E76FF10 76FF0000 110B9A20 6A006A01 73681E50 16FEC286 8DFE1886 Ñ.±..ó±.P.hs.j.j .Ü....v..v.é.l± 000120
 0000E29A 0180681E FE1286FF FE14B6FF 0910E900 008811BE 41889A01 5CB7FF26 &.ñ\...A/.¡..Ö...Ñ.±.Ñ.±.h...à.. 000140
 11F15006 9A019668 1E5016FE C2868DFD 66B6FF00 4CE90375 00003DFD 66868900 ...f»=..u.ÖL..Ñf»..ó±.P.h....Pþ. 000160
 FF000012 949A206A 006A01AB 681E5016 FEC28680 FE18B6FF FE1AB6FF 016A006A j.j..Ñ.±.Ñ.±..ó±.P.h¨.j.j ...... 000180
 12B6FFFE 14B6FF08 B4E90000 B8126441 889A015C B7FF26FE 6C9EC40E 76FF1076 v..v.é.l±&.ñ\...Ad.¡..ÖÇ..Ñ.±.Ñ. 0001A0
 5016FE68 868D5016 FF5E8680 FF5AB6FF FF5CB6FF 37FF2602 77FF26FE 0E9EC4FE ±é..±&.w.&.7.Ñ\..ÑZ...^..P..h±.P 0001C0
 00003DFD 66868900 00FFFF9A 006A5016 FD6C868D 5016FD70 868D5016 FD8C868D ..¥».P..p».P..l».Pj........f»=.. 0001E0
```

```
Dump of file SATURN:[PCCOMMON.DUMP.DLL]DAPSETDF.TMP;1 on 18-APR-1990 10:42:54.27
File ID (609,9,0)   End of file block 85 / Allocated 88

Virtual block number 13 (0000000D), 512 (0200) bytes

 5CB7FF26 FE6C9EC4 0E76FF10 76FF0000 13CF9AFE 12B6FFFE 14B6FF00 59E90375 u.ÕY..Ñ.±.Ñ.±.ü....v..v.á.l±&.ñ\ 000000
 1AB6FF01 6A006A12 .850069A 01B8681E 5016FEC2 868DF066 B6FF1277 41889A01 ...Aw..Ñf»..ò±.P.hj...PÄ.j.j..Ñ. 000020
 B6FF080F E90000B8 000012F5 9A206A00 6A01CD68 1E5016FE C28680FE 18B6FFFE ±.Ñ.±..ò±.P.hè.j.j .%...j..Õ...Ñ 000040
 3DFD6686 89000014 D79A5016 FE1C8680 026AFF5A B6FFFF5C B6FFFE12 B6FFFE14 .±.Ñ.±.Ñ\..ÑZ.j....±.P.■.....f»= 000060
 B6FF016A 006A130B 50C49A01 DA681E50 16FEC286 80FD6686 FF0059E9 03750000 ..u.ÕY..Ñf»..ò±.P.hÖ...P..j.j..Ñ 000080
 C40E76FF 1076FF00 00144F9A 206A006A 01EF681E 5016FEC2 8680FE18 B6FFFE1A .±.Ñ.±..ò±.P.hÿ.j.j .O....v..v.á 0000A0
 078DE900 00B80000 13FC9AFE 12B6FFFE 14B6FF13 BB41889A 015CB7FF 26FE6C9E .l±&.ñ\...Aj..Ñ.±.Ñ.±.-...j..Õ.. 0000C0
 B6FF10C4 83142F00 DC9A5016 FF688680 01FC681E 5016FE1C 86805016 FD708680 ..p».P...±.P.h•...h..P.É./..á..Ñ 0000E0
 FFFE1AB6 FF000013 729A5016 FF688680 FF6A006A 01616800 DA68FE18 B6FFFE1A .±.Ñ.±hÖ.ha.j.j...h..P.r....Ñ.±. 000100
 B6FFFD6A 8EFFFD6A 86890000 139B9A00 6A006A00 6A006A01 6068000A 68FE18B6 Ñ.±hÖ.h'.j.j.j.j........j»..j».Ñ 000120
 FF00000D 029AFD6C B6FFFD6E B6FFFD6A B6FF006A 01696800 DA68FE18 B6FFFE1A .±.Ñ.±hÖ.hi.j..Ñj».Ñn».Ñl»...... 000140
 003DFD66 868913E5 4AB79AFE 6886FFFE 6AB6FFFF 5AB6FFFF 5CB6FF0E 76FF1076 v..v..Ñ\..ÑZ..Ñj±.Ñh±.ñJ1...f»=. 000160
 B7FF26FE 6C9EC40E 76FF1076 FF0000FF FF9AFE12 B6FFFE14 B6FF0027 E9037500 .u.Õ'..Ñ.±.Ñ.±......v..v.á.l±&.ñ 000180
 0E76FF10 76FF0000 016E9AFE 12B6FFFE 14B6FF06 C0E90000 B8140741 889A015C \...A..j..Õá..Ñ.±.Ñ.±.n....v..v. 0001A0
 E9037401 5AB70B26 015B87B8 26FE6C9E C4069EE9 00008814 6541889A FD6AB6FF .Ñj»..Aé.j..Õ..á.l±&..X.&..Z.t.Õ 0001C0
 FE18B6FF FE1AB6FF 016A006A 08C48310 B300569A 5016FEC2 86800202 681E004B K..h....ò±.P.V.*..á.j.j..Ñ.±.Ñ.± 0001E0

Dump of file SATURN:[PCCOMMON.DUMP.DLL]DAPSETDF.TMP;1 on 18-APR-1990 10:42:54.27
File ID (609,9,0)   End of file block 85 / Allocated 88

Virtual block number 14 (0000000E), 512 (0200) bytes

 87FF26FE 6C9EC40E 76FF1076 FF000010 E59A206A 006A021E 681E5016 FEC28680 ..ò±.P.h..j.j .l....v..v.á.l±&.ñ 000000
 9A5016FE 68868D50 16FF5AB6 800E76FF 1076FF06 40E90000 88148241 889A015C \...A..j..Õa..v..v...Z..P..h±.P. 000020
 10754188 9A015CB7 FF26FE6C 9EC40E76 FF1076FF 001AE903 7500003D 149E4822 "H..=..u.Õ...v..v.á.l±&.ñ\...Au. 000040
 B6FF0000 11179A50 16FE7686 8D4B6A00 CA68FE18 B6FFFE1A B6FF0607 E90000B8 j..Õ...Ñ.±.Ñ.±hò.jK..v±.P......Ñ 000060
 3DFD6686 89000011 349A5016 FE1C8680 026AFF5A B6FFFF5C B6FFFE12 B6FFFE14 .±.Ñ.±.Ñ\..ÑZ.j....±.P.4.....f»= 000080
 B6FF016A 006A152B 50069A02 2B681E50 16FEC286 80FD6686 FF004CE9 03750000 ..u.ÕL..Ñf»..ò±.P.h+...P+.j.j..Ñ 0000A0
 C40E76FF 1076FF00 0011729A 206A006A 0240681E 5016FEC2 8680FE18 B6FFFE1A .±.Ñ.±..ò±.P.ha.j.j .r....v..v.á 0000C0
 9A5016FE 76868050 16FE1C86 80057AE9 0000B811 5541889A 015CB7FF 26FE6C9E .l±&.ñ\...AU.j..Õz....±.P..V±.P. 0000E0
 5016FE1C 868000CA 68FE18B6 FFFE1AB6 FF0085E9 03750000 3D08C483 1572008C ..r..á.*..u.Õ...Ñ.±.Ñ.±hò....±.P 000100
 16FEC286 80025E68 1E08C483 15840056 9A5016FE C2868002 40681E00 0004339A .3....hM...ò±.P.V....á..h^...ò±. 000120
 FF016A00 6A08C483 13390010 9A5016FE C2868002 70681E08 C4831596 00109A50 P......á..h)...ò±.P...9..á.j.j.. 000140
 0E76FF10 76FF0000 161F9A20 6A006A02 8C681E50 16FEC286 80FE18B6 FFFE1AB6 Ñ.±.Ñ.±..ò±.P.h..j.j ......v..v. 000160
 0299681E FE12B6FF FE14B6FF 04D9E900 00B81602 41889A01 5CB7FF26 FE6C9EC4 á.l±&.ñ\...A..j..Õ1..Ñ.±.Ñ.±.h.. 000180
 9A02B468 1E5016FE C28680F0 66B6FF00 4CE90375 00003DF0 66868900 0018L"?A .D.....f»=..u.ÕL..Ñf»..ò±.P.hÇ.. 0001A0
 FA9A206A 006A02C9 681E5016 FEC28680 FE18B6FF FE1AB6FF 016A006A 163550.  .PS.j.j..Ñ.±.Ñ.±..ò±.P.hè.j.j .* 0001C0
 1076FF04 70E90000 88165641 889A015C B7FF26FE 6C9EC40E 76FF1076 FF000016 ....v..v.á.l±&.ñ\...AV.j..Õp..v. 0001E0

Dump of fi'  SATURN:[PCCOMMON.DUMP.DLL]DAPSETDF.TMP;1 on 18-APR-1990 10:42:54.27
File ID (6..,9,0)   End of file block 85 / Allocated 88

Virtual block number 15 (0000000F), 512 (0200) bytes

 7500003D FD668689 16764AB7 9AFE6886 FFFE6AB6 FFFF5AB6 FFFF5CB6 FF0E76FF .v..Ñ\..ÑZ..Ñj±.Ñh±.ñJv...f»=..u 000000
 FE12B6FF FE14B6FF 16D04188 9A015CB7 FF26FE6C 9EC40E76 FF1076FF 0027E903 .Õ'..v..v.á.l±&.ñ\...Aì..Ñ.±.Ñ.± 000020
 089A5016 FD708680 4B6A00CC 68FE18B6 FFFE1AB6 FF0422E9 0000B800 0017079A .....j..Õ"..Ñ.±.Ñ.±hä.jK..p».P.Ü 000040
 0000FFFF 9A5016FD 70868002 6AFE6886 FFFE6AB6 FFFE12B6 FFFE14B6 FF000017 ....Ñ.±.Ñ.±.Ñj±.Ñh±j...p».P..... 000060
 6A171D50 069A0206 681E5016 FEC28680 FD66B6FF 0059E903 7500003D FD668689 ..f»=..u.ÕY..Ñf»..ò±.P.h#...P..j 000080
 B6FF0000 18B89A20 6A006A02 EB681E50 16FEC286 8DFE18B6 FFFE1AB6 FF016A00 .j..Ñ.±.Ñ.±..ò±.P.h$.j.j .j....Ñ 0000A0
 B8178641 889A015C B7FF26FE 6C9EC40E 76FF1076 FF000012 4E9AFE12 B6FFFE14 .±.Ñ.±.N....v..v.á.l±&.ñ\...A..j 0000C0
 681E5016 FE1C8680 5016FD70 868D0000 13169AFE 12B6FFFE 14B6FF03 88E90000 ..Õ...Ñ.±.Ñ.±.......p».P...±.P.h 0000E0
 9EC40166 68000A68 FE18B6FF FE1AB6FF 10C48318 10000C9A 5016FF68 868002FB ½...h..P.É....á..Ñ.±.Ñ.±hÖ.hf.á. 000100
 FF26FE6C 9EC40E76 FF1076FF 00001838 9A5016FF 68868001 5CB7FF26 006AFE6C l±j.&.ñ\...h..P.B....v..v.á.l±&. 000120
 26E90375 015A870B 26015B87 8B26FE6C 9EC4031F E90000B8 18CE4188 9A015CB7 ñ\...Aö.j..Õ..á.l±&..X.&..Z.u.Õ& 000140
 FD6C8689 015A978B 26015B87 8B26FE6C 9EC4FD68 8689015C 878B26FE 6C9EC400 .á.l±&..\...h»á.l±&..X.&..Z...l» 000160
 FF000017 F39A5016 FD708680 4B6A00CC 68FE18B6 FFFE1AB6 FF00ADE9 FD6E9689 ..n»ÕU..Ñ.±.Ñ.±hä.jK..p».P.µ.... 000180
 1C868D50 16FD7086 8D000014 BA9A5016 FE1C8680 4B6A00CA 68FE18B6 FFFE1AB6 Ñ.±.Ñ.±hò.jK...±.P.o.....p».P... 0001A0
 000A68FE 18B6FFFE 1AB6FF10 C4831898 000C9A50 16FF6886 8D02FE68 1E5016FE ±.P.h±...h..P.É....á..Ñ.±.Ñ.±hÖ. 0001C0
 FD688E83 00001868 9A5016FF 68868D50 5200CA83 000400C0 2BFD6896 8B016868 hk...h»+å....ò.RP..h..P.h..../h» 0001E0
```

Dump of file SATURN:[PCCOMMON.DUMP.DLL]DAPSETDF.TMP;1 on 18-APR-1990 10:42:54.27
File ID (609,9,0)   End of file block 85 / Allocated 88

Virtual block number 16 (00000010), 512 (0200) bytes

```
FF006A01 6A68000A 68FE1886 FFFE1AB6 FF0025E9 FFFFFD68 86C70009 E90374FF .t.Ô..ú.h»..ÔX..Ñ.±.Ñ.±hÖ.hj.j.. 000000
0AE90375 FD6E8608 FD6C868B FD6E9689 FD6C8689 00001357 9A006A00 6AFD6886 Ñh»j.j..W.....l»..n»..l»..n»u.Ô. 000020
6A006A08 C4831542 00569A50 16FEC286 8D030468 1E004BE9 0374FFFD 688E8300 ../h».t.ÔK..h....ô±.P.V.B..á.j.j 000040
FF1076FF 0000192* 9A206A00 6A031068 1E5016FE C28680FE 1886FFFE 1AB6FF01 ..Ñ.±.Ñ.±..ô±.P.h..j.j .l....v.. 000060
681EFE12 B6FFFE14 6FF01D7 E90000B8 19044188 9A015CB7 FF26FE6C 9EC40E76 v.á.l±&.ñ\...A..|..Ôm..Ñ.±.Ñ.±.h 000080
33681E50 16FEC286 8DFD6686 FF004CE9 03750000 3DFD6686 89000011 9D9A031D .........f»=..u.ÔL..Ñf»..ô±.P.h3 0000A0
206A006A 0348681E 5016FEC2 8680FE18 B6FFFE1A B6FF016A 006A1937 50069A03 ...P7.j.j..Ñ.±.Ñ.±..ô±.P.hH.j.j 0000C0
FF016EE9 00008814 F841889A 015CB7FF 26FE6C9E C40E76FF 1076FF00 0015159A ......v..v.á.l±&.ñ\...A½.|..Ôn.. 0000E0
0059E903 7500003D FD668689 0000FFFF 9AFD6CB6 FFFD6EB6 FFFE1286 FFFE14B6 Ñ.±.Ñ.±.Ñn».Ñl».......f»=..u.ÔY. 000100
19815006 9A035568 1E5016FE C28680FD 6686FF00 0016819A FE12B6FF FE14B6FF .Ñ.±.Ñ.±......Ñf»..ô±.P.hU...PY. 000120
FF000015 869A206A 006A036A 681E5016 FEC28680 FE1886FF FE1AB6FF 016A006A j.j..Ñ.±.Ñ.±..ô±.P.hj.j.j .Ñ.... 000140
1286FFFE 14B6FF00 F4E90000 8815CC41 889A015C 87FF26FE 6C9EC40E 76FF1076 v..v.á.l±&.ñ\...Aæ.|..Ô¶..Ñ.±.Ñ. 000160
FFFE12B6 FFFE14B6 FF000009 5F9A5016 FF66868D 0E76FF10 76FF0000 172E9AFE ±......v..v...f..P._....Ñ.±.Ñ.±. 000180
B6FF0012 E9037500 003DFD66 86890000 09859A50 16FD1886 8DFF5E86 FFFF60B6 Ñ'..Ñ^....».P.......f»=..u.Ô...Ñ 0001A0
006AFF66 B6FF0012 E9037500 FD188E83 0090E9FD 66868800 001A219A 006AFF66 f.j..l.....f»Ô...f.».u.Ô...Ñf.j. 0001C0
FD6886FF 006A0163 6800DA68 FE1886FF FE1AB6FF 0081E9FD 66868800 0009839A .*.....f»Ô...Ñ.±.Ñ.±hÖ.hc.j..Ñh» 0001E0
```

Dump of file SATURN:[PCCOMMON.DUMP.DLL]DAPSETDF.TMP;1 on 18-APR-1990 10:42:54.27
File ID (609,9,0) . End of file block 85 / Allocated 88

Virtual block number 17 (00000011), 512 (0200) bytes

```
C726FE6C 9EC40158 87d92601 5A878926 000088FE 6C9EC400 0017709A 006A006A j.j..p...á.l±|..&..Z.&..X.á.l±&ú 000000
03FFECE9 0376000F 3D012C2D 0033E900 3CE90000 880042E9 000088FF FF015C87 .\...|..ÔB.|..Ô<.Ô3.-..*..v.Ô$.. 000020
8E140F10 600BE108 E108E108 E108E108 E108E11A 680BE108 E11A87A7 FF2E93C0 à...Ï..Ã.Ã.k.Ã.Ã.Ã.Ã.Ã.Ã.Ã.'.... 000040
D88E0B37 881E5657 00000CC8 000CCAC9 5F5E1F00 00E90000 880FF50E 050C1E17 .....¥.|..Ô...^_èò..à...WV.|7..À 000060
46800A76 FF0C76FF 00000893 9A5016F8 46800A76 FF0C76FF 000107C7 26065EC4 á^.&ú....v..v..F½.P......v..v..F 000080
46800A76 FF0C76FF 000008C6 9A5016F4 46800A76 FF0C76FF 00000882 9A5016FC =.P......v..v..F¶.P.ó....v..v..F 0000A0
00001A05 9A006AFE 76FF0000 FFFF9AF4 76FFF676 FFFC76FF 00001903 9A5016FE ±.P.Æ....v•.v~.v¶......v±j...... 0000C0
76FF0000 F246C7D8 8E1ABC88 1E565700 005EC800 08CAC95F 5E1F0000 E90000B8 |..Ô...^_èò..à^..WV.|¥..ÀúF·...v 0000E0
76FF0000 1AD49A50 16F84680 0876FF0A 76FF0000 08859A50 16FC4680 0876FF0A ..v..F•.P̄.ç....v..v..F½.P.å....v 000100
16A24680 106AFC76 FFFE76FF F476FFF6 76FF0000 08A49A50 16F44680 0876FF0A ..v..F¶.P.Ê....v~.v¶.v±.v•j..FÀ. 000120
A476FFF4 76FFF676 FF0042E9 F2468800 06E90375 00003DF2 46890000 07A19A50 P.À....F·=..u.Ô...F·ÔB..v~.v¶.vÊ 000140
0019E9F2 46880006 E9037500 003DF246 89000012 879A5016 A6468002 6AA276FF .vÂj..Fl.P.ñ....F·=..u.Ô...F·Ô.. 000160
0006CAC9 5F5E1F00 00E90000 B8000015 619A5016 A6468006 76FFF876 FFFA76FF .v*.v½.v..Fl.P.ø...|..Ô...^_èò.. 000180
8D1476FF 1676FF00 0107C726 0E5EC400 00A646C7 D88E1835 881E5657 0000AAC8 à`..WV.|5..ÀúFl..á^.&ú....v¯.v.. 0001A0
8D1476FF 1676FF00 00185A9A 5016AC46 8D1476FF 1676FF00 00184A9A 5016FC46 F•.P.J....v..v..F¯.P.Z....v..v.. 0001C0
18829A50 16FF5686 8D106AFC 76FFFE76 FFA876FF AA76FF00 0018669A 5016AB46 F`.P.j....v`.v`.v±.v•j...V..P... 0001E0
```

Dump of file SATURN:[PCCOMMON.DUMP.DLL]DAPSETDF.TMP;1 on 18-APR-1990 10:42:54.27
File ID (609,9,0)   End of file block 85 / Allocated 88

Virtual block number 18 (00000012), 512 (0200) bytes

```
C41CAC50 069A0377 681E0A76 FF0C76FF A676FF00 29E90375 000030A6 46890000 ...Fl=..u.Ô)..vl.v..v..hw...P¯.á 000000
FF5886FF A876FFAA 76FF00C2 E90000B8 07892612 4688065E C4000207 C7260E5E ^.&ú...á^..F.&..|..Ôõ..v`.v`.ÑX. 000020
FFA676FF 0029E903 7500003D A6468900 0018A89A 5016FF5A 868D026A FF5686FF .ÑV.j...Z..P.`....Fl=..u.Ô)..vl. 000040
88078926 12468806 5EC40002 07C7260E 5EC4197E 50069A03 89681E0A 76FF0C76 v..v..h....P-.á^.&ú...á^..F.&..| 000060
5016FF5A 868D0000 169F9A50 16804680 4B6A1276 FFAC76FF AE76FF00 73E90000 ..Ôs..vÜ.v¯.v.jK.F¯.P.......Z..P 000080
065EC400 0207C726 0E5EC400 30E90375 00003D08 C4831D27 008C9A50 16804680 .F¯.P...'..á.=..u.Ô=.á^.&ú...á^. 0000A0
76FF0398 681E0000 18CF9A50 16FF5A86 8D1276FF AC76FFAE 76FF0789 2612'488 .F.&...vÜ.v¯.v...Z..P.ü....h...v 0000C0
C80012CA C95F5E1F 0000E900 00880006 E90000B8 08C48317 4800569A 0A76FF ? ..v..V.K..á.|..Ô..|..Ô...^_èò..à 0000E0
00001C15 9A5016F4 46800876 FF0A76FF 0000EA46 C7D88E1B E8881E56 5700006. b..WV.|Ô..ÀúFõ...v..v..F¶.P̄..... 000100
00001C25 9A5016EC 46800876 FF0A76FF 00001C05 9A5016FC 46800876 FF0A76FF .v..v..F=.P......v..v..F£.P.X... 000120
8D9A5016 9E468D02 6AFC76FF FE76FFEC 76FFEE76 FF001EE9 0375FE46 0BFC468B .F•.F±u.Ô...vŸ.vš.v±.v•j..F..P.. 000140
76FF0061 E9EA4688 0006E903 7500EA7E 830070E9 00008800 06E9EA46 8900001C ....Fõõ..|..Ôp..~õ.u.Ô...FõÕm..v 000160
50169E46 8D03AC68 1E0876FF 0A76FF00 001D169A 50169E46 8D0676FF F476FFF6 -.v¶.v..F..P......v..v..h¯..F..P 000180
5689F846 89F2568B F0468800 001AF49A 5016F046 8D0876FF 0A76FF00 00FFFF9A ......v..v..FÞ.P.¶....FÞ.V·.F½.V 0001A0
1F0000E9 00008808 C4831CE8 00569A50 52010105 FA5688F8 46885016 9E4680FA *.F..P.F½.V*...RP.V.Ô..á.|..Ô... 0001C0
FF000107 C7260E5E C40000EA 46C7D88E 1D47B81E 56570000 AEC80006 CAC95F5E ^_èò..àÜ..WV.|G..ÀúFõ..á^.&ú.... 0001E0
```

Dump of file SATURN:[PCCOMMON.DUMP.DLL]DAPSETDF.TMP;1 on 18-APR-1990 10:42:54.27
File ID (609,9,0)   End of file block 85 / Allocated 88

Virtual block number 19 (00000013), 512 (0200) bytes

FF00001D 7C9A5016 EC468D14 76FF1676 FF00001D 6C9A5016 FC468D14 76FF1676 v..v..F•.P.l....v..v..F$.P.|.... 000000
5016FF52 86804B6A 1276FFF4 76FFF676 FF00001D 5C9A5016 F4468D14 76FF1676 v..v..F¶.P.\....v-.v¶.v.jK..R..P 000020
FF0029E9 03750000 3DEA4689 000015E1 9A038C68 1EEC76FF EE76FF00 001CD69A .•....vŸ.v$.h¥..Ã....Fö=..u.Õ).. 000040
26124688 065EC400 0207C726 0E5EC41E FB50069A 03CA681E 0A76FF0C 76FFEA76 vð.v..v..hò...P«.á^.&ú...á^..F.& 000060
00001D9F 9A50169E 4680026A FC76FFFE 76FFEC76 FFEE76FF 011DE9EA 46880789 ...FõÕ...vŸ.v$.vz.v•j..F..P..... 000080
0E5EC41F 6650069A 03E0681E 0A76FF0C 76FFEA76 FF0034E9 03750000 3DEA4689 .Fö=..u.Õ4..vð.v..v..hÁ...Pf.á^. 0000A0
FF00C6E9 EA468800 001F809A EC76FFEE 76FF0789 26124688 065EC400 0207C726 &ú...á^..F.&...vŸ.v$.....FõÕó.. 0000C0
03750000 3DEA4689 0000168C 9A5016FF 52868002 6AFC76FF FE76FFEC 76FFEE76 vŸ.v$.vz.v•j...R..P.¥....Fö=..u. 0000E0
1E0A76FF 0C76FFEA 76FF0000 1DCD9A50 169E468D 1276FFF4 76FFF676 FF0047E9 ÕG..v-.v¶.v..F..P.ë....vð.v..v.. 000100
9AEC76FF EE76FF07 89261246 88065EC4 000207C7 260E5EC4 1C5D5006 9A03F668 h-...P].á^.&ú...á^..F.&...vŸ.v$. 000120
5016F046 801476FF 1676FF00 0019C29A EC76FFEE 76FF005B E9EA4688 00001969 i....FõÕ[..vŸ.v$.ô....v..v..Fþ.P 000140
010105FA 568BF846 885016FF 52868DFA 5689F846 89F25688 F0468800 001DF19A .þ....Fþ.V·.F½.V°..R..P.F½.V°... 000160
8800001D E19A5016 FF528680 040C681E 1476FF16 76FF08C4 831E1400 569A5052 RP.V....ó..v..v..h....R..P.Ä...| 000180
1676FF00 00A246C7 D5BE1E2E 881E5657 00005EC8 0012CAC9 5F5E1F00 00E90000 ..Õ...^ èò..à^..WV.|...ÁúFÅ...v. 0001A0
1676FF00 001E5B9A 50168846 801476FF 1676FF00 001E6B9A 5016C446 801476FF .v..Fó.P̄.k....v..v..F|.P.[....v. 0001C0
76FF0789 26124688 065EC400 0107C726 0E5EC400 001E4B9A 5016F846 801476FF .v..F½.P.K...á^.&ú...á^..F.&...v 0001E0

Dump of file SATURN:[PCCOMMON.DUMP.DLL]DAPSETDF.TMP;1 on 18-APR-1990 10:42:54.27
File ID (609,9,0)   End of file block 85 / Allocated 88

Virtual block number 20 (00000014), 512 (0200) bytes

1476FF16 76FFCA56 89C84689 C25688C0 46880000 1FA19A50 16C04680 1476FF16 ..v..Fà.P.À....Fà.Vð.Fà.Vò.v..v. 000000
6AF876FF FA76FF88 76FF8A76 FF0288E9 12468820 A641889A 015CB7FF 26C85EC4 á^à&.ñ\...Al .F.Õ...vo.v|.v°.v½j 000020
1E0A76FF 0C76FFA2 76FF0029 E9037500 003DA246 89000021 5C9A5016 FC468D03 ..F•.P.\l...FÅ=..u.Õ)..vÅ.v..v.. 000040
FF03B3E9 0000B807 89261246 88065EC4 000207C7 260E5EC4 21355006 9A041C68 h....P5lá^.&ú...á^..F.&..|..Õ°.. 000060
C48321B1 00CE9A50 16E44680 000021A5 9A5016E4 46800A6A 00E668C4 76FFC676 vó.váhl.j..FÒ.P.Él...FÒ.P.ö.Ÿl.á 000080
8A76FF00 48E90375 F6563900 08E90374 F44639FE 5688FC46 88F65689 F4468904 ..F¶.V-.F•.Vz9F¶t.Õ..9V-u.ÕH..vo 0000A0
0E76FF10 76FF1276 FFFC76FF FE76FFF4 76FFF676 FF036AF8 76FFFA76 FF8876FF .v|.v°.v½j..v-.v¶.vz.v•.v..v..v. 0000C0
880006E9 03750000 30217824 799AC476 FFC676FF 0A76FF0C 76FF0676 FF0876FF .v..v..v..v..vó.vá.y$(l=..u.Õ..| 0000E0
00002231 9A50168C 4680056A F876FFFA 76FF8876 FF8A76FF 01CEE903 20E90000 ..Õ-.Õó..vo.v|.v°.v½j..F¥.P.1"... 000100
0E5EC422 0A50069A 042C681E 0A76FF0C 76FFA276 FF0029E9 03750000 30A24689 .FÅ=..u.Õ)..vÅ.v..v..h,...P."á^. 000120
800A6A12 76FFC476 FFC676FF 02DEE900 00880789 26124688 065EC400 0207C726 &ú...á^..F.&..|..ÕB..vó.vá.v.j.. 000140
888C4688 865689B4 468904C4 83228600 CE9A5016 A4468D00 00227A9A 5016A446 FÊ.P.z"...FÊ.P.ö..".á..FÇ.VÑ.F¥. 000160
056AF876 FFFA76FF 8876FFBA 76FF0048 E90375B6 56390008 E90374B4 4639BE56 V/9FÇt.Õ..9VÑu.ÕH..vo.v|.v°.v½j. 000180
76FF0C76 FF0676FF 0876FF0E 76FF1076 FF1276FF 8C76FF8E 76FFB476 FFB676FF .vÑ.vÇ.v/.v¥.v..v..v..v..v..v..v 0001A0
8A76FF00 F9E90258 E9000088 0006E903 7500003D 22502479 9AC476FF C676FF0A ..vó.vá.y$P"=..u.Õ..|..ÕX.Õ°..vo 0001C0
0029E903 7500003D A2468900 001EDC9A 5016E046 80046AF8 76FFFA76 FF8876FF .v|.v°.v½j..FÅ.P.É....FÅ=..u.Õ). 0001E0

Dump of file SATURN:[PCCOMMON.DUMP.DLL]DAPSETDF.TMP;1 on 18-APR-1990 10:42:54.27
File ID (609,9,0)   End of file block 85 / Allocated 88

Virtual block number 21 (00000015), 512 (0200) bytes 12468806 5EC40002 07C7260E 5EC422DF 50069A04 3C681E0A 76FF0C76 FFA276FF .vÅ.v..v..h<...PÕ"á^.&ú...á^..F. 000000
46800000 1E819A50 16CC4680 0A6A00EA 68C476FF C676FF02 09E90000 88078926 &..|..Õ...vó.váhõ.j..Fà.P......F 000020
390008E9 03740C46 39E25688 E04688DE 56890C46 8904C483 1FC500CE 9A5016CC à.P.ó.é..á..FÉ.VB.FÅ.Vä9FÉ .Õ..9 000040
76FFE276 FFDC76FF DE76FF04 6AF876FF FA76FF88 76FF8A76 FF0048E9 0375DE56 VBu.ÕH..vo.v|.v°.v½j..vB.vÉ..ã.v 000060
AF24799A C476FFC6 76FF0A76 FF0C76FF 0676FF08 76FF0E76 FF1076FF 1276FFE0 Å.v..v..v..v..v..v..v..vó.vá.y$É 000080
037500E6 3D001BE9 017AE900 00880024 E90183E9 00008800 06E90375 00003D1E .=..u.Õ..|..Õ..Õ$.|..Õz.Õ..=l.u. 0000A0
FFFA76FF 8876FFBA 76FFFFDC E9FF0AE9 037500EA 3DFE3DE9 037500E8 3DFD70E9 Õp»=Õ.u.Õ=±=ð.u.Õ..ÕÉ..vo.v|.v°. 0000C0
FF0C76FF A276FF00 29E90375 00003DA2 46890000 23769A50 160C4680 046AF876 v½j..FÉ.P.v#...FÅ=..u.Õ)..vÅ.v.. 0000E0
E9000088 07892612 4688065E C4000207 C7260E5E C4239550 069A044C 681E0A76 v..hL...P.#á^.&ú...á^..F.&..|..Õ 000100
000030A2 46890000 23C29A50 16844680 056AF876 FFFA76FF 8876FFBA 76FF0110 ...vo.v|.v°.v½j..FÇ.P.ó#...FÅ=.. 000120
C4000207 C7260E5E C423E150 069A045C 681E0A76 FF0C76FF A276FF00 29E90375 u.Õ)..vÅ.v..v..h\...PÅ#á^.&ú...á 000140
16F4468D 036AF876 FFFA76FF 8876FFBA 76FF00C4 E9000088 07892612 4688065E ^..F.&..|..Õó..vo.v|.v°.v½j..F¶. 000160
069A046C 681E0A76 FF0C76FF A276FF00 29E90375 00003DA2 46890000 20879A50 P.. ...FÅ=..u.Õ)..vÅ.v..v..hl... 000180
16E44680 0A6A0078 E9000088 07892612 4688065E C4000207 C7260E5E C4206B50 Pk á^.&ú...á^..F.&..|..Õx.j..FÕ. 0001A0
24469A50 16E44680 00E668C4 76FFC676 FF0AC483 24320002 9AF476FF F676FF50 P.v-.v¶.Ø.2$.á..vó.váhl..FÕ.P.F$ 0001C0
00EA68C4 76FFC676 FF0AC483 245A0002 9ADC76FF DE76FF50 16CC4680 0A6A0000 ..j..Fà.P.vB.vÉ.Ø.Z$.á..vó.váhõ. 0001E0

```
Dump of file SATURN:[PCCOMMON.DUMP.DLL]DAPSETDF.TMP;1 on 18-APR-1990 10:42:54.27
File ID (609,9,0)   End of file block 85 / Allocated 88

Virtual block number 22 (00000016), 512 (0200) bytes

FF0AC483 200C0002 9AB476FF B676FF50 16A4468D 0A6A0000 246E9A50 16CC468D .Fä.P.n$..j..FÉ.P.vÑ.vÇ.@.É .á.. 000000
1E565700 0012C800 12CAC95F 5E1F0000 1F529A50 16A4468D 00E868C4 76FFC676 vó.váhÒ..FÉ.P.R....^ èò..à...WV. 000020
7500003D FE468900 001E909A 047C681E 2676FF28 76FF0000 FE46C7D8 8E1FF4B8 |¶..ÄúF±...v(.v&.h|........F±=..u 000040
5EC40002 07C72612 5EC42529 50069A04 8F681E0A 76FF0C76 FFFE76FF 0029E903 .Ò)..v±.v..v..h....P)%á^.&ú...á^ 000060
161C468D 2076FF22 76FF2476 FF2676FF 2876FF00 91E9FE46 8B078926 1646880E ..F.&...F±Ö...v(.v&.v$.v".v .F.. 000080
D29A1876 FF1A76FF 5016EE46 8D0A6A00 5CE90375 00003DFE 46890000 1F349A50 P.4....F±=..u.Ö\.j..FŸ.P.v..v..@ 0000A0
FF0C76FF FE76FF00 00241E9A 5016EE46 8D1676FF 0676FF08 76FF0AC4 83240A00 ..$.á..v..v..v..FŸ.P..$...v±.v.. 0000C0
FF2876FF 07892616 46880E5E C4000207 C726125E C4234950 069A049F 681E0A76 v..h....PI#á^.&ú...á^..F.&...v(. 0000E0
5E1F0000 E9FE468B 00001F91 9A2676FF 2876FF00 11E9FE46 8B00001F 159A2676 v&......F±Ö...v(.v&......F±Ö...^ 000100
16004680 0876FF0A 76FF0000 B646C7D8 8E2481B8 1E565700 004AC800 24CAC95F  èò$.àJ..WV.|.$.ÄúFÑ...v..v..FÅ. 000120
16FC4680 0876FF0A 76FF0000 20199A50 16CC4680 0876FF0A 76FF0000 20099A50 P.. ...v..v..Fà.P.. ...v..v..F=. 000140
FE76FFCC 76FFCE76 FF00F9E9 00008800 06E90374 FE460BFC 46880000 20299A50 P.) ...F=.F±t.Ö..|..Ö*..vö.và.v± 000160
0000E986 46880006 E9037500 00308646 89000023 2A9A5016 E4468004 6AFC76FF .v=j..FÖ.P.*#...FÑ=..u.Ö...FÑÖÅ. 000180
468D00EA 680076FF D276FF0A C4832641 00029AE4 76FFE676 FF501604 46800A6A j..Fà.P.vl.vö.@.A&.á..v@.vÅhõ..F 0001A0
0000266D 9A5016C8 4680056A FC76FFFE 76FFCC76 FFCE76FF 00002655 9A501604 à.P.U&...vo.vä.v±.v=j..Fà.P.m&.. 0001C0
D29AC876 FFCA76FF 5016B846 8D0A6A00 7FE98646 880006E9 03750000 30864689 .FÑ=..u.Ö...FÑÖ..j..F|.P.vò.và.@ 0001E0

Dump of file SATURN:[PCCOMMON.DUMP.DLL]DAPSETDF.TMP;1 on 18-APR-1990 10:42:54.27
File ID (609,9,0)   End of file block 85 / Allocated 88

Virtual block number 23 (00000017), 512 (0200) bytes

FFCC76FF CE76FF00 0026A69A 5016B846 8000E868 D076FFD2 76FF0AC4 83269200 ..&.á..v@.vÅhÒ..F|.P.|&...vö.vä. 000000
E986468B 0006E903 7500003D B6468900 0025CB9A 5016F846 8D036AFC 76FFFE76 v±.v=j..F½.P.ùX...FÑ=..u.Ö...FÑÖ 000020
00E668D0 76FFD276 FF0AC483 25010002 9AF876FF FA76FF50 16EB468D 0A6A002E ..j..FÒ.P.v*.v½.@..X.á..v@.vÅhl. 000040
6DB81E56 57000016 C80006CA C95F5E1F 0000E900 00880000 25159A50 16EB468D .FÒ.P..X..|..Ö...^ èò..à...WV.|m 000060
468D0876 FF0A76FF 00002582 9A5016F4 468D0876 FF0A76FF 0000EE46 C7D88E25 X.ÄúFŸ...v..v..F¶.P..X...v..v..F 000080
0374FE46 0BFC468B 000025A2 9A5016FC 468D0876 FF0A76FF 00002592 9A5016F0 Þ.P..X...v..v..F=.P.ÅX...F=.F±t. 0000A0
890000FF FF9A5016 F8468DFC 76FFFE76 FFF076FF F276FF01 66E90000 880006E9 Ö..|..Öf..v·.vÞ.v±.v=.F½.P...... 0000C0
7E830009 E9037D00 8EE9037E 00FA7E83 013FE9EE 46880006 E9037500 003DEE46 FŸ=..u.Ö...FŸÖ?..-*.-.Ö..}.Ö...~ 0000E0
006A006A 016A006A 012568EA 76FFF476 FFF676FF 00E1EA46 C70080E9 037202F8 ½.r.Ö..úFöÅ..v-.v¶.vöh%.j.j.j.j. 000100
FFF676FF 0000278F 9A006A50 52000027 869A00E0 68F476FF F676FF00 00280C9A ..(...v-.v¶hÅ...'..RPj...'...v-. 000120
0027B49A 00E368F4 7·FFF676 FF000027 A69A006A 50520000 27909A00 E168F476 v¶hÅ...'..RPj..|'...v-.v¶hD..Ç'. 000140
00FFFF9A 006A5052 0u00057C 9A00E268 F476FFF6 76FF0000 27809A00 6A505200 .RPj..§'...v-.v¶hä..|...RPj..... 000160
89000026 1C9A5016 EC468D06 6AFC76FF FE76FFF0 76FFF276 FF00A8E9 00008800 .|..Ö¨..v·.vÞ.v±.v=j..F$.P..&... 000180
00E168F4 76FFF676 FF0057E9 98EC468A 007FE9EE 46880006 E9037500 003DEE46 FŸ=..u.Ö...FŸÖ...F$.ÖW..v-.v¶hÅ. 0001A0
6A012568 00E268F4 76FFF676 FF0056E9 00002828 9A006A00 6A016A00 6A012568 h%.j.j.j.j..((..ÖV..v-.v¶ïã.h%.j 0001C0
6A016A00 6A012568 00E368F4 76FFF676 FF003AE9 00002844 9A006A00 6A016A00 .j.j.j..D(..Ö:..v-.v¶hD.h%.j.j.j 0001E0

Dump of file SATURN:[PCCOMMON.DUMP.DLL]DAPSETDF.TMP;1 on 18-APR-1990 10:42:54.27
File ID (609,9,0)   End of file block 85 / Allocated 88

Virtual block number 24 (00000018), 512 (0200) bytes

5830FF99 E9037500 493DFFD9 E9037500 4130001B E9001EE9 00001A45 9A006A00 .j..E...Ö..Ö..=A.u.Ö).=I.u.Ö..=X 000000
268FB81E 56570000 18C80006 CAC95F5E 1F0000E9 00008800 00E9FFAD E9037500 .u.ÖÙ.Ö..|..Ö...^ èò..à...WV.|¢& 000020
EE468014 76FF1676 FF000026 D49A5016 F2468D14 76FF1676 FF0000EC 46C7D88E .ÄúF&...v..v..F·.P.Å&...v..v..FŸ 000040
07892612 4688065E C4000026 F49A5016 FC468D14 76FF1676 FF000026 E49A5016 .P.Ö&...v..v..F=.P.¶&..á^..F.&.. 000060
000027DB 9A5016EA 46·D066A FC76FFFE 76FFEE76 FFF076FF 000107C7 260E5EC4 á^.&ú....vÞ.vŸ.v±.v=j..Fõ.P.Ü'.. 000080
0E5EC424 8450069A 04AF681E 0A76FF0C 76FFEC76 FF0034E9 03750000 3DEC4689 .F$=..u.Ö4..v¢.v..v..h€...PÇ$á^. 0000A0
800283E9 00008800 00·9AD9A EE76FFF0 76FF0789 2612468B 065EC400 0207C726 &ú...á^..F.&...vÞ.vŸ.Ù)..|..Ö... 0000C0
7441EA7E 8000E2F6 46C70005 E9037458 EA7E8000 E1F646C7 0005E903 7449EA7E -õlt.Ö..úF-Å..-õXt.Ö..úF-ã..-õAt 0000E0
89000027 189A5016 F8468DFC 76FFFE76 FFEE76FF F076FF00 E3F646C7 0005E903 .Ö..úF-D..vÞ.vŸ.v±.v=.F½.P..'... 000100
260E5EC4 2AEF5006 9A04BF68 1E0A76FF 0C76FFEC 76FF004D E9037500 003DEC46 F$=..u.ÖM..v$.v..v..h¢...Pÿ*á^.& 000120
6A006A01 6A006A01 2568F676 FFF276FF F476FF07 8926F646 8B065EC4 000207C7 ú...á^..F-&...v¶.v·.v-h%.j.j.j.j 000140
0070E903 7E00FA7E 8301EBE9 00008800 002A239A EE76FFF0 76FF0000 2A189A00 ...*...vÞ.vŸ.#*..|..Ö$..-*.-.Öp. 000160
08C48329 ED00569A 0A76FF0C 76FF04CF 681E0062 E9037202 F87E8300 09E9037D ).Ö...-½.r.Öb..hú..v..v..V.Ù).á. 000180
F6468B06 5EC40002 07C7260E 5EC408C4 8325F000 109A0A76 FF0C76FF 04E3681E .hD..v..v....ÞX.á.á^.&ú...á^..F- 0001A0
FFF076FF 00002817 9A006A00 6A016A00 6A012568 F676FFF2 76FFF476 FF078926 &...v¶.v·.v-h%.j.j.j.j...+...vÞ. 0001C0
50520000 2A519A00 E068F276 FFF476FF 005CE901 75E90000 8800002B 879AEE76 vŸ..+..|..Öu.Ö\..v¶.v·hÅ..Q*..RP 0001E0
```

```
Dump of file SATURN:[PCCOMMON.DUMP.DLL]DAPSETDF.TMP;1 on 18-APR-1990 10:42:54.27
File ID (609,9,0)   End of file block 85 / Allocated 88

Virtual block number 25 (00000019), 512 (0200) bytes

76FF0000 2A719A01 6A505200 002A689A 00E168F2 76FFF476 FF00002A 5A9A016A j..Z*...v¶.v.hÃ..h*..RPj..q*...v 000000
6F9A00E2 68F276FF F:76FF00 002A889A 016A5052 00002A7F 9A00E368 F276FFF4 ¶.v.hD...*..RPj...*...v¶.v.hã..o 000020
0025E941 E846C600 2CE949E8 46C60018 E9124688 00002778 9A016A50 52000027 '..RPj..x'...F.Ò..6FÒIÒ,.6FÒAÒ%. 000040
E9037500 E330FFE6 E9037500 E230FFE0 E9037500 E130001B E9001EE9 58E846C6 6FÒXÒ..Ò..=Ã.u.ÒÃ.=ã.u.Òl.=Ð.u.Ò 000060
FF0042E9 03750000 3DEC4689 00002495 9A04FA68 1EEE76FF F076FF00 00E9FFD7 ■.Ò...vÞ.vŸ.h*...$...Fš=..u.Ò8.. 000080
26F64688 065EC400 0207C726 0E5EC428 5450069A 050A681E 0A76FF0C 76FFEC76 vš.v..v..h....PT+á^.&ú...á^..F-& 0000A0
81E90000 8800002B 7C9A006A 006A016A 006A0125 68F676FF F276FFF4 76FF0789 ...v¶.v..v-h%.j.j.j.j..|+..j..Ò. 0000C0
75000030 EC468900 0024E29A 5016E846 80066AFC 76FFFE76 FFEE76FF F076FF00 ..vÞ.vŸ.vz.v•j..FÒ.P.ã$...Fš=..u 0000E0
5EC40002 07C7260E 5EC428FB 50069A05 1A681E0A 76FF0C76 FFEC76FF 004DE903 .ÒM..vš.v..v..h....P«(á^.&ú...á^ 000100
00002761 9A006A00 6A016A00 6A012568 F676FFF2 76FFF476 FF078926 F6468806 ..F-&...v¶.v..v-h%.j.j.j.j..e'.. 000120
E9000088 00002554 9AEE76FF F076FF00 11E90000 88000025 439AEE76 FFF076FF .vÞ.vŸ.C%..j..Ò...vÞ.vŸ.T?..j..Ò 000140
5689FC46 890C5688 0A4688D8 8E287E88 1E565700 0004C800 12CAC95F 5E1F0000 ...^_èò..à...WV.j-(.Á.F..V..F=.V 000160
00002BF8 9A006A00 6A006AFF FF68FFFF 68FFFF68 FFFF6877 6A0676FF 0876FFFE z.v..v.jwh..h..h..h..j.j.j..«+.. 000180
FF00002C 1A9A006A 006A016A FFFF682C 0868FFFF 682BEF68 766A0676 FF0876FF .v..v.jvhy+h..h.,h..j.j.j....,... 0001A0
76FF0000 2C399A00 6A006A00 6AFFFF68 2E3268FF FF682C0E 686E6A06 76FF0876 v..v.jnh.,h..h2.h..j.j.j..9,...v 0001C0
0876FF00 002C569A 006A006A 006AFFFF 68FFFF68 FFFF68FF FF68796A 0676FF08 ..v.jyh..h..h..h..j.j.j..V,...v. 0001E0

Dump of file SATURN:[PCCOMMON.DUMP.DLL]DAPSETDF.TMP;1 on 18-APR-1990 10:42:54.27
File ID (609,9,0)   End of file block 85 / Allocated 88

Virtual block number 26 (0000001A), 512 (0200) bytes

0676FF08 76FF0000 2C719A00 92681E01 6A006A00 6AFFFF68 FFFF6873 6A0676FF .v.jsh..h..j.j.j..h...q,...v..v. 000000
006A012C 680676FF 0876FF00 002C8F9A 0092681E 016A006A 006A006A 006A706A jpj.j.j.j.j..h....,...v..v.h,.j. 000020
006A006A 01206806 76FF0876 FF00002C A09A0092 681E006A FFFF68FF FF68006A j.h..h..j..h...Ù,...v..v.h..j.j. 000040
FF68006A 006A012F 680676FF 0876FF00 002CCB9A 0092681E 006AFFFF 68FFFF68 h..h..j..h...ù,...v..v.h/.j.j.h. 000060
006AFFFF 68FFFF68 00876806 76FF0876 FF00002C E99A0092 681E006A FFFF68FF .h..j..h...Ò,...v..v.h..h..h..j. 000080
006A006A 006A006A 006A0085 680676FF 0876FF00 002D059A 00BE681E 006A006A j.j..h/...-...v..v.h..j.j.j.j.j. 0000A0
681E006A FFFF68FF FF68006A 006A0133 680676FF 0876FF00 002D239A 00BE681E .h/..#-...v..v.h3.j.j.h..h..j..h 0000C0
00BE681E 006AFFFF 68FFFF68 006A006A 01346806 76FF0876 FF00002D 419A00BE ƒ..A-...v..v.h4.j.j.h..h..j..h/. 0000E0
7D9A00BE 681E006A FFFF68FF FF68006A 006A0135 680676FF 0876FF00 00205F9A ._-...v..v.h5.j.j.h..h..j..h/..) 000100
0020999A 00A8681E 016A006A 006AFFFF 68FFFF68 00816806 76FF0876 FF00002D -¯...v..v.h..h..h..j.j.j..h´...-. 000120
0876FF00 002D879A 00A8681E 016A006A 006A006A 006A0080 680676FF 0876FF00 ..v..v.h..j.j.j.j.j..h´..ñ-...v. 000140
76FF0876 FF00002D D59A00A8 681E006A FFFF68FF FF68006A 006A0130 680676FF .v.h0.j.j.h..h..j..h´..l-...v..v 000160
680676FF 0876FF00 002DF39A 00A8681E 006AFFFF 68FFFF68 006A006A 01316806 .h1.j.j.h..h..j..h´..µ-...v..v.h 000180
47892600 04B80A5E C400002E 499A00A8 681E006A FFFF68FF FF68006A 006A0132 2.j.j.h..h..j..h´..I...á^.jå.&.G 0001A0
0A5EC402 57882607 8826FC5E C40E5F8C 260C4789 2600EAB8 0A5EC40A 5F8C2608 .&._.á^.jõ.&.G.&._.á^•&..&.W.á^. 0001C0
0A468801 6A006A00 6AFFFF68 2E7E6800 00680676 FF0876FF 12578926 10478926 &.G¯&.W..v..v.hì.ĥ~.h..j.j.j..F. 0001E0

Dump of file SATURN:[PCCOMMON.DUMP.DLL]DAPSETDF.TMP;1 on 18-APR-1990 10:42:54.27
File ID (609,9,0)   End of file block 85 / Allocated 88

Virtual block number 27 (0000001B), 512 (0200) bytes

016A006A 006A006A 006A000C 680676FF 0876FF00 002E6C9A 50520008 050C5688 .V....RP.l....v..v.hÉ.j.j.j.j.j. 000000
2EA36800 6A006A01 3S 80676 FF0876FF 00002E91 9A505200 08050C56 880A4688 .F..V....RP......v..v.h9.j.j.hÉ. 000020
006A013A 680676FF 08/6FF00 002E869A 50520008 050C5688 0A468800 6AFFFF68 h..j..F..V....RP.Ñ....v..v.h:.j. 000040
0676FF08 76FF0000 2ED89A50 52000805 0C56880A 4688006A FFFF682E C868006A j.hà.h..j..F..V....RP.Ù....v..v. 000060
C400002F 379A5052 0008050C 56880A46 88006AFF FF682F20 68006A00 6A013868 h;.j.j.h /h..j..F..V....RP.7/..á 000080
C4015087 89260152 87892600 00880A5E C4014C87 8926014E 87892600 00880A5E ^.j..&..N.&..L.á^.j..&..R.&..P.á 0000A0
68000A68 0676FF08 76FF0156 97892601 54878926 0A5EC402 57882607 8826FC5E ^•&..&.W.á^.&..T.&..V..v..v.hÖ.h 0000C0
76FF0876 FF00002F 539A5052 014C050C 56880A46 88006A00 6A006AFF FF68297A z)h..j.j.j..F..V..L.RP.S/...v..v 0000E0
00CC6806 76FF0876 FF0000FF FF9A006A 006A016A 006A006A 006A006A 00CA6806 .hò.j.j.j.j.j.j.j.......v..v.hä. 000100
006A006A 01366806 76FF0876 FF00002F 949A006A 006A016A 006A006A 006A006A j.j.j.j.j.j.j.../...v..v.h6.j.j. 000120
37680676 FF0876FF 00002FB9 9A505201 4C050C56 880A4688 006A2E81 682FA668 hl/h..j..F..V..L.RP.¿/...v..v.h7 000140
0876FF00 002FDE9A 5052014C 050C5688 0A468800 6A2EA668 2FCB6800 6A006A01 .j.j.hù/hl.j..F..V..L.RP.ß/...v. 000160
2FFE9A50 52014C05 0C56880A 4688006A 2ECB682F EC68006A 006A0138 680676FF .v.h8.j.j.hš/hù.j..F..V..L.RP.±/ 000180
301C9A00 6A006A00 6A301368 301068FF FF682FF2 6800E668 0676FF08 76FF0000 ...v..v.hl.h·/h..h.0h.0j.j.j...0 0001A0
0000303A 9A006A00 6A006A30 3168302E 68006A00 6A00E868 0676FF08 76FF0000 ...v..v.hò.j.j.h.0h10j.j.j..:0.. 0001C0
76FF0000 305A9A00 6A006A00 6AFFFF68 30486800 6A006A00 EA680676 FF0876FF .v..v.hõ.j.j.hH0h..j.j.j..Z0...v 0001E0
```

```
Dump of file SATURN:[PCCOMMON.DUMP.DLL]DAPSETDF.TMP;1 on 18-APR-1990 10:42:54.27
File ID (609,9,0)   End of file block 85 / Allocated 88

Virtual block number 28 (0000001C), 512 (0200) bytes

 76FF0000 30789A00 6A006A00 6A306F68 306C68FF FF68304E 6800E168 0676FF08 ..v.hÅ.hN0h..hl0ho0j.j.j...0...v 000000
 FF0876FF 00003096 9A006A00 6A006A30 8068308A 68006A00 6A00E268 0676FF08 ..v.hâ.j.j.h.0h.0j.j.j...0...v.. 000020
 0676FF08 76FF0000 30849A00 6A006A00 6AFFFF68 28E96800 6A006A00 E3680676 v.hD.j.j.hÒ+h..j.j.j..Ç0...v..v. 000040
 9E680676 FF0876FF 000030D2 9A006A00 6A006A00 6A006A30 C56830C2 68009D68 h..hò0hé0j.j.j.j.j..Ø0...v..v.h. 000060
 68009C68 0676FF08 76FF0000 30F09A00 6A006A00 6A006A00 6A30E368 30E06800 .hÀ0hD0j.j.j.j.j..Þ0...v..v.h..h 000080
 311C6800 A0680676 FF08;6FF 0000310E 9A006A00 6A006A00 6A006A31 016830FE ±0h.1j.j.j.j.j...1...v..v.h..h.1 0000A0
 3068313A 6800A168 0676FF08 76FF0000 312C9A00 6A006A00 6A006A00 6A31  48 h.1j.j.j.j.j..,1...v..v.hÅ.h:1h= 0000C0
 6AFFFF68 FFFF6800 9F680676 FF0876FF 0000314A 9A006A00 6A006A00 6A006A 1 1j.j.j.j.j..J1...v..v.h..h..h..j 0000E0
 FFD88E2B B1B81E56 5700001C C8CBC95F 5E1F0000 28DC9A00 6A006A00 6A006A0  .j.j.j.j..Ê+...^_èùà...WV.¡Ÿ+.Ä. 000100
 FF00001A E49A5016 F6468006 76FF0876 FF000028 939A5016 F2468006 76FF0876 v..v..F.P..(...v..v..F-.P.ò.... 000120
 FF000028 B39A5016 FC468006 76FF0876 FF000028 A39A5016 EE468006 76FF0876 v..v..FŸ.P.È(...v..v..F=.P.°(... 000140
 E9E8468B 0006E903 75000030 E8468900 00FFFF9A 5016EA46 8D015E68 1E6AF676 v-j.h^..Fò.P......FÒ=..u.Õ...FÒÕ 000160
 5EC40082 87892600 B4878926 0000B8F8 5EC4FA56 89F84689 EC568BEA 468B0145 E..Fõ.V£.F½.V*á^½¡..&..Ç.&..ý.á^ 000180
 87C626F8 5EC41447 89261647 89260000 B8F85EC4 63478926 65478926 0000B8F8 ½¡..&.Ge&.Gcá^½¡..&.G.&.G.á^½&6. 0001A0
 6AFC76FF FE76FFEE 76FFF076 FF001847 C626F85E C4006747 C626F85E C4000086 Ñ..á^½&6Gg.á^½&6G...vÞ.vŸ.v±.v=j 0001C0
 8BE4468B EA5EC400 CEE9E846 8B0006E9 03750000 3000001C 3E9A5016 E4468010 ..Fõ.P.>...=..u.Õ...FÒÕo.á^õ.Fõ. 0001E0

Dump of file SATURN:[PCCOMMON.DUMP.DLL]DAPSETDF.TMP;1 on 18-APR-1990 10:42:54.27
File ID (609,9,0)   End of file block 85 / Allocated 88

Virtual block number 29 (0000001D), 512 (0200) bytes

 87892600 00B8F85E C4044789 26064789 260000B8 EA5EC402 57892607 8926E656 V|&..&.W.á^õ¡..&.G.&.G.á^½¡..&.. 000000
 2BA99A06 76FF0876 FFFB76FF FA76FFFF FF015C87 C726F85E C4015887 8926015A Z.&..X.á^½&ú.\....v*.v½.v..v..`+ 000020
 6832AE68 0676FF08 76FF0000 FFFF9AEA 76FFEC76 FF0676FF 0876FF08 C4833290 .2.á..v..v..v&.võ......v..v.hÛ2h 000040
 D0680676 FF0876FF 0000FFFF 9AFFFF68 328F6806 76FF0876 FF0000FF FF9AFFFF ........v..v.h«2h........v..v.hÅ 000060
 0676FF08 76FF0000 FFFF9AFF FF6832E1 680676FF 0876FF00 00FFFF9A FFFF6832 2h........v..v.hÅ2h........v..v. 000080
 00FFFF9A 020036FF 26218606 8E006A06 76FF0876 FF0000FF FF9AFFFF 682F8168 h./h........v..v.j...Ñ!&.6...... 0000A0
 88000098 46C7D88E 315B881E 56570000 6CC80004 CAC95F5E 1F0000E9 00008800 .¡..Õ...^_èò..àl..WV.¡[1.ÄúF...¡ 0000C0
 16A4468D 2076FF22 76FF4E9A 46C60000 AA46C700 00A846C7 94468996 46890000 ...F..F.úF´..úF´..óF.N.v".v .FÊ. 0000E0
 89AC4689 A2568BA0 46880000 204A9A50 16A0468D 2076FF22 76FF0000 31689A50 P.k1...v".v .F..P.J ...F..VÅ.F¯. 000100
 32279A50 1694468D 106A1276 FF1476FF 1676FF18 76FF0000 07C72606 5EC4AE56 VÚó^.&ú....v..v..v..v.j..F..P.'2 000120
 8833D850 069A052A 681E1A76 FF1C76FF 9876FF00 18E90375 00003D98 46890000 ...F.=..u.Õ...v..v..v..h*...PÅ3. 000140
 98468900 00FFFF9A 50168046 8D136A94 76FF9676 FF1676FF 1876FF03 00E99846 F.Õ...v..v..v..v.j..F¯.P......F. 000160
 02C5E998 468B3439 50069A05 3E681E1A 76FF1C76 FF9876FF 0018E903 7500003D =..u.Õ...v..v..v..h>...P94.F.Òé. 000180
 E9037502 470B2607 8B269C5E C4049C46 830004E9 9E56899C 46898256 8BB0468B .F¯.Vý.F..V.Õ...F..á^.&..&.G.u.Õ 0001A0
 46890000 28DC9A50 1684468D 026A37FF 260277FF 269C5EC4 1676FF18 76FF0079 y..v..v.á^.&.w.&.7j..FÇ.P.È(...F 0001C0
 64E99846 8B328050 069A0552 681E1A76 FF1C76FF 9876FF00 18E90375 00003D98 .=..u.Õ...v..v..v..hR...P.2.F.Õd 0001E0

Dump of file SATURN:[PCCOMMON.DUMP.DLL]DAPSETDF.TMP;1 on 18-APR-1990 10:42:54.27
File ID (609,9,0)   End of file block 85 / Allocated 88

Virtual block number 30 (0000001E), 512 (0200) bytes

 269C5EC4 001CE903 7400003D 08C48329 DB008C9A 0A76FF0C 76FF5016 B4468002 ..FÇ.P.v..v....Û).á.=..t.Õ..á^.& 000000
 76FF1876 FFFF74E9 0003E900 01A846C7 02578926 0789260E 5EC40257 8B26078B ..&.W.á^.&..&.W.úF´..Õ..Õt..v..v 000020
 9A1A76FF 1C76FF05 66681E00 3EE90374 00A87E83 000035A7 9AB076FF B276FF16 ..vý.v¯.Í5...~´.t.Õ>..hf..v..v.. 000040
 FF056868 1E08C483 34C80010 9A1A76FF 1C76FF0A 76FF0C76 FF08C483 34B60056 V.Ñ4.á..v..v..v..v....à4.á..hk.. 000060
 6A1276FF 1476FF16 76FF1876 FF01D2E9 00018808 C4833582 00109A1A 76FF1C76 v..v.....5.á.¡..ÕØ..v..v..v..v.j 000080
 1E1A76FF 1C76FF98 76FF0018 E9037500 003D9846 89000033 899A5016 B0468012 ..F¯.P.¿3...F.=..u.Õ...v..v..v.. 0000A0
 E99E5689 9C4689B2 568B8046 8B0000A8 46C70197 E998468B 356C5006 9A058768 h....Pl5.F.Õ..úF´...F¯.Vý.F..V.Õ 0000C0
 FF269C5E C41676FF 1876FF00 65E90375 02470B26 078B269C 5EC4049C 46830004 ...F..á^.&..&.G.u.Õe..v..v.á^.&. 0000E0
 FF9876FF 0018E903 7500003D 98468900 00341A9A 50168446 8D026A37 FF260277 w.&.7j..FÇ.P..4...F.=..u.Õ...v.. 000100
 9A0A76FF 0C76FF50 1684468D 0131E900 00883655 50069A05 98681E1A 76FF1C76 v..v..h....PU6¡..Õ1..FÇ.P.v..v.. 000120
 1676FF18 76FFFF88 E90003E9 0001A846 C70008E9 03740000 3008C483 35C1008C ..èS.á.=..t.Õ..úF´..Õ..Õ...v..v. 000140
 569A1A76 FF1C76FF 05AF681E 003EE903 7500A87E 830000FF FF9AB076 FFB276FF .vý.v¯......~´.u.Õ>..h£..v..v..V 000160
 76FF05B4 681E08C4 8335E700 109A1A76 FF1C76FF 0A76FF0C 76FF08C4 83350500 .Í5.á..v..v..v..v....Õ5.á..hÇ..v 000180
 26AC5EC4 02578B26 078B260E 5EC400B3 E90001B8 08C4B336 1B00109A 1A76FF1C ..v.....6.á.¡..Õ°.á^.&..&.W.á^¯& 0001A0
 08C48336 9A00569A 50520067 05AE568B AC46880A 76FF0C76 FF655789 26634789 .Gc&.We.v..v..F¯.VÛ.g.RP.V..6.á. 0001C0
 00003D98 46890000 FFFF9A50 16AA468D 37FF2602 77FF260E 5EC41676 FF1876FF .v..v.á^.&.w.&.7.F¯.P......F.=.. 0001E0
```

```
Dump of file SATURN:[PCCOMMON.DUMP.DLL]DAPSETDF.TMP;1 on 18-APR-1990 10:42:54.27
File ID (609,9,0)   End of file block 85 / Allocated 88

Virtual block number 31 (0000001F), 512 (0200) bytes

 29159A16 76FF1876 FF339D50 069A05D0 681E1A76 FF1C76FF 9876FF00 23E90375 u.Ö#..v..v..v..hÅ...P.3.v..v...) 000000
 8926AC5E C402578B 26078826 0E5EC400 2EE90375 00AA7E83 003DE998 46880000 ...F.Ö=..-`.u.Ö..á^.&..&.W.á^¯&. 000020
 8808C483 344F0056 :A505200 1805AE56 88AC4688 0A76FF0C 76FF1657 89261447 G.&.W..v..v..F¯.VÜ...RP.V.O4.á.¡ 000040
 0A76FF00 000E46C7 088E3316 881E5657 00006EC8 001ECAC9 5F5E1F00 00E90000 ..Ö...^_èò..àn..WV.¡.3.ÁúF8...v. 000060
 0A76FF00 003198 9A 5016FA46 8D0876FF 0A76FF00 0033429A 5016EC46 8D0876FF .v..F$.P.B3...v..v..F*.P..1...v. 000080
 E8468800 0033529A 5016E846 8D0876FF 0A76FF00 003188 9A 5016E446 8D0876FF .v..FÖ.P..1...v..v..FÖ.P.R3...FÖ 0000A0
 29A29A00 6A006A00 6A006A01 6E680676 FFEC76FF EE76FFF6 5689F446 89EA5688 .Vö.F¶.V-.vŸ.v$.v.hn.j.j.j.j..Å) 0000C0
 002A3A9A 000F68EC 76FFEE76 FF018AE9 0000B800 06E90374 FC4608FA 46880000 ...F*.F=t.Ö..¡..Öo..vŸ.v$hÖ..:*. 0000E0
 34E79A50 16E0468D 126AFA76 FFFC76FF E476FFE6 76FF0000 2A439A00 6A505200 .RPj..C*...v|.vö.v=.v*j..FÅ.P.O4 000100
 88000034 889AE076 FFE276FF E476FFE6 76FF0017 E9037500 DE7E830E 46890000 ...F8.-8.u.Ö...v|.vö.vä.vÅ..4... 000120
 89F04689 E2568BE0 46880000 FFFF9AE0 76FFE276 FFE476FF E676FF01 68E9DE46 F8Öh..v|.vö.vä.vÅ......FÅ.Vä.FÞ. 000140
 5EC4E476 FFE676FF 011EE903 75024708 26078826 F05EC404 F0468300 04E9F256 V.Ö...FÞ.á^Þ&..&.G.u.Ö...v|.vöá^ 000160
 FF0017E9 03750000 3D0E4689 0000380E 9A501692 468D026A 37FF2602 77FF26F0 Þ&.w.&.7j..F..P..8...F8=..u.Ö... 000180
 26F05EC4 E476FFE6 76FF00F7 E9DE4688 0000382A 9AE076FF E276FFE4 76FFE676 v|.vö.vä.vÅ.*8...F8Ö%..v|.vöá^Þ& 0001A0
 E676FF00 17E90375 00003D0E 46890000 354D9A50 16FE468D 046A37FF 260277FF .w.&.7j.'.F±.P.M5...F8=..u.Ö...v| 0001C0
 F05EC400 3EE90374 59FE7E80 0089E9DE 46880000 38E39AE0 76FFE276 FFE476FF .vö.vä.vÅ.D8...F8Ö¿..-±Y¢.Ö>.á^Þ 0001E0

Dump of file SATURN:[PCCOMMON.DUMP.DLL]DAPSETDF.TMP;1 on 18-APR-1990 10:42:54.27
File ID (609,9,0)   End of file block 85 / Allocated 88

Virtual block number 32 (00000020), 512 (0200) bytes

 001805F6 5688F446 8B501692 46801657 89261447 8926F45E C402578B 26078826 &..&.W.á^¶&.G.&.W..F..P.F¶.V-... 000000
 76FFEE76 FF08C483 34A20010 9A501692 46800 5E4 681E08C4 83387600 569A5052 RP.V.v8.á..hö..F..P...Å4.á..vŸ.v 000020
 60680676 FFEC76FF EE76FF00 0038AA9A 50169246 8DFF6A00 6A016168 0676FFEC $.v.ha.j.j..F..P.¨8...vŸ.v$.v.h' 000040
 F8468801 69680676 FFEC76FF EE76FFF8 46890000 38CF9A00 6A006A00 6A006A01 .j.j.j.j..ü8...F½.vŸ.v$.v.hi..F½ 000060
 FFE276FF E476FFE6 76FFFECF E9000037 1E9A37FF 260277FF 26F05EC4 50006A48 Hj.Pá^Þ&.w.&.7..7..Öu±.v|.vö.vä. 000080
 D88E36B4 881E5657 000070C8 0006CAC9 5F5E1F00 00E90000 88000037 789AE076 vÅ.(7..¡..Ö...^_èò..àp..WV.¡Ç6.Å 0000A0
 F44689F6 46890000 B8FC4689 FE468900 0088F846 89FA4689 0000B800 009046C7 úF...¡...F*.F½¡...F±.F•¡...F-.F¶ 0000C0
 1476FF16 76FF0000 36C99A50 169E4680 1476FF16 76FF0000 F246C700 4B9446C7 úF.K.úF·...v..v..F..P.è6...v..v. 0000E0
 1476FF16 76FF0000 36F99A50 16964680 1476FF16 76FF0000 36E99A50 169A4680 .F..P.Ö6...v..v..F..P.*6...v..v. 000100
 4688F056 89EE4689 98568896 46880001 07C7260E 5EC40000 36D99A50 16F84680 .F½.P.16..á^.&ú....F..V..FŸ.VÞ.F 000120
 1476FF16 76FF0000 20D09A50 16A2468D 9476FF00 DC689E76 FFA076FF 0117E912 .Ö...v..v.hÊ..v..FÅ.P.Å ...v..v. 000140
 805016A2 46805016 F44680F8 76FFFA76 FF9A76FF 9C76FF0A 76FF0C76 FF1276FF .v..v..v..v..v..v*.v½.F¶.P.FÅ.P. 000160
 065EC400 0207C726 0E5EC400 17E90375 00907E83 9046893A 16330E9A 50169246 F..P..3.:.F..~..u.Ö..á^.&ú...á^. 000180
 00309046 8900002A D09A05F3 681E9A76 FF9C76FF 00C0E990 46880789 26124688 .F.&...F.Öà..v..v..hµ..Å*...F.=. 0001A0
 000207C7 260E5EC4 3A645006 9A060668 1E0A76FF 0C76FF90 76FF0028 E9037500 .u.Ö(..v..v..v..h....Pd:á^.&ú... 0001C0
 FFF676FF 126AF876 FFFA76FF 9A76FF9C 76FF007E E9000088 000C07C7 26065EC4 á^.&ú.É.¡..Ö-..v..v..v*.v½j..v-. 0001E0

Dump of file SATURN:[PCCOMMON.DUMP.DLL]DAPSETDF.TMP;1 on 18-APR-1990 10:42:54.27
File ID (609,9,0)   End of file block 85 / Allocated 88

Virtual block number 33 (00000021), 512 (0200) bytes

 16681E0A 76FF0C76 FF9076FF 0033E903 7500003D 90468900 00FFFF9A 096AF476 v¶j.......F.=..u.Ö3..v..v..v..h. 000000
 00365E9A 9A76FF9C 76FF000C 07C72606 5EC40002 07C7260E 5EC43506 50069A06 ...P.5á^.&ú...á^.&ú.É..v..v..^6. 000020
 03750139 30000BE9 000EE900 11E90000 28989A9A 76FF9C76 FF0025E9 0000B800 .¡..Ö%..v..v...+..Ö..Ö..Ö..=9.u. 000040
 B8088E38 FC881E56 57000068 C80012CA C95F5E1F 0000E900 00B8FFEF E9FEE1E9 ÖÅ±Öy.¡..Ö...^_èò..àh..WV.¡•8.Å¡ 000060
 5EC40001 07C7260E 5EC44EE6 46C60000 E446C700 00FA46C7 FC4689FE 46890000 ...F±.F•úF*..úFö..óF|Ná^.&ú...á^ 000080
 16E8468D 1476FF16 76FF0000 39369A50 16F0468D 1476FF16 76FF000C 07C72606 .&ú.É..v..v..FÞ.P.69...v..v..FÖ. 0000A0
 B9F64689 EE5688EC 46880000 39569A50 16EC468D 1476FF16 76FF0000 39469A50 P.F9...v..v..F$.P.V9...F$.VŸ.F-. 0000C0
 00385A9A 006A006A 006A006A 01656800 D068F076 FFF276FF 022EE912 4688F856 V½.F.Ö...v·.vÞhî.he.j.j.j.j..Z;. 0000E0
 46890000 3C009A00 6A006AF4 76FF006A 016A6800 D068F076 FFF276FF F4468900 ..F¶.v·.vÞhî.hj.j..v¶j.j...<...F 000100
 C48338BE 00569A0A 76FF0C76 FF062668 1E003AE9 0374FE46 08FC4688 FE5689FC •.V±.F•.F±t.Ö:..h&..v..v..V..;.á 000120
 C726065E C4000207 C7260E5E C408C483 3D0E0010 9A0A76FF 0C76FF06 40681E08 ..hə..v..v.....=.á.á^.&ú...á^.&ú 000140
 03750000 3DE44689 000039F7 9A065A68 1EE876FF EA76FF01 BEE90000 B8000C07 .É.¡..Ö/..vö.vÖ.hZ..¼9...FÖ=..u. 000160
 065EC400 0207C726 0E5EC43C 4750069A 0667681E 0A76FF0C 76FFE476 FF0028E9 Ö(..vö.v..v..hg...PG<á^.&ú...á^. 000180
 9A006A00 6A006A00 6A012468 000F68F0 76FFF276 FF017CE9 00008800 DC07C726 &ú.É.¡..Ö|..v·.vÞhÖ.h$.j.j.j.j.. 0001A0
 FC76FFFE 76FFE876 FFEA76FF 59E646C6 0004E903 7401FA7E 83FA4689 00003891 .8...F*.-|.t.Ö..óF|Y.vö.vÖ.v±.v• 0001C0
 0A76FF0C 76FFE476 FF0033E9 03750000 3DE44689 00003C98 9A5016E6 4680046A j..F|.P..<...Fö=..u.Ö3..vö.v..v. 0001E0
```

```
Dump of file SATURN:[PCCOMMON.DUMP.DLL]DAPSETDF.TMP;1 on 18-APR-1990 10:42:54.27
File ID (609,9,0)   End of file block 85 / Allocated 88

Virtual block number 34 (00000022), 512 (0200) bytes

9AE876FF EA76FF00 DC07C726 065EC400 0207C726 0E5EC43C BA50069A 0677681E .hw...Pu<á^.&ú...á^.&ú.É..võ.vÒ. 000000
9846804B 6A0277FF 26085FC4 26F65EC4 F076FFF2 76FF00FD E90000B8 00003CD3 &<..|..Õ»..v .vÞá^-&á_.&.w.jK.F. 000020
8900002B 359A5016 98468002 6AFC76FF FE76FFE8 76FFEA76 FF000039 969A5016 .P..9...võ.vÒ.v±.v=j..F..P.5+... 000040
260E5EC4 39C7500' 9*068768 1E0A76FF 0C76FFE4 76FF0033 E9037500 003DE446 Fð=..u.Ó3..võ.v..v..h....Pú9á^.& 000060
EA76FF00 8AE90000 8800003A 7D9AE876 FFEA76FF 00DC07C7 26065EC4 000207C7 ú...á^.&ú.É..võ.vÒ.):..|..Õ...võ 000080
50169846 8D008497 89?600B2 878926FE 5688FC46 8BF65EC4 00003A8E 9AE876FF .vÒ..:..á^-.F=.V±&..ý.&..Ç..F..P 0000A0
5EC41657 88261447 8826F65E C408C483 30480056 9A505200 8605F856 8BF6468B .F-.V½.Ñ.RP.V.H=.á.á^-&.G.&.W.á^ 0000C0
F8568BF6 46885016 98468000 18E90374 00849739 260022E9 037400B2 873926F6 -&9.ý.t.Ö".&9.Ç.t.Õ...F..P.F-.V½ 0000E0
EFE9FDCA E9037501 3A300008 E9000EE9 0011E908 C4833865 00569A50 52001805 ...RP.V.e8.á.Õ..Õ..Õ..=:.u.Õò»Õÿ 000100
C7000090 46C7D88E 3ABBB81E 56570000 8EC80012 CAC95F5E 1F0000E9 000088FF .|..Õ...^_èò..à/..WV.¡E:.ÄúF...ú 000120
1476FF16 76FF000C 07C72606 5EC40001 07C7260E 5EC40000 FF4286C7 0000F246 F ..ú.B..¯á^.&ú...á^.&ú.É..v..v. 000140
1476FF16 76FF0000 3B029A50 16E2468D 1476FF16 76FF0000 3AF29A50 16EA468D .Fõ.P.·:...v..v..Fã.P..;...v..v. 000160
E8568BE6 46880000 39669A50 16F8468D 1476FF16 76FF0000 3B129A50 16E6468D .F¦.P..;...v..v..F½.P.f9...F¦.vÒ 000180
8D486A02 77FF2608 5FC426EE 5EC4EA76 FFEC76FF 024BE912 468BF056 89EE4689 .F¥.VÞ.F.ÕH..v$.võá^¥&á_.&.w.jK. 0001A0
00375E9A 5016F446 80126AF8 76FFFA76 FFE276FF E476FF00 003C839A 50169246 F..P..<...vÕ.vã.v*.v½j..F¶.P.^7. 0001C0
5EC43EAE 50069A06 97681E0A 76FF0C76 FF9076FF 0028E903 7500003D 90468900 ..F.=..u.Õ(..v..v..v..h....PÛ>á^ 0001E0

Dump of file SATURN:[PCCOMMON.DUMP.DLL]DAPSETDF.TMP;1 on 18-APR-1990 10:42:54.27
File ID (609,9,0)   End of file block 85 / Allocated 88

Virtual block number 35 (00000023), 512 (0200) bytes

E05689DE 4689F656 8BF44688 01F1E900 00B8000C 07C72606 5EC40002 07C7260E .&ú...á^.&ú.É.|..Õþ..F¶.V-.FB.VÁ 000000
260E5EC4 E276FFE4 76FF0087 E9037502 470B2607 8B260E5E C404DE46 830004E9 Õ...FB.á^B&..&.G.u.Õ...vÕ.vãá^B& 000020
76FF0028 E9037500 00309046 89000037 D09A5016 FF448680 026A37FF 260277FF .w.&.7j...D..P.Ä7...F.=..u.Õ(..v 000040
000C07C7 26065EC4 000207C7 260E5EC4 3F7E5006 9A06A768 1E0A76FF 0C76FF90 ..v..v..hÏ...P-?á^.&ú...á^.&ú.É. 000060
19E90374 00003D08 C4833F14 008C9A50 16FF4486 8D501692 4680017F E90000B8 |..Õ...F..P..D..P....?.á.=..t.Õ. 000080
42BE83FF 66E90003 E9FE5689 FC468902 57882607 8B260E5E C40001FF 4286C700 .ú.B...á^B&..&.W..F=.V±Õ..Õf../B 0000A0
76FF5016 92468D08 C4833F27 00569A0A 76FF0C76 FF068768 1E0040E9 037400FF ..t.ÕM..hñ..v..v..V.'?.á..F..P.v 0000C0
5EC408C4 833B7C00 109A0A76 FF0C76FF 06BC681E 0BC4833F 3900109A 0A76FF0C ..v....9?.á..h¥..v..v....|;.á.á^ 0000E0
B49A06CF 681EE276 FFE476FF 00F1E900 00B8000C 07C72606 5EC40002 07C7260E .&ú...á^.&ú.É.|..Õþ..vÕ.vã.hü..Ç 000100
3FCC5006 9A060C68 1E0A76FF 0C76FF90 76FF0028 E9037500 00309046 8900003B ;...F.=..u.Õ(..v..v..v..hÉ...Pã? 000120
FFFA76FF E276FFE4 76FF00AF E90000B8 000C07C7 26065EC4 000207C7 260E5EC4 á^.&ú...á^.&ú.É.|..ÕÉ..vÕ.vã.v*. 000140
FF9076FF 0033E903 7500L030 90468900 00FFFF9A 096AFC76 FFFE76FF 126AF876 v½j..v±.v=j.......F.=..u.Õ3..v.. 000160
76FF000C 07C72606 5EC40002 07C7260E 5EC43B03 50069A06 EC681E0A 76FFL 76 v..v..h&...P&;á^.&ú...á^.&ú.É..v 000180
FC468BEE 5EC40000 3CE49AE2 76FFE476 FF0056E9 00008800 003C609A E276FF ' Õ.vã.'<..|..ÕV..vÕ.vã.Õ<..á^Y.F= 0001A0
26164789 260000B8 EE5EC400 16E90374 16573926 001FE903 74144739 26FE568L .V±&9G.t.Õ..&9W.t.Õ..á^Y|..&.G.& 0001C0
88FFEFE9 FDB0E903 75013B30 000BE900 0EE90011 E9001847 C626EE5E C4144789 .G.á^Y&6G..Õ..Õ..Õ..=;.u.Õ¯»Õy.| 0001E0

Dump of file SATURN:[PCCOMMON.DUMP.DLL]DAPSETDF.TMP;1 on 18-APR-1990 10:42:54.27
File ID (609,9,0)   End of file block 85 / Allocated 88

Virtual block number 36 (00000024), 512 (0200) bytes

46800876 FF0A76FF D88E3D76 881E5657 000008C8 0012CAC9 5F5E1F00 00E90000 ..Õ...^_èò..à...WV.|v=.Ä.v..v..F 000000
76FF0876 FF0A76FF 00003D06 9A5016FC 46800876 FF0A76FF 00003DA6 9A5016F8 ½.P.¦=...v..v..F=.P.ø=...v..v..v 000020
06CAC95F 5E1F0000 E90000B8 3E3C40A1 9A0876FF 0A76FF40 92421A9A FC76FFFE ±.v=..B.ã.v..v..Àã<>|..Õ...^_èò. 000040
00008800 0040649A 5016E846 800676FF 0876FFD8 8E4054B8 1E565700 0018C800 .à...WV.|¦ã.Ä.v..v..FÒ.P.dã.¯|.. 000060
76FFEA76 FF0AC483 41070002 9AFC76FF FE76FF50 16EC468D 0A6AFC46 89FE4689 .F±.F=j..F&.P.v±.v=.Ø..A.á..võ.v 000080
76FF5016 EC46800A 6AFC4689 FE468900 00B80000 41189A50 16EC4680 000668E8 Õh=..F&.P..A..|...F±.F=j. F&.P.v 0000A0
C7000041 409A5016 EC468D00 0768E876 FFEA76FF 0AC48341 3900029A FC76FFFE ±.v=.Ø.9A.á..võ.vÒh=..F$.| MA..ú 0000C0
76FF0AC4 833ED400 D29AFC76 FFFE76FF 5016EC46 8D0A6A00 00FE46C7 0001FC46 F=..úF±..j..F&.P.v±.v=.Ø.à>.á..v 0000E0
468000CA 68E876FF EA76FF00 EC46C600 0041649A 5016EC46 8D00086B E876FFEA õ.vÒhÄ..F&.P.dA..óF$..võ.vÒhò..F 000100
00E90000 B8000026 049A5016 EC468D00 CC68E876 FFEA76FF 00004177 9A5016EC &.P.wA...võ.vÒhe..F&.P..&..|..Õ. 000120
9A5016F8 46800876 FF0A76FF D88E40A9 881E5657 00000CC8 0004CAC9 5F5E1F00 ..^_èò..à...WV.|`ã.Ä.v..v..F½.P. 000140
FE5689FC 4689F656 8BF4468B 00003DC6 9A5016F4 46800876 FF0A76FF 00004089 ¿ã...v..v..F¶.P.ó=...F¶.V-.F=.V± 000160
68F876FF FA76FF00 1AE90375 FF015CBF 8326FC5E C4408740 A19A0876 FF0A76FF .v..v..Àã.ãá^=&.¢\..u.Õ...v*.v½h 000180
8926015A 87892600 008BFC5E C400003B 3D9A006A 006A0676 FF006A01 6468000A Õ.hd.j..v.j.j..=;..á^=|..&..Z.&. 0001A0
56570001 56C80006 CAC95F5E 1F0000E9 000088FF FF015C87 C726FC5E C4015887 .X.á^=&ú.\...|..Õ...^_èò..àV..WV 0001C0
A09A5016 FF0A8680 0A76FF0C 76FF0000 FEAA86C7 000AFF62 86C7D88E 4190881E .|.A.Äú.b.Õ.ú.¯±...v.¯v......P.. 0001E0
```

Dump of file SATURN:[PCCOMMON.DUMP.DLL]DAPSETDF.TMP;1 on 18-APR-1990 10:42:54.27
File ID (609,9,0)   End of file block 85 / Allocated 88

Virtual block number 37 (00000025), 512 (0200) bytes

```
5016FF06 86800A76 FF0C76FF 000030B6 9A5016FF 02868D0A 76FF0C76 FF000041 A...v..v......P.Ñ=...v..v......P 000000
62B6FFFF 0AB6FFFF ( B6FFFF 609689FF 5E8689FF 089688FF 06868800 0041B09A .¯A...........^...'..Ñ...Ñ...Ñb 000020
E90000B8 0006E903 ¯.0846OB 06468800 0041EF9A 006A006A 006A006A 016E68FF .hn.j.j.j.j..ÿA...F..F.t.Õ..¡..Õ 000040
F8868900 003E109A 5016FEFA 8680136A 0676FF08 76FFFF02 86FFFF04 86FF0107 ...Ñ...Ñ...v..v.j...'±.P..>....% 000060
E9FF0096 89FEFE86 89FEFC96 88FEFA86 88000AE9 00008800 06E90375 000030FE ±=..u.Õ..¡..ÕÕ...'±..*±..±±....Õ 000080
FE9EC40A 76FF0C76 FF00ACE9 03750247 08260788 26FEFE9E C404FEFE 86830005 ....±±.6.±±&..&.G.u.Õ¯..v..v.6.± 0000A0
5016FF0E 86805016 FF5A8680 5016FF64 86800676 FF0876FF 37FF2602 77FF26FE ±&.w.&.7.v..v...d..P..Z..P.....P 0000C0
805016FE AC868000 70E90000 B80006E9 03750000 3041C943 B09A5016 FEAC8680 ..¯±.P.¯CèA=..u.Õ..¡..Õp...¯±.P. 0000E0
FFFF0AB6 FFFF0CB6 FF10C483 4006000C 9A5016FF 68868006 FC681E50 16FF0E86 ....P.h=...h..P.Ê.øã.6..Ñ...Ñ... 000100
FFFF0AB6 FFFF0CB6 FF000043 989A5016 FF688680 FEAAB6FF 006A0161 68FF62B6 Ñb.ha.j..Ñ¯±..h..P..C...Ñ...Ñ... 000120
FEAAB6FF 00004280 9A37FF26 0277FF26 FEFE9EC4 FEAAB6FF 006A0169 68FF62B6 Ñb.hi.j..Ñ¯±6.±±&.w.&.7..B....¯± 000140
00F646C7 D88E4222 881E5657 00000AC8 0008CAC9 5F5E1F00 00E90000 B8FF3FE9 Õ7.¡..Õ...^_èò..À...WV.¡"B.ÁùF-. 000160
0042509A 5016F846 801E76FF 2076FF00 00423F9A 5016FC46 801E76FF 2076FF00 ..v .v..F=.P.7B...v .v..F%.P.PB. 000180
9A0E76FF 1076FF12 76FF1476 FF1676FF 1876FF1A 76FF1C76 FF1E76FF 2076FF00 ..v .v..v..v..v..v..v..v..v..v.. 0001A0
FF26125E C4F876FF FA76FF00 5EE9F646 880006E9 03750000 30F64689 4329447A ±D)C.F-=..u.Õ...F-Õ^..v*.v%6^.&. 0001C0
32E9F646 880006E9 03750000 30F64689 00004458 9A0A76FF 0C76FF37 FF260277 w.&.7.v..v..XD...F-=..u.Õ...F-Õ2 0001E0
```

Dump of file SATURN:[P:COMMON.DUMP.DLL]DAPSETDF.TMP;1 on 18-APR-1990 10:42:54.27
File ID (609,9,0)   End of file block 85 / Allocated 88

Virtual block number 38 (00000026), 512 (0200) bytes

```
30F64689 0000FFFF 9A0676FF 0876FF37 FF260277 FF260E5E C4F876FF FA76FF00 ..v*.v%6^.&.w.&.7.v..v.......F-= 000000
56570000 12C8001C CAC95F5E 1F0000E9 00008800 06E9F646 880006E9 03750000 ..u.Õ...F-Õ..¡..Õ...^_èò..À...WV 000020
76FF1876 FF000043 CD9A5016 FC468016 76FF1876 FF0000EE 46C7D88E 43B8881E .¡¡C.ÁùFŸ...v..v..F=.P.èC...v..v 000040
E89A5016 F4468000 6A1276FF 1476FFF8 76FFFA76 FF000043 D09A5016 F8468016 ..F%.P.1C...v*.v%.v..v.j..¶.P.Õ 000060
1276FF14 76FFF876 FFFA76FF 0096E9EE 46880006 E9037500 0030EE46 89000044 D...FŸ=..u.Õ...FŸÕ...v*.v%.v..v. 000080
0E468800 6DE9EE46 880006E9 03750000 30EE4689 0000454F 9A5016F0 46800E6A j..FÞ.P.OE...FŸ=..u.Õ...FŸÕm..F. 0000A0
26078926 F25688F0 4688065E C40013E9 0374F656 39001BE9 0374F446 3910568B .V.9F¶t.Õ..9V-t.Õ..6^..FÞ.V.&..& 0000C0
26065EC4 F876FFFA 76FF0257 89260789 26F65688 F4468806 5EC40010 E9025789 .W.Õ..6^..F¶.V-&..&.W..v*.v%6^.& 0000E0
46880006 E9037500 003DEE46 89000033 7E9A0A76 FF0C76FF 106A37FF 260277FF .w.&.7j..v..v..-3...FŸ=..u.Õ...F 000100
2E86C7D8 8E448288 1E565700 000CC800 14CAC95F 5E1F0000 E9000088 0006E9EE ŸÕ..¡..Õ...^_èò..àÉ..WV.¡.D.Áù.. 000120
A79A5016 80468008 76FF0A76 FF000044 979A5016 88468008 76FF0A76 FF0000FF ....v..v..F..P..D...v..v..F..P.Ì 000140
749A5016 FC468008 76FF0A76 FF000042 619A5016 84468008 76FF0A76 FF000044 D...v..v..F..P.aB...v..v..F=.P.t 000160
0676FF00 6A016A68 000A6888 76FF8A76 FFE05689 DE468986 56888446 88000040 @...F..V..FB.VÀ.v..v.hÖ.hj.j..v. 000180
76FF0217 E90375FF 328608FF 308688FF 329689FF 30868900 0043739A 006A006A j.j..sC....0...2...0...2.u.Õ...v 0001A0
168C4680 50160A46 805016F8 4680FC76 FFFE76FF FF30B6FF FF32B6FF 0876FF0A ..v..Ñ2.¸Ñ0..v±.v=.F%.P.FÕ.P.F.. 0001C0
FF01DCE9 FF2E8688 0007E903 75000030 FF2E8689 44024380 9A5016FF 34868050 P..4..P.¯C.D....=..u.Õ......ÕE.. 0001E0
```

Dump of file SATURN:[PCCOMMON.DUMP.DLL]DAPSETDF.TMP;1 on 18-APR-1990 10:42:54.27
File ID (609,9,0)   End of file block 85 / Allocated 88

Virtual block number 39 (00000027), 512 (0200) bytes

```
76FF3486 8000CC68 8876FF8A 76FF0000 46629A50 168C4680 00CA6888 76FF8A76 v..v.hò..F..P.bF...v..v.hä...4.. 000000
0046AB9A 5016FF2A 8680006A FF30B6FF FF32B6FF 8076FF82 76FF0000 47649A50 P.dG...v..v..Ñ2..Ñ0.j...*..P.¨F. 000020
B6FFFF32 B6FF8076 FF8276FF 0187E9FF 2E868800 07E90375 000030FF 2E868900 .....=..u.Õ......Õ...v..v..Ñ2..Ñ 000040
E9FF2E86 880007E9 03750000 3DFF2E86 89000044 BF9A5016 FF24868D 0E6AFF30 0.j...$..P.«D......=..u.Õ......Õ 000060
C70006D8 46C70010 E90374FE 56390018 E90374FC 4639FF26 9688FF24 8688015 Y...$...&.9F=t.Õ..9V±t.Õ..úFÀ..ú 000080
E90374FE 56390018 E90374FC 4639FF2C 9688FF2A 86880005 E246C700 07FF2886 .(...úFã....*....,9F=t.Õ..9V±t.Õ 0000A0
FF30B6FF FF32B6FF 8076FF82 76FF0002 E246C700 04FF2886 C70003D8 46C70010 ..úFÀ..ú.(...úFã...v..v..Ñ2..Ñ0. 0000C0
0008E9FF 2E868800 07E90375 000030FF 2E868900 0047809A 5016F446 80E276FF .vã.F¶.P..G......=..u.Õ......ÕÙ. 0000E0
46800006 688876FF 8A76FF0A C48347A7 00029AF4 76FFF676 FF5016E4 46800A6A j..FÕ.P.v¬.v¶.Ð.¦G.6..v..v.h=..F 000100
9A5016F4 4680FF28 B6FFFF30 B6FFFF32 B6FF8076 FF8276FF 000047B8 9A5016E4 Õ.P.£G...v..v..Ñ2..Ñ0..Ñ(..F¶.P. 000120
76FF5016 E44680DA 6A0084E9 FF2E8688 0007E903 7500003D FF2E8689 000047D6 øG......=..u.Õ......Õ..j..FÕ.P.v 000140
FF000048 119A5016 E4468000 07688876 FF8A76FF 0AC48347 FD00029A F476FFF6 -.v¶.Ð.»G.6..v..v.h=..FÕ.P..H... 000160
0030FF2E 86890000 3E8F9A50 16F44680 D876FFFF 30B6FFFF 32B6FF80 76FF8276 v..v..Ñ2..Ñ0..vÀ.F¶.P..>......=. 000180
83435200 D29AF476 FFF676FF 5016E446 800A6A00 2EE9FF2E 86880007 E9037500 .u.Õ......Õ..j..FÕ.P.v¬.v¶.Ð.RC. 0001A0
CAC95F5E 1F0000E9 00008800 0040EA9A 5016E446 80000868 8876FF8A 76FF0AC4 6..v..v.hÀ..FÕ.P.õã..¡..Õ...^_èò 0001C0
5016FF12 86800E76 FF1076FF 0000FEBC 86C7D88E 4579B81E 56570001 44C80006 ..àD..WV.¡yE.Áù.¥±...v..v......P 0001E0
```

```
Dump of file SATURN:[PCCOMMON.DUMP.DLL]DAPSETDF.TMP;1 on 18-APR-1990 10:42:54.27
File ID (609,9,0)   End of file block 85 / Allocated 88

Virtual block number 40 (00000028), 512 (0200) bytes

 FF0A868D 0E76FF10 76FF0000 459F9A50 16FF0E86 800E76FF 1076FF00 00458F9A ..E...v..v......P..E...v..v..... 000000
 FF0C968B FF0A868B 000045BF 9A5016FF 66868D0E 76FF1076 FF000045 AF9A5016 .P.££...v..v...f..P.«E.......... 000020
 26024789 2600008C 065EC407 89260247 89260000 880A5EC4 FF649689 FF628689 ..b...d.á^.¡..&.G.&..á^.¡..&.G.& 000040
 B6FFFF14 B6FF0000 48CE9A50 16FF1686 804B6A00 CA68FF12 B6FFFF14 B6FF0789 ...Ñ...Ñ..hò.jK.....P.oH...Ñ...Ñ 000060
 04C48348 F500869A 5016FF16 86800000 3E059A50 16FEBE86 804B6A00 CC68FF12 ..hë.jK../±.P..>.......P.Ñ.%H.á. 000080
 B6FF016A 006A08C4 8349A100 569A5016 FF6A868D 0702681E 0037E903 7400003D *..t.Ö7..h....j..P.V.Àl.á.j.j..Ñ 0000A0
 FF0191E9 00018800 00497A9A 206A006A 0721681E 5016FF6A 868DFF12 B6FFFF14 ...Ñ....j..P.hl.j.j .zl..¡..Ö... 0000C0
 0000087D 9A0A76FF 0C76FF00 6A006A18 6A5016FF 16868002 6AFF0E86 FFFF1086 Ñ...Ñ..j......Pj.j.j..v..v..)... 0000E0
 6A462A50 069A072E 681E5016 FF6A8680 FEBCB6FF 0039E903 7500003D FEBC8689 ..¥±=..u.Ö9..Ñ¥±..j..P.h....P*Fj 000100
 868B0000 19989A20 6A006A07 43681E50 16FF6A86 8DFF1286 FFFF1486 FF016A00 .j..Ñ...Ñ....j..P.hC.j.j ....... 000120
 569A5016 FF6A868D 0750681E 005DE903 7402470B 26078826 0A5EC401 2BE9FEBC ¥±Ö+.á^.&..&.G.t.Ö]..hP...j..P.V 000140
 86800758 681E08C4 8349C700 109A5016 FF6A8680 5016FF16 868008C4 83498500 .çl.á......P..j..P...úl.á..hX... 000160
 681E5016 FF6A8680 FF12B6FF FF14B6FF 016A006A 08C48347 5000109A 5016FF6A j..P...PG.á.j.j..Ñ...Ñ....j..P.h 000180
 3004C483 4A140086 9A5016FE BE868000 BFE90001 B800004A 349A206A 006A076F o.j.j .4J..¡..Ö«.../±.P.Ñ..J.á.= 0001A0
 1486FF01 6A006A08 C48348DB 00569A50 16FF6A86 8D077C68 1E0037E9 03740000 ..t.Ö7..h|...j..P.V.ÚH.á.j.j..Ñ. 0001C0
 B6FF0072 E90001B8 00004A9F 9A206A00 6A079868 1E5016FF 6A8680FF 12B6FFFF ..Ñ....j..P.h..j.j ..J..¡..Ör..Ñ 0001E0

Dump of file SATURN:[PCCOMMON.DUMP.DLL]DAPSETDF.TMP;1 on 18-APR-1990 10:42:54.27
File ID (609,9,0)   End of file block 85 / Allocated 88

Virtual block number 41 (00000029), 512 (0200) bytes

 0676FF08 76FF37FF 260277FF 260A5EC4 126A5016 FEBE8680 036AFF0E B6FFFF10 ...Ñ..j.../±.Pj.á^.&.w.&.7.v..v. 000000
 9A07A568 1E5016FF 6A8680FE BCB6FF00 39E90375 00003DFE BC868900 00493C9A .<I....¥±=..u.Ö9..Ñ¥±..j..P.hE.. 000020
 159A206A 006A07BA 681E5016 FF6A8680 FF12B6FF FF14B6FF 016A006A 49505006 .P]Ij.j..Ñ...Ñ....j..P.hα.j.j .. 000040
 2AB81E56 57000104 C8000CCA C95F5E1F 0000E900 00880006 E9FEBC86 88000049 I....¥±Ö..¡..Ö...^_èò..à...WV.¡* 000060
 00004B41 9A5016FF 3A86800E 76FF1076 FF0000FF 4086C700 00FF1A86 C7D88E48 H.Äú.....ú.∂....v.¯v...:..P.AH.. 000080
 48749A50 16FF6486 800E76FF 1076FF00 0048529A 5016FF32 86800E76 FF1076FF .v..v...2..P.RH...v..v...d..P.tH 0000A0
 2C868900 004B4F9A 006A006A 006A006A 01606800 DA68FF3A B6FFFF3C B6FF0000 ...Ñ<..Ñ:.hÖ.h'.j.j.j.j..OK...., 0000C0
 DA68FF3A B6FFFF3C B6FF0186 E9037300 FF2CBE83 FF2CBEFF 0004E9FF 2CBEFFFF ...,Ö.......ƒ,..s.Ö...Ñ<..Ñ:.hÓ 0000E0
 FFFF34B6 FFFF5A96 89FF5886 89000045 E59A006A 006AFF2C B6FF006A 016A6800 .hj.j..Ñ,.j.j..lE....X...Z..Ñ4.. 000100
 75000030 FF1A8689 00004B06 9A5016FF 1686800D 6AFF5886 FFFF5AB6 FFFF3286 Ñ2..Ñz..Ñx.j.......P.øK......=..u 000120
 FFFF3CB6 FF016A00 6A4BF750 069A07C7 681E5016 FF688680 FF1AB6FF 0039E903 .Ö9..Ñ....h..P.hú...P%Kj.j..Ñ<.. 000140
 34B6FF04 42E9FF1A 86880000 4C149A20 6A006A07 E4681E50 16FF6886 8DFF3AB6 Ñ:...h..P.hÖ.j.j ..L......ÖB..Ñ4 000160
 003DFF1A 86890000 467D9A50 16FF0E86 8D0E6AFF 5886FFFF 5AB6FFFF 3286FFFF ..Ñ2..Ñz..Ñx.j.......P.)F......=. 000180
 3CB6FF01 6A006A4C F850069A 07F1681E 5016FF68 868DFF1A B6FF0039 E9037500 .u.Ö9..Ñ....h..P.hþ...P%Lj.j..Ñ< 0001A0
 8803E0E9 FF1A868B 00004015 9A206A00 6A080E68 1E5016FF 68868DFF 3AB6FFFF ..Ñ:...h..P.h..j.j ..M......ÖA.. 0001C0
 39085688 06468800 33E90374 FF189639 003CE903 74FF1686 39FF6696 88FF6486 .d...f.9...t.Ö<.9...t.Ö3..F..V.9 0001E0

Dump of file SATURN:[PCCOMMON.DUMP.DLL]DAPSETDF.TMP;1 on 18-APR-1990 10:42:54.27
File ID (609,9,0)   End of file block 85 / Allocated 88

Virtual block number 42 (0000002A), 512 (0200) bytes

 5286C700 04FF0C86 C70003FF 3E86C700 18E90374 FF109639 0024E903 74FF0E86 ...t.Ö$.9...t.Ö..ú.>...ú.....ú.R 000000
 74FF1896 39003EE9 0374FF16 86390856 88064688 0050E900 01FF4086 C70002FF ...ú.∂...ÖP..F..V.9...t.Ö>.9...t 000020
 86C7001B E90374FF 10963900 24E90374 FF0E8639 FF669688 FF64868B 0035E903 .Ö5...d...f.9...t.Ö$.9...t.Ö..ú. 000040
 FF34B6FF FE6CE900 03E90001 FF4086C7 0005FF52 86C70007 FF0C86C7 0006FF3E >...ú.....ú.R...ú.∂...Ö..Öl±.Ñ4. 000060
 3DFF1A86 8900004D 389A5016 FF36868D FF0CB6FF FF58B6FF FF5AB6FF FF32B6FF .Ñ2..Ñz..Ñx..Ñ....6..P.;M......= 000080
 B6FF016A 006A405C 50069A08 18681E50 16FF6886 80FF1AB6 FF0039E9 03750000 ..u.Ö9..Ñ....h..P.h....P\Mj.j..Ñ 0000A0
 02DFE9FF 1A868800 004D799A 206A006A 0838681E 5016FF68 868DFF3A B6FFFF3C <..Ñ:...h..P.h8.j.j .yM......ÖÖ. 0000C0
 8900004D 9F9A5016 FF60868D FF52B6FF FF58B6FF FF5AB6FF FF32B6FF FF34B6FF .Ñ4..Ñ2..Ñz..Ñx..ÑR...'..P..M... 0000E0
 006A4A82 50069A08 45681E50 16FF6886 8DFF1AB6 FF0039E9 03750000 3DFF1A86 ...=..u.Ö9..Ñ....h..P.hE...P.Jj. 000100
 1A868800 0049E79A 206A006A 0862681E 5016FF60 868DFF3A B6FFFF3C B6FF016A j..Ñ<..Ñ:...h..P.hb.j.j .Öl..... 000120
 299A5016 FF5C868D FF3EB6FF FF58B6FF FF5AB6FF FF32B6FF FF34B6FF 027BE9FF .Ö(..Ñ4..Ñ2..Ñz..Ñx..Ñ>...\..P.) 000140
 50069A08 6F681E50 16FF6886 8DFF1AB6 FF0039E9 03750000 3DFF1AB6 89000047 G.......=..u.Ö9..Ñ....h..P.ho...P 000160
 004E899A 206A006A 088C681E 5016FF68 868DFF3A B6FFFF3C B6FF016A 006A4E6C lNj.j..Ñ<..Ñ:...h..P.h..j.j ..N. 000180
 00004EA8 9A5016FF 1C86800A 6A000668 FF3AB6FF FF3CB6FF 0217E9FF 1A868800 .....Ö...Ñ<..Ñ:.hø.j......P.¨N.. 0001A0
 8639FF30 9688FF2E 8688FF30 9689FF2E 868904C4 834E8500 CE9A5016 FF1C868D .....P.ò.çN.á.......0.......0.9. 0001C0
 FF58B6FF FF5AB6FF FF32B6FF FF34B6FF 0064E903 75FF6296 390009E9 0374FF60 '.t.Ö..9.b.u.Öd..Ñ4..Ñ2..Ñz..Ñx. 0001E0
```

```
Dump of file SATURN:[PCCOMMON.DUMP.DLL]DAPSETDF.TMP;1 on 18-APR-1990 10:42:54.27
File ID (609,9,0)   End of file block 85 / Allocated 88

Virtual block number 43 (0000002B), 512 (0200) bytes

8DFF1AB6 FF0039E9 03750000 3DFF1AB6 8900004E F79A5016 FF2E868D FF52B6FF .ÑR......P.%N......=..u.Õ9..Ñ... 000000
5016FF68 868DFF3A B/FFFF?? B6FF016A 006A4F18 50069A08 99681E50 16FF6886 .h..P.h....P.Oj.j..Ñ<..Ñ:...h..P 000020
6A000768 FF3AB6FF FF3CB6FF 0168E9FF 1A868800 004F359A 206A006A 08B66P?F .hÑ.j.j .5O......Õk..Ñ<..Ñ:.hm.j 000040
9689FF54 868904C4 834F6100 CE9A5016 FF42868D 00004F54 9A5016FF 428680U/ ...B..P.TO....B..P.ö.mO.á...T... 000060
FF34B6FF 0064E903 75FF3896 390009E9 0374FF36 8639FF56 9688FF54 8688FF56 /...T...V.9.6.t.Õ..9.8.u.Õd..Ñ4. 000080
3DFF1AB6 8900004F A39A5016 FF54868D FF0CB6FF FF5886FF FF5AB6FF FF32B6FF .Ñ2..ÑZ..ÑX..Ñ....T..P.ÉO......= 0000A0
B6FF016A 006A4FC4 50069A08 C3681E50 16FF6886 8DFF1AB6 FF0039E9 03750000 ..u.Õ9..Ñ....h..P.hù...PáOj.j..Ñ 0000C0
00BFE9FF 1A868800 004FE19A 206A006A 08E0681E 5016FF68 868DFF3A B6FFFF3C <..Ñ:...h..P.hÁ.j.j .ÁO......Õ¢. 0000E0
CE9A5016 FEFC868D 00004886 9A5016FE FC86800A 6A000868 FF3AB6FF FF3CB6FF .Ñ<..Ñ:.hÁ.j...•±.P.ÑH....•±.P.ö 000100
390009E9 0374FF5C 8639FF14 9688FF12 8688FF14 9689FF12 868904C4 8349FA00 .•I.á..................9.\.t.Õ..9 000120
FF12868D FF3EB6FF FF58B6FF FF5AB6FF FF32B6FF FF34B6FF 0064E903 75FF5E96 .^.u.Õd..Ñ4..Ñ2..ÑZ..ÑX..Ñ>..... 000140
ED681E50 16FF6886 8DFF1AB6 FF0039E9 03750000 3DFF1AB6 8900003C 289A5016 .P.(<......=..u.Õ9..Ñ....h..P.hù 000160
206A006A 090A681E 5016FF68 868DFF3A B6FFFF3C B6FF016A 006A4FF7 50069A08 ...P%Oj.j..Ñ<..Ñ:...h..P.h..j.j 000180
1F0000E9 0000884B 9525659A 006A0E76 FF1076FF 0013E9FF 1A868800 004BB29A .ÿK......Õ...v..v.j..e%.K¡..Õ... 0001A0
E9037500 00300000 FFFF9A0E 76FF088E 4A8FB81E 56570000 00C8000C CAC95F5E ^_èò..à...WV.¡¢J.Á.v......=..u.Õ 0001C0
0A76FF0C 76FF0917 681E0026 E90000FF FF9A0A76 FF0C76FF 0096680E 76FF0014 ...v.h...v..v......Õ&..h...v..v. 0001E0
```

```
Dump of file SATURN:[PCCOMMON.DUMP.DLL]DAPSETDF.TMP;1 on 18-APR-1990 10:42:54.27
File ID (609,9,0)   End of file block 85 / Allocated 88

Virtual block number 44 (0000002C), 512 (0200) bytes

E9000^B8 08C4834E 0900109A 0A76FF0C 76FF0676 FF0876FF 08C48350 5700569A .V.WP.á..v..v..v..v.....N.á.¡..Õ 000000
2BF20005 03400008 0C170203 03B80009 0ACA0203 00789000 0ACAC95F 5E1F0000 ...^_èò...x...ò...¡........ə...+ 000020
42B90203 00000001 4DC00002 02C30008 32C50203 03E30009 2CA40205 1BE00001 ..À...È,..D...é2..ù...áM......¿B 000040
2CA10202 007F0001 4B190103 02460008 4AED0203 25650001 2FEF0005 00640004 ..d...ÿ/..e%..ÙJ..F....K......À, 000060
0A050203 00040001 05950103 00000003 50430002 015A0006 03630203 03E30009 ..D...c...Z...CP................ 000080
464E0103 03ED0009 2CDC0205 1FEC0001 2FF50005 01CC0008 102E0203 03C40009 ..á........ä...%/..š...È,..Ù...NF 0000A0
2C090202 00700004 48740203 00870001 4DFC0103 306E0001 2FCE0005 00860001 ......ö/..n=..•M......tK..p...), 0000C0
37460103 02D30008 1FDB0203 00880001 4DD00103 02520008 4ADC0203 03ED0009 ..Ù...ÉJ..R...)M.......Ù...Ł...F7 0000E0
201A0205 28760001 30510005 38F40001 2F840005 00000005 500E0002 00080001 .......P......./..¶8..O0..v(....- 000100
20170202 00130001 373D0103 035A0008 07040203 03790009 30A70205 03F80009 ..½...I0..y........Z...•7.......- 000120
1B1C0203 01DE0008 031A0203 00700004 3A450203 03790009 30A40202 03F80009 ..½...É0..y...E:..).......8..... 000140
20560205 02620008 00880203 00000001 32C20005 016E0006 50160203 00F60005 ..-....P..n...ò2..........b...V- 000160
20380205 00870004 3FAD0203 04020009 20530202 02E30008 32E70203 04020009 ......ò2..D...S-.......Ù7.......8- 000180
0FAB0203 017C0006 502F0203 00140003 31AD0203 038C0009 2BCD0205 040C0009 ......e+.......Ù1......./P..|....-. 0001A0
32A30203 00930004 37EC0203 038C0009 2BCA0202 040C0009 20350202 01EF0008 ..ÿ...S-.......ò+.......£7......É2 0001C0
442C0203 04160009 20700205 02760008 1B040203 03ED0009 0A960203 02F40008 ..¶.......Ù.......v...p-.......,0 0001E0
```

```
Dump of file SATURN:[PCCOMMON.DUMP.DLL]DAPSETDF.TMP;1 on 18-APR-1990 10:42:54.27
File ID (609,9,0)   End of file block 85 / Allocated 88

Virtual block number 45 (0000002D), 512 (0200) bytes

2BD30205 04160009 2D6D0202 00220003 1B120203 01890006 29580203 01060006 ......[)..........".. m-.......Æ+ 000000
0AD80203 009F0004 03440203 039A0009 2BD00202 091D0001 32A00005 039A0009 .......2.......Á+......D........Ä. 000020
32920203 02830008 48630203 02020008 32FD0203 04220009 2DAE0205 03790009 ..y...Ù-..."...•2.......cH.......2 000040
2C300205 01170006 12350203 1E260001 2C110005 04220009 2DAB0202 03030008 ......-.."........&...5.......0, 000060
2BEC0005 04200009 2DEA0205 00AD0004 3FE50203 36AC0001 2E350005 03AA0009 ..-...5...-6..[?..Ù...õ-...-...$+ 000080
2DE70202 02110008 0E160203 082F0001 32030005 03AA0009 2C200202 1B200001 ..-...-,...-...Æ2../...........Ô- 0000A0
09C60203 3AB30001 2FA90005 00330004 3F5F0203 03120008 06660203 04200009 ..-...f........?..3...'/..•:..6. 0000C0
2DCC0205 26B70001 304B0005 1AB40001 32B10005 02940008 2F6F0203 038C0009 ......o/.......Ÿ2..Ç...KO..ñ&..ä- 0000E0
2C270202 04380009 2DC90202 01A20007 37920203 03B80009 2C2A0205 04380009 ..8...•,..I.....7..Å...è-..8...', 000100
2C080005 003F0004 3FF60203 04160009 0ABD0203 01200006 36360203 03B80009 ..¡...66..-...§.......-?..?...., 000120
02260203 02A50008 32B40203 03C40009 2C490205 00C00004 010F0203 103F0001 ..?.......á...I,..á...Ç2..È...&. 000140
2F230005 004A0004 4CD70203 03C40009 2C460202 02270008 317B0203 03260008 ..&...(1..'...F,..á...•L..J...#/ 000160
2CB30202 00000004 01?E0203 03CF0009 2C860205 01300006 4A610203 404C0001 ..Lə..•J..=......,..Ü.......Å...., 000180
4E4B0203 02360008 4A'?0203 02B30008 32D60203 05530001 32E40005 03CF0009 ..ü...Õ2..S...•2..•...±J..6...KN 0001A0
2CBF0202 01400006 195U0203 01800008 00B80203 03090009 2CC20205 00580004 ..X...ò,..)...É...§...P...M...¢, 0001C0
01C80001 881F0200 3E89088E FFFFB81E 00000000 000F0004 19EE0203 03090009 ..)...Ÿ...Ô......¡...Å.>...¡..ü. 0001E0
```

```
Dump of file SATURN:[PCCOMMON.DUMP.DLL]DAPSETDF.TMP;1 on 18-APR-1990 10:42:54.27
File ID (609,9,0)   End of file block 85 / Allocated 88

Virtual block number 46 (0000002E), 512 (0200) bytes

 00000000 00000000 00000000 00000000 00000000 00000000 00000400 02000200 ................................ 000000
 2BD1F7AE F2FFFFB9 0A7EC4FF 758DAEF2 FFFFB9C0 33067EC4 1EDE88D7 88EC8855 U.&.m.8.á-.3à¿...Ü.u.á-.¿...Ú%1+ 000020
 88F388A4 F3C913A5 F3E9D149 A4027400 01C6F706 4688FE87 08468ED8 8EC08CF9 *.à.Ã.F...±.F.Xó..t.Él1ÕµÈ.èµÈ.µ. 000040
 D1F7AEF2 FFFFB9C0 33C08ED8 8CFE880A 76C51EDE 88D788EC 8855CB5D C28C1FFA *..ó]ùU.&.m.8.év..±.Ã.à3à¿...Ú%1 000060
 88EC8855 CB5DC28C 1FFA88F3 88A4F3C9 13A5F3E9 D149A402 7401A8C7 88067EC4 á-..ú¯.t.Él1ÕµÈ.èµÈ.µ.*..ó]ùU.&. 000080
 881FFFFF 1DC01805 74A6F3F9 2BD1F7AE F2FFFFB9 C0330A7E C40676C5 1EDE88D7 m.8.év.á-.3à¿...Ú%1+*µlt..á..... 0000A0
 85E900C8 5DFA8891 49D1F7AE F2FFFFB9 C033067E C4D788EC 885500CB 5DFA88F3 µ.*]ù.U.&.má~.3à¿...Ú%1l..*]ù.Õ. 0000C0
 46890E46 8DFA568C F84689EC 46805657 000016C8 0CD0E901 835756EC 8855000C ..U.&VW*.ÕÃ.à...WV.F&.F%.V*.F..F 0000E0
 57892607 89260857 89260647 89260856 88064688 420A47C6 26F85EC4 FE568CFC *.V±á^¥&óG.8.F..V.&.G.&.W.&..&.W 000100
 F85EC4F0 880CC483 015102D2 9A53060A 76FF0C76 FFFC76FF 167FFF04 47C72602 .&úG.....v*.v..v..$.0.Q..á..Þá^% 000120
 5C9A006A 53FA76FF 900FEB05 88260247 8E2607FF 263F8826 C02A1278 044FFF26 &.O.x.*à&.?&..&.G.&..$...v*Sj..\ 000140
 C388FA46 89E42A08 478A2608 5EC45657 000008C8 C8C95F5E C68806C4 83FFFF01 ....á..ó^_èùà...WVá^.&.G.*ò.F*.ù 000160
 F6260774 830A47F6 26F84689 196C05E0 D1C103E0 D1C888F9 F7000C89 990D782D -x..¿..¥*¯àlÃ.èlÃ.l..F¥&-G..t.&- 000180
 80260E74 010A47F6 26085EC4 90012BE9 FFFF8820 0A4F8026 085EC40F 74400A47 G.ât.á^.&.O. ¡..Õ+..á^.&-G..t.&. 0001A0
 7689F088 04478926 C02BEF0A 67802602 0A4F8026 90E2E800 000447C7 26200A4F O. &úG...$ã.&.O..&.g.ÿ+ã&.G..Þ.v 0001C0
 087E8137 7501196C 87F60608 68F9F700 0C899900 782DC388 4C750C0A 47F626FC •&-G..uL.û-x..¿..¥*kÃ.-.l..u7.-. 0001E0

Dump of file SATURN:[PCCOMMON.DUMP.DLL]DAPSETDF.TMP;1 on 18-APR-1990 10:42:54.27
File ID (609,9,0)   End of file block 85 / Allocated 88

Virtual block number 47 (0000002F), 512 (0200) bytes

 78118C9A FA76FF0F 75FFFF0A 7E811675 0090087E 810E7402 050A7E81 07750084 ..u..-...t..~...u..-...u..v*...x 000000
 C3881575 080A47F6 26085EC4 04C48300 08E80876 FF0A76FF 0C75C008 02C48302 ..á..áu..v..v.Ò...á.á^.&-G..u..ù 000020
 47882606 77282637 8826085E 88677401 196C87F6 06D868F9 F7000CB9 990D782D -x..¿..¥*kÃ.-.l..tg.^.&.7&+w.&.G 000040
 FF265256 167EF60B 04478926 4802458B F87E8802 57892607 89264008 57882606 .&.W.a&..&.W..-%.E.H&.G..--.VR&. 000060
 006A026A 0F74201F 7D87F6FA 5E8819EB FC468908 C4830296 0FF49AFA 76FF0677 w..v*.¶....á..F=$..^*-.). t.j.j. 000080
 46805600 018E17EB 07882606 468A065F C426085E C408C483 02890FB6 9A53006A j.S.Ñ.¿..á.á^.&á ..F.&..$.ƒ..V.F 0000A0
 5F5EE42A 06468AFE CCE90374 FC7639FC 468908C4 8301260F F49AFA76 FF501606 ..P.v*.¶.&..á..F=9v*t.Òà±.! .*ò^ 0000C0
 2286A310 56880E46 8822C81E 8C22C6A3 22CC8802 0F11809A 000A88EC 8855CBC9 èùU.$¡....¯...¡ª"Éó"..à".F..V.ÉÑ" 0000E0
 038DE900 0022C006 C7000022 C206C722 9E168922 9CA30856 88064688 22881689 ..¡".F..V.É."..."ú.ô"..ú.â"..Õ.. 000100
 228CA322 A4A3228E A322A2A3 22A6A3C0 28000122 C406C703 08E90374 25F67E80 .—Xt.Õ..ú.á"..+àÉ|"ÉÃ"É/"ÉÉ"ÉV" 000120
 C70A46FF 49753001 7F80260A 5EC40020 242C06C7 22B4A322 9AA322A0 A322BAA3 Éo"É."É."ÉÇ"ú.,$ .á^.&...Oul.F.ú 000140
 80269028 EB000022 BA06C722 A606FF0D 752B3F80 260A5E88 903EE800 30242C06 .,$0.$>..^.&.?+u...|"ú.o"..$(.&. 000160
 75203F80 260A5EC4 00EB229A 06FF9014 EB22BA06 FF1A7500 22A63E83 0E75203F ? u..>|".u...o"$....."$.á^.&.?-u 000180
 76FF0C76 FFDD75C0 0802C483 0978E80E 5098078A 260A5E88 0A46FF22 B406FFC7 ù..Ç".F..^.&...P.Òx..á..áu|.v..v 0001A0
 22CAA122 B406FF0C 7D0022CA 3E830C56 890A4689 08C48308 C7E80E22 CA681E0A ..hò".Òù..á..F..V..>ò".)...Ç"Àò" 0001C0
 2E3F8026 0A5EC400 20242C06 C7067530 242C3E83 00740022 B43E8322 CAA308F7 ¥ÃÉò".>Ç".t..>,$0u.ú.,$ .á^.&.?. 0001E0

Dump of file SATURN:[PCCOMMON.DUMP.DLL]DAPSETDF.TMP;1 on 18-APR-1990 10:42:54.27
File ID (609,9,0)   End of file block 85 / Allocated 88

Virtual block number 48 (00000030), 512 (0200) bytes

 3E830C56 890A4689 08C48308 7BE80E22 C4681E0A 76FF060A 46FF228C 06FF2D75 u-..¥".F...v..há".Ò(..á..F..V..> 000000
 4074004E 3D3D7400 46309807 8A260A5E C422BC0E FF000122 C406C70A 7D0022C4 á".).ú.á"....¥"á^.&...=F.t==N.t@ 000020
 03754C3F 80260A5E C4097500 22A43E83 000222A4 06C70675 006C3D2B 7400683D =h.t+=l.u.ú.É"...>É".u.á^.&.?Lu. 000040
 D0EB0010 22A406C7 D8EB0001 22A406C7 90024EE9 1C75003F 80260A5E C40A46FF .F.á^.&.7.u.ÒN..ú.É"..$Àú.É"..$À 000060
 06FF0875 00583005 7400473D 0A740045 3DF84689 98078A26 C8EB0008 22A406C7 ú.É"..$à&....F½=E.t.=G.t.=X.u... 000080
 0152E903 7E013FE9 03750063 3D0191E9 037E7874 00693DF8 468B20F8 468322A2 Ã".F½ .F½=i.tx-.Õ..=c.u.Ò?.-.ÒR. 0000A0
 07892622 C0A11FC4 2622B61E C4157502 22A43E83 900159E9 0140E903 7500253D =X.u.Õ@.ÒY...>É".u.á.Ñ"&á.Àà"&.. 0000C0
 750022C2 3E830422 B6068307 892622C0 A11FC426 22B61EC4 00EB0000 0247C726 &úG...$.á.Ñ"&á.Àà"&....Ñ"..>ó".u 0000E0
 E9FFFF88 01AFE903 75200A47 F626229C 1EC401BD E9037400 22C03E83 0170E903 .Òp..>â".t.Ò§.á.."&-G. u.ÒÉ.¡..Õ 000100
 22A006FF F2EB086A 90C3EB02 C483019E E80E0A6A 0000229A 06C7228E 06FF01AC ¯...ƒ"ú.."..j..Ò...á.$ú.j.$·..." 000120
 287A7401 22A43E83 0081E903 750822A4 3E830004 22C406C7 22BC06FF 22A206FF ..Ã"..¥"ú.á"...>É".u.Õ...>É".tz+ 000140
 000022CA 06C70A74 0022B43E 83FA4689 22CAA128 7422CA06 39FA4689 22A4A3C0 àÉÉ".F*9.ò"t(Àò".F*.>Ç".t.ú.ò".. 000160
 0130E80E 106A0222 B6068322 CAA3C02B 027DC00B 22CAA105 22CA2E83 909013EB $.....ò".Àò".á).+àÉò"..Ñ".j..ÒO. 000180
 A300052D FA468B15 740022B4 3E832274 00FA7E83 02C48304 8DE80E3A 6A02C483 .á.j:.Ò...á..~*.t".>Ç".t..F*-..É 0001A0
 8300F1EB 0E106A04 22B62E83 000022CA 06C79007 EB22CAA3 C02B027D C00B22CA ò".á).+àÉò"$..ú.ò"....Ñ".j..Òp.. 0001C0
 76FFF4EB 016A90FF 39E9026E E80E006A 90FF3FE9 106AFF10 E90222B6 068302C4 á...Ñ".Õ..j.Ò?..j..Òn.Ò9..j.$¶.v 0001E0
```

```
Dump of file SATURN:[PCCOMMON.DUMP.DLL]DAPSETDF.TMP;1 on 18-APR-1990 10:42:54.27
File ID (609,9,0)   End of file block 85 / Allocated 88

Virtual block number 49 (00000031), 512 (0200) bytes

 30057C00 6530FF0C E9037500 643090FF 21E90428 E80E256A FF2AE903 49E80EF8 ½.Ol.Ô*.j%.O(.Ô!..=d.u.Ô..=e.|.= 000000
 5689FC46 89400C56 E30A4688 0A4EFF0C 56880A46 88097400 22A43E83 DA7E0067 g.-O.>Ê".t..F..V..N..F..V @.F•.V 000020
 7400733D FEE0E903 7500703D FEE4E903 75006F3D FE80E903 75006E3D 903AEBFE ±$:.=n.u.Ô.±=o.u.Ôô±=p.u.Ĉ ±=s.t 000040
 FC5EC4FC 46FF9034 E80A46FF 9081E8FF 79E90375 00783DFE B9E90375 0075308F .=u.u.Ô¿±=x.u.Ôy.$Ÿ..F.$4...•á^• 000060
 C483044C E80E0A76 FF0C76FF 500A4628 C388EC75 253C0474 C00AF646 88078A26 &...F-.àt.<%u$.ù•F.P.v..v..ÒL..á 000080
 9C1EC4FC 63E90374 C00AF646 88078A26 0A5EC40C 56890A46 89FE5688 FC468806 ..F•.V±.F..V.á^.&...F-.át.Ôc•á.. 0000A0
 2C05C706 7400228C 3E835657 000012C8 CBC922C0 A1FE51E9 0374200A 47F62622 "&-G. t.ÔQ±Àä"èùà...WV.>¥".t.ú., 0000C0
 2622B61E C4197510 22A43E83 07740222 A43E8322 BE06FF04 740A067E 83002024 $ ..-..t.../".>Ê".t..>Ê".u.á.Ñ"& 0000E0
 2622B61E C4117400 22BE3E83 902CEB04 22B60683 FE5689FC 46890257 88260788 ..&.W..F•.V±..Ñ".$,..>/".t.á.Ñ"& 000100
 830222B6 0683FE56 89FC4689 99078826 22B61EC4 0EE80000 FE46C7FC 46890788 ...F•ùF±..$.á.Ñ"&....F•.V±..Ñ".. 000120
 22C81688 22C6A124 2AA3C028 9003E806 46880674 FE460BFC 46880E74 00229A3E >.".t..F•.F±t..F.$..+àÊ*$À6"..à" 000140
 26F246FF F25EC41D 750A067E 83287000 FE7E8331 7500228E 3E83F456 89F24689 .F·.V¶.>/".ul.-±.)+.-..u.á^·.F·& 000160
 46C79006 E80001F6 46C7FE56 89FC4689 DAF70002 83D8F7FE 5688FC46 882D07C6 6.·.F•.V±¼À.@.¼Ö.F•.V±úF-..$..úF 000180
 830AC483 078F1182 9AFC76FF FE76FF50 1E0676FF FA5E8CF8 468922A8 880000F6 -..¡´".F½.^*.v..P.v±.v•...¢..á.. 0001A0
 7EC90BF0 4E89C828 22C40E88 04C48302 D800869A F876FFFA 76FF4574 00228C3E >¥".tE.v*.v½.Ñ.Ü..á...á"+à.NÞ.è~ 0001C0
 C00849C1 88473005 C62605EB F27EC4F0 4E880000 242A06C7 06750824 2A3E8300 ..>*$.u.ú.*$...NÞá-·$.&6.0G.èl.à 0001E0

Dump of file SATURN:[PCCOMMON.DUMP.DLL]DAPSETDF.TMP;1 on 18-APR-1990 10:42:54.27
File ID (609,9,0)   End of file block 85 / Allocated 88

Virtual block number 50 (00000032), 512 (0200) bytes

 74C90804 88078A26 F85EC4F2 76C5EE5E 8C22A20E 88F04E89 F4468CF2 7E89F47F .¶.-·.F¶.NÞ..Â".^Ÿév·á^Ÿ&.....èt 000000
 0022BE3E 83EE5E8E F45E8CF2 7689E375 003F8026 F846FF46 202C8003 7C613C07 .<•|..., F.FŸ&.?.uÐ.v·.^¶.^Ÿ.>/". 000020
 02C48302 FFE80E50 C02802E8 00018805 7500F67E 83087422 8A060822 A6A11475 u.Â|"..¤"t..-–.u.¡..$.+äP.Ò...á. 000040
 FA5689F8 46892288 16882286 A10001BE 18740006 7E835657 000010C8 C8C95F5E ^_èùà...WV.-...t./..ÀÑ"..¡".F½.V* 000060
 FA5689F8 46890257 88260788 2622861E C4137408 22A43E83 008FE902 22860683 .¯Ñ".Ô...>Ê".t.á.Ñ"&..&.W..F½.V* 000080
 46880E74 0822A43E 83042286 0683FA5E 8CF84689 FC468907 88262286 1EC410EB $.á.Ñ"&...F•.F½.^*..Ñ"..>Ê".t..F 0000A0
 5688F846 88FA5E8C F8468909 2D880975 00FC7E83 900AE809 26881575 FA4608F8 ½.F*u.¡&.$...~•.u.¡-..F½.^*.F½.V 0000C0
 003F8026 F246FFF2 5EC490uE E822C40E 881C7422 8C3639F6 28F45689 F24689FA *.F·.V¶+-96¥"t...á"$..á^·.F·&.?. 0000E0
 843E83FE 2822CA3E 88F37500 3F8026F2 46FFF25E C44690ED E8107ECE 384613?? t.F;ó-.$Ù.Fá^·.F·&.?.uµ.>ò"+±.>Ç 000100
 740022B4 3E8306C4 830183E8 0EF876FF FA76FF56 02C48301 59E80E57 0875002. ".u.W.ÒY..á.V.v*.v½.Ò*..á..>Ç".t 000120
 83FE5689 FC468922 88168822 86A10000 06C890C8 C95F5E02 C483013C E80E5708 .W.Ò<..á.^_èù.à...ÀÑ"..¡".F•.V±. 000140
 22C406C7 06750022 8C3E83FA 4688C02A 9003E801 80057547 067E8306 7467067E -.gt..-.Gu.¯.$..*à.F*.>¥".u.ú.á" 000160
 0676FF22 C436FF22 A236FF00 0122C406 C7067500 22C43E83 007400FA 7E800006 ...-*.t..>á".u.ú.á"...6Â".6á".v. 000180
 187400FA 7E80C?C4 830D581E FF262188 068EFC76 FFFE76FF 22C636FF 22C836FF .6à".6ó".v±.v•..¡!&..X..á..-*.t. 0001A0
 00229A3E 8304C483 005C1EFF 26218806 8E22C636 FF22C836 FF147500 229A3E83 .>.".u..6à".6ó"..¡!&..\..á..>.". 0001C0
 86068304 C4830064 1EFF2621 88068E22 C636FF22 C836FF14 750022C4 3E831874 t..>á".u..6à".6ó"..¡!&..d..á...Ñ 0001E0

Dump of file SATURN:[PCCOMMON.DUMP.DLL]DAPSETDF.TMP;1 on 18-APR-1990 10:42:54.27
File ID (609,9,0)   End of file block 85 / Allocated 88

Virtual block number 51 (00000033), 512 (0200) bytes

 0D681EFF 26218806 8EFC76FF FE76FF18 7422BA06 0822A6A1 0000242A 06C70822 ".ú.*$..Â!"..¤"t..v±.v•..¡!&..h. 000000
 0022C23E 83560000 00C890C8 C90129E8 0E50C028 02E80001 880574C0 0804C483 .á..át.¡..$.+âP.Ò).èù.à...V.>ó". 000020
 10E8E42A 04882602 478E2607 FF263788 2606468A 1478044F FF26229C 1EC43C75 u<á.."&.O.x..F.&.7&..&.G.&..*ô$. 000040
 C95E22C0 06FF9005 E822C206 FF077540 06C4830A 97015C9A 0676FF53 229E36FF .6."S.v..\....á.@u...ò"$....á"^è 000060
 229C36FF 229E36FF 1BEB507E F6080676 88577500 22C23E83 56570000 02C890C8 ù.à...WV.>ó".uW.v..––P$..6.".6." 000080
 FF26229C 1EC41E7E C0084EC6 8822C206 FF047540 06C4830A FF015C9A 242C36FF .6,$.\....á.@u...ò".6N.á-.á.."&. 0000A0
 88077500 22C23E83 D4E8E42A 05882602 478E2607 FF263F88 26242CA0 D478044F O.xà.,$&.?&..&.G.&..*ô$à.>ó".u.. 0000C0
 229E36FF 22EB5E75 0022C23E 830A7688 56570000 02C8C8C9 5F5E22C0 06010646 F...á"^_èùà...WV.v..>ó".u^$".6." 0000E0
 C6880646 FF22C206 FF047540 06C48308 71015C9A 5098078A 26065EC4 229C36FF .6."6^.Ī...P.\.q..á.@u...ó".F..6 000100
 2607FF26 3F882622 9C1EC407 8A26065E C4CD7804 4FFF2622 9C1EC425 74C0084E N.àt%á.."&.O.xëá^.&..á.."&.?&..& 000120
 00000CC8 C8C95F5E 22C00601 0A468807 750022C2 3E83CAE8 E42A0588 2602478E .G.&..*ô$ò.>ó".u..F...á"^_èùà... 000140
 869AF476 FF5222CA 3688FA46 89FC4689 C028F656 89F44689 22C81688 22C6A156 VÀó"..à".F¶.V-+á.F•.F*.6ò¯R.v¶.Ñ 000160
 7508242A 3E8308E8 02EE8305 7510242A 3E830676 28F028F8 468904C4 8307AA00 .`..á..F½Þ+v..>*$.u..Ÿ.$..>*$.u 000180
 98078A26 F446FF12 7530242C 3E831975 203F8026 F45EC422 750022B4 3E834E01 .N.>Ç".u"á^¶&.?-u..>,$0u..F¶&... 0001A0
 067E831B 740022B4 3E83077E F6080874 30242C3E 83F84EFF 02C483FE 71E80E50 P.Òq±.á..N½.>,$0t..––..>Ç".t..~. 0001C0
 56297500 22843E83 0070E80E FC46FF07 7400242A 3E830066 E80EFA46 FF077400 .t..F*.Òf..>*$.t..F•.Òp..>Ç".u)V 0001E0
```

Dump of file SATURN:[PCCOMMON.DUMP.DLL]DAPSETDF.TMP;1 on 18-APR-1990 10:42:54.27
File ID (609,9,0)   End of file block 85 / Allocated 88

Virtual block number 52 (00000034), 512 (0200) bytes

7E830A74 00242A3E ‡ 0039E8 0E047500 FA7E830A 7400067E 8302C483 FE7EE80E .Ò~±.å..~..t..~•.u..Ö9..>•$.t..~ 000000
C70E7400 22843E83 06C483FE 85E80EF4 76FFF676 FFF876FF 0040E80E 047500FC •.u..Ôa..vh.v~.v¶.Ôç±.å..>Ç".t.ü 000020
500020B8 03E8002B 88057400 22A63E83 CBC95E02 C483FE38 E80E5600 20242C06 ..$ .V.Ö8±.å.^èù.>Î".t.¡+.Š.¡ .P 000040
88057400 22A23E83 17751024 2A3E8302 C483FDC8 E80E306A CB02C483 FD02E80E .Ò•».å.ùj0.Òâ».å..>•$.u..>Å".t.¡ 000060
80260A5E C40001FE 46C75657 000006C8 CB02C483 FDAAE80E 50007888 03E80058 X.Š.¡x.P.Ò`».å.ùâ...WVúF±..å^.&. 000080
C708752D 3F80260A 5EC49060 E80A46FF 0222B606 8337B826 22861EC4 12752A3F ?•u.å.Ñ"&.7..Ñ"..F.$'.å^.&.?-u.ú 0000A0
0A75228C 3639387F 393C3F7C 303CFA46 88078A26 0A5E88F6 280A46FF FFFFFE46 F±...F.+~.^.&...F•<0|?<9.;96¥"u. 0000C0
D1CE0302 E1C1CE88 98058A26 187F3930 802606E8 F8880030 242C06C7 0675303C <0u.ú.,$0..«Š.&.=9..&....öèÅ..öl 0000E0
26065EC4 F088EEF7 FE46880C 468C0A7E 89DF7D30 30802647 F18830E9 83C803E1 Å.å.Ò0.þG&.=0}Ö.~..F..F±¥Y.þá^.& 000100
FC7EC406 4E8AFE5E 8CFC4689 09348857 000004C8 CBC95F5E 0C5688DA 46883789 .7.F..V.^ èùâ...W¡4..F=.^±.N.á-• 000120
FE468CFC 7E899009 E8FE468C FC7E8900 0188F475 00382611 74003D80 264701E8 $.G&.=.t.&8.u¶¡...~•.F±$...~•.F± 000140
2D3C50F7 74093CF8 74203CAC D83399C0 330676C5 1E5657EC 885590C8 C95FC028 +á_èù.U.&WV.év.3á.3U¯< t«<.t¥P<- 000160
03D2D1E3 D1D2D1E3 D1FA88C8 8802D1E3 D1187230 2C1F7739 3CAC0175 283C0474 t.<+u.¯<9w.,0r.ID10.ù.•ID1010I0. 000180
880E4E88 C85D5F5E 1FDAF700 D2830BF7 0775932D 3C580CE8 00028308 03071309 ).•.Å.0.$Ex<-.u.¥Å.0.¥Ö.^_)ù.N.. 0001A0
08F7AA2D 800A79D2 080E750A F9831374 C00A93FC 071E570A 7EC51E08 56880646 F..V..é-.W..•..át..•.u..0ÿ.¯-¯¥Ù 0001C0
88AA2704 0276393C 3004D387 92F1F793 F1F70274 C00BD233 92F7880A F7000283 .0.¥Ö.¥.30.át.¥þ.¥þ..Æ.0<9v..•¯. 0001E0

Dump of file SATURN:[PCCOMMON.DUMP.DLL]DAPSETDF.TMP;1 on 18-APR-1990 10:42:54.27
File ID (609,9,0)   End of file block 85 / Allocated 88

Virtual block number 53 (00000035), 512 (0200) bytes

00C850E5 885E5F1F 580A8CF2 72C73801 448DFF44 880586AC 4F0588E2 75C308C2 ô.ùuã..O¯...D..D.;úr·.ÒX._^.I)ù. 000000
0000FFFF 9A093A68 1E093C68 1E1F76A3 E0865800 00FFFF9A 5016C488 50EC8855 U.$P.á.P.....X.ÅÈv..h<..h:...... 000020
00FF680E 460EF69A 0E390EA2 9A50C85D E5880001 880A5812 C49A039E E80021E8 Òl.Ò...á.[.¡...I)ùP.Å.9..-.F.h.. 000040
468E3174 00308026 47017500 3080267F FF89093C 068EFF33 00008B1E 094216FF ..B..£..3...<.¿..&.=.u.G&.=.t1/F 000060
72412CAC 1F7D8F1F F788071E 061CEBE7 74AEF2C0 330874CA 88A6F3C8 88D18800 ..1.ùæl.òt.3à·ÙtÒŠ.....¥.¢).¯,Ar 000080
3E830E48 0EF69A50 00FC88EC 885500C3 1FEDE8AA C20A0572 412CAC92 04E0C00E .áÅ..¯,Ar..ô`ŠÙ.û.U.&¡•.P.-.K..> 0000A0
D88E01F7 885756EC 8855C85D E5880EAC 0EF69A50 00FF8800 541EFF04 74000056 V..t...T.¡..P.-.¯..I)ùW.$VW¡¥..Å 0000C0
5E5F96E8 E8F788AE F2FFFF89 C033970C 74964010 74C238AD 21C28E06 5688C08E .â.V./ólÙ;ôt.ə.t..3á¿..·Û.¥ŠŠ._^ 0000E0
AEF2FFFF 89C033FA 88921F74 C0080EC0 0EC69A06 76FF57EC 88550002 CA5DE588 .I)ò..U.$W.v..ó.â..át...•3á¿..¯0 000100
000004C8 0002CA5D E5885F58 0000FFFF 9A501651 521E5300 0288C488 50490IF7 ¥l1P.áE..S.RQ.P.....[.,I)ò..à... 000120
5E8CFC46 89196C05 E001C103 E001C888 F9F7000C 89990078 2004468B 218E06FF ...l.F.-x..¿..¥•.àlÅ.ÈlÅ.l..F•.^ 000140
080A4F80 26117400 08085789 26064789 26045EC4 02C4830F 00147F9A 020068FE ±h........á.á^.&.G.&.W..Åt.&.O.. 000160
26064789 2640FE56 88FC4688 040A4F80 26045EC4 9021E802 000247C7 26FC5EC4 á^•&ùG...Šl.á^.&.O...F•.V±ə&.G.& 000180
C7260257 89260789 26085788 26064788 26045EC4 00010247 C726FC5E C4085789 .W.á^•&ùG...á^.&.G.&.W.&..&.W.&ù 0001A0
04EC8304 60E90454 E9C03300 096A0872 1F7B1E38 065E88EC 8855C3C9 00000447 G...èùU.š.^.;.(.r.o..3óÖT.Ö'..&. 0001C0
88FD1F7D A78091E1 75C0855A 590000FF FF9A5116 0C76FF08 76FF0A76 FF53CC88 .aS.v..v..v..Q.....YZ.àuÅ..I).». 0001E0

Dump of file SATURN:[PCCOMMON.DUMP.DLL]DAPSETDF.TMP;1 on 18-APR-1990 10:42:54.27
File ID (609,9,0)   End of file block 85 / Allocated 88

Virtual block number 54 (00000036), 512 (0200) bytes

201F7D87 F60413E9 C0330009 8A08721F 7B1E3806 5E880CEC 83EC8855 00C850E5 I)ù.U.š.š..^.;.(.r.o..3óÖ..-.). 000000
468EFA5E 8C667480 1F7D87F6 00000FDF 9A5016F4 46805141 415151C9 33531274 t.S3óQQAAQ.F¶.P.Ö...-.)..tf.^•.F 000020
75AEF20A 8049E30C 4E88F866 89F288FA 885657FC FC4689FE 4689C033 0856C50A .éV.3á.F±.F••WV.•.·.f%.N.0I¯.·Ûu 000040
F4E2AA1A 74F83800 740A3CAC 0C4E8807 16FA8804 88E22800 808ADC88 02EC83.' ;.š..£o..+ã.å.•...N.¯<.t.;«t.¯ã¶ 000060
5E8E5F5E E1E80014 E8E2E8FC 46FF0A80 AA001FE8 0375F838 00800009A E9002BEc Ö+.Ö..¯.;«u.Ö..¯¯..F•Šãô..ŠÅ^_.^ 000080
521E5306 5E881FE3 CA28CF88 1F061E51 53500F57 11809AFF FC887AE8 0093E9FA •Ö..Šz¡•..¯.W.PSQ....ù+òÖ..^.Š.R 0000A0
C3FA8858 58591F07 74D808FE 5E01F45E 881175C0 0800000F 209A5016 F4468D51 Q.F¶.P. ....åu..^¶.^±.Ùt..Y(X.•û 0000C0
26E8F900 208A03E8 001C8A08 7500098A 00013000 7400603D 1874C008 08C4831F ..á..át.=m.t.=..o..u.o..Š.o .•Š& 0000E0
06E8F9C0 33001C8A 0EE8F803 751A3F80 085E880A 5E8E0E74 401F7D87 F6FE5E8E .^±-.).ət..^..^..?.u.%Š.o..3á•Š. 000100
C1880475 C9080C4E 8802F7E9 C85DE588 0472FA5E 8E5F5EF8 6688FC46 28FE4688 .F±+F=.f%^_.^•r..I)ùÖ%..N..èu..è 000120
00740060 301774C0 081F071E 00001087 9A5016F4 46805152 1E530856 C51EEEEB ŠY.éV.S.RQ¯F¶.P.ñ.......át.=m.t. 000140
0A74401F 7D87F687 75C008F4 4688C2E8 00208AC7 E8001C8A CC750009 8A000130 =..o..uao..Šùo .Šó.F¶.àuñ-.).ət. 000160
88EC8855 FC20E900 835756EC 885500A3 E8C03300 1C8AA6E8 02751A3F 80260A88 .Ò&.?.u.$lo..3áŠÈ.U.$VW•.Ö •U.š. 000180
00C850E5 88C03302 E8000188 0574401F 7D87F60C 7C00F883 117D1F78 1E38065E ^.;.(.)..«.|.-.).ət.¡..Š.3á.I)ù. 0001A0
5152FC74 E9C03305 75400D72 A1C85152 E3880572 00761E38 08720828 DC885A59 YZ.É+Är.;.v.r..DRQùÄr.əu.3áÖt•RQ 0001C0
7558C008 0000FFFF 9A521650 1653C488 50871F7D A7800488 52000288 00722EFF ..r.E..R.å.I).ñP.áS.P.R......âXu 0001E0

```
Dump of file SATURN:[PCCOMMON.DUMP.DLL]DAPSETDF.TMP;1 on 18-APR-1990 10:42:54.27
File ID (609,9,0)   End of file block 85 / Allocated 88

Virtual block number 55 (00000037), 512 (0200) bytes

 AA06C41E E321A80E 885AD479 481F7D8F 08088106 7500023D 07740001 3D408112 .Ÿ@=..t.=..u.Ÿ...).KyåZ..'ID.á.' 000000
 B28F21B2 BE21A61E FF00038B C28C21AE 06C401AE E9037321 A61EFF08 33C28C21 !.ó3U..!!s.ÕU.á.Ù!.óE....!!/ÿl¢ÿ 000020
 0000FFFF 9A125168 0E016A08 7421863D 21B28800 73E821B2 BF21B2BE 007CE821 !Ò|./ÿl¢ÿ!Òs.¡ÿ!=Ñ!t.j..hQ...... 000040
 242EBEEC 88550000 124C9A00 6A006A03 6A0051E8 21B68F21 B2BED88E 0ECCB8C3 ù¡à..Â/ÿl¢Ñ!ÒQ.j.j.j..L...U.$/.$ 000060
 21B68E00 23E821B6 BF21B68E EC885503 E80031E8 21B68F21 B2BE003A E8242E8F ¢.$Ò:./ÿl¢Ñ!Ò1.Š.U.$/Ñ!¢Ñ!Ò#./Ñ! 000080
 C321A61E FF00028B 07E321A8 0E880000 FFFF9A50 06468A50 C033001A E821B68F ¢Ñ!Ò..3àP.F.P.......'ID.£....!!ù 0000A0
 3639FF28 F62B5657 000014C8 00C3EEE8 1DFFF274 02450805 8804EF83 0E73F73B ;%s..ÿ....E.t'..ŠŸù.à...WV+-+.96 0000C0
 76FFF876 FF0C6AF8 5689F646 89F25689 F04689C0 28093C16 8800F0E9 0375093C <.u.Õþ...<.+á.Fþ.V'.F-.V¾j..v¼.v 0000E0
 46FFF65E C4008CE9 03767FFF FE814619 74C0080A C4831338 15929A00 46681EF6 -.hF....Ä..á..ât.F.±..v.ÕV.á^-.F 000100
 8D8A7500 3F8026F6 5E88F475 003F8026 F646FFF6 5EC40CEB 47EA7500 3F8026F6 -&.?.uôGŠ.á^-.F-&.?.u¶.^-&.?.u¤. 000120
 89FC4689 02C48313 7D147F9A 56EE5689 EC468904 C4831347 153A9A04 6A500145 E.Pj..:.G..á..F$.VŸV...)..á..F=. 000140
 0C6A2185 16892183 A3EE568B EC468866 74C20BFC 46886074 EE460BEC 4688FE56 V±.F$.FŸtm.F=.ôtf.F$.VŸÊ.!...!j. 000160
 26FE5688 FC4688EC 5E.  2C74 C00B0AC4 83109C15 929A0046 681EF076 FFF276FF .v'.vþ.hF.......á..ât,á^$.F=.V±& 000180
 0E74C00A 078826FC 46ffFC5E C4078A26 F046FFF0 5EC404EC 46830257 89260789 ..&.W..F$.á^þ.Fþ&..á^=.F=&...ât. 0001A0
 E90002B8 90CBC95F 5EA77500 3F8026F0 5EC4F475 003F8026 F046FFF0 5EC4E8E8 ŠÒá^þ.Fþ&.?.u¶á^þ&.?.uÌ^_èù.|..Õ 0001C0
 0D10120F 1600160C 0808070A 0C090C08 0C070906 00051804 02030202 1601FA70 p*.............................. 0001E0

Dump of file SATURN:[PCCOMMON.DUMP.DLL]DAPSETDF.TMP;1 on 18-APR-1990 10:42:54.27
File ID (609,9,0)   End of file block 85 / Allocated 88

Virtual block number 56 (00000038), 512 (0200) bytes

 0A810A80 16060972 1C70206D 006C0859 00570053 00520243 00410235 02121211 ....S.A.C.R.S.W.Y.l.m p.r....... 000000
 0008E8C8 5DE58899 FFFF881F 7216891F 79A31608 000008D7 02CE08A4 00840982 ....È.ö.@.....Èy...r.|....!]ùÒ.. 000020
 133CF7E2 43431674 073A2E1B 75E40A00 2489130Z 881F79A3 CB5DE588 99FFFF88 |....!]ùÈy.È@.¿$..Õu..:.t.CCã%<. 000040
 065EC4EC 885500C3 1F72A398 01478A2E 430176CA 3C04728C 3C430A76 243C0472 r.<$v.C<Vr.<òv.C..G..Èr.ù.U.$á^. 000060
 831E73FF F1300646 88575602 EC83EC88 55C850E5 8801FE4F 80260574 C308C08C .à.ût.&.O±..!]ùW.$.$.VW.F.=þ.s.. 000080
 0676FF08 750078E8 05740018 E8157500 82E8219A A3127400 25E80875 00219A3E >.!.u.Õ%.t.È.!Ò..u.Õ..t.Õx.u..v. 0000A0
 FE5E89FE E3834306 5E8E?776 065E3900 F088CB5D E5885E5F 02C48312 F816209A . .%..á._^.!]ùÈþ.9^.v..^.C.O±.^± 0000C0
 A3219C16 87C28838 74FFFA83 08C48314 8317CC9A 5002B051 0E4F8050 501EC033 3à.PP.O.Q¯.P.ä.*..á..*.t8.ô...!È 0000E0
 0000A300 0A880C47 89484800 08A3C033 D88EFE5E 880008A3 DA8E0574 D208219E .!.@t..ÕÈ...^±.Å3àÈ..HH.G.|..È.. 000100
 219E1E8E 0B33064E 88C08ED8 8CC31FD8 8C0006A3 00000500 0AA30147 800002A3 È...G.È.....È...Å.ù.Å.à.N.3U...! 000120
 46891567 18CA9A06 76FF006A 0876FF00 6A560000 0AC8C3D9 8EC18CD2 080136E8 Õ6..@.è.!ùà...Vj..v.j..v..ò.g..F 000140
 89FC4689 02C48315 80147F9A 56F8768B 902FE899 C0280674 FFFFC2F7 FA5689F8 %.V*¼ö..t.+à.Š/..v½V......á..F=. 000160
 C95EFE56 88FC468B 9007E808 C483140F 18829A50 FE76FF00 6A561274 D008FE56 V±.Ât.Vj..v±P...Õ..á.Š...F=.V±^è 000180
 76C5FE88 CB03D9F7 AEF2C033 F788067E C4D98827 E30E4E88 1E5657EC 885590CB ù.U.$WV..N.D'.!á~..%3à·ÙÄ!.ù.±év 0001A0
 06C800C8 5DE5885F 5E1FC188 D1F74949 04740477 FF453A26 C933FF44 8AA6F30A .µ!.D.3è&:E.w.t.!!%i.è.^_.!]ù.à. 0001C0
 4C18FE9A 53060E74 830A47F6 26FA5EC4 1CEBF62B FC5E8CFA 46890078 88560000 ..V¡x..F*.^e+-Š.á^*&-G..t..S.±.L 0001E0

Dump of file SATURN:[PCCOMMON.DUMP.DLL]DAPSETDF.TMP;1 on 18-APR-1990 10:42:54.27
File ID (609,9,0)   End of file block 85 / Allocated 88

Virtual block number 57 (00000039), 512 (0200) bytes

 885590CB C95EC688 0876FA46 391F6816 881F66A1 0CFA4683 46017440 04C48315 ..á.@t.F.F*.Åf...h.9F*vÅ.ó^èù.U. 000000
 88071E29 75003F83 21908857 56EC8855 CB5DE588 01FE4F80 04740808 065E88EC &.^..Ut..O±..!]ùU.$VWE.!.?.u)..| 000020
 FE44C704 C6830001 04C79621 92A32190 A3FE2440 24E899C0 33057501 76E80005 ..Õv.u.3à.Š$@$±È.!È.!.ù....ó.ùD± 000040
 83FEE180 FA744100 D0E9C85D E5885E5F 0009E8C0 8ED88C06 4E882196 3689FFFE ±..6.!.N..Å.àÒ.._^.!]ùÕÅ.At*.Å±. 000060
 05C20335 7401A8AD F003D088 1573C138 48437401 A8FE88AD FC02778B F273EEF9 *Ÿs'.w.•Ù.±'.tCH;ès..Å.þÙ'.t5.ô. 000080
 C688FE4C FEF90305 E8058948 C12BFE4C 89F9030C 74FE88E6 E8FE4489 F7880002 ...%.D±Š!.±t..*.L±+èH..Š..*±L±.ó 0000A0
 03FE8825 74FFFE30 0221A206 C626C302 7F89219E 1E8C2605 74D13812 52890A8C .Õ¿R.;!t.&...!...ù&ó.Å!.=±.t%.±. 0000C0
 FE4489F7 88000205 C203E274 01A8ADF0 03008880 73C13848 FE88F274 01A8ADF0 þÙ'.t'.±H;ès¥.Å.þÙ'.tã.ô....%.D± 0000E0
 1E8E2605 74C73816 838FD88C 127421A2 0EFE2615 E8D88E04 74C00808 4788E6E8 Š!.G..ât..ÅŠ.&±.Å!t..Åe*.,ìt.&.. 000100
 E8FE4DFE 0074005F E8984040 01240074 C638006B E8C03306 778888E8 3788219A .!.7ŠÈ.w.3àÒk.;ót.$.@@.Ò_.. +M±Õ 000120
 51C399C0 33024789 0788219E A3260474 C1381707 89D88C98 E84E4E96 0574001D ..t..NNŠ..Å¿..;èt.&È.!...G.3à.ùQ 000140
 1572C603 C188F575 EAD10476 21A0163B 267FFF8A 414149C8 28037401 A8FE4588 .E±'.t.+à!AA□..&;..!v.!òu%.è.ór. 000160
 1874001D E85152C3 59C033E5 75EAD1D2 F7087500 0CE8C62B C22302F7 0072C203 .ór.%@Wö+6Ò..u.%@!òu!3àYùRÒÒ..t. 000180
 1ED23350 53C35A59 58FE5589 4AD72806 88067789 FFFEFE44 C7F203F0 88FE8857 W.±.P.'ùD±±..W..ø+@J.U±XYZùSP3@. 0001A0
 56EC8855 C3020802 74585A1F FFFA8308 C48315EF 17CC9A1F 06500001 88505252 RRP|..P...ä.ÿ..á..*..Z(t..@ùU.$V 0001C0
 48004436 884CE827 720057E8 07754806 46880856 880944BF 3875000A 7E8306>. W..-..uB¢D..V..F.Hu.ÒW.r'ŠL.6D.H 0001E0
```

```
Dump of file SATURN:[PCCOMMON.DUMP.DLL]DAPSETDF.TMP;1 on 18-APR-1990 10:42:54.27
File ID (609,9,0)   End of file block 85 / Allocated 88

Virtual block number 58 (0000003A), 512 (0200) bytes

 06750208 04730044 FE8104C6 8334735E 003EE856 0E468902 448B0074 F73B1174 t.;%t..D..f.Vò>.^s4.6..±D.s..@u. 000000
 89025C89 1489E675 C085F95B 0000FFFF 9A50C033 501652C4 8B5021EB 99FFFFB8 ¡...$‡P.áR.P3àP.....[*.âu]...\.. 000020
 750044FE 8104C683 0C74024C 39F7880E 4E88C85D E5885E5F 07C03303 88004436 6D..Æ3à._^.]]ü.N..%9L.t..6..±D.u 000040
 850000FF FF9A5153 1373093E 1E390675 F738C18E 03882672 1C030A88 2CE8F9F2 ·*$,.Ö..r&.Æ.è;%u.9.>.s.SQ...... 000060
 D788067E C45738E3 0C4E88EC 885500C3 01880487 92093E16 890475F7 3B0E75C0 âu8;%u...>.....1ú.U.$.N.08Wá~..■ 000080
 E3D187AA F3C913AB F3E9D1E0 8A0A4688 D1280187 D1030323 D81BD128 0C74DAF7 %Öt.+1.ÜWÆ.1.1+1.F..Á1Öµ¨.èµ`.1D 0000A0
 08468BEC 8855C85D 08568B06 46885FAA F3C913AB F3E9D1C3 8EFFFFC3 81C38C10 ..û.û...û1Öµ¨.èµ` .F..V.]üÜ.&.F. 0000C0
 030C66F7 064688C8 88E3F700 08CA5DE5 88E3F706 46880875 0A5E8808 080C5E88 .^..Ä.^.u..F.%D.]Ïò..%D.à.F.%f.. 0000E0
 023C0324 0A478A26 065EC4F6 28560000 04C80008 CA5DE588 D103E3F7 064688C8 à.F.%D.1.]]ò..à...V+-ó^.&.G.$.<. 000100
 5E883974 01196C87 F6060868 F9F7000C 89990078 20C38815 75080A47 F6265575 uU&-G..u..û-x..¿..%*kÄ.-.l..t9.^ 000120
 9A50E42A 08478A26 0677FF26 0877FF26 50287EC0 08FC4689 06472826 07882606 .&..&+G..F•.ó~(P&.w.&.w.&.G.*ÖP. 000140
 88260647 88260655E C4FFFF8E 200A4F80 26065EC4 0874FC46 3B08C483 178C0FF4 ¶.¥..ó.;F•t.ó^.&.O. /..ó^.&.G.&. 000160
 00020000 00031952 0002000C C8C95EC6 88000004 47C72602 57892607 89260857 W.&..&.W.&üG....ó^èü....R....... 000180
 01030007 00021266 01030447 000A1140 02030005 0002129E 01030000 0005173C <...............@...G...f....... 0001A0
 0103003A 00021020 01030088 000218B5 01050026 0002186B 01030022 00021820  ...*...k...&...ç....... ...:... 0001C0
 00000000 00000000 0000005C 00020E19 0103005B 00020E2C 0103004D 000211E8 ò...M...,...[.......\........... 0001E0
```

```
Dump of file SATURN:[PCCOMMON.DUMP.DLL]DAPSETDF.TMP;1 on 18-APR-1990 10:42:54.27
File ID (609,9,0)   End of file block 85 / Allocated 88

Virtual block number 59 (0000003B), 512 (0200) bytes

 6F432020 20797261 7262694C 20656D69 54206E75 5220534D 00000000 00000000 ........MS Run-Time Library - Co 000000
 70726F43 2074666F 736F7263 694D202C 38383931 20296328 20746867 69727970 pyright (c) 1988, Microsoft Corp 000020
 43666474 65735073 7365636F 72500074 75502074 73694C20 7463656C 65530011 ..Select List Put.ProcessPsetdfC 000040
 636F7250 00[illegible]C6F72 746E6F43 66647465 73507373 65636F72 50006C6F 72746E6F ontrol.ProcessPsetdfControl.Proc 000060
 0000012F 0120012C 00730070 004B0000 6C6F7274 6E6F4366 64746573 50737365 essPsetdfControl..K.p.s.,.-./... 000080
 00080000 00000000 00000000 01320131 01300081 0080004B 00000000 00000000 ........K.....0.1.2............. 0000A0
 0138013A 01390000 C[illegible]C004B 00000000 00000000 00000135 01340133 00870085 ....3.4.5...........K.É.ì.9.:.;. 0000C0
 79726160 69725020 2[illegible]200000 00000002 00120009 00090000 00000000 00000000 ...................... , Primary 0000E0
 616C6552 2064696C 61766E49 0079654B 20797261 60697250 202C2000 79654B20  Key. , Primary Key.Invalid Rela 000100
 6E6F6974 6163696C 70756420 64657470 60657474 4120003A 74657350 20646574 ted Pset:. Attempted duplication 000120
 72500021 726F7272 45207972 746E4500 70696873 6E6F6974 616C6572 20666F20  of relationship.Entry Error!.Pr 000140
 0021726F 72724520 7972746E 4500646E 6160606F 43666474 65735073 7365636F ocessPsetdfCommand.Entry Error!. 000160
 65735073 7365636F 72500070 6968736E 6F697461 6C655265 74616572 43606144 DamCreateRelationship.ProcessPse 000180
 50737365 636F7250 0021726F 72724520 7972746E 4500646E 6160606F 43666474 tdfCommand.Entry Error!.ProcessP 0001A0
 7365636F 72500021 726F7272 45207972 746E4500 646E6160 606F4366 64746573 setdfCommand.Entry Error!.Proces 0001C0
 252E7325 0021726F 72724520 7972746E 4500646E 6160606F 43666474 65735073 sPsetdfCommand.Entry Error!.Xs.X 0001E0
```

```
Dump of file SATURN:[PCCOMMON.DUMP.DLL]DAPSETDF.TMP;1 on 18-APR-1990 10:42:54.27
File ID (609,9,0)   End of file block 85 / Allocated 88

Virtual block number 60 (0000003C), 512 (0200) bytes

 6E450064 6563616C 70[illegible]57220 6562206F 74207069 68735020 7463656C 65530073 s.Select Pship to be replaced.En 000000
 00646E61 60606F43 66647465 73507373 65636F72 50002172 6F727245 20797274 try Error!.ProcessPsetdfCommand. 000020
 61630020 3A797469 746E4520 64657461 6C655200 21726F72 72452079 72746E45 Entry Error!.Related Entity: .ca 000040
 72756400 20646574 616C6552 20666F20 6560616E 2065676E 61686320 746F6E6E nnot change name of Related .dur 000060
 65737020 74657300 21726F72 72452079 72746E45 00454341 4C504552 20676E69 ing REPLACE.Entry Error!.set pse 000080
 64746573 50737365 636F7250 00736C6F 7620746E 6520646E 6120656D 616E2074 t name and ent vola.ProcessPsetd 0000A0
 65735073 7365636F 72500021 726F7272 45207972 746E4500 646E6160 606F4366 fCommand.Entry Error!.ProcessPse 0000C0
 73250073 252E7325 0021726F 72724520 7972746E 4500646E 6160606F 43666474 tdfCommand.Entry Error!.Xs.Xs.Xs 0000E0
 60614400 21726F72 72452079 72746E45 00726F72 72452079 72746E45 0073252E .Xs.Entry Error.Entry Error!.Dam 000100
 66647465 73507373 65636F72 50007069 68736E6F 6974616C 65526574 61657243 CreateRelationship.ProcessPsetdf 000120
 74657350 73736563 6F725000 21726F72 72452079 72746E45 00646E61 60606F43 Command.Entry Error!.ProcessPset 000140
 65735065 74616470 55002172 6F727245 20797274 6E450064 6E61606D 6F436664 dfCommand.Entry Error!.UpdatePse 000160
 6964456E 55007265 6E774F66 64746573 50657461 64705500 72656E77 4F666474 tdfOwner.UpdatePsetdfOwner.UnEdi 000180
 20746553 00746553 2D706968 7372656E 74726150 00646C65 69462065 6C626174 table Field.Partnership-Set.Set  0001A0
 00656061 4E737563 6F466664 74657350 65746164 70550045 4D414E20 54455350 PSET NAME.UpdatePsetdfFocusName. 0001C0
 74657350 65746164 70550065 60614E73 75636F46 66647465 73506574 61647055 UpdatePsetdfFocusName.UpdatePset 0001E0
```

```
Dump of file SATURN:[PCCOMMON.DUMP.DLL]DAPSETDF.TMP;1 on 18-APR-1990 10:42:54.27
File ID (609,9,0)   End of file block 85 / Allocated 88

Virtual block number 61 (0000003D), 512 (0200) bytes

74657350 00746553 20706968 7372656E 74726150 00656D61 4E737563 6F466664 dfFocusName.Partnership-Set.Pset 000000
74657350 006C6F56 65746164 70556664 74657350 006C6F56 65746164 70556664 dfUpdateVol.PsetdfUpdateVol.Pset 000020
74657350 006C6F56 65746164 70556664 74657350 006C6F56 65746164 70556664 dfUpdateVol.PsetdfUpdateVol.Pset 000040
61647055 006C6F56 65746164 70556664 74657350 006C6F56 65746164 70556664 dfUpdateVol.PsetdfUpdateVol.Upda 000060
50006C6F 56657461 64705566 64746573 5000656D 756C6F56 20746573 70206574 te pset Volume.PsetdfUpdateVol.P 000080
5000706F 4C657461 64705566 64746573 50006C6F 56657461 64705566 64746573 setdfUpdateVol.PsetdfUpdateLop.P 0000A0
6E6F6974 61726570 6F206469 6C61766E 4900706F 4C657461 64705566 64746573 setdfUpdateLop.Invalid operation 0000C0
65746164 70550070 756F7247 20726F74 61726570 4F206C61 6369676F 4C00203A : .Logical Operator Group.Update 0000E0
66647465 73500070 6F4C6574 61647055 66647465 73500050 4F4C2074 65737020  pset LOP.PsetdfUpdateLop.Psetdf 000100
61640079 65685F65 74616572 635F6664 74657370 61640070 6F4C6574 61647055 UpdateLop.dapsetdf_create_key.da 000120
74616572 635F6664 74657370 61640079 65685F65 74616572 635F6664 74657370 psetdf_create_key.dapsetdf_creat 000140
20732774 65735020 6E692064 6E756F66 20746F6E 20002079 65480079 65685F65 e_key.Key . not found in Pset's  000160
65737061 64007965 6B5F6574 61657263 5F666474 65737061 64007974 69746E45 Entity.dapsetdf_create_key.dapse 000180
69786520 79646165 726C6120 00207965 4B007965 6B5F6574 61657263 5F666474 tdf_create_key.Key . already exi 0001A0
5F657461 6572635F 66647465 73706164 00746573 50207369 6874206E 69207473 st in this Pset.dapsetdf_create_ 0001C0
79656B20 6574616C 65526C6D 44007965 4B207972 61606972 50202C20 0079656B key. , Primary Key.DmlRelate key 0001E0

Dump of file SATURN:[PCCOMMON.DUMP.DLL]DAPSETDF.TMP;1 on 18-APR-1990 10:42:54.27
File ID (609,9,0)   End of file block 85 / Allocated 88

Virtual block number 62 (0000003E), 512 (0200) bytes

416A624F 66647465 73500072 62406464 416A624F 66647465 73500074 65737020  pset.PsetdfObjAddMbr.PsetdfObjA 000000
00606F72 46206465 7463656C 65532065 62207473 75402079 65480072 624D6464 ddMbr.Key Must be Selected From. 000020
4D442074 65530065 63616C70 65522072 6564726F 206E6920 786F6274 73694C20  Listbox in order Replace.Set DM 000040
6A624F66 64746573 50007262 4D706552 6A624F66 64746573 50002059 454B5F4C L_KEY .PsetdfObjRepMbr.PsetdfObj 000060
6A624F66 64746573 50007262 4D706552 6A624F66 64746573 50007262 4D706552 RepMbr.PsetdfObjRepMbr.PsetdfObj 000080
746F6E20 00207965 4B007262 4D6C6544 6A624F66 64746573 50007262 4D6C6544 DelMbr.PsetdfObjDelMbr.Key . not 0000A0
74657350 00205945 4B5F4C4D 44207465 53007465 7350206E 6920646E 756F6620  found in Pset.Set DML_KEY .Pset 0000C0
252E7325 0072624D 6C65446A 624F6664 74657350 0072624D 6C65446A 624F6664 dfObjDelMbr.PsetdfObjDelMbr.%s.% 0000E0
20797469 746E4520 64657461 6C655220 726F6620 656D616E 20726574 6E450073 s.Enter name for Related Entity  000100
65735032 746E4560 726F4674 65735074 65470021 726F7272 45207972 746E4500 .Entry Error!.GetPsetFormEnt2Pse 000120
756F6620 746F6E20 00207974 69746E45 0021726F 72724520 7972746E 45003274 t2.Entry Error!.Entity . not fou 000140
65746E45 0021726F 72724520 7972746E 45004C45 444F4D2D 5245206E 6920646E nd in ER-MODEL.Entry Error!.Ente 000160
72452079 72746E45 00746573 50206465 74616C65 5220726F 6620656D 616E2072 r name for Related Pset.Entry Er 000180
20797274 6E450032 74657350 32746E45 6D726F46 74657350 74654700 21726F72 ror!.GetPsetFormEnt2Pset2.Entry  0001A0
56646574 616C6552 746E4570 69687350 74655366 64746573 50002172 6F727245 Error!.PsetdfSetPshipEntRelatedV 0001C0
45706968 73507465 53666474 65735000 21726F72 72452079 72746E45 00736C6F ols.Entry Error!.PsetdfSetPshipE 0001E0

Dump of file SATURN:[PCCOMMON.DUMP.DLL]DAPSETDF.TMP;1 on 18-APR-1990 10:42:54.27
File ID (609,9,0)   nd of file block 85 / Allocated 88

Virtual block number 63 (0000003F), 512 (0200) bytes

64746573 50002172 6F727245 20797274 6E450073 6C6F5664 6574616C 6552746E ntRelatedVols.Entry Error!.Psetd 000000
72452079 72746E45 00736C6F 56646574 616C6552 746E4570 69687350 74655366 fSetPshipEntRelatedVols.Entry Er 000020
6C6F5664 6574616C 6552746E 45706968 73507465 53666474 65735000 21726F72 ror!.PsetdfSetPshipEntRelatedVol 000040
746E4570 69687350 74655366 64746573 50002172 6F727245 20797274 6E450073 s.Entry Error!.PsetdfSetPshipEnt 000060
53666474 65735000 21726F72 72452079 72746E45 00736C6F 56646574 616C6552 RelatedVols.Entry Error!.PsetdfS 000080
6F727245 20797274 6E450073 6C6F5664 6574616C 6552746E 45706968 73507465 etPshipEntRelatedVols.Entry Erro 0000A0
00736C6F 56646574 616C6552 746E4570 69687350 74655366 64746573 50002172 r!.PsetdfSetPshipEntRelatedVols. 0000C0
6552746E 45706968 73507465 53666474 65735000 21726F72 72452079 72746E45 Entry Error!.PsetdfSetPshipEntRe 0000E0
726F7272 45206C6D 44002172 6F727245 20797274 6E450073 6C6F5664 6574616C latedVols.Entry Error!.Dml Error 000100
24300000 00000000 2320202B 00296C6C 756E2800 296C6C75 6E280000 206E6920  in ..(null).(null).+- #......0$ 000120
00000000 00000000 00000000 00000000 00000000 00000000 21882430 12812430 0$..0$!!........................ 000140
00000000 00000000 00000000 00000000 00000000 00000000 00000000 00000000 ................................ 000160
00000000 00000000 00000000 00000000 00000000 00000000 00000000 00000000 ................................ 000180
00000000 00000000 00000000 00000000 00000000 00000000 00000000 00000000 ................................ 0001A0
00000000 00000000 00000000 00000000 00000000 00000000 00000000 00000000 ................................ 0001C0
00000000 00000000 00000000 00000000 00000000 00000000 00000000 00000000 ................................ 0001E0
```

```
Dump of file SATURN:[PCCOMMON.DUMP.DLL]DAPSETDF.TMP;1 on 18-APR-1990 10:42:54.27
File ID (609,9,0)   End of file block 85 / Allocated 88

Virtual block number 64 (00000040), 512 (0200) bytes

 00000000 00000000 00000000 00000000 00000000 00000000 00000000 00000000 ................................ 000000
 00000000 00000000 00000000 00000000 00000000 00000000 00000000 00000000 ................................ 000020
 00000000 00000000 00000000 00000000 00000000 00000000 00000000 00000000 ................................ 000040
 00000000 00000000 00000000 00000000 00000000 00000000 00000000 00000000 ................................ 000060
 00000000 00000000 00000000 00000000 00000000 00000000 00000000 00000000 ................................ 000080
 00000000 00000000 00000000 00000000 00000000 00000000 00000000 00000000 ................................ 0000A0
 00000000 00000000 00000000 00000000 00000000 00000000 00000000 00000000 ................................ 0000C0
 00000000 00000000 00000000 00000000 00000000 00000000 00000000 00000000 ................................ 0000E0
 00000000 00000000 00000000 00000000 00000000 00000000 00000000 00000000 ................................ 000100
 00000000 00000000 00000000 00000000 00000000 00000000 00000000 00000000 ................................ 000120
 00000000 00000000 00000000 00000000 00000000 00000000 00000000 00000000 ................................ 000140
 00000000 00000000 00000000 00000000 00000000 00000000 00000000 00000000 ................................ 000160
 00000000 00000000 00000000 00000000 00000000 00000000 00000000 00000000 ................................ 000180
 00000000 00000000 00000000 00000000 00000000 00000000 00000000 00000000 ................................ 0001A0
 00000000 00000000 00000000 00000000 00000000 00000000 00000000 00000000 ................................ 0001C0
 00000000 00000000 00000000 00000000 00000000 00000000 00000000 00000000 ................................ 0001E0

Dump of file SATURN:[PCCOMMON.DUMP.DLL]DAPSETDF.TMP;1 on 18-APR-1990 10:42:54.27
File ID (609,9,0)   End of file block 85 / Allocated 88

Virtual block number 65 (00000041), 512 (0200) bytes

 00000000 00000000 00000000 00000000 00000000 00000000 00000000 00000000 ................................ 000000
 00000000 00000000 00000000 00000000 00000000 00000000 00000000 00000000 ................................ 000020
 00000000 00000000 00000000 00000000 00000000 00000000 00000000 00000000 ................................ 000040
 00000000 00000000 00000000 00000000 00000000 00000000 00000000 00000000 ................................ 000060
 00000000 00000000 00000000 00000000 00000000 00000000 00000000 00000000 ................................ 000080
 00000000 00000000 00000000 00000000 00000000 00000000 00000000 00000000 ................................ 0000A0
 00000000 00000000 00000000 00000000 00000000 00000000 00000000 00000000 ................................ 0000C0
 00000000 00000000 00000000 00000000 00000000 00000000 00000000 00000000 ................................ 0000E0
 00000000 00000000 00000000 00000000 00000000 00000000 00000000 00000000 ................................ 000100
 00000000 00000000 00000000 00000000 00000000 00000000 00000000 00000000 ................................ 000120
 005A13CC FFFF13CC 00000000 00304F46 4E495F45 4C49465F 435F0944 00000000 ....D. C_FILE_INFO=.....ä...ä.Z. 000140
 00000000 00800000 0200FFFF FFFF0101 00000000 006613CC 006213CC 005E13CC ä.^.ä.b.ä.f..................... 000160
 00000000 02020000 00000000 00000000 01020000 00000000 00000000 000121B6 Ñ!.............................. 000180
 00000000 00000000 00000000 00000000 00000000 00000000 00000000 00000000 ................................ 0001A0
 00000000 00000000 00000000 00000000 00000000 00000000 00000000 00000000 ................................ 0001C0
 00000000 00000000 00000000 00000000 00000000 00000000 00000000 00000000 ................................ 0001E0

Dump of file SATURN:[PCCOMMON.DUMP.DLL]DAPSETDF.TMP;1 on 18-APR-1990 10:42:54.27
File ID (609,9,0)   End of file block 85 / Allocated 88

Virtual block number 66 (00000042), 512 (0200) bytes

 00000000 00000000 00000000 00000000 00000000 00000000 00000000 00000000 ................................ 000000
 00000000 00000000 00000000 00000000 00000000 00000000 00000000 00000000 ................................ 000020
 00000000 00000000 00000000 00000000 00000000 00000000 00000000 00000000 ................................ 000040
 00000000 00000000 00000000 00000000 00000000 00000000 00000000 00000000 ................................ 000060
 00000000 00000000 00000000 00000000 00000000 00000000 00000000 00000000 ................................ 000080
 00000000 00000000 00000000 00000000 00000000 00000000 00000000 00000000 ................................ 0000A0
 00000000 00000000 00000000 00000000 00000000 00000000 00000000 00000000 ................................ 0000C0
 00000000 00000000 00000000 00000000 00000000 00000000 00000000 00000000 ................................ 0000E0
 00000000 00000000 00000000 00000000 00000000 00000000 00000000 00000000 ................................ 000100
 00000000 00000000 00000000 00000000 00000000 00000000 00000000 00000000 ................................ 000120
 00000000 00000000 00000000 00000000 00000000 00000000 00000000 00000000 ................................ 000140
 00000000 00000000 00000000 00000000 00000000 00000000 00000000 00000000 ................................ 000160
 00000000 00000000 00000000 00000000 00000000 00000000 00000000 00000000 ................................ 000180
 00000000 00000000 00000000 00000000 00000000 00000000 00000000 00000000 ................................ 0001A0
 00000000 00000000 00000000 00000000 00000000 00000000 00000000 00000000 ................................ 0001C0
 00000000 00000000 00000000 00000000 00000000 00000000 00000000 00000000 ................................ 0001E0
```

```
Dump of file SATURN:[PCCOMMON.DUMP.DLL]DAPSETDF.TMP;1 on 18-APR-1990 10:42:54.27
File ID (609,9,0)    End of file block 85 / Allocated 88

Virtual block number 67 (00000043), 512 (0200) bytes

00000000 00000000 00000000 00000000 00000000 00000000 00000000 00000000 ................................ 000000
00000000 00000000 00000000 00000000 00000000 00000000 00000000 00000000 ................................ 000020
00000000 00000000 00000000 00000000 00000000 00000000 00000000 00000000 ................................ 000040
00000000 00000000 00000000 00000000 00000000 00000000 00000000 00000000 ................................ 000060
00000000 00000000 00000000 00000000 00000000 00000000 00000000 00000000 ................................ 000080
00000000 00000000 00000000 00000000 00000000 00000000 00000000 00000000 ................................ 0000A0
00000000 00000000 00000000 00000000 00000000 00000000 00000000 00000000 ................................ 0000C0
00000000 00000000 00000000 00000000 00000000 00000000 00000000 00000000 ................................ 0000E0
00000000 00000000 00000000 00000000 00000000 00000000 00000000 00000000 ................................ 000100
00000000 00000000 00000000 00000000 00000000 00000000 00000000 00000000 ................................ 000120
00000000 00000000 00000000 00000000 00000000 00000000 00000000 00000000 ................................ 000140
00000000 00000000 00000000 00000000 00000000 00000000 00000000 00000000 ................................ 000160
00000000 00000000 00000000 00000000 00000000 00000000 00000000 00000000 ................................ 000180
00000000 00000000 00000000 00000000 00000000 00000000 00000000 00000000 ................................ 0001A0
00000000 00000000 00000000 00000000 00000000 00000000 00000000 00000000 ................................ 0001C0
00000000 00000000 00000000 00000000 00000000 00000000 00000000 00000000 ................................ 0001E0

Dump of file SATURN:[PCCOMMON.DUMP.DLL]DAPSETDF.TMP;1 on 18-APR-1990 10:42:54.27
File ID (609,9,0)    End of file block 85 / Allocated 88

Virtual block number 68 (00000044), 512 (0200) bytes

00000000 00000000 00000000 00000000 00000000 00000000 00000000 00000000 ................................ 000000
00000000 00000000 00000000 00000000 00000000 00000000 00000000 00000000 ................................ 000020
00000000 00000000 00000000 00000000 00000000 00000000 00000000 00000000 ................................ 000040
00000000 00000000 00000000 00000000 00000000 00000000 00000000 00000000 ................................ 000060
00000000 00000000 00000000 00000000 00000000 00000000 00000000 00000000 ................................ 000080
00000000 00000000 00000000 00000000 00000000 00000000 00000000 00000000 ................................ 0000A0
00000000 00000000 00000000 00000000 00000000 00000000 00000000 00000000 ................................ 0000C0
00000000 00000000 00000000 00000000 00000000 00000000 00000000 00000000 ................................ 0000E0
00000000 00000000 00000000 00000000 00000000 00000000 00000000 00000000 ................................ 000100
00000000 00000000 00000000 00000000 00000000 00000000 00000000 00000000 ................................ 000120
00000000 00000000 00000000 00000000 00000000 00000000 00000000 00000000 ................................ 000140
00000000 00000000 00000000 00000000 00000000 00000000 00000000 00000000 ................................ 000160
00000000 00000000 00000000 00000000 00000000 00000000 00000000 00000000 ................................ 000180
00000000 00000000 00000000 00000000 00000000 00000000 00000000 00000000 ................................ 0001A0
00000000 00000000 00000000 00000000 00000000 00000000 00000000 00000000 ................................ 0001C0
00000000 00000000 00000000 00000000 00000000 00000000 00000000 00000000 ................................ 0001E0

Dump of file SATURN:[PCCOMMON.DUMP.DLL]DAPSETDF.TMP;1 on 18-APR-1990 10:42:54.27
File ID (609,9,0)    End of file block 85 / Allocated 88

Virtual block number 69 (00000045), 512 (0200) bytes

00000000 00000000 00000000 00000000 00000000 00000000 00000000 00000000 ................................ 000000
00000000 00000000 00000000 00000000 00000000 00000000 00000000 00000000 ................................ 000020
00000000 00000000 00000000 00000000 00000000 00000000 00000000 00000000 ................................ 000040
00000000 00000000 00000000 00000000 00000000 00000000 00000000 00000000 ................................ 000060
00000000 00000000 00000000 00000000 00000000 00000000 00000000 00000000 ................................ 000080
00000000 00000000 00000000 00000000 00000000 00000000 00000000 00000000 ................................ 0000A0
00000000 00000000 00000000 00000000 00000000 00000000 00000000 00000000 ................................ 0000C0
00000000 00000000 00000000 00000000 00000000 00000000 00000000 00000000 ................................ 0000E0
00000000 00000000 00000000 00000000 00000000 00000000 00000000 00000000 ................................ 000100
00000000 00000000 00000000 00000000 00000000 00000000 00000000 00000000 ................................ 000120
00000000 00000000 00000000 00000000 00000000 00000000 00000000 00000000 ................................ 000140
00000000 00000000 00000000 00000000 00000000 00000000 00000000 00000000 ................................ 000160
00000000 00000000 00000000 00000000 00000000 00000000 00000000 00000000 ................................ 000180
00000000 00000000 00000000 00000000 00000000 00000000 00000000 00000000 ................................ 0001A0
00000000 00000000 00000000 00000000 00000000 00000000 00000000 00000000 ................................ 0001C0
00000000 00000000 00000000 00000000 00000000 00000000 00000000 00000000 ................................ 0001E0
```

```
Dump of file SATURN:[PCCOMMON.DUMP.DLL]DAPSETDF.TMP;1 on 18-APR-1990 10:42:54.27
File ID (609,9,0)   End of file block 85 / Allocated 88

Virtual block number 70 (00000046), 512 (0200) bytes

00000000 00000000 00000000 00000000 00000000 00000000 00000000 00000000 ................................ 000000
00000000 00000000 00000000 00000000 00000000 00000000 00000000 00000000 ................................ 000020
00000000 00000000 00000000 00000000 00000000 00000000 00000000 00000000 ................................ 000040
00000000 00000000 00000000 00000000 00000000 00000000 00000000 00000000 ................................ 000060
00000000 00000000 00000000 00000000 00000000 00000000 00000000 00000000 ................................ 000080
00000000 00000000 00000000 00000000 00000000 00000000 00000000 00000000 ................................ 0000A0
00000000 00000000 00000000 00000000 00000000 00000000 00000000 00000000 ................................ 0000C0
00000000 00000000 00000000 00000000 00000000 00000000 00000000 00000000 ................................ 0000E0
00000000 00000000 00000000 00000000 00000000 00000000 00000000 00000000 ................................ 000100
00000000 00000000 00000000 00000000 00000000 00000000 00000000 00000000 ................................ 000120
00000000 00000000 00000000 00000000 00000000 00000000 00000000 00000000 ................................ 000140
00000000 00000000 00000000 00000000 00000000 00000000 00000000 00000000 ................................ 000160
00000000 00000000 00000000 00000000 00000000 00000000 00000000 00000000 ................................ 000180
00000000 00000000 00000000 00000000 00000000 00000000 00000000 00000000 ................................ 0001A0
00000000 00000000 00000000 00000000 00000000 00000000 00000000 00000000 ................................ 0001C0
00000000 00000000 00000000 00000000 00000000 00000000 00000000 00000000 ................................ 0001E0

Dump of file SATURN:[PCCOMMON.DUMP.DLL]DAPSETDF.TMP;1 on 18-APR-1990 10:42:54.27
File ID (609,9,0)   End of file block 85 / Allocated 88

Virtual block number 71 (00000047), 512 (0200) bytes

00000000 00000000 00000000 00000000 00000000 00000000 00000000 00000000 ................................ 000000
00000000 00000000 00000000 00000000 00000000 00000000 00000000 00000000 ................................ 000020
00000000 00000000 00000000 00000000 00000000 00000000 00000000 00000000 ................................ 000040
00000000 00000000 00000000 00000000 00000000 00000000 00000000 00000000 ................................ 000060
00000000 00000000 00000000 00000000 00000000 00000000 00000000 00000000 ................................ 000080
00000000 00000000 00000000 00000000 00000000 00000000 00000000 00000000 ................................ 0000A0
00000000 00000000 00000000 00000000 00000000 00000000 00000000 00000000 ................................ 0000C0
00000000 00000000 00000000 00000000 00000000 00000000 00000000 00000000 ................................ 0000E0
00000000 00000000 00000000 00000000 00000000 00000000 00000000 00000000 ................................ 000100
00000000 00000000 00000000 00000000 00000000 00000000 00000000 00000000 ................................ 000120
00000000 00000000 00000000 00000000 00000000 00000000 00000000 00000000 ................................ 000140
00000000 00000000 00000000 00000000 02000001 00000000 00000000 00000000 ................................ 000160
00000000 00000000 00000000 00000000 00000000 00000000 00000000 00000000 ................................ 000180
00000000 00000000 00000000 00000000 00000000 00000000 00000000 00000000 ................................ 0001A0
00000000 00000000 00000000 00000000 00000000 00000000 00000000 00000000 ................................ 0001C0
00000000 00000000 00000000 00000000 00000000 00000000 00000000 00000000 ................................ 0001E0

Dump of file SATURN:[PCCOMMON.DUMP.DLL]DAPSETDF.TMP;1 on 18-APR-1990 10:42:54.27
File ID (609,9,0)   End of file block 85 / Allocated 88

Virtual block number 72 (00000048), 512 (0200) bytes

00000000 00000000 00000000 00000000 00000000 00000000 00000000 00000000 ................................ 000000
00000000 00000000 00000000 00000000 00000000 00000000 00000000 00000000 ................................ 000020
00000000 00000000 00000000 00000000 00000000 00000000 00000000 00000000 ................................ 000040
00000000 00000000 00000000 00000000 00000000 00000000 00000000 00000000 ................................ 000060
00000000 00000000 00000000 00000000 00000000 00000000 00000000 00000000 ................................ 000080
00000000 00000000 00000000 00000000 00000000 00000000 00000000 00000000 ................................ 0000A0
00000000 00000000 00000000 00000000 00000000 00000000 00000000 00000000 ................................ 0000C0
00000000 00000000 00000000 00000000 00000000 00000000 00000000 00000000 ................................ 0000E0
00000000 00000000 00000000 00000000 00000000 00000000 00000000 00000000 ................................ 000100
00000000 00000000 00000000 00000000 00000000 00000000 00000000 00000000 ................................ 000120
00000000 00000000 00000000 00000000 00000000 00000000 00000000 00000000 ................................ 000140
00000000 00000000 00000000 00000000 00000000 00000000 00000000 00000000 ................................ 000160
00000000 00000000 00000000 00000000 00000000 00000000 00000000 00000000 ................................ 000180
00000000 00000000 00000000 00000000 00000000 00000000 00000000 00000000 ................................ 0001A0
00000000 00000000 00000000 00000000 00000000 00000000 00000000 00000000 ................................ 0001C0
00000000 00000000 00000000 00000000 00000000 00000000 00000000 00000000 ................................ 0001E0
```

```
Dump of file SATURN [PCCOMMON.DUMP.DLL]DAPSEIDF.TMP;1 on 18-APR-1990 10:42:54.27
File ID (609,9,0)   End of file block 85 / Allocated 88

Virtual block number 73 (00000049), 512 (0200) bytes

00000000 00000000 00000000 00000000 00000000 00000000 00000000 00000000 ................................ 000000
00000000 00000000 00000000 00000000 00000000 00000000 00000000 00000000 ................................ 000020
00000000 00000000 00000000 00000000 00000000 00000000 00000000 00000000 ................................ 000040
00000000 00000000 00000000 00000000 00000000 00000000 00000000 00000000 ................................ 000060
00000000 00000000 00000000 00000000 00000000 00000000 00000000 00000000 ................................ 000080
00000000 00000000 00000000 00000000 00000000 00000000 00000000 00000000 ................................ 0000A0
00000000 00000000 00000000 00000000 00000000 00000000 00000000 00000000 ................................ 0000C0
00000000 00000000 00000000 00000000 00000000 00000000 00000000 00000000 ................................ 0000E0
00000000 00000000 00000000 00000000 00000000 00000000 00000000 00000000 ................................ 000100
00000000 00000000 00000000 00000000 00000000 00000000 00000000 00000000 ................................ 000120
00000000 00000000 00000000 00000000 00000000 00000000 00000000 00000000 ................................ 000140
00000000 00000000 00000000 00000000 00000000 00000000 00000000 00000000 ................................ 000160
00000000 00000000 00000000 00000000 00000000 00000000 00000000 00000000 ................................ 000180
00000000 00000000 00000000 00000000 00000000 00000000 00000000 00000000 ................................ 0001A0
00000000 00000000 00000000 00000000 00000000 00000000 00000000 00000000 ................................ 0001C0
00000000 00000000 00000000 00000000 00000000 00000000 00000000 00000000 ................................ 0001E0

Dump of file SATURN:[PCCOMMON.DUMP.DLL]DAPSEIDF.TMP;1 on 18-APR-1990 10:42:54.27
File ID (609,9,0)   End of file block 85 / Allocated 88

Virtual block number 74 (0000004A), 512 (0200) bytes

00000000 00000000 00000000 00000000 00000000 00000000 00000000 00000000 ................................ 000000
00000000 00000000 00000000 00000000 00000000 00000000 00000000 00000000 ................................ 000020
00000000 00000000 00000000 00000000 00000000 00000000 00000000 00000000 ................................ 000040
00000000 00000000 00000000 00000000 00000000 00000000 00000000 00000000 ................................ 000060
00000000 00000000 00000000 00000000 00000000 00000000 00000000 00000000 ................................ 000080
00000000 00000000 00000000 00000000 00000000 00000000 00000000 00000000 ................................ 0000A0
00000000 00000000 00000000 00000000 00000000 00000000 00000000 00000000 ................................ 0000C0
00000000 00000000 00000000 00000000 00000000 00000000 00000000 00000000 ................................ 0000E0
00000000 00000000 00000000 00000000 00000000 00000000 00000000 00000000 ................................ 000100
00000000 00000000 00000000 00000000 00000000 00000000 00000000 00000000 ................................ 000120
00000000 00000000 00000000 00000000 00000000 00000000 00000000 00000000 ................................ 000140
81818101 00000001 00000000 00000000 00000000 00000946 19600000 00000000 ......'.F....................... 000160
00000000 00000000 00000000 00000000 00000000 00000000 00000000 00000000 ................................ 000180
00000000 00000000 00000000 00000000 00000000 00000000 00000000 00000000 ................................ 0001A0
00000000 00000000 00000000 00000000 00000000 00000000 00000000 00000000 ................................ 0001C0
00000000 00000000 00000000 00000000 00000000 00000000 00000000 00000000 ................................ 0001E0

Dump of file SATURN:[PCCOMMON.DUMP.DLL]DAPSEIDF.TMP;1 on 18-APR-1990 10:42:54.27
File ID (609,9,0)   End of file block 85 / Allocated 88

Virtual block number 75 (0000004B), 512 (0200) bytes

00000000 00000000 00000000 00000000 00000000 00000000 00000000 00000000 ................................ 000000
00000000 00000000 00000000 00000000 00000000 00000000 00000000 00000000 ................................ 000020
00000000 00000000 00000000 00000000 00000000 00000000 00000000 00000000 ................................ 000040
0A0A0A00 00000000 00000000 00000000 00000000 00000000 00000000 00000000 ................................ 000060
0A0A0A0A 0A0A0A0A 0A0A0A0A 0A0A0A0A 0A0A0A0A 0A0A0A0A 0A0A0A0A 0A0A0A0A ................................ 000080
0A0A0A0A 0A0A0A0A 0A0A0A0A 0A0A0A0A 0A0A0A0A 0A0A0A0A 0A0A0A0A 0A0A0A0A ................................ 0000A0
0A0A0A0A 0A0A0A0A 0A0A0A0A 0A0A0A0A 0A0A0A0A 0A0A0A0A 0A0A0A0A 0A0A0A0A ................................ 0000C0
0A0A0A0A 0A0A0A0A 0A0A0A0A 0A0A0A0A 0A0A0A0A 0A0A0A0A 0A0A0A0A 0A0A0A0A ................................ 0000E0
0A0A0A0A 0A0A0A0A 0A0A0A0A 0A0A0A0A 0A0A0A0A 0A0A0A0A 0A0A0A0A 0A0A0A0A ................................ 000100
0A0A0A0A 0A0A0A0A 0A0A0A0A 0A0A0A0A 0A0A0A0A 0A0A0A0A 0A0A0A0A 0A0A0A0A ................................ 000120
0A0A0A0A 0A0A0A0A 0A0A0A0A 0A0A0A0A 0A0A0A0A 0A0A0A0A 0A0A0A0A 0A0A0A0A ................................ 000140
0000000A 0A0A0A0A 0A0A0A0A 0A0A0A0A 0A0A0A0A 0A0A0A0A 0A0A0A0A 0A0A0A0A ................................ 000160
00000000 00000000 00000000 00000000 00000000 00000000 00000000 00000000 ................................ 000180
4753404E 3C3CFFFF FFFF006A 15CE0000 00000000 00000000 00000000 00002000 . ...............o.j.....<<NMSG 0001A0
0003000A 00776F6C 66726576 6F206863 61747320 2D0A0030 30303652 00003E3E >>..R6000..- stack overflow..... 0001C0
08000A00 30207962 20656469 76696420 72656765 746E6920 2D0A0D33 30303652 R6003..- integer divide by 0.... 0001E0
```

Dump of file SATURN:[PCCOMMON.DUMP.DLL]DAPSEIDF.TMP;1 on 18-APR-1990 10:42:54.27
File ID (609,9,0)   End of file block 85 / Allocated 88

Virtual block number 76 (0000004C), 512 (0200) bytes

```
6120726F 66206563 61707320 6867756F 6E652074 6F6E202D 0A003830 30365200 .R6008..- not enough space for a 000000
6867756F 6E652074 6F6E202D 0A003930 30365200 09000A00 73746E65 6D756772 rguments.....R6009..- not enough 000020
00FF000A 0D00FC00 0A0D746E 656D6E6F 7269766E 6520726F 66206563 61707320  space for environment...•...... 000040
74616F6C 6620200A 00323030 36520002 0020726F 72726520 656D6974 206E7572 run-time error ...R6002..- float 000060
21B40002 0003FFFF FF000A00 64656461 6F6C2074 6F6E2074 6E696F70 20676E69 ing point not loaded.........Çl 000080
00000000 00000000 00000000 00000005 1F680002 00000004 007A0002 00000003 ......z.......h................ 0000A0
6960207 4 65737020 65687420 726F6620 7265626D 756E2061 20657079 542A0352 R.*Type a number for the pset mi 0000C0
6620726F 72726520 746E6961 7274736E 6F432400 656D756C 6F76206D 756D696E nimum volume.$Constraint error f 0000E0
72702074 6E696172 74736E6F 43280065 6D756C6F 76206D75 6D696E69 6D20726F or minimum volume.(Constraint pr 000100
65707954 2B00656D 756C6F76 206D756D 696E696D 206F7420 64657461 6761706F opagated to minimum volume.+Type 000120
20646574 63657078 65207465 73702065 68742072 6F662072 65626D75 6E206120  a number for the pset expected  000140
70786520 726F6620 726F7272 6520746E 69617274 736E6F43 2500656D 756C6F76 volume.%Constraint error for exp 000160
61676170 6F72702C 746E6961 7274736E 6F432900 656D756C 6F762064 65746365 ected volume.)Constraint propaga 000180
6E206120 6570795< 2A00656D 756C6F76 20646574 63657078 65206F74 20646574 ted to expected volume.*Type a n 0001A0
6D756C6F 76206D75 6D697861 6D207465 73702065 68742072 6F662072 65626D75 umber for the pset maximum volum 0001C0
206D756D 69786160 20726F66 20726F72 72652074 6E696172 74736E6F 43240065 e.$Constraint error for maximum  0001E0
```

Dump of file SATURN:[PCCOMMON.DUMP.DLL]DAPSEIDF.TMP;1 on 18-APR-1990 10:42:54.27
File ID (609,9,0)   End of file block 85 / Allocated 88

Virtual block number 77 (0000004D), 512 (0200) bytes

```
6F742064 65746167 61706F72 7020746E 69617274 736E6F43 2800656D 756C6F76 volume.(Constraint propagated to 000000
36007965 4B207972 61606972 50202C0E 00656D75 6C6F7620 6D756069 78616D20  maximum volume.., Primary Key.6 000020
65726C61 20746920 726F202C 646E756F 6620746F 6E207965 6B207974 69746E45 Entity key not found, or it alre 000040
6F6E2079 7469746E 45110074 65737020 65687420 736E6961 746E6F63 20796461 ady contains the pset..Entity no 000060
78652079 64616572 6C612070 6968736E 6F697461 6C65521C 00646E75 6F662074 t found..Relationship already ex 000080
74736E6F 43380064 65696669 63657073 20746F6E 20327465 73501400 73747369 ists..Pset2 not specified.;Const 0000A0
74657370 20646574 616C6572 206F7420 64657461 6761706F 72702074 6E696172 raint propagated to related pset 0000C0
6E696172 74736E6F 433C0065 6D756C6F 76206D75 6D696E69 6D207069 68737020  pship minimum volume.<Constrain 0000E0
68737020 74657370 20646574 616C6572 206F7420 64657461 6761706F 72702074 t propagated to related pset psh 000100
00000000 00000000 00000000 0000656D 756C6F76 20646574 63657078 65207069 ip expected volume............. 000120
616C6572 206F7420 64657461 6761706F 72702074 6E696172 74736E6F 43380352 R.;Constraint propagated to rela 000140
43380065 6D756C6F 76206D75 6D697861 6D207069 68737020 74657370 20646574 ted pset pship maximum volume.;C 000160
20746E65 72727563 206F7420 64657461 6761706F 72702074 6E696172 74736E6F onstraint propagated to current  000180
74736E6F 433C0065 6D756C6F 76206D75 6D696E69 6D207069 68737020 74657370 pset pship minimum volume.<Const 0001A0
74657370 20746E65 72727563 206F7420 64657461 6761706F 72702074 6E696172 raint propagated to current pset 0001C0
69617274 736E6F43 3B00656D 756C6F76 20646574 63657078 65207069 68737020  pship expected volume.;Constrai 0001E0
```

Dump of file SATURN:[PCCOMMON.DUMP.DLL]DAPSEIDF.TMP;1 on 18-APR-1990 10:42:54.27
File ID (609,9,0)   End of file block 85 / Allocated 88

Virtual block number 78 (0000004E), 512 (0200) bytes

```
73702074 65737020 746E6572 72756320 6F742064 65746167 61706F72 7020746E nt propagated to current pset ps 000000
65626D75 6E206120 65707954 3800656D 756C6F76 206D756D 69786160 20706968 hip maximum volume.8Type a numbe 000020
6E696D20 70696873 70207465 73702064 6574616C 65722065 68742072 6F662072 r for the related pset pship min 000040
6F662072 6F727265 20746E69 61727473 6E6F4337 00656D75 6C6F7620 6D756069 imum volume.7Constraint error fo 000060
6C6F7620 6D756069 6E696D20 70696873 70207465 73702064 6574616C 65722072 r related pset pship minimum vol 000080
74616C65 72206568 7420726F 66207265 626D756E 20612065 70795439 00656D75 ume.9Type a number for the relat 0000A0
43380065 6D756C6F 76206465 74636570 78652070 69687370 20746573 70206465 ed pset pship expected volume.8C 0000C0
74657370 20646574 616C6572 20726F66 20726F72 72652074 6E696172 74736E6F onstraint error for related pset 0000E0
6E206120 65707954 3800656D 756C6F76 20646574 63657078 65207069 68737020  pship expected volume.8Type a n 000100
70696873 70207465 73702064 6574616C 65722065 68742072 6F662072 65626D75 umber for the related pset pship 000120
6F727265 20746E69 61727473 6E6F4331 00656D75 6C6F7620 6D756069 78616D20  maximum volume.1Constraint erro 000140
6D756C6F 76206D75 6D697861 6D207465 73702064 6574616C 65722072 6F662072 r for related pset maximum volum 000160
746E6572 72756320 65687420 726F6620 7265626D 756E2061 20657079 54380065 e.8Type a number for the current 000180
736E6F43 3700656D 756C6F76 206D756D 696E696D 20706968 73702074 65737020  pset pship minimum volume.7Cons 0001A0
73702074 65737020 746E6572 72756320 726F6620 726F7272 6520746E 69617274 traint error for current pset ps 0001C0
65626D75 6E206120 65707954 3900656D 756C6F76 206D756D 696E696D 20706968 hip minimum volume.9Type a numbe 0001E0
```

```
Dump of file SATURN:[PCCOMMON.DUMP.DLL]DAPSETDF.TMP;1 on 18-APR-1990 10:42:54.27
File ID (609,9,0)   End of file block 85 / Allocated 88

Virtual block number 79 (0000004F), 512 (0200) bytes

70786520 70696873 70207465 73702074 6E657272 75632065 68742072 6F662072 r for the current pset pship exp 000000
6620726F 72726520 746E6961 7274736E 6F433800 6560756C 6F762064 65746365 ected volume.8Constraint error f 000020
76206465 74636570 78652070 69687370 20746573 7020746E 65727275 6320726F or current pset pship expected v 000040
72756320 65687420 726F6620 72656260 756E2061 20657079 54380065 60756C6F olume.8Type a number for the cur 000060
31006560 756C6F76 20607560 69786160 20706968 73702074 65737020 746E6572 rent pset pship maximum volume.1 000080
65737020 746E6572 72756320 726F6620 726F7272 6520746E 69617274 736E6F43 Constraint error for current pse 0000A0
00000000 00000000 00000000 00000000 6560756C 6F762060 75606978 61602074 t maximum volume................ 0000C0
00931400 00900914 00000001 0000004C 00000000 FFFF0001 000E0352 00000854 T...R...........L............... 0000E0
02F40005 80020002 09190006 00030000 00000000 0915FFFF 00000303 00FAFE45 E±*.........................¶. 000100
007202E4 00058001 00010920 00150005 00000000 0000FFFF FFFF0077 00080032 2...w................ .......ô.r. 000120
000800EC 02080007 80020008 09360000 00060000 00000000 FFFFFFFF 00600008 ..m...............6.......À.$... 000140
00740008 006402C6 00058001 00010937 00080005 00000000 0000FFFF FFFF006E n..............7.......ó.d...t. 000160
FFFF0076 000800EC 028A0007 80020008 09400000 00060000 00000000 FFFFFFFF ..............@.......a.$...v... 000180
FFFFFFFF 00780008 003402A8 00058001 00010941 000C0005 00000000 0000FFFF ............A.......`.4...x..... 0001A0
0000FFFF FFFF0079 002F00F0 02770005 80030007 094E0000 000A0000 00000000 ........:.N.......w.Þ./.y....... 0001C0
00000000 FFFFFFFF 006F0008 002A0267 00058001 0001094F 00080005 00000000 ........O.......g.*...o......... 0001E0

Dump of file SATURN:[PCCOMMON.DUMP.DLL]DAPSETDF.TMP;1 on 18-APR-1990 10:42:54.27
File ID (609,9,0)   End of file block 85 / Allocated 88

Virtual block number 80 (00000050), 512 (0200) bytes

00000000 0000FFFF FFFF0070 000800C1 02580007 80020008 09580000 00060000 ......X.......[.é...p........... 000000
00070000 00000000 FFFFFFFF 00720008 0064024F 00058001 00010959 00090005 ....Y.......O.d...r............. 000020
00030003 00000000 0C?FFFF FFFF0073 003000C5 021D0005 80000000 09630000 ..c........é.0.s................ 000040
09680007 00030000 00000000 FFFFFFFF 012C000C 00260241 00CF8002 04000964 d.....u.A.&................h. 000060
00000970 00060003 00000000 0000FFFF FFFF012D 000C0026 022F00CF 80020000 ....u./.&...-................p... 000080
80010002 09770017 00050000 00000000 FFFFFFFF 012F000C 0026021D 00CF8002 ..ü...&.../...............w..... 0000A0
000A8001 0001098F 00100005 00000000 0000FFFF FFFF00C8 004B00F0 01CD0005 ..é.Þ.H.à....................... 0000C0
0200004D 80020008 09A00000 00060000 00000000 FFFFFFFF 00C90008 003E01FE ±.>...è....................M... 0000E0
003C01EC 000A8001 000109A1 000E0005 00000000 0000FFFF FFFF00CA 000800A3 Ê...ò...............¯..Ã......$.<. 000100
000800A3 01EE004D 80020008 09800000 00060000 00000000 FFFFFFFF 00CB0008 ..ù..............¯.....M.Ý.Ë... 000120
00010008 00C801E0 000A8001 00010981 00180005 00000000 0000FFFF FFFF00CC à.............Ý.......Ä.à...Ì. 000140
FFFF00CE 00080013 01D10014 80010001 09CD0004 00050000 00000000 FFFFFFFF ..............é.....Ì.....ö.... 000160
FFFFFFFF 00060008 001C01D3 002D8002 000C09D2 00000006 00000000 0000FFFF ............Ò.....-.Ë.....Ó.... 000180
0000FFFF FFFF00CF 0008002C 01D10059 80010001 09D30009 00050000 00000000 .........Ë.....Y.Ì.,...Ù....... 0001A0
00000000 FFFFFFFF 00D70008 001D01D3 00898002 000C09DD 00000006 00000000 .........Ì.......Ë.....Ý......... 0001C0
00000000 0000FFFF FFFF00D0 00080016 01D10083 80010001 09DE0004 00050000 ......Ð.....*.Ì.....Þ........... 0001E0

Dump of file SATURN:[PCCOMMON.DUMP.DLL]DAPSETDF.TMP;1 on 18-APR-1990 10:42:54.27
File ID (609,9,0)   End of file block 85 / Allocated 88

Virtual block number 81 (00000051), 512 (0200) bytes

00050000 00000000 FFFFFFFF 00D80008 001C01D3 00CF8002 000C09E3 00000006 ....Ø.....Ó.Ë.....Ã............. 000000
00000007 00000000 0000FFFF FFFF00D9 00080064 01BD0005 80010001 09E4000C ..Ù.......§.d...½............... 000020
09F20003 00030000 00000000 FFFFFFFF 00DA0030 00C50188 00058000 000009F1 ñ.........Å.0.Ú................. 000040
000009F6 00070003 00000000 0000FFFF FFFF0136 000C0026 01AF00CF 80020400 ....ö.Ë.&...6..............-... 000060
80020000 09FE0006 00030000 00000000 FFFFFFFF 0137000C 00260190 00CF8002 ..þ...&...7.................... 000080
00058001 00010A05 000F0005 00000000 0000FFFF FFFF0138 000C0026 018B00CF ü...&...8....................... 0000A0
016F0007 80020008 0A150000 00060000 00000000 FFFFFFFF 00DB0008 0050017B {.P...Û.......................o. 0000C0
002E0160 00C88002 00020A16 00070003 00000000 0000FFFF FFFF000C 000800BA ¤...È.....................º.m... 0000E0
000800BE 01630005 80010001 0A1E002A 00050000 00000000 FFFFFFFF 000F0008 ..Ô.............*.........c./... 000100
00000030 00C50131 00058000 00000A49 00000007 00000000 0000FFFF FFFF000E 8...............I........1.é.0.1. 000120
FFFF0139 000C0024 01550001 80020400 0A4A0003 00030000 00000000 FFFFFFFF ............J.....1.U.$...9... 000140
FFFFFFFF 013A000C 00260143 00CF8002 00000A4E 00070003 00000000 0000FFFF ............N.....u.C.&...:..... 000160
0000FFFF FFFF0138 000C0026 013100CF 80020000 0A560006 00030000 00000000 ..........V.....u.1.&...;....... 000180
00000000 FFFFFFFF 00E00018 00F00111 00058001 00020A5D 00100005 00000000 ........].........Þ...À......... 0001A0
00000000 0000FFFF FFFF00E1 000A0026 01140014 80020004 0A6E0003 00030000 ......n.........&...Å........... 0001C0
00030000 00000000 FFFFFFFF 00E2000A 002A0114 00508002 00040A72 00030003 ....r.....]...*...â............. 0001E0
```

```
Dump of file SATURN:[PCCOMMON.DUMP.DLL]DAPSETDF.TMP;1 on 18-APR-1990 10:42:54.27
File ID (609,9,0)   End of file block 85 / Allocated 88

Virtual block number 82 (00000052), 512 (0200) bytes

 00070005 00000000 0000FFFF FFFF00E3 000A0020 011400A7 80020004 0A760003 ..v.....}... ...D.............. 000000
 0A820004 00050000 00000000 FFFFFFFF 00E4001C 00F000ED 00058001 00020A7A z.......U.P...ð................. 000020
 000C0A87 00000006 00000000 0000FFFF FFFF00E5 00080014 00F2000A 80010001 ............}.................... 000040
 80010001 0A880009 00050000 00000000 FFFFFFFF 00E60008 001E00F4 00228002 ..".¶.....}...................... 000060
 007F8002 000C0A92 00000006 00000000 0000FFFF FFFF00E7 0008002C 00F2004F O..,...Ò......................... 000080
 00F200AF 80010001 0A930004 00050000 00000000 FFFFFFFF 00E80008 001E00F4 ¶.....Ò....................£.... 0000A0
 001E00F4 00CA8002 000C0A98 00000006 00000000 0000FFFF FFFF00E9 00080016 ....Ô....................ô.¶... 0000C0
 0008002C 000D0005 80010001 0A990008 00050000 00000000 FFFFFFFF 00EA8008 ..õ.....................}.,.... 0000E0
 00850008 00C10001 00078002 00080AA2 00000006 00000000 0000FFFF FFFF0084 ................Å.......}.è..... 000100
 FFFF0086 00080032 00C50005 80010001 0AA30008 00050000 00000000 FFFFFFFF ..............È.......é.2....... 000120
 FFFFFFFF 00870030 00C50093 00058002 00000AAC 00000007 00000000 0000FFFF ....................é.0....... 000140
 0000FFFF FFFF0133 000C0026 00B700CF 80020400 0AAD0003 00030000 00000000 ..........Ù.....ú.ñ.&...3....... 000160
 00000000 FFFFFFFF 0134000C 002600A5 00CF8002 00000AB1 00070003 00000000 ........Ý.....ú.É.&...4......... 000180
 00000000 0000FFFF FFFF0135 000C0026 009300CF 80020000 0AB90006 00030000 ......¿.....ü...&...5........... 0001A0
 00060000 00000000 FFFFFFFF 00820008 003C0083 00058001 00010AC0 00050005 ....ã.........<................. 0001C0
 00060005 00000000 0000FFFF FFFF0080 000700C0 00780007 80020008 0AC60000 ..ó.......x.â................... 0001E0

Dump of file SATURN:[PCCOMMON.DUMP.DLL]DAPSETDF.TMP;1 on 18-APR-1990 10:42:54.27
File ID (609,9,0)   End of file block 85 / Allocated 88

Virtual block number 83 (00000053), 512 (0200) bytes

 0ACE0000 00070000 00000000 FFFFFFFF 00800008 0064006C 00058001 00010AC7 Ú.......l.d....................ö. 000000
 04000ACF 00030003 00000000 0000FFFF FFFF0081 003000C5 003A0005 80020000 .......:.é.0.................ü... 000020
 80020000 0AD30007 00030000 00000000 FFFFFFFF 0130000C 0024005E 00CF8002 ..ú.^.$...0...............£..... 000040
 00CF8002 00000ADB 00060003 00000000 0000FFFF FFFF0131 000C0026 004C00CF ü.L.&...1...............Ü.....ü. 000060
 00050005 80010002 0AE20010 00050000 00000000 FFFFFFFF 0132000C 0026003A :.&...2...............ã......... 000080
 0019001F 00388001 00010AF3 00040005 00000000 0000FFFF FFFF0096 002D00F0 Þ.-..................µ.....8.... 0000A0
 0008001A 001F0078 80010001 0AF80004 00050000 00000000 FFFFFFFF 00970008 ..................½.....x....... 0000C0
 00990008 001A001F 00888001 00010AFD 00040005 00000000 0000FFFF FFFF0098 ..................».....|........ 0000E0
 FFFF009A 00080028 0014000A 80010001 08020007 00050000 00000000 FFFFFFFF ..........................(....... 000100
 FFFFFFFF 00980008 00280009 000A8001 00010B0A 00070005 00000000 0000FFFF ........................(........ 000120
 0000FFFF FFFF009C 00080037 00140038 80010001 0B12000A 00050000 00000000 ..................8...7........... 000140
 00000000 FFFFFFFF 00900008 00370014 00788001 00010B1D 000A0005 00000000 ..............x...7............... 000160
 00000000 0000FFFF FFFF009E 00080037 00140088 80010001 0B28000A 00050000 ......(.....|...7................. 000180
 00050000 00000000 FFFFFFFF 009F0008 00370009 00388001 00010B33 000A0005 ....3.....8...7................... 0001A0
 000A0005 00000000 0000FFFF FFFF00A0 00080037 00090078 80010001 0B3E000A ..>.....x...7..................... 0001C0
 00746365 6C655300 00000000 FFFFFFFF 00A10008 00370009 00888001 00010B49 I.....|...7...Å..........Select. 0001E0

Dump of file SATURN:[P^^COMMON.DUMP.DLL]DAPSETDF.TMP;1 on 18-APR-1990 10:42:54.27
File ID (609,9,0)   En  of file block 85 / Allocated 88

Virtual block number 84 (00000054), 512 (0200) bytes

 003A7974 69746E45 2A00003A 6560616E 20746573 20706968 7372656E 74726150 Partnership-set name:..*Entity:. 000000
 796E6F6E 79532A00 003A6079 6E6F6E79 5300003A 6E6F6974 70697263 73654400 .Description:..Synonym:..*Synony 000020
 68737265 6E747261 50006574 656C6544 00656361 6C706552 00646441 00007360 ms..Add.Replace.Delete.Partnersh 000040
 003A7974 69746E65 20646574 616C6552 2A006E6F 69746160 726F666E 69207069 ip information.*Related entity:. 000060
 6C657220 726F6620 73656075 6C6F5600 003A7465 73702064 6574616C 65522A00 .*Related pset:..Volumes for rel 000080
 61400000 3A646574 63657078 4500003A 6E694D00 3A797469 746E6520 64657461 ated entity:.Min:..Expected:..Ma 0000A0
 65440065 63616C70 65520064 64410000 73706968 7372656E 74726150 00003A78 x:..Partnerships..Add.Replace.De 0000C0
 412A0079 72616069 72500000 3A79656B 20646574 6169636F 73734100 6574656C lete.Associated key:..Primary.*A 0000E0
 6E692D79 72616069 7270202C 6560616E 28207379 656B2064 65746169 636F7373 ssociated keys (name, primary-in 000100
 676F4C00 6574656C 65440065 63616C70 65520064 64410000 29726F74 61636964 dicator)..Add.Replace.Delete.Log 000120
 6560756C 6F560044 4E410052 4F580052 4F490072 6F746172 65706F20 6C616369 ical operator.IOR.XOR.AND.Volume 000140
 64726F77 79654B00 003A7861 4D00003A 64657463 65707845 00003A6E 694D0073 s.Min:..Expected:..Max:..Keyword 000160
 00657465 6C654400 6563616C 70655200 64644100 00736472 6F777965 4B00003A :..Keywords..Add.Replace.Delete. 000180
 74656C65 44006563 616C7065 52006464 41000073 65746F4E 2A00003A 65746F4E Note:..*Notes..Add.Replace.Delet 0001A0
 65735500 65606954 00657461 44006E6F 69746160 726F666E 69207265 73550065 e.User information.Date.Time.Use 0001C0
 5F5F5F00 5F5F5F5F 5F5F5F5F 5F5F0064 65746164 70550064 65746165 72430072 r.Created.Updated.________ .___ 0001E0
```

```
Dump of file SATURN:[PCCOMMON.DUMP.DLL]DAPSETDF.TMP;1 on 18-APR-1990 10:42:54.27
File ID (609,9,0)   End of file block 85 / Allocated 88

Virtual block number 85 (00000055), 512 (0200) bytes

5F5F005F 5F5F5F5F 5F5F5F5F 5F005F5F 5F5F5F5F 5F5F5F5F 005F5F5F 5F5F5F5F _______._________._________.__ 000000
00000000 00000000 F3000000 005F5F5F 5F5F5F5F 5F5F5F00 5F5F5F5F 5F5F5F5F _______._________............. 000020
00000000 00000000 00000000 00000000 00000000 00000000 00000000 00000000 ................................ 000040
00000000 00000000 00000000 00000000 00000000 00000000 00000000 00000000 ................................ 000060
00000000 00000000 00000000 00000000 00000000 00000000 00000000 00000000 ................................ 000080
00000000 00000000 00000000 00000000 00000000 00000000 00000000 00000000 ................................ 0000A0
00000000 00000000 00000000 00000000 00000000 00000000 00000000 00000000 ................................ 0000C0
00000000 00000000 00000000 00000000 00000000 00000000 00000000 00000000 ................................ 0000E0
00000000 00000000 00000000 00000000 00000000 00000000 00000000 00000000 ................................ 000100
00000000 00000000 00000000 00000000 00000000 00000000 00000000 00000000 ................................ 000120
00000000 00000000 00000000 00000000 00000000 00000000 00000000 00000000 ................................ 000140
00000000 00000000 00000000 00000000 00000000 00000000 00000000 00000000 ................................ 000160
00000000 00000000 00000000 00000000 00000000 00000000 00000000 00000000 ................................ 000180
00000000 00000000 00000000 00000000 00000000 00000000 00000000 00000000 ................................ 0001A0
00000000 00000000 00000000 00000000 00000000 00000000 00000000 00000000 ................................ 0001C0
00000000 00000000 00000000 00000000 00000000 00000000 00000000 00000000 ................................ 0001E0

Dump of file SATURN:[PCCOMMON.DUMP.DLL]DASHORT.TMP;1 on 18-APR-1990 10:43:15.93
File ID (613,14,0)   End of file block 77 / Allocated.80

Virtual block number 1 (00000001), 512 (0200) bytes

00000000 00000040 00000000 00000088 0000FFFF 00000004 00000049 01665A4D MZf.I...........I.......ә....... 000000
00000080 00000000 00000000 00000000 00000000 00000000 00000000 00000000 ................................ 000020
6F6E6E61 63206D61 72676F72 70207369 685421CD 4C01B821 CD09B400 0EBA1F0E ..¤..Ç.ël¦.LeIThis program canno 000040
00000000 00000024 0A0D002E 65646F6D 20534F44 206E6920 6E757220 65622074 t be run in DOS mode....$....... 000060
000C000C 00000000 00060000 00000000 00098009 FA6192F8 001603EA 0505454E NE..ð...½.a°.................... 000080
00000000 00000000 00010003 00040000 00000480 010A00F2 00AC00A0 00400032 2.ә...¯.·....................... 0000A0
18A80F00 18A8017E 07080F00 07070102 07BA0F00 07BA007F 02A20F00 02A1004C L.À...À...¤...¤.........-.˙...˙. 0000C0
02020E21 00000000 1A2A0F00 1A2A0549 000F0F00 000F0547 21560F00 2156031E ..VI..VIG.......I.°...°.....!... 0000E0
019C1EB1 019C0983 03B51EB1 03B50947 02C11EB1 02C1091A 23F00F21 225C06F2 ˙.\"I.Þ#..è.Ý.è.G.ç.Ý.ç.....Ý... 000100
49544E45 48435441 42110000 74726F68 73616407 01310004 02580004 01F40004 ..¶...X...1..dashort...BATCHENTI 000120
42100003 434F5250 474C4454 4E454843 54414241 44110002 45544145 52435954 TYCREATE...DABATCHENTDLGPROC...B 000140
01DE01C6 018A0116 00100007 00010000 04434F52 50474C44 52545441 48435441 ATCHATTRDLGPROC.............Ó.B. 000160
44006C60 6403534C 4C414353 4F44084E 49574050 050002D3 02B002A9 0250023C <.P.`.§.Æ...PMWIN.DOSCALLS.dml.D 000180
504F5453 4C4D440A 4E585454 52415453 4C4D4408 4D544845 52495551 43414C4D MLACQUIREHTM.DMLSTARTTXN.DMLSTOP 0001A0
41484C45 444F4D59 52455551 4C4D4413 4C45444F 4D454552 464C4044 0C4E5854 TXN.DMLFREEMODEL.DMLQUERYMODELHA 0001C0
414E4C45 444F4D59 52455551 4C4D4411 49544759 52455551 4C4D4408 454C444E NDLE.DMLQUERYGTI.DMLQUERYMODELNA 0001E0

Dump of file SATURN:[PCCOMMON.DUMP.DLL]DASHORT.TMP;1 on 18-APR-1990 10:43:15.93
File ID (613,14,0)   End of file block 77 / Allocated 80

Virtual block number 2 (00000002), 512 (0200) bytes

4408444C 45494659 52455551 4C4D4400 544E554F 43595245 55514C4D 440D454D ME.DMLQUERYCOUNT.DMLQUERYFIELD.D 000000
52595245 55514C40 440C4E4C 52595245 55514C40 4408444C 45494654 45534C4D MLSETFIELD.DMLQUERYRLN.DMLQUERYR 000020
4552464C 4D440845 54414C45 524E554C 4D440845 54414C45 524C4D44 09314E4C LN1.DMLRELATE.DMLUNRELATE.DMLFRE 000040
4D440945 54414552 434C4D44 0944494C 4D445952 4555514C 4D440D54 53494C45 ELIST.DMLQUERYDMLID.DMLCREATE.DM 000060
54584554 45544952 574C4D44 0C545845 54444145 524C4D44 08455445 4C45444C LDELETE.DMLREADTEXT.DMLWRITETEXT 000080
0A434F52 504C4F4F 54464544 4954470E 4C4F4F54 4C4C494B 4954470B 49544703 .GTI.GTIKILLTOOL.GTIDEFTOOLPROC. 0000A0
54471257 4F444E49 574C4F4F 54595245 55514954 47124753 4D444E45 53495447 GTISENDMSG.GTIQUERYTOOLWINDOW.GT 0000C0
54504154 41445855 4 ;44553 49544710 52545041 54414458 55415952 45555149 IQUERYAUXDATAPTR.GTISETAUXDATAPT 0000E0
41455243 4D454D0D 4D454D03 544E4552 41504C4F 4F545952 45555149 54471252 R.GTIQUERYTOOLPARENT.MEM.MEMCREA 000100
4C42434F 4C4C414D 454D0D50 41454859 4F525453 4544404S 4D0E5041 45484554 TEHEAP.MEMDESTROYHEAP.MEMALLOCBL 000120
594E414D 4B434950 104B4349 50414406 4B434F4C 42454552 464D454D 0C4B434F OCK.MEMFREEBLOCK.DAPICK.PICKMANY 000140
54551352 4F535255 4354494E 49474142 4C545510 54554403 5453494C 4D4F5246 FROMLIST.OUT.UTLBAGINITCURSOR.UT 000160
4C54550C 4548414D 5145534C 54550A52 4F535255 43455441 52455449 4741424C LBAGITERATECURSOR.UTLSEQMAKE.UTL 000180
41514553 4C54550D 4C454556 4F4D4552 5145534C 54550E45 4B41404E 55514553 SEQUNMAKE.UTLSEQREMOVEEL.UTLSEQA 0001A0
440C6061 6403444C 45494654 45534D41 44084553 41425050 41074D45 54494444 DDITEM.APPBASE.DAMSETFIELD.dam.D 0001C0
4552434D 41440C52 54544145 54414552 434D4144 00544E45 45544145 52434D41 AMCREATEENT.DAMCREATEATTR.DAMCRE 0001E0
```

```
Dump of file SATURN:[PCCOMMON.DUMP.DLL]DASHORT.TMP;1 on 18-APR-1990 10:43:15.93
File ID (613,14,0)   End of file block 77 / Allocated 80

Virtual block number 3 (00000003), 512 (0200) bytes

 4554454C 45444041 440C5443 454A424F 5055484F 4F4C4041 440F4D4F 44455441 ATEDOM.DAMLOOKUPOBJECT.DAMDELETE 000000
 45544E45 434C5455 0F4C5455 03525245 594E4154 414D524F 46404144 0F4A424F OBJ.DAMFORMATANYERR.UTL.UTLCENTE 000020
 49530345 50595452 41484354 45474044 500E4241 544D4450 06574F44 4E495752 RWINDOW.PDMTAB.PDMGETCHARTYPE.SI 000040
 00000000 03050100 00030401 00000303 0100F503 01014554 49525753 4F44084F O.DOSWRITE...%................... 000060
 0F000073 60724F46 20797274 6E452068 63746142 20414420 40502032 2F534F1C .OS/2 PM DA Batch-Entry FOrms... 000080
 00000000 00000000 00000000 00000000 01434F52 504C4F4F 5454524F 48534144 DASHORTTOOLPROC................. 0000A0
 03750000 30F24689 0000FFFF 9A5016FA 4680006A DBBEFFFF 881E5657 00000EC8 à...WV.|...Àj..F'.P......F·=..u. 0000C0
 00003DF2 46890000 FFFF9A50 16FC4680 2F6A466A FA76FF00 C5E9F246 880006E9 Ò...F·Òé..v'jFj/.F=.P......F·=.. 0000E0
 06468304 478926FA 4688FC5E C4009BE9 F2468800 00FFFF9A FA76FF00 0EE90375 u.Ò...v'......F·Ò..á^•.F'&.G..F. 000100
 C408C483 FFFF0056 9A505200 0A05FE56 88FC4688 FC77FF26 FE77FF26 065EC404 .á^.&.w±&.w•.F=.V±...RP.V....à.à 000120
 FF0A76FF 0000FFFF 9A505200 2805FE56 88FC4688 0A76FF20 478926F4 4688FC5E ^=.F¶&.G-.v..F=.V±.+.RP......v.. 000140
 F6468D50 52000A05 FE5688FC 46880A76 FF016AF2 46890000 FFFF9AFC 76FFFE76 v±.v•......F·j..v..F=.V±...RP.F- 000160
 5688F646 88FC5EC4 0016E9F2 46880006 E9037500 0030F246 890000FF FF9A5016 .P......F·=..u.Ò...F·Ò..á^=.F-.V 000180
 8E000888 1E565700 0008C300 06CAC95F 5E1F0000 E90000B8 02578926 078926F8 ¼&..&.W.|..Ò...^_èb..à...WV.|... 0001A0
 88017CE9 99F84688 F84689FF FF00009A 0A76FF0C 76FF1076 FF0148E9 0E46..D8 Á.F.ÒH..v..v..v.......F½.F½.Ò|.| 0001C0
 00989A50 16FE468D 1076FF00 0001C59A 5016FA46 8D1076FF 0173E900 008A00. ..¤..Òs..v..F'.P.é....v..F±.P... 0001E0

Dump of file SATURN:[PCCOMMON.DUMP.DLL]DASHORT.TMP;1 on 18-APR-1990 10:43:15.93
File ID (613,14,0)   End of file block 77 / Allocated 80

Virtual block number 4 (00000004), 512 (0200) bytes

 FF260277 FF26FA5E C40000FF FF9A016A 006A5052 99104688 1DAE68FE 76FF0000 ...v±hÙ..F..RPj.j......á^'&.w.&. 000000
 26FA5EC4 011FE999 F8468800 07E90375 000030F8 46890000 FFFF9A00 42681E37 7.hB.......F½=..u.Ò...F½.Ò..á^'& 000020
 B80000FF FF9A006A 1076FF06 C483FFFF 02859A37 FF260277 FF26FA5E C40477FF .w.á^'&.w.&.7......á..v.j......| 000040
 801076FF 000FE900 008A0000 88000107 C7260A5E C400E7E9 00F3E900 008A0000 ..¤..Òµ.ÒÒ.á^.&ú...|..¤..ÒÒ..v.. 000060
 FA5EC400 BEE90000 8A000088 0009E903 74FC4608 FA468800 00FFFF9A 5016FA46 F'.P......F'.F•t.Ò..|..¤..Ò/.á^' 000080
 03750000 300000FF FF9A37FF 260277FF 26FA5EC4 002EE903 75024708 26078826 &..&.G.u.Ò..á^'&.w.&.7.....=..u. 0000A0
 77FF26FA 5EC40000 E9037500 00300000 FFFF9A37 FF260277 FF26FA5E C40000E9 Ò..á^'&.w.&.7.....=..u.Ò..á^'&.w 0000C0
 76FF0A76 FF0C76FF 0E76FF10 76FF0060 E9006CE9 0000BA00 00880000 00499A04 ..|...|..¤..Òl.Ò'..v..v..v..v..v 0000E0
 75100130 0013E903 76FF65E9 03751004 300043E9 004FE900 00FFFF9A 0676FF08 ..v.......ÒO.ÒC.=..u.Òe.v.Ò..=..u 000100
 30FEA9E9 03751DAD 30FF88E9 03751005 30FFC3E9 FE98E903 75100330 FE88E903 .Ò£±=..u.Ò.±Òù.=..u.Ò|.=Ù.u.Ò`±= 000120
 CAC95F5E 1F0000E9 0000BA00 0088FFA0 E9FF1CE9 03751D80 30FF21E9 03751DAE Û.u.Òl.=¯.u.Ò..Ò..|..¤..Ò...^_èb 000140
 04013E02 03000000 03019000 02016600 0400A602 03000000 01011300 0200110C ...............1...f...........>.. 000160
 05001402 03001400 0300C302 03000000 0900FD00 02000000 07007A00 02017700 .w...z.......»........ù.......... 000180
 04024502 03019C00 05022202 03002200 03016602 03011A00 04019802 03018E00 ..................f..."..."........E.. 0001A0
 04015302 0301AB00 05003602 03003900 03020E02 03002E00 0301F702 03012600 .&...%...........9...6........S.. 0001C0
 E9064688 D88EFFFF 881E5657 000000C8 00000000 00015300 04013102 03013500 .5...1...S......à...WV.|...Á.F.Ò 0001E0

Dump of file SATURN:[PCCOMMON.DUMP.DLL]DASHORT.TMP;1 on 18-APR-1990 10:43:15.93
File ID (613,14,0)   End of file block 77 / Allocated 80

Virtual block number 5 (00000005), 512 (0200) bytes

 76FF0A76 FF005868 1E00CDE9 08C48300 3400569A 0876FF0A 76FF0056 681E00C0 à..hV..v..v..V.4..á.Òe..hX..v..v 000000
 A3E908C4 83005E00 569A0876 FF0A76FF 005A681E 0088E908 C4830049 00569A08 ..V.I..á.Ò|..hZ..v..v..V.^..á.ÒÉ 000020
 0876FF0A 76FF005F 681E008E E908C483 00730056 9A0876FF 0A76FF00 5C681E00 ..h\..v..v..V.s..á.Ò...h_..v..v. 000040
 0064E908 C483009D 00569A08 76FF0A76 FF006168 1E0079E9 08C48300 8800569A .V....á.Òy..ha..v..v..V¯...á.Òd. 000060
 9A0876FF 0A76FF00 64681E00 4FE908C4 83008200 569A0876 FF0A76FF 0062681E .hb..v..v..V.ÿ..á.ÒO..hd..v..v.. 000080
 E90025E9 08C483FF FF00569A 0876FF0A 76FF0066 681E003A E908C483 00C70056 V.ú..á.Ò:..hf..v..v..V....á.ÒX.Ò 0000A0
 0090007B 00660051 003C0027 001200E2 A7FF2E93 C003001A E9037600 08300022 ".=..v.Ò...ã...Iã...'.<.Q.f.(... 0000C0
 FBA08689 FBA28689 0000B808 8E000888 1E565700 04AEC8CB C95F5E1F 008A00A5 É.¤..^_èùàÙ..WV.|...Ä|....Å«...« 0000E0
 86890000 FFFF9A00 6A0676FF 0876FF03 E8FC1086 C7F8A486 89F8A686 89000088 |....I«..É«ú..•Ò..v..v.j........ 000100
 8826F8A0 9EC401C5 E90000B8 0006E903 7500107F 8326F8A0 9EC4F8A2 9689F8A0 .«..Å«á..«&....u.Ò..|..Òé.á..«&. 000120
 89FC4689 01A69788 2601A487 8826F8A0 9EC4FC0E 9689FC0C 86890E57 88260C47 G.&.W....•....•á..«&..É.&..I..F•. 000140
 6A01F968 0676FF08 76FFFBA6 9689F8A4 86890457 88260247 8826F8A0 9EC4FE56 V±á..«&.G.&.W...É«..I«.v..v.h'.j 000160
 5016F8A8 86805016 F852868D F8A4B6FF F8A6B6FF 0000FFFF 9A5016FB 5286804C L..R«.P......ÑI«.ÑÉ«..R«.P..´«.P 000180
 16F8A886 80006868 1E006A00 6A003FE9 03750000 30FFFF06 C79A0676 FF0876FF .v..v..ú...=..u.Ò?.j.j..hh...´«. 0001A0
 01F96806 76FF0876 FF016A00 6A14C483 0211077D 9A016A00 6A0676FF 0876FF50 P.v..v.j.j..)....á.j.j..v..v.h'. 0001C0
 149A0676 FF0876FF 5016F852 86800100 E90001B8 00000293 9A505200 00028C9A .....RP.....|..Ò....R«.P.v..v... 0001E0
```

Dump of file SATURN:[,'CCOMMON.DUMP.DLL]DASHORT.TMP;1 on 18-APR-1990 10:43:15.93
File ID (613,14,0)   End of file block 77 / Allocated 80

Virtual block number 6 (00000006), 512 (0200) bytes

```
FC0C868D FBA4B6FF FBA686FF 00EBE900 01B80006 E9037400 013008C4 83027903 .y..á.=..t.Õ..¡..ÕS..Ñl«.ÑE«...• 000000
FFFB9E86 FF0052E9 03750000 30FB9E86 890000FF FF9A006A 5016F852 86805016 .P..R«.Pj.........«=..u.ÕR..Ñ.«. 000020
FF0876FF 5016FC12 8680007B 681E006A 006A0000 FFFF9A50 16FC1286 80FC1086 Ñ.•...•.P.....j.j..h(....•.P.v.. 000040
0000FFFF 9A01F968 0676FF08 76FF016A 006A14C4 83FFFF07 7D9A016A 006A0676 v.j.j..)....á.j.j..v..v.h'...... 000060
5789260C 478926FC 0E968BFC 0C8688F8 A09EC400 72E90001 B80000FF FF9A5052 RP.....¡..Õr.Á..«...•...•&.G.&.W 000080
FF26FBA0 9EC40000 02E79AFC 0C86FFFC 0EB6FF01 6A006A00 6AFC76FF FE76FF0E ..v±.v•j.j.j..Ñ.=.Ñ.=.Õ...á..«&. 0000A0
76FF0876 FF0000FF FF9AFC0C B6FFFC0E B6FF006A 006A006A 01A8B7FF 2601AAB7 ñ`.&.ñ`.j.j.j..Ñ.=.Ñ.=......v..v 0000C0
1F0000E9 00008800 011047C7 26FBA09E C40000FF FF9A5016 F8528680 01F96806 .h'...R«.P.....á..«&ÚG...¡..Õ... 0000E0
16FF5286 8D4C6A01 91680676 FF0876FF 088E0101 881E5657 00008OC8 CBC95F5E ^_èùà¯..WV.¡...Á.v..v.h..jL..R.. 000100
FF528E80 0020E903 7500030D 04C48303 5F00869A 5016FF52 86800000 01989A50 P¯.......R..P.Ñ. ..á.=..u.Õ ../R. 000120
E90000B8 0006E903 7400013D 04C48303 7B00869A 5016FF52 8680001C E903742A *t.Õ....R..P.Ñ.{..á.=..t.Õ..¡..Õ 000140
E903743F FF528E80 0063E903 7400013D 04C48303 9800869A 5016FF52 86800406 ....R..P.Ñ....á.=..t.Õc../R.?t.Õ 000160
006A03CA E90000B8 0006E903 7400013D 04C48303 F400869A 0A76FF0C 76FF0059 Y..v..v..Ñ.¶..á.=..t.Õ..¡..Õò.j. 000180
016A006A 14C48304 2C077D9A 016A006A 0676FF08 76FF00A1 681E008E 681E006A j..h...hÀ..v..v.j.j..).,..á.j.j. 0001A0
76FF0C76 FF038DE9 00018800 0004469A 50520000 043F9A01 F9680676 FF0876FF .v..v.h'..?...RP.F...¡..Õ...v..v 0001C0
0377004B 30C60304 C483045B 00869AF0 885116FF 528E8D04 C4830404 00869A0A ..Ñ....á...R..Q.Þ.Ñ.[..á..ó=K.w. 0001E0
```

Dump of file SATURN:[PCCOMMON.DUMP.DLL]DASHORT.TMP;1 on 18-APR-1990 10:43:15.93
File ID (613,14,0)   End of file block 77 / Allocated 80

Virtual block number 7 (00000007), 512 (0200) bytes

```
C48304D7 077D9A01 6A006A06 76FF0876 FF000C68 1E00C968 1E006A00 6A003DE9 Õ=.j.j..hè..hÉ..v..v.j.j..).•..á 000000
0328E900 01B80000 04F19A50 52000004 EA9A01F9 680676FF 0876FF01 6A006A14 .j.j..v..v.h'..õ...RP.þ...¡..Õ(. 000020
D49A5016 FF52868D 2A6AAF56 89AC4689 06C48304 7101A69A 5016FF52 86802A6A j*..R..P.İ.q..á..F¯.VÙj*..R..P.Á 000040
89A64689 06C48304 9D01A69A 5016FF52 86803F6A A45689A2 468906C4 8304??01 ....á..FÀ.VÊj?..R..P.İ....á..Fİ. 000060
0375A846 0BA6468B FE5689FC 468906C4 83051101 D49A5016 FF52868D 3F6AAE56 V`j?..R..P.Á....á..F•.V±.Fİ.F`u. 000080
0676FF08 76FF0118 681E0105 681E006A 006A003D E90375AE 4608AC46 8B0048E. ÕH..F¯.FÙu.Õ=.j.j..h...h...v..v. 0000A0
50520000 057B9A01 F9680676 FF0876FF 016A006A 14C48305 68077D9A 016A006A j.j..).h..á.j.j..v..v.h'..(...RP 0000C0
D49A5016 FF52868D 2A6A0108 E90374A8 4608A646 88027DE9 00018800 0005829A .....¡..Õ)..Fİ.F`t.Õ..j*..R..P.Á 0000E0
06C48305 9501A69A FA8BF08B 5116FF52 8E8D2A6A A45689A2 468906C4 83052801 .+..á..FÀ.VÊj*..R..Q.Þ.'.İ....á. 000100
6A0030E9 0374AE46 0BAC468B 0008E903 74D73800 12E90374 C638AE56 89AC4689 .F¯.VÙ;ót.Õ..;■t.Õ...F¯.FÙt.Õ=.j 000120
6A006A14 C483067A 077D9A01 6A006A06 76FF0876 FF015C68 1E014968 1E006A00 .j..hI..h\..v..v.j.j..).z..á.j.j 000140
FFAE76FF 01ECE900 01B80000 06949A50 52000006 8D9A01F9 680676FF 0876FF01 ..v..v.h'......RP.....¡..Õš..vÙ. 000160
FF508689 C62804C4 8305C200 B69AF08B 5116FF52 8E8D04C4 8305A500 B69AAC76 v¯.Ñ.E..á...R..Q.Þ.Ñ.ò..á.+ó..P. 000180
FF008042 C6FF5086 880AC483 050000CE 9A501680 46805016 FF52868D FF5086FF .ÑP...R..P.F¯.P.o.ì..á..ÑP.6B¯.. 0001A0
50168046 8D505240 AE5688AC 468808C4 8305F300 109A5016 8046800A 76FF0C76 v..v..F¯.P...µ..á..F¯.VÙ@RP.F¯.P 0001C0
46C70164 E908C483 06A70056 9A0A76FF 0C76FF50 1680468D 08C48306 0600109A ......á..F¯.P.v..v..V.İ..á.Õd.ùF 0001E0
```

Dump of file SATURN:[PCCOMMON.DUMP.DLL]DASHORT.TMP;1 on 18-APR-1990 10:43:15.93
File ID (613,14,0)   End of file block 77 / Allocated 80

Virtual block number 8 (00000008), 512 (0200) bytes

```
46FF9E46 FF0009E9 03743F3F 80269E5E C4A05689 9E4689A8 5688A646 880000AA ¯...Fİ.V`.F..V.á^.&.??t.Õ...F..F 000000
FE5688FC 46880054 E90375A8 56390008 E90374A6 4639FE56 88FC468B FFEBE9AA `ÕS..F•.V±9Fİt.Õ..9V`u.ÕI..F•.V± 000020
0876FF01 85681E01 72681E00 6A006A00 30E90375 A0563B00 08E90374 9E463840 a;F.t.Õ..;V.u.Õ=.j.j..hr..h...v. 000040
0001F19A 01F96806 76FF0876 FF016A00 6A14C483 06CD077D 9A016A00 6A0676FF .v.j.j..).è..á.j.j..v..v.h'..þ.. 000060
75AA463B 04C48300 1F00869A 0A76FF0C 76FF000A E90001BB 000001F8 9A505200 .RP.½...¡..ÕÕ..v..v..Ñ....á.;F`u 000080
8301DE07 7D9A016A 006A0676 FF0876FF 01AE681E 019B681E 006A006A 003DE903 .Õ=.j.j..h...hÙ..v..v.j.j..).B.. 0000A0
87E90001 B8000003 E19A5052 000003DA 9A01F968 0676FF08 76FF016A 006A14C4 á.j.j..v..v.h'..Õ...RP.Å...¡..Õ. 0000C0
2804C483 07270086 9AF08B51 16FF528E 8D04C483 070A0086 9AA676FF A876FF00 ..v`.vİ.Ñ....á...R..Q.Þ.Ñ.'..á.+ 0000E0
FF50868B 0AC48307 4200CE9A 50168046 8D5016FF 528680FF 5086FFFF 508689C6 ó..P..ÑP...R..P.F¯.P.ö.B..á..ÑP. 000100
A85688A6 4603AA46 8808C483 075A0010 9A501680 46800A76 FF0C76FF 008042C6 6B¯..v..v..F¯.P...Z..á..F`.Fİ.V` 000120
83033F00 569A0A76 FF0C76FF 50168046 8D08C483 07600010 9A501680 46805052 RP.F¯.P...m..á..F¯.P.v..v..V.7.. 000140
FF0676FF 0876FFD8 8E031C88 1E565700 0002C8CB C95F5E1F 0000E900 008808C4 á.¡..Õ...^_èùà...WV.¡...Á.v..v.. 000160
8BFE4689 0000FFFF 9A1876FF 1676FF12 76FF1476 FF0E76FF 1076FF0A 76FF0C76 v..v..v..v..v..v..v..v.......F±. 000180
03320103 00860001 02FB0103 00000002 03C70002 0000CBC9 5F5E1F00 00E9FE46 F±Õ...^_èù....ú.......«.......2. 0001A0
06FA0002 00130001 06E00103 00880001 07A80103 00000004 01890002 00870001 ......¿.......´.......À.......'. 0001C0
06E70103 001F0001 012A0103 00000009 07850002 02540009 02380203 00000007 ......;...T..........*.......Ó. 0001E0
```

```
Dump of file SATURN:[PCCOMMON.DUMP.DLL]DASHORT.TMP;1 on 18-APR-1990 10:43:15.93
File ID (613,14,0)    End of file block 77 / Allocated 80

Virtual block number 9 (00000009), 512 (0200) bytes

 00000000 00000000 00000000 022E0007 02C60203 02990009 025A0203 00400001 ..M...Z.......6................. 000000
 88EE4689 F0468900 00880000 E046C700 00E846C7 D88EFFFF 881E5657 000024C8 A$..WV.|...AúFÒ..úFÀ..|...FÞ.FŸ| 000020
 FE468900 0088DC47 890E4689 000088E2 4689E446 89000088 F64689F8 46890000 ...F%.F-|...FÒ.Fã|...FB.FÊ|...F± 000040
 468D01AC 68466A0A 76FF0000 E646C7EA 4689EC46 89000088 0000FA46 C7FC4689 .F=úF*..|...F&.FõúF|...v.jFh¯..F 000060
 260E5688 0C4688EE 5EC40151 E90003E9 03750000 30E84689 0000FFFF 9A5016EE Ÿ.P......FÒ=..u.Õ..Õ0.6^Ÿ.F..V.& 000080
 88064688 EE5EC400 000647C7 26EE5EC4 0789260A 4688EE5E C4045789 26024789 .G.&.W.6^Ÿ.F.&..6^Ÿ&úG...6^Ÿ.F.. 0000A0
 FFFF9A50 16F6468D 0A76FF00 001047C7 26EE5EC4 01AA9789 2601A887 89260856 V.&..´.&..´.6^Ÿ&úG....v..F-.P... 0000C0
 0000FFFF 9A5016E2 468D0C76 FF0E76FF 00F7E900 03E90375 000030E8 46890000 ...FÒ=..u.Õ..Õ%..v..v..Fã.P..... 0000E0
 16FC468D 186AE276 FFE476FF 0C76FF0E 76FF0009 E90003E9 03750000 30E84689 .FÒ=..u.Õ..Õ1..v..v..vÕ.vãj..F•. 000100
 DE56890C 4689FE56 88FC4688 0083E900 03E90375 000030E8 46890000 FFFF9A50 P......FÒ=..u.Õ..Õ°..F•.V±.FÊ.VB 000120
 FF260C5E C4006A00 6A006AF6 76FFF876 FF0030E9 03750247 0B26078B 260C5EC4 6^Ê&..&.G.u.ÕO..v%.v-j.j.j.6^Ê&. 000140
 C4FFC1E9 040C4683 006FE900 03E90375 000030E8 46890000 FFFF9A37 FF260277 w.&.7......FÒ=..u.Õ..Õo..FÊ.Õe.6 000160
 FFFF9A50 16FA468D 0C76FF0E 76FF01A6 97892601 A4878926 F8568BF6 4688EE5E ^Ÿ.F-.V%&..Ê.&..Ì..v..v..F*.P... 000180
 6A006A00 00FFFF9A 5016EA46 80FA76FF 0037E900 03E90375 000030E8 46890000 ...FÒ=..u.Õ..Õ7..v*.Fõ.P.....j.j 0001A0
 9AEE76FF F076FF01 F4680200 36FF2621 78068EFF FF68FFFF 68EA76FF EC76FF01 ..v$.võh..h....xI&.6..h¶..vÞ.vŸ. 0001C0
 0000FFFF 9AEE76FF F076FF0A 76FF0026 E90375F0 4608EE46 88E64689 0000FFFF .....FÌ.FŸ.FÞu.Õ&..v..vÞ.vŸ..... 0001E0

Dump of file SATURN:[PCCOMMON.DUMP.DLL]DASHORT.TMP;1 on 18-APR-1990 10:43:15.93
File ID (613,14,0)    End of file block 77 / Allocated 80

Virtual block number 10 (0000000A), 512 (0200) bytes

 0375F846 08F64688 ¯84689E0 46880003 E9E84688 0006E903 7500E87E 83E04689 .FÀ.-Õ.u.Õ...FÒÕ...FÀ.FÒ.F-.F%u. 000000
 0003E9E8 46880006 .7037500 E87E83E0 46890000 FFFF9AF6 76FFF876 FF0023E9 Õ#..v%.v-......FÀ.-Õ.u.Õ...FÒÕ.. 000020
 FFFF9AFC 76FFFE76 FF0C76FF 0E76FF00 29E90375 FE460BFC 4688E846 89E04688 .FÀ.FÒ.F=.F±u.Õ)..v..v..v±.v•... 000040
 0374FFE6 7E83E846 89E04688 0003E9E8 46880006 E9037500 E87E83E0 46890000 ...FÀ.-Õ.u.Õ...FÒÕ...FÀ.FÒ.-Ì.t. 000060
 5E1F0000 E9E84688 0006E9F2 4688F456 89F24689 0000FFFF 9A006A00 6A0015E9 Õ..j.j.......F´.V¶.F´Õ...FÒÕ...^ 000080
 88F64689 F8468900 00880000 FA46C7D8 8E000888 1E565700 000AC800 0ACAC95F _èÒ..À...WV.|...AúF*..|...F%.F-| 0000A0
 03750000 30FA4689 0000000C 9A5016F6 46800676 FF0876FF FC4689FE 46890000 ...F±.F•.v..v..F-.P.É....F*=..u. 0000C0
 76FF006A 006A006A FC76FFFE 76FF0A76 FF0676FF 0876FF00 2FE9FA46 880006E9 Õ...F*Õ/..v..v..v..v±.v•j.j.j..v 0000E0
 002AC8CB C95F5E1F 0000E9FA 4688FA46 89FFFF02 FD9AF676 FFF876FF F676FFF8 %.v-.v%.v-.»....F*.F*Õ...^_èúã*. 000100
 4689E246 89000088 0000E846 C700000A 46C70000 DE46C7D8 8E0280B8 1E565700 .WV.|...ÀúFB..úFÒ..úFÒ......Fã.F 000120
 4689EC46 89000088 06468908 46890000 B800000C 46C7E446 89E64689 000088E0 Å|...FÌ.FõúFÉ..|...FÀ.Fø|...F$.F 000140
 4689FE46 89000088 0000F646 C7F24689 F4468900 0088F846 89FA4689 000088EA õ|...F*.F%|...F¶.F´úF-..|...F±.F 000160
 029CE900 03E90375 0000300E 46890000 00649A50 16E0468D 286A466A 1876FFFC •.v.jFj(.FÀ.P.d....FB=..u.Õ..Õ.. 000180
 1A76FF1C 76FF1057 89260E47 89261056 880E4688 E05EC400 78E90374 01127E83 .-..t.Õ(.6^À.F..V.&.G.&.W..v..v. 0001A0
 025CE900 03E90375 0000300E 46890000 FFFF9A50 160A468D 0A6A0E76 FF1076FF .v..v.j..F..P......FB=..u.Õ..Õ\. 0001C0
 1A76FF1C 76FF002A E9085689 0646890C 56880A46 88000FE9 03750C46 080A4688 .F..F.u.Õ...F..V..F..V.Õ*..v..v. 0001E0

Dump of file SATURN:[PCCOMMON.DUMP.DLL]DASHORT.TMP;1 on 18-APR-1990 10:43:15.93
File ID (613,14,0)    End of file block 77 / Allocated 80

Virtual block number 11 (0000000B), 512 (0200) bytes

 46890C56 880A4688 0224E900 03E90375 0000300E 46890000 02849A50 160A468D .F..P.Ç....FB=..u.Õ..Õ$..F..V..F 000000
 5EC40447 89261846 8BE05EC4 02578926 0789261C 56881A46 8BE05EC4 08568906 ..V.6^À.F..V.&..&.W.6^À.F.&.G.6^ 000020
 88064688 E05EC408 57892606 4789260C 56880A46 8BE05EC4 12478926 124688E0 À.F.&.G.6^À.F..V.&.G.&.W.6^À.F.. 000040
 E9037500 0030DE46 89000004 7F9A5016 EA468D18 76FF0C57 89260A47 89260856 V.&.G.&.W..v..Fõ.P......FB=..u.Õ 000060
 8E9A5016 D5468D18 76FF2657 39262447 8926EC56 88EA4688 E05EC401 87E90003 ..Õñ.6^À.Fõ.V$&.G$&.W&.v..Fø.P./ 000080
 89262047 89260856 88064688 E05EC401 88E90003 E9037500 0030DE46 89000000 ....FB=..u.Õ..Õ..6^À.Fø.VA&.G &. 0000A0
 03750000 70DE4689 0000FFFF 9A5016F8 46800A76 FF0C76FF 1A76FF1C 76FF2257 W".v..v..v..v..FÒ.P......FB=..u. 0000C0
 F2468013 6A0A76FF 0C76FF1A 76FF1C76 FF0032E9 03740'E8 7E830156 E90003E9 Õ..ÕV..-Õ.t.Õ2..v..v..v..v.j..F· 0000E0
 2FE90001 1447C726 E05EC401 27E90003 E9037500 0030DE46 89000005 159A5016 .P......FB=..u.Õ..Õ'.6^À&úG...Õ/ 000100
 7500003D DE468900 0001029A 5016F246 8D156A0A 76FF0C76 FF1A76FF 1C76FF00 ..v..v..v..v.j..F´.P......FB=..u 000120
 26F85EC4 FA5689F8 4689F456 88F24688 00001447 C726E05E C400F5E9 0003E903 .Õ..ÕX.6^À&úG....F´.V¶.F%.V*6^%& 000140
 FF260277 FF26F05E C4006A00 6A006AD6 76FFD876 FF0030E9 03750247 08260788 ..&.G.u.ÕO..vÀ.v•j.j.j.6^%&.w.&. 000160
 76FF1C76 FFFFC1E9 04F84683 00A8E900 03E90375 0000300E 46890000 01469A37 7.F....FB=..u.Õ..Õ´..F%.Õe..v..v 000180
 74164608 14468800 03E90003 E9037500 0030DE46 89000001 7E9A5016 F6468D1A ..F-.P.-....FB=..u.Õ..Õ...F..F.t 0001A0
 C40050E9 0003E903 7500003D DE468900 00FFFF9A 5016FC46 80F676FF 004EE903 .ÕN..v-.F=.P......FB=..u.Õ..Õ].6 0001C0
 76FF003E E90003E9 03750000 30DE4689 00000199 9A5016E4 46802877 FF26FC5E ^•&.w+.FÒ.P......FB=..u.Õ..Õ>..v 0001E0
```

Dump of file SATURN:[PCCOMMON.DUMP.DLL]DASHORT.TMP;1 on 18-APR-1990 10:43:15.93
File ID (613,14,0)   End of file block 77 / Allocated 80

Virtual block number 12 (0000000C), 512 (0200) bytes

```
68FFFF68 1476FF16 76FF016A 006A1656 89144689 0000FFFF 9A800868 E476FFE6 l.vöh........F..V.j.j..v..v.h..h 000000
08E04688 DC468900 0001C09A E076FFE2 76FF0258 68020036 FF262178 068EFFFF ....x!&.6..hX..vä.vÅ.ä....FÉ.FÅ. 000020
06E90375 000E7E83 DA468900 0001DC9A E076FFE2 76FF1876 FF0026E9 0375E246 Fâu.Ö&..v..vä.vÅ.É....FÖ.-ß.u.Ö. 000040
809AEA76 FFEC76FF 0023E903 75EC4608 EA4688DE 46890A46 880003E9 DE468800 ..FßÖ...FÖ.Fß.Fö.Fšu.Ö#..vš.vö.. 000060
46080646 88DE4689 DA468800 03E90E46 880006E9 0375000E 7E830A46 89000006 ....FÖ.~ß.u.Ö...FßÖ...FÖ.Fß.F•.F 000080
DE468800 06E90375 000E7E83 DA468900 00020A9A D676FFD8 76FF0023 E90375D8 Åu.Ö#..vÅ.v•......FÖ.-ß.u.Ö...Fß 0000A0
F276FFF4 76FF1A76 FF1C76FF 0029E903 75F4460B F24688DE 46890A46 880003E9 Ö...FÖ.Fß.F .F¶u.Ö)..v.....v¶.v 0000C0
DC7E83DE 46890A46 880003E9 DE468800 06E90375 000E7E83 DA468900 00023E9A .>....FÖ.-ß.u.Ö...FßÖ...F .Fß.-É 0000E0
00E90E46 880006E9 EE4688F0 5689EE46 89000002 689A006A 006A0015 E90374FF .t.Ö..j.j..h....FŸ.Vþ.FŸÖ...FßÖ. 000100
00000302 E0000200 70000106 15010300 00000401 A8000500 1618CAC9 5F5E1F00 ..^_èò.................)...Ù.... 000120
00000506 00000500 13000105 E8010300 00000505 FD000200 00000401 A8000200 ...¯.......».......Ò............ 000140
AC000303 AE020302 07000704 53020300 A0000304 E3020300 00000903 05000200 ...........D.......S.......Ù...¯ 000160
40000405 CC020300 46000303 E6020301 A8000503 6E020302 12000706 5F020300 ...........n.......|...F...ä...@ 000180
5A000305 87020300 CF000306 C1020302 2E000705 62020301 89000506 31020301 ...T...¿...b.......è...ù.......Z 0001A0
00000000 00000000 F3000106 E8010301 53000405 AD020300 D8000304 84020300 ...Ç...Ù...Ù...S...Š...µ........ 0001C0
0353E90E 46880000 E046C7FC 4689FE46 89000088 D88EFFFF B81E5657 00006CC8 àl..WV.|...Áj...F±.F•üFÅ...F.ÖS. 0001E0
```

Dump of file SATURN:[PCCOMMON.DUMP.DLL]DASHORT.TMP;1 on 18-APR-1990 10:43:15.93
File ID (613,14,0)   End of file block 77 / Allocated 80

Virtual block number 13 (0000000D), 512 (0200) bytes

```
FF006A10 76FF1276 FFE45689 E2468908 56880646 880000FF FF9A1076 FF1276FF .v..v.......F..V..Fã.VÕ.v..v.j.. 000000
76FFE876 FFE85689 E6468904 57882602 478826E2 5EC40000 FFFF9AE2 76FFE476 vÕ.vã.....á^ã&.G.&.W..F|.VÕ.vÕ.v 000020
FF1276FF 0A578926 08478926 F65688F4 4688E25E C40000FF FF9A5016 F4468DE6 |.F¶.P.....á^ã.F¶.V-&.G.&.W..v.. 000040
26000088 E25EC404 C48300EE 08069A10 76FF1276 FF0000FF FF9A0104 681E1076 v..hå.......v..v....Ÿ..á.á^ãj..& 000060
00000230 9A006A10 76FF1276 FF02E3E9 02EFE900 008A0001 880C4789 260E4789 .G.&.G.j..¤..Õy.ÕD..v..v.j..0... 000080
FF0C76FF 0676FF08 76FFE456 89E24689 00000105 9A006A10 76FF1276 FF0203E9 Õ&..v..v.j.......Fã.VÕ.v..v..v.. 0000A0
FF1276FF 029AE9FE 5689FC46 890EC483 01AE0482 9A1076FF 1276FF0E 76FF0A76 v..v..v..v....Û..á..F•.V±Õ...v.. 0000C0
031700F9 9A1076FF 1276FF02 10E90A46 88E45689 E2468900 0001349A 006A1076 v.j..4....Fã.VÕ.F.Ö...v..v..•... 0000E0
5EC4E456 89E24689 0000019B 9A006A10 76FF1276 FF0064E9 03740000 3004C483 .á.=..t.Õd..v..v.j.......Fã.VÕá^ 000100
E85689E6 46890457 88260247 8826E25E C4F25689 F046890E 5788260C 478826E2 ã&.G.&.W..Fþ.V·á^ã&.G.&.W..F|.VÕ 000120
76FF006A 006A006A 1076FF12 76FFEE76 FFE676FF E876FFEE 46890788 26E25EC4 á^ã&...FŸ.vÕ.v|.vŸ.v..v.j.j.j..v 000140
89000001 E39A006A 1076FF12 76FF01BE E9FFFF02 FD9AF076 FFF276FF F076FFF2 ·.vþ.v·.vþ.»...Õ/..v..v.j..D.... 000160
76FF1276 FF001CE9 03740000 3004C483 01C41226 9A1076FF 1276FFE4 5689E246 Fã.VÕ.v..v..&.á..á.=..t.Õ...v..v 000180
1076FF12 76FF0176 E 0C4789 260E4789 26000088 E25EC404 C4830240 08069A10 ....@..á.á^ãj..&.G.&.G.Õv..v..v. 0001A0
FFFF9A50 1694468D 4C6A01F9 681076FF 1276FFE4 5689E246 89000002 669A006A j..f....Fã.VÕ.v..v.h•.jL.F..P... 0001C0
08260C47 8826E25E C40020E9 03740000 3004C483 FFFF0086 9A501694 46800000 ...F..P.Ñ....á.=..t.Õ .á^ã&.G.&. 0001E0
```

Dump of file SATURN:[PCCOMMON.DUMP.DLL]DASHORT.TMP;1 on 18-APR-1990 10:43:15.93
File ID (613,14,0)   End of file block 77 / Allocated 80

Virtual block number 14 (0000000E), 512 (0200) bytes

```
12269A10 76FF1276 FF0119E9 00000256 9A016A10 76FF1276 FF0010E9 03740E47 G.t.Õ...v..v.j..V...Õ...v..v..&. 000000
1276FF00 F3E90000 02F19A01 6A1076FF 1276FF00 00E90374 00003004 C483FFFF ...á.=..t.Õ...v..v.j..þ...Õµ..v. 000020
5689E646 89045788 26024788 26E25EC4 E45689E2 46890000 FFFF9A00 6A1076FF .v.j.......Fã.VÕá^ã&.G.&.W..F|.V 000040
01A887FF 2601AA87 FF26E25E C40000FF FF9A01A8 87FF2601 AAB7FF26 E25EC4E8 Õá^ã&.ñ¨.&.ñ´......á^ã&.ñ¨.&.ñ´. 000060
FF9AF076 FFF276FF E676FFE8 76FF0036 E9037400 00300000 FFFF9A50 16F0468D .Fþ.P.....=..t.Õ6..vÕ.v|.v·.vþ.. 000080
5016F846 80016A00 6AF076FF F276FF50 5201A805 E4568BE2 4688E046 890000FF ....FÅ.Fã.VÕ.´.RP.v·.vþj.j..F½.P 0000A0
206A00A1 E90000BA 00008800 00FFFF9A 006A1076 FF1276FF FFA8E900 00FFFF9A .....Õ`..v..v.j.......|..¤..ÕÀ.j 0000C0
E90031E9 14C483FF FF077D9A 016A006A 1076FF12 76FF01F5 681E01E2 681E006A j..hã..h½..v..v.j.j..)....á.Õ1.Õ 0000E0
023330FF C1E90375 023130FE 50E90375 022F30FE ADE90375 02203000 28E9002E ..Õ+.=·.u.ÕU±=/.u.Õ]±=1.u.Õé.=3. 000100
FF0C76FF 0E76FF10 76FF1276 FF0043E9 FFCFE9FF 10E90375 023730FD D0E90375 u.ÕÅ»=7.u.Õ..Õù.ÕC..v..v..v..v.. 000120
03750029 30FD81E9 03750020 300023E9 002FE900 00FFFF9A 0676FF08 76FF0A76 v..v..v......Õ/.Õ#.= .u.Õ.»=).u. 000140
1F0000E9 FE5688FC 4688FF8D E9FC8DE9 0375003B 30FD38E9 03750030 30FD30E9 Õ0»=0.u.Õ8»=;.u.Õ.=Õ§..F=.V±Õ... 000160
00679A50 16AC468D 0676FF08 76FFD88E 00088B1E 56570000 58C8000E CAC95F5E ^_èò..àX..WV.|...Á.v..v..F¯.P.g. 000180
4680186A AC76FFAE 76FF0676 FF0876FF 00ADE900 02880006 E9037500 00300000 ..=..u.Õ..|..ÕU..v..v..vÜ.v¯j..F 0001A0
89804689 AA568BA8 46880087 E90002B8 0006E903 75000030 0000FFFF 9A5016A8 ´.P.....=..u.Õ..|..Õ...F´.V´.F¯. 0001C0
FF260277 FF26805E C40676FF 0876FF00 55E90375 02470826 07882680 5EC48256 Vÿá^¯&..&.G.u.ÕU..v..v.á^¯&.w.&. 0001E0
```

Dump of file SATURN:[PCCOMMON.DUMP.DLL]DASHORT.TMP;1 on 18-APR-1990 10:43:15.93
File ID (613,14,0) End of file block 77 / Allocated 80

Virtual block number 15 (0000000F), 512 (0200) bytes

08C48302 0A008C9A 0A76FF0C 76FF5016 B4468D00 00FFFF9A 50168446 8D026A37 7j..FÇ.P......FÇ.P.v..v.......á. 000000
83001EE9 0001B800 0004739A A876FFAA 76FF0676 FF0876FF 0017E903 7400003D =..t.Ō...v..v..v´.v´.ε...¡..Ō... 000020
5F5E1F00 00E90000 B80000FF FF9AA876 FFAA76FF 0676FF08 76FFFF9C E904B046 F¯.Ō...v..v..v´.v´.....¡..Ō...^ 000040
E3E9FE46 8BFF4A86 890E468B FE46890C 468BD88E 03AEB81E 56570001 0CC8CBC9 èùà...WV.¡Ū..Ä.F..F±.F...J..F±ŌŌ 000060
9A006A00 6A006A00 6A016568 FE76FF06 76FF0876 FF00D3E9 00C3E9FF 4A868800 ...J.Ōù.Ō£..v..v..v±he.j.j.j.j.. 000080
50524CCA 83000000 D22BFC46 88016868 0C76FF06 76FF0876 FFFC4689 000004E7 ó....F=.v..v..v.hh..F=+@....ōLRP 0000A0
80FF4086 8B002FE9 037C4CFF 408E8300 00FF4086 C70000FF FF9A5016 FEF4868D ..¶±.P.....ú.ə..../ə.L|.Ō/..Ñə.. 0000C0
0003E903 742CFEF4 8A80FF40 B68800FE F482C6FF 40868800 09E90374 2CFEF4BA □¶±,t.Ō...Ñə.ó.¶±..Ñə..□¶±,t.Ō.. 0000E0
76FF08C4 83009405 909A0676 FF0876FF 5016FEF4 8680FFC7 E9FF4086 FF0007E9 Ō....ə.Ōú...¶±.P.v..v.......á..v 000100
00879A02 00681E06 76FF0876 FFFF4496 89FF4286 89000000 CC9A006A 0676FF08 ..v.j..ä.....B...D..v..v..h..... 000120
0EE9FFE7 E9FF20E9 03750005 30FF38E9 03750001 300013E9 0016E900 19E90000 ..Ō..Ō..Ō..=..u.Ō8.=..u.Ō·.ŌŌ.Ō. 000140
0062C8C8 C95F5E1F 0000E900 008A0000 B8FFEFE9 FF15E903 7502293D 0008E900 .Ō..=).u.Ō..Ōy.¡..□..Ō...^_èùàb. 000160
26A45EC4 A65689A4 46890000 05479A00 6A0676FF 0876FFD8 8E048A88 1E565700 .WV.¡...Ä.v..v.j..G....FÉ.V̄Ió^É& 000180
5EC4AE56 89AC4689 0A578826 08478826 A45EC4AA 5689A846 89045788 26024788 .G.&.W..F´.V´á^É&.G.&.W..F¯.VŪá^ 0001A0
89000003 E49A5016 9E468018 6AAC76FF AE76FFA8 76FFAA76 FF000106 47C726A4 É&ùG....v´.v´.vŪ.v¯j..F..P.Ō.... 0001C0
26805EC4 B2568980 4689A056 889E468B 00B2E9A2 468B0006 E9037500 0030A246 FÅ=..u.Ō...FÅŌÿ..F..V..F¯.Vÿá^¯& 0001E0

Dump of file SATURN:[PCCOMMON.DUMP.DLL]DASHORT.TMP;1 on 18-APR-1990 10:43:15.93
File ID (613,14,0) End of file block 77 / Allocated 80

Virtual block number 16 (00000010), 512 (0200) bytes

B4468002 6A37FF26 0277FF26 B05EC4A8 76FFAA76 FF0078E9 03750247 08260788 ..&.G.u.Ōx..v´.v´á^¯&.w.&.7j..FÇ 000000
8E9A9E76 FFA076FF A876FFAA 76FF0017 E9037500 0030A246 89000004 299A5016 .P.)....FÅ=..u.Ō...v´.v´.v..v..ƒ 000020
7400003D 08C48304 38008C9A 0A76FF0C 76FF5016 B4468D00 59E9A246 88000006 ....FÅŌY..FÇ.P.v..v....;..á.=..t 000040
04804683 0007E90E 57B9260C 478926A4 5EC40257 88260788 26805EC4 0018E903 .Ō..á^¯&..&.W.á^É&.G.&.W.Ō...F¯. 000060
04559A9E 76FFA076 FFA876FF AA76FF04 C4830539 08069A06 76FF0876 FFFF79E9 Ōy..v..v....9..á..v´.v´.v..v..U. 000080
C48306F6 00B69A0E 76FF1076 FFD88E05 A5881E56 57000000 C8C8C95F 5E1F0000 ...^_èùà...WV.¡E..Ä.v..v..Ñ.-..á 0000A0
06E90001 B808C483 06770056 9A0A76FF 0C76FF02 18681E00 18E90374 00003D04 .=..t̄.Ō...h...v..v..V.w..á.¡..Ō. 0000C0
0676FF08 76FFD88E 06CF881E 56570000 2EC80010 CAC95F5E 1F0000E9 00008800 .¡..Ō...^_èò..à...WV.¡ù..Á.v..v. 0000E0
5EC4EA56 89E84689 04578826 02478826 E45EC4E6 5689E446 89000005 829A006A j..ÿ....FŌ.VIá^Ō&.G.&.W..FÒ.Vōá^ 000100
E9037500 0030D646 89000003 8E9A5016 F2468DE8 76FFEA76 FFEC4689 078826E4 Ō&...F&.vō.vŌ.F´.P.ƒ....F▪=..u.Ō 000120
0000FFFF 9A5016FC 468D1A6A F276FFF4 76FFE876 FFEA76FF 0264E906 46880006 ...F▪Ōd..vō.vŌ.v¶.v·j..F=.P..... 000140
E90004B8 0006E903 74FE460B FC468802 38E90646 880006E9 03750000 30064689 .F▪=..u.Ō...F▪Ō;..F=.F±t.Ō..¡..Ō 000160
00003006 46890000 05FB9A50 1602468D 1A6AF276 FFF476FF E876FFEA 76FF022A *..vō.vŌ.v¶.v·j..F@.P.«....F▪=.. 000180
00FFFF9A 50160C46 8D5002E0 C1FC4688 006AEC76 FF0201E9 D6468800 06E90375 u.Ō...F▪Ō...v$j..F=éÅ.P.FÉ.P.... 0001A0
01CCE900 05880000 08099AD2 76FFD476 FFE876FF EA76FF00 17E90375 00003000 .=..u.Ō...vō.vŌ.vå.v@.)...¡..Ōa. 0001C0
F6468904 5688D246 8808C483 060C0202 9ADC76FF DE76FF00 6A5002E0 C1FC4688 .F▪éÅ.Pj..vB.vÉ...É..á..F@.Vå.F- 0001E0

Dump of file SATURN:[PCCOMMON.DUMP.DLL]DASHORT.TMP;1 on 18-APR-1990 10:43:15.93
File ID (613,14,0) End of file block 77 / Allocated 80

Virtual block number 17 (00000011), 512 (0200) bytes 02470826 078826F6 5EC404F6 46830004 E9F05689 EE46890E 5688DC46 88F85689 .V½.FÉ.VB.FŸ.VÞŌ...F-.á^-&..&.G. 000000
00FFFF9A 5016E046 8D0A6A37 FF260277 FF26F65E C4E876FF EA76FF00 53E90375 u.ŌS..vō.vŌá^-&.w.&.7j..FÅ.P.... 000020
F65EC400 18E90374 E2460BE0 4688015A E9064688 0006E903 7500003D 06468900 ..F▪=..u.Ō...F▪ŌZ..FÅ.Fàt.Ō..á^- 000040
46390E56 880C468B FF9AE904 EE468302 57892607 8926EE5E C402578B 26078826 &..&.W.á^Y&..&.W..FŸ.Ō...FÉ.VB9F 000060
0676FF08 76FF024A 681E0237 681E006A 206A0043 E90374F0 5639004B E90374EE Ÿt.ŌK.9VÞt.ŌC.j j..h7..hJ..v..v. 000080
EC76FF00 00065F9A D276FFD4 76FFE876 FFEA76FF 14C48301 1E07709A 016A006A j.j..)....á..vō.vŌ.vå.v@.....v$ 0000A0
FF026ADC 76FFDE76 FFE876FF EA76FF00 08E90000 B80000FF FF9ADC76 FFDE76FF .vB.vÉ.....¡..ŌÙ..vō.vŌ.vB̄.vÉj.. 0000C0
E876FFEA 76FF0025 F9037500 FA7E8300 00FFFF9A 50160846 805016FA 468DEC76 v$.F°.P.FÅ.P......~°.u.Ō%..vō.vŌ 0000E0
88008DE9 00008800 709849A DC76FFDE 76FFEC76 FF000009 A69A0276 FFD476FF .vå.v@.Ī....v$.vB.vÉ.Ç...¡..Ō... 000100
38E90375 02470826 078826F6 5EC404F6 46830004 E9F85689 F646890A 56880846 FÅ.VŌ.F-.V½Ō...F-.á^-&..&.G.u.Ō8 000120
156A0C77 FF260E77 FF26E45E C40A6A37 FF260277 FF26F65E C4E876FF EA76FF00 ..vō.vŌá^-&.w.&.7j.á^Ō&.w.&.w.j. 000140
FFE876FF EA76FFFF 85E90036 E9064688 0006E903 7500003D D6468900 00FFFF9A ......F▪=..u.Ō...F▪Ō6.Ōç..vō.vŌ. 000160
76FFDA76 FFEC76FF 000009C2 9ADC76FF DE76FFEC 76FF0000 07F69AD2 76FF0476 vå.v@.-....v$.vB.vÉ.ô....v$.vŌ.v 000180
9E46C7D8 8E0716B8 1E565700 000AC8CB C95F5E1F 0000E900 00880000 08E79AD8 Å.Ō...¡..Ō...^_èùàŌ..WV.¡...ÁúF. 0001A0
6E680229 680676FF 0876FF90 56898E46 89000007 239A006A 0676FF08 76FF000A ...v..v.j..#....F..V..v..v.h).hn 0001C0
C4945689 92468904 57882602 4788268E 5EC40000 0AF49A00 6A006A00 6A006A01 .j.j.j.j..¶...á^.&.G.&.W..F..V.á 0001E0

Dump of file SATURN:[PCCOMMON.DUMP.DLL]DASHORT.TMP;1 on 18-APR-1990 10:43:15.93
File ID (613,14,0)   End of file block 77 / Allocated 80

Virtual block number 18 (00000012), 512 (0200) bytes

```
9C76FF00 00028F9A 9A76FF9C 76FF9C56 899A4689 01A6978B 2601A487 8B268E5E ^.&..E.&..I..F..V..v..v.......v. 000000
76FF9876 FF9276FF 9476FF00 A6E90374 00003D00 0002A69A 50169646 8D9A76FF .v..F..P.I...=..t.Ol..v..v..v..v 000020
169A4680 056A9676 FF9B76FF 9276FF94 76FF0000 0A829A50 16FF2686 80026A96 .j...&..P......v..v..v..v.j..F.. 000040
72B6890A C4830AB3 011C9ABA 76FF8C76 FF5016FF 7686809E 76FF0000 06439A50 P.C....v...v..P.v..v....*..á...r 000060
16A0468D 0270681E 08C4830A C400569A 5016A046 805016FF 26868DFF 749689FF ...t...&..P.F..P.V.á..á..hp..F.. 000080
76FF08C4 83081200 109A5016 A04680FF 72B6FFFF 74B6FF08 C4830AD9 00109A50 P...)..á..Ät..Är..F..P......á..v 0000A0
00E90000 B8FF42E9 000004C0 9A5016A0 4680FF6A 006A0161 68022968 0676FF08 ..v.h).ha.j.j..F..P.ä...ÖB.|..Õ. 0000C0
89000009 EB9A006A 0676FF08 76FFD88E 09D9881E 56570000 04C8CBC9 5F5E1F00 ..^_èuà...WV.|)..Á.v..v.j..S.... 0000E0
76FF0000 08549A00 6A006A48 6A006A01 436801F9 680676FF 0876FFFE 5689FC46 F•.V±.v..v.h•.hC.j.jKj.j..I....v 000100
0B680676 FF0876FF 00000B6D 9A006A00 6A009668 006A0143 6801FF68 0676F. `8 ..v.h..hC.j.h..j.j..m....v..v.h. 000120
6A006A01 43680170 680676FF 0876FF00 0008869A 006A006A 096A006A 014368.` .hC.j.j.j.j.......v..v.hp.hC.j.j 000140
0BFA9A06 76FF0876 FF0011E9 03750006 7F8326FC 5EC40000 08CB9A00 6A006A4B Kj.j..u...á^•&....u.Õ...v..v..•. 000160
68022F68 0676FF08 76FF04C4 8306AC0F 7B9A0676 FF0876FF 000EE904 C48308B1 Y..á.Õ...v..v..(.¯..á..v..v.h/.h 000180
016A006A 0019E903 7400067F 8326FC5E C400000A 0A9A006A 006A016A 006A0126 &.j.j.j.j......á^•&....t.Õ..j.j. 0001A0
56570001 50C8CBC9 5F5E1F00 00FFFF9A 50520000 FFFF9A01 F9680676 FF0876FF .v..v.h•......RP......^_èuàP..WV 0001C0
1047C726 EC5EC4EE 5689EC46 89000008 1B9A006A 0676FF08 76FFD88E 080EB81E .|...Á.v..v.j.......F$.VŸá^$&uG. 0001E0
```

Dump of file SATURN:[PCCOMMON.DUMP.DLL]DASHORT.TMP;1 on 18-APR-1990 10:43:15.93
File ID (613,14,0)   End of file block 77 / Allocated 80

Virtual block number 19 (00000013), 512 (0200) bytes

```
46890457 8B260247 8B26EC5E C4FA5689 F846890E 578B260C 478B26EC 5EC40001 ..á^$&.G.&.W..F½.V•á^$&.G.&.W..F 000000
76FF0876 FF00000C 6E9A006A 50520000 0C659A01 91680676 FF0876FF F25689F0 Þ.V·.v..v.h...e...RPj..n....v..v 000020
026AF876 FFFA76FF F076FFF2 76FF0000 FFFF9A00 6A505200 000BEA9A 01906806 .h...ð...RPj.......v·.vÞ.v•.v½j. 000040
F276FF00 000CEE9A 5016A046 8001F968 0676FF08 76FF0000 0CDA9A50 16A04680 .F..P.Ö....v..v.h•..F..P.Ÿ....v· 000060
0375FE86 860BFEB4 868B0000 001C9A50 16FEB486 800F6AF8 76FFFA76 FFF076FF .vÞ.v•.v½j...Ç±.P.......Ç±..Ä±u. 000080
76FF0000 00869A50 16FEBA86 80026AFE 8486FFFE B686FFF0 76FFF276 FF0032E9 Õ2..v·.vÞ.ÄÄ±.ÄÇ±j...¤±.P......v 0000A0
681E0170 680676FF 0876FF00 12E90000 00039A50 16FEBA86 80017068 0676FF08 ..v.hp...¤±.P.....Õ...v..v.hp..h 0000C0
0000085D 9A5016FE 808680 0E 6AF876FF FA76FFF0 76FFF276 FF00000D 599A0274 t.‗Y....v·.vÞ.v•.v½j...¯±.P.]... 0000E0
86800097 68FEB0B6 FFFEB286 FFF076FF F276FF00 33E90375 FEB28608 FEB0868B ..¯±..ý±u.Õ3..v·.vÞ.Äý±.Ä¯±h.... 000100
0012E900 00006E9A 5016FF06 868D01FF 680676FF 0876FF00 00FFFF9A 5016FF06 ...P......v..v.h.......P.n...Õ.. 000120
036AF876 FFFA76FF F076FFF2 76FF0000 00AE9A02 75681E01 FF680676 FF0876FF .v..v.h...hu..Û....v·.vÞ.v•.v½j. 000140
FF0AC483 000A011C 9AF476FF F676FF50 16A04680 0A6A0000 0DC69A50 16F44680 .F¶.P.6...j..F..P.v─.v¶...Ö..á.. 000160
056AF876 FFFA76FF F076FFF2 76FF0000 00EE9A50 16A04680 02096806 76FF0876 v..v.h...F..P.Ÿ....v·.vÞ.v•.v½j. 000180
FF0AC483 0E1A011C 9AF476FF F676FF50 16A04680 0A6A0000 0E069A50 16F44680 .F¶.P.....j..F..P.v─.v¶......á.. 0001A0
046AF876 FFFA76FF F076FFF2 76FF0000 0E2E9A50 16A04680 020B6806 76FF0876 v..v.h...F..P......v·.vÞ.v•.v½j. 0001C0
FF0AC483 0E60011C 9AF476FF F676FF50 16A04680 0A6A0000 0E469A50 16F44680 .F¶.P.F...j..F..P.v─.v¶...'..á.. 0001E0
```

Dump of file SATURN:[PCCOMMON.DUMP.DLL]DASHORT.TMP;1 on 18-APR-1990 10:43:15.93
File ID (613,14,0)   End of file block 77 / Allocated 80

Virtual block number 20 (00000014), 512 (0200) bytes

```
056AF876 FFFA76FF F076FFF2 76FF0000 0E689A50 16A04680 02006806 76FF0876 v..v.h...F..P.h....v·.vÞ.v•.v½j. 000000
01009AFC 76FF5016 A04680 0A 6A021568 0676FF08 76FF0000 0E809A50 16FC4680 .F•.P......v..v.h..j..F..P.v•... 000020
9A5016FE 4680076A F876FFFA 76FFF076 FFF276FF 0000FFFF 9A505208 C4830A98 ...á.RP......v·.vÞ.v•.v½j..F±.P. 000040
46C70008 E9037459 FE7E8000 16E9010C 9E46C700 08E90374 4DFE7E80 00000ED8 Ä....~±Mt.Õ..úF...Õ...~±Yt.Õ..úF 000060
9A006A00 6A016A00 6A012568 9E76FF06 76FF0876 FF01009E 46C70005 E901089E ...Õ..úF....v..v..v.h%.j.j.j.j.. 000080
31FE7E80 00000F41 9A5016FE 468D086A F876FFFA 76FFF076 FFF276FF 00000F29 )....v·.vÞ.v•.v½j..F±.P.A....~±1 0000A0
7E800016 E902239E 46C70008 E9037432 FE7E8000 27E90221 9E46C700 08E90374 t.Õ..úF.!.Õ'..~±2t.Õ..úF.#.Õ...~ 0000C0
0125689E 76FF0676 FF0876FF 021F9E46 C70005E9 02259E46 C70008E9 037433FE ±3t.Õ..úF.%.Õ..úF....v..v..v.h%. 0000E0
5016FE46 80096AF8 76FFFA76 FFF076FF F276FF00 000F729A 006A006A 016A006A j.j.j.j..r....v·.vÞ.v•.v½j..F±.P 000100
76FF0876 FFFEB886 89000088 0003E900 01B80006 E9037459 FE7E8000 000A6A9A .j....~±Yt.Õ..|..Õ..|....|±.v..v 000120
57000016 C8CBC95F 5E1F0000 0B3A9A00 6A006AFE B886FF00 6A012568 02276806 .h'.h%.j..Ä|±j.j..:....^_èuà...W 000140
47C726F4 5EC4F656 89F44689 00000C0F 9A006A06 76FF0876 FFD88E0C 02B81E56 V.|...Ä.v..v.j.......F¶.V─á^¶&uG 000160
0676FF08 76FF0000 0FCD9A01 6A505200 000FC49A 01916806 76FF0876 FF000010 ....v..v.h...á...RPj..ë.  .v..v. 000180
F19A0276 681E01F9 680676FF 0876FF00 000C579A 016A5052 00000C4E 9A019068 h...N...RPj..W....v..v.h•. hv..b 0001A0
681E0170 680676FF 0876FF00 000C999A 0277681E 01FF6806 76FF0876 FF00000F ....v..v.h...hw.......v..v.hp..h 0001C0
80020968 0676FF08 76FF06C4 83103300 009A006A 5016EA46 80000010 259A0278 x..%....Fõ.Pj....3..á..v..v.h... 0001E0
```

```
Dump of file SATURN:[PCCOMMON.DUMP.DLL]DASHORT.TMP;1 on 18-APR-1990 10:43:15.93
File ID (613,14,0)   End of file block 77 / Allocated 80

Virtual block number 21 (00000015), 512 (0200) bytes

 0B680676 FF0876FF 06C48310 5500009A 016A5016 EA468000 0010479A 5016EA46 Fõ.P.G....Fõ.Pj....U..á..v..v.h. 000000
 0676FF08 76FF06C4 83107700 009A026A 5016EA46 80000010 699A5016 EA468002 ..Fõ.P.i....Fõ.Pj....w..á..v..v. 000020
 FF0876FF 06C48310 9900009A 036A5016 EA468000 001088 9A 5016EA46 80020068 h...Fõ.P......Fõ.Pj.......á..v.. 000040
 76FF06C4 8308C700 009A046A 5016EA46 8000000F DF9A5016 EA468002 15680676 v.h...Fõ.P.Õ....Fõ.Pj....ú..á..v 000060
 880006E9 03740001 3004C483 10E800F8 9A5016EA 46800125 68010868 0676FF08 ..v.h..hX..Fõ.P.%.Õ..á.=..t.Õ..| 000080
 01256801 0C680676 FF0876FF 00001106 9A006A00 6A50006A 00008800 03E90001 ..Õ..|..j.Pj.j.......v..v.h..hX. 0000A0
 006A0000 880003E9 00018800 06E90374 00023004 C483111E 00F89A50 16EA4680 .Fõ.P.%....á.=..t.Õ..|..Õ..|..j. 0000C0
 009A00F8 9A5016EA 46800125 68010068 0676FF08 76FF0000 113C9A00 6A006A50 Pj.j..<....v..v.h..hX..Fõ.P.%... 0000E0
 00001155 9A006A00 6A50006A 00008800 03E90001 880006E9 03740003 3004C483 .á.=..t.Õ..|..Õ..|..j.Pj.j..U... 000100
 680676FF 0876FF00 00116E9A 006A006A 016A006A 01256802 1F680676 FF0876FF .v..v.h..hX.j.j.j.j..n....v..v.h 000120
 006A0125 68022368 0676FF08 76FF0000 11879A00 6A006A00 6A006A01 25680221 |.hX.j.j.j.j.......v..v.h#.hX.j. 000140
 9A006A00 6A006A00 6A012568 02256806 76FF0876 FF000011 A09A006A 006A006A j.j.j.......v..v.hX.hX.j.j.j.j.. 000160
 0876FF00 0011D29A 006A006A 006A006A 01256802 27680676 FF0876FF 00001189 ¿....v..v.h'.hX.j.j.j.j..ß....v. 000180
 68016E68 0676FF08 76FF0000 11EB9A00 6A006A01 6A006A01 2668022F 680676FF .v.h/.h&.j.j.j.j..Š....v..v.hn.h 0001A0
 89FC4689 01A6978B 2601A487 8826F45E C400000E C09A006A 006A006A 006A016E n.j.j.j.j..ä...á^¶&..Ê.&..|..F=. 0001C0
 C48308A0 09D19A06 76FF0876 FFFA5689 F8468904 57882602 478826F4 5EC4FE56 V±á^¶&.G.&.W..F%.V°.v..v..|....á 0001E0

Dump of file SATURN:[PCCOMMON.DUMP.DLL]DASHORT.TMP;1 on 18-APR-1990 10:43:15.93
File ID (613,14,0)   End of file block 77 / Allocated 80

Virtual block number 22 (00000016), 512 (0200) bytes

 006A0676 FF0876FF 03E8FC08 86C7D88E 0F83881E 56570005 ECC8C8C9 5F5E1F04 ..^_èüâš..WV.|...Âü..•Õ..v..v.j. 000000
 AB9A5016 FA14868D 4C6A^1F9 680676FF 0876FFFB 4A9689FB 48868900 000F909A .......H«..J«.v..v.h°.jL...°.P.¨ 000020
 3D04C483 135F00F9 9A0676FF 0876FF00 58E90374 00107F83 26F8489E C40^^013 ...á.H«&....t.Õ[..v..v..°._..á.= 000040
 689689FB 6686890E 5788260C 478826FB 489EC405 8EE90001 880006E9 0375U· 10 ..u.Õ..|..Õ..á.H«&.G.&.W..¯f«..h 000060
 882601A4 878826FB 489EC4FB 5C9689FB 5A868904 57882602 478826F8 489EC4, j «á.H«&.G.&.W...Z«..\«á.H«&..Ê.&. 000080
 FB689689 FB668689 0E578826 0C478826 FB489EC4 009EE9FE 5689FC46 8901A697 .|..F•.V±Õ..á.H«&.G.&.W...f«..h« 0000A0
 97882601 A4878826 FB489EC4 FB5C9689 FB5A8689 04578826 02478826 FB489EC4 á.H«&.G.&.W...Z«..\«á.H«&..Ê.&.. 0000C0
 5016FA14 8680026A FB6686FF FB6886FF FB5AB6FF FB5CB6FF FE5689FC 468901A6 |..F•.V±.Â\«.ÂZ«.Âh«.Âf«j....°.P 0000E0
 9A5016FC 0A868DFC 0886FFFC 0686FF00 39E90375 00003DFC 06868900 0014159A ........•=..u.Õ9..Â.•.Â.•...•.P. 000100
 11077D9A 016A006A 0676FF08 76FF5016 FC0A868D 0279681E 006A006A 0000FFFF ....j.j..hy....•.P.v..v.j.j..).. 000120
 FA60868D 0F6AFB66 B6FFFB68 B6FFFB5A B6FFFB5C B6FF04B1 E90001B8 14C48310 ..á.|..ÕŸ..Â\«.ÂZ«.Âh«.Âf«j...'° 000140
 680676FF 0876FF04 82E90001 880006E9 03750000 3DFC0686 8900000C B29A5016 .P.ý......•=..u.Õ..|..Õ...v..v.h 000160
 FB6A8E80 0072E903 75FA6286 08FA6086 88000001 FE9A5016 FB6A868D 4C6A0170 p.jL..j«.P.±.....'°..b°u.Õr..ƒj« 000180
 FA6086FF FA6286FF 0F6AFB66 B6FFFB68 B6FFFB5A B6FFFB5C B6FF0065 E9037400 .t.Õe..Â\«.ÂZ«.Âh«.Âf«j..Âb°.Â'° 0001A0
 FB5CB6FF 002FE904 22E90001 880009E9 03750000 3DFC0686 890000FF FF9A146A j.........•=..u.Õ..|..Õ".Õ/..Â\« 0001C0
 00003DFC 06868900 00FFFF9A 5016FB6A 8680026A FA6086FF FA6286FF FB5AB6FF .ÂZ«.Âb°.Â'°j...j«.P........•=.. 0001E0

Dump of file SATURN:[PCCOMMON.DUMP.DLL]DASHORT.TMP;1 on 18-APR-1990 10:43:15.93
File ID (613,14,0)   End of file block 77 / Allocated 80

Virtual block number 23 (00000017), 512 (0200) bytes

 FB5AB6FF FB5CB6FF 014BE903 7500FB6A BE800155 E903F0E9 00018800 06E90375 u.Õ..|..Õÿ.ÕU..ƒj«.u.ÕK..Â\«.ÂZ« 000000
 00003DFC 06868900 00FFFF9A 5016FB62 8680006A 006A006A 5016FB6A 8680026A j...j«.Pj.j.j...b«.P.... ....•=.. 000020
 FB5AB6FF FB5CB6FF 009AE903 74FB6486 08FB6286 88038 0E9 00018800 06E90375 u.Õ..|..Õ¯...b«..d«t.Õ...`\«.ÂZ« 000040
 FF0039E9 03750000 3DFC0686 890000FF FF9A006A 5016FB6A 86805016 FB628680 ..b«.P..j«.Pj.........•=..u.Õ9.. 000060
 5016FC0A 868D028C 681E006A 006A0000 13409A50 16FC0A86 8DFC0886 FFFC0686 Â.•.Â.•...•.P.ə...j.j..h.....•.P 000080
 006AFC76 FFFE76FF 0343E900 01B814C4 83154507 7D9A016A 006A0676 FF0876FF .v..v.j.j..).E..á.|..ÕC..v±.v•j. 0000A0
 6A01ABB7 FF2601AA B7FF26FB 489EC400 00150E9A FB62B6FF FB64B6FF 016A006A j.j..Âd«.Âb«.....á.H«&.ñ´.&.ñ´.j 0000C0
 0374FB62 8639FB68 9688FB66 86880000 FFFF9AF8 62B6FFFB 64B6FF00 6A006A00 .j.j..Âd«.Âb«.......f«..h«9.b«t. 0000E0
 006A0676 FF0876FF 0282681E 029F681E 006A206A 0024E903 74FB6496 390020E9 Õ-.9.d«t.Õ$.j j..h...hý..v..v.j. 000100
 FB62B6FF FB64B6FF FB5AB6FF FB5CB6FF 02CBE900 01B814C4 8315CE07 7D9A016A j..).ö..á.|..ÕÜ..Â\«.ÂZ«.Âd«.Âb« 000120
 00018800 06E90375 00003DFC 06868900 0017409A 0F6AFB66 B6FFFB68 B6FF146A j..Âh«.Âf«j..ə......•=..u.Õ..|.. 000140
 8D5016FB 56868000 00164C9A 5016FB4C 86804C6A 020B6806 76FF0876 FF029BE9 Õ...v..v.h..jL..L«.P.L.....V«.P. 000160
 EC681E02 09681E00 6A206A00 30E90374 00003D08 C483121C 18209A50 16FB4C86 .L«.P. ....á.=..t.Õ=.j j..h1..h$ 000180
 020B6806 76FF0876 FF016A00 6A14C483 1615077D 9A016A00 6A0676FF 0876FF02 ..v..v.j.j..)....á.j.j..v..v.h.. 0001A0
 006A206A 003DE903 7C00FB58 BE830229 E90001B8 0000162F 9A505200 0016289A .(...RP./...|..Õ)..ƒX«.|.Õ=.j j. 0001C0
 76FF016A 006A14C4 83127A07 7D9A016A 006A0676 FF0876FF 0325681E 0312681E .h...hX..v..v.j.j..).z..á.j.j..v 0001E0
```

```
Dump of file SATURN:[PCCOMMON.DUMP.DLL]DASHORT.TMP;1 on 18-APR-1990 10:43:15.93
File ID (613,14,0)   End of file block 77 / Allocated 80

Virtual block number 24 (00000018), 512 (0200) bytes

680676FF 0876FF01 E2E90001 8800000B F19A5052 00000FAD 9A020B68 0676FF08 ..v.h...U...RP.þ...j..Õã..v..v.h 000000
FB66B6FF FB68B6FF FB5AB6FF FB5CB6FF 0000125F 9A5016FA B0868D00 976801FF ..h....¯•.P._....Ã\«.ÃZ«.Ãh«.Ãf« 000020
88019CE9 0001B800 06E90375 00003DFC 06868900 0013839A 5016FC02 86800E6A j....•.P........•=..u.Õ..|..Õ... 000040
B6FF0E6A FB66B6FF FB68B6FF FB5AB6FF FB5CB6FF 005AE903 75FC0486 08FC0286 ..•...•u.ÕZ..Ã\«.ÃZ«.Ãh«.Ãf«j..Ã 000060
FF015CE9 0001B800 06E90375 00003DFC 06868900 0013E39A 036AFC02 B6FFFC04 .•.Ã.•j..D......•=..u.Õ..|..Õ\.. 000080
0006E903 7500003D FC068689 0000FFFF 9AFC0286 FFFC0486 FFFB5AB6 FFFB5CB6 Ã\«.ÃZ«.Ã.•.Ã.•........•=..u.Õ.. 0000A0
FB5CB6FF 008AE903 7500003D 04C48310 B200B69A 5016FAB0 868D0135 E9000188 |..Õ5...¯•.P.Ã.ÿ..á.•..u.Õ...Ã\« 0000C0
00018800 06E90375 00003DFC 06868900 00FFFF9A 5016FC02 868D126A FB5AB6FF .ÃZ«j....•.P........•=..u.Õ..|.. 0000E0
9A036AFC 02B6FFFC 04B6FF0E 6AFB66B6 FFFB68B6 FFFB5AB6 FFFB5CB6 FF00F8E9 Õ½..Ã\«.ÃZ«.Ãh«.Ãf«j..Ã.•.Ã.•j.. 000100
B6FFFB5A B6FFFB5C B6FF00C5 E9000188 0006E903 7500003D FC068689 00000981 .......•=..u.Õ..|..Õé..Ã\«.ÃZ«.Ã 000120
0006E903 7500003D FC068689 0000FFFF 9A5016FA B0868D00 9768FC02 B6FFFC04 .•.Ã.•h....¯•.P.......•=..u.Õ.. 000140
5AB6FFFB 5CB6FF05 F5F646C7 E0FFF446 C7FB4689 FA468900 00B80095 E9000188 |..Õ..|...F•.F½úF¶.ÁúF-¥..Ã\«.ÃZ 000160
B6FFFB5A B6FFFB5C B6FF0000 FFFF9A50 16FB5686 8D056AFB 66B6FFFB 68B6FFFB «.Ãh«.Ãf«j...V«.P......Ã\«.ÃZ«.Ã 000180
B6FFFB68 B6FFFB5A B6FFFB5C B6FF0000 0C869A50 16FB468D 036AFB66 B6FFFB68 h«.Ãf«j..F½.P......Ã\«.ÃZ«.Ãh«.Ã 0001A0
681E0676 FF0876FF 00000647 C726FB48 9EC40000 17CE9A50 16F4468D 046AFB66 f«j..F¶.P.ö...á.H«&úG....v..v..h 0001C0
CBC95F5E 1F0000E9 00008804 C48315A8 09D19A06 76FF0876 FF000005 5E9A034E N..^....v..v..i.´..á.|..Õ...^_èù 0001E0

Dump of file SATURN:[PCCOMMON.DUMP.DLL]DASHORT.TMP;1 on 18-APR-1990 10:43:15.93
File ID (613,14,0)   End of file block 77 / Allocated 80

Virtual block number 25 (00000019), 512 (0200) bytes

46C70064 E90000B8 0006E903 74003F80 26065EC4 D88E122E 881E5657 000004C8 à...WV.|...Áé^.&.?.t.Õ..|..Õd.úF 000000
880025E9 0377FE46 3B04C483 16EF00B6 9A0676FF 0876FFFE 46FF0003 E90000FE ±..Õ...F±.v..v..Ã.ÿ..á.;F±w.ÕX.. 000020
21E90000 B80006E9 03740407 E7B7F608 8898FC46 8AFC4688 008A2606 76C4FE5E ^±áv.&...F•.F•..Á-.Õ..t.Õ..|..Õ! 000040
E90001B8 02578926 0789260A 5EC404C4 83185200 FC9A0676 FF0876FF FFC2E900 .Õö..v..v..•.R..á.á^.&..&.W.|..Õ 000060
0001008C 01030244 000817B2 020300E9 00031700 0203002A 90CBC95F 5E1F0000 ...^_èù.*.......Õ...ÿ...D...♥... 000080
00030180 000200F3 00031600 02030000 000214C0 0002007F 00011000 0103007E ~...Ī.......e.......Ã...µ....... 0000A0
0003077C 02030000 00041810 00020087 00011595 01030086 00011003 01030000 ...........................|... 0000C0
00070A39 02030010 00011803 010300FD 00030045 0203000B 00010FB6 01030078 x...Ñ.......E...».............9... 0000E0
000317EA 02030254 0009148F 02030000 000718B0 00020013 000115E1 010301E2 â...Ā....................T...õ... 000100
00011241 0103001E 00010046 01030000 00091828 00020109 00031770 02030086 ....p.......(.......F.......A... 000120
00010369 010300A0 000307B6 02030094 00031321 020301F3 00070A49 0203001F ....|...µ...|.......Ñ.......i... 000140
000507DD 02030089 00031560 0203027C 00091455 020300AC 00031669 020300B3 •...i...¯...U...|...m...¿...|... 000160
000316A9 0203021F 000702E1 02030040 000115E8 0103028C 0009028F 020301AB ¨...•.......Õ...M...Ā.......`... 000180
000714ED 02030299 000914AE 02030189 00050935 02030046 00030753 020300C3 ù...S...F...5...¿...Ū.......Ū... 0001A0
00000000 000001CD 00060900 020302AD 000A0027 020300CF 00030927 0203022E ....'...ü...'...Ü.......ë....... 0001C0
468BFC46 89FE4689 0000B80E 568C0C46 89044680 D88EFFFF 881E5657 000004C8 àå..WV.|...Ã.Fâ.FÉ.VB|...F±.F•.F 0001E0

Dump of file SATURN:[PCCOMMON.DUMP.DLL]DASHORT.TMP;1 on 18-APR-1990 10:43:15.93
File ID (613,14,0)   End of file block 77 / Allocated 80

Virtual block number 26 (0000001A), 512 (0200) bytes

89004689 00000254 9A006A10 76FF1276 FF0024E9 03740846 08064688 04E5E90E .Õ!..F..F.t.Õ$..v..v.j..T....FÅ. 000000
89004689 08568B06 468B040E E91E5789 261C4789 260C568B 0A468BD0 5EC4D256 V0ó^Å.F..V.&.G.&.W.ÕB..F..V..FÅ. 000020
969A02AB 681076FF 1276FF00 00FFFF9A D076FFD2 76FF006A 1076FF12 76FFD256 V0.v..v.j..v0.vÅ......v..v.h.... 000040
869A006A 50520000 00AD9A02 AF681076 FF1276FF 0000009F 9A006A50 52000000 ...RPj.......v..v.hÉ..Ù...RPj..Ã 000060
1076FF12 76FF0000 FFFF9A00 6A505200 0002269A 02816810 76FF1276 FF000000 ....v..v.hŸ..&...RPj.......v..v. 000080
6A014368 02736810 76FF1276 FF000000 E89A006A 006A4B6A 006A0143 68026368 hc.hC.j.jKj.j..Õ....v..v.hs.hC.j 0000A0
6A006A00 9668006A 01436802 80681076 FF1276FF 00000102 9A006A00 6A4B6A00 .jKj.j.......v..v.h§.hC.j.h..j.j 0000C0
C40000FF FF9A006A 006A096A 006A0143 68020268 1076FF12 76FF0000 01189A00 .......v..v.h0.hC.j.j.j.j......á 0000E0
0A5689D8 46890857 88260647 8826005E C4E45689 E2468902 57882607 8826005E ^Å&..&.W..Fã.Vóé^Å&.G.&.W..FÅ.VÕ 000100
FF002AE9 037401E0 7E830000 FFFF9A50 16E0468D D876FFDA 76FFE276 FFE476FF .vÕ.vã.vÕ.vÅ.FÅ.P......~Å.t.Õ*.. 000120
569A5016 FF72868D 035C681E 0000FFFF 9A5016E6 46805016 84468DE2 76FFE476 vÕ.vã.F..P.F!.P......h\...r..P.V 000140
00FFFF9A 50168446 80026AD8 76FFDA76 FFE276FF E476FF00 2AE908C4 8301AE00 .Ü..á.Õ*..vÕ.vã.vÕ.vÅj..F..P.... 000160
0014E903 7500127F 8326005E C408C483 01CC0056 9A5016FF 72868D03 6E681E00 ..hn...r..P.V.ä..á.á^Å&....u.Õ.. 000180
00569A50 16EA468D 0386681E 0011E908 C48301E0 00569A50 16EA468D 0375681E .hu..Fõ.P.V.Å..á.Õ...h...Fõ.P.V. 0001A0
FF1276FF 0CC48303 0401269A 5016FF2C 86800397 681E5016 EA468008 C48301F7 ¥..á..Fõ.P.h.....,..P.&....á..v.. 0001C0
FF1276FF 016A006A 0000FFFF 9A1076FF 1276FF00 00FFFF9A 5016FF2C 868D1076 v...,..P......v..v......j.j..v.. 0001E0
```

Dump of file SATURN:[PCCOMMON.DUMP.DLL]DASHORT.TMP;1 on 18-APR-1990 10:43:15.93
File ID (613,14,0)   End of file block 77 / Allocated 80

Virtual block number 27 (0000001B), 512 (0200) bytes

```
8804C483 02760A85 9A1076FF 1276FF00 00FFFF9A 50520000 FFFF9A02 63681076 v.hc......RP......v..v....v..á.¡ 000000
76FFD256 89004689 00000290 9A006A10 76FF1276 FF02E9E9 02F5E900 00BA0001 ..u..Õ%.ÕÕ..v..v.j.......FÅ.V@.v 000020
5689FC46 890EC483 02C90604 9A1076FF 1276FF0E 76FF0A76 FF0C76FF 0676FF08 ..v..v..v..v..v..v..å.è..á..F=.V 000040
0002B69A 006A1076 FF1276FF 02A0E900 00031A9A FF6A1076 FF1276FF 02B0E9FE ±Õ¯..v..v.j......Õ...v..v.j..Å.. 000060
D2568900 46890000 FFFF9A00 6A1076FF 1276FF02 0EE90A46 88025689 D0468900 ..FÅ.V@.F.Õ...v..v.j.......FÅ.V@ 000080
2A0A859A 1076FF12 76FF000E E9037400 003004C4 83020F13 559A1076 FF1276FF .v..v..U.Õ..á.=..t.Õ...v..v....* 0000A0
16844680 0000FFFF 9A501684 46804C6A 02636810 76FF1276 FF01FFE9 04C48303 ..á.Õ...v..v.hc.jL.F..P......F.. 0000C0
C5E90000 03409A01 6A1076FF 1276FF00 10E90374 00003004 C483FFFF 00B69A50 P.Å....á.=..t.Õ...v..v.j..ä...Õé 0000E0
9A016A10 76FF1276 FF0000E9 03740000 3004C483 FFFF1355 9A1076FF 1276FF01 ..v..v..U....á.=..t.Õ...v..v.j.. 000100
1076FF12 76FFD256 89004689 00000429 9A006A10 76FF1276 FF019FE9 0000FFFF ....Õ...v..v.j..)....FÅ.V@.v..v. 000120
6A006A00 1FE90374 1E573926 0028E903 741C4739 26005EC4 000003A6 9A026368 hc..Ì...á^Å&9G.t.Õ(.&9W.:.Õ..j.j 000140
FF1276FF 0081E914 C48303D6 077D9A01 6A006A01 6A006A03 80681E03 9A681E00 ..h...h¯.j.j.j.j..).@..á.(...v.. 000160
6A001FE9 03741E57 39260028 E903741C 47392600 5EC40000 03E89A02 6F681076 v.ho..Õ...á^Å&9G.t.Õ(.&9W.t.Õ..j 000180
76FF003F E914C483 0418077D 9A016A00 6A016A00 6A03E168 1E03C868 1E006A00 .j..hù..hÅ.j.j.j.j..)....á.Õ?..v 0001A0
1CE90374 1E573926 0025E903 741C4739 26005EC4 0000007F 9A027368 1076FF12 ..v.hs......á^Å&9G.t.Õ%.&9W.t.Õ. 0001C0
00C6E914 C48304AD 077D9A01 6A006A01 6A006A04 12681E03 FC681E00 6A006A00 .j.j..h•..h..j.j.j.j..).Ù..á.Õó. 0001E0
```

Dump of file SATURN:[PCCOMMON.DUMP.DLL]DASHORT.TMP;1 on 18-APR-1990 10:43:15.93
File ID (613,14,0)   End of file block 77 / Allocated 80

Virtual block number 28 (0000001C), 512 (0200) bytes

```
E2468902 57882607 8826005E C4025689 00468900 0000389A 006A1076 FF1276FF .v..v.j..8....FÅ.V@á^Å&..&.W..Fâ 000000
468D2477 FF262677 FF26005E C40000FF FF9A2477 FF262677 FF26005E C4E45689 .V@á^Å&.w&&.w$.....á^Å&.w&&.w$.F 000020
00FFFF9A D476FF06 76FFE276 FFE476FF 0014E903 7400003D 0000FFFF 9A501604 Å.P.....=..t.Õ...vÕ.vã.v@.vÅ.... 000040
0440681E 042A681E 006A206A 0052E900 0002809A 016A1076 FF1276FF FFCFE900 .Õu..v..v.j......ÕR.j j..h*..hä. 000060
037502AB 30002BE9 002EE900 31E914C4 83FFFF07 7D9A016A 006A1076 FF1276FF .v..v.j.j..)....á.Õ1.Õ..Õ+.=¨.u. 000080
037502C1 30FF45E9 037502C0 30FE14E9 037502BF 30FDE2E9 037502BE 30FE84E9 Õ.±=/.u.Õä»=¢.u.Õ.±=å.u.ÕE.=é.u. 0000A0
FF9A0676 FF0876FF 0A76FF0C 76FF0E76 FF1076FF 1276FF00 48E9FFCF E9FF81E9 ÕY.Õù.ÕK..v..v..v..v..v..v..v... 0000C0
63E90375 00293DFD 78E90375 00203DF8 13E90375 000F3D00 28E90037 E90000FF ...Õ7.Õ+.=..u.Õ.«= .u.Õ(»=).u.Õc 0000E0
5F5E1F00 00E9FE56 88FC4688 FFB5E9FB 25E90375 003830FD 22E90375 00303DFD »=0.u.Õ"»=;.u.Õ%«Õç..F=.V±Õ...^_ 000100
FF0676FF 0876FF00 18E90374 020E7E83 D88E0008 881E5657 000054C8 000ECAC9 èò..àI..WV.¡...Ä.-..t.Õ...v..v.¯ 000120
0A76FF0C 76FF0676 FF0876FF 0018E900 0005889A 5016AC46 8D156A0A 76FF0C76 v..v.j..F¯.P.....Õ...v..v..v..v. 000140
08260788 26805EC4 82568^80 4689AE56 88AC4688 0000FFFF 9A5016AC 4680136A j..F¯.P......F¯.VÙ.F¯.Vyá^¯&..&. 000160
909A5016 84468002 6A37FF26 0277FF26 805EC406 76FF0876 FF0055E9 0375^^47 G.u.ÕU..v..v.á^¯&.w.&.7j..FÇ.P.. 000180
76FF0017 E9037400 003008C4 83018100 8C9A1076 FF1276FF 50168446 800000 ' ....FÇ.P.v..v.......á.=..t.Õ...v 0001A0
FF0876FF FF9CE904 80468300 1EE90001 88000006 099AAC76 FFAE76FF 0676FF0. ..v..vÙ.v¯.....¡..Õ...F¯.Õ...v.. 0001C0
881E5657 00005CC8 CBC95F5E 1F0000E9 00008800 00FFFF9A AC76FFAE 76FF0676 v..vÙ.v^.....¡..Õ...^_èùà\..WV.¡ 0001E0
```

Dump of file SATURN:[PCCOMMON.DUMP.DLL]DASHORT.TMP;1 on 18-APR-1990 10:43:15.93
File ID (613,14,0)   End of file block 77 / Allocated 80

Virtual block number 29 (0000001D), 512 (0200) bytes

```
02CC6806 76FF0876 FFF25689 F0468900 0003509A 006A0676 FF0876FF D88E054C L..Ä.v..v.j..P....FÞ.V·.v..v.hä. 000000
FA5689F8 46890257 88260788 26F05EC4 000006C2 9A006A00 6A006A00 6A016E68 hn.j.j.j.j..ò...á^Þ&..&.W..F½.V• 000020
FFFE76FF 0000044F 9AFC76FF FE76FFFE 5689FC46 89225788 26204788 26F05EC4 á^Þ&.G &.W".F=.V±.v±.v=.O....v±. 000040
F476FFF6 76FFF876 FFFA76FF 0035E903 74000030 00000464 9A5016F4 4680FC76 v•.F¶.P.d...=..t.Õ5..v•.v½.v¬.v¶ 000060
16A44680 FF6A006A 01616802 CC680676 FF0876FF 0000058F 9A5016A4 4680026A j..FÉ.P.¢....v..v.ha.ha.j.j..FÉ. 000080
088E0620 881E5657 000112C8 CBC95F5E 1F0000E9 000088FF 83E90000 00CF9A50 P.ü...Õ°.¡..Õ...^_èùà...WV.¡ ..Á 0000A0
006A0676 FF0876FF 015EE996 46880178 E9FE4688 9646890E 4688FE46 890C4688 .F..F±.F..F..F±Õ(¯.F.Õ^..v..v.j. 0000C0
76FF9456 89924689 02578826 078826FF 429EC4FF 449689FF 42868900 000620 9A .-.....B...D.á.B.&..&.W..F..V..v 0000E0
0676FF08 76FFFC46 89000007 5A9A006A 006A006A 006A0165 68FE76FF 0676FF08 ..v..v±he.j.j.j.j..Z....F=.v..v. 000100
9EC40000 064C9A50 16FEF286 8D50524C CA830000 00D22BFC 46880168 680C76FF .v.hh..F=+@....ÒLRP..·±.P.L...á. 000120
136A0677 FF260877 FF26FF42 9EC49276 FF9476FF 0022E903 7500147F 8326FF42 B.&....u.Õ".v..v.á.B.&.w.&.w.j. 000140
0677FF26 0877FF26 FF429EC4 9276FF94 76FF001F E9000007 A99A5016 FEEE8680 ..¥±.P.¯...Õ...v..v.á.B.&.w.&.w. 000160
3E9EC4FF 409689FF 3E8689FE F09688FE EE868800 0005609A 5016FEEE 8680156A j...¥±.P.m.....¥±..Þ±..>...ä.á.> 000180
026A37FF 260277FF 26FF3E9E C49276FF 9476FF00 59E90375 02470826 078826FF .&..&.G.u.ÕY..v..v.á.>.&.w.&.7j. 0001A0
3008C483 05D1008C 9A5016FE F2868050 16FF4686 80000006 A89A5016 FF46868D ..F..P.¯.....F..P..±.P...Ì..á.= 0001C0
86831057 89260E47 8926FF42 9EC40257 88260788 26FF3E9E C40017E9 03740000 ..t.Õ..á.>.&..&.W.á.B.&.G.&.W... 0001E0
```

```
Dump of file SATURN:[PCCOMMON.DUMP.DLL]DASHORT.TMP;1 on 18-APR-1990 10:43:15.93
File ID (613,14,0)   End of file block 77 / Allocated 80

Virtual block number 30 (0000001E), 512 (0200) bytes

 FF5016FE F2868D00 0005! 9A FEEEB6FF FEF086FF 9276FF94 76FFFF97 E904FF3E >..Ō...v..v..Ñp±.ÑY±.Š......±.P. 000000
 EFE9FE9A E9037500 013D0008 E9000EE9 0011E908 C483023A 087D9A06 76FF0876 v..v..).:..á.Ō..Ō..Ō..=..u.Ō.±Ōy 000020
 011EC8CB C95F5E1F 000UE9FE 7DE90375 02CC3D00 08E9000E E90000BA 000088FF .|..a..Ō..Ō..=ä.u.Ō)±Ō...^_èúà.. 000040
 268C5EC4 8E56898C 46890000 07019A00 6A0676FF 0876FFD8 8E060CB8 1E565700 .WV.|É..Ā.v..v.j.......F..Ṽ.á^.& 000060
 E476FF92 56899046 89085788 26064788 268C5EC4 E45689E2 46890257 8B260788 ..&.W..Fā.Vōá^.&.G.&.W..F..V..vō 000080
 0458681E 00011247 C7268C5E C4000001 529A5016 94468D90 76FF9276 FFE276FF .vā.v..v..F..P.R...á^.&úG....hX. 0000A0
 FF3E868D E276FFE4 76FF0055 E9037401 947E8308 C4830919 00569A50 16EE4680 .FŸ.P.V....á..~..t.ŌU..vō.vā..>. 0000C0
 76FF08C4 83097100 569A5016 FEE68680 0469681E 00000170 9A5016E6 46805016 .P.Fl.P.p....hi...l±.P.V.q..á..v 0000E0
 E9037500 003D8A46 89000009 889A5016 FEE28680 1A6A9076 FF9276FF E276FFE4 ō.vā.v..v.j...ā±.P......F.=..u.Ō 000100
 9A5016FF 3E868D02 6A9076FF 9276FFE2 76FFE476 FF0055E9 0138E98A 46880006 ...F.Ō8.ŌU..vō.vā.v..v.j...>..P. 000120
 FF9276FF E276FFE4 76FF08C4 83098200 569A5016 FEE68680 0478681E 000009FD »....h(...l±.P.V.ÿ..á..vō.vā.v.. 000140
 00E0E98A 46880006 E9037500 003D8A46 89000007 879A5016 FEE28680 156A9076 v.j...ā±.P......F.=..u.Ō...F.ŌĀ. 000160
 F8868D06 76FF0876 FF0CC483 0A330126 9A5016FE F8868004 82681E50 16EE4680 .FŸ.P.h...½±.P.&.3..á..v..v...½ 000180
 02470B26 078B26EA 5EC4EC56 89EA4689 FEE4968B FEE2868B 00000209 9A5016FE ±.P.......ā±..Ō±.Fō.Všá^ō&..&.G. 0001A0
 0007E79A 50169646 8D026A37 FF260277 FF26EA5E C4E276FF E476FF00 7AE90375 u.Ō±..vō.vāá^ō&.w.&.7j..F..P.Ō.. 0001C0
 88000008 359AFEE2 86FFFEE4 86FFE276 FFE476FF 0019E903 7500003D 8A468900 ..F.=..u.Ō...vō.vā.Ñō±.Ñā±.S.... 0001E0

Dump of file SATURN:[PCCOMMON.DUMP.DLL]DASHORT.TMP;1 on 18-APR-1990 10:43:15.93
File ID (613,14,0)   End of file block 77 / Allocated 80

Virtual block number 31 (0000001F), 512 (0200) bytes

 0018E903 7400003D 08C48307 FA008C9A 0A76FF0C 76FF5016 96468000 58E98A46 F.Ō[..F..P.v..v....•..á.=..t.Ō.. 000000
 FFFF77E9 04EA4683 0007E910 5789260E 4789268C 5EC40257 8B260788 26EA5EC4 á^ō&..&.W.á^.&.G.&.W.Ō...Fō.Ōw.. 000020
 00000A1B 9AFEE2B6 FFFEE4B6 FFE276FF E476FF04 C4830848 0A859A06 76FF0876 v..v....H..á..vō.vā.Ñō±.Ñā±..... 000040
 46890000 08929A00 6A0676FF 0876FFD8 8E0885B8 1E565700 0004C8CB C95F5E1F .^_èúà...WV.|...Ā.v..v.j.......F 000060
 E9C4C483 0ACB0814 9A0676FF 0876FF00 11E90375 00127F83 26FC5EC4 FE5689FC ■.V±á^■&.....u.Ō...v..v....ù..á.Ō 000080
 016A006A 01266802 BE680676 FF0876FF 04C4830A 680E3E9A 0676FF08 76FF000E ...v..v..>.h..á..v..v.h/.h&.j.j. 0000A0
 0676FF08 76FF016A 006A0019 E9037400 127F8326 FC5EC400 0007339A 006A006A j.j..3...á^■&....t.Ō..j.j..v..v. 0000C0
 D88E0A8D 881E5657 000118C8 C8C95F5E 1F000002 2D9A5052 00000364 9A026368 hc..d...RP.-.....^_èúà...WV.|...Ā 0000E0
 89884689 00000A9A 9A006A06 76FF0876 FFE0568C DE468992 46800000 FEEEB6C7 ú.Ÿ±...F..F8.VĀ.v..v.j.......F.. 000100
 26885EC4 9056898E 46891057 88260E47 8B26885E C4000116 47C72688 5EC48A56 V.á^.&úG...á^.&.G.&.W..F..V.á^.& 000120
 969A006A 50520000 08809A02 CF680676 FF0876FF E45689E2 46890257 8B260788 ..&.W..Fā.Vō.v..v.hu......RPj... 000140
 E276FFE4 76FF0000 00889A00 6A505200 0008049A 02CE6806 76FF0876 FF00000B ....v..v.ho.......RPj........vō.vā 000160
 78E90003 E9037500 003DFEEE 86890000 0CA39A50 1692468D 026A8E76 FF9076FF .v..v.j..F..P.Ė.....Ÿ±=..u.Ō..Ōx 000180
 8E76FF90 76FFE276 FFE476FF 00000C44 9A501692 46800263 680676FF 0876FF02 ..v..v.hc..F..P.D....vō.vā.v..v. 0001A0
 FEE8868B 023DE900 03E90375 00003DFE EE868900 000C719A 5016FEE8 8680006A j...Ō±.P.q.....Ÿ±=..u.Ō..Ō=...Ō± 0001C0
 5016FEF0 86800097 68FEE886 FFFEEAB6 FFE276FF E476FF00 42E90375 FEEA860B ..ō±u.Ō8..vō.vā.Ñō±.ÑŌ±h....Þ±.P 0001E0

Dump of file SATURN:[PCCOMMON.DUMP.DLL]DASHORT.TMP;1 on 18-APR-1990 10:43:15.93
File ID (613,14,0)   End of file block 77 / Allocated 80

Virtual block number 32 (00000020), 512 (0200) bytes

 F0868D02 80680676 FF0876FF 0205E900 03E90375 00003DFE EE868900 00FFFF9A .......Ÿ±=..u.Ō..Ō...v..v.h§...Þ 000000
 E476FF00 000CC59A 0485681E 02806806 76FF0876 FF0012E9 00000C59 9A5016FE ±.P.Y...Ō...v..v.h§..h...é....vō 000020
 03E90375 00003DFE EE868900 00FFFF9A 5016F846 800C6A8E 76FF9076 FFE276FF  vā.v..v.j..F½.P.......Ÿ±=..u.Ō. 000040
 92468D02 6AF876FF FA76FFE2 76FFE476 FF003DE9 0375FA46 08F8468B 0185E900 .:ç..F½.F•u.Ō=..vō.vā.v•.v½j..F. 000060
 8D027368 0676FF08 76FF0183 E9003E9 03750000 3DFEEE86 8900000C FD9A5016 .Þ ».....Ÿ±=..u.Ō..Ō...v..v.hs.. 000080
 46880000 00349A04 86681E02 73680676 FF0876FF 0012E900 000CDA9A 50169246 F..P.Ō...Ō...v..v.hs..h...4....F 0000A0
 00006C9A 5016F446 800C6AF8 76FFFA76 FFE276FF E476FF00 52E90375 FA4608F8 ½.F•u.ŌR..vō.vā.v•.v½j..F¶.P.l.. 0000C0
 011C9AF4 76FFF676 FF5016EA 46800A6A 0129E900 03E90375 00003DFE EE868900 ...Ÿ±=..u.Ō..Ō).j..Fō.P.v–.v¶... 0000E0
 76FF0876 FF0012E9 00000049 9A5016EA 468002D2 680676FF 0876FF0A C48308E8 Ō..á..v..v.hØ..Fō.P.l...Ō...v..v 000100
 76FFE276 FFE476FF 002AE903 75FA460B F8468800 00FFFF9A 0487681E 02026806 .hØ..h........F½.F•u.Ō•..vō.vā.v 000120
 E9008AE9 0003E903 75000030 FEEE8689 00000960 9A5016FE 4680096A F876FFFA •.v½j..F±.P.`.....Ÿ±=..u.Ō..Ōa.Ō 000140
 98E90003 E9037500 003DFEEE 86890000 FFFF9A50 16FE4680 E276FFE4 76FF001F ...vō.vā.F±.P.......Ÿ±=..u.Ō..Ō. 000160
 0060E902 A18C46C7 0068E902 9F8C46C7 0070E902 9D8C46C7 0038E998 FE468A00 ..F±.Ō;.úF...Ōp.úF...Ōh.úF.Ā.Ō`. 000180
 0040E902 A98C46C7 0048E902 A38C46C7 0050E902 A58C46C7 0058E902 A78C46C7 úF.Ī.ŌX.úF.Ē.ŌP.úF.Ė.ŌH.úF.`.Ōa. 0001A0
 00080008 00080008 00D000F6 A7FF2E93 C003FFEA E9037600 14300042 2D0030E9 Ō=.-B.=..v.Ōō..á...Ī-.Ā.Ā.Ā.Ā.Ā. 0001C0
 00C800C0 00A80008 00880008 00080008 00A80008 00080008 00D800B0 00080008 Ā.Ā.¯.Ā.Ā.Ā.Ā.`.Ā.Ā.Ā.|.Ā.`.à.à. 0001E0
```

```
Dump of file SATURN:[PCCOMMON.DUMP.DLL]DASHORT.TMP;1 on 18-APR-1990 10:43:15.93
File ID (613,14,0)   End of file block 77 / Allocated 80

Virtual block number 33 (00000021), 512 (0200) bytes

 10C8CBC9 5F5E1F00 000AE59A 006A006A 016A006A 0125688C 76FF0676 FF0876FF .v..v..v.h%.j.j.j.j..l....^_èùà. 000000
 F25EC4F4 5689F246 89000008 389A006A 0676FF08 76FFD88E 081CB81E 56570000 ..WV.|...Ä.v..v.j..8....F·.V¶á^· 000020
 57882606 478826F2 5EC4FC56 89FA4689 02578826 078826F2 5EC40000 1647C726 &uG...á^·&..&.W..F².V=á^·&.G.&.W 000040
 B69A02CF 680676FF 0E76FF04 C4830ABA 06189A06 76FF0876 FFF85689 F6468908 ..F-.V½.v..v....¤..á..v..v.hü..Ñ 000060
 7F9A016A 50520000 08769A02 CE680676 FF0876FF 00000EBF 9A016A50 5200000E ...RPj..¢....v..v.hö..v...RPj... 000080
 681E028D 680676FF 0876FF00 000EE39A 0488681E 02636806 76FF0876 FF000008 ....v..v.hc..h...D....v..v.h§..h 0000A0
 680676FF 0876FF00 000F079A 048A681E 02736806 76FF0876 FF00000E F59A0489 ...%....v..v.hs..h........v..v.h 0000C0
 9A006A00 6A006A00 6A012568 02906806 76FF0876 FF00000B D09A048B 681E0202 ●..h...Å....v..v.h..h%.j.j.j.j.. 0000E0
 0876FF00 000F529A 006A006A 006A006A 01256802 9F680676 FF0876FF 00000F39 9....v..v.h..h%.j.j.j.j..R....v. 000100
 6802A368 0676FF08 76FF0000 0F689A00 6A006A00 6A006A01 256802A1 680676FF .v.hÅ.h%.j.j.j.j..k....v..v.hÉ.h 000120
 6A006A00 6A012568 02A56806 76FF0876 FF00000F 849A006A 006A006A 006A0125 %.j.j.j.j.......v..v.hÉ.h%.j.j.j 000140
 000F869A 006A006A 006A006A 01256802 A7680676 FF0876FF 00000F9D 9A006A00 .j.......v..v.hÏ.h%.j.j.j.j..Ñ.. 000160
 FA76FFFC 76FF0000 0E359A00 6A006A00 6A006A01 256802A9 680676FF 0876FF00 ..v..v.h`.h%.j.j.j.j..5....v●.v² 000180
 9DF046C7 003BE998 FE468A00 9BE90003 E9037500 00300000 008E9A50 16FE468D .F±.P.....=..u.Ö..Ö...F±.Ö;.úFÞ. 0001A0
 A5F046C7 0058E902 A7F046C7 0060E902 A1F046C7 0068E902 9FF046C7 0070E902 .Öp.úFÞ..Öh.úFÞÅ.Ö'.úFÞÏ.ÖX.úFÞÉ 0001C0
 E9037600 14300042 20030E9 0040E902 A9F046C7 0048E902 A3F046C7 0050E902 .ÖP.úFÞÉ.ÖH.úFÞ`.Öä.Ö=.·B.=..v.Ö 0001E0

Dump of file SATURN:[PCCOMMON.DUMP.DLL]DASHORT.TMP;1 on 18-APR-1990 10:43:15.93
File ID (613,14,0)   End of file block 77 / Allocated 80

Virtual block number 34 (00000022), 512 (0200) bytes

 100C100C 100C0FE4 100C100C 100C100C 100C100C 1004102A A7FF2E93 C003FFEA ö..à...]*................Ö....... 000000
 012568F0 76FF0676 FF0876FF 0FFC0FF4 0FDC100C 0FEC100C 100C100C 0FDC100C ..É.......&...É.¶.●..v..v..vÞh%. 000020
 0088088E 0E46881E 56570000 00C8CBC9 5F5E1F00 000F209A 006A006A 016A006A j.j.j.j.. ....^_èùà...WV.|F..Å|. 000040
 00B69A0A 76FF0C76 FFD88E10 7A881E56 57000000 C8000CCA C95F5E1F 0000E900 .Ö...^_èò..à...W̄V.|z..Ä.v..v..Ñ. 000060
 8808C483 0D200056 9A0676FF 0876FF04 80681E00 18E90374 00003D04 C483108A ¤..á.=̄..t.Ö...h...v..v..V. ..á.| 000080
 76FFD88E 1093881E 56570000 C4C80010 CAC95F5E 1F0000E9 00008800 06E90001 ..Ö..|..Ö...^_èò..àá..WV.|...Ä.v 0000A0
 00B80006 E9037500 167F8326 8E5EC490 56898E46 8900000E 539A006A 0676FF08 ..v.j..S....F̄..V.á^.&.....u.Ö..|. 0000C0
 890C578B 260A478B 268E5EC4 9A568998 46890257 8826078B 268E5EC4 024CE900 .ÖL.á^.&..&.W..F..V.á^.&.G.&.W.. 0000E0
 76FF9A76 FF000002 FB9A5016 FF40868D 4C6A0263 680676FF 0876FF94 56899246 F..V..v..v.hc.jL..ä..P.½....v..v 000100
 006A0025 E9037500 003D11DB 10889A50 169C4680 5016FF40 86805016 92468098 ..F..P..ä..P.F..P...Ü.=..u.Ö%.j. 000120
 00018814 C4831262 077D5A01 6A006A06 76FF0876 FF50169C 468004AC 681E006A j..h¯..F..P.v..v.j.j..).b..á.|.. 000140
 06E90375 00003D00 0008CF9A 50169646 8D9276FF 9476FF98 76FF9A76 FF01CDE9 Öe..v..v..v..v..F..P.ü...=..u.Ö. 000160
 0BE9FF3E 9689FF3C 86899456 88924688 0011E903 7402967E 8301A9E9 00018800 .|..Ö`..~..t.Ö...F..V...<...>.Ö. 000180
 08C48312 061A449A 0676FF08 76FF5016 FF408680 FF3C8689 FF3E8689 00008800 .|....>...<...ä..P.v..v..D....á. 0001A0
 9A76FF92 76FF9476 FF9676FF 5016FF40 86800162 E9000188 0006E903 74000130 =..t.Ö..|..Öb...ä..P.v..v..v..v. 0001C0
 3CB6FFFF 3EB6FF98 76FF9A76 FF009FE9 03740000 3D0EC483 0E900544 9A9876FF .v..D....á.=..t.Ö...v..v..Ñ>..Ñ< 0001E0

Dump of file SATURN:[PCCOMMON.DUMP.DLL]DASHORT.TMP;1 on 18-APR-1990 10:43:15.93
File ID (613,14,0)   End of file block 77 / Allocated 80

Virtual block number 35 (00000023), 512 (0200) bytes

 00FFFF9A 006A006A 006A5016 FF40868D 5052000E 0590568B 8E468800 6A006AFF .j.j..F..V....RP..ä..Pj.j.j..... 000000
 9A016A00 6A0676FF 0876FF04 D8681E04 C2681E00 6A006A00 24E90375 00003000 .=..u.Ö$.j.j..hö..hÁ..v..v.j.j.. 000020
 5EC4016A 006A006A 2077FF26 2277FF26 8E5EC400 E3E90001 B814C483 1204077D ).Å..á.|..ÖO.á^.&.w"&.w j.j.j.á^ 000040
 C4016A00 6A006A24 77FF2626 77FF268E 5EC40000 12AB9A0E 77FF2610 77FF268E .&.w.&.w..¨...á^.&.w&&.w$j.j.j.á 000060
 1E006A00 6A0021E9 03740296 7E83004E E90000FF FF9A0E77 FF261077 FF268E5E ^.&.w.&.w......ÖN..~..t.Öl.j.j.. 000080
 006A006A 001EE914 C48312F5 077D9A01 6A006A06 76FF0876 FF052368 1E050068 h...h#..v..v.j.j..).%..á.Ö..j.j. 0000A0
 0050E900 01B814C4 83039407 7D9A016A 006A0676 FF0876FF 0562681E 054C681E .hL..hb..v..v.j.j..)....á.|..ÖP. 0000C0
 8E5EC400 011647C7 268E5EC4 00000ED1 9A5016FF 40868002 63680676 FF0876FF .v..v.hc...ä..P.Ï...á^.&uG...á^. 0000E0
 9476FF0A 6A0E77FF 261077FF 268E5EC4 9876FF9A 76FF0020 E9037400 147F8326 &....t.Ö ..v..v.á^.&.w.&.w.j..v. 000100
 8E100AB8 1E565700 0260C8CB C95F5E1F 0000E900 00880000 FFFF9A15 6A9276FF .v.j......|..Ö...^_èùà'..WV.|Ö.. 000120
 FED69EC4 FE089689 FED68689 000010E7 9A006A06 76FF0876 FF0000FF 7686C7D8 Äú.v....v..v.j..Ö.̄....ø±..Ä±á.ø± 000140
 14901002 9A0676FF 0876FF00 5DE90374 00167F83 26FED69E C4FA4689 16478826 &.G..F*á.ø±&....t.Ö}..v..v..●... 000160
 76FF0876 FF016A00 6A001CE9 037401F8 7E830044 E9037500 003DF846 8904C483 .á..F½=..u.ÖO..-½.t.Ö..j.j..v..v 000180
 02736806 76FF0876 FF016A00 6A0019E9 000013E8 9A505200 0013E19A 02636806 .hc..Å...RP.Ò...Ö..j.j..v..v.hs. 0001A0
 86891057 88260E47 8826FED6 9EC4064D E90001B8 0000140B 9A505200 0014049A .á...RP.Ü...|..ÖM.á.ø±&.G.&.W... 0001C0
 05FED896 88FED686 888E5689 8C468902 57882607 8826FED6 9EC4FF7A 9689FF78 x...z.á.ø±&..&.W..F..V...ø±  Ä±. 0001E0
```

```
Dump of file SATURN:[PCCOMMON.DUMP.DLL]DASHORT.TMP;1 on 18-APR-1990 10:43:15.93
File ID (613,14,0)   End of file block 77 / Allocated 80

Virtual block number 36 (00000024), 512 (0200) bytes

 1C9A5016 FE3E868D 026AFF78 B6FFFF7A B6FF8C76 FF8E76FF 88568986 4689000A ...F..V..v..v..Ñz..Ñx.j...>±.P.. 000000
 FDA6868D 4C6A0263 '80676FF 0876FF05 EEE90001 B80006E9 03750000 30000016 ...=..u.Õ..|..ÕY..v..v.hc.jL..Ì» 000020
 03750000 3008C483 1630008C 9A5016FD A6868D50 16FE3E86 80000015 D09A5016 .P.Å.....>±.P..Ì».P...=..á.=..u. 000040
 30155510 8B9A5016 90468D50 16FDA686 808676FF 8876FF8C 76FF8E76 FF012DE9 Õ-..v..v..v..v...Ì».P.F..P...U.= 000060
 7D9A016A 006A0676 FF0876FF 50169046 80059B68 1E006A00 6A0041E9 03750000 ..u.ÕA.j.j..h...F..P.v..v.j.j..) 000080
 B8000008 0B9A5052 00000E9F 9A026368 0676FF08 76FF016A 006A14C4 83158407 ....á.j.j..v..v.hc......RP.....| 0000A0
 11959A50 168A468D 37FF2602 77FF2686 5EC48C76 FF8E76FF 00C8E905 5AE90001 ..ÕZ.Õà..v..v.á^.&.w.&.7.F..P... 0000C0
 26078B26 865EC400 15E90374 028A7E83 052FE900 01B80006 E9037500 003D0000 ..=..u.Õ..|..Õ/..~..t.Õ..á^.&..& 0000E0
 FF5016FD A6868DFD A28689FD A4868900 00B8000B E9FDA496 89FDA286 8902578B .W...Å»..Ê»Õ..|....Ê»..Å»..Ì».P. 000100
 E9037500 003D0EC4 83158905 449A8C76 FF8E76FF 37FF2602 77FF2686 5EC48A76 v.á^.&.w.&.7.v..v..D.¿..á.*..u.Õ 000120
 6A006A06 76FF0876 FF05C768 1E05B168 1E006A00 6A0021E9 0374028A 7E83004E N..~..t.Õl.j.j..hŸ..hú..v..v.j.j 000140
 006A0676 FF0876FF 0606681E 05F0681E 006A006A 001EE914 C48315A5 077D9A01 ..).É..á.Õ..j.j..hÞ..h...v..v.j. 000160
 76FF04C4 8316CA06 189A0676 FF0876FF 048FE900 01B814C4 83117807 7D9A016A j..).x..á.|..Õ...v..v....ò..á..v 000180
 B6FFFF7A B6FF8C76 FF8E76FF 00001137 9A5016FD F286804C 6A027368 0676FF08 ..v.hs.jL..·».P.7....v..v..Ñz..Ñ 0001A0
 0BFC468B 0443E900 01B80006 E9037500 003D0000 0BE99A50 16FC468D 0C6AFF78 x.j..F•.P.Õ...=..u.Õ..|..ÕC..F•. 0001C0
 00000BAE 9A5016FE 8A868D02 6AFC76FF FE76FF8C 76FF8E76 FF00A5E9 0375FE46 F±u.ÕE..v..v..v±.v•j....±.P.Ü... 0001E0

Dump of file SATURN:[PCCOMMON.DUMP.DLL]DASHORT.TMP;1 on 18-APR-1990 10:43:15.93
File ID (613,14,0)   End of file block 77 / Allocated 80

Virtual block number 37 (00000025), 512 (0200) bytes

 8310A000 8C9A5016 FDF2868D 5016FE8A 86800411 E90001B8 0006E903 7500003D =..u.Õ.;|..Õ.....±.P..·».P...... 000000
 B6FFFF7A B6FF8C76 FF8E76FF 002EE903 7400FDF2 8E80005F E9037500 003D08C4 á.=..u.Õ_../·».t.Õ...v..v..Ñz..Ñ 000020
 E903C0E9 0001B800 06E90375 00003D00 00FFFF9A 146AFC76 FFFE76FF 0C6AFF78 x.j..v±.v•j......=..u.Õ..|..Õá.Õ 000040
 03750000 300000FF FF9A5016 FDF2868D 026AFC76 FFFE76FF 8C76FF8E 76FF0027 '..v..v..v±.v•j...·».P.....=..u. 000060
 16FC468D 5016FDF2 868D009A E9037500 FDF28E80 00A4E903 96E90001 B80006E9 Õ..|..Õ..ÕE../·».u.Õ....·».P.F•. 000080
 E9FF7686 880007E9 03750000 3DFF7686 890CC483 11542029 9A8C76FF 8E76FF50 P.v..v..) T..á...v.=..u.Õ....v.Õ 0000A0
 FDF2868D 5016FC46 8( 106A00 6A8C76FF 8E76FF00 2FE90374 FE4608FC 4688035D ]..F•.F±t.Õ/..v..v.j.j..F•.P..·» 0000C0
 FF8E76FF 0323E9FF 76868800 07E90375 00003DFF 76868900 00FFFF9A 006A5016 .Pj........v.=..u.Õ....v.Õ#..v.. 0000E0
 76868900 0013469A 146AFC76 FFFE76FF 0C6A0E77 FF261077 FF26FED6 9EC48C76 v.á.ø±&.w.&.w.j..v±.v•j..F.....v 000100
 16FDA086 800066E9 0375FE46 0BFC468B 02EFE9FF 76868800 07E90375 00003DFF .=..u.Õ....v.Õy..F•.F±u.Õf....». 000120
 FF8C76FF 8E76FF00 2FE90375 00FDA08E 8008C483 139E1EAD 9A0676FF 0876FF50 P.v..v..Ù....á../.».u.Õ/..v..v.. 000140
 86880007 E9037500 003DFF76 86890000 16979A50 16FDA086 80096AFC 76FFFE76 v±.v•j....».P.......v.=..u.Õ.... 000160
 0010699A 006A006A 016A006A 01256802 90680676 FF0876FF 0019E902 9AE9FF76 v.Õ..Õ...v..v.h..h%.j.j.j.i..i.. 000180
 0007E903 7454FDA0 8E80000A E903754E FDA08E80 00E8E903 75FE4608 FC468B00 ..F•.F±u.ÕŠ../.»Nu.Õ.../.»it.Õ▪. 0001A0
 002FE903 7400FF7C 8E800000 18F89A50 16FF7C86 800A6A02 D2680676 FF0876FF .v..v.hØ.j...|..P.½..../|..t.Õ/. 0001C0
 00003DFF 76868900 00143F9A 5016FEDA 86800C6A FC76FFFE 76FF8C76 FF8E76FF .v..v..v±.v•j...Õ±.P.?.....v.=.. 0001E0

Dump of file SATURN:[PCCOMMON.DUMP.DLL]DASHORT.TMP;1 on 18-APR-1990 10:43:15.93
File ID (613,14,0)   End of file block 77 / Allocated 80

Virtual block number 38 (00000026), 512 (0200) bytes

 FFFF1820 9A5016FF 7CD68050 16FEDA86 800088E9 0213E9FF 76868800 07E90375 u.Õ....v.Õ..Õ....Õ±.P..|..P. ... 000000
 6A006A06 76FF0876 FF065568 1E063F68 1E006A20 6A0040E9 03740000 3D08C483 .á.=..t.Õä.j j..h?..hU..v..v.j.j 000020
 13CC9A50 52000013 C59A02D2 680676FF 0876FF01 6A006A14 C48314C1 077D9A01 ..).é..á.j.j..v..v.hØ..é...RP.ä. 000040
 9A5016FE DA868D0C 6AFC76FF FE76FF8C 76FF8E76 FF002CE9 01B7E900 01B80000 ..|..Õñ.Õ,..v..v..v±.v•j...Õ±.P. 000060
 7AB6FF8C 76FF8E76 FF0188E9 FF76868B 0007E903 7500003D FF768689 000018CE ó.....v.=..u.Õ....v.Õ...v..v..Ñz 000080
 86880007 E9037500 003DFF76 86890000 178E9A50 16FDA686 80026AFF 7BB6FFFF ..Ñx.j...Ì».P.......v.=..u.Õ.... 0000A0
 FF8E76FF 00001463 9A5016FE DE868000 9768028D 680676FF 0876FF01 5AE9FF76 v.ÕZ..v..v.h§.h....ß±.P.c.....v.. 0000C0
 E9037500 003DFF76 86890000 15EA9A50 16F4468D 006AFF78 B6FFFF7A B6FF8C76 v..Ñz..Ñx.j..F¶.P.õ.....v.=..u.Õ 0000E0
 B6FFFF7A B6FF8C76 FF8E76FF 0054E903 75F64608 F4468B01 16E9FF76 86880007 ....v.Õ...F¶.F-u.ÕT..v..v..Ñz..Ñ 000100
 76868800 07E90375 00003DFF 76868900 00166D9A 036AF476 FFF676FF 006AFF78 x.j..v-.v¶j..m.....v.=..u.Õ....v 000120
 07E90375 00003DFF 76868900 00FFFF9A F476FFF6 76FF8C76 FF8E76FF 008E9FF .ÕÙ..v..v..v-.v¶.......v.=..u.Õ. 000140
 76FF0082 E9037500 003D04C4 83147600 B69A5016 FEDE868D 0087E9FF 76868800 ...v.Õñ...ß±.P.Ñ.v..á.=..u.Õ...v 000160
 FF76868B 0007E903 7500003D FF768689 0000FFFF 9A5016F4 4680126A 8C76FF8E ..v.j..F¶.P.......v.=..u.Õ....v. 000180
 00001739 9A036AF4 76FFF676 FF006AFF 7BB6FFFF 7AB6FF8C 76FF8E76 FF007CE9 Õ|..v..v..Ñz..Ñx.j..v-.v¶j..9... 0001A0
 68F476FF F676FF8C 76FF8E76 FF004CE9 FF76868B 0007E903 7500003D FF768689 ..v.=..u.Õ....v.ÕL..v..v..v-.v¶h 0001C0
 001FE9FF 76868800 07E90375 00003DFF 76868900 00FFFF9A 5016FEDE 86800097 ....ß±.P.......v.=..u.Õ....v.Õ.. 0001E0
```

```
Dump of file SATURN:[PCCOMMON.DUMP.DLL]DASHORT.TMP;1 on 18-APR-1990 10:43:15.93
File ID (613,14,0)   End of file block 77 / Allocated 80

Virtual block number 39 (00000027), 512 (0200) bytes

 1F0000E9 00008800 0009C49A 0687681E 0676FF08 76FF0000 1247C726 FED69EC4 á.ø±&úG....v..v..h...á...¡..Õ... 000000
 16FF5286 804C6A02 CF680676 FF0876FF D88E135D 881E5657 000080C8 CBC95F5E ^_èuà¯..WV.¡]..Á.v..v.hu.¡L..R.. 000020
 FF528E80 0020E903 7500003D 04C4831A 8F00B69A 5016FF52 86800000 17F29A50 P¯......R..P.Ñ....á.=..u.Õ ../R. 000040
 E90000B8 0006E903 7400013D 04C4831A AB00B69A 5016FF52 868D001C E903742A *t.Õ....R..P.Ñ.¨..á.=..t.Õ..¡..Õ 000060
 E903743F FF528E8C 0063E903 7400013D 04C4831A CB00B69A 5016FF52 86800406 ....R..P.Ñ.ù..á.=..t.Õc../R.?t.Õ 000080
 006A03CA E90000B8 0006E903 7400013D 04C4831B 2400B69A 0A76FF0C 76FF0059 Y..v..v..Ñ.$..á.=..t.Õ..¡..Õò.j. 0000A0
 016A006A 14C4831B 5C077D9A 016A006A 0676FF08 76FF06AB 681E0698 681E006A j..h...h¨..v..v.j.j..).\..á.j.j. 0000C0
 76FF0C76 FF0380E9 0001B800 001B769A 50520000 1B6F9A01 F9680676 FF0876FF .v..v.hª..o...RP.v...¡..Õ...v..v 0000E0
 0377004B 30C60304 C4831B8B 00B69AF0 885116FF 528E8D04 C4831B34 00B69A0A ..Ñ.4..á...R..Q.Þ.Ñ....á..ó=K.w. 000100
 C4831B64 077D9A01 6A006A06 76FF0876 FF06E968 1E060668 1E006A00 6A0030E9 Õ=.j.j..hø..hÕ..v..v.j.j..).d..á 000120
 0328E900 01880000 187E9A50 5200001B 779A0263 680676FF 0876FF01 6A006A14 .j.j..v..v.hc..w...RP.-...¡..Õ(. 000140
 D49A5016 FF528680 2A6AAE56 89AC4689 06C4831B A101A69A 5016FF52 86802A6A j*..R..P.Ï.À..á..F¯.VÚj*..R..P.á 000160
 89A64689 06C4831B CD01A69A 5016FF52 86803F6A A45689A2 468906C4 831B8701 .ñ..á..FÀ.VÊj?..R..P.Ï.e..á..FÏ. 000180
 0375A846 08A64688 FE5689FC 468906C4 83199101 D49A5016 FF52868D 3F6AA856 V´j?..R..P.á....á..F=.V±.FÏ.F´u. 0001A0
 0676FF08 76FF0728 681E0715 681E006A 006A003D E90375AE 4608AC46 8B0048E9 ÕH..F¯.FÚu.Õ=.j.j..h...h(..v..v. 0001C0
 50520000 1CAB9A01 F9680676 FF0876FF 016A006A 14C4831C 98077D9A 016A006A j.j..)....á.j.j..v..v.hª..¨...RP 0001E0

Dump of file SATURN:[PCCOMMON.DUMP.DLL]DASHORT.TMP;1 on 18-APR-1990 10:43:15.93
File ID (613,14,0)   End of file block 77 / Allocated 80

Virtual block number 40 (00000028), 512 (0200) bytes

 D49A5016 FF52868D 2A6A0108 E90374A8 4608A646 8B027DE9 0001B800 001CB29A .ý...¡..Õ)..FÏ.F´t.Õ..j*..R..P.á 000000
 06C4831C C501A69A FA88F088 5116FF52 8E8D2A6A A45689A2 468906C4 831C5B01 .[..á..FÀ.VÊj*..R..Q.Þ.ª.Ï.é..á. 000020
 6A003DE9 0374AE46 08AC4688 0008E903 74D73800 12E90374 C638AE56 89AC4689 .F¯.VÚ;ót.Õ..;øt.Õ...F¯.¡Út.Õ=.j 000040
 6A006A14 C4831DAA 077D9A01 6A006A06 76FF0876 FF076C68 1E075968 1E006A00 .j..hY..hl..v..v.j.j..).´..á.j.j 000060
 FFAE76FF 01ECE900 01880000 1DC49A50 5200001D 8D9A01F9 680676FF 0876FF01 ..v..v.hª..§...RP.á...¡..Õ$..vÚ. 000080
 FF508689 C62804C4 831CF200 B69AF088 5116FF52 8E8D04C4 831CD500 B69AAC76 v¯.Ñ.¡..á...R..Q.Þ.Ñ.´..á.+ó..P. 0000A0
 FF008042 C6FF5086 880AC483 100D00CE 9A501680 46805016 FF52868D FF5086FF .ÑP...R..P.F¯.P.ö....á..ÑP.6B¯.. 0000C0
 50168046 80505240 AE5688AC 468808C4 83102300 109A5016 B0468D0A 76FF0C76 v..v..F¯.P...#..á..F¯.VÚ@RP.F¯.P 0000E0
 46C70164 E908C483 1DD70056 9A0A76FF 0C76FF50 16804680 08C4831D 3600109A ...6..á..F¯.P.v..v..V.ø..á.Õd.úF 000100
 46FF9E46 FF0009E9 03743F3F 80269E5E C4A05689 9E4689A8 568BA646 8B0000AA ´...FÏ.V´.F..V.á^.&.??t.Õ...F..F 000120
 FE5688FC 46880054 E90375A8 56390008 E90374A6 4639FE56 88FC4688 FFEBE9AA ´Õ$..F•.V±9FÏt.Õ..9V´u.ÕT..F•.V± 000140
 0876FF07 95681E07 82681E00 6A006A00 3DE90375 A0563B00 08E90374 9E463B40 @;F.t.Õ..;V.u.Õ=.j.j..h...h...v. 000160
 001E109A 01F96806 76FF0876 FF016A00 6A14C483 1DFD077D 9A016A00 6A0676FF .v.j.j..).».á.j.j..v..v.hª..... 000180
 75AA463B 04C4831E 2A00B69A 0A76FF0C 76FF000A E90001B8 00001E17 9A505200 .RP.....¡..ÕO..v..v..Ñ.*..á.;F´u 0001A0
 831AF707 7D9A016A 006A0676 FF0876FF 07BE681E 07A8681E 006A006A 003DE903 .Õ=.j.j..h´..h/..v..v.j.j..).%.. 0001C0
 87E90001 B800001B 119A5052 00001B0A 9A01F968 0676FF08 76FF016A 006A14C4 á.j.j..v..v.hª......RP.....¡..Õ. 0001E0

Dump of file SATURN:[PCCOMMON.DUMP.DLL]DASHORT.TMP;1 on 18-APR-1990 10:43:15.93
File ID (613,14,0)   End of file block 77 / Allocated 80

Virtual block number 41 (00000029), 512 (0200) bytes

 2B04C483 1E5700B6 9AF08851 16FF528E 8D04C483 1E3A00B6 9AA676FF A876FF00 ..v´.vÏ.Ñ.:..á...R..Q.Þ.Ñ.W..á.+ 000000
 FF508688 0AC4831E ?´00CE9A 50168046 805016FF 528680FF 5086FFFF 508689C6 ó..P..ÑP...R..P.F¯.P.ö.r..á..ÑP. 000020
 A85688A6 4603AA46 ωJ8C483 1E8A0010 9A501680 46800A76 FF0C76FF 008042C6 6B¯..v..v..F¯.P......á..F´.FÏ.V´ 000040
 831A6F00 569A0A76 FF0C76FF 50168046 8D08C483 1E900010 9A501680 46805052 RP.F¯.P......á..F¯.P.v..v..V.o.. 000060
 680676FF 0876FF08 8E1A4C88 1E565700 0002C8C8 C95F5E1F 0000E900 008808C4 á.¡..Õ...^_èuà...WV.¡L..Ä.v..v.h 000080
 5EC40000 E9037401 FE7E83FE 46890000 1F009A00 6A006A00 6A006A01 2468029D ..h$.j.j.j.j.......F±.~±.t.Õ..á^ 0000A0
 9A006A00 6A006A00 6A012468 029F6806 76FF0876 FF0139E9 00008854 07C6260A .&6.T¡..Õ9..v..v.h..h$.j.j.j.j.. 0000C0
 0876FF01 07E90000 884907C6 260A5EC4 0000E903 7401FE7E 83FE4689 00001F32 2....F±.~±.t.Õ..á^.&6.I¡..Õ...v. 0000E0
 E9037401 FE7E83FE 46890000 1F649A00 6A006A00 6A006A01 246802A1 680676FF .v.hÀ.h$.j.j.j.j..d....F±.~±.t.Õ 000100
 6A006A00 6A012468 02A36806 76FF0876 FF0005E9 00008852 07C6260A 5EC40000 ..á^.&6.R¡..Õ¡..v..v.hÉ.h$.j.j.j 000120
 A3E90000 884207C6 260A5EC4 0000E903 7401FE7E 83FE4689 000017BD 9A006A00 .j..§....F±.~±.t.Õ..á^.&6.B¡..ÕÉ 000140
 FE7E83FE 46890000 1FC89A00 6A006A00 6A006A01 246802A5 680676FF 0876FF00 ..v..v.hÉ.h$.j.j.j.j..à....F±.~± 000160
 6A012468 02A76806 76FF0876 FF0071E9 0000884D 07C6260A 5EC40000 E9037401 .t.Õ..á^.&6.M¡..Õq..v..v.hÏ.h$.j 000180
 885507C6 260A5EC4 0000E903 7401FE7E 83FE4689 00001FFA 9A006A00 6A006A00 .j.j.j..ª....F±.~±.t.Õ..á^.&6.U¡ 0001A0
 46890000 1ECE9A00 6A006A00 6A006A01 246802A9 680676FF 0876FF00 3FE90000 ..Õ?..v..v.h`.h$.j.j.j.j..ö....F 0001C0
 00880007 C6260A5E C40000E9 00008843 07C6260A 5EC40000 E9037401 FE7E83FE ±.~±.t.Õ..á^.&6.C¡..Õ..á^.&6..¡. 0001E0
```

```
Dump of file SATURN:[PCCOMMON.DUMP.DLL]DASHORT.TMP;1 on 18-APR-1990 10:43:15.93
File ID (613,14,0)   End of file block 77 / Allocated 80

Virtual block number 42 (0000002A), 512 (0200) bytes

0676FF08 76FF0000 FA46C7D8 8E1E8588 1E565700 005AC8CB C95F5E1F 0000E900 .Ő...^_èüâZ..WV.|ç..ÄÚF'..., .v. 000000
76FF0876 FF00F6E9 FA468B00 06E90375 000030FA 46890000 FFFF9A50 16A6468D .F|.P......F'=..u.Ő...F'Ő-..v..v 000020
46880006 E9037500 0J30FA46 89000009 339A5016 FC46B023 6AA676FF A876F806 ..v'.v|j#.F•.P.3....F'=..u.Ő...F 000040
47082607 8826AA5E C404AA46 830004E9 AC5689AA 4689FE56 88FC4688 00CDE9F ''Őe..F•.V±.F'.V¯Ő...F¯.á^'&..&.G 000060
18159A50 16AE468D 026A37FF 260277FF 26AA5EC4 0676FF08 76FF0087 E903750C .u.Ő...v..v.á^'&.w.&.7j..FŐ.P... 000080
46880000 21209AFC 76FFFE76 FF0676FF 0876FF00 17E90375 000030FA 46890000 ...F'=..u.Ő...v..v..v±.v•. |...F 0000A0
C4002BE9 03740000 3D08C483 1C41008C 9A5016AE 46800E76 FF1076FF 0060E9FA 'Őm..v..v..FÜ.P...A..á.=..t.Ő+.á 0000C0
9AFC76FF FE76FF06 76FF0876 FF025789 26078926 0A5EC402 57882607 8826AA5E ^'&..&.W.á^.&..&.W..v..v..v±.v•. 0000E0
0676FF08 76FF0789 26024789 26000088 0A5EC4FF 66E90027 E9000088 00002147 G|..|..Ő'.Őf.á^.|..&.G.&...v..v. 000100
00E90003 19AC0203 0026CBC9 5F5E1F00 00E90000 8800000A 7C9AFC76 FFFE76FF .v±.v•.|...|..Ő...^_èü&...¯...Ő. 000120
00F30003 19710203 00000002 1C070002 007F0001 1F960103 007E0001 04800103 ......¯..................q...µ. 000140
00080001 0EA80103 00000004 183E0002 00870001 1A620103 00860001 13100103 ..........b.......>........... 000160
01E20007 06780203 00100001 1A350103 00FD0003 0C210203 00000005 176A0002 ..j.......|...».. 5.......x...å. 000180
00860003 208E0203 02C4000B 0FC60203 00000007 20F20002 00130001 1C1A0103 ...........' ......6...á.../ .... 0001A0
001F0001 13700103 001E0001 00710103 00000009 20310002 01090003 1A090203 ...........1 ......q.......p..... 0001C0
026F0009 17050203 00940003 18A00203 01F30007 06880203 02610009 123D0203 ..=...a.......µ.................o. 0001E0
```

```
Dump of file SATURN:[PCCOMMON.DUMP.DLL]DASHORT.TMP;1 on 18-APR-1990 10:43:15.93
File ID (613,14,0)   End of file block 77 / Allocated 80

Virtual block number 43 (0000002B), 512 (0200) bytes

00890003 190C0203 00AC0003 19120203 00830001 04FF0103 00A00003 206F0203 ..o ..........•.......¯...É...¿. 000000
00460003 20460203 00C30003 19400203 00400001 1C210103 028C0009 04700203 ..).......|...M...M...û...f ..F. 000020
02AD000A 02140203 00080003 14FE0203 00CF0003 200A0203 022E0007 128A0203 ..........Ő ..ü...±...Ü.......Ù. 000040
01C80001 881F0200 3E89088E FFFF881E 00000000 00000000 00660003 09080203 ......f...........|...Ä.>...|..ù. 000060
00000000 00000000 00000000 00000000 00000000 00000000 00000800 02000200 ................................ 000080
28D1F7AE F2FFFFB9 0A7EC4FF 758DAEF2 FFFF89C0 33067EC4 1EDE88D7 88EC8855 U.$.•.$.á~.3ä¿...Ü.u.á~.¿...Ü¼|+ 0000A0
88F38BA4 F3C913A5 F3E9D149 A4027400 01C6F706 468BFE87 08468ED8 8EC08CF9 '.â.Ä.F..±.F.¥ó..t.É||ŐµÉ.èµÉ.µ. 0000C0
D1F7AEF2 FFFFB9C0 33C08ED8 8CFE880A 76C51EDE 88078BEC 8855CB50 C28C1FFA '..ó]üU.$.•.$.év..±.Á.ä3ä¿...Ü¼| 0000E0
88EC8855 CB50C28C 1FFA88F3 88A4F3C9 13A5F3E9 D149A402 7401A8C7 88067EC4 á~..ú'.t.É||ŐµÉ.èµÉ.µ.'..ó]üU.$. 000100
881FFFFF 10C01B05 74A6F3F9 28D1F7AE F2FFFFB9 C0330A7E C40676C5 1EDE88D7 •.$.év.á~.3ä¿...Ü¼|+'µ|t..â..... 000120
885500CB 5DFA8B91 49D1F7AE F2FFFFB9 C033067E C4D78BEC 885500CB 5DFA88F3 µ.']ü.U.$.•á~.3ä¿...Ü¼||..']ü.U. 000140
8CC38BAA F3C032F8 E2AA0374 C00AAC0C E30E4E88 DF880A76 C5067EC4 1E5657EC $WV.á~.év..Ő.N.D.¯.ât.'ä½2äµ'.ü. 000160
83023306 46880C4E 88018357 56EC8855 000045E9 000049E9 CB5DE588 5F5E1FC2 ò.^_.|]üŐ|..ŐE..U.$VW°..N..F.3•. 000180
89EC468D 56570000 16C80074 E9018357 56EC8855 008BE908 7EC51E99 01750AF9 '.u¯...é~.Ő..U.$VW°.Őt.à...WV.F$. 0001A0
06478926 08568806 4688420A 47C626F8 5EC4FE56 8CFC4689 0E468DFA 568CF846 F½.V'.F..F•.V±á^½&6G.B.F..V.&.G. 0001C0
03C09A53 060A76FF 0C76FFFC 76FF167F FF0447C7 26025789 26078926 08578926 &.W.&..&.W.&úG.....v•.v..v..S.á. 0001E0
```

```
Dump of file SATURN:[PCCOMMON.DUMP.DLL]DASHORT.TMP;1 on 18-APR-1990 10:43:15.93
File ID (613,14,0)   End of file block 77 / Allocated 80

Virtual block number 44 (0000002C), 512 (0200) bytes

E8058826 02478E26 07FF263F 8826C02A 1278044F FF26F85E C4F0080C C4830198 ...á..Þá^½&.O.x.'ä&.7&..&.G.&..$ 000000
330F8806 7EC457EC 8855CBC9 5F5EC688 06C483FF FF024A9A 006A53FA 76FF900F ...v'Sj..J....á..ó^_èüU.$Wá~..Ő3 000020
885FC28C C788C78E FF330474 0538264F AEF2F888 0A468AD9 F741AEF2 FFFFB9C0 ä¿...ÜA¼|.F..«·ÜŐ&B¯.t.3..ú.ú.ó_. 000040
05382647 AEF2F00A 468A4F09 F741AEF2 FFFFB9C0 33067EC4 57EC8855 00CB5DE5 |]ù.U.$Wá~.3ä¿...ÜA¼|O.F.»·ÜG&B. 000060
D788067E C45738E3 0C4E88EC 8855CB5D E58B5FFC C28CC788 04E80088 C0330674 t.3ä.ÅŠ..ú.ó• .|]üU.$.N.O8Wá~..• 000080
E30187AA F3C913AB F3E9D1E0 8A0A4688 D12BD187 D1030323 DB1BD128 0C740AF7 ¼Őt.+|.Uw&.|.Ī+|.F..Á|Őµ¨.èµ¯.|D 0000A0
56570000 08C8CB5D 08568806 46885FAA F3C913AB F3E9D1C3 8EFFFFC3 81C38C10 ..ü.ü...ü|Őµ¨.èµ'_.F..V.]ùà...WV 0000C0
05E0D1C1 03E001C8 8BF9F700 0CB99900 3A20C388 FA4689E4 2A08478A 26085EC4 á^.&.G.'ő.F'.ü-:..¿..¥'.â|Á.é|Á. 0000E0
28E9FFFF 88200A4F 8026085E C40F7440 0A47F626 0774830A 47F626F8 4689192E ...F½&-G..t.&-G.ât.á^.&.O. |..Ő+ 000100
26020A4F 802690E2 E8000004 47C72620 0A4F8026 0E74010A 47F62608 5EC49001 ..á^.&-G..t.&.O. &úG...$ä.&.O..& 000120
F7000CB9 99003A20 C3884C75 0C0A47F6 26FC7689 F0880447 8926C028 EF0A6780 .g.ÿ+ä&.G..Þ.v•&-G..uL.ü-:..¿..¼ 000140
16750052 087E810E 7402F30A 7E810775 0046087E 81377501 192E87F6 060868F9 'kÁ.-....u7.-.F.u..~.µ.t..-.R.u. 000160
83000BE8 0876FF0A 76FF0C75 C00802C4 83036612 7A9AFA76 FF0F75FF FF0A7E81 .-...u..v'.z.f...á..âu..v..v.Ő... 000180
7401192E 87F60608 6· 9F700 0CB99900 3A20C388 1575080A 47F62608 5EC404C4 á.á^.&-G..u..ü-:..¿..¥'kÁ.-....t 0001A0
4588F87E 88025789 26078926 40085788 26064788 2606772B 26378826 085E8867 g.^.&.7&+w.&.G.&.W.ä&..&.W..-½.E 0001C0
19E8FC46 8908C483 038410E2 9AFA76FF 0677FF26 5256167E F6080447 89264802 .H&.G..-~.VR&.w..v'.ä....á..F•$. 0001E0
```

Dump of file SATURN:[PCCOMMON.DUMP.DLL]DASHORT.TMP;1 on 18-APR-1990 10:43:15.93
File ID (613,14,0)   End of file block 77 / Allocated 80

Virtual block number 45 (0000002D), 512 (0200) bytes

```
065FC426 085EC408 C48303A7 10A49A53 006A006A 026A0F74 201F3F87 F6FA5E8B .^•-.?. t.j.j.j.S.É.Ì..á.á^.&á_. 000000
39FC4689 08C48301 7010E29A FA76FF50 1606468D 560001BE 17EB0788 2606468A .F.&..Š.ƒ..V.F..P.v•.ã.p..á..F=9 000020
88A3228E B802FD12 9E9A000A B8EC8855 C8C95F5E E42A0646 8AFECCE9 0374FC76 v=t.Õât.F.*ð^ èüÙ.&|.....».|."É. 000040
C7226016 89225EA3 08568806 4688227A 16892278 A3105688 0E468822 8A1E8C22 "...".F..V.Èx"..z".F..V.É^"..'"ú 000060
A3C02800 0122860C C70308E9 037425F6 7E80038D E9000022 8206C700 00228406 ..."..ú..."..Ô...--Xt.Ô..ú..."..+âÈ 000080
002023EE 06C72276 A3225CA3 2262A322 7CA3227E A32266A3 2280A322 64A32268 h"Èd"È."Èf"È-"È|"Èb"È\"Èv"ú.Ÿ# . 0000A0
FF00752B 3F80260A 5E88903E E8003023 EE06C70A 46FF4975 30017F80 260A5EC4 á^.&...0uI.F.ú.Ÿ#0.$>..^.&.?+u.. 0000C0
9014EB22 7C06FF1A 75002268 3E830E75 203F8026 9028E800 00227C06 C7226806 .h"ú.|"..$(.&.? u..>h".u...|"$.. 0000E0
E80E5098 078A260A 5E880A46 FF227606 FFC7752D 3F80260A 5EC400EB 225C06FF ..\"$.á^.&.?-uú..v".F..^.&...P.Ô 000100
0C56890A 468908C4 8308C7E8 0E228C68 1E0A76FF 0C76FF0D 75C00802 C4830978 x..á..áuI.v..v..h.".Ôú..á..F..V. 000120
753023EE 3E830074 0022763E 83228CA3 08F7228C A1227606 FF0C7D00 228C3E83 .>.".)...v"Å."ÄÆ.".>v".t..>Ÿ#0u 000140
0E228668 1E0A76FF 060A46FF 227E06FF 2D752E3F 80260A5E C4002023 EE06C706 .ú.Ÿ# .á^.&.?.u-..-".F...v..h.". 000160
0A5EC422 7E0EFF00 01228606 C70A7D00 22863E83 0C56890A 468908C4 83087BE8 Ô(..á..F..V..>.".).ú.."....~"á^. 000180
3E830002 226606C7 0675006C 302B7400 68304074 004E303D 7400463D 98078A26 &...=F.t==N.t@=h.t+=I.u.ú.f"...> 0001A0
06C79002 4EE91C75 003F8026 0A5EC40A 46FF0375 4C3F8026 0A5EC409 75002266 f".u.á^.&.?Lu..F.á^.&.?.u.ÔN..ú. 0001C0
00453DF8 46899807 8A26C8EB 00082266 06C7D0EB 00102266 06C7D8EB 00012266 f"..$Àú.f"..$Àú.f"..$á&....F%=E. 0001E0
```

Dump of file SATURN:[PCCOMMON.DUMP.DLL]DASHORT.TMP;1 on 18-APR-1990 10:43:15.93
File ID (613,14,0)   End of file block 77 / Allocated 80

Virtual block number 46 (0000002E), 512 (0200) bytes

```
91E9037E 78740069 30F8468B 20F84683 226406FF 08750058 30057400 4730DA74 t.=G.t.=X.u...d".F% .F%=i.tx-.Ô. 000000
75022266 3E839001 59E90140 E9037500 25300152 E9037E01 3FE90375 00633D01 .=c.u.Ô?.-.ÔR.=X.u.Ôa.ÔY...>f".u 000020
2282A11F C4262278 1EC400EB 00000247 C7260789 262282A1 1FC42622 781EC415 .á.x"&á.À."&..&úG...$.á.x"&á.À." 000040
225E1EC4 018DE903 74002282 3E830170 E9037500 22843E83 04227806 83078926 &....x"..>.".u.Ôp..>.".t.Ô§.á.^" 000060
019EE80E 0A6A0000 225C06C7 228006FF 01ACE9FF FFB801AF E9037520 0A47F626 &-G. u.ÔÉ.|..Ô¯...."ú.\"..j..Ô.. 000080
22663E83 00042286 06C7227E 06FF2264 06FF2262 06FFF2EB 086A90C3 EB02C483 .á.$ú.j.$ ..b"..d"..-"ú.."...>f" 0000A0
4689228C A1287422 8C0639FA 46892266 A3C0287A 74012266 3E830081 E9037508 .u.Ô...>f".tz+âÈf".F'9.."t(Å.".F 0000C0
C028027D C008228C A105228C 2E839090 13E80000 228C06C7 0A740022 763E83FA •.>v".t.ú.."..$......".Å.".â).+â 0000E0
227400FA 7E8302C4 830480E8 0E3A6A02 C4830130 E80E106A 02227806 83228CA3 È."..x".j..00..á.j:.Ô...á..-•.t" 000100
228C06C7 9007EB22 8CA3C028 027DC008 228CA300 052DFA46 88157400 22763E83 .>v".t..F'-..È.".â).+âÈ."$..ú.." 000120
006A90FF 3FE9106A FF10E902 22780683 02C48300 F1E80E10 6A042278 2E830000 ....x".j..Ôþ..á...x".Ô..j.Ô?..j. 000140
90FF21E9 0428E80E 256AFF2A E90349E8 0EF876FF F4EB016A 90FF39E9 026EE80E .Ôn.Ô9..j.$¶.v%.ÔI.Ô•.j%.Ô(.ÔI.. 000160
FF0C5688 0A468809 74002266 3E830A7E 00673005 7C00653D FF0CE903 7500643D =d.u.Ô..=e.|.=g.-Ô.>f".t..F..V.. 000180
E9037500 6F3DFE80 E9037500 6E30903A E8FE5689 FC468940 0C56880A 46880A4E N..F..V.a.F•.V±$:.=n.u.Ô.±=o.u.Ô 0001A0
E8FF79E9 03750078 30FEB9E9 03750075 308F7400 7330FEE0 E9037500 703DFEE4 Ô±=p.u.ÔÀ±=s.t.=u.u.Ô¿±=x.u.Ôy.$ 0001C0
462BC38B EC75253C 0474C00A F6468807 8A26FC5E C4FC46FF 9034E80A 46FF9081 Ý..F.$4..F•á^•&...F-.ât.<%u$.ú+F 0001E0
```

Dump of file SATURN:[PCCOMMON.DUMP.DLL]DASHORT.TMP;1 on 18-APR-1990 10:43:15.93
File ID (613,14,0)   End of file block 77 / Allocated 80

Virtual block number 47 (0000002F), 512 (0200) bytes

```
8A260A5E C40C5689 0A4689FE 5688FC46 8806C483 044CE80E 0A76FF0C 76FF500A .P.v..v..ÔL..á..F•.V±.F..V.á^.&. 000000
12C8CBC9 2282A1FE 51E90374 200A47F6 26225E1E C4FC63E9 0374C00A F6468807 ..F-.át.Ôc•á.^"&-G. t.ÔQ±À."èùà. 000020
0222663E 83228006 FF04740A 067E8300 2023EE06 C7067400 227E3E83 56570000 ..WV.>-".t.ú.Ÿ# ..-..t....".>f". 000040
E8042278 0683FE56 89FC4689 02578826 07882622 781EC419 75102266 3E830774 t..>f".u.á.x"&..&.W..F•.V±..x".$ 000060
83262278 1EC40EEB 0000FE46 C7FC4689 07882622 781EC411 74002280 3E83902C ,..>.".t.á.x"&...F•úF±..$.á.x"&. 000080
E8064688 0674FE46 08FC4688 0E740022 5C3E8302 22780683 FE5689FC 46899907 ...F•.V±..x"..>\".t..F•.F±t..F.$ 0000A0
7D00FE7E 83317500 22803E83 F45689F2 4689228A 16882288 A123ECA3 C0289003 ..+âÈ$#À."...".F.V¶.>.".uI.-±.) 0000C0
46890AF7 00028308 F7FE5688 FC46882D 07C626F2 46FFF25E C41D750A 067E832B +.-..u.á^.F &á.-.F•.V±%À.@.%Ô.F 0000E0
FF501E06 76FFFA5E 8CF84689 226A8800 00F646C7 9006E800 01F646C7 FE5689FC •.V±úF-..$..úF-..|j".F%.^•.v..P. 000100
8303C900 869AF876 FFFA76FF 45740022 7E3E830A C48308AD 12709AFC 76FFFE76 v±.v•.p.U..á..>-".tÈ.v•.v%.Ñ.è.. 000120
C4F04E8B 000023EC 06C70675 0823EC3E 83007EC9 08F04E89 C8282286 0E8804C4 á...."+à.Nþ.è-..>$#.u.ú.$#...Nþá 000140
EE5E8C22 640E88F0 4E89F446 8CF27E89 F47FC008 49C18847 3005C626 05E8F27E -·$.&á.0G.èI.á.¶.~·.F¶.Nþ..d".^Ÿ 000160
E375003F 8026F846 FF46202C 80037C61 3C0774C9 08048807 8A26F85E C4F276C5 év·á^%&.....èt.<a|.., F.F%&.?.uD 000180
88057500 F67E8308 74227C06 082268A1 14750022 803E83EE 5E8EF45E 8CF27689 .v·.^¶.^Ÿ.>.".u.Àh"..|"t..--.u.| 0001A0
018E1874 00067E83 56570000 10C8CBC9 5F5E02C4 8302FFE8 0E50C028 02E80001 ..$.+áP.Ô...á.^_èùà...WV.-..t.ƒ. 0001C0
781EC413 74082266 3E83008F E9022278 0683FA56 89F84689 227A1688 2278A100 .Àx"..z".F%.V•.¯x".Ô...>f".t.á.x 0001E0
```

```
Dump of file SATURN:[PCCOMMON.DUMP.DLL]DASHORT.TMP;1 on 18-APR-1990 10:43:15.93
File ID (613,14,0)   End of file block 77 / Allocated 80

Virtual block number 48 (00000030), 512 (0200) bytes

FA5E8CF8 4689FC46 89078B26 22781EC4 10E8FA56 89F84689 02578B26 07882622 "&..&.W..F%.V*$.6.x"&...F•.F%.^* 000000
09750OFC 7E83900A E80"E888 1575FA46 08F84688 0E740822 663E8304 22780683 ..x"..>f".t..F%.F*u.¡Ò.$...-•.u. 000020
860E881C 74227E36 59F628F4 5689F246 89FA5688 F8468BFA 5E8CF846 8908EF88 ¡y..F%.^*.F%.V*.F .V¶+-96~"t.... 000040
26F246FF F25EC446 90EDE810 7ECE3846 1574003F 8026F246 FFF25EC4 900EE822 "$..6^ .F &.?.t.F;ö-.$u.F6^ .F & 000060
76FFFA76 FF5602C4 830159E8 0E570875 0022763E 83FE2822 8C3E88F3 75003F80 .?.uµ.>."+±.>v".u.W.ÒY..6.V.v*.v 000080
000006C8 90C8C95F 5E02C483 013CE80E 57087400 22763E83 06C48301 83E80EF8 %.Ò*..6..>v".t.W.Ò<..6.^_èù.à... 0000A0
C02A9003 E8018005 7547067E 83067467 067E83FE 5689FC46 89227A16 882278A1 Àx"..z".F•.V±.-.gt..-.Gu.¯.$..*à 0000C0
8606C706 75002286 3E830074 00FA7E80 00062286 06C70675 00227E3E 83FA4688 .F*.>-".u.ú..."...-*.t..>.".u.ú.. 0000E0
217A068E FC76FFFE 76FF2288 36FF228A 36FF0676 FF228636 FF226436 FF000122 "...6d".6.".v..6.".6.".v±.v=..z! 000100
7A068E22 8836FF22 8A36FF14 7500225C 3E831874 00FA7E80 0EC48300 1A1EFF26 &.....6..-*.t..>\".u..6.".6."..z 000120
8E228836 FF228A36 FF147500 22863E83 18740022 5C3E8304 C48300 1E 1EFF2621 !&.....6..>\".t..>.".u..6.".6.". 000140
FF187422 7C060822 68A10000 23EC06C7 08227806 8304C483 00261EFF 26217A06 .z!&..&..6...x".ú.$#..Àh"..|"t.. 000160
29E80E50 C02802E8 00018805 74C00804 C483002A 1EFF2621 7A068EFC 76FFFE76 v±.v•..z!&..*..6..ât.¡..$.+àP.Ò) 000180
37882606 468A1478 044FFF26 225E1EC4 3C750022 843E8356 000000C8 90C8C901 .èù.à..:V.>.".u<6.^"&.O.x..F.&.7 0001A0
754006C4 83088502 4A9A0676 FF532260 36FF10EB E42A0488 2602478E 2607FF26 &..&.G.&..*Ò$..6'"S.v..J....6.ðu 0001C0
06768857 75002284 3E835657 000002C8 90C8C95E 228206FF 9005E822 8406FF07 ...."$....."^èù.à...WV.>.".uW.v. 0001E0
```

```
Dump of file SATURN:[PCCOMMON.DUMP.DLL]DASHORT.TMP;1 on 18-APR-1990 10:43:15.93
File ID (613,14,0)   End of file block 77 / Allocated 80

Virtual block number 49 (00000031), 512 (0200) bytes

8406FF04 754006C4 8308ED02 4A9A23EE 36FF225E 36FF2260 36FF18EB 507EF608 .--P$..6'".6^".6Y#.J.Ù..6.ðu.... 000000
2602478E 2607FF26 3F882623 EEA00478 044FFF26 225E1EC4 1E7EC008 4EC68822 ".6N.à-.6.^"&.O.xà.Y#&.7&..&.G.& 000020
76885657 000002C8 C8C95F5E 22820601 06468807 75002284 3E8304EB E42A0588 ..*Ò$à.>.".u..F...."^ èùà...WV.v 000040
830C5F02 4A9A5098 078A2606 5EC4225E 36FF2260 36FF22EB 5E750022 843E830A ..>.".u^$".6'".6^"6^.Ī...P.J._.. 000060
065EC4CD 78044FFF 26225E1E C42574C0 084EC688 0646FF22 8406FF04 754006C4 6.ðu....".F..6N.ât%6.^"&.O.xe6^. 000080
88077500 22843E83 CAE8E42A 05882602 478E2607 FF263F88 26225E1E C4078A26 &..6.^"&.7&..&.G.&..*ÒŠÒ.>.".u.. 0000A0
4689C028 F65689F4 4689228A 16882288 A1560000 0CC8C8C9 5F5E2282 06010A46 F...."^_èùà...VÀ."...".F¶.V-+à.F 0000C0
23EC3E83 06762BF0 28F84689 04C48308 9800869A F476FF52 228C3688 FA4689FC •.F*.6.¯R.v¶.Ñ....6..F½+Þ+v..>$# 0000E0
19752D3F 8026F45E C4227500 22763E83 4E017508 23EC3E83 08E802EE 8305?  .u..Y.$..>$#.u.N.>v".u"6^¶&.?.u. 000100
08743023 EE3E83F8 4EFF02C4 83FE71E8 0E509807 8A26F446 FF127530 23EE3E?  .>Y#Ou..F¶&...P.Òq±.6..N½.>Y#Ot. 000120
FF077400 23EC3E83 0066E80E FA46FF07 7400067E 83187400 22763E83 077EF608 .-~..>v".t..-..t..F*.Òf..>$#.t.. 000140
7500FA7E 830A7400 067E8302 C483FE7E E80E5629 75002276 3E830070 E80EFC46 F•.Òp..>v".u)V.Ò-±.6..-..t..-*.u 000160
0EF476FF F676FFF8 76FF0040 E80E0475 00FC7E83 0A740023 EC3E8300 39E80E04 ..Ò9..>$#.t..-•.u..Òð..v½.v-.v¶. 000180
3E83C8C9 5E02C483 FE38E80E 56002023 EE06C70E 74002276 3E8306C4 83FE85E8 Òç±.6..>v".t.ú.Y# .V.Ò8±.6.^èù.> 0001A0
8302C483 F0C8E80E 306AC802 C483F0D2 E80E5000 208803EB 00288805 74002268 h".t.¡+.$.¡ .P.Ò0».6.ùj0.Òà».6.. 0001C0
06C8C802 C483F0AA E80E5000 788803EB 00588805 74002264 3E831775 1023EC3E >$#.u..>d".t.¡X.$.¡x.P.Ò¯».6.ùà. 0001E0
```

```
Dump of file SATURN:[PCCOMMON.DUMP.DLL]DASHORT.TMP;1 on 18-APR-1990 10:43:15.93
File ID (613,14,0)   End of file block 77 / Allocated 80

Virtual block number 50 (00000032), 512 (0200) bytes

46FF0222 78068337 88262278 1EC41275 2A3F8026 0A5EC400 01FE46C7 56570000 ..WVúF±..6^.&.?*u.6.x"&.7..x"..F 000000
FA468807 8A260A5E 88F6280A 46FFFFFF FE46C708 752D3F80 260A5EC4 9060E80A .$'.6^.&.7-u.úF±...F.+-.^.&...F* 000020
393D8026 06E8F888 003023EE 06C70675 303C0A75 227E3639 387F393C 3F7C303C <0|?<9.;96~"u.<Ou.ú.Y#O..«$.&.=9 000040
0A7E89DF 7D303D80 2647F188 30E983C8 03E1D1CE 0302E1C1 CE889805 8A2618 7F ..&....oèÀ..óíÀ.à.Ò0.þG&.=0)Ò.-. 000060
88570000 04C8C8C9 5F5E0C56 880A4688 37892606 5EC4F088 EEF7FE46 880C468C .F..F±%Y.Þ6^.&.7.F..V.^_`ùà...W¡ 000080
890001B8 F4750038 26117400 30802647 01E8FC7E C4064E8A FE5E8CFC 468908F6 -..F•.^±.N.6-•$.G&.=.t.&c u¶¡... 0000A0
99C03306 76C51E56 57EC8855 90C8C95F C028FE46 8CFC7E89 9009E8FE 468CFC7E ~•.F±$...-•.F±+à_èù.U.$WV.c✓.3à. 0000C0
D1E3D118 72302C1F 77393CAC 01752B3C 04742D3C 50F77409 3CF87420 3CACD833 3Ù¯< t«<.t%P<-t.<+u.¯<9w.,Or.ÌDÌ 0000E0
08F70775 93203C58 0CE80002 83D803D7 130903D2 D1E3D1D2 D1E3D1FA 88C88802 ∅.ù.*ÌDÌ∅ÌDÌ∅.).•.À.∅.$ÈX<-.u.%À 000100
1374C00A 93FC071E 570A7EC5 1E085688 0646880E 4E88C85D 5F5E1FDA F7000283 .∅.%Ò.^_]ù.N..F..V..é~.W..•..ât. 000120
F793F1F7 0274C008 D23392F7 880AF700 0283D8F7 AA2D800A 79D2080E 750AF983 .*.u..∅ÿ.¯-¯%Ù.∅.%Ò.%.3∅.ât.%þ.% 000140
38014480 FF448805 86AC4F05 88E275C3 08C288AA 27040276 393C3004 D38792F1 þ..Æ.0<9v..'¯.ò.ùuã..O¯...D..D.; 000160
38A3E086 580000FF FF9A5016 C48850EC 885500C8 5DE5885E 5F1F580A 8CF272C7 úr .0X._^.Ì]ù.U.$P.6.P.....X.ÀÈ8 000180
C850E588 00018808 4913829A 039EE800 21E80000 FFFF9A08 FC681E08 FE681E1F ..h±..h=......ÒÌ.Ò...ý.Ì.¡...Ì]ù 0001A0
267FFFB9 08FE068E FF330000 881E0904 16FF00FF 680F340F E49A0F27 0F909A50 P...'..ò.4.h.......£..3...±.¿..& 0001C0
E8E774AE F2C03308 74CA88A6 F3C888D1 8800088E 3174003D 80264701 75003D80 .=.u.G&.=.t1ƒ...Ì.ùµÌ.òt.3à ÙtÒ$ 0001E0
```

```
Dump of file SATURN:[PCCOMMON.DUMP.DLL]DASHORT.TMP;1 on 18-APR-1990 10:43:15.93
File ID (613,14,0)   End of file block 77 / Allocated 80

Virtual block number 51 (00000033), 512 (0200) bytes

 00C31FED EBAAC20A 572412C AC9204E0 C00E7241 2CAC1F3F BF1FF788 071E061C .....¥.«?.¯,Ar.àÅ..¯,Ar..ô´ŠÚ.ù. 000000
 0F9A0FE4 9A5000FF 300161E FF047400 00183E83 0F390FE4 9A5000FC 88EC8855 U.&¡=.P.ô.9..>...t.....|..P.ô... 000020
 970C7496 401074C2 38AD2184 8E065688 C08ED88E 02E58857 56EC8855 CB5DE588 .[]ùU.$VW¡|..Ä.å.V.ƒ.tÙ;ôt.ə.t.. 000040
 0FAE0FB4 9A0676FF 57EC8855 0002CA5D E5885E5F 96E8EBF7 88AEF2FF FFB9C033 3å¿...Û.¥$$._^.[]ô..U.$W.v..Ç.Û. 000060
 FFFF9A50 1651521L 53000288 C4885049 D1F7AEF2 FFFFB9C0 33FA8892 1F74C008 .ôt...*3à¿..¯ÚK[IP.ôÉ..S.RQ.P... 000080
 C888F9F7 000CB999 003A2004 46882150 06FF0000 04C80002 CA5DE588 5F580000 ..(_.[]ô..à.....PI.F.-:..¿..¥*.à 0000A0
 47892604 5EC402C4 830FEE15 609A0200 68FE5E8C FC468919 2E05E0D1 C103E0D1 ¦Å.ĕ¦Å....F•.^±h...m.Ÿ..ó.ó^.&.G 0000C0
 4F802604 5EC49021 E8020002 47C726FC 5EC4080A 4F802611 74D00808 57892606 .&.W..Ät.&.O..ó^=&úG...$I.ó^.&.O 0000E0
 47882604 5EC40001 0247C726 FC5EC408 57892606 47892640 FE5688FC 4688040A ...F=.V±ə&.G.&.W.ó^•&úG...ó^.&.G 000100
 08721F30 1E38065E 88EC8855 C3C90000 0447C726 02578926 07892608 57882606 .&.W.&..&.W.&úG...èùU.&.^.;.=.r. 000120
 00FFFF9A 51160C76 FF0876FF 0A76FF53 CC8804EC 830460E9 0454E9C0 3300098A ¤..3àÔI.Õ'..&..àS.v..v..v..O.... 000140
 721F3D1E 38065E88 0CEC83EC 885500CB 5DE588FD 1F3FA780 91E175C0 855A5900 .Y2.àuÅ..I?.».[]ù.U.&.&..^.;.=.r 000160
 10CD9A50 16F4468D 51414151 51C93353 1274201F 3F87F604 13E9C033 00098A08 .¤..3àÔ..-.?. t.S3èQQAAQ.F¶.P.ë. 000180
 88FA8856 57FCFC46 89FE4689 C0330856 C50A468E FA5E8C66 74801F3F 87F60000 ..-.?..tf.^*.F.éV.3à.F±.F••WV.*. 0001A0
 880716FA 88D488E2 2B00808A DC8802EC 833875AE F20A8049 E30C4E88 F86689F2 ·.f¾.N.DI¯.·Ùu;.&..Éo..+ā.Å.*... 0001C0
 0AB0AA00 1FE80375 FB3B00B0 009AE900 28E8F4E2 AA1A74F8 3B00740A 3CAC0C4E N.¯<.t.;«t.¯ā¶Ô+.Ô..¯.;«u.Ô..¯¯. 0001E0

Dump of file SATURN:[PCCOMMON.DUMP.DLL]DASHORT.TMP;1 on 18-APR-1990 10:43:15.93
File ID (613,14,0)   End of file block 77 / Allocated 80

Virtual block number 52 (00000034), 512 (0200) bytes

 1E515350 1045129E 9AFFFCB8 7AEB0093 E9FA5E8E 5F5EE1EB 0014E8E2 EBFC46FF .F•ŠàÔ..ŠÅ^_.^*Ô..Šz¡=....E.PSQ. 000000
 F45E8811 75C00800 00100E9A 5016F446 8051521E 53065E88 1FE3CA28 CF881F06 ...ú•ôD..^.Š.RQ.F¶.P......āu..^¶ 000020
 098A0001 30007400 60301874 C00B08C4 831FC3FA 88585859 1F07740B 08FE5E01 .^±.Ût..Y[X.*ù..ó..ât.=m.t.=..¤. 000040
 3F80085E 880A5E8E 0E74401F 3F87F6FE 5E8E26E8 F900208A 03E8001C 8A087500 .u.¤..$.¤ .*$&.^±-.?.ət..^..^..? 000060
 E5880472 FA5E8E5F 5EF8668B FC4628FE 468806E8 F9C03300 1CBA0EEB F803751A .u.¾$.¤..3à*$..F±+F=.f¾^_.^*r..| 000080
 11A59A50 16F4468D 51521E53 0856C51E EEEBC188 0475C90B 0C4E8802 F7E9C85D ]ùÖ¼..N..èu..êŠŸ.éV.S.RQ¯F¶.P.E. 0000A0
 C2E80020 BAC7EB00 1CBACC75 00098A00 01300074 00603017 74C0081F 071E0000 ......ôt.=m.t.=..¤..uə¤..Šúo .Šô 0000C0
 00A3EBC0 33001CBA A6E80275 1A3F8026 DA880A74 401F3F87 F68775C0 08F44688 .F¶.àuñ-.?.ət..Ô&.?.u.$Io..3àŠÉ. 0000E0
 401F3F87 F60C7C00 F883117D 1F301E38 065E88EC 8855FC20 E9008357 56EC8855 U.$VW".Ô •U.$.^.;.=.)..=.|.-.?.ə 000100
 5152E388 05720038 1E380872 D82BDC88 5A5900CB 5DE588C0 3302E800 01880574 t.¡..$.3à.[]ù.YZ.É•Är.;.8.r..ÐRQ 000120
 C4885087 1F3FA780 D4885200 02880034 2EFF5152 FC74E9C0 33057540 0034A1C8 ùÅ4.əu.3àÔt•RQ..4.£..R.Å.I?.ñP.ó 000140
 3F8F0808 81067500 02300774 00013040 81127558 C0080000 FFFF9A52 16501653 S.P.R......àXu.Ÿə=..t.=..u.Ÿ...? 000160
 217006C4 01AEE903 7321681E FFD833C2 8C216C06 C41EE321 6A0E885A D47948 1F .KyàZ..j!D.à.!!.ó3Ù..h!s.ÕÙ.ó.pl 000180
 78302174 880073E8 2174BF21 748E007C E82174BF 2174BE21 681EFF00 0388C28C .ôÉ....h!/t!¢t!Ô|./t!¢t!Ôs.¡t!=x 0001A0
 6A036A00 51E82178 BF2174BE D88E0F8A 88C30000 FFFF9A13 3F680E01 6A0B7421 !t.j..h?......ù¡¤..Ä/t!¢x!ÔQ.j.j 0001C0
 5503E800 31E82178 8F2174BE 003AE823 F08F23F0 BEEC8855 0000133A 9A006A00 .j..:...U.$/Þ#¢Þ#Ô:./t!¢x!Ô1.Š.U 0001E0

Dump of file SATURN:[PCCOMMON.DUMP.DLL]DASHORT.TMP;1 on 18-APR-1990 10:43:15.93
File ID (613,14,0)   End of file block 77 / Allocated 80

Virtual block number 53 (00000035), 512 (0200) bytes

 0000FFFF 9A500646 8A50C033 001AE821 788F2178 BE0023E8 21788F21 788EEC88 .&/x!¢x!Ô#./x!¢x!Ô..3àP.F.P..... 000000
 EEEB10FF F2740245 08058804 EF830E73 F738C321 681EFF00 028807E3 216A0E88 ..j!D.£....h!ù;¼s..ÿ....E.t·..ŠŸ 000020
 5689F046 89C02808 FE166d00 F0E90375 08FE3639 FF28F628 56570000 14C800C3 ù.à...WV+-+.96±.u.Ôþ...±.+ó.FÞ.V 000040
 461974C0 080AC483 14261680 9A000868 1EF676FF F876FF0C 6AF85689 F646c..2 ·.F-.V½j..v½.v-.h.....&..ó..ât.F 000060
 8026F646 FFF65EC4 0CEB47EA 75003F80 26F646FF F65EC400 BCE90376 7FFFFE.. .±..v.Ô¥.ó^-.F-&.?.uõG$.ó^-.F-&. 000080
 5689EC46 8904C483 14351628 9A046A50 0145808A 75003F80 26F65E88 F475003f ?.u¶.^-&.?.uø.E.Pj..(.5..ó..F&.V 0000A0
 886674C2 08FC4688 6074EE46 08EC4688 FE5689FC 468902C4 83146815 609A56EE ŸV.m.k..ó..F=.V±.F&.FŸtm.F=.ôtf. 0000C0
 0AC48311 8A16809A 0008681E F076FFF2 76FF0C6A 21471689 2145A3EE 568BEC46 F$.VŸÉE|..G|j..v·.vÞ.h........ó. 0000E0
 8A26F046 FFF05EC4 04EC4683 02578926 078926FE 5688FC46 88EC5EC4 2C74C008 .ât,ó^$.F=.V±&..&.W..F$.ó^Þ.FÞ&. 000100
 26F05EC4 F475003F 8026F046 FFF05EC4 E8E80E74 C00A0788 26FC46FF FC5EC407 .ó^=.F=&...ât.ŠÔó^Þ.FÞ&.?.u¶ó^Þ& 000120
 0C080C07 09060005 18040203 02021601 FA70E900 028890CB C95F5EA7 75003F80 .?.u!^_èù.¡..Ôp*................ 000140
 08590057 00530052 02430041 02350212 12110010 120F1600 160C0808 070A0C09 .....................S.A.C.R.S.W.Y. 000160
 891F38A3 16080000 080702CE 08A40084 09820A81 0A801606 09721C70 2060006C l.m p.r............É.ö.■.....É;.. 000180
 0A0024B9 14C08B1F 38A3CB5D E58B99FF FFB80008 E8CB5DE5 8B99FFFF 881F3416 .4.¡....[]ùÔ..¡....[]ùÉ;.Éà.¿$.. 0001A0
 8A2E4301 76CA3C04 728C3C43 0A76243C 0472133C F7E24343 1674073A 2E1875E4 ôu..:.t.CCä¼<.r.<$v.C<¥r.<ôv.C.. 0001C0
 EC8855C8 5DE58801 FE4F8026 0574C308 C08C065E C4EC8855 00C31F34 A3980147 G..É4.ù.U.$ó^..â.ût.&.O±..[]ùU.$ 0001E0
```

```
Dump of file SATURN:[PCCOMMON.DUMP.DLL]DASHORT.TMP;1 on 18-APR-1990 10:43:15.93
File ID (613,14,0)   End of file block 77 / Allocated 80

Virtual block number 54 (00000036), 512 (0200) bytes

750082E8 215CA312 740025E8 08750021 5C3E831E 73FFF130 06468857 5602EC83 .$.VW.F.=þ.s..>\!.u.ÒX.t.È\!Ò..u 000000
3900F08B CB5DE58B 5E5F02C4 8313E617 0E9A0676 FF0B7500 78E80574 0018E815 .Ò..t.Òx.u..v....]..á._^.]]ùEÞ.9 000020
8315A118 BA9A5002 8J510E4F 8D50501E C033FE5E 89FEE383 43065E88 0776065E ^.v..^.C.D±.^±3ä.PP.O.Õ¯.P.¤.À.. 000040
C033D88E FE5E8B00 08A30A8E 05740208 2160A321 5E1687C2 8B3874FF FA8308C4 á..*.t8.ô..^lÈ'!.@t..ÒÈ...^±.À3ä 000060
1FD88C00 06A30000 05000AA3 01478000 02A30000 A3000A88 0C478948 480008A3 È..HH.G.¡..È..È...G.È.....È...À. 000080
FF006A56 00000ACB C3098EC1 8CD20801 36E82160 1E8ED833 064E88C0 8ED88CC3 ù.À.ä.N.3U..'!Òõ..@.è.!ùä...Vj.. 0000A0
768B902F EB99C02B 0674FFFF C2F7FA56 89F84689 16551970 9A0676FF 006A0876 v.j..v..p.U..F%.V*%ô..t.+ä.$/..v 0000C0
15CD0202 9A50FE76 FF006A56 1274D008 FE5689FC 468902C4 83166E15 609A56F8 %V.m.n..á..F•.V±.Àt.Vj..v±P...ë. 0000E0
067EC4D9 8827E30E 4E881E56 57EC8855 90CBC95E FE5688FC 46889007 E808C483 .á.$...F•.V±^èù.U.$WV..N.D'.1á-. 000100
49490474 0477FF45 3A26C933 FF448AA6 F30A76C5 FE88CB03 D9F7AEF2 C033F788 .%3ä·ÚÀ).ù.±év.µ!.D.3è&:E.w.t.|| 000120
5EC41CE8 F628FC5E 8CFA4689 003A8856 000006C8 00CB5DE5 885F5E1F C18801F7 %!.è.^_.]]ù.à...V¦:..F*.^•+-$.á^ 000140
2A16881F 28A10CFA 46^34601 744004C4 83163A19 A49A5306 0E74830A 47F626FA *&-G..ī..S.È.:..á.@t.F.F*.À(...* 000160
8855C85D E58801FE 4F '0474 D8080065E 88EC8855 90CBC95E C6880876 FA46391F .9F*vA.6^èù.U.$.^..Ùt..D±..]]ùW. 000180
2152A3FE 244024E8 99C03305 750176E8 00058807 1E297500 3F832152 885756EC $VWER!.7.u)..¡..Òv.u.3ä.$$ù>±ÈR! 0001A0
5E5F0009 E8C08ED8 8C064E88 21583689 FFFEFE44 C704C683 000104C7 962154A3 ÈT!.ù....ô.ùD±±..6X!.N..À.äÒ.._^ 0001C0
C1384843 7401A8FE 88ADFC02 7788F273 EEF983FE E180FA74 410000E9 CB5DE588 .]]ùÒÀ.At*.À±.'Ys·.w.•Ù.±´.tCH;è 0001E0

Dump of file SATURN:[PCCOMMON.DUMP.DLL]DASHORT.TMP;1 on 18-APR-1990 10:43:15.93
File ID (613,14,0)   End of file block 77 / Allocated 80

Virtual block number 55 (00000037), 512 (0200) bytes

FE4C89F9 030C74FE 8BE6E8FE 4489F788 000205C2 03357401 A8ADF003 D08B1573 s..À.ÞU´.t5.ô....%.D±$!.±t..*.L± 000000
C3027F89 21601E8C 260574D1 38134089 DA8CC688 FE4CFEF9 0305E805 8948C128 +èH..$..*±L±.6.Ò¿@.;!t.&..'!...ù 000020
ADF003D0 888C73C1 3848FE88 F27401A8 ADF003FE 882574FF FE300221 6406C626 &6.d!.=±.tX.±.ÞU´.t´.±H;ès¥.À.ÞU 000040
21640EFE 2615E808 8E0474C0 08084788 E6E8FE44 89F78800 0205C203 E27401A8 ´.tā.ô....%.D±$!.G..ät..À$.&±.d! 000060
0074C638 0068E8C0 33067788 88E83788 215C1E8E 260574C7 3817A18F 088C1274 t..À¢À.;ùt.&..\!.7$È.w.3äÒk.;ôt. 000080
0474C138 17F56908 8C98E84E 4E960574 001DE8FE 4DFE0D74 005FE898 40400124 $.ãã.Ò_.t.±M±Ò..t..NN$..À¿%.;èt. 0000A0
1638267F FFBA4141 49C82803 7401A8FE 458851C3 99C03302 47890788 2160A326 &È'!...G.3ä.ùO.E±´.t.+à!AA¤..&;. 0000C0
D1D2F708 75000CE8 C628C223 D2F70072 C2031572 C603C188 F575EAD1 04762162 b!v.!òu%.è.ôr..ôr.%@#ô+6Ò..u.%@! 0000E0
28068806 7789FFFE FE44C7F2 03F088FE 88571874 001DE851 52C359C0 33E575EA ôu!3àYùRQÒ..t.W.±.Þ.·ùD±±..w..@+ 000100
8308C483 1600188A 9A1F0650 00018850 52521ED2 335053C3 5A5958FE 55894AD7 •J.U±XYZùSP3@.RRP¦..P...¤.!..á.. 000120
48064688 08568809 068F3875 000A7E83 065756EC 8855C302 08027458 5A1FFFFA *..Z(t..@ùU.$VW..-..uB¢...V..F.H 000140
735E003E E8560E46 89024488 0074F738 11744800 0636884C E8277200 57E80775 u.ÒW.r'$L.6..Ht.;%t..D..F.VÒ>.^s 000160
FFFF9A50 C0335016 52C48850 21E899FF FFB80675 02080473 0006FE81 04C68334 4.6..±..s..@u.¦...$!P.áR.P3äP... 000180
880E4E88 CB5DE588 5E5F07C0 33038800 06368902 5C891489 E675C085 F9580000 ..(*.äu!...\..6...Æ3ä._^.]]ù.N.. 0001A0
0675F738 C18ED388 26721C03 DA882CE8 F9F27500 06FE8104 C6830C74 024C39F7 %9L.t..6..±..u·*$,.Ò..r&.Æ.é;%u. 0001C0
00C3D188 04879209 00168904 75F7380E 75C08500 00FFFF9A 51531373 09001E39 9...s.SQ......äuß;%u.........iù. 0001E0

Dump of file SATURN:[PCCOMMON.DUMP.DLL]DASHORT.TMP;1 on 18-APR-1990 10:43:15.93
File ID (613,14,0)   End of file block 77 / Allocated 80

Virtual block number 56 (00000038), 512 (0200) bytes

88C888E3 F70008CA 5DE588E3 F7064688 0B750A5E 88D80B0C 5E880846 88EC8855 U.$.F..^..À.^.u..F.%D.]]ò..%D.à. 000000
8A26065E C4F62856 000004C8 0008CA50 E5580103 E3F70646 88C8030C 66F70646 F.%f..à.F.%D.!.]]ò..à...V+-á^.&. 000020
2E87F606 D868F9F7 000C8999 003A20C3 88157508 0A47F626 5575023C 03240A47 G.$.<.ùU&-G..u..ù·:..¿..%*kÀ.-.. 000040
8A260677 FF260877 FF265028 7EC008FC 46890647 28260788 26065E88 39740119 ..t9.^.&..&+G..F•.à~(P&.w.&.w.&. 000060
065EC4FF FF8E200A 4F802606 5EC40874 FC463808 C48318AA 10E29A50 E42A0847 G.*ÒP.ā.´..á.;F•t.á^.&.O. ƒ..á^. 000080
138C0103 000CC8C9 5EC68800 000447C7 26025789 26078926 08578826 06478826 &.G.&.W.&..&.W.&ùG....ô^èù...... 0000A0
190E0103 00000009 182A0002 00000007 19F80002 00070002 13540103 00050002 ......T.......%.......•......... 0000C0
110E0103 00880002 02350105 02D7000C 122E0203 00260002 19590103 00220002 ..".. .Y...&.......•...5........ 0000E0
00000000 005C0002 0F070103 00580002 0F1A0103 00400002 12060103 003A0002 ..:...•...M.......[.......\..... 000100
6F43202D 20797261 7262694C 20656069 54206E75 5220534D 00000000 00000000 ........MS Run-Time Library - Co 000120
70726F43 2074666F 736F7263 6940202C 38383931 20296328 20746867 69727970 pyright (c) 1988, Microsoft Corp 000140
31003031 00320030 00300065 73726576 6E6F4320 6D726F46 2074726F 68530011 ..Short Form Converse.0.0.2.10.1 000160
7469746E 45007972 746E6520 68637461 42207974 69746E45 00310031 00310000 ..1.1.1.Entity Batch-entry.Entit 000180
7972746E 65206863 7461422ᵥ 79746974 6E450079 72746E65 20686374 61422079 y Batch-entry.Entity Batch-entry 0001A0
20656061 6E207974 69746E65 20726574 63617261 68632065 6E6F2079 6C6E4Fᵥ .Only one character entity name  0001C0
676E654C 00797274 6E652068 63746142 20797469 746E4500 2E646577 6F6C6C61 ·llowed..Entity Batch-entry.Leng 0001E0
```

```
Dump of file SATURN:[PCCOMMON.DUMP.DLL]DASHORT.TMP;1 on 18-APR-1990 10:43:15.93
File ID (613,14,0)   End of file block 77 / Allocated 80

Virtual block number 57 (00000039), 512 (0200) bytes

 6E207974 69746E65 20676E69 6B73616D 20726F66 20676E6F 6C206F6F 74206874 th too long for masking entity n 000000
 2064696C 61766E49 00797274 6E652D68 63746142 20797469 746E4500 2E656D61 ame..Entity Batch-entry.Invalid  000020
 20273F27 20646E61 20272A27 2068746F 62202C64 6C656966 20676E69 6B73616D masking field, both '*' and '?'  000040
 61766E49 00797274 6E652D68 63746142 20797469 746E4500 64657375 20657261 are used.Entity Batch-entry.Inva 000060
 652D6863 74614220 79746974 6E450064 6C656966 20676E69 6B73616D 2064696C lid masking field.Entity Batch-e 000080
 7469746E 4500646C 65696620 676E696B 73616D20 64696C61 766E4900 7972746E ntry.Invalid masking field.Entit 0000A0
 20646C65 69662065 6D616E20 79746974 6E650079 72746E65 2D686374 61422079 y Batch-entry.entity name field  0000C0
 7469746E 65206574 61657243 00006465 68637461 6D73696D 20273F27 20646E61 and '?' mismatched..Create entit 0000E0
 65792074 6F6E2070 6C654800 7972746E 652D6863 74614220 79746974 6E450079 y.Entity Batch-entry.Help not ye 000100
 20657079 54007974 69746E65 20657461 64705500 21656C62 616C6961 76612074 t available!.Update entity.Type  000120
 61422079 7469746E 45002E79 7469746E 65206568 7420726F 66206560 616E2061 a name for the entity..Entity Ba 000140
 72747461 20656572 66206F6E 20657261 20657265 68540079 72746E65 2D686374 tch-entry.There are no free attr 000160
 20797469 746E4500 00000000 0020202C 002E6465 6E696665 64207365 74756269 ibutes defined..,  ......Entity  000180
 45007972 746E652D 68637461 42207974 69746E45 00797274 6E652D68 63746142 Batch-entry.Entity Batch-entry.E 0001A0
 6E6E6163 20657079 74726570 75530079 72746E65 2D686374 61422079 7469746E ntity Batch-entry.Supertype cann 0001C0
 20797469 746E4500 79746974 6E452073 61206560 61732065 68742065 6220746F ot be the same as Entity.Entity  0001E0

Dump of file SATURN:[PCCOMMON.DUMP.DLL]DASHORT.TMP;1 on 18-APR-1990 10:43:15.93
File ID (613,14,0)   End of file block 77 / Allocated 80

Virtual block number 58 (0000003A), 512 (0200) bytes

 68742072 6F662072 6562606D 75 6E206120 65707954 00797274 6E652D68 63746142 Batch-entry.Type a number for th 000000
 652D6863 74614220 79746974 6E450065 6D756C6F 76206465 74636570 78652065 e expected volume.Entity Batch-e 000020
 6C206562 20746F6E 6E616320 656D756C 6F762064 65746365 70784500 7972746E ntry.Expected volume cannot be l 000040
 6F666E69 00797469 746E6520 65746165 7243006F 72657A20 6E616874 20737365 ess than zero.Create entity.info 000060
 72747461 20657461 64705500 79746974 6E65006C 65646F6D 206E6F69 74616D72 rmation model.entity.Update attr 000080
 62697274 74410073 2?006574 75626972 74746120 65746165 72430065 74756269 ibute.Create attribute.%s.Attrib 0000A0
 72747461 20726F66 2?736E6F 6974704F 00797274 6E652D68 63746142 20657475 ute Batch-entry.Options for attr 0000C0
 7972746E 652D6863 74614220 65747562 69727474 4100656D 616E2065 74756269 ibute name.Attribute Batch-entry 0000E0
 72747441 00656D61 6E206E6F 69736E65 6D696420 726F6620 736E6F69 74704F00 .Options for dimension name.Attr 000100
 6F642072 6F662073 6E6F6974 704F0079 72746E65 2D686374 61422065 74756269 ibute Batch-entry.Options for do 000120
 00797274 6E652D68 63746142 20657475 62697274 74410065 6D616E20 6E69616D main name.Attribute Batch-entry. 000140
 61206574 61647055 0021656C 62616C69 61766120 74657920 746F6E20 706C6548 Help not yet available!.Update a 000160
 7469746E 65006C65 646F6D20 6E6F6974 6160726F 666E6900 65747562 69727474 ttribute.information model.entit 000180
 65687420 726F6620 656D616E 20612065 70795400 31000000 00000000 73250079 y.%s.......1.Type a name for the 0001A0
 72746E65 2D686374 61422065 74756269 72747441 002E6574 75626972 74746120  attribute..Attribute Batch-entr 0001C0
 2064696C 61766E49 00797274 6E652D68 63746142 20657475 62697274 74410079 y.Attribute Batch-entry.Invalid  0001E0

Dump of file SATURN:[PCCOMMON.DUMP.DLL]DASHORT.TMP;1 on 18-APR-1990 10:43:15.93
File ID (613,14,0)   End of file block 77 / Allocated 80

Virtual block number 59 (0000003B), 512 (0200) bytes

 6D206C6F 626D7973 206C6167 656C6C69 2820656D 616E2065 74756269 72747461 attribute name (illegal symbol m 000000
 746E652D 68637461 42206574 75626972 74744100 2E296465 73752065 62207961 ay be used)..Attribute Batch-ent 000020
 62206574 75626974 74612073 61682079 64616572 6C612079 7469746E 45007972 ry.Entity already has attibute b 000040
 72746E65 2D686374 61422065 74756269 72747441 00656D61 6E207369 68742079 y this name.Attribute Batch-entr 000060
 20736168 20796461 65726C61 206C6564 6F4D206E 6F697461 6D726F66 6E490079 y.Information Model already has  000080
 69727474 4100656D 616E2073 69687420 79622065 74756269 74746120 65657266 free attibute by this name.Attri 0000A0
 68637461 42206574 75626972 74744100 7972746E 652D6863 74614220 65747562 bute Batch-entry.Attribute Batch 0000C0
 75626974 74612073 61682079 64616572 6C612079 7469746E 45007972 746E652D -entry.Entity already has attibu 0000E0
 2D686374 61422065 74756269 72747441 00656D61 6E207369 68742079 62206574 te by this name.Attribute Batch- 000100
 20796461 65726C61 206C6564 6F4D206E 6F697461 6D726F66 6E490079 72746E65 entry.Information Model already  000120
 4100656D 616E2073 69687420 79622065 74756269 74746120 65657266 20736168 has free attibute by this name.A 000140
 6972656D 756E2079 6C6E4F00 7972746E 652D6863 74614220 65747562 69727474 ttribute Batch-entry.Only numeri 000160
 20646574 63657078 4520726F 66206465 776F6C6C 61207365 756C6176 206C6163 cal values allowed for Expected  000180
 42207974 69746E45 00657475 62697274 74612065 74616572 43006874 676E656C length.Create attribute.Entity B 0001A0
 74612072 65746361 72616863 20656E6F 20796C6E 4F007972 746E652D 68637461 atch-entry.Only one character at 0001C0
 74614220 79746974 6E45002E 6465776F 6C6C6120 656D616E 20657475 62697274 tribute name allowed..Entity Bat 0001E0
```

```
Dump of file SATURN:[PCCOMMON.DUMP.DLL]DASHORT.TMP;1 on 18-APR-1990 10:43:15.93
File ID (613,14,0)   End of file block 77 / Allocated 80

Virtual block number 60 (0000003C), 512 (0200) bytes

73616D20 726F6620 676E6F6C 206F6F74 20687467 6E654C00 7972746E 65206863 ch-entry.Length too long for mas 000000
63746142 20797469 746E4500 2E656D61 6E206574 75626972 74746120 676E6968 king attribute name..Entity Batc 000020
62202C64 6C656966 20676E69 6B73616D 2064696C 61766E49 00797274 6E652068 h-entry.Invalid masking field, b 000040
20797469 746E4500 64657375 20657261 20273F27 20646E61 20272A27 2068746F oth '*' and '?' are used.Entity  000060
6C656966 20676E69 6B73616D 2064696C 61766E49 00797274 6E652068 63746142 Batch-entry.Invalid masking fiel 000080
73616D20 64696C61 766E4900 7972746E 65206863 74614220 79746974 6E450064 d.Entity Batch-entry.Invalid mas 0000A0
74610079 72746E65 2D686374 61422079 7469746E 4500646C 65696620 676E6968 king field.Entity Batch-entry.at 0000C0
61607369 6020273F 2720646E 6120646C 65696620 6560616E 20657475 62697274 tribute name field and '?' misma 0000E0
20202020 20202020 20202028 28282828 20202020 20202020 20000064 65686374 tched..        (((((            000100
84848484 84848484 84101010 10101010 10101010 10101010 48202020 20202020       H......................... 000120
01010101 01010101 01010101 01010101 01018181 81818181 10101010 10101084 ................................ 000140
02020202 02020202 02020202 02020202 02028282 82828282 10101010 10100101 ................................ 000160
00000000 00000000 00000000 00000000 00000000 00000000 00201010 10100202 ...... ......................... 000180
00000000 00000000 00000000 00000000 00000000 00000000 00000000 00000000 ................................ 0001A0
00000000 00000000 00000000 00000000 00000000 00000000 00000000 00000000 ................................ 0001C0
00000000 00000000 00000000 00000000 00000000 00000000 00000000 00000000 ................................ 0001E0

Dump of file SATURN:[PCCOMMON.DUMP.DLL]DASHORT.TMP;1 on 18-APR-1990 10:43:15.93
File ID (613,14,0)   End of file block 77 / Allocated 80

Virtual block number 61 (0000003D), 512 (0200) bytes

00000000 00002320 202B0029 6C6C756E 2800296C 6C756E28 00000000 00000000 ........(null).(null).+- #...... 000000
00000000 00000000 00000000 00000000 00000000 0000217A 23F0136F 23F023F0 p#b#o.p#z!...................... 000020
00000000 00000000 00000000 00000000 00000000 00000000 00000000 00000000 ................................ 000040
00000000 00000000 00000000 00000000 00000000 00000000 00000000 00000000 ................................ 000060
00000000 00000000 00000000 00000000 00000000 00000000 00000000 00000000 ................................ 000080
00000000 00000000 00000000 00000000 00000000 00000000 00000000 0C000000 ................................ 0000A0
00000000 00000000 00000000 00000000 00000000 00000000 00000000 00000000 ................................ 0000C0
00000000 00000000 00000000 00000000 00000000 00000000 00000000 00000000 ................................ 0000E0
00000000 00000000 00000000 00000000 00000000 00000000 00000000 00000000 ................................ 000100
00000000 00000000 00000000 00000000 00000000 00000000 00000000 00000000 ................................ 000120
00000000 00000000 00000000 00000000 00000000 00000000 00000000 00000000 ................................ 000140
00000000 00000000 00000000 00000000 00000000 00000000 00000000 00000000 ................................ 000160
00000000 00000000 00000000 00000000 00000000 00000000 00000000 00000000 ................................ 000180
00000000 00000000 00000000 00000000 00000000 00000000 00000000 00000000 ................................ 0001A0
00000000 00000000 00000000 00000000 00000000 00000000 00000000 00000000 ................................ 0001C0
00000000 00000000 00000000 00000000 00000000 00000000 00000000 00000000 ................................ 0001E0

Dump of file SATURN:[PCCOMMON.DUMP.DLL]DASHORT.TMP;1 on 18-APR-1990 10:43:15.93
File ID (613,14,0)   End of file block 77 / Allocated 80

Virtual block number 62 (0000003E), 512 (0200) bytes

00000000 00000000 00000000 00000000 00000000 00000000 00000000 00000000 ................................ 000000
00000000 00000000 00000000 00000000 00000000 00000000 00000000 00000000 ................................ 000020
00000000 00000000 00000000 00000000 00000000 00000000 00000000 00000000 ................................ 000040
00000000 00000000 00000000 00000000 00000000 00000000 00000000 00000000 ................................ 000060
00000000 00000000 00000000 00000000 00000000 00000000 00000000 00000000 ................................ 000080
00000000 00000000 00000000 00000000 00000000 00000000 00000000 00000000 ................................ 0000A0
00000000 00000000 00000000 00000000 00000000 00000000 00000000 00000000 ................................ 0000C0
00000000 00000000 00000000 00000000 00000000 00000000 00000000 00000000 ................................ 0000E0
00000000 00000000 00000000 00000000 00000000 00000000 00000000 00000000 ................................ 000100
00000000 00000000 00000000 00000000 00000000 00000000 00000000 00000000 ................................ 000120
00000000 00000000 00000000 00000000 00000000 00000000 00000000 00000000 ................................ 000140
00000000 00000000 00000000 00000000 00000000 00000000 00000000 00000000 ................................ 000160
00000000 00000000 00000000 00000000 00000000 00000000 00000000 00000000 ................................ 000180
00000000 00000000 00000000 00000000 00000000 00000000 00000000 00000000 ................................ 0001A0
00000000 00000000 00000000 00000000 00000000 00000000 00000000 00000000 ................................ 0001C0
00000000 00000000 00000000 00000000 00000000 00000000 00000000 00000000 ................................ 0001E0
```

```
Dump of file SATURN:[PCCOMMON.DUMP.DLL]DASHORT.TMP;1 on 18-APR-1990 10:43:15.93
File ID (613,14,0)   End of file block 77 / Allocated 80

Virtual block number 63 (0000003F), 512 (0200) bytes

00000000 00000000 00000000 00000000 00000000 00000000 00000000 00000000 ................................ 000000
14BAFFFF 14BA0000 00000030 4F464E49 5F454C49 465F435F 09060000 00000000 ........C_FILE_INFO=.....ü...ü. 000020
00000042 00000200 FFFFFFFF 01010000 00000028 14BA0024 14BA0020 14BA001C ..ü. .ü.$.ü.(...............B... 000040
00000202 00000000 00000000 00000102 00000000 00000000 00000001 21780000 ..x!............................ 000060
00000000 00000000 00000000 00000000 00000000 00000000 00000000 00000000 ................................ 000080
00000000 00000000 00000000 00000000 00000000 00000000 00000000 00000000 ................................ 0000A0
00000000 00000000 00000000 00000000 00000000 00000000 00000000 00000000 ................................ 0000C0
00000000 00000000 00000000 00000000 00000000 00000000 00000000 00000000 ................................ 0000E0
00000000 00000000 00000000 00000000 00000000 00000000 00000000 00000000 ................................ 000100
00000000 00000000 00000000 00000000 00000000 00000000 00000000 00000000 ................................ 000120
00000000 00000000 00000000 00000000 00000000 00000000 00000000 00000000 ................................ 000140
00000000 00000000 00000000 00000000 00000000 00000000 00000000 00000000 ................................ 000160
00000000 00000000 00000000 00000000 00000000 00000000 00000000 00000000 ................................ 000180
00000000 00000000 00000000 00000000 00000000 00000000 00000000 00000000 ................................ 0001A0
00000000 00000000 00000000 00000000 00000000 00000000 00000000 00000000 ................................ 0001C0
00000000 00000000 00000000 00000000 00000000 00000000 00000000 00000000 ................................ 0001E0

Dump of file SATURN:[PCCOMMON.DUMP.DLL]DASHORT.TMP;1 on 18-APR-1990 10:43:15.93
File ID (613,14,0)   End of file block 77 / Allocated 80

Virtual block number 64 (00000040), 512 (0200) bytes

00000000 00000000 00000000 00000000 00000000 00000000 00000000 00000000 ................................ 000000
00000000 00000000 00000000 00000000 00000000 00000000 00000000 00000000 ................................ 000020
00000000 00000000 00000000 00000000 00000000 00000000 00000000 00000000 ................................ 000040
00000000 00000000 00000000 00000000 00000000 00000000 00000000 00000000 ................................ 000060
00000000 00000000 00000000 00000000 00000000 00000000 00000000 00000000 ................................ 000080
00000000 00000000 00000000 00000000 00000000 00000000 00000000 00000000 ................................ 0000A0
00000000 00000000 00000000 00000000 00000000 00000000 00000000 00000000 ................................ 0000C0
00000000 00000000 00000000 00000000 00000000 00000000 00000000 00000000 ................................ 0000E0
00000000 00000000 00000000 00000000 00000000 00000000 00000000 00000000 ................................ 000100
00000000 00000000 00000000 00000000 00000000 00000000 00000000 00000000 ................................ 000120
00000000 00000000 00000000 00000000 00000000 00000000 00000000 00000000 ................................ 000140
00000000 00000000 00000000 00000000 00000000 00000000 00000000 00000000 ................................ 000160
00000000 00000000 00000000 00000000 00000000 00000000 00000000 00000000 ................................ 000180
00000000 00000000 00000000 00000000 00000000 00000000 00000000 00000000 ................................ 0001A0
00000000 00000000 00000000 00000000 00000000 00000000 00000000 00000000 ................................ 0001C0
00000000 00000000 00000000 00000000 00000000 00000000 00000000 00000000 ................................ 0001E0

Dump of file SATURN:[PCCOMMON.DUMP.DLL]DASHORT.TMP;1 on 18-APR-1990 10:43:15.93
File ID (613,14,0)   End of file block 77 / Allocated 80

Virtual block number 65 (00000041), 512 (0200) bytes

00000000 00000000 00000000 00000000 00000000 00000000 00000000 00000000 ................................ 000000
00000000 00000000 00000000 00000000 00000000 00000000 00000000 00000000 ................................ 000020
00000000 00000000 00000000 00000000 00000000 00000000 00000000 00000000 ................................ 000040
00000000 00000000 00000000 00000000 00000000 00000000 00000000 00000000 ................................ 000060
00000000 00000000 00000000 00000000 00000000 00000000 00000000 00000000 ................................ 000080
00000000 00000000 00000000 00000000 00000000 00000000 00000000 00000000 ................................ 0000A0
00000000 00000000 00000000 00000000 00000000 00000000 00000000 00000000 ................................ 0000C0
00000000 00000000 00000000 00000000 00000000 00000000 00000000 00000000 ................................ 0000E0
00000000 00000000 00000000 00000000 00000000 00000000 00000000 00000000 ................................ 000100
00000000 00000000 00000000 00000000 00000000 00000000 00000000 00000000 ................................ 000120
00000000 00000000 00000000 00000000 00000000 00000000 00000000 00000000 ................................ 000140
00000000 00000000 00000000 00000000 00000000 00000000 00000000 00000000 ................................ 000160
00000000 00000000 00000000 00000000 00000000 00000000 00000000 00000000 ................................ 000180
00000000 00000000 00000000 00000000 00000000 00000000 00000000 00000000 ................................ 0001A0
00000000 00000000 00000000 00000000 00000000 00000000 00000000 00000000 ................................ 0001C0
00000000 00000000 00000000 00000000 00000000 00000000 00000000 00000000 ................................ 0001E0
```

```
Dump of file SATURN:' CCOMMON.DUMP.DLL]DASHORT.TMP;1 on 18-APR-1990 10:43:15.93
File ID (613,14,0)   End of file block 77 / Allocated 80

Virtual block number 66 (00000042), 512 (0200) bytes

00000000 00000000 00000000 00000000 00000000 00000000 00000000 00000000 ................................ 000000
00000000 00000000 00000000 00000000 00000000 00000000 00000000 00000000 ................................ 000020
00000000 00000000 00000000 00000000 00000000 00000000 00000000 00000000 ................................ 000040
00000000 00000000 00000000 00000000 00000000 00000000 00000000 00000000 ................................ 000060
00000000 00000000 00000000 00000000 00000000 00000000 00000000 00000000 ................................ 000080
00000000 00000000 00000000 00000000 00000000 00000000 00000000 00000000 ................................ 0000A0
00000000 00000000 00000000 00000000 00000000 00000000 00000000 00000000 ................................ 0000C0
00000000 00000000 00000000 00000000 00000000 00000000 00000000 00000000 ................................ 0000E0
00000000 00000000 00000000 00000000 00000000 00000000 00000000 00000000 ................................ 000100
00000000 00000000 00000000 00000000 00000000 00000000 00000000 00000000 ................................ 000120
00000000 00000000 00000000 00000000 00000000 00000000 00000000 00000000 ................................ 000140
00000000 00000000 00000000 00000000 00000000 00000000 00000000 00000000 ................................ 000160
00000000 00000000 00000000 00000000 00000000 00000000 00000000 00000000 ................................ 000180
00000000 00000000 00000000 00000000 00000000 00000000 00000000 00000000 ................................ 0001A0
00000000 00000000 00000000 00000000 00000000 00000000 00000000 00000000 ................................ 0001C0
00000000 00000000 00000000 00000000 00000000 00000000 00000000 00000000 ................................ 0001E0

Dump of file SATURN:[PCCOMMON.DUMP.DLL]DASHORT.TMP;1 on 18-APR-1990 10:43:15.93
File ID (613,14,0)   End of file block 77 / Allocated 80

Virtual block number 67 (00000043), 512 (0200) bytes

00000000 00000000 00000000 00000000 00000000 00000000 00000000 00000000 ................................ 000000
00000000 00000000 00000000 00000000 00000000 00000000 00000000 00000000 ................................ 000020
00000000 00000000 00000000 00000000 00000000 00000000 00000000 00000000 ................................ 000040
00000000 00000000 00000000 00000000 00000000 00000000 00000000 00000000 ................................ 000060
00000000 00000000 00000000 00000000 00000000 00000000 00000000 00000000 ................................ 000080
00000000 00000000 00000000 00000000 00000000 00000000 00000000 00000000 ................................ 0000A0
00000000 00000000 00000000 00000000 00000000 00000000 00000000 00000000 ................................ 0000C0
00000000 00000000 00000000 00000000 00000000 00000000 00000000 00000000 ................................ 0000E0
00000000 00000000 00000000 00000000 00000000 00000000 00000000 00000000 ................................ 000100
00000000 00000000 00000000 00000000 00000000 00000000 00000000 00000000 ................................ 000120
00000000 00000000 00000000 00000000 00000000 00000000 00000000 00000000 ................................ 000140
00000000 00000000 00000000 00000000 00000000 00000000 00000000 00000000 ................................ 000160
00000000 00000000 00000000 00000000 00000000 00000000 00000000 00000000 ................................ 000180
00000000 00000000 00000000 00000000 00000000 00000000 00000000 00000000 ................................ 0001A0
00000000 00000000 00000000 00000000 00000000 00000000 00000000 00000000 ................................ 0001C0
00000000 00000000 00000000 00000000 00000000 00000000 00000000 00000000 ................................ 0001E0

Dump of file SATURN:[PCCOMMON.DUMP.DLL]DASHORT.TMP;1 on 18-APR-1990 10:43:15.93
File ID (613,14,0)   End of file block 77 / Allocated 80

Virtual block number 68 (00000044), 512 (0200) bytes

00000000 00000000 00000000 00000000 00000000 00000000 00000000 00000000 ................................ 000000
00000000 00000000 00000000 00000000 00000000 00000000 00000000 00000000 ................................ 000020
00000000 00000000 00000000 00000000 00000000 00000000 00000000 00000000 ................................ 000040
00000000 00000000 00000000 00000000 00000000 00000000 00000000 00000000 ................................ 000060
00000000 00000000 00000000 00000000 00000000 00000000 00000000 00000000 ................................ 000080
00000000 00000000 00000000 00000000 00000000 00000000 00000000 00000000 ................................ 0000A0
00000000 00000000 00000000 00000000 00000000 00000000 00000000 00000000 ................................ 0000C0
00000000 00000000 00000000 00000000 00000000 00000000 00000000 00000000 ................................ 0000E0
00000000 00000000 00000000 00000000 00000000 00000000 00000000 00000000 ................................ 000100
00000000 00000000 00000000 00000000 00000000 00000000 00000000 00000000 ................................ 000120
00000000 00000000 00000000 00000000 00000000 00000000 00000000 00000000 ................................ 000140
00000000 00000000 00000000 00000000 00000000 00000000 00000000 00000000 ................................ 000160
00000000 00000000 00000000 00000000 00000000 00000000 00000000 00000000 ................................ 000180
00000000 00000000 00000000 00000000 00000000 00000000 00000000 00000000 ................................ 0001A0
00000000 00000000 00000000 00000000 00000000 00000000 00000000 00000000 ................................ 0001C0
00000000 00000000 00000000 00000000 00000000 00000000 00000000 00000000 ................................ 0001E0
```

```
Dump of file SATURN:[PCCOMMON.DUMP.DLL]DASHORT.TMP;1 on 18-APR-1990 10:43:15.93
File ID (613,14,0)   End of file block 77 / Allocated 80

Virtual block number 69 (00000045), 512 (0200) bytes

00000000 00000000 00000000 00000000 00000000 00000000 00000000 00000000 ................................ 000000
00000000 00000000 00000000 00000000 00000000 00000000 00000000 00000000 ................................ 000020
00000000 00000000 00000000 00000200 00010000 00000000 00000000 00000000 ................................ 000040
00000000 00000000 00000000 00000000 00000000 00000000 00000000 00000000 ................................ 000060
00000000 00000000 00000000 00000000 00000000 00000000 00000000 00000000 ................................ 000080
00000000 00000000 00000000 00000000 00000000 00000000 00000000 00000000 ................................ 0000A0
00000000 00000000 00000000 00000000 00000000 00000000 00000000 00000000 ................................ 0000C0
00000000 00000000 00000000 00000000 00000000 00000000 00000000 00000000 ................................ 0000E0
00000000 00000000 00000000 00000000 00000000 00000000 00000000 00000000 ................................ 000100
00000000 00000000 00000000 00000000 00000000 00000000 00000000 00000000 ................................ 000120
00000000 00000000 00000000 00000000 00000000 00000000 00000000 00000000 ................................ 000140
00000000 00000000 00000000 00000000 00000000 00000000 00000000 00000000 ................................ 000160
00000000 00000000 00000000 00000000 00000000 00000000 00000000 00000000 ................................ 000180
00000000 00000000 00000000 00000000 00000000 00000000 00000000 00000000 ................................ 0001A0
00000000 00000000 00000000 00000000 00000000 00000000 00000000 00000000 ................................ 0001C0
00000000 00000000 00000000 00000000 00000000 00000000 00000000 00000000 ................................ 0001E0

Dump of file SATURN:[PCCOMMON.DUMP.DLL]DASHORT.TMP;1 on 18-APR-1990 10:43:15.93
File ID (613,14,0)   End of file block 77 / Allocated 80

Virtual block number 70 (00000046), 512 (0200) bytes

00000000 00000000 00000000 00000000 00000000 00000000 00000000 00000000 ................................ 000000
00000000 00000000 00000000 00000000 00000000 00000000 00000000 00000000 ................................ 000020
00000000 00000000 00000000 00000000 00000000 00000000 00000000 00000000 ................................ 000040
00000000 00000000 00000000 00000000 00000000 00000000 00000000 00000000 ................................ 000060
00000000 00000000 00000000 00000000 00000000 00000000 00000000 00000000 ................................ 000080
00000000 00000000 00000000 00000000 00000000 00000000 00000000 00000000 ................................ 0000A0
00000000 00000000 00000000 00000000 00000000 00000000 00000000 00000000 ................................ 0000C0
00000000 00000000 00000000 00000000 00000000 00000000 00000000 00000000 ................................ 0000E0
00000000 00000000 00000000 00000000 00000000 00000000 00000000 00000000 ................................ 000100
00000000 00000000 00000000 00000000 00000000 00000000 00000000 00000000 ................................ 000120
00000000 00000000 00000000 00000000 00000000 00000000 00000000 00000000 ................................ 000140
00000000 00000000 00000000 00000000 00000000 00000000 00000000 00000000 ................................ 000160
00000000 00000000 00000000 00000000 00000000 00000000 00000000 00000000 ................................ 000180
00000000 00000000 00000000 00000000 00000000 00000000 00000000 00000000 ................................ 0001A0
00000000 00000000 00000000 00000000 00000000 00000000 00000000 00000000 ................................ 0001C0
00000000 00000000 00000000 00000000 00000000 00000000 00000000 00000000 ................................ 0001E0

Dump of file SATURN:[PCCOMMON.DUMP.DLL]DASHORT.TMP;1 on 18-APR-1990 10:43:15.93
File ID (613,14,0)   End of file block 77 / Allocated 80

Virtual block number 71 (00000047), 512 (0200) bytes

00000000 00000000 00000000 00000000 00000000 00000000 00000000 00000000 ................................ 000000
00000000 00000000 00000000 00000000 00000000 00000000 00000000 00000000 ................................ 000020
00000000 00000000 00000000 00000000 00000000 00000000 00000000 00000000 ................................ 000040
00000000 00000000 00000000 00000000 00000000 00000000 00000000 00000000 ................................ 000060
00000000 00000000 00000000 00000000 00000000 00000000 00000000 00000000 ................................ 000080
00000000 00000000 00000000 00000000 00000000 00000000 00000000 00000000 ................................ 0000A0
00000000 00000000 00000000 00000000 00000000 00000000 00000000 00000000 ................................ 0000C0
00000000 00000000 00000000 00000000 00000000 00000000 00000000 00000000 ................................ 0000E0
00000000 00000000 00000000 00000000 00000000 00000000 00000000 00000000 ................................ 000100
00000000 00000000 00000000 00000000 00000000 00000000 00000000 00000000 ................................ 000120
00000000 00000000 00000000 00000000 00000000 00000000 00000000 00000000 ................................ 000140
00000000 00000000 00000000 00000000 00000000 00000000 00000000 00000000 ................................ 000160
00000000 00000000 00000000 00000000 00000000 00000000 00000000 00000000 ................................ 000180
00000000 00000000 00000000 00000000 00000000 00000000 00000000 00000000 ................................ 0001A0
00000000 00000000 00000000 00000000 00000000 00000000 00000000 00000000 ................................ 0001C0
00000000 00000000 00000000 00000000 00000000 00000000 00000000 00000000 ................................ 0001E0
```

```
Dump of file SATURN:[PCCOMMON.DUMP.DLL]DASHORT.TMP;1 on 18-APR-1990 10:43:15.93
File ID (613,14,0)   End of file block 77 / Allocated 80

Virtual block number 72 (00000048), 512 (0200) bytes

00000000 00000000 00000000 00000000 00000000 00000000 00000000 00000000 ................................ 000000
00000000 00000000 00000000 00000000 00000000 00000000 00000000 00000000 ................................ 000020
81010000 00010000 00000000 00000000 00000000 09081922 00000000 00000000 ........"....................... 000040
00000000 00000000 00000000 00000000 00000000 00000000 00000000 00008181 ................................ 000060
00000000 00000000 00000000 00000000 00000000 00000000 00000000 00000000 ................................ 000080
00000000 00000000 00000000 00000000 00000000 00000000 00000000 00000000 ................................ 0000A0
00000000 00000000 00000000 00000000 00000000 00000000 00000000 00000000 ................................ 0000C0
00000000 00000000 00000000 00000000 00000000 00000000 00000000 00000000 ................................ 0000E0
00000000 00000000 00000000 00000000 00000000 00000000 00000000 00000000 ................................ 000100
00000000 00000000 00000000 00000000 00000000 00000000 00000000 00000000 ................................ 000120
00000000 00000000 00000000 00000000 00000000 00000000 00000000 00000000 ................................ 000140
0A000000 00000000 00000000 00000000 00000000 00000000 00000000 00000000 ................................ 000160
0A0A0A0A 0A0A0A0A 0A0A0A0A 0A0A0A0A 0A0A0A0A 0A0A0A0A 0A0A0A0A 0A0A0A0A ................................ 000180
0A0A0A0A 0A0A0A0A 0A0A0A0A 0A0A0A0A 0A0A0A0A 0A0A0A0A 0A0A0A0A 0A0A0A0A ................................ 0001A0
0A0A0A0A 0A0A0A0A 0A0A0A0A 0A0A0A0A 0A0A0A0A 0A0A0A0A 0A0A0A0A 0A0A0A0A ................................ 0001C0
0A0A0A0A 0A0A0A0A 0A0A0A0A 0A0A0A0A 0A0A0A0A 0A0A0A0A 0A0A0A0A 0A0A0A0A ................................ 0001E0

Dump of file SATURN:[PCCOMMON.DUMP.DLL]DASHORT.TMP;1 on 18-APR-1990 10:43:15.93
File ID (613,14,0)   End of file block 77 / Allocated 80

Virtual block number 73 (00000049), 512 (0200) bytes

0A0A0A0A 0A0A0A0A 0A0A0A0A 0A0A0A0A 0A0A0A0A 0A0A0A0A 0A0A0A0A 0A0A0A0A ................................ 000000
0A0A0A0A 0A0A0A0A 0A0A0A0A 0A0A0A0A 0A0A0A0A 0A0A0A0A 0A0A0A0A 0A0A0A0A ................................ 000020
000A0A0A 0A0A0A0A 0A0A0A0A 0A0A0A0A 0A0A0A0A 0A0A0A0A 0A0A0A0A 0A0A0A0A ................................ 000040
00000000 00000000 00000000 00000000 00000000 00000000 00000000 00000000 ................................ 000060
00000000 00000000 00000000 00000000 00000000 00000000 00000000 20000000 ... ..................¥.,.....<<MM 000080
4D4E3C3C FFFFFFFF 002C168C 00000000 00000000 00000000 00000000 3E3E4753 SG>>..R6000..- stack overflow... 0000A0
000A0D77 6F6C6672 65766F20 68636174 73202D0A 00303030 36520000 3E3E4753 ..R6003..- integer divide by 0.. 0000C0
0A0D3020 79622065 64697669 64207265 6765746E 69202D0A 00333030 36520003 ...R6008..- not enough space for 0000E0
726F6620 65636170 73206867 756F6E65 20746F6E 20200A00 38303036 52000800  arguments.....R6009..- not enou 000100
756F6E65 20746F6E 20200A00 39303036 52000900 0A007374 6E656075 67726120 gh space for environment...*.... 000120
000A0000 FC000A0D 746E6560 6E6F7269 766E6520 726F6620 65636170 73206867 ..run-time error ...R6002..- flo 000140
6F6C6620 20DA0032 30303652 00020020 726F7272 65206560 6974206E 757200FF ating point not loaded.......... 000160
00020003 FFFFFF00 0A0D6465 64616F6C 20746F6E 20746E69 6F702067 6E697461 vl......<.......*............... 000180
00000000 00000000 00000000 00091F2A 00020000 0008003C 00020000 00072176 è...R.....................*.....w. 0001A0
00771400 0890022A 000E0001 00000011 00000000 FFFF0001 000E0352 000002C1 Ä.%...¶...9...........=......... 0001C0
00870005 80010001 02300005 00050000 00000000 0239FFFF 01F4009A 0125FFD8 ......................C.....V...à. 0001E0
00C80089 00568002 00080243 00000006 00000000 0000FFFF FFFF0190 0008001C

Dump of file SATURN:[FCCOMMON.DUMP.DLL]DASHORT.TMP;1 on 18-APR-1990 10:43:15.93
File ID (613,14,0)   End of file block 77 / Allocated 80

Virtual block number 74 (0000004A), 512 (0200) bytes

0008003B 00780005 80010001 0244000C 00050000 00000000 FFFFFFFF 01910008 ..................D.......x.;... 000000
01F90008 00C8007A 00568002 000C0251 00000006 00000000 0000FFFF FFFF01FB «...............Q.....V.z.à...*. 000020
FFFF01FD 00080034 00690005 80010001 0252000C 00050000 00000000 FFFFFFFF ..............R.......i.4...»... 000040
FFFFFFFF 01FF0008 00C8006B 00568002 000C025F 00000006 00000000 0000FFFF ..........._.....V.k.à.......... 000060
0000FFFF FFFF016F 0008002E 005A0005 80010001 0260000A 00050000 00000000 ..........`.......Z.....o....... 000080
00000000 FFFFFFFF 01700008 00C8005C 00568002 000C026B 00000006 00000000 ........k.....V.\.à...p......... 0000A0
00000000 0000FFFF FFFF0107 0008004E 00480005 80010001 026C0010 00050000 ......l.......K.N............... 0000C0
00050000 00000000 FFFFFFFF 02080008 0036004D 00568002 0008027D 00000006 ....).....V.M.6................. 0000E0
00000007 00000000 0000FFFF FFFF0228 000800C8 00380054 80010001 027E001E ..~.....T.;.à...+............... 000100
029E0005 00030000 00000000 FFFFFFFF 02290020 00CC0019 00548002 00000290 ......T...ä. .)................. 000120
000002A4 00030003 00000000 0000FFFF FFFF022F 000C0026 0005004B 80030000 ....K...&.../...............É... 000140
80020000 02A8000C 00030000 00000000 FFFFFFFF 022D000C 00260005 001B8002 ......&...-..................... 000160
00858002 000002B5 00060003 00000000 0000FFFF FFFF0233 000C0030 0005007B (...0...3...............Ç.....Ç. 000180
000500E5 80020000 02BC0004 00030000 00000000 FFFFFFFF 0237000C 00260005 ..&...7...............¥.....1... 0001A0
73614D00 00000300 20797469 746E6520 65746165 7243FFFF FFFF0231 000C0026 &...1.....Create entity .....Mas 0001C0
00003A6E 6F697470 69726373 65440000 3A656D61 6E207974 69746E45 00003A6B k:..Entity name:..Description:.. 0001E0
```

```
Dump of file SATURN:[PCCOMMON.DUMP.DLL]DASHORT.TMP;1 on 18-APR-1990 10:43:15.93
File ID (613,14,0)   End of file block 77 / Allocated 80

Virtual block number 75 (0000004B), 512 (0200) bytes

 6E450000 3A656075 6C6F7620 64657463 65707845 00003A65 70797472 65707553 Supertype:..Expected volume:..En 000000
 70410000 29656075 6C6F7620 64657463 65707865 2C656061 6E287365 69746974 tities(name,expected volume)..Ap 000020
 706C6548 006C6563 6E614300 2E2E2E72 74746120 6464417E 00484F7E 00796C70 ply.-OK.-Add attr....Cancel.Help 000040
 00000000 FFFF0001 000E0352 000003B5 00000000 00000000 00000000 00000000 ................ç...R........... 000060
 00000000 030DFFFF 025800C5 00FAFFC2 00801400 019002FC 00100001 00000018 ........•.......ô.ª.é.X......... 000080
 00000000 0000FFFF FFFF02CE 0008001C 00B10005 80010001 03110005 00050000 ..............Ÿ.....ö........... 0000A0
 00050000 00000000 FFFFFFFF 02CF0008 00A400B3 00518002 00080317 00000006 ..........Q.°.Ê...ü............. 0000C0
 00000006 00000000 0000FFFF FFFF025D 00080042 00A20005 80010001 0318000F ..........Å.B...]............... 0000E0
 0329000C 00050000 00000000 FFFFFFFF 02630008 00A400A4 00518002 000C0328 (.....Q.Ê.Ê...c................). 000100
 000C0336 00000006 00000000 0000FFFF FFFF02BC 00080036 00930005 80010001 ........6...¥...............6... 000120
 80000002 03370009 00050000 00000000 FFFFFFFF 02800008 00A40095 00518002 ..Q...Ê...§...............7..... 000140
 00058001 00010341 00070005 00000000 0000FFFF FFFF02D3 002200F0 00480005 ..K.Þ.".£...............A....... 000160
 00860051 8002000C 03490000 00060000 00000000 FFFFFFFF 02710008 00240084 ..$...q...............I.....Q... 000180
 0036005A 000F8003 0004034A 000A0003 00000000 0000FFFF FFFF0273 000800A2 Å...s...............J.......Z.6. 0001A0
 00080028 005A0050 80020004 03550006 00030000 00000000 FFFFFFFF 02900008 ...................U.....P.Z.(... 0001C0
 029F0008 0034005A 00818002 0004035C 00080003 00000000 0000FFFF FFFF02A7 I................\.......Z.4..... 0001E0

Dump of file SATURN:[PCCOMMON.DUMP.DLL]DASHORT.TMP;1 on 18-APR-1990 10:43:15.93
File ID (613,14,0)   End of file block 77 / Allocated 80

Virtual block number 76 (0000004C), 512 (0200) bytes

 FFFF02A3 00080032 004E000F 80020004 03650008 00030000 00000000 FFFFFFFF ..............e.......N.2...Ê... 000000
 FFFFFFFF 02A10008 0020004E 00508002 0004036E 00050003 00000000 0000FFFF ............n.....P.N. ...Å..... 000020
 0000FFFF FFFF02A5 00080028 004E0081 80020004 03740006 00030000 00000000 ..........t.......N.(...Ê....... 000040
 00000000 FFFFFFFF 02A90008 0024005A 00888002 0004037B 00050003 00000000 ........(.....¡.Z.$...`......... 000060
 00000000 0000FFFF FFFF02D1 0008004C 00750005 80010001 03810010 00050000 ..............u.L...1........... 000080
 00050000 00000000 FFFFFFFF 02D20008 00270077 00518002 00080392 00000006 ..........Q.w.'...®............. 0000A0
 00000007 00000000 0000FFFF FFFF02C8 00080036 00380005 80010001 0393000A ..........;.6...ù............... 0000C0
 039F0005 00030000 00000000 FFFFFFFF 02CC0020 00F00019 00058002 0000039E ..........Þ. .ê................. 0000E0
 000003A5 00030003 00000000 0000FFFF FFFF02BE 000C0026 00050052 80030400 ....R...&...ƒ...............Ê... 000100
 80020000 03A90006 00030000 00000000 FFFFFFFF 028F000C 00260005 00228002 .."...&...¢................`..... 000120
 00828002 000003B0 00040003 00000000 0000FFFF FFFF02C0 000C0026 00050082 ....&...à................¯.....ý. 000140
 00000300 65747562 69727474 61206574 61657243 FFFFFFFF 02C1000C 00260005 ..&...è.....Create attribute.... 000160
 70697263 73654400 003A656D 616E2065 74756269 72747441 00003A6B 73614D00 .Mask:..Attribute name:..Descrip 000180
 61726168 437E0000 3A6E6961 6D6F4400 65707974 20617461 4400003A 6E6F6974 tion:..Data type.Domain:..-Chara 0001A0
 527E006E 61656C6F 6F427E00 72656765 746E497E 006F6964 75417E00 72657463 cter.-Audio.-Integer.-Boolean.-R 0001C0
 6874676E 656C2064 65746365 70784500 656E6F4E 7E006567 61607E49 006C6165 eal.I-mage.-None.Expected length 0001E0

Dump of file SATURN:[PCCOMMON.DUMP.DLL]DASHORT.TMP;1 on 18-APR-1990 10:43:15.93
File ID (613,14,0)   End of file block 77 / Allocated 80

Virtual block number 77 (0000004D), 512 (0200) bytes

 006C6563 6E614300 484F7E00 796C7070 41000073 65747562 69727474 4100003A :..Attributes..Apply.-OK.Cancel. 000000
 00000000 FFFF0001 000E0352 0000019C 00000000 00000000 00000000 706C6548 Help................R........... 000020
 00000000 0130FFFF 01310081 0000FFF8 002F9400 0990011C 00130001 00000008 ..............¸/.½.Å...1...0..... 000040
 00000000 0000FFFF FFFF0101 00080068 0070000F 80000001 01340012 00050000 ......4.......p.h............... 000060
 00030000 00000000 FFFFFFFF 0102000A 0062005C 00298003 00040147 000E0003 ....G.....).\.b................. 000080
 000E0003 00000000 0000FFFF FFFF0103 000A0062 004C0029 80020004 01560011 ..V.....).L.b................... 0000A0
 01770011 00030000 00000000 FFFFFFFF 0104000A 0062003D 00298002 00040168 h.....).=.b...................w. 0000C0
 04000189 00060003 00000000 0000FFFF FFFF0105 000A0062 002E0029 80020004 ....)...b....................... 0000E0
 80020000 01900006 00030000 00000000 FFFFFFFF 0106000C 00260010 00108003 ......&......................... 000100
 00878002 01000197 00040003 00000000 0000FFFF FFFF0107 000C0026 00100052 R...&........................... 000120
 00657461 6470752F 65746165 72632068 63746142 FFFFFFFF 0108000C 00260010 ..&.........Batch create/update. 000140
 657E2065 74616572 43003A65 646F6D20 65676173 75206573 6F6F6843 00000003 ....Choose usage mode:.Create -e 000160
 65206574 61647055 00657475 62697274 74617E20 65746165 72430079 7469746E ntity.Create -attribute.Update e 000180
 00747065 63634100 65747562 69727474 7E612065 74616470 55007974 69746E7E -ntity.Update a-ttribute.Accept. 0001A0
 00000000 00000000 00000000 00000000 00000000 00706C65 48006C65 636E6143 Cancel.Help..................... 0001C0
 00000000 00000000 00000000 00000000 00000000 00000000 00000000 00000000 ................................ 0001E0
```

```
Dump of file SATURN:[PCCOMMON.DUMP.DLL]DA-ABOUT.DLL;1 on 18-APR-1990 10:38:45.23
File ID (408,19,0)   End of file block 4 / Allocated 4

Virtual block number 1 (00000001), 512 (0200) bytes

00000000 00000040 00000000 00000088 0000FFFF 00000004 00000004 00025A4C MZ..............|.......a....... 000000
00000080 00000000 00000000 00000000 00000000 00000000 00000000 00000000 ................................ 000020
6F6E6E61 63206061 72676F72 70207369 685421CD 4C01B821 C009B400 0EBA1F0E ..a..Ç.ef¡.Le!This program canno 000040
00000000 00000024 0A00002E 65646F6D 20534F44 206E6920 6E757220 65622074 t be run in DOS mode....$....... 000060
00030005 00000000 00020000 00000000 00038009 F1EDC936 000A015E 0505454E NE..^...6èÜp............ ....... 000080
00000000 00000000 00010001 00040000 000001E8 008F0089 006C0068 00400026 &.a.h.l.....Ò............ ...... 0000A0
00020E21 00000000 00100F21 0008005F 000F0F00 000F005D 02FA0F00 02F90021 !.'...'.]......_...|.......|... 0000C0
4454554F 42414144 0E000054 554F4241 20414408 01900004 01391EB1 01390061 a.9.Ý.9......DA-ABOUT...DAABOUTD 0000E0
49484954 470B4954 47034E49 57405005 0000A000 07000100 0002434F 5250474C LGPROC...........PMWIN.GTI.GTIKI 000100
47534D44 4E455349 54470A43 4F52504C 4F4F5446 45444954 470E4C4F 4F544C4C LLTOOL.GTIDEFTOOLPROC.GTISENDMSG 000120
49574C4F 4F545445 53495447 10574F44 4E49574C 4F4F5459 52455551 49544712 .GTIQUERYTOOLWINDOW.GTISETTOOLWI 000140
55415445 53495447 10525450 41544144 58554159 52455551 49544712 574F444E NDOW.GTIQUERYAUXDATAPTR.GTISETAU 000160
49544712 504F544B 5345444C 4F4F5459 52455551 49544713 52545041 54414458 XDATAPTR.GTIQUERYTOOLDESKTOP.GTI 000180
41454845 54414552 4340454D 0040454D 03544E45 5241504C 4F4F5459 52455551 QUERYTOOLPARENT.MEM.MEMCREATEHEA 0001A0
01024843 4F4C4243 4F4C4C41 4D454D00 50414548 594F5254 5345444D 454D0E50 P.MEMDESTROYHEAP.MEMALLOCBLOCK.. 0001C0
42414144 0F000074 756F6241 20414420 4D502032 2F534F10 00000122 03020503 ....".....OS/2 PM DA About...DAAB 0001E0

Dump of file SATURN:[PCCOMMON.DUMP.DLL]DA-ABOUT.DLL;1 on 18-APR-1990 10:38:45.23
File ID (408,19,0)   End of file block 4 / Allocated 4

Virtual block number 2 (00000002), 512 (0200) bytes

4680006A 088EFFFF 881E5657 00001AC8 00000000 01434F52 504C4F4F 5454554F OUTTOOLPROC.....à...WV.¡...Áj..F 000000
086A3C6A EC76FF00 F2E9E646 880006E9 03750000 30E64689 0000FFFF 9A5016EC š.P......F|=..u.Ò...F|Ò ..všj<j. 000020
E6468800 00FFFF9A EC76FF00 0EE90375 00003DE6 46890000 FFFF9A50 16FA4680 .F'.P......F|=..u.Ò...vš......F| 000040
E84680FE 76FF0000 FFFF9A50 16FE4680 0A76FF06 478926EC 4688FA5E C400C8E9 Òà.á^'.Fš&.G..v..F±.P......v±.FÒ 000060
76FFF876 FFF85689 F6468900 00FFFF9A 800868E8 76FFEA76 FF0000FF FF9A5016 .P......võ.vÒh........F-.V½.v½.v 000080
0000FFFF 9A006A00 6A019068 000036FF 26000606 8EFFFF68 FFFF6800 6A006AF6 -j.j.h..h......&.6..h..j.j...... 0000A0
F45689F2 46890000 FFFF9A00 6A006A00 15E90374 F04608EE 4688F056 89EE4689 .FÝ.Vþ.FÝ.Fþt.Ò..j.j.......F .V¶ 0000C0
9AEE76FF F076FF0A 76FF0257 89260789 26F0568B EE4688FA 5EC40045 E9F2468B .F ÒE.á^'.FÝ.Vþ&..&.W..v..vþ.vÝ. 0000E0
50520004 05FC568B FA4688OA 76FF0000 FFFF9AFA 76FFFC76 FF0A76FF 0000FFFF .....v..v•.v'.......v..F'.V•...RP 000100
0088088E 0008881E 56570000 04C80006 CAC95F5E 1F0000E9 00008800 00FFFF9A .....¡..Ò...^_èò..à...WV.¡...Á¡. 000120
0000FFFF 9A0676FF 0876FF00 6A1076FF 1276FF00 95E90E46 8BFE5E8C FC468900 ..F•.^±.F.Ò...v..v.j..v..v...... 000140
9A1076FF 1276FF00 00019A9A 016A1076 FF1276FF 0027E90A 4688009F E900A2E9 ÒÁ.Ò...F.Ò'..v..v.j.......v..v.. 000160
64E9FFEF E9FFD1E9 0375019A 30000BE9 000EE900 81E90000 BA0000B8 000001A5 E...¡..a..Ò..Ò..Ò..=..u.Òi.Òy.Òd 000180
E90000BA 00008800 00FFFF9A 1076FF12 76FF0000 FFFF9A01 6A1076FF 1276FF00 ..v..v.j.......v..v......¡..a..Ò 0001A0
E9002FE9 0000FFFF 9A0676FF 0876FF0A 76FF0C76 FF0E76FF 1076FF12 76FF004C L..v..v..v..v..v..v..v......Ò/.Ò 0001C0
E9037500 3B30FF69 E9037500 3030FFAF E9037500 2930FF7C E9037500 20300023 #.= .u.Ò|.=).u.ÒE.=0.u.Òi.=;.u.Ò 0001E0

Dump of file SATURN:[PCCOMMON.DUMP.DLL]DA-ABOUT.DLL;1 on 18-APR-1990 10:38:45.23
File ID (408,19,0)   End of file block 4 / Allocated 4

Virtual block number 3 (00000003), 512 (0200) bytes

8E012A8B 1E565700 000AC800 0ECAC95F 5E1F0000 E90000BA 000088FF 80E9FF4B K.Ò§.¡..a..Ò...^_èò..à...WV.¡'.. 000000
FF00C4E9 99F6468B F6468900 9600009A 0A76FF0C 76FF1076 FF00B9E9 0E46880B Á.F.Ò¿..v..v..v.......F-.F-.Òá.. 000020
016A006A 50529910 46881DAE 680477FF 26FC5EC4 0000FFFF 9A5016FC 468D1076 v..F•.P.....á^•&.w.hÙ..F..RPj.j. 000040
1076FF00 00FFFF9A F876FFFA 76FF0000 00739A50 16F84680 1076FF00 00FFFF9A ......v..F½.P.s....v'.v½......v. 000060
62E90000 BA000088 000107C7 260A5EC4 0073E900 008A0000 880000FF FF9A006A j......¡..a..Òs.á^.&ú...¡..a..Òb 000080
0000BA00 00880000 00499A06 77FF26FC 5EC40000 02389A50 16FC4680 1076FF00 ..v..F•.P.8...á^•&.w..|...¡..a.. 0000A0
0023E900 26E90000 FFFF9A06 76FF0876 FF0A76FF 0C76FF0E 76FF1076 FF0040E9 Òa..v..v..v..v..v..v......Ò&.Ò#. 0000C0
FF90E903 751D803D FF47E903 751DAD3D FF81E903 7510043D FF3FE903 7510033D =..u.Ò?.=..u.ÒÝ.=Ú.u.ÒG.=¯.u.Ò.. 0000E0
01026901 03000000 01 22300 02007A00 0100AC01 0300170C CAC95F5E 1FFFC0E9 Òà..^_èò.....¯...z...#.......i.. 000100
01017001 03000000 03. 0000 02007900 02006602 03007E00 01016501 03007C00 .|...e...~...f...y...........p.. 000120
01014C01 03008000 02011102 03000800 02027302 03001300 01008101 03000700 ............s................L.. 000140
03001402 03008300 0101C801 03002600 02025102 03001700 0202C602 03001E00 .....ó.......Q...&...à...°...... 000160
0200F002 03008200 0302A602 03012200 01009900 05003100 02025E02 0300A400 .Ê...^...1.......".....|...ý...Þ.. 000180
0100C601 03006800 0200FE02 03005500 02029A02 0300C100 03003602 03004400 .D...6...é.......U...±...h...ó.. 0001A0
01C80001 881F0000 3E89D88E FFFFBB1E 00000000 00000000 00000000 0000F300 .µ.................¡...Ä.>...¡..ù. 0001C0
00040006 00020001 FFFF0000 41444153 00000000 00000000 00000400 02000200 ................SADA............ 0001E0
```

```
Dump of file SATURN:[PCCOMMON.DUMP.DLL]DA-ABOUT.DLL;1 on 18-APR-1990 10:38:45.23
File ID (408,19,0)    End of file block 4 / Allocated 4

Virtual block number 4 (00000004), 512 (0200) bytes

00000000 FFFF0001 000E0352 00000139 00000000 00000000 00000000 00000000 ................9...R........... 000000
00000000 00CFFFFF 01900055 00E4001B 00221400 009000C2 000C0001 00000005 ........Ö....."...Ð.U.....u..... 000020
00000000 0000FFFF FFFF019A 000C0026 0004005E 80020400 00D30002 00030000 ......Æ.....^...&............... 000040
00050000 0000000C FFFFFFFF 01AE0008 00640047 00468001 000100D6 00140005 ....®.....F.G.d...Ö............. 000060
00240005 00000000 C000FFFF FFFF01B8 00080064 0038004C 80010001 00EB0013 ..Š.....L.8.d...¡.............$. 000080
01240014 00050000 00000000 FFFFFFFF 01C20008 00BE0023 001E8001 000100FF ........#./...ô...............$. 0000A0
03030031 2E33204E 41404843 4142FFFF FFFF01CC 00080064 0017004A 80010001 ....J...d...a.....BACHMAN 3.10.. 0000C0
42206572 50002A2A 2A205C61 69746E65 6469666E 6F43202A 2A2A0068 4F000000 ...Ok.*** Confidential ***.Pre-B 0000E0
206E6160 68636142 20303939 31202963 28003832 30302E30 312E3330 20617465 eta 03.10.0028.(c) 1990 Bachman  000100
72207374 68676972 206C6C41 00736065 74737953 206E6F69 74616D72 6F666E49 Information Systems.All rights r 000120
00000000 00000000 00000000 00000000 00000000 00005400 2E646576 72657365 eserved..T...................... 000140
00000000 00000000 00000000 00000000 00000000 00000000 00000000 00000000 ................................ 000160
00000000 00000000 00000000 00000000 00000000 00000000 00000000 00000000 ................................ 000180
00000000 00000000 00000000 00000000 00000000 00000000 00000000 00000000 ................................ 0001A0
00000000 00000000 00000000 00000000 00000000 00000000 00000000 00000000 ................................ 0001C0
00000000 00000000 00000000 00000000 00000000 00000000 00000000 00000000 ................................ 0001E0

Dump of file SATURN:[PCCOMMON.DUMP.DLL]DA-DSGN.DLL;1 on 18-APR-1990 10:38:46.97
File ID (402,14,0)    End of file block 64 / Allocated 64

Virtual block number 1 (00000001), 512 (0200) bytes

00000000 00000040 00000000 000000B8 0000FFFF 00000004 0000003B 00C45A4D MZÄ.;...........¡........a....... 000000
000000B0 00000000 00000000 00000000 00000000 00000000 00000000 00000000 ................................ 000020
6F6E6E61 63206061 72676F72 70207369 685421CD 4C01B821 CD09B400 0EBA1F0E ..º..Ç.el¡.LeIThis program canno 000040
00000000 00000024 0A0D0D2E 65646F6D 20534F44 206E6920 6E757220 65622074 t be run in DOS mode....$....... 000060
00000012 00000000 00060000 00000000 00098009 393F490F 000A06F4 0505454E NE..¶...ÖI?9.................... 000080
00000000 00000000 00010009 00040000 0000077E 0129010F 00F40000 00400024 $.à.Å.¶...).-................... 0000A0
12A20F00 12A10237 06640F00 066401CB 08980F00 0897010C 07DA0F00 07DA007B (.Ö...Ö.........ù.d...d.7.À...À. 0000C0
02020E21 00000000 18B00F00 18B00387 000F0F00 000F0385 00F00F00 00F00373 s.Þ...Þ.........................!... 0000E0
01111EB1 01110784 014F1EB1 014F076F 01A71EB1 01A70754 23E00F21 22420519 ..B"!.ÀWI.Ï.Ý.Ï.o.O.Ý.O.....Ý... 000100
01221EB1 012207B8 01151EB1 011507A6 00461EB1 004607A1 00A51EB1 00A50796 ..E.Ý.E.À.F.Ý.F.Ï...Ý...¡.".Ý.". 000120
00040005 00030005 00020005 00010005 029C1EB1 029C07D5 00911EB1 009107CB ù...Ý...Ï...Ý................... 000140
44000000 4E475344 2D414407 012C0004 00000005 00080005 00070005 00050005 ....................,..DA-DSGN...D 000160
75015301 2A011600 4D001E00 10000A00 01000002 434F5250 444E574E 47534441 ADSGNWNDPROC...........M...*.S.u 000180
42440947 4244034E 49574D50 05534C4C 4143534F 44080005 BE056205 30020501 ...0.b./...DOSCALLS.PMWIN.DBG.DB 0001A0
5345444D 45400E50 41454845 54414552 4340454D 0040454D 03545245 53534147 GASSERT.MEM.MEMCREATEHEAP.MEMDES 0001C0
43414C4D 44006C60 64034B43 4F4C4243 4F4C4C41 4D45400D 50414548 594F5254 TROYHEAP.MEMALLOCBLOCK.dml.DMLAC 0001E0

Dump of file SATURN:[PCCOMMON.DUMP.DLL]DA-DSGN.DLL;1 on 18-APR-1990 10:38:46.97
File ID (402,14,0)    End of file block 64 / Allocated 64

Virtual block number 2 (00000002), 512 (0200) bytes

0C4E5854 504F5453 4C4D440A 4E585454 52415453 4C4D440B 4D544845 52495551 QUIREHTM.DMLSTARTTXN.DMLSTOPTXN. 000000
454C444E 41484C45 444F4D59 52455551 4C4D4413 4C45444F 4D454552 464C4D44 DMLFREEMODEL.DMLQUERYMODELHANDLE 000020
45534C4D 440B444C 45494659 52455551 4C4D440D 49544759 52455551 4C4D440B .DMLQUERYGTI.DMLQUERYFIELD.DMLSE 000040
09314E4C 52595245 55514C4D 440C4E4C 52595245 55514C4D 440B444C 45494654 TFIELD.DMLQUERYRLN.DMLQUERYRLNT. 000060
53494C45 4552464C 4D440B45 54414C45 524E554C 4D440B45 54414C45 524C4D44 DMLRELATE.DMLUNRELATE.DMLFREELIS 000080
03544345 4A424F54 43454C45 534C4D44 0F44494C 4D445952 4555514C 4D440D54 T.DMLQUERYDMLID.DMLSELECTOBJECT. 0000A0
41405145 534C5455 0A545544 03574F44 4E495752 45544E45 434C5455 0F4C5455 UTL.UTLCENTERWINDOW.DUT.UTLSEQMA 0000C0
60616403 4C454853 55505145 534C5455 0C454B41 4D4E5551 45534C54 550C454B KE.UTLSEQUNMAKE.UTLSEQPUSHEL.dam 0000E0
47034A42 4F455445 4C45444D 41440C59 454B5952 414D4952 50544547 4D414410 .DAMGETPRIMARYKEY.DAMDELETEOBJ.G 000100
54470A43 4F52504C 4F4F5446 45444954 470E4C4F 4F544C4C 494B4954 470B4954 TI.GTIKILLTOOL.GTIDEFTOOLPROC.GT 000120
4C4F4F54 59524555 51495447 12475340 444E4553 4954470A 47534D54 534F5049 IPOSTMSG.GTISENDMSG.GTIQUERYTOOL 000140
59524555 51495447 12574F44 4E49574C 4F4F5454 45534954 4710574F 444E4957 WINDOW.GTISETTOOLWINDOW.GTIQUERY 000160
51495447 12525450 41544144 58554154 45534954 47105254 50415441 44585541 AUXDATAPTR.GTISETAUXDATAPTR.GTIQ 000180
454C474E 4953544E 45105344 45525041 4407544E 45524150 4C4F4F54 59524555 UERYTOOLPARENT.DAPREDS.ENTSINGLE 0001A0
45185349 53594C41 4E414E45 42524549 48455059 54544E45 16455059 54425553 SUBTYPE.ENTITYPEHIERBENANALYSIS.E 0001C0
4E494E4F 4E544E45 14455059 54425553 474E4952 4145424F 464E494E 4F4E544E NTNONINFOBEARINGSUBTYPE.ENTNONIN 0001E0
```

```
Dump of file SATURN:[PLCOMMON.DUMP.DLL]DA-DSGN.DLL;1 on 18-APR-1990 10:38:46.97
File ID (402,14,0)   End of file block 64 / Allocated 64

Virtual block number 3 (00000003), 512 (0200) bytes

45544854 474E454C 454C4241 49524156 544E4515 4C455247 4E495241 45424F46 FOBEARINGREL.ENTVARIABLELENGTHTE 000000
54415455 4F485449 57544E45 13535345 4C544E45 4E4F504D 4F43544E 45105458 XT.ENTCOMPONENTLESS.ENTWITHOUTAT 000020
450E5049 48534E4F 4954414C 45525455 4F485449 57544E45 16455455 42495254 TRIBUTE.ENTWITHOUTRELATIONSHIP.E 000040
45114445 5A494C41 4D524F4E 544F4E54 4E451053 59454B54 554F4854 4957544E NTWITHOUTKEYS.ENTNOTNORMALIZED.E 000060
4445434E 45524546 45524E55 544E450F 59484352 41524549 484E494B 4F4F544E NTOOKINHIERARCHY.ENTUNREFERENCED 000080
5049544C 554D4854 4957544E 45135344 4F485445 4D54554F 48544957 544E4511 .ENTWITHOUTMETHODS.ENTWITHMULTIP 0000A0
54554D48 54495754 4E451753 59454B4B 5449574B 4F4F544E 450E5359 454B454C LEKEYS.ENTOOKWITHKEYS.ENTWITHMUT 0000C0
11594548 4D495250 50554448 54495754 4E451159 454B4D49 52505254 5441494C LIATTRPRIMKEY.ENTWITHOUPPRIMKEY. 0000E0
4C445054 554F4854 49575254 5441184E 49414D4F 4454554F 48544957 52545441 ATTRWITHOUTDOMAIN.ATTRWITHOUTPDL 000100
4540414E 45544143 494C5055 44485449 57525454 41154E4F 49544156 49524544 DERIVATION.ATTRWITHDUPLICATENAME 000120
410E4445 434E4552 45464552 4E555254 5441104C 4F4F504D 494E4952 5454410C .ATTRINIMPOOL.ATTRUNREFERENCED.A 000140
49544E45 484F4F48 5449574D 31504948 53501459 4548E47 4945524F 46525454 TIRFOREIGNKEY.PSHIP1MWITHOOKENTI 000160
594C4C55 46313150 49485350 15455441 43494C50 55444031 50494853 50105954 TY.PSHIP1MDUPLICATE.PSHIP11FULLY 000180
45535000 4C414E4F 4954504F 594C4C55 46504948 53501259 524F5441 444E414D MANDATORY.PSHIPFULLYOPTIONAL.PSE 0001A0
53544553 5017454D 414E544C 55414645 44544553 500F4445 54414C45 524E5554 TUNRELATED:PSETDEFAULTNAME.PSETS 0001C0
49485845 4C504D4F 43544553 5018E4EF 49544345 54454452 45494845 4C504049 IMPLEHIERDETECTION.PSETCOMPLEXHI 0001E0

Dump of file SATURN:[PCCOMMON.DUMP.DLL]DA-DSGN.DLL;1 on 18-APR-1990 10:38:46.97
File ID (402,14,0)   End of file block 64 / Allocated 64

Virtual block number 4 (00000004), 512 (0200) bytes

49575945 4B16474E 49505041 4C524556 4F59454B 0E4E4F49 54434554 45445245 ERDETECTION.KEYOVERLAPPING.KEYWI 000000
4E454943 49464655 534E4959 454B0F50 4D4F4359 52415353 4543454E 4E554854 THUNNECESSARYCOMP.KEYINSUFFICIEN 000020
44084E4F 49534E45 4D49444F 57404F44 0E455445 4C504D4F 434E494D 4F440054 T.DOMINCOMPLETE.DOMWODIMENSION.D 000040
4F574D49 440C5345 54554249 52545441 4F574D49 440F5342 41545641 4F574D[illegible] OMWOAVTABS.DIMWOATTRIBUTES.DIMWO 000060
4B505544 444E4946 544E4510 534E4941 4D4F444F 57545641 0C534E49 414D4F44 DOMAINS.AVTWODOMAINS.ENTFINDDUPK 000080
5945481C 53544E45 59454B4E 47494552 4F46444E 49465254 54411654 4E455945 [illegible]YENT.ATTRFINDFOREIGNKEYENTS.KEY 0000A0
44410A56 44410350 4D4F4354 45535059 52415353 4543454E 594C4E4F 444E4946 FINDONLYNECESSARYPSETCOMP.ADV.AD 0000C0
4F525056 4441114E 4957524F 53495644 41544547 56444110 434F5250 474C4456 VDLGPROC.ADVGETADVISORWIN.ADVPRO 0000E0
41504F54 544E454D 524F4658 0E4D524F 46584144 07524F53 49564441 53534543 CESSADVISOR.DAXFORM.XFORMENTTOPA 000100
53544E45 45475245 4D4D524F 46580E4C 45524B46 454B414D 4D524F46 580E5452 RT.XFORMMAKEFKREL.XFORMMERGEENTS 000120
54524549 48544E45 4D524F46 58144950 41524549 484F544C 45524D52 4F465811 .XFORMRELTOHIERAPI.XFORMENTHIERT 000140
4F0F0000 04710303 39030102 45544952 57534F44 084F4953 03495041 4C45524F ORELAPI.SIO.DOSWRITE...9..q....O 000160
01434F52 504C4F4F 544E4753 4441440E 00004E47 53442041 44204D50 20322F53 S/2 PM DA DSGN...DADSGNTOOLPROC. 000180
4680026A D88EFFFF 881E5657 000044C8 00000000 00000000 00000000 00000000 ................ÀD..WV.j...Aj..F 0001A0
6A316AF2 76FF01E0 E9CE469B 0006E903 7500CE7E 83CE4689 0000FFFF 9A5016F2 ·.P......Fö.-ö.u.Ö...FöÅ..v·j1j 0001C0
FC5EC401 8DE9CE46 8B0006E9 037500CE 7E83CE46 890000FF FF9A5016 FC468036 6.F=.P......Fo.-o.u.Ö...FöÕ§.á^= 0001E0

Dump of file SATURN:[PCCOMMON.DUMP.DLL]DA-DSGN.DLL;1 on 18-APR-1990 10:38:46.97
File ID (402,14,0)   End of file block 64 / Allocated 64

Virtual block number 5 (00000005), 512 (0200) bytes

89260847 89260000 8BFC5EC4 02478926 04478926 00008BFC 5EC40789 26F24688 .F·&..á^=¡..&.G.&.G.á^=¡..&.G.&. 000000
FF9A5052 000A05FE 568BFC46 8B0676FF 0000FFFF 9AFC76FF FE76FF06 76FF0647 G..v..v±.v=......v..F=.V±...RP.. 000020
FF68F876 FFFA76FF 016A006A 0000FFFF 9A5016F8 46800A77 FF26FC5E C40000FF ...á^=&.w..F½.P.....j.j..v*.v½h. 000040
8C7E838C 46890000 FFFF9A50 168E4680 012C6802 0036FF26 214A068E FFFF68FF .h....J!&.6..h,..F/.P......F¥.-¥ 000060
75648C7E 83011FE9 F44688F6 5689F446 890000FF FF9A006A 006A0015 E90374FF .t.Õ..j.j.......F¶.V-.F¶Õ...-¥du 000080
0C05FE56 8BFC468B 50168E46 8D0107E9 00008800 003047C7 26FC5EC4 000FE903 .Õ..á^=&úG0..¡..Õ...F/.P.F=.V±.. 0000A0
E900008B 00003047 C726FC5E C4000FE9 03740000 3D08C483 FFFF0000 9A505200 .RP......á.=..t.Õ..á^=&úG0..¡..Õ 0000C0
9A5016D0 4680FC77 FF26FE77 FF26085E C4040846 83000130 47C726FC 5EC400D8 Å.á^=&úG0...F..á^.&.w±&.w=.FÅ.P. 0000E0
00FFFF9A 50520002 05FE568B FC468B50 16004680 0676FF01 6A08C483 FFFF0010 .....á.j..v..FÅ.P.F=.V±...RP.... 000100
168E4680 0025E903 7500CC7E 830087E9 CE468800 06E90375 00CE7E83 CE468900 ..Fö.-ö.u.Õ...FöÕ...-ã.u.[illegible]%..F/. 000120
59E9CE46 8B0006E9 037500CE 7E83CE46 8908C483 FFFF05D8 9AFC76FF FE76FF50 P.v±.v=.Å....á..Fö.-ö.u.Õ. .FöÕY 000140
F876FFFA 76FF5052 000605FE 568BFC46 8B0277FF 260477FF 26FC5EC4 F276FF00 ..v·á^=&.w.&.w..F=.V±...RP.v·.v½ 000160
19E9CE46 8B0006E9 037500CE 7E83CE46 890000FF FF9A5052 0000FFFF 9A800868 h.......RP......Fö.-ö.u.Õ...FöÕ. 000180
C8CBC95F 5E1F0000 E900008B 0000FFFF 9A0677FF 260877FF 26FC5EC4 0676FF00 ..v.á^=&.w.&.w......¡..Õ...^_èùà 0001A0
7500FA7E 83FA46[illegible] 0000FFFF 9A5016FC 46800676 FFD89E00 08081E56 57000006 ...WV.¡...A.v..F=.P......F*.=*.u 0001C0
FF260877 FF26FC5E C40044E9 03750030 7F8326FC 5EC40061 E9FA4680 0006E903 .Õ...F*Õa.á^=&..0.u.ÒO.á^=&.w.&. 0001E0
```

```
Dump of file SATURN:[PCCOMMON.DUMP.DLL]DA-DSGN.DLL;1 on 18-APR-1990 10:38:46.97
File ID (402,14,0)   End of file block 64 / Allocated 64

Virtual block number 6 (00000006), 512 (0200) bytes

 68FFFF68 027068FF FF68026A 68FFFF68 02646850 52000C05 FE568BFC 46880677 w..F•.V±...RPhd.h..hj.h..hp.h..h 000000
 006A0676 FF0000FF FF9A5016 FA4680FF FF680116 68FFFF68 027C68FF FF680276 v.h..h|.h..h..h...F*.P......v.j. 000020
 1E009268 D88E0217 881E5657 000006C8 CBC95F5E 1F0000E9 00008800 00FFFF9A .....¡..Õ...^_èùÀ...WV.¡...Ah... 000040
 FC5EC40C C483FFFF 00A39A50 00000224 9A5016FC 46800676 FF007168 1E004268 hB..hq..v..F•.P.$...P.Ê....ó.ó^• 000060
 FA468900 00FFFF9A 0277FF26 0477FF26 FC5EC400 32E90375 04470826 02478826 &.G.&.G.u.Õ2.ó^=&.w.&.w.......F* 000080
 6804C483 0329005A 9A009968 1E000CE9 0375849F FA7E8100 16E90375 00FA7E83 .-*.u.Õ...-*..u.Õ...h...Z.)..ó.h 0000A0
 00880CC4 8302C800 A39A5000 00FFFF9A 37FF26FC 5EC400E4 681E0085 681E009D ...hç..hÕ.ó^=&.7.....P.Ê.À..ó.|. 0000C0
 19E90000 B8000CE9 0E4688D8 8E02A888 1E565700 0008C8CB C95F5E1F 0000E900 .Õ...^_èùÀ...WV.¡¨..À.F.ÕÊ.¡..Õ. 0000E0
 F9E90000 B800FFE9 F84688F8 468906C4 83039900 009A1076 FF0A76FF 0C76FF01 ..v..v..v.......ó..F½.F½...¡..Õ* 000100
 FF9A016A 006A5052 99104688 1DAE68FE 76FF0000 008F9A50 16FE4680 1076FF00 ..v..F±.P......v±hÛ..F..RP¡.j... 000120
 0374683F 83260A5E C400C3E9 F84688F8 468902C4 8303FC02 0F9A1076 FF0000FF ....v....=..ó..F½.F½Õù.ó^.&.?ht. 000140
 89260A5E C43457B8 26324788 26FA5EC4 000002C0 9A5016FA 46801076 FF002FE9 Õ/..v..F*.P.ä...ó^*&.G2&.W4ó^.&. 000160
 000107C7 260A5EC4 0082E900 00880789 26024789 26000088 065EC402 57892607 .&.W.ó^.¡..&.G.&..¡..Õ..ó^.&ú... 000180
 0E76FF10 76FF0060 E9F84688 F8468902 C483019A 02A09A10 76FF0074 E90000B8 ¡..Õt..v.......ó..F½.F½Õ'..v..v. 0001A0
 76FFC7E9 03751004 300043E9 0046E900 00FFFF9A 0676FF08 76FF0A76 FF0C76FF .v..v..v..v......ÕF.ÕC.=..u.Õù.v 0001C0
 30FF1CE9 037510CC 30FFC3E9 FF0DE903 75100330 FF0FE903 7510013D 0013E903 .Õ..=..u.Õ..=..u.Õ..Õù.=à.u.Õ..= 0001E0

Dump of file SATURN:[PCCOMMON.DUMP.DLL]DA-DSGN.DLL;1 on 18-APR-1990 10:38:46.97
File ID (402,14,0)   End of file block 64 / Allocated 64

Virtual block number 7 (00000007), 512 (0200) bytes

 0CCAC95F 5E1FFFA0 L.FF40E9 03751DB2 3DFF89E9 03751DB0 3DFF1AE9 03751DAD Ù.u.Õ..=¯.u.Õ..=ÿ.u.Õa.Õ...^_èõ. 000000
 FF0876FF 0A76FF0C 76FF0E76 FF1076FF 1276FFD8 8E034188 1E565700 0000C800 .à...WV.¡A..A.v..v..v..v..v..v.. 000020
 79B81E56 5700001C C8000ECA C95F5E1F 0000E900 008A0000 B80000FF FF9A0676 v......¡..¤..Õ...^_èõ..à...WV.¡y 000040
 83E44689 0CC48305 3708779A 0A76FF0C 76FF0676 FF0876FF 5016F846 80D88E04 ..À.F½.P.v..v..v..v..w.7..ó..FÕ. 000060
 078826FC 5EC4FE56 89FC4689 FA5688F8 468800F5 E9E4468B 0006E903 7500E47E ~õ.u.Õ...FõÕ%..F½.V*.F•.V±ó^•&.. 000080
 16E84680 0E76FF37 FF260277 FF26FC5E C40676FF 0876FF00 87E90375 02470826 &.G.u.Õñ..v..v.ó^=&.w.&.7.v..FÕ. 0000A0
 76FF0676 FF0876FF F876FFFA 76FF0020 E9037500 E47E83E4 46890000 FFFF9A50 P......FÕ.~õ.u.Õ ..v*.v½.v..v..v 0000C0
 E67E83E6 46FF0003 E90000E6 46C70091 E9E4468B 0CC48305 9E09EB9A 0A76FF0C ..v..Š....ó..FõÕ..úF|..Õ...F|.-| 0000E0
 37FF2602 77FF26FC 5EC40676 FF0876FF FFEAE900 E842C6E6 7688000A E9037C10 .|.Õ...v1õBÕ.Õõ..v..v.ó^=&.w.&.7 000100
 FFF876FF FA76FF00 20E90375 00E47E83 E4468900 00FFFF9A 5016E846 800E76FF .v..FÕ.P......FÕ.-õ.u.Õ ..v*.v½. 000120
 FF3AE904 FC468300 2AE9E446 880CC483 05C509EB 9A0A76FF 0C76FF06 76FF0876 v..v..v..v..$.é..ó..FõÕ*..F•.Õ:. 000140
 E4468BE4 46890CC4 83025E09 EB9A0A76 FF0C76FF 0676FF08 76FFF876 FFFA76FF .v*.v½.v..v..v..v..$.^..ó..FÕ.FÕ 000160
 0036FF26 214A068E 006A006A D88E04AF 881E5657 000000C8 CBC95F5E 1F0000E9 Õ...^_èùàÅ..WV.¡£..Áj.j...J1&.6. 000180
 38868002 77FF2604 77FF2606 5EC40000 FFFF9A50 16FF3886 8000C868 00CF6802 .hu.hã...8..P.....ó^.&.w.&.w...8 0001A0
 065EC401 A7E9FF30 86B80007 E9037500 FF30BE83 FF308689 0000FFFF 9A5016FF ..P.......0../0..u.Õ....0.Õ1.ó^. 0001C0
 3F83260A 5EC4FF34 9699FF32 86890457 88260247 8B26065E C4FF3686 89078826 &....6.ó^.&.G.&.W...2...4.ó^.&.? 0001E0

Dump of file SATURN:[PCCOMMON.DUMP.DLL]DA-DSGN.DLL;1 on 18-APR-1990 10:38:46.97
File ID (402,14,0)   End of file block 64 / Allocated 64

Virtual block number 8 (00000008), 512 (0200) bytes

 86890AC4 83069C04 A79AFF32 B6FFFF34 B6FFFF36 B6FF026A 006A001C E9037500 .u.Õ..j.j..Ñ6..Ñ4..Ñ2..Ì....ó... 000000
 3686FF05 6A076A00 1CE90375 00027F83 260A5EC4 0029E903 7400FF30 BE83FF30 0../0..t.Õ).ó^.&....u.Õ..j.j..Ñ6 000020
 C40045E9 037400FF 30BE83FF 3086890A C48306CF 04A79AFF 32B6FFFF 34B6FFFF ..Ñ4..Ñ2..Ì.ü..ó...0../0..t.ÕE.ó 000040
 EB04A79A FF32B6FF FF34B6FF FF36B6FF 036A0F6A 0038E903 7500047F 83260A5E ^.&....u.Õ8.j.j..Ñ6..Ñ4..Ñ2..Ì.Š 000060
 0AC48307 1E04A79A FF32B6FF FF34B6FF FF36B6FF 046A086A FF308689 0AC48306 ..ó...0.j.j..Ñ6..Ñ4..Ñ2..Ì....ó. 000080
 FF096A05 6A001CE9 03750006 7F83260A 5EC40029 E9037400 FF30BE83 FF308689 ..0../0..t.Õ).ó^.&....u.Õ..j.j.. 0000A0
 29E90374 00FF30BE 83FF3086 890AC483 075104A7 9AFF32B6 FFFF34B6 FFFF36B6 Ñ6..Ñ4..Ñ2..Ì.Q..ó...0../0..t.Õ) 0000C0
 A79AFF32 B6FFFF34 B6FFFF36 B6FF076A 006A001C E9037500 087F8326 0A5EC400 .ó^.&....u.Õ..j.j..Ñ6..Ñ4..Ñ2..Ì 0000E0
 1CE90375 000A7F83 260A5EC4 0029E903 7400FF30 BE83FF30 86890AC4 83078404 ....ó...0../0..t.Õ).ó^.&....u.Õ. 000100
 309E83FF 3086890A C4830737 04A79AFF 32B6FFFF 34B6FFFF 36B6FF06 6A036A00 .j.j..Ñ6..Ñ4..Ñ2..Ì.ñ..ó...0../0 000120
 FF34B6FF FF36B6FF 006A086A 001CE903 75000C7F 83260A5E C40029E9 037400FF ..t.Õ).ó^.&....u.Õ..j.j..Ñ6..Ñ4. 000140
 308686C0 00FFFF9A FF32B6FF FF34B6FF FF308689 0AC48303 5D04A79A FF32B6FF .Ñ2..Ì.}..ñ...0..Ñ4..Ñ2........0 000160
 02000203 00000001 06690C02 00F30002 00060103 002590C8 C95F5E1F 0000E9FF .Õ...^_èù.%...U...µ...i......... 000180
 04930203 00000003 00AF0002 00000002 04C70002 005F0005 06140203 01B00009 ..§...........ú.......£......... 0001A0
 038C0203 00000005 030A0002 006B0005 07C90203 00700002 00C60103 05340008 ..4...6...Ì...è...k...........¥. 0001C0
 02610005 00760005 02E90203 00000007 01520002 053F0008 01080203 01CE0009 ..ó...Ù...?...R.......Õ...v...a. 0001E0
```

Dump of file SATURN:[PCCOMMON.DUMP.DLL]DA-DSGN.DLL;1 on 18-APR-1990 10:38:46.97
File ID (402,14,0)   End of file block 64 / Allocated 64

Virtual block number 9 (00000009), 512 (0200) bytes

007C0203 05500008 02870203 00000009 05E00002 00130002 01D40103 01E00002 ..A...&.......A...........P...|. 000000
037A0203 08770002 0.600005 00900002 05FE0103 09E80002 02730005 01E10009 ..A...s...S...±........m...W...z. 000020
041D0203 00A30005 05120203 00220004 00140203 01790009 02910203 01F20009 ..........y.........".......É..... 000040
05790203 0A160002 027F0005 02140002 02670005 00300004 03210203 01850009 ......|...0...g................y. 000060
00A00203 019F0009 038F0203 00000003 00820005 003F0004 00370203 00810005 ..y...7...?...y................. 000080
00000000 00000000 00000000 028A0002 02790005 00510005 01600203 01AA0009 ..`...m...Q...y...a............. 0000A0
4C068E00 29E90375 003F8326 0A5EC400 00FE46C7 D88EFFFF 881E5657 000002C8 à...WV.|...ÄüF±..á^.&.?.u.Õ)...L 0000C0
05D800C7 260676C4 02E3C1FE 46FFFE5E 880017E9 037505DE 06082605 DCA12621 ‡&ÄÉ.&..B.u.Õ...^±.F±èD.év.&ú.Á. 0000E0
06860608 260684A1 26214E06 8E0029E9 03750002 7F83260A 5EC40008 0240C726 &úa...á^.&.....u.Õ)...N‡&ÄÇ.&..Ñ. 000100
260A5EC4 00440240 C7260680 00C72606 76C402E3 C1FE46FF FE5E8800 17E90375 u.Õ...^±.F±èD.év.&ú.¯.&úa.D.á^.& 000120
26215206 8E0040E9 03750746 06082607 44A12621 50068E00 52E90375 00047F83 ....u.ÕR...P‡&ÄD.&..F.u.Õa...R‡& 000140
C7260740 00C72606 76C402E3 C1FE46FF FE5E8B00 2EE90375 070A0608 260708A1 À..&.....u.Õ...^±.F±èD.év.&ú.a.&ú 000160
83260A5E C4007A02 40C72607 0400C726 0676C402 E3C1FE46 FFFE5E88 00090240 a.1..^±.F±èD.év.&ú...&úa.z.á^.&. 000180
FE46FFFE 5E880017 E9037507 82060826 0780A126 2154068E 0029E903 7500067F ...u.Õ)...T‡&Á..&....u.Õ...^±.F± 0001A0
068E0029 E9037500 087F8326 0A5EC400 C20240C7 26077C00 C7260676 C402E3C1 èD.év.&ú.|.&úa.ó.á^.&....u.Õ)... 0001C0
AC00C726 0676C402 E3C1FE46 FFFE5E88 0017E903 75078206 08260780 A1262156 V‡&Á¯.&..y.u.Õ...^±.F±èD.év.&ú.¯ 0001E0

Dump of file SATURN:[PCCOMMON.DUMP.DLL]DA-DSGN.DLL;1 on 18-APR-1990 10:38:46.97
File ID (402,14,0)   End of file block 64 / Allocated 64

Virtual block number 10 (0000000A), 512 (0200) bytes

E2060826 07E0A126 2158068E 0029E903 75000A7F 83260A5E C4010F02 40C72607 .&úa...á^.&....u.Õ)...X‡&ÄÁ.&..ã 000000
0A5EC401 450240C7 26070C00 C7260676 C402E3C1 FE46FFFE 5E880017 E9037507 .u.Õ...^±.F±èD.év.&ú.É.&úa.E.á^. 000020
FFFE5E88 0017E903 75080606 08260804 A126215A 068E0029 E9037500 0C7F8326 &....u.Õ)...Z‡&Á..&....u.Õ...^±. 000040
26000088 0676C402 E3C1FE5E 88017802 40C72608 0000C726 0676C402 E3C1FE46 F±èD.év.&ú...&úa.(..^±èD.év.|..& 000060
CBC95F5E 1F0000E9 00008800 03E90001 880006E9 037700FE 7E830089 26024089 .a.&...-±.w.Õ..|..Õ..|..Õ...^_èü 000080
76FF786A 0676FF02 0036FF26 215C068E 006A006A D88E0181 881E5657 000000C8 à...WV.|Ý..Áj.j...\‡&.6...v.jx.v 0000A0
D88E01E8 881E5657 000000C8 CBC95F5E 1F0000E9 00008800 00FFFF9A 0876FF0A ..v.......|..Õ...^_èüà...WV.¡Õ..Ä 0000C0
00008800 0002059A 0876FF0A 76FF506A 0676FF02 0036FF26 215C068E 006A006A j.j...\‡&.6...v.jP.v...v.......|.. 0000E0
89078826 0E5EC400 00FE46C7 D88E021C 881E5657 000006C8 CBC95F5E 1F0000E9 Õ...^_èüà...WV.|...ÄüF±..á^.&... 000100
18E9037C FC4639FA 46880026 E9037500 38802606 76C4FE5E 88004FFA 46C7FC46 F•úF¹Õ..^±év.&.8.u.Õ&..F¹9F=|.Õ. 000120
C4FC5E88 FFC8E9FC 46FFFE46 FF008826 0A76C4FC 5E88008A 260676C4 FE5E8800 ..^±év.&...^=év.&...F±.F=Õü..^=é 000140
56570000 5EC8C8C9 5F5E1F00 00E90000 88078926 FC46880E 5EC40000 C6260A76 v.&ó..á^..F•&..|..Õ...^_èüà^..WV 000160
8D026A0C 76FF0E76 FF0876FF 0A76FF05 74E90646 880000A2 46C7D88E 0250881E .|P..ÄüFÅ...F.Õt..v..v..v..v.j.. 000180
1276FF5D 16A2468D 05⁻ E900 03E90375 00F07E83 F0468900 00FFFF9A 5016A446 FÉ.P......FÞ.-Þ.u.Õ..Õt..FÅ.P.v. 0001A0
6A0C76FF 0E76FF08 76FF0A76 FF0559E9 0CC483FF FF02489A 5016A446 8D1076FF .v..FÉ.P.H....é.ÕY..v..v..v..v.j 0001C0
FE4608FC 46880532 E90003E9 037500F0 7E83F046 890000FF FF9A5016 FC46800A ..F•.P......FÞ.-Þ.u.Õ..Õ2..F=.F± 0001E0

Dump of file SATURN:[PCCOMMON.DUMP.DLL]DA-DSGN.DLL;1 on 18-APR-1990 10:38:46.97
File ID (402,14,0)   End of file block 64 / Allocated 64

Virtual block number 11 (0000000B), 512 (0200) bytes

7E83F046 890000FF FF9A5016 F24680FC 76FFFE76 FF0876FF 0A76FF00 84E90375 u.Õ...v..v..v±.v•.F·.P......FÞ.~ 000000
6AFC76FF FE76FF08 76FF0A76 FF0056E9 037402F2 7E830502 E90003E9 037500F0 Þ.u.Õ..Õ...-·.t.ÕV..v..v..v±.v•j 000020
FF5016A2 46800402 E90003E9 037500F0 7E83F046 89000003 0D9A5016 A446800 2 ..FÉ.P.|....FÞ.-Þ.u.Õ..Õ0..FÅ.P. 000040
04681E10 76FF1276 FF5016A2 46800CC4 8303C402 489A5016 A446800 10 76FF1276 v..v..FÉ.P.H.é..é..FÅ.P.v..v..h. 000060
0004469A 5016A446 8D026A0C 76FF0E76 FF0876FF 0A76FF0C C4830403 02489A01 ..H....é..v..v..v..v.j..FÉ.P.F.. 000080
5016A446 8D1076FF 1276FF50 16A2468D 047CE900 03E90375 00F07E83 F0468900 ..FÞ.-Þ.u.Õ..Õ|..FÅ.P.v..v..FÉ.P 0000A0
DE9A5016 FC468D10 6A0C76FF 0E76FF08 76FF0A76 FF0461E9 0CC48304 6C02489A .H.l..é.Õa..v..v..v..v.j..F•.P.B 0000C0
026AFC76 FFFE76FF 0876FF0A 76FF043A E90003E9 037500F0 7E83F046 89000004 ....FÞ.-Þ.u.Õ..Õ:..v..v..v±.v•j. 0000E0
76FF5016 A2468D04 13E90003 E9037500 F07E83F0 46890000 049C9A50 16A4468D .FÉ.P......FÞ.-Þ.u.Õ..Õ...FÅ.P.v 000100
0106681E 1076FF12 76FF5016 A246800C C4830483 02489A50 16A4468D 1076FF12 ..v..FÉ.P.H....é..FÅ.P.v..v..h.. 000120
0000052C 9A5016A4 468D026A 0C76FF0E 76FF0876 FF0A76FF 0CC48304 C202489A .H.ò..é..v..v..v..v.j..FÉ.P.,... 000140
9A5016A4 46801076 FF1276FF 5016A246 80038DE9 0003E903 7500F07E 83F04689 .FÞ.-Þ.u.Õ..Õ§..FÅ.P.v..v..FÉ.P. 000160
05059A50 16F8468D 006A0C76 FF0E76FF 0876FF0A 76FF03A2 E90CC483 05520248 H.R..é.ÕÅ..v..v..v..v.j..F½.P... 000180
8D106AF8 76FFFA76 FF0876FF 0A76FF03 78E90003 E9037500 F07E83F0 46890000 ...FÞ.-Þ.u.Õ..Õ(..v..v..v¹.v½j.. 0001A0
76FF0876 FF0A76FF 0354E900 03E90375 00F07E83 F0468900 0005089A 5016FC46 F•.P.A....FÞ.-Þ.u.Õ..ÕT..v..v..v 0001C0
80032DE9 0003E903 7500F07E 83F04689 00000582 9A5016A4 468D026A FC76FFFE ±.v•j..FÉ.P......FÞ.-Þ.u.Õ..Õ-.. 0001E0

Dump of file SATURN:[PCCOMMON.DUMP.DLL]DA-DSGN.DLL;1 on 18-APR-1990 10:38:46.97
File ID (402,14,0)   End of file block 64 / Allocated 64

Virtual block number 12 (0000000C), 512 (0200) bytes

```
FF1276FF 5016A246 800CC483 05690248 9A5016A4 46801076 FF1276FF 5016A246 FÅ.P.v..v..FÊ.P.H.i..á..FÅ.P.v.. 000000
16A4468D 026AF876 FFFA76FF 0876FF0A 76FF0CC4 8305A802 489A0108 681E1076 v..h...H.´..á..v..v..v'.v½j..FÊ. 000020
1076FF12 76FF5016 A2468D02 07E90003 E9037500 F07E83F0 46890000 06269A50 P.&....FÞ.~Þ.u.Ô..Ô..FÅ.P.v..v. 000040
0802489A 010A681E 1076FF12 76FF5016 A246800C C48305BF 02489A50 16A4468D .FÊ.P.H.¢..á..FÅ.P.v..v..h...H.. 000060
83F04689 000005FF 9A5016F4 46800E6A 0C76FF0E 76FF0876 FF0A76FF 0CC48303 ..á..v..v..v..v.j..F¶.P......FÞ. 000080
279A5016 FC468010 6AF476FF F676FF08 76FF0A76 FF0281E9 0003E903 7500F07E ~Þ.u.Ô..Ô...v..v..v-.v¶j..F•.P.' 0000A0
026AFC76 FFFE76FF 0876FF0A 76FF025A E90003E9 037500F0 7E83F046 89000003 ....FÞ.~Þ.u.Ô..ÔZ..v..v..v±.v•j. 0000C0
76FF5016 A2468D02 33E90003 E9037500 F07E83F0 46890000 02E59A50 16A4468D .FÊ.P.|....FÞ.~Þ.u.Ô..Ô3..FÅ.P.v 0000E0
010E681E 1076FF12 76FF5016 A246800C C4830663 02489A50 16A4468D 1076FF12 ..v..FÊ.P.H.c..á..FÅ.P.v..v..h.. 000100
000006E5 9A5016A4 4680026A F476FFF6 76FF0876 FF0A76FF 0CC48306 A202489A .H.Å..á..v..v..v-.v¶j..FÊ.P.|... 000120
9A5016A4 46801076 FF1276FF 5016A246 80010DE9 0003E903 7500F07E 83F04689 .FÞ.~Þ.u.Ô..Ôı..FÅ.P.v..v..FÊ.P. 000140
041F9A50 16FC468D 066A0C76 FF0E76FF 0876FF0A 76FF01C2 E90CC483 07080248 H....á.Ôó..v..v..v..v.j..F•.P... 000160
80026AFC 76FFFE76 FF0876FF 0A76FF01 98E90003 E9037500 F07E83F0 46890000 ...FÞ.~Þ.u.Ô..Ô...v..v..v±.v•j.. 000180
1276FF50 16A2468D 0174E900 03E90375 00F07E83 F0468900 0007389A 5016A446 FÊ.P.;....FÞ.~Þ.u.Ô..Ôt..FÅ.P.v. 0001A0
9A011068 1E1076FF 1276FF50 16A2468D 0CC48307 2202489A 5016A446 801076FF .v..FÊ.P.H."..á..FÅ.P.v..v..h... 0001C0
89000007 7D9A5016 A4468D02 6A0C76FF 0E76FF08 76FF0A76 FF0CC483 07610248 H.a..á..v..v..v..v.j..FÊ.P.).... 0001E0
```

Dump of file SATURN:[PCCOMMON.DUMP.DLL]DA-DSGN.DLL;1 on 18-APR-1990 10:38:46.97
File ID (402,14,0)   End of file block 64 / Allocated 64

Virtual block number 13 (00000000), 512 (0200) bytes

```
489A5016 A4468D10 76FF1276 FF5016A2 4680011E E90003E9 037500F0 7E83F046 FÞ.~Þ.u.Ô..Ô...FÅ.P.v..v..FÊ.P.H 000000
0007BF9A 5016A446 80026A0C 76FF0E76 FF0876FF 0A76FF01 03E90CC4 8307A302 .É..á.Ô...v..v..v..v.j..FÊ.P.¢.. 000020
5016A446 801076FF 1276FF50 16A2468D 000CE900 03E90375 00F07E83 F0468900 ..FÞ.~Þ.u.Ô..ÔÉ..FÅ.P.v..v..FÊ.P 000040
019A5016 A4468D02 6A0C76FF 0E76FF08 76FF0A76 FF00C1E9 0CC48307 E502489A .H.|..á.Ôè..v..v..v..v.j..FÊ.P.. 000060
A4468D10 76FF1276 FF5016A2 4680009A E90003E9 037500F0 7E83F046 89000008 ....FÞ.~Þ.u.Ô..Ô...FÅ.P.v..v..FÊ 000080
5016A446 80046A0C 76FF0E76 FF0876FF 0A76FF00 7FE90CC4 83082702 489A5016 .P.H.'..á.Ô...v..v..v..v.j..FÊ.P 0000A0
801076FF 1276FF50 16A2468D 0058E900 03E90375 00F07E83 F0468900 0003879A ......FÞ.~Þ.u.Ô..ÔX..FÅ.P.v..v.. 0000C0
83FFFF00 009A0144 681E0112 681E00E4 68003DE9 0CC48303 AD02489A 5016A446 FÊ.P.H.Ù..á.Ô=.hô..h...hO....... 0000E0
031304CA 04080201 0858A7FF 2E93C003 FFDFE903 7600093D 00022D00.27E90AC4 á.Ô'.-..=..v.ÔÔ..á...ÏX.|...ò... 000100
C2881E56 57000006 C8CBC95F 5E1F0000 E9F0468B 07ED082F 06AA082F 076907AB ¨.i./.´./.Ù..FÞÔ...^_èùà...WV.¡ò 000120
880006E9 037500FE 7E83FE46 890000FF FF9A5016 FA46800A 76FF0C76 FFD88E02 ..Á.v..v..F'.P......F±.~±.u.Ô... 000140
9A0E76FF 1076FF18 6AFA76FF FC76FF0A 76FF0C76 FF010EE9 08468801 41E9FE46 F±ÔA..F.Ô...v..v..v•.v'j..v..v.. 000160
FE9A0E76 FF1076FF 1A6AFA76 FFFC76FF 0A76FF0C 76FF0116 E9FE4689 0000080F Ô....F±Ô...v..v..v•.v'j..v..v..± 000180
FFFF9A0E 76FF1076 FF316AFA 76FFFC76 FF0A76FF 0C76FF00 F7E9FE46 89000008 ....F±Ô¼..v..v..v•.v'j1.v..v.... 0001A0
00093C9A 0E76FF10 76FF196A FA76FFFC 76FF0A76 FF0C76FF 0008E9FE 46890000 ...F±ÔÁ..v..v..v•.v'j..v..v..<.. 0001C0
0000095B 9A0E76FF 1076FF32 6AFA76FF FC76FF0A 76FF0C76 FF0089E9 FE468900 ..F±Ô¿..v..v..v•.v'j2.v..v..[... 0001E0
```

Dump of file SATURN:[PCCOMMON.DUMP.DLL]DA-DSGN.DLL;1 on 18-APR-1990 10:38:46.97
File ID (402,14,0)   End of file block 64 / Allocated 64

Virtual block number 14 (0000000E), 512 (0200) bytes

```
89000009 7A9A0E76 FF1076FF 176AFA76 FFFC76FF 0A76FF0C 76FF009A E9FE4689 .F±Ô...v..v..v•.v'j..v..v..z.... 000000
46890000 09999A0E 76FF1076 FF166AFA 76FFFC76 FF0A76FF 0C76FF00 7BE9FE46 F±Ô(..v..v..v•.v'j..v..v.......F 000020
FE468900 0008C09A 0E76FF10 76FF2B6A FA76FFFC 76FF0A76 FF0C76FF 005CE9FE ±Ô\..v..v..v•.v'j+.v..v..á....F± 000040
7600093D 00022D00 27E90AC4 83083000 009A0180 681E0158 681E0113 68003DE9 Ô=.h...h[..h.....=..á.Ô'.-..=..v 000060
093409A3 092709A3 09460965 08CA0908 08E908AB 09CCA7FF 2E93C003 FFDFE903 .ÔÔ..á...Ïä.¨.Ô...ò.e.F.È.'.É... 000080
1076FF0A 76FF0C76 FFD88E08 7F881E56 57000002 C8CBC95F 5E1F0000 E9FE468B .F±Ô...^_èùà...WV.|...Á.v..v..v. 0000A0
09F3881E 56570000 12C8CBC9 5F5E1F00 00E9FE46 88FE4689 0000FFFF 9A0E76FF .v......¯F±.F±Ô...^_èùà...WV.|µ. 0000C0
4680006A 0E76FF10 76FF1276 FF1476FF 0106E90C 46880000 07C72606 5EC4D88E .Áá^.&ú....F.Ô...v..v..v..v.j..F 0000E0
16F0468D 076A0E76 FF1076FF 1276FF14 76FF010F E9EE4689 00000A62 9A5016F0 Þ.P.b....FŸÔ...v..v..v..v.j..FÞ. 000100
9A5016F0 46800F6A 0E76FF10 76FF1276 FF1476FF 00F1E9EE 46890000 0A809A50 P......FŸÔþ..v..v..v..v.j..FÞ.P. 000120
0A8C9A50 16F0468D 086A0E76 FF1076FF 1276FF14 76FF0003 E9EE4689 00000A9E .....FŸÔ¢..v..v..v..v.j..FÞ.P.¥. 000140
00000ADA 9A5016F0 4680056A 0E76FF10 76FF1276 FF1476FF 00B5E9EE 46890000 ...FŸÔç..v..v..v..v.j..FÞ.P.O... 000160
46890000 0AF89A50 16F0468D 116A0E76 FF1076FF 1276FF14 76FF0097 E9EE4689 .FŸÔ...v..v..v..v.j..FÞ.P.½....F 000180
E9EE4689 00000816 9A5016F0 4680036A 0E76FF10 76FF1276 FF1476FF 0079E9EE ŸÔy..v..v..v..v.j..FÞ.P.. ...FŸÔ 0001A0
003DE9EE 46890000 067C9A50 16F0468D 086A0E76 FF1076FF 1276FF14 76FF005B [..v..v..v..v.j..FÞ.P.|... FŸÔ=. 0001C0
DFE90376 00093000 022D0027 E90AC483 09810000 9A010668 1E01A468 1E014F68 hO..hÊ..h•....Ý..á.Ô'.-..=....ÔÔ 0001E0
```

Dump of file SATURN:[PCCOMMON.DUMP.DLL]DA-DSGN.DLL;1 on 18-APR-1990 10:38:46.97
File ID (402,14,0)   End of file block 64 / Allocated 64

Virtual block number 15 (0000000F), 512 (0200) bytes

```
EE7EB30B 0208200A A808200A C60AE40A 4E0A8A0A 6C0A300B 49A7FF2E 93C003FF ..á...II.0.l...N.ð.6. . . ....-Y 000000
013DC223 E2D307E1 830A4E8B 0001BAE4 2AF0428A 03EEC10A 76880025 E9037400 .t.Ò%..v.eY..Bb*ðu...N..À.ãä#ö=. 000020
00000206 4C000200 0A10CAC9 5F5E1F00 00E9EE46 880F8926 065EC409 F7C91800 ..è%1á^.&...FYÒ...^_èò.....L.... 000040
0000090A 1E000200 F8000503 57020300 EC00050A 04020300 0000050B 2E000200 ...............š...Ŭ...½........ 000060
80000509 10020300 A300050A 44020300 90000202 39010300 83000508 8F020300 ...........9.......D...£.......§ 000080
E90E468B D88EFFFF 881E5657 000000C8 00000000 00000000 C9000506 8E020300 ...ƒ...è.........à...WV.¡...A.F.Õ 0000A0
681E01EE 681E406A 0012E903 7400003D 0000FFFF 9A00C868 1076FF12 76FF0080 ¯..v..v.hà.......=..t.Õ..jà.hY..h 0000C0
76FF0676 FF0876FF 0000FFFF 9A1076FF 1276FF00 80E90AC4 83006C00 009A0220 ....l..á.Õ¯..v..v.......v..v..v 0000E0
C483FFFF 005A9A02 30681E00 88E90CC4 83008300 FD9A1076 FF1276FF 0A76FF0C ..v..v..v..»....á.Õ...h=..Z....á 000100
76FF0C76 FF0062E9 08C48300 9A015E9A 1076FF12 76FF0A76 FF0C76FF 0079L ^4 .Õy..v..v..v..v..^....á.Õb..v..v 000120
76FF0C76 FF0E76FF 1076FF12 76FF004B E908C483 FFFF0223 9A1076FF 1276FFL ..v..v..#....á.ÕK..v..v..v..v..v 000140
E9037500 2230FFAA E9037500 2030002B E90037E9 0000FFFF 9A0676FF 0876FF0A ..v..v......Õ7.Õ+.= .u.Õ`.=".u.Õ 000160
0000B8FF B5E9FF53 E9037500 3830FFA9 E9037500 3030FF38 E9037500 2930FF93 ..=).u.Õ8.=0.u.Õ`.=;.u.ÕS.Õç.¡.. 000180
6A0676FF 0876FFD8 8E000888 1E565700 0000C800 0ECAC95F 5E1F0000 E900008A ¤..Õ...^_èò..à...WV.¡...Á.v..v.j 0001A0
009A0286 681F0254 681E6B6A 0012E903 7400003D 0000FFFF 9A0E76FF 1076FF00 ..v..v.......=..t.Õ..jk.hI..h.... 0001C0
009A0676 FF0876FF 006A06C4 83015104 889A0676 FF0876FF 016A0AC4 83003500 .5..á.j..v..v....Q..á.j..v..v... 0001E0
```

Dump of file SATURN:[PCCOMMON.DUMP.DLL]DA-DSGN.DLL;1 on 18-APR-1990 10:38:46.97
File ID (402,14,0)   End of file block 64 / Allocated 64

Virtual block number 16 (00000010), 512 (0200) bytes

```
0088E90A 46880D8E 0105881E 56570000 00C8C8C9 5F5E1F00 00E906C4 83005004 .]..á.Õ...^_èùà...WV.¡...A.F.Õ.. 000000
0876FF08 C4830141 02089A06 76FF0876 FF505200 00FFFF9A 006A0676 FF0876FF .v..v.j......RP.v..v..A.A..á..v. 000020
0800009A 0209681E 02A7681E 7D6A0012 E9037400 00300000 01C19A64 6A0676FF .v.jd.ê...=..t.Õ..j).hI..h)....Ü 000040
00856800 13E90374 00003000 00001C9A 00C86806 76FF0876 FF0064E9 0AC48301 ..á.Õd..v..v.hà......=..t.Õ..h.. 000060
83013100 5A9A0345 681E0035 E90038E9 0AC48301 ED00009A 0328681E 02F6681E .h-..h(....Ü..á.Õ8.Õ5..hE..Z.1.. 000080
FFA7E903 7501403D FF68E903 7501363D FF87E903 7500023D 0023E900 26E904C4 á.Õ&.Õ#.=..u.Õñ.=6.u.Õh.=ã.u.ÕI. 0000A0
83088E01 66881E56 57000000 C8C8C95F 5E1F0000 E9FFC8E9 FFC8E903 75014A3D =J.u.Õù.Õù.Õ...^_èùà...WV.¡f..Á. 0000C0
FF0081E9 04C48302 5805089A 0676FF08 76FF0051 E90A468B 0098E903 74010C7E -..t.Õ...F.ÕQ..v..v....[..á.Õ... 0000E0
02810400 9A0676FF 0876FF01 6A006DE9 06C48302 6E06269A 0676FF08 76FF0A76 v..v..v..&.n..á.Õm.j..v..v...... 000100
20041E9 0044E900 47E906C4 83018804 009A0676 FF0876FF 006A005A E906C483 .á.ÕZ.j..v..v.......á.ÕG.ÕÒ.ÕA.- 000120
024F0289 024F0289 024F0289 023E02A2 A7FF2E93 C003FFEF E9037600 16300154 I.=..v.Õy..à...IÀ.>...0...0...0. 000140
02760289 02630289 02890289 02890289 024F0289 024F0289 024F0289 024F0289 ..0...0...0...0...........ċ...v. 000160
1E0010E9 03740C46 080A468B D88E022B 881E5657 000000C8 CBC95F5E 1F0000E9 Õ...^_èùà...WV.¡+..A.F..F.t.Õ... 000180
06C48303 2205439A 0676FF08 76FF0156 680000FF FF9A008C 68036C68 1E039E68 h...hI.h¥......hV..v..v..C."..á. 0001A0
5A680247 89260A5E C406C483 033A0543 9A0676FF 0876FF01 58680789 260A5EC4 á^.&..hX..v..v..C.:..á.á^.&.G.hZ 0001C0
9A0676FF 0876FF01 5C680447 89260A5E C406C483 03520543 9A0676FF 0876FF01 ..v..v..C.R..á.á^.&.G.h\..v..v.. 0001E0
```

Dump of file SATURN:[PCCOMMON.DUMP.DLL]DA-DSGN.DLL;1 on 18-APR-1990 10:38:46.97
File ID (402,14,0)   End of file block 64 / Allocated 64

Virtual block number 17 (00000011), 512 (0200) bytes

```
C406C483 03820543 9A0676FF 0876FF01 5E680647 89260A5E C406C483 036A0543 C.j..á.á^.&.G.h^..v..v..C....á.á 000000
62680A47 89260A5E C406C483 039A0543 9A0676FF 0876FF01 60680847 89260A5E ^.&.G.h'..v..v..C....á.á^.&.G.hb 000020
4703C39A 0676FF08 76FF0C47 89260A5E C406C483 03AF0543 9A0676FF 0876FF01 ..v..v..C.£..á.á^.&.G..v..v..ù.G 000040
FFD88E02 E0881E56 57000000 C8C8C95F 5E1F0000 E90E4789 260A5EC4 04C48302 ..á.á^.&.G.Õ...^_èùà...WV.¡Á..Á. 000060
880006E9 0375000B 0000FFFF 9A006A00 6A006A00 6A012468 01686806 76FF0876 v..v.hh.h$.j.j.j.j.......Áu.Õ..¡ 000080
FF0876FF D88E03C8 881E5657 000000C8 CBC95F5E 1F0000E9 00008800 03E90001 ..Õ..¡..Õ...^_èùà...WV.¡ù..Á.v.. 0000A0
68016A68 0676FF08 76FF0000 04429A00 6A006A0A 76FF006A 01256801 68680676 v.hh.h%.j..v.j.j..B....v..v.hj.h 0000C0
00C8C8C9 5F5E1F00 00E90000 03E49A00 6A006A50 529908F7 C010010A 7E830125 %..-...ã%Á.RPj.j..Õ...Õ...^_èùà. 0000E0
229A006A 006A006A 006A0124 68015468 0676FF08 76FFD88E 0408881E 56570000 ..WV.¡...Á.v..v.hI.h$.j.j.j.j.." 000100
57000002 C8C8C95F 5E1F0000 E90000B8 0003E900 01880006 E9037500 08000004 ....Áu.Õ..¡..Õ..¡..Õ...^_èùà...W 000120
0004E901 56FE46C7 06C48304 CD04D09A 0676FF08 76FF0A76 FFD88E04 56881E56 V.¡V..Á.v..v..v..ì.ë..á.ŭF±V.Õ.. 000140
83030805 F89A0676 FF0876FF FE76FF0A 76FF0017 E9037E01 62FE7E81 02FE4683 .F±..-±b.-.Õ...v..v±.v..v..½.... 000160
680676FF 0876FFD8 8E0493B8 1E565700 0000C8C8 C95F5E1F 0000E9FF D8E908C4 á.ÕÜ.Õ...^_èùà...WV.¡...Á.v..v.h 000180
57000000 C8C8C95F 5E1F0000 E9000004 6F9A006A 006A0A76 FF006A01 25680154 I.h%.j..v.j.j..o...Õ...^_èùà...W 0001A0
0876FF51 D9F7C91B 00013004 C4830536 044E9A06 76FF0876 FFD88E04 E5881E56 V.¡Ì..A.v..v..N.6..á.=..¯è%1Q.v. 0001C0
FFD88E05 13881E56 57000000 C8C8C95F 5E1F0000 E906C483 04A3048B 9A0676FF .v....È..à.Õ...^_èùà...WV.¡...A. 0001E0
```

```
Dump of file SATURN:[PCCOMMON.DUMP.DLL]DA-DSGN.DLL;1 on 18-APR-1990 10:38:46.97
File ID (402,14,0)   End of file block 64 / Allocated 64

Virtual block number 18 (00000012), 512 (0200) bytes

 B80006E9 0375D00B 000004FF 9A006A00 6A006A00 6A012468 0A76FF06 76FF0876 v..v..v.h$.j.j.j.j.......Au.Ō..¡ 000000
 FF0C76FF D88E054B 881E5657 000004C8 CBC95F5E 1F0000E9 0000B800 03E90001 ..Ō..¡..Ō...^_èuà...WV.¡K..A.v.. 000020
 FC468300 04E90156 FC46C700 01FE46C7 08C48305 C705F89A 0676FF08 76FF0A76 v..v..v..½.ú.¯á.úF±..úF•V.Ō...F• 000040
 7400003D 06C48305 2005439A 0676FF08 76FFFC76 FF0024E9 037E0162 FC7E8102 ..¬•b.¬.Ō$..v•.v..v..C. ..á.=..t 000060
 06C48305 9B04D09A 0676FF08 76FFFE76 FFFFCEE9 0003E900 00FE46C7 0008E903 .Ō..úF±..Ō..Ōo..v±.v..v..}....á. 000080
 0125680A 76FF0676 FF0876FF D88E0588 881E5657 000000C8 CBC95F5E 1F0000E9 Ō...^_èuà...WV.¡...A.v..v..v.h%. 0000A0
 0600881E 56570000 00C8CBC9 5F5E1F00 00E90000 05649A00 6A006A0C 76FF006A j..v.j.j..d...Ō...^_èuà...WV.¡.. 0000C0
 76FF0A76 FF51D9F7 C91B0001 3006C483 06570543 9A0676FF 0876FF0A 76FFD88E .A.v..v..v..C.W..á.=...è¼1Q.v..v 0000E0
 01030000 0003063E 0002000A CBC95F5E 1F0000E9 08C48305 EB05809A 0676FF08 ..v....$..á.Ō...^_èu....>....... 000100
 02030000 0009062E 00020000 000501AF 0002007F 0002061A 0103007E 00020196 ....~...........£¯.............. 000120
 020300B3 000200B8 0103001F 00020179 0103001E 00020118 01030014 000302FB «...............y.......¡...•... 000140
 890000B8 D88EFFFF 881E5657 0001E4C8 00000000 00000000 0000011A 00060044 D...............àŌ..WV.¡...A¡... 000160
 5EC40000 FFFF9A50 16FC468D 0676FF00 00FE6A86 C70000FE 6886C7FC 4689FE46 F±.F•ú.h±..ú.j±...v..F•.P.....á^ 000180
 003DFE68 86890000 FFFF9A50 16FE6A86 800A76FF 0C76FF02 77FF2604 77FF26FC •&.w.&.w..v..v...j±.P.......h±=. 0001A0
 0477FF26 FC5EC40A 76FF0C76 FF5016FE 1C868D00 8FE9FE68 86880007 E9037500 .u.Ō....h±Ō.....±.P.v..v.á^•&.w. 0001C0
 FE68868B 0007E903 7500003D FE688689 0EC483FF FF028A9A FE6AB6FF 0277FF26 &.w..Ŗj±.¤....á...h±=..u.Ō....h± 0001E0

Dump of file SATURN:[PCCOMMON.DUMP.DLL]DA-DSGN.DLL;1 on 18-APR-1990 10:38:46.97
File ID (402,14,0)   End of file block 64 / Allocated 64

Virtual block number 19 (00000013), 512 (0200) bytes

 00FFFF9A 5016FF34 868D00C8 680876FF 020036FF 26215E06 8E006A00 6A0059E9 ŌY.j.j...^!&.6...v.hà...4..P.... 000000
 FF26FC5E C40CC483 FFFF0?46 9A5016FE 6C868050 16FF3486 805016FE 1C868000 ....±.P..4..P..l±.P.F....ó.á^•&. 000020
 C95F5E1F 0000E9FE 688685FE 68868900 00FFFF9A 5016FE6C 86800277 FF26?'77 w.&.w...l±.P.......h±..h±Ō...^_è 000040
 890000B8 0000FA46 C70000F8 46C70000 F646C7D8 8E0008B8 1E565700 000AC6 ? ùà...WV.¡...AúF¬..úF½..úF•..¡.¯. 000060
 003DF646 89000000 469A5016 F8468D08 76FF0A76 FF0C76FF 0E76FFFC 4689FE4? F±.F•.v..v..v..v..F½.P.F....F-=. 000080
 76FF0A76 FF0C76FF 0E76FF00 29E90374 04F87E83 00A2E9F6 46880006 E9037500 .u.Ō...F-ŌÅ..¬½.t.Ō)..v..v..v..v 0000A0
 76FF0070 E9F6468B 0006E903 7500003D F6468900 00FFFF9A 50160846 8D006A08 .j..F..P......F-=..u.Ō...F-Ōp..v 0000C0
 E9F6468B 0006E903 7500003D F6468900 00FFFF9A 016A0876 FF0A76FF 0C76FF0E ..v..v..v.j.......F-=..u.Ō...F-Ō 0000E0
 F6468B00 06E90375 000030F6 46890000 FFFF9A50 16FA468D 0C76FF0E 76FF004C L..v..v..F*.P......F-=..u.Ō...F- 000100
 6A020968 006A1DAF 680A77FF 26FC5EC4 0000002A 9A5016FC 468DFA76 FF002BE9 Ō+..v*.F•.P.*...á^•&.w.h£.j.h..j 000120
 8E00F9B8 1E565700 0004C800 0ACAC95F 5E1F0000 E90000B8 0000FFFF 9A016A00 .j......¡..Ō...^_èò..à...WV.¡*.. 000140
 003DFC46 89000001 9E9A5016 FE46800C 76FF0E76 FF0000FE 46C70000 FC46C7D8 AúF•..úF±...v..v¯.F±.P......F•=. 000160
 08C483FF FF00009A FE76FF00 C9680876 FF0A76FF 004AE9FC 46880006 E9037500 .u.Ō...F•ŌJ..v..v.hè..v±......á. 000180
 FFFF9A08 76FF0A76 FF0C76FF 0E76FF00 25E9FC46 880006E9 03750000 3DFC4689 .F•=..u.Ō...F•ŌX..v..v..v..v.... 0001A0
 001AC800 0ACAC95F 5E1F0000 E9FC4688 0000FFFF 9A0C76FF 0E76FFFC 46890000 ...F•.v..v.......F•Ō...^_èò..à.. 0001C0
 FC46C700 00EA46C7 0000FE46 C70000E6 46C70000 E846C7D8 8E01E0B8 1E565700 .WV.¡U..AúFÒ..úF]..úF±..ŨFō..úF• 0001E0

Dump of file SATURN:[PCCOMMON.DUMP.DLL]DA-DSGN.DLL;1 on 18-APR-1990 10:38:46.97
File ID (402,14,0)   End of file block 64 / Allocated 64

Virtual block number 20 (00000014), 512 (0200) bytes

 E8468B00 06E90375 00003DE8 46890000 02079A50 16FE468D 0C76FF0E 76FF0000 ...v..v..F±.P......FÒ=..u.Ō...FÒ 000000
 E9037500 003DE846 8908C483 02280000 9AFE76FF 00CE6808 76FF0A76 FF0156E9 ŌV..v..v.ho..v±...+..á..FÒ=..u.Ō 000020
 46890000 01279A50 16EA468D 0876FF0A 76FF0C76 FF0E76FF 0131E9E8 46880006 ...FÒŌ1..v..v..v..v..Fō.P.'....F 000040
 E90007FC 46C70075 E9000DFC 46C70056 E9EA468B 00E4E900 03E90375 00003DE8 Ò=..u.Ō..ŌŌ..FōŌV.úF•..Ōu.úF•..Ō 000060
 E90011FC 46C70055 E90005FC 46C70050 E90008FC 46C70065 E9000FFC 46C70060 m.úF•..Ōe.úF•..Ō].úF•..ŌU.úF•..Ō 000080
 00009A03 DE681E03 AE681E00 9968003D E90008FC 46C70045 E90003FC 46C7004D M.úF•..ŌE.úF•..Ō=.h...hÙ..hB.... 0000A0
 1A031203 020368A7 FF2E93C0 03FFDFE9 03760009 30000220 0027E90A C483FFFF ...á.Ō'.-..=..v.ŌŌ..á...1k...... 0000C0
 468DFC76 FF0876FF 0A76FF0C 76FF0E76 FF033A03 42032203 42032A03 32030A03 ...2.*.B.".B.:..v..v..v..v..v•.F 0000E0
 4E8801B0 03EEC106 768B003A E90003E9 03750000 3DE84689 0000FFFF 9A5016EC $.P......FÒ=..u.Ō..Ō:..v.èY.¯..N 000100
 FFFF9A50 16EC468D FC76FF08 76FF0A76 FF0C76FF 0E76FFEC 4208E002 07E18306 ..Å.ØÅ.B$.v..v..v..v..v•.F$.P... 000120
 7E83E646 89000002 5C9A0C76 FF0E76FF 0000E900 03E90375 00003DE8 46890000 ...FÒ=..u.Ō..Ō...v..v..\....F].~ 000140
 000ACAC9 5F5E1F00 00E9E846 88E84689 E6468B00 03E9E846 880006E9 037500E8 Ò.u.Ō...FÒŌ...F].FÒ.FÒŌ...^_èò.. 000160
 FFFC4689 FE468900 00880000 FA46C700 00F846C7 D88E0275 881E5657 000008C8 à...WV.¡u..AúF½..úF*..¡...F±.F•. 000180
 003CE9F8 46880006 E9037500 003DF846 89000002 9E9A5016 FA468D0C 76FF0E76 v..v..F*.P......F½=..u.Ō...F½Ō<. 0001A0
 5EC43457 89263247 89260A56 8B08468B FC5EC400 0001BC9A 5016FC46 8DFA76FF .v*.F•.P.¥...á^•.F..V.&.G2&.W4á^ 0001C0
 C95F5E1F 0000E900 00880000 FFFF9A01 6A006A01 F168006A 1DAF680A 77FF26FC •&.w.h£.j.hp.j.j......¡..Ō...^_è 0001E0
```

```
Dump of file SATURN:[PCCOMMON.DUMP.DLL]DA-DSGN.DLL;1 on 18-APR-1990 10:38:46.97
File ID (402,14,0)   End of file block 64 / Allocated 64

Virtual block number 21 (00000015), 512 (0200) bytes

 00008BF6 4689F846 890000B8 0000EA46 C7D88E04 18881E56 5700001A C8000ACA ò..à...WV.¡...ÁúFõ..¡...F½.F-¡.. 000000
 FA46C700 00F446C7 F04689F2 46890000 8BE64689 E8468900 008BEC46 89EE4689 .FÝ.F$¡...FÒ.F|¡...F .FÞúF¶..úF* 000020
 06468BEC 4689EE46 890000B8 F64689F8 46890000 8BFC4689 FE468900 00880000 ..¡...F±.F=¡...F½.F-¡...FÝ.F$.F. 000040
 E6468014 6A0876FF 0A76FF0C 76FF0E76 FFEE5689 EC46890A 56880846 880173E9 Ðs..F..V..F$.VÝ.v..v..v..v.j..F| 000060
 0E76FF00 11E90375 E8460BE6 46880022 E9037500 003DEA46 890000FF FF9A5016 .P......Fö=..u.Ò"..F|.FÒu.Ò...v. 000080
 46890257 88260788 26E65EC4 01A7E9EA 46880000 05619AE6 76FFE876 FF0C76FF .v..vÒ.v|.a....FòÒ|.á^|£..&.W..F 0000A0
 0006E903 7500003D EA468900 00FFFF9A E676FFE8 76FF0C76 FF0E76FF F85689F6 -.V½.v..v..vÒ.v|......Fõ=..u.Ò.. 0000C0
 0005B69A 5016F046 8D006A08 76FF0A76 FF0C76FF 0E76FF01 08E90175 E9EA4688 .FõÒu.Ò...v..v..v..v.j..FÞ.P.Ñ.. 0000E0
 106AF076 FFF276FF 0C76FF0E 76FF0149 E9EA4688 0006E903 7500003D EA468900 ..Fõ=..u.Ò...FõÒ|..v..v..v .vÞj. 000100
 76FF0E76 FF0120E9 EA468800 06E90375 00003DEA 46890000 05DF9A50 16F64680 .F-.P.Ò....Fõ=..u.Ò...FõÒ ..v..v 000120
 46880006 E9037500 003DEA46 89000006 089A5016 F046800E 6A0876FF 0A76FF0C ..v..v.j..FÞ.P......Fõ=..u.Ò...F 000140
 3DEA4689 00000159 9A5016EC 4680106A F076FFF2 76FF0C76 FF0E76FF 00F7E9EA õÒ¼..v..v..v .vÞj..F$.P.Y....Fõ= 000160
 FF0E76FF F85689F6 46890A56 88084688 0061E900 CEE9EA46 880006E9 03750000 ..u.Ò...FõÒo.Òa..F..V..F-.V½.v.. 000180
 E9037500 003DEA46 890000FF FF9A5016 F4468050 16EC4680 0876FF0A 76FF0C76 v..v..v..F$.P.F¶.P......Fõ=..u.Ò 0001A0
 103DFEB5 E9037500 013D0018 E9001EE9 0000EA46 C70026E9 0093E9EA 46880006 ...FõÒ..Ò&.úFõ..Ò..Ò..=..u.Ò.±=. 0001C0
 08EC4688 0059E903 75F8460B F6468BFF DAE9FEFB E9037500 203DFFAA E9037500 .u.Ò`.= .u.Ò«±ÒÒ..F-.F½u.ÒY..F$. 0001E0
```

```
Dump of file SATURN:[PCCOMMON.DUMP.DLL]DA-DSGN.DLL;1 on 18-APR-1990 10:38:46.97
File ID (402,14,0)   End of file block 64 / Allocated 64

Virtual block number 22 (00000016), 512 (0200) bytes

 E9037500 003DEA46 89000004 389A5016 FA468D0C 76FF0E76 FF004EE9 0375EE46 FÝu.ÒN..v..v..F*.P.;....Fõ=..u.Ò 000000
 76FF0E76 FF37FF26 FC5EC400 0004599A 5016FC46 8DFA76FF 0033E9EA 46880006 ...FõÒ3..v*.F=.P.Y...á^=&.7.v..v 000020
 CAC95F5E 1F0000E9 EA4688EA 46890000 FFFF9AEC 76FFEE76 FFF676FF F876FF0C ..v½.v-.vÝ.v$......Fõ.FõÒ...^_èò 000040
 C7FF5C86 89FF5E86 89000088 0000FF60 86C7D88E 049B881E 56570000 A4C8000A ..àÉ..WV.¡...Áú.'...|....^...\.ú 000060
 5016AE46 80026A08 76FF0A76 FF0C76FF 0E76FFFC 4689FE46 89000088 0000FA46 F*..¡...F±.F=.v..v..v..v.j..FÚ.P 000080
 76FF0C76 FF0E76FF 0102E9FF 60868800 07E90375 00003DFF 60868900 0007AE9A .Ú.....'.=..u.Ò....'.Ò...v..v..v 0000A0
 5C868800 27E90375 00003DFF 60868900 0005139A 5016FF5C 868D146A 0876FF0A ..v.j...\..P.......'.=..u.Ò'...\ 0000C0
 60868800 0007D49A FF5CB6FF FF5EB6FF 0C76FF0E 76FF0013 E90375FF 5E860BFF ...^.u.Ò...v..v..Ñ^..Ñ\..å.....' 0000E0
 03949A50 16FF6286 80026A37 FF260277 FF26FF5C 9EC40C76 FF0E76FF 0086E9FF .ÒÑ..v..v.á.\.&.w.&.7j...b..P... 000100
 FFFF5EB6 FF0C76FF 0E76FF00 85E9FF60 86880007 E9037500 003DFF60 86890000 ....'.=..u.Ò....'.Ò...v..v..Ñ^.. 000120
 76FF0E76 FF005FE9 FF608688 0007E903 7500003D FF608689 0000053A 9AFF5CB6 Ñ\..:.....'.=..u.Ò....'.Ò_..v..v 000140
 76FF003C E9FF6086 880007E9 03750000 3DFF6086 89000006 A39A5016 FA46800C ..F*.P.É.....'.=..u.Ò....'.Ò<..v 000160
 80586A08 76FF0A76 FF0C76FF 0E76FF37 FF26FC5E C4000006 C19A5016 FC468DFA *.F=.P.è...á^=&.7.v..v..v..v.jX. 000180
 0ACAC95F 5E1F0000 E9FF6086 88FF6086 890000FF FF9A5016 AE468050 16FF6286 .b..P.FÚ.P.......'...'.Ò...^_èò. 0001A0
 FF9A0876 FF0A76FF 0C76FFC5 76FF0000 FE46C7D8 8E06FAB8 1E565700 0002C800 .à...WV.¡*..ÁúF±...v..v..v..v... 0001C0
 C7D88E08 59681E56 57000006 C8000ACA C95F5E1F 0000E9FE 4688FE46 890000FF ....F±.F±Ò...^_èò..à...WV.¡Y..Aú 0001E0
```

```
Dump of file SATURN:[PCCOMMON.DUMP.DLL]DA-DSGN.DLL;1 on 18-APR-1990 10:3∟.46.97
File ID (402,14,0)   End of file block 64 / Allocated 64

Virtual block number 23 (00000017), 512 (0200) bytes

 FA468900 0007F79A 5016FE46 800C76FF 0E76FF00 FC46C600 00FE46C7 0000FA46 F*..úF±..óF=..v..v..F±.P.%....F* 000000
 8302C200 009AFE76 FF00CA68 0876FF0A 76FF0055 E9FA468B 0006E903 7500003D =..u.Ò...F*ÒU..v..v.hò..v±...ò.. 000020
 0A76FF0C 76FF0E76 FF33FC46 C60030E9 FA468800 06E90375 00003DFA 468908C4 á..F*=..u.Ò...F*Ò0.óF=3.v..v..v. 000040
 FA468800 0003E79A 0C76FF0E 76FFFA46 89000003 CE9A5016 FC468008 6A0876FF .v.j..F=.P.ö....F*.v..v..Ò....F* 000060
 0000FE46 C70000FA 46C7D88E 0888881E 56570000 06C8000A CAC95F5E 1F0000E9 Ò...^_èò..à...WV.¡...ÁúF*..úF±.. 000080
 880006E9 03750000 3DFA4689 000008A9 9A5016FE 46800C76 FF0E76FF 00FC46C6 óF=..v..v..F±.P.`....F*=..u.Ò... 0000A0
 7500003D FA468908 C48308CD 00009AFE 76FF00CA 680876FF 0A76FF00 55E9FA46 F*ÒU..v..v.hò..v±...e..á..F*=..u 0000C0
 16FC4680 096A0876 FF0A76FF 0C76FF0E 76FF59FC 46C60030 E9FA4688 0006E903 .Ò...F*Ò0.óF=Y.v..v..v..v.j..F=. 0000E0
 0ACAC95F 5E1F0000 E9FA4688 00000909 9A0C76FF 0E76FFFA 46890000 08FB9A50 P.«....F*.v..v.......F*Ò...^_èò. 000100
 89000088 0000FE46 C70000EE 46C70000 F446C7D8 8E092288 1E565700 0012C800 .à...WV.¡"..ÁúF¶..úFÝ..úF±..|... 000120
 FE46800C 76FF0E76 FFF64689 F8468900 0088FA46 89FC4689 000088F0 4689F246 F .FÞ¡...F=.F*¡...F½.F-.v..v..F± 000140
 CC680876 FF0A76FF 0189E9F4 46880006 E9037500 003DF446 89000009 409A5016 .P.a....F¶=..u.Ò...F¶Ò...v..v.ha 000160
 0E76FF01 64E9F446 880006E9 03750000 3DF44689 08C48309 6400009A FE76FF00 ..v±...d..á..F¶=..u.Ò...F¶Òd..v. 000180
 0003E903 7500003D F4468900 0005809A 5016F046 800F6A08 76FF0A76 FF0C76FF .v..v..v.j..FÞ.P......F¶=..u.Ò.. 0001A0
 FFF276FF 0F6A0876 FF0A76FF 0C76FF0E 76FF0029 E90375F2 4608F046 8800E1E9 ÒÀ..FÞ.F u.Ò)..v..v..v..v.j..v . 0001C0
 0A76FF0C 76FF0E76 FF00ADE9 0003E903 7500003D F4468900 00FFFF9A 146AF076 vÞj.......F¶=..u.Ò..ÒÚ..v..v..v. 0001E0
```

```
Dump of file SATURN:[PCCOMMON.DUMP.DLL]DA-DSGN.DLL;1 on 18-APR-1990 10:38:46.97
File ID (402,14,0)   End of file block 64 / Allocated 64

Virtual block number 24 (00000018), 512 (0200) bytes

 F6468800 87E90003 E9037500 003DF446 89000007 5D9A5016 F6468014 6A0876FF .v.j..F-.P.]....F¶=..u.Ô..Ô...F- 000000
 5EC40C76 FF0E76FF 006CE903 7502470B 26078B26 FA5EC4FC 5689FA46 89F85688 .V½.F*.V=&^*&..&.G.u.Ôl..v..v.&^ 000020
 E9037500 003DF446 8900000A 759A146A 0876FF0A 76FF0F6A 37FF2602 77FF26FA *&.w.&.7j..v..v.j..u....F¶=..u.Ô 000040
 37FF2602 77FF26FA 5EC40C76 FF0E76FF 0031E903 75F2460B F0468800 3FE90003 ..Ô?..FÞ.F u.Ô1..v..v.&^*&.w.&.7 000060
 FA468300 07E90003 E9037500 003DF446 890000FF FF9A146A F076FFF2 76FF0F6A j..v .vÞj.......F¶=..u.Ô..Ô...F* 000080
 00000789 9AF676FF F876FF0C 76FF0E76 FF0029E9 0375F846 08F6468B FF85E904 .Ô...F-.F½u.Ô)..v..v..v½.v-..... 0000A0
 A09A0C76 FF0E76FF F44689EE 46880003 E9F4468B 0006E903 7500F47E 83EE4689 .FŸ.~¶.u.Ô...F¶Ô...FŸ.F¶.v..v... 0000C0
 00E9F446 8BF44689 "468800 03E9F446 880006E9 037500F4 7E83EE46 89000009 ....FŸ.~¶.u.Ô...F¶Ô...FŸ.F¶.F¶Ô. 0000E0
 00B80000 F046C700  F246C7 D88E09B9 881E5657 000010C8 000ACAC9 5F5E1F00 ..^_èò..à...WV.¡¿..ÄúF ..úFÞ..¡. 000100
 FF0C76FF 0E76FFF4 4689F646 890000B8 FC4689FE 46890000 8BF84689 FA468900 ..F¯.F½¡...F±.F=¡...F-.F¶.v..v.. 000120
 00C2E9F2 46880006 E9037500 003DF246 890000FF FF9A5016 F8468008 76FF0A76 v..v..F½.P......F =..u.Ô...F Ôó. 000140
 03750000 3DF24689 00000A9B 9A5016F4 4680136A 0876FF0A 76FF0C76 FF0E76FF .v..v..v..v.j..F¶.P......F =..u. 000160
 47E90375 02470B26 078B26FC 5EC4FE56 89FC4689 F6568BF4 46880062 E90003E9 Ô..Ôb..F¶.V-.F=.V±&^*&..&.G.u.ÔG 000180
 76FF0E76 FF0026E9 03750257 39260009 E9037407 3926FA56 8BF8468B FC5EC400 .&^=.F½.V*&9.t.Ô..&9W.u.Ô&..v..v 0001A0
 07E90003 E9037500 003DF246 890A1701 E59A0676 FF37FF26 0277FF26 FC5EC40C .&^=&.w.&.7.v..Î....F =..u.Ô..Ô. 0001C0
 9AF476FF F676FF0C 76FF0E76 FF0029E9 0375F646 0BF4468B FFAAE904 FC468300 ..F=.Ô¨..F¶.F-u.Ô)..v..v..v-.v¶. 0001E0

Dump of file SATURN:[PCCOMMON.DUMP.DLL]DA-DSGN.DLL;1 on 18-APR-1990 10:38:46.97
File ID (402,14,0)   End of file block 64 / Allocated 64

Virtual block number 25 (00000019), 512 (0200) bytes

 E9F2468B F24689F0 46880003 E9F2468B 0006E903 7500F27E 83F04689 0000084C L....FÞ.~ .u.Ô...F Ô...FÞ.F .F Ô 000000
 C4830350 005A9A03 F5A81ED8 8E0BA0B8 1E565700 0000C800 0ACAC95F 5E1F0000 ...^_èò..à...WV.¡...Ä.h¥..Z.P...& 000020
 C7000098 46C7D88E 0CC1B81E 56570000 6CC8000A CAC95F5E 1F0000E9 00008804 .¡..Ô...^_èò..àl..WV.¡è..ÄúF...ú 000040
 76FF0E76 FF944689 96468900 00880000 F846C7FC 4689FE46 89000088 0000FA46 F*..¡...F±.F=úF½..¡...F..F..v..v 000060
 80FA76FF 0008E998 46880006 E9037500 00309846 89000009 F39A5016 FA4680DC ..F*.P.µ....F.=..u.Ô...F.ÔÄ..v*. 000080
 0C76FF0E 76FF008A E9984638 0006E903 7500003D 98468900 0008179A 5016FC46 F=.P......F.=..u.Ô...F.Ôo..v..v. 0000A0
 00003098 46890000 FFFF9A50 16F8468D 5016A446 805016A0 46800876 FF0A76FF .v..v..F..P.FÊ.P.F½.P......F.=.. 0000C0
 00309846 890000FF FF9A5016 94468D37 FF26FC5E C40089E9 98468800 06E90375 u.Ô...F.Ô..&^=&.7.F..P......F.=. 0000E0
 3D984689 0000FFFF 9A0876FF 0A76FF50 1694468D 0068E998 46880006 E9037500 .u.Ô...F.Ôh..F..P.v..v.......F.= 000100
 8B9E4689 078B26FC 5EC49C56 899A4689 0E568B0C 46880039 E90003E9 03750000 ..u.Ô..Ô9..F..V..F..V.&^=&...F.. 000120
 0000FFFF 9A006A50 169A468D 0C76FF0E 76FFFA76 FFAA5689 A8468996 56889446 F..V..F .V .v*.v..v..F..Pj...... 000140
 57000008 C8000ACA C95F5E1F 0000E998 46880000 FFFF9A94 76FF9676 FF984689 .F..v..v.......F.Ô...^_èò..à...W 000160
 0C76FF0E 76FFFC46 89FE4689 00008800 00FA46C7 0000F846 C7D88E0C E6881E56 V.¡Î..ÄúF½..úF*..¡...F±.F=.v..v. 000180
 4680FA76 FF0040E9 F8468800 06E90375 00003DF8 46890000 00179A50 16FA4680 .F*.P......F½=..u.Ô...F½Ôâ..v*.F 0001A0
 FF37FF26 FC5EC400 22E9F846 880006E9 03750000 3DF84689 00000035 9A5016FC =.P.5....F½=..u.Ô...F½Ô".&^=&.7. 0001C0
 CAC95F5E 1F0000E9 F8468BF8 46890000 FFFF9A00 6A0876FF 0A76FF0C 76FF0E76 v..v..v..v.j.......F½.F½Ô...^_èò 0001E0

Dump of file SATURN:[PCCOMMON.DUMP.DLL]DA-DSGN.DLL;1 on 18-APR-1990 10:38:46.97
File ID (402,14,0)   End of file block 64 / Allocated 64

Virtual block number 26 (0000001A), 512 (0200) bytes

 0000E900 00B804C4 830CCC00 5A9A040E 681ED88E 0E13881E 56570000 00C8000A ..à...WV.¡...A.h...Z.a..&.¡..Ô.. 000000
 00008800 00FE46C7 0000F846 C7D88E0E 9A881E56 57000008 C8000ACA C95F5E1F .^_èò..à...WV.¡...ÄúF½..úF±..¡.. 000020
 06E90375 00003DF8 46890000 0E369A50 16FE468D 0C76FF0E 76FFFA46 89FC4689 .F=.F*.v..v..F±.P.6....F½=..u.Ô. 000040
 003DF846 8908C483 0C610000 9AFE76FF 00CD6808 76FF0A76 FF008CE9 F8468800 ..F½Ô...v..v.he..v±...a..&..F½=. 000060
 FF0A76FF 0C76FF0E 76FF0000 FC46C700 01FA46C7 0067E9F8 46880006 E9037500 .u.Ô...F½Ôg.úF*..úF=...v..v..v.. 000080
 FF0E76FF 0026E900 03E90375 00003DF8 46890000 0F609A50 16FA468D 036A0876 v.j..F*.P.*....F½=..u.Ô..Ô&..v.. 0000A0
 E90003E9 03750000 3DF84689 00000992 9A5016FA 4680066A 0876FF0A 76FF0C76 v..v..v.j..F*.P......F½=..u.Ô..Ô 0000C0
 56570000 0CC8000A CAC95F5E 1F0000E9 F8468800 00086F9A 0C76FF0E 76FF0000 ...v..v..o....F½Ô...^_èò..à...WV 0000E0
 89F84689 000088FA 4689FC46 89000088 0000FE46 C70000F4 46C7D88E 0E8F881E .¡¢..ÄúF¶..úF±..¡...F=.F*¡...F½. 000100
 F4468800 06E90375 00003DF4 46890000 0EE29A50 16FE468D 0C76FF0E 76FFF646 F-.v..v..F±.P.ã....F¶=..u.Ô...F¶ 000120
 E9037500 003DF446 8908C483 0F060000 9AFE76FF 00CD6808 76FF0A76 FF00C... Ôo..v..v.he..v±......&..F¶=..u.Ô 000140
 00001032 9A5016FA 4680036A 0876FF0A 76FF0C76 FF0E76FF 00A9E9F4 4688000C ...F¶Ô`..v..v..v..v.j..F*.P.2... 000160
 16F6468D 066A0876 FF0A76FF 0C76FF0E 76FF0072 E90003E9 03750000 3DF44689 .F¶=..u.Ô..Ôr..v..v..v..v.j..F-. 000180
 0876FF0A 76FF0C76 FF0E76FF 004CE900 03E90375 00003DF4 46890000 07319A50 P.1....F¶=..u.Ô..ÔL..v..v..v..v. 0001A0
 0C76FF0E 76FF0026 E90003E9 03750000 3DF44689 0000107E 9A5016F6 4680036A j..F-.P.~....F¶=..u.Ô..Ô&..v..v. 0001C0
 0000E900 03E90375 00003DF4 46890000 0F3A9A50 16FA4680 066A0876 FF0A76FF .v..v.j..F*.P.:....F¶=..u.Ô..Ô.. 0001E0
```

Dump of file SATURN:[PCCOMMON.DUMP.DLL]DA-DSGN.DLL;1 on 18-APR-1990 10:38:46.97
File ID (402,14,0)   End of file block 64 / Allocated 64

Virtual block number 27 (0000001B), 512 (0200) bytes

```
B81E5657 000000C8 000ACAC9 5F5E1F00 00E9F446 8B00000F 799A0C76 FF0E76FF .v..v..y....F¶ð...^_èò..à...WV.¡ 000000
0018C800 0ACAC95F 5E1F0000 E90000B8 04C4830E A5005A9A 0427681E 0B8E0F92 ...A.h'..Z.E..á.¡..Õ...^_èò..à.. 000020
89000088 F44689F6 46890000 B80000E8 46C70000 EA46C708 8E10B088 1E565700 .WV.¡¯..ÀüFö..üFÖ..¡...F¯.F¶¡... 000040
F04689F2 46890000 B8FC4689 FE468900 00B8EC46 89EE4689 0000B8F8 4689FA46 F*.F½¡...FY.Fš¡...F±.F•¡...F·.FÞ 000060
06E90375 00003DEA 46890000 FFFF9A50 16F44680 0876FF0A 76FF0C76 FF0E76FF .v..v..v..v..F¶.P......Fö=..u.Õ. 000080
89000011 D39A5016 EC468009 6A0876FF 0A76FF0C 76FF0E76 FF0164E9 EA468800 ..Fõðd..v..v..v..v.j..Fš.P.Æ.... 0000A0
26078826 F85EC4FA 5689F846 89EE5688 EC468800 D0E90003 E9037500 003DEA46 Fõ=..u.Õ..ÕÅ..Fš.VY.F½.V*á^½&..& 0000C0
E9037502 57392600 09E90374 073926F6 5688F446 8BF85EC4 0047E903 7502470B .G.u.ÕG.á^½.F¶.V-&9.t.Õ..&9W.u.Õ 0000E0
00003DEA 46891216 01E59A06 76FF37FF 260277FF 26F85EC4 0C76FF0E 76FF0026 &..v..v.á^½&.w.&.7.v..Í....Fö=.. 000100
F0468008 6A0876FF 0A76FF0C 76FF0E76 FFFFAAE9 04F84683 0075E900 03E90375 u.Õ..Õu..F½.Õ¯..v..v..v..v.j..FÞ 000120
5689FC46 89F25688 F0468800 48E90003 E9037500 003DEA46 8900000C 049A5016 .P......Fö=..u.Õ..ÕH..FÞ.V .F•.V 000140
37FF2602 77FF26FC 5EC40C76 FF0E76FF 002DE903 7502470B 26078826 FC5EC4FE ±á^•&..&.G.u.Õ·..v..v.á^•&.w.&.7 000160
EC4688FF C4E904FC 46830007 E90003E9 03750000 30EA4689 0FE201E5 9A0676FF .v..Í.ã..Fö=..u.Õ..Õ...F•.Õá..Fš 000180
C0EA7E83 E8468900 0012799A EC76FFEE 76FF0C76 FF0E76FF 0029E903 75EE460B .FYu.Õ)..v..v..vY.vš.y....FÕ.-õ. 0001A0
FF0E76FF 0029E903 75F2460B F0468BEA 4689E846 8B0003E9 EA468800 06E90375 u.Õ...FõÕ...FÕ.Fõ.FÞ.F u.Õ)..v.. 0001C0
8B0003E9 EA468300 06E90375 00EA7E83 E8468900 000C909A F076FFF2 76FF0C76 v..v·.vÞ......FÕ.-õ.u.Õ...FõÕ... 0001E0
```

Dump of file SATURN:[PCCOMMON.DUMP.DLL]DA-DSGN.DLL;1 on 18-APR-1990 10:38:46.97
File ID (402,14,0)   End of file block 64 / Allocated 64

Virtual block number 28 (0000001C), 512 (0200) bytes

```
02007800 02005F00 0500DD02 0300220A CAC95F5E 1F0000E9 EA468BEA 4689E846 FÕ.Fõ.FõÕ...^_èò."...¹..._...(.. 000000
05109702 03000000 0411A800 0205A900 0C083B02 0300E000 050AE302 03000000 .....D...À...;...................... 000020
0908B802 0301CE00 090E5402 0300EC00 05124502 03000000 05108800 02006800 .k...Ë.......Ë...š...T...ö...Ü.. 000040
08024E02 03000000 09100500 0200F800 0502EA02 03000000 0700C600 02015700 .W...ó.......õ...½...Í.......N.. 000060
050FBE02 0304E800 0A064302 03010600 05017002 03009000 0200A001 03016800 .h...U.......)........C...Š.../.. 000080
05105802 0304FC00 0A006602 0300A300 05100C02 03056A00 0C086F02 03009700 .....o...j.......Ë...f...•...X.. 0000A0
05114802 03051300 0A112202 03019400 09048202 03057900 0C00EC02 03008100 .Ý...š...y............"........K.. 0000C0
050A4102 03058800 0C060E02 03019F00 09010402 03012E00 07008702 03008000 .§..........å.......B.......A.. 0000E0
070DA802 03000600 050B1B02 03059700 0C0E7E02 03013900 070DFA02 0300C900 .è...*...9...~............•.. .. 000100
FF0E76FF D88EFFFF B81E5657 00012CC8 00000000 00000000 00000000 00014600 .F...............à..WV.¡...À.v.. 000120
6A006A12 C483FFFF 00469A50 16FED486 80081868 1E0676FF 0876FF0A 76FF0C76 v..v..v..v..h....à±.P.F....á.j.j 000140
FFFF9A01 6A016A00 00FFFF9A 10406800 6A083068 1E5016FE D4868001 6A006A01 .j.j...à±.P.h0.j.hà......j.j.... 000160
76FF016A 006A016A 006AD88E 0008B81E 56570000 00C8C8C9 5F5E1F00 00E90000 ..Õ...^_èùà...WV.¡...Àj.j.j.j..v 000180
1E085E68 1E306A00 12F90374 FFFF3000 0000459A 206A006A 0845681E 0676FF08 ..v..hE.j.j .E...=..t.Õ..j0.h^.. 0001A0
83088E00 62881E56 5700012C C8C8C95F 5E1F0000 E90AC483 FFFF0000 9A088068 h........á.Õ...^_èùà¸..WV.¡b..À. 0001C0
0CC48300 2800469A 501AFED4 868008A9 681E0876 FF0A76FF 002FE903 7500067E ~..u.Õ/..v..v..h¯...à±.P.F.(..á. 0001E0
```

Dump of file SATURN:[PCCOMMON.DUMP.DLL]DA-DSGN.DLL;1 on 18-APR-1990 10:38:46.97
File ID (402,14,0)   End of file block 64 / Allocated 64

Virtual block number 29 (0000001D), 512 (0200) bytes

```
90C8C95F 5E1F0000 E90AC483 00960000 9A5016FE D48680OC 76FF0E76 FF1076FF .v..v..v...à±.P......á.Õ...^_èù. 000000
000700C8 00020088 0002007D 01030000 000500E2 00020005 0001004E 01030005 ....N.......ã........}... ...ü... 000020
01C80001 B81F0200 3E89088E FFFFB81E 00000000 00000000 000900AB 00020000 ....................¡...À.>. .¡..ü. 000040
00000000 00000000 00000000 00000000 00000000 00000000 00000800 02000200 ................................ 000060
A8C78806 7EC4D1F7 AEF2FFFF 89C033C0 8ED88CFE 880A76C5 1EDE88D7 88EC8855 U.š.▪.ß.év..±.À.â3ā¿..·Ú¼Ìá-..ú^ 000080
89EC4680 56570000 16C8CB5D C28C1FFA 8BF38BA4 F3C913A5 F3E90149 A4027401 .t.ËÌÌÕµË.èµË.µ.*..õÌùà...WV.Fš. 0000A0
06478926 08568806 4608420A 47C626F8 5EC4FE56 8CFC4689 0E468DFA 568CF846 F½.V*.F..F•.V±á^½&6G.B.F..V.&.G. 0000C0
023C9A53 060A76FF 0C76FFFC 76FF167F FF0447C7 26025789 26078926 08578926 &.W.&..&.W.&üG.....v•.v..v..S.<. 0000E0
E8058826 02478E26 07FF263F 8826C02A 1278044F FF26F85E C4F0880C C483008B Ë..á..Þá^½&.O.x.*â&.?&..&.G.&..$ 000100
26085EC4 56570000 08C8C8C9 5F5EC68B 06C483FF FF00C69A 006A53FA 76FF900F ...v*Sj..ó....á..ó^_èùà...WVá^.& 000120
46891900 05E001C1 03E001C8 8BF9F700 0C89990D 0C20C388 FA4689E4 2A08478A .G.*ð.F*.ü-...¿..¼*¯.àÌÀ.èÌÀ....F 000140
5EC49001 28E9FFFF B8200A4F 8026085E C40F7440 0A47F626 0774830A 47F626F8 ½&-G..t.&-G.ât.á^.&.O. ¡..Õ+..á^ 000160
EF0A6780 26020A4F 802690E2 EB000004 47C72620 0A4F8026 0E74010A 47F62608 .&-G..t.&.O. &üG...Šã.&.O..&.g.y 000180
060868F9 F7000C89 99000C20 C38B4C75 0C0A47F6 26FC7689 F0880447 8926C028 +ä&.G..Þ.v•&-G..uL.ü-....¿..¼*kÀ. 0001A0
FF0A7E81 16750024 087E810E 74016F0A 7E810775 0018087E 81377501 19008 7F6 -....u7.~...u..~.o.t..-.$.u..-.. 0001C0
5EC404C4 830C51E8 0876FF0A 76FF0C75 C00802C4 8301E210 549AFA76 FF0F75FF .u..v*.Ì.ã..á..âu..v..v.ÒQ..á.á^ 0001E0
```

```
Dump of file SATURN:[PCCOMMON.DUMP.DLL]DA-DSGN.DLL;1 on 18-APR-1990 10:38:46.97
File ID (402,14,0)   End of file block 64 / Allocated 64

Virtual block number 30 (0000001E), 512 (0200) bytes

 085E8B67 74011900 87F60608 6BF9F700 0CB9990D 0C20C38B 1575080A 47F62608 .&-G..u..ù-...¿..%*kA.-....tg.^. 000000
 89264802 458BF87E 8B025789 26078926 4008578B 2606478B 2606772B 26378B26 &.7&+w.&.G.&.W.a&..&.W..-½.E.H&. 000020
 F6FA5E8B 19EBFC46 8908C483 02000EA4 9AFA76FF 0677FF26 5256167E F60B0447 G..~~.VR&.w..v*.Ê....á..F•$..^*- 000040
 2606468A 065FC426 085EC408 C4830223 0E669A53 006A006A 026A0F74 201F1187 ... t.j.j.j.S.f.#..á.á^.&á_..F.& 000060
 0374FC76 39FC468y 08C48300 900EA49A FA76FF50 1606468D 560001BE 17EB0788 ..$.f..V.F..P.v*.Ê....á..F=9v•t. 000080
 701E8C22 6EA32274 88017910 789A000A B8EC8B55 CBC95F5E E42A0646 8AFECCE9 Ôa±.F.*ð^ èùJ.$¡...x.y.¡t"Ên"..p 0000A0
 00226A06 C7224616 892244A3 08565806 468B2260 1689225E A3105688 0E468822 ".F..V.È^ⁿ..'".F..V.ÊD"..F"ú.j". 0000C0
 4AA3224E A3C02800 01226C06 C7030BE9 037425F6 7E80038D E9000022 6806C700 .ú.h"..Ô...--%t.Ô..ú.l"..+àÈN"ÈJ 0000E0
 260A5EC4 002023D4 06C7225C A32242A3 2248A322 62A32264 A3224CA3 2266A322 "Èf"ÈL"Èd"Èb"ÈH"ÈB"È\"ú.à# .á^.& 000100
 C7224E06 FF00752B 3F80260A 5E88903E EB003023 D406C70A 46FF4975 30017F80 ...0ul.f.ú.à#0.$>..^.&.?+u...N"ú 000120
 224206FF 9014EB22 6206FF1A 7500224E 3E830E75 203F8026 9028EB00 00226206 .b"..$(.&.? u..>N".u...b"$....B" 000140
 C4830978 E80E5098 078A260A 5E880A46 FF225C06 FFC7752D 3F80260A 5EC400EB $.á^.&.?-uú..\".F..^.&...P.Òx..á 000160
 22723E83 0C56890A 468908C4 8308C7E8 0E227268 1E0A76FF 0C76FFDD 75C00B02 ..âu1.v..v..hr".Òú..á..F..V..>r" 000180
 D406C706 75302304 3E830074 00225C3E 832272A3 D8F72272 A1225C06 FF0C7D00 .)...\"Àr"%AÈr".>\".t..>à#0u.ú.à 0001A0
 83097BE8 0E226C65 1E0A76FF 060A46FF 226406FF 2D752E3F 80260A5E C4002023 # .á^.&.?.u-..d".F...v..hl".Ò(.. 0001C0
 98078A26 0A5EC422 640EFF00 01226C06 C70A7D00 226C3E83 0C56890A 468908C4 á..F..V..>l(".).ú.l"....d"á^.&... 0001E0

Dump of file SATURN:[PCCOMMON.DUMP.DLL]DA-DSGN.DLL;1 on 18-APR-1990 10:38:46.97
File ID (402,14,0)   End of file block 64 / Allocated 64

Virtual block number 31 (0000001F), 512 (0200) bytes

 7500224C 3E830002 224C06C7 0675006C 3D2B7400 68304074 004E3D3D 7400463D =F.t==N.t@=h.t+=l.u.ú.L"...>L".u 000000
 0001224C 06C79002 4EE91C75 003F8026 0A5EC40A 46FF0375 4C3F8026 0A5EC409 .á^.&.?Lu..F.á^.&.?.u.ÒN..ú.L".. 000020
 473D0A74 00453DF8 46899807 8A26C8EB 0008224C 06C7D0EB 0010224C 06C7D8EB $Áu.L"..$Áu.L"..$à&....F½=E.t.=G 000040
 00633D01 91E9037E 78740069 3DF8468B 20F84683 224A06FF 08750058 30057400 .t.=X.u...J".F½ .F½=i.tx-.Ô..=c. 000060
 5E1EC415 7502224C 3E839001 59E90140 E9037500 253D0152 E9037E01 3FE90375 u.Ô?.~.ÒR.=%.u.Ò@.ÒY...>L".u.á.^ 000080
 83078926 2268A11F C426225E 1EC40DE8 00000247 C7260789 262268A1 1FC42622 "&á.Àh"&..&úG...$.á.^"&á.Àh"&... 0000A0
 0A47F626 22441EC4 018DE903 74002268 3E830170 E9037500 226A3E83 04225E06 .^"..>j".u.Ôp..>h".t.Ô§.á.D"&-G. 0000C0
 EB02C483 019EE80E 0A6A0000 224206C7 226606FF 01ACE9FF FF8801AF E9037520  u.ÔÈ.¡..Ô¯...f"ú.B"..j..Ò...á.$ 0000E0
 E9037508 224C3E83 0004226C 06C72264 06FF224A 06FF2248 06FFF2EB 086A90C3 ú.j.$ ..H"..J"..d"ú.l"...>L".u.Ô 000100
 5C3E83FA 46892272 A1287422 720639FA 4689224C A3C02B7A 7401224C 3E830081 ...>L".tz+àÈL".F*9.r"t(Àr".f*.>\ 000120
 832272A3 C028027D C00B2272 A1052272 2E839090 13EB0000 227206C7 0A740022 ".t.ú.r"..$.....r".Àr".à).+àÈr". 000140
 225C3E83 227400FA 7E8302C4 83048DE8 0E3A6A02 C4830130 E80E106A 02225E06 .^".j..ÒO..á.j:.Ò...á..~*.t".>\" 000160
 2E830000 227206C7 9007EB22 72A3C02B 027DC00B 2272A300 052DFA46 88157400 .t..F*-..Èr".à).+àÈr"$..ú.r".... 000180
 026EE80E 006A90FF  ̄E9106A FF10E902 225E0683 02C48300 F1E80E10 6A04225E ^".j..Òp..á...^".Ô..j.Ò?..j..Òn. 0001A0
 7500643D 90FF21E9 0428E80E 256AFF2A E90349E8 0EFB76FF F4EB016A 90FF39E9 Ò9..j.$¶.v½.Ò1.Ò*.j%.Ò( Ò1..=d.u 0001C0
 46880A4E FF0C568B 0A468809 7400224C 3E83DA7E 00673005 7C00653D FF0CE903 .Ô..=e.|.=g.-O.>L".t..F..V..N..F 0001E0

Dump of file SATURN:[PCCOMMON.DUMP.DLL]DA-DSGN.DLL;1 on 18-APR-1990 10:38:46.97
File ID (402,14,0)   End of file block 64 / Allocated 64

Virtual block number 32 (00000020), 512 (0200) bytes

 7030FEE4 E9037500 6F3DFE80 E9037500 6E3D903A EBFE5689 FC468940 0C56880A ..V.@.F•.V±$:.=n.u.Ô.±=o.u.Òð±=p 000000
 46FF90B1 EBFF79E9 03750078 3DFEB9E9 03750075 3D8F7400 733DFEE0 E9037500 .u.ÔÁ±=s.t.=u.u.Ò¿±=x.u.Òy.$Y..F 000020
 76FF500A 462BC38B EC75253C 0474C00A F6468807 8A26FC5E C4FC46FF 9034EB0A .$4..F=á^•&...F-.àt.<%u$.ú+F.P.v 000040
 F6468807 8A260A5E C40C5689 0A4689FE 568BFC46 8B06C483 044CE80E 0A76FF0C ..v..ÒL..á..F•.V±.F..V.á^.&...F- 000060
 56570000 12C8CBC9 2268A1FE 51E90374 200A47F6 2622441E C4FC63E9 0374C00A .àt.Òc•á.D"&-G. t.ÒQ±Àh"èúà...WV 000080
 3E830774 02224C3E 83226606 FF04740A 067E8300 20230406 C7067400 22643E83 .>d".t.ú.À# ..~..t...f".>L".t..> 0000A0
 3E83902C E804225E 0683FE56 89FC4689 02578826 07882622 5E1EC419 7510224C L".u.á.^"&..&.W..F•.V±..^".$,..> 0000C0
 45879907 8B26225E 1EC40CEB 0000FE46 C7FC4689 07882622 5E1EC411 74002266 f".t.á.^"&...F•uF±..$.á.^"&....F 0000E0
 C0289003 EB06468B 0674FE46 08FC4688 0E740022 423E8302 225E0683 FE5689FC •.V±..^"..>B".t..F•.F±t..F.$..+à 000100
 067E832B 7000FE7E 83517500 22663E83 F45689F2 46892270 1688226E A12302A3 È0#Àn"..p".F .V¶.>f".u1.~±.)+.-. 000120
 FE5689FC 46890AF7 00028308 F7FE5688 FC46882D 07C626F2 46FFF25E C41D750A .u.á^ .F &ó.-.F•.V±%A.0.%O.F•.V± 000140
 76FFFE76 FF501E06 76FFFA5E 8CF84689 22508800 00F646C7 9006E800 01F646C7 úF~..$..úF-..¡P".F½.^*.v..P.v±.v 000160
 0E8804C4 83024510 329AF876 FFFA76FF 45740022 643E830A C4830729 104A9AFC •.J.)..á..>d".tE.v*.v½.2.E..á... 000180
 05EBF27E C4F04E8B 00002302 06C70675 0823023E 83007EC9 08F04E89 C828226C l"+à.NÞ.è~..>0#.u.ú.0#...NÞá--$. 0001A0
 C4F276C5 EE5E8C22 4A0E88F0 4E89F445 8CF27E89 F47FC008 49C18847 3005C626 &ó.0G.è1.á.¶.-·.F¶.NÞ..J".^Ÿév·á 0001C0
 8CF27689 E375003F 8026F846 FF46202C 80037C61 3C0774C9 08048807 8A26F85E ^Y&.....èt.<a|.., F.F½&.?.u0.v·. 0001E0
```

```
Dump of file SATURN:[PCCOMMON.DUMP.DLL]DA-DSGN.DLL;1 on 18-APR-1990 10:38:46.97
File ID (402,14,0)   End of file block 64 / Allocated 64

Virtual block number 33 (00000021), 512 (0200) bytes

02E80001 89057500 F67E830B 74226206 0B224EA1 14750022 663E83EE 5E8EF45E ^¶.^Y.>f".u.ÀN"..b"t..--.u....$. 000000
225EA100 018E1874 00067E83 56570000 10C8CBC9 5F5E02C4 8302FFE8 0E50C028 +àP.Ò...á.^_èùà...WV.-..t./...^" 000020
078B2622 5E1EC413 74J8224C 3E83008F E902225E 0683FA56 89F84689 2260168B ..'".F½.V'..^".Ò...>L".t.á.^"&.. 000040
225E0683 FA5E8CF8 4689FC46 89078B26 225E1EC4 10E8FA56 89F84689 02578B26 &.W..F½.V'$.á.^"&...F•.F½.^'..^" 000060
8908C18B 097500FC 7E83900A EB088AB8 1575FA46 0BF8468B 0E740822 4C3E8304 ..>L".t..F½.F'u.¡u.$...-•.u.¡è.. 000080
900EE822 6C0E8B1C 74226436 39F62BF4 5689F246 89FA568B FB468BFA 5E8CF846 F½.^'.F½.V'.F .V¶+-96d"t...l"$.. 0000A0
75003F80 26F246FF F25EC446 90EDEB10 7ECE3B46 1574003F 8026F246 FFF25EC' á^·.F·&.7.t.F;o-.$U.Fá^·.F·&.?.u 0000C0
B3E80EFB 76FFFA76 FF5602C4 830159E8 0E570875 00225C3E 83FE2B22 723E8BF5 ·.>r"+±.>\".u.W.ÒY..á.V.v'.v½.Ò* 0000E0
8B225EA1 000006C8 90C8C95F 5E02C483 013CE80E 57087400 225C3E83 06C48301 . á..>\".t.W.Ò<..á.^_èù.à...À^". 000100
83FA4688 C02A9003 EB018005 7547067E 83067467 067E83FE 5689FC46 89226016 .'".F•.V±.-.gt..-.Gu. .$..*à.F'. 000120
FF000122 6C06C706 7500226C 3E830D74 00FA7E80 0006226C 06C70675 0022643E >d".u.ú.l"...-'.t..>l".u.ú.l"... 000140
EC1EFF26 2160068E FC76FFFE 76FF226E 36FF2270 36FF0676 FF226C36 FF224A36 6J".6l".v..6p".6n".v±.v•..'1&..$ 000160
1EFF2621 60068E22 6E36FF22 7036FF14 75002242 3E831B74 00FA7E80 0EC4830C ..á..-'.t..>B".u..6p".6n"..'1&.. 000180
25216006 8E226E36 FF227036 FF147500 226C3E83 18740022 423E8304 C4830CF0 Þ..à..>B".t..>l".u..6p".6n"..'1& 0001A0
75FFFE76 FF187422 62060822 4EA10000 230206C7 08225E06 8304C483 0CF81EFF ..½..á...^".ú.0#..ÀN"..b"t..v±.v 0001C0
90C8C901 29E80E50 C02B02EB 00018805 74C00B04 C4830CFC 1EFF2621 60068EFC •..'1&..•..á..àt.¡..$.+àP.Ò).èù. 0001E0

Dump of file SATURN:[PCCOMMON.DUMP.DLL]DA-DSGN.DLL;1 on 18-APR-1990 10:38:46.97
File ID (402,14,0)   End of file block 64 / Allocated 64

Virtual block number 34 (00000022), 512 (0200) bytes

2607FF26 37882606 468A1478 044FFF26 22441EC4 3C750022 6A3E8356 000000C8 à...V.>j".u<á.D"&.O.x..F.&.7&..& 000000
6A06FF07 754006C4 830A0100 C69A0676 FF532246 36FF10EB E42A0488 2602478E .G.&..*ò$..6F"S.v..ó....á.@u...j 000020
507EF60B 06768857 7500226A 3E835657 000002C8 90CBC95E 226806FF 9005EB22 "$....h"^èù.à...WV.>j".uW.v..--P 000040
4EC58B22 6A06FF04 754006C4 830A6900 C69A2304 36FF2244 36FF2246 36FF1BEB $..6F".6D".6à#.6.i..á.@u...j".6N 000060
F42A0589 2602478E 2607FF26 3F8B2623 D4A0D478 044FFF26 22441EC4 1E7EC008 .à~.á.D"&.O.xà.à#&.?&..&.G.&..*ó 000080
6A3E830A 76885657 000002C8 CBC95F5E 22680601 06468807 7500226A 3E8304E8 $à.>j".u..F...h"^ èùà...WV.v..>j 0000A0
754006C4 830A0800 C69A5098 078A2606 5EC42244 36FF2246 36FF22EB 5E750022 ".u^$".6F".6D"á^.Ï...P.ó.U..á.@u 0000C0
C4078A26 065EC4CD 78044FFF 2622441E C42574C0 084EC688 0646FF22 6A06FF04 ...j".F..óN.àt%á.D"&.O.xeá^.&..á 0000E0
06010A46 88077500 226A3E83 CAEBE42A 05882602 478E2607 FF263F8B 2622441E .D"&.?&..&.G.&..*ó$ò.>j".u..F... 000100
FA4689FC 4689C02B F65689F4 46892270 1688226E A1560000 0CC8CBC9 5F5E2268 h"^ èùà...VÀn"..p".F¶.V-+à.F•.F* 000120
83057510 23023E83 06762BF0 28F84689 04C48307 1410329A F476FF52 22723688 .6r"R.v¶.2....á..F½+Þ+v..>0#.u.. 000140
23043E83 1975203F 8026F45E C4227500 225C3E83 4E017508 23023E83 08EB02EE Y.$..>0#.u.N.>\".u"á^¶&.?-u..>à# 000160
077EF608 08743023 D43E83F8 4EFF02C4 83FE71E8 0E509807 8A26F446 FF127530 Ou..F¶&...P.Òq±.á..N½.>à#0t..--. 000180
E80EFC46 FF077400 23D23E83 0066E80E FA46FF07 7400067E 831B7400 225C3E83 .>\".t..-..t..F'.Òf..>0#.t..F•.Ò 0001A0
39E80E04 7500FA7E 830A7400 067E8302 C483FE7E E80E5629 7500225C 3E830070 p..>\".u)V.Ò-±.á..-..t..-'.u..Ò9 0001C0
83FEB5E8 0EF476FF F676FFF8 76FF0040 E80E0475 00FC7E83 0A740023 D23E8300 ..>0#.t..-•.u..Òa..v½.v-.v¶.Òç±. 0001E0

Dump of file SATURN:[PCCOMMON.DUMP.DLL]DA-DSGN.DLL;1 on 18-APR-1990 10:38:46.97
File ID (402,14,0)   End of file block 64 / Allocated 64

Virtual block number 35 (00000023), 512 (0200) bytes

7400224E 3E83C8C9 5E02C483 FE38E80E 56002023 D406C70E 7400225C 3E8306C4 á..>\".t.ú.à# .V.Ò8±.á.^èù.>N".t 000000
1023D23E 8302C483 FDC8E80E 306AC802 C483FDD2 E80E5000 20B803E8 002BB805 .¡+.$.¡ .P.Ò0».á.ùj0.Òà».á..>0#. 000020
56570000 06C8C802 C483FDAA E80E5000 78B803EB 00588805 7400224A 3E831775 u..>J".t.¡X.$.¡x.P.Ò ».á.ùà...WV 000040
900E80A 46FF0222 5E068337 8B26225E 1EC41275 2A3F8026 0A5EC400 01FE46C7 úF±..á^.&.7*u.á.^"&.7..^"..F.$'. 000060
3F7C303C FA468307 8A260A5E 8BF6280A 46FFFFFF FE46C708 752D3F80 260A5EC4 á^.&.?-u.ú°±...F.+-.^.&...F'<0|? 000080
8A2618 7F 393D3026 06E8FB88 00302304 06C70675 303C0A75 22643639 3B7F393C <9.;96d"u.<0u.ú.à#0..«$.&.=9..&. 0000A0
880C468C 0A7E890F 7D303080 2647F188 30E983C8 03E101CE 0302E1C1 CE889805 ...òeÀ..oıÀ.à.Ò0.þG&.=0)Ò.-..F.. 0000C0
468908C8 88570000 04C8CBC9 5F5E0C56 880A4688 37892606 5EC4F088 EEF7FE46 F±%Y.þá^.&.7.F..V.^ èùà...W¡à..F 0000E0
468CFC7E 890001B8 F4750038 26117400 3D802647 01E8FC7E C4064E8A FE5E8CFC •.^±.N.á~•$.G&.=.t.Ï8.u¶¡...-•.F 000100
E0C65800 00FFFF9A 5016C488 50EC8855 90C8C95F C028FE46 8CFC7E89 9009E8FE ±$...-•.F±+à_èù.U.$P.á.P.....X.À 000120
E5880001 8809C511 8C9A0386 E80021E8 0000FFFF 9A08CE68 1E08D068 1E1F0AA3 È...hÀ..ho......Òl.ÒR....é.¡...l 000140
FFB90800 06EFFF33 0000B81E 080616FF 00FF680C F600A69A 0CE90052 9A50CB50 ]ùP.R.Ò..Ï.-.h....•..£..3...À.¿. 000160
74AEF2C0 330874CA 88A6F3CB 88D1880C DABE3174 00308026 47017500 3080267F .&.=.u.G&.=.t1/O..¡.ùµ!.òt.3à·Ùt 000180
1FEDEBAA C20A0572 412CAC92 C4E0C00E 72412CAC 1F118F1F F788071E 061CEBE7 Ò$.....%.€..¯,Ar.àÀ..¯,Ar..ó^$U. 0001A0
00A69A50 00FF880C E81EFF04 74000CEA 3E830CFB 00A69A50 00FCB8EC 8B5500C3 ú.U.$¡•.P.Ï.«..>ò..t...Ò.¡..P.Ï. 0001C0
74964010 74C23BAD 216A6E06 5688C08E D83E0161 885756EC 8855CB5D E588005C \..Ï)ùW.$VW¡a..A.à.V./j!U;òt.@.t 0001E0
```

Dump of file SATURN:[PCCOMMON.DUMP.DLL]DA-DSGN.DLL;1 on 18-APR-1990 10:38:46.97
File ID (402,14,0)   End of file block 64 / Allocated 64

Virtual block number 36 (00000024), 512 (0200) bytes

```
0D769A06 76FF57EC 88550002 CA5DE588 5E5F96E8 E8F788AE F2FFFF89 C033970C ..3ā¿..·Ô.%$$._^.İ]ò..U.ŝW.v..v. 000000
9A501651 521E5300 028BC488 504901F7 AEF2FFFF 89C033FA 88921F74 C0080D70 p..ât...ᵃ3â¿..¯Û%1IP.6E..S.RQ.P. 000020
F9F7000C 8999000C 20044688 212206FF 000004C8 0002CA5D E5885F58 0000FFFF ....[_.İ]ò..à....."!.F.-...¿..%ᵃ 000040
26045EC4 02C48300 8013479A 020068FE 5E8CFC46 89190005 E0D1C103 E0D1C888 .àîÁ.ĚîÁ....F•.^±h...G.¯..á.á^.& 000060
26045EC4 9021E802 000247C7 26FC5EC4 080A4F80 261174D0 08085789 26064789 .G.&.W..Āt.&.O..á^•&úG...Š!.á^.& 000080
26045EC4 00010247 C726FC5E C4085789 26064789 2640FE56 88FC4688 040A4F80 .O...F•.V±ə&.G.&.W.á^•&úG...á^.& 0000A0
1F0F1E38 065E88EC 8855C3C9 00000447 C7260257 89260789 26085788 26064788 .G.&.W.&..&.W.&úG...èûU.ŝ.^.;... 0000C0
FF9A5116 0C76FF08 76FF0A76 FF53CC88 04EC8304 78E9046C E9C03300 098A0872 r.¤..3èÔl.Ôx..ŝ..ëS.v..v..v..Q.. 0000E0
0F1E3806 5E880CEC 83EC8855 00C85DE5 88FD1F11 A78091E1 75C0855A 590000FF ...YZ.â:Å..Ī..».İ]ù.U.ŝ.ŝ..^.;.. 000100
9A5016F4 468D5141 415151C9 33531274 201F1187 F6042BE9 C0330009 BA08721F .r.¤..3èÔ+.-... t.S3èQQAAQ.F¶.P. 000120
885657FC FC4689FE 4689C033 0856C50A 468EFA5E 8C667480 1F1187F6 00000E8F ....-....tf.^ᵃ.F.éV.3â.F±.F••WV. 000140
16FA8804 88E22800 808ADC88 02EC8338 75AEF20A 8049E30C 4E88F866 89F288FA ᵃ.·.f%.N.DI¯.·Ûu;.ŝ..Éα..+ã.â.ᵃ. 000160
AA001FE8 0375F839 0D80009A E9002BE8 F4E2AA1A 74FB3800 740A3CAC 0C4E8807 ..N.¯<.t.;«t.´ã¶Ô+.Ô..¯.;«u.Ò..´ 000180
53500E07 10789AFF FCB87AE8 0093E9FA 5E8E5F5E E1E80014 E8E2E8FC 46FF0A80 ¯..F•$âÒ..ŠÃ^_.^ᵃÕ..Šz|•..x...PS 0001A0
881175C0 0800000D D09A5016 F4468D51 521E5306 5E881FE3 CA2BCF88 1F061E51 Q....û+ðD..^.Š.RQ.F¶.P.Å....âu.. 0001C0
00013D0D 74006030 1874C008 08C4831F C3FA8852 58591F07 740B08FE 5E01F45E ^¶.^±.Ût..Y[X.ᵃû..á..ât.=m.t.=.. 0001E0
```

Dump of file SATURN:[PCCOMMON.DUMP.DLL]DA-DSGN.DLL;1 on 18-APR-1990 10:38:46.97
File ID (402,14,0)   End of file block 64 / Allocated 64

Virtual block number 37 (00000025), 512 (0200) bytes

```
085E880A 5E8E0E74 401F1187 F6FE5E8E 26E8F900 208A03E8 001CBA08 7500098A ¤..u.¤..Š.¤ .ᵃ$&.^±-...ət..^..^. 000000
0472FA5E 8E5F5EF8 6688FC46 28FE4688 06E8F9C0 33001CBA 0EE8F803 751A3F80 .?.u.%Š.¤..3âᵃŠ..F±+F=.f%^_.^ᵃr. 000020
9A5016F4 468D5152 1E530856 C51EEEE8 C1880475 C9080C4E 88030FE9 C85DE588 .İ]ûÔ...N..èu..èŠŸ.éV.S.RQ¯F¶.P. 000040
0020BAC7 E8001CBA CC750009 BA00013D 00740060 3D1774C0 081F071E 00000F67 g.......ât.=m.t.=..¤..uëα..Šûα . 000060
EBC03300 1CBAA6E8 02751A3F 80260A88 0A74401F 1187F687 75C008F4 4688C2E8 Šò.F¶.âuñ-...ət..Ö&.?.u.Š|α..3âŠ 000080
835756EC 885500C8 5DFA8891 49D1F7AE F2FFFFB9 C033067E C4D788EC 885500A3 Ê.U.ŝ.•6-.3â¿..·Û%||..ᵃ]ù.U.ŝVWᵃ 0000A0
E80001B8 0574401F 1187F60C 7C00FB83 117D1F0F 1E38065E 88EC8855 0442E900 .Ôθ.U.ŝ.^.;...}..«.|.-...ət.|..Š 0000C0
75400D06 A1C85152 E3880572 0D0A1E38 08720828 DC885A59 00C85DE5 88C03302 .3â.İ]ù.YZ.É+Är.;...r..DRQûÀ..əu 0000E0
9A521650 1653C488 50871F11 A780048B 5200028B 00062EFF 5152FC5C E9C03305 .3âÔ\•RQ....£..R.â.Ī..ñP.6S.P.R. 000100
885A0479 481F118F 08088106 75000230 07740001 30408112 7558C008 0000FFFF .....âXu.Ÿə=..t.*..u.Ÿ.....KyâZ. 000120
FF00038B C28C2142 06C401AE E9037321 3A1EFFD8 33C28C21 3E06C41E E3213C0E .<ID.6.>!.63Û..:!s.ÔÛ.6.B!.6£... 000140
0E016A08 74214A30 21468800 73E82146 8F21468E 007CE821 468F2146 8E213A1E .:!/F!«FIÒ|./F!«FIÒs.¡F!=J!t.j.. 000160
11149A00 6A006A03 6A0051E8 214A8F21 468ED88E 007C88C3 0000FFFF 9A111968 h.......û¡|..Ä/F!«J!ÒQ.|.j.j.... 000180
8F214A8E EC885503 E80031E8 214A8F21 468E003A E823D68F 23068EEC 88550000 ..U.Š/ø#«ø#Ò:./F!«J!Ò1.Š.U.Š/J!« 0001A0
07E3213C 0E880000 FFFF9A50 06468A50 C033001A E8214A8F 214A8E00 23E8214A J!Ò#./J!«J!Ò..3âP.F.P.......<ID. 0001C0
000014C8 00C3EEE8 1DFFF274 02450805 8804EF83 0E73F738 C3213A1E FF0002B8 £....:!û;%6..ÿ....E.t·..ŠŸû.à... 0001E0
```

Dump of file SATURN:[PCCOMMON.DUMP.DLL]DA-DSGN.DLL;1 on 18-APR-1990 10:38:46.97
File ID (402,14,0)   End of file block 64 / Allocated 64

Virtual block number 38 (00000026), 512 (0200) bytes

```
5689F646 89F25689 F04689C0 2808D016 8800F0E9 037508D0 3639FF28 F6285657 WV+-+.96Å.u.Ôþ...Å.+â.Fþ.V·.F-.V 000000
03767FFF FE814619 74C0080A C4831200 145A9A0C DA681EF6 76FFF876 FF0C6AF8 %j..v%.v-.hÖ..Z....6..ât.F.±..v. 000020
5E88F475 003F8026 F646FFF6 5EC40CE8 47EA7500 3F8026F6 46FFF65E C4008CE9 Ô¥.á^-.F-&.?.uôGŠ.á^;.F-&.?.u¶.^ 000040
4513479A 56EE5689 EC468904 C483120F 14029A04 6A500145 808A7500 3F8026F6 -&.?.uα.E.Pj.......6..F&.VŸV.G.E 000060
A3EE5688 EC468866 74C208FC 46886074 EE4608EC 4688FE56 89FC4689 02C48312 ..6..F•.V±.F&.FŸtm.F•.ôtf.F&.VŸÈ 000080
5EC42C74 C00B0AC4 830F4C14 5A9A0CDA 681EF076 FFF276FF 0C6A2119 16892117 .!...!j..v·.vþ.hÖ..Z.L..á..ât,á^ 0000A0
46FFFC5E C4078A26 F046FFF0 5EC404EC 46830257 89260789 26FE5688 FC4688EC &.F•.V±&..&.W..F&.á^þ.Fþ&..á^•.F 0000C0
5EA77500 3F8026F0 5EC4F475 003F8026 F046FFF0 5EC4E8E8 0E74C00A 078826FC •&...ât.ŠÒá^þ.Fþ&.?.u¶á^þ&.?.uĪ^ 0000E0
080B070A 0C090C08 0C070906 0D051804 02030202 1601FA58 E9000288 90C8C95F _èù.¡..ÔXᵃ...................... 000100
1C70206D 006C0859 00570053 00520243 00410235 02121211 0010120F 1600160C ............5.A.C.R.S.W.Y.l.m p. 000120
FFFF881F 0616891F 00A31608 000008D7 02CE08A4 00840982 0A810A80 16060972 r...........É.ö.•.....È.......¡.. 000140
073A2E18 75E40A00 2489129A 881F00A3 C85DE588 99FFFFB8 0008E8CB 5DE58899 ..İ]ûÒ..¡....İ]ûÈ..£..¿$..ðu..:. 000160
1F06A398 01478A2E 430176CA 3C04728C 3C430A76 243C0472 133CF7E2 43431674 t.CCã%<.r.<$v.C<¥r.<ðv.C..G..È.. 000180
88575602 EC83EC88 55C85DE5 8801FE4F 80260574 C308C08C 065EC4EC 885500C3 û.U.ŝá^..â.ût.&.O±..İ]ûW.ŝ.ŝ.VW. 0001A0
05740018 E8157500 82E8212E A3127400 25E80875 00212E3E 831E73FF F13D0646 F.•þ.s..>.!.u.Ò%.t.È.!Ò..u.Ò..t. 0001C0
5E880776 065E3900 F08BCB5D E5885E5F 02C48311 C0154C9A 0676FF08 750078E8 Òx.u..v..L.â..á._^.İ]û£þ.9^.v..^ 0001E0
```

Dump of file SATURN:[PCCOMMON.DUMP.DLL]DA-DSGN.DLL;1 on 18-APR-1990 10:38:46.97
File ID (402,14,0)   End of file block 64 / Allocated 64

Virtual block number 39 (00000027), 512 (0200) bytes

74FFFA83 08C48313 7816F89A 5002B051 0E4F8050 501EC033 FE5E89FE E3834306 .C.D±.^±3à.PP.O.Q¯.P.½.(..á..ª.t 000000
B9484800 08A3C033 838EFE5E 8B0008A3 DA8E0574 D20B2132 A3213016 87C28B38 8.ö..0!È21.@t..0È...^±.A3âÈ..HH. 000020
8BC08ED8 8CC31FD8 8C0006A3 00000500 0AA30147 8D0002A3 0000A300 0AB80C47 G.¡..È..È...G.È.....È...A.ù.A.ë. 000040
76FF006A 0876FF00 6A560000 0AC8C3D9 8EC18CD2 08019AE8 21321E8E DB33064E N.3U..2!Ò...@.è.lüà...Vj..v.j..v 000060
4813479A 56F87688 902FE899 C0280674 FFFFC2F7 FA5689F8 4689142F 17F69A06 ..~./..F½.Vª¼ö..t.+ä.Š/..v½V.G.H 000080
9007EB08 C48313A7 17AE9A50 FE76FF00 6A561274 000BFE56 89FC4689 02C48314 ..á..F=.V±.At.Vj..v±P.Û.Ì..á.Š.. 0000A0
AEF2C033 F788067E C4D98827 E30E4E88 1E5657EC 885590C8 C95EFE56 88FC4688 .F=.V±^èu.U.$WV..N.D'.1á-..¼3à Û 0000C0
5E1FC188 D1F74949 04740477 FF453A26 C933FF44 8AA6F30A 76C5FE88 C80309F7 ¼l.ù.±év.µÌ.D.3è&:E.w.t.IIX1.è.^ 0000E0
750AF983 1374C00A 93FC071E 570A7EC5 1E085688 0646880E 4E8800C8 50E5885F _.Ì]ù..N..F..V..é-.W..•..ât..ª.u 000100
D38792F1 F793F1F7 0274C008 023392F7 880AF700 02830BF7 AA2D800A 79D2080E ¯..@y.¯-¯¼Ù.@.¼Ö.¼.3@.ât.¼þ.¼þ..Æ 000120
8CF272C7 38014480 FF448805 86AC4F05 88E275C3 08C288AA 27040276 393C3004 .0<9v..'´.ô.ùuã..0¯...D..D.;úr¯. 000140
26FA5EC4 1CE8F628 FC5E8CFA 4689000C 88560000 06C800C8 50E5885E 5F1F58DA OX._^.Ì]ù.à...V¡...Fª.^•+-Š.á^ª& 000160
391EFC16 881EFAA1 0CFA4683 46017440 04C48314 14182A9A 53060E74 830A47F6 -G.¯t..S.ª....á.ât.F.Fª.Àª...•.9 000180
56EC8855 C85DE588 01FE4F80 0474D808 065E88EC 885590C8 C95EC688 0876FA46 FªvÀ.6^èù,U.$.^..Ût..O±..Ì]ùU.$V 0001A0
26A32124 A3FE2440 24E899C0 33057501 76E80005 88071E29 75003F83 21248857 WE$I.7.u)..¡..Òv.u.3à.Š$ã$±È$IÈ& 0001C0
E5885E5F 0009E8C0 8ED88C06 4E88212A 3689FFFE FE44C704 C6830001 04C79621 !.ù....ó.ùD±±..6ªI.N..Á.âÒ.._^.Ì 0001E0

Dump of file SATURN:[PCCOMMON.DUMP.DLL]DA-DSGN.DLL;1 on 18-APR-1990 10:38:46.97
File ID (402,14,0)   End of file block 64 / Allocated 64

Virtual block number 40 (00000028), 512 (0200) bytes

1573C138 48437401 A8FE88AD FC027788 F273EEF9 83FEE180 FA744100 D0E9CB5L ]ùÒÀ.Atª.À±.ªYs¯.w.•Ù.±´.tCH;ès. 000000
C128FE4C 89F9030C 74FE88E6 E8FE4489 F7880002 05C20335 7401A8AD F003D088 .À.þÙ´.t5.ô....¼.D±Šl.±t..ª.L±+è 000020
C626C302 7F892132 1E8C2605 74013811 1A890A8C C688FE4C FEF90305 E8058948 H..Š..ª±L±.6.Ö¿..;ìt.&..21...ù&6 000040
01A8ADF0 03D0888C 73C13848 FE88F274 01A8ADF0 03FE8825 74FFFE30 02213606 .6l.=±.tX.±.þÙ´.t´.±H;ès¥.À.þÙ´. 000060
12742136 0EFE2615 E8D88E04 74C00808 4788E6E8 FE4489F7 88000205 C203E274 tã.ô....¼.D±Šl.G..ât..ÀŠ.&±.6!t. 000080
01240074 C6380068 E8C03306 77888BE8 3788212E 1E8E2605 74C73815 DFBFD88C .À¢Ô.;út.&...!.7ŠE.w.3àÒk.;ôt.$. 0000A0
A3260474 C1381633 89D88C98 E84E4E96 0574001D E8FE40FE 0D74005F E8984040 ãã.Ò_.t.±M±Ò..t..NNŠ..Á¿3.;èt.&È 0000C0
2134163B 267FFF8A 414149C8 28037401 A8FE4588 51C399C0 33024789 07882132 21...G.3à.ùQ.E±´.t.+àlAAo..&;.41 0000E0
75EAD1D2 F7087500 0CE8C628 C22302F7 0072C203 1572C603 C188F575 EAD10476 v.lõu¼.è.ór..ôr.¼@#ò+6Ò..u.¼@iõu 000100
4AD728D6 88067789 FFFEFE44 C7F203F0 88FE8857 1874001D E85152C3 59C033E5 Ì3âYùRQÒ..t.W.±.P.¯ùD±±..w..ø+øJ 000120
FFFA8308 C483151B 16F89A1F 06500001 88505252 1E023350 53C35A59 58FE5589 .U±XYZùSP3@.RRP¡..P...½....á..ª. 000140
07754806 46880856 8808D88F 3875000A 7E830657 56EC8855 C3D20802 74585A1F .Z(t..@ùU.$VW..~..uB¢À..V..F.Hu. 000160
8334735E 003EE856 0E468902 44880074 F7381174 480CD836 884CEB27 720057E8 ÒW.r'ŠL.6A.Ht.;¼t..D..F.VÒ>.^s4. 000180
0000FFFF 9A50C033 501652C4 885021E8 99FFFF88 0675D208 04730CD8 FE8104C6 6..±A.s..@u.¡...ŠlP.àR.P3âP..... 0001A0
39F78B0E 4E88C850 E5885E5F 07C03303 880CD836 89025C89 1489E675 C085F958 [ª.âul...\..6A..Æ3â._^.Ì]ù.N..¼9 0001C0
1E390675 F73BC18E D3882672 1C030A88 2CE8F9F2 750CD8FE 8104C683 0C74024C L.t..6..±A.u¯ªŠ,.Ó..r&.Æ.è;¼u.9. 0001E0

Dump of file SATURN:[PCCOMMON.DUMP.DLL]DA-DSGN.DLL;1 on 18-APR-1990 10:38:46.97
File ID (402,14,0)   End of file block 64 / Allocated 64

Virtual block number 41 (00000029), 512 (0200) bytes

885500C3 D1880487 92080216 890475F7 38DE75C0 850000FF FF9A5153 13730802 @.s.SQ......àuR;¼u...@.....ìù.U. 000000
8A0A4688 D128D187 D103D323 D818D128 0C740AF7 D788067E C45738E3 0C4E88EC $.N.DBWá-..a¼Ót.+Ì.Ù#Æ.ì.Ì+ì.F.. 000020
46885FAA F3C913A8 F3E9D1C3 8EFFFFC3 81C38C10 E3D187AA F3C913A8 F3E9D1E0 ÀlÒµ¨.èµ¯.ìD..ù.ù...ùìÒµ¨.èµ¯_.f 000040
08CA5DE5 88E3F706 46880875 0A5E8808 080C5E88 08468BEC 8855C85D 08568806 ..V.]ùU.š.F..^..Á.^.u..F.¼D.Ì]ò. 000060
28560000 04C80008 CA5DE588 D103E3F7 06468BC8 030C66F7 06468BC8 88E3F700 .¼D.à.F.¼f..à.F.¼D.ì.Ì]ò..à...V+ 000080
F9F7000C B999000C 20C38815 75080A47 F6265575 023C0324 0A478A26 065EC4F6 -á^.&.G.$.<.ùU&-G..u..ù-...¿..¼ª 0000A0
0877FF26 50287EC0 08FC4689 06472826 07882606 5E883974 01190087 F6060868 kÁ.-....t9.^.&..&+G..F•.à-(P&.w. 0000C0
200A4F80 26065EC4 0874FC46 3808C483 16E80EA4 9A50E42A 08478A26 0677FF26 &.w.&.G.ªôP.È.Ò..á.;F•t.á^.&.O. 0000E0
C8C95EC6 88000004 47C72602 57892607 89260857 88260647 8826065E C4FFFF8E ƒ..á^.&.G.&.W.&..&.W.&ùG....ó^èù 000100
00091668 00020000 0007187E 00020007 0001112E 01030005 00011166 0103000C ....f...............-.......h... 000120
00011797 01030022 0001174C 010305C2 0000FFF0 02030088 000117E1 01050000 ....Â.......þ...ô...L...".......  000140
00010CC9 01030058 00010CDC 0103004D 00011080 0103003A 00010ED0 01030026 &...Â...:...¯...M...È...[...è... 000160
54206E75 5220534D 00000000 00000000 00000000 00000000 00000000 0000005C \.......................M: Run-T 000180
38383931 20296328 20746867 69727970 6F43202D 20797261 7262694C 20656D69 ime Library - Copyright (c) 1988 0001A0
30306A6F 72705C6A 6F72705C 3A710011 70726F43 2074666F 736F7263 694D202C , Microsoft Corp..q:\proj\proj00 0001C0
632E6C6F 6F745C6E 67697365 6461645C 61645C74 73796C6E 615C6372 735C3133 31\src\anlyst\da\dadesign\tool.c 0001E0

Dump of file SATURN:[PCCOMMON.DUMP.DLL]DA-DSGN.DLL;1 on 18-APR-1990 10:38:46.97
File ID (402,14,0)    End of file block 64 / Allocated 64

Virtual block number 42 (0000002A), 512 (0200) bytes

```
202C666C 65536C6F 6F746828 20727450 61746144 78754179 72657551 69744700 .GtiQueryAuxDataPtr (htoolSelf,  000000
65206465 6E727574 6572206C 65646F4D 65657246 6C6D4400 296F666E 69747026 &ptinfo).DmlFreeModel returned e 000020
7473796C 6E615C63 72735C31 3330306A 6F72705C 6A6F7270 5C3A7100 726F7272 rror.q:\proj\proj0031\src\anlyst 000040
6548796F 72747365 44606540 00632E6C 6F6F745C 6E676973 65646164 5C61645C \da\dadesign\tool.c.MemDestroyHe 000060
002E0020 2D20002E 002E002E 00297061 65686268 3E206F66 6E697470 28207061 ap (ptinfo->hbheap)....... . ... 000080
61645C74 73796C6E 615C6372 735C3133 30306A6F 72705C6A 6F72705C 3A71002E ..q:\proj\proj0031\src\anlyst\da 0000A0
646E6520 66666F20 6C6C6546 00632E6C 69747576 64615C6E 67697365 6461645C \dadesign\advutil.c.Fell off end 0000C0
5C637273 5C313330 306A6F72 705C6A6F 72705C3A 71006863 74697773 20666F20  of switch.q:\proj\proj0031\src\ 0000E0
6C654600 632E6C69 74757664 615C6E67 69736564 61645C61 645C7473 796C6E61 anlyst\da\dadesign\advutil.c.Fel 000100
6A6F7270 5C6A6F72 705C3A71 00686374 69777320 666F2064 6E652066 666F206C l off end of switch.q:\proj\proj 000120
75766461 5C6E6769 73656461 645C6164 5C747379 6C6E615C 6372735C 31333030 0031\src\anlyst\da\dadesign\advu 000140
3A710000 68637469 77732066 6F20646E 65206666 6F206C6C 65460063 2E6C6974 til.c.Fell off end of switch..q: 000160
6461645C 61645C74 73796C6E 615C6372 735C3133 30306A6F 72705C6A 6F72705C \proj\proj0031\src\anlyst\da\dad 000180
65722067 6C447373 69607369 446E6957 00632E67 6C646E67 73645C6E 67697365 esign\dsgndlg.c.WinDismissDlg re 0001A0
616C6961 76612074 65792074 6F6E2070 6C654800 726F7272 65206465 6E727574 turned error.Help not yet availa 0001C0
5C747379 6C6E615C 6372735C 31333030 6A6F7270 5C6A6F72 705C3A71 00656C62 ble.q:\proj\proj0031\src\anlyst\ 0001E0
```

Dump of file SATURN:[PCCOMMON.DUMP.DLL]DA-DSGN.DLL;1 on 18-APR-1990 10:38:46.97
File ID (402,14,0)    End of file block 64 / Allocated 64

Virtual block number 43 (0000002B), 512 (0200) bytes

```
646E6957 7465536E 69570063 2E676C64 6E677364 5C6E6769 73656461 645C6164 da\dadesign\dsgndlg.c.WinSetWind 000000
705C6A6F 72705C3A 7100726F 72726520 64656E72 75746572 20676E6F 4C55776F owULong returned error.q:\proj\p 000020
645C6E67 69736564 61645C61 645C7473 796C6E61 5C637273 5C313330 306A6F72 roj0031\src\anlyst\da\dadesign\d 000040
2064656E 72757465 7220676C 44737369 60736944 6E695700 632E676C 646E6773 sgndlg.c.WinDismissDlg returned  000060
73796C6E 615C6372 735C3133 30306A6F 72705C6A 6F72705C 3A710072 6F727265 error.q:\proj\proj0031\src\anlys 000080
69607369 446E6957 00632E67 6C646E67 73645C6E 67697365 6461645C 61645C74 t\da\dadesign\dsgndlg.c.WinDismi 0000A0
20646574 63657078 656E5500 726F7272 65206465 6E727574 65722067 6C447373 ssDlg returned error.Unexpected  0000C0
705C3A71 00646576 69656365 72206567 61737365 6020444E 414D404F 435F4057 WM_COMMAND message received.q:\p 0000E0
73656461 645C6164 5C747379 6C6E615C 6372735C 31333030 6A6F7270 5C6A6F72 roj\proj0031\src\anlyst\da\dades 000100
3A710000 4C30203D 21207365 63696F68 63700063 2E676C64 6E677364 5C6E6769 ign\dsgndlg.c.pchoices != 0L..q: 000120
6461645C 61645C74 73796C6E 615C6372 735C3133 30306A6F 72705C6A 6F72705C \proj\proj0031\src\anlyst\da\dad 000140
77732066 6F20646E 65206666 6F206C6C 65460063 2E73656C 75725C6E 67697365 esign\rules.c.Fell off end of sw 000160
63410065 6C62616C 69617661 20746579 20746F6E 206E6F69 74634100 68637469 itch.Action not yet available.Ac 000180
6F6E206E 6F697463 41006F6C 62616C69 61766120 74657920 746F6E20 6E6F6974 tion not yet available.Action no 0001A0
00000000 04560260 0065044A 00F10064 00656C62 616C6961 76612074 6579..74 t yet available.d.þ.J.e.m.V..... 0001C0
047400F1 00640000 00000000 046E01E5 00660462 02600065 045C00F1 006400.. ..d.þ.\.e.m.b.f.[.n.......d.þ.t. 0001E0
```

Dump of file SATURN:[PCCOMMON.DUMP.DLL]DA-DSGN.DLL;1 on 18-APR-1990 10:38:46.97
File ID (402,14,0)    End of file block 64 / Allocated 64

Virtual block number 44 (0000002C), 512 (0200) bytes

```
00680492 02600065 048C00F1 00640000 00000000 04860410 0067047A 02600065 e.m.z.g...........d.þ...e.m...h. 000000
00000000 048606F2 006904AA 02600065 04A400F1 00640000 00000000 049E0493 ..........d.þ.£.e.m.`.i. .Ñ..... 000020
040400F1 00640000 00000000 04CE0851 006A04C2 02600065 048C00F1 00640000 ..d.þ.¥.e.m.ò.j.Q.ö...... .d.þ.å. 000040
006504F2 00F10064 00000000 000004EC 091A006C 04E00883 006B04DA 02600065 e.m.Ò.k...Â.l...à.......d.þ.·.e. 000060
0898006E 0510026D 0065050A 00F10064 00000000 00000504 0981006D 04F8026D m.½.m.Ý.........d.þ...e.m...n... 000080
00000000 00000534 0CDE0070 0528026D 00650522 00F10064 00000000 0000051C ........d.þ.".e.m.(.p.Þ.4....... 0000A0
00650552 00F10064 00000000 0000054C 0E0B0071 05400260 0065053A 00F10064 d.þ.:.e.m.@.q...L.......d.þ.R.e. 0000C0
0E870073 057001E5 0066056A 02600065 056400F1 00640000 00000000 055E026D m.^.......d.þ.d.e.m.j.f.[.p.s.ñ. 0000E0
059A0493 0075058E 02600065 058800F1 00640000 00000000 05820F8A 00740576 v.t...........d.þ...e.m...u..... 000100
00640000 00000000 05820493 007505A6 02600065 05A000F1 00640000 00000000 ......d.þ...e.m.¦.u...ÿ.......d. 000120
10CD0077 05D0026D 006505CA 00F10064 00000000 000005C4 02600065 058800F1 þ.j.e.m.é.......d.þ.Ð.e.m.Í.w.e. 000140
05FA049A 0000FFFF 00020002 05EE0482 0000FFFF 00020001 00000000 0000FFFF ...................Ý..........*. 000160
0000FFFF 00020005 061204B2 0000FFFF 00020004 06060452 0000FFFF 00020003 ........R..........ÿ............ 000180
0002000B 06360452 0000FFFF 00020007 062A0452 0000FFFF 00020006 061E0440 @...........R.*.........R.6..... 0001A0
065A04CA 0000FFFF 0002000A 064E0440 0000FFFF 00020009 06420452 0000FFFF ....R.B.........@.N.........Ò.Z. 0001C0
0000FFFF 00020000 06720452 0000FFFF 0002000C 066604E8 0000FFFF 00020008 ........Ò.f.........R.r......... 0001E0
```

```
Dump of file SATURN:[PCCOMMON.DUMP.DLL]DA-DSGN.DLL;1 on 18-APR-1990 10:38:46.97
File ID (402,14,0)   End of file block 64 / Allocated 64

Virtual block number 45 (0000002D), 512 (0200) bytes

00020011 06960452 0000FFFF 0002000F 068A0500 0000FFFF 0002000E 067E0452 R.-.....................R....... 000000
00000000 00000000 00000000 068A0596 0000FFFF 00020010 06A205AE 0000FFFF ....Ü.Å..........ª............. 000020
0000FFFF 00050016 06 ?046A 0000FFFF 00050015 06C60440 0000FFFF 00050014 ........a.6.........j.@......... 000040
00050019 06F60452 00uuFFFF 00050018 06EA0440 0000FFFF 00050017 06DE0452 R.ñ.........a.ö.........R.-..... 000060
215A0452 0000FFFF 0004001E 00000000 00000000 00000000 070E0518 0000FFFF ..........................R.Z! 000080
0000FFFF 00040021 0732057E 0000FFFF 00040020 0726055A 0000FFFF 0004001F ........Z.&. .......-.2.!....... 0000A0
00030023 07560452 0000FFFF 00030022 00000000 00000000 00000000 074A0452 R.J.............".......R.V.#... 0000C0
07860548 0000FFFF 00030025 076E0530 0000FFFF 00030024 07620440 0000FFFF ....a.b.$.......0.n.%.......H... 0000E0
0000FFFF 0009002B 07920452 0000FFFF 00090028 00000000 00000000 00000000 ............(.......R...+....... 000100
00070032 00000000 00000000 00000000 07860452 0000FFFF 0009002C 079E05C0 à...,.......R.Ñ..............2... 000120
07E60440 0000FFFF 00070034 07CE0440 0000FFFF 00070033 07C20452 0000FFFF ....R.ò.3.......a.ö.4.......a.!. 000140
0000FFFF 00060030 07F20452 0000FFFF 0006003C 00000000 00000000 00000000 ............<.......R.-.=....... 000160
00000000 05E20452 0000FFFF 00080046 00000000 00000000 00000000 080A0452 R...............F.......R.â..... 000180
000A0A75 25203A65 6E694C0A 73252020 3A656C69 460A7325 00000000 00000000 ........%s.File:  %s.Line: %u... 0001A0
6F726620 474E494E 52415700 72656E67 69736544 20414420 6E692052 4F525245 ERROR in DA Designer.WARNING fro 0001C0
735C3133 30306A6F 72705C6A 6F72705C 3A710072 656E6769 73654420 41442060 m DA Designer.q:\proj\proj0031\s 0001E0

Dump of file SATURN:[PCCOMMON.DUMP.DLL]DA-DSGN.DLL;1 on 18-APR-1990 10:38:46.97
File ID (402,14,0)   End of file block 64 / Allocated 64

Virtual block number 46 (0000002E), 512 (0200) bytes

72615700 632E6C69 74755C6E 67697365 6461645C 61645C74 73796C6E 615C6372 rc\anlyst\da\dadesign\util.c.War 000000
45426863 74614300 21524F52 52452064 656E7275 74657220 786F6220 676E696E ning box returned ERROR!.CatchBE 000020
00000000 2320202B 00296C6C 756E2800 296C6C75 6E280000 7325203A 726F7272 rror: %s..(null).(null).+- #.... 000040
00000000 00000000 00000000 00000000 00000000 216023E0 114923E0 23E00000 ..Â#Â#I.Â#'!.................... 000060
00000000 00000000 00000000 00000000 00000000 00000000 00000000 00000000 ................................ 000080
00000000 00000000 00000000 00000000 00000000 00000000 00000000 00000000 ................................ 0000A0
00000000 00000000 00000000 00000000 00000000 00000000 00000000 00000000 ................................ 0000C0
00000000 00000000 00000000 00000000 00000000 00000000 00000000 00000000 ................................ 0000E0
00000000 00000000 00000000 00000000 00000000 00000000 00000000 00000000 ................................ 000100
00000000 00000000 00000000 00000000 00000000 00000000 00000000 00000000 ................................ 000120
00000000 00000000 00000000 00000000 00000000 00000000 00000000 00000000 ................................ 000140
00000000 00000000 00000000 00000000 00000000 00000000 00000000 00000000 ................................ 000160
00000000 00000000 00000000 00000000 00000000 00000000 00000000 00000000 ................................ 000180
00000000 00000000 00000000 00000000 00000000 00000000 00000000 00000000 ................................ 0001A0
00000000 00000000 00000000 00000000 00000000 00000000 00000000 00000000 ................................ 0001C0
00000000 00000000 00000000 00000000 00000000 00000000 00000000 00000000 ................................ 0001E0

Dump of file SATURN:[PCCOMMON.DUMP.DLL]DA-DSGN.DLL;1 on 18-APR-1990 10:38:46.97
File ID (402,14,0)   End of file block 64 / Allocated 64

Virtual block number 47 (0000002F), 512 (0200) bytes

00000000 00000000 00000000 00000000 00000000 00000000 00000000 00000000 ................................ 000000
00000000 00000000 00000000 00000000 00000000 00000000 00000000 00000000 ................................ 000020
00000000 00000000 00000000 00000000 00000000 00000000 00000000 00000000 ................................ 000040
00000000 00000000 00000000 00000000 00000000 00000000 00000000 00000000 ................................ 000060
00000000 00000000 00000000 00000000 00000000 00000000 00000000 00000000 ................................ 000080
00000000 00000000 00000000 00000000 00000000 00000000 00000000 00000000 ................................ 0000A0
00000000 00000000 00000000 00000000 00000000 00000000 00000000 00000000 ................................ 0000C0
00000000 00000000 00000000 00000000 00000000 00000000 00000000 00000000 ................................ 0000E0
00000000 00000000 00000000 00000000 00000000 00000000 00000000 00000000 ................................ 000100
00000000 00000000 00000000 00000000 00000000 00000000 00000000 00000000 ................................ 000120
00000000 00000000 00000000 00000000 00000000 00000000 00000000 00000000 ................................ 000140
00000000 00000000 00000000 00000000 00000000 00000000 00000000 00000000 ................................ 000160
00000000 00000000 00000000 00000000 00000000 00000000 00000000 00000000 ................................ 000180
00000000 00000000 00000000 00000000 00000000 00000000 00000000 00000000 ................................ 0001A0
00000000 00000000 00000000 00000000 00000000 00000000 00000000 00000000 ................................ 0001C0
00000000 00000000 00000000 00000000 00000000 00000000 00000000 00000000 ................................ 0001E0
```

```
Dump of file SATURN:[PCCOMMON.DUMP.DLL]DA-DSGN.DLL;1 on 18-APR-1990 10:38:46.97
File ID (402,14,0)   End of file block 64 / Allocated 64

Virtual block number 48 (00000030), 512 (0200) bytes

00000000 00000000 00000000 00000000 00000000 00000000 00000000 00000000 ................................ 000000
00000000 00000000 00000000 00000000 00000000 00000000 00000000 00000000 ................................ 000020
00000000 00000000 00000000 00000000 00000000 00000000 00000000 00000000 ................................ 000040
FFFF1294 00000000 70304F46 4E495F45 4C49465F 435F08D8 00000000 00000000 ........A._C_FILE_INFO=......... 000060
00140000 0200FFFF FFFF0101 00000000 0CFA1294 0CF61294 0CF21294 0CEE1294 ..Y....-...*.................... 000080
02020000 00000000 00000000 01020000 00000000 00000000 0001215E 00000000 ....^!.......................... 0000A0
00000000 00000000 00000000 00000000 00000000 00000000 00000000 00000000 ................................ 0000C0
00000000 00000000 00000000 00000000 00000000 00000000 00000000 00000000 ................................ 0000E0
00000000 00000000 00000000 00000000 00000000 00000000 00000000 00000000 ................................ 000100
00000000 00000000 00000000 00000000 00000000 00000000 00000000 00000000 ................................ 000120
00000000 00000000 00000000 00000000 00000000 00000000 00000000 00000000 ................................ 000140
00000000 00000000 00000000 00000000 00000000 00000000 00000000 00000000 ................................ 000160
00000000 00000000 00000000 00000000 00000000 00000000 00000000 00000000 ................................ 000180
00000000 00000000 00000000 00000000 00000000 00000000 00000000 00000000 ................................ 0001A0
00000000 00000000 00000000 00000000 00000000 00000000 00000000 00000000 ................................ 0001C0
00000000 00000000 00000000 00000000 00000000 00000000 00000000 00000000 ................................ 0001E0

Dump of file SATURN:[PCCOMMON.DUMP.DLL]DA-DSGN.DLL;1 on 18-APR-1990 10:38:46.97
File ID (402,14,0)   End of file block 64 / Allocated 64

Virtual block number 49 (00000031), 512 (0200) bytes

00000000 00000000 00000000 00000000 00000000 00000000 00000000 00000000 ................................ 000000
00000000 00000000 00000000 00000000 00000000 00000000 00000000 00000000 ................................ 000020
00000000 00000000 00000000 00000000 00000000 00000000 00000000 00000000 ................................ 000040
00000000 00000000 00000000 00000000 00000000 00000000 00000000 00000000 ................................ 000060
00000000 00000000 00000000 00000000 00000000 00000000 00000000 00000000 ................................ 000080
00000000 00000000 00000000 00000000 00000000 00000000 00000000 00000000 ................................ 0000A0
00000000 00000000 00000000 00000000 00000000 00000000 00000000 00000000 ................................ 0000C0
00000000 00000000 00000000 00000000 00000000 00000000 00000000 00000000 ................................ 0000E0
00000000 00000000 00000000 00000000 00000000 00000000 00000000 00000000 ................................ 000100
00000000 00000000 00000000 00000000 00000000 00000000 00000000 00000000 ................................ 000120
00000000 00000000 00000000 00000000 00000000 00000000 00000000 00000000 ................................ 000140
00000000 00000000 00000000 00000000 00000000 00000000 00000000 00000000 ................................ 000160
00000000 00000000 00000000 00000000 00000000 00000000 00000000 00000000 ................................ 000180
00000000 00000000 00000000 00000000 00000000 00000000 00000000 00000000 ................................ 0001A0
00000000 00000000 00000000 00000000 00000000 00000000 00000000 00000000 ................................ 0001C0
00000000 00000000 00000000 00000000 00000000 00000000 00000000 00000000 ................................ 0001E0

Dump of file SATURN:[PCCOMMON.DUMP.DLL]DA-DSGN.DLL;1 on 18-APR-1990 10:38:46.97
File ID (402,14,0)   End of file block 64 / Allocated 64

Virtual block number 50 (00000032), 512 (0200) bytes

00000000 00000000 00000000 00000000 00000000 00000000 00000000 00000000 ................................ 000000
00000000 00000000 00000000 00000000 00000000 00000000 00000000 00000000 ................................ 000020
00000000 00000000 00000000 00000000 00000000 00000000 00000000 00000000 ................................ 000040
00000000 00000000 00000000 00000000 00000000 00000000 00000000 00000000 ................................ 000060
00000000 00000000 00000000 00000000 00000000 00000000 00000000 00000000 ................................ 000080
00000000 00000000 00000000 00000000 00000000 00000000 00000000 00000000 ................................ 0000A0
00000000 00000000 00000000 00000000 00000000 00000000 00000000 00000000 ................................ 0000C0
00000000 00000000 00000000 00000000 00000000 00000000 00000000 00000000 ................................ 0000E0
00000000 00000000 00000000 00000000 00000000 00000000 00000000 00000000 ................................ 000100
00000000 00000000 00000000 00000000 00000000 00000000 00000000 00000000 ................................ 000120
00000000 00000000 00000000 00000000 00000000 00000000 00000000 00000000 ................................ 000140
00000000 00000000 00000000 00000000 00000000 00000000 00000000 00000000 ................................ 000160
00000000 00000000 00000000 00000000 00000000 00000000 00000000 00000000 ................................ 000180
00000000 00000000 00000000 00000000 00000000 00000000 00000000 00000000 ................................ 0001A0
00000000 00000000 00000000 00000000 00000000 00000000 00000000 00000000 ................................ 0001C0
00000000 00000000 00000000 00000000 00000000 00000000 00000000 00000000 ................................ 0001E0
```

```
Dump of file SATURN:[PCCOMMON.DUMP.DLL]DA-DSGN.DLL;1 on 18-APR-1990 10:38:46.97
File ID (402,14,0)    End of file block 64 / Allocated 64

Virtual block number 51 (00000033), 512 (0200) bytes

00000000 00000000 00000000 00000000 00000000 00000000 00000000 00000000 ................................ 000000
00000000 00000000 00000000 00000000 00000000 00000000 00000000 00000000 ................................ 000020
00000000 00000000 00000000 00000000 00000000 00000000 00000000 00000000 ................................ 000040
00000000 00000000 00000000 00000000 00000000 00000000 00000000 00000000 ................................ 000060
00000000 00000000 00000000 00000000 00000000 00000000 00000000 00000000 ................................ 000080
00000000 00000000 00000000 00000000 00000000 00000000 00000000 00000000 ................................ 0000A0
00000000 00000000 00000000 00000000 00000000 00000000 00000000 00000000 ................................ 0000C0
00000000 00000000 00000000 00000000 00000000 00000000 00000000 00000000 ................................ 0000E0
00000000 00000000 00000000 00000000 00000000 00000000 00000000 00000000 ................................ 000100
00000000 00000000 00000000 00000000 00000000 00000000 00000000 00000000 ................................ 000120
00000000 00000000 00000000 00000000 00000000 00000000 00000000 00000000 ................................ 000140
00000000 00000000 00000000 00000000 00000000 00000000 00000000 00000000 ................................ 000160
00000000 00000000 00000000 00000000 00000000 00000000 00000000 00000000 ................................ 000180
00000000 00000000 00000000 00000000 00000000 00000000 00000000 00000000 ................................ 0001A0
00000000 00000000 00000000 00000000 00000000 00000000 00000000 00000000 ................................ 0001C0
00000000 00000000 00000000 00000000 00000000 00000000 00000000 00000000 ................................ 0001E0

Dump of file SATURN:[PCCOMMON.DUMP.DLL]DA-DSGN.DLL;1 on 18-APR-1990 10:38:46.97
File ID (402,14,0)    End of file block 64 / Allocated 64

Virtual block number 52 (00000034), 512 (0200) bytes

00000000 00000000 00000000 00000000 00000000 00000000 00000000 00000000 ................................ 000000
00000000 00000000 00000000 00000000 00000000 00000000 00000000 00000000 ................................ 000020
00000000 00000000 00000000 00000000 00000000 00000000 00000000 00000000 ................................ 000040
00000000 00000000 00000000 00000000 00000000 00000000 00000000 00000000 ................................ 000060
00000000 00000000 00000000 00000000 00000000 00000000 00000000 00000000 ................................ 000080
00000000 00000000 00000000 00000000 00000000 00000000 00000000 00000000 ................................ 0000A0
00000000 00000000 00000000 00000000 00000000 00000000 00000000 00000000 ................................ 0000C0
00000000 00000000 00000000 00000000 00000000 00000000 00000000 00000000 ................................ 0000E0
00000000 00000000 00000000 00000000 00000000 00000000 00000000 00000000 ................................ 000100
00000000 00000000 00000000 00000000 00000000 00000000 00000000 00000000 ................................ 000120
00000000 00000000 00000000 00000000 00000000 00000000 00000000 00000000 ................................ 000140
00000000 00000000 00000000 00000000 00000000 00000000 00000000 00000000 ................................ 000160
00000000 00000000 00000000 00000000 00000000 00000000 00000000 00000000 ................................ 000180
00000000 00000000 00000000 00000000 00000000 00000000 00000000 00000000 ................................ 0001A0
00000000 00000000 00000000 00000000 00000000 00000000 00000000 00000000 ................................ 0001C0
00000000 00000000 00000000 00000000 00000000 00000000 00000000 00000000 ................................ 0001E0

Dump of file SATURN:[PCCOMMON.DUMP.DLL]DA-DSGN.DLL;1 on 18-APR-1990 10:38:46.97
File ID (402,14,0)    End of file block 64 / Allocated 64

Virtual block number 53 (00000035), 512 (0200) bytes

00000000 00000000 00000000 00000000 00000000 00000000 00000000 00000000 ................................ 000000
00000000 00000000 00000000 00000000 00000000 00000000 00000000 00000000 ................................ 000020
00000000 00000000 00000000 00000000 00000000 00000000 00000000 00000000 ................................ 000040
00000000 00000000 00000000 00000000 00000000 00000000 00000000 00000000 ................................ 000060
00000000 00000000 00000000 00000000 00000000 00000000 00000000 00000000 ................................ 000080
00000000 00000000 00000000 00000000 00000000 00000000 00000000 00000000 ................................ 0000A0
00000000 00000000 00000000 00000000 00000000 00000000 00000000 00000000 ................................ 0000C0
00000000 00000000 00000000 00000000 00000000 00000000 00000000 00000000 ................................ 0000E0
00000000 00000000 00000000 00000000 00000000 00000000 00000000 00000000 ................................ 000100
00000000 00000000 00000000 00000000 00000000 00000000 00000000 00000000 ................................ 000120
00000000 00000000 00000000 00000000 00000000 00000000 00000000 00000000 ................................ 000140
00000000 00000000 00000000 00000000 00000000 00000000 00000000 00000000 ................................ 000160
00000000 00000000 00000000 00000000 00000000 00000000 00000000 00000000 ................................ 000180
00000000 00000000 00000000 00000000 00000000 00000000 00000000 00000000 ................................ 0001A0
00000000 00000000 00000000 00000000 00000000 00000000 00000000 00000000 ................................ 0001C0
00000000 00000000 00000000 00000000 00000000 00000000 00000000 00000000 ................................ 0001E0
```

```
Dump of file SATURN:[PCCOMMON.DUMP.DLL]DA-DSGN.DLL;1 on 18-APR-1990 10:38:46.97
File ID (402,14,0)   End of file block 64 / Allocated 64

Virtual block number 54 (00000036), 512 (0200) bytes

00000000 00000000 00000000 00000000 00000000 00000000 00000000 00000000 ................................ 000000
00000000 00000000 00000000 00000000 00000000 00000000 00000000 00000000 ................................ 000020
00000000 00000000 00000000 00000000 00000000 00000000 00000000 00000000 ................................ 000040
00000000 00000000 00000000 00000000 00000000 00000000 00000000 00000000 ................................ 000060
00000000 00000000 00000000 02000001 00000000 00000000 00000000 00000000 ................................ 000080
00000000 00000000 00000000 00000000 00000000 00000000 00000000 00000000 ................................ 0000A0
00000000 00000000 00000000 00000000 00000000 00000000 00000000 00000000 ................................ 0000C0
00000000 00000000 00000000 00000000 00000000 00000000 00000000 00000000 ................................ 0000E0
00000000 00000000 00000000 00000000 00000000 00000000 00000000 00000000 ................................ 000100
00000000 00000000 00000000 00000000 00000000 00000000 00000000 00000000 ................................ 000120
00000000 00000000 00000000 00000000 00000000 00000000 00000000 00000000 ................................ 000140
00000000 00000000 00000000 00000000 00000000 00000000 00000000 00000000 ................................ 000160
00000000 00000000 00000000 00000000 00000000 00000000 00000000 00000000 ................................ 000180
00000000 00000000 00000000 00000000 00000000 00000000 00000000 00000000 ................................ 0001A0
00000000 00000000 00000000 00000000 00000000 00000000 00000000 00000000 ................................ 0001C0
00000000 00000000 00000000 00000000 00000000 00000000 00000000 00000000 ................................ 0001E0

Dump of file SATURN:[PCCOMMON.DUMP.DLL]DA-DSGN.DLL;1 on 18-APR-1990 10:38:46.97
File ID (402,14,0)   End of file block 64 / Allocated 64

Virtual block number 55 (00000037), 512 (0200) bytes

00000000 00000000 00000000 00000000 00000000 00000000 00000000 00000000 ................................ 000000
00000000 00000000 00000000 00000000 00000000 00000000 00000000 00000000 ................................ 000020
00000000 00000000 00000000 00000000 00000000 00000000 00000000 00000000 ................................ 000040
00000000 00000000 00000000 00000000 00000000 00000000 00000000 00000000 ................................ 000060
00000000 00000000 00000000 00000000 00000000 00000000 00000000 00000000 ................................ 000080
00000000 00000000 00000000 00000000 00000000 00000000 00000000 00000000 ................................ 0000A0
00000000 00000000 00000000 00000000 00000000 00000000 00000000 00000000 ................................ 0000C0
00000000 00000000 00000000 00000000 00000000 00000000 00000000 00000000 ................................ 0000E0
00000000 00000000 00000000 00000000 00000000 00000000 00000000 00000000 ................................ 000100
00000000 00000000 00000000 00000000 00000000 00000000 00000000 00000000 ................................ 000120
00000000 00000000 00000000 00000000 00000000 00000000 00000000 00000000 ................................ 000140
00000000 00000000 00000000 00000000 00000000 00000000 00000000 00000000 ................................ 000160
00000000 00000000 00000000 00000000 00000000 00000000 00000000 00000000 ................................ 000180
00000000 00000000 00000000 00000000 00000000 00000000 00000000 00000000 ................................ 0001A0
00000000 00000000 00000000 00000000 00000000 00000000 00000000 00000000 ................................ 0001C0
00000000 00000000 00000000 00000000 00000000 00000000 00000000 00000000 ................................ 0001E0

Dump of file SATURN:[PCCOMMON.DUMP.DLL]DA-DSGN.DLL;1 on 18-APR-1990 10:38:46.97
File ID (402,14,0)   End of file block 64 / Allocated 64

Virtual block number 56 (00000038), 512 (0200) bytes

00000000 00000000 00000000 00000000 00000000 00000000 00000000 00000000 ................................ 000000
00000000 00000000 00000000 00000000 00000000 00000000 00000000 00000000 ................................ 000020
00000000 00000000 00000000 00000000 00000000 00000000 00000000 00000000 ................................ 000040
00000000 00000000 00000000 00000000 00000000 00000000 00000000 00000000 ................................ 000060
00000000 00000000 00000000 00000000 00000000 00000000 00000000 00000000 ................................ 000080
00000000 00000000 00000000 00000000 00000000 00000000 00000000 00000000 ................................ 0000A0
00000000 00000000 00000000 00000000 00000000 00000000 00000000 00000000 ................................ 0000C0
00000000 00000000 00000000 00000000 00000000 00000000 00000000 00000000 ................................ 0000E0
00000000 00000000 00000000 00000000 00000000 00000000 00000000 00000000 ................................ 000100
00000000 00000000 00000000 00000000 00000000 00000000 00000000 00000000 ................................ 000120
00000000 00000000 00000000 00000000 00000000 00000000 00000000 00000000 ................................ 000140
00000000 00000000 00000000 00000000 00000000 00000000 00000000 00000000 ................................ 000160
00000000 00000000 00000000 00000000 00000000 00000000 00000000 00000000 ................................ 000180
00000000 00000000 00000000 00000000 00000000 00000000 00000000 00000000 ................................ 0001A0
00000000 00000000 00000000 00000000 00000000 00000000 00000000 00000000 ................................ 0001C0
00000000 00000000 00000000 00000000 00000000 00000000 00000000 00000000 ................................ 0001E0
```

```
Dump of file SATURN:[PCCOMMON.DUMP.DLL]DA-DSGN.DLL;1 on 18-APR-1990 10:38:46.97
File ID (402,14,0)   End of file block 64 / Allocated 64

Virtual block number 57 (00000039), 512 (0200) bytes

 00000000 00000000 00000000 00000000 00000000 00000000 00000000 00000000 ................................ 000000
 00000000 00000000 00000000 00000000 00000000 00000000 00000000 00000000 ................................ 000020
 00000000 00000000 00000000 00000000 00000000 00000000 00000000 00000000 ................................ 000040
 00000000 00000000 00000000 00000000 00000000 00000000 00000000 00000000 ................................ 000060
 00000001 00000000 00000000 00000000 000008DA 18F40000 00000000 00000000 ..........¶.Ö................... 000080
 00000000 00000000 00000000 00000000 00000000 00000000 00000000 818181 ' ................................ 0000A0
 00000000 00000000 00000000 00000000 00000000 00000000 00000000 00000000 ................................ 0000C0
 00000000 00000000 00000000 00000000 00000000 00000000 00000000 00000000 ................................ 0000E0
 00000000 00000000 00000000 00000000 00000000 00000000 00000000 00000000 ................................ 000100
 00000000 00000000 00000000 00000000 00000000 00000000 00000000 00000000 ................................ 000120
 00000000 00000000 00000000 00000000 00000000 00000000 00000000 00000000 ................................ 000140
 00000000 00000000 00000000 00000000 00000000 00000000 00000000 00000000 ................................ 000160
 00000000 00000000 00000000 00000000 00000000 00000000 00000000 00000000 ................................ 000180
 0A0A0A0A 0A0A0A0A 0A0A0A0A 0A0A0A0A 0A0A0A0A 0A0A0A0A 0A0A0A0A 0A0A0A00 ................................ 0001A0
 0A0A0A0A 0A0A0A0A 0A0A0A0A 0A0A0A0A 0A0A0A0A 0A0A0A0A 0A0A0A0A 0A0A0A0A ................................ 0001C0
 0A0A0A0A 0A0A0A0A 0A0A0A0A 0A0A0A0A 0A0A0A0A 0A0A0A0A 0A0A0A0A 0A0A0A0A ................................ 0001E0

Dump of file SATURN:[PCCOMMON.DUMP.DLL]DA-DSGN.DLL;1 on 18-APR-1990 10:38:46.97
File ID (402,14,0)   End of file block 64 / Allocated 64

Virtual block number 58 (0000003A), 512 (0200) bytes

 0A0A0A0A 0A0A0A0A 0A0A0A0A 0A0A0A0A 0A0A0A0A 0A0A0A0A 0A0A0A0A 0A0A0A0A ................................ 000000
 0A0A0A0A 0A0A0A0A 0A0A0A0A 0A0A0A0A 0A0A0A0A 0A0A0A0A 0A0A0A0A 0A0A0A0A ................................ 000020
 0A0A0A0A 0A0A0A0A 0A0A0A0A 0A0A0A0A 0A0A0A0A 0A0A0A0A 0A0A0A0A 0A0A0A0A ................................ 000040
 0A0A0A0A 0A0A0A0A 0A0A0A0A 0A0A0A0A 0A0A0A0A 0A0A0A0A 0A0A0A0A 0A0A0A0A ................................ 000060
 0A0A0A0A 0A0A0A0A 0A0A0A0A 0A0A0A0A 0A0A0A0A 0A0A0A0A 0A0A0A0A 0A0A0A0A ................................ 000080
 00000000 00000000 00000000 00000000 00000000 00000000 00000000 0000000A ................................ 0000A0
 214CFFFF FFFF0CFE 14FA0000 00000000 00000000 00000000 00002000 00000000 ..... ...............*.±.....L! 0000C0
 30303652 00003E3E 47534D4E 3C3C071A 215C214A 21582156 21542152 2150214E N!P!R!T!V!X!J!\!..<<NMSG>>..R600 0000E0
 2D0A0033 30303652 0003000A 00776F6C 66726576 6F206B63 61747320 2D0A0030 0..- stack overflow.....R6003..- 000100
 0A003830 30365200 08000A0D 30207962 20656469 76696420 72656765 746E6920  integer divide by 0.....R6008.. 000120
 73746E65 6D756772 6120726F 66206563 61707320 6867756F 6E652074 6F6E202D - not enough space for arguments 000140
 66206563 61707320 6867756F 6E652074 6F6E202D 0A003930 30365200 09000A00 .....R6009..- not enough space f 000160
 65606974 2D6E7572 00FF000A 0000FC00 0A0D746E 65606E6F 7269766E 6520726F or environment...•......run-time 000180
 6E696F70 20676E69 74616F6C 66202D0A 0D323030 36520002 0020726F 72726520  error ...R6002..- floating poin 0001A0
 06F00203 0431000A 075C0203 002CFFFF FF000A00 64656461 6F6C2074 6F6E2074 t not loaded..........\...1...Þ. 0001C0
 04440002 04B5000A 07C80203 0235000A 05F40203 02B5000A 063C0203 03B5000A ..ç...<...ç...¶...5...à...ç...D. 0001E0

Dump of file SATURN:[PCCOMMON.DUMP.DLL]DA-DSGN.DLL;1 on 18-APR-1990 10:38:46.97
File ID (402,14,0)   End of file block 64 / Allocated 64

Virtual block number 59 (0000003B), 512 (0200) bytes

 06480203 0344000A 069C0203 03C4000A 07080203 04C1000A 07E00203 00000004 ......Á...è.......á.......D...H. 000000
 000E0002 024E000A 06000203 00000007 21480002 0449000A 07680203 02C4000A ..á...h...I...HI..........N..... 000020
 06B40203 02D5000A 06540203 00000009 1EFC0002 04D1000A 07EC0203 00000008 ......$...l...•.......Ī...í...Ç. 000040
 060C0203 0462000A 07800203 040E000A 08040203 03D9000A 07140203 0356000A ..V.......\.......B.......b..... 000060
 078C0203 03EA000A 07200203 0368000A 06C00203 02E7000A 06600203 0263000A ..c...'...Ö...â...h... . .ð..... 000080
 06CC0203 0400000A 072C0203 0279000A 06180203 02F7000A 066C0203 0471000A ..q...l...¥.......y...,..  ...à. 0000A0
 05DC0203 028A000A 06240203 0309000A 06780203 04B8000A 07980203 0381000A ..............x.......$.......É. 0000C0
 06840203 0498000A 07B00203 0397000A 06D80203 0413000A 07440203 020D000A ......D.......Á.......¯......... 0000E0
 06E40203 0421000A 07500203 021E000A 05E80203 029E000A 06300203 031D000A ......0.......Ò.......P...!...ð. 000100
 00000000 00000000 00000000 032C000A 06900203 04A6000A 07BC0203 03A4000A ..Ê...¥...I.......,............. 000120
 72617265 69682065 70795420 00657079 74627573 20656C67 6E69530F 00010352 R....Single subtype. Type hierar 000140
 60726F66 6E692D6E 6F4E2000 73697379 6C616E61 20746966 656E6562 20796863 chy benefit analysis. Non-inform 000160
 726F666E 692D6E6F 4E2C0065 70797462 75732067 6E697261 6562206E 6F697461 ation bearing subtype.,Non-infor 000180
 69746E65 20706968 736E6F69 74616C65 7220676E 69726165 62206E6F 69746160 mation bearing relationship enti 0001A0
 00797469 746E6520 74786574 20687467 6E656C20 656C6261 69726156 1C007974 ty..Variable length text entity. 0001C0
 69772079 7469746E 4' A0079 7469746E 65207373 656C746E 656E6F70 606F4315 .Componentless entity..Entity wi 0001E0
```

```
Dump of file SATURN:[PCCOMMON.DUMP.DLL]DA-DSGN.DLL;1 on 18-APR-1990 10:38:46.97
File ID (402,14,0)   End of file block 64 / Allocated 64

Virtual block number 60 (0000003C), 512 (0200) bytes

 74756F68 74697720 79746974 6E451000 73657475 62697274 74612074 756F6874 thout attributes..Entity without 000000
 68207475 6F687469 77207974 69746E45 13007370 6968736E 6F697461 6C657220  relationships..Entity without k 000020
 20666F20 656E4F27 00797469 746E6520 64657A69 6C616072 6F6E6E55 14007965 ey..Unnormalized entity.'One-of- 000040
 00796863 72617265 69682065 70797420 6E692079 7469746E 6520646E 69682061 a-kind entity in type hierarchy. 000060
 74697720 79746974 6E451700 79746974 6E652064 65636E65 72656665 726E5514 .Unreferenced entity..Entity wit 000080
 7069746C 75602068 74697720 79746974 6E451A00 73646F68 74656020 74756F68 hout methods..Entity with multip 0000A0
 69772079 7469746E 6520646E 69682061 20666F20 656E4F1E 00737965 6820656C le keys..One-of-a-kind entity wi 0000C0
 64206874 69772079 7469746E 45220352 00000000 00000000 00007965 68206874 th key..........R."Entity with d 0000E0
 74697720 79746974 6E452800 79656820 79726160 69727020 65746163 696C7075 uplicate primary key.(Entity wit 000100
 00010079 65682079 72616069 72702065 74756269 72747461 2069746C 75602068 h multi-attribute primary key... 000120
 7265441E 006E6961 606F6420 74756F68 74697720 65747562 69727474 41190001 ...Attribute without domain..Der 000140
 6C707544 19004C44 50207475 6F687469 77206574 75626972 74746120 64657669 ived attribute without PDL..Dupl 000160
 20657475 62697274 74411500 6560616E 20657475 62697274 74612065 74616369 icate attribute name..Attribute  000180
 75626972 74746120 6465636E 65726566 65726E55 17006C6F 6F70204D 49206E69 in IM pool..Unreferenced attribu 0001A0
 01006E6F 69746163 69666974 6E656469 20796568 206E6769 65726F46 18006574 te..Foreign key identification.. 0001C0
 70696873 6E6F6974 616C6572 20796E61 602D6F74 2D656E4F 33000100 01000100 .......3One-to-many relationship 0001E0

Dump of file SATURN:[PCCOMMON.DUMP.DLL]DA-DSGN.DLL;1 on 18-APR-1990 10:38:46.97
File ID (402,14,0)   End of file block 64 / Allocated 64

Virtual block number 61 (0000003D), 512 (0200) bytes

 6C707544 23007974 69746E65 20646E69 6B20612D 666F2065 6E6F2068 7469772c)  with one-of-a-kind entity.#Dupl 000000
 00007069 68736E6F 6974616C 65722079 6E61602D 6F742065 6E6F2065 74616369 icate one-to-many relationship.. 000020
 65722065 6E6F206F 7420656E 6F207972 6F746164 6E616020 796C6C75 46280352 R.(Fully mandatory one-to-one re 000040
 74616C65 72206C61 6E6F6974 706F2079 6C6C7546 1C007069 68736E6F 6974616C lationship..Fully optional relat 000060
 73207069 68737265 6E747261 70206465 74616C65 726E551A 00706968 736E6F69 ionship..Unrelated partnership s 000080
 6560616E 20746573 20706968 7372656E 74726170 20746C75 61666544 1D007465 et..Default partnership set name 0000A0
 6F697463 65746564 20796863 72617265 69682065 70797420 656C706D 69532000 . Simple type hierarchy detectio 0000C0
 74636574 65642079 68637261 72656968 20657079 74207865 6C70606F 4321006E n.!Complex type hierarchy detect 0000E0
 551A0001 00010073 79656820 676E6970 70616C72 65764F11 00010001 006E6F69 ion......Overlapping keys......U 000100
 66667573 6E491100 746E656E 6F70606F 63207965 68207972 61737365 63656E6E nnecessary key component..Insuff 000120
 00000000 00000000 00000000 00000000 01000100 01007965 6B20746E 65696369 icient key...................... 000140
 6E696160 6F441A00 6E696160 6F642065 74656C70 606F636E 49120001 00010352 R......Incomplete domain..Domain 000160
 68746977 206E6961 606F4425 00736E6F 69736E65 60696420 74756F68 74697720  without dimensions.%Domain with 000180
 00010001 00010065 6C626174 2065756C 61762065 6C626177 6F6C6C61 2074756F out allowable value table....... 0001A0
 69727474 61207475 6F687469 77206E6F 69736E65 6069441D 00010001 00010001 .........Dimension without attri 0001C0
 736E6961 606F6420 74756F68 74697720 6E6F6973 6E656069 441A0073 65747562 butes..Dimension withou: domains 0001E0

Dump of file SATURN:[PCCOMMON.DUMP.DLL]DA-DSGN.DLL;1 on 18-APR-1990 10:38:46.97
File ID (402,14,0)   End of file block 64 / Allocated 64

Virtual block number 62 (0000003E), 512 (0200) bytes

 41250001 00010001 00010001 00010352 00000000 00000000 00000000 01000100 ................R.............%A 000000
 606F6420 61207475 6F687469 7720656C 62617420 65756C61 76206465 776F6C6C llowed value table without a dom 000020
 00000000 00000000 00000001 00010001 00010001 00010001 00010001 006E6961 ain............................. 000040
 74636572 726F6320 73612068 72614D10 00746964 45050001 00010001 00010352 R..........Edit..Mark as correct 000060
 65707974 62757320 65677265 4D10004C 44502064 64410800 6574656C 65440700 ..Delete..Add PDL..Merge subtype 000080
 61726569 68206072 6F66736E 61725428 00657079 74726570 75732068 74697720  with supertype.(Transform hiera 0000A0
 66736E61 72542100 70696873 6E6F6974 616C6572 20524F58 206F7420 79686372 rchy to XOR relationship.!Transf 0000C0
 6872614D 0C007069 68736E6F 6974616C 6572206F 74207974 69746E65 2060726F orm entity to relationship..Mark 0000E0
 6D65521B 0064657A 696C6160 726F6E20 7361206B 72614D13 00464E33 20736120  as 3NF..Mark as normalized..Rem 000100
 20657465 6C654416 00796863 72617265 69682065 70797420 606F7266 2065766F ove from type hierarchy..Delete  000120
 73616220 79746974 6E652074 696C7053 25007379.65682065 74616E72 65746C61 alternate keys.%Split entity bas 000140
 00000000 00000000 00000000 7379656B 20657461 6E726574 6C61206E 6F206465 ed on alternate keys............ 000160
 6C657220 4B46206F 74206574 75626972 74746120 60726F66 736E6172 54270352 R.'Transform attribute to FK rel 000180
 6968736E 6F697461 6C657220 60726F66 736E6172 54290070 6968736E 6F697461 ationship.)Transform relationshi 0001A0
 72206072 6F66736E 61725431 00796863 72617265 69682065 70797420 6F742070 p to type hierarchy.1Transform r 0001C0
 72656968 20657079 74207865 6C70606F 63206F74 20706968 736E6F69 74616C65 elationship to complex type hier 0001E0
```

```
Dump of file SATURN:[PCCOMMON.DUMP.DLL]DA-DSGN.DLL;1 on 18-APR-1990 10:38:46.97
File ID (402,14,0)   End of file block 64 / Allocated 64

Virtual block number 63 (0000003F), 512 (0200) bytes

6F742070 6968736E 6F697461 6C657220 6D726F66 736E6172 54250079 68637261 archy.%Transform relationship to 000000
736E6F69 74616C65 72206D72 6F66736E 61725426 00656E6F 2D6F742D 656E6F20  one-to-one.&Transform relations 000020
69746974 6E652065 6772654D 0F00656E 6F2D6F74 2D796E61 6D206F74 20706968 hip to many-to-one..Merge entiti 000040
65766F6D 65521800 79656B20 79726160 69727020 65746172 656E6547 15007365 es..Generate primary key..Remove 000060
00010001 00010001 00010001 00010073 746E656E 6F706D6F 63207265 68746F20  other components............... 000080
00010001 00010001 00010001 00010352 00000000 00000000 00000000 00000001 ...............R............... 0000A0
73252068 7261400F 00732520 6574656C 65440A00 73252074 63656C65 530A0001 ...Select %s..Delete %s..Mark %s 0000C0
1E006465 7A696C61 6D726F6E 20736120 7325206B 72614D16 00464E33 20736120  as 3NF..Mark %s as normalized.. 0000E0
00010079 68637261 72656968 20657079 74206D6F 72662073 25206576 6F6D6552 Remove %s from type hierarchy... 000100
73687261 6D207261 656C430C 00746365 72726F63 20736120 7325206B 72614D13 .Mark %s as correct..Clear marks 000120
00000080 FFFF0001 000E0352 0000029C 00000000 00000000 00000000 00000000 ...................R........... 000140
00000000 010FFFFF 012C0096 00900000 00001400 019001D0 000E0001 0000000E ........A.............,...Ö..... 000160
00000000 0000FFFF FFFF0154 000A0083 00820005 80020001 01E30011 00030000 ......D...........T............ 000180
00030000 00000000 FFFFFFFF 0156000A 00720078 000A8002 000101F5 00000003 ....X.......x.r...V............ 0001A0
00130003 00000000 0000FFFF FFFF0158 000A0070 006E000A 80020001 020:"010 ..........n.p...X............... 0001C0
0228000A 00030000 00000000 FFFFFFFF 015A000A 005F0064 000A8002 00010.'4 ........d._...Z...............(. 0001E0

Dump of file SATURN:[PCCOMMON.DUMP.DLL]DA-DSGN.DLL;1 on 18-APR-1990 10:38:46.97
File ID (402,14,0)   End of file block 64 / Allocated 64

Virtual block number 64 (00000040), 512 (0200) bytes

00010233 00000003 00000000 0000FFFF FFFF015C 000A005E 005A000A 80020001 ......Z.^...\...............3... 000000
80020001 02410010 00030000 00000000 FFFFFFFF 015E000A 00780050 000A8002 ....P.x...^...............A..... 000020
000A8002 00010252 00160003 00000000 0000FFFF FFFF0160 000A0082 0046000A ..F.....`..............R....... 000040
002A0005 80010001 02690017 00050000 00000000 FFFFFFFF 0162000A 006C003C <.l...b...............i.......*. 000060
00200020 000A8002 00030281 00040003 00000000 0000FFFF FFFF270F 00080070 p....'.......................... 000080
000A0020 00200034 80020003 02860003 00030000 00000000 FFFFFFFF 0168000A ..h....................4.  .... 0000A0
0136000C 0026000A 00058002 0400028A 00050003 00000000 0000FFFF FFFF016A j.......................&...6. 0000C0
FFFF0140 000C0026 000A0035 80020000 02900006 00030000 00000000 FFFFFFFF ...................5...&...@... 0000E0
FFFFFFFF 014A000C 0026000A 00658002 01000297 00040003 00000000 0000FFFF ...................e...&...J..... 000100
72206C65 646F6D20 61746144 7E000000 03007364 6F687465 6D206E67 69736544 Design methods.....~Data model r 000120
75722065 74756269 72747441 7E007365 6C757220 79746974 6E457E00 73656C75 ules.~Entity rules.~Attribute ru 000140
6C757220 79654B7E 0073656C 75722070 6968736E 6F697461 6C65527E 0073656C les.~Relationship rules.~Key rul 000160
656C7572 206E6F69 736E656D 697E4400 73656C75 72206E69 61606F7E 44007365 es.D~omain rules.D~imension rule 000180
656E6960 61784500 73656C75 72206575 6C617620 656C6261 776F6C6C 7E410073 s.A~llowable value rules.Examine 0001A0
002E2E2E 4B4F006F 4E7E0073 65597E00 3F736B72 61602073 756F6976 65727020  previous marks?.~Yes.~No.OK.... 0001C0
00000000 00000000 00000000 00000000 00000000 00706C65 48006C65 636E6143 Cancel.Help..................... 0001E0
```

```
Dump of file SATURN:[PCCOMMON.DUMP.DLL]DACOPY.TMP;1 on 18-APR-1990 10:39:51.10
File ID (545,24,0)    End of file block 90 / Allocated 92

Virtual block number 1 (00000001), 512 (0200) bytes

 00000000 00000040 00000000 00000088 0000FFFF 00000004 0000005A 01305A4D MZ0.Z...........|........@....... 000000
 00000080 00000000 00000000 00000000 00000000 00000000 00000000 00000000 ................................ 000020
 6F6E6E61 63206061 72676F72 70207369 685421CD 4C01B821 CD09B400 0EBA1F0E ..o..Ç.el!.L!This program canno 000040
 00000000 00000024 0A0D0D2E 65646F6D 20534F44 206E6920 6E757220 65622074 t be run in DOS mode... $....... 000060
 00070008 00000000 00061E46 00000400 0008800A A34C14E0 00850526 0505454E NE..&...A.LÉ........F.......... 000080
 00000000 00000000 00010000 00040000 0000062B 02E60208 00800080 0040002B +.@.....A.!.+.................. 0000A0
 10F40F00 10F3068F 01B40F00 01B30672 56020F00 560200FE 09120F00 09120066 f.......±..V...Vr.°...Ç...µ...¶. 0000C0
 0C300F01 0C1E0A70 00020E01 00000000 2BAC0F00 2BAB07AF 007A0F00 007A07A6 |.z...z.£. +..¯+........p.....0. 0000E0
 41440C00 014C4552 50554452 4F464B43 4548434D 41441100 0079706F 63616406 .dacopy...DAMCHECKFORDUPREL...DA 000100
 4C414D41 44140003 54455350 59504F43 4D41440B 00024E45 4D494459 504F434D MCOPYDIMEN...DAMCOPYPSET...DAMAL 000120
 16000552 54544159 504F434D 41440B00 04444547 52454D59 504F4359 44414552 READYCOPYMERGED...DAMCOPYATTR... 000140
 59504F43 4D41440E 00064D54 4853534F 52434154 43454A42 4F59504F 434D4144 DAMCOPYOBJECTACROSSHIM...DAMCOPY 000160
 00084A42 4F444549 504F4356 49555145 5445474D 41441400 0744524F 5759454B KEYWORD...DAMGETEQUIVCOPIEDOBJ.. 000180
 41441500 09444549 504F4353 54455350 544C5053 4B504554 41445055 4D41441A .DAMUPDATEPKSPLTPSETSCOPIED...DA 0001A0
 4D4F4459 504F434D 41440A00 0A4F444F 54524550 5553544E 45455441 4450554D MUPDATEENTSUPERTODO...DAMCOPYDOM 0001C0
 4C50534B 504C4C55 4E54494E 494D4144 11000C54 4E455950 4F434D41 440A000B ...DAMCOPYENT...DAMINITNULLPKSPL 0001E0

Dump of file SATURN:[PCCOMMON.DUMP.DLL]DACOPY.TMP;1 on 18-APR-1990 10:39:51.10
File ID (545,24,0)    End of file block 90 / Allocated 92

Virtual block number 2 (00000002), 512 (0200) bytes

 43415954 49544E45 59504F43 4D414416 000E5945 4B59504F 434D4144 0A000D54 T...DAMCOPYKEY...DAMCOPYENTITYAC 000000
 5849464D 41441100 10544C50 534B5045 4552464D 41440D00 0F4D5448 53534F52 ROSSHTM...DAMFREEPKSPLT...DAMFIX 000020
 504F4354 45535045 54454C50 4D4F434D 41441300 11535245 50555354 4E455055 UPENTSUPERS...DAMCOMPLETEPSETCOP 000040
 52545441 59454B46 59504F43 4D41440F 00135145 53454552 464D4144 0A001259 Y...DAMFREESEQ...DAMCOPYFKEYATTR 000060
 441C0015 44454950 4F435354 4E45544C 50534B50 45544144 50554D41 44190014 ...DAMUPDATEPKSPLTENTSCOPIED...D 000080
 41441400 164D5448 53534F52 43415049 48534E4F 4954414C 45525950 4F434D41 AMCOPYRELATIONSHIPACROSSHTM...DA 0000A0
 454A424F 59504F43 4D41440D 00174154 41445445 53505049 48535059 504F434D MCOPYPSHIPPSETDATA...DAMCOPYOBJE 0000C0
 00194445 49504F43 5359454B 544C5053 4B504554 41445055 4D414419 00185443 CT...DAMUPDATEPKSPLTKEYSCOPIED.. 0000E0
 48434D41 4413001A 59544954 4E454E47 4945524F 46544547 54455350 4D4. 417 .DAMPSETGETFOREIGNENTITY...DAMCH 000100
 15001C53 41494C41 59504F43 4D41440C 001B4E49 4749524F 50494853 504B. 45 ECKPSHIPORIGIN...DAMCOPYALIAS... 000120
 019900E3 000A0001 00001D54 5845544E 4F435254 54415950 4F435445 474D4144 DAMGETCOPYATTRCONTEXT.......D... 000140
 444F4D59 52455551 4C4D4413 6C6D6403 534C4C41 43534F44 08000233 021A01FB «...3...DOSCALLS.dml.DMLQUERYMOD 000160
 45494654 45534C4D 440B444C 45494659 52455551 4C4D440D 454C444E 41484C45 ELHANDLE.DMLQUERYFIELD.DMLSETFIE 000180
 514C4D44 0C4E4C52 59524555 514C4D44 0B544553 454C504D 49534C4D 440C444C LD.DMLSIMPLESET.DMLQUERYRLN.DMLQ 0001A0
 414C4552 454C504D 440F4554 414C4552 4C4D4409 314E4C52 59524555 UERYRLN1.DMLRELATE.DMLSIMPLERELA 0001C0
 4554414C 45524E55 454C504D 49534C4D 44114554 414C4552 4E554C4D 44084554 TE.DMLUNRELATE.DMLSIMPLEUNRELATE 0001E0

Dump of file SATURN:[PCCOMMON.DUMP.DLL]DACOPY.TMP;1 on 18-APR-1990 10:39:51.10
File ID (545,24,0)    End of file block 90 / Allocated 92

Virtual block number 3 (00000003), 512 (0200) bytes

 52434C4D 44114449 4C4D4459 52455551 4C4D440D 5453494C 45455246 4C4D4408 .DMLFREELIST.DMLQUERYDMLID.DMLCR 000000
 454A424F 53494C4D 44124554 41455243 4C4D4409 454D414E 48544957 45544145 EATEWITHNAME.DMLCREATE.DMLISOBJE 000020
 10544F4C 53454D41 4E544345 4A424F4D 4144116D 61640344 4554454C 45445443 CTDELETED.dam.DAMOBJECTNAMESLOT. 000040
 41440C54 4E454554 41455243 4D41440C 454D414E 5443454A 424F5445 474D4144 DAMGETOBJECTNAME.DAMCREATEENT.DA 000060
 50494853 4E4F4954 414C4552 45544145 52434D41 44154E59 53455441 4552434D MCREATESYN.DAMCREATERELATIONSHIP 000080
 43404144 0C59454B 45544145 52434D41 440C5254 54414554 41455243 4D41440D .DAMCREATEATTR.DAMCREATEKEY.DAMC 0000A0
 4B455441 4552434D 4144104D 4F444554 41455243 4D41440C 4D494445 54414552 REATEDIM.DAMCREATEDOM.DAMCREATEK 0000C0
 034A424F 4554454C 45444D41 440C5453 494C4545 52464D41 440B4452 4F575945 EYWORD.DAMFREELIST.DAMDELETEOBJ. 0000E0
 41454C45 52474142 4C545513 524F5352 55435449 4E494741 424C5455 10545544 DUT.UTLBAGINITCURSOR.UTLBAGRELEA 000100
 4C54550A 524F5352 55434554 41524554 49474142 4C545513 524F5352 55434553 SECURSOR.UTLBAGITERATECURSOR.UTL 000120
 45485355 50514553 4C54550C 454B414D 4E555145 534C5455 0C454B41 4D514553 SEQMAKE.UTLSEQUNMAKE.UTLSEQPUSHE 000140
 4B434F4C 42454552 464D454D 0C4B434F 4C42434F 4C4C414D 4540004D 4540034C L.MEM.MEMALLOCBLOCK.MEMFREEBLOCK 000160
 4F44084F 49530345 5241504D 4F434540 414E5455 4C414E41 1154554C 414E4106 .ANALUT.ANALUTNAMECOMPARE.SIO.DO 000180
 0301010F 57030201 02080304 01179003 3F630302 02000003 04014554 49525753 SWRITE........c?..........W.... 0001A0
 06030401 00710301 01360703 020100B6 030B6703 04025441 0346BD03 02020611 .....§F.AT...g..Ñ.....6...q..... 0001C0
 2F9E0302 01078103 040116FE 0302010F 120303AF 03040200 0003081C 03020208 ............£........±........../ 0001E0
```

```
Dump of file SATURN:[PCCOMMON.DUMP.DLL]DACOPY.TMP;1 on 18-APR-1990 10:39:51.10
File ID (545,24,0)   End of file block 90 / Allocated 92

Virtual block number 4 (00000004), 512 (0200) bytes

 7D030401 00000303 010C6803 04010000 03010126 D3031981 03020209 54030401 ...T.......Æ&........h.........) 000000
 4F207970 6F432072 6579614C 20617465 4D204144 27000053 18034486 03020201 .....D..S..'DA Meta Layer Copy O 000020
 00000000 00000006 00000000 00797469 6C616E6F 6974636E 75462074 63656A62 bject Functionality............. 000040
 FFFF9A50 16FC4680 0A76FF0C 76FF0E76 FF1076FF D88EFFFF 881E5657 000004C8 à...WV.¡...Á.v..v..v..v..F•.P... 000060
 FF1076FF 0023E9FE 4688FE46 89FC4688 003AE98E B9880006 E9037500 00300000 ..=..u.Õ..¡¿.Õ:..F•.F±.F±Õ#..v.. 000080
 3D000BE9 000EE98E B9880014 E9FFFF00 719A0676 FF0876FF 0A76FF0C 76FF0E76 v..v..v..v..v..q...Õ..¡¿.Õ..Õ..= 0000A0
 1076FF08 8E000888 1E565700 0002C800 0CCAC95F 5E1FFFEC E9FFD5E9 03750002 ..u.Õ¦.Õ$..^_èò..à...WV.¡...Á.v. 0000C0
 E98EB988 0006E903 7500FE7E 83FE4689 0000FFFF 9A0676FF 0876FF02 6A0E76FF .v.j..v..v.......F±.~±.u.Õ..¡¿.Õ 0000E0
 00003000 E602009A 37FF2602 77FF2606 5EC40A76 FF0C76FF 0E76FF10 76FF0164 d..v..v..v..v.á^.&.w.&.7...Ì.=.. 000100
 FF260277 FF26065E C40A76FF 0C76FF0E 76FF1076 FF013BE9 8EB9B800 06E90375 u.Õ..¡¿.Õ;..v..v..v..v.á^.&.w.&. 000120
 FF0C76FF 0E76FF10 76FF0110 E98EB988 0006E903 75000030 01110288 9A036A37 7j.......=..u.Õ..¡¿.Õ...v..v..v.. 000140
 E5E98EB9 B80006E9 03750000 3D013C02 889A056A 37FF2602 77FF2606 5EC40A76 v.á^.&.w.&.7j....<.=..u.Õ..¡¿.Õ¦ 000160
 00300169 02889A04 6 37FF26 0277FF26 065EC40A 76FF0C76 FF0E76FF 1076FF00 ..v..v..v..v.á^.&.w.&.7j....i.=. 000180
 260277FF 26065EC4 0A76FF0C 76FF0E76 FF1076FF 008AE98E B9880006 E9037500 .u.Õ..¡¿.Õo..v..v..v..v.á^.&.w.& 0001A0
 FF0E76FF 1076FF00 80;98EB9 880006E9 03750000 30019605 129A0F6A 146A37FF .7j.j......=..u.Õ..¡¿.Õ...v..v.. 0001C0
 0006E903 75000030 01C30512 9A106A12 6A37FF26 0277FF26 065EC40A 76FF0C76 v..v.á^.&.w.&.7j.j....û.=..u.Õ.. 0001E0

Dump of file SATURN:[PCCOMMON.DUMP.DLL]DACOPY.TMP;1 on 18-APR-1990 10:39:51.10
File ID (545,24,0)   End of file block 90 / Allocated 92

Virtual block number 5 (00000005), 512 (0200) bytes

 0A6A156A 37FF2602 77FF2606 5EC40A76 FF0C76FF 0E76FF10 76FF0060 E98EB988 ¡¿.Õ'..v..v..v..v.á^.&.w.&.7j.j. 000000
 C40A76FF 0C76FF0E 76FF1076 FF0033E9 8EB9B800 06E90375 00003001 F005129A ...Þ.=..u.Õ..¡¿.Õ3..v..v..v..v.á 000020
 0006E98E B9880006 E9037500 00300051 05129A06 6A136A37 FF260277 FF26065E ^.&.w.&.7j.j....Q.=..u.Õ..¡¿.Õ.. 000040
 FF0E76FF 1076FF08 8E00798B 1E565700 0004C800 0CCAC95F 5E1F0000 E9000088 ¡..Õ...^_èò..à...WV.¡y..Á.v..v.. 000060
 1076FF00 47E98EB9 880006E9 03750000 300000FF FF9A5016 FE46800A 76FF0C76 v..v..F±.P.....=..u.Õ..¡¿.ÕG..v. 000080
 B9880006 E9037500 0030027F 02E59A50 16FC4680 FE76FF0A 76FF0C76 FF0E76FF .v..v..v..v±.F•.P.Ì...=..u.Õ..¡¿ 0000A0
 8803009A FC76FFFE 76FF0676 FF0876FF 0A76FF0C 76FF0E76 FF1076FF 0020E98E .Õ ..v..v..v..v..v..v..v±.v•.Â.£ 0000C0
 0E76FF10 76FF1276 FFD88E02 15881E56 57000002 C8000CCA C95F5E1F 0000E900 .Õ...^_èò..à...WV.¡...Á.v..v..v. 0000E0
 76FF0020 E98EB988 0006E903 75000030 020902E5 9A5016FE 46800676 FF0C76FF .v..v.¯F±.P.Ì.1.=..u.Õ..¡¿.Õ ..v 000100
 5E1F0000 E9025403 D09AFE76 FF0676FF 0876FF0A 76FF0C76 FF0E76FF 1076FF12 ..v..v..v..v..v..v..v±.Â.T.Õ...^ 000120
 FE46800C 76FF0E76 FF1076FF 1276FF08 8E029388 1E565700 0002C800 0ECAC95F _èò..à...WV.¡...Á.v..v..v..v..F± 000140
 76FF0876 FF0A76FF FE76FF00 14E98EB9 880006E9 03750000 30000000 1E9A5016 ¯P.....=..u.Õ..¡¿.Õ...v±.v..v..v 000160
 890C4688 D88E02E0 881E5657 000004C8 000ECAC9 5F5E1F00 00E902AE 03309A06 ..0.Ü.Õ...^_èò..à...WV.¡Ü..Á.F.. 000180
 C40040E9 000007C7 26065EC4 0035E9FC 4688006A E9FE4688 FC46890A 4688FE46 F±.F..F•.F±Õj..F•Õ5.á^.&ú...ÕM.á 0001A0
 002CE900 0107C726 065EC400 37E90001 07C72606 5EC40042 E9000107 C726065E ^.&ú...Õ8.á^.&ú...Õ7.á^.&ú...Õ.. 0001C0
 04E90375 00043DFF C6E90375 00033DFF C3E90375 00023D00 23E90043 E98EB988 ¡¿.ÕC.Õ#.=..u.Õü.=..u.Õó.=..u.Õå 0001E0

Dump of file SATURN:[PCCOMMON.DUMP.DLL]DACOPY.TMP;1 on 18-APR-1990 10:39:51.10
File ID (545,24,0)   End of file block 90 / Allocated 92

Virtual block number 6 (00000006), 512 (0200) bytes

 FF8EE903 7500023D 0008E900 14E98EB9 880014E9 FFD4E9FF C1E90375 00053L F .=..u.Õè.Õå.Õ..¡¿.Õ..Õ..=..u.Õ.. 000000
 E906468B D88E0338 881E5657 000000C8 0008CAC9 5F5E1F00 00E90000 8BFFECL? Õ$.¡..Õ...^_èò..à...WV.¡B..Á.F.Õ 000020
 FF0038E9 041704A7 9A0876FF 0A76FF0C 76FF0E76 FF1076FF 1276FF14 76FF0043 C..v..v..v..v..v..v..v..Ì...Õ8.. 000040
 E98EB988 001BE903 2404009A 0876FF0A 76FF0C76 FF0E76FF 1076FF12 76FF1476 v..v..v..v..v..v..v..v..Ì.$.Õ..¡¿.Õ 000060
 00C80010 CAC95F5E 1FFFE5E9 FFCBE903 7500013D FF86E903 75C00800 12E90015 ..Õ...åu.ÕÑ.=..u.Õü.Õl..^_èò..à. 000080
 9A0676FF 0876FF0A 76FF1076 FF1276FF 1476FF16 76FFD88E 03D8881E 56570000 ..WV.¡Á..Ä.v..v..v..v..v..v..v.. 0000A0
 76FF0C76 FF0E76FF 1476FF16 76FF002E E98EB988 0006E903 7500003D 0000FFFF ....=..u.Õ..¡¿.Õ...v..v..v..v..v 0000C0
 0000E900 00880006 E98EB988 0006E903 7500003D 0000FFFF 9A0676FF 0876FF0A ..v..v......=..u.Õ..¡¿.Õ..¡..Õ.. 0000E0
 FF0C76FF 0E76FF10 76FF1276 FFD88E04 46881E56 57000100 C80012CA C95F5E1F .^_èò..à...WV.¡F..Á.v..v..v..v.. 000100
 0004C800 0ECAC95F 5E1F0000 E903FA04 3E9A5016 FF008680 0676FF08 76FF0A76 v..v..v......P.>.•.Õ...^_èò..à.. 000120
 46800676 FF0876FF 0A76FF0C 76FF0E76 FF1076FF 1276FF08 8E04AF88 1E565700 .WV.¡£..Á.v..v..v..v..v..v..v..F 000140
 00880888E 04E5881E 56570000 08C8000E CAC95F5E 1F0000E9 04D1043E 9A5016FC •.P.>.ì.Õ...^_èò..à...WV.¡Ì..A¡. 000160
 0000FFFF 9A5016FC 46800876 FF0E76FF 1076FF12 76FF1476 FFFC4689 FE468900 ..F±.F•.v..v..v..v..v..F•.P..... 000180
 F8468300 04E9FA56 89F84689 FE5688FC 4688008C E98EB988 0006E903 7500003D =..u.Õ..¡¿.Õ¥..F•.V±.F%.V•Õ...F% 0001A0
 C40876FF 0E76FF10 76FF1276 FF1476FF 0083E903 7502470B 26078B26 F85EC404 .á^%&..&.G.u.Õ...v..v..v..v..v.á 0001C0
 FF1276FF 1476FF00 17E90375 00003D00 00FFFF9A 0676FF37 FF260277 FF26F85E ^%&.w.&.7.v......=..u.Õ...v..v.. 0001E0
```

```
Dump of file SATURN:[PCCOMMON.DUMP.DLL]DACOPY.TMP;1 on 18-APR-1990 10:39:51.10
File ID (545,24,0)   End of file block 90 / Allocated 92

Virtual block number 7 (00000007), 512 (0200) bytes

 C40876FF 0A76FF0C 76FF1276 FF1476FF 005AE98E B9B80000 05E69AFC 76FFFE76 v.v..|...¡¿.ÕZ..v..v..v..v..v.á 000000
 FF1276FF 1476FF00 17E90375 00003D00 00FFFF9A 0676FF37 FF260277 FF26F85E ^½&.w.&.7.v......=..u.Õ...v..v.. 000020
 9AFC76FF FE76FF12 76FF1476 FFFF6AE9 001AE98E B9B80000 06009AFC 76FFFE76 v.v......¡¿.Õ..Õj..v..v..v.v.. 000040
 2476FFD8 8E051P38 1E565700 000EC800 10CAC95F 5E1F0000 E90000B8 0000FFFF ....|..Õ...^_èò..à...WV.¡...Á.v$ 000060
 46880006 E9037500 0030FC46 89000003 039A5016 FE46801A 76FF1C76 FF2276FF .v".v..v..F.P......F==..u.Õ...F 000080
 FF1676FF 1876FF1E 76FF2076 FF2276FF 2476FF26 76FF028B E9FE468B 02C6E9FC =Õó..F.Õ...v&.v$.v".v .v..v..v.. 0000A0
 30FC4689 FFFF0000 9A0676FF 0876FF0A 76FF0C76 FF1A76FF 1C76FF12 76FF1476 v..v..v..v..v..v..v..v.......F== 0000C0
 76FFF646 89F84689 00008800 00FA46C7 0274E902 7DE9FC46 880006E9 03750000 ..u.Õ...F=Õ).Õt.úF"..¡...F½.F-.v 0000E0
 FF1A76FF 1C76FF12 76FF1476 FF1676FF 1876FF1E 76FF2076 FF2276FF 2476FF26 &.v$.v".v .v..v..v..v..v..v..v.. 000100
 00003DFC 4689067A 0F579A50 16F6468D 5016FA46 800A76FF 0C76FF06 76FF0876 v..v..v..v..F'.P.F-.P.W.z..F==.. 000120
 FF2676FF F24689F' 46890000 880000F6 46C70216 E9021FE9 FC468800 06E90375 u.Õ...F=Õ..Õ..úF-..¡...F¶.F .v&. 000140
 0C76FF1A 76FF1C7  FF1276FF 1476FF16 76FF1876 FF1E76FF 2076FF22 76FF2476 v$.v".v .v..v..v..v..v..v..v..v. 000160
 03750000 30FC4689 06081790 9A5016F2 46805016 F646800E 76FF0876 FF0A76FF .v..v..v..F-.P.F .P...Á..F==..u. 000180
 76FF1876 FF1E76FF 2076FF22 76FF2476 FF2676FF 018BE901 C1E9FC46 8B0006E9 Õ...F=Õè.Õ|..v&.v$.v".v .v..v..v 0001A0
 468907BF 2F9E9A06 76FF0876 FF0A76FF 0C76FF1A 76FF1C76 FF1276FF 1476FF16 ..v..v..v..v..v..v..v..v.../¢..F 0001C0
 76FF1E76 FF2076FF 2276FF24 76FF0172 E9017BE9 FC468B00 06E90375 00003DFC ==..u.Õ...F=Õ(.Õr..v$.v".v .v..v 0001E0
```

```
Dump of file SATURN:[PCCOMMON.DUMP.DLL]DACOPY.TMP;1 on 18-APR-1990 10:39:51.10
File ID (545,24,0)   End of file block 90 / Allocated 92

Virtual block number 8 (00000008), 512 (0200) bytes

 F636079A 0A76FF0C 76FF0676 FF0876FF 0E76FF10 76FF1A76 FF1C76FF 1276FF14 ..v..v..v..v..v..v..v..v..v...6- 000000
 76FF2076 FF2276FF 2476FF01 2FE90138 E9FC468B 0006E903 75000030 FC468907 ..F==..u.Õ...F=Õ8.Õ/..v$.v".v .v 000020
 03750000 30FC4689 08333F63 9A0A76FF 0C76FF06 76FF0876 FF1A76FF 1C76FF1E ..v..v..v..v..v..v..c?3..F==..u. 000040
 76FF1A76 FF1C76FF 1E76FF20 76FF2276 FF2476FF 00F8E901 01E9FC46 8B0006E9 Õ...F=Õ..Õ½..v$.v".v .v..v..v..v 000060
 0006E903 75000030 FC468908 730B1C9A 0A76FF0C 76FF0676 FF0876FF 1276FF14 ..v..v..v..v..v....s..F==..u.Õ.. 000080
 76FF1476 FF1A76FF 1C76FF1E 76FF2076 FF2276FF 2476FF00 8BE900C4 E9FC468B .F=Õá.ÕE..v$.v".v .v..v..v..v..v 0000A0
 0006E903 75000030 FC468908 B944869A 0676FF08 76FF0A76 FF0C76FF 1076FF12 ..v..v..v..v..v...D¿..F==..u.Õ.. 0000C0
 76FF1876 FF1A76FF 1C76FF1E 76FF2076 FF2276FF 2476FF00 7BE90084 E9FC468B .F=Õ..Õ(..v$.v".v .v..v..v..v..v 0000E0
 0030FC46 89073646 BD9A0676 FF0876FF 0A76FF0C 76FF1076 FF1276FF 1476FF16 ..v..v..v..v..v..v..v..§F6..F==. 000100
 FFEFE903 7600003D 00022D00 2FE90032 E90035E9 003EE9FC 46880006 E9037500 .u.Õ...F=Õ>.Õ5.Õ2.Õ/.-..=..v.Õy. 000120
 088908CF 08CF0849 080C08CF 079207D5 069008CF 06EE064A 08E8A7FF 2E93C003 .á...IÕ.J.Y.ü...ĺ...ü...ĺ.ü.ü... 000140
 077C0002 00000001 05060002 000C9000 22CAC95F 5E1F0000 E90000B8 074C08CF ü.L.¡..Õ...^_èò"..............|. 000160
 04600203 00000008 06190002 00880002 05800203 01800003 05A60203 00000002 ......ĺ.........................'. 000180
 053C0203 00C60002 008C0203 003C0002 04880203 00A60002 062F0203 00220002 .."..../...ĺ.......<.......ó...<. 0001A0
 00000000 00000000 00000000 00E70003 02280203 006C0002 05CD0203 00490002 ..ĺ...ë...ĺ...+...Ó.............. 0001C0
 89262246 880A5EC4 0009E903 74003F83 260A5EC4 D88EFFFF B81E5657 00005AC8 àZ..WV.¡...Aá^.&.7.t.Õ..á^..F"&. 0001E0
```

```
Dump of file SATURN:[PCCOMMON.DUMP.DLL]DACOPY.TMP;1 on 18-APR-1990 10:39:51.10
File ID (545,24,0)   End of file block 90 / Allocated 92

Virtual block number 9 (00000009), 512 (0200) bytes

 77FF2610 77FF260A 5EC40000 F246C700 88E90375 10470B26 0E478B26 0A5EC407 .á^.&.G.&.G.u.Õ..úF...á^.&.w.&.w 000000
 03740000 300000FF FF9A5016 F4468D0E 77FF2610 77FF260A 5EC40000 FFFF9A0E ......á^.&.w.&.w..F¶.P.....=..t. 000020
 F45EC400 2AE90374 02573926 0033E903 74073926 1056880E 4688F45E C40047E9 ÕG.á^¶.F..V.&9.t.Õ3.&9W.t.Õ*.á^¶ 000040
 FF261077 FF260A5E C40001F2 46C70257 89260789 26065EC4 06578B26 04478B26 &.G.&.W.á^.&..&.W.úF...á^.&.w.&. 000060
 26078B26 065EC405 05E90000 B80006E9 037500F2 7E83FF9C E90000FF FF9A0E77 w......Õ...-..u.Õ..|..Õ..á^.&..& 000080
 46890000 FFFF9A50 16A6468D 0E76FF10 76FF1E76 FF2076FF 0050E903 7402470B .G.t.ÕP..v .v..v..v..Fĺ.P......F 0000A0
 5016A646 800676FF 0876FF1A 76FF1C76 FF04CFE9 FC468800 06E90375 00003DFC ==..u.Õ...F=Õü..v..v..v..v..Fĺ.P 0000C0
 26065EC4 036A006A 04A6E9FC 46880006 E9037500 0030FC46 890000FF FF9A016A j.......F==..u.Õ...F=Ć!.j.j.á^.& 0000E0
 14C48301 74504E9A 1E76FF20 76FF1A76 FF1C76FF 0E76FF10 76FF37FF 260277FF .w.&.7.v..v..v..v..v .\ .NPt..á. 000100
 FF37FF26 0277FF26 065EC404 6A006A04 6DE9FC46 880006E9 03750000 3DFC4689 .F==..u.Õ...F=Õm.j.j.á^.&.w.&.7. 000120
 7500003D FC468914 C48301AD 504E9A1E 76FF2076 FF1A76FF 1C76FF0E 76FF1076 v..v..v..v..v .v..NPÜ..á..F==..u 000140
 76FF0E76 FF1076FF 37FF2602 77FF2606 5EC4056A 006A0434 E9FC468B 0006E903 .Õ...F=Õ4.j.j.á^.&.w.&.7.v..v..v 000160
 FC468800 06E90375 000C3DFC 468914C4 8301E650 4E9A1E76 FF2076FF 1A76FF1C ..v..v .v..NPĺ..á..F==..u.Õ...F= 000180
 2076FF1A 76FF1C76 FF0E76FF 1076FF37 FF260277 FF26065E C4066A02 6AG_ 3E9 Õw.j.j.á^.&.w.&.7.v..v..v..v..v  0001A0
 076A046A 03C2E9FC 46880006 E9037500 0030FC46 8914C483 021F504E 9A1E/ "F .v..NP...á..F==..u.Õ...F=Õò.j.j. 0001C0
 BA504E9A 1E76FF20 76FF1A76 FF1C76FF 0E76FF10 76FF37FF 260277FF 26065E_4 á^.&.w.&.7.v..v..v..v..v .v..NPo 0001E0
```

Dump of file SATURN:[PCCOMMON.DUMP.DLL]DACOPY.TMP;1 on 18-APR-1990 10:39:51.10
File ID (545,24,0) End of file block 90 / Allocated 92

Virtual block number 10 (0000000A), 512 (0200) bytes

C41A76FF 1C76FF43 FE46C603 89E9FC46 880006E9 03750000 3DFC4689 14C48302 ..á..F•=..u.Õ...F•Õ..óF±C.v..v.á 000000
0006E903 7500003C FC468900 0002829A 5016FE46 80086A37 FF260277 FF26065E ^.&.w.&.7j..F±.P......F•=..u.Õ.. 000020
16FE4680 096A37FF 260277FF 26065EC4 1A76FF1C 76FF4EFE 46C60358 E9FC4688 .F•ÕX.óF±N.v..v.á^.&.w.&.7j..F±. 000040
FF26065E C40A6A08 6A0327E9 FC468800 06E90375 000030FC 46890000 03259A50 P.X....F•=..u.Õ...F•Õ'.j.j.á^.&. 000060
8914C483 02F3504E 9A1E76FF 2076FF1A 76FF1C76 FF0E76FF 1076FF37 FF260277 w.&.7.v..v..v..v..v .v..NPµ..á.. 000080
76FF37FF 260277FF 26065EC4 086A006A 02EEE9FC 46880006 E9037500 0030FC46 F•=..u.Õ...F•ÕŸ.j.j.á^.&.w.&.7.v 0000A0
03750000 3DFC4689 14C48303 50504E9A 1E76FF20 76FF1A76 FF1C76FF 0E76FF10 ..v..v..v..v .v..NP}..á..F•=..u. 0000C0
80C6A37 FF260277 FF26065E C41A76FF 1C76FF01 FE46C602 85E9FC46 880006E9 Õ...F•Õç.óF±..v..v.á^.&.w.&.7j.. 0000E0
5EC40D6A 076A0284 E9FC4688 0006E903 7500030 FC468900 00FFFF9A 5016FE46 F±.P......F•=..u.Õ...F•Õ..j.j.á^ 000100
83039C50 4E9A1E76 FF2076FF 1A76FF1C 76FF0E76 FF1076FF 37FF2602 77FF2606 .&.w.&.7.v..v..v..v..v .v..NP... 000120
065EC40E 6A036A0A 76FF0C76 FF024BE9 FC468800 06E90375 000030FC 468914C4 á..F•=..u.Õ...F•ÕK..v..v.j.j.á^. 000140
C483030B 49339A1E 76FF2076 FF1A76FF 1C76FF0E 76FF1076 FF37FF26 0277FF26 &.w.&.7.v..v..v..v..v .v..3IÜ..á 000160
26065EC4 116A036A 0A76FF0C 76FF020C E9FC4688 0006E903 75000030 FC468918 ..F•=..u.Õ...F•Õ...v..v.j.j.á^.& 000180
18C483FF FF49339A 1E76FF20 76FF1A76 FF1C76FF 0E76FF10 76FF37FF 260277FF .w.&.7.v.:v..v..v..v .v..3I...á. 0001A0
800F6A0E 76FF1076 FF1E76FF 2076FF01 CDE9FC46 880006E9 03750000 3DFC4689 .F•=..u.Õ...F•Õe..v .v..v..v.j.. 0001C0
FA4608F8 468801A4 E9FC4688 0006E903 75000030 FC468900 00FFFF9A 5016F846 F½.P......F•=..u.Õ...F•ÕÉ..F½.F• 0001E0

Dump of file SATURN:[PCCOMMON.DUMP.DLL]DACOPY.TMP;1 on 18-APR-1990 10:39:51.10
File ID (545,24,0) End of file block 90 / Allocated 92

Virtual block number 11 (0000000B), 512 (0200) bytes

FFFF00B6 9A0A76FF 0C76FF37 FF260277 FF26065E C4F876FF FA76FF00 2CE90375 u.Õ,..v•.v½á^.&.w.&.7.v..v..Ñ... 000000
FF26065E C4156A0A 6A0A76FF 0C76FF01 60E9FC46 880006E9 03750000 3DFC4689 .F•=..u.Õ...F•Õm..v..v.j.j.á^.&. 000020
8918C483 04B94933 · 1E76FF 2076FF1A 76FF1C76 FF0E76FF 1076FF37 FF260277 w.&.7.v..v..v..v..v .v..3I¿..á.. 000040
77FF2606 5EC4166A 036A0A76 FF0C76FF 012EE9FC 46880006 E9037500 0030FC46 F•=..u.Õ...F•Õ...v..v.j.j.á^.&.w 000060
468918C4 8304F849 339A1E76 FF2076FF 1A76FF1C 76FF0E76 FF1076FF 37FF2602 .&.7.v..v..v..v..v .v..3'½..á..F 000080
0277FF26 065EC417 6A056A0A 76FF0C76 FF00EFE9 FC468800 06E90375 000030FC •=..u.Õ...F•Õy..v..v.j.j.á^.&.w. 0000A0
FC468918 C4830537 49339A1E 76FF2076 FF1A76FF 1C76FF0E 76FF1076 FF37FF26 &.7.v..v..v..v..v .v..3I7..á..F• 0000C0
260277FF 26065EC4 196A036A 0A76FF0C 76FF00B0 E9FC4688 0006E903 75000030 =..u.Õ...F•Õ¯..v..v.j.j.á^.&.w.& 0000E0
3DFC4689 18C48305 7649339A 1E76FF20 76FF1A76 FF1C76FF 0E76FF10 76FF37FF .7.v..v..v..v..v .v..3Iv..á..F•= 000100
FF260277 FF26065E C41A6A02 6A0A76FF 0C76FF00 71E9FC46 880006E9 03750000 ..u.Õ...F•Õq..v..v.j.j.á^.&.w.&. 000120
0030FC46 8918C483 01384933 9A1E76FF 2076FF1A 76FF1C76 FF0E76FF 1076FF37 7.v..v..v..v..v .v..3I;..á..F•=. 000140
FF0C76FF 37FF2602 77FF2606 5EC40E76 FF1076FF 0032E9FC 46880006 E9037500 .u.Õ...F•Õ2..v..v.á^.&.w.&.7.v.. 000160
5E1F0000 E9000088 0006E9FC 46880006 E9037500 0030FC46 89043E09 549A0A76 v..T.>..F•=..u.Õ...F•Õ..¡..Õ...^ 000180
FF0876FF 0A76FF00 F846C600 FA46C608 8E000888 1E565700 006CC800 1ECAC95F _èò..àl..WV.¡...ÁóF•.óF½..v..v.. 0001A0
0517E9E6 46880006 E9037500 0030E646 890000FF FF9A5016 EC468010 76FF1276 v̄..v..Fš.P......F|=..u.Õ...F|Õ.. 0001C0
0016E900 09E446C7 0012E246 C70023E9 0008E446 C70011E2 46C7001D E9EC4688 .FšÕ..úFã..úFõ..Õ#.úFã..úFõ..Õ.. 0001E0

Dump of file SATURN:[PCCOMMON.DUMP.DLL]DACOPY.TMP;1 on 18-APR-1990 10:39:51.10
File ID (545,24,0) End of file block 90 / Allocated 92

Virtual block number 12 (0000000C), 512 (0200) bytes

FF1276FF 0876FF0A 76FF0000 E9FFD3E9 03750005 3DFFE8E9 03750003 3D0013E9 Õ..=..u.ÕÕ.=..u.Õ£.Õ...v..v..v.. 000000
0487E9E6 46880006 E9037500 003DE646 890000FF FF9A5016 FC4680E2 76FF1076 v..vã.F•.P......F|=..u.Õ...F|Õñ. 000020
E9037502 47082607 8826FC5E C404FC46 830004E9 F25689F0 4689FE56 88FC4688 .F•.V±.FÞ.V·Õ...F•.á^•&..&.G.u.Õ 000040
FF262477 FF261C5E C40063E9 03752447 08262247 88261C5E C40000EE 46C7047B (.úFŸ..á^.&.G"&.G$u.Õc.á^.&.w$&. 000060
7400030 00000057 9A5016F4 46802277 FF262477 FF261C5E C4000000 429A2277 w".B...á^.&.w$&.w".F¶.P.W...=..t 000080
E9037402 57392600 1EE90374 073926F4 5EC40257 88260788 26FC5EC4 0036E903 .Õ6.á^•&..&.W.á^¶&9.t.Õ..&9W.t.Õ 0000A0
037500EE 7E83FFAD E90001EE 46C70000 00A39A22 77FF2624 77FF261C 5EC40015 ..á^.&.w$&.w".È...úFŸ..ÕÜ..-Ÿ.u. 0000C0
E476FF04 77FF2606 77FF26F4 5EC4E276 FF1476FF 1676FF0C 76FF0E76 FF0047E9 ÕG..v..v..v..v..vãá^¶&.w.&.w..vÕ 0000E0
0007949A F076FFF2 76FF0876 FF0A76FF 0017E903 7500030 E6468900 00FFFF9A ......F|=._u.Õ...v..v..v·.vÞ.... 000100
FF260877 FF261C5E C45016F8 4680F846 88FA4688 0080FF25 E9030E9 E6468800 ..F|ÕÀ.ÕX.¯..F•.F½.F½.Pá^.&.w.&. 000120
3DE64689 12C48307 C34EE69A 0876FF0A 76FF37FF 260277FF 26FC5EC4 096A0677 w.j.á^•&.w.&.7.v..v..ÌNü..á..F|= 000140
46800379 E9E6468B 000007E0 9AF076FF F276FF08 76FF0A76 FF0017E9 03750000 ..u.Õ...v..v..v·.vÞ.Å....F|Õy..F 000160
0876FF0A 76FF37FF 260277FF 26FC5EC4 086A0277 FF260477 FF261C5E C45016FA •.Pá^.&.w.&.w.j.á^•&.w.&.7.v..v. 000180
9AF076FF F276FF08 76FF0A76 FF0017E9 03750000 3DE64689 12C48304 7A4EE69A .ÌNz..á..F|=..u.Õ...v..v..v·.vÞ. 0001A0
FF0A76FF 027FE903 7402FA7E 800288E9 037402F8 7E80032D E9E6468B 0000FFFF .....F|Õ-..~½.t.Õ...~•.t.Õ...v.. 0001C0
03750000 3DE64689 0000FFFF 9A501694 4680026A 37FF2602 77FF26FC 5EC40876 v.á^•&.w.&.7j..F..P......F|=..u. 0001E0

Dump of file SATURN:[PCCOMMON.DUMP.DLL]DACOPY.TMP;1 on 18-APR-1990 10:39:51.10
File ID (545,24,0)   End of file block 90 / Allocated 92

Virtual block number 13 (0000000D), 512 (0200) bytes

```
0C76FF0E 76FF02D0 E9E6468B 0000086F 9AF076FF F276FF08 76FF0A76 FF0017E9 Ō...v..v..v·.vÞ.o....F|Ōı..v..v. 000000
E9037500 0030E646 890000FF FF9A016A 50169446 805016E8 46801876 FF1A76FF .v..v..FŌ.P.F..Pj.......F|=..u.Ō 000020
FF0C76FF 0E76FF02 9EE9E646 88000008 AE9AF076 FFF276FF 0876FF0A 76FF0017 ...v..v..v·.vÞ.Ū....F|Ō...v..v.. 000040
17E90375 000030F6 46890000 07219AE4 76FFE876 FFEA76FF E276FF14 76FF1676 v..v..vā.vō.vŌ.vō.I....F|=..u.Ō. 000060
76FF0876 FF0A76FF 025FE9E6 46880000 08FC9AF0 76FFF276 FF0876FF 0A76FF00 ..v..v..v·.vÞ.=....F|Ō_..v..v..v 000080
9A1C76FF 1E76FF50 16E8468D 1876FF1A 76FF37FF 260277FF 26FC5EC4 0C76FF0E ..v.á^=&.w.&.7.v..v..FŌ.P.v..v.. 0000A0
0000094B 9AF076FF F276FF08 76FF0A76 FF0028E9 03750000 30E64689 0777081C ..w..F|=..u.Ō(..v..v..v·.vÞ.K... 0000C0
FC5EC408 76FF0A76 FF0200E9 E6468800 00095C9A E876FFEA 76FF0C76 FF0E76FF .v..v..vō.vŌ.\....F|Ō...v..v.á^= 0000E0
76FF0028 E9037500 0030E646 89000008 149A5016 E0468004 6A37FF26 0277FF26 &.w.&.7j..FÅ.P......F|=..u.Ō(..v 000100
0000FFFF 9AE876FF EA76FF0C 76FF0E76 FF000009 809AF076 FFF276FF 0876FF0A ..v..v·.vÞ.¯....v..v..vō.vŌ..... 000120
C4025789 26078926 EA5688E8 4688245E C40018E9 037459E0 7E8001B1 E9E6468B .F|ŌŸ..~ÅYt.Ō..á^$.FŌ.Vō&..&.W.á 000140
03750000 30E64689 0000FFFF 9A5016F4 46800B6A 176A0676 FF000107 C726205E ^ &ú....v.j.j..F¶.P......F|=..u. 000160
07B826FC 5EC4015D E9E6468B 00000A28 9AF076FF F276FF08 76FF0A76 FF0017E9 Ō...v..v..v·.vÞ.(....F|Ō).á^=&.. 000180
C4065789 26044789 26EA5688 E8468BF4 5EC40257 89260789 26F45EC4 02578B26 &.W.á^¶&..&.W.á^¶.FŌ.Vō&.G.&.W.á 0001A0
FFFF9A50 52002205 1E5688 1C 46880676 FF0043E9 03742447 08262247 8B261C5E ^.&.G"&.G$t.ŌC..v..F..V..".RP... 0001C0
76FF0A76 FF00000A 6E9AF476 FFF676FF 0676FF00 25E90375 00003DE6 46890000 ...F|=..u.Ō%..v..v-.v¶.n....v..v 0001E0
```

Dump of file SATURN:[PCCOMMON.DUMP.DLL]DACOPY.TMP;1 on 18-APR-1990 10:39:51.10
File ID (545,24,0)   End of file block 90 / Allocated 92

Virtual block number 14 (0000000E), 512 (0200) bytes

```
F676FF50 52002205 1E5688 1C 468800E5 E9E6468B 00000A60 9AF076FF F276FF08 ..v·.vÞ.'....F|Ō|..F..V..".RP.v- 000000
9AF076FF F276FF08 76FF0A76 FF0025E9 03750000 30E64689 0000FFFF 9AF476FF .v¶......F|=..u.Ō%..v..v..v·.vÞ. 000020
7400F87E 80007FE9 009FE9E6 46880000 FFFF9AF4 76FFF676 FF0676FF 00000730 =....v..v-.v¶......F|Ō..Ō...~½.t 000040
80046A37 FF260277 FF26FC5E C40876FF 0A76FF00 60E90375 00FA7E80 0009E903 .Ō...-'.u.Ōm..v..v.á^=&.w.&.7j.. 000060
F076FFF2 76FF0876 FF0A76FF 0028E903 75000030 E6468900 00092F9A 50169446 F..P./....F|=..u.Ō(..v..v..v·.vÞ 000080
59947E80 0038E9E6 46880000 0900 9AE8 76FFEA76 FF0C76FF 0E76FF00 0008309A .Ō....v..v..vō.vŌ......F|Ō;..~.Y 0000A0
0A76FFFB 72E90001 07C72620 5EC40789 26024789 26000088 245EC400 15E90374 t.Ō..á^$¡..&.G.&..á^ &ú...Ōr«.v. 0000C0
000066C8 C8C95F5E 1F0000E9 E6468BE6 46890000 0AC19AF0 76FFF276 FF0876FF .v..v·.vÞ.ė....F|.F|Ō...^ èùåf.. 0000E0
065EC400 00E846C7 0152E903 7524470B 2622478B 26065EC4 D88E05CD 881E5657 WV.|ė..Áá^.&.G"&.G$u.ŌR.úFŌ..á^. 000100
06889A50 16FC468D 2277FF26 2477FF26 065EC400 0006A39A 2277FF26 2477FF26 &.w$&.w".Ė...á^.&.w$&.w".F•.P.¡. 000120
74025739 260058E9 03740739 2614568B 124688FC 5EC4006C E9037400 00300000 ..=..t.Ōl.á^•.F..V.&9.t.ŌX.&9W.t 000140
5EC40257 89260789 260A5EC4 06578B26 04478B26 FC5EC400 01E846C7 004FE903 .ŌO.úFŌ..á^•&.G.&.W.á^.&..&.W.á^ 000160
74044739 26FC5EC4 02578B26 078B26FC 5EC40000 06EE9A22 77FF2624 77FF2606 .&.w$&.w".Y...á^•&..&.W.á^•&9G.t 000180
FF00ABE9 037500E8 7E83FF77 E9037DE9 00008800 06E90374 06573926 000FE903 .Ō..&9W.t.Ō..|..Ō).Ōw..~Ō.u.Ō·.. 0001A0
0006E903 75000030 EA468900 0005E89A 5016E646 800E76FF 1076FF16 76FF1876 v..v..v..v..F|.P.Š....Fō=..u.Ō.. 0001C0
0A5EC412 6A0E76FF 1076FF16 76FF1876 FF0033E9 037403E6 7E83034A E9EA468B .FōŌJ..-|.t.Ō3..v..v..v..v.j.á^. 0001E0
```

Dump of file SATUR  [PCCOMMON.DUMP.DLL]DACOPY.TMP;1 on 18-APR-1990 10:39:51.10
File ID (545,24,0)   End of file block 90 / Allocated 92

Virtual block number 15 (0000000F), 512 (0200) bytes

```
E90311E9 EA468800 06E90375 00003DEA 46890000 0C669A09 6A37FF26 0277FF26 &.w.&.7j..f....Fō=..u.Ō...FōŌ..Ō 000000
0277FF26 0A5EC411 6A0E76FF 1076FF16 76FF1876 FF0033E9 037405E6 7E830042 B..-|.t.Ō3..v..v..v..v.j.á^.&.w. 000020
02B80006 E90205E9 EA468800 06E90375 00003DEA 46890000 08929A08 6A37FF26 &.7j.......Fō=..u.Ō...FōŌ|.Ō..|. 000040
FF1A76FF 1C76FF00 56E90374 02470B26 078B260A 5EC402C6 E90000B8 02CCE995 .Ōā.|..Ō6.á^.&..&.G.t.ŌV..v..v.. 000060
0290E9EA 46880006 E9037500 0030EA46 89000000 DA9A5016 9A468D12 76FF1476 v..v..F..P.Ō....Fō=..u.Ō...FōŌ.. 000080
46890000 08539A01 6A50169A 46800A76 FF0C76FF 0E76FF10 76FF1676 FF1876FF .v..v..v..v..v..v..f..Pj..S....F 0000A0
0277FF26 0A5EC403 6A036A06 76FF0876 FF0261E9 EA468800 06E90375 00003DEA ō=..u.Ō...FōŌa..v..v.j.j.á^.&.w. 0000C0
EA468918 C48300AD 49339A1A 76FF1C76 FF1676FF 1876FF12 76FF1476 FF37FF26 &.7.v..v..v..v..v..v..3|Ù..á..Fō 0000E0
16EC468D 056A1276 FF1476FF 1A76FF1C 76FF0222 E9EA468B 0006E903 75000030 =..u.Ō...FōŌ"..v..v..v..v.j...F$. 000100
0A5EC416 76FF1876 FF01F9E9 EA468800 06E90375 00003DEA 46890000 0AA59A50 P.Ė....Fō=..u.Ō...FōŌ'..v..v.á^. 000120
46880006 E9037500 0030EA46 89000002 519A5016 EC468005 6A37FF26 0277FF26 &.w.&.7j..F$.P.Q....Fō=..u.Ō...F 000140
76FF1276 FF1476FF 77FF2602 77FF260A 5EC4076A 036A0676 FF0876FF 01CCE9EA ōŌa..v..v.j.j.á^.&.w.&.7.v..v..v 000160
EA468800 06E90375 00003DEA 468918C4 8300EC49 339A1A76 FF1C76FF 1676FF18 ..v..v..v..3|$..á..Fō=..u.Ō...Fō 000180
1876FF12 76FF1476 FF37FF26 0277FF26 0A5EC40A 6A036A06 76FF0876 FF018DE9 Ō...v..v.j.j.á^.&.w.&.7.v..v..v. 0001A0
E9EA4688 0006E903 75000030 EA468918 C4830E2B 49339A1A 76FF1C76 FF1676FF .v..v..v..3|+..á..Fō=..u.Ō...FōŌ 0001C0
FF1876FF 1276FF14 76FF37FF 260277FF 260A5EC4 086A056A 0676FF08 76FF014E N..v..v.j.j.á^.&.w.&.7.v..v..v.. 0001E0
```

```
Dump of file SATURN:[PCCOMMON.DUMP.DLL]DACOPY.TMP;1 on 18-APR-1990 10:39:51.10
File ID (545,24,0)   End of file block 90 / Allocated 92

Virtual block number 16 (00000010), 512 (0200) bytes

 0FE9EA46 880006E9 03750000 3DEA4689 18C4830E 6A49339A 1A76FF1C 76FF1676 v..v..v..3Ij..á..Fõ=..u.Ô...FõÔ. 000000
 76FF1876 FF1276FF 1476FF37 FF260277 FF260A5E C40C6A05 6A0676FF 0876FF01 ..v..v.j.j.á^.&.w.&.7.v..v..v..v 000020
 0000E9EA 46880006 E9037500 003DEA46 8918C483 08E24933 9A1A76FF 1C76FF16 ..v..v..3Iã..á..Fõ=..u.Ô...FõÔÅ. 000040
 880006E9 03750000 3DEA4689 00000994 9A5016FC 4680086A 176A37FF 26065EC4 á^.&.7j.j..F•.P......Fõ=..u.Ô... 000060
 C4025788 26078826 0A5EC402 57892607 89261456 88124688 FC5EC400 ABE9EA46 FõÔ¨.á^=.F..V.&..&.W.á^.&..&.W.á 000080
 37FF2606 5EC40038 E9037424 47082622 47882606 5EC40657 89260447 8926FC5E ^•&.G.&.W.á^.&.G"&.G$t.Ô8.á^.&.7 0000A0
 FF26065E C40017E9 03750000 3DEA4689 000009FE 9A505200 22050856 88064688 .F..V..".RP.±....Fõ=..u.Ô..á^.&. 0000C0
 FE76FF50 52002205 08568806 4688003E E9EA4688 00000F40 9AFC76FF FE76FF37 7.v±.v•.@....FõÔ>..F..V..".RP.v± 0000E0
 9AFC76FF FE76FF37 FF26065E C40017E9 03750000 3DEA4689 00000A44 9AFC76FF .v•.D....Fõ=..u.Ô..á^.&.7.v±.v•. 000100
 24881E56 57000096 C80018CA C95F5E1F 0000E900 00880006 E9EA4688 00000A17 .....FõÔ..¡..Ô...^_èò..à...WV.¡$ 000120
 08261E47 88260E5E C401D0E9 03740247 08260788 26125EC4 00008A46 C7D88E08 ..ÁúFu..á^.&..&.G.î.ÔÅ.á^.&.G.&. 000140
 FF262077 FF260E5E C400000B 499A1E77 FF262077 FF260E5E C4005FE9 03752047 G u.Ô_.á^.&.w &.w..I...á^.&.w &. 000160
 07392618 56881646 88FC5EC4 0032E903 7400003D 0000085E 9A5016FC 46801E77 w..F•.P.^...=..t.Ô2.á^•.F..V.&9. 000180
 AA9A1E77 FF262077 FF260E5E C40001BA 46C70015 E9037402 57392600 1EE90374 t.Ô..&9W.t.Ô..úFu..á^.&.w &.w..` 0001A0
 2676FF28 76FFFF6A 8689FF6C 86890000 88013AE9 0374008A 7E83FFB1 E900000B ...ÔŸ..-a.t.Ô:..¡....I...j..v(.v& 0001C0
 E98C4688 0006E903 7500003D BC468900 000CAB9A 5016FF6E 86801676 FF1876FF .v..v...n..P. ....F¥=..u.Ô...F¥Ô 0001E0

Dump of file SATURN:[PCCOMMON.DUMP.DLL]DACOPY.TMP;1 on 18-APR-1990 10:39:51.10
File ID (545,24,0)   End of file block 90 / Allocated 92

Virtual block number 17 (00000011), 512 (0200) bytes

 86805016 FF6E868D 1276FF14 76FF006A 006A1A76 FF1C76FF 2276FF24 76FF0605 I..v$.v".v..v.j.j..v..v...n..P.. 000000
 260E5EC4 0698E98C 46880006 E9037500 003D8C46 890000FF FF9A016A 5016FF6A j..Pj.......F¥=..u.Ô...F¥Ô..á^.& 000020
 76E98C46 880006E9 03750000 3D8C4689 00000E90 9A5016FC 4680086A 176A37FF .7j.j..F•.P......F¥=..u.Ô...F¥Ôv 000040
 8926FC5E C4025788 26078826 125EC402 57892607 89261856 88164688 FC5EC406 .á^=.F..V.&..&.W.á^.&..&.W.á^=&. 000060
 880E4688 37FF260E 5EC40038 E9037420 4708261E 4788260E 5EC40657 89260447 G.&.W.á^.&.G.&.G t.Ô8.á^.&.7.F.. 000080
 FE76FF37 FF260E5E C40017E9 03750000 308C4689 00000EEC 9A505200 1E051056 V....RP.$....F¥=..u.Ô..á^.&.7.v± 0000A0
 9AFC76FF FE76FF50 52001E05 105688OE 46880609 E98C4688 0000111C 9AFC76FF .v•......F¥Ô...F..V....RP.v±.v•. 0000C0
 00000F08 9AFC76FF FE76FF37 FF260E5E C40017E9 03750000 3D8C4689 00000F24 $....F¥=..u.Ô..á^.&.7.v±.v•..... 0000E0
 00880257 89260789 26125EC4 06578826 04478826 FC5EC400 18E90501 E98C4688 .F¥Ôi.Ô..á^=&.G.&.W.á^.&..&.W.¡. 000100
 003D8C46 89000010 6C9A5016 FC468008 6A176A37 FF260E5E C400CAE9 0583E900 .Ô°.Ôò.á^.&.7j.j..F=.P.l....F¥=. 000120
 26125EC4 02578926 07892618 56881646 88FC5EC4 0588E98C 46880006 E9037500 .u.Ô...F¥Ô..á^•.F..V.&..&.W.á^.& 000140
 38E90374 20470826 1E478826 0E5EC406 57892604 478926FC 5EC40257 88260788 ..&.W.á^=&.G.&.W.á^.&.G.&.G t.Ô8 000160
 E9037500 003D8C46 89000010 C89A5052 001E0510 56880E46 8837FF26 0E5EC400 .á^.&.7.F..V....RP.à....F¥=..u.Ô 000180
 05105688 0E468805 1EE98C46 88000012 079AFC76 FFFE76FF 37FF260E 5EC40017 ..á^.&.7.v±.v•......F¥Ô...F..V.. 0001A0
 37FF260E 5EC40017 E9037500 003D8C46 89000011 009AFC76 FFFE76FF 5052001E ..RP.v±.v•......F¥=..u.Ô..á^.&.7 0001C0
 8D036A16 76FF1876 FF2676FF 2876FF04 E6E98C46 88000010 E49AFC76 FFFE76FF .v±.v•.Ô....F¥ÔI..v(.v&.v..v.j.. 0001E0

Dump of file SATURN:[PCCOMMON.DUMP.DLL]DACOPY.TMP;1 on 18-APR-1990 10:39:51.10
File ID (545,24,0)   End of file block 90 / Allocated 92

Virtual block number 18 (00000012), 512 (0200) bytes

 2276FF24 76FF04BD E98C4688 0006E903 7500003D BC468900 001278 9A 5016BE46 F/.P.(....F¥=..u.Ô...F¥Ô§..v$.v" 000000
 06E90375 00003D8C 46890000 12A89A50 168E468D 036A37FF 260277FF 26125EC4 á^.&.w.&.7j..F/.P.`....F¥=..u.Ô. 000020
 89000012 D19A5016 BE468D04 6A1676FF 1876FF26 76FF2876 FF0490E9 BC468800 ..F¥Ô...v(.v&.v..v.j..F/.P.I.... 000040
 37FF2602 77FF2612 5EC42276 FF2476FF 0467E98C 46880006 E9037500 003D8C46 F¥=..u.Ô...F¥Ôg..v$.v"á^.&.w.&.7 000060
 2876FF04 3AE98C46 880006E9 03750000 3D8C4689 000012FE 9A5016BE 468D046A j..F/.P.±....F¥=..u.Ô...F¥Ô:..v( 000080
 0006E903 7500003D BC468900 0013279A 5016BE46 8D056A16 76FF1876 FF2676FF .v&.v..v.j..F/.P.'....F¥=..u.Ô.. 0000A0
 13549A50 168E468D 056A37FF 260277FF 26125EC4 2276FF24 76FF0411 E98C4688 .F¥Ô...v$.v"á^.&.w.&.7j..F/.P.T. 0000C0
 6A1676FF 1876FF26 `5FF2876 FF03E4E9 BC468800 06E90375 00003D8C 46890000 ...F¥=..u.Ô...F¥Ôð..v(.v&.v..v.j 0000E0
 FF2476FF 0388E98C ~880006 E9037500 003D8C46 8900000D 429A5016 C0468006 ..Fà.P.B....F¥=..u.Ô...F¥ÔE..v$. 000100
 03750000 3D8C4689 0000006F 9A5016C0 4680066A 37FF2602 77FF2612 5EC42276 v"á^.&.w.&.7j..Fà.P.o....F¥=..u. 000120
 76FF1C76 FF0E76FF 1076FF0A 76FF0C76 FF0676FF 0876FF03 8EE98C46 880006E9 Ô...F¥Ô...v..v..v..v..v..v..v..v 000140
 2876FF22 76FF2476 FF1676FF 1876FF1E 76FF2076 FF37FF26 0277FF26 125EC41A .á^.&.w.&.7.v .v..v..v..v$.v".v( 000160
 FF0338E9 8C468800 06E90375 00003D8C 468926C4 83143E32 909A2A76 FF2676FF .v&.v*..2>..á&.F¥=..u.Ô...F¥Ô8.. 000180
 E9037500 003D8C46 89000015 F39A5016 EC468D07 6A1676FF 1876FF26 76FF2876 v(.v&.v..v.j..Fš.P.µ....F¥=..u.Ô 0001A0
 9A5016EC 4680076A 37FF2602 77FF2612 5EC42276 FF2476FF 030FE98C 46880006 ...F¥Ô...v$.v"á^.&.w.&.7j..Fš.P. 0001C0
 C40B6A08 6A0E76FF 1076FF02 E2E98C46 880006E9 03750000 3D8C4689 00001620  ....F¥=..u.Ô...F¥Ôã..v..v.j.j.á 0001E0
```

```
Dump of file SATURN:[PCCOMMON.DUMP.DLL]DACOPY.TMP;1 on 18-APR-1990 10:39:51.10
File ID (545,24,0)    End of file block 90 / Allocated 92

Virtual block number 19 (00000013), 512 (0200) bytes

147D4CFE 9A2676FF 2876FF22 76FF2476 FF1676FF 1876FF37 FF260277 FF26125E ^.&.w.&.7.v..v..v$.v".v(.v&.±L). 000000
5EC40C6A 146A0E76 FF1076FF 02A3E9BC 46880006 E9037500 003D8C46 8918C483 .á..F¥=..u.Õ...F¥ÕÉ..v..v.j.j.á^ 000020
8314BC4D F29A26¨6 FF2876FF 2276FF24 76FF1676 FF1876FF 37FF2602 77FF2612 .&.w.&.7.v..v..v$.v".v(.v&. M¥.. 000040
125EC400 6A036A0E 76FF1076 FF0264E9 BC468800 06E90375 0000308C 468918C4 á..F¥=..u.Õ...F¥Õd..v..v.j.j.á^. 000060
C48314FB 49339A26 76FF2876 FF2276FF 2476FF16 76FF1876 FF37FF26 0277FF26 &.w.&.7.v..v..v$.v".v(.v&.3I«..á 000080
26125EC4 0E6A026A 0E76FF10 76FF0225 E98C4688 0006E903 7500003D BC468918 ..F¥=..u.Õ...F¥Õ%..v..v.j.j.á^.& 0000A0
18C48315 3A49339A 2676FF28 76FF2276 FF2476FF 1676FF18 76FF37FF 260277FF .w.&.7.v..v..v$.v".v(.v&.3I:..á. 0000C0
FF26125E C4106A03 6A0E76FF 1076FF01 E6E98C46 880006E9 03750000 3D8C4689 .F¥=..u.Õ...F¥ÕI..v..v.j.j.á^.&. 0000E0
8918C483 158A4933 9A2676FF 2876FF22 76FF2476 FF1676FF 1876FF37 FF260277 w.&.7.v..v..v$.v".v(.v&.3I...á.. 000100
FF1076FF 0A76FF0C 76FF0676 FF0876FF 01A7E9BC 46880006 E9037500 003D8C46 F¥=..u.Õ...F¥ÕI..v..v..v..v..v.. 000120
76FF2276 FF2476FF 1676FF18 76FF37FF 260277FF 26125EC4 1A76FF1C 76FF0E76 v..v..v.á^.&.w.&.7.v..v..v$.v".v 000140
0157E9BC 46880006 E9037500 003D8C46 8922C483 15C905C5 9A2A76FF 2676FF28 (.v&.v*.é.è..á".F¥=..u.Õ...F¥ÕW. 000160
2276FF24 76FF1676 FF1876FF 37FF2602 77FF2612 5EC4126A 036A0E76 FFi.¨6FF .v..v.j.j.á^.&.w.&.7.v..v..v$.v" 000180
FF0118E9 8C468800 06E90375 00003D8C 468918C4 83165E49 339A2676 FF28. FF .v(.v&.3I^..á..F¥=..u.Õ...F¥Õ... 0001A0
E9037500 003D8C46 89000012 259A5016 EA468014 6A1676FF 1876FF26 76FF2676 v(.v&.v..v.j..Fõ.P.%....F¥=..u.Õ 0001C0
9A5016EA 4680146A 37FF2602 77FF2612 5EC42276 FF2476FF 00EFE9BC 46880006 ...F¥Õy..v$.v"á^.&.w.&.7j..Fõ.P. 0001E0
```

```
Dump of file SATURN:[PCCOMMON.DUMP.DLL]DACOPY.TMP;1 on 18-APR-1990 10:39:51.10
File ID (545,24,0)    End of file block 90 / Allocated 92

Virtual block number 20 (00000014), 512 (0200) bytes

C4166A05 6A0E76FF 1076FF00 C2E98C46 880006E9 03750000 3D8C4689 00001252 R....F¥=..u.Õ...F¥Õõ..v..v.j.j.á 000000
169C4933 9A2676FF 2876FF22 76FF2476 FF1676FF 1876FF37 FF260277 FF26125E ^.&.w.&.7.v..v..v$.v".v(.v&.3I.. 000020
77FF2612 5EC40E76 FF1076FF 0083E9BC 46880006 E9037500 003D8C46 8918C483 .á..F¥=..u.Õ...F¥Õ...v..v.á^.&.w 000040
C483160B 2D909A2A 76FF2676 FF2876FF 2276FF24 76FF1676 FF1876FF 37FF2602 .&.7.v..v..v$.v".v(.v&.v*..·Ü..á 000060
26125EC4 186A026A 0E76FF10 76FF0045 E98C4688 0006E903 7500003D BC468916 ..F¥=..u.Õ...F¥ÕE..v..v.j.j.á^.& 000080
18C4830D 1849339A 2676FF28 76FF2276 FF2476FF 1676FF18 76FF37FF 260277FF .w.&.7.v..v..v$.v".v(.v&.3I...á. 0000A0
08C80026 CAC95F5E 1F0000E9 00008800 06E98C46 880006E9 03750000 3D8C4689 .F¥=..u.Õ...F¥Õ..j..Õ...^_èò&.à. 0000C0
76FF0E76 FF1076FF 0A76FF0C 76FF0676 FF0876FF 106AD88E 0F5F881E 56570000 ..WV.j_..Áj..v..v..v..v..v̄..v..v 0000E0
0006E903 7500003D F8468918 C483177A 2A009A1E 76FF1A76 FF1C76FF 1676FF18 ..v..v̄..v..v...*z..á..F½=..u.Õ.. 000100
FF0C76FF 1276FF14 76FF0676 FF0876FF 5016FA46 805016FC 46800050 E9F84688 .F½ÕP..F•.P.F•.P.v..v..v..v..v.. 000120
8922C483 13A905C5 9A1E76FF 1A76FF1C 76FF1676 FF1876FF 0E76FF10 76FF0A76 v..v..v..v..v..v..v..v..é.`..á". 000140
0010C800 1ACAC95F 5E1F0000 E90000B8 0006E9F8 46880006 E9037500 003DF846 F½=..u.Õ...F½Õ..j..Õ...^_èò..à.. 000160
16F0468D 136A1676 FF1876FF 2676FF28 76FF0000 F646C7D8 8E1706B8 1E565700 .WV.j...ÁúF-...v(.v&.v..v̄.j..FÞ. 000180
F84689F2 568BF046 8801A3E9 F4468800 06E90375 00003DF4 46890000 064B9A50 P.K....F¶=..u.Õ...F¶ÕÉ..FÞ.V·.F½ 0001A0
FF2676FF 2876FF00 C9E90375 02470B26 07B826F0 5EC404F0 46830004 E9FA5689 .V•Õ...FÞ.á^Þ&..&.G.u.Õè..v(.v&. 0001C0
FF260277 FF26F05E C41676FF 1876FF1A 76FF1C76 FF1E76FF 2076FF22 76FF2476 v$.v".v .v..v..v..v..v.á^Þ&.w.&. 0001E0
```

```
Dump of file SATURN:[PCCOMMON.DUMP.DLL]DACOPY.TMP;1 on 18-APR-1990 10:39:51.10
File ID (545,24,0)    End of file block 90 / Allocated 92

Virtual block number 21 (00000015), 512 (0200) bytes

E9037500 003DF446 89189B19 819A1276 FF1476FF 5016FC46 800E76FF 1076FF37 7.v..v..F•.P.v..v.......F¶=..ù.Õ 000000
76FFFA76 FF2676FF 2876FF00 6DE9F646 89F4468B 0009E903 7494FFF4 7E81002A *..-¶..t.Õ...F¶.F-Õm..v(.v&.v•.v 000020
5EC41676 FF1876FF 2276FF24 76FF2676 FF2876FF 010EE9F4 46880000 0B0A9AF8 ½......F¶Õ...v(.v&.v$.v".v..v.á^ 000040
F4468917 3026D39A FC76FFFE 76FF37FF 260277FF 26F05EC4 37FF2602 77FF260E .&.w.&.7á^Þ&.w.&.7.v±.v=.Æ&O..F¶ 000060
E90088E9 F4468800 0018CF9A F876FFFA 76FF2676 FF2876FF 0017E903 75000030 =..u.Õ...v(.v&.v•.v½.ù....F¶ÕÉ.Õ 000080
46880006 E9037500 003DF446 89000018 629AF876 FFFA76FF 2676FF28 76FFFF24 $..v(.v&.v•.v½.b....F¶=..u.Õ...F 0000A0
FF2476FF 1676FF18 76FF37FF 260277FF 260E5EC4 1276FF14 76FF106A 0096E9F4 ¶Õ..j..v..v.á^.&.w.&.7.v..v..v$. 0000C0
46880006 E9037500 003DF446 8918C483 195E2A0D 9A2A76FF 2676FF28 76FF2276 v".v(.v&.v*..*^..á..F¶=..u.Õ...F 0000E0
260E5EC4 1A76FF1C 76FF1276 FF1476FF 0A76FF0C 76FF0676 FF0876FF 0056E9F4 ¶ÕV..v..v..v..v..v..v..v..v.á^.& 000100
183505C5 9A2A76FF 2676FF28 76FF2276 FF2476FF 1676FF18 76FF37FF 260277FF .w.&.7.v..v..v$.v".v(.v&.v*.é.5. 000120
26CAC95F 5E1F0000 E9F6468B 0006E9F4 46880006 E9037500 003DF446 8922C483 .á".F¶=..u.Õ...F¶Õ...F-Õ...^_èò& 000140
4689A846 890000B8 FF4A8689 FF4C8689 000088D8 8E17A5B8 1E565700 00C2C800 .àó..WV.¡É..Áj....L...J.j...F̄´.F 000160
FF4E8689 FF508689 0000889E 4689A046 890000B8 FF3E8689 FF408689 000088A6 Ij....a...>.j...F..F.j....P...N. 000180
3924568B 22468800 01FA46C7 FF448689 FF468689 000088F6 4689F846 890000B8 j...F½.F-j....F...D.úF•...F".V$9 0001A0
76FF1476 FF1676FF 1876FF26 76FF2876 FF0129E9 03742856 390131E9 03742646 F&t.Õ1.9V(t.Õ)..v(.v&.v..v..v..v 0001C0
009A5016 F6468050 16FF4486 805016FF 4E868050 16FF4A86 805016FF 3E868012 ...>..P..J..P..N..P..D..P.F-.P.. 0001E0
```

```
Dump of file SATURN:[PCCOMMON.DUMP.DLL]DACOPY.TMP;1 on 18-APR-1990 10:39:51.10
File ID (545,24,0)   End of file block 90 / Allocated 92

Virtual block number 22 (00000016), 512 (0200) bytes

 FF4A8639 205681F 468806FA E9FF4886 880007E9 03750000 3DFF4886 891C8E00 .....H.=..u.Ô....H.Ô*..F..V 9.J. 000000
 0676FF08 76FF0E76 FF1076FF 0A76FF0C 76FF0050 E90374FF 4C963900 59E90374 t.ÔY.9.L.t.ÔP..v..v..v..v..v..v. 000020
 2276FF24 76FF1A76 FF1C76FF 1676FF18 76FFFF3E B6FFFF40 B6FF1276 FF1476FF .v..v..Ña..Ñ>..v..v..v..v..v$.v" 000040
 76FF0074 E90695E9 FF48868B 0007E903 7500003D FF488689 20C48319 0E21379A .7I...á ..H.=..u.Ô....H.Ô..Ôt..v 000060
 07E90375 00003DFF 48868900 001C459A 5016FF52 86801676 FF1876FF 2676FF28 (.v&.v..v...R..P.E.....H.=..u.Ô. 000080
 FF1076FF FF4AB6FF FF4CB6FF 1A76FF1C 76FF2276 FF2476FF 0668E9FF 48868800 ...H.Ôh..v$.v".v..v..ÑL..ÑJ..v.. 0000A0
 890000FF FF9A016A 0A76FF0C 76FF006A 006A5016 FF52868D 5016FF3E 86800E76 v...>..P..R..Pj.j..v..v.j....... 0000C0
 065EC400 01FA46C7 0618E900 0088061E E9FF4886 880007E9 03750000 3DFF4886 .H.=..u.Ô....H.Ô..|..Ô..úF*..á^. 0000E0
 065EC400 000F939A 1677FF26 1877FF26 065EC400 F8E90375 18470826 16478826 &.G.&.G.u.Ô%.á^.&.w.&.w......á^. 000100
 16468BA2 5EC40077 E9037400 003D0000 0FA89A50 16A2468D 1677FF26 1877FF26 &.w.&.w..FÅ.P. ...=..t.Ôw.á^Å.F. 000120
 76FF1876 FF2676FF 2876FF00 59E90374 12573926 0062E903 74104739 26185688 .V.&9G.t.Ôb.&9W.t.ÔY..v(.v&.v..v 000140
 261877FF 26065EC4 0017E903 7500003D FF488689 0000FFFF 9A5016FF 42868D16 ...B..P.......H.=..u.Ô..á^.&.w.& 000160
 5EC40000 FA46C700 05E90374 00FF42BE 830581E9 FF48868B 000018CA 9A1677FF .w..ò.....H.Ô.../B..t.Ô..úF*..á^ 000180
 124688A2 5EC4004B E9037400 FA7E83FF 6CE90000 0F0F9A16 77FF2618 77FF2606 .&.w.&.w..Ô...Ôl..-*.t.ÔK.á^Å.F. 0001A0
 0E578826 0C478826 A25EC400 30E90374 0A573926 0039E903 74084739 26145688 .V.&9G.t.Ô9.&9W.t.Ô0.á^Å&.G.&.W. 0001C0
 88025789 26078926 0E5EC416 57882614 478826A2 5EC40257 89260789 260A5EC4 á^.&..&.W.á^Å&.G.&.W.á^.&..&.W.| 0001E0

Dump of file SATURN:[PCCOMMON.DUMP.DLL]DACOPY.TMP;1 on 18-APR-1990 10:39:51.10
File ID (545,24,0)   End of file block 90 / Allocated 92

Virtual block number 23 (00000017), 512 (0200) bytes

 86801676 FF1876FF 2676FF28 76FF0789 26024789 26000088 0A5EC405 08E994FF ..Ô..á^.|..&.G.&...v(.v&.v..v... 000000
 FF2876FF 0404E9FF 48868800 07E90375 00003DFF 48868900 0010009A 5016FF52 R..P.......H.=..u.Ô....H.Ôá..v(. 000020
 5016FF4E 86805016 FF4AB68D 5016FF3E 86801276 FF1476FF 1676FF18 76F''7676 v&.v..v..v..v...>..P..J..P..N..P 000040
 FF48868B 0007E903 7500003D FF488689 FFFF0000 9A5016F6 46805016 FF44C'8D ..D..P.F-.P.......H.=..u.Ô....H. 000060
 1077FF26 065EC404 77E994FA 880006E9 03741047 08260E47 8B26065E C404BL·9 Ô..á^.&.G.&.G.t.Ô..|*.Ôw.á^.&.w. 000080
 003D0000 1D869A50 16FC468D 0E77FF26 1077FF26 065EC400 001DA19A 0E77FF26 &.w..Å...á^.&.w.&.w..F=.P.Ñ...=. 0000A0
 E9037402 57392600 75E90374 073926FF 4C9688FF 4A8688FC 5EC4008B E9037400 .t.Ô..á^•..J...L.&9.t.Ôu.&9W.t.Ô 0000C0
 3DFF4886 8900001D F49A5016 FF42868D FF4AB6FF FF4CB6FF 2676FF28 76FF006C L..v(.v&.ÑL..ÑJ...B..P.¶.....H.= 0000E0
 8E8303F2 E9FF4886 8800001D 6A9A0E77 FF261077 FF26065E C40017E9 03750000 ..u.Ô..á^.&.w.&.w..j.....H.Ô...ƒ 000100
 5EC4A856 89A64689 06578826 04478826 FC5EC400 00FA46C7 0016E903 7400FF42 B..t.Ô..úF*..á^•&.G.&.W..F!.V´á^ 000120
 0380E994 F8880006 E9037500 FA7E83FF 58E90000 1E109A0E 77FF2610 77FF2606 .&.w.&.w......ÔX..-*.u.Ô..|«.Ô¯. 000140
 1677FF26 1877FF26 065EC401 73E90375 18470826 16478826 065EC400 01FA46C7 úF*..á^.&.G.&.G.u.Ôs.á^.&.w.&.w. 000160
 E9037400 003D0000 184E9A50 16A2468D 1677FF26 1877FF26 065EC400 0018399A .9...á^.&.w.&.w..FÅ.P.N...=..t.Ô 000180
 FF006CE9 03741257 39260075 E9037410 473926FF 409688FF 3E8688A2 5EC40114 ..á^Å..>...a.&9G.t.Ôu.&9W.t.Ôl.. 0001A0
 7500003D FF488689 00001E7C 9A5016FF 42868DFF 3E86FFFF 4086FF26 76FF2876 v(.v&.Ña..Ñ>...B..P.|.....H.=..u 0001C0
 00FF42BE 830315E9 FF48868B 00001E47 9A1677FF 261877FF 26065EC4 0017E903 .Ô..á^.&.w.&.w..G.....H.Ô.../B.. 0001E0

Dump of file SATURN:[PCCOMMON.DUMP.DLL]DACOPY.TMP;1 on 18-APR-1990 10:39:51.10
File ID (545,24,0)   End of file block 90 / Allocated 92

Virtual block number 24 (00000018), 512 (0200) bytes

 FF26065E C4A05689 9E468916 57882614 478826A2 5EC40000 FA46C700 16E90374 t.Ô..úF*..á^Å&.G.&.W..F..V.á^.&. 000000
 39260075 E9037407 3926FF40 9688FF3E 8688A25E C400001E 989A1677 FF261877 w.&.w......á^Å..>...a.&9.t.Ôu.&9 000020
 00001883 9A5016FF 42868DFF 3E86FFFF 4086FF26 76FF2876 FF006CE9 03740257 W.t.Ôl..v(.v&.Ña..Ñ>...B..P..... 000040
 FF48868B 00001ECF 9A1677FF 261877FF 26065EC4 0017E903 7500003D FF488689 ..H.=..u.Ô..á^.&.w.&.w..ü.....H. 000060
 9E468906 57882604 478826A2 5EC40000 FA46C700 16E90374 00FF42BE 830280E9 Ô.../B..t.Ô..úF*..á^Å&.G.&.W..F. 000080
 FF0029E9 037400FA 7E83FECF E900001B A49A1677 FF261877 FF26065E C4A05689 .V.á^.&.w.&.w..Ê...Ôü±.~*.t.Ô).. 0000A0
 07E90375 00003DFF 48868900 001F259A 5016AA46 809E76FF A076FF22 76FF2476 v$.v".v..v..F¨.P.X.....H.=..u.Ô. 0000C0
 8DFF3E86 FFFF4086 FF2676FF 2876FF00 28E90375 00FA7E83 0228E9FF 48868800 ...H.Ô(..-*.u.Ô+..v(.v&.Ña..Ñ>.. 0000E0
 089E4688 01F4E9FF 48868800 07E90375 00003DFF 48868900 001A819A 5016AA46 F¨.P.Ÿ.....H.=..u.Ô....H.Ô¶..F.. 000100
 25E19A22 76FF2476 FF1A76FF 1C76FF50 16AA468D 50169E46 800031E9 0374A046 F.t.Ô1..F..P.F¯.P.v..v..v$.v".ÀX 000120
 0374A046 089E4688 0188E9FF 48868800 07E90375 00003DFF 48868910 C4831F9C ...á...H.=..u.Ô....H.Ô|..F..F.t. 000140
 C4831A83 25E19A22 76FF2476 FFA676FF A876FF50 16AA468D 50169E46 800031E9 Ô1..F..P.F¨.P.v´.v|.v$.v".ÀX...á 000160
 74164639 FF409688 FF3E8688 017CE9FF 48868800 07E90375 00003DFF 48868910 ...H.=..u.Ô....H.Ô|...>...a.9F.t 000180
 76FFA676 FFA876FF 1A76FF1C 76FF2276 FF2476FF 005DE903 74185639 0065E903 .Ôe.9V.t.Ô]..v$.v".v..v..v´.v|.v 0001A0
 FB9A016A 0A76FF0C 76FF5016 FF52868D 5016FF52 86800E76 FF1076FF 0E76FF10 ..v..v..v...R..P..R..P.v..v.j..« 0001C0
 02578826 0788260E 5EC4011A E9FF4886 880007E9 03750000 3DFF4886 8900001A .....H.=..u.Ô....H.Ô..á^.&..&.W. 0001E0
```

```
Dump of file SATURN:[PCCOMMON.DUMP.DLL]DACOPY.TMP;1 on 18-APR-1990 10:39:51.10
File ID (545,24,0)   End of file block 90 / Allocated 92

Virtual block number 25 (00000019), 512 (0200) bytes

 76FF1076 FFA676FF A876FF1A 76FF1C76 FF2276FF 2476FF00 48E9A056 899E4689 .F..V.ÕH..v$.v".v..v..v`.v!.v..v 000000
 86890000 1FFF9A01 6A0A76FF 0C76FF50 16AA468D 5016FF52 868D5016 9E468D0E ..F..P..R..P.F`.P.v..v.j........ 000020
 FF260277 FF260E5E C41676FF 1876FF00 8FE9FF48 868B0007 E9037500 003DFF48 H.=..u.Õ....H.Õ«..v..v.á^.&.w.&. 000040
 FF9E76FF A076FF'F 3E86FFFF 4086FF37 FF260277 FF260A5E C41276FF 1476FF37 7.v..v.á^.&.w.&.7.Ña..Ñ>..v..v.. 000060
 FA7E8300 73E9FF48 86880007 E9037500 003DFF48 86892115 08679A06 76FF0876 v..v..g..!..H.=..u.Õ....H.Õs..-* 000080
 86FF004C E9037518 56390008 E9037416 4639FF40 968BFF3E 86880064 E9037500 .u.Õd...>...a.9F.t.Õ..9V.u.ÕL..Ñ 0000A0
 FF1876FF 37FF2602 77FF260A 5EC41276 FF1476FF 9E76FFA0 76FFFF3E B6FFFF40 a..Ñ>..v..v..v..v.á^.&.w.&.7.v.. 0000C0
 03750000 30FF4886 8905A508 679A0676 FF0876FF 37FF2602 77FF260E 5EC41676 v.á^.&.w.&.7.v..v..g.E...H.=..u. 0000E0
 89881E56 570000A8 C80024CA C95F5E1F 0000E900 00880006 E9FF4886 880007E9 Õ....H.Õ..¡..Õ...^_èÕ$.à`..WV.¡. 000100
 C59A1A77 FF261C77 FF261A5E C4008BE9 03751C47 0B261A47 8B261A5E C4D88E19 ..Ää^.&.G.&.G.u.Õ.-á^.&.w.&.w..é 000120
 005EE903 7400003D J0001CDA 9A5016F6 468D1A77 FF261C77 FF261A5E C400001C ...á^.&.w.&.w..F-.P.Õ...=..t.Õ^. 000140
 FF261A5E C40040E9 03740A57 39260049 E9037408 47392618 56881646 8BF65EC4 á^-.F..V.&9G.t.Õ!.&9W.t.Õa.á^.&. 000160
 02578926 0789261E ›EC41657 88261447 8826F65E C400001D 339A1A77 FF261C77 w.&.w..3...á^-&.G.&.W.á^.&..&.W. 000180
 76FFFF85 E90401E9 94FFB802 57892607 8926225E C40E5788 260C4788 26F65EC4 á^-&.G.&.W.á^"&..&.W.¡..Õ..Õ...v 0001A0
 0007E903 7500003D FF5C8689 00002397 9A5016AA 468D0E76 FF1076FF 0676FF08 ..v..v..v..F`.P..#....\.=..u.Õ.. 0001C0
 0164E903 740E4639 14568812 468BFF58 8689FF5A 86890000 8803D5E9 FF5C8688 ..\.Õ!.¡....Z...X..F..V.9F.t.Õd. 0001E0

Dump of file SATURN:[PCCOMMON.DUMP.DLL]DACOPY.TMP;1 on 18-APR-1990 10:39:51.10
File ID (545,24,0)   End of file block 90 / Allocated 92

Virtual block number 26 (0000001A), 512 (0200) bytes

 1E76FF20 76FF0A76 FF0C76FF 0A76FF0C 76FF0676 FF0876FF 015CE903 74105639 9V.t.Õ\..v..v..v..v..v..v..v .v. 000000
 5C868900 0023E09A 016A2276 FF2476FF 5016AA46 8D5016AA 468D1E76 FF2076FF .v .v..F`.P.F`.P.v$.v"j..Å#....\ 000020
 0029E903 741C4708 261A4788 261A5EC4 036CE9FF 5C868800 07E90375 00003DFF .=..u.Õ....\.Õl.á^.&.G.&.G.t.Õ). 000040
 E9037500 003DFF5C 86890000 24EF9A50 52001A05 1C56881A 468B37FF 261A5EC4 á^.&.7.F..V....RP.y$....\.=..u.Õ 000060
 5C868900 0011579A 5016F646 8D186A17 6A37FF26 1A5EC403 33E9FF5C 86880007 ....\.Õ3.á^.&.7j.j..F-.P.W.....\ 000080
 02578926 07892610 56880E46 8BF65EC4 030CE9FF 5C868800 07E90375 000030FF .=..u.Õ....\.Õ..á^-.F..V.&..&.W. 0000A0
 89261856 88164688 F65EC406 57892604 478926F6 5EC40257 88260788 261E5EC4 á^.&..&.W.á^-&.G.&.W.á^-.F..V.&. 0000C0
 468BF65E C40E5789 260C4789 26F65EC4 02578826 07882622 5EC40A57 89260847 G.&.W.á^"&..&.W.á^-&.G.&.W.á^-.F 0000E0
 57892614 478926F6 5EC40257 88260788 261E5EC4 12578926 10478926 1056880E ..V.&.G.&.W.á^.&..&.W.ε^-&.G.&.W 000100
 03750000 30FF5C86 89000011 EB9AF676 FFF876FF 5052001A 051C5688 1A468816 ..F..V....RP.v½.v-.Š.....\.=..u. 000120
 58E90000 880261E9 FF5C8688 000011CF 9AF676FF F876FF37 FF261A5E C40018E9 Õ..á^.&.7.v½.v-.ü.....\.Õa.¡..Õ[ 000140
 30FF5C86 8900001E F19A5016 FF5E868D 1276FF14 76FF0676 FF0876FF 0073E902 .Õs..v..v..v..v...^..P.þ.....\.= 000160
 0A76FF0C 76FF0A76 FF0C76FF 0676FF08 76FF022E E9FF5C86 880007E9 03750000 ..u.Õ....\.Õ...v..v..v..v..v..v. 000180
 9A016A22 76FF2476 FF5016FF 5E868D50 16AA468D 5016FF58 868D1E76 FF2076FF .v .v...X..P.F`.P..^..P.v$.v"j.. 0001A0
 0876FF06 76FF0876 FF01E5E9 FF5C868B 0007E903 7500003D FF5C8689 0000205A Z ....\.=..u.Õ....\.Õ!..v..v..v. 0001C0
 FF260277 FF26225E C41676FF 1876FFFF 5886FFFF 5A86FF12 76FF1476 FF0676FF .v..v..v..ÑZ..ÑX..v..v.á^"&.w.&. 0001E0

Dump of file SATURN:[PCCOMMON.DUMP.DLL]DACOPY.TMP;1 on 18-APR-1990 10:39:51.10
File ID (545,24,0)   End of file block 90 / Allocated 92

Virtual block number 27 (00000018), 512 (0200) bytes

 76FF1C76 FF106A01 A3E9FF5C 86880007 E9037500 003DFF5C 86892464 26D39A37 7.Æ&d$..\.=..u.Õ....\.ÕÈ.j..v..v 000000
 FF261A5E C40676FF 0876FF06 76FF0876 FF1276FF 1476FFFF 5886FFFF 5A86FF1A ..ÑZ..ÑX..v..v..v..v..v..v.á^.&. 000020
 16FC468D 0160E9FF 5C868800 07E90375 00003DFF 5C868918 C48324B5 2A009A37 7..*ç$.á...\.=..u.Õ....\.Õ'..F•. 000040
 1276FF14 76FFFF58 86FFFF5A 86FF0A76 FF0C76FF 1A76FF1C 76FF5016 FA468D50 P.F*.P.v..v..v..v..ÑZ..ÑX..v..v. 000060
 003DFF5C 868922C4 831F6005 C59A37FF 261A5EC4 0676FF08 76FF0676 FF0876FF .v..v..v..v.á^.&.7.é.'..á"..\.=. 000080
 1A5EC400 29E90374 1C470826 1A478826 1A5EC401 0FE9FF5C 86880007 E9037500 .u.Õ....\.Õ..á^.&.G.&.G.t.Õ).á^. 0000A0
 880007E9 03750000 30FF5C86 89000011 839A5052 001A051C 56881A46 8837FF26 &.7.F..V....RP.*.....\.=..u.Õ... 0000C0
 003DFF5C 86890000 22899A50 16F64680 186A176A 37FF261A 5EC40006 E9FF5C86 .\.Õ•.á^.&.7j.j..F-.P.¿"....\.=. 0000E0
 1E5EC402 57892607 89261056 880E4688 F65EC400 AFE9FF5C 86880007 E9037500 .u.Õ....\.ÕE.á^-.F..V.&..&.W.á^. 000100
 26084789 26185688 164688F6 5EC40657 89260447 8926F65E C4025788 26078826 &..&.W.á^-&.G.&.W.á^-.F..V.&.G.& 000120
 56881246 8BF65EC4 0E578926 0C478926 F65EC402 57882607 8826225E C40A5789 .W.á^"&..&.W.á^-&.G.&.W.á^-.F..V 000140
 881A4688 16578926 14478926 FF5A9688 FF588688 F65EC412 57892610 47892614 .&.G.&.W.á^-..X...Z.&.G.&.W..F.. 000160
 5EC40018 E9037500 003DFF5C 86890000 23539AF6 76FFF876 FF505200 1A051C56 V....RP.v½.v-.S#....\.=..u.Õ..á^ 000180
 C95F5E1F 0000E900 00880006 E9FF5C86 88000023 709AF676 FFF876FF 37FF261A .&.7.v½.v-.p#....\.Õ..¡..Õ...^_è 0001A0
 5016F646 8D126A0A 76FF0C76 FF0676FF 0876FF08 8E213F88 1E565700 0056C8C8 ùàV..WV.¡?!.Á.v..v..v..v.j..F-¯P 0001C0
 89FC4689 F8568BF6 46880088 E9FA4688 0006E903 7500003D FA468900 0017C29A .ô....F*=..u.Õ...F*Õ¡..F-.V½.F•. 0001E0
```

```
Dump of file SATURN:[PCCOMMON.DUMP.DLL]DACOPY.TMP;1 on 18-APR-1990 10:39:51.10
File ID (545,24,0)   End of file block 90 / Allocated 92

Virtual block number 28 (0000001C), 512 (0200) bytes

5EC40676 FF0876FF 006EE903 7502470B 26078B26 FC5EC404 FC468300 04E9FE56 V±Ô...F=.á^=&..&.G.u.Ôn..v..v.á^ 000000
0876FF00 17E90375 00003DFA 46890000 21F09A50 16AA4680 37FF2602 77FF26FC =&.w.&.7.F¨.P.Ð!...F°=..u.Ô...v. 000020
9A5016AA 4680DE76 FF1076FF 005AE9FA 46880000 26839AF6 76FFF876 FF0676FF .v..v½.v-.°&...F°ÔZ..v..v..F¨.P. 000040
02578926 07892612 5EC40257 88260788 26FC5EC4 0017E903 74000030 0000FFFF ....=..t.Ô..á^=&..&.W.á^.&..&.W. 000060
E9037500 003DFA46 89000018 859AF676 FFFB76FF 0676FF08 76FFFF7F E90003E9 Ô..Ô...v..v..v½.v-.ç... F°=..u.Ô 000080
FFD88E25 E9881E56 57000024 C8C8C95F 5E1F0000 E9000088 0006E9FA 46880006 ...F°Ô..¡..Ô...^_èùà$..Ŀ⁄.¡ÔX.Á. 0000A0
E9037500 0030E046 ·9000027 719A5016 FA468000 6A0A76FF 0C76FF1A 76FF1C76 v..v..v..v.j..F°.P.g'...FÁ=..u.Ô 0000C0
46C70021 E90374FC ʖ5390029 E90374FA 46391456 8B124688 02FEE9E0 46880006 ...FÁÔ±..F..V.9F°t.Ô).9V°t.Ô!.úF 0000E0
C7001EE9 0006F046 C70007E8 46C70005 F846C700 03E646C7 0004F646 C70002EA ô..úF-..úF!..úF½..úFÔ..úFÞ..Ô..ú 000100
1876FF00 04F046C7 0004E846 C70002F8 46C70006 E646C700 07F646C7 0005EA46 Fô..úF-..úF!..úF½..úFÔ..úFÞ...v. 000120
0006E903 7500003D E0468900 0004059A 5016FA46 80D06A06 76FF0876 FF1676FF .v..v..v.j..F°.P......FÁ=..u.Ô.. 000140
02DC46C7 0021E903 74FC5639 0029E903 74FA4639 10568B0E 46880280 E9E04688 .FÁÔ...F..V.9F°t.Ô).9V°t.Ô!.úFÉ. 000160
DC46C700 1EE90006 DE46C700 07EE46C7 0005E246 C70003FE 46C70004 EC46C700 .úF$..úF±..úFã..úFŸ..úFB..Ô..úFÉ 000180
76FF1C76 FF0004DE 46C70004 EE46C700 02E246C7 0006FE46 C70007EC 46C70005 ..úF$..úF±..úFã..úFŸ..úF8...v..v 0001A0
8B0006E9 03750000 3DE04689 00002844 9A5016F2 4680EA76 FF0A76FF 0C76FF1A ..v..v..vô.F¨.P.D(...FÁ=..u.Ô... 0001C0
46890000 286E9A50 16F24680 DC76FF06 76FF0876 FF1676FF 1876FF02 01E9E046 FÁÔ...v..v..v..v..vÉ.F¨.P.n(...F 0001E0

Dump of file SATURN:[PCCOMMON.DUMP.DLL]DACOPY.TMP;1 on 18-APR-1990 10:39:51.10
File ID (545,24,0)   End of file block 90 / Allocated 92

Virtual block number 29 (0000001D), 512 (0200) bytes

4680E676 FF0A76FF C:76FF1A 76FF1C76 FF01D7E9 E0468800 06E90375 00003DE0 Á=..u.Ô...FÁÔa..v..v..v..v..vl.F 000000
FF1676FF 1876FF01 A0E9E046 880006E9 03750000 3DE04689 00002898 9A5016F2 ¨.P..(...FÁ=..u.Ô...FÁÔÜ..v..v.. 000020
E0468800 06E90375 0C003DE0 46890000 28C29A50 16F24680 FE76FF06 76FF0876 v..v..v±.F¨.P.ô(...FÁ=..u.Ô...FÁ 000040
3DE04689 000028EC 9A5016F2 4680F676 FF0A76FF 0C76FF1A 76FF1C76 FF0183E9 Ô...v..v..v..v..v-.F¨.P.$(...FÁ= 000060
16F24680 EC76FF06 76FF0876 FF1676FF 1876FF01 59E9E046 880006E9 03750000 ..u.Ô...FÁÔY..v..v..v..v..v$.F¨. 000080
0C76FF1A 76FF1C76 FF012FE9 E0468800 06E90375 00003DE0 46890000 29169A50 P..)...FÁ=..u.Ô...FÁÔ/..v..v..v. 0000A0
05E9E046 880006E9 03750000 3DE04689 00002940 9A5016F2 4680F876 FF0A76FF .v..v½.F¨.P.@)...FÁ=..u.Ô...FÁÔ. 0000C0
00003DE0 46890000 296A9A50 16F24680 E276FF06 76FF0876 FF1676FF 1876FF01 ..v..v..v..v..vâ.F¨.P.j)...FÁ=.. 0000E0
9A5016F2 4680F076 FF0A76FF 0C76FF1A 76FF1C76 FF000BE9 E0468800 06E90375 u.Ô...FÁÔÜ..v..v..v..v..vÞ.F¨.P. 000100
76FF0876 FF1676FF 1876FF00 B1E9E046 880006E9 03750000 3DE04689 00002994 .)...FÁ=..u.Ô...FÁÔŸ..v..v..v..v 000120
FF0087E9 E0468800 06E90375 00003DE0 46890000 29BE9A50 16F24680 DE76FF06 ..vB.F¨.P./)...FÁ=..u.Ô...FÁÔ... 000140
03750000 3DE04689 00001303 9A5016F2 4680E876 FF0A76FF 0C76FF1A 76FF1C76 v..v..v..v..vÔ.F¨.P.Æ....FÁ=..u. 000160
29E89A50 16F24680 EE76FF06 76FF0876 FF1676FF 1876FF00 5DE9E046 880006E9 Ô...FÁÔ]..v..v..v..v..vŸ.F¨.P.Š) 000180
0876FF16 76FF1876 FF01E446 C60033E9 E0468800 06E90375 00003DE0 46890000 ...FÁ=..u.Ô...FÁÔ3.6Fõ..v..v..v. 0001A0
0006E9E0 46880006 E9037500 003DE046 89000014 009A5016 E44680DA 6A0676FF .v.j..Fõ.P......FÁ=..u.Ô...FÁÔ.. 0001C0
FF0876FF 0A76FFD8 8E2608B8 1E565700 0008C800 18CAC95F 5E1F0000 E9000088 ¡..Ô...^_èò..à...WV.¡Ù&.Á.v..v.. 0001E0

Dump of file SATURN:[PCCOMMON.DUMP.DLL]DACOPY.TMP;1 on 18-APR-1990 10:39:51.10
File ID (545,24,0)   End of file block 90 / Allocated 92

Virtual block number 30 (0000001E), 512 (0200) bytes

E9F84688 0006E903 7500003D F8468900 002A7F9A 5016FC46 8D036A10 76FF1276 v..v.j..F•.P..*...F½=..u.Ô...F½Ô 000000
00003DF8 46890000 2AA89A50 16FC4680 036A1476 FF1676FF 0C76FF0E 76FF0349 I..v..v..v..v.j..F•.P.¨*...F½=.. 000020
D19A5016 FC468004 6A1076FF 1276FF08 76FF0A76 FF0320E9 F8468800 06E90375 u.Ô...F½Ô ..v..v..v..v.j..F•.P.i 000040
1476FF16 76FF0C76 FF0E76FF 02F7E9F8 46880006 E9037500 003DF846 8900002A *...F½=..u.Ô...F½Ô%..v..v..v..v. 000060
0A76FF02 CEE9F846 880006E9 03750000 3DF84689 00002AFA 9A5016FC 4680046A j..F•.P.°*...F½=..u.Ô...F½Ôö..v. 000080
0006E903 7500003D F8468900 002B239A 5016FC46 80056A10 76FF1276 FF0876FF .v..v..v.j..F•.P.#+...F½=..u.Ô.. 0000A0
46890000 2B4C9A50 16FC4680 056A1476 FF1676FF 0C76FF0E 76FF02A5 E9F84688 .F½ÔE..v..v..v..v.j..F•.P.L+...F 0000C0
FA468006 6A1076FF 1276FF08 76FF0A76 FF027CE9 F8468800 06E90375 00003DF8 ½=..u.Ô...F½Ô|..v..v..v..v.j..F° 0000E0
76FF0C76 FF0E76FF 0253E9F8 46880006 E9037500 003DF846 89000027 F09A5016 .P.b'...F½=..u.Ô...F½ÔS..v..v..v 000100
2AE9F846 880006E9 03750000 3DF84689 0000281A 9A5016FA 4680066A 14/ᴗ¨F16 ..v.j..F°.P..(...F½=..u.Ô...F½Ô* 000120
7500003D F8468900 002A209A 5016FA46 80076A10 76FF1276 FF0876FF 0A76Ͱ 12 ..v..v..v..v.j..F°.P.-*...F½=..u 000140
2BC89A50 16FA4680 076A1476 FF1676FF 0C76FF0E 76FF0201 E9F84688 0006E903 .Ô...F½Ô...v..v..v..v.j..F°.P.ù+ 000160
1676FF0C 76FF0E76 FF01FA46 C601D8E9 F8468800 06E90375 00003DF8 46890000 ...F½=..u.Ô...F½ÔÁ.6F°..v..v..v. 000180
01ABE9F8 46880006 E9037500 003DF846 8900002A 569A5016 FA4680DE 6A1476FF .v.j..F°.P.V*...F½=..u.Ô...F½Ô¨. 0001A0
FF0A76FF 0C76FF0E 76FF1076 FF1276FF 1476FF16 76FF086A 036A1876 FF1A76FF .v..v.j.j..v..v..v..v..v..v..v.. 0001C0
75101C7E 830170E9 F8468800 06E90375 00003DF8 468918C4 832C4949 339A0876 v..3II,.á..F½=..u.Ô...F½Ôp..-..u 0001E0
```

```
Dump of file SATURN:[PCCOMMON.DUMP.DLL]DACOPY.TMP;1 on 18-APR-1990 10:39:51.10
File ID (545,24,0)   End of file block 90 / Allocated 92

Virtual block number 31 (0000001F), 512 (0200) bytes

 0C76FF0E 76FF1076 FF1276FF 1476FF16 76FF106A 126A1876 FF1A76FF 003BE903 .Ô;..v..v.j.j..v..v..v..v..v..v. 000000
 FF012CE9 F8468800 06E90375 00003DF8 468918C4 832C8449 339A0876 FF0A76FF .v..v..3I.,.á..F½=..u.Ô...F½Ô,.. 000020
 76FF0A76 FF0C76FF 0E76FF10 76FF1276 FF1476FF 1676FF11 6A036A18 76FF1A76 v..v.j.j..v..v..v..v..v..v..v..v 000040
 1876FF1A 76FF00F1 E9F8468B 0006E903 7500003D F8468918 C4832CBF 49339A08 ..3I«,.á..F½=..u.Ô...F½Ôþ..v..v. 000060
 F949339A 0876FF0A 76FF0C76 FF0E76FF 1076FF12 76FF1476 FF1676FF 146A036A j.j..v..v..v..v..v..v..v..v..3I* 000080
 76FF1676 FF1876FF 1A76FF00 B6E9F846 880006E9 03750000 3DF84689 18C4832C ,.á..F½=..u.Ô...F½ÔR..v..v..v..v 0000A0
 468916C4 8320342D 909A0676 FF0876FF 0A76FF0C 76FF0E76 FF1076FF 1276FF14 ..v..v..v..v..v..v..v...-4-.á..F 0000C0
 FF1476FF 1676FF16 6A056A18 76FF1A76 FF007CE9 F8468800 06E90375 00003DF8 ½=..u.Ô...F½Ô|..v..v.j.j..v..v.. 0000E0
 7500003D F8468918 C483206F 49339A08 76FF0A76 FF0C76FF 0E76FF10 76FF1276 v..v..v..v..v..v..3Io-.á..F½=..u 000100
 1076FF12 76FF1476 FF1676FF 176A056A 1876FF1A 76FF0041 E9F8468B 0006E903 .Ô...F½ÔA..v..v.j.j..v..v..v..v. 000120
 880006E9 03750000 3DF84689 18C48324 2449339A 0876FF0A 76FF0C76 FF0E76FF .v..v..v..v..3I$$.á..F½=..u.Ô... 000140
 FF0A76FF 088E2A15 881E5657 000022C8 C8C95F5E 1F0000E9 00008800 06E9F846 F½Ô..|..Ô...^_èùä"..WV.¡.*.À.v.. 000160
 E8468800 06E90375 00003DE8 46890000 08F19A50 16EA468D 1076FF12 76FF0876 v..v..v..Fò.P.þ....FÒ=..u.Ô...FÒ 000180
 46890857 8B260647 8B26185E C4001AE6 46C70003 EC46C700 3FE9EA46 8B01D6E9 Ô■..FõÔ?.úF$..úF|..á^.&.G.&.W..F 0001A0
 89F84689 04578B26 02478B26 185EC400 15E646C7 0005EC46 C70034E9 FA5689F8 ½.V*Ô4.úF$..úF|..á^.&.G.&.W..F½. 0001C0
 76FF0A76 FF0000E9 FFB1E903 7500053D FFD7E903 75000330 0013E900 16E9FA56 V*Ô..Ô..=..u.Ô■.=..u.ÔY.Ô...v..v 0001E0

Dump of file SATURN:[PCCOMMON.DUMP.DLL]DACOPY.TMP;1 on 18-APR-1990 10:39:51.10
File ID (545,24,0)   End of file block 90 / Allocated 92

Virtual block number 32 (00000020), 512 (0200) bytes

 880006E9 0375000· 30E84689 00002601 9A5016F4 4680E676 FF1076FF 1276FF08 ..v..v..vl.F¶.P..&...FÒ=..u.Ô... 000000
 082607B8 26F45EC4 04F44683 0004E9F0 5689EE46 89F6568B F4468801 54E9E846 FÒÔT..F¶.V-.FY.VÞÔ...F¶.á^¶&..&. 000020
 8DEC76FF 37FF2602 77FF26F4 5EC40876 FF0A76FF 0000F246 C7010AE9 03750247 G.u.Ô..úF ...v..v.á^¶&.w.&.7.v$. 000040
 EE76FFF0 76FF0876 FF0A76FF 0017E903 7500003D E8468900 0026F39A 5016E246 Fä.P.µ&...FÒ=..u.Ô...v..v..vÞ.vŸ 000060
 9AF876FF FA76FF00 B8E90003 E90374FA 4608F846 8800EEE9 E8468800 00266A9A .j&...FÒÔY..F½.F*t.Ô..Ô¡..v*.v½. 000080
 88E24688 0029E903 7400003D 00002174 9A5016FC 468DF876 FFFA76FF 0000215F  |...v*.v½.F■.P.t!..=..t.Ô)..Fä. 0000A0
 21A79AF8 76FFFA76 FF0001F2 46C70010 E90374FE 56390018 E90374FC 4639E456 V̄Ô9F■t.Ô..9V±t.Ô..úF ...v*.v½.‖ 0000C0
 0876FF0A 76FF0676 FFDE4689 E0468900 00880060 E9037500 F27E83FF 8FE90000 ..Ô«..~·.u.Ô'.¡...FÀ.F8.v..v..v. 0000E0
 FF1A76FF 37FF2602 77FF26F4 5EC41476 FF1676FF 1076FF12 76FF0C76 FF0E76FF .v..v..v..v..v..v.á^¶&.w.&.7.v.. 000100
 F076FF08 76FF0A76 FF0017E9 03750000 30E84689 2C052F9E 9A50160E 468D1876 v..F8.P../...FÒ=..u.Ô...v..v..vÞ 000120
 2F649AEE 76FFF076 FF0876FF 0A76FFFE E3E9002B E9E8468B 00002EA1 9AEE76FF .vŸ.À....FÒÔ+.ÔD±.v..v..vÞ.vŸ.d/ 000140
 5AC8C8C9 5F5E1F00 00E90000 880006E9 E8468800 06E90375 00003DE8 46890000 ...FÒ=..u.Ô...FÒÔ..|..Ô...^_èùàZ 000160
 C40074E9 03752847 08262647 8B260A5E C40000FE 46C7D88E 2D98881E 56570000 ..WV.¡.-.AúF±..á^.&.G&&.G(u.Ôt.á 000180
 9A5016F8 46802677 FF262877 FF260A5E C400002E C09A2677 FF262877 FF260A5E ^.&.w(&.w&.à...á^.&.w(&.w&.F½.P. 0001A0
 57392600 33E90374 07392610 56880E46 88F85EC4 0047E903 7400003D 00002E00 À...=..t.ÔG.á^½.F..V.&9.t.Ô3.&9W 0001C0
 8B26F85E C40001FE 46C70000 2EFE9A26 77FF2628 77FF260A 5EC4002A E9037402 .t.Ô*.á^.&.w(&.w&.±...úF±..á^½&. 0001E0

Dump of file SATURN:[PCCOMMON.DUMP.DLL]DACOPY.TMP;1 on 18-APR-1990 10:39:51.10
File ID (545,24,0)   End of file block 90 / Allocated 92

Virtual block number 33 (00000021), 512 (0200) bytes

 FF2076FF 0151E903 7400FE7E 83FF9CE9 02578926 07892606 5EC40657 8B260447 G.&.W.á^.&..&.W.Ô...~±.t.ÕQ..v . 000000
 880006E9 03750000 3DF64689 00002875 9A5016A6 4680026A 0E76FF10 76FF1E76 v..v..v.j..F|.P.u+...F-=..u.Ô... 000020
 F6468900 00FFFF9A 0676FF08 76FF5U16 A6468D0F 6A1A76FF 1C76FF01 D2E9F646 F-Ô■..v..v.j...F|.P.v..v.......F- 000040
 76FF37FF 260277FF 26065EC4 0A76FF0C 76FF01A9 E9F6468B 0006E903 7500003D =..u.Ô...F-Ô`..v..v.á^.&.w.&.7.v 000060
 03750000 3DF64689 14C4832F 4A323E9A 1E76FF20 76FF1A76 FF1C76FF 0E76FF10 ..v..v..v..v .v..>2J/.á..F-=..u. 000080
 00003DF6 46890000 25169A50 16F8468D 086A176A 2276FF01 6EE9F646 880006E9 Ô...F-Ôn..v"j.j..F½.P..%...F-=.. 0000A0
 8B26065E C4025789 26078926 1056880E 4688F85E C4014CE9 F6468800 06E90375 u.Ô...F-ÔL.á^½.F..V.&..&.W.á^.&. 0000C0
 0035E903 74284708 2626478B 260A5EC4 06578926 04478926 F85EC402 57882607 .&.W.á^½&.G.&.W.á^.&.G&&.G(t.Õ5. 0000E0
 5EC40017 E9037500 003DF646 89000022 929A5052 0026050C 56880A46 882276FF .v".F..V..&.RP.."...F-=..u.Ô..á^ 000100
 50520026 050C5688 0A468800 E2E9F646 88000031 839AF876 FFFA76FF 37FF260A .&.7.v*.v½..1...F-Ôâ..F..V..&.RP 000120
 FFFA76FF 37FF260A 5EC40017 E9037500 003DF646 89000025 AE9AF876 FFFA76FF .v*.v½.Ú%...F-=..u.Ô..á^.&.7.v*. 000140
 AE9A5016 FC468D16 76FF1876 FF1E76FF 2076FF00 AAE9F646 88000025 CB9AF876 v½.Ú%...F-Ô`..v .v..v..v..F■.P.Ú 000160
 C70005F2 46C7001D E9FC4688 0083E9F6 46880006 E9037500 003DF646 8900002D -...F-=..u.Ô...F-Ô...F■Ô..úF·..ú 000180
 3DFFE8E9 03750003 3D0013E9 0016E900 15F446C7 0003F246 C70023E9 001AF446 F¶..Ô#.úF·..úF¶..Ô..Ô..=..u.ÔÕ.= 0001A0
 1476FFF2 76FF37FF 260277FF 26065EC4 1A76FF1C 76FF0000 E9FFD3E9 03750005 ..u.Ô&.Ô...v..v.á^.&.w.&.7.v·.v. 0001C0
 26065EC4 1A76FF1C 76FF001B E9037500 003DF646 8900000C 2A9AF476 FF1276FF .v..v¶.*....F-=..u.Ô...v..v.á^.& 0001E0
```

```
Dump of file SATURN:[PCCOMMON.DUMP.DLL]DACOPY.TMP;1 on 18-APR-1990 10:39:51.10
File ID (545,24,0)   End of file block 90 / Allocated 92

Virtual block number 34 (00000022), 512 (0200) bytes

02C8001E CAC95F5E 1F0000E9 00008800 06E9F646 8800000A D29A37FF 260277FF .w.&.7.....F-Ō..¡..Ō...^_èb..à. 000000
0E76FF10 76FF1276 FF1476FF 046A036A 1676FF18 76FFD88E 2FA6B81E 56570000 ..WV.¡Ì/.À.v..v.j.j..v..v..v..v. 000020
8B0006E9 037500J0 3DFE4689 18C48330 B349339A 0676FF08 76FF0A76 FF0C76FF .v..v..v..v..3I°0.à..F±=..u.Ō... 000040
FF0A76FF D8SE3246 881E5657 000016C8 CBC95F5E 1F0000E9 00008800 06E9FE46 F±Ō..¡..Ō...^_èuà...WV.¡F2.À.v.. 000060
880006E9 03750000 3DF24689 00002E30 9A5016FC 4680086A 1076FF12 76FF0876 v..v..v.j..F•.P.0....F =..u.Ō... 000080
U8260788 26FC5EC4 04FC4683 0004E9FA 5689F846 89FE5688 FC468802 A3E9F246 F ŌÈ..F•.V±.F½.V¹Ō...F•.á^•&..&. 0000A0
37FF2602 77FF26FC 5EC40876 FF0A76FF EE4689F0 46890000 880259E9 03750247 G.u.ŌY.¡...FÞ.FŸ.v..v.á^•&.w.&.7 0000C0
FA76FF08 76FF0A76 FF0017E9 03750000 3DF24689 00002E85 9A5016F4 4680046A j..F¶.P......F =..u.Ō...v..v..v¹ 0000E0
2276FF37 FF260277 FF26FC5E C45016EE 4680023A E9F2468B 00003363 9AF876FF .v½.c3...F Ō:..FŸ.Pá^•&.w.&.7.v" 000100
FFFA76FF 0876FF0A 76FF0017 E9037500 003DF246 890CC483 20A80AC4 9A2076FF .v .á.  .á..F =..u.Ō...v..v..v¹. 000120
0E6A0C76 FF0E76FF 0125E903 74F04608 EE468801 F8E9F246 8800002F 7E9AF876 v½.~/...F Ō«..FŸ.FÞt.Ō%..v..v.j. 000140
76FFFA76 FF0876FF 0A76FF00 17E90375 00003DF2 46890000 FFFF9A50 16EE4680 .FŸ.P......F =..u.Ō...v..v..v¹.v 000160
F2468900 0030069A 5016EA46 80086A17 6A0676FF 01BCE9F2 46880000 33D59AF8 ½.í3...F Ō¥..v.j.j..Fō.P.ø0...F  000180
C40189E9 F2468800 0034409A F876FFFA 76FF0876 FF0A76FF 0017E903 7500003D =..u.Ō...v..v..v¹.v½.M4...F Ō..á 0001A0
04478926 F05688EE 468BEA5E C4025789 26078926 EA5EC402 57882607 8826FC5E ^•&..&.W.á^ō&..&.W.á^ō.FŸ.VÞ&.G. 0001C0
002A0522 56882046 880676FF 0043E903 742C4708 262A4788 26205EC4 06578926 &.W.á^ &.G*&.G,t.ŌC..v..F .V".*. 0001E0

Dump of file SATURN:[PCCOMMON.DUMP.DLL]DACOPY.TMP;1 on 18-APR-1990 10:39:51.10
File ID (545,24,0)   End of file block 90 / Allocated 92

Virtual block number 35 (00000023), 512 (0200) bytes

00003482 9AEA76FF EC76FF06 76FF0025 E9037500 003DF246 89000031 2F9A5052 RP./1...F =..u.Ō%..v..v$.vō..4.. 000000
002A0522 56882046 880111E9 F2468800 0034939A F876FFFA 76FF0876 FF0A76FF .v..v..v¹.v½..4...F Ō...F .V".*. 000020
76FFEC76 FF0676FF 0025E903 7500003D F2468900 0031679A EA76FFEC 76FF5052 RP.v$.vō.g1...F =..u.Ō%..v..v$.v 000040
0E76FF00 CBE9F246 88000033 249AF876 FFFA76FF 0876FF0A 76FF0000 314B9AEA ō.K1...v..v..v¹.v½.$3...F Ōù..v. 000060
03750000 3DF24689 0000FFFF 9A086A18 76FF1A76 FF036AEE 76FFF076 FF0C76FF .v..vÞ.vŸj..v..v.j.......F =..u. 000080
2876FF2A 76FF008E E9F2468B 00003533 9AF876FF FA76FF08 76FF0A76 FF0017E9 Ō...v..v..v¹.v½.35...F Ō...v*.v( 0000A0
76FF1C76 FF1E76FF F476FFF6 76FFEE76 FFF076FF 2076FF22 76FF2476 FF2676FF .v&.v$.v".v .vÞ.vŸ.v-.v¶.v..v..v 0000C0
003DF246 8926C483 326F356D 9A0676FF 0876FF0A 76FF0C76 FF0E76FF 1476FF16 ..v..v..v..v..v..v..m5o2.á&.F =. 0000E0
FD94E900 28E9F246 88000035 409AF876 FFFA76FF 0876FF0A 76FF0017 E9037500 .u.Ō...v..v..v¹.v½.M5...F Ō+.Ō.» 000100
E9F2468B 0006E903 7500003D F2468900 0033A29A F876FFFA 76FF0876 FF0A76FF .v..v..v¹.v½.À3...F =..u.Ō...F Ō 000120
89FC4689 00008808 8E3298B8 1E565700 0006C8CB C95F5E1F 0000E900 00880006 ..¡..Ō...^_èuà...WV.¡.2.À¡...F•. 000140
1A76FF14 76FF1676 FF1076FF 1276FF0C 76FF0E76 FF0876FF 0A76FF06 76FFFA46 F¹.v..v..v..v..v..v..v..v..v..v. 000160
8935160F 579A2876 FF2A76FF 2476FF26 76FF2076 FF2276FF 5016FA46 801876FF .v..F*.P.v".v .v&.v$.v*.v(.W..5. 000180
76FF096A FA76FFFC 76FF0C76 FF0E76FF 0032E9FE 46880006 E9037500 003DFE46 F±=..u.Ō...F±Ō2..v..v..v=.v¹j..v 0001A0
E90000B8 0006E9FE 46880006 E9037500 003DFE46 89000034 849A046A 1C76FF1E ..v.j..Ç4...F±=..u.Ō...F±Ō..¡..Ō 0001C0
08260788 260A5EC4 0000DC46 C7D88E35 75881E56 57000070 C8C8C95F 5E1F0000 ...^_èuàp..WV.¡u5.AúFÉ..á^.&..&. 0001E0

Dump of file SATURN:[PCCOMMON.DUMP.DLL]DACOPY.TMP;1 on 18-APR-1990 10:39:51.10
File ID (545,24,0)   End of file block 90 / Allocated 92

Virtual block number 36 (00000024), 512 (0200) bytes

FF263877 FF26065E C4005FE9 03753847 08263647 8826065E C401ECE9 03740247 G.t.Ōš.á^.&.G6&.G8u.Ō_.á^.&.w8&. 000000
740J003D 00003844 9A5016F4 46803677 FF263877 FF26065E C4000038 2F9A3677 wó./8..á^.&.w8&.wó.F¶.P.D8..=..t 000020
46C70015 E9037402 57392600 1EE90374 07392614 56881246 88F45EC4 0032E903 .Ō2.á^¶.F..V.&9.t.Ō..&9W.t.Ō..úF 000040
FF0123E9 0374000C 7E83FF81 E9000038 789A3677 FF263877 FF26065E C40001DC É..á^.&.w8&.wó.(8..ŌY..-É.t.Ō#.. 000060
0006E903 7500003D DE468900 00264E9A 50169046 801276FF 1476FF1E 76FF2076 v .v..v..v..F..P.N&...F8=..u.Ō.. 000080
9A016A50 1690468D 0A76FF0C 76FF1676 FF1876FF 1A76FF1C 76FF0896 E9DE468B .F8Ō...v..v..v..v..v..v..F..Pj.. 0000A0
80086A17 6A37FF26 065EC408 67E9DE46 880006E9 03750000 3DDE4689 0000FFFF .....F8=..u.Ō...F8Ōg.á^.&.7j.j.. 0000C0
12468BF4 5EC40842 E9DE468B 0006E903 7500003D DE468900 0038FC9A 5016F446 F¶.P.•8...F8=..u.Ō...F8Ō8.á^¶.F. 0000E0
C4065789 26044789 26F45EC4 02578826 0788260A 5EC40257 89260789 26145688 .V.&..&.W.á^.&..&.W.á^¶&.G.&.W.á 000100
50520036 05085688 06468837 FF26065E C40038E9 03743847 08263647 8826065E ^.&.G6&.G8t.Ō8.á^.&.7.F..V..6.RP 000120
0037859A F476FFF6 76FF37FF 26065EC4 0017E903 7500003D DE468900 0039589A .X9...F8=..u.Ō..á^.&.7 v-.v¶.ç7. 000140
DE468900 0039909A F476FFF6 76FF5052 00360508 56880646 88070E9 DE468800 ..F8Ōl..F..V..6.RP.v-.v°..9...F8 000160
E9079DE9 DE468800 0039749A F476FFF6 76FF37FF 26065EC4 0017E903 7500003D =..u.Ō..á^.&.7.v-.v¶.t9...F8Ō..Ō 000180
F45EC41A 76FF1C76 FF025789 26078926 0A5EC406 57882604 47882 6F4 5EC4004E N.á^¶&.G.&.W.á^.&..&.W..v..v.á^¶ 0001A0
7500003D DE468900 0038CE9A 1076FF16 76FF1876 FF0E76FF 0477FF26 0677FF26 &.w.&.w..v..v..v..v..ö8...F8=..u 0001C0
03753847 08263647 8826065E C401A3E9 074CE900 00880752 E9DE468B 0006E903 .Ō...F8ŌR.¡..ŌL.ŌÈ.á^.&.G6&.G8u. 0001E0
```

```
Dump of file SATURN:[PCCOMMON.DUMP.DLL]DACOPY.TMP;1 on 18-APR-1990 10:39:51.10
File ID (545,24,0)   End of file block 90 / Allocated 92

Virtual block number 37 (00000025), 512 (0200) bytes

 46803677 FF263877 FF26065E C400002F C89A3677 FF263877 FF26065E C4005FE9 Ô_.6^.&.w8&.w6.ù/..6^.&.w8&.w6.F 000000
 1EE90374 07392614 56881246 88F45EC4 0032E903 7400003D 00002FE0 9A5016F4 ¶.P.Á/..=..t.Ô2.6^¶.F..V.&9.t.Ô. 000020
 E9000030 129A3677 FF263877 FF26065E C40001DC 46C70015 E9037402 57392600 .&9W.t.Ô..úFÉ..6^.&.w8&.w6..0..Ô 000040
 09E90374 04473V26 F45EC402 578B2607 8B260A5E C40061E9 0375000C 7E83FF81 Ý..-É.u.Ôa.6^.&..&.W.6^¶&9G.t.Ô. 000060
 77FF2606 77FF26F4 5EC41A76 FF1C76FF 06ACE994 F8880006 E9037506 57392600 .&9W.u.Ô..¡½.Ô¯..v..v.6^¶&.w.&.w 000080
 DE468800 06E90375 00003DDE 46890000 32079A10 76FF1676 FF1876FF 0E76FF04 ..v..v..v..v...2...FB=..u.Ô...FB 0000A0
 000033B9 9A5016F4 4680086A 176A37FF 26065EC4 00CAE906 73E90000 880679E9 Ôy.¡..Ôs.Ôò.6^.&.7j.j..F¶.P.¿3.. 0000C0
 57892607 89261456 8B12468B F45EC406 4BE9DE46 880006E9 03750000 3DDE4689 .FB=..u.Ô...FBÔK.6^¶.F..V.&..&.W 0000E0
 47082636 47882606 5EC40657 89260447 8926F45E C4025788 26078826 0A5EC402 .6^.&..&.W.6^¶&.G.&.W.6^.&.G6&.G 000100
 3DDE4689 00003423 9A505200 36050856 88064688 37FF2606 5EC40038 E9037438 8t.Ô8.6^.&.7.F..V..6.RP.#4...FB= 000120
 468805DE E9DE4688 0000343C 9AF476FF F676FF37 FF26065E C40017E9 03750000 ..u.Ô..6^.&.7.v¬.v¶.<4...FBÔR..F 000140
 C40017E9 03750000 3DDE4689 00003469 9AF476FF F676FF50 52003605 08568806 ..V..6.RP.v¬.v¶.i4...FB=..u.Ô..6 000160
 056A056A 0676FF08 76FF05A6 E9DE4688 0000377D 9AF476FF F676FF37 FF26065E ^.&.7.v¬.v¶.)7...FBÔl..v..v.j.j. 000180
 BD4CFE9A 1E76FF20 76FF1A76 FF1C76FF 1276FF14 76FF37FF 260277FF 260A5EC4 6^.&.w.&.7.v..v..v..v..v .v..±L§ 0001A0
 76FF1476 FF1E76FF 2076FF05 67E9DE46 880006E9 03750000 3DDE4689 18C48335 5.6..FB=..u.Ô...FBÔg..v .v..v..v 0001C0
 76FF053E E9DE4688 0006E903 7500003D DE468900 003A5F9A 5016E046 8D066A12 .j..FÁ.P._:...FB=..u.Ô...FBÔ>..v 0001E0

Dump of file SATURN:(PCCOMMON.DUMP.DLL)DACOPY.TMP;1 on 18-APR-1990 10:39:51.10
File ID (545,24,0)   End of file block 90 / Allocated 92

Virtual block number 38 (00000026), 512 (0200) bytes

 00003DDE 46890000 3A8C9A50 16E0468D 066A37FF 260277FF 260A5EC4 1A76FF1C ..v.6^.&.w.&.7j..FÁ.P..:...FB=.. 000000
 B59A5016 E2468D09 6A1276FF 1476FF1E 76FF2076 FF0511E9 DE468800 06E90375 u.Ô...FBÔ...v .v..v..v.j..Fã.P.ç 000020
 77FF260A 5EC41A76 FF1C76FF 04E8E9DE 46880006 E9037500 003DDE46 8900003A :...FB=..u.Ô...FBÔÔ..v..v.6^.&.w 000040
 BBE9DE46 880006E9 03750000 3DDE4689 00003AE2 9A5016E2 4680096A 37FF2602 .&.7j..Fã.P.ã:...FB=..u.Ô...FBÔE 000060
 7500003D DE468900 003B0B9A 5016E046 800A6A12 76FF1476 FF1E76FF 2076FF04 ..v .v..v..v.j..FÁ.P..;...FB=..u 000080
 16E0468D 0A6A37FF 260277FF 260A5EC4 1A76FF1C 76FF0492 E9DE4688 0006E903 .Ô...FBÔ...v..v.6^.&.w.&.7j..FÁ. 0000A0
 1476FF1E 76FF2076 FF0465E9 DE468800 06E90375 00003DDE 46890000 3B389A50 P.8;...FB=..u.Ô...FBÔe..v .v..v. 0000C0
 043CE9DE 46880006 E9037500 003DDE46 8900003B 619A5016 E046800B 6A1276FF .v.j..FÁ.P.a;...FB=..u.Ô...FBÔ<. 0000E0
 3DDE4689 00003B8E 9A5016E0 46800B6A 37FF2602 77FF260A 5EC41A76 FF1C76FF .v..v.6^.&.w.&.7j..FÁ.P..;...FB= 000100
 5016E046 800C6A12 76FF1476 FF1E76FF 2076FF04 0FE9DE46 880006E9 03750000 ..u.Ô...FBÔ...v .v..v..v.j..FÁ.P 000120
 260A5EC4 1A76FF1C 76FF03E6 E9DE4688 0006E903 7500003D DE468900 003B879A .ñ;...FB=..u.Ô...FBÔl..v..v.6^.& 000140
 DE468800 06E90375 00003DDE 46890000 3BE49A50 16E0468D 0C6A37FF 260277FF .w.&.7j..FÁ.P.ô;...FB=..u.Ô...FB 000160
 003DDE46 8900003C 009A5016 F8468D00 6A1276FF 1476FF1E 76FF2076 FF03B9E9 Ô¿..v .v..v..v.j..F½.P..<...FB=. 000180
 4680006A 37FF2602 77FF260A 5EC41A76 FF1C76FF 0390E9DE 46880006 E9037500 .u.Ô...FBÔ...v..v.6^.&.w.&.7j..F 0001A0
 FF1E76FF 2076FF03 63E9DE46 880006E9 03750000 3DDE4689 00003C3A 9A5016F8 ½.P.:<...FB=..u.Ô...FBÔc..v .v.. 0001C0
 E9DE4688 0006E903 7500003D DE468900 003C639A 5016F846 8D0E6A12 76FF1476 v..v.j..F½.P.c<...FB=..u.Ô...FBÔ 0001E0

Dump of file SATURN:(PCCOMMON.DUMP.DLL)DACOPY.TMP;1 on 18-APR-1990 10:39:51.10
File ID (545,24,0)   End of file block 90 / Allocated 92

Virtual block number 39 (00000027), 512 (0200) bytes

 46890000 3C909A50 16F84680 0E6A37FF 260277FF 260A5EC4 1A76FF1C 76FF033A :..v..v.6^.&.w.&.7j..F  P..<...F 000000
 E04680DF 6A1276FF 1476FF1E 76FF2076 FF030DE9 DE468800 06E90375 00003DDE 8=..u.Ô...FBÔ...v .v..v..v.j..FÁ 000020
 5EC41A76 FF1C76FF 02E4E9DE 46880006 E9037500 003DDE46 8900003C 899A5016 .P.¿<...FB=..u.Ô...FBÔÔ..v..v.6^ 000040
 8B0006E9 03750000 3DDE4689 00003CE6 9A5016E0 4680DF6A 37FF2602 77FF260A .&.w.&.7j..FÁ.P.l<...FB=..u.Ô... 000060
 DE468900 00300F9A 5016E046 80106A12 76FF1476 FF1E76FF 2076FF02 87E9DE46 FBÔñ..v .v..v..v.j..FÁ.P..=...FB 000080
 106A37FF 260277FF 260A5EC4 1A76FF1C 76FF028E E9DE4688 0006E903 7500003D =..u.Ô...FBÔ...v..v.6^.&.w.&.7j. 0000A0
 76FF2076 FF0261E DE468800 06E90375 00003DDE 46890000 3D3C9A50 16E0468D .FÁ.P.<=...FB=..u.Ô...FBÔe..v .v 0000C0
 46880006 E9037500 003DDE46 89000030 509A5016 E4468D11 6A1276FF 1476FF1E ..v..v.j..FÔ.P.PO...FB=..u.Ô...F 0000E0
 00002B9E 9A5016E4 4680116A 37FF2602 77FF260A 5EC41A76 FF1C76FF 0238E9DE 8Ô8..v..v.6^.&.w.&.7j..FÔ.P..+.. 000100
 FF260A5E C4126A03 6A0676FF 0876FF02 0BE9DE46 880006E9 03750000 3DDE4689 .FB=..u.Ô...FBÔ...v..v.j.j.6^.&. 000120
 8918C483 30CF4933 9A1E76FF 2076FF1A 76FF1C76 FF1276FF 1476FF37 FF260277 w.&.7.v..v..v..v..v .v..31ü=.6.. 000140
 56390008 E903741E 46391C56 881A468B 01CCE9DE 46880006 E9037500 003DDE46 F8=..u.Ô...FBÔê..F..V.9F.t.Ô..9V 000160
 1276FF14 76FF37FF 260277FF 260A5EC4 136A036A 0676FF08 76FF0042 E9037520  u.ÔB..v..v.j.j.6^.&.w.&.7.v..v. 000180
 880006E9 03750000 3DDE4689 18C4833E 0549339A 1E76FF20 76FF1A76 FF1C76FF .v..v..v .v..31.>.6..FB=..u.Ô... 0001A0
 FF2076FF 1276FF14 76FF37FF 260277FF 260A5EC4 136A036A 0033E901 77E9DE46 FBÔw.Ô3.j.j.6^.&.w.&.7.v..v..v . 0001C0
 76FF0876 FF0141E9 DE468800 06E90375 00003DDE 468910C4 83390F52 0A9A1E76 v...RÔ9.6..FB=..u.Ô...FBÔA..v..v 0001E0
```

```
Dump of file SATURN:[PCCOMMON.DUMP.DLL]DACOPY.TMP;1 on 18-APR-1990 10:39:51.10
File ID (545,24,0)   End of file block 90 / Allocated 92

Virtual block number 40 (00000028), 512 (0200) bytes

76FF2076 FF1A76FF 1C76FF12 76FF1476 FF3ZFF26 0277FF26 0A5EC414 6A0C6A06 .j.j.6^.&.w.&.7.v..v..v..v..v .v 000000
0676FF08 76FF0102 E9DE4688 0006E903 75000030 DE468918 C4833E83 48379A1E ..7K.>.6..F8=..u.Ō...F8Ō...v..v. 000020
1E76FF20 76FF1A76 FF1C76FF 1276FF14 76FF37FF 260277FF 260A5EC4 156A036A j.j.6^.&.w.&.7.v..v..v..v..v .v. 000040
6A0676FF 0876FF00 C3E9DE46 880006E9 03750000 3DDE4689 18C4833E C249339A .316>.6..F8=..u.Ō...F8ŌŪ..v..v.j 000060
9A1E76FF 2076FF1A 76FF1C76 FF1276FF 1476FF37 FF260277 FF260A5E C4166A03 .j.6^.&.w.&.7.v..v..v..v..v .v.. 000080
056A0676 FF0876FF 0084E9DE 46880006 E9037500 003DDE46 8918C483 3F014933 3I.7.6..F8=..u.Ō...F8Ō...v..v.j. 0000A0
339A1E76 FF2076FF 1A76FF1C 76FF1276 FF1476FF 37FF2602 77FF260A 5EC4186A j.6^.&.w.&.7.v..v..v..v..v .v..3 0000C0
6A056A06 76FF0876 FF0045E9 DE468800 06E90375 00003DDE 468918C4 833F4049 Ia?.6..F8=..u.Ō...F8ŌE..v..v.j.j 0000E0
49339A1E 76FF2076 FF1A76FF 1C76FF12 76FF1476 FF37FF26 0277FF26 0A5EC419 .6^.&.w.&.7.v..v..v..v..v .v..3I 000100
C95F5E1F 0000E900 00880006 E9DE4688 0006E903 75000030 DE468918 C4P"3D7A z=.6..F8=..u.Ō...F8Ō..j..Ō...^_è 000120
03740247 0B260788 260A5EC4 00009C46 C7088E36 0F881E56 57000064 C800 `CA ò..àd..WV.j.6.ÀúF...6^.&..&.G.T. 000140
529A3A77 FF263C77 FF26065E C4005FE9 03753C47 0B263A47 8B26065E C4018,.9 Ō°.6^.&.G:&.G<u.Ō_.6^.&.w<&.w:.R 000160
0032E903 7400003D 00004167 9A5016EC 468D3A77 FF263C77 FF26065E C4000041 A..6^.&.w<&.w:.F$̄.P.gA..=..t.Ō2. 000180
C400019C 46C70015 E9037402 57392600 1EE90374 07392610 56880E46 88EC5EC4 6^$.F..V.&9.t.Ō..&9W.t.Ō..úF...6 0001A0
76FF1876 FF011DE9 0374009C 7E83FFB1 E9000041 9E9A3A77 FF263C77 FF26065E ^.&.w<&.w:..A..ŌŸ..~..t.Ō...v..v 0001C0
E99E4688 0006E903 75000030 9E468900 0036819A 5016A046 8D0E76FF 1076FF16 ..v..v..F..P.Y6...F.=..u.Ō...F.Ō 0001E0

Dump of file SATURN:[PCCOMMON.DUMP.DLL]DACOPY.TMP;1 on 18-APR-1990 10:39:51.10
File ID (545,24,0)   End of file block 90 / Allocated 92

Virtual block number 41 (00000029), 512 (0200) bytes

00003D9E 46890000 FFFF9A01 6A5016A0 468D0A76 FF0C76FF 1276FF14 76FF0450 ]..v..v..v..v..F..Pj.......F.=.. 000000
89000041 EF9A5016 EC468D08 6A176A37 FF26065E C40434E9 9E468800 06E90375 u.Ō...F.Ō4.6^.&.7j.j..F$.P.ÿA... 000020
02578926 07892610 56880E46 88EC5EC4 040FE99E 46880006 E9037500 003D9E46 F.=..u.Ō...F.Ō..6^$.F..V.&..&.W. 000040
3C470826 3A478826 065EC406 57892604 478926EC 5EC40257 88260788 260A5EC4 6^.&..&.W.6^$&.G.&.W.6^.&.G:&.G< 000060
003D9E46 89000037 619A5052 003A0508 56880646 8837FF26 065EC400 38E90374 t.Ō8.6^.&.7.F..V..:.RP.a7...F.=. 000080
06468803 A2E99E46 88000041 089AEC76 FFEE76FF 37FF2606 5EC40017 E9037500 .u.Ō..6^.&.7.vŸ.vš..A...F.ŌA..F. 0000A0
5EC40017 E9037500 003D9E46 89000037 999AEC76 FFEE76FF 5052003A 05085688 .V..:.RP.vŸ.vš..7...F.=..u.Ō..6^ 0000C0
2604478B 26EC5EC4 001BE903 6AE99E46 88000039 AC9AEC76 FFEE76FF 37FF2606 .&.7.vŸ.vš.¯9...F.Ōj.Ō..6^$&.G.& 0000E0
470B263A 47882606 5EC40173 E9034CE9 00008802 57892607 B9260A5E C406578B .W.6^.&..&.W.j..ŌL.Ōs.6^.&.G:&.G 000100
77FF263C 77FF2606 5EC40000 36439A3A 77FF263C 77FF2606 5EC4005F E903753C <u.Ō_.6^.&.w<&.w:.C6..6^.&.w<&.w 000120
74073926 1056880E 4688EC5E C40032E9 03740000 3D000036 589A5016 EC468D3A :.F$̄.P.X6..=..t.Ō2.6^$.F..V.&9.t 000140
368F9A3A 77FF263C 77FF2606 5EC40001 9C46C700 15E90374 02573926 001EE903 .Ō..&9W.t.Ō..úF...6^.&.w<&.w:..6 000160
74044739 26EC5EC4 02578826 0788260A 5EC40031 E9037500 9C7E83FF 81E90000 ..ŌŸ..~..u.Ō1.6^.&..&.W.6^$&9G.t 000180
C400CAE9 02A3E900 00880006 E902ACE9 94F98800 09E90375 06573926 0009E903 .Ō..&9W.u.Ō..j'.Ō¯.Ō..j..ŌE.Ōò.6 0001A0
46880006 E9037500 003D9E46 89000037 059A5016 EC468D08 6A176A37 FF26065E ^.&.7j.j..F$.P..7...F.=..u.Ō...F 0001C0
5EC40257 88260788 260A5EC4 02578926 07892610 56880E46 88EC5EC4 0278E99E .Ō(.6^$.F..V.&..&.W.6^.&..&.W.6^ 0001E0

Dump of file SATURN:[PCCOMMON.DUMP.DLL]DACOPY.TMP;1 on 18-APR-1990 10:39:51.10
File ID (545,24,0)   End of file block 90 / Allocated 92

Virtual block number 42 (0000002A), 512 (0200) bytes

8837FF26 065EC400 38E90374 3C470826 3A478826 065EC406 57892604 478926EC $&.G.&.W.6^.&.G:&.G<t.Ō8.6^.&.7. 000000
37FF2606 5EC40017 E9037500 003D9E46 89000040 B79A5052 003A0508 56880646 F..V..:.RP.ña...F.=..u.Ō..6^.&.7 000020
FFEE76FF 5052003A 05085688 06468802 0EE99E46 88000042 9F9AEC76 FFEE76FF .vŸ.vš..B...F.Ō...F..V..:.RP.vŸ. 000040
D39AEC76 FFEE76FF 37FF2606 5EC40017 E9037500 003D9E46 89000040 EF9AEC76 vš.ya...F.=..u.Ō..6^.&.7.vŸ.vš.& 000060
003A099A 5016F046 80036A0E 76FF1076 FF1676FF 1876FF01 D6E99E46 88000040 a...F.Ōe..v..v..v..v.j..FÞ.P..:. 000080
260277FF 260A5EC4 1276FF14 76FF01AD E99E4688 0006E903 75000030 9E468900 ..F.=..u.Ō...F.ŌU..v..v.6^.&.w.& 0000A0
FF0180E9 9E468800 06E90375 00003D9E 46890000 3A369A50 16F04680 036A37FF .7j..FÞ.P.6:...F.=..u.Ō...F.Ō... 0000C0
FF1276FF 1476FF0E 76FF1076 FF37FF26 0277FF26 0A5EC404 6A036A06 76FF0876 v..v.j.j.6^.&.w.&.7.v..v..v..v.. 0000E0
76FF0141 E99E4688 0006E903 75000030 9E468918 C4834367 49339A16 76FF1876 v..v..3IgC.6..F.=..u.Ō...F.ŌA..v 000100
76FF1276 FF1476FF 0E76FF10 76FF37FF 260277FF 260A5EC4 076A036A 0676FF08 ..v.j.j.6^.&.w.&.7.v..v..v..v..v 000120
0876FF01 02E99E46 880006E9 03750000 3D9E4689 18C48343 A649339A 1676FF18 ..v..3IIC.6..F.=..u.Ō...F.Ō...v. 000140
1876FF12 76FF1476 FF0E76FF 1076FF37 FF260277 FF260A5E C4086A08 6A0676FF .v.j.j.6^.&.w.&.7.v..v..v..v..v. 000160
FF0876FF 00C3E99E 46880006 E9037500 003D9E46 8918C483 43E54B37 9A1676FF .v..7KIC.6..F.=..u.Ō...F.Ōu..v.. 000180
FF1876FF 1276FF14 76FF0E76 FF1076FF 37FF2602 77FF260A 5EC4096A 046A0676 v.j.j.6^.&.w.&.7.v..v..v..v..v.. 0001A0
76FF0876 FF0084E9 9E468800 06E90375 0000309E 468918C4 83442449 339A1676 v..3I$D.6..F.=..u.Ō...F.Ō...v..v 0001C0
76FF1876 FF1276FF 1476FF0E 76FF1076 FF37FF26 0277FF26 0A5EC40A 6A056A06 .j.j.6^.&.w.&.7.v..v..v..v..v..v 0001E0
```

Dump of file SATURN:[PCCOMMON.DUMP.DLL]DACOPY.TMP;1 on 18-APR-1990 10:39:51.10
File ID (545,24,0)   End of file block 90 / Allocated 92

Virtual block number 43 (0000002B), 512 (0200) bytes

0676FF08 76FF0045 E99E468B 0006E903 7500003D 9E468918 C4834463 49339A16 ..3ÌcD.á..F.=..u.Ö...F.ÖE..v..v. 000000
1676FF18 76FF1276 FF1476FF 0E76FF10 76FF37FF 260277FF 260A5EC4 086A056A j.j.á^.&.w.&.7.v..v..v..v..v..v. 000020
1F0000E9 0000B8?0 06E99E46 8B0006E9 03750000 309E4689 18C4833E 4449339A .3ID>.á..F.=..u.Ö...F.Ö..¡..Ö... 000040
0B262E47 8B260A5E C40000FA 46C7D88E 3F68B81E 56570000 54C80014 CAC95F5E ^ èò..àT..WV.¡k?.ÄúF•..á^.&.G.&. 000060
FF263077 FF260A5E C400003F 9F9A2E77 FF263077 FF260A5E C4006CE9 03753047 GÕu.Öl.á^.&.w0&.w...?..á^.&.w0&. 000080
07392616 568B1446 8BFC5EC4 003FE903 7400003D 00003F84 9A5016FC 46802E77 w..F•.P.Ç?..=..t.Ö?.á^•.F..V.&9. 0000A0
0000B800 03E90001 B80006E9 037401FA 7E830022 E9037402 57392600 2BE90374 t.Ö+.&9W.t.Ö"..-*.t.Ö..¡..Ö..¡.. 0000C0
1DE90374 1C46391A 568B1846 8BFFA4E9 00003FEB 9A2E77FF 263077FF 260A5EC4 á^.&.w0&.w..§?..ÖÉ..F .V.9F.t.Ö. 0000E0
5EC40001 FA46C702 57892607 89261656 8B14468B 065EC400 15E90374 1E563900 .9V.t.Ö..á^..F..V.&..& V.úF•..á^ 000100
FF1676FF 1C76FF1E 76FF0120 E9037400 FA7E8301 29E90374 02470B26 07882606 .&..&.G.t.Ö)..-*.t.Ö ..v..v..v.. 000120
1A76FF01 39E9F846 8B0006E9 03750000 3DF84689 00004000 9A5016AC 46801476 v..F¯.P..ə...F½=..u.Ö...F½Ö9..v. 000140
003DF846 890000FF FF9A016A 5016AC46 800676FF 0876FF10 76FF1276 FF1B76FF .v..v..v..v..v..F¯.Pj.......F½=. 000160
0000405B 9A5016FC 4680086A 176A37FF 260A5EC4 010AE9F8 46880006 E9037500 .u.Ö...F½Ö..á^.&.7j.j..F•.P.{ə.. 000180
57892607 89261656 8B14468B FC5EC400 E5E9F846 8B0006E9 03750000 3DF84689 .F½=..u.Ö.:.F½Öl.á^•.F..V.&..&.W 0001A0
4708262E 4788260A 5EC40657 89260447 8926FC5E C402578B 26078826 065EC402 .á^.&..&.W.á^•&.G.&.W.á^.&.G.&.G 0001C0
3DF84689 0000424B 9A505200 2E050C56 8B0A468B 37FF260A 5EC40038 E9037430 0t.Ö8.á^.&.7.F..V....RP.KB...F½= 0001E0

Dump of file SATURN:[PCCOMMON.DUMP.DLL]DACOPY.TMP;1 on 18-APR-1990 10:39:51.10
File ID (545,24,0)   End of file block 90 / Allocated 92

Virtual block number 44 (0000002C), 512 (0200) bytes

46880078 E9F8468B 00004267 9AFC76FF FE76FF37 FF260A5E C40017E9 03750000 ..u.Ö..á^.&.7.v±.v•.gB...F½Öx..F 000000
C40017E9 03750000 3DF84689 00004283 9AFC76FF FE76FF50 52002E05 0C568B0A ..V....RP.v±.v•..B...F½=..u.Ö..á 000020
FF0031E9 037500FA 7E830040 E9F8468B 00004634 9AFC76FF FE76FF37 FF26?A5E ^.&.7.v±.v•.4F...F½Öə..-*.u.Öl.. 000040
89000037 F59A036A 37FF2602 77FF2606 5EC40E76 FF1076FF 1276FF18 76FF?76 v..v..v..v..v.á^.&.w.&.7j..X7... 000060
0054C800 1ACAC95F 5E1FG000 E90000B8 0006E9F8 46880006 E9037500 003DF?46 F½=..u.Ö...F½Ö..¡..Ö...^_èò..àT. 000080
5EC4006C E9037534 47082632 4788260A 5EC40000 FA46C708 8E448E88 1E565700 .WV.¡.D.ÄúF•..á^.&.G2&.G4u.Öl.á^ 0000A0
C89A5016 FC468032 77FF2634 77FF260A 5EC40000 44B39A32 77FF2634 77FF260A .&.w4&.w2.°D..á^.&.w4&.w2.F•.P.à 0000C0
02573926 002BE903 74073926 1A568818 468BFC5E C4003FE9 03740000 30000044 D..=..t.Ö?.á^•.F..V.&9.t.Ö+.&9W. 0000E0
FF263477 FF260A5E C40000B8 0003E900 01B80006 E9037401 FA7E8300 22E90374 t.Ö"..-*.t.Ö..¡..Ö..¡..á^.&.w4&. 000100
0015E903 74225639 001DE903 74204639 1E568B1C 468BFFA4 E9000045 0C9A3277 w2..E..ÖÉ..F..V.9F t.Ö..9V"t.Ö.. 000120
74024708 26078826 065EC400 01FA46C7 02578926 0789261A 568B1846 8B065EC4 á^..F..V.&..&.W.úF•..á^.&..&.G.t 000140
689A5016 AC468D18 76FF1A76 FF2076FF 2276FF01 5FE90374 00FA7E83 0168E903 .Öh..-*.t.Ö ..v".v .v..v..F¯.P.h 000160
1076FF12 76FF1C76 FF1E76FF 0178E9F8 46880006 E9037500 003DF846 89000045 E...F½=..u.Ö...F½Öx..v..v..v..v. 000180
F8468B00 06E90375 00003DF8 46890000 FFFF9A01 6A5016AC 46800676 FF0876FF .v..v..F¯.Pj.......F½=..u.Ö...F½ 0001A0
1E76FF18 76FF1A76 FF37FF26 0277FF26 065EC405 6A036A0A 76FF0C76 FF0149E9 Öl..v..v.j.j.á^.&.w.&.7.v..v..v. 0001C0
E9F8468B 0006E903 7500003D F8468918 C4834328 49339A20 76FF2276 FF1C76FF .v..v".v .3I(C.á..F½=..u.Ö...F½Ö 0001E0

Dump of file SATURN:[PCCOMMON.DUMP.DLL]DACOPY.TMP;1 on 18-APR-1990 10:39:51.10
File ID (545,24,0)   End of file block 90 / Allocated 92

Virtual block number 45 (0000002D), 512 (0200) bytes

06E90375 00003DF8 46890000 45BC9A50 16FC4680 086A176A 37FF260A 5EC4010A ..á^.&.7j.j..F•.P.¥E...F½=..u.Ö. 000000
57B82607 8826065E C4025789 26078926 1A568818 468BFC5E C400E5E9 F8468B00 ..F½Öl.á^•.F..V.&..&.W.á^.&..&.W 000020
260A5EC4 0038E903 7434470B 2632478B 260A5EC4 06578926 04478926 FC5EC402 .á^•&.G.&.W.á^.&.G2&.G4t.Ö8.á^.& 000040
0A5EC400 17E90375 00003DF8 46890000 46189A50 52003205 0C568B0A 468B37FF .7.F..V..2.RP..F...F½=..u.Ö..á^. 000060
FF505200 32050C56 8B0A468B 0078E9F8 46880000 4BE29AFC 76FFFE76 FF37FF26 &.7.v±.v•.àH...F½Öx..F..V..2.RP. 000080
76FFFE76 FF37FF26 0A5EC400 17E90375 00003DF8 46890000 46509AFC 76FFFE76 v±.v•.PF...F½=..u.Ö..á^.&.7.v±.v 0000A0
76FF1276 FF1C76FF 1E76FF00 31E90375 00FA7E83 0040E9F8 46880000 466C9AFC •.lF...F½Öə..-*.u.Öl..v..v..v..v 0000C0
0006E903 7500003D F8468900 00469B9A 036A37FF 260277FF 26065EC4 0E76FF10 ..v.á^.&.w.&.7j...F...F½=..u.Ö.. 0000E0
FFD88E46 C58B1E56 5700000E C8001ECA C95F5E1F 0000E900 00B80006 E9F8468B .F½Ö..¡..Ö...^_èò..à...WV.¡éF.Ä. 000100
03750000 3DF64689 000032B0 9A5016FC 46801676 FF0E76?F 1076FF06 76FF0876 v..v..v..v..v..¯F•.P.¯2...F-=..u. 000120
26FC5EC4 04FC4683 0004E9FA 5689F846 89FE568B FC468B01 54E9F646 8B0006E9 Ö...F-Öl..F•.V±.F½.V*Ö...F•.á^•& 000140
46E90374 08563900 4EE90374 0646390C 5688OA46 8B010AE9 03750247 0826078B ..&.G.u.Ö...F..V.9F.t.ÖN.9V.t.ÖF 000160
49119A18 76FF37FF 260277FF 26FC5EC4 1676FF12 76FF1476 FF0A76FF 0C76FF00 ..v..v..v..v..v.á^•&.w.&.7.v...I 000180
46880000 34D09AF8 76FFFA76 FF0676FF 0876FF00 17E90375 00003DF6 46890000 ...F-=..u.Ö...v..v..v*.v½.Ä4...F 0001A0
FF0C76FF 0676FF08 76FF37FF 261A5EC4 F24689F4 46890000 8B00ABE9 0009E9F6 -Öl.Ö .¡...F¶.F·á^.&.7.v..v..v.. 0001C0
76FF1876 FF1676FF 1276FF14 76FF0E76 FF1076FF 37FF2602 77FF26FC 5EC40A76 v.á^•&.w.&.7.v..v..v..v..v..v..v 0001E0

```
Dump of file SATURN:[PCCOMMON.DUMP.DLL]DACOPY.TMP;1 on 18-APR-1990 10:39:51.10
File ID (545,24,0)   End of file block 90 / Allocated 92

Virtual block number 46 (0000002E), 512 (0200) bytes

 FF0676FF 0876FF00 17E90375 000030F6 4689FFFF 06119A50 16F2468D 1A76FF1C ..v..F..P......F-=..u.Ō...v..v.. 000000
 FF1476FF 1676FFF2 76FFF476 FF1876FF 006DE9F6 46880000 4A889AF8 76FFFA76 v*.v½..J...F-Ōm..v..v¶.v..v..v.. 000020
 76FF0876 FF0017E9 03750000 30F64689 10C48348 0C4AC29A 0A76FF0C 76FF1276 v..v..v..öJ.H.á..F-=..u.Ō...v..v 000040
 76FFFA76 FF0676FF 0876FFFE E3E9002B E9F6468B 000049DA 9AF876FF FA76FF06 ..v*.v½.OI...F-Ō+.ŌD±.v..v..v*.v 000060
 5F5E1F00 00E90000 B80006E9 F6468800 06E90375 000030F6 46890000 4A469AF8 ½.FJ...F-=..u.Ō...F-Ō..¡..Ō...^_ 000080
 9A5016FE 46801076 FF1276FF 0676FF08 76FFD88E 49388B1E 56570000 04C8C8C9 èüà...WV.¡;I.Á.v..v..v..v..F±.P. 0000A0
 76FF002E E9037402 F:7E8300 3DE9FC46 880006E9 03750000 30FC4689 0000319F .1...F==..u.Ō...F=Ō*..-±.t.Ō...v 0000C0
 0030FC46 89000049 8E9A1476 FF1076FF 1276FF0E 76FF0A76 FF0C76FF 0676FF08 ..v..v..v..v..v..v..v..ƒI...F=*. 0000E0
 CA881E56 57000010 C8:8C95F 5E1F0000 E90000B8 0006E9FC 46880006 E9037500 .u.Ō...F=Ō..¡..Ō...^_èüà...WV.¡ò 000100
 FF1676FF 1876FF00 37E90374 08563900 3FE90374 0646390C 56880A46 8808BE4A J.Á.F..V.9F.t.Ō7.9V.t.Ō7..v..v.. 000120
 75000030 F0468910 C4834A6B 520A9A06 76FF0876 FF0E76FF 1076FF12 76FF1476 v..v..v..v..v..v...RkJ.á..FÞ=..u 000140
 0006E903 74204708 261E4788 261A5EC4 0169E900 0088016F E9F0468B 0006E903 .Ō...FÞŌo.¡..Ōi.á^.&.G.&.G t.Ō.. 000160
 89000049 549A5016 F2468D16 76FF0E76 FF1076FF 0676FF08 76FF0153 E9000088 ¡..ŌS..v..v..v..v..v..F..P.TI... 000180
 830004E9 FC5689FA 4689F456 88F2468B 0129E9F0 46880006 E9037500 0030F046 FÞ=..u.Ō...FÞŌ)..F..V¶.F*.V=Ō... 0001A0
 FF262077 FF261A5E C40001FE 46C7000F E9037502 47082607 8826FA5E C404FA46 F*.á^*&..&.G.u.ŌŌ.úF±..á^.&.w &. 0001C0
 7400003D 000046FF 9A5016F6 468D1E77 FF262077 FF261A5E C4000046 EA9A1E77 w..õF..á^.&.w &.w..F-.P..F..=..t 0001E0

Dump of file SATURN:[PCCOMMON.DUMP.DLL]DACOPY.TMP;1 on 18-APR-1990 10:39:51.10
File ID (545,24,0)   End of file block 90 / Allocated 92

Virtual block number 47 (0000002F), 512 (0200) bytes

 E9037402 57392600 72E90374 073926F6 5EC40257 88260788 26FA5EC4 008AE903 .Ō..á^*&..&.W.á^-&9.t.Ōr.&9W.t.Ō 000000
 9A1876FF 0477FF26 0677FF26 F65EC416 76FF1276 FF1476FF 0A76FF0C 76FF0069 i..v..v..v..v..v.á^-&.w.&.w..v.. 000020
 00004CC4 9AF276FF F476FF06 76FF0876 FF0027E9 03750000 3DF04689 00004B17 .K...FÞ=..u.Ō'..v..v..v¶.v..áL.. 000040
 FF261A5E C40000FE 46C70063 E9F0468B 00004CA7 9A1E77FF 262077FF 261A5EC4 á^.&.w &.w..IL...FÞŌc.úF±..á^.&. 000060
 F476FF06 76FF0876 FF0017E9 037500FE 7E83FF59 E9000047 439A1E77 FF262077 w &.w..CG..ŌY..-±.u.Ō...v..v..v¶ 000080
 4AA29AF2 76FFF476 FF0676FF 0876FFFF 0EE9002B E9950188 00004CDE 9AF276FF .v..BL..¡..Ō+.Ō...v..v..v¶.v..ÁJ 0000A0
 0AC8C8C9 5F5E1F00 00E90000 B80006E9 F0468800 06E90375 000030F0 46890000 ...FÞ=..u.Ō...FÞŌ..¡..Ō...^_èüà. 0000C0
 00CDE900 00880006 E903743C 4708263A 4788261A 5EC4088E 483F881E 56570000 ..WV.¡?K.Áá^.&.G:&.G<t.Ō..¡..Ōe. 0000E0
 7500003D F6468900 0033089A 5016FC46 801676FF 0E76FF10 76FF0676 FF0876FF .v..v..v..v..v..F=.P..3...F-=..u 000100
 77FF261A 5EC40000 4C039A3A 77FF263C 77FF261A 5EC400A3 E9F6468B 0006E903 .Ō...F-ŌÈ.á^.&.w<&.w:..L..á^.&.w 000120
 FE5688FC 4688F85E C40070E9 03740000 3000004C 189A5016 F846803A 77FF263C <&.w:.F½.P..L..=..t.Ōp.á^½.F=.V± 000140
 1876FF12 76FF1476 FF0A76FF 0C76FF00 53E90374 02573926 005CE903 74073926 &9.t.Ō\.&9W.t.ŌS..v..v..v..v..v. 000160
 5EC40016 E9037500 0030F646 8900004C 609A1676 FF0477FF 260677FF 26F85EC4 á^½&.w.&.w..v..'L...F-=..u.Ō..á^ 000180
 9A3A77FF 263C77FF 261A5EC4 0019E9F6 46880000 4DE09A3A 77FF263C 77FF261A .&.w<&.w:.ÁM...F-Ō..á^.&.w<&.w:. 0001A0
 5EC4D88E 4006881E 56570000 0AC8C8C9 5F5E1F00 00E90000 88FF73E9 00004C8C .L..Ōs.¡..Ō...^_èüà...WV.¡.M.Áá^ 0001C0
 0E76FF10 76FF0676 FF0876FF 00CDE900 00880006 E9037438 47082636 4788‹ 1A .&.G6&.G8t.Ō..¡..Ōe..v..v..v..v. 0001E0

Dump of file SATURN:[PCCOMMON.DUMP.DLL]DACOPY.TMP;1 on 18-APR-1990 10:3?:51.10
File ID (545,24,0)   End of file block 90 / Allocated 92

Virtual block number 48 (00000030), 512 (0200) bytes

 5EC400A3 E9F6468B 0006E903 7500003D F6468900 0040359A 5016FC46 801676FF .v..F=.P.5M...F-=..u.Ō...F-ŌÈ.á^ 000000
 689A5016 F8468036 77FF2638 77FF261A 5EC40000 40569A36 77FF2638 77FF261A .&.w8&.w6.VM..á^.&.w8&.w6.F½.P.k 000020
 02573926 005CE903 74073926 FE5688FC 4688F85E C40070E9 03740000 3D00004D M..=..t.Ōp.á^½.F=.V±&9.t.Ō\.&9W. 000040
 FF0477FF 260677FF 26F85EC4 1676FF12 76FF1476 FF0A76FF 0C76FF00 53E90374 t.ŌS..v..v..v..v..v.á^½&.w.&.w.. 000060
 4ED49A36 77FF2638 77FF261A 5EC40016 E9037500 003DF646 8900004D AF9A1876 v..£M...F-=..u.Ō..á^.&.w8&.w6.àN 000080
 00E90000 88FF73E9 00004DCA 9A3677FF 263877FF 261A5EC4 0019E9F6 46880000 ...F-Ō..á^.&.w8&.w6.ŌM..Ōs.¡..Ō. 0000A0
 76FF0001 EC46C700 07C62614 5EC4D88E 4DFA881E 56570000 14C8C8C9 5F5E1F00 ..^_èüà...WV.¡*M.Áá^.&6..úF$...v 0000C0
 E9037500 0030EE46 8900004B 889A5016 FC4680DE 76FF0A76 FF0C76FF 0676FF08 ..v..v..v..v..F=.P.£K...FŸ=..u.Ō 0000E0
 E9037512 46081046 880023E9 03750247 08260788 26FC5EC4 0121E9EE 46880006 ...FŸŌI.á^=&..&.G.u.Ō#..F..F.u.Ō 000100
 C70001EC 46C70005 E900F2E9 00008800 07C62614 5EC40000 E90001EC 46C70008 ..úF$..Ō..á^.&6..¡..Ō..Ō..úF$..ú 000120
 47082607 8826FC5E C404FC46 830004E9 FA5689F8 4689FE56 88FC468B 0000F646 F-...F=.V±.F½.V*Ō...F=.á^=&..&.G 000140
 16F2468D 1076FF12 76FF0000 4E4A9A10 76FF1276 FF0000F0 46C7006E E9037502 .u.Ōn.úFÞ...v..v..JN...v..v..F.. 000160
 260021E9 03740739 26F4568B F24688FC 5EC40035 E9037400 00300000 4E5F9A50 P._N..=..t.Ō5.á^=.F..V¶&9.t.Ō!.& 000180
 0003E900 004E8E9A 1076FF12 76FF0001 F646C700 01F046C7 0018E903 74025739 9W.t.Ō..úFÞ..úF-...v..v../N..Ō.. 0001A0
 F876FFFA 76FF0676 FF0876FF FF7FE900 00EC46C7 0005E903 7400F07E 83FFB3E9 Ō*..-Þ.t.Ō..úF$..Ō...v..v..v*.v½ 0001C0
 C4000AE9 037500EC 7E830033 E9EE468B 0006E903 7500003D EE468900 004C7C9A .|L...FŸ=..u.Ō...FŸŌ3..-$.u.Ō..á 0001E0
```

```
Dump of file SATURN:[PCCOMMON.DUMP.DLL]DACOPY.TMP;1 on 18-APR-1990 10:39:51.10
File ID (545,24,0)   End of file block 90 / Allocated 92

Virtual block number 49 (00000031), 512 (0200) bytes

 26145EC4 0007E901 07C62614 5EC4000A E9037500 F67E8300 1AE90207 C626145E ^.&6..Õ...-~.u.Õ..á^.&6..Õ..á^.& 000000
 949A0AB6 1E80D88E 4EEEB81E 56570000 72C8CBC9 5F5E1F00 00E90000 B80007C6 ó..|..Õ...^_èùàr..WV.|YN.Ä..Ñ... 000020
 AE46C7C8 4689CA46 89000088 8E468990 46890000 B8FFFF02 2D9AC05E 8D506900 .iP.^à.-...|...F..F.|...Fò.FàúFÜ 000040
 0000B8AA 4689AC46 89000088 0000A846 C700CC46 C6009446 C60000A6 46C70000 ..úFI..óF..óFà.úF`..|...F^.F`|.. 000060
 008A0000 B8985689 9646899C 56899A46 89A05689 9E4689A4 5689A246 890000BA ¤...FÅ.VÊ.F..V..F..V..F..V.|..¤. 000080
 8D00CAE9 AC568CAA 4689C046 8D00ACE9 18468BD0 5689CE46 89D45689 D2468900 ..F@.Vå.Fo.VÅ.F.Õ¯..Fà.F`.V¯Õò.. 0000A0
 AC568CAA 4689AE4^ 8D00B2E9 AC568CAA 4689C846 8D00BEE9 AC568CAA 46898E46 F..F`.V¯Õ/..Fà.F`.V¯Õý..FÜ.F`.V¯ 0000C0
 4689CC46 8D008EE  AC568CAA 46899446 8D009AE9 AC568CAA 4689A646 8D00A6E9 ÕI..FI.F`.V¯Õ...F..F`.V¯Õ...Fà.F 0000E0
 8D006AE9 AC568CAA 4689B046 8D0076E9 AC568CAA 4689A846 8D0082E9 AC568CAA `.V¯Õ...F`.F`.V¯Õv..F¯.F`.V¯Õj.. 000100
 06468D00 42681E29 6A0052E9 AC568CAA 4689CE46 8D005EE9 AC568CAA 46899646 F..F`.V¯Õ^..Fö.F`.V¯ÕR.j).hB..F@ 000120
 3D002AE9 002DE900 30E90033 E9AC568C AA4689D6 4680AC4 83FFFF00 009A5016 .P......á..F@.F`.V¯Õ3.ÕÕ.Õ-.Õ*.= 000140
 3F513351 27511B51 0F510350 F750EB50 DF518FA7 FF2E93C0 03FFF2E9 0376000C ..v.Õ`..à...Ï.QÕPŠP¼P.Q.Q.Q'Q3Q? 000160
 8D9AAA76 FFAC76FF 1676FF0E 76FF1076 FF0676FF 0876FF51 76500351 57514B51 QKQWQ£PvQ.v..v..v..v..v..v¯.v¯.§ 000180
 1276FF14 76FF0A76 FF0C76FF 0031E992 46880006 E9037500 003D9246 89000042 B...F.=..u.Õ...F.Õ1..v..v..v..v. 0001A0
 B80006E9 92468800 06E90375 00003D92 46890000 42EA9AAA 76FFAC76 FF1676FF .v..v`.v`.ôB...F.=..u.Õ...F.Õ..| 0001C0
 FF0C76FF 0676FF08 76FFD88E 5056B81E 56570000 0AC8CBC9 5F5E1F00 00E90000 ..Õ...^_èuà...WV.|VP.Ä.v..v..v.. 0001E0

Dump of file SATURN:[PCCOMMON.DUMP.DLL]DACOPY.TMP;1 on 18-APR-1990 10:39:51.10
File ID (545,24,0)   End of file block 90 / Allocated 92

Virtual block number 50 (00000032), 512 (0200) bytes

 0003E9F6 46880006 E9037500 003DF646 8900004F 139A5016 F8468D12 76FF0A76 v..v..F½.P..O...F-=..u.Õ...F-Õ£. 000000
 E9037502 470B2607 8B26FC5E C404FC46 830004E9 FE5689FC 4689FA56 8BFB4688 .F½.V°.F•.V‡Õ...F•.á^•&..&.G.u.Õ 000020
 FF9A1476 FF37FF26 0277FF26 FC5EC412 76FF0A76 FF0C76FF 0676FF08 76FF0089 ...v..v..v..v..v.á^•&.w.&.7.v... 000040
 88000052 DE9AF876 FFFA76FF 0676FF08 76FF0017 E9037500 003DF646 890000FF ....F-=..u.Õ...v..v..v°.v½.BR... 000060
 76FF37FF 260277FF 26FC5EC4 1276FF0E 76FF1076 FF0676FF 0876FF00 6EE9F646 F-Õn..v..v..v..v..v.á^•&.w.&.7.v 000080
 52F89AF8 76FFFA76 FF0676FF 0876FF00 17E90375 00003DF6 46890000 4EA39A14 ..ÊN...F-=..u.Õ...v..v..v°.v½.½R 0000A0
 3DF64689 00005001 9AF876FF FA76FF06 76FF0876 FFFF64E9 002BE9F6 46880000 ...F-Õ+.Õd..v..v..v°.v½..P...F-= 0000C0
 881E5657 000008C8 CBC95F5E 1F0000E9 0000B800 06E9F646 880006E9 03750000 ..u.Õ...F-Õ..|..Õ...^_èuà...WV.| 0000E0
 3DF84689 00004E29 9A5016FA 46800A6A 0E76FF10 76FF1676 FF1876FF D88E5212 .R.Å.v..v..v..v.j..F°¯P.)N...F½= 000100
 E09A5016 FE468DFA 76FFFC76 FF1676FF 1876FF00 EDE9F846 880006E9 03750000 ..u.Õ...F½ÕÙ..v..v..v•.v°.F‡.P.Å 000120
 0876FF00 6CE90374 02FE7E83 00C6E9F8 46880006 E9037500 003DF846 8900004A J...F½=..u.Õ...F½Õó..-‡.t.Õl..v. 000140
 E9037500 003DF846 890CC483 4B7454BC 9AFA76FF FC76FF0A 76FF0C76 FF0676FF .v..v..v..v•.v°.¥ItK.á..F½=..u.Õ 000160
 16463914 56881246 8B002FE9 03740247 0B26078B 26065EC4 0092E9F8 46880006 ...F¥Õ..á^.&..&.G.t.Õ/..F..V.9F. 000180
 0006E902 57892607 8926FC56 8BFA468B 065EC400 13E90374 18563900 1BE90374 t.Õ..9V.t.Õ..á^..F°.V•&..&.W.Õ.. 0001A0
 C40013E9 03741856 390018E9 03741646 3914568B 12468B00 4BE90054 E994FB8B |•.ÕT.ÕK..F..V.9F.t.Õ..9V.t.Õ..á 0001C0
 FF9A0676 FF0876FF 1276FF14 76FF0022 E9025789 26078926 FC5688FA 468B065E ^..F°.V•&..&.W.Õ"..v..v..v..v... 0001E0

Dump of file SATURN:[PCCOMMON.DUMP.DLL]DACOPY.TMP;1 on 18-APR-1990 10:39:51.10
File ID (545,24,0)   End of file block 90 / Allocated 92

Virtual block number 51 (00000033), 512 (0200) bytes

 14CAC95F 5E1F0000 E90000B8 0006E9F8 46880006 E9037500 003DF846 890000FF ....F½=..u.Õ...F½Õ..|..Õ...^_èò. 000000
 FF0A76FF 0C76FF06 76FF0876 FF0049E9 0E468BD8 8E53208B 1E565700 0000C800 .à...WV.| S.Ä.F.ÕI..v..v..v..v.. 000020
 FF0A76FF 0C76FF06 76FF0876 FF003CE9 0045E90C C483548B 54BC9A10 76FF1276 v..v..¥T.T.á.ÕE.Õ<..v..v..v..v.. 000040
 7500023D 0013E900 1CE99500 B8001CE9 0025E90C C4835392 555F9A10 76FF1276 v..v.._U.S.á.Õ%.Õ..|..Õ..Õ..=..u 000060
 000004C8 000ECAC9 5F5E1F00 00E90000 B8FFE4E9 FFC7E903 7500063D FFAFE903 .Õ£.=.¯u.Õù.Õò.|..Õ...^_èò..à... 000080
 10470826 0E478B26 0A5EC407 89260247 89260000 B80E5EC4 D88E5449 B81E5657 WV.|IT.Áá^.|..&.G.&..á^¯.&.G.&.G. 0000A0
 0E77FF26 1077FF26 0A5EC400 004F929A 0E77FF26 1077FF26 0A5EC400 6FE90375 u.Õo.á^.&.w.&.w...O..á^.&.w.&.w. 0000C0
 03740739 2608568B 06468BFC 5EC40042 E9037400 003D0000 4FA29A50 16FC4680 .F•.P.ÅO..=..t.ÕB.á^•.F..V.&9.t. 0000E0
 57892607 89260E5E C40C578B 2604478B 26FC5EC4 0025E903 74025739 26002EE9 Õ..&9W.t.Õ%.á^•&.G.&.W.á^.&..&.W 000100
 C8CBC95F 5E1F0000 E90000B8 FFA1E900 004FD99A 0E77FF26 1077FF26 0A5[illegible]02 .á^.&.w.&.w..1O..ÕÅ.|..Õ...^_èuà 000120
 263A478B 260A5EC4 07892602 47892600 00880E5E C4D88E54 C48B1E56 5700[illegible]4 ...WV.|ÁT.Áá^.|..&.G.&..á^.&¯G:& 000140
 263C77FF 260A5EC4 000054F1 9A3A77FF 263C77FF 260A5EC4 006FE903 753C47[illegible]3 .G<u.Õo.á^.&.w<&.w:.þT..á^.&.w<& 000160
 39260856 8B06468B FC5EC400 42E90374 00003D00 0055069A 5016FC46 8D3A77FF .w:.F•.P..U..=..t.ÕB.á^•.F..V.&9 000180
 0789260E 5EC40657 8B260447 8B26FC5E C40025E9 03740257 3926002E E9037407 .t.Õ..&9W.t.Õ%.á^=&.G.& W.á^.&.. 0001A0
 5F5E1F00 00E90000 B8FFA1E9 0000554D 9A3A77FF 263C77FF 260A5EC4 02578926 &.W.á^.&.w<&.w:.MU..ÕÅ.|  Õ...^_ 0001C0
 1A210002 00000002 54680002 016F0003 47CE0203 00000001 4A2C0002 0026CBC9 èù&...,J......oG..o...hT......!¯ 0001E0
```

Dump of file SATURN:[PCCOMMON.DUMP.DLL]DACOPY.TMP;1 on 18-APR-1990 10:39:51.10
File ID (545,24,0)   End of file block 90 / Allocated 92

Virtual block number 52 (00000034), 512 (0200) bytes

```
479F0203 00000004 33460002 01EE0004 48C60203 007C0002 527F0203 00000003 .......R..|...6H..Y...F3.......G 000000
55670002 000E0002 541F0203 00000006 50610002 00000005 51650002 00F90003 ..'...eQ......aP.......T......gU 000020
52980203 01FF0005 48320203 018C0003 32270203 010A0003 01030203 00000008 ..............'2......2H.......R 000040
535F0203 02000005 48AA0203 00220002 518F0203 01170003 45970203 009A0002 .......E......«Q.."...`H......_S 000060
30790203 00300002 51EA0203 01900004 55940203 01240003 22590203 00A60002 ..|...Y"..$....U......õQ..0...ÿ0 000080
33860203 013A0003 10470203 02210006 26800203 01AE0004 55F00203 00840002 ..Ç...ÞU..Ü....&..|...G...:....3 0000A0
55A90203 00000002 10170203 01480003 0CDA0203 00490002 52280203 00C60002 ..ó...+R..|...Ò...H.......Å...`U 0000C0
488E0203 00620002 52C20203 01550003 40360203 00550002 53380203 01C20004 ..ó...8S..U...6@..U...óR..b....H 0000E0
00000000 00000000 00000000 006C0002 35E70203 01620003 36E00203 01D60004 ..ø...Á6..b...Ö5..l............. 000100
1676FF18 76FF006A 1A76FF1C 76FF2276 FF2476FF D88EFFFF B81E5657 000002C8 à...WV.¡...Â.v$.v".v..v.j..v..v. 000120
2620568B 1E468B16 5EC40177 E9FE468B 0006E903 7500030D FE468900 0000659A .e....F±=..u.Õ...F±Öw.é^..F..V & 000140
76FF0E6A 1A76FF1C 76FF2276 FF2476FF 00ABE903 74025739 2600B4E9 03740739 9.t.ÕÇ.&9W.t.Õ ..v$.v".v..v.j..v 000160
2276FF24 76FF0133 E9FE468B 0006E903 7500030D FE468900 0001929A 1676FF18 ..v.......F±=..u.Õ...F±Õ3..v$.v" 000180
468B0006 E9037500 0030FE46 89000000 B99A0E76 FF1076FF 056A1A76 FF1C76FF .v..v.j..v..v..¿....F±=..u.Õ...F 0001A0
FE468900 0000E39A 0A76FF0C 76FF066A 1A76FF1C 76FF2276 FF2476FF 0109E9FE ±Õ...v$.v".v..v.j..v..v..D....F± 0001C0
FF0876FF 076A1A76 FF1C76FF 2276FF24 76FF000F E9FE468B 0006E903 7500030D =..u.Õ...F±ÕÕ..v$.v".v..v.j..v.. 0001E0
```

Dump of file SATURN:[PCCOMMON.DUMP.DLL]DACOPY.TMP;1 on 18-APR-1990 10:39:51.10
File ID (545,24,0)   End of file block 90 / Allocated 92

Virtual block number 53 (00000035), 512 (0200) bytes

```
76FF2476 FF007EE9 00B5E9FE 468B0006 E9037500 0030FE46 89000001 109A0676 v.......F±=..u.Õ...F±Õç.Õ-..v$.v 000000
8B0006E9 03750000 30FE4689 0000013A 9A0E76FF 1076FF02 6A1A76FF 1C76FF22 ".v..v.j..v..v..:....F±=..u.Õ... 000020
46890000 01649A06 76FF0876 FF046A1A 76FF1C76 FF2276FF 2476FF00 8BE9FE46 F±Õ...v$.v".v..v.j..v..v..d....F 000040
0C76FF03 6A1A76FF 1C76FF22 76FF2476 FF005EE9 FE468B00 06E90375 00003DFE ±=..u.Õ...F±Õ^..v$.v".v..v.j..v. 000060
C42276FF 2476FF00 34E9FE46 8B0006E9 03750000 30FE4689 0000FFFF 9A0A76FF .v.......F±=..u.Õ...F±Õ4..v$.v"á 000080
06E90375 00003DFE 46890000 FFFF9A12 76FF1476 FF106A37 FF260277 FF26165E ^.&.w.&.7j..v..v.......F±=..u.Õ. 0000A0
8F020300 00000800 08000200 0320CAC9 5F5E1F00 00E90000 B80006E9 FE468B00 ..F±Õ..¡..Õ...^_èò ............. 0000C0
00FE46C7 D88EFFFF B81E5657 000006C8 00000000 55000200 21020300 22000200 ..."...|...U....à...WV.¡...ÀUF±. 0000E0
00FFFF9A 1677FF26 1877FF26 0A5EC401 4FE90375 18470B26 16478B26 0A5EC400 .é^.&.G.&.G.u.ÕO.é^.&.w.&.w..... 000100
5EC40122 E9037400 00300000 FFFF9A50 16FA468D 1677FF26 1877FF26 0A5EC400 .é^.&.w.&.w..F'.P.....=..t.Õ".é^ 000120
2604478B 26FA5EC4 002DE903 74025739 260036E9 03740739 2610568B 0E468BFA '.F..V.&9.t.Õ6.&9W.t.Õ· é^'&.G.& 000140
00069A16 77FF2618 77FF260A 5EC40001 FE46C702 57892607 8926065E C406578B .W.é^.&..&.W.úF±..é^.&.w &.w..ø. 000160
002DE903 74125739 260036E9 03741047 39261056 8B0E468B FA5EC400 D8E90000 ..ÕU.é^'.F..V.&9G.t.Õ6.&9W.t.Õ-. 000180
77FF260A 5EC40001 FE46C702 57892607 8926065E C416578B 2614478B 26FA5EC4 é^'&.G.&.W.é^.&..&.W.úF±..é^.&.w 0001A0
260036E9 03740447 39261056 8B0E468B FA5EC400 93E90000 011E9A16 77FF2618 .&.w......Õ..é^'.F..V.&9G.t.Õ6.& 0001C0
FE46C702 57892607 8926065E C406578B 2604478B 26FA5EC4 002DE903 74065739 9W.t.Õ-.é^'&.G.&.W.é^.&..&.W.úF± 0001E0
```

Dump of file SATURN:[PCCOMMON.DUMP.DLL]DACOPY.TMP;1 on 18-APR-1990 10:39:51.10
File ID (545,24,0)   End of file block 90 / Allocated 92

Virtual block number 54 (00000036), 512 (0200) bytes

```
39261056 8B0E468B FA5EC400 4BE90000 01669A16 77FF2618 77FF260A 5EC40001 ..é^.&.w.&.w..f...ÕK.é^'.F..V.&9 000000
8926065E C416578B 2614478B 26FA5EC4 002DE903 74165739 260036E9 03741447 G.t.Õ6.&9W.t.Õ·.é^'&.G.&.W.é^.&. 000020
FEC1E900 03E90000 FFFF9A16 77FF2618 77FF260A 5EC40001 FE46C702 57892607 .&.W.úF±..é^.&.w.&.w......Õ..Õè± 000040
5EC40000 FE46C7D8 8E0008B8 1E565700 0006C800 0CCAC95F 5E1F0000 E9FE468B .F±Õ...^_èò..à...WV.¡...ÀUF±..é^ 000060
5EC40000 002D9A16 77FF2618 77FF2606 5EC40060 E903751B 47082616 47882606 .&.G.&.G.u.Õ'.é^.&.w.&.w..-...é^ 000080
468BFA5E C40033E9 03740000 30000000 429A5016 FA468D16 77FF2618 77FF2606 .&.w.&.w..F'.P.B...=..t.Õ3.é^'.F 0000A0
FF26065E C40001FE 46C70015 E903740E 57392600 1EE90374 0C473926 0C568B0A ..V.&9G.t.Õ..&9W.t.Õ..úF±..é^.&. 0000C0
57000004 C80008CA C95F5E1F 0000E9FE 468BFFB0 E9000000 8E9A1677 FF261877 w.&.w......Õ¯..F±Õ...^_èò..à...W 0000E0
FC468900 00FFFF9A 5016FE46 8D0E76FF 1076FF12 76FF1476 FF088E01 85B81E56 V.¡...Â.v..v..v..v..F±.P......F• 000100
0E76FF10 76FF0A76 FF0C76FF 0030E9FE 468B005C E9FC468B 0006E903 7500030D =..u.Õ...F•Õ\..F±Õ=..v..v..v..v. 000120
03289A0E 76FF1076 FF0A76FF 0C76FF00 33E90789 26065EC4 08C48302 7002A19A .À.p..á.é^.&..Õ3..v..v..v..v..(. 000140
D0E90375 00053DFF 8BE90375 00023000 13E90016 E9078926 065EC408 C483FFFF ...á.é^.&..Õ..Õ..=..u.ÕÉ.=..u.ÕÀ 000160
0A5EC4D8 8E0213B8 1E565700 0004C800 10CAC95F 5E1F0000 E90000B8 0000E9FF .Õ..¡..Õ...^_èò..à...WV.¡...Àé^. 000180
0A5EC400 0001AA9A 0E77FF26 1077FF26 0A5EC400 60E90375 10470B26 0E478B26 &.G.&.G.u.Õ'¯é^.&.w.&.w.. `...é^. 0001A0
06468BFC 5EC40033 E9037400 00300000 01BF9A50 16FC468D 0E77FF26 1077FF26 &.w.&.w..F•.P.¢...=..t.Õ3.é^•.F. 0001C0
9A0E77FF 261077FF 260A5EC4 0016E903 74025739 26001FE9 03740739 2608568B .V.&9.t.Õ..&9W.t.Õ..é^.&.w.&.w.. 0001E0
```

```
Dump of file SATURN:[PCCOMMON.DUMP.DLL]DACOPY.TMP;1 on 18-APR-1990 10:39:51.10
File ID (545,24,0)   End of file block 90 / Allocated 92

Virtual block number 55 (00000037), 512 (0200) bytes

 881E5657 000004C8 CBC95F5E 1F0000E9 000088FF 80E90009 E9000188 000001F7 %...¡..Õ..Õ¯.¡..Õ...^_èùà...WV.¡ 000000
 9A1E77FF 262077FF 260A5EC4 0060E903 7520470B 261E4788 260A5EC4 D88E02A9 ¨..Aá^.&.G.&.G u.Õ'.á^.&.w &.w.. 000020
 33E90374 00003000 0002DE9A 5016FC46 8D1E77FF 262077FF 260A5EC4 000002C9 è...á^.&.w &.w..F•.P.8...=..t.Õ3 000040
 FF260A5E C40016E9 03740257 3926001F E9037407 39260856 88064688 FC5EC400 .á^•.F..V.&9.t.Õ..&9W.t.Õ..á^.&. 000060
 C8C8C95F 5E1F0GJ0 E9000088 FFB0E900 09E90001 88000003 109A1E77 FF262077 w &.w......¡..Õ..Õ¯.¡..Õ...^_èùà 000080
 FF26065E C40021E9 03750447 08260247 8826065E C4D88E03 30881E56 57000002 ...WV.¡0..Aá^.&.G.&.G.u.Õ!.á^.&. 0000A0
 26065EC4 038EE9FE 46880006 E9037500 003DFE46 89000004 089A0277 FF260477 w.&.w.......F±=..u.Õ...F±Õ..á^.& 0000C0
 3DFE4689 0000FFFF 9A0677FF 260877FF 26065EC4 0021E903 75084708 26064788 .G.&.G.u.Õ!.á^.&.w.&.w.......F±= 0000E0
 0A76FF00 24E90375 10470826 0E478826 065EC403 5DE9FE46 880006E9 03750000 ..u.Õ...F±Õ].á^.&.G.&.G.u.Õ$..v. 000100
 29E9FE46 880006E9 03750000 3DFE4689 04720781 9A0E77FF 261077FF 26065EC4 á^.&.w.&.w....r..F±=..u.Õ...F±Õ) 000120
 9A1277FF 261477FF 26065EC4 0A76FF00 24E90375 14470826 12478826 065EC403 .á^.&.G.&.G.u.Õ$..v.á^.&.w.&.w.. 000140
 18470826 16478826 065EC402 F5E9FE46 880006E9 03750000 3DFE4689 04A60781 ..1..F±=..u.Õ...F±Õ%.á^.&.G.&.G. 000160
 03750000 3DFE4689 04DA0781 9A1677FF 261877FF 26065EC4 0A76FF00 24E90375 u.Õ$..v.á^.&.w.&.w....Õ..F±=..u. 000180
 26065EC4 0A76FF00 24E90375 1C470826 1A478826 065EC402 C1E9FE46 880006E9 Õ...F±Õè.á^.&.G.&.G.u.Õ$..v.á^.& 0001A0
 065EC402 BDE9FE46 880006E9 03750000 3DFE4689 050E0781 9A1A77FF 261C77FF .w.&.w.......F±=..u.Õ...F±Õ..á^. 0001C0
 05420781 9A1E77FF 262077FF 26065EC4 0A76FF00 24E90375 20470826 1E478826 &.G.&.G u.Õ$..v.á^.&.w &.w....8. 0001E0

Dump of file SATURN:[PCCOMMON.DUMP.DLL]DACOPY.TMP;1 on 18-APR-1990 10:39:51.10
File ID (545,24,0)   End of file block 90 / Allocated 92

Virtual block number 56 (00000038), 512 (0200) bytes

 24E90375 24470826 22478826 065EC402 59E9FE46 880006E9 03750000 3DFE4689 .F±=..u.Õ...F±ÕY.á^.&.G"&.G$u.Õ$ 000000
 880006E9 03750000 3DFE4689 05760781 9A2277FF 262477FF 26065EC4 0A76FF00 ..v.á^.&.w$&.w"...v..F±..u.Õ... 000020
 262877FF 26065EC4 0A76FF00 24E90375 28470826 26478826 065EC402 25E9FE46 F±Õ%.á^.&.G&&.G(u.Õ$..v.á^.&.w(& 000040
 2A478826 065EC401 F1E9FE46 880006E9 03750000 3DFE4689 05AA0781 9A2677FF .w&...`..F±=..u.Õ...F±Õp.á^.&.G* 000060
 3DFE4689 05DE0781 9A2A77FF 262C77FF 26065EC4 0A76FF00 24E90375 2C470826 &.G,u.Õ$..v.á^.&.w,&.w*...8..F±= 000080
 0A76FF00 24E90375 30470826 2E478826 065EC401 BDE9FE46 880006E9 03750000 ..u.Õ...F±Õ§.á^.&.G.&.G0u.Õ$..v. 0000A0
 89E9FE46 880006E9 03750000 3DFE4689 06120781 9A2E77FF 263077FF 26065EC4 á^.&.w0&.w.......F±=..u.Õ...F±Õ. 0000C0
 9A3277FF 263477FF 26065EC4 0A76FF00 24E90375 34470826 32478826 065EC401 .á^.&.G2&.G4u.Õ$..v.á^.&.w4&.w2. 0000E0
 38470826 36478826 065EC401 55E9FE46 880006E9 03750000 3DFE4689 02530781 ..S..F±=..u.Õ...F±ÕU.á^.&.G6&.G8 000100
 03750000 3DFE4689 067A0781 9A3677FF 263877FF 26065EC4 0A76FF00 24E90375 u.Õ$..v.á^.&.w8&.w6...z..F±=..u. 000120
 26065EC4 0A76FF00 24E90375 3C470826 3A478826 065EC401 21E9FE46 880006E9 Õ...F±Õ!.á^.&.G:&.G<u.Õ$..v.á^.& 000140
 065EC400 EDE9FE46 880006E9 03750000 3DFE4689 043E0781 9A3A77FF 263C77FF .w<&.w:...>..F±=..u.Õ...F±ÕU.á^. 000160
 0A47C726 065EC406 47892608 47892600 0088065E C4024789 26044789 26000088 ¡..&.G.&.G.á^.¡..&.G.&.G.á^.&úG. 000180
 260000B8 065EC40E 47892610 47892600 0088065E C400000C 47C72606 5EC40000 ..á^.&úG...á^.¡..&.G.&.G.á^.¡..& 0001A0
 261C4789 26000088 065EC416 47892618 47892600 0088065E C4124789 26144789 .G.&.G.á^.¡..&.G.&.G.á^.¡..&.G.& 0001C0
 C4224789 26244789 26000088 065EC41E 47892620 47892600 0088065E C41A4789 .G.á^.¡..&.G &.G.á^.¡..&.G$&.G"á 0001E0

Dump of file SATURN:[PCCOMMON.DUMP.DLL]DACOPY.TMP;1 on 18-APR-1990 10:39:51.10
File ID (545,24,0)   End of file block 90 / Allocated 92

Virtual block number 57 (00000039), 512 (0200) bytes

 0088065E C42A4789 262C4789 26000088 065EC426 47892628 47892600 0088065E ^.¡..&.G(&.G&á^.¡..&.G,&.G*á^.¡. 000000
 47892600 0088065E C4324789 26344789 26000088 065EC42E 47892630 47892600 .&.G0&.G.á^.¡..&.G4&.G2á^.¡..&.G 000020
 00FFFF9A 0676FF08 76FF0A76 FF3A4789 263C4789 26000088 065EC436 47892638 8&.G6á^.¡..&.G<&.G:.v..v..v..... 000040
 0876FFD8 8E0387B8 1E565700 0006C800 06CAC95F 5E1F0000 E9FE4688 FE468900 ..F±.F±Õ...^_èò..à...WV.¡ñ..Á.v. 000060
 002DE903 7400003D 00000365 9A5016FC 46800676 FF0876FF 00000350 9A0676FF .v..P....v..v..F•.P.e...=..t.Õ-. 000080
 9A0676FF 0876FF00 11E90375 00003DFA 46890000 076D9AFC 76FFFE76 FF0A76FF .v..v±.v•.m....F'=..u.Õ...v..v.. 0000A0
 03750000 3DFA4689 00000307 9A0676FF 0876FFFF 88E90025 E9FA4688 00000397 .....F'Õ%.ÕE..v..v..■....F'=..u. 0000C0
 0789881E 56570000 02C80006 CAC95F5E 1F0000E9 00008800 06E9FA46 880006E9 Õ...F'Õ..¡..Õ...^_èò..à...WV.¡.. 0000E0
 880006E9 03750000 3DFE4689 0000FFFF 9A0676FF 0876FF3E 6A176A0A 76FFD88E .Á.v.j.j>.v..v.......F±=..u.Õ... 000100
 89260447 89260000 8F1FC426 065EC407 89260A46 881FC426 065EC401 18E9FE46 F±Õ..á^.&á..F.&..á^.&á.¡..&.G.&. 000120
 C400000A 47C7261F C426065E C4064789 26084789 26000088 1FC42606 5EC40247 G.á^.&á.¡..&.G.&.G.á^.&á.&úG...á 000140
 26065EC4 0E478926 10478926 0000881F C426065E C400000C 47C7261F C426065E ^.&á.&úG...á^.&á.¡..&.G.&.G.á^.& 000160
 5EC41647 89261847 89260000 881FC426 065EC412 47892614 47892600 00881FC4 á.¡..&.G.&.G.á^.&á.¡..&.G.&.G.á^ 000180
 1E478926 20478926 0000881F C426065E C41A4789 261C4789 26000088 1FC42606 .&á.¡..&.G.&.G.á^.&á.¡..&.G &.G. 0001A0
 89262847 89260000 881FC426 065EC422 47892624 47892600 00881FC4 26065EC4 á^.&á.¡..&.G$&.G"á^.&á.¡..&.G(&. 0001C0
 30478926 0000881F C426065E C42A4789 262C4789 26000088 1FC42606 5EC42647 G&á^.&á.¡..&.G,&.G*á^.&á.¡..&.G0 0001E0
```

Dump of file SATURN:[PCCOMMON.DUMP.DLL]DACOPY.TMP;1 on 18-APR-1990 10:39:51.10
File ID (545,24,0)   End of file block 90 / Allocated 92

Virtual block number 58 (0000003A), 512 (0200) bytes

```
89260000 B81FC426 065EC432 47892634 47892600 00B81FC4 26065EC4 2E478926 &.G.6^.&6.|..&.G4&.G2&^.&6.|..&. 000000
5F5E1F00 00E90000 B83A4789 263C4789 260000B8 1FC42606 5EC43647 89263847 G8&.G6a^.&a.|..&.G<&.G:|..Ö...^_ 000020
0081E903 7510470B 260E478B 26065EC4 D88E080E B81E5657 00000AC8 0006CAC9 èò..à...WV.|...Áó^.&.G.&.G.u.Ö.. 000040
5016F646 800E77FF 261077FF 26065EC4 00000794 9A0E77FF 261077FF 26065EC4 6^.&.w.&.w......6^.&.w.&.w..F-.P 000060
39260040 E9037407 39261056 8B0E468B F65EC400 54E90374 00003D00 0007A49A .É...=..t.ÕT.6^-.F..V.&9.t.Õa.&9 000080
0C568B0A 468BF65E C4000007 D09A0E77 FF261077 FF26065E C40037E9 03740257 W.t.Õ7.6^.&.w.&.w..Å...6^-.F..V. 0000A0
8FE900CF E90000B8 0005E994 FEB80006 E9037506 57392600 09E90374 04473926 &9G.t.Õ..&9W.u.Õ..|±.Õ[.|..Õü.Õ. 0000C0
0006E903 7500003D FA468900 0008209A 5016FC46 80086A17 6A37FF26 065EC4FF .6^.&.7j.j..F=.P. ....F°=..u.Õ.. 0000E0
260C568B 0A468BFC 5EC40257 89260789 2610568B 0E468BFC 5EC400A7 E9FA468B .F°ÕI.6^•.F..V.&..&.W.6^•.F..V.& 000100
06468B37 FF26065E C40038E9 03741047 08260E47 8B26065E C4065789 26044789 .G.&.W.6^.&.G.&.G.t.Õ8.6^.&.7.F. 000120
76FF37FF 26065EC4 0017E903 7500003D FA468900 00FFFF9A 5052000E 0508568B .V....RP......F°=..u.Õ..6^.&.7.v 000140
FC76FFFE 76FF5052 000E0508 568B0646 8B003EE9 FA468B00 000AAD9A FC76FFFE ±.v•.Ù....F°Õ>..F..V....RP.v±.v= 000160
0007BA9A FC76FFFE 76FF37FF 26065EC4 0017E903 7500003D FA468900 00FFFF9A ......F°=..u.Õ..6^.&.7.v±.v•.□.. 000180
088E095C B81E5657 000004C8 000CCAC9 5F5E1F00 00E90000 B80006E9 FA468B00 ..F°Õ..|..Õ...^_èò..à...WV.|\..Á 0001A0
065EC400 6FE90375 2C470B26 2A478B26 065EC407 89260247 89260000 B80E5EC4 6^.|..&.G.&..6^.&.G°&.G,u.Õo.6^. 0001C0
09919A50 16FC468D 2A77FF26 2C77FF26 065EC400 00097C9A 2A77FF26 2C77FF26 &.w,&.w*.|...6^.&.w,&.w*.F=.P... 0001E0
```

Dump of file SATURN:[PCCOMMON.DUMP.DLL]DACOPY.TMP;1 on 18-APR-1990 10:39:51.10
File ID (545,24,0)   End of file block 90 / Allocated 92

Virtual block number 59 (0000003B), 512 (0200) bytes

```
74025739 26002EE9 03740739 260C568B 0A468BFC 5EC40042 E9037400 003D0000 ..=..t.ÕB.6^•.F..V.&9.t.Õ..&9W.t 000000
2C77FF26 065EC402 57892607 89260E5E C406578B 2604478B 26FC5EC4 0025E903 .Õ%.6^•&.G.&.W.6^.&..&.W.6^.&.w, 000020
CCB81E56 57000006 C8CBC95F 5E1F0000 E90000B8 FFA1E900 0009C39A 2A77FF26 &.w*.ù...ÕÀ.|..Õ...^_èùà...WV.|ä 000040
E9037500 003DFA46 8900000A 019A5016 FC468018 6A176A37 FF26065E C4D88E0A ..Áó^.&.7j.j..F•.P......F°=..u.Õ 000060
568B1A46 8BFC5EC4 02578926 07892620 568B1E46 8BFC5EC4 00C9E9FA 468B0006 ...F°Õè.6^•.F..V &..&.W.6^•.F..V 000080
12468BFC 5EC40A57 89260847 89261856 8B16468B FC5EC406 57892604 4789261C .&.G.&.W.6^•.F..V.&.G.&.W.6^•.F. 0000A0
8BFC5EC4 12578926 10478926 1056880E 468BFC5E C40E5789 260C4789 2614568B .V.&.G.&.W.6^•.F..V.&.G.&.W.6^=. 0000C0
065EC400 27E90374 18470B26 16478B26 065EC416 57892614 4789260C 568B0A46 F..V.&.G.&.W.6^.&.G.&.G.t.Õ'.6^. 0000E0
468B0006 E9037500 003DFA46 8900000A 599A5052 00160508 568B0646 8B37FF26 &.7.F..V....RP.Y....F°=..u.Õ...F 000100
00003DFA 46890000 0A919AFC 76FFFE76 FF505200 16050856 8B06468B 002DE9FA °Õ-..F..V....RP.v±.v•......F°=.. 000120
B81E5657 00000AC8 001CCAC9 5F5E1F00 00E90000 B80006E9 FA468B00 06E90375 u.Õ...F°Õ..|..Õ...^_èò..à...WV.| 000140
9A2277FF 262477FF 26065EC4 0081E903 7524470B 2622478B 26065EC4 088E086F o..Aà^.&.G"&.G$u.Õ..6^.&.w$&.w". 000160
54E90374 00003D00 000B0E9A 5016F646 802277FF 262477FF 26065EC4 00000AF9 °...6^.&.w$&.w".F-.P.....=..t.ÕT 000180
FF26065E C40037E9 03740257 39260040 E9037407 39261056 8B0E468B F65EC400 .6^-.F..V.&9.t.Õa.&9W.t.Õ7.6^.&. 0001A0
57392600 09E90374 04473926 0C568B0A 468BF65E C400000B 559A2277 FF262477 w$&.w".U...6^-.F..V.&9G.t.Õ..&9W 0001C0
80086A17 6A37FF26 065EC4FF 8FE900AD E90000B8 00B3E994 FEB80006 E9037506 .u.Õ..|±.Õ°.|..ÕU.Õ..6^.&.7j.j.. 0001E0
```

Dump of file SATURN:[PCCOMMON.DUMP.DLL]DACOPY.TMP;1 on 18-APR-1990 10:39:51.10
File ID (545,24,0)   End of file block 90 / Allocated 92

Virtual block number 60 (0000003C), 512 (0200) bytes

```
0E468BFC 5EC40085 E9FA468B 0006E903 7500003D FA468900 000B839A 5016FC46 F=.P......F°=..u.Õ...F°Õ..6^•.F. 000000
8B26065E C4065789 26044789 260C568B 0A468BFC 5EC40257 89260789 2610568B .V.&..&.W.6^•.F..V.&.G.&.W.6^.&. 000020
000C1F9A 50520022 ^5085688 06468B37 FF26065E C40027E9 03742447 0B262247 G"&.G$t.Õ'.6^.&.7.F..V..".RP.... 000040
FE76FF50 52002205 ·9568B06 46880020 E9FA468B 0006E903 7500003D FA468900 ..F°=..u.Õ...F°Õ-..F..V..".RP.v± 000060
1F0000E9 0000B800 06E9FA46 8B0006E9 03750000 3DFA4689 00000C46 9AFC76FF .v=.F....F°=..u.Õ...F°Õ..|..Õ... 000080
16FC468D 0C6A176A 37FF2606 5EC4D88E 0C70881E 56570000 06C8000C CAC95F5E ^_èò..à...WV.|p..Áó^.&.7j.j..F•. 0000A0
1056880E 468BFC5E C40093E9 FA468B00 06E90375 00003DFA 46890000 0D159A50 P¯......F°=..u.Õ...F°Õ..6^=.F..V. 0000C0
89260C56 8B0A468B FC5EC404 47892606 47892600 00B8FC5E C4025789 26078926 &..&.W.6^•|..&.G.&.G.6^•.F..V.&. 0000E0
8B06468B 37FF2606 5EC40027 E9037414 470B2612 478B2606 5EC40A57 89260847 G.&.W.6^.&.G.&.G.t.Õ'.6^.&.7.F.. 000100
06468B00 2DE9FA46 8B0006E9 03750000 3DFA4689 00000060 9A505200 12050856 V....RP.m....F°=..u.Õ...F°Õ-..F. 000120
468B0006 E9037500 003DFA46 8900000D 949AFC76 FFFE76FF 50520012 0508568B .V....RP.v±.v•......F°=..u.Õ...F 000140
0A5EC4D8 8E0D8E8B 1E565700 0004C800 0CCAC95F 5E1F0000 E90000B8 0006E9FA °Õ..|..Õ...^_èò..à...WV.|/..Äá^. 000160
909A1277 FF261477 FF260A5E C4006AE9 0000B800 06E90374 14470B26 12478B26 &.G.&.G.t.Õ..|..Õj.6^.&.w.&.w... 000180
0037E903 7400003D 00000CA5 9A5016FC 46801277 FF261477 FF260A5E C400000C ...6^.&.w.&.w..F=.P.E...=..t.Õ7. 0001A0
5EC40016 E9037402 57392600 1FE90374 073926FC 5EC40257 8B26078B 26065EC4 6^.&..&.W.á^•&9.t.Õ..&9W.t.Õ..6^ 0001C0
5F5E1F00 00E90000 B8FFACE9 06578926 04478926 FC5EC406 578B2604 478B2606 .&.G.&.W.á^•&.G.&.W.Õ¯.|..Õ...^_ 0001E0
```

Dump of file SATURN:[PCCOMMON.DUMP.DLL]DACOPY.TMP;1 on 18-APR-1990 10:39:51.10
File ID (545,24,0)   End of file block 90 / Allocated 92

Virtual block number 61 (0000003D), 512 (0200) bytes

```
00880006 E9037414 470B2612 47882606 5EC4D88E 0E89881E 56570000 0EC8CBC9 èùà...WV.|...Aó^.&.G.&.G.t.Õ..|. 000000
9A0E77FF 261077FF 26065EC4 0068E903 7510470B 260E4788 26065EC4 01B9E900 .Õ¿.ó^.&.G.&.G.u.Õh.ó^.&.w.&.w.. 000020
38E90374 00003000 000EC49A 5016F246 800E77FF 261077FF 26065EC4 00000EAF £...ó^.&.w.&.w..F·.P.ó...=..t.Õ8 000040
0016E903 75000030 F6468908 C4830646 0E819AF2 76FFF476 FF0676FF 0876FF00 ..v..v..v¶.v·...F..ó..F-=..u.Õ.. 000060
E90000B8 0006E9FF ABE90147 E9F64688 00000CD7 9A0E77FF 261077FF 26065EC4 ó^.&.w.&.w..■....F-ÕG.Õ .Õ..|..Õ 000080
F8468012 77FF2614 77FF2606 5EC40000 0F509A12 77FF2614 77FF2606 5EC4013B ;.ó^.&.w.&.w..P...ó^.&.w.&.w..F% 0000A0
5EC40010 E9037502 47C92607 8826F85E C40108E9 03740000 3D00000F 659A5016 .P.e...=..t.Õ..ó^¥&..&.G.u.Õ..ó^ 0000C0
03880000 10489A12 77FF2614 77FF2606 5EC40016 E9037406 47082604 47°926F8 ¥&.G.&.G.t.Õ..ó^.&.w.&.w..H...|. 0000E0
00FFFF9A 5016FC46 800F6A08 77FF260A 77FF26F8 5EC40A76 FF0C76FF 000\ 995 .Õ1..v..v.ó^¥&.w.&.w.j..F•.P.... 000100
E9F64688 00001094 9A1277FF 261477FF 26065EC4 0016E903 75000030 F646ι·00 ..F-=..u.Õ..ó^.&.w.&.w.......F-Õ 000120
0F6A0877 FF260A77 FF26F85E C40A76FF 0C76FF00 41E90375 FE460BFC 46880U9B ...F•.F±u.ÕA..v..v.ó^¥&.w.&.w.j. 000140
261477FF 26065EC4 0016E903 7500003D F6468900 00FFFF9A 146AFC76 FFFE76FF .v±.v•j.......F-=..u.Õ..ó^.&.w.& 000160
6A0877FF 260A77FF 26F85EC4 0A76FF0C 76FF004F E9F64688 0000100A 9A1277FF .w..Õ....F-Õ0..v..v.ó^¥&.w.&.w.j 000180
5EC40016 E9037500 003DF646 890000FF FF9A146A 0477FF26 0677FF26 F85EC40F .ó^¥&.w.&.w.j.......F-=..u.Õ..ó^ 0001A0
5F5E1F00 00E90000 88FED8E9 0009E9F6 46880000 0F9C9A12 77FF2614 77FF2606 .&.w.&.w.......F-Õ..ÕU±|..Õ...^_ 0001C0
80000201 EE00040E 5F020300 7C000210 79020301 E1000407 E4020300 0E08CAC9 èò.....Õ...Ä...y...|..._...Ÿ...¯ 0001E0
```

Dump of file SATURN:[PCCOMMON.DUMP.DLL]DACOPY.TMP;1 on 18-APR-1990 10:39:51.10
File ID (545,24,0)   End of file block 90 / Allocated 92

Virtual block number 62 (0000003E), 512 (0200) bytes

```
29020302 0000050A 75020301 FF000500 D2020300 0000080F 1A000200 0000040F ................●.......u.......) 000000
20020301 C200040F D3020301 AE000410 0A020301 9000040F BE020300 A6000202 ...Î...ƒ...........Û...&...ô...· 000020
00000000 00000000 00000001 D600040E 38020300 62000210 8F020300 55000210 ...U...¢...b...8...●............ 000040
390017E9 03750038 80260A5E C4460001 E90000BE D88EFFFF 881E5657 000004C8 à...WV.|...Af..Õ..Fó^.&.8.u.Õ..9 000060
7F0E7E39 470001E9 FE88FFDC E9008826 065EC400 8A260A5E C4000FE9 037F0E76 v...Õ..ó^.&..ó^.&..ÕE..±Õ..G9~.. 000080
0EE90375 00FF7F80 2608468E 065E030E 5E88FFED E90001C6 26065EC4 000AE903 .Õ..ó^.&6..ÕÜ..^..^..F.&....u.Õ. 0000A0
00080002 000190C8 C95F5E1F 0000E9C6 8800FF47 C6260846 8E065E03 0E5E8800 ..^..^..F.&6G...6Õ...^_èù....... 0000C0
00000000 00000000 00000000 00000000 00000000 00000000 00000000 00000008 ................................ 0000E0
025C1E88 F3885756 C08ED08C CB5E5FA5 F3000AB9 00768F00 448EC08E D88C5756 VW.Â.â/D.¢v.¿..µE_^ù.Â.âVW.µ..\. 000100
C383025C 1E88F388 575616E8 F388D98E A5A5FCD8 8EC18ED9 8CC08CFB 880CC383 .û..«.â.).è.Â•EE.T.µŠ.VW.µ..\..û 000120
CB5E5F03 FE47C6FC 7789025C 1E894E74 0248F881 F388A5A5 FCC18ED9 8CF8880C ..«.).è•EE.µ.«H.tN..\..w•6G±._^ù 000140
D98EA5A5 A5A5FCD8 8EC18ED9 8CC08CF8 880CC383 025C1E88 F3885756 C08ED08C .Â.âVW.µ..\..û..«.â.).è.A•EEEE.) 000160
0248F881 F388A5A5 A5A5FCC1 8ED98CF8 880CC383 025C1E88 F3885756 18E8F388 .µŠ.VW.µ..\..û..«.).è•EEEE.µ.«H. 000180
8ED98CD8 8C575604 EBD08C57 56054FE9 CB5E5FFC 778907FE 47C6025C 1E890E74 t...\.6G±..w•_^ùÕO.VW.ÂŠ.VW.Â.). 0001A0
740248F8 81A5A502 74033CA5 A5FE4588 ADF8880C C383025C 1E88F388 FCD88EC1 ê.Â•.µ..\..û.¯«Ü.E±EE<.t.EE.«H.t 0001C0
8826C08E D08C14EB 02578826 07882600 8ED08CCB 5E5FD98E FC5F8902 5C1E89CF ü..\.._•.)_^ù.Â.â&..&.W.Š..Â.â&. 0001E0
```

Dump of file SATURN:[PCCOMMON.DUMP.DLL]DACOPY.TMP;1 on 18-APR-1990 10:39:51.10
File ID (545,24,0)   End of file block 90 / Allocated 92

Virtual block number 63 (0000003F), 512 (0200) bytes

```
D8830AF7 D8F70779 8024C78A D088DA88 57569907 8803EB02 57880788 0AEB9907 ..Š....W.Š....VW.Õ.Â.ú$.y.%U%Õ.U 000000
45C60F75 00FF80C1 8ED98CFC 7D89025C 3E891C74 0248FF81 0CC78302 5C3E8800 ..>\..ú...H.t..>\..)•.).è...u.6E 000020
5F5D00CF E8F88808 33C88887 60805507 FE45C6FF 63E9CB5E 5F0A70E8 9E8403FE ±.Ç.Õp._^ùÕc.6E±.U§'..ù3U.«Õù.]_ 000040
89025C3E 89817402 48FF810C C783FE45 8AFC7588 025C3E88 C08ED88C 5756CB5E ^ùVW.Â.Ã.>\..u•.E±.ú...H.tŸ.>\..¯ 000060
8C740248 FF810CC7 83025C3E 885756C8 5E5FA5A5 0274033C A5A5FCFE 4588FC7D )•.E±•EE<.t.EE_^ùVW.>\..ú...H.t. 000080
56C08ED8 8C02EB00 8CCB5E5F ABA8FCC0 33C08ED8 8C03FE45 C6FC7D89 025C3E89 .>\..)•6E±..Â.Ã3â•¨¨_^ù.ÂŠ..Â.âV 0000A0
025C1E88 FCF88857 56C08ED8 8C02EB00 8C11EB0C 025C0683 025C1E88 FCF88857 W.«•..\...\..Š..ÂŠ..Ã.âVW.«•..\. 0000C0
5F0492E8 57FC7788 00982689 55C85E5F 0C025C2E 83A5A5FC 77880075 03FE7F80 ..±.u..w•EE..\.._^ùU.&...w•WÕ.. 0000E0
EB008C11 EB0C025C 0683025C 1E88FCF8 885756C0 8ED88C02 EBD08CE4 EB5DDE88 .8)$8.ÂŠ..Â.âVW.«•..\...\..Š..ÂŠ 000100
0C025C2E 83A5A5A5 A5FC7788 0F7507FE 7F80025C 1E88FCF8 885756C0 8ED88C02 ..Â.âVW.«•..\...±.u..w•EEEE..\.. 000120
0683025C 1E88F888 5756C08E D88C02E8 D08CE9E8 DF87F788 1830E80F 87C85E5F _^ù.ÕÕÕ..%.ÕŠÕ.ÂŠ..Â.âVW.«..\... 000140
FC0C025C 2E83FE47 8AF38802 5C1E88F8 885756C0 8ED88C02 EBD08C10 EB0C025C \..Š..ÂŠ..Â.âVW.«..\..µ.G±..\..• 000160
FF031D9A 48EB07C0 8A078888 50EB0797 8A078088 CB5E5FA5 A5027403 3CA5A5AB ¨EE<.t.EE_^ù|..¤..ŠP|E.¤â.ŠH.... 000180
9004EB05 76E8900A EB0528E8 9010EB05 29E836E8 02C48A02 BE880074 26889FFF ...&t.|/.¤â.Š6Õ).Š..Õ(.Š..Õv.Š.. 0001A0
CA880074 26889F02 AF03109A C30AF700 D28308F7 0773589E 0074268A 50053BE8 Õ;.P.&t..Xs.%Â.●.%Õù...€...&t.|ò 0001C0
75087488 030A7C80 025C3689 0CEE8302 5C368851 53009826 89555756 02D0BA02 .¤Â.VWU.&..SQ.6\..Ÿ..6\..|...t.u 0001E0
```

```
Dump of file SATURN:[PCCOMMON.DUMP.DLL]DACOPY.TMP;1 on 18-APR-1990 10:39:51.10
File ID (545,24,0)   End of file block 90 / Allocated 92

Virtual block number 64 (00000040), 512 (0200) bytes

 7403F880 13757F01 F6FF32FE 5D8A025C 3E8857CB 5E5F5D5B 59D2FF02 EBD0FF04 ..A$..0Y[]_^UW.>\..]±2.-..u..«.t 000000
 8A025C3E 8857C8F4 C8E40B03 755F8001 F6F87480 FF41F6C8 5F0875F0 FF41F608 .-A.Þu._u-Ã..t½-.._u..ðu¹UW.>\.. 000020
 5E5F8031 80FF3208 75F73BFC 7588FE5D 8A025C3E 885756CB 5F7F2180 FF32FE5D ]±2..!._uVW.>\..]±_u•;¼u.2..1._^ 000040
 5E5FA880 F480ADA5 A5C85E5F A880F480 AD087503 F880A5FC C18ED98C FC7D89CB u.)•.1.ē•E.«.u.U.¶._^uEEU.¶.¯^ 000060
 E8C08ED0 8C575676 E8000888 F3885756 04E8168C E8575602 EBC08ED0 8C5756CB uVW.À.àS.VWÒ¥.S.VW.µ|..$vVW.À.āS 000080
 04E8168C E8575602 EBC08ED0 8C57565E E8000488 F3885756 04E816A4 E8575602 .VWÒE.S.VW.µ|..S^VW.À.àS.VWÒ..S. 0000A0
 E8001488 F3885756 04E81674 E8575602 EBC08ED0 8C575646 E8000C88 F3885756 VW.µ|..SFVW.À.àS.VWÒt.S.VW.µ|..S 0000C0
 EBC08ED0 8C575616 E8001088 F3885756 04E8165C E8575602 EBC08ED0 8C57562E .VW.À.àS.VWÒ\.S.VW.µ|..S.VW.À.àS 0000E0
 87107407 FE7D80C1 8ED98C02 5C3E88D8 88000088 F3885756 04E81644 E8575602 .VWÒD.S.VW.µ|...À.>\..1.ė.)±.t.. 000100
 0FE8025C 3E88F788 164FE800 DE8F02C3 83C85E5F 5D005897 FF009826 8955FC7D )•U.&....X.]_^ù.û.¢8.ÒO..¼.>\.SÒ 000120
 02E8C08E D08C5756 76E8000A 88F38857 5604E816 13E85756 02E8C08E D08C5756 VW.À.àS.VWÒ.¯S.VW.µ|..SvVW.À.àS. 000140
 5604E815 E3E85756 02E8C08E D08C5756 5EE80006 88F38857 5604E815 F8E85756 VWÒ«.S.VW.µ|..S^VW.À.àS.VWOD.S.V 000160
 2EE80016 88F38857 5604E815 C8E85756 02E8C08E D08C5756 46E8000E 88F38857 W.µ|..SFVW.À.àS.VWÒù.S.VW.µ|..S. 000180
 02E8C08E D08C5756 16E80012 88F38857 5604E815 83E85756 02E8C08E D08C5756 VW.À.àS.VWÒ*.S.VW.µ|..S.VW.À.àS. 0001A0
 E8560574 07FE7D80 C18ED98C 025C3E88 D8880002 88F38857 5604E815 9BE85756 VWÒ..S.VW.µ|...À.>\..1.ė.)±.t.VÒ 0001C0
 8800E800 14B812E8 0010B817 E8000C88 1CE80008 8821E800 04B8FF39 E95E1596 ..^Ò9.E..SIE..S.E..S.E..S.E..S.E 0001E0

Dump of file SATURN:[PCCOMMON.DUMP.DLL]DACOPY.TMP;1 on 18-APR-1990 10:39:51.10
File ID (545,24,0)   Er.I of file block 90 / Allocated 92

Virtual block number 65 (00000041), 512 (0200) bytes

 EF832B74 07F27D80 397407FE 7D80025C 3E885756 00188803 E8001C88 08E80000 ..S.E..S.E..VW.>\..)±.t9.)·.t•.ÿ 000000
 98268955 3E7318FB 832F731C F883087D 88FC7D89 FC7588C0 8ED88C02 5C3E890C ..>\..À.à.u•.)•.)..«.s/.«.s>U.&. 000020
 5C3E890C EF83C474 07F27D80 02C383CD E81529E8 02C383CB 5E5F5D00 5897FF00 ...X.]_^ù.ù.Ò).Se.ù..)·.tá.ÿ..>\ 000040
 550C025C 2E83C85E 5F500054 97FF0098 2689550C 025C2E83 F787BFEB 1514E802 .Ò..S¢¯¼..\..U.&....T.)_^ù..\..U 000060
 02E7D0F8 8AE3D0E3 D0C89E5E 5FE00AE4 D0E80141 00259F50 005897FF 00982689 .&....X.].%.AiÒÀÕ.À_^.ùÃDÀD.«ÀÒ. 000080
 890587AD 000589F8 2BFE884E 4E025C36 88FCC08E D88C5756 000C8803 E8FF32DF Ò2.S.E..VW.À.à•.6\.ÑN.±•«¿..Ù... 0000A0
 885E5F14 9BE80374 07FE7D80 025C3E88 5756EC88 55C85E5F F4E24747 1088FE44 D±..GGã¶_^ùU.$VW.>\..)±.t.Ò.._^. 0000C0
 C1803130 009406C7 12E88380 33300094 06C71CE8 84803430 009406C7 00C850E5 Í]ù.ú...Ò4¯.S.ú...O3¯.S.ú...OT¯. 0000E0
 2A323100 9406C706 758C3C00 DA1EFF04 7400000C 3E838A80 30310094 06C708E8 S.ú...10¯..>É..t...Ò.<.u.ú...12* 000100
 FFE40500 96A1063F 1B309A50 00FD8806 371DE09A 00908B02 E71AD69A 0096A3E4 ÒÉ...ø.Ò.E...À.7.¡».P.O.?.À...Ò. 000120
 7F80C2F7 C0330254 880C88FC 025C3E88 C306541F 6E9A0096 36FF0648 1B309A50 P.O.H..6...n.T.ù.>\.•...T.3à¼ò.. 000140
 89000005 C73800C2 818FE680 D8D1D9D1 FAD1D8D1 D9D1FAD1 D8D1D9D1 FAD12974 t)Ì•Ì]ÌÀÌ•Ì]ÌÀÌ•Ì]ÌÀ.Ì..õ.8ù.... 000160
 8AADD48A C80AADC8 88ADFC02 5C3E88EA E8D08AC8 8BC3F788 06558904 4D890245 E..M..U..¼ù.à.ÀSõ.>\.•Ù.àU.à.àU. 000180
 22EC8AF9 0A808101 CA800374 CD0AD3D1 E2D1D301 E2D1D301 E2D1F88A ADDC8AF0 Þ.ÉU.¼ìãìÆìãìÆìãìÆ.ét..Ò.Ý..*.S" 0001A0
 80107401 C6F61572 0777D13A E001E0D1 E0013872 38002D3D 7747E03D 7FF025E9 Ò%Þ.=ÀGw=-.8r;ÌÀÌÀÌÀ;Ìw.r.-ó.t.. 0001C0
 8AE38A02 4589E50A C70A7FE7 801674C0 0817747F 80300080 05087300 D38301C6 6..Æ.s....=..t..ät..Ò..ú.Ì.E..D. 0001E0

Dump of file SATURN:[PCCOMMON.DUMP.DLL]DACOPY.TMP;1 on 18-APR-1990 10:39:51.10
File ID (545,24,0)   End of file block 90 / Allocated 92

Virtual block number 66 (00000042), 512 (0200) bytes

 3300881D E8C38800 88DA8802 33C3F788 02458905 89C033FE D8E9C3F7 880589C6 6...¼ùÒU±3à...E..¼ù3ø.Ò.À.ùS..À3 000000
 9E848024 C48A0008 83DAF708 F70779C0 08C38800 88DA8811 E8DAF715 79D20808 U.øy.¼ÒS..Ò.À.ù.äy.¼U¼C.U..áS.Ç. 000020
 08C388C8 88DA8811 E8D9F715 79C90808 33C88810 E8C388C8 88DA88D2 330474E9 Òt.3ø.Ò.à.ùS..à3U.èy.¼1. .Ò.à.ù. 000040
 0028E80D E8003AE8 0785E985 60800233 FF338024 C48A0008 83D9F7D8 F70779C0 ày.¼U¼1.U..áS.3.3ø§'.Òç.ι..S.Ò+. 000060
 50E808E8 003EE800 E8009CE8 C3C80167 75000283 C0010026 E803E800 35E808E8 S.ÒS.S.Ò&.íâ.ø.ugìàùÒ..S.Ò>.S.Ò] 000080
 08C93300 41E803E8 007BE808 E8002CE8 00E8002C E8C34E75 D20B0039 E803E800 .S.Ò9..øuNùÒ,.S.Ò,.S.Ò(.S.ÒA.3è. 0000A0
 E803E800 56E8C3CA D1217500 D183C2D1 00D18300 D283F508 F7D2F7D1 F70D79FF .y.¼ì¼ø¼A¼.ø..Ì.ìò.Ì.uÌìòùÒV.S.Ò 0000C0
 92AD00A4 E9FDE9E9 C3017200 D283C313 D813F581 F980CD0A E82201B5 D833001C ..3Ùç."Ò.ë.'.¼.Ù.ù.ø.r.ùÒÒ»ÒÉ.Ù. 0000E0
 08E9D1E9 D1E9D1E9 D17FE580 10CE80F1 220F86F9 8808EE83 91AD91AD 93ADD60A .øÙ.Ù.Ù..Ý..'Ñ."þ.ö..Ì.ÌÒÌÒÌÒÌÒ. 000100
 C186ACC8 8AADF88A ACDA8AD2 332FE825 E983CA7F 20F98378 7203FEE9 810874C9 ètÀ.Ò±.rx.' .Ò.Ò¼S/3ø.Ò¯.¼U.à¯.è 000120
 83997F20 F9834772 7EE9804D 74C9080C D0F9D100 E4D07FE1 83F988E9 8A04EE83 .Ý..Ò.'.À.ÀÒÀÌ'ÀÉ.ètM.Ò-rG.' ... 000140
 E980F632 E68AC48A F88ADF8A D30A01E2 80D2D0F5 01FA801A 7C08F980 D9F720E9 Ò ¼1.'.|..'.¼Àø.ā..Æ.Ò.½.á.12-.Ò 000160
 C388D088 CA8AF3E2 0002800A D0080108 D1EED000 DA8001B2 01FA8015 E3E1E808 .SÀD..'.ÿ..Ò.ÀÝìÀìUÀÒ.ø.ãµ.Ò.À.ù 000180
 EFB3067C 03025C36 880131E8 07800068 E8FD35E9 C30088C0 33000180 0081F9C3 ù'Ý..ì.3ä.ÀùÒ5»Òh.¯.Ò1..6\..|..ÿ 0001A0
 5C368801 08E80380 0087E8FD 0FE9C3FE 88067C89 E0737FF0 FA817FE6 80078810 ..ø.|..'Þ.sÀ.|..±ùÒ.»Ò..¯.Ò...6\ 0001C0
 025C3688 001EE8C3 FE88027C 890F737F 80FA817F E6800788 0080EF81 027C0302 ..|..ÿ...ø.|..'..sÒ.|..±ùÒ...6\. 0001E0
```

```
Dump of file SATURN:[PCCOMMON.DUMP.DLL]DACOPY.TMP;1 on 18-APR-1990 10:39:51.10
File ID (545,24,0)   End of file block 90 / Allocated 92

Virtual block number 67 (00000043), 512 (0200) bytes

 8C025C3E 8BFCC3FE 8B027C01 0080EF81 025C368B 0053E8C3 FE8B067C 0110EF83 .y..|..±ûÕS..6\..y...|..±û•.>\.. 000000
 83064C89 CA0A0FE1 83F98806 4C8B0010 8A025C36 8BC08EA5 A5A5A5C1 8ED98CC0 à.l.éEEEE.à.6\.¤...L..•.Ã..ò.L.. 000020
 FC0082E9 3FEBD9F7 047D0433 E981E9D1 E9D1E9D1 E9D10035 B87FE580 CF8BF0E7 Óþ.ü.l.¡5.iÕiÕiÕiÕ.Õ3.).¥l$?Õ..• 000040
 89CA0A7F E183F9E3 024C8B00 8D8A025C 368BC08E A5A5C18E D98CC08C 025C3E8B .>\..à.l.éEE.à.6\.¤...L..•.Ã..ò. 000060
 7CEF8BC8 3BD9F748 7D0096E9 81ED32CD 8AE1D100 18B87FE5 80CF8B80 E783024C L..Õ..ü.l.¡..iÃ.e2Ú.Õ..)H¥l;à.y| 000080
 F501FA80 147C08F9 800233EA 2B8000E5 81EF8BC8 880A74C8 3BFA0B80 00E78114 ..Õ...•;àt..à.ÿ.l..+õ30.•.|..•.¥ 0000A0
 2C8BE822 EE8AD7C1 uA009ABB 0CE3348A E7EB4608 E9800004 C6140A00 D2800082 ÿ..•...ó...Õ.FSÕ.4D.E...è•.Ý"Õ., 0000C0
 81FA8003 0ADE22D7 0AFAE2D7 D0EAD106 E3E18AEF 8A000188 C3348AD1 88C933C3 ú3è.l.4úE...y.ÃD.lõÃ•ã•.•"B.Æ.•. 0000E0
 00148046 D6E33488 F2D2CE28 C8039802 5C0E88E2 D3CC8AFD 8B027400 DA8001B2 ý..Õ.t..•.àÆâ..\...à+ö. .4D.F... 000100
 7F80A902 50882602 4488C3E4 D07FCC80 FBC8E9C3 F5D3D14C 747F80C3 F7C3FAE2 à•üXû..tLiÆ¥ûÕà«.à.Ãõû.D.&.]. .. 000120
 73E001E3 D10578EF 32EC8AD8 74D3F77F 80C3F7D3 F7E274D0 F77F80A9 D0F7E174 tÃ¥Ã`..¥ÃtàXÆ¥û..¥ÆtÃ.$2yx{lDlÃs 000140
 C3F5D3D1 5E747FF0 C3F7C305 3B26048B 0575C33B DA8EC18E D98CC28C F787930B ...¥.ô.).è.Õ;ùu...&;.û¥ûþ.t^iÆ¥û 000160
 D3F7E274 D0F77FF0 A9D0F7E1 747FF0A9 06508826 06448BC3 E4D07FCC 80F875E9 Õu«.à.Ãõû.D.&.].`Þ.tÃ¥Ã`Þ.¥ÃtàXÆ 000180
 3BDA8EC1 8ED98CC2 8CF78793 0B73E001 E3D10578 EF32EC8A D874D3F7 7FF0C3F7 ¥ûþ.¥ÆtÃ.$2yx{lDlÃs...¥.ö.).è.Õ; 0001A0
 02458BF7 87C3053B 26048B05 7502453B 2602448B 0E750445 3B260444 881775C3 ùu..D.&;E.u..D.&;E.u...&;.û.¥.E. 0001C0
 81FF00E7 8101748B FF7C8B02 4C8B80CF 80008235 8A015D8B 02458B03 EB80F480 .¶.$..E..]..5ý..ü..L..|..t..Õ... 0001E0

Dump of file SATURN:[PCCOMMON.DUMP.DLL]DACOPY.TMP;1 on 18-APR-1990 10:39:51.10
File ID (545,24,0)   End of file block 90 / Allocated 92

Virtual block number 68 (00000044), 512 (0200) bytes

 7718FC80 DCF6E52A 91FA87F3 870573EC 3A5B74E4 0A6574ED 0AC0D1C1 D18000CE o..ièià.Úte.õt[:$s..µ.•.*|-É.•.w 000000
 E980B33 D38801CB 800374D2 0B127C0E F98055E3 0085CD8A 91D900E8 D0C9D049 lÃèÃÕÃl..eç.DU.•.|..@t..ù..Æ3Ú.Õ 000020
 23741777 08E980FD 8ADF8AF3 8AD68A01 CE800374 D20A287E 05F9803E 741D7210 .r.t>.•.-+.@t..o..•.µ.Õ.».Õ.w.t# 000040
 D1EBD120 CA800374 3FC2F600 97E9E8D0 C1880788 DE8B19E8 F875C1FE D3D1E2D1 iàiÆ±èu½$..ß.•.èÃÕÕ..-ô?t..ò i$i 000060
 4575FFFC 80C4FEDA D1D8D150 730E13D7 031470E0 0020CA80 03743FC2 F6FAE20A Õã•-ô?t..ò ÃÃp..•.ßsPiÜiÕ±á.•.uE 000080
 6A7610EC 800B750B 0BD0F600 D383F5DA F7D3F70A 730E8BD7 8BF31BFA 2BFA41E9 ÕA•+•.µ.•.ßs.¥Æ¼Õ¥.Æ.-Ã.Ûu..$.vj 0000A0
 D14B74CC FE0A78FF 0AD232F2 8ADE8AF8 8A5B7608 EC800F75 FF0A6474 DB080A87 .Õ.Utd..u..$.v[.«.ß. 2@..x.±ätKi 0000C0
 D38301C6 800F7401 C6F61472 077780FA 80017CE9 03740000 A23E80F6 71D3D1E2 ãiÆq-.>Ã..t.Õ|..•.w.r.-ó.t..ó..Æ 0000E0
 4589025C 3E88C70A 7FE78080 2417747F 80A9D801 E0003A74 FFFC80C4 FE077300 .s.±á.•.t:ÃÃiÃ`..t.$..Õ..ú.>\..E 000100
 88058902 4589025C 3E88C033 017EE903 740000A2 3E80C3F7 880589C6 8AE38A02 ..D.ó...¥û.>Ã..t.Õ~.3à.>\..E.... 000120
 88CB74ED 0AD900E1 D1024D88 D674E40A D8D0E001 963488AD FCF99DE9 E679C3F7 ¥ûy|Õ.•=Ü.4.lÃÃÃ.õt•.M.iÃÃl.Útù. 000140
 8080C880 EF8AFF32 50CD74FF FC8080C4 800370E5 027FED80 80EC80C1 32D8883D =.A2è.$..Ú..|pÆ.á..•.teP2..ý.ù.. 000160
 130803E6 F7C188FA 88000283 D803E7F7 C588509F C008DA88 E7F7C688 E8BB80C9 è..$.ó¼Õ.Õ.à.P.é¼Õ.Ã.@..•.è¥l.Ã. 000180
 69E90A75 E40AD301 E2D19878 FF0A5893 D388C703 E1F6C588 01C88003 749E58FA •X.t..ù..é-Ã.ú.Æ.X..x.¡àiÆ.õu.Õi 0001A0
 0A5C74ED 0AD8D0E0 D1024488 D900E101 024D8BF7 87FF1AE9 AD74FFFC 80C''FFF .±á.•.tÚÕ...¥.M.iÃÃl.D.¡ÃÃÃ.Ut\. 0001C0
 015D8BFF 78E90375 FFFC8080 C480FF78 E90371E5 2A7FED80 81EC80C1 32D87 °4 õtÜ2è.$..Ú.•lq.Õ(..ó..•.u.Õx..]. 0001E0

Dump of file SATURN:[PCCOMMON.DUMP.DLL]DACOPY.TMP;1 on 18-APR-1990 10:39:51.10
File ID (545,24,0)   End of file block 90 / Allocated 92

Virtual block number 69 (00000045), 512 (0200) bytes

 CE80C032 248A0154 8B5000A2 3E02D9D1 EBD10874 0000A23E 8080CF80 C93228DA .-2è.ü..>Ã..t.i$l).>Ã.P.T..$2à.ó 000000
 D338F880 E9FF76E9 D08801CA 800374D6 88C20800 11E8EE88 001AE8D8 D1EAD180 .iõlÃÕ...ÝÕ...ô.@t..ò..lÕv.Õ`½;Æ 000020
 8EC3F973 D313C103 4E0773D7 8BFA18D8 F7E1F7C6 8BFA8815 E3C03396 F3F71D73 s.¥µ.3àD..•.ó¼Ã¥Ã.•.•s.N.è.Æs•ü/ 000040
 0A3C77EC 3A0EED80 0774ED0A 00A42E8A 0000A206 C6C3ED73 C188D003 C128FFFF ..+è.Ã.èsÚûó.Ã....Ê..Út..Ú.:$w<. 000060
 00A9025C 06C7585B 5AFE4EE8 D8320233 52535000 A5025C06 C7025C36 FF3874E4 õt8.6\.ú.\.E.PSR3@2ÙÕN±Z[Xú.\.`. 000080
 C7025C36 FF00A2A2 D2330B33 C033FE33 E9025C06 8F58585A FE0FE8FF 32525350 PSR2.Õ.±Z[X..\.Õ3±3à3Ú3@ÃÃ..ó\.ú 0000A0
 1DEB8000 F58106600 8BF787D3 EB00A7A3 00A5A3C0 33FE1AE8 52535000 A9025C06 .\.`.PSRÕ.±3àEE.ÉT.$Æ.¥.m..¥..$. 0000C0
 448BFC06 6D88C3FE 88025C36 88A8E60A 80E6807F E480ADA5 A5A5025C 3E8BF78B .¥.>\.EEEÚ.Õ..|..|`.6\..±ù.m.•.D 0000E0
 C52BC274 C008D686 95F78709 77E83BE0 E5830274 FFE025DA D0E001DE D0E5D106 .l|ÃBlÃÃÕ¥Ã.t@.lÃ;Õw..¥..•.àtò+é 000100
 92C032E0 8AACF888 E086C001 C001C001 57D0D1E2 D0D0D1E6 D0B97706 A03DD8F7 ¥Ã=..w¿Ãl|lÃàllWiàlàiá.Ã.½`.A2à. 000120
 88CB88D1 8801C980 03740208 187C0EFF 836374FF 0B10CC80 0FE480AD 93AD91AD Ú.Ú.Ú.Õ..à...tc...|..@t..è..l.ù. 000140
 E8BACD8A F18AD68A 01CE8003 74D20A28 7C06FF83 23724874 E77710EF 83C033D8 Ã3à.y.wÕtHr#...|+.@t..o..•.þ.è.$ 000160
 C2F6CF87 16EBF575 47D001D3 D1D1D1E2 D123740F 7708EF83 E432C48A F88ADF8A .Õ.½.á2ô.y.w.t#iàiiiÆiÃGu¥$..ú-ô 000180
 3B70E5D1 20CA8003 743FC2F6 975ECF87 F6E2DAD1 DFD1D8D1 E8D120CA 8003743F ?t..ò iÕiÚiÕiÕà-.u^.-ô?t..ò llp; 0001A0
 F7FE1358 9E581000 CE810FFF E6810574 88509F50 035C1301 4C133402 D8D0E5D1 llÃÃ.4.L..\.P.P.t..l...o..X.X.±¼ 0001C0
 F6D800E5 D10088E9 F6ECE903 75E0FD83 20C583DA D1D901D8 D1DFD113 742000C7 ú. t.iÕiuilïÕ.é .»Ãu.Õ$-Õ..llÃA- 0001E0
```

```
Dump of file SATURN:[PCCOMMON.DUMP.DLL]DACOPY.TMP;1 on 18-APR-1990 10:39:51.10
File ID (545,24,0)   End of file block 90 / Allocated 92

Virtual block number 70 (00000046), 512 (0200) bytes

D7F7D0F6 F6331373 FE189E10 00CE810F FFE6819F 05748803 5C18014C 18342AD0 Å*4.L..\..t...|...ö....±s.3--Å%a 000000
40760200 ED811375 0C7F618 75FF0800 048EFCFE 130E13CE 13F50AF7 D1F7D3F7 %Æ%i%O%.ò.ß.±•/....u.-úÀu..Ù..va 000020
FB8AC78A E08A972/ 50100ED 8118751F E0C7F7E4 E8D233CA 88D988F8 8830744E Nt=.«.1.ò3ØŞÒ%úÀ.u..Ù..v'..Å.ú.« 000040
EBEBD7D1 D3D1D1D1 E2017174 20ED8312 751000C7 F79700B2 F28ACE8A E98ADD8A .1.Õ.o.·ý..%ú..u..Ù tqiãiiiÆi■$$ 000060
00D18301 C6801A74 01C6F61F 72077780 FA800385 E9037400 008A3E80 FC9065EB $e.•.>¤..t.Õ...•.w.r.-ó.t..ó..1. 000080
E7808024 DE87025C 3E88F788 3074E0FD 8320C583 08742000 C7F70007 83000383 .Æ..■.%ú. t..é .»Åt0.%.>\..ß$..Ò 0000A0
8805EF83 ABC688AB C188AAC6 8A055088 064589C7 0AC508C0 32E08622 74EDD10F .1Ut".Å2à.é.ú.E..]..ó¨.ë¨.ó¨.ý.. 0000C0
FE88ABAB ABABF788 025C3E88 C0330377 E9037400 008A3E80 FCF5FDE9 0379C3F7 %úy.Õ»%•.>¤..t.Õw.3â.>\..%¨¨¨¨.± 0000E0
E9818000 2DE1D1E0 D1D0747F F0E181D1 33064D88 08747FF0 25D08806 4488FCC3 ú•.D..ÀXÞ.tÙ.M.31.Àb.tÀiÀ1Å-...Õ 000100
D8D0E5D1 5D01CA80 03740181 E8500801 E6008674 FFE03D80 00058C70 C1037FE0 Å..èp¥...=Å.tÑÅ|1APÒ..t..ò.]|1ÀÅ 000120
E9FF24E9 8874E0FD 8320C583 93E80A75 ED0807D1 03D1D1D1 E2D10E75 1000C7F7 %ú..u.|ãi||Æ|■.Ùu.Š..é .»Åt.Ò$.Õ 000140
202DE1D1 E0019874 7FF02500 33064488 EF747FF0 E181D188 064D88FC F787F58C .%.%=.M..|.Àb.ty.D.3À%±.t.iÀiÀ- 000160
A092AD93 ADC932E8 8AAC5008 D1E6009B 74FFE03D 8000059B 70C1287F E0E98180 ..ÕÀ.+êp....=Å.t.Å||AP¯.ŭ2èU.U.U 000180
C6FCA447 46A5A5AB 10CC800F E480ADFD 00888F05 C683F788 509210CC 800FE480 .Õ..a..P.%.ó.¢|.»Ù.Õ..ö. ÈEFGÊ•ó 0001A0
ADA8D8D1 ADEDD1A8 008A2602 E801E888 ADF78800 888FFD1F 7400008A 3E800005 ...>u..t.»¢|..%Ù.Ò1Ò.&o. 1UÙiÀ Ù 0001C0
0033E857 0037E857 003BE857 003FE8D9 D1D8D1D8 D1EAD158 FCA8D8D1 ADA8D8D1 iÀ UiÀ •XiõiÀiÙi1Ò?.WÒ;.WÒ7.WÒ3. 0001E0

Dump of file SATURN:[PCCOMMON.DUMP.DLL]DACOPY.TMP;1 on 18-APR-1990 10:39:51.10
File ID (545,24,0)   End of file block 90 / Allocated 92

Virtual block number 71 (00000047), 512 (0200) bytes

DAD1D9D1 DBD1EFD1 08CA8003 7407C2F6 01CA8003 745F5859 D788C208 C108C308 .ù.ê.ò.■Y[ t..ò.-ó.t..ò.lýiÙi|iÖ 000000
75D2085C 73063BFF 33008836 88FF08E9 DAD1D9D1 DBD1EFD1 DAD1D9D1 DBD1EFD1 iýiÙi|iÖiýÎÙi|iòõ...6|.3.;øs\.Øu 000020
0674C008 00B4A150 F288E7F7 0474C008 0082A1F5 88ED3397 52F6F738 77F03804 .;Þw;%-R.3Ù.%Àý..àt.%Ò. PÀÇ..àt. 000040
95E81B5D D018CE18 DAF75A92 000283E8 03E7F708 74C00800 86A1EA13 F003E7F7 %Ò.Þ.õÀÑ..àt.%Ò.Ò.Ø..Z%Ò.o.1].Ò. 000060
1E1800B2 0E284FC3 ED730088 16130086 06130084 1E130082 0E034F13 73939192 ...s.O..ý...Ç...Ñ...|.sÙÙO•.ý... 000080
100C0F24 E4320644 8AC9E8F5 00821688 C2130086 1E130084 0E030086 06180084 Ç...Ñ...Ç...Ñ..ò..ý.%$è.D.2Ò$... 0000A0
CA88E888 E1F708E3 0088911A E30C88EB 88DB3300 80A3100C 0F240645 8A00AEA3 ÈÙ..E.$...È¯.3Ù.$..D....D.%Å.Ò.ò 0000C0
F70874D2 0815880E 74C00802 4488ED33 550A13C8 03E2F706 74020802 55880488 ...U..Øt.%ã.à.ÒU3Ù.D..àt....Øt.% 0000E0
33EA13D8 03E2F706 74D20802 55880074 C0080244 8850C108 58D5D10A 13C803E2 ã.à.Oi|X.èP.D..àt..U..Øt.%ã.Ä.õ3 000100
0815880F 74C00804 4488D1D1 EA130803 E2F70874 D2080455 880F74C0 08048BC9 è...àt..U..Øt.%ã.Å.õ||.D..àt.... 000120
0588CA13 E8030080 26F70874 C0080488 50C30858 000183EA 130803E2 F70974D2 Øt.%ã.Å.õ.|.X.ùP...àt.%Æ¯..Ò.ò.. 000140
E803E2F7 0874D208 0455880F 74C00802 4488D833 CA13E803 00AE26F7 0874C008 .àt.%&Ù..Ò.ò3Ù.D..àt..U..Øt.%ã.Ò 000160
4588ED33 55000383 CA13E803 E2F70974 D2080255 881074C0 08044488 D301CA13 .òiÆ.D..àt..U..Øt.%ã.Ò.ò.Æ.U3Ù.E 000180
08044488 DA13C803 008026F7 0874C008 024488DA 13C80300 AE26F708 74C00802 ..àt.%&Ù..à.Ö.D..àt.%Æ¯..à.Ö.D.. 0001A0
04458BEA 13080300 8026F704 4488D5D1 DA13C803 E2F70874 D2080455 881A74C0 àt..U..Øt.%ã.à.Òi|.D.%Æ¯..Å.õ.E. 0001C0
D1D7D1D3 D1D1D1E2 D15A97C5 03008026 F600AEA0 EA130803 00AE26F7 0874C008 .àt.%&Ù..Å.õ.Ù.-&¯..é.Ziãiii Æi■i 0001E0

Dump of file SATURN:[PCCOMMON.DUMP.DLL]DACOPY.TMP;1 on 18-APR-1990 10:39:51.10
File ID (545,24,0)   End of file block 90 / Allocated 92

Virtual block number 72 (00000048), 512 (0200) bytes

0874F608 00883688 00008A06 C6C3F608 5ED7D1D3 D1D1D1E2 D1D7D1D3 D1D1D1E2 ãiiiÆi■iãiiiÆi■^.-ûó.¤...6E..-t. 000000
C9330833 57555352 5150008D 025C06C7 025C36FF 4C74ED08 5077F538 04C0EE81 .Ýá.;%wP.ÙtL.6\.ú.\.§.PQRSUW3U3è 000020
5A5B5D5F FBD1E8FF 33575553 52515000 C5025C06 C758595A 5B505FFC 3EE8D233 3ÒÒ>■_]{ZYXú.\.é.PQRSUW3.Òi«_]{Z 000040
025C06C7 025C36FF 008A..2FF 33ED33D8 330233C9 33C033FC 1AE9025C 068F5859 YX..\.Ò.•3ã3è3Ø3U3U3.Àu..6\.Ù.\. 000060
5EC45657 04EC83EC 8855C6E8 ABABABAB C03300BD BFF8F8E8 57555352 515..0C5 é.PQRSUWÒ%««§.3ã¨¨¨¨¨$6U.$.$.WVé^ 000080
078A2606 5E8807E8 00200598 078A2606 5E880C74 01026387 F6D88898 078A2.06 .&....Å-.c..t..^.&.... .Š..^.&.. 0000A0
26065EC4 08468C06 7E89F275 04026387 F6088898 058A2647 F8881674 006530.:B .=e.t..«G&....Å-.c..u·.-..F.á^.& 0000C0
0A0646FF F7880788 26C688F8 8898078A 26065E88 2E07C626 0646FFF0 8898078A ....Þ.F.&ó...^.&....%.6&...%.F.. 0000E0
07742E30 80269008 E8067EC4 565706EC 83EC8855 C85DE588 5F5EFC7E 89E975C0 àuÒ.-•^_.|]ÙW.$.š.WVá~.Š..&.=.t. 000100
8026900E E8067E88 6774003F 80260646 FFDF8808 468C067E 89F37500 3D802647 G&.=.ui.-..F..Ò.F.&.?.tg.-.Š..&. 000120
4689064E FFC28CC7 8808468C 067E89ED 75003D80 26470774 45308026 00746530 =et.&.=Et.G&.=.uÙ.-..F..ù.ò.N..F 000140
FF03752E 3F80260F 8808468C 067E89F9 74303080 264F9002 E8067E88 FE5689FC •.V±.-.Š..O&.=0t•.-..F..Ò&.?.u.. 000160
5EFA5E8E FE5E8CFC 7689F275 C00A0788 26AC065E C40646FF FC76C5FA 5E8C064E N..^•ève•.F.á^.¯&...àu·.ve.^±.^•^ 000180
7214F105 149A14CD 00749A06 5EC414C8 00949A0A BE1E8DEC 885590CB 50E5885F _.|]ù.U.š../....à.á^..t.ë....Þ.r 0001A0
849A0C76 FF0E76FF 24740006 7E835657 08EC83EC 8855CB5D C028CB5D 00018805 ¯¡..]ù•à]ÙW.$.$.WV.-..t$.v..v..Ç 0001C0
FF0E76FF 90CB5DE5 885F5E1F A5A5A5A5 DA8E1EF0 88F88808 5EC404C4 8315151B ....á.á^..«.Þ..ÒEEEE.^_.|]ù..v.. 0001E0
```

```
Dump of file SATURN:[PCCOMMON.DUMP.DLL]DACOPY.TMP;1 on 18-APR-1990 10:39:51.10
File ID (545,24,0)   End of file block 90 / Allocated 92

Virtual block number 73 (00000049), 512 (0200) bytes

 3700949A F85E8D1F A5A5A5A5 DA8E1E07 16F08BF8 7E8004C4 83152F18 849A0C76 v..Ç./..ó..-½.Þ....ÕEE:£..^½...7 000000
 A1477400 00043E80 56570AEC 83EC8855 90CB5DE5 885F5E15 AB01E79A 085EC415 .ó^..Ö. .^ .[]ù.U.$.$.WV.>å..tGÀ 000020
 880A4603 C02B02E8 0001B805 752D3F83 26F85EC4 FA5689F8 46890C20 16880C1E .... ..F½.V*ó^½&.?-u.|..$.+à.F.. 000040
 5DE80EFC 76FFFE76 FF50C028 9003E800 01B8067E 000E7E83 FE5689FC 46890C56 V..F•.V±.-..-.|..$..+àP.v±.v•.Ö] 000060
 08C48315 E910FA9A 37FF2602 77FF2604 77FF2606 77FF2606 5EC458EB 06C48304 ..ó.$Xó^.&.w.&.w.&.w.&.7.*.Ö..ó. 000080
 26F88BF8 5EC4C02B 02E80001 88057E00 0E7E8350 400E4688 5052FA56 89F84689 .F½.V*RP.F.@P.-..-.|..$.+àó^½.½& 0000A0
 46880AC4 8316431C 0A9A5052 0C56880A 4603C703 C02B02E8 0001B805 752D3F83 .?-u.|..$.+à.ú.F..V.RP...C..ó..F 0000C0
 0E7E832D 07C626FC 46FFFC5E C40A752D 3F8326F8 5EC4FE56 89FC4689 0C56880A ..V..F•.V±ó^½&.?-u.ó^•.F=&ó.-.-. 0000E0
 00043E80 501E00CE 882E07C6 26FC5E88 FC46FF07 88260147 8A26FC5E C4147E00 .-.ó^•&.G.&...F•.^•&ó..¡ò..P.>å. 000100
 7E83FE56 89FC4689 08C48317 7D18669A 5052FE56 88FC4603 0E460308 F7C01801 ..åXÀ.F..F•.V±RP.f.)..ó..F•.V±.- 000120
 8826F85E C45E7430 3F802606 5FC426F8 5EC4FC46 FF4507C6 26FC5EC4 07740010 ..t.ó^=&ó.E.F=ó^½&ó_.&.?0t^ó^½&. 000140
 8999C688 157C64FE 83FC46FF 2D07C626 FC5EC4F0 88D8F708 7DF608F0 88480247 G.H.Þ.-).¥À.Þó^=&ó.-.F•.±d|..ó.¿ 000160
 F7000A89 99C68815 7C0AFE83 FC46FFF2 88F9F799 C6880700 26FC5EC4 F9F70064 d.¥*ó^•&...ó.¥*.·.F•.±.|..ó.¿..¥ 000180
 5E0C5688 0A468807 0026C688 FC5EC4FC 46FFF288 F9F799C6 88070026 FC5EC4F9 *ó^•&...ó.¥*.·.F•ó^•.ó&...F..V.^ 0001A0
 0876FF0A 76FF0C76 FF0E76FF 1076FF01 000406C6 04EC83EC 885590C8 50E5885F _.[]ù.U.$.$.ó.å...v..v..v..v..v. 0001C0
 00F246C6 12EC83EC 8855CB50 E5880000 D406C6FE 5689FC46 89FE49E8 0E0676FF ¯v..Ö|±.F•.V±ó.å...[]ùW.$.$.óF·. 0001E0

Dump of file SATURN:[PCCOMMON.DUMP.DLL]DACOPY.TMP;1 on 18-APR-1990 10:39:51.10
File ID (545,24,0)   End of file block 90 / Allocated 92

Virtual block number 74 (0000004A), 512 (0200) bytes

 0001B805 752D3F83 26F45EC4 F65689F4 46890C20 16880C1E A1517400 00043E80 .>å..tQÀ.... ..F¶.V-ó^¶&.?-u.|.. 000000
 89000606 03FC4688 6A750E46 390006A1 FE5689FC 46890C56 880A4603 C02B02E8 $.+à.F..V..F•.V±À•.9F.uj.F•..•.. 000020
 260677FF 26065EC4 4AEB0007 C626EE5E 8B3007C6 26EE46FF EE5EC4F0 5689EE46 F¥.VÞó^¥.F¥&ó.0.^¥&ó..$Jó^.&.w.& 000040
 47882 6F4 5EC45052 F65689F4 468908C4 8317AD1D FA9A37FF 260277FF 260477FF .w.&.w.&.7.*.Ù..ó..F¶.V-RPó^¶&.G 000060
 83065D1C 0A9A5052 0C56880A 4603C02B 02E80001 8805752D 3F832650 0E460302 ..F.P&.7-u.|..$.+à.F..V.RP...].. 000080
 07C626FC 46FFFC5E C40A752D 3F8326F4 5EC4FE56 89FC4689 0C56880A 46880AC4 ó..F..V..F•.V±ó^¶&.?-u.ó^•.F•&ó. 0000A0
 FFFC5EC4 06C48302 05E80EFC 76FFFE76 FF500001 881D7F00 027F8326 F45EC42D -ó^¶&......|..P.v±.v•.Ò...ó.ó^•. 0000C0
 FFFE76FF 500001B8 687E000E 7E83FC46 0102478B 26F45EC4 0AEB3007 C626FC46 F•&ó.0$.ó^¶&.G..F•.-..-h|..P.v±. 0000E0
 D43E8043 7D00027F 8326F45E C42E07C6 26FC46FF FC5EC406 C48301D8 E80EFC76 v•.ÒÀ..ó.ó^•.F•&ó..ó^¶&....)C.>å 000100
 76FF500E 46890E46 88037E0E 463BD8F7 02478826 0EE8D8F7 02478826 08740000 ..t.&.G.¥À$.&.G.¥À;F.-..F..F.P.v 000120
 08C48318 C41D989A FC76FFFE 76FF5000 30880E76 FF06C483 0196E80E FC76FFFE ±.v•.Ò...ó..v.¡0.P.v±.v•...ó..ó. 000140
 76FF0A76 FF0C76FF 0E76FF01 000406C6 04EC83EC 8855CB5D E5880C56 880A4688 .F..V..[]ùW.$.$.ó.å...v..v..v..v 000160
 C45606EC 83EC8855 90CB5DE5 88000004 06C6FE56 89FC4689 FE6EE80E 0676FF08 ..v..Òn±.F•.V±ó.å...[]ù.U.$.$.Vó 000180
 0C201689 0C1EA308 C4831900 1DFA9A37 FF260277 FF260477 FF260677 FF26065E ^.&.w.&.w.&.w.&.7.*....ó.Ê.... . 0001A0
 0C56880A 4603C02B 9003E800 01B80675 2D3F8326 0006A348 02478826 0C1E1EC4 ó...&.G.HÊ•.&.?-u.|..$..+à.F..V. 0001C0
 36394E02 7788260C 1E1EC40A C4831A00 1C0A9A50 520E76FF 5306FE56 89FC4689 .F•.V±.S.v.RP......ó.ó...&.w.N96 0001E0

Dump of file SATURN:[PCCOMMON.DUMP.DLL]DACOPY.TMP;1 on 18-APR-1990 10:39:51.10
File ID (545,24,0)   End of file block 90 / Allocated 92

Virtual block number 75 (0000004B), 512 (0200) bytes

 1076FF1F 7F0E4639 C688077C FCFE8300 D6368900 D8A2C02A 02E80180 047D0006 •.).¯.$.*àÀÀ..6•..±•|..69F....v. 000000
 00083E80 90CB5DE5 885E0CC4 83FD93E8 0E0676FF 0876FF0A 76FF0C76 FF0E76FF .v..v..v..v..v..Ò.».å.^.[]ù..>À. 000020
 FE47C626 FC5EC4FA 5E8EFE5E 8CFC7689 F97500FF 7C8046FC 76C5FA5E 8C1E7400 .t..^*évef.|..u*.v•.^±.^*ó^•&óG± 000040
 83EC8855 CB50E588 5E0AC483 FEF6E80E 0676FF08 76FF0A76 FF0C76FF 0E76FF00 ..v..v..v..v..v..Ò-±.ó.^.[]ùW.$. 000060
 8FE80E06 76FF0876 FF0A76FF 0C76FF10 76FF1276 FF197545 0E7E8306 74650E7E -.et..-.Eu..v..v..v..v..v..v..Ò. 000080
 0AC483FD 39E80E06 76FF0876 FF0A76FF 0C76FF10 76FF1875 660E7E83 9035EBFB «$S..-.fu..v..v..v..v..v..Ò9».ó. 0000A0
 885590C8 500CC483 FEC0E80E 0676FF08 76FF0A76 FF0C76FF 1076FF12 76FFC850 ]ù.v..v..v..v..v..v..Òà±.ó.]ù.U. 0000C0
 0A468806 76FF0876 FF504004 C4831A18 189C9A06 76FF0876 FF297400 0A7E83EC $.-..t).v..v.......ó.@P.v..v..F. 0000E0
 FB83D83E 1EEC8855 4590D88C C888C85D 0AC48314 C01CCE9A 50520856 88064603 .F..V.RP.ö.á..á.]ù.à.À.EU.$..À.« 000100
 A1C84D5D 1FE58802 ED83F800 0C168900 DA0E8908 E800EC02 5C06C708 74127703 .w.t.ú.\.$.$...Ö...Ê.½.Ù..Í.]MúÀ 000120
 C3000EBE D98EA5A5 FCD88EC1 8ED98CC0 8C000EBF F388C8F3 F60CB300 EC2D025C \.-$.*.-µù.µ¢B..à.].è.À•EE.]/B.ù 000140
 45C6FC7D 89FC7588 C3000EBE D98EA5A5 A5A5FCD8 8EC18ED9 8CC08C00 DE8FF388 .µ¢B..à.].ê.À•EEEE.]/B.ù.u•.)•6E 000160
 D1FAD1D8 D1D9D1FA D1058925 747F80C2 F7025488 0C88C033 FCFC7588 03E807FE ±.$..u••3ó...T.¥ò..t¥..]*]]ÀÍ*] 000180
 89024589 0589C306 55893800 C2818FE6 80044D89 02458908 D1D901FA D1D8D1D9 ]ÎÀÍ*Í]ÍÀ.E..M..Í..ó.B.U.ù...E.. 0001A0
 00FF8802 5E1EFF04 74000260 3E83186B 18309A50 00FCB8EC 8855C306 45890445 E..E.ùU.$¡•.P.0.k..>'..t...^.|.. 0001C0
 8E065688 C08ED88E FFFF8857 56EC8855 0378E900 0288C85D E5881AE0 18309A50 P.0.À..[]ù|..Òx.U.$VW|...À.à.V./ 0001E0
```

```
Dump of file SATURN:[PCCOMMON.DUMP.DLL]DACOPY.TMP;1 on 18-APR-1990 10:39:51.10
File ID (545,24,0)   End of file block 90 / Allocated 92

Virtual block number 76 (0000004C), 512 (0200) bytes

 0002CA5D E5885E5F 96E8E8F7 88AEF2FF FFB9C033 970C7496 401074C2 38AD0ACE ö.Ù;ót.a.t..3á¿...Û.%$$._^.I]ò.. 000000
 C48B5049 D1F7AEF2 FFFFB9C0 33FA8892 1F74C008 1AF41800 9A0676FF 57EC8855 U.$W.v....¶..át...*3á¿..¯Ú%IIP.á 000020
 76C51EDE 88D788EC 88550002 CA5DE588 5F580000 FFFF9A50 1651521E 530002B8 £..S.RQ.P.....[_.I]ò..U.$.■.8.év 000040
 13A5F3E9 0149A402 7401A8C7 88067EC4 D1F7AEF2 FFFFB9C0 33C08ED8 8CFE880A ..±.Á.à3á¿..Ú%Ìá-..ú´.t.Ê|ÌÕµÉ. 000060
 8B914901 F7AEF2FF FFB9C033 067EC4D7 88EC8855 CB5DC28C 1FFA8BF3 88A4F3C9 èµÊ.µ.*..õ]ùU.$.■á~.3á¿..Ú%II.. 000080
 7E89F275 08026387 F6D88898 058A2647 9002E806 7EC45657 000000C8 00CB5DFA *]ù.à...WVá-.Š..G&....Á-.c..u´.- 0000A0
 050AC483 183A2000 9A570876 FF5004C4 831BEA18 9C9A5706 006A006A 08468C06 ..F.j.j..W...õ..á.P.v.W.. :..á.. 0000C0
 56570000 0AC8CBC9 5F5EDA8C 0C22881F A5A5A5A5 DA8E1E07 1EF0880C 228F0008 ..¢"..Þ....OÉÉÉÉ.¡"..Ö^_èÚà...WV 0000E0
 F85EC4FE 5689FC46 89085788 26064788 260C5EC4 FA5689F8 46890856 88064688 .F..V..F%.V*á^.&.G.&.W.¯F•.V±á^% 000100
 FF097400 3F8026FC 5EC4F876 C5F65E8C 0A4E882E 7E000A7E 833007C6 26F846FF .F%&6.0.~..~..N..^-év%á^•&.?.t.. 000120
 C626F85E C40A4E89 F65E8EFA 5E8CF876 89E7E246 04883080 9003E807 8A26FC46 F•&..Š..¯0..Fãõ.v%.^*.^-.N.á^%&ó 000140
 264F3005 C6269006 E8F87EC4 F84EFF1F 7C353F80 26FC5EC4 287C000A 7E830007 ...-..|(á^•&.?5|..N%á-½Š..&ó.00& 000160
 0247FF26 0C5EC409 75313F80 26065EC4 07FE260F 88FA468C F87E89F5 74393080 .=9t%.-½.F*.Ô&±.á^.&.?1u.á^.&.G. 000180
 88550000 90CBC95F 5E08C483 18DD1866 9A0676FF 52505240 08568806 46881 5E8 $..F..V.aRPR.v..f.i..á.^_èú...U. 0001A0
 0E4E881C C21FC89A 5706561E 067EC40A 76C55657 1E0085E9 0375C908 0E4E88EC $.N..èu.Õç..WVév.á-..V.W¯à.ò..N. 0001C0
 1D0305C0 8C0773F9 03D88EFF FF05D88C 0773F103 49507300 DA83C128 57780208 .@xW+è.Ö.sPI.þs..Á....Á.*s..â... 0001E0

Dump of file SATURN:[PCCOMMON.DUMP.DLL]DACOPY.TMP;1 on 18-APR-1990 10:39:51.10
File ID (545,24,0)   End of file block 90 / Allocated 92

Virtual block number 77 (0000004D), 512 (0200) bytes

 E391FCA4 F3FDC128 9140C603 C323D818 C628C703 C323D818 C72848C1 8841C08E .áA.èH+ú.U#ù.ú+ó.U#ù.óa.+è»µÊ•.D 000000
 D78848C1 88C8E8C0 8E1D392D C08CD175 FFFF83D8 8E1D0E2D D88C0775 FFFE835C \.±.u..Á·...Á...ui.á·9..áŠà.éH.■ 000020
 C913A5F3 E9D1C128 9140C203 C323D818 C22BD2F7 0688C203 C323D818 C22BD2F7 %@+ó.U#ù.ó.ø%@+ó.U#ù.óa.+èÌÕµÊ.è 000040
 1F5F5E8E E8C08E1D 7C05C08C C775FF08 D88E1045 05D88C07 75F60818 E391A4F3 µÊ.D..-u..Á.E..Á..uú.à.|..àŠ/^ . 000060
 D323D818 D12B0C74 DAF7D788 067EC457 38E30C4E 88EC8855 C8500856 88064688 .F..V.]ùU.$.N.D8Wá-..■%Ôt.+1.U#& 000080
 D1C38E1D 87C381C3 8C10E3D1 87AAF3C9 13A8F3E9 D1E08A0A 46880128 D187D103 .I.i+1.F..ÅìÕµ¨.èµ´.ìD..û.û...ûi 0000A0
 521E5100 02890C88 53015780 E42A078A C8500856 88064688 5FAAF3C9 13A8F3E9 Õµ¨.èµ´_.F..V.]ù..*ô.W.S.É¿..Q.R 0000C0
 A536A536 A536036E [ 067680 C08ED88C FC5756EC 8855C858 0000185A 9A531650 P.S.Z..¯(ùU.$VW•.Á.à.v.¢n.6É6É6É 0000E0
 0255891D 89FF3203 ¿.3FAA91 A4F39198 ACC88803 768F5D02 D9E85503 6E8EA536 6É/n.UÒ\.]¢v..à¯..µÉ.´¢d.2....U. 000100
 FF9A5016 C48850EC 885500C8 5DE5885E 5FC788DA 8C085D8C 03760645 C7044D89 .M.úE.v..]..Ö.ú_^.Ì]ù.U.$P.á.P.. 000120
 E821F29A 006CE800 21E80000 FFFF9A03 8A681E03 8C681E07 80A3E086 580000FF ...X.ÅE¯..h...h¯......Òl.Òl...I$ 000140
 FF330000 881E0392 16FF00FF 681E7C18 309A1E6F 1AD69A50 C850E588 0001881C .¡...I]ùP.■.o..0.|.h.......£..3. 000160
 74CA88A6 F3C888D1 8807968E 3174003D 80264701 75003D80 267FFF89 038C068E ....¿..&.=.u.G&.=.t1/...Ì.ùµÌ.òt 000180
 0572412C AC9204E0 C00E7241 2CAC0787 8F1FF788 071E061C E8E774AE F2C03308 .3á´ÙtÒŠ.....¥.¢ñ.¯,Ar.àÅ..¯,Ar. 0001A0
 0000FFFF 9A521650 1653C488 50870787 A7800488 520002B8 00C31FED E8AAC20A .ò´ŠU.û.É..R.à.Ìñ.ñP.áS.P.R..... 0001C0
 E30AAC0E 885AD479 4807878F 08088106 7500023D 07740001 30408112 7558C008 .àXu.Ya=..t.=..u.Ý...ñ.KyàZ..¯.D 0001E0

Dump of file SATURN:[PCCOMMON.DUMP.DLL]DACOPY.TMP;1 on 18-APR-1990 10:39:51.10
File ID (545,24,0)   End of file block 90 / Allocated 92

Virtual block number 78 (0000004E), 512 (0200) bytes

 8E0AAA1E FF00038B C28C0A82 06C4F808 E903730A AA1EFFD8 33C28C0A AE06C41E .Á.Û..ó3U..¯.s.ÕÁ«á.ý..òÉ....¯./ 000000
 9A1F5568 0E016A08 74^AB63D 0AB68800 73E80AA8 BF0AA4BE 007CE80A B68F0A86 Ñ.¢Ñ.Ò|./É.¢´.Ôs.¡Ñ.=Ñ.t.j..hU.. 000020
 88550000 1F509A00 6A006A03 6A0051E8 0AB68F0A B68ED88E 1B0688C3 0000FFFF ....ú¡...Á/Ñ.¢Ñ.ÒQ.j.j.j..P...U. 000040
 23E80A86 8F0A868E ECE95503 E80031E8 0AB68F0A B68E003A E80C2A8F 0C2A8EEC $/*.¢*.Ò:./Ñ.¢Ñ.Ò1.Š.U.$/Ñ.¢Ñ.Ò# 000060
 FF0002B8 07E30AAC 0E880000 FFFF9A50 06468A50 C033001A E80A868F 0A868E00 ./Ñ.¢Ñ.Ò..3àP.F.P.......¯.D.E... 000080
 56880646 88EC8855 00C3EEE8 1DFFF274 02450805 8804EF83 0E73F738 C30AAA1E .¯.ú;%s..ÿ....E.t·..$Yú.U.Š.F..V 0000A0
 0E56880B 33575 6EC 88550008 CA5DE588 03180A46 28E8D3EA D3FFFF89 0C5E8808 ..^.¿..Æõ&$+F..Æ.I]ò..U.$VW3U.V. 0000C0
 EC8855C8 5DE5885E 5F0D8940 C9800573 0A7638000 0A5D06C6 0028E801 0A5D06C6 6.]..Ò(.6.]..;v.s..èa.._^.I]ùU.$ 0000E0
 33408106 7664F983 0A4E88C0 8ED88CFC C85DE588 5E5F0006 E80E5E88 D2335756 VW30.^.Ò..¯^.Ì]ù=.Á.â.N¯..*dv.Ya3 000100
 5509D08F 064E010C 46880676 8909DA8E 0A4E88D8 8EA4F309 DA8F0676 C527E8F6 -$'év.¢Ö.µÉ.Á.N./Ö..v..F..N.¢Á.U 000120
 8A5653C3 DA8CC788 065D8904 45890275 89008909 C88F0A76 0306762B 500456E8 òV.]+v..v.¢à....u..E..]..ú.ÒúSV. 000140
 382E0488 02E88302 EE830005 890AC383 0AC68316 75C43A80 80250947 8A2E0964 d...G.%..;áu..ó..ú.¿...Ÿ..Š....; 000160
 D1F4E2DF D1DD010A D1D8D1E8 D10005B9 FF33AD93 AD92AD95 AD56C358 5EF3E107 .Åµ^(ùVÙ.Ù.Ù.Ù3.¿...ìÒìÙìÒìììÒà¶ì 000180
 FFFFFC66 C3084489 065C8904 5489026C 893C895E 03FE2D08 D1F50001 300001E3 DiÅ=..%iÙ-±.^.<.l..T..\..D.ùf•.. 0001A0
 58400088 C0333001 44C60104 C60A4A8E FFFDCCCC CCCCCCCC CCC00000 FFFFFFFF ......èaaaaaaa».fJ.ó..ó0.03à.Àa[ 0001C0
 747FF0C1 F720837F 07648006 4C885EA5 F3000489 570A3E8F FCC08ED8 8C06C307 .ú..Á.ä•¢>.W¿..µÉ^.L..d .* ¥éÞ.t 0001E0
```

```
Dump of file SATURN:[PCCOMMON.DUMP.DLL]DACOPY.TMP;1 on 18-APR-1990 10:39:51.10
File ID (545,24,0)   End of file block 90 / Allocated 92

Virtual block number 79 (0000004F), 512 (0200) bytes

4D10BAC8 883FFE05 ADF88ABB 7480ABAC 0A458EFF 33FF7BE8 5320B302 79C90B06 ..èy.*-SÒ(.3./E.¯¯.tE.%U.±?.àα.M 000000
3EBEDFF7 571343DF 8112F4E9 81FA13C8 03E7F69A B00713C8 03E4F64D 8091E2F7 %ã. M-Ò.à.■¯.-Ò.à.*.Ò¶..ÒC.W¼Ò/> 000020
AD93AD92 AD95AD97 AD575F06 15E82006 88574709 725FFF13 E820CC88 078CE80A .Ò..£■ Ò.. r.GWE■ Ò.. WÜ.Ü.Ü.Ü.Ü 000040
D113E913 039AD681 56C480F4 E2DCD00E D1D0D1DA D1EBD10C E3C033F7 8BD9F791 .¼1.¼3àÐ.ÌŠiÒiìiBÄÉã¶.áV.■...Ò.ì 000060
D6D1E4D0 D00030' 02D1D501 D6D1E4D0 50565552 5351C032 0010B90A 4BBFD913 .1«K.¿..2àQSRUVPÀÒl■ììì■1ÆÀÄÀÒi■ 000080
D1D5D1D6 D1E4D000 14091359 D11359E9 1359F113 59E50259 D0D003D1 D201D501 ììì■1ÆÀÄY.ÌY.þY.ÒY.ìY.)..ÀÒl■ììì 0000A0
585A0001 880C880A 4ABE12C1 83FCAEF3 FD308049 4FBDE259 AA3004D0 D0030102 ■1ÆÀÄ.O¯Yã§Ol¯O»µÜ■.ê./J...¡..Z( 0000C0
5689F046 89C02803 8C168800 F0E90375 038C3639 FF28F628 56570000 14C8C307 .ûà...WV+-+.96..u.Òþ.....+à.FÞ.V 0000E0
461974C0 080AC483 22662422 9A079668 1EF676FF F876FF0C 6AF85689 F64689F2 ·.F-.V½j..V½.v~.h..."$f".á..ât.F 000100
8026F646 FFF65EC4 0CEB47EA 75003F80 26F646FF F65EC400 8CE90376 7FFFFE81 .±..v.Ò¥.á^-.F-&.?.uöG$.á^-.F-&. 000120
5689EC46 8904C483 227523CA 9A046A50 01458D8A 75003F80 26F65E88 F475003F ?.u¶.^-&.?.uω.E.Pj..ò#u".á..F§.V 000140
8B6674C2 0BFC468B 6D74EE46 0BEC468B FE5689FC 468902C4 8322A823 0F9A56EE ¥V..# ".á..F■.V±.F§.F¥tm.F■.òtf. 000160
0AC4831E 8124229A 0796681E F076FFF2 76FF0C6A 09BF1689 09BDA3EE 568BEC46 F§.VYÉ§...●.j..v·.vÞ.h..."$...á. 000180
8A26F046 FFF05EC4 04EC4683 02578926 078926FE 568BFC46 8BEC5EC4 2C74C00B .ât,á^§.F■.V±&..&.W..F§.á^Þ.FÞ&. 0001A0
26F05EC4 F475003F 8026F046 FFF05EC4 E8EB0E74 C00A0788 26FC46FF FC5EC407 .á^■.F■&...ât.$Òá^Þ.FÞ&.?.u¶á^Þ& 0001C0
55CB5DE5 8801FE4F 80260574 C30BC08C 065EC4EC 885590CB C95F5EA7 75003F80 .?.uÏ^_èü.U.$á^..à.ût.&.O±..ǀ]ùW 0001E0

Dump of file SATURN:[PCCOMMON.DUMP.DLL]DACOPY.TMP;1 on 18-APR-1990 10:39:51.10
File ID (545,24,0)   End of file block 90 / Allocated 92

Virtual block number 80 (00000050), 512 (0200) bytes

82E80A9A A3127400 25E80875 000A9A3E 831E73FF F1300646 88575602 EC83EC88 .š.š.VW.F.=þ.s..>...u.Ò%.t.È..Ò. 000000
F08BC85D E5885E5F 02C48322 2629169A 0676FF08 750078E8 05740018 E8157500 .u.Ò..t.Òx.u..v...)&".á._^.ǀ]ùEÞ 000020
432AC29A 50028051 0E4F8050 501EC033 FE5E89FE E3834306 5E880776 065E3900 .9^.v..^.C.D±.^±3à.PP.O.Ō¯.P.ô*C 000040
D88EFE5E 880008A3 DA8E0574 D2080A9E A30A9C16 87C28838 74FFFA83 08C48323 #.á..*.t8.ò....È...●t..ÒÈ...^±.Ä 000060
8C0006A3 00000500 0AA30147 800002A3 0000A300 0AB80C47 89484800 08A3C033 3àÈ..HH.G.¡..È..È...G.È.....È... 000080
6A560000 0AC8C3D9 8EC18CD2 08059CE8 0A9E1E8E DB33064E 88C08ED8 8CC31FD8 Ä.Û.Ä.â.N.3Ù....Ò...●.ê.1ûà...Vj 0000A0
902FEB99 C0280674 FFFFC2F7 FA5689F8 468923F7 28789A06 76FF006A 0876FF00 ..v.j..v..x+¼#.F½.V*¼ò..t.+â.$/. 0000C0
1D989A50 FE76FF00 6A561274 D00BFE56 89FC4689 02C48324 10230F9A 56F8768B .v½V..#.$.á..F■.V±.Åt.Vj..v±P... 0000E0
C4D98B27 E30E4E88 1E5657EC 885590C8 C95EFE56 88FC4688 9007E808 C483236F o#.á.$...F■.V±^èù.U.$WV..N.D'.1á 000100
04740477 FF453A26 C933FF44 8AA6F30A 76C5FE88 C803D9F7 AEF2C033 F788067E ~..¼3à·Ü¼1.ù.±év.µÏ.D.3è&:E.w.t. 000120
E90B3301 85E8EF88 FF33078B 40C98030 C98058C8 5DE5885F 5E1FC188 D1F74949 ǀǀ¼1.é.^ .ǀ]ùX.èO.èə.■3..ÿÒ..3ÙÖ 000140
88EA88F8 880A6A26 F7C78850 E0720205 E8F888E1 72020CE8 DB330A6A 1E8900AC ¯...j.3ÙÖ..rÄ.½Ò..rÀP.ú¼&j..½.ō. 000160
CE030A60 3E89FC85 E8087300 D383F803 588E72D8 88C503C4 75D2080A 6A2EF7C3 ú¼.j..●uá.é.Ar/X.½.Æ.sAŠç■.>'..ö 000180
0880CD80 037501AD E8910A68 A30A64A3 0A66A3C0 330A6E16 890A6CA3 0A620E89 ..b.Él...n.3àÈf.Èd.Èh..ÒÜ.u..ë.. 0001A0
7428C31 74000A5D 3E801274 453C1C74 443C4E41 7401FDE8 DB3300E7 E89F75D8 Ùu.ÒÒ.3ÙÒ».tAN<Dt.<Et..>]..t1<+t 0001C0
0088E850 9F016CE8 4600000A 6C06C70E C98003E8 0402C981 4E277502 742D3C06 .<·t.u'N.è..Š..è.ú.l...FÒl..PÒ.. 0001E0

Dump of file SATURN:[PCCOMMON.DUMP.DLL]DACOPY.TMP;1 on 18-APR-1990 10:39:51.10
File ID (545,24,0)   End of file block 90 / Allocated 92

Virtual block number 81 (00000051), 512 (0200) bytes

0330C980 03741872 C1F70675 FF080A6C 3E88DBF7 02759E58 40C98003 7502C5F6 -é.u..èəX.u.¼Ù.>l...u.¼ér.t..èO. 000000
0A603E88 0394E80A 748E5156 507F0190 FF810A6E 3E280475 10C5F60A 683E03FB «.>h.-é.u.+»n......PVQ/t.Ò...>'. 000020
000383F5 08F7D3F7 137480C5 F60A721E 880A70A1 38755E59 01ACE800 0A7E06C6 ó.-..Ò¯.Y^u8Àp...r.-é.t.¼Æ¼À¼.Æ. 000040
0375000A 663E830A 7F2E8A08 C9800376 070A663E 8380074D 8004747F F00645F7 ¼E.Þ.t..M...>f..v..è...-..>f..u. 000060
E30102CD 80ED770C ' F88117 7200E4E8 0A0A6A06 C63FFF88 C301C980 C302CD80 .ë.ú.è.úE.?ó.j..ÒÒ.r..«á.wÜ.ë.1D 000080
0358008A E8502872 0006E807 88DF88EF 88FF33C3 DFE8DE78 D803E3D1 E301C303 .ú1D1D.ÀxBŠÒú3..ÿ.Ò.■Ò■ r(PÒ..X. 0000A0
0A6806FF 01CA8003 74C00A0D 720088E8 E5721999 FF810007 83000583 00038300 Å.Æ..ǀ..■.....rǀÒE.r..àt .Ò...h. 0000C0
0575D208 09758000 F8810F74 80C5F617 7480C7F6 16750A68 0608C508 C788EEE8 $Ÿ.ú.é..h.u.-ú.t.-é.t..«..ι..●u. 0000E0
09731999 FF811C74 C208C308 C508C788 0A721E89 0A701689 20C98010 C98006E8 Š..è..è ..p...r..ú.é.ú.öt.....s. 000100
AB93AB92 0A748FF7 8856F6E8 002AE848 0678FF08 004088F1 E80A680E FF0025E8 Ò%...h.$þ¡ə...x.HÒ*.$-V.¼¢t..¨.¨ 000120
E2D1F813 58E81358 D81358D0 03000BE8 000EE8C2 88535557 C35EAB92 AB96AB95 .¨.¨.¨^úWUS.óÒ..Ò...ÀX.ÀX.ÒX.½ìã 000140
4572302C 4A74004E E8C34E46 0175283C 06742D3C 0874005E E8C3D7D1 05D10301 ǀÆììǀ■úÒ^.t.<-t.<+u.FNúÒN.tJ,OrE 000160
F6267709 3C2A7230 2C20742E 3C337400 37E810E8 397D0A6A 063A072C 027E093C <.-.,.:.j.)9$.Ò7.t3<.t ,Or*<.w&- 000180
0A6406FF 097510C5 F6F4EB20 CD80C3E4 320A6606 FF08CD80 0A680EFF 0E7410C5 é.t...h..ë...f.2ðú.ë $¶-é.u...d. 0001A0
0A3CEA74 093CEE74 203C1074 000A5C3E 80AC2373 0A62363B C3F94EC9 E810CD80 .ë.$èN*ú;6b.s#¯.>\..t.< tŸ<.tõ<. 0001C0
C508F888 AD95AD91 AD92AD57 C3C032C3 5F240277 7A3C0672 613CE274 0D3CE674 tÏ<.tã<ar.<zw.$_ú2àÙWÜ.Ü.Ü.Ü.½.é 0001E0
```

```
Dump of file SATURN:[PCCOMMON.DUMP.DLL]DACOPY.TMP;1 on 18-APR-1990 10:39:51.10
File ID (545,24,0)   End of file block 90 / Allocated 92

Virtual block number 82 (00000052), 512 (0200) bytes

 D000D1D7 D1D5D1D1 D1E2D100 05BBDFD1 E8D1E7D1 3E7803FE 05AD4974 C20BC10B .ê.ôtlÙ.±.x>ìÒìÒìÒE..ìãìììììaìÀÀ 000000
 74FFF0A9 000780C6 13FE13EE 13CE13F5 8001FA81 F633D30A D92243F0 75CBFED7 a±ùuÞC"1.Æ3-.*..%.o.Ÿ.±.ó.a.`Þ.t 000020
 60890089 5FF7BBFL 88E888C8 88D888C0 33010A7E 0E800FEB 000780F5 7FF03D0E .=Þ.%.a.Ŝ...~..3ô.Á.à.Ò.%.%_...m 000040
 00078F08 44010847 882E48F3 C033FD88 0008B90A 8080C3FF 0A064589 04758902 ..u..E...ú§..¿...»3âµ¨..G..D̃.¢.. 000060
 83F728F1 0308C383 DF28D928 5653C88B 980404D8 F6C42AC4 2AE022C7 28000488 ¡..+ú"Å*á*á-A....àSV+1+Ô.ù..Þ+%. 000080
 C583585E E6E202C3 8302EE83 00045683 3E025611 3E004601 3E27F72E 0488( C6 ó....%'>.F.>.V.>.V...Ÿ..ù.ãl^[.é 0000A0
 F588AD93 AD91AD97 ADD10A92 ADCD0AC8 0BADC808 AD91ADF5 870EED83 8C754( 2 .Ou¥.Ù..%Ù.Ù.àÙ.à.eÙ..ìÙ.Ù.Ù.Ù.% 0000C0
 13F58001 FA81ED33 0508EF23 00018000 D1D3D1D1 D1D7D1E2 01084CFF 0078C008 .àx..L.ìãìaìììÆìÅ§..#ý.{3Ù.*..%. 0000E0
 00000000 C3064489 045C8902 4C893C89 C50BC001 086C0105 D1C513D0 13CD13FD ».e.Ÿ.éìf.l.ie.é.<.L..\..D.ù.... 000100
 20000000 0000000E 9C400000 00000000 0007C800 00000000 00000004 A0000000 ............à........ä........ 000120
 C2781F49 FFCFA6D5 006B9DC5 ADA82870 B59E0036 8E18C98F 04000000 001BBE8C ¥/......¢è..6..çp+´Ùé.k.{lù.l.xò 000140
 FFFDCCCC CCCCCCCC CCCD0353 AA7EE8F8 9DF90E8E 01AA938A 47C980E9 8CE00005 {.Å.Ò.èGu.`..8*.«Ŝ~´S.èaaaaaaa». 000160
 E15BFFE6 ABCC7711 8461CEFD FFF3D187 1758E219 652CFFFA A3070A3D 70A3D70A .æ£p=.æÊ*.,e.ãX.ñìµ.»oa..wà¨l.{Å 000180
 648CE4A1 FF2CA87F EA27A539 E9A5FF96 CF811EAD 4539948A FFCBE695 948EC44D Má/..lù.¤.9ÉÙ.Ÿu..ÉÒ9É'õ.¨,.À0¥d 0001A0
 830AE883 DFF72886 880579FF 08282C88 FCAEC031 4325637A 193AFE57 DDD0467C |FÀiW±:.zc%C1àÙ•É,(..y.É.(%Ò.$.. 0001C0
 4F800474 DB08065E 88EC8855 C3ECEB5B 5FFE7BE8 5753F573 EFD10D74 FF0B0AC3 u...t.ìys%SWÒ(±_[Ŝŝù.$.^..Ùt..O 0001E0
```

```
Dump of file SATURN:[PCCOMMON.DUMP.DLL]DACOPY.TMP;1 on 18-APR-1990 10:39:51.10
File ID (545,24,0)   End of file block 90 / Allocated 92

Virtual block number 83 (00000053), 512 (0200) bytes

 99C03305 750176E8 0005B807 1E297500 3F830A90 885756EC 6855CB5D E58801FE ±..{}ùU.$VWÉ...?.u)..¡..Òv.u.3á. 000000
 8C064E8B 0A963689 FFFEFE44 C704C683 000104C7 960A92A3 0A90A3FE 244024EB $$ä$±É..É...ù....ó.ùD±±..6...N.. 000020
 8BADFC02 778BF273 EEF983FE E180FA74 41000DE9 CB5DE5BB 5E5F0009 E8C08ED8 Å.àÒ.._^.l]ùÕÅ.At*.Ã±.'Ÿs·.w.•Ù. 000040
 8BE6EBFE 4489F78B 000205C2 03357401 A8ADF003 D0881573 C13B4843 7401A8FE ±´.tCH;ès..Å.ÞÙ´.t5.ó..  %.D±Ŝl. 000060
 26057401 381F5689 DA8CC68B FE4CFEF9 0305E805 8948C12B FE4C89F9 030C74FE ±t..*.L±+éH..Ŝ..*±L±.ó.Ò¿V.;ìt.& 000080
 3B48FE8B F27401A8 ADF003FE 882574FF FE30020A A206C626 C3027F89 0A9E1E8C .......ù&ó.Å..=±.t%.±.ÞÙ´.t´.±H; 0000A0
 8E0474C0 08084788 E6E8FE44 89F78800 0205C203 E27401A8 ADF00300 888C73C1 ès¥.Å.ÞÙ´.tã.ò....%.D±Ŝl.G..ât.. 0000C0
 33067788 8BEB3788 0A9A1E8E 260574C7 3829A98F D88C1274 0AA20EFE 2615EB08 ÀŜ.&±.Å.t..Å¢`);ùt.&.....7ŜÉ.w.3 0000E0
 8C98EB4E 4E960574 001DE8FE 4DFE0074 005FE898 40400124 0074C638 0068E8C0 àÒk.;ót.$.ää.Ò_.t.±M±Ò..t..NNŜ.. 000100
 49C82B03 7401A8FE 458851C3 99C03302 47890788 0A9EA326 0474C13B 29FDB908 Á¿»);èt.&É.....G.3á.ùQ.E±´.t.+àI 000120
 C628C223 D2F70072 C2031572 C603C18B F575EAD1 04760AA0 163B267F FFBA4141 AA¤..&;...v.ìõu%.é.ór..õr.%0#ò+ó 000140
 FE44C7F2 03F098FE 88571874 001DE851 52C359C0 33E575EA D1D2F708 75000CE8 Ò..u.%0ìõul3áŸùRQÒ..t.W.±.Þ.·ùD± 000160
 9A1F0650 0001B850 52521ED2 335053C3 5A5958FE 55894AD7 28068B06 7789FFFE ±..w..ø+øJ.U±XYZùSP30.RRP¡..P... 000180
 948F3875 000A7E83 065756EC 8855C302 0802745B 5A1FFFFA 8308C483 230C2AC2 ò*É#.á..*..Z[t..0ùU.ŜVW..~..u8¢. 0001A0
 89024488 0074F73B 11744807 9436884C E8277200 57E80775 48064688 08568803 ..V..F.Hu.ÒW.r'ŜL.6..Ht.;%t..D.. 0001C0
 52C48850 21E899FF FF880675 D2080473 0794FE81 04C68334 735E003E E8560E46 F.VÒ>.^s4.6..±..s..0u.¡...ŜIP.6R 0001E0
```

```
Dump of file SATURN:[PCCOMMON.DUMP.DLL]DACOPY.TMP;1 on 18-APR-1990 10:39:51.10
File ID (545,24,0)   End of file block 90 / Allocated 92

Virtual block number 84 (00000054), 512 (0200) bytes

 5E5F07C0 33D38807 94368902 5C891489 E675C085 F9580000 FFFF9A50 C0335016 .P3àP.....[*.àu]...\..6...Æ3à._^ 000000
 26721C03 DA882CEB F9F27507 94FE8104 C6830C74 024C39F7 880E4E8B CB50E588 .l}ù.N..%9L.t..ó..±...u·*$,.Ò..r& 000020
 8E168904 75F738DE 75C08500 00FFFF9A 51531373 038E1E39 0675F738 C18E0388 .Æ.è;%u.9...s.SQ......àuÅ;%u.... 000040
 50E588E3 F706468B 08750A5E 88D8080C 5E8B0846 88EC8855 00C3D18B 04879203 .....ìù.U.$.F..^..Ä.^.u..F.%D.ìl 000060
 A2010300 0C08CA5D E5880103 E3F70646 88C8030C 66F70646 88C888E3 F70008CA ò..%D.à.F.%f..à.F.%D.ì.l}ó.....Å 000080
 D5010500 0000082A 32000200 0000062A 82000200 0700011F 6A010300 0500011F .......j.......ÿ*......2*......{ 0000A0
 EC010300 2600012B 61010300 2200012B 16010300 8800011D C8010500 8700011F .......ù........+..#...a+..&...$ 0000C0
 00000002 3700071D F4020300 5C00011E 4F010300 5B00011E 62010300 4D00011E ...M...b...[...O...\...¶...7.... 0000E0
 6F43202D 20797261 7262694C 20656069 54206E75 5220534D 00000000 00000000 ........MS Run-Time Library - Co 000100
 70726F43 2074666F 736F7263 694D202C 38383931 20296328 20746867 69727970 pyright (c) 1988, Microsoft Corp 000120
 00E70AED 0E0A0AF5 005214B6 004E13A6 004A14DA 0046141C FFFF198C 00000011 ..........F.Ò.J.l.N.Ñ.R.%...Ù.Ò. 000140
 1AFA0078 1AFA0AA6 1AFA0000 0A990A46 10720CD8 10740CDD 10110C57 0DE50AE8 $.{.W...ì.t.Ù.r.F.....*.l.*.x.*. 000160
 E0F0F8FC FEFF0000 00007878 31364D05 01010000 00000084 1AFA0080 1AFA007C |.*...*..........M61xx.....±•½ÞÀ 000180
 00000000 00000000 00000000 00000000 00000000 00000000 00000000 000080C0 à............................... 0001A0
 00000000 00000000 00000000 00303030 28650000 00000000 00000000 00000000 ..............e+000............. 0001C0
 00000000 00000000 )000000 00000000 00000000 00000000 00000000 00000000 ................................ 0001E0
```

```
Dump of file SATURN:[PCCOMMON.DUMP.DLL]DACOPY.TMP;1 on 18-APR-1990 10:39:51.10
File ID (545,24,0)   End of file block 90 / Allocated 92

Virtual block number 85 (00000055), 512 (0200) bytes

00000000 00000000 00000000 00000000 00000000 00000000 00000000 00000000 ................................ 000000
00000000 00000000 00000000 00000000 00000000 00000000 00000000 00000000 ................................ 000020
00000000 00000000 00000000 00000000 00000000 00000000 00000000 00000000 ................................ 000040
00000000 00000000 00000000 00000000 00000000 00000000 00000000 00000000 ................................ 000060
00000000 00000000 00000000 00000000 00000000 00000000 00000000 00000000 ................................ 000080
00000000 00000000 00000000 00000000 00000000 00000000 00000000 00000000 ................................ 0000A0
00000000 00000000 00000000 00000000 00000000 00000000 00000000 00000000 ................................ 0000C0
00000000 00000000 00000000 00000000 00000000 00000000 00000000 00000000 ................................ 0000E0
00000000 00000000 00000000 00000000 00000000 00000000 00000000 00000000 ................................ 000100
00000000 00000000 00000000 00000000 00000000 00000000 00000000 00000000 ................................ 000120
000000EC 00000000 00000000 00000000 00000000 00000000 00000000 00000000 .............................&... 000140
20202020 20202020 20202020 20202028 28282828 20202020 20202020 20000000 ...        (((((                  000160
10101084 84848484 84848484 84101010 10101010 10101010 10101010 48202020    H............................ 000180
10100101 01010101 01010101 01010101 01010101 01018181 81818181 10101010 ................................ 0001A0
10100202 02020202 02020202 02020202 02020202 02028282 82828282 10101010 ...................... ......... 0001C0
00000000 00000000 00000000 00000000 00000000 00000000 00000000 00201010 .. .................... ....... 0001E0

Dump of file SATURN:[PCCOMMON.DUMP.DLL]DACOPY.TMP;1 on 18-APR-1990 10:39:51.10
File ID (545,24,0)   End of file block 90 / Allocated 92

Virtual block number 86 (00000056), 512 (0200) bytes

00000000 00000000 00000000 00000000 00000000 00000000 00000000 00000000 ................................ 000000
00000000 00000000 00000000 00000000 00000000 00000000 00000000 00000000 ................................ 000020
00000000 00000000 00000000 00000000 00000000 00000000 00000000 00000000 ................................ 000040
00000000 00000000 00000000 00000000 00000000 00000000 00000000 00000000 ................................ 000060
00000000 00000000 FFFF0C30 1F850C30 0C300000 00000000 00000000 00000000 .............0.0...0........... 000080
00000000 00000000 00000000 00000000 00000000 00000000 00000000 00000000 ................................ 0000A0
00000000 00000000 00000000 00000000 00000000 00000000 00000000 00000000 ................................ 0000C0
00000000 00000000 00000000 00000000 00000000 00000000 00000000 00000000 ................................ 0000E0
00000000 00000000 00000000 00000000 00000000 00000000 00000000 00000000 ................................ 000100
00000000 00000000 00000000 00000000 00000000 00000000 00000000 00000000 ................................ 000120
00000000 00000000 00000000 00000000 00000000 00000000 00000000 00000000 ................................ 000140
00000000 00000000 00000000 00000000 00000000 00000000 00000000 00000000 ................................ 000160
00000000 00000000 00000000 00000000 00000000 00000000 00000000 00000000 ................................ 000180
00000000 00000000 00000000 00000000 00000000 00000000 00000000 00000000 ................................ 0001A0
00000000 00000000 00000000 00000000 00000000 00000000 00000000 00000000 ................................ 0001C0
00000000 00000000 00000000 00000000 00000000 00000000 00000000 00000000 ................................ 0001E0

Dump of file SATURN:[PCCOMMON.DUMP.DLL]DACOPY.TMP;1 on 18-APR-1990 10:39:51.10
File ID (545,24,0)   End of file block 90 / Allocated 92

Virtual block number 87 (00000057), 512 (0200) bytes

00000000 00000000 00000000 00000000 00000000 00000000 00000000 00000000 ................................ 000000
00000000 00000000 00000000 00000000 00000000 00000000 00000000 00000000 ................................ 000020
00000000 00000000 00000000 00000000 00000000 00000000 00000000 00000000 ................................ 000040
00000000 00000000 00000000 00000000 00000000 00000000 00000000 00000000 ................................ 000060
00000000 00000000 00000000 00000000 00000000 00000000 00000000 00000000 ................................ 000080
00000000 00000000 00000000 00000000 00000000 00000000 00000000 00000000 ................................ 0000A0
00000000 00000000 00000000 00000000 00000000 00000000 00000000 00000000 ................................ 0000C0
00000000 00000000 00000000 00000000 00000000 00000000 00000000 00000000 ................................ 0000E0
00000000 00000000 00000000 00000000 00000000 00000000 00000000 00000000 ................................ 000100
00000000 00000000 00000000 00000000 00000000 00000000 00000000 00000000 ................................ 000120
00000000 00000000 00000000 00000000 00000000 00000000 00000000 00000000 ................................ 000140
00000000 00000000 00000000 00000000 00000000 00000000 00000000 00000000 ................................ 000160
00000000 00000000 00000000 00000000 00000000 00000000 00000000 00000000 ................................ 000180
00000000 00000000 00000000 00000000 00000000 00000000 00000000 00000000 ................................ 0001A0
00000000 00000000 00000000 00000000 00000000 00000000 00000000 00000000 ................................ 0001C0
00000000 00000000 00000000 00000000 00000000 00000000 00000000 00000000 ................................ 0001E0
```

```
Dump of file SATURN:[PCCOMMON.DUMP.DLL]DACOPY.TMP;1 on 18-APR-1990 10:39:51.10
File ID (545,24,0)   End of file block 90 / Allocated 92

Virtual block number 88 (00000058), 512 (0200) bytes

00000000 00000000 00000000 00000000 00000000 00000000 00000000 00000000 ................................ 000000
00000000 00000000 00000000 00000000 00000000 00000000 00000000 00000000 ................................ 000020
00000000 00000000 00000000 00000000 00000000 00000000 00000000 00000000 ................................ 000040
00000000 00000000 00000000 00000000 00000000 00000000 00000000 00000000 ................................ 000060
4E495F45 4C49465F 435F0394 00000000 00000000 00000000 00000000 00000000 ......................C_FILE_IN 000080
00000000 00008181 81010000 00010000 00000000 00000000 00000000 00304F46 FO=............................. 0000A0
00000000 00000000 00000000 00000000 00000000 00000000 00000000 00000000 ................................ 0000C0
00000000 00000000 00000000 00000000 00000000 00000000 00000000 00000000 ................................ 0000E0
00000000 00000000 00000000 00000000 00000000 00000000 00000000 00000000 ................................ 000100
00000000 00000000 00000000 00000000 00000000 00000000 00000000 00000000 ................................ 000120
00000000 00000000 00000000 00000000 00000000 00000000 00000000 00000000 ................................ 000140
00000000 00000000 00000000 00000000 00000000 00000000 00000000 00000000 ................................ 000160
00000000 00000000 00000000 00000000 00000000 00000000 00000000 00000000 ................................ 000180
0A0A0A0A 0A0A0A0A 0A000000 00000000 00000000 00000000 00000000 00000000 ................................ 0001A0
0A0A0A0A 0A0A0A0A 0A0A0A0A 0A0A0A0A 0A0A0A0A 0A0A0A0A 0A0A0A0A 0A0A0A0A ................................ 0001C0
0A0A0A0A 0A0A0A0A 0A0A0A0A 0A0A0A0A 0A0A0A0A 0A0A0A0A 0A0A0A0A 0A0A0A0A ................................ 0001E0

Dump of file SATURN:[PCCOMMON.DUMP.DLL]DACOPY.TMP;1 on 18-APR-1990 10:39:51.10
File ID (545,24,0)   End of file block 90 / Allocated 92

Virtual block number 89 (00000059), 512 (0200) bytes

0A0A0A0A 0A0A0A0A 0A0A0A0A 0A0A0A0A 0A0A0A0A 0A0A0A0A 0A0A0A0A 0A0A0A0A ................................ 000000
0A0A0A0A 0A0A0A0A 0A0A0A0A 0A0A0A0A 0A0A0A0A 0A0A0A0A 0A0A0A0A 0A0A0A0A ................................ 000020
0A0A0A0A 0A0A0A0A 0A0A0A0A 0A0A0A0A 0A0A0A0A 0A0A0A0A 0A0A0A0A 0A0A0A0A ................................ 000040
0A0A0A0A 0A0A0A0A 0A0A0A0A 0A0A0A0A 0A0A0A0A 0A0A0A0A 0A0A0A0A 0A0A0A0A ................................ 000060
0A0A0A0A 0A0A0A0A 0A0A0A0A 0A0A0A0A 0A0A0A0A 0A0A0A0A 0A0A0A0A 0A0A0A0A ................................ 000080
00000000 00000000 000A0A0A 0A0A0A0A 0A0A0A0A 0A0A0A0A 0A0A0A0A 0A0A0A0A ................................ 0000A0
00000000 00000000 00000000 00000000 00000000 00000000 00000000 00000000 ................................ 0000C0
00000000 00000000 00000000 00000000 00000000 00000000 00000000 00000000 ................................ 0000E0
00000000 00000000 00000000 00000000 00000000 00000000 00000000 00000000 ................................ 000100
00000000 00000000 00000000 00000000 00000000 00000000 00000000 00000000 ................................ 000120
00000000 00000000 00000000 00000000 00000000 00000000 00000000 000[illegible]00 ................................ 000140
00000000 00000000 00000000 00000000 00000000 00000000 00000000 00000[illegible] ................................ 000160
00000000 00000000 00000000 00000000 00000000 00000000 00000000 000000[illegible] ................................ 000180
00000000 00000000 00000AAC 06250000 00000088 1A220000 00560010 00002000 . ....V..."........X.¯........... 0001A0
6974616F 6C66202D 0A0D4854 414D203A 00FD3E3E 47534D4E 3C3C0000 00000000 ......<<NMSG>>».: MATH..- floati 0001C0
64006700 0A0D6469 6C61766E 69006500 203A726F 72726520 746E696F 702D676E ng-point error: .e.invalid...g.d 0001E0

Dump of file SATURN:[PCCOMMON.DUMP.DLL]DACOPY.TMP;1 on 18-APR-1990 10:39:51.10
File ID (545,24,0)   End of file block 90 / Allocated 92

Virtual block number 90 (0000005A), 512 (0200) bytes

63617473 006E000A 0D776F6C 66726576 6F006800 0A003020 79622065 64697669 ivide by 0...h.overflow...n.stac 000000
6172656E 65672079 6C746963 696C7078 65007000 0A00776F 6C667265 766F206B k overflow...p.explicitly genera 000020
00776F6C 66726576 6F206863 61747320 2D0A0030 30303652 0000000A 0D646574 ted.....R6000..- stack overflow. 000040
30207962 20656469 76696420 72656765 746E6920 2D0A0033 30303652 0003000A ....R6003..- integer divide by 0 000060
66206563 61707320 6867756F 6E652074 6F6E202D 0A003830 30365200 08000A0D .....R6008..- not enough space f 000080
6E652074 6F6E202D 0A003930 30365200 09000A00 73746E65 6D756772 6120726F or arguments.....R6009..- not en 0000A0
0D00FC00 0A0D746E 656D6E6F 7269766E 6520726F 66206563 61707320 6867756F ough space for environment...•.. 0000C0
66202D0A 00323030 36520002 0020726F 72726520 656D6974 2D6E7572 00FF000A ....run-time error ...R6002..- f 0000E0
D002FFFF FF000A00 64656461 6F6C2074 6F6E2074 6E696F70 20676E69 74616F6C loating point not loaded........ 000100
00000000 00000000 00000000 00000000 00000008 03960002 00000006 0A840002 ..Ç............................. 000120
00000000 00000000 00000000 00000000 00000000 00000000 00000000 00000000 ................................ 000140
00000000 00000000 00000000 00000000 00000000 00000000 00000000 00000000 ................................ 000160
00000000 00000000 00000000 00000000 00000000 00000000 00000000 00000000 ................................ 000180
00000000 00000000 00000000 00000000 00000000 00000000 00000000 00000000 ................................ 0001A0
00000000 00000000 00000000 00000000 00000000 00000000 00000000 00000000 ................................ 0001C0
00000000 00000000 00000000 00000000 00000000 00000000 00000000 00000000 ................................ 0001E0
```

```
Dump of file SATURN:[PCCOMMON.DUMP.DLL]DAFILTER.TMP;1 on 18-APR-1990 10:41:03.85
File ID (562,30,0)   End of file block 42 / Allocated 44

Virtual block number 1 (00000001), 512 (0200) bytes

00000000 00000040 00000000 00000088 0000FFFF 00000004 00000027 01165A4D MZ..'...........|.......a....... 000000
00000080 00000000 00000000 00000000 00000000 00000000 00000000 00000000 ................................ 000020
6F6E6E61 63206061 72676F72 70207369 685421CD 4C01B821 CD098400 0EBA1F0E ..o..Ç.él|.LéIThis program canno 000040
00000000 00000024 0A00002E 65646F60 20534F44 206E6920 6E757220 65622074 t be run in DOS mode....$....... 000060
00080007 00000000 00030000 00000000 0006800E 93929721 000704C5 0505454E NE..é...!....................... 000080
00000000 00000000 00010001 00040000 0000054C 00A30093 007C0078 0040000E ..a.x.|...£.L................... 0000A0
112E0F00 112E0309 000F0F00 000F0307 263E0F00 263E0082 022E0F00 022E0056 V.........>&..>&................ 0000C0
46414408 01000004 05621EB1 05620403 0B000F01 0AF40422 00040E01 00000000 ........".¶.....Æ.b.Ÿ.b......DAF 0000E0
E3036F03 30001400 0E000A00 01000001 434F5250 4C4F4F54 08000052 45544C49 ILTER...TOOLPROC...........0.o.D 000100
414C4044 006C6064 034E4957 4D500553 4C4E0353 4C4C4143 534F4408 00041503 .....DOSCALLS.NLS.PMWIN.dml.DMLA 000120
46595245 55514C4D 44004C45 444F4D45 4552464C 4D440C4D 54484552 49555143 COUIREHTM.DMLFREEMODEL.DMLQUERYF 000140
53595245 55515245 544C4946 4C4D4413 5453494C 45455246 4C4D440B 444C4549 IELD.DMLFREELIST.DMLFILTERQUERYS 000160
4D441446 464F5245 544C4946 4C4D440C 4E4F5245 544C4946 4C4D440B 45544154 TATE.DMLFILTERON.DMLFILTEROFF.DM 000180
44494C4D 44595245 5514C4D 44165245 544C4946 45564954 43415952 4555514C LQUERYACTIVEFILTER.DMLQUERYDMLID 0001A0
44494C4D 44454D41 E544E49 52505952 4555514C 4D441645 4D414E54 4E495250 PRINTNAME.DMLQUERYPRINTNAMEDMLID 0001C0
5759454B 4C4C4159 52455551 4C4D4413 454C4241 5245544C 49464449 4C4D440F .DMLIDFILTERABLE.DMLQUERYALLKEYW 0001E0

Dump of file SATURN:[PCCOMMON.DUMP.DLL]DAFILTER.TMP;1 on 18-APR-1990 10:41:03.85
File ID (562,30,0)   End of file block 42 / Allocated 44

Virtual block number 2 (00000002), 512 (0200) bytes

52435245 544C4946 4C4D440F 53524554 4C494659 52455551 4C4D440F 5344524F ORDS.DMLQUERYFILTERS.DMLFILTERCR 000000
51524554 4C49464C 4D441259 4F525453 45445245 544C4946 4C4D4410 45544145 EATE.DMLFILTERDESTROY.DMLFILTERQ 000020
4C49464C 4D441845 4D414E54 45535245 544C4946 4C4D4410 4540414E 59524555 UERYNAME.DMLFILTERSETNAME.DMLFIL 000040
46544553 5245544C 49464C4D 44164556 4953554C 434E4946 59524555 51524554 TERQUERYFINCLUSIVE.DMLFILTERSETF 000060
4C4D4410 444E4146 59524555 51524554 4C49464C 4D441245 56495355 4C434E49 INCLUSIVE.DMLFILTERQUERYFAND.DML 000080
41455243 59524555 51524554 4C49464C 4D441844 4E414654 45535245 544C4946 FILTERSETFAND.DMLFILTERQUERYCREA 0000A0
49544E4F 49544145 52435445 53524554 4C49464C 4D44194C 454D4954 4E4F4954 TIONTIMEL.DMLFILTERSETCREATIONTI 0000C0
4D44174C 454D4954 45544144 50555952 45555152 45544C49 464C4D44 194C454D MEL.DMLFILTERQUERYUPDATETIMEL.DM 0000E0
51524554 4C49464C 4D44184C 454D4954 45544144 50555445 53524554 4C49464C LFILTERSETUPDATETIMEL.DMLFILTERQ 000100
52435445 53524554 4C49464C 4D441955 454D4954 4E4F4954 41455243 59524555 UERYCREATIONTIMEU.DMLFILTERSETCR 000120
45544144 50555952 45555152 45544C49 464C4D44 1955454D 49544E4F 49544145 EATIONTIMEU.DMLFILTERQUERYUPDATE 000140
4D441755 454D4954 45544144 50555445 53524554 4C49464C 4D441755 454D4954 TIMEU.DMLFILTERSETUPDATETIMEU.DM 000160
53524554 4C49464C 4D441559 42444554 41455243 59524555 51524554 4C49464C LFILTERQUERYCREATEDBY.DMLFILTERS 000180
45544144 50555952 45555152 45544C49 464C4D44 17594244 45544145 52435445 ETCREATEDBY.DMLFILTERQUERYUPDATE 0001A0
4C49464C 4D441659 42444554 41445055 54455352 45544C49 464C4D44 15594244 DBY.DMLFILTERSETUPDATEDBY.DMLFIL 0001C0
59454B44 44415245 544C4946 4C4D4413 5344524F 5759454B 59524555 51524554 TERQUERYKEYWORDS.DMLFILTERADDKEY 0001E0

Dump of file SATURN:[PCCOMMON.DUMP.DLL]DAFILTER.TMP;1 on 18-APR-1990 10:41:03.85
File ID (562,30,0)   End of file block 42 / Allocated 44

Virtual block number 3 (00000003), 512 (0200) bytes

44165345 50595454 43454A42 4F595245 55515245 544C4946 4C4D4419 44524F57 WORD.DMLFILTERQUERYOBJECTTYPES.D 000000
43524554 4C49464C 4D440F45 50595454 43454A42 4F444441 5245544C 49464C4D MLFILTERADDOBJECTTYPE.DMLFILTERC 000020
54414552 434D454D 0D4D454D 03444E49 46524554 4C49464C 4D440045 474E4148 HANGE.DMLFILTERFIND.MEM.MEMCREAT 000040
4F4C4243 4F4C4C41 4D454D00 50414548 594F5254 5345444D 45400E50 41454845 EHLAP.MEMDESTROYHEAP.MEMALLOCBLO 000060
4F544C4C 494B4954 47084954 47035452 45564E4F 43455241 48534D45 4D0F4B43 CK.MEMSHARECONVERT.GTI.GTIKILLTO 000080
49544712 47534D44 4E455349 54470A43 4F52504C 4F4F5446 45444954 470E4C4F OL.GTIDEFTOOLPROC.GTISENDMSG.GTI 0000A0
50415441 44585541 59524555 51495447 12574F44 4E49574C 4F4F5459 52455551 QUERYTOOLWINDOW.GTIQUERYAUXDATAP 0000C0
4C4F4F54 59524555 51495447 12525450 41544144 58554154 45534954 47105254 TR.GTISETAUXDATAPTR.GTIQUERYTOOL 0000E0
5445524C 4C0A5458 454E4C4C 06444145 484C4C06 6C6C6C6D 6405544E 45524150 PARENT.dmlll.LLHEAD.LLNEXT.LLRET 000100
534F4408 4F495303 594F5254 5345444C 4C094854 474E454C 4C4C0845 56454952 RIEVE.LLLENGTH.LLDESTROY.SIO.DOS 000120
00000000 00000000 004C4C44 20524554 4C49460A 000000EF 03010145 54495257 WRITE...y....FILTER DLL......... 000140
F4468900 00FFFF9A 5016FA46 80026A00 00F446C7 D88EFFFF BB1E5657 00000CC8 à...WV.|...ÁüF¶..j..F*.P......F¶ 000160
890000FF FF9A5016 FC468D2D 6A446AFA 76FF00BA E9F4468B 0006E903 7500003D =..u.Ö...F¶Ðu..v*jDj-.F=.P...... 000180
8926FA46 BBFC5EC4 0090E9F4 46880000 00AC9AFA 76FF000E E9037500 003DF446 F¶=..u.Ö...v*.`....F¶Ö..á^=.F*&. 0001A0
FFFF0056 9A505200 0205FE56 8BFC468B FC77FF26 FE77FF26 065EC404 06468307 ..F..á^.&.w±&.w=.F=.V±...RP.V... 0001C0
F4468900 00FFFF9A 50161646 80505200 0205FE56 8BFC468B 0A76FF01 6A08C483 .Á.j..v..F=.V±...RP.F-.P......F¶ 0001E0
```

```
Dump of file SATURN:[PCCOMMON.DUMP.DLL]DAFILTER.TMP;1 on 18-APR-1990 10:41:03.85
File ID (562,30,0)   End of file block 42 / Allocated 44

Virtual block number 4 (00000004), 512 (0200) bytes

2B478926 0A468BFC 5EC40032 E9F4468B 0000FFFF 9AFA76FF 000EE903 7500003D =..u.Ô...v¹......F¶Ô2.á^•.F.&.G+ 000000
890000FF FF9AFC76 FFFE76FF 0A76FF29 57892627 478926F8 568BF646 8BFC5EC4 á^•.F-.V½&.G'&.W).v..v±.v•...... 000020
0000F046 C7D88E00 08881E56 57000010 C80006CA C95F5E1F 0000E9F4 468BF446 F¶.F¶Ô...^_èò..à...WV.|...ÁùFÞ.. 000040
05E90000 8A000'38 010EE999 FFFF0000 9A0A76FF 0C76FF10 76FF00EC E90E468B .F.Ô$..v..v..v.......Ô..|..¤..Ô. 000060
76FFF476 FF0000FF FF9A5016 F2468DFE 76FF0000 FFFF9A50 16FE468D 1076FF01 ..v..F±.P......v±.F·.P......v¶.v 000080
016A006A 0000FFFF 9A5016FA 468D1076 FFF85689 F6468900 00FFFF9A 800868F2 ·h........F-.V½.v..F*.P.....j.j. 0000A0
FF9AFA76 FFFC76FF 01006800 0236FF26 0A12068E FFFF68FF FF68F676 FFF876FF .v½.v-h..h......&.6..h...v•.v*.. 0000C0
008A0000 88000107 C7260A5E C4008AE9 0000FFFF 9A006A10 76FFF046 890000FF ....FÞ.v.j......Ô..á^.&ú...|..¤. 0000E0
00FFFF9A 2777FF26 2977FF26 FA5EC400 0001589A 5016FA46 8D1076FF 0082E900 .Ô...v..F*.P.X...á^*&.w)&.w'.... 000100
76FF0C76 FF0E76FF 1076FF00 51E90000 8A00008B 0000004E 9A37FF26 FA5EC400 .á^*&.7.N...|..¤..ÔQ..v..v..v..v 000120
E9037510 033DFF1E E9037510 0130002B E90037E9 0000FFFF 9A0676FF 0876FF0A ..v..v......Ô7.Ô+.=..u.Ô..=..u.Ô 000140
00008BFF 8BE9FF79 E903751D 8030FF0F E903751D AD30FF9A E9037510 043DFF04 ..=..u.Ô..=Ù.u.Ô..=¯.u.Ôy.Ôj.|.. 000160
00000001 01120002 03D00006 012A0203 00129000 0CCAC95F 5E1F0000 E90000BA ¤..Ô...^_èò.......*...Â......... 000180
00000006 00F70002 007D0003 017F0103 00000004 007E0002 00000002 01670002 ..g.......~...........)...¥..... 0001A0
037F0006 01E80203 246C0002 016A0005 00130003 01450103 03730006 018C0203 ......s...E.......j...l$..Ô..... 0001C0
03340005 00190203 03990006 01370203 00260004 01BD0203 00180004 00990203 ..........§...&...7...........4. 0001E0

Dump of file SATURN:[PCCOMMON.DUMP.DLL]DAFILTER.TMP;1 on 18-APR-1990 10:41:03.85
File ID (562,30,0)   End of file block 42 / Allocated 44

Virtual block number 5 (00000005), 512 (0200) bytes

03510005 00380203 03BF0006 00080203 03420005 01C80203 03AC0006 01AD0203 ..Û...¯...à...B...Ù...¢...;...Q. 000000
03740846 0B06468B 0007C626 0A5EC400 00F846C7 D88EFFFF 881E5657 000046C8 àF..WV.|...ÁùF½..á^.&ó...F..F.ť. 000020
F446C700 EE46C600 BA46C600 C446C600 FC46C600 C046C602 B9E90000 B80006E9 Ô..|..Ô¿.óFà.óF•.óFá.óF¤.óFŸ.úF¶ 000040
C8468D50 16F4468D 266A8E46 890000FF FF9A5016 FA468D50 16F6468D 026A0000 ..j..F~.P.F*.P......Ffj&.F¶.P.Fà 000060
9A50400B 478B2606 5EC45016 EE468D0A 6A8E4689 0000FFFF 9A5016F2 468D5016 .P.F·.P......Ffj..FŸ.Pá^.&.G.ӘP. 000080
8D0A6A0B C48300AE 00CE9A06 77FF2606 5EC45016 C0468D0A 6A08C483 009800CE ö....á.j..Fà.Pá^.&.w..ɔ.Û..á.j.. 0000A0
77FF2606 5EC45016 FC468D0A 6A08C483 00C400CE 9A0A77FF 26065EC4 5016BA46 F¤.Pá^.&.w..o.á..á.j..ì•.Pá^.&.w 0000C0
8300E000 109A0A7^ FF0C76FF 5016EE46 8D0129E9 CC468808 C483000D 00CE9A02 ..ö.Ì..á..F∂Ô)..FŸ.P.v..v....Þ.. 0000E0
0A76FF0C 76FF501 C0468008 C4830103 00109A0A 76FF0C76 FF501607 468D08C4 á..F•.P.v..v.......á..Fà.P.v..v. 000100
5016BA46 8D08C483 01290010 9A0A76FF 0C76FF50 16074680 08C48301 1600109A ......á..F•.P.v..v....)..á..F¤.P 000120
5200109A 0A76FF0C 76FF5016 C0468000 E1E908C4 83013F00 109A0A76 FF0C76FF .v..v....?..á.ÔÄ..Fà.P.v..v....R 000140
FF0C76FF 5016EE46 8D08C483 01650010 9A0A76FF 0C76FF50 16074680 08C48301 ..á..F•.P.v..v....e..á..FŸ.P.v.. 000160
BA468D08 C48301B8 00109A0A 76FF0C76 FF501607 468D08C4 83017800 109A0A76 v....x..á..F•.P.v..v.......á..F¤ 000180
109A0A76 FF0C76FF 5016BA46 8D007FE9 08C48301 A100109A 0A76FF0C 76FF5016 .P.v..v....À..á.Ô...F¤.P.v..v... 0001A0
76FF5016 EE468D08 C48301C7 00109A0A 76FF0C76 FF501607 468D08C4 83018400 .Ç..á..F•.P.v..v....ù..á..FŸ.P.v 0001C0
8D08C483 01ED0010 9A0A76FF 0C76FF50 16074680 08C48301 DA00109A 0A76FF0C ..v....Ö..á..F•.P.v..v....Ù..á.. 0001E0

Dump of file SATURN:[PCCOMMON.DUMP.DLL]DAFILTER.TMP;1 on 18-APR-1990 10:41:03.85
File ID (562,30,0)   End of file block 42 / Allocated 44

Virtual block number 6 (00000006), 512 (0200) bytes

3DFED0E9 0375C00B 001AE900 1DE908C4 83021F00 109A0A76 FF0C76FF 5016C046 Fà.P.v..v.......á.Ô..Ô...àu.ÔÄ±= 000000
4F00109A 0A76FF0C 76FF0042 681E0000 E9FF84E9 03750002 30FF2AE9 03750001 ..u.Ô*.=..u.Ô..Ô...hB..v..v....O 000020
0A6A0C04 6F832606 >EC40001 F846C700 00E9037F 0C047F83 26065EC4 08C48302 ..á.á^.&......Ô..úF½..á^.&.o..j. 000040
9A0A76FF 0C76FF50 16C4468D 08C48302 6200CE9A 0477FF26 065EC450 16C4468D .Fá.Pá^.&.w..o.b..á..Fá.P.v..v.. 000060
7F832606 5EC408C4 83029400 109A0A76 FF0C76FF 50160946 8D08C483 02750010 ..u..á..F).P.v..v.......á.á^.&.. 000080
76FF5016 FC468D08 C48302A7 00109A0A 76FF0C76 FF004468 1E0012E9 037C0A02 ..|.Ô...hD..v..v....Ì..á..F•.P.v 0000A0
9A0A76FF 0C76FF00 46681E00 15E90375 00F87E83 08C48302 C200109A 0A76FF0C ..v....ö..á..~½.u.Ô...hF..v..v.. 0000C0
E90000B8 08C483FF FF00109A 0A76FF0C 76FF004A 681E0012 E908C483 02D70010 ..•..á.Ô...hJ..v..v.......á.|..Ô 0000E0
C48303C4 00869A06 76FF0876 FFD88E00 08881E56 5700002C C8CBC95F 5E1F0000 ...^_èùà,..WV.|...Á.v..v..Ñ.á..á 000100
FF0003E9 00000846 C700C46 C60001FE 46C70000 D446C700 000646C7 DA468904 ..FÔÛF•..úFå..úF±..óFÉ.úFÁ..Ô... 000120
00FE7E83 000CE903 74203880 260676C4 D85E8800 82E90372 D846390A 4688D846 FÄ.FÔ9FÁr.Ô...^Aáv.&.8 t.Ô...-±. 000140
00047E83 0023E903 74203880 260676C4 D85E8800 00FE46C7 FFD7E900 03E90375 u.Ô..Ô•.úF±...^Aáv.&.8 t.Ô#..-å. 000160
8BFFA0E9 DC428806 46FFD676 88008A26 0676C408 5E880001 0446C700 1AE90374 t.Ô..úFå...^Aáv.&...v•.F•.BÉÔ... 000180
0676C4D8 5E88FF85 E90003E9 03750004 7E83000C E9037420 38802606 76C4085E ^Aáv.&.8 t.Ô...-å.u.Ô..Ô...^Aáv. 0001A0
76FF0876 FF50160C 4680000C 42C60676 88FF70E9 DC428806 46FFD676 88008A26 &...v•.F•.BÉÔp..v•6ßÉ..FÉ.P.v..v 0001C0
D88E02EF 881E5657 000036C8 CBC95F5E 1F0000E9 00008808 C4830082 00569A06 ..V....á.|..Ô...^_èùàó..WV.|ÿ..Ä 0001E0
```

```
Dump of file SATURN:[PCCOMMON.DUMP.DLL]DAFILTER.TMP;1 on 18-APR-1990 10:41:03.85
File ID (562,30,0)   End of file block 42 / Allocated 44

Virtual block number 7 (00000007), 512 (0200) bytes

 FF02E79A 0676FF08 76FF0551 E90001B8 0006E903 740C460B 0A468800 00FE46C7 úF±...F..F.t.Ö..¡..ÕQ..v..v..Ö.. 000000
 80266ACA 46890000 004F9A50 16FC4680 5016FA46 80026A00 00F846C7 04C483FF ..á.úF½..j..F*.P.F•.P.O....Fòj&. 000020
 88D8468A F24688D0 468ACA46 89000000 689A5016 F6468D50 16CC4680 5016F846 F½.P.Fa.P.F-.P.h....Fò Fi.F·.FÜ. 000040
 C4001AE9 03740147 3826F446 8A065EC4 034FE900 46880000 07C7260A 5EC4F446 F¶á^.&ú....FÀÖO.á^..F¶&¯G.t.Ö..á 000060
 26F4468A 065EC400 44E90002 FE46C708 4789260A 5EC40031 20E42A07 8A26065E ^.&..*ö-1.á^.&.G.úF±..ÕC.‹^..F¶& 000080
 4F8A2606 5EC4E001 C103E001 E001C888 E42A078A 26065EC4 002FE903 7402473B 8G.t.Ö/.á^.&..*ö.àiÁiÁ.èiÁá^.&.O 0000A0
 FE768804 8AE90001 880006E9 0003FE46 C7084789 260A5EC4 02112DC1 03ED2A01 .*Ü.è-..á^.&.G.úF±..Ö..¡..Ö...v± 0000C0
 0A5EC400 302DE42A 008A2606 76C4FE5E 88001CE9 03740140 3826F446 8A065EC4 á^..F¶&8ə.t.Ö...^±áv.&..*ö-0.á^. 0000E0
 FE5E8800 34E90374 02403826 F4468A06 5EC4FE76 88004CE9 02FE4683 06478926 &.G..F±.ÖL..v±á^..F¶&8ə.t.Ö4..^± 000100
 C103ED2A 01488A26 065EC4FE 768BE001 C103E001 E001C888 E42A008A 260676C4 áv.&..*ö.àiÁiÁ.èiÁ.v±á^.&.H.*Ü.è 000120
 008A2606 76C4FE5E 880410E9 0001B800 06E903FE 46830647 89260A5E C402102D -..á^.&.G..F±.Ö..¡..Ö...^±áv.&.. 000140
 0A5EC402 102DC103 ED2A0148 8A26065E C4FE7688 E001C103 E001E001 C888E42A *ö.àiÁiÁ.èiÁ.v±á^.&.H.*Ü.è-..á^. 000160
 078A2606 5EC4001A E9037401 473826F4 468A065E C4024EE9 03FE4683 0A478926 &.G..F±.ÖN.á^..F¶&8G.t.Ö..á^.&.. 000180
 03740247 3826F446 8A065EC4 0044E900 02FE46C7 06478926 0A5EC400 302DE42A *ö-0.á^.&.G.úF±..ÖD.á^..F¶&8G.t. 0001A0
 C103E02A 014F8A26 065EC4E0 D1C103E0 D1E001C8 88E42A07 8A26065E C4002FE9 Ö/.á^.&..*ö.àiÁiÁ.èiÁá^.&.O.*Ü.è 0001C0
 468A065E C4FE7688 036FE900 01880006 E90003FE 46C70647 89260A5E C402102D -..á^.&.G.úF±..Ö..¡..Öo..v±á^..F 0001E0

Dump of file SATURN:[PCCOMMON.DUMP.DLL]DAFILTER.TMP;1 on 18-APR-1990 10:41:03.85
File ID (562,30,0)   End of file block 42 / Allocated 44

Virtual block number 8 (00000008), 512 (0200) bytes

 83084789 260A5EC4 00312DE4 2A008A26 0676C4FE 5E88001C E9037401 403826F4 ¶&8ə.t.Ö...^±áv.&..*ö-1.á^.&.G.. 000000
 8A260676 C4FE5E88 0034E903 74024038 26F4468A 065EC4FE 7688004C E902FE46 F±.ÖL..v±á^..F¶&8ə.t.Ö4..^±áv.&. 000020
 5EC40211 2DC103E0 2A01488A 26065EC4 FE7688E0 D1C103E0 D1E001C8 88E42A00 .*ö.àiÁiÁ.èiÁ.v±á^.&.H.*Ü.è-..á^ 000040
 D1C888E4 2A008A26 0676C4FE 5E8802F5 E90001B8 0006E903 FE468308 4789260A .&.G..F±.Ö..¡..Ö%..^±áv.&..*ö.ài 000060
 830A4789 260A5EC4 02102DC1 03ED2A01 488A2606 5EC4FE76 88E0D1C1 03E0D1E0 ÁiÁ.èiÁ.v±á^.&.H.*Ü.è-..á^.&.G.. 000080
 2A014F8A 26065EC4 E001C103 E001E001 C888E42A 078A2606 5EC40133 E903FE46 F±.Ö3.á^.&..*ö.àiÁiÁ.èiÁá^.&.O.* 0000A0
 26065EC4 0018E903 74044738 26F4468A 065EC40A 4789260A 5EC40210 2DC103ED Ü.è-..á^.&.G.á^..F¶&8G.t.Ö..á^.& 0000C0
 473826F4 468A065E C40045E9 0005FE46 C7084789 260A5EC4 00312DE4 2A03478A .G.*ö-1.á^.&.G.úF±..ÖE.á^..F¶&8G 0000E0
 044F8A26 065EC4E0 D1C103E0 D1E001C8 88E42A03 478A2606 5EC40030 E9037405 .t.ÖO.á^.&.G.*ö.àiÁiÁ.èiÁá^.&.O. 000100
 C4FE7688 0228E900 01880006 E90006FE 46C70847 89260A5E C402112D C103ED2A *Ü.è-..á^.&.G.úF±..Ö..¡..Ö+..v±á 000120
 260A5EC4 00302DE4 2A008A26 0676C4FE 5E88001C E9037401 403826F4 468A065E ^..F¶&8ə.t.Ö...^±áv.&..*ö-0.á^.& 000140
 C4FE5E88 0034E903 74024038 26F4468A 065EC4FE 7688004C E902FE46 83064789 .G..F±.ÖL..v±á^..F¶&8ə.t.Ö4..^±á 000160
 2DC103ED 2A01488A 26065EC4 FE7688E0 D1C103E0 D1E001C8 88E42A00 8A260676 v.&..*ö.àiÁiÁ.èiÁ.v±á^.&.H.*Ü.è- 000180
 0B001AE9 001DE900 20E901B1 E90001B8 0006E903 FE468306 4789260A 5EC40210 ..á^.&.G..F±.Ö..¡..ÖŸ.Ö .Ö..Ö... 0001A0
 26065EC4 FE7688FF E0E9FED0 E9037500 023DFD8D E9037500 013DFCAA E90375C0 âu.Ö`==..u.Ö§»=..u.ÖÁ±ÖÁ..v±á^.& 0001C0
 000447C7 260A5EC4 0018E903 74003880 260676C4 FE5E8800 0FE90375 00FF7880 .x..u.Ö...^±áv.&.8.t.Ö..á^.&úG.. 0001E0

Dump of file SATURN:[PCCOMMON.DUMP.DLL]DAFILTER.TMP;1 on 18-APR-1990 10:41:03.85
File ID (562,30,0)   End of file block 42 / Allocated 44

Virtual block numbe  9 (00000009), 512 (0200) bytes

 E9037401 403826F2 468A065E C4FE7688 0157E900 00830000 0247C726 0A5EC400 .á^.&úG...¡..ÖW..v±á^..F·&8ə.t.Ö 000000
 7688004C E902FE46 83044789 260A5EC4 00302DE4 2A008A26 0676C4FE 5E88001C ...^±áv.&..*ö-0.á^.&.G..F±.ÖL..v 000020
 D1E001C8 88E42A00 8A260676 C4FE5E88 0034E903 74024038 26F2468A 065EC4FE ±á^..F·&8ə.t.Ö4..^±áv.&..*ö.àiÁi 000040
 FE468304 4789260A 5EC40210 2DC103ED 2A01488A 26065EC4 FE7688E0 D1C103E0 Á.èiÁ.v±á^.&.H.*Ü.è-..á^.&.G..F± 000060
 C4FE7688 0010E903 75014038 26F2468A 065EC4FE 7688000D E90001B8 0006E903 .Ö..¡..Öi..v±á^..F·&8ə.u.Ö...v±á 000080
 4789260A 5EC40030 2DE42A00 8A260676 C4FE5E88 001CE903 74000178 8026065E ^.&.x..t.Ö...^±áv.&..*ö-0.á^.&.G 0000A0
 FE7688E0 D1C103E0 D1E001C8 88E42A00 8A260676 C4FE5E88 0031E902 FE468302 ..F±.Ö1..^±áv.&..*ö.àiÁiÁ.èiÁ.v± 0000C0
 9A0676FF 0876FF03 FE468302 4789260A 5EC40210 2DC103ED 2A01488A 26065EC4 á^.&.H.*ü.è-..á^.&.G..F±..v..v.. 0000E0
 76C4FE5E 88004CE9 00008800 06E90373 FE4639FC 468FC46 8904C483 02FC0086 Ñ.•..á..F•.F•9F±s.Ö..¡..ÖL..^±áv 000100
 26065EC4 FE768800 28E90374 50388026 0676C4FE 5E88000F E9037570 38802606 .&.8pu.Ö...^±áv.&.8Pt.Ö(..v±á^.& 000120
 04478326 0A5EC400 08E90374 40017880 26065EC4 FE768800 10E90375 60017880 .x.mu.Ö...v±á^.&.x.Mt.Ö..á^.&.G. 000140
 02680676 FF0876FF D88E030C B81E5657 000022C8 CBC95F5E 1F0000E9 0000B80C .¡..Ö...^_èùà"..WV.¡É..Á.v..v.h. 000160
 E90000B8 0006E903 740C460B 0A468800 00FFFF9A 006A006A 216A006A 01436801 .hC.j.j!j.j.......F..F.t.Ö..¡..Ö 000180
 5016DE46 80010268 0676FF08 76FF0000 FFFF9A50 160E4680 0A76FF0C 76FF0029 )..v..v..FB.P......v..v.h...FB.P 0001A0
 FF0876FF D88E0954 BP1E5657 00002AC8 CBC95F5E 1F0000E9 0000B800 00FFFF9A .....¡..Ö...^_èùà*..WV.¡T..Á.v.. 0001C0
 5016FC46 800A76FF 0C76FF00 000A329A 006A006A 006A006A 016E6801 05680676 v.h..hn.j.j.j.j..2....v..v..F•.P 0001E0
```

Dump of file SATURN:[PCCOMMON.DUMP.DLL]DAFILTER.TMP;1 on 18-APR-1990 10:41:03.85
File ID (562,30,0) End of file block 42 / Allocated 44

Virtual block number 10 (0000000A), 512 (0200) bytes

```
56890646 8900000A 509AFC76 FFFE76FF 0000FFFF 9AFC76FF FE76FF00 00FFFF9A ......v±.v•......v±.v•.P....F•.V 000000
FF0876FF 0000098E 9A50160A 46800676 FFD876FF 0060E903 75D84608 064688D8 Å.F•.FÁu.Õ'..vÅ.v•.FÓ.P......v.. 000020
00FFFF9A FC76FFFE 76FF0000 09609A50 160A4680 006A006A 01616801 05680676 v.h..h•.j.j..FÖ.P.m....v±.v•.... 000040
00008800 0CE90856 89064689 0000FFFF 9AFC76FF FE76FF00 14E90375 00003000 .=..u.Õ...v±.v•......F•.VÅÕ..¡.. 000060
88881E56 5700000A C8C8C95F 5E1F0000 E90000B8 FF95E908 56890646 890A 08A ¤...F•.VÅÕ..¡..Õ...^_èùà...WV.¡¡ 000080
080A4688 00000901 9A006A00 6A096A00 6A014368 01086806 76FF0876 FFD8 09 ..Å.v..v.h..hC.j.j.j.j..l....F.. 0000A0
0876FF00 00FFFF9A 5016F646 800A76FF 0C76FF00 26E90000 880006E9 03740C46 F.t.Õ..¡..Õ&..v..v..F-.P......v. 0000C0
881E5657 00000AC8 C8C95F5E 1F0000E9 000009A1 9A5016F6 46800108 680676FF .v.h...F-.P.À...Õ...^_èùà...WV.¡ 0000E0
0A468800 000A989A 006A006A 096A006A 01436801 1C680676 FF0876FF D88E0A7F ...Å.v..v.h..hC.j.j.j.j.......F. 000100
76FF0000 FFFF9A50 16F6468D 0A76FF0C 76FF0026 E90000B8 0006E903 740C4608 .F.t.Õ..¡..Õ&..v..v..F-.P......v 000120
1E565700 002AC8C8 C95F5E1F 0000E900 000ACC9A 5016F646 80011C68 0676FF08 ..v.h...F~.P.ä...Õ...^_èùà*..WV. 000140
46880000 0AF99A00 6A006A21 6A006A01 43680127 680676FF 0876FFD8 8E0AE088 ¡Å..Å.v..v.h'.hC.j.j!j.j..'....F 000160
880000FF FF9A5016 F846800A 76FF0C76 FF005EE9 00008800 06E90374 0C46080A ..F.t.Õ..¡..Õ^..v..v..F½.P...... 000180
468904C4 8308E200 EA9A5016 F8468000 26E90006 46C60007 E90374FA 4608F846 F½.F't.Õ..óF•.Õ&..F½.P.õ.ã..á..F 0001A0
01276806 76FF0876 FF08C483 03FF0000 9AFC76FF FE76FF50 16064680 FE5689FC •.V±.F•.P.v±.v•......á..v..v.h'. 0001C0
76FFD88E 0B41881E 56570000 2AC8C8C9 5F5E1F00 00E90000 08209A50 16064680 .F•.P.-...Õ...^_èùà*..WV.¡A..Å.v 0001E0
```

Dump of file SATURN:[PCCOMMON.DUMP.DLL]DAFILTER.TMP;1 on 18-APR-1990 10:41:03.85
File ID (562,30,0) End of file block 42 / Allocated 44

Virtual block number 11 (0000000B), 512 (0200) bytes

```
E903740C 46080A46 8800000B 5A9A006A 006A216A 006A0143 68012668 0676FF08 ..v.h&.hC.j.j!j.j..Z....F..F.t.Õ 000000
0374FA46 0BF8468B 0000FFFF 9A5016F8 46800A76 FF0C76FF 005EE900 00880006 ..¡..Õ^..v..v..F½.P......F½.F't. 000020
D64680FE 5689FC46 8904C483 0B9900EA 9A5016F8 46800026 E9000646 C60007E9 Õ..óF•.Õ&..F½.P.õ....á..F•.V±.F• 000040
C69A5016 D6468001 26680676 FF0876FF 08C48308 8200009A FC76FFFE 76FF5016 .P.v±.v•...ý..á..v..v.h&..F•.P.ó 000060
01286806 76FF0876 FFD88E08 DA881E56 5700002A C8C8C95F 5E1F0000 E900000B ...Õ...^_èùà*..WV.¡Õ..Å.v..v.h(. 000080
5EE90000 880006E9 03740C46 080A4688 000008F3 9A006A00 6A216A00 6A014368 hC.j.j!j.j..µ....F..F.t.Õ..¡..Õ^ 0000A0
000646C6 0007E903 74FA4608 F8468800 00FFFF9A 5016F846 800A76FF 0C76FF00 ..v..v..F½.P......F½.F't.Õ..óF•. 0000C0
76FFFE76 FF5016D6 4680FE56 89FC4689 04C4830C 3200EA9A 5016F846 800026E9 Õ&..F½.P.õ.2..á..F•.V±.F•.P.v±.v 0000E0
1F0000E9 00000C5F 9A5016D6 46800128 680676FF 0876FF08 C4830C48 00009AFC •...K..á..v..v.h(..F•.P._...Õ... 000100
216A006A 01436801 24680676 FF0876FF D88E0C73 881E5657 00002AC8 C8C95F5E ^_èùà*..WV.¡s..Å.v..v.h$.hC.j.j! 000120
0A76FF0C 76FF005E E90000B8 0006E903 740C4608 0A468800 000C8C9A 006A006A j.j.......F..F.t.Õ..¡..Õ^..v..v. 000140
16F84680 0026E900 D646C600 07E90374 FA4608F8 46880000 FFFF9A50 16F84680 .F½.P......F½.F't.Õ..óF•.Õ&..F½. 000160
830CE400 009AFC76 FFFE76FF 50160646 80FE5689 FC468904 C4830CC8 00EA9A50 P.õ.ù..á..F•.V±.F•.P.v±.v•...õ.. 000180
0008C8C8 C95F5E1F 0000E900 000CF89A 50160646 80012468 0676FF08 76FF08C4 á..v..v.h$..F•.P.½...Õ...^_èùà.. 0001A0
8900000E 2A9A0676 FF0876FF 000009EC 9A0676FF 0876FFD8 8E000C88 1E565700 .WV.¡...Å.v..v..š....v..v..*.... 0001C0
0000FFFF 9A5016F8 4680FC76 FFFE76FF 0076E903 75FE4608 FC4688FE 5689FC46 F•.V±.F•.F±u.Õv..v±.v•.F½.P..... 0001E0
```

Dump of file SATURN:[PCCOMMON.DUMP.DLL]DAFILTER.TMP;1 on 18-APR-1990 10:41:03.85
File ID (562,30,0) End of file block 42 / Allocated 44

Virtual block number 12 (0000000C), 512 (0200) bytes

```
83006400 8C9AF876 FFFA76FF 0A76FF0C 76FF005E E98492B8 0006E903 75000030 =..u.Õ..¡..Õ^..v..v..v'.v½...d.. 000000
03750000 3000000A 309A0676 FF0876FF 003CE900 01880006 E9037400 003008C4 á.*..t.Õ..¡..Õ<..v..v..=...=..u. 000020
FC468900 008A0000 88000CE9 FE5689FC 46890000 09F79A06 76FF0876 FF0014E9 Õ...v..v..¾....F•.V±Õ..¡..¤...F• 000040
0646C708 8E00A588 1E565700 0030C8C8 C95F5E1F 0000E900 0088FF7F E9FE5689 .V±Õ..¡..Õ...^_èùàO..WV.¡É..ÀúF• 000060
46080E46 88000000 259A006A 006A006A 006A016E 68011368 0676FF08 76FF0000 ...v..v.h..hn.j.j.j.j..%....F..F 000080
1604468D 0A76FF0C 76FF0000 FFFF9A50 16FC468D 0E76FF10 76FF0010 E9037510 .u.Õ...v..v..F•.P......v..v..Få. 0000A0
0A76FF0C 76FF0000 FFFF9A0A 76FF0C76 FF0008E9 03750004 7E830000 FFFF9A50 P......~å.u.Õ...v..v......v..v. 0000C0
FF0008E9 03750004 7E830256 89004689 FA5688F8 46880000 FFFF9A50 16F84680 .F½.P......F½.V'.FÅ.VØ.-å.u.Õ... 0000E0
C40A76FF 0C76FF00 81E90375 02470826 078826F8 5EC40000 FFFF9A0A 76FF0C76 v..v......á^½&..&.G.u.Õ...v..v.á 000100
61680113 680676FF 0876FF00 00FFFF9A 50160846 80026A37 FF260277 FF26F85E ^½&.w.&.7j..FÅ.P......v..v.h..h• 000120
50160846 800035E9 03751046 080E4688 00000F6C 9A501608 46800676 FF006A01 .j..v•.FÅ.P.l....F..F.u.Õ5..FÅ.P 000140
68011368 0676FF08 76FF001A E9037500 003008C4 83007000 909AFC76 FFFE76FF .v±.v•...}..á.=..u.Õ...v..v.h..h 000160
0A76FF0C 76FFFF70 E904F846 830646FF 00000E77 9A016A00 6A0676FF 006A0164 d.j..v•j.j..w....F•.F½.Õp..v..v. 000180
0E59881E 56570000 02C8C8C9 5F5E1F00 00E90000 880000FF FF9A0076 FFD276FF .vØ.vÅ.....¡..Õ...^_èùà...WV.¡Y. 0001A0
FF000000 809A0676 FF0876FF 0060E903 75000800 00FFFF9A 0676FF08 76FFD88E .Å.v..v.......Åu.Õ'..v..v....... 0001C0
06E90374 FE46390A 4688003E E90375FF FE7E83FE 46890000 10019A06 76FF0876 v..v.......F±.~±.u.Õ>..F.9F±t.Õ. 0001E0
```

```
Dump of file SATURN:[PCCOMMON.DUMP.DLL]DAFILTER.TMP;1 on 18-APR-1990 10:41:03.85
File ID (562,30,0)   End of file block 42 / Allocated 44

Virtual block number 13 (00000000), 512 (0200) bytes

 0676FF08 76FF0011 E9037500 003D0000 0E179A06 76FF0876 FF0033E9 0001B800 .j..Õ3..v..v......=..u.Õ...v..v. 000000
 C8CBC95F 5E1F0000 E90000B8 FFB9E9FE 4689FFFF 880006E9 FE468900 000D889A .Ė....F±Õ..j...F±Õ¿.j..Õ...^_èùà 000020
 9A006A00 6A006A00 6A016E68 01226806 76FF0876 FFD88E0F 9E881E56 57000020 ..WV.j...Á.v..v.h".hn.j.j.j.j.. 000040
 C70000FF FF9A5016 FA4680DE 76FF1076 FF0010E9 03751046 080E4688 00001002 ●....F..F.u.Õ...v..v..F'.P.....ú 000060
 9A136A50 16E64680 E276FF0A 76FF0C76 FFE246FF 0003E900 00E446C7 0001E246 Fã..úFõ..Õ...Fã.v..v..vã.Fl.Pj.. 000080
 FFFFCDE9 0003E903 7400E67E 800087E9 0003E903 7500E07E 83E04689 0000FFFF .....FÅ.-Å.u.Õ..Õ...-l.t.Õ..Õë.. 0000A0
 76FF0876 FF005CE9 037500FE 7E830000 FFFF9A50 16FE4680 E276FF0A 76FF0C76 v..v..vã.F±.P......~±.u.Õ\..v..v 0000C0
 33E90375 10460B0E 46880000 11109A50 16E64680 E476FF00 6A016168 01226806 .h".ha.j..võ.Fl.P......F..F.u.Õ3 0000E0
 0676FF08 76FF001A E9037500 003D06C4 830F490F 969AFA76 FFFC76FF E276FF00 ..vã.v=.v'...l..á.=..u.Õ...v..v. 000100
 0000E900 0088FF52 E9E446FF 00000F2C 9A016A00 6AE476FF 006A0164 68012268 h".hd.j..võj.j.......FõÕR.j..Õ.. 000120
 10E90375 0C460B0A 46880001 FE46C7D8 8E1027B8 1E565700 0002C8C8 C95F5E1F .^_èùà...WV.j'..ÁúF±...F..F.u.Õ. 000140
 0676FF08 76FF0035 E9037500 FE7E8300 00FFFF9A 5016FE46 800A76FF 0C76FF00 ..v..v..F±.P......~±.u.Õ5..v..v. 000160
 6A012568 011F6806 76FF0876 FF000011 889A006A 006A016A 006A0125 68011E68 h..h%.j.j.j.j.......v..v.h..h%.j 000180
 6A006A00 6A012568 011E6806 76FF0876 FF0032E9 000011A4 9A006A00 6A006A00 .j.j.j..Ė...Õ2..v..v.h..h%.j.j.j 0001A0
 0010409A 006A006A 016AC06A 01256801 1F680676 FF0876FF 00001180 9A006A00 .j..§....v..v.h..h%.j.j.j.j..ə.. 0001C0
 0A468800 01FE46C7 D88E112D 881E5657 000002C8 CBC95F5E 1F0000E9 000C-800 .j..Õ...^_èùà...WV.j-..ÁúF±...F. 0001E0

Dump of file SATURN:[PCCOMMON.DUMP.DLL]DAFILTER.TMP;1 on 18-APR-1990 1u 41:03.85
File ID (562,30,0)   End of file block 42 / Allocated 44

Virtual block number 14 (0000000E), 512 (0200) bytes

 35E90375 00FE7E83 0000FFFF 9A5016FE 46800A76 FF0C76FF 0010E903 750C4608 .F.u.Õ...v..v..F±.P......~±.u.Õ5 000000
 0676FF08 76FF0000 122F9A00 6A006A01 6A006A01 25680120 680676FF 0876FF00 ..v..v.h .h%.j.j.j.j../....v..v. 000020
 63012068 0676FF08 76FF0032 E9000012 4B9A006A 006A006A 006A0125 68012168 hl.h%.j.j.j.j..K...Õ2..v..v.h .h 000040
 6A016A00 6A012568 01216806 76FF0876 FF000012 649A006A 006A006A 006A0125 %.j.j.j.j..d....v..v.hl.h%.j.j.j 000060
 FFD88E11 D4881E56 57000002 C8C8C95F 5E1F0000 E90000B8 0000116F 9A006A00 .j..o...j..Õ...^_èùà...WV.jå..Á. 000080
 75FFFE7E 83FE4689 0000128A 9A006A00 6AFF6A00 6A016568 0A76FF06 76FF0876 v..v..v.he.j.j.j.j..¤....F±.~±.u 0000A0
 76FF0000 12049A00 6A006AFE 76FF006A 0164680A 76FF0676 FF0876FF 003AE903 .Õ:..v..v..v.hd.j..v±j.j..å....v 0000C0
 0088FFBD E9FE4689 00001216 9A006A00 6AFE76FF 006A0165 680A76FF 0676FF08 ..v..v.he.j..v±j.j.......F±Õ§.j. 0000E0
 031E0102 680676FF 0876FFD8 8E127B88 1E565700 0000C8CB C95F5E1F 0000E900 .Õ...^_èùà...WV.j(..Á.v..v.h...h 000100
 680676FF 0876FF00 0013279A 004F681E 01276806 76FF0876 FF000013 159A004E N.......v..v.h'..hO..'....v..v.h 000120
 0876FF00 00134B9A 0051681E 01286806 76FF0876 FF000013 399A0050 681E0126 &..hP..9....v..v.h(..hQ..K....v. 000140
 00136F9A 0053681E 01086806 76FF0876 FF000013 5D9A0052 681E0124 680676FF .v.h$..hR..]....v..v.h...hS..o.. 000160
 9012739A 0676FF08 76FF0122 68000000 919A0054 681E011C 680676FF 0876FF00 ..v..v.h...hT......h"..v..v..s.. 000180
 739A0676 FF0876FF 01056806 C48313A1 12739A06 76FF0876 FF011368 06C48313 ..á.h...v..v..s.À..á.h...v..v..s 0001A0
 FF000013 D49A006A 006A016A 006A0125 68011E68 0676FF08 76FF06C4 8310ED12 .Ù..á..v..v.h..h%.j.j.j.j..å.... 0001C0
 20680676 FF0876FF 000013ED 9A006A00 6A006A00 6A012568 011F6806 76FF0876 v..v.h..h%.j.j.j.j..Ù....v..v.h  0001E0

Dump of file SATURN:[PCCOMMON.DUMP.DLL]DAFILTER.TMP;1 on 18-APR-1990 10:41:03.85
File ID (562,30,0)   End of file block 42 / Allocated 44

Virtual block number 15 (0000000F), 512 (0200) bytes

 6A006A01 25680121 680676FF 0876FF00 0014069A 006A006A 016A006A 01256801 .h%.j.j.j.j.......v..v.hl.h%.j.j 000000
 8E12F188 1E565700 0000C8C8 C95F5E1F 0000E900 00880000 12949A00 6A006A00 .j.j.......j..Õ...^_èùà...WV.jþ.. 000020
 1452094C 9A0676FF 0876FF0E 76FF1076 FF04C483 143E12E9 9A0676FF 0876FFD8 Á.v..v..Õ.>..á..v..v..v..v..L.R. 000040
 0876FF0E 76FF1076 FF08C483 14660A77 9A0676FF 0876FF0E 76FF1076 FF08C483 .á..v..v..v..v..w.f..á..v..v..v. 000060
 FF08C483 148E0839 9A0676FF 0876FF0E 76FF1076 FF08C483 147A0AD8 9A0676FF .v..Á.z..á..v..v..v..v..9....á.. 000080
 9A0676FF 0876FF0E 76FF1076 FF08C483 14A20BD2 9A0676FF 0876FF0E 76FF1076 v..v..v..v..●.Å..á..v..v..v..v.. 0000A0
 76FF1076 FF08C483 14D00004 9A0676FF 0876FF0E 76FF1076 FF08C483 14860C68 k.Ñ..á..v..v..v..v....Å..á..v..v 0000C0
 76FF0C76 FF0E76FF 1076FF0C C483137F 0E519A06 76FF0876 FF0A76FF 0C76FF0E ..v..v..v..v..Q....á..v..v..v..v 0000E0
 15121125 9A0676FF 0876FF0E 76FF1076 FF0CC483 14FE101F 9A0676FF 0876FF0A ..v..v....±..á..v..v..v. v..%... 000100
 5F5E1F00 00E90000 8808C483 142A11CC 9A0676FF 0876FF0E 76FF1076 FF08C483 .á..v..v..v..v..ä.*..á.j..Ì...^_ 000120
 76FF0000 FFFF9A50 16FC468D 0A76FF0C 76FFD88E 1410881E 56570000 04C8C8C9 èùà...WV.j._.Á.v..v..F•.P......v̄ 000140
 76FF0A76 FF0C76FF FC76FFFE 76FF08C4 83156709 809A0676 FF0876FF 0A76FF0C ..v..v..v..¯.g..á..v±.v•.v..v..v 000160
 D88E152A 881E5657 00002CC8 CBC95F5E 1F0000E9 0CC48314 EA14159A 0676FF08 ..v....õ..á.Õ...^_èùà,..WV.j*..Á 000180
 AF9A5016 D4468001 6A006AFC 5689FA46 890000FF FF9A006A 056A0676 FF0876FF .v..v.j.j.......F¯.V•j.j..Få.P.£ 0001A0
 28F04688 FE4689E4 4628EC46 880000FF FF9A5016 E4468006 76FF0876 FF000015 ....v..v..Fõ.P......Fš+Fõ.F±.Fb+ 0001C0
 4689F801 C22899F6 4628E046 88F84689 F801C228 99FE462B DC4688F6 4689E846 FÒ.F-.FÉ+F±.+öì½.F½.FÁ+F-.+öì½.F 0001E0
```

```
Dump of file SATURN:[PCCOMMON.DUMP.DLL]DAFILTER.TMP;1 on 18-APR-1990 10:41:03.85
File ID (562,30,0)   End of file block 42 / Allocated 44

Virtual block number 16 (00000010), 512 (0200) bytes

 C95F5E1F 0000FFFF 9A026A00 6A006AF4 76FFF876 FF036A00 6A0676FF 0876FFF4 ¶.v..v.j.j..v½.v¶j.j.j.......^_è 000000
 FE5689FC 46890000 ;FFF9A00 6A0676FF 0876FFD8 8E157CB8 1E565700 004EC8CB ùöN..WV.||..Â.v..v.j.......F=.V± 000020
 89000016 619A006A 006A006A 006A0165 68010568 0676FF08 76FF00E1 E90C4688 .f.ÕÅ..v..v.h..he.j.j.j.j..a.... 000040
 5016B846 80505271 LA830000 00022B86 46880168 68010568 0676FF08 76FFB646 FÑ.v..v.h..hh..FÑ+@....ðIRP.F|.P 000060
 80501688 468D0000 FFFF9A50 160A4680 216A0102 680676FF 0876FF00 0013B89A .£....v..v.h..jI.FÖ.P......F|.P. 000080
 77FF26FC 5EC40086 E90000B8 0006E903 7400003D 08C48300 FD008C9A 50160A46 FÖ.P...»..á.=..t.Õ..|..Õ..á^=&.w 0000A0
 B80006E9 0374B446 08B2468B 0000FFFF 9A5016B2 468D5016 B8468027 77FF2629 )&.w'.F|.P.Fý.P......Fý.FÇt.Õ..| 0000C0
 4D14159A 0676FF08 76FF2777 FF262977 FF26FC5E C4B276FF 8476FF00 5BE90001 ..Õ(..vÇ.vý6^=&.w)&.w'.v..v....M 0000E0
 19E90000 FFFF9A01 0268006A 01316800 6A206A06 76FF0876 FF0033E9 0CC48315 ..á.Õ3..v..v.j j.h1.j.h.......Õ. 000100
 0000E900 00B8FFE7 E9FFD0E9 03750005 3DFF17E9 03750001 3D0013E9 0016E900 .Õ..Õ..=..u.Õ..=..u.ÕÅ.ÕÕ.|..Õ.. 000120
 00B80000 FFFF9A00 6A0676FF 0876FFD8 8E1609B8 1E565700 0000C8CB C95F5E1F .^_èùà...WV.|...Â.v..v.j......|. 000140
 16169A00 6A0676FF 0876FFD8 8E1720B8 1E565700 00AEC8CB C95F5E1F 0000E900 .Õ¯..^_èùàÙ..WV.|-..Â.v..v.j.... 000160
 D87E8000 0016769A 50160B46 80216A01 02680676 FF0876FF FC5689FA 46890000 ...F'.V̄=.v..v.h..jI.FÅ.P.v....-Á 000180
 00FFFF9A 206A006A 0055681E 0067681E 0676FF08 76FF016A 006A001E E9037400 .t.Õ..j.j..v..v..hg..hU.j.j .... 0001A0
 86890000 17D99A50 16D8468D 046AFF6A 01686801 05680676 FF0876FF 0103E900 .Õ...v..v.h..hk.j.j..FÅ.P.\..... 0001C0
 0876FF00 00163B9A 006A006A FF5686FF 006A0163 68010568 0676FF08 76FFFF56 V..v..v.h..hc.j..ÑV.j.j..;....v. 0001E0

Dump of file SATURN:[PCCOMMON.DUMP.DLL]DAFILTER.TMP;1 on 18-APR-1990 10:41:03.85
File ID (562,30,0)   End of file block 42 / Allocated 44

Virtual block number 17 (00000011), 512 '(0200) bytes

 16FF5286 8D5016D8 46802777 FF262977 FF26FA5E C404C483 160F12E9 9A0676FF .v..Õ.Õ..á.á^'&.w)&.w'.FA.P..R.. 000000
 86FF2777 FF262977 FF26FA5E C40018E9 0375FF54 860BFF52 86880000 16809A50 P.¯.....R...T.u.Õ..á^'&.w)&.w'.Ñ 000020
 D8468D08 C483184B 00569A50 16FF5886 80007B68 1E0000FF FF9AFF52 B6FFFF54 T..ÑR.......h(...X..P.V.K..á..FÅ 000040
 83165700 109A5016 FF58868D 0083681E 08C48318 5000109A 5016FF58 86805016 .P..X..P...]..á..h....X..P...... 000060
 6A5016FF 5886801D B168FE76 FF0000FF FF9A5016 FE46802B 77FF26FA 5EC408C4 á.á^'&.w+.F±.P......v±hY...X..Pj 000080
 00FFFF9A 50520000 FFFF9A01 02680676 FF0876FF 016A006A 0000FFFF 9A006A00 .j......j.j..v..v.h.......RP.... 0000A0
 E99A0676 FF0876FF D88E1751 881E5657 000000C8 CBC95F5E 1F0000E9 0000B800 .|..Õ...^_èùà...WV.|Q..Å.v..v..Õ 0000C0
 B8000018 9D9A5052 00001896 9A010268 0676FF08 76FF016A 006A04C4 8317E612 .Ì..á.j.j¯.v..v.h.......RP.....| 0000E0
 6A010268 0676FF08 76FF088E 1884881E 56570000 22C8CBC9 5F5E1F00 00E90000 ..Õ...^_èùà"..WV.|Ç..Å.v..v.h..j 000100
 C7260E5E C40000FF FF9A5016 DE46800A 76FF0C76 FF000017 799A5016 DE('9021 I.FB.P.ȳ....v..v..FB.P.....á^.&ú 000120
 0676FF08 76FFD88E 18F2881E 56570000 22C8CBC9 5F5E1F00 00E90000 B800L 07 ...|..Õ...^_èùà"..WV.|·..Å.v..v. 000140
 DE46800A 76FF0C76 FF000107 C7260E5E C4000019 079A5016 DE468021 6A010b.8 h..jI.FB.P.¯....á^.&ú....v..v..FB 000160
 76FFD88E 1936881E 56570000 0AC8CBC9 5F5E1F00 00E90000 B80000FF FF9A5016 .P.....|..Õ...^_èùà...WV.|6..Å.v 000180
 FF9A5016 F646800A 76FF0C76 FF000019 4B9A5016 F6468009 6A011C68 0676FF08 ..v.h..j..F-.P.K̄....v..v..F-.P.. 0001A0
 197A881E 56570000 2CC8CBC9 5F5E1F00 00E90000 B8000107 C7260E5E C40000FF ...á^.&ú...|..Õ...^_èùà..WV.|z. 0001C0
 80000019 8F9A5016 D4468D21 6A012768 0676FF08 76FF0001 07C7260E 5EC4D88E .Áá^.&ú....v..v.h'.]I.FÅ.P...... 0001E0

Dump of file SATURN:[PCCOMMON.DUMP.DLL]DAFILTER.TMP;1 on 18-APR-1990 10:41:03.85
File ID (562,30,0)   End of file block 42 / Allocated 44

Virtual block number 18 (00000012), 512 (0200) bytes

 FC465C00 0AE90000 B80000FF FF9A006A 006A0A76 FF0C76FF 0015E903 7400047E ~å.t.Õ...v..v.j.j......|..ÕÕ..F= 000000
 F84688FA 5689F846 8904C483 1A5000EA 9A5016FC 468004C4 831A1201 6E9A5016 .P.n....á..F=.P.õ.P..á..F½.V'.F½ 000020
 7E83F646 8908C483 18C10304 9A501604 4680F876 FFFA76FF 0041E903 75FA4608 .F'u.ÕA..v'.v½.FÅ.P.Å.è..á..F-.- 000040
 5EC40008 E9FE5689 FC468904 C4831838 01B89AF8 76FFFA76 FF0017E9 037400F6 -.t.Õ...v'.v½.|.B..á..F=.V±Õ..á^ 000060
 FC7E8300 12E90375 003F8326 0E5EC400 0007C726 0E5EC400 08E90000 07C7260E .&ú...Õ..á^.&ú...á^.&.?.u.Õ...~= 000080
 76FF016A 006A0000 FFFF9A02 6A016A00 6A0031E9 0374FFFE 7E83003A E90374FF .t.Õ:..~±.t.Õ1.j.j.j......j.j..v 0000A0
 0011E900 0007C726 0E5EC400 00179D9A 206A006A 0090681E 0096681E 0676FF08 ..v..h...h..j.j .....á^.&ú...Õ.. 0000C0
 00002AC8 CBC95F5E 1F0000E9 00008800 0019F39A FC76FFFE 76FF0A76 FF0C76FF .v..v..v±.v=.µ....|..Õ...^_èùà*.. 0000E0
 50160646 80216A01 26680676 FF0876FF 000107C7 260E5EC4 D88E198E B81E5657 WV.|f..Áá^.&ú....v..v.h&.]I.F=.P 000100
 00008800 001BDC9A 006A006A 0A76FF0C 76FF0015 E9037400 D67E8000 0019DB9A .Û....~=.t.Õ...v..v.j.j..É...|.. 000120
 F8468904 C48318 6A 00EA9A50 16FC468D 04C4831B 38016E9A 5016FC46 8000C3E9 Õù..F=.P.n.8..á..F=.P.õ.j..á..F½ 000140
 C4831A36 03D49A50 16D6468D F876FFFA 76FF002A E90375FA 460BF846 88FA5689 .V'.F½.F'u.Õ*..v'.v½.F=.P.Å.6..á 000160
 000007C7 260E5EC4 0008E9FE 5689FC46 8904C483 1A0501B8 9AF876FF FA76FF08 ..v'.v½.|....á..F=.V±Õ..á^.&ú... 000180
 006A0031 E90374FF FE7E8300 3AE90374 FFFC7E83 0012E903 75003F83 260E5EC4 á^.&.?.u.Õ...~=.t.Õ:..~±.t.Õ1.j. 0001A0
 9A206A00 6A00006B 1E00E368 1E0676FF 0876FF01 6A006A00 001A969A 026A016A j.j......j.j..v..v..hD..h\.j.j . 0001C0
 0000FFFF 9AFC76FF FE76FF0A 76FF0C76 FF0011E9 000007C7 260E5EC4 00001AB1 Ÿ...á^.&ú...Õ...v..v..v±.v=..... 0001E0
```

Dump of file SATURN:[PCCOMMON.DUMP.DLL]DAFILTER.TMP;1 on 18-APR-1990 10:41:03.85
File ID (562,30,0) End of file block 42 / Allocated 44

Virtual block number 19 (00000013), 512 (0200) bytes

```
FF000107 C7260E5E C4D88E1A E4B81E56 5700002A CBCBC95F 5E1F0000 E90000B8 ¡..Õ...^_èùå*..WV.¡Õ..Áá^.&ú.... 000000
0C76FF00 15E90374 00067E80 00001801 9A501606 4680216A 01286806 76FF0876 v..v.h(.]!.F∎.P......-∎.t.Õ...v. 000020
8904C483 1C6C00EA 9A5016FC 46800086 E90000B8 00001CDE 9A006A00 6A0A76FF .v.].j..ß...¡..ÕÑ..F∎.P.õ.l..á.. 000040
185C0304 9A501606 4680F876 FFFA76FF 002AE903 75FA4608 F8468BFA 5689F846 F½.V°.F½.F°u.Õ*..v°.v½.F∎.P.å.\. 000060
07C7260E 5EC40008 E9FE5689 FC468904 C4831B28 01B89AF8 76FFFA76 FF08C483 .á..v°.v½.¡.+..á..F∎.V±Õ..á^.&ú. 000080
0031E903 74FFFE7E 83003AE9 0374FFFC 7E830012 E9037500 3F83260E 5EC40000 ..á^.&.?.u.Õ...-∎.t.Õ:..-±.t.Õ1. 0000A0
6A006A01 28681E01 2E681E06 76FF0876 FF016A00 6A00001B A59A026A 016A006A j.j.j..£...j.j..v..v..h...h(.j.j 0000C0
FFFF9AFC 76FFFE76 FF0A76FF 0C76FF00 11E90000 07C7260E 5EC40000 18C09A20 .ã...á^.&ú...Õ...v..v..v±.v∎... 0000E0
0107C726 0E5EC408 8E1BF388 1E565700 002AC8CB C95F5E1F 0000E900 00880000 ..¡..Õ...^_èùå*..WV.¡µ..Áá^.&ú.. 000100
FF0015E9 03740006 7E800000 1C109A50 16064680 216A0124 680676FF 0876FF00 ..v..v.h$.]!.F∎.P......-∎.t.Õ... 000120
C4831D6E 00EA9A50 16FC4680 0086E900 00880000 FFFF9A00 6A006A0A 76FF0C76 v..v.j.j......¡..ÕÑ..F∎.P.õ.n..á 000140
03D49A50 16D64680 F876FFFA 76FF002A E90375FA 4608F846 8BFA5689 F8468904 ..F½.V°.F½.F°u.Õ*..v°.v½.F∎.P.å. 000160
260E5EC4 0008E9FE 5689FC46 8904C483 1C3A0188 9AF876FF FA76FF08 C4831C5E ^..á..v°.v½.¡.:..á..F∎.V±Õ..á^.& 000180
E90374FF FE7E8300 3AE90374 FFFC7E83 0012E903 75003F83 260E5EC4 000007C7 ú...á^.&.?.u.Õ...-∎.t.Õ:..-±.t.Õ 0001A0
6A017368 1E017968 1E0676FF 0876FF01 6A006A00 001CA79A 026A016A 006A0031 1.j.j.j..Ì...j.j..v..v..hy..hs.j 0001C0
9AFC76FF FE76FF0A 76FF0C76 FF0011E9 000007C7 260E5EC4 00001CC2 9A206A00 .j .ô...á^.&ú...Õ...v..v..v±.v∎. 0001E0
```

Dump of file SATURN:[PCCOMMON.DUMP.DLL]DAFILTER.TMP;1 on 18-APR-1990 10:41:03.85
File ID (562,30,0) End of file block 42 / Allocated 44

Virtual block number 20 (00000014), 512 (0200) bytes

```
76FF0876 FFD88E1C F5B81E56 5700002A CBCBC95F 5E1F0000 E90000B8 00001D2A ∎...¡..Õ...^_èùå*..WV.¡%..Ä.v..v 000000
76FF0000 0E929A50 16F84680 0A76FF0C 76FFFE56 89FC4689 0000175E 9A006A06 .j..^....F∎.V±.v..v..F½.P......v 000020
F876FFFA 76FFD646 8900001E 609A006A 006AFF6A 006A0165 68011368 0676FF08 ..v.h..he.j.j.j.j..m....F∎.v°.v½ 000040
00022BD6 46880168 68011368 0676FF08 76FF0055 E90375FF D67E8300 00FFFF9A ......-∎.u.ÕU..v..v.h..hh..F∎+∎. 000060
FF9A206A 50160846 800A76FF 0C76FF00 001E999A 50160846 8D505220 CA830000 ...ò RP.FÁ.P......v..v..FÁ.Pj .. 000080
D6468900 0017BA9A 006A006A D676FF00 6A016568 01136806 76FF0876 FF0000FF ....v..v.h..he.j..v∎j.j..¤....F∎ 0000A0
10F7881E 56570000 02C8CBC9 5F5E1F00 00E90000 88000107 C7260E5E C4FFA2E9 ÕÅ.á^.&ú...¡..Õ...^_èùå...WV.¡%. 0000C0
76FFFE46 8900001E 339A006A 006A006A 006A0124 68011E68 0676FF08 76FFD88E .Ä.v..v.h..h$.j.j.j.j..3....F±.v 0000E0
CBCBC95F 5E1F0000 E90000B8 000107C7 260E5EC4 0000FFFF 9AFE76FF 0A76FF0C ..v..v±.....á^.&ú...¡..Õ...^_èùå 000100
9A006A00 6A006A00 6A012468 01206806 76FF0876 FF088E1E BEB81E56 57000002 ...WV.¡/..Ä.v..v.h .h$.j.j.j.j.. 000120
00008800 0107C726 0E5EC400 00FFFF9A FE76FF0A 76FF0C76 FFFE4689 00001ED7 ∎....F±.v..v..v±.....á^.&ú...¡.. 000140
001E049A 006A0676 FF0876FF D88E1F07 B81E5657 000020C8 CBC95F5E 1F0000E9 Õ...^_èùå ..WV.¡...Ä.v..v.j..... 000160
01226806 76FF0876 FF000010 589A5016 F846800A 76FF0C76 FFFE5689 FC468900 ..F∎.V±.v..v..F½.P.[....v..v.h". 000180
7E830000 1E419AF8 76FFFA76 FFF64689 00001FC6 9A006A00 6AFF6A00 6A016568 he.j.j.j.j..ó....F-.v°.v½.A....- 0001A0
505213CA 83000000 D22BF646 88016868 01226806 76FF0876 FF0074E9 0375FFF6 -.u.Õt..v..v.h".hh..F-+∎....ò.RP 0001C0
9A5016E0 46805016 E2468027 77FF2629 77FF26FC 5EC40000 20119A50 16E24680 .Fã.P.. ..á^=&.w)&.w'.Fã.P.FÁ.P. 0001E0
```

Dump of file SATURN:[PCCOMMON.DUMP.DLL]DAFILTER.TMP;1 on 18-APR-1990 10:41:03.85
File ID (562,30,0) End of file block 42 / Allocated 44

Virtual block number 21 (00000015), 512 (0200) bytes

```
76FF0876 FF0000FF FF9AE076 FF0A76FF 0C76FF00 0EE90375 00E07E83 0000FF F .....-Á.u.Õ...v..v..vÁ......v..v 000000
C7260E5E C4FF83E9 F6468900 001F209A 006A006A F676FF00 6A016568 0122680 .h".he.j..v-j.j.. ....F-Õ..á^.&ú 000020
0E76FF10 76FFD88E 1F50881E 56570000 00C8CBC9 5F5E1F00 00E90000 88000107 ...¡..Õ...^_èùå...WV.¡P..Ä.v..v. 000040
0006E903 74003F83 260E5EC4 0CC48320 7818EA9A 0676FF08 76FF0A76 FF0C76FF .v..v..v..v..õ.( .á.á^.&.?.t.Õ.. 000060
0CC4831D 60192E9A 0676FF08 76FF0A76 FF0C76FF 0E76FF10 76FF01BE E90000B8 ¡..Õf..v..v..v..v..v..v....'..á. 000080
76FF0A76 FF0C76FF 0E76FF10 76FF0192 E90000B8 0006E903 74003F83 260E5EC4 á^.&.?.t.Õ..¡..Õ...v..v..v..v..v 0000A0
76FF0166 E90000B8 0006E903 74003F83 260E5EC4 0CC48320 D319729A 0676FF08 ..v..r.£ .á.á^.&.?.t.Õ..¡..Õf..v 0000C0
74003F83 260E5EC4 0CC48320 FF19869A 0676FF08 76FF0A76 FF0C76FF 0E76FF10 ..v..v..v..v..v..Ñ.. .á.á^.&.?.t 0000E0
2B1BEB9A 0676FF08 76FF0A76 FF0C76FF 0E76FF10 76FF013A E90000B8 0006E903 .Õ..¡..Õ:..v..v..v..v..v..v..$.+ 000100
FF0C76FF 0E76FF10 76FF010E E90000B8 0006E903 74003F83 260E5EC4 0CC48321 !.á.á^.&.?.t.Õ..¡..Õ...v..v..v.. 000120
E90000B8 0006E903 74003F83 260E5EC4 0CC48321 571ADC9A 0676FF08 76FF0A76 v..v..v..É.W!.á.á^.&.?.t.Õ..¡..Õ 000140
260E5EC4 0CC48321 831CED9A 0676FF08 76FF0A76 FF0C76FF 0E76FF10 76FF00E2 ã..v..v..v..v..v..v..Ú..!.á.á^.& 000160
0676FF08 76FF0A76 FF0C76FF 0E76FF10 76FF00B6 E90000B8 0006E903 74003F83 .?.t.Õ..¡..ÕÑ..v..v..v..v..v..v. 000180
0E76FF10 76FF008A E90000B8 0006E903 74003F83 260E5EC4 0CC48321 AF1DEF9A .ÿ.É!.á.á^.&.?.t.Õ..¡..Õ...v..v. 0001A0
0006E903 74003F83 260E5EC4 0CC48321 DB1F489A 0676FF08 76FF0A76 FF0C76FF .v..v..v..v..H.Ü!.á.á^.&.?.t.Õ.. 0001C0
0CC48322 071EB69A 0676FF08 76FF0A76 FF0C76FF 0E76FF10 76FF005E E90000B8 ¡..Õ^..v..v..v..v..v..v..Ñ..".á. 0001E0
```

```
Dump of file SATURN:[PCCOMMON.DUMP.DLL]DAFILTER.TMP;1 on 18-APR-1990 10:41:03.85
File ID (562,30,0)   End of file block 42 / Allocated 44

Virtual block number 22 (00000016), 512 (0200) bytes

 76FF0A76 FF0C76FF 0E76FF10 76FF0032 E90000B8 0006E903 74003F83 260E5EC4 á^.&.?.t.Ô..¡..Ô2..v..v..v..v..v 000000
 00B80006 E90000B8 0006E903 74003F83 260E5EC4 0CC48320 4F1EFF9A 0676FF08 ..v....O .á.á^.&.?.t.Ô..¡..Ô..¡. 000020
 86890000 B80001FF 5686C7D8 8E2036B8 1E565700 00AEC8C8 C95F5E1F 0000E900 .Ô...^_èuàÜ..WV.¡6 .Aú.V...¡.... 000040
 6B0676FF 0876FF'C 5689FA46 8900001F 509A006A 0676FF08 76FFFF52 8689FF54 T...R..v..v.j..)....F'.V•.v..v.h 000060
 000018D4 9A010268 0676FF08 76FF016A 006A0000 1D129A50 16084680 216A0102 ..jI.FA.P.....j.j..v..v.h...å... 000080
 681E01CD 681E0676 FF0876FF 016A006A 001EE903 7400087E 80000018 D89A5052 RP.Ü....-Á.t.Ô..j.j..v .v..he..h 0000A0
 86805016 08468027 77FF2629 77FF26FA 5EC400E4 E900001D C49A206A 006A018C ¥.j.j .á...Ôô.á^'&.w)&. ı'.FÁ.P.. 0000C0
 77FF2629 77FF26FA 5EC40073 E90374FF 548608FF 52868800 0018029A 5016FF52 R..P.......R...T.t.Ôs.á ?'.w)&.w 0000E0
 468008C4 83230C00 569A5016 FF58868D 01E1681E 0000FFFF 9A5016FF 52868027 '..R..P......hÅ...X..P.V..#.á..F 000100
 1D3C0010 9A5016FF 58868001 E9681E08 C483231E 00109A50 16FF5886 80501608 Ä.P..X..P....#.á..hÔ...X..P...<. 000120
 5016FF58 86801DB1 68FE76FF 0001B6F 9A5016FE 46802877 FF26FA5E C408C483 .á.á^'&.w+.F±.P.o....v±hÝ...X..P 000140
 202E9A06 76FF0876 FFFF52B6 FFFF54B6 FF5016FF 56868000 0018849A 006A006A j.j........V..P.ÑT..ÑR..v..v...  000160
 76FF08C4 83238709 B09A0676 FF0876FF 2777FF26 2977FF26 FA5EC40C C4832379 y#.á.á^'&.w)&.w'.v..v..¯..#.á..v 000180
 31B81E56 5700002‹ C8C8C95F 5E1F0000 E90000B8 04C48320 A718AC9A 0676FF08 ..v..¯.I .á.¡..Ô...^_èuà,..WV.¡1 0001A0
 46890000 224F9A00 6A0676FF 0876FFD4 46890646 890000B8 0001D846 C7D88E22 ".ÁúFÁ..¡...F•.Få.v.¯v.j..O"...F 0001C0
 E9037500 DA7E8000 00226A9A 50160A46 80216A01 02680676 FF0876FF FE5689FC •.V±.v..v.h..jI.FÖ.P.j"...~Ö.u.Ô 0001E0

Dump of file SATURN:[PCCOMMON.DUMP.DLL]DAFILTER.TMP;1 on 18-APR-1990 10:41:03.85
File ID (562,30,0)   End of file block 42 / Allocated 44

Virtual block number 23 (00000017), 512 (0200) bytes

 08044688 000022C5 9A501604 46805016 DA468027 77FF2629 77FF26FC 5EC40053 S.á^•&.w)&.w'.FÖ.P.Få.P.é"...Få. 000000
 16084680 000022E8 9A501604 46802777 FF262977 FF26FC5E C40015E9 03740646 F•t.Ô..á^•&.w)&.w'.Få.P.Ô"...FÁ. 000020
 5EC40023 E9037500 D87E830C C4832360 202E9A06 76FF0876 FFD476FF D676FF50 P.v•.vå.v..v... '#.á..~Á.u.Ô#.á^ 000040
 00173A9A 016A0676 FF0876FF 0000FFFF 9AD476FF D676FF27 77FF2629 77FF26FC •&.w)&.w'.v•.vå......v..v.j..:.. 000060
 46880178 E90E4688 D88E239F 881E5657 000004C8 C8C95F5E 1F0000E9 00008800 .¡..Ô...^_èuà...WV.¡.#.Á.F.Ôx..F 000080
 006A1076 FF1276FF 04C48324 8F15749A 1076FF12 76FFFE56 89FC4689 08568806 ..V..F•.V±.v..v..t.¢$.á..v..v.j. 0000A0
 1315229A 1076FF12 76FF2777 FF262977 FF26FC5E C40000FF FF9AFC76 FFFE76FF .v±.v•.....á^•&.w)&.w'.v..v..".. 0000C0
 0139E900 0022839A ,0520000 227C9A01 02681076 FF1276FF 016A006A 08C48325 X.á.j.j..v..v.h...|"..RP.."..Ô9. 0000E0
 46880118 E9000022 A79A206A 006A01F3 681E01F8 681E1076 FF1276FF 016A006A j.j..v..v..h½..hµ.j.j .Ï"..Ô...F 000100
 0BE9000E E90011E9 G8C48325 5116019A 1076FF12 76FF0A76 FF0C76FF 001DE90A .Ô...v..v..v..v....Q%.á.Ô..Ô..Ô. 000120
 89FC4689 000023BA 9A006A10 76FF1276 FF00EAE9 FFEFE9FF D8E90375 01053000 .=..u.ÔÜ.Ôy.Ôô..v..v.j..¤#...F•. 000140
 1076FF12 76FF000C E99904C4 83256323 979A1076 FF1276FF 0060E90A 468BFE56 V±.F.Ô'..v..v...#c%.á..ÔÉ..v..v. 000160
 76FF0088 E99904C4 83258717 259A1076 FF1276FF 00CAE999 04C48325 7522299A .)"u%.á..Ôô..v..v..%..%.á..Ô¡..v 000180
 E99904C4 83243018 AC9A1076 FF1276FF 00A6E999 04C48325 9917499A 1076FF12 ..v..I..%.á..ÔI..v..v..¯.0$.á..Ô 0001A0
 FF88E903 75013130 FF84E903 75000230 FFAAE903 75000130 002BE900 2EE90094 ..Ô..Ô+.=..u.Ô¯.=..u.ÔÇ.=1.u.Ô.. 0001C0
 FF0E76FF 1076FF12 76FF0043 E9FFCFE9 FFC0E903 75013530 FFB6E903 75013230 =2.u.ÔÑ.=5.u.Ôá.Ôu.ÔC..v..v..v.. 0001E0

Dump of file SATURN:[PCCOMMON.DUMP.DLL]DAFILTER.TMP;1 on 18-APR-1990 10:41:03.85
File ID (562,30,0)   End of file block 42 / Allocated 44

Virtual block number 24 (00000018), 512 (0200) bytes

 2230FF31 E9037500 20300023 E90043E9 0000262F 9A0676FF 0876FF0A 76FF0C76 v..v..v..v../&..ÔC.Ô#.= .u.Ô1.=" 000000
 FF1076FF 1276FFFF B0E9FE68 E9037500 3B30FEF0 E9037500 3030FEDA E9037500 .u.ÔÔ±=0.u.Ôþ±=;.u.Ôh±Ô§..v..v.. 000020
 00419000 0ECAC95F 5E1F0000 E90000FF FF9A0676 FF0876FF 0A76FF0C 76FF0E76 v..v..v..v..v......Ô...^_èô...A. 000040
 02E10004 1F730203 00610004 0EE60203 00E10004 09E10203 03000006 23300203 ..0#..Å...Å...Å...I...a.¯.s...Å. 000060
 00820001 04160103 00000002 24930002 035F0005 000C0203 01660004 11F40203 ..¶...f...É..._.....$............ 000080
 01F20004 0C140203 00F10004 24180203 00000004 22F90002 006D0004 0EB60203 ..Ñ...m...•"......$..þ.......·. 0000A0
 007F0003 1F8C0103 007E0003 24500103 00030002 042F0103 02720004 19630203 ..c...r.../.......]$..~......... 0000C0
 02F80004 1FF70203 007A0004 153A0203 01790004 1F310203 00000006 24740002 ..t$......1...y...:...z...¥...«. 0000E0
 03E90007 0FB80203 00080003 15F80103 00870003 23050103 00860003 13030103 ..........(#......½.......£...Ô. 000100
 03F00007 0FEE0203 00880003 24F70103 008A0003 10A90103 01010004 18270203 ..'.......`.......¼$......Ÿ...Þ. 000120
 020E0004 1B190203 00130003 24020103 018A0084 08780203 02880004 0B1A0203 ..........(.......Ø$............ 000140
 01120004 0A180203 00190003 15880103 008F0004 10800203 03F70007 0FC60203 ..ó...¥......................... 000160
 001F0003 25380103 001E0003 24A70103 03120004 24500203 001A0003 159F0103 ..........P$......Ì$......8%.... 000180
 03220004 23F80203 02A00004 199F0203 038E0006 23450203 04020007 0FA90203 ..`.......E#..............½#..". 0001A0
 00A60004 1FE00203 01A^0004 1ACD0203 01250004 19170203 04080007 1F9A0203 ..............X...ë...Ì...Á...Ì. 0001C0
 02860004 1E1A0203 00330004 0F110203 00830003 25EC0103 02280004 00''0203 ..F...(...$X..°.......3.......Ñ. 0001E0
```

Dump of file SATURN:[PCCOMMON.DUMP.DLL]DAFILTER.TMP;1 on 18-APR-1990 10:41:03.85
File ID (562,30,0) End of file block 42 / Allocated 44

Virtual block number 25 (00000019), 512 (0200) bytes

```
01C00004 0CAD0203 00450003 16FA0103 00BD0004 10AE0203 01360004 114D0203 ..M...6...Û...§...'...E...Û...å. 000000
004D0004 0EA20203 004D0003 24D90103 02420004 1DE00203 00410004 0F870203 ......A...Â...B...]$..M...Å...M. 000020
025A0004 0AB90203 014F0004 1EE80203 02CD0004 1E7F0203 00CD0004 0EC60203 ..ó...e........è...Ò...O...¿...Z. 000040
01C90001 8B1F0002 3EB9088E FFFFB81E 00000000 00000000 01DA0004 1C280203 ..(...Ò..........|...Á.>...|..Ù. 000060
00000000 00000000 00000000 00000000 00000000 00000000 00000500 02000200 ................................ 000080
2BD1F7AE F2FFFFB9 0A7EC4FF 758DAEF2 FFFFB9C0 33067EC4 1EDE8BD7 8BEC8B55 U.§.a.B.á-.3â¿...Û.U.á-.¿...ÛÄI+ 0000A0
8BF38BA4 F3C913A5 F3E9D149 A4027400 01C6F706 468BFE87 08468ED8 8EC08GF9 '.â.Ä.F...z.F.%6..t.ÊIÎÔµÊ.èµÊ.µ. 0000C0
D1F7AEF2 FFFFB9C0 33C08ED8 8CFE8B0A 76C51EDE 8BD78BEC 8B55C85D C28C1FFA '..ô]ùU.§.a.B.év..z.Á.â3â¿...ÜÄI 0000E0
8BEC8B55 C85DC28C 1FFA8BF3 8BA4F3C9 13A5F3E9 D149A402 7401A8C7 8B067EC4 á~..ú´.t.ÊIÎÔµÊ.èµÊ.µ.'..ô]ùU.§. 000100
8B1FFFFF 1DC01805 74A6F3F9 2BD1F7AE F2FFFFB9 C0330A7E C40676C5 1EDE8BD7 a.B.év.á-.3â¿...ÜÄI+'µIt..â..... 000120
8B5500C8 5DFA8B91 4901F7AE F2FFFFB9 C033067E C4D78BEC 8B5500C8 5DFA8BF3 µ.']ù.U.§.aá-.3â¿...ÜÄI]..']ù.U. 000140
2E9A0000 09C80603 E9087EC5 1E990175 0AF983D2 33064688 0C4E8801 835756EC šVW"..N..F.3ø.'.u...é~.Ô..à..... 000160
5016F946 8DFA5689 F8468902 30161802 2E062802 57882607 8B26065E C4011304 ...á^.&..&.W.+.....0..F½.V'.F½.P 000180
FF377400 02323E83 9045EB99 C0280675 000BFE56 89FC4689 04C48301 3802769A .v.8..á..F=.Vz.Äu.+â.ŠE..>2..t7. 0001A0
9A5016F8 468D00FA 56830E10 F8468125 74C00804 C4830152 05089AFC 76FFFE76 vz.v=...R..á..âtX.F½...V'..F½.P. 0001C0
8B55C8C9 FE5688FC 46880001 1047C726 FC5EC4FE 5689FC46 8904C483 FFFF0276 v....á..F=.Vzâ^=&ÙG....F=.VzèùJ. 0001E0
```

Dump of file SATURN:[PCCOMMON.DUMP.DLL]DAFILTER.TMP;1 on 18-APR-1990 10:41:03.85
File ID (562,30,0) End of file block 42 / Allocated 44

Virtual block number 26 (0000001A), 512 (0200) bytes

```
50F8468A 50F4468A 50F5468A 50F6468A 00B40000 FFFF9A50 16F4468D 0CEC83EC $.$..F¶.P.....Ç..F-P.F%P.F¶P.F%P 000000
02578926 065EC40A 7400087E 830CC483 00F105D6 9A50078C 2DFA468B 50F9468A .F'P.F'-¥.P.ø.þ..á..-..t.á^.&.W. 000020
83261C7C 00027F83 5237C00 3F832606 5EC45657 000008C8 00CB5DE5 88078926 &...|]ù.à...WVá^.&.7.|#&....|.&. 000040
81E999FF FFB80A7D ..0A7F83 26077C00 087F8326 0E7C0006 7F832615 7C00047F ...|.&....|.&....|.&...P).|...Ô. 000060
03478826 0A470126 F9F7000C 89990847 8826197C 0C087F83 26065EC4 90909000 ....á^.&....|.&.G..¿..%'&.G.&.G. 000080
0A478826 50400847 88260677 FF260477 FF260277 FF2637FF 26085789 26F9F799 .%'&.W.&.7&.w.&.w.&.w.&.G.ƏP&.G. 0000A0
8904C483 019E00EA 9A5016F8 468DFA56 89F84689 0CC48302 4A05069A 5000502D -P.P.ø.J..á..F½.V'.F½.P.ô....á.. 0000C0
88F8468B 1FA5F200 09B90A8E 1EF088F8 88FE5688 065EC491 74D00BFE 5689FC46 F=.Vz.Ät.á^..Vz.«.Þ..Ö¿...E..F½. 0000E0
0673A600 3F812607 7C0F7F12 CE027F81 26065EC4 56570000 0EC8CBC9 5F5EFA56 V'^ èùà...WVá^.&...ó...|.&.7.ls. 000100
51806801 6A021AA3 02BF0948 9A37FF26 0277FF26 33806801 E1680194 E999C02B +â.Ô..hÄ.h.3&.w.&.7.H.¢.Ê..j.h.Q 000120
FF260277 FF26065E C4338068 01E16802 DA09E49A 505299F0 8BF9F700 04B99940 ə.¿..%'.Þ.RP.ô.Ô.hÄ.h.3á^.&.w.&. 000140
813380FA 468126E8 FC5689FA 4689F456 18F24628 03650A18 9AF45689 F2468937 7.F·.V¶...e.+F·.V¶.F'.V=Š&.F'.3. 000160
021A0EFF 4E01FC56 835180FA 46810A75 D20BF9F7 00048999 40021AA1 01E1FC56 V=Ä.À..ə.¿..%'.Øu..F'.Q.V=.N.... 000180
00648999 021AA11F 75D20BF9 F7000489 99021AA1 07B2021A 0681047C 00FC7E83 .-=.|â....ý.À...¿..%'.Øu.À...¿d. 0001A0
5E8CF646 89078288 03E80798 88057502 08F9F701 90899902 1AA10075 D20BF9F7 %'.Øu.À...¿..%'.Øu.¡..Š.¡ý..F-.^ 0001C0
80518068 016A021E A3037709 489AFA76 FFFC76FF 51806801 6A076C02 1A2E81F8 ½....l.j.h.Q.v=.v'.H.w.Ê..j.h.Q. 0001E0
```

Dump of file SATURN:[PCCOMMON.DUMP.DLL]DAFILTER.TMP;1 on 18-APR-1990 10:41:03.85
File ID (562,30,0) End of file block 42 / Allocated 44

Virtual block number ?7 (0000001B), 512 (0200) bytes

```
05C28CC3 881F7D02 47392602 1EA1F65E C4000102 1806C703 CE09209A 5016FA46 F'.P. .ö.ú.....á^-À..&9G.)..ü.ô. 000000
180EFF02 1EA1F17C 05392602 1EA10218 06FF02C7 83F27EC4 F45689F2 46890002 ...F·.V¶á~·.ú.....À..&9.|þÀ..... 000020
03E00948 9AFA76FF FC76FF0E 1068006A 0216A301 2826F65E C4E7D102 183E8802 ..>..iÓá^-&+.Ê..j.h...v=.v'.H.Å. 000040
0109489A FA76FFFC 76FF3C6A 006A03EF 09209A50 16FA468D 0E106800 6A0214A3 Ê..j.h...F'.P. .ÿ.j.j<.v=.v'.H.. 000060
021E0603 016D021A 06690210 A302370A 189AFA76 FFFC76FF 3C6A006A 0212A304 .Ê..j.j<.v=.v'...7.Ê..i...m..... 000080
3E83C8C9 5F5EDA8C 02108800 00022006 C7021C16 89F9F700 07899963 CA2DC603 .ó·ôc.¿..%'....ú. ...|...Ö^_èù.> 0000A0
8904C483 0477088E 9A022268 1E560000 06C8CB0A F406FF00 05E80E08 75000AF4 ¶..u..Ô....¶.ùà...V.h"....w.á.. 0000C0
023636FF 5006036A 009CE903 75003F80 26FA5EC4 00A8E903 75D008FC 5689FA46 F'.V=.Äu.Ô´.á^'&.7.u.Ô..j..P.66. 0000E0
0498088A 9AFA76FF FC76FF03 FA46830E 1068006A 0AC48304 8E08609A 023436FF .64..'....á.j.h...F'..v=.v'..... 000100
98008A26 1C740038 8026FA5E C4F62802 30168902 2EA304E6 09E49A50 5204C483 .á.RP.ô.|.Ê....0.+-á^'&.B.t.&... 000120
74003880 26FA5EC4 0B7C03FE 83460675 2D388026 FA5E8809 75040697 87F6D888 .Ä-....u..^'&.8·u.F.z.|Uá^'&.8.t 000140
1EC49009 E80AC483 02A60860 9A023836 FF023A36 FF5052C6 03C28CC3 88036A1D .j..ù.ô.óRP.6:..68..'.|..á.Š..á. 000160
065EC456 000006C8 90CBC95E 0232A340 C018013F 80260238 1EC40007 C6260238 8.&ó..á.8.&.?..âəÊ2.^èù.à...Vá^. 000180
09087F83 260A7E03 087F8326 00ADE903 7E09087F 83260087 E9037D03 087F8326 &....).Ôñ.&....-.ÔU.&....-.&.... 0001A0
E3D1085F 88261075 03087F83 26177E07 C2FE8107 6CC6810A 77882600 81E9037D ).Ô..&.w..ól..±ô.-.&....u.&._.iD 0001C0
03750003 C6F7FA46 89078487 88E3D108 5F882606 5E88900E E8000705 07828788 ..ý....Š...^.&._.iD..Ç..F'%ó..u. 0001E0
```

```
Dump of file SATURN:[PCCOMMON.DUMP.DLL]DAFILTER.TMP;1 on 18-APR-1990 10:41:03.85
File ID (562,30,0)   End of file block 42 / Allocated 44

Virtual block number 28 (0000001C), 512 (0200) bytes

 05C10301 6DCE69FA 4603F9F7 0004B999 01448046 EE830A77 8B26065E C4FA46FF .F*á^.&.w..ŸF.D..¿..%*.F*iom..è. 000000
 26227509 7F0E4739 26157503 087F8326 FE4689C2 2BFA4688 F9F70007 B9990004 ...¿..%*.F*+ó.F±&....u.&9G...u"& 000020
 7C01047F 83260775 EE7C0E47 3926FE46 8B065EC4 9018EB00 01BB1B7C 02047F83 ....|.¡..Š..á^..F±&9G.|Ÿu.&....| 000040
 505299F9 F70004B9 99034480 51806801 6A06768B 56570000 20C8CBC9 5EC02BE5 |+â^èùà ..WV.v.j.h.Q.D..¿..%*.RP 000060
 0775D208 F9F70004 8999C688 07B08F88 E301085E 88EC5689 EA468906 2409E49A .ô.$..Fõ.V$.^.iD.¢¯..ó.¿..%*.®u. 000080
 0C468BC8 8B0E1068 006A063E 09E49A50 52990E46 883C6A00 6A47017E 02087E83 .-..-.Gj.j<.F..RP.ô.>.j.h...à.F. 0000A0
 C3030160 DE690A46 88C88B51 8068016A 066009E4 9AE65E89 E44E8950 52990A8B .Ö.RP.Nô.^Ì.ô.'.j.h.Q.à.F.iBm..û 0000C0
 C88BE656 13E44603 E25613E0 46030693 09E49AE2 5E89E04E 89505299 DA8BC703 .ú.Ö.RP.NÀ.^ã.ô....FÀ.Vâ.Fô.VÌ.à 0000E0
 FC4689C7 030A468B EC5E11EA 4E0112CE D381A600 C181DA13 C803990A 8B10468B .F..Ö..à.Ö.è.Ì.Æö..Nõ.^š.F..ú.F= 000100
 8BF64689 48084688 F8468950 4480EC56 11EA4601 02301688 022EA106 C4042E9A ...á.À....O..Fõ.V$.DP.F%.F.H.F-. 000120
 EA6E8109 74C00804 C483044A 05089A50 16EE4680 1A740002 323E83F2 46890C46 F..F·.>2..t..FŸ.P...J..á..át..nõ 000140
 071E570A 7EC51E08 56880646 880E4E88 CBC95F5E EC5688EA 468800EC 5E830E10 ...^š..Fõ.V$^_èu.N..F..V..ê~.W.. 000160
 C00BD233 92F788DA F7000283 D8F7AA20 800A79D2 080E750A F9831374 C00A93FC =..ât..*.u..®ÿ.¯-¨%Ü.®.%Ö.%.3®.á 000180
 880586AC 4F0588E2 75C308C2 88AA2704 0276393C 3004D387 92F1F793 F1F70274 t.%þ.%þ..Æ.0<9v..'¨.ô.ùuã..O¨... 0001A0
 00FFFF9A 5016C488 50EC8855 00CB5DE5 885E5F1F 58DA8CF2 72C73801 448DFF44 D..D.;úr·.ÒX._^.Ì]ù.U.$P.á.P.... 0001C0
 8805F308 AA9A0350 E80021E8 0000FFFF 9A027868 1E027A68 1E07D8A3 E0865800 .X.ÀÈÀ..hz..hx̄......Ò1.ÒP..¯.µ.¡ 0001E0

Dump of file SATURN:[PCCOMMON.DUMP.DLL]DAFILTER.TMP;1 on 18-APR-1990 10:41:03.85
File ID (562,30,0)   End of file block 42 / Allocated 44

Virtual block number 29 (0000001D), 512 (0200) bytes

 068EFF33 0000BB1E 028016FF 00FF6807 7A082A9A 076D07D6 9A50CB5D E5880001 ...Ì]üP.®.m..*.z.h.......£..3... 000000
 330874CA 88A6F3CB 88D18B06 84BE3174 003D8026 47017500 3D80267F FFB9027A z.¿..&.=.u.G&.=.t1/...i.ùµÌ.òt.3 000020
 C20A0572 412CAC92 04E0C00E 72412CAC 07DF8F1F F788071E 061CE8E7 74AEF2C0 à·ÜtÒŠ.....¥.¢Ò.¯,Ar.àÀ..¯,Ar..ô 000040
 00FF6806 921EFF04 74000694 3E83077F 082A9A50 00FC88EC 885500C3 1FEDEBAA ¨ŠÜ.ù.U.£¡=.P.*....>...t.....¡.. 000060
 74C23BAD 0A1C8E06 5688C08E D88EFFFF 885756EC 8855CB5D E58B07E0 082A9A50 P.*.À..Ì]ùU.$VW¡...Ä.â.V./..Ù;ôt 000080
 76FF57EC 8B550002 CA5DE588 5E5F96E8 EBF788AE F2FFFF89 C033970C 74964010 .a.t..3à¿..·Ü.%$Š._^.Ì]ò..U.$W.v 0000A0
 521E5300 028BC488 5049D1F7 AEF2FFFF 89C033FA 88921F74 C00807F4 07FA9A06 ..*.¶..ât...*3à¿..¯Ü4ÌÌP.á£..S.R 0000C0
 4E88DF88 0A76C506 7EC41E56 57EC8855 0002CA5D E58B5F58 0000FFFF 9A501651 Q.P.....[_.Ì]ò..U.$WV.á-.év..Ô.N 0000E0
 06C80005 8FE9CB5D E58B5F5E 1FC28CC3 88AAF3C0 32F8E2AA 0374C00A AC0CE30E .D.¯.ât.¯ã½2âµ¯.ù.ô.^_.Ì]ùÕ...à. 000100
 FF0876FF 6E740846 08064688 7674C208 FC5689FA 468909E7 168809E5 A1560000 ..VÀÌ...Ô..F*.V=.ötv.F̄..F.tn.v.. 000120
 4A740247 08260788 26FA5EC4 04FA4683 909006EB F08804C4 83080A00 869A0676 v..Ñ.Ö..á..ÞŠ....F*.á^*&..&.G.tJ 000140
 56017530 3880261F C426FA5E C4DD7EC6 3B04C483 090300B6 9A37FF26 0277FF26 &.w.&.7.Ñ....á.;ó~1á^*&á.&.8=uÌV 000160
 26FA5EC4 B475C008 0AC48308 340DE09A 37FF2602 77FF26FA 5EC40676 FF0876FF .v..v.á^*&.w.&.7.À.4..á..âuÇá^*& 000180
 0277FF26 0A76FF0C 76FF065E C4EC8855 CBC95E99 C02B9004 EBC28C01 408D1FC4 á..a..óŠ..+à.^èÙU.$á^..v..v.&.w. 0001A0
 FF335356 57EC8855 0008CA5D E5880789 26025789 26065EC4 08B50A18 9A37FF26 &.7...ç.á^.&.W.&...Ì]ò..U.$WVS3. 0001C0
 47117DC0 080C4688 06568908 46890000 1DDAF7D8 F706568B 47117DC0 0008468B .F..â).G.V.%A%O....F..V..F..â).G 0001E0

Dump of file SATURN:[PCCOMMON.DUMP.DLL]DAFILTER.TMP;1 on 18-APR-1990 10:41:03.85
File ID (562,30,0)   End of file block 42 / Allocated 44

Virtual block numb · 30 (0000001E), 512 (0200) bytes

 0E58F1F7 D2330846 880A4E88 1575C008 0A56890C 46890000 1DDAF7D8 F70A568B .V.%A%O....F..V..âu..N..F.30%þ.À 000000
 F4750BC8 D8D1EAD1 D9D1EBD1 06468808 56880A4E 88D88838 EBD388F1 F706468B .F.%þ.£$8.A.N..V..F.ÌŠÌÌÌõiÀ.Ùu¶ 000020
 D2334E01 7606463B 06720777 0856380C 72D103E6 F70A4688 910C66F7 F08BF1F7 %þ.Þ%f...F.%Ì.Ìr.;V.w.r.;F.v.N3® 000040
 8BD8080C 5E880846 88EC8855 0008CA5D E5885F5E 58000A83 D8F7DAF7 07754F96 .Ou.%O%À.Ö.[^_.Ì]ò..U.$.F..^..À. 000060
 E3F70646 8BC8030C 66F70646 8BC88BE3 F70008CA 5DE588E3 F706468B 08750A5E ^.u..F.%D.Ì]ò¯.%D.à.F.%f..à.F.%D 000080
 001DDAF7 D8F70656 8847117D C0080846 88FF3357 53EC8855 0008CA5D E58B0103 .Ì.Ì]ò..U.$SW3..F..â).G.V.%A%Ö.. 0000A0
 C00B0A56 890C4689 00001DDA F7D8F70A 5688107D C0080C46 88065689 08468900 ..F..V..F..â)..V.%A%Ö....F..V..â 0000C0
 8B0A4E8B D8884BEB 43794FD2 33C28BF1 F706468B F1F7D233 0546380A 4E881875 u..N..F.30%þ.F.%þ.ó30OyCŠH.À.N.. 0000E0
 0C72D103 0A66F791 0C66F7C8 8BF1F7F4 75D80808 D1EAD1D9 D1EBD106 46880856 V..F.ÌŠÌÌÌõiÀ.Ùu¶%þ.à%f..%f..Ìr. 000100
 8308F7DA F707794F 08561806 46280C56 180A462B 06760646 3B087207 7708563B ;V.w.r.;F.v.+F..V.+F..V.Oy.%O%À. 000120
 FFFF9A52 16501653 C48B50B7 07DFA780 D48B5200 02880008 CA5DE58B 5B5F000A Ô._[.Ì]ò..£..R.À.ÌÔ.ñP.áS.P.R... 000140
 080E8B5A D4794807 DF8F0808 81067500 02300774 00013040 B1127558 C00B0000 ...¯âxu.Ÿâ=..t.=..u.Ÿ...Ô.KyâZ... 000160
 061EFF00 038BC28C 0A0E06C4 01AEE903 730A061E FFD833C2 8C0A0A06 C41EE30A .D.á....ó3U....s.ÒÙ.á... ô£..... 000180
 37680E01 6A08740A 123D0A12 880073E8 0A128F0A 128E007C E80A128F 0A128E0A ./..¢..Ò|./..¢..Òs.¡..=....j..h7 0001A0
 00000832 9A006A00 6*036A00 51E80A12 8F0A128E 088E0800 88C30000 FFFF9A08 ......Ù¡...À/..¢..ÒQ.j.j.j..2... 0001C0
 0A128F0A 128EEC88 5503E800 31E80A12 8F0A128E 003AE80A F68F0AF6 BEEC8855 U.$/-.¢-.Ò:./..¢..Ò1.Š.U.$/..¢.. 0001E0
```

```
Dump of file SATURN:[PCCOMMON.DUMP.DLL]DAFILTER.TMP;1 on 18-APR-1990 10:41:03.85
File ID (562,30,0)   End of file block 42 / Allocated 44

Virtual block number 31 (0000001F), 512 (0200) bytes

 02B807E3 0A080E8B 0000FFFF 9A500646 8A50C033 001AE80A 128F0A12 BE00.. 8 Ò#./..¢..Ò..3àP.F.P.........D.£. 000000
 56570000 14C800C3 EEEB10FF F2740245 0B058B04 EF830E73 F73BC30A 061EFF.  .....ù;¼s..y....E.t·..ŠYû.à...WV 000020
 6AF85689 F6468 9F2 5689F046 89C02B02 7A1688 00 F0E90375 027A3639 FF2BF62b +-+.96z.u.Ðb...z.+à.Fb.V·.F-.V½j 000040
 BCE90376 7FFFFE81 461974C0 080AC483 0C1E0DE0 9A068468 1EF676FF F876FF0C ..v½.v-.h...Å....á..ât.F.±..v.Ò¥ 000060
 26F65E8B F475003F 8026F646 FFF65EC4 0CEB47EA 75003F80 26F646FF F65EC400 .à^-.F-&.?.uöGŠ.á^-.F-&.?.u¶.^-& 000080
 830C630C CD9A56EE 5689EC46 8904C483 0C2D0088 9A046A50 0145808A 75003F80 .?.uæ.E.Pj....-..á..FŠ.VŸV.e.c.. 0000A0
 09E5A3EE 5688EC46 886674C2 08FC468B 6074EE46 08EC468B FE5689FC 468902C4 á..F•.V±.FŠ.FŸtm.F•.òtf.FŠ.VŸÈ|. 0000C0
 8BEC5EC4 2C74C008 0AC48309 3600E09A 0684681E F076FFF2 76FF0C6A 09E71689 ..Ò.j..v·.vb.h...Å.6..á..ât,á^š. 0000E0
 26FC46FF FC5EC407 8A26F046 FFF05EC4 04EC4683 02578926 078926FE 5688FC46 F=.V±&..&.W..FŠ.á^b.Fb&..á^=.F=& 000100
 C95F5EA7 75003F80 26F05EC4 F475003F 8026F046 FFF05EC4 E8EB0E74 C00A0788 ...ât.ŠÒá^b.Fb&.?.u¶á^b&.?.uI^_è 000120
 EC8B55CB 50E58801 FE4F8026 0574C30B C08C065E C4EC8B55 FABEE900 02B890CB ù.¡..Ò/"U.šá^..à.ût.&.O±..|]ùU¯š 000140
 750082E8 09FAA312 740025E8 08750009 FA3E831E 73FFF13D 06468857 5602EC83 .Š.VW.F.=þ.s..>".u.Ò%.t.È".Ò..u 000160
 3900F08B CB5DE58B 5E5F02C4 8306DE0E 849A0676 FF0B7500 78E80574 0018E815 .Ò..t.Òx.u..v....8..á._^.|]ùÈÞ.9 000180
 83U00110 309A5002 80510E4F 8050501E C033FE5E 89FEE383 43065EB8 0776065E ^.v..^.C.D±.^±3à.PP.O.Q¯.P.O.... 0001A0
 C0330 88E FE5E8B00 08A3DA8E 0574020B 09FEA309 FC1687C2 8B3874FF FA8308C4 á..".t8.ò..=.È±..@t..OÈ...^±.Á3à 0001C0
 1FD88C00 06A30000 05000AA3 01478D00 02A30000 A3000A88 0C47894B 480008A3 È..HH.G.¡..È..È...G.È.....È...Á. 0001E0

Dump of file SATURN:[PCCOMMON.DUMP.DLL]DAFILTER.TMP;1 on 18-APR-1990 10:41:03.85
File ID (562,30,0)   End of file block 42 / Allocated 44

Virtual block number 32 (00000020), 512 (0200) bytes

 FF006A56 00000AC8 C3D98EC1 8CD20801 4CE809FE 1E8EDB33 064E88C0 8ED88CC3 ù.Á.à.N.3U..±.ÒL..@.è.lùà...Vj.. 000000
 768B902F EB99C02B 0674FFFF C2F7FA56 89F84689 008509E4 9A0676FF 006A0876 v.j..v..Ò.ç..F½.V"¼ò..t.+à.$/..v 000020
 0D2D10E6 9A50FE76 FF006A56 1274D00B FE5689FC 468902C4 8300CE0C CD9A56F8 ½V.e.ò..á..F=.V±.Át.Vj..v±P.|.-. 000040
 067EC4D9 8B27E30E 4E881E56 57EC8B55 90C8C95E FE5688FC 46889007 EB08C483 .á.Š...F=.V±^èù.U.šWV..N.D'.1á-. 000060
 49490474 0477FF45 3A26C933 FF448AA6 F30A76C5 FE8BC803 D9F7AEF2 C033F78B .¼3á·ÙÁ\.ù.±év.µ|.D.3è&:E.w.t.|| 000080
 3CFB7420 3CACDB33 99C03306 76C51E56 57EC8B55 00CB50E5 8B5F5E1F C18BD1F7 ¼1.è.^_.|]ù.U.šWV.év.3à.3U¯< t«< 0000A0
 D1E3D1FA 8BC88BD2 D1E3D11B 72302C1F 77393CAC 01752B3C 0474203C 50F77409 .±¼P<-Ĩ.<+u.¯<9w.,0r.1Di@.ù."1Di 0000C0
 5F5E1FDA F7000283 D8F70775 93203C58 DCE80002 83080307 13090302 D1E3D1D2 @1Di@.\.=.Á.@.ŠÉX<-.u.¼Á.@.¼Ò.^_ 0000E0
 75003F83 09F08B57 56EC8B55 CB5DE58B 01FE4F80 0474080B 065E8BEC 8B55CB5D }ùU.š.^..Ùt..O±..|]ùU.šVWÈÞ..?.ū 000100
 C6830001 04C79609 F2A309F0 A3FE2440 24EB99C0 33057501 76E80005 B8071E29 )..¡..Òv.u.3à.$$@$±ÈÞ.È·..ù....ó 000120
 FA744100 D0E9CB5D E58B5E5F 0009E8C0 8ED88C06 4E8B09F6 3689FFFE FE44C704 .ùD±±..6-..N..Á.àÒ.._^.|]ùÒÅ.At" 000140
 7401A8AD F003D08B 1573C13B 48437401 A8FE88AD FC02778B F273EEF9 83FEE180 .Ã±."Ÿs·.w.=Ù.±´.tCH;ès..Á.ÞU´.t 000160
 FEF90305 EB058948 C12BFE4C 89F9030C 74FE8BE6 EBFE4489 F7B80002 05C20335 5.ô....¼.D±$|.±t..".L±+èH..$..."± 000180
 74FFFE30 020A0206 C626C302 7F8909FE 1E8C2605 74D1380B 38B9DA8C C68BFE4C L±.6.O¿8.;it.&..±....ù&ó....=±.t 0001A0
 88000205 C203E274 01A8ADF0 03D088BC 73C13848 FE8BF274 01A8ADF0 03FE8B25 ¼.±.ÞU´.t·.±H;ès¥.Å.ÞU´.tã.ó.... 0001C0
 74C7380F 17BFD88C 12740A02 0EFE2615 EBD88E04 74C00808 478BE6E8 FE4489F7 ¼.D±$|.G..ât..Á$.&±...t..Á¢..;ùt 0001E0

Dump of file SATURN:[PCCOMMON.DUMP.DLL]DAFILTER.TMP;1 on 18-APR-1990 10:41:03.85
File ID (562,30,0)   End of file block 42 / Allocated 44

Virtual block number 33 (00000021), 512 (0200) bytes

 0074005F E8984040 01240074 C638006B E8C03306 778BBBEB 378B09FA 1E8E2605 .&..."..7ŠE.w.3àÒk.;ót.$.@@.Ò_.t. 000000
 33024789 078B09FE A3260474 C1380F6B B9D88C98 EB4E4E96 0574001D E8FE4DFE ±M±Ò..t..NNŠ..Á¿k.;êt.&È±....G.3 000020
 C188F575 EAD10476 0A001638 267FFFBA 414149C8 28037401 A8FE4588 51C399C0 à.ùQ.E±´.t.+à|AAu..&;...v.ïõu¼.è 000040
 E85152C3 59C033E5 75EAD1D2 F7087500 0CE8C62B C22302F7 0072C203 1572C603 .ór..ôr.¼@#ò+óÒ..u.¼@iòu|3àŸùRÒÒ 000060
 53C35A59 58FE5589 4AD72806 88067789 FFFEFE44 C7F203F0 88FE8857 18740010 ..t.W.±.Þ.·ùD±±..w..ø+=J.U±XYZùS 000080
 C3020B02 745B5A1F FFFA8308 C483009A 10309A1F 06500001 88505252 1ED23350 P3@.RRP¡..P...O....á..."..Z[t..@ù 0000A0
 884CE827 720057E8 07754806 46880856 880282BF 3875000A 7E830657 56EC8B55 U.šVW..~..uB¢...V..F.Hu.ÒW.r'ŠL. 0000C0
 04730682 FE8104C6 8334735E 003EE856 0E468902 44880074 F73B1174 48068236 6..Ht.;¼t..D..F.VÒ>.^s4.6..±..s. 0000E0
 1489E675 C085F95B 0000FFFF 9A50C033 501652C4 885021E8 99FFFFB8 06750208 .@u.¡...$1P.áR.P3àP.....[".àu|.. 000100
 8104C683 0C74024C 39F7880E 4E88CB50 E5885E5F 07C03303 88068236 89025C89 .\..6...Æ3à._^.|]ù.N..¼9L.t..6.. 000120
 FF9A5153 1373027C 1 390675 F738C18E D3882672 1C030A88 2CE8F9F2 750682FE ±..u·"$,.Ö..r&.Æ.è;¼u.9.|.s.SQ.. 000140
 C45738E3 0C4E88EC 8..500C3 D1880487 92027C16 890475F7 38DE75C0 850000FF ....àuB;¼u...|.....1ù.U.š.N.DBWá 000160
 F3C913AB F3E9D1E0 8A0A468B D12BD187 D1030323 DB18012B 0C74DAF7 D7B8067E -..=¼Òt.+Ĩ.ÙW&.ì.ì+ì.F..ÁìÒµ¨.èµ 000180
 000CCB5D 08568806 46885FAA F3C913AB F3E9D1C3 8EFFFFC3 81C38C10 E3D187AA ^.iD..ù.ù...ùiÒµ¨.èµ^_.F..V.]ù.. 0001A0
 00000006 0FA00002 00000004 10200002 00070001 084C0103 00050001 08840103 ..........L....... .............. 0001C0
 00260001 10CF0103 00220001 10840103 00210001 017A0103 00880001 11190105 ..........z...!......."...ü...&. 0001E0
```

```
Dump of file SATURN:[PCCOMMON.DUMP.DLL]DAFILTER.TMP;1 on 18-APR-1990 10:41:03.85
File ID (562,30,0)   End of file block 42 / Allocated 44

Virtual block number 34 (00000022), 512 (0200) bytes

 005C0001 07400103 00580001 07600103 04190008 08540203 00400001 0ACE0103 ..o...M...T.......'...[...M...\. 000000
 6F43202D 20797261 7262694C 20656069 54206E75 5220534D 00000000 00000000 ........MS Run-Time Library - Co 000020
 70726F43 2074666F 736F7263 694D202C 38383931 20296328 20746867 69727970 pyright (c) 1988, Microsoft Corp 000040
 206F7420 676E6968 746F4E00 00000000 00000060 61200060 70200030 00200011 .. .0. pm. am........Nothing to  000060
 65746C69 46006465 69666963 65705320 7265746C 6946206F 4E006574 656C6564 delete.No Filter Specified.Filte 000080
 70207427 6E646C75 6F430072 6F727245 002E6465 74656C65 64207369 20002072 r . is deleted..Error.Couldn't p 0000A0
 6854202E 65606954 2F657461 44206E6F 69746165 7243204D 4F524620 65737261 arse FROM Creation Date/Time. Th 0000C0
 72724500 7D6D6D3A 68687B20 79792064 64206060 20736920 74616072 6F662065 e format is mm-dd-yy (hh:mm).Err 0000E0
 6144206E 6F697461 65724320 4F542065 73726170 2074276E 646C756F 4300726F or.Couldn't parse TO Creation Da 000100
 20797920 64642060 60207369 20746160 726F6620 65685420 2E656069 542F6574 te/Time. The format is mm-dd-yy  000120
 4F524620 65737261 70207427 6E646C75 6F430072 6F727245 007D6D6D 3A68687B (hh:mm).Error.Couldn't parse FRO 000140
 69207461 6D726F66 20656854 202E6560 69542F65 74614420 65746164 7055204D M Update Date/Time. The format i 000160
 276E646C 756F4300 726F7272 45007D6D 6D3A6868 7B207979 2D64642D 6D6D2073 s mm-dd-yy (hh:mm).Error.Couldn' 000180
 65685420 2E656069 542F6574 61442065 74616470 55204F54 20657372 61702074 t parse TO Update Date/Time. The 0001A0
 68746F4E 007D6D6D 3A68687B 2079792D 64642060 60207369 20746160 726F6620  format is mm-dd-yy (hh:mm).Noth 0001C0
 64656966 69636570 53207265 746C6946 206F4E00 796C7070 61206F74 2067( 69 ing to apply.No Filter Specified 0001E0

Dump of file SATURN:[PCCOMMON.DUMP.DLL]DAFILTER.TMP;1 on 18-APR-1990 10:41:03.85
File ID (562,30,0)   End of file block 42 / Allocated 44

Virtual block number 35 (00000023), 512 (0200) bytes

 746F6E20 706C6548 00706C65 48002E64 656E6966 65642000 20726574 6C694600 .Filter . defined..Help.Help not 000000
 00000000 00000000 00000000 00000000 0000656C 62616C69 61766120 74657920  yet available.................. 000020
 406E7553 FFFF022A 023A0226 00010000 46500054 44450054 53450000 5A540000 ..TZ..EST.EDT.PF....&.:.*...SunM 000040
 61407270 4172614D 6265466E 614A0074 61536972 46756854 64655765 75546E6F onTueWedThuFriSat.JanFebMarAprMa 000060
 0B000B00 00000000 00006365 44766F4E 74634F70 65536775 416C754A 6E754A79 yJunJulAugSepOctNovDec.......... 000080
 00000000 00000000 00000000 00000000 00000000 00000000 00000236 0B000B67 g...6........................... 0000A0
 00000000 00000000 00000000 00000000 00000000 00000000 00000000 00000000 ................................ 0000C0
 00000000 00000000 00000000 00000000 00000000 00000000 00000000 00000000 ................................ 0000E0
 00000000 00000000 00000000 00000000 00000000 00000000 00000000 00000000 ................................ 000100
 00000000 00000000 00000000 00000000 00000000 00000000 00000000 00000000 ................................ 000120
 00000000 00000000 00000000 00000000 00000000 00000000 00000000 00000000 ................................ 000140
 00000000 00000000 00000000 00000000 00000000 00000000 00000000 00000000 ................................ 000160
 00000000 00000000 00000000 00000000 00000000 00000000 00000000 00000000 ................................ 000180
 00000000 00000000 00000000 00000000 00000000 00000000 00000000 00000000 ................................ 0001A0
 00000000 00000000 00000000 00000000 00000000 00000000 00000000 00000000 ................................ 0001C0
 00000000 00000000 00000000 00000000 00000000 00000000 00000000 00000000 ................................ 0001E0

Dump of file SATURN:[PCCOMMON.DUMP.DLL]DAFILTER.TMP;1 on 18-APR-1990 10:41:03.85
File ID (562,30,0)   End of file block 42 / Allocated 44

Virtual block number 36 (00000024), 512 (0200) bytes

 00000000 00000000 00000000 00000000 00000000 00000000 00000000 00000000 ................................ 000000
 00000000 00000000 00000000 00000000 00000000 00000000 00000000 00000000 ................................ 000020
 00000000 00000000 00000000 00000000 00000000 00000000 00000000 00000000 ................................ 000040
 00000000 00000000 00000000 00000000 00000000 00000000 00000000 00000000 ................................ 000060
 00000000 00000000 00000000 00000000 00000000 00000000 00000000 00000000 ................................ 000080
 00000000 00000000 00000000 00000000 00000000 00000000 00000000 00000000 ................................ 0000A0
 00000000 00000000 00000000 00000000 00000000 00000000 00000000 00000000 ................................ 0000C0
 00000000 00000000 00000000 00000000 00000000 00000000 00000000 00000000 ................................ 0000E0
 00000000 00000000 00000000 00000000 00000000 00000000 00000000 00000000 ................................ 000100
 00000000 00000000 00000000 00000000 00000000 00000000 00000000 00000000 ................................ 000120
 00000000 00000000 00000000 00000000 00000000 00000000 00000000 00000000 ................................ 000140
 00000000 00000000 00000000 00000000 00000000 00000000 00000000 00000000 ................................ 000160
 00000000 00000000 00000000 00000000 00000000 00000000 00000000 00000000 ................................ 000180
 00000000 00000000 00000000 00000000 00000000 00000000 00000000 00000000 ................................ 0001A0
 00000000 00000000 00000000 00000000 00000000 00000000 00000000 00000000 ................................ 0001C0
 00000000 00000000 00000000 00000000 00000000 00000000 00000000 00000000 ................................ 0001E0
```

```
Dump of file SATURN:[PCCOMMON.DUMP.DLL]DAFILTER.TMP;1 on 18-APR-1990 10:41:03.85
File ID (562,30,0)    End of file block 42 / Allocated 44

Virtual block number 37 (00000025), 512 (0200) bytes

00000000 00000000 00000000 00000000 00000000 00000000 00000000 00000000 ................................ 000000
00000000 00000000 00000000 00000000 00000000 00000000 00000000 00000000 ................................ 000020
00000000 00000000 00000000 00000000 00000000 00000000 00000000 00000000 ................................ 000040
00000000 00000000 00000000 00000000 00000000 00000000 00000000 00000000 ................................ 000060
00000000 00000000 00000000 00000000 00000000 00000000 00000000 00000000 ................................ 000080
20202020 20202020 20000000 00000030 4F464E49 5F454C49 465F435F 02820000 ....C_FILE_INFO=......           0000A0
10101010 10101010 48202020 20202020 20202020 20202020 20202028 28282828 (((((                 H........ 0000C0
01018181 81818181 10101010 10101084 84848484 84848484 84101010 10101010 ................................ 0000E0
02028282 82828282 10101010 10100101 01010101 01010101 01010101 01010101 ................................ 000100
00000000 00000000 00201010 10100202 02020202 02020202 02020202 02020202 ................................ 000120
00000000 00000000 00000000 00000000 00000000 00000000 00000000 00000000 ................................ 000140
00000000 00000000 00000000 00000000 00000000 00000000 00000000 00000000 ................................ 000160
00000000 00000000 00000000 00000000 00000000 00000000 00000000 00000000 ................................ 000180
005A0038 001EFFFF 00000000 00000000 00000000 00000000 00000000 00000000 ..........................;.Z. 0001A0
00840096 00770059 003A001E FFFF0160 014E0130 011100F3 00D40085 00970078 x...ç.à.µ...0.N.m.....:.Y.w...Ç. 0001C0
81010000 00010000 00000000 00000000 00000000 016C014D 012F0110 00F200D3 Ë.·.../.M.l..................... 0001E0

Dump of file SATURN:[PCCOMMON.DUMP.DLL]DAFILTER.TMP;1 on 18-APR-1990 10:41:03.85
File ID (562,30,0)    End of file block 42 / Allocated 44

Virtual block number 38 (00000026), 512 (0200) bytes

00000000 00000000 00000000 00000000 00000000 00000000 00000000 00008181 ................................ 000000
00000000 00000000 00000000 00000000 00000000 00000000 00000000 00000000 ................................ 000020
00000000 00000000 00000000 00000000 00000000 00000000 00000000 00000000 ................................ 000040
00000000 00000000 00000000 00000000 00000000 00000000 00000000 00000000 ................................ 000060
00000000 00000000 00000000 00000000 00000000 00000000 00000000 00000000 ................................ 000080
00000000 00000000 00000000 00000000 00000000 00000000 00000000 [illegible] ................................ 0000A0
00000000 00000000 00000000 00000000 00000000 00000000 00000000 [illegible] ................................ 0000C0
0A000000 00000000 00000000 00000000 00000000 00000000 00000000 [illegible] ................................ 0000E0
0A0A0A0A 0A0A0A0A 0A0A0A0A 0A0A0A0A 0A0A0A0A 0A0A0A0A 0A0A0A0A 0A0A0A0A ................................ 000100
0A0A0A0A 0A0A0A0A 0A0A0A0A 0A0A0A0A 0A0A0A0A 0A0A0A0A 0A0A0A0A 0A0A0A0A ................................ 000120
0A0A0A0A 0A0A0A0A 0A0A0A0A 0A0A0A0A 0A0A0A0A 0A0A0A0A 0A0A0A0A 0A0A0A0A ................................ 000140
0A0A0A0A 0A0A0A0A 0A0A0A0A 0A0A0A0A 0A0A0A0A 0A0A0A0A 0A0A0A0A 0A0A0A0A ................................ 000160
0A0A0A0A 0A0A0A0A 0A0A0A0A 0A0A0A0A 0A0A0A0A 0A0A0A0A 0A0A0A0A 0A0A0A0A ................................ 000180
0A0A0A0A 0A0A0A0A 0A0A0A0A 0A0A0A0A 0A0A0A0A 0A0A0A0A 0A0A0A0A 0A0A0A0A ................................ 0001A0
0A0A0A0A 0A0A0A0A 0A0A0A0A 0A0A0A0A 0A0A0A0A 0A0A0A0A 0A0A0A0A 0A0A0A0A ................................ 0001C0
000A0A0A 0A0A0A0A 0A0A0A0A 0A0A0A0A 0A0A0A0A 0A0A0A0A 0A0A0A0A 0A0A0A0A ................................ 0001E0

Dump of file SATURN:[PCCOMMON.DUMP.DLL]DAFILTER.TMP;1 on 18-APR-1990 10:41:03.85
File ID (562,30,0)    End of file block 42 / Allocated 44

Virtual block number 39 (00000027), 512 (0200) bytes

00000000 00000000 00000000 00000000 00000000 00000000 00000000 00000000 ................................ 000000
36520000 3E3E4753 4D4E3C3C FFFF0000 00000000 00000000 00000000 00002000 . ..................<<NMSG>>..R6 000020
00333030 36520003 000A0D77 6F6C6672 65766F20 68636174 73202D0A 00303030 000..- stack overflow.....R6003. 000040
38303036 52000800 0A0D3020 79622065 64697669 64207265 6765746E 69202D0A .- integer divide by 0.....R6008 000060
6E656D75 67726120 726F6620 65636170 73206867 756F6E65 20746F6E 202D0A0D ..- not enough space for argumen 000080
65636170 73206867 756F6E65 20746F6E 202D0A00 39303036 52000900 0A0D7374 ts.....R6009..- not enough space 0000A0
6974206E 757200FF 000A0000 FC000A0D 746E6560 6E6F7269 766E6520 726F6620  for environment...*......run-ti 0000C0
6F702067 6E697461 6F6C6620 2D0A0D32 30303652 00020020 726F7272 6520656D me error ...R6002..- floating po 0000E0
00020000 00050A12 00020002 FFFFFF00 0A006469 64616F6C 20746F6E 20746E69 int not loaded.................. 000100
00000000 FFFF0001 000E0352 00000562 00000000 00000000 00000000 00060284 ................b...R........... 000120
00000000 0452FFFF 010000E0 017CFFEB FFBF1400 02000446 00080001 00000023 #.......F.À...€.Š.|.À.....R..... 000140
00000000 0000FFFF FFFF0101 0008003C 00020019 80000001 0456000C 00050000 ......V.......Ø.<............... 000160
00050000 00000000 FFFFFFFF 01020008 00A100C5 00188002 00080463 00000006 ......c.......é.À............... 000180
00000007 00000000 0000FFFF FFFF0104 00080020 00840019 80000001 04640008 ..d.......Ç. .................. 0001A0
046F0000 00060000 00000000 FFFFFFFF 01050020 00A40092 00188000 00000460 m.........Ë. .................n. 0001C0
0008046F 00000006 00000000 0000FFFF FFFF0127 0008005C 00920115 80030008 ........\...'...............o... 0001E0
```

```
Dump of file SATURN:[PCCOMMON.DUMP.DLL]DAFILTER.TMP;1 on 18-APR-1990 10:41:03.85
File ID (562,30,0)   End of file block 42 / Allocated 44

Virtual block number 40 (00000028), 512 (0200) bytes

 80020008 04700000 00060000 00000000 FFFFFFFF 01200008 005C0084 01158002 ......\...&...............p..... 000000
 01158002 0008C471 00000006 00000000 0000FFFF FFFF0128 0008005C 00680115 ..k.\...(...............q....... 000020
 00320052 80030008 04720000 00060000 00000000 FFFFFFFF 01240008 005C0050 ].\...$...............r.....R.2. 000040
 006A001E 00528002 00080473 00000006 00000000 0000FFFF FFFF0108 0008006A j.....................s.....R...j. 000060
 003A00A5 001D00CA 80010002 0474000F 00050000 00000000 FFFFFFFF 011C0008 ....................t.....ò...Ê.:. 000080
 0121000A 00410038 00D78000 00040484 000C0003 00000000 0000FFFF FFFF0106 ......................8.A...!. 0000A0
 FFFF0120 000A0038 00380131 80000034 0491000C 00030000 00000000 FFFFFFFF .....................1.8.8... ... 0000C0
 FFFFFFFF 011F000A 00560022 00068001 0004049E 00120003 00000000 0000FFFF .....................".V........ 0000E0
 0000FFFF FFFF011E 000A0032 00220131 80000004 0481000A 00030000 00000000 ...........1.".2.......... 000100
 00000000 FFFFFFFF 01130030 00A40042 00188000 000104BC 00000007 00000000 ........B.......B.Ê.=........... 000120
 00000000 0000FFFF FFFF0103 00090030 00820019 80000001 04800000 00050000 ......$.........0............... 000140
 00050000 00000000 FFFFFFFF 01070008 00300032 00198000 000104C7 00080005 ....ú.......2.0................. 000160
 000C0005 00000000 0000FFFF FFFF0109 0008003E 009C00CD 80000001 04D3000C ..Æ.....Ë...>................... 000180
 04ED0008 00050000 00000000 FFFFFFFF 010C0008 003E0077 00CD8000 000104E0 À.....Ë.w.>...................Ù. 0001A0
 000104F6 00080005 00000000 0000FFFF FFFF0110 00080024 000200CD 80000001 ....ê.0.$...................-... 0001C0
 80020000 05020003 00030000 00000000 FFFFFFFF 01180008 0036001E 00198000 ......6......................... 0001E0

Dump of file SATURN:[PCCOMMON.DUMP.DLL]DAFILTER.TMP;1 on 18-APR-1990 10:41:03.85
File ID (562,30,0)   End of file block 42 / Allocated 44

Virtual block number 41 (00000029), 512 (0200) bytes

 00528002 04000506 00050003 00000000 0000FFFF FFFF0131 000C0026 00080016 ....&...1......................R. 000000
 0008008E 80020000 050C0007 00030000 00000000 FFFFFFFF 0001000C 00260008 ..&............................. 000020
 00260008 00CA8002 00000514 00060003 00000000 0000FFFF FFFF0132 000C0026 &...2.....................ò...&. 000040
 000C0026 00080106 80020000 05180006 00030000 00000000 FFFFFFFF C135000C ..5.........................&... 000060
 0119000C 00260008 01428002 0100C?2? 0004000? 00000000 0000FFFF FFFF0032 ..................".....8...&..... 000080
 FFFF011A 00080046 002F000? 80000001 05270010 00050000 00000000 FFFFFFFF ...............'.....è./.F........ 0000A0
 FFFFFFFF 011?000? 00580043 00CD8000 00010538 00140005 00000000 0000FFFF .............8.....ë.C.[.......... 0000C0
 0000FFFF FFFF0122 0025009E 00AA00CF 80000001 05400000 00077000 00000000 ..........N.....ü.´...X."........ 0000E0
 00000000 FFFFFFFF 012A0008 00180092 00F08000 0001054E 00050005 00000000 .........N.....Þ.......*......... 000100
 00000000 0000FFFF FFFF0130 00080017 008400F0 80000001 05540003 00050000 ......T.....Þ.......0............ 000120
 00050000 00000000 FFFFFFFF 012F0008 001A0068 00F08000 00010558 00050005 ....X.....Þ.k...../............. 000140
 726F4620 7265746C 6946FFFF FFFF012E 00080017 005000F0 80000001 055E0003 ..^.Co\.Þ.]...........Filter For 000160
 00000000 3A737265 746C6946 00003A65 6D616E20 7265746C 69460000 0003006D m.All Filter name:..Filters:.... 000180
 2920524F 20282065 6D6F537E 00736E6F 6974706F 206C6F72 746E6F43 00000000 .-Incl ntrol options.-Some ( OR ) 0001A0
 2920544F 4E202820 65766973 756C6378 457E0029 20444E41 2028206C 5C417E00 .  ( AND ).-Exclusive ( NOT ) 0001C0
 62206465 74616572 43003A73 64726F77 79654900 00637669 73756C63 6E497E00 1:03.85 sive..Keywords:.Created b 0001E0

Dump of file SATURN:[PCCOMMON.DUMP.DLL]DAFILTER.TMP;1 on 18-APR-1990
File ID (562,30,0)   End of file block 42 / Allo ated 44

Virtual block number 42 (0000002A), 512 (0200) bytes
                                                          , 34U 3A79 y:.Time creat
 6A624F00 64657461 64707520 65606954 00646574 616? ?? ???003A 7374.?65 ects:.Update d.Time updated.Obj 000000
 6C65447E 00796C70 70410048 4F7E003A 79622064 6574 ?61 656C7E43 00657?65 ete.C-lear.Ca y:.-OK.Apply.-Del 000020
 20616972 65746972 4300706C 6548006C 65636E61 4300 ?243 ??676E69 74736574 testing.Criter el.Help.Criteria 000040
 72460000 6E6F6974 616E6962 6D6F6320 61697265 7469??46 003A6F54 003A6D6F om:.To:.From:.1 a combination..Fr 000060
 00000000 00000000 00000000 000C003A 6F54003A 6D6F??00 00000000 00000000 ............... o:................ 000080
 00000000 00000000 00000000 00000000 00000000 00000??0 00000000 00000000 ................................ 0000A0
 00000000 00000000 00000000 00000000 00000000 00000C?? 00000000 00000000 ................................ 0000C0
 00000000 00000000 00000000 00000000 00000000 00000??0 00000000 00000000 ................................ 0000E0
 00000000 00000000 00000000 00000000 00000000 00000??0 00000000 00000000 ................................ 000100
 00000000 00000000 00000000 00000000 00000000 00000?00 00000000 00000000 ................................ 000120
 00000000 00000000 00000000 0000C000 00000000 00000C00 00000000 00000000 ................................ 000140
 00000000 00000000 00000000 00000000 00000000 00000C00 00000000 00000000 ................................ 000160
 00000000 00000000 00000000 00000000 00000000 C0000?00 00000000 00000000 ................................ 000180
 00000000 00000000 00000000 00000000 00000000 00000000 00000000 00000000 ................................ 0001A0
 00000000 00000000 00000000 00000000 00000000 C0CCC000 00000000 00000000 ................................ 0001C0
 00000C00 00000000 C0000000 C0000000 00000000 0000                                                ..... 0001E0
```

```
Dump of file SATURN:[PCCOMMON.DUMP.DLL]DAHELP.TMP;1 on 18-APR-1990 10:41:18.15
File ID (568,19,0)   End of file block 8 / Allocated 8

Virtual block number 1 (00000001), 512 (0200) bytes

 00000000 00000040 00000000 000000B8 0000FFFF 00000004 00000008 00145A40 MZ..............|.......@....... 000000
 00000080 00000000 00000000 00000000 00000000 00000000 00000000 00000000 ................................ 000020
 6F6E6E61 63206061 72676F72 70207369 685421CD 4C01B821 CD09B400 0EBA1F0E ..¤..Ç.ë|¡.LëIThis program canno 000040
 00000000 00000024 0A0D0D2E 65646F60 20534F44 206E6920 6E757220 65622074 t be run in DOS mode....$....... 000060
 00040007 00000000 00020000 00000000 00048009 3668C62A 00070116 0505454E NE......*6h6.................... 000080
 00000000 00000000 00010001 00040000 0000019D 0097008F 007C0078 00400012 ..@.x.|......................... 0000A0
 00500F21 004A00D8 00360E00 00360004 000F0F00 000F0002 0AF80F00 0AF7001B ..%...%.Ø.......å.6...6.Å.J.I.P. 0000C0
 48414406 00020005 00641EF1 006400E2 00020E21 00000000 002C0F00 002A000E Ø.*...,.....!...ã.d.þ.d......DAH 0000E0
 574D5005 47534D03 00006A00 08000500 01000001 504C4548 41440600 00504C45 ELP...DAHELP.........j...MSG.PMW 000100
 4E4C5259 52455551 4C4D440B 444C4549 46595245 55514C4D 44006C60 64034E49 IN.dml.DMLQUERYFIELD.DMLQUERYRLN 000120
 4555514C 4D440054 53494C45 4552464C 4D440831 4E4C5259 52455551 4C4D440C .DMLQUERYRLN1.DMLFREELIST.DMLQUE 000140
 53494C54 43454C45 53444552 4544524F 59524555 514C4D44 1944494C 4D445952 RYDMLID.DMLQUERYORDEREDSELECTLIS 000160
 534F0E00 00000003 0101454D 414E5443 454A424F 5445474D 4144106D 61640354 T.dam.DAMGETOBJECTNAME........OS 000180
 00F646C7 D88EFFFF B81E5657 00000AC8 00000000 504C4548 4144204D 5020322F /2 PM DAHELP....à...WV.¡...ÄúF-. 0001A0
 00003DF8 4689008D 00F99A50 16FA4680 0876FF0A 76FFFA46 89FC4689 0000B800 .¡...F•.F'.v...v..F'.P.'....F½=.. 0001C0
 FF0A76FF 00A6E900 00B80006 E90374FC 460BFA46 8B00B7E9 F8468800 06E90375 u.Õ...F½Õñ..F'.F•t.Õ..¡..Õl..v.. 0001E0

Dump of file SATURN:[PCCOMMON.DUMP.DLL]DAHELP.TMP;1 on 18-APR-1990 10:41:18.15
File ID (568,19,0)   End of file block 8 / Allocated 8

Virtual block number 2 (00000002), 512 (0200) bytes

 8EB98800 06E90375 00003DF8 46890000 FFFF9A50 16FE468D FA76FFFC 76FF0876 v..v=.v'.F±.P......F½=..u.Õ..¡¿. 000000
 E900A801 6A9A5016 F6468DFA 76FFFC76 FF0876FF 0A76FF00 5EE9FE46 8B007FE9 Õ...F±Õ^..v..v..v•.v'.F-.P.j.¨.Õ 000020
 0A76FF00 45E900C9 02969A50 16F6468D 006AFA76 FFFC76FF 0876FF0A 76FF0060 '..v..v..v•.v'j..F-.P...è.ÕE..v. 000040
 00B80024 E9FFFF03 8C9A5016 F6468D00 6A006A00 6A006AFA 76FFFC76 FF0876FF .v..v•.v'j.j.j.j..F-.P.....Õ$.¡. 000060
 E9FFBEE9 03750004 3DFFABE9 03750003 3DFF9AE9 03750002 3D001BE9 001EE900 .Õ..Õ..=..u.Õ..=..u.Õ¨.=..u.Õ/.Õ 000080
 F8468900 00B80000 FA46C7D8 8E000888 1E565700 000AC800 06CAC95F 5E1FFF0C É..^_èò..à...WV.¡...ÄúF'..¡...F½ 0000A0
 E9037500 0030FA46 890000FF FF9A5016 FC468D01 6A006A0A 76FF0C76 FFF64689 .F-.v̄..v.j.j..F•.P......F'=..u.Õ 0000C0
 FF0C76FF 02578926 07892606 5EC40257 8B26078B 26FC5EC4 002BE9FA 46880006 ...F'Õ+.ó^=&..&.W.ó^.&..&.W..v.. 0000E0
 56570000 0EC80008 CAC95F5E 1F0000E9 0000B800 00FFFF9A FC76FFFE 76FF0A76 v..v±.v•.....¡..Õ...^_èò..à...WV 000100
 FF9A5016 FC468012 6A0A76FF 0C76FF0E 76FF1076 FF0000F6 46C7D88E 0101B81E .¡...ÄúF-...v..v..v..v̄.j..F•.P.. 000120
 8D0F6A0A 76FF0C76 FF0E76FF 1076FF00 EEE98EB9 B80006E9 03750000 3D0000FF ...=..u.Õ..¡¿.ÕŸ..v..v..v..v.j.. 000140
 E90375F4 460BF246 8B00C8E9 8EB98800 06E90375 00003D00 00FFFF9A 5016F246 F·.P.....=..u.Õ..¡¿.Õà..F·.F¶u.Õ 000160
 03750247 0B26078B 26FC5EC4 F276FFF4 76FF0A76 FF0C76FF 0E76FF10 76FF0047 G..v..v..v..v..v¶.v·ó^=&..&.G.u. 000180
 03750000 3DF64689 0256050E 9A0676FF 0876FF50 0000B800 03E90001 B80006E9 Õ..¡..Õ..¡..P.v..v....V..F-=..u. 0001A0
 26F85EC4 04F84683 0004E9FA 5689F846 89FE568B FC468800 76E9F646 8B0006E9 Õ...F-Õv..F•.V±.F½.V'Õ...F½.ó^½& 0001C0
 0876FF01 6A37FF26 0277FF26 F85EC40E 76FF1076 FF003DE9 03750247 0B26078B ..&.G.u.Õ=..v..v.ó^½&.w.&.7j..v. 0001E0

Dump of file SATURN:[PCCOMMON.DUMP.DLL]DAHELP.TMP;1 on 18-APR-1990 10:41:18.15
File ID (568,19,0)   End of file block 8 / Allocated 8

Virtual block number 3 (00000003), 512 (0200) bytes

 E9037500 3F832606 5EC40012 E90003E9 03750000 3DF64689 00280296 9A0676FF .v....(..F-=..u.Õ..Õ..ó^.&.?.u.Õ 000000
 1F0000E9 F6468800 0001599A FC76FFFE 76FF0E76 FF1076FF FF80E900 03E90003 ..Õ..Õ¯..v..v..v±.v•.Y....F-Õ... 000020
 FC4689FE 46890000 B80000F6 46C7D88E 0172B81E 56570000 10C8000C CAC95F5E ^_èò..à...WV.¡r..ÄúF-..¡...F±.F• 000040
 03750000 3DF64689 0000018F 9A5016F0 468D136A 0C76FF0E 76FF1076 FF1276FF .v̄..v..v..v.j..Fþ.P......F-=..u. 000060
 26F85EC4 04F84683 0004E9FA 5689F846 89F2568B F0468800 ACE9F646 8B0006E9 Õ...F-Õ¯..Fþ.V·.F½.V'Õ...F½.ó^½& 000080
 76FF0E76 FF37FF26 0277FF26 F85EC410 76FF1276 FF005EE9 03750247 0B26078B ..&.G.u.Õ^..v..v.ó^½&.w.&.7.v..v 0000A0
 76FF5000 00B80003 E90001B8 0006E903 75064708 26044788 26F85EC4 0A76FF0C ..v.ó^½&.G.&.G.u.Õ..¡..Õ..¡..P.v 0000C0
 0375003F 8326065E C40012E9 0003E903 7500003D F6468902 06038C9A 0676FF08 ..v.......F-=..u.Õ..Õ..ó^.&.?.u. 0000E0
 F67E83F4 46890000 02859AF0 76FFF276 FF1076FF 1276FFFF 8FE90003 E90003E9 Õ..Õ..Õ...v..v..v·.vþ......F¶.— 000100
 00001CC8 000ECAC9 5F5E1F00 00E9F446 8B0006E9 0009E9F6 46880009 E9037500 .u.Õ...F-Õ..Õ...F¶Õ...^_èò..à... 000120
 8D006A12 76FF1476 FF1676FF 1876FFFC 4689FE46 89000088 D88E029E B81E5657 WV.¡...Ä¡...F±.F•.v..v..v̄v .v.j.. 000140
 1676FF18 76FF013D E9E84688 0006E903 7500003D E8468900 00030E9A 5016F646 F-.P.8....FÒ=..u.Õ...FÒÕ=. v..v. 000160
 E8468800 06E90375 00003DE8 46890000 04659A50 16EE468D 0E6A1276 FF1476FF .v..v.j..FŸ.P.e....FÒ=..u.Ł   FÒ 000180
 74F85639 0028E903 74F64639 105688 0E 46880016 E9037510 460B0E46 880114E9 Õ...F..F.u.Õ...F..V.9F-t.Õ(.9V½t 0001A0
 01FA46C7 F45689F2 4689F056 88EE4688 E65689E4 4689F856 88F64688 0020E903 .Õ ..F-.V½.FÕ.Vl.FŸ.Vþ.F·.V¶úF'. 0001C0
 00FA46C7 F45689F2 4689F856 88F64688 E65689E4 4689F056 88EE4688 001DE900 .Õ...FŸ.Vþ.FÕ.Vl.F-.V½.F·.V¶úF'. 0001E0
```

```
Dump of file SATURN:[PCCOMMON.DUMP.DLL]DAHELP.TMP;1 on 18-APR-1990 10:41:18.15
File ID (568,19,0)   End of file block 8 / Allocated 8

Virtual block number 4 (00000004), 512 (0200) bytes

 75000030 E8468900 00048E9A 5016EA46 8D106AE4 76FFE676 FF1676FF 1876FF00 ..v..v..vl.võj..Fõ.P......Fò=..u 000000
 01B59A50 16FC4680 106AF276 FFF476FF 1676FF18 76FF0080 E9E84688 0006E903 .õ...FòÕ...v..v..v¶.v·j..F=.P.ç. 000020
 FF1276FF 1476FF16 76FF1876 FF0064E9 E8468800 06E90375 000030E8 46890000 ...Fò=..u.õ...FòÕd..v..v..v..v.. 000040
 1046080E 4688000B E9037400 0C7E83FC 76FFFE76 FFE476FF E676FFEA 76FFEC76 vš.võ.vl.võ.v±.v=.~..t.õ...F..F. 000060
 76FF0876 FFFA76FF 500000B8 0003E900 01B80006 E9037500 0A7E8300 0FE90375 u.õ...~..u.õ..|..õ..|..P.v³.v..v 000080
 F0C80014 CAC95F5E 1F0000E9 E8468800 06E90375 000030E8 46890337 067C9A06 ..|.7..Fò=..u.õ...FòÕ...^_èò..àÞ 0000A0
 76FF00FE 6086C600 FEB686C6 00FE1086 C600FE6A 86C6D88E 0394B81E 56570001 ..WV.|...Ã6.j±.6..±.6.Ñ±.õ.'±..v 0000C0
 07E90375 000030FE 5C868900 00FFFF9A 5016FE6A 868D1076 FF1276FF 1476FF16 ..v..v..v...j±.P.......\±=..u.õ. 0000E0
 9A5016FE B6868D50 6A1B6A00 0036FF26 0048068E 006A006A 011DE9FE 5C868B00 ...\±õ..j.j...H.&.6..j.jP..Ñ±.P. 000100
 419A5016 FE10868D 0C76FF0E 76FF1476 FF1676FF 0000E903 7400003D 000005C7 ú...=..t.õ...v..v..v..v....±.P.A 000120
 6A0024E9 0375000A 7E8300CF E9FE5C86 880007E9 03750000 3DFE5C86 89000005 .....\±=..u.õ....\±Õü..~..u.õ$.j 000140
 03740000 3D0000FF FF9A5016 FE60868D 0A6A1C6A 000036FF 26004806 8E006A00 .j...H.&.6..j.j...'±.P.....=..t. 000160
 06868D50 16FE6086 8D5016FE 10868D50 16FEB686 8D5016FE 6A868D01 6A0000E9 õ..j...j±.P..Ñ±.P...±.P..'±.P... 000180
 006A0067 E9FE5C86 880007E9 03750000 3DFE5C86 8904F40A 6C9A00FA 685016FF ..Ph³..l.¶...\±=..u.õ....\±Õg.j. 0001A0
 FFFF9A01 6A0A6A00 02681E50 16FF0686 8D505200 00FFFF9A 006A016A 006A016A j.j.j.j......RP.....P.h..j.j.... 0001C0
 C726065E C4002AE9 00008800 0107C726 065EC400 25E9FE5E 868BFE5E 86890000 ....^±..^±Õ%.6^.&ú...|..Õ³.6^.&ú 0001E0

Dump of file SATURN:[PCCOMMON.DUMP.DLL]DAHELP.TMP;1 on 18-APR-1990 10:41:18.15
File ID (568,19,0)   End of file block 8 / Allocated 8

Virtual block number 5 (00000005), 512 (0200) bytes

 E9037500 0230FFE1 E9037500 01300013 E90016E9 00008800 1CE90000 88000007 ...|..õ..|..õ..õ..=..u.õÃ.=..u.õ 000000
 8C86C600 FE7886C6 088E0516 881E5657 000244C8 0012CAC9 5F5E1FFF E4E9FFC8 ù.õõ..^_èò..àD..WV.|...Ã6..±.6.¥ 000020
 FF1E76FF 2076FF00 EC46C600 FD0086C6 00FE2C86 C600C046 C600FD0C 86C600FD ».6.É».õFå.6.,±.6.Å».6Få..ᵥ  v.. 000040
 FD0A8688 0007E903 7500003D FD0A8689 00000760 9A5016FE 78868D16 76FF1876 v..v...x±.P.'.....Õ»=..u.õ... ᴴ» 000060
 05B80003 E90002B8 0006E903 75000A7E 831A76FF 1C76FF1E 76FF2076 FF02E2E9 Õã..v .v..v..v..~..u.õ..|..õ..|. 000080
 8802A6E9 FD0A8688 0007E903 75000030 FD0A8689 0000079C 9A5016E8 468D5000 .P.Fò.P.......Õ»=..u.õ....Õ»ÕI.. 0000A0
 26004806 8E006A00 6AFEC486 89001088 0003E900 11B80006 E90375EA 4608E846 Fò.Fõu.õ..|..õ..|....á±j.j...H.& 0000C0
 2076FF00 00E90374 00003000 0007FC9A 5016FD8C 868D146A FEC4B6FF·000036FF .6...Ñá±j...¥».P.=...=..t.õ...v  0000E0
 0007E903 7500003D FD0A8689 0000081B 9A5016FD DC868D12 76FF1476 FF1E76FF .v..v..v...É».P.......Õ»=..u.õ.. 000100
 E90003B8 0006E903 75000A7E 831A76FF 1C76FF1E 76FF2076 FF023EE9 FD0A8688 ..Õ»Õ>..v .v..v..v..~..u.õ..|..õ 000120
 FD0A8688 0007E903 75000030 FD0A8689 00000873 9A5016E8 468D5000 06880003 ..|..P.Fò.P.ª.....Õ»=..u.õ....Õ» 000140
 EA7E8300 0FE90374 01E87E83 001BE900 12880006 E90374EA 4608E846 880202E9 õ...Fò.Fõt.õ..|..õ...~õ.t.õ...~õ 000160
 000036FF 26004806 8E006A00 6AFEC486 89001488 0003E900 13880006 E9037400 .t.õ..|..õ..|....á±j.j...H.&.6.. 000180
 76FF1E76 FF2076FF 0000E903 74000030 000008F7 9A5016C0 468D146A FEC4B6FF .Ñá±j..Få.P.%...=..t.õ...v .v..v 0001A0
 E9FD0A86 880007E9 03750000 3DFD0A86 89000005 8F9A5016 FE2C8680 0E76FF10 ..v...,±.P.......Õ»=..u.õ....Õ»õ 0001C0
 00009A50 16EC468D 0019681E 08C48308 5000009A 5016FD00 868D0018 681E0183 ...h....Å».P...P..á..h...Få.P... 0001E0

Dump of file SATURN:[PCCOMMON.DUMP.DLL]DAHELP.TMP;1 on 18-APR-1990 10:41:18.15
File ID (568,19,0)   End of file block 8 / Allocated 8

Virtual block number 6 (00000006), 512 (0200) bytes

 FE2A868D 066A1276 FF1476FF 1E76FF20 76FF00A5 E9037500 0C7E8308 C483FFFF ...á..~..u.õE..v .v..v..v.j...*± 000000
 E998FE2A 868A0128 E9FD0A86 880007E9 03750000 3DFD0A86 890000FF FF9A5016 .P.......Õ»=..u.õ....Õ»Õ+...*±.õ 000020
 C486C700 27E9001A FEC486C7 0030E900 19FEC486 C70039E9 0018FEC4 86C70027 '.ú.á±..Õ9.ú.á±..Õ0.ú.á±..Õ'.ú.á 000040
 CAE90375 005830FF C9E90375 004930FF E3E90375 00413000 18E9001E E90000FE ±..õ..õ..=A.u.õD.=I.u.õè.=X.u.õò 000060
 6AFEC486 FF000036 FF260048 068E006A 006A0025 E9037500 FEC48E83 FFD9E9FF .õ)../á±.u.õ%.j.j...H.&.6...Ñá±j 000080
 16F08C86 8D5016FE 78868D00 6A0000E9 03750000 3D000005 709A5016 EC468D14 ..F$.P.p...=..u.õ..j...x±.P..¥». 0000A0
 C6868D50 16EC468D 5016F0D0 868D5016 FE2C868D 5016C046 8D5016FD DC868D50 P..É».P.Få.P..,±.P..Å».P.F$.P..6 0000C0
 006A0067 E9FD0A86 880007E9 03750000 3DFD0A86 8905F909 8C9A00FA 685016FE ±.Ph³..¥.'...Õ»=..u.õ....Õ»Õg.j. 0000E0
 062E9A01 6A0A6A00 1A681E50 16FEC686 8D505200 0006199A 006A016A 006A016A j.j.j.j......RP..á±.P.h..j.j.... 000100
 C726065E C4002AE9 00008800 0107C726 065EC400 25E9FE28 868BFE28 86890000 ....(±..(±Õ%.á^.&ú...|..Õ*.á^.&ú 000120
 E9037500 0230FFE1 E9037500 01300013 E90016E9 00008800 1CE90000 88000007 ...|..õ..|..õ..õ..=..u.õÃ.=..u.õ 000140
 24468800 07FE46C7 088E0684 881E5657 000022C8 001CCAC9 5F5E1FFF E4E9FFC8 ù.õõ..^_èò..à"..WV.|...ÃúF±...F$ 000160
 5689E646 891E5688 1C4688E4 5689E246 89225688 204688E0 5689DE46 89265688 .V&.F8.VÅ.F .V".Få.Võ.F..V..Fl.V 000180
 89125688 104688F0 5689EE46 89165688 144688EC 5689EA46 891A5688 184688E8 Ò.F..V..Fõ.Vš.F..V..FŸ.VÞ.F..V.. 0001A0
 FF0876FF 0A76FFFE 76FF5016 DE468DF8 5689F646 890E5688 0C4688F4 5689F246 F·.V¶.F..V..F−.V½.F8.P.v±.v..v.. 0001C0
 880006E9 037500FC 7E83FC46 89FFFF00 109A5016 FA468D00 30681E28 76FF0676 v..v(.h0..F³.P......F=.~=.u.õ... 0001E0
```

```
Dump of file SATURN:[PCCOMMON.DUMP.DLL]DAHELP.TMP;1 on 18-APR-1990 10:41:18.15
File ID (568,19,0)   End of file block 8 / Allocated 8

Virtual block number 7 (00000007), 512 (0200) bytes

000022C8 0024CAC9 5F5E1F00 00E90000 B80000C6 260876C4 FA5E8800 10E9FC46 F=Õ...^*áv.&6..¦..Õ...^ èò$.à".. 000000
89165688 144688E0 5689DE46 891A5688 18468800 07FE46C7 088E09C4 881E5657 WV.¦á..ÄúF±...F..V..F8.VÄ.F..V.. 000020
DE468DEC 5689EA46 890E5688 0C4688E8 5689E646 89125688 104688E4 5689E246 Fâ.Võ.F..V..Fì.Vò.F..V..Fõ.V±.F8 000040
890A4100 109A5016 FA468D00 3C681E1C 76FF0676 FF0876FF 0A76FFFE 76FF5016 .P.v±.v..v..v..v..h<..F*.P...A.. 000060
00E90000 B80000C6 260876C4 FA5E8800 10E9FC46 880006E9 037500FC 7E83FC46 F=.-=.u.Õ...F=Õ...^*áv.&6..¦..Õ. 000080
6E000406 8C020300 00000308 3F000200 00000109 39000200 0E18CAC9 5F5E1F00 ..^_èò.....9.......?.......¥...n 0000A0
0F000306 F8020300 88000209 6E010300 0000050A CD000200 0000040A 74000200 ...Ť.......ē.......n.......¥.... 0000C0
36000303 66020300 29000303 B5020300 1D000302 C4020300 9D000207 41010300 ...A.......á.......ç...)...f...6 0000E0
00000000 00000000 50000301 23020300 50000209 59010300 42000300 5E020300 ...^...B...Y...P...#...P........ 000100
00000000 00000000 00000400 02000200 01C80001 B81F0000 3E89088E FFFFB81E .¦...Ä.>...¦..ù................. 000120
A8C78806 7EC401F7 AEF2FFFF B9C033C0 8ED88CFE 880A76C5 1EDE88D7 88EC8855 U.§.=.8.év..±.Ä.á3â¿..·Ú%íé-..ú´ 000140
00000000 00000000 0000C85D C28C1FFA 88F388A4 F3C913A5 F3E9D149 A4027401 .t.Ê¦íÕµE.èµE.µ.°..ôÌù.......... 000160
69616C70 78450000 00656C75 52207373 656E6973 7542206E 69616C70 78450000 ..Explain Business Rule...¨xplai 000180
45484144 0047534D 2E40504C 45484144 00656C75 52207373 656E6973 7542206E n Business Rule.DAHELPM.MSG DAHE 0001A0
00000000 00000000 00000000 00000004 00480002 0001FFFF 0047534D 2E40504C LPM.MSG.......H................. 0001C0
08468702 46870646 87EC8855 0E50C033 002A0000 00010047 45534753 4D4B40FF .MKMSGSEG.....*.3áP.U.§.F..F..F. 0001E0

Dump of file SATURN:[PCCOMMON.DUMP.DLL]DAHELP.TMP;1 on 18-APR-1990 10:41:18.15
File ID (568,19,0)   End of file block 8 / Allocated 8

Virtual block number 8 (00000008), 512 (0200) bytes

00000000 00000000 00000000 00020001 00250103 0001FF00 00FFFFEA 5D044689 .F.]õ.........%................. 000000
20726F20 656E6F0C 00656E6F 04006F72 657A0500 74737560 05007961 6D040352 R..may..must..zero..one..one or  000020
2E2E2072 6F07002E 2E2E2072 6F2F646E 61080001 00010029 73280400 65726F6D more..(s)......and/or .....or .. 000040
0001002E 2E2E0400 666F2064 6E696820 61207369 0D002E2E 2E20646E 6108002E ...and .....is a kind of........ 000060
00000000 00000000 00000000 00000000 00000000 00000000 00000000 00010001 ................................ 000080
00000000 00000000 00000000 00000000 00000000 00000000 00000000 00000000 ................................ 0000A0
00000000 00000000 00000000 00000000 00000000 00000000 00000000 00000000 ................................ 0000C0
00000000 00000000 00000000 00000000 00000000 00000000 00000000 00000000 ................................ 0000E0
00000000 00000000 00000000 00000000 00000000 00000000 00000000 00000000 ................................ 000100
00000000 00000000 00000000 00000000 00000000 00000000 00000000 00000000 ................................ 000120
00000000 00000000 00000000 00000000 00000000 00000000 00000000 00000000 ................................ 000140
00000000 00000000 00000000 00000000 00000000 00000000 00000000 00000000 ................................ 000160
00000000 00000000 00000000 00000000 00000000 00000000 00000000 00000000 ................................ 000180
00000000 00000000 00000000 00000000 00000000 00000000 00000000 00000000 ................................ 0001A0
00000000 00000000 00000000 00000000 00000000 00000000 00000000 00000000 ................................ 0001C0
00000000 00000000 00000000 00000000 00000000 00000000 00000000 00000000 ................................ 0001E0
```

```
Dump of file SATURN:[PCCOMMON.DUMP.MSG]DAHELPM.MSG;1 on 18-APR-1990 10:53:53.83
File ID (967,9,0)   End of file block 1 / Allocated 4

Virtual block number 1 (00000001), 512 (0200) bytes

 23000000 00000000 00000000 00000000 01000000 0253454D 00464753 4D4B4DFF .MKMSGF.MES.....................# 000000
 490A0D2E 37252036 25352520 34252033 25203225 20312520 68636145 49003F00 .?.IEach %1 %2 %3 %4 %5%6 %7...I 000020
 00000000 00000000 0000730A 000A0D2E 34252033 25203225 20312520 68636145 Each %1 %2 %3 %4.....s.......... 000040
 00000000 00000000 00000000 00000000 00000000 00000000 00000000 00000000 ................................ 000060
 00000000 00000000 00000000 00000000 00000000 00000000 00000000 00000000 ................................ 000080
 00000000 00000000 00000000 00000000 00000000 00000000 00000000 00000000 ................................ 0000A0
 00000000 00000000 00000000 00000000 00000000 00000000 00000000 00000000 ................................ 0000C0
 00000000 00000000 00000000 00000000 00000000 00000000 00000000 00000000 ................................ 0000E0
 00000000 00000000 00000000 00000000 00000000 00000000 00000000 00000000 ................................ 000100
 00000000 00000000 00000000 00000000 00000000 00000000 00000000 00000000 ................................ 000120
 00000000 00000000 00000000 00000000 00000000 00000000 00000000 00000000 ................................ 000140
 00000000 00000000 00000000 00000000 00000000 00000000 00000000 00000000 ................................ 000160
 00000000 00000000 00000000 00000000 00000000 00000000 00000000 00000000 ................................ 000180
 00000000 00000000 00000000 00000000 00000000 00000000 00000000 00000000 ................................ 0001A0
 00000000 00000000 00000000 00000000 00000000 00000000 00000000 00000000 ................................ 0001C0
 00000000 00000000 00000000 00000000 00000000 00000000 00000000 00000000 ................................ 0001E0

Dump of file SATURN:[PCCOMMON.DUMP.DLL]DAIMDF.TMP;1 on 18-APR-1990 10:41:20.28
File ID (570,8,0)   End of file block 71 / Allocated 72

Virtual block number 1 (00000001), 512 (0200) bytes

 00000000 00000040 00000000 00000088 0000FFFF 00000004 00000040 018C5A4D MZ¥.@...........|........@....... 000000
 00000080 00000000 00000000 00000000 00000000 00000000 00000000 00000000 ................................ 000020
 6F6E6E61 63206061 72676F72 70207369 685421CD 4C01B821 CD098400 0EBA1F0E ..¤..Ç.ë|¡.LÉ!This program canno 000040
 00000000 00000024 0A0D0D2E 65646F6D 20534F44 206E6920 6E757220 65622074 t be run in DOS mode....$....... 000060
 000A0009 00000000 00030000 00000000 00068009 55873098 00070533 0505454E NE..3....0.U.................... 000080
 00000000 00000000 00010003 00040000 000005BA 0082009E 00940088 00400038 8.@.......ý.¤.................. 0000A0
 18FE0F00 18FE04C0 000F0F00 000F04BE 12A60F00 12A60380 2E540F00 2E540060 '.T...T...¦...¦./........@.±...±. 0000C0
 00D01EF1 00000821 02141EF1 021407FF 1C000F21 1A6A0656 03980E21 00000000 ....!...V.j.!.......þ...!.Å.þ.Å. 0000E0
 00010000 00464440 49414406 00080004 00040005 00030005 0A051E81 0A05082E ....Ý...............DAIMDF..... 000100
 4C414353 4F44084E 49574D50 05000474 0404030F 018300F0 0009002F 00100007 ..../.\.Þ.......t...PMWIN.DOSCAL 000120
 434F4C42 45455246 4D454D0C 4B434F4C 42434F4C 4C414D45 4D004D45 4D03534C LS.MEM.MEMALLOCBLOCK.MEMFREEBLOC 000140
 4C4D4413 4E585450 4F54534C 4D440A4E 58545452 4154534C 4D44086C 6D64034B K.dml.DMLSTARTTXN.DMLSTOPTXN.DML 000160
 4C4D440D 49544759 52455551 4C4D440B 454C444E 414B4C45 444F4D59 52455551 QUERYMODELHANDLE.DMLQUERYGTI.DML 000180
 46544553 4C4D440B 444C4549 46595245 55514C4D 440D544E 554F4359 52455551 QUERYCOUNT.DMLQUERYFIELD.DMLSETF 0001A0
 4D440831 4E4C5259 52455551 4C4D440C 4E4C5259 52455551 4C4D440B 444C4549 IELD.DMLQUERYRLN.DMLQUERYRLN1.DM 0001C0
 4C4D440E 4B434142 4C4C4F52 4E585450 4F54534C 4D441254 53494C45 4552464C LFREELIST.DMLSTOPTXNROLLBACK.DML 0001E0

Dump of file SATURN:[PCCOMMON.DUMP.DLL]DAIMDF.TMP;1 on 18-APR-1990 10:41:20.28
File ID (570,8,0)   End of file block 71 / Allocated 72

Virtual block number 2 (00000002), 512 (0200) bytes

 50415441 44585541 59524555 51495447 12495447 034C4C41 5443454C 45534544 DESELECTALL.GTI.GTIQUERYAUXDATAP 000000
 54544145 54414552 434D4144 00544E45 45544145 5243404l 440C6061 64035254 TR.dam.DAMCREATEENT.DAMCREATEATT 000020
 4C4D4144 0F4D4F44 45544145 52434D41 440C4D49 44455441 4552434D 41440C52 R.DAMCREATEDIM.DAMCREATEDOM.DAML 000040
 454C4544 4D41440D 544E4545 54454C45 44404144 0C544345 4A424F50 554B4F4F OOKUPOBJECT.DAMDELETEENT.DAMDELE 000060
 4554454C 45444D41 440E4E49 414D4F44 4554454C 45444D41 440F5254 54414554 TEATTR.DAMDELETEDOMAIN.DAMDELETE 000080
 53494C4D 46440E4D 46440352 5245594E 41544140 524F464D 41440F4E 454D4944 DIMEN.DAMFORMATANYERR.DFM.DFMLIS 0000A0
 45544345 4C45534D 45544959 52455551 5453494C 4D464418 4D455449 44444154 TADDITEM.DFMLISTQUERYITEMSELECTE 0000C0
 5355444C 45494659 52455551 4D464415 4D524F46 53534543 4F52504D 46440E44 D.DFMPROCESSFORM.DFMQUERYFIELDUS 0000E0
 44485952 4555514D 46440F50 41454842 48595245 55514D46 440E4154 41445245 ERDATA.DFMQUERYHBHEAP.DFMQUERYHD 000100
 4C44444E 57485952 4555514D 46440F4D 54485952 45555140 4644084A 424F4C4D HLOBJ.DFMQUERYHTM.DFMQUERYHWNDDL 000120
 4F545952 45555140 46440C53 55544154 53544649 48535952 4555514D 46441347 G.DFMQUERYSHIFTSTATUS.DFMQUERYTO 000140
 46524554 53494745 52404644 10415441 44524553 55595245 55514D46 44104C4F OL.DFMQUERYUSERDATA.DFMREGISTERF 000160
 444E414D 4D4F4354 45534D46 440F4E46 45534F4C 43544553 4D464400 444C4549 IELD.DFMSETCLOSEFN.DFMSETCOMMAND 000180
 54414749 56414E54 45534D46 44104E46 4C4F5254 4E4F4354 45534D46 440F4E46 FN.DFMSETCONTROLFN.DFMSETNAVIGAT 0001A0
 54414452 45535554 45534D46 440E4E46 59464954 4F4E5445 534D4644 0E4E4645 EFN.DFMSETNOTIFYFN.DFMSETUSERDAT 0001C0
 53534543 4F52504D 4644194D 524F4647 4E4F4C45 54414749 56414E4D 46441341 A.DFMNAVIGATELONGFORM.DFMPROCESS 0001E0
```

```
Dump of file SATURN:[PCCOMMON.DUMP.DLL]DAIMDF.TMP;1 on 18-APR-1990 10:41:20.28
File ID (570,8,0)   End of file block 71 / Allocated 72

Virtual block number 3 (00000003), 512 (0200) bytes

 44455453 494C5353 45434F52 504D4644 194C4F52 544E4F43 54494445 5453494C LISTEDITCONTROL.DFMPROCESSLISTED 000000
 45544345 4C455358 4F425453 494C5952 45555140 46441744 4E414D4D 4F435449 ITCOMMAND.DFMQUERYLISTBOXSELECTE 000020
 4F464144 0E4F464E 49524553 5554494E 494D524F 46414412 4D524F46 41440644 D.DAFORM.DAFORMINITUSERINFO.DAFO 000040
 41445055 4A424F0F 5443454C 45535449 4E494A42 4F0D454C 54495454 45534D52 RMSETTITLE.OBJINITSELECT.OBJUPDA 000060
 45445449 4E494A42 4F0B4353 45444554 41445055 4A424F0D 5443454C 45534554 TESELECT.OBJUPDATEDESC.OBJINITDE 000080
 59534C45 444A424F 094E5953 4444414A 424F094E 59535449 4E494A42 4F0A4353 SC.OBJINITSYN.OBJADDSYN.OBJDELSY 0000A0
 4F4E4444 414A424F 0A45544F 4E54494E 494A424F 0B4E5953 5045524A 424F094E N.OBJREPSYN.OBJINITNOTE.OBJADDNO 0000C0
 5F4D524F 46414413 45544F4E 5045524A 424F0A45 544F4E4C 45444A42 4F0A4554 TE.OBJDELNOTE.OBJREPNOTE.DAFORM  0000E0
 42404444 414A424F 0952424D 54494E49 4A424F0A 42415456 415F4554 41455243 CREATE_AVTAB.OBJINITMBR.OBJADDMB 000100
 4C4D4416 54554C4D 44055242 4D504552 4A424F09 31524240 4C45444A 424F0A52 R.OBJDELMBR1.OBJREPMBR.DMLUT.DML 000120
 45545349 47455254 554C4D44 1052454C 444E4148 59464954 4F4E454B 414D5455 UTMAKENOTIFYHANDLER.DMLUTREGISTE 000140
 4F525054 554C4D44 12455449 52575245 54534947 45525455 4C4D4412 54455352 RSET.DMLUTREGISTERWRITE.DMLUTPRO 000160
 4E554554 414C4552 52455453 49474552 54554C4D 441B5946 49544F4E 53534543 CESSNOTIFY.DMLUTREGISTERRELATEUN 000180
 20322F53 4F260000 27A70301 01455449 5257534F 44084F49 53034554 414C4552 RELATE.SIO.DOSWRITE...Ï'..&OS/2  0001A0
 726F4620 676E6F4C 206C6564 6F4D206E 6F697461 6D726F66 6D492041 44204D50 PM DA Imformation Model Long For 0001C0
 00000000 00000000 00000000 00000000 01504152 5453544F 4F424D49 08000060 m...IMBOOTSTRAP................. 0001E0

Dump of file SATURN:[PCCOMMON.DUMP.DLL]DAIMDF.TMP;1 on 18-APR-1990 10:41:20.28
File ID (570,8,0)   End of file block 71 / Allocated 72

Virtual block number 4 (00000004), 512 (0200) bytes

 F6E90374 01E47E83 E446890C 4688E246 890A4688 D88EFFFF 881E5657 00001EC8 à...WV.¦...Ä.F..Fâ.F..Fõ.-õ.t.õ- 000000
 E9E64688 0006E903 7500003D E6468900 00FFFF9A 5016E846 8D0E76FF 1076FF00 ..v..v..FÒ.P......F|=..u.õ...F|õ 000020
 E6468800 06E90375 00003DE6 46890000 FFFF9A50 16F2468D 0E76FF10 76FF01DE ß..v..v..F·.P......F|=..u.õ...F| 000040
 890AC483 FFFF263D 9A0E76FF 1076FFE2 76FF5016 FC468D00 63E9E246 8801BDE9 õ§..Fãõc..F=.P.vâ.v..v..=&...é.. 000060
 7401F27E 830028E9 0375FE46 08FC4688 0190E9E6 46880006 E9037500 003DE646 F|=..u.õ...F|õ...F=.F±u.õ(..~·.t 000080
 E6468800 06E90375 00003DE6 46890000 FFFF9AE8 76FFEA76 FF001CE9 0003E903 .õ..õ...võ.vÒ......F|=..u.õ...F| 0000A0
 88E90375 00743D00 18E90376 FF95E903 7500D03D 004BE900 4EE90051 E9015DE9 õ].õQ.õN.õK.=Å.u.õ..v.õ..=t.u.õ. 0000C0
 7500DA3D FF6DE903 7500053D FFD2E9FF 78E90375 00903DFF 80E90375 00863DFF .=..u.õ..=..u.õx.õ@.=f.u.õm.=õ.u 0000E0
 1076FF00 45E9E246 8BFFAFE9 FF55E903 7500EA3D FF5DE903 7500DF3D FF65E903 .õe.=õ.u.õ].=õ.u.õU.õ€..FãõE..v. 000100
 16F8468D E276FF0E 76FF1076 FF00AAE9 00000142 9A5016F4 468DE276 FF0E76FF .v..vã.F¶.P.B...õ¨..v..v..võ.F%. 000120
 E900C1E9 00008800 84E9F656 89F44689 02578826 078826F8 5EC40000 FFFF9A50 P.....é^¥&..&.W..F¶.V-õ..¦..õè.õ 000140
 3DFF9EE9 03750074 3DFFA6E9 03750071 300028E9 0376FFB3 E9037500 003D007B (.=Å.u.õ°.v.õ+.=q.u.õ|.=t.u.õ..= 000160
 E9037500 D83DFFBF E9FF86E9 037500CE 3DFF8EE9 03750090 3DFF96E9 0375008E ..u.õ..=..u.õ..=ö.u.õ..õ¢.=Å.u.õ 000180
 E9037500 DA3DFF9F E9FF66E9 03750005 3DFF6EE9 03750003 300013E9 0376FF7B (.v.õ..=&.u.õn.=f.u.õf.õ..=õ.u.õ 0001A0
 1076FFFF 7CE9FF59 E9037500 EA3DFF48 E9037500 DF3DFF53 E9037500 DD3DFF58 [.=f.u.õS.=õ.u.õK.=õ.u.õY.õ|..v. 0001C0
 F076FF00 00FFFF9A 5016EE46 8D0E76FF 1076FF00 00FFFF9A 5016EC46 8D0E76FF .v..Fâ.P......v..v..FŸ.P......vÞ 0001E0

Dump of file SATURN:[PCCOMMON.DUMP.DLL]DAIMDF.TMP;1 on 18-APR-1990 10:41:20.28
File ID (570,8,0)   End of file block 71 / Allocated 72

Virtual block number 5 (00000005), 512 (0200) bytes

 0000E900 00FFFF9A EC76FFF4 76FFF676 FF0676FF 0876FF0A 76FF0C76 FFEE76FF .vŸ.v..v..v..v..v-.v¶.vâ.....õ.. 000000
 FF0045E9 EC468BEC 46890A46 8BD88E00 08881E56 57000014 C8000CCA C95F5E1F .^_èò..à...WV.¦...Ä.F..Fã.FãõE.. 000020
 468DEC76 FF0E76FF 1076FF00 62E90000 02649A50 16F8468D EC76FF0E 76FF1076 v..v..vâ.F%.P.d...õb..v..v..vâ.F 000040
 89E90000 B8003CE9 FA5689F8 46890257 88260788 26FC5EC4 0000012C 9A5016FC =.P.,...é^=&..&.W..F%.V*õ<.¦..õ. 000060
 7700ED3D FFDFE903 7300EB30 FFA8E903 7700933D FFEFE903 73009130 0033E900 .õ3.=..s.õÿ.=..w.õ¨.=Š.s.õõ.=Ù.w 000080
 F2468D0E 76FF1076 FFFFC4E9 FF88E903 77013A3D FFCFE903 73012C30 FFB1E903 .õŸ.=,.s.õü.=:.w.õ..õá..v..v..F· 0000A0
 EE468D0E 76FF1076 FF000001 F99A5016 F4468D0E 76FF1076 FF000001 E99A5016 .P.õ....v..v..F¶.P.ª....v..v..FŸ 0000C0
 FFF876FF FA76FF06 76FF0876 FF0A76FF 0C76FFF4 76FFF676 FF000000 2D9A5016 .P.-....v-.v¶.v..v..v..v..vª.v%. 0000E0
 0A76FFD8 8E022F88 1E565700 0004C800 0CCAC95F 5E1F0000 E90000FF FF9AF276 v·.....õ...^_èò..àâ..WV.¦/..Ä.v. 000100
 46890000 FFFF9A06 76FFFF30 B6FFFF32 B6FF0000 02039A50 16FF3086 8D0876FF .v...0..P.Æ¯...Ñ2..Ñ0..v.......F 000120
 09E90375 23FF348E 800000FF FF9A5016 FF34868D 406AF876 FFFA76FF FA5689F8 %.Vª.vª.v%jä..4..P....../4.#u.õ. 000140
 8689FFCA 83000000 04C483FF FF00529A 5016FF35 86800009 E90000BA 0000B800 .¦..¤..õ1...5..P.R....á.....ò... 000160
 B6FFFF32 B6FF001C E90374FF FF768E83 0026E903 7407FF74 8E83FF76 9689FF74 t...v../t..t.õ£../v..t.õ...Ñ2..Ñ 000180
 0026E903 7406FF74 BE830039 E90000FF FF9A0080 685016FF 78868D06 76FFFF30 0..v...x..Ph.......õ9../t..t.õ£. 0001A0
 FF9A5016 FF78868D 00806806 76FFFF30 B6FFFF32 B6FF001C E90374FF FF768E83 ./v..t.õ...Ñ2..Ñ0..v.h....x..P.. 0001C0
 0000FFFF 9A5016FF 2E868008 76FF0A76 FF0054E9 00008A00 00B80009 E90000FF ...õ..¦..¤..õT..v..v......P..... 0001E0
```

Dump of file SATURN:[PCCOMMON.DUMP.DLL]DAIMDF.TMP;1 on 18-APR-1990 10:41:20.28
File ID (570,8,0)   End of file block 71 / Allocated 72

Virtual block number 6 (00000006), 512 (0200) bytes

```
E9037500 003DFF2C 86890AC4 83007A26 3D9A0876 FF0A76FF 0676FF50 16FC468D .F=.P.v..v..v..=&z..á...,.=..u.Õ 000000
0000FFFF 9A5016FF 78868DFC 76FFFE76 FFFF2EB6 FF0018E9 00008A00 00880009 ..|..¤..Õ...Ñ...v±.v=..x..P..... 000020
FF004AE9 03740C08 7E83088E 0319881E 56570000 0AC80006 CAC95F5E 1F0000E9 Õ...^_èò..à...WV.|...Ä.-..t.ÕJ.. 000040
0089E9F6 46880006 E9037500 003DF646 890000FF FF9A5016 FC46800E 76FF1076 v..v..F=.P......F-=..u.Õ...F-Õ¿. 000060
FF9A656A 0E76FF10 76FF000D E903740C 56390015 E903740A 4639FE56 8BFC468B .F=.V±9F.t.Õ..9V.t.Õ...v..v.je.. 000080
7500003D F6468900 00FFFF9A 5016F846 8D0E76FF 1076FF00 90E90000 880000FF ...|..Õ...v..v..F%.P......F-=..u 0000A0
76FF1677 FF261877 FF26F85E C4000114 47C726F8 5EC4006F E9F6468B 0006E903 .Õ...F-Õo.á^%&úG...á^%&.w.&.w..v 0000C0
0039E9F6 46880006 E9037500 003DF646 890000FF FF9A0676 FF0876FF 0A76FF0C ..v..v..v.......F-=..u.Õ...F-Õ9. 0000E0
00A1680E 76FF1076 FF000005 219A00A0 680E76FF 1076FF00 001447C7 26F85EC4 á^%&úG....v..v.h...!....v..v.hÀ. 000100
000CCAC9 5F5E1F00 00E90000 880000FF FF9A009F 680E76FF 1076FF00 00052F9A ./....v..v.h.......|..Õ...^_èò.. 000120
9A5016F8 46800A76 FF0C76FF 000107C7 26065EC4 D88E0452 881E5657 00000EC8 à...WV.|R..Äá^.&ú....v..v..F%.P. 000140
9A5016F4 46800A76 FF0C76FF 000002C3 9A5016FC 46800A76 FF0C76FF 0000032A *....v..v..F=.P.ú....v..v..F¶.P. 000160
FFFF9AF4 76FFF676 FFFC76FF 000003FC 9A5016FE 46800A76 FF0C76FF 000004B5 ç....v..v..F±.P.=....v=.v-.v¶... 000180
56570000 5AC80008 CAC95F5E 1F0000E9 00008800 00E90375 000030F2 46890000 ...F·=..u.Õ..|..Õ...^_èò..àZ..WV 0001A0
0005609A 5016AC46 800876FF 0A76FF00 00FFFF9A 0876FF0A 76FFD88E 0548881E .|M..Ä.v..v.......v..v̄..F¯.P.'.. 0001C0
02E39A50 16A8468D 0876FF0A 76FF009D E9A6468B 0006E903 7500003D A6468900 ..F|=..u.Õ...F|Õ...v..v..F´.P.D. 0001E0
```

Dump of file SATURN:[PCCOMMON.DUMP.DLL]DAIMDF.TMP;1 on 18-APR-1990 10:41:20.28
File ID (570,8,0)   End of file block 71 / Allocated 72

Virtual block number 7 (00000007), 512 (0200) bytes

```
689A5016 FC468008 76FF0A76 FF007CE9 A6468800 06E90375 000030A6 46890000 ...F|=..u.Õ...F|Õ|..v..v..F=.P.k 000000
FC76FFFE 76FFA876 FFAA76FF 0058E9A6 46880006 E9037500 003DA646 89000004 ....F|=..u.Õ...F|Õ[..v´.v´.v±.v= 000020
AE76FF00 32E9A646 880006E9 03750000 3DA64689 0000FFFF 9A501680 468D2F6A j/.F¯.P......F|=..u.Õ...F|Õ2..v0 000040
800676FF AC76FFAE 76FF0000 FFFF9A00 6A006A48 6A006A01 43680676 FFAC76FF .v¯.v.hC.j.jKj.j.......v0.v¯.v.. 000060
05C2881E 56570000 A6C80006 CAC95F5E 1F0000E9 00008800 00FFFF9A 50168046 F¯.P.....|..Õ...^_èò..àl..WV.|ò. 000080
009A5016 FC468D14 76FF1676 FF000407 C7260E5E C4078926 12468806 5EC4088E .Äá^..F.&..á^.&ú.¯...v..v..F=.P.T 0000A0
FF608680 1476FF16 76FF0188 E9FF5E86 880007E9 03750000 30FF5E86 89000005 .....^.=..u.Õ....^.ÕE..v..v...'. 0000C0
B6FFFF62 B6FF0197 E9FF5E86 880007E9 03750000 30FF5E86 89000005 FE9A5016 .P.±.....^.=..u.Õ....^.Õ...Ñb..Ñ 0000E0
0171E9FF 5E868800 07E90375 000030FF 5E868900 00FFFF9A 5016FF5A 868DFF60 '...Z..P.......^.=..u.Õ....^.Õq. 000100
5CB6FFFF 60B6FFFF 62B6FF00 00030F9A 5016FF64 86804B6A 6E6AFC76 FFFE76FF .v±.v=jnjK..d..P.Õ....Ñb..Ñ'..Ñ\ 000120
5E868800 07E90375 000030FF 5E868900 0006489A 50168046 802F6AFF 5AB6FFFF ..ÑZ.j/.F¯.P.M.....^.=..u.Õ....^ 000140
B80006E9 03740000 3008C483 03730010 9A5016FF 64868050 16804680 012DE9FF .Õ-..F¯.P..d..P...s..á.=..t.Õ..| 000160
9A505207 B08A0200 B8019668 2E6A0396 36FF2619 86068E00 6A006A01 0CE90000 ..Õ..j.j.....&.6..j.h..|..¤¯.RP. 000180
000030FF 5E868900 00FFFF9A 5052FFFF BA020088 FF60B6FF FF62B6FF 0000FFFF .....Ñb..Ñ'.|..¤..RP.......^.=.. 0001A0
B6FF0083 E9FF5E86 88000008 4D9A0A76 FF0C76FF 019668FF 5EB6FF00 19E90375 u.Õ...Ñ^.h...v..v..M.....^.Õ°..Ñ 0001C0
30FF5E86 890000FF FF9A5016 FF64868D 2F6AFF5A B6FFFF5C B6FFFF60 B6FFFF62 b..Ñ'..Ñ\..ÑZ.j/..d..P.......^.= 0001E0
```

Dump of file SATURN:[PCCOMMON.DUMP.DLL]DAIMDF.TMP;1 on 18-APR-1990 10:41:20.28
File ID (570,8,0)   End of file block 71 / Allocated 72

Virtual block number 8 (00000008), 512 (0200) bytes

```
76FF1676 FF0076E9 FF5E8688 0000FFFF 9AFF6086 FFFF62B6 FF0014E9 03750000 ..u.Õ...Ñb..Ñ'........^.Õv..v..v 000000
FF0019E9 03750000 30FF5E86 890000FF FF9AFF60 B6FFFF62 B6FF0000 05CD9A14 ..ë....Ñb..Ñ'........^.=..u.Õ... 000020
A0681476 FF1676FF 0039E9FF 5E868800 00FFFF9A 0A76FF0C 76FF0196 68FF5EB6 Ñ^.h...v..v........^.Õ9..v..v.h. 000040
05139A00 9F681476 FF1676FF 0000087E 9A00A168 1476FF16 76FF0000 08709A00 ..p....v..v.hÅ..~....v..v.h..... 000060
B81E5657 000062C8 0012CAC9 5F5E1F00 00E9FF5E 86880001 07C7260E 5EC40000 ..á^.&ú.....^.Õ...^_èò..àb..WV.| 000080
880006E9 03750000 3DA64689 0000068F 9A5016AC 46800876 FF0A76FF D88E069E ...Ä.v..v..F¯.P.¢..¯.F|=..u.Õ... 0000A0
0006E903 7500003D A6468900 0006E39A 5016A846 800876FF 0A76FF01 3EE9A646 F|Õ>..v..v..F´.P.D....F|=..u.Õ.. 0000C0
06E90375 00003DA6 46890000 07099A50 16A2468D A876FFAA 76FF011D E9A6468B .F|Õ...v´.v´.FÅ.P......F|=..u.Õ. 0000E0
890000FF FF9A5016 9E468018 6AA276FF A476FFA8 76FFAA76 FF00FCE9 A6468800 ..F|Õ=..v¯.v´.vÊ.vÅj..F..P...... 000100
4B6A006A 01436800 CE68AC76 FFAE76FF 00D3E9A6 46880006 E9037500 003DA646 F|=..u.Õ...F|Õ&..v0.v¯hö.hC.j.jK 000120
26805EC4 04804683 0004E9B2 5689B046 89A05688 9E468800 0006729A 006A006A j.j..r....F..V..F¯.VýÕ...F¯.á^¯& 000140
B4468D02 6A37FF26 0277FF26 B05EC4A8 76FFAA76 FF0081E9 03750247 08260788 ..&.G.u.Õ...v¯.v´á^¯&.w.&.7j..FÇ 000160
DF9A9E76 FFA076FF A876FFAA 76FF0017 E9037500 003DA646 89000007 4D9A5016 .P.M....F|=..u.Õ...v´.v´.v..v..Õ 000180
260277FF 26805EC4 50168446 80005868 1EAC76FF AE76FF00 5AE9A646 88000009 ....F|ÕZ..v0.v¯.hX..FÇ.Pá^¯&.w.& 0001A0
F99A9E76 FFA076FF A876FFAA 76FF0017 E9037500 003DA646 890000FF FF9A37FF .7......F|=..u.Õ...v´.v´.v..v..* 0001C0
00008800 00FFFF9A 9E76FFA0 76FFA876 FFAA76FF FF6CE900 1AE9A646 88000009 ....F|Õ..Õl..v´.v´.v..v......|.. 0001E0
```

Dump of file SATURN:[PCCOMMON.DUMP.DLL]DAIMDF.TMP;1 on 18-APR-1990 10:41:20.28
File ID (570,8,0)   End of file block 71 / Allocated 72

Virtual block number 9 (00000009), 512 (0200) bytes

```
5EC400CE 07C72606 5EC4D88E 08A0B81E 56570000 5AC80006 CAC95F5E 1F0000E9 Õ...^_èò..àZ..WV.¡...Ãá^.&ú.ö.á^ 000000
06E90375 000030AA 46890000 08809A50 16FC468D 1476FF16 76FF0004 07C7260E .&ú.....v..v..F=.P.¯.....F`=..u.Õ. 000020
E9037500 0030AA46 89000006 1F9A5016 A6468D14 76FF1676 FF01B4E9 AA468800 ..F`ÕÇ..v..v..Fl.P......F`=..u.Õ 000040
03750000 30AA4689 000008D1 9A5016AC 468D1476 FF1676FF 0193E9AA 46880006 ...F`Õ...v..v..F¯.P.l....F`=..u. 000060
80000007 319A5016 B04680048 6A005A36 FFFC76FF FE76FF01 72E9AA46 880006E9 Õ...F`Õr..v±.v=.6Z.jK.F¯.P.1.... 000080
9636FF26 1986068E 006A006A 010FE903 75000030 04C48307 72003A9A 50168046 F¯.P.:.-..£.=..u.Õ..j.j.....&.6. 0000A0
52079BBA 02008BAC 76FFAE76 FF000007 A09A5052 0ADDBA02 00880196 68216A03 .jlh..¡..oI.RP......vÛ.v¯¡..¤..R 0000C0
08459A0A 76FF0C76 FF019668 AA76FF00 1AE90375 000030AA 46890000 07859A50 P.ç....F`=..u.Õ...v`h...v..v..E. 0000E0
FFFF9A00 6A5016B0 468D5016 A6468DAC 76FFAE76 FF0088E9 00F3E9AA 46880000 ...F`Õæ.Õ¡..vÛ.v¯.Fl.P.F¯.Pj.... 000100
76FF0196 68AA76FF 0000087B 9AAC76FF AE76FF00 22E90375 000030AA 46890000 ...F`=..u.Õ"..vÛ.v¯.(....v`h...v 000120
76FF5016 B0468D00 58681EFC 76FFFE76 FF00ACE9 AA468800 0088C9A 0A76FF0C ..v.......F`Õ¯..v±.v=.hX..F¯.P.v 000140
FF000008 109AAC76 FFAE76FF 0022E903 75000030 AA468900 0009C39A A676FFA8 `.vl.û....F`=..u.Õ"..vÛ.v¯...... 000160
00082F9A AC76FFAE 76FF0065 E9AA4688 000008B9 9A0A76FF 0C76FF01 9668AA76 v`h...v..v..¿....F`Õe..vÛ.v¯./.. 000180
AA468800 0007D39A 0A76FF0C 76FF0196 68AA76FF 0017E903 75000030 AA468900 ..F`=..u.Õ.:.v`h...v..v..Æ....F` 0001A0
681476FF 1676FF00 0008E39A 00A06814 76FF1676 FF000307 C7260E5E C40038E9 Õ8.á^.&ú....v..v.h...Ð....v..v.h 0001C0
CAC95F5E 1F0000E9 AA468800 0008629A 009F6814 76FF1676 FF000008 F19A00A1 À..þ....v..v.h...b....F`Õ...^_èò 0001E0
```

Dump of file SATURN:[PCCOMMON.DUMP.DLL]DAIMDF.TMP;1 on 18-APR-1990 10:41:20.28
File ID (570,8,0)   End of file block 71 / Allocated 72

Virtual block number 10 (0000000A), 512 (0200) bytes

```
FF078926 12468806 5EC40004 07C7260E 5EC4D88E 0A12B81E 56570000 02C80012 ..à...WV.¡...Ãá^.&ú...á^..F.&... 000000
1121999A 1476FF16 76FFA5F2 00088907 16FC8800 588E16EC 83026A0A 76FF0C76 v..v.j..š.ƒX..=..¿..`Ê.v..v...l. 000020
1676FF00 0107C726 0E5EC400 38E9FE46 880006E9 03750000 30FE4689 20C48304 ..á .F±=..u.Õ...F±Õ8.á^.&ú....v. 000040
681476FF 1676FF00 000C839A 00A16814 76FF1676 FF00000C 759A00A0 681476FF .v.h...u.....v..v.hÀ.......v..v.h 000060
D88E0C0A B81E5657 00000EC8 0012CAC9 5F5E1F00 00E9FE46 8800000B D59A009F ...f....F±Õ...^_èò..à...WV.¡...Ã 000080
16EC8302 6A5016F2 468D0A76 FF0C76FF 000207C7 260E5EC4 00CE07C7 26065EC4 á^.&ú.ö.á^.&ú....v..v..F`.Pj..š. 0000A0
000030F6 468924C4 830C3F1F E79A1476 FF1676FF A5F2000B 890716FC 8800588E ƒX..=..¿..`Ê.v..v..Ó.?..á F-=.. 0000C0
0030F646 8900000A 749A5016 F8468D14 76FF1676 FF013CE9 F6468800 06E90375 u.Õ...F-Õ<..v..v..F‰.P.t..  F-=. 0000E0
30F64689 00000A32 9A5016FC 468D1476 FF1676FF 011BE9F6 46880006 E9037500 .u.Õ...F-Õ...v..v..F=.P.2....F-= 000100
B8019668 236A0396 36FF2619 86068E00 6A006A00 FAE9F646 880006E9 03750000 ..u.Õ...F-Õ°.j.j.....&.6..jæh..¡ 000120
8900000A E29A5052 0ACABA02 0088F876 FFFA76FF 00000ACF 9A505200 568A0200 ..¤V.RP.Û....v°.v½¡..¤ò.RP.š.... 000140
A6E9F646 88000000 B89A0A76 FF0C76FF 019668F6 76FF001A E9037500 0030F646 F-=..u.Õ...v-h...v..v..¡....F-Õl 000160
0022E903 75000030 F6468900 00FFFF9A F276FFF4 76FFF876 FFFA76FF 006BE900 .Õk..v°.v½.v¶.v.......F-=..u.Õ". 000180
E9F6468B 000000E5 9A0A76FF 0C76FF01 9668F676 FF000008 349AF876 FFFA76FF .v°.v½.4....v-h...v..v..l....F-Õ 0001A0
76FF0196 68F676FF 0017E903 75000030 F6468900 000B9D9A F876FFFA 76FF0065 e..v°.v½......F-=..u.Õ...v-h...v 0001C0
00A06814 76FF1676 FF000107 C7260E5E C40038E9 F6468800 000AFE9A 0A76FF0C ..v..±....F-Õ8.á^.&ú....v..v.h.. 0001E0
```

Dump of file SATURN:[PCCOMMON.DUMP.DLL]DAIMDF.TMP;1 on 18-APR-1990 10:41:20.28
File ID (570,8,0)   End of file block 71 / Allocated 72

Virtual block number 11 (0000000B), 512 (0200) bytes

```
000C679A 009F6814 76FF1676 FF00000E 1D9A00A1 681476FF 1676FF00 000E0F9A ......v..v.hÀ.......v..v.h...g.. 000000
0876FF0A 76FFD88E 0C9CB81E 56570000 62C80012 CAC95F5E 1F0000E9 F6468800 ..F-Õ...^_èò..àb..WV.¡...Ã.v..v. 000020
76FF0A76 FF013EE9 A2468800 06E90375 00003DA2 46890000 0D189A50 16F8468D .F‰.P.......FÅ=..u.Õ...FÅÕ>..v..v 000040
FFA676FF 011DE9A2 46880006 E9037500 003DA246 8900000C F79A5016 A4468D08 ..FÊ.P.‰....FÅ=..u.Õ...FÅÕ...vl. 000060
A676FF00 FCE9A246 880006E9 03750000 3DA24689 000008F2 9A50169E 468DA476 vÊ.F..P.·....FÅ=..u.Õ...FÅÕ=..vl 000080
0006E903 75000030 A2468900 000918 9A 5016FC46 8D136A9E 76FFA076 FFA476FF .vÊ.v..v.j..F=.P......FÅ=..u.Õ.. 0000A0
8B000009 459A006A 006A4B6A 006A0143 68000368 F876FFFA 76FF0003 E9A2468B .FÅÕÆ..v°.v½hÆ.hC.j.jKj.j..E.... 0000C0
81E90375 02470826 078826A8 5EC404A8 46830004 E9AA5689 A84689FE 5688FC46 F=.V±.F`.V`Õ...F`.á^`&..&.G.u.Õ. 0000E0
A2468900 0009839A 5016AC46 8D026A37 FF260277 FF26A85E C4A476FF A676FF00 ..vl.vÊá^`&.w.&.7j..F¯.P......FÅ 000100
FF005AE9 A2468800 000F759A FC76FFFE 76FFA476 FFA676FF 0017E903 75000030 =..u.Õ...vl.vÊ.v±.v=.u....FÅÕZ.. 000120
A2468900 0008659A 37FF2602 77FF26A8 5EC45016 AC468D00 6E681EF8 76FFFA76 v°.v½.hn..F¯.Pá^`&.w.&.7.e....FÅ 000140
E9001AE9 A2468800 000F8F9A FC76FFFE 76FFA476 FFA676FF 0017E903 75000030 =..u.Õ...vl.vÊ.v±.v=......FÅÕ..Õ 000160
0006CAC9 5F5E1F00 00E90000 8B000009 9F9AFC76 FFFE76FF A476FFA6 76FFFF6C l..vl.vÊ.v±.v=.....¡..Õ...^_èò.. 000180
FF1676FF 000407C7 260E5EC4 000307C7 26065EC4 D88E0E36 B81E5657 00005EC8 à^..WV.¡6..Ãá^.&ú.Æ.á^.&ú....v.. 0001A0
1676FF01 C1E9A246 880006E9 03750000 3DA24689 00000E46 9A5016FC 468D1476 v..F=.P.F....FÅ=..u.Õ...FÅÕ¢..v. 0001C0
76FF01A0 E9A2468B 0006E903 75000030 A2468900 000A539A 5016F846 8D1476FF .v..F‰.P.S....FÅ=..u.Õ...FÅÕ...v 0001E0
```

```
Dump of file SATURN:[PCCOMMON.DUMP.DLL]DAIMDF.TMP;1 on 18-APR-1990 10:41:20.28
File ID (570,8,0)   End of file block 71 / Allocated 72

Virtual block number 12 (0000000C), 512 (0200) bytes

FF017FE9 A2468800 06E90375 000030A2 46890000 0E679A50 16F0468D 1476FF16 ..v..Fþ.P.g....FÅ=..u.Õ...F, ` .. 000000
830AA700 3A9A5016 A4468000 000A989A 5016A446 8D4B6A00 7036FFFC 76FFFE76 v±.v=.6p.jK.FÊ.P......FÊ.P.:.l.. 000020
8A020088 01966824 6A039636 FF261986 068E006A 006A011C E9037500 003D04C4 á.=..u.Õ..j.j.....&.6..j$h..j..¤ 000040
3DA24689 0000005B 9A50520D 43BA0200 88F076FF F276FF00 0000489A 50521073 s.RP.H....v·.vþ|..¤C.RP.[....FÅ= 000060
C5E90100 E9A24688 000010E8 9A0A76FF 0C76FF01 9668A276 FF001AE9 03750000 ..u.Õ...vÅh...v..v..Ò....FÅÕ..Õé 000080
006A5016 F4468050 16A44680 5016F846 8D006A00 6A006A00 6AF076FF F276FF00 ..v·.vþj.j.j.j..F½.P.FÊ.P.F¶.Pj. 0000A0
9668A276 FF000011 1E9AF076 FFF276FF 0022E903 75000030 A2468900 00FFFF9A ......FÅ=..u.Õ"..v·.vþ......vÅh. 0000C0
16A4468D 006E681E FC76FFFE 76FF00AC E9A24688 0000112F 9A0A76FF 0C76FF01 ..v..v../....FÅÕ¯..v±.v=.hn..FÊ. 0000E0
0DA79AF0 76FFF276 FF0022E9 03750000 3DA24689 00000F59 9AF876FF FA76FF50 P.v°.v½.Y....FÅ=..u.Õ"..v·.vþ.I. 000100
9AF076FF F276FF00 65E9A246 88000011 5C9A0A76 FF0C76FF 019668A2 76FF0000 ...vÅh...v..v..\....FÅÕe..v·.vþ. 000120
00000D77 9A0A76FF 0C76FF01 9668A276 FF0017E9 03750000 3DA24689 000000C9 è....FÅ=..u.Õ...vÅh...v..v..w... 000140
FF1676FF 00001186 9A00A068 1476FF16 76FF0003 07C7260E 5EC40038 E9A24688 .FÅÕ8.á^.&ú....v..v.h........v.. 000160
5E1F0000 E9A24688 00000E01 9A009F68 1476FF16 76FF0000 11949A00 A1681476 v.hÅ.......v..v.h.........FÅÕ...^ 000180
26124688 065EC400 0407C726 0E5EC408 8E0FA888 1E565700 0002C800 12CAC95F _èò..à...WV.¡´..Äá^.&ú...á^..F.& 0001A0
9A1476FF 1676FFA5 F20008B9 0716FC88 006E8E16 EC83056A 0A76FF0C 76FF0789 ¨..v..v.j..$.ƒn..=..¿..¨Ê.v..v.. 0001C0
000107C7 260E5EC4 0038E9FE 46880006 E9037500 003DFE46 8920C483 0CD52199 .ſſ..á .F±=..u.Õ...F±Õ8.á^.&ú... 0001E0
```

```
Dump of file SATURN:[PCCOMMON.DUMP.DLL]DAIMDF.TMP;1 on 18-APR-1990 10:41:20.28
File ID (570,8,0)   End of file block 71 / Allocated 72

Virtual block number 13 (0000000D), 512 (0200) bytes

FF1676FF 00001226 9A00A168 1476FF16 76FF0000 12189A00 A0681476 FF1676FF .v..v.h........v..v.hÅ..&....v.. 000000
AD881E56 57000014 C80012CA C95F5E1F 0000E9FE 46880000 11789A00 9F681476 v.h...x....F±Õ...^_èò..à...WV.¡Ù 000020
46800A76 FF0C76FF 000307C7 26065EC4 000207C7 260E5EC4 0000FA46 C7D88E11 ..ÄúF°..á^.&ú...á^¯.&ú.£..v..v..F 000040
8311E21F E79A1476 FF1676FF A5F2000B B90716FC 88006E8E 16EC8305 6A5016F2 ·.Pj..$.ƒn..=..¿..·Ê.v..v..Ò.ã.. 000060
0A9A5016 EE468D14 76FF1676 FF01B1E9 EC468800 06E90375 00003DEC 468924C4 á$.F$=..u.Õ...F$ÕŸ..v..v..FŸ.P.. 000080
9A5016F6 468D1476 FF1676FF 0190E9EC 46880006 E9037500 003DEC46 89000010 ....F$=..u.Õ...F$Õ...v..v..F-.P. 0000A0
76FFF476 FFEE76FF F076FF01 6FE9EC46 880006E9 03750000 3DEC4689 00000FC8 à....F$=..u.Õ...F$Õo..vþ.vŸ.v¶.v 0000C0
7E830146 E9EC4688 0006E903 75000030 EC468900 00FFFF9A 5016FC46 8D086AF2 ·j..F=.P......F$=..u.Õ...F$ÕF..- 0000E0
068E006A 006A0001 FA46C700 05E90377 00FC7E83 0009E903 7E0013E9 037D00FE ±.).Õ..-.Õ...~=.w.Õ..úF°..j.j... 000100
B8EE76FF F076FF00 0010659A 50521343 8A020088 01966826 6A039636 FF261986 ..&.6..j&h..¡..¤C.RP.e....vþ.vŸ¡ 000120
0C76FF01 9668EC76 FF001AE9 03750000 3DEC4689 00001078 9A505210 608A0200 ..¤'.RP.x....F$=..u.Õ...v$h...v. 000140
FFFF9AF2 76FFF476 FFEE76FF F076FF00 68E90006 E9EC4688 000013A5 9A0A76FF .v..Ê....F$Õ=.Õk..vþ.vŸ.v¶.v·... 000160
76FF0196 68EC76FF 00001007 9AEE76FF F076FF00 22E90375 00003DEC 46890000 ...F$=..u.Õ"..vþ.vŸ.=....v$h...v 000180
00003DEC 46890000 11409AEE 76FFF076 FF0095E9 EC468800 0010949A 0A76FF0C ..v.......F$Õ...vþ.vŸ.ə....F$=.. 0001A0
260E5EC4 0068E9EC 46880000 13649A0A 76FF0C76 FF019668 EC76FF00 17E90375 u.Õ...v$h...v..v..d....F$Õh.á^.& 0001C0
0000140A 9A00A168 1476FF16 76FF0000 13FC9A00 A0681476 FF1676FF 000107C7 ú....v..v.h...=.....v..v.hÅ...... 0001E0
```

```
Dump of file SATURN:[PCCOMMON.DUMP.DLL]DAIMDF.TMP;1 on 18-APR-1990 10:41:20.28
File ID (570,8,0)   End of file block 71 / Allocated 72

Virtual block number 14 (0000000E), 512 (0200) bytes

000568F6 76FFF876 FF0027E9 037401FA 7E830000 120A9A00 9F681476 FF1676FF .v..v.h........~°.t.Õ'..v½.v~hf. 000000
4688127D 0E2E9A00 D5681476 FF1676FF 00000ED8 9A006A00 6A006A00 6A016E68 hn.j.j.j.j..Ù....v..v.hf....)..F 000020
F8468D08 76FF0A76 FFD88E12 3F881E56 57000062 C80012CA C95F5E1F 0000E9EC $Õ...^_èò..àb..WV.¡?..Ä.v..v..F½ 000040
46800876 FF0A76FF 013EE9F2 46880006 E9037500 003DF246 89000012 C09A5016 .P.á....F·=..u.Õ...F·Õ>..v..v..F 000060
8DF476FF F676FF01 1DE9F246 880006E9 03750000 3DF24689 0000129F 9A5016F4 ¶.P......F·=..u.Õ...F·Õ...v~.v¶. 000080
F476FFF6 76FF00FC E9F24688 0006E903 75000030 F2468900 000E889A 50169E46 F..P......F·=..u.Õ...F·Õ=..v~.v¶ 0000A0
F2468800 06E90375 000030F2 46890000 0E819A50 16FC468D 176A9E76 FFA076FF .v..v.j..F=.P.Ÿ....F·=..u.Õ...F· 0000C0
88FC4688 0000142C 9A006A00 6A486A00 6A014368 000868F8 76FFFA76 FF0003E9 Õ£..v°.v½hÄ.hC.j.jKj.j.......F=. 0000E0
76FF0081 E9037502 47082607 8826A25E C404A246 830004E9 A45689A2 4689FE56 V±.FÅ.VEÕ...FÅ.á^Å£..&.G.u.Õ...v 000100
000030F2 46890000 0F199A50 16A6468D 026A37FF 260277FF 26A25EC4 F476FFF6 -.v¶á^Å£.w.&.7j..Fl.P......F·=.. 000120
FFFA76FF 005AE9F2 46880000 15929AFC 76FFFE76 FFF476FF F676FF00 17E90375 u.Õ...v~.v¶.v±.v=......F·ÕZ..v°. 000140
000030F2 46890000 11089A37 FF260277 FF26A25E C45016A6 46800084 681EF876 v½.h...Fl.Pá^Å£.w.&.7......F·=.. 000160
FFFF6CE9 001AE9F2 46880000 15AC9AFC 76FFFE76 FFF476FF F676FF00 17E90375 u.Õ...v~.v¶.v±.v=.¯....F·Õ..Õl.. 000180
005EC800 06CAC95F 5E1F0000 E9000088 00000F35 9AFC76FF FE76FFF4 76FFF676 v~.v¶.v±.v=.5...¡..Õ...^_èò..à^. 0001A0
8D1476FF 1676FF00 0407C726 0E5EC400 D807C726 065EC408 8E145388 1E565700 .WV.¡S..Äá^.&ú.Ä.á^.&ú....v..v.. 0001C0
1476FF16 76FF01C5 E9F24688 0006E903 75000030 F2468900 0014639A 5016FC46 F=.P.c....F·=..u.Õ...F·Õé..v..v. 0001E0
```

```
Dump of file SATURN:[PCCOMMON.DUMP.DLL]DAIMDF.TMP;1 on 18-APR-1990 10:41:20.28
File ID (570,8,0)   End of file block 71 / Allocated 72

Virtual block number 15 (0000000F), 512 (0200) bytes

 76FF1676 FF01A4E9 F2468800 06E90375 00003DF2 46890000 14849A50 16F44680 .F¶.P......F·=..u.Õ...F·ÕE..v..v 000000
 FFFE76FF 0183E9F2 46880006 E9037500 003DF246 8900000F E99A5016 EE468014 ..FŸ.P.Õ....F·=..u.Õ...F·Õ...v±. 000020
 3004C483 103D003A 9A5016A2 46800000 10319A50 16A24680 4B6A0086 36FFFC76 v=.6..jK.FÅ.P.1....FÅ.P.:.=..6.= 000040
 5216908A 02008801 9668276A 039636FF 26198606 8E006A00 6A0120E9 03750000 ..u.Õ .j.j.....&.6..j'h..j..¤..R 000060
 7500003D F2468900 0013489A 50521330 BA020088 F476FFF6 76FF0000 13359A50 P.5....v-.v¶|..¤0.RP.H....F·=..u 000080
 76FF00C9 E90104E9 F2468800 0016FE9A 0A76FF0C 76FF0196 68F276FF 001AE903 .Õ...v·h...v..v..±....F·Õ..Õè..v 0000A0
 003DF246 890000FF FF9A006A 5016A246 8D5016F8 468DEE76 FFF076FF F476FFF6 -.v¶.vÞ.vŸ.F½.P.FÅ.Pj.......F·=. 0000C0
 13029A0A 76FF0C76 FF019668 F276FF00 0013949A F476FFF6 76FF0022 E9037500 .u.Õ"..v-.v¶......v·h...v..v..●. 0000E0
 15769AF8 76FFFA76 FF5016A2 46800084 681EFC76 FFFE76FF 00B7E9F2 46880000 ...F·Õñ..v±.v=.h...FÅ.P.v².v½.v. 000100
 76FF0196 68F276FF 0000176C 9AF476FF F676FF00 22E90375 00003DF2 46890000 ...F·=..u.Õ"..v-.v¶.l....v·h...v 000120
 00003DF2 46890000 13869AF4 76FFF676 FF0070E9 F2468800 00177D9A 0A76FF0C ..v..)....F·Õp..v-.v¶.Ñ....F·=.. 000140
 0016819A 0A76FF0C 76FF0196 68F276FF 000016ED 9AF476FF F676FF00 22E90375 u.Õ"..v-.v¶.Ú....v·h...v..v..Ÿ.. 000160
 1676FF00 0017A79A 00A06814 76FF1676 FF000307 C7260E5E C40038E9 F2468800 ..F·Õ8.á^.&ú....v..v.h...Ï....v. 000180
 1F0000E9 F2468800 0013EE9A 009F6814 76FF1676 FF000017 B59A00A1 681476FF .v.hÀ..ç....v..v.h...Ÿ....F·Õ... 0001A0
 12468806 5EC40004 07C7260E 5EC4D88E 15C5B81E 56570000 02C80012 CAC95F5E ^_èò..à...WV.¡é..Ä6^.&ú...á^..F. 0001C0
 1476FF16 76FFA5F2 000BB907 16FC8800 84BE16EC 83076A0A 76FF0C76 FF078926 &¯...v..v.j..§./...●..¿..·E.v..v. 0001E0

Dump of file SATURN:[PCCOMMON.DUMP.DLL]DAIMDF.TMP;1 on 18-APR-1990 10:41:20.28
File ID (570,8,0)   End of file block 71 / Allocated 72

Virtual block number 16 (00000010), 512 (0200) bytes

 0107C726 0E5EC400 38E9FE46 880006E9 03750000 30FE4689 20C48314 3C21999A ..I<..á .F±=..u.Õ...F±Õ8.á^.&ú.. 000000
 1676FF00 0018479A 00A16814 76FF1676 FF000018 399A00A0 681476FF 1676FF00 ..v..v.h...9....v..v.hÀ..G....v. 000020
 B81E5657 000014C8 0012CAC9 5F5E1F00 00E9FE46 8B000017 999A009F 681476FF .v.h........F±Õ...^_èò..à...WV.¡ 000040
 8D0A76FF 0C76FF00 D807C726 065EC400 0207C726 0E5EC400 00FA46C7 D88E17CE õ..ÄúF*..á^.&ú...á^¯.&ú.Ä..v..v.. 000060
 18031FE7 9A1476FF 1676FFA5 F2000BB9 0716FC8B 0084BE16 EC83076A 5016F246 F·.Pj..§./...=..¿..·E.v..v..Ô... 000080
 9A5016EE 468D1476 FF1676FF 01AEE9EC 46880006 E9037500 003DEC46 8924C483 .á$.F§=..u.Õ...F§ÕÛ..v..v..FŸ.P. 0000A0
 5016F646 8D1476FF 1676FF01 8DE9EC46 880006E9 03750000 3DEC4689 00001606 .....F§=..u.Õ...F§Õ...v..v..F-.P 0000C0
 FFF476FF EE76FFF0 76FF016C E9EC4688 0006E903 7500003D EC468900 0015E59A .Î....F§=..u.Õ...F§Õl..vÞ.vŸ.v¶. 0000E0
 830143E9 EC468800 06E90375 00003DEC 46890000 12E99A50 16FC4680 136AF276 v·j..F=.P.Õ....F§=..u.Õ...F§ÕC.. 000100
 8E006A00 6A0001FA 46C70005 E9037700 FC7E8300 09E9037E 0013E903 7D00FE7E -±.}.Õ..~.Õ...~=.w.Õ..úF*..j.j.. 000120
 EE76FFF0 76FF0000 16829A50 521964BA 02008801 9668296A 039636FF 26198606 ...&.6..j)h..¡..¤d.RP......vÞ.vŸ 000140
 76FF0196 68EC76FF 0017E903 75000030 EC468900 0016959A 5052167D BA0200B8 ¡..¤).RP......F§=..u.Õ...v§h...v 000160
 0000FFFF 9AF276FF F476FFEE 76FFF076 FF0003E9 EC468800 0019C39A 0A76FF0C ..v..û....F§ÕÆ..vÞ.vŸ.v¶.v·..... 000180
 FF0C76FF 019668EC 76FF0000 17349AEE 76FFF076 FF0022E9 03750000 3DEC4689 .F§=..u.Õ"..vÞ.vŸ.4....v§h...v.. 0001A0
 03750000 3DEC4689 00001756 9AEE76FF F076FF00 95E9EC46 8B000019 F09A0A76 v..Þ....F§Õ...vÞ.vŸ.V....F§=..u. 0001C0
 07C7260E 5EC40068 E9EC4688 00001745 9A0A76FF 0C76FF01 9668EC76 FF0017E9 Õ...v§h...v..v..E....F§Õh.á^.&ú. 0001E0

Dump of file SATURN:[PCCOMMON.DUMP.DLL]DAIMDF.TMP;1 on 18-APR-1990 10:41:20.28
File ID (570,8,0)   End of file block 71 / Allocated 72

Virtual block number 17 (00000011), 512 (0200) bytes

 76FF0000 1A289A00 A1681476 FF1676FF 0000182B 9A00A068 1476FF16 76FF0001 ...v..v.h...+....v..v.hÀ..(....v 000000
 6E68000A 68F676FF F876FF00 27E90374 01FA7E83 00001A0C 9A009F68 1476FF16 ..v.h........-*.t.Õ'..v½.v-hÖ.hn 000020
 E9EC4688 189E144B 9A000A68 1476FF16 76FF0000 14F89A00 6A006A00 6A006A01 .j.j.j.j..%....v..v.hÖ..K....F§Õ 000040
 5016AC46 8D0876FF 0A76FFD8 8E18608B 1E565700 0062C800 12CAC95F 5E1F0000 ...^_èò..àb..WV.¡'..Ä.v..v..F¯.P 000060
 16A8468D 0876FF0A 76FF013E E9A2468B 0006E903 75000030 A2468900 0018E19A .Ä...¯FÅ=..u.Õ...FÅÕ>..v..v..F´. 000080
 9E468DA8 76FFAA76 FF011DE9 A2468800 06E90375 00003DA2 46890000 18C09A50 P.å....FÅ=..u.Õ...FÅÕ...v´.v´.F. 0000A0
 76FFA876 FFAA76FF 00FCE9A2 46880006 E9037500 003DA246 89000014 A59A5016 .P.E....FÅ=..u.Õ...FÅÕ=..v´.v´.v 0000C0
 D3E9A246 8B0006E9 03750000 3DA24689 000014CE 9A5016FC 468D166A 9E76FFA0 ..v.j..F=.P.ò....FÅ=..u.Õ...FÅÕÆ 0000E0
 FE5688FC 46880000 1A4A9A00 6A006A4B 6A006A01 4368000D 68AC76FF AE76FF00 ..vÛ.v¯hÏ.hC.j.jKj.j..J....F=.V± 000100
 FFAA76FF 0081E903 7502470B 26078B26 A45EC404 A4468300 04E9A656 89A44689 .FÊ.vÏÕ...FÊ.á^Ê&..&.G.u.Õ...v^. 000120
 03750000 3DA24689 00001536 9A501680 468D026A 37FF2602 77FF26A4 5EC4A876 v´á^Ê&.w.&.7j..F¯.P.6....FÅ=..u. 000140
 AC76FFAE 76FF005A E9A2468B 00001BB0 9AFC76FF FE76FFA8 76FFAA76 FF0017E9 Õ...v^.v´.v±.v=.¯....FÅÕZ..v0.v¯ 000160
 03750000 3DA24689 0000171E 9A37FF26 0277FF26 A45EC450 1680468D 009A681E .h...F¯.Pá^Ê&.w.&.7......FÅ=..u. 000180
 AA76FFFF 6CE9001A E9A2468B 00001BCA 9AFC76FF FE76FFA8 76FFAA76 FF0017E9 Õ...v¯.v´.v±.v=.ò....FÅÕ..Õl..v¯ 0001A0
 5700005A C80006CA C95F5E1F 0000E900 00880000 15529AFC 76FFFE76 FFA876FF .v´.v±.v=.R...¡..Õ...^_èò..àZ..W 0001C0
 FC468D14 76FF1676 FF000007 C726065E C4000407 C7260E5E C4D88E1A 71B81E56 V.¡q..Äá^.&ú...á^.&ú.Ï¯..v..v..F● 0001E0
```

```
Dump of file SATURN:[PCCOMMON.DUMP.DLL]DAIMDF.TMP;1 on 18-APR-1990 10:41:20.28
File ID (570,8,0)   End of file block 71 / Allocated 72

Virtual block number 18 (00000012), 512 (0200) bytes

 46801476 FF1676FF 0193E9A6 46880006 E9037500 0030A646 8900001A 819A5016 .P......Fl=..u.Õ...FlÕ...v..v..F 000000
 FFFC76FF FE76FF01 72E9A646 880006E9 03750000 30A64689 00001AA2 9A5016A8 ´.P.Å....Fl=..u.Õ...FlÕr..v±.v=. 000020
 75000030 04C48316 5A003A9A 5016AC46 80000016 4E9A5016 AC468048 6A009C36 6..jK.F¯.P.N....F¯.P.:.Z..á.=..u 000040
 569A5052 1C8D8A02 00880196 682A6A03 9636FF26 1986068E 006A006A 010FE903 .Õ..j.j.....&.6..j*h..¡..¤..RP.V 000060
 1AE90375 000030A6 46890000 19699A50 5219518A 020088A8 76FFAA76 FF000019 ....v´.v´¡..¤Q.RP.Í....Fl=..u.Õ. 000080
 76FFAA76 FF0088E9 00F3E9A6 46880000 1CF59A0A 76FF0C76 FF019668 A676FF00 ..vlh...v..v..%....FlÕ¤.Õ¡..v´.v 0000A0
 AA76FF00 22E90375 000030A6 46890000 FFFF9A00 6A5016AC 46805016 F84680A8 ´.F½.P.F¯.Pj.......Fl=..u.Õ"..v´ 0000C0
 FF00ACE9 A6468800 001D3C9A 0A76FF0C 76FF0196 68A676FF 00001D28 9AA876FF .v´.+....vlh...v..v..<....FlÕ¯.. 0000E0
 75000030 A6468900 0018949A F876FFFA 76FF5016 AC468000 9A681EFC 76FFFE76 v±.v=.h...F¯.P.v°.v½......Fl=..u 000100
 00001D69 9A0A76FF 0C76FF01 9668A676 FF000019 829AA876 FFAA76FF 0022E903 .Õ"..v´.v´.ý....vlh...v..v..Í... 000120
 68A676FF 0017E903 75000030 A6468900 0019049A A876FFAA 76FF0065 E9A64688 .FlÕe..v´.v´.å....Fl=..u.Õ...vlh 000140
 76FF1676 FF000307 C7260E5E C40038E9 A6468800 0019859A 0A76FF0C 76FF0196 ...v..v.......FlÕ8.é^.&ú....v..v 000160
 009F6814 76FF1676 FF00001D A19A00A1 681476FF 1676FF00 001D939A 00A06814 .h........v..v.hÅ..Å....v..v.h.. 000180
 5EC4D88E 18E3881E 56570000 02C80012 CAC95F5E 1F0000E9 A6468800 001A1A9A ......FlÕ...^_èò..à...WV.¡D..Äé^ 0001A0
 83066A0A 76FF0C76 FF00D007 C726065E C4000407 C7260E5E C4078926 12468806 ..F.&..é^.&ú.¯.é^.&ú.Í..v..v.j.. 0001C0
 30FE4689 20C4831A 5A21999A 1476FF16 76FFA5F2 00088907 16FC8800 9ABE16EC &./...•..¿..·E.v..v...ÍZ..é .F±= 0001E0

Dump of file SATURN:[PCCOMMON.DUMP.DLL]DAIMDF.TMP;1 on 18-APR-1990 10:41:20.28
File ID (570,8,0)   End of file block 71 / Allocated 72

Virtual block number 19 (00000013), 512 (0200) bytes

 2D9A00A0 681476FF 1676FF00 0107C726 0E5EC400 38E9FE46 880006E9 03750000 ..u.Õ...F±Õ8.é^.&ú....v..v.h...- 000000
 8800001D 859A009F 681476FF 1676FF00 001E389A 00A16814 76FF1676 FF00001E ....v..v.hÅ..;....v..v.h........ 000020
 000207C7 260E5EC4 D88E10BA 881E5657 00000EC8 0012CAC9 5F5E1F00 00E9FE46 F±Õ...^_èò..à...WV.¡¤..Äé^.&ú... 000040
 0716FC88 009A8E16 EC83066A 5016F846 800A76FF 0C76FF07 89261246 88065EC4 é^..F.&¯...v..v..F½.Pj..&./...•.. 000060
 46880006 E9037500 0030F246 8924C483 1DF71FE7 9A1476FF 1676FFA5 F2000889 ¿..·E.v..v..Õ.%..é$.F·=..u.Õ...F 000080
 880006E9 03750000 30F24689 00001C24 9A5016F4 46801476 FF1676FF 013CE9F2 ·Õ<..v..v..F¶.P.$....F·=..u.Õ... 0000A0
 0006E903 75000030 F2468900 001C039A 5016FC46 801476FF 1676FF01 18E9F246 F·Õ...v..v..F=.P......F·=..u.Õ.. 0000C0
 50521F0F 8A020088 0196682C 6A039636 FF261986 068E006A 006A00FA E9F24688 .F·Õ°.j.j.....&.6..j,h..¡..¤..RP 0000E0
 03750000 30F24689 00001C92 9A50521C 7A8A0200 88F476FF F676FF00 001C7F9A ......v–.v¶¡..¤z.RP......F·=..u. 000100
 F676FF00 68E900A6 E9F24688 00001F71 9A0A76FF 0C76FF01 9668F276 FF001AE9 Õ...v·h...v..v..q....F·ÕÍ.Õk..v– 000120
 9AF476FF F676FF00 22E90375 00003DF2 46890000 FFFF9AF8 76FFFA76 FFF476FF .v¶.v°.v½......F·=..u.Õ"..v–.v¶. 000140
 76FFF676 FF0065E9 F2468800 001F9E9A 0A76FF0C 76FF0196 68F276FF 00001CE4 õ....v·h...v..v.......F·Õe..v–.v 000160
 1CAE9A0A 76FF0C76 FF019668 F276FF00 17E90375 00003DF2 46890000 1D4D9AF4 ¶.M....F·=..u.Õ...v·h...v..v..Õ. 000180
 76FF0000 1FC89A00 A0681476 FF1676FF 000107C7 260E5EC4 0038E9F2 46880000 ...F·Õ8.é^.&ú....v..v.h...à....v 0001A0
 0000E9F2 46880000 1E1F9A00 9F681476 FF1676FF 00001FD6 9A00A168 1476FF16 ..v.hÅ..ø....v..v.h........F·Õ.. 0001C0
 D19A5016 FC468D06 76FF0876 FFD88E1E 54881E56 570000A6 C80012CA C95F5E1F .^_èò..àÍ..WV.¡T..Ä.v..v..F=.P.Í 0001E0

Dump of file SATURN:[PCCOMMON.DUMP.DLL]DAIMDF.TMP;1 on 18-APR-1990 10:41:20.28
File ID (570,8,0)   End of file block 71 / Allocated 72

Virtual block number 20 (00000014), 512 (0200) bytes

 2276FF24 76FF0676 FF0876FF 0180E9A6 46880006 E9037500 0030A646 8900001E ....Fl=..u.Õ...FlÕ...v..v..v$.v" 000000
 16F6468D 0676FF08 76FF015E E9A64688 0006E903 75000030 A6468900 0016279A .'.....Fl=..u.Õ...FlÕ^..v..v..F-. 000020
 0E76FFFC 76FFFE76 FF0130E9 A6468800 06E90375 00003DA6 46890000 1EB09A50 P.¯....Fl=..u.Õ...FlÕ=..v±.v=.v. 000040
 006A006A 0023E903 74FFFA7E 83FA4689 00001816 9A006A00 6A006A00 6A016568 he.j.j.j.j.......F°.~°.t.Õ#.j.j. 000060
 FF00F5E9 00018800 0020FE9A 2676FF28 76FF0196 68326A03 9636FF26 1986068E ....&.6..j2h...v(.v&.± ..¡..Õ%.. 000080
 46800E76 FFFC76FF FE76FF00 001C489A 5016FF5A 8680486A 0C76FFFC 76FFFE76 v±.v=.v.jK..Z..P.K....v±.v=.v..F 0000A0
 00003D08 C4831C57 00109A50 16FF5A86 805016AA 46800000 03AF9A48 6A5016AA ´.PjK.E....F´.P..Z..P...W..é.=.. 0000C0
 1F019A26 76FF2876 FF019668 336A0396 36FF2619 86068E00 6A006A00 23E90375 u.Õ#.j.j.....&.6..j3h...v(.v&... 0000E0
 46C7003E E90013A8 46C70046 E90018A8 46C7002B E9204688 008CE900 01880000 ..¡..Õ...F Õ+.úF´..ÕF.úF´..Õ>.úF 000100
 CDE90375 00023000 23E90026 E90000A8 46C7002E E90017A8 46C70036 E90016A8 ´..Õ6.úF´..Õ..úF´..Õ&.Õ#.=..u.Õ# 000120
 FFF876FF FFD2E9FF CDE90375 000730FF CDE90375 000630FF CDE90375 000530FF .=..u.Õë.=..u.Õë.=..u.Õë.Õ0..v½. 000140
 A6468900 00FFFF9A 2276FF24 76FF006A 006AA876 FF5016FF 5A868020 76FFF676 v–.v ..Z..P.v´j.j..v$.v"......Fl 000160
 1E565700 0242C8C8 C95F5E1F 0000E9A6 46880006 E9A64688 0006E903 75000030 =..u.Õ...FlÕ...FlÕ...^_èùä¤..WV. 000180
 07E90375 00003DFE 0A868900 001FFF9A 5016F646 800676FF 0876FFD8 8E1FEF88 ¡Ÿ..Å.v..v..F-.P........±= u.Õ. 0001A0
 7500003D FE0A8689 00002021 9A5016FC 46800676 FF0876FF 02FEE9FE 0A868800 ....±Õ±..v..v..F=.P.! ...... ·..u 0001C0
 FE0A8689 00002042 9A5016FE 5A868006 76FF0876 FF02D8E9 FE0A8688 0007E903 .Õ.....±ÕÜ..v..v...Z±.P.B .....± 0001E0
```

```
Dump of file SATURN:[PCCOMMON.DUMP.DLL]DAIMDF.TMP;1 on 18-APR-1990 10:41:20.28
File ID (570,8,0)   End of file block 71 / Allocated 72

Virtual block number 21 (00000015), 512 (0200) bytes

6A006A00 6A016568 0E76FFF6 76FFF876 FF02B7E9 FE0A8688 0007E903 75000030 =..u.Õ.....±Õñ..Vñ.v-.v.he.j.j.j 000000
FF261986 068E006A 006A0023 E90374FF FE5EBE83 FE5E8689 0000206C 9A006A00 .j..l ....^±./^±.t.Õ#.j.j.....&. 000020
FFF676FF F876FF02 6DE90001 88000020 959A2276 FF2476FF 01966832 6A039636 6..j2h...v$.v".. ..j..Õm..Vñ.v-. 000040
4B6A5016 FE0E868D 0E76FFF6 76FFF876 FF000020 B19A5016 FDBE8680 4B6A0C76 v.jK../».P.Ý ...Vñ.v-.v....±.PjK 000060
06E90374 00003D08 C48320D8 00109A50 16FD8E86 8D5016FE 0E868000 0020C69A .6 .....±.P../».P...Ä .6.=..t.Õ. 000080
13FE0C86 C7005FE9 0002FA46 C70018FE 0C86C700 4AE92046 88021FE9 00008800 .|..Õ...F ÕJ.ú..±..úF*..Õ_.ú..±. 0000A0
FA46C700 17FE0C86 C70043E9 0002FA46 C70016FE 0C86C700 51E90002 FA46C700 .úF*..Õa.ú..±..úF*..ÕC.ú..±..úF* 0000C0
3DFFAEE9 03750002 3D0023E9 0026E9FA 46892046 880000FE 0C86C700 35E90002 ..Õ5.ú..±...F .F*Õ&.Õ#.=..u.ÕÜ.= 0000E0
B6FFFE5C B6FFFFC8 E9FFC0E9 03750007 3DFFBAE9 03750006 3DFFB4E9 03750005 ..u.ÕÇ.=..u.Õa.=..u.Õ6.Õù..Ñ\±.Ñ 000100
0A868900 0023B79A 5016FC46 8D006A00 6AFE0CB6 FF5016FD BE868020 76FFFE5A Z±.v ../».P.Ñ.±j.j..F=.P.ñ#..... 000120
8E006A00 6A003DE9 0375FE46 08FC4688 0176E9FE 0A868800 07E90375 00003DFE ±=..u.Õ.....±Õv..F=.F±u.Õ=.j.j.. 000140
86805016 FDBE868D 000023F4 9A5016FE 60868001 96682F6A 039636FF 26198606 ...&.6..j/h....'±.P.¶#..../».P.. 000160
FE5AB6FF FE5CB6FF 012EE9FF FFB80CC4 83248400 569A2276 FF2476FF 5016FE60 '±.P.v$.v".V.Ç$.6.|..Õ...Ñ\±.ÑZ± 000180
3DFE0A86 89000021 799A5016 FC468D00 6A006AFE 0CB6FF50 16FE0E86 8D2076FF .v ...±.P.Ñ.±j.j..F=.P.y1.....±= 0001A0
86068E00 6A006A00 A9E90375 FE460BFC 468800F8 E9FE0A86 880007E9 03750000 ..u.Õ.....±Õ%..F=.F±u.Õ .j.j.... 0001C0
FE5AB6FF FE5CB6FF 0000249B 9A505224 048A0200 B8019668 316A0396 36FF2619 .&.6..j1h..|..a.$RP..$...Ñ\±.ÑZ± 0001E0
```

```
Dump of file SATURN:[PCCOMMON.DUMP.DLL]DAIMDF.TMP;1 on 18-APR-1990 10:41:20.28
File ID (570,8,0)   End of file block 71 / Allocated 72

Virtual block number 22 (00000016), 512 (0200) bytes

00A6E9FE 0A868800 0AE90375 00003DFE 0A868900 001F149A 50521EFC BA0200B8 |..a=.RP........±=..u.Õ.....±ÕI. 000000
89000007 F79A5016 FDBE868D FA76FFFC 76FFFE76 FFFE5AB6 FFFE5CB6 FF005CE9 Õ\..Ñ\±.ÑZ±.v±.v=.v*../».P.¥.... 000020
FF0067E9 FE0A8688 00001F60 9AFE5AB6 FFFE5CB6 FF0014E9 03750000 3DFE0A86 ..±=..u.Õ...Ñ\±.ÑZ±.'......±Õg.. 000040
E90047E9 FE0A8688 0007E903 7500003D FE0A8689 00001F82 9AFE5AB6 FFFE5CB6 Ñ\±.ÑZ±........±=..u.Õ.....±ÕG.Õ 000060
8D000022 4F9A5016 FE60868D 01966830 6A039636 FF261986 068E006A 006A0030 =.j.j.....&.6..j0h....'±.P.O"... 000080
8B0007E9 FFFFB80C C4832294 00569A22 76FF2476 FF5016FE 60868D50 16FE0E86 ..±.P..'±.P.v$.v".V..".6.|..Õ... 0000A0
FC468D06 76FF0876 FFD88E21 A1B81E56 5700000A C8CBC95F 5E1F0000 E9FE0A86 ..±Õ...^_èüà...WV.¡ÀI.Ä.v..v..F= 0000C0
46C7007F E90A4688 0140E9F8 46880006 E9037500 0030F846 89000021 F89A5016 .P.%I...F½=..u.Õ...F½Õa..F.Õ..úF 0000E0
FA46C700 17F646C7 00E8E900 05FA46C7 0013F646 C700F5E9 0002FA46 C70018F6 -..úF*..Õ%.úF-..úF*..ÕÕ.úF-..úF* 000100
C700C1E9 002BF646 C7000BFA 46C700CE E90006FA 46C70016 F646C700 DBE90007 ..ÕÜ.úF-..úF*..Õö.úF*..úF-+.Õè.ú 000120
FFFC76FF FE76FF00 A7E90015 FA46C700 33F646C7 00B4E900 0AFA46C7 001BF646 F-..úF*..ÕÇ.úF-3.úF*..ÕI..v±.v=. 000140
00003000 83E90086 E90000FA 46C70000 F646C700 CBE90000 1AC39A10 76FF1276 v..v..ú...Õù.úF-..úF*..Õ..Õ..=Å. 000160
E9037500 7430FFA5 E9037500 7130FFC7 E9037500 6E300033 E90376FF 79E90375 u.Õy.v.Õ3.=n.u.Õú.=q.u.ÕÉ.=t.u.Õ 000180
000830FF B0E9FF44 E9037500 CE30FF9A E9037500 9030FFA2 E9037500 8E30FF9D ..=..u.ÕÅ.=..u.Õ..=ö.u.ÕD.Õ¯.=Å. 0001A0
000A30FF 90E9FF31 E9037500 D530FF39 E9037500 D3300013 E90376FF 53E90375 u.ÕS.v.Õ..=Æ.u.Õ9.=í.u.Õ1.Õ..=Õ. 0001C0
FF60E9FF 35E90375 00EA30FF 30E90375 000F30FF 38E90375 000D30FF 33E90375 u.Õ3.=ï.u.Õ8.=Õ.u.ÕO.=õ.u.Õ5.Õm. 0001E0
```

```
Dump of file SATURN:[PCCOMMON.DUMP.DLL]DAIMDF.TMP;1 on 18-APR-1990 10:41:20.28
File ID (570,8,0)   End of file block 71 / Allocated 72

Virtual block number 23 (00000017), 512 (0200) bytes

0023399A 1076FF12 76FF006A 006AF676 FF0C76FF 0E76FFFA 76FFFC76 FFFE76FF .v±.v=.v*.v..v..v-j.j..v..v..9#. 000000
0058C8C8 C95F5E1F 0000E9F8 46880006 E9F84688 0006E903 7500003D F8468900 ..F½=..u.Õ...F½Õ...F½Õ...  ªüàX. 000020
7500003D F6468900 0021B19A 5016F846 8D0676FF 0876FFD8 8E24D3B8 1E565700 .WV.¡Æ$.Ä.v..v..F½.P.Ý!...ì  ·..u 000040
0021D49A 0C76FF0E 76FF0676 FF0876FF 007EE90A 46880138 E9F64688 0006E903 .Õ...F-Õ8..F.Õ-..v..v..v..v..åI. 000060
890058B8 0090E9FE 5E8CFC46 89000288 00A9E9FE 5E8CFC46 89004288 011EE900 .Õ..¡B..F=.^±Õ`.¡@..F=.^±Õ..¡X.. 000080
0079E9FE 5E8CFC46 89008488 0085E9FE 5E8CFC46 89006E88 0091E9FE 5E8CFC46 F=.^±Õ..¡n..F=.^±Õ..¡...F=.^±Õy. 0000A0
89260000 B80C5EC4 0061E9FE 5E8CFC46 89008088 0060E9FE 5E8CFC46 89009A88 ¡...F=.^±Õm.¡¯..F=.^±Õa.6^.¡..&. 0000C0
0375006E 3D0018E9 0376FFA6 E9037500 D030004B E900B7E9 0000B807 89260247 G.&..¡..Õñ.ÕK.=Å.u.ÕI.v.Õ..=n.u. 0000E0
DA30FF8A E9037500 D530FFC2 E9FF7DE9 03750090 3DFF79E9 03750074 3DFF60E9 Õm.=t.u.Õy.=..u.Õ).Õö.=í.u.Õ..=Õ 000100
FFF876FF FA76FFFF 9FE9FF96 E9037500 EA30FF92 E9037500 DF30FF8E E9037500 .u.Õ..=Õ.u.Õ..=õ.u.Õ..Õ...v*.vñ. 000120
000030F6 46890000 FFFF9A0C 76FF0E76 FF5016A8 46805016 F44680FC 76FFFE76 v±.v=.F¶.P.F´.P.v..v.......F-=.. 000140
0C76FF0E 76FF0022 E9037402 470B2607 8B260C5E C40037E9 F6468800 06E90375 u.Õ...F-Õ7.6^.&..&.G.t.Õ"..v..v. 000160
E90000B8 0006E900 09E90EC4 831E8E24 CB9A0676 FF0876FF 0A76FF50 16A84680 .F´.P.v..v..v..ù$...6.Õ..Õ..¡..Õ 000180
559A5016 F6468D06 76FF0876 FFD88E26 45B81E56 57000014 C8CBC95F 5E1F0000 ...^_èüà...WV.¡E&.Ä.v..v..F-.P.U 0001A0
E39A5016 F2468D06 76FF0876 FF000005 709A5016 FA468D06 76FF0876 FF000026 &...v..v..F*.P.p....v..v..F·.P.D 0001C0
880006E9 03750000 3DEC4689 0000FFFF 9A5016EE 468D1A6A 1E6AFA76 FF000024 $...v*j.j..FŸ.P......F$=..u.Õ... 0001E0
```

```
Dump of file SATURN:[PCCOMMON.DUMP.DLL]DAIMDF.TMP;1 on 18-APR-1990 10:41:20.28
File ID (570,8,0)   End of file block 71 / Allocated 72

Virtual block number 24 (00000018), 512 (0200) bytes

 FF0876FF 50520014 05FE5688 FC4688FE 5689FC46 89F0568B EE468800 8BE9EC46 FãÕE..FŸ.Vþ.F=.V±.F=.V±...RP.v.. 000000
 76FF08C4 83285628 C79A0676 FF0876FF FC76FFFE 76FF08C4 83FFFF0F 4C9A0676 v..L....ó..v±.v=.v..v..Ú(V(.ó..v 000020
 0000FFFF 9AFFFF68 28676806 76FF0876 FF0000FF FF9AEE76 FFF076FF 0676FF08 ..v;.vþ.vŸ......v..v.hg(h....... 000040
 FFFF9AFF FF682889 680676FF 0876FF00 00FFFF9A FFFF6828 78680676 FF0876FF .v..v.hx(h........v..v.h.(h..... 000060
 9AFFFF68 27916806 76FF0876 FF0000FF FF9AFFFF 68289A68 0676FF08 76FF0000 ...v..v.h.(h........v..v.h.'h... 000080
 0000E900 00B80000 FFFF9A03 9636FF26 1986068E 086A0676 FF0876FF 0000FFFF .....v..v.j.....£.6.......j..Õ.. 0000A0
 FFFE5689 FC46890C 56880A46 8B088E27 AFB81E56 57000004 C80004CA C95F5E1F .^_èò..à...WV.¡£'.Ä.F..V..F=.V±. 0000C0
 76FF0000 29199A00 6A006A00 6AFFFF68 FFFF68FF FF68FFFF 68656A06 76FF0876 v.¯v.jeh..h..h..h..j.j.j...)...v 0000E0
 0876FF00 0029389A 006A006A 016AFFFF 6829F468 FFFF6829 00686E6A 0676FF08 ..v.jnh.)h..h¶)h..j.j.j..8)...v. 000100
 FF0876FF 00002953 9A006A00 6A006AFF FF68FFFF 68FFFF68 FFFF687A 6A0676FF .v.jzh..h..h..h..j.j.j..S)...v.. 000120
 68746A06 76FF0876 FF000029 709A0042 681E016A 006A006A 006A006A 716A0676 v.jqj.j.j.j.j..hB..p)...v..v.jth 000140
 6A006A01 2C680676 FF0876FF 0000298E 9A004268 1E016A00 6A006AFF FF68FFFF ..h..j.j.j..hB...)...v..v.h,.j.j 000160
 68006A00 6A012D68 0676FF08 76FF0000 29AC9A00 42681E00 6AFFFF68 FFFF6800 .h..h..j..hB..¯)...v..v.h-.j.j.h 000180
 FFFF6800 6A006A01 2E680676 FF0876FF 000029CA 9A004268 1E006AFF FF68FFFF ..h..j..hB..ò)...v..v.h..j.j.h.. 0001A0
 6A006A00 6A006A00 6A00CE68 0676FF08 76FF0000 29E69A00 42681E00 6AFFFF68 h..j..hB..Ì)...v..v.hö.j.j.j.j.j 0001C0
 1E016A00 6A006AFF FF682A16 6800D068 0676FF08 76FF0000 2A049A00 58681E01 ..hX...*...v..v.hÅ.h.*h..j j.j.. 0001E0

Dump of file SATURN:[PCCOMMON.DUMP.DLL]DAIMDF.TMP;1 on 18-APR-1990 10:41:20.28
File ID (570,8,0)   End of file block 71 / Allocated 72

Virtual block number 25 (00000019), 512 (0200) bytes

 58681E00 6AFFFF68 2A346800 6A006A01 2F680676 FF0876FF 00002A22 9A005868 hX.."*...v..v.h/.j.j.h4*h..j..hX 000000
 9A005868 1E006AFF FF682A52 68006A00 6A013068 0676FF08 76FF0000 2A409A00 ..@*...v..v.h0.j.j.hR*h..j..hX.. 000020
 2A7A9A00 58681E00 6AFFFF68 2A886800 6A006A01 31680676 FF0876FF 00002A5E ^*...v..v.h1.j.j.h.*h..j..hX..z* 000040
 76FF0000 2A989A00 6E681E01 6A006A00 6A006A00 6A000368 0676FF08 76FF0000 ...v..v.h£.j.j.j.j.j..hn...*...v 000060
 FF0876FF 00002AB6 9A006E68 1E016A00 6A006AFF FF682AAA 6800D568 0676FF08 ..v.hí.h¯*h..j.j.j..hn..Ñ*...v.. 000080
 0676FF08 76FF0000 2AD49A00 6E681E00 6AFFFF68 2AC86800 6A006A01 32680676 v.h2.j.j.hà*h..j..hn..å*...v..v. 0000A0
 34680676 FF0876FF 00002AF2 9A006E68 1E006AFF FF682AE6 68006A00 6A013368 h3.j.j.hì*h..j..hn..·*...v..v.h4 0000C0
 6A000868 0676FF08 76FF0000 2B0E9A00 6E681E00 6AFFFF68 2B1C6800 6A006A01 .j.j.h.+h..j..hn...+...v..v.hÅ.j 0000E0
 FF682B3E 68000A68 0676FF08 76FF0000 2B2C9A00 84681E01 6A006A00 6A006A00 .j.j.j.j..h...,+...v..v.hÖ.h>+h. 000100
 2B5C6800 6A006A01 35680676 FF0876FF 00002B4A 9A008468 1E016A00 6A006AFF .j.j.j..h...J+...v..v.h5.j.j.h\+ 000120
 FF682B7A 68006A00 6A013668 0676FF08 76FF0000 2B689A00 84681E00 6AFFFF68 h..j..h...h+...v..v.h6.j.j.hz+h. 000140
 6AFFFF68 2B806800 6A006A01 37680676 FF0876FF 00002B86 9A008468 1E006AFF .j..h....+...v..v.h7.j.j.h¯+h..j 000160
 9A681E01 6A006A00 6A006A00 6A000068 0676FF08 76FF0000 2BA29A00 84681E00 ..h...Å+...v..v.hì.j.j.j.j.j..h. 000180
 9A009A68 1E016A00 6A006AFF FF682BD2 6800DF68 0676FF08 76FF0000 2BC09A00 ..å+...v..v.hÖ.h@+h..j.j.j..h... 0001A0
 FFFF9A00 9A681E00 6AFFFF68 2BF06800 6A006A01 38680676 FF0876FF 00002BDE B+...v..v.h8.j.j.hþ+h..j..h..... 0001C0
 00002C1A 9A009A68 1E006AFF FF682839 68006A00 6A013968 0676FF08 76FF0000 ...v..v.h9.j.j.h9(h..j..h....,.. 0001E0

Dump of file SATURN:[PCCOMMON.DUMP.DLL]DAIMDF.TMP;1 on 18-APR-1990 10:41:20.28
File ID (570,8,0)   End of file block 71 / Allocated 72

Virtual block number 26 (0000001A), 512 (0200) bytes

 5EC40000 2C6E9A00 9A681E00 6AFFFF68 29076800 6A006A01 3A680676 FF0876FF .v..v.h:.j.j.h.)h..j..h...n,..ó^ 000000
 078B26FC 5EC40E5F 8C260C47 892600C6 B80A5EC4 0A5F8C26 08478926 0080B80A .¡¯.&.G.&._.ó^.¡ó.&.G.&._.ó^=&.. 000020
 006A006A 006A006A 00E86806 76FF0876 FF125789 26104789 260A5EC4 02578B26 &.W.ó^.&.G¯&.W..v..v.hÒ.J.j.j.j. 000040
 FF68FFFF 6800EA68 0676FF08 76FF0000 2C939A50 52000805 0C56880A 4688016A j..F..V....RP..,...v..v.hõ.h..h. 000060
 00E86806 76FF0876 FF00002C B89A5052 0008050C 56880A46 88016A00 6A006AFF .j.j.j..F..V....RP.¡,...v..v.h$. 000080
 FF0876FF 00002CD0 9A505200 08050C56 880A4688 006AFFFF 68FFFF68 006A006A j.j.h..h..j..F..V....RP.Ì,...v.. 0000A0
 002D029A 50520008 050C5688 0A468800 6AFFFF68 FFFF6800 6A006A00 EC680676 v.h$.j.j.h..h..j..F..V....RP..¯. 0000C0
 52000805 0C56880A 4688006A FFFF68FF FF68006A 006A00ED 680676FF 0876FF00 ..v..v.hÚ.j.j.h..h..j..F..V....R 0000E0
 2D3C9A00 D2681E01 6A006A00 6A006A00 6A008E68 0676FF08 76FF0000 2D1E9A50 P..-...v..v.h..j.j.j.j.j..h@..<- 000100
 00002D5A 9A00D268 1E016A00 6A006AFF FF68FFFF 68009068 0676FF08 76FF0000 ...v..v.h..h..h..j.j.j..h@..Z-.. 000120
 76FF0000 2D789A00 D2681E00 6AFFFF68 FFFF6800 6A006A00 91680676 FF0876FF .v..v.h..j.j.h..h..j..h@..x-...v 000140
 FF0876FF 00002D96 9A00D268 1E006AFF FF68FFFF 68006A00 6A009268 0676FF08 ..v.h..j.j.h..h..j..h@...-...v.. 000160
 0676FF08 76FF0000 2DB49A00 D2681E00 6AFFFF68 FFFF6800 6A006A00 93680676 v.h..j.j.h..h..j..h@..Ç-...v..v. 000180
 9E680676 FF0876FF 00002D02 9A006A00 6A006A00 6A006A2D C56820C2 68009D68 h..hó-hé-j.j.j.j.j..@-...v..v.h. 0001A0
 68009C68 0676FF08 76FF0000 2DF09A00 6A006A00 6A006A00 6A2DE368 2DE06800 .hÁ-hD-j.j.j.j.j..þ-...v..v.h..h 0001C0
 2E1C6800 A0680676 FF0876FF 00002E0E 9A006A00 6A006A00 6A006A2E 01682DFE ±-h..j.j.j.j.j.......v..v.h..h.. 0001E0
```

Dump of file SATURN:[PCCOMMON.DUMP.DLL]DAIMDF.TMP;1 on 18-APR-1990 10:41:20.28
File ID (570,8,0)   End of file block 71 / Allocated 72

Virtual block number 27 (0000001B), 512 (0200) bytes

```
FF68FFFF 6800A168 0676FF08 76FF0000 2E2C9A00 6A006A00 6A006A00 6A2E1F68 h..j.j.j.j.j..,....v..v.hÀ.h..h. 000000
6A2DA768 2DA46800 9F680676 FF0876FF 000028FA 9A006A00 6A006A00 6A006AFF .j.j.j.j.j..ª(...v..v.h...Ê-hÌ-j 000020
02030000 00012C0E 00020074 90CBC95F 5E1F0000 2BFC9A00 6A006A00 6A006A00 .j.j.j.j..▪+...^_èü.t....,  .... 000040
010303E5 00082CA5 02020385 000829C1 02050364 00082926 02020154 0006199C ....T...&)..d...Ē)......Ê,..˙... 000060
0203006A 0004190A 02031A69 000128B3 00050000 00022825 0002007F 00012224 $"......%(......°+..i.......j... 000080
01030445 000904EB 02030004 00010353 010301D4 000727CF 02030252 0007286D m(..R...Ü'..Å...S.......Š...E... 0000A0
000203EF 00082CEF 0202038F 000829A3 02050087 0001226B 01030086 00010685 ........k"......È).....ÿ,..ÿ... 0000C0
02030164 00061F4A 02030000 000523EF 00020370 00082960 02020000 0004238D .#......')..p...ÿ#......J...d... 0000E0
02030078 00041B54 02030000 000628CF 00020316 00082E30 020502DD 00070303 ....Ť...▪.......Ü(......T...x... 000100
02030013 0001033A 010303FA 00082CCA 02020399 0008202F 02050260 0007288F .(..'.../-......ò,..ª...:....... 000120
02030C02 00012A37 00050000 0001287B 0005037B 00082982 020201E3 0007267D )&..D....)..(...((......7*...... 000140
02050385 000829BE 0202009D 00012374 010300F4 00060B1E 02030173 00061F30 0...▪.......¶...t#......ƒ)...... 000160
02030A0A 00012A19 00050270 0007287E 02030086 0004243B 020303A5 00082051 Q-..Ê...;$......−(..p....*...... 000180
0205038F 000829A0 020202F7 00072281 02030014 000327F0 020301F3 0007270F Ô'..µ...Þ'......."..%....)...... 0001A0
00050092 00041AEC 02030311 00012890 00050101 000610C1 020303B0 00082080 .-.. ...é.......(......å........ 0001C0
020301FF 000727BF 02030316 00082E3A 02020696 00012910 00050C94 00012A55 U*.......)......:.......¢'...... 0001E0
```

Dump of file SATURN:[PCCOMMON.DUMP.DLL]DAIMDF.TMP;1 on 18-APR-1990 10:41:20.28
File ID (570,8,0)   End of file block 71 / Allocated 72

Virtual block number 28 (0000001C), 512 (0200) bytes

```
02030399 0008202C 02020338 000828EB 02050898 000129F7 00050280 000728A0 .(......%)......Š(..8...,-...... 000000
0005010F 00061CCE 02030187 00071D15 020303BB 0008206F 02050022 0003059E ....."...o-..Ê...........ö...... 000020
02030346 000828F1 020503A5 0008204E 020211A5 00012ACB 00050FA0 00012AAD Û*......ü*..Ê...N-..Ê...þ(..F... 000040
020300AB 00041B70 02030291 0007285C 02030227 0001288C 0005020F 0007004E N........(..'...\(......p..¨_... 000060
000503B0 0008208A 02020E2E 00012A88 00050196 00072756 0203011C 00061607 ▪.......V'.......*.......-..¯... 000080
02030356 0008292F 02050316 00081FBA 02030033 00042409 020310B2 00012BF3 µ+..ÿ....$..3...¤......./)..V... 0000A0
02030338 000828E8 020202A0 0007284B 02031237 00012AE9 000500B7 00042454 T$..Ñ...Ô*..7...K(.......Ò(..8... 0000C0
02020223 00070590 0203030A 00082C7F 020505BA 0001290A 00050129 0006261D .&..)....)..¤.......Ö.......#... 0000E0
02050540 0001286A 0005003F 00042468 020315BD 00012B41 000503BB 0008206C l-..Ê...A+..§...h$..?...j(..∂... 000100
02030346 000828EE 020217C6 00012B5F 000503E5 00082CA8 02050364 00082929 ))..d...´,..Ì..._+..6...Ÿ(..F... 000120
02030329 00080822 02030230 00070580 020301AF 000728B6 020302AF 0007043C <...Ê...Ñ(..Ê.......0..."...)... 000140
0005044A 00012859 0005004A 00042566 020300CA 000400AE 02030139 00060091 ....9...Û...ò...f%..J...Y(..J... 000160
02030370 00082963 020503EF 00082CF2 02051E4C 00012C11 0005144B 00012B1F .+..K....,..L...˙,..ÿ...c)..p... 000180
00050338 0008049F 02030356 0008292C 02020146 0006137E 020301BE 0007024E N...ƒ...−...F...,)..V.......8... 0001A0
0203030A 00082C7C 020203FA 00082CCD 02050241 00072E4A 02031858 00012B7D )+..X...J...A...ë,..ª...|,..Ö... 0001C0
00000000 00000000 0000037B 00082985 02051B0B 00012BD5 000502C3 00070219 ....û...(+..Û....)..(........... 0001E0
```

Dump of file SATURN:[PCCOMMON.DUMP.DLL]DAIMDF.TMP;1 on 18-APR-1990 10:41:20.28
File ID (570,8,0)   End of file block 71 / Allocated 72

Virtual block number 29 (0000001D), 512 (0200) bytes

```
3DF84689 0000FFFF 9A5016FA 468D0A76 FF0C76FF D88EFFFF B81E5657 00000CC8 à...WV.¡...Ã.v..v..Fª.P......F½= 000000
00003DF8 46890000 FFFF9A50 16F4468D FA76FF00 68E9F846 880006E9 03750000 ..u.Õ...F½Ök..vª.F¶.P......F½=.. 000020
003DF846 890000FF FF9A5016 FC468DF4 76FFF676 FF004DE9 F8468800 06E90375 u.Õ...F½ÕM..v−.v¶.F▪.P......F½=. 000040
E9037510 56390008 E903740E 4639FE56 8BFC4688 002CE9F8 46880006 E9037500 .u.Õ...F½Õ,..F▪.V±9F.t.Õ..9V.u.Õ 000060
0010C8CB C95F5E1F 0000E9FF FF05BA9A 6E6AF476 FFF676FF 0010E900 00880006 ..¡..Õ...v−.v¶jn.¤...Õ...^_èùà.. 000080
7500003D F4468900 0000189A 5016F646 800A76FF 0C76FFD8 8E000888 1E565700 .WV.¡...Ã.v..v..F−.P......F̄¶=..u 0000A0
E9037500 003DF446 89000000 369A5016 F0468DF6 76FF0094 E9F44688 0006E903 .Õ...F¶Õ...v−.FÞ.P.6....F¶=..u.Õ 0000C0
03750000 3DF44689 00000057 9A5016FC 468DF076 FFF276FF 0076E9F4 46880006 ...F¶Õv..v·.vÞ.F▪.P.W....F¶=..u. 0000E0
00FFFF9A 5016F846 80026AFC 76FFFE76 FF0A76FF 0C76FF00 55E9F446 880006E9 Õ...F¶ÕU..v..v..v±.v=j..F%.P.... 000100
0008E903 740E4639 FA568BF8 4688002C E9F44688 0006E903 7500003D F4468900 ..F¶=..u.Õ...F¶Õ,..F%.Vª9F.t.Õ.. 000120
5E1F0000 E90000FF FF9A7A6A F076FFF2 76FF0010 E90000B8 0006E903 75105639 9V.u.Õ..¡..Õ...v·.vÞjz.....Õ...^ 000140
89000000 B59A5016 FA468D0A 76FF0C76 FFD88E00 A5B81E56 57000010 C8CBC95F  èùà...WV.¡Ê..Ã.v..v..Fª.P.ç.... 000160
F0468900 0000039A 5016F246 8DFA76FF 00CBE9F0 46880006 E9037500 003DF046 F̄Þ=..u.Õ...FÞÕù..vª.F·.P.Æ....FÞ 000180
46890000 00F49A50 16FC468D F276FFF4 76FF00AD E9F04688 0006E903 7500003D =..u.Õ...FÞÕÙ..v¶.v·.F=.P.¶....F 0001A0
890000FF FF9A5016 F6468DF2 76FFF476 FF008CE9 F0468800 06E90375 00003DF0 Þ=..u.Õ...FÞÕ...v¶.v·.F−.P...... 0001C0
56390008 E903740E 4639FE56 8BFC4688 0068E9F0 46880006 E9037500 003DF046 FÞ=..u.Õ...FÞÕk..F▪.V±9F.t.Õ..9V 0001E0
```

```
Dump of file SATURN:[PCCOMMON.DUMP.DLL]DAINDF.TMP;1 on 18-APR-1990 10:41:20.28
File ID (570,8,0)   End of file block 71 / Allocated 72

Virtual block number 30 (0000001E), 512 (0200) bytes

E9000088 0006E903 75145639 0008E903 74124639 FE5688FC 4688001C E9037510 .u.Õ...F=.V±9F.t.Õ..9V.u.Õ..|..Õ 000000
006A016E 68746AF6 76FFF876 FF0000FF FF9A00E8 681E716A F676FFF8 76FF0039 9..v½.v-jq.hÒ.......v½.v-jthn.j. 000020
CBC95F5E 1F0000E9 0000FFFF 9A746AF2 76FFF476 FF0000FF FF9A006A 006A006A j.j.j.......v¶.v·jt.....Õ...^_èù 000040
30EC4689 0000017B 9A5016F6 468D0A76 FF0C76FF D88E016B 881E5657 000018C8 à...WV.|k..Ä.v..v..F-.P.(....F£= 000060
00003DEC 46890000 01999A50 16E8468D F676FF01 29E9EC46 880006E9 03750000 ..u.Õ...F£Õ)..v-.FÒ.P......F£=.. 000080
0030EC46 89000001 8A9A5016 FC468DE8 76FFEA76 FF0108E9 EC468800 06E90375 u.Õ...F£Õ...võ.vÒ.F=.P.¤....F£=. 0000A0
30EC4689 000001DB 9A5016F2 468DE876 FFEA76FF 00EAE9EC 46880006 E9037500 .u.Õ...F£Õõ..võ.vÒ.F·.P.Ü....F£= 0000C0
5016F846 8D126AFC 76FFFE76 FF0A76FF 0C76FF00 C9E9EC46 880006E9 03750000 ..u.Õ...F£Õè..v..v..v±.v=j..F½.P 0000E0
89EE4689 FA5688F8 468800A0 E9EC4688 0006E903 7500003D EC468900 00FFFF9A ......F£=..u.Õ...F£Õ...F½.V°.FŸ. 000100
5688OE46 88EE5EC4 0067E903 7502470B 26078826 EE5EC404 EE468300 04E9F056 VÞÕ...FŸ.6^Ÿ&..&.G.u.Õg.6^Ÿ.F..V 000120
AC9AF876 FFFA76FF 0A76FF0C 76FF004A E9037402 57392600 53E90374 07392610 .&9.t.ÕS.&9W.t.ÕJ..v..v..v°.v½.¯ 000140
6A016E68 746AF276 FFF476FF 0000022F 9A00E968 1E716AF2 76FFF476 FF000003 ....v¶.v·jq.hÕ../....v¶.v·jthn.j 000160
FFFF86E9 001AE900 0002549A 746AE876 FFEA76FF 00000247 9A006A00 6A006A00 .j.j.j..G....võ.vÒjt.T...Õ..Õ... 000180
57000010 C8C8C95F 5E1F0000 E9000088 0000FFFF 9AF876FF FA76FF0A 76FF0C76 v..v..v°.v½.....|..Õ...^_èùà...W 0001A0
E9037500 003DF046 89000002 789A5016 FA468D0A 76FF0C76 FFD88E02 68881E56 V.|h..Ä.v..v..F°.P.x....Fb=..u.Õ 0001C0
0006E903 7500003D F0468900 0002969A 5016F246 8DFA76FF 00CEE9F0 46880006 ...FbÕö..v°.F·.P......Fb=..u.Õ.. 0001E0

Dump of file SATURN:[PCCOMMON.DUMP.DLL]DAINDF.TMP;1 on 18-APR-1990 10:41:20.28
File ID (570,8,0)   End of file block 71 / Allocated 72

Virtual block number 31 (0000001F), 512 (0200) bytes

06E90375 00003DF0 46890000 02B79A50 16FC468D F276FFF4 76FF0080 E9F04688 .FbÕ¯..v¶.v·.F=.P.ñ....Fb=..u.Õ. 000000
E9037500 003DF046 89000002 D89A5016 F6468DF2 76FFF476 FF008FE9 F0468800 ..FbÕ...v¶.v·.F-.P.Ä....Fb=..u.Õ 000020
4688001C E9037510 56390008 E903740E 4639FE56 88FC4688 006EE9F0 46880006 ...FbÕn..F=.V±9F.t.Õ..9V.u.Õ...F 000040
F676FFF8 76FF003C E9000088 0006E903 75145639 0008E903 74124639 FE5688FC =.V±9F.t.Õ..9V.u.Õ..|..Õ<..v½.v- 000060
006A006A 006A006A 016E6800 D068F676 FFF876FF 00000370 9A00EA68 1E00CE68 hö..hõ..p....v½.v-hÅ.hn.j.j.j.j. 000080
5700000C C8C8C95F 5E1F0000 E9009308 989A00D0 68F276FF F476FF00 0003889A ......v¶.v·hÅ......Õ...^_èùà...W 0000A0
E9037500 003DF846 89000003 D39A5016 FE468D0A 76FF0C76 FFD88E03 C3881E56 V.|Û..Ä.v..v..F±.P.Æ....F½=..u.Õ 0000C0
0006E903 7500003D F8468900 0003F19A 5016F446 8DFE76FF 007BE9F8 46880006 ...F½Õ(..v±.F¶.P.þ....F½=..u.Õ.. 0000E0
06E90375 00003DF8 46890000 04339A50 16FA468D F476FFF6 76FF0050 E9F84688 .F½Õ]..v-.v¶.F°.P.3....F½=..u.Õ. 000100
68FA76FF FC76FF00 0004889A 00EB681E 00CE68FA 76FFFC76 FF003CE9 F8468800 ..F½Õ<..v=.v°hö..hŠ.......v=.v°h 000120
04B10898 9A000068 F476FFF6 76FF0000 04A19A00 6A006A00 6A006A01 6E680000 Å.hn.j.j.j.j..Å....v-.v¶hÅ....Ÿ. 000140
9A5016FA 468D0A76 FF0C76FF D88E04C3 881E5657 000010C8 C8C95F5E 1F0000E9 Õ...^_èùà...WV.|Û..Ä.v..v..F°.P. 000160
04F19A50 16F2468D FA76FF00 CEE9F046 880006E9 03750000 30F04689 000004D3 Æ....Fb=..u.Õ...FbÕö..v°.F·.P.þ. 000180
129A5016 FC468DF2 76FFF476 FF0080E9 F0468800 06E90375 00003DF0 46890000 ...Fb=..u.Õ...FbÕ¯..v¶.v·.F=.P.. 0001A0
9A5016F6 468DF276 FFF476FF 008FE9F0 46880006 E9037500 0030F046 89000004 ....Fb=..u.Õ...FbÕ...v¶.v·.F-.P. 0001C0
03740E46 39FE5688 FC468800 6EE9F046 880006E9 03750000 30F04689 00000512 .....Fb=..u.Õ...FbÕn..F=.V±9F.t. 0001E0

Dump of file SATURN:[PCCOMMON.DUMP.DLL]DAINDF.TMP;1 on 18-APR-1990 10:41:20.28
File ID (570,8,0)   End of file block 71 / Allocated 72

Virtual block number 32 (00000020), 512 (0200) bytes

06E90375 14563900 08E90374 124639FE 5688FC46 88001CE9 03751056 390008E9 Õ..9V.u.Õ...F=.V±9F.t.Õ..9V.u.Õ. 000000
68F676FF F876FF00 0005359A 00EC681E 000368F6 76FFF876 FF003CE9 00008800 .|..Õ<..v½.v-hÆ..h$..5....v½.v-h 000020
055E0E2E 9A000568 F276FFF4 76FF0000 054E9A00 6A006A00 6A006A01 6E680005 f.hn.j.j.j.j..N....v¶.v·hf....^. 000040
9A5016FA 468D0A76 FF0C76FF D88E0570 881E5657 000018C8 C8C95F5E 1F0000E9 Õ...^_èùà...WV.|p..Ä.v..v..F°.P. 000060
059E9A50 16EC468D FA76FF01 2CE9F046 880006E9 03750000 30F04689 00000580 .....Fb=..u.Õ...FbÕ,..v°.F$.P... 000080
BF9A5016 FC468DEC 76FFEE76 FF010EE9 F0468800 06E90375 000030F0 46890000 ...Fb=..u.Õ...FbÕ...vŸ.v$.F=.P.e 0000A0
9A5016F6 468DEC76 FFEE76FF 00EDE9F0 46880006 E9037500 0030F046 89000005 ....Fb=..u.Õ...FbÕÙ..vŸ.v$.F-.P. 0000C0
76FFFE76 FF0A76FF 0C76FF00 CCE9F046 880006E9 03750000 30F04689 000005E0 Å....Fb=..u.Õ...FbÕ$..v..v..v±.v 0000E0
468800A3 E9F04688 0006E903 75000030 F0468900 0003019A 5016F246 8D136AFC =j..F·.P......Fb=..u.Õ...FbÕE..F 000100
006AE903 7502470B 26078826 E85EC404 E8468300 04E9EA56 89E84689 F45688F2 ·.v¶.FÒ.VõÕ...FÒ.6^Õ&..&.G.u.Õj. 000120
0A76FF0C 76FF0040 E9037402 57392600 56E90374 07392610 56880E46 88E85EC4 6^Õ.F..V.&9.t.ÕV.&9W.t.ÕM..v..v. 000140
F876FF00 0006359A 00ED681E 000368F6 76FFF876 FF000007 879AF276 FFF476FF .v¶.v·.ñ....v½.v-hÆ..hÚ..5....v½ 000160
9A000568 EC76FFEE 76FF0000 064E9A00 6A006A00 6A006A01 6E680005 68F676FF .v-hf.hn.j.j.j.j..N....vŸ.v$hf.. 000180
00E90000 88000003 5F9AF276 FFF476FF 0A76FF0C 76FFFF83 E9001AE9 065E0E2E ..^.Õ..Õ...v..v..v¶.v·._....|..Õ. 0001A0
06809A50 16FA468D 0A76FF0C 76FFD88E 0670881E 56570000 10C8C8C9 5F5E1F00 ..^_èùà...WV.|p..Ä.v..v..F°.P... 0001C0
0000069E 9A5016F2 468DFA76 FF00CEE9 F0468800 06E90375 000030F0 46890000 ...Fb=..u.Õ...FbÕö..v°.F·.P..... 0001E0
```

```
Dump of file SATURN:[PCCOMMON.DUMP.DLL]DAIMDF.TMP;1 on 18-APR-1990 10:41:20.28
File ID (570,8,0)   End of file block 71 / Allocated 72

Virtual block number 33 (00000021), 512 (0200) bytes

 0006BF9A 5016FC46 8DF276FF F476FF00 80E9F046 880006E9 03750000 3DF04689 .Fb=..u.Ő...FbŐ¯..v¶.v·.F=.P.¢.. 000000
 06E09A50 16F6468D F276FFF4 76FF008F E9F0468B 0006E903 7500003D F0468900 ..Fb=..u.Ő...FbŐ...v¶.v·.F-.P.Å. 000020
 08E90374 0E4639FE 568BFC46 8B006EE9 F0468800 06E90375 00003DF0 46890000 ...Fb=..u.Ő...FbŐn..F=.V±9F.t.Ő. 000040
 880006E9 03751456 390008E9 03741246 39FE568B FC468800 1CE90375 10563900 .9V.u.Ő...F=.V±9F.t.Ő..9V.u.Ő..| 000060
 009068F6 76FFF876 FF000007 799A00EE 681E008E 68F676FF F876FF00 3CE90000 ..Ő<..v½.v-h...hŸ..y....v½.v-h.. 000080
 00E90000 FFFF9A00 9068F276 FFF476FF 00000792 9A006A00 6A006A00 6A016E68 hn.j.j.j.j.......v¶.v·h.......Ő. 0000A0
 07DE9A50 16F2468D 0A76FF0C 76FFD88E 07CE881E 56570000 18C8CBC9 5F5E1F00 ..^_èùà...WV.¦ö..Ã.v..v..F·.P.8. 0000C0
 000007FC 9A5016E8 468DF276 FF012CE9 EC468800 06E90375 000030EC 46890000 ...F̄ŝ=..u.Ő...FŝŐ,..v·.FÒ.P.=... 0000E0
 00081D9A 5016FC46 8DE876FF EA76FF01 0EE9EC46 880006E9 03750000 30EC4689 .Fŝ=..u.Ő...FŝŐ...vŏ.vÒ.F=.P.... 000100
 083E9A50 16EE468D E876FFEA 76FF00ED E9EC4688 0006E903 7500003D EC468900 ..Fŝ=..u.Ő...FŝŐÙ..vŏ.vÒ.FŸ.P.>. 000120
 6AFC76FF FE76FF0A 76FF0C76 FF00CCE9 EC468800 06E90375 00003DEC 46890000 ...Fŝ=..u.Ő...FŝŐä..v..v..v±.v=j 000140
 88F8468B 00A3E9EC 46880006 E9037500 0030EC46 89000007 099A5016 F8468D22 ".F½.P......Fŝ=..u.Ő...FŝŐÈ..F½. 000160
 5EC4006A E9037502 470B2607 8B26F45E C404F446 830004E9 F65689F4 4689FA56 V".F¶.V-Ő...F¶.6^¶&..&.G.u.Őj.6^ 000180
 76FF0A76 FF0C76FF 0040E903 74025739 260056E9 03740739 2610568B 0E468BF4 ¶.F..V.&9.t.ŐV.&9W.t.ŐM..v..v..v 0001A0
 76FFF076 FF000008 939A00EF 681E008E 68EE76FF F076FF00 000A159A F876FFFA ".v½.......vb.vŸh...hÿ.......vb.v 0001C0
 088A9A00 9068E876 FFEA76FF 000008AC 9A006A00 6A006A00 6A016E68 009068EE Ÿh..hn.j.j.j.j..¯....vŏ.vÒh...¤. 0001E0

Dump of file SATURN:[PCCOMMON.DUMP.DLL]DAIMDF.TMP;1 on 18-APR-1990 10:41:20.28
File ID (570,8,0)   End of file block 71 / Allocated 72

Virtual block number 34 (00000022), 512 (0200) bytes

 1F0000E9 00008800 0007679A F876FFFA 76FF0A76 FF0C76FF FF83E900 1AE90000 ..Ő..Ő...v..v..v".v½.g...|..Ő... 000000
 000008DE 9A5016FA 468D0A76 FF0C76FF D88E08CE 881E5657 000010C8 CBC95F5E ^_èùà...WV.¦ö..Ã.v..v..F".P.8... 000020
 46890000 08FC9A50 16F2468D FA76FF00 CEE9F046 880006E9 03750000 3DF04689 .F̄b=..u.Ő...FbŐö..v".F·.P.=....F 000040
 89000009 1D9A5016 FC468DF2 76FFF476 FF0080E9 F0468800 06E90375 00003DF0 b=..u.Ő...FbŐ¯..v¶.v·.F=.P...... 000060
 0000093E 9A5016F6 468DF276 FFF476FF 008FE9F0 46880006 E9037500 003DF046 Fb=..u.Ő...FbŐ...v¶.v·.F-.P.>... 000080
 390008E9 03740E46 39FE568B FC468800 6EE9F046 880006E9 03750000 3DF04689 .Fb=..u.Ő...FbŐn..F=.V±9F.t.Ő..9 0000A0
 00008800 06E90375 14563900 08E90374 124639FE 5688FC46 88001CE9 03751056 V.u.Ő...F=.V±9F.t.Ő..9V.u.Ő..|.. 0000C0
 6E68000A 68F676FF F876FF00 0009D79A 00F0681E 000868F6 76FFF876 FF003CE9 Ő<..v½.v-hÃ..hb..=....v½.v-hŐ.hn 0000E0
 1F0000E9 07A2144B 9A000A68 F276FFF4 76FF0000 09F09A00 6A006A00 6A006A01 .j.j.j.j..b....v¶.v·hŐ..K.Å.Ő... 000100
 00000A3C 9A5016FA 468D0A76 FF0C76FF D88E0A2C 881E5657 000010C8 CBC95F5E ^_èùà...WV.¦,..Ã.v..v..F".P.<... 000120
 46890000 0A5A9A50 16F0468D FA76FF00 9CE9F446 880006E9 03750000 3DF44689 .F̄¶=..u.Ő...F¶Ő...v".Fb.P.Z....F 000140
 8900000A 7B9A5016 FC468DF0 76FFF276 FF007EE9 F4468800 06E90375 00003DF4 ¶=..u.Ő...F¶Ő-..v·.vb.F=.P.(.... 000160
 00000A9C 9A5016F6 468DF076 FFF276FF 005DE9F4 46880006 E9037500 003DF446 F¶=..u.Ő...F¶Ő]..v·.vb.F-.P..... 000180
 F19A00F1 681E00D8 68F676FF F876FF00 3CE9F446 880006E9 03750000 3DF44689 .F¶=..u.Ő...F¶Ő<..v½.v-hÃ..hb..þ 0001A0
 FFF276FF 000008DA 9A006A00 6A006A00 6A016E68 00DA68F6 76FFF876 FF00000A ....v½.v-hŐ.hn.j.j.j.j.......v·. 0001C0
 76FFD88E 082C881E 56570000 10C8CBC9 5F5E1F00 00E9081A 14489A00 DA68F076 vbhŐ..K...Ő...^_èùà...WV.¦,..Ã.v 0001E0

Dump of file SATURN![PCCOMMON.DUMP.DLL]DAIMDF.TMP;1 on 18-APR-1990 10:41:20.28
File ID (570,8,0)   End of file block 71 / Allocated 72

Virtual block number 35 (00000023), 512 (0200) bytes

 FF00CEE9 F0468800 06E90375 000030F0 46890000 083C9A50 16FA468D 0A76FF0C ..v..F".P.<....Fb=..u.Ő...FbŐö.. 000000
 F476FF00 B0E9F046 880006E9 03750000 3DF04689 0000085A 9A5016F2 468DFA76 v".F·.P.Z....Fb=..u.Ő...FbŐ¯..v¶ 000020
 76FF008F E9F0468B 0006E903 7500003D F0468900 0008789A 5016FC46 8DF276FF .v·.F=.P.(....Fb=..u.Ő...FbŐ...v 000040
 88006EE9 F0468800 06E90375 00003DF0 46890000 089C9A50 16F6468D F276FFF4 ¶.v·.F-.P......Fb=..u.Ő...FbŐn.. 000060
 03741246 39FE568B FC468800 1CE90375 10563900 08E90374 0E4639FE 568BFC46 F=.V±9F.t.Ő..9V.u.Ő...F=.V±9F.t. 000080
 BF9A00F2 681E000D 68F676FF F876FF00 3CE90000 880006E9 03751456 390008E9 Ő..9V.u.Ő..|..Ő<..v½.v-hĪ..h·..¢ 0000A0
 FFF476FF 00000808 9A006A00 6A006A00 6A016E68 00DF68F6 76FFF876 FF000008 ....v½.v-hŐ.hn.j.j.j.j..Ã....v¶. 0000C0
 76FFD88E 08FA881E 56570000 0CC8CBC9 5F5E1F00 00E908E8 1A699A00 DF68F276 v·hŐ..Ī.Ò.Ő...^_èùà...WV.¦"..Ã.v 0000E0
 FF007BE9 F8468800 06E90375 000030F8 46890000 0C0A9A50 16FE468D 0A76FF0C ..v..F±.P......F̄½=..u.Ő...F½Ő(.. 000100
 F676FF00 5DE9F846 880006E9 03750000 3DF84689 00000C28 9A5016F4 468DFE76 v±.F¶.P.(....F½=..u.Ő...F½Ő]..v- 000120
 76FF003C E9F8468B 0006E903 7500003D F8468900 000C6A9A 5016FA46 8DF476FF .v¶.F".P.j....F½=..u.Ő...F½Ő<..v 000140
 006A006A 016E6800 DF68FA76 FFFC76FF 00000CBF 9A00F368 1E000068 FA76FFFC =.v"hĪ..h#..¢....v=.v"hŐ.hn.j.j. 000160
 C8CBC95F 5E1F0000 E90CE81A 699A000F 68F476FF F676FF00 000CD89A 006A006A j.j..Ã....v-.v¶hŐ..Ī.Ò.Ő...^_èùà 000180
 003DF046 89000000 0A9A5016 FA468D0A 76FF0C76 FFD88E0C FA881E56 57000010 ...WV.¦"..Ã.v..v..F".P......F̄b=. 0001A0
 7500003D F0468900 0000289A 5016F246 8DFA76FF 00CEE9F0 46880006 E9037500 .u.Ő...FbŐö..v".F·.P.(....Fb=..u 0001C0
 00003DF0 46890000 0C499A50 16FC468D F276FFF4 76FF00B0 E9F0468B 0006E903 .Ő...FbŐ¯..v¶.v·.F=.P.I....Fb=.. 0001E0
```

```
Dump of file SATURN:[PCCOMMON.DUMP.DLL]DAIMDF.TMP;1 on 18-APR-1990 10:41:20.28
File ID (570,8,0)   End of file block 71 / Allocated 72

Virtual block number 36 (00000024), 512 (0200) bytes

 003DF046 89000000 499A5016 F6468DF2 76FFF476 FF008FE9 F0468B00 06E90375 u.Õ...FÞÕ...v¶.v·.F-.P.I....Fþ=. 000000
 E9037510 56390008 E903740E 4639FE56 8BFC4688 006EE9F0 46880006 E9037500 .u.Õ...FÞÕn..F=.V±9F.t.Õ..9V.u.Õ 000020
 76FF003C E90000B8 0006E903 75145639 0008E903 74124639 FE5688FC 4688001C ...F=.V±9F.t.Õ..9V.u.Õ..¡..Õ<..v 000040
 006A006A 016E6800 EA68F676 FFF876FF 0000006C 9A00F468 1E00E868 F676FFF8 ½.v-hÕ..h¶..l....v½.v-hõ.hn.j.j. 000060
 C8CBC95F 5E1F0000 E90000FF FF9A00EA 68F276FF F476FF00 0000859A 006A006A j.j.......v¶.v·hõ......Õ...^_èùà 000080
 003DF846 89000000 B79A5016 FE468D0A 76FF0C76 FFD88E0D A7881E56 5700000C ...WV.¡Ï..Ä.v..v..F±.P.ñ....F½=. 0000A0
 75000030 F8468900 0000059A 5016F446 8DFE76FF 007BE9F8 46880006 E9037500 .u.Õ...F½Õ(..v±.F¶.P.í....F½=..u 0000C0
 000030F8 46890000 0E179A50 16FA4680 F476FFF6 76FF005D E9F84688 0006E903 .Õ...F½Õ]..v¬.v¶.F°.P......F½=.. 0000E0
 FC76FF00 000E6C9A 00F5681E 00E868FA 76FFFC76 FF003CE9 F8468800 06E90375 u.Õ...F½Õ<..v=.v°hÕ..h%..l....v= 000100
 9A00EA68 F476FFF6 76FF0000 0E859A00 6A006A00 6A006A01 6E6800EA 68FA76FF .v°hõ.hn.j.j.j.j.......v¬.v¶hõ.. 000120
 46800676 FF0876FF D88E0EA7 B81E5657 000008C8 CBC95F5E 1F0000E9 00000E93 ....Õ...^_èùà...WV.¡Ï..Ä.v..v..F 000140
 800676FF 0876FF03 27E9F846 880006E9 03750000 3DF84689 0000FFFF 9A5016FE ±.P......F½=..u.Õ...F½Õ'..v..v.. 000160
 FC76FFFE 76FF0306 E9F84688 0006E903 75000030 F8468900 00FFFF9A 5016FA46 F°.P......F½=..u.Õ...F½Õ...v±.v= 000180
 46880006 E9037500 003DF846 890000FF FF9A5052 0002050C 56880A46 8BFA76FF .v°.F..V....RP......F½=..u.Õ...F 0001A0
 46890000 10509AFF FF680FFB 682F6A01 6A0277FF 260477FF 260A5EC4 020CE9F8 ½ÕÉ.á^.&.w.&.w.j.j/h«.h...]....F 0001C0
 FFFF6810 26680277 FF260477 FF260A5E C40281E9 F8468800 06E90375 00003DF8 ½=..u.Õ...F½ÕÝ.á^.&.w.&.w.h&.h.. 0001E0

Dump of file SATURN:[PCCOMMON.DUMP.DLL]DAIMDF.TMP;1 on 18-APR-1990 10:41:20.28
File ID (570,8,0)   End of file block 71 / Allocated 72

Virtual block number 37 (00000025), 512 (0200) bytes

 77FF2604 77FF260A 5EC4028A E9F84688 0006E903 75000030 F8468900 00FFFF9A ......F½=..u.Õ...F½Õ..á^.&.w.&.w 000000
 06E90375 000030F8 46890000 108E9AFF FF681057 68102F68 102C6812 6A016A02 .j.j.h,.h/.hW.h........F½=..u.Õ. 000020
 0010B99A FFFF6810 8268026A 0A6A0277 FF260477 FF260A5E C40259E9 F8468800 ..F½ÕY.á^.&.w.&.w.j.j.h..h...¿.. 000040
 6A016A02 77FF2604 77FF260A 5EC4022E E9F84688 0006E903 75000030 F8468900 ..F½=..u.Õ...F½Õ..á^.&.w.&.w.j.j 000060
 F8468800 06E90375 000030F8 46890000 10EA9AFF FF6810B3 68108868 10886818 .h..h..h°.h...õ....F½=..u.Õ...F½ 000080
 F8468900 00FFFF9A FFFF6810 DE68026A 026A0277 FF260477 FF260A5E C401FDE9 Õ».á^.&.w.&.w.j.j.hß.h........F½ 0000A0
 10E4681A 6A016A02 77FF2604 77FF260A 5EC401D2 E9F84688 0006E903 75000030 =..u.Õ...F½Õ®.á^.&.w.&.w.j.j.hÕ. 0000C0
 C401A1E9 F8468800 06E90375 000030F8 46890000 FFFF9AFF FF68FFFF 6810E768 hÕ.h..h........F½=..u.Õ...F½ÕÀ.á 0000E0
 75000030 F8468900 0011719A FFFF6811 3A68026A 056A0277 FF260477 FF260A5E ^.&.w.&.w.j.j.h:.h...q....F½=..u 000100
 68114368 11406817 6A016A02 77FF2604 77FF260A 5EC40176 E9F84688 0006E903 .Õ...F½Õv.á^.&.w.&.w.j.j.h@.hC.h 000120
 FF260A5E C40145E9 F8468800 06E90375 000030F8 46890000 11A29AFF FF68116B k.h...Å....F½=..u.Õ...F½ÕE á^.&. 000140
 0006E903 75000030 F8468900 0011CD9A FFFF6811 9668026A 076A0277 FF260477 w.&.w.j.j.h..h...ë....F½=..  .Õ.. 000160
 FF6811C7 68119F68 119C6816 6A016A02 77FF2604 77FF260A 5EC4011A E9F8468B .F½Õ..á^.&.w.&.w.j.j.h..h..h. h. 000180
 FF260477 FF260A5E C400E9E9 F8468800 06E90375 000030F8 46890000 11FE9AFF ..±....F½=..u.Õ...F½ÕÕ.á^.&.w.&. 0001A0
 E9F84688 0006E903 75000030 F8468900 0012299A FFFF6811 F268026A 066A0277 w.j.j.h·.h...)....F½=..u.Õ...F½Õ 0001C0
 125A9AFF FF681223 6811F868 11F86828 6A016A02 77FF2604 77FF260A 5EC400BE ƒ.á^.&.w.&.w.j.j+h½.h«.h#.h...Z. 0001E0

Dump of file SATURN:[PCCOMMON.DUMP.DLL]DAIMDF.TMP;1 on 18-APR-1990 10:41:20.28
File ID (570,8,0)   End of file block 71 / Allocated 72

Virtual block number 38 (00000026), 512 (0200) bytes

 086A0277 FF260477 FF260A5E C4008DE9 F8468800 06E90375 000030F8 46890000 ...F½=..u.Õ...F½Õ..á^.&.w.&.w.j. 000000
 5EC40062 E9F84688 0006E903 75000030 F8468900 0012859A FFFF6812 4E68046A j.hN.h........F½=..u.Õ...F½Õb.á^ 000020
 46890000 10329AFF FF68127F 68125768 12546822 6A016A02 77FF2604 77FF260A .&.w.&.w.j.j"hT.hW.h..h...2....F 000040
 D468026A 156A0277 FF260477 FF260A5E C40031E9 F8468800 06E90375 000030F8 ½=..u.Õ...F½Õ1.á^.&.w.&.w.j.j.hÔ 000060
 0000E9F8 46880006 E9F84688 0006E903 75000030 F8468900 000FDA9A FFFF680F .h...Ö....F½=..u.Õ...F½Õ...F½Õ.. 000080
 08C60002 12820005 00000005 0ED50203 00000001 00950002 002690C8 C95F5E1F .^_èù.&............f...f.......6. 0000A0
 01D40007 0F640203 00000002 110F0002 007F0001 0F320103 07C60002 12510005 ..ã...6...2...............d...å. 0000C0
 01E30007 0DF60203 03DA0008 0F400203 00000006 0F540002 00860001 0F190103 ..........T.......a...Ö...¬...D. 0000E0
 03640008 01570203 01630002 10290005 02600002 105A0005 04580009 11460203 ..F...X...Z...`...)...c...W...d. 000100
 03700008 03950203 01F30007 0F850203 06680002 11120005 05680002 10E10005 ..Ä...h.......h.......µ.......p. 000120
 01FF0007 0EF60203 08F20002 11990005 0CF20002 11CA0005 00920004 09670203 ..g.......ò...·.......`...¯..... 000140
 040A0009 0FAF0203 00AB0004 09C50203 00000002 0FD70005 009E0004 011D0203 ..........■.......é...¨...£..... 000160
 009F0002 11F50005 0E9F0002 12260005 00900002 0FFE0005 03990008 09FE0203 ..±.......±.......&.......¥..... 000180
 04320009 10010203 04210009 11150203 0A240002 11300005 08240002 116E0005 ..n...$...=...$.......!.......2. 0001A0
 00000000 00000000 005E0004 0E870203 03B80002 10850005 04B80002 10860005 ..Ñ...£.......£...ñ...^......... 0001C0
 00000000 00000000 00000500 02000200 01C80001 B81F0396 3E89088E FFFFB81E .¡...Ä.>...¡..Ù................ 0001E0
```

Dump of file SATURN:[PCCOMMON.DUMP.DLL]DAIMDF.TMP;1 on 18-APR-1990 10:41:20.28
File ID (570,8,0)   End of file block 71 / Allocated 72

Virtual block number 39 (00000027), 512 (0200) bytes

```
C0330A7E C40676C5 1EDE88D7 8BEC8855 00000000 00000000 00000000 00000000 ................U.Š.e.B.év.6~.36 000000
C40788EC 885500CB 5DFA88F3 881FFFFF 1DC01B05 74A6F3F9 2BD1F7AE F2FFFF89 ¿..·Ù%l+ªµlt..å.....µ.ª]ù.U.Š.e6 000020
89EC468D 56570000 16C8000C 7BE900CB 5DFA8891 4901F7AE F2FFFF89 C033067E ~.3ô¿..·Ù%ll..ª]ù.Õ(..à...WV.FŠ. 000040
06478926 08568806 4688420A 47C626F8 5EC4FE56 8CFC4689 0E468DFA 568CF846 F½.Vª.F..F=.V±á^¥&6G.B.F..V.&.G. 000060
024C9A53 060A76FF 0C76FFFC 76FF167F FF0447C7 26025789 26078926 08578926 &.W.&..&.W.&úG.....v=.v..v..S.L. 000080
EB058826 02478E26 07FF263F 8B26C02A 1278044F FF26F85E C4F08B0C C48300CB ù..á..Þá^¥&.O.x.ª&&.?&..&.G.&..Š 0000A0
26085EC4 56570000 08C8C8C9 5F5EC68B 06C483FF FF00D69A 006A53FA 76FF900F ...vªSj..e....á..6^_èùà...WVá^.& 0000C0
4689113C 05E0D1C1 03E0D1C8 88F9F700 0CB99905 482DC388 FA4689E4 2A0B478A .G.ªÕ.Fª.û-H..¿..¾ª.àlÀ.èlÀ.<..F 0000E0
5EC49001 2BE9FFFF B8200A4F 8026085E C40F7440 0A47F626 0774830A 47F626F8 ¥&-G..t.&-G.@t.á^.&.O. |..Õ+..á^ 000100
EF0A6780 26020A4F 802690E2 EB000004 47C72620 0A4F8026 0E74010A 47F62608 .&-G..t.&.O. &úG...Šã.&.O..&.g.ÿ 000120
06086BF9 F7000CB9 9905482D C3884C75 0C0A47F6 26FC7689 F08B0447 8926C02B +ä&.G..Þ.v=&-G..uL.û-H..¿..¾ªkÄ. 000140
FF0A7E81 16750560 087E810E 74017F0A 7E810775 0554087E 81377501 113C87F6 ~.<..u7.~.T.u..~...t..~.'.u..~.. 000160
5EC404C4 830CA7E8 0876FF0A 76FF0C75 C00802C4 8301F210 A29AFA76 FF0F75FF .u..vª.Å.·..á..åu..v..v.Òl..á.á^ 000180
085E8B67 7401113C 87F60608 68F9F700 0CB99905 482DC388 1575080A 47F62608 .&~G..u..û-H..¿..¾ªkÄ.~.<..tg.^. 0001A0
89264802 4588F87E 88025789 26078926 40085788 26064788 2606772B 26378826 &.7&+w.&.G.&.W.a&..&.W..~½.E.H&. 0001C0
F6FA5E88 19E8FC46 8908C483 02100F0A 9AFA76FF 0677FF26 5256167E F60B0447 G..~~.VR&.w..vª......6..F=Š..^ª~ 0001E0
```

Dump of file SATURN:[PCCOMMON.DUMP.DLL]DAIMDF.TMP;1 on 18-APR-1990 10:41:20.28
File ID (570,8,0)   End of file block 71 / Allocated 72

Virtual block number 40 (00000028), 512 (0200) bytes

```
2606468A 065FC426 085EC408 C4830233 0ECC9A53 006A006A 026A0F74 20174D87 .M. t.j.j.j.S.ä.3..á.á^.&á_..F.& 000000
0374FC76 39FC4689 08C48300 A00F0A9A FA76FF50 1606468D 560001BE 17EB0788 ..Š./..V.F..P.vª......á..F=9v=t. 000020
981E8C1A 96A31A9C 88018910 C69A000A 88EC8855 CBC95F5E E42A0646 8AFECCE9 Õä±.F.ªÕ^_èùU.Š|...ó...|..È..... 000040
001A9206 C71A6E16 891A6CA3 08568806 46881A88 16891A86 A3105688 0E46881A ..F..V.È.......F..V.Èl...n.ú.... 000060
72A31A76 A3C02B00 011A9406 C7030BE9 037425F6 7E80038D E900001A 9006C700 .ú.....Õ...—%t.Õ..ú.....+ãÈv.Èr 000080
260A5EC4 00201BFC 06C71A84 A31A6AA3 1A70A31A 8AA31A8C A31A74A3 1A8EA31A .È..Èt.È..È..Èp.Èj.È..ú.=. .á^.& 0000A0
C71A7606 FF0D752B 3F80260A 5E88903E EB00301B FC06C70A 46FF4975 30017F80 ...0ul.F.ú.=.0.Š>..^.&.?+u...v.ú 0000C0
1A6A06FF 9014EB1A 8A06FF1A 75001A76 3E830E75 203F8026 9028E800 001A8A06 .....Š(.&.? u..>v..u.....Š....j. 0000E0
C4830978 E80E5098 078A260A 5E880A46 FF1A8406 FFC77520 3F80260A 5EC400EB Š.á^.&.?-uú.....F..^.&...P.Òx..á 000100
1A9A3E83 0C56890A 468908C4 8308C7E8 0E1A9A68 1E0A76FF 0C76FFD0 75C00802 ..åul.v..v..h...Òú..á..F..V..>.. 000120
FC06C706 75301BFC 3E830D74 001A843E 831A9AA3 D8F71A9A A11A8406 FF0C7D00 .}.....À..¾ÀÈ...>...t..>=.Ou.ú.= 000140
83087BE8 0E1A9468 1E0A76FF 060A46FF 1A8C06FF 2D752E3F 80260A5E C400201B . .á^.&.?.u-.....F...v..h...Ò(.. 000160
98078A26 0A5EC41A 8C0EFF00 011A9406 C70A7D00 1A943E83 0C56890A 468908C4 á..F..V..>...}.ú.........á^.&... 000180
75001A74 3E830002 1A7406C7 0675006C 3D2B7400 68304074 004E3030 74004630 =F.t==N.t@=h.t+=l.u.ú.t....>t..u 0001A0
00011A74 06C79002 4EE91C75 003F8026 0A5EC40A 46FF0375 4C3F8026 0A5EC409 .á^.&.?Lu..F.á^.&.?.u.ÒN..ú.t... 0001C0
47300A74 00453DF8 46899807 8A26C8EB 00081A74 06C7D0EB 00101A74 06C7D8EB ŠÀú.t...ŠÀú.t...Šà&....F½=E.t.=G 0001E0
```

Dump of file SATURN:[PCCOMMON.DUMP.DLL]DAIMDF.TMP;1 on 18-APR-1990 10:41:20.28
File ID (570,8,0)   End of file block 71 / Allocated 72

Virtual block number 41 (00000029), 512 (0200) bytes

```
00633D01 91E9037E 78740069 3DF8468B 20F84683 1A7206FF 08750058 30057400 .t.=X.u...r..F½ .F½=i.tx~.Õ..=c. 000000
861EC415 75021A74 3E839001 59E90140 E9037500 25300152 E9037E01 3FE90375 u.Õ?.~.ÕR.=%.u.Õ@.ÕY...>t..u.á.. 000020
83078926 1A90A11F C4261A86 1EC400EB 00000247 C7260789 261A90A1 1FC4261A .&á.À..&..&úG...Š.á...&á.À..&... 000040
0A47F626 1A6C1EC4 01B0E903 74001A90 3E830170 E9037500 1A923E83 041A8606 .....>...u.Õp..>...t.Õ§.á.l.&-G. 000060
EB02C483 019EE80E 0A6A0000 1A6A06C7 1A8E06FF 01ACE9FF FFB801AF E9037520 u.Õ£.|..Õ¯.....ú.j...j..Õ...á.Š 000080
E9037508 1A743E83 00041A94 06C71A8C 06FF1A72 06FF1A70 06FFF2EB 086A90C3 Ù.j.Š·..p...r.....ú......>t..u.Õ 0000A0
843E83FA 46891A9A A128741A 9A0639FA 46891A74 A3C02B7A 74011A74 3E830081 ...>t..tz+ãÈt..Fª9...t(À...Fª.>. 0000C0
831A9AA3 C02B027D C0081A9A A1051A9A 2E839090 13EB0000 1A9A06C7 0A74001A ..t.ú.....Š........À...ä).+ãÈ... 0000E0
1A843E83 227400FA 7E8302C4 83048DEB 0E3A6A02 C4830130 E80E106A 021A8606 ....j..Ò0..á.j:.Ò...á..~ª.t".>.. 000100
2E830000 1A9A06C7 9007EB1A 9AA3C02B 027DC00B 1A9AA300 0520FA46 88157400 .t..Fª-..È...ä).+ãÈ..Š..ú....... 000120
026EE80E 006A90FF 3FE9106A FF10E902 1A860683 02C48300 F1E80E10 6A041A86 ...j..Õþ..á......Õ..j.Õ?..j..Õn. 000140
7500643D 90FF21E9 0428E80E 256AFF2A E90349E8 0EF876FF F4E8016A 90FF39E9 Õ9..j.Š¶.v½.Òl.Õ*.j%.Ò(.Òl..=d.u 000160
46880A4E FF0C5688 0A468809 74001A74 3E830A7E 00673005 7C006530 FF0CE903 .Õ..=e.|.=g.~Õ.>t..t..F..V..N..F 000180
7030FEE4 E9037500 6F30FE80 E9037500 6E30903A EBFE5689 FC468940 0C5688 0A ..V.@.F=.V±Š:.=n.u.Õ.±=o.u.ÕÕ±=p 0001A0
46FF90B1 EBFF79E9 03750078 30FEB9E9 03750075 308F7400 7330FEE0 E9037500 .u.ÕÀ±=s.t.=u.u.Õ¿±=x.u.Õy.ŠŸ..F 0001C0
76FF500A 462BC388 EC75253C 0474C00A F6468807 8A26FC5E C4FC46FF 9034E80A .Š4..F=á^=&...F-.ât.<%uŠ.Û+F.P.v 0001E0
```

```
Dump of file SATURN:[PCCOMMON.DUMP.DLL]DAIMDF.TMP;1 on 18-APR-1990 10:41:20.28
File ID (570,8,0)   End of file block 71 / Allocated 72

Virtual block number 42 (0000002A), 512 (0200) bytes

F6468807 8A260A5E C40C5689 0A4689FE 5688FC46 8806C483 044CE80E 0A76FF0C ..v..ÒL..é..F•.V±.F..V.é^.&...F- 000000
56570000 12C8C8C9 1A90A1FE 51E90374 200A47F6 261A6C1E C4FC63E9 0374C00A .ât.Òc=é.l.&-G. t.ÒQ±À..èùà...WV 000020
3E830774 021A743E 831A8E06 FF04740A 067E8300 2018FC06 C7067400 1A8C3E83 .>...t.ú.•. ..~..t......>t..t..> 000040
3E83902C E8041A86 0683FE56 89FC4689 02578826 0788261A 861EC419 75101A74 t..u.é...&..&.W..F•.V±.....Š,..> 000060
46899907 88261A86 1EC40EE8 0000FE46 C7FC4689 0788261A 861EC411 74001A8E ...t.é...&...F•úF±..Š.é...&....F 000080
C0289003 E8064688 0674FE46 08FC4688 0E74001A 6A3E8302 1A860683 FE5689FC •.V±......>j..t..F•.F±t..F.Š..+é 0000A0
067E8328 7D00FE7E 83317500 1A8E3E83 F45689F2 46891A98 16881A96 A118FAA3 È•.À.......F·.V¶.>...u1.-±.)+.-. 0000C0
FE5689FC 46890AF7 00028308 F7FE5688 FC468820 07C626F2 46FFF25E C41D750A .u.é^·.F·&6.-.F•.V±¥Ã.@.¥Ö.F•.V± 0000E0
76FFFE76 FF501E06 76FFFA5E 8CF84689 1A788800 00F646C7 9006E800 01F646C7 úF-..Š..úF-..¡X..F½.^•.v..P.v±.v 000100
0E8804C4 83025500 3A9AF876 FFFA76FF 4574001A 8C3E830A C4830739 10989AFC •...9..é..>...tE.v•.v½.:.U..é... 000120
05E8F27E C4F04E88 00001BFA 06C70675 0818FA3E 83007EC9 08F04E89 C8281A94 ..+à.Nþ.è-..>•..u.ú.•....Nþé-·Š. 000140
C4F276C5 EE5E8C1A 720E88F0 4E89F446 8CF27E89 F47FC008 49C18847 3005C626 &6.0G.él.à.¶.-·.F¶.Nþ..r..^Ÿév·é 000160
8CF27689 E375003F 8026F846 FF46202C 80037C61 3C0774C9 08048807 8A26F85E ^½&.....èt.<a|.., F.F½&.?.uD.v·. 000180
02E80001 88057500 F67E8308 741A8A06 081A76A1 1475001A 8E3E83EE 5E8EF45E ^¶.^Ÿ.>...u.Àv.....t..-¬.u.¡..Š. 0001A0
1A86A100 018E1874 00067E83 56570000 10C8C8C9 5F5E02C4 8302FFE8 0E50C028 +âP.Ò...é.^_èùà...WV.~..t./..À.. 0001C0
0788261A 861EC413 74081A74 3E83008F E9021A86 0683FA56 89F84689 1A881688 .....F½.V•.....Ö...>t..t.é...&.. 0001E0

Dump of file SATURN:[PCCOMMON.DUMP.DLL]DAIMDF.TMP;1 on 18-APR-1990 10:41:20.28
File ID (570,8,0)   End of file block 71 / Allocated 72

Virtual block number 43 (0000002B), 512 (0200) bytes

1A860683 FA5E8CF8 4689FC46 89078826 1A861EC4 10E8FA56 89F84689 02578826 &.W..F½.V•Š.é...&...F•.F½.^•.... 000000
8900FD88 097500FC 7E83900A EB00F688 1575FA46 08F84688 0E74081A 743E8304 ..>t..t..F½.F•u.|-.Š...-•.u.|•.. 000020
900EE81A 940E881C 741A8C36 39F628F4 5689F246 89FA5688 F8468BFA 5E8CF846 F½.^•.F½.V•.F·.V¶+-96..t.....Š.. 000040
75003F80 26F246FF F25EC446 90EDE810 7ECE3846 1574003F 8026F246 FFF25EC4 é^·.F·&.?.t.F;ö-.ŠÚ.Fé^·.F·&.?.u 000060
83E80EF8 76FFFA76 FF5602C4 830159E8 0E570875 001A843E 83FE281A 9A3E88F3 µ.>..+±.>...u.W.ÒY..é.V.v•.v½.Ò• 000080
881A86A1 000006C8 90C8C95F 5E02C483 013CE80E 57087400 1A843E83 06C48301 ..é..>...t.W.Ò<..é.^_èù.à...À... 0000A0
83FA4688 C02A9003 E801B005 7547067E 83067467 067E83FE 5689FC46 891A8816 ....F•.V±.-.gt..-.Gu.¯.Š..*à.F•. 0000C0
FF00011A 9406C706 75001A94 3E830074 00FA7E80 00061A94 06C70675 001A8C3E >...u.ú......-•.t..>...u.ú...... 0000E0
281EFF26 1988068E FC76FFFE 76FF1A96 36FF1A98 36FF0676 FF1A9436 FF1A7236 6r..6...v..6...6...v±.v•....&..( 000100
1EFF2619 88068E1A 9636FF1A 9836FF14 75001A6A 3E831874 00FA7E80 0EC48305 ..é..-•.t..>j..u..6...6......&.. 000120
26198806 8E1A9636 FF1A9836 FF147500 1A943E83 1874001A 6A3E8304 C483052C ,..é..>j..t..>...u..6...6......& 000140
76FFFE76 FF18741A 8A06081A 76A10000 18FA06C7 081A8606 8304C483 05341EFF ..4..é......ú.•...Àv.....t..v±.v 000160
90C8C901 29E80E50 C02802E8 00018805 74C00804 C4830538 1EFF2619 88068EFC •....&..8..é..ât.|..Š.+âP.Ò).èù. 000180
2607FF26 37882606 468A1478 044FFF26 1A6C1EC4 3C75001A 923E8356 000000C8 à...V.>...u<é.l.&.O.x..F.&.7&..& 0001A0
9206FF07 754006C4 830A1100 D69A0676 FF531A6E 36FF10E8 E42A0488 2602478E .G.&..*ðŠ..6n.S.v..ø....é.àu.... 0001C0
507EF608 06768857 75001A92 3E835657 000002C8 90C8C95E 1A9006FF 9005E81A .Š......^èù.à...WV.>...uW.v..--P 0001E0

Dump of file SATURN:[PCCOMMON.DUMP.DLL]DAIMDF.TMP;1 on 18-APR-1990 10:41:20.28
File ID (570,8,0)   End of file block 71 / Allocated 72

Virtual block number 44 (0000002C), 512 (0200) bytes

4EC6881A 9206FF04 754006C4 830A7900 D69A1BFC 36FF1A6C 36FF1A6E 36FF1BE8 Š..6n..6l..6•..ø.y..é.àu......6N 000000
E42A0588 2602478E 2607FF26 3F88261B FCA00478 044FFF26 1A6C1EC4 1E7EC008 .â-.é.l.&.O.xâ.•.&.7&..&.G.&..*ò 000020
923E830A 76885657 000002C8 C8C95F5E 1A900601 06468807 75001A92 3E8304E8 Šâ.>...u..F.....^_èùà...WV.v..>. 000040
754006C4 830AE800 D69A5098 078A2606 5EC41A6C 36FF1A6E 36FF22EB 5E75001A ..u^Š".6n..6l.é^.Ē...P.ø.Š..é.àu 000060
C4078A26 065EC4CD 78044FFF 261A6C1E C42574C0 084EC688 0646FF1A 9206FF04 ......F..6N.âtX6.l.&.O.xëé^.&..é 000080
06010A46 88077500 1A923E83 CAE8E42A 05882602 478E2607 FF263F88 261A6C1E .l.&.?&..&.G.&..*ðŠð.>...u..F... 0000A0
FA4689FC 4689C028 F65689F4 46891A98 16881A96 A1560000 0CC8C8C9 5F5E1A90 ..^_èùà...VÀ.......F¶.V-+à.F•.F• 0000C0
83057510 18FA3E83 06762BF0 28F84689 04C48307 24003A9A F476FF52 1A9A3688 .6..R.v¶.:.$..é..F¥+Þ+v..>•..u.. 0000E0
18FC3E83 19752D3F 8026F45E C4227500 1A843E83 4E017508 18FA3E83 08E802EE Ÿ.Š..>•..u.N.>...u"é^¶&.?-u..>•. 000100
077EF608 0874301B FC3E83F8 4EFF02C4 83FE71E8 0E509807 8A26F446 FF127530 Ou..F¶&...P.Òq±.é..N½.>•.0t..-¬. 000120
E80EFC46 FF077400 18FA3E83 0066E80E FA46FF07 7400067E 83187400 1A843E83 .>...t..~..t..F•.Òf..>•..t..F•.Ò 000140
39E80E04 7500FA7E 830A7400 067E8302 C483FE7E E80E5629 75001A84 3E830070 p..>...u)V.Ò-±.é..-..t..-•.u..Ò9 000160
83FE85E8 0EF476FF F676FFF8 76FF0040 E80E0475 00FC7E83 0A74001B FA3E8300 ..>•..t..-•.u..ÒQ..v½.v-.v¶.Òç±. 000180
74001A76 3E83C8C9 5E02C483 FE38E80E 5600201B FC06C70E 74001A84 3E8306C4 é..>...t.ú.•. .V.Ò8±.é.^èù.>v..t 0001A0
1018FA3E 8302C483 FDC8E80E 306AC802 C483FD02 E80E5000 208803E8 00288805 .|+.Š.| .P.Ò@•.é.ùj0.Òà».é..>•.. 0001C0
56570000 06C8C802 C483FDAA E80E5000 788803E8 00588805 74001A72 3E831775 u..>r..t.|X.Š.|x.P.Ò¯».é.ùà...WV 0001E0
```

```
Dump of file SATURN:[PCCOMMON.DUMP.DLL]DAIMDF.TMP;1 on 18-APR-1990 10:41:20.28
File ID (570,8,0)   End of file block 71 / Allocated 72

Virtual block number 45 (0000002D), 512 (0200) bytes

 9060EB0A 46FF021A 86068337 88261A86 1EC41275 2A3F8026 0A5EC400 01FE46C7 úF±..ó^.&.?*u.ó...&.7......F.Ş'. 000000
 3F7C303C FA468807 8A260A5E 88F62B0A 46FFFFFF FE46C708 752D3F80 260A5EC4 ó^.&.?-u.úF±...F.+-.^.&...F*<0|? 000020
 8A261B7F 393D8026 06EBFB88 00301BFC 06C70675 303C0A75 1A8C3639 387F393C <9.;96..u.<0u.ú.=.0..«Ş.&.=9..&. 000040
 880C468C 0A7E890F 7D303D80 2647F188 30E983C8 03E1D1CE 0302E1C1 CE889805 ...ôêÄ..ôıÄ.à.Õ0.þG&.=0)Ô.-..F.. 000060
 46890104 88570000 04C8C8C9 5F5E0C56 880A4688 37892606 5EC4F088 EEF7FE46 F±%Ÿ.Þá^.&.7.F..V.^ èùà...W|...F 000080
 468CFC7E 89000188 F4750038 26117400 3D802647 01EBFC7E C4064E8A FE5E8CFC =.^±.N.ó-=$.G&.=.t.Ìð.u¶|...-•.F 0000A0
 3CACD833 99C03306 76C51E56 57EC8855 90C8C95F C02BFE46 8CFC7E89 9009EBFE ±Ş...-=.F±+ó èù.U.ŞWV.év.3à.3Ü¯< 0000C0
 88C88802 D1E3D11B 72302C1F 77393CAC 017528 3C 0474203C 50F77409 3CF87420  t«<.t%P<-t.<+u.¯<9w.,0r.1D1Ø.ù. 0000E0
 F700D283 D8F70775 93203C58 DCEB00D2 83080307 130903D2 D1E3D1D2 D1E3D1FA *1D1Ø1D1Ø.).ø.Ä.Ø.ŞÉX<-.u.¥Ä.Ø.¥ 000100
 0A681E01 0C681E17 46A3E086 580000FF FF9A5016 C48850EC 8855C85D 5F5E1FDA Õ.^_]ùW.ŞP.ó.P.....X.ÄÈF..h...h. 000120
 0C9A004F 0D889A50 CB5DE588 0001B809 D511DA9A 039EE800 21E80000 FFFF9A01 .......Ò!.Ò...Ò.(.|...|]ùP.|.O... 000140
 80264701 75003080 267FFFB9 010C068E FF330000 881E0112 16FF00FF 680D5C0E .\.h.......£..3.....¿..&.=.u.G&. 000160
 BF1FF788 071E061C EBE774AE F2C03308 74CA88A6 F3C888D1 8805168E 3174003D =.t1/...].ùø!.ôt.3à·ÜtÔŞ.....%.€ 000180
 9A5000FC B8EC8855 00C31FED EBAAC20A 0572412C AC9204E0 C00E7241 2CAC174D M.¯,Ar.óÄ.·¯,Ar..ô´ŞÚ.û.U.Ê|=.P. 0001A0
 56EC8855 CB5DE588 00C20E0C 9A5000FF 8805241E FF047400 05263E83 00610E0C ..ø..>&..t...$.|..P...ô..|]ùW.ŞV 0001C0
 88AEF2FF FFB9C033 970C7496 401074C2 38AD1992 8E065688 C08ED88E 01718857 W|q..Ä.ó.V./..Ù;ôt.ə.t..3ó¿..·0. 0001E0

Dump of file SATURN:[PCCOMMON.DUMP.DLL]DAIMDF.TMP;1 on 18-APR-1990 10:41:20.28
File ID (570,8,0)   End of file block 71 / Allocated 72

Virtual block number 46 (0000002E), 512 (0200) bytes

 33FA8892 1F74C008 0D060D0C 9A0676FF 57EC8855 0002CA50 E5885E5F 96EBEBF7 %ŞŞ._^.|]ô..U.ŞW.v..É.ø..ót...*3 000000
 CA5DE588 5F580000 FFFF9A50 1651521E 530002B8 C4885049 D1F7AEF2 FFFFB9C0 ó¿..¯Õ%||P.óÉ..S.RQ.P.....[_.|]ô 000020
 3C05E0D1 C103E0D1 C888F9F7 000CB999 05482004 4688195E 06FF0000 04C80002 ..à.....^..F.-H..¿..%!.àıÄ.ÈıÄ.< 000040
 74000808 57892606 47892604 5EC402C4 830E1613 959A0200 68FE5E8C FC468911 ..F=.^±h........ó.ó^.&.G.&.W..Ät 000060
 FE5688FC 4688040A 4F802604 5EC49021 E8020002 47C726FC 5EC4080A 4F802611 .&.O..ó^=&ùG...Ş!.ó^.&.O...F=.V± 000080
 07892608 57882606 47882604 5EC40001 0247C726 FC5EC408 57892606 47892640 ə&.G.&.W.ó^=&ùG...ó^.&.G.&.W.&.. 0000A0
 0454E9C0 330009BA 0872174B 1E38065E 88EC8855 C3C90000 0447C726 02578926 &.W.&ùG...èùW.&.^.;.K.r.¤..3óÕT. 0000C0
 91E175C0 855A5900 00FFFF9A 51160C76 FF0876FF 0A76FF53 CC8804EC 830460E9 Õ'..&..óS.v..v..v..Q.....YZ.óuÄ. 0000E0
 13E9C033 0009BA08 7217481E 3B065E8B 0CEC83EC 885500CB 5DE588FD 174DA780 .ÌM.».|]ù.U.&.&..^.;.K.r.¤..3óÕ. 000100
 7480174D 87F60000 0EF59A50 16F4468D 51414151 51C93353 12742017 4D87F604 .-.M. t.S3èQQAAQ.F¶.P.%...-.M..t 000120
 E30C4E8B F86689F2 88FA8856 57FCFC46 89FE4689 C0330856 C50A468E FA5E8C66 f.^ª.F.éV.3ó.F±.F==WV.ª.·.f½.N.D 000140
 3800740A 3CAC0C4E 880716FA 88D488E2 2800808A DC8802EC 833875AE F20AB049 Ì¯.·Ùu;.&..É¤..+ô.ó.ª...N.¯<.t.; 000160
 0014E8E2 EBFC46FF 0AB0AA00 1FE80375 FB380DB0 009AE900 28E8F4E2 AA1A74FB «t.´ó¶Ô+.Ô..¯.;«u.Ò..¯¯..F=ŞôÒ.. 000180
 1FE3CA2B CF881F06 1E515350 0E6D10C6 9AFFFCB8 7AE80093 E9FA5E8E 5F5EE1EB ŞÄ^_.^*Ô..Şz|=..6.m.PSQ....Ù+ôD. 0001A0
 1F0774D8 08FE5E01 F45E8811 75C00800 000E369A 5016F446 8D51521E 53065E88 .^.Ş.RQ.F¶.P.6....óu..^¶.^±.Üt.. 0001C0
 03E8001C 8A087500 098A0001 3D0D7400 60301874 C00808C4 831FC3FA 88585859 Y(X.*û..ó..ót.=m.t.*..¤..u.¤..Ş. 0001E0

Dump of file SATURN:[PCCOMMON.DUMP.DLL]DAIMDF.TMP;1 on 18-APR-1990 10:41:20.28
File ID (570,8,0)   End of file block 71 / Allocated 72

Virtual block number 47 (0000002F), 512 (0200) bytes

 1C8A0EE8 F803751A 3F80085E 880A5E8E 0E744017 4D87F6FE 5E8E26EB F900208A ¤ .*Ş&.^±-.M.ət..^..^..?.u.%Ş.¤. 000000
 0C4E8802 F7E9C85D E5880472 FA5E8E5F 5EF86688 FC462BFE 468806EB F9C03300 .3ó*Ş..F±+F=.f%^_.^*r..|]ùÕK..N. 000020
 74C0081F 071E0000 0FCD9A50 16F4468D 51521E53 0856C51E EEEBC188 0475C908 .èu..éŞŸ.éV.S.RQ¯F¶.P.ë.......ót 000040
 F68775C0 08F44688 C2EB0020 BAC7E800 1C8ACC75 0009BA00 01300074 00603D17 .=m.t.=..¤..uó¤..Şù¤ .Şô.F¶.óuñ- 000060
 E9008357 56EC8855 00A3E8C0 33001C8A A6E80275 1A3F8026 DA880A74 40174D87 .M.ət..Ö&.?.u.Ş|¤..3óŞÊ.U.óVW*.ô 000080
 3302E800 01880574 40174D87 F60C7C00 F883117D 17481E38 065E88EC 88550442 ß.U.&.^.;.K.)..«.|.-.M.ət.|..Ş.3 0000A0
 33057540 0542A1C8 5152E388 05720546 1E380872 D82B0C88 5A5900CB 5DE588C0 &.|]ù.YZ.É+Är.;.F.r..DRQùÄß.əu.3 0000C0
 FFFF9A52 16501653 C4885087 174DA780 D4885200 02880542 2EFF5152 FC74E9C0 óÖt=RQ..B.£..R.ó.ÌM.ñP.óS.P.R... 0000E0
 780E885A D4794817 408F0808 81067500 02300774 00013040 81127558 C0080000 ...óXu.Ÿə=..t.=..u.Ÿ...M.KyóZ..x 000100
 761EFF00 0388C28C 197E06C4 01AEE903 7319761E FF0833C2 8C197A06 C41EE319 .D.ó.z..ô3Ü..v.ø.ÕÖ.ó.-..ôÉ....v 000120
 67680E01 6A087419 86301982 880073E8 1982BF19 828E007C E81982BF 1982BE19 ./..€..Ò|./..€..Òs.|..=..t.j..hg 000140
 00001162 9A006A00 6A036A00 51E81986 BF1982BE D88E0DE2 88C30000 FFFF9A11 ......Ò|ó..Ä/..€..ÒQ.j.j.j..b... 000160
 19868F19 868EEC88 5503E800 31E81986 BF1982BE 003AE818 FEBF18FE BEEC8855 U.ó/±.€±.Ò:./..€..Ò1.Ş.U.ó/..€.. 000180
 02B807E3 19780E88 0000FFFF 9A500646 8A50C033 001AE819 868F1986 BE0023E8 ÒØ./..€..Ò..3óP.F.P.......x.D.£. 0001A0
 56570000 14C800C3 EEEB10FF F2740245 08058804 EF830E73 F73BC319 761EFF00 ...v.û;%ø..ÿ....E.t·..ŞŸû.à...WV 0001C0
 6AF85689 F64689F2 5689F046 89C02801 0C168800 F0E90375 010C3639 FF2BF62B +-+.96..u.Õþ.....+ó.Fþ.V·.F-.V½j 0001E0
```

```
Dump of file SATURN:[PCCOMMON.DUMP.DLL]DAIMDF.TMP;1 on 18-APR-1990 10:41:20.28
File ID (570,8,0)   End of file block 71 / Allocated 72

Virtual block number 48 (00000030), 512 (0200) bytes

 8CE90376 7FFFFE81 461974C0 080AC483 124E14A8 9A051668 1EF676FF F876FF0C ..v½.v¬.h...´.N..á..ât.F.±..v.Õ¥ 000000
 26F65E88 F475003F 8026F646 FFF65EC4 0CEB47EA 75003F80 26F646FF F65EC400 .á^¬.F¬&.?.uöGS.á^¬.F¬&.?.u¶.^¬& 000020
 83129313 959A56EE 5689EC46 8904C483 12501450 9A046A50 014580BA 75003F80 .?.uo.E.Pj..P.]..á..F&.VŸV...... 000040
 1953A3EE 5688EC46 886674C2 08FC4688 6D74EE46 08EC4688 FE5689FC 468902C4 á..F=.V±.F&.FŸtm.F=.ötf.F&.VŸES. 000060
 88EC5EC4 2C74C008 0AC4830F 8214A89A 0516681E F076FFF2 76FF0C6A 19551689 ..U.j..v·.vÞ.h...´.ý..á..ât,á^$. 000080
 26FC46FF FC5EC407 8A26F046 FFF05EC4 04EC4683 02578926 078926FE 5688FC46 F=.V±&..&.W..F$.á^Þ.FÞ&..á^=.F=& 0000A0
 C95F5EA7 75003F80 26F05EC4 F475003F 8026F046 FFF05EC4 E8EB0E74 C00A0788 ...ât.Šöá^Þ.FÞ&.?.u¶á^Þ&.?.uÏ^_è 0000C0
 160C0808 070A0C09 0C080C07 09060005 18040203 02021601 FA70E900 028890C8 ù.¡..Õp*........................ 0000E0
 09721C70 2060006C 08590057 00530052 02430041 02350212 12110010 120F1600 ..........S.A.C.R.S.W.Y.l.m p.r. 000100
 8899FFFF 88174216 891749A3 16080000 08D702CE 08A40084 09820A81 0A801606 ..........Ê.ö.m.....ÈI...B.¡.... 000120
 1674073A 2E1B75E4 0A0024B9 12E88817 49A3C850 E58899FF FF880008 E8CB5DE5 Ì]ùÒ..¡....Ì]ùÈI.£Ò.¿$..ðu..:.t. 000140
 00C31742 A3980147 8A2E4301 76CA3C04 72BC3C43 0A76243C 0472133C F7E24343 CCã%<.r.<$v.C<¥r.<òv.C..G..ÈB.û. 000160
 06468857 5602EC83 EC8855C8 5DE58801 FE4F8026 0574C308 C08C065E C4EC8855 U.$á^..â.ût.&.O±..Ì]ùU.$.$.VW.F. 000180
 78E80574 0018E815 750082E8 196AA312 740025E8 08750019 6A3E831E 73FFF130 =þ.s..>j..u.Ò%.t.Èj.Ò..u.Ò..t.Òx 0001A0
 43065E88 0776065E 3900F088 CB5DE588 5E5F02C4 83120E15 9A9A0676 FF0B7500 .u..v.......á._^.Ì]ùEÞ.9^.v..^.C 0001C0
 883874FF FA8308C4 8313C917 469A5002 80510E4F 8D50501E C033FE5E 89FEE383 .D±.^±3á.PP.O.Q¯.P.F.è..á..*.t8. 0001E0

Dump of file SATURN:[PCCOMMON.DUMP.DLL]DAIMDF.TMP;1 on 18-APR-1990 10:41:20.28
File ID (570,8,0)   End of file block 71 / Allocated 72

Virtual block number 49 (00000031), 512 (0200) bytes

 0C478948 480008A3 C033088E FE5E8800 08A30A8E 05740208 196EA319 6C1687C2 ô..(.Èn..@t..ÒÈ...^±.Ã3áÈ..HH.G. 000000
 064E88C0 8ED88CC3 1FD88C00 06A30000 05000AA3 01478D00 02A30000 A3000A88 ¡..È..È...G.È.....È...Ã.û.Ã.â.N. 000020
 9A0676FF 006A0876 FF006A56 00000AC8 C3098EC1 8CD20801 9AE8196E 1E8EDB33 3Ù..n.Ò...@.ê.Ìùà...Vj..v.j..v.. 000040
 83149613 959A56F8 7688902F EB99C02B 0674FFFF C2F7FA56 89F84689 147D1844 D.)..F½.V*%ô..t.+â.Š/..v½V...... 000060
 46889007 EB08C483 13F517FC 9A50FE76 FF006A56 1274D008 FE5689FC 468902C4 á..F=.V±.Ât.Vj..v±P.=.%..á.Š...F 000080
 D9F7AEF2 C033F788 067EC4D9 8827E30E 4E881E56 57EC8855 90CBC95E FE5688FC =.V±^èù.U.$WV..N.D'.1á¬..%3á·Ù%) 0000A0
 885F5E1F C188D1F7 49490474 0477FF45 3A26C933 FF448AA6 F30A76C5 FE88CB03 .ù.±év.µl.D.3è&:E.w.t.II%1.ê.^_. 0000C0
 080E750A F9831374 C00A93FC 071E570A 7EC51E08 56880646 880E4E88 00CB5DE5 Ì]ù..N..F..V..é¬.W..=..ât..*.u.. 0000E0
 3004D387 92F1F793 F1F70274 C0080233 92F788DA F7000283 08F7AA2D 800A7902 @y.¯·¯%Ù.@.%Ò.%.3@.ât.%Þ.%Þ..Æ.0 000100
 580A8CF2 72C73801 448DFF44 880586AC 4F0588E2 75C308C2 88AA2704 0276393C <9v..'¯.ô.ùuã..O¯...D..D.;ùr·.ÖX 000120
 47F626FA 5EC41CE8 F628FC5E 8CFA4689 05488856 000006C8 00CB5DE5 885E5F1F ._^.Ì]ù.à...V¡H..F*.^=+¬Š.á^*&¬G 000140
 FA463917 38168817 36A10CFA 46834601 744004C4 83146218 789A5306 0E74830A ..t..S.x.b..á.ət.F.F*.Àá...8.9F* 000160
 885756EC 8855C85D E58801FE 4F800474 D808065E 88EC8855 90CBC95E C688D876 vÃ.á^èù.U.$.^..Ût..O±..Ì]ùU.$VWE 000180
 961962A3 1960A3FE 244024E8 99C03305 750176E8 00058807 1E297500 3F831960 '..?.u)..¡..Òv.u.3á.Š$ə$±È'.Èb.. 0001A0
 CB5DE588 5E5F0009 E8C08ED8 8C064E88 19663689 FFFEFE44 C704C683 000104C7 ú....á.ûD±±..áf..N..Ã.áÒ.._^.Ì]ù 0001C0
 D0881573 C1384843 7401A8FE 88ADFC02 7788F273 EEF983FE E180FA74 410000E9 ÒÀ.At*.Ã±.*Y±·.w.=Ù.±´.tCH;ès..À 0001E0

Dump of file SATURN:[PCCOMMON.DUMP.DLL]DAIMDF.TMP;1 on 18-APR-1990 10:41:20.28
File ID (570,8,0)   End of file block 71 / Allocated 72

Virtual block number 50 (00000032), 512 (0200) bytes

 8948C128 FE4C89F9 030C74FE 88E6E8FE 4489F788 000205C2 03357401 A8ADF003 .ÞÙ´.t5.ô....%.D±Š].±t..*.L±+èH. 000000
 7206C626 C3027F89 196E1E8C 260574D1 38116889 DA8CC688 FE4CFEF9 0305EB05 .Š..*±L±.ó.Ò¿h.;It.&..n....ù&ó.r 000020
 E27401A8 ADF00300 888C73C1 3848FE88 F27401A8 ADF003FE 882574FF FE300219 ..=±.t%.±.ÞÙ´.t·.±H;ès¥.Ã.ÞÙ´.tã 000040
 D88C1274 19720EFE 2615E808 8E0474C0 08084788 E6E8FE44 89F78800 0205C203 .ô....%.D±Š].G..ât..ÃŠ.&±.r.t..Ã 000060
 40400124 0074C638 006BE8C0 33067788 88E83788 196A1E8E 260574C7 38162D8F €¬.;út.&..j..7Š£.w.3áÒk.;ót ´.əə 000080
 196EA326 0474C138 16818908 8C98E84E 4E960574 001DE8FE 40FE0074 005FE898 .Ò_.t.±M±Ò..t..NNŠ..Ã¿..;èt.¬`¬. 0000A0
 04761970 1638267F FF8A4141 49C82803 7401A8FE 45885 1C3 99C03302 47890788 ...G.3á.ûQ.E±´.t.+àIAAo..&;.p.v. 0000C0
 33E575EA D1D2F708 75000CE8 C628C223 D2F70072 C2031572 C603C188 F575EAD1 1õuÃ.ê.ór..ór.%@¥ô+óÒ..u.%@1ôu[3 0000E0
 55894AD7 28D68806 7789FFFE FE44C7F2 03F088FE 88571874 001DE851 52C359C0 ãYùRQÒ..t.W.±.Þ.·ùD±±..w..ø+@J.U 000100
 5A1FFFFA 8308C483 15691746 9A1F0650 00018850 52521ED2 335053C3 5A5958FE ±XYZùSP3@.RRP¡..P...F.Ì..á..*..Z 000120
 57E80775 48064688 08568801 148F3875 000A7E83 065756EC 8855C302 0802745B [t..@ùU.$VW..¬..uß¢...V..F.Hu.ÒW 000140
 04C68334 735E003E E8560E46 89024488 0074F738 11744805 1436884C E8277200 .r'ŠL.6..Ht.;%t..D..F.VÒ>.^s4.6. 000160
 F9580000 FFFF9A50 C0335016 52C48850 21E899FF FF880675 D2080473 0514FE81 .±..s..@u.¡...ŠIP.áR.P3áP.....[* 000180
 024C39F7 880E4E88 CB5DE588 5E5F07C0 33038805 14368902 5C891489 E675C085 .Àu]...\..ó...Æ3á._^.Ì]ù.N..%9L. 0001A0
 010E1E39 0675F738 C18ED388 26721C03 DA882CE8 F9F27505 14FE8104 C6830C74 t..ó..±..u·*Š,.Ö..¬&.Æ.ê;%u.9... 0001C0
 88EC8855 00C3D188 04879201 0E168904 75F7380E 75C08500 00FFFF9A 51531373 s.SQ......âuß;%u.........1ù.U.$. 0001E0
```

```
Dump of file SATURN:[PCCOMMON.DUMP.DLL]DAIMDF.TMP;1 on 18-APR-1990 10:41:20.28
File ID (570,8,0)   End of file block 71 / Allocated 72

Virtual block number 51 (00000033), 512 (0200) bytes

 D1E08A0A 4688D128 D187D103 D3230B1B D1280C74 DAF7D788 067EC457 38E30C4E N.D8Wá-..mKÖt.+1.ÜWÆ.1.1+1.F..Âl 000000
 88064688 5FAAF3C9 13A8F3E9 D1C38EFF FFC381C3 8C10E301 87AAF3C9 13A8F3E9 Õµ¨.èµ¯.1D..û.û...ûlÕµ¨.èµ¯ .F.. 000020
 F70008CA 50E588E3 F7064688 08750A5E 88D8080C 5E880846 88EC8855 CB5D0856 V.]üU.$.F..^..Ã.^.u..F.%D.[]ò..¥ 000040
 C4F62856 000004C8 0008CA50 E588D103 E3F70646 88C8030C 66F70646 88C888E3 D.à.F.%f..à.F.%D.1.[}ò..à...V+-á 000060
 D868F9F7 000CB999 05482DC3 88157508 0A47F626 5575023C 03240A47 8A26065E ^.&.G.$.<.uU&-G..u..û-H..¿..¥*kÄ 000080
 FF260877 FF265028 7EC008FC 46890647 28260788 26065E88 39740111 3C87F606 .-.<..t9.^.&..&+G..F=.à-(P&.w.&. 0000A0
 FFBE200A 4F802606 5EC40874 FC463B08 C4831736 0F0A9A50 E42A0847 8A260677 w.&.G.*ÕP...6..á.;F•t.á^.&.O. ƒ. 0000C0
 000CCBC9 5EC68800 000447C7 26025789 26078926 08578826 06478826 065EC4FF .á^.&.G.&.W.&..&.W.&úG....6^èù.. 0000E0
 00000006 16860002 00070002 117C0103 00050002 11840103 00000004 18CC0002 ..ä.......Ç.......|.......Ñ..... 000100
 00880002 182F0105 0478000A 10560203 00260002 17E50103 00220002 179A0103 ......"...Ì...&...V...x.../..... 000120
 005C0002 002F0103 00580002 00420103 00400002 10FE0103 003A0002 0F360103 ..6...:...±...M...B...[.../...\. 000140
 6F43202D 20797261 7262694C 20656069 54206E75 5220534D 00000000 00000000 ........MS Run-Time Library - Co 000160
 70726F43 2074666F 736F7263 6940202C 38383931 20296328 20746867 69727970 pyright (c) 1988, Microsoft Corp 000180
 012F0000 00CE004B 00000000 00000000 0000012E 0120012C 00740071 00480011 ..K.q.t.,.-.............K.ö.Å./. 0001A0
 00000000 00000134 01330132 00D50003 00800000 00000000 00000000 01310130 0.1..............Æ.1.2.3.4....... 0001C0
 000F0000 00800000 00000000 00000000 01370136 0135000A 00080080 00000000 ......Ä.Ö.5.6.7.............Ì.Ô. 0001E0

Dump of file SATURN:[PCCOMMON.DUMP.DLL]DAIMDF.TMP;1 on 18-APR-1990 10:41:20.28
File ID (570,8,0)   End of file block 71 / Allocated 72

Virtual block number 52 (00000034), 512 (0200) bytes

 00000000 00ED00EC 00EB00EA 00E80048 00000000 00000000 0000013A 01390138 8.9.:...........K.Ò.ð.Š.ß.Ú..... 000000
 00000093 00920091 0090008E 00480000 FFFF0004 00060028 00080000 00000000 ........+.........K............. 000020
 756E2800 296C6C75 6E280000 00000000 00000000 00000000 00000000 00000000 ......................(null).(nu 000040
 00000000 00000000 19881C00 11971C00 1C000000 00000000 23202028 00296C6C ll).+- #........................ 000060
 00000000 00000000 00000000 00000000 00000000 00000000 00000000 00000000 ................................ 000080
 00000000 00000000 00000000 00000000 00000000 00000000 00000000 00000000 ................................ 0000A0
 00000000 00000000 00000000 00000000 00000000 00000000 00000000 00000000 ................................ 0000C0
 00000000 00000000 00000000 00000000 00000000 00000000 00000000 00000000 ................................ 0000E0
 00000000 00000000 00000000 00000000 00000000 00000000 00000000 00000000 ................................ 000100
 00000000 00000000 00000000 00000000 00000000 00000000 00000000 00000000 ................................ 000120
 00000000 00000000 00000000 00000000 00000000 00000000 00000000 00000000 ................................ 000140
 00000000 00000000 00000000 00000000 00000000 00000000 00000000 00000000 ................................ 000160
 00000000 00000000 00000000 00000000 00000000 00000000 00000000 00000000 ................................ 000180
 00000000 00000000 00000000 00000000 00000000 00000000 00000000 00000000 ................................ 0001A0
 00000000 00000000 00000000 00000000 00000000 00000000 00000000 00000000 ................................ 0001C0
 00000000 00000000 00000000 00000000 00000000 00000000 00000000 00000000 ................................ 0001E0

Dump of file SATURN:[PCCOMMON.DUMP.DLL]DAIMDF.TMP;1 on 18-APR-1990 10:41:20.28
File ID (570,8,0)   End of file block 71 / Allocated 72

Virtual block number 53 (00000035), 512 (0200) bytes

 00000000 00000000 00000000 00000000 00000000 00000000 00000000 00000000 ................................ 000000
 00000000 00000000 00000000 00000000 00000000 00000000 00000000 00000000 ................................ 000020
 00000000 00000000 00000000 00000000 00000000 00000000 00000000 00000000 ................................ 000040
 00000000 00000000 00000000 00000000 00000000 00000000 00000000 00000000 ................................ 000060
 00000000 00000000 00000000 00000000 00000000 00000000 00000000 00000000 ................................ 000080
 00000000 00000000 00000000 00000000 00000000 00000000 00000000 00000000 ................................ 0000A0
 00000000 00000000 00000000 00000000 00000000 00000000 00000000 00000000 ................................ 0000C0
 00000000 00000000 00000000 00000000 00000000 00000000 00000000 00000000 ................................ 0000E0
 00000000 00000000 00000000 00000000 00000000 00000000 00000000 00000000 ................................ 000100
 00000000 00000000 00000000 00000000 00000000 00000000 00000000 00000000 ................................ 000120
 00000000 00000000 00000000 00000000 00000000 00000000 00000000 00000000 ................................ 000140
 00000000 00000000 00000000 00000000 00000000 00000000 00000000 00000000 ................................ 000160
 00000000 00000000 00000000 00000000 00000000 00000000 00000000 00000000 ................................ 000180
 00000000 00000000 00000000 00000000 00000000 00000000 00000000 00000000 ................................ 0001A0
 00000000 00000000 00000000 00000000 00000000 00000000 00000000 00000000 ................................ 0001C0
 00000000 00000000 00000000 00000000 00000000 00000000 00000000 00000000 ................................ 0001E0
```

```
Dump of file SATURN:[PCCOMMON.DUMP.DLL]DAIMDF.TMP;1 on 18-APR-1990 10:41:20.28
File ID (570,8,0)    End of file block 71 / Allocated 72

Virtual block number 54 (00000036), 512 (0200) bytes

00000000 00000000 00000000 00000000 00000000 00000000 00000000 00000000 ................................ 000000
00000000 00000000 00000000 00000000 00000000 00000000 00000000 00000000 ................................ 000020
00000000 00000000 00000000 00000000 00000000 00000000 00000000 00000000 ................................ 000040
4E495F45 4C49465F 435F0114 00000000 00000000 00000000 00000000 00000000 .......................C_FILE_IN 000060
00000000 053612E2 053212E2 052E12E2 052A12E2 FFFF12E2 00000000 003D4F46 FO=.....ã...ã.*.ã...ã.Z.ã.6..... 000080
01020000 00000000 00000000 00011986 00000000 05500000 0200FFFF FFFF0101 ..........P..................... 0000A0
00000000 00000000 00000000 00000000 00000000 02020000 00000000 00000000 ................................ 0000C0
00000000 00000000 00000000 00000000 00000000 00000000 00000000 00000000 ................................ 0000E0
00000000 00000000 00000000 00000000 00000000 00000000 00000000 00000000 ................................ 000100
00000000 00000000 00000000 00000000 00000000 00000000 00000000 00000000 ................................ 000120
00000000 00000000 00000000 00000000 00000000 00000000 00000000 00000000 ................................ 000140
00000000 00000000 00000000 00000000 00000000 00000000 00000000 00000000 ................................ 000160
00000000 00000000 00000000 00000000 00000000 00000000 00000000 00000000 ................................ 000180
00000000 00000000 00000000 00000000 00000000 00000000 00000000 00000000 ................................ 0001A0
00000000 00000000 00000000 00000000 00000000 00000000 00000000 00000000 ................................ 0001C0
00000000 00000000 00000000 00000000 00000000 00000000 00000000 00000000 ................................ 0001E0
```

```
Dump of file SATURN:[PCCOMMON.DUMP.DLL]DAIMDF.TMP;1 on 18-APR-1990 10:41:20.28
File ID (570,8,0)    End of file block 71 / Allocated 72

Virtual block number 55 (00000037), 512 (0200) bytes

00000000 00000000 00000000 00000000 00000000 00000000 00000000 00000000 ................................ 000000
00000000 00000000 00000000 00000000 00000000 00000000 00000000 00000000 ................................ 000020
00000000 00000000 00000000 00000000 00000000 00000000 00000000 00000000 ................................ 000040
00000000 00000000 00000000 00000000 00000000 00000000 00000000 00000000 ................................ 000060
00000000 00000000 00000000 00000000 00000000 00000000 00000000 00000000 ................................ 000080
00000000 00000000 00000000 00000000 00000000 00000000 00000000 00000000 ................................ 0000A0
00000000 00000000 00000000 00000000 00000000 00000000 00000000 00000000 ................................ 0000C0
00000000 00000000 00000000 00000000 00000000 00000000 00000000 00000000 ................................ 0000E0
00000000 00000000 00000000 00000000 00000000 00000000 00000000 00000000 ................................ 000100
00000000 00000000 00000000 00000000 00000000 00000000 00000000 00000000 ................................ 000120
00000000 00000000 00000000 00000000 00000000 00000000 00000000 00000000 ................................ 000140
00000000 00000000 00000000 00000000 00000000 00000000 00000000 00000000 ................................ 000160
00000000 00000000 00000000 00000000 00000000 00000000 00000000 00000000 ................................ 000180
00000000 00000000 00000000 00000000 00000000 00000000 00000000 00000000 ................................ 0001A0
00000000 00000000 00000000 00000000 00000000 00000000 00000000 00000000 ................................ 0001C0
00000000 00000000 00000000 00000000 00000000 00000000 00000000 00000000 ................................ 0001E0
```

```
Dump of file SATURN:[PCCOMMON.DUMP.DLL]DAIMDF.TMP;1 on 18-APR-1990 10:41:20.28
File ID (570,8,0)    End of file block 71 / Allocated 72

Virtual block number 56 (00000038), 512 (0200) bytes

00000000 00000000 00000000 00000000 00000000 00000000 00000000 00000000 ................................ 000000
00000000 00000000 00000000 00000000 00000000 00000000 00000000 00000000 ................................ 000020
00000000 00000000 00000000 00000000 00000000 00000000 00000000 00000000 ................................ 000040
00000000 00000000 00000000 00000000 00000000 00000000 00000000 00000000 ................................ 000060
00000000 00000000 00000000 00000000 00000000 00000000 00000000 00000000 ................................ 000080
00000000 00000000 00000000 00000000 00000000 00000000 00000000 00000000 ................................ 0000A0
00000000 00000000 00000000 00000000 00000000 00000000 00000000 00000000 ................................ 0000C0
00000000 00000000 00000000 00000000 00000000 00000000 00000000 00000000 ................................ 0000E0
00000000 00000000 00000000 00000000 00000000 00000000 00000000 00000000 ................................ 000100
00000000 00000000 00000000 00000000 00000000 00000000 00000000 00000000 ................................ 000120
00000000 00000000 00000000 00000000 00000000 00000000 00000000 00000000 ................................ 000140
00000000 00000000 00000000 00000000 00000000 00000000 00000000 00000000 ................................ 000160
00000000 00000000 00000000 00000000 00000000 00000000 00000000 00000000 ................................ 000180
00000000 00000000 00000000 00000000 00000000 00000000 00000000 00000000 ................................ 0001A0
00000000 00000000 00000000 00000000 00000000 00000000 00000000 00000000 ................................ 0001C0
00000000 00000000 00000000 00000000 00000000 00000000 00000000 00000000 ................................ 0001E0
```

```
Dump of file SATURN:[PCCOMMON.DUMP.DLL]DAIMDF.TMP;1 on 18-APR-1990 10:41:20.28
File ID (570,8,0)   End of file block 71 / Allocated 72

Virtual block number 57 (00000039), 512 (0200) bytes

 00000000 00000000 00000000 00000000 00000000 00000000 00000000 00000000 ................................ 000000
 00000000 00000000 00000000 00000000 00000000 00000000 00000000 00000000 ................................ 000020
 00000000 00000000 00000000 00000000 00000000 00000000 00000000 00000000 ................................ 000040
 00000000 00000000 00000000 00000000 00000000 00000000 00000000 00000000 ................................ 000060
 00000000 00000000 00000000 00000000 00000000 00000000 00000000 00000000 ................................ 000080
 00000000 00000000 00000000 00000000 00000000 00000000 00000000 00000000 ................................ 0000A0
 00000000 00000000 00000000 00000000 00000000 00000000 00000000 00000000 ................................ 0000C0
 00000000 00000000 00000000 00000000 00000000 00000000 00000000 00000000 ................................ 0000E0
 00000000 00000000 00000000 00000000 00000000 00000000 00000000 00000000 ................................ 000100
 00000000 00000000 00000000 00000000 00000000 00000000 00000000 00000000 ................................ 000120
 00000000 00000000 00000000 00000000 00000000 00000000 00000000 00000000 ................................ 000140
 00000000 00000000 00000000 00000000 00000000 00000000 00000000 00000000 ................................ 000160
 00000000 00000000 00000000 00000000 00000000 00000000 00000000 00000000 ................................ 000180
 00000000 00000000 00000000 00000000 00000000 00000000 00000000 00000000 ................................ 0001A0
 00000000 00000000 00000000 00000000 00000000 00000000 00000000 00000000 ................................ 0001C0
 00000000 00000000 00000000 00000000 00000000 00000000 00000000 00000000 ................................ 0001E0

Dump of file SATURN:[PCCOMMON.DUMP.DLL]DAIMDF.TMP;1 on 18-APR-1990 10:41:20.28
File ID (570,8,0)   End of file block 71 / Allocated 72

Virtual block number 58 (0000003A), 512 (0200) bytes

 00000000 00000000 00000000 00000000 00000000 00000000 00000000 00000000 ................................ 000000
 00000000 00000000 00000000 00000000 00000000 00000000 00000000 00000000 ................................ 000020
 00000000 00000000 00000000 00000000 00000000 00000000 00000000 00000000 ................................ 000040
 00000000 00000000 00000000 00000000 00000000 00000000 00000000 00000000 ................................ 000060
 00000000 00000000 00000000 00000000 00000000 00000000 00000000 00000000 ................................ 000080
 00000000 00000000 00000000 00000000 00000000 00000000 00000000 00000000 ................................ 0000A0
 00000000 00000000 00000000 00000000 00000000 00000000 00000000 00000000 ................................ 0000C0
 00000000 00000000 00000000 00000000 00000000 00000000 00000000 00000000 ................................ 0000E0
 00000000 00000000 00000000 00000000 00000000 00000000 00000000 00000000 ................................ 000100
 00000000 00000000 00000000 00000000 00000000 00000000 00000000 00000000 ................................ 000120
 00000000 00000000 00000000 00000000 00000000 00000000 00000000 00000000 ................................ 000140
 00000000 00000000 00000000 00000000 00000000 00000000 00000000 00000000 ................................ 000160
 00000000 00000000 00000000 00000000 00000000 00000000 00000000 00000000 ................................ 000180
 00000000 00000000 00000000 00000000 00000000 00000000 00000000 00000000 ................................ 0001A0
 00000000 00000000 00000000 00000000 00000000 00000000 00000000 00000000 ................................ 0001C0
 00000000 00000000 00000000 00000000 00000000 00000000 00000000 00000000 ................................ 0001E0

Dump of file SATURN:[PCCOMMON.DUMP.DLL]DAIMDF.TMP;1 on 18-APR-1990 10:41:20.28
File ID (570,8,0)   End of file block 71 / Allocated 72

Virtual block number 59 (0000003B), 512 (0200) bytes

 00000000 00000000 00000000 00000000 00000000 00000000 00000000 00000000 ................................ 000000
 00000000 00000000 00000000 00000000 00000000 00000000 00000000 00000000 ................................ 000020
 00000000 00000000 00000000 00000000 00000000 00000000 00000000 00000000 ................................ 000040
 00000000 00000000 00000000 00000000 00000000 00000000 00000000 00000000 ................................ 000060
 00000000 00000000 00000000 00000000 00000000 00000000 00000000 00000000 ................................ 000080
 00000000 00000000 00000000 00000000 00000000 00000000 00000000 00000000 ................................ 0000A0
 00000000 00000000 00000000 00000000 00000000 00000000 00000000 00000000 ................................ 0000C0
 00000000 00000000 00000000 00000000 00000000 00000000 00000000 00000000 ................................ 0000E0
 00000000 00000000 00000000 00000000 00000000 00000000 00000000 00000000 ................................ 000100
 00000000 00000000 00000000 00000000 00000000 00000000 00000000 00000000 ................................ 000120
 00000000 00000000 00000000 00000000 00000000 00000000 00000000 00000000 ................................ 000140
 00000000 00000000 00000000 00000000 00000000 00000000 00000000 00000000 ................................ 000160
 00000000 00000000 00000000 00000000 00000000 00000000 00000000 00000000 ................................ 000180
 00000000 00000000 00000000 00000000 00000000 00000000 00000000 00000000 ................................ 0001A0
 00000000 00000000 00000000 00000000 00000000 00000000 00000000 00000000 ................................ 0001C0
 00000000 00000000 00000000 00000000 00000000 00000000 00000000 00000000 ................................ 0001E0
```

```
Dump of file SATURN:[PCCOMMON.DUMP.DLL]DAIMDF.TMP;1 on 18-APR-1990 10:41:20.28
File ID (570,8,0)   End of file block 71 / Allocated 72

Virtual block number 60 (0000003C), 512 (0200) bytes

00000000 00000000 00000000 00000000 00000000 00000000 00000000 00000000 ................................ 000000
00000000 00000000 00000000 00000000 00000000 00000000 00000000 00000000 ................................ 000020
00000000 00000000 00000000 00000000 00000000 00000000 00000000 00000000 ................................ 000040
00000000 00000000 00000000 00000000 00000000 00000000 00000000 00000000 ................................ 000060
02000001 00000000 00000000 00000000 00000000 00000000 00000000 00000000 ................................ 000080
00000000 00000000 00000000 00000000 00000000 00000000 00000000 00000000 ................................ 0000A0
00000000 00000000 00000000 00000000 00000000 00000000 00000000 00000000 ................................ 0000C0
00000000 00000000 00000000 00000000 00000000 00000000 00000000 00000000 ................................ 0000E0
00000000 00000000 00000000 00000000 00000000 00000000 00000000 00000000 ................................ 000100
00000000 00000000 00000000 00000000 00000000 00000000 00000000 00000000 ................................ 000120
00000000 00000000 00000000 00000000 00000000 00000000 00000000 00000000 ................................ 000140
00000000 00000000 00000000 00000000 00000000 00000000 00000000 00000000 ................................ 000160
00000000 00000000 00000000 00000000 00000000 00000000 00000000 00000000 ................................ 000180
00000000 00000000 00000000 00000000 00000000 00000000 00000000 00000000 ................................ 0001A0
00000000 00000000 00000000 00000000 00000000 00000000 00000000 00000000 ................................ 0001C0
00000000 00000000 00000000 00000000 00000000 00000000 00000000 00000000 ................................ 0001E0

Dump of file SATURN:[PCCOMMON.DUMP.DLL]DAIMDF.TMP;1 on 18-APR-1990 10:41:20.28
File ID (570,8,0)   End of file block 71 / Allocated 72

Virtual block number 61 (0000003D), 512 (0200) bytes

00000000 00000000 00000000 00000000 00000000 00000000 00000000 00000000 ................................ 000000
00000000 00000000 00000000 00000000 00000000 00000000 00000000 00000000 ................................ 000020
00000000 00000000 00000000 00000000 00000000 00000000 00000000 00000000 ................................ 000040
00000000 00000000 00000000 00000000 00000000 00000000 00000000 00000000 ................................ 000060
00000000 00000000 00000000 00000000 00000000 00000000 00000000 00000000 ................................ 000080
00000000 00000000 00000000 00000000 00000000 00000000 00000000 00000000 ................................ 0000A0
00000000 00000000 00000000 00000000 00000000 00000000 00000000 00000000 ................................ 0000C0
00000000 00000000 00000000 00000000 00000000 00000000 00000000 00000000 ................................ 0000E0
00000000 00000000 00000000 00000000 00000000 00000000 00000000 00000000 ................................ 000100
00000000 00000000 00000000 00000000 00000000 00000000 00000000 00000000 ................................ 000120
00000000 00000000 00000000 00000000 00000000 00000000 00000000 00000000 ................................ 000140
00000000 00000000 00000000 00000000 00000000 00000000 00000000 00000000 ................................ 000160
00000000 00000000 00000000 00000000 00000000 00000000 00000000 00000000 ................................ 000180
00000000 00000000 00000000 00000000 00000000 00000000 00000000 00000000 ................................ 0001A0
00000000 00000000 00000000 00000000 00000000 00000000 00000000 00000000 ................................ 0001C0
00000000 00000000 00000000 00000000 00000000 00000000 00000000 00000000 ................................ 0001E0

Dump of file SATURN:[PCCOMMON.DUMP.DLL]DAIMDF.TMP;1 on 18-APR-1990 10:41:20.28
File ID (570,8,0)   End of file block 71 / Allocated 72

Virtual block number 62 (0000003E), 512 (0200) bytes

00000000 00000000 00000000 00000000 00000000 00000000 00000000 00000000 ................................ 000000
00000000 00000000 00000000 00000000 00000000 00000000 00000000 00000000 ................................ 000020
00000000 00000000 00000000 00000000 00000000 00000000 00000000 00000000 ................................ 000040
00000000 00000000 00000000 00000000 00000000 00000000 00000000 00000000 ................................ 000060
00000000 00000000 00000000 00000000 00000000 00000000 00000000 00000000 ................................ 000080
00000000 00000000 00000000 00000000 00000000 00000000 00000000 00000000 ................................ 0000A0
00000000 00000000 00000000 00000000 00000000 00000000 00000000 00000000 ................................ 0000C0
00000000 00000000 00000000 00000000 00000000 00000000 00000000 00000000 ................................ 0000E0
00000000 00000000 00000000 00000000 00000000 00000000 00000000 00000000 ................................ 000100
00000000 00000000 00000000 00000000 00000000 00000000 00000000 00000000 ................................ 000120
00000000 00000000 00000000 00000000 00000000 00000000 00000000 00000000 ................................ 000140
00000000 00000000 00000000 00000000 00000000 00000000 00000000 00000000 ................................ 000160
00000000 00000000 00000000 00000000 00000000 00000000 00000000 00000000 ................................ 000180
00000000 00000000 00000000 00000000 00000000 00000000 00000000 00000000 ................................ 0001A0
00000000 00000000 00000000 00000000 00000000 00000000 00000000 00000000 ................................ 0001C0
00000000 00000000 00000000 00000000 00000000 00000000 00000000 00000000 ................................ 0001E0
```

```
Dump of file SATURN:[PCCOMMON.DUMP.DLL]DAIMDF.TMP;1 on 18-APR-1990 10:41:20.28
File ID (570,8,0)   End of file block 71 / Allocated 72

Virtual block number 63 (0000003F), 512 (0200) bytes

 00000000 00000000 00000000 00000000 00000000 00000000 00000000 00000000 ................................ 000000
 00000000 00000000 00000000 00000000 00000000 00000000 00000000 00000000 ................................ 000020
 00000000 00000000 00000000 00000000 00000000 00000000 00000000 00000000 ................................ 000040
 00000000 00000000 00000000 00000000 00000000 00000000 00000000 00000000 ................................ 000060
 00000000 00000116 11300000 00000000 00000000 00000000 00000000 00000000 .......................0......... 000080
 00000000 00000000 00000000 00000000 81818101 00000001 00000000 00000000 ................................ 0000A0
 00000000 00000000 00000000 00000000 00000000 00000000 00000000 00000000 ................................ 0000C0
 00000000 00000000 00000000 00000000 00000000 00000000 00000000 00000000 ................................ 0000E0
 00000000 00000000 00000000 00000000 00000000 00000000 00000000 00000000 ................................ 000100
 00000000 00000000 00000000 00000000 00000000 00000000 00000000 00000000 ................................ 000120
 00000000 00000000 00000000 00000000 00000000 00000000 00000000 00000000 ................................ 000140
 00000000 00000000 00000000 00000000 00000000 00000000 00000000 00000000 ................................ 000160
 00000000 00000000 00000000 00000000 00000000 00000000 00000000 00000000 ................................ 000180
 0A0A0A0A 0A0A0A0A 0A0A0A0A 0A0A0A0A 0A0A0A00 00000000 00000000 00000000 ................................ 0001A0
 0A0A0A0A 0A0A0A0A 0A0A0A0A 0A0A0A0A 0A0A0A0A 0A0A0A0A 0A0A0A0A 0A0A0A0A ................................ 0001C0
 0A0A0A0A 0A0A0A0A 0A0A0A0A 0A0A0A0A 0A0A0A0A 0A0A0A0A 0A0A0A0A 0A0A0A0A ................................ 0001E0

Dump of file SATURN:[PCCOMMON.DUMP.DLL]DAIMDF.TMP;1 on 18-APR-1990 10:41:20.28
File ID (570,8,0)   End of file block 71 / Allocated 72

Virtual block number 64 (00000040), 512 (0200) bytes

 0A0A0A0A 0A0A0A0A 0A0A0A0A 0A0A0A0A 0A0A0A0A 0A0A0A0A 0A0A0A0A 0A0A0A0A ................................ 000000
 0A0A0A0A 0A0A0A0A 0A0A0A0A 0A0A0A0A 0A0A0A0A 0A0A0A0A 0A0A0A0A 0A0A0A0A ................................ 000020
 0A0A0A0A 0A0A0A0A 0A0A0A0A 0A0A0A0A 0A0A0A0A 0A0A0A0A 0A0A0A0A 0A0A0A0A ................................ 000040
 0A0A0A0A 0A0A0A0A 0A0A0A0A 0A0A0A0A 0A0A0A0A 0A0A0A0A 0A0A0A0A 0A0A0A0A ................................ 000060
 0A0A0A0A 0A0A0A0A 0A0A0A0A 0A0A0A0A 0A0A0A0A 0A0A0A0A 0A0A0A0A 0A0A0A0A ................................ 000080
 00000000 00000000 00000000 00000000 0000000A 0A0A0A0A 0A0A0A0A 0A0A0A0A ................................ 0000A0
 00000000 00000000 00000000 00002000 00000000 00000000 00000000 00000000 ................ ............... 0000C0
 61747320 200A0030 30303652 00003E3E 47534D4E 3C3CFFFF FFFF053A 15480000 ..H.:.....<<NMSG>>..R6000..- sta 0000E0
 72656765 746E6920 200A0033 30303652 0003000A 0D776F6C 66726576 6F206B63 ck overflow.....R6003..- integer 000100
 6E652074 6F6E202D 0A003830 30365200 08000A0D 30207962 20656469 76696420  divide by 0.....R6008..- not en 000120
 30365200 09000A0D 73746E65 6D756772 6120726F 66206563 61707320 6867756F ough space for arguments.....R60 000140
 7269766E 6520726F 66206563 61707320 6867756F 6E652074 6F6E202D 0A003930 09..- not enough space for envir 000160
 0020726F 72726520 656D6974 206E7572 00FF000A 0D00FC00 0A00746E 656D6E6F onment...*......run-time error . 000180
 6F6C2074 6F6E2074 6E696F70 20676E69 74616F6C 6620200A 0D323030 36520002 ..R6002..- floating point not lo 0001A0
 054A0002 00000004 19840002 03C60008 00CE0203 0004FFFF FF000A0D 64656461 aded...........ö...ó...........J. 0001C0
 20797469 746E4520 6464411B 00010352 00000000 00000006 17380002 00000005 ......8.........R....Add Entity  0001E0

Dump of file SATURN:[PCCOMMON.DUMP.DLL]DAIMDF.TMP;1 on 18-APR-1990 10:41:20.28
File ID (570,8,0)   End of file block 71 / Allocated 72

Virtual block number 65 (00000041), 512 (0200) bytes

 20797469 746E4520 6563616C 7065521F 006D726F 4620676E 6F4C204D 49206E69 in IM Long Form..Replace Entity  000000
 69207974 69746E45 20657465 6C65441E 006D726F 4620676E 6F4C204D 49206E69 in IM Long Form..Delete Entity i 000020
 6E692065 74756269 72747441 20646441 1E006D72 6F462067 6E6F4C20 4D49206E n IM Long Form..Add Attribute in 000040
 65747562 69727474 41206563 616C7065 5222006D 726F4620 676E6F4C 204D4920  IM Long Form."Replace Attribute 000060
 75626972 74744120 6574656C 65442100 6D726F46 20676E6F 4C204D49 206E6920  in IM Long Form.!Delete Attribu 000080
 69206E69 616D6F44 20646441 1B006D72 6F462067 6E6F4C20 4D49206E 69206574 te in IM Long Form..Add Domain i 0000A0
 69206E69 616D6F44 20656361 6C706552 1F006D72 6F462067 6E6F4C20 4D49206E n IM Long Form..Replace Domain i 0000C0
 6E69206E 6961606F 44206574 656C6544 1E006D72 6F462067 6E6F4C20 4D49206E n IM Long Form..Delete Domain in 0000E0
 206E6920 6E6F6973 6E656D69 44206464 411E006D 726F4620 676E6F4C 204D4920  IM Long Form..Add Dimens'on in  000100
 206E6F69 736E656D 69442065 63616C70 65522200 6D726F46 20676E6F 4C204D49 IM Long Form."Replace Dim. sion  000120
 6F69736E 656D6944 20657465 6C654421 006D726F 4620676E 6F4C204D 49206E69 in IM Long Form.!Delete Di.  sio 000140
 656B6369 6C632067 6E696464 41490060 726F4620 676E6F4C 204D4920 6E69206E n in IM Long Form.IAdding clicke 000160
 73696C20 7463656C 6573206F 74206D65 74692078 6F622074 73696C20 6E6F2064 d-on list box item to select lis 000180
 6168431E 006D726F 6620676E 6F6C206C 65646F6D 20617461 6420606F 72662074 t from data model long form..Cha 0001A0
 656A624F 28006C65 646F4D20 61746144 20666F20 656D616E 20656874 2065676E nge the name of Data Model.(Obje 0001C0
 646F6D20 73696874 206E6920 73747369 78652079 64616572 6C612073 25207463 ct %s already exists in this mod 0001E0
```

```
Dump of file SATURN:[PCCOMMON.DUMP.DLL]DAIMDF.TMP;1 on 18-APR-1990 10:41:20.28
File ID (570,8,0)    End of file block 71 / Allocated 72

Virtual block number 66 (00000042), 512 (0200) bytes

656F6420 73252074 63656A62 4F280352 00000000 00000000 00000000 002E6C65 el..............R.(Object %s doe 000000
656A624F 28002E6C 65646F60 20736968 74206E69 20747369 78652074 6F6E2073 s not exist in this model..+Obje 000020
77656E20 68746977 20646563 616C7065 72206E65 65622073 61682073 25207463 ct %s has been replaced with new 000040
63656C65 73206E65 65622073 61682074 63656A62 6F206F4E 2F002E65 6D616E20  name../No object has been selec 000060
72612073 656D614E 30002E6E 6F697461 7265706F 20656874 20726F66 20646574 ted for the operation..0Names ar 000080
696C2064 6E612079 72746E65 206E6565 77746562 20746E65 72656666 69642065 e different between entry and li 0000A0
00010001 00010001 00010001 00010001 00010001 00010001 002E786F 62207473 st box.......................... 0000C0
009B1400 00900824 00000001 00000044 00000000 FFFF0001 000E0352 00000A05 ....R...........D.......$....... 0000E0
03190005 80010001 08290010 00050000 00000000 0825FFFF 00080335 00FAFFBB E.*.5.....%...........)......... 000100
0080030E 00058002 000C083A 00000006 00000000 0000FFFF FFFF0060 00080054 T...m...............:........... 000120
00080034 02FE0005 80010001 083B000C 00050000 00000000 FFFFFFFF 006E0008 ..n................;.......z.4.. 000140
007A0030 00F002CC 00058003 00070848 0000000A 00000000 0000FFFF FFFF0079 y..............H.......à.b.0.z. 000160
FFFF0070 0008002A 02BC0005 80010001 08490008 00050000 00000000 FFFFFFFF ..............I......¥.*...p.... 000180
FFFFFFFF 00710008 00C10280 00078002 000C0852 00000006 00000000 0000FFFF ............R.......¯.é...q..... 0001A0
0000FFFF FFFF0073 00080064 02A40005 80010001 08530009 00050000 00000000 ...........S.......É.d...s...... 0001C0
00000000 FFFFFFFF 00740030 00C50272 00058000 00000850 00000007 00000000 ........]........r.é.0.t......... 0001E0

Dump of file SATURN:[PCCOMMON.DUMP.DLL]DAIMDF.TMP;1 on 18-APR-1990 10:41:20.28
File ID (570,8,0)    End of file block 71 / Allocated 72

Virtual block number 67 (00000043), 512 (0200) bytes

00000000 0000FFFF FFFF012C 000C0026 029600CF 80020400 085E0003 00030000 ......^.....ü...&...,........... 000000
00030000 00000000 FFFFFFFF 0120000C 00260284 00CF8002 00000862 00070003 ....b.....ü...&...·........ ..... 000020
00070005 00000000 0000FFFF FFFF012E 000C0026 027200CF 80020000 086A0006 ..j......ü.r.&............... ... 000040
08790000 00060000 00000000 FFFFFFFF 00CD0008 002C0262 00058001 00010871 q.......b.,....ë...............y. 000060
0001087A 00090005 00000000 0000FFFF FFFF00CE 000800C1 02560007 8002000C ......V.é...ö................z... 000080
80000000 08840000 00070000 00000000 FFFFFFFF 00CF0008 0064024A 00058001 .....J.d...ü..................... 0000A0
00CF8002 04000885 00030003 00000000 0000FFFF FFFF00D0 003000C5 02180005 .....é.0.Å......................ü. 0000C0
022A00CF 80020000 08890007 00030000 00000000 FFFFFFFF 012F000C 0026023C <.&.../.....................ü.*. 0000E0
00260218 00CF8002 00000891 00060003 00000000 0000FFFF FFFF0130 000C0026 &...0.....................ü...&. 000100
00080050 02080005 80010001 0898000F 00050000 00000000 FFFFFFFF 0131000C ..1..........................P... 000120
00D30008 00C101FC 00078002 000C08A8 00000006 00000000 0000FFFF FFFF00D2 Ò...............`.......a.è...&. 000140
FFFF00D4 00080064 01F00005 80010001 08A90010 00050000 00000000 FFFFFFFF .....................þ.d...Ô... 000160
FFFFFFFF 00050030 00C501BF 00058000 000008BA 00000007 00000000 0000FFFF ............o.........é.0.Å..... 000180
0000FFFF FFFF0132 000C0026 01E300CF 80020400 08BB0003 00030000 00000000 ..........É.....ü.Ò.&...2....... 0001A0
00000000 FFFFFFFF 0133000C 00260101 00CF8002 000008BF 00070003 00000000 ........¿.....ü.1.&...3......... 0001C0
00000000 0000FFFF FFFF0134 000C0026 01BF00CF 80020000 08C70006 00030000 .......ú......ü.¢.&...4.......... 0001E0

Dump of file SATURN:[PCCOMMON.DUMP.DLL]DAIMDF.TMP;1 on 18-APR-1990 10:41:20.28
File ID (570,8,0)    End of file block 71 / Allocated 72

Virtual block number 68 (00000044), 512 (0200) bytes

00060000 00000000 FFFFFFFF 00D70008 002C01AF 00058001 000108CE 00070005 ....ö.......£.,...■.............. 000000
00080005 00000000 0000FFFF FFFF00D8 000800C1 01A40007 8002000C 08D60000 ..■........É.è...Å............. 000020
08E00000 00070000 00000000 FFFFFFFF 00090009 00640197 00058001 000108D7 ■.........d...ì...............Å. 000040
040008E1 00030003 00000000 0000FFFF FFFF000A 003000C5 01650005 80000000 .......e.é.0.Ö..................Å... 000060
80020000 08E50007 00030000 00000000 FFFFFFFF 0135000C 00260189 00CF8002 ..ü...&...5..................Ì.... 000080
00CF8002 000008ED 00060003 00000000 0000FFFF FFFF0136 000C0026 017700CF ü.w.&...6...............ü.....ü. 0000A0
01550005 80010001 08F4000A 00050000 00000000 FFFFFFFF 0137000C 00260165 e.&...7................¶.......U. 0000C0
00C10149 00078002 000C08FF 00000006 00000000 0000FFFF FFFF000C 00080037 7...É.......................I.à. 0000E0
00080064 01300005 80010001 09000008 00050000 00000000 FFFFFFFF 00000008 ..Ì.......................a.d... 000100
000F0030 00C5010C 00058000 0000090C 00000007 00000000 0000FFFF FFFF000E Ø.........................é.0.Õ. 000120
FFFF0138 000C0026 013000CF 80020400 090D0003 00030000 00000000 FFFFFFFF ......................ü.0.&...8... 000140
FFFFFFFF 0139000C 0026011E 00CF8002 00000911 00070003 00000000 0000FFFF ...................ü...&...9..... 000160
0000FFFF FFFF013A 000C0026 010C00CF 80020000 09190006 00030000 00000000 ................ü...&...:....... 000180
00000000 FFFFFFFF 00E70008 006800FC 00058001 00010920 00140005 00000000 ........ ......■.h...Ó.......... 0001A0
00000000 0000FFFF FFFF00E8 000800C1 00F00007 8002000C 09350000 00060000 ......5........þ.è...Ö........... 0001C0
00070000 00000000 FFFFFFFF 00E90008 006400E4 00058001 00010936 00150005 ....6........ö.d...Ö............ 0001E0
```

```
Dump of file SATURN:[PCCOMMON.DUMP.DLL]DAIMDF.TMP;1 on 18-APR-1990 10:41:20.28
File ID (570,8,0)   End of file block 71 / Allocated 72

Virtual block number 69 (00000045), 512 (0200) bytes

 00030003 00000000 0000FFFF FFFF00EA 003000C5 00820005 80000000 094C0000 ..L.......ý.é.0.ð............... 000000
 09510007 00030000 00000000 FFFFFFFF 00EB000C 00260006 00CF8002 0400094D M.....ü.ø.&...$................Q. 000020
 00000959 00060003 00000000 0000FFFF FFFF00EC 000C0026 00C400CF 80020000 ....ü.ô.&...ì................Y... 000040
 80010001 09600008 00050000 00000000 FFFFFFFF 00ED000C 002600B2 00CF8002 ..Ü.ý.&...Ü...............'..... 000060
 00078002 000C0969 00000006 00000000 0000FFFF FFFF00CA 0008002C 00A20005 ..Å.,...ð...............i....... 000080
 00840005 80010001 096A0005 00050000 00000000 FFFFFFFF 00CB0008 00C10096 ..â...ù...............j......... 0000A0
 00C1007B 00078002 000C0970 00000006 00000000 0000FFFF FFFF008D 00080025 %..................p.......x.è. 0000C0
 003000C5 003A0005 80000000 09710000 00070000 00000000 FFFFFFFF 008E0008 .................q.......:.é.0. 0000E0
 0091000C 0026005E 00CF8002 04000972 00030003 00000000 0000FFFF FFFF0090 ................r.....ü.^.&..... 000100
 FFFF0092 000C0026 004C00CF 80020000 09760007 00030000 00000000 FFFFFFFF ..............v.....Ü.L.  ...... 000120
 FFFFFFFF 0093000C 0026003A 00CF8002 0000097E 00060003 00000000 0000FFFF ............~.....Ü.:.&...  .... 000140
 0000FFFF FFFF0096 002D00F0 00050005 80010002 09850010 00050000 00000000 ..................Þ.-.......... 000160
 00000000 FFFFFFFF 00970008 0019001F 00388001 00010996 00040005 00000000 ..............8................. 000180
 00000000 0000FFFF FFFF0098 0008001A 001F0078 80010001 099B0004 00050000 ............x................... 0001A0
 00050000 00000000 FFFFFFFF 00990008 001A001F 00888001 000109A0 00040005 ...........¡.................... 0001C0
 00070005 00000000 0000FFFF FFFF009A 00080028 0014000A 80010001 09A50007 ..É.........(................... 0001E0

Dump of file SATURN:[PCCOMMON.DUMP.DLL]DAIMDF.TMP;1 on 18-APR-1990 10:41:20.28
File ID (570,8,0)   End of file block 71 / Allocated 72

Virtual block number 70 (00000046), 512 (0200) bytes

 09B5000A 00050000 00000000 FFFFFFFF 00980008 00280009 000A8001 000109AD Ù.........(....................ç. 000000
 000109C0 000A0005 00000000 0000FFFF FFFF009C 00080036 00140038 80010001 ....8...6...................â... 000020
 80010001 09CB000A 00050000 00000000 FFFFFFFF 009D0008 00360014 00788001 ..x...6...................Ù..... 000040
 00388001 00010906 000A0005 00000000 0000FFFF FFFF009E 00080036 001400B8 |...6..................ø.....8. 000060
 00090078 80010001 09E1000A 00050000 00000000 FFFFFFFF 009F0008 00360009 ..6...................Ä.....x... 000080
 00360009 00888001 000109EC 000A0005 00000000 0000FFFF FFFF00A0 00080036 6...................ì.....|...6. 0000A0
 0008003E 03290005 80020002 09F70006 00030000 00000000 FFFFFFFF 00A10008 ..Å...............%.......).>... 0000C0
 008F0008 0022006C 00058001 000109FE 00060005 00000000 0000FFFF FFFF0065 e................±.......l."..... 0000E0
 72637365 4400003A 656D616E 206C6564 6F6D2061 74614400 00000000 FFFFFFFF .........Data model name:..Descr 000100
 64410000 736D796E 6F6E7953 2A00003A 6D796E6F 6E795300 003A6E6F 69747069 iption:..Synonym:..*Synonyms..Ad 000120
 7469746E 452A0000 3A797469 746E4500 6574656C 65440065 63616C70 65520064 d.Replace.Delete.Entity:..*Entit 000140
 74746120 65657246 00657465 6C654400 6563616C 70655200 64644100 00736569 ies..Add.Replace.Delete.Free att 000160
 52006464 41000073 65747562 69727474 61206565 72462A00 003A6574 75626972 ribute:..*Free attributes..Add.R 000180
 00736E69 616D6F44 2A00003A 6E696160 6F440065 74656C65 44006563 616C7065 eplace.Delete.Domain:..*Domains. 0001A0
 00003A6E 6F69736E 656D6944 00657465 6C654400 6563616C 70655200 64644100 .Add.Replace.Delete.Dimension:.. 0001C0
 00657465 6C654400 6563616C 70655200 64644100 00736E6F 69736E65 6D69442A *Dimensions..Add.Replace.Delete. 0001E0

Dump of file SATURN:[PCCOMMON.DUMP.DLL]DAIMDF.TMP;1 on 18-APR-1990 10:41:20.28
File ID (570,8,0)   End of file block 71 / Allocated 72

Virtual block number 71 (00000047), 512 (0200) bytes

 76206465 776F6C6C 412A0000 3A656C62 61742065 756C6176 20646577 6F6C6C41 Allowed value table:..*Allowed v 000000
 00657465 6C654400 6563616C 70655200 64644100 0073656C 62617420 65756C61 alue tables..Add.Replace.Delete. 000020
 65440065 63616C70 65520064 64410000 003A6574 6F4E0000 3A72656E 69666544 Definer:..Note:...Add.Replace.De 000040
 00656D69 54006574 6144006E 6F697461 6D726F66 6E692072 65735500 6574656C lete.User information.Date.Time. 000060
 005F5F5F 5F5F5F5F 5F5F5F00 64657461 64705500 64657461 65724300 72657355 User.Created.Updated.__________. 000080
 5F5F5F5F 5F5F5F5F 5F5F005F 5F5F5F5F 5F5F5F5F 5F005F5F 5F5F5F5F 5F5F5F5F __________.__________.__________ 0000A0
 4E2A0074 63656C65 53005F5F 5F5F5F5F 5F5F5F5F 005F5F5F 5F5F5F5F 5F5F5F00 .__________.__________.Select.*N 0000C0
 00000000 00000000 00000000 00000000 00000000 00000000 00000000 7365746F otes............................ 0000E0
 00000000 00000000 00000000 00000000 00000000 00000000 00000000 00000000 ................................ 000100
 00000000 00000000 00000000 00000000 00000000 00000000 00000000 00000000 ................................ 000120
 00000000 00000000 00000000 00000000 00000000 00000000 00000000 00000000 ................................ 000140
 00000000 00000000 00000000 00000000 00000000 00000000 00000000 00000000 ................................ 000160
 00000000 00000000 00000000 00000000 00000000 00000000 00000000 00000000 ................................ 000180
 00000000 00000000 00000000 00000000 00000000 00000000 00000000 00000000 ................................ 0001A0
 00000000 00000000 00000000 00000000 00000000 00000000 00000000 00000000 ................................ 0001C0
 00000000 00000000 00000000 00000000 00000000 00000000 00000000 00000000 ................................ 0001E0
```

```
Dump of file SATURN:[PCCOMMON.DUMP.DLL]DAKEYDF.TMP;1 on 18-APR-1990 10:41:29.75
File ID (571,16,0)   End of file block 37 / Allocated 40

Virtual block number 1 (00000001), 512 (0200) bytes

00000000 00000040 00000000 00000088 0000FFFF 00000004 0000001F 012C5A4D MZ,.............|.......a....... 000000
00000080 00000000 00000000 00000000 00000000 00000000 00000000 00000000 ................................ 000020
6F6E6E61 63206061 72676F72 70207369 685421CD 4C01B821 CD09B400 0EBA1F0E ..¤..Ç.ëi¡.LëIThis program canno 000040
00000000 00000024 0A0D0D2E 65646F6D 20534F44 206E6920 6E757220 65622074 t be run in DOS mode....$....... 000060
00080009 00000000 00030000 00000000 00058009 442585EA 00070522 0505454E NE.."...õ.%D.................... 000080
00000000 00000000 00010003 00040000 000005A9 00AF009F 00940088 0040002B +.a.......£.`................... 0000A0
00720E00 0072038C 000F0F00 000F03BA 12460F00 12460280 1E9C0F00 1E9C005E ^.........F...F.¤.......¥.r...r. 0000C0
01C41EF1 01C4030C 005F1EF1 005F0306 00FC0E21 00000000 01100F21 010A03C4 á...!.......|.¤.ø._.þ._.É.á.þ.á. 0000E0
01000000 46445945 48414407 000F0004 00030005 00020005 08711EB1 087103F9 '.q.Ý.q..............DAKEYDF.... 000100
4C414D45 4D0D4D45 4D034E49 57405005 0003EF02 8E011800 E600C300 19000700 .....û.Ì.....ÿ...PMWIN.MEM.MEMAL 000120
504F5453 4C4D440A 4E585454 52415453 4C4D440B 6C6D6403 4B434F4C 42434F4C LOCBLOCK.dml.DMLSTARTTXN.DMLSTOP 000140
59524555 514C4D44 08454C44 4E41484C 45444F4D 59524555 514C4D44 134E5854 TXN.DMLQUERYMODELHANDLE.DMLQUERY 000160
4D440844 4C454946 5445534C 4D440844 4C454946 59524555 514C4D44 0D495447 GTI.DMLQUERYFIELD.DMLSETFIELD.DM 000180
494C4545 52464C4D 4408314E 4C525952 4555514C 4D440C4E 4C525952 4555514C LQUERYRLN.DMLQUERYRLN1.DMLFREELI 0001A0
424C4C4F 524E5854 504F5453 4C4D4412 44494C4D 44595245 55514C4D 440D5453 ST.DMLQUERYDMLID.DMLSTOPTXNROLLB 0001C0
4F544C4C 494B4954 470B4954 47034C4C 41544345 4C455345 444C4D44 0E4B4341 ACK.DMLDESELECTALL.GTI.GTIKILLTO 0001E0

Dump of file SATURN:[PCCOMMON.DUMP.DLL]DAKEYDF.TMP;1 on 18-APR-1990 10:41:29.75
File ID (571,16,0)   End of file block 37 / Allocated 40

Virtual block number 2 (00000002), 512 (0200) bytes

4F4F4C4D 41440F6D 61640352 54504154 41445855 41595245 55514954 47124C4F OL.GTIQUERYAUXDATAPTR.dam.DAMLOO 000000
5349444D 41441052 5245594E 4154414D 524F464D 41440F54 43454A42 4F50554B KUPOBJECT.DAMFORMATANYERR.DAMDIS 000020
46440E4D 45544944 44415453 494C4D46 440E4D46 44035252 45594E41 59414C50 PLAYANYERR.DFM.DFMLISTADDITEM.DF 000040
41445245 5355444C 45494659 52455551 4D464415 4D524F46 53534543 4F52504D MPROCESSFORM.DFMQUERYFIELDUSERDA 000060
424F4C4D 44485952 4555514D 46440F50 41454B42 48595245 55514D46 440E4154 TA.DFMQUERYHBHEAP.DFMQUERYHDMLOB 000080
46441347 4C44444E 57485952 4555514D 46440F4D 54485952 4555514D 4644084A J.DFMQUERYHTM.DFMQUERYHWNDDLG.DF 0000A0
44104C4F 4F545952 4555514D 46440C53 55544154 53544649 48535952 4555514D MQUERYSHIFTSTATUS.DFMQUERYTOOL.D 0000C0
444C4549 46524554 53494745 524D4644 10415441 44524553 55595245 55514D46 FMQUERYUSERDATA.DFMREGISTERFIELD 0000E0
440F4E46 444E414D 4D4F4354 45534D46 440F4E46 45534F4C 43544553 4D46440D .DFMSETCLOSEFN.DFMSETCOMMANDFN.D 000100
0E4E4645 54414749 56414E54 45534D46 44104E46 4C4F5254 4E4F4354 45534D46 FMSETCONTROLFN.DFMSETNAVIGATEFN. 000120
46441341 54414452 45535554 45534D46 440E4E46 59464954 4F4E5445 534D4644 DFMSETNOTIFYFN.DFMSETUSERDATA.DF 000140
5453494C 53534543 4F52504D 4644194D 524F4647 4E4F4C45 54414749 56414E4D MNAVIGATELONGFORM.DFMPROCESSLIST 000160
4F435449 44455453 494C5353 45434F52 504D4644 194C4F52 544E4F43 54494445 EDITCONTROL.DFMPROCESSLISTEDITCO 000180
41440644 45544345 4C455358 4F425453 494C5952 4555514D 46441744 4E414D4D MMAND.DFMQUERYLISTBOXSELECTED.DA 0001A0
54494E49 4D524F46 41441252 5245404D 4059414C 50534944 4D414410 4D524F46 FORM.DAMDISPLAYMEMERR.DAFORMINIT 0001C0
5354494E 494A424F 0D454C54 49545445 5340524F 4641440E 4F464E49 52455355 USERINFO.DAFORMSETTITLE.OBJINITS 0001E0

Dump of file SATURN:[PCCOMMON.DUMP.DLL]DAKEYDF.TMP;1 on 18-APR-1990 10:41:29.75
File ID (571,16,0)   End of file block 37 / Allocated 4J

Virtual block number 3 (00000003), 512 (0200) bytes

4D414E54 494E494A 424F0B54 43454C45 53455441 4450554A 424F0F54 43454C45 ELECT.OBJUPDATESELECT.OBJINITNAM 000000
544E4F43 54494E49 4A424F16 454D414E 5355434F 46455441 4450554A 424F1245 E.OBJUPDATEFOCUSNAME.OBJINITCONT 000020
4A424F0D 54584554 4E4F4345 54414450 554A424F 104C4542 414C444E 41545845 EXTANDLABEL.OBJUPDATECONTEXT.OBJ 000040
59535449 4E494A42 4F0A4353 45445449 4E494A42 4F0B4353 45444554 41445055 UPDATEDESC.OBJINITDESC.OBJINITSY 000060
0A4E5953 5045524A 424F094E 59534C45 444A424F 094E5953 4444414A 424F094E N.OBJADDSYN.OBJDELSYN.OBJREPSYN. 000080
4F094457 4B4C4544 4A424F09 44574B44 44414A42 4F094457 4B54494E 494A424F OBJINITKWD.OBJADDKWD.OBJDELKWD.O 0000A0
0A45544F 4E444441 4A424F0A 45544F4E 54494E49 4A424F0B 44574B50 45524A42 BJREPKWD.OBJINITNOTE.OBJADDNOTE. 0000C0
52424D54 494E494A 424F0A45 544F4E50 45524A42 4F0A4554 4F4E4C45 444A424F OBJDELNOTE.OBJREPNOTE.OBJINITMBR 0000E0
44055242 4D504552 4A424F09 5242404C 45444A42 4F095242 4D444441 4A424F09 .OBJADDMBR.OBJDELMBR.OBJREPMBR.D 000100
554C4D44 1352454C 444E4148 59464954 4F4E454B 414D5455 4C4D4416 54554C4D MLUT.DMLUTMAKENOTIFYHANDLER.DMLU 000120
54455352 45545349 47455254 554C4D44 10455445 4C454452 45545349 47455254 TREGISTERDELETE.DMLUTREGISTERSET 000140
53534543 4F525054 554C4D44 12455449 52575245 54534947 45525455 4C4D4412 .DMLUTREGISTERWRITE.DMLUTPROCESS 000160
414C4552 4E554554 414C4552 52455453 49474552 54554C4D 44185946 49544F4E NOTIFY.DMLUTREGISTERRELATEUNRELA 000180
6F462067 6E6F4C20 79654B20 4144204D 5020322F 534F1800 00187303 01014554 TE...s....OS/2 PM DA Key Long Fo 0001A0
00000000 00000000 00000000 00000150 41525453 544F4F42 5945480C 00006072 rm...KEYBOOTSTRAP............... 0001C0
EBE90374 01E67E83 E646890C 4688E246 890A4688 D88EFFFF 881E5657 00001EC8 à...WV.¡...Ä.F..Fã.F..Fì.-Ì.t.ÕŠ 0001E0
```

```
Dump of file SATURN:[PCCOMMON.DUMP.DLL]DAKEYDF.TMP;1 on 18-APR-1990 10:41:29.75
File ID (571,16,0)   End of file block 37 / Allocated 40

Virtual block number 4 (00000004), 512 (0200) bytes

 E9E44688 0006E903 7500003D E4468900 00FFFF9A 5016E846 8D0E76FF 1076FF00 ..v..v..FÒ.P......Fõ=..u.Õ...Fõõ 000000
 E4468800 06E90375 00003DE4 46890000 FFFF9A50 16F2468D 0E76FF10 76FF0290 ...v..v..F·.P......Fõ=..u.Õ...Fõ 000020
 3DE44689 FFFF15AF 9A5016F8 468DE276 FF0E76FF 1076FF00 60E9E246 8B026FE9 Õo..Fãõ'..v..v..vã.F½.P.£....Fõ= 000040
 03E90374 01F27E83 0028E903 75FA460B F8468802 45E9E446 880006E9 03750000 ..u.Õ...FõÕE..F½.F³u.Õ(..–·.t.Õ. 000060
 0212E9E4 46880006 E9037500 003DE446 890000FF FF9AE876 FFEA76FF 001CE900 .Õ...võ.vÒ......Fõ=..u.Õ...Fõõ.. 000080
 763DFF88 E9037500 73300013 E90376FF 98E90375 00813D00 43E90046 E90049E9 Õl.ÕF.ÕC.=..u.Õ..v.Õ..=s.u.Õ..=v 0000A0
 68E90375 00043DFF 70E90375 00D03DFF 78E90375 00873DFF DAE9FF83 E9037500 .u.Õ..ÕÕ.=..u.Õx.=Å.u.Õp.=å.u.Õh 0000C0
 5016F446 8DE276FF 0E76FF10 76FF0157 E9E2468B FFB7E9FF 60E90375 00093DFF .=l.u.Õ'.Õñ..FãÕW..v..v..vã.F¶.P 0000E0
 5016EE46 8D0E76FF 1076FF00 0001879A 5016EC46 8D0E76FF 1076FF00 0001779A .w....v..v..F$.P......v..v..FŸ.P 000100
 EC76FFF4 76FFF676 FF0676FF 0876FF0A 76FF0C76 FFEE76FF F076FF00 0001979A ......vÞ.vŸ.v..v..v..v..v–.v¶.v$ 000120
 76FF1076 FF000001 D49A5016 FC468DE2 76FF0E76 FF1076FF 016AE900 0001BB9A .£...Õj..v..v..vã.F=.P.å....v..v 000140
 76FFF076 FF000001 F49A5016 EE468D0E 76FF1076 FF000001 E49A5016 EC468D0E ..F&.P.Õ....v..v..FŸ.P.¶....vÞ.v 000160
 E9000002 189AEC76 FF37FF26 0277FF26 FC5EC406 76FF0876 FF0A76FF 0C76FFEE Ÿ.v..v..v..v.á^=&.w.&.7.v$.....Õ 000180
 468D0E76 FF1076FF 0000FFFF 9A5016FC 468DE276 FF0E76FF 1076FF01 0DE90110 ..Õ...v..v..vã.F=.P......v..v..F 0001A0
 76FFEE76 FFF076FF 0000023B 9A5016EE 468D0E76 FF1076FF 0000022B 9A5016EC &.P.+....v..v..FŸ.P.;....vÞ.vŸ.v 0001C0
 FF00B3E9 00000259 9AEC76FF 37FF2602 77FF26FC 5EC40676 FF0876FF 0A76FF0C ..v..v..v.á^=&.w.&.7.v$.Y...Õ°.. 0001E0

Dump of file SATURN:[PCCOMMON.DUMP.DLL]DAKEYDF.TMP;1 on 18-APR-1990 10:41:29.75
File ID (571,16,0)   End of file block 37 / Allocated 40

Virtual block number 5 (00000005), 512 (0200) bytes

 FF0000FF FF9A5016 EE468D0E 76FF1076 FF0000FF FF9A5016 EC468D0E 76FF1076 v..v..F&.P......v..v..FŸ.P...... 000000
 0072E900 00FFFF9A EC76FF00 00681E06 76FF0876 FF0A76FF 0C76FFEE 76FFF076 vÞ.vŸ.v..v..v..v..h...v$.....Õr. 000020
 733DFE94 E9037500 7030002B E90376FE A1E90375 00873D00 69E9006C E900008B ¡..Õl.Õl.=..u.ÕÅ±v.Õ+.=p.u.Õ.±=s 000040
 8FE9FE74 E9037500 853DFE7C E9037500 813DFE84 E9037500 7F3DFE8C E9037500 .u.Õ.±=..u.Õ.±=..u.Õ|±=..u.Õt±Õ¢ 000060
 026001C5 02600260 026001C5 02B4A7FF 2E93C003 FFB4E903 76000E3D 00CC2DFF .-ä.=..v.ÕÇ..å...ÏÇ.é.'.'.'.é.'. 000080
 1E565700 0012C800 0CCAC95F 5E1F021F 01120260 01120260 02600168 02600168 h.'.h.'.'...'......^_èò..à...WV. 0000A0
 003DEE46 89000001 319A5016 F2468D0E 76FF1076 FFF04689 0A468BD8 8E0008B8 ¡...Ä.F..FÞ.v..v..F·¯P.1....FŸ=. 0000C0
 3DEE4689 00000141 9A5016F4 468D0E76 FF1076FF 0131E9EE 46880006 E9037500 .u.Õ...FŸÕ1..v..v..F¶.P.A....FŸ= 0000E0
 16F8468D F076FF0E 76FF1076 FF009EE9 F0468801 10E9EE46 880006E9 03750000 ..u.Õ...FŸÕ...FÞÕ...v..v..vÞ.F½. 000100
 0E76FF10 76FF00C0 E900E6E9 EE468800 06E90375 00003DEE 46890000 03699A50 P.l....FŸ=..u.Õ...FŸÕl.Õå..v..v. 000120
 5EC400BF E9EE4688 0006E903 7500003D EE468900 0001219A 5016FC46 8DF076FF .vÞ.F=.P.l....FŸ=..u.Õ...FŸÕ¢.á^ 000140
 9A5016FC 468DF076 FF0E76FF 1076FF00 89E9FA56 89FB4689 02578826 078826FC =&..&.W..F½.V³Õ...v..v..vÞ.F=.P. 000160
 89025788 26078826 FC5EC400 88E9EE46 880006E9 03750000 3DEE4689 00000342 B....FŸ=..u.Õ...FŸÕ..á^=&..&.W.. 000180
 2E93C003 FFECE903 76001A3D 012C2D00 49E9006F E900008B 0052E9FA 5689F846 F½.V³ÕR.¡..Õo.Õl.-,.=..v.Õ$..å.. 0001A0
 03C803C8 03C803C8 03C8035A 035A035A 03C803C8 03C80333 03330333 03E4A7FF .ÏÕ.3.3.3.à.à.à.Z.Z.Z.à.à.à.à.à. 0001C0
 F476FFF6 76FF0333 03330333 03330333 03330391 03910391 03330333 033303C8 à.3.3.3.......3.3.3.3.3.3..v–.v¶ 0001E0

Dump of file SATURN:[PCCOMMON.DUMP.DLL]DAKEYDF.TMP;1 on 18-APR-1990 10:41:29.75
File ID (571,16,0)   End of file block 37 / Allocated 40

Virtual block number 6 (00000006), 512 (0200) bytes

 5F5E1F00 00E90000 FFFF9AF2 76FFF876 FFFA76FF 0676FF08 76FF0A76 FF0C76FF .v..v..v..v..v³.v½.v·.....Õ...^_ 000000
 0003189A 5016FF30 86B00876 FF0A76FF D88E02E1 881E5657 000004C8 000CCAC9 èò..àå..WV.¡Ä..Ä.v..v...0..P...¯ 000020
 8D406AF8 76FFFA76 FFFA5689 F8468900 00FFFF9A 0676FFFF 3086FFFF 3286FF00 ..Ñ2..Ñ0..v.......F½.V³.v³.v½jä. 000040
 3586B000 D5E90000 BA00008B 0009E903 7523FF34 BE800000 FFFF9A50 16FF3486 .4..P......ƒ4.Ñu.Õ..¡..¤..Õf...5 000060
 037407FF 74BE83FF 769689FF 748689FF CA830000 0004C483 FFFF0018 9A5016FF ..P......á.....ò...t...v../t..t. 000080
 80685016 FF78868D 0676FFFF 3086FFFF 3286FF00 1CE90374 FFFF768E 830026E9 Õ&../v..t.Õ...Ñ2..Ñ0..v...x..Ph. 0000A0
 3286FF00 1CE90374 FFFF768E 830026E9 037406FF 748E8300 39E90000 FFFF9A00 ......Õ9../t..t.Õ&../v..t.Õ...Ñ2 0000C0
 E90000BA 0000B800 09E90000 FFFF9A50 16FF7886 8D008068 0676FFFF 3086FFFF ..Ñ0..v.h....x..P.....Õ..¡..¤..Õ 0000E0
 16FC468D 0676FF08 76FF0A76 FF0000FF FF9A5016 FF2E868D 0876FF0A 76FF0050 P..v..v......P......v..v..v..F=. 000100
 76FFFF2E 86FF0018 E999FF2C 86880008 E9037500 003DFF2C 8689007A 15AF9A50 P.£.z....,.=..u.Õ.......Õ...Ñ...v 000120
 1E565700 000AC800 06CAC95F 5E1F0000 E90000FF FF9A5016 FF78868D FC76FFFE ±.v=..x..P.....Õ...^_èò..à...WV. 000140
 46890000 FFFF9A50 16FC468D 0E76FF10 76FF004A E903740C 087E83D8 8E044CB8 ¡L..Ä.–..t.ÕJ..v..v.¯F=.P......F 000160
 0C563900 15E90374 0A4639FE 568BFC46 880089E9 F6468800 06E90375 00003DF6 –=..u.Õ...F–Õ¿..F=.V±9F.t.Õ..9V. 000180
 468D0E76 FF1076FF 0090E900 00880000 FFFF9A77 6A0E76FF 1076FF00 0DE90374 t.Õ...v..v.jw.....¡..Õ...v..v..F 0001A0
 2047C726 F85EC400 6FE9F646 880006E9 03750000 3DF64689 0000FFFF 9A5016F8 ½.P......F–=..u.Õ...F–Õo.á^½&ÚG 0001C0
 46890000 FFFF9A06 76FF0876 FF0A76FF 0C76FF22 77FF2624 77FF26F8 5EC40001 ..á^½&.w$&.w".v..v..v..v.......F 0001E0
```

Dump of file SATURN:[PCCOMMON.DUMP.DLL]DAKEYDF.TMP;1 on 18-APR-1990 10:41:29.75
File ID (571,16,0)   End of file block 37 / Allocated 40

Virtual block number 7 (00000007), 512 (0200) bytes

```
A0680E76 FF1076FF 00002047 C726F85E C40039E9 F6468800 06E90375 00003DF6 -=..u.Õ...F-Õ9.á^%&úG ...v..v.h. 000000
FFFF9A00 9F680E76 FF1076FF 0000065E 9A00A168 0E76FF10 76FF0000 06509A00 ..P....v..v.hÀ..^....v..v.h..... 000020
76FF0A76 FF088E05 81881E56 57000002 C8000CCA C95F5E1F 0000E900 00880000 ..¡..Õ...^_èò..à...WV.¡...Ä.v..v 000040
0676FF08 76FF0A76 FF0013E9 FE468800 06E90375 00003DFE 46890000 FFFF9A08 .......F±=..u.Õ...F±Õ...v..v..v. 000060
1676FFD8 8E0677B8 1E565700 0002C800 06CAC95F 5E1F0000 E90000FF FF9A746A jt.....Õ...^_èò..à...WV.¡w..Ä.v. 000080
00FFFF9A 006A006A 0676FF08 76FF0A76 FF0C76FF 0E76FF10 76FF1276 FF1476FF .v..v..v..v..v..v..v..v.j.j..... 0000A0
FE468900 0006829A 1476FF16 76FF004C E9FE4688 0006E903 75000030 FE468900 ..F±=..u.Õ...F±ÕL..v..v.......F± 0000C0
FF1676FF 00000726 9A00A068 1476FF16 76FF0030 E9FE4688 0006E903 75000030 =..u.Õ...F±Õ0..v..v.h...&....v.. 0000E0
5E1F0000 E9000088 00000642 9A009F68 1476FF16 76FF0000 07349A00 A1681476 v.hÀ..4....v..v.h...B...|..Õ...^ 000100
0000209A 5016F246 800876FF 0A76FFD8 8E068988 1E565700 0010C800 12CAC95F _èò..à...WV.¡¿..Ä.v..v..F·.P.·.. 000120
0009E9F0 46880000 07A59AF0 76FFF676 FFF876FF 0014E903 75000030 F0468900 ..Fÿ=..u.Õ...v½.v-.vÞ.Ê....FÞÕ). 000140
76FFF876 FF0014E9 03750000 30F04689 0000045D 9A5016F6 46800876 FF0A76FF .v..v..F-.P.]....Fÿ=..u.Õ...v½.v 000160
89000005 9A9A5016 FC468008 76FF0A76 FF00AAE9 F0468800 0007D49A F076FFF6 -.vÞ.å....FÞÕ`..v..v..F=.P...... 000180
76FF007B E9F04688 00000808 9AF076FF F676FFF8 76FF0014 E9037500 0030F046 Fÿ=..u.Õ...v½.v-.vÞ......FÞÕ(..v 0001A0
14E90375 00003DF0 46890000 FFFF9A50 16FA468D 046AFC76 FFFE76FF F276FFF4 ¶.v·.v±.v=j..F'.P......Fÿ=..u.Õ. 0001C0
76FF001C E9037459 FA7E8000 44E9F046 880000FF FF9AF076 FFF676FF F876FF00 ..v½.v-.vÞ......FÞÕD..~'Yt.Õ...v 0001E0
```

Dump of file SATURN:[PCCOMMON.DUMP.DLL]DAKEYDF.TMP;1 on 18-APR-1990 10:41:29.75
File ID (571,16,0)   End of file block 37 / Allocated 40

Virtual block number 8 (00000008), 512 (0200) bytes

```
F676FFF8 76FF0019 E9000008 4F9A006A 006A016A 006A0125 680676FF F676FFF8 ½.v-.v.h%.j.j.j.j..O...Õ...v½.v- 000000
0006CAC9 5F5E1F00 00E90000 B80000FF FF9A006A 006A006A 006A0125 680676FF .v.h%.j.j.j.j......¡..Õ...^_èò.. 000020
8D1476FF 1676FF00 0207C726 0E5EC400 00EE46C7 D88E074D 881E5657 0001A8C8 à´..WV.¡M..ÄúFÿ..á^.&ú....v..v.. 000040
1476FF16 76FF0185 E9EE4688 0006E903 75000030 EE468900 0007509A 5016F046 FÞ.P.]....Fÿ=..u.Õ...FÿÕç..v..v. 000060
76FF1676 FF0194E9 EE468800 06E90375 000030EE 46890000 078C9A50 16F44680 .F¶.P......Fÿ=..u.Õ...FÿÕ...v..v 000080
FFF276FF 0173E9EE 46880006 E9037500 003DEE46 89000007 889A5016 FC468014 ..F=.P.£....Fÿ=..u.Õ...FÿÕs..v·. 0000A0
FF0017E9 03750000 3DEE4689 000007F2 9A5016FA 4680046A FC76FFFE 76FFF076 vÞ.v±.v=j..F'.P.·....Fÿ=..u.Õ... 0000C0
681276FF F476FFF6 76FF0139 E9EE4688 0000FFFF 9A0A76FF 0C76FF01 9668EE76 vÿh...v..v.......FÿÕ9..v-.v¶.v.h 0000E0
46C60004 E959F846 C60007E9 03750000 30000008 339A006A 006A006A 006A0124 $.j.j.j.j..3...=..u.Õ..6F½YÕ..6F 000100
8D019668 296A0000 36FF2601 08068E00 6A006A00 CAE90375 F84638FA 468A4EF8 ½N.F'8F½u.Õò.j.j.....&.6..j)h... 000120
003DEE46 890000FF FF9A5016 FE58868D F076FFF2 76FF0000 FFFF9A50 16FE5886 .X±.P......v·.vÞ..X±.P......Fÿ=. 000140
F276FF00 82E9EE46 88000009 CD9A0A76 FF0C76FF 019668EE 76FF0017 E9037500 .u.Õ...vÿh...v..v..ê....FÿÕý..v· 000160
002AE903 7500003D EE468900 00FFFF9A 5016F846 8D046AFC 76FFFE76 FFF076FF .vÞ.v±.v=j..F½.P......Fÿ=..u.Õ*. 000180
9AF076FF F276FF00 0207C726 0E5EC400 000A009A 0A76FF0C 76FF0196 68EE76FF .vÿh...v..v......á^.&ú....v·.vÞ. 0001A0
0017E903 7500003D EE468900 00FFFF9A F076FFF2 76FF0065 E9EE4688 0000FFFF .....FÿÕe..v·.vÞ......Fÿ=..u.Õ.. 0001C0
FF000107 C7260E5E C40038E9 EE468800 00090C9A 0A76FF0C 76FF0196 68EE76FF .vÿh...v..v.......FÿÕ8.á^.&ú.... 0001E0
```

Dump of file SATURN:[PCCOMMON.DUMP.DLL]DAKEYDF.TMP;1 on 18-APR-1990 10:41:29.75
File ID (571,16,0)   End of file block 37 / Allocated 40

Virtual block number 9 (00000009), 512 (0200) bytes

```
76FF1676 FF00000A 459A00A1 681476FF 1676FF00 000A379A 00A06814 76FF1676 v..v.h...7....v..v.hÀ..E....v..v 000000
0868881E 56570000 0EC80012 CAC95F5E 1F0000E9 EE468800 0007189A 009F6814 .h........FÿÕ...^_èò..à...WV.¡h. 000020
00003DF6 46890000 FFFF9A50 16F2468D 066A1276 FF1476FF 1676FF18 76FFD88E .Ä.v..v..v..v.j..F·.P......F-=.. 000040
76FFF476 FF156A0A 76FF0C76 FF056A16 76FF1876 FF00C6E9 F6468800 06E90375 u.Õ...F-Õ6..v..v.j..v..v.j..v¶.v 000060
FC468D20 76FF2276 FF005AE9 03750000 3DF64689 0000FFFF 9A0E76FF 1076FFF2 ·.v..v.......F-=..u.ÕZ..v".v .F= 000080
056AFC76 FFFE76FF 0079E9F6 46880006 E9037500 003DF646 89000008 A69A5016 .P.Î....F-=..u.Õ...F-Õy..v±.v=j. 0000A0
6A006A00 82681EFC 76FFFE76 FFF876FF FA76FFFA 5689F846 890000FF FF9A006A j.......F½.V'.v'.v½.v±.v=.hý.j.j 0000C0
0023E903 7402470B 26078826 0E5EC400 40E90000 B80000FF FF9A2020 68006A00 .j.h  .....|..Õ@.á^.&..&.G.t.Õ#. 0000E0
8EF48800 0009669A 1A76FF1C 76FF0196 68276A00 0036FF26 0108068E 006A006A j.j.....&.6..j'h...v..v..f...¡¶. 000100
881E5657 00000EC8 001ECAC9 5F5E1F00 00E90000 B8000007 C726065E C4000EE9 Õ..á^.&ú...|..Õ...^_èò..à...WV.¡ 000120
30F64689 00000A76 9A5016F2 468D066A 1276FF14 76FF1676 FF1876FF D88E0A5E ^..Ä.v..v..v..v.j..F·.P.v....F-= 000140
F476FF12 6A0A76FF 0C76FF03 6A1676FF 1876FF00 C6E9F646 880006E9 03750000 ..u.Õ...F-Õ6..v..v.j..v..v.j..v¶ 000160
8D2076FF 2276FF00 5AE90375 00003DF6 46890000 0AA89A0E 76FF1076 FFF276FF .v·.v..v..´....F-=..u.ÕZ..v".v . 000180
FC76FFFE 76FF0079 E9F64688 0006E903 75000030 F6468900 000AC39A 5016FC46 F=.P.û....F-=..u.Õ...F-Õy..v±.v= 0001A0
6A00C768 1EFC76FF FE76FFF8 76FFFA76 FFFA5689 F8468900 000AE39A 006A056A j.j..D....F½.V'.v'.v½.v±.v=.hú.j 0001C0
E9037402 47082607 88260E5E C40040E9 00008800 0008079A 20206800 6A006A00 .j.j.h  .....|..Õ@.á^.&..&.G.t.Õ 0001E0
```

Dump of file SATURN:[PCCOMMON.DUMP.DLL]DAKEYDF.TMP;1 on 18-APR-1990 10:41:29.75
File ID (571,16,0)   End of file block 37 / Allocated 40

Virtual block number 10 (0000000A), 512 (0200) bytes

```
8800000B 399A1A76 FF1C76FF 01966828 6A000036 FF260108 068E006A 006A0023 #.j.j.....&.6..j(h...v..v..9...| 000000
56570000 70C8001E CAC95F5E 1F0000E9 00008800 0007C726 065EC400 0EE90001 ..Õ..á^.&ú...|..Õ...^_èò..àp..WV 000020
06E90375 000030EE 46890000 08C59A50 16F8468D 0876FF0A 76FFD88E 0B60881E .|'..Ä.v..v..F½.P.é....FŸ=..u.Õ. 000040
E9037500 0030EE46 89000008 859A5016 F446800B 76FF0A76 FF0214E9 EE468800 ..FŸÕ...v..v..F¶.P......FŸ=..u.Õ 000060
03750000 30EE4689 0000FFFF 9A501698 468DF476 FFF676FF 01F3E9EE 46880006 ...FŸÕ«..v-.v¶.F..P......FŸ=..u. 000080
75000030 EE468900 0008C79A 5016FC46 8D0876FF 0A76FF01 D2E9EE46 880006E9 Õ...FŸÕ@..v..v..F=.P.ú....FŸ=..u 0000A0
08F09A50 16E8468D 046AFC76 FFFE76FF F476FFF6 76FF01B1 E9EE4688 0006E903 .Õ...FŸÕŸ..v-.v¶.v±.v=j..FÕ.P.Þ. 0000C0
E90000B8 0006E903 7559E87E 800188E9 EE468800 06E90375 00003DEE 46890000 ...FŸ=..u.Õ...FŸÕ...-ÕYu.Õ..|..Õ 0000E0
00003DEE 46890000 FFFF9A50 16F04680 096AFC76 FFFE76FF F476FFF6 76FF0179 y..v-.v¶.v±.v=;..FÞ.P......FŸ=.. 000100
5EC40494 46830004 E9965689 944689F2 5688F046 880150E9 EE468800 06E90375 u.Õ...FŸÕP..FÞ.V·.F..V.Õ...F..á^ 000120
8D156A37 FF260277 FF26945E C4F476FF F676FF01 17E90375 02470826 07882694 .&..&.G.u.Õ...v-.v¶á^.&.w.&.7j.. 000140
F076FFF2 76FFF476 FFF676FF 0017E903 75000030 EE468900 0000369A 5016EA46 FÕ.P.6....FŸ=..u.Õ...v-.v¶.v·.vÞ 000160
5EC40490 46830004 E9925689 904689EC 5688EA46 8800F0E9 EE468800 000E019A ......FŸÕÞ..FÕ.V$.F..V.Õ...F..á^ 000180
80026A37 FF260277 FF26905E C4F476FF F676FF00 A3E90375 02470826 07882690 .&..&.G.u.ÕÉ..v-.v¶á^.&.w.&.7j.. 0001A0
F076FFF2 76FFF476 FFF676FF 0028E903 7500003D EE468900 000CFE9A 50169C46 F..P.±....FŸ=..u.Õ(..v-.v¶.v·.vÞ 0001C0
FFFA76FF 007FE9EE 46880000 0E529AEA 76FFEC76 FFF476FF F676FF00 000E129A ......v-.v¶.v$.vÕ.R....FŸÕ...v*. 0001E0
```

Dump of file SATURN:[PCCOMMON.DUMP.DLL]DAKEYDF.TMP;1 on 18-APR-1990 10:41:29.75
File ID (571,16,0)   End of file block 37 / Allocated 40

Virtual block number 11 (0000000B), 512 (0200) bytes

```
000030EE 46890000 FFFF9A37 FF260277 FF26905E C450169C 46800086 681EF876 v½.h...F..Pá^.&.w.&.7......FŸ=.. 000000
FFEC76FF F476FFF6 76FF0000 0E639AF0 76FFF276 FFF476FF F676FF00 28E90375 u.Õ(..v-.v¶.v·.vÞ.c....v-.v¶.v$. 000020
000E919A EA76FFEC 76FFF476 FFF676FF FF4AE900 2EE9EE46 8800000E 7D9AEA76 vÕ.)....FŸÕ..ÕJ..v-.v¶.v$.vÕ.... 000040
CAC95F5E 1F0000E9 00008800 00FFFF9A F076FFF2 76FFF476 FFF676FF FE06E900 .Õ@±.v-.v¶.v·.vÞ.....|..\...^_èò 000060
46890000 0C729A50 16FC468D 2476FF26 76FFD88E 0C62881E 56570000 56C80006 ..àV..WV.|b..Ä.v&.v$.F=.Þ r....F 000080
8900000C 939A5016 AC468D24 76FF2676 FF006DE9 AA468800 06E90375 00003DAA ˜=..u.Õ...F˜Õm..v&.v$.F¯.Þ...... 0000A0
5016B046 8D4B6A0C 76FFFC76 FFFE76FF 004CE9AA 46880006 E9037500 003DAA46 F˜=..u.Õ...F˜ÕL..v±.v=.v.jK.F¯.P 0000C0
0676FF08 76FF2076 FF2276FF 156A5016 B0468D05 6AAC76FF AE76FF00 0005129A ......vÛ.v¯j..F¯.Pj..v".v..v..v. 0000E0
C95F5E1F 0000E9AA 46880006 E9AA4688 0006E903 75000030 AA468900 0008AA9A .˜....F˜=..u.Õ...F˜Õ...F˜Õ...^_è 000100
8900000E 8A9A5016 FC468D24 76FF2676 FFD88E0E AA881E56 5700005A C80022CA ò".àZ..WV.|˜..Ä.v&.v$.F=.P.¤.... 000120
00000ED8 9A5016F8 468D2476 FF2676FF 00A0E9A6 46880006 E9037500 003DA646 F¦=..u.Õ...F¦Õ...v&.v$.F½.P.Û... 000140
16AC468D 4B6A0C76 FFFC76FF FE76FF00 7FE9A646 880006E9 03750000 3DA64689 .F¦=..u.Õ...F¦Õ...v±.v=.v.jK.F¯. 000160
76FF0876 FF2076FF 2276FF12 6A5016AC 468D036A F876FFFA 76FF0000 0F019A50 P......v*.v½j..F¯.Pj..v".v .v..v 000180
00000BE5 9A006A05 6AFC76FF FE76FF00 39E90375 00003DA6 46890000 0F219A06 ..|....F¦=..u.Õ9..v±.v=j.j..|... 0001A0
9A202068 006A006A 006A000C 681EFC76 FFFE76FF A876FFAA 76FFAA56 89A84689 .F´.V˙.v`.v´.v±.v=.hÉ.j.j.j.h  . 0001C0
4BB81E56 57000002 C80022CA C95F5E1F 0000E9A6 46880006 E90000B8 00000C09 ....|..Õ...F¦Õ...^_èò".à...WV.|K 0001E0
```

Dump of file SATURN:[PCCOMMON.DUMP.DLL]DAKEYDF.TMP;1 on 18-APR-1990 10:41:29.75
File ID (571,16,0)   End of file block 37 / Allocated 40

Virtual block number 12 (0000000C), 512 (0200) bytes

```
000036FF 26010806 8E006A00 6A00CC07 C726065E C4000407 C7260E5E C4D88E0F ..Äá^.&ú...á^.&ú.ä.j.j.....&.6.. 000000
C4830544 13FC9A14 76FF1676 FF013268 00000C38 9A0A76FF 0C76FF01 9668216A jih...v..v..;...h2..v..v..=.D..á 000020
76FF1076 FF1276FF 1476FF16 76FF003F E9FE4688 0006E903 75000030 FE468906 ..F±=..u.Õ...F±Õ?..v..v..v..v..v 000040
FE468800 06E90375 00003DFE 46890000 FFFF9A06 76FF0876 FF0A76FF 0C76FF0E ..v..v..v..v.......F±=..u.Õ...F± 000060
B81E5657 000002C8 0012CAC9 5F5E1F00 00E9FE46 88000107 C7260E5E C4000EE9 Õ..á^.&ú....F±Õ...^_èò..à...WV.| 000080
0036FF26 0108068E 006A006A 00CC07C7 26065EC4 000407C7 260E5EC4 D88E101F ...Äá^.&ú...á^.&ú.ä¯j.j.....&.6. 0000A0
83105C13 FC9A1476 FF1676FF 01336800 00104C9A 0A76FF0C 76FF0196 68226A00 .j"h...v..v..L...h3..v..v..=.\.. 0000C0
FF1076FF 1276FF14 76FF1676 FF003FE9 FE468800 06E90375 00003DFE 468906C4 á..F±=..u.Õ...F±Õ?..v..v..v..v.. 0000E0
46880006 E9037500 003DFE46 890000FF FF9A0676 FF0876FF 0A76FF0C 76FF0E76 v..v..v..v..v.......F±=..u.Õ...F 000100
1E565700 0002C800 12CAC95F 5E1F0000 E9FE4688 000107C7 260E5EC4 000EE9FE ±Õ..á^.&ú....F±Õ...^_èò..à...WV. 000120
36FF2601 08068E00 6A006A00 CC07C726 065EC400 0407C726 0E5EC4D8 8E10C0B8 |á..Äá^.&ú...á^.&ú.ä¯j.j.....&.6 000140
10FD13FC 9A1476FF 1676FF01 34680000 10ED9A0A 76FF0C76 FF019668 236A0000 ..j#h...v..v..Ú...h4..v..v..=.». 000160
1076FF12 76FF1476 FF1676FF 003FE9FE 46880006 E9037500 003DFE46 8906C483 .á..F±=..u.Õ...F±Õ?..v..v..v..v. 000180
880006E9 03750000 3DFE4689 0000FFFF 9A0676FF 0876FF0A 76FF0C76 FF0E76FF .v..v..v..v..v.......F±=..u.Õ... 0001A0
56570000 02C80012 CAC95F5E 1F0000E9 FE468800 0107C726 0E5EC400 0EE9FE46 F±Õ..á^.&ú....F±Õ...^_èò..à...WV 0001C0
FF260108 068E006A 006A0002 07C72606 5EC40004 07C7260E 5EC4D88E 1161B81E .|a..Äá^.&ú...á^.&ú.@¯j.j.....&. 0001E0
```

```
Dump of file SATURN:[PCCOMMON.DUMP.DLL]DAKEYDF.TMP;1 on 18-APR-1990 10:41:29.75
File ID (571,16,0)   End of file block 37 / Allocated 40

Virtual block number 13 (0000000D), 512 (0200) bytes

 9213FC9A 1476FF16 76FF013E 68000011 8E9A0A76 FF0C76FF 01966824 6A000036 6..j$h...v..v......h>..v..v..•.. 000000
 76FF1276 FF1476FF 1676FF00 5EE9FE46 880006E9 03750000 3DFE4689 06C48312 ..á..F±=..u.Õ...F±Õ^..v..v..v..v 000020
 0006E903 7500003D FE468900 00108E9A 0676FF08 76FF0A76 FF0C76FF 0E76FF10 ..v..v..v..v..v.......F±=..u.Õ.. 000040
 880006E9 03750000 3DFE4689 119E0C5A 9A000968 1476FF16 76FF0020 E9FE4688 .F±Õ-..v..v.h)..Z....F±=..u.Õ... 000060
 56570000 02C80012 CAC95F5E 1F0000E9 FE468800 0107C726 0E5EC400 0EE9FE46 F±Õ..á^.&ú....F±Õ...^_èÒ..à...WV 000080
 FF260108 068E006A 006A00D2 07C72606 5EC40004 07C7260E 5EC4D88E 1202881E .|...Äá^.&ú...á^.&ú.Ø.j.j.....&. 0000A0
 3F13FC9A 1476FF16 76FF013F 68000012 2F9A0A76 FF0C76FF 01966825 6A000036 6..j%h...v..v../...h?..v..v..•.? 0000C0
 76FF1276 FF1476FF 1676FF00 3FE9FE46 880006E9 03750000 3DFE4689 06C48312 ..á..F±=..u.Õ...F±Õ?..v..v..v..v 0000E0
 0006E903 7500003D FE468900 00112F9A 0676FF08 76FF0A76 FF0C76FF 0E76FF10 ..v..v..v..v..v../....F±=..u.Õ.. 000100
 57000002 C80012CA C95F5E1F 0000E9FE 46880001 07C7260E 5EC4000E E9FE4688 .F±Õ..á^.&ú....F±Õ...^_èÒ..à...W 000120
 26010806 8E006A00 6A000207 C726065E C4000407 C7260E5E C4D88E12 C2881E56 V.¡Ò..Äá^.&ú...á^.&ú.Ø.j.j.....& 000140
 13FC9A14 76FF1676 FF014068 000012EF 9A0A76FF 0C76FF01 9668266A 000036FF .6..j&h...v..v..ÿ...hã..v..v..•. 000160
 FF1276FF 1476FF16 76FF003F E9FE4688 0006E903 7500003D FE468906 C48312FF ...á..F±=..u.Õ...F±Õ?..v..v..v.. 000180
 06E90375 00003DFE 46890000 11D09A06 76FF0876 FF0A76FF 0C76FF0E 76FF1076 v..v..v..v..v..v..Å....F±=..u.Õ. 0001A0
 00001EC8 0012CAC9 5F5E1F00 00E9FE46 88000107 C7260E5E C4000EE9 FE468800 ..F±Õ..á^.&ú....F±Õ...^_èÒ..à... 0001C0
 03750000 3DE64689 00000F58 9A5016F0 468D0676 FF0876FF D88E1363 881E5657 WV.¡c..Ä.v..v..FÞ.P.[....F|=..u. 0001E0

Dump of file SATURN:[PCCOMMON.DUMP.DLL]DAKEYDF.TMP;1 on 18-APR-1990 10:41:29.75
File ID (571,16,0)   End of file block 37 / Allocated 40

Virtual block number 14 (0000000E), 512 (0200) bytes

 7500003D E6468900 000F7C9A 5016E846 8D0676FF 0876FF01 81E9E646 880006E9 Õ...F|Õ...v..v..FÒ.P.|....F|=..u 000000
 000030E6 46890000 0CD59A50 16F4468D 0676FF08 76FF0160 E9E6468B 0006E903 .Õ...F|Õ'..v..v..F¶.P.í....F|=.. 000020
 789A5016 E2468D06 6AF476FF F676FFE8 76FFEA76 FF013FE9 E6468800 06E90375 u.Õ...F|Õ?..vÕ.vÒ.v~.v¶j..Fã.P.x 000040
 0676FF08 76FF0081 E90A4688 0116E9E6 46880006 E9037500 003DE646 8900000B ....F|=..u.Õ...F|Õ...F.Õ...v..v. 000060
 8914F60E A29A5016 F8468DA5 F2000BB9 0716FC8B 004E8E16 EC83E276 FFE476FF .vÕ.vã.$./N..=..¿..·Ê.F%.P.Å.-.. 000080
 83E276FF E476FF06 76FF0876 FF0068E9 000AE9E6 46880006 E9037500 0030E646 F|=..u.Õ...F|ÕÕ.Õk..v..v..vÕ.vã. 0000A0
 03750000 3DE64689 13A00F43 9A5016F8 468DA5F2 000BB907 16FC8800 2CBE16EC $./,..•..¿..·Ê.F%.P.C....F|=..u. 0000C0
 03730132 3D0023E9 0026E9F8 4689FA46 89000088 0032E900 A1E9E646 880006E9 Õ...F|ÕÅ.Õ2.¡...F'.F%Õ&.Õ#.=2.s. 0000E0
 76FFFFCE E9FF98E9 03770140 3DFFD9E9 0373013E 3DFF6FE9 03770134 3DFFE9E9 ÕÕ.=4.w.Õo.=>.s.Õ1.=ã.w.Õ..Õö..v 000100
 C4004BE9 E6468800 06E90375 00003DE6 46890000 05E49A50 16EC468D 0676FF08 ..v..F$.P.Õ....F|=..u.Õ...F|ÕK.á 000120
 03A09A50 16FC468D 0A76FF06 76FF0876 FF025789 26078926 F65688F4 4688EC5E ^$.F¶.V-&..&.W..v..v..v..F•.P... 000140
 08478926 FA5688F8 4688FC5E C40017E9 E6468800 06E90375 00003DE6 46890000 ...F|=..u.Õ...F|Õ..á^•.F%.V'&.G. 000160
 76FF0E76 FF088E14 04881E56 57000068 C8CBC95F 5E1F0000 E9E64688 0A578926 &.W..F|Õ...^_èûãh..WV.¡...Ä.v..v 000180
 FF0E76FF 0290E9E6 46880006 E9037500 003DE646 89000014 359A5016 EA468D0C ..FÕ.P.5....F|=..u.Õ...F|Õ...v.. 0001A0
 0E76FF02 6FE9E646 880006E9 03750000 3DE64689 00001456 9A5016FC 468D0C76 v..F•.P.V....F|=..u.Õ...F|Õo..v. 0001C0
 5EC4024E E9E64688 0006E903 7500003D E6468900 0014149A 5016EE46 8D0C76FF .v..FŸ.P......F|=..u.Õ...F|ÕN.á^ 0001E0

Dump of file SATURN:[PCCOMMON.DUMP.DLL]DAKEYDF.TMP;1 on 18-APR-1990 10:41:29.75
File ID (571,16,0)   End of file block 37 / Allocated 40

Virtual block number 15 (0000000F), 512 (0200) bytes

 76FFF076 FF0007E4 46C7000A E846C701 A2E90A46 88078926 02478926 00008806 .|..&.G.&...F.ÕÅ.úFÒ..úFõ...vÞ.v 000000
 F076FF00 0AE446C7 000DE846 C701C8E9 0000166E 9A4B6A50 1698468D 0A76FFEE Ÿ.v..F..PjK.n...Õù.úFÒ..úFõ...vÞ 000020
 FF000CE4 46C70015 E846C701 A9E90000 04E29A48 6A501698 468D0A76 FFEE76FF .vŸ.v..F..PjK.ã...Õ`.úFÒ..úFõ... 000040
 08E446C7 0005E846 C70187E9 00001682 9A4B6A50 1698468D 0A76FFEE 76FFF076 vÞ.vŸ.v..F..PjK.ý...Õ..úFÒ..úFõ. 000060
 46C70003 E846C701 65E90000 16049A4B 6A501698 468D0A76 FFEE76FF F076FF00 ..vÞ.vŸ.v..F..PjK.å...Õe.úFÒ..úF 000080
 76FFF076 FF0143E9 0000164C 9A4B6A50 1698468D 0A76FFEE 76FFF076 FF0009E4 õ...vÞ.vŸ.v..F..PjK.L...ÕC..vÞ.v 0000A0
 000968EE 76FFF076 FFFA4689 00001700 9A006A00 6A006A00 6A016568 000968EE Ÿh).he.j.j.j.j.......F'.vÞ.vŸh). 0000C0
 F876FFEA 76FFEC76 FFF85689 F6468900 00092B9A 006A006A FA76FF00 6A016A68 hj.j..v'j.j..+....F-.V%.v$.vÕ.v% 0000E0
 012CE9E6 46880006 E9037500 003DE646 89000014 7F9A5016 F2468D05 6AF676FF .v~j..F·.P......F|=..u.Õ...F|Õ.. 000100
 06E90375 00003DE6 46890000 FFFF9A50 16E8468D F276FFF4 76FFEA76 FFEC76FF .v$.vÕ.v¶.v·.FÒ.P......F|=..u.Õ. 000120
 88065EC4 FF98E903 750FE87E 83F85689 F64689F4 5688F246 880105E9 E6468800 ..F|Õ...F·.V¶.F-.V%.~Õ.u.Õ..á^.. 000140
 FFF076FF 0006E446 C70002E8 46C7000A E9000088 02578926 078926F4 5688F246 F·.V¶&..&.W.|..ÕÕ.úFÒ..úFõ...vÞ. 000160
 078926FE 5688FC46 88065EC4 006AE900 000FA29A 50169846 8D4B6A0A 76FFEE76 vŸ.v.jK.F..P.Å...Õj.á^..F•.V±&.. 000180
 0018E903 76FE9AE9 03750081 30004BE9 009CE9E6 468800A2 E9000088 02578926 &.W.|..ÕÅ..F|Õ..ÕK.=..u.Õ.±v.Õ.. 0001A0
 03750087 3DFFCFE9 FF9AE903 7500763D FE41E903 7500733D FFCCE903 75006E3D =n.u.Õä.=s.u.ÕA±=v.u.Õ..ÕÜ.=..u. 0001C0
 468DFFAC E9FEC0E9 03750009 3DFEA6E9 03750004 3DFE8CE9 03750000 3DFE50E9 ÕP±=Å.u.Õ.±=å.u.Õ|±=).u.Õå±Õ¯..F 0001E0
```

Dump of file SATURN:[PCCOMMON.DUMP.DLL]DAKEYDF.TMP;1 on 18-APR-1990 10:41:29.75
File ID (571,16,0)   End of file block 37 / Allocated 40

Virtual block number 16 (00000010), 512 (0200) bytes

```
16984680 E876FFEA 76FFEC76 FF0033E9 03750000 3004C483 04A60000 9A501698 ..P...!..á.=..u.Õ3..vš.võ.vÒ.F.. 000000
0006E903 7500003D E6468900 000FC29A 0676FF08 76FFFC76 FFFE76FF E476FF50 P.vÕ.v±.v=.v..v..ô....F|=..u.Õ.. 000020
FFD88E15 87881E56 57000014 C8000ACA C95F5E1F 0000E9E6 46880006 E9E64688 .FlÕ...FlÕ...^_èò..à...WV.¡ñ..Ä. 000040
FF000002 F79A5016 FA468006 76FF0876 FF000016 099A5016 F6468006 76FF0876 v..v..F-.P......v..v..F*.P.%.... 000060
0000FFFF 9A5016EE 4680266A 1E6AFA76 FF000015 C79A5016 F2468006 76FF0876 v..v..F·.P.ú....v*j.j&.FŸ.P..... 000080
00008800 00FFFF9A 00F1681E EC76FFF6 76FFF876 FF0018E9 03750000 30EC4689 .F±=..u.Õ...v½.v~.v±.hþ......|.. 0000A0
FC468804 47892606 47892600 0088EE5E C4FE5689 FC4689F0 5688EE46 8800C7E9 Õú..FŸ.VÞ.F=.V±á^Ÿ¡..&.G.&.G..F= 0000C0
FF0876FF FC76FFFE 76FF08C4 83FFFF0F 259A0676 FF0876FF 50520020 05FE5688 .V±. .RP.v..v..%....á..v±.v=.v.. 0000E0
76FF0876 FF0000FF FF9AEE76 FFF076FF 0676FF08 76FF08C4 83194219 819A0676 v..Ÿ.B..á..v..v..vÞ.vŸ......v..v 000100
76FF0876 FF0000FF FF9A006A 006A0676 FF0876FF 0000FFFF 9AFFFF68 19626806 .hb.h........v..v.j.j.......v..v 000120
0876FF00 00FFFF9A FFFF6819 84680676 FF0876FF 0000FFFF 9AFFFF68 19736806 .hs.h........v..v.h..h.........v. 000140
9A000036 FF260108 068E0F6A 0676FF08 76FF0000 FFFF9AFF FF68148D 680676FF .v.h§.h........v..v.j.....&.6... 000160
0A468808 8E187888 1E565700 0004C800 04CAC95F 5E1F0000 E9000088 0000FFFF ....|..Õ...^_èò..à...WV.¡(..Ä.F. 000180
6A006AFF FF68FFFF 68FFFF68 FFFF6877 6A0676FF 0876FFFE 5689FC46 890C5688 .V..F=.V±.v.¯v.jwh..h..h..h..j.j 0001A0
006A016A FFFF68FF FF68FFFF 681A1668 766A0676 FF0876FF 00001A03 9A006A00 .j.......v..v.jvh..h..h..h..j.j. 0001C0
6A006A01 6AFFFF68 1B7568FF FF68FFFF 686E6A06 76FF0876 FF00001A 229A006A j.."....v..v.jnh..h..hu.h..j.j.j 0001E0
```

Dump of file SATURN:[PCCOMMON.DUMP.DLL]DAKEYDF.TMP;1 on 18-APR-1990 10:41:29.75
File ID (571,16,0)   End of file block 37 / Allocated 40

Virtual block number 17 (00000011), 512 (0200) bytes

```
006A006A 006AFFFF 68FFFF68 FFFF68FF FF68796A 0676FF08 76FF0000 1A419A00 ..A....v..v.jyh..h..h..h..j.j.j. 000000
00001A79 9A001668 1E016A00 6A006A00 6A006A70 6A0676FF 0876FF00 001A5C9A .\....v..v.jpj.j.j.j.j..h...y... 000020
0876FF00 001A979A 0016681E 016A006A 006AFFFF 68FFFF68 736A0676 FF0876FF .v..v.jsh..h..j.j.j..h........v. 000040
76FF0876 FF00001A 859A0016 681E006A FFFF68FF FF68006A 006A012C 680676FF .v.h,.j.j.h..h..j..h...ç....v..v 000060
680676FF 0876FF00 001AD39A 0016681E 006AFFFF 68FFFF68 006A006A 01206806 .h-.j.j.h..h..j..h...&....v..v.h 000080
00856806 76FF0876 FF00001A EF9A0016 681E006A FFFF68FF FF68006A 006A012E ..j.j.h..h..j..h...ÿ....v..v.h.. 0000A0
68FFFF68 00876806 76FF0876 FF00001B 0D9A0070 681E016A 006A006A 006A006A j.j.j.j.j..hp.......v..v.h..h..h 0000C0
FF68006A 006A0144 680676FF 0876FF00 001B2B9A 0070681E 006A006A 006AFFFF ..j.j.j..hp..+....v..v.hD.j.j.h. 0000E0
68FFFF68 006A006A 01456806 76FF0876 FF00001B 499A0070 681E006A FFFF68FF .h..j..hp..I....v..v.hE.j.j.h..h 000100
FFFF68FF FF68006A 006A0146 680676FF 0876FF00 001B679A 0070681E 006AFFFF ..j..hp..g....v..v.hF.j.j.h..h.. 000120
FFFF681B FD68FFFF 681B7B68 000A6806 76FF0876 FF00001B 879A0070 681E006A j..hp.......v..v.hÕ.h(.h..h».h.. 000140
260064B8 0A5EC40A 5F8C2608 47892600 4E880A5E C400001B C69A006A 006A006A j.j.j..ó...á^.¡N.&.G.&._.ó^.¡d.& 000160
0C5688DA 4688016A 006A006A 006A006A 00CC6806 76FF0876 FF0E5F8C 260C4789 .G.&._..v..v.hä.j.j.j.j¯j..F..V. 000180
88016A00 6A006A1C C8681CC5 6800D068 0676FF08 76FF0000 1BEB9A50 52000805 ...RP¯Š....v..v.hÅ.hé.hà.j.j.j.. 0001A0
681C2268 006A006A 01326806 76FF0876 FF00001C 109A5052 0008050C 56880A46 F..V....RP......v..v.h2.j.j.h".h 0001C0
6A006A01 33680676 FF0876FF 00001C35 9A505200 08050C56 880A4688 006AFFFF ..j..F..V....RP.5....v..v.h3.j.j 0001E0
```

Dump of file SATURN:[PCCOMMON.DUMP.DLL]DAKEYDF.TMP;1 on 18-APR-1990 10:41:29.75
File ID (571,16,0)   End of file block 37 / Allocated 40

Virtual block number 18 (00000012), 512 (0200) bytes

```
680676FF 0876FF00 001C5A9A 50520008 050C5688 0A468800 6AFFFF68 1C476800 .hG.h..j..F..V....RP.Z....v..v.h 000000
76FF0000 1C789A50 52000805 0C56880A 4688006A FFFF681C 6868006A 006A0134 4.j.j.hh.h..j..F..V....RP.x....v 000020
880A5EC4 00001C87 9A008668 1E016A00 6A006AFF FF681CEE 68000968 0676FF08 ..v.h).hŸ.h..j.j.j..h...ñ...á^.¡ 000040
D2680676 FF0876FF 1A5F8C26 18478926 0042880A 5EC4165F 8C261447 8926002C ,.&.G.&._.á^.¡8.&.G.&._..v..v.h@ 000060
76FF0876 FF00001C DC9A5052 0014050C 56880A46 88016A00 6A006A00 6A006A00 .j.j.j.j¯j..F..V....RP¯É....v..v 000080
00001D01 9A505200 14050C56 880A4688 016A006A 006AFFFF 68FFFF68 00046806 .hå.h..h..j.j.j..F..V....RP..... 0000A0
50520014 050C5688 0A468800 6AFFFF68 1D136800 6A006A01 3E680676 FF0876FF .v..v.h>.j.j.h..h..j..F..V....RP 0000C0
0C56880A 4688006A FFFF681D 3868006A 006A013F 680676FF 0876FF00 001D269A .&....v..v.h?.j.j.h8.h..j..F..V. 0000E0
88006AFF FF681925 68006A00 6A014068 0676FF08 76FF0000 1D489A50 52001405 ...RP.K....v..v.h@.j.j.h%.h..j.. 000100
6A006A00 6A006A00 6A7F6A06 76FF0876 FF00001D 669A5052 0014050C 56880A46 F..V....RP.f....v..v.j.j.j.j.j.j 000120
1E016A00 6A006AFF FF68FFFF 68008168 0676FF08 76FF0000 FFFF9A00 9C681E01 ..h........v..v.h..h..h..j.j.j.. 000140
9C681E00 6AFFFF68 FFFF6800 6A006A01 38680676 FF0876FF 00001DA2 9A009C68 h...Å....v..v.h;.j.j.h..h..j..h. 000160
9A009C68 1E006AFF FF68FFFF 68006A00 6A013C68 0676FF08 76FF0000 1DC09A00 ..å....v..v.h<.j.j.h..h..j..h... 000180
1DFC9A00 9C681E00 6AFFFF68 FFFF6800 6A006A01 30680676 FF0876FF 00001DDE 8....v..v.h=.j.j.h..h..j..h...=. 0001A0
00001E1A 9A006A00 6A006A00 6A006A1E 00681E0A 68009068 0676FF08 76FF0000 ...v..v.h..h..h..j.j.j.j.j...... 0001C0
76FF0000 1E389A00 6A006A00 6A006A00 6A1E2868 1E286800 9E680676 FF0876FF .v..v.h..h(.h+.j.j.j.j.j..8....v 0001E0
```

```
Dump of file SATURN:[PCCOMMON.DUMP.DLL]DAKEYDF.TMP;1 on 18-APR-1990 10:41:29.75
File ID (571,16,0)   End of file block 37 / Allocated 40

Virtual block number 19 (00000013), 512 (0200) bytes

 FF0876FF 00001E56 9A006A00 6A006A00 6A006A1E 49681E46 68009C68 0676FF08 ..v.h..hF.hI.j.j.j.j.j..V....v.. 000000
 0676FF08 76FF0000 1E749A00 6A006A00 6A006A00 6A1E6768 1E646800 A0680676 v.h..hd.hg.j.j.j.j.j..t....v..v. 000020
 9F680676 FF0876FF 00001E92 9A006A00 6A006A00 6A006A1E 85681E82 6800A168 hÀ.h..h..j.j.j.j.j.......v..v.h. 000040
 02030070 90C8C95F 5E1F0000 19E49A00 6A006A00 6A006A00 6AFFFF68 FFFF6800 .h..h..j.j.j.j.j..ö....^_èù.p... 000060
 02020366 00071AA9 020201D1 00061957 02030860 00011B7E 000502C8 000705CE ö...à...~...`...W...Ì...¨...f... 000080
 02050444 0008061A 02030000 000119F1 00020153 0006189B 020302E6 00071A10 ....Ì.......S...þ...........D... 0000A0
 0002007F 000116F0 010302A6 00071DEF 0205006E 00030D85 020303A5 00071D99 ....Ê.......n...ÿ...Ì...Þ....... 0000C0
 02020004 00010486 0103025C 00060436 02030301 00071271 02030000 00021911 ........q...Ì...6...\........... 0000E0
 000501DF 00061979 02030087 000117AD 01030320 00071A38 02050370 00071AFD »...p...8...-...Ù.......y...ö... 000100
 02030162 000615E8 020303B0 000710D5 02050000 00041826 0002066F 000119F4 ¶...o...&.......f...¯...ö...b... 000120
 0002030B 000713D2 0203008B 00011000 0103007A 0003172B 020300EA 00051851 Q...ö...+...z...........ø...Ù... 000140
 010311FA 00011CF1 00050579 00011945 0005037B 0007181F 02020000 000519B9 ¿...........(...E...y...þ...*... 000160
 0203038B 00071DB7 0205033B 00071A32 0205000B 000218BC 02030013 0001046D m.......¥.......2...;...ñ...£... 000180
 01030000 00011965 000501EF 00061968 02030087 000300A1 020303E5 00071331 1...Ì...À.......h...ÿ...e....... 0001A0
 010300FA 00050993 02030172 000618AB 02030385 00071B5B 02020019 00010FDC É.......[.......¨...r.......*... 0001C0
 02050347 00071A6C 020503C6 000718D7 02050276 00061690 0203009D 00011390 ............v...■...6...l...G... 0001E0

Dump of file SATURN:[PCCOMMON.DUMP.DLL]DAKEYDF.TMP;1 on 18-APR-1990 10:41:29.75
File ID (571,16,0)   End of file block 37 / Allocated 40

Virtual block number 20 (00000014), 512 (0200) bytes

 0203038F 00071B3D 02020093 00031752 020302F2 0007060D 020302C8 00071905 Ì...à...Ì...·...R........*....... 000000
 02030352 00071A8E 0205010A 00050776 020301FF 0006198A 0203017E 0006188B ....~............v...........R... 000020
 02021017 00011C00 000502D6 0007190B 02050399 00071D74 0202001D 00030977 w.......t.......Ù...ø........... 000040
 02030305 000706A3 0203035C 00071ACA 020500A1 000309E0 0203031C 000719F7 %.......À...À...ð...\...Ê....... 000060
 020203A5 00071D96 02020029 000309F1 02030210 0006194B 0203018E 0006004E N.......H.......þ...)........Ê... 000080
 0203032D 00071A35 020202E6 00071A13 02050366 00071AAC 020502A6 00071DEC ‡...Ì...¯...f.......Ì...5...-... 0000A0
 02030295 000718D9 020303B0 00071D02 02020034 00030CB4 02030084 000300AB ¨...Ç...Ç...4...ø...¯...Ì....... 0000C0
 02030681 00011A19 00050370 00071B00 0205021F 00061937 0203011F 00060E36 6.......7...........p.......Ý... 0000E0
 000510B8 00011C25 000503BB 00071DB4 0202033B 00071A2F 020201A2 0006052F /...À.../...;...Ç...£...%...|... 000100
 020302A6 00070A29 0203022E 0006056B 0203037B 00071B22 0205128A 00011D16 ....¤..."...(...k.......)...Ì... 000120
 00050347 00071A69 020203C6 000718D4 020201AF 0006154A 0203012E 000619A0 ........J...£...å...6...i...G... 000140
 02030385 0007185E 02050745 00011B78 000502C8 00071902 02020444 00011987 ....D...ø...à...x...E...^....... 000160
 0203038F 00071B40 02050352 00071A88 02020130 0006157E 02030054 00030DE5 Ì...T...-...*.......R...@....... 000180
 020202D6 000719D8 02020242 00060161 020302B9 000706F9 020301C0 00061D84 ....å...'...¿...a...B...Ã...ø... 0001A0
 02030399 00071D77 02051159 00011C4A 000502D9 00011976 0005035C 00071AC7 ú...\...v...Ì...J...Y...w....... 0001C0
 0000031C 000719FA 0205135B 00011D3B 00050C5A 00011C6B 00050062 000309B1 Ý...b...k...Z...;...[...*....... 0001E0

Dump of file SATURN:[PCCOMMON.DUMP.DLL]DAKEYDF.TMP;1 on 18-APR-1990 10:41:29.75
File ID (571,16,0)   End of file block 37 / Allocated 40

Virtual block number 21 (00000015), 512 (0200) bytes

 3DF84689 0000FFFF 9A5016FA 468D0A76 FF0C76FF D88EFFFF B81E5657 00000CC8 à...WV.|...Ä.v..v..F*.P......F½= 000000
 000030F8 46890000 FFFF9A50 16F4468D FA76FF00 68E9F846 880006E9 03750000 ..u.Õ...F½Ök..v*.F¶.P......F½=.. 000020
 0030F846 890000FF FF9A5016 FC468DF4 76FFF676 FF004DE9 F8468800 06E90375 u.Õ...F½ÖM..v-.v¶.F=.P......F½=. 000040
 E9037510 56390008 E903740E 4639FE56 88FC4688 002CE9F8 46880006 E9037500 .u.Õ...F½Õ,..F=.V±9F.t.Õ..9V.u.Õ 000060
 000CC8C8 C95F5E1F 0000E9FF FF066F9A 766AF476 FFF676FF 0010E900 00880006 ..|..Õ...v-.v¶jv.o...Õ...^_èùà.. 000080
 75000030 F8468900 0000189A 5016FA46 800A76FF 0C76FFD8 8E000888 1E565700 .WV.|...Ä.v..v..F*.P......F½=..u 0000A0
 E9037500 0030F846 89000000 369A5016 F4468DFA 76FF0087 E9F84688 0006E903 .Õ...F½Õ...v*.F¶.P.6....F½=..u.Õ 0000C0
 03750000 3DF84689 00000057 9A5016FC 468DF476 FFF676FF 0069E9F8 46880006 ...F½Õ|..v-.v¶.F=.P.W....F½=..u. 0000E0
 B80006E9 03751056 390008E9 03740E46 39FE5688 FC468800 48E9F846 880006E9 Õ...F½ÕH..F=.V±9F.t.Õ..9V.u.Õ..| 000100
 10E9F846 880006E9 03750000 3DF84689 0000FFFF 9AF476FF F676FF00 2CE90000 ..Õ,..v-.v¶......F½=..u.Õ...F½Õ. 000120
 00A5B81E 56570000 0CC8C8C9 5F5E1F00 00E90000 FFFF9A6E 6AF476FF F676FF00 ..v-.v¶jn.....Õ...^_èùà...WV.|Ê. 000140
 F8468800 06E90375 00003DF8 46890000 00B59A50 16FA468D 0A76FF0C 76FFD88E .Ä.v..v..F*.P.ç....F½=..u ↑...F½ 000160
 4DE9F846 880006E9 03750000 3DF84689 00000003 9A5016F4 468DFA76 FF0068E9 Õk..v*.F¶.P.Æ....F½=..u.Õ. .F½ÖM 000180
 E9F84688 0006E903 7500003D F8468900 0000F49A 5016FC46 8DF476FF F676FF00 ..v-.v¶.F=.P.¶....F½=..u.Õ...F½Õ 0001A0
 76FF0010 E9000088 0006E903 75105639 0008E903 740E4639 FE5688FC 4688002C ,..F=.V±9F.t.Õ..9V.u.Õ..|..Õ...v 0001C0
 FFD88E01 5EB81E56 57000010 C8C8C95F 5E1F0000 E9FFFFB8 0000FFFF 9A006AFA *j......|..Õ...^_èùà...WV.|^..Ä. 0001E0
```

```
Dump of file SATURN:[PCCOMMON.DUMP.DLL]DAKEYDF.TMP;1 on 18-APR-1990 10:41:29.75
File ID (571,16,0)   End of file block 37 / Allocated 40

Virtual block number 22 (00000016), 512 (0200) bytes

 0094E9F4 46880006 E9037500 003DF446 89000001 6E9A5016 F6468D0A 76FF0C76 v..v..F-.P.n....F¶=..u.Õ...F¶Õ.. 000000
 76FF0076 E9F44688 0006E903 7500003D F4468900 00018C9A 5016F046 8DF676FF .v-.Fb.P......F¶=..u.Õ...F¶Õv..v 000020
 FF0055E9 F4468800 06E90375 00003DF4 46890000 01AD9A50 16FC468D F076FFF2 ·.vb.F=.P.Ù....F¶=..u.Õ...F¶ÕU.. 000040
 E9037500 003DF446 890000FF FF9A5016 F8468D03 6AFC76FF FE76FF0A 76FF0C76 v..v..v±.v=j..F½.P......F¶=..u.Õ 000060
 00880006 E9037510 56390008 E903740E 4639FA56 8BF84688 002CE9F4 46880006 ...F¶Õ,..F½.V¹9F.t.Õ..9V.u.Õ..|. 000080
 1E565700 0010C8C8 C95F5E1F 0000E900 00FFFF9A 796AF076 FFF276FF 0010E900 .Õ...v·.vbjy.....Õ...^ èùà...WV. 0000A0
 0006E903 7500003D F0468900 0002089A 5016FA46 8D0A76FF 0C76FF08 8E01FB88 |=..Ä.v..v..F¹.P......Fb=..u.Õ.. 0000C0
 46880006 E9037500 003DF046 89000002 299A5016 F2468DFA 76FF00C8 E9F04688 .FbÕù..v¹.F·.P.)....Fb=..u.Õ...F 0000E0
 880006E9 03750000 3DF04689 0000024A 9A5016FC 468DF276 FFF476FF 00ADE9F0 bÕU..v¶.v·.F=.P.J....Fb=..u.Õ... 000100
 0006E903 7500003D F0468900 00FFFF9A 5016F646 8DF276FF F476FF00 8CE9F046 FbÕ...v¶.v·.F-.P......Fb=..u.Õ.. 000120
 8BFC4688 001CE903 75105639 0008E903 740E4639 FE568BFC 46880068 E9F04688 .FbÕk..F=.V±9F.t.Õ..9V.u.Õ...F=. 000140
 706AF676 FFF876FF 0039E900 00880006 E9037514 56390008 E9037412 4639FE56 V±9F.t.Õ..9V.u.Õ..|..Õ9..v½.v-jp 000160
 00FFFF9A 006A006A 006A006A 016E6873 6AF676FF F876FF00 00FFFF9A 00FE681E .h±.......v½.v-jshn.j.j.j.j..... 000180
 02C1B81E 56570000 18C8C8C9 5F5E1F00 00E90000 FFFF9A73 6AF276FF F476FF00 ..v¶.v·js.....Õ...^ èùà...WV.jè. 0001A0
 EC468800 06E90375 00003DEC 46890000 02D19A50 16F64680 0A76FF0C 76FFD88E .Ä.v..v..F-.P.i....Fš=..u.Õ...F& 0001C0
 08E9EC46 880006E9 03750000 3DEC4689 000002EF 9A5016E8 468DF676 FF0129E9 Õ)..v-.FÒ.P.ÿ....Fš=..u.Õ...FšÕ. 0001E0

Dump of file SATURN:[PCCOMMON.DUMP.DLL]DAKEYDF.TMP;1 on 18-APR-1990 10:41:29.75
File ID (571,16,0)   End of file block 37 / Allocated 40

Virtual block number 23 (00000017), 512 (0200) bytes

 E9EC4688 0006E903 7500003D EC468900 0003109A 5016FC46 8DE876FF EA76FF01 ..võ.vÒ.F=.P......F&=..u.Õ...F&Õ 000000
 EC468800 06E90375 00003DEC 46890000 03319A50 16F2468D E876FFEA 76FF00EA õ..võ.vÒ.F·.P.1....F&=..u.Õ...F& 000020
 003DEC46 890000FF FF9A5016 F8468D07 6AFC76FF FE76FF0A 76FF0C76 FF00C9E9 Õè..v..v..v±.v=j..F½.P......F&=. 000040
 C404EE46 830004E9 F05689EE 4689FA56 8BF84688 00A0E9EC 46880006 E9037500 .u.Õ...F&Õ...F½.V¹.FŸ.VbÕ...FŸ.6 000060
 260053E9 03740739 2610568B 0E4688EE 5EC40067 E9037502 47082607 8B26EE5E ^Ÿ&..&.G.u.Õg.6^Ÿ.F..V.&9.t.ÕS.& 000080
 6AF276FF F476FF00 0005029A F876FFFA 76FF0A76 FF0C76FF 004AE903 74025739 9W.t.ÕJ..v..v..v¹.v½......v¶.v·j 0000A0
 03909A00 6A006A00 6A006A01 6E68736A F276FFF4 76FF0000 03859A00 FF681E70 p.h........v¶.v·jshn.j.j.j.j.... 0000C0
 76FFFA76 FF0A76FF 0C76FFFF 86E9001A E9000003 AA9A736A E876FFEA 76FF0000 ...võ.vÒjs.¨...Õ..Õ...v..v..v¹.v 0000E0
 0C76FFD8 8E038EB8 1E565700 0010C8C8 C95F5E1F 0000E900 00880000 FFFF9AF8 ½.....|..Õ...^ èùà...WV.|f..Ä.v. 000100
 76FF00CE E9F04688 0006E903 7500003D F0468900 0003CE9A 5016FA46 8D0A76FF .v..F¹.P.ö....Fb=..u.Õ...FbÕö..v 000120
 FFF476FF 00B0E9F0 46880006 E9037500 003DF046 89000003 EC9A5016 F2468DFA ¹.F·.P.&....Fb=..u.Õ...FbÕ¯..v¶. 000140
 F476FF00 8FE9F046 880006E9 03750000 3DF04689 00000400 9A5016FC 468DF276 v·.F=.P......Fb=..u.Õ...FbÕ...v¶ 000160
 4688006E E9F04688 0006E903 7500003D F0468900 00042E9A 5016F646 8DF276FF .v·.F-.P......Fb=..u.Õ...FbÕn..F 000180
 E9037412 4639FE56 8BFC4688 001CE903 75105639 0008E903 740E4639 FE5688FC =.V±9F.t.Õ..9V.u.Õ...F=.V±9F.t.Õ 0001A0
 04C69A01 00681E00 8568F676 FFF876FF 003CE900 00880006 E9037514 56390008 ..9V.u.Õ..|..Õ<..v½.v-h...h...6. 0001C0
 76FFF476 FF000004 DE9A006A 006A006A 006A016E 68008768 F676FFF8 76FF0000 ...v½.v-h..hn.j.j.j.j..8....v¶.v 0001E0

Dump of file SATURN:[PCCOMMON.DUMP.DLL]DAKEYDF.TMP;1 on 18-APR-1990 10:41:29.75
File ID (571,16,0)   End of file block 37 / Allocated 40

Virtual block number 24 (00000018), 512 (0200) bytes

 0C76FFD8 8E051988 1E565700 0018C8C8 C95F5E1F 0000E900 00FFFF9A 008768F2 ·h.......Õ...^ èùà...WV.|.. ˜.v. 000000
 76FF012C E9EC4688 0006E903 7500003D EC468900 0005299A 5016F246 8D0A76FF .v..F·.P.)....F&=..u.Õ...F&Õ,..v 000020
 FFEA76FF 010EE9EC 46880006 E9037500 003DEC46 89000005 479A5016 E8468DF2 ·.FÒ.P.G....F&=..u.Õ...F&Õ...võ. 000040
 EA76FF00 EDE9EC46 880006E9 03750000 3DEC4689 00000568 9A5016FC 468DE876 vÒ.F=.P.h....F&=..u.Õ...F&ÕÙ..võ 000060
 76FF00CC E9EC4688 0006E903 7500003D EC468900 0005899A 5016EE46 8DE876FF .vÒ.FŸ.P......F&=..u.Õ...F&Õë..v 000080
 06E90375 00003DEC 46890000 04579A50 16F8468D 0A6AFC76 FFFE76FF 0A76FF0C ..v..v±.v=j..F½.P.W....F&=..u.Õ. 0000A0
 078826F4 5EC404F4 46830004 E9F65689 F44689FA 568BF846 8800A3E9 EC468800 ..F&ÕÈ..F½.V¹.F¶.V-Õ...F¶.6^¶&.. 0000C0
 03740257 39260056 E9037407 39261056 880E4688 F45EC400 6AE90375 02470826 &.G.u.Õj.6^¶.F..V.&9.t.ÕV.&9W.t. 0000E0
 01681E00 8568EE76 FFF076FF 00000760 9AF876FF FA76FF0A 76FF0C76 FF004DE9 ÕM..v..v..v¹.v½.'....vb.vŸh...h. 000100
 FF000005 F79A006A 006A006A 006A016E 68008768 EE76FFF0 76FF0000 05DE9A01 ..8....vb.vŸh..hn.j.j.j.j..%.... 000120
 9AF876FF FA76FF0A 76FF0C76 FFFF83E9 001AE900 0006059A 008768E8 76FFEA76 võ.vÒh.......Õ..Õ...v..v..v¹.v½. 000140
 76FF0C76 FFD88E06 19881E56 57000010 C8C8C95F 5E1F0000 E9000088 000004B5 ç...|..Õ...^ èùà...WV.|...Ä.v..v 000160
 8DFA76FF 00CDE9F0 46880006 E9037500 003DF046 89000006 299A5016 FA468D0A ..F¹.P.)....Fb=..u.Õ...FbÕë..v¹. 000180
 F276FFF4 76FF00AF E9F04688 0006E903 7500003D F0468900 0006479A 5016F246 F·.P.G....Fb=..u.Õ...FbÕ£..v¶.v· 0001A0
 76FFF476 FF008EE9 F0468800 06E90375 00003DF0 46890000 06689A50 16FC468D .F=.P.h....Fb=..u.Õ...FbÕ...v¶.v 0001C0
 8BFC4688 006DE9F0 46880006 E9037500 003DF046 89000006 899A5016 F6468DF2 ·.F-.P......Fb=..u.Õ...FbÕm..F=. 0001E0
```

```
Dump of file SATURN:[PCCOMMON.DUMP.DLL]DAKEYDF.TMP;1 on 18-APR-1990 10:41:29.75
File ID (571,16,0)   End of file block 37 / Allocated 40

Virtual block number 25 (00000019), 512 (0200) bytes

 0008E903 74124639 FE5688FC 4688001C E9037510 56390008 E903740E 4639FE56 V±9F.t.Õ..9V.u.Õ...F=.V±9F.t.Õ.. 000000
 FF000007 229A0102 681E7F6A F676FFF8 76FF0038 E90000B8 0006E903 75145639 9V.u.Õ..|..Õ;..v½.v-j..h...".... 000020
 8168F276 FFF476FF 0000073B 9A006A00 6A006A00 6A016E68 008168F6 76FFF876 v½.v-h..hn.j.j.j.j..;....v¶.v·h. 000040
 0A76FF0C 76FFD88E 0777B81E 56570000 18C8CBC9 5F5E1F00 00E90000 FFFF9A00 ......Õ...^_èùà...WV.|w..Ä.v..v. 000060
 468DF276 FF012BE9 EC468800 06E90375 000030EC 46890000 07879A50 16F2468D .F·.P......Fš=..u.Õ...FšÕ+..v·.F 000080
 8DE876FF EA76FF01 0DE9EC46 880006E9 03750000 3DEC4689 000007A5 9A5016E8 Ò.P.Ê....Fš=..u.Õ...FšÕ...võ.vÒ. 0000A0
 E876FFEA 76FF00EC E9EC4688 0006E903 7500003D EC468900 0007C69A 5016FC46 F=.P.ó....Fš=..u.Õ...FšÕš..võ.vÒ 0000C0
 76FF0C76 FF00C8E9 EC468800 06E90375 000030EC 46890000 07E79A50 16EE468D .FŸ.P.Ó....Fš=..u.Õ...FšÕù..v..v 0000E0
 46880006 E9037500 0030EC46 89000006 829A5016 F8468D0C 6AFC76FF FE76FF0A ..v±.v=j..F½.P.ý....Fš=..u.Õ...F 000100
 47082607 8B26F45E C404F446 830004E9 F65689F4 4689FA56 88F84688 00A2E9EC šÕÄ..F½.V°.F¶.V-Õ...F¶.á^¶&..&.G 000120
 004CE903 74025739 260055E9 03740739 26105688 0E4688F4 5EC40069 E9037502 .u.Õi.á^¶.F..V.&9.t.ÕU.&9W.t.ÕL. 000140
 08389A01 03681E7F 6AEE76FF F076FF00 00098C9A F876FFFA 76FF0A76 FF0C76FF .v..v..v°.v½.¥....vÞ.vŸj..h...;. 000160
 76FFEA76 FF000008 549A006A 006A006A 006A016E 68008168 EE76FFF0 76FF0000 ...vÞ.vŸh..hn.j.j.j.j..T....võ.v 000180
 00000710 9AF876FF FA76FF0A 76FF0C76 FFFF84E9 001AE900 0008629A 008168E8 Òh...b...Õ..Õ...v..v..v°.-½..... 0001A0
 FA468D0A 76FF0C76 FFD88E08 76881E56 5700000C C8CBC95F 5E1F0000 E90000B8 |..Õ...^_èùà...WV.|v..Ä.v. v..F° 0001C0
 5016F446 8DFA76FF 006CE9F8 46880006 E9037500 0030F846 89000008 869A5016 .P......F½=..u.Õ...F½Õl..v· ¯¶.P 0001E0
```
```
Dump of file SATURN:[PCCOMMON.DUMP.DLL]DAKEYDF.TMP;1 on 18-APR-1990 10:41:29.75
File ID (571,16,0)   End of file block 37 / Allocated 40

Virtual block number 26 (0000001A), 512 (0200) bytes

 16FC468D F476FFF6 76FF004E E9F84688 0006E903 7500003D F8468900 0008A49A .Ê....F½=..u.Õ...F½ÕN..v-.v¶.F=. 000000
 0E4639FE 5688FC46 88002DE9 F8468800 06E90375 000030F8 46890000 08C59A50 P.é....F½=..u.Õ...F½Õ-..F=.V±9F. 000020
 9307459A 00DA68F4 76FFF676 FF0011E9 00008800 06E90375 10563900 08E90374 t.Õ..9V.u.Õ..|..Õ...v-.v¶hÕ..E.. 000040
 5016FA46 8D0A76FF 0C76FFD8 8E090388 1E565700 0010C8CB C95F5E1F 0000E900 .Õ...^_èùà...WV.|Æ..Ä.v..v..F°.P 000060
 019A5016 F2468DFA 76FF00CE E9F04688 0006E903 7500003D F0468900 0009E39A .Ð....FÞ=..u.Õ...FÞÕö..v°.F·.P.. 000080
 9A5016FC 468DF276 FFF476FF 0080E9F0 46880006 E9037500 0030F046 8900000A ....FÞ=..u.Õ...FÞÕ¯..v¶.v·.F=.P. 0000A0
 5016F646 8DF276FF F476FF00 8FE9F046 880006E9 03750000 3DF04689 00000A22 ".....FÞ=..u.Õ...FÞÕ...v¶.v·.F-.P 0000C0
 740E4639 FE5688FC 4688006E E9F04688 0006E903 7500003D F0468900 0008E69A .|....FÞ=..u.Õ...FÞÕn..F=.V±9F.t 0000E0
 E9037514 56390008 E9037412 4639FE56 88FC4688 001CE903 75105639 0008E903 .Õ..9V.u.Õ...F=.V±9F.t.Õ..9V.u.Õ 000100
 F676FFF8 76FF0000 097E9A01 04681E00 CC68F676 FFF876FF 003CE900 00880006 ..|..Õ<..v½.v-hë..h...-....v½.v- 000120
 00FFFF9A 000068F2 76FFF476 FF000009 979A006A 006A006A 006A016E 68000068 hÅ.hn.j.j.j.j.......v¶.v·hÅ..... 000140
 5016F646 8D0A76FF 0C76FFD8 8E0A7188 1E565700 0018C8CB C95F5E1F 0000E900 .Õ...^_èùà...WV.|q..Ä.v..v..F-.P 000160
 9F9A5016 E8468DF6 76FF012C E9EC4688 0006E903 7500003D EC468900 000A819A ......Fš=..u.Õ...FšÕ,..v-.FÒ.P.. 000180
 9A5016FC 468DE876 FFEA76FF 010EE9EC 46880006 E9037500 0030EC46 8900000A ....Fš=..u.Õ...FšÕ...võ.vÒ.F=.P. 0001A0
 5016F246 8DE876FF EA76FF00 EDE9EC46 880006E9 03750000 30EC4689 00000AC0 å....Fš=..u.Õ...FšÕÜ..võ.vÒ.F·.P 0001C0
 FFFE76FF 0A76FF0C 76FF00CC E9EC4688 0006E903 7500003D EC468900 000AE19A .Ä....Fš=..u.Õ...FšÕä..v..v..v±. 0001E0
```
```
Dump of file SATURN:[PCCOMMON.DUMP.DLL]DAKEYDF.TMP;1 on 18-APR-1990 10:41:29.75
File ID (571,16,0)   End of file block 37 / Allocated 40

Virtual block number 27 (0000001B), 512 (0200) bytes

 8800A3E9 EC468800 06E90375 000030EC 46890000 090F9A50 16F8468D 086AFC76 v=j..F½.P......Fš=..u.Õ...FšÕÈ.. 000000
 6AE90375 02470826 078826EE 5EC404EE 46830004 E9F05689 EE4689FA 5688F846 F½.V°.FŸ.VÞÕ...FŸ.á^Ÿ&..&.G.u.Õj 000020
 76FF0C76 FF004DE9 03740257 39260056 E9037407 39261056 880E4688 EE5EC400 .á^Ÿ.F..V.&9.t.ÕV.&9W.t.ÕM..v..v 000040
 76FF0000 08369A01 05681E00 CC68F276 FFF476FF 00000C88 9AF876FF FA76FF0A ..v°.v½.|....v¶.v·hë..h...ó....v 000060
 000068E8 76FFEA76 FF000008 4F9A006A 006A006A 006A016E 68000068 F276FFF4 ¶.v·hÅ.hn.j.j.j.j..O....võ.vÒhÅ. 000080
 E90000B8 0000096D 9AF876FF FA76FF0A 76FF0C76 FFFF83E9 001AE900 0008509A .J...Õ..Õ...v..v..v°.v½.m...|..Õ 0000A0
 819A5016 FA468D0A 76FF0C76 FFD88E08 71881E56 57000010 C8CBC95F 5E1F0000 ...^_èùà...WV.|q..Ä.v..v..F°.P.. 0000C0
 00089F9A 5016F246 8DFA76FF 00CEE9F0 46880006 E9037500 0030F046 89000008 ....FÞ=..u.Õ...FÞÕö..v°.F·.P.... 0000E0
 08C09A50 16FC468D F276FFF4 76FF0080 E9F04688 0006E903 7500003D F0468900 ..FÞ=..u.Õ...FÞÕ¯..v¶.v·.F=.P.å. 000100
 E19A5016 F6468DF2 76FFF476 FF008FE9 F0468800 06E90375 000030F0 46890000 ...FÞ=..u.Õ...FÞÕ...v¶.v·.F-.P.Ä 000120
 E903740E 4639FE56 88FC4688 006EE9F0 46880006 E9037500 0030F046 89000008 ....FÞ=..u.Õ...FÞÕn..F=.V±9F.t.Õ 000140
 0006E903 75145639 0008E903 74124639 FE5688FC 4688001C E9037510 56390008 ..9V.u.Õ...F=.V±9F.t.Õ..9V.u.Õ.. 000160
 D468F676 FFF876FF 00000C7A 9A010668 1E000268 F676FFF8 76FF003C E90000B8 |..Õ<..v½.v-h®..h...z....v½.v-hå 000180
 E900000C A19A0004 68F276FF F476FF00 000C939A 006A006A 006A006A 016E6800 .hn.j.j.j.j.......v¶.v·hå..À...Õ 0001A0
 0F9A5016 FA468D0A 76FF0C76 FFD88E0C CF881E56 57000018 C8CBC95F 5E1F0000 ...^_èùà...WV.|Ü..Ä.v..v..F°.P.Õ 0001C0
 000CFD9A 5016E846 8DFA76FF 012CE9EC 46880006 E9037500 0030EC46 8900000C ....Fš=..u.Õ...FšÕ,..v°.FÒ.P.».. 0001E0
```

Dump of file SATURN:[PCCOMMON.DUMP.DLL]DAKEYDF.TMP;1 on 18-APR-1990 10:41:29.75
File ID (571,16,0)   End of file block 37 / Allocated 40

Virtual block number 28 (0000001C), 512 (0200) bytes

```
 0D1E9A50 16FC468D E876FFEA 76FF010E E9EC4688 0006E903 7500003D EC468900 ..F$=..u.Ô...F$Ô...vÔ.v( ".P... 000000
 3F9A5016 F2468DE8 76FFEA76 FF00EDE9 EC468800 06E90375 00003DEC 46890000 ...F$=..u.Ô...F$ÔÚ..vÔ.v(.¨·.P.? 000020
 FC76FFFE 76FF0A76 FF0C76FF 00CCE9EC 46880006 E9037500 003DEC46 89000000 ....F$=..u.Ô...F$Ôä..v..v..v±.v= 000040
 F6468800 A3E9EC46 880006E9 03750000 3DEC4689 00000C0A 9A5016F6 468D096A j..F-.P......F$=..u.Ô...F$ÔÈ..F- 000060
 C4006AE9 03750247 08260788 26EE5EC4 04EE4683 0004E9F0 5689EE46 89F8568B .V½.FŸ.VÞÔ...FŸ.á^Ÿ&..&.G.u.Ôj.á 000080
 FF0A76FF 0C76FF00 4DE90374 02573926 0056E903 74073926 1056880E 4688EE5E ^Ÿ.F..V.&9.t.ÔV.&9W.t.ÔM..v..v.. 0000A0
 FFF476FF 00000D94 9A010768 1E00D268 F276FFF4 76FF0000 0F169AF6 76FFF876 v½.v-......v¶.v·h@..h........v¶. 0000C0
 889A0004 68E876FF EA76FF00 000DAD9A 006A006A 006A006A 016E6800 D468F276 v·hå.hn.j.j.j.j..Ù....vÔ.vÒhå..£ 0000E0
 0000E900 00880000 0C689AF6 76FFF876 FF0A76FF 0C76FFFF 83E9001A E9000000 ...Ô..Ô...v..v..v½.v-.h...¡..Ô.. 000100
 00FFFF9A 5016FE46 8D0676FF 0876FFD8 8E0DCFB8 1E565700 0008C8CB C95F5E1F .^ èùà...WV.¡ü..Ä.v..v..F±.P.... 000120
 FFFF9A50 16FA468D 0676FF08 76FF02EE E9F8468B 0006E903 7500003D F8468900 ..F½=..u.Ô...F½ÔŸ..v..v..Fº.P.... 000140
 880A468B FA76FFFC 76FFFE76 FF02CDE9 F8468800 06E90375 00003DF8 46890000 ...F½=..u.Ô...F½Ôë..v±.v=.vº.F.. 000160
 0A5EC402 A3E9F846 880006E9 03750000 3DF84689 0000FFFF 9A505200 02050C56 V....RP......F½=..u.Ô...F½ÔÈ.á^. 000180
 E9037500 003DF846 8900000F DE9AFFFF 680FD868 026A026A 0277FF26 0477FF26 &.w.&.w.j.j.hÄ.h...8....F½=..u.Ô 0001A0
 108A9AFF FF681001 68026A09 6A0277FF 260477FF 260A5EC4 0278E9F8 46880006 ...F½Ôx.á^.&.w.&.w.j.j.h..h..... 0001C0
 096A0277 FF260477 FF260A5E C4024DE9 F8468800 06E90375 00003DF8 46890000 ...F½=..u.Ô...F½ÔM.á^.&.w.&.w.j. 0001E0
```

Dump of file SATURN:[PCCOMMON.DUMP.DLL]DAKEYDF.TMP;1 on 18-APR-1990 10:41:29.75
File ID (571,16,0)   End of file block 37 / Allocated 40

Virtual block number 29 (0000001D), 512 (0200) bytes

```
 260A5EC4 0224E9F8 46880006 E9037500 003DF846 890000FF FF9AFFFF 68102868 h(.h........F½=..u.Ô...F½Ô$.á^.& 000000
 F8468800 06E90375 00003DF8 46890000 FFFF9AFF FF681053 680277FF 260477FF .w.&.w.hS.h........F½=..u.Ô...F½ 000020
 FF9AFFFF 68108468 105C6810 5968076A 096A0277 FF260477 FF260A5E C401FDE9 Ô».á^.&.w.&.w.j.j.hY.h\.h..h.... 000040
 6A0277FF 260477FF 260A5EC4 01CCE9F8 46880006 E9037500 003DF846 890000FF ....F½=..u.Ô...F½Ôä.á^.&.w.&.w.j 000060
 C401A1E9 F8468800 06E90375 00003DF8 46890000 FFFF9AFF FF68FFFF 68026A0A .j.h..h........F½=..u.Ô...F½ÔÄ.á 000080
 89000011 429AFFFF 6810E068 10886810 85680A6A 096A0277 FF260477 FF260A5E ^.&.w.&.w.j.j.hç.h¡.hÄ.h...8.... 0000A0
 68026A0D 6A0277FF 260477FF 260A5EC4 0170E9F8 46880006 E9037500 003DF846 F½=..u.Ô...F½Ôp.á^.&.w.&.w.j.j.h 0000C0
 FF260A5E C40145E9 F8468800 06E90375 00003DF8 46890000 11119AFF FF681108 ..h........F½=..u.Ô...F½ÔE.á^.&. 0000E0
 0006E903 7500003D F8468900 00116D9A FFFF6811 3668046A 096A0277 FF260477 w.&.w.j.j.h6.h...m....F½=..u.Ô.. 000100
 FF681167 68113F68 113C6808 6A096A02 77FF2604 77FF260A 5EC4011A E9F8468B .F½Ô..á^.&.w.&.w.j.j.h<.h?.hg.h. 000120
 FF260477 FF260A5E C400E9E9 F8468800 06E90375 00003DF8 46890000 119E9AFF .......F½=..u.Ô...F½ÔÔ.á^.&.w.&. 000140
 E9F8468B 0006E903 75000030 F8468900 0011C99A FFFF6811 9268026A 056A0277 w.j.j.h..h...è....F½=..u.Ô...F½Ô 000160
 11FA9AFF FF6811C3 68119868 11986809 6A096A02 77FF2604 77FF260A 5EC4008E ƒ.á^.&.w.&.w.j.j.h..h..hû.h...•. 000180
 036A0277 FF260477 FF260A5E C4008DE9 F8468800 06E90375 00003DF8 46890000 ...F½=..u.Ô...F½Ô..á^.&.w.&.w.j. 0001A0
 5EC40062 E9F8468B 0006E903 7500003D F8468900 0012259A FFFF6811 EE68026A j.hŸ.h...%....F½=..u.Ô...F½Ôb.á^ 0001C0
 46890000 105F9AFF FF68121F 6811F768 11F4680C 6A096A02 77FF2604 77FF260A .&.w.&.w.j.j.h¶.h%.h..h..._....F 0001E0
```

Dump of file SATURN:[PCCOMMON.DUMP.DLL]DAKEYDF.TMP;1 on 18-APR-1990 10:41:29.75
File ID (571,16,0)   End of file block 37 / Allocated 40

Virtual block number 30 (0000001E), 512 (0200) bytes

```
 AD68026A 156A0277 FF260477 FF260A5E C40031E9 F8468800 06E90375 00003DF8 ½=..u.Ô...F½Ô1.á^.&.w.&.w.j.j.hÙ 000000
 0000E9F8 46880006 E9F8468B 0006E903 75000030 F8468900 000FB39A FFFF680F .h...°....F½=..u.Ô...F½Ô...F½Ô.. 000020
 006E0003 0E680203 00000001 0A5F0002 01530006 0F3D0203 002A90C8 C95F5E1F .^ èù.°...=...S..._........h...n. 000040
 00000002 10AF0002 0CC70002 11950005 0DC70002 11C60005 007F0001 0EF10103 ..Þ.......ó...ú..¯......ú...£..... 000060
 007A0003 02730203 01620006 0E1E0203 00860001 0ED80103 09C80002 110E0005 ......ù...Ä...........b...ø...z. 000080
 02E60007 014A0203 04570008 108B0203 01560002 10040005 00000005 0F2D0002 ..-...........V...£...W...J...l. 0000A0
 0B690002 116A0005 03700007 07490203 01720006 0F5E0203 00870003 0EC60203 ..ó.......^...r...I...p...j...i. 0000C0
 076F0002 11F10005 086E0002 12220005 017E0006 0E3F0203 0A690002 11390005 ..9...i...7...-...ª...n...þ...o. 0000E0
 040C0008 10070203 00000002 0FB00005 03F50008 0F880203 01F30002 102B0005 ..+...µ.......¾...¯............. 000100
 00900002 0FD80005 05110002 10820005 06110002 10E30005 03990007 09A50203 ..£.......Ð.......ý.......Ü..... 000120
 02B90007 012C0203 00C70004 01E40203 04200008 10E60203 00480003 0DDF0203 ..Ó...Ñ...l... ...ö...ú...,...¿. 000140
 03B60002 10870005 033B0007 02AD0203 00030004 0DFD0203 04310008 102E0203 ......1...»...Æ...Ù...;.......Ñ. 000160
 00000000 00000000 03470007 04EB0203 03C60007 0EFF0203 02B90002 10560005 ..V...¿.......ó...Š...G......... 000180
 00000000 00000000 00000600 02000200 01CB0001 B81F0000 3E89D88E FFFFB81E .¦...Ä.>...¦..ù................. 0001A0
 57EC8B55 000001E9 00CB5DFA 8B914901 F7AEF2FF FFB9C033 067EC4D7 8BEC8B55 U.$.mé-.3à¿..·ÛK¦¦..ª]ù.Ô...U.$W 0001C0
 77393CAC 0175283C 0474203C 50F77409 3CFB7420 3CACDB33 99C03306 76C51E56 V.év.3à.3Û¯< t«<.t½P<-t.<+u.¯<9w 0001E0
```

```
Dump of file SATURN:[PCCOMMON.DUMP.DLL]DAKEYDF.TMP;1 on 18-APR-1990 10:41:29.75
File ID (571,16,0)   End of file block 37 / Allocated 40

Virtual block number 31 (0000001F), 512 (0200) bytes

DCEB0002 83080307 13090302 D1E301D2 D1E301FA 88C888D2 D1E30118 72302C1F .,0r.1D10.ù.*1D101D10.).m.Ä.0.ŠÉ 000000
00000000 00000000 00000000 0000CB5D 5F5E1FDA F7000283 D8F70775 932D3C58 X<-.u.%Ä.0.%ö.^_]ù.............. 000020
0120012C 00730070 004B0000 00000000 00000000 00000000 00000000 0000004B K.....................K.p.s.,.-. 000040
00000000 00000000 0140013F 013E0004 00D2004B 00000000 00000000 0000012E ............K.0.å.>.?.@......... 000060
00000000 00000134 01330132 000000CC 0080006E 0B580002 00120009 00090000 ..........X.n...ë.Å.2.3.4....... 000080
00000000 01460145 01440087 00850008 FFFF0A56 00020011 00080009 00000000 ..........V.........D.E.F..... 0000A0
007F004B 00000000 00000000 00000000 00000000 00090000 00800000 00000000 ..........\.................K... 0000C0
55686F6F 4C206E69 20726F72 72450000 00000000 00000000 0130013C 013B0081 ..;.<.=..........Error in LookU 0000E0
6F727245 00746573 50207055 686F6F4C 206E6920 726F7272 45007274 74412070 p Attr.Error in LookUp Pset.Erro 000100
00000070 61727453 746F6F42 79654B00 74657350 2070556B 6F6F4C20 6E692072 r in LookUp Pset.KeyBootStrap... 000120
00000000 00000006 01080002 00000001 004C0002 0002FFFF 00000000 00000000 ..............L................. 000140
6E65206E 69687469 7720646E 756F6620 746F6E20 65747562 69727474 41220352 R."Attribute not found within en 000160
69746E65 206E6968 74697720 646E756F 6620746F 6E207465 73501D00 79746974 tity..Pset not found within enti 000180
00000100 01000100 01000100 01000100 01000100 01000100 01000100 01007974 ty.............................. 0001A0
676E6964 64612065 6C696877 20646572 72756363 6F20726F 72724533 00010352 R...3Error occurred while adding 0001C0
6F20726F 72724532 0079656B 20736968 74206F74 6E692072 74746120 77656E20  new attr into this key.2Error o 0001E0

Dump of file SATURN:[PCCOMMON.DUMP.DLL]DAKEYDF.TMP;1 on 18-APR-1990 10:41:29.75
File ID (571,16,0)   End of file block 37 / Allocated 40

Virtual block number 32 (00000020), 512 (0200) bytes

6F726620 72747461 20676E69 63616C70 65722065 6C696877 20646572 72756363 ccurred while replacing attr fro 000000
656C6968 77206465 72727563 636F2072 6F727245 31007965 6B207369 6874206D m this key.1Error occurred while 000020
72453300 79656B20 73696874 206D6F72 66207274 74612067 6E697465 6C656420  deleting attr from this key.3Er 000040
73702077 656E2067 6E696464 6120656C 69687720 64657272 7563636F 20726F72 ror occurred while adding new ps 000060
64657272 7563636F 20726F72 72453200 79656B20 73696874 206F746E 69207465 et into this key.2Error occurred 000080
20736968 7420606F 72662074 65737020 676E6963 616C7065 7220656C 69687720  while replacing pset from this  0000A0
6974656C 65642065 6C696877 20646572 72756363 6F20726F 72724531 0079656B key.1Error occurred while deleti 0000C0
6F742065 6C62616E 552C0079 656B2073 69687420 6D6F7266 20746573 7020676E ng pset from this key.,Unable to 0000E0
69746E65 20736968 74206E69 20657475 62697274 74612065 68742064 6E696620  find the attribute in this enti 000100
74206E69 20746573 70206568 7420646E 6966206F 7420656C 62616E55 27007974 ty.'Unable to find the pset in t 000120
6369646E 69207972 616D6972 70206574 61647055 2C007974 69746E65 20736968 his entity.,Update primary indic 000140
00010001 00010001 0060726F 6620676E 6F6C2079 656B206D 6F726620 726F7461 ator from key long form......... 000160
00000000 FFFF0001 000E0352 00000871 00000000 00000000 00000000 00010001 ...............q...R........... 000180
00000000 060BFFFF 000F02DA 00FAFF0B 00171400 009006DA 00000001 00000039 9.......Ö..........*.Ö.....Ü..... 0001A0
00000000 0000FFFF FFFF006D 0008003C 02A80005 80010001 06DF0009 00050000 ......Ö.......`.<...m........... 0001C0
00050000 00000000 FFFFFFFF 006E0008 00EC029C 00078002 000C06E9 00000006 ....Ö.........Š...n............. 0001E0

Dump of file SATURN:[PCCOMMON.DUMP.DLL]DAKEYDF.TMP;1 on 18-APR-1990 10:41:29.75
File ID (571,16,0)   End of file block 37 / Allocated 40

Virtual block number 33 (00000021), 512 (0200) bytes

00000006 00000000 0000FFFF FFFF0074 00080028 028A0005 80010001 06EA0008 ..ð.........(...t............... 000000
06F4000C 00050000 00000000 FFFFFFFF 00760008 00EC027E 00078002 000C06F3 µ.......-.ì...v...............¶. 000020
00070701 0000000A 00000000 0000FFFF FFFF0078 00080034 026C0005 80010001 ......l.4...x................... 000040
80010001 07020008 00050000 00000000 FFFFFFFF 00790030 00F0023A 00058003 ....:.þ.0.y..................... 000060
00078002 000C070B 00000006 00000000 0000FFFF FFFF006F 0008002C 022A0005 ..*.,...o....................... 000080
02120005 80010001 070C0009 00050000 00000000 FFFFFFFF 00700008 00C1021E ..è...p......................... 0000A0
00C501E0 00058000 00000716 00000007 00000000 0000FFFF FFFF0072 00080030 0...r......................Å.é. 0000C0
000C0026 020400CF 80020400 07170003 00030000 00000000 FFFFFFFF 00730030 0.s...................Ü...&... 0000E0
012D000C 002601F1 00CF8002 0000071B 00070003 00000000 0000FFFF FFFF012C ,.....................ü.þ.&...-. 000100
FFFF012E 000C0026 01E000CF 80020000 07230006 00030000 00000000 FFFFFFFF ...............#.....Ü.Á.&....... 000120
FFFFFFFF 00C90008 002C0100 00058001 0001072A 000A0005 00000000 0000FFFF ............*.......Å.,...è..... 000140
0000FFFF FFFF00CC 000800C1 01C40007 8002000C 07350000 00060000 00000000 ..........5.......á.è...ã....... 000160
00000000 FFFFFFFF 00CF0008 003201B8 00058001 00010736 000B0005 00000000 ........6........|.2...Ü........ 000180
00000000 0000FFFF FFFF0000 003000C5 01860005 80000000 07420000 00070000 ......B..........é.0.Å.......... 0001A0
00030000 00000000 FFFFFFFF 0132000C 002601AA 00CF8002 04000743 00030003 ....C.....ü.^.&...2............. 0001C0
00060003 00000000 0000FFFF FFFF0133 000C0026 019800CF 80020000 07470007 ..G.....ü...&...3............... 0001E0
```

```
Dump of file SATURN:[PCCOMMON.DUMP.DLL]DAKEYDF.TMP;1 on 18-APR-1990 10:41:29.75
File ID (571,16,0)   End of file block 37 / Allocated 40

Virtual block number 34 (00000022), 512 (0200) bytes

 07560010 00050000 00000000 FFFFFFFF 0134000C 00260186 00CF8002 0000074F O.....Ü...&...4...............V. 000000
 000C0767 00000006 00000000 0000FFFF FFFF0001 00080076 01760005 80010001 ......v.v...ì...............g... 000020
 80010001 07680011 00050000 00000000 FFFFFFFF 00020008 00C10168 00078002 ....k.è...@...............h..... 000040
 00058000 0000077A 00000007 00000000 0000FFFF FFFF0003 00080052 015F0005 .._.R...Æ...............z....... 000060
 015100CF 80020400 077B0003 00030000 00000000 FFFFFFFF 00D40030 00C5012D -.Ï.0.Å...............{.....ü.Q. 000080
 0026013F 00CF8002 0000077F 00070003 00000000 0000FFFF FFFF013E 000C0026 &...>.....................ü.?.&. 0000A0
 000C0026 012D00CF 80020000 07870006 00030000 00000000 FFFFFFFF 013F000C ..?....................ü.-.&... 0000C0
 00080008 0078011D 00058001 0001078E 00170005 00000000 0000FFFF FFFF0140 ə.........................x...Ä. 0000E0
 FFFF0009 003000EC 00EB0007 80000000 07A60000 00070000 00000000 FFFFFFFF ..............Î.......Š.š.0.\... 000100
 FFFFFFFF 000A0008 003202B8 00058002 000207A7 00070003 00000000 0000FFFF ............Ï.......¡.2...Ö..... 000120
 0000FFFF FFFF0084 0008002C 000C0005 80010001 07AF0008 00050000 00000000 ..........Ê.......É.,........... 000140
 00000000 FFFFFFFF 00850008 00C10000 00078002 000807B8 00000006 00000000 ........¡.......Å.è............. 000160
 00000000 0000FFFF FFFF0086 00080032 00C40005 80010001 07B90008 00050000 ......¿.......á.2............... 000180
 00030000 00000000 FFFFFFFF 00870030 00C50093 00058002 000007C2 00000007 ....ô.........é.0............... 0001A0
 00070003 00000000 0000FFFF FFFF0144 000C0026 008700CF 80020400 07C30003 ..û.....ü.Ñ.&...D............... 0001C0
 07CF0006 00030000 00000000 FFFFFFFF 0145000C 002600A5 00CF8002 000007C7 ú.....ü.Ë.&...E...............ü. 0001E0

Dump of file SATURN:[PCCOMMON.DUMP.DLL]DAKEYDF.TMP;1 on 18-APR-1990 10:41:29.75
File ID (571,16,0)   End of file block 37 / Allocated 40

Virtual block number 35 (00000023), 512 (0200) bytes

 000107D6 00050005 00000000 0000FFFF FFFF0146 000C0026 009300CF 80020000 ....ü...&...F...............ø... 000000
 8002000C 07DC0000 00060000 00000000 FFFFFFFF 00820008 003C0083 00058001 ......<...................É..... 000020
 00058001 000107DD 00060005 00000000 0000FFFF FFFF0083 000800C1 00770007 ..w.è.................Ì....... 000040
 003A0005 80020000 07E40000 00070000 00000000 FFFFFFFF 00800008 00640068 k.d...................ð.......:. 000060
 0026005E 00CF8002 040007E5 00030003 00000000 0000FFFF FFFF0081 003000C5 é.0..................Í.....ü.^.&. 000080
 000C0026 004C00CF 80020000 07E90007 00030000 00000000 FFFFFFFF 0138000C ..;.................Õ.....ü.L.&... 0000A0
 013D000C 0026003A 00CF8002 000007F1 00060003 00000000 0000FFFF FFFF013C <.................þ.....ü.:.&...=. 0000C0
 FFFF0096 002D00F0 00050005 80010002 07F80010 00050000 00000000 FFFFFFFF ..............½.........þ.-..... 0000E0
 FFFFFFFF 00970008 0019001F 00388001 00010809 00040005 00000000 0000FFFF ..................8............. 000100
 0000FFFF FFFF0098 0008001A 001F0078 80010001 080E0004 00050000 00000000 ................x............... 000120
 00000000 FFFFFFFF 00990008 001A001F 00888001 00010813 00040005 00000000 ..............¦................. 000140
 00000000 0000FFFF FFFF009A 00080028 0014000A 80010001 08180007 00050000 ................(............... 000160
 00050000 00000000 FFFFFFFF 009B0008 00280009 000A8001 00010820 00070005 ....  ........(................. 000180
 000A0005 00000000 0000FFFF FFFF009C 00080036 00140038 80010001 0828000A ..(.....8...6................... 0001A0
 083E000A 00050000 00000000 FFFFFFFF 00900008 00370014 00788001 00010833 3.....x...7...................>. 0001C0
 00010849 000A0005 00000000 0000FFFF FFFF009E 00080037 00140088 80010001 ....¡...7....................I... 0001E0

Dump of file SATURN:[PCCOMMON.DUMP.DLL]DAKEYDF.TMP;1 on 18-APR-1990 10:41:29.75
File ID (571,16,0)   End of file block 37 / Allocated 40

Virtual block number 36 (00000024), 512 (0200) bytes

 80010001 0854000A 00050000 00000000 FFFFFFFF 009F0008 00360009 00388001 ..8...6....................T..... 000000
 00888001 0001085F 000A0005 00000000 0000FFFF FFFF00A0 00080037 00090078 x...7..................._.....¡. 000020
 02C80005 80020002 086A0006 00030000 00000000 FFFFFFFF 00A10008 00370009 ..7...À...............j.......à. 000040
 7469746E 452A0000 3A656061 6E207965 4B000000 0000FFFF FFFF0077 000A0034 4...w..........Key name:..*Entit 000060
 6E79532A 00003A60 796E6F6E 79530000 3A6E6F69 74706972 63736544 00003A79 y:..Description:..Synonym:..*Syn 000080
 62697274 74410065 74656C65 44006563 616C7065 52006464 41000073 60796E6F onyms..Add.Replace.Delete.Attrib 0000A0
 44006563 616C7065 52006464 41000073 65747562 69727474 412A0000 3A657475 ute:..*Attributes..Add.Replace.D 0000C0
 72656E74 7261502A 00003A74 65732D70 69687372 656E7472 61500065 74656C65 elete.Partnership-set:..*Partner 0000E0
 6F460065 74656C65 44006563 616C7065 52006464 41000073 7465732D 70696873 ship-sets..Add.Replace.Delete.Fo 000100
 4B007972 61606972 5000003A 73657475 62697274 74612079 6568206E 67696572 reign key attributes:..Primary.K 000120
 44006563 616C7065 52006464 41000073 64726F77 79654B00 003A6472 6F777965 eyword:..Keywords..Add.Replace.D 000140
 6563616C 70655200 64644100 00736574 6F4E2A00 003A6574 6F4E0065 74656C65 elete.Note:..*Notes..Add.Replace 000160
 69540065 74614400 6E6F6974 6160726F 666E6920 72657355 00657465 6C654400 .Delete.User information.Date.Ti 000180
 5F5F5F5F 5F5F5F5F 00646574 61647055 00646574 61657243 00726573 55006560 me.User.Created.Updated.________ 0001A0
 5F5F5F5F 5F5F5F00 5F5F5F5F 5F5F5F5F 5F5F005F 5F5F5F5F 5F5F5F5F 5F005F5F __.__________.__________. ______ 0001C0
 7463656C 6553005F 5F5F5F5F 5F5F5F5F 5F005F5F 5F5F5F5F 5F5F5F5F 005F5F5F ___.__________.__________.Select 0001E0
```

```
Dump of file SATURN:[PCCOMMON.DUMP.DLL]DAKEYDF.TMP;1 on 18-APR-1990 10:41:29.75
File ID (571,16,0)   End of file block 37 / Allocated 40

Virtual block number 37 (00000025), 512 (0200) bytes

 00000000 00000000 00000000 00000000 00000000 00000000 00000000 00000700 ................................ 000000
 00000000 00000000 00000000 00000000 00000000 00000000 00000000 00000000 ................................ 000020
 00000000 00000000 00000000 00000000 00000000 00000000 00000000 00000000 ................................ 000040
 00000000 00000000 00000000 00000000 00000000 00000000 00000000 00000000 ................................ 000060
 00000000 00000000 00000000 00000000 00000000 00000000 00000000 00000000 ................................ 000080
 00000000 00000000 00000000 00000000 00000000 00000000 00000000 00000000 ................................ 0000A0
 00000000 00000000 00000000 00000000 00000000 00000000 00000000 00000000 ................................ 0000C0
 00000000 00000000 00000000 00000000 00000000 00000000 00000000 00000000 ................................ 0000E0
 00000000 00000000 00000000 00000000 00000000 00000000 00000000 00000000 ................................ 000100
 00000000 00000000 00000000 00000000 00000000 00000000 00000000 00000000 ................................ 000120
 00000000 00000000 00000000 00000000 00000000 00000000 00000000 00000000 ................................ 000140
 00000000 00000000 00000000 00000000 00000000 00000000 00000000 00000000 ................................ 000160
 00000000 00000000 00000000 00000000 00000000 00000000 00000000 00000000 ................................ 000180
 00000000 00000000 00000000 00000000 00000000 00000000 00000000 00000000 ................................ 0001A0
 00000000 00000000 00000000 00000000 00000000 00000000 00000000 00000000 ................................ 0001C0
 00000000 00000000 00000000 00000000 00000000 00000000 00000000 00000000 ................................ 0001E0
```

Dump of file SATURN:[PCCOMMON.DUMP.PBIN]DBDROP.EXE;1 on 18-APR-1990 10:54:29.19
File ID (365,6,0)   End of file block 26 / Allocated 28

Virtual block number 1 (00000001), 512 (0200) bytes

```
00000001 00000040 00000000 CEF80000 0000FFFF 00000020 0000001A 01935A4D MZ...... .........%ö....a....... 000000
00000400 00000000 00000000 00000000 00000000 00000000 00000000 00000000 ................................ 000020
00000000 00000000 00000000 00000000 00000000 00000000 00000000 00000000 ................................ 000040
00000000 00000000 00000000 00000000 00000000 00000000 00000000 00000000 ................................ 000060
00000000 00000000 00000000 00000000 00000000 00000000 00000000 00000000 ................................ 000080
00000000 00000000 00000000 00000000 00000000 00000000 00000000 00000000 ................................ 0000A0
00000000 00000000 00000000 00000000 00000000 00000000 00000000 00000000 ................................ 0000C0
00000000 00000000 00000000 00000000 00000000 00000000 00000000 00000000 ................................ 0000E0
00000000 00000000 00000000 00000000 00000000 00000000 00000000 00000000 ................................ 000100
00000000 00000000 00000000 00000000 00000000 00000000 00000000 00000000 ................................ 000120
00000000 00000000 00000000 00000000 00000000 00000000 00000000 00000000 ................................ 000140
00000000 00000000 00000000 00000000 00000000 00000000 00000000 00000000 ................................ 000160
00000000 00000000 00000000 00000000 00000000 00000000 00000000 00000000 ................................ 000180
00000000 00000000 00000000 00000000 00000000 00000000 00000000 00000000 ................................ 0001A0
00000000 00000000 00000000 00000000 00000000 00000000 00000000 00000000 ................................ 0001C0
00000000 00000000 00000000 00000000 00000000 00000000 00000000 00000000 ................................ 0001E0
```

Dump of file SATURN:[PCCOMMON.DUMP.PBIN]DBDROP.EXE;1 on 18-APR-1990 10:54:29.19
File ID (365,6,0)   End of file block 26 / Allocated 28

Virtual block number 2 (00000002), 512 (0200) bytes

```
72502032 2F534F20 73657269 75716572 20606172 676F7270 20736968 540033E8 è3.This program requires OS/2 Pr 000000
4C01B821 CD09B41F 0E5A240A 0D2E7265 67616E61 4D206E6F 69746174 6E657365 esentation Manager...$Z..Ç.ë¦.L 000020
00000000 00000000 00000000 00000000 00000000 00000000 00000000 000021CD Í!.............................. 000040
00000000 00000000 00000000 00000000 00000000 00000000 00000000 00000000 ................................ 000060
00000000 00000000 00000000 00000000 00000000 00000000 00000000 00000000 ................................ 000080
00000000 00000000 00000000 00000000 00000000 00000000 00000000 00000000 ................................ 0000A0
00000000 00000000 00000000 00000000 00000000 00000000 00000000 00000000 ................................ 0000C0
00000000 00000000 00000000 00000000 00000000 00000000 00000000 00000000 ................................ 0000E0
00000000 00000000 00000000 00000000 00000000 00000000 00000000 00000000 ................................ 000100
00000000 00000000 00000000 00000000 00000000 00000000 00000000 00000000 ................................ 000120
00000000 00000000 00000000 00000000 00000000 00000000 00000000 00000000 ................................ 000140
00000000 00000000 00000000 00000000 00000000 00000000 00000000 00000000 ................................ 000160
00000000 00000000 00000000 00000000 00000000 00000000 00000000 00000000 ................................ 000180
00000000 00000000 00000000 00000000 00000000 00000000 00000000 00000000 ................................ 0001A0
00000000 00000000 00000000 00000000 00000000 00000000 00000000 00000000 ................................ 0001C0
00000000 00000000 00000000 00000000 00000000 00000000 00000000 00000000 ................................ 0001E0
```

Dump of file SATURN:[PCCOMMON.DUMP.PBIN]DBDROP.EXE;1 on 18-APR-1990 10:54:29.19
File ID (365,6,0)   End of file block 26 / Allocated 28

Virtual block number 3 (00000003), 512 (0200) bytes

```
00040003 00030000 0001012A 0A000000 0003020A 58897374 0002009C 0505454E NE......ts¿X........*........... 000000
00000000 00000000 00010000 00040000 0000049E 006A0062 00580058 0040000E ..a.X.X.b.j..................... 000020
00706F72 64626406 0A000F01 08590282 02000E01 00000000 25DA0F00 25DA004B K.Ö%..Ö%........ý.Y......dbdrop. 000040
51530449 50415F50 544E4941 4C51530C 414C5153 0400002E 00250013 00010000 ......%.....SQLA.SQLAINTP_API.SQ 000060
640A0000 534C4E03 534C4C41 43534F44 08495041 5F445052 44454C51 530C454C LE.SQLEDRPD_API.DOSCALLS.ÑLS...d 000080
FF7686C7 D88EFFFF B81E5657 000294C8 00000000 00000045 58452E70 6F726462 bdrop.EXE.......à...WV.¡...Äú.v. 0000A0
3E04769A 5016FD76 868D0477 FF260677 FF26085E C4001CE9 037F0106 7E830000 ...~....Ö..é^.&.w.&.w...v».P.v.> 0000C0
C4830062 04D69A50 16FD7686 8D04C483 004C041A 9A004268 1E001AE9 08C48300 ..é.Ö...hB....L..é...v».P.ø.b..é 0000E0
05549A50 16FD6C86 8D0AC483 007004AC 9A5016FD 6C868050 16FD7686 8D086A04 .j...v».P..l».P.¯.p..é...l».P.T. 000100
86460884 46880000 FFFF9A50 16FF7886 80005868 1E5016FD 6C868D04 C48300A2 Å..é...l».P.h[...x..P......F..F. 000120
02006850 16FD7686 8D08C483 000A041A 9A005C68 1E8476FF 8676FF00 69E90375 u.Öi..v..v..h\....Ö..é...v».Ph.. 000140
FF0010E9 037C00FF 768E83FF 76868900 00FFFF9A 5016FF78 868D006C 681E006A j..hl...x..P.......v..ƒv..|.Ö... 000160
1E5016FD 76868000 12E9037F 00FF768E 8306C483 00F6041A 9A007868 1EFF7686 Ñv..hx....-..é..ƒv....Ö....v».P. 000180
08C483FF FF041A9A 009F681E 5016FD6C 86800012 E908C483 0108041A 9A009B68 h........é.Ö....l».P.h........é. 0001A0
8900C826 89FC0000 F3E90000 00000000 00000000 00000000 000090C8 C95F5E1F .^_èù.................Öæ..•.&à.. 0001C0
E0865800 00FFFF9A 5016C48B 5000C21E 8900C4A3 00C60E89 4900CE1E 8C00CC26 &à¯...ö.I..6.Eé...ö.P.é.P.....X.Á 0001E0
```

Dump of file SATURN:[PCCOMMON.DUMP.PBIN]DBDROP.EXE;1 on 18-APR-1990 10:54:29.19
File ID (365,6,0)   End of file block 26 / Allocated 28

Virtual block number 4 (00000004), 512 (0200) bytes

```
FF016806 9C9A0163 01269A00 2F057C9A 004BE800 00FFFF9A 501E051E B8051CA3 È..¡...P.....ÒK..|./..&.c....h.. 000000
03B80186 06069A50 01600000 9A054B36 FF054036 FF054F36 FF055136 FF055336 6S..6Q..6O..6M..6K....m.P.....¡. 000020
3E80000D BB00CA16 FF5000FF B8019C07 589A018C 06789A50 060600CA 06C73600 .6ú.ò...P.x....X...¡..P..ò.E...> 000040
47017500 3D80267F FFB900C4 068EFF33 480004DA 06C63B04 CE06C608 7500051E ...u.6.ö.;6.Ö..K3...6.¿..&.=.u.G 000060
F78B071E 062EEBE7 74AEF2C0 330874CA 8BA6F3CB 8BD18804 CEBE4374 003D8026 &.=.tC/ö..¦.ù¤¦.òt.3á·ÚtÓŠ.....¼ 000080
9198ACEE EBAAC20A 1172412C AC92E0D2 1972412C AC04B114 7500FB83 0523BF1F .¢#..«.u.Ý.¯,Ar.ØÁ.¯,Ar..ô¯ŠŸ¯.. 0000A0
06744EF0 8B00C41E 8E00C2A1 04E8068F 04E6068F C31F16F7 E2AA4801 74C0FEAC ¯±åt.H¯ã¾..û..Ì...Ò.Àô...6..ÞNt. 0000C0
01BFD233 04E43689 36960175 FF04F696 05571E8C 36055536 8936F775 00FF7C80 .|..u¼6.6U.6..W..-..u..6.6Õ.3Ø¢. 0000E0
0AE87409 3CEC7420 3CAC4E47 6374C00A F774093C FB74203C ACFA75C0 0A42AC00 .¯B.âu¹¯< t«<.t¼.åtcGN¯< tš<.tÒ. 000100
C18BD7E8 D1030474 223CFA74 5C3CAC41 C933E8EB 4203745C 3C247422 3C5474C0 åtT<"t$<\t.BŠÒ3èA¯<\t¹<"t..ÌŠ■.è 000120
3CAC41C9 33F0EB42 03745C3C C274223C 2774C00A AC4E01EB CE7501A8 D113E9D1 1Õ.Ì´.uöŠ.N¯.åt'<"tô<\t.BŠÞ3èA¯< 000140
03070305 483E891F 169FEBD6 7501A8D1 13E901C1 8B0FE8D1 03047422 3CFA745C \t¹<"t..ÌŠÒ.êÌÕ.Ì´.uøŠ....>K..■. 000160
8B054F1E 8C054DA3 FEB0E900 08880673 04AEE8FE 2440C203 C788E7D1 E7D147D7 ■GÌÒÌÒ.ú.ôã$±ÒÜ.s.¡..Õ¯±ÈM...O.. 000180
E8FA75C0 0AAAAC4E A400C41E 8E04E436 8B04C383 02578C36 3F893607 16F80308 Ã.½..6.76.W..û..6Õ...6.ÊN¯¯.âu¹Š 0001A0
D78B04C3 8302578C 363F8936 0081E903 75C00AF7 74093CFB 74203CAC AAC03303 .3ó¯¯< t«<.t¼.âu.Õ..6.76.W..û..■ 0001C0
5C3CAC41 C933E8EB AA03745C 3C267422 3C6374C0 0AD67409 3CDA7420 3CAC4EAA ˆN¯< tÖ<.tø.åtc<"t&<\t.¯ŠÒ3èA¯<\ 0001E0
```

Dump of file SATURN:[PCCOMMON.DUMP.PBIN]DBDROP.EXE;1 on 18-APR-1990 10:54:29.19
File ID (365,6,0)   End of file block 26 / Allocated 28

Virtual block number 5 (00000005), 512 (0200) bytes

```
4FAA22B0 078746C9 EBAA22B0 0573AAF3 E9015CB0 D5EBAAF3 5CB00674 223CFA74 t¹<"t.¯\µ˙Š!¯\ÌÕµ˙s.¯"˙ŠèF.■¯"˙O 000000
B0067422 3CFA745C 3CAC41C9 33F0EBAA 03745C3C B674223C 2A74C00A AC4ED787 .■N¯.åt¹<"tÑ<\t.˙ŠÞ3èA¯<\t¹<"t.¯ 000020
00000247 C7000007 C71F16AA C033C7EB AA22B095 73AAF3E9 D15CB0D5 EBAAF35C \µ˙Š!¯\ÌÕµ˙s.¯"˙Šú3å˙..ú...úG... 000040
FE468D00 24BA04EC B8500001 B8EC8855 FF22E904 E62EFF04 75C08501 A1210C9A ..¦À..åu...Ì.Õ".U.š¦..PEŠ.¤$..F± 000060
33501652 531E5100 10B9511E 000104EA 06C704EA 89510621 7400087E 83064EC4 ÁN..~..t¦.Q¿õ.ú.õ....Q¿..Q.SR.P3 000080
C085DA8C 0017C381 0000FFFF 9A501652 531E04EA 36FF0EEB 0000FFFF 9A5050C0 âPP.....Š..6õ..SR.P......Û...Ö.å 0000A0
FA46890A 4680F85E 8CF64689 0570B856 0CEC83EC 8855C850 E58899C0 33037493 .t.3å..Ì]ùU.š.š.V¦p..F-.^¾.F..F¹ 0000C0
F876FF06 76FF0876 FFFA76FF FC76FFF0 8B04C483 045608CC 9AF676FF 1EFC568C .V=..v~.ö.V..6..Þ.v=.v¹.v..v..v¼ 0000E0
F4468806 C4830383 09AE9A56 F676FFF8 76FFF446 890CC483 04680A5A 9AF676FF .v~.Z.h..6..F¶.v½.v~V.Ö.°..6..F¶ 000100
D1F7AEF2 FFFFB9C0 33C08ED8 8CFE880A 76C51EDE 88D788EC 885590C8 5DE5885E ^.Ì]ù.U.š.■.B.év..±.Ä.å3å¿..·Ö%Ì 000120
57EC8855 CB5DC28C 1FFA88F3 88A4F3C9 13A5F3E9 D149A402 7401A8C7 8B067EC4 6~..ú´.t.ÊÌÌÖµÊ.èµÊ.µ.¹..õ]ùU.šW 000140
1FC28CC3 88AAF3C0 32F8E2AA 0374C00A AC0CE30E 4E88DF88 0A76C506 7EC41E56 V.6~.év..Ö.N.D.¯.åt.˙ã½2åµ˙.û.õ. 000160
88137805 680EFFFE 5689FC46 89085688 06468856 06EC83EC 8855CB5D E5885F5E ^_.Ì]ùU.š.š.V.F..V..F=.V±..h.x.. 000180
8B04C483 043A07D0 9A501E05 64B800E8 E42A078A 26056606 8E056406 FF05641E .ð...d...f.&..*ÕŠ.¦d..P.Å.:..6.. 0001A0
1EE899C0 2B0575FE 56390A75 FC463908 56880646 882575FF FE831A74 0AFE83F0 Þ.±.t..±.uX.F..V.9F=u.9V±u.÷å.Š. 0001C0
885E909C EBFC46FF 078826C6 88FC5EC4 900FEB08 56880646 880007C6 26FC5EC4 6^=&6...F..V.Š..6^=.6&...F=Š..^. 0001E0
```

Dump of file SATURN:[PCCOMMON.DUMP.PBIN]DBDROP.EXE;1 on 18-APR-1990 10:54:29.19
File ID (365,6,0)   End of file block 26 / Allocated 28

Virtual block number 6 (00000006), 512 (0200) bytes

```
8A430788 41040473 1A3C612C 1174C00A 078AD388 065EC5D9 8CEC8855 90CB5DE5 Ì]ù.U.š.)é^..Æ...åt.,ø<.s..A..C. 000000
9A521650 1653C488 50870523 A780048B 520002BB CB50098E DA8C92EF 75C00A07 ..åuÿ..Ö.)]ùE..R.å.Ì#.ñP.6S.P.R. 000020
335AD479 4805238F 08088106 75000230 07740001 30408112 7558C008 0000FFFF .....åXu.Ýa=..t.=..u.Ý...#.Kyå23 000040
06C500C4 368829E3 07400E88 58580000 FFFF9A53 16520E01 8EBA500C 885050C0 åPP.ÉPα...R.S.....XX..a.D).66.é. 000060
3E1EFF36 00038BDA 8C074606 C5360F32 E91F1605 73073E1E FF360B33 DA8C0742 B..Ö3Ü6..>.s...Õ2.6é.F..ÖE..6..> 000080
E809F6BF 09F6BEEC 8B55CB00 5FE8074A BF074ABE 0068E807 4ABF074A BE1F1607 .../J.¢J.Òh./J.¢J.Ò_.ùU.š/-.¢-.Ò 0000A0
E8074EBF 074EBE00 3BE8074E BF074EBE EC885503 EB0049E8 074EBF07 4ABE0052 R./J.¢N.ÒÌ.Š.U.š/N.¯N.Ò;./N.¢N.Ò 0000C0
06468A50 00018800 00E800FF 0646C705 7500067E 830874C0 08050A15 3E9A0032 2..>....åt..-..u.úF...Ò..¦..P.F. 0000E0
02450805 8804EF83 0E73F738 C3073E1E FF0002BB 07E30740 0E880000 FFFF9A50 P.......a.D.E....>.û;¾s..ÿ....E. 000100
B8055C1E FF047400 055E3E83 06350758 9A5000FC B8EC8855 00C3EEEB 1DFFF274 t·..ŠÝû.U.š¦=.P.X.5..>^..t...\.¦ 000120
FF89FF33 F633C033 00C4068E 0562068F 0560068F CB5DE588 06820758 9A5000FF ..P.X....Ì]ù..˙...b...å.3å3-3.¿. 000140
B8067300 C1E8C603 E6D1E6D1 FE8BFE24 40C7B846 FA75AE46 AEF20674 053A26FF .&:.t.·ÖFÒu¹F.úã$±.±Ì¦Ì¦.6Òé.s.¦ 000160
26048B2B E3490716 F6331F06 D88BFE03 F88BCF88 0553168C 0551A3FA C3E90009 ..ÖÛ¹ÊQ...S..Û.½.±.Ä..3-..1D+..& 000180
04C38302 578C263F 89260A74 595E5FA7 F3000689 04CEBF57 56511075 04CE063B ¿.ö.u.QVW¢ö.¿..µÌ_^Yt.&.?&.W..û. 0001A0
00088857 56EC8855 0005602E FF07161F 16024F89 260F8926 D5E2FA75 C00AAAAC ¯˙.åu¹ã1&..&.O.......˙..U.šVW¦.. 0001C0
96EBE8F7 88AEF2FF FFB9C033 970C7496 401074C2 38AD075C BE06568B C08ED88E .Ä.å.V./\.Ù;ôt.a.t..3å¿..·Ö.¾ŠŠ. 0001E0
```

```
Dump of file SATURN:[PCCOMMON.DUMP.PBIN]DBDROP.EXE;1 on 18-APR-1990 10:54:29.19
File ID (365,6,0)   End of file block 26 / Allocated 28

Virtual block number 7 (00000007), 512 (0200) bytes

 FFFFB9C0 33FA8892 1F74C008 06960728 9A0676FF 57EC8B55 0002CA5D E58B5E5F _^.[]ò..U.ìW.v..(....ât...*3ð¿.. 000000
 885A0002 CA5DE58B 5F5B0000 FFFF9A50 1651521E 530002BB C4885049 D1F7AEF2 ¯Ù%[]P.6E..S.RQ.P.....[_.[]ò..Z. 000020
 7558C085 0000FFFF 9A1E5150 410FC980 49C88819 7200C61E 3B26720B 0300CC1E .ä..Är&;.ó.r..ùI.è.APQ.......âXu 000040
 00E2FFC3 8BE38802 7206F81E 38087208 28DC880E EBF800CC 1E8700C6 0E89490C .I..ó...ä.½S..Ê+Är.;.½.r..D.û.ã. 000060
 46890654 05E0D1C1 03E0D1C8 88F9F700 0C899905 64200646 885602EC 83EC8855 U.ì.ì.V.F.-d..¿..%*.àIÁ.èIÁ.T..F 000080
 020A47F6 26065EC4 008FE9FF FFB80674 400A47F6 26077483 0A47F626 065EC4FE ±á^.&-G..t.&-G.ðt.¡..Õ¢.á^.&-G.. 0000A0
 8827750C 0A47F626 065E88FB 2780FE5E 88010A4F 802690E9 EB200A4F 80260874 t.&.O. ŠÕ.&.O...^±.'«.^.&-G..u'. 0000C0
 0E9CE806 76FF060D 75010654 87F6E3D1 D803E301 D888F9F7 000C8999 056420C3 û-d..¿..¼*.ÄID.ÄID-.T..u...v.Ò.. 0000E0
 5EC40277 FFFE5E88 02578926 07892608 57882606 47882606 5EC49013 E804C483 .á.Š..á^.&.G.&.W.&..&.W..^±.w.á^ 000100
 08044789 26065EC4 08C48307 62180A9A 50E42A08 478A2606 77FF2608 77FF2606 .&.w.&.w.&.G.*ôP...b..á.á^.&.G.. 000120
 00000447 C7260A47 082610B0 9003EB20 B0057400 047F8326 1C75FFFF 3D0574C0 ât.=..u.&....t.¯ Š..¯.&.G.&úG... 000140
 83EC8855 CB5DE58B 5EE42A04 8A260247 8E2607FF 26378826 044FFF26 90FF4FE9 ÕO..&.O.&.7&..&.G.&..*ô^.[]ùU.š. 000160
 7C067E81 13EB0000 FE46C707 7508F608 7E810E75 0570067E 8106FA06 FF5604EC &.V..*..~.p.u..~.~.u.úF±..Š..~.| 000180
 B9990564 2DC38B1A 750C0A47 F626065E C40001FE 46C72975 072E087E 81307505 .u0.~...u)ÚF±..á^.&-G..u..û-d..¿ 0001A0
 D302B1FE 76889090 0081E9C0 28077401 065487F6 E301D803 E301D888 F9F7000C ..%*.ÄID.ÄID-.T..t.+àÖ.....v±Ý.Æ 0001C0
 74D00802 54890489 02C48309 ED19639A 50020088 15750244 08048806 D0C681E6 Ì.6Å....D.u.¡..P.c.Ü..á....T..Ät 0001E0

Dump of file SATURN:[PCCOMMON.DUMP.PBIN]DBDROP.EXE;1 on 18-APR-1990 10:54:29.19
File ID (365,6,0)   End of file block 26 / Allocated 28

Virtual block number 8 (00000008), 512 (0200) bytes

 7688065E C4FC4689 065405E0 D1C103E0 D1C888F9 F7000C89 9905642D 06468802 @.F.-d..¿..%*.àIÁ.èIÁ.T..F•á^..v 000000
 88FC7688 02578926 07892608 57892606 47892606 D2948806 D08488E6 D1E6D1FE ±I|I|..Ä...@.&.G.&.W.&..&.W..v=¡ 000020
 8855C850 E5885E00 0188020A 4F802606 5E881107 C6DE8804 47892602 44890200 ...D.&.G..ð6...^.&.O..¡..^.[]ùU. 000040
 5E8CFC46 89065405 E0D1C103 E0D1C888 F9F7000C 89990564 2D08468B 04EC83EC ì.ì..F.-d..¿..%*.àIÁ.èIÁ.T..F•.^ 000060
 8309FF1A 6A9A50E4 2A08478A 26085EC4 75741007 F626FC5E C4517400 067E83FE ±.~..tQá^=&-..tuá^.&.G.*ôP.j.... 000080
 000247C7 260007C6 26FC5EC4 04C4830A 3E177A9A 0876FF0A 76FF5F74 C00802C4 á..ât_.v..v..z.>..á.á^=&ó..&úG.. 0000A0
 741007F6 26FC5EC4 2DE80857 89260647 89260257 89260789 2699C02B 085EC400 .á^.+ã.&..&.W.&.G.&.W.Š-á^=&-..t 0000C0
 177A9A08 76FF0A76 FF0E74C0 0B02C483 0A501A6A 9A50E42A 08478A26 085EC424 $á^.&.G.*ôP.j.P..á..ât..v..v..z. 0000E0
 8808881E 8C0886A3 088C8809 43151A9A 000A88EC 885590C8 5DE58804 C4830883 ...á..[]ù.U.ì¡.....C.¡..È....... 000100
 C7000008 8206C708 5E168908 5CA30856 88064688 08781689 0876A310 56880E46 F..V.Èv...x..F..V.È\...^.ú.....ú 000120
 A30862A3 0866A3C0 28000108 8406C703 1BE90374 25F67E80 039DE900 00088006 .....Õ...—%t.Õ..ú.....+âÈf.Èb.È 000140
 7F80260A 5EC40020 09EC06C7 0874A308 5AA30860 A3087AA3 087CA308 64A3087E ~.Èd.È|.Èz.È'.ÈZ.Èt.ú.š. .á^.&.. 000160
 7A06C708 6606FF00 75283F80 260A5E88 903EEB00 3009EC06 C70A46FF 49753001 .0uI.F.ú.š.0.Š>..^.&.?+u...f.ú.z 000180
 0DEB085A 06FF9014 EB087A06 FF1A7500 08663E83 0E75203F 80269028 EB000008 ...Š(.&.? u..>f..u...z.Š....Z.Š. 0001A0
 0802C483 09AAE80E 5098078A 260A5E88 0A46FF08 7406FFC7 752D3F80 260A5EC4 á^.&.?-uú..t..F..^.&...P.Ò^..á.. 0001C0
 00088A3E 830C5689 0A468908 C48308F2 E80E501E 088AB80A 76FF0C76 FFDD75C0 &uI.v..v.¡...P.Ò·..á..F..V..>... 0001E0

Dump of file SATURN:[PCCOMMON.DUMP.PBIN]DBDROP.EXE;1 on 18-APR-1990 10:54:29.19
File ID (365,6,0)   End of file block 26 / Allocated 28

Virtual block number 9 (00000009), 512 (0200) bytes

 09EC06C7 06753009 EC3E830D 74000874 3E83088A A308F708 8AA10874 06FF0C7D )...t.À..XÄÈ...>t..t..>š.0u.ú.š. 000000
 8308A5E8 0E501E08 84880A76 FF060A46 FF087C06 FF2E752E 3F80260A 5EC40020  .á^.&.?.u...|..F...v.¡...P.ÒE.. 000020
 98078A26 0A5EC408 7C0EFF00 01088406 C70A7D00 08843E83 0C56890A 468908C4 á..F..V..>...}.ú.......|.á^.&... 000040
 75000864 3E830002 086406C7 0675006C 302B7400 68304074 004E3D3D 74004630 =F.t==N.t@=h.t+=l.u.ú.d....>d..u 000060
 00010864 06C79002 5CE91C75 003F8026 0A5EC40A 46FF0375 4C3F8026 0A5EC409 .á^.&.7Lu..F.á^.&.?.u.Õ\..ú.d... 000080
 47300A74 004530F8 46899807 8A26C8EB 00080864 06C7D0EB 00100864 06C7D8EB ŠÄú.d...ŠÄú.d...Šð&.....F½=E.t.=G 0000A0
 00633001 9FE9037E 78740069 30F84688 20F84683 086206FF 08750058 3D057400 .t.=X.u...b..F½ .F½=I.tx~.Õ..=c. 0000C0
 761EC415 75020864 3E839001 67E9014C E9037500 253D0160 E9037E01 49E90375 u.ÕI.~.Õ'.=%.u.ÕL.Õg...>d..u.á.v 0000E0
 83078926 0880A11F C4260876 1EC40DEB 00000247 C7260789 260880A1 1FC42608 .&á.À..&..&úG...Š.á.v.&á.À..&.... 000100
 0A47F626 085C1EC4 01CBE903 74000880 3E83017E E9037500 08823E83 04087606 .v...>...u.Õ-..>...t.Õù.á.\.&-G. 000120
 C48301AC E80E5000 0AB80000 085A06C7 087E06FF 01BAE9FF FF8801B0 E9037520  u.Õ§.¡..Õα...-.ú.Z...¡..P.Ò¯..á 000140
 08643E83 00040884 06C7087C 06FF0862 06FF0860 06FF90F0 EB000888 90C1EB02 .Šè.¡..Šþ...'...b...|.ú......>d. 000160
 4689088A A1287408 8A0639FA 46890864 A3C0287E 74010864 3E830085 E9037508 .u.Õ...>d..t→âÈd..F*9...t(À...F 000180
 C028027D C008088A A105088A 2E839090 13E80000 088A06C7 0A740008 743E83FA *.>t..t.ú.....Š........À...á).+á 0001A0
 7E8302C4 8304A1E8 0E50003A B802C483 013AE80E 50001088 02087606 83088AA3 È....v..¡..P.Ò:..á.¡:.P.ÒÀ..á..~ 0001C0
 9007EB08 8AA3C028 027DC008 088AA300 052DFA46 88157400 08743E83 227400FA *.t".>t..t..F*-..È...á).+áÈ..Š.. 0001E0
```

```
Dump of file SATURN:[PCCOMMON.DUMP.PBIN]DBDROP.EXE;1 on 18-APR-1990 10:54:29.19
File ID (365,6,0)   End of file block 26 / Allocated 28

Virtual block number 10 (0000000A), 512 (0200) bytes
```

```
1088FF06 E9020876 068302C4 8300F7E8 0E500010 88040876 2E830000 088A06C7 ú.......v..|..P.Ò%..á...v..Õ..|. 000000
2588FF20 E90355E8 0EF876FF 90F3EB00 0188FF30 E90277E8 0E50C028 FF35E900 .Õ5.+áP.Òw.ÒO.|..Sµ..v½.ÒU.Õ .|% 000020
08643E83 087E0067 30057C00 6530FEFE E9037500 643090FF 15E90436 E80E5000 .P.Ò6.Õ...=d.u.Õ±±=e.|.=g.-Ä.>d. 000040
75006E3D 903AEBFE 5689FC46 89400C56 880A4688 0A4EFF0C 56880A46 88097400 .t..F..V..N..F..V.a.F=.V±Š:.=n.u 000060
ABE90375 00753088 74007330 FED6E903 7500703D FED8E903 75006F3D FE72E903 .Õr±=o.u.ÕÄ±=p.u.Õ=±=s.t.=u.u.Õ¨ 000080
C00AF646 88078A26 FC5EC4FC 46FF9034 E80A46FF 9081EBFF 75E90375 00783DFE ±=x.u.Õu.ŠŸ..F.Š4..F=á^=&...F-.á 0000A0
89FE5688 FC468806 C483045E E80E0A76 FF0C76FF 500A4628 C388EC75 253C0474 t.<%uŠ.ú+F.P.v..v..Ò^..á..F=.V±. 0000C0
0374200A 47F62608 5C1EC4FC 53E90374 C00AF646 88078A26 0A5EC40C 56890A46 F..V.á^.&...F-.ât.ÕS=á.\.&-G. t. 0000E0
83002009 EC06C706 7400087C 3E835657 12EC83EC 8855C85D E5880880 A1FE43E9 ÕC±À...|]ùW.$.$.WV.>|..t.ú.$. .. 000100
88260788 2608761E C4197510 08643E83 07740208 643E8308 7E06FF04 740A067E -..t...-..>d..t..>d..u.á.v.&..&. 000120
46890788 2608761E C4117400 087E3E83 902CEB04 08760683 FE5689FC 46890257 W..F=.V±..v..Š,..>-..t.á.v.&...F 000140
00085A3E 83020876 0683FE56 89FC4689 99078826 08761EC4 0EEB0000 FE46C7FC =úF±..Š.á.v.&....F=.V±..v...>Z.. 000160
89F24689 08881688 0886A109 EAA3C028 9003E806 46880674 FE460BFC 46880E74 t..F=.F±t..F.Š..+âÈÕ.À.......F·. 000180
882D07C6 26F246FF F25EC41D 750A067E 83287D00 FE7E8331 7500087E 3E83F456 V¶.>-..u1.-±.}+.-..u.á^·.F·&6.-. 0001A0
880000F6 46C79006 EB0001F6 46C7FE56 89FC4689 0AF70002 8308F7FE 5688FC46 F=.V±%Ä.Ø.%Õ.F=.V±úF-..Š..úF-..| 0001C0
00087C3E 830AC483 0F5B1A60 9AFC76FF FE76FF50 1E0676FF FA5E8CF8 46890868 h..F%.^*.v..P.v±.v=.'.[..á..>|.. 0001E0
```

```
Dump of file SATURN:[PCCOMMON.DUMP.PBIN]DBDROP.EXE;1 on 18-APR-1990 10:54:29.19
File ID (365,6,0)   End of file block 26 / Allocated 28

Virtual block number 11 (0000000B), 512 (0200) bytes
```

```
EA3E830D 7EC90BF0 4E89C82B 08840E88 04C4830A 631A489A F876FFFA 76FF4574 tE.v*.v½.H.c..á.....+à.NÞ.è-..>õ 000000
7E89F47F C00B49C1 88473005 C62605E8 F27EC4F0 4E880000 09EA06C7 06750809 ..u.ú.õ....NÞá-·Š.&6.0G.èI.á.¶.- 000020
7C613C07 74C90804 88078A26 F85EC4F2 76C5EE5E 8C08620E 88F04E89 F4468CF2 ·.F¶.NÞ..b..^Ÿév·á^½&.....èt.<a| 000040
66A11475 00087E3E 83EE5E8E F45E8CF2 7689E375 003F8026 F846FF46 202C8003 .., F.F½&.?.uÐ.v·.^¶.^Ÿ.>-..u.Àf 000060
E5885F5E 02C48303 11E80E50 C02802E8 00018805 7500F67E 83087408 7A060808 ...z.t..—.u.|..Š.+âP.Ò...á.^_.Í 000080
FA5689F8 46890878 16880876 A10001BE 18740006 7E835657 10EC83EC 8855C85D ]ùW.$.$.WV.-..t./..Àv...x..F½.V* 0000A0
FA5689F8 46890257 88260788 2608761E C4137408 08643E83 008FE902 08760683 ..v..Õ...>d..t.á.v.&..&.W..F½.V* 0000C0
46880E74 0808643E 83040876 0683FA5E 8CF84689 FC468907 88260876 1EC410EB Š.á.v.&...F=.F½.^*..v...>d..t..F 0000E0
5688F846 88FA5E8C F8468906 DF880975 00FC7E83 900AEB06 08881575 FA4608F8 ½.F*u.|Ä.Š...-=.u.|Ô..F½.^*.F½.V 000100
003F8026 F246FFF2 5EC4900E E808840E 881C7408 7C3639F6 28F45689 F24689FA *.F·.V¶+-96|.t.....Š..á^·.F·&.?. 000120
743E83FE 28088A3E 88F37500 3F8026F2 46FFF25E C44690ED E8107ECE 38461574 t.F;ö-.ŠÚ.Fâ^·.F·&.7.uµ.>..+±.>t 000140
74000874 3E8306C4 83018DE8 0EF876FF FA76FF56 02C48301 5FE80E57 08750008 ..u.W.Ò_..á.V.v*.v½.ÕŠ..á..>t..t 000160
FC468908 78168808 76A106EC 83EC8855 90CB50E5 885F5E02 C4830142 E80E5708 .W.Õ8..Ĩ.^_.|]ù.U.$.$.Àv...x..F= 000180
06750008 7C3E83FA 4688C02A 9003EB01 80057547 067E8306 7467067E 83FE5689 .V±.-.gt..=.Gu.¯.Š..*á.F*.>|..u. 0001A0
8436FF08 6236FF00 01088406 C7067500 08843E83 007400FA 7E800006 088406C7 ú......-*.t..>...u.ú.....6b..6. 0001C0
7E800EC4 8306FC1E FF26074E 068EFC76 FFFE76FF 088636FF 088836FF 0676FF08 ..v..6...6...v±.v=..N.&..=..á..- 0001E0
```

```
Dump of file SATURN:[PCCOMMON.DUMP.PBIN]DBDROP.EXE;1 on 18-APR-1990 10:54:29.19
File ID (365,6,0)   End of file block 26 / Allocated 28

Virtual block number 12 (0000000C), 512 (0200) bytes
```

```
8304C483 07001EFF 26074E06 8E088636 FF088836 FF147500 085A3E83 1B7400FA *.t..>Z..u..6...6....N.&.....á.. 000000
C4830708 1EFF2607 4E068E08 8636FF08 8836FF14 75000884 3E831B74 00085A3E >Z..t..>...u..6...6....N.¿.....á 000020
26074E06 8EFC76FF FE76FF1B 74087A06 080866A1 000009EA 06C70808 76068304 ...v..ú.õ...Àf...z.t..v±.v  .N.& 000040
56EC8855 90C85DE5 880133E8 0E50C028 02E80001 880574C0 0804C483 070C1EFF .....á..ât.|..Š.+âP.Õ3..|]ù.·.&V 000060
88260247 8E2607FF 26378826 06468A15 78044FFF 26085C1E C4307500 08823E83 .>...u=á.\.&.O.x..F.&.7&..&.G.&. 000080
9005E808 8206FF07 754006C4 83123F15 649A0676 FF53085E 36FF9011 EBE42A04 .*õŠ...6^.S.v..d.7..á.au.....Š.. 0000A0
1BEB507E F6080676 88577500 08823E83 565702EC 83EC8855 90C85D5E 088006FF ....^]ù.U.$.á.WV.>...uW.v..--PŠ. 0000C0
C0084EC6 88088206 FF047540 06C48312 A815649A 09EC36FF 085C36FF 085E36FF .6^..6\..6$..d.¯..á.au.....6N.á 0000E0
D4E8E42A 05882602 478E2607 FF263F88 2609ECA0 D478044F FF26085C 1EC41E7E -.á.\.&.O.xâ.$.&.7&..&.G.&..*õŠá 000100
830A7688 565702EC 83EC8855 C85DE588 5F5E0880 06010646 88077500 08823E83 .>...u..F.....^_.|]ùW.$.$.WV.v.. 000120
06C48313 2115649A 5098078A 26065EC4 085C36FF 085E36FF 22E85E75 0008823E >...u^Š".6^..6\.á^.&...P.d.l..á. 000140
8A26065E C4CD7804 4FFF2608 5C1EC625 74C0084E C6880646 FF088206 FF047540 au......F..6N.ât%á.\.&.O.xëá^.&. 000160
0A468807 75000882 3E83CAEB E42A0588 2602478E 2607FF26 3F882608 5C1EC407 .á.\.&.?&..&.G.&..*õŠb.>...u..F. 000180
C028F656 89F44689 08881688 0886A156 0CEC83EC 8855C85D E5885F5E 08800601 ....^_.|]ùW.$.$.VÀ.......F¶.V-+à 0001A0
3E830676 28F028F8 468904C4 830F461A 489AF476 FF52088A 3688FA46 89FC4689 .F=.F¶.6..R.v¶.H.F..á..F½+Þ+v..> 0001C0
203F8026 F45EC422 75000874 3E834E01 750809EA 3E8308EB 02EE8305 751009EA õ..u..Ÿ.Š..>õ..u.N.>t..u"á^¶&.?· 0001E0
```

Dump of file SATURN:[PCCOMMON.DUMP.PBIN]DBDROP.EXE;1 on 18-APR-1990 10:54:29.19
File ID (365,6,0)   End of file block 26 / Allocated 28

Virtual block number 13 (0000000D), 512 (0200) bytes

```
3009EC3E 83F84EFF 02C483FE 67E80E50 98078A26 F446FF12 753009EC 3E831975 u..>&.0u..F¶&...P.Òg±.á..N½.>&.0 000000
740009EA 3E830068 E80EFA46 FF077400 067E831B 74000874 3E83077E F60B0874 t..--..>t..t..-..t..F*.Òh..>ö..t 000020
FA7E830A 7400067E 8302C483 FE74E80E 56297500 08743E83 0072E80E FC46FF07 ..F=.Òr..>t..u)V.Òt±.á..-..t..-* 000040
76FFF676 FFF876FF 0042E80E 047500FC 7E830A74 0009EA3E 83003BE8 0E047500 .u..Ò;..>ö..t..-=.u..ÒB..vh.v-.v 000060
E5885E02 C483FE2E E80E5600 2009EC06 C70E7400 08743E83 06C483FE AFE80EF4 ¶.Ò€±.á..>t..t.ú.&. .V.Ò.±.á.^.| 000080
E80E5000 3088CB02 C483FDC6 E80E5000 20B803EB 002BB805 74000866 3E83C850 ]ù.>f..t.|+.Š.| .P.Òó».á.ù|0.P.Ò 0000A0
FD9CE80E 50007888 03EB0058 B8057400 08623E83 17751009 EA3E8302 C483F0BA m».á..>ö..u..>b..t.|X.Š.|x.P.Ò.» 0000C0
8B260876 1EC41275 2A3F8026 0A5EC400 01FE46C7 565706EC 83EC8855 CB02C483 .á.ùU.&.&.WVúF±..á^.&.?*u.á.v.&. 0000E0
88F62B0A 46FFFFFF FE46C708 752D3F80 260A5EC4 9061EB0A 46FF0208 76068337 7..v...F.Šа.á^.&.?-u.úF±...F.+-. 000100
003009EC 06C70675 303C0A75 087C3639 3C7F393C 407C303C FA468807 8A260A5E ^.&...F*<0|а<9.<96|.u.<0u.ú.&.0. 000120
47F18830 E983C803 E1D1CE03 E1D1E1D1 CE889805 8A261C7F 39308026 06EBFB88 .«Š.&.=9..&....öìÃìÃ.öìÃ.à.Õ0.þG 000140
5E0C568B 0A468B37 8926065E C4F088EE F7FE468B 0C468C0A 7E89DE7D 30308026 &.=0)8.~..F..F±¥Ÿ.Þá^.&.7.F..V.^ 000160
264701EB FC7EC406 4E8AFE5E 8CFC4689 06E68857 04EC83EC 885590CB 5DE5885F _.[]ù.U.&.&.W|[..F=.^±.N.á~•Š.G& 000180
8B5FC02B FE468CFC 7E899009 EBFE468C FC7E8900 01B8F475 00382611 74003080 .=.t.&8.u¶|...-•.F±Š...-•.F±+á . 0001A0
A15152CB 5152E38B 057206F8 1E3B0B72 D828DC88 5A59EC7E E90002B8 90CB5DE5 []ù.|..Õ-&ŸZ.Ê+Ãr.;.½.r..DRQÙRÕÃ 0001C0
7455F480 FBE2E032 ACFCE432 0042B9F6 335606F4 2EFFEC5E E9C03305 754006F4 ¶.ãu.3äÕ^$..¶.V3-¿B.2ð=¯2Ãã«.¶Ut 0001E0
```

Dump of file SATURN:[PCCOMMON.DUMP.PBIN]DBDROP.EXE;1 on 18-APR-1990 10:54:29.19
File ID (365,6,0)   End of file block 26 / Allocated 28

Virtual block number 14 (0000000E), 512 (0200) bytes

```
26085EC4 565708EC 83EC8855 CB5E0001 88155407 589A5000 01B824C4 06789A11 ..x.á$|..P.X.T.|..^ùU.Š.Š.WVá^.& 000000
46890654 05E001C1 03E001C8 8BF9F700 0CB99905 642DC388 FA4689E4 2A0B478A .G.*ö.F*.û-d..¿..¾*.àìÃ.èìÃ.T..F 000020
5EC49001 39E9FFFF B8200A4F 8026085E C40F7440 0A47F626 0774830A 47F626F8 ½&-G..t.&-G.аt.á^.&.O. |..Õ9..á^ 000040
EF0A6780 26020A4F 802690E2 EB000004 47C72620 0A4F8026 0E74010A 47F62608 .&-G..t.&.O. &úG...Šã.&.O..&.g.ÿ 000060
D1D888F9 F7000CB9 9905642D C3885175 0C0A47F6 26FC7689 F0880447 8926C02B +á&.G..Þ.v=&-G..uQ.û-d..¿..¾*.Ãì 000080
75057C08 7E810E74 16140A7E 81077505 70087E81 37750106 5487F6E3 D1D803E3 D.ÃìD-.T..u7.~.p.u..~...t..~.|.u 0000A0
008CE808 76FF0A76 FF0C75C0 0802C483 168C1A6A 9AFA76FF 0F7508E1 0A7E8116 ..~.Ã.u..v*.j....á..âu..v..v.Ò¥. 0000C0
E3010803 E301D888 F9F7000C 89990564 2DC3881A 75080A47 F626085E C404C483 .á.á^.&-G..u..û-d..¿..¾*.ÃìD.ÃìD 0000E0
57892607 89264008 57882606 47882606 77282637 8826085E 88697401 065487F6 -.T..ti.^.&.7&+w.&.G.&.W.а&..&.W 000100
C48316AC 1C7E9AFA 76FF0677 FF265256 167EF60B 04478926 48024588 F87E8802 ..-½.E.H&.G..-~.VR&.w..v*.-.¯..á 000120
C4831601 1C409A53 5050C028 500002B8 11742005 2387F6FA 5E881BEB FC468908 ..F=Š..^*-.#. t.|..P+áPP! а.|..á 000140
7E9AFA76 FF501606 468D50C6 880001BE 19EB0788 2606468A 065FC426 085EC408 .á^.&á_..F.&..Š.ƒ...óP.F..¬.v*.- 000160
83EC8855 CB5DE588 5F5EE42A 06468AFE BEE90374 FC7639FC 468908C4 83155D1C .]..á.¯F=9vet.Õƒ±.F.*õ^_.|..J.&. 000180
FC468906 5405E001 C103E001 C88BF9F7 000CB999 05642D04 468806FA 06FF04EC &...*..F.-d..¿..¾*.àìÃ.ÈìÃ.T..F= 0001A0
80261074 D00B0857 89260647 8926045E C402C483 161E1963 9A500200 B8FE5E8C .^±|..P.c....á.á^.&.G.&.W..Ãt.&. 0001C0
47892640 FE5688FC 4688040A 4F802604 5EC420EB 02000247 C726FC5E C4080A4F O..á^•&úG...Š á^.&.O...F=.V±а&.G 0001E0
```

Dump of file SATURN:[PCCOMMON.DUMP.PBIN]DBDROP.EXE;1 on 18-APR-1990 10:54:29.19
File ID (365,6,0)   End of file block 26 / Allocated 28

Virtual block number 15 (0000000F), 512 (0200) bytes

```
02578926 07892608 57882606 47882604 5EC40001 0247C726 FC5EC408 57892606 .&.W.á^•&úG...á^.&.G.&.W.&..&.W. 000000
5A75023C 03240A47 8A26065E C4F62B56 04EC83EC 8B55C35D E5880000 0447C726 &úG....[]ùU.&.&.V+-á^.&.G.$.<.uZ 000020
74010654 87F6E301 D803E301 D88BF9F7 000CB999 05642DC3 881A7508 0A47F626 &-G..u..û-d..¿..¾*.ÃìD.ÃìD-.T..t 000040
2A0B478A 260677FF 260877FF 2650287E C008FC46 8906472B 26078826 065E8839 9.^.&..&+G..F=.&~(P&.w.&.w.&.G.* 000060
47882606 5EC4FFFF BE200A4F 8026065E C40874FC 463B08C4 83171A1C 7E9A50E4 ðP.~....á.;F•t.á^.&.O. ƒ..á^.&.G 000080
08EC83EC 885590CB 5DE5885E C6880000 0447C726 02578926 07892608 57882606 .&.W.&..&.W.&úG....ó^.[]ù.U.&.&. 0000A0
087EC40C 4E880233 57457502 052387F6 4CE30C4E 883F7305 211E3806 5E8BC033 3á.^.;.|.в7.N.DL-.#..uEW3Ø.N.á~. 0000C0
5016FA46 80515706 530A0537 87C64942 AA08740A 3C053787 8A107408 052387F6 -.#..t...7.<.t.ˆ8|6.7..S.WQ.F*.P 0000E0
CB50E58B 04758005 2387F6C2 03FA468B 0350E900 09BA0674 C00B5F00 00FFFF9A ......_.át.¤..ÕP..F*.ô-.#..u..[]ù 000100
AC040523 8F802606 750A3C80 00B428E3 C888FE88 0876C507 1E5756FB 0523A780 .|#.«ṼW..év..±.àD(Ç..<.u.&..#..¯ 000120
E5885E5F 1F060846 28C788EA E2470588 05EB0205 238F8026 08751A3C 1E74C43A :át.<.u.&..#..Š...Gãõ.ú+F...^.| 000140
5016F946 8D531C75 D80B2474 40052387 F626E2EB E7740A3C 80077401 F983CB5D ]ù.*.t..<.tÕŠã&-.#.аt$.Ùu.S.F*.P 000160
8D5300F9 46C686EB 0AB002D9 E95E5F1F 060774C0 08000018 519A5016 FA468D51 Q.F*.P.Q....át..._^Õ|.¯.ŠÑ6F*.S. 000180
3574010C 7E833674 FFFFFA46 F7DC75C0 08000018 D79A5016 FA468D51 5016F946 F*.PQ.F*.P.в....âuÈ¥F*..tó.-..t5 0001A0
750AF97E 800000FF FF9A5016 FC468D50 D8F75050 FFFFB853 1C750805 2387F626 &-.#..u.S|..PP¥ÃP.F=.P......-*.u 0001C0
88550099 EBC5750A F97E80FF 58E900B0 02740A3C 05378788 26F9468A FF6FE90F .Õo..F*&..7.<.t.¯.Õ[..-*.uéŠ..U. 0001E0
```

```
Dump of file SATURN:[PCCOMMON.DUMP.PBIN]DBDROP.EXE;1 on 18-APR-1990 10:54:29.19
File ID (365,6,0)   End of file block 26 / Allocated 28

Virtual block number 16 (00000010), 512 (0200) bytes

 F13D0646 88575602 EC83EC88 55C850E5 8801FE4F 80260574 C30BC08C 065EC4EC $6^..å.ût.&.O±..[]ùU.$.$.VW.F.=þ 000000
 750078E8 05740018 E8157500 82E80732 A3127400 25E80875 0007323E 831E73FF .s..>2..u.ÒX.t.È2.Ò..u.Ò..t.Òx.u 000020
 E3834306 5E880776 065E3900 F088C850 E5885E5F 02C48317 D51E349A 0676FF08 ..v..4.{..á._^.[]ùEÞ.9^.v .^.C.D 000040
 87C28838 74FFFA83 08C48319 971FDE9A 50028051 0E4F8D50 501EC033 FE5E89FE ±.^±3å.PP.O.Q¯.P.8....á..  t8.6. 000060
 0AB80C47 89484800 08A3C033 D88EFE5E 880008A3 DA8E0574 D20B0736 A3073416 .4.È6..@t..ÒÈ...^±.Ä3äÈ..H. ^.|. 000080
 DB33064E 88C08ED8 8CC31F08 8C0006A3 000D0500 0AA30147 800002A3 0000A300 .È..È...G.È.....È...Ä.Û.Ä.á.N.3Û 0000A0
 FF89C033 0A7EC406 76C51EDE 880788EC 8855C309 8EC18CD2 080466E8 07361E8E ..6.Ðf..@.è.]ùU.$.■.8.év.á-.3å¿. 0000C0
 067EC4D7 88EC8855 00C850FA 88F3881F FFFF1DC0 180574A6 F3F92801 F7AEF2FF .·Ù%|+*µ|t..å.....µ.*]ù.U.$.■á~. 0000E0
 065E88EC 8855062A E9008357 56EC8855 00C850FA 889149D1 F7AEF2FF FF89C033 3å¿..·Ù%||..*]ù.U.$VW*.Ò*.U.$.^. 000100
 885500CB 5DE588C0 3302E800 01880574 40052387 F60C7C00 F883117D 05211E38 ;.{.}..«.|.-.#.@t.¡..$.3å.[]ù.U. 000120
 E804C483 0575D208 0975C008 5B1A9A19 639A5040 19C31A48 9A570606 7EC457EC $Wá-..W.H.û.@P.c....{.åu..@u..á.$ 000140
 C08ED08C 0A76C51E 575620EC 83EC8855 CB5DE588 5F08C483 1AA10476 9A50520A .RP.v.Å..á._.[]ùU.$.$ VW.év..Ä.å 000160
 4308EFD3 0381E0D2 07E18001 80C888F8 881474C0 0AACA8F3 E07E8DC0 33001089 ¿..3å.-Äµ¨¯.ât..%.à¯..Ä.@ÄY.Æÿ.C 000180
 E04322EF D03081E0 D207E180 0180C888 F8881974 00FF25AC D2330676 C5E7E8E0 ÄŠÒév.30¯X..t..%.à¯..Ä.@ÄY.Æÿ"CÄ 0001A0
 B8187500 07163E80 D88E1606 881E56EC 8855C850 E5885E5F 1FDA8CFF 448DE674 t|.D..Ö._^.[]ùU.$V.¡...Ä.>...u.| 0001C0
 85ADFC07 17BE0656 88010716 06C60000 FFFF9A50 0717881E 50072388 1E50000A ..P.(#.P.¡..P.....6.....V./..=Ù. 0001E0

Dump of file SATURN:[PCCOMMON.DUMP.PBIN]DBDROP.EXE;1 on 18-APR-1990 10:54:29.19
File ID (365,6,0)   End of file block 26 / Allocated 28

Virtual block number 17 (00000011), 512 (0200) bytes

 09060005 18040203 02021601 C850E588 5E1F0001 88F377D4 3AF77200 3A0B74C0 ât.:Är%:åwµ¡...^.[]ù............ 000000
 00530052 02430041 02350212 12110010 120F1600 160C0808 070A0C09 0C080C07 ......................S.A.C.R.S. 000020
 16080D00 080702CE 08A40084 09820A81 0A801606 09721C70 206D006C 0B590057 W.Y.l.m p.r...........Ê.ö.■..... 000040
 1B64BB05 1FA3C85D E58899FF FF880008 E8C850E5 8899FFFF B8051816 89051FA3 È......¡....[]ùÒ..¡....[]ùÈ..Ed. 000060
 76CA3C04 72BC3C43 0A76243C 0472133C F7E24343 1674073A 2E1B75E4 0A002489 ¿$..õu..:.t.CCã%<.r.<$v.C<¥r.<òv 000080
 1CEBF62B FC5E8CFA 46890564 885606EC 83EC8855 00C30518 A3980147 8A2E4301 .C..G..È..û.U.$.$.V¡d..F*.^■+-Š. 0000A0
 8806CCA1 0CFA4683 46017440 04C4831A B6177A9A 53060E74 830A47F6 26FA5EC4 á^*&-G..t..S.z.Ñ..á.@t.F.F*.Àë.. 0000C0
 3300098A 08720521 1E38065E 88EC8855 90C85DE5 885EC688 D876FA46 3906CE16 .õ.9F*vÄ.6^.[]ù.U.$.^.;.|.r.¤..3 0000E0
 855A5900 0019279A 51160C76 FF0876FF 0A76FF53 CC8804EC 83FF68E9 FF5CE9C0 áÒ\.Õh..$..ëS.v..v..v..Q.'...YZ. 000100
 00098A08 7205211E 38065E88 0CEC83EC 885500C8 5DE588FD 0523A780 91E175C0 åuÄ..I#.=.[]ù.U.å.$..^.;.|.r.¤.. 000120
 87F60000 1C699A50 16F4468D 51414151 51C93353 12742005 2387F6FF 18E9C033 3åÕ..-.#. t.S3èQQAAQ.F¶.P.|...-. 000140
 F86689F2 88FA8856 57FCFC46 89FE4689 C0330856 C50A468E FA5E8C7D 74800523 #..t)._^*.F.éV.3å.F±.F■■WV.*.·.f% 000160
 BADC8B02 EC831F4E 7600A83D 1C1F20F8 9AFA5E8E 1E5275AE F20A8060 E30C4E88 .N.D'¯.·ÒuR..^*.% ..=´.vN..$..Èö 000180
 E2AA1A74 F8380D74 0A3CAC0C 4E880716 FA880488 E2280080 BA037302 28300200 ..=(.s.¤..+ã.å.*...N.¯<.t.;«t.¯ã 0001A0
 8E5F5EE1 E80014E8 E2E8FC46 FF0A80AA 001FE803 75F83800 80009AE9 002BE8F4 ¶Ò+.Õ..¯.;«u.Ò..·¯..F■$ãÒ..$Ä^_. 0001C0
 1E53065E 881FE3CA 28CF881F 061E5153 501CE215 1A9AFFFC 887AE800 93E9FA5E ^*Õ..Šz¡■....ã.PSQ....ü+òD..^.Š. 0001E0

Dump of file SATURN:[PCCOMMON.DUMP.PBIN]DBDROP.EXE;1 on 18-APR-1990 10:54:29.19
File ID (365,6,0)   End of file block 26 / Allocated 28

Virtual block number 18 (00000012), 512 (0200) bytes

 FA885858 591F0774 D808FE5E 01F45E88 1175C008 0000078Z 9A5016F4 46805152 RQ.F¶.P......åu..^¶.^±.Ût..Y[X.* 000000
 EBF90020 8A03EB00 1CBA0875 00098A00 013D0074 00603018 74C00808 C4831FC3 Û..á..ât.=m.t.*..¤..u.¤..$.¤ .*$ 000020
 EBF9C033 001CBA0E EBF80375 1A3F8008 5E880A5E 8E0E7440 052387F6 FE5E8E26 &.^±-.#.@t..^..^..?.u.%Š.¤..3å*$ 000040
 880475C9 080C4E88 FDE8E9CB 50E58804 72FA5E8E 5F5EF866 88FC4628 FE468806 ..F±+F=.f%^_.^*r..[]ùÒÕ».N..èu.. 000060
 74006030 1774C008 1F071E00 001D589A 5016F446 8051521E 530856C5 1EEEE8C1 èŠ¥.éV.S.RQ¯.F¶.P.X.......ât.=m.t 000080
 74400523 87F68775 C00BF446 88C2E800 208AC7E8 001CBACC 7500098A 00013D00 .=..¤..uëa..Šúa .Šõ.F¶.åuñ-.#.@t 0000A0
 01FE4F80 04740808 065E88EC 8855A3E8 C033001C 8AA6E802 751A3F80 260A880A ..Õ&.?.u.Š|¤..3åŠÈU.$.^..Ût..O±. 0000C0
 24E899C0 33057501 73E80005 88071E29 75003F83 07288857 56EC8855 CB5DE588 .[]ùU.åVWÈ(..?.u)..¡..Òs.u.3å.Š$ 0000E0
 8ED88C06 4E88072E 3689FFFE FE44C704 C6830001 04C79607 2AA30728 A3FE2440 @$±È(.È*..ú....ó.úD±±..ó...N..Ä. 000100
 A8FE88AD FC027788 F273EEF9 83FEE180 FA744100 CEE9C850 E5885E5F 0009E8C0 åÒ.._^.[]ùÒõ.At*.Ä±.*¥s·.w.=Û.±´ 000120
 74FE88E6 E8FE4489 F7880002 05C20334 7401A8AD F0030088 1573C138 48427401 .tBH;ès..Ä.ÞÛ´.t4.ô....%.D±Š|.±t 000140
 361E8C26 05740138 D18CDA8C C688FE4C FEF90305 E8058948 C128FE4C 89F9030C ..*.L±+èH..Š..*±L±.6.Õ.1;{t.&..6 000160
 8D73C138 48FE88F2 7401A8AD F003FE88 2574FFFE 3D02073A 06C626C3 027F8907 ....Ù&6.:..=±.tX.±.ÞÛ¯.t·.±H;ès§ 000180
 14E8088E 0474C008 084788E6 E8FE4489 F7880002 05C203E2 7401A8AD F003D088 .Ä.ÞÛ´.tã.ô....%.D±Š|.G..ât..ÄŠ. 0001A0
 006AE8C0 33067788 8CE83788 07321E8E 260574C7 38078CD8 8C117407 3A0EFE26 &±.:.t..Ä.■;út.&..2..7Š¥.w.3åÒj. 0001C0
 38018CD8 8C99E84E 4E960574 001CE8FE 4DFE0074 005EE898 40400124 0D74C638 ;6t.$.@@.Ò^.t.±M±Ò..t..NNŠ..Ä.1; 0001E0
```

Dump of file SATURN:[PCCOMMON.DUMP.PBIN]DBDROP.EXE;1 on 18-APR-1990 10:54:29.19
File ID (365,6,0)   End of file block 26 / Allocated 28

Virtual block number 19 (00000013), 512 (0200) bytes

```
7FFFBA41 4149C82B 037401A8 FE458851 C399C033 02478907 880736A3 260474C1 ět.&Ě6....G.3ă.ûQ.E±´.t.+ăIAAα.. 000000
0875000C E8C628C2 2302F700 72C20315 72C603C1 88F575EA D1047607 38163826 &;.8.v.1ŏuX.ě.ór..ór.%Ø#ó+6Ò..u. 000020
067789FF FEFE44C7 F203F088 FE885718 74001DE8 5152C359 C033E575 EAD1D2F7 %Ø1ŏu13ăYÚRQÒ..t.W.±.Þ.·ÚD±±..w. 000040
831D3D1F DE9A1F06 50000188 5052521E D2335053 C35A5958 FE55894A D72BD688 .ø+øJ.U±XYZúSP3Ø.RRP¦..P...8.=.. 000060
08568800 CCBF3875 000A7E83 065756EC 885500C3 D2080274 5B5A1FFF FA8308C4 á..ª..Z[t..Øû.U.$VW..~..uØeă..V. 000080
E8560E46 89024488 0074F738 11744804 CC36884C EB277200 57E80775 48064688 .F.Hu.ÒW.r'ŠL.6ă.Ht.;%t..D..F.VÒ 0000A0
C0335016 52C48850 21EB99FF FFB80675 D2080473 04CCFE81 04C68334 735E003E >.^s4.6..±ă.s..Øu.¦...ŠIP.ÆR.P3ă 0000C0
CB50E588 5E5F07C0 33038804 CC368902 5C891489 E675C085 F95B0000 FFFF9A50 P.....[ª.ău1...\..6ă..Æ3ă._^.[]ù 0000E0
C18E0388 26721C03 DA882CE8 F9F27504 CCFE8104 C6830C74 024C39F7 880E4E88 .N..%9L.t..6..±ă.u·ª$,.Ö..Γ&.Æ.ê 000100
04879200 C6168904 75F73B0E 75C08500 0007A89A 51531373 00C61E39 0675F738 ;%u.9.6.s.SQ.´....ău8;%u...6.... 000120
0B0E750A F9831374 C00A93FC 071E570A 7EC51E08 56880646 880E4E88 00C30188 .1û..N..F..V..é–.W..•..ăt..ª.u.. 000140
30040387 92F1F793 F1F70274 C00B0233 92F7880A F7000283 DBF7AA2D 800A7902 Øy.¯-˘%Ü.Ø.%Ö.%.3Ø.ăt.%Þ.%Þ..Æ.0 000160
58DA8CF2 72C73B01 448DFF44 880586AC 4F0588E2 75C308C2 88AA2704 0276393C <9v..'˘.ŏ.ûuă..O˘...D..D.;ûr·.ÖX 000180
83EC8855 F9EBC033 C85152D8 F7C42807 73C43B06 F8A15A59 00CB5DE5 885E5F1F ._^.[]ù.YZÀ%.;ós.+ăKÀRQû3ăŠªU.&. 0001A0
09F01689 09EEA399 C028FE56 89FC4689 054F1688 26054DA1 26075006 8E5618EC &¯V..P.&ÀM.&..O..F=.V±+ă.ÈŸ...Þ. 0001C0
FC5EC450 1E06ECB8 51E8FE56 89FC4689 054F1688 26054DA1 2609F416 8909F2A3 È·...¶.&ÀM.&..O..F=.V±ŠQ¦$..Pă^= 0001E0
```

Dump of file SATURN:[PCCOMMON.DUMP.PBIN]DBDROP.EXE;1 on 18-APR-1990 10:54:29.19
File ID (365,6,0)   End of file block 26 / Allocated 28

Virtual block number 20 (00000014), 512 (0200) bytes

```
FC5EC450 F676FF17 74D00BF6 5689F446 8908C483 220E1AC0 9A37FF26 0277FF26 &.w.&.7.ă..".ă..F¶.V-.Àt..v-Pă^= 000000
C4830329 E80E37FF 260277FF 26FC5EC4 46EB08C4 83013CE8 0E37FF26 0277FF26 &.w.&.7.Ò<..ă.ŠFă^=&.w.&.7.Ò)..ă 000020
2602478E 2607FF26 37882628 74024708 26078826 FC5EC404 FC468335 75C00B04 ..ău5.F=.ă^=&..&.G.t+&.7&..&.G.& 000040
00E2E9FF FFB8CB74 C00B04C4 8302F4E8 0E37FF26 0277FF26 FC5EC493 75223C80 .<"u.ă^=&.w.&.7.Ò¶..ă..ătù¦..Òă. 000060
8906578B 2604478B 26EA5EC4 14EBEC56 89EA4689 09F4168B 09F2A100 00E846C7 úFÒ..À·...¶..Fŏ.V&Š.ă^ŏ&.G.&.W.. 000080
22A91963 9A500004 05E0D1E0 D1E8468B E475EC46 0BEA468B E846FFEC 5689EA46 Fŏ.V&.FÒ.Fŏ.F&uŏ.FÒIÀIÀ...P.c.`" 0000A0
52068E05 4F168926 054DA326 FA568807 50068EAD 74D00BFA 5689F846 8902C483 .ă..F½.Vª.ÀtÙ..P..VªĚÈM.&..O...R 0000C0
89EA4689 06578B26 04478B26 EA5EC408 EB09F416 8B09F2A1 054BA326 E8468B07 ..FÒ&ĚK.À·...¶.Š.ă^ŏ&.G.&.W..Fŏ. 0000E0
D1EB0257 89260789 2604F846 83F85EC4 02578B26 078B26EA 5EC41A74 C20BEC56 V&.ŏt.ă^ŏ&..&.W.ă^½.F½.&..&.W.Š1 000100
F21EC423 74C20BEC 5689EA46 8909F416 8B09F2A1 07892602 478926C0 2BF85EC4 ă^½+ă&.G.&..À·...¶..Fŏ.V&.ŏt#ă.· 000120
CCEB04C4 83230E19 4E9AEA76 FFEC76FF 09F41689 09F2A306 578B2604 478B2609 .&.G.&.W.È·...¶..v&.vŏ.N..#.ă.Šă 000140
4689F856 89F64689 0856880B 46880000 E846C71A EC83EC8B 55CB50E5 885EC02B +ă^.[]ûW.&.&.úFÒ...F..V..F–.V½.F 000160
89C28CC3 880A753A 3C04742F 3C08745C 3CE64688 078A26FC 5EC422EB FE5689FC =.V±Š"ă^=&...F|<\t.</t.<:u..ü.ŏ. 000180
2378181E 9A509807 8A26FC5E C41973FC 46390C56 880A4688 FC46FFF8 5689F646 F–.V½.F=.F..V.9F=s.ă^=&...P...x# 0001A0
753A3F80 260A5EC4 0C56890A 4689F856 8BF64688 D9EBFC46 FFBF74C0 0802C483 .ă..ăt¢.F=Š).F–.V½.F..V.ă^.&.7:u 0001C0
62E904C4 83016CE8 0E0676FF 0876FF10 740C5638 0575C338 40085688 06468820 .F..V.ə;ûu.;V.t..v..v..Òl..ă.Öb 0001E0
```

Dump of file SATURN:[PCCOMMON.DUMP.PBIN]DBDROP.EXE;1 on 18-APR-1990 10:54:29.19
File ID (365,6,0)   End of file block 26 / Allocated 28

Virtual block number 21 (00000015), 512 (0200) bytes

```
FFFA4689 4006462B C38B0975 3A3C0474 2F3C0874 5C3CE646 88078A26 0A5EC401 .ă^.&...F|<\t.</t.<:u..ü+F.ə.Fª. 000000
468909F0 16880 9EE A18A7400 08EC5689 EA468904 C48323A2 03C09A06 76FF0876 v..v..ă.À#.ă..Fŏ.V&.Àt¤ÀŸ...Þ..F 000020
F188008C E90375C0 0808C483 238C1A1E 9AEA76FF EC76FF50 1E06EF88 F45689F2 ·.V¶¦ÿ..P.v&.vŏ...¥#.ă..ău.Ö¥.¦Þ 000040
4688078A 260A5EC4 00A2E903 75C00808 C48323E6 1A1E9AEA 76FFEC76 FF501E06 ..P.v&.vŏ...]#.ă..ău.ÖÀ.ă^.&...F 000060
56890646 8904C483 24131A8E 9AEA76FF EC76FF2D 742F3C31 743A3C35 745C3CE6 Ì<\t5<:t1</t-.v&.vŏ....$.ă..F..V 000080
EA76FFEC 76FF00A9 E9FFFFB8 6374C008 04C48300 BAE80E50 0876FF0F 74D00808 ..Àt..v.P.Ò¤..ă..ătc¦..Ö`..v&.vŏ 0000A0
FFD574D0 08F05689 EE468902 C4832445 19639A50 40FA4603 04C48324 201A489A .H. $.ă..FªəP.c.E$.ă..FŸ.VÞ.Àtf. 0000C0
9A5052FA 46030AC4 83245204 AC9A50F0 76FF0676 FF0876FF FA76FFEA 76FFEC76 v&.vŏ.vª.v..v..vÞP.¯.R$.ă..FªRP. 0000E0
C09A5050 C028E846 FF9D75C0 0804C483 0057E80E 5052FA46 2808C483 24710476 v.q$.ă.+FªRP.ÒW..ă..ău..FÒ+ăPP.ă 000100
08F24688 FE85E903 7500E87E 83FF11E9 0374D008 EC5689EA 468904C4 83120103 ....ă..Fŏ.V&.Àt.Ö...–Ò.u.Öç±.F·. 000120
C4830084 E80E5052 09F4168B 09F2A107 EB065788 26044788 26F25EC4 0074F446 F¶t.ă^·&.G.&.W.Š.À·...¶.RP.Ò...ă 000140
08FE5689 FC468902 C483256F 19639A50 00088804 EC83EC88 55CB5DE5 88C02804 .+ă.[]ûW.&.&.¦..P.c.oX.ă..F=.V±. 000160
478926C0 28FC5EC4 02578926 07892608 56880646 88FC5EC4 56EBFFFF 88057500 Àu.¦..ŠVă^=.F..V.&..&.W.ă^=+ă&.G 000180
06578926 04478926 FE5688FC 468809EE 1EC41474 09F40608 09F2A104 47892606 .&.G.À·...¶.t.ă.Ÿ..F=.V±&.G.&.W. 0001A0
E588C028 09F01689 09EEA3FE 5688FC46 8809F416 8909F2A3 FE5688FC 468800EB Š..F=.V±È·...¶..F=.V±ÈŸ...Þ.+ă.¦ 0001C0
46890657 88260447 8826065E C40092E9 03750846 08064688 08EC83EC 8855CB5D ]ûW.&.&..F..F.u.Ö..ă^.&.G.&.W..F 0001E0
```

```
Dump of file SATURN:[PCCOMMON.DUMP.PBIN]DBDROP.EXE;1 on 18-APR-1990 10:54:29.19
File ID (365,6,0)   End of file block 26 / Allocated 28

Virtual block number 22 (00000016), 512 (0200) bytes

 5A1A1E9A 37FF2602 77FF26F8 5EC437FF 260277FF 26065EC4 7D74D008 FA5689F8 %.Vª.Åt)á^.&.w.&.7á^½&.w.&.7...Z 000000
 88260788 26F85EC4 FE5689FC 46890257 88260788 26065EC4 347DC008 08C48321 !.á..â)4á^.&..&.W..F•.V±á^½&..&. 000020
 26F85EC4 02578926 078926FE 5688FC46 88F85EC4 02578926 07892606 5EC40257 W.á^.&..&.W.á^%.F•.V±&..&.W.á^½& 000040
 89064689 06578826 04478826 065EC497 75D00BFA 5689F846 89065788 26044788 .G.&.W..F%.Vª.Åu.á^.&.G.&.W..F.. 000060
 00800203 00000003 18240002 00000001 1FCD0002 001190CB 5DE58BFF 6EE90856 V.Ön..Í]ù.....ë.......$.......§. 000080
 183E0103 008A0003 1DE10103 00890003 18F80103 00050003 06520103 00060001 ......R.......«.......Å.......>. 0000A0
 01590103 00260003 207D0103 00220003 20320103 00180002 00860203 00040004 ..............2 .."...) ..&...Y. 0000C0
 05900103 00410003 04040103 00400003 03F40103 003A0003 1CAA0103 00310003 ..1...ˆ...:...¶...@.......A..... 0000E0
 00000000 00000000 00000000 005C0003 01490103 00590003 058E0103 00400003 ..M.../...Y...|...\............ 000100
 6F432020 20797261 7262694C 20656069 54206E75 5220534D 00000000 00000000 ........MS Run-Time Library - Co 000120
 70726F43 2074666F 736F7263 694D202C 38383931 20296328 20746867 69727970 pyright (c) 1988, Microsoft Corp 000140
 4C51530A 0000203A 706F7264 206F7420 65736162 61746164 20726574 6E450011 ..Enter database to drop: ...SQL 000160
 544E4941 4C51530A 006F602E 31303068 7A6C7173 00646C25 20534920 45444F43 CODE IS %ld.sqlzk001.mo..SQLAINT 000180
 44007325 0A000A64 25203D20 65646F63 206E7275 74655220 2E524F52 52452050 P ERROR. Return code = %d...%s.D 0001A0
 0A646570 706F7264 20796C6C 75667373 65636375 73207325 20657361 62617461 atabase %s successfully dropped. 0001C0
 00000000 00000000 00000000 00000000 FFFF0000 061D0000 00000000 00000000 ................................ 0001E0

Dump of file SATURN:[PCCOMMON.DUMP.PBIN]DBDROP.EXE;1 on 18-APR-1990 10:54:29.19
File ID (365,6,0)   End of file block 26 / Allocated 28

Virtual block number 23 (00000017), 512 (0200) bytes

 00000000 00000000 00000000 00000000 00000000 00000000 00000000 00000000 ................................ 000000
 00000000 00000000 00000000 00000000 00000000 00000000 00000000 00000000 ................................ 000020
 00000000 00000000 00000000 00000000 00000000 00000000 00000000 00000000 ................................ 000040
 00000000 00000000 00000000 00000000 00000000 00000000 00000000 00000000 ................................ 000060
 00000000 00000000 00000000 00000000 00000000 00000000 00000000 00000000 ................................ 000080
 00000000 00000000 00000000 00000000 00000000 00000000 00000000 00000000 ................................ 0000A0
 00000000 00000000 00000000 00000000 00000000 00000000 00000000 00000000 ................................ 0000C0
 00000000 00000000 00000000 00000000 00000000 00000000 00000000 00000000 ................................ 0000E0
 00000000 00000000 00000000 00000000 00000000 00000000 00000000 00000000 ................................ 000100
 00000000 00000000 00000000 00000000 00000000 00000000 00000000 00000000 ................................ 000120
 00000000 00000000 00000000 00000000 00000000 00000000 00000000 00000000 ................................ 000140
 00000000 00000000 00000000 00000000 00000000 00000000 00000000 00000000 ................................ 000160
 00000000 00000000 00000000 00000000 00000000 00000000 00000000 00000000 ................................ 000180
 00000000 00000000 00000000 00000000 00000000 00000000 00000000 00000000 ................................ 0001A0
 00000000 00000000 00000000 00000000 00000000 00000000 00000000 00000000 ................................ 0001C0
 00000000 00000000 00000000 00000000 00000000 00000000 00000000 00000000 ................................ 0001E0

Dump of file SATURN:[PCCOMMON.DUMP.PBIN]DBDROP.EXE;1 on 18-APR-1990 10:54:29.19
File ID (365,6,0)   End of file block 26 / Allocated 28

Virtual block number 24 (00000018), 512 (0200) bytes

 00000000 00000000 00000000 00000000 00000000 00000000 00000000 00000000 ................................ 000000
 00000000 00000000 00000000 00000000 00000000 00000000 00000000 00000000 ................................ 000020
 00000000 00000000 00000000 00000000 00000000 00000000 00000000 00000000 ................................ 000040
 00000000 00000000 00000000 00000000 00000000 00000000 00000000 00000000 ................................ 000060
 00000000 00000000 00000000 00000000 00000000 00000000 00000000 00000000 ................................ 000080
 00000000 00000000 00000000 00000000 00000000 00000000 00000000 00000000 ................................ 0000A0
 00000000 00000000 00000000 00000000 00000000 00000000 00000000 00000000 ................................ 0000C0
 00000000 00000000 00000000 00000000 00000000 00000000 00000000 00000000 ................................ 0000E0
 00000000 00000000 00000000 00000000 00000000 00000000 00000000 00000000 ................................ 000100
 00000000 00000000 00000000 00000000 00000000 00000000 00000000 00000000 ................................ 000120
 00000000 00000000 00000000 00000000 00000000 00000000 00000000 00000000 ................................ 000140
 00000000 00000000 00000000 00000000 00000000 00000000 00000000 00000000 ................................ 000160
 00000000 00000000 00000000 00000000 00000000 00000000 00000000 00000000 ................................ 000180
 00000000 00000000 00000000 00000000 00000000 00000000 00000000 00000000 ................................ 0001A0
 00000000 00000000 00000000 00000000 00000000 00000000 00000000 00000000 ................................ 0001C0
 0001FFFF 003D4F46 4E495F45 4C49465F 435F00CC 00000000 00000000 00000000 ............à._C_FILE_INFO=..... 0001E0
```

```
Dump of file SATURN:[PCCOMMON.DUMP.PBIN]DBDROP.EXE;1 on 18-APR-1990 10:54:29.19
File ID (365,6,0)   End of file block 26 / Allocated 28

Virtual block number 25 (00000019), 512 (0200) bytes

00000000 00000000 00000000 00000000 00000000 00010000 00000000 00000000 ................................ 000000
00000000 00000000 00000000 00000000 00000000 00000000 00000000 00000000 ................................ 000020
0A0A0A0A 0A0A0A0A 0A000000 00000000 00000000 00000000 00008181 81001400 ................................ 000040
00000000 00000000 00000000 00000000 00000000 000A0A0A 0A0A0A0A 0A0A0A0A ................................ 000060
00000000 01020000 00000000 00000000 0001FFFF 00000000 056C0000 00000000 ......(......................... 000080
00000000 00000000 00000000 00000000 00000000 00000000 02020000 00000000 ................................ 0000A0
00000000 00000000 00000000 00000000 00000000 00000000 00000000 00000000 ................................ 0000C0
00000000 00000000 00000000 00000000 00000000 00000000 00000000 00000000 ................................ 0000E0
00000000 00000000 00000000 00000000 00000000 00000000 00000000 00000000 ................................ 000100
00000000 00000000 00000000 00000000 00000000 00000000 00000000 00000000 ................................ 000120
00000000 00000000 00000000 00000000 00000000 00000000 00000000 00000000 ................................ 000140
00000000 00000000 02000001 00000000 00000000 00000000 00000000 00000000 ................................ 000160
00000000 00000000 00000000 00000000 00000000 00000000 00000000 00000000 ................................ 000180
00000000 00000000 00000000 00000000 00000000 00000000 00000000 00000000 ................................ 0001A0
00000000 00000000 00000000 00000000 00000000 00000000 00000000 00000000 ................................ 0001C0
2800296C 6C756E28 00000000 00000000 00CE0648 00000000 00000000 00000000 ...........H.ö.........(null).( 0001E0

Dump of file SATURN:[PCCOMMON.DUMP.PBIN]DBDROP.EXE;1 on 18-APR-1990 10:54:29.19
File ID (365,6,0)   End of file block 26 / Allocated 28

Virtual block number 26 (0000001A), 512 (0200) bytes

074C1514 00000C00 FFFFFFFF 002E2E00 2E003F2A 00002320 2D280029 6C6C756E null).+- #..*?................L. 000000
00000000 00000000 00000101 00000000 070A1514 07061514 07021514 06FE1514 ..±............................. 000020
00000000 00002000 00000000 00000000 00000000 00000000 00000000 00000000 ................................ 000040
36520000 3E3E4753 4D4E3C3C 074E0752 06CEFFFF 18FC0000 00000000 00000000 ..........=...ö.R.N.<<NMSG>>..R6 000060
00333030 36520003 000A0077 6F6C6672 65766F20 68636174 73202D0A 00303030 000..- stack overflow.....R6003. 000080
38303036 52000800 0A003020 79622065 64697669 64207265 6765746E 6920200A .- integer divide by 0.....R6008 0000A0
6E656D75 67726120 726F6620 65636170 73206867 756F6E65 20746F6E 20200A00 ..- not enough space for argumen 0000C0
65636170 73206867 756F6E65 20746F6E 20200A00 39303036 52000900 0A007374 ts.....R6009..- not enough space 0000E0
6974206E 757200FF 000A0000 FC000A00 746E656D 6E6F7269 766E6520 726F6620  for environment...=......run-ti 000100
6F702067 6E697461 6F6C6620 2D0A0032 30303652 00020020 726F7272 6520656D me error ...R6002..- floating po 000120
6C6C756E 20200A00 31303036 52000100 0A006465 64616F6C 20746F6E 20746E69 int not loaded.....R6001..- null 000140
01070E00 020003FF FFFF000A 00746E65 6D6E6769 73736120 7265746E 696F7020  pointer assignment............. 000160
00000000 00000000 00000000 00000000 03075000 02000000 02056600 02000000 .....f.......P.................. 000180
00000000 00000000 00000000 00000000 00000000 00000000 00000000 00000000 ................................ 0001A0
00000000 00000000 00000000 00000000 00000000 00000000 00000000 00000000 ................................ 0001C0
00000000 00000000 00000000 00000000 00000000 00000000 00000000 00000000 ................................ 0001E0
```

```
Dump of file SATURN:[PCCOMMON.DUMP.MSG]DESK.MSG;1 on 18-APR-1990 10:54:02.67
File ID (1007,26,0)   End of file block 1 / Allocated 4

Virtual block number 1 (00000001), 512 (0200) bytes

27000000 00000000 00000000 00000000 01000100 04485344 00464753 4D484DFF .MKMSGF.DSK....................' 000000
2A2A2A2A 2A2A2A2A 2A2A2A2A 2A2A2A2A 2A2A2A2A 2A2A2A2A 4900E100 C5007600 .v.é.Ă.I************************ 000020
2A2A2A2A 2A2A2A2A 2A2A2A2A 2A2A2A2A 2A2A2A20 4E45504F 202A2A2A 2A2A2A2A ******* OPEN ******************* 000040
2A2A2A2A 2A2A2A2A 2A490A0D 2A2A2A2A 2A2A2A2A 2A2A2A2A 2A2A2A2A 2A2A2A2A ********************..I********* 000060
2A2A2A20 45534F4C 43202A2A 2A2A2A2A 2A2A2A2A 2A2A2A2A 2A2A2A2A 2A2A2A2A ********************** CLOSE *** 000080
2A2A2A2A 2A2A2A2A 2A2A2A2A 2A2A2A2A 2A2A2A2A 2A2A2A2A 2A2A2A2A 2A2A2A2A ******************************** 0000A0
64657661 73206E65 65622073 61682031 2520656C 69662065 6854490A 0D2A2A2A ***..IThe file %1 has been saved 0000C0
76617320 6E656562 20746F6E 20736168 20312520 656C6966 20524F52 5245452E .EERROR file %1 has not been sav 0000E0
00000000 00000000 00000000 00000000 00000000 00000000 00000000 342E6465 ed.4............................ 000100
00000000 00000000 00000000 00000000 00000000 00000000 00000000 00000000 ................................ 000120
00000000 00000000 00000000 00000000 00000000 00000000 00000000 00000000 ................................ 000140
00000000 00000000 00000000 00000000 00000000 00000000 00000000 00000000 ................................ 000160
00000000 00000000 00000000 00000000 00000000 00000000 00000000 00000000 ................................ 000180
00000000 00000000 00000000 00000000 00000000 00000000 00000000 00000000 ................................ 0001A0
00000000 00000000 00000000 00000000 00000000 00000000 00000000 00000000 ................................ 0001C0
00000000 00000000 00000000 00000000 00000000 00000000 00000000 00000000 ................................ 0001E0
```

```
Dump of file SATURN:[PCCOMMON.DUMP.PBIN]DMLBE.EXE;1 on 18-APR-1990 10:54:43.95
File ID (364,10,0)   End of file block 17 / Allocated 20

Virtual block number 1 (00000001), 512 (0200) bytes

00000001 00000040 00000000 CEF80000 0000FFFF 00000020 00000011 01655A4D MZe..... .........%ö....a....... 000000
00000400 00000000 00000000 00000000 00000000 00000000 00000000 00000000 ................................ 000020
00000000 00000000 00000000 00000000 00000000 00000000 00000000 00000000 ................................ 000040
00000000 00000000 00000000 00000000 00000000 00000000 00000000 00000000 ................................ 000060
00000000 00000000 00000000 00000000 00000000 00000000 00000000 00000000 ................................ 000080
00000000 00000000 00000000 00000000 00000000 00000000 00000000 00000000 ................................ 0000A0
00000000 00000000 00000000 00000000 00000000 00000000 00000000 00000000 ................................ 0000C0
00000000 00000000 00000000 00000000 00000000 00000000 00000000 00000000 ................................ 0000E0
00000000 00000000 00000000 00000000 00000000 00000000 00000000 00000000 ................................ 000100
00000000 00000000 00000000 00000000 00000000 00000000 00000000 00000000 ................................ 000120
00000000 00000000 00000000 00000000 00000000 00000000 00000000 00000000 ................................ 000140
00000000 00000000 00000000 00000000 00000000 00000000 00000000 00000000 ................................ 000160
00000000 00000000 00000000 00000000 00000000 00000000 00000000 00000000 ................................ 000180
00000000 00000000 00000000 00000000 00000000 00000000 00000000 00000000 ................................ 0001A0
00000000 00000000 00000000 00000000 00000000 00000000 00000000 00000000 ................................ 0001C0
00000000 00000000 00000000 00000000 00000000 00000000 00000000 00000000 ................................ 0001E0

Dump of file SATURN:[PCCOMMON.DUMP.PBIN]DMLBE.EXE;1 on 18-APR-1990 10:54:43.95
File ID (364,10,0)   End of file block 17 / Allocated 20

Virtual block number 2 (00000002), 512 (0200) bytes

72502032 2F534F20 73657269 75716572 20606172 676F7270 20736968 540033E8 Ò3.This program requires OS/2 Pr 000000
4C01B821 CD09B41F 0E5A240A 0D2E7265 67616E61 4D206E6F 69746174 6E657365 esentation Manager...$Z..Ç.ël¦.L 000020
00000000 00000000 00000000 00000000 00000000 00000000 00000000 000021CD ë!.............................. 000040
00000000 00000000 00000000 00000000 00000000 00000000 00000000 00000000 ................................ 000060
00000000 00000000 00000000 00000000 00000000 00000000 00000000 00000000 ................................ 000080
00000000 00000000 00000000 00000000 00000000 00000000 00000000 00000000 ................................ 0000A0
00000000 00000000 00000000 00000000 00000000 00000000 00000000 00000000 ................................ 0000C0
00000000 00000000 00000000 00000000 00000000 00000000 00000000 00000000 ................................ 0000E0
00000000 00000000 00000000 00000000 00000000 00000000 00000000 00000000 ................................ 000100
00000000 00000000 00000000 00000000 00000000 00000000 00000000 00000000 ................................ 000120
00000000 00000000 00000000 00000000 00000000 00000000 00000000 00000000 ................................ 000140
00000000 00000000 00000000 00000000 00000000 00000000 00000000 00000000 ................................ 000160
00000000 00000000 00000000 00000000 00000000 00000000 00000000 00000000 ................................ 000180
00000000 00000000 00000000 00000000 00000000 00000000 00000000 00000000 ................................ 0001A0
00000000 00000000 00000000 00000000 00000000 00000000 00000000 00000000 ................................ 0001C0
00000000 00000000 00000000 00000000 00000000 00000000 00000000 00000000 ................................ 0001E0

Dump of file SATURN:[PCCOMMON.DUMP.PBIN]DMLBE.EXE;1 on 18-APR-1990 10:54:43.95
File ID (364,10,0)   End of file block 17 / Allocated 20

Virtual block number 3 (00000003), 512 (0200) bytes

00070003 00030000 0001042C 20000400 0003030A 9E280717 000200E6 0505454E NE..ì....æ(........ ,............ 000000
00000000 00000000 00010000 00040000 000004E8 006F0061 00580058 0040002A *.a.X.X.a.o.Ò.................... 000020
00006562 6C6D6405 06900F01 068301AD 000C0E01 00000000 14620F00 14620052 R.b...b.........Ù........dmlbe.. 000040
054E4957 4D500553 4C4C4143 534F4408 00007300 66005A00 16001000 0A000100 ..........Z.f.s...DOSCALLS.PMWIN. 000060
52545345 44404540 0E504145 48455441 4552434D 4540004D 4540034D 5332534F OS2SM.MEM.MEMCREATEHEAP.MEMDESTR 000080
41485340 45400F4B 434F4C42 434F4C4C 41455241 48534045 40125041 4548594F OYHEAP.MEMSHAREALLOCBLOCK.MEMSHA 0000A0
49525753 4F44084F 49530344 44414C4C 056C6C6C 60640554 5245564E 4F434552 RECONVERT.dmlll.LLADD.SIO.DOSWRI 0000C0
20627553 20726579 614C2072 6567616E 61402061 74614426 0000534C 4E034554 TE.NLS..&Data Manager Layer Sub  0000E0
00000000 00000000 00000000 00000000 00444E45 20686361 42206065 74737953 System Back END................. 000100
086AD446 89064689 000088F6 4689F846 890000B8 D88EFFFF 881E5657 00008EC8 à...WV.¦...Ä¦...F½.F-¦...Fø.Fåj. 000120
FFFF05A8 9A016A00 0AE90375 00003000 00FFFF9A 5052FFFF BA0004B8 0042681E .hB.¦..¤..RP.....=..u.Ö..j..´... 000140
E49AD876 FFDA76FF 006A086A DA5689D8 4689C02B 00041688 26057206 8E02C483 .á...r.&....+å.FÄ.VÖj.j..vÖ.vÄ.ð 000160
0000FFFF 9A006AD0 76FFD276 FFD25689 D0468900 00FFFF9A 006A08C4 83009108 ....é.j........FÅ.VØ.vØ.vÄj...... 000180
00FFFF9A 006A006A 006AFFFF 68000868 0082681E D076FFD2 76FFFC56 89FA4689 .Fª.V«.vØ.vÅ.h..hÄ.h..j.j.j..... 0001A0
0688006A 006A006A 006A0058 681E0082 681E5016 F6468D00 6A006A01 6A006A00 .j.j.j.j..F-.P.h...h[.j.j.j.j.¦. 0001C0
75000804 C483013C 084E9A00 5C681ECA 5689C846 890000FF FF9A5052 00288A00 .¤(.RP......Fà.Vò.h\..N.<..á..Äu 0001E0
```

Dump of file SATURN:[PCCOMMON.DUMP.PBIN]DMLBE.EXE;1 on 18-APR-1990 10:54:43.95
File ID (364,10,0)   End of file block 17 / Allocated 20

Virtual block number 4 (00000004), 512 (0200) bytes

```
CA5688C8 46880000 FFFF9A50 16FE468D 5016FF76 868DC876 FFCA76FF 006EE903 .Ön..vò.và..v..P.F±.P......Få.Vò 000000
FF768688 80468982 46890000 88FF7C86 89FF7E86 89000088 FF7A9689 FF788689 ..x...z.¡....-...|.¡...F..F...v. 000020
C483003E 08189A50 168A468D 0065681E 018946C6 048846C6 00008646 C7844689 .F.úF...óF..óF...he..F..P...>..á 000040
C4000816 88260006 A1260574 068ED656 89D44689 0000FFFF 9A5016FF 78868008 ...x..P......Få.Vø..t.&À..&....á 000060
000AE903 75000030 0000FFFF 9A505200 C28A000A 88016A02 57892607 8926085E ^À&..&.W.j.¡..¤ó.RP.....=..u.Õ.. 000080
9A505201 6F8A0000 88106A02 6A000A36 FF260576 068E02C4 83006105 A89A016A j..´.a..á...v.&.6..j.j.¡..¤o.RP. 0000A0
88260000 A1260578 068E02C4 83018505 A89A026A 000AE903 75000030 0000FFFF ....=..u.Õ..j..´....á...x.&À..&. 0000C0
FF9A5016 CC468D04 77FF2606 77FF2608 5EC40657 89260447 8926085E C4000216 ...á^À&.G.&.W.á^À&.w.&.w..Fä.P.. 0000E0
9ACC76FF CE76FF00 6A106A02 C4830202 05A89A03 6A000AE9 03750000 300000FF ...=..u.Õ..j..´....á.j.j..vö.vä. 000100
B6FF001A E9037400 00300000 FFFF9A00 71681E50 16FF7286 8008C483 01B108E4 ô.Ÿ..á...r..P.hq......=..t.Õ...Ñ 000120
468D0076 FFD276FF 0000FFFF 9AFF7286 FFFF7486 FF0000FF FF9AFF72 86FFFF74 t..Ñr.......Ñt..Ñr.......v@.vÀ.F 000140
468D0076 FFD276FF 0013E903 75000030 0000FFFF 9A006A00 6A006A00 6A50160C É.Pj.j.j.j......=..u.Õ...v@.vÀ.F 000160
7506460B D4468800 00FFFF9A 000A36FF 26057606 8EFFCDE9 0000FFFF 9A50160C É.P.....Õë...v.&.6........Få.Føu 000180
FA76FFFC 76FF0000 FFFF9AC8 76FFCA76 FF0000FF FF9AD476 FFD676FF 000BE903 .Õ...vø.vå......vò.và......v=.v' 0001A0
8E000888 1E565700 000CC8C8 C95F5E1F 0000FFFF 9AD076FF D276FF00 00FFFF9A ......v@.vÀ......^_èùà...WV.¡... 0001C0
3D000003 3F9A5016 F4468000 0036FF26 000236FF 26057806 8E0125E9 0E4688D8 Ä.F.ÕX...x.&.6..&.Õ...F¶.P.?...= 0001E0
```

Dump of file SATURN:[PCCOMMON.DUMP.PBIN]DMLBE.EXE;1 on 18-APR-1990 10:54:43.95
File ID (364,10,0)   End of file block 17 / Allocated 20

Virtual block number 5 (00000005), 512 (0200) bytes

```
468D01DC 68026A00 0A36FF26 0576068E 0120E900 008A0000 880009E9 03750000 ..u.Õ..¡..¤..Õ ...v.&.6..j.hÉ..F 000000
36FF2605 76068E00 F7E90000 8A000088 0009E903 75000030 000001A0 9A5016F8 ½.P.....=..u.Õ..¡..¤..Õ%...v.&.6 000020
DF9A5016 FC468DF8 76FFFA76 FF0000FF FF9AF876 FFFA76FF F476FFF6 76FF000A ...v-.v¶.v'.v½......v'.v½.F=.P.Õ 000040
9AFC76FF FE76FF00 6A01DC68 008CE900 008A0000 880009E9 03750000 30000001 ...=..u.Õ..¡..¤..Õ¥.hÉ.j..v±.v=. 000060
05FE5688 FC468801 6A025789 26078926 FA5688F8 4688FC5E C408C483 01F008E4 ô.Þ..á.á^=.F½.V'&..&.W.j..F=.V±. 000080
FA5688F8 46880076 E90000BA 00008800 09E90375 00003D00 0001749A 5052001A ..RP.t...=..u.Õ..¡..¤..Õv..F½.V' 0000A0
006A006A 2A6A1076 FF1276FF 0053E900 00FFFF9A 000436FF 26057206 8E0060E9 Õm...r.&.6.......ÕS..v..v.j*j.j. 0000C0
76FF0876 FF0A76FF 0C76FF0E 76FF1076 FF1276FF 003BE900 00FFFF9A 006A006A j.j......Õ;..v..v..v..v..v..v..v 0000E0
7510CB3D FEC8E903 7510CA3D FFC0E903 7500293D 001BE900 27E90000 FFFF9A06 ......Õ'.Õ..=).u.Õå.=ò.u.Õù±=ù.u 000100
00000000 00000000 90000ECA C95F5E1F 0000E900 008A0000 88FFC5E9 FF9FE903 .Õ..Õé.¡..¤..Õ...^_èò.......... 000120
90A30092 0E894900 9A1E8C00 98268900 942689FC 0001EFE9 00000000 00000000 ........Õÿ..=.&...Ī......İ....É. 000140
E80000FF FF9A501E 04BE8804 8CA3E086 580000FF FF9A5016 C4885000 8E1E8900 .....P.á.P.....X.ÁÉ¥.¡ƒ..P.....Õ 000160
ED36FF04 EF36FF04 F136FF04 F336FF04 6A097C9A 04650428 9A036205 1E9A004B K....b..(.e..|.j..6µ..6þ..6ÿ..6Ú 000180
048E092C 9A5005A8 009606C7 36000388 048805A8 9A50046F 00009A04 EB36FF04 ..6Š....o.P.´...¡..6ú...´.P.,... 0001A0
04A606C6 38049A06 C60B7500 04BE3E80 000D8800 9616FF50 00FF8804 9E0A389A .8...¡..P....E...>ƒ..u.6...;6.Ī. 0001C0
F3CB88D1 88049ABE 4374003D 80264701 75003080 267FFF89 0090068E FF334800 .K3.....¿..&.=.u.G&.=.tCƒ...Ī.ùµ 0001E0
```

Dump of file SATURN:[PCCOMMON.DUMP.PBIN]DMLBE.EXE;1 on 18-APR-1990 10:54:43.95
File ID (364,10,0)   End of file block 17 / Allocated 20

Virtual block number 6 (00000006), 512 (0200) bytes

```
412CAC04 8114750D F88304C3 8F1FF788 071E062E E8E774AE F2C03308 74CA88A6 Ī.òt.3à·ÕtÓŠ.....¾.¢û..«.u.Ÿ.¯,A 000000
028BC31F 16F7E2AA 480174C0 FEAC9198 ACEEEBAA C20A1172 412CAC92 E0021972 r.@Á.¯,Ar..ô´ŠŸ¯..¯±ât.H´ã¾..ûÉ. 000020
00013D40 81127558 C0080000 FFFF9A52 16501653 C48850B7 04C3A780 D48B5200 .R.å.Īû.ƒP.áS.P.R......åXu.Ÿa=.. 000040
9A531652 0E04908A 500C8850 50C0335A D4794804 C38F0808 81067500 02300774 t.=..u.Ÿ...û.Kyå Z3åPP.ÉPa...R.S. 000060
16057305 661EFF36 D8330A8C 056A06C5 00903688 29E30568 0E885858 0000FFFF ....XX..h.D).6..é.j..Õ3Ú6..f.s.. 000080
728E0068 E80572BF 0572BE1F 1605661E FF360003 880A8C05 6E06C536 03CCE91F .Õä.6é.n..ÕÉ..6..f...ƒr.¢r.Õh.ƒr 0000A0
5503E800 49E80572 BF0572BE 0052E806 8C8F068C 8EEC8855 C8005FE8 0572BF05 .¢r.Õ_.ûW.šƒ..¢..ÕR.ƒr.¢r.ÕI.Š.U 0000C0
067E8308 74C00804 A309569A 0032E805 728F0572 BE0038E8 0572BF05 728EEC88 .šƒr.¢r.Õ;.ƒr.¢r.Õ2..V.È..åt..-. 0000E0
028807E3 05680E88 0000FFFF 9A500646 8A500001 88000DE8 00FF0646 C7057500 .u.úF...Õ..¡..P.F.P.......h.D.É. 000100
068F04FE 068F00C3 EEE81DFF F2740245 08058804 EF830E73 F738C305 661EFF00 ...f.û;¾s..ÿ....E.t·..ŠŸû...±... 000120
F69604F7 1E8C3604 F5368936 F77500FF 7C800674 4EF08800 901E8E00 8EA10500 ..À.......ÞNt..|..u¼6.6¾.6..¾..- 000140
C00AF774 093CF874 203CACFA 75C00A42 AC00018F D23304FC 36893696 0175FF04 ..u..6.6=.3@¢..¨B.åu'¯< t«<.t¾.á 000160
AC41C933 E8E84203 745C3C24 74223C54 74C00AE8 74093CEC 74203CAC 4E476374 tcGN¯< tš<.tò.åtT<"t$<\t.BŠÕ3èA¯ 000180
223C2774 C00AAC4E 01E8CE75 01A8D113 E9D1C188 D7E8D103 0474223C FA745C3C <\t'<"t..ĪŠø.èĪÕ.Ī´.uõŠ.N¯.åt'<" 0001A0
A8D113E9 D1C188DF E8D10304 74223CFA 745C3CAC 41C933F0 E8420374 5C3CC274 tõ<\t.BŠÞ3èA¯<\t'<"t..ĪŠÕ.èĪÕ.Ī´ 0001C0
06730390 E8FE2440 C203C788 E7D1E7D1 47D70307 0304E83E 891F169F E8D67501 .uøŠ....>Š..ø.øGĪÕĪÕ.ú.ôa$±Õ..s. 0001E0
```

Dump of file SATURN:[PCCOMMON.DUMP.PBIN]DMLBE.EXE;1 on 18-APR-1990 10:54:43.95
File ID (364,10,0)   End of file block 17 / Allocated 20

Virtual block number 7 (00000007), 512 (0200) bytes

```
FC36B804 C3830257 8C363F89 360716F8 03D8B804 EF1E8C04 EDA3FD84 E90008B8 |..ÕÇ»ÈÚ...ÿ..Ä.%..6.76.W..Û..6= 000000
E90375C0 0AF77409 3CFB7420 3CACAAC0 3303EBFA 75C00AAA AC4EA400 901E8E04 .....ÈN¨¨.âu*$.3à¯¯< t«<.t¥.âu.Õ 000020
74223C63 74C00AD6 74093CDA 74203CAC 4EAAD788 04C38302 578C363F 89360081 ..6.76.W..Û..■¯N¯< tÕ<.t■.âtc<"t 000040
AAF3E901 5C8005EB AAF35CB0 0674223C FA745C3C AC41C933 E8E8AA03 745C3C26 &<\t.`$Ò3èA¯<\t*<"t.¯\µ`$Í¯\ÌÕµ` 000060
EBAA0374 5C3CB674 223C2A74 C00AAC4E D7874FAA 22B0D787 46C9EBAA 22800573 s.¯"`$èF.■¯"`O.■N¯.ât*<"tÑ<\t.`$ 000080
C7EBAA22 B09573AA F3E9D15C 8005EBAA F35CB006 74223CFA 745C3CAC 41C933F0 Þ3èA¯<\t*<"t.¯\µ`$Í¯\ÌÕµ`s.¯"`$ú 0000A0
8855FF22 E904FE2E FF0475C0 8505D70F 949A0000 0247C700 0007C71F 16AAC033 3â¯..ú...úG......■..âu...±.Õ".U. 0000C0
050206C7 05028951 06217400 087E8306 4EC4FE46 8D0024BA 05048B50 00018BEC $¦..PÈ..¤$..F±óN..~..t¦.Q¿..ú... 0000E0
1652531E 050236FF 0EEB0000 FFFF9A50 50C03350 1652531E 51001089 511E0001 ...Q¿..Q.SR.P3âPP.....$..6...SR. 000100
1EDE8BD7 8BEC8B55 CB5DE588 99C03303 7493C085 DA8C0017 C3810000 FFFF9A50 P......Û...Ö.â.t.3â..[]ÙW.$.■.B. 000120
F3E90149 A4027401 A8C78806 7EC4D1F7 AEF2FFFF 89C033C0 8ED88CFE 880A76C5 év..±.Ä.ó3â¿..·Û%Ìó~..ú´.t.È¦ÌÕµ 000140
89FA4689 04F31688 04F1A156 06EC83EC 8855C85D C28C1FFA 88F388A4 F3C913A5 È.èµÈ.µ.*..ò]ÙW.$.$.VÀþ...µ..F*. 000160
06EBF08B 04C48308 9C0AB09A 0676FF08 76FF6E74 08460806 46887674 C208FC56 V■.ôtv.F..F.tn.v..v.. ....ó..Þ$. 000180
C48308C5 0AB09A37 FF260277 FF264A74 02470B26 078826FA 5EC404FA 46839090 ...F*.ó^*&..&.G.tJ&.w.&.7.¯.é..ó 0001A0
260277FF 26FA5EC4 0676FF08 76FF5601 75303880 261FC426 FA5EC4DD 7EC63804 .;ó~Ìó^*&ó.&.8=uÌV.v..v.ó^*&.w.& 0001C0
5E99C02B 9004EBC2 8C01408D 1FC426FA 5EC48475 C0080AC4 8307B10A C89A37FF .7.à.Ý..ó..âuÇó^*&ó..ә..ôŠ..+â.^ 0001E0
```

Dump of file SATURN:[PCCOMMON.DUMP.PBIN]DMLBE.EXE;1 on 18-APR-1990 10:54:43.95
File ID (364,10,0)   End of file block 17 / Allocated 20

Virtual block number 8 (00000008), 512 (0200) bytes

```
D187D103 D323D81B D12B0C74 DAF7D788 067EC457 38E30C4E 8BEC8B55 CB5DE58B .[]ÙW.$.N.D8Wó~..■%Öt.+1.Ü#.1.1 000000
13ABF3E9 D1C38EFF FFC381C3 8C10E301 B7AAF3C9 13ABF3E9 D1E08A0A 4688D12B +1.F..ÀÎÕµ¨.èµ`.1D..Û.Û...ÛÎÕµ¨. 000020
FF047400 052A3E83 08770A38 9A5000FC 8BEC8B55 CB5D0856 88064688 5FAAF3C9 èµ`_.F..V.]ÙW.$¦=.P.8.w..>*..t.. 000040
ACFCE432 00428 9F6 3356F844 E9000288 CB5DE588 09360A38 9A5000FF B805281E .(.Ì..P.8.6..Í]Ù¦..Õ0«V3-¿8.2ö=¯ 000060
052C068F CB5E0001 B8096C0A 389A5000 01B8094A 092C9A11 7455F480 FBE2E032 2Àã«.¶Ut...,.J.¦..P.8.l.¦..^ù.... 000080
40C78B46 FA75AE46 AEF20674 053A26FF FFB9FF33 F633C033 0090068E 052E068F ........3â3-3.¿..&:.t.·ÙFÛu*F.ú@ 0000A0
F88BCF8B 04F3168C 04F1A3FA E5E90009 B8067300 C1E8C603 E601E6D1 FE8BFE24 $±.±¦¦¦].6Òè.s.¦..Ö¦*Èþ...µ..Ù.¥ 0000C0
F3000689 049A8F57 56511075 049A063B 2604882B E3490716 F6331F06 D88BFE03 .±.Ã..3-..ID+..&;...u.QVWe..¿..µ 0000E0
16024F89 260F8926 D5E2FA75 C00AAAAC 04C38302 578C263F 89260A74 595E5FA7 Ì_^Yt.&.?&.W..Û.¨.âu*ã¦&..&.O.. 000100
401074C2 3BAD0586 BE06568B C08ED88E 028D8857 56EC8855 00052C2E FF07161F ........U.$VW¦§..Ã.&.V./..Ù;ôt.@ 000120
9A0676FF 57EC8855 0002CA5D E5885E5F 96E8EBF7 8BAEF2FF FFB9C033 970C7496 .t..3â¿..·Û.¥$$._^.[]ò..U.$W.v.. 000140
1651521E 53000288 C4885049 D1F7AEF2 FFFFB9C0 33FA8892 1F74C008 09750A08 ..u..ât...*3â¿..¯Û%¦¦P.éE..S.RQ. 000160
49CB8B19 7200921E 3B2672D8 0300981E 885A0002 CA5DE58B 5F5B0000 FFFF9A50 P.....[_.Í]ò..Z.....Är&;...r..ÙI 000180
2BDC8B0E EBF80098 1E870092 0E89490C 7558C085 0000FFFF 9A1E5150 410FC980 .è.APQ.......âXu.Ì........%$..É+ 0001A0
F7AEF2FF FFB9C033 067EC4D7 8BEC8B55 00E2FFC3 8BE38B02 72053C1E 38087208 Är.;.<.r..D.Û.ã.U.$,■ó~.3â¿..·Û% 0001C0
D9F7AEF2 C033F78B 067EC409 8B27E30E 4E881E56 57EC8B55 00CB5DFA 8B914901 ¦¦..*]Ù.U.$WV..N.D'.\ó~..¼3â·Û%) 0001E0
```

Dump of file SATURN:[PCCOMMON.DUMP.PBIN]DMLBE.EXE;1 on 18-APR-1990 10:54:43.95
File ID (364,10,0)   End of file block 17 / Allocated 20

Virtual block number 9 (00000009), 512 (0200) bytes

```
8B5F5E1F C18BD1F7 49490474 0477FF45 3A26C933 FF448AA6 F30A76C5 FE8BCB03 .Û.±év.µÌ.D.3è&:E.w.t.ÌÌ%Ì.è.^_. 000000
33057540 0538A151 52CB5152 E38B0572 053C1E38 0B72D82B DC8B5A59 00CB5DE5 []Û.YZ.É+Är.;.<.r..DRQÙRQÀ8.@u¯3 000020
EC8B55CB 5DE58B01 FE4F8026 0574C30B C08C065E C4EC8B55 05382EFF F976E9C0 âÕv*..8.U.&ó^..â.Ût.&.O±..[]ÙW.$ 000040
750082E8 055AA312 740025E8 08750005 5A3E831E 73FFF130 06468B57 5602EC83 .$.VW.F.=þ.s..>Z..u.ÒX.t.ÈZ.Ò..u 000060
3900F08B CB5DE588 5E5F02C4 83134C00 349A0676 FF087500 78E80574 0018E815 .Ò..t.Òx.u..v..4.L..ó._^.[]ÙÈÞ.9 000080
8308710E DE9A5002 B0510E4F 8D50501E C033FE5E 89FEE383 43065E88 0776065E ^.v..^.C.D±.^±3â.PP.O.Q¯.P.8.q.. 0000A0
C033D88E FE5E8800 08A30A8E 05740208 055EA305 5C1687C2 8B3874FF FA8308C4 ó..*.t8.ô..\.È^..■t..ÖÈ...^±.Ã3â 0000C0
1FD88C00 06A30000 05000AA3 01478000 02A30000 A3000AB8 0C478948 480008A3 È..HH.G.¦..È..È...G.È.....È...Ä. 0000E0
1EDE8BD7 8BEC8B55 C3098EC1 8CD20B01 8CE8055E 1E8ED833 064E8BC0 8ED88CC3 Û.Ä.â.H.3Û..^.Ò...■.è.\ÙW.$.■.B. 000100
5DFA8BF3 8B1FFFFF 1DC01805 74A6F3F9 2BD1F7AE F2FFFFB9 C0330A7E C40676C5 év.ó~.3â¿..·Û%Ì+*µÌt..â.....µ.*] 000120
F3C032F8 E2AA0374 C00AAC0C E30E4E8B DF8B0A76 C5067EC4 1E5657EC 8B5500C8 Ù.U.$WV.ó~.év..Ò.N.D.¯.ât.¯â%2âµ 000140
580B309A 50400B9D 0AB09A57 06067EC4 57EC8B55 CB5DE58B 5F5E1FC2 8CC38BAA ^.Û.ó.^_.[]ÙW.$Wó~..W.¯...@P.=.X 000160
8855CB5D E5885F08 C4830C5F 08189A50 520AEB04 C4830575 D2080975 C00B5B0C .[.âu..Ûu..ó.$.RP...._.ó._.[]ÙW. 000180
8BF88B14 74C00AAC ABF3E07E 80C03300 10B9C08E D08C0A76 C51E5756 20EC83EC $.$ VW.év..Ã.â¿..3â.~Äµ¨¯.ât..%. 0001A0
C88BF88B 197400FF 25ACD233 0676C5E7 EBE04308 EF030381 E00207E1 8001B0C8 â¯..Ã.■ÀÝ.Æÿ.CÄŠÒév.3■¯X..t..%.â 0001C0
56EC8B55 CB5DE58B 5E5F1FDA 8CFF448D E674E043 22EFD303 B1E0D207 E18001B0 ¯..Ã.■ÀÝ.Æÿ"CÄtÌ.D..Ò._^.[]ÙW.$V 0001E0
```

```
Dump of file SATURN:[PCCOMMON.DUMP.PBIN]DMLBE.EXE;1 on 18-APR-1990 10:54:43.95
File ID (364,10,0)   End of file block 17 / Allocated 20

Virtual block number 10 (0000000A), 512 (0200) bytes

0000FFFF 9A50053F 881E5005 48881E50 000A8818 7500053E 3E80088E 0A0E881E .¡...Ã.>>..u.¡..P.|K.P.¡?.P..... 000000
E5885E1F 000188F3 77043AF7 72003A08 74C085AD FC053F8E 06568801 053E06C6 ó.>...V.ƒ?.=Ù.ât.:Ar%:åw¡...^.[ 000020
75003F83 05508857 56EC8855 C850E588 01FE4F80 04740808 065E88EC 8855C85D ]ùU.$.^..Ùt..O±..[]ùU.$VWEP..?.u 000040
C6830001 04C79605 52A30550 A3FE2440 24E899C0 33057501 73E80005 88071E29 )..¡..Òs.u.3â.$$a$±ÈP.ÈR..ú....ó 000060
FA744100 CEE9C85D E5885E5F 0009E8C0 8ED88C06 4E880556 3689FFFE FE44C704 .úD±±..6V..N..Ã.âÒ.._^.[]ùÒö.At* 000080
7401A8AD F0030088 1573C138 48427401 A8FE88AD FC02778B F273EEF9 83FEE180 .Ã±.*Ÿs·.w.=Ù.±´.tBH;ês..Ã.ÞÙ´.t 0000A0
FEF90305 E8058948 C128FE4C 89F9030C 74FE88E6 E8FE4489 F7880002 05C20334 4.ô....%.D±Š].±t..*.L±+èH..Š..*± 0000C0
2574FFFE 3D020562 06C626C3 027F8905 5E1E8C26 05740138 D18CDA8C C688FE4C L±.6.Õ.[;lt.&..^....ù&ó.b..=±.tX 0000E0
F7880002 05C203E2 7401A8AD F0030088 8073C138 48FE88F2 7401A8AD F003FE88 .±.ÞÙ´.t·.±H;ès§.Ã.ÞÙ´.tã.ô....¥ 000100
260574C7 38078C08 8C117405 620EFE26 14E8088E 0474C008 084788E6 E8FE4489 .D±Š].G..ât..ÃŠ.&±.b.t..Ã.■;út.& 000120
4DFE0074 005EE898 40400124 0074C638 006AE8C0 33067788 8CE83788 055A1E8E ..Z..7Š¥.w.3âÒj.;ót.$.ᾳᾳ.Ò^.t.±M 000140
C399C033 02478907 88055EA3 260474C1 38018C08 8C99E84E 4E960574 001CE8FE ±Ò..t..NNŠ..Ã.[;èt.&È^....G.3â.û 000160
72C603C1 88F575EA D1047605 60163826 7FFF8A41 4149C828 037401A8 FE458851 Q.E±´.t.+âlAA□..&;.'.v.ÎõU%.è.ór 000180
74001DE8 5152C359 C033E575 EAD1D2F7 0875000C E8C628C2 23D2F700 72C20315 ..ór.%0#ó+6Ò..u.%@lõul3âYúRQÒ..t 0001A0
D2335053 C35A5958 FE55894A D72BD688 067789FF FEFE44C7 F203F088 FE885718 .W.±.Þ.·úD±±..w..ø+■J.U±XYZûSP3Ø 0001C0
885500C3 D20B0274 5B5A1FFF FA8308C4 830C740E DE9A1F06 500001B8 5052521E .RRP¡..P...B.t..ó..*..Z[t..Øû.U. 0001E0
```

```
Dump of file SATURN:[PCCOMMON.DUMP.PBIN]DMLBE.EXE;1 on 18-APR-1990 10:54:43.95
File ID (364,10,0)   End of file block 17 / Allocated 20

Virtual block number 11 (0000000B), 512 (0200) bytes

9836884C EB277200 57E80775 48064688 08568800 988F3875 000A7E83 065756EC $VW..~..u8¢...V..F.Hu.ÒW.r'ŠL.6. 000000
D2080473 0498FE81 04C68334 735E003E E8560E46 89024488 0D74F73B 11744804 .Ht.;%t..D..F.VÒ>.^s4.6..±..s..Ø 000020
5C891489 E675C085 F95B0000 FFFF9A50 C0335016 52C48850 21E899FF FF880675 u.|...Š|P.6R.P3âP.....['.âu]...\ 000040
98FE8104 C6830C74 024C39F7 880E4E88 C850E588 5E5F07C0 33038804 98368902 ..6...Æ3â._^.[]ù.N..%9L.t..6..±. 000060
000A889A 51531373 00921E39 0675F738 C18ED388 26721C03 DA882CEB F9F27504 .u·*Š,.Ö..F&.Æ.ê;%u.9...s.SQ.... 000080
26057A06 8E5618EC 83EC8855 00C30188 04879200 92168904 75F73BDE 75C08500 ..âuR;%u.........1û.U.$.$.V..z.& 0000A0
26068A16 890688A3 06861689 0684A399 C02BFE56 89FC4689 04EF1688 2604EDA1 ÀÙ.&..ÿ..F=.V±+â.È......È......& 0000C0
9A37FF26 0277FF26 FC5EC450 1E05308B 51E8FE56 89FC4689 04EF1688 2604EDA1 ÀÙ.&..ÿ..F=.V±ŠQ¡0..Pá^=&.w.&.7. 0000E0
0E37FF26 0277FF26 FC5EC450 F676FF17 74D00BF6 5689F446 8908C483 10960C7E ~....6..F¶.V-.Ât..v~Pá^=&.w.&.7. 000100
FC468335 75C00B04 C4830329 E80E37FF 260277FF 26FC5EC4 46EB08C4 83013CE8 Ò<..6.ŠFá^=&.w.&.7.Ò)..6..âu5.F= 000120
FC5EC493 75223C80 2602478E 2607FF26 37882628 74024708 26078826 FC5EC404 .á^=&..&.G.t+&.7&..&.G.&.<"u.á^= 000140
0688A100 00E846C7 00E2E9FF FF88C874 C00B04C4 8302F4E8 0E37FF26 0277FF26 &.w.&.7.Ò¶..6..âtù¡..Õâ.úFÒ..Â.. 000160
E846FFEC 5689EA46 89065788 26044788 26EA5EC4 14E8EC56 89EA4689 068A1688 .....Fõ.V$Š.á^õ&.G.&.W..Fõ.V$.FÒ 000180
5689F846 8902C483 11310830 9A500004 05E001E0 D1E84688 E475EC46 08EA4688 .Fõ.F$uõ.FÒ1Â1Â...P.=.1..6..F%.V 0001A0
04EBA326 E8468805 7C068E04 EF168926 04EDA326 FA568805 7A068EAD 74000BFA *.ÂtÙ..z..V*&ÈÙ.&..ÿ...|. FÒ&ÈŠ. 0001C0
5EC41A74 C20BEC56 89EA4689 06578826 04478826 EA5EC40B EB068A16 880688A1 Â......Š.á^õ&.G.&.W..Fõ.V$ ôt.á^ 0001E0
```

```
Dump of file SATURN:[PCCOMMON.DUMP.PBIN]DMLBE.EXE;1 on 18-APR-1990 10:54:43.95
File ID (364,10,0)   End of file block 17 / Allocated 20

Virtual block number 12 (0000000C), 512 (0200) bytes

478926C0 2BF85EC4 D1E80257 89260789 2604F846 83F85EC4 02578826 078826EA õ&..&.W.á^%.F%.&..&.W.Š1á^%+â&.G 000000
57882604 47882606 881EC423 74C208EC 5689EA46 89068A16 880688A1 07892602 .&..Â.......Fõ.V$.ôt#6...&.G.&.W 000020
55C85DE5 885EC02B CCE804C4 8311960B 289AEA76 FFEC76FF 068A1689 0688A306 .È.......v$.võ.(....6.Šä+ä^.[]ùU 000040
5EC422E8 FE5689FC 4689F856 89F64689 08568806 46880000 E846C71A EC83EC8B .$.$.úFÒ...F..V..F-.V%.F=.V±Š"6^ 000060
FC46FFF8 5689F646 89C28CC3 880A753A 3C04742F 3C08745C 3CE64688 078A26FC =&...F]<\t.</t.<:u..û.ô.F-.V%.F= 000080
FF8F74C0 0B02C483 12000CDC 9A509807 8A26FC5E C41973FC 46390C56 880A4688 .F..V.9F=s.á^=&...P.È....6..âte. 0000A0
40085688 06468820 753A3F80 260A5EC4 0C56890A 4689F856 88F64688 D9EBFC46 F=Š\.F-.V%.F..V.á^.&.?;u .F..V.â 0000C0
88078A26 0A5EC401 62E904C4 83016CE8 0E0676FF 0876FF10 740C563B 0575C338 ;ûu.;V.t..v..v..Òl..6.Öb.á^.&... 0000E0
07BE9A06 76FF0876 FFFA4689 4006462B C3880975 3A3C0474 2F3C0874 5C3CE646 F]<\t.</t.<:u..û+F.â.F*.v..v../. 000100
1E0533B8 F45689F2 46890686 16880684 A1BA74D0 08EC5689 EA468904 C483122A *..6..Fõ.V$.Ât□Â.......F·.V¶¡3.. 000120
76FFEC76 FF501E05 358800BC E90375C0 0808C483 124408F8 9AEA76FF EC76FF50 P.v$.võ.%.D..6..âu.Õ¥.¡5..P.v$.v 000140
743A3C35 745C3CE6 4688078A 260A5EC4 00A2E903 75C00808 C483126E 08F89AEA õ.%.n..6..âu.ÕÂ.á^.&...F]<\t5<:t 000160
0876FF0F 74D00808 56890646 8904C483 12980C4C 9AEA76FF EC76FF2D 742F3C31 1</t-.v$.võ.L....6..F..V._Ât..v. 000180
04C48312 A80AB09A EA76FFEC 76FF00A9 E9FFFF88 6374C008 04C48300 8AE80E50 P.Ò□..6..âtc¡..Ò`..v$.võ.¯.´..6. 0001A0
FA76FFEA 76FFEC76 FFD574D0 08F05689 EE468902 C48312C0 0B3D9A50 40FA4603 .F*âP.=.ë..6..FŸ.VÞ.Ât[.v$.võ.v* 0001C0
2B08C483 12F90818 9A5052FA 46030AC4 8312DA0C 229A50F0 76FF0676 FF0876FF .v..v..vÞP.".Ö..6..F*RP...*..6.+ 0001E0
```

Dump of file SATURN:[PCCOMMON.DUMP.PBIN]DMLBE.EXE;1 on 18-APR-1990 10:54:43.95
File ID (364,10,0)   End of file block 17 / Allocated 20

Virtual block number 13 (0000000D), 512 (0200) bytes

```
468904C4 830A4207 8E9A5050 C02BE846 FF9075C0 0B04C483 0057E80E 5052FA46 F*RP.ÒW..á..áU..FÒ+áPP./.B..á..F 000000
26F25EC4 0074F446 08F2468B FEB5E903 7500E87E 83FF11E9 0374D00B EC5689EA ō.V‡.Āt.Ō...~Ō.u.Ōç±.F·.F¶t.á^·& 000020
55CB50E5 88C02B04 C4830084 E80E5052 068A168B 068BA107 EB06578B 2604478B .G.&.W.Š.À......RP.Ò...á.+á.[]ùU 000040
56EBFFFF B8057500 08FE5689 FC468902 C48313F7 08309A50 0008B804 EC83EC8B .&.&.|..P.*.X..á..F=.V±.Āu.|..ŠV 000060
0688A104 47892606 478926C0 2BFC5EC4 02578926 07892608 56880646 88FC5EC4 á^=.F..V.&..&.W.á^=+á&.G.&.G.À.. 000080
FE5688FC 468800EB 06578926 04478926 FE5688FC 46880684 1EC41474 068A060B ....t.á....F=.V±&.G.&.W.Š..F=.V± 0000A0
08EC83EC 8855CB5D E58BC02B 06861689 0684A3FE 5688FC46 88068A16 890688A3 È.......F=.V±È......+á.[]ùU.±.±. 0000C0
7D740008 FA5689F8 46890657 8B260447 8826065E C40092E9 03750846 0B06468B .F..F.u.Ō..á^.&.G.&.W..F%.V*.Āt) 0000E0
347DC008 08C4830F E208F89A 37FF2602 77FF26F8 5EC437FF 260277FF 26065EC4 á^.&.w.&.7á^%&.w.&.7.%.ā..á..á)4 000100
07892606 5EC40257 88260788 26F85EC4 FE5689FC 46890257 88260788 26065EC4 á^.&..&.W..F=.V±á^%&..&.W.á^.&.. 000120
8906578B 2604478B 26F85EC4 02578926 078926FE 5688FC46 88F85EC4 02578926 &.W.á^%.F=.V±&..&.W.á^%&.G.&.V.. 000140
5DE588FF 6EE90856 89064689 06578826 04478826 065EC497 75D008FA 5689F846 F%.V*.Āu.á^.&.G.&.W..F..V.Ōn..[] 000160
01980002 00F70002 02AC0103 00F60002 00690103 00000001 0ECD0002 002890C8 ù.(...ë.......i...–...¯...¥..... 000180
00900103 00050001 05F40103 00000003 0CE20002 00600005 032F0203 00000002 ....../...'...ã.......¶......... 0001A0
00C70103 006A0006 0A620203 00070002 02960103 00800001 02270103 00030002 ......'...............b...j...ú. 0001C0
02880103 00190001 02120103 00090003 01480103 00170001 02340103 008C0002 ......4.......H................. 0001E0
```

Dump of file SATURN:[PCCOMMON.DUMP.PBIN]DMLBE.EXE;1 on 18-APR-1990 10:54:43.95
File ID (364,10,0)   End of file block 17 / Allocated 20

Virtual block number 14 (0000000E), 512 (0200) bytes

```
00F60103 00230001 002D0103 00220001 0F320103 00880001 09170105 00100003 ..............2...*...-...#...-. 000000
03850203 00310001 045B0103 00270001 03AD0103 00260001 0F7D0103 001B0002 ......}...&...Ù...'...[.. 1..... 000020
07F20103 00280004 02750203 00820002 03E20103 00040007 0CFC0103 001A0004 ......=.......ã...ý...u... ...·. 000040
024C0103 003B0002 02A10103 003A0002 007C0103 00410001 08020103 00400001 ..@.......A...|...:...À...;...L. 000060
05320103 00450002 03C50103 02B50001 00940005 00440002 02640103 00410002 ..A...d...D.......ç...é...É...2. 000080
02DB0203 005C0001 044B0103 00590001 05600103 00370004 03040203 004D0001 ..M.......7...'...Y...K...\...Û. 0000A0
542D6E75 5220534D 00000000 00000000 00000000 00000000 00000000 004A0004 ..J.....................MS Run-T 0000C0
38383931 20296328 20746867 69727970 6F43202D 20797261 7262694C 20656D69 ime Library - Copyright (c) 1988 0000E0
5C6C6D64 5C6D656D 65726168 735C0011 70726F43 2074666F 736F7263 694D202C , Microsoft Corp..\sharemem\dml\ 000100
646E6568 63614220 4C4D4400 47554245 444C4044 00007369 622E6370 696C6D64 dmlipc.bis..DMLDEBUG.DML Backend 000120
00000077 6F646E69 5765626C 6D440000 7369622E 6D65736C 6D645C6D 65735C00 .\sem\dmlsem.bis..DmlbeWindow... 000140
00000000 00000000 00000000 00000000 00000000 FFFF0000 058F0000 00000000 ......¢......................... 000160
00000000 00000000 00000000 00000000 00000000 00000000 00000000 00000000 ................................ 000180
00000000 00000000 00000000 00000000 00000000 00000000 00000000 00000000 ................................ 0001A0
00000000 00000000 00000000 00000000 00000000 00000000 00000000 00000000 ................................ 0001C0
00000000 00000000 00000000 00000000 00000000 00000000 00000000 00000000 ................................ 0001E0
```

Dump of file SATURN:[PCCOMMON.DUMP.PBIN]DMLBE.EXE;1 on 18-APR-1990 10:54:43.95
File ID (364,10,0)   End of file block 17 / Allocated 20

Virtual block number 15 (0000000F), 512 (0200) bytes

```
00000000 00000000 00000000 00000000 00000000 00000000 00000000 00000000 ................................ 000000
00000000 00000000 00000000 00000000 00000000 00000000 00000000 00000000 ................................ 000020
00000000 00000000 00000000 00000000 00000000 00000000 00000000 00000000 ................................ 000040
00000000 00000000 00000000 00000000 00000000 00000000 00000000 00000000 ................................ 000060
00000000 00000000 00000000 00000000 00000000 00000000 00000000 00000000 ................................ 000080
00000000 00000000 00000000 00000000 00000000 00000000 00000000 00000000 ................................ 0000A0
00000000 00000000 00000000 00000000 00000000 00000000 00000000 00000000 ................................ 0000C0
00000000 00000000 00000000 00000000 00000000 00000000 00000000 00000000 ................................ 0000E0
00000000 00000000 00000000 00000000 00000000 00000000 00000000 00000000 ................................ 000100
00000000 00000000 00000000 00000000 00000000 00000000 00000000 00000000 ................................ 000120
00000000 00000000 00000000 00000000 00000000 00000000 00000000 00000000 ................................ 000140
00000000 00000000 00000000 00000000 00000000 00000000 00000000 00000000 ................................ 000160
00000000 00000000 00000000 00000000 00000000 00000000 00000000 00000000 ................................ 000180
00000000 00000000 00000000 00000000 00000000 00000000 00000000 00000000 ................................ 0001A0
00000000 00000000 00000000 00000000 00000000 00000000 00000000 00000000 ................................ 0001C0
00000000 00000000 00000000 00000000 00000000 00000000 00000000 00000000 ................................ 0001E0
```

```
Dump of file SATURN:[PCCOMMON.DUMP.PBIN]DMLBE.EXE;1 on 18-APR-1990 10:54:43.95
File ID (364,10,0)   End of file block 17 / Allocated 20

Virtual block number 16 (00000010), 512 (0200) bytes

 00000000 00000000 00000000 00000000 00000000 00000000 00000000 00000000 ................................ 000000
 00000000 00000000 00000000 00000000 00000000 00000000 00000000 00000000 ................................ 000020
 00000000 00000000 00000000 00000000 00000000 00000000 00000000 00000000 ................................ 000040
 00000000 00000000 00000000 00000000 00000000 00000000 00000000 00000000 ................................ 000060
 00000000 00000000 00000000 00000000 00000000 00000000 00000000 00000000 ................................ 000080
 00000000 00000000 00000000 00000000 00000000 00000000 00000000 00000000 ................................ 0000A0
 00000000 00000000 00000000 00000000 00000000 00000000 00000000 00000000 ................................ 0000C0
 00000000 00000000 00000000 00000000 00000000 00000000 00000000 00000000 ................................ 0000E0
 00000000 00000000 00000000 00000000 00000000 00000000 00000000 00000000 ................................ 000100
 00000000 00000000 00000000 00000000 00000000 00000000 00000000 00000000 ................................ 000120
 00000000 00000000 00000000 00000000 00000000 00000000 00000000 00000000 ................................ 000140
 00000000 0001FFFF 00304F46 4E495F45 4C49465F 435F0098 00000000 00000000 .........._C_FILE_INFO=......... 000160
 00000000 00000000 00008181 81001400 00000000 00000000 00000000 00000000 ................................ 000180
 00000000 000A0A0A 0A0A0A0A 0A0A0A0A 0A0A0A0A 0A0A0A0A 0A000000 00000000 ................................ 0001A0
 00000000 00000000 00000000 00010000 00000000 00000000 00000000 00000000 ................................ 0001C0
 00000000 00000000 00000000 00000000 00000000 00000000 00000000 00000000 ................................ 0001E0

Dump of file SATURN:[PCCOMMON.DUMP.PBIN]DMLBE.EXE;1 on 18-APR-1990 10:54:43.95
File ID (364,10,0)   End of file block 17 / Allocated 20

Virtual block number 17 (00000011), 512 (0200) bytes

 00000000 00000000 00000000 00000000 00000890 FFFFFFFF 002E2E00 2E003F2A *?.............................. 000000
 00000000 00000000 00000000 00002000 00000000 00000000 00000000 00000000 ................ ............... 000020
 2D0A0030 30303652 00003E3E 4753404E 3C3C009A 057C0576 05740572 FFFF0000 ....r.t.v.|...<<NMSG>>..R6000..- 000040
 746E6920 2D0A0033 30303652 0003000A 00776F6C 66726576 6F206863 61747320  stack overflow.....R6003..- int 000060
 6F6E202D 0A0D3830 30365200 08000A0D 30207962 20656469 76696420 72656765 eger divide by 0.....R6008..- no 000080
 09000A0D 73746E65 6D756772 6120726F 66206563 61707320 6867756F 6E652074 t enough space for arguments.... 0000A0
 6520726F 66206563 61707320 6867756F 6E652074 6F6E202D 0A0D3930 30365200 .R6009..- not enough space for e 0000C0
 72726520 656D6974 2D6E7572 00FF000A 0D00FC00 0A0D746E 656D6E6F 7269766E nvironment...*......run-time err 0000E0
 6F6E2074 6E696F70 20676E69 74616F6C 66202D0A 0D323030 36520002 0020726F or ...R6002..- floating point no 000100
 746E696F 70206C6C 756E202D 0A0D3130 30365200 01000A0D 64656461 6F6C2074 t loaded.....R6001..- null point 000120
 7A000200 00000205 78000200 02FFFFFF 000A0074 6E656D6E 67697373 61207265 er assignment..........x.......z 000140
 00000000 00000000 00000000 00000000 00000000 00000000 00000000 00000305 ................................ 000160
 00000000 00000000 00000000 00000000 00000000 00000000 00000000 00000000 ................................ 000180
 00000000 00000000 00000000 00000000 00000000 00000000 00000000 00000000 ................................ 0001A0
 00000000 00000000 00000000 00000000 00000000 00000000 00000000 00000000 ................................ 0001C0
 00000000 00000000 00000000 00000000 00000000 00000000 00000000 00000000 ................................ 0001E0
```

```
Dump of file SATURN:[PCCOMMON.DUMP.DLL]SA-DGPDL.DLL;1 on 18-APR-1990 10:50:24.16
File ID (438,15,0)   End of file block 13 / Allocated 16

Virtual block number 1 (00000001), 512 (0200) bytes

 00000000 00000040 00000000 00000088 0000FFFF 00000004 00000000 00975A4D MZ..............|.......à....... 000000
 00000080 00000000 00000000 00000000 00000000 00000000 00000000 00000000 ................................ 000020
 6F6E6E61 63206061 72676F72 70207369 685421CD 4C01B821 CD098400 0EBA1F0E ..ö..Ç.ë||.LëThis program canno 000040
 00000000 00000024 0A0D0D2E 65646F6D 20534F44 206E6920 6E757220 65622074 t be run in DOS mode....$....... 000060
 00080006 00000000 00000000 00000800 0006800E FE095BB9 008804E3 0505454E NE..D...¿[.±.................... 000080
 00000000 00000000 00010000 00040000 000005EE 02F102D8 00700070 00400021 !.à.p.p.Ü.þ.Ÿ._................. 0000A0
 08780F00 087800CF 046A0F00 04690087 01800F00 01AF006B 00860F00 00860061 a.......k.£...¯...i...j.ü.x...x. 0000C0
 54495845 0000004C 44504744 2D415308 01A60F01 01A50160 00360E00 00360169 i.6...6.m.È...|..SA-DGPDL...EXIT 0000E0
 54495845 0D000335 30303030 444E4F43 54495845 0D000234 30303030 444E4F43 COND00004...EXITCOND00005...EXIT 000100
 54495845 0D000537 30303030 444E4F43 54495845 0D000436 30303030 444E4F43 COND00006...EXITCOND00007...EXIT 000120
 4F420900 07434F52 50574F44 4E49574C 44504744 0F000638 30303030 444E4F43 COND00008...DGPDLWINDOWPROC...BO 000140
 0A323030 30305944 4F420900 09313030 30305944 4F420900 08303030 30305944 DY00000...BODY00001...BODY00002. 000160
 0C000C31 30303030 54434154 4958450C 00083030 30303054 43415449 58450C00 ..EXITACT00000...EXITACT00001... 000180
 58450C00 0E333030 30305443 41544958 450C000D 32303030 30544341 54495845 EXITACT00002...EXITACT00003...EX 0001A0
 54495845 0C001035 30303030 54434154 4958450C 000F3430 30303054 43415449 ITACT00004...EXITACT00005...EXIT 0001C0
 43415449 58450C00 12373030 30305443 41544958 450C0011 36303030 30544341 ACT00006...EXITACT00007...EXITAC 0001E0

Dump of file SATURN:[PCCOMMON.DUMP.DLL]SA-DGPDL.DLL;1 on 18-APR-1990 10:50:24.16
File ID (438,15,0)   End of file block 13 / Allocated 16

Virtual block number 2 (00000002), 512 (0200) bytes

 30544341 54495845 0C001438 30303030 54434154 4958450C 00133031 30303054 T00010...EXITACT00008...EXITACTO 000000
 30303054 43415449 58450C00 16393030 30305443 41544958 450C0015 31313030 0011...EXITACT00009...EXITACT000 000020
 34313030 30544341 54495845 0C001833 31303030 54434154 4958450C 00173231 12...EXITACT00013...EXITACT00014 000040
 00183631 30303054 43415449 58450C00 1A353130 30305443 41544958 450C0019 ...EXITACT00015...EXITACT00016.. 000060
 450C001D 30323030 30544341 54495845 0C001C37 31303030 54434154 4958450C .EXITACT00017...EXITACT00020...E 000080
 4958450C 001F3132 30303054 43415449 58450C00 1E383130 30305443 41544958 XITACT00018...EXITACT00021...EXI 0000A0
 41544958 450C0021 32323030 30544341 54495845 0C002039 31303030 54434154 TACT00019 ..EXITACT00022!..EXITA 0000C0
 54434154 4958450C 00233432 30303054 43415449 58450C00 22333230 30305443 CT00023"..EXITACT00024#..EXITACT 0000E0
 43544958 45000025 53455441 54534C44 50455441 5453415F 10002435 32303030 00025$.._ASTATEPDLSTATES%..EXITC 000100
 43544958 45000027 31303030 30444E4F 43544958 45000026 30303030 30444E4F OND00000Ɫ..EXITCOND00001'..EXITC 000120
 29001800 01000029 33303030 30444E4F 43544958 45000028 32303030 30444E4F OND00002(..EXITCOND00003)......) 000140
 5445405F 00626F6C 67687465 6D080001 8A017400 EE008000 7A006700 52003F00 .?.R.g.z...Ÿ.t.ɑ...methglob._MET 000160
 6F6C6C64 70085449 4E494D47 4441535F 0A6D6764 61730554 494E4942 4F4C4748 HGLOBINIT.sadgm._SADGMINIT.pd̄llo 000180
 494D4744 4C44505F 086D6764 6C647006 54494E49 534B4F4F 4C4C4450 0C73686F oks.PDLLOOKSINIT.pdldgm._PDLDGMI 0001A0
 086C6D64 6D666906 54494E49 424F4C47 4C4D445F 0C626F6C 676C6D64 0754494E NIT.dmlglob._DMLGLOBINIT.ifmdml. 0001C0
 0A455441 4552434D 4744094D 4744034E 49574D50 0554494E 494C4D44 4D46495F _IFMDMLINIT.P̄MWIN.DGM.DGMCREATE. 0001E0

Dump of file SATURN:[PCCOMMON.DUMP.DLL]SA-DGPDL.DLL;1 on 18-APR-1990 10:50:24.16
File ID (438,15,0)   End of file block 13 / Allocated 16

Virtual block number 3 (00000003), 512 (0200) bytes

 4F4F5A4D 47440F4D 41524741 49445741 52444D47 440E594F 52545345 444D4744 DGMDESTROY.DGMDRAWDIAGRAM.DGMZOO 000000
 504F4344 52414859 52455551 4D474416 5449464D 47440645 54554C4F 5342414D MABSOLUTE.DGMFIT.DGMQUERYHARDCOP 000020
 03444E55 4F424449 52475950 4F434452 41485445 534D4744 17454C44 4E414859 YHANDLE.DGMSETHARDCOPYGRIDBOUND. 000040
 54470A47 534D5453 4F504954 470A434F 52504C4F 4F544645 44495447 0E495447 GTI.GTIDEFTOOLPROC.GTIPOSTMSG.GT 000060
 51495447 12574F44 4E49574C 4F4F5459 52455551 49544712 47534D44 4E455349 ISENDMSG.GTIQUERYTOOLWINDOW.GTIQ 000080
 54504154 41445855 41595245 55514954 47124C4F 4F54574F 444E4957 59524555 UERYWINDOWTOOL.GTIQUERYAUXDATAPT 0000A0
 504C4F4F 54595245 55514954 47125254 50415441 44585541 54455349 54471052 R.GTISETAUXDATAPTR.GTIQUERYTOOLP 0000C0
 48115245 544E4952 5045474E 41484354 534F5053 43481453 43480354 4E455241 ARENT.HCS.HCSPOSTCHANGEPRINTER.H 0000E0
 5053434B 0F444952 47544553 5343480A 54554F59 414C4547 41505453 4F505343 CSPOSTPAGELAYOUT.HCSSETGR`D.HCSP 000100
 1047534D 444E4553 4854454D 5F0C444F 4854454D 064D4152 47414944 544E4952 RINTDIAGRAM.METHOD._METHS‹'DMSG. 000120
 49544E41 54534E49 45444854 45405F12 45544149 544E4154 534E4948 54454D5F _METHINSTANTIATE._M̄ETHDEIN_'ᵃNTI 000140
 01030779 03040101 7F03014E 03011D03 00F50300 C4030205 015A0304 01455441 ĀTE...Z....å..%.¯..N.......y... 000160
 01040300 050300A6 03007703 00480300 19030000 03031A00 6C030043 03000003 ....C..l..........H..w..Ì..f.... 000180
 E70302BC 03029103 02660302 38030210 03018803 01E50301 620301BA 03013303 .3..ɑ..b..|.........;..f.....¥..ô 0001A0
 02040176 03060104 3F030414 0303E903 038E0303 3D030393 03031203 03680302 ..h........=../..Ō.....?....v... 0001C0
 44000000 726F7469 6445204C 44502041 53000000 00930300 62030031 03000003 ....1..b.......SA PDL Editor...D 0001E0
```

Dump of file SATURN:[PCCOMMON.DUMP.DLL]SA-DGPDL.DLL;1 on 18-APR-1990 10:50:24.16
File ID (438,15,0)   End of file block 13 / Allocated 16

Virtual block number 4 (00000004), 512 (0200) bytes

```
080E468B D88EFFFF B81E5657 000000C8 00000001 434F5250 4C4F4F54 4C445047 GPDLTOOLPROC....à...WV.¡...Ä.F.. 000000
6A0676FF 0876FF02 73680E76 FF1076FF 001CE900 1FE90000 B80009E9 03741046 F.t.Õ..¡..Õ..Õ...v..v.hs..v..v.j 000020
68D88E00 08B81E56 57000000 C8000CCA C95F5E1F 0000E90C C4830000 FFFF9A00 .......é.Õ...^_èð..à...WV.¡...Äh 000040
000000C8 000CCAC9 5F5E1F00 00E908C4 83000000 329A006A 0676FF08 76FF0274 t..v..v.j..2....é.Õ...^_èð..à... 000060
00000006 00740002 00029000 0CCAC95F 5E1F0000 E90000B8 D88E004B B81E5657 WV.¡K..Ä¡..Õ...^_èð.......t..... 000080
4C0C7E83 D88EFFFF B81E5657 000000C8 00000000 00000000 01C10008 00580203 ..[...é..........Õ...WV.¡...Ä.~.L 0000A0
0CCAC95F 5E1F0000 E90000B8 0003E900 01B80006 E903746C 0C7E8300 09E90375 u.Õ...~.lt.Õ..¡..Õ..¡..Õ...^_èð. 0000C0
B80006E9 0374750C 7E830009 E9037555 0C7E8308 8E0008B8 1E565700 0000C800 .à...WV.¡...Ä.~.Uu.Õ...~.ut.Õ..¡ 0000E0
7E83088E 0039B81E 56570000 00C8000C CAC95F5E 1F0000E9 00008800 03E90001 ..Õ..¡..Õ...^_èð..à...WV.¡9..Ä.~ 000100
C95F5E1F 0000E900 00B80003 E90001B8 0006E903 74640C7E 830009E9 0375440C .Du.Õ...~.dt.Õ..¡..Õ..¡..Õ...^_è 000120
06E90374 700C7E83 0009E903 75500C7E 83D88E00 6AB81E56 57000000 C8000CCA ð..à...WV.¡j..Ä.~.Pu.Õ...~.pt.Õ. 000140
D88E009B B81E5657 000000C8 000CCAC9 5F5E1F00 00E90000 B80003E9 0001B800 .¡..Õ..¡..Õ...^_èð..à...WV.¡...Ä 000160
5E1F0000 E90000B8 0003E900 01B80006 E903746E 0C7E8300 09E90375 4E0C7E83 .~.Nu.Õ...~.nt.Õ..¡..Õ..¡..Õ...^ 000180
0003E900 01B80006 E9037409 0C7E8308 8E00CCB8 1E565700 0000C800 0CCAC95F _èð..à...WV.¡ë..Ä.~..t.Õ..¡..Õ.. 0001A0
E9037553 0C7E8308 8E00FDB8 1E565700 0000C800 0CCAC95F 5E1F0000 E90000B8 ¡..Õ...^_èð..à...WV.¡»..Ä.~.Su.Õ 0001C0
00C8000C CAC95F5E 1F0000E9 00008800 03E90001 B80006E9 0374730C 7E830009 ...~.st.Õ..¡..Õ..¡..Õ...^_èð..à. 0001E0
```

Dump of file SATURN:[PCCOMMON.DUMP.DLL]SA-DGPDL.DLL;1 on 18-APR-1990 10:50:24.16
File ID (438,15,0)   End of file block 13 / Allocated 16

Virtual block number 5 (00000005), 512 (0200) bytes

```
E90001B8 0006E903 74720C7E 830009E9 0375520C 7E83D88E 0125B81E 56570000 ..WV.¡%..Ä.~.Ru.Õ...~.rt.Õ..¡..Õ 000000
75480C7E 83D88E01 56B81E56 57000000 C8000CCA C95F5E1F 0000E900 00B80003 ..¡..Õ...^_èð..à...WV.¡V..Ä.~.Hu 000020
010CCAC9 5F5E1F00 00E90000 B80003E9 0001B800 06E90374 680C7E83 0009E903 .Õ...~.ht.Õ..¡..Õ..¡..Õ...^_èð.. 000040
E90000B8 D88EFFFF B81E5657 000000C8 00000000 00000000 00000601 87000200 ...............à...WV.¡...Ä¡..Õ 000060
006A0676 FF0876FF 02616808 8E0008B8 1E565700 0000C800 0CCAC95F 5E1F0000 ...^_èð..à...WV.¡...Äha..v..v.j. 000080
B81E5657 000000C8 000CCAC9 5F5E1F00 00E90000 B80006E9 08C48300 00FFFF9A ......é.Õ..¡..Õ...^_èð..à...WV.¡ 0000A0
0000E900 00B80006 E908C483 00000031 9A006A06 76FF0876 FF026468 D88E0021 !..Ähd..v..v.j..1....é.Õ..¡..Õ.. 0000C0
609A006A 0676FF08 76FF0265 68D88E00 50B81E56 57000000 C8000CCA C95F5E1F .^_èð..à...WV.¡P..Ähe..v..v.j..` 0000E0
007FB81E 56570000 00C8000C CAC95F5E 1F0000E9 00008800 06E908C4 83000000 ......é.Õ..¡..Õ...^_èð..à...WV.¡.. 000100
5E1F0000 E90000B8 0006E908 C4830000 008F9A00 6A0676FF 0876FF02 6668D88E .Ähf..v..v.j.......é.Õ..¡..Õ...^ 000120
0000BE9A 006A0676 FF0876FF 026768D8 8E00AEB8 1E565700 0000C800 0CCAC95F _èð..à...WV.¡Ô..Ähg..v..v.j../.. 000140
D88E00DD B81E5657 000000C8 000CCAC9 5F5E1F00 00E90000 B80006E9 08C48300 ..é.Õ..¡..Õ...^_èð..à...WV.¡Ï..Ä 000160
C95F5E1F 0000E900 00B80006 E908C483 000000ED 9A006A06 76FF0876 FF026868 hh..v..v.j..Û....é.Õ..¡..Õ...^_è 000180
83000001 1C9A006A 0676FF08 76FF0263 68D88E01 0CB81E56 57000000 C8000CCA ð..à...WV.¡...Ähc..v..v.j....... 0001A0
6268D88E 013BB81E 56570000 00C8000C CAC95F5E 1F0000E9 00008800 06E908C4 é.Õ..¡..Õ...^_èð..à...WV.¡;..Ähb 0001C0
57000000 C8000CCA C95F5E1F 0000E908 C4830000 01489A00 6A0676FF 0876FF02 ..v..v.j..K....é.Õ...^_èð..à...W 0001E0
```

Dump of file SATURN:[PCCOMMON.DUMP.DLL]SA-DGPDL.DLL;1 on 18-APR-1990 10:50:24.16
File ID (438,15,0)   End of file block 13 / Allocated 16

Virtual block number 6 (00000006), 512 (0200) bytes

```
00008800 06E908C4 83000001 7A9A006A 0676FF08 76FF0269 68D88E01 6AB81E56 V.¡j..Ähi..v..v.j..z....é.Õ..¡.. 000000
76FF0876 FF027168 0E6AD88E 0193B81E 56570000 00C8000C CAC95F5E 1F0000E9 Õ...^_èð..à...WV.¡...Äj.hq..v..v 000020
8E01C2B8 1E565700 0000C800 0CCAC95F 5E1F0000 E90AC483 000001A3 9A006A06 .j..Ê....é.Õ...^_èð..à...WV.¡ð.. 000040
000CCAC9 5F5E1F00 00E90AC4 83000001 D49A006A 0676FF08 76FF0271 680F6AD8 Äj.hq..v..v.j..Å....é.Õ...^_èð.. 000060
C4830000 01FF9A00 6A0676FF 0876FF02 7168106A D88E01ED B81E5657 000000C8 à...WV.¡Ü..Äj.hq..v..v.j.......é 000080
FF0876FF 02716811 6AD88E02 18B81E56 57000000 C8000CCA C95F5E1F 0000E90A .Õ...^_èð..à...WV.¡...Äj.hq..v.. 0000A0
0243B81E 56570000 00C8000C CAC95F5E 1F0000E9 0AC48300 00022A9A 006A0676 v.j..*....é.Õ...^_èð..à...WV.¡C. 0000C0
0CCAC95F 5E1F0000 E90AC483 00000255 9A006A06 76FF0876 FF027168 136AD88E .Äj.hq..v..v.j..U....é.Õ...^_èð. 0000E0
83000002 809A006A 0676FF08 76FF0271 68146AD8 8E026EB8 1E565700 0000C800 .à...WV.¡n..Äj.hq..v..v.j....... 000100
0876FF02 7168166A D88E0299 B81E5657 000000C8 000CCAC9 5F5E1F00 00E90AC4 é.Õ...^_èð..à...WV.¡...Äj.hq..v. 000120
C4B81E56 57000000 C8000CCA C95F5E1F 0000E90A C4830000 02AB9A00 6A0676FF .v.j..¨....é.Õ...^_èð..à...WV.¡é 000140
CAC95F5E 1F0000E9 0AC48300 0002D69A 006A0676 FF0876FF 02716817 6AD88E02 ..Äj.hq..v..v.j..ø....é.Õ...^_èð 000160
00000301 9A006A06 76FF0876 FF027168 286AD88E 02EFB81E 56570000 00C8000C ..à...WV.¡ÿ..Äj(hq..v..v.j....... 000180
76FF0271 68296AD8 8E031AB8 1E565700 0000C800 0CCAC95F 5E1F0000 E90AC483 .é.Õ...^_èð..à...WV.¡...Äj)hq..v 0001A0
B81E5657 000000C8 000CCAC9 5F5E1F00 00E90AC4 83000003 2C9A006A 0676FF08 ..v.j..,....é.Õ...^_èð..à...WV.¡ 0001C0
C95F5E1F 0000E90A C4830000 03579A00 6A0676FF 0876FF02 7168226A D88E0345 E..Äj"hq..v..v.j..W....é.Õ...^_è 0001E0
```

```
Dump of file SATURN:[PCCOMMON.DUMP.DLL]SA-DGPDL.DLL;1 on 18-APR-1990 10:50:24.16
File ID (438,15,0)   End of file block 13 / Allocated 16

Virtual block number 7 (00000007), 512 (0200) bytes

 0003829A 006A0676 FF0876FF 02716823 6AD88E03 70B81E56 57000000 C8000CCA ò..à...WV.jp..Äj#hq..v..v.j..... 000000
 FF027168 1A6AD88E 039B881E 56570000 00C8000C CAC95F5E 1F0000E9 0AC48300 ..á.Õ...^_èò..à...WV.j...Äj.hq.. 000020
 1E565700 0000C800 0CCAC95F 5E1F0000 E90AC483 000003AD 9A006A06 76FF0876 v..v.j..Ù....á.Õ...^_èò..à...WV. 000040
 5F5E1F00 00E90AC4 83000003 D89A006A 0676FF08 76FF0271 681C6AD8 8E03C688 jó..Äj.hq..v..v.j..Ä....á.Õ...^_ 000060
 04039A00 6A0676FF 0876FF02 7168086A D88E03F1 881E5657 000000C8 000CCAC9 èò..à...WV.jp..Äj.hq..v..v.j.... 000080
 02716824 6AD88E04 1CB81E56 57000000 C8000CCA C95F5E1F 0000E90A C4830000 ...á.Õ...^_èò..à...WV.j...Äj$hq. 0000A0
 06044700 0200020C CAC95F5E 1F0000E9 0AC48300 00042E9A 006A0676 FF0876FF .v..v.j.......á.Õ...^_èò.....G.. 0000C0
 C8F046C7 D88EFFFF 881E5657 000048C8 00000000 0001C100 08045902 03000000 .....Y...è......àH..WV.j...ÄúFÞà 0000E0
 BA76FF00 6A006ABA 5E8C8846 89018E88 0000E046 C708000E 46C70000 F246C710 .úF·..úFB..úFÀ..j...Fj.^¤j.j..v¤ 000100
 800E76FF E076FF01 6A006A00 00FFFF9A 046A006A 020068FF FF68FFFF 688876FF .vjh..h..h..j.j.......j.j..vÀ.vB. 000120
 0000FFFF 9A5016FC 4680006A 006A006A 006A006A 006A8876 FFBA76FF 5016F046 FÞ.P.v¤.vjj.j.j.j.j.j..F= P..... 000140
 E6468BE6 46890000 FFFF9A00 6A006A00 13E90374 E4460BE2 468BE456 89E24689 .Fã.Võ.Fã.Fõt.Õ..j.j...... Fl.Fl 000160
 9268E876 FFEA76FF EA5689E8 46890000 FFFF9A80 0268E276 FFE476FF 00C1E999 .Õë..võ.vãh........Fò.Võ.v¿ ^h. 000180
 FE578B26 FC478B26 085EC404 08468300 00FFFF9A 40006840 00688004 68016A01 .j.h..h.ah.a......F..ó^.&.G=&.W± 0001A0
 83FFFF00 009A5016 8C468DFC 77FF26FE 77FF2608 5EC40408 4683FA56 89F84689 .F½.V'.F..ó^.&.w±&.w=.F¥.P...... 0001C0
 76FFFA76 FF50168C 46800000 FFFF9A50 16EC468D E276FFE4 76FF006A 006A08C4 ó.j.j..võ.vã.Fš.P......F¥.P.v'.v 0001E0

Dump of file SATURN:[PCCOMMON.DUMP.DLL]SA-DGPDL.DLL;1 on 18-APR-1990 10:50:24.16
File ID (438,15,0)   End of file block 13 / Allocated 16

Virtual block number 8 (00000008), 512 (0200) bytes

 76FF0676 FF16C483 0000FFFF 9A006A01 6A5016F4 46800676 FFEC76FF EE76FFF8 ½.vŸ.vš.v..F¶.Pj.j.......ó..v..v 000000
 BA0000B8 08C48300 00FFFF9A 006AF476 FFF676FF 02586800 00FFFF9A F476FFF6 -.v¶.....hX..v-.v¶j.......á.j..¤ 000020
 FF0C76FF 058BE90E 4688D88E 0008881E 56570000 1EC8CBC9 5F5E1F00 00E90000 ..Õ...^_èùà...WV.j...Ä.F.Õ...v.. 000040
 FF0E76FF 1076FF05 E9E90000 BA0000B8 05F2E906 C4830034 00009A10 76FF0A76 v..v...4..á.Õ·.j..¤..ÕÕ..v..v.. 000060
 00000218 9A5016F2 46801076 FF05CFE9 0000FFFF 9A0676FF 0876FF0A 76FF0C76 v..v..v..v......Õü..v..F·.P..... 000080
 006AF276 FFF476FF 0CC48300 0002369A 006AF276 FFF476FF 02796850 16EC468D .Fš.Phy..v¶.v·j..ó....á..v¶.v·j. 0000A0
 B8000001 359A006A 006A1076 FF0000FF FF9AEC76 FFEE76FF 06C48300 00FFFF9A ......á..vŸ.vš......v.j.j..5...j 0000C0
 E90000BA 00008800 0107C726 0A5EC405 71E90000 BA0000B8 057AE900 008A0000 ..¤..Õz.j..¤..Õq.á^.&ú...j..¤..Õ 0000E0
 F476FF02 78685016 E8468DFE 46890A46 88000002 709A5016 F2468D10 76FF0560 '..v..F·.P.p....F..F±.FÒ.Phx..v¶ 000100
 FFEA76FF 333568FE 76FF0018 E90375FF FE7E830C C4830000 02869A00 6AF276FF .v·j.......á..-±.u.Õ...v±h53.võ. 000120
 9A5016F2 46801076 FF0508E9 0000BA00 00B80000 FFFF9A50 52C02806 5688E876 vÒ.V.+åRP.....j..¤..Õ...v..F·.P. 000140
 04E2E90C C4830000 02829A00 6AF276FF F476FF02 60680A76 FF0C76FF 00000299 .....v..v.h'..v¶.v·j..ý....á.Õã. 000160
 6AF276FF F476FF02 8E680A76 FF0C76FF 0676FF00 0002C59A 5016F246 8D1076FF .v..F·.P.é....v..v..v.h...v¶.v·j 000180
 79685016 EC468D00 00FFFF9A 5016F246 8D1076FF 04B6E90E C4830000 02DA9A00 ..Ö....á.ÕÑ..v..F·.P......Fš.Phy 0001A0
 00FFFF9A 5016FA46 8DEC76FF EE76FF0C C4830000 01459A00 6AF276FF F476FF02 ..v¶.v·j..E....ó..vŸ.vš.F'.P.... 0001C0
 FFFF68FF FF68E276 FFE476FF 01FAE90A 46880000 FFFF9A50 16E2468D 1076FF00 ..v..Fã.P......F.Õ'..võ.vãh..h.. 0001E0

Dump of file SATURN:[PCCOMMON.DUMP.DLL]SA-DGPDL.DLL;1 on 18-APR-1990 10:50:24.16
File ID (438,15,0)   End of file block 13 / Allocated 16

Virtual block number 9 (00000009), 512 (0200) bytes

 07E90375 00E67E83 E6468900 00FFFF9A FA76FFFC 76FFEC76 FFEE76FF 006A006A j.j..vŸ.vš.v=.v'......Fl.~l.u.Õ. 000000
 6AF276FF F476FF02 95685016 F0468D04 31E90000 BA0000B8 043AE999 E6468800 ..Fl.Õ:.j..¤..Õ1..FÞ.Ph...v¶.v·j 000020
 E6468900 00FFFF9A F076FFFA 76FFFC76 FFE276FF E476FF0C C4830000 039A9A00 .......á..võ.vã.v=.v'.vÞ......Fl 000040
 9E685016 F0468D03 E9E90000 BA0000B8 03F2E999 E6468800 07E90375 00E67E83 .~l.u.Õ...Fl.Õ·.j..¤..ÕÕ..FÞ.Ph. 000060
 890000FF FF9AF076 FFEC76FF EE76FF0C C4830000 04CF9A00 6AF276FF F476FF02 ..v¶.v·j..ü....á..vŸ.vš.vÞ...... 000080
 76FFE476 FF03A7E9 0000BA00 00B803B0 E999E646 880007E9 037500E6 7E83E646 Fl.~l.u.Õ...Fl.Õ¯.j..¤..Õl..võ.v 0000A0
 76FFFC76 FFE276FF E476FF03 80E90000 BA0000B8 0000FFFF 9AFA76FF FC76FFE2 ã.v=.v'.....j..¤..Õ...võ.vã.v=.v 0000C0
 BA0000B8 0000041E 9A016AEC 76FFEE76 FF0373E9 0000BA00 00B80000 FFFF9AFA '.....j..¤..Õs..vŸ.všj......j..¤ 0000E0
 76FFEE76 FF0347E9 0000BA00 00B80000 04349A03 6AEC76FF EE76FF03 5DE90000 ..Õ]..vŸ.všj..4...j..¤..ÕG..vŸ.v 000100
 00B80000 04609A07 6AEC76FF EE76FF03 31E90000 BA0000B8 0000044A 9A056AEC šj..J...j..¤..Õ1..vŸ.všj..'...j. 000120
 EE76FF03 05E90000 BA0000B8 00000476 9A096AEC 76FFEE76 FF031BE9 0000BA00 .¤..Õ...vŸ.všj..v...j..¤..Õ...vŸ 000140
 000004A2 9A006AEC 76FFEE76 FF02EFE9 0000BA00 00B80000 048C9A08 6AEC76FF .všj......j..¤..Õÿ..vŸ.všj..Å... 000160
 FF02C3E9 0000BA00 00B80000 FFFF9A0F 6AEC76FF EE76FF02 D9E90000 BA0000B8 j..¤..Õ1..vŸ.všj......j..¤..Õù.. 000180
 A49A006A F276FFF4 76FF026A 6802AFE9 0000BA00 00B80000 FFFF9AEC 76FFEE76 vŸ.vš.....j..¤..Õ€.hj..v¶.v·j..€ 0001A0
 FFFF9A20 6A006A00 6A006A01 94681E01 6A006A01 6A006A00 A0E908C4 83000005 ....á.Õ..j.j.j.j..h..j.j.j.j ... 0001C0
 037501B5 30004BE9 0376FEF9 E9037501 FF30007B E90277E9 0000BA00 00B80000 ..j..¤..Õw.Õ(.=..u.Õ'±v.ÕK.=ç.u. 0001E0
```

```
Dump of file SATURN:[PCCOMMON.DUMP.DLL]SA-DGPDL.DLL;1 on 18-APR-1990 10:50:24.16
File ID (438,15,0)   End of file block 13 / Allocated 16

Virtual block number 10 (0000000A), 512 (0200) bytes

 FE9BE903 7501B430 FD0CE903 7701B030 FFB9E903 7301AF30 001BE903 76FED2E9 Õ@±v.Õ..=£.s.Õ¿.=¯.w.Õ£»=Ç.ᴗ.Õ.± 000000
 037501FC 30FDF6E9 037501FB 30FF80E9 037501C7 30FF88E9 037501C4 30FFA6E9 Õl.=á.u.Õ..=ü.u.Õ..=«.u.Õ-»=ª.u. 000020
 57044104 28041505 69A7FF2E 93C003FF 78E90376 00073002 002DFF83 E9FE36E9 Õ6±Õ..-..=..v.Õx..å...Ti...+.A.W 000040
 FA9A5016 E2468D10 76FF0000 06309A50 16F2468D 1076FF04 AF049904 83046004 .m.....£..v..F·.P.0....v..Fä.P.ª 000060
 76FFEE76 FF0CC483 000005CD 9A006AF2 76FFF476 FF027968 5016EC46 80000002 ....Få.Phy..v¶.v·j..ë....á..vŸ.v 000080
 0005E49A 006AF276 FFF476FF 02906800 4BE90A46 88000002 ED9A5016 FA468DEC å.Fª.P.Ü....F.ÕK.h...v¶.v·j..õ.. 0000A0
 680183E9 9908C483 000005FB 9A006AF2 76FFF476 FF029168 019AE999 08C48300 ..á..Õ..h...v¶.v·j..«....á..Õ..h 0000C0
 7500103D 001BE900 1EE9016C E99908C4 83000006 409A006A F276FFF4 76FF0292 ...v¶.v·j..ə....á..Õl.Õ..Õ..=..u 0000E0
 9A5016F2 468D1076 FFFFDFE9 FFCBE903 75001230 FFBCE903 75001130 FFADE903 .ÕÜ.=..u.Õ¥.=..u.Õù.ÕÕ..v..F·.P. 000100
 F2468D10 76FF0128 E908C483 000001C1 9A006AF2 76FFF476 FF029868 000001AC ¯...h...v¶.v·j..ė....á.Õ(..v..F· 000120
 1076FF01 05E908C4 83000006 AE9A006A F276FFF4 76FF029C 68000006 769A5016 .P.v...h...v¶.v·j..Ü....á.Õ...v. 000140
 76FF0C76 FF0E76FF 1076FF00 1AE90374 F44608F2 46880000 05829A50 16F2468D .F·.P......F·.F¶t.Õ...v..v..v..v 000160
 03529A00 6AF276FF F476FF02 7A680E76 FF0003E9 000006E1 9A0676FF 0876FF0A ..v..v..Ã...Õ£..v.hz..v¶.v·j..R. 000180
 76FF001D E9037400 F87E8300 26E90374 02F67E83 F85689F6 4689990A C4830000 ...á...F-.V½.—.t.Õ£..-½.t.Õ...v 0001A0
 5688F646 880009E9 008AE900 00019C9A 0676FF08 76FF0A76 FF0C76FF 0E76FF10 ..v..v..v..v..v......Õ..Õ...F-.V 0001C0
 75100230 FA74E903 7510013D 002BE903 76FF4BE9 037510CE 30007BE9 007EE9F8 ½Õ-.Õ(.=ö.u.ÕK.v.Õ+.=..u.Õtª=..u 0001E0

Dump of file SATURN:[PCCOMMON.DUMP.DLL]SA-DGPDL.DLL;1 on 18-APR-1990 10:50:24.16
File ID (438,15,0)   End of file block 13 / Allocated 16

Virtual block number 11 (0000000B), 512 (0200) bytes

 30FF3EE9 FB64E903 7510CC3D FA7FE903 75100430 FA50E903 7510033D FA75E903 .Õuª=..u.ÕPª=..u.Õ.ª=ä.u.Õd«Õ>.= 000000
 30FF1EE9 FE2DE903 751B623D FEE3E903 7510CF30 0013E903 76FAC1E9 03751DAD Ù.u.Õèªv.Õ..=ü.u.ÕÐ±=b.u.Õ-±Õ..= 000020
 E9FAF8E9 03753337 30FAABE9 03753334 30FAA2E9 03751D80 30FB65E9 03751DAF £.u.Õe«=¯.u.ÕÂª=43u.Õ¨ª=73u.Õ½ªÕ 000040
 5689F446 890C5688 0A468808 8E0162B8 1E565700 000CC800 0CCAC95F 5E1FFEFB «±.^_èò..à...WV.|b..Ä.F..V..F¶.V 000060
 740A4639 12568810 46880096 E9007EE9 0E4688FC 46890A46 88FA4689 06468BF6 -.F..Fª.F..F•.F.Õ-.Õ...F..V.9F.t 000080
 463B0000 FFFF9A00 6A056A10 76FF1276 FF007DE9 0003E903 740C5639 000BE903 .Õ..9V.t.Õ..Õ)..v..v.j.j......;F 0000A0
 9A5016F8 468D1076 FF1276FF 0058E900 5BE90003 E903740C 563B000B E903740A .t.Õ..;V.t.Õ..Õ[.ÕX..v..v..F½.P. 0000C0
 0C76FF50 5299F846 881DAE68 FE76FF00 00FFFF9A 5016FE46 80F876FF 0000FFFF .....v½.F±.P......v±hÕ..F½.RP.v. 0000E0
 B3E90375 00003DFF 7AE90375 00083000 1BE9001E E90021E9 0000FFFF 9A0A76FF .v......Õ!.Õ..Õ..=..u.Õz.=..u.Õª 000100
 76FF0876 FF0A76FF 0C76FF0E 76FF1076 FF1276FF FFDFE9FF 60E90375 000F3DFF .=..u.Õm.ÕÕ..v..v..v..v..v..v..v 000120
 E9000088 088E0781 881E5657 000000C8 000ECAC9 5F5E1F00 00E90000 FFFF9A06 ......Õ...^_èò..à...WV.|...Ä|..Õ 000140
 000500ED 00020000 00040178 00020130 00090653 02030023 90CBC95F 5E1F0000 ...^_èù.#...S...=...x.......Ù... 000160
 00080663 02030150 000901E8 02030000 00060868 00020006 000803A8 02030000 ....¯...#...h.......Š...P...c... 000180
 00070086 01030161 000907FD 020301CE 00080124 02030099 0008030E 020501C1 è...........$...ö...»...ª....... 0001A0
 00070041 010300F2 00090698 02030099 00080308 0202010F 000801D1 020300F3 µ...l...Õ...............·...A... 0001C0
 000A03F2 0203008C 0007006C 01030084 00080102 02030088 000704EE 01030003 ....Ÿ...............l.......·... 0001E0

Dump of file SATURN:[PCCOMMON.DUMP.DLL]SA-DGPDL.DLL;1 on 18-APR-1990 10:50:24.16
File ID (438,15,0)   End of file block 13 / Allocated 16

Virtual block number 12 (0000000C), 512 (0200) bytes

 000707CA 0103008E 000801DF 02030013 0007009E 01030101 0009025A 02030178 x...Z...............Ô.......ð... 000000
 00080408 02030117 0009058F 0203018D 000A0308 0203010C 00090814 02030019 ............Ä................... 000020
 00070080 0103012A 000907F0 0203019F 000A0369 02030082 00070852 010300A8 ˙...R...ý...i.......Þ...*...§... 000040
 000805B7 020301AA 000A0321 02030779 00040037 00050088 000804B6 02030030 =...Ñ...|...7...y...!...¯...ñ... 000060
 8ED88CFE 880A76C5 1EDE88D7 88EC8855 00000000 00000000 00000000 0000008F ¢...............U.š.■.ß.év..±.Ä. 000080
 88F388A4 F3C913A5 F3E90149 A4027401 A8C78806 7EC401F7 AEF2FFFF B9C033C0 å3å¿..·Ú½lá~..ú´.t.Èl1ÕµÈ.èµÈ.µ. 0000A0
 0000007A 00010014 00000000 00000071 00000000 00000000 0000C850 C28C1FFA ª..ð]ù..........q...........z... 0000C0
 00030038 00770034 0062007A 0003002C 00480028 0031007A 00030020 0019001C .... ...z.1.(.H.,...z.b.4.w.8... 0000E0
 01040058 00F5007A 00030050 00D5004C 00C4007A 00030044 00A60040 0093007A z...ə.Î.D...z.á.L.f.P...z.¥.X... 000100
 017F007A 00030074 01620070 014E007A 00030068 01330064 011D007A 0003005C \...z...d.3.h...z.N.p.b.t...z... 000120
 00020098 01E50000 0000332A 0002008C 01BA0000 00003329 00030080 018BFFFF ........)3....¤.....*3....l..... 000140
 02660000 0000332D 000200B0 023B0000 0000332B 000200A4 02100000 0000332C ,3......Ê...+3....;.¯...-3....f. 000160
 00003332 00020004 02BC0000 00003331 000200C8 02910000 0000332E 0002008C ¥....3......à...13....¥.å...23.. 000180
 000200F8 03300000 00003338 000200EC 03120000 00003338 000200E0 02E70000 ..Ô.Â...83......å...;3....=.½... 0001A0
 038E0000 0000332F 00020110 03930000 0000333A 00020104 03680000 00003339 93....h.....:3........../3..../. 0001C0
 00003333 00020134 04140000 0000333C 00020128 03E90000 00003330 0002011C ....03....Õ.(...<3......4...33.. 0001E0
```

```
Dump of file SATURN:[PCCOMMON.DUMP.DLL]SA-DGPDL.DLL;1 on 18-APR-1990 10:50:24.16
File ID (438,15,0)   End of file block 13 / Allocated 16

Virtual block number 13 (0000000D), 512 (0200) bytes

 017A0000 00000000 FFFF0000 FFFF0000 00000000 0000FFFF 0002FFFF 043F0000 ..?.........................z. 000000
 006C0000 00030000 00000170 00430000 00020000 00000164 00000000 0001FFFF ........d.........C.p.........l. 000020
 6744FFFF 016A0001 018C015E 00010186 01520001 01800144 00000000 0000FFFF ........D.....R.....^.....j...Dg 000040
 02000000 01015800 02000465 6C62616C 69617661 20746579 20746F4E 006C6450 Pdl.Not yet available....X...... 000060
 00000000 00000000 00000000 06014E00 02000000 03000800 02000000 02001000 .................N.............. 000080
 00000000 00000000 00000000 00000000 00000000 00000000 00000000 00000000 ................................ 0000A0
 00000000 00000000 00000000 00000000 00000000 00000000 00000000 00000000 ................................ 0000C0
 00000000 00000000 00000000 00000000 00000000 00000000 00000000 00000000 ................................ 0000E0
 00000000 00000000 00000000 00000000 00000000 00000000 00000000 00000000 ................................ 000100
 00000000 00000000 00000000 00000000 00000000 00000000 00000000 00000000 ................................ 000120
 00000000 00000000 00000000 00000000 00000000 00000000 00000000 00000000 ................................ 000140
 00000000 00000000 00000000 00000000 00000000 00000000 00000000 00000000 ................................ 000160
 00000000 00000000 00000000 00000000 00000000 00000000 00000000 00000000 ................................ 000180
 00000000 00000000 00000000 00000000 00000000 00000000 00000000 00000000 ................................ 0001A0
 00000000 00000000 00000000 00000000 00000000 00000000 00000000 00000000 ................................ 0001C0
 00000000 00000000 00000000 00000000 00000000 00000000 00000000 00000000 ................................ 0001E0

Dump of file SATURN:[PCCOMMON.DUMP.DLL]SA-DIFM.DLL;1 on 18-APR-1990 10:50:26.92
File ID (450,15,0)   End of file block 323 / Allocated 324

Virtual block number 1 (00000001), 512 (0200) bytes

 00000000 00000040 00000000 000000B8 0000FFFF 00000004 00000125 009C5A4D MZ..X...........|.......a....... 000000
 00000080 00000000 00000000 00000000 00000000 00000000 00000000 00000000 ................................ 000020
 6F6E6E61 63206D61 72676F72 70207369 685421CD 4C01B821 CD09B400 0EBA1F0E ..¤..Ç.ël|.LëlThis program canno 000040
 00000000 00000024 0A0D0D2E 65646F6D 20534F44 206E6920 6E757220 65622074 t be run in DOS mode....$....... 000060
 00160021 00000000 000F0000 00000000 0012800E 16788207 000A0F6C 0505454E NE..l.....x.................!... 000080
 00000000 00000000 0001000F 00040000 00000FF6 01CB019F 01840148 00400029 ).a.H.....ù.-................... 0000A0
 26660F00 2666057B 14840F00 1484042A 16900F00 16900290 16860F00 16860102 ..............*.......(.f&..f& 0000C0
 1E1E0F00 1E1E0F87 23F60F00 23F60D37 07760F00 07760CBA 49AE0F00 49AE07FB «.0l..Ûl¤.v...v.7.-#..-#........ 0000E0
 0E020F00 0E021B6C 0A300F00 0A301ABA 44A40F00 44A41650 4ACA0F00 4ACA1184 ..ðJ..ðJP.ÊD..ÊD¤.0...0.l....... 000100
 42BC0F00 42BC1E1F 00110F00 00111E1C 055C0F00 055C1D89 15020F00 15021C50 ].......¿.\...\...........¥B..¥B 000120
 01201EF1 01202709 27381EF1 27382495 25800F01 230A2252 02020E01 00000000 ........R"Ò#...X.$8'þ.8'.' .þ. . 000140
 01201EF1 01202781 01201EF1 0120276F 01201EF1 0120275D 04201EF1 0420271B .' .þ. .]' .þ. .o' .þ. ..' .þ. . 000160
 01E11EB1 01E127D5 01E11EB1 01E127B6 01071EB1 010727A5 01201EF1 01202793 .' .þ. .E'..Ý...Ñ'Á.Ý.Á.í'Á.Ý.Á. 000180
 00491EB1 00492837 00591EB1 00592831 01CE1EB1 01CE2814 01F81EB1 01F827F4 ¶'%.Ý.%..(ö.Ý.ö.1(Y.Ý.Y.7(I.Ý.I. 0001A0
 03920001 03910001 03900001 038F0001 038E0001 03840001 01601EB1 0160283C <('.Ý.'......................... 0001C0
 032A0003 020A0003 02C60003 02B20003 02E00003 02F80003 029E0003 03930001 ..........%...Ù...ý...ó...Ö...*. 0001E0

Dump of file SATURN:[PCCOMMON.DUMP.DLL]SA-DIFM.DLL;1 on 18-APR-1990 10:50:26.92
File ID (450,15,0)   End of file block 323 / Allocated 324

Virtual block number 2 (00000002), 512 (0200) bytes

 01000002 434F5250 574F444E 49574441 530D0000 4D464944 2D415307 01CC0003 ..Ì..SA-DIFM...SADWINDOWPROC.... 000000
 F90B7909 42080E05 36038602 AB020801 CC006400 52004900 43003D00 2B001500 ...+.=.C.I.R.d.ö...¨...6.B.B.y.ù 000020
 54494E49 424F4C47 4C4D4408 626F6C67 6C6D6407 0000940D 7C0CA80C 8E0C4808 .H...¨.|.....dmlglob.DMLGLOBINIT 000040
 46490A6C 6D646D66 69065449 4E49424F 4C474854 454D0C62 6F6C6768 74656D08 .methglob.METHGLOBINIT.ifmdml.IF 000060
 54550353 4C4C4143 534F4408 49504740 50054E49 57405005 54494E49 4C4D444D MDMLINIT.PMWIN.PMGPI.DOSCALLS.UT 000080
 54484552 49555143 414C4D44 006C6D64 03554E45 4D4E4F49 54504F4C 5455004C L.UTLOPTIONMENU.dml.DMLACQUIREHT 0000A0
 4552464C 4D440C4E 5854504F 54534C4D 440A4E58 54574F52 524F424C 4D440C4D M.DMLBORROWTXN.DMLSTOPTXN.DMLFRE 0000C0
 55514C4D 440D454C 444E4148 4C45444F 4D595245 55514C4D 44134C45 444F4D45 EMODEL.DMLQUERYMODELHANDLE.DMLQU 0000E0
 45494654 45534C4D 4408444C 45494659 52455551 4C4D4400 544E554F 43595245 ERYCOUNT.DMLQUERYFIELD.DMLSETFIE 000100
 524C4D44 09314E4C 52595245 55514C4D 440C4E4C 52595245 55514C4D 4408444C LD.DMLQUERYRLN.DMLQUERYRLN1.DMLR 000120
 0944494C 4D445952 4555514C 4D440D54 53494C45 4552464C 4D440845 54414C45 ELATE.DMLFREELIST.DMLQUERYDMLID. 000140
 0C545845 54444145 524C4D44 08455445 4C45444C 4D440945 54414552 434C4D44 DMLCREATE.DMLDELETE.DMLREADTEXT. 000160
 45544154 53595245 55515245 544C4946 4C4D4413 54584554 45544952 574C4D44 DMLWRITETEXT.DMLFILTERQUERYSTATE 000180
 4F54534C 4D441246 464F5245 544C4946 4C4D440C 4E4F5245 544C4946 4C4D4408 .DMLFILTERON.DMLFILTEROFF.DMLSTO 0001A0
 4C4D4413 5443454A 424F5443 454C4553 4C4D440F 48434142 4C4C4F52 4E585450 PTXNROLLBACK.DMLSELECTOBJECT.DML 0001C0
 454C4553 4C4C4159 52455551 4C4D4415 45544154 53544345 4C455359 52455551 QUERYSELECTSTATE.DMLQUERYALLSELE 0001E0
```

Dump of file SATURN:[PCCOMMON.DUMP.DLL]SA-DIFM.DLL;1 on 18-APR-1990 10:50:26.92
File ID (450,15,0)   End of file block 323 / Allocated 324

Virtual block number 3 (00000003), 512 (0200) bytes

```
43404540 0D4D454D 03455A49 53544F4C 53595245 55514C4D 44105453 494C5443 CTLIST.DMLQUERYSLOTSIZE.MEM.MEMC 000000
4F4C4C41 4D454D00 50414548 594F5254 53454440 45400E50 41454845 54414552 REATEHEAP.MEMDESTROYHEAP.MEMALLO 000020
544C4C49 4B495447 0B495447 034B434F 4C424545 52464045 4D0C4B43 4F4C4243 CBLOCK.MEMFREEBLOCK.GTI.GTIKILLT 000040
54470A47 53405453 4F504954 470A434F 52504C4F 4F544645 44495447 0E4C4F4F OOL.GTIDEFTOOLPROC.GTIPOSTMSG.GT 000060
53495447 10574F44 4E49574C 4F4F5459 52455551 49544712 47534044 4E455349 ISENDMSG.GTIQUERYTOOLWINDOW.GTIS 000080
124C4F4F 54574F44 4E495759 52455551 49544712 574F444E 49574C4F 4F545445 ETTOOLWINDOW.GTIQUERYWINDOWTOOL. 0000A0
41544144 58554154 45534954 47105254 50415441 44585541 59524555 51495447 GTIQUERYAUXDATAPTR.GTISETAUXDATA 0000C0
41424C54 55105455 4403544E 45524150 4C4F4F54 59524555 51495447 12525450 PTR.GTIQUERYTOOLPARENT.DUT.UTLBA 0000E0
13524F53 52554345 5341454C 45524741 424C5455 13524F53 52554354 494E4947 GINITCURSOR.UTLBAGRELEASECURSOR. 000100
550C4548 41405145 534C5455 0A524F53 52554345 54415245 54494741 424C5455 UTLBAGITERATECURSOR.UTLSEQMAKE.U 000120
49514553 4C54550E 4854474E 454C5145 534C5455 0C454B41 404E5551 45534C54 TLSEQUNMAKE.UTLSEQLENGTH.UTLSEQI 000140
52494651 45534C54 55004C45 45564F4D 45525145 534C5455 0E524542 4D454D53 SMEMBER.UTLSEQREMOVEEL.UTLSEQFIR 000160
4C454853 55505145 534C5455 0C4C4544 4E4F4345 53514553 4C54550E 4C455453 STEL.UTLSEQSECONDEL.UTLSEQPUSHEL 000180
41514553 4C54550D 5954504D 45514553 4C54550B 4C45504F 50514553 4C54550B .UTLSEQPOPEL.UTLSEQEMPTY.UTLSEQA 0001A0
54414552 43545050 48530B50 48530345 5A49535A 53505455 440A4D45 54494444 DDITEM.DUTPSZSIZE.SHP.SHPPTCREAT 0001C0
584F4250 48530C58 4F424E49 54505048 530A594F 52545345 44545050 48530C45 E.SHPPTDESTROY.SHPPTINBOX.SHPBOX 0001E0
```

Dump of file SATURN:[PCCOMMON.DUMP.DLL]SA-DIFM.DLL;1 on 18-APR-1990 10:50:26.92
File ID (450,15,0)   End of file block 323 / Allocated 324

Virtual block number 4 (00000004), 512 (0200) bytes

```
48544449 57584F42 5048530B 594F5254 53454458 4F425048 53004554 41455243 CREATE.SHPBOXDESTROY.SHPBOXWIDTH 000000
4F425048 530A5245 544E4543 584F4250 48530C54 48474945 48584F42 5048530C .SHPBOXHEIGHT.SHPBOXCENTER.SHPBO 000020
534F5243 584F4250 48531045 44495354 46494853 584F4250 48530F57 4F524758 XGROW.SHPBOXSHIFTSIDE.SHPBOXCROS 000040
49535952 45555158 4F425048 530F4E4F 494E5558 4F425048 530B584F 42534553 SESBOX.SHPBOXUNION.SHPBOXQUERYSI 000060
0C594F52 54534544 454E494C 5048530E 45544145 5243454E 494C5048 53004544 DE.SHPLINECREATE.SHPLINEDESTROY. 000080
530E544E 554F4359 52455551 454E494C 50485311 54504444 41454E49 4C504853 SHPLINEADDPT.SHPLINEQUERYCOUNT.S 0000A0
00584F42 53455353 4F524345 4E494C50 48531154 50595245 5551454E 494C5048 HPLINEQUERYPT.SHPLINECROSSESBOX. 0000C0
50485312 594F5254 53454442 54585450 48530E45 54414552 43425458 54504853 SHPTXTBCREATE.SHPTXTBDESTROY.SHP 0000E0
54484749 45485445 53425458 54504853 10584F42 444E554F 42544553 42545854 TXTBSETBOUNDBOX.SHPTXTBSETHEIGHT 000100
4146544E 4F465445 53425458 54504853 12545355 4A544553 42545854 5048530E .SHPTXTBSETJUST.SHPTXTBSETFONTFA 000120
45534254 58545048 530F454C 59545354 4E4F4654 45534254 58545048 53134543 CE.SHPTXTBSETFONTSTYLE.SHPTXTBSE 000140
4E455458 45595245 55514254 58544445 444F4C50 58455048 531A5345 54594254 TBYTES.SHPEXPLODEDTXTBQUERYEXTEN 000160
0E45444F 4D434F53 53415445 53445242 0F455441 45524344 52420944 52420354 T.BRD.BRDCREATE.BRDSETASSOCMODE. 000180
41525453 4E4F4345 43524F46 4E454452 4215544E 45545845 59524555 51445242 BRDQUERYEXTENT.BRDENFORCECONSTRA 0001A0
4554454C 45444145 52414452 42004554 41455243 41455241 4452420D 53544E49 INTS.BRDAREACREATE.BRDAREADELETE 0001C0
4212544E 45545845 54455341 45524144 52421043 4F535341 41455241 4452420C .BRDAREAASSOC.BRDAREASETEXTENT.B 0001E0
```

Dump of file SATURN:[PCCOMMON.DUMP.DLL]SA-DIFM.DLL;1 on 18-APR-1990 10:50:26.92
File ID (450,15,0)   End of file block 323 / Allocated 324

Virtual block number 5 (00000005), 512 (0200) bytes

```
53555952 45555141 45524144 52421454 4E455458 45595245 55514145 52414452 RDAREAQUERYEXTENT.BRDAREAQUERYUS 000000
45524144 5242134F 464E4952 45535554 45534145 52414452 42124F46 4E495245 ERINFO.BRDAREASETUSERINFO.BRDARE 000020
45524144 52421045 564F4041 45524144 52420B54 53494444 4E554F52 54455341 ASETROUNDDIST.BRDAREAMOVE.BRDARE 000040
4E4E4F43 4452420D 45544145 52434E4E 4F434452 42004544 49535446 49485341 ASHIFTSIDE.BRDCONNCREATE.BRDCONN 000060
49445445 534E4E4F 43445242 0D434F53 53414E4E 4F434452 420C4554 454C4544 DELETE.BRDCONNASSOC.BRDCONNSETDI 000080
52455551 4E4E4F43 44524214 5450524F 48434E41 5445534E 4E4F4344 5242124D M.BRDCONNSETANCHORPT.BRDCONNQUER 0000A0
44524214 4F464E49 52455355 5445534E 4E4F4344 52421254 50524F48 434E4159 YANCHORPT.BRDCONNSETUSERINFO.BRD 0000C0
45544145 52434554 554F5244 52420E4F 464E4952 45535559 52455551 4E4E4F43 CONNQUERYUSERINFO.BRDROUTECREATE 0000E0
52421343 4F535341 4554554F 52445242 00455445 4C454445 54554F52 4452420E .BRDROUTEDELETE.BRDROUTEASSOC.BR 000100
55595245 55514554 554F5244 5242154F 464E4952 45535554 45534554 554F5244 DROUTESETUSERINFO.BRDROUTEQUERYU 000120
4F524452 4212454E 494C4859 52455551 4554554F 52445242 124F464E 49524553 SERINFO.BRDROUTEQUERYHLINE.BRDRO 000140
52420054 50595245 55514554 554F5244 52420F54 4E554F43 59524555 51455455 UTEQUERYCOUNT.BRDROUTEQUERYPT.BR 000160
52421054 50454341 4C504552 4554554F 52445242 11545044 44414554 554F5244 DROUTEADDPT.BRDROUTEREPL,CEPT.BR 000180
42135254 54415445 53455455 4F524452 420F5450 45564F4D 45524554 554F5244 DROUTEREMOVEPT.BRDROUTESE ATTR.B 0001A0
59524555 51455455 4F524452 42134049 44574F52 52415445 53455455 4F524452 RDROUTESETARROWDIM.BRDROU  'JERY 0001C0
4542414C 4452420E 45544145 52435448 47494152 54534452 4211544E 45545845 EXTENT.BRDSTRAIGHTCREATE.BRDLABE 0001E0
```

```
Dump of file SATURN:[PCCOMMON.DUMP.DLL]SA-DIFM.DLL;1 on 18-APR-1990 10:50:26.92
File ID (450,15,0)   End of file block 323 / Allocated 324

Virtual block number 6 (00000006), 512 (0200) bytes

414C4542 414C4452 42004554 454C4544 4C454241 4C445242 0E455441 4552434C LCREATE.BRDLABELDELETE.BRDLABELA 000000
514C4542 414C4452 4213544E 45545845 5445534C 4542414C 44524211 434F5353 SSOC.BRDLABELSETEXTENT.BRDLABELQ 000020
42154F46 4E495245 53555445 534C4542 414C4452 4213544E 45545845 59524555 UERYEXTENT.BRDLABELSETUSERINFO.B 000040
564F4D4C 4542414C 4452420C 4F464E49 52455355 59524555 514C4542 414C4452 RDLABELQUERYUSERINFO.BRDLABELMOV 000060
43454A42 4F444E49 46445242 16545054 41544345 4A424F44 4E494644 52421145 E.BRDFINDOBJECTATPT.BRDFINDOBJEC 000080
46445242 10545845 4E595245 5551444E 49464452 42104E4F 49474552 4E495354 TSINREGION.BRDFINDQUERYNEXT.BRDF 0000A0
52594252 41454E45 4E494D52 45544544 44524217 444E454E 4F494745 52444E49 INDREGIONEND.BRDDETERMINENEARBYR 0000C0
45524154 45534452 420E4554 554F5242 55535452 45534E49 44524211 4554554F OUTE.BRDINSERTSUBROUTE.BRDSETARE 0000E0
54545050 414E5344 52421344 49524745 54554F52 54455344 52420F44 49524741 AGRID.BRDSETROUTEGRID.BRDSNAPPTT 000100
4D4D4744 0B455441 45524345 444F4D4D 47440D44 4F4D0344 49524741 4552414F OAREAGRID.MOD.DGMMODECREATE.DGMM 000120
59524555 5145444F 4D4D4744 114C4C55 5045444F 4D4D4744 0B485355 5045444F ODEPUSH.DGMMODEPULL.DGMMODEQUERY 000140
4F4D4D47 44125443 4E554645 53554F4D 54455345 444F4D4D 47441454 53524946 FIRST.DGMMODESETMOUSEFUNCT.DGMMO 000160
444D4744 0A455441 4552434D 4744094D 47440354 434E5546 59454B54 45534544 DESETKEYFUNCT.DGM.DGMCREATE.DGMD 000180
52464552 4D47440A 5345444F 4D524553 55524145 4C434D47 4411594F 52545345 ESTROY.DGMCLEARUSERMODES.DGMREFR 0001A0
4D415247 41494457 4152444D 47440E58 4F424853 45524645 52404744 0D485345 ESH.DGMREFRESHBOX.DGMDRAWDIAGRAM 0001C0
47440C45 54554C4F 5342414D 4F4F5A4D 47440F4D 4F4F5A50 55544553 4D47440C .DGMSETUPZOOM.DGMZOOMABSOLUTE.DG 0001E0

Dump of file SATURN:[PCCOMMON.DUMP.DLL]SA-DIFM.DLL;1 on 18-APR-1990 10:50:26.92
File ID (450,15,0)   End of file block 323 / Allocated 324

Virtual block number 7 (00000007), 512 (0200) bytes

45544553 4D47440E 4E46544E 49415054 45534D47 44004E46 4E45504F 5445534D MSETOPENFN.DGMSETPAINTFN.DGMSETE 000000
4D474409 5449464D 4744064E 4645534F 4C435445 534D4744 004E4654 4E455458 XTENTFN.DGMSETCLOSEFN.DGMFIT.DGM 000020
4445444E 554F5257 4152444D 47441158 4F425741 52444D47 440A584F 42544946 FITBOX.DGMDRAWBOX.DGMDRAWROUNDED 000040
4D474410 4554554F 52574152 444D4744 0C454E49 4C574152 444D4744 0B584F42 BOX.DGMDRAWLINE.DGMDRAWROUTE.DGM 000060
4E494C44 45444F4C 50584557 4152444D 47441352 4F544345 4E4E4F43 57415244 DRAWCONNECTOR.DGMDRAWEXPLODEDLIN 000080
4C505845 57415244 4D474415 584F4244 45444F4C 50584557 4152444D 47441245 E.DGMDRAWEXPLODEDBOX.DGMD. WEXPL 0000A0
4152544D 47440F54 504D524F 46534E41 52544D47 440E474E 49525453 4445444F ODEDSTRING.DGMTRANSFORMPT.. "TRA 0000C0
0B474553 454E494C 4F485452 4F594252 41454E4D 47441558 4F424D52 4F46534E NSFORMBOX.DGMNEARBYORTHOLINESEG. 0000E0
4D47440B 4F464E49 52455355 59524555 514D4744 104E4550 59524555 514D4744 DGMQUERYPEN.DGMQUERYUSERINFO.DGM 000100
45534D47 4409454D 41524644 4E574859 52455551 4D474411 53504859 52455551 QUERYHPS.DGMQUERYHWNDFRAME.DGMSE 000120
440E4F46 4E495245 53555445 534D4744 0E54494E 55544553 4D47440A 4E455054 TPEN.DGMSETUNIT.DGMSETUSERINFO.D 000140
41485950 4F434452 41485952 4555514D 47441652 54504553 554F4D54 45534D47 GMSETMOUSEPTR.DGMQUERYHARDCOPYHA 000160
4D474411 444E554F 42444952 4759504F 43445241 48544553 4D474417 454C444E NDLE.DGMSETHARDCOPYGRIDBOUND.DGM 000180
4B434F4C 42545845 54545241 54534D47 44155449 44455458 45544853 494E4946 FINISHTEXTEDIT.DGMSTARTTEXTBLOCK 0001A0
5F0C5353 414C4352 45545349 47455248 5445405F 12444F48 5445D006 54494445 EDIT.METHOD._METHREGISTERCLASS._ 0001C0
5F104753 4D544E45 52415044 4E455348 5445405F 1247534D 444E4553 4854454D METHSENDMSG._METHSENDPARENTMSG._ 0001E0

Dump of file SATURN:[PCCOMMON.DUMP.DLL]SA-DIFM.DLL;1 on 18-APR-1990 10:50:26.92
File ID (450,15,0)   End of file block 323 / Allocated 324

Virtual block number 8 (00000008), 512 (0200) bytes

4149544E 4154534E 49454448 5445405F 12455441 49544E41 54534E49 4854454D METHINSTANTIATE._METHDEINSTANTIA 000000
43455649 52454448 5445405F 1047534D 54534E49 444E4553 4854454D 5F104554 TE._METHSENDINSTMSG._METHDERIVEC 000020
50455441 4552434D 41530E53 44534554 41455243 4D41530C 4D415303 5353414C LASS.SAM.SAMCREATESDS.SAMCREATEP 000040
524F5453 45544145 5243D041 530F574F 4C464554 41455243 4D41530D 53434F52 ROCS.SAMCREATEFLOW.SAMCREATESTOR 000060
4354534F 50534348 14534348 03524F52 52455353 45434F52 504D4153 5F105345 ES._SAMPROCESSERROR.HCS.HCSPOSTC 000080
480A5455 4F59414C 45474150 54534F50 5343481 5245544E 49525045 474E4148 HANGEPRINTER.HCSPOSTPAGELAYOUT.H 0000A0
530A5455 4153044D 41524741 4944544E 49525053 43480F44 49524754 45535343 CSSETGRID.HCSPRINTDIAGRAM.SAUT.S 0000C0
4C4D4416 54554C4D 44054E58 54545241 54535455 41530C52 54535445 47545541 AUTGETSTR.SAUTSTARTTXN.DMLUT.DML 0000E0
45545349 47455254 554C4D44 1352454C 444E4148 59464954 4F4E454B 414D5455 UTMAKENOTIFYHANDLER.DMLUTREGISTE 000100
554C4D44 10455445 4C454544 45545349 47455254 554C4D44 13455441 4C455252 RRELATE.DMLUTREGISTERDELETE.DMLU 000120
12455449 52575245 54534947 45525455 4C4D4412 54455352 45545349 47455254 TREGISTERSET.DMLUTREGISTERWRITE. 000140
52455453 49474552 54554C4D 441B5946 49544F4E 53534543 4F525054 554C4D44 DMLUTPROCESSNOTIFY.DMLUTREGISTER 000160
44114154 41445855 41544553 54554C4D 440F4554 414C4552 4E554554 414C4552 RELATEUNRELATE.DMLUTSETAUXDATA.D 000180
4649544F 4E595245 55515455 4C4D4416 41544144 58554159 52455551 54554C4D MLUTQUERYAUXDATA.DMLUTQUERYNOTIF 0001A0
03454C49 464F5250 5445474B 5345440E 48534544 41444153 08454C44 4E414859 YHANDLE.SADADESK.DESKGETPROFILE. 0001C0
61726761 69442041 53170000 14920301 F4030202 45544952 57534F44 084F4953 SIO.DOSWRITE...¶.......SA Diagra 0001E0
```

Dump of file SATURN:[PCCOMMON.DUMP.DLL]SA-DIFM.DLL;1 on 18-APR-1990 10:50:26.92
File ID (450,15,0)   End of file block 323 / Allocated 324

Virtual block number 9 (00000009), 512 (0200) bytes

```
00000001 434F5250 4C4F4F54 44415308 0000726F 74696445 204D4649 202D2060 m - IFM Editor...SADTOOLPROC.... 000000
F44680 7C 6A696AF2 76FFF246 8967478B 26065EC4 D88EFFFF 881E5657 000018C8 à...WV.¡...Äé^.&.Gg.F·.v·jij|.F¶ 000020
56880646 88F45EC4 0778E9F0 46880006 E9037500 0030F046 890000FF FF9A5016 .P......Fÿ=..u.Ö...FÞÕ(.é^¶.F..V 000040
0006E903 7500003D F0468900 00006F9A 5016FC46 8DF276FF 02578926 07892608 .&..&.W..v·.F•.P.o....Fÿ=..u.Ö.. 000060
46880006 E9037500 0030F046 890000FF FF9A5016 F8468DF2 76FF074D E9F04688 .FÞÕM..v·.F%.P......Fÿ=..u.Ö...F 000080
8926FA56 88F84688 F45EC418 57892616 478926FE 5688FC46 88F45EC4 072FE9F0 ÞÕ/.é^¶.F=.V±&.G.&.W.é^¶.F%.V²&. 0000A0
46880006 E9037500 0030F046 890000FF FF9A5016 EC468DF2 76FF0657 89260447 G.&.W..v·.F$.P......Fÿ=..u.Ö...F 0000C0
5EC40000 0C47C726 F45EC410 5789260E 478926EE 5688EC46 88F45EC4 06EFE9F0 ÞÕÿ.é^¶.F$.VŸ&.G.&.W.é^¶&úG...é^ 0000E0
2247C726 F45EC400 002047C7 26F45EC4 00001C47 C726F45E C400001A 47C726F4 ¶&úG...é^¶&úG...é^¶&úG ..é^¶&úG" 000100
5EC42847 89262A47 89260000 88F45EC4 24478926 26478926 000088F4 5EC40000 ..é^¶¡..&.G&&.G$é^¶¡..&.G*&.G(é^ 000120
47C726F4 5EC40847 89260A47 89260000 88F45EC4 2C478926 2E478926 000088F4 ¶¡..&.G.&.G,é^¶¡..&.G.&.G.é^¶&úG 000140
52E9F046 880006E9 03750000 3DF04689 000001ED 9A5016E8 468DF276 FF00001E ....v·.FÒ.P.Ü....Fÿ=..u.Ö...FÞÕR 000160
68019068 006AE876 FFEA76FF 00000183 9AFFFF68 01706805 6AE876FF EA76FF06 ..vö.vÒj.h).h........vö.vÒj.h..h 000180
E876FFEA 76FF0000 01A99AFF FF6801A3 68076AE8 76FFEA76 FF000001 969AFFFF ........vö.vÒj.hÈ.h...`. ..vö.vÒ 0001A0
000001CF 9AFFFF68 01C96808 6AE876FF EA76FF00 0001BC9A FFFF6801 B668096A j.hÑ.h...¥....vö.vÒj.hè.' ..ü... 0001C0
38478926 EA5688E8 4688F45E C4000002 119AFFFF 68020868 0A6AE876 FFEA76FF .vö.vÒj.h..h.......é^¶.FÒ 'õ&.G8 0001E0
```

Dump of file SATURN:[PCCOMMON.DUMP.DLL]SA-DIFM.DLL;1 on 18-APR-1990 10:50:26.92
File ID (450,15,0)   End of file block 323 / Allocated 324

Virtual block number 10 (0000000A), 512 (0200) bytes

```
E9F04688 0006E903 75000030 F0468900 0002559A 5016E846 8DF276FF 3A578926 &.W:.v·.FÒ.P.U....Fÿ=..u.Ö...FÞÕ 000000
02316802 6AE876FF EA76FF00 0002249A FFFF6802 1E68006A E876FFEA 76FF05B1 Ÿ..vö.vÒj.h..h...$....vö.vÒj.h1. 000020
4688F45E C4000002 9F9A029C 68027368 016AE876 FFEA76FF 00000279 9A028968 h...y....vö.vÒj.hs.h.......é^¶.F 000040
7500003D F0468900 0002BD9A 5016E846 8DF276FF 3E578926 3C478926 EA5688E8 Ò.Vö&.G<&.W>.v·.FÒ.P.§....Fÿ=..u 000060
EA76FF00 00028C9A FFFF6802 8668006A E876FFEA 76FF0549 E9F04688 0006E903 .Ö...FÞÕI..vö.vÒj.h..h........vö 000080
FF9AFFFF 68020868 016AE876 FFEA76FF 000002E1 9AFFFF68 02996802 6AE876FF .vÒj.h..h...Ã....vö.vÒj.hÙ.h.... 0000A0
0002FF9A 5016E846 8DF276FF 42578926 40478926 EA5688E8 4688F45E C40000FF ...é^¶.FÒ.Vö&.G@&.WB.v·.FÒ.P.... 0000C0
FFFF6803 1D68016A E876FFEA 76FF04E1 E9F04688 0006E903 7500003D F0468900 ..Fÿ=..u.Ö...FÞÕÃ..vö.vÒj.h..h.. 0000E0
FF9A5016 E8468DF2 76FF4657 89264447 8926EA56 88E84688 F45EC400 0003239A .#...é^¶.FÒ.Vö&.GD&.WF.v·.FÒ.P.. 000100
68FFFF68 006AE876 FFEA76FF 049FE9F0 46880006 E9037500 0030F046 890000FF ....Fÿ=..u.Ö...FÞÕ...vö.vÒj.h..h 000120
E876FFEA 76FF0000 03889AFF FF680343 68026AE8 76FFEA76 FF0000FF FF9AFFFF ........vö.vÒj.hC.h........vö.vÒ 000140
76FF4A57 89264847 8926EA56 88E84688 F45EC400 0003819A 03AE6803 8568016A j.h..hÛ..Ÿ...é^¶.FÒ.Vö&.GH&.WJ.v 000160
FFEA76FF 0437E9F0 46880006 E9037500 0030F046 89000003 CF9A5016 E8468DF2 ·.FÒ.P.ü....Fÿ=..u.Ö...FÞÕ7..vö. 000180
03F39AFF FF6803AB 68046AE8 76FFEA76 FF000003 9E9A0320 68039868 006AE876 vÒj.h..h .......vö.vÒj.h¨.h...µ. 0001A0
8926EA56 88E8468B F45EC400 0004069A 04036803 ED68016A E876FFEA 76FF0000 ...vö.vÒj.hÚ.h.......é^¶.FÒ.Vö&. 0001C0
46880006 E9037500 003DF046 89000004 249A5016 E8468DF2 76FF4E57 89264C47 GL&.WN.v·.FÒ.P.$....Fÿ=..u.Ö...F 0001E0
```

Dump of file SATURN:[PCCOMMON.DUMP.DLL]SA-DIFM.DLL;1 on 18-APR-1990 10:50:26.92
File ID (450,15,0)   End of file block 323 / Allocated 324

Virtual block number 11 (0000000B), 512 (0200) bytes

```
68016AE8 76FFEA76 FF000004 489AFFFF 68040068 076AE876 FFEA76FF 03CFE9F0 ÞÕÜ..vö.vÒj.h..h...H....vö.vÒj.h 000000
468DF276 FF525789 26504789 26EA5688 E8468BF4 5EC40000 04589A04 58680442 B.hX..[...é^¶.FÒ.Vö&.GP&.WR.v·.F 000020
6AE876FF EA76FF03 7AE9F046 880006E9 03750000 30F04689 00000479 9A5016E8 Ò.P.y....Fÿ=..u.Ö...FÞÕz..vö.vÒj 000040
C4000004 D69A04D3 68049768 016AE876 FFEA76FF 0000049D 9AFFFF68 04556807 .hU.h........vö.vÒj.h..h&..ø...é 000060
F0468900 0004F49A 5016E846 8DF276FF 56578926 54478926 EA5688E8 4688F45E ^¶.FÒ.Vö&.GT&.WV.v·.FÒ.P.¶...._Fÿ 000080
0004B09A FFFF6804 AA68006A E876FFEA 76FF0325 E9F04688 0006E903 7500003D =..u.Ö...FÞÕX..vö.vÒj.h^.h...¯.. 0000A0
6804D068 096AE876 FFEA76FF 000004C3 9AFFFF68 04D06801 6AE876FF EA76FF00 ..vö.vÒj.h§.h...û....vö.vÒj.hÅ.h 0000C0
E8468BF4 5EC40000 053E9A05 38680512 68016AE8 76FFEA76 FF000005 189A0528 (.......vö.vÒj.h..h;..>...é^¶.FÒ 0000E0
03750000 30F04689 0000055C 9A5016E8 468DF276 FF5E5789 265C4789 26EA5688 .Vö&.G\&.W^.v·.FÒ.P.\....Fÿ=..u. 000100
FFEA76FF 00000528 9AFFFF68 05256801 6AE876FF EA76FF02 AAE9F046 880006E9 Ö...FÞÕ^..vö.vÒj.h%.h...+....vö. 000120
05939A05 9068057A 68016AE8 76FFEA76 FF000005 809A01A6 68053868 096AE876 vÒj.h8.hÎ.......vö.vÒj.hz.h..... 000140
000005B1 9A5016E8 468DF276 FF7A5789 26784789 26EA5688 E8468BF4 5EC40000 ..é^¶.FÒ.Vö&.Gx&.Wz.v·.FÒ.P.Ÿ... 000160
9AFFFF68 05806801 6AE876FF EA76FF02 42E9F046 880006E9 03750000 30F04689 .Fÿ=..u.Ö...FÞÕB..vö.vÒj.h..h... 000180
EA5688E8 4688F45E C4000005 E89A05E5 6805CF68 016AE876 FFEA76FF 000005D5 Î....vö.vÒj.hü.hÏ..Õ...é^¶.FÒ.Vö 0001A0
0006E903 7500003D F0468900 0006069A 5016E846 8DF276FF 62578926 60478926 &.G'&.Wb.v·.FÒ.P......Fÿ=..u.Ö.. 0001C0
6AE876FF EA76FF00 00062A9A FFFF6805 E268016A E876FFEA 76FF01ED E9F04688 .FÞÕÜ..vö.vÒj.hã.h...*....vö.vÒj 0001E0
```

```
Dump of file SATURN:[PCCOMMON.DUMP.DLL]SA-DIFM.DLL;1 on 18-APR-1990 10:50:26.92
File ID (450,15,0)   End of file block 323 / Allocated 324

Virtual block number 12 (0000000C), 512 (0200) bytes

F276FF66 57892664 478926EA 5688E846 88F45EC4 00000650 9A064D68 06246801 .h$.hM..P...á^¶.FÒ.Vö&.Gd&.Wf.v· 000000
76FFEA76 FF0198E9 F0468800 06E90375 00003DF0 46890000 066E9A50 16E8468D .FÒ.P.n....Fÿ=..u.Õ...FÞÕ...võ.v 000020
0006929A FFFF6806 4A68016A E876FFEA 76FF0000 06309AFF FF680637 68006AE8 Òj.h7.h...=....võ.vÒj.hJ.h...... 000040
478926EA 5688E846 88F45EC4 00000237 9A023468 068C6801 6AE876FF EA76FF00 ..võ.vÒj.h..h4..7...á^¶.FÒ.Vö&.G 000060
F0468800 06E90375 00003DF0 46890000 014C9A50 16E8468D F276FF6A 57892668 h&.Wj.v·.FÒ.P.L....Fÿ=..u.Õ...FÞ 000080
6A68026A E876FFEA 76FF0000 06A59AFF FF68069F 68006AE8 76FFEA76 FF0130E9 ÕÒ..võ.vÒj.h..h...£....võ.vÒj.hj 0000A0
88F45EC4 00000720 9A071D68 06F46801 6AE876FF EA76FF00 0001709A FFFF6801 .h...p....võ.vÒj.h¶.h.... ...á^¶. 0000C0
00003DF0 46890000 073E9A50 16E8468D F276FF6E 5789266C 478926EA 5688E846 FÒ.Vö&.Gl&.Wn.v·.FÒ.P.>....Fÿ=.. 0000E0
76FF0000 07009AFF FF680707 68006AE8 76FFEA76 FF00C8E9 F0468800 06E90375 u.Õ...FÞÕà..võ.vÒj.h..h........v 000100
9A078568 075C6801 6AE876FF EA76FF00 0007629A FFFF6807 1A68026A E876FFEA õ.vÒj.h..h...b....võ.vÒj.h\.h... 000120
03679A50 16E8468D F276FF72 57892670 478926EA 5688E846 88F45EC4 00000788 ....á^¶.FÒ.Vö&.Gp&.Wr.v·.FÒ.P.g. 000140
FF68076F 68006AE8 76FFEA76 FF0060E9 F0468800 06E90375 00003DF0 46890000 ...Fÿ=..u.Õ...FÞÕ'..võ.vÒj.ho.h. 000160
6AE876FF EA76FF00 0003369A 02216807 8268026A E876FFEA 76FF0000 07759AFF ..u....võ.vÒj.h..h!..6....võ.vÒj 000180
0A5EC476 57892674 478926EA 5688E846 88F45EC4 00000349 9A034668 03306801 .h0.hF..I...á^¶.FÒ.Vö&.Gt&.Wvá^. 0001A0
881E5657 0002A8C8 C8C95F5E 1F0000E9 00008802 57892607 8926F656 88F4468B .F¶.V-&..&.W.j..Õ...^_èùà`..WV.| 0001C0
07E90375 00003DFF 66868900 00FFFF9A 50168846 8D026A01 F5F646C7 D88E0008 ...ÁùF-%.j..F..P.......f.=..u.Õ. 0001E0

Dump of file SATURN:[PCCOMMON.DUMP.DLL]SA-DIFM.DLL;1 on 18-APR-1990 10:50:26.92
File ID (450,15,0)   End of file block 323 / Allocated 324

Virtual block number 13 (0000000D), 512 (0200) bytes

003DFF66 86890000 00239A50 16FC468D 008D6869 6A8876FF 0E96E9FF 66868800 ...f.Õ...v.jih...F•.P.#.....f.=. 000000
14568812 4688FC5E C4674789 2688468B FC5EC40E 71E9FF66 86880007 E9037500 .u.Õ....f.Õq.á^•.F.&.Ggá^•.F..V. 000020
46881676 FF1876FF 02578926 0789261C 56881A46 88FC5EC4 06578926 04478926 &.G.&.W.á^•.F..V.&..&.W..v..v..F 000040
89000000 AF9A5016 FD58868D 8876FF08 C483FFFF 00569A50 52000805 FE5688FC •.V±...RP.V....á...v....X».P.£.... 000060
478926FD 5A9688FD 588688FC 5EC40E0C E9FF6686 880007E9 03750000 3DFF6686 .f.=..u.Õ....f.Õ..á^•..X»..Z»&.G 000080
86880007 E9037500 003DFF66 86890000 FFFF9A50 16F2468D 8876FF6F 57892660 m&.Wo.v..F·.P.......f.=..u.Õ.... 0000A0
76FFFE76 FF5016D8 468D7357 89267147 8926F456 88F24688 FC5EC400 D9E9FF66 f.Õ).á^•.F·.V¶&.Gq&.Ws.FÄ.P.v±.v 0000C0
88FC5EC4 00A2E9FF 66868800 07E90375 00003DFF 66868908 C483FFFF 00009AFC •......á...f.=..u.Õ....f.ÕÄ.á^•. 0000E0
0C56880A 4688FC5E C45F4789 261E4688 FC5EC468 57892669 4789260A 5688D846 FÄ.VÕ&.Gi&.Wká^•.F.&.G_á^•.F..V. 000100
1076FF00 6A006A59 57892657 47892610 5688DE46 88FC5EC4 55578926 53478926 &.GS&.WUá^•.F..V.&.GW&.WYj.j..v. 000120
003EE9FF 66868800 07E90375 00003DFF 66868900 00FFFF9A 50168046 8D0E76FF .v..F..P.......f.=..u.Õ....f.Õ>. 000140
66868800 07E90375 00003DFF 66868900 00FFFF9A FC76FFFE 76FF8076 FF8276FF .v..v..v±.v•.......f.=..u.Õ....f 000160
66868800 07E90375 00003DFF 66868900 00FFFF9A 016A8076 FF8276FF 001AE9FF .Õ..v..v.j........f.=..u.Õ....f 000180
66868800 07E90375 00003DFF 66868900 00FFFF9A 026A8076 FF8276FF 0CFAE9FF .Õ¹..v..v.j........f.=..u.Õ....f 0001A0
07E90375 00003DFF 66868900 00FFFF9A 0042681E 116A8076 FF8276FF 0CDAE9FF .ÕÕ..v..v.j..hB........f.=..u.Õ. 0001C0
00003DFF 66868900 00FFFF9A FFFF6809 F3688076 FF8276FF 0C86E9FF 66868800 ...f.ÕÑ..v..v.hµ.h.........f.=.. 0001E0

Dump of file SATURN:[PCCOMMON.DUMP.DLL]SA-DIFM.DLL;1 on 18-APR-1990 10:50:26.92
File ID (450,15,0)   End of file block 323 / Allocated 324

Virtual block number 14 (0000000E), 512 (0200) bytes

66868900 00FFFF9A FFFF68FF FF688076 FF8276FF 0C92E9FF 66868800 07E90375 u.Õ....f.Õ...v..v.h..h.........f 000000
00FFFF9A FFFF680A 38688076 FF8276FF 0C6EE9FF 66868800 07E90375 00003DFF .=..u.Õ....f.Õn..v..v.h;.h...... 000020
FFFF6809 CF688076 FF8276FF 0C4AE9FF 66868800 07E90375 00003DFF 66868900 ...f.=..u.Õ....f.ÕJ..v..v.hù.h.. 000040
8446C700 C88246C7 0C26E9FF 66868800 07E90375 00003DFF 66868900 00FFFF9A .......f.=..u.Õ....f.Õ&.úFýà.úFÇ 000060
0000C046 C700A08E 46C70000 8C46C700 A08A46C7 00008846 C7005086 46C70000 ..úFÑP.úF¡..úFα..úF¥..úFƒ..úFâ.. 000080
46C70000 CC46C700 A0CA46C7 0000C846 C700A0C6 46C70000 C446C700 A0C246C7 úFÒ..úFÊ..úFÖ..úFà..úFÒ..úFë..úF 0000A0
9A501682 4680016A 8076FF82 76FF0000 D446C700 060246C7 00000046 C700A0CE ö..úFÄ..úFê..úFâ...v..v.j..Fý.P. 0000C0
9A006A80 76FF8276 FF08A7E9 FF668688 0007E903 75000030 FF668689 0000FFFF ......f.=..u.Õ....f.ÕÏ..v..v.j.. 0000E0
6A006A80 76FF8276 FF0887E9 FF668688 0007E903 75000030 FF668689 0000FFFF ......f.=..u.Õ....f.Õ...v..v.j.j 000100
8276FF08 61E9FF66 86880007 E9037500 0030FF66 86890000 FFFF9A14 6A006A14 .j.j........f.=..u.Õ....f.Õa..v. 000120
FF668688 0007E903 75000030 FF668689 0000FFFF 9A146A00 6A146A00 6A8076FF .v.j.j.j.j........f.=..u.Õ....f. 000140
FC468812 76FF1476 FF8876FF 65578926 63478926 82568880 4688FC5E C40B3BE9 Õ;.á^•.F..V.&.Gc&.We.v..v..v..F• 000160
0AFEE9FF 66868800 07E90375 00003DFF 66868900 00FFFF9A 50520081 05FE5688 .V±...RP.......f.=..u.Õ....f.Õ±. 000180
FF668689 0000FFFF 9AFFFF68 0B8F6802 6A1D6A00 81B7FF26 0083B7FF 26FC5EC4 á^•&.ñ..&.ñ..j.j.he.h.........f. 0001A0
EC681D6A 0081B7FF 26008387 FF26FC5E C40ACFE9 FF668688 0007E903 75000030 •..u.Õ....f.Õù.á^•&.ñ..&.ñ..j.h$ 0001C0
26FC5EC4 0AA2E9FF 66868800 07E90375 00003DFF 66868900 0008F29A FFFF6808 .h...·.....f.=..u.Õ....f.ÕÄ.á^•& 0001E0
```

```
Dump of file SATURN:[PCCOMMON.DUMP.DLL]SA-DIFN.DLL;1 on 18-APR-1990 10:50:26.92
File ID (450,15,0)   End of file block 323 / Allocated 324

Virtual block number 15 (0000000F), 512 (0200) bytes

E9037500 003DFF66 86890000 FFFF9AFF FF680C1B 68126A00 81B7FF26 0083B7FF .ñ..&.ñ..j.h..h.........f.=..u.Õ 000000
FFFF680C 46681A6A 1D6A0081 B7FF2600 83B7FF26 FC5EC40A 75E9FF66 86880007 ....f.Õu.á^=&.ñ..&.ñ..j.j.hF.h.. 000020
0083B7FF 26FC5EC4 0A46E9FF 66868800 07E90375 00003DFF 66868900 00FFFF9A .......f.=..u.Õ....f.ÕF.á^=&.ñ.. 000040
FF668688 0007E903 7500003D FF668689 0000FFFF 9AFFFF68 0C756800 81B7FF26 &.ñ..hu.h.........f.=..u.Õ....f. 000060
0C83680C AA68FFFF 680C7B68 036A1D6A 0081B7FF 260083B7 FF26FC5E C40A1BE9 Õ..á^=&.ñ..&.ñ..j.j.h{.h..h¨.h°. 000080
0083B7FF 26FC5EC4 09E6E9FF 66868800 07E90375 00003DFF 66868900 000CB69A .ñ.....f.=..u.Õ....f.Õ].á^=&.ñ.. 0000A0
003DFF66 86890000 0CEB9A0C E8680CDF 68FFFF68 0C806804 6A1D6A00 81B7FF26 &.ñ..j.j.h¯.h..hÕ.hÕ..Š.....f.=. 0000C0
E568066A 1D6A0081 B7FF2600 83B7FF26 FC5EC409 B1E9FF66 86880007 E9037500 .u.Õ....f.ÕŸ.á^=&.ñ..&.ñ..j.j.h[ 0000E0
E9FF6686 880007E9 03750000 30FF6686 8900000D 209A001D 680D1468 FFFF680C .h..h..h... .....f.=..u.Õ....f.Õ 000100
9AFFFF68 004968FF FF68001A 68056A1D 6A0081B7 FF260083 B7FF26FC 5EC4097C |.á^=&.ñ..&.ñ..j.j.h..h..hI.h... 000120
260083B7 FF26FC5E C40947E9 FF668688 0007E903 7500003D FF668689 00000055 U.....f.=..u.Õ....f.ÕG.á^=&.ñ..& 000140
00003DFF 66868900 00008A9A 0D876800 7E680D81 680D4F68 036A1F6A 0081B7FF .ñ..j.j.hO.h..h~.h.........f.=.. 000160
0D846804 6A1F6A00 81B7FF26 0083B7FF 26FC5EC4 0912E9FF 66868800 07E90375 u.Õ....f.Õ..á^=&.ñ..&.ñ..j.j.h.. 000180
0DE9FF66 86880007 E9037500 003DFF66 86890000 FFFF9AFF FF680DB3 68FFFF68 h..h°.h.........f.=..u.Õ....f.ÕŸ 0001A0
819AFFFF 68FFFF68 FFFF6800 B968046A 226A0081 B7FF2600 83B7FF26 FC5EC408 .á^=&.ñ..&.ñ..j"j.h¿.h..h..h.... 0001C0
FF260083 B7FF26FC 5EC408A8 E9FF6686 880007E9 03750000 30FF6686 8900000C .....f.=..u.Õ....f.Õ´.á^=&.ñ..&. 0001E0

Dump of file SATURN:[PCCOMMON.DUMP.DLL]SA-DIFN.DLL;1 on 18-APR-1990 10:50:26.92
File ID (450,15,0)   End of file block 323 / Allocated 324

Virtual block number 16 (00000010), 512 (0200) bytes

86880007 E9037500 0030FF66 86890000 08989AFF FF680B92 68026A22 6A0081B7 ñ..j"j.h..h.........f.=..u.Õ.... 000000
000E4C9A FFFF680E 4668096A 226A0081 B7FF2600 83B7FF26 FC5EC408 79E9FF66 f.Õy.á^=&.ñ..&.ñ..j"j.hF.h...L.. 000020
81B7FF26 0083B7FF 26FC5EC4 084AE9FF 66868800 07E90375 00003DFF 66868900 ...f.=..u.Õ....f.ÕJ.á^=&.ñ..&.ñ. 000040
FF668688 0007E903 75000030 FF668689 00000E7B 9AFFFF68 0E756801 6A226A00 .j"j.hu.h...{.....f.=..u.Õ....f. 000060
8900000E AA9AFFFF 680EA468 036A226A 0081B7FF 260083B7 FF26FC5E C4081BE9 Õ..á^=&.ñ..&.ñ..j"j.hÊ.h...¯.... 000080
6A0081B7 FF260083 B7FF26FC 5EC407EC E9FF6686 880007E9 03750000 30FF6686 .f.=..u.Õ....f.Õš.á^=&.ñ..&.ñ..j 0000A0
BDE9FF66 86880007 E9037500 0030FF66 86890000 0ED99AFF FF680ED3 68016A21 !j.h&.h...l.....f.=..u.Õ....f.Õ§ 0000C0
66868900 000F089A FFFF680F 0268036A 216A0081 B7FF2600 83B7FF26 FC5EC407 .á^=&.ñ..&.ñ..j!j.h..h.........f 0000E0
6A1F6A00 81B7FF26 0083B7FF 26FC5EC4 078EE9FF 66868800 07E90375 000030FF .=..u.Õ....f.Õ..á^=&.ñ..&.ñ..j.j 000100
C4075FE9 FF668688 0007E903 75000030 FF668689 00000F37 9AFFFF68 0F316801 .h1.h...7.....f.=..u.Õ....f.Õ_.á 000120
30FF6686 8900000F 669AFFFF 680F6068 206A206A 0081B7FF 260083B7 FF26FC5E ^=&.ñ..&.ñ..j j h`.h...f.....7.= 000140
68016A1E 6A0081B7 FF260083 B7FF26FC 5EC40730 E9FF6686 880007E9 03750000 ..u.Õ....f.Õ0.á^=&.ñ..&.ñ..j.j.h 000160
FC5EC407 01E9FF66 86880007 E9037500 0030FF66 86890000 0F959AFF FF680F8F ..h.........f.=..u.Õ....f.Õ..á^= 000180
00003DFF 66868900 000DEE9A FFFF6800 E868036A 1E6A0081 B7FF2600 83B7FF26 &.ñ..&.ñ..j.j.hÕ.h...Ÿ.....f.=.. 0001A0
9AFC76FF FE76FF00 81B7FF26 0083B7FF 26FC5EC4 0602E9FF 66868800 07E90375 u.Õ....f.Õ0.á^=&.ñ..&.ñ...v±.v=. 0001C0
00007B47 C726FC5E C406A7E9 FF668688 0007E903 75000030 FF668689 0000FFFF ......f.=..u.Õ....f.ÕI.á^=&úG(.. 0001E0

Dump of file SATURN:[PCCOMMON.DUMP.DLL]SA-DIFN.DLL;1 on 18-APR-1990 10:50:26.92
File ID (450,15,0)   End of file block 323 / Allocated 324

Virtual block number 17 (00000011), 512 (0200) bytes

00001031 9A5016FF 5E868088 76FF0000 7F47C726 FC5EC400 007D47C7 26FC5EC4 á^=&úG)..á^=&úG....v...^..P.1... 000000
8926FF60 9688FF5E 8688FC5E C4066BE9 FF668688 0007E903 7500003D FF668689 ..f.=..u.Õ....f.Õk.á^=..^...`.&. 000020
07E90375 00003DFF 66868900 0000519A 50160E46 8D8876FF 00889789 26008987 ...&.....v..FB.P.Q.....f.=..u.Õ. 000040
FE76FF1C 6A008797 89260085 878926E0 5688DE46 88FC5EC4 0636E9FF 66868800 ...f.Õ6.á^=.FB.VÀ&....&....j..v± 000060
05FEE9FF 66868800 07E90375 00FF668E 83FF6686 8906C483 FFFF0000 9AFC76FF .v=......á...f..ƒf..u.Õ....f.Õ±. 000080
75000030 FF668689 00001162 9A50169A 4680036A 1A76FF1C 76FF1276 FF1476FF .v..v..v..v.j..F..P.b.....f.=..u 0000A0
89E24689 9C5688 9A 468805C8 E9FF6686 88000010 FC9A1276 FF1476FF 0012E903 .Õ...v..v..=.....f.Õà..F..V..Fã. 0000C0
FF260277 FF26E25E C4FC76FF FE76FF00 4EE90375 02470826 078826E2 5EC4E456 VÕá^ã&..&.G.u.ÕN..v±.v=á^ã&.w.&. 0000E0
00001143 9A1276FF 1476FF00 23E90375 00003DFF 66868908 C4830A17 00009A37 7......á...f.=..u.Õ#..v..v..C... 000100
FFFFA3E9 04E24683 0566E9FF 66868800 00112C9A 9A76FF9C 76FF1276 FF1476FF .v..v..v..v.,.....f.Õf..Fã.ÕE.. 000120
FF1476FF 0012E903 7500003D FF668689 0000FFFF 9A9A76FF 9C76FF12 76FF1476 v..v..v..v........f.=..u.Õ...v.. 000140
16E64680 046A1A76 FF1C76FF 1276FF14 76FF0530 E9FF6686 88000011 799A1276 v..y.....f.Õ0..v..v..v..v.j..Fl. 000160
66868800 00FFFF9A 1276FF14 76FF0012 E9037500 003DFF66 86890000 FFFF9A50 P.......f.=..u.Õ...v..v.........f 000180
6A0059E9 03750247 0826078B 26F85EC4 FA5689F8 4689E856 88E64688 04FAE9FF .Õ°..Fl.VÕ.F%.V"á^¼&..&.G.u.ÕY.j 0001A0
83000012 9C9A006A 7B6A5016 EE468037 FF260277 FF26F85E C4FC76FF FE76FF00 ..v±.v=á^¼&.w.&.7.FŸ.Pj(j....... 0001C0
FF1276FF 1476FF00 00121C9A 1276FF14 76FF0023 E9037500 003DFF66 868912C4 á...f.=..u.Õ#..v..v.......v..v.. 0001E0
```

Dump of file SATURN:[PCCOMMON.DUMP.DLL]SA-DIFM.DLL;1 on 18-APR-1990 10:50:26.92
File ID (450,15,0)   End of file block 323 / Allocated 324

Virtual block number 18 (00000012), 512 (0200) bytes

```
76FF1276 FF1476FF FF98E904 F8468304 8DE9FF66 86880000 12059AE6 76FFE876 vÒ.vl.......f.Õ...F%.Õ...v..v..v 000000
00001253 9A1276FF 1476FF00 12E90375 000030FF 66868900 0012C99A E676FFE8 Ò.vl.è.....f.=..u.Õ...v..v..S... 000020
00001321 9A5016FD 5C868D06 6A1A76FF 1C76FF12 76FF1476 FF0457E9 FF668688 ..f.ÕW..v..v..v..v.j...\».P.!... 000040
86880420 E9FF6686 88000012 B69A1276 FF1476FF 0012E903 7500003D FF668689 ..f.=..u.Õ...v..v..Ñ.....f.Õ ... 000060
006A005E E9037502 47082607 8826FF68 9EC4FF6A 9689FF68 8689FD5E 9688FD5C \»..^»..h...j.á.h.&..&.G.u.Õ^.j. 000080
00001379 9A006A7C 6A5016FF 5A868037 FF260277 FF26FF68 9EC4FC76 FFFE76FF .v±.v=á.h.&.w.&.7..Z..Pj|j..y... 0000A0
1276FF14 76FF0000 13029A12 76FF1476 FF0025E9 03750000 3DFF6686 8912C483 .á...f.=..u.Õ%..v..v.......v..v. 0000C0
FF1476FF FF92E904 FF688683 03AAE9FF 66868800 0012E89A FD5C86FF FD5EB6FF .Ñ^».Ñ\».Š.....f.Õ`...h..Õ...v.. 0000E0
76FF1476 FF0012E9 03750000 3DFF6686 89000013 A49AFD5C B6FFFD5E B6FF1276 v..Ñ^».Ñ\».Ê.....f.=..u.Õ...v..v 000100
50169E46 8D056A1A 76FF1C76 FF1276FF 1476FF03 71E9FF66 86880000 13389A12 ..8.....f.Õq..v..v..v..v.j...F..P 000120
FF668688 00001393 9A1276FF 1476FF00 12E90375 000030FF 66868900 0013FA9A .*.....f.=..u.Õ...v..v.........f. 000140
76FF0058 E9037502 47082607 8826EA5E C4EC5689 EA4689A0 56889E46 88033BE9 Õ;..F..V..FÕ.Všá^õ&..&.G.u.ÕX..v 000160
10C48300 00FFFF9A 006A776A 5016FD60 868037FF 260277FF 26EA5EC4 FC76FFFE ±.v=á^õ&.w.&.7..'».Pjwj.......á. 000180
A076FF12 76FF1476 FF000013 DA9A1276 FF1476FF 0023E903 7500003D FF668689 ..f.=..u.Õ#..v..v..Õ....v..v..v. 0001A0
FFA076FF 1276FF14 76FFFF99 E904EA46 8302CFE9 FF668688 000013C3 9A9E76FF .v..û.....f.Õü..FÕ.Õ...v..v..v.. 0001C0
86880000 14119A12 76FF1476 FF0012E9 03750000 3DFF6686 89000014 7D9A9E76 v..}.....f.=..u.Õ...v..v........ 0001E0
```

Dump of file SATURN:[PCCOMMON.DUMP.DLL]SA-DIFM.DLL;1 on 18-APR-1990 10:50:26.92
File ID (450,15,0)   End of file block 323 / Allocated 324

Virtual block number 19 (00000013), 512 (0200) bytes

```
86890000 10949A50 16FF6286 8D1A6A1A 76FF1C76 FF1276FF 1476FF02 99E9FF66 f.Õ...v..v..v..v.j...b..P....... 000000
FF628688 0262E9FF 66868800 00146A9A 1276FF14 76FF0012 E9037500 0030FF66 f.=..u.Õ...v..v..j.....f.Õb...b. 000020
C41276FF 1476FF01 9EE90375 02470826 07882684 5EC48656 89844689 FF649688 ..d..F..V.á^.&..&.G.u.Õ...v..v.á 000040
03750000 30FF6686 890000FF FF9A5016 FD64868D F676FF37 FF260277 FF26845E ^.&.w.&.7.v—..d».P.......f.=..u. 000060
0014D29A FF62B6FF FF64B6FF 1276FF14 76FF0000 148F9A12 76FF1476 FF0025E9 Õ%..v..v..e....v..v..Ñd..Ñb..●.. 000080
260277FF 26845EC4 27126812 76FF1476 FF046A50 168A468D 01F6E9FF 66868800 ...f.Õ-..F..Pj..v..v.h.'á^.&.w.& 0000A0
0C9A1276 FF1476FF 0025E903 7500003D FF668689 12C48300 00FFFF9A 006A37FF .7j.......á...f.=..u.Õ%..v..v... 0000C0
1476FF01 A1E9FF66 86880000 11009AFF 6286FFFF 64B6FF12 76FF1476 FF000015 ....v..v..Ñd..Ñb........f.ÕÀ..v. 0000E0
00003DFF 66868900 00FFFF9A 5016D646 8D056A37 FF260277 FF26845E C41276FF .v.á^.&.w.&.7j..Fø.P.......f.=.. 000100
C59AFF62 B6FFFF64 B6FF1276 FF1476FF 000010AB 9A1276FF 1476FF00 25E90375 u.Õ%..v..v..¨....v..v..Ñd..Ñb..é 000120
89AA4689 94568892 4688A456 89A24689 8C56888A 46880154 E9FF6686 88000015 .....f.ÕT..F..V..FÀ.VÊ.F..V..F^. 000140
006A006A 006AB056 89AE4689 98568896 4688A856 89A64689 905688BE 4688AC56 V¯.F..V..FÌ.V´.F..V..FÛ.V¯j.j.j. 000160
845EC450 16FD6486 8D1E6A00 6A006A00 6A5016A2 468D50E4 2AD6468A 4B6A006A j.jK.Fø*ðP.FÀ.Pj.j.j.j...d».Pá^. 000180
892CC483 000011B8 9A006A78 6A5016FF 7C868DFC 76FFFE76 FF37FF26 0277FF26 &.w.&.7.v±.v=..|..Pjxj..£....á,. 0001A0
FF64B6FF 1276FF14 76FF0000 15FD9A12 76FF1476 FF0025E9 03750000 3DFF6686 .f.=..u.Õ%..v..v..»....v..v..Ñd. 0001C0
64B6FF12 76FF1476 FFFE53E9 04844683 00AEE9FF 66868800 0015E69A FF62B6FF .Ñb..l.....f.ÕÜ..F..ÕS±.v..v..Ñd 0001E0
```

Dump of file SATURN:[PCCOMMON.DUMP.DLL]SA-DIFM.DLL;1 on 18-APR-1990 10:50:26.92
File ID (450,15,0)   End of file block 323 / Allocated 324

Virtual block number 20 (00000014), 512 (0200) bytes

```
00166F9A 1276FF14 76FF0012 E9037500 0030FF66 86890000 11E69AFF 6286FFFF ..Ñb..l.....f.=..u.Õ...v..'..o.. 000000
8B065EC4 068205C1 9A8076FF 8276FF00 007547C7 26FC5EC4 0076E9FF 66868800 ...f.Õv.á^=&úGu...v..v..è., 4^.. 000020
868DFC76 FFFE76FF FFFF6810 E4688076 FF8276FF 02578926 078926FE 5688FC46 F=.V±&..&.W..v..v.hõ.h...v±.v=.. 000040
6C868D80 76FF8276 FF0011E9 0375000C 7E830000 FFFF9A50 160C468D 5016FF6C l..P.FÉ.P.......-É.u.Õ...v..v...l 000060
5E1F0000 E9FF6686 8BFF6686 89000011 D59A1276 FF1476FF 0000FFFF 9A5016FF ..P......v..v..f......f...f.Õ...^ 000080
00000001 08C40002 0E640005 05D20005 09610005 068F0005 00659000 1ACAC95F _èò...e.......a...●...d...á..... 0000A0
0995000F 09810203 0FAC0003 0F630005 00000003 0E170002 091A000E 06FA0203 ..*.................c.......Ý..... 0000C0
00000004 16330002 092E0003 0D170005 03AE000C 08580203 0C0D0004 16360005 ..6........[...Ô...........3..... 0000E0
13320003 0D520005 27720005 01600005 08800003 0E780005 0CF00014 0E1D0203 ......Þ...x......m...r'...R...2. 000100
13840003 0DBC0005 00000005 161A0002 08930010 14A50203 08A80000 082C0203 ..,........Ê...............¥...Ç. 000120
101C0004 0A3E0005 01D00009 07D10203 00D70008 123C0203 48F60005 06B50005 ..ç...-H..<...■...Ì...À...>..... 000140
00010014 0C4C0203 03410003 004C0005 43810005 049A0005 092F000E 06B80203 ..¡.../........C..L...À...L..... 000160
04450003 0C780005 18030005 04450005 053A000D 0AC00203 08BA0000 08060203 ......¤...å...:...E........x...E. 000180
05440000 0AE00203 0982000F 0A1D0203 0CC80003 0DEB0005 0EC60003 0F920005 ......ó...Š...à........Ý...À...D. 0001A0
08540003 0C490005 08830010 15980203 11500003 0EA70005 06100005 01800005 ...........Ì...P...........l...T. 0001C0
098F000F 09D50203 08160005 06A20005 01ED0009 07F60203 00000000 10660002 ..f........-...Ú...À.......f...e. 0001E0
```

```
Dump of file SATURN:[PCCOMMON.DUMP.DLL]SA-DIFM.DLL;1 on 18-APR-1990 10:50:26.92
File ID (450,15,0)   End of file block 323 / Allocated 324

Virtual block number 21 (00000015), 512 (0200) bytes

 2D900005 01B90005 005C0003 0B950005 0C9B0005 05700005 00FA0008 151F0203 ......'...)...........\...¿....- 000000
 02E8000B 0FFC0203 0946000F 09290203 249E0005 03330005 489D0005 05150005 .......H..3....$..)...F...•...Ò. 000020
 00830008 15B20203 12C20004 09F60005 3C210005 07720005 00000010 084C0002 ..L.......r...!<..−...ö...ý..... 000040
 0D270014 0DBF0203 09CD000F 09F90203 2D250005 06F70005 44240005 04AD0005 ..Ù...$D..%...X-..'...ë...¢...'. 000060
 0D4A0004 0A1A0005 3E290005 02DE0005 40A90005 03880005 00000012 07C00002 ..à...........`@..B...)>......J. 000080
 08E2000E 06D60203 0CB10014 08690203 0563000D 164A0203 106A0003 0ED60005 ..•...j...J...c...i...Ÿ...•...ã. 0000A0
 01790003 0BC20005 09DC000F 0A410203 0AF20003 0F050005 07720003 0CE20005 ..ã...r.......·...A...É...ó...y. 0000C0
 0AEF000F 096D0203 29470005 04C00005 0D430014 0FC00203 02000003 0DB60005 ..Ñ.......á...C...à...G)..m...ÿ. 0000E0
 01280008 14530203 0E080003 0E490005 0CC80014 0C210203 10C80005 063A0005 ..:...à...!...à...!.......S...(. 000100
 0A0B0003 0F340005 038A000C 088E0203 41490005 039B0005 0FC90005 06270005 ..'...è.......IA..........4..... 000120
 0978000F 16640203 06900003 0CAD0005 12900003 0C7E0005 120E0003 0BEF0005 ..ÿ.......−.......Ù.......d...x. 000140
 0D760004 09D20005 12560005 03F00005 0D930003 0E1A0005 0AF9000F 09BD0203 ......'...........Þ...V...•...v. 000160
 385C0005 075F0005 41DA0005 01CC0005 3B5A0005 020E0005 09D90005 070A0005 ......\.......Z;..ä...ÕA.._....\8 000180
 265D0005 01930005 0CDC0014 0BC50203 051C0003 0C1E0005 0B04000F 094D0203 ..M...............é...É.......]& 0001A0
 04064683 D88EFFFF B81E5657 0000BCC8 39DF0005 02760005 00BD0008 14F50203 ..%...§...v...Ö9à¥..WV.¡...Ä.F.. 0001C0
 065EC404 06468308 C48300C2 00569A50 16FF4E86 8DFC77FF 26FE77FF 26065EC4 á^.&.w±&.w=..N..P.V.ö..á..F..á^. 0001E0

Dump of file SATURN:[PCCOMMON.DUMP.DLL]SA-DIFM.DLL;1 on 18-APR-1990 10:50:26.92
File ID (450,15,0)   End of file block 323 / Allocated 324

Virtual block number 22 (00000016), 512 (0200) bytes

 A44689FE 578826FC 47882606 5EC40406 4683F456 89F24689 FE578826 FC478826 &.G=&.W±.F·.V¶.F...á^.&.G=&.W±.FÊ 000000
 5016EA46 8D5016FF 4E868D0A 76FF016A 0000FFFF 9A5016FE 468D0A76 FFA65689 .V|.v..F±.P.....j..v...N..P.Fõ.P 000020
 FF9AEA76 FFEC76FF 0165E9FF 4C868800 07E90375 00003DFF 4C868900 00FFFF9A .......L.=..u.Õ....L.Õe..v$.võ.. 000040
 FF4E868D 0000FFFF 9A5016FF 4E868D02 6AF276FF F476FFEA 76FFEC76 FF0000FF ....v$.võ.v¶.v·j...N..P.......N. 000060
 F05E8CEE 468900E4 8810C483 FFFF010A 9A5016A8 468D000C 681E00CA 681E5016 .P.hò..hÊ..F´.P......á.¡õ..FŸ.^Þ 000080
 EE76FFF0 76FF006A 006A0000 9C46C750 FB9A46C7 0000FF46 86C70801 FF4486C7 ú.D...ú.F...úF.«PúF...j.j..vÞ.vŸ 0000A0
 468DFF44 B6FFFF46 B6FF016A 006A0000 FFFF9A04 6A046A02 0068FFFF 68FFFF68 h..h..h..j.j......j.j..ÑF..ÑD..F 0000C0
 8D038468 020036FF 26226206 8E006A20 00685016 A8468DEE 76FFF076 FF50169A ..P.vÞ.vŸ.F´.Ph. j...b"&.6..h... 0000E0
 006A0015 E90374FF 4A8608FF 488688FF 4A9689FF 48868900 00FFFF9A 5016F646 F−.P.......H...J...H...J.t.Õ..j. 000100
 FF4E868D F276FFF4 76FF0A76 FF008AE9 A04688A2 5689A046 890000FF FF9A006A j.......F..VÅ.F.Õ...v..v¶.v·..N. 000120
 FFFF07B8 9A5016FA 468DF676 FFF876FF FF4886FF FF4AB6FF EA76FFEC 76FF5016 .P.v$.võ.ÑJ..ÑH..v½.v−.F'.`.¡... 000140
 FA5EC49E 46896747 8826FA5E C4004AE9 FF4C8688 0007E903 75000030 FF4C8689 ..L.=..u.Õ....L.ÕJ.á^'&.Gg.¯ á^' 000160
 FF4AB6FF 0A76FF61 478926FE 4688FA5E C4000079 47C726FA 5EC40000 7747C726 &úGw..á^'&úGy..á^'.F±&.Ga.v..ÑJ. 000180
 5F5E1F00 00E90000 880000FF FF9AFA76 FFFC76FF 0A76FF00 00FFFF9A FF4886FF .ÑH........v..v=.v'.....¡..Õ...^_ 0001A0
 0000AE46 C70000AC 46C70000 FF6C86C7 D88E0008 B81E5657 0000ACC8 0006CAC9 èò..à¯..WV.¡...Äú.l...úF¯..úFÛ.. 0001C0
 FF0C76FF 1076FF11 FFE90E46 88944689 96468900 00B80000 8A46C700 00F446C7 úF¶..úF...¡...F..F..F.Õ...v..v.. 0001E0

Dump of file SATURN;[PCCOMMON.DUMP.DLL]SA-DIFM.DLL;1 on 18-APR-1990 10:50:26.92
File ID (450,15,0)   End of file block 323 / Allocated 324

Virtual block number 23 (00000017), 512 (0200) bytes

 5016F846 8D1076FF 1243E900 00881249 E9FF6C86 88FF6C86 8900F100 009A0A76 v....Þ...l...l.Õ!.¡..ÕC..v..F%.P 000000
 7400FF6C BE831221 E9000088 0006E903 74FA4608 F84688FF 6C868900 0003499A .!......l..F%.F't.Õ..¡..Õ!../l..t 000020
 88568986 46896557 88266347 8826F85E C40011E9 0375FA46 0BF84688 001CE903 .Õ...F%.F'u.Õ..á^½&.Gc&.We.F..V. 000040
 8D0089B7 FF26008B B7FF26F8 5EC40000 FFFF9A00 89B7FF26 0088B7FF 26F85EC4 á^½&.ñ..&.ñ.......á^½&.ñ..&.ñ... 000060
 00FFFF9A 0A77FF26 0C77FF26 945EC400 13E90374 00003000 00FFFF9A 50169446 F..P.....=..t.Õ..á^.&.w.&.w..... 000080
 F85EC463 47892665 47892600 0088F85E C40000FF FF9A8676 FF8876FF FFCEE900 .Õõ..v..v......á^½¡..&.Ge&.Gcá^½ 0000A0
 77FF2606 77FF26F8 5EC40000 FFFF9A00 6A006A50 52991046 881DAE68 6177FF26 &.wahÕ..F..RPj.j.......á^½&.w.&.w 0000C0
 016A006A 016A006A 1163E900 00880000 FFFF9A67 77FF26F8 5EC40000 FFFF9A04 .......á^½&.wg.....¡..Õc.j.j.j.j. 0000E0
 6C868900 00FFFF9A 5016F846 8D1076FF 0000FFFF 9A505200 00FFFF9A 006A036A j.j.......RP.......v..F%.P.......l 000100
 5C868063 77FF2665 77FF26F8 5EC41129 E9000088 0006E903 74FA4608 F84688FF ..F%.F't.Õ..¡..Õ).á^½&.we&.wc..\ 000120
 0BFF5C86 881100E9 FF6C8688 0007E903 75000030 FF6C8689 0000FFFF 9A5016FF ..P........l.=..u.Õ....l.Õ....\.. 000140
 E90374FF 66860BFF 64868800 1FE90374 FF628608 FF608688 002CE903 74FF5E86 .^.t.Õ,...`...b.t.Õ....d...f.t.Õ 000160
 F85EC400 017F47C7 26F85EC4 0001AE46 C70005E9 0374FF6A 860BFF68 86880012 ....h...j.t.Õ..úFÛ..á^½úG...á^½ 000180
 76FF0C76 FF0027E9 00017847 C726F85E C4000CE9 03750008 7E830000 7B47C726 &úG(...−..u.Õ..á^½úG(..Õ'..v..v 0001A0
 E9FF6C86 880007E9 03750000 3DFF6C86 8908C483 FFFF0000 9AF876FF FA76FF0A ..v'.v½......á...l.=..u.Õ....l.Õ 0001C0
 0000FFFF 9A0676FF 0876FF0A 76FF0C76 FF0081B7 FF260083 87FF26F8 5EC41079 y.á^½&.ñ..&.ñ...v..v..v..v...... 0001E0
```

```
Dump of file SATURN:[PCCOMMON.DUMP.DLL]SA-DIFM.DLL;1 on 18-APR-1990 10:50:26.92
File ID (450,15,0)   End of file block 323 / Allocated 324

Virtual block number 24 (00000018), 512 (0200) bytes

 1CE90375 65470B26 63478B26 F85EC401 2CE90375 007D7F83 26F85EC4 FF6C8689 ..l.á^½&..).u.Õ,.á^½&.Gc&.Geu.Õ. 000000
 05046863 77FF2665 77FF26F8 5EC4A856 89A64689 68578B26 69478B26 F85EC401 .á^½&.Gi&.Wk.Fl.V´á^½&.we'.wch.. 000020
 0A7F8326 A65EC400 00FFFF9A 5016AC46 8D5016FF 6E868DF8 76FFFA76 FFFFFF68 h...v'.v½..n..P.F¯.P.......l&... 000040
 6377FF26 6577FF26 F85EC400 96E90377 01087F83 26000AE9 037E00A5 E9037D00 .).ÕE.-.Õ..&....w.Õ..á^½&.. ..wc 000060
 26F85EC4 00000537 9A026A63 77FF2665 77FF26F8 5EC40000 FFFF9A50 16AA468D .F¯.P.....á^½&.we&.wcj..7...á^½& 000080
 FF26F85E C4000005 249A016A 036A6D77 FF266F77 FF26F85E C46377FF 266577FF .we&.wcá^½&.wo&.wmj.j..$...á^½&. 0000A0
 6577FF26 F85EC408 C483062D 114D9A04 77FF2606 77FF26A6 5EC46D77 FF266F77 wo&.wmá^l&.w.&.w..M.-..á.á^½&.we 0000C0
 266577FF 26F85EC4 0000FFFF 9A016A03 6A6D77FF 266F77FF 26F85EC4 6377FF26 &.wcá^½&.wo&.wmj.j.......á^½&.we& 0000E0
 8D6377FF 266577FF 26F85EC4 0019E903 7500AC7E 830000FF FF9AAA76 FF6377FF .wc.v¯......~¯.u.Õ..á^½&.we&.wc. 000100
 F85EC400 00FFFF9A 6377FF26 6577FF26 F85EC400 10E90000 FFFF9A50 16FF6E86 .n..P.....Õ..á^½&.we&.wc.....á^½ 000120
 7E83FF6C 86890000 FFFF9A04 77FF2606 77FF26F8 5EC40014 E9037400 7B7F8326 &..(.t.Õ..á^½&.w.&.w........l..- 000140
 26F85EC4 0014E903 75654708 26634788 26F85EC4 0000AE46 C70029E9 037500AE Û.u.Õ).úFÛ..á^½&.Gc&.Geu.Õ..á^½& 000160
 7F47C726 F85EC400 007B47C7 26F85EC4 FF6C8689 0000FFFF 9A6377FF 266577FF .we&.wc.......l.á^½&úG(..á^½&úG. 000180
 3C9A5052 00000335 9A006A01 6A016A00 6A016A00 6A00007D 47C726F8 5EC40000 ..á^½&úG)..j.j.j.j.j.j..5...RP.< 0001A0
 FC46890C 568B0A46 8B000006 DB9A5016 F8468D10 76FF0E91 E9FF6C86 8B000003 .....l.Õ...v..F½.P.Û....F..V..F= 0001C0
 8306F710 589AFC76 FFFE76FF F876FFFA 76FF5016 A0468DF4 46890846 8BFE5689 .V±.F..F¶.F..P.v'.v½.v±.v=.X.¼.. 0001E0

Dump of file SATURN:[PCCOMMON.DUMP.DLL]SA-DIFM.DLL;1 on 18-APR-1990 10:50:26.92
File ID (450,15,0)   End of file block 323 / Allocated 324

Virtual block number 25 (00000019), 512 (0200) bytes

 004BE903 75A2460B A04688OE 46E9FF6C 868B0007 E9037500 003DFF6C 86890CC4 á...l.=..u.Õ....l.ÕF..F..FÅu.ÕK. 000000
 FF7E868D 82468984 46890000 8BFF7E86 89804689 0000B800 42E90375 00F47E83 .-¶.u.ÕB.|...F...-.|...F..F...-. 000020
 07E90375 00003DFF 6C86890C C4830000 06829A00 6AA076FF A276FF5D D6685016 .Ph=].vÅ.v.j..ÿ....á...l.=..u.Õ. 000040
 6AA076FF A276FF5D D7680026 E90375A2 460BA046 880031E9 00F3E9FF 6C868800 ...l.Õ¤.Õ1..F..FÅu.Õ&.h=].vÅ.v.j 000060
 E90000B8 00BFE9FF 6C868800 07E90375 00003DFF 6C868908 C4830000 FFFF9A00 .......á...l.=..u.Õ....l.Õ¢.|..Õ 000080
 76FF0036 E90375FA 460BF846 8BFF6C86 89000002 519A5016 F8468D10 76FF0DB9 ¿..v..F½.P.Q.....l..F½.F'u.Õ6..v 0000A0
 000005B8 9A6377FF 266577FF 26F85EC4 FF6C8689 04C483FF FF02199A F876FFFA '.v½......á...l.á^½&.we&.wc.|... 0000C0
 468D1076 FF0D60E9 FF6C868B 00000569 9A6377FF 266577FF 26F85EC4 FF6C8689 ..l.á^½&.we&.wc.i.....l.Õ'..v..F 0000E0
 FF9A8008 688C76FF 8E76FF00 00FFFF9A 50168C46 801076FF 0000079E 9A5016F8 ½.P......v..F..P......v..v.h.... 000100
 00009A10 76FF9876 FF9A76FF 5052005B 05FA5688 F846889A 56899846 890000FF ....F..V..F½.V'.(.RP.v..v..v.... 000120
 880000FF FF9A016A 006A0207 68006A1D AF681076 FF0D10E9 0000B80A C483FFFF ...á.|..Õ...v.h£.j.h..j.j......| 000140
 06E90374 FA460BF8 4688FF6C 86890000 07E89A50 16F8468D 1076FF0C F6E90000 ..Õ-..v..F½.P.Ò.....l..F½.F't.Õ. 000160
 C459578B 2657478B 26F85EC4 07892602 47892600 00880A5E C40CD4E9 00008800 .|..Õá.á^.|..&.G.&..á^½&.GW&.WYá 000180
 FF6C8689 00000A13 9A5016F8 468D1076 FF0CACE9 00008802 57892607 8926065E ^.&..&.W.|..Õ¯..v..F½.P.......l. 0001A0
 89A64689 68578B26 69478B26 F85EC40C 8AE90000 880006E9 0374FA46 0BF8468B .F½.F't.Õ..|..Õ..á^½&.Gi&.Wk.Fl. 0001C0
 F8468B01 D7E90374 00FF6CBE 83925689 90468906 578B2604 478B26F8 5EC4A856 V´á^½&.G.&.W..F..V..ƒl..t.Õ=..F½ 0001E0

Dump of file SATURN:[PCCOMMON.DUMP.DLL]SA-DIFM.DLL;1 on 18-APR-1990 10:50:26.92
File ID (450,15,0)   End of file block 323 / Allocated 324

Virtual block number 26 (0000001A), 512 (0200) bytes

 5EC40153 E9037400 027F8326 0150E903 74683F83 260A5EC4 01CCE903 75FA4608 .F'u.Õä.á^.&.7ht.Õ].&....t.ÕS.á^ 000000
 54868D00 6A006AFF 5886FFFF 5AB6FFFF 5A9689FF 58868906 578B2604 478B26A6 l&.G.&.W...X...Z..ÑZ..ÑX.j.j...T 000020
 A0468DFF 5886FFFF 5AB6FF00 FFE90375 FF56860B FF548688 0000FFFF 9A5016FF ..P.......T...V.u.Õ...ÑZ..ÑX..F. 000040
 09129A00 6AA076FF A276FF27 10689076 FF9276FF 5016FC46 8D0000FF FF9A5016 .P......F=.P.v..v.h.'.vÅ.v.j.... 000060
 A276FF50 16F2468D 0BC3E9FF 6C868800 07E90375 00003DFF 6C868910 C4830000 ...á...l.=..u.Õ....l.Õü..F·.P.vÅ 000080
 0B9BE9FF 6C868800 07E90375 00003DFF 6C86890A C4830000 FFFF9A00 6AA076FF .v.j.......á...l.=..u.Õ....l.Õ.. 0000A0
 6AFC76FF FE76FF27 12689076 FF9276FF 066A5016 8A468D00 6EE90374 7AF27E83 .-·zt.Õn..F..Pj..v..v.h.'.v±.v=j 0000C0
 7E83085D E9FF6C86 880007E9 037500FF 6CBE83FF 6C868912 C4830000 067E9A00 ..-....á...l../l..u.Õ....l.Õ]..- 0000E0
 0000880A 5EC4001A E9025789 26078926 FE5688FC 46880A5E C40013E9 0375008A ..u.Õ..á^..F=.V±&..&.W.Õ..á^.|.. 000100
 47892600 00880A5E C4001AE9 07892602 47892600 0088065E C4078926 02478926 &.G.&..á^.|..&.G.&..Õ..á^.|..&.G 000120
 89260247 89260000 880A5EC4 001AE907 89260247 89260000 88065EC4 07892602 .&..á^.|..&.G.&..Õ..á^.|..&.G.&. 000140
 7F832600 0AE90374 693F8326 0A5EC400 56E90789 26024789 26000088 065EC407 .á^.|..&.G.&..ÕV.á^.&.?it.Õ..&.. 000160
 F85EC400 1DE90374 00027F83 260027E9 03746C3F 83260A5E C40016E9 03750002 ..u.Õ..á^.&.?(t.Õ'.&....t.Õ..á^½ 000180
 0000880A 5EC40000 E90AA4E9 00008802 57892607 89260A5E C4025788 26078B26 &..&.W.á^.&..&.W.|..ÕE.Õ..á^.|.. 0001A0
 F8468D10 76FF0A81 E9000088 07892602 47892600 0088065E C4078926 02478926 &.G.&..á^.|..&.G.&..|..Õ...v..F½ 0001C0
 26F85EC4 0A5FE900 00880006 E90374FA 460BF846 8BFF6C86 89000006 039A5016 .P.......l..F½.F't.Õ..|..Õ_.á^½& 0001E0
```

Dump of file SATURN:[PCCOMMON.DUMP.DLL]SA-DIFM.DLL;1 on 18-APR-1990 10:50:26.92
File ID (450,15,0)   End of file block 323 / Allocated 324

Virtual block number 27 (0000001B), 512 (0200) bytes

```
46B88856 89864689 65578826 63478826 F85EC4A8 5689A646 89685788 26694788 .Gi&.Wk.Fl.V'á^½&.Gc&.We.F..V..F 000000
08460806 468806C4 830A8A03 039A6377 FF266577 FF26F85E C4F676FF F646890A ..F-.v-á^½&.we&.wc....¤..á..F..F. 000020
00000AD2 9A426A50 16804680 013A6807 D5E9F646 880A10E9 00008800 06E90374 t.Õ..¦..Õ...F-Õ(.h:..F¯.PjB.@... 000040
012247C7 26A65EC4 00000AEA 9A006A00 6A501680 468D1081 686177FF 26F85EC4 á^½&.wahÝ..F¯.Pj.j..õ...á^Ì&úG". 000060
6A501680 4680013C 6809C4E9 FF6C8688 FF6C8689 0B001D4A 9A8676FF 8876FF00 ..v..v..J.....l...l.Õá.h<..F¯.Pj 000080
5EC40000 0B309A00 6A006A50 16804680 1D816861 77FF26F8 5EC40000 08189A42 B.....á^½&.wahÝ..F¯.Pj.j..0...á^ 0000A0
01306809 7EE9FF6C 8688FF6C 86890846 201A9A86 76FF8876 FF000122 47C726A6 Ì&úG"...v..v... F...l...l.Õ-.h=. 0000C0
9A006A00 6A501680 468D10B1 686177FF 26F85EC4 0000085E 9A426A50 16804680 .F¯.PjB.^...á^½&.wahÝ..F¯.Pj.j.. 0000E0
FF6C8688 FF6C8689 0B83225C 9A8676FF 8876FF00 012247C7 26A65EC4 00000876 v...á^Ì&úG"...v..v..\"....l...l. 000100
16804680 1D816861 77FF26F8 5EC40000 0B819A42 6A501680 46800138 680938E9 Õ8.h;..F¯.PjB.Ý...á^½&.wahÝ..F¯. 000120
08FBE9FF 6C8688FF 6C868908 9917959A 8676FF88 76FF0000 0BC99A00 6A006A50 Pj.j..è....v..v........l...l.Õ«. 000140
426A5016 80468001 3E6808E5 E9FF6C86 88FF6C86 89080643 279A8676 FF8876FF .v..v..'C#...l...l.Õ(.h>..F¯.PjB 000160
8876FF00 000C5A9A 006A006A 50168046 801DB168 6177FF26 F85EC400 000C429A .B...á^½&.wahÝ..F¯.Pj.j..Z....v. 000180
9A006A03 6A016A00 6A016A00 6A08A8E9 FF6C8688 FF6C8689 0C670E21 9A8676FF .v..!.g...l...l.Õ´.j.j.j.j.j.j.. 0001A0
8876FFFF 6C868904 C483046E 1FD49AF8 76FFFA76 FF00000C 2C9A5052 00000C25 %...RP.,....v'.v½.å.n..á...l..v. 0001C0
000005EF 9A505200 0005E89A 006A016A 016A006A 016A006A 00000720 9A8676FF .v.. ...j.j.j.j.j.j..Õ...RP.ÿ... 0001E0
```

Dump of file SATURN:[PCCOMMON.DUMP.DLL]SA-DIFM.DLL;1 on 18-APR-1990 10:50:26.92
File ID (450,15,0)   End of file block 323 / Allocated 324

Virtual block number 28 (0000001C), 512 (0200) bytes

```
1DB16861 77FF26F8 5EC40000 FFFF9A42 6A501680 4680013E 680854E9 FF6C8688 ..l.ÕT.h>..F¯.PjB.....á^½&.wahÝ. 000000
6C8688FF 6C8689FF FF0C589A 8676FF88 76FF0000 03029A00 6A006A50 16804680 .F¯.Pj.j.......v..v..X.....l...l 000020
00008800 000CA89A 206A006A 00EB681E 010C681E 016A006A 016A006A 0817E9FF .Õ..j.j.j.j..h...h§.j.j . ´...¦.. 000040
E90000B8 0000FFFF 9A206A00 6A010D68 1E012868 1E016A00 6A016A00 6A07F8E9 Õ%.j.j.j.j..h+..h..j.j .....¦..Õ 000060
07B8E900 00B80000 1E47C726 A65EC407 CAE90000 B800011E 47C726A6 5EC407D9 \.á^Ì&úG...¦..Õò.á^Ì&úG...¦..ÕE. 000080
206A006A 012C681E 0148681E 016A006A 016A006A 07AFE900 00B807B5 E90000B8 ¦..Õç.¦..ÕE.j.j.j.j..hH..h,.j.j  0000A0
9A206A00 6A014968 1E016868 1E016A00 6A016A00 6A0790E9 00008800 0000109A .....¦..Õ..j.j.j.j..hk..hI.j.j . 0000C0
9A5016FF 5486B000 6A006A04 77FF2606 77FF26A6 5EC40771 E90000B8 00000E43 C....¦..Õq.á^Ì&.w.&.w.j.j...T..P. 0000E0
C70068E9 0000A446 C70048E9 0A468800 CBE90375 FF568608 FF548688 00000874 t.....T...V.u.Õù..F.ÕK.úFÊ..Õh.ú 000100
C70048E9 0001A446 C70050E9 0002A446 C70058E9 0008A446 C70060E9 0004A446 FÊ..Õ'.úFÊ..ÕX.úFÊ..ÕP.úFÊ..ÕH.ú 000120
E90028E9 0009A446 C70030E9 000AA446 C70038E9 0005A446 C70040E9 0006A446 FÊ..Õa.úFÊ..Õ8.úFÊ..Õ0.úFÊ..Õ(.Õ 000140
7700670D 5F00570D 4F00470D A5A7FF2E 93C00300 1AE90376 00083D01 07200025 %.-■.=..v.Õ...â...ÌE.G.O.W._.g.w 000160
FF260677 FF26A65E C4000002 9E9A0477 FF260677 FF26A65E C4007F00 87006F00 .o.....á^Ì&.w.&.w......á^Ì&.w.&. 000180
A076FFA2 76FF5F53 68A476FF 001DE903 7400003D 00000285 9A5016A0 46800477 w..F..P.ç...=..t.Õ...vÊhS_.vÅ.v. 0001A0
E90000B8 00000EC3 9A8676FF 8876FFFF C6E9FF6C 86890AC4 83000008 AE9A006A j..Û....á...l.Õ6..v..v..û...¦..Õ 0001C0
006A0650 E90000B8 0663E9FF 6C8688FF 6C86890E 5643279A 8676FF88 76FF0679 y..v..v..'CV...l...l.Õc.¦..Õ].j. 0001E0
```

Dump of file SATURN:[PCCOMMON.DUMP.DLL]SA-DIFM.DLL;1 on 18-APR-1990 10:50:26.92
File ID (450,15,0)   End of file block 323 / Allocated 324

Virtual block number 29 (0000001D), 512 (0200) bytes

```
8876FF06 3EE90000 B800000C 899A206A 006A006A 006A016C 681E016A 006A016A j.j.j..hl.j.j.j.j .....¦..Õ>..v. 000000
86890E82 201A9A86 76FF8876 FF0628E9 FF6C8688 FF6C8689 0E6C1D4A 9A8676FF .v..J.l...l...l.Õ(..v..v... .... 000020
FF05FCE9 FF6C8688 FF6C8689 0E9B225C 9A8676FF 8876FF06 12E9FF6C 8688FF6C l...l.Õ...v..v..\"....l...l.Õ=.. 000040
6877FF26 F85EC400 6A006A05 E6E9FF6C 8688FF6C 86890ED0 11D49A86 76FF8876 v..v..å.Å...l...l.Õl.j.j.á^½&.wk 000060
11D49A86 76FF8876 FF00000C 149A8676 FF8876FF 08C4830E E614759A 6977FF26 &.wi.u.l..á..v..v.......v..v..å. 000080
76FF0590 E904C483 0EF72114 9AF876FF FA76FF05 AEE9FF6C 8688FF6C 86890A65 e...l...l.ÕÙ..v'.v½..I%..á.Õ...v 0000A0
057BE904 C4830C04 23139AF8 76FFFA76 FF058CE9 04C4830F 0824829A F876FFFA '.v½..$...á.Õ...v'.v½..#...á.Õ(. 0000C0
77FF26F8 5EC40000 07349A50 16F84680 1076FF00 0007419A 50168C46 8D1076FF .v..F..P.A....v..F½.P.4...á^½&.w 0000E0
C4006A00 6AFFFF68 FFFF688C 76FF8E76 FF00000F 969A5016 9C468D63 77FF2665 e&.wc.F..P......v..v.h..h..j.j.á 000100
468D1076 FF0520E9 00008800 00FFFF9A 9C76FF9E 76FF6377 FF266577 FF26F85E ^½&.we&.wc.v..v......¦..Õ ..v..F 000120
6377FF26 6577FF26 F85EC400 000FE19A 5016F846 8D1076FF 00000FD4 9A50168C ..P.å....v..F½.P.Ã...á^½&.we&.wc 000140
8E76FF77 478926F8 5EC408F7 C01B0177 7F8326F8 5EC40000 10539A50 169C4680 .F..P.S...á^½&..w..å%Ãá^½&.Gw.v. 000160
468D1076 FF04C0E9 00008800 00FFFF9A 7777FF26 F85EC49C 76FF9E76 FF8C76FF .v..v..v.á^½&.ww.....¦..Õå..v..F 000180
F7C01B01 797F8326 F85EC400 00103E9A 5016F846 8D1076FF 00001031 9A50168C ..P.1....v..F½.P.>...á^½&..y..å% 0001A0
890000FF FF9A7977 FF26F85E C46377FF 266577FF 26F85EC4 79478926 F85EC408 Ãá^½&.Gyá^½&.we&.wcá^½&.wy...... 0001C0
50168C46 8D1076FF 0463E900 00B80469 E9FF6C86 880007E9 03750000 30FF6C86 .l.=..u.Õ....l.Õi.¦..Õc..v..F..P 0001E0
```

```
Dump of file SATURN:[PCCOMMON.DUMP.DLL]SA-DIFM.DLL;1 on 18-APR-1990 10:50:26.92
File ID (450,15,0)   End of file block 323 / Allocated 324

Virtual block number 30 (0000001E), 512 (0200) bytes

 9C468063 77FF2665 77FF26F8 5EC40000 10849A50 16F8468D 1076FF00 0010779A .W....V..F½.P.....á^½&.we&.wc.F. 000000
 76FF041D E90000B8 0000FFFF 9A9C76FF 9E76FF8C 76FF8E76 FF000010 999A5016 .P......v..v..v..v......|..Õ...v 000020
 266577FF 26F85EC4 00000F26 9A5016F8 468D1076 FF00000F 199A5016 8C468D10 ..F..P......v..F½.P.&...á^½&.we& 000040
 00B80000 FFFF9A9C 76FF9E76 FF8C76FF 8E76FF00 00FFFF9A 50169C46 8D6377FF .wc.F..P......v..v..v..v......|. 000060
 9A036A86 76FF8876 FF03C4E9 0000B800 0010D09A 016A8676 FF8876FF 03D7E900 .Õ▪..v..v.j..Å...|..Õé..v..v.j.. 000080
 8876FF03 9EE90000 B8000010 F69A056A 8676FF88 76FF03B1 E90000B8 000010E3 Ð...|..ÕŸ..v..v.j..−...|..Õ...v. 0000A0
 0000B800 00111C9A 096A8676 FF8876FF 038BE900 00B80000 11099A07 6A8676FF .v.j......|..Õ...v..v.j......|.. 0000C0
 429A0D6A 8676FF88 76FF0365 E90000B8 0000112F 9A0B6A86 76FF8876 FF0378E9 Õx..v..v.j../...|..Õe..v..v.j..B 0000E0
 FF8876FF 033FE900 00B80000 FFFF9A0F 6A8676FF 8876FF03 52E90000 B8000011 ...|..ÕR..v..v.j.......|..Õ7..v.. 000100
 959A006A 036A016A 006A016A 006A0329 E9FF6C86 88FF6C86 89000007 0C9A8676 v........(...(.Õ).j.j.j.j.j.j... 000120
 016A006A 016A006A 04C48311 C917029A F876FFFA 76FF0000 119C9A50 52000011 ...RP......v*.v½...è..é.j.j.j.j. 000140
 036A016A 006A016A 006A02E5 E90000B8 000011BA 9A505200 0011B39A 006A016A j.j..*...RP.¤...|..Õ|.j.j.j.j.j. 000160
 006A06C4 830E8718 859AF876 FFFA76FF 006A0000 11E29A50 52000011 DB9A006A j..Ü...RP.ã...j..v*.v½.ç.ñ..é.j. 000180
 016A006A 029FE900 00B80000 0BF79A50 5200000B F09A006A 016A016A 006A016A j.j.j.j.j..Þ...RP.¾...|..Õ..j.j. 0001A0
 8318B59A F876FFFA 76FF016A 00001228 9A505200 0012219A 006A036A 016A006A j.j.j.j..!...RP.(...j..v*.v½.ç.. 0001C0
 E90000B8 00001176 9A505200 00116F9A 006A016A 016A006A 016A006A 06C48311 ..é.j.j.j.j.j.j..o...RP.v...|..Õ 0001E0

Dump of file SATURN:[PCCOMMON.DUMP.DLL]SA-DIFM.DLL;1 on 18-APR-1990 10:50:26.92
File ID (450,15,0)   End of file block 323 / Allocated 324

Virtual block number 31 (0000001F), 512 (0200) bytes

 00008800 00078B9A 0676FF08 76FF0A76 FF0C76FF 0E76FF61 77FF26F8 5EC40259 Y.á^½&.wa.v..v..v..v..v......|.. 000000
 C003FFC4 E9037600 54300180 2D00BDE9 0376FEC8 E9037502 05300185 E90238E9 Õ8.Õç.=..u.Õà±v.Õ§.-¯.=Î.v.Õé..å 000020
 12321232 12321232 12321232 1232106E 10281232 12321232 0F101276 A7FF2E93 ...Îv...2.2.2.(.n.2.2.2.2.2.2.2. 000040
 12321232 12321232 12320E28 0E2E0E2E 0E281232 12321232 12321232 12320C74 t.2.2.2.2.2.2.(.....(.2.2.2.2.2. 000060
 0D1A0D1A 0D1A0D1A 0D1A0D1A 12320CFB 0CFB0CFB 0CFB1232 0CDC0CDC 0CDC1232 2.Ê.Ê.Ê.2.«.«.«.«.2............ 000080
 12321232 12321232 12321232 12321232 12321232 12321232 12320D1A 0D1A0D1A ......2.2.2.2.2.2.2.2.2.2.2.2.2. 0000A0
 0FCB0F68 12320CD0 12321232 0EDD1162 11EC11A6 12321232 12321232 12321232 2.2.2.2.2.2.Î.š.b.Î.2.2.Å.2.k.Û. 0000C0
 022B3000 63E90376 FAEAE903 7502AA3D 11131100 10ED100A 10C710B4 12321232 2.2.Ç.ú.Õ.Ú.....*´.u.ÕÕ*v.Õc.=+. 0000E0
 E9037502 1930FE02 E9037502 0730FDF7 E9037502 06300023 E90376F9 7DE90375 u.Õ)*v.Õ#.=..u.Õ%»=..u.Õ.±=..u.Õ 000100
 02A430FB 70E90375 02A330F9 5CE90375 022C30FE D5E9F97C E9037502 2A30F941 A*=*.u.Õ|*Õ{±*..u.Õ\*=Ê.u.Õp«=Ê. 000120
 FEA2E9FB 18E90375 02A830FA F4E90375 02A630FA E6E90375 02A530FA D8E90375 u.ÕA*=Ê.u.Õ|*=Î.u.Õ¶*=¨.u.Õ.«ÕÅ± 000140
 02AD30FB 41E90375 02AC30F8 3EE90375 02AB3000 2BE90376 FAF7E903 7502F33D =µ.u.Õ¼*v.Õ+.=¨.u.Õ>½=¯.u.ÕA«=Ü. 000160
 F6F7E903 75038F30 FE6AE9F8 72E90375 02E230FA D2E90375 02B930FB 4AE90375 u.ÕJ«=¿.u.Õ0*=ã.u.Õr½Õj±=..u.Õ¼- 000180
 F71DE903 75039030 FE4AE9F6 9CE90375 038E30FA B2E90375 02FD3000 13E90376 v.Õ..=».u.Õý*=..u.Õ.-ÕJ±=..u.Õ.% 0001A0
 76FF1076 FFFE27E9 F788E903 75039330 F7A6E903 7503923D F75BE903 75039130 =..u.Õ[%=..u.Õ]%=..u.Õ.%Õ'±.v..v 0001C0
 F2A2E903 7510CF3D 0063E900 66E90000 FFFF9A06 76FF0876 FF0A76FF 0C76FF0E ..v..v..v..v......Õf.Õc.=ü.u.ÕÀ· 0001E0

Dump of file SATURN:[PCCOMMON.DUMP.DLL]SA-DIFM.DLL;1 on 18-APR-1990 10:50:26.92
File ID (450,15,0)   End of file block 323 / Allocated 324

Virtual block number 32 (00000020), 512 (0200) bytes

 10CC3DED F8E90375 10043DED E4E90375 10033DEE 05E90375 10013D00 23E90376 v.Õ#.=..u.Õ.Ÿ=..u.ÕÕÜ=..u.Õ«Ü=ë. 000000
 F59AE903 751DAF3D F313E903 7510AD3D F19AE903 7510003D FFB3E9EE D3E90375 u.Õ¢ŸÕ°.=Å.u.Õ.þ=Ü.u.Õ.µ=€.u.Õ.% 000020
 CAC95F5E 1FFF80E9 F2A3E903 751DB63D F315E903 751DB43D F367E903 751DB23D =ý.u.Õgµ=Ç.u.Õ.µ=Ñ.u.ÕÈ·Õ...^ èò 000040
 FF0038E9 03750C46 080A4688 011AE90E 4688D88E 01FCB81E 56570000 1AC8000C ..à...WV.|=..Ä.F.Õ...F..F.u.ÕŠ.. 000060
 26FC5EC4 00001571 9A5016FC 468DE676 FF000014 F69A5016 E6468D10 76FF1276 v..v..F|.P.−....v|.F=.P.q...á^=& 000080
 1076FF12 76FF00F7 E900000A A49A0A76 FF0C76FF 505299E6 46881DAE 686177FF .wahÒ..F|.RP.v..v..Ê...Õ%..v..v. 0000A0
 1276FF00 D4E90000 BA0000B8 0000FFFF 9A016AE6 76FF0000 15649A50 16E6468D .F|.P.d....v|j......|..¤..Õå..v. 0000C0
 EC468DE8 76FFEA76 FFEA5689 E8468900 00FFFF9A 5016EC46 8D006A00 6A1076FF .v.j.j..Fš.P......FÒ.Võ.võ.vÒ.Fš 0000E0
 830092E9 0000BA00 00B80000 FFFF9AE8 76FFEA76 FF0000FF FF9AEC6A FF6A5016 .Pj.jš......võ.vÒ.....|..¤..Õ... 000100
 5016FC46 8DE676FF 0000FFFF 9A5016E6 468D1076 FF1276FF 0029E903 75000A7E ~..u.Õ)..v..v..F|.P......v|.F=.P 000120
 0A76FF0C 76FF0E76 FF1076FF 1276FF00 1DE90063 E90000BA 0000B800 000F819A .....|..¤..Õc.Õ...v..v..v..v..v. 000140
 0876FF0A 76FF0C76 FF0E76FF 1076FF12 76FF0043 E9000015 B49A0676 FF0876FF .v..v..Ç...ÕC..v..v..v..v..v..v. 000160
 233DFED6 E9037500 003DFF89 E9037500 05300023 E90026E9 0000FFFF 9A0676FF .v......Õ&.Õ#.=..u.Õ..=..u.Õ▪±=# 000180
 B81E5657 000000C8 000ECAC9 5F5E1FFF BDE9FF0C E9037500 293DFF37 E9037500 .u.Õ7.=).u.Õ..Õ§..^_èò..à...WV.| 0001A0
 E90000B8 0006E903 75000030 FFFF073F 9A0200A3 26064688 2262068E D88E149A ...Ä..b".F.&È...?..¯=..u.Õ..|..Õ 0001C0
 E9037500 003DFFFF 1DDF9A00 65E90000 B80006E9 03750000 3DFFFF4A 8A9A0078 x...J..=..u.Õ..|..Õe..Õ...=..u.Õ 0001E0
```

```
Dump of file SATURN:[PCCOMMON.DUMP.DLL]SA-DIFM.DLL;1 on 18-APR-1990 10:50:26.92
File ID (450,15,0)   End of file block 323 / Allocated 324

Virtual block number 33 (00000021), 512 (0200) bytes

 FFFF4465 9A003FE9 00008800 06E90375 000030FF FF23BF9A 0052E900 00880006 ..¡..ÕR..¢#..=..u.Õ..¡..Õ?..eD.. 000000
 19E90000 B80006E9 03750000 30FFFF0D C29A002C E90000B8 0006E903 7500003D =..u.Õ..¡..Õ,..ô...=..u.Õ..¡..Õ. 000020
 90CBC95F 5E1F0000 E90001B8 0006E900 00B80006 E9037500 0030FFFF 09F09A00 ..Þ...=..u.Õ..¡..Õ..¡..Õ...^_èù. 000040
 0001018E 00020C73 00120FC1 0203032B 000B0893 02030232 000A14E3 02030047 G...D...2.......+...ê...s....... 000060
 00040471 00050000 000303FA 00020000 00020235 000202AF 000B00C3 02030000 ....û...£...5.......ª.......q... 000080
 00040153 01030000 0004120F 00020C7E 00120F61 02030230 000A0F74 02030C0D ....t...=...a...~...........S... 0000A0
 00061602 00020155 0008008F 02030000 00050E1B 00020B93 001000F3 020300F3 µ...µ...................U....... 0000C0
 000A01D5 02030000 0007163B 00020B22 000F0F38 020309A2 000F1080 02030000 ....§...Å...;..."...;.......(... 0000E0
 0009031E 02030000 00091615 00020003 000400FE 01030000 00081628 00020250 P...(.......±................... 000100
 00130ABC 0203008B 00040CF1 01030000 000A164E 00020068 00080071 020301DE ß...q...h...N.......þ.......... 000120
 00081674 00020AB4 000F04B6 020302D4 000B00D8 0203008C 00040135 01030C93 ....5.......Å...Å...Ñ...Ç...t... 000140
 0004074F 01030261 000A14BB 02030B39 000F100B 02030000 000C1661 00020000 ....a...........9...£...a...O... 000160
 00100024 00020554 000D0374 02030000 000E0770 00020014 0014042C 02030013 ....,.......p.......t...T...$... 000180
 001215F0 00020274 000A14C8 02030083 00080586 02030986 000F0F46 02020000 ....F...............à...t...Þ... 0001A0
 0004151D 010300AD 00041537 01030563 000D0485 02030950 000F02D8 02030000 ....Ù...P.......c...7...Ù....... 0001C0
 00041597 01031492 000200F4 0005002E 00041542 0103008E 00080312 0203002D -...........B.......¶........... 0001E0
```

```
Dump of file SATURN:[PCCOMMON.DUMP.DLL]SA-DIFM.DLL;1 on 18-APR-1990 10:50:26.92
File ID (450,15,0)   End of file block 323 / Allocated 324

Virtual block number 34 (00000022), 512 (0200) bytes

 000A1500 02030C4C 001210AA 02030300 000B0D30 02030287 000A01E3 02030082 ý...D.......0.......¯...L....... 000000
 000F04C8 02030986 000F0F49 0205096D 000F0E08 020309EA 000F1153 0203020C ....S...õ.......m...I.......à... 000020
 000F0556 02030218 000A141E 020308E8 00100806 02030298 000A005C 02030AEF ÿ...\.......ø...Ò...........V... 000040
 000402CD 01030227 000A1249 020309FB 000F04E7 02030C61 00121064 02030978 x...d...a...Ô...«...I...'...ë... 000060
 00000000 00000080 000800A8 0203005C 00041200 01030058 000411F9 01030059 Y...ª...[.......\...´...§....... 000080
 76FF0C76 FF017E68 1E0477FF 260677FF 26065EC4 D88EFFFF B81E5657 000002C8 à...WV.¡...Äó^.&.w.&.w..h~..v..v 0000A0
 681E0186 681E016A 006A016A 006A001F E9037500 FE7E83FE 46890000 FFFF9A0A .......F±.~±.u.Õ..j.j.j.j..hÑ..h 0000C0
 0000A4C8 CBC95F5E 1F0000E9 0000B800 06E9FE46 8B0000FF FF9A206A 006A0190 ..j.j ......F±Õ..¡..Õ...^_èùàÉ.. 0000E0
 03750000 30AA4689 0000FFFF 9A5016FC 46800676 FF0876FF D88E0008 B81E5657 WV.¡...Ä.v..v..F=.P......F`=..u. 000100
 03750257 39260009 E9037407 39261056 8B0E4688 FC5EC400 EBE9AA46 8B0006E9 Õ...F`ÕS.ó^=.F..V.&9.t.Õ..&9W.u. 000120
 7500003D AA468900 00FFFF9A 5016AC46 8D0676FF 0876FF00 CBE90000 B80006E9 Õ..¡..Õù..v..v..F¯.P......F`=..u 000140
 5E868D02 6A0E76FF 1076FF04 77FF2606 77FF26FC 5EC400AA E9AA4688 0006E903 .Õ...F¯Õ`.ó^=&.w.&.w..v..v.j...^ 000160
 B0468D01 B7681E00 7BE9AA46 8B0006E9 03750000 30AA4689 0000FFFF 9A5016FF ..P......F`=..u.Õ...F¯Õ(..hñ..F¯ 000180
 FF5C8689 D8F7004B 2D04C483 0132008C 9A5016B0 468008C4 83011200 569A5016 .P.V....ó..F¯.P...2..ó.-K.¼Ä..\. 0001A0
 FF265977 FF26FC5E C40AC483 016000A4 9A5016B0 46805016 FF5E868D FF5CB6FF .Ñ\...^..P.F¯.P.É.'..ó.ó^=&.wY&. 0001C0
 00569A50 52000805 FE568BFC 46885016 FF5E868D 0000FFFF 9A5016B0 46805777 wW.F¯.P.......^..P.F=.V±...RP.V. 0001E0
```

```
Dump of file SATURN:[PCCOMMON.DUMP.DLL]SA-DIFM.DLL;1 on 18-APR-1990 10:50:26.92
File ID (450,15,0)   End of file block 323 / Allocated 324

Virtual block number 35 (00000023), 512 (0200) bytes

 1E565700 000AC8CB C95F5E1F 0000E900 00B80001 7D47C726 FC5EC408 C483FFFF ...ó.ó^=&ùG)..¡..Õ...^_èùà...WV. 000000
 0006E903 7500003D F6468900 0000749A 5016FC46 8D0676FF 0876FFD8 8E0064B8 |d..Ä.v..v..F=.P.t....F¯-=..u.Õ.. 000020
 06E90375 000030F6 46890000 00859A50 16F8468D 0676FF08 76FF0055 E9F6468B .F~ÕU..v..v..F¼.P.ç....F-=..u.Õ. 000040
 06E90375 02573926 0009E903 74073926 1056880E 468BFC5E C40034E9 F6468800 ..F~Õ4.ó^=.F..V.&9.t.Õ..&9'.u.Õ. 000060
 CBC95F5E 1F0000E9 00018800 00FFFF9A 016A5F77 FF26FC5E C40014E9 00008800 .¡..Õ..ó^=&.w_j......¡..Õ.. ^_èù 000080
 FF0876FF 00000191 9A5016F8 46800676 FF0876FF D88E0181 B81E5657 000016C8 à...WV.¡...Ä.v..v..F¼.P........ 0000A0
 9A5016EC 468D106A 0E76FF10 76FF0A76 FF0C76FF 00000182 9A5016F4 46800676 v..F¶.P.ÿ....v..v..v..v.j..F§.P. 0000C0
 3926EE56 8BEC4688 F85EC400 E7E9EA46 8B0006E9 03750000 30EA4689 0000FFFF .....Fõ=..u.Õ...FõÕÕ.ó^½.F§.VY&9 0000E0
 F876FFFA 76FF5016 F0468D00 C7E90000 B80006E9 03750257 39260009 E9037407 .t.Õ..&9W.u.Õ..¡..Õù..FÞ.P.vª.v½ 000100
 8D009DE9 EA468800 06E90375 00003DEA 46890CC4 83028310 589A0E76 FF1076FF .v..v..X.°..ó..Fõ=..u.Õ...FõÕ... 000120
 03750000 3DEA4689 0CC483FF FF10589A 1276FF14 76FFF876 FFFA76FF 5016FC46 F=.P.vª.v½.v..v..X....ó..Fõ=..u. 000140
 3DEA4689 08C48300 0003159A 006AF076 FFF276FF 60E66800 73E9EA46 8B0006E9 Õ...FõÕs.hl'.v·.vÞj.......ó..Fõ= 000160
 0375FE46 08FC4688 003EE903 75F24608 F0468800 4FE9EA46 8B0006E9 03750000 ..u.Õ...FõÕÕ..FÞ.F·u.Õ>..F=.F±u. 000180
 3DEA4689 0CC48300 00FFFF9A 006AF076 FFF276FF 60E768FC 76FFFE76 FF0033E9 Õ3..v±.v=hÓ'.v·.vÞj.......ó..Fõ= 0001A0
 C95F5E1F 0000E900 00B80001 7D47C726 F85EC400 0FE9EA46 8B0006E9 03750000 ..u.Õ...FõÕ..ó^½&ùG)..¡..Õ...^_è 0001C0
 0876FF00 0002189A 5016FC46 8D0676FF 0876FFD8 8E020888 1E565700 0016C8CB ùà...WV.¡...Ä.v..v..F=.P......v. 0001E0
```

Dump of file SATURN:[PCCOMMON.DUMP.DLL]SA-DIFM.DLL;1 on 18-APR-1990 10:50:26.92
File ID (450,15,0)   End of file block 323 / Allocated 324

Virtual block number 36 (00000024), 512 (0200) bytes

```
5016EC46 8D0A6A0E 76FF1076 FF0A76FF 0C76FF00 0002289A 5016F446 8D0676FF .v..F¶.P.(....v..v..v..v.j..F&.P 000000
26EE568B EC468BFC 5EC400AA E9EA468B 0006E903 7500003D EA468900 0002409A .a....Fõ=..u.Õ...FõÕ`.á^•.F&.VY& 000020
FF1076FF 0A76FF0C 76FF008A E90000B8 0006E903 75025739 260009E9 03740739 9.t.Õ..&9W.u.Õ..|..Õ...v..v..v.. 000040
9A0E76FF 1076FFFC 76FFFE76 FF5016F0 46800000 FFFF9A50 16F8468D 056A0E76 v.j..F%.P......FÞ.P.v±.v•.v..v.. 000060
0374F246 0BF0468B 0048E9EA 468B0006 E9037500 003DEA46 890CC483 02891058 X....á..Fõ=..u.Õ...FõÕH..FÞ.F·t. 000080
10C48300 00FFFF9A 006A776A 5016F046 8D0E76FF 1076FFFC 76FFFE76 FF0037E9 Õ7..v±.v•.v..v..FÞ.Pjwj.......á. 0000A0
0000E900 00B80001 7D47C726 FC5EC400 0FE9EA46 8B0006E9 03750000 3DEA4689 .Fõ•..u.Õ...FõÕ..á^•&ÚG)..|..Õ.. 0000C0
0003599A 5016FC46 8D0676FF 0876FFD8 8E034988 1E565700 001EC8C8 C95F5E1F .^_èùà...WV.||..Ä.v..v..F•.P.Y.. 0000E0
E9037407 39261056 8B0E468B FC5EC400 0003699A 5016F846 8D0676FF 0876FF00 ..v̄..v..F%.P.i...á^•.F..V.&9.t.Õ 000100
FF1476FF 0477FF26 0677FF26 FC5EC400 86E90000 B80006E9 03750257 39260009 ..&9W.u.Õ..|..Õ..á^•&.w.&.w..v.. 000120
9A1276FF 1476FFFC 76FFFE76 FF5016F4 46800000 00E49A50 16E4468D 036A1276 v.j..FÕ.P.Õ....F¶.P.v±.v•.v..v.. 000140
0374F646 0BF4468B 003FE9E2 46880006 E9037500 003DE246 890CC483 04F21058 X.·..á..Fã=..u.Õ...FãÕ7..F¶.F-t. 000160
E9037500 003DE246 8908C483 03E20000 9A1276FF 1476FFFC 76FFFE76 FF002EE9 Õ...v±.v•.v..v....ã..á..Fã=..u.Õ 000180
000226C8 CBC95F5E 1F0000E9 0000B800 017D47C7 26FC5EC4 000FE9E2 46880006 ...FãÕ..á^•&ÚG)..|..Õ...^_èùà&.. 0001A0
0876FF00 00045D9A 5016FC46 8D0676FF 0876FF01 F5FA46C7 D88E0440 B81E5657 WV.|M..ÄúF*%..v..v..F•.P.Ţ....v. 0001C0
39260009 E9037407 39261056 8B0E468B FC5EC400 00046D9A 5016F646 8D0676FF .v..F-.P.m...á^•.F..V.&9.t.Õ..&9 0001E0
```

Dump of file SATURN:[PCCOMMON.DUMP.DLL]SA-DIFM.DLL;1 on 18-APR-1990 10:50:26.92
File ID (450,15,0)   End of file block 323 / Allocated 324

Virtual block number 37 (00000025), 512 (0200) bytes

```
046A1276 FF1476FF 0477FF26 0677FF26 FC5EC401 1EE90000 B80006E9 03750257 W.u.Õ..|..Õ..á^•&.w.&.w..v..v.j. 000000
04C21058 9A1276FF 1476FFFC 76FFFE76 FF5016F2 46800000 04AA9A50 16D2468D .F•.P.ˉ....F·.P.v±.v•.v..v..X.ò. 000020
C6008DE9 0374F446 08F2468B 0007E900 46880006 E9037500 003D0046 890CC483 .á..FÅ=..u.Õ...FÅÕ■..F·.F¶t.Õ§.ó 000040
46890000 FFFF9A50 16FDDA86 8DFA76FF 1276FF14 76FF0A76 FF0C76FF 00FDDA86 .Õ»..v..v..v..v..v'..Õ».P......F 000060
D4568BD2 46880091 E9D0468B 0006E903 75844400 7E810010 E9037500 D07E8300 Å.-Å.u.Õ...-ÅE.u.Õ...FÅÕ...F•.VÅ 000080
468BE856 89E64689 D8568BD6 468BEC56 89EA4689 DC568BDA 468BE456 89E24689 .Fã.VÕ.FÖ.VE.Fõ.V&.F•.VÄ.Fl.VÒ.F 0000A0
5016E246 8D066A01 F468006A 006A006A 006A006A 006AF056 89EE4689 E0568B0E B.VÅ.FŸ.VÞj.j.j.j.j.j.h¶.j..Fã.P 0000C0
6A5016F2 468DFC76 FFFE76FF 1276FF14 76FF5016 FDDA868D 1E6A006A 006A006A j.j.j.j...Õ».P.v..v..v±.v•.F·.Pj 0000E0
26FC5EC4 000FE9D0 46880006 E9037500 003D0046 8930C483 00000419 9A006A78 xj.......á0.FÅ=..u.Õ...FÅÕ..á^•& 000100
FF0876FF D88E0524 B81E5657 00001EC8 CBC95F5E 1F0000E9 0000B800 017D47C7 ÚG)..|..Õ...^_èùà...WV.|$..Ä.v.. 000120
88FC5EC4 00000549 9A5016F4 468D0676 FF0876FF 00000539 9A5016FC 468D0676 v..F•.P.9....v̄..v..F¶.P.l...á^•. 000140
26FC5EC4 0091E900 00B80006 E9037502 57392600 09E90374 07392610 568B0E46 F..V.&9.t.Õ..&9W.u.Õ..|..`..á^•& 000160
76FF5016 F8468000 0005869A 5016E446 8D036A12 76FF1476 FF0477FF 260677FF .w.&.w..v..v.j..FÕ.P...... %.P.v 000180
E2468B00 06E90375 00003DE2 46890CC4 83059E10 589A1276 FF1476FF FC76FFFE ±.v•.v..v..X....á..Fã=..u.u  .Fã 0001A0
16F8468D 1276FF14 76FFFC76 FFFE76FF 006A0039 E90374FA 460BF846 8B004AE9 ÕJ..F%.F±t.Õ9.j..v±.v•.v..v..F%. 0001C0
5EC4000F E9E2468B 0006E903 7500003D E2468912 C4830000 06649A00 6A7B6A50 Pj(j..d....á..Fã=..u.Õ...FãÕ..á^ 0001E0
```

Dump of file SATURN:[PCCOMMON.DUMP.DLL]SA-DIFM.DLL;1 on 18-APR-1990 10:50:26.92
File ID (450,15,0)   End of file block 323 / Allocated 324

Virtual block number 38 (00000026), 512 (0200) bytes

```
76FFD88E 0698B81E 56570000 1EC8CBC9 5F5E1F00 00E90000 B800017D 47C726FC •&ÚG)..|..Õ...^_èùà...WV.|...Ä.v 000000
5EC40000 06889A50 16F4468D 0676FF08 76FF0000 06A89A50 16FC468D 0676FF08 ..v..F•.P.ˉ....v..v..F¶.P.|...á^ 000020
5EC40091 E90000B8 0006E903 75025739 260009E9 03740739 26105688 0E4688FC •.F..V.&9.t.Õ..&9W.u.Õ..|..Õ..á^ 000040
5016F846 80000006 F59A5016 E4468D03 6A1276FF 1476FF04 77FF2606 77FF26FC •&.w.&.w..v..v.j..FÕ.P.%....F%.P 000060
880006E9 03750000 30E24689 0CC48307 0010589A 1276FF14 76FFFC76 FFFE76FF .v±.v•.v..v..X....á..Fã=..u.Õ... 000080
468D1276 FF1476FF FC76FFFE 76FF006A 0039E903 74FA460B F8468B00 4AE9E246 FãÕJ..F%.F±t.Õ9.j..v±.v•.v..v..F 0000A0
000FE9E2 46880006 E9037500 003DE246 8912C483 00000746 9A006A7C 6A5016F8 %.Pj|j..F....á..Fã=..u.Õ...FãÕ.. 0000C0
D88E077A B81E5657 000202C8 CBC95F5E 1F0000E9 0000B800 017D47C7 26FC5EC4 á^•&ÚG)..|..Õ...^_èùà...WV.|z..Ä 0000E0
00079A9A 5016FE00 868D0676 FF0876FF 0000078A 9A5016FC 468D0676 FF0876FF .v..v..F•.P......v..v.....±.P. 000100
3DFDFE86 890CC483 07EF1058 9A0E76FF 1076FFFC 76FFFE76 FF5016FE 04868000 ....±.P.v±.v•.v..v..X.ÿ..á...±»= 000120
76FF0C76 FF0068E9 0375FE06 860BFE04 86880078 E9FDFE86 880007E9 03750000 ..u.Õ....±»Õ(....±...±u.Õh..v..v 000140
037500FD FEBE83FD FE868900 0005DA9A 5016FE08 868D01F4 680E76FF 1076FF0A ..v..v.h¶....±.P.Õ.....±».ƒ±».u. 000160
02D59A00 6AFE04B6 FFFE0686 FF5F5768 5016FE08 8680003F E9FDFE86 880007E9 Õ....±»Õ?....±.PhW_.Ř.±.Ř.±j..{. 000180
47C726FC 5EC4000F E9FDFE86 880007E9 037500FD FEBE83FD FE86890C C4830000 ...á...±».ƒ±».u.Õ.ˉ..±»Õ..á^•&ÚG 0001A0
0676FF08 76FFD88E 085CB81E 56570000 12C8CBC9 5F5E1F00 00E90000 B800017D )..|..Õ...^_èùà...WV.|\..Ä.v..v. 0001C0
0E4688FC 5EC40000 087D9A50 16F0468D 0676FF08 76FF0000 086C9A50 16FC468D .F•.P.(....v..v..FÞ.P.)...á^•.F. 0001E0
```

Dump of file SATURN:[PCCOMMON.DUMP.DLL]SA-DIFM.DLL;1 on 18-APR-1990 10:50:26.92
File ID (450,15,0)   End of file block 323 / Allocated 324

Virtual block number 39 (00000027), 512 (0200) bytes

0A76FF0C 76FF008C E9000088 0006E903 75025739 260009E9 03740739 26105688 .V.&9.t.Õ..&9W.u.Õ..|..Õ...v..v. 000000
1476FFFC 76FFFE76 FF5016F4 468D0000 03CA9A50 16F8468D 056A1276 FF1476FF .v..v.j..F½.P.ò....F¶.P.v±.v=.v. 000020
08F4468B 004AE9EE 46880006 E9037500 0030EE46 890CC483 08961058 9A1276FF .v..X....é..FŸ=..u.Õ...FŸÕJ..F¶. 000040
289A006A 776A5016 F4468D12 76FF1476 FFFC76FF FE76FF00 6A0039E9 0374F646 F-t.Õ9.j..v±.v=.v..v..F¶.Pjwj..( 000060
00017D47 C726FC5E C4000FE9 EE468800 06E90375 000030EE 468912C4 83000008 ....é..FŸ=..u.Õ...FŸÕ..é^=&úG).. 000080
F8468D06 76FF0876 FFD88E09 36881E56 57000016 C8C8C95F 5E1F0000 E9000088 |..Õ...^_èùà...WV.|6..Ä.v..v..F½ 0000A0
1076FF0A 76FF0C76 FF000009 569A5016 F0468D06 76FF0876 FF000009 469A5016 .P.F....v..v..FÞ.P.V....v..v..v. 0000C0
008DE9EA 46880006 E9037500 0030EA46 89000003 819A5016 EC468D04 6A0E76FF .v.j..F§.P......Fõ=..u.Õ...FõÕ.. 0000E0
75000030 EA46890C C48309A6 10589AEC 76FFEE76 FFF876FF FA76FF50 16F4468D .F¶.P.v°.v½.vŸ.v§.X.Ì..é..Fõ=..u 000100
F876FFFA 76FF5016 FC468D00 52E90375 F6460BF4 46880063 E9EA468B 0006E903 .Õ...FõÕc..F¶.F-u.ÕR..F=.P.v°.v½ 000120
F676FF5D C468FC76 FFFE76FF 10C483FF FF09879A 0A76FF0C 76FFEC76 FFEE76FF .vŸ.v§.v..v..ñ....é..v±.v=hé].v- 000140
5EC4000F E9EA468B 0006E903 75000030 EA46890C C4830000 08FE9A00 6AF476FF .v¶j..±....é..Fõ=..u.Õ...FõÕ..é^ 000160
76FFD88E 0A13881E 56570000 5AC8CBC9 5F5E1F00 00E90000 B800017D 47C726F8 ½&úG)..|..Õ...^_èùàZ..WV.|...Ä.v 000180
468D0000 0A339A50 16F4468D 0676FF08 76FF0000 0A239A50 16FC468D 0676FF08 ..v..F=.P.#....v..v..F¶.P.3....F 0001A0
E9037500 003DF246 890CC483 0A741058 9A0E76FF 1076FFFC 76FFFE76 FF5016F8 ½.P.v±.v=.v..v..X.t..é..F·=..u.Õ 0001C0
76FF0477 FF260677 FF26FC5E C40052E9 0375FA46 08F84688 0063E9F2 46880006 ...F·Õc..F½.F°u.ÕR.é^=&.w.&.w..v 0001E0

Dump of file SATURN:[PCCOMMON.DUMP.DLL]SA-DIFM.DLL;1 on 18-APR-1990 10:50:26.92
File ID (450,15,0)   End of file block 323 / Allocated 324

Virtual block number 40 (00000028), 512 (0200) bytes

76FFFA76 FF5DC268 5016A646 80F24689 000007D7 9A5016A6 468D016A 0E76FF10 ..v.j..FÌ.P.=....F·.FÌ.P½ô].v°.v 000000
26FC5EC4 000FE9F2 46880006 E9037500 003DF246 890CC483 00000AC6 9A006AF8 ½j..ó....é..F·=..u.Õ...F `..é^=& 000020
FF0876FF D88E0AFA B81E5657 00002EC8 CBC95F5E 1F0000E9 0000B800 017D47C7 úG)..|..Õ...^_èùà...WV.|°. ½.v.. 000040
16F8468D 00000B1A 9A5016F4 468D0676 FF0876FF 0000080A 9A5016FC 468D0676 v..F=.P......v..v..F¶.P......F½. 000060
0006E903 75000030 D246890C C4830832 10589A0E 76FF1076 FFFC76FF FE76FF50 P.v±.v=.v..v..X.2..é..Fø=..u.Õ.. 000080
8D036A0E 76FF1076 FF0A76FF 0C76FF00 ACE90375 FA4608F8 468B008D E9024688 .FøÕ§..F½.F°u.Õ¯..v..v..v..v.j.. 0000A0
88001CE9 0374DE46 08DC4688 0027E903 74D6460B D4468800 00086C9A 5016D446 Få.P.l....Få.Føt.Õ'..FÉ.FBt.Õ... 0000C0
56880446 880068E9 00008800 06E90374 DA460BD8 46880011 E90374E2 460BE046 FÁ.Fât.Õ...FÄ.FÖt.Õ..|..Õh..Få.V 0000E0
88EA5689 E84689DA 56880846 88EE5689 EC46890E 5688DC46 88E65689 E4468906 ø.FÕ.VÌ.FÉ.VB.F§.VŸ.FÄ.VÖ.FÕ.VÕ. 000100
00000884 9A006AF8 76FFFA76 FF5DC468 5016E446 8DF25689 F04689E2 5688E046 FÁ.Vã.FÞ.V·.FÕ.Phé].v°.v½j...... 000120
0000B800 017D47C7 26FC5EC4 000FE9D2 46880006 E9037500 003DD246 890CC483 .é..Fø=..u.Õ...FøÕ..é^=&úG)..|.. 000140
9A5016FC 468D0676 FF0876FF D88E0B88 B81E5657 000010C8 CBC95F5E 1F0000E9 Õ...^_èùà...WV.||..Ä.v..v..F=.P. 000160
FFFC76FF FE76FF50 16F8468D 000008D8 9A5016F4 468D0676 FF0876FF 000008C8 à....v..v..F¶.P.Ä....F½.P.v±.v=. 000180
46880070 E9F0468B 0006E903 75000030 F046890C C4830BF0 10589A0E 76FF1076 v..v..X.Þ..é..FÞ=..u.Õ...FÞÕp..F 0001A0
000C259A 5016F246 8D026A0E 76FF1076 FF0A76FF 0C76FF00 5FE90375 FA4608F8 ½.F°u.Õ_..v..v..v..v.j..F·.P.X.. 0001C0
76FF5DC7 6850D8F7 C01B01F2 7E83003C E9F0468B 0006E903 7500003D F0468900 ..FÞ=..u.Õ...FÞÕ<..~·..å½ÄPhú].v 0001E0

Dump of file SATURN:[PCCOMMON.DUMP.DLL]SA-DIFM.DLL;1 on 18-APR-1990 10:50:26.92
File ID (450,15,0)   End of file block 323 / Allocated 324

Virtual block number 41 (00000029), 512 (0200) bytes

C4000FE9 F0468800 06E90375 00003DF0 46890AC4 8300000C 9C9A006A F876FFFA °.v½j.......é..FÞ=..u.Õ...FÞÕ..é 000000
FFD88E0C D0B81E56 5700000E C8CBC95F 5E1F0000 E9000088 00017D47 C726FC5E ^=&úG)..|..Õ...^_èùà...WV.|Ä..Ä. 000020
8D00000C F09A5016 F4468D06 76FF0876 FF00000C E09A5016 FC468D06 76FF0876 v..v..F=.P.Å....v..v..F¶.P.Þ.... 000040
03750000 3DF24689 0CC4830D 0810589A 0E76FF10 76FFFC76 FFFE76FF 5016F846 F½.P.v±.v=.v..v..X....é..F·=..u. 000060
0000B800 017D47C7 26FC5EC4 0009E903 75FA460B F8468800 1AE9F246 880006E9 Õ...F·Õ...F½.F°u.Õ..é^=&úG)..|.. 000080
9A5016FC 468D0676 FF0876FF D88E0D98 B81E5657 00005AC8 CBC95F5E 1F0000E9 Õ...^_èùàZ..WV.|...Ä.v..v..F=.P. 0000A0
FFFC76FF FE76FF50 16F8468D 000000BB 9A5016F4 468D0676 FF0876FF 000000AB ¨....v..v..F¶.P.£....F½.P.v±.v=. 0000C0
46880063 E9F2468B 0006E903 75000030 F246890C C4830D03 10589A0E 76FF1076 v..v..X.Æ..é..F·=..u.Õ...F·Õc..F 0000E0
16A6468D 016A0E76 FF1076FF 0477FF26 0677FF26 FC5EC400 52E90375 FA4608F8 ½.F°u.ÕR.é^=&.w.&.w..v..v.j..FÌ. 000100
C4830000 0D679A00 6AF876FF FA76FF5D C2685016 A6468DF2 46890000 00309A50 P.=....F·.FÌ.Phô].v°.v½j..g....é 000120
00E90000 B800017D 47C726FC 5EC4000F E9F2468B 0006E903 75000030 F246890C ..F·=..u.Õ...F·Õ..é^=&úG)..|..Õ. 000140
0E209A50 16FC468D 0676FF08 76FFD88E 0E10881E 56570000 2EC8CBC9 5F5E1F00 ..^_èùà...WV.|...Ä.v..v..F=.P. . 000160
1076FFFC 76FFFE76 FF5016F8 468D0000 0E309A50 16F4468D 0676FF08 76FF0000 ...v..v..F¶.P.0....F½.P.v±.v=.v. 000180
08F8468B 0088E9D2 46880006 E9037500 003DD246 890CC483 0E481058 9A0E76FF .v..X.H..é..Fø=..u.Õ...FøÕ...F½. 0001A0
8800000E 829A5016 D4468D03 6A0E76FF 1076FF0A 76FF0C76 FF007AE9 0375FA46 F°u.Õz..v..v..v..v.j..Få.P...... 0001C0
E84689DA 56880846 88EE5689 EC46890E 5688DC46 88E65689 E4468906 56880446 Få.V=.FÕ.VÌ.FÉ.VB.F§.VŸ.FÄ.VÖ.FÕ 0001E0

```
Dump of file SATURN:[PCCOMMON.DUMP.DLL]SA-DIFM.DLL;1 on 18-APR-1990 10:50:26.92
File ID (450,15,0)   End of file block 323 / Allocated 324

Virtual block number 42 (0000002A), 512 (0200) bytes

 9A006AF8 76FFFA76 FF5DC468 5016E446 8DF25689 F04689E2 5688E046 88EA5689 .Võ.FÅ.Vã.Fþ.V·.Fõ.Phé].v³.v½j.. 000000
 017D47C7 26FC5EC4 000FE9D2 46880006 E9037500 003DD246 890CC483 00000E9A .....é..F@=..u.Õ...F@Õ..é^=&úG}. 000020
 46800676 FF0876FF D88E0ECE 881E5657 00005AC8 CBC95F5E 1F0000E9 00008800 .¡..Õ...^_èùàZ..WV.¡ö..Ä.v..v..F 000040
 FE76FF50 16F8468D 00000EEE 9A5016F4 46800676 FF0876FF 00000EDE 9A5016FC =.P.ß....v̄..v..F¶.P.Ÿ....F½.P.v± 000060
 E9F24688 0006E903 7500003D F246890C C4830F06 10589A0E 76FF1076 FFFC76FF .v=.v..v..X....é..F·=..u.Õ...F·Õ 000080
 016A0E76 FF1076FF 0477FF26 0677FF26 FC5EC400 52E90375 FA4608F8 46880063 c..F½.F³u.ÕR.é^=&.w.&.w..v..v.j. 0000A0
 0F809A00 6AF876FF FA76FF5D C2685016 A64680F2 46890000 0F389A50 16A6468D .FÌ.P.;....F·.FÌ.Phõ].v³.v½j.... 0000C0
 B800017D 47C726FC 5EC4000F E9F24688 0006E903 7500003D F246890C C4830000 ...é..F·=..u.Õ...F·Õ..é^=&úG)..¡ 0000E0
 16FC468D 0676FF08 76FFD88E 0FB4881E 56570000 2EC8CBC9 5F5E1F00 00E90000 ..Õ...^_èùà...WV.¡Ç..Ä.v..v..F=. 000100
 76FFFE76 FF5016F8 46800000 0FD49A50 16F4468D 0676FF08 76FF0000 0FC49A50 P.é....v̄..v..F¶.P.å....F½.P.v±.v 000120
 0088E9D2 46880006 E9037500 003DD246 890CC483 0FEC1058 9A0E76FF 1076FFFC =.v..v..X.å..é..F@=..u.Õ...F@Õ.. 000140
 269A5016 D4468D03 6A0E76FF 1076FF0A 76FF0C76 FF007AE9 0375FA46 08F84688 .F½.F³u.Õz..v..v..v..v.j..Få.P.& 000160
 5688D846 88EE5689 EC4689DE 56880C46 88E65689 E44689D6 56880446 88000010 ....Få.V@.Fõ.VÌ.FÉ.Vß.Få.VŸ.FÄ.V 000180
 76FFFA76 FF5DC468 5016E446 8DF25689 F04689E2 5688E046 88EA5689 E84689DA Õ.FÒ.Võ,FÅ.Vã.Fþ.V·.Fõ.Phé].v³.v 0001A0
 26FC5EC4 000FE9D2 46880006 E9037500 003DD246 890CC483 0000103E 9A006AF8 ½j..>....é..F@=..u.Õ...F@Õ..é^=& 0001C0
 FF0876FF D88E1072 881E5657 00005AC8 CBC95F5E 1F0000E9 00008800 017D47C7 úG)..¡..Õ...^_èùàZ..WV.¡r..Ä.v.. 0001E0

Dump of file SATURN:[PCCOMMON.DUMP.DLL]SA-DIFM.DLL;1 on 18-APR-1990 10:50:26.92
File ID (450,15,0)   End of file block 323 / Allocated 324

Virtual block number 43 (0000002B), 512 (0200) bytes

 16F8468D 00001092 9A5016F4 46800676 FF0876FF 00001082 9A5016FC 46800676 v..F=.P......v..v..F¶.P......F½. 000000
 0006E903 7500003D F246890C C48310AA 10589A0E 76FF1076 FFFC76FF FE76FF50 P.v±.v=.v..v..X.`..é..F·=..u.Õ.. 000020
 FF1076FF 0477FF26 0677FF26 FC5EC400 52E90375 FA4608F8 46880063 E9F24688 .F·Õc..F½.F³u.ÕR.é^=&.w.&.w..v.. 000040
 6AF876FF FA76FF5D C2685016 A64680F2 46890000 100F9A50 16A6468D 016A0E76 v.j..FÌ.P.Õ....F·.FÌ.Phõ].v³.v½j 000060
 47C726FC 5EC4000F E9F24688 0006E903 7500003D F246890C C4830000 11249A00 ..$....é..F·=..u.Õ...F·Õ..é^=&úG 000080
 0676FF08 76FFD88E 1158881E 56570000 0EC8CBC9 5F5E1F00 00E90000 8800017D }..¡..Õ...^_èùà...WV.¡X..Ä.v..v. 0000A0
 FF5016F8 46800000 11789A50 16F4468D 0676FF08 76FF0000 11689A50 16FC468D .F=.P.h....v̄..v..F¶.P.x....F½.P. 0000C0
 2AE9F246 880006E9 03750000 300CC483 11901058 9A0E76FF 1076FFFC 76FFFE76 v±.v=.v..v..X....é.=..u.Õ...F·Õ* 0000E0
 26FC5EC4 06C48300 00FFFF9A 006AF876 FFFA76FF 0019E903 75FA4608 F8468800 ..F½.F³u.Õ...v³.v½j.......é.é^=& 000100
 FF0876FF D88E1216 881E5657 00000EC8 CBC95F5E 1F0000E9 00008800 017D47C7 úG)..¡..Õ...^_èùà...WV.¡...Ä.v.. 000120
 57392600 09E90374 07392610 5688OE46 88FC5EC4 00001226 9A5016FC 46800676 v..F=.P.&...é"=.F..V.&9.t.Õ..&9W 000140
 16F8468D 00001236 9A5016F4 46800676 FF0876FF 0061E900 00880006 E9037502 .u.Õ..¡..Õa..v..v..F¶.P.6....F½. 000160
 F2468800 06E90375 0000300C C483124E 10589A12 76FF1476 FFFC76FF FE76FF50 P.v±.v=.v..v..X.N..é.=..u.Õ...F· 000180
 5EC406C4 83000012 759A006A F876FFFA 76FF0019 E90375FA 4608F846 88002AE9 Õ*..F½.F³u.Õ...v³.v½j..u....é.é^ 0001A0
 76FFD88E 1298881E 56570000 0EC8CBC9 5F5E1F00 00E90000 8800017D 47C726FC =&úG)..¡..Õ...^_èùà...WV.¡...Ä.v 0001C0
 46800000 12D89A50 16F4468D 0676FF08 76FF0000 12A89A50 16FC468D 0676FF08 ..v..F=.P.´....v̄..v..F¶.P.Ä....F 0001E0

Dump of file SATURN:[PCCOMMON.DUMP.DLL]SA-DIFM.DLL;1 on 18-APR-1990 10:50:26.92
File ID (450,15,0)   End of file block 323 / Allocated 324

Virtual block number 44 (0000002C), 512 (0200) bytes

 880006E9 03750000 300CC483 12F01058 9A0E76FF 1076FFFC 76FFFE76 FF5016F8 ½.P.v±.v=.v..v..X.þ..é.=..u.Õ... 000000
 06C48300 0013179A 006AF876 FFFA76FF 0019E903 75FA4608 F8468800 2AE9F246 F·Õ*..F½.F³u.Õ...v³.v½j.......é. 000020
 D88E133A 881E5657 000012C8 CBC95F5E 1F0000E9 00008800 017D47C7 26FC5EC4 é^=&úG)..¡..Õ...^_èùà...WV.¡:..Ä 000040
 0000135A 9A5016F4 46800676 FF0876FF 0000134A 9A5016FC 46800676 FF0876FF .v..v..F=.P.J....v̄..v..F¶.P.Z... 000060
 06E90375 0000300C C4831372 10589A0E 76FF1076 FFFC76FF FE76FF50 16F8468D .F½.P.v±.v=.v..v..X.r..é.=..u.Õ. 000080
 8900000A 4B9A5016 F0468D04 6A0E76FF 1076FF0A 76FF0C76 FF0078E9 EE468800 ..FŸÕx..v..v..v..v.j..Fþ.P.K.... 0000A0
 3EE90000 880006E9 0375F246 08F04688 004FE9EE 46880006 E9037500 003DEE46 FŸ=..u.Õ...FŸÕO..Fþ.F·u.Õ..¡..Õ> 0000C0
 8908C483 000011E2 9A006AF8 76FFFA76 FF60E668 002DE903 75FA4608 F8468800 ..F½.F³u.Õ-.h|`.v³.v½j..ã....é.. 0000E0
 1F0000E9 00008800 017D47C7 26FC5EC4 000FE9EE 46880006 E9037500 003DEE46 FŸ=..u.Õ...FŸÕ..é^=&úG)..¡..Õ... 000100
 02030893 00101458 02030000 000413F4 00020065 0014130C 02030011 CBC95F5E ^_èù....É...e...¶........X....... 000120
 000208B3 0010090F 02030010 00040148 01030088 00040047 010300E3 0008141B .¯..D...G.......H.......Õ...°... 000140
 000208C4 00101399 02030000 00100105 00020076 00080022 02030000 000D0AAF £.......".. v................é... 000160
 020300AF 0008098E 02030128 00080801 0203020C 000A01F1 02030000 0012138C ¥.......þ.......ı...(.......£... 000180
 260A5EC4 D88EFFFF 881E5657 00001EC8 00000080 000811CA 02030053 001413CC å...S...Õ...§...à...WV.¡...Äé^.& 0001A0
 5016E246 8D046A06 76FF0876 FFF876FF FA76FFFA 5689F846 89065788 26044788 .G.&.W..F½.V³.v³.v½.v..v.j..Fã.P 0001C0
 5AE90375 E44608E2 468801CE E9EA4688 0006E903 7500003D EA468900 00FFFF9A ......Fõ=..u.Õ...FõÕö..Fã.FÕu.ÕZ 0001E0
```

```
Dump of file SATURN:[PCCOMMON.DUMP.DLL]SA-DIFM.DLL;1 on 18-APR-1990 10:50:26.92
File ID (450,15,0)   End of file block 323 / Allocated 324

Virtual block number 45 (0000002D), 512 (0200) bytes

 000030EA 46890CC4 83009510 589AE276 FFE476FF 0A76FF0C 76FF5016 FC468D00 ..F=.P.v..v..vŏ.vă.X....á..Fõ=.. 000000
 FFE476FF 0A76FF0C 76FF0025 E90374FE 4608FC46 880199E9 EA468800 06E90375 u.Ŏ...FõŎ...F=.Fzt.Ŏ%..v..v..vŏ. 000020
 5016EC46 8D0169E9 EA468800 06E90375 000030EA 468908C4 8300BF00 009AE276 vă...€..á..Fõ=..u.Ŏ...FõŎl..F$.P 000040
 880006E9 03750000 30EA4689 0CC48301 7910589A 0676FF08 76FF0A76 FF0C76FF .v..v..v..v..X.y..á..Fõ=..u.Ŏ... 000060
 46800676 FF0876FF 0A76FF0C 76FF006A 0030E903 74EE4608 EC468801 3FE9EA46 FõŎ?..F$.FŸt.Ŏ0.j..v..v..v..v..F 000080
 0104E9EA 46880006 E9037500 0030EA46 8912C483 0000FFFF 9A006A7A 6A5016EC $.Pjzj.......á..Fõ=..u.Ŏ...FõŎ.. 0000A0
 5016E646 80056A06 76FF0876 FFF876FF FA76FF00 F1E90375 00787F83 260A5EC4 á^.&..(.u.Ŏp..v'.v½.v..v.j..Fl.P 0000C0
 89F44689 E8568BE6 468800CE E9EA4688 0006E903 7500003D EA468900 00FFFF9A ......Fõ=..u.Ŏ...FõŎö..Fl.VŎ.F¶. 0000E0
 26F45EC4 0A76FF0C 76FF5016 F0468D00 88E90375 02470826 078826F4 5EC4F656 V-á^¶&..&.G.u.Ŏ...FÞ.P.v..v.á^¶& 000100
 08F0468B 0088E9EA 46880006 E9037500 00300CC4 83FFFF10 589A37FF 260277FF .w.&.7.X....á.=..u.Ŏ...FõŎ...FÞ. 000120
 000030EA 468908C4 83000001 CD9A006A F076FFF2 76FF60E6 68004EE9 0375F246 F·u.ŎN.hl'.v·.vÞj..ë....á..Fõ=.. 000140
 00FFFF9A 006AF076 FFF276FF 60E768EC 76FFEE76 FF0059E9 EA468800 06E90375 u.Ŏ...FõŎY..vŸ.všhŎ'.v·.vÞj..... 000160
 FFFA76FF FF66E904 F4468300 2FE9EA46 880006E9 03750000 30EA4689 0CC48300 ..á..Fõ=..u.Ŏ...FõŎ/..F¶.Ŏf..v'. 000180
 00B80006 E9EA4688 0006E903 7500003D EA468900 00FFFF9A E676FFE8 76FFF876 v½.vŎ.vl......Fõ=..u.Ŏ...FõŎ..|. 0001A0
 CE468900 00B80000 8446C7D8 8E000888 1E565700 0282C8CB C95F5E1F 0000E900 .Ŏ...^_èùà...WV.|...ÄÚF...|...Fö 0001C0
 00B8B246 89B44689 00008880 46898246 89000088 E44689E6 46890000 88CC4689 .Fä|...¯Fl.FŎ|...F..F.|...FÇ.Fý|. 0001E0

Dump of file SATURN:[PCCOMMON.DUMP.DLL]SA-DIFM.DLL;1 on 18-APR-1990 10:50:26.92
File ID (450,15,0)   End of file block 323 / Allocated 324

Virtual block number 46 (0000002E), 512 (0200) bytes

 46890000 88FD7E86 89FD8086 890000B8 F84689FA 46890000 88E84689 EA468900 ..Fŏ.FŎ|...F'.F½|.....»..-»|...F 000000
 8B26065E C401F5F6 46C7EC46 89EE4689 00008800 46890246 89000088 86468988 ..F.|...F@.FÅ|...FŸ.FšÚF-%.á^.&. 000020
 65578826 63478826 065EC4E2 5689E046 89025788 26078826 065EC4CA 46896747 Gg.Fòá^.&..&.W..FÅ.Vãá^.&.Gc&.We 000040
 260085B7 8B26065E C4885689 86468906 57882604 47882606 5EC4A056 899E4689 .F..V.á^.&.G.&.W..FŘ.V|á^.&....& 000060
 DC76FFDE 76FF06C4 83FFFF03 039A9E76 FFA076FF 006ADE56 89DC4689 00879788 .....FÉ.V8j..v..v.......á..v8.vÉ 000080
 F4468D00 67E90374 00003000 00FFFF9A 50160446 8D0C76FF DE76FF00 00FFFF9A ......v8.vÉ.FÅ.P.....=..t.Ŏg..F¶ 0000A0
 5016FC46 8D0036E9 037478F4 7E830AC4 830000FF FF9A006A D476FFD6 76FF5016 .P.v@.våj.......á..~¶xt.Ŏ6..F=.P 0000C0
 76FF0010 E90374FE 4608FC46 880CC483 000001A3 9A006A04 76FFD676 FF5F5268 hR_.v@.våj..È....á..F=.Fzt.Ŏ...v 0000E0
 C4830000 FFFF9A00 6AD476FF D676FF00 10E906C4 83000003 6A9A006A D476FFD6 ø.V̄åj..j....á.Ŏ...v@.våj.......á 000100
 50160A46 8D50168A 46800676 FF0876FF FFFF6804 1C689E76 FFA076FF FF81E906 .Ŏ...v..v.h..h...v..v..F..P.FŎ.P 000120
 009A0676 FF0876FF 1C6A0470 E984468B 0006E903 7500003D 84468900 00FFFF9A ......F.=..u.Ŏ...F.Ŏp.j..v..v... 000140
 76FFB676 FFB876FF 044EE984 46880006 E9037500 847E8384 468906C4 83FFFF00 ....á..F..~..u.Ŏ...F.ŎN..v|.vŘ.v 000160
 4688037B E90003E9 03750000 30844689 0000044A 9A5016CC 4680036A E076FFE2 å.vÅj..Fä.P.J....F.=..u.Ŏ..Ŏ(..F 000180
 C40676FF 0876FF00 2DE90375 02470826 078826E4 5EC4E656 89E44689 CE5688CC å.Vö.Fŏ.Vlá^ŏ&..&.G.u.Ŏ-..v..v.á 0001A0
 83033AE9 0003E903 75000030 84468908 C4830065 00009A37 FF260277 FF26E45E ^ŏ&.w.&.7...e..á..F.=..u.Ŏ..Ŏ:.. 0001C0
 46890000 04C49A50 16E84680 046AE076 FFE276FF B676FFB8 76FFFFC4 E904E446 Fŏ.Ŏ6..v|.vŘ.vă.vÅj..FŎ.P.á....F 0001E0

Dump of file SATURN:[PCCOMMON.DUMP.DLL]SA-DIFM.DLL;1 on 18-APR-1990 10:50:26.92
File ID (450,15,0)   End of file block 323 / Allocated 324

Virtual block number 47 (0000002F), 512 (0200) bytes

 08260788 26F85EC4 FA5689F8 4689EA56 88E84688 0300E900 03E90375 00003084 .=..u.Ŏ..Ŏ...FŎ.Vŏ.F½.V'á^½&..&. 000000
 7B6A5016 F0468D37 FF260277 FF26F85E C40676FF 0876FF00 6A0038E9 03750247 G.u.Ŏ8.j..v..v.á^½&.w.&.7.FÞ.Pj( 000020
 FFFFB9E9 04F84683 02C1E900 03E90375 00003084 468912C4 83000005 109A006A j.......á..F.=..u.Ŏ..Ŏè..F½.Ŏ¿.. 000040
 03750000 30844689 00000540 9A5016FD 7E868006 6AE076FF E276FFB6 76FFB876 v|.vŘ.vă.vÅj...-».P.ə....F.=..u. 000060
 03750247 08260788 26865EC4 88568986 4689FD80 9688FD7E 86880293 E90003E9 Ŏ..Ŏ....-»...».F..V.á^.&..&.G.u. 000080
 9A006A7C 6A5016FF 7C868037 FF260277 FF26865E C40676FF 0876FF00 6A0039E9 Ŏ9.j..v..v.á^.&.w.&.7..|..Pj||.. 0000A0
 FF8876FF FFB8E904 86468302 44E90003 E9037500 00308446 8912C483 00000588 .....á..F.=..u.Ŏ..Ŏ0..F..Ŏ|..v|. 0000C0
 E90003E9 03750000 30844689 00000588 9A501600 4680056A E076FFE2 76FFB676 vŘ.vă.vÅj..FÅ.P.|....F.=..u.Ŏ..Ŏ 0000E0
 0876FF00 37E90375 02470826 078826EC 5EC4EE56 89EC4689 025688D0 46880217 ...FÅ.V@.F$.VŸá^$&..&.G.u.Ŏ7..v. 000100
 8910C483 000000F8 9A006A77 6A5016FD 82868037 FF260277 FF26EC5E C40676FF .v.á^$&.w.&.7...».Pjwj..½....á.. 000120
 E076FFE2 76FFB676 FFB876FF FFBAE904 EC468301 CCE90003 E9037500 00308446 F.=..u.Ŏ..Ŏä..F$.Ŏα..v|.vŘ.vă.vÅ 000140
 82568880 4688019F E90003E9 03750000 30844689 00000131 9A501680 468D1A6A j..F..P.1....F.=..u.Ŏ..Ŏ...F..V. 000160
 FF26825E C48676FF 8876FF01 1AE90375 02470826 07882682 5EC48456 89B24689 .Fŷ.VÇá^ŷ&..&.G.u.Ŏ...v|.vŘá^ŷ&. 000180
 E90003E9 03750084 7E838446 890000FF FF9A5016 FD86868D F676FF37 FF260277 w.&.7.v-...».P......F..-..u.Ŏ..Ŏ 0001A0
 619A006A 37FF2602 77FF2682 5EC42712 68B676FF B876FF04 6A5016A2 46800157 W..FÅ.Pj..v|.vŘh.'á^ŷ&.w.&.7j..@ 0001C0
 76FFB876 FF056A50 16D84680 0125E900 03E90375 00003084 468912C4 83000006 ....á..F.=..u.Ŏ..Ŏ%..FÄ.Pj..v|.v 0001E0
```

Dump of file SATURN:[PCCOMMON.DUMP.DLL]SA-DIFM.DLL;1 on 18-APR-1990 10:50:26.92
File ID (450,15,0)   End of file block 323 / Allocated 324

Virtual block number 48 (00000030), 512 (0200) bytes

```
03750000 3D844689 12C48300 00033C9A 006A37FF 260277FF 26825EC4 27126886 Ñh.'ó^ÿ&.w.&.7j..<....á..F.=..u. 000000
468BC456 89C24689 AC568BAA 468BBC56 89BA4689 A4568BA2 468B00F3 E90003E9 Õ..Õ¤..FÅ.VÈ.Fo.V¥.F¨.V¯.Fó.Vó.F 000020
4B6A006A 006A006A 006AC856 89C64689 B0568BAE 468BC056 89BE4689 A85688A6 Ì.V´.Fƒ.Vå.FÜ.V¯.Fó.Vàj.j.j.j.jK 000040
0277FF26 825EC450 16FD8686 8D1E6A00 6A006A00 6A50168A 468D50E4 2AD8468A .FÄ*ôP.Fo.Pj.j.j.j....».Pé^ÿ&.w. 000060
00003084 46892CC4 83000004 939A006A 786A5016 9A468D06 76FF0876 FF37FF26 &.7.v..v..F..Pjxj.......é,.F.=.. 000080
C19A9E76 FFA076FF 00007547 C726065E C4FED7E9 04B24683 0071E900 03E90375 u.Õ..Õq..Fý.Õ¤±á^.&úGu...v..v..è 0000A0
9A5016DA 468D5016 8A468D06 76FF0876 FF037E68 03786B9E 76FFA076 FF02E505 .Ì..v..v.h(.h~..v..v..F..P.FÕ.P. 0000C0
04C48303 B100649A 0676FF08 76FF0027 E90003E9 03750000 30844689 00000391 .....F.=..u.Õ..Õ'..v..v..d.Ý..é. 0000E0
E9037500 847E8300 00FFFF9A 50168A46 8D9E76FF A076FF00 10E90375 000A7E83 .~Õ.u.Õ...v..v..F..P......~..u.Õ 000100
76FFB876 FF0011E9 0375CE46 08CC468B 04C48307 4B00649A 0676FF08 76FF000E ...v..v..d.K..é..Fë.Föu.Õ...v¦.v 000120
EA76FFB6 76FFB876 FF0011E9 0375EA46 08E8468B 00000784 9ACC76FF CE76FFB6 Ñ.vö.vë.Ç....FÒ.Fõu.Õ...v¦.vÑ.võ 000140
FFFD80B6 FFB676FF B876FF00 13E90375 FD80860B FD7E868B 000007D4 9AE876FF .vÒ.å.....~»...»u.Õ...v¦.vÑ.Ñ.». 000160
9AD076FF D276FFB6 76FFB876 FF0011E9 0375D246 0BD0468B 000007F0 9AFD7EB6 Ñ~».Þ....FÅ.F@u.Õ...v¦.vÑ.v@.vÅ. 000180
000001F9 9A8076FF 8276FFB6 76FFB876 FF0011E9 03758246 0B80468B 0000080C .....F..F.u.Õ...v¦.vÑ.v..v..'... 0001A0
0085050C 56880A46 88D88E02 21B81E56 57000002 C8CBC95F 5E1F0000 E984468B .F.Õ...^_èùà...WV.¡|..Ä.F..V.... 0001C0
57000008 C8CBC95F 5E1F0000 E9FE468B FE468900 00FFFF9A 0676FF08 76FF5052 RP.v..v.......F±.F±Õ...^_èùà...W 0001E0
```

Dump of file SATURN:[PCCOMMON.DUMP.DLL]SA-DIFM.DLL;1 on 18-APR-1990 10:50:26.92
File ID (450,15,0)   End of file block 323 / Allocated 324

Virtual block number 49 (00000031), 512 (0200) bytes

```
85050C56 880A468B FA5689F8 46896B57 88266947 88260A5E C4D88E08 23B81E56 V.¡#..Ä6^.&.Gi&.Wk.F%.V°.F..V... 000000
0876FF0A 76FF0C76 FF000008 869A5016 FC468D01 6A006A06 76FF0876 FF505200 .RP.v..v.j.j..F=.P.Ñ....v..v..v. 000020
016A006A 0676FF08 76FF5052 001605FA 5688F846 8808C483 071A0A77 9A0676FF .v..w....é..F½.V°...RP.v..v.j.j. 000040
8E0853B8 1E565700 0014C8CB C95F5E1F 0000E900 00B80000 FFFF9A50 16FC468D .F=.P.....¡..Õ...^_èùà...WV.¡S.. 000060
EE468906 57882604 47882 6F8 5EC4FA56 89F84689 68578826 69478826 0A5EC4D8 Ä6^.&.Gi&.Wk.F½.V°Ã^½&.G.&.W..FŸ 000080
54E9037D 000A7F83 26F85EC4 F65689F4 46896557 88266347 88260A5E C4F05689 .VÞé^.&.Gc&.We.F¶.V-é^½&....).ÕT 0000A0
0000FFFF 9A5016FC 468DF476 FFF676FF 0045E903 7701087F 8326000A E9037E00 .-.Õ..&....w.ÕE..v~.v¶.F=.P..... 0000C0
036A6D77 FF266F77 FF260A5E C4F476FF F676FF00 0009619A 026AF476 FFF676FF .v~.v¶j..a....v~.v¶é^.&.wo&.wmj. 0000E0
76FF0876 FFEE76FF F076FF00 00FFFF9A FC76FFF4 76FFF676 FF0000FF FF9A016A j.......v~.v¶.v=......vÞ.vŸ.v..v 000100
00EC7E83 00E6E9F2 46880006 E9037500 0030F246 890000FF FF9A5016 EC468D06 ..F&.P......F·=..u.Õ...F·Õ!..~&. 000120
0006E903 7500003D F2468900 0008399A 0676FF08 76FF5016 EE468D00 5DE90374 t.Õ]..FŸ.P.v..v..9....F·=..u.Õ.. 000140
003DF246 890AC483 0000031B 9A006A06 76FF0876 FF5016FE 468D008C E9F2468B .F·Õ¥..F±.P.v..v.j.......é..F·=. 000160
57832601 08478326 F85EC400 0DE90375 77FE7E83 0096E9F2 46880006 E9037500 .u.Õ...F·Õ...~±wu.Õ..é^½&.G..&.W 000180
76FF005E E9037701 087F8326 000AE903 7E006DE9 037D000A 7F8326F8 5EC4000A ..é^½&....).Õm.~.Õ..&....w.Õ^..v 0001A0
FF260A5E C400000A 689A026A F476FFF6 76FF0000 092C9A50 16FC468D F476FFF6 ~.v¶.F=.P.,....v~.v¶j..h...é^.&. 0001C0
77FF260A 5EC4F476 FFF676FF 08C48308 96114D9A EE76FFF0 76FF6077 FF266F77 wo&.wm.vÞ.vŸ.M....é..v~.v¶é^.&.w 0001E0
```

Dump of file SATURN:[PCCOMMON.DUMP.DLL]SA-DIFM.DLL;1 on 18-APR-1990 10:50:26.92
File ID (450,15,0)   End of file block 323 / Allocated 324

Virtual block number 50 (00000032), 512 (0200) bytes

```
E90000B8 00000939 9AFC76FF F476FFF6 76FF0000 09539A01 6A036A6D 77FF266F o&.wmj.j..S....v~.v¶.v=.9  .¡..Õ 000000
46896B57 88266947 88260A5E C4D88E08 CDB81E56 57000016 C8CBC95F 5E1F0000 ...^_èùà...WV.¡ë..Äé^.&.Gi  Wk.F 000020
65578826 63478826 0A5EC4EC 5689EA46 89065788 26044788 26F65EC4 F85689F6 -.V½Ã^-&.G.&.W..Fõ.V$é^.&.Gc».We 000040
E9037701 087F8326 000AE903 7E0054E9 037D000A 7F8326F6 5EC4F256 89F04689 .FÞ.V·é^-&....).ÕT.-.Õ..&....w.Õ 000060
FF00000B 139A026A F076FFF2 76FF0000 08B09A50 16F4468D F076FFF2 76FF0045 E..v·.vÞ.F¶.P.¯....v·.vÞj....... 000080
FFF076FF F276FF00 000BF09A 016A036A 6D77FF26 6F77FF26 0A5EC4F0 76FFF276 v·.vÞé^.&.wo&.wmj.j..Þ....v·.vÞ. 0000A0
00000883 9A5016FA 468D016A 006A0676 FF0876FF 5016EA46 8D00000B 8D9AF476 v¶.§....Fõ.P.v..v.j.j..F°.P..... 0000C0
16FE468D 003CE903 75FC4608 FA468800 C7E9EE46 880006E9 03750000 3DEE4689 .FŸ=..u.Õ...FŸÕú..F°.F=u.Õ<..F±. 0000E0
E9EE468B 0006E903 7500003D EE46890A C4830000 09C49A00 6A0676FF 0876FF50 P.v..v.j..é....é..FŸ=..u.Õ...FŸÕ 000100
000A7F83 26F65EC4 000A5F83 2601086F 8326F65E C4000DE9 037577FE 7E830096 ...~±wu.Õ..é^-&.o..&._..é^-&.... 000120
9A5016F4 468DF076 FFF276FF 005EE903 7701087F 8326000A E9037E00 6DE9037D ).Õm.-.Õ..&....w.Õ^..v̄·.vÞ.F¶.P. 000140
FFEC76FF 6D77FF26 6F77FF26 0A5EC400 0008FE9A 026AF076 FFF276FF 00000A1A .....v·.vÞj..±...é^.&.wo&.wm.vš. 000160
9A016A03 6A6D77FF 266F77FF 260A5EC4 F076FFF2 76FF08C4 830A3F11 409AEA76 võ.M.?..é..v·.vÞé^.&.wo&.wmj.j.. 000180
0006C8CB C95F5E1F 0000E900 00B80000 0A279AF4 76FFF076 FFF276FF 00000A5A Z....v·.vÞ.v¶.'...¡..Õ...^_èùà.. 0001A0
468D0876 FF0A76FF 00B4E906 4688FC46 89FE4689 0000B808 8E0A7F88 1E565700 .WV.¡...Ä¡...F±.F=.F.ÕÇ..v̄..v..F 0001C0
46890000 FFFF9A50 16FC468D 0876FF0A 76FF00C1 E9FA4689 0000FFFF 9A5016FC =.P......F°Õè..v..v..F=.P......F 0001E0
```

```
Dump of file SATURN:[PCCOMMON.DUMP.DLL]SA-DIFN.DLL;1 on 18-APR-1990 10:50:26.92
File ID (450,15,0)   End of file block 323 / Allocated 324

Virtual block number 51 (00000033), 512 (0200) bytes

00000CB8 9A006AFC 76FFFE76 FF5D0368 00E5E9FA 46880006 E9037500 FA7E83FA *.-*.u.Õ...F*Õ[.hÆ].v±.v•j..¡... 000000
0876FF0A 76FF0088 E9000088 00C1E9FA 46880006 E9037500 0030FA46 8908C483 .á..F*=..u.Õ...F*Õè.¡..ÕE..v..v. 000020
FF5D0368 0099E9FA 46880006 E9037500 FA7E83FA 46890000 FFFF9A50 16FC468D .F=.P......F*.-*.u.Õ...F*Õ..hÆ]. 000040
0075E9FA 46880006 E9037500 0030FA46 8908C483 0000062F 9A006AFC 76FFFE76 v±.v•j../....á..F*=..u.Õ...F*Õu. 000060
7D00033D FF52E903 7500023D FF44E903 7500013D 0023E900 26E9006F E9000088 ¡..Õo.Õ&.Õ#.=..u.ÕD.=..u.ÕR.=..) 000080
12460810 46880035 E90375FE 4608FC46 88FFD7E9 FF8EE903 7F00043D FFE2E903 .Õã.=....Õ..Õ=..F=.F±u.Õ5..F..F. 0000A0
46890CC4 8300000C 6C9A006A FC76FFFE 76FF50C3 681076FF 1276FF00 2AE90375 u.Õ*..v..v.hú].v±.v•j..[....á..F 0000C0
56570000 06C8C8C9 5F5E1F00 00E90000 B80006E9 FA468800 06E90375 00003DFA *=..u.Õ...F*Õ..¡..Õ...^_èùà...WV 0000E0
1F0000E9 FA4688FA 46890000 FFFF9A50 16FC468D 0676FF08 76FFD88E 0C15B81E .¡...Ã.v..v..F=.P......F*.F*Õ... 000100
FF0C76FF 0000F046 C7002FEE 46C7D88E 00528B1E 56570000 24C80004 CAC95F5E ^_èò..à$..WV.¡R..ÃúFŸ/.úFÞ...v.. 000120
F45EC4F6 5689F446 89685788 26694788 26FC5EC4 00000062 9A5016FC 468D0A76 v..F=.P.b...á^=&.Gi&.Wk.F¶.V-á^¶ 000140
EE76FFF0 76FF0676 FF0876FF 0A76FF0C 76FFE256 89E04689 06578826 04478826 &.G.&.W..FÁ.Vã.v..v..v..v..vÞ.vŸ 000160
76FFE876 FF022AE9 E4468800 06E90375 00003DE4 46890000 FFFF9A50 16E6468D .F|.P......Fõ=..u.Õ...FõÕ*..vÕ.v 000180
7E81001B E9037500 E47E83E4 46890000 0F649A50 160C468D 5016F846 8D016AE6 |j..F%.P.FÉ.P.d....Fõ.-õ.u.Õ...- 0001A0
75DE4608 DC468801 ECE9E446 8800000E DB9AE676 FFE876FF 0011E903 758E06E4 õ..u.Õ...vÕ.v|.Ü....FõÕ$..FÉ.FBu 0001C0
0070E9E4 46890000 0C349A50 16EA468D DC76FFDE 76FF0067 E9F84688 015EE903 .Õ^..F%Õg..v8.vÉ.Fõ.P.4....FõÕp. 0001E0

Dump of file SATURN:[PCCOMMON.DUMP.DLL]SA-DIFN.DLL;1 on 18-APR-1990 10:50:26.92
File ID (450,15,0)   End of file block 323 / Allocated 324

Virtual block number 52 (00000034), 512 (0200) bytes

16EA468D DC76FFDE 76FF005A E9E44689 00000C4A 9A5016EA 468DDC76 FFDE76FF .v8.vÉ.Fõ.P.J....FõÕZ..v8.vÉ.Fõ. 000000
E9E44689 0000FFFF 9A5016EA 468DDC76 FFDE76FF 0044E9E4 46890000 0C969A50 P......FõÕD..v8.vÉ.Fõ.P......FõÕ 000020
2E93C003 FFE6E903 7600053D 00012D00 1FE90022 E9EA4689 EC468900 00B8002E ..¡...F&.FõÕ".Õ..-..=..v.Õ!..à.. 000040
74EC460B EA468800 08E90374 00E47E83 0E7C0E92 0E660E66 0E500E3A 0E84A7FF .ÏÇ.:.P.f.f...|..-õ.t.Õ...Fõ.F§t 000060
EC76FF5D C5685016 FA468D01 30E9E446 8800000F 0F9AE676 FFE876FF 0011E903 .Õ...vÕ.v|......FõÕÕ..F*.Phé].v§ 000080
479AE676 FFE876FF 0011E903 7500003D E446890C C4830000 0F2E9A00 6AEA76FF .võj.......á..Fõ=..u.Õ...vÕ.v|.G 0000A0
00279A00 6AEA76FF EC76FF5D CA68002F E9037500 FA7E8300 FCE9E446 8800000F ....FõÕ•..-*.u.Õ/.hÒ].v§.võj..'. 0000C0
C4E9E446 8800000F 859AE676 FFE876FF 0011E903 7500003D E4468908 C4830000 ...á..Fõ=..u.Õ...vÕ.v|......FõÕá 0000E0
7500E47E 83E44689 0000FFFF 9A50160C 468D5016 F8468D00 6AE676FF E876FF00 ..vÕ.v|j..F%.P.FÉ.P......Fõ.-õ.u 000100
E90086E9 E4468800 000F999A E676FFE8 76FF0011 E903758E 06E47E81 001BE903 .Õ...-õ..u.Õ...vÕ.v|......FõÕ..Õ 000120
5EC40067 E9E4468B 0006E903 7500003D E4468900 00FFFF9A E676FFE8 76FFFE97 .±.vÕ.v|......Fõ=..u.Õ... "Õg.á^ 000140
0A76FF0C 76FF0045 E9037701 087F8326 000AE903 7E0054E9 037D000A 7F8326F4 ¶&....).ÕT.-.Õ..&....w.ÕE....v. 000160
FC5EC40A 76FF0C76 FF000010 089A016A 0A76FF0C 76FF0000 0ADE9A50 16F2468D .F·.P.8....v..v.j.......v..v.á^= 000180
B800000A EB9AF276 FF0A76FF 0C76FF00 0008059A 016A036A 6D77FF26 6F77FF26 &.wo&.wmj.j.......v..v..v·.Š...¡ 0001A0
468D0676 FF0876FF D88E007E 881E5657 000012C8 0008CAC9 5F5E1F00 00E90000 ..Õ...^_èò..à...WV.¡~..Ã.v..v..F 0001C0
00E90000 B8F45689 F2468900 87978826 00858788 26FC5EC4 00000098 9A5016FC =.P....á^=&....&.....F·.V¶¡..Õ. 0001E0

Dump of file SATURN:[PCCOMMON.DUMP.DLL]SA-DIFN.DLL;1 on 18-APR-1990 10:50:26.92
File ID (450,15,0)   End of file block 323 / Allocated 324

Virtual block number 53 (00000035), 512 (0200) bytes

89065788 26044788 260A5EC4 D88E1024 881E5657 00000EC8 0004CAC9 5F5E1F00 ..^_èò..à...WV.¡$..Ãá^.&.G.&.W.. 000000
260087B7 FF260A5E C4000002 F19A0085 B7FF2600 87B7FF26 0A5EC4F6 5689F446 F¶.V-á^.&.ñ..&.ñ...þ...á^.&.ñ..& 000020
76FFF676 FF5016FC 468D008F E9037400 00300000 03019A50 16F8468D 0085B7FF .ñ...F%.P.....=..t.Õ...F=.P.v-.v 000040
C40025E9 03750000 30F24689 10C48300 000EF69A 006AF876 FFFA76FF 271068F4 ¶h.'.v*.v%j..-....á..F·=..u.Õ%.á 000060
46880789 26024789 26000088 0E5EC400 0011189A 0085B7FF 260087B7 FF260A5E ^.&.ñ..&.ñ.......á^.¡..&.G.&...F 000080
87FF260A 5EC40028 E90374FE 56390030 E90374FC 46390856 88064688 0054E9F2 ·ÕT..F..V.9F=t.Õ0.9V±t.Õ(.á^.&.ñ 0000A0
E9000088 02578926 078926FA 5688F846 880E5EC4 0000FFFF 9A0085B7 FF260087 ..&.ñ.......á^..F%.V*&..&.W.¡..Õ 0000C0
0020C8CB C95F5E1F 0000E900 00B80789 26024789 26000088 0E5EC4FF 52E90016 ..ÕR.á^.¡..&.G.&..¡..Õ...^_èùà . 0000E0
89260000 B80A5EC4 0001E446 C70000E2 46C70014 E046C7D8 8E106088 1E565700 .WV.¡'..ÃúFÁ..úFã..úFÕ..á^.¡..&. 000100
4789260A 47892600 00B80A5E C4044789 26064789 26000088 0A5EC407 89260247 G.&..á^.¡..&.G.&.G.á^.¡..&.G.&.G 000120
830000FF FF9A5016 FE468D06 76FF0876 FF0C4789 260E4789 26000088 0A5EC408 .á^.¡..&.G.&.G..v..v..F±.P...... 000140
8D0676FF 0876FF00 0010839A 0676FF08 76FF00FF E9000088 0006E903 7500FE7E -±.u.Õ..¡..Õ...v..v.......v..v.. 000160
5A9A006A F876FFFA 76FF5016 FC468D00 93E90374 00003000 00109A9A 5016F846 F%.P.....=..t.Õ...F=.P.v*.v%j..Z 000180
0061E903 7577FC7E 8300B6E9 E6468800 06E90375 00003DE6 46890AC4 83000008 ....á..F|=..u.Õ...F|ÕÑ..-=wu.Õa. 0001A0
03750000 30E64689 0CC48300 0010809A 006AF876 FFFA76FF 5DC06850 16E8468D .FÒ.Phà].v*.v%j..§....á..F|=..u. 0001C0
0008B91F 161EE876 8DF8880A 5EC40019 E9037500 E47E8300 84E9E646 880006E9 Õ...F|Õ...-õ.u.Õ..á^..«.vÕ...¿.. 0001E0
```

```
Dump of file SATURN:[PCCOMMON.DUMP.DLL]SA-DIFM.DLL;1 on 18-APR-1990 10:50:26.92
File ID (450,15,0)   End of file block 323 / Allocated 324

Virtual block number 54 (00000036), 512 (0200) bytes

 00FFFF9A 0A76FF0C 76FF0A76 FF0C76FF 5016E846 8D0016E9 0000E446 C71FA5F2 ·E.úFõ..Õ...FÒ.P.v..v..v. v..... 000000
 472926E2 568BE046 880A5EC4 02571926 072926E2 568BE046 880A5EC4 FF55E900 .ÕU.á^..FÁ.Vã&).&.W.á^..F  Vã&)G 000020
 26E2568B E046880A 5EC40A57 11260847 0126E256 88E0468B 0A5EC406 57192604 .&.W.á^..FÁ.Vã&.G.&.W.á^..  \.Vã& 000040
 76FFD88E 1155B81E 56570000 00C8CBC9 5F5E1F00 00E90000 B80E5711 260C4701 .G.&.W.¡..Õ...^_èùà...WV.¡U..Á.v 000060
 000010C8 0008CAC9 5F5E1F00 00E90000 B80000FF FF9A0676 FF0876FF 0A76FF0C ..v..v..v......Ï..Õ...^_èò..à... 000080
 F2468965 578B2663 478B2606 5EC40000 FC46C700 2FFA46C7 D88E12CA 881E5657 WV.¡ò..ÄúF*/.úF=..á^.&.Gc&.We.F· 0000A0
 76FF1876 FF1276FF 1476FFFA 76FFFC76 FF0A76FF 0C76FFF2 76FFF476 FFF45689 .V¶.v¶.v·.v..v..v=.v*.v..v..v..v 0000C0
 9A2A76FF 2C76FF26 76FF2876 FF2276FF 2476FF1E 76FF2076 FF1A76FF 1C76FF16 ..v..v..v .v..v$.v".v(.v&.v,.v*. 0000E0
 7502470B 26078826 165EC401 0BE9F046 880006E9 03750000 3DF04689 0000FFFF .....Fþ=..u.Õ...FþÕ..á^.&..&.G.u 000100
 000E469A 5016F646 8D37FF26 0277FF26 165EC400 77E9078B 26125EC4 000DE903 .ÕÏ.á^.&..Õw.á^.&.w.&.7.F-.P.F.. 000120
 62E9F046 8900000E 5C9A5016 F6468D37 FF260277 FF26165E C4007CE9 F0468900 ..FþÕ|.á^.&.w.&.7.F-.P.\....FþÕb 000140
 FF26165E C40048E9 F0468900 000E729A 5016F646 8D37FF26 0277FF26 165EC400 .á^.&.w.&.7.F-.P.r....FþÕH.á^.&. 000160
 22E9F646 89F84689 00008800 2EE9F046 8900000E 889A5016 F6468D37 FF260277 w.&.7.F-.P......FþÕ..¡...F½.F-Õ" 000180
 E513B113 B1139713 7D1407A7 FF2E93C0 03FFE6E9 03760005 3D00012D 001FE900 .Õ..-..=..v.ÕÏ..â...Ï..)...Ÿ.Ÿ.[ 0001A0
 003DF046 890CC483 00001221 9A006AF6 76FFF876 FF5DC568 5016FE46 8D13CB13 .ù..F±.Phé].v½.v-j..!....á..Fþ=. 0001C0
 09E9F646 89F84689 00008800 09E90374 00FE7E83 0034E9F0 46880006 E9037500 .u.Õ...FþÕ4..-±.t.Õ..¡...F½.F-Õ. 0001E0

Dump of file SATURN:[PCCOMMON.DUMP.DLL]SA-DIFM.DLL;1 on 18-APR-1990 10:50:26.92
File ID (450,15,0)   End of file block 323 / Allocated 324

Virtual block number 55 (00000037), 512 (0200) bytes

 0000E900 00B80257 89260789 26F8568B F6468B0E 5EC4F646 89F84689 0000B800 .¡...F½.F-á^..F-.V½&..&.W.¡..Õ.. 000000
 B8F44689 F6468900 00B80000 E446C7D8 8E12F4B8 1E565700 0020C8CB C95F5E1F .^_èùà ..WV.¡¶..ÄúFõ..¡...F-.F¶¡ 000020
 2604478B 26F85EC4 FA5689F8 46890257 8B260788 26065EC4 E04689E2 46890000 ...Fã.FÁá^.&..&.W..F½.V*á^½&.G.& 000040
 5016EE46 8DF04689 F2468900 00B8FC46 89FE4689 0000B8E8 5689E646 89065788 .W..F|.VÒ¡...F±.F=¡...F·.Fþ.FŸ.P 000060
 52685016 F4468D00 4AE90374 78EE7E83 0AC48300 00151A9A 006A0A76 FF0C76FF .v..v.j.......á..-Ÿxt.ÕJ..F¶.PhR 000080
 16EE468D 0027E903 75F6460B F446880C C4830000 159B9A00 6A0A76FF 0C76FF5F _.v..v.j.......á..F¶.F-u.Õ'..FŸ. 0000A0
 F6468900 00B80009 E9037477 EE7E830A C4830000 11EF9A00 6AF476FF F676FF50 P̄.v-.v¶j..ÿ....á..-Ÿwt.Õ..¡...F- 0000C0
 46800477 FF260677 FF26065E C4000011 C59A0477 FF260677 FF26065E C4F44689 .F¶á^.&.w.&.w..é...á^.&.w.&.w..F 0000E0
 56390008 E903740A 4639EC56 88EA468B 0066E903 74000030 000011D5 9A5016EA õ.P.f...=..t.Õf..Fõ.V&9F.t.Õ..9V 000100
 68FFB4E9 0003E903 74EC5639 0008E903 74EA4639 F6568BF4 46880016 E903750C .u.Õ...F¶.V-9Fõt.Õ..9V&t.Õ..ÕÇ.h 000120
 065EC400 16E90375 00003DE4 468908C4 83000014 249A006A EA76FFEC 76FF5DCD ë].v&.vÕj..$....á..Fõ=..u.Õ..á^. 000140
 32E90375 F6460BF4 4688FF7D E9013AE9 E4468800 0010D09A 0477FF26 0677FF26 &.w.&.w..Ï....FõÕ:.Õ)..F¶.F-u.Õ2 000160
 8910C483 00001625 9A006AF4 76FFF676 FF271068 E676FFE8 76FF5016 E0468000 ..FÁ.P.vÒ.vIh.'.v-.v¶j..X....á.. 000180
 4680002F E903750C 46080A46 88003AE9 00FDE9E4 46880006 E9037500 0030E446 Fõ=..u.Õ...FõÕ».Õ:..F..F.u.Õ/..F 0001A0
 30E44689 10C48300 0014FA9A 006A0A76 FF0C76FF 271068E6 76FFE876 FF5016E0 Á.P.vÒ.vIh.'.v..v.j..*....á..Fõ= 0001C0
 E4468900 00FFFF9A 5016F046 80E676FF E876FF00 C0E9E446 880006E9 03750000 ..u.Õ...FõÕà..vÒ.v|.Fþ.P......Fõ 0001E0

Dump of file SATURN:[PCCOMMON.DUMP.DLL]SA-DIFM.DLL;1 on 18-APR-1990 10:50:26.92
File ID (450,15,0)   End of file block 323 / Allocated 324

Virtual block number 56 (00000038), 512 (0200) bytes

 8826FC5E C4FE5689 FC4689F2 568BF046 88009EE9 E4468800 06E90375 00E47E83 .-õ.u.Õ...FõÕ...Fþ.V·.F=.V±á^=&. 000000
 75025739 260009E9 03740739 26E2568B E0468BFC 5EC4005B E9037502 470B2607 .&.G.u.Õ[.á^=.FÁ.Vã&9.t.Õ..&9W.u 000020
 7E83E446 890000FF FF9A006A 37FF2602 77FF26FC 5EC4E676 FFE876FF 003AE903 .Õ:..vÒ.v|á^=&.w.&.7j.......Fõ.- 000040
 4683002F E9E4468B 000016E2 9AF076FF F276FFE6 76FFE876 FF0017E9 037500E4 õ.u.Õ...vÒ.v|.v·.vþ.ã....FõÕ/..F 000060
 06E90375 00003DE4 46890000 07989AF0 76FFF276 FFE676FF E876FFFF 96E904FC =.Õ...vÒ.v|.v·.vþ......Fõ=..u.Õ. 000080
 0088D88E 147D881E 56570000 28C8CBC9 5F5E1F00 00E90000 B80006E9 E4468800 ..FõÕ..¡..Õ...^_èùà(..WV.¡)..Ä¡. 0000A0
 2663478B 26065EC4 FC5689FA 46896857 8B266947 8B26065E C4D84689 DA468900 ..FÕ.FÄá^.&.Gi&.Wk.F*.V=á^.&.Gc& 0000C0
 FF0876FF 176ADE56 890C4689 06578826 04478826 FA5EC4F4 5689F246 89655788 .We.F·.V¶á^*&.G.&.W..FÉ.V8j..v.. 0000E0
 76FFDE76 FF0145E9 F0468800 06E90375 000030F0 468906C4 83178500 009A0676 v....ç..á..Fþ=..u.Õ...FþÕE..v8.v 000100
 1C680040 E9037400 003D0000 15549A50 16F6468D DC76FFDE 76FF0000 153F9ADC É.7....v8.vÉ.F-.P.T...=..t.Õ@.h. 000120
 FF0876FF 001FE903 7500003D F0468908 C4830000 15E89A00 6AF676FF F876FF60 '.v½.v-j..Õ....á..Fþ=..u.Õ...v.. 000140
 76FFFFA8 E900E5E9 F0468800 0015B99A DC76FFDE 76FF04C4 8317F800 649A0676 v..d.½..á..v8.vÉ.¿....FþÕ[.Õ´..v 000160
 FF000007 309A5016 FE468D50 16E0468D 0676FF08 76FF071D 68187268 F276FFF4 ¶.v·hr.h...v..v..FÁ.P.F±.P.0.... 000180
 5EC400A2 E9F0468B 0006E903 7500003D F0468904 C483077B 00649A06 76FF0876 v..v..d.(..á..Fþ=..u.Õ...FþÕÁ.á^ 0001A0
 F276FFF4 76FF0067 E9037701 087F8326 000AE903 7E0076E9 037D000A 7F8326FA *&....).Õv.-.Õ..&....w.Õg..v¶.v· 0001C0
 00188D9A 016A036A 6D77FF26 6F77FF26 065EC4F2 76FFF476 FF000018 5A9A026A j..Z....v¶.v·á^.&.wo&.wmj.j..... 0001E0
```

```
Dump of file SATURN:[PCCOMMON.DUMP.DLL]SA-DIFM.DLL;1 on 18-APR-1990 10:50:26.92
File ID (450,15,0)   End of file block 323 / Allocated 324

Virtual block number 57 (00000039), 512 (0200) bytes

9ADC76FF DE76FF6D 77FF266F 77FF2606 5EC40000 0FE39A01 6AF276FF F476FF00 ..v¶.v·j..D...á^.&.wo&.wm.v8.vÊ. 000000
000FFD9A 016A036A 6D77FF26 6F77FF26 065EC4F2 76FFF476 FF08C483 0BD5114D M.{..á..v¶.v·á^.&.wo&.wmj.j..».. 000020
0000E900 00B80000 07659A50 16E0468D F276FFF4 76FF0010 E9037500 FE7E8300 ..~±.u.Õ...v¶.v·.FÁ.P.e...|..Õ.. 000040
47882606 5EC49C46 899E4689 00008808 8E170A88 1E565700 0082C8C8 C95F5E1F .^_èùà...WV.|...Ä|...F..F.á^.&.G 000060
065EC400 00FFFF9A 5016FF7E 86806777 FF26065E C4AE5689 AC468965 578B2663 c&.We.F˜.VÛá^.&.wg..~..P.....á^. 000080
0477FF26 0677FF26 695FC426 065EC400 0017729A 0477FF26 0677FF26 695FC426 &á_i&.w.&.w..r...á^.&á_i&.w.&.w. 0000A0
9A006AC0 76FFC276 FF5016EE 468D0057 E9037400 003D0000 17829A50 16C0468D .Fã.P.....=..t.ÕW..FŸ.P̄.vô.vâj.. 0000C0
77FF2606 77FF2669 5FC42606 5EC4001A E9037500 0030BA46 890AC483 00001409 }....á..F.=..u.Õ..á^.&á_i&.w.&.w 0000E0
76FFC276 FF5016FF 7E868000 11E90375 77EE7E83 050FE98A 46880000 1A5B9A04 ..[....F.Õ...-Ÿwu.Õ....=..P.vô.v 000100
0000FFFF 9A5016A8 468D9C76 FF9E76FF FF7EB6FF 8076FFFF 88E90000 1B759AC0 â.u...Õ...v..Ñ~..v..v..F´.P..... 000120
77FF2606 5EC4C846 89CA4689 00008804 CAE90001 B80006E9 0374AA46 0BA8468B .F´.F˙t.Õ..|..Õò.|...Fò.Fàá^.&.w 000140
83E90375 CA563900 08E90374 C84639AA 568BA846 8B000018 E99A5016 C4468D67 g.Fá.P.Õ....F´.V˙9Fàt.Õ..9Vòu.Õ° 000160
CE76FFD0 76FF5DC0 685016B0 468D0000 1B9C9A50 16CE468D FF7EB6FF 8076FF01 ..v..Ñ~..Fö.P......F¯.Phâ].vÅ.vö 000180
B6FF8076 FF0460E9 8A468800 06E90375 0000308A 46890CC4 8300001A 419A006A j..A....á..F.=..u.Õ...F.Õ'..v..Ñ 0001A0
011FE903 74000030 00001C43 9A5016C0 468DFF7E B6FF8076 FF00001C 339AFF7E ~..3....v..Ñ~..Fá.P.C...=..t.Õ.. 0001C0
03750000 308A4689 0CC48300 0018B19A 006AC076 FFC276FF 5DC06850 160E468D .F8.Phâ].vô.vâj..Ý....á..F.=..u. 0001E0

Dump of file SATURN:[PCCOMMON.DUMP.DLL]SA-DIFM.DLL;1 on 18-APR-1990 10:50:26.92
File ID (450,15,0)   End of file block 323 / Allocated 324

Virtual block number 58 (0000003A), 512 (0200) bytes

468B006C E9037400 0A7E8304 06E98A46 8800001C 879AFF7E B6FF8076 FF0012E9 Õ...v..Ñ~.......F.Õ...~..t.Õ{..F 000000
39825688 80468800 31E90376 DE463900 08E9037D 003EE903 7EE05639 B25688B0 ¯.Vý9VÁ~.Õ>.).Õ..9F8v.Õ1..F¯.Vý9 000020
E9037E00 2AE9037D E45639B6 568B8446 880038E9 0374E056 390040E9 0374DE46 F8t.Õa.9VÁt.Õ8..FÇ.VÑ9Võ).Õ*.~.Õ 000040
161E0716 DE768D80 7E8D0056 89CE4689 C25688C0 4688001D E90377E2 46390008 ..9Fãw.Õ...Fá.Vô.Fö.VÅ.~¯.v8.... 000060
3EE9037E E4563986 5688B446 880069E9 0374010A 7E830072 E91FA5F2 0008891F .¿..·E.Õr..~..t.Õ{..FÇ.VÑ9Võ~.Õ> 000080
74E45639 0040E903 74E24639 B65688B4 46880031 E90376E2 46390008 E9037D00 .}.Õ..9Fãv.Õ1..FÇ.VÑ9Fãt.Õa.9Võt 0000A0
88001DE9 0377DE46 390008E9 037E002A E9037DE0 56398256 88804688 0038E903 .Õ8..F¯.Vý9VÁ}.Õ*.~.Õ..9F8w.Õ... 0000C0
8DFEC8E9 1FA5F200 08891F16 1E07160E 768D807E 8D005689 CE4689C2 568BC046 Fá.Vô.Fö.VÅ.~¯.v8.....¿..·E.Õà±. 0000E0
76FF5016 C4468D00 000B2C9A 50160A46 80016A00 6ACE76FF D076FF50 16FF7E86 .~..P.vÅ.vöj.j..FÖ.P.,....Fé.P.v 000100
0000FFFF 9AFF7EB6 FF8076FF FE37E900 CA568301 C8468300 0009A19A CE76FFD0 Å.vö.Å....Fà..Vö.Õ7±.v..Ñ~...... 000120
006AC076 FFC276FF 5DC06850 160E468D 0000FFFF 9A5016C0 468DC476 FFC676FF .vó.vá.Fâ.P......F8.Phâ].vô.vâj. 000140
89E05688 DE468802 A2E98A46 880006E9 03750000 308A4689 0CC48300 001C609A .'....á..F.=..u.Õ...F.ÕÅ..F8.VÅ. 000160
E2468888 56898646 89E05688 DE468808 56890646 89E45688 E2468804 56890246 F0.Vâ.Fã.Võ.F0.VÅ.F8.VÁ.F..V..Fã 000180
0876FF17 6AA44689 A6468900 0088A046 89A24689 00008884 56898246 89E45688 .Võ.F..V.|...FÅ.F.|...FÏ.FÊj..v. 0001A0
FFC676FF 023FE98A 46880006 E9037500 0030BA46 8906C483 1C7B0000 9A0676FF .v....(..é..F.=..u.Õ...F.Õ7..vó. 0001C0
8D0134E9 03740000 30000019 169A5016 C0468DC4 76FFC676 FF000018 FD9AC476 vé.»....vó.vé.Fâ.P.....=..t.Õ4.. 0001E0

Dump of file SATURN:[PCCOMMON.DUMP.DLL]SA-DIFM.DLL;1 on 18-APR-1990 10:50:26.92
File ID (450,15,0)   End of file block 323 / Allocated 324

Virtual block number 59 (0000003B), 512 (0200) bytes

E9037500 0030BA46 890CC483 0000179A 9A006AC0 76FFC276 FF5DC068 5016F046 Fþ.Phâ].vô.vâj.......á..F.=..u.Õ 000000
DAE98A46 88000017 C19AC476 FFC676FF 04C48317 5500649A 0676FF08 76FF001F ...v..v..d.U..á..vó.vá.ê....F.ÕÕ 000020
7ED45639 88568886 46880456 89D24689 F25688F0 46880036 E9037400 0A7E8301 ..~..t.Õ6..Fþ.V·.F0.Vâ.F..V.9Vâ~ 000040
0033E904 5689D246 89885688 86468800 0CE90372 02463900 08E9037D 0019E903 .Õ..).Õ..9F0r.Õ...F..V..F0.VáÕ3. 000060
390008E9 037D0019 E9037ED8 56398456 88824688 08568906 4689F656 88F44688 .F¶.V~.F0.VÄ.F..V.9VÄ~.Õ..).Õ..9 000080
F0468D50 16024680 5016A046 8D085689 D6468984 56888246 88000CE9 03720646 F0r.Õ...F..V..F0.VÄ.F..P.F0.P.Fþ 0000A0
83000019 F39A006A C076FFC2 76FF50C3 685016F0 46800CC4 83104611 809A5016 .P.¯.F..á..Fþ.PhÛ].vô.vâj..µ.... 0000C0
76FFC676 FF04C483 1D880064 9A0676FF 0876FF00 1FE90375 0000308A 46890CC4 á..F.=..u.Õ...v..v..d.|..á..vó.v 0000E0
46888856 89864689 00D28300 A005FA56 88F84688 010FE98A 46880000 19529AC4 á.R....F.Õ...F%.Vª....0..F..V..F 000100
76FF0000 188C9AC4 76FFC676 FFFE84E9 84568982 46890002 8300A005 FE5688FC =.V±....0..F..V.ÕÇ±.vó.vá......v 000120
FF000017 E89A5016 CC468050 168C468D 0676FF08 76FF17D8 681E2068 AC76FFAE Õ.v¯h-.hÅ..v..v..F..P.Fã.P.Š.... 000140
7E83009D E98A4688 0006E903 7500003D 8A468904 C4831C16 00649A06 76FF0876 v..v..d....á..F.=..u.Õ...F.Õ...~ 000160
1E159A02 6AAC76FF AE76FF00 67E90377 01A87E83 0009E903 7E0075E9 037D00AA ˆ.).Õu.~.Õ...~´.w.Õg..vÛ.v¯j.... 000180
FFAE76FF 00001E48 9A016A03 6A6077FF 266F77FF 26065EC4 AC76FFAE 76FF0000 ...vÛ.v¯á^.&.wo&.wmj.j..H....vÛ. 0001A0
83170511 4D9AC476 FFC676FF 6077FF26 6F77FF26 065EC400 0018339A 016AAC76 v¯j..3...á^.&.wo&.wm.vó.vá.M.{.. 0001C0
00CC7E83 00001840 9A016A03 6A6077FF 266F77FF 26065EC4 AC76FFAE 76FF08C4 á..vÛ.v¯á^.&.wo&.wmj.j..H....~ä. 0001E0
```

Dump of file SATURN:[PCCOMMON.DUMP.DLL]SA-DIFM.DLL;1 on 18-APR-1990 10:50:26.92
File ID (450,15,0)   End of file block 323 / Allocated 324

Virtual block number 60 (0000003C), 512 (0200) bytes

```
CBC95F5E 1F0000E9 0000B800 0018A69A 50168C46 8DAC76FF AE76FF00 10E90375 u.Õ...vÕ.v¯.F..P.Ì...|..Õ...^_èù 000000
85B7FF26 0087B7FF 26065EC4 000007C7 260C5EC4 D88E188D B81E5657 000006C8 à...WV.¡§..Äé^.&ú...é^.&.ñ..&¯ñ. 000020
00003D00 001A249A 5016FA46 8D0085B7 FF260087 B7FF2606 5EC40000 1A139A00 ......é^.&.ñ..&.ñ...F°.P.$...=.. 000040
FE46390A 46880AC4 83000019 309A006A FA76FFFC 76FF5016 FE468D00 29E90374 t.Õ)..F±.P.v=.v°j..0....é..F.9F± 000060
1E565700 0028C8CB C95F5E1F 0000E900 0088FFB8 E907FF26 0C5EC400 06E90374 t.Õ..é^.&..Õ|.|..Õ...^_èùà(..WV. 000080
8902578B 26078B26 0A5EC4DE 56890C46 8902578B 26078B26 065EC408 8E1E78B8 ¡x..Äé^.&..&.W..FÊ.VBé^.&..&.W.. 0000A0
E0468D0C C4830000 1F3E9A00 6ADC76FF DE76FF5D C0685016 F0468D0A 56890846 FÄ.VÕ.Fÿ.Phà].vB.vÊj..>....é..FÄ 0000C0
037DFE56 39EE568B EC46880C C4830000 1D2B9A00 6AD876FF DA76FF5D C0685016 .Phà].vÕ.vÄj..+....é..F§.VŸ9v±). 0000E0
7DEE5639 FE568BFC 46880069 E9FFFFB8 0006E903 77FC4639 0008E903 7E0013E9 Õ..~.Õ..9F=w.Õ..|..Õi..F=.V±9VŸ) 000100
F25639E2 568BE046 880048E9 0001B800 06E90377 EC463900 08E9037E 0013E903 .Õ..-.Õ..9F§w.Õ..|..ÕH..FÄ.Vã9V· 000120
5639F256 8BF0468B 0027E900 01B80006 E90377F0 46390008 E9037E00 13E9037D ).Õ..-.Õ..9Fÿw.Õ..|..Õ'..Fÿ.V·9V 000140
1F0000E9 0000B800 06E9FFFF B80006E9 0377E046 390008E9 037E0013 E9037DE2 ã).Õ..-.Õ..9FÄw.Õ..|..Õ..|..Õ... 000160
6A036A01 6A006A01 6A006A00 00F246C7 D88E1EF1 B81E5657 00001EC8 CBC95F5E ^_èùà...WV.¡ÿ..ÄúF·..j.j.j.j.j.j 000180
F2468906 C48320D8 00009A06 76FF0876 FF2C6A00 0021059A 50520000 20FE9A00 ..± ..RP..!..j,.v..v....Ü .é..F· 0001A0
001E929A 00858 7FF 260087B7 FF26065E C400F0E9 F2468800 06E90375 00F27E83 .~·.u.Õ...F·Õÿ.é^.&.ñ..&.ñ...... 0001C0
005CE903 7400003D 00001EA9 9A5016F4 468D0085 87FF2600 87B7FF26 065EC400 .é^.&.ñ..&.ñ...F¶.P.`...=..t.Õ\. 0001E0
```

Dump of file SATURN:[PCCOMMON.DUMP.DLL]SA-DIFM.DLL;1 on 18-APR-1990 10:50:26.92
File ID (450,15,0)   End of file block 323 / Allocated 324

Virtual block number 61 (0000003D), 512 (0200) bytes

```
468D003B E903747A FA7E830A C4830000 1EC39A00 6AF476FF F676FF50 16FA468D .F°.P.v~.v¶j..û....é..~°zt.Õ;..F 000000
03E90375 FE460BFC 46880CC4 83000020 A29A006A F476FFF6 76FF60E5 685016FC =.Ph|'.v~.v¶j..Å ...é..F=.F±u.Õ. 000020
26065EC4 FF85E90A C4830000 1F269A00 6AF476FF F676FF60 E268016A FF90E900 .Õ..j.hã'.v~.v¶j..&....é.Õ..é^.& 000040
1DA89A50 16F8468D 5016E246 8D0676FF 0876FF1D 98681D95 686377FF 266577FF .we&.wch..h...v..v..Fã.P.F½.P.¨. 000060
1EE9F246 880006E9 03750000 3DF24689 04C4831D 1500649A 0676FF08 76FF0000 ...v..v..d....é..F·=..u.Õ...F·Õ. 000080
1F0000E9 0000B800 00FFFF9A 50520000 FFFF9A00 6A016A01 6A006A01 6A006A00 .j.j.j.j.j.j......RP.....|..Õ... 0000A0
5689E646 8906578B 2604478B 26065EC4 D88E1FDC B81E5657 000020C8 CBC95F5E ^_èùà ..WV.¡É..Äé^.&.G.&.W..F|.V 0000C0
C40AC483 221E1E70 9A0676FF 0876FF7A 6A5016FE 468DF446 89F64689 0000B8E8 Õ¯...F~.F¶.F±.Pjz.v..v..p..".é.é 0000E0
89F6568B F4468800 00FFFF9A 5016F446 8D5002E0 C1FE4688 596A6777 FF26065E ^.&.wgjY.F±éÄ.P.F¶.P......F¶.V~. 000100
260087B7 FF26065E C4000020 2D9A0085 B7FF2600 87B7FF26 065EC4EE 5689EC46 F§.VŸé^.&.ñ..&.ñ...- ..é^.&.ñ..& 000120
76FFF276 FF5016FC 468D0077 E9037400 003D0000 20449A50 16F0468D 00858 7FF .ñ...Fÿ.P.D ..=..t.Õw..F=.P.v·.v 000140
FF26065E C4046A50 16E2468D 0056E903 747AFC7E 830AC483 0000205E 9A006AF0 ÿj..^ ...é..~=zt.ÕV..Fã.Pj.é^.&. 000160
00E07E83 E0468912 C4830000 22909A00 6AF076FF F276FF27 14680477 FF260677 w.&.w.h.'.v·.vÿj...".. .é..FÄ.~Ä. 000180
26F2568B F0468BEC 5EC40014 E90374E4 460BE246 880113E9 E0468800 06E90375 u.Õ...FÄÕ...Fã.FÕt.Õ..é^£.Fÿ.V·& 0001A0
B49AF476 FFF676FF FE76FF04 6AFFFF68 20B868FF 6AE904EC 46830257 89260789 ..&.W..F§.Õj.h| h..j..v±.v~.v¶.Ç 0001C0
E9037500 E07E83E0 468906C4 83200800 009A0676 FF0876FF 236A0CC4 83FFFF02 ....é.j#.v..v..... .é..FÄ.~Ä.u.Õ 0001E0
```

Dump of file SATURN:[PCCOMMON.DUMP.DLL]SA-DIFM.DLL;1 on 18-APR-1990 10:50:26.92
File ID (450,15,0)   End of file block 323 / Allocated 324

Virtual block number 62 (0000003E), 512 (0200) bytes

```
006A002C E90376EA 4639FE46 8BEA46FF 0003E900 01EA46C7 00B6E9E0 46880006 ...FÄÕÑ.úFõ..Õ...Fõ.F±9Fõv.Õ,.j. 000000
9A006AFC 70FF26FE 70FF26F4 5EC402E6 C1EA768B 60E468E6 76FFE876 FFEA76FF .vÕ.vÕ.vlhõ'.võè|.é^¶&.p±&.p=j.. 000020
FFE876FF 186A5016 F8468D00 00FA46C7 F84689FE 4688FFC6 E910C483 000022C2 õ"...é.Õé..F±.F½úF°...F½.Pj..vÕ. 000040
26065EC4 E0468912 C4830000 207F9A00 6A37FF26 0277FF26 065EC427 1768E676 vlh.'é^.&.w.&.7j... ...é..FÄé^.& 000060
E9037500 E07E8300 00FFFF9A E676FFE8 76FF0000 FFFF9AF4 76FFF676 FF6777FF .wg.v~.v¶......vÕ.vl......~Ä.u.Õ 000080
5E1F0000 E90000B8 0000FFFF 9A6377FF 266577FF 26065EC4 0016E9E0 46880006 ...FÄÕ..é^.&.we&.wc.....|..Õ...^ 0000A0
839A0477 FF260677 FF26695F C426065E C4D88E21 1CB81E56 57000020 C8CBC95F _èùà ..WV.¡.!.Äé^.&é_i&.w.&.w... 0000C0
7400003D 0000219A 9A5016F6 468D0477 FF260677 FF26695F C426065E C4000021 Ì..é^.&é_i&.w.&.w..F=.P..!..=..t 0000E0
00E07E83 E046890A C4830000 21B49A00 6AF676FF F876FF50 16FC468D 005EE903 .Õ^..F=.P.v½.v~j..Ç|...é..FÄ.~Ä. 000100
8300EEE9 E0468800 0023A89A 0477FF26 0677FF26 695FC426 065EC400 1AE90375 u.Õ..é^.&é_i&.w.&.w..'#...FÄÕŸ.. 000120
E90003E9 00001D52 9A0477FF 260677FF 26695FC4 26065EC4 0017E903 7477FC7E ~=wt.Õ..é^¯&é_i&.w.&.w..R...Õ..Õ 000140
5E996850 16E6468D 5016FA46 8D008AE9 0000B800 06E90374 F8460BF6 4688FF81 ...F~.F½t.Õ..Ì..Õα..F°.P.F|.Ph.^ 000160
006AF676 FFF876FF 5E9E6850 16E2468D 10C48300 0023F19A 006AF676 FFF876FF .v½.v~j..ÿ#...é..Fã.Ph.^.v½.v~j. 000180
51685016 E6468D00 74E90000 B80006E9 0374E446 0BE2468B 0CC48300 00241A9A ..$...é..Fã.FÕt.Õ..|..Õt..F|.PhQ 0001A0
68214A68 6377FF26 6577FF26 065EC40C C4830000 21E29A00 6AE276FF E476FF5F _.vÕ.vãj..ã!...é.é^.&.we&.wchJ!h 0001C0
037500E0 7E83E046 89000020 CE9A5016 FE468D50 16E6468D 0676FF08 76FF20BB È .v..v..F|.P.F±.P.õ ...FÄ.~Ä.u. 0001E0
```

```
Dump of file SATURN:[PCCOMMON.DUMP.DLL]SA-DIFM.DLL;1 on 18-APR-1990 10:50:26.92
File ID (450,15,0)   End of file block 323 / Allocated 324

Virtual block number 63 (0000003F), 512 (0200) bytes

 E6468D63 77FF2665 77FF2606 5EC40015 E9037500 FE7E8300 24E9E046 880006E9 Ō...FÅŌ$..-±.u.Ō..á^.&.we&.wc.F| 000000
 46C7D88E 231BB81E 56570000 26C8CBC9 5F5E1F00 00E90000 8800001E 619A5016 .P.@...|..Ō..._èüà&..WV.|.#.ÄúF 000020
 77FF2669 5FC42606 5EC4FE56 89FC4689 00879788 26008587 8826065E C40000F6 -..á^.&....&.....F=.V±á^.&á_i&.w 000040
 4E9A5016 F0468D04 77FF2606 77FF2669 5FC42606 5EC40000 253E9A04 77FF2606 .&.w..>%..á^.&á_i&.w.&.w..FÞ.P.N 000060
 0AC48300 0025689A 006AF076 FFF276FF 5016F846 8D005CE9 03740000 30000025 %..=..t.Ō\..F½.P̄.v·.vÞj..h%...á. 000080
 00002589 9A0477FF 260677FF 26695FC4 26065EC4 001AE903 75000A7E 830A4689 .FŌ.-Ō.u.Ō..á^.&á_i&.w.&.w...%.. 0000A0
 46890657 88260447 8826695F C426065E C40015E9 037477F8 7E830148 E90A4688 .FŌŌK..-¥wt.Ō..á^.&á_i&.G.&.W..F 0000C0
 23489A50 16F0468D FC76FFFE 76FF0000 232F9AFC 76FFFE76 FFFF83E9 FE5689FC •.V±Ō...v±.v=./#...v±.v=.FÞ.P.H# 0000E0
 890AC483 00002362 9A006AF0 76FFF276 FF5016F8 468D00A2 E9037400 003D0000 ..=..t.ŌÅ..F½.P.v·.vÞj..b#...á.. 000100
 DA468800 0023859A 00858 7FF 260087B7 FF26065E C40018E9 0375000A 7E830A46 FŌ.-Ō.u.Ō..á^.&.ñ..&.ñ....#...FŌ 000120
 6AF076FF F276FF5E 99685016 E0468D50 16F4468D 005DE903 7477F87E 8300CEE9 Ōð..-¥wt.Ō]..F¶.P.FÅ.Ph.^.v·.vÞj 000140
 C4830000 25ED9A00 6AF076FF F276FF5E 9E685016 DC468D10 C4830000 25CA9A00 ..ð%...á..FÉ.Ph.^.v·.vÞj..Ú%...á 000160
 0023D99A 006ADC76 FFDE76FF 5F516850 16E0468D 001DE903 75DE460B DC46880C ..FÉ.F8u.Ō...FÅ.PhQ_.v8.vÉj..\#. 000180
 6377FF26 6577FF26 065EC400 56E90375 00F67E83 FF46E900 01F646C7 0CC48300 ..á.úF-..ŌF..—.u.ŌV̄.á^.&.we&.wc 0001A0
 7E830A46 89000024 439A5016 FA468D50 16E0468D 0676FF08 76FF2430 68242068 h-$h0$.v..v..FÅ.P.F•.P.C$...FŌ.~ 0001C0
 77FF2665 77FF2606 5EC40015 E9037500 FA7E8300 24E90A46 880006E9 0375000A Ō.u.Ō...FŌŌ$..-•.u.Ō..á^.&.we&.w 0001E0

Dump of file SATURN:[PCCOMMON.DUMP.DLL]SA-DIFM.DLL;1 on 18-APR-1990 10:50:26.92
File ID (450,15,0)   End of file block 323 / Allocated 324

Virtual block number 64 (00000040), 512 (0200) bytes

 032B0008 190E0203 0032CBC9 5F5E1F00 00E90000 B8000024 739A5016 E0468D63 c.FÅ.P.s$..|..Ō..._èü2...B...+. 000000
 08930010 25B20203 00000004 26110002 0C0D0004 26140005 02AF000B 24B60203 ..Ñ$..£....&.......Ī......ÿ%.... 000020
 08360000 13500203 02C0000B 250C0203 00070008 030C0203 00000005 07110002 ..........É...■....X..å...P...6. 000040
 0AB4000F 0FD60203 02D4000B 24CF0203 00E30008 00310203 0348000B 19720203 ..r...H...1...D...ü$..å...ø...Ç. 000060
 0000000D 22410002 0BB30010 06E30203 08480000 00D60203 05C60000 13BD0203 ......ó...ø...H...D...°...A"..... 000080
 00FA0008 16C40203 0361000B 11AB0203 0AC0000F 10340203 01ED0009 21650203 ..e!..Ú...4...å...¨...■...á...°. 0000A0
 0181000B 16A70203 00000010 22310002 02E8000B 19B70203 05540000 120B0203 ..Ü...T...ñ...Ò...1"......Ī..... 0000C0
 085F0000 0DFE0203 0BC40010 03570203 01FB0009 220A0203 00830008 22E50203 ..Ì"......Ō"..«...W...á...±...._. 0000E0
 06E60000 13C10203 02F3000B 1D8A0203 0563000D 26270203 00000012 248A0002 ...$......'&..c.......µ...è...Ī. 000100
 01A50008 16490203 030D000B 09770203 0300000B 198C0203 08700000 0E1F0203 ......p...........W.......Ì...É. 000120
 0128000B 05FF0203 0BE80010 24E90203 0AEF000F 1DEE0203 096D000F 23040203 ...#..m...Ÿ...ÿ...Ō$..Ò.......(. 000140
 031C000B 1B650203 09FB000F 1E080203 0978000F 26570203 1EE90004 22210005 ..|"..Ō...W&..x.......«...e..... 000160
 005B0004 1FF20103 0418000C 12600203 0813000D 130B0203 06910000 13A70203 ..Ī.......Ü.......m.......·...[. 000180
 26065EC4 D88EFFFF B81E5657 0000E4C8 00000000 00000000 005C0004 1FF90103 ..•...\.........àŌ..WV.|...Äá^.& 0001A0
 5EC4A256 89A04689 65578826 63478826 065EC4AA 5689A846 89685788 26694788 .Gî&.Wk.F´.V˝á^.&.Gc&.We.F..VÄá^ 0001C0
 830000FF FF9A5016 FE468DFA 76FFFC76 FFFC5689 FA468918 57882616 478826A8 ´&.G.&.W..F•.V=.v=.v•.F±.P...... 0001E0

Dump of file SATURN:[PCCOMMON.DUMP.DLL]SA-DIFM.DLL;1 on 18-APR-1990 10:50:26.92
File ID (450,15,0)   End of file block 323 / Allocated 324

Virtual block number 65 (00000041), 512 (0200) bytes

 065EC406 C48302F3 03039A63 77FF2665 77FF2606 5EC4006A 002BE903 7500FE7E ~±.u.Ō+.j.á^.&.we&.wc...µ..á.á^. 000000
 FF7A868D 086A5F77 FF26065E C4027BE9 0001B800 0000AF9A 0477FF26 0677FF26 &.w.&.w..£...|..Ō(.á^.&.w_j...z. 000020
 EB9A0477 FF260677 FF26065E C40017E9 03750000 3DFF7886 890000FF FF9A5016 .P.......x.=..u.Ō..á^.&.w.&.w..$ 000040
 FF9A5016 9C468D50 16FF7A86 8D5F77FF 26065EC4 086A0244 E9FF7886 88000000 .....x.ŌD.j.á^.&.w_..z..P F..P.. 000060
 88000001 1E9A0477 FF260677 FF26065E C40017E9 03750000 3DFF7886 890000FF .....x.=..u.Ō..á^.Ī.w.&.w. ..... 000080
 E9037500 003DFF78 86890000 FFFF9A50 16AE4680 9C76FF9E 76FF0208 E9FF7886 .x.Ō...v..v..FÛ.P.......x.±  u.Ō 0000A0
 FF9C76FF 9E76FF01 D5E9FF78 86880000 01599A04 77FF2606 77FF2606 5EC40017 ..á^.&.w.&.w..Y.....x.Ōî..v..v.. 0000C0
 065EC400 17E90375 00003DFF 78868900 00FFFF9A 5016F846 8D016AAE 76FF8076 v¯.vÛj..F½.P.......x.=..u.Ō..á^. 0000E0
 890000FF FF9A9C76 FF9E76FF 019AE9FF 78868800 0001929A 0477FF26 0677FF26 &.w.&.w.........x.Ō...v..v....... 000100
 77FF2606 77FF2606 5EC40017 E9037584 9FFF788E 810022E9 03750000 3DFF7886 .x.=..u.Ō"../x...u.Ō..á^.&.w.&.w 000120
 16A4468D FA76FFFC 76FF0076 E9037402 F87E8301 61E9FF78 86880000 026C9A04 ..l.....x.Ōa..-½.t.Ōv..v=.v•.FÊ. 000140
 8D0CC483 00000240 9A006AA4 76FFA676 FF50C168 5016FF1C 86800000 FFFF9A50 P..........Phè].vÌ.vÉj..M....á.. 000160
 1DB16861 77FF2606 5EC40CC4 83FFFF01 0A9A5016 82468D01 CC681E50 16FF1C86 ....P.hë..Fý.P.......á.á^.&.wahŸ. 000180
 4677FF26 A85EC463 77FF2665 77FF2606 5EC40000 FFFF9A00 6A006A50 16824680 .Fý.Pj.j.......á^.&.we&.wcá^´&.wF 0001A0
 A4468DFA 76FFFC76 FF0000FF FF9AFA76 FFFC76FF 000CE900 00FFFF9A 4477FF26 &.wD.....ŌÉ..v=.v•......v=.v•.FÊ 0001C0
 00FFFF9A 006AA476 FFA676FF 50C76801 6A0054E9 03740000 300000FF FF9A5016 .P.....=..t.ŌT.j.hú].vÌ.vÉj..... 0001E0
```

```
Dump of file SATURN:[PCCOMMON.DUMP.DLL]SA-DIFM.DLL;1 on 18-APR-1990 10:50:26.92
File ID (450,15,0)   End of file block 323 / Allocated 324

Virtual block number 66 (00000042), 512 (0200) bytes

 000002DB 9A0477FF 260677FF 26065EC4 0017E903 7500003D FF788689 0AC48300 ..á...x.=..u.Õ..á^.&.w.&.w..Ü... 000000
 0000FFFF 9A5016F4 468D016A 006AA476 FFA676FF 5016FA46 8D0087E9 FF788688 ..x.Õ...F².P.vÌ.vÊj.j..F¶.P..... 000020
 5016AC46 8D5016FF 68868D06 76FF0876 FFFFFF68 FFFF68A0 76FFA276 FFFF94E9 Õ...vÅ.v.h..h...v..v...h..P.F¯.P 000040
 C40000FF FF9A5016 FF68868D A076FFA2 76FF0011 E9037500 AC7E8300 00FFFF9A ......~¯.u.Õ...vÅ.v...h..P.....á 000060
 6377FF26 6577FF26 065EC400 6AFF7886 890000FF FF9A0477 FF260677 FF26065E ^.&.w.&.w........x.j.á^.&.we&.wc 000080
 C7D88E00 08881E56 57000080 C8C8C95F 5E1F0000 E9000088 06C483FF FF03039A ......á.|..Õ...^_èûà...WV.|...Äû 0000A0
 89685788 26694788 26FC5EC4 0000FFFF 9A5016FC 468D0676 FF0876FF 00009446 F....v..v..F•.P.¯....á^•&.Gi&.Wk. 0000C0
 26A05EC4 00000C47 C726A05E C4124789 26144789 26000088 A05EC4A2 5689A046 F..VÀá^.|..&.G.&.G.á^.&úG...á^.& 0000E0
 88A05EC4 24478926 26478926 000088A0 5EC40000 1C47C726 A05EC400 001A47C7 úG...á^.&úG...á^.|..&.G&&.G$á^.| 000100
 89260000 88A05EC4 2C478926 2E478926 000088A0 5EC42847 89262A47 89260000 ..&.G*&.G(á^.|..&.G.&.G,á^.|..&. 000120
 9A501680 468D0676 FF0876FF 34478926 36478926 000088A0 5EC43047 89263247 G2&.G0á^.|..&.G6&.G4.v..v..F..P. 000140
 C4000DE9 03743A57 39260016 E9037438 47392682 56888046 88A05EC4 0000FFFF ....á^..F..V.&9G8t.Õ..&9W:t.Õ..á 000160
 FF26FC5E C40000FF FF9A426A 5016A446 8D013F68 0027E903 7500227F 8326A05E ^.&..".u.Õ'.h?..FÊ.PjB.....á^•&. 000180
 76FF0000 FFFF9A06 76FF0876 FF000001 FA9A006A 006A5016 A446801D 81686177 wahÝ..FÊ.Pj.j..•....v..v.......v 0001A0
 7E830000 0048 9A50 16EA4680 1677FF26 1877FF26 A05EC400 6805C19A 0676FF08 ..v..ė.h.á^.&.w.&.w..Fõ.P.K....~ 0001C0
 FF261877 FF26A05E C4000005 419A1677 FF261877 FF26A05E C40002E9 037400EA õ.t.Õ•.á^.&.w.&.w..A...á^.&.w.&. 0001E0

Dump of file SATURN:[PCCOMMON.DUMP.DLL]SA-DIFM.DLL;1 on 18-APR-1990 10:50:26.92
File ID (450,15,0)   End of file block 323 / Allocated 324

Virtual block number 67 (00000043), 512 (0200) bytes

 6A9A76FF 9C76FF5D C768016A 0058E903 74000030 00000558 9A50169A 468D1677 w..F..P.X...=..t.ÕX.j.hú].v..v.j 000000
 9A0477FF 260677FF 26FC5EC4 0016E903 75000030 9446890A C4830000 01C89A00 ..à....á..F.=..u.Õ..á^•&.w.&.w.. 000020
 8D016A00 6A9A76FF 9C76FF50 52001605 A25688A0 46880122 E994468B 000004C8 à....F.Õ"..F..VÅ...RP.v..v.j.j.. 000040
 FF944689 00000079 9A0477FF 260677FF 26FC5EC4 FF88E900 00028C9A 5016E646 FÌ.P.....Õ..á^•&.w.&.w..y....F.. 000060
 00000281 9A50169E 46805016 84468DFC 76FFFE76 FF029D68 029A6806 76FF0876 v..v.h..h...v±.v•.F..P.F..P.Ý... 000080
 207F8326 A05EC400 0002CB9A 50168446 8D0676FF 0876FF00 10E90375 009E7E83 .~..u.Õ...v..v..F..P.ù...á^.&.. 0000A0
 47C726A0 5EC40000 2047C726 A05EC400 00FFFF9A 0676FF08 76FF000B E9037500 .u.Õ...v..v......á^.&úG ..á^.&úG 0000C0
 B7FF2600 88B7FF26 FC5EC400 0002239A 00898 7FF 26008BB7 FF26FC5E C4000022 "..á^•&.ñ..&.ñ...#...á^•&.ñ..&.ñ 0000E0
 E9037407 39260A46 88965EC4 0026E903 74000030 00000233 9A501696 46800089 ...F..P.3...=..t.Õ&.á^..F.&9.t.Õ 000100
 77FF26FC 5EC4FFBB E900000E 47C72696 5EC40009 E900020E 47C72696 5EC4000C ..á^.&úG...Õ..á^.&úG...ÕE.á^•&.w 000120
 6A5016EC 46805B77 FF265D77 FF26FC5E C40000FF FF9A5016 EC46805B 77FF2650 ]&.w[.F$.P.....á^•&.w]&.w[.F$.Pj 000140
 0876FFD8 8E0308B8 1E565700 0008C8CB C95F5E1F 0000E994 46880000 FFFF9A00 .......F.Õ...^_èûà...WV.|...Ä.v. 000160
 89F84689 3A578826 38478826 695FC426 FC5EC400 0003209A 5016FC46 8D0676FF .v..F•.P. ...á*•&á_i&.G8&.W:.F½. 000180
 0004CAC9 5F5E1F00 00E90000 B8000002 159AF876 FFFA76FF 0676FF08 76FFFA56 V•.v..v..v•.v½.....|..Õ...^_èò.. 0001A0
 C700000E 46C7002F DC46C708 46890A46 89000088 D88E05C9 881E5657 000030C8 àO..WV.|è..Ä|...FÖ.FÄúFÉ/.úFß..ú 0001C0
 E446C700 0005D99A 5016F246 8D0C76FF 0E76FFEE 4689F046 89000088 0000E846 Fò..|...Fþ.FÝ.v..v..F·.P.\...úFõ 0001E0

Dump of file SATURN:[PCCOMMON.DUMP.DLL]SA-DIFM.DLL;1 on 18-APR-1990 10:50:26.92
File ID (450,15,0)   End of file block 323 / Allocated 324

Virtual block number 68 (00000044), 512 (0200) bytes

 468D5016 D0468D50 16EA468D DC76FFDE 76FF0876 FF0A76FF 0C76FF0E 76FF0000 ...v..v..v..v..vß.vÉ.Fõ.P.FÅ.P.F 000000
 30D44689 0000FFFF 9A501606 468D5016 EC468D50 16E6468D 5016E046 8D5016F8 ½.P.FÅ.P.FÌ.P.F$.P.F•.P......Få= 000020
 8BE90374 06EA7E83 021EE903 75024608 D0468802 8DE9D446 880006E9 03750000 ..u.Õ...FåÕ§..FÅ.F•u.Õ...~õ.t.ÕE 000040
 D4468800 06E90375 00047E83 D4468900 00085C9A 5016D846 8DD076FF D276FF00 ..v•.vÅ.FÅ.P.\....Få.~å.u.Õ...Få 000060
 0000074B 9A006AD8 76FFDA76 FF5016E8 468D0015 E90375DA 460BD846 8B0287E9 õ...FÅ.FÕu.Õ...FÒ.P.vÕ.vÄj..K... 000080
 5F526850 16EE468D 0064E9D8 46890A46 890000B8 000CE903 7578E87E 830AC483 .á..~Òxu.Õ..|...FÖ.FÄÕd..FÝ.PhR  0000A0
 E9D4468B 0006E903 7500047E 83D44689 0CC48300 00089C9A 006AD876 FFDA76FF .vÕ.vÄj.......á..Få.~å.u.Õ...FåÕ 0000C0
 830000FF FF9A006A EE76FFF0 76FF5016 E8468D00 2FE90375 F0460BEE 46880228 (..FÝ.Fþu.Õ/..FÒ.P.vþ.vÝj....... 0000E0
 E9EA468B DA5689D8 4689F056 88EE4688 000CE903 7577E87E 830001EA 46C70AC4 á.úFõ...~Òwu.Õ...FÝ.Vþ.FÅ.VÕ.FõÕ 000100
 D4468900 00FFFF9A 5016D846 8DD076FF D276FF00 13E90374 DA460B08 468800FA •..FÅ.FÕt.Õ...v•.vÅ.FÅ.P......Få 000120
 C70045E9 0008E446 C70026E9 D6468800 EAE90003 E9037477 E87E8300 04E446C7 úFõ...~Òwt.Õ..Õõ..F•Õ&.úFõ..ÕE.ú 000140
 00012000 27E9002A E9002DE9 0005E446 C70035E9 0006E446 C70030E9 0007E446 Fõ..Õ=.úFõ..Õ5.úFõ..Õ-.Õ*.Õ'.-.. 000160
 07AF07C7 07BF07B7 07AF07C7 07A707A7 07E0A7FF 2E93C003 FFEFE903 7600093D =..v.Õÿ..á...ÌÅ.Ì.Ì.ú.£.ñ.¢.ú.£. 000180
 E90004E4 46C70446 890000FF FF9A5016 D8468D00 76FFD276 FF0094E9 07B707BF ¢.ñ.Õ...v•.vÅ.FÅ.P......FåúFõ..Õ 0001A0
 46C70008 E9037401 EC7E83D4 46890000 FFFF9A50 16D8468D D076FFD2 76FF0079 y..v•.vÅ.FÅ.P......Få.~$.t.Õ..úF 0001C0
 003BE901 00E90000 880006E9 0007E446 C70008E9 037402EC 7E830017 E90008E4 õ..Õ...~$.t.Õ..úFõ..Õ..|..Õ..Õ;. 0001E0
```

```
Dump of file SATURN:[PCCOMMON.DUMP.DLL]SA-DIFM.DLL;1 on 18-APR-1990 10:50:26.92
File ID (450,15,0)   End of file block 323 / Allocated 324

Virtual block number 69 (00000045), 512 (0200) bytes

 3D00012D 001FE900 22E90025 E9D44689 0000FFFF 9A501608 468DD076 FFD276FF .v@.vÅ.FÅ.P......FåÕX.Õ".Õ..-..* 000000
 5016F646 8D085008 66081208 1207F707 72087FA7 FF2E93C0 03FFEFE9 03760005 ..v.Õÿ..á...Ì..r.¼.....f.P..F-.P 000020
 46880006 E9037500 0030D446 890CC483 00000472 9A006AD8 76FFDA76 FF5DC568 hé].vÕ.vÅj..r....á..Få=..u.Õ...F 000040
 76FF0A76 FF501606 468D007E E90097E9 00008800 06E90374 00F67E83 00A6E904 åÕI..—.t.Õ..¡..Õ..Õ-..Fø.P.v..v 000060
 04E446C7 0058E903 75000030 0CC483FF FF00619A 6077FF26 6F77FF26 F25EC408 .á^·&.wo&.wm.a....á.=..u.ÕX.úFÕ. 000080
 C70035E9 0006E446 C70030E9 0007E446 C70045E9 0008E446 C70026E9 D6468800 ..FøÕ&.úFÕ..ÕE.úFÕ..Õ=.ú.Õ..Õ5.ú 0000A0
 0930A7FF 2E93C003 FFEFE903 76000930 00012000 27E9002A E9002DE9 0005E446 FÕ..Õ-.Õ*.Õ'.-..=..v.Õÿ..  ..Ì0. 0000C0
 9A006AE4 76FF0C76 FF0E76FF 0907090F 08FF0917 090F0907 08FF0917 08F708F7 ¼.¼..................v..v.. ·5j.. 0000E0
 0E76FFD8 8E061888 1E565700 000AC800 0ECAC95F 5E1F0000 E9000088 0000FFFF ....¡..Õ...^_èò..à...WV.¡...Ä.v. 000100
 89F84689 14578826 12478826 695FC426 FC5EC400 0006499A 5016FC46 8D0C76FF .v..F=.P.I...á^=&á_i&.G.&.W..F½. 000120
 0030F646 890CC483 00000719 9A006AF8 76FFFA76 FF5E8868 0876FF0A 76FFFA56 V*.v..v.h.^.v*.v½j.......á..F-=. 000140
 E90000B8 0006E9F6 468806C4 83041703 039A0C76 FF0E76FF 006A0016 E9037500 .u.Õ..j..v..v.......á..F-Õ..¡..Õ 000160
 5016FC46 8D0C76FF 0E76FF08 8E096988 1E565700 0020C800 0ECAC95F 5E1F0000 ...^_èò..à ..WV.¡i..Ä.v..v..F=.P 000180
 57882612 47882 6F6 5EC4F856 89F64689 68578826 69478826 FC5EC400 0009799A .y...á^=&.Gi&.Wk.F-.V½á^-&.G.&.W 0001A0
 9A006AF2 76FFF476 FF5E9C68 0000FFFF 9A016A0C 76FF0E76 FFF45689 F2468914 ..F·.V¶.v..v.j......h.^.v¶.v·j.. 0001C0
 8309C103 039A0C76 FF0E76FF 006A0016 E9037500 0030E046 8908C483 000009A4 É....á..FÅ=..u.Õ..j..v..v....ê.. 0001E0

Dump of file SATURN:[PCCOMMON.DUMP.DLL]SA-DIFM.DLL;1 on 18-APR-1990 10:50:26.92
File ID (450,15,0)   End of file block 323 / Allocated 324

Virtual block number 70 (00000046), 512 (0200) bytes

 32478926 000088F6 5EC41247 89261447 89260000 88F65EC4 00B7E9E0 468806C4 á..FÅÕñ.á^-¡..&.G.&.G.á^-¡..&.G2 000000
 C726F65E C400001A 47C726F6 5EC43447 89263647 89260000 88F65EC4 30478926 &.G0á^-¡..&.G6&.G4á^-&úG...á^-&ú 000020
 28478926 2A478926 000088F6 5EC42447 89262647 89260000 88F65EC4 00001C47 G...á^-¡..&.G&&.G$á^-¡..&.G*&.G( 000040
 FF0000FF FF9A1076 FF1276FF 0C76FF0E 76FF2C47 89262E47 89260000 88F65EC4 á^-¡..&.G.&.G,.v..v..v..v....... 000060
 000004EC 9A5016FA 468D5016 E2468DFC 76FFFE76 FF04D968 04D6680C 76FF0E76 v..v.hø.h)..v±.v•.Fã.P.F*.P.&... 000080
 1F0000E9 00008800 0005059A 5016E246 8D0C76FF 0E76FF00 10E90375 00FA7E83 .-*.u.Õ...v..v..Fã.P.....¡..Õ... 0000A0
 09F19A50 16FC468D 0C76FF0E 76FFD88E 09E1881E 56570000 20C8000E CAC95F5E ^_èò..à ..WV.¡Ä..Ä.v..v..F•.P.þ. 0000C0
 46891457 88261247 8826F65E C4F85689 F6468968 57882669 47882 6FC 5EC40000 ..á^=&.Gi&.Wk.F-.V½á^-&.G.&.W..F 0000E0
 006AF276 FFF476FF 5DC36800 6A006A00 000A209A 016A0C76 FF0E76FF F45689F2 ·.V¶.v..v.j.. ...j.j.hû].v¶.v·j. 000100
 9A1076FF 1276FF0C 76FF0E76 FF0017E9 03750000 30E04689 0CC48300 000A309A .0....á..FÅ=..u.Õ...v..v..v..v.. 000120
 89260000 88F65EC4 12478926 14478926 000088F6 5EC40087 E9E04688 00000C00 .....FÅÕñ.á^-¡..&.G.&.G.á^-¡..&. 000140
 F65EC400 001A47C7 26F65EC4 34478926 36478926 000088F6 5EC43047 89263247 G2&.G0á^-¡..&.G6&.G4á^-&úG...á^- 000160
 89262A47 89260000 88F65EC4 24478926 26478926 000088F6 5EC40000 1C47C726 &úG...á^-¡..&.G&&.G$á^-¡..&.G*&. 000180
 000ACB9A 1076FF12 76FF0C76 FF0E76FF 2C478926 2E478926 000088F6 5EC42847 G(á^-¡..&.G.&.G,.v..v..v..v..ù.. 0001A0
 0AEC9A50 16FA468D 5016E246 8DFC76FF FE76FF0A D9680AD6 680C76FF 0E76FF00 ..v..v.hø.h)..v±.v•.Fã.P.F*.P.&. 0001C0
 00E90000 B800000B 059A5016 E2468D0C 76FF0E76 FF0010E9 037500FA 7E830000 ...-*.u.Õ...v..v..Fã.P.....¡..Õ. 0001E0

Dump of file SATURN:[PCCOMMON.DUMP.DLL]SA-DIFM.DLL;1 on 18-APR-1990 10:50:26.92
File ID (450,15,0)   End of file block 323 / Allocated 324

Virtual block number 71 (00000047), 512 (0200) bytes

 9A5016FC 468D0676 FF0876FF D88E081E 881E5657 000004C8 000ECAC9 5F5E1F00 ..^_èò..à...WV.¡...Ä.v..v..F=.P. 000000
 00880000 05FF9A60 77FF2662 77FF2669 5FC426FC 5EC40676 FF0876FF 0000082E .....v..v.á^=&á_i&.wb&.w'.....¡. 000020
 F2468D0C 76FF0E76 FFD88E0C 60881E56 57000026 C80004CA C95F5E1F 0000E900 .Õ...^_èò..à&..ŨV.¡'..Ä.v..v..F· 000040
 006A006A 006A006A E65689E4 46896857 88266947 8826F25E C400000C 709A5016 .P.p...á^·&.Gi&.Wk.Fõ.V[j.j.j.j. 000060
 76FF5016 E0468D50 16E8468D 5016EE46 8D5016F8 468D5016 EA468D50 16F6468D .F-.P.Fõ.P.F½.P.FŸ.P.FÒ.P.FÅ.P.v 000080
 DA468800 06E90375 0000300A 468928C4 83002212 EC9AF276 FFF476FF 0876FF0A ..v..v¶.v·.&.".á(.Fö=..u.Õ...FÖ 0000A0
 E90375E2 460BE046 8808C483 0C181475 9AE476FF E676FFE0 76FFE276 FF0107E9 Õ...vã.vÅ.vl.vÕ.u....á..FÅ.Fãu.Õ 0000C0
 E276FF5D CC680876 FF0A76FF 0000E903 7403E87E 830009E9 037504E8 7E8300E2 ã..-Õ.u.Õ...-Õ.t.ÕÅ..v..v.hä].vã 0000E0
 0C76FF0E 76FF006A 0010E903 7500003D DA46890C C4830000 00A09A00 6AE076FF .vÅj.......á..FÖ=..u.Õ..j..v..v. 000100
 8D000008 909A1076 FF1276FF 0C76FF0E 76FF009C E90A4688 06C48300 8D03039A ...§..á..FÖÕ...v..v..v..v....... 000120
 E9037500 0030DA46 890CC483 00000871 9A006AE0 76FFE276 FF5E8E68 5016F846 F½.Ph.^.vã.vÅj..q....á..FÖ=..u.Õ 000140
 568BEA46 88E45EC4 0052E9DA 468806C4 830A4003 039A0C76 FF0E76FF 006A0016 ..j..v..v....M..á..FÖÕR.á^Õ.FÕ.V 000160
 8926F646 88E45EC4 00002A47 C7260001 2847C726 E45EC426 57892624 478926EC &&.G$&.W&á^Õ&úG(..&úG*..á^Õ.F-&. 000180
 9ADC76FF DE76FF0C 76FF0E76 FFDE5689 0C46896A 57882668 47882 6E4 5EC41A47 G.á^Õ&.Gh&.Wj.FÉ.VB.v..v..vB.vÉ. 0001A0
 0876FFD8 8E0CA388 1E565700 0004C800 0ECAC95F 5E1F0000 E9000088 00000C8A ....¡..Õ...^_èò..à...WV.¡É..Ä.v. 0001C0
 FF266677 FF26695F C426FC5E C40676FF 0876FF00 000CB39A 5016FC46 800676FF .v..F=.P.°....v..v.á^=&á_i&.wf&. 0001E0
```

```
Dump of file SATURN:[PCCOMMON.DUMP.DLL]SA-DIFM.DLL;1 on 18-APR-1990 10:50:26.92
File ID (450,15,0)   End of file block 323 / Allocated 324

Virtual block number 72 (00000048), 512 (0200) bytes

 D88E0E29 B81E5657 000026C8 0004CAC9 5F5E1F00 00E90000 B800000E 109A6477 wd.....¡..Õ...^_èò..à&..WV.¡)..Ä 000000
 5689E446 89685788 26694788 26F25EC4 00000E39 9A5016F2 46800C76 FF0E76FF .v..v..F·.P.9..¯á^·&.Gi&.Wk.Fò.V 000020
 E8468050 16EE468D 5016F846 8D5016EA 468D5016 F6468000 6A006A00 6A006AE6 ìj.j.j.j..F-.P.Fõ.P.F½.P.FŸ.P.FÒ 000040
 0030DA46 8928C483 0EE812EC 9AF276FF F476FF08 76FF0A76 FF5016E0 46805016 .P.FÀ.P.v..v..v¶.v·.š.Š..á(.FÖ=. 000060
 08C4830C FD14759A E476FFE6 76FFE076 FFE276FF 00E6E90A 46880006 E9037500 .u.Õ...FÖÕl..vã.vÀ.vl.võ.u.»..á. 000080
 0A76FF00 AFE90374 03E87E83 0009E903 7504E87E 8300C1E9 0375E246 08E0468B .FÀ.Fãu.Õè..~Õ.u.Õ...~Õ.t.Õ€..v. 0000A0
 06E90375 0000300A 46890CC4 8300000F 489A006A E076FFE2 76FF5DCC 680876FF .v.hä].vã.vÀj..H....á..FÖ=..u.Õ. 0000C0
 890CC483 00000056 9A006AE0 76FFE276 FF5E8E68 5016F846 8D008BE9 DA468800 ..FÖÕ...F½.Ph.^.vã.vÀj..V....á.. 0000E0
 0052E90A 468806C4 83007303 039A0C76 FF0E76FF 006A0016 E9037500 0030DA46 FÖ=..u.Õ..j..v..v....s..á..FÖÕR. 000100
 00002A47 C7260001 2847C726 E45EC426 57892624 478926EC 5688EA46 88E45EC4 á^õ.Fõ.V$&.G$&.W&á^Õ&ùG(..&ùG*.. 000120
 76FF0E76 FFDE5689 DC46896A 57882668 478826E4 5EC41A47 8926F646 88E45EC4 á^õ.F-&.G.á^Õ&.Gh&.Wj.FÉ.VB.v..v 000140
 1E565700 000EC800 0ECAC95F 5E1F0000 E9000088 00000E53 9A0C76FF DE76FF0C ..vB.vÉ.S...¡..Õ...^_èò..à...WV. 000160
 0677FF26 695FC426 FC5EC400 000E7C9A 5016FC46 8D0C76FF 0E76FFD8 8E0E6C88 ¡l..Ä.v..v..F=.P.|..¯á^=&á_i&.w. 000180
 F846892A 57882628 47882669 5FC426FC 5EC40000 01829A50 16F4468D 0477FF26 &.w..F¶.P.ý...á^=&á_i&.G(&¯W*.F½ 0001A0
 16E90375 000030F2 468908C4 83000010 5F9A006A F476FFF6 76FF5DCA 68FA5689 .V*hò].v-.v¶j..¯....á..F·=..u.Õ. 0001C0
 0A76FFF8 76FFFA76 FF007AE9 F2468806 C483107C 03039A0C 76FF0E76 FF006A00 .j..v..v....|..Ž..F·Öz..v*.v½.v. 0001E0

Dump of file SATURN:[PCCOMMON.DUMP.DLL]SA-DIFM.DLL;1 on 18-APR-1990 10:50:26.92
File ID (450,15,0)   End of file block 323 / Allocated 324

Virtual block number 73 (00000049), 512 (0200) bytes

 16E90375 000030F2 468910C4 83000010 939A006A F476FFF6 76FF5E8A 680876FF .v.h.^.v-.v¶j.......á..F·=..u.Õ. 000000
 F476FFF6 76FF5DCA 68003AE9 F2468806 C48310B0 03039A0C 76FF0E76 FF006A00 .j..v..v.... ..á..F·Ö:.hò].v-.v¶ 000020
 03039A0C 76FF0E76 FF006A00 16E90375 000030F2 468908C4 8300000F 1F9A006A j.......á..F·=..u.Õ..j..v..v.... 000040
 B81E5657 000026C8 000ECAC9 5F5E1F00 00E90000 B80006E9 F2468806 C4830F65 e..á..F·Õ..¡..Õ...^_èò..à&..WV.¡ 000060
 89685788 26694788 26FC5EC4 00000FE1 9A5016FC 46800C76 FF0E76FF D88E0FD1 1..Ä.v..v..F=.P.Ä..¯á^=&.Gi&.Wk. 000080
 77FF2606 77FF26F2 5EC4FA56 89F84689 2A578826 28478826 F25EC4F4 5689F246 F·.V¶á^·&.G(&.W*.F½.V*á^·&.w.&.w 0000A0
 76FF5E92 680876FF 0A76FF50 16F8468D 5016EC46 8D00000F FA9A5016 EE468004 ..FŸ.P.*....F$.P.F½.P.v..v.h.^.v 0000C0
 76FF0E76 FF006A00 16E90375 0000300A 468914C4 83000010 1F9A006A EE76FFF0 Þ.vŸj.......á..FÖ=..u.Õ..j..v..v 0000E0
 C6680C76 FF0E76FF 004EE903 7500EC7E 83006EE9 DA468806 C483103C 03039A0C ....<..á..FÖÕn..-$.u.ÕN..v..v.hó 000100
 E9037500 F67E8300 000C2E9A 5016F646 8D50160C 468DFC76 FFFE76FF 0C18680E .h...v±.v=.FÉ.P.F-.P......—.u.Õ 000120
 889A1076 FF1276FF 0C76FF0E 76FF0000 0C479A50 160C468D 0C76FF0E 76FF0010 ...v..v..FÉ.P.G....v..v..v..v... 000140
 5F5E1F00 00E90000 B82A5789 26284789 26FA5688 F84688F2 5EC40011 E9000000 ...Õ..á^·.F½.V*&.G(&.W*¡..Õ...^_ 000160
 000010E0 9A5016FC 46800676 FF0876FF 088E1000 B81E5657 00004EC8 000ECAC9 èò..àN..WV.¡À..Ä.v..v..F=.P.Å..¯ 000180
 89824689 52578826 50478826 865EC488 56898646 89685788 26694788 26FC5EC4 á^=&.Gi&.Wk.FÑ.V¡á^Ñ&.GP&.WR.Fý. 0001A0
 6A50168A 468D1081 686177FF 26FC5EC4 000003E7 9A426A50 168A468D 206A8456 VÇj .F¤.PjB.Ó...á^=&.wahŸ..F¤.Pj 0001C0
 1F0000E9 00008800 000F889A B276FF84 76FF0676 FF0876FF 000003FF 9A006A00 .j.......v..v..vÇ.vý.|...|..Õ... 0001E0

Dump of file SATURN:[PCCOMMON.DUMP.DLL]SA-DIFM.DLL;1 on 18-APR-1990 10:50:26.92
File ID (450,15,0)   End of file block 323 / Allocated 324

Virtual block number 74 (0000004A), 512 (0200) bytes

 76FF0000 FF5686C7 0064FF54 86C7D88E 11DC881E 56570000 ACC80004 CAC95F5E ^_èò..à¯..WV.¡É..Äú.T.d.ù.V....v 000000
 7A9689FF 78868968 57882669 478826F8 5EC40000 11EC9A50 16F8468D 0C76FF0E ..v..F½.P.$...á^½&.Gi&.Wk..x...z 000020
 5016FF7C 86805016 D8468000 6A006A00 6A006A00 6A006A00 6A006A00 6A006AFF .j.j.j.j.j.j.j.j.j.j..FÄ.P..|..P 000040
 0030FF66 868928C4 8314EC12 EC9AF876 FFFA76FF 0876FF0A 76FF5016 FF70868D ..p..P.v..v..v*.v½.$.š..á(..f.=. 000060
 049EE900 00880006 E90374FF 728608FF 70868804 81E9FF66 86880007 E9037500 .u.Õ....f.ÕŸ...p...r.t.Õ..¡..Õ.. 000080
 03750000 30FF6686 890AC483 0000135F 9A006AFF 7086FFFF 7286FF50 1606468D .F#.P.Ñr..Ñp.j.........á...f.=..u. 0000A0
 FFFF7286 FF5F5268 5016EC46 8D00A8E9 03747806 7E830474 E9FF6686 880007E9 Õ....f.Õt..-#xt.Õ¯..F$.PhR_.Ñr.. 0000C0
 043EE9FF 66868800 07E90375 000030FF 6686890C C4830000 14299A00 6AFF7086 Ñp.j..)....á...f.=..u.Õ...¯f.Õ>. 0000E0
 E9037500 0030FF66 86890AC4 83000006 EC9A006A EC76FFEE 76FF5016 FF60868D ..'..P.vŸ.v$j..$....á...f.=..u.Õ 000100
 46880011 E9037577 FF608E83 0018E903 75EE4608 EC468804 15E9FF66 86880007 ....f.Õ...F$.FŸu.Õ.../'.wu.Õ...F 000120
 F85EC400 0013F39A 426A5016 9446B022 6A002CE9 FF729689 FF708689 EE5688EC $.VŸ..p...r.Õ,.j".F..PjB.µ...á^½ 000140
 7E830047 E903C3E9 00008800 0014089A 006A006A 50169446 8D1D8168 6177FF26 &.wahŸ..F..Pj.j.......|..Õù.ÕG..~ 000160
 50169446 80226A00 2CE90375 7CD67E83 0035E903 757B067E 83003EE9 03757AD6 #zu.Õ>..-#(u.Õ5..-#|u.Õ,.j".F..P 000180
 B8000012 349A006A 006A5016 9446B010 B1686177 FF26F85E C4000012 1C9A426A jB.....á^½&.wahŸ..F..Pj.j..4...| 0001A0
 0CC48300 0015279A 006AFF70 B6FFFF72 B6FF5DCF 680876FF 0A76FF03 79E90000 ..Õy..v..v.hÜ].Ñr..Ñp.j..'....á. 0001C0
 89065788 26044788 26FF789E C40348E9 FF668688 0007E903 7500003D FF668689 ..f.=..u.Õ....f.ÕK.á.x.&.G.&.W.. 0001E0
```

```
Dump of file SATURN:[PCCOMMON.DUMP.DLL]SA-DIFM.DLL;1 on 18-APR-1990 10:50:26.92
File ID (450,15,0)   End of file block 323 / Allocated 324

Virtual block number 75 (0000004B), 512 (0200) bytes

 FFFF9A50 16FF5C86 8DFF54B6 FFFF5686 FFFF6286 FFFF6486 FFFF6496 89FF6286 .b...d..Ād..Āb..ĀV..ĀT...\..P... 000000
 868DFF62 B6FFFF64 86FF0302 E9037400 FF5E8E83 030CE903 7402FF5C 8E830000 .../\..t.Ō.../^..t.Ō...Ād..Āb... 000020
 26F85EC4 0000FFFF 9A5016FF 6C868DFF 6286FFFF 64B6FF00 0011179A 5016FF74 t..P......Ād..Āb...l..P.....á^½& 000040
 8906C483 08DF0000 9AF876FF FA76FF18 6AFF6A96 89FF6886 8906578B 2604478B .G.&.W...h...j.j..v*.v½...Ō..á.. 000060
 C483116F 14759AFF 7886FFFF 7AB6FF00 6A006A00 2CE90375 00FF668E 83FF6686 .f../f..u.Ō,.j.j..Āz..Āx..u.o..á 000080
 5EC45016 F0468D02 85E9FF66 868B0000 11AF9A10 76FF1276 FF0C76FF 0E76FF08 ..v..v..v..v..£.....f.Ō...Fb.Pá^ 0000A0
 868910C4 83000015 6F9A006A FF6CB6FF FF6EB6FF 27106804 77FF2606 77FF26F8 ½&.w.&.w.h.'.Ān..Āl.j..o....á... 0000C0
 30E9FF66 868B0000 158E9A04 77FF2606 77FF26F8 5EC40017 E9037500 003DFF66 f.=..u.Ō..á^½&.w.&.w........f.Ō= 0000E0
 379A006A FF74B6FF FF76B6FF 27106804 77FF2606 77FF26F8 5EC45016 FC468D02 ..F=.Pá^½&.w.&.w.h.'.Āv..Āt.j..7 000100
 15C29A04 77FF2606 77FF26F8 5EC40017 E9037500 003DFF66 868910C4 83000011 ....á...f.=..u.Ō..á^½&.w.&.w..ó. 000120
 003DFF66 86890000 FFFF9A50 16F4468D 6777FF26 F85EC401 F5E9FF66 868B0000 ....f.Ō%.á^½&.wg.F¶.P.......f.=. 000140
 6AB6FF01 C1E9FF66 868B0000 04909A04 77FF2606 77FF26F8 5EC40017 E9037500 .u.Ō..á^½&.w.&.w........f.Ōè..Āj 000160
 76FFF676 FF37FF26 0277FF26 F85EC4FC 76FFFE76 FFF076FF F276FFFF 68B6FFFF ..Āh..v·.vb.v±.v=á^½&.w.&.7.v-.v 000180
 00FFFF9A FF68B6FF FF6AB6FF 0043E903 7500FF66 BE83FF66 86890000 FFFF9AF4 ¶.......f../f..u.ŌC..Āj..Āh..... 0001A0
 08C48316 E914759A FF78B6FF FF7AB6FF 006A006A 0000169C 9AF476FF F676FF00 ..v-.v¶.....j.j..Āz..Āx..u.Ō..á. 0001C0
 80468DF4 76FFF676 FF0147E9 0001B800 00175E9A 1076FF12 76FF0C76 FF0E76FF .v..v..v..v..^...¡..ŌG..v-.v¶.F. 0001E0

Dump of file SATURN:[PCCOMMON.DUMP.DLL]SA-DIFM.DLL;1 on 18-APR-1990 10:50:26.92
File ID (450,15,0)   End of file block 323 / Allocated 324

Virtual block number 76 (0000004C), 512 (0200) bytes

 FFFF9A00 6A776A50 16FF5886 8D8076FF 8276FFF8 76FFFA76 FF000014 959A5016 .P......v*.v½.v..v...X..Pjwj.... 000000
 868B0000 16CF9AFF 68B6FFFF 6AB6FF00 14E90375 00003DFF 66868910 C4830000 ...á...f.=..u.Ō...Āj..Āh..ü..... 000020
 FF58B6FF FF5AB6FF 50C06850 16DC468D 0000FFFF 9AF476FF F676FF00 F9E9FF66 f.Ō*..v-.v¶......FÉ.Phâ].ĀZ..ĀX. 000040
 259AFF68 B6FFFF6A B6FF0014 E9037500 003DFF66 86890CC4 83000013 369A006A j..6....á...f.=..u.Ō...Āj..Āh..% 000060
 76FF08C4 8316F514 759AFF78 B6FFFF7A B6FF006A 006A00B4 E9FF6686 8B000017 .....f.ŌÇ.j.j..Āz..Āx..u.%..á..v 000080
 00001185 9A5016FF 7E868050 1684468D F876FFFA 76FF1172 6812C568 0C76FF0E ..v.hé.hr..v*.v½.F..P..-..P..... 0000A0
 005EE9FF 66868800 0017399A FF68B6FF FF6AB6FF 0014E903 7500003D FF668689 ..f.=..u.Ō...Āj..Āh..9.....f.Ō^. 0000C0
 00119E9A 50168446 800C76FF 0E76FFFF 66868900 0015469A FF68B6FF FF6AB6FF .Āj..Āh..F.....f..v..v..F..P.... 0000E0
 000013A9 9A426A50 1694468D 216A0000 14FE9A10 76FF1276 FF0C76FF 0E76FF00 ..v..v..v..v..±...jl.F..PjB.`... 000100
 5E1F0000 E900008B 000013C1 9A006A00 6A501694 468D1D81 686177FF 26F85EC4 á^½&.wahÝ..F..Pj.j..ê...¡..Ō...^ 000120
 00127A9A 5016FC46 8D0676FF 0876FFD8 8E125E88 1E565700 000CC800 0ECAC95F _èò..à...WV.¡^..Ä.v..v..F=.P.z.. 000140
 2B14759A F876FFFA 76FF006A 006AFA56 89F84689 68578826 69478826 FC5EC400 ‾á^=&.Gi&.Wk.F½.V*j.j..v*.v½.u.+ 000160
 76FFF676 FF0676FF 0876FFF6 5689F446 89565788 26544788 26F85EC4 08C48316 ..á.á^½&.GT&.WV.F¶.V-.v..v..v-.v 000180
 C7D88E17 9D881E56 570000AC C80004CA C95F5E1F 0000E900 00B80000 12459AF4 ¶.E...¡..Ō...^_èò..à˜..WV.¡...Äú 0001A0
 8826F85E C4000017 AD9A5016 F8468D0C 76FF0E76 FF0000FF 5686C700 64FF5486 .T.d.ú.V....v.‾v..F½.P.Ù...á^½&. 0001C0
 006A006A 006A006A 006A006A 006A006A 006AFF7A 9689FF78 86896857 88266947 Gi&.Wk..x...z.j.j.j.j.j.j.j.j.j. 0001E0

Dump of file SATURN:[PCCOMMON.DUMP.DLL]SA-DIFM.DLL;1 on 18-APR-1990 10:50:26.92
File ID (450,15,0)   End of file block 323 / Allocated 324

Virtual block number 77 (0000004D), 512 (0200) bytes

 9AF876FF FA76FF08 76FF0A76 FF5016FF 70868050 16FF7C86 80501606 468D006A j..Fø.P..|..P..p..P.v..v..v*.v½. 000000
 860BFF70 868804B9 E9FF6686 8B0007E9 03750000 3DFF6686 8928C483 17CF12EC &.ü..á(..f.=..u.Ō....f.Ō¿...p... 000020
 00190C9A 006AFF70 B6FFFF72 B6FF5016 DA468D04 A6E90001 B80006E9 0374FF72 r.t.Ō..¡..Ōl..FÖ.P.Ār..Āp.j..... 000040
 00A8E903 74780A7E 83047CE9 FF668688 0007E903 7500003D FF668689 0AC48300 ..á...f.=..u.Ō....f.Ō|..-Ōxt.Ō˝. 000060
 003DFF66 86890CC4 83000016 B39A006A FF70B6FF FF72B6FF 5F526850 16F4468D .F¶.PhR_.Ār..Āp.j..°....á...f.=. 000080
 00001300 9A006AF4 76FFF676 FF5016FF 60868D04 46E9FF66 868B0007 E9037500 .u.Ō....f.ŌF...`..P.v-.v¶j...... 0000A0
 1BE90375 F6460BF4 4688041D E9FF6686 8B0007E9 03750000 3DFF6686 890AC483 .á...f.=..u.Ō....f.Ō...F¶.F-u.Ō. 0000C0
 468D226A 002CE9FF 729689FF 708689F6 5688F446 8B0011E9 037577FF 608E8300 ../'.wu.Ō...F¶.V-..p...r.Ō,.j".F 0000E0
 1A049A00 6A006A50 1694468D 1DB16861 77FF26F8 5EC40000 19EC9A42 6A501694 ..PjB.&...á^½&.wahÝ..F..Pj.j.... 000100
 00001AFD 9A006AFF 70B6FFFF 72B6FF5D CF680876 FF0A76FF 03CBE900 00B80000 ..¡..Ōü..v..v.hü].Ār..Āp.j..»... 000120
 88260447 8826FF78 9EC4039D E9FF6686 8B0007E9 03750000 3DFF6686 890CC483 .á...f.=..u.Ō....f.Ō..á.x.&.G.&. 000140
 5016FF5C 868DFF54 B6FFFF56 B6FFFF62 B6FFFF64 B6FFFF64 9689FF62 86890657 W...b...d..Ād..Āb..ĀV..ĀT...\..P 000160
 00001A29 9A426A50 1694468D 1F6A0029 E90374FF 5E8608FF 5C868800 00146E9A .n.....\...^.t.Ō).j..F..PjB.)... 000180
 01FF5CBE 830332E9 00001A41 9A006A00 6A501694 468D1D81 686177FF 26F85EC4 á^½&.wahÝ..F..Pj.j..A...Ō2../\.. 0001A0
 F85EC400 00176C9A 426A5016 9446B020 6A0029E9 037400FF 5EBE8300 33E90374 t.Ō3../^..t.Ō).j .F..PjB.l...á^½ 0001C0
 E9037402 FF5CBE83 02F5E900 0017849A 006A006A 50169446 8D1DB168 6177FF26 &.wahÝ..F..Pj.j......Ō%../\..t.Ō 0001E0
```

Dump of file SATURN:[PCCOMMON.DUMP.DLL]SA-DIFM.DLL;1 on 18-APR-1990 10:50:26.92
File ID (450,15,0)   End of file block 323 / Allocated 324

Virtual block number 78 (0000004E), 512 (0200) bytes

```
FF00001C 199A5016 FF74868D FF6286FF FF6486FF 02E1E903 7400FF5E BE8302E8 Š../^..t.õÄ..Ñd..Ñb...t..P...... 000000
68868906 578B2604 478B26F8 5EC40000 14A89A50 16FF6C86 8DFF62B6 FFFF64B6 Ñd..Ñb...l..P.´...á^½&.G.&.W...h 000020
037500FF 66BE83FF 66868906 C48314CA 00009AF8 76FFFA76 FF186AFF 6A9689FF ...j.j..vª.v½...ò..á...f../f..u. 000040
1276FF0C 76FF0E76 FF08C483 1C011475 9AFF7886 FFFF7AB6 FF006A00 6A002CE9 õ,.j.j..Ñz..Ñx..u....á..v..v..v. 000060
680477FF 260677FF 26F85EC4 5016EC46 8D0264E9 FF66868B 0000163D 9A1076FF .v..=.....f.õd..F&.Pá^½&.w.&.w.h 000080
0017E903 7500003D FF668689 10C48300 001B459A 006AFF6C B6FFFF6E B6FF2710 .'.Ñn..Ñl.j..E....á...f.=..u.õ.. 0000A0
26F85EC4 5016FC46 8D021CE9 FF66868B 00001864 9A0477FF 260677FF 26F85EC4 á^½&.w.&.w...d.....f.õ...F=.Pá^½& 0000C0
FF668689 10C48300 001C799A 006AFF74 B6FFFF76 B6FF2710 680477FF 260677FF .w.&.w.h.'.Ñv..Ñt.j..y....á...f. 0000E0
C401D4E9 FF66868B 00001898 9A0477FF 260677FF 26F85EC4 0017E903 7500003D =..u.õ..á^½&.w.&.w........f.õå.á 000100
26F85EC4 0017E903 7500003D FF668689 000015A6 9A5016F0 46806777 FF26F85E ^½&.wg.Fb.P.l......f.=..u.õ..á^½& 000120
76FFEE76 FFFF6886 FFFF6AB6 FF01A0E9 FF66868B 00001C50 9A0477FF 260677FF .w.&.w..P......f.õ...Ñj..Ñh..vY.v 000140
FF668689 000015F2 9AF076FF F276FF37 FF260277 FF26FB5E C4FC76FF FE76FFEC &.v±.v=á^½&.w.&.7.v·.vb.´.....f. 000160
1C629AF0 76FFF276 FF000016 009AFF68 B6FFFF6A B6FF0033 E9037500 FF66BE83 ./f...u.õ3..Ñj..Ñh.......v·.vb.b. 000180
F276FF01 36E9FF66 868B08C4 831CAF14 759AFF78 B6FFFF7A B6FF006A 006A0000 ..j.j..Ñz..Ñx..u.£..á...f.õ6..v· 0001A0
6A5016FF 58868D80 76FF8276 FFF876FF FA76FF00 0016539A 50168046 8DF076FF .vb.F..P.S.....vª.v½.v..v...X..Pj 0001C0
9AFF6886 FFFF6AB6 FF0014E9 03750000 30FF6686 8910C483 0000166E 9A006A77 wj..n....á...f.=..u.õ...Ñj..Ñh.. 0001E0
```

Dump of file SATURN:[PCCOMMON.DUMP.DLL]SA-DIFM.DLL;1 on 18-APR-1990 10:50:26.92
File ID (450,15,0)   End of file block 323 / Allocated 324

Virtual block number 79 (0000004F), 512 (0200) bytes

```
B6FF5DC0 6850160C 468D0000 16189AF0 76FFF276 FF00E8E9 FF66868B 00001C95 ......f.õò..v·.vb......FÉ.Phä].Ñ 000000
FF6AB6FF 0014E903 7500003D FF668689 0CC48300 0018E39A 006AFF58 B6FFFF5A Z..ÑX.j..D....á...f.=..u.õ...Ñj. 000020
BB14759A FF7886FF FF7AB6FF 006A006A 00A3E9FF 66868B00 001CEB9A FF68B6FF .Ñh..Š.....f.õE.j.j..Ñz..Ñx..u.£ 000040
16FF7E86 8D501684 468DF876 FFFA76FF 16F86818 72680C76 FF0E76FF 08C4831C ..á..v..v.hr.h½..vª.v½.F..P..-.. 000060
88000016 8A9AFF68 B6FFFF6A B6FF0014 E9037500 0030FF66 86890000 170C9A50 P.......f.=..u.õ...Ñj..Ñh....... 000080
84468D0C 76FF0E76 FFFF6686 8900001B 1C9AFF68 B6FFFF6A B6FF004D E9FF6686 .f.õM..Ñj..Ñh.........f..v..v..F. 0000A0
8D1DB168 6177FF26 F85EC400 0019569A 426A5016 94468D21 6A000017 4D9A5016 .P.M...j!.F..PjB.V...á^½&.wahY.. 0000C0
56570000 30C8000E CAC95F5E 1F0000E9 00008800 00196E9A 006A006A 50169446 F..Pj.j..n...j..õ...^ èò..à0..WV 0000E0
FF26FC5E C4000018 279A5016 FC468D06 76FF0876 FF0000E4 46C7D88E 1808881E .j...ÄùFõ....v..v..F=.P.'....á^=&. 000100
6A006AF6 5689F446 89685788 26694788 26FC5EC4 00001B7C 9A5016F8 46806777 wg.F½.P.|....á^=&.Gi&.Wk.F¶.V-j.j 000120
E85689E6 46890657 8B260447 8B26FC5E C408C483 1D091475 9AF476FF F676FF00 ..v-.v¶.u.l..á.á^=&.G.&.W..Fl.Vò 000140
006A006A 0029E903 7500E47E 83E44689 06C4831A A000009A FC76FFFE 76FF196A j..v±.v=......á..Fõ.-õ.u.õ).j.j. 000160
8800001A D49AD076 FFD276FF 0676FF08 76FF08C4 831AC214 759AF476 FFF676FF .v-.v¶.u.õ..á..v..v..vª.´Ä.å.... 000180
00003DE4 46890000 FFFF9A50 16D4468D 6377FF26 6577FF26 FC5EC402 1EE9E446 Fõò..á^=&.we&.wc.Få.P.....Fõ=.. 0001A0
2AE90374 D6460BD4 468801ED E9E4468B 00001F35 9AE676FF E876FF00 11E90375 u.õ...vò.vl.5....FõòÜ..Få..´t.õ* 0001C0
E90374E2 460BE046 880014E9 03740E46 08DC4688 001FE903 740A460B D8468800 ..FÄ.Fõt.õ...FÉ.FBt.õ...FÄ.Fät.õ 0001E0
```

Dump of file SATURN:[PCCOMMON.DUMP.DLL]SA-DIFM.DLL;1 on 18-APR-1990 10:50:26.92
File ID (450,15,0)   End of file block 323 / Allocated 324

Virtual block number 80 (00000050), 512 (0200) bytes

```
76FFFA76 FF37FF26 0277FF26 FC5EC4E6 76FFE876 FF000120 47C726F4 5EC40009 ..á^¶&úG ...vò.vlá^=&.w.&.7.vª.v 000000
FFE876FF 00001FFB 9AF876FF FA76FF00 31E90375 00003DE4 46890000 FFFF9AF8 ½......Fõ=..u.õ1..vª.v½.«....vò. 000020
E9E4468B 06C48320 0803039A 6377FF26 6577FF26 FC5EC400 6A00001B E39AE676 vl.D....j.á^=&.we&.wc.... .á..Fõò 000040
76FFE876 FF000BE9 037500EE 7E830000 FFFF9A50 16EE468D E676FFE8 76FF0161 a..vò.vl.FY.P......-Y.u.õ...vò.v 000060
0004589A 5016EA46 8DF876FF FA76FF00 0004439A F876FFFA 76FF0000 FFFF9AE6 l......vª.v½.C.....vª.v½.Fõ.P.X.. 000080
006A7A6A 5016F046 8DEA76FF EC76FFFC 76FFFE76 FF006A00 E7E90374 00003D00 .=..t.õõ.j..v±.v=.vå.võ.Fb.Pjzj. 0000A0
76FF0000 FFFF9AF8 76FFFA76 FF001CE9 03750000 3DE44689 12C48300 001C349A .4....á..Fõ=..u.õ...vª.v½......v 0000C0
458D68E6 76FFE876 FF006A00 6A006A00 6A0004E9 E4468800 001F729A E676FFE8 õ.vl.r....Fõõå.j.j.j.j..vò.vlh.E 0000E0
76FFE876 FF0025E9 03750000 3DE44689 14C48300 001F9E9A 006AEA76 FFEC76FF .vå.võj.......á..Fõ=..u.õ%..vò.v 000100
0083E9E4 46880000 1FF09AE6 76FFE876 FF000BE9 037500EE 7E830000 1FB79AE6 l.Ñ....-Y.u.õ...vò.vl.b....Fõõ.. 000120
0011E903 7500003D E446890A C4830000 198C9A00 6AF076FF F276FF5D C768006A j.hùj.v·.vbj........á..Fõ=..u.õ.. 000140
006A006A 1677FF26 1877FF26 F45EC400 52E9E446 8800001C FF9AE676 FFE876FF .vò.vl.......FõõR.á^¶&.w.&.w.j.j. 000160
9AE676FF E876FF00 0BE90375 00EE7E83 FF01E900 00FFFF9A F076FFF2 76FF006A j..v·.vb.....õ...-Y.u.õ....vò.vl. 000180
00008804 C4831154 00009AFC 76FFFE76 FF000018 EE9AF876 FFFA76FF 0000FFFF .....vª.v½.Y.....v±.v=...T..á.|.. 0001A0
16FC468D 0676FF08 76FFD88E 1D52881E 56570000 2EC80004 CAC95F5E 1F0000E9 õ...^ èò..à...WV.jR..Ä.v..v..F=. 0001C0
88266947 8B26FC5E C400001D 789A5016 F8468D67 77FF26FC 5EC40000 1D679A50 P.g...á^=&.wg.F½.P.x....á^=&.Gi&. 0001E0
```

```
Dump of file SATURN:[PCCOMMON.DUMP.DLL]SA-DIFM.DLL;1 on 18-APR-1990 10:50:26.92
File ID (450,15,0)   End of file block 323 / Allocated 324

Virtual block number 81 (00000051), 512 (0200) bytes

 478826FC 5EC408C4 8320A414 759AEC76 FFEE76FF 006A006A EE5689EC 46896857 Wk.Fì.VŸj.j..vŸ.vš.u.Ê .ó.ó^=&.G 000000
 7E83E646 8906C483 10B80000 9AFC76FF FE76FF1A 6AEA5689 E8468906 57882604 .&.W..FÒ.Võj..v±.v•...£..ó..F|.~ 000020
 FF0676FF 0876FF08 C483109A 14759AEC 76FFEE76 FF006A00 6A0029E9 037500E6 Ì.u.Õ).j.j..vŸ.vš.u....ó..v..v.. 000040
 50160646 8D6377FF 266577FF 26FC5EC4 0195E9E6 46880000 1DE89AD2 76FFD476 vå.v•.Š....F|Õ..ó^=&.we&.wc.F•.P 000060
 64E9E646 88000021 DC9AE876 FFEA76FF 0011E903 7500030D E6468900 001E069A ......F|=..u.Õ...võ.vÒ.É|...F|Õd 000080
 E90374E0 460BDE46 8B001FE9 0374DC46 080A4688 002AE903 74D8460B D6468B01 ..F•.FÅt.Õ*..FÖ.FÉt.Õ...F8.FÅt.Õ 0000A0
 26FC5EC4 E876FFEA 76FF0001 2047C726 EC5EC400 09E90374 E4460BE2 46880014 ...Fã.FÒt.Õ..ó^š&úG ...võ.vÒó^=& 0000C0
 FFFA76FF 0031E903 7500030D E6468900 00FFFF9A F876FFFA 76FF37FF 260277FF .w.&.7.vª.v½......F|=..u.Õ1..vª. 0000E0
 9A6377FF 266577FF 26FC5EC4 006A0000 1E939AE8 76FFEA76 FF000022 3D9AF876 v½.="...võ.vÒ.....j.ó^=&.we&.wc. 000100
 468DF876 FFFA76FF 00001EDD 9AF876FF FA76FF00 D8E9E646 8806C483 224A0303 ..J".ó..F|ÕÄ..vª.v½.Ì....vª.v½.F 000120
 468DF476 FFF676FF FC76FFFE 76FF006A 0096E903 7400030D 00001EED 9A5016F4 ¶.P.Ú...=..t.Õ..j..v±.v•.v~.v¶.F 000140
 F876FFFA 76FF001C E9037500 003DE646 8912C483 00001F11 9A006A78 6A5016F0 Þ.Pj(j.......ó..F|=..u.Õ...vª.v½ 000160
 76FFF276 FF5DC768 006A006F E9E64688 00002200 9AE876FF EA76FF00 001F2A9A .*....võ.vÒ.."...F|Õo.j.hú].v·.v 000180
 001E1C9A E876FFEA 76FF0011 E9037500 003DE646 890AC483 00001F59 9A006AF0 Þj..Y....ó..F|=..u.Õ...võ.vÒ.... 0001A0
 D99AF076 FFF276FF 006A006A 006A1677 FF261877 FF26EC5E C4003EE9 E6468800 ..F|Õ>.ó^š&.w.&.w.j.j.j..v·.vÞ.) 0001C0
 B804C483 1EA70000 9AFC76FF FE76FF00 001E889A F876FFFA 76FFFF52 E900001F ...ÕR..vª.v½......v±.v•...Ì..ó.| 0001E0

Dump of file SATURN:[PCCOMMON.DUMP.DLL]SA-DIFM.DLL;1 on 18-APR-1990 10:50:26.92
File ID (450,15,0)   End of file block 323 / Allocated 324

Virtual block number 82 (00000052), 512 (0200) bytes

 46800676 FF0876FF D88E2022 B81E5657 00002EC8 0004CAC9 5F5E1F00 00E90000 ..Õ...^_èò..à...WV.|" .Ä.  .v..F 000000
 69478826 FC5EC400 0020439A 5016F846 806777FF 26FC5EC4 00002032 9A5016FC •.P.2 ..ó^=&.wg.F½.P.C ..ь .š.Gi 000020
 26FC5EC4 08C48322 E614759A F476FFF6 76FF006A 006AF656 89F44689 68578826 &.Wk.F¶.V-j.j..v~.v¶.u.Ì".ó.ó^=& 000040
 EA468906 C4832086 00009AFC 76FFFE76 FF186AF2 5689F046 89065788 26044788 .G.&.W..FÞ.V·j..v±.v•.... .ó..Fõ 000060
 76FF0876 FF08C483 20651475 9AF476FF F676FF00 6A006A00 29E90375 00EA7E83 .~õ.u.Õ).j.j..v~.v¶.u.e .ó..v..v 000080
 DA468063 77FF2665 77FF26FC 5EC40195 E9EA4688 00002086 9AD276FF D476FF06 ..vå.v•.Ñ ...FõÕ..ó^=&.we&.wc.FÖ 0000A0
 EA468800 0020E79A F076FFF2 76FF0011 E9037500 003DEA46 89000020 D19A5016 .P.1 ...Fõ=..u.Õ...v·.vÞ.Ö ...Fõ 0000C0
 74E4460B E2468800 1FE90374 E0460BDE 4688002A E90374DC 460BDA46 8B0164E9 Õd..FÖ.FÉt.Õ*..F8.FÅt.Õ...Fã.FÒt 0000E0
 5EC4F076 FFF276FF 00012047 C726F45E C40009E9 0374E846 08E6468B 0014E903 .Õ...F|.FÒt.Õ..ó^¶&úG ...v·.vÞó^ 000100
 76FF0031 E9037500 003DEA46 890000FF FF9AF876 FFFA76FF 37FF2602 77FF26FC •&.w.&.7.vª.v½......Fõ=..u.Õ1..v 000120
 77FF2665 77FF26FC 5EC4006A 0000215E 9AF076FF F276FF00 0021539A F876FFFA ª.v½.S|...v·.vÞ.^|..j.ó^=&.we&.w 000140
 F876FFFA 76FF0000 21849AF8 76FFFA76 FF00D8E9 EA468806 C483248C 03039A63 c....$.ó..FõÕÄ..vª.v½..|...vª.v½ 000160
 EC76FFEE 76FFFC76 FFFE76FF 006A0096 E9037400 00300000 21949A50 16EC468D .Fš.P..|..=..t.Õ..j..v±.v=.vŸ.vš 000180
 FFFA76FF 001CE903 7500030D EA468912 C4830000 21B89A00 6A7C6A50 16064680 .F•.Pj|j..||...ó..Fõ=..u.Õ...vª. 0001A0
 D876FF5D C768006A 006FE9EA 46880000 244F9AF0 76FFF276 FF000021 D19AF876 v½.||...v·.vÞ.O$...FõÕo.j.hú].vÄ 0001C0
 299AF076 FFF276FF 0011E903 7500030D EA46890A C4830000 21F49A00 6AD676FF .v•j..¶|...ó..Fõ=..u.Õ...v·.vÞ.) 0001E0

Dump of file SATURN:[PCCOMMON.DUMP.DLL]SA-DIFM.DLL;1 on 18-APR-1990 10:50:26.92
File ID (450,15,0)   End of file block 323 / Allocated 324

Virtual block number 83 (00000053), 512 (0200) bytes

 D676FFD8 76FF006A 006A006A 1677FF26 1877FF26 F45EC400 3EE9EA46 88000023 #...FõÕ>.ó^¶&.w.&.w.j.j.j..vÄ.v• 000000
 C4832172 00009AFC 76FFFE76 FF000023 959AF876 FFFA76FF FF52E900 00222F9A ./"..ÕR..vª.v½..#...v±.v•...r|.ó 000020
 C70001F2 46C7D88E 2264B81E 56570000 20C80004 CAC95F5E 1F0000E9 0000B804 .|..Õ...^_èò..à ..WV.|d".ÄúF·..ú 000040
 89685788 26694788 26FC5EC4 00002274 9A5016FC 468D0C76 FF0E76FF 0000F446 F¶...v..v..F=.P.t"..ó^=&.Gi&.Wk. 000060
 119A026A 0C76FF0E 76FFE656 89E44689 10578826 0E478826 F65EC4F8 5689F646 F~.V½ó^~&.G.&.W..FÕ.V|.v..v.j... 000080
 016A0C76 FF0E76FF 0000FFFF 9A016A03 6AE476FF E676FF0C 76FF0E76 FF000025 %...v..v..v|.võj.j.......v..v.j. 0000A0
 00FFFF9A 5016EA46 8DF276FF F476FFE4 76FFE676 FF0C76FF 0E76FF00 0008509A .}....v..v..v|.võ.v¶.v·.Fõ.P.... 0000C0
 8D5016FA 468D016A EA76FFEC 76FF0114 E9E84688 0006E903 7500030D E8468900 ..FÒ=..u.Õ...FÒÕ...vš.võj..Fª.P. 0000E0
 8B000025 AE9AEA76 FFEC76FF 0011E903 7500030D E8468900 0026009A 5016E046 FÅ.P..&...FÒ=..u.Õ...vš.võ.Û%... 000100
 00000789 9A5016EE 468DE076 FFE276FF 00A3E903 75E2460B E0468800 E1E9E846 FÒÕÄ..FÅ.Fãu.ÕÈ..vã.vÅ.FŸ.P..... 000120
 25E39AEA 76FFEC76 FF0011E9 0374F046 08EE4688 0008E903 7400E87E 83E84689 .FÒ.~Õ.t.Õ...FŸ.FÞt.Õ...vš.võ.Ð% 000140
 C4830000 24369A00 6AEE76FF F076FF5D CE680876 FF0A76FF 009EE900 01B80000 ..|..Õ...v..v.hö].vÞ.vŸj..6$...ó 000160
 EC76FF00 69E9E846 88000026 169AEA76 FFEC76FF 0011E903 7500030D E846890C ..FÒ=..u.Õ...vš.võ..&...FÒÕi..vš 000180
 FF0011E9 03750000 3DE84689 0000FFFF 9A5016E0 468D5016 FA468D00 6AEA76FF .võj..Fª.P.FÅ.P......FÒ=..u.Õ... 0001A0
 46890000 FFFF9AEA 76FFEC76 FFFF52E9 0036E9E8 46880000 262A9AEA 76FFEC76 vš.võ.*&...FÒÕ6.ÕR..vš.võ......F 0001C0
 000022F8 9A1076FF 1276FF0C 76FF0E76 FF0017E9 E8468800 06E90375 00003DE8 Ò=..u.Õ...FÒÕ...v..v..v..v..½".. 0001E0
```

```
Dump of file SATURN:[PCCOMMON.DUMP.DLL]SA-DIFM.DLL;1 on 18-APR-1990 10:50:26.92
File ID (450,15,0)   End of file block 323 / Allocated 324

Virtual block number 84 (00000054), 512 (0200) bytes

 800C76FF 0E76FFD8 8E24A688 1E565700 0014C800 0ECAC95F 5E1F0000 E90000B8 ¡..Õ...^_èò..à...WV.¡Ì$.Ã.v..v.. 000000
 006A006A 006AF456 89F24689 68578826 69478826 FC5EC400 0024C09A 5016FC46 F•.P.à$.¯á^•&.Gi&.Wk.F·.V¶j.j.j. 000020
 0A76FF50 16EE4680 5016F646 805016F8 4680006A 006A006A 006A006A 006A006A j.j.j.j.j.j.j..F½.P.F–.P.FŸ.P.v. 000040
 E9EC4688 0006E903 7500003D EC468928 C48322A7 12EC9AFC 76FFFE76 FF0876FF .v..v±.v=.š.Ì".á(.Fš=..u.Õ...FšÕ 000060
 8808C483 268C1475 9AF276FF F476FFEE 76FFF076 FF0014E9 03740806 46F60099 ..–F..t.Õ...vÞ.vŸ.v¶.v·.u.¥&.á.. 000080
 FFF076FF 5DCF6808 76FF0A76 FF002DE9 03750806 46F60036 E90375F0 460BEE46 FŸ.FÞu.Õ6.–F..u.Õ-..v..v.hü].vÞ. 0000A0
 0035E900 3EE9EC46 880006E9 03750000 30EC4689 0CC48300 00274D9A 006AEE76 vŸj..M'...á..Fš=..u.Õ...FšÕ>.Õ5. 0000C0
 0025CA9A 006AEE76 FFF076FF 5DCE6808 76FF0A76 FF002AE9 0375F046 0BEE468B .FŸ.FÞu.Õ*..v..v.hö].vÞ.vŸj..òX. 0000E0
 CAC95F5E 1F0000E9 00008800 06E9EC46 880006E9 03750000 30EC4689 0CC48300 ..á..Fš=..u.Õ...FšÕ..|..Õ...^_èò 000100
 FC4680DC 76FF0E76 FFF84689 FA468900 0088D88E 2665881E 56570000 1AC8000E ..à...WV.¡e&.Ã¡...F'.F½.v..v..¯F• 000120
 FFEE76FF 006A006A EE5689EC 46896857 88266947 8826FC5E C4000026 759A5016 .P.u&..á^•&.Gi&.Wk.Fš.VŸj.j..vŸ. 000140
 4680006A 006A006A 006A006A 006A006A 006A006A 006A08C4 8327EC14 759AEC76 vš.u.š'.á.j.j.j.j.j.j.j.j.j.j..F 000160
 C48326EA 12EC9AFC 76FFFE76 FF0876FF 0A76FF50 16E84680 5016F046 805016F2 ·.P.FÞ.P.FÒ.P.v..v..v±.v=.š.õ&.á 000180
 0646F600 33E90375 EA4608E8 4688013E E9E6468B 0006E903 7500003D E6468928 (.F|=..u.Õ...F|Õ>..FÒ.Fõu.Õ3.–F. 0001A0
 890CC483 00002865 9A006AE8 76FFEA76 FF50CF68 0876FF0A 76FF002A E9037508 .u.Õ*..v..v.hü].võ.vÒj..e(...á.. 0001C0
 7406F07E 8300ADE9 0375EA46 0BE84688 0100E9E6 46880006 E9037500 003DE646 F|=..u.Õ...F|Õ...FÒ.Fõu.ÕÙ..–Þ.t 0001E0

Dump of file SATURN:[PCCOMMON.DUMP.DLL]SA-DIFM.DLL;1 on 18-APR-1990 10:50:26.92
File ID (450,15,0)   End of file block 323 / Allocated 324

Virtual block number 85 (00000055), 512 (0200) bytes

 08F8468B 0CC48300 0028C29A 006AE876 FFEA76FF 5F526850 16F8468D 002FE903 .Õ/..F½.PhR_.võ.vÒj..ð(...á..F½. 000000
 16F6468D 0024E903 7401F07E 83EA5689 E84689FA 5688F846 8B000CE9 0375FA46 F'u.Õ...F½.V̄'.FÒ.Võ.–Þ.t.Õ$..F–. 000020
 0090E900 00880006 E9037478 F67E830A C4830000 18AD9A00 6AE876FF EA76FF50 P.võ.vÒj..Ù....á..—xt.Õ..|..Õ.. 000040
 7500003D E646890C C4830000 27159A00 6AE876FF EA76FF5D CC680876 FF0A76FF .v..v.hä].võ.vÒj...'...á..F|=..u 000060
 29339A01 6A006A02 9A68006A 1DAF6861 77FF26FC 5EC40066 E9E6468B 0006E903 .Õ...F|Õf.á^•&.wah£.j.h..j.j..3) 000080
 5EC40477 FF260677 FF26FC5E C40037E9 0374EA46 0BE8468B 0042E9E6 46890000 ...F|Õ8..FÒ.Fõt.Õ7.á^•&.w.&.w.á^ 0000A0
 006A029A 68006A1D AF686177 FF26FC5E C40000FF FF9A016A 37FF2602 77FF26FC •&.w.&.7j......á^•&.wah£.j.h..j. 0000C0
 7A881E56 57000038 C8000ECA C95F5E1F 0000E900 0088E646 8900001D 399A016A j..9....F|¡..Õ...^_èò..à8..WV.¡z 0000E0
 46896857 88266947 8826FC5E C4000027 939A5016 FC4680DC 76FF0E76 FFD88E27 '.Ã.v..v..F•.P..'.¯á^•&.Gi&.Wk.F 000100
 FF016A02 6A0C76FF 0E76FFCA 5689C846 89555788 26534788 26FC5EC4 DA568908 Ã.VÒá^•&.GS&.WJ.Fà.VÒ.v..v.j.j.. 000120
 5688E846 88F25689 F04689E6 5688E446 880000FF FF9A5016 E4468008 76FF0A76 v..v..FÕ.P......FÕ.V|.FÞ.V·.FÕ.V 000140
 5016E046 80006A00 6A006A00 6A006A00 6A006A00 6A006A00 6AF65689 F44689EA õ.F¶.V–j.j.j.j.j.j.j.j.j.j..FÁ.P 000160
 468928C4 832A1712 EC9AFC76 FFFE76FF 0876FF0A 76FF5016 D4468050 160C468D .FÉ.P.Få.P.v..v..v±.v=.š..*.á(.F 000180
 76FFD476 FFD676FF 0014E903 74080646 F6031FE9 D0468800 06E90375 00003D00 Å=..u.Õ...FÃÕ..–F..t.Õ...v•.vå.v 0001A0
 5DCE6808 76FF0A76 FF029BE9 03750646 0B04468B 08C48327 8514759A 0876FFDA Õ.vÃ.u.ç'.á..Få.F•u.Õ...v..v.hö] 0001C0
 CDE90046 880006E9 03750000 30D04689 0CC48300 0028289A 006AD476 FFD676FF .v•.våj..((...á..FÅ=..u.Õ...FÃÕë 0001E0

Dump of file SATURN:[PCCOMMON.DUMP.DLL]SA-DIFM.DLL;1 on 18-APR-1990 10:50:26.92
File ID (450,15,0)   End of file block 323 / Allocated 324

Virtual block number 86 (00000056), 512 (0200) bytes

 06E90375 00003D00 46890AC4 83000028 9A9A006A D476FFD6 76FF5016 DE468D02 ..F8.P.v•.våj...(...á..FÅ=..u.Õ. 000000
 006AD476 FFD676FF 5F526850 16EC4680 0053E903 7478DE7E 8302A7E9 D0468800 ..FÃÕÌ..–8xt.ÕS..F$.PhR_.v•.våj. 000020
 006AEC76 FFEE76FF 5016CE46 8D0030E9 0375EE46 0BEC4688 0CC48300 002A399A .9*...á..F$.FŸu.ÕO..FÕ.P̄.vŸ.v$j. 000040
 D44689EE 5688EC46 88DE4689 CE468800 12E90375 77CE7E83 0AC48300 002A5F9A ._*...á..–õwu.Õ...FÕ.F8.F$.VŸ.Fá 000060
 5016F046 80020036 FF262264 068E01CC 68C876FF CA76FF01 87E9DE46 88065689 .V•.F8Õ...vÒ.våhä...d"&.6...FÞ.P 000080
 36FF2622 64068E02 DA68C876 FFCA76FF 0188E9D0 46890000 2B1D9A50 16CC468D .Fã.P..+...FÃÕ...vÒ.våhÕ...d"&.6 0000A0
 26FC5EC4 5016F846 8D0164E9 D0468900 002B879A 5016CC46 8D5016F0 46800200 ...FÞ.P.Fã.P.Ã+...FÃÕd..F½.Pá^•& 0000C0
 00003D00 468910C4 8300002B 799A006A D476FFD6 76FF2710 680477FF 260677FF .w.&.w.h.'.v•.våj..y+...á..FÅ=.. 0000E0
 27126804 77FF2606 77FF26FC 5EC4066A 5016D246 8D01C3E9 D0468800 06E90375 u.Õ...FÃÕù..F•.Pj.á^•&.w.&.w.h.' 000100
 8DE9D046 880006E9 03750000 30D04689 12C48300 002CA79A 006AF876 FFFA76FF .v'.v½j..¦....á..FÅ=..u.Õ...FÃÕ. 000120
 16F0468D 020036FF 26226406 8E02B268 C876FFCA 76FF0027 E9037500 D27E8301 ..~•.u.Õ'..vÒ.våhý...d"&.6...FÞ. 000140
 FF262264 068E02C6 68C876FF CA76FF00 24E9D046 8900002B DE9A5016 CC468D50 P.Fã.P.8+...FÃÕ$..vÒ.våhó...d"&. 000160
 F868C876 FFCA76FF 00A3E9D0 46890000 2C059A50 16CC468D 5016F046 80020036 6...FÞ.P.Fã.P.,....FÃÕÈ..vÒ.våh½ 000180
 FF007CE9 D0468900 002C2C9A 5016CC46 8D5016F0 46800200 36FF2622 64068E02 ...d"&.6...FÞ.P.Fã.P.,,....FÃÕ|.. 0001A0
 00002C53 9A5016CC 46805016 F0468D02 0036FF26 2264068E 02ED68C8 76FFCA76 vÒ.våhÚ...d"&.6...FÞ.P.Fã.P.S,.. 0001C0
 CC468D50 16F04680 020036FF 26226406 8E029E68 C876FFCA 76FF0055 E9D04689 .FÃÕU..vÒ.våh....d"&.6...FÞ.P.Fã 0001E0
```

Dump of file SATURN:[PCCOMMON.DUMP.DLL]SA-DIFM.DLL;1 on 18-APR-1990 10:50:26.92
File ID (450,15,0)   End of file block 323 / Allocated 324

Virtual block number 87 (00000057), 512 (0200) bytes

FE69E903 75007830 FE98E903 75007730 002BE900 2EE9D046 8900002C EA9A5016 .P.ō,...FÅŌ..Ō+.=w.u.Ō.±=x.u.Ōi± 000000
5016F846 8DFFABE9 FF60E903 75007C3D FF8FE903 75007B30 FEAFE903 75007A3D =z.u.Ō€±=(.u.Ō..=|.u.Ō'.Ō¨..F½.P 000020
468910C4 8300002A 919A006A D476FFD6 76FF2710 680477FF 260677FF 26FC5EC4 á^=&.w.&.w.h.'.v■.vâj...*...á..F 000040
CA76FF00 24E90374 D6460B04 4688002F E9005FE9 D0468800 06E90375 00003D00 Å=..u.Ō...FÅŌ_.Ō/..Fâ.Føt.Ō$..vò 000060
46890000 FFFF9A50 16CC468D 5016F046 8D020036 FF262264 068E029E 68C876FF .vàh....d"&.6...FÞ.P.Fö.P......F 000080
F876FFFA 76FF5052 99CC4688 1DAF685F 77FF26FC 5EC4001E E90375FF CC7E8300 Å.-ö.u.Ō..á^=&.w_h€..Fö.RP.v¹.v½ 0000A0
8E294F88 1E565700 000AC800 0ECAC95F 5E1F0000 E90000B8 D0468900 0028EE9A .Ÿ(...FÅ¦..Ō...^¯èò..à...WV.¡O). 0000C0
14578826 12478826 695FC426 FC5EC400 00295F9A 5016FC46 8D0C76FF 0E76FFD8 Å.v..v..F=.P._)..á^=&6_i&.G.&.W. 0000E0
890CC483 00002B43 9A006AF8 76FFFA76 FF5E9A68 0876FF0A 76FFFA56 89F84689 .F½.V¹.v..v.h.^.v¹.v½j..C+...á.. 000100
0006E9F6 468806C4 83238403 039A0C76 FF0E76FF 006A0016 E9037500 003DF646 F-=..u.Ō..j..v..v....Ç#.6..F-Ō.. 000120
898A4689 00008808 8E2D2D88 1E565700 0088C800 0ECAC95F 5E1F0000 E9000088 ¦..Ō...^_èò..à...WV.¡--.Ä¦...F.. 000140
D4468968 578B2669 478B26F0 5EC40000 2D3D9A50 16F0468D 0C76FF0E 76FF8846 F..v..v..FÞ.P.=-..á^Þ&.Gi&.Wk.Fâ 000160
896F5788 26604788 26F05EC4 84568982 46890657 88260447 8826045E C4D65689 .V■á^â&.G.&.W..F..V.á^Þ&.Gm&.Wo. 000180
FF0A76FF 00001901 9A5016FF 7C868D01 6A006A82 76FF8476 FFFF7A96 89FF7886 .x...z..v..v.j.j...|..P.Ì....v.. 0001A0
168C468D 0000FFFF 9A5016CA 468D5016 DE468D60 77FF266F 77FF26F0 5EC40876 v.á^Þ&.wo&.wm.FB.P.Fò.P......F.. 0001C0
468D5016 D8468050 16E6468D 5016F846 8D50160A 4680006A 006A5016 EE468050 P.FŸ.Pj.j..FÖ.P.F½.P.FÌ.P.FÄ.P.F 0001E0

Dump of file SATURN:[PCCOMMON.DUMP.DLL]SA-DIFM.DLL;1 on 18-APR-1990 10:50:26.92
File ID (450,15,0)   End of file block 323 / Allocated 324

Virtual block number 88 (00000058), 512 (0200) bytes

·E9037500 003D8646 8928C483 2EA512EC 9AF076FF F276FF08 76FF0A76 FF5016D0 Å.P.v..v..v·.vÞ.&.Ē..á(.F.=..u.Ō 000000
0646F680 46890000 B80003E9 00018800 06E90374 01EE7E83 09DDE986 46880006 ...F.ŌÏ..-Ÿ.t.Ō..¡..Ō..¡...F.-F. 000020
D2460B00 468808C4 8329E914 759A0476 FFD676FF D076FF02 76FF0014 E9037408 .t.Ō...v■.vÅ.v■.vâ.u.Ō).á..FÅ.F■ 000040
46890CC4 8300002E FC9A006A D076FFD2 76FF5DCE 680876FF 0A76FF07 2FE90375 u.Ō/..v..v.hö].v■.vÅj..=....á..F 000060
E676FFE8 76FF5016 CE468D06 DDE9D846 8B0976E9 86468800 06E90375 00003086 .=..u.Ō...F.Ōv..FÅŌÏ..Fö.P.vÒ.vÌ 000080
46880006 E9037500 003D8646 8910C483 00002F25 9A006AD0 76FFD276 FF5E9B68 h.^.v■.vÅj..%/...á..F.=..u.Ō...F 0000A0
3D864689 0CC48300 002FD29A 006AD076 FFD276FF 5E886850 16E0468D 0941E986 .ŌA..FÅ.Ph.^.v■.vÅj..■/...á..F.= 0000C0
2DE25688 E0468BD4 5EC40040 E9037401 CE7E8309 18E98646 880006E9 03750000 ..u.Ō...F.Ō...-ö.t.Ōə.á^â.FÅ.Vã- 0000E0
24478926 000A8300 022DE256 8BE04688 D45EC42A 57892628 47892600 0A830001 ...Ö.&.G(&.W*á^â.FÅ.Vã-...Ö.&.G$ 000100
C4002BE9 037400CE 7E830034 E900002E 47C72600 012C47C7 26045EC4 26578926 &.W&á^â&úG,..&úG...Ō4..-ö.t.Ō+.á 000120
B8D45EC4 24478926 26478926 00008804 5EC40000 2A47C726 00012847 C726045E ^â&úG(..&úG*..á^â¦..&.G&&.G$á^â¦ 000140
6AD076FF D276FF5E 8C680876 FF0A76FF E676FFE8 76FF2C47 89262E47 89260000 ..&.G.&.G,.vÒ.vÌ.v..v.h.^.v■.vÅj 000160
D0468BD4 5EC4086B E9864688 0006E903 7500003D 86468910 C4830000 30209A00 .. 0...á..F.=..u.Ō...F.Ōk.á^â.FÅ 000180
8D05D2E9 8A568988 46897257 88267047 8826045E C4145789 26124789 26D2568B .V■&.G.&.W.á^â&.Gp&.Wr.F..V.Ō■.. 0001A0
E9037500 003D8646 890CC483 00003049 9A006AD0 76FFD276 FF5E8868 5016E046 FÅ.Ph.^.v■.vÅj..IO...á..F.=..u.Ō 0001C0
0CC48300 0030729A 006AD076 FFD276FF 5E956850 16AA468D 081DE986 46880006 ...F.Ō...F^.Ph.^.v■.vÅj..rO...á. 0001E0

Dump of file SATURN:[PCCOMMON.DUMP.DLL]SA-DIFM.DLL;1 on 18-APR-1990 10:50:26.92
File ID (450,15,0)   End of file block 323 / Allocated 324

Virtual block number 89 (00000059), 512 (0200) bytes

6AD076FF D276FF5E 96685016 92468D07 F4E98646 880006E9 03750000 3D864689 .F.=..u.Ō...F.Ō¶..F..Ph.^.v■.vÅj 000000
80468B04 5EC407CB E9864688 0006E903 7500003D 8646890C C4830000 2D689A00 ..h-...á..F.=..u.Ō...F.Ōù.á^â.F. 000020
03740A46 3B000A83 00022DE2 5688E046 88015CE9 03740C46 08DA4688 1A478926 &.G..FÖ.FÉt.Ō\..FÅ.Vã-...Ö.;FÖt. 000040
4789260C 56880A46 88D45EC4 00011C47 C726045E C40140E9 03740C56 380148E9 ÖH.;VÉt.Ōə.á^â&úG...á^â.FÖ.VÉ&.G 000060
83000205 DC5688DA 4688045E C42C4789 262E4789 26000088 D45EC426 57892624 $&.W&á^â¦..&.G.&.G,á^â.FÖ.VÉ.... 000080
26A65EC4 000EE903 7500807E 83A8568C A6468992 46802A57 89262847 89260002 ■.&.G(&.W*.F..FÌ.V´.-..u.Ō..á^Ì& 0000A0
03750080 7E83C456 89C24689 02578826 078826A6 5EC4000A E9065788 26044788 .G.&.W.Ō..á^Ì&..&.W..Fö.Vá.-..u. 0000C0
89A24689 0A578826 08478826 A65EC400 0BE90E57 88260C47 8826A65E C4000EE9 Ō..á^Ì&.G.&.W.Ō..á^Ì&.G.&.W..FÅ. 0000E0
E9065788 26044788 26A65EC4 000EE903 7500807E 83A8568C A64689AA 468DA456 VÉ.F^.FÌ.V´.-..u.Ō..á^Ì&.G.&.W.Ō 000100
8826A65E C4000EE9 03750080 7E838C56 898A4689 02578826 078826A6 5EC4000A ..á^Ì&..&.W..Fα.V¥.-..u.Ō..á^Ì&. 000120
C45688C2 46889056 898E4689 0A578826 08478826 A65EC400 0BE90E57 88260C47 G.&.W.Ō..á^Ì&.G.&.W..F..V..Fô.Vá 000140
5689C646 898A4688 8C568800 06E90372 8A463800 08E9037D 0013E903 7E8C5638 ;V¥-.Ō..).Ō..;Fαr.Ō...V¥.Fα.F6.V 000160
88905688 0006E903 778E4638 0008E903 7E0013E9 03709056 38A45688 A24688C8 â.FÅ.VÉ;V.).Ō..-.Ō..;F.w.Ō...V.. 000180
C400011C 47C72604 5EC4009A E90374DC 46080A46 8801BAE9 C05689BE 46898E46 F..Ff.VãŌα..FÖ.FÉt.Ō..á^â&úG...á 0001A0
5EC42C47 89262E47 89260000 B8D45EC4 26578926 24478926 0C5688DA 4688045E ^â.FÖ.VÉ&.G$&.W&á^â¦..&.G.&.G,á^ 0001C0
7E83A856 8CA64689 92468D2A 57892628 47892600 D2830003 050C5688 DA4688D4 â.FÖ.VÉ....■.&.G(&.W*.F..FÌ.V´.- 0001E0

```
Dump of file SATURN:[PCCOMMON.DUMP.DLL]SA-DIFM.DLL;1 on 18-APR-1990 10:50:26.92
File ID (450,15,0)   End of file block 323 / Allocated 324

Virtual block number 90 (0000005A), 512 (0200) bytes

 8902578B 26078826 A65EC400 0AE90657 8B260447 8826A65E C4000EE9 03750080 ..u.Ö..ó^Ì&.G.&.W.Ö..ó^Ì&..&.W.. 000000
 26A65EC4 0008E90E 5788260C 47882 6A6 5EC4000E E9037500 807E83C8 5689C646 Fó.Và.~..u.Ö..ó^Ì&.G.&.W.Ö..ó^Ì& 000020
 740A463B 000A8300 022DE256 8BE0468B 0115E9C0 56898E46 890A578B 2608478B .G.&.W..Fƒ.VàÖ...FÅ.Vã-...Ö.;FÖt 000040
 0120DC56 8B0A468B D45EC400 011C47C7 26045EC4 00A1E903 740C563B 00A9E903 .Ö`.;VÉt.ÖÅ.ó^å&úG...ó^å.FÖ.VÉ-. 000060
 4688D45E C400002E 47C72600 012C47C7 26045EC4 26578926 24478926 000A8300 ..Ö.&.G$&.W&ó^å&úG,..&úG...ó^å.F 000080
 7500807E 83A8568C A64689AA 468D2A57 89262847 89260002 83000205 DC568BDA Ö.VÉ....Ø.&.G(&.W*.F`.FÌ.V`.-..u 0000A0
 89C64689 02578826 078826A6 5EC4000A E906578B 2604478B 26A65EC4 000EE903 .Ö..ó^Ì&.G.&.W.Ö..ó^Ì&..&.W..Fó. 0000C0
 08478826 A65EC400 0BE90E57 8B260C47 8826A65E C4000EE9 03750080 7E83C856 Và.~..u.Ö..ó^Ì&.G.&.W.Ö..ó^Ì&.G. 0000E0
 20DC568B DA4688D4 5EC40000 1C47C726 D45EC400 58E9C056 89BE4689 0A578826 &.W..Fƒ.VàÖX.ó^å&úG...ó^å.FÖ.VÉ- 000100
 8B045EC4 00002E47 C7260001 2C47C726 D45EC426 57892624 47892600 DA830001 ...Ö.&.G$&.W&ó^å&úG,..&úG...ó^å. 000120
 89000088 C64689C8 46890000 882A5789 26284789 26000283 0003050C 568BDA46 FÖ.VÉ....Ø.&.G(&.W*|...Fà.Fó|... 000140
 26C0568B BE468BD4 5EC43257 89263047 8926C856 8BC6468B D45EC4BE 4689C046 Fà.Fƒó^å.Fó.Và&.GO&.W2ó^å.Fƒ.Vã& 000160
 76FFDA76 FFDC76FF 14578926 12478926 D2568BD0 4688D45E C4365789 26344789 .G4&.W6ó^å.FÅ.VØ&.G.&.W..vÉ.vÖ.v 000180
 E9037500 003D8646 8910C483 00003430 9A006AD0 76FFD276 FF5E8D68 0876FF0A ..v.h.^.vØ.vÅj..=4...ó..F.=..u.Ö 0001A0
 16EA468D 01B5E98A 56898846 896E578B 266C478B 26045EC4 043DE986 468B0006 ...F.Ö=.ó^å&.Gl&.Wn.F..V.Öç..Fö. 0001C0
 880006E9 03750000 30864689 0CC48300 0034EF9A 006AD076 FFD276FF 5F526850 PhR_.vØ.vÅj..ÿ4...ó..F.=..u.Ö... 0001E0

Dump of file SATURN:[PCCOMMON.DUMP.DLL]SA-DIFM.DLL;1 on 18-APR-1990 10:50:26.92
File ID (450,15,0)   End of file block 323 / Allocated 324

Virtual block number 91 (0000005B), 512 (0200) bytes

 088C7E83 02568900 4689EC56 88EA468B 000CE903 75EC460B EA468804 00E98646 F.Ö...Fö.Fšu.Ö...Fö.Vš.FÅ.VØ.~.. 000000
 568BD046 88D45EC4 0C478926 8C468B04 5EC400AB E9037500 8C7E8300 84E90375 u.ÖÇ..~..u.Ö¨.ó^å.F.&.G.ó^å.FÅ.V 000020
 9A5016F4 4680B276 FF8476FF 00003530 9A8276FF 8476FF14 57892612 478926D2 Ø&.G.&.W..v..v..05...v..v..F¶.P. 000040
 C4830000 355A9A00 6AF476FF F676FF50 16E44680 0059E903 7400003D 00003540 ã5..=..t.ÖY..Fö.P.v~.v¶j..Z5...ó 000060
 7F9A006A F476FFF6 76FF5DC8 680876FF 0A76FFFF C7E90003 E9037477 E47E830A ..~Öwt.Ö..Öú..v..v.hà].v~.v¶j... 000080
 E986468B 00003598 9A8276FF 8476FF00 11E90375 00003D86 46890CC4 83000035 5...ó..F.=..u.Ö...v..v...5...F.Ö 0000A0
 9A8276FF 8476FF00 80E98A56 89884689 42578826 40478826 D45EC4FF 8FE90343 C.Ö..ó^å&.Gà&.WB.F..V.Ö...v..v.. 0000C0
 16E4468D 0059E903 7400003D 00002306 9A5016F4 46808276 FF8476FF 000023C6 6#...v..v..F¶.P.ø#..=..t.ÖY..Fö. 0000E0
 0A76FFFF C7E90003 E9037477 E47E830A C4830000 2AB19A00 6AF476FF F676FF50 P.v~.v¶j..Ý*...ó..~Öwt.Ö..Öú..v. 000100
 11E90375 00003D86 46890CC4 8300002E C79A006A F476FFF6 76FF5DC8 680876FF .v.hà].v~.v¶j..ú....ó..F.=..u.Ö. 000120
 3E578826 3C478826 D45EC4FF 8FE902B3 E986468B 00002413 9A8276FF 8476FF00 ..v..v...$...F.Ö*.Ö..ó^å&.G<&.W> 000140
 93C003FF ECE90376 00053D00 012D001F E90296E9 00008800 28E98A56 89884689 .F..V.Ö(.¡..Ö..Ö..-..=..v.Öš..å. 000160
 56E90375 FF7E860B FF7C868B 01F3E934 2C358930 0F300F2E E5346C35 D5A7FF2E ..Ì!5l4Ì..0.0¿5,4Ö¤...|...~.u.ÖV 000180
 00619AFF 7886FFFF 7A86FF08 76FF0A76 FF50168C 4680014D E9037500 DE7E8301 ..~B.u.ÖM..F..P.v..v..Ñz..Ñx..a. 0001A0
 368E9A82 76FF8476 FF0C4789 268C468B D45EC400 9AE90375 00003D0C C48322C8 à".ó.=..u.Ö..ó^å.F.&.G..v..v../6 0001C0
 FF5016E4 46800059 E9037400 003D0000 36CE9A50 16F4468D 8276FF84 76FF0000 ...v..v..F¶.P.ö6..=..t.ÖY..Fö.P. 0001E0

Dump of file SATURN:[PCCOMMON.DUMP.DLL]SA-DIFM.DLL;1 on 18-APR-1990 10:50:26.92
File ID (450,15,0)   End of file block 323 / Allocated 324

Virtual block number 92 (0000005C), 512 (0200) bytes

 76FF0A76 FFFFC7E9 0003E903 7477E47E 830AC483 000036E8 9A006AF4 76FFF676 v~.v¶j..ò6...ó..~Öwt.Ö..Öú..v..v 000000
 FF0011E9 03750000 3D864689 0CC48300 0037009A 006AF476 FFF676FF 601A6808 .h.'.v~.v¶j...7...ó..F.=..u.Ö... 000020
 46897657 88267447 8826D45E C4FF8FE9 01B5E986 46880000 37269A82 76FF8476 v..v..&7...F.Öç.Ö..ó^å&.Gt&.Wv.F 000040
 34809A50 16F4468D 8276FF84 76FF0000 34A09A82 76FF8476 FF008DE9 8A568988 ..V.Ö...v..v...4...v..v..F¶.P.¯4 000060
 830AC483 000034CA 9A006AF4 76FFF676 FF5016E4 46800059 E9037400 003D0000 ..=..t.ÖY..Fö.P.v~.v¶j..ò4...ó.. 000080
 0034009A 006AF476 FFF676FF 5DC86808 76FF0A76 FFFFC7E9 0003E903 7477E47E ~Öwt.Ö..Öú..v..v.hà].v~.v"j...4. 0000A0
 0125E986 46880000 35089A82 76FF8476 FF0011E9 03750000 3D864689 0CC48300 ..ó..F.=..u.Ö...v..v...5.. F.ÖX. 0000C0
 57882607 8B26085E C40090E9 8A568988 46893E57 8B263C47 8826045E C4FF8FE9 Ö..ó^å&.G<&.W>.F..V.Ö..ó^.L  &.W 0000E0
 5FC42604 5EC40657 88260447 8826085E C4025789 26078926 0E5FC426 D45EC402 .ó^å&ó_.&..&.W.ó^.&.G.&.W.ó^å&ó_ 000100
 89260847 89260E5F C426045E C4025788 26078826 085EC406 57892604 4789260E .&.G.&¯.W.ó^.&..&.W.ó^å&ó_.&.G.&¯ 000120
 FF0E76FF 0E578926 0C478926 0E5FC426 D45EC406 57882604 47882608 5EC40A57 W.ó^.&.G.&.W.ó^å&ó_.&.G.Ī.W..v.. 000140
 57882648 47882604 5EC40000 25049A01 6A036A0E 77FF2610 77FF2604 5EC40C76 v.ó^å&.w.&.w.j.j..¯%..ó^å&.GH&.W 000160
 C4025718 26072826 605FC426 F05EC402 57882607 8826085E C48A5689 8846894A J.F..V.ó^.&..&.W.ó^Þ&ó_m&+.&.W.ó 000180
 26605FC4 26F05EC4 06578826 04478826 085EC402 57892607 8926715F C426F05E ^Þ&ó_q&..&.W.ó^.&.G.&.W̄.ó^Þ&ó_m& 0001A0
 EF9A026A 0C76FF0E 76FF0657 89260447 8926715F C426F05E C4065718 26044728 +G.&¯.W.ó^Þ&ó_q&.G.&.W..v..v.j¯.ÿ 0001C0
 88000017 F29A8876 FF8A76FF 0C76FF0E 76FF0011 E903758A 46088846 88000024 $...F..F.u.Ö¯...v..v..v..v..`...| 0001E0
```

```
Dump of file SATURN:[PCCOMMON.DUMP.DLL]SA-DIFM.DLL;1 on 18-APR-1990 10:50:26.92
File ID (450,15,0)   End of file block 323 / Allocated 324

Virtual block number 93 (0000005D), 512 (0200) bytes

468D0C76 FF0E76FF D88E2DA5 881E5657 00001AC8 000ECAC9 5F5E1F00 00E90000 ..Õ...^_èò..à...WV.¦Ë-.Ä.v..v..F 000000
6D478826 FC5EC4F6 5689F446 896B5788 26694788 26FC5EC4 00002DBE 9A5016FC ▪.P./-..á^▪&.Gi&.Wk.F¶.V-á^▪&.Gm 000020
0C76FF0E 76FF0000 FFFF9A50 16F8468D 0C76FF0E 76FFE856 89E64689 6F578826 &.Wo.FÌ.VÒ.v..v..F½.P......v..v. 000040
0037C29A 016A036A 6D77FF26 6F77FF26 FC5EC40C 76FF0E76 FF000038 DB9A026A j..Û8...v..v.á^▪&.wo&.wmj.j..ó7. 000060
FF0A76FF 0C77FF26 F45EC4E6 76FFE876 FF000038 2F9AF876 FF0C76FF 0E76FF00 ..v..v..v½./8...vÒ.vlá^¶&.w..v.. 000080
5689EA46 89065788 26044788 26F45EC4 0EC48336 10125D9A E676FFE8 76FF0876 v..vÒ.vl.]..6.á.á^¶&.G.&.W..Fõ.V 0000A0
74000030 0000363E 9A5016F0 468DEA76 FFEC76FF 0000362E 9AEA76FF EC76FFEC &.v$.võ..6...v$.võ.FÞ.P.>6..=..t 0000C0
E9037477 FA7E830A C4830000 36589A00 6AF076FF F276FF50 16FA468D 0059E903 .ÕY..Fª.P.v·.vÞj..X6...á..-ªwt.Õ 0000E0
46890CC4 83000036 7D9A006A F076FFF2 76FF601B 68E676FF E876FFFF C7E90003 ..Õú..vÒ.vlh.`.v·.vÞj..}6...á..F 000100
0E76FFFF 8FE9004E E9EE4688 00003696 9AEA76FF EC76FF00 11E90375 00003DEE Ÿ=..u.Õ...v$.võ..6...FŸÕN.Õ...v. 000120
0C76FF0E 76FF0000 39CE9A02 6A0C76FF 0E76FF00 0038A69A 5016F846 8D0C76FF .v..F½.P.Î8...v..v.j..ö9...v..v. 000140
38839AF8 76FF0C76 FF0E76FF 000038CD 9A016A03 6A6D77FF 266F77FF 26FC5EC4 á^▪&.wo&.wmj.j..ë8...v..v..v½.°8 000160
76FF0E76 FFD88E38 64881E56 57000034 C8000ECA C95F5E1F 0000E900 00880000 ..¡..Õ...^_èò..à4..WV.¦dß.Ä.v..v 000180
26F65EC4 F85689F6 46896857 88266947 8826FC5E C4000038 749A5016 FC46800C ..F▪.P.tß..á^▪&.Gi&.Wk.F-.V½á^-& 0001A0
468DE456 89E24689 14578826 12478826 F65EC40E 56890C46 89065788 26044788 .G.&.W..FÉ.Vßá^-&.G.&.W..Fã.Võ.F 0001C0
00003A75 9A006AE2 76FFE476 FF601868 0876FF0A 76FF0C77 FF26F65E C45016E6 Ì.Pá^-&.w..v..v.h.`.võ.vãj..u:.. 0001E0

Dump of file SATURN:[PCCOMMON.DUMP.DLL]SA-DIFM.DLL;1 on 18-APR-1990 10:50:26.92
File ID (450,15,0)   End of file block 323 / Allocated 324

Virtual block number 94 (0000005E), 512 (0200) bytes

FFE476FF 601D6850 16CC468D 00EFE9E0 46880006 E9037500 003DE046 8912C483 .á..FÄ=..u.Õ...FÄÕÿ..Fä.Ph.`.võ. 000000
CC468800 C6E9E046 880006E9 03750000 3DE04689 0CC48300 0038199A 006AE276 vãj...;...á..FÄ=..u.Õ...FÄÕ6..Fä 000020
5619EE46 29D65688 D44688EC 5619EA46 29D25688 D04688E8 5619E646 29CE5688 .Vö)FÌ.VÒ.FÄ.VØ)Fõ.V$.Få.V▪)FŸ.V 000040
468DDC76 FFDE76FF 00003918 9ADC76FF DE76FFF4 5619F246 29DA5688 D84688F0 Þ.FÄ.VÖ)F·.V¶.vß.vÉ..9...vß.vÉ.F 000060
39429A00 6AE276FF E476FF50 16FA468D 0060E903 74000030 00003928 9A5016E2 ã.P.(9..=..t.Õm..Fª.P.võ.vãj..B9 000080
6019680C 77FF26F6 5EC45016 E6468DFF C7E90003 E9037477 FA7E830A C4830000 ...á..-ªwt.Õ..Õú..FÌ.Pá^-&.w.h.` 0000A0
76FFFE76 FF001FE9 03750000 3DE04689 0EC48300 0039679A 006AE276 FFE476FF .võ.vãj..g9...á..FÄ=..u.Õ...v±.v 0000C0
000088FF 78E90009 E9E04688 00003980 9ADC76FF DE76FF04 C48338FB 00649AFC ▪.d.«ß.á..vß.vÉ..9...FÄÕ..Õ(.¡.. 0000E0
16FC468D 0C76FF0E 76FFD88E 39E7881E 56570000 14C8000E CAC95F5E 1F0000E9 Õ...^_èò..à...WV.¦Õ9.Ä.v..v..F▪. 000100
88260447 8826F25E C4F45689 F2468968 57882669 478826FC 5EC40000 39F79A50 P.¥9..á^▪&.Gi&.Wk.F·.V¶á^·&.G.&. 000120
D49A5016 EE468DF6 76FFF876 FF00003A C49AF676 FFF876FF F85689F6 46890657 W..F~.V½.v½.v~.á:...v½.v~.FŸ.P.å 000140
0AC48300 003AEE9A 006AEE76 FFF076FF 5016FA46 8D0059E9 03740000 3000003A :..=..t.ÕY..Fª.P.vÞ.vŸj..Ÿ:...á. 000160
3A4C9A00 6AEE76FF F076FF50 C9680876 FF0A76FF FFC7E900 03E90374 77FA7E83 .-ªwt.Õ..Õú..v..v.hè].vÞ.vŸj..L: 000180
09E9EC46 8800003B 409AF676 FFF876FF 0011E903 75000030 EC46890C C4830000 ...á..F$=..u.Õ...v½.v~.@;...F$Õ. 0001A0
0000B8D8 8E3B6288 1E565700 002AC800 0ECAC95F 5E1F0000 E9000088 FF8FE900 .Õ..¡..Õ...^_èò..àª..WV.¡b;.Ä¡.. 0001C0
57882669 478826FC 5EC40000 38729A50 16FC468D 0C76FF0E 76FFD646 89D84689 .FÄ.F▪.v..v..F=.P.r;..á^`§.Gi&.W 0001E0

Dump of file SATURN:[PCCOMMON.DUMP.DLL]SA-DIFM.DLL;1 on 18-APR-1990 10:50:26.92
File ID (450,15,0)   End of file block 323 / Allocated 324

Virtual block number 95 (0000005F), 512 (0200) bytes

89065788 26044788 26F45EC4 000039A6 9A016A0C 76FF0E76 FFF65689 F4468968 k.F¶.V-.v..v.j..[9..á^¶&.G.&.W.. 000000
0006E903 7500003D EE468906 C4833834 00009AFC 76FFFE76 FF176ADC 56890A46 FÕ.VÉj..v±.v▪...4;.á..FŸ=..u.Õ.. 000020
0038AF9A 5016F046 8DDA76FF DC76FF00 0038F9F9A DA76FFDC 76FF018C E9EE4688 .FŸÕ...vÉ.vÕ..;...vÉ.vÕ.FÞ.P.£;. 000040
7E830AC4 8300003B C99A006A F076FFF2 76FF5016 FA468000 6DE90374 00003D00 .=..t.Õm..Fª.P.v·.vÞj..è;...á..~ 000060
C4830000 3BEE9A00 6AF076FF F276FF5D C368006A 006AFFC7 E90003E9 037477FA ªwt.Õ..Õú.j.j.hû].v·.vÞj..Ÿ;...á 000080
DA76FFDC 76FF04C4 83305000 649AFC76 FFFE76FF 001FE903 7500003D EE46890C ..FŸ=..u.Õ...v±.v▪.d.P=.á..vÉ.vÕ 0000A0
6830C568 0C76FF0E 76FFFF7B E9000856 8301D646 830107E9 EE468800 003C079A ..<...FŸÕ...F▪..VÄ.Õ(..v..v.hé=h 0000C0
00649AFC 76FFFE76 FF00001C D29A5016 F8468050 16DE468D FC76FFFE 76FF1CBE ƒ..v±.v▪.Fß.P.F½.P.Ø....v±.v▪.d. 0000E0
7E0075E9 037000D8 7E83008C E9EE4688 0006E903 7500003D EE468904 C4833C80 .<.á..FŸ=..u.Õ...FŸÕ¥..-Ä.}.Õu.~ 000100
0C76FF0E 76FF0000 3DAD9A02 6A0C76FF 0E76FF00 67E90377 01D67E83 0009E903 .Õ...-▪.w.Õg..v..v.j..Û=...v..v. 000120
003C609A 016A0C76 FF0E76FF 00003DE0 9A016A03 6A6D77FF 266F77FF 26FC5EC4 á^▪&.wo&.wmj.j..Ä=...v..v.j..`<. 000140
0C76FF0E 76FF08C4 832E6211 4D9ADA76 FFDC76FF 6D77FF26 6F77FF26 FC5EC400 .á^▪&.wo&.wm.vÉ.vÕ.M.b..á..v..v. 000160
0E76FF00 10E90375 00F87E83 000039C0 9A016A03 6A6D77FF 266F77FF 26FC5EC4 á^▪&.wo&.wmj.j..á9...~½.u.Õ...v. 000180
76FF0E76 FF124789 26144789 26000088 F45EC400 001D139A 5016DE46 8D0C76FF .v..Fß.P.....á^¶¡..&.G.&.G..v..v 0001A0
1E565700 00C8C800 0ECAC95F 5E1F0000 E9000088 0000264C 9A1076FF 1276FF0C ..v..v..L&..¡..Õ...^_èò..àà..WV. 0001C0
FC46800C 76FF0E76 FF9A4689 9C468900 00889646 89984689 0000B8D8 8E3C2988 ¡)<.Ä¡...F..F.¡...F..F..v..v..F▪ 0001E0
```

```
Dump of file SATURN:[PCCOMMON.DUMP.DLL]SA-DIFM.DLL;1 on 18-APR-1990 10:50:26.92
File ID (450,15,0)   End of file block 323 / Allocated 324

Virtual block number 96 (00000060), 512 (0200) bytes

 261877FF 26825EC4 84568982 46896857 88266947 8826FC5E C400003C 429A5016 .P.B<..á^=&.Gi&.Wk.Fý.VÇá^ý&.w.& 000000
 FF1276FF 0C76FF0E 76FF003A E9037500 FA7E8300 003FF59A 5016FA46 8D1677FF .w..Fª.P.%?...-ª.u.Õ:..v..v..v.. 000020
 FF0E76FF 006A8446 8900003E FD9A0477 FF260677 FF26FC5E C400003E ED9A1076 v..Ú>..á^=&.w.&.w..»>...F.j..v.. 000040
 5016AE46 8D505200 1605B456 88B24688 01E2E900 01B806C4 833F0F03 039A0C76 v.....?.á.|..Õã..Fý.VÇ...RP.FÛ.P 000060
 003E189A 1076FF12 76FF0C76 FF0E76FF 003AE903 7500003D 84468900 00FFFF9A ......F.=..u.Õ:..v..v..v..v...>. 000080
 8503039A 0C76FF0E 76FF006A 84468900 00241E9A 0477FF26 0677FF26 FC5EC400 .á^=&.w.&.w...$...F.j..v..v..... 0000A0
 8300003F 6C9A006A AE76FFB0 76FF50C0 6850169E 46800188 E9844688 06C4832D -.á..F.Õ...F..Phå].v¯.vÛj..l?... 0000C0
 468D0876 FF0A76FF 50169646 80015FE9 84468800 06E90375 00003D84 46890CC4 á..F.=..u.Õ...F.Õ_..F..P.v..v..F 0000E0
 00003F92 9A006AAE 76FFB076 FF5DC368 50169E46 800CC483 300511B0 9A50169E ..P.¯..=.á..F..Phũ].v¯.vÛj. .?.. 000100
 6AAE76FF B076FF5D C768016A 011EE984 46880006 E9037500 00308446 890CC483 .á..F.=..u.Õ...F.Õ..j.hú].v  vÛj 000120
 0C76FF0E 76FF00F8 E9844688 0006E903 7500003D 8446890A C4830000 3CEA9A00 ..õ<...á..F.=..u.Õ...F.Õ%..v..✓. 000140
 7500B67E 8300003D 439A5016 86468050 16864680 FC76FFFE 76FF3D30 68302068 h-=h0=.v±.v=.F..P.FÑ.P.C=...-Ñ.u 000160
 8D1677FF 261877FF 26825EC4 00003DF9 9A501686 46800C76 FF0E76FF 0010E903 .Õ...v..v..F..P.ª=..á^ý&.w.&.w.. 000180
 939A1076 FF1276FF 0C76FF0E 76FF003D E9037500 FA7E8300 00042A9A 5016FA46 Fª.P.*....-ª.u.Õ=..v..v..v..v... 0001A0
 039A0C76 FF0E76FF 006A8446 8900003E A39A0477 FF260677 FF26FC5E C400003E >..á^=&.w.&.w..È>...F.j..v..v... 0001C0
 9A5016AE 468D1677 FF261877 FF26825E C4005DE9 0066E984 46880 6C4 833EB503 .ç>.á..F.Õf.Õ].á^ý&.w.&.w..FÛ.P. 0001E0

Dump of file SATURN:[PCCOMMON.DUMP.DLL]SA-DIFM.DLL;1 on 18-APR-1990 10:50:26.92
File ID (450,15,0)   End of file block 323 / Allocated 324

Virtual block number 97 (00000061), 512 (0200) bytes

 38868D0C C4830000 3F289A00 6AAE76FF B076FF5D C1685016 FF38868D 00001A68 k.....8..Phè].v¯.vÛj..+?...á...8 000000
 468D1DB1 686177FF 26FC5EC4 0CC48301 E1010A9A 5016B846 8D01D868 1E5016FF ..P.hÄ..F|.P...Ä..á.á^=&.wahÝ..F 000020
 1E565700 000CC800 0ECAC95F 5E1F0000 E90000B8 00002011 9A006A00 6A501688 |.Pj.j...-..|..Õ...^_èò..à...WV. 000040
 68578826 69478826 FC5EC400 003E539A 5016FC46 8D0C76FF 0E76FFD8 8E3E31B8 |1>.Ä.v..v..F=.P.S>.¯á^=&.Gi&.Wk 000060
 F676FF0C 76FF0E76 FFF65689 F4468910 578B260E 478826F8 5EC4FA56 89F84689 .F%.Vªá^Y&.G.&.W..F¶.V-.v..v..v- 000080
 57892608 478926F4 5EC40257 8826078B 26085EC4 00004138 9A016A03 6AF476FF .v¶j.j..8A..á^.&..&.W.á^¶&.G.&.W 0000A0
 F676FF0C 76FF0E76 FF0E5789 260C4789 26F45EC4 06578826 04478826 085EC40A .á^.&.G.&.W.á^¶&.G.&.W..v..v..v- 0000C0
 1E565700 000CC800 0ECAC95F 5E1F0000 E90000B8 00003DA0 9A016A03 6AF476FF .v¶j.j...=..|..Õ...^_èò..à...WV. 0000E0
 68578826 69478826 FC5EC400 0040C19A 5016FC46 8D0C76FF 0E76FFD8 8E408188 |Ýª.Ä.v..v..F=.P.èª.¯á^=&.Gi&.Wk 000100
 F676FF0C 76FF0E76 FFF65689 F4468910 578B260E 478826F8 5EC4FA56 89F84689 .F%.Vªá^Y&.G.&.W..F¶.V-.v..v..v- 000120
 FF0C76FF 0E76FF00 0030869A 016A0C76 FF0E76FF 000040F8 9A016A03 6AF476FF .v¶j.j..Yª...v..v.j...=...v..v.. 000140
 0000B800 00FFFF9A 026AF476 FFF676FF 0C76FF0E 76FF0000 400F9A10 76FF1276 v..v...ª...v..v..v-.v¶j......|.. 000160
 16FC468D 0C76FF0E 76FFD88E 4151B81E 56570000 18C8000E CAC95F5E 1F0000E9 Õ...^_èò..à...WV.|QA.Ä.v..v..F=. 000180
 76FFF476 FF006A00 6AF45689 F246896B 57882669 478826FC 5EC40000 41619A50 P.aA..¯á^=&.Gi&.Wk.F·.V¶j.j..v¶.v 0001A0
 F8468D00 6A006A00 6A006A00 6A006A00 6A006A00 6A006A08 C483424B 14759AF2 ·.u.KB.á.j.j.j.j.j.j.j.j.j..F% 0001C0
 28C4833F 8112EC9A FC76FFFE 76FF0876 FF0A76FF 5016EE46 8D5016F6 468D5016 .P.F-.P.FŸ.P.v..v..v±.v=.š.Ý?.á( 0001E0

Dump of file SATURN:[PCCOMMON.DUMP.DLL]SA-DIFM.DLL;1 on 18-APR-1990 10:50:26.92
File ID (450,15,0)   End of file block 323 / Allocated 324

Virtual block number 98 (00000062), 512 (0200) bytes

 26085EC4 00AEE903 74F0460B EE468800 BFE9EC46 880006E9 03750000 3DEC4689 .F&=..u.Õ...F&Õ¢..FY.FÞt.ÕÛ.á^.& 000000
 C406578B 2604478B 26085EC4 02578926 0789260E 5FC426F2 5EC40257 8826078B ..&.W.á^·&á_.&..&.W.á^.&.G.&.W.á 000020
 260E5FC4 26F25EC4 02578826 07882608 5EC40657 89260447 89260E5F C426F25E ^·&á_.&.G.&¯W.á^.&..&.W.á^·&á_.& 000040
 5789260C 4789260E 5FC426F2 5EC40657 88260447 8826085E C40A5789 26084789 .G.&¯W.á^.&.G.&.W.á^·&á_.&.G.Ē.W 000060
 6A0E77FF 261077FF 26F25EC4 0C76FF0E 76FF0000 41A59A02 6A0C76FF 0E76FF0E ..v..v.j..ÊA...v..v.á^·Ē.w.&.w.j 000080
 FF0C76FF 0E76FFEA 5689E846 894E578B 264C478B 26F25EC4 00004198 9A016A03 .j...A..á^·&.GL&.WN.FÒ.VÕ.v..v.. 0000A0
 E2881E56 57000004 C8000ECA C95F5E1F 0000E900 00B80000 38489AE8 76FFEA76 võ.vÒ.KB..|..Õ...^_èò..à...WV.|ã 0000C0
 E4681E1D 81686177 FF26FC5E C4000041 F29A5016 FC468D06 76FF0876 FF088E41 A.Ä.v..v..F=.P.·A..¯á^=&.wahÝ..hõ 0000E0
 9A5C77FF 265E77FF 26695FC4 26FC5EC4 0676FF08 76FF0000 40989A00 6A006A01 .j.j...ª...v..v.á^=&á_i&.w^&.w\. 000100
 0E76FFD8 8E432F88 1E565700 0012C800 04CAC95F 5E1F0000 E90000B8 00004316 .C..|..Õ...^_èò..à...W̃V.|/C.Ä.v. 000120
 006A006A 006A006A 006A006A 006A0000 F646C700 00433F9A 5016FC46 8D0C76FF .v..F=.P.?C..úF-..j.j.j.j.j.j.j. 000140
 76FFFE76 FF0876FF 0A76FF50 16F8468D 5016EE46 8D5016F2 468D006A 006A006A j.j.j..F·.P.FŸ.P.F%.P.v..v..v±.v 000160
 6AF876FF FA76FF50 16F04680 0023E903 75FA4608 F8468828 C4834214 12EC9AFC =.š..B.á(.F%.Fªu.Õ#..FÞ.P.vª.v%j 000180
 F676FF0C 76FF0E76 FF0001F6 46C70005 E9037478 F07E830A C4830000 3CC79A00 ..ú<...á..-Þxt.Õ..úF-...v..v..v- 0001A0
 D88E4389 881E5657 000010C8 000ECAC9 5F5E1F00 00E90000 B8000009 509A006A j..P...|..Õ...^_èò..à...WV.|.C.Ä 0001C0
 006A006A 006A006A 006A006A 006A006A 00004399 9A5016FC 46800C76 FF0E76FF .v..v..F=.P..C..j.j.j.j.j.j.j.j. 0001E0
```

```
Dump of file SATURN:[PCCOMMON.DUMP.DLL]SA-DIFM.DLL;1 on 18-APR-1990 10:50:26.92
File ID (450,15,0)   End of file block 323 / Allocated 324

Virtual block number 99 (00000063), 512 (0200) bytes

 9AFC76FF FE76FF08 76FF0A76 FF5016F8 46805016 F0468050 16F4468D 006A006A j.j..F¶.P.FÞ.P.F½.P.v..v..v±.v•. 000000
 C4025789 26078926 715FC426 FC5EC402 57882607 8826085E C428C483 43D412EC ŝ.ÅC.á(á^.&..&.W.á^•&á_q&..&.W.á 000020
 75FA4608 F8468806 57892604 47892671 5FC426FC 5EC40657 88260447 8826085E ^.&.G.&.W.á^•&á_q&.G.&.W..F½.F'u 000040
 E9037578 F27E830A C4830000 43F29A00 6AF876FF FA76FF50 16F2468D 0015E903 .Õ...F·.P.v'.v½j..·C...á..~·xu.Õ 000060
 E90017E9 45014500 9A0676FF 0876FF0A 76FF0C76 FF0E76FF 1076FF12 76FF0020  ..v..v..v..v..v..v..v...E.EÕ..Õ 000080
 0034C800 0ECAC95F 5E1F0000 E9403147 C29AF876 FFFA76FF 0C76FF0E 76FF0014 ...v..v..v'.v½.õG1@Õ...^_èò..à4. 0000A0
 5EC40000 443C9A50 16FC468D 0C76FF0E 76FF0006 FA46C7D8 8E442C88 1E565700 .WV.¡,D.ÄúF'...v..v..F•.P̄.<D..á^ 0000C0
 8906C483 3F560000 9AFC76FF FE76FF12 6AE85689 E6468906 57882604 47882 6FC •&.G.&.W..Fl.Vòj..v±.v•...V?.á.. 0000E0
 E9037500 CC7E8300 00FFFF9A 0876FF0A 76FF0876 FF0A76FF 0C76FF0E 76FFCC46 Fë.v..v..v..v..v..v.......-ë.u.Õ 000100
 46880000 45889AE6 76FFE876 FF000045 C99A1076 FF1276FF 0C76FF0E 76FF0022 "..v..v..v..v..èE...vò.vl.¡E...F 000120
 22E90375 000030CC 46890000 FFFF9A50 1602468D 126AE676 FFE876FF 0227E9CC äÕ'..vò.vlj..F@.P......Fë=..u.Õ" 000140
 CC468800 0046159A 1076FF12 76FF0C76 FF0E76FF 00004604 9AE676FF E876FF00 ..vò.vl..F...v..v..v..v...F...Fë 000160
 FFFF9A03 6AD276FF D476FF1A 6A37FF26 0277FF26 FC5EC4E6 76FFE876 FF01E8E9 õò..vò.vlá^•&.w.&.7j..vå.v@j.... 000180
 76FF0C76 FF0E76FF 00004697 9AE676FF E876FF00 22E90375 00003DCC 46890000 ...Fë=..u.Õ"..vò.vl..F...v..v..v 0001A0
 C4D85689 D6468902 57882607 8826085E C4019CE9 CC468800 0046A89A 1076FF12 ..v..´F...FäÕ..á^.&..&.W..Fø.VÄá 0001C0
 00028300 8C050257 88260788 26085EC4 E45689E2 46890657 88260447 8826085E ^.&.G.&.W..Fã.Võá^.&..&.W.....@. 0001E0

Dump of file SATURN:[PCCOMMON.DUMP.DLL]SA-DIFM.DLL;1 on 18-APR-1990 10:50:26.92
File ID (450,15,0)   End of file block 323 / Allocated 324

Virtual block number 100 (00000064), 512 (0200) bytes

 E876FF0C 5689DA46 89000A83 008C2D06 57882604 47882608 5EC4E056 890E4689 .F8.VÅá^.&.G.&.W.-...Õ..FÕ.VÉ.vò 000000
 0022E903 7500003D CC468900 0046C69A 50160646 8D046AD2 76FFD476 FFE676FF .vl.vå.v@j..Fø.P.óF...Fë=..u.Õ". 000020
 E9CC4688 000041B6 9A1076FF 1276FF0C 76FF0E76 FF000046 DC9AE676 FFE876FF .vò.vl.ÉF...v..v..v..v..ÑA...FäÕ 000040
 000030CC 46890000 FFFF9A50 16FA468D 056AD276 FFD476FF E676FFE8 76FF0109 ...vò.vl.vå.v@j..F*.P......Fë=.. 000060
 00471A9A 1076FF12 76FF0C76 FF0E76FF 0000401F 9AE676FF E876FF00 22E90375 u.Õ"..vò.vl..@...v..v..v..v...G. 000080
 0E76FF00 17E90375 000030CC 46890000 458A9AE6 76FFE876 FF00C4E9 CC468800 ..FëÕá..vò.vl..E...Fë=..u.Õ...v. 0000A0
 EC5689EA 46890856 88064688 0097E9CC 46880000 457F9A10 76FF1276 FF0C76FF .v..v..v...E...FäÕ...Fø.VÄ.Fõ.V§ 0000C0
 4689E456 88E24688 F05689EE 46890C56 880A4688 F45689F2 4689E056 880E4688 .F8.VÄ.F·.V¶.FÕ.VÉ.FŸ.VÞ.Fã.VÕ.F 0000E0
 006A006A 006A5016 EA468006 6A01F468 006A006A 006A006A 006A006A F85689F6 -.V½j.j.j.j.j.j.h¶.j..Fõ.Pj.j.j. 000100
 000023FA 9A006A78 6A5016CE 468DFC76 FFFE76FF D276FFD4 76FF01FD 681E1E6A j..h»..vå.v@.v±.v•.Fö.Pjxj..°#.. 000120
 CE76FFD0 76FF0C76 FF0E76FF 0017E9CC 46880006 E9037500 003DCC46 8930C483 .á0.Fë=..u.Õ...FäÕ...v..v..vÄ.vö 000140
 76FFD88E 4515881E 56570000 16C8000E CAC95F5E 1F0000E9 00008844 EA47C29A .õGõO¡..Õ...^_èò..à...WV.¡.E.Ä.v 000160
 00004815 9A006A06 76FF0876 FF5DC768 016A0000 452A9A50 16FC468D 0A76FF0C ..v..F•.P.*E..j.hú].v..v.j...H.. 000180
 FF0876FF 5DC06850 16EC468D 0092E9EA 46880006 E9037500 003DEA46 890AC483 .á..Fõ=..u.Õ...FõÕ...F§.Phâ].v.. 0001A0
 0C76FF00 69E9EA46 880006E9 03750000 3DEA4689 0CC48300 0048789A 006A0676 v.j..xH...á..Fõ=..u.Õ...FõÕi..v. 0001C0
 89261247 89260856 88064688 695FC426 FC5EC400 003FE09A 5016EC46 800A76FF .v..F§.P.Å?..á^•&á_i.F..V.&.G.&. 0001E0

Dump of file SATURN:[PCCOMMON.DUMP.DLL]SA-DIFM.DLL;1 on 18-APR-1990 10:50:26.92
File ID (450,15,0)   End of file block 323 / Allocated 324

Virtual block number 101 (00000065), 512 (0200) bytes

 FF5F5068 00004370 9A7877FF 267A77FF 26695FC4 26FC5EC4 0A76FF0C 76FF1457 W..v..v.á^•&á_i&.wz&.wx.pC..hP_. 000000
 0006E9EA 46880006 E9037500 0030EA46 8908C483 00004066 9A006A06 76FF0876 v..v.j..f@...ǯ..Fõ=..u.Õ...FõÕ.. 000020
 FF0C76FF 0E76FF08 8E47CA88 1E565700 0002C800 08CAC95F 5E1F0000 E9000088 ¡..Õ...^_èò..à...WV.¡òG.Ä.v..v.. 000040
 FF0E76FF 0023E9FE 46880006 E9037500 FE7E83FE 46890000 46ED9A10 76FF1276 v..v..ÚF...F±.~±.u.Õ...F±Õ#..v.. 000060
 1F0000E9 00008800 06E9FE46 880006E9 037500FE 7E83FE46 890000FF FF9A0C76 v.......F±.~±.u.Õ...F±Õ..¡..Õ... 000080
 740F087E 830095E9 03754006 46F6D88E 48A5881E 56570000 4AC8000E CAC95F5E ^_èò..àJ..WV.¡ÈH.Ä-F.@u.Õ...~..t 0000A0
 89685788 26694788 26FC5EC4 000047DA 9A5016FC 46800A76 FF0C76FF 008CE903 .Õ...v..v..F•.P.ÕG..á^•&.Gi&.Wk. 0000C0
 47892600 0088865E C408C483 44721475 9A8676FF 8876FF00 6A006A88 56898646 FÑ.V¡j.j..v¡.vÑ.u.rD.á.á^Ñ¡..&.G 0000E0
 9A426A50 168A468D 013F6806 C48347B3 03039A0A 76FF0C76 FF006A12 47892614 .&.G.j..v..v....°G.á.h?..F¤.PjB. 000100
 FF0C76FF 00004356 9A006A00 6A50168A 46801D81 686177FF 26FC5EC4 00001D21 !...á^•&.wahŸ..F¤.Pj.j..VC...v.. 000120
 00479000 0CCAC95F 5E1F0000 E90001B8 0006E900 09E90000 880000FF FF9A0A76 v......¡..Õ..Õ..¡..Õ...^_èò...G. 000140
 03A3000C 2E280203 03280008 40500203 0232000A 49880203 01410008 1E8E0203 ..ƒ...A....I..2...P@..+...(...È. 000160
 00C80008 46810203 0813000F 44130203 02AF0008 3C9D0203 08FD0011 237F0203 ...#..»....<..£....D.......F..ù. 000180
 03390008 1A7E0203 00000004 49420002 00560007 2AF60203 0C0D0004 3F840005 ..Ç?......-*..V...BI.......~...9. 0001A0
 01550008 1F860203 00000005 49600002 08930010 47EC0203 0C0A0011 1E720203 ..r.......§G......'I.........U. 0001C0
 01610008 1ED20203 0C190011 18C80203 08360000 06880203 02C00008 30110203 ...•..å.......6...à.......@...e. 0001E0
```

```
Dump of file SATURN:[PCCOMMON.DUMP.DLL]SA-DIFM.DLL;1 on 18-APR-1990 10:50:26.92
File ID (450,15,0)   End of file block 323 / Allocated 324

Virtual block number 102 (00000066), 512 (0200) bytes

 0AB4000F 39990203 02D4000B 3CAD0203 0C930013 49700203 00680008 00CF0203 ..Ü...h...pI......Ù<..å....9..Ç. 000000
 016E0008 23A00203 05C60000 258C0203 0355000B 3ED10203 00850015 00930203 ..........I>..U....X..ó....#..n. 000020
 08CA000D 45650203 00F00008 45EE0203 0848000D 252D0203 0C270011 213D0203 ..=I..'...-X..H...ŸE..Þ...eE..ò. 000040
 0361000B 3E790203 0AC0000F 49200203 0000000D 454A0002 0B830010 478C0203 ...G..•...JE...... I..å...y>..■. 000060
 085F000D 25550203 0360000B 24710203 00830008 46FE0203 01810008 291B0203 ...........#..T....ə.......■..Ò. 000080
 02F3000B 247F0203 0563000D 3FC70203 0B51000F 48D30203 00000012 48FE0002 ...).......±F.......g$..m...UX.._. 0000A0
 095B000F 040A0203 002F0004 05B20103 06E6000D 081E0203 008E0008 016B0203 ..±H......ÆH..Q...ú?..c....$..ж. 0000C0
 0098000B 01020203 0870000D 256B0203 0300000B 2E080203 01140008 45A20203 ..k............I...ý.../........[. 0000E0
 0AEF000F 42DA0203 096D000F 49930203 09EA000F 05100203 08F0000E 48680203 ..ÅE................kX..p......... 000100
 0978000F 48390203 08FC000E 48B60203 09F1000F 41C90203 0BE80010 44C20203 ..hH..Þ.......õ....I..m...ÖB..ÿ. 000120
 0908000E 03B00203 0A7F000F 29980203 031C0008 04B50203 09FB000F 42F40203 ..õO..Ò...èA..Þ...ÑH..■...9H..x. 000140
 00000000 00000000 00B00008 013D0203 0813000D 06B00203 0691000D 08030203 ..¶B..«...ç.........)............. 000160
 5689F246 89FE578B 26FC478B 260E5EC4 040E4683 D88EFFFF B81E5657 000028C8 ...........§........=...§......... 000180
 DA468965 578B2663 478B26F8 5EC4FA56 89F84689 0657BB26 04478B26 0A5EC4F4 à(..WV.|...Ä.F..ó^.&.G=&.Wt.F·.V 0001A0
 FC468D00 010A47C7 260A5EC4 F05689EE 46890657 8B260447 8B26F85E C4DC5689 ¶ó^.&.G.&.W..F½.V'ó^½&.Gc&.We.FÖ 0001C0
                                                                         .VÉó^½&.G.&.W..FŸ.VÞó^.&úG....F■ 0001E0

Dump of file SATURN:[PCCOMMON.DUMP.DLL]SA-DIFM.DLL;1 on 18-APR-1990 10:50:26.92
File ID (450,15,0)   End of file block 323 / Allocated 324

Virtual block number 103 (00000067), 512 (0200) bytes

 003DD846 8910C483 0000013E 9A006A06 76FF0876 FF271068 EE76FFF0 76FF5016 .P.vÞ.vŸh.'.v..v.j..>....ó..FÄ=. 000000
 FFFF9A50 16F6468D FC76FFFE 76FFEE76 FFF076FF 0100E9D8 46880006 E9037500 .u.Õ...FÄÕ...vÞ.vŸ.v±.v■.F-.P... 000020
 FFF076FF 001AE903 7400F67E 8300D9E9 D8468800 06E90375 00003DD8 46890000 ...FÄ=..u.Õ...FÄÕ1..-.t.Õ...vÞ. 000040
 FF0876FF F876FFFA 76FF0000 FFFF9A50 D8F7C01B 01F67E83 FC76FFFE 76FFEE76 vŸ.v±.v■.—..ô¾ÄP......v'.v½.v.. 000060
 8B26F25E C40091E9 D8468800 06E90375 00003DD8 468908C4 83FFFF08 C59A0676 v..é....ó..FÄ=..u.Õ...FÄÕ..ó^·&. 000080
 5EC40657 8B260447 8B26F25E C4025789 26078926 0E5FC426 0A5EC402 578B2607 .&.W.ó^.&ó_.&..&.W.ó^·&.G.&.W.ó^ 0000A0
 FFFF9A00 6A0676FF 0876FF50 C0685016 DE468D06 57892604 4789260E 5FC4260A .&ó_.&.G.&.W..F8.Phå].v..v.j.... 0000C0
 6E8300E0 5E830CDE 6E830036 E9D8468B 0006E903 7500003D D846890C C4830000 ...Ã..FÄ=..u.Õ...FÄÕ6..n8..^Å..n 0000E0
 16DE468D DA76FFDC 76FF00EC 56830CEA 468300E8 56830CE6 468300E4 5E830CE2 ã..^ö..FI..VÒ..Fõ..V$..vÊ.vÖ.F8. 000100
 0A5EC4D8 8E00088B 1E565700 0024C8CB C95F5E1F 0000E900 00B80000 FFFF9A50 P.....j..Õ...^ èùà$..WV.|...Äó^. 000120
 C4E05689 DE468965 578B2663 478B26F8 5EC4FA56 89F84689 0657BB26 04478B26 &.G.&.W..F½.V'Ã^½&.Gc&.We.F8.VÄó 000140
 76FF5016 FC468D00 000A47C7 260A5EC4 F45689F2 46890657 8B260447 8B26F85E ^½&.G.&.W..F·.V¶ó^.&úG....F■.P.v 000160
 E9037500 003DDC46 8910C483 00000219 9A006A06 76FF0876 FF271068 F276FFF4 ¶.v·h.'.v..v.j.......ó..FÉ=..u.Õ 000180
 0CC48300 0002B19A 006A0676 FF0876FF 5DC06850 16E2468D 00F7E9DC 46880006 ...FÉÕ%..Fã.Phå].v..v.j..Ÿ....ó. 0001A0
 F6468DFC 76FFFE76 FFF276FF F476FF00 CEE9DC46 880006E9 03750000 3DDC4689 .FÉ=..u.Õ...FÉÕö..v¶.v·.v±.v■.F- 0001C0
 1AE90375 00F67E83 00A7E9DC 46880006 E9037500 003DDC46 89000000 9E9A5016 .P......FÉ=..u.Õ...FÉÕI..—.u.Õ. 0001E0

Dump of file SATURN:[PCCOMMON.DUMP.DLL]SA-DIFM.DLL;1 on 18-APR-1990 10:50:26.92
File ID (450,15,0)   End of file block 323 / Allocated 324

Virtual block number 104 (00000068), 512 (0200) bytes

 76FFFA76 FF000000 D29A5008 F7C01B01 F67E83FC 76FFFE76 FFF276FF F476FF00 ..v¶.v·.v±.v■.—..å¾ÄP.●....v'.v 000000
 005FE9DC 46880006 E9037500 003DDC46 8908C483 00E50A77 9A0676FF 0876FFF8 ½.v..v..w.I..ó..FÉ=..u.Õ...FÉÕ_. 000020
 03750000 3DDC4689 0CC48300 0000749A 006A0676 FF0876FF 5DC06850 16E2468D .Fã.Phå].v..v.j..t....ó..FÉ=..ū. 000040
 EC568306 EA468300 E85E8306 E66E8300 E45E8306 E26E8300 36E9DC46 880006E9 Õ...FÉÕ6..nã..^ö..nI..^Ò..Fõ..V$ 000060
 1F0000E9 00008800 0001829A 5016E246 8DDE76FF E076FF00 F0568306 EE468300 ..FŸ..VÞ..vÅ.v8.Fã.P.....|..Õ... 000080
 89FE578B 26FC478B 260E5EC4 040E4683 D88E0199 B81E5657 000022C8 CBC95F5E ^ èùà"..WV.|...Ä.F..ó^.&.G=&.Wt. 0000A0
 578B2663 478B26FC 5EC4FE56 89FC4689 0657BB26 04478B26 0A5EC4FA 5689F846 F¾.V'ó^.&.G.&.W..F■.V±ó^=&.Gc&.W 0000C0
 010A47C7 260A5EC4 F65689F4 46890657 8B260447 8B26FC5E C4E25689 E0468965 e.FÄ.Vãó^=&.G.&.W..F¶.V-ó^.&úG.. 0000E0
 0006E903 7500003D DE468908 C483028A 08C59A06 76FF0876 FFFC76FF FE76FF00 ..v±.v■.v..v..é....ó..F8=..u.Õ.. 000100
 5EC40257 89260789 260E5FC4 260A5EC4 02578B26 078B26F8 5EC40091 E9DE468B .F8Õ..ó^½&..&.W.ó^.&ó_.&..&.W.ó^ 000120
 5DC06850 16E4468D 06578926 04478926 0E5FC426 0A5EC406 578B2604 478B26F8 ½&.G.&.W.ó^.&ó_.&.G.&.W..Fõ.Phå] 000140
 36E9DE46 880006E9 03750000 3DDE4689 0CC48300 0001F09A 006A0676 FF0876FF .v..v.j..Þ....Ã..F8=..u.Õ...F8Õ6 000160
 F2568306 F0468300 EE568306 EC468300 EA5E8306 E86E8300 E65E8306 E46E8300 ..nõ..^I..nÒ..^ö..F$..VŸ..FÞ..V· 000180
 00001EC8 CBC95F5E 1F0000E9 00008800 0002F59A 5016E446 8DE076FF E276FF00 ..vã.vÅ.F8.P.%...|..Õ...^ èùà... 0001A0
 63478B26 FC5EC4FE 5689FC46 8906578B 2604478B 260A5EC4 D88E030C B81E5657 WV.|...Äó^.&.G.&.W..F■.V±Ã^=&.Gc 0001C0
 C7260A5E C4FA5689 F8468906 578B2604 478B26FC 5EC4E656 89E44689 65578B26 &.We.Fõ.V|ó^=&.G.&.W..F½.V'ó^.&ú 0001E0
```

```
Dump of file SATURN:[PCCOMMON.DUMP.DLL]SA-DIFM.DLL;1 on 18-APR-1990 10:50:26.92
File ID (450,15,0)   End of file block 323 / Allocated 324

Virtual block number 105 (00000069), 512 (0200) bytes

 3DE24689 0CC48300 0004C39A 006A0676 FF0876FF 5DC06850 16E84680 00000A47 G....FÒ.Phå].v..v.j..ù....á..Fã= 000000
 C4830370 0A779A06 76FF0876 FFFC76FF FE76FF00 84E9E246 880006E9 03750000 ..u.Õ...FãÕ...v±.v=.v..v..w.p..á 000020
 0676FF08 76FF5DC0 685016E8 4680005F E9E24688 0006E903 75000030 E2468908 ..Fã=..u.Õ...FãÕ_..FÒ.Phå].v..v. 000040
 8306E86E 830036E9 E2468800 06E90375 000030E2 46890CC4 83000003 C99A006A j..è....á..Fã=..ū.Õ...FãÕ6..nÒ.. 000060
 76FFE676 FF00F656 8306F446 8300F256 8306F046 8300EE5E 8306EC6E 8300EA5E ^õ..nš..^Ÿ..Fþ..V·..F¶..V-..v].v 000080
 0424B81E 56570000 06C8CBC9 5F5E1F00 00E90000 B8000004 0D9A5016 E8468DE4 ô.FÒ.P.....¡..Õ...^_èùà...WV.¡$. 0000A0
 74000A7F 83260A5E C4FE5689 FC4689FE 578B26FC 478B260E 5EC4040E 4683D88E .Ä.F..á^.&.G=&.W±.F=.V±á^.&....t 0000C0
 FA46890C C4830000 04759A00 6A0676FF 0876FF5D CC68FC76 FFFE76FF 002AE903 .Õ*..v±.v=hä].v..v.j..u....á..F* 0000E0
 1E565700 0006C8CB C95F5E1F 0000E900 00B80006 E9FA4688 0006E903 75000030 =..u.Õ...F*Õ..¡..Õ...^_èùà...WV. 000100
 7F83260A 5EC4FE56 89FC4689 FE578B26 FC478B26 0E5EC404 0E46830B 8E051EB8 ¡...Ä.F..á^.&.G=&.W±.F=.V±á^.&.. 000120
 0CC48300 0005E09A 006A0676 FF0876FF 5DCC68FC 76FFFE76 FF002DE9 0374000A ..t.Õ-..v±.v=hä].v..v.j..Å....á. 000140
 9A006A06 76FF0876 FF5DCD68 0024E900 2DE9FA46 880006E9 03750000 3DFA4689 .F*=..u.Õ...F*Õ-.Õ$.hë].v..v.j.. 000160
 5E1F0000 E9000088 0006E9FA 46880006 E9037500 0030FA46 8908C483 00000556 V....á..F*=..u.Õ...F*Õ..¡..Õ...^ 000180
 4689FE57 8826FC47 88260E5E C4040E46 83D88E05 81B81E56 57000004 C8CBC95F _èùà...WV.¡...Ä.F..á^.&.G=&.W±.F 0001A0
 000004C8 CBC95F5E 1F0000E9 00008807 8926FC5E C40A478B 260A5EC4 FE5689FC =.V±á^.&.G.á^=&..¡..Õ...^_èùà... 0001C0
 0A4688FE 5689FC46 89FE578B 26FC478B 260E5EC4 040E4683 D88E0608 B81E5657 WV.¡...Ä.F..á^.&.G=&.W±.F=.V±.F. 0001E0

Dump of file SATURN:[PCCOMMON.DUMP.DLL]SA-DIFM.DLL;1 on 18-APR-1990 10:50:26.92
File ID (450,15,0)   End of file block 323 / Allocated 324

Virtual block number 106 (0000006A), 512 (0200) bytes

 C95F5E1F 0000E900 008808C4 83FFFF00 569AFC76 FFFE76FF 50520012 050C5688 .V....RP.v±.v=.V....á.¡..Õ...^_è 000000
 89FC4689 FE578B26 FC478B26 0E5EC404 0E4683D8 8E0644B8 1E565700 0004C8CB ùà...WV.¡D..Ä.F..á^.&.G=&.W±.F=. 000020
 56570000 04C8CBC9 5F5E1F00 00E90000 B8078926 FC5EC408 478B260A 5EC4FE56 V±á^.&.G.á^=&..¡..Õ...^_èùà...WV 000040
 8B260A5E C4FE5689 FC4689FE 578B26FC 478B260E 5EC4040E 4683D88E 0689B81E .¡...Ä.F..á^.&.G=&.W±.F=.V±á^.&. 000060
 83D88E06 C2B81E56 57000002 C8CBC95F 5E1F0000 E9000088 078926FC 5EC40C47 G.á^=&..¡..Õ...^_èùà...WV.¡ô..Ä. 000080
 5F5E1F00 00E90000 B80C4789 26FE4688 0A5EC4FE 4689FE47 8B260E5E C4020E46 F..á^.&.G±.F±á^..F±&.G.¡..Õ...^ 0000A0
 C8CBC95F 5E1F0000 E9000205 08568806 4688D88E 06FB881E 56570000 00C8CBC9 èùà...WV.¡«..Ä.F..V....Õ...^_èùÃ 0000C0
 6A006A00 6A5D6A01 FE681E01 6A006AFF FF68FFFF 68D88E07 2A881E56 57000000 ...WV.¡*..Äh..h..j.j..h±.j]j.j.j 0000E0
 0B800010 07660203 000A90CB C95F5E1F 0000E918 C4830000 FFFF9A00 6A766A01 .jvj.......á.Õ...^_èù.....f..... 000100
 00000010 06710002 00000006 074C0002 08930010 05B90203 00000004 049C0002 ..........¿.......L.......q..... 000120
 07220006 074F0005 01910008 02430203 00000012 07470002 01810008 02770203 ..w.......G.......C.......O...". 000140
 26065EC4 D88EFFFF B81E5657 000008C8 00000000 00000000 0978000F 05070203 ......x.........à...WV.¡...Äá^.& 000160
 5EC4FE56 89FC4689 61578B26 5F478B26 065EC4FA 5689F846 89715788 266F478B .Go&.Wq.F½.V*á^.&.G_&.Wa.F=.V±á^ 000180
 26F85EC4 02578926 078926FC 5EC40257 1B26072B 260A5EC4 02578B26 078B26F8 ½&..&.W.á^.&+.&.W.á^=&..&.W.á^½& 0001A0
 0A5EC406 57892604 478926FC 5EC40657 1B260447 2B260A5E C406578B 2604478B .G.&.W.á^.&+G.&.W.á^=&.G.&.W.á^. 0001C0
 0A5EC40A 57892608 478926FC 5EC40257 1B26072B 260A5EC4 0A578B26 08478B26 &.G.&.W.á^.&+.&.W.á^=&.G.&.W.á^. 0001E0

Dump of file SATURN:[PCCOMMON.DUMP.DLL]SA-DIFM.DLL;1 on 18-APR-1990 10:50:26.92
File ID (450,15,0)   End of file block 323 / Allocated 324

Virtual block number 107 (0000006B), 512 (0200) bytes

 00B80E57 89260C47 8926FC5E C406571B 2604472B 260A5EC4 0E578B26 0C478B26 &.G.&.W.á^.&+G.&.W.á^=&.G.&.W.¡. 000000
 C400000C 46C7000C DA46C7D8 8E000888 1E565700 0026C8CB C95F5E1F 0000E900 .Õ...^_èùà&..WV.¡...ÄúFÕ..úFÉ..á 000020
 06578B26 04478B26 065EC4E2 5689E046 890C561B DA462B02 578B2607 8B26065E ^.&...&.W.+FÕ.VÉ.FÁ.Vãá^.&.G.&.W. 000040
 E846890C 56130A46 030A578B 2608478B 26065EC4 E65689E4 46890C56 180A462B +FÕ.VÉ.FÕ.V]á^.&.G.&.W..FÕ.VÉ.FÒ 000060
 078B2606 5EC4EE56 89EC4689 DC56130A 46030E57 8B260C47 8B26065E C4EA5689 .Võá^.&.G.&.W..FÕ.VÉ.F&.VŸá^.&.. 000080
 56130A46 0306578B 2604478B 26065EC4 F25689F0 46890C56 130A4603 02578B26 &.W..FÕ.VÉ.Fþ.V·á^.&.G.&.W..FÕ.V 0000A0
 5EC4FA56 89F84689 DC561B0A 462B0A57 8B260847 8B26065E C4F65689 F446890C É.F¶.V-á^.&.G.&.W.+FÕ.VÉ.F½.V*á^ 0000C0
 5016E046 8D0A76FF 0C76FFFE 5689FC46 890C561B DA462B0E 578B260C 478B2606 .&.G.&.W.+FÕ.VÉ.F=.V±.v..v..FÁ.P 0000E0
 F04680DA 76FF0C76 FF0034E9 0375000E 7E830000 01BC9A00 6A006A50 160E4680 .FB.Pj.j..¥....-B.u.Õ4..v..v..Fþ 000100
 E90012E9 00008800 09E90375 000E7E83 0000FFFF 9A006A00 6A50160E 46805016 .P.FB.Pj.j.......-B.u.Õ. ¡..Õ..Õ 000120
 00C1B81E 56570000 02C8CBC9 5F5E1F00 00E90000 B80006E9 0009E900 01B80006 ..¡..Õ..Õ..¡..Õ...^_èùà.. WV.¡é. 000140
 9A006A68 77FF266D 77FF260A 5EC40031 E903756D 470B266B 478B260A 5EC4088E .Äá^.&.Gk&.Gmu.Õ1.á^.&.wm& ·kj.. 000160
 26604789 26000088 0A5EC400 14E9FE46 880006E9 03750000 30FE4689 0000FFFF .....F±=..u.Õ...F±Õ..á^.¡..&.Gm& 000180
 5FC4260A 5EC4D88E 01EEB81E 56570000 0AC8CBC9 5F5E1F00 00E90000 B86B4789 .Gk¡..Õ...^_èùà...WV.¡Ÿ..Äá^.&á 0001A0
 4689FE57 8826FC47 8B260E5E C4040E46 83FA5689 F8468965 578B2663 478B2606 .&.Gc&.We.F½.V*.F..á^.&.G=&.W±.F 0001C0
 FC76FFFE 76FFF876 FFFA76FF 0043E903 746D4708 26684788 260A5EC4 FE5689FC =.V±á^.&.Gk&.Gmt.ÕC..v*.v½.v±.v= 0001E0
```

Dump of file SATURN:[PCCOMMON.DUMP.DLL]SA-DIFM.DLL;1 on 18-APR-1990 10:50:26.92
File ID (450,15,0)   End of file block 323 / Allocated 324

Virtual block number 108 (0000006C), 512 (0200) bytes

```
46E9F646 880006E9 03750000 3DF64689 0000FFFF 9A505200 68050C56 880A4688 .F..V..k.RP......F-=..u.Ō...F-ŌF 000000
5DC468FC 76FFFE76 FF0000FF FF9A0676 FF0876FF 6877FF26 6D77FF26 0A5EC400 .á^.&.wm&.wk.v..v.......v±.v=há] 000020
06E9F646 880006E9 03750000 3DF64689 0CC48300 00FFFF9A 006A0676 FF0876FF .v..v.j.......á..F-=..u.Ō...F-Ō. 000040
260E5EC4 040E4683 D88E0246 881E5657 00000AC8 CBC95F5E 1F0000E9 00008800 .|..Ō...^_èùà...WV.|F..Ä.F..á^.& 000060
89FA4689 FE578826 FC478826 0E5EC404 0E4683F8 5689F646 89FE5788 26FC4788 .G=&.W±.F=.V½.F..á^.&.G=&.W±.F'. 000080
46890000 FFFF9AFA 76FFFC76 FFF676FF F876FF6F 77FF2671 77FF260A 5EC4FC56 V=á^.&.wq&.wo.v½.v-.v=.v'......F 0000A0
260E5EC4 040E4683 D88E0304 881E5657 000036C8 CBC95F5E 1F0000E9 FE468BFE ±.F±Ō...^_èùàó..WV.|...Ä.F..á^.& 0000C0
89044689 65578826 63478826 065FC426 0A5EC4CC 5689CA46 89FE5788 26FC4788 .G=&.W±.FŌ.Väá^.&á_.&.Gc&.We.Få. 0000E0
00003D02 468908C4 83000003 D19A006A 6377FF26 6577FF26 0A5EC45D CA680656 V=hò]á^.&.we&.wcj..1....á..F0=.. 000100
006A6377 FF266577 FF260A5E C45DC068 5016D846 8D01CDE9 D2468800 06E90375 u.Ō...F0Öë..FÄ.Phâ]á^.&.we&.wcj. 000120
28E25688 E0468801 9FE90246 880006E9 03750000 3DD24689 0CC48300 0005419A .A....á..F0=..u.Ō...F0Ō...FÅ.Vã+ 000140
0A5EC4F2 5689F046 890E561B DC462BE6 5688E446 88D05689 CE46890A 561BD846 FÄ.VÖ.Fö.VÅ.FŌ.V|+FÉ.V8.FÞ.V·á^. 000160
0277FF26 FC5EC408 77FF260A 77FF26FC 5EC4FE56 89FC4689 61578826 5F478826 &.G_&.Wa.F=.V±á^=&.w.&.w.á^=&.w. 000180
52045406 689A5052 02571826 072826CA 5EC40A57 88260847 8826CA5E C437FF26 &.7ā^ò&.G.&.W.á^ò&+.&.W.RP.h.T.R 0001A0
77FF260E 77FF26FC 5EC4DA56 89D84689 02571326 070326CA 5EC40497 05CC9A50 P.ä...á^ò&..&.W..FÄ.VÖá^=&.w.&.w 0001C0
18260447 2826CA5E C40E5788 260C4788 26CA5EC4 0477FF26 0677FF26 FC5EC40C .á^=&.w.&.w.á^ò&.G.&.W.á^ò&+G.&. 0001E0
```

Dump of file SATURN:[PCCOMMON.DUMP.DLL]SA-DIFM.DLL;1 on 18-APR-1990 10:50:26.92
File ID (450,15,0)   End of file block 323 / Allocated 324

Virtual block number 109 (0000006D), 512 (0200) bytes

```
5689DC46 89065713 26044703 26CA5EC4 FFFF05CC 9A505204 9E06689A 50520657 W.RP.h...RP.ā...á^ò&.G.&.W..FÉ.V 000000
8D0476FF D676FFFA 5689F846 89DE5688 DC468BF6 5689F446 89DA568B D84688DE 8.FÄ.VÖ.F¶.V-.FÉ.V8.F½.V'.v=.vå. 000020
880099E9 D2468800 06E90375 00003D02 46890000 FFFF9A50 16E8468D 5016F446 F¶.P.FŌ.P......F0=..u.Ō...F0Ō... 000040
CE46030A 5688D846 880E5689 DC4689EE 5688EC46 88DA5689 D84689EA 5688E846 FŌ.Vō.FÄ.VÖ.F$.VŸ.FÉ.V8.F, VÖ.Fö 000060
5016D846 8DE65689 E44689F2 5613F046 03DE5688 DC4688E2 5689E046 89D05613 .VÅ.FÅ.Vā.FÉ.V8.FÞ.V·.FŌ.V, ^Ä.P 000080
03750000 3DD24689 0CC48300 00056A9A 006A6377 FF266577 FF260A5E C45DC468 hå]á^.&.we&.wcj..j....á..F0=..u. 0000A0
C4830000 02D99A00 6A6377FF 266577FF 260A5EC4 5DCA6800 2FE9D246 880006E9 Ō...F0Ō/.hò]á^.&.we&.wcj..1....á 0000C0
00B2C8C8 C95F5E1F 0000E900 00B80006 E9D24688 0006E903 75000030 D2468908 ..F0=..u.Ō...F0Ō..|..Ō...^_èùàý. 0000E0
5EC4040E 4683A656 89A44689 71578826 6F478826 0A5EC4D8 8E036488 1E565700 .WV.|d..Äá^.&.Go&.Wq.FÉ.VĪ_F...á^ 000100
5016FF66 868D0066 E90374A2 4608A046 88A25689 A04689FE 578826FC 4788260E .&.G=&.W±.F..VÅ.F..FÅt.Ōf...f..P 000120
75000030 FF7A8689 0CC48300 0006169A 006A6377 FF266577 FF260A5E C45DC068 hå]á^.&.we&.wcj.......á...z.=..u 000140
266577FF 260A5EC4 602568A2 568CA046 89FF6686 8D06DEE9 FF7A8688 0007E903 .Ō....z.Ō8...f..F..VÅh%'á^.&.we& 000160
06A9E9FF 7A868800 07E90375 00003DFF 7A868908 C4830000 084A9A00 6A6377FF .wcj..J....á...z.=..u.Ō....z.Ō`. 000180
89E04689 68578826 69478826 FC5EC4FE 5689FC46 89085788 26064788 260A5EC4 á^.&.G.&.W..F=.V±á^=&.Gi&.Wk.FÅ. 0001A0
0A5EC402 57882607 8826A05E C4865689 84468965 57882663 478826FC 5EC4E256 Väá^=&.Gc&.We.F..V.á^.&..&.W.á^. 0001C0
0A578826 08478826 A05EC400 72E90374 02573926 007BE903 74073926 6F5FC426 &á_o&9.t.Ō(.&9W.t.Ōr.á^.&.G.&.W. 0001E0
```

Dump of file SATURN:[PCCOMMON.DUMP.DLL]SA-DIFM.DLL;1 on 18-APR-1990 10:50:26.92
File ID (450,15,0)   End of file block 323 / Allocated 324

Virtual block number 110 (0000006E), 512 (0200) bytes

```
04478826 A05EC400 4EE90374 0A573926 0057E903 74084739 266F5FC4 260A5EC4 á^.&á_o&9G.t.ŌW.&9W.t.ŌN.á^.&.G. 000000
A05EC400 2AE90374 06573926 0033E903 74044739 266F5FC4 260A5EC4 06578826 &.W.á^.&á_o&9G.t.Ō3.&9W.t.Ō*.á^. 000020
06E90374 0E573926 000FE903 740C4739 266F5FC4 260A5EC4 0E578826 0C478826 &.G.&.W.á^.&á_o&9G.t.Ō..&9W.t.Ō. 000040
89FF5A86 8902571B 26072826 A45EC402 57882607 8826A05E C405E2E9 00008800 .|..Ōā.á^.&..Ī.W.á^É&+.&.W...Z.. 000060
609689FF 5E868906 57182604 472826A4 5EC40657 88260447 8826A05E C4FF5C96 .\.á^.&.G.&.W.á^É&+G.&.W...^...' 000080
86890657 88260447 8826A05E C4FF5896 89FF5686 89025788 26078826 A05EC4FF .á^.&..&.W...V...X.á^.&.G.&.W... 0000A0
88260C47 8826A05E C48A5689 8846890A 57882608 478826A0 5EC4FF50 9689FF4E N...P.á^.&.G.&.W..F..V.á^.&.G.&. 0000C0
478826A4 5EC4EA56 89E84689 02578826 078826A4 5EC4FF7E 9689FF7C 86890E57 W...|...-.á^É&..&.W..FŌ.Vōá^É&.G 0000E0
5EC4FF54 9689FF52 86890A57 88260847 8826A45E C4E65689 E4468906 57882604 .&.W..FŌ.V|á^É&.G.&.W...R...T.á^ 000100
57892607 8926FF58 9688FF56 8688A45E C4F65689 F446890E 5788260C 478826A4 É&.G.&.W..F¶.V-á^É..V...X.&..&.W 000120
4789268A 56888846 88A45EC4 06578926 04478926 FF509688 FF4E8688 A45EC402 .á^É..N...P.&.G.&.W.á^É.F..V.&.G 000140
FF549688 FF528688 0E578926 0C478926 FF7E9688 FF7C8688 A45EC40A 57892608 .&.W.á^É..|...-.&.G.&.W...R...T. 000160
5EC48256 89804689 E6561BE4 4628F656 88F44688 EE5689EC 4689EA56 18E84628 +FŌ.Vō.F$.VŸ.F¶.V-+FŌ.V|.F..V.á^ 000180
C4830000 089A9A00 6A0676FF 0876FF5D D8680026 E9037569 470B2667 4788260A .&.Gg&.Giu.Ō&.hÄ].v..v.j.......á 0001A0
89065788 26044788 26FC5EC4 0475E9FF 7A868800 07E90375 00003DFF 7A868908 ...z.=..u.Ō....z.Ōu.á^=&.G.&.W.. 0001C0
10689C76 FF9E76FF 5016F846 8DFF6496 89FF6286 89A6568B A44689E 56899C46 F..V..FÉ.VĪ..b...d..F½.P.v..v.h. 0001E0
```

Dump of file SATURN:[PCCOMMON.DUMP.DLL]SA-DIFM.DLL;1 on 18-APR-1990 10:50:26.92
File ID (450,15,0) End of file block 323 / Allocated 324

Virtual block number 111 (0000006F), 512 (0200) bytes

```
7A868800 07E90375 00003DFF 7A868910 C4830000 03A39A00 6A0676FF 0876FF27 '.v..v.j..È....á...z.=..u.Õ....z 000000
F876FFFA 76FF2712 689C76FF 9E76FF00 8387FF26 0A5EC450 168C4680 0425E9FF .ÕX..F¥.Pá^.&.ñ...v..v.h.'.v'.v½ 000020
8C468803 ECE9FF7A 86880007 E9037500 0030FF7A 868912C4 8300000A 139A006A j........á...z.=..u.Õ....z.Õ§..F¥ 000040
5689D046 89C25688 C04688D6 56890446 89C65688 C44688CE 5689CC46 89BE5688 .V/.Fä.Vö.Fá.Vó.Få.Vø.Fä.Vö.FÅ.V 000060
26005DE9 03740739 26CE5688 CC4688FF 629EC4DA 56890846 89CA5658 C8468802 ∅.Fà.Vò.FÅ.VÕá.b..Fä.Vö&9.t.Õ].& 000080
74065739 260041E9 03740447 39260256 88D04688 FF629EC4 0054E903 74025739 9W.t.ÕT.á.b..FÅ.VØ&9G.t.ÕA.&9W.t 0000A0
001CE903 740A5739 260025E9 03740847 39260656 88D44688 FF629EC4 0038E903 .Õ8.á.b..Få.Vø&9G.t.ÕX.&9W.t.Õ.. 0000C0
76FF156A 00CAE903 750E5739 260009E9 03740C47 39260A56 88D84688 FF629EC4 á.b..FÄ.VÕ&9G.t.Õ..&9W.u.Õò.j..v 0000E0
28E9FF7A 86880007 E9037500 FF7ABE83 FF7A8689 06C483FF FF00009A FC76FFFE ±.vø......á...z../z..u.Õ....z.Õ( 000100
89944689 0A578826 08478826 A45EC48E 56898C46 8902578B 26078826 A45EC403 .á^È&..&.W..F..V.á^È&.G.&.W..F.. 000120
46890E57 88260C47 8826A45E C4925689 90468906 57882604 478826A4 5EC49656 V.á^È&.G.&.W..F..V.á^È&.G.&.W..F 000140
F876FFFA 76FF2717 689C76FF 9E76FF00 8387FF26 0A5EC450 168C4680 9A568998 ..V..F..Pá^.&.ñ...v..v.h '.v'.v½ 000160
000A3F9A 9C76FF9E 76FF0012 E9037500 003DFF7A 868912C4 83000005 E19A006A j..Ä....á...z.=..u.Õ...v. v..?.. 000180
880007E9 03750000 3DFF7A86 890000FF FF9A9C76 FF9E76FF 02A1E9FF 7A868800 ...z.ÕÀ..v..v........z.=... Õ... 0001A0
86880119 E90375D0 0BF25689 F046896D 57882668 4788260A 5EC40283 E9FF7A86 .z.Õ..á^.&.Gk&.Wm.Fb.V·.Åu.Õ.... 0001C0
74804639 DE5688DC 4688002A E90374EE 56390032 E90374EC 4639FF78 9688FF76 v...x.9F$t.Õ2.9VŸt.Õ*..FÉ.V89F.t 0001E0
```

Dump of file SATURN:[PCCOMMON.DUMP.DLL]SA-DIFM.DLL;1 on 18-APR-1990 10:50:26.92
File ID (450,15,0) End of file block 323 / Allocated 324

Virtual block number 112 (00000070), 512 (0200) bytes

```
00D4E900 00FFFF9A 5016FF5A 868DF076 FFF276FF 0014E903 74825639 001CE903 .Õ..9V.t.Õ...v·.vÞ..Z..P.....Õá. 000000
046AF076 FFF276FF 001DE903 75FF5896 390009E9 0374FF56 8639EA56 88E84688 .FÒ.VÕ9.V.t.Õ..9.X.u.Õ...v·.vÞj. 000020
74FF4E86 39E65688 E4468800 0008169A 5052EA56 18E8462B FF589688 FF568688 ..V...X.+FÒ.VõRP......FÕ.VÌ9.N.t 000040
E4462BFF 509688FF 4E868801 6AF076FF F276FF00 1DE90375 FF509639 0009E903 .Õ..9.P.u.Õ...v·.vÞj...N...P.+FÕ 000060
E903758A 56390008 E9037488 4639FF54 9688FF52 86880000 0B4B9A50 52E6561B .VÌRP.K.....R...T.9F.t.Õ..9V.u.Õ 000080
88000008 809A5052 FF54961B FF52862B 8A568888 4688086A F076FFF2 76FF001D ...v·.vÞj..F..V.+.R...T.RP...... 0000A0
88026AF0 76FFF276 FF001DE9 0375FF7E 96390009 E90374FF 7C8639F6 5688F446 F¶.V-9.|.t.Õ..9.-.u.Õ...v·.vÞj.. 0000C0
26008987 88260A5E C4014CE9 0000FFFF 9A5052F6 561BF446 2BFF7E96 8BFF7C86 .|...-.+F¶.V-RP.....ÕL.á^.&....& 0000E0
32E90374 EC4639FF 789688FF 76868801 32E90375 D0088A56 89884689 00889788 .....F|.Vα.Åu.Õ2...v...x.9F$t.Õ2 000100
FF0014E9 03748256 39001CE9 03748046 390E5688 DC468800 2AE90374 EE563900 .9VŸt.Õ*..FÉ.V89F.t.Õ..9V.t.Õ... 000120
FF9A5016 A8468088 76FF8A76 FF00F0E9 0000FFFF 9A5016FF 5A868DF0 76FFF276 v·.vÞ..Z..P.....Õb..vα.v|.F´.P.. 000140
5016A846 80001CE9 0375FF58 96390009 E90374FF 568639EA 568BE846 880000FF ....FÕ.VÕ9.V.t.Õ..9.X.u.Õ...F´.P 000160
4E8639E6 5688E446 8800000C 579A5052 EA561BE8 462BFF58 9688FF56 8688046A j...V...X.+FÕ.VõRP.W....FÕ.VÌ9.N 000180
462BFF50 9688FF4E 8688016A 5016A846 80001CE9 0375FF50 96390009 E90374FF .t.Õ..9.P.u.Õ...F´.Pj...N...P.+F 0001A0
03758A56 390008E9 03748846 39FF5496 88FF5286 880000FF FF9A5052 E6561BE4 õ.VÌRP.......R...T.9F.t.Õ..9V.u. 0001C0
8800000C BF9A5052 FF54961B FF52862B 8A568888 4688086A 5016A846 80001CE9 Õ...F´.Pj..F..V.+.R...T.RP.¢.... 0001E0
```

Dump of file SATURN:[PCCOMMON.DUMP.DLL]SA-DIFM.DLL;1 on 18-APR-1990 10:50:26.92
File ID (450,15,0) End of file block 323 / Allocated 324

Virtual block number 113 (00000071), 512 (0200) bytes

```
8688026A 5016A846 80001CE9 0375FF7E 96390009 E90374FF 7C8639F6 5688F446 F¶.V-9.|.t.Õ..9.-.u.Õ...F´.Pj... 000000
FF9A5016 A8468DB8 76FFBA76 FF00000C 239A5052 F65618F4 462BFF7E 9688FF7C |...-.+F¶.V-RP.#....vα.v|.F´.P.. 000020
5EC4040E 4683088E 0595881E 56570000 28C8C8C9 5F5E1F00 00E90000 B80000FF ...|..Õ...^ èùà(..WV.|...Ä.F..á^ 000040
0E4683EA 4689FE47 88260E5E C4020E46 83F65689 F44689FE 578826FC 4788260E .&.G•&.W±.F¶.V-.F..á^.&.G±.FÕ.F. 000060
77FF260A 5EC45DC0 68501608 4680EE56 89EC4689 FE578826 FC478826 0E5EC404 .á^.&.G=&.W±.F&.VŸ.FÅ.Phá]á^.&.w 000080
0537E9E8 46880006 E9037500 003DE846 890CC483 00000803 9A006A63 77FF2665 e&.wcj..&....á..FÒ=..u.Õ...FÒÕ7. 0000A0
F85EC402 57892607 8926EC5E C402578B 26078826 F85EC4FA 568CF846 89D8468D .FÅ.F½.V°á^½&..&.W.á^$&..&.W.á^½ 0000C0
5EC40A57 88260847 8826F85E C4065789 26044789 26EC5EC4 06578826 04478826 &.G.&.W.á^$&.G.&.W.á^½&.G.&.W.á^ 0000E0
C40E5789 260C4789 26EC5EC4 0E578826 0C478826 F85EC40A 57892608 478926EC $&.G.&.W.á^½&.G.&.W.á^$&.G.&.W.á 000100
5689FC46 8975578B 2673478B 260A5EC4 F25689F0 46897957 88267747 88260A5E ^.&.Gw&.Wy.FÞ.V·á^.&.Gs&.Wu.F•.V 000120
7E02573B 26F45EC4 F25618F0 462B0A57 88260847 8826F85E C40483E9 EA4688FE ±.FÕÕ..á^½&.G.&.W.+FÞ.V·á^¶&;W.- 000140
18F0462B 0A578826 08478826 F85EC400 1EE90372 07382600 08E9037D 002BE903 .Õ+.).Õ..&;.r.Õ..á^½&.G.&.W.+FÞ. 000160
26078926 EC5EC402 57882607 8826F45E C40014E9 02578926 078926EC 5EC4F256 V·á^$&..&.W.Õ..á^¶&..&.W.á^$&..& 000180
E9037D02 573826F4 5EC4F256 13F04603 02578826 078826F8 5EC4044B E9025789 .W.ÕK.á^½&..&.W..FÞ.V·á^¶&;W.).Õ 0001A0
C4F25613 F0460302 57882607 8826F85E C4001EE9 03770738 260008E9 037E002B +.-.Õ..&;.w.Õ..á^½&..&.W..FÞ.V·á 0001C0
89260847 8926EC5E C402578B 26078826 F45EC400 15E90A57 89260847 8926EC5E ^$&.G.&.W.Õ..á^¶&..&.W.á^$&.G.&. 0001E0
```

```
Dump of file SATURN:[PCCOMMON.DUMP.DLL]SA-DIFM.DLL;1 on 18-APR-1990 10:50:26.92
File ID (450,15,0)   End of file block 323 / Allocated 324

Virtual block number 114 (00000072), 512 (0200) bytes

 E9037E06 573B26F4 5EC4FE56 1BFC462B 0E578B26 0C478B26 F85EC403 ECE90A57 W.Õš.ó^½&.G.&.W.+F•.V±ó^¶&;W.-.Õ 000000
 561BFC46 280E578B 260C478B 26F85EC4 001FE903 7204473B 260009E9 037D002D -.).Õ..&;G.r.Õ..ó^½&.G.&.W.+F•.V 000020
 478926EC 5EC40657 8B260447 8B26F45E C40016E9 06578926 04478926 EC5EC4FE ±ó^š&.G.&.W.Õ..ó^¶&.G.&.W.ó^š&.G 000040
 06573B26 F45EC4FE 5613FC46 0306578B 2604478B 26F85EC4 0389E906 57892604 .&.W.Õ..ó^½&.G.&.W..F•.V±ó^¶&;W. 000060
 46030657 8B260447 8B26F85E C4001FE9 03770447 3B260009 E9037E00 2DE9037D ).Õ-.-.Õ..&;G.w.Õ..ó^½&.G.&.W..F 000080
 EC5EC406 578B2604 478B26F4 5EC40016 E90E5789 260C4789 26EC5EC4 FE5613FC •.V±ó^š&.G.&.W.Õ..ó^¶&.G.&.W.ó^š 0000A0
 26F45EC4 F2561BF0 462B0A57 8B260847 8B26F85E C40326E9 0E578926 0C478926 &.G.&.W.Õ&.ó^½&.G.&.W.+FÞ.V·ó^¶& 0000C0
 0A578B26 08478B26 F85EC400 1EE90372 073B2600 08E9037D 002BE903 7E02573B ;W.-.Õ+.).Õ..&;.r.Õ..ó^½&.G.&.W. 0000E0
 EC5EC402 578B2607 8B26F45E C40014E9 02578926 078926EC 5EC4F256 1BF0462B +FÞ.V·ó^š&..&.W.Õ..ó^¶&..&.W.ó^š 000100
 7E06573B 26F45EC4 FE561BFC 462B0E57 8B260C47 8B26F85E C4025789 26078926 &..&.W.ó^½&.G.&.W.+F•.V±ó^¶&;W.- 000120
 FC462B0E 578B260C 478B26F8 5EC4001F E9037204 473B2600 09E9037D 002DE903 .Õ-.).Õ..&;G.r.Õ..ó^½&.G.&.W.+F• 000140
 26EC5EC4 06578B26 04478B26 F45EC400 16E90657 89260447 8926EC5E C4FE561B .V±ó^š&.G.&.W.Õ..ó^¶&.G.&.W.ó^š& 000160
 3B26F45E C4F2561B F0462B0A 578B2608 478B26F8 5EC40267 E9065789 26044789 .G.&.W.Õg.ó^½&.G.&.W.+FÞ.V·ó^¶&; 000180
 2B0A578B 2608478B 26F85EC4 001EE903 72073B26 0008E903 7D002BE9 037E0257 W.-.Õ+.).Õ..&;.r.Õ..ó^½&.G.&.W.+ 0001A0
 26EC5EC4 02578B26 078B26F4 5EC40014 E9025789 26078926 EC5EC4F2 561BF046 FÞ.V·ó^š&..&.W.Õ..ó^¶&..&.W.ó^š& 0001C0
 037D0657 3B26F45E C4FE5613 FC460306 578B2604 478B26F8 5EC40257 89260789 ..&.W.ó^½&.G.&.W..F•.V±ó^¶&;W.). 0001E0
```

```
Dump of file SATURN:[PCCOMMON.DUMP.DLL]SA-DIFM.DLL;1 on 18-APR-1990 10:50:26.92
File ID (450,15,0)   End of file block 323 / Allocated 324

Virtual block number 115 (00000073), 512 (0200) bytes

 13FC4603 06578B26 04478B26 F85EC400 1FE90377 04473B26 0009E903 7E002DE9 Õ-.~.Õ..&;G.w.Õ..ó^½&.G.&.W..F•. 000000
 8926EC5E C406578B 2604478B 26F45EC4 0016E90E 5789260C 478926EC 5EC4FE56 V±ó^š&.G.&.W.Õ..ó^¶&.G.&.W.ó^š&. 000020
 02573B26 F45EC4F2 5613F046 0302578B 26078B26 F85EC401 A8E90E57 89260C47 G.&.W.Õ´.ó^½&..&.W..FÞ.V·ó^¶&;W. 000040
 13F04603 02578B26 078B26F8 5EC4001E E9037707 3B260008 E9037E00 2BE9037D ).Õ+.~.Õ..&;.w.Õ..ó^½&..&.W..FÞ. 000060
 478926EC 5EC40257 8B26078B 26F45EC4 0015E90A 57892608 478926EC 5EC4F256 V·ó^š&.G.&.W.Õ..ó^¶&..&.W.ó^š&.G 000080
 E9037E06 573B26F4 5EC4FE56 1BFC462B 0E578B26 0C478B26 F85EC40A 57892608 .&.W.ó^½&.G.&.W.+F•.V±ó^¶&;W.-.Õ 0000A0
 561BFC46 2B0E578B 260C478B 26F85EC4 001FE903 7204473B 260009E9 037D002D -.).Õ..&;G.r.Õ..ó^½&.G.&.W.+F•.V 0000C0
 478926EC 5EC40657 8B260447 8B26F45E C40016E9 06578926 04478926 EC5EC4FE ±ó^š&.G.&.W.Õ..ó^¶&.G.&.W.ó^š&.G 0000E0
 7D02573B 26F45EC4 F25613F0 46030257 8B26078B 26F85EC4 00E9E906 57892604 .&.W.ÕÕ.ó^½&..&.W..FÞ.V·ó^¶&;W.) 000100
 5613F046 0302578B 26078B26 F85EC400 1EE90377 073B2600 08E9037E 002BE903 .Õ+.~.Õ..&;.w.Õ..ó^½&..&.W..FÞ.V 000120
 08478926 EC5EC402 578B2607 8B26F45E C40015E9 0A578926 08478926 EC5EC4F2 ·ó^š&.G.&.W.Õ..ó^¶&..&.W.ó^š&.G. 000140
 2DE9037D 06573B26 F45EC4FE 5613FC46 0306578B 2604478B 26F85EC4 0A578926 &.W.ó^½&.G.&.W..F•.V±ó^¶&;W.).Õ- 000160
 FE5613FC 46030657 8B260447 8B26F85E C4001FE9 03770447 3B260009 E9037E00 .-.Õ..&;G.w.Õ..ó^½&.G.&.W..F•.V± 000180
 0C478926 EC5EC406 578B2604 478B26F4 5EC40016 E90E5789 260C4789 26EC5EC4 ó^š&.G.&.W.Õ..ó^¶&.G.&.W.ó^š&.G. 0001A0
 F80E9512 60A7FF2E 93C00300 1CE90376 00093D00 012D0027 E9002AE9 0E578926 &.W.Õ*.Õ'.-..=..v.Õ...å...Im...½ 0001C0
 000020C8 CBC95F5E 1F0000E9 0000B811 9810090E 36128110 1A0F5B00 D712810E ...■.[.....6.1...|..Õ...^_èùà .. 0001E0
```

```
Dump of file SATURN:[PCCOMMON.DUMP.DLL]SA-DIFM.DLL;1 on 18-APR-1990 10:50:26.92
File ID (450,15,0)   End of file block 323 / Allocated 324

Virtual block number 116 (00000074), 512 (0200) bytes

 478B260E 5EC4040E 4683FA46 89FE478B 260E5EC4 020E4683 D88E0CE6 B81E5657 WV.¡l..Ã.F..ó^.&.G±.F¹.F..ó^.&.G 000000
 260A5EC4 F85689F6 46897957 8B267747 8B260A5E C4F45689 F24689FE 578B26FC •&.W±.F·.V¶ó^.&.Gw&.Wy.F-.V½ó^.& 000020
 131C9A00 6A6377FF 266577FF 260A5EC4 5DCA68FE 5689FC46 8975578B 2673478B .Gs&.Wu.F•.V±hò]ó^.&.we&.wcj.... 000040
 5EC45DC0 685016E0 46B00194 E9F0468B 0006E903 7500003D F0468908 C4830000 ...ó..FÞ=..u.Õ...FÞÕ...FÅ.Phå]ó^ 000060
 46880006 E9037500 003DF046 890CC483 00001453 9A006A63 77FF2665 77FF260A .&.we&.wcj..S....ó..FÞ=..u.Õ...F 000080
 0106578B 2604478B 26F25EC4 E25611E0 46010257 8B26078B 26F25EC4 0166E9F0 ÞÕf.ó^·&..&.W..FÅ.Vãó^·&.G.&.W.. 0000A0
 578B260C 478B26F2 5EC4EA56 11E84601 0A578B26 08478B26 F25EC4E6 5611E446 FÕ.V|ó^·&.G.&.W..FÒ.Võó^·&.G.&.W 0000C0
 0008E903 7D004FE9 037EF856 3BE2561B E0462BEA 568BE846 8BEE5611 EC46010E ..Fš.VŸ.FÒ.Võ+FÅ.Vã;V½-.ÕO.).Õ.. 0000E0
 037405FA 7E830009 E9037506 FA7E8300 12E90375 04FA7E83 0042E903 72F6463B ;F-r.ÕB..-¹.u.Õ...-¹.u.Õ...-¹.t. 000100
 4603E256 8BE0468B 0012E9E2 5689E046 89F8561B F6462BEA 568BE846 8B0015E9 Õ...FÒ.Võ+F-.V½.FÅ.VãÕ...FÅ.Vã.F 000120
 037D004F E9037EFE 5638E656 1BE4462B EE568BEC 468BEA56 89E84689 F85613F6 -.V½.FÒ.Võ.Fš.VŸ+FÕ.V|;V±-.ÕO.). 000140
 FA7E8300 09E90375 05FA7E83 0012E903 7501FA7E 830042E9 0372FC46 3B0008E9 Õ..;F•r.ÕB..-¹.u.Õ...-¹.u.Õ...-¹ 000160
 568BE446 8B0012E9 E65689E4 4689FE56 1BFC462B EE568BEC 46880015 E9037409 .t.Õ...Fš.VŸ+F•.V±.FÕ.V|Õ...FÕ.V 000180
 6377FF26 6577FF26 0A5EC45D C4685016 E0468DEE 5689EC46 89FE5613 FC4603E6 |.F•.V±.Fš.VŸ.FÅ.Phå]ó^.&.we&.wc 0001A0
 5EC45DCA 68002FE9 F0468B00 06E90375 00003DF0 46890CC4 83000014 7C9A006A j..|....ó..FÞ=..u.Õ...FÞÕ/.hò]ó^ 0001C0
 46880006 E9037500 003DF046 8908C483 00000038 9A006A63 77FF2665 77FF260A .&.we&.wcj..8....ó..FÞ=..u.Õ...F 0001E0
```

Dump of file SATURN:[PCCOMMON.DUMP.DLL]SA-DIFM.DLL;1 on 18-APR-1990 10:50:26.92
File ID (450,15,0)   End of file block 323 / Allocated 324

Virtual block number 117 (00000075), 512 (0200) bytes

```
8B260A5E C4D88E12 94B81E56 57000016 C8C8C95F 5E1F0000 E90000B8 0006E9F0 ÞÕ..¦..Õ...^_èùà...WV.¦...Ä6^.&. 000000
26FC5EC4 EC5689EA 46890257 8B26078B 26FC5EC4 FE5689FC 46897157 8B266F47 Go&.Wq.F•.V±Ȭ^•&..&.W..FÕ.V§á^•& 000020
26070326 FC5EC400 81978826 7F478826 0A5EC4F0 5689EE46 89065788 26044788 .G.&.W..FŸ.VÞá^.&.G.&....á^•&..& 000040
897D5713 267B4703 260A5EC4 06578826 04478826 FC5EC4F4 5689F246 89025713 .W..F·.V¶á^•&.G.&.W.á^.&.G(&.W). 000060
FA46890C C4830000 12EE9A00 6A0676FF 0876FF5D C3685016 EA468DF8 5689F646 F-.V½.FÕ.Phû].v..v.j..Ÿ....á..F° 000080
1E565700 0004C8CB C95F5E1F 0000E900 00B80006 E9FA4688 0006E903 7500003D •..u.Õ...F°Õ..¦..Õ...^_èùà...WV. 0000A0
FC76FFFE 76FFFE56 89FC4689 FE578826 FC478826 0E5EC404 0E4683D8 8E14A788 ¦Ï..Ä.F..á^.&.G•&.W±.F•.V±.V±.v• 0000C0
06C8CBC9 5F5E1F00 00E90000 B808C483 09971113 9A6F77FF 267177FF 260A5EC4 á^.&.wq&.wo......á.¦..Õ...^_èùà. 0000E0
FFFE5689 FC4689FE 578826FC 4788260E 5EC4040E 4683D88E 1551B81E 56570000 ..WV.¦Q..Ä.F..á^.&.G•&.W±.F•.V±. 000100
FA46890C C4830000 15269A00 6A6377FF 266577FF 260A5EC4 5DC068FC 76FFFE76 V±.v•hà]á^.&.we&.wcj..&....á..F° 000120
1E565700 000EC8CB C95F5E1F 0000E900 00B80006 E9FA4688 0006E903 7500003D •..u.Õ...F°Õ..¦..Õ...^_èùà...WV. 000140
4683040E 4683FE56 89FC4689 FE578826 FC478826 0E5EC404 0E4683D8 8E159688 ¦...Ä.F..á^.&.G•&.W±.F•.V±.F...F 000160
76FFFE76 FFF45689 F24689FE 578826FC 4788260E 5EC4040E 4683040E 4683040E ...F...F..á^.&.G•&.W±.F·.V¶.v±.v 000180
88F64689 0000019A 9A5016F8 468DF276 FFF476FF 6F77FF26 7177FF26 0A5EC4FC •á^.&.wq&.wo.v¶.v·.F½.P......F-. 0001A0
4788260E 5EC4040E 4683D88E 15F1B81E 56570000 04C8CBC9 5F5E1F00 00E9F646 F-Õ...^_èùà...WV.¦þ..Ä.F..á^.&.G 0001C0
89260789 26FC5EC4 00879788 26008587 8B260A5E C4FE5689 FC4689FE 578826FC •&.W±.F•.V±á^.&....&....á^•&..&. 0001E0
```

Dump of file SATURN:[PCCOMMON.DUMP.DLL]SA-DIFM.DLL;1 on 18-APR-1990 10:50:26.92
File ID (450,15,0)   End of file block 323 / Allocated 324

Virtual block number 118 (00000076), 512 (0200) bytes

```
0E5EC404 0E4683D8 8E1662B8 1E565700 0004C8CB C95F5E1F 0000E900 00B80257 W.¦..Õ...^_èùà...WV.¦b..Ä.F..á^. 000000
26078926 FC5EC46D 5788266B 4788260A 5EC4FE56 89FC4689 FE578826 FC478826 &.G•&.W±.F•.V±á^.&.Gk&.Wmá^•&..& 000020
5EC4040E 4683D88E 16A5B81E 56570000 08C8CBC9 5F5E1F00 00E90000 B8025789 .W.¦..Õ...^_èùà...WV.¦Ê..Ä.F..á^ 000040
4689FE57 8B26FC47 88260E5E C4040E46 83FA5689 F84689FE 578826FC 4788260E .&.G•&.W±.F%.V°.F..á^.&.G•&.W±.F 000060
C46D5788 26684788 260A5EC4 0020E903 756D4708 26684788 260A5EC4 FE5689FC •.V±á^.&.Gk&.Gmu.Õ .á^.&.Gk&.Wmá 000080
88870826 00898788 260A5EC4 0031E900 0107C726 FC5EC402 57892607 8926F85E ^½&..&.W.á^•&ú...Õ1.á^.&.  ..&... 0000A0
FC5EC402 57892607 8926F85E C4008897 8B260089 8788260A 5EC4001F E9037500 .u.Õ..á^.&....&....á^½&..&  V.á^• 0000C0
020E4683 D88E16E6 B81E5657 000008C8 CBC95F5E 1F0000E9 0000B800 0607C726 &ú...¦..Õ...^_èùà...WV.¦Ï..A.F.. 0000E0
C4FC5689 FA468965 57882663 47882606 5FC4260A 5EC4FE46 89FE4788 260E5EC4 á^.&.G±.F±á^.Ȥá_.&.Gc&.We.F°.V•á 000100
830062E9 0000B800 06E90374 69470826 67478826 0A5EC40A 478926FE 46880A5E ^..F±&.G.á^.&.Gg&.Git.Õ..¦..Õb.. 000120
83000018 199A006A 6777FF26 6977FF26 0A5EC450 C768016A 002EE903 7500FE7E ~±.u.Õ..j.hú]á^.&.wi&.wgj....... 000140
FF260A5E C450C768 006A002B E9002EE9 F8468800 06E90375 000030F8 46890AC4 á..F½=..u.Õ...F½Õ..Õ+.j.hú]á^.&. 000160
00E9F846 8B0006E9 03750000 3DF84689 0AC48300 0015C69A 006A6777 FF266977 wi&.wgj..ó....á..F½=..u.Õ...F½Õ. 000180
578826FC 4788260E 5EC4040E 4683D88E 1788B81E 56570000 1EC8CBC9 5F5E1F00 ..^_èùà...WV.¦...Ä.F..á^.&.G•&.W 0001A0
26634788 26FC5EC4 FE5689FC 46890857 8B260647 8B260A5E C4FA5689 F84689FE ±.F%.V°á^.&.G.&.W..F•.V±á^•&.Gc& 0001C0
571B2607 2B266F5F C4260A5E C4025788 26078826 F85EC4F6 5689F446 89655788 .We.F¶.V-á^½&..&.W.á^.&á_o&+.&.W 0001E0
```

Dump of file SATURN:[PCCOMMON.DUMP.DLL]SA-DIFM.DLL;1 on 18-APR-1990 10:50:26.92
File ID (450,15,0)   End of file block 323 / Allocated 324

Virtual block number 119 (00000077), 512 (0200) bytes

```
5FC4260A 5EC40657 8B260447 8B26F85E C4025789 26078926 105FC426 0A5EC402 .á^.&á_.&..&.W.á^½&.G.&.W.á^.&á_ 000000
0A5EC450 16E2468D 06578926 04478926 105FC426 0A5EC406 571B2604 472B266F o&+G.&.W.á^.&á_.&.G.&.W..Fã.Pá^. 000020
266577FF 260A5EC4 60266850 16E2468D 08C48315 7E11139A 6F77FF26 7177FF26 &.wq&.wo...~..ã..Fã.Ph&'á^.&.we& 000040
76FF0059 E9F2468B 0006E903 7500003D F246890C C4830000 19209A00 6A6377FF .wcj.. ....á..F·=..u.Õ...F·ÕY..v 000060
E9037500 003DF246 890CC483 00001949 9A006A06 76FF0876 FF50CE68 F876FFFA °.v½hö].v..v.j..I....á..F·=..u.Õ 000080
08C48300 0017EB9A 006A6377 FF266577 FF260A5E C45DCA68 002FE9F2 46880006 ...F·Õ/.hò]á^.&.we&.wcj..Š....á. 0000A0
00001EC8 CBC95F5E 1F0000E9 0000B800 06E9F246 880006E9 03750000 30F24689 .F·=..u.Õ...F·Õ..¦..Õ...^_èùà... 0000C0
0A5EC4FA 5689F846 89FE5788 26FC4788 260E5EC4 040E4683 D88E183E B81E5657 WV.¦>..Ä.F..á^.&.G•&.W±.F%.V°á^. 0000E0
8DF65689 F4468965 57882663 47882 6FC 5EC4FE56 89FC4689 08578826 06478826 &.G.&.W..F•.V±á^•&.Gc&.We.F¶.V-. 000100
C4602668 5016E246 8008C483 18D81113 9A6F77FF 267177FF 260A5EC4 5016E246 Fã.Pá^.&.wq&.wo...Ü..á..Fã.Ph&'á 000120
880006E9 03750000 30F24689 0CC48300 001A1F9A 006A6377 FF266577 FF260A5E ^.&.we&.wcj.......á..F·=..u.Õ... 000140
CA6808C4 83FFFF00 009A0A76 FF0C76FF 6D77FF26 6F77FF26 FC5EC400 48E9F246 F·ÕH.á^•&.wo&.wm.v..v.......á.hò 000160
06E90375 000030F2 468908C4 83000018 F69A006A 6377FF26 6577FF26 0A5EC450 ]á^.&.we&.wcj..~....á..F·=..u.Õ. 000180
46830B8E 1974B81E 56570000 04C8CBC9 5F5E1F00 00E90000 B80006E9 F2468800 ..F·Õ..¦..Õ...^_èùà...WV.¦t..Ä.F 0001A0
0A5EC402 57882607 8B26FC5E C4FE5689 FC4689FE 578826FC 4788260E 5EC4040E ..á^.&.G•&.W±.F•.V±á^•&..&.W.á^. 0001C0
4701266F 5FC4260A 5EC40657 8B260447 8B26FC5E C4025711 26070126 6F5FC426 &á_o&..&.W.á^•&.G.&.W.á^.&á_o&.G 0001E0
```

```
Dump of file SATURN:[PCCOMMON.DUMP.DLL]SA-DIFM.DLL;1 on 18-APR-1990 10:50:26.92
File ID (450,15,0)   End of file block 323 / Allocated 324

Virtual block number 120 (00000078), 512 (0200) bytes

 5EC40A57 11260847 01266F5F C4260A5E C4025788 26078826 FC5EC406 57112604 .&.W.á^•&..&.W.á^.&á o&.G. .W.á^ 000000
 5E1F0000 E9000088 0E571126 0C470126 6F5FC426 0A5EC406 57882604 47882 6FC •&.G.&.W.á^.&á o&.G.Ï.W.|...  ..^ 000020
 EE5689EC 46897157 88266F47 88260A5E C4D88E1A 4A881E56 57000036 C8C8C95F _èùàó..WV.¡J..Äá^.&.Go&.Wq.F§.VŸ 000040
 8826EC5E C4FE5689 FC468902 57182607 2826EC5E C40A5788 26084788 26EC5EC4 Ĩ^š&.G.&.W.á^š&+.&.W..F•.V±á^š&. 000060
 88260E5E C4040E46 83CE5689 CC468906 57182604 472826EC 5EC40E57 88260C47 G.&.W.á^š&+G.&.W..Fä.Vö.F..á^.&. 000080
 56890846 89655788 26634788 26065FC4 260A5EC4 FA5689F8 4689FE57 8826FC47 G=&.W±.F½.V•á^.&á_.&.Gc&.We.FÅ.V 0000A0
 7500003D CA468908 C4830000 1C309A00 6A6377FF 266577FF 260A5EC4 5DCA68DA Öhò]á^.&.we&.wcj.¯0....á..Fò=..u 0000C0
 1826072B 26105FC4 260A5EC4 02578826 07882 6F8 5EC400FD E9CA468B 0006E903 .Õ...Fòõ».á^½&..&.W.á^.&á_.&+.&. 0000E0
 18260447 2826105F C4260A5E C4065788 26044788 26F85EC4 D2568900 46890257 W..FÅ.Vøá^½&.G.&.W.á^.&á_.&+G.&. 000100
 CA468900 0004DA9A 5016F046 8D501600 468D0876 FFDA76FF D65689D4 46890657 W..Få.Vø.vÖ.vÄ.FÅ.P.Fþ.P¯Ö....Fò 000120
 F65688F4 46880E56 89DC4689 F25688F0 46880099 E9CA4688 0006E903 7500003D •..u.Õ...FòÕ...Fþ.V·.FÉ.V8.F¶.V- 000140
 4603F656 88F4468B E65689E4 4689FE56 13FC4603 F25688F0 4688E256 89E04689 .FÅ.Vä.Fþ.V·.F•.V±.FÕ.Vl.F¶.V-.F 000160
 9A006A63 77FF2665 77FF260A 5EC45DC4 6850160C 468DEA56 89E84689 CE5613CC ë.Vö.FÒ.Võ.FÉ.Phá]á^.&.we&.wcj.. 000180
 FF260A5E C45DCA68 002FE9CA 46880006 E9037500 003DCA46 890CC483 00001C59 Ÿ....á..Fò=..u.Õ...FòÕ/.hò]á^.&. 0001A0
 06E9CA46 880006E9 03750000 3DCA4689 08C48300 00190D9A 006A6377 FF266577 we&.wcj..ï....á..Fò=..u.Õ...FòÕ. 0001C0
 260E5EC4 040E4683 D88E1AD8 B81E5657 000018C8 CBC95F5E 1F0000E9 00008800 .|..Õ...^_èùà...WV.¡Ü..Ä.F..á^.& 0001E0
```

```
Dump of file SATURN:[PCCOMMON.DUMP.DLL]SA-DIFM.DLL;1 on 18-APR-1990 10:50:26.92
File ID (450,15,0)   End of file block 323 / Allocated 324

Virtual block number 121 (00000079), 512 (0200) bytes

 89F84689 FE578826 FC478826 0E5EC404 0E4683EA 5689E846 89FE5788 26FC4788 .G•&.W±.FÒ.Võ.F..á^.&.G•&.W±.F½. 000000
 47892600 0088FC5E C4FE5689 FC4689FE 578826FC 4788260E 5EC4040E 4683FA56 V•.F..á^.&.G•&.W±.F•.V±á^•|..&.G 000020
 30EC4689 0CC48300 001D199A 006AE876 FFEA76FF 5E886850 16F44680 07892602 .&...F¶.Ph.^.võ.vÒj.......á..F§= 000040
 5E896837 FF260277 FF26FC5E C4F876FF FA76FF00 A1E9EC46 880006E9 03750000 ..u.Õ...F§ÕÀ..v•.v½á^•&.w.&.7h.^ 000060
 76FFFA76 FF0060E9 03740000 30EC4689 10C48300 0018629A 006AE876 FFEA76FF .võ.vÒj..b....á..F§=..t.Õm..v•.v 000080
 7500EE7E 83000016 489A5016 F0468050 16EE468D 6F77FF26 7177FF26 0A5EC4F8 ½á^.&.wq&.wo.FŸ.P.Fþ.P.H....-Ÿ.u 0000A0
 8300012D F65688F4 4688FC5E C40020E9 03750247 08260788 26FC5EC4 0035E903 .Õ5.á^•&..&.G.u.Õ .á^•.F¶.V--... 0000C0
 01078326 FC5EC400 15E90000 880006E9 03740257 3926000F E9037407 3926000A Õ.&9.t.Õ..&9W.t.Õ..|..Õ..á^•&... 0000E0
 C7D88E1C 84881E56 57000008 C8C8C95F 5E1F0000 E90001B8 FF65E900 02578326 &.W..Õe.|..Õ...^_èùà...WV.|...Äü 000100
 5EC4FA56 89F84689 FE578826 FC478826 0E5EC404 0E468300 00FC46C7 0000FE46 F±..úF•...F..á^.Ï.G•&.W±.F½.V•á^ 000120
 003DFE46 890000FF FF9A5016 FC468DF8 76FFFA76 FF0085B7 FF260087 B7FF260A .&.ñ..&.ñ...v•.v½.F•.P......F±=. 000140
 50520085 050C5688 0A468800 19E90374 00FC7E83 0028E9FE 46880006 E9037500 .u.Õ...F±Õ(..-•.t.Õ...F..V....RP 000160
 1E565700 000AC8C8 C95F5E1F 0000E9FE 4688FE46 890000FF FF9AF876 FFFA76FF .v•.v½......F±.F±Õ...^_èùà...WV. 000180
 0C56880A 4688F856 89F64689 FE578826 FC478826 0E5EC404 0E4683D8 8E1DAB88 ¡¨..Ä.F..á^.&.G•&.W±.F¯.V½.F..V. 0001A0
 E9FA468B FA468900 00FFFF9A 5016FC46 8D016A00 6AF676FF F876FF50 52008505 ...RP.v½.v-j.j..F•.P......F•.F•Õ 0001C0
 46890857 88260647 88260A5E C4D88E1E 31881E56 57000018 C8C8C95F 5E1F0000 ...^_èùà...WV.¡1..Äá^.&.G.&.W..F 0001E0
```

```
Dump of file SATURN:[PCCOMMON.DUMP.DLL]SA-DIFM.DLL;1 on 18-APR-1990 10:50:26.92
File ID (450,15,0)   End of file block 323 / Allocated 324

Virtual block number 122 (0000007A), 512 (0200) bytes

 5EC40018 E9037569 47082667 4788260A 5EC4F246 89674788 26FC5EC4 FE5689FC •.V±á^•&.Gg.F·á^.&.Gg&.Giu.Õ..á^ 000000
 47082663 4788260A 5EC4EC46 8906C483 00001EE4 9A006A67 77FF2669 77FF260A .&.wi&.wgj..Õ....á..F§á^.&.Gc&.G 000020
 5EC4EC46 8906C483 00001F38 9A006A63 77FF2665 77FF260A 5EC40018 E9037565 eu.Õ..á^.&.we&.wcj..8....á..F§á^ 000040
 FFFA76FF 0044E903 75FA460B F8468BFA 5689F846 89008797 88260085 8788260A .&....&.....F½.V•.F½.F•u.ÕD..v•. 000060
 FF0016E9 03740000 300000FF FF9A5016 E8468DF8 76FFFA76 FF0000FF FF9AF876 v½......v•.v½.FÒ.P.....•..t.Õ... 000080
 0000FFFF 9AF876FF FA76FFFF D2E9EC46 8906C483 0000FFFF 9A006AE8 76FFEA76 võ.vÒj.......á..F§Õ@..v•.v½..... 0000A0
 77FF2671 77FF260A 5EC4F276 FF00001F 729A5F77 FF266177 FF260A5E C4F276FF .v·á^.&.wa&.w_.r....v·á^.&.wq&.w 0000C0
 63478826 FC5EC400 00FFFF9A 1077FF26 1277FF26 0A5EC4F2 76FF0000 FFFF9A6F o......v·á^.&¯w.&.w......á^•&.Gc 0000E0
 4608F446 88F65689 F446896D 5788266B 4788260A 5EC4F056 89EE4689 65578826 &.We.FŸ.Vþá^.&.Gk&.Wm.F¶.V-.F¶.F 000100
 0088870B 26008987 88260A5E C4000002 109A006A F476FFF6 76FF0000 E90375F6 -u.Õ...v-.v¶j......á^.&....&.... 000120
 0876FFFC 76FFFE76 FF0000FF FF9A0089 87FF2600 8887FF26 0A5EC400 12E90374 t.Õ..á^.&.ñ..&.ñ........v±.v•.v. 000140
 E9000088 0006E9EC 46880006 E9037500 003DEC46 8908C483 FFFF084B 9A0676FF .v..K....á..F§=..u.Õ...F§Õ..|..Õ 000160
 8826FC47 88260E5E C4040E46 83D88E1E 7F881E56 5700000C C8C8C95F 5E1F0000 ...^_èùà...WV.|...Ä.F..á^.&.G•&. 000180
 5689F846 89FE5788 26FC4788 260E5EC4 040E4683 040E4683 FE5689FC 4689FE57 W±.F¯.V±.F...F..á^.&.G•&.W±.F½.V 0001A0
 F876FFFA 76FFF656 89F44689 FE578826 FC478826 0E5EC404 0E468304 0E4683FA •.F...F..á^.&.G•&.W±.F¶.V-.v•.v½ 0001C0
 B8078926 F45EC40C C48319C2 0D619A6F 77FF2671 77FF260A 5EC4FC76 FFFE76FF .v±.v•á^.&.wq&.wo.ø.Õ..á.á^¶&..| 0001E0
```

```
Dump of file SATURN:[PCCOMMON.DUMP.DLL]SA-DIFM.DLL;1 on 18-APR-1990 10:50:26.92
File ID (450,15,0)   End of file block 323 / Allocated 324

Virtual block number 123 (0000007B), 512 (0200) bytes

 47BB260E 5EC4040E 4683D88E 201FB81E 56570000 06C8CBC9 5F5E1F00 00E90000 ..Õ...^_èùà...WV.¡. .Ä.F..á^.&.G 000000
 8411139A FC76FFFE 76FF6F77 FF267177 FF260A5E C4FE5689 FC4689FE 578B26FC =&.W±.F=.V±á^.&.wq&.wo.v±.v=.... 000020
 C46B77FF 266D77FF 260A5EC4 002FE903 75604708 26684788 260A5EC4 08C48320  .á.á^.&.Gk&.Gmu.Õ/.á^.&.wm&.wká 000040
 008DE9FA 46880006 E9037500 0030FA46 890000FF FF9A6F77 FF267177 FF260A5E ^.&.wq&.wo......F*=..u.Õ...F*Õ.. 000060
 B7FF2600 8BB7FF26 0A5EC400 2EE90375 0088870B 26008987 8B260A5E C40040E9 Õ@.á^.&....&....u.Õ..á^.&.ñ..&.ñ 000080
 FA468800 06E90375 000030FA 46890000 0CCF9A6F 77FF2671 77FF260A 5EC40089 ..á^.&.wq&.wo.ü....F*=..u.Õ...F* 0000A0
 51686F77 FF267177 FF260A5E C40034E9 03756947 08266747 8B260A5E C4004AE9 ÕJ.á^.&.Gg&.Giu.Õ4.á^.&.wq&.wohQ 0000C0
 06E90375 00003DFA 46890CC4 8300001C E59A006A 6777FF26 6977FF26 0A5EC45F _á^.&.wi&.wgj..Î....á..F*=..u.Õ. 0000E0
 4683D88E 20A2B81E 56570000 06C8CBC9 5F5E1F00 00E90000 B80006E9 FA468800 ..F*Õ..¡..Õ...^_èùà...WV.¡À .Ä.F 000100
 03756947 08266747 8B260A5E C4FC5689 FA4689FE 578B26FC 478B260E 5EC4040E ..á^.&.G=&.W±.F¯.V=á^.&.Gg&.Giu. 000120
 C4830000 217F9A00 6A6777FF 266977FF 260A5EC4 5F5768FA 76FFFC76 FF0030E9 ÕO..v=.v*hW_á^.&.wi&.wgj...!...á 000140
 10C8C8C9 5F5E1F00 00E90000 B80006E9 FE468800 06E90375 00FE7E83 FE46890C ..F±.~±.u.Õ...F±Õ..¡..Õ...^_èùà. 000160
 C4FA5689 FB4689FE 578B26FC 478B260E 5EC4040E 4683D88E 21AAB81E 56570000 ..WV.¡¯!.Ä.F..á^.&.G=&.W±.F¥.V*á 000180
 77FF2671 77FF260A 5EC4FC76 FFFE76FF FE5689FC 46891257 8B261047 8B260A5E ^.&.G.&.W..F=.V±.v±.v=á^.&.wq&.w 0001A0
 C40010E9 03740247 0B260788 26FC5EC4 00001047 9A5016F2 46805016 F6468D6F o.F-.P.F·.P.G...á^=&..&.G.t.Õ..á 0001C0
 5EC4FC76 FFFE76FF 0078E903 7500F67E 830081E9 03750647 0B260447 8B26FC5E ^=&.G.&.G.u.Õ...—.u.Õx..v±.v=á^ 0001E0

Dump of file SATURN:[PCCOMMON.DUMP.DLL]SA-DIFM.DLL;1 on 18-APR-1990 10:50:26.92
File ID (450,15,0)   End of file block 323 / Allocated 324

Virtual block number 124 (0000007C), 512 (0200) bytes

 26078826 FC5EC400 57E90375 00003008 C4831A09 00899A6F 77FF2671 77FF260A .&.wq&.wo.¿....á.=..u.ÕW.á^=&..& 000000
 26044789 26F85EC4 06578826 04478826 FC5EC402 57892607 8926F85E C4025788 .W.á^½&..&.W.á^=&.G.&.W.á^½&.G.& 000020
 30F04689 08C48320 CF00C59A F876FFFA 76FF6F77 FF267177 FF260A5E C4065789 .W.á^.&.wq&.wo.v*.v½.é.ü .á..Fb= 000040
 E90038E9 0001B800 09E90375 00F67E83 0044E900 40E9F046 880006E9 03750000 ..u.Õ...FbÕM.ÕD..—.u.Õ..¡..Õ;.Õ 000060
 5FC4260A 5EC40257 89260789 26F85EC4 02578826 0788266F 5FC4260A 5EC40032 2.á^.&á_o&..&.W.á^½&..&.W.á^.&á_ 000080
 C8CBC95F 5E1F0000 E90000B8 06578926 04478926 F85EC406 578B2604 478B266F o&.G.&.Ū.á^½&.G.&.W.¡..Õ...^_èùĀ 0000A0
 67478B26 0A5EC4FE 4689FE47 8B260E5E C4020E46 83D88E22 16B81E56 57000002 ...WV.¡.".Ä.F..á^.&.G±.F±á^.Ī.Gg 0000C0
 0021EA9A 006A6777 FF266977 FF260A5E C45F5368 FE76FF00 1EE90375 69470826 &.Giu.Õ...v±hS_á^.&.wi&.wgj..Õ!. 0000E0
 4688D88E 2357B81E 56570000 00C8CBC9 5F5E1F00 00E90000 B80006E9 0AC48300 ..á.Õ..¡..Õ...^_èùà...WV.¡W#.Ä.F 000100
 FF68229C 68D88E23 AAB81E56 57000000 C8CBC95F 5E1F0000 E9000205 08568806 ..V....Õ...^_èùĀ...WV.¡^#.Äh."h. 000120
 00E918C4 830000FF FF9A006A 796A016A 006A006A 00806802 40681E01 6A766AFF .jvj..h@.h..Ī.j.j.jyj.......á.Õ. 000140
 03A3000C 225C0203 23A20007 23CF0005 08800010 23E70203 0020C8C9 5F5E1F00 ..^_èù ...Ó#......ü#..Â#..\"..È. 000160
 0829000D 0BDC0203 00000004 1FF60002 05A2000D 20FB0203 02AF0008 1F130203 .......£...« ..Â...¯.......É...). 000180
 03480008 1E170203 00000007 23CC0002 03BB000C 1F5F0203 08930010 238D0203 ...#.............£...ã#..........H. 0001A0
 0000000D 22E70002 08CA0000 18C90203 02040008 1F230203 078C0000 1FE30203 ..Ð...¥...Ì...á...è...ò...Ó".... 0001C0
 00830008 0A2D0203 05D8000D 02C30203 07D9000D 213E0203 00000010 044D0002 ..M.......>!..)...û...Ù...-..... 0001E0

Dump of file SATURN:[PCCOMMON.DUMP.DLL]SA-DIFM.DLL;1 on 18-APR-1990 10:50:26.92
File ID (450,15,0)   End of file block 323 / Allocated 324

Virtual block number 125 (0000007D), 512 (0200) bytes

 07EB000D 0BEF0203 02F30008 1F4C0203 00000012 23C70002 0BC40010 1EBC0203 ..¥...á...ú#......L...µ...ÿ...Š. 000000
 040A000C 034A0203 030D0008 1DE70203 0579000D 029C0203 03FA000C 0C880203 ......*........y...Ó........J..... 000020
 060E0000 0AE10203 031C0008 1E650203 0587000D 1FBF0203 06020000 0AA90203 ..`........¢........e........Ã..... 000040
 040E4683 D88EFFFF B81E5657 000008C8 00000000 00000000 0396000C 1F850203 .................à...WV.¡...Ä.F.. 000060
 FE578B26 FC478B26 0E5EC404 0E4683FA 5689F846 89FE5788 26FC4788 260E5EC4 á^.&.G=&.W±.F%.V*.F..á^.&.G=&.W± 000080
 02998788 260A5EC4 0028E903 75029B87 08260299 8788260A 5EC4FE56 89FC4689 .F=.V±á^.&....&....u.Õ(.á^.&.... 0000A0
 0037E900 40E90000 B8000607 C726FC5E C4025789 26078926 F85EC402 98978826 &....á^½&..&.W.á^=&ú...¡..Õ@.Õ7. 0000C0
 C4029F97 8B26029D 878B260A 5EC40025 E9037502 9F870826 02908788 260A5EC4 á^.&....&....u.Õ%.á^.&....&....á 0000E0
 5F5E1F00 00E90001 B80006E9 00008800 0107C726 FC5EC402 57892607 8926F85E ^½&..&.W.á^=&ú...¡..Õ..¡..Õ...^_ 000100
 FC4689FE 578B26FC 478B260E 5EC4040E 4683D88E 0008B81E 56570000 04C8CBC9 èùà...WV.¡...Ä.F..á^.&.G=&.W±.F= 000120
 0000E900 00B80257 89260789 26FC5EC4 0289978B 26028787 8B260A5E C4FE5689 .V±á^.&....&....á^=&..&.W.¡..Õ.. 000140
 89FC4689 0A578B26 08478B26 0A5EC4D8 8E008AB8 1E565700 000CC8CB C95F5E1F .^_èùà...WV.¡¤..Äá^.&.G.&.W..F=. 000160
 FA76FFF8 5689F646 89655788 26634788 26FC5EC4 FA468967 478B26FC 5EC4FE56 V±Ā^=&.Gg.F*á^=&.Gc&.We.F-.V½.v* 000180
 E9037502 A3870B26 02A18788 260A5EC4 0000FFFF 9A1277FF 261477FF 260A5EC4 á^.&.w.&.w......á^.&..À.&..È.u.Õ 0001A0
 26029987 8B260A5E C40000FF FF9A02A1 B7FF2602 A3B7FF26 0A5EC4FA 76FF0015 ...v*á^.&.ñÈ.&.ñÀ......á^.&....& 0001C0
 00B80A5E C40000FF FF9A0299 B7FF2602 9BB7FF26 0A5EC400 22E90375 0298870B ....u.Õ".á^.&.ñ..&.ñ.......á^.¡. 0001E0
```

```
Dump of file SATURN:[PCCOMMON.DUMP.DLL]SA-DIFM.DLL;1 on 18-APR-1990 10:50:26.92
File ID (450,15,0)   End of file block 323 / Allocated 324

Virtual block number 126 (0000007E), 512 (0200) bytes

 0A5EC400 24E90375 029F8708 26029D87 88260A5E C4029987 8926029B 87892600 .&....&....6^.&....&....u.Ö$.6^. 000000
 90878926 029F8789 26000088 0A5EC400 00FFFF9A 006A0290 B7FF2602 9FB7FF26 &.ñ..&.ñ..j......6^.¦..&....&... 000020
 0006E903 7500003D F4468908 C483FFFF 084B9A06 76FF0876 FFFC76FF FE76FF02 ..v±.v=.v..v..K....6..F¶=..u.Ö.. 000040
 0E4683D8 8E00FD88 1E565700 0046C8CB C95F5E1F 0000E900 00B80006 E9F44688 .F¶Ö..¦..Ö...^_èùåF..WV.¡»..Ä.F. 000060
 578B26FC 478B260E 5EC4040E 4683FC56 89FA4689 FE578B26 FC478B26 0E5EC404 .6^.&.G=&.W±.Fï.V=.F..6^.&.G=&.W 000080
 040E4683 E85689E6 4689FE57 8B26FC47 8B260E5E C4040E46 83E05689 DE4689FE ±.F8.VÅ.F..6^.&.G=&.W±.F¦.VÒ.F.. 0000A0
 83DC4689 FE478B26 0E5EC402 0E46838C 56898A46 89FE578B 26FC478B 260E5EC4 6^.&.G=&.W±.Fα.V¥.F..6^.&.G±.FÉ. 0000C0
 89D44689 FE578B26 FC478B26 0E5EC404 0E4683D2 4689FE47 8B260E5E C4020E46 F..6^.&.G±.F0.F..6^.&.G=&.W±.F6. 0000E0
 89FE578B 26FC478B 260E5EC4 040E4683 DA4689FE 478B260E 5EC4020E 4683D656 V∅.F..6^.&.G±.FÖ.F..6^.&.G=&.W±. 000100
 5EC4020E 4683F056 89EE4689 FE578B26 FC478B26 0E5EC404 0E4683EC 5689EA46 Fõ.Vš.F..6^.&.G=&.W±.FŸ.VÞ.F..6^ 000120
 02878789 26F0568B EE46880A 5EC4CC46 8967478B 26FA5EC4 D84689FE 478B260E .&.G±.FÄ6^°&.Gg.Fä6^..FŸ.VÞ&.... 000140
 260A5EC4 00009387 C6260A5E C4694789 26684789 26000088 0A5EC402 89978926 &....6^.¦..&.Gk&.Gi6^.&6....6^.& 000160
 87C7260A 5EC40000 7747C726 00C87547 C7260A5E C400007B 47C72600 CB7947C7 úGyà.&úG(..6^.&úGuà.&úGw..6^.&ú. 000180
 0A468BCC 76FF0000 7F47C726 00C87D47 C7260A5E C4000000 8387C726 00C80081 ..à.&ú.....6^.&úG)à.&úG....vä.F. 0001A0
 76FF04B0 E9BE4688 0006E903 7500003D BE468900 00FFFF9A 50520087 050C568B .V....RP......Ff=..u.Ö...FfÖ§..v 0001C0
 88C85EC4 049FE9BE 46880006 E9037500 003DBE46 89000003 BC9A5016 CB468DCC ä.Fà.P.¥....Ff=..u.Ö...FfÖ..6^à. 0001E0

Dump of file SATURN:[PCCOMMON.DUMP.DLL]SA-DIFM.DLL;1 on 18-APR-1990 10:50:26.92
File ID (450,15,0)   End of file block 323 / Allocated 324

Virtual block number 127 (0000007F), 512 (0200) bytes

 26714789 26CA568B C84688OA 5EC41FA5 F20008B9 DA8E1EF0 88F888D6 568BD446 Få.V∅.«.Þ..Ö¿...È.6^..Fà.Vò&.Go& 000000
 5AE9BE46 880006E9 03750000 3DBE4689 0000FFFF 9A5016F6 468DCC76 FF735789 .Ws.vä.F-.P......Ff=..u.Ö...FfÖZ 000020
 008F8789 26E0568B DE46880A 5EC46357 89266147 8926F856 88F64688 0A5EC404 .6^..F-.V½&.Ga&.Wc6^..F8.VÅ&.... 000040
 8926DC46 880A5EC4 02809789 26028887 89268C56 888A468B 0A5EC400 91978926 &....6^..Fα.V¥&....&....6^..FÉ&. 000060
 88EA4688 0A5EC402 8F878926 DA46880A 5EC40293 878926D2 46880A5E C4029187 ...6^..F0&....6^..FÖ&....6^..Fö. 000080
 B80A5EC4 029D8789 26029F87 89260000 B80A5EC4 02979789 26029587 8926EC56 Vš&....&....6^.¦..&....&....6^.¦ 0000A0
 B80A5EC4 02A98789 2602AB87 89260000 B80A5EC4 02A58789 2602A787 89260000 ..&..Ï.&..Ë.6^.¦..&..¨.&..`.6^.¦ 0000C0
 8B0A5EC4 02B18789 26028387 89260000 B80A5EC4 02AD8789 2602AF87 89260000 ..&..£.&..Ù.6^.¦..&..°.&..Ý.6^.. 0000E0
 FFE076FF 0477FF26 0677FF26 FA5EC400 33E90375 E0460BDE 46881047 8926D846 FÄ&.G..F8.FÅu.Ö3.6^°&.w.&.w..vÅ. 000100
 46880006 E9037500 BE7E83BE 46890000 FFFF9A50 52000E05 0C56880A 468BDE76 v8.F..V....RP......Ff.-f.u.Ö...F 000120
 76FF0A57 89260847 8926FC56 88FA4688 0A5EC400 010C47C7 260A5EC4 0357E9BE fÖW.6^.&úG...6^..F°.V∅&.G.&.W..v 000140
 0C56880A 4688CC76 FF08C483 FFFF0056 9A505200 93050C56 880A4688 E676FFE8 Ö.v¦.F..V....RP.V....6..vä.F..V. 000160
 E9037500 003DBE46 890000FF FF9A5016 C4468DCC 76FF0000 FFFF9A50 52001205 ...RP......vä.F6.P......Ff=..u.Ö 000180
 9ABA76FF 8C76FFC4 76FFC676 FF6377FF 266577FF 26FA5EC4 02F3E9BE 46880006 ...FfÖμ.6^°&.we&.wc.vó.v6.v¥.vα. 0001A0
 0000FFFF 9ADC76FF C476FFC6 76FF0000 FFFF9ADA 76FFC476 FFC676FF 0000FFFF .....vó.v6.vÖ......vó.v6.vÉ..... 0001C0
 FFC476FF C676FF63 77FF2665 77FF26FA 5EC40000 FFFF9AD2 76FFC476 FFC676FF .vó.v6.v0.....6^°&.we&.wc.vó.v6. 0001E0

Dump of file SATURN:[PCCOMMON.DUMP.DLL]SA-DIFM.DLL;1 on 18-APR-1990 10:50:26.92
File ID (450,15,0)   End of file block 323 / Allocated 324

Virtual block number 128 (00000080), 512 (0200) bytes

 46880A5E C40000FF FF9AC876 FFCA76FF C476FFC6 76FF0000 FFFF9AE6 76FFE876 vÒ.v¦......vó.v6.vò.và.....6^..F 000000
 7E830299 87892602 9B878926 0000B80A 5EC402A3 97892602 A1878926 C65688C4 6.V6&..Å.&..È.6^.¦..&....&.....- 000020
 F076FF50 16E4468D 00F5E903 75F0460B EE468802 4EE90000 880006E9 03750008 Ä.u.Ö..¦..ÖN..FŸ.FÞu.Ö%..Fõ.P.vÞ 000040
 468D0476 FFD676FF 6377FF26 6577FF26 FA5EC40A C4830000 FFFF9A00 6AEE76FF .vŸj.......6.6^°&.we&.wc.v∅.vå.F 000060
 FFCE76FF D076FF02 02E9BE46 880006E9 03750000 3DBE4689 0000FFFF 9A5016CE ö.P......Ff=..u.Ö...FfÖ...vÅ.vö. 000080
 9A006AEE 76FFF076 FF5D0468 5016C046 8D5016E2 46800000 FFFF9A06 76FF0876 v..v.......Fã.P.Få.Phå].vÞ.vŸj.. 0000A0
 830CC483 0000FFFF 9A006AEE 76FFF076 FF5DC568 5016FE46 8D10C483 00000668 h....6..F±.Phé].vÞ.vŸj.......6.. 0000C0
 880A5EC4 0000FFFF 9AC076FF C276FFE2 76FFCE76 FFD076FF 0014E903 7500FE7E ~±.u.Ö...vÅ.vö.vã.vó.vå.....6^.. 0000E0
 97892600 88878926 D05688CE 46880A5E C4029897 89260299 87892600 5688CE46 Fö.VÅ&....&....6^..Fö.VÅ&....&.. 000100
 880003E9 00018800 06E90374 77E47E83 60478926 6F478926 0000880A 5EC4008D ..6^.¦..&.Go&.Gm.-Öwt.Ö..¦..Ö..¦ 000120
 468D0476 FFD676FF 6377FF26 6577FF26 FA5EC400 82E90285 8789260A 5EC40000 ..6^.&..ç.Ö..6^°&.we&.wc.v∅.vå.F 000140
 6AF276FF F476FF01 22E9BE46 880006E9 03750000 3DBE4689 0000FFFF 9A5016F2 ·.P......Ff=..u.Ö...FfÖ"..v¶.v·j 000160
 46880A5E C40000FF FF9A0676 FF0876FF F276FFF4 76FF0000 FFFF9A01 6A006A00 .j.j.......v¶.v·.v..v......6^..F 000180
 C46F5789 266D4789 26F4568B F246880A 5EC4029F 97892602 90878926 F4568BF2 ·.V¶&....&....6^..F·.V¶& ^m&.Wo6 0001A0
 BF83260A 5EC4000E E90375F0 460BEE46 88008887 8926008D 87892600 00880A5E ^.¦..&....&.....FŸ.FÞu.Ö.. ¡^.&.¢ 0001C0
 FFD476FF D676FFDA 76FFEA76 FFEC76FF EE76FFF0 76FF016A 005EE903 75000285 ç..u.Ö^.j..vÞ.vŸ.vš.võ.vÖ.v∅.vå. 0001E0
```

Dump of file SATURN:[PCCOMMON.DUMP.DLL]SA-DIFM.DLL;1 on 18-APR-1990 10:50:26.92
File ID (450,15,0)   End of file block 323 / Allocated 324

Virtual block number 129 (00000081), 512 (0200) bytes

```
0A468BFA 76FFFC76 FFDE76FF E076FFE6 76FFE876 FFBA76FF BC76FFDC 76FFD276 v.vÉ.v¥.vø.vò.vl.vÁ.v8.v=.v'.F. 000000
0006E903 7500BE7E 83BE4689 2CC48300 00FFFF9A 006A786A 50520065 050C5688 .V..e.RPjxj.......é,.Ff.~f.u.Õ.. 000020
890CC483 00000650 9A006A06 76FF0876 FF5F5168 D476FFD6 76FF0055 E9BE4688 .FfÕU..v.vâhQ_.v..v.j..P....é.. 000040
E00818 9A 0676FF08 76FFFA76 FFFC76FF 002BE9BE 46880006 E9037500 0030BE46 Ff=..u.Õ...FfÕ+..v=.v'.v..v....Á 000060
CBC95F5E 1F0000E9 00008800 06E9BE46 880006E9 03750000 30BE4689 08C48301 ..é..Ff=..u.Õ...FfÕ..¡..Õ...^_èù 000080
FC5EC4FE 5689FC46 890A5788 26084788 260A5EC4 D88E0209 881E5657 00000CC8 à...WV.¡...Äé^.&.G.&.W..F=.V±ã^= 0000A0
83260A5E C400E6E9 0375000C 7F83260A 5EC4F656 89F44689 65578826 63478826 &.Gc&.We.F¶.V-é^.&....u.Õl.é^.&. 0000C0
088B9A01 6A026A71 77FF2673 77FF260A 5EC4F476 FFF676FF 0020E903 7500107F ...u.Õ ..v-.v¶é^.&.ws&.wqj.j..E. 0000E0
FF260A5E C4F476FF F676FF00 1AE90375 000E7F83 260A5EC4 008FE900 00880000 ..¡..Õ«.é^.&....u.Õ...v-.v¶é^.&. 000100
9A5016F8 468D5052 0093050C 56880A46 88000009 4D9A006A 086A7177 FF267377 ws&.wqj.j..M....F..V....RP.F½.P. 000120
50520093 050C5688 0A4688F4 76FFF676 FF0046E9 0375FA46 08F84688 0000FFFF .....F½.F'u.ÕF..v-.v¶.F..V....RP 000140
028FB7FF 260A5EC4 7177FF26 7377FF26 0A5EC402 8887FF26 028D87FF 260A5EC4 é^.&.ñ..&.ñ..é^.&.ws&.wqé^.&.ñ.. 000160
87082602 87878826 0A5EC400 00FFFF9A 02938 7FF 260A5EC4 029187FF 260A5EC4 é^.&.ñ..é^.&.ñ.......é^.&....&.. 000180
00FFFF9A 016A066A 7177FF26 7377FF26 0A5EC4F4 76FFF676 FF001AE9 03740289 ..t.Õ...v-.v¶é^.&.ws&.wqj.j..... 0001A0
260E5EC4 040E4683 088E0838 881E5657 000018C8 CBC95F5E 1F0000E9 00008800 .¡..Õ...^_èùà...WV.¡8..Ä.F..é^.& 0001C0
5EC4FA56 89F84689 0A578826 08478826 0A5EC4F4 5689F246 89FE5788 26FC4788 .G=&.W±.F¯.V¶é^.&.G.&.W..F½.V'é^ 0001E0
```

Dump of file SATURN:[PCCOMMON.DUMP.DLL]SA-DIFM.DLL;1 on 18-APR-1990 10:50:26.92
File ID (450,15,0)   End of file block 323 / Allocated 324

Virtual block number 130 (00000082), 512 (0200) bytes

```
B7FF2602 89B7FF26 0A5EC450 16F6468D 0048E903 75028987 0B260287 8788260A .&....&....u.ÕH..F-.Pé^.&.ñ..&.ñ 000000
5EC450CC 68F276FF F476FF00 23E90375 77F67E83 0AC48300 0005F69A 006A0287 ..j..-....é..--wu.Õ#..v¶.v·hël é^ 000020
010E47C7 260A5EC4 00E0E90C C4830000 0A199A00 6A0287B7 FF260289 B7FF260A .&.ñ..&.ñ..j.......é.ÕÁ.é^.&úG.. 000040
271068EE 76FFF076 FF5016FC 468DF056 89EE4689 06578826 04478826 F85EC400 .é^¥&.G.&.W..FŸ.Vþ.F=.P.vþ.vŸh.' 000060
97E9E846 880006E9 03750000 30E84689 10C48300 0007E89A 006A0676 FF0876FF .v..v.j..Õ....é..FÕ=..u.Õ...FÕÕ. 000080
0676FF08 76FFF876 FFFA76FF 0000FFFF 9A016AFC 76FFFE76 FFEE76FF F076FF00 ..vþ.vŸ.v±.v=j.......v'.v½.v..v. 0000A0
26078826 F25EC400 5FE9E846 880006E9 03750000 30E84689 08C48308 0F08C59A .é....é..FÕ=..u.Õ...FÕÕ_.é^·&..& 0000C0
260A5EC4 06578826 04478826 F25EC402 57892607 8926125F C4260A5E C4025788 .W.é^.&é_.&..&.W.é^·&.G.&.W.é^.& 0000E0
FFEC76FF EC5689EA 46896557 88266347 8826F85E C4065789 26044789 26125FC4 é_.&.G.&.W.é^¥&.Gc&.We.FÕ.V&.v&. 000100
000CC8CB C95F5E1F 0000E900 00880000 FFFF9A71 77FF2673 77FF260A 5EC4EA76 vÕé^.&.ws&.wq.....¡..Õ...^_èùà.. 000120
5EC4F856 89F64689 FE578826 FC478826 0E5EC404 0E468308 8E096488 1E565700 .WV.¡d..Ä.F..é^.&.G=&.W±.F¯.V½é^ 000140
48E90375 0289870B 26028787 88260A5E C4FE5689 FC46890A 57882608 4788260A .&.G.&.W..F=.V±é^.&....&....u.ÕH 000160
FA7E830A C4830000 09B59A00 6A0287B7 FF260289 B7FF260A 5EC45016 FA468D00 ..F'.Pé^.&.ñ..&.ñ..j..ç....é..-' 000180
789A006A 0287B7FF 26028987 FF260A5E C45DCE68 F676FFF8 76FF0023 E9037577 wu.Õ#..v½.v-höl é^.&.ñ..&.ñ..j..x 0001A0
FF5DCC68 F676FFF8 76FF002A E9037400 0E7F8326 0A5EC400 3DE90CC4 83000008 ....é.Õ=.é^.&....t.Õ°..v½.v-hël. 0001C0
0006E9F4 46880006 E9037500 0030F446 890CC483 0000090E 9A006A06 76FF0876 v..v.j..8....é..F¶=..u.Õ...F¶Õ.. 0001E0
```

Dump of file SATURN:[PCCOMMON.DUMP.DLL]SA-DIFM.DLL;1 on 18-APR-1990 10:50:26.92
File ID (450,15,0)   End of file block 323 / Allocated 324

Virtual block number 131 (00000083), 512 (0200) bytes

```
8B260E5E C4040E46 83D88E0A D5881E56 5700000C C8CBC95F 5E1F0000 E9000088 ¡..Õ...^_èùà...WV.¡f..Ä.F..é^.&. 000000
0A5EC4FE 5689FC46 890A5788 26084788 260A5EC4 F85689F6 4689FE57 8826FC47 G=&.W±.F¯.V½é^.&.G.&.W..F=.¨+é^. 000020
87B7FF26 0289B7FF 260A5EC4 5016FA46 8D0048E9 03750289 87082602 87878826 &....&....u.ÕH..F'.Pé^.&.ñ..&.ñ. 000040
0A5EC45D CF68F676 FFF876FF 0023E903 7577FA7E 830AC483 00000826 9A006A02 .j..&....é..-'wu.Õ#..v½.v-hül é^. 000060
74000E7F 83260A5E C40064E9 0CC48300 000C469A 006A0287 B7FF2602 89B7FF26 &.ñ..&.ñ..j..F....é.Õd.é^.&....t 000080
F446890C C4830000 0C6D9A00 6A0676FF 0876FF5D CC68F676 FFF876FF 002DE903 .Õ-..v½.v-hël.v..v.j..m....é..F¶ 0000A0
000B4F9A 006A0676 FF0876FF 50CD6800 24E9002D E9F44688 0006E903 75000030 =..u.Õ...F¶Õ-.Õ$.hël.v..v.j..O.. 0000C0
CBC95F5E 1F0000E9 00008800 06E9F446 880006E9 03750000 30F44689 08C48300 ..é..F¶=..u.Õ...F¶Õ..¡..Õ...^_èù 0000E0
0A5EC4FA 5689F846 890A5788 26084788 260A5EC4 D88E08A3 881E5657 000018C8 à...WV.¡È..Äé^.&.G.&.W..F½.V'ã^. 000100
87B7FF26 0289B7FF 260A5EC4 5016F646 8D0048E9 03750289 87082602 87878826 &....&....u.ÕH..F-.Pé^.&.ñ..&.ñ. 000120
0A5EC45D CD68F276 FFF476FF 0023E903 7577F67E 830AC483 00000BF4 9A006A02 .j..¶....é..—wu.Õ#..v¶.v·hël é^. 000140
88260447 8826F85E C4008FE9 0CC48300 0000499A 006A0287 B7FF2602 89B7FF26 &.ñ..&.ñ..j..I....é.Õ«.é^¥&.G.&. 000160
89F84689 0A578826 08478826 0A5EC400 000E47C7 260A5EC4 F05689EE 46890657 W..FŸ.Vþé^.&úG...é^.&.G.&.W..F½. 000180
10C48300 000C1D9A 006A0676 FF0876FF 271068EE 76FFF076 FF5016FC 468DFA56 V'.F=.P.vþ.vŸh.'.v..v.j.......é. 0001A0
9A006AFC 76FFFE76 FFEE76FF F076FF00 65E9E846 880006E9 03750000 30E84689 .FÕ=..u.Õ...FÕÕe..vþ.vŸ.v±.v=j.. 0001C0
03750000 30E84689 08C4830A 530A779A 0676FF08 76FFF876 FFFA76FF 00000A40 @....v'.v½.v..v..w.S..é..FÕ=..u. 0001E0
```

Dump of file SATURN:[PCCOMMON.DUMP.DLL]SA-DIFM.DLL;1 on 18-APR-1990 10:50:26.92
File ID (450,15,0)   End of file block 323 / Allocated 324

Virtual block number 132 (00000084), 512 (0200) bytes

```
EA76FFEC 76FFEC56 89EA4689 65578826 63478826 F85EC400 2DE9E846 8B0006E9 õ...Fòõ-.á^½&.Gc&.We.Fõ.Vš.vš.võ 000000
57000072 C8CBC95F 5E1F0000 E90000B8 00000ABE 9A7177FF 267377FF 260A5EC4 á^.&.ws&.wq.ƒ...¡..Õ...^ èùàr..W 000020
260447B8 26F45EC4 F65689F4 46890A57 8B260847 8B260A5E C4088E0C 98881E56 V.¡...Äá^.&.G.&.W..F¶.V-ã^¶&.G.& 000040
5EC4F256 89F04689 FE578B26 FC478B26 0E5EC404 0E4683CA 5689C846 8906578B .W..Fà.Vò.F..á^.&.G•&.W±.FÞ.V·á^ 000060
7E8DF256 8BF0468B 1FA5F200 08890A8E 1EF08BFB 8BF2568B F0468871 5FC4260A .&á_q.FÞ.V·.«.Þ..Õ¿..·Ê..FÞ.V·.~ 000080
0017E903 7502A387 0B2602A1 878B260A 5EC41FA5 F2000889 DA8E1E07 16F0888E ..Þ....Õ¿..·Ê.á^.&..À.&..È.u.Õ.. 0000A0
26029087 8B260A5E C4000005 A79A5016 8E468D02 A1B7FF26 02A3B7FF 260A5EC4 á^.&.ñÊ.&.ñÀ..F..P.Ï...á^.&....& 0000C0
77FF2673 77FF260A 5EC4029D 87FF2602 9FB7FF26 0A5EC400 1DE90375 029F870B ....u.Õ..á^.&.ñ..&.ñ..á^.&.ws&.w 0000E0
029B87FF 260A5EC4 001DE903 75029B87 0B260299 8788260A 5EC40000 FFFF9A71 q.....á^.&....&....u.Õ..á^.&.ñ.. 000100
03750002 B5BF8326 0A5EC400 00FFFF9A 7177FF26 7377FF26 0A5EC402 9987FF26 &.ñ..á^.&.ws&.wq.....á^.&.¢ç..u. 000120
46890657 8B260447 8B26F05E C4FA5689 F8468902 578B2607 8B26F05E C4011CE9 Õ..á^Þ&..&.W..F½.V•á^Þ&.G.&.W..F 000140
87B7FF26 02B987FF 260A5EC4 271268C8 76FFCA76 FF126A50 169E4680 FE5689FC •.V±.F..Pj..vò.vàh.'á^.&.ñ..&.ñ. 000160
889E4688 028BE9A6 46880006 E9037500 0030A646 8912C483 00000FBB 9A006A02 .j..£....á..F Ï=..u.Õ...FÏÕ£..F.. 000180
E25689E0 4689FA56 8BF84688 EE5689EC 4689A456 8BA24688 EA5689E8 4689A056 V..FÒ.Võ.FÅ.VÊ.Fš.VŸ.F½.V•.FÁ.Vã 0001A0
E90374EA 5639001E E90374E8 4639E256 8BE0468B E65689E4 4689FE56 8BFC468B .F•.V±.Fõ.VÌ.FÁ.Vã9FÒt.Õ. 9Võt.Õ 0001C0
F476FFF6 76FF176A 0067E903 75EE5639 0008E903 74EC4639 E6568BE4 468B0016 ...Fõ.VÌ9Fšt.Õ..9VŸu.Õg.j. v-.v¶ 0001E0
```

Dump of file SATURN:[PCCOMMON.DUMP.DLL]SA-DIFM.DLL;1 on 18-APR-1990 10:50:26.92
File ID (450,15,0)   End of file block 323 / Allocated 324

Virtual block number 133 (00000085), 512 (0200) bytes

```
FF260A5E C4271768 C876FFCA 76FF126A 5016F846 8DA64689 06C4830F D600009A ...ø..á..FÏ.F½.Pj..vò.vàh.'á^.&. 000000
F676FF00 14E90375 00003DA6 468912C4 83000010 299A006A 02B7B7FF 26028987 ñ..&.ñ..j..)....á..FÏ=..u.Õ...v- 000020
C404C483 FFFF0064 9AF476FF F676FF02 06E9A646 8B04C483 0FEA0064 9AF476FF .v¶.d.õ..á..FÏÕ...v-.v¶.d....á.á 000040
89C84689 06578826 04478826 F45EC401 E0E90374 0289870B 26028787 8B260A5E ^.&....&....t.ÕÁ.á^¶&.G.&.W..Fà. 000060
10C48300 0010689A 006A0676 FF0876FF 271068C8 76FFCA76 FF50160C 468DCA56 Vò.FÉ.P.vò.vàh.'.v..v.j..k....á. 000080
E90000B8 0006E903 74DE4608 DC468801 A6E9A646 8B0006E9 03750000 3DA64689 .FÏ=..u.Õ...FÏÕÏ..FÉ.FBt.Õ..|..Õ 0000A0
8300000C FD9A006A 0676FF08 76FF2712 68C876FF CA76FF04 6A501688 468D0195 ...F|.Pj..vò.vàh.'.v..v.j..».... 0000C0
8BCE5689 CC46898A 56888846 880164E9 A6468800 06E90375 000030A6 468912C4 á..FÏ=..u.Õ...FÏÕd..F¡.Va.Fä.Vö. 0000E0
D84689C6 5688C446 88D25689 D04689BE 56888C46 88D65689 D44689C2 5688C046 Få.Võ.Få.Vø.F¥.V/.FÅ.V∅.Fó.Vó.FÄ 000100
5DE90374 02573926 0066E903 74073926 CE5688CC 468B715F C4260A5E C4DA5689 .VÖá^.&á_q.Fä.Vö&9.t.Õf.&9W.t.Õ] 000120
003EE903 740A5739 260047E9 03740847 39260656 88D4468B 715FC426 0A5EC400 .á^.&á_q.Fà.Vø&9G.t.ÕG.&9W.t.Õ>. 000140
C4001FE9 03740657 39260028 E9037404 47392602 56880046 8B715FC4 260A5EC4 á^.&á_q.FÅ.Vø&9G.t.Õ(.&9W.t.Õ..á 000160
5EC400B3 E903750E 57392600 09E90374 0C473926 DA5688D8 468B715F C4260A5E ^.&á_q.FÄ.VÖ&9G.t.Õ..&9W.u.Õ°.á^ 000180
578B2608 478B2671 5FC4260A 5EC4AA56 89A84689 02578826 078B2671 5FC4260A .&á_q&..&.W..F´.V`á^.&á_q&.G.&.W 0001A0
260A5EC4 AE5689AC 46890657 8B260447 8B26715F C4260A5E C4825689 B046890A ..F¯.Vÿá^.&á_q&.G.&.W..F¯˜.VÙá^.& 0001C0
C48311C8 00009AF4 76FFF676 FF176AB6 5689B446 890E578B 260C478B 26715FC4 á_q&.G.&.W..FÇ.VÑj..v-.v¶...à..á 0001E0
```

Dump of file SATURN:[PCCOMMON.DUMP.DLL]SA-DIFM.DLL;1 on 18-APR-1990 10:50:26.92
File ID (450,15,0)   End of file block 323 / Allocated 324

Virtual block number 134 (00000086), 512 (0200) bytes

```
000F149A 006A0676 FF0876FF 271768C8 76FFCA76 FF046A50 16A8468D A6468906 ..FÏ.F´.Pj..vò.vàh.'.v..v.j..... 000000
A6468804 C48311DC 00649AF4 76FFF676 FF0014E9 03750000 30A64689 12C48300 ..á..FÏ=..u.Õ...v-.v¶.d.É..á..FÏ 000020
00000EC8 CBC95F5E 1F0000E9 0000B804 C4830F93 00649AF4 76FFF676 FF0014E9 Õ...v-.v¶.d....á.¡..Õ...^ èùà... 000040
8F878926 F64688OA 5EC4F646 89FE478B 260E5EC4 020E4683 D88E0DD3 8B1E5657 WV.¡Æ..Ä.F..á^.&.G±.F-á^..¯F-&... 000060
468DF276 FFF476FF 01BBE9F6 4688F456 89F24689 73578826 71478826 0A5EC402 .á^.&.Gq&.Ws.F·.V¶.F-ÕE..v¶.v·.F 000080
C4026A00 6AFA5689 F8468902 578B2607 8B26F25E C401CEE9 0000FFFF 9A5016F8 ½.P.....Õö.á^·&..&.W..F½.V•j.j.á 0000A0
26F25EC4 050205CC 9A505206 571B2604 472B26F2 5EC40E57 8B260C47 8B26F25E ^·&.G.&.W.á^·&+G.&.W.RP.ä...á^·& 0000C0
5689F846 890A578B 2608478B 26F25EC4 0189E9FE 5689FC46 89065713 26044703 .G.&.W..F•.V±Õ..á^·&.G.&.W..F½.V 0000E0
05CC9A50 5206571B 2604472B 26F25EC4 0E578826 0C478826 F25EC402 6A006AFA •j.j.á^·&.G.&.W.á^·&+G.&.W.RP.ä. 000100
478B26F2 5EC4026A 006A0143 E9FE5689 FC468906 57132604 470326F2 5EC412E4 õ.á^·&.G.&.W..F•.V±ÕC.j.j.á^·&.G 000120
02571326 070326F2 5EC41328 05CC9A50 5202571B 26072826 F25EC40A 578B2608 .&.W.á^·&+.&.W.RP.ä.(.á^·&..&.W. 000140
5EC4026A 006A00FF E9FE5689 FC46890E 578B260C 478B26F2 5EC4FA56 89F84689 .F½.V•á^·&.G.&.W..F•.V±Õ..j.j.á^ 000160
070326F2 5EC4126A 05CC9A50 5202571B 26072826 F25EC40A 578B2608 478B26F2 ·&.G.&.W.á^·&+.&.W.RP.ä.j.á^·&.. 000180
5EC400BB E9FE5689 FC468906 578B2604 478B26F2 5EC4FA56 89F84689 02571326 &.W..F½.V•á^·&.G.&.W..F•.V±Õ£.á^ 0001A0
E9FE5689 FC46890E 578B260C 478B26F2 5EC4FA56 89F84689 02578826 078B26F2 ·&..&.W..F½.V•á^·&.G.&.W..F•.V±Õ 0001C0
FC468906 578B2604 478B26F2 5EC4FA56 89F84689 02578826 078B26F2 5EC40097 ..á^·&..&.W..F½.V•á^·&.G.&.W..F• 0001E0
```

```
Dump of file SATURN:[PCCOMMON.DUMP.DLL]SA-DIFM.DLL;1 on 18-APR-1990 10:50:26.92
File ID (450,15,0)   End of file block 323 / Allocated 324

Virtual block number 135 (00000087), 512 (0200) bytes

 8B260C47 8B26F25E C4FA5689 FB46890A 578B2608 478B26F2 5EC40073 E9FE5689 .V±Õs.á^·&.G.&.W..F½.V°á^·&.G.&. 000000
 26F25EC4 FA5689F8 46890A57 8B260847 8B26F25E C4004EE9 FE5689FC 46890E57 W..F•.V±ÕN.á^·&.G.&.W..F½.V°á^·& 000020
 FF2E93C0 03001EE9 0376000A 3D0026E9 0029E9FE 5689FC46 89065788 26044788 .G.&.W..F•.V±Õ).Õ&.=..v.( ..á... 000040
 1F0000E9 0000B813 96138B12 80140913 4E137212 3B140912 C6130A12 2813F3A7 ¦µ.(...ó...;.r.N.....£.... .Õ... 000060
 5689FC46 890A578B 26084788 260A5EC4 D88E11F4 B81E5657 000050C8 CBC95F5E ^_èùàP..WV.¡¶..Äá^.&.G.&.W..;•.V 000080
 FE76FF13 6A00010C 47C7260A 5EC4B456 89B24689 06578B26 04478B26 FC5EC4FE ±ä^•&.G.&.W..Fý.VÇá^.&ÚG...j..v± 0000A0
 6A501686 468D012E 68002FE9 037500B0 7E83B046 8906C483 14FE0000 9AFC76FF .v•...±..á..F¯.~¯.u.Õ/.h...FÑ.Pj 0000C0
 0000FFFF 9A206A00 6A501686 468D02EE 681E016A 006A016A 006A0000 FFFF9A42 B.....j.j.j.j..hŸ..FÑ.Pj.j ..... 0000E0
 0011AD9A 006A0676 FF0876FF 27106882 76FFB476 FF5016F8 468D0084 E9804688 .F¯Õ...F½.P.vÇ.vÿh.'.v..v.j..Ù.. 000100
 76FFFA76 FFB276FF B476FF00 55E9B046 880006E9 03750000 30B04689 10C48300 ..á..F¯=..u.Õ...F¯ÕU..vÇ.vý.v°.v 000120
 8B0006E9 03750000 30B04689 0000FFFF 9A505200 93050C56 8B0A4688 01F468F8 ¥h¶..F..V....RP......F¯=..u.Õ... 000140
 46880006 E9037500 003DB046 8904C483 118C0064 9AFC76FF FE76FF00 25E9B046 F¯Õ%..v±.v•.d....á..F¯=..u.Õ...F 000160
 C4040E46 83D88E14 1C881E56 5700003E C8CBC95F 5E1F0000 E90000B8 0006E9B0 ¯Õ..¡..Õ...^_èùà>..WV.¡...Ä.F..á 000180
 89FE578B 26FC478B 260E5EC4 040E4683 C45689C2 4689FE57 8B26FC47 8B260E5E ^.&.G•&.W±.FÕ.Vá.F..á^.&.G•&.W±. 0001A0
 4689FE47 8B260E5E C4020E46 83E04689 FE478B26 0E5EC402 0E4683C8 5689C646 Fá.Và.F..á^.&.G±.FÁ.F..á^.&.G±.F 0001C0
 478B260E 5EC4020E 46830656 89D44689 FE578B26 FC478B26 0E5EC404 0E4683D8 Ä.F..á^.&.G•&.W±.Fâ.V•.F..á^.&.G 0001E0

Dump of file SATURN:[PCCOMMON.DUMP.DLL]SA-DIFM.DLL;1 on 18-APR-1990 10:50:26.92
File ID (450,15,0)   End of file block 323 / Allocated 324

Virtual block number 136 (00000088), 512 (0200) bytes

 08478B26 0A5EC4E6 5689E446 89FE578B 26FC478B 260E5EC4 040E4683 DE4689FE ±.F8.F..á^.&.G•&.W±.FÕ.V¦á^.&.G. 000000
 8B260A5E C4CE5689 CC468965 578B2663 478B26FC 5EC4FE56 89FC4689 0A578B26 &.W..F•.V±á^•&.Gc&.We.Fä.Vöá^.&. 000020
 5689D046 8902A397 8B2602A1 878B260A 5EC4EA56 89E84689 0289978B 26028787 ...&.....FÒ.Võá^.&..À.&..È..FÁ.V 000040
 DC4608DA 46880000 08D09A50 160A4680 C276FFC4 76FF0001 0C47C726 0A5EC4D2 ¢á^.&úG....vá.vô.FÖ.P.À....FÖ.FÉ 000060
 00001660 9A006A06 76FF0876 FF5DCA68 0016E903 75EA460B E8468B00 34E90374 t.Õ4..FÒ.Fõu.Õ..hò].v..v.j..'... 000080
 74EA460B E8468B01 9BE906C4 830000FF FF9A006A 0676FF08 76FF0010 E908C483 .á.Õ...v..v.j.......á.Õ...FÒ.Fõt 0000A0
 C476FF00 22E9CA46 8908C483 00001685 9A006A06 76FF0876 FF5F5568 0019E903 .Õ..hU_.v..v.j........á..FòÕ"..vá 0000C0
 83CA4689 10C48300 0017BF9A 006AE876 FFEA76FF 50D56806 76FF0876 FFC276FF .vó.v..v.h(].vö.vÒj..¢....á._Fò. 0000E0
 C48312B0 00569A50 52009305 0C56880A 4688C276 FFC476FF 014CE903 7400CA7E ~ò.t.ÕL..vá.vô.F..V....RP.V.¯..á 000100
 C4029187 8926E046 880A5EC4 028D9789 26028887 8926C856 88C64688 0A5EC408 .á^..Fó.Vè&....&....á^..FÄ&....á 000120
 8926E656 88E44688 0A5EC402 8F878926 DE46880A 5EC40293 87892608 46880A5E ^..FÄ&....á^..F8&....á^..FÕ.V¦&. 000140
 C4831456 11139AD4 76FFD676 FF7177FF 267377FF 260A5EC4 02979789 26029587 ...&....á^.&.ws&.wq.v•.vâ...V..á 000160
 509AC676 FFC876FF D076FFD2 76FFCC76 FFCE76FF 006EE903 75D2460B D0468808 ..FÀ.F@u.Õn..vö.vä.v@.vÀ.và.vó.P 000180
 FF000005 6C9AE076 FFD076FF D276FF00 00055E9A DE76FFD0 76FFD276 FF000005 ....v@.vÀ.v8.^....v@.vÀ.vÀ.l.... 0001A0
 9AC276FF C476FFD0 76FFD276 FFCC76FF CE76FF00 00057A9A D876FFD0 76FFD276 v@.vÀ.vÄ.z....vö.vä.v@.vÀ.vá.vò. 0001C0
 EA460BE8 46880000 0E639A71 77FF2673 77FF260A 5EC40076 FFD276FF 00000596 .....v@.vÀá^.&.ws&.wq.c....FÒ.Fõ 0001E0

Dump of file SATURN:[PCCOMMON.DUMP.DLL]SA-DIFM.DLL;1 on 18-APR-1990 10:50:26.92
File ID (450,15,0)   End of file block 323 / Allocated 324

Virtual block number 137 (00000089), 512 (0200) bytes

 C476FF50 16EC4680 5016DE46 800041E9 03750002 B5BF8326 0A5EC400 4FE90375 u.Õ0.á^.&.¢ç..u.ÕA..F8.P.F§.P.vá 000000
 76FF5F51 685016EC 468014C4 83000014 AD9A006A E876FFEA 76FF5E99 68C276FF .vòh.^.võ.vÒj..Ù....á..F&.PhQ_.v 000020
 89260000 B8695FC4 26FC5EC4 10C48300 00FFFF9A 006A0676 FF0876FF 0A76FF0C ..v..v..v.j.......á.á^•&á_||..&. 000040
 E2468D50 16EC468D FC76FFFE 76FFFFFF 68008368 CC76FFCE 76FF1247 89261447 G.&.G..vö.väh..h...v±.v•.F§.P.Fä 000060
 9ACC76FF CE76FF00 11E9CA46 880006E9 037500CA 7E83CA46 890000FF FF9A5016 .P......Fò.~ò.u.Õ...FòÕ...vö.vä. 000080
 76FF2676 FFD88E15 27B81E56 57000000 C8CBC95F 5E1F0000 E90000B8 0000FFFF ....¡..Õ...^_èùà...WV.¡'..Ä.v&.v 0000A0
 FF5F5468 1276FF14 76FF1676 FF1876FF 1A76FF1C 76FF1E76 FF2076FF 2276FF24 $.v".v .v..v¯.v..v..v..v..v.hT_. 0000C0
 47B81E56 57000004 C8CBC95F 5E1F0000 E91EC483 0000162C 9A006A0A 76FF0C76 v..v.j..,....á.Õ...^_èùà...WV.¡G 0000E0
 FF6377FF 266577FF 26FC5EC4 FE5689FC 46890A57 8B260847 8B260A5E C4D88E18 ..Äá^.&.G.&.W..F•.V±ã^•&.we&.wc. 000100
 77FF2673 77FF26FC 5EC4006A 006A02A1 B7FF2602 A3B7FF26 0A5EC406 76FF0876 v..v.á^.&.ñÈ.&.ñÀ.j.j.á^•&.ws&.w 000120
 D88E188F B81E5657 00005CC8 CBC95F5E 1F0000E9 0000FFFF 9AFFFF68 FFFF6871 qh..h.......Õ...^_èùà\..WV.¡...Ä 000140
 0037E903 74084608 D64688D8 5689D646 89FE578B 26FC478B 260E5EC4 040E4683 .F..á^.&.G•&.W±.F@.VÄ.F•.FÄt.Õ7. 000160
 C846890C C4830000 19589A00 6A6577FF 266777FF 260A5EC4 50C06850 16884680 .F¡.Phä]á^.&.wg&.wej..X....á..Fà 000180
 77FF260A 5EC46025 68D8568C D64689B8 468D027A E9C84688 0006E903 7500003D •..u.Õ...FàÕz..F¡.F•.VÀhX'á^.&.w 0001A0
 0248E9C8 46880006 E9037500 003DC846 8908C483 00001878 9A006A65 77FF2667 g&.wej..x....á..Fà=..u.Õ...FàÕH. 0001C0
 890A4689 68578B26 69478B26 FC5EC4FE 5689FC46 890A578B 26084788 260A5EC4 á^.&.G.&.W..F•.V±á^•&.Gi&.Wk.FÖ. 0001E0
```

```
Dump of file SATURN:[PCCOMMON.DUMP.DLL]SA-DIFM.DLL;1 on 18-APR-1990 10:50:26.92
File ID (450,15,0)   End of file block 323 / Allocated 324

Virtual block number 138 (0000008A), 512 (0200) bytes

0A5EC402 578B2607 8B26D65E C4D05689 CE468965 578B2663 478B26FC 5EC4DC56 VÉá^•&.Gc&.We.Fö.VÅá^ø&..&.W.á^. 000000
260A5EC4 06578B26 04478B26 D65EC4B2 56898046 8902571B 26072B26 715FC426 &á_q&+.&.W..F¯.Výá^ø&.G.&.W.á^.& 000020
5689AC46 8902578B 26078B26 D65EC4B6 56898446 8906571B 2604472B 26715FC4 á_q&+G.&.W..FÇ.VÑá^ø&..&.W..F¯.V 000040
D246890A 578B2608 478B2606 5EC4A656 89A44689 06578B26 04478B26 D65EC4AE Ûõ^ø&.G.&.W..FÊ.VÏá^ø&.G.&.W..F0 000060
8B26078B 26715FC4 260A5EC4 CC5689CA 46890E57 8B260C47 8B26065E C4D45689 .Váá^ø&.G.&.W..Fò.Vëá^.&á_q&..&. 000080
0A5EC4F2 5689F046 8906578B 2604478B 26715FC4 260A5EC4 F65689F4 46890257 W..F¶.V-á^.&á_q&.G.&.W..FÞ.V·á^. 0000A0
578B260C 47882671 5FC4260A 5EC4AA56 89A84689 0A578B26 08478B26 715FC426 &á_q&.G.&.W..F¯.V¯á^.&á_q&.G.&.W 0000C0
0CC48300 0019269A 006A0676 FF0876FF 5F516806 76FFD876 FFFA5689 F846890E ..F½.V•.vÅ.vøhQ_.v..v.j..&....á. 0000E0
878B260A 5EC40000 1047C726 0A5EC401 17E9C846 880006E9 03750000 3DC84689 .Fè=..u.Õ...FàÕ..á^.&úG...á^.&.. 000100
46880099 E9037502 AB870B26 02A9878B 260A5EC4 0012E903 7402A787 0B2602A5 E.&..I.t.Õ..á^.&..`.&..¨.u.Õ...F 000120
0B2602AD 878B260A 5EC41FA5 A5A5A5DA 8E1E0716 F08BE07E 8D02A505 0C5688OA ..V..Ê..~Á.Þ....ÕEEEE.á^.&..Ù.&. 000140
0C5688OA 46880050 E9037502 B3870B26 02B1878B 260A5EC4 0012E903 7402AF87 .£.t.Õ..á^.&..Ÿ.&..°.u.Õ]..F..V. 000160
FFFF9A50 160E4680 CE76FFD0 76FF1FA5 A5A5A50A 8E1E0716 F08BE87E 8D02AD05 .Ù..-Ò.Þ....ÕEEEE..vÅ.vö.F8.P... 000180
006A5016 E0468D02 6A006ACE 76FFD076 FF00001B 639A026A CE76FFD0 76FF0000 ...vÅ.vöj..c....vÅ.vöj.j..FÅ.Pj. 0001A0
87892600 00B80A5E C40000FF FF9ADE76 FFCE76FF D076FF00 00FFFF9A 026A016A j.j.......vÅ.vö.v8.....á^.|..&.. 0001C0
26029987 8B260A5E C4028187 892602B3 87892600 00B80A5E C402AD87 892602AF £.&..Ù.á^.|..&..°.&..Ÿ.á^.&....& 0001E0

Dump of file SATURN:[PCCOMMON.DUMP.DLL]SA-DIFM.DLL;1 on 18-APR-1990 10:50:26.92
File ID (450,15,0)   End of file block 323 / Allocated 324

Virtual block number 139 (0000008B), 512 (0200) bytes

83000017 DD9A006A 0676FF08 76FF0A76 FF0C76FF 5DCA6800 19E90375 029B8708 ....u.Õ..hò].v..v..v..v.j..Ï.... 000000
0E5EC404 0E4683D8 8E18EC88 1E565700 0004C8CB C95F5E1F 0000E900 00B80CC4 á.|..Õ...^_èùà...WV.|š..Å.F..á^. 000020
02A58789 260A5EC4 02578B26 078B26FC 5EC4FE56 89FC4689 FE578B26 FC478B26 &.G=&.W±.F=.V±á^=&..&.W.á^.&..E. 000040
0000B802 AB978926 02A98789 260A5EC4 06578B26 04478B26 FC5EC402 A7978926 &..I.á^=&.G.&.W.á^.&..`.&..¨.|.. 000060
26FC478B 260E5EC4 040E4683 D88E18C5 B81E5657 000004C8 CBC95F5E 1F0000E9 Õ...^_èùà...WV.|é..Å.F..á^.&.G=& 000080
8316AC00 569A5052 0093050C 56880A46 8BFC76FF FE76FFFE 5689FC46 89FE578B .W±.F=.V±.v±.v=.F..V....RP.V.¯.. 0000A0
0E5EC404 0E4683D8 8E1C2088 1E565700 001AC8CB C95F5E1F 0000E900 00B808C4 á.|..Õ...^_èùà...WV.| ..Å.F..á^. 0000C0
E8468965 578B2663 478B2608 5FC4260A 5EC4FE56 89FC4689 FE578B26 FC478B26 &.G=&.W±.F=.V±á^.&á_.&.Gc&.We.FÒ 0000E0
830000FF FF9A006A 0676FF08 76FF0A76 FF0C76FF 5DC968FC 76FFFE76 FFEA5689 .Võ.v±.v=hè].v..v..v̄..v.j....... 000100
A7870B26 02A5878B 260A5EC4 000BE9E6 46880006 E9037500 E67E83E6 468910C4 á..F|.~Ì.u.Õ...FÌÕÅ.á^.&..E.&..I 000120
A5050C56 880A468B 0084E903 7502AB87 0B2602A9 878B260A 5EC40012 E9037402 .t.Õ..á^.&..`.&..¨.u.ÕÇ..F..V..£ 000140
E9037402 AF870B26 02AD878B 260A5EC4 1FA5A5A5 A5DA8E1E 0716F08B EC7E8D02 ..-š.Þ....ÕEEEE.á^.&..Ù.&..£.t.Õ 000160
F47E8D02 AD050C56 880A468B 0032E903 7502B387 0B2602B1 878B260A 5EC40012 ..á^.&..Ÿ.&..°.u.Õ2..F..V..Ù..~¶ 000180
6A016A00 6A5016EC 468D026A 006AE876 FFEA76FF 1FA5A5A5 A5DA8E1E 0716F08B .Þ....ÕEEEE..võ.vÒj.j..Fš.Pj.j.j 0001A0
FC4688IF A5A5A5A5 DA8E1EF0 8802AD8F 8DFE5688 FC46880A 5EC40000 1D989A02 ......á^..F=.V±.¢Ù..Þ..ÕEEEE..F= 0001C0
16EC468D 026A006A E876FFEA 76FF1FA5 A5A5A5DA 8E1E0716 F08BF47E 8DFE5688 .V±.-¶.Þ....ÕEEEE..võ.vÒj.j..Fš. 0001E0

Dump of file SATURN:[PCCOMMON.DUMP.DLL]SA-DIFM.DLL;1 on 18-APR-1990 10:50:26.92
File ID (450,15,0)   End of file block 323 / Allocated 324

Virtual block number 140 (0000008C), 512 (0200) bytes

06468BD8 8E1C65B8 1E565700 0000C8CB C95F5E1F 00001B55 9A026A01 6A006A50 Pj.j.j..U....^_èùà...WV.|e..Å.F. 000000
878B2606 5EC4D88E 1DA9B81E 56570000 00C8CBC9 5F5E1F00 00E90002 0508568B .V....Õ...^_èùÕ...WV.|`..Åá^.&.. 000020
FF681DF4 68D88E1D C6881E56 57000000 C8CBC95F 5E1F0000 E9009197 8B26008F ..&....Õ...ⁿ_èùà...WV.|ó..Åh¶.h. 000040
FF9A006A 786A016A 006A006A 02B76802 F0681E02 6A796AFF FF6818D2 68536AFF .jSh@.h..jyj¯.hÞ.hñ.j.j.j.jxj... 000060
04A2000C 01630203 08800010 1E0F0203 0036CBC9 5F5E1F00 00E91EC4 830000FF ....á.Õ...^_èùó...........c...Å. 000080
00000004 17FD0002 03AE000C 03770203 0C0D0004 18000005 05A2000D 0E920203 ......Å...........w...Ù...»..... 0000A0
00000008 1DEC0002 07AD000D 06140203 08930010 1A890203 0481000C 17860203 ......Ÿ...............Ù...š..... 0000C0
04C4000C 172F0203 07BC000D 01870203 1DA10008 1DF70005 0BA00010 1CAB0203 ..¨.......¥...À.......¥.../...á. 0000E0
0BB30010 07BD0203 0AB4000F 1B2E0203 0C930013 14720203 008B0004 148C0103 ..........r...........Ç...§...•. 000100
0A42000F 1D520203 04D5000C 17300203 0000000D 170C0002 07C8000D 06880203 ......ù...........=...Í...R...B. 000120
02E8000B 03590203 00000010 1C4D0002 183F0008 18D50005 1DBE0008 1DEF0005 ..ÿ.../...Í...7...M.......Y...Ò. 000140
05DB000D 07270203 03E2000C 12340203 07D90000 0EC10203 01810008 0D700203 ..p.......è...1...4...ã...'...Ù. 000160
0563000D 18130203 00000012 1DE70002 0BC40010 163F0203 04E4000C 17480203 ..K...õ...?...á...Ô...........c. 000180
0BD70010 1BAB0203 04F7000C 17590203 037B0008 16060203 01910008 04BE0203 ..ƒ...........(...Y...¥...¨...•. 0001A0
0960000F 18300203 0A69000F 09210203 0579000D 06F40203 0B63000F 18D80203 ..Å...c...¶...y...|...Í...0...m. 0001C0
038A000C 05160203 0BE80010 0CD40203 0AEF000F 1B380203 07FF000D 06360203 ..6.......;...ÿ...å...Ò......... 0001E0
```

```
Dump of file SATURN:[PCCOMMON.DUMP.DLL]SA-DIFM.DLL;1 on 18-APR-1990 10:50:26.92
File ID (450,15,0)   End of file block 323 / Allocated 324

Virtual block number 141 (0000008D), 512 (0200) bytes

 09FB000F 088E0203 0978000F 0DBC0203 05870000 01B00203 0508000C 17700203 ..p.......§.......¥...x........«. 000000
 05950000 07160203 0396000C 013C0203 01340008 14E00203 0494000C 05230203 ..#.......Ä...4...<.............. 000020
 FFFF9A0A 76FF0C76 FF7B77FF 267D77FF 26065EC4 D88EFFFF B81E5657 000000C8 à...WV.¡...Äá^.&.w)&.w(.v..v.... 000040
 E9037500 127E8308 8E0008B8 1E565700 0004C8C8 C95F5E1F 0000E900 00B80000 ..¡..Õ...^_èùà...WV.¡...Ä.~..u.Õ 000060
 57882678 47882606 5EC40011 E9FE5689 FC468979 57882677 47882606 5EC40014 ..á^.&.Gw&.Wy.F•.V±Õ..á^.&.G(&.W 000080
 0000FFFF 9A0A76FF 0C76FF00 6A0E76FF 1076FFFC 76FFFE76 FFFE5689 FC46897D ).F•.V±.v±.v•.v..v.j..v..v...... 0000A0
 88267847 8826065E C4D88E00 35881E56 57000056 C8CBC95F 5E1F0000 E90000B8 ¡..Õ...^_èùàV..WV.¡5..Äá^.&.G(&. 0000C0
 80468000 00FFFF9A 5016F846 8DE076FF E276FF00 00AE46C7 E25689E0 46897D57 W).FÄ.VäûFÛ...vã.vÄ.F½.P......F¯ 0000E0
 00003DAE 46890CC4 83000001 1B9A006A 6777FF26 6977FF26 065EC450 C0685016 .Phâ]á^.&.wi&.wgj.......á..FÛ=.. 000100
 897157B8 266F47B8 26065EC4 C2568CC0 46898046 8D030CE9 AE468800 06E90375 u.Õ...FÛÕ...F¯.Fá.Võá^.&.Go&.Wq. 000120
 830000FF FF9A006A 6777FF26 6977FF26 065EC450 C0685016 C4468DEE 5689EC46 Fã.VŸ.Fá.Phâ]á^.&.wi&.wgj....... 000140
 02F87E83 D6568CD4 4689C446 8D02C4E9 AE468800 06E90375 00003DAE 46890CC4 á..FÛ=..u.Õ...FÛÕá..Fá.Fâ.V•.~½. 000160
 9A5016F0 468D006A 006A006A E076FFE2 76FF02A3 E9037400 FA7E8302 ACE90374 t.Õ¯..-•.t.ÕÈ..vã.vÂj.j.j..Fþ.P. 000180
 F2568BF0 46880000 FFFF9A50 16E4468D 006A016A 006AE076 FFE276FF 00000176 v....vã.vÂj.j.j..FÕ.P......Fþ.V· 0001A0
 4688FE56 89FC4689 EA561BE8 4628F656 88F4468B AC5689AA 4689E656 1BE4462B +FÕ.V¦.F^.V¯.F¶.V-+FÒ.VÕ.F•.V±.F 0001C0
 56890846 89F2568B F0468BF2 5619F046 29AC568B AA468801 20E90375 AC4608AA ^.F¯u.Õ ..F^.V¯)Fþ.V·.Fþ.V·.FÄ.V 0001E0

Dump of file SATURN:[PCCOMMON.DUMP.DLL]SA-DIFM.DLL;1 on 18-APR-1990 10:50:26.92
File ID (450,15,0)   End of file block 323 / Allocated 324

Virtual block number 142 (0000008E), 512 (0200) bytes

 08C48302 6800C59A 50160846 8DC076FF C276FFDE 56890C46 89F6568B F4468BDA Õ.F¶.V-.FÉ.VB.vö.vâ.FÄ.P.é.k..á. 000000
 39003AE9 0374F046 390A568B D8468802 06E9AE46 880006E9 03750000 30AE4689 .FÛ=..u.Õ...FÛÕ...FÄ.VÖ9FÞt.Õ:.9 000020
 6A006A00 1CE90374 F6563900 24E90374 F446390E 56880C46 880032E9 0374F256 V·t.Õ2..FÉ.VB9F¶t.Õ$.9V-t.Õ..j.j 000040
 01AC568B AA468800 8DE90EC4 8302C100 2D9A0676 FF0876FF 5016F046 8D006A00 .j..Fþ.P.v..v..-.è..á.Õ...F^.V¯. 000060
 D676FFDE 56890C46 89EA568B E8468BDA 56890846 89E6568B E4468BE6 5611E446 FÕ.V¦.FÕ.V¦.FÄ.VÖ.FÒ.VÕ.FÉ.VB.v• 000080
 76E9AE46 880006E9 03750000 3DAE4689 08C48303 0600C59A 50160846 8D0476FF .vâ.FÄ.P.é....á..FÛ=..u.Õ...FÛÕv 0000A0
 E84639DE 5688DC46 88002FE9 0374E656 390037E9 0374E446 390A568B D8468801 ..FÄ.VÖ9FÕt.Õ7.9V¦t.Õ/..FÉ.VB9FÒ 0000C0
 2D9A0676 FF0876FF 5016E446 8D016A00 6A006A00 19E90374 EA563900 21E90374 t.Õ!.9Võt.Õ..j.j.j..FÕ.P.v..v..- 0000E0
 F65619F4 4629FE56 8BFC468B 011DE903 75FE460B FC468801 28E90EC4 83035C00 .\..á.Õ(..F•.F±u.Õ...F•.V±)F¶.V- 000100
 468DC076 FFC276FF DE56890C 4689F656 88F4468B DA568908 4689F256 8BF0468B .Fþ.V·.FÄ.VÖ.F¶.V-.FÉ.VB.vö.vã.F 000120
 88084688 00DBE9AE 46880006 E9037500 0030AE46 8908C483 FFFF00C5 9A501608 Ä.P.é....á..FÛ=..u.Õ...FÛÕU..FÄ. 000140
 0024E903 74F44639 DE5688DC 46880032 E90374F2 5639003A E90374F0 46390A56 VÖ9FÞt.Õ:.9V·t.Õ2..FÉ.VB9F¶t.Õ$. 000160
 C483FFFF 002D9A06 76FF0876 FF5016F0 468D006A 006A006A 001CE903 74F65639 9V-t.Õ..j.j.j..Fþ.P.v..v..-....á 000180
 88E84688 DA568908 4689E656 88E4468B EA5611E8 4601FE56 8BFC4688 008DE90E .Õ...F•.V±.FÕ.VÕ.FÕ.V¦.FÄ.VÖ.FÒ. 0001A0
 0030AE46 8908C483 01DB00C5 9A501608 468D0476 FFD676FF DE56890C 4689EA56 VÕ.FÉ.VB.v•.vâ.FÄ.P.é.Û..á..FÛ=. 0001C0
 E90374E6 56390037 E90374E4 46390A56 88084688 004BE9AE 46880006 E9037500 .u.Õ...FÛÕK..FÄ.VÖ9FÕt.Õ7.9V¦t.Õ 0001E0

Dump of file SATURN:[PCCOMMON.DUMP.DLL]SA-DIFM.DLL;1 on 18-APR-1990 10:50:26.92
File ID (450,15,0)   End of file block 323 / Allocated 324

Virtual block number 143 (0000008F), 512 (0200) bytes

 468D016A 006A006A 0019E903 74EA5639 0021E903 74E84639 DE5688DC 4688002F /..FÉ.VB9FÒt.Õ!.9Võt.Õ..j.j.j..F 000000
 000000C8 CBC95F5E 1F0000E9 0000B80E C4830231 00209A06 76FF0876 FF5016E4 õ.P.v..v..-.1..á.¡..Õ...^_èùà... 000020
 C95F5E1F 0000E900 008804C4 8303EC00 8B9A0676 FF0876FF D88E0093 B81E5657 WV.¡...Ä.v..v....ã..á.¡..Õ...^_è 000040
 08C48304 4C00569A 50168446 8D0676FF 0876FFD8 8E0404B8 1E565700 0050C8CB ùàP..WV.¡...Ä.v..v..FÇ.P.V.L..Õ. 000060
 E90375B2 46088046 88825689 80468908 C4830468 018A9A50 16844680 035C681E .h\..FÇ.P...k..á..F¯.Vý.F¯.Fýu.Õ 000080
 04C48304 9F008C9A F0888076 FFB276FF 04C48304 7B008C9A 0C76FF0E 76FF005B [..v..v....(..á..vý.v¯.Þ......á. 0000A0
 AF00109A 0C76FF0E 76FFB076 FFB276FF 002DE900 03E90377 C13B490A 4E88C603 .ó.N.I;èw.Õ..Õ-..vý.v¯.v..v....£ 0000C0
 0E76FFFF 9AE98256 89804689 08C48304 C6018A9A 006A006A 035E681E 08C48304 ..á..h^.j.j....ó..á..F¯.VýÕ...v. 0000E0
 480A4688 0018E900 21E90000 880009E9 03750000 3004C483 04EF008C 9A0C76FF .v....ÿ..á.=..u.Õ..¡..Õ!.Õ...F.H 000100
 C8C8C95F 5E1F0000 E90000B8 0AC483FF FF00E09A 0C76FF0E 76FF5016 B4468D50 P.FÇ.P.v..v..Á....á.¡..Õ...^_èùà 000120
 040E4683 E25689E0 46897D57 88267847 88260A5E C4D88E04 29881E56 57000058 X..WV.¡)..Äá^.&.G(&.W).FÄ.Vã.F.. 000140
 FE578826 FC478826 0E5EC404 0E4683C6 5689C446 89FE5788 26FC4788 260E5EC4 á^.&.G•&.W±.Fá.Vó.F..á^.&.G•&.W± 000160
 88260A5E C4EA5689 E84689FE 578826FC 4788260E 5EC4040E 4683F656 89F44689 .F¶.V-.F..á^.&.G•&.W±.FÒ.Võá^.&. 000180
 026A006A 00000089 9A5016EC 468DE076 FFE276FF FA5689F8 46890857 88260647 G.&.W..F½.Vª.vã.vÂ.Fã.P.¿....j.j. 0001A0
 DF05CC9A EC76FFEE 76FF026A 006A0040 E9037500 08059F06 9C9AEC76 FFEE76FF .vŸ.vã......Âu.Õª.j.j..vŸ.vã.ä.Õ 0001C0
 8D000006 039A5016 C8468D00 6AF076FF F276FFE0 76FFE276 FFF25689 F0468905 ..Fþ.V·.vã.vÂ.v·.vÞj..Fà.P...... 0001E0
```

```
Dump of file SATURN:[PCCOMMON.DUMP.DLL]SA-DIFM.DLL;1 on 18-APR-1990 10:50:26.92
File ID (450,15,0)   End of file block 323 / Allocated 324

Virtual block number 144 (00000090), 512 (0200) bytes

 3405CC9A EC76FFEE 76FF026A 006A0097 E91FA5A5 A5A51F16 1E0716C8 768DAC7E -¯.và.....ÉÉÉÉ.Ö..j.j..vŸ.vš.ä.4 000000
 D8468D00 6A505200 DA830001 20F25688 F04688E0 76FFE276 FFF25689 F0468906 ..FÞ.V·.vã.vÁ.FÞ.V·-...Ö.RPj..FÄ 000020
 6A000001 609A5016 D0468D00 6AF076FF F276FFE0 76FFE276 FF000006 1B9A5016 .P......vã.vÁ.v·.vÞj..FÅ.P.\...j 000040
 026A006A CA5689C8 46890651 05CC9A50 52025613 D046030A 5688D846 88026A00 .j..FÄ.VÖ.FÅ.VØRP.ä.Q..Fà.Vòj.j. 000060
 16087680 AC7E8DCE 5689CC46 89060405 CC9A5052 D0561304 46030E56 880C4688 .FÉ.VB.Få.VøRP.ä.å..Fä.Vö.-¯.vÁ. 000080
 56685016 AC468000 10E90375 75470826 73478826 0A5EC41F A5A5A5A5 1F161E07 ....ÉÉÉÉ.á^.&.Gs&.Guu.Ö...F¯.PhV 0000A0
 77FF2665 77FF26F8 5EC40CC4 83000000 D39A006A 7377FF26 7577FF26 0A5EC45F _á^.&.wu&.wsj..Æ....á.á^½&.we&.w 0000C0
 888C4688 0000FFFF 9A501684 468D006A 5016C846 8D1E6A00 6AC476FF C676FF63 c.vó.váj.j..Fà.Pj..FÇ.P......F¥. 0000E0
 9A06E208 BD9A2266 1E8D0438 0828 9AA8 5E8DA846 89AA5689 86561BB4 4628BE56 Vƒ+FÇ.VÑ.V˙.F´.^´.+.;...f".§.ã.. 000100
 9AA85E8D A84689AA 5689BA56 1BB8462B C25688C0 468BE656 89E44689 07020A12 .....Fõ.Vl.Fà.Vô+F|.V¤.V˙.F´.^´. 000120
 FFE676FF 026A006A FE5689FC 46890725 0A129A07 1008BD9A 22661E8D 070B082B +.....f".§......%..F=.V±j.j..vl. 000140
 FF026A00 6A025C89 260C8926 F476C40A 1BC82BCA 5E8BC84E 88074805 CC9AE476 võ.ä.H..Nà.^ò+à.Öá√¶&..&.\.j.j.. 000160
 468BF45E C40A5789 26084789 26F45EC4 CA5613C8 46030589 05CC9AE4 76FFE676 vl.võ.ä....Fà.Vòá^¶&.G.&.W.á^¶.F 000180
 26044789 26FE561B FC4628CE 5688CC46 8BF45EC4 0E578926 0C478926 CE5688CC ä.Vö&.G.&.W.á^¶.Fä.Vö+F=.V±&.G.& 0001A0
 0507B81E 56570000 1AC8CBC9 5F5E1F00 00E90000 88000007 C726E85E C4065789 .W.á^Ò&ú...|..Ö...^_èùà...WV.|.. 0001C0
 46897957 88267747 8826085E C4EE5689 EC46897D 5788267B 47882608 5EC4D88E .Äá^.&.G(&.W).F$.VŸã^.&.Gw&.Wy.F 0001E0

Dump of file SATURN:[PCCOMMON.DUMP.DLL]SA-DIFM.DLL;1 on 18-APR-1990 10:50:26.92
File ID (450,15,0)   End of file block 323 / Allocated 324

Virtual block number 145 (00000091), 512 (0200) bytes

 7500003D EA468900 0005789A 5016F846 8DEC76FF EE76FF00 00EA46C7 E85689E6 l.VÒúFõ...vŸ.vš.F½.P.x....Fõ=..u 000000
 35E90377 01107E83 0009E903 7E0243E9 037D0012 7E830252 E9EA4688 0006E903 .Õ...FõõR..-..).ÕC.~.Õ...~..w.Õ5 000020
 009A5016 FC468D06 76FFF046 89F24689 000088F6 5689F446 890E5688 0C468802 ..F..V..F¶.V-|...F·.FÞ.v..F=.P.. 000040
 C40033E9 0374F646 08F44688 0208E9EA 46880006 E9037500 003DEA46 89000009 ....Fõ=..u.Õ...FõÕ...F¶.F-t.Õ3.á 000060
 06E90375 00003DEA 46890000 09CA9AFC 76FFFE76 FF7F77FF 260081B7 FF26085E ^.&.ñ..&.w..v±.v=.ò....Fõ=..u.Õ. 000080
 4683F476 FFF676FF EC76FFEE 76FF0032 E900F656 8301F446 830105E9 EA468800 ..FõÕ(..F¶..V-.Õ2..vŸ.vš.v-.v¶.F 0000A0
 46880006 E9037500 003DEA46 89000009 2A9AFC76 FFFE76FF 006A00F6 568301F4 ¶..V-.j..v±.v=.*....Fõ=..u.Õ...F 0000C0
 FC76FFFE 76FF006A 00F25683 01F04683 F076FFF2 76FFE676 FFE876FF 0198E9EA õÕ...vÕ.vl.v·.vÞ.FÞ..V·.j..v±.v= 0000E0
 83000120 12568810 46880166 E9EA4688 0006E903 7500003D EA468900 000A219A .l....Fõ=..u.Õ...FõÕf..F..V.-... 000100
 9A5016FC 46800676 FF0085E9 0377F046 380008E9 037E0092 E9037DF2 5638000A Ö.;V·).Õ..-.Õ..;FÞw.Õ...v..F=.P. 000120
 76FFF676 FFEC76FF EE76FF01 27E9EA46 880006E9 03750000 3DEA4689 00000985 .....Fõ=..u.Õ...FõÕ'..vŸ.v..v-.v 000140
 FF00FDE9 EA468800 06E90375 00003DEA 46890000 09F79AFC 76FFFE76 FF006AF4 ¶j..v±.v=.¥....Fõ=..u.Õ...F.~.. 000160
 03750000 3DEA4689 0000FFFF 9AFC76FF FE76FF00 6AF076FF F276FFE6 76FFE876 vÕ.vl.v·.vÞj..v±.v=......Fõ=..u. 000180
 800676FF FF5AE900 F2568301 F0468300 F6568301 F4468300 D3E9EA46 880006E9 Õ...FõÕÆ..F¶..V-..FÞ..V·.ÕZ..v.. 0001A0
 FA5688F8 468B00A2 E9EA4688 0006E903 7500003D EA468900 00FFFF9A 5016FC46 F=.P......Fõ=..u.Õ...FõÕÅ..F½.V* 0001C0
 FF260085 B7FF2608 5EC4002C E90374F6 56380034 E90374F4 4638000A 8300012D -...Õ.;F¶t.Õ4.;V-t.Õ,.á^.&.ñ..&. 0001E0

Dump of file SATURN:[PCCOMMON.DUMP.DLL]SA-DIFM.DLL;1 on 18-APR-1990 10:50:26.92
File ID (450,15,0)   End of file block 323 / Allocated 324

Virtual block number 146 (00000092), 512 (0200) bytes

 E9005DE9 EA468800 06E90375 00003DEA 46890000 FFFF9AFC 76FFFE76 FF0083B7 ñ...v±.v=......Fõ=..u.Õ...FõÕ).Õ 000000
 0030EA46 89000005 BB9AFC76 FFFE76FF 006AF476 FFF676FF EC76FFEE 76FF002A *..vŸ.vš.v-.v¶j..v±.v=.£....Fõ=. 000020
 FC76FFFE 76FF006A F076FFF2 76FFE676 FFE876FF 0030E9EA 46880006 E9037500 .u.Õ...FõÕ0..vÕ.vl.v·.vÞj..v±.v= 000040
 C95F5E1F 0000E900 00880006 E9EA4688 0006E903 7500003D EA468900 00007C9A .|....Fõ=..u.Õ...FõÕ..|..Õ...^_è 000060
 76FFEA56 89E84689 79578826 77478826 065EC4D8 8E079E88 1E565700 001EC8C8 ùà...WV.|...Äá^.&.Gw&.Wy.FÒ.VÕ¯.v 000080
 880E4688 E876FFEA 76FF0000 0A929A50 16F8468D 006A0E76 FF1076FF E876FFEA õ.vÒ.v..v.j..F½.P......võ.vÒ.F.. 0000A0
 5FC42606 5FC42606 5EC40000 088F9A50 16F0468D 006A5052 00028300 01051056 V.....●.RPj..FÞ.P.....á^.&á_.&á_ 0000C0
 5689EC46 8932578B 2630478B 26695FC4 26065FC4 26065EC4 E246891C 47882669 i&.G..Fãá^.&á_.&á_i&.GÒ&.W2¯.F$.V¯ 0000E0
 03750012 7E83E656 89E44689 36578826 34478826 695FC426 065FC426 065EC4EE Ÿá^.&á_.&á_i&¯.G4&¯.W6.FÕ.Vl.-..u. 000100
 037D0017 E9037E06 573926EE 5688EC46 880A5EC4 0029E903 7500E27E 830085E9 Õç..-ã.u.Õ).á^..F$.VŸ&9W.-.Õ..). 000120
 06578826 04478826 0A5EC400 08E9EE56 88EC4688 0009E903 72044739 260009E9 Õ..&9G.r.Õ...F$.VŸÕ..á^.&.G.&.W. 000140
 573926E6 5688E446 880A5EC4 0029E903 7500E27E 83065789 26044789 260A5EC4 á^.&.G.&.W..-ã.u.Õ).á^..FÕ.Vl&9W 000160
 0A5EC400 0BE9E656 88E44688 0009E903 77044739 260009E9 037E0017 E9037D06 .).Õ..-.Õ..&9G.w.Õ...FÕ.VlÕ..á^. 000180
 46890657 8B260447 8B260A5E C4065789 26044789 260A5EC4 06578826 04478826 &.G.&.W.á^.&.G.&.W.á^.&.G.&.W..F 0001A0
 28E90375 00E27E83 00AAE9F6 5689F446 89065788 26044788 260A5EC4 FE5689FC =.V±á^.&.G.&.W..F¶.V-Õ¯..-ã.u.Õ( 0001C0
 0009E903 72073926 0008E903 7D0016E9 037E0257 3926EE56 88EC4688 0A5EC400 .á^..F$.VŸ&9W.-.Õ..).Õ..&9.r.Õ.. 0001E0
```

```
Dump of file SATURN:[PCCOMMON.DUMP.DLL]SA-DIFM.DLL;1 on 18-APR-1990 10:50:26.92
File ID (450,15,0)   End of file block 323 / Allocated 324

Virtual block number 147 (00000093), 512 (0200) bytes

 E27E8302 57892607 89260A5E C402578B 26078826 0A5EC400 0AE9EE56 88EC4688 .F&.VŸÕ..á^.&..&.W.á^.&..&.W..-ã 000000
 07392600 08E9037E 0016E903 7D025739 26E65688 E44688OA 5EC40028 E9037500 .u.Õ(.á^..FÕ.V|&9W.).Õ..-.Õ..&9. 000020
 89260789 260A5EC4 02578826 0788260A 5EC4000A E9E65688 E4468800 09E90377 w.Õ...FÕ.VlÕ..á^.&..&.W.á^.&..&. 000040
 89F04689 02578826 0788260A 5EC4FA56 89F84689 02578826 0788260A 5EC40257 W.á^.&..&.W..F½.V°á^.&..&.W..Fþ. 000060
 E876FFEA 76FF0000 0C769A50 16F8468D 006A0E76 FF1076FF E876FFEA 76FFF256 V·.vÕ.vÒ.v..v.j..F½.P.v....vÕ.vÒ 000080
 0000E900 00880000 08C19A50 16F0468D 006A5052 00028300 01051056 880E4688 .F..V.....@.RPj..Fþ.P.è...¡..Õ.. 0000A0
 FE578826 FC478826 0E5EC404 0E4683D8 8E0A4988 1E565700 0040C8C8 C95F5E1F .^ èùàâ..WV.¡|..Ä.F..á^.&.G=&.W± 0000C0
 88260647 88260A5E C4CA5689 C8468961 5788265F 4788260A 5EC4F656 89F44689 .F¶.V-á^.&.G_&.Wa.Fà.Vòá^.&.G.&. 0000E0
 7B478826 0A5EC4C6 5689C446 89065788 26044788 26F85EC4 FA5689F8 46890857 W..F½.V°á^½&.G.&.W..Fá.Vóá^.&.G( 000100
 EC468DCC 76FFCE76 FF000007 C726F45E C40000C0 46C7CE56 89CC4689 7D578826 &.W).Fë.VöúFá..á^¶&ú....vö.vä.F$ 000120
 FF056A50 16D0468D 01E9E9C0 46880006 E9037500 003DC046 89000007 D59A5016 .P.(....Fâ=..u.Õ...FâÕÕ..FÅ.Pj.. 000140
 03750000 30C04689 12C48300 00068F9A 006AC876 FFCA76FF 271168C4 76FFC676 vó.váh.'.vò.vàj.......á..Fâ=..u. 000160
 C4000EE9 03750256 390008E9 0374D046 39EE5688 EC468801 88E9C046 880006E9 Õ...FâÕ¡..F$.VŸ9FÅt.Õ..9V@u.Õ..á 000180
 5016F046 8D056AC8 76FFCA76 FFC476FF C676FF01 94E90000 88000107 C726F45E ^¶&ú...¡..Õ...vó.vá.vò.vàj..Fþ.P 0001A0
 89FC4689 F25688F0 46880168 E9C04688 0006E903 7500003D C0468900 00FFFF9A ......Fâ=..u.Õ...FâÕk..Fþ.V·.F=. 0001C0
 FF260277 FF26FC5E C4C476FF C676FF01 39E90375 02470826 078826FC 5EC4FE56 V±á^=&..&.G.u.Õ9..vó.váá^=&.w.&. 0001E0

Dump of file SATURN:[PCCOMMON.DUMP.DLL]SA-DIFM.DLL;1 on 18-APR-1990 10:50:26.92
File ID (450,15,0)   End of file block 323 / Allocated 324

Virtual block number 148 (00000094), 512 (0200) bytes

 76FFC676 FF010FE9 0003E903 7500003D C0468900 000DF39A 5016C246 8D026A37 7j..Fõ.P.µ....Fâ=..u.Õ..Õ...vó.v 000000
 E9037500 0030C046 890000FF FF9A5016 DC468D01 6A37FF26 0277FF26 FC5EC4C4 áá^=&.w.&.7j..FÉ.P......Fâ=..u.Õ 000020
 9A5016E4 468D7F77 FF260081 87FF260A 5EC40027 E9037400 C27E8300 E5E90003 ..Õl..-ó.t.Õ'.á^.&.ñ..&.w..FÕ.P. 000040
 28E90374 C2463848 EC468800 5FE90088 E90003E9 03750000 30C04689 00000E54 T....Fâ=..u.Õ..Õ¡.Õ_..F&H;Fõt.Õ( 000060
 03750000 30C04689 00000852 9A5016E4 468D0083 87FF2600 8587FF26 0A5EC400 .á^.&.ñ..&.ñ...FÕ.P.R....Fâ=..u. 000080
 16E4468D 006A5052 99C24688 7877FF26 7D77FF26 0A5EC400 28E90084 E90003E9 Õ..Õ..Õ+.á^.&.w)&.w(.Fõ.RPj..FÕ. 0000A0
 D65689D4 4689DE56 88DC4688 0056E900 03E90375 000030C0 46890000 0A729A50 P.r....Fâ=..u.Õ..ÕV..FÉ.V8.Fâ.V¤ 0000C0
 E90374E6 5639001E E90374E4 46390656 88D44688 DA568908 4689E256 88E04688 .FÅ.Vã.FÄ.VÕ.Fâ.V¤9FÕt.Õ..9V|t.Õ 0000E0
 000107C7 26F45EC4 0008E903 75EA5639 0008E903 74E84639 DA5688D8 46880016 ...FÄ.VÕ9FÕt.Õ..9Võu.Õ..á^¶&ú... 000100
 00E9C046 880000FF FF9AF076 FFF276FF C476FFC6 76FFFE88 E904FC46 830007E9 Õ...F=.Õ|±.vó.vá.v·.vþ......FâÕ. 000120
 F8468908 57882606 4788260A 5EC4D88E 0C8D881E 56570000 6CC8C8C9 5F5E1F00 ..^ èùàl..WV.¡...Ãá^.&.G.&.W..F½ 000140
 897D5788 26784788 260A5EC4 805689AE 46890657 88260447 8826F85E C4FA5689 .V°ã^½&.G.&.W..FÜ.V¯á^.&.G(&.W). 000160
 C7944689 96468900 008BC456 89C24689 61578826 5F478826 0A5EC4DC 56890A46 FÕ.VÉá^.&.G_&.Wa.Fõ.Vá¡...F..F.ú 000180
 830000FF FF9A006A 0676FF08 76FF0A76 FF0C76FF 5E9F6850 16AC468D 00009846 F....F¯.Ph.^.v..v..v..v.j....... 0001A0
 C4830FDE 00009AF8 76FFFA76 FF1E6A05 AEE90000 880006E9 037400AC 7E8310C4 á..-¯.t.Õ..¡..ÕÜ.j..v°.v½...8..á 0001C0
 056AC276 FFC476FF AE76FF80 76FF058D E9984688 0006E903 75000030 98468906 ..F.=..u.Õ...F.Õ...v¯.vÜ.vá.vój. 0001E0

Dump of file SATURN:[PCCOMMON.DUMP.DLL]SA-DIFM.DLL;1 on 18-APR-1990 10:50:26.92
File ID (450,15,0)   End of file block 323 / Allocated 324

Virtual block number 149 (00000095), 512 (0200) bytes

 10200064 9AF876FF FA76FF00 14E90375 00003098 46890000 0D819A50 16EC468D .F&.P......F.=..u.Õ...v°.v½.d.·. 000000
 75024708 26078826 FC5EC4FE 5689FC46 89EE5688 EC468805 56E99846 8804C483 .á..F.ÕV..F$.VŸ.F=.V±á^=&..&.G.u 000020
 75000030 98468900 00FFFF9A 37FF2602 77FF26FC 5EC4AE76 FF8076FF 004CE903 .ÕL..v¯.vÜá^=&.w.&.7......F.=..u 000040
 5D9AEC76 FFEE76FF AE76FF80 76FF04C4 83108A00 649AF876 FFFA76FF 0025E903 .Õ%..v°.v½.d....á..v¯.vÜ.vŸ.v&.] 000060
 000EF79A EC76FFEE 76FFAE76 FF8076FF FFA5E904 FC468304 F6E99846 88000010 ....F.Õ-..F=.ÕE..v¯.vÜ.vŸ.v&.%.. 000080
 14E90375 00003098 46890000 00039A50 16E8468D 7877FF26 7D77FF26 0A5EC400 .á^.&.w)&.w(.FÒ.P......F.=..u.Õ. 0000A0
 0A5EC450 C0685016 9C468D04 AAE99846 8804C483 10C60064 9AF876FF FA76FF00 ..v°.v½.d.ó..á..F.Õ`..F..Phâ]á^. 0000C0
 FA76FF00 14E90375 00003098 46890CC4 83000012 129A006A 6F77FF26 7177FF26 &.wq&.woj.......á..F.=..u.Õ...v° 0000E0
 DE468D7F 77FF2600 81B7FF26 0A5EC404 6EE99846 8804C483 10FB0064 9AF876FF .v½.d.«..á..F.Õn.á^.&.ñ..&.w..F8 000100
 04C48311 2C00649A F876FFFA 76FF0014 E9037500 003D9846 89000012 4B9A5016 .P.K....F.=..u.Õ...v°.v½.d.,..á. 000120
 03750000 30984689 0000FFFF 9A5016C6 468D206A AE76FFB0 76FF0439 E9984688 .F.Õ9..v¯.vÜj .Fó.P......F.=..u. 000140
 F04689E0 56880E46 880408E9 98468804 C483117B 00649AF8 76FFFA76 FF0014E9 Õ...v°.v½.d.(..á..F.Õ...F8.VÅ.Fþ 000160
 F0468D01 6AC676FF C876FFAE 76FFB076 FFF65689 F44689E4 5688E246 88F25689 .V·.Fã.VÕ.F¶.V-.v¯.vÜ.và.vój..Fþ 000180
 04C48311 8700649A F876FFFA 76FF0014 E9037500 003D9846 89000011 9F9A5016 .P......F.=..u.Õ...v°.v½.d.ñ..á. 0001A0
 FF9A5016 9A468D02 6AC676FF C876FFAE 76FFB076 FF00009A 46C70389 E9984688 .F.Õ¿.úF....v¯.vÜ.và.vój..F..P.. 0001C0
 E9984688 04C48311 F100649A F876FFFA 76FF0014 E9037500 003D9846 890000FF ....F.=..u.Õ...v°.v½.d.þ..á..F.Õ 0001E0
```

Dump of file SATURN:[PCCOMMON.DUMP.DLL]SA-DIFM.DLL;1 on 18-APR-1990 10:50:26.92
File ID (450,15,0)   End of file block 323 / Allocated 324

Virtual block number 150 (00000096), 512 (0200) bytes

```
98468900 00FFFF9A 056AC276 FFC476FF 046AC676 FFC876FF AE76FFB0 76FF037D )..v¯.vÛ.và.vój..vá.vôj.......F. 000000
16B2468D 0343E998 468B04C4 83122D00 649AF876 FFFA76FF 0014E903 7500003D =..u.Õ...v'.v½.d.-..á..F.ÕC..Fý. 000020
7500003D 9846890C C4830000 00319A00 6A6F77FF 267177FF 260A5EC4 5DC06850 Phà]á^.&.wq&.woj..1....á..F.=..u 000040
00858 7FF 260A5EC4 0307E998 468B04C4 83126300 649AF876 FFFA76FF 0014E903 .Õ...v'.v½.d.c..á..F.Õ..á^.&.ñ.. 000060
F876FFFA 76FF0014 E9037500 00309846 8900000E 209A5016 DE468D00 83B7FF26 &.ñ...FB.P. ....F.=..u.Õ...v'.v½ 000080
000013C7 9A5016C6 468D206A AE76FFB0 76FF02D1 E998468B 04C48303 9600649A .d....á..F.Õ1..v¯.vÛj .Fó.P.ú... 0000A0
8B02A0E9 98468804 C48312E3 00649AF8 76FFFA76 FF0014E9 03750000 3D984689 .F.=..u.Õ...v'.v½.d.D..á..F.Õ... 0000C0
C876FFAE 76FFB076 FFF65689 F44689E4 568BE246 8BF25689 F04689E0 568BDE46 FB.VÅ.Fb.V·.Fã.VÕ.F¶.V-.v¯.vÛ.và 0000E0
F876FFFA 76FF0014 E9037500 00309846 89000013 099A5016 F0468D01 6AC676FF .vój..Fb.P......F.=..u.Õ...v'.v½ 000100
76FFC876 FFAE76FF B076FF9A 468948E8 468B0251 E998468B 04C48313 2100649A .d.l..á..F.ÕQ..FÒH.F..v¯.vÛ.và.v 000120
649AF876 FFFA76FF 0014E903 7500003D 98468900 0014169A 50169A46 8D026AC6 ój..F..P......F.=..u.Õ...v'.v½.d 000140
C276FFC4 76FF046A C676FFC8 76FFAE76 FFB076FF 0213E998 468B04C4 83135B00 .[..á..F.Õ...v¯.vÛ.và.vój..vá.vô 000160
04C48313 AE00649A F876FFFA 76FF0014 E9037500 003D9846 89000014 879A056A j.......F.=..u.Õ...v'.v½.d.Û..á. 000180
0A5EC401 30E9037F 9A463B48 E84688 9A 46FF0003 E900019A 46C701D9 E998468B .F.Õ1.úF...Õ...F..FÒH;F...ÕO.á^. 0001A0
00003D98 46890000 0E829A50 16DE4680 006A5052 999A468B 7B77FF26 7D77FF26 &.w)&.w(.F..RPj..FB.P......F.=.. 0001C0
6AAE76FF B076FF01 86E99846 8B04C4B3 130F0064 9AF876FF FA76FF00 14E90375 u.Õ...v'.v½.d.Õ..á..F.Õ...v¯.vÛj 0001E0
```

Dump of file SATURN:[PCCOMMON.DUMP.DLL]SA-DIFM.DLL;1 on 18-APR-1990 10:50:26.92
File ID (450,15,0)  . End of file block 323 / Allocated 324

Virtual block number 151 (00000097), 512 (0200) bytes

```
2E00649A F876FFFA 76FF0014 E9037500 003D9846 89000011 149A5016 C6468D20  .Fó.P......F.=..u.Õ...v'.v½.d.. 000000
89F44689 E4568BE2 468BF256 89F04689 E0568BDE 468B0155 E998468B 04C48314 ..á..F.ÕU..FB.VÅ.Fb.V·.Fã.VÕ.F¶. 000020
00003D98 46890000 144D9A50 16F0468D 016AC676 FFC876FF AE76FFB0 76FFF656 V-.v¯.vÛ.và.vój..Fb.P.M....F.=.. 000040
FFAE76FF B076FF01 06E99846 8B04C483 14650064 9AF876FF FA76FF00 14E90375 u.Õ...v'.v½.d.e..á..F.Õ...v¯.vÛ. 000060
FFFA76FF 0014E903 7500003D 98468900 0011639A 50169A46 8D026AC6 76FFC876 và.vój..F..P.c....F.=..u.Õ...v'. 000080
76FF046A C676FFC8 76FFAE76 FFB076FF 00CFE998 468B04C4 83149F00 649AF876 v½.d....á..F.Õü..v¯.vÛ.và.vój..v 0000A0
B600649A F876FFFA 76FF0014 E9037500 003D9846 89000011 D99A056A C276FFC4 á.vôj..1....F.=..u.Õ...v'.v½.d.Ñ 0000C0
00309846 8904C483 0F9C0064 9AF876FF FA76FFFE C1E90095 E998468B 04C48314 ..á..F.Õ..Õè±.v'.v½.d....á..F.=. 0000E0
52001405 0C568B0A 468B5016 CA468D50 16E6468D 0073E998 468B0006 E9037500 .u.Õ...F.Õs..Fl.P.Fò.P.F..V....R 000100
00003D98 468918C4 8300000F 7B9A006A 0676FF08 76FF0A76 FF0C76FF 5E996850 Ph.^.v..v..v..v.j..{....á..F.=.. 000120
006A7377 FF267577 FF260A5E C45F5168 5016CA46 8D0034E9 98468B00 06E90375 u.Õ...F.Õ4..Fò.PhQ_á^.&.wu&.wsj. 000140
1F0000E9 00008800 06E99846 8B0006E9 03750000 3D984689 0CC48300 0010AB9A .¨....á..F.=..u.Õ..F.Õ..¡..Õ... 000160
FC478B26 0E5EC404 0E468300 00E646C7 D88E0F0E B81E5657 00001AC8 CBC95F5E ^_èùà...WV.¡...ÄúFl...F..á^.&.G• 000180
8B26FC5E C4FE5689 FC468908 578B2606 478B260A 5EC4FA56 89F84689 FE578B26 &¯W±.F½.V'á^.&.G.&.W..F=.V±á^•&. 0001A0
EE76FFEE 5689EC46 8965578B 2663478B 26FC5EC4 F25689F0 46896B57 8B266947 Gi&.Wk.Fb.V·á^•&.Gc&.We.Fš.VŸ.vŸ 0001C0
468B0006 E9037500 003DE646 890000FF FF9A5052 0077050C 568B0A46 8BEC76FF .vš.F..V..w.RP......Fl=..u.Õ...F 0001E0
```

Dump of file SATURN:[PCCOMMON.DUMP.DLL]SA-DIFM.DLL;1 on 18-APR-1990 10:50:26.92
File ID (450,15,0)   End of file block 323 / Allocated 324

Virtual block number 152 (00000098), 512 (0200) bytes

```
00003DE6 46890000 FFFF9A06 76FF0876 FF7777FF 267977FF 260A5EC4 0151E9E6 lõQ.á^.&.wy&.ww.v..v.......Fl=.. 000000
0676FF08 76FF5DCE 68F876FF FA76FF00 010E47C7 260A5EC4 010CE900 03E90375 u.Õ..Õ..á^.&úG....v'.v½hö].v..v. 000020
267977FF 260A5EC4 000CE900 03E90375 00003DE6 46890CC4 83000015 219A006A j..l....á..Fl=..u.Õ..ÕÉ.á^.&.wy& 000040
0001F446 C70089E9 0003E903 7500003D E6468900 0010729A 5016E846 8D7777FF .ww.FÒ.P.r....Fl=..u.Õ..Õ¿.úF¶.. 000060
7DF6563B 00DA8300 012DEA56 8BE8468B 00F65683 01F44683 0008E900 00F646C7 úF-..Õ...F¶..V-..FÒ.VÕ-...Õ.;V-) 000080
FFF676FF 7777FF26 7977FF26 0A5EC400 29E90377 F4463B00 08E9037E 0036E903 .Õ6.-.Õ..;F¶w.Õ).á^.&.wy&.ww.v-. 0000A0
77FF260A 5EC4FFAE E9005DE9 0003E903 7500003D E6468900 00FFFF9A 006AF476 v¶j.......Fl=..u.Õ..Õ].ÕÛ.á^.&.w 0000C0
03E90375 00003DE6 46890000 160C9AF8 76FFFA76 FF006A00 6A006A77 77FF2679 y&.wwj.j.j..v'.v½.É....Fl=..u.Õ. 0000E0
00000C56 9AF876FF FA76FF00 6A016A00 6A7777FF 267977FF 260A5EC4 0030E900 .ÕÛ.á^.&.wy&.wwj.j.j..v'.v½.V... 000100
0A5EC400 000E47C7 260A5EC4 0021E900 00B80006 E90003E9 03750000 3DE64689 .Fl=..u.Õ..Õ..¡..Õ].á^.&úG...á^. 000120
56570000 4CC8CBC9 5F5E1F00 00E9E646 880000FF FF9A016A 7777FF26 7977FF26 &.wy&.wwj.......FlÕ...^_èùàL..WV 000140
E65689E4 4689FE57 8B26FC47 8B260E5E C4040E46 830000B4 46C7D88E 154CB81E .¡L..ÄúFÇ...F..á^.&.G•&¯W±.FÕ.Vl 000160
FC478B26 0E5EC404 0E468306 5689D446 89FE578B 26FC478B 260E5EC4 040E4683 .F..á^.&.G•&.W±.Fá.V•.F..á^.&.G• 000180
8B26F45E C4F65689 F4468908 578B2606 478B260A 5EC4D256 89D04689 FE578B26 &.W±.FÅ.V•á^.&.G.&.W..F¶.V-á^¶&. 0001A0
D45EC48B 56898646 8965578B 2663478B 26F45EC4 DA5689D8 46896857 8B266947 Gi&.Wk.FÅ.VÕá^¶&.Gc&.We.FÑ.V¡á^á 0001C0
5EC4F056 89EE4689 7957 8B26 77478B26 0A5EC4E2 5689E046 8902578B 26078B26 &..&.W..FÅ.Vãá^.&.Gw&.Wy.FŸ.Vbá^ 0001E0
```

```
Dump of file SATURN:[PCCOMMON.DUMP.DLL]SA-DIFM.DLL;1 on 18-APR-1990 10:50:26.92
File ID (450,15,0)   End of file block 323 / Allocated 324

Virtual block number 153 (00000099), 512 (0200) bytes

 5016BA46 8DE476FF E676FFCC 76FFCE76 FFCE5689 CC46897D 578B267B 478B260A .&.G(&.W).Fä.Vö.vö.vä.vl.vð.Fo.P 000000
 75000030 B4468900 00FFFF9A 5016F846 8D5016C8 468D5016 EC468D50 16C4468D .Fá.P.F$.P.Fà.P.F½.P......FÇ=..u 000020
 8300012D E2568BE0 468BEE76 FFF076FF 01B1E903 7500BA7E 830359E9 0003E903 .Õ..ÕY..~¤.u.ÕÝ..vÞ.vÝ.FÅ.Vâ-... 000040
 468B0322 E90003E9 03750000 3DB44689 000019FE 9A50168C 468D006A 5052000A Õ.RPj..F¥.P.±....FÇ=..u.Õ..Õ"..F 000060
 FA5E1BF8 4E2BBE5E 8BBC4E8B 04C48318 6902929A 5052FE56 1BFC462B C2568BC0 å.Vö+F=.V±RP...í..á..N¥.^ƒ+N½.^ª 000080
 09E90377 C63B0007 E9037E00 15E9037D D73B04C4 8318A702 929AFA8B F08B5153 SQ.Þ.ª...Ï..á.;=).Õ..~.Õ..;ów.Õ. 0000A0
 1BF8462B BE568BBC 468BFA56 89F84689 BE568BBC 46880006 E9FA568B F8468B00 ..F½.VªÕ...F¥.Vƒ.F½.Vª.F¥.Vƒ+F½. 0000C0
 929AFA8B F08B5153 FE5E1BFC 4E2BC25E 8BC04E8B 04C48318 C102929A 5052FA56 VªRP...è..á..Nâ.^ö+N=.^±SQ.Þ.ª.. 0000E0
 E9FE568B FC468B00 09E90377 C63B0007 E9037E00 15E9037D D73B04C4 831A1802 ....á.;=).Õ..~.Õ..;ów.Õ...F=.V±Õ 000100
 76FF0C76 FF5016F8 468DE076 FFE276FF 016AFE56 89FC4689 C2568BC0 46880006 ...Få.Vö.F=.V±j..vä.vÅ.F½.P.v..v 000120
 88262447 8826085E C40249E9 0003E903 75000030 B446890E C4830411 002D9A0A ..-....á..FÇ=..u.Õ..Õl.á^Å&.G$&. 000140
 76FFEE76 FFF076FF CC76FFCE 76FFF246 891A478B 26D85EC4 DE5689DC 46892657 W&.FÉ.Vßá^Å&.G..F·.vö.vä.vÞ.vÝ.v 000160
 0003E903 75000030 B4468900 00FFFF9A EC76FFF2 76FFC876 FFCA76FF DC76FFDE ß.vÉ.vò.và.v·.v$......FÇ=..u.Õ.. 000180
 0006E903 75000030 B4468900 00170B9A 016A7777 FF267977 FF260A5E C401FDE9 Õ«.á^.&.wy&.wwj.......FÇ=..u.Õ.. 0001A0
 890CC483 000014F3 9A006A06 76FF0876 FF0A76FF 0C76FF5D D36801FB E9B4468B .FÇÕ«.hÆ].v..v..v..v.j..µ....á.. 0001C0
 99E90001 07C72600 5EC40000 0E47C726 0A5EC401 B3E90003 E9037500 003DB446 FÇ=..u.Õ..Õª.á^.&úG...á^Å&ú...Õ. 0001E0

Dump of file SATURN:[PCCOMMON.DUMP.DLL]SA-DIFM.DLL;1 on 18-APR-1990 10:50:26.92
File ID (450,15,0)   End of file block 323 / Allocated 324

Virtual block number 154 (0000009A), 512 (0200) bytes

 E90003E9 03750000 3DB44689 08C48300 0016039A 006A0676 FF0876FF 5DCA6801 .hò].v..v.j.......á..FÇ=..u.Õ..Õ 000000
 13969A50 16BC468D 006A5052 000A8300 012DE256 8BE0468B EE76FFF0 76FF017E ~..vÞ.vÝ.FÅ.Vâ-...Õ.RPj..F¥.P... 000020
 BC4E8B04 C4831A36 02929A50 5206571B 2604472B 26E45EC4 C2568BC0 46880000 ...Få.Vöá^Õ&+G.&.W.RP...ó..á..N¥ 000040
 E9037DD7 3B04C483 06DD0292 9AFA8BF0 8B515302 5C1B260C 2B26E476 C48E5E8B .^ƒávÕ&+.&.\.SQ.Þ.ª...Ï..á.;=).Õ 000060
 568BBC46 8B0006E9 0257B826 078B26E4 5EC4000D E90377C6 3B0007E9 037E0019 ..~.Õ..;ów.Õ..á^Õ&..&.W.Õ...F¥.V 000080
 02929A50 5202571B 26072B26 E45EC48E 568BBC46 8B025789 26078926 E45EC48E ƒá^Õ&..&.W..F¥.Vƒá^Õ&+.&.W.RP... 0000A0
 4F02929A FA8BF08B 5153065C 1B26044C 2B26E476 C4C25E8B C04E8B04 C4831A9F ...á..Ná.^óávÕ&+L.&.\.SQ.Þ.ª...O 0000C0
 8B260447 8B26E45E C4000EE9 0377C63B 0007E903 7E001AE9 037D073B 04C48318 ..á.;=).Õ..~.Õ..;ów.Õ..á^Õ&.G.&. 0000E0
 76FFE076 FFE276FF 016A0657 89260447 8926E45E C4C2568B C0468B00 06E90657 W.Õ...Få.Vöá^Õ&.G.&.W.j..vä.vÅ.v 000100
 19CD9A00 6A0676FF 0876FF5D CA680EC4 83190400 2D9A0A76 FF0C76FF E476FFE6 l.vð.v..v..-....á.hò].v..v.j..ë. 000120
 76FFF076 FF00E256 8301E046 83004DE9 0003E903 75000030 B4468908 C4830000 ...á..FÇ=..u.Õ..ÕM..FÅ..Vã..vÞ.v 000140
 E90003E9 03750000 3DB44689 00000954 9AE476FF E676FF00 6AE076FF E276FFEE Ý.vã.vÅj..vl.vð.T....FÇ=..u.Õ..Õ 000160
 0021E900 00B80000 07C72600 5EC40257 89260789 26E2568B E0468B04 5EC4001E ..á^å.FÅ.Vã&..&.W.á^Å&ú...¡..Õl. 000180
 00E9B446 8B000019 719A016A 7777FF26 7977FF26 0A5EC400 000E47C7 260A5EC4 á^.&úG...á^.&.wy&.wwj..q....FÇÕ. 0001A0
 8B260E5E C4040E46 830000EE 46C7D88E 1722B81E 56570000 12C8CBC9 5F5E1F00 ..^_èùà...WV.¡"..ÄÚFÝ...F..á^.&. 0001C0
 5689FC46 89FE578B 26FC478B 260E5EC4 040E4683 FA5689F8 4689FE57 8B26FC47 G=&¯W±.F½.Vª.F..á^.&.G=&.W±.F=.V 0001E0

Dump of file SATURN:[PCCOMMON.DUMP.DLL]SA-DIFM.DLL;1 on 18-APR-1990 10:50:26.92
File ID (450,15,0)   End of file block 323 / Allocated 324

Virtual block number 155 (0000009B), 512 (0200) bytes

 267977FF 260A5EC4 0107E903 7700FC7E 830009E9 037E0115 E9037D00 FE7E83FE ±.~±.).Õ..~.Õ...~=.w.Õ..á^.&.wy& 000000
 EE468900 00182C9A 5016F046 8D006A50 5200DA83 00012DFE 568BFC46 8B7777FF .ww.F=.V±-...Õ.RPj..FÞ.P......FÝ 000020
 929A5052 0657182B 0447282B F85EC4F6 5688F446 8B0104E9 0003E903 75000030 =..u.Õ..Õ...F¶.V-á^½&+G.&.W.RP.. 000040
 8902929A FA8BF08B 5153025C 1B260C2B 26F876C4 F25E8BF0 4E8B04C4 831C3F02 .?..á..NÞ.^·ávÕ&+.&.\.SQ.Þ.ª.... 000060
 578B2607 8B26F85E C4000E9 0377C63B 0007E903 7E0019E9 037D073B 04C4831C ..á.;=).Õ..~.Õ..;ów.Õ..á^½&..&.W 000080
 072B26FB 5EC4F256 8BF0468B 02578926 078926F8 5EC4F256 8BF0468B 0006E902 .Õ...FÞ.V·á^½&..&.W..FÞ.V·á^½&+. 0000A0
 53065C1B 26044C2B 26F876C4 F65E8BF4 4E8B04C4 831CA802 929A5052 0257182B &.W.RP...´..á..N¶.^-ávÕ&+L.&.\.S 0000C0
 000EE903 77C63B00 07E9037E 001AE903 7DD73B04 C4831A80 02929AFA 8BF08B51 Q.Þ.ª......á.;=).Õ..~.Õ..;ów.Õ.. 0000E0
 6A065789 26044789 26F85EC4 F6568BF4 468B0006 E906578B 2604478B 26F85EC4 á^½&.G.&.W.Õ...F¶.V-á^½&.G.&.W.j 000100
 003DEE46 890EC483 1AED002D 9A0A76FF 0C76FFF8 76FFFA76 FFFC76FF FE76FF01 ..v±.v=.vª.v½.v..v..·.Ú..á..FÝ=. 000120
 267977FF 260A5EC4 00000E47 C7260A5E C40021E9 0000B800 06E90003 E9037500 .u.Õ..Õ..¡..Õl.á^.&úG...á^.&.wy& 000140
 8E1B8E8B 1E565700 0004C8CB C95F5E1F 0000E9EE 46880000 18779A01 6A7777FF .wwj..w....FÝÕ...^_èùà...WV.¡... 000160
 578B266F 478B260A 5EC4FE56 89FC4689 FE578B26 FC478B26 0E5EC404 0E4683D8 Ä.F..á^.&.G=&.W±.F=.V±á^.&.Go&.W 000180
 1D3D8B1E 56570000 06C8CBC9 5F5E1F00 00E90000 B8025789 26078926 FC5EC471 qá^=&..&.W.¡..Õ...^_èùà...WV.¡=. 0001A0
 FFFE76FF FE5689FC 4689FE57 8B26FC47 8B260E5E C4040E46 830000FA 46C7D88E .ÄÚFª...F..á^.&.G=&¯W±.F=.V±.v±. 0001C0
 00003DFA 46890CC4 8300001A FE9A006A 6F77FF26 7177FF26 0A5EC45D C068FC76 v=hå]á^.&.wq&.woj..±....á..Fª=.. 0001E0
```

```
Dump of file SATURN:[PCCOMMON.DUMP.DLL]SA-DIFM.DLL;1 on 18-APR-1990 10:50:26.92
File ID (450,15,0)   End of file block 323 / Allocated 324

Virtual block number 156 (0000009C), 512 (0200) bytes

 1D7EB81E 56570000 06C8CBC9 5F5E1F00 00E90000 B80006E9 FA468800 06E90375 u.Õ...F"Õ..|..Õ...^_èùà...WV.¡~. 000000
 FFFE76FF FE5689FC 4689FE57 8B26FC47 8B260E5E C4040E46 830000FA 46C7D88E .ÄúF"...F..6^.&.G=&.W±.F=.V±.v±. 000020
 00003DFA 46890CC4 8300001D B39A006A 6777FF26 6977FF26 0A5EC45D C068FC76 v=hâ]6^.&.wi&.wgj..•....6..F"=.. 000040
 1DDEB81E 56570000 04C8CBC9 5F5E1F00 00E90000 B80006E9 FA468800 06E90375 u.Õ...F"Õ..|..Õ...^_èùà...WV.¡B. 000060
 8B266747 8B260A5E C4FE5689 FC4689FE 578B26FC 478B260E 5EC4040E 4683D88E .Ä.F..6^.&.G=&.W±.F=.V±6^.&.Gg&. 000080
 3EB81E56 5700004A C8CBC95F 5E1F0000 E90000B8 02578926 078926FC 5EC46957 Wi6^=&..&.W.|..Õ...^_èùàJ..WV.¡> 0000A0
 0E5EC404 0E468300 00BE46C7 F25689F0 46890857 8B260647 8B260A5E C4D88E1E ..Ä6^.&.G.&.W..FÞ.V·ŪF/...F..6^. 0000C0
 CC4689FE 578B26FC 478B260E 5EC4040E 4683E256 89E04689 FE578B26 FC478B26 &.G=&.W±.FÅ.Vã.F..6^.&.G=&.W±.Fä 0000E0
 260E5EC4 040E4683 D25689D0 4689FE57 8B26FC47 8B260E5E C4040E46 83CE5689 .Vö.F..6^.&.G=&.W±.FÅ.VØ.F..6^.& 000100
 89D44689 FE578B26 FC478B26 0E5EC404 0E4683EA 5689E846 89FE578B 26FC478B .G=&.W±.FÒ.Võ.F..6^.&.G=&.W±.Få. 000120
 8B26065F C4260A5E C40A5689 D84689FE 578B26FC 478B260E 5EC4040E 46830656 V=.F..6^.&.G=&.W±.FÄ.VÖ6^.&6_.&. 000140
 5689C446 89065788 26044788 26065FC4 260A5EC4 C25689C0 46896557 8B266347 Gc&.We.Fâ.VÖ6^.&6_.&.G.&.W..F̄6.V 000160
 6A6777FF 266977FF 260A5EC4 601E6850 16E4468D 0031E903 74E2460B E0468BC6 6.FÅ.Fãt.Õ1..FÕ.Ph̄.'6^.&.wi&.wgj 000180
 E0468800 8EE90259 E9BE4688 0006E903 7500003D BE46890C C4830000 1F9F9A00 .......6..F/=..u.Õ...F/ÕY.Õ...FÅ 0001A0
 2C9A006A 6777FF26 6977FF26 0A5EC460 1E685016 EC4680E6 5689E446 89E2568B .Vã.FÕ.Vl.Fš.Ph.'6^.&.wi&.wgj.., 0001C0
 260081B7 FF260A5E C4021CE9 8E468800 06E90375 0000308E 46890CC4 83000020  ...6..F/=..u.Õ...F/Õ..6^.&.ñ..& 0001E0

Dump of file SATURN:[PCCOMMON.DUMP.DLL]SA-DIFM.DLL;1 on 18-APR-1990 10:50:26.92
File ID (450,15,0)   End of file block 323 / Allocated 324

Virtual block number 157 (0000009D), 512 (0200) bytes

 F2E9BE46 880006E9 03750000 3DBE4689 00001FF6 9A006AEC 76FFEE76 FF7F77FF .w..vŸ.všj..-....F/=..u.Õ...F/Õ· 000000
 00003DBE 46890000 20979A01 6AE476FF E676FF7F 77FF2600 81B7FF26 0A5EC401 .6^.&.ñ..&.w..vl.vÕj... ...F/=.. 000020
 5EC4601E 685016DC 46800031 E90374EA 460BE846 8801C8E9 BE468800 06E90375 u.Õ...F/Õà..FÒ.Fõt.Õ1..FÉ.Ph.'6^ 000040
 46880006 E9037500 003DBE46 890CC483 00002069 9A006A6F 77FF2671 77FF260A .&.wq&.woj..i ...6..F/=..u.Õ...F 000060
 FF260A5E C4601E68 5016F446 800E5689 DC4689EA 568BE846 880090E9 018FE98E /Õ..Õ...FÕ.Võ.FÉ.VB.F¶.Ph.'6^.&. 000080
 52E9BE46 880006E9 03750000 3DBE4689 0CC48300 001E139A 006A6F77 FF267177 wq&.woj.......6..F/=..u.Õ...F/ÕR 0000A0
 003DBE46 89000020 C29A006A F476FFF6 76FF0083 87FF2600 8587FF26 0A5EC401 .6^.&.ñ..&.ñ...v~.v¶j..ô ...F/=. 0000C0
 6ADC76FF DE76FF00 83B7FF26 0085B7FF 260A5EC4 0127E98E 46880006 E9037500 .u.Õ...F/Õ'.6^.&.ñ..&.ñ...vB.vÉj 0000E0
 16C8468D 5016CA46 8000FCE9 BE468800 06E90375 0000308E 46890000 FFFF9A01 .......F/=..u.Õ...F/Õ=..Fò.P.Fà. 000100
 76FFDE76 FFCC76FF CE76FFD4 76FFD676 FF086A08 6A501686 46805016 F8468050 P.F½.P.FÑ.Pj.j..v=.vå.vö.vä.vB.v 000120
 0083E98E 46880006 E9037500 003DBE46 8924C483 129406EA 9AE476FF E676FFDC É.vl.vÕ.õ....6$.F/=..u.Õ...F/Õ°. 000140
 19E90375 00003DBE 46890000 21609A50 1686468D 7F77FF26 0081B7FF 260A5EC4 6^.&.ñ..&.w..FÑ.P.ml...F/=..u.Õ. 000160
 B7FF260A 5EC40000 21919A20 6A006A03 60681E03 7F681E01 6A006A01 6A006A00 .j.j.j.j..h...h'.j.j ..l..6^.&.ñ 000180
 016A006A 0019E903 7500003D BE468900 00FFFF9A 5016F846 80008387 FF260085 ..&.ñ...F½.P......F/=..u.Õ..j.j. 0001A0
 0011E903 75D2460B D0468800 00FFFF9A 206A006A 0380681E 03A4681E 016A006A j.j..hÉ..h..j.j ......FÅ.FØu.Õ.. 0001C0
 880A5EC4 0011E903 75DA460B D8468B69 57892667 47892602 568BD046 880A5EC4 6^..FÅ.VØ&.Gg&.Wi.FÄ.FÕu.Õ..6^.. 0001E0

Dump of file SATURN:[PCCOMMON.DUMP.DLL]SA-DIFM.DLL;1 on 18-APR-1990 10:50:26.92
File ID (450,15,0)   End of file block 323 / Allocated 324

Virtual block number 158 (0000009E), 512 (0200) bytes

 B81E5657 000032C8 CBC95F5E 1F0000E9 00008871 5789266F 4789260A 568BD846 FÄ.VÖ&.Go&.Wq|..Õ...^_èùà2..WV.| 000000
 0E5EC404 0E468304 56890246 89FE578B 26FC478B 260E5EC4 040E4683 D88E1E7F ...Ä.F..6^.&.G=&.W±.F∅.Vå.F..6^. 000020
 DC4689FE 578B26FC 478B260E 5EC4040E 4683E656 89E44689 FE578B26 FC478B26 &.G=&.W±.FÖ.Vl.F..6^.&.G=&.W±.FÉ 000040
 89D64689 61578B26 5F478B26 0A5EC4E0 4689E246 89000088 0000CE46 C7DE5689 .VBúFö..|...Fã.FÅ6^.&.G_&.Wa.F∅. 000060
 DE76FFDA 46896747 8B26FC5E C4FE5689 FC468908 57882606 478B260A 5EC40856 VÄ6^.&.G.&.W..F=.V±6^=&.Gg.¯Ö.vB 000080
 468912C4 83000022 E79A006A D676FFD8 76FF2711 680276FF D476FF05 6ADC76FF .vÉj..vå.vØh.'.vÄ.v∅j..Ö"......F 0000A0
 76FF0146 E9037502 47082607 8B26DC5E C4015BE9 CE468800 06E90375 00003DCE ö=..u.Õ...FöÕ[.6^É&..&.G.u.ÕF..v 0000C0
 03750000 3DCE4689 0000FFFF 9AE476FF E676FF50 02E0C107 8B26DC5E C4696ADA Öji6^É&..èÅ.P.vl.vÕ......Fö=..u. 0000E0
 6177FF26 0A5EC427 1368D276 FFD476FF 056A5016 EC468D01 21E9CE46 880006E9 Õ...FöÕl..F&.Pj..vå.vØh.'6^.&.wa 000100
 8800E8E9 CE468800 06E90375 00003DCE 468912C4 8300001F 629A006A 5F77FF26 &.w j..b....6..Fö=..u.Õ...FöÕŠ.. 000120
 D276FFD4 76FF0089 E9037502 47082607 8B26F85E C4FA5689 F84689EE 568BEC46 F&.VŸ.F½.V'6^½&..&.G.u.Õ¿..vå.v∅ 000140
 06E90375 00003DCE 46890000 235F9A50 16F0468D 016A37FF 260277FF 26F85EC4 6^½&.w.&.7j..FÞ.P._#...Fö=..u.Õ. 000160
 C99A5016 D0468D02 6A37FF26 0277FF26 F85EC4D2 76FFD476 FF00A3E9 CE468800 ..FöÕÉ..vå.v∅6^½&.w.&.7j..FÅ.P.è 000180
 00081F9A 5016E846 8DDA76FF 0076E9CE 46880006 E9037500 003DCE46 89000000 ....Fö=..u.Õ...FöÕv..vÖ.FÕ.P.... 0001A0
 89260789 26F2568B F0468BE8 5EC40058 E9CE4688 0006E903 75000030 CE468900 ..Fö=..u.Õ...FöÕX.6^Ò.FÞ.V·&..&. 0001C0
 881FC426 E45EC402 E6C10076 88065789 26044789 26F65688 F4468BE8 5EC40257 W.6^Ò.F¶.V-&.G.&.W..vÅèl.6^Õ&6.. 0001E0
```

Dump of file SATURN:[PCCOMMON.DUMP.DLL]SA-DIFM.DLL;1 on 18-APR-1990 10:50:26.92
File ID (450,15,0)   End of file block 323 / Allocated 324

Virtual block number 159 (0000009F), 512 (0200) bytes

```
9AEC76FF EE76FFD2 76FFD476 FFFF38E9 04F84683 02508926 008926EA 5688E846 Fò.Võ&..&.P..F½.Õ8..vå.vø.vŸ.v$. 000000
C4040E46 83088E21 E0881E56 57000036 C8CBC95F 5E1F0000 E90000B8 0000103F ?...¡..Õ...^_èùàó..WV.¡Å!.Ä.F..ó 000020
89FE5788 26FC4788 260E5EC4 040E4683 D6568904 4689FE57 8826FC47 88260E5E ^.&.G=&.W±.Fã.Vø.F..ó^.&.G=&.W±. 000040
5EC4040E 4683F256 89F04689 FE578826 FC478826 0E5EC404 0E4683EE 5689EC46 F&.VŸ.F..ó^.&.G=&.W±.FÞ.V·.F..ó^ 000060
4689FE57 8826FC47 88260E5E C4040E46 83E25689 E04689FE 578826FC 4788260E .&.G=&.W±.FÅ.Võ.F..ó^.&.G=&.W±.F 000080
C70028E4 46C7F656 89F44689 08578826 06478826 0A5EC400 000246C7 DC56890A Ö.VÉúFø..ó^.&.G.&.W..F¶.V-úFÖ(.ú 0000A0
0C56880A 4688EC76 FFEE76FF D476FFD6 76FF0000 EA46C700 28E846C7 0000E646 F¦..úFÖ(.úFõ...vø.vå.vŸ.v$.F..V. 0000C0
260A5EC4 0250E9D2 46880006 E9037500 D27E8302 46890000 24FD9A50 52007F05 ...RP.»$...Fø.~ø.u.Õ...FøÕP.ó^.& 0000E0
880006E9 03750002 7E830246 89000025 279A0676 FF0876FF 7F77FF26 0081B7FF .ñ..&.w..v..v..'%...Fø.~ø.u.Õ... 000100
00FFFF9A 50520083 050C5688 0A4688F0 76FFF276 FFD476FF D676FF02 27E90246 FøÕ'..vø.vå.v·.vÞ.F..V....RP.... 000120
00838 7FF 26008587 FF260A5E C401F9E9 D2468800 06E90375 00027E83 D2468900 ..Fø.~ø.u.Õ...FøÕ'.ó^.&.ñ..&.ñ.. 000140
DE468D01 CFE9D246 880006E9 03750002 7E830246 890000FF FF9A0676 FF0876FF .v..v.......Fø.~ø.u.Õ...FøÕÜ..Fß 000160
76FFE276 FFDA76FF DC76FF08 6A086A50 16CA468D 5016F846 80501608 46805016 .P.FÄ.P.F½.P.Fò.Pj.j..vÉ.vÖ.vã.v 000180
06E90375 00027E83 D2468924 C483210A 06EA9AEC 76FFEE76 FFF076FF F276FFE0 Å.v·.vÞ.vŸ.v$.õ..¦.ó$.Fø.~ø.u.Õ. 0001A0
D2468900 0025C29A 5016E446 8D7F77FF 260081B7 FF260A5E C40185E9 D2468800 ..FøÕ..ó^.&.ñ..&.w..Fò.P.õ%...Fø 0001C0
16E4468D 00838 7FF 26008587 FF260A5E C40150E9 D2468800 06E90375 00027E83 .~ø.u.Õ...FøÕ].ó^.&.ñ..&.ñ...Fò. 0001E0
```

Dump of file SATURN:[PCCOMMON.DUMP.DLL]SA-DIFM.DLL;1 on 18-APR-1990 10:50:26.92
File ID (450,15,0)   End of file block 323 / Allocated 324

Virtual block number 160 (000000A0), 512 (0200) bytes

```
0081B7FF 260A5EC4 0134E9D2 46880006 E9037500 D27E83D2 46890000 FFFF9A50 P......Fø.~ø.u.Õ...FøÕ4.ó^.&.ñ.. 000000
6A006A01 6A006A00 19E90375 00003DD2 46890000 21329A50 16CA468D 7F77FF26 &.w..Fò.P.2¦...Fø=..u.Õ..j.j.j.j 000020
8D0083B7 FF260085 B7FF260A 5EC40000 21569A20 6A006A03 A5681E03 C4681E01 ..hó..hÉ.j.j .V¦..ó^.&.ñ..&.ñ... 000040
03E9681E 016A006A 016A006A 0019E903 7500003D D2468900 0025EA9A 5016F846 F½.P.õ%...Fø=..u.Õ..j.j.j.j..hÕ. 000060
0081B7FF 260A5EC4 7B77FF26 7D77FF26 0A5EC400 00260E9A 206A006A 03C5681E .hé.j.j ..&..ó^.&.w)&.w(ó^.&.ñ.. 000080
C4008DE9 D2468800 06E90375 00027E83 D2468900 00269C9A 006AFF6A 7F77FF26 &.w.j.j...&...Fø.~ø.u.Õ...FøÕ..ó 0000A0
0000FFFF 9A016AFF 6A0083B7 FF260085 B7FF260A 5EC47B77 FF267D77 FF260A5E ^.&.w)&.w(ó^.&.ñ..&.ñ..j.j...... 0000C0
6A006A7B 77FF267D 77FF260A 5EC4005A E9024688 0006E903 7500027E 83024689 .Fø.~ø.u.Õ...FøÕZ.ó^.&.w)&.w(j.j 0000E0
77FF260A 5EC40032 E9024688 0006E903 7500027E 83024689 0000FFFF 9A016A01 .j.......Fø.~ø.u.Õ...FøÕ2.ó^.&.w 000100
0006E903 7500027E 83024689 0000FFFF 9A0F6A00 6A1E6A00 6A016A7B 77FF267D )&.w(j.j.j.j.j.......Fø.~ø.u.Õ.. 000120
EA46C7D8 8E23F7B8 1E565700 001EC8CB C95F5E1F 0000E900 00880006 E9024688 .FøÕ..¡..Õ...^_èùà...WV.¡¼#.ÄúFõ 000140
46896557 8B266347 8826FC5E C4FE5689 FC468908 57882606 4788260A 5EC40000 ..ó^.&.G.&.W..F=.V±ó^=&.Gc&.We.F 000160
69478826 065FC426 0A5EC4F2 5689F046 89795788 26774788 260A5EC4 EE5689EC $.VŸó^.&.Gw&.Wy.FÞ.V·ó^.&r .&.Gí 000180
76FFF276 FFFA5689 F846892E 5788262C 478826F4 5EC4F656 89F44689 68578826 &.Wk.F¶.V-ó^¶&.G,&.W..F½.V  v·.v 0001A0
ECE90003 E9037500 003DEA46 8900001B F99A5016 E2468D00 6AF876FF FA76FFF0 Þ.v'.v½j..Fã.P.'....Fõ=..u.u..Õ$ 0001C0
27F89A50 16E2468D 7F77FF26 0081B7FF 260A5EC4 0027E903 74FA460B F8468800 ..F½.F't.Õ'.ó^.&.ñ..&.w..Fã.P.½' 0001E0
```

Dump of file SATURN:[PCCOMMON.DUMP.DLL]SA-DIFM.DLL;1 on 18-APR-1990 10:50:26.92
File ID (450,15,0)   End of file block 323 / Allocated 324

Virtual block number 161 (000000A1), 512 (0200) bytes

```
00FA7E83 002EE903 7401F87E 830037E9 0080E900 03E90375 00003DEA 46890000 ...Fõ=..u.Õ..Õ§.Õ7..~½.t.Õ...~'. 000000
3DEA4689 00002625 9A5016E2 46800083 B7FF2600 85B7FF26 0A5EC400 25E90374 t.Õ%.ó^.&.ñ..&.ñ...Fã.P.%&...Fõ= 000020
00001998 9A006A06 76FF0876 FF0A76FF 0C76FF5D D3680083 E90003E9 03750000 ..u.Õ..Õ..h&].v..v..v..v.j...... 000040
C4244789 26264789 26000088 F45EC400 5CE90003 E9037500 003DEA46 890CC483 .ó..Fõ=..u.Õ..Õ\.ó^¶¦..&.G&&.G$ó 000060
FF260A5E C42C4789 262E4789 26000088 F45EC428 4789262A 47892600 0088F45E ^¶¦..&.G*&.G(ó^¶¦..&.G.&.G,ó^.&. 000080
5EC40030 E9EA4688 0006E903 7500003D EA468900 0010269A 016A7777 FF267977 wy&.wwj..&....Fõ=..u.Õ...FõÕ0.ó^ 0000A0
77FF2679 77FF260A 5EC40000 0E47C726 0A5EC400 21E90000 B800000E 47C7260A .&úG...¦..Õ!.ó^.&úG...ó^.&.wy&.w 0000C0
C7D88E27 19881E56 57000098 C8CBC95F 5E1F0000 E9EA4688 00002869 9A016A77 wj..i(...FõÕ...^_èùà...WV.¡.'.Äú 0000E0
26FC4788 260E5EC4 040E4683 0000FF7E 86C7C246 89C44689 00008800 00FF7C86 .|...¡...Fó.Fóú.~....F..ó^.&.G=& 000100
5EC4F656 89F44689 FE578826 FC478826 0E5EC404 0E468398 56899646 89FE5788 .W±.F..V..F..ó^.&.G=&.W±.F¶.V-ó^ 000120
830000FF FF9A5016 92468D8E 76FF9076 FF905689 8E468906 57882604 478826F4 ¶&.G.&.W..F..V..v..v..F..P...... 000140
06478926 F6568BF4 46880A5E C40000FF FF9A8E76 FF9076FF 0008E903 7500927E ~..u.Õ...v..v......ó^..F¶.V-&.G. 000160
C4944689 67478826 F45EC48A 56898846 89655788 26634788 26F45EC4 08578926 &.W.ó^¶&.Gc&.We.F...V.ó^¶&.Gg.F.ó 000180
9A505200 0C050C56 880A4688 9676FF98 76FF8E76 FF9076FF 00010A47 C7260A5E ^.&úG....v..v..v..v..F..V....RP. 0001A0
5EC40000 0E47C726 0A5EC407 5AE90003 E9037500 FF7C8E83 FF7C8689 0000FFFF ......|..f|..u.Õ..ÕZ.ó^.&úG...ó^ 0001C0
FF7C8689 0000237D 9A50160C 46809476 FF615789 265F4789 26985688 9646880A ..F..V.&.G_&.Wa.v..FÉ.P.)#....|. 0001E0
```

```
Dump of file SATURN:[PCCOMMON.DUMP.DLL]SA-DIFM.DLL;1 on 18-APR-1990 10:50:26.92
File ID (450,15,0)   End of file block 323 / Allocated 324

Virtual block number 162 (000000A2), 512 (0200) bytes

 89260000 B8DC5EC4 07892602 47892600 0088DC5E C40724E9 0003E903 7500003D =..u.Õ..Õ$.6^É|..&.G.&..6^É|..&. 000000
 76FF036A 5016AE46 8D125789 26104789 26DE5688 DC46880A 5EC40447 89260647 G.&.G.6^..FÉ.V8&.G.&.W..FÛ.Pj..v 000020
 03750000 3DFF7C86 8912C483 00002A8C 9A006A96 76FF9876 FF271468 8E76FF90 ..v.h.'.v..v.j...*...6...|.=..u. 000040
 890CC483 2AC91058 9AAE76FF B076FFF4 76FFF676 FF5016AA 468D06C9 E90003E9 Õ..Õè..F¯.P.v-.v¶.v¯.v0.X.è*.6.. 000060
 E90001FF 7C86C700 09E90374 AC4608AA 468B06A1 E90003E9 03750000 3DFF7C86 .|.=..u.Õ..ÕÀ..F¯.F¯t.Õ..ú.|...Õ 000080
 8E76FF90 76FF046A 5016C846 8D655789 26634789 26AC5688 AA46880A 5EC4068D ..6^..F¯.V¯&.Gc&.We.Fà.Pj. v..v. 0000A0
 E90003E9 03750000 3DFF7C86 8912C483 00002B0F 9A006A96 76FF9876 FF271368 h.'.v..v.j...+...6...|.=..ι Õ..Õ 0000C0
 26C85EC4 F476FFF6 76FF5016 B2468D06 2DE90375 02470B26 078B26C8 5EC4064D M.6^à&..&.G.u.Õ-..Fý.P.v-.v¬.^à& 0000E0
 74B44608 B2468B06 16E90003 E9037500 003D0CC4 83FFFF10 589A37FF 260277FF .w.&.7.X....6.=..u.Õ..Õ...Fý.FÇt 000100
 46806D57 89266B47 89268456 88B24688 0A5EC406 02E90001 FF7C86C7 0009E903 .Õ..ú.|...Õ..6^..Fý.VÇ&.Gk&.Wm.F 000120
 E9037500 0030FF7C 86890CC4 8300002B 4D9A006A AA76FFAC 76FF601E 685016E0 Å.Ph.'.v¯.v¯j..M+...6...|.=..u.Õ 000140
 16F04680 005DE903 74E2460B E04688E6 5689E446 89AC5688 AA468805 CAE90003 ..Õò..F¯.V¯.FÕ.V|.FÅ.Fãt.Õ]..Fþ. 000160
 0003E903 7500003D FF7C8689 0CC48300 002B749A 006AE476 FFE676FF 60E56850 Ph|'.v|.vÕj..t+...6...|.=..u.Õ.. 000180
 3DFF7C86 890CC483 00002BBC 9A006AF0 76FFF276 FF601E68 5016E046 8D058CE9 Õ...FÅ.Ph.'.v·.vþj..¥+...6...|.= 0001A0
 8BE44688 0A5EC4FF 98E9E656 89E44689 F2568BF0 46880565 E90003E9 03750000 ..u.Õ..Õe..Fþ.V·.FÕ.V|Õ..6^..FÕ. 0001C0
 00002BE3 9A006AE4 76FFE676 FF601F68 0676FF08 76FF6957 89266747 8926E656 V|&.Gg&.Wi.v..v.h.'.v|.vÕj..D+.. 0001E0

Dump of file SATURN:[PCCOMMON.DUMP.DLL]SA-DIFM.DLL;1 on 18-APR-1990 10:50:26.92
File ID (450,15,0)   End of file block 323 / Allocated 324

Virtual block number 163 (000000A3), 512 (0200) bytes

 B276FFB4 76FF601E 685016E8 4680051D E90003E9 03750000 3DFF7C86 890CC483 .6...|.=..u.Õ..Õ...FÒ.Ph.'.vÇ.vý 000000
 89B4568B B2468804 F6E90003 E9037500 003DFF7C 86890CC4 8300002C 219A006A j..!.,...6...|.=..u.Õ..Õ-..Fý.VÇ. 000020
 006AEC76 FFEE76FF 60E56850 16F04680 005DE903 74EA4608 E84688EE 5689EC46 F$.VŸ.FÒ.Fõt.Õ]..Fþ.Ph|'.vŸ.v$j. 000040
 FF601E68 5016E846 8D04B8E9 0003E903 7500003D FF7C8689 0CC48300 002C489A .H,...6...|.=..u.Õ..Õ|..FÒ.Ph.'. 000060
 46880491 E90003E9 03750000 3DFF7C86 890CC483 00002277 9A006AF0 76FFF276 v·.vþj..w"...6...|.=..u.Õ..Õ...F 000080
 468D7157 89266F47 8926EE56 8BEC4688 0A5EC4FF 98E9EE56 89EC4689 F2568BF0 þ.V·.F$.VŸÕ..6^..F$.VŸ&.Go&.Wq.F 0000A0
 E9037500 003DFF7C 86890CC4 8300002C C89A006A E476FFE6 76FF6023 685016CC ä.Ph#'.v|.vÕj..à,...6...|.=..u.Õ 0000C0
 FF602368 5016B646 8D06568C D44689CC 46800009 E9D44689 D6468900 0088000C ..|...Fø.FàÕ...Fä.Få.Vø.FÑ.Ph#'. 0000E0
 46890000 B8000CE9 03750000 3DFF7C86 890CC483 00002EE8 9A006AEC 76FFEE76 vŸ.v$j..Õ....6...|.=..u.Õ..|...F 000100
 8E76FF90 76FF5016 D8468D50 16C24680 C0568CBE 46898646 800009E9 BE4689C0 å.F/Õ...FÑ.F/.Vã.Fò.P.FÄ.P.v..v. 000120
 7CBE83FF 7C868918 C4830000 2EC09A00 6A0676FF 0876FF0A 76FF0C76 FF5E9768 h.^.v..v..v..v.j..ô....6...|../| 000140
 8B26D85E C40001FF 7E86C700 20E90375 C44608C2 468803C5 E90003E9 037500FF ..u.Õ..Õé..Fò.Féu.Õ-.ú.-...6^Ä&. 000160
 89BE4689 FE508826 FC408B26 D85EC402 E6C1C276 8BD65689 D4468902 57882607 .&.W..Få.Vø.vòê|.6^Ä&.∂=&.P±.F/. 000180
 E9037500 FF7EBE83 015EE903 75EA4608 E8468801 69E90375 E2460BE0 468BC056 Vã.FÅ.Fãu.Õi..FÒ.Fõu.Õ^../-..u.Õ 0001A0
 0C56880A 46888876 FF8A76FF 001DE903 7400C47E 830026E9 037402C2 7E8300C2 ò..-ô.t.Õ&..-6.t.Õ...v..v..F..V. 0001C0
 007B050C 56880A46 888876FF 8A76FF00 1AE9FF7C 86890000 2E569A50 52007B05 .(.RP.V.....|.Õ...v..v..F..V..(. 0001E0

Dump of file SATURN:[PCCOMMON.DUMP.DLL]SA-DIFM.DLL;1 on 18-APR-1990 10:50:26.92
File ID (450,15,0)   End of file block 323 / Allocated 324

Virtual block number 164 (000000A4), 512 (0200) bytes

 0003E900 018446C7 0317E900 03E90375 00FF7CBE 83FF7C86 89000015 AF9A5052 RP.£.....|../|..u.Õ..Õ..úF...Õ.. 000000
 50529984 46887877 FF267D77 FF260A5E C40052E9 037F8446 3848C246 888446FF .F..FÕH;F...ÕR.6^.&.w)&.w(.F..RP 000020
 03750000 3DFF7C86 8900001B 309A30FF 260270FF 26D876C4 02E3C184 5E88006A j..^.èÐ.6vÄ&.p.&.0.0.....|.=..u. 000040
 9FE90000 FFFF9A30 FF260270 FF26D876 C402E3C1 845E8894 76FF02C9 E90003E9 Õ..Õè..v..^.èÐ.6vÄ&.p.&.0.....Õ. 000060
 BE83FF7C 86890000 FFFF9A50 52007B05 0C56880A 46888876 FF8A76FF 0027E9FF .Õ'..v..v..F..V..(.RP.......|../ 000080
 0015D69A 0676FF08 76FF7B77 FF267D77 FF260A5E C40284E9 0003E903 7500FF7C |..u.Õ..Õ..6^.&.w)&.w(.v..v..ø.. 0000A0
 FFEA76FF D476FFD6 76FFBE76 FFC076FF 025FE900 03E90375 00003DFF 7C868900 ...|.=..u.Õ..Õ..vå.v/.vø.vå.vÕ. 0000C0
 9A006A06 76FF0876 FF0A76FF 0C76FF5E 98688876 FF8A76FF E076FFE2 76FFE876 vÒ.vã.vÅ.v..v.ħ.^.v..v..v..v.j.. 0000E0
 FF601F68 0676FF08 76FF0219 E90003E9 03750000 3DFF7C86 8920C483 0000281C .(...6 ..|.=..u.Õ..Õ...v..v.h.'. 000100
 468B01F1 E90003E9 03750000 3DFF7C86 890CC483 00002F1D 9A006AEC 76FFEE76 vŸ.v$j.../...6...|.=..u.Õ..Õþ..F 000120
 002F569A 006A9676 FF9876FF 2712688E 76FF9076 FF016A50 52001405 0C56880A ..V....RPj..v..v.h.'.v..v.j..V/. 000140
 F8468000 EEE90375 00FF7EBE 83018CE9 0003E903 7500003D FF7C8689 12C48300 ..6...|.=..u.Õ..Õ¥../~..u.ÕŸ..F½ 000160
 7C868912 C4830000 2A109A00 6A0676FF 0876FF27 12688E76 FF9076FF 126A5016 .Pj..v..v.h.'.v..v.j...*...6...| 000180
 FE5688FC 46889C56 899A4689 FA568BF8 46880181 E90003E9 037500FF 7CBE83FF ../|..u.Õ..Õ...F½.Vª.F..V..F=.V± 0001A0
 5016F846 8D1E6A00 6A505200 14050C56 880A4688 8876FF8A 76FFA056 899E4689 .F..V..v..v..F..V....RPj.j..F½.P 0001C0
 6A9689FF 6E961BFF 6C862BFF 76968BFF 74868800 0006889A 5016FF6C 868D006A j...l..P.|.....t...v.+.l...n...j 0001E0
```

```
Dump of file SATURN:[PCCOMMON.DUMP.DLL]SA-DIFM.DLL;1 on 18-APR-1990 10:50:26.92
File ID (450,15,0)   End of file block 323 / Allocated 324

Virtual block number 165 (000000A5), 512 (0200) bytes

 139A4603 30070A12 9A2FDA08 BD9A226E 1E8D1C21 082B9AFF 689E8DFF 688689FF ...h...h..+.I...n".§.Ö/....0.F.. 000000
 FF688689 FF6A9689 FF72961B FF70862B FF7A968B FF78868B A45689A2 46899C56 V..FÅ.VÊ..x...z.+.p...r...j...h. 000020
 A64689A0 56139E46 032FCC0A 129A3015 08BD9A22 6E1E8030 10082B9A FF689E8D ..h..+..0..n".§..0...ä/.F..V..FÌ 000040
 50520014 050C5688 0A468850 169A4680 5016C646 8D002EE9 0000C646 C7A85689 .V´úF6..Õ...F6.P.F..P.F..V....RP 000060
 76FF0876 FF006A18 C4830000 2D129A00 6A0676FF 0876FF0A 76FF0C76 FF5E9968 h.^.v..v..v..v.j...-...á.j..v..v 000080
 50520014 050C5688 0A46881E 6A006A00 6A006A50 169A468D C676FF4B 6A006A06 .j.jK.v6.F..Pj.j.j.j..F..V....RP 0000A0
 3DFF7C86 892CC483 0000FFFF 9A006A78 6A501680 468DF476 FFF676FF 006A006A j.j..v-.v¶.F..Pjxj.......á,..|.= 0000C0
 76FFF676 FF755789 26734789 26825688 8046880A 5EC40045 E90003E9 03750000 ..u.Õ..ÕE.á^..F..V.&.Gs&.Wu.v-.v 0000E0
 76FF0011 E90003E9 03750000 3DFF7C86 8908C483 2A3A0818 9A0676FF 0876FFF4 ¶.v..v....:*.á...|.=..u.Õ..Õ...v 000100
 FF9A8E76 FF9076FF 0008E903 7500927E 83000023 E09AC876 FFCA76FF 8E76FF90 ..v..vò.và.Á#...~..u.Õ...v..v... 000120
 0000F846 C7D88E28 BBB81E56 57000008 C8C8C95F 5E1F0000 E9FF7C86 880000FF .....|.Õ...^_èùà...WV.¡É(.ÄúF½.. 000140
 8B260A5E C4FA4689 67478826 FC5EC4FE 5689FC46 89085788 2606478B 260A5EC4 á^.&.G.&.W..F=.V±á^=&.Gg.F*á^.&. 000160
 06C48300 00FFFF9A 006A7377 FF267577 FF260A5E C40018E9 03757547 08267347 Gs&.Guu.Õ..á^.&.wu&.wsj.......á. 000180
 77FF2600 81B7FF26 0A5EC400 0028A49A 006A7B77 FF267D77 FF260A5E C4F84689 .F½á^.&.w)&.w(j..Ê(..á^.&.ñ..&.w 0001A0
 FFFE76FF 0000FFFF 9A006A00 83B7FF26 00858 7FF 260A5EC4 00003198 9A006A7F .j...1..á^.&.ñ..&.ñ..j.......v±. 0001C0
 64E9F846 880006E9 03750000 3DF84689 08C48330 CA084B9A 0676FF08 76FFFC76 v=.v..v..K.òO.á..F½=..u.Õ...F½Õd 0001E0

Dump of file SATURN:[PCCOMMON.DUMP.DLL]SA-DIFM.DLL;1 on 18-APR-1990 10:50:26.92
File ID (450,15,0)   End of file block 323 / Allocated 324

Virtual block number 166 (000000A6), 512 (0200) bytes

 890CC483 00003207 9A006A67 77FF2669 77FF260A 5EC46020 680676FF 0876FF00 ..v..v.h 'á^.&.wi&.wgj...2...á.. 000000
 7177FF26 0A5EC460 20680676 FF0876FF 0035E9F8 46880006 E9037500 003DF846 F½=..u.Õ...F½Õ5..v..v.h 'á^.&.wq 000020
 B80006E9 F8468800 06E90375 00003DF8 46890CC4 8300002C 8F9A006A 6F77FF26 &.woj...,...á..F½=..u.Õ...F½Õ..¡ 000040
 978B267F 478B260A 5EC4D88E 3117B81E 56570000 0EC8CBC9 5F5E1F00 00E90000 ..Õ...^_èùà...WV.¡.1.Äá^.&.G.&.. 000060
 C4260A5E C4FC5689 FA468900 85978B26 0083878B 260A5EC4 F85689F6 46890081 ...F-.V½á^.&....&.....F*.V=á^.&á 000080
 F476FF00 6FE90375 000E7F83 260A5EC4 F45689F2 46896557 8B266347 8B26065F _.&.Gc&.We.F·.V¶á^.&....u.Õo..v¶ 0000A0
 F276FFF4 76FF0000 32E89A02 6AF276FF F476FF00 0033059A 5016FE46 8DF276FF .v·.F±.P..3...v¶.v·j..Õ2...v¶.v· 0000C0
 F676FFF8 76FFF276 FFF476FF 0000332C 9A016A02 6A7777FF 267977FF 260A5EC4 á^.&.wy&.wwj.j..,3...v¶.v·.v½.v- 0000E0
 76FF0000 33419A03 6A026AFA 76FFFC76 FFF276FF F476FF00 0032DA9A 036A026A j.j..Õ2...v¶.v·.v=.v*j.j..A3...v 000100
 8DF276FF F476FF00 72E90375 000C7F83 260A5EC4 00003312 9AFE76FF F276FFF4 ¶.v·.v±..3..á^.&....u.Õr..v¶.v·. 000120
 260A5EC4 F276FFF4 76FF0000 33649A01 6AF276FF F476FF00 0033779A 5016FE46 F±.P.w3...v¶.v·j..d3...v¶.v·á^.& 000140
 036A086A F676FFF8 76FFF276 FFF476FF 0000339E 9A036A08 6A7B77FF 267D77FF .w)&.w(j.j...3...v¶.v·.v½.v-j.j. 000160
 F276FFF4 76FF0000 33839A03 6A086AFA 76FFFC76 FFF276FF F476FF00 0033569A .V3...v¶.v·.v=.v*j.j..*3...v¶.v· 000180
 76FFF476 FF0000FF FF9A5016 FE468DF2 76FFF476 FF006FE9 00003384 9AFE76FF .v±..3..Õo..v¶.v·.F±.P......v¶.v 0001A0
 FFFF9A03 6A006A7B 77FF267D 77FF260A 5EC4F276 FFF476FF 00003306 9A016AF2 ·j..ø3...v¶.v·á^.&.w)&.w(j.j.... 0001C0
 FC76FFF2 76FFF476 FF000033 C89A036A 006AF676 FFF876FF F276FFF4 76FF0000 ...v¶.v·.v½.v-j.j..à3...v¶.v·.v= 0001E0

Dump of file SATURN:[PCCOMMON.DUMP.DLL]SA-DIFM.DLL;1 on 18-APR-1990 10:50:26.92
File ID (450,15,0)   End of file block 323 / Allocated 324

Virtual block number 167 (000000A7), 512 (0200) bytes

 0000E900 00B80000 FFFF9AFE 76FFF276 FFF476FF 0000FFFF 9A036A00 6AFA76FF .v*j.j.......v¶.v·.v±.....¡..Õ.. 000000
 478B2606 5FC4260A 5EC40000 DE46C708 8E3232B8 1E565700 0022C8CB C95F5E1F .^_èùà"..WV.¡22.ÄúF8..á^.&á .&.G 000020
 F65689F4 4689FE57 8B26FC47 8B260E5E C4040E46 83E65689 E4468965 578B2663 c&¯We.FÕ.VÌ.F..á^.&.G=&.W±.F¶.V- 000040
 56880A46 8BE476FF E676FFEA 5689E846 89FE578B 26FC478B 260E5EC4 040E4683 .F..á^.&.G=&.W±.FÒ.VÕ.vÌ.vÕ.F..V 000060
 260A5EC4 024BE90E 46880006 E9037500 003DOE46 8900002D C39A5052 0077050C ..w.RP.û-...F8=..u.Õ...F8ÕK.á^.& 000080
 0206E900 03E90375 00003D0E 46890000 2E7D9A06 76FF0876 FF7777FF 267977FF .wy&.ww.v..v..)....F8=..u.Õ..Õ.. 0000A0
 7500003D DE46890C C4830000 31D89A00 6A0676FF 0876FF5D CE68F476 FFF676FF .v-.v¶hö].v..v.j..Ä1...á..F8=..u 0000C0
 5016E046 8D7777FF 267977FF 260A5EC4 00010E47 C7260A5E C401DFE9 0003E903 .Õ..ÕÕ.á^.&úG...á^.&.wy&.ww.FÅ.P 0000E0
 0008E900 00FA46C7 0001F846 C701B3E9 0003E903 7500003D DE468900 0016299A .)....F8=..u.Õ..Õ°.úF½..úF*..Õ.. 000100
 08E9037E 0028E903 7DFA5638 000A8300 012DE256 88E04688 00FA5683 01F84683 .F½..V*..FÅ.Vã-...Õ.;V*).Õ(.~.Õ. 000120
 0016859A 006AF876 FFFA76FF 7777FF26 7977FF26 0A5EC400 1BE90377 F8463B00 .;F½w.Õ..á^.&.wy&.ww.v*.v½j..... 000140
 BCE90374 00859739 2600C6E9 03740083 873926EA 5688E846 880A5EC4 FFBCE900 .Õ¥.á^..FÒ.VÕ&9...t.Õ6.&9...t.Õ¥ 000160
 8910C483 00003592 9A006A06 76FF0876 FF0A76FF 0C76FF5E 88685016 FC468000 ..F=.Ph.^.v..v..v..v.j...5...á.. 000180
 505200DA 8300022D FE5688FC 46885016 EC468D01 19E90003 E9037500 003DDE46 F8=..u.Õ..Õ...F&.P.F=.V±-...Õ.RP 0001A0
 7500003D DE468914 C4830000 36189A00 6A0676FF 0876FF0A 76FF0C76 FF5E8968 h.^.v..v..v..v.j...6...á..F8=..u 0001C0
 35E89A50 16EC4680 006A006A 006A7777 FF267977 FF260A5E C4000FE9 0003E903 .Õ..ÕÕ.á^.&.wy&.wwj.j.j..F&.P.Õ5 0001E0
```

```
Dump of file SATURN:[PCCOMMON.DUMP.DLL]SA-DIFM.DLL;1 on 18-APR-1990 10:50:26.92
File ID (450,15,0)   End of file block 323 / Allocated 324

Virtual block number 168 (000000A8), 512 (0200) bytes

6A016A00 6A7777FF 267977FF 260A5EC4 00B6E900 03E90375 0000300E 46890000 ...FB=..u.Õ..ÕÑ.á^.&.wy&.wwj.j.j 000000
EC468D00 83E9008C E90003E9 03750000 3DDE4689 00003645 9AF476FF F676FF00 ..v-.v¶.E6...FB=..u.Õ..Õ..Õ...F§ 000020
8914C483 00003052 9A006A06 76FF0876 FF0A76FF 0C76FF5E 8968016A 006A5016 .Pj.j.h.^.v..v..v..v.j..RO...á.. 000040
76FF006A 006A006A 7777FF26 7977FF26 0A5EC400 59E90003 E9037500 003DDE46 FB=..u.Õ..ÕY.á^.&.wy&.wwj.j.j..v 000060
FF267977 FF260A5E C4002FE9 0003E903 7500003D DE468900 00366E9A F476FFF6 -.v¶.ná...FB=..u.Õ..Õ/.á^.&.wy&. 000080
0006E900 03E90375 00003DDE 46890000 16829A50 16EC4680 006A016A 006A7777 wwj.j.j..F§.P.ý....FB=..u.Õ..Õ.. 0000A0
0031719A 016A7777 FF267977 FF260A5E C400000E 47C7260A 5EC40021 E90000B8 |..Õl.á^.&úG...á^.&.wy&.wwj..q1. 0000C0
4689FA46 890000B8 D8BE33ED B81E5657 000036C8 CBC95F5E 1F0000E9 DE468B00 ..FBÕ...^_èùàó..WV.|Ú3.Ä|...F*.F 0000E0
C4260A5E C4FE5689 FC4689FE 578B26FC 478B260E 5EC4040E 46830000 CA46C7F8 ¾úFò...F..á^.&.G=&.W±.F=.V±á^.&á 000100
896B578B 2669478B 26065FC4 260A5EC4 DE56890C 46896557 8B266347 8B26065F  .&.Gc&.We.FÉ.VBá^.&á_.&.Gi&.Wk. 000120
6A0676FF 0876FF5D CA68F256 89F04689 2E578B26 2C478B26 F45EC4F6 5689F446 F¶.V-á^¶&.G,&.W..Fþ.V¯hò].v..v.j 000140
E90374F2 460BF046 8B0133E9 0003E903 7500003D CA468908 C4830000 37589A00 ..X7...á..Fò=..u.Õ..Õ3..Fþ.F·t.Õ 000160
890CC483 00003492 9A006A67 77FF2669 77FF260A 5EC45DC0 685016CC 46800079 y..Fä.Phâ]á^.&.wi&.wgj...4...á.. 000180
08C48325 7000C59A FC76FFFE 76FF5016 CC468D00 FDE90003 E9037500 003DCA46 Fò=..u.Õ..Õ»..Fä.P.v±.v=.é.p%.á. 0001A0
FF0C76FF FC76FFFE 76FFF076 FFF276FF 016A000C E90003E9 03750000 3DCA4689 .Fò=..u.Õ..ÕÉ.j..v·.vþ.v±.v=.v.. 0001C0
7401F07E 830088E9 00B2E900 03E90375 00003DCA 46890EC4 831CF600 2D9A0A76 v..-.-..á..Fò=..u.Õ..Õý.Õ...~þ.t 0001E0

Dump of file SATURN:[PCCOMMON.DUMP.DLL]SA-DIFM.DLL;1 on 18-APR-1990 10:50:26.92
File ID (450,15,0)   End of file block 323 / Allocated 324

Virtual block number 169 (000000A9), 512 (0200) bytes

6F77FF26 7177FF26 0A5EC45D C0685016 E0468D00 76E90374 00F27E83 007FE903 .Õ...-·.t.Õv..FÅ.Phâ]á^.&.wq&.wo 000000
FE76FF50 16E0468D 0072E900 03E90375 00003DCA 46890CC4 83000038 4F9A006A j..O8...á..Fò=..u.Õ..Õr..FÅ.P.v± 000020
76FFF276 FF016A00 51E90003 E9037500 003DCA46 8908C483 377B00C5 9AFC76FF .v=.é.(7.á..Fò=..u.Õ..ÕQ.j..v·.v 000040
0003E903 7500003D CA46890E C48337A5 002D9A0A 76FF0C76 FFFC76FF FE76FFF0 þ.v±.v=.v..v..·.É7.á..Fò=..u.Õ.. 000060
03E90375 00003DCA 468908C4 83000037 229A006A 0676FF08 76FF5DCA 680027E9 Õ'.hò].v..v.j.."7...á..Fò=..u.Õ. 000080
016A7777 FF267977 FF260A5E C400000E 47C7260A 5EC40021 E90000B8 0006E900 .Õ..|..Õl.á^.&úG...á^.&.wy&.wwj. 0000A0
00E446C7 D88E36B4 B81E5657 00001CC8 CBC95F5E 1F0000E9 CA468B00 00369D9A ..6...FòÕ...^_èùà...WV.|Ç6.ÄúFÕ. 0000C0
578B2663 478B2606 5FC4260A 5EC4EE56 89EC4689 7D578B26 7B478B26 0A5EC400 .á^.&.G(&.W).F§.VŸá^.&á_.&.Gc&.W 0000E0
040E4683 F25689F0 4689FE57 8B26FC47 8B260E5E C4040E46 83E85689 E6468965 e.F|.VÒ.F..á^.&.G=&.W±.Fþ.V·.F.. 000100
89FC4689 08578B26 06478B26 0A5EC4F6 5689F446 89FE578B 26FC478B 260E5EC4 á^.&.G=&.W±.F¶.V-á^.&.G.&.W..F=. 000120
34479A50 52007705 0C5688OA 468BE676 FFE876FF EA468967 478B26FC 5EC4FE56 V±á^=&.Gg.FÕ.vÒ.v|.F..V..w.RP.G4 000140
76FF7777 FF267977 FF260A5E C401CAE9 E4468B00 06E90375 00003DE4 46890000 ...FÕ=..u.Õ...FÕÕò.á^.&.wy&.ww.v 000160
5DCE68F0 76FFF276 FF0185E9 0003E903 7500003D E4468900 00346E9A 0676FF08 ..v..n4...FÕ=..u.Õ..Õ...v·.vþhö] 000180
5EC4015E E90003E9 03750000 3DE44689 0CC48300 003AC19A 006A0676 FF0876FF .v..v.j..ê:...á..FÕ=..u.Õ..Õ^.á^ 0001A0
3DE44689 000034C1 9A5016F8 468D7B77 FF267D77 FF260A5E C400010E 47C7260A .&úG...á^.&.w)&.w(.F½.P.ê4...FÕ= 0001C0
DA830002 2DFA568B F8468B00 48E90374 F6460BF4 46880132 E90003E9 03750000 ..u.Õ..Õ2..F¶.F-t.ÕH..F½.V*-...Õ 0001E0

Dump of file SATURN:[PCCOMMON.DUMP.DLL]SA-DIFM.DLL;1 on 18-APR-1990 10:50:26.92
File ID (450,15,0)   End of file block 323 / Allocated 324

Virtual block number 170 (000000AA), 512 (0200) bytes

76FF0C76 FFF476FF F676FF02 6A006A00 2CE90374 F6563B00 34E90374 F4463B00 .;F¶t.Õ4.;V-t.Õ,.j.j..v-.v¶.v..v 000000
F4468B00 B8E900E2 E90003E9 03750000 3DE44689 0EC4833A 1E07969A EA76FF0A ..vÕ....:.á..FÕ=..u.Õ..Õä.Õ|..F¶ 000020
3A6E0796 9AEA76FF 0A76FF0C 76FFF476 FFF676FF 036A006A 002CE903 74F6460B .F-t.Õ,.j.j..v-.v¶.v..v..vÕ...n: 000040
00DA8300 022DFA56 8BF8468B 0081E900 ABE90003 E9037500 003DE446 890EC483 .á..FÕ=..u.Õ..Õ¨.Õ...F½.V*-...Õ. 000060
00DA8300 012DF656 8BF4468B 036A006A 0034E903 74F6563B 003CE903 74F4463B ;F¶t.Õ<.;V-t.Õ4.j.j..F¶.V--...Õ. 000080
5BE90003 E9037500 003DE446 890EC483 3AA20796 9AEA76FF 0A76FF0C 76FF5052 RP.v..v..vÕ...Å:.á..FÕ=..u.Õ..Õ[ 0000A0
9AEA76FF 0A76FF0C 76FF5052 00DA8300 012DF656 8BF4468B 046A006A 0031E900 .Õ1.j.j..F¶.V--...Õ.RP.v..v..vÕ. 0000C0
006A0676 FF0876FF 5DCA6800 27E90003 E9037500 003DE446 890EC483 38300796 ..08.á..FÕ=..u.Õ..Õ'.hò].v..v.j. 0000E0
260A5EC4 0021E900 00B80006 E90003E9 03750000 3DE44689 08C48300 0037E39A .07...á..FÕ=..u.Õ..Õ..|..Õl.á^.& 000100
5F5E1F00 00E9E446 8B000038 819A016A 7777FF26 7977FF26 0A5EC400 000E47C7 úG...á^.&.wy&.wwj...8...FÕÕ...^_ 000120
040E4683 F44689F6 46890000 B80000EA 46C7D88E 3898B81E 56570000 18C8CBC9 èùà...WV.|.8.ÄúFÕ..|...F-.F¶.F.. 000140
89FC4689 08578B26 06478B26 0A5EC4FA 5689F846 89FE578B 26FC478B 260E5EC4 á^.&.G=&.W±.F½.V*á^.&.G.&.W..F=. 000160
46896857 8B266947 8B26FC5E C4EE5689 EC468965 578B2663 478B26FC 5EC4FE56 V±á^=&.Gc&.We.F§.VŸá^=&.Gi&.Wk.F 000180
E9037500 003DEA46 8908C483 00003BD3 9A006A06 76FF0876 FF5DCA68 F25689F0 þ.V·hò].v..v.j..Æ;...á..FÕ=..u.Õ 0001A0
77FF2669 5FC426FC 5EC4E876 FFE84689 1A478B26 695FC426 FC5EC400 69E90003 ..Õl.á^=&á_i&.G..FÒ.vÒá^=&á_i&.w 0001C0
7500003D EA46890E C48339E7 0A419A0A 76FF0C76 FFF876FF FA76FF2C 77FF262E .&.w,.v*.v¼.v..v..A.Ó9.á..FÕ=..u 0001E0
```

```
Dump of file SATURN:[PCCOMMON.DUMP.DLL]SA-DIFM.DLL;1 on 18-APR-1990 10:50:26.92
File ID (450,15,0)   End of file block 323 / Allocated 324

Virtual block number 171 (000000AB), 512 (0200) bytes

 00003DEA 468908C4 83000039 699A006A 0676FF08 76FF5DCA 680027E9 0003E903 .Õ..Õ'.hò].v..v.j..i9...á..Fõ=.. 000000
 FF267977 FF260A5E C400000E 47C7260A 5EC40021 E9000088 0006E900 03E90375 u.Õ..Õ..¡..Õ!.á^.&úG...á^.&.wy&. 000020
 D88E380A 881E5657 00005CC8 CBC95F5E 1F0000E9 EA468800 003AF39A 016A7777 wwj..ø:...Fõõ...^_èùà\..WV.¡.;.Ä 000040
 57882606 4788260A 5EC40000 AC46C7D8 56890646 897D5788 26784788 260A5EC4 á^.&.G(&.W).Fø.VÄüF¯..á^.&.G.&.W 000060
 26634788 26FC5EC4 EE5689EC 46896857 88266947 8826FC5E C4FE5689 FC468908 ..F=.V±á^=&.Gi&.Wk.F§.VÝá^=&.Gc& 000080
 4688DC56 89DA4689 FE578826 FC478826 0E5EC404 0E468380 5689AE46 89655788 .We.FÛ.V¯.F..á^.&.G=&.W±.FÖ.VÉ.F 0000A0
 478826EC 5EC4DC56 89DA4689 79578826 77478826 0A5EC400 11E90374 DC4608DA Ö.FÉt.Õ..á^.&.Gw&.Wy.FÖ.VÉá^$&.G 0000C0
 003DAC46 89000039 989A5016 E8468D06 76FF0876 FFE65689 E4468926 57882624 $&.W&.Fõ.VÌ.vÄ.vø.FÖ.P..9...F¯=. 0000E0
 00028300 0105E656 18E4462B 2A578826 28478826 EC5EC403 A5E90003 E9037500 .u.Õ..ÕE.á^$&.G(&.W*+Fõ.VÌ....ø. 000100
 00008802 38E90377 01D27E83 0009E903 7E0246E9 037D0004 7E830456 89D24689 .Fø.Vå.~å.).ÕF.~.Õ...~ø.w ¯8.¡.. 000120
 A4468D00 6A006A00 6ADA76FF DC76FF00 A3E90374 E64608E4 4688DE46 89E04689 .FÄ.Fø.Fõ.FÌt.ÕÈ..vÉ.vÖj.j ¨..FÈ 000140
 0A5EC45D C0685016 82468D03 39E90003 E9037500 003DAC46 8900003D F19A5016 .P.þ=...F¯=..u.Õ..Õ9..Fý.Phä¡á^. 000160
 030EE900 03E90375 00003DAC 46890CC4 8300003B 709A006A 6777FF26 6977FF26 &.wi&.wgj..p;...á..F¯=..u.Õ..Õ.. 000180
 02EEE900 03E90375 00003DAC 468908C4 83380600 C59A5016 A4468D50 16824680 .Fý.P.FÈ.P.é..8.á..F¯=..u.Õ..ÕŸ. 0001A0
 03E90375 00003DAC 46890000 27BE9A50 16A4468D 7F77FF26 0081B7FF 260A5EC4 á^.&.ñ..&.w..FÈ.P.ƒ'...F¯=..u.Õ. 0001C0
 000A8300 0220D456 88D2468B 00E05683 01DE4683 00E65683 01E44683 02CAE900 .Õò..Fõ..VÌ..Fø..VÁ..Fø.Vå-...Õ. 0001E0
```

```
Dump of file SATURN:[PCCOMMON.DUMP.DLL]SA-DIFM.DLL;1 on 18-APR-1990 10:50:26.92
File ID (450,15,0)   End of file block 323 / Allocated 324

Virtual block number 172 (000000AC), 512 (0200) bytes

 76FFE076 FFDA76FF DC76FF00 5FE90377 DE463B00 08E9037E 006CE903 7DE0563B ;VÄ).Õl.~.Õ..;Fßw.Õ_..vÉ.vÖ.vÄ.v 000000
 0003E903 7500003D AC468900 003E649A 5016F446 8D006A00 E0568301 DE4683DE ß.Fß..VÄ.j..F¶.P.d>¯...F¯=..u.Õ.. 000020
 BE9A5016 F4468D00 6A00E656 8301E446 83E476FF E676FFD6 76FFD876 FF0268E9 Õk..vÄ.vø.vÌ.vÖ.Fõ..VÌ.j..F¶.P.ƒ 000040
 000A8300 012DEA56 88E8468B FF80E902 3DE90003 E9037500 003DAC46 89000035 5...F¯=..u.Õ..Õ=.Õ...FÖ.Võ-...Õ. 000060
 4680006A DE76FFE0 76FFDA76 FFDC76FF 0099E903 74E6563B 00A1E903 74E4463B ;Fôt.ÕÄ.;VÌt.Õ...vÉ.vÖ.vÄ.vßj..F 000080
 5EC45DC0 68501682 468D01F8 E90003E9 03750000 3DAC4689 0000278F 9A5016A4 È.P..'...F¯=..u.Õ..Õ%..Fý.Phä]á^ 0000A0
 CDE90003 E9037500 003DAC46 890CC483 00003FA3 9A006A6F 77FF2671 77FF260A .&.wq&.woj..È?...á..F¯=..u.Õ..Õë 0000C0
 ADE90003 E9037500 003DAC46 8908C483 3D6D00C5 9A5016A4 468D5016 82468D01 ..Fý.P.FÈ.P.é.m=.á..F¯=..u.Õ..ÕÙ 0000E0
 03750000 3DAC4689 00003092 9A5016A4 468D0083 B7FF2600 85B7FF26 0A5EC401 .á^.&.ñ..&.ñ...FÈ.P..=...F¯=..u. 000100
 003D239A 5016F446 8D006ADE 76FFE076 FFDA76FF DC76FF00 4CE90188 E90003E9 Õ..Õ..ÕL..vÉ.vÖ.vÄ.vßj..F¶.P.#=. 000120
 F4468D00 6AE476FF E676FFD6 76FFD876 FF015FE9 0003E903 7500003D AC468900 ..F¯=..u.Õ..Õ_..vÄ.vø.vÌ.vÖj..F¶ 000140
 3BB403FC 9A0A76FF 0C76FF01 39E90003 E9037500 003DAC46 8900003E 1F9A5016 .P..>...F¯=..u.Õ..Õ9..v..v..=.Ç; 000160
 56880A46 885016C2 468D5016 E2468D01 1DE90003 E9037500 003DAC46 8904C483 .á..F¯=..u.Õ..Õ...Fã.P.Fô.P.F..V 000180
 8918C483 00003558 9A006A06 76FF0876 FF0A76FF 0C76FF5E 99685052 0014050C ....RPh.^.v..v..v..v.j..X5...á.. 0001A0
 7377FF26 7577FF26 0A5EC45F 51685016 C2468D00 E1E90003 E9037500 003DAC46 F¯=..u.Õ..ÕÄ..Fô.PhQ_á^.&.wu&.ws 0001C0
 46800A76 FFDC76FF 00B6E900 03E90375 00003DAC 46890CC4 83000030 4B9A006A j..K=...á..F¯=..u.Õ.¯ÕÑ..vÉ.vÖ.F 0001E0
```

```
Dump of file SATURN:[PCCOMMON.DUMP.DLL]SA-DIFM.DLL;1 on 18-APR-1990 10:50:26.92
File ID (450,15,0)   End of file block 323 / Allocated 324

Virtual block number 173 (000000AD), 512 (0200) bytes

 DC76FF00 1BE9F256 89F04689 000A8300 02200456 88D2468B 00003CB7 9A501602 ø.P.ñ<...Fø.Vå-...Õ..Fþ.V·Õ...vÉ 000000
 11E9037D 00F27E83 0000351D 9A006A00 F25E8301 F06E83F0 76FFF276 FFDA76FF .vÖ.v·.vþ.nþ..^·.j...5...~·.).Õ. 000020
 24478926 26478926 000088EC 5EC4FFCB E90003E9 037301F0 7E830009 E9037E00 .~.Õ...-þ.s.Õ..Õù.á^$¡..&.G&&.G$ 000040
 260A5EC4 2C478926 2E478926 000088EC 5EC42847 89262A47 89260000 88EC5EC4 á^$¡..&.G*&.G(á^$¡..&.G.&.G,á^.& 000060
 C40030E9 AC468800 06E90375 00003DAC 46890000 3C059A01 6A7777FF 267977FF .wy&.wwj...<...F¯=..u.Õ...F¯Õ0.á 000080
 FF267977 FF260A5E C400000E 47C7260A 5EC40021 E9000088 00000E47 C7260A5E ^.&úG...¡..Õ!.á^.&úG...á^.&.wy&. 0000A0
 D88E3C1C 881E5657 00002EC8 CBC95F5E 1F0000E9 AC468800 00404A9A 016A7777 wwj..Jə...F¯Õ...^_èùà...WV.¡.<.Ä 0000C0
 5FC4260A 5EC4FE56 89FC4689 FE578826 FC478826 0E5EC404 0E468300 000246C7 úFø...F..á^.&.G=&¯W±.F=.V±á^.&á_ 0000E0
 0A5EC4E4 46896747 8826065F C4260A5E C4EE5689 EC46896B 57882669 47882606 .&.Gi&.Wk.F§.VÝá^.&á_.&.Gg.Fõá^. 000100
 D2468800 06E90375 00003D02 46890000 3FC49A50 16E84680 7B77FF26 7D77FF26 &.w)&.w(.FÒ.P.á?...F¯ø=..u.Õ...Fø 000120
 012DEA56 88E84688 00FA5683 01F84683 0008E900 00FA46C7 0001F846 C70210E9 Õ..úF%..úF°..Õ...F%..V°..FÒ.Võ-. 000140
 7D77FF26 0A5EC400 1BE90377 F8463B00 08E9037E 0028E903 7DFA563B 000A8300 ..Õ.;V°).Õ(.~.Õ..;F%w.Õ..á^.&.w) 000160
 9A5016E8 4680FC76 FFFE76FF FFBCE900 003FF49A 006AF876 FFFA76FF 7B77FF26 &.w(.v°.v%j..¶?..Õ¥..v±.v=.FÒ.P. 000180
 6A006A00 6AFC76FF FE76FF01 ABE90246 880006E9 03750000 3DD24689 0000FFFF .....Fø=..u.Õ...FøÕ¨..v±.v=j.j.j 0001A0
 260A5EC4 0184E902 46880006 E9037500 003D0246 89000041 F29A5016 F0468D00 ..Fþ.P.·A...Fø=..u.Õ...FøÕ..á^.& 0001C0
 6A006A00 19E90375 00003D02 46890000 421A9A50 16F0468D 7F77FF26 008187FF .ñ..&.w..Fþ.P..B...Fø=..u.Õ..j.j 0001E0
```

```
Dump of file SATURN:[PCCOMMON.DUMP.DLL]SA-DIFM.DLL;1 on 18-APR-1990 10:50:26.92
File ID (450,15,0)   End of file block 323 / Allocated 324

Virtual block number 174 (000000AE), 512 (0200) bytes

 8BE84688 FC76FFFE 76FF0000 423B9A20 6A006A03 EA681E04 09681E01 6A006A01 .j.j..h...hõ.j.j .;B...v±.v=.FÒ. 000000
 06E90375 00003DD2 46890000 42899A50 16F0468D 006A5052 00DA8300 012DEA56 Vö-...Ö.RPj..FÞ.P..B...F@=..u.Ö. 000020
 463B0000 3ED49A50 16F0468D 0083B7FF 260085B7 FF260A5E C40119E9 D2468B00 ..FØÖ..á^.&.ñ..&.ñ...FÞ.P.á>..;F 000040
 C7000026 499A206A 006A040A 681E042E 681E016A 006A016A 006A0019 E90374D2 Øt.Ö..j.j.j.j..h...h..j.j .I&..ú 000060
 00DA8300 012DEA56 8BE84688 00FA5683 01F84683 0008E900 00FA46C7 0001F846 F½..úF*..Ö...F½..V*..FÒ.Vö-...Ö. 000080
 76FFFA76 FFFC76FF FE76FF00 38E90377 F8463B00 08E9037E 0045E903 7DFA563B ;V*).ÖE.-.Ö..;F¼w.Ö8..v±.v=.v*.v 0000A0
 006AF876 FFFA76FF 7B77FF26 7D77FF26 0A5EC400 00FFFF9A 5016F046 8D006AF8 ½j..FÞ.P.....á^.&.w)&.w(.v*.v½j. 0000C0
 0014050C 568B0A46 8B501604 46805016 E6468DFF 9FE90000 2E139A50 16F0468D .FÞ.P.....Ö...Fl.P.Få.P.F..V.... 0000E0
 003DD246 8918C483 00003F78 9A006A06 76FF0876 FF0A76FF 0C76FF5E 99685052 RPh.^.v..v..v..v.j..x?...á..F@=. 000100
 6A7377FF 267577FF 260A5EC4 5F516850 16044680 0034E9D2 46880006 E9037500 .u.Ö...FØÖ4..Få.PhQ_á^.&.wu&.wsj 000120
 0000E900 00B80006 E9D2468B 0006E903 7500003D D246890C C4830000 3E8C9A00 ...>...á..F@=..u.Ö...FØÖ..|..Ö.. 000140
 478B260E 5EC4040E 46830000 FA46C7D8 8E409CB8 1E565700 000EC8CB C95F5E1F .^_èùà...WV.|.ð.ÄúF*...F..á^.&.G 000160
 F85689F6 4689FE57 8B26FC47 8B260E5E C4040E46 83F45689 F24689FE 578B26FC =&.W±.F·.V¶.F..á^.&.G=&.W±.F-.V½ 000180
 FFF276FF F476FFFC 76FFFE76 FF08C483 3F3E0000 9A0A76FF 0C76FF50 16FC468D .F=.P.v..v....>?.á..v±.v=.v¶.v·. 0001A0
 B81E5657 000004C8 CBC95F5E 1F0000E9 FA468BFA 46890000 FFFF9AF6 76FFF876 v½.v-.......F*.F*Ö...^_èùà...WV.| 0001C0
 7D77FF26 0A5EC4FE 5689FC46 89FE578B 26FC478B 260E5EC4 040E4683 D88E432D -C.Ä.F..á^.&.G=&.W±.F=.V±á^.&.w) 0001E0

Dump of file SATURN:[PCCOMMON.DUMP.DLL]SA-DIFM.DLL;1 on 18-APR-1990 10:50:26.92
File ID (450,15,0)   End of file block 323 / Allocated 324

Virtual block number 175 (000000AF), 512 (0200) bytes

 000024C8 CBC95F5E 1F0000E9 0000B800 00FFFF9A FC76FFFE 76FF036A 7B77FF26 &.w(j..v±.v=.....|..Ö...^_èùà$.. 000000
 578B26FC 478B260E 5EC4040E 46830000 E446C700 00EA46C7 D88E43A0 881E5657 WV.|.C.ÄúFõ..úFÖ...F..á^.Ē.G=&.W 000020
 040E4683 DE5689DC 4689FE57 8B26FC47 8B260E5E C4040E46 83F65689 F44689FE ±.F¶.V-.F..á^.&.G=&.W±.FÉ.VB.F.. 000040
 FE578B26 FC478B26 0E5EC404 0E4683F2 5689F046 89FE578B 26FC478B 260E5EC4 á^.&.G=&.W±.FÞ.V·.F..á^.&.G=&.W± 000060
 8B266347 8B26F85E C4FA5689 F8468908 578B2606 478B260A 5EC4E256 89E04689 .FÁ.Väá^.&.G.&.W..F½.V*á^½&.Gc&. 000080
 76FFE876 FF08C483 436E0000 9A0A76FF 0C76FF50 16FC468D E85689E6 46896557 We.Fl.VÒ.F=.P.v..v....nC.á..vÒ.v 0000A0
 76FFF076 FFF276FF 5016EC46 8DDC76FF DE76FFF4 76FFF676 FFFC76FF FE76FFE6 l.v±.v=.v-.v¶.vB.vÉ.F§.P.v·.vÞ.v 0000C0
 E4881E56 57000024 C8CBC95F 5E1F0000 E9E4468B E4468900 00FFFF9A E076FFE2 ã.vÁ......Fõ.FØÖ...^_èùà$..WV.|ð 0000E0
 89F04689 FE578B26 FC478B26 0E5EC404 0E468300 00E046C7 0000E646 C7D88E43 C.ÄúFl..úFÁ...F..á^.Ē.G=&.W±.FÞ. 000100
 8B260E5E C4040E46 83EE5689 EC4689FE 578B26FC 478B260E 5EC4040E 4683F256 V·.F..á^.&.G=&.W±.F§.VŸ.F..á^.&. 000120
 5689F846 89FE578B 26FC478B 260E5EC4 040E4683 FE5689FC 4689FE57 8B26FC47 G=&.W±.F=.V±.F..á^.&.G=&.W±.F½.V 000140
 578B2606 478B260A 5EC4DE56 89DC4689 FE578B26 FC478B26 0E5EC404 0E4683FA *.F..á^.&.G=&.W±.FÉ.VBá^.&.G.&.W 000160
 267D77FF 260A5EC4 E45689E2 46896557 8B266347 8B26F45E C4F65689 F4468908 ..F¶.V-á^¶&.Gc&.We.Fã.VÖá^.&.w)& 000180
 EC76FFEE 76FFFC76 FFFE76FF 5016E846 8DDC76FF DE76FFF0 76FFF276 FF7B77FF .w(.v·.vÞ.vB.vÉ.FÒ.P.v±.v=.vŸ.vš 0001A0
 1E565700 001CC8CB C95F5E1F 0000E9E0 468BE046 89000017 F59AF876 FFFA76FF .v*.v½.Ж....FÁ.FÁÖ...^_èùà...WV. 0001C0
 C4040E46 83FE5689 FC468908 578B2606 478B260A 5EC40000 E846C7D8 8E44BFB8 |¢D.ÄúFÒ..á^.&.G.&.W..F̄=.V±.F..á 0001E0

Dump of file SATURN:[PCCOMMON.DUMP.DLL]SA-DIFM.DLL;1 on 18-APR-1990 10:50:26.92
File ID (450,15,0)   End of file block 323 / Allocated 324

Virtual block number 176 (000000B0), 512 (0200) bytes

 31599A00 6A7377FF 267577FF 260A5EC4 E65689E4 4689FE57 8B26FC47 8B260E5E ^.&.G=&.W±.Fõ.V|á^.&.wu&.wsj..Y1 000000
 8B0A4688 E476FFE6 76FF00B7 E9E8468B 0006E903 7500003D E8468906 C4830000 ...á..FÒ=..u.Ö...FÒÖñ..vl.vö.F.. 000020
 050C5688 0A468850 16EA468D 5016FA46 8D08C483 2F050056 9A505200 14050C56 V....RP.V.{/.á..F*.P.Fõ.P.F..V.. 000040
 E8468918 C4830000 42049A00 6A0676FF 0876FF0A 76FF0C76 FF5E9968 50520014 ..RPh.^.v..v..v..v.j..åB...á..FÒ 000060
 EA468DFA 76FF4B6A 006A0676 FF0876FF 006A005F E9E8468B 0006E903 75000030 =..u.Ö...FÒÖ_.j..v..v.j.jK.v*.Fõ 000080
 8BFC76FF FE76FF00 6A006A50 52001405 0C568B0A 468B1E6A 006A006A 006A5016 .Pj.j.j.j..F¯.V....RPj.j..v±.v=. 0000A0
 06E90375 000030E8 46892CC4 83000030 949A006A 786A5052 0073050C 56880A46 F..V..s.RPjxj...O...á,.FÒ=..u.Ö. 0000C0
 4683D88E 45A1B81E 56570000 08C8CBC9 5F5E1F00 00E90000 B80006E9 E8468B00 ..FÒÖ..|..Ö...^_èùà...WV.|ÅE.Ã.F 0000E0
 8B26FC47 8B260E5E C4040E46 83FE5689 FC4689FE 578B26FC 478B260E 5EC4040E ..á^.&.G=&.W±.F̄=.V±.F..á^.&.G=&. 000100
 74008197 39260015 E903747F 473926FE 568BFC46 8B0A5EC4 FA5689F8 4689FE57 W±.F½.V*á^..F=.V±&9G.t.Ö..&9...t 000120
 E9037400 83873926 FE568BFC 46880A5E C4002EE9 000007C7 26F85EC4 0008E903 .Ö..á^½&ú...Ö..á^..F=.V±&9...t.Ö 000140
 0000B800 06E90001 B80006E9 000107C7 26F85EC4 0008E903 74008597 39260015 ..&9...t.Ö..á^½&ú...Ö..|..Ö..|.. 000160
 0E5EC404 0E468300 00FA46C7 D88E468A B81E5657 000006C8 CBC95F5E 1F0000E9 Ö...^_èùà...WV.|¤F.ÄúF*...F..á^. 000180
 9AFC76FF FE76FF7B 77FF267D 77FF260A 5EC4FE56 89FC4689 FE578B26 FC478B26 &.G=&.W±.F=.V±á^.&.w)&.w(.v±.v=. 0001A0
 46C7D88E 4750B81E 56570000 0AC8CBC9 5F5E1F00 00E9FA46 8BFA4689 000040EE Y@...F*.F*Ö...^_èùà...WV.|PG.ÄúF 0001C0
 260E5EC4 040E4683 FA5689F8 4689FE57 8B26FC47 8B260E5E C4040E46 830000F6 -...F..á^.&.G=&.W±.F½.V*.F..á^.& 0001E0
```

```
Dump of file SATURN:[PCCOMMON.DUMP.DLL]SA-DIFM.DLL;1 on 18-APR-1990 10:50:26.92
File ID (450,15,0)   End of file block 323 / Allocated 324

Virtual block number 177 (00000081), 512 (0200) bytes

 006AF876 FFFA76FF 7B77FF26 7D77FF26 0A5EC4FE 5689FC46 89FE5788 26FC4788 .G=&.W±.F=.V±é^.&.w)&.w(.v'.v½j. 000000
 1E565700 0008C8C8 C95F5E1F 0000E9F6 4688F646 8900003E FD9AFC76 FFFE76FF .v±.v=.»>...F-.F-Ö...^_èùà...WV. 000020
 260E5EC4 040E4683 FA4689FE 4788260E 5EC4020E 46830000 F846C7D8 8E479A88 ¡.G.ÄúF½...F..é^.&.G±.F'.F..é^.& 000040
 FF260081 87FF260A 5EC4001D E9037400 FA7E83FE 5689FC46 89FE5788 26FC4788 .G=&.W±.F=.V±.-'.t.Ö..é^.&.ñ..&. 000060
 260A5EC4 001BE903 7401FA7E 830024E9 F8468900 0048709A FC76FFFE 76FF7F77 w..v±.v=.pH...F½Ö$..-'.t.Ö..é^.& 000080
 5F5E1F00 00E9F846 88F84689 000010E3 9AFC76FF FE76FF00 83B7FF26 008587FF .ñ..&.ñ...v±.v=.D....F½.F½Ö...^  0000A0
 F84689FE 578826FC 4788260E 5EC4040E 46830B8E 4801881E 56570000 08C8C8C9 èùà...WV.¡.H.Ä.F..é^.&.G=&.W±.F½ 0000C0
 26784788 260A5EC4 FE5689FC 4689FE57 8826FC47 88260E5E C4040E46 83FA5689 .V'.F..é^.&.G=&.W±.F=.V±é^.&.G(& 0000E0
 C8C95F5E 1F0000E9 00008800 0307C726 FC5EC402 57892607 8926F85E C47D5788 .W)é^½&..&.W.é^=&ú...¡..Ö...^_èù 000100
 5689F046 89FE5788 26FC4788 260E5EC4 040E4683 D88E488A 881E5657 000016C8 à...WV.¡.H.Ä.F..é^.&.G=&.W±.FÞ.V 000120
 46880A5E C40000EA 46C7FA56 89F84689 FE578826 FC478826 0E5EC404 0E4683F2 ·.F..é^.&.G=&.W±.F½.V'úFõ..é^..F 000140
 FC5EC4FE 5689FC46 89085788 26064788 260A5EC4 75578926 73478926 F25688F0 Þ.V·&.Gs&.Wué^.&.G.&.W..F=.V±é^= 000160
 468906C4 8349A300 009AFC76 FFFE76FF 136AF656 89F44689 06578826 04478826 &.G.&.W..F¶.V-j..v±.v=...ÈI.é..F 000180
 77FF2661 77FF260A 5EC4F476 FFF676FF 0098E9EA 46880006 E9037500 EA7E83EA õ.-õ.u.Ö...Fõõ...v-.v¶é^.&.wa&.w 0001A0
 FC76FFFE 76FF0044 E9037500 EA7E83EA 46890000 12CB9AF8 76FFFA76 FF016A5F _j..v'.v½.ù....Fõ.-õ.u.ÕO..v±.v= 0001C0
 2F681E00 00FFFF9A 5016EC46 8D6377FF 266577FF 26FC5EC4 04C4834A 0000649A ¯d..J.é.é^=&.we&.wc.Fš.P......h/ 0001E0

Dump of file SATURN:[PCCOMMON.DUMP.DLL]SA-DIFM.DLL;1 on 18-APR-1990 10:50:26.92
File ID (450,15,0)   End of file block 323 / Allocated 324

Virtual block number 178 (00000082), 512 (0200) bytes

 76FF002A E9EA4688 0EC48300 00FFFF9A EC76FFEE 76FFEA76 FFF876FF FA76FF04 ..v'.v½.võ.vŸ.vš......é..Fõõ*..v 000000
 00649AFC 76FFFE76 FF08C483 460A0056 9A505200 14050C56 880A4688 F876FFFA '.v½.F..V....RP.V..F.é..v±.v=.d. 000020
 0E5EC404 0E46830B 8E48E888 1E565700 0004C8CB C95F5E1F 0000E904 C4833EAE Û>.é.Ö...^_èùà...WV.¡ÒH.Ä.F..é^. 000040
 26078926 FC5EC475 57882673 4788260A 5EC4FE56 89FC4689 FE578826 FC478826 &.G=&.W±.F=.V±é^.&.Gs&.Wué^=&..& 000060
 08568806 4688088E 4A15881E 56570000 00C8C8C9 5F5E1F00 00E90000 88025789 .W.¡..Ö...^_èùà...WV.¡.J.Ä.F..V. 000080
 88265F47 8826065E C4088E4A 56881E56 57000000 C8C8C95F 5E1F0000 E9000205 ...Ö...^_èùÃ...WV.¡VJ.Äé^.&.G_&. 0000A0
 7668596A FFFF684A 9F68D88E 4A73881E 56570000 00C8C8C9 5F5E1F00 00E96157 WaÕ...^_Èùà...WV.¡sJ.Äh.Jh..jŸhv 0000C0
 C4830000 FFFF9A00 6A776A01 6A006A00 6A008768 0430681E 026A766A FFFF6844 Dh..jvj¯.h0.h..j.j.j.jwj.......é 0000E0
 29180203 08990000 19510203 08800010 4ABA0203 003090C8 C95F5E1F 0000E91E .Õ...^_èù.=...¤J......Q........) 000100
 498A0203 07220000 47E70203 061F000D 24A60203 07980000 2DA60203 01410008 ..A...Ť-.......Ï$......ÓG.."....I 000120
 43020203 00000004 31AB0002 06A6000D 391E0203 4A680009 4A9A0005 00CB0008 ..û....J..kJ...9..Ï...¨1.......C 000140
 0FC60203 0A9E000F 44A50203 06200000 31840203 01550008 30FF0203 08930010 .......0..U...1..-...ÈD......6. 000160
 292F0203 06850000 40850203 0A24000F 32800203 0732000D 42A60203 00070008 ..■...ÌB..2...¯2..$....ə..ç.../) 000180
 32C50203 07400000 3F230203 00000009 4A970002 06380000 1FCC0203 01610008 ..e...ë...;....J.......#?..ə...é2 0001A0
 13430203 0AB4000F 32890203 06C40000 26690203 00880004 41D20103 0A31000F ..1...@A......i&..é....2..Ç...C. 0001C0
 22B40203 00000000 49590002 08B30010 468F0203 06480000 25990203 00F00008 ..Þ....X..H....F..*...YI......Ç" 0001E0

Dump of file SATURN:[PCCOMMON.DUMP.DLL]SA-DIFM.DLL;1 on 18-APR-1990 10:50:26.92
File ID (450,15,0)   End of file block 323 / Allocated 324

Virtual block number 179 (00000083), 512 (0200) bytes

 41AE0203 0752000D 414D0203 06020000 39450203 00FA0008 30EB0203 01ED0009 ..Ú...Š0..'...E9..@...MA..R...ÛA 000000
 45DE0203 0461000C 41600203 00000010 49F20002 0C370011 49010203 0656000D ..V...ÌI..7...·I......'A..a...8E 000020
 29800203 06690000 48490203 0763000D 26C40203 00000012 4A920002 08C40010 ..á....J......é&..c...ÌH..i....) 000040
 46360203 0ADD000F 49B90203 01140008 127C0203 0473000C 41870203 01910008 .......A..s...|........¿I..Ì...6F 000060
 001E0203 0482000C 43860203 011E0008 10150203 07730000 26F00203 08D70010 ..■...Þ&..s............C........ 000080
 29880203 08810000 45870203 0AEF000F 32960203 067E0000 24CF0203 06FC0000 ..■...ü$..~....2..ÿ....E......¡) 0000A0
 47800203 0396000C 2E3A0203 07870000 43CD0203 4A4E0009 4AA20005 038A000C ......ÅJ..NJ..ëC......:........G 0000C0
 00000000 00000000 00000000 00BD0008 23320203 0518000C 2FA90203 070F000D ......`/......2#..§............ 0000E0
 065EC4FE 5689FC46 89735788 26714788 26065EC4 D88EFFFF 881E5657 00000CC8 à...WV.¡...Äé^.&.Gq&.Ws.F=.V±é^. 000100
 F4468900 C6978826 00C48788 26065EC4 FA5689F8 468900BA 97882600 88878826 &..¡.&..¤..F½.V'é^.&..é.&..ó..F¶ 000120
 5EC40257 89260789 26F85EC4 00DA8300 51200A57 88260847 8826FC5E C4F65689 .V-é^=&.G.&.W.-Q..Ö.é^½&..&.W.é^ 000140
 47882CFC 5EC40657 89260447 8926F85E C400A83 00322D0E 5788260C 478826FC =&.G.&.W.-2..Ö.é^½&.G.&.W.é^=&.G 000160
 8926F85E C40E5788 260C4788 26FC5EC4 0A578926 08478926 F85EC40A 57882608 .&.W.é^½&.G.&.W.é^=&.G.&.W.é^½&. 000180
 47882CFC 5EC40257 89260789 26F45EC4 02578826 078826FC 5EC40E57 89260C47 G.&.W.é^=&..&.W.é^¶&..&.W.é^=&.G 0001A0
 57882608 478826FC 5EC40657 89260447 8926F45E C4000A83 00322D0E 5788260C .&.W.-2..Ö.é^¶&.G.&.W.é^=&.G.&.W 0001C0
 89260C47 8926F45E C40E5788 260C4788 26FC5EC4 0A578926 08478926 F45EC40A .é^¶&.G.&.W.é^=&.G.&.W.é^¶&.G.&. 0001E0
```

```
Dump of file SATURN:[PCCOMMON.DUMP.DLL]SA-DIFM.DLL;1 on 18-APR-1990 10:50:26.92
File ID (450,15,0)   End of file block 323 / Allocated 324

Virtual block number 180 (000000B4), 512 (0200) bytes

 0E5EC404 0E4683D8 8E0008B8 1E565700 0004C8C8 C95F5E1F 0000E900 00B80E57 W.|..Õ...^_èùà...WV.|...Ä.F..6^. 000000
 8926FC5E C400CA97 8B2600C8 878B260A 5EC4FE56 89FC4689 FE578B26 FC478B26 &.G=&.W±.F=.V±6^.&..à.&..ò.6^=&. 000020
 040E4683 D88E0115 B81E5657 000016C8 CBC95F5E 1F0000E9 0000B802 57892607 .&.W.|..Õ...^_èùà...WV.|...Ä.F.. 000040
 FE578B26 FC478B26 0E5EC404 0E4683FA 5689F846 89FE578B 26FC478B 260E5EC4 6^.&.G=&.W±.F%.V'.F..6^.&.G=&.W± 000060
 08478B26 0A5EC4EE 5689EC46 8900CE97 8B2600CC 878B260A 5EC4F656 89F44689 .F¶.V-6^.&..ä.&..ö..F§.VŸ6^.&.G. 000080
 E9037400 8F873926 FA568BF8 46880A5E C40000EA 46C7FE56 89FC4689 0A578B26 &.W..F=.V±úFõ..6^..F½.V'&9...t.Õ 0000A0
 8326F45E C4078926 F45EC400 00B80003 E90001B8 0006E903 74009197 39260010 ..&9...t.Õ..|..Õ..|..6^¶&..6^¶&. 0000C0
 FFFF9A50 16F0468D EC76FFEE 76FF0000 FFFF9AEC 76FFEE76 FF0080E9 0374003F ?.t.Õ...vŸ.vš......vŸ.vš.Fþ.P... 0000E0
 E868F876 FFFA76FF F476FFF6 76FF0000 07C726F4 5EC4005D E9037400 003D0000 ..=..t.Õ].6^¶&ú....v-.v¶.v'.v½hÒ 000100
 FFEE76FF 0011E903 7500003D EA468910 C4830000 FFFF9A00 6AF076FF F276FF60 '.v·.vþj.......6..Fõ=..u.Õ...vŸ. 000120
 9AEC76FF EE76FF00 0BE90375 003F8326 F45EC400 20E9EA46 8B000002 609AEC76 vš.'....FõÕ .6^¶&.?.u.Õ...vŸ.vš. 000140
 5EC4D88E 0158B81E 56570000 10C8C8C9 5F5E1F00 00E90000 B8FF8BE9 0000FFFF ....Õ..|..Õ...^_èùà...WV.|X..Ä6^ 000160
 0A5EC4FA 4689FE47 8B260E5E C4020E46 83FE5689 FC46890A 578B2608 478B260A .&.G.&.W..F=.V±.F..6^.&.G±.F'6^. 000180
 FF0876FF 0A76FF0C 76FF5DC7 68FA76FF F45689F2 468900CE 978B2600 CC878B26 &..ä.&..ö..F·.V¶.v'hú].v..v..v.. 0001A0
 F2468B00 9DE9F046 8B0006E9 03750000 30F04689 0EC48300 00035B9A 006A0676 v.j..[....6..Fþ=..u.Õ...FþÕ...F· 0001C0
 FE9A5016 F6468DF2 76FFF476 FF000001 EE9AF276 FFF476FF 0058E903 75F4460B .F¶u.ÕX..v¶.v·.Ÿ....v¶.v·.F-.P.± 0001E0

Dump of file SATURN:[PCCOMMON.DUMP.DLL]SA-DIFM.DLL;1 on 18-APR-1990 10:50:26.92
File ID (450,15,0)   End of file block 323 / Allocated 324

Virtual block number 181 (000000B5), 512 (0200) bytes

 C4830000 022A9A00 6AF676FF F876FF60 E268FA76 FF0035E9 03740000 3D000001 ...=..t.Õ5..v'hã'.v½.v-j..*....6 000000
 FFB3E900 30E9F046 8B000002 439AF276 FFF476FF 0011E903 7500003D F046890A ..Fþ=..u.Õ...v¶.v·.C....FþÕ=.Õ°. 000020
 830000FF FF9A006A 0676FF08 76FF0A76 FF0C76FF 601C6800 2BE90374 00FA7E83 .-'.t.Õ+.h.'.v..v..v..v.j....... 000040
 C8CBC95F 5E1F0000 E90000B8 0006E9F0 46880006 E9037500 F07E83F0 46890CC4 6..Fþ.-þ.u.Õ...FþÕ..|..Õ...^_èùà 000060
 26FC5EC4 FE5689FC 46890A57 8B260847 8B260A5E C4D88E02 7AB81E56 57000066 f..WV.|z..Ä6^.&.G.&.W..F=.V±Õ^=& 000080
 5EC4BE56 89BC4689 73578B26 71478B26 0A5EC4B2 56898046 89655788 2663478B .Gc&.We.F¯.Vý6^.&.Gq&.Ws.F¥.V/6^ 0000A0
 89B84689 00CE978B 2600CC87 8B260A5E C4C25689 C0468906 57882604 478B26FC =&.G.&.W..Fâ.Vô6^.&..ä.&..ö..F|. 0000C0
 8826FC47 8B260E5E C4040E46 83F65689 F446896F 57882660 4788260A 5EC48A56 Vαá^.&.Gm&.Wo.F¶.V-.F..6^.&.G=&. 0000E0
 685016B4 468D002C E9037500 CA870826 00C8878B 260A5EC4 FA5689F8 4689FE57 W±.F½.V'6^.&..à.&..ò.u.Õ,..FÇ.Ph 000100
 AA468800 06E90375 00003DAA 46890CC4 83000004 739A006A F876FFFA 76FF601E .'.v'.v½j..s....6..F¯=..u.Õ...F¯ 000120
 97892600 C8878926 FA568BF8 468B0A5E C4B44689 B6468900 00B80009 E902EFE9 Õÿ.Õ..|...FÑ.FÇ6^..F½.V'&..à.&.. 000140
 00003DAA 46890CC4 83000005 1E9A006A F876FFFA 76FF601E 685016AC 468D00CA ò..F¯.Ph.'.v'.v½j.......6..F¯=.. 000160
 76FF0C76 FF5DC768 016A002F E90374F6 460BF446 8802A7E9 AA468800 06E90375 u.Õ...F¯ÕI..F¶.F-t.Õ/.j.hú].v..v 000180
 E9AA4688 0006E903 7500003D AA46890E C4830000 02C59A00 6A0676FF 0876FF0A ..v..v.j..é....6..F¯=..u.Õ...F¯Õ 0001A0
 03750000 3DAA4689 000004F8 9A006AB4 76FFB676 FFF476FF F676FF00 48E90270 þ.ÕH..v-.v¶.vÑ.vÇj..½....F¯=..u. 0001C0
 3DAA4689 0000FFFF 9A016AAC 76FFAE76 FFF476FF F676FF02 49E9AA46 880006E9 Õ...F¯ÕI..v-.v¶.vÙ.v¯j.......F¯= 0001E0

Dump of file SATURN:[PCCOMMON.DUMP.DLL]SA-DIFM.DLL;1 on 18-APR-1990 10:50:26.92
File ID (450,15,0)   End of file block 323 / Allocated 324

Virtual block number 182 (000000B6), 512 (0200) bytes

 05C49A00 6AF876FF FA76FF5D C0685016 E4468D02 25E9AA46 880006E9 03750000 ..u.Õ...F¯Õ%..Fô.Phã].v'.v½j..6. 000000
 76FFBE76 FF50169A 468D01FC E9AA4688 0006E903 7500003D AA46890C C4830000 ...6..F¯=..u.Õ...F¯Õ=..F..P.v/.v 000020
 C49C5689 9A4689E6 561BE446 2B025788 26078B26 BC5EC408 C4830643 11139ABC ¥...C..6.6^¥&..&.W.+FÕ.VÌ.F..V.6 000040
 57882608 478B26BC 5EC4A056 899E4689 EA561BE8 462B0657 8B260447 8B26BC5E ^¥&.G.&.W.+FÒ.Võ.F..V.6^¥&.G.&.W 000060
 4689EA56 1BE8462B 0E578B26 0C478B26 BC5EC4A4 5689A246 89E65618 E446280A .+FÕ.VÌ.FÅ.VÊ6^¥&.G.&.W.+FÒ.Võ.F 000080
 8F87FF26 00918 7FF 260A5EC4 271268C0 76FFC276 FF036A50 16C4468D A85689A6 Ì.V´.F6.Pj..vô.vâh.'6^.&.ñ..&.ñ. 0000A0
 88C4468B 0156E9AA 46880006 E9037500 003DAA46 8912C483 000006AA 9A006A00 .j..'....6..F¯=..u.Õ...F¯ÕV..F6. 0000C0
 DA5689D8 4689CA56 88C8468B DE5689DC 4689CE56 88CC468B D6568904 4689C656 V6.Få.Vø.Fä.Vö.FÉ.VB.Fà.Vò.FÄ.VÖ 0000E0
 E90374CE 460BCC46 8B0008E9 0374C646 0BC4468B E25689E0 46890256 8B00468B .FÅ.VØ.FÅ.Võ.F6.Fót.ÕÄ..Fä.Föt.Õ 000100
 FC76FFFE 76FF256A 00B7E903 74CA460B C8468B00 C2E90374 D2460BD0 468B00CD ë..FÅ.FØt.Õô..Fà.Fòt.Õñ.j%.v±.v= 000120
 9C568B9A 46880008 E9AA468B 0006E903 7500AA7E 83AA4689 06C48306 C500009A ...é..6..F¯.~¯.u.Õ...F¯ÕÄ..F..V. 000140
 468BCA56 89C84689 A05688 9E 468BCE56 89CC4689 A45688A2 468BC656 89C44689 .F6.V6.FÅ.VÊ.Fä.Võ.F..V..Fà.Vò.F 000160
 B7FF260A 5EC42717 68C076FF C276FF03 6A5016C4 468D0256 89D04689 A85688A6 Ì.V´.FÅ.VØ.F6.Pj..vô.vâh.'6^.&.ñ 000180
 FFFE76FF 0014E903 7500003D AA468912 C4830000 07019A00 6A008F87 FF260091 ..&.ñ..j.......6..F¯=..u.Õ...v±. 0001A0
 468904C4 83FFFF00 649AFC76 FFFE76FF 0062E9AA 468804C4 83060900 649AFC76 v=.d.\..6..F¯Õb..v±.v=.d....6..F 0001C0
 006AF876 FFFA76FF 60E06806 76FF0876 FF0043E9 AA468800 06E90375 00003DAA ¯=..u.Õ...F¯ÕC..v..v.hÅ'.v'.v½j. 0001E0
```

Dump of file SATURN:[PCCOMMON.DUMP.DLL]SA-DIFM.DLL;1 on 18-APR-1990 10:50:26.92
File ID (450,15,0)   End of file block 323 / Allocated 324

Virtual block number 183 (000000B7), 512 (0200) bytes

```
FFFA76FF 5DD86800 19E9AA46 8B0006E9 03750000 3DAA4689 0CC48300 0007259A .X....6..F'=..u.Õ...F¨Õ..hÄ].v*. 000000
87B81E56 5700004A C8CBC95F 5E1F0000 E9000088 08C48300 00031A9A 006AF876 v½j.......6.|..Õ...^ èùàJ..WV.|. 000020
57B82608 47B8260A 5EC4CE56 89CC4689 00CE978B 2600CC87 8B260A5E C4D88E03 ..Á6^.&..ä.&..ö..Fä.Vöá^.&.G.&.W 000040
260447B8 26FC5EC4 D6568904 46897357 8B267147 8B260A5E C4FE5689 FC46890A ..F=.V±á^.&.Gq&.Ws.Få.V¤á^=&.G.& 000060
91B7FF26 0A5EC427 1468D876 FFDA76FF 046A5016 D0468DDA 56890846 8906578B .W..FÄ.VÖ.FÅ.Pj..vÖ.vÄh.'á^.&.ñ. 000080
8EE9C646 8B0006E9 03750000 3DC64689 12C48300 0004289A 006A008F B7FF2600 .&.ñ..j..+....6..F6=..u.Õ...F6Õ. 0000A0
8D08C483 087E1113 9AD476FF D676FF50 16864680 015EE903 74D24608 D0468802 ..FÅ.F¢t.Õ^..FÑ.P.v¤.vå...~..6.. 0000C0
E59A006A 008FB7FF 260091B7 FF260A5E C4271268 D876FFDA 76FF036A 50160C46 FÉ.Pj..vÖ.vÄh.'á^.&.ñ..&.ñ..j..Í 0000E0
EC46890E 5688DC46 8B0238E9 C6468800 06E90375 000030C6 468912C4 83000008 ....6..F6=..u.Õ...F6Õ8..FÉ.V8.F& 000100
5688E846 8BF25689 F04689E2 5688E046 8BF65689 F44689E6 5688E446 8BEE5689 .VŸ.FÕ.VÌ.F¶.V~.FÅ.Vä.FÞ.V·.FÒ.V 000120
E8468800 CDE90374 E6460BE4 46880008 E90374DE 460BDC46 8BFA5689 F84689EA õ.F½.V*.FÉ.FBt.ÕÄ..FÕ.FÌt.Õë..FÒ 000140
09000000 9AFC76FF FE76FF25 6A00B7E9 0374E246 0BE0468B 00C2E903 74EA460B .Föt.Õ6..FÅ.Fät.Õñ.jX.v±.v=..... 000160
56890C46 89B8568B B6468801 BAE9C646 8B0006E9 037500C6 7E83C646 8906C483 .6..F6.~6.u.Õ...F6Õ¤..FÑ.V|.FÉ.V 000180
89C4568B C2468BE2 5689E046 89BC568B BA468BE6 5689E446 89C0568B BE468BDE 8.Ff.Vä.FÕ.VÌ.F¤.V¥.FÅ.Vä.FÕ.V6. 0001A0
B7FF2600 91B7FF26 0A5EC427 1768D876 FFDA76FF 036A5016 DC468DEA 5689E846 FÒ.Võ.FÉ.Pj..vÖ.vÄh.'á^.&.ñ..&.ñ 0001C0
00649AFC 76FFFE76 FF0014E9 03750000 3DC64689 12C48300 0009C59A 006A008F ..j..é....6..F6=..u.Õ...v±.v=.d. 0001E0
```

Dump of file SATURN:[PCCOMMON.DUMP.DLL]SA-DIFM.DLL;1 on 18-APR-1990 10:50:26.92
File ID (450,15,0)   End of file block 323 / Allocated 324

Virtual block number 184 (000000B8), 512 (0200) bytes

```
7500003D C6468904 C483096F 00649AFC 76FFFE76 FF0144E9 C6468804 C4830914 ...á..F6ÕD..v±.v=.d.o..6..F6=..u 000000
04AA9A00 6A0676FF 0876FF0A 76FF0C76 FF5DC768 016A0125 E9C6468B 0006E903 .Õ...F6ÕX.j.hú].v..v..v..v.j..¯. 000020
3AE90374 D24608D0 468800F9 E9C6468B 0006E903 7500003D C646890E C4830000 ...á..F6=..u.Õ...F6Õ"..FÅ.F¢t.Õ: 000040
FF6D77FF 266F77FF 260A5EC4 08C48305 4411139A 50168646 8DD476FF D676FF00 ..v¤.vå.FÑ.P...D..á.á^.&.wo&.wm. 000060
8B260A5E C400B4E9 C6468800 06E90375 000030C6 46890000 FFFF9AD4 76FFD676 v¤.vå......F6=..u.Õ...F6Õ( á^.&. 000080
B7FF2600 CAB7FF26 0A5EC460 1E685016 C8468D00 33E90375 00CA870B 2600C887 .à.&..ò.u.Õ3..Fà.Ph.'á^.&.ıĸ &.ñ 0000A0
0009E900 72E9C646 8B0006E9 03750000 3DC64689 0CC48300 0007A99A 006A00C8 à.j..`....6..F6=..u.Õ...F6Õr.Õ.. 0000C0
000A249A 006AC876 FFCA76FF 6D77FF26 6F77FF26 0A5EC4C8 4689CA46 89000088 |...Fò.Fàá^.&.wo&.wm.vò.vàj..$.. 0000E0
6A006A6D 77FF266F 77FF260A 5EC4003D E9C6468B 0006E903 7500003D C6468900 ..F6=..u.Õ...F6Õ=.á^.&.wo&.wmj.j 000100
260000B8 0A5EC400 16E9C646 8B0006E9 03750000 3DC64689 00000404 9A016A00 .j..å....F6=..u.Õ...F6Õ..á^.|..& 000120
D88E073F B81E5657 000052C8 CBC95F5E 1F0000E9 0000B800 C8878926 00CA8789 ..ò.&..à.|..Õ...^ èùàR..WV.|?..Ä 000140
89FC4689 0A578B26 08478B26 0A5EC4D2 56890046 89735788 2671478B 260A5EC4 á^.&.Gq&.Ws.FÅ.V¤Õ^.&.G.&.W..F=. 000160
46896557 8B266347 8B26FC5E C4E65689 E4468906 57B82604 478B26FC 5EC4FE56 V±á^=&.G.&.W..Fõ.VÌá^=&.Gc&.We.F 000180
2600CC87 8B260A5E C4FA5689 F8468900 CA978B26 00C8878B 260A5EC4 B25689B0 ¯.Výá^.&..à.&..ò..F½.V"á^.&..ä.& 0001A0
8BCE5689 CC4689FE 578B26FC 478B260E 5EC4040E 46838A56 89B84689 00CE978B ..ö..F|.Vα.F..á^.&.G=&.W±.Fä.Vö. 0001C0
80036A00 8FB7FF26 0091B7FF 260A5EC4 E476FFE6 76FF0058 E90374CE 4608CC46 Fä.Föt.ÕX..vÌ.vÕá^.&.ñ..&.ñ..j.. 0001E0
```

Dump of file SATURN:[PCCOMMON.DUMP.DLL]SA-DIFM.DLL;1 on 18-APR-1990 10:50:26.92
File ID (450,15,0)   End of file block 323 / Allocated 324

Virtual block number 185 (000000B9), 512 (0200) bytes

```
56890C46 89C6568B C4468BD6 56890446 89BE568B BC468B00 00FFFF9A 5016BC46 F¥.P......F¥.V/.Få.V¤.Fá.V6.FÉ.V 000000
8CCC4689 D4468DE2 5689E046 89CA568B C8468BDA 56890846 89C2568B C0468BDE 8.Få.Vó.FÄ.VÖ.Fà.Vò.FÅ.Vä.Få.Fä. 000020
73E90375 FA460BF8 468808C4 8307DA11 139ACC76 FFCE76FF D076FFD2 76FFCE56 Vö.v¢.vÅ.vö.vä...Õ..á..F½.F"u.Õs 000040
0CC48300 0007FF9A 006A00C8 B7FF2600 CAB7FF26 0A5EC45D C0685016 E8468000 ..FÒ.Phä]á^.&.ñò.&.ñà.j.......á. 000060
57112607 0126EA56 8BE8468B D05EC400 FBE9AE46 8B0006E9 03750000 3DAE4689 .FÛ=..u.Õ...FÛÕ«.á^Å.FÒ.VÕ&..&.W 000080
26084701 26EA568B E8468BD0 5EC40657 11260447 0126EE56 8BEC468B D05EC402 .á^Å.F$.VŸ&.G.&.W.á^Å.FÒ.VÕ&.G.& 0000A0
FF6D77FF 266F77FF 260A5EC4 0E571126 0C470126 EE568BEC 468BD05E C40A5711 .W.á^Å.F$.VŸ&.G.&.W.á^.&.wo&.wm. 0000C0
76FF0C76 FF0091E9 AE468B00 06E90375 00003DAE 46890000 09869AD0 76FF0276 v¢.vÅ......FÛ=..u.Õ...FÛÕ...v..v 0000E0
83000009 3E9A006A 0676FF08 76FF0A76 FF0C76FF 5DD86804 C483FFFF 00009A0A .......á.hÄ].v..v..v..v.j..>.... 000100
468DB876 FFBA76FF 000002EF 9AB876FF BA76FF00 59E90375 BA460BB8 46880CC4 á..F|.Fαu.ÕY..vα.v|.ÿ....vα.v|.F 000120
9A006AB4 76FFB676 FF5DC468 006A006A 0036E903 7400003D 000002FF 9A5016B4 Ç.P.....*..t.Õ6.j.j.hé].vÑ.vÇj.. 000140
AE468B00 0003339A B876FFBA 76FF0011 E9037500 003DAE46 890CC483 00000879 y....á..FÛ=..u.Õ...vα.v|.3....FÛ 000160
0A5EC4D8 8E0A5CB8 1E565700 000C8CB C95F5E1F 0000E900 008BFFB2 E90009E9 Õ..Õý.|..Õ...^ èùàÅ..WV.|\..Äá^. 000180
805689FF 7E868965 57B82663 478B26F6 5EC4F856 89F64689 0A578B26 08478B26 &.G.&.W..F-.V½Ž^-&.Gc&.We..-..V. 0001A0
899E4689 06578B26 04478B26 F65EC4CC 5689CA46 89685788 26694788 26F65EC4 á^-&.Gi&.Wk.Fò.Väá^-&.G.&.W..F.. 0001C0
6F578B26 60478B26 0A5EC484 56898246 8900CE97 8B2600CC 878B260A 5EC4A056 V.á^.&..ä.&..ö..F..V.á^.&.Gm&.Wo 0001E0
```

Dump of file SATURN:[PCCOMMON.DUMP.DLL]SA-DIFM.DLL;1 on 18-APR-1990 10:50:26.92
File ID (450,15,0) End of file block 323 / Allocated 324

Virtual block number 186 (000000BA), 512 (0200) bytes

```
71478B26 0A5EC4F0 5689EE46 8900CA97 882600C8 8788260A 5EC4F456 89F24689 .F·.V¶6^.&..à.&..ò..FŸ.Vÿ6^.&.Gq 000000
5689A246 89FE578B 26FC478B 260E5EC4 040E4683 FF3E9689 FF3C8689 73578B26 &.Ws..<...>..F..6^.&.G=&.Wt.FÅ.V 000020
6577FF26 6777FF26 0A5EC45D C0685016 FF50868D 0066E903 74A4460B A2468BA4 Ê.FÅ.FÊt.Õf...P..Phâ]6^.&.wg&.we 000040
50868007 8BE9FF74 86880007 E9037500 003DFF74 86890CC4 83000000 989A006A j.......6...t.=..u.Õ....t.ÕÊ...P 000060
8908C483 00000FB1 9A006A65 77FF2667 77FF260A 5EC46025 68A4568C A24689FF ..FÅ.VÊhX'6^.&.wg&.wej..Ÿ....6.. 000080
260A5EC4 02578B26 078826A2 5EC40786 E9FF7486 880007E9 03750000 3DFF7486 .t.=..u.Õ....t.Õ..6^Å&..&.W.6^.& 0000A0
C40A578B 2608478B 26A25EC4 0072E903 74025739 26007BE9 03740739 26715FC4 6 q&9.t.Õ(.&9W.t.Õr.6^Å&.G.&.W.6 0000C0
2604478B 26A25EC4 004EE903 740A5739 260057E9 03740847 3926715F C4260A5E ^.&6 q&9G.t.ÕW.&9W.t.ÕN.6^Å&.G.& 0000E0
26A25EC4 002AE903 74065739 260033E9 03740447 3926715F C4260A5E C406578B .W.6^.&6 q&9G.t.Õ3.&9W.t.Õ*.6^Å& 000100
0006E903 740E5739 26000FE9 03740C47 3926715F C4260A5E C40E578B 260C478B .G.&.W.6^.&6 q&9G.t.Õ..&9W.t.Õ.. 000120
2604478B 26A25EC4 FF3A9689 FF388689 02578B26 078826A2 5EC406F2 E90000B8 |..Õ·.6^Å&..Ī.W...8...:.6^Å&.G.& 000140
26A25EC4 88568986 46890A57 88260847 8826A25E C4FF3296 89FF3086 8906578B .W...0...2.6^Å&.G.&.W..F..V.6^Å& 000160
608689FF 3A961BFF 38862B88 56888646 88FF7896 89FF7686 890E578B 260C478B .G.&.W...v...x..F..V.+.8...:...' 000180
C4260A5E C4885689 B64689FF 32961BFF 308628FF 789688FF 768688FF 629689FF ...b...v...x.+.0...2..FÑ.V¡6^.&6 0001A0
46890657 88260447 8826715F C4260A5E C4D85689 D6468902 57882607 8826715F _q&..&.W..Fø.VÅ6^.&6_q&.G.&.W..F 0001C0
C4260A5E C4FF3696 89FF3486 890A578B 2608478B 26715FC4 260A5EC4 D05689CE Õ.VÅ6^.&6_q&.G.&.W...4...6.6^.&6 0001E0
```

Dump of file SATURN:[PCCOMMON.DUMP.DLL]SA-DIFM.DLL;1 on 18-APR-1990 10:50:26.92
File ID (450,15,0) End of file block 323 / Allocated 324

Virtual block number 187 (000000BB), 512 (0200) bytes

```
46890856 18D6462B FF36968B FF34868B FC5689FA 46890E57 88260C47 8826715F _q&.G.&.W..F*.V=..4...6.+Fø.VÅ.F 000000
88715FC4 260A5EC4 FF7C9689 FF7A8689 D0561BCE 4628FC56 88FA468B EC5689EA Õ.VŠ.F*.V=+Fö.VÅ..z...|.6^.&6 q. 000020
478926FF 329688FF 30868871 5FC4260A 5EC40257 89260789 26FF3A96 88FF3886 .8...:.&..&.W.6^.&6_q..0...2.Ī.G 000040
5FC4260A 5EC40A57 89260847 89268856 88864688 715FC426 0A5EC406 57892604 .&.W.6^.&6_q.F..V.&.G.&.W.6^.&6_ 000060
12689E76 FFA076FF 036A5016 A6468D0E 5789260C 478926FF 789688FF 76868871 q..v...x.&.G.&.W..FĪ.Pj..v..v.h. 000080
7500003D FF748689 12C48300 0010179A 006A008F 87FF2600 91B7FF26 0A5EC427 '6^.&.ñ..&.ñ..j.......6...t.=..u 0000A0
C2468980 5688AE46 88BC5689 BA4689A8 5688A646 88056DE9 FF74868B 0007E903 .Õ....t.Õm..FĪ.V'.F¤.V¥.FÕ.V‾.F6 0000C0
4608EE46 88C85689 C6468984 56888246 88C05689 BE4689AC 5688AA46 88C45689 .V6.F˙.V˜.Ff.Và.Fý.VÇ.F6.Và.FŸ.F 0000E0
86890CC4 8300000C 609A006A EE76FFF0 76FF50C0 6850160A 4680002B E90375F0 Þu.Õ+..FÕ.Phâ].vÞ.vŸj..'....6... 000100
88BA4688 0087E903 75F0460B EE468805 07E9FF74 86880007 E9037500 003DFF74 t.=..u.Õ....t.Õ...FŸ.FÞu.Õ...F¤. 000120
8E468800 D5E90374 02573826 000EE903 74073826 FF3C9EC4 DC56130A 46038C56 V¥.FÕ.VÉ6.<.&;.t.Õ8.&;W.t.ÕĪ..Ff 000140
880083E9 03740657 3826008C E9037404 473826FF 3C9EC4E0 56130E46 03C0568B .Vâ.F8.VÅ6.<.&;G.t.Õ¥.&;W.t.Õ°.. 000160
91E90374 0A573826 009AE903 7408473B 26FF3C9E C4DC5613 DA4603C4 568BC246 F6.V6.FÕ.VÉ6.<.&;G.t.Õ..&;W.t.Õ. 000180
03740E57 38260078 E903740C 473826FF 3C9EC4E0 56130E46 03C8568B C6468800 ..F6.Và.F8.VÅ6.<.&;G.t.Õx.&;W.t. 0001A0
9EC40054 E9037402 57392600 5DE90374 0739268C 5688BA46 88FF3C9E C4006FE9 Õo.6.<..F¤.V¥&9.t.Õ].&9W.t.ÕT.6. 0001C0
4688FF3C 9EC40038 E9037406 57392600 41E90374 04473926 C05688BE 4688FF3C <..Ff.Vâ&9G.t.ÕA.&9W.t.Õ8.6.<..F 0001E0
```

Dump of file SATURN:[PCCOMMON.DUMP.DLL]SA-DIFM.DLL;1 on 18-APR-1990 10:50:26.92
File ID (450,15,0) End of file block 323 / Allocated 324

Virtual block number 188 (000000BC), 512 (0200) bytes

```
C85688C6 4688FF3C 9EC4001C E903740A 57392600 25E90374 08473926 C45688C2 ô.V6&9G.t.Õ%.&9W.t.Õ..6.<..F6.Và 000000
83117600 009AF676 FFF876FF 176A039F E903750E 57392600 09E90374 0C473926 &9G.t.Õ..&9W.u.Õ..j..v¼.v-...v.. 000020
E90375F0 460BEE46 8803E1E9 FF74868B 0007E903 7500FF74 BE83FF74 868906C4 6...t../t..u.Õ....t.ÕÄ..FŸ.FÞu.Õ 000040
568BDA46 8808C483 08511113 9A7177FF 267377FF 260A5EC4 5016FF64 8680008C ....d..P6^.&.ws&.wq...Q..6..FÕ.V 000060
6C86290C 568BDA46 88FF6A96 19FF6886 29E0568B DE4688FF 669619FF 6486290C É).d...f..F8.VÅ).h...j..FÕ.VÉ).l 000080
56898E46 89FF6696 88FF6486 88FF7296 19FF7086 29E0568B DE468BFF 6E9619FF ...n..F8.VÅ).p...r...d...f..F..V 0000A0
70868894 56899246 89FF6A96 88FF6886 88985689 964689FF 6E968BFF 6C868890 ...l...n..F..V...h...j..F..V...p 0000C0
898E4689 02578826 07882671 5FC4260A 5EC40053 E99C5689 9A4689FF 729688FF ...r..F..V.ÕS.6^.&6_q&..&.W..F.. 0000E0
8826715F C4260A5E C4985689 9646890A 57882608 47882671 5FC4260A 5EC49056 V.6^.&6_q&.G.&.W..F..V.6^.&6_q&. 000100
56899A46 890E578B 260C478B 26715FC4 260A5EC4 94568992 46890657 88260447 G.&.W..F..V.6^.&6_q&.G.&.W..F..V 000120
7C968BFF 7A868800 18E90374 FF629639 0021E903 74FF6086 39EC568B EA46889C ..FÕ.V§9.'.t.ÕĪ.9.b.t.Õ....z...| 000140
0009E903 74FF3886 39D8568B D6468801 F7E90375 B8563900 08E90374 B64639FF .9FÑt.Õ..9V¡u.Õ¼..Fø.VÅ9.8.t.Õ.. 000160
9A50168A 46808276 FF8476FF 00000C34 9A8276FF 8476FF01 DFE90375 FF3A9639 9.:.u.ÕÕ..v..v..4.....v..v..F..P. 000180
0013029A 006A8A76 FF8C76FF 5DC56850 16FE4680 018CE903 7400003D 00000C44 D...=..t.Õ¥..F±.Phé].v..v..j..... 0001A0
76FFF876 FF000013 1C9A8276 FF8476FF 0020E903 7500003D FF748689 0CC48300 ..6...t.=..u.Õ ..v..v.......v¼.v 0001C0
6A8A76FF 8C76FF5D C0685016 FF64868D 0248E9FF 74868804 C4831329 00649AF6 -.d.)..6...t.ÕH...d..Phâ].v..v.j 0001E0
```

```
Dump of file SATURN:[PCCOMMON.DUMP.DLL]SA-DIFM.DLL;1 on 18-APR-1990 10:50:26.92
File ID (450,15,0)   End of file block 323 / Allocated 324

Virtual block number 189 (000000BD), 512 (0200) bytes

000013FF 9A8276FF 8476FF00 20E90375 000030FF 7486890C C4830000 13E59A00 ..I....á...t.=..u.Õ ..v..v...... 000000
468D0127 E9037500 FE7E8302 03E9FF74 868804C4 83135100 649AF676 FFF876FF .v½.v~.d.Q..á...t.Õ...~±.u.Õ'..F 000020
FF648629 DC5688DA 468808C4 83140C11 139A7177 FF267377 FF260A5E C45016DA Õ.Pá^.&.ws&.wq......á..FÖ.VÉ).d. 000040
FF6E9619 FF6C8629 DC5688DA 4688FF6A 9619FF68 8629E056 88DE4688 FF669619 ..f..FB.VÀ).h...j..FÖ.VÉ).l...n. 000060
8688FF42 9689FF40 8689FF66 9688FF64 8688FF72 9619FF70 8629E056 88DE4688 .FB.VÀ).p...r...d...f...@...B... 000080
8688FF46 9689FF44 8689FF6A 9688FF68 8688FF4A 9689FF48 8689FF6E 9688FF6C l...n...H...J...h...j...D...F... 0000A0
FF8C76FF 2710689E 76FFA076 FF5016D2 4680FF4E 9689FF4C 8689FF72 9688FF70 p...r...L...N..F@.P.v..v.h.'.v.. 0000C0
4C9A8276 FF8476FF 0020E903 75000030 FF748689 10C48300 0014329A 006A8A76 v.j..2....á...t.=..u.Õ ..v..v..L 0000E0
036A5016 FF40868D 0120E9FF 74868804 C4831459 00649AF6 76FFF876 FF000014 ....v½.v~.d.Y..á...t.Õ ...@..Pj. 000100
000030FF 74868912 C4830000 14889A00 6AD276FF D476FF27 17689E76 FFA076FF .v..v.h.'.vå.v@j.......á...t.=.. 000120
868804C4 8314A400 649AF676 FFF876FF 00000C79 9A8276FF 8476FF00 20E90375 u.Õ ..v..v..y....v½.v~.d.Ê..á... 000140
0091B7FF 260A5EC4 2717689E 76FFA076 FF036A50 168E468D FE2CE900 D3E9FF74 t.Õ€.Õ,±.F..Pj..v..v.h.'á^.&.ñ.. 000160
76FFF876 FF0015E9 03750000 30FF7486 8912C483 00000063 9A006A00 8FB7FF26 &.ñ..j..c....á...t.=..u.Õ...v½.v 000180
868904C4 83113000 649AF676 FFF876FF 0088E9FF 74868804 C48314B9 00649AF6 -.d.¿..á...t.Õ...v½.v~.d.=..á... 0001A0
E90001B8 0006E903 74F44608 F2468800 67E9FF74 86880007 E9037500 003DFF74 t.=..u.Õ....t.Õg..F·.F¶t.Õ..¡..Õ 0001C0
75000030 FF748689 000008E6 9A7177FF 267377FF 260A5EC4 F276FFF4 76FF0056 V..v¶.v·á^.&.ws&.wq.l.....t.=..u 0001E0
```

```
Dump of file SATURN:[PCCOMMON.DUMP.DLL]SA-DIFM.DLL;1 on 18-APR-1990 10:50:26.92
File ID (450,15,0)   End of file block 323 / Allocated 324

Virtual block number 190 (000000BE), 512 (0200) bytes

FF0C76FF 5DD86804 C4830C04 00009A0A 76FF0C76 FF002DE9 FF748688 0007E903 .Õ....t.Õ-..v..v.......á.hÄ].v.. 000000
00A6C8CB C95F5E1F 0000E900 00B80CC4 8300000C 1B9A006A 0676FF08 76FF0A76 v..v..v.j.......á.|..Õ...^_èùàl. 000020
6E86C700 00D846C7 0000CE46 C70001A4 46C70000 F646C7D8 8E0C99B8 1E565700 .WV.|...ÃúF-..úFÊ..úFö..úFĀ..ú.n 000040
57882669 4788260A 5EC48C56 898A4689 00CE9788 2600CC87 88260A5E C40000FF ...á^.&..ä.&..ö..F..V.á^.&.Gi&.W 000060
00FF7886 C70024FF 7686C7F6 4689FE47 88260E5E C4020E46 83845689 8246896B k.F..V..F..á^.&.G±.F-ú.v.$.ú.x.. 000080
5EC4FA56 89F84689 0A578826 08478826 0A5EC400 00FF7C86 C70024FF 7A86C700 .ú.z.$.ú.|...á^.&.G.&.W..F½.V*á^ 0000A0
46890657 88260447 8826085F C4260A5E C4885689 86468965 57882663 478826F8 ¥&.Gc&.We.F..V.á^.&á_.&.G.&.W..F 0000C0
73578826 71478826 0A5EC4F0 5689EE46 896F5788 26604788 260A5EC4 9A568998 ..V.á^.&.Gm&.Wo.FŸ.VÞá^.&.Gq&.Ws 0000E0
87878826 0A5EC4FE 5689FC46 8900CA97 882600C8 8788260A 5EC49656 89944689 .F..V.á^.&..à.&..ò..F=.V±á^.&... 000100
5EC450C7 68F676FF 0C478926 F646880A 5EC4FF74 9689FF72 86890089 97882600 .&.......r...t.á^..F-&.G..v-hú]á^ 000120
880007E9 03750000 30FF7086 890AC483 000016A5 9A006A69 77FF2668 77FF260A .&.wk&.wij..Ê....á...p.=..u.Õ... 000140
FE4608FC 4688079E E90374F0 4608EE46 8807A9E9 037500F6 7E830C64 E9FF7086 .p.Õd..~-.u.Õ`..FŸ.FÞt.Õ...F=.F± 000160
87FF2600 9187FF26 0A5EC427 12689876 FF9A76FF 026A5016 A4468006 F0E90375 u.ÕÞ..FÊ.Pj..v..v.h.'á^.&.ñ..&.ñ 000180
830C08E9 FF708688 0007E903 75000030 FF708689 12C48300 0017129A 006A008F ..j.......á...p.=..u.Õ....p.Õ... 0001A0
70868906 C483172E 00009AF8 76FFFA76 FF2C6A00 00A446C7 0093E903 7500A47E ~Ê.u.Õ..úFÊ..j..v*.v½......á...p 0001C0
689876FF 9A76FF02 6A5016A4 468D08D8 E9FF7086 880007E9 037500FF 708E83FF ../p..u.Õ....p.ÕÄ..FÊ.Pj..v..v.h 0001E0
```

```
Dump of file SATURN:[PCCOMMON.DUMP.DLL]SA-DIFM.DLL;1 on 18-APR-1990 10:50:26.92
File ID (450,15,0)   End of file block 323 / Allocated 324

Virtual block number 191 (000000BF), 512 (0200) bytes

000030FF 70868912 C4830000 177B9A00 6A008FB7 FF260091 B7FF260A 5EC42717 .'á^.&.ñ..&.ñ..j..(....á...p.=.. 000000
F876FFFA 76FF0B90 E9FF7086 8804C483 17430064 9AF876FF FA76FF00 15E90375 u.Õ...v*.v½.d.C..á...p.Õ...v*.v½ 000020
5016A646 80086FE9 FF70868B 0007E903 75000030 FF708689 04C48312 E400649A .d.Õ..á...p.=..u.Õ....p.Õo..Fl.P 000040
83000017 A79A006A 008FB7FF 260091B7 FF260A5E C4271268 9876FF9A 76FF036A j..v..v.h.'á^.&.ñ..&.ñ..j..l.... 000060
76FF601E 685016FF 7E8680D8 35E9FF70 86880007 E9037500 003DFF70 868912C4 á...p.=..u.Õ....p.Õ5...~..Ph.'.v 000080
FC76FFFE 76FF5DC0 6850160A 468DFF70 86890CC4 83000017 C39A006A FC76FFFE ±.v=j..û....á...p..FÖ.Phå].v±.v= 0000A0
FA9A006A FC76FFFE 76FF6024 6850168A 468DFF70 86890CC4 83000017 DF9A006A j..Õ....á...p..F¤.Ph$'.v±.v=j..* 0000C0
AE468894 5EC40257 89260789 26A85688 A6468894 5EC4FF70 86890CC4 83000018 ....á...p.á^..Fl.V´&..&.W.á^..FÕ 0000E0
88945EC4 06578926 04478926 AC5688AA 4688945E C40A5789 26084789 2680568B .V¯&.G.&.W.á^..F¨.V¯&.G.&.W.á^.. 000100
945EC402 57112607 0126DC56 88DA4688 945EC40E 5789260C 47892684 56888246 Fý.VÇ&.G.&.W.á^..FÖ.VÉ&..&.W.á^. 000120
C40A5711 26084701 26DC5688 DA468894 5EC40657 11260447 0126E056 88DE4688 .FB.VÀ&.G.&.W.á^..FÖ.VÉ&.G.&.W.á 000140
16EE468D 9476FF96 76FF8676 FF8876FF 0E571126 0C470126 E0568BDE 4688945E ^..FB.VÀ&.G.&.W..v..v..v..v..FŸ. 000160
8DEE76FF F076FF0A 31E9FF70 86880007 E9037500 003DFF70 86890000 FFFF9A50 P.......p.=..u.Õ....p.Õ1..vÞ.vŸ. 000180
F076FF0A 0DE9FF70 86880007 E9037500 003DFF70 86890000 FFFF9A50 16FF7686 .v..P.......p.=..u.Õ....p.Õ...vÞ 0001A0
70868800 07E90375 000030FF 70868900 0009FD9A 016AFF7E 86FF8076 FFEE76FF .vŸ.v..Ñ~.j..».....p.=..u.Õ....p 0001C0
C4830000 12B09A00 6A8276FF 8476FF5D D4685016 9C468050 168E468D 09E6E9FF .Õl..F..P.F..Phå].v..v.j..§....á 0001E0
```

Dump of file SATURN:[PCCOMMON.DUMP.DLL]SA-DIFM.DLL;1 on 18-APR-1990 10:50:26.92
File ID (450,15,0) End of file block 323 / Allocated 324

Virtual block number 192 (000000C0), 512 (0200) bytes

```
FFF076FF 016A9C76 FF9E76FF 09B6E9FF 70868800 07E90375 00003DFF 70868910 ...p.=..u.Õ....p.ÕÑ..v..v.j..vþ. 000000
EE76FFF0 76FF0990 E9FF7086 880007E9 03750000 3DFF7086 890000FF FF9AEE76 vŸ.......p.=..u.Õ....p.Õ...vþ.vŸ 000020
5EC4096C E9FF7086 880007E9 03750000 3DFF7086 890000FF FF9A0676 FF0876FF .v..v........p.=..u.Õ....p.Õl.á^ 000040
006A0676 FF0876FF 0A76FF0C 76FF5008 686F5789 26604789 26F0568B EE46880A ..FŸ.Vþ&.Gm&.WohÁ].v..v..v..v.j. 000060
9A5016FF 6A868DBA 76FFBC76 FF000012 909ABA76 FFBC76FF 0CC48300 001528 9A .+....á..v¥.vo......v¥.vo..j..P. 000080
27106898 76FF9A76 FF5016A0 46800000 FF6E86C7 03C9E903 7400003D 000012A0 ....=..t.Õè.ú.n....F..P.v..v.h.' 0000A0
76FF0012 E9037500 003DFF70 868910C4 83000016 4C9A006A FF6AB6FF FF6CB6FF .Ñl..Ñj.j..L....á...p.=..u.Õ...v 0000C0
27146898 76FF9A76 FF036A50 16F24680 08DAE9FF 70868800 0012D79A BA76FFBC ¥.vo.■.....p.ÕÖ..F·.Pj..v..v.h.' 0000E0
FFBC76FF 0012E903 7500003D FF708689 12C48300 001A479A 006AA076 FFA276FF .vÅ.v.j..G....á...p.=..u.Õ...v¥. 000100
76FF2713 689876FF 9A76FF04 6A5016CA 468D089C E9FF7086 8B00001A 619ABA76 vo.a.....p.Õ...Fò.Pj..v..v.h.'.v 000120
BA76FFBC 76FF0012 E9037500 003DFF70 868912C4 8300001B 109A006A A076FFA2 Å.v.j.......á...p.=..u.Õ...v¥.vo 000140
0A76FF0C 76FF60E8 68F276FF F476FF50 16CE4680 085EE9FF 70868800 001AA39A .È.....p.Õ^..Fö.P.v¶.v·hò`.v..v. 000160
FFBC76FF 0012E903 7500003D FF708689 14C48300 001ACF9A 006A0676 FF0876FF .v..v.j..ü....á...p.=..u.Õ...v¥. 000180
60E86837 FF260277 FF26CA5E C4501608 4680081C E9FF7086 8B00001A E99ABA76 vo.Õ.....p.Õ...FÁ.Pá^ò&.w.&.7hò` 0001A0
E9037500 003DFF70 868914C4 83000019 819A006A 0676FF08 76FF0A76 FF0C76FF .v..v..v..v.j.......á...p.=..u.Õ 0001C0
EA468D00 C2E90375 00CE7E83 07D6E9FF 70868800 001B2A9A BA76FFBC 76FF0012 ...v¥.vo.*.....p.Õø..~ö.u.Õö..Fõ 0001E0
```

Dump of file SATURN:[PCCOMMON.DUMP.DLL]SA-DIFM.DLL;1 on 18-APR-1990 10:50:26.92
File ID (450,15,0) End of file block 323 / Allocated 324

Virtual block number 193 (000000C1), 512 (0200) bytes

```
03750000 3DFF7086 890CC483 000018 4A 9A006AFF 6AB6FFFF 6CB6FF5E 88685016 .Ph.^.Ñl..Ñj.j..J....á...p.=..u. 000000
FF5E9D68 016A5016 D0468D07 95E9FF70 86880000 1B649ABA 76FFBC76 FF0012E9 Õ...v¥.vo.d.....p.Õ...FÅ.Pj.h.^. 000020
BC76FF00 12E90375 00003DFF 7086890E C4830000 1B9A9A00 6AFF6AB6 FFFF6CB6 Ñl..Ñj.j........á...p.=..u.Õ...v¥ 000040
FF0876FF 006A006A 5016D046 8D006A00 6A075BE9 FF70868B 00001BB4 9ABA76FF .vo.Ç.....p.Õ[.j.j..FÅ.Pj.j..v.. 000060
C4830000 18D09A00 6AFF6AB6 FFFF6CB6 FF5E9468 EE76FFF0 76FF006A 006A0676 v.j.j..vþ.vŸh.^.Ñl..Ñj.j..ì....á 000080
83070BE9 FF70868B 00001BF7 9ABA76FF BC76FF00 12E90375 00003DFF 70868920 ..p.=..u.Õ...v¥.vo.¥.....p.Õ... 0000A0
001C2D9A 006AFF6A B6FFFF6C B6FF5E90 68006A50 16C24680 008AE903 7500087E ~Ä.u.Õ...Fõ.Pj.h.^.Ñl..Ñj.j..-.. 0000C0
E9FF7086 8B00001C 479ABA76 FFBC76FF 0012E903 7500003D FF708689 0EC48300 ..á...p.=..u.Õ...v¥.vo.G.....p.Õ 0000E0
68006A00 6A5016C2 468D006A 006AEE76 FFF076FF 006A006A 0676FF08 76FF06C8 à..v..v.j.j..vþ.vŸj.j..Fõ.Pj.j.h 000100
0012E903 7500003D FF708689 20C48300 001C789A 006AFF6A B6FFFF6C B6FF5E94 .^.Ñl..Ñj.j..x....á ..p.=..u.Õ.. 000120
7500087E 830009E9 037400CE 7E830678 E9FF7086 8B00001C 929ABA76 FFBC76FF .v¥.vo.......p.Õx..~ö.t.Õ...~Ä.u 000140
890CC483 00001CB0 9A006A06 76FF0876 FF601F68 FF6AB6FF FF6CB6FF 010EE903 .Õ...Ñl..Ñj.h.'.v..v.j.. ....á.. 000160
B6468D06 2DE9FF70 86880000 1CCA9ABA 76FFBC76 FF0012E9 03750000 3DFF7086 .p.=..u.Õ...v¥.vo.ò.....p.Õ-..FÑ 000180
03750000 3DFF7086 890CC483 00001CE8 9A006AFF 6AB6FFFF 6CB6FF5E 90685016 .Ph.^.Ñl..Ñj.j..Ò....á...p.=..u. 0001A0
6CB6FF5E 8F685016 BE468D05 F5E9FF70 86880000 1D029ABA 76FFBC76 FF0012E9 Õ...v¥.vo.......p.Õ%..F/.Ph.^.Ñl 0001C0
76FFBC76 FF0012E9 03750000 3DFF7086 890CC483 00001D4D 9A006AFF 6AB6FFFF ..Ñj.j..M....á...p.=..u.Õ...v¥.v 0001E0
```

Dump of file SATURN:[PCCOMMON.DUMP.DLL]SA-DIFM.DLL;1 on 18-APR-1990 10:50:26.92
File ID (450,15,0) End of file block 323 / Allocated 324

Virtual block number 194 (000000C2), 512 (0200) bytes

```
0375FE56 390008E9 0374FC46 39B8568B B6468805 BDE9FF70 86880000 1D679ABA ¤.g.....p.Õ§..FÑ.V¡9F=t.Õ..9V±u. 000000
6AB6FFFF 6CB6FF00 39E90375 FE563900 08E90374 FC4639C0 568BBE46 88004FE9 ÕO..F/.Vâ9F=t.Õ..9V±u.Õ9..Ñl..Ñj 000020
0012E903 7500003D FF708689 0CC48300 0019CB9A 006AFC76 FFFE76FF 602068FF .h `.v±.v=j..ù....á...p.=..u.Õ.. 000040
15140000 9A0A76FF 0C76FFFC 1EE90558 E9FF7086 8B000019 E59ABA76 FFBC76FF .v¥.vo.|.....p.ÕX.Õ.=.v..v...... 000060
8D1FA5F2 00088 90A 8E1E0716 F08BFF5A 8E8D7357 8B267147 8B260A5E C404C483 .á.á^.&.Gq&.Ws.ƒZ..þ....Õ¿..·É.. 000080
2600C49F C4260A5E C40E578B 260C478B 2600C49F C4260A5E C4026A50 16FF5A86 .Z..Pj.á^.&á.á.&.G.&.W.á^.&á.á.& 0000A0
9AE26AFF 6A5016FF 5A868D00 00FFFF9A 5052DAF7 00D283D8 F706571B 2604472B +G.&.W.¥Ä.Ø.¥ÖRP.......Z..Pj.jä. 0000C0
8300001A 099A006A 6977FF26 6B77FF26 0A5EC45F 51685016 FF5A868D 0000FFFF ......Z..PhQ_á^.&.wk&.wij........ 0000E0
0375F046 08EE468B 048EE904 85E9FF70 86880007 E9037500 003DFF70 86890CC4 á...p.=..u.Õ....p.Õç.Õ...FŸ.Fþu. 000100
E903758C 460B8A46 8B046FE9 0375FE46 08FC468B 047AE903 7400F67E 830483E9 Õ...—.t.Õz..F=.F±u.Õo..F..F.u.Õ 000120
00003D00 00200A9A 50169046 8D8A76FF 8C76FF00 001FF79A 8A76FF8C 76FF005A Z..v..v..%....v..v..F..P.. ..=.. 000140
3DFF7086 890AC483 00001EBC 9A006A90 76FF9276 FF5DC768 F676FF00 37E90374 t.Õ7..v~hú].v..v.j..¥....á ..p.= 000160
16A4468D FF81E904 31E9FF70 86880000 20459A8A 76FF8C76 FF0012E9 03750000 ..u.Õ...v..v..E ....p.Õ1.Õγ FÉ. 000180
00001F29 9A006A00 8FB7FF26 0091B7FF 260A5EC4 27126898 76FF9A76 FF026A50 Pj..v..v.h.'á^.&.ñ..&.ñ..j..,... 0001A0
C70093E9 037400A4 7E8303F4 E9FF7086 880007E9 03750000 3DFF7086 8912C483 .á...p.=..u.Õ....p.Õ¶..~É.t.Õ..ú 0001C0
E9037500 FF708E83 FF708689 06C4831F 4500009A F876FFFA 76FF2C6A 0001A446 FÉ..j,.v*.v½...E..á...p..ƒp..u.Õ 0001E0
```

```
Dump of file SATURN:[PCCOMMON.DUMP.DLL]SA-DIFM.DLL;1 on 18-APR-1990 10:50:26.92
File ID (450,15,0)   End of file block 323 / Allocated 324

Virtual block number 195 (000000C3), 512 (0200) bytes

 91B7FF26 0A5EC427 17689876 FF9A76FF 026A5016 A4468D03 C1E9FF70 86880007 ....p.Õè..EÊ.Pj..v..v.h.'á^.&.ñ. 000000
 FFFA76FF 0015E903 7500003D FF708689 12C48300 001F849A 006A008F B7FF2600 .&.ñ..j.......á...p.=..u.Õ...v'. 000020
 8904C483 16D80064 9AF876FF FA76FF03 79E9FF70 868804C4 831F5A00 649AF876 v½.d.Z..á...p.Õy..v'.v½.d.Ä..á.. 000040
 76FFFE76 FF601E68 5016FF7E 868D0358 E9FF7086 880007E9 03750000 3DFF7086 .p.=..u.Õ....p.ÕX...~..Ph.'.v±.v 000060
 9A006AFC 76FFFE76 FF5DC068 50160A46 8DFF7086 890CC483 00001FA0 9A006AFC =j.......á...p..FÕ.Phå].v±.v=j.. 000080
 4688945E C4025719 26072926 DC5688DA 4688945E C4FF7086 890CC483 00002029 ) ...á...p.á^..FÕ.VÉ&).&.W.á^..F 0000A0
 945EC40A 57192608 4729260C 56880A46 88945EC4 06571926 04472926 E05688DE B.VÅ&)G.&.W.á^..FÕ.VÉ&)G.&.W.á^. 0000C0
 FFFF74B6 FF000019 8F9AFF72 B6FFFF74 B6FF0E57 19260C47 2926E056 88DE4688 .FB.VÅ&)G.&.W..Ñt..Ñr.......Ñt.. 0000E0
 B6FF5E90 68501686 46800271 E9037400 003D0000 19A09A50 16FF6A86 8DFF7286 Ñr...j..P.....=..t.Õq..FÑ.Ph.^.Ñ 000100
 FF74B6FF 0014E903 7500003D FF708689 0CC48300 0020639A 006AFF6A B6FFFF6C l..Ñj.j..c ...á...p.=..u.Õ...Ñt. 000120
 FF6AB6FF FF6CB6FF 5E8F6850 168E468D 027AE9FF 70868B00 00207F9A FF72B6FF .Ñr... ....p.Õz..Ff.Ph.^.Ñl..Ñj. 000140
 CF9AFF72 B6FFFF74 B6FF0014 E9037500 003DFF70 86890CC4 83000020 B39A006A j..° ...á...p.=..u.Õ...Ñt..Ñr..ü 000160
 00C9E903 74B85639 000D1E903 74B64639 08568B06 46880240 E9FF7086 8B000020  ....p.Õə..F..V.9FÑt.Õl.9V¡t.Õè. 000180
 003DFF70 86890CC4 83000020 EF9A006A FF6AB6FF FF6CB6FF 5E886850 16EA468D .Fõ.Ph.^.Ñl..Ñj.j..ÿ ...á...p.=. 0001A0
 6A5016D0 468D01F0 E9FF7086 88000021 0B9AFF72 B6FFFF74 B6FF0014 E9037500 .u.Õ...Ñt..Ñr...l....p.Õb..FÅ.Pj 0001C0
 E9037500 003DFF70 86890EC4 83000021 429A006A FF6AB6FF FF6CB6FF 5E9D6801 .h.^.Ñl..Ñj.j..B!...á...p.=..u.Õ 0001E0

Dump of file SATURN:[PCCOMMON.DUMP.DLL]SA-DIFM.DLL;1 on 18-APR-1990 10:50:26.92
File ID (450,15,0)   End of file block 323 / Allocated 324

Virtual block number 196 (000000C4), 512 (0200) bytes

 6A501600 468D006A 006A01B4 E9FF7086 88000021 5E9AFF72 B6FFFF74 B6FF0014 ...Ñt..Ñr..^!....p.ÕÇ.j.j..FÅ.Pj 000000
 6AFF6AB6 FFFF6CB6 FF5E9468 FF7EB6FF 8076FF00 6A006AFC 76FFFE76 FF006A00 .j..v±.v=j.j..v..Ñ-.h.^.Ñl..Ñj.j 000020
 21B09AFF 72B6FFFF 74B6FF00 14E90375 00003DFF 70868920 C4830000 21949A00 ...l...á ..p.=..u.Õ...Ñt..Ñr..¯l 000040
 8D008FE9 0374C056 390097E9 0374BE46 39085688 06468801 61E9FF70 86880000 ....p.Õə..F..V.9F/t.Õ..9Vât.Õ... 000060
 3DFF7086 890EC483 000021E7 9A006AFF 6AB6FFFF 6CB6FF5E 9D68006A 5016C246 Fõ.Pj.h.^.Ñl..Ñj.j..Õl...á...p.= 000080
 76FFFE76 FF010FE9 FF708688 00001A23 9AFF72B6 FFFF74B6 FF0014E9 03750000 ..u.Õ...Ñt..Ñr..#.....p.Õ...v±.v 0000A0
 FF6CB6FF 5E946800 6A006A50 16C2468D 006A006A FF7EB6FF 8076FF00 6A006AFC =j.j..v..Ñ~.j.j..Fõ.Pj.j.h.^.Ñl. 0000C0
 B6FFFF74 B6FF0014 E9037500 003DFF70 868920C4 8300001D FB9A006A FF6AB6FF .Ñj.j..«....á ..p.=..u.Õ...Ñt..Ñ 0000E0
 6A0676FF 0876FF60 2068FF6A B6FFFF6C B6FF00BC E9FF7086 88000022 3E9AFF72 r..>"....p.Õ¥..Ñl..Ñj.h '.v..v.j 000100
 1E8E9AFF 72B6FFFF 74B6FF00 14E90375 00003DFF 7086890C C4830000 1E749A00 ..t....á...p.=..u.Õ...Ñt..Ñr.... 000120
 0022B09A 006AFC76 FFFE76FF 601F68FF 6AB6FFFF 6CB6FF00 81E9FF70 86880000 ....p.Õ...Ñl..Ñj.h.'.v±.v=j..§". 000140
 70868800 0022039A FF72B6FF FF74B6FF 0014E903 7500003D FF708689 0CC48300 ..á...p.=..u.Õ...Ñt..Ñr..."....p 000160
 89260000 B80A5EC4 FF708689 0000FFFF 9A006AEE 76FFF076 FFFD74E9 0046E9FF .ÕF.Õt».vÞ.vŸj........p.á^.¡..&. 000180
 0022229A 006AFC76 FFFE76FF 50D86800 13E90375 FE4608FC 46886D47 89266F47 Go&.Gm.F=.F±u.Õ..hÅ].v±.v=j.."". 0001A0
 8B260A5E C4D88E15 45881E56 57000030 C8CBC95F 5E1F0000 E9000088 08C48300 ..á.¡..Õ...^_èùà0..WV.¡E..Åá^.&. 0001C0
 578B2604 478B26F8 5EC4EA46 8967478B 26F85EC4 FA5689F8 46890A57 8B260847 G.&.W..F½.V'Ž^¥&.Gg.Fõá^¥&.G.&.W 0001E0

Dump of file SATURN:[PCCOMMON.DUMP.DLL]SA-DIFM.DLL;1 on 18-APR-1990 10:50:26.92
File ID (450,15,0)   End of file block 323 / Allocated 324

Virtual block number 197 (000000C5), 512 (0200) bytes

 FF266B77 FF260A5E C40018E9 03756B47 08266947 8B260A5E C4E85689 E6468906 ..Fl.VÒá^.&.Gi&.Gku.Õ..á^.&.wk&. 000000
 C40018E9 03756747 08266547 8B260A5E C4D44689 06C48300 0023409A 006A6977 wij..M#...á..Fåá^.&.Ge&.Ggu.Õ..á 000020
 2600CC87 8B260A5E C4D44689 06C48300 0025269A 006A6577 FF266777 FF260A5E ^.&.wg&.wej..&%...á..Fåá^.&..ä.& 000040
 00002501 9AD676FF D876FF01 67E90375 D84608D6 46880856 89D64689 00CE978B ..ö..F=.VÅ.F=.FÅu.Õg..vÅ.v=..%.. 000060
 E876FF50 16EC468D 0139E903 7400003D 00002511 9A50160E 46800676 FFD876FF .vÅ.v=.FB.P..%..=..t.Õ9..F$.P.vÒ 000080
 11E90375 00003D04 468910C4 83000024 079A006A DE76FFE0 76FF2710 68E676FF .vlh.'.vÅ.vBj...$...á..Få=..u.Õ. 0000A0
 D876FF00 11E90374 EE4608EC 4688029E E9D4468B 000023E4 9AD676FF D876FF00 ..vÅ.v=.Õ#...FåÕ...F$.FŸt.Õ...vÅ 0000C0
 76FF2714 68E676FF E876FF04 6A5016E2 46800282 E90001B8 00002420 9AD676FF .v=. $..¡..Õ...Fã.Pj..vÒ.vlh.'.v 0000E0
 9AD676FF D876FF00 11E90375 00003004 468912C4 83000024 369A006A EC76FFEE Ÿ.v$j..6$...á..Få=..u.Õ...vÅ.v=. 000100
 D4468908 C4830000 24AB9A00 6ADE76FF E076FF60 E6680246 E9D4468B 0000244F O$...FåÕF.hl'.vÅ.vBj..¨$...á..Få 000120
 75E4460B E2468802 17E9D446 88000024 8F9AD676 FFD876FF 0011E903 7500003D =..u.Õ...vÅ.v=..$...FåÕ...Fã.Fõu 000140
 D446890C C483FFFF 10589AE2 76FFE476 FFF876FF FA76FF50 16FC468D 006AE903 .Õj..F=.P.v'.v½.vÕ.vã.X....á..Få 000160
 68FC76FF FE76FF01 D7E9D446 88000024 C49AD676 FFD876FF 0011E903 7500003D =..u.Õ...vÅ.v=.á$...FåÕ=..v±.v=h 000180
 D876FF00 11E90375 00003004 46890CC4 83000022 5D9A006A DE76FFE0 76FF60E7 Ò'.vÅ.vBj..]"...á..Få=..u.Õ...vÅ 0001A0
 260A5EC4 0000253A 9AD676FF D876FFFE AFE901A2 E9D4468B 00002279 9AD676FF .v=.y"...FåÕÅ.Õ£±.vÅ.v=.:%..á^.& 0001C0
 F476FFF6 76FF0044 E90375F6 4608F446 8BF65689 F4468900 89978B26 0087878B ....&.....F¶.V-.F¶.F-u.ÕÕ..v-.v¶ 0001E0
```

```
Dump of file SATURN:[PCCOMMON.DUMP.DLL]SA-DIFM.DLL;1 on 18-APR-1990 10:50:26.92
File ID (450,15,0)    End of file block 323 / Allocated 324

Virtual block number 198 (000000C6), 512 (0200) bytes

D276FF00 16E90374 00003D00 001E599A 50160046 8DF476FF F676FF00 001E499A .I....v-.v¶.FÅ.P.Y...=..t.Õ...v® 000000
5EC40000 FFFF9AF4 76FFF676 FFFFD2E9 D4468906 C4830000 FFFF9A00 6AD076FF .vÅj.......á..FâÕ®..v-.v¶.....á^ 000020
FFFF9A00 C0B7FF26 00C2B7FF 260A5EC4 0000255E 9A00BCB7 FF26008E B7FF260A .&.ñƒ.&.ñ¥..^%..á^.&.ñó.&.ñâ.... 000040
B7FF260A 5EC4EA76 FF000025 889A00C4 B7FF2600 C6B7FF26 0A5EC4EA 76FF0000 ...võá^.&.ñó.&.ñá...%...võá^.&.ñ 000060
FF0000FF FF9A6177 FF266377 FF260A5E C4EA76FF 0000259B 9A00B8B7 FF26008A ¤.&.ñ|...%...võá^.&.wc&.wa...... 000080
1277FF26 1477FF26 0A5EC4EA 76FF0000 25739A71 77FF2673 77FF260A 5EC4EA76 võá^.&.ws&.wq.s%...võá^.&.w.&.w. 0000A0
21E90375 F24608F0 4688F256 89F04689 6F578826 60478826 0A5EC400 00FFFF9A .....á^.&.Gm&.Wo.FÞ.V·.FÞ.F·u.Õl 0000C0
89000022 909A006A F076FFF2 76FFDC56 890A4689 65578826 63478826 F85EC400 .á^½&.Gc&.We.FÖ.VÉ.v·.vÞj...".. 0000E0
06E90375 00003D04 468908C4 83247808 489A0676 FF0876FF F876FFFA 76FFD446 Fâ.v³.v½.v..v..K.x$.á..Fâ=..u.Õ. 000100
680676FF 0876FF00 31E90375 00CA8708 2600C887 88260A5E C40049E9 D4468800 ..FâÕI.á^.&..à.&..ò.u.Õ1..v..v.h 000120
75000030 D446890C C4830000 23AF9A00 6A00C887 FF2600CA 87FF260A 5EC460E1 Å'á^.&.ñò.&.ñâ.j..£#...á..Fâ=..u 000140
8E220788 1E565700 00AAC8C8 C95F5E1F 0000E900 00880006 E9044688 0006E903 .Õ...FâÕ..|..Õ...^.èùà`..WV.¡a". 000160
4788260E 5EC4040E 4683D656 89D44689 FE578826 FC478826 0E5EC404 0E468308 Å.F..á^.&.G=&.W±.Fã.V®.F..¹^.&.G 000180
5EC4C446 89FE4788 260E5EC4 020E4683 0000C046 C7FA5689 F84689FE 578826FC ®&.W±.F½.V°úFâ...F..á^.&.G. Fáá^ 0001A0
04478826 F85EC49C 56899A46 8965578B 2663478B 26F85EC4 C2468967 478826F8 ½&.Gg.Fõá^½&.Gc&.We.F..V.á^.` G. 0001C0
4680B276 FFB476FF DB4689DA 46890000 88000084 46C78456 89B24689 06578826 &.W..Fý.VÇúF...|...FÖ.FÅ.vÇ.vý.F 0001E0

Dump of file SATURN:[PCCOMMON.DUMP.DLL]SA-DIFM.DLL;1 on 18-APR-1990 10:50:26.92
File ID (450,15,0)    End of file block 323 / Allocated 324

Virtual block number 199 (000000C7), 512 (0200) bytes

248646C7 0000FFFF 9AB276FF B476FF00 0BE90375 00BE7E83 0000FFFF 9A50168E ƒ.P......~ƒ.u.Õ...vÇ.vý.....úF.$ 000000
FF9A5052 0012050C 56880A46 88C276FF 00008C46 C700248A 46C70000 8846C700 .úF...úF.$.úF....vò.F..V....RP.. 000020
26024789 26000088 125FC426 0A5EC40A 8AE90003 E9037500 00308446 890000FF ....F.=..u.Õ..Õ...á^.&á .|..&.G.& 000040
FF0477FF 260677FF 26F85EC4 04478926 06478926 00008812 5FC4260A 5EC40789 ..á^.&á_.|..&.G.&.G.á^¶&.w.&.w.. 000060
0A3BE900 03E90375 00847E83 84468900 0008059A 5016CA46 80026AD4 76FFD676 v®.vâj..FÞ.P......F..~..u.Õ..Õ;. 000080
89260A5E C4000088 0003E900 01B80006 E9037500 C47E8300 09E90375 00CA7E83 .~ò.u.Õ...~á.u.Õ..|..Õ..|..á^.&. 0000A0
46890000 FFFF9A50 52000E05 0C56880A 46880476 FFD676FF B276FFB4 76FF0C47 G..vÇ.vý.v®.vâ.F..V....RP......F 0000C0
47892600 00880A5E C4104789 26C44688 0A5EC409 EEE90003 E9037500 847E8384 ..~..u.Õ..ÕY.á^..Fá&.G.á^..|..&.G 0000E0
26684789 26000088 0A5EC400 88878926 008D8789 26000088 0A5EC460 4789266F o&.Gmá^.|..&....&....á^.|..&.Gk& 000100
47C72601 407947C7 260A5EC4 0A578926 08478926 FA5688F8 46880A5E C4694789 .Giá^..F½.V®&.G.&.W.á^.&úGy∂.&úG 000120
8387C726 01400081 87C7260A 5EC40000 7747C726 00C87547 C7260A5E C400007B (..á^.&úGuà.&úGw..á^.&ú...∂.&ú.. 000140
88C276FF 00030085 87C7260A 5EC40000 7F47C726 00C87047 C7260A5E C4000000 ...á^.&úG)à.&úG...á^.&ú......vò. 000160
288F9A50 52007105 0C56880A 4688C276 FF0000FF FF9A5052 0087050C 56880A46 F..V....RP.......vò.F..V..q.RP.¢( 000180
FF9A5052 0061050C 56880A46 88C276FF 092BE900 03E90375 00003084 46890000 ...F.=..u.Õ..Õ+...vò.F..V..a.RP.. 0001A0
9A505200 B8050C56 880A4688 C276FF09 0AE90003 E9037500 00308446 890000FF ....F.=..u.Õ..Õ...vò.F..V..|.RP. 0001C0
505200C4 050C5688 0A4688C2 76FF08E9 E90003E9 03750000 3D844689 00002901 .)...F.=..u.Õ..ÕÕ..vò.F..V..á.RP 0001E0

Dump of file SATURN:[PCCOMMON.DUMP.DLL]SA-DIFM.DLL;1 on 18-APR-1990 10:50:26.92
File ID (450,15,0)    End of file block 323 / Allocated 324

Virtual block number 200 (000000C8), 512 (0200) bytes

5200CC05 0C56880A 4688C276 FF08C8E9 0003E903 7500003D 84468900 00289E9A ..(...F.=..u.Õ..Õà..vò.F..V..ä.R 000000
9A126A01 6A006A00 91978926 008F8789 26D6568B D446880A 5EC40000 28889A50 P..(..á^..Fâ.V®&....&....j.j.j.. 000020
260A5EC4 0000FFFF 9A136A01 6A006A00 8E978926 008C8789 260A5EC4 00002958 X)..á^.&..¥.&..ƒ.j.j.j......á^.& 000040
C47E8300 00009587 C7260A5E C4000000 9387C726 0A5EC400 C2978926 00C08789 ..ã.&..ó.á^.&ú.....á^.&ú.....~á 000060
D476FFD6 76FF2714 688276FF 8476FF04 6A5016FF 56868D08 52E90003 E9037500 .u.Õ..ÕR...V..Pj..vÇ.vÿh.'.v®.vâ 000080
FF036A50 169E468D 0823E900 03E90375 00003D84 468912C4 83000029 D19A006A j..1)...á..F.=..u.Õ..Õ#..F..Pj.. 0000A0
03750000 3D844689 12C48300 002A989A 006AD476 FFD676FF 27126882 76FFB476 vÇ.vÿh.'.v®.vâj...*...á..F.=..u. 0000C0
2600C487 88260A5E C4885689 86468973 57882671 4788260A 5EC407F5 E90003E9 Õ..Õ%.á^.&.Gq&.Ws.FÑ.V¡á^.&..á.& 0000E0
E90374A8 4608A646 8802E6E9 0374A046 089E4688 FF5C9689 FF5A8689 00C69788 ..ó...Z...\..F..F.t.ÕI..FI.F`t.Õ 000100
FF588608 FF568688 02C5E903 74A4460B A2468802 D0E90374 AC460BAA 468802DB Ü..F`.F`t.ÕÀ..FÀ.FÉt.Õé...V...X. 000120
04478926 06478926 00008886 5EC40789 26024789 26000088 B65EC400 3CE90375 u.Õ<.á^Ñ|..&.G.&..á^Ñ|..&.G.&.G. 000140
8FE90000 0E47C726 00C80C47 C726865E C400000A 47C72601 400847C7 26865EC4 á^Ñ&úG.∂.&úG...á^Ñ&úG.à.&úG...Õ¢ 000160
83000028 2E9A006A D476FFD6 76FF2713 688276FF 8476FF05 6A5016FF 6E868D01 ....n..Pj..vÇ.vÿh.'.v®.vâj...+... 000180
4689FF70 968BFF6E 86880000 FF7286C7 0728E900 03E90375 00003D84 468912C4 á..F.=..u.Õ..Õ+.ú.r.....n...p..F 0001A0
5EC4F876 FFFA76FF 5016AE46 8D0093E9 03750247 0B26078B 268A5EC4 BC5689BA ¤.V¥á^¤&..&.G.u.Õ...FÜ.P.v³.v½á^ 0001C0
76FFB476 FF0016E9 03750000 3D844689 0CC48326 1110589A 37FF2602 77FF268A ¤&.w.&.7.X..&.á..F.=..u.Õ...vÇ.v 0001E0
```

```
Dump of file SATURN:[PCCOMMON.DUMP.DLL]SA-DIFM.DLL;1 on 18-APR-1990 10:50:26.92
File ID (450,15,0)   End of file block 323 / Allocated 324

Virtual block number 201 (000000C9), 512 (0200) bytes

 FFB876FF 0043E903 75B0460B AE468806 CAE90000 2B4F9AFF 6EB6FFFF 70B6FFB2 ý.Ñp..Ñn..O+..Õò..FÛ.F¯u.`C..v|. 000000
 0016E903 7500003D 8446890C C4830000 26529A00 6AAE76FF B076FF50 C0688676 vÑhå].v¯.vÛj..R&...á..F.=. u.Õ.. 000020
 830007E9 0001FF72 86C70685 E900002B 759AFF6E B6FFFF70 B6FFB276 FFB476FF .vÇ.vý.Ñp..Ñn..u+..Õ..ú.r....... 000040
 7500003D 84468900 00FFFF9A FF6EB6FF FF70B6FF B276FFB4 76FFFF5E E904BA46 Fα.Õ^..vÇ.vý.Ñp..Ñn.......F.=..u 000060
 FF26F85E C40000C8 46C701E0 C646C700 AFE90374 00FF72BE 830654E9 0003E903 .Õ..ÕT..ƒr..t.ÕÉ.úFóÁ.úFà..á^½&. 000080
 89C8561B C64628FF 769688FF 74868800 00FFFF9A 5016FF74 868D6377 FF266577 we&.wc..t..P.......t...v.+Fó.Vá. 0000A0
 468D5016 F0468D9A 76FF9C76 FFF65689 F44689FF 7A9688FF 788688F2 5689F046 Fÿ.V·..x...z..F¶.V-.v..v..Fÿ.P.F 0000C0
 5688D046 88B65EC4 02578926 078926CE 5688CC46 88B65EC4 0000FFFF 9A5016CC ä.P.....á^Ñ.Fä.Vö&..&.W.á^Ñ.FÂ.V 0000E0
 08478926 B65EC400 D2830140 05025788 26078B26 B65EC406 57892604 478926D2 Ø&.G.&.W.á^Ñ&..&.W..ə..ø.á^Ñ&.G. 000100
 0E578926 0C478926 B65EC400 D28300C8 05065788 26044788 26B65EC4 0A578926 &.W.á^Ñ&.G.&.W..à..ø.á^Ñ&.G.&.W. 000120
 C4057CE9 0003E903 7500847E 83844689 06C4831E EF00009A F876FFFA 76FF176A j..v*.v½...ÿ..á..F..-..u.Õ..Õ|.á 000140
 A85689A6 46890A57 8B260847 8B26865E C4A05689 9E468902 578B2607 8B26B65E ^Ñ&..&.W..F..V.á^Ñ&.G.&.W..FÎ.V´ 000160
 89AA4689 0E578B26 0C478B26 B65EC4A4 5689A246 89065788 26044788 26B65EC4 á^Ñ&.G.&.W..FÅ.VÉá^Ñ&.G.&.W..F¨. 000180
 8300002D A89A006A D476FFD6 76FF2717 688276FF B476FF03 6A50169E 468DAC56 V¯.F..Pj..vÇ.vÿh.'.vø.våj..´-... 0001A0
 76FF04FD E904C483 2CE70064 9AF876FF FA76FF00 11E90375 00003D84 468912C4 á..F.=..u.Õ...v*.v½.d.Ó,.á.Õ»..v 0001C0
 B65EC400 43E904E1 E90003E9 03750000 3D844689 04C4832C 4B00649A F876FFFA *.v½.d.K,.á..F.=..u.Õ..ÕÄ.ÕC.á^Ñ 0001E0

Dump of file SATURN:[PCCOMMON.DUMP.DLL]SA-DIFM.DLL;1 on 18-APR-1990 10:50:26.92
File ID (450,15,0)   End of file block 323 / Allocated 324

Virtual block number 202 (000000CA), 512 (0200) bytes

 5EC40A57 89260847 8926A856 88A64688 B65EC402 57892607 8926A056 889E4688 .F..V.&..&.W.á^Ñ.FÎ.V´&.G.&.W.á^ 000000
 0E578926 0C478926 AC5688AA 4688B65E C4065789 26044789 26A45688 A24688B6 Ñ.FÅ.VÉ&.G.&.W.á^Ñ.F¨.V¯&.G.&.W. 000020
 FF5686FF FF58B6FF F876FFFA 76FF5016 FC468D01 B8E90375 FF58860B FF568688 ..V...X.u.Õ|..F=.P.v*.v½.ÑX..Ñv. 000040
 08E90374 FE460BFC 46880465 E90003E9 03750000 3D844689 0CC4832A EB10589A .X.Š*.á..F.=..u.Õ..Õe..F=.F±t.Õ. 000060
 FF50D868 00CA9789 2600C887 8926FE56 88FC4688 0A5EC404 52E90001 8446C700 .úF...ÕR.á^..F=.V±&..à.&..ò.hÄ]. 000080
 0C468D04 1EE90003 E9037500 003D8446 8908C483 00002DCE 9A006AFC 76FFFE76 v±.v=j..ö-...á..F.=..u.Õ..Õ...FÉ 0000A0
 0003E903 7500003D 8446890C C4830000 2DF49A00 6AFC76FF FE76FF50 C0685016 .Phå].v±.v=j..¶-...á..F.=..u.Õ.. 0000C0
 003D8446 890CC483 00002EED 9A006AFC 76FFFE76 FF601E68 50168E46 8D03F8E9 Õ½..F..Ph.'.v±.v=j..Ù....á..F.=. 0000E0
 88E04688 B65EC402 57112607 0126DE56 88DC4688 B65EC403 D2E90003 E9037500 .u.Õ..Õø.á^Ñ.FÉ.VB&..&.W.á^Ñ.FÁ. 000100
 4688B65E C40A5711 26084701 26DE5688 DC4688B6 5EC40657 11260447 0126E256 Vã&.G.&.W.á^Ñ.FÉ.VB&.G.&.W.á^Ñ.F 000120
 FF9A76FF 9C76FF00 82E90375 000C7F83 260A5EC4 0E571126 0C470126 E2568BE0 Á.Vã&.G.&.W.á^.&....u.Õ...v..v.. 000140
 EE76FF03 5EE90003 E9037500 003D8446 8900002F 349A5016 EC468D86 76FFB876 v|.vÑ.Fš.P.4/...F.=..u.Õ..Õ^..vŸ 000160
 76FFEE76 FF0340E9 0003E903 7500003D 84468900 002F529A 50168646 8DEC76FF .vš.F..P.R/...F.=..u.Õ..Õə..vŸ.v 000180
 FFEE76FF 031FE900 03E90375 00003D84 46890000 2F719A01 6A8E76FF 9076FFEC š.v..v.j..q/...F.=..u.Õ..Õ...vŸ. 0001A0
 76FF0876 FF0300E9 0003E903 7500003D 84468900 002F909A 0676FF08 76FFEC76 vš.v..v.../...F.=..u.Õ..Õ...v..v 0001C0
 E90003E9 03750000 3D844689 0CC48300 002FF09A 006AFC76 FFFE76FF 60E06806 .hÁ'.v±.v=j..Þ/...á..F.=..u.Õ..Õ 0001E0

Dump of file SATURN:[PCCOMMON.DUMP.DLL]SA-DIFM.DLL;1 on 18-APR-1990 10:50:26.92
File ID (450,15,0)   End of file block 323 / Allocated 324

Virtual block number 203 (000000CB), 512 (0200) bytes

 E9037500 0C7F8326 0A5EC400 C8878926 00CA8789 26000088 0A5EC400 9DE902D9 1.Õ..á^.|..&..ò.&..à.á^.&....u.Õ 000000
 03750000 3D844689 00001882 9A5016EC 468DB676 FFB876FF 9A76FF9C 76FF0080 ...v..v..v|.vÑ.Fš.P......F.=..u. 000020
 03E90375 00003D84 46890000 18A69A50 1686468D EC76FFEE 76FF0295 E90003E9 Õ..Õ...vŸ.vš.F..P.Î....F.=..u.Õ. 000040
 0003E903 7500003D 84468900 0018CD9A 016A006A 006AEC76 FFEE76FF 0277E900 .Õw..vŸ.všj.j.j..ë....F.=..u.Õ.. 000060
 E90003E9 03750000 3D844689 00001947 9A0676FF 0876FFEC 76FFEE76 FF0258E9 ÕX..vŸ.vš.v..v..G....F.=..u.Õ..Õ 000080
 6F578926 6D478926 EE5688EC 46880A5E C40014E9 0375000C 7F83260A 5EC40239 9.á^.&....u.Õ..á^..Fš.VŸ&.Gm&.Wo 0000A0
 76FF016A 50520016 050C5688 0A4688B6D 4789266F 47892600 00B80A5E C4000EE9 Õ..á^.|..&.Go&.Gm.F..V....RPj..v 0000C0
 E9037500 003D8446 8912C483 000029A3 9A006AD4 76FFD676 FF271268 B276FFB4 Ç.vÿh.'.vø.våj..È)...á..F.=..u.Õ 0000E0
 2CBB9A00 6AD476FF D676FF27 12688276 FFB476FF 096A5016 D8468D01 D6E90003 ..Õø..FÄ.Pj..vÇ.vÿh.'.vø.våj..£, 000100
 76FF0019 E90374DA 46080846 8801A8E9 0003E903 7500003D 84468912 C4830000 ...á..F.=..u.Õ..Õ´..FÄ.FÕt.Õ...v 000120
 00009787 C6260A5E C40CC483 0000307F 9A006AD4 76FFD676 FF272168 B276FFB4 Ç.vÿh!'.vø.våj...0...á.á^.&ó.... 000140
 779A006A D476FFD6 76FF271F 688276FF B476FF50 52009705 0C56880A 468B216A j!.F..V....RP.vÇ.vÿh.'.vø.våj..w 000160
 76FF0876 FFF876FF FA76FF01 46E90003 E9037500 847E8384 468912C4 83000031 1...á..F..-..u.Õ..ÕF..v*.v½.v..v 000180
 00009A0A 76FF0C76 FF0124E9 0003E903 7500003D 84468908 C4832063 081B9A06 ....c-.á..F.=..u.Õ..Õ$..v..v.... 0001A0
 FF5E8680 1FA5F200 08890A8E 1E0716F0 88FF5EBE 80B8568B B6468804 C4831D7E -..á..FÑ.V|.ƒ^..Þ....Õ¿..·È...^. 0001C0
 D2830BF7 06571B26 04472B26 FF5A9EC4 0E578B26 0C478B26 FF5A9EC4 026A5016 .Pj.á.Z.&.G.&.W.á.Z.&+G.&.W.¼Ä.ø 0001E0
```

```
Dump of file SATURN:[PCCOMMON.DUMP.DLL]SA-DIFM.DLL;1 on 18-APR-1990 10:50:26.92
File ID (450,15,0)   End of file block 323 / Allocated 324

Virtual block number 204 (000000CC), 512 (0200) bytes

 76FF0876 FF006A00 001DE09A E26AFF6A 5016FF5E 868D0000 10D19A50 52DAF700 .%ÖRP.¦.....^..Pj.jä.Å...j..v..v 000000
 50520016 050C568B 0A468B1E 6A006A00 6A006A50 16FF5E86 8D006A4B 6A006A06 .j.jKj...^..Pj.j.j.j..F..V....RP 000020
 003D8446 892CC483 000031B5 9A006A78 6A501692 468DF876 FFFA76FF 006A006A j.j..v'.v½.F..Pjxj..ç1...6,.F.=. 000040
 46890AC4 83000030 1E9A006A 9276FF94 76FF5DC7 68016A00 72E90003 E9037500 .u.Ö..Ör.j.hú].v..v.j...0...6..F 000060
 FF016A6B 57892669 47892694 56889246 880A5EC4 004FE900 03E90375 00003D84 .=..u.Ö..ÖO.6^..F..V.&.Gi&.Wkj.. 000080
 3D844689 12C48300 00FFFF9A 006A7A6A 50169646 8D476FF D676FFF8 76FFFA76 v'.v½.v.v.F..Pjzj.......6..F.= 0000A0
 7500BE7E 83675789 26654789 26985688 9646880A 5EC40011 E90003E9 03750000 ..u.Ö..Ö..6^..F..V.&.Ge&.Wg.~ƒ.u 0000C0
 56570000 0CC8CBC9 5F5E1F00 00E98446 880000FF FF9AB276 FF8476FF 000BE903 .Ö...vÇ.vý......F.Ö...^_èùà...WV 0000E0
 FE5689FC 4689FE57 8826FC47 88260E5E C4040E46 830000F6 46C7D88E 267DB81E .¦)&.ÄúF-...F..6^.&.G=&.W±.F=.V± 000100
 8DFC76FF FE76FFF8 76FFFA76 FFFA5689 F8468900 CE978826 00CC878B 260A5EC4 6^.&..ä.&..ö..F½.V'.v'.v½.v±.v=. 000120
 037400F4 7E830022 E9F6468B 0006E903 7500003D F6468900 00FFFF9A 5016F446 F¶.P......F-=..u.Ö...F-Ö"..-¶.t. 000140
 C95F5E1F 0000E9F6 468BF646 890000FF FF9AFC76 FFFE76FF 5016F846 8D0013E9 Ö...F½.P.v±.v=......F-.F-Ö...^ è 000160
 89F84689 FE578826 FC478826 0E5EC404 0E4683D8 8E3202B8 1E565700 000EC8CB ùà...WV.¦.2.Ä.F..6^.&.G=&.W±.F%. 000180
 F876FFFA 76FF5016 F4468DF6 5689F446 8900CE97 882600CC 878B260A 5EC4FA56 V'6^.&..ä.&..ö..F¶.V-.F¶.P.v'.v½ 0001A0
 00003AC8 CBC95F5E 1F0000E9 F2468BF2 46890000 FFFF9A50 16FC468D 016A006A j.j..F=.P......F·.F·Ö...^ èùà:.. 0001C0
 578826FC 4788260E 5EC4040E 46830000 F246C700 00CA46C7 D88E3289 881E5657 WV.¦.2.ÄúFò..úF·...F..6^.Ï.G=&.W 0001E0

Dump of file SATURN:[PCCOMMON.DUMP.DLL]SA-DIFM.DLL;1 on 18-APR-1990 10:50:26.92
File ID (450,15,0)   End of file block 323 / Allocated 324

Virtual block number 205 (000000CD), 512 (0200) bytes

 26085FC4 260A5EC4 FE5689FC 46890A57 88260847 88260A5E C4F65689 F44689FE ±.F¶.V-6^.&.G.&.W..F=.V±6^.&6_.& 000000
 5EC4F056 89EE4689 06578826 04478826 FC5EC4E4 5689E246 8965578B 2663478B .Gc&.We.Fä.VÕ6^=&.G.&.W..FŸ.VÞ6^ 000020
 2600BAB7 FF260A5E C4F476FF F676FFE8 5689E646 8900CE97 882600CC 878B260A .&..ä.&..ö..F|.VÒ.v-.v¶6^.&.ñα.& 000040
 C6468D00 6A006AE6 76FFE876 FF0000FF FF9A5016 DE468050 16CA4680 00B8B7FF .ñ¦..Fò.P.F8.P......vÒ.v|j.j..F6 000060
 7E830009 E9037E01 A2E9037D 00C87E83 01A8E903 7500CA7E 830000FF FF9A5016 .P......-ò.u.Ö¨..-à.).ÖÅ.-.Ö...~ 000080
 350E9A00 6A036A01 6A006A01 6A006A00 01009387 C7260A5E C40194E9 037700C6 6.w.Ö..6^.&ú.....j.j.j.j.j.j...5 0000A0
 00CC7E83 CC468906 C4833427 00009AFC 76FFFE76 FF2C6A00 0035159A 50520000 ..RP..5..j,.v±.v=...'4.6..Fä.-ä. 0000C0
 5016FA46 8D0000FF FF9A5016 EA468DE6 76FFE876 FF0264E9 CC468800 06E90375 u.Ö...FäÖd..vÒ.v|.Fõ.P......F'.P 0000E0
 76FF0014 E9037500 003DCC46 890CC483 0000346A 9A006AEA 76FFEC76 FF5DC568 hé].vš.võj..j4...6..Fä=..u.Ö...v 000100
 E876FF00 00237C9A E676FFE8 76FF021D E9CC468B 04C48334 8500649A FC76FFFE ±.v=.d..4.6..FäÖ...vÒ.v|.|#...vÒ 000120
 C76850D8 F7C01B01 FA7E8300 49E90374 00003D00 00238C9A 5016EA46 8DE676FF .v|.Fõ.P..#..=..t.Ö|..-'..â%ÄPhú 000140
 FFFE76FF 001FE903 75000030 CC46890A C4830000 30509A00 6AEA76FF EC76FF5D ].vš.võj..P0...6..Fä=..u.Ö...v±. 000160
 7E83FF9F E901B4E9 CC468800 0023C89A E676FFE8 76FF04C4 83340500 649AFC76 v=.d.ƒ4.6..vÒ.v|.à#...FäÖÇ.Ö...~ 000180
 0CC48300 001A899A 006A0676 FF0876FF 0A76FF0C 76FF601C 680039E9 037500FA '.u.Ö9.h.`.v..v..v..v.j.......6. 0001A0
 016FE9CC 468B04C4 83352200 649AFC76 FFFE76FF 0014E903 7500CC7E 83CC4689 .Fä.~ä.u.Ö...v±.v=.d."5.6..FäÕo. 0001C0
 00FFFF9A 5016F246 8D5016CE 468DFC76 FFFE76FF FFFF6835 B568E276 FFE476FF .vÕ.vãhç5h...v±.v=.Fö.P.F·.P.... 0001E0

Dump of file SATURN:[PCCOMMON.DUMP.DLL]SA-DIFM.DLL;1 on 18-APR-1990 10:50:26.92
File ID (450,15,0)   End of file block 323 / Allocated 324

Virtual block number 206 (000000CE), 512 (0200) bytes

 9AFC76FF FE76FF00 00FFFF9A 50520000 FFFF9A00 6A016A01 6A006A01 6A006A00 .j.j.j.j.j.j......RP......v±.v=. 000000
 C7260A5E C4000AE9 0117E9CC 46880006 E9037500 003DCC46 8904C483 2CD60064 d.ø,.6..Fä=..u.Ö...FäÖ..Ö..6^.&ú 000020
 8FB7FF26 0091B7FF 260A5EC4 EE76FFF0 76FF0001 0E47C726 0A5EC400 00009387 .....6^.&úG....vÞ.vŸ6^.&.ñ..&.ñ. 000040
 00F87E83 000D3E9CC 46880006 E9037500 003DCC46 89000027 DA9A5016 F8468D00 ..F½.P.Ö'...Fä=..u.Ö...FäÖ€..-½. 000060
 D8F7C018 01F87E83 008F87FF 260091B7 FF260A5E C4EE76FF F076FF00 21E90374 t.Ö|..vÞ.vŸ6^.&.ñ..&.ñ...-½..âKÅ 000080
 00003DCC 468908C4 8330A408 C59A0676 FF0876FF FC76FFFE 76FF0000 FFFF9A50 P......v±.v=.v..v..é.É0.6..Fä=.. 0000A0
 26078926 125FC426 0A5EC402 57882607 8826F45E C40084E9 CC468800 06E90375 u.Ö...FäÖ..6^¶&..&.W.6^.&6_.&..& 0000C0
 F27E8306 57892604 47892612 5FC4260A 5EC40657 88260447 8826F45E C4025789 .W.6^¶&.G.&.W.6^.&6_.&.G.&.W..-· 0000E0
 0000FFFF 9A5016CE 468D7177 FF267377 FF260A5E C45016CE 46800020 E9037500 .u.Ö-..Fö.P6^.&.ws&_wq.Fö.P..... 000100
 7377FF26 0A5EC4E2 76FFE476 FF0016E9 00003645 9A5016CE 468DE276 FFE476FF .vÕ.vã.Fö.P.E6..Ö...vÕ.vã6^.&.ws 000120
 D88E32E4 881E5657 000034C8 CBC95F5E 1F0000E9 00008800 00FFFF9A 7177FF26 &.wq.....|..Ö...^_èùà4..WV.¦Ö2.Ä 000140
 C4F85689 F64689FE 578826FC 4788260E 5EC4040E 46830000 F446C700 000046C7 úFÅ..úF¶...F..6^.Ï.G=&.W±.F-.V½6 000160
 8965578B 2663478B 26085FC4 260A5EC4 FE5689FC 46890A57 88260847 88260A5E ^.&.G.&.W..F=.V±6^.&6_.&.Gc&.We. 000180
 000E7F83 260A5EC4 EE5689EC 468900CE 97882600 CC878826 0A5EC4EA 5689E846 FÒ.VÕ6^.&..ä.&..ö..Fš.VŸ6^.&.... 0001A0
 0034B99A 006A0676 FF0876FF 0A76FF0C 76FF5DCC 68F676FF F876FF00 36E90374 t.Ö6..v½.v-hë].v..v..v..v.j..¿4. 0001C0
 76FFF876 FF022DE9 00008802 33E9D246 880006E9 03750000 3DD24689 10C48300 ..6..Fø=..u.Ö...FøÖ3.|..Ö-..v½.v 0001E0
```

Dump of file SATURN:[PCCOMMON.DUMP.DLL]SA-DIFM.DLL;1 on 18-APR-1990 10:50:26.92
File ID (450,15,0)   End of file block 323 / Allocated 324

Virtual block number 207 (000000CF), 512 (0200) bytes

EE76FF00 00336F9A 5016E446 8D5016D0 468D00B8 87FF2600 BAB7FF26 0A5EC4F6 -é^.&.ñα.&.ñ¡..FÅ.P.Fõ.P.o3...vŸ 000000
037D00CE 7E8301DE E9037500 D07E8300 0033839A 5016CC46 8D006A00 6AEC76FF .v&j.j..Fä.P..3...-Å.u.Õ8..-ö.). 000020
6A016A00 6A000100 9387C726 0A5EC401 C7E90377 00CC7E83 0009E903 7E01D5E9 Õí.-.Õ...-ä.w.Õú.é^.&ú.....j.j.j 000040
37D10000 9AFC76FF FE76FF2C 6A000038 F29A5052 000038EB 9A006A03 6A016A00 .j.j.j..Š8..RP.·8..j,.v±.v•...Ï7 000060
5016F046 8DEC76FF EE76FF01 93E90246 880006E9 037500D2 7E83D246 8906C483 .é..F@.-@.u.Õ...F@Õ...vŸ.vš.Fþ.P 000080
D246890C C4830000 38149A00 6AF076FF F276FF50 C5685016 FA468D00 0033F79A .¥3...Fª.Phé].v·.vþj...8...é..F@ 0000A0
FFEE76FF 014CE9D2 468804C4 83382F00 649AFC76 FFFE76FF 0014E903 75000030 =..u.Õ...v±.v•.d./8.é..F@ÕL..vŸ. 0000C0
830049E9 03740000 3D000034 499A5016 F0468DEC 76FFEE76 FF000034 399AEC76 vš.94...vŸ.vš.Fþ.P.I4..=..t.ÕI.. 0000E0
0030D246 890AC483 0000340C 9A006AF0 76FFF276 FF5DC768 5008F7C0 1801FA7E -ª..å¥ÄPhú].v·.vþj...4...é..F@=. 000100
88000034 919AEC76 FFEE76FF 04C48338 7F00649A FC76FFFE 76FF001F E9037500 .u.Õ...v±.v•.d..8.é..vŸ.vš..4... 000120
0676FF08 76FF0A76 FF0C76FF 601C6800 39E90375 00FA7E83 FF9FE900 E3E90246 F@ÕD.Õ...-ª.u.Õ9.h.`.v..v..v..v. 000140
FF00649A FC76FFFE 76FF0014 E9037500 D27E83D2 46890CC4 83000036 0D9A006A j..Ï6...é..F@.-@.u.Õ...v±.v•.d.. 000160
16D4468D FC76FFFE 76FF34EA 6834E768 E876FFEA 76FF009E E9024688 04C48338 8.é..F@Õ...võ.vÒhÕ4hõ4.v±.v•.Få. 000180
7377FF26 0A5EC450 16D4468D 002AE903 7500F47E 83000034 FD9A5016 F4468D50 P.F¶.P.×4...-¶.u.Õ*..Få.Pé^.&.ws 0001A0
006A0000 362C9A50 16D4468D E876FFEA 76FF0000 361C9A50 16D4468D 7177FF26 &.wq.Få.P..6...võ.vÒ.Få.P.,6..j. 0001C0
D400649A FC76FFFE 76FF0000 33C59A50 52000033 8E9A006A 016A016A 006A016A j.j.j.j.j../3..RP.é3...v±.v•.d.å 0001E0

Dump of file SATURN:[PCCOMMON.DUMP.DLL]SA-DIFM.DLL;1 on 18-APR-1990 10:50:26.92
File ID (450,15,0)   End of file block 323 / Allocated 324

Virtual block number 208 (000000D0), 512 (0200) bytes

009387C7 260A5EC4 000AE900 13E90246 880006E9 03750000 3D024689 04C48333 3.é..F@=..u.Õ...F@Õ..Õ..é^.&ú... 000000
46C70000 CA46C7D8 8E365C88 1E565700 003AC8CB C95F5E1F 0000E900 00B80000 ..¡..Õ...^_èùà:..WV.¡\6.ÄúFò..úF 000020
26084788 260A5EC4 F65689F4 4689FE57 8826FC47 88260E5E C4040E46 830000F2 ·...F..é^.Ï.G•&.W±.F¶.V-é^.&.G.& 000040
5EC4E456 89E24689 65578826 63478826 085FC426 0A5EC4FE 5689FC46 890A5788 .W..F•.V±é^.&é_.&.Gc&.We.Fã.Vôé^ 000060
89E64689 00CE9788 2600CC87 88260A5E C4F05689 EE468906 57882604 478826FC •&.G.&.W..FŸ.Vÿé^.&..ä.&..ö..Fl. 000080
006A0676 FF0876FF 50CC68F4 76FFF676 FF0030E9 0374000E 7F83260A 5EC4E856 VÒé^.&....t.Õ0..v-.v¶hä].v..v.j. 0000A0
FF0312E9 00008803 18E9CC46 880006E9 03750000 3DCC4689 0CC48300 0037869A .Ñ7...é..Fä=..u.Õ...FäÕ..¡..Õ... 0000C0
003A1F9A 50160E46 805016CA 468D00B8 87FF2600 BAB7FF26 0A5EC4F4 76FFF676 v-.v¶é^.&.ñα.&.ñ¡..Fò.P.F8.P..:. 0000E0
199A5016 DE468D50 16CA468D 00B887FF 2600BAB7 FF260A5E C4F476FF F676FF00 ..v-.v¶é^.&.ñα.&.ñ¡..Fò.P.F8.P.. 000100
019DE903 7500CA7E 83000037 2D9A5016 C6468D00 6A006AE6 76FFE876 FF000037 7...vÒ.vÏj.j..Fó.P.-7...-ò.u.Õ.. 000120
01009387 C7260A5E C40186E9 037700C6 7E830009 E9037E01 94E9037D 00C87E83 .-à.).Õ..-.Õ...-ó.w.Õ..é^.&ú.... 000140
76FFFE76 FF2C6A00 00376F9A 50520000 37689A00 6A036A01 6A006A01 6A006A00 .j.j.j.j.j.j..h7..RP.o7..j,.v±.v 000160
76FFE876 FF0256E9 CC468800 06E90375 00CC7E83 CC468906 C483377E 00009AFC •...-7.é..Fä.-ä.u.Õ...FäÕV..vÒ.v 000180
00003B0C 9A006AEA 76FFEC76 FF50C568 5016FA46 8D000037 A19A5016 EA468DE6 Ï.Fõ.P.Å7...Fª.Phé].vš.võj...;.. 0001A0
FF000037 E39AE676 FFE876FF 021DE9CC 46880006 E9037500 0030CC46 890CC483 .é..Fä=..u.Õ...FäÕ...vÒ.vÏ.D7... 0001C0
50D8F7C0 1801FA7E 830049E9 03740000 30000037 F39A5016 EA468DE6 76FFE876 vÒ.vÏ.Fõ.P.µ7..=..t.ÕI..-ª..å¥ÄP 0001E0

Dump of file SATURN:[PCCOMMON.DUMP.DLL]SA-DIFM.DLL;1 on 18-APR-1990 10:50:26.92
File ID (450,15,0)   End of file block 323 / Allocated 324

Virtual block number 209 (000000D1), 512 (0200) bytes

76FF001F E9037500 0030CC46 890AC483 000039C1 9A006AEA 76FFEC76 FF50C768 hú].vš.võj..è9...é..Fä=..u.Õ...v 000000
FF9FE901 B4E9CC46 88000038 3B9AE676 FFE876FF 04C4833B 7700649A FC76FFFE ±.v•.d.w;.é..vÒ.vÏ.;8...FäÕÇ.Õ.. 000020
83000038 639A006A 0676FF08 76FF0A76 FF0C76FF 601C6800 39E90375 00FA7E83 .-ª.u.Õ9.h.`.v..v..v..v.j..c8... 000040
E9CC4688 04C4833B C400649A FC76FFFE 76FF0014 E9037500 CC7E83CC 46890CC4 é..Fä.-ä.u.Õ...v±.v•.d.é;.é..FäÕ 000060
A79A5016 F2468D50 16CE468D FC76FFFE 76FF3894 683C5768 E276FFE4 76FF016F o..võ.vãhW<h.8.v±.v•.Fö.P.F·.P.Ï 000080
76FFFE76 FF00003A 759A5052 00003A6E 9A006A01 6A016A00 6A016A00 6A000038 8..j.j.j.j.j.j..n:..RP.u:...v±.v 0000A0
0A5EC400 0AE90117 E9CC4688 0006E903 75000030 CC468904 C4833A84 00649AFC •.d..:.é..Fä=..u.Õ...FäÕ..Õ..é^. 0000C0
FF260091 87FF260A 5EC4EE76 FFF076FF 00000E47 C7260A5E C4000000 9387C726 &ú.....é^.&úG....vþ.vŸé^.&.ñ..&. 0000E0
7E830003 E9CC4688 0006E903 75000030 CC468900 0035679A 5016F846 8D008FB7 ñ...F½.P.g5...Fä=..u.Õ...FäÕ«..~ 000100
C01801F8 7E83008F 87FF2600 9187FF26 0A5EC4EE 76FFF076 FF0021E9 037500F8 ½.u.ÕI..vþ.vŸé^.&.ñ..&.ñ...-½..å 000120
30CC4689 08C48338 910A779A 0676FF08 76FFFC76 FFFE76FF 000035A2 9A5008F7 ¥ÄP.Å5...v±.v•.v..v..w..8.é..Fä= 000140
8926125F C4260A5E C4025788 26078826 F45EC400 84E9CC46 880006E9 03750000 ..u.Õ...FäÕ..é^¶&..&.W.é^.&é_.&. 000160
83065789 26044789 26125FC4 260A5EC4 06578826 04478826 F45EC402 57892607 .&.W.é^¶&.G.&.W.é^.&é_.&.G.&.W.. 000180
38CA9A50 16CE468D 7177FF26 7377FF26 0A5EC450 16CE468D 002DE903 7500F27E -·.u.Õ-..Fö.Pé^.&.ws&.wq.Fö.P.ò8 0001A0
FF260A5E C4E276FF E476FF00 16E90000 3CE79A50 16CE468D E276FFE4 76FF0000 ...võ.vã.Fö.P.Ó<..Õ...võ.vãé^.&. 0001C0
3935B81E 56570000 54C8CBC9 5F5E1F00 00E90000 B8000038 DA9A7177 FF267377 ws&.wq.Õ8..¡..Õ...^_èùàT..WV.¡59 0001E0

Dump of file SATURN:[PCCOMMON.DUMP.DLL]SA-DIFM.DLL;1 on 18-APR-1990 10:50:26.92
File ID (450,15,0)   End of file block 323 / Allocated 324

Virtual block number 210 (00000002), 512 (0200) bytes

```
5689EA46 89025788 26078B26 00C49FC4 260A5EC4 0000E446 C7001EE2 46C7D88E .ÄúFã..úFõ..á^.&á.á.&..&.W..Fõ.V 000000
2600C49F C4260A5E C4F05689 EE468906 57882604 47882600 C49FC426 0A5EC4EC $á^.&á.á.&.G.&.W..FŸ.VÞá^.&á.á.& 000020
F6468906 57882604 47882600 C49FC426 0A5EC4F4 5689F246 890A5788 26084788 .G.&.W..F·.V¶á^.&á.á.&.G.&.W..F- 000040
5EC4FE56 89FC4689 0A578826 08478826 0A5EC400 00E046C7 00008C46 C7F85689 .V½úF¥..úFÅ..á^.&.G.&.W..F=.V±á^ 000060
89CC4689 00CE9788 2600CC87 88260A5E C4CA5689 C8468965 57882663 47882 6FC =&.Gc&.We.Fà.Vòá^.&..ä.&..ö..Fä. 000080
260677FF 26FC5EC4 50520097 050C5688 0A468821 6A000097 87C6260A 5EC4CE56 Vöá^.&ó....j|.F..V....RPá^=&.w.& 0000A0
BE468912 C4830000 3ABC9A00 6A008FB7 FF260091 B7FF260A 5EC4271F 680477FF .w.h.'á^.&.ñ..&.ñ..j..¥:...á..Ff 0000C0
339A5016 E6468000 6A006ACC 76FFCE76 FF0308E9 BE468800 06E90375 00BE7E83 .~f.u.Õ...FfÕ...vö.väj.j..F|.P.3 0000E0
FF0058E9 0375E846 0BE6468B 02E3E98E 46880006 E9037500 003DBE46 8900003A :...Ff=..u.Õ...FfÕO..F|.FÒu.Õ[.. 000100
02B7E9BE 46880006 E9037500 003DBE46 8900003A A79A5016 C44680CC 76FFCE76 vö.vä.Fá.P.I:...Ff=..u.Õ...FfÕñ. 000120
03750000 3DBE4689 0CC48300 003DD69A 006AC476 FFC676FF 5DC56850 16FA4680 .F*.Phé].vó.vój..ø=...á..Ff=..u. 000140
7F83260A 5EC4E046 89D8F7C0 1801BC7E 83BC4689 FA468802 8EE98E46 88 0006E9 Õ...FfÕ...F*.F¥.-¥..äKÄ.FÁá^.&.. 000160
C876FFCA 76FF002C E9037500 107F8326 0A5EC402 6AE90000 880006E9 0374000C ..t.Õ..|..Õj.á^.&....u.Õ,..vò.và 000180
0000FFFF 9A026A00 6A006A01 6A246A00 6A246A00 6A7177FF 267377FF 260A5EC4 á^.&.ws&.wqj.j$j.j$j.j.j.j...... 0001A0
026A006A C876FFCA 76FF0000 FFFF9A50 16C04680 C876FFCA 76FF0231 E9000088 |..Õ1..vò.và.Fá.P......vò.vàj.j. 0001C0
89025688 D0468800 00FFFF9A 50160046 80008887 FF2600BA B7FF260A 5EC4016A j.á^.&.ñα.&.ñ|..FÅ.P......FÅ.VØ. 0001E0
```

Dump of file SATURN:[PCCOMMON.DUMP.DLL]SA-DIFM.DLL;1 on 18-APR-1990 10:50:26.92
File ID (450,15,0)   End of file block 323 / Allocated 324

Virtual block number 211 (00000003), 512 (0200) bytes

```
DC468882 5689B046 89D6568B D44688B6 5689B446 89DA568B D8468BAE 5689AC46 F¯.VÙ.FÄ.VÖ.FÇ.VÑ.Få.Vø.F¯.Vý.FÊ 000000
026A006A C876FFCA 76FF000F E9037500 0E7F8326 0A5EC4BA 5689B846 890E568B .VB.F|.Vαá^.&....u.ÕÒ..vò.vàj.j. 000020
52009705 0C5688 0A 4688C876 FFCA76FF 000040BE 9A086A06 6A006A50 16EA4680 .Fõ.Pj.j.j..f@...vò.vò.F..V....R 000040
83000040 ED9A006A 006A006A 00C4B7FF 2600C687 FF260A5E C4E276FF E476FF50 P.vò.vãá^.&.ñó.&.ñá.j.j.j..Ù@... 000060
8D006A00 6A00BCB7 FF2600BE B7FF260A 5EC4C076 FFC276FF 0031E903 7500E07E -Å.u.Õ1..vò.vàá^.&.ñf.&.ñ¥.j.j.. 000080
E9037500 8C7E8300 37E9BE46 8900003F E99A046A 006A006A 076A006A 5016AC46 F¯.Pj.j.j.j.j..Õ7...FfÕ7..-¥.u.Õ 0000A0
006A5016 AC468000 6A006A00 C0B7FF26 00C2B7FF 260A5EC4 C076FFC2 76FF002E ...vò.vàá^.&.ñó.&.ñà.j.j..F¯.Pj. 0000C0
77FF2673 77FF260A 5EC4C876 FFCA76FF BE468900 0040459A 046A006A 006A076A j.j.j.j..E@...Ff.vò.vàá^.&.ws&.w 0000E0
76FF0031 E9037500 E07E8300 DCE90000 40A49A24 6A006A24 6A006A06 6A086A71 qj.j.j.j$j.j$.É@..ÕÉ..-Å.u.Õ1..v 000100
006A076A 006A5016 AC468000 6A006A00 8CB7FF26 00BEB7FF 260A5EC4 C076FFC2 ô.vãá^.&.ñf.&.ñ¥.j.j..F¯.Pj.j.j. 000120
5EC4C076 FFC276FF 002EE903 75008C7E 830037E9 BE468900 00407F9A 046A006A j.j...@...FfÕ7..-¥.u.Õ...vò.vãá^ 000140
FF9A046A 006A006A 076A006A 5016AC46 80006A00 6A00C087 FF2600C2 B7FF260A .&.ñó.&.ñã.j.j..F¯.Pj.j.j.j.j... 000160
6A246A00 6A066A00 6A7177FF 267377FF 260A5EC4 C876FFCA 76FFBE46 890000FF ....Ff.vò.vàá^.&.ws&.wqj.j.j.j$j 000180
FFFF9A01 6A066A00 6A5016EA 468D026A 006AC876 FFCA76FF 0000FFFF 9A246A00 .j$......vò.vàj.j..Fõ.Pj.j.j.... 0001A0
C687FF26 0A5EC4E2 76FFE476 FF505200 97050C56 880A4688 C876FFCA 76FF0000 ...vò.và.F..V....RP.võ.vãá^.&.ñó 0001C0
00000AC8 CBC95F5E 1F0000E9 00008800 00FFFF9A 006A006A 006A00C4 B7FF2600 .&.ñá.j.j.j......|..Õ...^_èùà... 0001E0
```

Dump of file SATURN:[PCCOMMON.DUMP.DLL]SA-DIFM.DLL;1 on 18-APR-1990 10:50:26.92
File ID (450,15,0)   End of file block 323 / Allocated 324

Virtual block number 212 (00000004), 512 (0200) bytes

```
0E4683FA 5689F846 89FE5788 26FC4788 260E5EC4 040E4683 D88E3CFE B81E5657 WV.|±<.Ä.F..á^.&.G=&.W±.F%.V*.F. 000000
68F876FF FA76FF09 6A5016FC 468DFE56 89FC4689 FE578826 FC478826 0E5EC404 .á^.&.G=&.W±.F=.V±.F=.Pj.. '*.V½h 000020
46880006 E9037500 F67E83F6 468912C4 83000041 8C9A006A 0676FF08 76FF2717 .'.v..v.j...A...á..F-.--.u. ...F 000040
F876FFFA 76FF5052 0097050C 56880A46 88216A00 009787C6 260A5EC4 0047E9F6 -ÕG.á^.&ó....j|.F..V....RP.v .v½ 000060
880006E9 037500F6 7E83F646 8912C483 00003E51 9A006A06 76FF0876 FF271F68 h.'.v..v.j..Q>...á..F-.--.u.Õ... 000080
040E4683 D88E4104 B81E5657 000016C8 CBC95F5E 1F0000E9 00008800 06E9F646 F-Õ..|..Õ...^_èùà...WV.|.A.Ä.F.. 0000A0
FE578826 FC478826 0E5EC404 0E4683F2 5689F046 89FE5788 26FC4788 260E5EC4 á^.&.G=&.W±.FÞ.V·.F..á^.&.G=&.W± 0000C0
88260847 88260A5E C46B5789 26694789 26F2568B F04688 0A 5EC4FA56 89F84689 .F%.V*á^..FÞ.V·&.GI&.Wká^.&.G.&. 0000E0
76FFFE76 FF136AF6 5689F446 89065788 26044788 26FC5EC4 FE5689FC 46890A57 W..F=.V±á^=&.G.&.W..F¶.V-j..v±.v 000100
76FFF676 FF009AE9 EA468800 06E90375 00EA7E83 EA468906 C4833827 00009AFC =...';.á..Fõ.-õ.u.Õ...FõÕ...v-.v 000120
7E83EA46 890000FF FF9AF876 FFFA76FF 016A008F B7FF2600 91B7FF26 0A5EC4F4 ¶á^.&.ñ..&.ñ..j..v*.v½......Fõ.~ 000140
6377FF26 6577FF26 FC5EC404 C48342CD 00649AFC 76FFFE76 FF0044E9 037500EA õ.u.ÕD..v±.v=.d.ëB.á.á^=&.we&.wc 000160
FFFF9AEC 76FFEE76 FFEA76FF F876FFFA 76FF0508 681E0000 FFFF9A50 16EC4680 .F$.P......h...v*.v½.võ.vŸ.v£... 000180
FF00569A 50520016 050C5688 0A4688F8 76FFFA76 FF002AE9 EA46880E C4830000 ...á..FõÕ*..v*.v½.F..V....RP.V.. 0001A0
56570000 18C8CBC9 5F5E1F00 00E904C4 83422400 649AFC76 FFFE76FF 08C483FF ..á..v±.v=.d.$B.á.Õ...^_èùà...WV 0001C0
0A5EC400 003ADB9A 00CCB7FF 2600CEB7 FF260A5E C40000FA 46C7D88E 41B8B81E .||A.ÄúF*..á^.&.ñö.&.ñä..Ü:..á^. 0001E0
```

Dump of file SATURN:[PCCOMMON.DUMP.DLL]SA-DIFM.DLL;1 on 18-APR-1990 10:50:26.92
File ID (450,15,0)   End of file block 323 / Allocated 324

Virtual block number 213 (000000D5), 512 (0200) bytes

```
16FA468D 0039E903 7400003D 00003AE8 9A5016FC 468D00CC B7FF2600 CEB7FF26 &.ñö.&.ñä..F=.P.Š:..=..t.Ö9..F*. 000000
0A5EC400 15E90375 00FA7E83 0CC48300 0044049A 006AFC76 FFFE76FF 5DC56850 Phé].v±.v=j...D...á..-*.u.Õ..á^. 000020
73578826 71478826 0A5EC4FF A8E90003 E900003B 339A00CC B7FF2600 CEB7FF26 &.ñö.&.ñä..3;..Õ..Õ'.á^.&.Gq&.Ws 000040
2600C49F C4260A5E C4026A50 16E8468D 1FA5F200 0889DA8E 1E0716F0 8BE87E8D .-Ò.Þ....Õ¿..·Ê..FÒ.Pj.á^.&á.á.& 000060
5052DAF7 00028308 F706571B 2604472B 2600C49F C4260A5E C40E5788 260C4788 .G.&.W.á^.&á.á.&+G.&.W.%Ä.Ø.%ÖRP 000080
0C478826 715FC426 0A5EC401 6A5016E8 468D0032 E9037500 FA7E8300 0043DC9A .ÉC...-*.u.Õ2..FÒ.Pj.á^.&á q&.G. 0000A0
00003106 9A505200 DA8300A0 2D06571B 2604472B 26715FC4 260A5EC4 0E578826 &.W.á^.&á q&+G.&.W.-...Ö.RP̄..1.. 0000C0
77FF2668 77FF260A 5EC45F51 685016E8 468D0000 31159AE2 6AFF6A50 16E8468D .FÒ.Pj.jã..1...FÒ.PhQ_á^.&.wk&.w 0000E0
E9F8468B 0006E9F8 468B0006 E9037500 003DF846 890CC483 0000414B 9A006A69 ij..KA...á..F½=..u.Õ..F½Õ...F½Õ 000100
1F0000E9 00020508 56880646 880B8E42 E2881E56 57000000 C8C8C95F 5E1F0000 ...^_èùà...WV.¡ãB.Ä.F..V....Õ... 000120
0000E900 91978826 008F8788 26065EC4 D88E442F B81E5657 000000C8 C8C95F5E ^_èùà...WV.¡/D.Äá^.&....&....Õ.. 000140
6AFFFF68 30C06857 6AFFFF68 447A68D8 8E444CB8 1E565700 0000C8C8 C95F5E1F .ˣ_èùà...WV.¡LD.ÄhzDh..jWhá0h..j 000160
1F0000E9 1EC48300 00FFFF9A 006A7A6A 016A006A 006A0000 68050A68 1E026A79 yj̄..h..hÅ.j.j.j.jzj.......á.Õ... 000180
02030061 00042940 01030141 00082704 02030B80 00104495 0203003F C8C95F5E ^_èù?....D.......'..A...@)..a... 0001A0
02030A8E 000F3EF5 02034444 000A4475 0005032B 00083E2B 020303A3 000C39FD »9̄..È...+>..+...uD..DD..%>...... 0001C0
02030C0D 0004388C 000500C8 00084257 020305A2 000014F4 020302AF 000842F9 *B..£...¶...Å...WB..ù....;...... 0001E0
```

Dump of file SATURN:[PCCOMMON.DUMP.DLL]SA-DIFM.DLL;1 on 18-APR-1990 10:50:26.92
File ID (450,15,0)   End of file block 323 / Allocated 324

Virtual block number 214 (000000D6), 512 (0200) bytes

```
02030155 000831E8 02030893 0010432D 02030000 00043889 000203AE 000C28E0 Å(..Ö....;......-C......Š1..U... 000000
00020161 00082718 02030348 0008326F 02030388 000C25AE 020302C0 0008434B KC..à...Û%..£...o2..H....'..a... 000020
020308CA 0000D28E4 0203010C 00043FAF 010302D4 00084310 02030000 000A4472 rD.......C..å...£7......ð+..ð... 000040
020300FA 00082B0A 02030000 000D4270 00020883 00103154 020307CB 00001923 #...ù...T1..*...pB........+..*... 000060
000202E8 00082922 02030C37 0011429E 02030554 000D2BAD 02030A42 000F3F4C L7..B...Û+..T....B..7...")..Ò... 000080
000208C4 00102325 0203050B 00002EC9 02030181 00083C44 02030000 0010428F ¢B......D<.......è...Ü...%#..á... 0000A0
02030563 000D389F 020302F3 00082408 02030AD1 000F3ED2 02030000 0012446D mD......Ø>..Ì...Ä$..µ....;..c... 0000C0
02030ADD 000F4286 02030191 00083C09 020303EF 000C43EA 02030A56 000F3EBC ¥>..V...õC..ÿ....<.......B..Ì... 0000E0
020303FA 000C43A1 02030300 00083DFF 020308D7 0010385B 020305EE 00002E89 ....Ÿ...[;..■....=......ÅC..*... 000100
02034427 000A447D 0005030D 00083245 02030A69 000F3F7B 02030579 00002E68 k...y...(?..Ì...E2......)D..'D.. 000120
02030978 000F3CCE 02030587 000D25FB 020300C5 0005254C 0103038A 000C273F ?'......L%..é...«%......ð<..x... 000140
0103005B 00043880 0103041B 000C3CBE 02030396 000C25C1 0203031C 000832CA ð2.......è%......ƒ<......‾; .[... 000160
00000A06 000F400E 0203008D 0008278D 02030595 00002EAA 0203005C 00043887 ñ;..\...˘.........'..§....â  .... 000180
FE578826 FC478826 0E5EC404 0E468300 008446C7 D88EFFFF 881E5657 00006CC8 àl..WV.¡...ÄúFÇ...F..á^.&.G=&.W± 0001A0
C4020E46 83FE5689 FC4689FE 578826FC 4788260E 5EC4040E 46838856 89864689 .FÑ.V¡.F..á^.&.G=&.W±.F=.V±.F..á 0001C0
478826FC 5EC4D856 89064689 06578826 04478826 FC5EC4E6 4689FE47 88260E5E ^.&.G±.FÌá^=&.G.&.W..Fø.VÄá^=&.G 0001E0
```

Dump of file SATURN:[PCCOMMON.DUMP.DLL]SA-DIFM.DLL;1 on 18-APR-1990 10:50:26.92
File ID (450,15,0)   End of file block 323 / Allocated 324

Virtual block number 215 (000000D7), 512 (0200) bytes

```
5016DE46 8D0676FF D876FFC4 5689C246 89655788 26634788 26FC5EC4 E0468967 g.FÁá^=&.Gc&.We.Fô.Vá.vÄ.vø.FB.P 000000
88FC4688 0A5EC400 00FFFF9A D676FFD8 76FF0008 E9037500 DE7E8300 00FFFF9A ......~B.u.Õ...vÄ.vø.....á^..F=. 000020
888676FF 8876FFD6 76FFD876 FF00010C 47C7260A 5EC40A57 89260847 8926FE56 V±&.G.&.W.á^.&úG....vÄ.vø.v¡.vÑ. 000040
5EC40538 E90003E9 0375008A 7E838446 890000FF FF9A5052 000E050C 56880A46 F..V....RP......FÇ.~Ç.u.Õ..Õ;.á^ 000060
003D8446 890000FF FF9A5052 0012050C 56880A46 88E076FF 10478926 E6468B0A ..FÌ&.G..vÅ.F..V....RP......FÇ=. 000080
5FC4260A 5EC40789 26024789 26000088 125FC426 0A5EC405 10E90003 E9037500 .u.Õ..Õ..á^.&á_.¡..&.G.&..á^.&á  0000A0
C7260A5E C400007B 47C72600 C87947C7 260A5EC4 04478926 06478926 00008812 .¡..&.G.&.G.á^‾.&úGyà.&úG(..á^.&ũ 0000C0
C7260A5E C4000000 8387C726 00C80081 87C7260A 5EC40000 7747C726 00C87547 Guà.&úGw..á^.&ú...à.&ú.....á^.&ú 0000E0
0087050C 56880A46 88E076FF 00030085 87C7260A 5EC40000 7F47C726 00C87D47 G)à.&úG...á^.&ú......vÅ.F..V.... 000100
71050C56 880A468B E076FF04 84E90003 E9037500 003D8446 890000FF FF9A5052 RP......FÇ=..u.Õ..Õ...vÅ.F..V..q 000120
050C5688 0A4688E0 76FF0463 E90003E9 03750000 3D844689 000001C5 9A505200 .RP.é....FÇ=..u.Õ..Õc..vÅ.F..V.. 000140
B85688B6 46880A5E C40442E9 0003E903 7500003D 84468900 00FFFF9A 50520061 a.RP......FÇ=..u.Õ..ÕB.á^..fÑ.V¡ 000160
57882671 4788260A 5EC40423 E90003E9 037500E6 7E830091 97892600 8F878926 &....&.....~Ì.u.Õ..Õ#.á^.&.Gq&.W 000180
8876FF27 1268D0676 FFD876FF 016A5052 0016050C 56880A46 880C5689 DA468973 s.FÖ.VÉ.F..V....RPj..vÄ.vøh.'.v¡ 0001A0
5016C646 8D030EE9 0003E903 7500003D 84468912 C4830000 02549A00 6A8676FF .vÑj..T....á..FÇ=..u.Õ..ÕB..Fó.P 0001C0
003D8446 8912C483 0000FFFF 9A006A86 76FF8876 FF271268 D676FFD8 76FF036A j..vÄ.vøh.'.v¡.vÑj.......á..FÇ=. 0001E0
```

```
Dump of file SATURN:[PCCOMMON.DUMP.DLL]SA-DIFM.DLL;1 on 18-APR-1990 10:50:26.92
File ID (450,15,0)   End of file block 323 / Allocated 324

Virtual block number 216 (00000008), 512 (0200) bytes

 880200E9 03740046 0BCE4688 020BE903 74C8460B C6468B03 B0E90003 E9037500 .u.Ö..Ö¯..F6.Fàt.Ö...Fö.FÂt.Ö... 000000
 C40000E4 46C70168 E246C701 EAE90374 CC4608CA 468B01F5 E90374D4 460BD246 F@.Fåt.Ö%..Fò.Fät.Öõ.úFäh.úFö..é 000020
 E4561BE2 462BA656 8BA4468B 0000FFFF 9A5016A4 468D6377 FF266577 FF26FC5E ^=&.we&.wc.FÊ.P......FÊ.V]+Fã.Vö 000040
 E8468D50 16F4468D C276FFC4 76FFFA56 89F84689 AA5688A8 468BF656 89F44689 .F¶.V-.F´.V`.F%.V*.vé.vö.F¶.P.Fö 000060
 EE5688EC 468BDA5E C4025789 26078926 EA5688E8 468BDA5E C40000FF FF9A5016 .P.....é^Ö.FÖ.Võ&..&.W.é^( Fš.VŸ 000080
 26084789 26DA5EC4 00D28300 C8050257 8826078B 26DA5EC4 06578926 04478926 &.G.&.W.é^Ö&..&.W..à..@.é^(  .G.& 0000A0
 C40E5789 260C4789 26DA5EC4 00028300 C8050657 88260447 8B26DA5E C40A5789 .W.é^Ö&.G.&.W..à..@.é^Ö&.G.&.⅃.é 0000C0
 D05689CE 46890A57 88260847 8B26DA5E C4C85689 C6468902 57882607 8B26DA5E ^Ö&..&.W..Fó.Vàé^Ö&.G.&.W..Fö.VÂ 0000E0
 89024689 0E578826 0C478826 DA5EC4CC 5689CA46 89065788 2604478B 26DA5EC4 é^Ö&.G.&.W..Fò.Vää^Ö&.G.&.W..F@. 000100
 03750000 30844689 0000FFFF 9A5016F0 468DDA76 FFDC76FF C276FFC4 76FFD456 Vå.vé.vö.vÊ.vÖ.Fÿ.P......FÇ=..u. 000120
 E9037500 003DB446 89000004 F39A016A 006A006A F076FFF2 76FF0273 E90003E9 Ö..Ös..v·.vÞj.j.j..µ....FÇ=..u.Ö 000140
 03E90375 00003DB4 46890000 05129A06 76FF0876 FFF076FF F276FF02 54E90003 ..ÖT..v·.vÞ.v..v.......FÇ=..u.Ö. 000160
 0003E903 7500B47E 83B44689 06C48304 3700009A FC76FFFE 76FF156A 0235E900 .Ö5.j..v±.v=...7..é..FÇ.-Ç.u.Ö.. 000180
 00000226 9A006AB6 76FFB876 FF271768 D676FFD8 76FF036A 5016C646 8D0216E9 Ö...Fó.Pj..vÄ.vøh.'.v|.vÑj..&... 0001A0
 C401DAE9 04C48304 6900649A FC76FFFE 76FF0011 E9037500 003DB446 8912C483 .é..FÇ=.:u.Ö...v±.v=.d.i..é.ÖÖ.é 0001C0
 00888789 26008087 89260000 B80A5EC4 6F578926 60478926 F2568BF0 46880A5E ^..FÞ.V·&.Gm&.Woé^.|..&....&.... 0001E0

Dump of file SATURN:[PCCOMMON.DUMP.DLL]SA-DIFM.DLL;1 on 18-APR-1990 10:50:26.92
File ID (450,15,0)   End of file block 323 / Allocated 324

Virtual block number 217 (00000009), 512 (0200) bytes

 C400B6E9 019DE900 03E90375 00003DB4 468904C4 83FFFF00 649AFC76 FFFE76FF .v±.v=.d....é..FÇ=..u.Ö..Ö..ÖÑ.é 000000
 0A578926 08478926 D05688CE 468BDA5E C4025789 26078926 C85688C6 4688DA5E ^Ö.Fó.Vå&..&.W.é^Ö.Fö.VÂ&.G.&.W. 000020
 89260C47 89260456 88D2468B DA5EC406 57892604 478926CC 568BCA46 8BDA5EC4 é^Ö.Fò.Vå&.G.&.W.é^Ö.F@.Vå&.G.&. 000040
 03750000 30844689 00000394 9A5016F0 468DDA76 FFDC76FF C276FFC4 76FF0E57 W..vé.vö.vÊ.vÖ.FÞ.P......FÇ=..u. 000060
 E9037500 003DB446 890000FF FF9A016A 006A006A F076FFF2 76FF0133 E90003E9 Ö..Ö3..v·.vÞj.j.j.......FÇ=..u.Ö 000080
 03E90375 00003DB4 46890000 FFFF9A06 76FF0876 FFF076FF F276FF01 14E90003 ..Ö...v·.vÞ.v..v.......FÇ=..u.Ö. 0000A0
 F088947E 8DDC5688 DA46886F 5789266D 478926F2 568BF046 880A5EC4 00F5E900 .Ö%.é^..FÞ.V·&.Gm&.Wo.FÖ.VÉ.-..Þ 0000C0
 76FF0876 FF006A00 00FFFF9A F66AFF6A 50169446 8D1FA5F2 0008B90A 8E1E0716 ....Ö¿..·E..F..Pj.j-.....j..v..v 0000E0
 6A505200 16050C56 880A468B 1E6A006A 006A006A 50169446 8D006A48 6A006A06 .j.jKj..F..Pj.j.j.j..F..V....RPj 000100
 00003DB4 46892CC4 83000005 F39A006A 786A5016 BA468DFC 76FFFE76 FF006A00 .j..v±.v=.Fα.Pjxj..µ....é,.FÇ=.. 000120
 FFFC76FF FE76FF68 57892669 478926BC 5688BA46 880A5EC4 0071E900 03E90375 u.Ö..Öq.é^..Fα.V¥&.Gi&.Wk.v±.v=. 000140
 FE76FF01 6A003EE9 0003E903 75000030 B4468908 C483FFFF 0818 9A06 76FF0876 v..v.......é..FÇ=..u.Ö..Ö>.j..v± 000160
 00003DB4 468912C4 830000FF FF9A006A 7C6A5016 8E468DB6 76FFB876 FFFC76FF .v=.v|.vÑ.Ff.Pj||j.......é..FÇ=.. 000180
 E9037500 DE7E8367 57892665 478926C0 5688BE46 880A5EC4 0011E900 03E90375 u.Ö..Ö..é^..Ff.Vå&.Ge&.Wg.-ß.u.Ö 0001A0
 881E5657 000042C8 CBC95F5E 1F0000E9 B4468800 00FFFF9A D676FFD8 76FF000B ...vÄ.vø......FÇÖ...^_èùàß..WV.| 0001C0
 88260847 8B260A5E C401C2E9 00008800 06E90374 000C7F83 260A5EC4 D88E0008 ...Äé^.&....t.Ö..|..Öõ.é^.&.G.&. 0001E0

Dump of file SATURN:[PCCOMMON.DUMP.DLL]SA-DIFM.DLL;1 on 18-APR-1990 10:50:26.92
File ID (450,15,0)   End of file block 323 / Allocated 324

Virtual block number 218 (0000000A), 512 (0200) bytes

 107F8326 0A5EC4F2 5689F046 8965578B 2663478B 26FC5EC4 FE5689FC 46890A57 W..F=.V±é^=&.Gc&.We.FÞ.V·é^.&... 000000
 0000FFFF 9A016A02 6A7177FF 267377FF 260A5EC4 F076FFF2 76FF0023 E9037500 .u.Ö#..v·.vÞé^.&.ws&.wqj.j...... 000020
 26715FC4 260A5EC4 0A578826 08478826 715FC426 0A5EC401 70E90000 B8EE4689 .FŸ|..Öp.é^.&é_q&.G.&.W.é^.&é_q& 000040
 C4260A5E C40E5788 260C478B 26715FC4 260A5EC4 FA5689F8 46890257 1B26072B +.&.W..F%.V*é^¯.&é_q&.G.&.W.é^¯.&é 000060
 06200257 8B26078B 26715FC4 260A5EC4 F65689F4 46890657 1B260447 2B26715F _q&+G.&.W..F¶.V-é^.&é_q&..&.W.-. 000080
 2DF65613 F4460306 57882604 47882671 5FC4260A 5EC4C056 898E4689 000A8300 ¯..Ö..Ff.Vàé^.&é_q&.G.Ī.W..F¶.V-- 0000A0
 89000A83 00062D02 57882607 8826715F C4260A5E C4C45689 C2468900 DA830006 ...Ö..Fó.Vëé^.&ě_q&..&.W.-...Ö.. 0000C0
 CC5689CA 4689000A 8300062D 06578826 04478826 715FC426 0A5EC4C8 5689C646 Fó.Vàé^.&é_q&.G.Ī.W.-...Ö..Fò.Vä 0000E0
 D05689CE 4689000A 8300062D FA5613F8 46030257 8826078B 26715FC4 260A5EC4 é^.&é_q&..Ī.W..F%.V*-...Ö..Fö.VÂ 000100
 83260A5E C4045689 D2468900 DA830006 2D06578B 2604478B 26715FC4 260A5EC4 é^.&é¯q&.G.&.W.-...Ö..F@.Vàé^.&. 000120
 07F59A06 6A086A71 77FF2673 77FF260A 5EC4F076 FFF276FF 0037E903 75000E7F ...u.Ö7..v·.vÞé^.&.ws&.wqj.j..%. 000140
 FF0034E9 0000080F 9A086A06 6A006A50 168E468D 036A006A F076FFF2 76FF0000 ...v·.vÞj.j..Ff.Pj.j.j......Ö4.. 000160
 6AF076FF F276FF00 00069C9A 066A016A 7177FF26 7377FF26 0A5EC4F0 76FFF276 v·.vÞé^.&.ws&.wqj.j.......v·.vÞj 000180
 16C8CBC9 5F5E1F00 00E90000 B80000FF FF9A016A 066A006A 5016BE46 8D036A00 .j..Ff.Pj.j.j......|..Ö...^_èùà. 0001A0
 83F25689 F04689FE 578826FC 4788260E 5EC4040E 4683088E 0640881E 56570000 ..WV.|ə..Ä.F..é^.&.G=&.W±.FƂ.V·. 0001C0
 478926F2 568BF046 880A5EC4 FA5689F8 4689FE57 8826FC47 88260E5E C4040E46 F..é^.&.G=&.W±.F%.V*é^..FÞ.V·&.G 0001E0
```

Dump of file SATURN:[PCCOMMON.DUMP.DLL]SA-DIFM.DLL;1 on 18-APR-1990 10:50:26.92
File ID (450,15,0)   End of file block 323 / Allocated 324

Virtual block number 219 (000000DB), 512 (0200) bytes 57882604 478826FC 5EC4FE56 89FC4689 0A578826 08478826 0A5EC468 57892669 i&.Wk6^.&.G.&.W..F=.V±6^=&.G.&.W 000000
037500EA 7E83EA46 8906C483 080E0000 9AFC76FF FE76FF13 6AF65689 F4468906 ..F¶.V-j..v±.v=...8..6..Fö.-ö.u. 000020
76FF016A 008FB7FF 260091B7 FF260A5E C4F476FF F676FF00 96E9EA46 880006E9 ö...Fõö...v-.v¶6^.&.ñ..&.ñ..j..v 000040
09370064 9AFC76FF FE76FF00 40E90375 00EA7E83 EA468900 00FFFF9A F876FFFA *.v½......Fö.-ö.u.ö@..v±.v=.d.7. 000060
76FFF876 FFFA76FF 0000FFFF 9A5016EC 46806377 FF266577 FF26FC5E C404C483 .6.6^=&.we&.wc.F§.P......v'.v½.v 000080
56880A46 88F876FF FA76FF00 2AE9EA46 880AC483 0000FFFF 9AEC76FF EE76FFEA ö.vŸ.v&......6..Fõö*..v'.v½.F..V 0000A0
1F0000E9 04C48303 EF00649A FC76FFFE 76FF08C4 83FFFF00 569A5052 0016050C ....RP.V....6..v±.v=.d.ÿ..6.Ö... 0000C0
F088EE7E 80735788 26714788 260A5EC4 D88E0826 881E5657 000012C8 CBC95F5E ^_èùà...WV.¡&..Ä6^.&.Gq&.Ws.-Ÿ.Þ 0000E0
51685016 EE468D00 0005559A F66AFF6A 5016EE46 8D1FA5F2 0008B9DA 8E1E0716 ....Ö¿..·E..FŸ.Pj.j-.U....FŸ.PhQ 000100
06E90375 00003DFE 46890CC4 83000004 1C9A006A 6977FF26 6877FF26 0A5EC45F _6^.&.wk&.wij.......6..F±=..u.Ö. 000120
4688D88E 094CB81E 56570000 00C8CBC9 5F5E1F00 00E90000 880006E9 FE468800 ..F±Ö..¡..Ö...^_èùà...WV.¡L..Ä.F 000140
8B26065E C4D88E09 8AB81E56 57000000 C8CBC95F 5E1F0000 E9000205 08568806 ..V....Ö...^_èùã...WV.¡¤..Ä6^.&. 000160
680A0568 D88E0907 881E5657 000000C8 CBC95F5E 1F0000E9 00919788 26008F87 ...&....Ö...^_èùà...WV.¡=..Äh..h 000180
9A006A7C 6A016A00 6A006A00 84680582 681E026A 796AFFFF 68FFFF68 566AFFFF ..jVh..h..jyj..h..hÇ.j.j.j.j|j.. 0001A0
00080081 02030B80 00100A20 0203001C 90CBC95F 5E1F0000 E91EC483 0000FFFF .....6.Ö...^_èù..... ........... 0001C0
00080A08 00050000 000405C8 000203AE 000C01A4 020300CB 000808C5 02030141 A...é...ù...Ē...Û...à........... 0001E0

Dump of file SATURN:[PCCOMMON.DUMP.DLL]SA-DIFM.DLL;1 on 18-APR-1990 10:50:26.92
File ID (450,15,0)   End of file block 323 / Allocated 324

Virtual block number 220 (000000DC), 512 (0200) bytes

000B09FD 00020161 00080095 02030155 00080629 02030B93 0010098F 02030982 ý...........)...U.......ø...»... 000000
00000892 00020BB3 00100593 020308CA 000D02E3 020309CF 00080A00 00050000 ........Ü...Ð...ò.......°....... 000020
000B0183 02030C37 00110908 02030554 000D02B0 02030A42 000F07D8 02030000 ....Ã...B...¯...T.......7....... 000040
000C0975 02030000 001209F8 000205D8 00000302 02030000 00100929 000202E8 ò...).......ø...Ü...%.......u... 000060
000C00F7 02030579 000D04D4 02030AD0 000F08F4 02030191 000800C8 020303EF ÿ...ù.......¶...Î...å...y...%... 000080
00000000 00000000 00000000 00000595 000D03B3 020309FB 000F07BE 0203038A ....ƒ...«...°................... 0000A0
5EC4040E 4683EB46 89EA4689 00008800 00B046C7 D88EFFFF B81E5657 000070C8 àp..WV.|...ÄúF¯..|...Fö.FÖ.F..6^ 0000C0
4689FE57 8B26FC47 8B260E5E C4040E46 83F25689 F04689FE 578826FC 4788260E .&.G=&.W±.FÞ.V·.F..6^.&.G=&.W±.F 0000E0
CE468906 57882604 478826FC 5EC40E46 89FE4788 260E5EC4 020E4683 FE5689FC =.V±.F..6^.&.G±.F86^=&.G.&.W..Fö 000100
5EC48C56 898A4689 65578826 63478826 FC5EC408 46896747 8826FC5E C4D05689 .VÅ6^=&.Gg.FÄ6^=&.Gc&.We.F¤.V¥6^ 000120
8DCE76FF D076FF8C 56898A46 89655788 26634788 26FC5EC4 08468967 478826FC =&.Gg.FÄ6^=&.Gc&.We.F¤.V¥.vÅ.vö. 000140
0A5EC400 00FFFF9A CE76FFD0 76FF0008 E9037500 D67E8300 00FFFF9A 50160646 Fø.P......-ø.u.Ö...vÅ.vö.....6^. 000160
F276FFCE 76FFD076 FF00010C 47C7260A 5EC40A57 89260847 8926FE56 88FC4688 .F=.V±&.G.&.W.6^.&úG....vÅ.vö.v· 000180
E90003E9 03750080 7E838046 890000FF FF9A5052 000E050C 56880A46 88F076FF .vÞ.F..V....RP......F¯.-¯.u.Ö..Ö 0001A0
890000FF FF9A5052 0012050C 56880A46 880876FF 10478926 DE46880A 5EC405F0 Þ.6^..F8&.G..vÄ.F..V....RP...... 0001C0
5EC407B9 26024789 26000088 125FC426 0A5EC405 C5E90003 E9037500 003D8046 F¯=..u.Ö..Öé.6^.&6_.|..&.G.&..6^ 0001E0

Dump of file SATURN:[PCCOMMON.DUMP.DLL]SA-DIFM.DLL;1 on 18-APR-1990 10:50:26.92
File ID (450,15,0)   End of file block 323 / Allocated 324

Virtual block number 221 (000000DD), 512 (0200) bytes

C400007B 47C72601 407947C7 260A5EC4 04478926 06478926 00008812 5FC4260A .&6_.|..&.G.&.G.6^.&úGy@.&úG(..6 000000
C4000000 8387C726 01400081 87C7260A 5EC40000 7747C726 00507547 C7260A5E ^.&ûGuP.&úGw..6^.&ú..@.&ú.....6 000020
56880A46 88D876FF 00030085 87C7260A 5EC40000 7F47C726 00507D47 C7260A5E ^.&úG)P.&úG..6^.&ú......vÄ.F..V 000040
880A4688 D876FF05 39E90003 E9037500 003D8046 890000FF FF9A5052 0087050C .....RP.......F¯=..u.Ö..Ö9..vÄ.F.. 000060
0A4688D8 76FF0518 E90003E9 03750000 3D804689 000001E9 9A505200 71050C56 V..q.RP.Ö.....F¯=..u.Ö..Ö...vÄ.F. 000080
46880A5E C404F7E9 0003E903 7500003D 80468900 00FFFF9A 50520061 050C5688 .V..e.RP.......F¯=..u.Ö..Ö%.6^..F 0000A0
4788260A 5EC404D8 E90003E9 037500DE 7E830091 97892600 8F878926 F25688F0 Þ.V·&....&......~8.u.Ö..ÖÄ.6^.&.G 0000C0
1268CE76 FFD076FF 016A5052 0016050C 56880A46 88045689 D2468973 57882671 q&.Ws.F0.V&.F..V....RPj..vÄ.vöh. 0000E0
8D0493E9 0003E903 7500003D 80468912 C4830000 02789A00 6AF076FF F276FF27 '.v·.vÞj..x.....6..F¯=..u.Ö..Ö.. 000100
8912C483 000002AA 9A006AF0 76FFF276 FF271268 CE76FFD0 76FF116A 5016E846 FÖ.Pj..vÄ.vöh.'.v·.vÞj..^.....6.. 000120
2168CE76 FFD076FF 0019E903 74EA4608 E8468804 65E90003 E9037500 003D8046 F¯=..u.Ö..Öe..FÖ.Föt.Ö...vÄ.vöh! 000140
880A4688 216A0000 9387C626 0A5EC40C C4830000 02D99A00 6AF076FF F276FF27 '.v·.vÞj..1....6.6^.&6....j!.F.. 000160
12C48300 0003089A 006AF076 FFF276FF 271F68CE 76FFD076 FF505200 93050C56 V....RP.vÄ.vöh.'.v·.vÞj.......6. 000180
FF271268 CE76FFD0 76FF036A 50168E46 8D0403E9 0003E903 7500807E 83804689 .F¯.-¯.u.Ö..Ö...F/.Pj..vÄ.vöh.'. 0001A0
8E468803 D5E90003 E9037500 003D8046 8912C483 0000FFFF 9A006AF0 76FFF276 v·.vÞj.......6..F¯=..u.Ö..Öl..Fƒ 0001C0
468801F5 E90374CC 4608CA46 880200E9 0374C846 08C64688 0208E903 74C0460B .Fåt.Ö...F6.Fåt.Ö...FÖ.Fåt.Ö%..F 0001E0

```
Dump of file SATURN:[PCCOMMON.DUMP.DLL]SA-DIFM.DLL;1 on 18-APR-1990 10:50:26.92
File ID (450,15,0)   End of file block 323 / Allocated 324

Virtual block number 222 (000000DE), 512 (0200) bytes

46806377 FF266577 FF26FC5E C40000DC 46C701E0 DA46C701 EAE90374 C4460BC2 ō.Fát.Ōō.úFŌÁ.úFÉ..á^=&.we&.wc.F
A6568BA4 4688F656 89F44689 DC561BDA 462BA256 8BA0468B 0000FFFF 9A5016A0 ..P.......F..VÅ+FŌ.VÉ.F¶.V-.FÉ.V] 000000
4688D25E C40000FF FF9A5016 E0468D50 16F44680 BA76FFBC 76FFFA56 89F84689 .F½.V¹.v¥.vœ.F¶.P.FÁ.P.....á^ø.F 000020
26D25EC4 06578926 04478926 E6568BE4 4688D25E C4025789 26078926 E2568BE0 Á.Vã&..&.W.á^ø.FŌ.VI&.G.&.W.á^ø& 000040
8B260447 8B26D25E C40A5789 26084789 26D25EC4 00028301 40050257 8B26078B ..&.W..ã..ø.á^ø&.G.&.W.á^ø&.G.&. 000060
8E468902 578B2607 8B26D25E C40E5789 260C4789 26D25EC4 00028300 50050657 W..P..ø.á^ø&.G.&.W.á^ø&..&.W..Ff 000080
89065788 2604478B 26D25EC4 C85689C6 46890A57 8B260847 8B26D25E C4C05689 .Vàá^ø&.G.&.W..FŌ.Vàá^ø&.G.&.W.. 0000A0
FFD476FF BA76FFBC 76FFCC56 89CA4689 0E578B26 0C478B26 D25EC4C4 5689C246 FŌ.Vàá^ø&.G.&.W..FŌ.Vã.v¥.vœ.vå. 0000C0
EC76FFEE 76FF0298 E90003E9 03750000 3D804689 00000588 9A5016EC 468DD276 vø.F$.P......F¯=..u.Ō..Ō...vŸ.v$ 0000E0
FFEC76FF EE76FF02 79E90003 E9037500 003D8046 89000005 A79A016A 006A006A j.j.j..Ï....F¯=..u.Ō..Ōy..vŸ.v$. 000100
FC76FFFE 76FF166A 025AE900 03E90375 00003D80 46890000 05C69A06 76FF0876 v..v..ō....F¯=..u.Ō..ŌZ.j..vt.v= 000120
76FF036A 5016BE46 80023BE9 0003E903 7500807E 83804689 06C48304 EB00009A ...Š..á..F¯.-¯.u.Ō..Ō;..Ff.Pj..v 000140
E9037500 003D8046 8912C483 0000024A 9A006AF0 76FFF276 FF271768 CE76FFD0 Å.vōh.'.v·.vÞj..J....á..F¯=..u.Ō 000160
60478926 EE568BEC 46880A5E C401FFE9 04C48305 1D00649A FC76FFFE 76FF0011 &.Woá^.|..&....&.....vt.v=.d.... 000180
83FFFF00 649AFC76 FFFE76FF 00888789 26008087 89260000 880A5EC4 6F578926 ...vt.v=.d.....á.Ō..á^..F$.VŸ&.Gm 0001A0
26078926 C05688BE 4688D25E C40086E9 01C2E900 03E90375 00003D80 468904C4 á..F¯=..u.Ō..Ōō.ŌÑ.á^ø.Ff.Vá&..& 0001C0
                                                                                                  0001E0

Dump of file SATURN:[PCCOMMON.DUMP.DLL]SA-DIFM.DLL;1 on 18-APR-1990 10:50:26.92
File ID (450,15,0)   End of file block 323 / Allocated 324

Virtual block number 223 (000000DF), 512 (0200) bytes

478926C4 5688C246 88D25EC4 0A578926 08478926 C85688C6 4688D25E C4025789 .W.á^ø.FŌ.Vá&.G.&.W.á^ø.FŌ.Vá&.G 000000
FFD476FF BA76FFBC 76FF0E57 89260C47 8926CC56 88CA4688 D25EC406 57892604 .&.W.á^ø.FŌ.Vá&.G.&.W..v¥.vœ.vå. 000020
EC76FFEE 76FF0158 E90003E9 03750000 3D804689 0000FFFF 9A5016EC 468DD276 vø.F$.P......F¯=..u.Ō..ŌX..vŸ.v$ 000040
FFEC76FF EE76FF01 39E90003 E9037500 003D8046 890000FF FF9A016A 006A006A j.j.j.......F¯=..u.Ō..Ō9..vŸ.v$. 000060
5688EC46 880A5EC4 011AE900 03E90375 00003D80 46890000 FFFF9A06 76FF0876 v..v.......F¯=..u.Ō..Ō..á^..F$.V 000080
8D1FA5F2 0008890A 8E1E0716 F08B907E 8DD4568B D246886F 57892660 478926EE Ÿ&.Gm&.Wo.Fø.Vå.-..Þ....Ō¿..É.. 0000A0
9A5052FF FF05CC9A 50529256 1890462B 9A568898 4688046A 006A046A 50169046 F..Pj.j.j..F..V.+F..V.RP.ä...RP. 0000C0
006A4B6A 006A0676 FF0876FF 006A0000 FFFF9AE2 6AFF6A50 16904680 0000FFFF .....F..Pj.jã.....j..v..v.j.jKj. 0000E0
FFFE76FF 006A006A 50520016 050C5688 0A46881E 6A006A00 6A006A50 1690468D .F..Pj.j.j.j..F..V....RPj.j..vt. 000100
71E90003 E9037500 003D8046 892CC483 000006CC 9A006A78 6A501682 468DFC76 v=.Fý.Pjxj..ä....á,.F¯=..u.Ō..Ōq 000120
1B9A0676 FF0876FF FC76FFFE 76FF6857 89266947 89268456 88B24688 0A5EC400 .á^..Fý.VÇ&.Gi&.Wk.vt.v=.v..v... 000140
FFF276FF FC76FFFE 76FF016A 003EE900 03E90375 00003D80 468908C4 83FFFF08 ....á..F¯=..u.Ō..Ō>.j..vt.v=.v.. 000160
11E90003 E9037500 003D8046 8912C483 0000FFFF 9A006A78 6A501686 468DF076 vÞ.FÑ.Pj(j........á..F¯=..u.Ō..Ō. 000180
76FFD076 FF0008E9 03750006 7E836757 89266547 8926B856 88B64688 0A5EC400 .á^..FÑ.V|&.Ge&.Wg.-ø.u.Ō...vÅ.v 0001A0
7286C7D8 8E000888 1E565700 009CC8C8 C95F5E1F 0000E980 46880000 FFFF9ACE ö......F¯Ō...^.èùà...WV.|...Äú.r 0001C0
0006E903 74000C7F 83260A5E C40000E8 46C7001E E646C700 00FF7486 C7001EFF ...ú.t...úF|..ŭFŌ..á^.&....t.Ō.. 0001E0

Dump of file SATURN:[PCCOMMON.DUMP.DLL]SA-DIFM.DLL;1 on 18-APR-1990 10:50:26.92
File ID (450,15,0)   End of file block 323 / Allocated 324

Virtual block number 224 (000000E0), 512 (0200) bytes

88266347 8826FC5E C4FE5689 FC46890A 578B2608 4788260A 5EC40480 E9000088 ¡..Ō..á^.&.G.&.W..F=.Vtá^=&.Gc&. 000000
00FFFF9A 50169046 808676FF 86468967 478826FC 5EC4FF78 9689FF76 86896557 We..v...x.á^=&.Gg.F..v..F..P.... 000020
27E90375 00107F83 260A5EC4 0432E9FF 70868800 07E90375 00003DFF 70868900 ...p.=..u.Ō.....p.Ō2.á^.&.....u.Ō' 000040
0000FF66 86C70001 FF6486C7 FF7C9689 FF7A8689 73578826 71478826 0A5EC400 .á^.&.Gq&.Ws..z...|.ú.d....ú.f.... 000060
0006FF64 86C70008 EA46C700 27E90375 000E7F83 260A5EC4 0058E900 02EA46C7 úFŌ..ŌX.á^.&.....u.Ō'.úFŌ..ú.d.... 000080
260A5EC4 0024E9FF 7C9689FF 7A868973 57882671 4788260A 5EC40000 FF6686C7 ú.f...á^.&.Gq&.Ws..z...|.Ō$.á^.& 0000A0
0001EA46 C70000FF 6686C700 06FF6486 C7FF7C96 89FF7A86 89735788 26714788 .Gq&.Ws..z...|.ú.d....ú.f...úFŌ.. 0000C0
46890E57 88260C47 8826FF7A 9EC4C056 89BE4689 0A578826 08478826 FF7A9EC4 á.z.&.G.&.W..Ff.Vàá.z.&.G.&.W..F 0000E0
0030FF70 86890000 08A29A50 168E4680 006A006A 006A9076 FF9276FF C45689C2 ō.Vá.v..v..j.j.j..Ff.P.Å.....p.=. 000100
9EC49656 89944689 02578826 078826FF 7A9EC403 59E9FF70 86880007 E9037500 .u.Ō.....p.ŌY.á.z.&..&.W..F..V.á. 000120
16944680 006A016A 006A9076 FF9276FF 9A568998 46890E57 88260C47 8826FF7A z.&.G.&.W..F..V..v..v.j.j.j..F... 000140
078826FF 7A9EC403 00E9FF70 86880007 E9037500 003DFF70 86890000 08EE9A50 P.Ÿ.....p.=..u.Ō.....p.Ō..á.z.&.. 000160
FF9276FF 8E56898C 46890657 88260447 8826FF7A 9EC48A56 89884689 02578826 &.W..F..V.á.z.&.G.&.W..F..V..v.. 000180
86880007 E9037500 003DFF70 86890000 09309A50 1688468D 006A026A 006A9076 v.j.j.j..F..P.=.....p.=..u.Ō.... 0001A0
04478826 FF7A9EC4 805689FF 7E86890A 57882608 478826FF 7A9EC402 C1E9FF70 p.Ōè.á.z.&.G.&.W...-..V.á.z.&.G. 0001C0
00FFFF9A 5016FF7E 868D006A 036A006A 9076FF92 76FF8456 89824689 06578826 &.W..F..V..v..v.j.j.j...-..P.... 0001E0
```

```
Dump of file SATURN:[PCCOMMON.DUMP.DLL]SA-DIFM.DLL;1 on 18-APR-1990 10:50:26.92
File ID (450,15,0)   End of file block 323 / Allocated 324

Virtual block number 225 (000000E1), 512 (0200) bytes

A51F161E 07168E76 8DC67E8D 0272E9FF 70868800 07E90375 00003DFF 70868900 ...p.=..u.Õ....p.Õr..~ó.vf.....É 000000
A51F161E 07168876 8DD67E8D 1FA5A5A5 A51F161E 07169476 8DCE7E8D 1FA5A5A5 ÉÉÉ..~ö.v......ÉÉÉÉ..~ø.v......É 000020
50520093 050C5688 0A46881F A5A5A5A5 1F161E07 16FF7EB6 8DDE7E8D 1FA5A5A5 ÉÉÉ..~B.Ñ~......ÉÉÉÉ..F..V....RP 000040
FF9076FF 9276FFFF 7686FFFF 7886FF0C C4830A08 010A9A50 169C4680 05A0681E .h...F..P......á..Ñx..Ñv..v..v.. 000060
5EC401E8 E9FF7086 880007E9 03750000 30FF7086 890000FF FF9AFF64 B6FFEA76 võ.Ñd........p.=..u.Õ....p.ÕÒ.á^ 000080
26FF7A9E C40A5788 26084788 26FF7A9E C4046A00 6A01B7E9 03740010 7F83260A .&....t.Õñ.j.j.á.z.&.G.&.W.á.z.& 0000A0
9EC4C856 89C64689 02571326 070326FF 7A9EC40A 5005CC9A 50520257 18260728 +.&.W.RP.ä.P.á.z.&..&.W..Fó.Vàá. 0000C0
0A578826 08478826 FF7A9EC4 046A006A CC5689CA 46890657 88260447 8826FF7A z.&.G.&.W..Fò.Väj.j.á.z.&.G.&.W. 0000E0
CE468902 57132607 0326FF7A 9EC40AD8 05CC9A50 5202571B 26072B26 FF7A9EC4 á.z.&+.&.W.RP.ä.Ü.á.z.&..&.W..Fö 000100
6A006AFF 7686FFFF 7886FFD4 56890246 890E5788 260C4788 26FF7A9E C4005689 .VÁá.z.&.G.&.W..Fø.VÁ.Ñx..Ñv.j.j 000120
006AFF76 B6FFFF78 86FF0000 0AB39AEA 76FFFF64 B6FFFF66 B6FF5016 C6468D02 ..Fó.P.Ñf..Ñd..võ.°....Ñx..Ñv.j. 000140
C4056A00 6A026A00 6A0000FF FF9AEA76 FFFF64B6 FFFF6686 FF5016C6 468D026A j..Fó.P.Ñf..Ñd..võ.....j.j.j.j.á 000160
7A9EC406 1B05CC9A 50520257 1B26072B 26FF7A9E C40A5788 26084788 26FF7A9E .z.&.G.&.W.á.z.&+.&.W.RP.ä...á.z 000180
0326FF7A 9EC40B2E 05CC9A50 5202571B 26072B26 FF7A9EC4 02571326 070326FF .&..&.W.á.z.&+.&.W.RP.ä...á.z.&. 0001A0
7A9EC40E 57B8260C 47B826FF 7A9EC402 6A006AFF 6A9689FF 68868902 57132607 .&.W...h...j.j.j.á.z.&.G.&.W.á.z 0001C0
FF6C8689 06571326 04470326 FF7A9EC4 09AC05CC 9A505206 571B2604 472B26FF .&+G.&.W.RP.ä.¯.á.z.&.G.&.W...l. 0001E0

Dump of file SATURN:[PCCOMMON.DUMP.DLL]SA-DIFM.DLL;1 on 18-APR-1990 10:50:26.92
File ID (450,15,0)   End of file block 323 / Allocated 324

Virtual block number 226 (000000E2), 512 (0200) bytes

57882604 478826FF 7A9EC4EE 5689EC46 89025788 26078826 FF7A9EC4 FF6E9689 ..n.á.z.&..&.W..F$.VŸá.z.&.G.&.W 000000
FFFA5689 F84689D4 56880246 88F65689 F4468900 5688CE46 88F25689 F0468906 ..Fÿ.V·.Fö.VÅ.F¶.V~.Fø.Vá.F½.Vº. 000020
FFFF9A00 6A006A00 6A5016EC 468DE676 FFE876FF 50169C46 8DFF7686 FFFF7886 Ñx..Ñv..F..P.vÒ.vÌ.F$.Pj.j.j.... 000040
0006E9FF 70868800 07E90375 000030FF 70868900 00FFFF9A 9076FF92 76FF0000 ...v..v........p.=..u.Õ....p.Õ.. 000060
88260E5E C4040E46 83088E07 19881E56 57000016 C8CBC95F 5E1F0000 E90000B8 ¡..Õ...^_èùà...WV.¡...Ä.F..á^.&. 000080
5689F846 89FE5788 26FC4788 260E5EC4 040E4683 F25689F0 4689FE57 8826FC47 G=&.W±.Fÿ.V·.F..á^.&.G=&.W±.F½.V 0000A0
FC46890A 57882608 4788260A 5EC46857 89266947 8926F256 88F04688 0A5EC4FA ªá^..Fÿ.V·&.Gi&.Wká^.&.G.&.W..F= 0000C0
8800009A FC76FFFE 76FF136A F65689F4 46890657 88260447 8826FC5E C4FE5689 .V±á^=&.G.&.W..F¶.V~j..v±.v=.... 0000E0
260A5EC4 F476FFF6 76FF0096 E9EA4688 0006E903 7500EA7E 83EA4689 06C4830C ..á..Fõ.~õ.u.Õ...FõÕ...v~.v¶á^.& 000100
E9037500 EA7E83EA 46890000 FFFF9AF8 76FFFA76 FF016A00 8FB7FF26 009187FF .ñ..&.ñ..j..vª.v½......Fõ.~õ.u.Õ 000120
5016EC46 8D6377FF 266577FF 26FC5EC4 04C4830C E400649A FC76FFFE 76FF0040 ä..v±.v=.d.õ..á.á^=&.we&.wc.F$.P 000140
E9EA4688 0AC48300 00FFFF9A EC76FFEE 76FFEA76 FFF876FF FA76FF00 00FFFF9A ......vª.v½.võ.vŸ.v±......á..FõÕ 000160
76FFFE76 FF08C483 0AF80056 9A505200 16050C56 880A4688 F876FFFA 76FF002A *..vª.v½.F..V....RP.V.½..á..v±.v 000180
0A5EC408 8E0B03B8 1E565700 0012C8CB C95F5E1F 0000E904 C48304A3 00649AFC =.d.È..á.Õ...^_èùà...WV.¡Æ..Äá^. 0001A0
6A046A50 16EE468D 1FA5F200 0889DABE 1E0716F0 8BEE7E8D 73578826 71478826 &.Gq&.Ws.~Ÿ.Þ....Õ¿..·È..FŸ.Pj.j 0001C0
EE468D00 0006209A 50520CD6 05CC9A50 52F0561B EE462BF8 568BF646 88046A00 .j..F-.V½+FŸ.VÞRP.ä.ø.RP. ....FŸ 0001E0

Dump of file SATURN:[PCCOMMON.DUMP.DLL]SA-DIFM.DLL;1 on 18-APR-1990 10:50:26.92
File ID (450,15,0)   End of file block 323 / Allocated 324

Virtual block number 227 (000000E3), 512 (0200) bytes

006A6977 FF266B77 FF260A5E C45F5168 5016EE46 8D000006 2E9AF66A FF6A5016 .Pj.j~......FŸ.PhQ_á^.&.wk&.wij. 000000
1F0000E9 00008800 06E9FE46 880006E9 03750000 30FE4689 0CC48300 0004D09A .À....á..F±=..u.Õ...F±Õ..|..Õ... 000020
C95F5E1F 0000E900 02050856 88064688 D88E0CF9 881E5657 000000C8 CBC95F5E ^_èùà...WV.¡ª..Ä.F..V....Õ...^_è 000040
5F5E1F00 00E90091 97882600 8F878826 065EC4D8 8E0D8C88 1E565700 0000C8CB ùã...WV.¡...Äá^.&....&....Õ...*_ 000060
026A796A FFFF68FF FF68586A FFFF6800 D768D88E 0DA9881E 56570000 00C8CBC9 èùà...WV.¡`..Äh=.h..jXh......jyj. 000080
C95F5E1F 0000E91E C4830000 FFFF9A00 6A7B6A01 6A006A00 6A00B468 05A4681E .hÊ.hÇ.j.j.j.j(j.......á.Ù ..^_è 0000A0
0C720203 0D84000C 000A0005 01410008 00A50203 08800010 00F20203 002190CB ù.I...........É...A...Õ.......r. 0000C0
00610203 0A18000F 09C70203 00000004 06A10002 03AE000C 01C80203 00CB0008 ..ù...à...Õ...À........ú.......ª. 0000E0
00020005 01610008 00890203 0437000C 077D0203 01550008 07020203 08930010 ..........U...)...7...¿...ª...ø. 000100
066C0203 08CA0000 03970203 0000000C 00CF0002 0445000C 08A90203 00A1000C ..À...`...E...Ù............ò...l. 000120
03640203 0A42000F 0A920203 0454000C 08560203 00000000 0C3F0002 08B30010 ..°...?.......V...T.......B...d. 000140
04860203 00000010 00340002 02E80008 01A70203 0C370011 0CB50203 05540000 ..T...ç...7...Ì...Õ...4......... 000160
0CA10203 01910008 00EF0203 03EF000C 00470203 00000012 00CA0002 050B0000 ..Ù...ò.......G...ÿ...ÿ.......À. 000180
011B0203 0A69000F 089E0203 05790000 04480203 03FA000C 00390203 0AD0000F ..T...9...ª...H...y.......¡..... 0001A0
26065EC4 D8BEFFFF 881E5657 000044C8 00000000 05950000 04670203 038A000C ......g.........àD..WV.¡...Äá^.& 0001C0
BE468D26 6A002EE9 0375008C 7E838C46 890000FF FF9A0A76 FF0477FF 260677FF .w.&.w..v.......F¥.~¥.u.Õ..j&.Ff 0001E0
```

```
Dump of file SATURN:[PCCOMMON.DUMP.DLL]SA-DIFM.DLL;1 on 18-APR-1990 10:50:26.92
File ID (450,15,0)   End of file block 323 / Allocated 324

Virtual block number 228 (000000E4), 512 (0200) bytes

 FF9A206A 006A5016 BE468D05 C2681E01 6A006A01 6A006A00 00FFFF9A 426A5016 .PjB.....j.j.j.j..hõ..Ff.Pj.j .. 000000
 D88E0008 881E5657 000044C8 CBC95F5E 1F0000E9 0000B800 06E9BC46 880000FF ....F¥Õ..¡..Õ...^ èùàD..WV.¡...Ä 000020
 4680276A 002EE903 75008C7E 83BC4689 0000FFFF 9A0477FF 260677FF 26065EC4 á^.&.w.&.w.......F¥.-¥.u.Õ..j'.F 000040
 9A206A00 6A50168E 468D05C3 681E016A 006A016A 006A0000 00359A42 6A50168E ƒ.PjB.5...j.j.j.j..hû..Fƒ.Pj.j . 000060
 8E006C88 1E565700 0038C8CB C95F5E1F 0000E900 00B80006 E9BC4688 0000004F O....F¥Õ..¡..Õ...^ èùàB..WV.¡l.. 000080
 890C4689 06578826 04478826 065EC4E2 5689E046 89025788 26078826 065EC408 Äá^.&..&.W..FÅ.Vãá^.&.G.&.W..FÉ. 0000A0
 E4468906 57882604 4788260A 5EC4EA56 89E84689 02578826 0788260A 5EC4DE56 Vßá^.&..&.W..FÒ.Võá^.&.G.&.W..FÕ 0000C0
 890E5788 260C4788 260A5EC4 CA5689C8 46890A57 88260847 88260A5E C4E65689 .Vlá^.&.G.&.W..Fà.Vòá^.&.G.&.W.. 0000E0
 C84688EE 5689EC46 89E65688 E44688F6 5689F446 89EA5688 E84688FE 5689FC46 F=.V±.FÒ.Võ.F¶.V-.Fõ.Vl.F§.VŸ.Fà 000100
 5618F446 28E25688 E04688CE 5689CC46 89FE5688 FC4688D6 56890446 89CA5688 .Vò.Få.V.F=.V±.Fä.Vö.FÅ.Vã+F¶.V 000120
 9A5052EE 5618EC46 2BDE5688 DC4688FA 5689F846 8904C483 01920292 9A5052F6 -RP......á..F½.V'.FÉ.VB+F§.VŸRP. 000140
 01CA0292 9A5052D6 5618D446 28E25688 E04688F2 5689F046 8904C483 01AE0292 ..Û..á..Fþ.V·.FÅ.Vã+Få.VRP...ò. 000160
 8904C483 FFFF0292 9A5052CE 5618CC46 28DE5688 DC4688DA 5689D846 8904C483 .á..FÄ.VÖ.FÉ.VB+Fä.VöRP......á.. 000180
 0045E903 73E04639 0008E903 7E0052E9 037DE256 39EA5688 E84688D2 56890046 FÅ.VØ.FÒ.Võ9Vã).ÕR.-.Õ..9FÅs.ÕE. 0001A0
 5688EC46 88002AE9 0376E046 390008E9 037D0037 E9037EE2 5639CA56 88C84688 .Fà.Vò9Vã~.Õ7.).Õ..9FÁv.Õ*..F§.V 0001C0
 890C4689 EE5688EC 4688000F E903760C 46390008 E9037D00 1CE9037E DE5639EE Ÿ9VB~.Õ..).Õ..9FÉv.Õ...F§.VŸ.FÉ. 0001E0

Dump of file SATURN:[PCCOMMON.DUMP.DLL]SA-DIFM.DLL;1 on 18-APR-1990 10:50:26.92
File ID (450,15,0)   End of file block 323 / Allocated 324

Virtual block number 229 (000000E5), 512 (0200) bytes

 0045E903 73E04639 0008E903 7E0052E9 037DE256 39EA5688 E84688O4 89E90E56 VBÕ...FÒ.Võ9Vã).ÕR.~.Õ..9FÅs.ÕE. 000000
 5688CC46 88002AE9 0376E046 390008E9 037D0037 E9037EE2 5639CA56 88C84688 .Fà.Vò9Vã~.Õ7.).Õ..9FÁv.Õ*..Fë.V 000020
 890C4689 CE5688CC 4688000F E90373DC 46390008 E9037E00 1CE9037D DE5639CE ö9VB).Õ..~.Õ..9FÉs.Õ...Fä.Vö.FÉ. 000040
 0045E903 730C4639 0008E903 7E0052E9 037DDE56 39E65688 E4468804 29E90E56 VBÕ)..FÕ.Vl9VB).ÕR.~.Õ..9FÉs.ÕE. 000060
 5688F446 88002AE9 03760C46 390008E9 037D0037 E9037EDE 5639FE56 88FC4688 .F=.V±9VB~.Õ7.).Õ..9FÉv.Õ*..F¶.V 000080
 89E04689 F65688F4 4688000F E90376E0 46390008 E9037D00 1CE9037E E25639F6 -9Vã~.Õ..).Õ..9FÁv.Õ...F¶.V-.FÅ. 0000A0
 0045E903 730C4639 0008E903 7E0052E9 037DDE56 39E65688 E4468803 C9E9E256 VãÕè..FÕ.Vl9VB).ÕR.~.Õ..9FÉs.ÕE. 0000C0
 5688D446 88002AE9 03760C46 390008E9 037D0037 E9037EDE 5639FE56 88FC4688 .F=.V±9VB~.Õ7.).Õ..9FÉv.Õ*..Få.V 0000E0
 89E04689 D65688D4 4688000F E90373E0 46390008 E9037E00 1CE9037D E25639D6 ø9Vã).Õ..~.Õ..9FÅs.Õ...Få.Vø.FÅ. 000100
 00C0E903 76F84639 0008E903 7D00CDE9 037EFA56 39F25688 F0468803 69E9E256 VãÕi..Fþ.V·9V'~.Õë.).Õ..9F½v.Õå. 000120
 5688D046 8800A5E9 0376F846 390008E9 037D00B2 E9037EFA 5639DA56 88D84688 .FÅ.VÖ9V'~.Õý.).Õ..9F½v.ÕE..FÅ.V 000140
 7DDE5639 E65688E4 4688008A E90376F8 46390008 E9037D00 97E9037E FA5639D2 Ø9V'~.Õ..).Õ..9F½v.Õ...FÕ.Vl9VB) 000160
 7D001CE9 037EDE56 39FE5688 FC468800 2AE90377 DC463900 08E9037E 0037E903 .Õ7.~.Õ..9FÉw.Õ*..F=.V±9VB~.Õ..) 000180
 5688E846 880042E9 E25689E0 4689F656 88F44688 000FE903 720C4639 0008E903 .Õ..9FÉr.Õ...F¶.V-.FÅ.VãÕB..FÕ.V 0001A0
 E90376F0 46390008 E9037D00 1CE9037E F25639D2 5688D046 88E25689 E04689EA õ.FÅ.Vã.FÅ.VØ9V·~.Õ..).Õ..9Fþv.Õ 0001C0
 028EE90E 5689DC46 89CE5688 CC468800 0CE90E56 890C4689 EE5688EC 4688000F ...F§.VŸ.FÉ.VBÕ...Fä.Vö.FÉ.VBÕ.. 0001E0

Dump of file SATURN:[PCCOMMON.DUMP.DLL]SA-DIFM.DLL;1 on 18-APR-1990 10:50:26.92
File ID (450,15,0)   End of file block 323 / Allocated 324

Virtual block number 230 (000000E6), 512 (0200) bytes

 56880846 8800C0E9 0376F046 390008E9 037D00CD E9037EF2 5639FA56 88F84688 .F½.V'9V·~.Õë.).Õ..9Fþv.Õâ..FÅ.V 000000
 7EF25639 D25688D0 468800A5 E90376F0 46390008 E9037D00 B2E9037E F25639DA Ü9V·~.Õý.).Õ..9Fþv.ÕE..FÅ.VØ9V·~ 000020
 7E0037E9 037DE256 39EA5688 E8468800 8AE90376 F0463900 08E9037D 0097E903 .Õ..).Õ..9Fþv.Õ...FÒ.Võ9Vã).Õ7.~ 000040
 390008E9 037D001C E9037EE2 5639CA56 88C84688 002AE903 77E04639 0008E903 .Õ..9FÁw.Õ*..Fà.Vò9Vã~.Õ..).Õ..9 000060
 890C4689 E65688E4 46880042 E90E5689 DC4689EE 5688EC46 88000FE9 0372E046 FÁr.Õ...F§.VŸ.FÉ.VBÕB..FÕ.Vl.FÉ. 000080
 F4468800 0FE90376 F8463900 08E9037D 001CE903 7EFA5639 DA5688D8 46880E56 VB.FÄ.VÖ9V'~.Õ..).Õ..9F½v.Õ...F¶ 0000A0
 5688F846 8801B3E9 E25689E0 46890656 88044688 000CE9E2 5689E046 89F65688 .V~.FÅ.VãÕ...Få.Vø.FÅ.VãÕ*..F½.V 0000C0
 7EDA5639 F25688F0 468800C0 E9037608 46390008 E9037D00 CDE9037E DA5639FA '9VÖ~.Õë.).Õ..9FÄv.Õå..Fþ.V·9VÖ~ 0000E0
 7D0097E9 037EDA56 39D25688 D0468800 A5E90376 D8463900 08E9037D 00B2E903 .Õý.).Õ..9FÄv.ÕE..FÅ.VØ9VÖ~.Õ..) 000100
 390008E9 037E0037 E9037DDE 5639E656 88E44688 008AE903 76D84639 0008E903 .Õ..9FÄv.Õ...FÕ.Vl9VB).Õ7.~.Õ..9 000120
 E90372DC 46390008 E9037D00 1CE9037E DE5639FE 5688FC46 88002AE9 0377DC46 FÉw.Õ*..F=.V±9VB~.Õ..).Õ..9FÉr.Õ 000140
 D04688E2 5689E046 89CA5688 C8468800 42E9E256 89E04689 D65688D4 4688000F ...Få.Vø.FÅ.VãÕB..Fà.Vò.FÅ.Vã.FÅ 000160
 4689EE56 88EC4688 000FE903 76F04639 0008E903 7D001CE9 037EF256 39025688 .VØ9V·~.Õ..).Õ..9Fþv.Õ...F§.VŸ.F 000180
 7ED25639 FA5688F8 46880008 E90E5689 DC4689CE 5688CC46 88000CE9 DE56890C É.VBÕ...Fä.Vö.FÉ.VBÕÄ..F½.V'9VØ~ 0001A0
 7D00AFE9 037ED256 39F25688 F0468800 BDE90376 D0463900 08E9037D 00CAE903 .Õò.).Õ..9FÄv.Õ§..Fþ.V·9VØ~.ÕE.) 0001C0
 390008E9 037D0094 E9037ED2 5639F256 88F04688 00A2E903 76D04639 0008E903 .Õ..9FÄv.ÕÄ..Fþ.V·9VØ~.Õ..).Õ..9 0001E0
```

Dump of file SATURN:[PCCOMMON.DUMP.DLL]SA-DIFM.DLL;1 on 18-APR-1990 10:50:26.92
File ID (450,15,0)   End of file block 323 / Allocated 324

Virtual block number 231 (000000E7), 512 (0200) bytes

```
E90377E0 46390008 E9037E00 37E9037D E25639EA 5688E846 880087E9 03760046 FÅv.Ő...FÒ.Vö9Vä).Ő7.-.Ő..9FÅw.Ő 000000
CC468800 0FE90372 E0463900 08E9037D 001CE903 7EE25639 CA5688C8 4688002A *..Fà.Vò9Vã~.Ő..).Ő..9FÅr.Ő...Fä 000020
56390A56 88D84688 DE56890C 4689FE56 88FC4688 0042E90E 56890C46 89CE5688 .Vö.FÉ.VBŐB..F=.V±.FÉ.VB.FÄ.VÖ9V 000040
E9E25689 E04689F6 5688F446 88000FE9 0376F846 390008E9 037D001C E9037EFA *~.Ő..).Ő..9F¾v.Ő...F¶.V-.FÅ.Vãő 000060
5EC40257 89260789 26E25688 E0468806 5EC4E256 89E04689 D65688D4 4688000C ...Få.V•.FÅ.Vãó^..FÁ.Vã&..&.W.ó^ 000080
56570000 32C8C8C9 5F5E1F00 00E90000 88065789 26044789 26DE5688 DC468806 ..FÉ.VB&.G.&.W.|..Ő...^_èüà2..WV 0000A0
89260000 881A5EC4 07892602 47892600 00881A5E C40000CE 46C7D88E 00CD881E .¡ë..ÄúFö..ó^.¡..&.G.Ř.¯ó^.¡..&. 0000C0
47892606 47892600 00881E5E C4078926 02478926 0000881E 5EC40447 89260647 G.&.G.ó^.¡..&.G.&..ó^.¡..ᵗ.G.&.G 0000E0
E9CE4688 0006E903 7500003D CE468900 00075E9A 5016F046 8D0676FF 0876FF04 ..v..v..FÞ.P.^....Fö=..u.ι ..Föő 000100
CE468800 06E90375 00003DCE 46890000 FFFF9A50 16E0468D 0A76FF0C 76FF0260 '..v..v..FÅ.P......Fö=..u.υ...Fö 000120
89260789 261A5EC4 02578826 0788260E 5EC4002D E9037510 460B0E46 88023FE9 Ő?..F..F.u.Ő-.ó^.&..&.W.ó^.&..&. 000140
46081246 880082E9 06578926 04478926 1A5EC406 57882604 4788260E 5EC40257 W.ó^.&.G.&.W.ó^.&.G.&.W.Ő...F..F 000160
57882604 47882612 5EC4DA56 89D84689 02578826 07882612 5EC40024 E9037514 .u.Ő$.ó^.&..&.W..FÄ.VÖó^.&.G.&.W 000180
468D5016 F0468D00 0009199A 50160846 8D5016E0 468D000F E9DE5689 DC468906 ..FÉ.VBŐ...FÅ.P.FÄ.P......FÞ.P.F 0001A0
881A5EC4 01A6E9CE 46880006 E9037500 003DCE46 8908C483 083800C5 9A5016D8 Ä.P.é.;..á..Fö=..u.Ő...FöŐ!.ó^.. 0001C0
F0468D06 57892604 4789260E 56880C46 881A5EC4 02578926 0789260A 56880846 FÄ.VÖ&..&.W.ó^..FÉ.VB&.G.&.W..FÞ 0001E0
```

Dump of file SATURN:[PCCOMMON.DUMP.DLL]SA-DIFM.DLL;1 on 18-APR-1990 10:50:26.92
File ID (450,15,0)   End of file block 323 / Allocated 324

Virtual block number 232 (000000E8), 512 (0200) bytes

```
61E9CE46 880006E9 03750000 3DCE4689 08C48309 2A00C59A 1A76FF1C 76FF5016 .P.v..v..é.*..á..Fö=..u.Ő...FöŐ• 000000
E9037500 003DCE46 89000009 979A2276 FF2476FF 1A76FF1C 76FF5016 F0468D01 ..FÞ.P.v..v..v$.v"......Fö=..u.Ő 000020
1E5EC402 57882607 8826125E C4002DE9 03751446 0812468B 013AE9CE 46880006 ...FöŐ:..F..F.u.Ő-.ó^.&..&.W.ó^. 000040
0081E906 57892604 4789261E 5EC40657 88260447 8826125E C4025789 26078926 &..&.W.ó^.&.G.&.W.ó^.&.G.&.W.ŐŸ. 000060
88260E5E C4D25689 D0468902 57882607 88260E5E C40024E9 03751046 080E4688 .F..F.u.Ő$.ó^.&..&.W..FÅ.V•ó^.&. 000080
0788261A 5EC40024 E903751C 46081A46 88003EE9 D65689D4 46890657 88260447 G.&.W..Få.V•Ő>..F..F.u.Ő$.ó^.&.. 0000A0
468D000F E9D65689 D4468906 57882604 4788261A 5EC4D256 89D04689 02578826 &.W..FÅ.V•ó^.&.G.&.W..Få.V•Ő...F 0000C0
8908C483 096F00C5 9A501600 468D5016 E0468D00 00FFFF9A 50160046 8D5016F0 Þ.P.FÅ.P......FÅ.P.FÅ.P.é.o..á.. 0000E0
02578926 078926D2 56880046 881E5EC4 0072E9CE 46880006 E9037500 003DCE46 Fö=..u.Ő...FöŐr.ó^..FÅ.V•&..&.W. 000100
FF00C59A 1E76FF20 76FF5016 E0468D06 57892604 478926D6 5688D446 881E5EC4 ó^..Få.V•&.G.&.W..FÅ.P.v .v..é.. 000120
1E76FF20 76FF5016 E0468D00 2DE9CE46 880006E9 03750000 3DCE4689 08C483FF ..á..Fö=..u.Ő...FöŐ-..FÅ.P.v .v. 000140
E9000088 0006E9CE 46880006 E9037500 003DCE46 890000FF FF9A2676 FF2876FF .v(.v&......Fö=..u.Ő...FöŐ..|..Ő 000160
260E5EC4 D2468904 46890000 88D88E06 F2881E56 5700002E C8C8C95F 5E1F0000 ...^_èüà...WV.|·..Ä|...Få.F•ó^.& 000180
529A006A 0A76FF0C 76FF2711 680676FF 0876FF05 6A5016E0 468DDA46 8967478B .Gg.F̄Ö.FÅ.Pj..v..v.h.'.v..v.j..R 0001A0
E90375E2 460BE046 880109E9 D6468800 06E90375 00003DD6 468912C4 8300000A ....á..F•=..u.Ő...F•Ő)..FÅ.Fãu.Ő 0001C0
03750000 3DD64689 0000FFFF 9A5016E8 468D5002 E0C1E046 88696ADA 76FF0142 B..vÖji.FÅèÅ.P.FÒ.P......F•=..u. 0001E0
```

Dump of file SATURN:[PCCOMMON.DUMP.DLL]SA-DIFM.DLL;1 on 18-APR-1990 10:50:26.92
File ID (450,15,0)   End of file block 323 / Allocated 324

Virtual block number 233 (000000E9), 512 (0200) bytes

```
6A0A76FF 0C76FF27 13680676 FF0876FF 056A5016 F0468D01 A7E90646 880006E9 Ő...F•ŐI..FÞ.Pj..v..v.h.'.v..v.j 000000
F25688F0 46880176 E9D64688 0006E903 7500003D D6468912 C4830000 0A9E9A00 .......á..F•=..u.Ő...F•Őv..FÞ.V· 000020
FF0876FF 016A5016 F4468D00 8EE90375 02470826 078826FC 5EC4FE56 89FC4689 .F=.V±ó^•&..&.G.u.Őƒ..F¶.Pj..v.. 000040
0006E903 75000030 D6468912 C4830000 0ACF9A00 6A0A76FF 0C76FF27 12680676 v.h.'.v..v.j..ü....á..F•=..u.Ő.. 000060
FF9A006A 0A76FF0C 76FF2712 680676FF 0876FF02 6A5016D8 468D012A E9D64688 .F•Ő*..FÄ.Pj..v..v.h.'.v..v.j... 000080
9A5016EC 468DDA76 FF00F9E9 D6468800 06E90375 00003DD6 468912C4 830000FF ....á..F•=..u.Ő...F•Ő'..vŐ.F‡.P. 0000A0
8926F656 88F44688 EC5EC400 D8E9D646 880006E9 03750000 3DD64689 0000FFFF .....F•=..u.Ő...F•ŐÜ.ó^‡.F¶.V-&. 0000C0
88E876C4 02E3C1D8 5E880657 89260447 8926FA56 88F84688 EC5EC402 57892607 .&.W.ó^ε.F½.V'&.G.&.W..^ÄèÐ.óvÒ. 0000E0
9AF076FF F276FF06 76FF0876 FFFF33E9 04FC4683 02508926 008926EE 5688EC46 F‡.VŸ&..&.P..F=.Ő3..v..v..v·.vÞ. 000100
88E65689 E4468902 57882607 8826E85E C4007BE9 0375E246 08E0468B 0000FFFF .....FÅ.Fãu.Ő(.ó^Ő&..&.W..FŐ.V!. 000120
46FF0003 E90000D8 46C7DE56 890C4689 FE508826 FC408826 E85EC402 E6C1E076 vÅè!.ó^Ő&.ə•&.P±.FÉ.VBúFÄ..Ő...F 000140
02E3C1D8 5E88006A 505299D8 46881276 FF1476FF 003EE903 7FE04639 D84688D8 Ä.FÄ9FÅ..Ő>..v..v..FÄ.RPj..^ÄèÐ. 000160
260270FF 26E876C4 02E3C1D8 5E880A76 FF0000FF FF9A30FF 260270FF 26E876C4 óvÒ&.p.&.0......vŐ.^ÄèÐ.óvÒ&.p.& 000180
8E098FB8 1E565700 0030C8C8 C95F5E1F 0000E900 0088FFB4 E90000FF FF9A30FF .0.....ŐÇ.|..Ő...^_èüà0..WV.|¢.. 0001A0
890C4689 06578826 04478826 065EC4E6 5689E446 89025788 26078826 065EC4D8 Äó^.&..&.W..FŐ.V|ó˟.&.G.&.W..FÉ. 0001C0
46890E57 88260C47 8826065E C4FE5689 FC46890A 57882608 47882606 5EC4DE56 VBó^.&.G.&.W..F•.V±ó^.&.G.&.W..F 0001E0
```

Dump of file SATURN:[PCCOMMON.DUMP.DLL]SA-DIFM.DLL;1 on 18-APR-1990 10:50:26.92
File ID (450,15,0)   End of file block 323 / Allocated 324

Virtual block number 234 (000000EA), 512 (0200) bytes

```
89065788 26044788 260A5EC4 E25689E0 46890257 88260788 260A5EC4 F65689F4 ¶.V-ó^.&..&.W..FÅ.Vãó^.&.G.&.W.. 000000
5788260C 4788260A 5EC4FA56 89F84689 0A578826 08478826 0A5EC4D6 56890446 Få.Vøó^.&.G.&.W..F½.V¹ó^.&.G.&.W 000020
E90377E0 46380008 E9037E00 13E9037D E2563BE6 5688E446 88EE5689 EC46890E ..F$.VŸ.Fö.V|;Vã).Õ..~.Õ..;FÅw.Õ 000040
08E9037E 0013E903 7DD65638 DE5688DC 4688DA56 89D84689 E04688E2 56880006 ...Vã.FÅ.FÄ.VÖ.FÉ.V8;Vø).Õ..~.Õ. 000060
037EFA56 38FE5688 FC4688D2 56890046 89D4468B 06568800 06E90377 D4463B00 .;Fåw.Õ...Vø.Få.FÅ.VØ.F=.V±;V¹~. 000080
88F44688 F25689F0 4689F846 88FA5688 0006E903 72F84638 0008E903 7D0013E9 Õ..).Õ..;F½r.Õ...V¹.F½.Fþ.V·.F¶. 0000A0
E84689EC 4688EE56 880006E9 0372EC46 380008E9 037D0013 E9037EEE 5638F656 V-;VŸ~.Õ..).Õ..;F$r.Õ...VŸ.F$.FÒ 0000C0
04478926 D25688D0 46880E5E C4025789 26078926 DA5688D8 46880E5E C4EA5689 .Vöó^..FÅ.VÖ&..&.W.ó^..FÅ.VØ&.G. 0000E0
8926EA56 88E84688 0E5EC40A 57892608 478926F2 5688F046 880E5EC4 06578926 &.W.ó^..Fþ.V·&.G.&.W.ó^..FÒ.Vö&. 000100
E846C7D8 8E08ED88 1E565700 001CC8CB C95F5E1F 0000E900 00880E57 89260C47 G.&.W.¡..Õ...^_èùà...WV.¡Ú..ÄúFÒ 000120
88260447 88260A5E C4F65689 F4468902 57882607 88260A5E C40000EA 46C70006 ..úFõ..ó^.&..&.W..F¶.V-ó^.&.G.&. 000140
26044788 26065EC4 FE5689FC 46890257 88260788 26065EC4 F25689F0 46890657 W..Fþ.V·ó^.&..&.W..F=.V±ó^.&.G.& 000160
47882606 5EC4EE56 89EC4689 0A578826 08478826 065EC4FA 5689F846 89065788 .W..F½.V¹ó^.&.G.&.W..F$.VŸó^.&.G 000180
46390008 E9037E00 FDE9037D F65639FE 5688FC46 88E65689 E446890E 5788260C .&.W..Fö.V|.F=.V±9V-).Õ».~.Õ..9F 0001A0
380008E9 037E000C E9037DF6 5638EA56 13E84603 FE5688FC 468800F0 E90373F4 ¶s.Õþ..F=,V±.FÒ.Võ;V-).ÕÉ.~.Õ..; 0001C0
E90373F0 46390008 E9037E00 39E9037D F25639FA 5688F846 8800CFE9 0373F446 F¶s.ÕÜ..F½.V¹9V·).Õ9.~.Õ..9Fþs.Õ 0001E0
```

Dump of file SATURN:[PCCOMMON.DUMP.DLL]SA-DIFM.DLL;1 on 18-APR-1990 10:50:26.92
File ID (450,15,0)   End of file block 323 / Allocated 324

Virtual block number 235 (000000EB), 512 (0200) bytes

```
0373F046 380008E9 037E0018 E9037DF2 5638EA56 13E84603 FA5688F8 4688002C ,..F½.V¹.FÒ.Võ;V·).Õ..~.Õ..;Fþs. 000000
E9037EF2 5638EA56 18E8462B E65688E4 46880085 E9000507 C7260E5E C4000BE9 Õ..ó^.&ú...Õ...Fö.V|+FÒ.Võ;V·-.Õ 000020
E9037D00 18E9037E F25639E6 5688E446 880026E9 0376F046 380008E9 037D0033 3.).Õ..;Fþv.Õ&..Fö.V|9V·-.Õ..).Õ 000040
037DF256 39FA5688 F8468800 3EE90006 07C7260E 5EC40008 E90376F0 46390008 ..9Fþv.Õ..ó^.&ú...Õ>..F½.V¹9V·). 000060
037D0015 E9037EF2 5639E656 88E4468B 0023E903 73F04639 0008E903 7E0030E9 Õ0.-.Õ..9Fþs.Õ#..Fö.V|9V·-.Õ..). 000080
18E8462B EE5688EC 4688020D E9000407 C7260E5E C40008E9 0376F046 390008E9 Õ..9Fþv.Õ..ó^.&ú...Õ...F$.VŸ+FÒ. 0000A0
F65639EE 5688EC46 8800EAE9 0376F446 380008E9 037D00F7 E9037EF6 5638EA56 Võ;V--.Õ%.).Õ..;F¶v.Õõ..F$.VŸ9V- 0000C0
0039E903 7DF25639 FA5688F8 468800CF E90376F4 46390008 E9037D00 DCE9037E -.ÕÉ.).Õ..9F¶v.Õü..F½.V¹9V·).Õ9. 0000E0
18E9037D F2563BEA 5613E846 03FA5688 F8468800 2CE90373 F0463900 08E9037E -.Õ..9Fþs.Õ,..F½.V¹.FÒ.Võ;V·).Õ. 000100
28E65688 E4468800 85E90009 07C7260E 5EC40008 E90373F0 46380008 E9037E00 .-.Õ..;Fþs.Õ..ó^.&ú...Õ...Fö.V|+ 000120
E65688E4 46880026 E90376F0 46380008 E9037D00 33E9037E F25638EA 5618E846 FÒ.Võ;V·-.Õ3.).Õ..;Fþv.Õ&..Fö.V| 000140
003EE900 0A07C726 0E5EC400 08E90376 F0463900 08E9037D 0018E903 7EF25639 9V·-.Õ..).Õ..9Fþv.Õ..ó^.&ú...Õ>. 000160
5688E446 880023E9 0373F046 390008E9 037E0030 E9037DF2 5639FA56 88F8468B .F½.V¹9V·).Õ0.-.Õ..9Fþs.Õ#..Fö.V 000180
02E90008 07C7260E 5EC40008 E90376F0 46390008 E9037D00 15E9037E F25639E6 |9V·-.Õ..).Õ..9Fþv.Õ..ó^.&ú...Õ. 0001A0
88F84688 0062E903 73F04639 0008E903 7E006FE9 037DF256 39FA5688 F8468801 ..F½.V¹9V·).Õo.-.Õ..9Fþs.Õb..F½. 0001C0
FC468800 41E90373 F0463B00 08E9037E 004EE903 7DF2563B EA5613E8 4603FA56 V¹.FÒ.Võ;V·).ÕN.-.Õ..;Fþs.ÕA..F= 0001E0
```

Dump of file SATURN:[PCCOMMON.DUMP.DLL]SA-DIFM.DLL;1 on 18-APR-1990 10:50:26.92
File ID (450,15,0)   End of file block 323 / Allocated 324

Virtual block number 236 (000000EC), 512 (0200) bytes

```
5639EE56 88EC4688 0026E903 73F44639 0008E903 7E0033E9 037DF656 39FE5688 .V±9V-).Õ3.-.Õ..9F¶s.Õ&..F$.VŸ9V 000000
46880085 E9000107 C7260E5E C4000BE9 0376F446 390008E9 037D0018 E9037EF6 --.Õ..).Õ..9F¶v.Õ..ó^.&ú...Õ...F 000020
88005CE9 0376F046 380008E9 037D0069 E9037EF2 563BEA56 18E8462B E65688E4 ö.V|+FÒ.Võ;V·-.Õi.).Õ..;Fþv.Õ\.. 000040
FE5688FC 46880041 E90376F0 46390008 E9037D00 4EE9037E F25639E6 5688E446 Fö.V|9V·-.ÕN.).Õ..9Fþv.ÕA..F=.V± 000060
037EF656 39EE5688 EC468800 26E90373 F4463900 08E9037E 0033E903 7DF65639 9V-).Õ3.-.Õ..9F¶s.Õ&..F$.VŸ9V--. 000080
C7260E5E C40008E9 000207C7 260E5EC4 0008E903 76F44639 0008E903 7D0018E9 Õ..).Õ..9F¶v.Õ..ó^.&ú...Õ..ó^.&ú 0000A0
5E1F0000 E90001B8 0006E900 09E90000 880009E9 0374003F 83260E5E C4000007 ...ó^.&.?.t.Õ..¡..Õ..Õ..¡..Õ...^ 0000C0
C4F65689 F4468902 57882607 8826065E C4D88E0D 69881E56 57000010 C8C8C95F _èùà...WV.¡i..Äó^.&..&.W..F¶.V-ó 0000E0
5689FC46 890A5788 26084788 26065EC4 F25689F0 46890657 88260447 8826065E ^.&.G.&.W..Fþ.V·ó^.&.G.&.W..F=.V 000100
89260789 26F65688 F44688OA 5EC4FA56 89F84689 0E578826 0C478826 065EC4FE ±ó^.&.G.&.W..F½.V¹ó^..F¶.V-&..&. 000120
08478926 FE5688FC 46880A5E C4065789 26044789 26F2568B F04688OA 5EC40257 W.ó^..Fþ.V·&.G.&.W.ó^..F=.V±&.G. 000140
C8C95F5E 1F0000E9 0000B80E 5789260C 478926FA 5688F846 880A5EC4 0A578926 &.W.ó^..F½.V¹&.G.&.W.¡..Õ...^_èù 000160
FF0876FF 0000FFFF 9A5016F8 46800676 FF0876FF D88E111B 881E5657 000008C8 à...WV.¡...Ä.v..v..F½.P.......v.. 000180
02571826 0728260E 5EC40257 88260788 260A5EC4 0000FFFF 9A5016FC 46800676 v..F=.P.....ó^.&..&.W.ó^.&+.&.W. 0001A0
06571826 04472826 0E5EC406 57882604 4788260A 5EC40257 89260789 26065EC4 ó^.&..&.W.ó^.&.G.&.W.ó^.&+G.&.W. 0001C0
8926065E C4FE5613 FC460302 57882607 8826065E C4065789 26044789 26065EC4 ó^.&.G.&.W.ó^.&..&.W..F=.V±ó^.&. 0001E0
```

Dump of file SATURN:[PCCOMMON.DUMP.DLL]SA-DIFM.DLL;1 on 18-APR-1990 10:50:26.92
File ID (450,15,0)   End of file block 323 / Allocated 324

Virtual block number 237 (000000ED), 512 (0200) bytes

89260C47 8926065E C4FA5613 FB460306 57882604 47882606 5EC40A57 89260847 G.&.W.6^.&.G.&.W..F½.V°6^.&.G.&. 000000
26078826 065EC4D8 8E118888 1E565700 0000C8CB C95F5E1F 0000E900 00880E57 W.|..Ö...^_èùà...WV.||..Ä6^.&..& 000020
26044789 26105EC4 06578826 04478826 065EC402 57892607 8926105E C4025788 .W.6^.&..&.W.6^.&.G.&.W.6^.&.G.& 000040
0C478826 065EC40A 57892608 47892610 5EC40A57 88260847 88260 65E C4065789 .W.6^.&.G.&.W.6^.&.G.&.W.6^.&.G. 000060
C4025788 26078826 0A5EC401 1AE90E46 880E5789 260C4789 26105EC4 0E578826 &.W.6^.&.G.&.W..F.Ö..6^.&..&.W.6 000080
89260447 8926105E C4065788 26044788 260A5EC4 012AE902 57892607 8926105E ^.&..&.W.Ö*.6^.&.G.&.W.6^.&.G.&. 0000A0
0A5EC400 F9E90A57 89260847 8926105E C4025788 26078826 0A5EC401 11E90657 W.Ö..6^.&..&.W.6^.&.G.&.W.Ö°.6^. 0000C0
02578826 07882 60A 5EC400E0 E90E5789 260C4789 26105EC4 06578826 04478826 &.G.&.W.6^.&.G.&.W.ÖA.6^.&..&.W. 0000E0
06578926 04478926 105EC406 57882604 4788260A 5EC40257 89260789 26105EC4 6^.&..&.W.6^.&.G.&.W.6^.&.G.&.W. 000100
88260447 88260A5E C4025789 26078926 105EC402 57882607 88260A5E C40083E9 Ö*.6^.&..&.W.6^.&..&.W.6^.&.G.&. 000120
47892610 5EC40257 88260788 260A5EC4 0086E90E 5789260C 47892610 5EC40657 W.6^.&.G.&.W.Ö..6^.&..&.W.6^.&.G 000140
5EC40058 E9065789 26044789 26105EC4 06578826 04478826 0A5EC40A 57892608 .&.W.6^.&.G.&.W.6^.&.G.&.W.ÖX.6^ 000160
5EC40657 88260447 88260A5E C40A5789 26084789 26105EC4 02578826 0788260A .&..&.W.6^.&.G.&.W.6^.&.G.&.W.6^ 000180
A7FF2E93 C003001C E9037600 09300001 200027E9 002AE90E 5789260C 47892610 .&.G.&.W.Ö*.Ö'.-..=..v.Ö...â...Ï 0001A0
C95F5E1F 0000E900 008813AE 138012F5 14061353 132612C5 14061300 120C13F2 ·.É.....é.&.S...%...Ü.|..Ö...^_è 0001C0
9A5016FE FC868D0A 76FF0C76 FF0676FF 0876FFD8 8E126588 1E565700 0106C8CB ùà...WV.|e..Ä.v..v..v..v...*±.P̄. 0001E0

Dump of file SATURN:[PCCOMMON.DUMP.DLL]SA-DIFM.DLL;1 on 18-APR-1990 10:50:26.92
File ID (450,15,0)   End of file block 323 / Allocated 324

Virtual block number 238 (000000EE), 512 (0200) bytes

FF0676FF 0876FF00 B4E9FEFA 86880007 E9037500 FEFABE83 FEFA8689 0000FFFF ......°±./°±.u.Ö....°±ÖÇ..v..v.. 000000
86880007 E9037500 FEFABE83 FEFA8689 0000FFFF 9A5016FE 468D0E76 FFFEFCB6 Ñ*±.v..F±.P.......°±./°±.u.Ö.... 000020
0A76FF0C 76FF0676 FF0876FF 0100FE46 C70005E9 03770100 FE7E8100 88E9FEFA °±Ö...-±..w.Ö..úF±...v..v..v..v. 000040
FEFA8688 0007E903 7500FEFA BE83FEFA 86890000 FFFF9A50 16FEFE86 8D0E76FF .v...±±.P.......°±./°±.u.Ö....°± 000060
E9037400 0030 0AC4 83017602 369A5016 FEFE868D 1076FF12 76FFFE76 FF004AE9 ÖJ..v±.v..v...±±.P.6.v..6.=..t.Ö 000080
FFFF9A10 76FF1276 FF0E76FF 0A76FF0C 76FF0676 FF0876FF 0025E900 00880006 ..|..Ö%..v..v..v..v..v..v..v.... 0000A0
14EE0203 0427000C 08630203 0016CBC9 5F5E1F00 00E9FEFA 868BFEFA 86890000 ....°±..°±Ö...^_èù....c...'...Y̲. 0000C0
00800103 03C9000C 11D80203 05830000 07300203 08930010 09EF0203 00C80008 ..ù...ÿ.......=...°...Ä...è...¯. 0000E0
0A240203 0454000C 08880203 0000000D 07F60002 0C930013 00960203 00880004 ..............¬........£...Ï...$. 000100
14C50002 00FA0008 08500203 0C9E0013 00180203 0305000C 11C80203 01ED0009 ..Ü...à...ƒ..........P...°...é. 000120
14190002 01060008 14300203 00830008 007C0203 03E2000C 07E50203 00000010 ......Ì...ã...|........0......... 000140
149A0203 01880008 145C0203 0396000C 08D30203 038A000C 0AF00203 00000012 ......Þ.......&.......\...É..... 000160
05C4681E D88EFFFF B81E5657 000084C8 00000000 00000000 00000000 00800008 ..§.............à...WV.|...Ä.hé. 000180
46C708C4 83FFFF00 569A5016 CA468D05 CC681E08 C4830029 00569A50 16A2468D .FÅ.P.V.)..6..hë..Fò.P.V....6.úF 0001A0
FF68FFFF 685016CA 468D006A 006A0000 9446C711 019246C7 00008C46 C700908A ...úF...úF...úF...j.j..Fò.Ph..h. 0001C0
CA468D50 1692468D 8A76FF8C 76FF0876 FF0A76FF 0000FFFF 9A006A04 6A006AFF .j.j.j.......v..v..v..v..F..P.Fò 0001E0

Dump of file SATURN:[PCCOMMON.DUMP.DLL]SA-DIFM.DLL;1 on 18-APR-1990 10:50:26.92
File ID (450,15,0)   End of file block 323 / Allocated 324

Virtual block number 239 (000000EF), 512 (0200) bytes

FFFF9A50 16FF7C86 8D038568 020036FF 26227606 8E006A00 6A5016A2 468D5016 .P.FÅ.Pj.j...v"&.6..h....|..P... 000000
9A276A01 6A006AC8 5689C646 89000000 B09A266A 016A006A 9056898E 46890000 ...F..V.j.j.j&.¯....F6.V¢j.j.j'. 000020
88C6468B F04689F2 46890000 B8EC4689 EE468900 00888256 89804689 0000FFFF .....F..V.|...FŸ.F&|...F·.FÞ.F6. 000040
46890313 C10302D1 E0D1DA8B C8888256 88804688 F65689F4 468902D1 E0D1C856 VàÌÅÌ@.F¶.V-.F..V..à.ÖÌÅÌ@.è.Æ.F 000060
1BEC462B F65688F4 46880000 FFFF9A00 6A5016EC 468D8E76 FF9076FF FA5689F8 ½.V°.v..v..F&.Pj.......F¶.V-+F&. 000080
0876FF0A 76FF9856 89964689 F2561BF0 462BFA56 88F84688 A056899E 4689EE56 VŸ.F..V..F½.V°+FÞ.V·.F..V..v..v. 0000A0
76FF5096 462BF846 88EC76FF 006A006A 8E76FF90 76FF0000 01839A50 16EC468D .F&.P......v..v.j.j..v&.F½+F.P.v 0000C0
5016FC46 8D0676FF 0000FFFF 9A016A8E 76FF9076 FF0000FF FF9A036A 9676FF9E ..v.j.......v..v.j.......v..F=.P 0000E0
9E4689EE 5688EC46 880000FF FF9A5016 EC468DFF 7C86FFFF 7E86FF00 00FFFF9A ......Ñ-..Ñ|..F&.P......F&.VŸ.F. 000100
E9038EC4 46C70001 8446C798 56899646 8982561B 80462BFA 5688F846 88A05689 .V..F½.V°+F..V..F..V.úF...úF6..Ö 000120
9AC476FF 020036FF 26227606 8E016A00 6A00CCE9 037E0393 C47E81C4 46FF0003 ...F6.-6..-.Öë.j.j...v"&.6...v6. 000140
C40000FF FF9A5016 9A468D10 6A696A67 77FF26FC 5EC48856 89864689 0000FFFF .....F..V.6^=&.wgjij..F..P.....6 000160
889A5EC4 04478926 96468B9A 5EC40247 89269E46 889A5EC4 078926C4 46889A5E ^..F6&..6^..F.&.G.6^..F.&.G.6^.. 000180
5789260A 47892688 56888646 889A5EC4 08478926 804688 9A 5EC40647 8926C646 F6&.G.6^..F.&.G.6^..F..V.&.G.&.W 0001A0
0000FFFF 9A9A76FF 9C76FF50 52008905 FE5688FC 46880000 0E47C726 9A5EC40C .6^.&úG....F=.V±...RP.v..v...... 0001C0
56199646 29825688 804688A0 56899E46 89EE5688 EC468800 20E90374 02847E83 .-..t.Ö ..F&.VŸ.F..V..F..V.)F..V 0001E0

Dump of file SATURN:[PCCOMMON.DUMP.DLL]SA-DIFM.DLL;1 on 18-APR-1990 10:50:26.92
File ID (450,15,0)   End of file block 323 / Allocated 324

Virtual block number 240 (000000F0), 512 (0200) bytes

```
B6880C5E C4FF27E9 8446FFA0 56119E46 01C85688 C6468800 0FE90001 8446C798 .úF...Õ...Fó.Và.F..V..F.Õ'.á^... 000000
B81E5657 00002CC8 CBC95F5E 1F0000E9 00008802 57892607 8926FF7E 9688FF7C |...~.&..&.W.|..Õ...^_èùà,..WV.| 000020
50160446 8D1076FF 1276FF00 38E90375 0C460B0A 4688026F E90E4688 D88E0008 ...Ä.F.Õo..F..F.u.ÕB..v..v..Få.P 000040
99D44688 1DAE6861 77FF26FC 5EC40000 01719A50 16FC468D D476FF00 00FFFF9A .......vå.F=.P.q...á^=&.wahÛ..Få. 000060
006A056A 1076FF12 76FF024E E90000BA 00008800 00FFFF9A 0A76FF0C 76FF5052 RP.v..v......|..¤..ÕN..v..v.j.j. 000080
E05689DE 46890000 FFFF9A00 6A056A06 76FFD876 FFD85689 D6468900 0003269A .&....Fø.VÄ.vÄ.vøj.j.......FB.VÄ 0000A0
1276FF02 07E90000 FFFF9A06 76FF0876 FF0A76FF 0C76FF0E 76FFDE76 FFE076FF .vÄ.vB.v..v..v..v..v......Õ...v. 0000C0
EA468DDA 76FFDC76 FFDC5689 DA468900 00FFFF9A 5016EA46 8D006A00 6A1076FF .v.j.j..Fõ.P......FÖ.VÉ.vÉ.vÖ.Fõ 0000E0
468DD476 FF000004 239A5016 D4468D10 76FF1276 FF0000FF FF9AEC6A FF6A5016 .Pj.jš......v..v..Få.P.#....vå.F 000100
87FF26FC 5EC40000 04479A00 8987FF26 008887FF 26FC5EC4 00000430 9A5016FC =.P.0...á^=&.ñ..&.ñ...G...á^=&.ñ 000120
C4DA76FF DC76FF00 2EE90374 00003D00 00045E9A 5016E246 8D0089B7 FF26008B ..&.ñ...Fã.P.^...=..t.Õ...vÉ.vÖó 000140
9A0E77FF 26E25EC4 0A77FF26 0C77FF26 E25EC404 77FF26E2 5EC40277 FF26E25E ^ã&.w.á^ã&.w.á^ã&.w.&.w.á^ã&.w.. 000160
46890A46 8B0149E9 0000BA00 00880000 FFFF9ADA 76FFDC76 FFFFB3E9 0000FFFF ....Õ°..vÉ.vÖ.....|..¤..ÕI..F..F 000180
9A5016FC 468DD476 FF000002 D19A5016 D4468D10 76FF1276 FFE64689 0C468BE8 Ò.F..FÌ.v..v..Få.P.Ì....vå.F=.P. 0001A0
FF26FC5E C40000FF FF9A0089 87FF2600 8887FF26 FC5EC400 00FA46C7 000002DE 8...úF'..á^=&.ñ..&.ñ.......á^=&. 0001C0
E8468BE2 5EC40063 E9037400 00300000 FFFF9A50 16E2468D 008987FF 26008BB7 ñ..&.ñ...Fã.P.....=..t.Õc.á^ã.FÒ 0001E0
```

Dump of file SATURN:[PCCOMMON.DUMP.DLL]SA-DIFM.DLL;1 on 18-APR-1990 10:50:26.92
File ID (450,15,0)   End of file block 323 / Allocated 324

Virtual block number 241 (000000F1), 512 (0200) bytes

```
C4024788 26E25EC4 0042E903 7E044739 26E64688 E25EC400 51E9037E 02473926 &9G.-.Õo.á^ã.F|&9G.-.ÕB.á^ã&.G.á 000000
7DE64638 08470326 E25EC404 478B26E2 5EC4002C E9037DE8 46380647 0326E25E ^ã&.G.;FÒ).Õ,.á^ã&.G.á^ã&.G.;F|) 000020
FA7E83FF 7EE9FA46 89078B26 E25EC400 09E90375 020E7F83 26E25EC4 0016E903 .Õ..á^ã&....u.Õ..á^ã&...F'Õ~..~' 000040
D476FF00 13E90000 04FC9A01 6A006AFA 76FF006A 1DAF68D4 76FF0017 E9037500 .u.Õ...våhÉ.j..v'j.j..•...Õ...vå 000060
FF1076FF 1276FF00 4BE90000 BA000088 000002F9 9A006A00 6A006A00 6A1DAF68 hÉ.j.j.j.j..'...|..¤..ÕK..v..v.. 000080
89E90375 00003D00 2BE9002E E90000FF FF9A0676 FF0876FF 0A76FF0C 76FF0E76 v..v..v..v..v......Õ..Õ+.=..u.Õ. 0000A0
85E90375 007A3DFE C2E90375 00713DFD C5E90375 004B3DFE 14E90375 00233DFD »=#.u.Õ.±=K.u.Õé»=q.u.Õô±=z.u.Õç 0000C0
01030348 0008024C 020302AF 000803A6 0203001A 90000ECA C95F5E1F FFB5E9FD »Õç..^_èò.......Ì...£...L...H... 0000E0
010302D4 0008038D 0203008C 0004008E 01030008 00040157 01030003 00040058 X......W..............§...å... 000100
010301ED 000901EB 02030261 000A0387 0203008F 00040102 0103000D 00040164 d....................a...Š...Ù... 000120
0002001A 00040136 01030019 00040311 01030000 000E004C 00020095 0004009F ........L................ó....... 000140
010300AD 00040377 01030000 00120280 00020274 000A0394 02030000 00100018 ...........t...-........w...Ù... 000160
01030082 0004051F 01030081 000403F0 0103002E 000403FE 0103002D 0004035D ]...-...±........Þ...Ý........ý... 000180
00000227 000A04E6 02030057 000401D0 010302A8 000E004F 0005003D 00040346 F...=...O...´...Å...W...Ì..'... 0001A0
12000200 02000000 02000A00 020002C8 1F02C483 FFFF15E8 9A57D88E FFFFB81E .|...ÄW.Ò....á..ù......... ..... 0001C0
00000000 00000000 00000000 00000000 00000000 00000000 00000000 00000000 ........................ ... 0001E0
```

Dump of file SATURN:[PCCOMMON.DUMP.DLL]SA-DIFM.DLL;1 on 18-APR-1990 10:50:26.92
File ID (450,15,0)   End of file block 323 / Allocated 324

Virtual block number 242 (000000F2), 512 (0200) bytes

```
2BD1F7AE F2FFFFB9 0A7EC4FF 758DAEF2 FFFFB9C0 33067EC4 1EDE88D7 88EC8855 U.š.=.B.á~.3â¿..·Õ.u.á~.¿..·Û%Ì+ 000000
8BF388A4 F3C913A5 F3E9D149 A4027400 01C6F706 468BFE87 08468ED8 8EC08CF9 '.â.Ä.F..±.F.¥ó..t.ÊÌÌÕµÊ.èµÊ.µ. 000020
D1F7AEF2 FFFFB9C0 33C08ED8 8CFE880A 76C51EDE 8BD78BEC 8855CB5D C28C1FFA '..ô]ùU.š.=.B.év..±.Ä.â3â¿..·Û%Ì 000040
8BEC8855 CB5DC28C 1FFA8BF3 8BA4F3C9 13A5F3E9 D149A402 7401A8C7 8B067EC4 á~..ú´.t.ÊÌÌÕµÊ.èµÊ.µ.'..ô]ùU.š. 000060
33078806 7EC41E56 57EC8855 00CB50FA 8B9149D1 F7AEF2FF FFB9C033 067EC4D7 =á~.3â¿..·Û%ÌÌ..')ù.U.šWV.á~..=3 000080
F38BFE8B D9F70E4E 28410175 AEF20E4E 8BDF8B0A 7EC406F7 8B4FAEF2 FFFFB9C0 â¿..·ÛO.¥.á~..Õ.N.·Õu.A+N.¥Ì.±.µ 0000A0
4E8BDF8B 0A76C506 7EC41E56 57EC8855 00CB5D5F 5E1FC28C C28BAAA4 F3071F06 ...µÊ´.ô.ô.^_]ù.U.šWV.á~.év..Õ.N 0000C0
56570000 16C8C85D E5885F5E 1FC28CC3 8BAAF3C0 32F8E2AA 0374C00A AC0CE30E .D.¯.ât.¯ã½2ãµ´.û.ô.^_.|]ùà...WV 0000E0
08568B06 4688420A 47C626F8 5EC4FE56 8CFC4689 0E468DFA 568CF846 89EC468D .F§.F½.V'.F..F=.V±á^¥ÌóG.B.F..V. 000100
060A76FF 0C76FFFC 76FF167F FF0447C7 26025789 26078926 08578926 06478926 &.G.&.W.&..&.W.&úG.....v=.v..v.. 000120
02478E26 07FF263F 8826C02A 1278044F FF26F85E C4F08B0C C483017F 0E989A53 S......á..Þá^¥&.O.x.*â&.?&..&.G. 000140
20EC83EC 8855CBC9 5F5EC688 06C483FF FF0D229A 006A53FA 76FF900F E8058826 &..Š...v'Sj.."....á..ó^_èùU.š.š 000160
0180C888 F88B1474 C00AAC0A 76C5071E ABF3E07E 8DC03300 10890716 07880E88 .B.=..¿..3â.-Âµ¨..év.¯.Ãt..¾.à¯. 000180
D0FF25AC 05D436C5 260575C6 08D88C06 76C5E7E8 E04308EF D303B1E0 D207E180 .Ä.ØÄÝ.Æÿ.CÄŠÓév..Ä.óu.&éóå.¯%.. 0001A0
EFD30381 E0D207E1 8001B0C8 88F88848 EBD88E05 D61E8C26 05D43689 264E0F75 u.N&.6å.&..ø..ÄŠH.½.à¯..Ä.ØÄÝ.Æÿ 0001C0
C888F888 18EBFF44 80057500 FF25AC05 D61E8C26 05D4A326 FF448DD7 75E04322 "CÄu=.D.&Êå.&..ø.¯%..u..D.Š..½.à 0001E0
```

```
Dump of file SATURN:[PCCOMMON.DUMP.DLL]SA-DIFM.DLL;1 on 18-APR-1990 10:50:26.92
File ID (450,15,0)   End of file block 323 / Allocated 324

Virtual block number 243 (000000F3), 512 (0200) bytes

 060A8CFA 88F38805 D4068726 96FF6488 E174E043 22EFD303 81E00207 E18001B0 ¯..Ã.ØÀÝ.Æÿ"CÁtÃ.d..&..å..µ.¹.Ö. 000000
 D2F7D788 48C1880A 7EC40676 C556571E 4FE30E4E 88C033EC 885500CB 5DE5881F ..[]ù.U.š3ã.N.DO.WVév.á~..èH.ø%Ø 000020
 0B1DE391 1875A6F3 C1289140 C203C323 DB1BC228 D2F7D688 C203C323 DB1BC228 +ô.Ù#û.ô.ø%Ø+ô.Ù#û.ôª.+èµlu..D.. 000040
 5D1F5F5E FFFF1DC0 1BC2EBC0 8E027605 C08CCB75 FF08D88E FFFF05D8 8C0775F6 -u..Ã....Ã..uù.â.v..áŠö.â...^_.] 000060
 F7000283 D8F70856 88064688 00EB0856 88064688 087C0008 7E830000 00C800CB ù.à....~..|..F..V.Š..F..V.ËÃ.Ë.Ë 000080
 0C4688FA 5689F846 89085688 06468856 5703852E AE9A0010 B8EC8855 90C8C9DA Ðèù.U.š¦...Û...WV.F..V..F½.V¹.F. 0000A0
 00F646C7 F4468948 0A4688FE 5689FC46 89085603 E2030346 89021306 4603022B +Ø.F..Ø¿F.Æã.V..F=.V±.F.H.F¶úF-. 0000C0
 FFF67688 F47E8800 00F246C7 F046890C 46885874 C008F44E FF5F7400 0A7E8300 ..~..t_.N¶.ðtX.F..FÞúF·...~¶.v~. 0000E0
 468828E8 F67689F4 7E894609 7EC00808 C4830E5E FFF876FF FA76FFFC 76FFFE76 v±.v=.v¹.v½.^..ó..ó~.F.~¶.v~Š(.F 000100
 4FC788FE 4601E0D3 038EB9F2 4613FC4E 01F04E88 C028FA56 89F84689 FE5688FC =.V±.F½.V¹+à.NÞ.N=.F·¿..ÆÁ.F±.ÚO 000120
 FF05DC16 8905DAA3 1056880E 46880508 A30C4688 3E7400F6 7E83B9EB D274C008 .ât0Š¿.—.t>.F.ÈÃ..F..V.ÈÖ...É.. 000140
 03858900 D2830646 0303A706 689A5000 6A480A46 88050836 FF006A06 76FF0876 v..v.j..6Ã..F.Hj.P.h.Ì..F..Ø.¿ç. 000160
 03D22805 08A15605 132EAE9A 000888EC 8855C8C9 5F5E0004 E8505208 5603E2D3 Æã.V.RPÒ..^_èùU.š¦...Û...VÀÃ.+Ø. 000180
 6DEBFE56 89FC4689 0A568808 4688FA56 89F84689 065603E2 D303FE89 D2130446 F..Ø¿±.Æã.V..F½.V¹.F..V..F=.V±Šm 0001A0
 2805D8A1 0876FF0A 76FF9070 EB0191E8 05D836FF F876FFFA 76FFFC76 FFFE76FF .v±.v=.v¹.v½.6Ã.Ò..Šp..v..v.ÀÃ.+ 0001C0
 03D22805 D8A1FF94 E85052FA 5603E2D3 0415B900 D283F846 030AF7D2 13D8F7D2 Ø%Ã.Ø%Ö.F½.Ø.¿..Æã.V¹RPÒ..ÀÃ.+Ø. 0001E0

Dump of file SATURN:[PCCOMMON.DUMP.DLL]SA-DIFM.DLL;1 on 18-APR-1990 10:50:26.92
File ID (450,15,0)   End of file block 323 / Allocated 324

Virtual block number 244 (000000F4), 512 (0200) bytes

 04460302 2805D8A1 FE5689FC 46890A56 89084689 FA5603E2 D3046489 D213F846 F½.Ø¿d.Æã.V¹.F..V..F=.V±ÀÃ.+Ø.F. 000000
 08463908 720123E9 03760A56 39065688 044688FA 5689F846 89065603 E2030213 .ØÆã.V..F½.V¹.F..V.9V.v.Č¶.r.9F. 000020
 56880446 88FE5E01 E30304A9 B9DA13FC 4E01C888 DB28022B 0508A101 19E90372 r.Ö..ÀÃ.+Ø+Ù.à.N=.Ö¿`.ÆD. +.F..V 000040
 08C48305 DA1EFFFC 76FFFE76 FF0876FF 0A76FF17 73FC4639 05721E77 FE563906 .9V±w.r.9F=s..v..v..v±.v=..ˇ .ó. 000060
 FA5E01E3 D3053AB9 DA13F84E 01C888D8 28DAF7D2 13D8F7D2 2805D8A1 C17EC008 .ó–èÀÃ.+ØÃ.Ø%Ö+Ù.à.N½.Ö¿:.ÆD.^¹ 000080
 1EFFF876 FFFA76FF 0876FF0A 76FF1776 F8463905 771E72FA 56390A56 88084688 .F..V.9V¹r.w.9F½v..v..v..v¹.v½.. 0000A0
 DFE90376 F8463908 72FEE9E9 0376FA56 39FE5688 FC4688B8 7DC00808 C48305DA Ö..ó..à)£.F=.V±9V¹v.ÕÕ±r.9F½v.ÕÕ 0000C0
 0476FF06 76FFF876 FFFA76FF 0070E805 D836FFF8 76FFFA76 FF0876FF 0A76FFFE ±.v..v..v¹.v½.6Ã.Òp..v¹.v½.v..v. 0000E0
 A1FEB7E9 037DC638 057D191C 9AF088F8 76FFFA76 FF0876FF 0A76FF05 26191C9A ...&..v..v..v¹.v½.Þ...}.;ó).ÕñÀ 000100
 2805D8A1 FE52E804 76FF0676 FF5052FA 5603E2D3 055E8902 13F84603 D22805D8 Ã.+Ø.F½.Ø¿^.Æã.V¹RP.v..v.ÒR±ÀÃ.+ 000120
 C95EFE54 E9065689 044689FA 5603E2D3 FFFF8900 D283F846 030AF7D2 13D8F7D2 Ø%Ã.Ø%Ö.F½.Ø.¿..Æã.V¹.F..V.ÕT±^è 000140
 C4FE4688 078A260A 5EC49037 EB047688 5601542E AE9A0002 B8EC8855 900008C2 ô...U.š¦...Ö.T.V.v.Š7.ó^.&...F±ó 000160
 078826FE 468A065E C40C4601 058725C0 18010A46 83078826 0A5EC407 8A26065E ^.&..ó^.&...F...àXñ..F.ó^..F±&.. 000180
 57EC8855 90000AC2 C95E0476 89C375C0 084EC688 08460102 8125C018 01064683 .F...à%...F..ÓN.àuû.v.^èô...U.ŠW 0001A0
 0B0C4688 06568908 46890000 1DDAF7D8 F7065688 47117DC0 08084688 FF335356 VS3..F..à).G.V.%Ã%Ö....F..V..F.. 0001C0
 D2330846 880A4E88 1575C008 0A56890C 46890000 1DDAF7D8 F70A5688 47117DC0 à).G.V.%Ã%Ö....F..V..àu..N..F.3Ø 0001E0

Dump of file SATURN:[PCCOMMON.DUMP.DLL]SA-DIFM.DLL;1 on 18-APR-1990 10:50:26.92
File ID (450,15,0)   End of file block 323 / Allocated 324

Virtual block number 245 (000000F5), 512 (0200) bytes

 D801EAD1 D9D1E801 06468808 56880A4E 88D88838 EBD388F1 F7064688 D888F1F7 %Þ.Ã.F.%Þ.ÆŠ8.Ã.N..V..F.1Š11ìó1Ã 000000
 7606463B 06720777 0856380C 72D103E6 F70A4688 910C66F7 F088F1F7 F475D808 .Ùu¶%Þ.Þ%f...F.%l.1r.;V.w.r.;F.v 000020
 5E880846 88EC8855 0008CA5D E5885F5E 58000A83 D8F7DAF7 07754F96 D2334E01 .N3Ø.Ou.%Ö%Ã.Ö.[^_.[]ò..U.&.F..^ 000040
 88C8030C 66F70646 88C888E3 F70008CA 5DE588E3 F7064688 08750A5E 88D8080C ..Ã.^.u..F.%D.[]ò..%D.à.F.%f..à. 000060
 D8F70656 8847117D C0080846 88FF3357 53EC8855 0008CA5D E588D103 E3F70646 F.%D.1.[]ò..U.ŠSW3..F..à).G.V.%Ã 000080
 890C4689 00001D0A F7D8F70A 5688107D C0080C46 88065689 08468900 00100AF7 %Ö....F..V..F..à)..V.%Ã%Ö....F.. 0000A0
 D88848EB 43794FD2 33C288F1 F7064688 F1F7D233 0846880A 4E881875 C0080A56 V..àu..N..F.3Ø%Þ.F.%Þ.ó3ØOyCŠH.Ã 0000C0
 0A66F791 0C66F7C8 88F1F7F4 75D808D8 D1EAD1D9 D1E80106 46880856 880A4E88 .N..V..F.1Š11ìó1Ã.Ùu¶%Þ.à%f..%f. 0000E0
 F707794F 08561806 46280C56 180A462B 06760646 38087207 7708563B 0C720103 .1r.;V.w.r.;F.v.+F..V.+F..V.Oy.% 000100
 5FA5F300 0AB90624 BF05DEBE C08ED88C 57560008 CA5DE588 585F000A 83D8F7DA Ö%Ã.Ö._[.[]ò..VW.Ã.à/B.¢$.¿..µÈ_ 000120
 D98EA5A5 FCD88EC1 8ED98CC0 8CFB880C C383080A 1E88F388 5756C08E D08CCB5E ^ù.Ã.âVW.µ.....Û..«.â.).è.Ã=ÈÈ.T 000140
 4E7407F6 F881F388 A5A5FCC1 8ED98CFB 880CC383 080A1E88 F3885756 16E8F388 .µŠ.VW.µ.....Û..«.).è=ÈÈ.µ.«–.tN 000160
 8CF8880C C383080A 1E88F388 5756C08E D08CCB5E 5F03FE47 C6FC7789 080A1E89 .....w=6G±._^ù.Ã.âVW.µ.....Û..«. 000180
 8CF8880C C383080A 1E88F388 575618EB F388D98E A5A5A5A5 FCD88EC1 8ED98CC0 à.).è.Ã=ÈÈÈÈ.).µŠ.VW.µ.....Û..«. 0001A0
 67E9C85E 5FFC7789 07FE47C6 080A1E89 0E7407F6 F881F388 A5A5A5A5 FCC18ED9 ).è=ÈÈÈÈ.µ.«–.t.....6G±..w=_^ùÔg 0001C0
 4588ADFB 880CC383 080A1E88 F388FCD8 8EC18ED9 8CD88C57 5604E8D0 8C575611 .VW.ÀŠ.VW.Ã.).è.Ã=.µ.....Û.¯«Û.E 0001E0
```

Dump of file SATURN:[PCCOMMON.DUMP.DLL]SA-DIFM.DLL;1 on 18-APR-1990 10:50:26.92
File ID (450,15,0)   End of file block 323 / Allocated 324

Virtual block number 246 (000000F6), 512 (0200) bytes

```
26C08ED0 8CCB5E5F D98EFC5F 89080A1E 89CF7407 F6FB81A5 A5027403 3CA5A5FE ±ÉÉ<.t.ÉÉ.«-.tü....._=.)_^ù.Ä.ä& 000000
DA8B5756 99078B03 EB02578B 078B0AEB 99078B26 C08ED08C 14EB0257 8B26078B ..&.W.Š..Ä.ä&...Š....W.Š....VW.ö 000020
080A3E89 1C7407F6 FF810CC7 83080A3E 8B000B83 DAF7DBF7 07798024 C78AD08B .Ä.ú$.y.%Ú½Ö.Ü..>...ú...-.t..>.. 000040
5507FE45 C6FF63E9 CB5E5F16 8BE89EB4 03FE45C6 0F7500FF 80C18ED9 8CFC7D89 .)=.).è...u.6E±.Ç.Ò..^üÕc.6E±.U 000060
FE458AFC 758B080A 3E8BC08E D88C5756 CB5E5F5D 19E7E8FB 8BDB33CB 8B8760BD §'..ü3Ü.«ÒÒ.]_^üVW.Ä.ã.>...u=.E± 000080
56CB5E5F A5A50274 033CA5A5 FCFE4588 FC7D8908 0A3E89B1 7407F6FF 810CC783 .ú...-.tŸ.>...)=.E±=ÉÉ<.t.ÉÉ_^üV 0000A0
FCC033C0 8ED88C03 FE45C6FC 7D89080A 3E898C74 07F6FF81 0CC78308 0A3E8B57 W.>...ú...-.t..>...)=6E±..Ä.ã3ä= 0000C0
EBD08C11 EB0C080A 0683080A 1E8BFCFB 8B5756C0 8ED88C02 EBD08CCB 5E5FABAB ""^ù.ÄŠ..Ä.âVW.«=.........Š..ÄŠ 0000E0
5E5F0C08 0A2E83A5 A5FC7788 007503FE 7F80080A 1E8BFCFB 8B5756C0 8ED88C02 ..Ä.âVW.«=......±.U..w=ÉÉ....._^ 000100
FCFB8B57 56C08ED8 8C02EBD0 8CE4EB5D DE8B5F10 AAE857FC 778B0646 268955CB ùU.&F..w=WÒ`._.8]Šõ.ÄŠ..Ä.âVW.== 000120
07FE7F80 080A1E8B FCFB8B57 56C08ED8 8C02EBD0 8C11EB0C 080A0683 080A1E8B .........Š..ÄŠ..Ä.âVW.«=......±. 000140
02EBD08C E9EBDF87 F78B2448 EBDF87CB 5E5F0C08 0A2E83A5 A5A5A5FC 778B0F75 u..w=ÉÉÉÉ....._^ù.ÖÒH$.¥.ÖŠÕ.ÄŠ. 000160
8BFB8B57 56C08ED8 8C02EBD0 8C10EB0C 080A0683 080A1E8B F8885756 C08ED88C .Ä.âVW.«........Š..ÄŠ..Ä.âVW.«. 000180
1ADD8A1A D38BCB5E 5FA5A502 74033CA5 A5ABFC0C 080A2E83 FE478AF3 8B080A1E ....µ.G±......="ÉÉ<.t.ÉÉ_^ü¦Æ.¤Í. 0001A0
EB1141E8 36EB09F2 BA09ECB8 060E2688 9F02BD0A 4B9A48EB 1B068A1B 018850EB ŠP|..¤..ŠH.K.§...&..¦š.¤·.Š6ÒA.Š 0001C0
F700D283 D8F70773 589E060E 268A5011 53E89004 EB118EE8 900AEB11 40E89010 ..ÒØ.Š..Ò..Š..ÒS.P.&...Xs.¼Ä.ø.¼ 0001E0
```

Dump of file SATURN:[PCCOMMON.DUMP.DLL]SA-DIFM.DLL;1 on 18-APR-1990 10:50:26.92
File ID (450,15,0)   End of file block 323 / Allocated 324

Virtual block number 247 (000000F7), 512 (0200) bytes

```
83080A36 8B515306 46268955 575609FE BA09F8B8 060E2688 9F09000A 4B9AC3DA ÕÜ.K.Ï...&..¦%.¤±.VWU.&F.SQ.6... 000000
080A3E88 57CB5E5F 5D5B5902 FF02EBD0 FF047508 7488030A 7C80080A 36890CEE Ÿ..6...|...t.u..ÄŠ..øY[]_^üW.>.. 000020
8001F6F8 7480FF41 F6CB5F08 75F0FF41 F6087403 FB801375 7F01F6FF 32FE5D8A .]±2.-..u..«.t.-A.Þu._ü-Ä..t½-.. 000040
FE5D8A08 0A3E8B57 56CB5F7F 2180FF32 FE5D8A08 0A3E8B57 CBF9CBE4 0803755F _u..ÕÜ*üW.>...]±2..|._üVW.>...]± 000060
F480AD08 7503FB80 A5FCC18E D98CFC7D 89CB5E5F 803180FF 320875F7 3BFC758B _u=;¼u.2..1._^ù.)=.).ë=É.«.u.Û.¶ 000080
575604EB 22D4E857 5602EBC0 8ED08C57 56CB5E5F AB80F480 ADA5A5C8 5E5FAB80 ."_^üÉÉÜ.¶._"^üVW.Ä.âŠ.VWÒå"Š.VW 0000A0
565EEB00 04B8F38B 575604EB 228CE857 5602EBC0 8ED08C57 5676EB00 088BF38B .µ|..ŠvVW.Ä.ãŠ.VWÒ¥"Š.VW.µ|..Š^V 0000C0
5602EBC0 8ED08C57 5646EB00 0CB8F38B 575604EB 22A4E857 5602EBC0 8ED08C57 W.Ä.âŠ.VWÒÉ"Š.VW.µ|..ŠFVW.Ä.âŠ.V 0000E0
575604EB 2274E857 5602EBC0 8ED08C57 562EEB00 14B8F38B 575604EB 228CE857 WÒ."Š.VW.µ|..Š.VW.Ä.âŠ.VWÒt"Š.VW 000100
8B088B00 00B8F38B 575604EB 225CE857 5602EBC0 8ED08C57 5616EB00 10B8F38B .µ|..Š.VW.Ä.âŠ.VWÒ\"Š.VW.µ|...Ä. 000120
02C383CB 5E5F5D05 F297FF06 46268955 FC7D8710 7407FE7D 80C18ED9 8C080A3E >...).è.)±.t..)=U.&F...·.]_^ù.û. 000140
8B575604 EB222BE8 575602EB C08ED08C 57560FEB 080A3E8B F78B2267 EB068CBF €..Òg".¥.>..ŠÕVW.Ä.âŠ.VWÒ+¯Š.VW. 000160
57565EEB 0006B8F3 8B575604 EB2213E8 575602EB C08ED08C 575676EB 000AB8F3 µ|..ŠvVW.Ä.âŠ.VWÒ."Š.VW.µ|..Š^VW 000180
575602EB C08ED08C 575646EB 000EB8F3 8B575604 EB21FBE8 575602EB C08ED08C .Ä.âŠ.VWÒ«!Š.VW.µ|..ŠFVW.Ä.âŠ.VW 0001A0
8B575604 EB21CBE8 575602EB C08ED08C 57562EEB 0016B8F3 8B575604 EB21E3E8 ÒÒ!Š.VW.µ|..Š.VW.Ä.âŠ.VWÒÙ!Š.VW. 0001C0
3E8BD88B 0002B8F3 8B575604 EB21B3E8 575602EB C08ED08C 575616EB 0012B8F3 µ|..Š.VW.Ä.âŠ.VWÒ°!Š.VW.µ|...Ä.> 0001E0
```

Dump of file SATURN:[PCCOMMON.DUMP.DLL]SA-DIFM.DLL;1 on 18-APR-1990 10:50:26.92
File ID (450,15,0)   End of file block 323 / Allocated 324

Virtual block number 248 (000000F8), 512 (0200) bytes

```
0CBB1CEB 00088821 EB0004B8 FF39E95E 21AEE856 057407FE 7D80C18E D98C080A ...).è.)±.t.VÒÜ!^Õ9.£..Š!£..Š.£. 000000
080A3E8B 57560018 BB03E800 1CBB08EB 00008B0D EB0014B8 12EB0010 BB17EB00 .Š.£..Š.£..Š.£..Š.£..Š.£..VW.>.. 000020
087D8BFC 7D89FC75 8BC08ED8 8C080A3E 890CEF83 2B7407F2 7D803974 07FE7D80 .)±.t9.)·.t+.ÿ..>...Ä.â.u=.)=.). 000040
83CDEB21 41E802C3 83CB5E5F 5D05F297 FF064626 89553E73 18F8832F 731CF883 .«.s/.«.s>U.&F...·.]_^ù.û.ÒA!Šë. 000060
06462689 550C080A 2E83F787 BFEB212C E8080A3E 890CEF83 C47407F2 7D8002C3 û..)·.tá.ÿ..>..Ò,!Š¢.¥.....U.&F. 000080
0AE400E8 D1410025 9F5D05F2 97FF0646 2689550C 080A2E83 CB5E5F5D 05EE97FF ..Ÿ.]_^ù.....U.&F...·.].X.A!ÒÄÕ. 0000A0
0A368BFC C08ED88C 5756000C 8803E8FF 32DF02E7 D0FB8AE3 D0E3D0CB 9E5E5FE0 Ä_^.üÄDÄD.=ÄÒ.Ò2.Š.£..VW.Ä.ä=.6. 0000C0
3E8B5756 EC8855CB 5E5FF4E2 47471D8B FE448905 87AD0005 B9FB2BFE 8B4E4E08 .ÑN.±+«¿..Ü...D±..GGã¶_^üU.$VW.> 0000E0
2A08478A 26085EC4 56570000 08C800CB 5DE5885E 5F2083E8 037407FE 7D80080A ...)±.t.Ò°_^.[]ù.à...ŪV6^.&.G.* 000100
47F626F8 4689194C 05E0D1C1 03E0D1C8 8BF9F700 0CB99900 582DC38B FA4689E4 õ.F*.û-X..¿..¥*.à!Ä.é!Ä.L..F¥&-G 000120
47F62608 5EC49001 2BE9FFFF B8200A4F 8026085E C40F7440 0A47F626 0774830A ..t.&-G.ªt.á^.&.O. |..Ö+..á^.&-G 000140
8926C02B EF0A6780 26020A4F 802690E2 EB000004 47C72620 0A4F8026 0E74010A ..t.&.O. &úG...Šã.&.O..&.g.ÿ+ä&. 000160
194C87F6 06D868F9 F7000C89 990D582D C38B4C75 0C0A47F6 26FC7689 F08B0447 G..Þ.v=&-G..u£.û-X..¿..¥*kÄ.-.L. 000180
FF0F75FF FF0A7E81 16750D70 087E810E 740DC80A 7E810775 0064087E 81377501 .u7.-.d.u..-.ù.t..-.p.u..-...u.. 0001A0
47F62608 5EC404C4 83217BE8 0876FF0A 76FF0C75 C00B02C4 830E3E32 DC9AFA76 v*.Ê2>..á..âu..v..v.Ò(!.á.á^.&-G 0001C0
26378B26 085E8867 7401194C 87F60608 6BF9F700 0CB99900 582DC38B 1575080A ..u..û-X..¿..¥*kÄ.-.L..tg.^.&.7& 0001E0
```

```
Dump of file SATURN:[PCCOMMON.DUMP.DLL]SA-DIFM.DLL;1 on 18-APR-1990 10:50:26.92
File ID (450,15,0)   End of file block 323 / Allocated 324

Virtual block number 249 (000000F9), 512 (0200) bytes

 F60B0447 89264802 458BF87E 88025789 26078926 4008578B 26064788 2606772B +w.&.G.&.W.@&..&.W..-½.E.H&.G..- 000000
 201F5D87 F6FA5E88 19EBFC46 8908C483 0E5C302A 9AFA76FF 0677FF26 5256167E ~.VR&.w..v*.*0\..á..F=Š..^*-.].  000020
 17EB0788 2606468A 065FC426 085EC408 C4830E7F 2FEC9A53 006A006A 026A0F74 t.j.j.j.S.$/...á.á^.&á_..F.&..Š. 000040
 8AFECCE9 0374FC76 39FC4689 08C4830A 15302A9A FA76FF50 1606468D 560001BE ƒ..V.F..P.v*.*0...á..F=9v=t.Ôä±. 000060
 0E468B24 081E8C24 06A3240C 8800D52E AE9A000A B8EC8B55 CBC95F5E E42A0646 F.*ô^_èüU.ä¡...Û.(.¡.$È.$...$.F. 000080
 0006C700 00240206 C7230E16 89230CA3 08568806 468B23F8 168923F6 A310568B .V.È-Ŧ..¾#.F..V.ÈÉ#..ß#ú..$..ú.. 0000A0
 23FEA323 E2A323E6 A3C02800 01240406 C7030BE9 037425F6 7E80038D E9000024 $..Õ...--Xt.Õ..ú..$..+âÈl#Èã#È±# 0000C0
 30017F80 260A5EC4 0020256C 06C723F4 A3230AA3 23E0A323 FAA323FC A323E4A3 ÈÕ#È=#È*#ÈÁ#ÈÕ#È¶#ú.lX .á^.&...0 0000E0
 0023FA06 C723E606 FF0D752B 3F80260A 5E88903E EB003025 6C06C70A 46FF4975 ul.F.ú.lX0.Š>..^.&.?+u...Ì#ú.*#. 000100
 5EC40DEB 23DA06FF 9014EB23 FA06FF1A 750023E6 3E830E75 203F8026 9028E800 .Š(.&.? u..>l#.u...*#Š....Õ#Š.á^ 000120
 75C00802 C4830978 E80E5098 078A260A 5E880A46 FF23F406 FFC7752D 3F80260A .&.?-uú..¶#.F..^.&...P.Òx..á..áu 000140
 FF0C7D00 240A3E83 0C56890A 468908C4 8308C7E8 0E240A68 1E0A76FF 0C76FFDD Ť.v..v..h.$.Òú..á..F..V..>.$.).. 000160
 C4002025 6C06C706 7530256C 3E830074 0023F43E 83240AA3 D8F7240A A123F406 .¶#À.$%ÀÈ.$.>¶#.t..>l%0u.ú.lX .á 000180
 468908C4 83087BE8 0E240468 1E0A76FF 060A46FF 23FC06FF 2D752E3F 80260A5E ^.&.?.u-..=#.F...v..h.$.Ò(..á..F 0001A0
 7400463D 98078A26 0A5EC423 FC0EFF00 01240406 C70A7D00 24043E83 0C56890A ..V..>.$.).ú..$....=#á^.&...=F.t 0001C0
 0A5EC409 750023E4 3E830002 23E406C7 0675006C 302B7400 68304074 004E303D ==N.t@=h.t+=l.u.ú.Õ#...>Õ#.u.á^. 0001E0

Dump of file SATURN:[PCCOMMON.DUMP.DLL]SA-DIFM.DLL;1 on 18-APR-1990 10:50:26.92
File ID (450,15,0)   End of file block 323 / Allocated 324

Virtual block number 250 (000000FA), 512 (0200) bytes

 06C7D8EB 000123E4 06C79002 4EE91C75 003F8026 0A5EC40A 46FF0375 4C3F8026 &.?Lu..F.á^.&.?.u.ÕN..ú.Õ#..ŠÀú. 000000
 30057400 47300A74 00453DF8 46899807 8A26C8EB 000823E4 06C70DEB 001023E4 Õ#..ŠÀú.Õ#..Šä&....F½=E.t.=G.t.= 000020
 3FE90375 00633D01 91E9037E 78740069 3DF84688 20F84683 23E206FF 08750058 X.u...ã#.F½ .F½=i.tx~.Õ..=c.u.Õ? 000040
 1FC42623 F61EC415 750223E4 3E839001 59E90140 E9037500 253D0152 E9037E01 .~.ÕR.=X.u.Õ@.ÕY...>Õ#.u.á.~#&á. 000060
 0423F606 83078926 2400A11F C42623F6 1EC40DEB 00000247 C7260789 262400A1 À.$&..&úG...Š.á.~#&á.À.$&....-#. 000080
 E9037520 0A47F626 23DC1EC4 01BDE903 74002400 3E830170 E9037500 24023E83 .>.$.u.Õp..>.$.t.Õ§.á.É#&-G. u.Õ 0000A0
 086A90C3 EB02C483 019EE80E 0A6A0000 230A06C7 23FE06FF 01ACE9FF FFB801AF £.¡..Õ¯...±#ú.Õ#..j..Ò...á.Šû.j. 0000C0
 3E830081 E9037508 23E43E83 00042404 06C723FC 06FF23E2 06FF23E0 06FFF2EB Š·..À#..ã#..=#ú..$...>Õ#.u.Õ...> 0000E0
 0A740023 F43E83FA 4689240A A1287424 0A0639FA 468923E4 A3C0287A 740123E4 Õ#.tz+âÈÕ#.F*9..$t(À.$.F*.>¶#.t. 000100
 0223F606 83240AA3 C028027D C008240A A105240A 2E839090 13E80000 240A06C7 ú..$..Š......$.À.$.á).+âÈ.$..-#. 000120
 88157400 23F43E83 227400FA 7E8302C4 83048DE8 0E3A6A02 C4830130 E80E106A j..Ò0..á.j:.Ò...á..-*.t".>¶#.t.. 000140
 6A0423F6 2E830000 240A06C7 9007EB24 0AA3C028 027DC008 240AA300 052DFA46 F*-..È.$.á).+âÈ.$Š..ú..$....-#.j 000160
 90FF39E9 026EE80E 006A90FF 3FE9106A FF10E902 23F60683 02C48300 F1E80E10 ..Òþ..á...-#.Õ..j.Õ?..j..Òn.Õ9.. 000180
 FF0CE903 75006430 90FF21E9 0428E80E 256AFF2A E90349E8 0EF876FF F4EB016A j.Š¶.v½.Òl.Õ*.jX.Ò(.Õl..=d.u.Õ.. 0001A0
 0C56880A 46880A4E FF0C5688 0A468809 740023E4 3E83DA7E 00673D05 7C00653D =e.|.=g.~Õ.>Õ#.t..F..V..N..F..V. 0001C0
 E9037500 703DFEE4 E9037500 6F3DFE80 E9037500 6E30903A EBFE5689 FC468940 ə.F=.V±Š:.=n.u.Õ.±=o.u.ÕÕ±=p.u.Õ 0001E0

Dump of file SATURN:[PCCOMMON.DUMP.DLL]SA-DIFM.DLL;1 on 18-APR-1990 10:50:26.92
File ID (450,15,0)   End of file block 323 / Allocated 324

Virtual block number 251 (000000FB), 512 (0200) bytes

 9034EB0A 46FF9081 EBFF79E9 03750078 3DFEB9E9 03750075 308F7400 733DFEE0 À±=s.t.=u.u.Õ¿±=x.u.Õy.ŠŸ..F.Š4. 000000
 0A76FF0C 76FF500A 462BC38B EC75253C 0474C00A F6468807 8A26FC5E C4FC46FF .F=á^=&...F-.ät.<%uš.Û+F.P.v..v. 000020
 0374C00A F6468807 8A260A5E C40C5689 0A4689FE 568BFC46 8B06C483 044CE80E .ÒL..á..F=.V±.F..V.á^.&...F-.ät. 000040
 23FC3E83 56570000 12C8C8C9 2400A1FE 51E90374 200A47F6 26230C1E C4FC63E9 Õc=á.É#&-G. t.ÕQ±À.$èùà...WV.>=# 000060
 751023E4 3E830774 0223E43E 8323FE06 FF04740A 067E8300 20256C06 C7067400 .t.ú.lX ..~..t...±#.>Õ#.t..>Õ#.u 000080
 740023FE 3E83902C E80423F6 0683FE56 89FC4689 02578826 07882623 F61EC419 .á.~#&..&.W..F=.V±..~#.Š,..>±#.t 0000A0
 FE5689FC 46899907 882623F6 1EC40EEB 0000FE46 C7FC4689 07882623 F61EC411 .á.~#&...F=úF±..Š.á.~#&....F=.V± 0000C0
 A1256AA3 C0289003 E8064688 0674FE46 08FC4688 0E740023 DA3E8302 23F60683 ..-#..>Ü#.t..F=.F±t..F.Š..+âÈjXÀ 0000E0
 C41D750A 067E8328 7D00FE7E 83317500 23FE3E83 F45689F2 46892408 16882406 .$...$.F·.V¶.>±#.ul.~±.)+.~..u.á 000100
 01F646C7 FE5689FC 46890AF7 00028308 F7FE5688 FC468820 07C626F2 46FFF25E ^·.F·&á.-.F=.V±%Ã.#.%Ö.F=.V±úF-. 000120
 32D29AFC 76FFFE76 FF501E06 76FFFA5E 8CF84689 23E88800 00F646C7 9006E800 .Š..úF-..¡Ò#.F½.^*.v..P.v±.v=.#2 000140
 C82B2404 0E8804C4 830EA100 8C9AF876 FFFA76FF 45740023 FC3E830A C4831385 ...á..>=#.tE.v*.v½...À..á....$+à 000160
 3005C626 05EBF27E C4F04E88 0000256A 06C70675 08256A3E 830D7EC9 08F04E89 .Nþ.è~..>jX.u.ú.jX...Nþá~·Š.&á.0 000180
 8A26F85E C4F276C5 EE5E8C23 E20E88F0 4E89F446 8CF27E89 F47FC00B 49C18847 G.èl.à.¶.~·.F¶.Nþ..ã#.^Ÿév·á^½&. 0001A0
 5E8EF45E 8CF27689 E375003F 8026F846 FF46202C 80037C61 3C0774C9 0B048807 ....èt.<a|.., F.F½&.?.uD.v·.^¶.^ 0001C0
 0E50C02B 02EB0001 B8057500 F67E830B 7423FA06 0B23E6A1 14750023 FE3E83EE Ÿ.>±#.u.Àl#..*#t..—.u.¡..Š.+áP. 0001E0
```

Dump of file SATURN:[PCCOMMON.DUMP.DLL]SA-DIFM.DLL;1 on 18-APR-1990 10:50:26.92
File ID (450,15,0)   End of file block 323 / Allocated 324

Virtual block number 252 (000000FC), 512 (0200) bytes

```
23F8168B 23F6A100 01BE1874 00067E83 56570000 10C8CBC9 5F5E02C4 8302FFE8 Ò...á.^_èùà...WV.-..t./..À-#..½# 000000
02578826 07882623 F61EC413 740823E4 3E83008F E90223F6 0683FA56 89F84689 .F½.V*..-#.Õ...>õ#.t.á.-#&..&.W. 000020
E43E8304 23F60683 FA5E8CF8 4689FC46 89078826 23F61EC4 10EBFA56 89F84689 .F½.V*Š.á.-#&...F=.F½.^*..-#..>ð 000040
5E8CF846 890617B8 097500FC 7E83900A E80610B8 1575FA46 0BF8468B 0E740823 #.t..F½.F*u.|..Š...~=.u.|...F½.^ 000060
FFF25EC4 900EEB24 040E8B1C 7423FC36 39F628F4 5689F246 89FA568B F8468BFA *.F½.V*.F·.V¶+-96=#t....$Š..á^·. 000080
0A3E8BF3 75003F80 26F246FF F25EC446 90E0EB10 7ECE3846 1574003F 8026F246 F·&.7.t.F;ö-.ŠÚ.Fá^·.F·&.?.u¤.>. 0000A0
06C48301 83E80EF8 76FFFA76 FF5602C4 830159E8 0E570875 0023F43E 83FE2824 $+±.>¶#.u.W.ÒY..á.V.v*.v½.Ò°..á. 0000C0
8923F816 8823F6A1 000006C8 90C8C95F 5E02C483 013CE80E 57087400 23F43E83 .>¶#.t.W.Ò<..á.^_èù.à...À-#..½#. 0000E0
0023FC3E 83FA4688 C02A9003 E801B005 7547067E 83067467 067E83FE 5689FC46 F=.V±.-.gt..-.Gu¯.Š..*â.F*.>=#. 000100
FF23E236 FF000124 0406C706 75002404 3E830074 00FA7E80 00062404 06C70675 u.ú..$...~*.t..>.$.u.ú..$...6ã#. 000120
0EC48306 241EFF26 2278068E FC76FFFE 76FF2406 36FF2408 36FF0676 FF240436 6.$.v..6.$.6.$.v±.v=..x"&..$..á. 000140
C4830628 1EFF2622 78068E24 0636FF24 0836FF14 7500230A 3E831874 00FA7E80 .~*.t..>Ö#.u..6.$.6.$..x"&..(..á 000160
06301EFF 26227806 8E240636 FF240836 FF147500 24043E83 18740023 0A3E8304 ..>Ö#.t..>.$.u..6.$.6.$..x"&..0. 000180
78068EFC 76FFFE76 FF187423 FA060823 E6A10000 256A06C7 0823F606 8304C483 .á...-#.ú.j%..Àl#..*#t...v±.v=..x 0001A0
000000C8 90C8C901 29E80E50 C02B02EB 00018805 74C00804 C4830634 1EFF2622 "&..4..á..ât.|..Š.+âP.Ò).èù.à... 0001C0
2602478E 2607FF26 37882606 468A1478 044FFF26 230C1EC4 3C750024 023E8356 V.>.$.u<á.É#&.O.x..F.&.7&..&.G.& 0001E0
```

Dump of file SATURN:[PCCOMMON.DUMP.DLL]SA-DIFM.DLL;1 on 18-APR-1990 10:50:26.92
File ID (450,15,0)   End of file block 323 / Allocated 324

Virtual block number 253 (000000FD), 512 (0200) bytes

```
9005EB24 0206FF07 754006C4 83165D0D 229A0676 FF53230E 36FF10EB E42A0488 ..*õŠ..6ß#S.v..".]..á.ðu....$Š.. 000000
36FF1BEB 507EF60B 06768857 75002402 3E835657 000002C8 90C8C95E 240006FF ...$^èù.à...WV.>.$.uW.v..--PŠ..6 000020
1E7EC00B 4EC68824 0206FF04 754006C4 8316C50D 229A256C 36FF230C 36FF230E ß#.6É#.6l%.".é..á.ðu....$.6N.â~. 000040
3E83D4EB E42A0588 2602478E 2607FF26 3F882625 6CA00478 044FFF26 230C1EC4 á.É#&.O.xå.l%&.7&..&.G.&..*õŠå.> 000060
5E750024 023E830A 76885657 000002C8 C8C95F5E 24000601 06468807 75002402 .$.u..F....$^_èùà...WV.v..>.$.u^ 000080
0206FF04 754006C4 83173700 229A5098 078A2606 5EC4230C 36FF230E 36FF22EB Š".6ß#.6É#á^.Ï...P.".7..á.ðu.... 0000A0
26230C1E C4078A26 065EC4CD 78044FFF 26230C1E C42574C0 084EC688 0646FF24 $.F..6N.ât%á.É#&.O.xëá^.&..6.É#& 0000C0
5F5E2400 06010A46 88077500 24023E83 CAE8E42A 05882602 478E2607 FF263F88 .7&..&.G.&..*õŠò.>.$.u..F....$^ 0000E0
240A3688 FA4689FC 4689C028 F65689F4 46892408 16882406 A1560000 0CC8C8C9 èùà...VÀ.$...$.F¶.V-+â.F=.F*.6.$ 000100
08E802EE 83057510 256A3E83 06762BF0 2BF84689 04C48313 70008C9A F476FF52 R.v¶...p..á..F½+Þ+v..>j%.u..Ÿ.Š. 000120
FF127530 256C3E83 1975203F 8026F45E C4227500 23F43E83 4E017508 256A3E83 .>j%.u.N.>¶#.u"á^¶&.?-u..>l%0u.. 000140
23F43E83 077EF60B 08743025 6C3E83F8 4EFF02C4 83FE71E8 0E509807 8A26F446 F¶&...P.Òq±.á..N½.>l%0t..--..>¶# 000160
3E830070 E80EFC46 FF077400 256A3E83 0066E80E FA46FF07 7400067E 83187400 .t..~..t..F*.Òf..>j%.t..F=.Òp..> 000180
6A3E8300 39E80E04 7500FA7E 830A7400 067E8302 C483FE7E E80E5629 750023F4 ¶#.u)V.Ò-±.á..~..t..-*.u..Ò9..>j 0001A0
3E8306C4 83FEB5E8 0EF476FF F676FFF8 76FF0040 E80E0475 00FC7E83 0A740025 %.t..-=.u..Òa..v½.v-.v¶.Òç±.á..> 0001C0
00288805 740023E6 3E83C8C9 5E02C483 FE38E80E 56002025 6C06C70E 740023F4 ¶#.t.ú.l% .V.Ò8±.á.^èù.>l#.t.|+. 0001E0
```

Dump of file SATURN:[PCCOMMON.DUMP.DLL]SA-DIFM.DLL;1 on 18-APR-1990 10:50:26.92
File ID (450,15,0)   End of file block 323 / Allocated 324

Virtual block number 254 (000000FE), 512 (0200) bytes

```
3E831775 10256A3E 8302C483 FDC8E80E 306AC802 C483FDD2 E80E5000 208803E8 Š.| .P.Ò0».á.ùj0.Òà».á..>j%.u..> 000000
01FE46C7 56570000 06C8C802 C483FDAA E80E5000 788803E8 00588805 740023E2 ã#.t.|X.Š.|x.P.Ò¯».á.ùà...WVúF±. 000020
260A5EC4 9060EB0A 46FF0223 F6068337 882623F6 1EC41275 2A3F8026 0A5EC400 .á^.&.7*u.á.-#&.7..-#..F.Š`.á^.& 000040
387F393C 3F7C303C FA468807 8A260A5E 8BF62B0A 46FFFFFF FE46C708 752D3F80 .?-u.úF±...F.+-.^.&...F*<0|?<9.; 000060
CE889805 8A2618 7F 39308026 06E8F888 0030256C 06C70675 303C0A75 23FC3639 96=#u.<0u.ú.l%0..«Š.&.=9..&....ö 000080
EEF7FE46 880C468C 0A7E890F 7D303080 2647F188 30E983C8 03E1D1CE 0302E1C1 èÃ..öìÃ.à.Õ0.þG&.=0)Õ.-..F..F±¼Ÿ 0000A0
FE5E8CFC 4689061E 88570000 04C8C8C9 5F5E0C56 880A4688 37892606 5EC4F08B .þá^.&.7.F..V.^_èùà...W|...F=.^± 0000C0
9009E8FE 468CFC7E 890001B8 F4750038 26117400 30802647 01E8FC7E C4064E8A .N.á~=Š.G&.=.t.Ï8.u¶|...-=.F±Š.. 0000E0
28E8D3EA D302D889 0C5E8808 56880646 88EC8855 90C8C95F C028FE46 8CFC7E89 .-=.F±+å_èù.U.å.F..V..^.¿Ã.Æ¾ÆŠ+ 000100
06C712E8 83803330 064206C7 1CE884B0 34300642 06C70008 CA5DE588 D3180A46 F..Æ.[]ò¯.ú.B.04¯.Š.ú.B.03¯.>.ú. 000120
C706758C 3C06881E FF047400 068A3E83 8A803031 064206C7 08E88180 31300642 B.01¯.Š.ú.B.10¯..>...t.....<.u.ú 000140
19852F2C 9A5000FD 88197D34 129A063E 8816212E D29A0644 A3E42A32 31064206 .B.12*ðÉD..ø.|.É>...4).|».P../.. 000160
02548B0C 88FC080A 3E88C319 9A350E9A 064436FF 198E2F2C 9A50FFE4 050644A1 ÀD..õ.P../...6D...5..û.>..=...T. 000180
00C2818F E6800801 D9D1FAD1 D8D1D9D1 FAD1D801 D9D1FAD1 29747F80 C2F7C033 3á¼ó..t)Ì*ÌÌÌÄÌ*ÌÌÌÄÌ*ÌÌÌÄ.Ì..ò. 0001A0
ADC888AD FC080A3E 88EAE8D0 8AC888C3 F7880655 89044D89 02458900 0005C738 8ú....E..M..U..¼û.à.ÄŠõ.>..=Ù.àÙ 0001C0
8101CA80 0374CD0A D3D1E2D1 D3D1E2D1 D3D1E2D1 F88AADDC 8AF08AAD D48AC80A .à.àÙ.Þ.ÉÙ.½ìãìÆìãìÆìãìÆ.ët..ò.Ÿ 0001E0
```

Dump of file SATURN:[PCCOMMON.DUMP.DLL]SA-DIFM.DLL;1 on 18-APR-1990 10:50:26.92
File ID (450,15,0)   End of file block 323 / Allocated 324

Virtual block number 255 (000000FF), 512 (0200) bytes

```
15720777 D13AE001 E001E001 38723800 2D307747 E03D7FF0 25E922EC 8AF90A80 ..ª.ã"ÖXÞ.ªÁGw=-.8r;ÌÁÌÁÌÁ:Ìw.r. 000000
E50AC70A 7FE78016 74C00817 747F8030 00800508 73000383 01C68010 7401C6F6 -ó.t..ó..Æ.s....=..t..ât..Ö..ú.Ì 000020
88D088DA 88D233C3 F78B0245 890589C0 33FEDBE9 C3F78805 89C68AE3 8A024589 .E..D.ó...ÀûÖÜ±3å...E..Àû3Ø.Ö.Å. 000040
000B830A F7DBF707 79C008C3 88D088DA 8811EBDA F7157902 0BDB3300 881DEBC3 ûŠ..Å3Ü.Øy.ÀÖŠ..Ö.Å.û.ây.ÀÜÀÖ.Ü. 000060
8811EBD9 F71579C9 0BDB33C8 881DEBC3 8BC88BDA 88D23304 74E99EB4 8024C48A .á$.Ç.Öt.3Ø.Ö.à.ûŠ..à3Ü.èy.À1Š.. 000080
3AE807B5 E9856080 D233FF33 8024C48A 00D88309 F7DBF707 79C00BC3 8BC88BDA Ö.à.û.ây.ÀÜÀ1.Ü..á$.3.3Ø§'.Öç.Ö: 0000A0
E800EB00 9CE8C3C8 D1677500 D283C0D1 0026E803 E80035E8 08EB0028 E800EB00 .Š.Ö+.Š.ÖS.Š.Ö&.1á.Ø.ug1àûÖ..Š.Ö 0000C0
03EB007B E808EB00 2CE80DEB 002CE8C3 4E75D208 0039E803 E8005DE8 08EB003E >.Š.Ö].Š.Ö9..ØuNûÖ,.Š.Ö,.Š.Ö(.Š. 0000E0
C3CAD121 75000183 C2D10001 83000283 F5D8F7D2 F7D1F700 79FF0BC9 330041E8 ÖA.3è..y.À1ÀØÀÀÀ.Ø..1.1ó.1.ul1òû 000100
E9E9C301 72000283 C3130813 F581F980 CD0AE822 01B50B33 001CE803 E80056E8 ÖV.Š.Ö..3Üç."Ö.ë.ª.À.Ü.û.Ø.r.ûÖÖ 000120
D1E9D17F E58010CE 80F1220F B6F98808 EE8391AD 91AD93AD D60A92AD 00A4E9FD »ÖÉ.Ü..ØÜ.Ü.Ü..Ÿ..ªÑ."þ.ö..Ì.1Ö1 000140
F88AACDA 8AD2332F EB25E983 CA7F20F9 83787203 FEE981D8 74C908E9 D1E9D1E9 Ö1Ö1Ö.ètÄ.Ö±.rx.ª .ò.ÖÀŠ/3Ø.Ö¯.½ 000160
47727EE9 804D74C9 080CD0F9 D1D0E4D0 7FE183F9 88E98A04 EE83C186 ACC88AAD Ü.à¯.è.Ÿ..Ö.ª.Ä.ÀÖÀ1ªÀÉ.ètM.Ö~rG 000180
C48AF88A DF8AD30A 01E280D2 D0F501FA 801A7C08 F98D09F7 20E98399 7F20F983 .ª ...Ö À1.ª.|..ª.ÀÅØ.ã..Æ.Ö.½.á 0001A0
F3E20002 800AD00B D1D8D1EE D0000A80 018201FA 8015E3E1 EB08E980 F632E68A .Ì2-.Ö.ŠÀD..ª.ÿ..Ö.ÀŸÌÀ1ÜÀÖ.Ø.ãµ 0001C0
0A368801 31E807B0 0068E8FD 35E9C300 88C03300 D1800081 F9C3C388 D088CA8A .ò.Å.ûûªŸ..1.3á.ÀûÖS»Öh.¯.Ö1..6. 0001E0
```

Dump of file SATURN:[PCCOMMON.DUMP.DLL]SA-DIFM.DLL;1 on 18-APR-1990 10:50:26.92
File ID (450,15,0)   End of file block 323 / Allocated 324

Virtual block number 256 (00000100), 512 (0200) bytes

```
03B00087 E8F00FE9 C3FE8806 7C89E073 7FF0FA81 7FE68007 8810EF83 067C0308 ..|..ÿ..■.Ì..ªÞ.sÅ.|..±ûÖ.»Ö..¯. 000000
E8C3FE88 027C890F 737F80FA 817FE680 D78B0080 EF81027C 03080A36 8B0108E8 Ö...6...|..ÿ...■.Ì..ª..sÖ.|..±ûÖ 000020
C3FE8802 7C010080 EF81080A 36880053 E8C3FE88 067C0110 EF83080A 3688001E ...6...ÿ..|..±ûÖS..6...ÿ...|..±û 000040
0FE183F9 8B064C8B 0010BA08 0A3688C0 8EA5A5A5 A5C18ED9 8CC08C08 0A3E8BFC ■.>...â.).èEEEE.â.6..¤...L..ª.Å. 000060
D9F7047D 0433E981 E9D1E9D1 E9D1E9D1 0035B87F E580CF88 F0E78306 4C89CA0A .ò.L..ÖÞ.ü.Ì.¡5.1Ö1Ö1Ö1Ö.Ö3.).À1 000080
F98B024C 8B00808A 080A3688 C08EA5A5 C18ED98C C08C080A 3E88FC00 82E93FEB Š?Ö..■.>...â.).èEE.â.6..¤...L..ª 0000A0
F7487D00 96E981ED 32CD8AE1 D1001888 7FE580CF 8880E783 024C89CA 0A7FE183 .Ä..ò.L..Ö..ü.Ì.¡..1Ä.ë2Ü.Ö..)H% 0000C0
08F98002 33EA2880 00E581EF 8BC8880A 74C838FA 088000E7 81147CEF 8BC83BD9 );à.ÿ|..Ö...ª;àt..à.ÿ.Ì..+ö3Ø.ª. 0000E0
D7C18A06 488B0CE3 348AE7EB 4608E980 0004C614 0A000280 0082F501 FA80147C |..ª.Àý..Ø...ó...Ö.FŠÖ.4D.£H..è■ 000100
22D70AFA E2D7D0EA D106E3E1 8AEF8A00 018BC334 8AD188C9 33C32C88 E822EE8A .Ÿ"Ö.,û3è.1.4ûÉ...ÿ.ÀD.1öÅ■ã".■" 000120
3488F202 CE2BC803 98080A0E 8BE2D3CC 8AFD8802 74000A80 01B281FA 80D30ADE 8.Æ.ª.ý..Ö.t..».ãÆã......à+ö.·.4 000140
2602448B C3E4D07F CC80F8C8 E9C3F503 D14C747F 80C3F7C3 FAE20014 804606E3 D.F...ãªÜÀû..tLÌÆÀûÖà«.ä.ÀÖû.D.& 000160
78EF32EC 8AD874D3 F77F80C3 F7D3F7E2 74D0F77F 80A900F7 E1747F80 A9025D88 .].`..tÄÀÅ`..ÀÅtãÀÆÀû..ÀÆtÄ.Š2ÿx 000180
7FF0C3F7 C3053B26 04880575 C3380A8E C18ED98C C28CF787 930B73E0 D1E3D1D5 Ì1Ö1Ås...À.ó.).è.Ö;ûu...&;.ûÀûÞ. 0001A0
7FF0A900 F7E1747F F0A9065D 88260644 88C3E4D0 7FCC80FB 75E9C3F5 D3D15E74 t^1ÆÀûÖu«.ä.ÀÖû.D.&.].`Þ.tÄÀÅ`Þ. 0001C0
8CC28CF7 87930873 E0D1E301 D578EF32 EC8AD874 D3F77FF0 C3F7D3F7 E274D0F7 ÀÅtãÀÆÀûÞ.ÀÆtÄ.Š2ÿxÌ1Ö1Ås...À.ó. 0001E0
```

Dump of file SATURN:[PCCOMMON.DUMP.DLL]SA-DIFM.DLL;1 on 18-APR-1990 10:50:26.92
File ID (450,15,0)   End of file block 323 / Allocated 324

Virtual block number 257 (00000101), 512 (0200) bytes

```
053B2604 88057502 453B2602 4488DE75 04453B26 04448B17 75C33BDA 8EC18ED9 ).è.Ö;ûu..D.&;E.u..D.&;E.u...&;. 000000
748BFF7C 88024C8B 80CF8000 B2358A01 5D880245 8803EB80 F4800245 8BF787C3 Ü.À.E..¶.Š..E..]..5ý..Ü..L..|..t 000020
E52A91FA 87F38705 73EC3A58 74E40A65 74ED0AC0 D1C10180 00CE81FF 00E78101 ..Ö...ö..1è1á.Üte.Öt[:ås..µ.ª.*Ì 000040
01CB8003 74D20812 7C0EF980 55E300B5 CD8A91D9 D0E8D0C9 D0497718 FC80DCF6 -É.▪.w[ÀèÀÖÅ)..ëç.DU.ª.|..Øt..ù. 000060
80FD8ADF 8AF38AD6 8A01CE80 0374D20A 2B7E05F9 803E741D 7210E980 DB330388 .Æ3Ü.Ö.r.t>.ª.→.Øt..ö..ø.µ.Ö.». 000080
03743FC2 F60097E9 E8D0C188 D788DE88 19E8F875 C1FE0301 E2D12374 177708E9 Ö.w.t#1ã1Æ±èuÀŠ..ß.■.êÀÖÖ..-ó?t. 0000A0
FEDAD108 D15073DE 13D70314 70E0D020 CA800374 3FC2F6FA E20AD1E8 D120CA80 .ò 1Š1Öãª-ó?t..ò ÅÅp..■.8sP1Ü1Ö± 0000C0
75D808D0 F6000383 F5DAF7D3 F70A730E 88D788F3 18FA2BFA 41E94575 FFFC80C4 á.▪.uÉÖAª+ª.µ.▪.Ø±.ÀÆÀÖÀ.Æ.-Å.Üu 0000E0
78FF0AD2 32F28ADE 8AFB8A5B 7608EC80 0F75FF0A 647408D8 DA876A76 10EC8008 ..ä.vj.Ö.Ütd..u..ä.v[.«.ß.·2Ø..x 000100
7401C6F6 14720777 80FA8001 7CE90374 0006503E 80F671D3 D1E2D148 74CCFE0A .±âtK1ã1Æq-.>P..t.Ö|..ª.w.r.-ó.t 000120
C70A7FE7 80802417 747F80A9 D8D1E0D0 3A74FFFC 80C4FE07 73000383 01C6800F ..ó..Æ.▪.±á.▪.t:ÅÅ1Å`..t.$..Ö..ú 000140
080A3E88 C033017E E9037400 06503E80 C3F78805 89C68AE3 8A024589 080A3E88 .>...E..D.ó...Àû.>P..t.Ö~.3á.>.. 000160
D0E1D102 40880674 E40AD8D0 E0D19634 88ADFCF9 9DE9E679 C3F78805 89024589 .E....Àûy1Ö.ª▪Ü.4.1ÅÅÄ.Öt▪.M.1ÅÄ 000180
FF3250CD 74FFFC80 80C48003 70E5027F ED8080EC 80C132D8 8B3D88CB 74ED0AD9 ).Ütù.=.Å2è.ä..Ü..|pÆ.á..▪.tëP2. 0001A0
88FA8800 D283D803 E7F7C588 509FC008 DA88E7F7 C688E888 80C98080 C880EF8A .ÿ.ù..è..Š.óÀÖ.Ö.â.P.éÀÖ.Ä.Ø..ª. 0001C0
D3D1E2D1 0878FF0A 5893038B C703E1F6 C58801C8 8003749E 58FA1308 03E6F7C1 èÀ1.Ä.ªX.t..ù..é-Ä.ú.Æ.X..x.1ã1Æ 0001E0
```

```
Dump of file SATURN:[PCCOMMON.DUMP.DLL]SA-DIFM.DLL;1 on 18-APR-1990 10:50:26.92
File ID (450,15,0)   End of file block 323 / Allocated 324

Virtual block number 258 (00000102), 512 (0200) bytes

D0E00102 44880900 E1D1024D 88F787FF 1AE9AD74 FFFC80C4 FEFF69E9 0A75E40A .ðu.ði.±á.•.tÙÕ...¼.M.ÌÄÀ).D.ÌÄÀ
0375FFFC 8080C480 FF78E903 71E52A7F ED8081EC 80C132D8 74E40A5C 74ED0AD8 Ä.Üt\.ðtÜ2è.š..Ú.*Íq.Õ(..ó..•.u. 000000
01548850 06503E02 D9D1E8D1 08740006 503E8080 CF80C932 2D8A015D 8BFF78E9 Õx..}..-2è.ü..>P..t.ìŠì).>P.P.T. 000020
76E90D88 01CA8003 74D688C2 080011E8 EE88001A E8D801EA D180CE80 C032248A .$2á.ð.Ìõ1ÀÒ...ŸÒ...ó.øt..ò..ìÕv 000040
C1034E07 73D788FA 1808F7E1 F7C688FA 8815E3C0 3396F3F7 1D73D33B F880E9FF .Õ¯½;Æs.¼µ.3áD..•.ó¼Ã¼Ä.•.øs.N.ê 000060
ED800774 ED0A0652 2E8A0006 5006C6C3 ED73C188 D003C128 FFFF8EC3 F973D313 .Æs•ùƒ..+ê.Å.êsÙÙó.P....R..Ût..Ú 000080
585B5AFE 4EE8DB32 02335253 50065308 0A06C708 0A36FF38 74E40A3C 77EC3A0E .:šw<.ðt8.6..ú...S.PSR3ø2ÜÒN±Z[X 0000A0
50A2D233 DB33C033 FE33E908 0A068F58 585AFE0F E8FF3252 53500657 080A06C7 ú...W.PSR2.Ò.±Z[X....Õ3±3á3Ü3øÀP 0000C0
066D88F7 87D3EB06 55A30653 A3C033FE 1AE85253 50065708 0A06C708 0A36FF06 ..6..ú...W.PSRÒ.±3áÈS.ÈU.ŠÆ.¼.m. 0000E0
C3FE8808 0A3688AB E60A80E6 807FE480 ADA5A5A5 080A3E88 F7881DEB 8000F581 .¼..Š..¼.>..ÈÈÈÙ.ð..Ì..Ì¨.6...±ù 000100
D68695F7 870977E8 38E0E583 D274FFE0 25DAD0E0 D1DED0E5 D1064488 FC066D88 .m.•.D.ÌÌÀßÌÀÀÖ×Å.tø.ÌÁ;Òw..¼..ø 000120
F888E086 C001C0D1 C00157DD D1E2D0DD D1E6D089 7706A03D D8F7C528 C274C008 .âtó+é¼Á=..w¿ÀÌÌÌÀãÌÌWÌâÌÞ'ã.Å.½ 000140
C9800374 D208187C 0EFF8363 74FF0810 CC800FE4 80AD93AD 91AD92C0 32E08AAC ¯.Å2à.Ù.Ù.Ù.ð..ä...tc...|..)t..è 000160
D68A01CE 800374D2 0A287C06 FF832372 4874E777 10EF83C0 330888C8 88D18801 ..Ì.ù.Ã3ä.ÿ.wÕtHr#...|+.øt..ù..ø 000180
F57547D0 D1D30101 D1E2D123 740F7708 EF83E432 C48AF88A DF8AE88A CD8AF18A .þ.ë.Š.Õ.½.á2õ.ÿ.w.t#ÌãÌÌÌÆÌÁGù¼ 0001A0
8003743F C2F6975E CF87F6E2 DAD1DFD1 D8D1E8D1 20CA8003 743FC2F6 CF8716EB Š..Ü–õ?t..ò ÌÒÌÙÌÒÌÕã–.ü^.–õ?t.. 0001C0
                                                                                                0001E0
Dump of file SATURN:[PCCOMMON.DUMP.DLL]SA-DIFM.DLL;1 on 18-APR-1990 10:50:26.92
File ID (450,15,0)   End of file block 323 / Allocated 324

Virtual block number 259 (00000103), 512 (0200) bytes

1000CE81 0FFFE681 05748850 9F50035C 13014C13 3402D8D0 E5D13870 E5D120CA ò Ììp;ÌÌÀÄ.4.L..\.P.P.t..Ì...ö..
88E9F6EC E90375E0 FD8320C5 83DAD109 D1D8D1DF D1137420 00C7F7FE 13589E58 X.X.±¼ú. t.ÌÕÌÙÌÌÌÕ.é .»Áu.Õš–Õ. 000000
1373FE18 9E1000CE 810FFFE6 819F0574 88035C18 014C1834 2AD0F608 D0E5D100 .ÌÌÀÄ–Å*4.L..\..t...Ì...ö....±s. 000020
1375E0C7 F61875FF 080004BE FCFE13DE 13CE13F5 DAF7D1F7 D3F7D7F7 D0F6F633 3––Ä¼æ¼Æ¼Ì¼Õ¼.ö.ß.±•ƒ....u.–úÁu. 000040
97277601 00ED8118 751FE0C7 F7E4EBD2 33CA88D9 88F8883D 744E4076 0200ED81 .Ù..v@Nt=.«.Ì.ò3øŠÕ¼úÁ.u..Ú..v'. 000060
D1D1E2D1 717420ED 83127510 00C7F797 00B2F28A CE8AE98A DD8AFB8A C78AE08A .Å.ú.«.Ì.Õ.ö.·ÿ..¼ú..u..Ú tqlãÌÌ 000080
1A7401C6 F61F7207 7780FA80 0385E903 74000668 3E80FC90 65EBEBEB D7D1D3D1 ÌÆÌøŠŠŠe.•.>h..t.Õ...•.w.r.–ó.t. 0000A0
080A3E88 F7883074 E0FD8320 C5830874 2000C7F7 00D78300 D38300D1 8301C680 .ó..Ì..Æ..•.¼ú. t..é .»ÁtÕ.¼.>.. 0000C0
88ABC188 AAC68A05 5D880645 89C70AC5 08C032E0 862274ED D10FE780 8024DE87 .B$..Ó.1Üt".Á2à.é.ú.E..]..ó¨.ê¨. 0000E0
F788080A 3E88C033 0377E903 74000668 3E80FCF5 FDE90379 C3F78805 EF83A8C6 ó¨.ÿ..¼ùy.Õ»¼•.>h..t.Õw.3â.>...¼ 000100
D1E0D1D0 747FF0E1 81D13306 4D880874 7FF025D0 88064488 FCC3FE88 ABABABAB ¨¨¨¨¨¨.±ù•.D..Ã¼Þ.tÙ.M.3Ì.ÃÞ.tÀÌÀÌ 000120
CA800374 0181E850 D8D1E600 8674FFE0 30800005 8C70C103 7FE0E981 80002DE1 Ã-...ÕÁ..êp¥...=Å.tÑÀÌÌÀPÒ..t..ò 000140
E0FD8320 C58393E8 0A75ED08 D7D10301 D1D1E2D1 0E751000 C7F7D800 E5D15D01 .]ÌÌÀÃ¼ú..u.ìãÌÌÌÆÌ•.Úu.Š..é .»Á 000160
98747FF0 25D03306 4488EF74 7FF0E181 D188064D 88FCF787 F58CE9FF 24E98874 t.Õ$.Õ.¼.¼•.M..Ì.ÃÞ.tÿ.D.3Á¼Þ.t. 000180
32E88AAC 50D8D1E6 D09874FF E03D8000 059870C1 287FE0E9 8180202D E1D1E001 ÌÀÌÃ- ..ÕÁ.+êp....=Å.t.ÀÌÌÀP¯.Ò2 0001A0
A5AB10CC 800FE480 ADFD0666 BF05C683 F7885092 10CC800F E480AD92 AD93ADC9 èÙ.Ù.Ù.ð..ä..P.¼.ó.¢f.»Ù.ð..ä.¨È 0001C0
                                                                                                0001E0
Dump of file SATURN:[PCCOMMON.DUMP.DLL]SA-DIFM.DLL;1 on 18-APR-1990 10:50:26.92
File ID (450,15,0)   End of file block 323 / Allocated 324

Virtual block number 260 (00000104), 512 (0200) bytes

D1AB0668 2602E8D1 E888ADF7 8806668F FD1F7400 06683E80 0005C6FC A44746A5 ÉFGÊ•ó...>h..t.»¢f..¼Ù.òìò.&h.¨Ì
E857003B E857003F E8D9D1D8 D1D8D1EA D158FCAB D8D1ADAB D8D1ADAB D8D1ADED ÙÙÌÄ¨ÙÌÄ¨ÙÌÄ¨•XÌõÌÀÌÙÌÌÒ?.WÒ;.WÒ 000000
EFD108CA 80037407 C2F601CA 8003745F 5B59D788 C208C108 C30B0033 E8570037 7.WÒ3..û.ê.ô.•Y[_t..ò.–ô.t..ò.Ìÿ 000020
38FF3306 663688FF 08E9DAD1 D9D1D8D1 EFD1DAD1 D9D1D8D1 EFD1DAD1 D9D1D8D1 ÌÙÌÌÌÕÌÿÌÙÌÌÌÕÌÿÌÙÌÌÌÕÕ...6f.3.; 000040
A150F288 E7F70474 C0080660 A1F588ED 339752F6 F73877F0 38047502 085C7306 øs\.øu.;þw;¼–R.3Ù.¼Á'..åt.¼Ò.·PÅ 000060
CE18DAF7 5A920002 83E803E7 F70874C0 080664A1 EA13F003 E7F70674 C0080662 b..åt.¼Ò.Þ.ðÁd..åt.¼Ò.Ò.ø..Z¼Ò.ö 000080
4FC3ED73 06661613 06640613 06621E13 06600E03 4F137393 919295E8 185D0D18 .Ì].Ò....s.O..'...b...d...f.sÙÙÒ 0000A0
06448AC9 E8F50660 1688C213 06641E13 06620E03 0664061B 06621E1B 06600E2B +.'...b...d...b...d..ó..'.¼Šè.D. 0000C0
08E3008B 911AE30C 88E888DB 33065EA3 100C0F24 06458A06 5CA3100C 0F24E432 2ð$...È\..E.$...È^.3Ù.Š..D....D. 0000E0
880E74C0 0802448B ED3355DA 13C803E2 F70674D2 0802558B 048BCA8B E888E1F7 ¼Ã.Ò.ò...U..øt.¼ã.à.ÕU3Ù.D..åt.. 000100
F70674D2 0802558B 0074C008 02448850 C10858D5 D1DA13C8 03E2F708 74D20815 ..øt.¼ã.à.ÕÌÌX.êP.D..åt..U..øt.¼ 000120
0804448B D1D1EA13 D803E2F7 0874D208 0455880F 74C00804 88C933EA 13D803E2 ã.Ä.ð3è...åt..U..øt.¼ã.Ä.õÌÌ.D.. 000140
065E26F7 0874C008 048850C3 08580001 83EA1308 03E2F709 74D20815 880F74C0 åt....øt.¼ã.Ä.ð.Ì.X.ùP...åt.¼&^. 000160
D2080455 880F74C0 08024488 DB33CA13 E803065C 26F70874 C008058B CA13E803 .Ò.ò...åt.¼&\..Ò.ò3Ù.D..åt..U..ø 000180
D383CA13 E803E2F7 0974D20B 02558810 74C00804 448803D1 CA13E803 E2F70874 t.¼ã.Ò.òÌÆ.D..åt..U..øt.¼ã.Ò.ò.Æ 0001A0
C803065E 26F70874 C0080244 880A13C8 03065C26 F70874C0 0802458B ED335500 .U3Ù.E..åt.¼&\..à.Õ.D..åt.¼&^..à 0001C0
                                                                                                0001E0
```

Dump of file SATURN:[PCCOMMON.DUMP.DLL]SA-DIFM.DLL;1 on 18-APR-1990 10:50:26.92
File ID (450,15,0)   End of file block 323 / Allocated 324

Virtual block number 261 (00000105), 512 (0200) bytes

```
03065E26 F704448B D5D10A13 C803E2F7 08740208 0455881A 74C00804 4488DA13 .Ö.D..ât..U..@t.%ã.à.Öîî.D.%&^.. 000000
D1E2D15A 97C50306 5E26F606 5CA0EA13 D803065C 26F70874 C00B0445 88EA1308 Ä.õ.E..ât.%&\..Ä.õ.\.-&^..é.Zíãî 000020
36880006 6806C6C3 F6085ED7 01D3D1D1 D1E2D1D7 D1D3D1D1 D1E2D1D7 D1D3D1D1 îî£ìmiãîîî£ìmìãîîî£ìm^.-ûó.h...6 000040
53525150 0668080A 06C7080A 36FF4C74 ED085077 F53804C0 EE810874 F6080669 î..-t..Ÿã.;%wP.ÙtL.ó..ú...k.PQRS 000060
E8FF3357 55535251 50067308 0A06C758 595A5B50 5FFC3EE8 D233C933 DB335755 UW3Û3è3ØÒ>e_][ZYXú...s.PQRSUW3.Ò 000080
36FF0668 A2FF33ED 330B3302 33C933C0 33FC1AE9 080A068F 58595A5B 5D5FF8D1 î«_][ZYX....Ö.=3ã3è3Ø3Û3Û3.Àh..6 0000A0
83EC8855 C6EBABAB ABABC033 06688FF8 F8E85755 53525150 0673080A 06C7080A ..û...s.PQRSUWÒ½«¢k.3ã   ŠóU.š. 0000C0
07EB0020 0598078A 26065E88 0C74010C 3187F608 8898078A 26065EC4 565704EC š.WVó^.&....Ä-.1..t..^.&.... .Š. 0000E0
8C067E89 F275040C 3187F608 8898058A 2647F888 16740065 3098078A 26065E88 .^.&...=e.t..«G&....Ä-.1..u·.~.. 000100
078826C6 88F88898 078A2606 5E882E07 C6260646 FFF08898 078A2606 5EC40846 F.ó^.&....Þ.F.&ó...^.&....½.ó&.. 000120
9008EB06 7EC45657 06EC83EC 8855CB5D E5885F5E FC7E89E9 75C00A06 46FFF788 .%.F..âuÕ.~=^_.[]ùW.š.š.WVó~.Š.. 000140
7E886774 003F8026 0646FFDF 8808468C 067E89F3 75003080 26470774 2E308026 &.=.t.G&.=.uµ.~..F..Ô.F.&.?.tg.~ 000160
8CC78808 468C067E 89ED7500 30802647 07744530 80260D74 65308026 900EEB06 .Š..&.=et.&.=Et.G&.=.uÚ.~..F..ú. 000180
260F8808 468C067E 89F97430 3080264F 9002EB06 7E88FE56 89FC4689 064EFFC2 ò.N..F=.V±.~.Š..O&.=0t'.~..F..Ô& 0001A0
8CFC7689 F275C00A 078826AC 065EC406 46FFFC76 C5FA5E8C 064EFF03 752E3F80 .?.u..N..^'év=.F.ó^.¯&...âu·.v=. 0001C0
281307A2 9A065EC4 280E07C2 9A227A1E 8DEC8855 90CB50E5 885F5EFA 5E8EFE5E ^±.^'^_.[]ù.U.š..z".ò..(ó^..Å..( 0001E0
```

Dump of file SATURN:[PCCOMMON.DUMP.DLL]SA-DIFM.DLL;1 on 18-APR-1990 10:50:26.92
File ID (450,15,0)   End of file block 323 / Allocated 324

Virtual block number 262 (00000106), 512 (0200) bytes

```
76FF2474 00067E83 565708EC 83EC8855 CB50C02B CB500001 B8057228 370C429A .B.7(r.¡..]ù+â]ùW.š.š.WV.~..t$.v 000000
5DE5885F 5E1FA5A5 A5A50A8E 1EF088FB 88085EC4 04C48328 5831B89A 0C76FF0E ..v..¡1[(.ó.ó^..«.Þ..ÔEEEE.^_.[] 000020
8D1FA5A5 A5A50A8E 1E0716F0 88F87E8D 04C48328 7531B89A 0C76FF0E 76FF90CB ù..v..v..¡1u(.ó..-½.Þ....ÔEEEE.. 000040
3E805657 0AEC83EC 885590CB 5DE5885F 5E28F109 159A085E C4287D07 C29AF85E ^½.ó.)(ó^....Þ(^_.[]ù.U.š.š.WV.> 000060
02EB0001 B805752D 3F8326F8 5EC4FA56 89F84689 25701688 256EA147 74000682 ...tGÀnX..pX.F½.V'ó^½&.?-u.¡..Š. 000080
FE76FF50 C02B9003 EB0001B8 067E000E 7E83FE56 89FC4689 0C56880A 4603C02B +â.F..V..F=.V±.~..~.¡..Š..+âP.v± 0000A0
2C9A37FF 260277FF 260477FF 260677FF 26065EC4 58EB06C4 83045DE8 0EFC76FF .v=.Ò]..ó.ŠXó^.&.w.&.w.&.w.&.7., 0000C0
C02B02EB 0001B805 7E000E7E 8350400E 46885052 FA5689F8 468908C4 83292F34 4/).ó..F½.V'RP.F.@P.~..~.¡..Š.+â 0000E0
89320E9A 50520C56 880A4603 C703C02B 02EB0001 B805752D 3F8326F8 8BF85EC4 ó^½.½&.?-u.¡..Š.+â.ú.F..V.RP..2. 000100
26FC46FF FC5EC40A 752D3F83 26F85EC4 FE5689FC 46890C56 880A4688 0AC48329 ).ó..F..V..F=.V±ó^½&.?-u.ó^=.F=& 000120
067CB82E 07C626FC 5E88FC46 FF078826 01478A26 FC5EC414 7E000E7E 832007C6 ó.-.~..~.ó^=&.G.&...F=.^=&ó..¡|. 000140
468908C4 832AC300 569A5052 FE5688FC 46030E46 0308F7C0 1B010682 3E80501E .P.>....ó%Ã.F..F=.V±RP.V.Û*.ó..F 000160
74303F80 26065FC4 26F85EC4 FC46FF45 07C626FC 5EC40774 00107E83 FE5689FC =.V±.-..t.ó^=&ó.E.F=ó^½&ó_.&.?0t 000180
64FE83FC 46FF2D07 C626FC5E C4F088D8 F7087DF6 08F08848 02478826 F85EC45E ^ó^½&.G.H.Þ.-).%Ã.Þó^=&ó.-.F=.±d 0001A0
88157C0A FE83FC46 FFF288F9 F799C688 070026FC 5EC4F9F7 00648999 C688157C |..ó.¿d.%'ó^=&...ó.%'.·.F=.±.|.. 0001C0
88070026 C688FC5E C4FC46FF F288F9F7 99C68807 0026FC5E C4F9F700 0AB999C6 ó.¿..%'ó^=&...ó.%'.·.F=ó^=.ó&... 0001E0
```

Dump of file SATURN:[PCCOMMON.DUMP.DLL]SA-DIFM.DLL;1 on 18-APR-1990 10:50:26.92
File ID (450,15,0)   End of file block 323 / Allocated 324

Virtual block number 263 (00000107), 512 (0200) bytes

```
0C76FF0E 76FF1076 FF010682 06C604EC 83EC8855 90CB50E5 885F5E0C 56880A46 F..V.^_.[]ù.U.š.š.ó.....v..v..v. 000000
83EC8855 CB50E588 00068206 C6FE5689 FC4689FE 49E80E06 76FF0876 FF0A76FF .v..v..v..ÒI±.F=.V±ó.....[]ùW.š. 000020
3F8326F4 5EC4F656 89F44689 25701680 256EA151 74000682 3E8000F2 46C612EC š.óF·..>...tQÀnX..pX.F¶.V-ó^¶&.? 000040
46886A75 0E463906 84A1FE56 89FC4689 0C56880A 4603C02B 02E80001 B805752D -u.¡..Š.+ó.F..V..F=.V±À..9F.uj.F 000060
5EC44AEB 0007C626 EE5E8830 07C626EE 46FFEE5E C4F05689 EE468906 840603FC =.....FŸ.VÞó^Ÿ.FŸ&ó.0.^Ÿ&ó..ŠJó^ 000080
5052F656 89F44689 08C4832A F3342C9A 37FF2602 77FF2604 77FF2606 77FF2606 .&.w.&.w.&.w.&.7.,4µ*.ó..F¶.V-RP 0000A0
50520C56 880A4603 C02B02E8 0001B805 752D3F83 26500E46 03024788 26F45EC4 ó^¶&.G..F.P&.?-u.¡..Š.+ó.F..V.RP 0000C0
FC5EC40A 752D3F83 26F45EC4 FE5689FC 46890C56 880A4688 0AC48319 A3320E9A ..2È..ó..F..V..F=.V±ó^¶&.?-u.ó^= 0000E0
830205E8 0EFC76FF FE76FF50 0001B81D 7F00027F 8326F45E C42D07C6 26FC46FF .F=&ó.-ó^¶&......¡..P.v±.v=.Ò... 000100
01B8687E 000E7E83 FC460102 478826F4 5EC40AEB 3007C626 FC46FFFC 5EC406C4 ó.ó^=.F=&ó.0Š.ó^¶&.G..F=.~..-h¡. 000120
027F8326 F45EC42E 07C626FC 46FFFC5E C406C483 01D8E80E FC76FFFE 76FF5000 .P.v±.v=.ÒÄ..ó.ó^=.F=&ó..ó^¶&... 000140
0E468803 7E0E4638 D8F70247 88260EEB D8F70247 88260874 0006823E 80437D00 .)C.>...t.&.G.%ÄŠ.&.G.%Ä;F.~..F. 000160
CA9AFC76 FFFE76FF 500030B8 0E76FF06 C4830196 E80EFC76 FFFE76FF 500E4689 .F.P.v±.v=.Ò...ó..v.¡0.P.v±.v=.ò 000180
76FF0E76 FF010682 06C604EC 83EC8855 CB50E588 0C56880A 468808C4 832C0A33 3.,.ó..F..V..[]ùW.š.š.ó.....v..v 0001A0
885590C8 5DE58800 068206C6 FE5689FC 4689FE6E E80E0676 FF0876FF 0A76FF0C ..v..v..v..Òn±.F=.V±ó.....[]ù.U. 0001C0
A308C483 2C46342C 9A37FF26 0277FF26 0477FF26 0677FF26 065EC456 06EC83EC š.š.Vó^.&.w.&.w.&.w.&.7.,4F,.ó.È 0001E0
```

Dump of file SATURN:[PCCOMMON.DUMP.DLL]SA-DIFM.DLL;1 on 18-APR-1990 10:50:26.92
File ID (450,15,0)   End of file block 323 / Allocated 324

Virtual block number 264 (00000108), 512 (0200) bytes

```
C02B9003 EB0001B8 06752D3F 83260684 A3480247 8B26256E 1EC42570 1689256E nX..pX6.nX&.G.Hè..&.?-u.|..Š..+å 000000
26256E1E C40AC483 2D46320E 9A50520E 76FF5306 FE5689FC 46890C56 8B0A4603 .F..V..F=.V±.S.v.RP..2F-.6.6.nX& 000020
4639C68B 077CFCFE 83068436 890686A2 C02A02EB 01B0047D 06843639 4E02778B .W.N96..).¯.Š.*âÅ...6...±=|..69F 000040
5DE5885E 0CC483FD 93E80E06 76FF0876 FF0A76FF 0C76FF0E 76FF1076 FF1F7F0E ....v..v..v..v..v..v..Ò.».å.^.[] 000060
C4FA5E8E FE5E8CFC 7689F975 00FF7C80 46FC76C5 FA5E8C1E 74000686 3E8090CB ù..>...t..^*év=F.|..u*.v=.^±.^*6 000080
E58B5E0A C483FEF6 E80E0676 FF0876FF 0A76FF0C 76FF0E76 FF00FE47 C626FC5E ^=&6G±..v..v..v..v..v..Ò-±.6.^.[ 0000A0
0876FF0A 76FF0C76 FF1076FF 1276FF19 75450E7E 83067465 0E7E83EC 8B55CB5D ]ùW.š.-.et..~.Eu..v..v..v..v..v. 0000C0
0E0676FF 0876FF0A 76FF0C76 FF1076FF 1875660E 7E839035 EBF8BFE8 0E0676FF .v..Ò.«Š5..-.fu..v..v..v..v..v.. 0000E0
C483FEC0 E80E0676 FF0876FF 0A76FF0C 76FF1076 FF1276FF CB5D0AC4 83FD39E8 Ò9».6.]ù.v..v..v..v..v..v..Òâ±.6 000100
0876FF50 4004C483 2D61008C 9A0676FF 0876FF29 74000A7E 83EC8B55 90CB5D0C .]ù.U.š.-..t).v..v....a-.6.ap.v. 000120
8B554590 D88CC88B CB5D0AC4 83280633 009A5052 08568B06 46030A46 8B0676FF .v..F..F..V.RP..3.(.6.]ù.à.Ä.EU. 000140
8B02ED83 F8068A16 8906880E 8908EB06 9A080A06 C7087412 7703FB83 D88E1EEC š..Ä.«.w.t.ú.....Š.........½.Ü.. 000160
A5A5FCD8 8EC18ED9 8CC08C06 8CBFF38B CBF3F60C B3069A2D 080AA1CB 4D5D1FE5 [.]MùÀ..-..°.-µù.µ¢...â.\.è.Ä=ÊÊ 000180
758BC306 8CBED98E A5A5A5A5 FCD88EC1 8ED98CC0 8C068CBF F38BC306 8CBED98E .\ƒ..û.µ¢...â.\.ê.Ä=ÊÊÊÊ.\ƒ..û.u 0001A0
D1FAD105 8925747F 80C2F702 548B0C8B C033FCFC 758803EB 07FE45C6 FC7D89FC =.)=6E±.Š..u==3â...T.%ô..t%..!*! 0001C0
C3065589 3800C281 8FE68004 4D890245 89D8D1D9 D1FAD1D8 D1D9D1FA D1D8D1D9 \\Ä!*!\\Äi*!\\Ä.E..M..Ì..ö.8.U.û 0001E0
```

Dump of file SATURN:[PCCOMMON.DUMP.DLL]SA-DIFM.DLL;1 on 18-APR-1990 10:50:26.92
File ID (450,15,0)   End of file block 323 / Allocated 324

Virtual block number 265 (00000109), 512 (0200) bytes

```
1E1F56A3 E0865800 00FFFF9A 5016C48B 50EC8B55 C3064589 04458902 45890589 ...E..E..E.ÜU.šP.6.P.....X.ÀEV.. 000000
9A50CB5D E58B0001 B82BB135 689A0636 E80021E8 0000FFFF 9A080C68 1E080E68 h...h.......Ò!.Ò6..h5ÿ+¡...[]ùP. 000020
3D80267F FFB9080E 068EFF33 0000BB1E 081416FF 00FF682E 522F2C9A 2E452ED2 •.E..,/R.h.......£..3.....¿..&.= 000040
061CEBE7 74AEF2C0 330874CA 88A6F3CB 88D1880C 188E3174 003D8026 47017500 .u.G&.=.t!/...!.ùµ!.òt.3à·ÜtÒŠ.. 000060
5A5900C3 1FEDEBAA C20A0572 412CAC92 04E0C00E 72412CAC 1F5DBF1F F7880071E ...¥.¢].¯,Ar.âÀ..¯,Ar..ò¯ŠÜ.ü.YZ 000080
2EFF5152 FF82E9C0 33057540 0C26A1CB 5152E38B 05720C2A 1E380872 0828DC8B .É+Är.;.*.r..DRQÙÀ&.au.3âÒ..RQ.. 0000A0
2F2C9A50 00FFB80C 2C1EFF04 74000C2E 3E832E57 2F2C9A50 00FCB8EC 8B550C26 &.U.š¡=.P.,/W..>...t.....|..P.,/ 0000C0
3BAD228A BE06568B C08ED88E 0D8D8857 56EC8855 FF52E900 02B8C85D E5882EDC É..[]ù¡..ÒR.U.šVW¡§..Ä.à.V./."Ü; 0000E0
57EC8855 0002CA5D E5885E5F 96EBEBF7 88AEF2FF FFB9C033 970C7496 401074C2 ôt.a.t..3â¿..·Ò.¥šŠ._^.[]ò..U.šW 000100
530002BB C48B5049 D1F7AEF2 FFFFB9C0 33FA8B92 1F74C008 2EF02EFC 9A0676FF .v..=.Þ..ât...*3â¿..¯Ò¼!!P.6£..S 000120
00582D04 468B216E 06FF0000 04C80002 CA5DE588 5F580000 FFFF9A50 1651521E .RQ.P.....[_.[]ò..à.....nl.F.-X. 000140
832F3637 1D9A0200 68FE5E8C FC468919 4C05E001 C103E001 C888F9F7 000CB999 .¿..¥*.àìÀ.ëìÀ.L..F=.^±h....76/. 000160
E8020002 47C726FC 5EC4080A 4F802611 74D00808 57892606 47892604 5EC402C4 6.6^.&.G.&.W..Àt.&.O..6^=&úG...Š 000180
0247C726 FC5EC408 57892606 47892640 FE5688FC 4688040A 4F802604 5EC49021 !.6^.&.O...F=.V±a&.G.&.W.6^=&úG. 0001A0
8BEC8855 C3C90000 0447C726 02578926 07892608 57882606 47882604 5EC40001 ..6^.&.G.&.W.&..&.W.&úG...èÜU.š. 0001C0
FF0876FF 0A76FF53 CC8B04EC 8306C8E9 068CE9C0 3300098A 08721F5B 1E3B065E ^.;.[.r.¤..3âÒ¥.Òà..š..äS.v..v.. 0001E0
```

Dump of file SATURN:[PCCOMMON.DUMP.DLL]SA-DIFM.DLL;1 on 18-APR-1990 10:50:26.92
File ID (450,15,0)   End of file block 323 / Allocated 324

Virtual block number 266 (0000010A), 512 (0200) bytes

```
0CEC83EC 8B5500CB 5DE58BFD 1F5DA780 91E175C0 855A5900 00FFFF9A 51160C76 v..Q.....YZ.âuÃ..I].».[]ù.U.š.š. 000000
51414151 51C93353 1274201F 5D87F606 7BE9C033 0009BA08 721F5B1E 3B065E8B .^.;.[.r.¤..3âÒ(.-.]. t.S3èQQAAQ 000020
89FE4689 C0330856 C50A468E FA5E8C66 74801F5D 87F60000 30159A50 16F4468D .F¶.P..0..-.]..tf.^*.F.éV.3â.F±. 000040
2B00808A DC8B02EC 833B75AE F20AB049 E30C4E8B F86689F2 8BFA8B56 57FCFC46 F==WV.*.·.f½.N.DI¯.·Òu;.š..É¤..+ 000060
FB3B0D80 009AE900 2BE8F4E2 AA1A74FB 3B0D740A 3CAC0C4E 8B0716FA 8BD48BE2 å.å.*...N.¯<.t.;«t.¯ã¶Ò+.Ò..¯.;« 000080
9AFFFCB8 7AEB0093 E9FA5E8E 5F5EE1E8 0014E8E2 EBFC46FF 0AB0AA00 1FE80375 u.Ò..¯¯..F=ŠãÒ..ŠÃ^ .^*Ò..Šz¡=.. 0000A0
002F569A 5016F446 8D51521E 53065E8B 1FE3CA2B CF881F06 1E515350 2F8D2EAE Ò../PSQ....Ù+òD..^.Š.RQ.F¶.P.V/. 0000C0
6D3D1874 C00808C4 831FC3FA 88585B59 1F07740B 08FE5E01 F45E8B11 75C00B00 ..âu..^¶.^±.Ut..Y(X.*û..6..ât.=m 0000E0
0E74401F 5D87F6FE 5E8E26EB F90020BA 03EB001C BA087500 09BA0001 30D07400 .t.=..¤..u.¤..Š.¤ .*Š&.^±-.].at. 000100
5EF8668B FC462BFE 468806EB F9C03300 1CBA0EEB F803751A 3F80085E 8B0A5E8E .^..^..?.u.½Š.¤..3â*Š..F±+F=.f½^ 000120
51521E53 0856C51E EEEBC18B 0475C908 0C4E8805 5FE9CB5D E5880472 FA5E8E5F _.^*r..[]ùÒ_..N..èu..èŠŸ.éV.S.RQ 000140
1CBACC75 0009BA00 013D0074 006D3D17 74C0081F 071E0000 30ED9A50 16F4468D ¯F¶.P.ÚÒ......ât.=m.t.=..¤..uä¤. 000160
A6EB0275 1A3F8026 DA8B0A74 401F5D87 F6B775C0 08F4468B C2EB0020 BAC7EB00 .Šú¤ .Šò.F¶.âuñ-.].at..Ò&.?.u.Š[ 000180
080C3187 F6088898 058A2647 9002EB06 7EC45657 000000C8 00A3EBC0 33001CBA ¤..3âŠÈ.à...WVá-.Š..G&....Ã-.1.. 0001A0
300238F6 9A570876 FF5004C4 8331EE00 8C9A5706 006A006A 08468C06 7E89F275 u·.-..F.j.j..W...Ÿ1.6.P.v.W.-8Ò0 0001C0
0AC8CBC9 5F5EDA8C 2572B81F A5A5A5A5 DA8E1E07 1EF08825 728F0008 050AC483 .6....¢rX.Þ....ÒÊÊÊÊ.¡rX.Ò^_èùà. 0001E0
```

Dump of file SATURN:[PCCOMMON.DUMP.DLL]SA-DIFM.DLL;1 on 18-APR-1990 10:50:26.92
File ID (450,15,0)   End of file block 323 / Allocated 324

Virtual block number 267 (0000010B), 512 (0200) bytes

```
5689FC46 89085788 26064788 260C5EC4 FA5689F8 46890856 88064688 56570000 ..WV.F..V..F½.V°6^.&.G.&.W..F•.V 000000
3F8026FC 5EC4F876 C5F65E8C 0A4E882E 7E000A7E 833007C6 26F846FF F85EC4FE ±6^½.F½&6.0.-..~..N..^-év½6^=&.? 000020
C40A4E89 F65E8EFA 5E8CF876 89E7E246 04883080 9003E807 8A26FC46 FF097400 .t..F•&..Š..¯0..Fãö.v½.^°.^-.N.6 000040
C6269006 EBF87EC4 F84EFF1F 7C353F80 26FC5EC4 287C000A 7E830007 C626F85E ^½&6...-..|(6^•&.?5|..N½6~½Š..&6 000060
0C5EC409 75313F80 26065EC4 07FE26DF 88FA468C F87E89F5 74393080 264F3005 .00&.=9t%.-½.F°.Ô&±.6^.&.?1u.6^. 000080
90CBC95F 5E08C483 31E10056 9A0676FF 52505240 08568806 468815EB 0247FF26 &.G.Š..F..V.ƏRPR.v..V.Ã1.6.^_èù. 0000A0
5D87F60C 7C00F883 117D1F5B 1E38065E 88EC8855 0590E900 835756EC 88550000 ..U.£VW°.Ö..U.š.^.;.(.)..«.|¯-.] 0000C0
56571E00 B5E90375 C90B0E4E 88EC8855 00CB5DE5 88C03302 E80001B8 0574401F .Ət.¦..Š.3å.Í]ù.U.š.N..èu.Öç..WV 0000E0
F1034950 7300DA83 C1285778 D20B0E4E 8832C619 1C9A5706 561E067E C40A76C5 év.á~..V.W...62.N..ØxW+è.Ö.sP|.þ 000100
C703C323 DB18C728 48C18841 C08E3335 05C08C07 73F9030B 8E05A205 D88C0773 s..Ä.Å..Ä.°s..â.53.âA.èH+ú.ÛWû.ú 000120
83D88E33 402DD88C 0775FFFE 835CE391 FCA4F3FD C1289140 C603C323 DB18C628 +ó.ÛWû.6Ə.+è»µÊ•.D\.±.u..Ä-Ə3.Ä. 000140
D2F7D688 C203C323 DB18C228 D2F7D788 48C188C8 EBC08E33 682DC08C D175FFFF ..ul.â-k3.âŠâ.èH.•%Ø+ö.ÛWû.ö.•%Ø 000160
337705D8 8C0775F6 0818E391 A4F3C913 A5F3E901 C1289140 C203C323 DB18C228 +ö.ÛWû.6Ə.+èÍÖµÊ.èµÊ.D..-u..Ä.w3 000180
0C4E88EC 8855CB5D 08568806 46881F5F 5EBEEBC0 8E33AE05 C08CC775 FF0BD88E .Ä..uú.â.Û3.âŠƒ^ ..F..V.]ùU.š.N. 0001A0
F3E9D1E0 8A0A4688 D12BD187 D1030323 DB18D12B 0C74DAF7 D78B067E C45738E3 DBWá~..•%Öt.+1.Û¥€.Ì.Ì+1.F..ÂÌÖµ 0001C0
08568806 46885FAA F3C913AB F3E9D1C3 8E3389C3 81C38C10 E3D187AA F3C913AB ¨.èµ¯.ÌD..Û.Û¿3.ÛÌÖµ¨.èµ´_.F..V. 0001E0
```

Dump of file SATURN:[PCCOMMON.DUMP.DLL]SA-DIFM.DLL;1 on 18-APR-1990 10:50:26.92
File ID (450,15,0)   End of file block 323 / Allocated 324

Virtual block number 268 (0000010C), 512 (0200) bytes

```
56EC8B55 CB5B0000 31769A53 1650521E 51000289 DC8B5301 578DE42A 078ACB5D ]ù..*ö.W.S.É¿..Q.RP.S.v1..[ÙU.šV 000000
880D44BF 5D0590E8 55003C8E A536A536 A536A536 003CBF06 768DC08E D88CFC57 W•.Ä.â.v.¢<.6É6É6É6Éƒ<.UÒ..]¢D.. 000020
88DA8C08 5D8C0D44 0645C704 4D890255 891D89FF 3200328F AA91A4F3 9198ACC8 â¯..µÉ.˜¢2.2....U..M.úÉ.D..]..Ö. 000040
0000FFFF 9A521650 1653C488 50871F50 A7800488 520002BB 00CB5DE5 885E5FC7 ú_^.Í]ù.É..R.å.Ì].ñP.6S.P.R..... 000060
E322540E 885AD479 481F5D8F 08088106 7500023D 07740001 30408112 7558C008 .ãXu.ÝƏ=..t.=..u.Ý...].KyåZ..T"D 000080
8E22521E FF00038B C28C225A 06C4FA34 E9037322 521EFFDB 33C28C22 5606C41E .á.V".63Ù..R"s.Ö4°á.Z".6É....R"ƒ 0000A0
9A34F568 0E016A08 74226230 225EB800 73E82250 BF224CBE 007CE822 5EBF225E ^"¢^"Ò|.ƒL"¢P"Òs.¡^"=b"t.j..h%4. 0000C0
88550000 34F09A00 6A006A03 6A0051E8 2262BF22 5EBED88E 2F0288C3 0000FFFF ....û¡./.Ãƒ^"¢b"ÒQ.j.j.j..Þ4..U. 0000E0
23E82262 8F22628E EC885503 E80031E8 2262BF22 5EBE003A E8257ABF 257ABEEC šƒzX¢zXÒ:.ƒ^"¢b"Ò1.Š.U.šƒb"¢b"Ò# 000100
FF00028B 07E32254 0E880000 FFFF9A50 06468A50 C033001A E822628F 22628E00 .ƒb"¢b"Ò..3åP.F.P.......T"D.£... 000120
F62B5657 000014C8 00C3EEEB 1DFFF274 02450B05 8804EF83 0E73F738 C322521E .R"û;%s..ÿ....E.t·..ŠŸû.à...WV+- 000140
FF0C6AF8 5689F646 89F25689 F04689C0 280B0E16 8800F0E9 0375080E 3639FF2B +.96..u.Öþ.....+å.FÞ.V·.F-.V½j.. 000160
C4008CE9 03767FFF FE814619 74C0080A C48335DC 38309A0C 18681EF6 76FFF876 v½.v-.h...0BÉ5.6..åt.F.±..v.Ö¥.6 000180
3F8026F6 5E8BF475 003F8026 F646FFF6 5EC40CEB 47EA7500 3F8026F6 46FFF65E ^-.F-&.?.uöGŠ.6^-.F-&.?.u¶.^-&.? 0001A0
02C48336 21371D9A 56EE5689 EC468904 C48335EB 37D89A04 6A500145 80BA7500 .uø.E.Pj..Ä7Š5.6..Fš.VŸV..7I6.6. 0001C0
16892163 A3EE5688 EC468866 74C20BFC 46886D74 EE460BEC 468BFE56 89FC4689 .F•.V±.Fš.FŸtm.F•.ötf.Fš.VŸÈc!.. 0001E0
```

Dump of file SATURN:[PCCOMMON.DUMP.DLL]SA-DIFM.DLL;1 on 18-APR-1990 10:50:26.92
File ID (450,15,0)   End of file block 323 / Allocated 324

Virtual block number 269 (0000010D), 512 (0200) bytes

```
FC4688EC 5EC42C74 C00B0AC4 83331D38 309A0C18 681EF076 FFF276FF 0C6A2165 e!j..v·.vÞ.h...08.3.6..åt,6^š.F• 000000
078826FC 46FFFC5E C4078A26 F046FFF0 5EC404EC 46830257 89260789 26FE5688 .V±&..&.W..Fš.6^Þ.FÞ&..6^•.F•&.. 000020
90CBC95F 5EA77500 3F8026F0 5EC4F475 003F8026 F046FFF0 5EC4E8EB 0E74C00A .åt.ŠÒ6^Þ.FÞ&.?.u¶6^Þ&.?.uI^_èù. 000040
12110010 120F160D 160C0808 070A0C09 0C080C07 0906000D5 18040203 02021601 ................................ 000060
09820A81 0A801606 09721C70 206D006C 0B590057 00530052 02430041 02350212 ..5.A.C.R.S.W.Y.l.m p.r......... 000080
FFB80008 E8CB5DE5 8B99FFFF 881F5216 891F59A3 16080000 0BD702CE 0BA40084 ..È.ö.•.....ÈY...R.¦....Í]ùÒ..¦. 0000A0
0472133C F7E24343 1674073A 2E1B75E4 0A0024B9 3670BB1F 59A3CB5D E58B99FF ...Í]ùÈY.£p6¿$..Öu..:.t.CCã%<.r. 0000C0
C08C065E C4EC8855 00C31F52 A3980147 8A2E4301 76CA3C04 728C3C43 0A76243C <$v.C<¥r.<òv.C..G..ÈR.û.U.š6^..å 0000E0
0E3E831E 73FFF13D 06468B57 5602EC83 EC8855CB 5DE58B01 FE4F8026 0574C30B .ût.&.0±..Í]ùU.š.š.VW.F.=þ.ε..>. 000100
2E9A0676 FF087500 78E80574 0018E815 750082E8 220EA312 740025E8 08750022 ".u.Ö%.t.È."Ò..u.Ò..t.Òx.u..v... 000120
C033FE5E 89FEE383 43065E8B 0776065E 3900F0BB CB5DE588 5E5F02C4 83359C3B ;.5.6._^.Í]ùÈÞ.9^.v..^.C.D±.^±3å 000140
2212A322 101687C2 883874FF FA8308C4 8337513C DA9A5002 B0510E4F 8D50501E .PP.O.Q¯.P.Ö<Q7.6..°.t8.ö .."È." 000160
02A30000 A3000A88 0C478948 480008A3 C033D88E FE5E8800 08A3DA8E 05740208 .Øt..ÖÈ...^±.Ä3åÈ..HH.G.¡. È..È. 000180
A6E82212 1E8ED833 064E88C0 8ED88CC3 1FD88C00 06A30000 05000AA3 01478000 ..G.È.....È...Ä.û.Ä.á.N.3Ù.  "ÖÌ 0001A0
89F84689 38050668 9A0676FF 006A0876 FF006A56 00000AC8 C3098EC1 8CD20B03 ..Ø.ê.\ûà...Vj..v.j..v..h..8.⁄½. 0001C0
FE5689FC 468902C4 83381E37 109A56F8 7688902F EB99C028 0674FFFF C2F7FA56 V°%ö..t.+å.Š/..v½V..7.8.6..F•.V± 0001E0
```

```
Dump of file SATURN:[PCCOMMON.DUMP.DLL]SA-DIFM.DLL;1 on 18-APR-1990 10:50:26.92
File ID (450,15,0)   End of file block 323 / Allocated 324

Virtual block number 270 (0000010E), 512 (0200) bytes

 90CBC95E FE568BFC 46889007 EB08C483 377D33CA 9A50FE76 FF006A56 1274D008 .Àt.Vj..v±P.ò3)7.á.Š...F=.V±^èù. 000000
 F30A76C5 FE88CB03 D9F7AEF2 C033F788 067EC4D9 8827E30E 4E881E56 57EC8855 U.šWV..N.D'.\á-..%3ä·Ù%].ù.±év.µ 000020
 880E4E88 00CB5DE5 885F5E1F C188D1F7 49490474 0477FF45 3A26C933 FF448AA6 ].D.3è&:E.w.t.II%I.é.^_.]]ù..N.. 000040
 DBF7AA2D 800A7902 080E750A F9831374 C00A93FC 071E570A 7EC51E08 56880646 F..V..é-.W..=..ât..'.u..@y.¯-¨%Ù 000060
 88AA2704 0276393C 30040387 92F1F793 F1F70274 C00B0233 92F788DA F7000283 .@.%ö.%.3@.ât.%þ.%þ..Æ.0<9v..'¨. 000080
 55CB5DE5 885E5F1F 580A8CF2 72C73B01 448DFF44 880586AC 4F0588E2 75C30BC2 ô.ùuã..O¨...D..D.;ùr·.ÖX._^.]]ùU 0000A0
 008940C9 8005730A 763B0022 1906C600 28E80122 1906C60E 56880833 5756EC88 .šVW3Ù.V.ó..".Ò(.ó..".;v.s..èa.. 0000C0
 4E88C08E D88CFCC8 5DE5885E 5F0006E8 0E5E88D2 335756EC 8855CB50 E58B5E5F _^.]]ùU.šVW3@.^.Ò.._^.]]ù=.À.à.N 0000E0
 88067689 21828E0A 4E88D88E A4F32182 8F0676C5 27E8F633 40810676 64F9830A ¯..'dv.Ÿa3-Š'év.¢.!µË.À.N.ƒ.!.v.. 000100
 50890445 89027589 00892170 8F0A7603 06762850 049FE855 21788F06 4E010C46 F..N.¢x!UÒ..}+v..v.¢p!...u..E..] 000120
 830005B9 0AC3830A C6831675 C43A8080 2509478A 2E09648A 5653C30A 8CC78806 ..ú.ÖùSV.d...G.%..:áu..ó..ù.¿... 000140
 D8D1E8D1 000589FF 33AD93AD 92AD95AD 56C35B5E F3E1073B 2E048802 E88302EE Ÿ..Š....;.Àµ^(ùVÙ.Ù.Ù.Ù3.¿..ìÒìÙ 000160
 5C890454 89026C89 3C895E03 FE20D8D1 F500013D 0001E301 F4E2DFD1 DDD1DAD1 ìÒìììÒä¶ìÒìÀ=..%ìÙ-±.^.<.[..T..\ 000180
 C60104C6 21F28EFF FOCCCCCC CCCCCCCC CD0000FF FFFFFFFF FFFC66C3 08448906 ..D.ûf•........ëäääääää».ƒ·!ó..ó 0001A0
 6480064C 8B5EA5F3 00048957 21E68FFC C08ED88C 06C3075B 4000B8C0 33300144 D.03å.Àa[.û..À.å=¢!!W¿..µË^.L..d 0001C0
 F88AB874 80A8AC21 EDBEFF33 FF7BE853 20830279 C9080674 7FF0C1F7 20837F07 ..• %ëþ.t..èy.°-SÒ(.3.ƒÙI¯¨.tE.½ 0001E0

Dump of file SATURN:[PCCOMMON.DUMP.DLL]SA-DIFM.DLL;1 on 18-APR-1990 10:50:26.92
File ID (450,15,0)   End of file block 323 / Allocated 324

Virtual block number 271 (0000010F), 512 (0200) bytes

 12F4E981 FA13C803 E7F69AB0 D713C803 E4F64D80 91E2F74D 108AC88B 3FFE05AD Ù.±?.àα.M%ã.¯M-ð.à.■¯.-ó.à.'.Ò¶. 000000
 575F065E E8398F8B 57470972 5FFF13E8 3985BB07 D5E821E6 BEDFF757 1343DF81 .ÒC.W4Ò/]!Òf.Eç9Ò.. r.GWE¢9Ò^._W 000020
 C480F4E2 DCD0DED1 DDD1DAD1 EBD10CE3 C033F788 D9F791AD 93AD92AD 95AD97AD Ù.Ù.Ù.Ù.Ù.%].%3äD.]Š]Òì]]ßÀÉä¶.á 000040
 D1D5D1D6 D1E4D050 56555253 51C03200 108921F3 BFD91301 13E91303 9AD68156 V.ø...Õ.1.]¢µ!¿..2äQSRUVPÀÒìøì[] 000060
 D9135901 1359E913 59F11359 E50259D0 D003D1D2 D1D5D106 D1E4D000 D0D3D1D2 øìÆÀÀÀÒìøì[ì@ìÆÀÀY.ìY.þY.Õ¨.ìY.) 000080
 BE12C183 FCAEF3FD 30B0494F 8DE259AA 3004D0D0 D3D1D2D1 D5D10601 E4D00014 ..ÀÒìø]]ì@ìÆÀÀ.O¨Yä§OI¯O»µÙ·.ê.ƒ 0000A0
 5EC41CEB F62BFC5E 8CFA4689 0058B856 000006C8 00C3075B 5A0001B8 0C8821F2 ·!..¡..Z[.û.à...V¡X..F'.^●+· ´ á^ 0000C0
 4816881F 46A10CFA 46834601 744004C4 8337EA42 369A5306 0E74830A 47F626FA '&-G..t..S.6Bö7.á.@t.F.F'.ÀF...H 0000E0
 8B55CB5D E58801FE 4F800474 D8080065E 88EC8855 90CBC95E C688D876 FA46391F .9F'vÀ.ó^èù.U.š.^..Ùt..O±..]]ùU. 000100
 2204A3FE 244024EB 99C03305 750176E8 00058807 1E297500 3F832204 BB5756EC šVWE.".?.u)..¡..Òv.u.3á.$$a$±E." 000120
 5E5F0009 E8C08ED8 8C064E88 220A3689 FFFEFE44 C704C683 000104C7 962206A3 Ê.".ú....ó.úD±±..ó.".N..À.áÒ.._^ 000140
 C1384843 7401A8FE 8BADFC02 778BF273 EEF983FE E180FA74 410000E9 CB5DE58B .]]ùÕÀ.At'.À±.'Ÿs·.w.=Ù.±´.tCH;ê 000160
 FE4C89F9 030C74FE 88E6E8FE 4489F788 000205C2 03357401 A8ADF003 D0881573 s..À.þÙ´.t5.ó....%.D±Š].±t..'.L± 000180
 C3027F89 22121E8C 26057401 3834F689 DA8CC68B FE4CFEF9 0305E805 8948C128 +èH..Š..'±L±.6.Ö¿-4;ìt.&..."...ù 0001A0
 ADF003D0 88BC73C1 3848FE8B F27401A8 ADF003FE 882574FF FE3D0222 1606C626 &ó..".=±.t%.±.þÙ´.t·.±H;ês¥.À.þÙ 0001C0
 22160EFE 2615EBD8 8E0474C0 08084788 E6EBFE44 89F78800 0205C203 E27401A8 ´.tã.ó....%.D±Š].G..ât..ÀŠ.&±.." 0001E0

Dump of file SATURN:[PCCOMMON.DUMP.DLL]SA-DIFM.DLL;1 on 18-APR-1990 10:50:26.92
File ID (450,15,0)   End of file block 323 / Allocated 324

Virtual block number 272 (00000110), 512 (0200) bytes

 0074C638 006BE8C0 33067788 88E8378B 220E1E8E 260574C7 383BC18F D88C1274 t..Àeê;;ùt.&...".7ŠE.w.3àÒk.;ót. 000000
 0474C138 3C15B9D8 8C98EB4E 4E960574 001DE8FE 4DFE0074 005FE898 40400124 $.aa.Ò_.t.±M±Ò..t..NNŠ..À¿.<;ét. 000020
 1638267F FFBA4141 49C82803 7401A8FE 458851C3 99C03302 4789078B 2212A326 &È."...G.3á.ùQ.E±¨.t.+à]AAα..&;. 000040
 D1D2F708 75000CE8 C628C223 D2F70D72 C2031572 C603C18B F575EAD1 04762214 ."v.]õu%.ê.ór..ór.%@#ò+óÒ..u.%@] 000060
 28068806 7789FFFE FE44C7F2 03F088FE 88571874 001DE851 52C359C0 33E575EA õu]3áYùRQÒ..t.W.±.Þ.·úD±±..w..●+ 000080
 8308C483 3AFD3CDA 9A1F0650 0001B850 52521ED2 335053C3 5A5958FE 55894AD7 ■J.U±XYZúSP3@.RRP¡..P...Ö<»:.á.. 0000A0
 48064688 08568808 168F3875 000A7E83 065756EC 8855C3D2 0802745B 5A1FFFFA '..Z[t..@ùU.$VW..~..uB¢...V..F.H 0000C0
 735E003E E8560E46 89024488 0074F738 1174480C 163684C E8277200 57E80775 u.ÒW.r'ŠL.ó..Ht.;%t..D..F.VÒ>.^s 0000E0
 FFFF9A50 C0335016 52C48850 21EB99FF FFB80675 D2080473 0C16FE81 04C68334 4.ó..±..s..@u.¡...$!P.áR.P3áP... 000100
 880E4E88 CB5DE588 5E5F07C0 3303880C 16368902 5C891489 E675C085 F95B0000 ..[*.âu!...\..ó...Æ3á._^.]]ù.N.. 000120
 0675F738 C18ED388 26721C03 DA882CE8 F9F2750C 16FE8104 C6830C74 024C39F7 %9L.t..ó..±..u·'Š,.Ö..F&.Æ.ê;%u. 000140
 58C3D188 04879208 10168904 75F738DE 75C08500 00FFFF9A 51531373 08101E39 9...s.SQ......âuB;%u.........ìúX 000160
 88E17202 0CE8D833 22261E89 00ACE908 330185E8 EF88FF33 D78840C9 8030C980 .èO.èa.■3..ÿÒ..3ÙÒ¯...&"3ÙÒ..rÀ. 000180
 72D888C5 03C475D2 0B22262E F7C388EA 88F88822 2626F7C7 8850E072 0205E8F8 %Ò..rÀP.ú%&&".%.ö.ú%.&".@uá.é.Àr 0001A0
 A3C03322 2A168922 28A3221E 0E89CE03 221C3E89 FCB5E8D8 73000383 F80358BE ƒX.%.Æ.sÀŠç=.>.".ö..."È("..*"3áÈ 0001C0
 4E417401 FDE8D833 00E7E89F 75D80880 CD800375 01ADE891 2224A322 20A32222 ""È "È$".ÒÙ.u..ë..Ùu.ÒÒ.3ÙÒ».tAN 0001E0
```

```
Dump of file SATURN:[PCCOMMON.DUMP.DLL]SA-DIFM.DLL;1 on 18-APR-1990 10:50:26.92
File ID (450,15,0)   End of file block 323 / Allocated 324

Virtual block number 273 (00000111), 512 (0200) bytes

 03EB0402 C9814E27 75027420 3C06742B 3C317400 22193E80 1274453C 1C74443C <Dt.<Et..>.".t1<+t.<-t.u'N.è..Š. 000000
 DBF70275 9E5840C9 80037502 C5F6008B E8509F01 6CE84600 00222806 C70EC980 .è.ú.("..FÒl..PÒ..-é.u..èaX.u.%Ü 000020
 222A3E2B 047510C5 F622243E 03FB0330 C9800374 1872C1F7 0675FF0B 22283E8B .>("..u.%ér.t..è0.«.>$"-é.u.+>*" 000040
 2CA13875 5E5901AC E800223A 06C6221C 3E880394 E82230BE 5156507F 0190FF81 .....PVQ/0"Ò...>."6.:".Ò~.Y^uBÀ, 000060
 223E8380 074D8004 747FF006 45F70003 83F5D8F7 D3F71374 80C5F622 2E1E8B22 "..."-é.t.%Æ%Å%.Æ.%E.Þ.t..M...>" 000080
 2606C63F FFBBC301 C980C302 CD800375 0022223E 83223A2E 8A08C980 03760722 ".v..è...:".>"".u..ë.û.è.ûE.76.& 0000A0
 33C3DFEB DE78D803 E3D1E3D1 C303E3D1 02CD80ED 770CCCFB 81177200 E4E80A22 ".Ò8.r..«ä.wÙ.ë.ÌD.ûìDÌD.ÄxBŠÖü3 0000C0
 1999FF81 00D78300 D5830003 83000358 008AE850 28720006 E8D788DF 8BEF8BFF ..ÿ.Ô.mÒm.r(PÒ..X.Å.Æ..Ì..m..... 0000E0
 C7F61675 2224060B C50BC78B EEEB2224 06FF01CA 800374C0 0A007200 8BE8E572 rÌÖE.r..ât..ò...$"$Ý.ú.é..$"u.-ú 000100
 1E89222C 168920C9 8010C980 06EB0575 D2080975 8000FB81 0F7480C5 F6177480 .t.-é.t..«..u..Bu.Š..è..è ..,".. 000120
 FF0B0040 B8F1EB22 240EFF00 25E80973 1999FF81 1C74C20B C30BC50B C78B222E .".ú.é.û.ôt.....s.Ò%...$"Šþ|ä... 000140
 E8C28B53 5557C35E AB92AB96 AB95AB93 AB922230 BFF78856 F6EB002A E8480678 x.HÒ*.Š-V.%«0"..¨..¨..¨..¨^ÜWUS.ôÒ 000160
 2D3C0874 005EE8C3 D7D1D5D1 D3D1E2D1 F81358E8 1358D813 58D00300 0BE8000E ..Ò...ÀX;ÀX.ÒX.%ìãìÆì(ìmüÒ^.t.<- 000180
 1DEB397D 2226063A 072C027E 093C4572 302C4A74 004EE8C3 4E460175 2B3C0674 t.<+u.FNÜÒN.tJ,0rE<.-.,.:.&")9$. 0001A0
 2206FF08 CD802224 0EFF0E74 10C5F626 77093C2A 72302C20 742E3C33 740037E8 Ò7.t3<.t ,0r*<.w&-é.t...$ ë..." 0001C0
 2373221E 3638C3F9 4EC9EB10 CD802220 06FF0975 10C5F6F4 EB20CD80 C3E43222 "2Öü.ë Š¶-é.u... ".ë.ŠèN'ù,'."s# 0001E0

Dump of file SATURN:[PCCOMMON.DUMP.DLL]SA-DIFM.DLL;1 on 18-APR-1990 10:50:26.92
File ID (450,15,0)   End of file block 323 / Allocated 324

Virtual block number 274 (00000112), 512 (0200) bytes

 02777A3C 0672613C E274003C E6740A3C EA74093C EE74203C 10740022 183E80AC ¨.>.".t.< tŸ<.tõ<.tl<.tã<ar.<zw. 000000
 E7D13E78 03FE05AD 4974C20B C10BC50B F888AD95 AD91AD92 AD57C3C0 32C35F24 $_ü2âÙWÙ.Ù.Ù.Ù.%.é.ê.ôtlÙ.±.x>1Ó 000020
 FA81F633 D30AD922 43F075CB FED7D000 D1D7D1D5 D1D1D1E2 D10005BB DFD1E8D1 1Ò1ÒE..1ã1111(1m1ÀÀm±ÙuÞC")..Æ3-.' 000040
 223A0E80 0FE80007 80F57FF0 3D0E74FF F0A90007 80C613FE 13EE13CE 13F58001 ..%.ö.Ý.±.6.m.¨Þ.t.=Þ.%.m.Š...:" 000060
 89223CBD C3FF0A06 45890475 89026089 0D895FF7 8BF888E8 8BC8B8D8 8BC03301 .3ä.À.à.Ò.%.%_...m..u..E...û§<"¿ 000080
 04D8F6C4 2AC42AE0 22C72B00 04B80007 BF084401 08478B2E ABF3C033 FD8B0008 ...»3äµ¨..G..D̄.¢..|..+ú"Å*é*é-Ä. 0000A0
 56113E00 46013E27 F72E0488 06C683F7 2BF10308 C383DF2B D92B5653 C88B9804 ...àSV+)+Ô.û..þ+%.6....%'>.F.>.V 0000C0
 C80BAD91 ADF5870E ED83BC75 4F02C583 5B5EE6E2 02C38302 EE830004 56833E02 .>.V...Ÿ..û.ã|^[.é.Ou¥.Ù..%Ù.Ù.à 0000E0
 D1D1D1D7 D1E2D108 4CFF0D78 C00BF58B AD93AD91 AD97ADD1 0A92ADCD 0AC808AD Ù.à.ëÙ..ÌÙ.Ù.Ù.Ù.%.àx..L.Ìãìmìì1 000100
 CDD1086C 01D5D1C5 130D13CD 13FD13F5 8001FA81 ED33D50B EF230001 BDD0D1D3 ÆÌÀ§..#ý.(3Ù.'..%.».ë.Ì.éìì.l.Ìë 000120
 C8000000 00000000 0004A000 00000000 0000C306 4489045C 89024C89 3C89C50B .é.<.L..\..D.û.................à 000140
 00368E18 C9BF0400 0000001B BEBC2000 00000000 000E9C40 00000000 00000007 ........a........ ¥/......¢è..6. 000160
 DEBE01AA 93BA47C9 80E98CE0 00D5C278 1F49FFCF A6D5006B 90C5ADA8 2B70B59E .çp+´Ùé.k.ÌÌü.Ì.xöÌ.Å.Õ.èGo.¨..B 000180
 E219652C FFFAA3D7 0A3D70A3 D70AFFFD CCCCCCCC CCCCCCCD 0353AA7E EBFB9DF9 '.«Š~¨S.ëääääääää»..mÈp=.mÈ'.,e.ã 0001A0
 1EAD4539 94BAFFCB E69594BE C44DE15B FFE6ABCC 77118461 CEFDFFF3 D1B71758 X.ñì µ.»öa..wä¨|.[ÃM6ƒ..Ìù.o.9EÙ. 0001C0
 C0314325 637A193A FE57D000 467C64BC E4A1FF2C A87FEA27 A539E9A5 FF96CFB1 Ÿü..EÒ9E'ö.´,.Àö¥d|FÀÌW±:.zcXC1à 0001E0

Dump of file SATURN:[PCCOMMON.DUMP.DLL]SA-DIFM.DLL;1 on 18-APR-1990 10:50:26.92
File ID (450,15,0)   End of file block 323 / Allocated 324

Virtual block number 275 (00000113), 512 (0200) bytes

 7BE85753 F573EFD1 0D74FF0B 0AC3830A EB83DFF7 41B8BB05 79FF0841 5EBBFCAE Û=E^A..y.E¡AKÔ.Š..û...t.Ìÿs%SWÒ( 000000
 75080A47 F6265575 023C0324 0A478A26 065EC4F6 28560000 04C8C3EC EB5B5FFE ±_[ŠŠûà...V+-6^.&.G.$.<.ωU&-G..u 000020
 06472B26 078B2606 5E883974 01194C87 F6060868 F9F7000C B9990058 2DC38B15 ..ū-X..¿..%'kÃ.-.L..t9.^.&..&+G. 000040
 3B08C483 3CCA302A 9A50E42A 0B478A26 0677FF26 0877FF26 50287EC0 0BFC4689 .F=.&-(P&.w.&.w.&.G.*ÒP.*Ob<.6.; 000060
 57892607 89260857 8B260647 8B26065E C4FFFFBE 200A4F80 26065EC4 0B74FC46 F=t.6^.&.O. ƒ..6^.&.G.&.W.&..&.W 000080
 0103005C 00062E25 0103005B 00062E38 01030000 CBC95EC6 88000004 47C72602 .&ûG....6^èù....8...(...%...\... 0000A0
 01050087 00061929 01050000 0010428A 00020007 0006350A 01030005 00063542 B5.......5.......B.......)....... 0000C0
 01030022 0006302E 01030098 00163426 02030000 00123C4A 00020088 000633FD »3......J<......&4.......=.."... 0000E0
 00000000 00000000 0000004D 0006348C 0103003A 00063056 01030026 00063079 y=..&...V0..:....4..M........... 000100
 6F43202D 20797261 7262694C 20656D69 542D6E75 52205340 00000000 00000000 ........MS Run-Time Library - Co 000120
 70726F43 2074666F 736F7263 694D202C 38383931 20296328 20746867 69727970 pyright (c) 1988, Microsoft Corp 000140
 020C49BA 5E353FE2 04189374 BC6A3FE8 00000000 00003FF0 00000000 00000011 ........Þ?......Ò?j¥t...ã?5^¤l.. 000160
 0624D02F 1AA03FC6 C8843958 10623FCE 56041893 74BC3FD4 39581062 4DD33FDB Ù?ÆMb.X9å?¥t...Vö?b.X9Çà6?../Ì$. 000180
 810624DD 2F1B3FAC AC083126 E9793FB3 33333333 33333FB9 99999999 999A3FC1 é?......¿?333333°?yÒ&1.¨¨?./Ì$.. 0001A0
 9FBE76C8 B4393F92 6E978D4F DF3B3F98 93748C6A 7EFA3FA0 624DD2F1 A9FC3FA5 È?=`þ0Mb.?'-j¥t..?;ÕO..n.?9Çàv/. 0001C0
 3A207325 006D6172 67616944 20776F6C 46206174 61443F84 7AE147AE 147B3F8A .?(.ÜGÃz.?Data Flow Diagram.%s : 0001E0
```

```
Dump of file SATURN:[PCCOMMON.DUMP.DLL]SA-DIFM.DLL;1 on 18-APR-1990 10:50:26.92
File ID (450,15,0)   End of file block 323 / Allocated 324

Virtual block number 276 (00000114), 512 (0200) bytes

 76612074 6F6E2073 69207265 646E6946 20747361 46004046 49444153 00732520  Xs.SADIFM.Fast Finder is not av 000000
 61766120 746F6E20 73692072 656E6769 73654400 00746579 20656C62 616C6961 ailable yet..Designer is not ava 000020
 616C6961 76612074 6F6E2065 72612073 746E6F46 00007465 7920656C 62616C69 ilable yet..Fonts are not availa 000040
 61766120 746F6E20 65726120 73656C79 74732074 78655400 00746579 20656C62 ble yet..Text styles are not ava 000060
 65520065 6C62616C 69617661 20746579 20746F4E 00007465 7920656C 62616C69 ilable yet..Not yet available.Re 000080
 77207463 61736E61 72742074 276E6143 00796669 746F6E20 6F742064 6E6F7073 spond to notify.Can't transact w 0000A0
 776F6C46 20617461 44000077 6F72726F 6220676E 69727564 206C6064 20687469 ith dml during borrow..Data Flow 0000C0
 20676E69 63616C50 00732520 20676E69 63616C50 00203A20 60617267 61694420  Diagram : .Placing  Xs.Placing  0000E0
 5DC10000 65646F4D 2068636F 6C422074 78655420 676E6972 65746E45 00732520  Xs.Entering Text Block Mode..è] 000100
 01915DCD 02200000 5DCC021A 06035DC8 0214068A 5DC6020E 06815DC5 0208063C <...é]....ó]¤...ù]....ä].. .ë].. 000120
 00000000 0000FFFF 05795DCF 02380516 5DCE0232 041C5D07 022C0304 5DD60226 &.ø]..,.ø]..2.ö]..8.ü]y......... 000140
 601C0262 1A426027 025C128C 60190256 0CDE6018 0250058D 5DC3024A 1E770002 ..w.J.û]..P..'B.V..'..\.''B.b..' 000160
 165A6024 0280169D 601E027A 02FC5D00 027415E9 5DD2026E 15495DC0 0268149F ..h.á]I.n.Ø]Ò.t.À]=.z..'....$'Z. 000180
 02A41DA3 601F029E 035C601B 0298196C 601A0292 18365DC8 028C1780 5DC70286 ..û]....à]6....'[....'\....'È.Ê. 0001A0
 5DD102C2 1C7C6021 028C1AD3 5DC90286 01E66025 0280023E 602602AA 1E296020  ').¯.&'>.¯.X'[.Ñ.è]Æ.¥.I'|.ö.ì] 0001C0
 16DE5DD4 02E0220E 602302DA 21A25DC2 02D4158E 601D02CE 209A5DC4 02C82017 . à.á]. ö..'..å.ô]ÂIÖ.#'."Ä.à]B. 0001E0

Dump of file SATURN:[PCCOMMON.DUMP.DLL]SA-DIFM.DLL;1 on 18-APR-1990 10:50:26.92
File ID (450,15,0)   End of file block 323 / Allocated 324

Virtual block number 277 (00000115), 512 (0200) bytes

 0C905DCD 030000F5 000202FA 02010001 00000000 00000000 FFFF234F 5F5302E6 Î.S_O#..............*...%...ë].. 000000
 0324151F 5F54031E 18875F50 031818E4 5DC30312 08305DCA 030C095C 5DCC0306 ..ä]\...ò]0...û]ô...P_....T_..$. 000020
 5F560342 00005D04 033C1414 5F550336 11EC5F53 033000CB 5F51032A 00825F52 R_ý.*.Q_ù.0.S_š.6.U_..<.å]..B.V_ 000040
 00200020 00000000 0000FFFF 089B5DCF 03540ACD 5DCE034E 1C185F57 03481B8D §.H.W_..N.ö]ë.T.ü].......... . . 000060
 00007470 20726F68 636E6120 65637275 6F732067 6E697474 65732072 6F727245 Error setting source anchor pt.. 000080
 726F6863 6E61206E 6F697461 6E697473 65642067 6E697474 65732072 6F727245 Error setting destination anchor 0000A0
 726F6863 6E612065 6372756F 7320676E 69747465 7320726F 72724500 00747020  pt..Error setting source anchor 0000C0
 61206E6F 6974616E 69747365 6420676E 69747465 7320726F 72724500 00747020  pt..Error setting destination a 0000E0
 61206563 72756F73 20676E69 74746573 20726F72 72450000 74702072 6F68636E nchor pt..Error setting source a 000100
 74616E69 74736564 20676E69 74746573 20726F72 72450000 74702072 6F68636E nchor pt..Error setting destinat 000120
 47485E88 0440310F 0002043A 28830001 00000074 7020726F 68636E61 206E6F69 ion anchor pt.....*(:....1ª..^HG 000140
 04643890 5E8D045E 33E55E8C 04583C14 5DC30452 322A5DCA 044C4792 5E890446 F..^.GL.ò]*2R.û].<X..^|3^..^.8d. 000160
 5E8A0482 430C5E93 047C4325 5D000476 44875D02 04704398 5DC0046A 38025E88 .^.;j.ä].Cp.Ø]ñDv.Å]%C|..^ÉC...^ 000180
 1E365E90 04A01D35 5E8F049A 171A5E92 04941544 5E8E048E 36AC5E9A 04881B86 .....^¯6...^D....^.....^5....^6. 0001A0
 04C41E77 5E9404BE 40945DC4 04884599 5DC204B2 1DD65E96 04AC1076 5E9504A6 Ì..^v.¯..^ø.ý.ò].E¦.á].ª/..^w.á. 0001C0
 5DD304E2 48825DD4 04DC23EF 5E9804D6 46825E9B 04D021D8 5E9704CA 04FF5E99 .^..ò..^ÄIÅ..^ýFø..^ÿ#É.å].Hã.Æ] 0001E0

Dump of file SATURN:[PCCOMMON.DUMP.DLL]SA-DIFM.DLL;1 on 18-APR-1990 10:50:26.92
File ID (450,15,0)   End of file block 323 / Allocated 324

Virtual block number 278 (00000116), 512 (0200) bytes

 0C855E9F 05004A0D 5E9E04FA 27115E9C 04F447F9 5E9D04EE 48E05D05 04E80F06 ..Ò.{]ÁHY..^*G¶..^.'*..^.J...^.. 000000
 15305DC7 0520320C 5DCC051A 0C915DC3 05143CF6 5DCA0000 00000000 0000FFFF ..........ò]-<..û]....ä]É2 .ú]=. 000020
 05443281 60E1053E 31FA60E0 05380A54 5DC40532 22CF0002 052C2675 00010526 &...u&,...ü"2.á]T.8.Å'*1>.Ä'.2D. 000040
 5DD80562 41805DD5 055C0737 60E60556 027260E2 0550037F 60E7054A 40FC60E4 ò'=ªJ.Ò'..P.ã'r.V.Ì'7.\.{]¯Ab.Ä] 000060
 00000000 FFFF0150 60E8057A 010060E5 0574392D 5DCF056E 36545DCE 0568420A Ö8h.ö]T6n.ü]-9t.Ì'..z.Ò'P....... 000080
 00000000 0000FFFF 09445D08 0598081E 5DD50592 063850CA 058C0000 00010000 ........ò]8...{]....Å]D......... 0000A0
 00000000 FFFF0CF1 5DD805BA 08CB5D05 05840711 5DCA05AE 00000001 00732544 D%s.....Û.ò]..Ç.{]ù.¤.Å]þ....... 0000C0
 2CD20000 00000000 00000000 00657474 656C6150 00657474 656C6150 00000000 ....Palette.Palette...........Ø, 0000E0
 1F9D2128 1E312120 1E332150 1E3B05EC 27FC05E8 26EC05E4 282005E0 2762FFFF ..b'Å. (ö.š&ö.='š.;.P!3.-!1.+!.. 000100
 2D2B0029 6C6C756E 2800296C 6C756E28 00001DDF 1D8C2388 2021238A 20232357 W## ¤#! ¡#..Ö...(null).(null).+- 000120
 40050101 00000000 06322EF6 062E2EF6 062A2EF6 06262EF6 224E2EF6 00002320  #..-.N"-.&.-.*.-...-.2........M 000140
 00000000 00000000 00000000 00000000 80C0E0F0 F8FCFEFF 00000000 78783136 61xx.....±=½þÅä.................. 000160
 30302B65 00000000 00000000 00000000 00000000 00000000 00000000 00000000 ..............................e+00 000180
 00000000 00000000 00000000 00000000 00000000 00000000 00000000 00000030 0............................... 0001A0
 00000000 00000000 00000000 00000000 00000000 00000000 00000000 00000000 ................................ 0001C0
 00000000 00000000 00000000 00000000 00000000 00000000 00000000 00000000 ................................ 0001E0
```

```
Dump of file SATURN:[PCCOMMON.DUMP.DLL]SA-DIFM.DLL;1 on 18-APR-1990 10:50:26.92
File ID (450,15,0)    End of file block 323 / Allocated 324

Virtual block number 279 (00000117), 512 (0200) bytes

00000000 00000000 00000000 00000000 00000000 00000000 00000000 00000000 ................................ 000000
00000000 00000000 00000000 00000000 00000000 00000000 00000000 00000000 ................................ 000020
00000000 00000000 00000000 00000000 00000000 00000000 00000000 00000000 ................................ 000040
00000000 00000000 00000000 00000000 00000000 00000000 00000000 00000000 ................................ 000060
00000000 00000000 00000000 00000000 00000000 00000000 00000000 00000000 ................................ 000080
00000000 00000000 00000000 00000000 00000000 00000000 00000000 00000000 ................................ 0000A0
00000000 00000000 00000000 00000000 00000000 00000000 00000000 00000000 ................................ 0000C0
00000000 00000000 00000000 00000000 00000000 00000000 00000000 00000000 ................................ 0000E0
00000000 00000000 00000000 00000000 00000000 00000000 00000000 00000000 ................................ 000100
00000000 00002278 25803525 25802580 00000000 069A0000 00000000 00000000 ................X.XX5.Xx"...... 000120
00000000 00000000 00000000 00000000 00000000 00000000 00000000 00000000 ................................ 000140
00000000 00000000 00000000 00000000 00000000 00000000 00000000 00000000 ................................ 000160
00000000 00000000 00000000 00000000 00000000 00000000 00000000 00000000 ................................ 000180
00000000 00000000 00000000 00000000 00000000 00000000 00000000 00000000 ................................ 0001A0
00000000 00000000 00000000 00000000 00000000 00000000 00000000 00000000 ................................ 0001C0
00000000 00000000 00000000 00000000 00000000 00000000 00000000 00000000 ................................ 0001E0

Dump of file SATURN:[PCCOMMON.DUMP.DLL]SA-DIFM.DLL;1 on 18-APR-1990 10:50:26.92
File ID (450,15,0)    End of file block 323 / Allocated 324

Virtual block number 280 (00000118), 512 (0200) bytes

00000000 00000000 00000000 00000000 00000000 00000000 00000000 00000000 ................................ 000000
00000000 00000000 00000000 00000000 00000000 00000000 00000000 00000000 ................................ 000020
00000000 00000000 00000000 00000000 00000000 00000000 00000000 00000000 ................................ 000040
00000000 00000000 00000000 00000000 00000000 00000000 00000000 00000000 ................................ 000060
00000000 00000000 00000000 00000000 00000000 00000000 00000000 00000000 ................................ 000080
00000000 00000000 00000000 00000000 00000000 00000000 00000000 00000000 ................................ 0000A0
00000000 00000000 00000000 00000000 00000000 00000000 00000000 00000000 ................................ 0000C0
00000000 00000000 00000000 00000000 00000000 00000000 00000000 00000000 ................................ 0000E0
00000000 00000000 00000000 00000000 00000000 00000000 00000000 00000000 ................................ 000100
00000000 00000000 00000000 00000000 00000000 00000000 00000000 00000000 ................................ 000120
00000000 00000000 00000000 00000000 00000000 00000000 00000000 00000000 ................................ 000140
00000000 00000000 00000000 00000000 00000000 00000000 00000000 00000000 ................................ 000160
00000000 00000000 00000000 00000000 00000000 00000000 00000000 00000000 ................................ 000180
00000000 00000000 00000000 00000000 00000000 00000000 00000000 00000000 ................................ 0001A0
00000000 00000000 00000000 00000000 00000000 00000000 00000000 00000000 ................................ 0001C0
00000000 00000000 00000000 00000000 00000000 00000000 00000000 00000000 ................................ 0001E0

Dump of file SATURN:[PCCOMMON.DUMP.DLL]SA-DIFM.DLL;1 on 18-APR-1990 10:50:26.92
File ID (450,15,0)    End of file block 323 / Allocated 324

Virtual block number 281 (00000119), 512 (0200) bytes

00000000 00000000 00000000 00000000 00000000 00000000 00000000 00000000 ................................ 000000
00000000 00000000 00000000 00000000 00000000 00000000 00000000 00000000 ................................ 000020
00000000 00000000 00000000 00000000 00000000 00000000 00000000 00000000 ................................ 000040
00000000 00000000 00000000 00000000 00000000 00000000 00000000 00000000 ................................ 000060
00000000 00000000 00000000 00000000 00000000 00000000 00000000 00000000 ................................ 000080
00000000 00000000 00000000 00000000 00000000 00000000 00000000 00000000 ................................ 0000A0
00000000 00000000 00000000 00000000 00000000 00000000 00000000 00000000 ................................ 0000C0
00000000 00000000 00000000 00000000 00000000 00000000 00000000 00000000 ................................ 0000E0
00000000 00000000 00000000 00000000 00000000 00000000 00000000 00000000 ................................ 000100
5F454C49 465F435F 08160000 00000000 00000000 00000000 00000000 00000000 ........................_C_FILE_ 000120
20282828 28282020 20202020 20202000 00000000 0200FFFF FFFF003D 4F464E49 INFO=...........         ¯7(((((¯ 000140
10101010 10101010 10101010 10104820 20202020 20202020 20202020 20202020                 H............... 000160
01010101 01010101 81818181 81811010 10101010 10848484 84848484 84848410 ................................ 000180
02020202 02020202 82828282 82821010 10101010 01010101 01010101 01010101 ................................ 0001A0
00000000 00000000 00000000 00000020 10101010 02020202 02020202 02020202 ................ ............... 0001C0
00000000 00000000 00000000 00000000 00000000 00000000 00000000 00000000 ................................ 0001E0
```

```
Dump of file SATURN:[PCCOMMON.DUMP.DLL]SA-DIFM.DLL;1 on 18-APR-1990 10:50:26.92
File ID (450,15,0)   End of file block 323 / Allocated 324

Virtual block number 282 (0000011A), 512 (0200) bytes

00000000 00000000 00000000 00000000 00000000 00000000 00000000 00000000 ................................ 000000
00000000 00000000 00000000 00000000 00000000 00000000 00000000 00000000 ................................ 000020
00000000 00000000 00000000 00000000 00000000 00000000 00000000 00000000 ................................ 000040
00000000 00600000 00000000 00000000 00000000 00000000 00000000 00000000 ...........................`.... 000060
00000000 02020000 00000000 00000000 01020000 00000000 00000000 00012276 v".............................. 000080
00000000 00000000 00000000 00000000 00000000 00000000 00000000 00000000 ................................ 0000A0
00000000 00000000 00000000 00000000 00000000 00000000 00000000 00000000 ................................ 0000C0
00000000 00000000 00000000 00000000 00000000 00000000 00000000 00000000 ................................ 0000E0
00000000 00000000 00000000 00000000 00000000 00000000 00000000 00000000 ................................ 000100
00000000 00000000 00000000 00000000 00000000 00000000 00000000 00000000 ................................ 000120
00000000 00000000 00000000 00000000 00000000 00000000 00000000 00000000 ................................ 000140
00000000 00000000 00000000 00000000 00000000 00000000 00000000 00000000 ................................ 000160
00000000 00000000 00000000 00000000 00000000 00000000 00000000 00000000 ................................ 000180
00000000 00000000 00000000 00000000 00000000 00000000 00000000 00000000 ................................ 0001A0
00000000 00000000 00000000 00000000 00000000 00000000 00000000 00000000 ................................ 0001C0
00000000 00000000 00000000 00000000 00000000 00000000 00000000 00000000 ................................ 0001E0

Dump of file SATURN:[PCCOMMON.DUMP.DLL]SA-DIFM.DLL;1 on 18-APR-1990 10:50:26.92
File ID (450,15,0)   End of file block 323 / Allocated 324

Virtual block number 283 (0000011B), 512 (0200) bytes

00000000 00000000 00000000 00000000 00000000 00000000 00000000 00000000 ................................ 000000
00000000 00000000 00000000 00000000 00000000 00000000 00000000 00000000 ................................ 000020
00000000 00000000 00000000 00000000 00000000 00000000 00000000 00000000 ................................ 000040
00000000 00000000 00000000 00000000 00000000 00000000 00000000 00000000 ................................ 000060
00000000 00000000 00000000 00000000 00000000 00000000 00000000 00000000 ................................ 000080
00000000 00000000 00000000 00000000 00000000 00000000 00000000 00000000 ................................ 0000A0
00000000 00000000 00000000 00000000 00000000 00000000 00000000 00000000 ................................ 0000C0
00000000 00000000 00000000 00000000 00000000 00000000 00000000 00000000 ................................ 0000E0
00000000 00000000 00000000 00000000 00000000 00000000 00000000 00000000 ................................ 000100
00000000 00000000 00000000 00000000 00000000 00000000 00000000 00000000 ................................ 000120
00000000 00000000 00000000 00000000 00000000 00000000 00000000 00000000 ................................ 000140
00000000 00000000 00000000 00000000 00000000 00000000 00000000 00000000 ................................ 000160
00000000 00000000 00000000 00000000 00000000 00000000 00000000 00000000 ................................ 000180
00000000 00000000 00000000 00000000 00000000 00000000 00000000 00000000 ................................ 0001A0
00000000 00000000 00000000 00000000 00000000 00000000 00000000 00000000 ................................ 0001C0
00000000 00000000 00000000 00000000 00000000 00000000 00000000 00000000 ................................ 0001E0

Dump of file SATURN:[PCCOMMON.DUMP.DLL]SA-DIFM.DLL;1 on 18-APR-1990 10:50:26.92
File ID (450,15,0)   End of file block 323 / Allocated 324

Virtual block number 284 (0000011C), 512 (0200) bytes

00000000 00000000 00000000 00000000 00000000 00000000 00000000 00000000 ................................ 000000
00000000 00000000 00000000 00000000 00000000 00000000 00000000 00000000 ................................ 000020
00000000 00000000 00000000 00000000 00000000 00000000 00000000 00000000 ................................ 000040
00000000 00000000 00000000 00000000 00000000 00000000 00000000 00000000 ................................ 000060
00000000 00000000 00000000 00000000 00000000 00000000 00000000 00000000 ................................ 000080
00000000 00000000 00000000 00000000 00000000 00000000 00000000 00000000 ................................ 0000A0
00000000 00000000 00000000 00000000 00000000 00000000 00000000 00000000 ................................ 0000C0
00000000 00000000 00000000 00000000 00000000 00000000 00000000 00000000 ................................ 0000E0
00000000 00000000 00000000 00000000 00000000 00000000 00000000 00000000 ................................ 000100
00000000 00000000 00000000 00000000 00000000 00000000 00000000 00000000 ................................ 000120
00000000 00000000 00000000 00000000 00000000 00000000 00000000 00000000 ................................ 000140
00000000 00000000 00000000 00000000 00000000 00000000 00000000 00000000 ................................ 000160
00000000 00000000 00000000 00000000 00000000 00000000 00000000 00000000 ................................ 000180
00000000 00000000 00000000 00000000 00000000 00000000 00000000 00000000 ................................ 0001A0
00000000 00000000 00000000 00000000 00000000 00000000 00000000 00000000 ................................ 0001C0
00000000 00000000 00000000 00000000 00000000 00000000 00000000 00000000 ................................ 0001E0
```

```
Dump of file SATURN:[PCCOMMON.DUMP.DLL]SA-DIFM.DLL;1 on 18-APR-1990 10:50:26.92
File ID (450,15,0)   End of file block 323 / Allocated 324

Virtual block number 285 (0000011D), 512 (0200) bytes

 00000000 00000000 00000000 00000000 00000000 00000000 00000000 00000000 ................................ 000000
 00000000 00000000 00000000 00000000 00000000 00000000 00000000 00000000 ................................ 000020
 00000000 00000000 00000000 00000000 00000000 00000000 00000000 00000000 ................................ 000040
 00000000 00000000 00000000 00000000 00000000 00000000 00000000 00000000 ................................ 000060
 00000000 00000000 00000000 00000000 00000000 00000000 00000000 00000000 ................................ 000080
 00000000 00000000 00000000 00000000 00000000 00000000 00000000 00000000 ................................ 0000A0
 00000000 00000000 00000000 00000000 00000000 00000000 00000000 00000000 ................................ 0000C0
 00000000 00000000 00000000 00000000 00000000 00000000 00000000 00000000 ................................ 0000E0
 00000000 00000000 00000000 00000000 00000000 00000000 00000000 00000000 ................................ 000100
 00000000 00000000 00000000 00000000 00000000 00000000 00000000 00000000 ................................ 000120
 00000000 00000000 00000000 00000000 00000000 00000000 00000000 00000000 ................................ 000140
 00000000 00000000 00000000 00000000 00000000 00000000 00000000 00000000 ................................ 000160
 00000000 00000000 00000000 00000000 00000000 00000000 00000000 00000000 ................................ 000180
 00000000 00000000 00000000 00000000 00000000 00000000 00000000 00000000 ................................ 0001A0
 00000000 00000000 00000000 00000000 00000000 00000000 00000000 00000000 ................................ 0001C0
 00000000 00000000 00000000 00000000 00000000 00000000 00000000 00000000 ................................ 0001E0

Dump of file SATURN:[PCCOMMON.DUMP.DLL]SA-DIFM.DLL;1 on 18-APR-1990 10:50:26.92
File ID (450,15,0)   End of file block 323 / Allocated 324

Virtual block number 286 (0000011E), 512 (0200) bytes

 00000000 00000000 00000000 00000000 00000000 00000000 00000000 00000000 ................................ 000000
 00000000 00000000 00000000 00000000 00000000 00000000 00000000 00000000 ................................ 000020
 00000000 00000000 00000000 00000000 00000000 00000000 00000000 00000000 ................................ 000040
 00000000 00000000 00000000 00000000 00000000 00000000 00000000 00000000 ................................ 000060
 00000000 00000000 00000000 00000000 00000000 00000000 00000000 00000000 ................................ 000080
 00000000 00000000 00000000 00000000 00000000 00000000 00000000 00000000 ................................ 0000A0
 00000000 00000000 00000000 00000000 00000000 00000000 00000000 00000000 ................................ 0000C0
 00000000 00000000 00000000 00000000 00000000 00000000 00000000 00000000 ................................ 0000E0
 00000000 00000000 00000000 00000000 00000000 00000000 00000000 00000000 ................................ 000100
 00000000 00000000 00000000 00000000 00000000 00000000 00000000 00000000 ................................ 000120
 00000000 00000000 00000000 00000000 00000000 00000000 00000000 00000000 ................................ 000140
 00000000 00000000 00000000 00000000 00000000 00000000 00000000 00000000 ................................ 000160
 00000000 00000000 00000000 00000000 00000000 00000000 00000000 00000000 ................................ 000180
 00000000 00000000 00000000 00000000 00000000 00000000 00000000 00000000 ................................ 0001A0
 00000000 00000000 00000000 00000000 00000000 00000000 00000000 00000000 ................................ 0001C0
 00000000 00000000 00000000 00000000 00000000 00000000 00000000 00000000 ................................ 0001E0

Dump of file SATURN:[PCCOMMON.DUMP.DLL]SA-DIFM.DLL;1 on 18-APR-1990 10:50:26.92
File ID (450,15,0)   End of file block 323 / Allocated 324

Virtual block number 287 (0000011F), 512 (0200) bytes

 00000000 00000000 00000000 00000000 00000000 00000000 00000000 00000000 ................................ 000000
 00000000 00000000 00000000 00000000 00000000 00000000 00000000 00000000 ................................ 000020
 00000000 00000000 00000000 00000000 00000000 00000000 00000000 00000000 ................................ 000040
 00000000 00000000 00000000 00000000 00000000 00000000 00000000 00000000 ................................ 000060
 00000000 00000000 00000000 00000000 00000000 00000000 00000000 00000000 ................................ 000080
 00000000 00000000 00000000 00000000 00000000 00000000 00000000 00000000 ................................ 0000A0
 00000000 00000000 00000000 00000000 00000000 00000000 00000000 00000000 ................................ 0000C0
 00000000 00000000 00000000 00000000 00000000 00000000 00000000 00000000 ................................ 0000E0
 00000000 00000000 00000000 00000000 00000000 00000000 00000000 00000000 ................................ 000100
 00000000 00000000 00000000 00000000 00000000 00000000 00000000 00000000 ................................ 000120
 00000000 00000000 00000000 00000000 00000000 00000000 00000000 00000000 ................................ 000140
 00000000 00000000 00000000 00000000 00000000 00000000 00000000 00000000 ................................ 000160
 00000000 00000000 00000000 00000000 00000000 00000000 00000000 00000000 ................................ 000180
 00000000 00000000 00000000 00000000 00000000 00000000 00000000 00000000 ................................ 0001A0
 00000000 00000000 00000000 00000000 00000000 00000000 00000000 00000000 ................................ 0001C0
 00000000 00000000 00000000 00000000 00000000 00000000 00000000 00000000 ................................ 0001E0
```

```
Dump of file SATURN:[PCCOMMON.DUMP.DLL]SA-DIFM.DLL;1 on 18-APR-1990 10:50:26.92
File ID (450,15,0)   End of file block 323 / Allocated 324

Virtual block number 288 (00000120), 512 (0200) bytes

00000000 00000000 00000000 00000000 00000000 00000000 00000000 00000000 ................................ 000000
00000000 00000000 00000000 00000000 00000000 00000000 00000000 00000000 ................................ 000020
00000000 00000000 00000000 00000000 00000000 00000000 00000000 00000000 ................................ 000040
00000000 00000000 00000000 00000000 02000001 00000000 00000000 00000000 ................................ 000060
00000000 00000000 00000000 00000000 00000000 00000000 00000000 00000000 ................................ 000080
00000000 00000000 00000000 00000000 00000000 00000000 00000000 00000000 ................................ 0000A0
00000000 00000000 00000000 00000000 00000000 00000000 00000000 00000000 ................................ 0000C0
00000000 00000000 00000000 00000000 00000000 00000000 00000000 00000000 ................................ 0000E0
00000000 00000000 00000000 00000000 00000000 00000000 00000000 00000000 ................................ 000100
00000000 00000000 00000000 00000000 00000000 00000000 00000000 00000000 ................................ 000120
00000000 00000000 00000000 00000000 00000000 00000000 00000000 00000000 ................................ 000140
00000000 00000000 00000000 00000000 00000000 00000000 00000000 00000000 ................................ 000160
00000000 00000000 00000000 00000000 00000000 00000000 00000000 00000000 ................................ 000180
00000000 00000000 00000000 00000000 00000000 00000000 00000000 00000000 ................................ 0001A0
00000000 00000000 00000000 00000000 00000000 00000000 00000000 00000000 ................................ 0001C0
00000000 00000000 00000000 00000000 00000000 00000000 00000000 00000000 ................................ 0001E0

Dump of file SATURN:[PCCOMMON.DUMP.DLL]SA-DIFM.DLL;1 on 18-APR-1990 10:50:26.92
File ID (450,15,0)   End of file block 323 / Allocated 324

Virtual block number 289 (00000121), 512 (0200) bytes

00000000 00000000 00000000 00000000 00000000 00000000 00000000 00000000 ................................ 000000
00000000 00000000 00000000 00000000 00000000 00000000 00000000 00000000 ................................ 000020
00000000 00000000 00000000 00000000 00000000 00000000 00000000 00000000 ................................ 000040
00000000 00000000 00000000 00000000 00000000 00000000 00000000 00000000 ................................ 000060
00000000 00000000 00000000 00000000 00000000 00000000 00000000 00000000 ................................ 000080
00000000 00000000 00000000 00000000 00000000 00000000 00000000 00000000 ................................ 0000A0
00000000 00000000 00000000 00000000 00000000 00000000 00000000 00000000 ................................ 0000C0
00000000 00000000 00000000 00000000 00000000 00000000 00000000 00000000 ................................ 0000E0
00000000 00000000 00000000 00000000 00000000 00000000 00000000 00000000 ................................ 000100
00000000 00000000 00000000 00000000 00000000 00000000 00000000 00000000 ................................ 000120
00000000 00000000 00000000 00000000 00000000 00000000 00000000 00000000 ................................ 000140
00000000 00000000 00000000 00000000 00000000 00000000 00000000 00000000 ................................ 000160
00000000 00000000 00000000 00000000 00000000 00000000 00000000 00000000 ................................ 000180
00000000 00000000 00000000 00000000 00000000 00000000 00000000 00000000 ................................ 0001A0
00000000 00000000 00000000 00000000 00000000 00000000 00000000 00000000 ................................ 0001C0
00000000 00000000 00000000 00000000 00000000 00000000 00000000 00000000 ................................ 0001E0

Dump of file SATURN:[PCCOMMON.DUMP.DLL]SA-DIFM.DLL;1 on 18-APR-1990 10:50:26.92
File ID (450,15,0)   End of file block 323 / Allocated 324

Virtual block number 290 (00000122), 512 (0200) bytes

00000000 00000000 00000000 00000000 00000000 00000000 00000000 00000000 ................................ 000000
00000000 00000000 00000000 00000000 00000000 00000000 00000000 00000000 ................................ 000020
00000000 00000000 00000000 00000000 00000000 00000000 00000000 00000000 ................................ 000040
00000000 00000000 00000000 00000000 00000000 00000000 00000000 00000000 ................................ 000060
00000000 00000000 00000000 00000000 00000000 00000000 00000000 00000000 ................................ 000080
00000000 00000000 00000000 00000000 00000000 00000000 00000000 00000000 ................................ 0000A0
00000000 00000000 00000000 00000000 00000000 00000000 00000000 00000000 ................................ 0000C0
00000000 00000000 00000000 00000000 00000000 00000000 00000000 00000000 ................................ 0000E0
00000000 00000000 00000000 00000000 00000000 00000000 00000000 00000000 ................................ 000100
00000000 00000000 00000000 00000000 00000000 00000000 00000000 00000000 ................................ 000120
00000000 00000000 00000000 00000000 00000000 00000000 00000000 00000000 ................................ 000140
00000000 00000000 00000000 00000000 00000000 00000000 00000000 00000000 ................................ 000160
00000000 00000000 00000000 00000000 00000000 00000000 00000000 00000000 ................................ 000180
00000000 00000000 00000000 00000000 00000000 00000000 00000000 00000000 ................................ 0001A0
00000000 00000000 00000000 00000000 00000000 00000000 00000000 00000000 ................................ 0001C0
00000000 00000000 00000000 00000000 00000000 00000000 00000000 00000000 ................................ 0001E0
```

```
Dump of file SATURN:[PCCOMMON.DUMP.DLL]SA-DIFM.DLL;1 on 18-APR-1990 10:50:26.92
File ID (450,15,0)   End of file block 323 / Allocated 324

Virtual block number 291 (00000123), 512 (0200) bytes

 00000000 00000000 00000000 00000000 00000000 00000000 00000000 00000000 ................................ 000000
 00000000 00000000 00000000 00000000 00000000 00000000 00000000 00000000 ................................ 000020
 00000000 00000000 00000000 00000000 00000000 00000000 00000000 00000000 ................................ 000040
 81818101 00000001 00000000 00000000 00000000 00000818 19400000 00000000 ......a......................... 000060
 00000000 00000000 00000000 00000000 00000000 00000000 00000000 00000000 ................................ 000080
 00000000 00000000 00000000 00000000 00000000 00000000 00000000 00000000 ................................ 0000A0
 00000000 00000000 00000000 00000000 00000000 00000000 00000000 00000000 ................................ 0000C0
 00000000 00000000 00000000 00000000 00000000 00000000 00000000 00000000 ................................ 0000E0
 00000000 00000000 00000000 00000000 00000000 00000000 00000000 00000000 ................................ 000100
 00000000 00000000 00000000 00000000 00000000 00000000 00000000 00000000 ................................ 000120
 00000000 00000000 00000000 00000000 00000000 00000000 00000000 00000000 ................................ 000140
 0A0A0A00 00000000 00000000 00000000 00000000 00000000 00000000 00000000 ................................ 000160
 0A0A0A0A 0A0A0A0A 0A0A0A0A 0A0A0A0A 0A0A0A0A 0A0A0A0A 0A0A0A0A 0A0A0A0A ................................ 000180
 0A0A0A0A 0A0A0A0A 0A0A0A0A 0A0A0A0A 0A0A0A0A 0A0A0A0A 0A0A0A0A 0A0A0A0A ................................ 0001A0
 0A0A0A0A 0A0A0A0A 0A0A0A0A 0A0A0A0A 0A0A0A0A 0A0A0A0A 0A0A0A0A 0A0A0A0A ................................ 0001C0
 0A0A0A0A 0A0A0A0A 0A0A0A0A 0A0A0A0A 0A0A0A0A 0A0A0A0A 0A0A0A0A 0A0A0A0A ................................ 0001E0

Dump of file SATURN:[PCCOMMON.DUMP.DLL]SA-DIFM.DLL;1 on 18-APR-1990 10:50:26.92
File ID (450,15,0)   End of file block 323 / Allocated 324

Virtual block number 292 (00000124), 512 (0200) bytes

 0A0A0A0A 0A0A0A0A 0A0A0A0A 0A0A0A0A 0A0A0A0A 0A0A0A0A 0A0A0A0A 0A0A0A0A ................................ 000000
 0A0A0A0A 0A0A0A0A 0A0A0A0A 0A0A0A0A 0A0A0A0A 0A0A0A0A 0A0A0A0A 0A0A0A0A ................................ 000020
 0A0A0A0A 0A0A0A0A 0A0A0A0A 0A0A0A0A 0A0A0A0A 0A0A0A0A 0A0A0A0A 0A0A0A0A ................................ 000040
 0000000A 0A0A0A0A 0A0A0A0A 0A0A0A0A 0A0A0A0A 0A0A0A0A 0A0A0A0A 0A0A0A0A ................................ 000060
 00000000 00000000 00000000 00000000 00000000 00000000 00000000 00000000 ................................ 000080
 00000000 00000000 00000000 00000000 00000000 00000000 00000000 00000000 ................................ 0000A0
 00000000 00000000 00000000 00000000 00000000 00000000 00000000 00000000 ................................ 0000C0
 00000000 00000000 00000000 00000000 00000000 00000000 00000000 00000000 ................................ 0000E0
 00000000 00000000 00000000 00000000 00000000 00000000 00000000 00000000 ................................ 000100
 00000000 00000000 00002000 00000000 00000000 00000000 00000000 00000000 ..................... .......... 000120
 00000000 00000000 00000000 00000000 00000000 00000000 00000000 00000000 ................................ 000140
 3ADC2254 19680000 00000636 20680000 05F0073E 00000000 00000000 00000000 ............>.Þ...h-6.....k.T"É: 000160
 00000000 0000FFFF 22643FF8 00000000 00003FF3 33333333 33332262 FFFF225C \"..b"333333µ?......½?d"........ 000180
 7020676E 6974616F 6C66202D 0A004854 414D203A 00FD3E3E 47534D4E 3C3C0000 ..<<NMSG>>».: MATH..- floating-p 0001A0
 64697669 64006700 0A006469 6C61766E 69006500 203A726F 72726520 746E696F oint error: .e.invalid...g.divid 0001C0
 766F206B 63617473 006E000A 0D776F6C 66726576 6F006800 0A003020 79622065 e by 0...h.overflow...n.stack ov 0001E0

Dump of file SATURN:[PCCOMMON.DUMP.DLL]SA-DIFM.DLL;1 on 18-APR-1990 10:50:26.92
File ID (450,15,0)   End of file block 323 / Allocated 324

Virtual block number 293 (00000125), 512 (0200) bytes

 0D646574 6172656E 65672079 6C746963 696C7078 65007000 0A0D776F 6C667265 erflow...p.explicitly generated. 000000
 0003000A 0D776F6C 66726576 6F206863 61747320 2D0A0D30 30303652 0000000A ....R6000..- stack overflow..... 000020
 08000A0D 30207962 20656469 76696420 72656765 746E6920 2D0A0033 30303652 R6003..- integer divide by 0.... 000040
 6120726F 66206563 61707320 6867756F 6E652074 6F6E202D 0A0D3830 30365200 .R6008..- not enough space for a 000060
 6867756F 6E652074 6F6E2020 0A0D3930 30365200 09000A0D 73746E65 6D756772 rguments.....R6009..- not enough 000080
 00FF000A 0D00FC00 0A0D746E 656D6E6F 7269766E 6520726F 66206563 61707320  space for environment...•...... 0000A0
 74616F6C 6620200A 0D323030 36520002 0020726F 72726520 656D6974 206E7572 run-time error ...R6002..- float 0000C0
 02020002 000AFFFF FF000A00 64656461 6F6C2074 6F6E2074 6E696F70 20676E69 ing point not loaded............ 0000E0
 050E0002 00000009 04340002 00000008 02F40002 00000007 02440002 00000006 ......D.......¶.......4......... 000100
 0D5A0002 00000010 22600002 0000000C 05A80002 0000000B 05860002 0000000A ..............'.......'"......Z. 000120
 49430000 00000000 00780000 00284142 00000000 00000012 1F480002 00000011 ......H.........BA(...x.......CI 000140
 4943FFFF FF000000 00010001 00800040 0000000C 00000438 00200020 0000001A .... . .8.......a.............CI 000160
 00FFFFFF FF000000 00040001 00400040 0000000C 00000838 00200020 0000001A .... . .8.......a.a............. 000180
 80008000 80008080 00000000 80404040 FFFF0000 FFFF00FF 00FF00FF FF000000 .................aaa............ 0001A0
 00100010 0000001A 494301E0 02800000 00F00000 00284142 C0C0C078 34000080 ...4xàààBA(...Þ.....À.CI........ 0001C0
 00100010 0000001A 4943FFFF FF000000 00010001 00400020 0000000C 00001038 8....... .a..........CI........ 0001E0
```

```
Dump of file SATURN:[PCCOMMON.DUMP.DLL]SA-DIFM.DLL;1 on 18-APR-1990 10:50:26.92
File ID (450,15,0)    End of file block 323 / Allocated 324

Virtual block number 294 (00000126), 512 (0200) bytes

00FF00FF FF000000 00FFFFFF FF000000 00040001 00200020 0000000C 00001138 8....... . ...................... 000000
C0C0C078 34000080 80008000 80008080 00000000 80404040 FFFF0000 FFFF00FF ........ààà................4xààà 000020
0000000C 00001338 00200020 0000001A 49430300 04000000 00000000 00284142 BA(...........CI.... . .8....... 000040
0000000C 00001738 00200020 0000001A 4943FFFF FF000000 00010001 00800040 à.............CI.... . .8....... 000060
FF000000 4080FFFF FFCECECE 99999966 66663131 31000000 00080001 00400040 à.à........111fff...ööö....à.... 000080
FFFFFFFF FFFFFFFF 0000FFFF FF00FFBD F3E5E4FF FFD68BAF D4CFBCE8 BBFFFFBF «..ÉÒ¥üåÉ|ø..ö|µ§............... 0000A0
FFFFFFFF FFFFFFFF FFFFFFFF FFFFFFFF FFFFFFFF FFFFFFFF FFFFFFFF FFFFFFFF ................................ 0000C0
FFFFFFFF FFFFFFFF FFFFFFFF FFFFFFFF FFFFFFFF FFFFFFFF FFFFFFFF FFFFFFFF ................................ 0000E0
FFFFFFFF FFFFFFFF FFFFFFFF FFFFFFFF FFFFFFFF FFFFFFFF FFFFFFFF FFFFFFFF ................................ 000100
FFFFFFFF FFFFFFFF FFFFFFFF FFFFFFFF FFFFFFFF FFFFFFFF FFFFFFFF FFFFFFFF ................................ 000120
FFFFFFFF FFFFFFFF FFFFFFFF FFFFFFFF FFFFFFFF FFFFFFFF FFFFFFFF FFFFFFFF ................................ 000140
FFFFFFFF FFFFFFFF FFFFFFFF FFFFFFFF FFFFFFFF FFFFFFFF FFFFFFFF FFFFFFFF ................................ 000160
FFFFFFFF FFFFFFFF FFFFFFFF FFFFFFFF FFFFFFFF FFFFFFFF FFFFFFFF FFFFFFFF ................................ 000180
FFFFFFFF FFFFFFFF FFFFFFFF FFFFFFFF FFFFFFFF FFFFFFFF FFFFFFFF FFFFFFFF ................................ 0001A0
FFFFFFFF FFFFFFFF FFFFFFFF FFFFFFFF FFFFFFFF FFFFFFFF FFFFFFFF FFFFFFFF ................................ 0001C0
FFFFFFFF FFFFFFFF FFFFFFFF FFFFFFFF FFFFFFFF FFFFFFFF FFFFFFFF FFFFFFFF ................................ 0001E0

Dump of file SATURN:[PCCOMMON.DUMP.DLL]SA-DIFM.DLL;1 on 18-APR-1990 10:50:26.92
File ID (450,15,0)    End of file block 323 / Allocated 324

Virtual block number 295 (00000127), 512 (0200) bytes

FFFFFFFF FFFFFFFF FFFFFFFF FFFFFFFF FFFFFFFF FFFFFFFF FFFFFFFF FFFFFFFF ................................ 000000
FFFFFFFF FFFFFFFF FFFFFFFF FFFFFFFF FFFFFFFF FFFFFFFF FFFFFFFF FFFFFFFF ................................ 000020
FFFFFFFF FFFFFFFF FFFFFFFF FFFFFFFF FFFFFFFF FFFFFFFF FFFFFFFF FFFFFFFF ................................ 000040
FFFFFFFF FFFFFFFF FFFFFFFF FFFFFFFF FFFFFFFF FFFFFFFF FFFFFFFF FFFFFFFF ................................ 000060
FFFFFFFF FFFFFFFF FFFFFFFF FFFFFFFF FFFFFFFF FFFFFFFF FFFFFFFF FFFFFFFF ................................ 000080
FFFFFFFF FFFFFFFF FFFFFFFF FFFFFFFF FFFFFFFF FFFFFFFF FFFFFFFF FFFFFFFF ................................ 0000A0
FFFFFFFF FFFFFFFF FFFFFFFF FFFFFFFF FFFFFFFF FFFFFFFF FFFFFFFF FFFFFFFF ................................ 0000C0
FFFFFFFF FFFFFFFF FFFFFFFF FFFFFFFF FFFFFFFF FFFFFFFF FFFFFFFF FFFFFFFF ................................ 0000E0
FFFFFFFF FFFFFFFF FFFFFFFF FFFFFFFF FFFFFFFF FFFFFFFF FFFFFFFF FFFFFFFF ................................ 000100
FFFFFFFF FFFFFFFF FFFFFFFF FFFFFFFF FFFFFFFF FFFFFFFF FFFFFFFF FFFFFFFF ................................ 000120
FFFFFFFF FFFFFFFF FFFFFFFF FFFFFFFF FFFFFFFF FFFFFFFF FFFFFFFF FFFFFFFF ................................ 000140
00000000 00000000 00000000 00000000 00000000 00000000 FFFFFFFF FFFFFFFF ................................ 000160
00000000 00000000 00000000 00000000 00000000 00000000 00000000 00000000 ................................ 000180
00000000 00000000 00000000 00000000 00000000 00000000 00000000 00000000 ................................ 0001A0
00000000 00000000 00000000 00000000 00000000 00000000 00000000 00000000 ................................ 0001C0
00000000 00000000 00000000 00000000 00000000 00000000 00000000 00000000 ................................ 0001E0

Dump of file SATURN:[PCCOMMON.DUMP.DLL]SA-DIFM.DLL;1 on 18-APR-1990 10:50:26.92
File ID (450,15,0)    End of file block 323 / Allocated 324

Virtual block number 296 (00000128), 512 (0200) bytes

00000000 00000000 00000000 00000000 00000000 00000000 00000000 00000000 ................................ 000000
00000000 00000000 00000000 00000000 00000000 00000000 00000000 00000000 ................................ 000020
00000000 00000000 00000000 00000000 00000000 00000000 00000000 00000000 ................................ 000040
00000000 00000000 00000000 00000000 00000000 00000000 00000000 00000000 ................................ 000060
00000000 00000000 00000000 00000000 00000000 00000000 00000000 00000000 ................................ 000080
00000000 00000000 00000000 00000000 00000000 00000000 00000000 00000000 ................................ 0000A0
00000000 00000000 00000000 00000000 00000000 00000000 00000000 00000000 ................................ 0000C0
00000000 00000000 00000000 00000000 00000000 00000000 00000000 00000000 ................................ 0000E0
00000000 00000000 00000000 00000000 00000000 00000000 00000000 00000000 ................................ 000100
00000000 00000000 00000000 00000000 00000000 00000000 00000000 00000000 ................................ 000120
00000000 00000000 00000000 00000000 00000000 00000000 00000000 00000000 ................................ 000140
0F000000 FCFFFFFF 0F000080 FFFFFFFF 0F000080 FFFFFFFF 00000000 00000000 ................................ 000160
0F000000 FCFFFFFF 0F000000 FCFFFFFF 0F000000 FCFFFFFF 0F000000 FCFFFFFF ...■.......■.......■.......■.... 000180
0F000000 FCFFFFFF 0F000000 FCFFFFFF 0F000000 FCFFFFFF 0F000000 FCFFFFFF ...■.......■.......■.......■.... 0001A0
FFFFC0FF FFFFFFFF FFFFE1FF FFFFFFFF FFFFF3FF FFFFFFFF 0F000000 FCFFFFFF ...■.......ß.......Ã.......å.... 0001C0
```

```
Dump of file SATURN:[PCCOMMON.DUMP.DLL]SA-DIFM.DLL;1 on 18-APR-1990 10:50:26.92
File ID (450,15,0)   End of file block 323 / Allocated 324

Virtual block number 297 (00000129), 512 (0200) bytes

 7F0000FC 3F0000F8 FFFFF3FF FFFFFFFF FFFFF3FF FFFFFFFF FF7F80FF FFFFFFFF .............µ.......µ..½..?=... 000000
 3F0000C0 3F0000C0 3F0000C0 3F0000C0 3F0000E0 3F0000C0 3F0000F8 3F0000F8 ½..7½..?à..?À..?à..?à..?à..?à..? 000020
 3F000000 000000C0 3F000040 3C0000C0 3F0000C0 3C0000C0 3F0000C0 3D0000C0 à..=à..?à..<à..?à..<@..?à......? 000040
 3F0000C0 3D0000C0 3F0000C0 3C0000C0 3F000040 3C0000C0 3F000000 000000C0 à......?à..<@..?à..<à..?à..=à..? 000060
 7F0000C0 3F0000C0 3F0000C0 3F0000C0 3F0000C0 3F0000C0 3F0000C0 3F0000C0 à..?à..?à..?à..?à..?à..?à..?à... 000080
 FFFFF3FF FFFFFFFF FF0100E0 FF0000C0 FF0000C0 FF0000C0 FF0000C0 FF0000C0 à...à...à...à...à...À........µ.. 0000A0
 FFFFF3FF FFFFFFFF FF7F80FF FFFFFFFF FFFFC0FF FFFFFFFF FFFFE1FF FFFFFFFF .....Ã.......à...............µ.. 0000C0
 0F000000 FCFFFFFF 0F000080 FFFFFFFF 0F000080 FFFFFFFF FFFFF3FF FFFFFFFF .....µ......................■.... 0000E0
 0F000000 FCFFFFFF 0F000000 FCFFFFFF 0F000000 FCFFFFFF 0F000000 FCFFFFFF ...■.......■.......■.......■.... 000100
 0F000000 FCFFFFFF 0F000000 FCFFFFFF 0F000000 FCFFFFFF 0F000000 FCFFFFFF ...■.......■.......■.......■.... 000120
 FFFFFFFF FFFFFFFF FFFFFFFF FFFFFFFF FFFFFFFF FFFFFFFF 0F000000 FCFFFFFF ...■............................ 000140
 FFFFFFFF FFFFFFFF FFFFFFFF FFFFFFFF FFFFFFFF FFFFFFFF FFFFFFFF FFFFFFFF ................................ 000160
 11111111 11111101 00000000 00000000 00000000 00000000 FFFFFFFF FFFFFFFF ................................ 000180
 11111111 11111101 00000000 00000000 00000000 00000000 00001111 11111111 ................................ 0001A0
 11111111 11111111 11000000 00000000 00000000 00000000 00001111 11111111 ................................ 0001C0
 11111111 11111111 11000000 00000000 00000000 00000000 00001111 11111111 ................................ 0001E0

Dump of file SATURN:[PCCOMMON.DUMP.DLL]SA-DIFM.DLL;1 on 18-APR-1990 10:50:26.92
File ID (450,15,0)   End of file block 323 / Allocated 324

Virtual block number 298 (0000012A), 512 (0200) bytes

 55555555 55555555 11000000 00000000 00000000 00000000 00001111 11111111 .........................UUUUUUU 000000
 55555555 55555555 11000000 00000000 00000000 00000000 00005555 55555555 UUUUUU..................UUUUUUU 000020
 55555555 55555555 11000000 00000000 00000000 00000000 00005555 55555555 UUUUUU..................UUUUUUU 000040
 55555555 55555555 11000000 00000000 00000000 00000000 00005555 55555555 UUUUUU..................UUUUUUU 000060
 55555555 55555555 11000000 00000000 00000000 00000000 00005555 55555555 UUUUUU..................UUUUUUU 000080
 55555555 55555555 11000000 00000000 00000000 00000000 00005555 55555555 UUUUUU..................UUUUUUU 0000A0
 11111111 11111111 11000000 00000000 00000000 00000000 00005555 55555555 UUUUUU.......................... 0000C0
 11111111 11111111 11000000 00000000 00000000 00000000 00001111 11111111 ................................ 0000E0
 00220000 00000000 00000000 00000000 00000000 00000000 00001111 11111111 ..............................". 000100
 20220200 00000000 00000000 00000000 00000000 00000000 00000000 00000000 ..............................."  000120
 22222200 00000000 00000000 00000000 00000000 00000000 00000000 00000000 ............................""" 000140
 22222202 00000000 00000000 00000000 00000000 00000000 00000000 00000000 ............................""" 000160
 00220000 00000000 00000000 00000000 00000000 00000000 00000000 00000020  .............................". 000180
 00220000 00000000 00000000 00000000 00000000 00000000 00000000 00000000 ..............................". 0001A0
 11221111 11000000 00000011 11111111 11111111 11010000 00000000 00000000 ..............................". 0001C0
 11221111 11010000 00000011 11111111 11111111 11010000 00000020 11111111 .... ..........................". 0001E0

Dump of file SATURN:[PCCOMMON.DUMP.DLL]SA-DIFM.DLL;1 on 18-APR-1990 10:50:26.92
File ID (450,15,0)   End of file block 323 / Allocated 324

Virtual block number 299 (0000012B), 512 (0200) bytes

 11111111 11110200 00000011 11111111 11111111 11111100 00000012 11111111 ................................ 000000
 11111111 11112100 00000011 11111111 11111111 11111100 00000011 11111111 ..........................!...... 000020
 55555555 55351100 00000011 11555555 55555555 55551100 00000011 11111111 ..........UUUUUUUU.......5UUUUU 000040
 55555555 55551100 20000011 11555555 55555555 55551100 00000011 11535555 UUS.......UUUUUUUU.... . 'UUUUU 000060
 55555555 55551100 22000011 11555555 55555555 55551100 00000011 11555555 UUU.......UUUUUUUU....".. UUUU 000080
 55555555 55551120 22000011 11555555 55555555 55551100 00000011 11555555 UUU.......UUUUUUUU...." .UUUUU 0000A0
 55555555 55551122 22222222 11555555 55555555 55551100 00000011 11555555 UUU.......UUUUUUUU."""""".UUUUU 0000C0
 55555555 55551122 22222222 11555555 55555555 55551100 00000011 11555555 UUU.......UUUUUUUU."""""".UUUUU 0000E0
 55555555 55551120 22000011 11555555 55555555 55551100 00000011 11555555 UUU.......UUUUUUUU...." .UUUUU 000100
 55555555 55551100 22000011 11555555 55555555 55551100 00000011 11555555 UUU.......UUUUUUUU....."..UUUUU 000120
 55555555 55551100 20000011 11555555 55555555 55551100 00000011 11555555 UUU.......UUUUUUUU.... ..UUUUU 000140
 55555555 55551100 00000011 11555555 55555555 55551100 00000011 11555555 UUU.......UUUUUUUU.......UUUUU 000160
 33333333 33331100 00000011 11555555 55555555 55551100 00000011 11555555 UUU.......UUUUUUUU.......333333 000180
 55555555 55551100 00000011 11555555 55555555 55551100 00000011 11333333 333.......UUUUUUUU.......UUUUU 0001A0
 55555555 55551100 00000011 11555555 55555555 55551100 00000012 11555555 UUU.......UUUUUUUU.......UUUUU 0001C0
 55555555 55351100 00000000 11555555 55555555 55551100 00000010 11555555 UUU.......UUUUUUUU.......5UUUUU 0001E0
```

Dump of file SATURN:[PCCOMMON.DUMP.DLL]SA-DIFM.DLL;1 on 18-APR-1990 10:50:26.92
File ID (450,15,0)   End of file block 323 / Allocated 324

Virtual block number 300 (0000012C), 512 (0200) bytes

```
11111111 11112100 00000000 11111111 11111111 11111100 00000000 11535555 UUS......................!...... 000000
11111111 11110200 00000000 11111111 11111111 11111100 00000000 12111111 ................................ 000020
00220000 00000000 00000000 00000000 00000000 00000000 00000000 20111111 ..............................". 000040
20220200 00000000 00000000 00000000 00000000 00000000 00000000 00000000 ..............................." 000060
22222200 00000000 00000000 00000000 00000000 00000000 00000000 00000000 ............................."""" 000080
22222202 00000000 00000000 00000000 00000000 00000000 00000000 00000000 ............................"""" 0000A0
00220000 00000000 00000000 00000000 00000000 00000000 00000000 00000020 ..............................". 0000C0
00220000 00000000 00000000 00000000 00000000 00000000 00000000 00000000 ..............................". 0000E0
11221111 11111101 00000000 00000000 00000000 00000000 00000000 00000000 ..............................". 000100
11221111 11111101 00000000 00000000 00000000 00000000 00001111 11111111 ..............................". 000120
11111111 11111111 11000000 00000000 00000000 00000000 00001111 11111111 ................................ 000140
11111111 11111111 11000000 00000000 00000000 00000000 00001111 11111111 ................................ 000160
55555555 55555555 11000000 00000000 00000000 00000000 00001111 11111111 ........................UUUUUUUU 000180
55555555 55555555 11000000 00000000 00000000 00000000 00005555 55555555 UUUUUU..................UUUUUUUU 0001A0
55555555 55555555 11000000 00000000 00000000 00000000 00005555 55555555 UUUUUU..................UUUUUUUU 0001C0
55555555 55555555 11000000 00000000 00000000 00000000 00005555 55555555 UUUUUU..................UUUUUUUU 0001E0
```

Dump of file SATURN:[PCCOMMON.DUMP.DLL]SA-DIFM.DLL;1 on 18-APR-1990 10:50:26.92
File ID (450,15,0)   End of file block 323 / Allocated 324

Virtual block number 301 (0000012D), 512 (0200) bytes

```
55555555 55555555 11000000 00000000 00000000 00000000 00005555 55555555 UUUUUU..................UUUUUUUU 000000
55555555 55555555 11000000 00000000 00000000 00000000 00005555 55555555 UUUUUU..................UUUUUUUU 000020
11111111 11111111 11000000 00000000 00000000 00000000 00005555 55555555 UUUUUU.......................... 000040
11111111 11111111 11000000 00000000 00000000 00000000 00001111 11111111 ................................ 000060
00000000 00000000 00000000 00000000 00000000 00000000 00001111 11111111 ................................ 000080
00000000 00000000 00000000 00000000 00000000 00000000 00000000 00000000 ................................ 0000A0
00000000 00000000 00000000 00000000 00000000 00000000 00000000 00000000 ................................ 0000C0
00000000 00000000 00000000 00000000 00000000 00000000 00000000 00000000 ................................ 0000E0
00000000 00000000 00000000 00000000 00000000 00000000 00000000 00000000 ................................ 000100
00000000 00000000 00000000 00000000 00000000 00000000 00000000 00000000 ................................ 000120
00000000 00000000 00000000 00000000 00000000 00000000 00000000 00000000 ................................ 000140
00000000 00000000 00000000 00000000 00000000 00000000 00000000 00000000 ................................ 000160
00000000 00000000 00000000 00000000 00000000 00000000 00000000 00000000 ................................ 000180
00000000 00000000 00000000 00000000 00000000 00000000 00000000 00000000 ................................ 0001A0
00000000 00000000 00000000 00000000 00000000 00000000 00000000 00000000 ................................ 0001C0
00000000 00000000 00000000 00000000 00000000 00000000 00000000 00000000 ................................ 0001E0
```

Dump of file SATURN:[PCCOMMON.DUMP.DLL]SA-DIFM.DLL;1 on 18-APR-1990 10:50:26.92
File ID (450,15,0)   End of file block 323 / Allocated 324

Virtual block number 302 (0000012E), 512 (0200) bytes

```
0300FEFF 0300FEFF 0300FEFF 0300FEFF 0300FEFF 0300FFFF 00000000 00000000 .............±...±...±...±...±.. 000000
07000080 07800680 07800780 07800780 0FC007C0 FFFDFFFF FFF8FFFF FFFDFFFF ..»...½...».â.â................. 000020
FFFDFFFF FFF8FFFF FFFDFFFF 0FC00F80 07800780 07800780 07800780 07800680 ..................â...»...½...». 000040
FFFFFFFF FFFFFFFF 0300FEFF 0300FEFF 0300FEFF 0300FEFF 0300FEFF 0300FFFF .....±...±...±...±...±.......... 000060
08000000 00000000 00888888 88888888 00000000 00000000 FFFFFFFF FFFFFFFF ................................ 000080
08000000 00000000 00111111 11111111 08000000 00000000 00888888 88888888 ................................ 0000A0
08000000 00000000 00111111 11111111 08000000 00000000 00111111 11111111 ................................ 0000C0
00000000 00000000 00000000 80000000 00000000 00000000 00888888 88888888 ................................ 0000E0
00808888 88888800 00000000 80000000 00000000 00000000 00000000 88080000 ................................ 000100
00801811 11111108 00808888 88888808 00808888 88888808 00008888 88888800 ................................ 000120
88881811 11111108 00801811 11111108 08801811 11111108 00801811 11111108 ................................ 000140
00801811 11111108 00801811 11111108 08801811 11111108 00801811 11111188 ................................ 000160
00801811 11111108 0080F8FF FFFFFF08 00801811 11111108 00801811 11111108 ...................½............ 000180
00000000 00000000 00008888 88888800 00008888 88888808 00801811 11111108 ................................ 0001A0
00000000 00000000 00000000 88080000 00000000 00000000 00000000 80000000 ................................ 0001C0
08000000 00000000 00888888 88888888 00000000 00000000 00000000 80000000 ................................ 0001E0
```

```
Dump of file SATURN:[PCCOMMON.DUMP.DLL]SA-DIFM.DLL;1 on 18-APR-1990 10:50:26.92
File ID (450,15,0)   End of file block 323 / Allocated 324

Virtual block number 303 (0000012F), 512 (0200) bytes

08000000 00000000 00111111 11111111 08000000 00000000 00888888 88888888 ................................ 000000
08000000 00000000 00111111 11111111 08000000 00000000 00111111 11111111 ................................ 000020
00000000 00000000 00000000 00000000 00000000 00000000 00888888 88888888 ................................ 000040
00000000 00000000 00000000 00000000 00000000 00000000 00000000 00000000 ................................ 000060
00000000 00000000 00000000 00000000 00000000 00000000 00000000 00000000 ................................ 000080
00000000 00000000 00000000 00000000 00000000 00000000 00000000 00000000 ................................ 0000A0
00000000 00000000 00000000 00000000 00000000 00000000 00000000 00000000 ................................ 0000C0
00000000 00000000 00000000 00000000 00000000 00000000 00000000 00000000 ................................ 0000E0
00000000 00000000 00000000 00000000 00000000 00000000 00000000 00000000 ................................ 000100
00000000 00000000 00000000 00000000 00000000 00000000 00000000 00000000 ................................ 000120
00000000 00000000 00000000 00000000 00000000 00000000 00000000 00000000 ................................ 000140
00000000 00000000 00000000 00000000 00000000 00000000 00000000 00000000 ................................ 000160
00000000 00000000 00000000 00000000 00000000 00000000 00000000 00000000 ................................ 000180
00000000 00000000 00000000 00000000 00000000 00000000 00000000 00000000 ................................ 0001A0
00000000 00000000 00000000 00000000 00000000 00000000 00000000 00000000 ................................ 0001C0
00000000 00000000 00000000 00000000 00000000 00000000 00000000 00000000 ................................ 0001E0

Dump of file SATURN:[PCCOMMON.DUMP.DLL]SA-DIFM.DLL;1 on 18-APR-1990 10:50:26.92
File ID (450,15,0)   End of file block 323 / Allocated 324

Virtual block number 304 (00000130), 512 (0200) bytes

00000000 00000000 00000000 00000000 00000000 00000000 00000000 00000000 ................................ 000000
00000000 00000000 00000000 00000000 00000000 00000000 00000000 00000000 ................................ 000020
00000000 00000000 00000000 00000000 00000000 00000000 00000000 00000000 ................................ 000040
00000000 00000000 00000000 00000000 00000000 00000000 00000000 00000000 ................................ 000060
0F000000 FCFFFFFF 0F000080 FFFFFFFF 0F000080 FFFFFFFF 00000000 00000000 ...........................■.... 000080
0F000000 FCFFFFFF 0F000000 FCFFFFFF 0F000000 FCFFFFFF 0F000000 FCFFFFFF ...■.......■.......■.......■.... 0000A0
0F000000 FCFFFFFF 0F000000 FCFFFFFF 0F000000 FCFFFFFF 0F000000 FCFFFFFF ...■.......■.......■.......■.... 0000C0
FFFFC0FF FFFFFFFF FFFFE1FF FFFFFFFF FFFFF3FF FFFFFFFF 0F000000 FCFFFFFF ...■.........µ.......Ã.......å.. 0000E0
7F0000FC 3F0000F8 FFFFF3FF FFFFFFFF FFFFF3FF FFFFFFFF FF7F80FF FFFFFFFF .............µ.......µ..½..?■... 000100
3F0000C0 3F0000C0 3F0000C0 3F0000C0 3F0000E0 3F0000C0 3F0000F8 3F0000F8 ½..7½..7å..7Å..7å..7å..7å..7å..? 000120
3F000000 000000C0 3F000040 3C0000C0 3F0000C0 3C0000C0 3F0000C0 3D0000C0 å..=å..7å..<å..7å..<@..7å......? 000140
3F0000C0 3D0000C0 3F0000C0 3C0000C0 3F000040 3C0000C0 3F000000 000000C0 å......7å..<@..7å..<å..7å..=å..? 000160
7F0000C0 3F0000C0 3F0000C0 3F0000C0 3F0000C0 3F0000C0 3F0000C0 3F0000C0 å..7å..7å..7å..7å..7å..7å..7å... 000180
FFFFF3FF FFFFFFFF FF0100E0 FF0000C0 FF0000C0 FF0000C0 FF0000C0 FF0000C0 å...å...å...å...å...Å.........µ.. 0001A0
FFFFF3FF FFFFFFFF FF7F80FF FFFFFFFF FFFFC0FF FFFFFFFF FFFFE1FF FFFFFFFF .....Ã.......å...............µ.. 0001C0
0F000000 FCFFFFFF 0F000080 FFFFFFFF 0F000080 FFFFFFFF FFFFF3FF FFFFFFFF .....µ.....................■.... 0001E0

Dump of file SATURN:[PCCOMMON.DUMP.DLL]SA-DIFM.DLL;1 on 18-APR-1990 10:50:26.92
File ID (450,15,0)   End of file block 323 / Allocated 324

Virtual block number 305 (00000131), 512 (0200) bytes

0F000000 FCFFFFFF 0F000000 FCFFFFFF 0F000000 FCFFFFFF 0F000000 FCFFFFFF ...■.......■.......■.......■.... 000000
0F000000 FCFFFFFF 0F000000 FCFFFFFF 0F000000 FCFFFFFF 0F000000 FCFFFFFF ...■.......■.......■.......■.... 000020
FFFFFFFF FFFFFFFF FFFFFFFF FFFFFFFF FFFFFFFF FFFFFFFF 0F000000 FCFFFFFF ...■............................ 000040
FFFFFFFF FFFFFFFF FFFFFFFF FFFFFFFF FFFFFFFF FFFFFFFF FFFFFFFF FFFFFFFF ................................ 000060
00000000 00000000 00000000 00000000 00000000 00000000 FFFFFFFF FFFFFFFF ................................ 000080
01010101 01010101 01010101 01010101 01010101 01010100 00000000 00000000 ................................ 0000A0
00000000 00000000 00000000 00000000 00000000 00000000 00000000 01010101 ................................ 0000C0
01010101 01010101 01010101 01010101 01010101 01010100 00000000 00000000 ................................ 0000E0
00000000 00000000 00000000 00000000 00000000 00000000 00000000 01010101 ................................ 000100
01010101 01010101 01010101 01010101 01010101 01010101 01010000 00000000 ................................ 000120
00000000 00000000 00000000 00000000 00000000 00000000 00000000 01010101 ................................ 000140
01010101 01010101 01010101 01010101 01010101 01010101 01010000 00000000 ................................ 000160
00000000 00000000 00000000 00000000 00000000 00000000 00000000 01010101 ................................ 000180
05050505 05050505 05050505 05050505 05050505 05050505 01010000 00000000 ................................ 0001A0
00000000 00000000 00000000 00000000 00000000 00000000 00000000 05050505 ................................ 0001C0
05050505 05050505 05050505 05050505 05050505 05050505 01010000 00000000 ................................ 0001E0
```

```
Dump of file SATURN:[PCCOMMON.DUMP.DLL]SA-DIFM.DLL;1 on 18-APR-1990 10:50:26.92
File ID (450,15,0)   End of file block 323 / Allocated 324

Virtual block number 306 (00000132), 512 (0200) bytes

00000000 00000000 00000000 00000000 00000000 00000000 00000000 05050505 ................................ 000000
05050505 05050505 05050505 05050505 05050505 05050505 01010000 00000000 ................................ 000020
00000000 00000000 00000000 00000000 00000000 00000000 00000000 05050505 ................................ 000040
05050505 05050505 05050505 05050505 05050505 05050505 01010000 00000000 ................................ 000060
00000000 00000000 00000000 00000000 00000000 00000000 00000000 05050505 ................................ 000080
05050505 05050505 05050505 05050505 05050505 05050505 01010000 00000000 ................................ 0000A0
00000000 00000000 00000000 00000000 00000000 00000000 00000000 05050505 ................................ 0000C0
05050505 05050505 05050505 05050505 05050505 05050505 01010000 00000000 ................................ 0000E0
00000000 00000000 00000000 00000000 00000000 00000000 00000000 05050505 ................................ 000100
01010101 01010101 01010101 01010101 01010101 01010101 01010000 00000000 ................................ 000120
00000000 00000000 00000000 00000000 00000000 00000000 00000000 01010101 ................................ 000140
01010101 01010101 01010101 01010101 01010101 01010101 01010000 00000000 ................................ 000160
00000000 00000000 00000000 00000000 00000000 00000000 00000000 01010101 ................................ 000180
00000000 00000000 00000202 00000000 00000000 00000000 00000000 00000000 ................................ 0001A0
00000000 00000000 00000000 00000000 00000000 00000000 00000000 00000000 ................................ 0001C0
00000000 00000000 00020202 02000000 00000000 00000000 00000000 00000000 ................................ 0001E0

Dump of file SATURN:[PCCOMMON.DUMP.DLL]SA-DIFM.DLL;1 on 18-APR-1990 10:50:26.92
File ID (450,15,0)   End of file block 323 / Allocated 324

Virtual block number 307 (00000133), 512 (0200) bytes

00000000 00000000 00000000 00000000 00000000 00000000 00000000 00000000 ................................ 000000
00000000 00000000 02020202 02020000 00000000 00000000 00000000 00000000 ................................ 000020
00000000 00000000 00000000 00000000 00000000 00000000 00000000 00000000 ................................ 000040
00000000 00000002 02020202 02020200 00000000 00000000 00000000 00000000 ................................ 000060
00000000 00000000 00000000 00000000 00000000 00000000 00000000 00000000 ................................ 000080
00000000 00000000 00000202 00000000 00000000 00000000 00000000 00000000 ................................ 0000A0
00000000 00000000 00000000 00000000 00000000 00000000 00000000 00000000 ................................ 0000C0
00000000 00000000 00000202 00000000 00000000 00000000 00000000 00000000 ................................ 0000E0
01010101 01010101 01010101 01010101 01010100 00000000 00000000 00000000 ................................ 000100
01010101 01010101 01010202 01010101 01010000 00000000 00000000 00000101 ................................ 000120
01010101 01010101 01010101 01010101 01010100 00000000 00000000 00000002 ................................ 000140
01010101 01010101 01010202 01010101 01010100 00000000 00000000 00000101 ................................ 000160
01010101 01010101 01010101 01010101 01010101 01010000 00000000 00000201 ................................ 000180
01010101 01010101 01010101 01010101 01010101 02000000 00000000 00000101 ................................ 0001A0
01010101 01010101 01010101 01010101 01010101 01010000 00000000 00000101 ................................ 0001C0
01010101 01010101 01010101 01010101 01010101 01020000 00000000 00000101 ................................ 0001E0

Dump of file SATURN:[PCCOMMON.DUMP.DLL]SA-DIFM.DLL;1 on 18-APR-1990 10:50:26.92
File ID (450,15,0)   End of file block 323 / Allocated 324

Virtual block number 308 (00000134), 512 (0200) bytes

01010505 05050505 05050505 05050505 05050505 01010000 00000000 00000101 ................................ 000000
01010305 05050505 05050505 05050505 05050503 01010000 00000000 00000101 ................................ 000020
01010505 05050505 05050505 05050505 05050505 01010000 00000000 00000101 ................................ 000040
01010505 05050505 05050505 05050505 05050505 01010000 00020000 00000101 ................................ 000060
01010505 05050505 05050505 05050505 05050505 01010000 00000000 00000101 ................................ 000080
01010505 05050505 05050505 05050505 05050505 01010000 02020000 00000101 ................................ 0000A0
01010505 05050505 05050505 05050505 05050505 01010000 00000000 00000101 ................................ 0000C0
01010505 05050505 05050505 05050505 05050505 01010002 02020000 00000101 ................................ 0000E0
01010505 05050505 05050505 05050505 05050505 01010000 00000000 00000101 ................................ 000100
01010505 05050505 05050505 05050505 05050505 01010202 02020202 02020202 ................................ 000120
01010505 05050505 05050505 05050505 05050505 01010000 00000000 00000101 ................................ 000140
01010505 05050505 05050505 05050505 05050505 01010202 02020202 02020202 ................................ 000160
01010505 05050505 05050505 05050505 05050505 01010000 00000000 00000101 ................................ 000180
01010505 05050505 05050505 05050505 05050505 01010002 02020000 00000101 ................................ 0001A0
01010505 05050505 05050505 05050505 05050505 01010000 00000000 00000101 ................................ 0001C0
01010505 05050505 05050505 05050505 05050505 01010000 02020000 00000101 ................................ 0001E0
```

```
Dump of file SATURN:[PCCOMMON.DUMP.DLL]SA-DIFN.DLL;1 on 18-APR-1990 10:50:26.92
File ID (450,15,0)   End of file block 323 / Allocated 324

Virtual block number 309 (00000135), 512 (0200) bytes

01010505 05050505 05050505 05050505 05050505 01010000 00000000 00000101 ................................ 000000
01010505 05050505 05050505 05050505 05050505 01010000 00020000 00000101 ................................ 000020
01010505 05050505 05050505 05050505 05050505 01010000 00000000 00000101 ................................ 000040
01010505 05050505 05050505 05050505 05050505 01010000 00000000 00000101 ................................ 000060
01010505 05050505 05050505 05050505 05050505 01010000 00000000 00000101 ................................ 000080
01010303 03030303 03030303 03030303 03030303 01010000 00000000 00000101 ................................ 0000A0
01010505 05050505 05050505 05050505 05050505 01010000 00000000 00000101 ................................ 0000C0
01010505 05050505 05050505 05050505 05050505 01010000 00000000 00000101 ................................ 0000E0
01010505 05050505 05050505 05050505 05050505 01010000 00000000 00000201 ................................ 000100
01010505 05050505 05050505 05050505 05050505 01010000 00000000 00000101 ................................ 000120
01010505 05050505 05050505 05050505 05050505 01010000 00000000 00000001 ................................ 000140
01010305 05050505 05050505 05050505 05050503 01010000 00000000 00000000 ................................ 000160
01010101 01010101 01010101 01010101 01010101 01010000 00000000 00000000 ................................ 000180
02010101 01010101 01010101 01010101 01010101 01020000 00000000 00000000 ................................ 0001A0
01010101 01010101 01010101 01010101 01010101 01010000 00000000 00000000 ................................ 0001C0
00020101 01010101 01010101 01010101 01010101 02000000 00000000 00000000 ................................ 0001E0

Dump of file SATURN:[PCCOMMON.DUMP.DLL]SA-DIFN.DLL;1 on 18-APR-1990 10:50:26.92
File ID (450,15,0)   End of file block 323 / Allocated 324

Virtual block number 310 (00000136), 512 (0200) bytes

00000000 00000000 00000000 00000000 00000000 00000000 00000000 00000000 ................................ 000000
00000000 00000000 00000202 00000000 00000000 00000000 00000000 00000000 ................................ 000020
00000000 00000000 00000000 00000000 00000000 00000000 00000000 00000000 ................................ 000040
00000000 00000000 00020202 02000000 00000000 00000000 00000000 00000000 ................................ 000060
00000000 00000000 00000000 00000000 00000000 00000000 00000000 00000000 ................................ 000080
00000000 00000000 02020202 02020000 00000000 00000000 00000000 00000000 ................................ 0000A0
00000000 00000000 00000000 00000000 00000000 00000000 00000000 00000000 ................................ 0000C0
00000000 00000002 02020202 02020200 00000000 00000000 00000000 00000000 ................................ 0000E0
00000000 00000000 00000000 00000000 00000000 00000000 00000000 00000000 ................................ 000100
00000000 00000000 00000202 00000000 00000000 00000000 00000000 00000000 ................................ 000120
00000000 00000000 00000000 00000000 00000000 00000000 00000000 00000000 ................................ 000140
00000000 00000000 00000202 00000000 00000000 00000000 00000000 00000000 ................................ 000160
00000000 00000000 00000000 00000000 00000000 00000000 00000000 00000000 ................................ 000180
01010101 01010101 01010202 01010101 01010101 01010100 00000000 00000000 ................................ 0001A0
00000000 00000000 00000000 00000000 00000000 00000000 00000000 01010101 ................................ 0001C0
01010101 01010101 01010202 01010101 01010101 01010100 00000000 00000000 ................................ 0001E0

Dump of file SATURN:[PCCOMMON.DUMP.DLL]SA-DIFN.DLL;1 on 18-APR-1990 10:50:26.92
File ID (450,15,0)   End of file block 323 / Allocated 324

Virtual block number 311 (00000137), 512 (0200) bytes

00000000 00000000 00000000 00000000 00000000 00000000 00000000 01010101 ................................ 000000
01010101 01010101 01010101 01010101 01010101 01010101 01010000 00000000 ................................ 000020
00000000 00000000 00000000 00000000 00000000 00000000 00000000 01010101 ................................ 000040
01010101 01010101 01010101 01010101 01010101 01010101 01010000 00000000 ................................ 000060
00000000 00000000 00000000 00000000 00000000 00000000 00000000 01010101 ................................ 000080
05050505 05050505 05050505 05050505 05050505 05050505 01010000 00000000 ................................ 0000A0
00000000 00000000 00000000 00000000 00000000 00000000 00000000 05050505 ................................ 0000C0
05050505 05050505 05050505 05050505 05050505 05050505 01010000 00000000 ................................ 0000E0
00000000 00000000 00000000 00000000 00000000 00000000 00000000 05050505 ................................ 000100
05050505 05050505 05050505 05050505 05050505 05050505 01010000 00000000 ................................ 000120
00000000 00000000 00000000 00000000 00000000 00000000 00000000 05050505 ................................ 000140
05050505 05050505 05050505 05050505 05050505 05050505 01010000 00000000 ................................ 000160
00000000 00000000 00000000 00000000 00000000 00000000 00000000 05050505 ................................ 000180
05050505 05050505 05050505 05050505 05050505 05050505 01010000 00000000 ................................ 0001A0
00000000 00000000 00000000 00000000 00000000 00000000 00000000 05050505 ................................ 0001C0
05050505 05050505 05050505 05050505 05050505 05050505 01010000 00000000 ................................ 0001E0
```

```
Dump of file SATURN:[PCCOMMON.DUMP.DLL]SA-DIFM.DLL;1 on 18-APR-1990 10:50:26.92
File ID (450,15,0)   End of file block 323 / Allocated 324

Virtual block number 312 (00000138), 512 (0200) bytes

00000000 00000000 00000000 00000000 00000000 00000000 00000000 05050505 ................................ 000000
01010101 01010101 01010101 01010101 01010101 01010101 01010000 00000000 ................................ 000020
00000000 00000000 00000000 00000000 00000000 00000000 00000000 01010101 ................................ 000040
01010101 01010101 01010101 01010101 01010101 01010101 01010000 00000000 ................................ 000060
00000000 00000000 00000000 00000000 00000000 00000000 00000000 01010101 ................................ 000080
00000000 00000000 00000000 00000000 00000000 00000000 00000000 00000000 ................................ 0000A0
00000000 00000000 00000000 00000000 00000000 00000000 00000000 00000000 ................................ 0000C0
00000000 00000000 00000000 00000000 00000000 00000000 00000000 00000000 ................................ 0000E0
00000000 00000000 00000000 00000000 00000000 00000000 00000000 00000000 ................................ 000100
00000000 00000000 00000000 00000000 00000000 00000000 00000000 00000000 ................................ 000120
00000000 00000000 00000000 00000000 00000000 00000000 00000000 00000000 ................................ 000140
00000000 00000000 00000000 00000000 00000000 00000000 00000000 00000000 ................................ 000160
00000000 00000000 00000000 00000000 00000000 00000000 00000000 00000000 ................................ 000180
00000000 00000000 00000000 00000000 00000000 00000000 00000000 00000000 ................................ 0001A0
00000000 00000000 00000000 00000000 00000000 00000000 00000000 00000000 ................................ 0001C0
00000000 00000000 00000000 00000000 00000000 00000000 00000000 00000000 ................................ 0001E0

Dump of file SATURN:[PCCOMMON.DUMP.DLL]SA-DIFM.DLL;1 on 18-APR-1990 10:50:26.92
File ID (450,15,0)   End of file block 323 / Allocated 324

Virtual block number 313 (00000139), 512 (0200) bytes

00000000 00000000 00000000 00000000 00000000 00000000 00000000 00000000 ................................ 000000
00000000 00000000 00000000 00000000 00000000 00000000 00000000 00000000 ................................ 000020
00000000 00000000 00000000 00000000 00000000 00000000 00000000 00000000 ................................ 000040
00000000 00000000 00000000 00000000 00000000 00000000 00000000 00000000 ................................ 000060
000C0000 00200010 00100000 01204349 00000000 00000000 00000000 00000000 ................IC.............. 000080
00000020 00000020 00000000 00000000 FFFFFF00 00000001 00010040 00200000 .. .a............................ 0000A0
F4FFFF2F F4FFFF2F F4FFFF2F ECFFFF37 1C000038 00000020 00000020 00000020 ... ... ...8...7..ś/..¶/..¶/..¶ 0000C0
04000020 F4FFFF2F F4FFFF2F F4FFFF2F F4FFFF2F F4FFFF2F F4FFFF2F F4FFFF2F /..¶/..¶/..¶/..¶/..¶/..¶/..¶ ... 0000E0
00000000 00000000 00000000 1C000038 0C000030 04000020 04000020 ... ...0...8.................. 000100
FCFFFF1F FCFFFF1F 00000000 00000000 00000000 00000000 00780000 00000000 ......x.....................■...■ 000120
00000000 00000000 00000000 00000000 00000000 FCFFFF1F FCFFFF1F FCFFFF1F ...■...■...■...................... 000140
00000000 00000000 00000000 00000000 00000000 00000000 00000000 00000000 ................................ 000160
FCFFFF3F FCFFFF3F FCFFFF3F FCFFFF3F 00000000 00000000 00000000 00000000 ................?..■?..■?. ■?..■ 000180
000C0000 00200010 00100000 01204349 00000000 00000000 FC87FF3F FCFFFF3F ?..■?..■........IC .......  .... 0001A0
FCFFFF3F FCFFFF3F 00000000 00000000 FFFFFF00 00000001 00010040 00200000 .. .a...................?..  .■ 0001C0
FCFF7F30 0C000030 0C000030 FCFFFF3F FCFFFF3F FCFFFF3F FCFFFF3F FCFFFF3F ?..■?..■?..■?..■?..■0...0...0..■ 0001E0

Dump of file SATURN:[PCCOMMON.DUMP.DLL]SA-DIFM.DLL;1 on 18-APR-1990 10:50:26.92
File ID (450,15,0)   End of file block 323 / Allocated 324

Virtual block number 314 (0000013A), 512 (0200) bytes

FCFF7F30 FCFF7F30 FCFF7F30 FCFF7F30 FCFF7F30 FCFF7F30 FCFF7F30 FCFF7F30 0..■0..■0..■0..■0..■0..■0..■0..■ 000000
FCFFFF3F FCFFFF3F FCFFFF3F FCFFFF3F FCFFFF3F FCFFFF3F 0C000030 0C000030 0...0...?..■?..■?..■?..■?..■?..■ 000020
00000000 00000000 00000000 00000000 00000000 00000000 FCFFFF3F FCFFFF3F ?..■?..■........................ 000040
00000000 00000000 00000000 00000000 00000000 00000000 00000000 00000000 ................................ 000060
00000000 00000000 00000000 00000000 00000000 00000000 00000000 00000000 ................................ 000080
0000FEFF 7F670000 0000FEFF 7F670000 00000000 00000000 00000000 00000000 ................................ 0000A0
0000FEFF 7F670000 0000FEFF 7F670000 0000FEFF 7F670000 00000000 00000000 .................g..±....g..±.. 0000C0
00000E00 00600000 0000FEFF 7F670000 0000FEFF 7F670000 0000FEFF 7F670000 ..g..±....g..±....g..±....g..±.. 0000E0
0000FEFF FF7F0000 0000FEFF FF7F0000 0000FEFF FF7F0000 00000E00 00600000 ..g..±....g..±....g..±....'..... 000100
00000000 00000000 00000000 00000000 00000000 00000000 00000000 00000000 ..'.........±.......±........±.. 000120
00000000 00000000 00000000 00000000 00000000 00000000 00000000 00000000 ................................ 000140
00000000 00000000 00000000 00000000 00000000 00000000 00000000 00000000 ................................ 000160
00000000 00000000 00000000 00000000 00000000 00000000 00000000 00000000 ................................ 000180
FFFFFFFF FFFFFFFF FFFFFFFF FFFFFFFF 00000000 00000000 00000000 00000000 ................................ 0001A0
FFFFFFFF FFFFFFFF FFFFFFFF FFFFFFFF FFFFFFFF FFFFFFFF FFFFFFFF FFFFFFFF ................................ 0001C0
                                                                        ................................ 0001E0
```

```
Dump of file SATURN:[PCCOMMON.DUMP.DLL]SA-DIFM.DLL;1 on 18-APR-1990 10:50:26.92
File ID (450,15,0)   End of file block 323 / Allocated 324

Virtual block number 315 (0000013B), 512 (0200) bytes

FFFFFFFF FFFFFFFF FFFFFFFF FFFFFFFF FFFFFFFF FFFFFFFF FFFFFFFF FFFFFFFF ................................ 000000
FFFFFFFF FFFFFFFF FFFFFFFF FFFFFFFF FFFFFFFF FFFFFFFF FFFFFFFF FFFFFFFF ................................ 000020
FFFF0000 0000FFFF FFFF0000 0000FFFF FFFFFFFF FFFFFFFF FFFFFFFF FFFFFFFF ................................ 000040
FFFF0000 0000FFFF FFFF0000 0000FFFF FFFF0000 0000FFFF FFFF0000 0000FFFF ................................ 000060
FFFF0000 0000FFFF FFFF0000 0000FFFF FFFF0000 0000FFFF FFFF0000 0000FFFF ................................ 000080
FFFF0000 0000FFFF FFFF0000 0000FFFF FFFF0000 0000FFFF FFFF0000 0000FFFF ................................ 0000A0
FFFF0000 0000FFFF FFFF0000 0000FFFF FFFF0000 0000FFFF FFFF0000 0000FFFF ................................ 0000C0
FFFF0000 0000FFFF FFFF0000 0000FFFF FFFF0000 0000FFFF FFFF0000 0000FFFF ................................ 0000E0
FFFF0000 0000FFFF FFFF0000 0000FFFF FFFF0000 0000FFFF FFFF0000 0000FFFF ................................ 000100
FFFF0000 0000FFFF FFFF0000 0000FFFF FFFF0000 0000FFFF FFFF0000 0000FFFF ................................ 000120
FFFFFFFF FFFFFFFF FFFFFFFF FFFFFFFF FFFF0000 0000FFFF FFFF0000 0000FFFF ................................ 000140
FFFFFFFF FFFFFFFF FFFFFFFF FFFFFFFF FFFFFFFF FFFFFFFF FFFFFFFF FFFFFFFF ................................ 000160
FFFFFFFF FFFFFFFF FFFFFFFF FFFFFFFF FFFFFFFF FFFFFFFF FFFFFFFF FFFFFFFF ................................ 000180
FFFFFFFF FFFFFFFF FFFFFFFF FFFFFFFF FFFFFFFF FFFFFFFF FFFFFFFF FFFFFFFF ................................ 0001A0
000C0000 00200010 00100000 01204349 FFFFFFFF FFFFFFFF FFFFFFFF FFFFFFFF ................IC ....... ..... 0001C0
1C000030 FCFFFF3F 00000000 00000000 FFFFFF00 00000001 00010040 00200000 .. .a...................?..=0... 0001E0

Dump of file SATURN:[PCCOMMON.DUMP.DLL]SA-DIFM.DLL;1 on 18-APR-1990 10:50:26.92
File ID (450,15,0)   End of file block 323 / Allocated 324

Virtual block number 316 (0000013C), 512 (0200) bytes

ECFFFF31 ECFFFF31 ECFFFF31 ECFFFF31 ECFFFF31 ECFFFF31 0C000030 1C000030 0...0...1..§1..§1..§1..§1. §1..§ 000000
ECFFFF31 ECFFFF31 ECFFFF31 ECFFFF31 ECFFFF31 ECFFFF31 ECFFFF31 ECFFFF31 1..§1..§1..§1..§1..§1..§1..§..§ 000020
FCFFFF3F 0C00003C ECFFFF30 ECFFFF31 ECFFFF31 ECFFFF31 ECFFFF31 ECFFFF31 1..§1..§1..§1..§1..§=..§<...?..= 000040
00000000 00000000 00000000 00000000 00000000 00000000 FCFFFF3F FCFFFF3F ?..=?..=........................ 000060
00000000 00000000 00000000 00000000 00000000 00000000 00000000 00000000 ................................ 000080
00000000 00000000 00000000 00000000 00000000 00000000 00000000 00000000 ................................ 0000A0
00000000 00000000 00000000 00000000 00000000 00000000 00000000 00000000 ................................ 0000C0
000C0000 00200010 00100000 01204349 00000000 00000000 00000000 00000000 ................IC ....... ..... 0000E0
FCFFFF3F FCFFFF3F 00000000 FFFFFF00 00000001 00010040 00200000 .. .a...................?..=?..= 000100
FCFFFF3F FCFFFF3F FCFFFF3F FCFFFF3F FCFFFF3F FCFFFF3F FCFFFF3F FCFFFF3F ?..=?..=?..=?..=?..=?..=?..=?..= 000120
3CFFFF3F 1CFFFF3F 0C000030 0C000030 0C000030 1CFFFF3F 3CFFFF3F 7CFFFF3F ?..|?..<?...0...0...0...?...?..< 000140
FCFFFF3F FCFFFF3F FCFFFF3F FCFFFF3F FCFFFF3F FCFFFF3F FCFFFF3F 7CFFFF3F ?..|?..=?..=?..=?..=?..=?..=?..= 000160
00000000 00000000 00000000 00000000 00000000 00000000 FCFFFF3F FCFFFF3F ?..=?..=........................ 000180
00000000 00000000 00000000 00000000 00000000 00000000 00000000 00000000 ................................ 0001A0
00000000 00000000 00000000 00000000 00000000 00000000 00000000 00000000 ................................ 0001C0
00000000 00000000 00000000 00000000 00000000 00000000 00000000 00000000 ................................ 0001E0

Dump of file SATURN:[PCCOMMON.DUMP.DLL]SA-DIFM.DLL;1 on 18-APR-1990 10:50:26.92
File ID (450,15,0)   End of file block 323 / Allocated 324

Virtual block number 317 (0000013D), 512 (0200) bytes

000C0000 00200010 00100000 01204349 00000000 00000000 00000000 00000000 ................IC ....... ..... 000000
00000000 00000000 00000000 00000000 FFFFFF00 00000001 00010040 00200000 .. .a............................ 000020
00000000 00000000 80010000 C0030000 C0030000 80010000 00000000 00000000 ..............à...à............. 000040
00000000 00000000 00000000 00000000 00000000 00000000 00000000 00000000 ................................ 000060
00000000 00000000 00008001 0000C003 0000C003 00008001 00000000 00000000 .............à...à.............. 000080
FCFFFF3F FCFFFF3F 00000000 00000000 00000000 00000000 00000000 00000000 ........................?..=?..= 0000A0
3CFC9F3F 1CF89F3F 0CF09F3F 0C00803F 0C00803F 0CF0FF3F 1CF8FF3F 3CFCFF3F ?.=<?.½.?.Þ.?...?...?.Þ.?.½.?.=< 0000C0
FCFCFF3F FCFCFF3F FC00803F FC00803F FCFF9F3F FCFF9F3F FCFF9F3F FCFF9F3F ?..=?..=?..=?..=?..=?..=?.==?.== 0000E0
FCFF3F3C FCFF1F38 FCFF0F30 FC000030 FC000030 FCFC0F30 FCFC1F38 FCFC3F3C <?==8.==0.==0..=0..=0..=8..=<?.= 000100
000C0000 00200010 00100000 01204349 00000000 00000000 FCFFFF3F FCFFFF3F ?..=?..=........IC ....... ..... 000120
00000000 00000000 00000000 00000000 FFFFFF00 00000001 00010040 00200000 .. .a............................ 000140
00000000 00000000 00000000 00000000 00000000 00000000 00000000 00000000 ................................ 000160
00000000 00000000 00000000 00000000 00000000 00000000 00000000 00000000 ................................ 000180
00000000 00000000 00000000 00000000 00000000 00000000 00000000 00000000 ................................ 0001A0
FCFFFF3F FCFFFF3F 00000000 00000000 00000000 00000000 00000000 00000000 ........................?..=?..= 0001C0
0404E427 0C0EE427 FCFFFF3F FCFFFF3F FCFFFF3F FCFFFF3F FCFFFF3F FCFFFF3F ?..=?..=?..=?..=?..=?..='ð..'ð.. 0001E0
```

```
Dump of file SATURN:[PCCOMMON.DUMP.DLL]SA-DIFM.DLL;1 on 18-APR-1990 10:50:26.92
File ID (450,15,0)   End of file block 323 / Allocated 324

Virtual block number 318 (0000013E), 512 (0200) bytes

E4E43C3C FCE41C38 FC049C39 FC0C8C31 FCE40C30 FCE40C30 E4E4C423 E4E4C423 #ôô#ôôô.ô•0.ô•1..•9..•8.ô•<<ôô 000000
FCFFFF3F FCFFFF3F FCFFFF3F FCFFFF3F FCFFFF3F 0C0E7C3E 04047C3E E4E43C3C <<ôô>|..>|..?..•?..•?..•?..•?..• 000020
00000000 00110001 00040352 00000107 00000000 00000000 FCFFFF3F FCFFFF3F ?..•?..•............R........... 000040
76697469 6D697270 20657461 65724302 A4000000 01000800 04035200 0000F600 .-...R.........Ê.Create primitiv 000060
74616D72 6F666E69 20657461 65724302 A5000000 01007373 65636F72 707E2065 e -process.....Ê.Create informat 000080
7E2F6563 72756F73 20657461 65724302 A6000000 01006572 6F74737E 206E6F69 ion -store.....Î.Create source/- 0000A0
62207478 65747E20 65746165 724302AA 00000001 006E6F69 74616E69 74736564 destination.....`.Create -text b 0000C0
FF400000 04002E2E 2E20646E 69467E01 B0000000 01FFFF40 00000400 68636F6C lock....a......§.-Find .......a. 0000E0
206D726F 66736E61 72547E02 1A000000 01006E67 69736544 7E021900 000001FF .......-Design.......-Transform  000100
20776F68 537E02AB 00000001 00726562 6D756E65 527E02A3 00000001 002E2E2E ........Ê.-Renumber.....¨.-Show  000120
00000000 00000000 00006465 646F6C70 78652073 65737365 636F7270 206C6C61 all processes exploded.......... 000140
FD000000 01000600 04035200 0001D000 00000000 00110001 00040352 000001E1 Ã...R............Ã...R.........» 000160
6F727E20 6E69206E 67696C41 01F30000 00010077 6F6C667E 20657461 65724302 .Create -flow.....µ.Align in -ro 000180
7E01F500 00000100 6E6D756C 6F637E20 6E69206E 67696C41 01F40000 00010077 w.....¶.Align in -column.....¥.- 0001A0
726F6673 6E617254 7E021A00 00000100 657A6973 20657A69 64726164 6E617453 Standardize size.......-Transfor 0001C0
00000011 00030004 03520000 014F006C 6562614C 00000000 0011002E 2E2E2060 m ..........Label.O...R......... 0001E0

Dump of file SATURN:[PCCOMMON.DUMP.DLL]SA-DIFM.DLL;1 on 18-APR-1990 10:50:26.92
File ID (450,15,0)   End of file block 323 / Allocated 324

Virtual block number 319 (0000013F), 512 (0200) bytes

65487E01 CF000000 01000300 04035200 00003000 65636166 20657079 547E01CD ë.-Type face.=...R.........ü.-He 000000
CE000000 01006E61 6D6F7220 73656D69 547E01D0 00000001 00616369 7465766C lvetica.....Å.-Times roman.....ö 000020
04000403 52000000 4300656C 7974537E 01D10000 00110072 65697275 6F437E01 .-Courier.....Ï.-Style.C...R.... 000040
D4000000 0100646C 6F427E01 D3000000 01006C61 6D726F4E 7E01D200 00000100 .....●.-Normal.....Æ.-Bold.....å 000060
01D60000 00110074 756F656B 69727453 7E01D500 00000100 63696C61 74497E01 .-Italic.....í.-Strikeout.....ø. 000080
7E01D700 00000100 09000403 52000000 92006E6F 69746163 69666974 73754A7E -Justification.....R.........•.- 0000A0
00746867 69527E01 D9000000 01007466 654C7E01 D8000000 01007265 746E6543 Center.....Ä.-Left.....Ì.-Right. 0000C0
4C01DD00 00000100 6D6F7474 6F427E01 DB000000 0100706F 547E01DA 00000001 ....Ö.-Top.....Ü.-Bottom.....Ÿ.L 0000E0
00000001 006D6F74 746F6220 74667E65 4C01DC00 00000100 706F7420 7466657E -eft top.....É.Le-ft bottom..... 000100
6D6F7474 6F622074 68677E69 5201DE00 00000100 706F7420 74686769 7E5201DF Ô.R-ight top.....ß.Ri-ght bottom 000120
00000000 00110001 00040352 000001E1 00000000 00000000 00000000 00000000 ...............Ã...R........... 000140
00010077 6F6C667E 20657461 65724302 F3000000 01000600 04035200 0001D000 .Ã...R.........µ.Create -flow... 000160
6E69206E 67696C41 01F40000 00010077 6F727E20 6E69206E 67696C41 01F30000 ..µ.Align in -row.....¶.Align in 000180
657A6973 20657A69 64726164 6E617453 7E01F500 00000100 6E6D756C 6F637E20  -column.....¥.-Standardize size 0001A0
6562614C 00000000 0011002E 2E2E2060 726F6673 6E617254 7E021A00 00000100 .......-Transform .........Labe 0001C0
00003D00 65636166 20657079 547E01CD 00000011 00030004 03520000 014F006C l.O...R.........ë.-Type face.=.. 0001E0

Dump of file SATURN:[PCCOMMON.DUMP.DLL]SA-DIFM.DLL;1 on 18-APR-1990 10:50:26.92
File ID (450,15,0)   End of file block 323 / Allocated 324

Virtual block number 320 (00000140), 512 (0200) bytes

547E01D0 00000001 00616369 7465766C 65487E01 CF000000 01000300 04035200 .R.........Ü.-Helvetica.....Å.-T 000000
01D10000 00110072 65697275 6F437E01 CE000000 01006E61 6D6F7220 73656D69 imes roman.....ö.-Courier.....Ï. 000020
01006C61 6D726F4E 7E01D200 00000100 04000403 52000000 4300656C 7974537E -Style.C...R.........●.-Normal.. 000040
7E01D500 00000100 63696C61 74497E01 D4000000 0100646C 6F427E01 D3000000 ...Æ.-Bold.....å.-Italic.....í.- 000060
92006E6F 69746163 69666974 73754A7E 01D60000 00110074 756F656B 69727453 Strikeout.....ø.-Justification.. 000080
654C7E01 D8000000 01007265 746E6543 7E01D700 00000100 09000403 52000000 ...R.........•.-Center.....Ä.-Le 0000A0
D8000000 0100706F 547E01DA 00000001 00746867 69527E01 D9000000 01007466 ft.....Ì.-Right.....Ö.-Top.....Ü 0000C0
4C01DC00 00000100 706F7420 7466657E 4C01DD00 00000100 6D6F7474 6F427E01 .-Bottom.....Ÿ.L-eft top.....É.L 0000E0
00000100 706F7420 74686769 7E5201DF 00000001 006D6F74 746F6220 74667E65 e-ft bottom.....Ô.R-ight top.... 000100
00000000 00000000 00000000 00000000 6D6F7474 6F622074 68677E69 5201DE00 .ß.Ri-ght bottom............... 000120
F1000000 01000900 04035200 0001E700 00000000 00110001 00040352 000001F8 ¾...R............Ó...R.........þ 000140
0100776F 6C667E20 65746165 72430289 00000001 FFFF4000 0004004C 44507E01 .-PDL....a......¿.Create -flow.. 000160
69206E67 696C4101 F4000000 0100776F 727E206E 69206E67 696C4101 F3000000 ...µ.Align in -row.....¶.Align i 000180
7A697320 657A6964 7261646E 6174537E 01F50000 0001006E 6D756C6F 637E206E n -column.....¥.-Standardize siz 0001A0
00001100 2E2E2E20 6D726F66 736E6172 547E021A 00000001 FFFF4000 00040065 e....a........-Transform ....... 0001C0
66206570 79547E01 CD000000 11000300 04035200 00014F00 6C656261 4C000000 ...Label.O...R.........ë.-Type f 0001E0
```

```
Dump of file SATURN:[PCCOMMON.DUMP.DLL]SA-DIFM.DLL;1 on 18-APR-1990 10:50:26.92
File ID (450,15,0)   End of file block 323 / Allocated 324

Virtual block number 321 (00000141), 512 (0200) bytes

 01006163 69746576 6C65487E 01CF0000 00010003 00040352 0000003D 00656361 ace.=...R.........Ü.-Helvetica.. 000000
 72656972 756F437E 01CE0000 0001006E 616D6F72 2073656D 69547E01 D0000000 ...Å.-Times roman.....ö.-Courier 000020
 4E7E01D2 00000001 00040004 03520000 00430065 6C797453 7E01D100 00001100 .....Ì.-Style.C...R.........Ø.-N 000040
 0063696C 6174497E 01D40000 00010064 6C6F427E 01D30000 0001006C 616D726F ormal.....Æ.-Bold.....å.-Italic. 000060
 63696669 7473754A 7E01D600 00001100 74756F65 6B697274 537E01D5 00000001 ....Í.-Strikeout.....ø.-Justific 000080
 00010072 65746E65 437E01D7 00000001 00090004 03520000 0092006E 6F697461 ation.....R.........■.-Center... 0000A0
 6F547E01 DA000000 01007468 6769527E 01D90000 00010074 66654C7E 01D80000 ..Å.-Left.....Ì.-Right.....Ö.-To 0000C0
 00706F74 20746665 7E4C01DD 00000001 00606F74 746F427E 01DB0000 00010070 p.....Ü.-Bottom.....Ì.L-eft top. 0000E0
 20746867 697E5201 DF000000 0100606F 74746F62 2074667E 654C01DC 00000001 ....É.Le-ft bottom.....Ô.R-ight  000100
 00000000 00000000 00606F74 746F6220 7468677E 695201DE 00000001 00706F74 top.....ß.Ri-ght bottom......... 000120
 F3000000 01000500 04035200 0001BD00 00000000 00110001 00040352 000001CE ö...R............§...R.........µ 000140
 637E206E 69206E67 696C4101 F4000000 0100776F 727E206E 69206E67 696C4101 .Align in ~row.....¶.Align in ~c 000160
 00010065 7A697320 657A6964 7261646E 6174537E 01F50000 0001006E 6D756C6F olumn.....%.-Standardize size... 000180
 4F006C65 62614C00 00000000 11002E2E 2E206D72 6F66736E 6172547E 021A0000 ....-Transform ..........Label.O 0001A0
 03520000 003D0065 63616620 65707954 7E01CD00 00001100 03000403 52000001 ...R..........ë.-Type face.=...R. 0001C0
 656D6954 7E01D000 00000100 61636974 65766C65 487E01CF 00000001 00030004 ........Ü.-Helvetica.....Å.-Time 0001E0

Dump of file SATURN:[PCCOMMON.DUMP.DLL]SA-DIFM.DLL;1 on 18-APR-1990 10:50:26.92
File ID (450,15,0)   End of file block 323 / Allocated 324

Virtual block number 322 (00000142), 512 (0200) bytes

 74537E01 D1000000 11007265 6972756F 437E01CE 00000001 006E616D 6F722073 s roman.....ö.-Courier.....Ì.-St 000000
 00000001 006C6160 726F4E7E 01D20000 00010004 00040352 00000043 00656C79 yle.C...R.........Ø.-Normal..... 000020
 7274537E 01D50000 00010063 696C6174 497E01D4 00000001 00646C6F 427E01D3 Æ.-Bold.....å.-Italic.....Í.-Str 000040
 00000092 006E6F69 74616369 66697473 754A7E01 D6000000 11007475 6F656869 ikeout.....ø.-Justification..... 000060
 00746665 4C7E01D8 00000001 00726574 6E65437E 01D70000 00010009 00040352 R.........■.-Center.....Å.-Left. 000080
 427E01DB 00000001 00706F54 7E01DA00 00000100 74686769 527E01D9 00000001 ....Ì.-Right.....Ö.-Top.....Ü.-B 0000A0
 667E654C 01DC0000 00010070 6F742074 66657E4C 01DD0000 0001006D 6F74746F ottom.....Ì.L-eft top.....É.Le-f 0000C0
 01DE0000 00010070 6F742074 6867697E 5201DF00 00000100 606F7474 6F622074 t bottom.....Ô.R-ight top.....ß. 0000E0
 00000000 00110001 00040352 00000059 00000060 6F74746F 62207468 677E6952 Ri-ght bottom...Y...R........... 000100
 6574756F 72657220 6C61756E 614D7E02 E2000000 01000300 04035200 00004800 .H...R.........â.-Manual reroute 000120
 736E6172 54021A00 00000100 6574756F 72657220 6F747541 7E02E300 00000100 .....D.-Auto reroute.......Trans 000140
 00000000 00110001 00040352 00000049 00000000 00000000 2E2E2E20 60726F66 form ...........I...R........... 000160
 6C6C6120 6563616C 70206F74 75417E03 2E000000 01000200 04035200 00003800 .8...R............-Auto place all 000180
 00000000 00000000 6C6C6120 6563616C 70206C61 756E614D 7E032C00 00000100 ......,.-Manual place all........ 0001A0
 CD000000 11000300 04035200 000014F00 00000000 00110001 00040352 00000160 '...R...........O...R.........ë 0001C0
 6C65487E 01CF0000 00010003 00040352 00000030 00656361 66206570 79547E01 .-Type face.=...R.........Ü.-Hel 0001E0

Dump of file SATURN:[PCCOMMON.DUMP.DLL]SA-DIFM.DLL;1 on 18-APR-1990 10:50:26.92
File ID (450,15,0)   End of file block 323 / Allocated 324

Virtual block number 323 (00000143), 512 (0200) bytes

 01CE0000 0001006E 616D6F72 2073656D 69547E01 D0000000 01006163 69746576 vetica.....Å.-Times roman.....ö. 000000
 00040004 03520000 00430065 6C797453 7E01D100 00001100 72656972 756F437E -Courier.....Ì.-Style.C...R..... 000020
 01D40000 00010064 6C6F427E 01D30000 0001006C 6160726F 4E7E01D2 00000001 ....Ø.-Normal.....Æ.-Bold.....å. 000040
 7E01D600 00001100 74756F65 6B697274 537E01D5 00000001 0063696C 6174497E -Italic.....Í.-Strikeout.....ø.- 000060
 437E01D7 00000001 00090004 03520000 0092006E 6F697461 63696669 7473754A Justification.....R.........■.-C 000080
 01007468 6769527E 01D90000 00010074 66654C7E 01D80000 00010072 65746E65 enter.....Å.-Left.....Ì.-Right.. 0000A0
 7E4C01DD 00000001 00606F74 746F427E 01DB0000 00010070 6F547E01 DA000000 ..Ö.-Top.....Ü.-Bottom.....Ì.L- 0000C0
 DF000000 0100606F 74746F62 2074667E 654C01DC 00000001 00706F74 20746665 eft top.....É.Le-ft bottom.....Ô 0000E0
 006D6F74 746F6220 7468677E 695201DE 00000001 00706F74 20746867 697E5201 .R-ight top.....ß.Ri-ght bottom. 000100
 00000000 00000000 00000000 00000000 00000000 00000000 00000000 00000000 ................................ 000120
 00000000 00000000 00000000 00000000 00000000 00000000 00000000 00000000 ................................ 000140
 00000000 00000000 00000000 00000000 00000000 00000000 00000000 00000000 ................................ 000160
 00000000 00000000 00000000 00000000 00000000 00000000 00000000 00000000 ................................ 000180
 00000000 00000000 00000000 00000000 00000000 00000000 00000000 00000000 ................................ 0001A0
 00000000 00000000 00000000 00000000 00000000 00000000 00000000 00000000 ................................ 0001C0
 00000000 00000000 00000000 00000000 00000000 00000000 00000000 00000000 ................................ 0001E0
```

Dump of file SATURN:[PCCOMMON.DUMP.DLL]SA-XFORM.DLL;1 on 18-APR-1990 10:51:47.49
File ID (443,15,0)   End of file block 48 / Allocated 48

Virtual block number 1 (00000001), 512 (0200) bytes

```
00000000 00000040 00000000 000000B8 0000FFFF 00000004 0000002E 01345A4D MZ4.............|.......a....... 000000
00000080 00000000 00000000 00000000 00000000 00000000 00000000 00000000 ................................ 000020
6F6E6E61 63206061 72676F72 70207369 685421CD 4C01B821 CD09B400 0EBA1F0E ..¤..Ç.ë|¡.LêIThis program canno 000040
00000000 00000024 0A0D0D2E 65646F6D 20534F44 206E6920 6E757220 65622074 t be run in DOS mode....$....... 000060
000C0000 00000000 00010000 00000000 000A8009 E2457621 00250300 0505454E NE..Å.X.!vEã.................... 000080
00000000 00000000 00010003 00040000 00000475 0145012D 008400A8 0040002B +.a.´.Ç.-.E.u................... 0000A0
024E0F00 024D00AD 038C0F00 03B80067 01580F00 0157004C 000F0F00 000F004A J.......L.W...X.g.E...¥.Ù.M...N. 0000C0
19040F00 1904027A 053C0F00 053B021C 080A0F00 080A0190 0A8A0F00 0A89000B Ù.................;...<.z....... 0000E0
01B41EB1 01B405BF 00831EB1 008305B6 1BC00F21 1A2A0411 02020E21 00000000 ....!.....*.!.à.Ñ...Ý...¢.Ç.Ý.Ç. 000100
0E00004D 524F4658 2D415308 02000004 01000004 00110005 01081EB1 010805DB Ù...Ý.................SA-XFORM... 000120
10000345 4355444F 52504552 5841530C 0002434F 5250474C 44454D41 4E524150 PARNAMEDLGPROC...SAXREPRODUCE... 000140
52455649 52444D52 4F465841 530D0004 574F4C46 5443454E 4E4F4345 52584153 SAXRECONNECTFLOW...SAXFORMDRIVER 000160
45434F52 50454B41 4D584153 16000643 4F525047 4C444D52 4F465841 530E0005 ...SAXFORMDLGPROC...SAXMAKEPROCE 000180
2B021001 FB01CC01 3A012600 2E002500 1F000100 00075952 41444E55 4F425353 SSBOUNDARY.......%...&.:.ä.«...+ 0001A0
52435245 54464157 4F4C464F 464E494C 4D44166C 6D646066 69060002 7E026302 .c.–...ifmdml.DMLINFOFLOWAFTERCR 0001C0
49555143 414C4D44 006C6D64 03534C4C 4143534F 44084E49 574D5005 45544145 EATE.PMWIN.DOSCALLS.dml.DMLACQUI 0001E0
```

Dump of file SATURN:[PCCOMMON.DUMP.DLL]SA-XFORM.DLL;1 on 18-APR-1990 10:51:47.49
File ID (443,15,0)   End of file block 48 / Allocated 48

Virtual block number 2 (00000002), 512 (0200) bytes

```
4C4D440C 4E585450 4F54534C 4D440A4E 58545452 4154534C 4D440B4D 54484552 REHTM.DMLSTARTTXN.DMLSTOPTXN.DML 000000
49465952 4555514C 4D440049 54475952 4555514C 4D440B4C 45444F4D 45455246 FREEMODEL.DMLQUERYGTI.DMLQUERYFI 000020
514C4D44 0C4E4C52 59524555 514C4D44 0B444C45 49465445 534C4D44 0B444C45 ELD.DMLSETFIELD.DMLQUERYRLN.DMLQ 000040
5453494C 45455246 4C4D440B 4554414C 45524E55 4C4D440B 314E4C52 59524555 UERYRLN1.DMLUNRELATE.DMLFREELIST 000060
504F5453 4C4D4412 4554454C 45444C4D 44094449 4C4D4459 52455551 4C4D440D .DMLQUERYDMLID.DMLDELETE.DMLSTOP 000080
53494C54 43454C45 534C4C41 59524555 514C4D44 154B4341 424C4C4F 524E5854 TXNROLLBACK.DMLQUERYALLSELECTLIS 0000A0
55454C50 4D49534C 4D441554 4F4C5345 54414C45 52454C50 4D49534C 4D441354 T.DMLSIMPLERELATESLOT.DMLSIMPLEU 0000C0
03574F44 4E495752 45544E45 434C5455 0F4C5455 03544F4C 53455441 4C45524E NRELATESLOT.UTL.UTLCENTERWINDOW. 0000E0
470A434F 52504C4F 4F544645 44495447 0E4C4F4F 544C4C49 4B495447 0B495447 GTI.GTIKILLTOOL.GTIDEFTOOLPROC.G 000100
4F4F5459 52455551 49544712 47534D44 4E455349 54470A47 534D5453 4F504954 TIPOSTMSG.GTISENDMSG.GTIQUERYTOO 000120
55514954 47124C4F 4F54574F 444E4957 59524555 51495447 12574F44 4E49574C LWINDOW.GTIQUERYWINDOWTOOL.GTIQU 000140
47125254 50415441 44585541 54455349 54471052 54504154 41445855 41595245 ERYAUXDATAPTR.GTISETAUXDATAPTR.G 000160
48455441 4552434D 454D004D 454D0354 4E455241 504C4F4F 54595245 55514954 TIQUERYTOOLPARENT.MEM.MEMCREATEH 000180
4B434F4C 42434F4C 4C414D45 4D005041 4548594F 52545345 444D454D 0E504145 EAP.MEMDESTROYHEAP.MEMALLOCBLOCK 0001A0
53114547 52454D2D 41530852 4F525245 53534543 4F52504D 41535F10 4D415303 .SAM._SAMPROCESSERROR.SA-MERGE.S 0001C0
4E455348 54454D5F 0C444F48 54454D06 53544345 4A424F4F 57544547 52454D41 AMERGĒTWOOBJECTS.METHOD._METHSEN 0001E0
```

Dump of file SATURN:[PCCOMMON.DUMP.DLL]SA-XFORM.DLL;1 on 18-APR-1990 10:51:47.49
File ID (443,15,0)   End of file block 48 / Allocated 48

Virtual block number 3 (00000003), 512 (0200) bytes

```
534E4945 44485445 4D5F1245 54414954 4E415453 4E494854 454D5F10 47534D44 DMSG._METHINSTANTIATE._METHDEINS 000000
444E4550 5041454D 414E5455 4C414E41 1354554C 414E4106 45544149 544E4154 TANTIĀTE.ANALUT.ANALUTÑAMEAPPEND 000020
01000003 0501010F 03030100 DC030401 45544952 57534F44 084F4953 034D554E NUM.SIO.DOSWRITE...É....Ô....... 000040
4153204D 5020322F 534F1500 00000003 07010000 03030100 00030201 00000306 ......................OS/2 PM SA 000060
00000143 4F52504C 4F4F544D 524F4658 41530F00 00736072 6F66736E 61725420  Transforms...SAXFORMTOOLPROC... 000080
00000000 00000000 00000900 02000200 01CB0001 B81F0200 3E89088E FFFFB81E .|...Ä.>...|..ù................. 0000A0
46890000 FFFF9A50 16FC468D 0876FF00 00FA46C7 DB8EFFFF B81E5657 000006C8 à...WV.¡...ÄúF*...v..F=.P. ....F 0000C0
8B505200 0205FE56 8BFC468B 0876FF01 6A0122E9 FA468B00 06E90375 00003DFA *=..u.Õ...F*Õ".j..v..F=.V±.  RP. 0000E0
00F1E9FA 46880006 E9037500 0030FA46 890000FF FF9A5052 002D05FE 568BFC46 F=.V±.-.RP......F*=..u.Õ...F·ʋb. 000100
06E90375 00003DFA 46890000 FFFF9A2D 77FF262F 77FF26FC 5EC40096 E906468B .F.Õ..á^=&.w/&.w-.......F*=..u.Õ. 000120
00003DFA 4689FFFF 00009A2D 77FF262F 77FF26FC 5EC40095 E900CAE9 FA468B00 ..F*Õò.Õ..á^=&.w/&.w-.......F*=.. 000140
4689FFFF 00009A2D 77FF262F 77FF26FC 5EC40071 E900A6E9 FA468B00 06E90375 u.Õ...F*Õĺ.Õg.á^=&.w/&.w-.......F 000160
00009A2D 77FF262F 77FF26FC 5EC4004D E90082E9 FA468B00 06E90375 00003DFA *=..u.Õ...F*Õ..ÕM.á^=&.w/&.w-... 000180
7501023D 0023E900 26E90029 E9005EE9 FA468800 06E90375 00003DFA 4689FFFF ...F*=..u.Õ...F*Õ^.Õ).Õ&.Õ#.=..u 0001A0
C4FFD7E9 FFB6E903 7501053D FF52E903 7501043D FF7EE903 7501033D FFAAE903 .Õ^.=..u.Õ-.=..u.ÕR.=..u.ÕÑ.Õ■.á 0001C0
0876FF2D 4789262F 47892600 008BFC5E C40000FF FF9A2D77 FF262F77 FF26FC5E ^=&.w/&.w-.....á^=¡..&.G/&.G-.v. 0001E0
```

Dump of file SATURN:[PCCOMMON.DUMP.DLL]SA-XFORM.DLL;1 on 18-APR-1990 10:51:47.49
File ID (443,15,0)   End of file block 48 / Allocated 48

Virtual block number 4 (00000004), 512 (0200) bytes

```
 00000500 BC000200 0904CAC9 5F5E1F00 00E9FA46 8B0000FF FF9AFC76 FFFE76FF .v±.v•......F*Õ...^_èò.....¥.... 000000
 95000600 1A020300 00000A00 08000200 00000700 98000200 00000600 E0000200 ...Å............................ 000020
 57000401 28020302 19000900 72020301 A8000601 47020300 32000400 4B020301 ...K...2...G...´...r.......+...W 000040
 E90E468B D88EFFFF 8B1E5657 00000AC8 00000000 00000000 00000000 00000000 ................à...WV.|...Ä.F.Õ 000060
 6A006A01 6A006A01 25680102 681076FF 1276FF00 00FFFF9A 1076FF12 76FF0192 ...v..v.......v..v.h..h%.j.j.j.j 000080
 1076FF12 76FF0102 07C726F8 5EC4FA56 89F84689 08568B06 468B0000 FFFF9A00 .......F..V..F½.V*á^½&ú....v..v. 0000A0
 0000140D 9A5016FC 468D1076 FF1276FF 016FE900 00FFFF9A 0676FF08 76FF006A j..v..v......Õo..v..v..F•.P.M... 0000C0
 9A0A76FF 0C76FF50 5299FC46 8B1DAE68 FE76FF00 00FFFF9A 5016FE46 8DFC76FF .v•.F±.P......v±hÛ..F•.RP.v..v.. 0000E0
 27E90000 019A9A06 76FF0876 FF0A76FF 0C76FF0E 76FF1076 FF1276FF 0000FFFF .....v..v..v..v..v..v..v......Õ' 000100
 FB5EC4FA 5689F846 890000FF FF9A006A 1076FF12 76FF0025 E90C468B 011BE901 .Õ...F.Õ%..v..v.j.......F½.V*á^½ 000120
 0A468B00 E2E9FFEF E9FFD3E9 03750001 3D000BE9 000EE900 11E907B9 260A468B .F.&..Õ..Õ..Õ..=..u.Õ£.Õÿ.Õã..F. 000140
 FF1276FF F84689FA 46890000 B80038E9 00000115 9A006A10 76FF1276 FF0038E9 Õ8..v..v.j......Õ;.|...F*.F½.v.. 000160
 03750001 3D0013E9 0016E900 19E900B6 E90000BA 0000B800 00FFFF9A 016A1076 v.j......|..¤..ÕÑ.Õ..Õ..Õ..=..u. 000180
 00FFFF9A 5016FC46 8D1076FF 1276FF00 8EE9FFE7 E9FFC8E9 03750002 3DFFC0E9 Õã.=..u.Õà.ÕÕ.Õ...v..v..F•.P.... 0001A0
 76FF000A E9037500 F67E8300 00FFFF9A 006A006A 5016F646 8D1D8068 FC76FF00 ..v•h¯..F~.Pj.j.......~~.u.Õ...v 0001C0
 0C76FF0E 76FF1076 FF1276FF 004BE900 57E90000 BA0000B8 0000FFFF 9A006AFC •j......|..¤..ÕW.ÕK..v..v..v..v. 0001E0
```

Dump of file SATURN:[PCCOMMON.DUMP.DLL]SA-XFORM.DLL;1 on 18-APR-1990 10:51:47.49
File ID (443,15,0)   End of file block 48 / Allocated 48

Virtual block number 5 (00000005), 512 (0200) bytes

```
 75002030 FEB4E903 7500003D 002BE900 37E90000 FFFF9A06 76FF0876 FF0A76FF .v..v..v......Õ7.Õ+.=..u.ÕÇ±= .u 000000
 B8FFB5E9 FE46E903 7500383D FEF0E903 7500303D FF85E903 7500293D FF39E903 .Õ9.=).u.Õ..=0.u.Õþ±=;.u.ÕF±Õç.| 000020
 A0E90E46 8BD88E00 08881E56 570000A4 C8000ECA C95F5E1F 0000E900 008A0000 ..¤..Õ...^_èò..àÈ..WV.|...Ä.F.Õ. 000040
 FF000000 199A1076 FF1276FF 00000059 9A0676FF 0876FF00 6A1076FF 1276FF01 ..v..v.j..v̄..v..Y....v..v....... 000060
 006A1076 FF1276FF 00000032 9A006A00 6A4B6A00 6A014368 02026810 76FF1276 v..v.h..hC.j.jKj.j..2....v..v.j. 000080
 09026802 0036FF26 193E068E 006A006A 016CE9FF 609689FF 5E868900 0000C39A .û.....^...`.Õl.j.j...>.&.6..h.. 0000A0
 6A006A50 16FF6286 8D1076FF 1276FF01 6A006A00 00FFFF9A 5016FF62 868D506A jP..b..P.....j.j..v..v...b..Pj.j 0000C0
 00000231 9A006A10 76FF1276 FF00D8E9 0A468B01 2FE90000 FFFF9A20 6A006A00 .j.j .....Õ/..F.ÕÄ..v..v.j..1... 0000E0
 1276FF00 00FFFF9A 50168446 8D4C6A02 02681076 FF1276FF FF609689 FF5E8689 ..^...`..v..v.h..jL.FÇ.P......v. 000100
 00FFFF9A 02026810 76FF1276 FF016A00 6A0000FF FF9A0042 681E0202 681076FF .v.h...hB......j.j..v..v.h...... 000120
 26FF5E9E C40477FF 260677FF 26FF5E9E C4501684 468D006A 0000FFFF 9A505200 .RP.....j..FÇ.Pá.^.&.w.&.w.á.^.& 000140
 8916C483 0000FFFF 9A006A57 6A505200 0805FF60 9688FF5E 868B37FF 260277FF .w.&.7..^...`....RPjWj.......á.. 000160
 830000FF FF9A1076 FF1276FF FF5CB6FF 50168446 8D001AE9 03750000 3DFF5C86 .\.=..u.Õ...FÇ.P.Ñ\..v..v....... 000180
 00FC9A02 6A1076FF 1276FF00 29E90000 034E9A01 6A1076FF 1276FF00 0DE90AC4 á.Õ...v..v.j..N...Õ)..v..v.j..•. 0001A0
 3BE9FFE7 E9FFDAE9 03750002 3DFF20E9 03750001 3D0013E9 0016E900 19E90000 ..Õ..Õ..Õ..=..u.Õ .=..u.ÕÕ.ÕÕ.Õ; 0001C0
 1BE90027 E9000000 AA9A0676 FF0876FF 0A76FF0C 76FF0E76 FF1076FF 1276FF00 ..v..v..v..v..v..v..v..´...Õ'.Õ. 0001E0
```

Dump of file SATURN:[PCCOMMON.DUMP.DLL]SA-XFORM.DLL;1 on 18-APR-1990 10:51:47.49
File ID (443,15,0)   End of file block 48 / Allocated 48

Virtual block number 6 (00000006), 512 (0200) bytes

```
 8A000088 FFC5E9FE 48E90375 003B3DFE 9FE90375 00223DFE E4E90375 00203000 .= .u.ÕÕ±=".u.Õ.±=;.u.ÕH±Õé.|..¤ 000000
 24010300 7E000203 3E010301 59000600 90020300 140ECAC9 5F5E1F00 00E90000 ..Õ...^_èò.........Y...>...~...$ 000020
 A9010300 86000202 8B010301 64000601 61020302 3F000A03 08020300 7F000202 ...........?...a...d...£.......` 000040
 59010300 00000A01 E7000200 13000202 CD010300 88000202 76010300 87000202 .......v.......ë.......Ô.......Y 000060
 2B020301 82000600 6C020300 1F000202 8C010300 1E000202 00010300 90000202 .......................l.......+ 000080
 79020300 4D000202 D4010301 2A000502 08020300 83000203 87010301 FF000803 ...........•.......•...å...M...y 0000A0
 89000088 D88EFFFF 8B1E5657 00000CC8 00000001 3E000601 74020301 B9000600 ...¿...t...>....à...WV.|...Ä|... 0000C0
 E9F4468B 0006E903 75000030 F4468900 00FFFF9A 5016FA46 8D006AF6 4689F846 F½.F~j..F*.P......F¶=..u.Õ...F¶Õ 0000E0
 76FF000E E9037500 003DF446 890000FF FF9A5016 FC468D31 6A5E6AFA 76FF00A3 È..v*j^j1.F•.P......F¶=..u.Õ...v 000100
 FC468BFC 77FF26FE 77FF2606 5EC40406 4683216A 0079E9F4 46880000 FFFF9AFA *......F¶Õy.j!.F..á^.&.w±&.w•.F• 000120
 26000088 FC5EC407 8926FA46 8BFC5EC4 0AC483FF FF00709A 50520002 05FE568B .V±...RP.p....á.á^•.F*&..á^•|..& 000140
 77FF26FC 5EC40000 FFFF9A50 52002305 FE568BFC 46880A76 FF204789 262F4789 .G/&.G-.v..F•.V±.#.RP.....á^•&.W 000160
 B80000FF FF9AFC76 FFFE76FF 0A76FF00 00FFFF9A 50520025 05FE568B FC468B23 #.F•.V±.%.RP......v..v±.v•.....| 000180
 76FF0125 E90E468B D88E0008 8B1E5657 00000CC8 0006CAC9 5F5E1F00 00E90000 ..Õ...^_èò..à...WV.|...Ä.F.Õ%..v 0001A0
 FF0138E9 00008A00 01B80141 E999F446 8BF44689 FFFF0000 9A0A76FF 0C76FF10 ..v..v¯......F¶.F¶.ÕA.|..¤..Õ8.. 0001C0
 8B1DAE68 FE76FF00 0000A69A 5016FE46 8D1076FF 0000FFFF 9A5016FA 468D1076 v..F*.P......v..F±.P.Ì....v±hÛ.. 0001E0
```

```
Dump of file SATURN:[PCCOMMON.DUMP.DLL]SA-XFORM.DLL;1 on 18-APR-1990 10:51:47.49
File ID (443,15,0)   End of file block 48 / Allocated 48

Virtual block number 7 (00000007), 512 (0200) bytes

 FFFF6825 77FF2627 77FF26FA 5EC4016A 006A0000 FFFF9A01 6A006A50 52991046 F..RPj.j......j.j.á^*&.w'&.w%h.. 000000
 7500003D F4468900 00FFFF9A 5016F846 8D010068 020036FF 26194006 8EFFFF68 h....a.&.6..h...F½.P......F¶=..u 000020
 1076FF00 00E90375 00003DF4 4689FFFF 00009AF8 76FF1076 FF0016E9 0003E903 .õ..õ...v..v½......F¶=..u.õ...v. 000040
 FF0098E9 0000BA00 00BB0001 07C7260A 5EC400A9 E999F446 8B0000FF FF9A006A j.......F¶.õ`.á^.&ú...|..¤..õ... 000060
 26FA5EC4 0010E903 752F470B 262D478B 26FA5EC4 00000118 9A5016FA 468D1076 v..F*.P.....á^*&.G-&.G/u.õ..á^*& 000080
 0000B800 0000529A F676FFF6 4689078B 26FA5EC4 0000FFFF 9A2D77FF 262F77FF .w/&.w-.....á^*&...F-.v-.R...|.. 0000A0
 0037E900 00FFFF9A 0676FF08 76FF0A76 FF0C76FF 0E76FF10 76FF0051 E90000BA ¤..õQ..v..v..v..v..v..v......õ7. 0000C0
 03751DAD 3DFF84E9 03751004 3DFECBE9 03751003 3DFEEBE9 03751001 3D002BE9 õ+.=..u.õS±=..u.õù±=..u.õ..=Ù.u. 0000E0
 0300120C CAC95F5E 1F0000E9 00008A00 00B8FFB8 E9FF63E9 03751DB0 3DFEDCE9 õÉ±=¯.u.õc.õ|.|..¤..õ...^ èò.... 000100
 02007D00 02016501 03000000 03014E00 02000000 02018000 0201D000 07001D02 .....Å...........N.......e  .).. 000120
 02016F00 0600BD02 0301DE00 0701E902 03016400 06013A02 03000000 0400FA00 .*.......:...d...õ...ß...§.. ɔ.. 000140
 03019500 06018802 03000000 0A00E400 0201ED00 07003F02 03000000 08007B00 .(.......?...Ù...õ.......|...... 000160
 03013E00 06019302 03018900 06012502 03000000 03015100 0501A800 0600CB02 .ù...`...Q.......%...¿.......>.. 000180
 890000B8 D88EFFFF 881E5657 000310C8 00014A00 06020902 03005700 0401D802 .Ä...W.......J..à...WV.|...Ä|... 0001A0
 89FA4689 0000B8E6 4689E846 890000B8 FCF08689 FCF28689 0000B8EA 4689EC46 F§.Fõ|....·*..Þ=|...FÒ.F||...F*. 0001C0
 89FD5686 890000B8 FE068689 FE088689 0000B8FD 6A8689FD 6C868900 00B8F846 F½|....l»..j»|.....±...±|....V». 0001E0

Dump of file SATURN:[PCCOMMON.DUMP.DLL]SA-XFORM.DLL;1 on 18-APR-1990 10:51:47.49
File ID (443,15,0)   End of file block 48 / Allocated 48

Virtual block number 8 (00000008), 512 (0200) bytes

 86C70001 F246C7FE 149E8CFE 12868900 4CB8FE0C 9E8CFE0A 86890044 B8FD5486 .T»|D....±...±|L....±...±úF·..ú. 000000
 4C868900 00B8FD46 8689FD48 86890000 B8FD4286 89FD4486 890000B8 0000FD52 R»..|....D»..B»|....H»..F»|....L 000020
 890000FF FF9A0056 681E0676 FF0876FF FD4E8689 FD508689 0000B8FD 4A8689FD »..J»|....P»..N».v..v..hV....... 000040
 890000FF FF9A5016 FD54868D 0676FF08 76FF0686 E90003E9 03750000 3DFD5886 .X»=..u.õ..õÑ..v..v...T».P...... 000060
 C1FD689E 8BFD6886 FF0004E9 0000FD68 86C70696 E90003E9 03750000 3DFD5886 .X»=..u.õ..õ..ú.h»..õ....h»..h»è 000080
 C70009E9 037400FD 68BE83FF E2E90003 E9037502 400B2600 8826FD54 86C402E3 D.áÑT»&..&.a.u.õ..õã..ƒh».t.õ..ú 0000A0
 26FD549E C40649E9 983EFD58 86C70009 E9037F01 FD68BE83 065CE998 3CFD5886 .X»<.õ\..ƒh»...õ..ú.X»>.õI.á.T»& 0000C0
 FD62868D FD5EB6FF FD60B6FF 0676FF08 76FFFD60 9689FD5E 86890257 88260788 ..&.W...^»..`».v..v..Ñ'».Ñ^»..b» 0000E0
 003DE903 7522FD62 BE83060E E90003E9 03750000 3DFD5886 890000FF FF9A5016 .P.......X»=..u.õ..õ...ƒb»"u.õ=. 000100
 C4830000 02379A00 6AFD5EB6 FFFD60B6 FF271C68 0676FF08 76FF5016 FCF4868D ..¶•.P.v..v.h.'.Ñ'».Ñ^»j..7....á 000120
 0876FF05 C7E9983F FD5886C7 0760E9FD 58868800 07E90375 00003DFD 58868910 ...X»=..u.õ....X»õ'.ú.X»?.õú..v. 000140
 03750000 3DFD5886 89000001 EC9A5016 E6468D13 6AFD5EB6 FFFD60B6 FF0676FF .v..Ñ'».Ñ^»j..Fl.P.š.....X»=..u. 000160
 000002D5 9A5016EA 468D126A FD5EB6FF FD60B6FF 0676FF08 76FF059E E90003E9 õ..õ...v..v..Ñ'».Ñ^»j..Fõ.P.ſ... 000180
 5EC40048 E9037402 470B2607 8B26E65E C40575E9 0003E903 7500003D FD588689 ..X»=..u.õ..õu.á^|&..&.G.t.õH.á^ 0001A0
 FD60B6FF 271C6806 76FF0876 FF5016FC F4868D00 39E90374 02470B26 078B26EA õ&..&.G.t.õ9...¶•.P.v..v.h.'.Ñ'» 0001C0
 5886C705 27E90003 E9037500 0030FD58 868910C4 83000002 A79A006A FD5EB6FF .Ñ^»j..Ï....á...X»=..u.õ..õ'.ú.X 0001E0

Dump of file SATURN:[PCCOMMON.DUMP.DLL]SA-XFORM.DLL;1 on 18-APR-1990 10:51:47.49
File ID (443,15,0)   End of file block 48 / Allocated 48

Virtual block number 9 (00000009), 512 (0200) bytes

 00FFFF9A 5016FE0E 868D106A FD5EB6FF FD60B6FF 0676FF08 76FF051E E9983DFD »=.õ...v..v..Ñ'».Ñ^»j....±.P.... 000000
 FF9AFD54 B6FFFD56 B6FF0676 FF0876FF 04F4E900 03E90375 00003DFD 58868900 ...X»=..u.õ..õ¶..v..v..ÑV».ÑT».. 000020
 86890CC4 830000FF FF9A006A FD5EB6FF FD60B6FF 45886806 76FF0876 FF0000FF ....v..v.h.E.Ñ'».Ñ^»j.......á... 000040
 8D136AFD 5EB6FFFD 60B6FF06 76FF0876 FF04B5E9 0003E903 7500FD58 BE83FD58 X».ƒX».u.õ..õç..v..v..Ñ'».Ñ^»j.. 000060
 4689E856 8BE6468B 048CE900 03E90375 00003DFD 58868900 00FFFF9A 5016E646 Fl.P.......X»=..u.õ..õ...Fl.VÕ.F 000080
 0277FF26 F85EC406 76FF0876 FF0235E9 03750247 0B260788 26F85EC4 FA5689F8 ½.V*á^½&..&.G.u.õ5..v..v.á^½&.w. 0000A0
 8B0445E9 0003E903 7500003D FD588689 000001C3 9A5016FD 6A868D04 6A37FF26 &.7j...j».P.û.....X»=..u.õ..õE.. 0000C0
 6A37FF26 0277FF26 F85EC406 76FF0876 FFFE0896 89FE0686 89FD6C96 8BFD6A86 .j»..l»...±...±.v..v.á^½&.w.&.7j 0000E0
 16FDBA86 8D0409E9 0003E903 75000030 FD588689 000005AD 9A5016FD 8A868D01 ...¤».P.Ù.....X»=..u.õ..õ....¤». 000100
 76FF0876 FF10C483 05D8009A 9A5016FC F4868D00 68681EFE 12B6FFFE 14B6FF50 P.Ñ.±.Ñ.±.hh...¶•.P...Ù..á..v..v 000120
 016AFD58 868905FD 09089A50 16FD6E86 8D5016FC F4868DFE 0EB6FFFE 10B6FF06 ..Ñ.±.Ñ.±..¶•.P..n».P...»...X»j. 000140
 F69A006A 576A5016 FD64868D 0676FF08 76FFFE0E B6FFFE10 B6FF5016 FD6E868D ..n».P.Ñ.±.Ñ.±.v..v...d».PjWj..- 000160
 6686FF06 76FF0876 FF038DE9 0003E903 7500FD58 BE83FD58 868916C4 83000004 ....á...X».ƒX».u.õ..õ...v..v..Ñf 000180
 63E90003 E9037500 0030FD58 86890000 FFFF9A50 16FD4286 8D036AFD 64B6FFFD ».Ñd»j...B».P.......X»=..u.õ..õc 0001A0
 0004659A 006AFD64 B6FFFD66 B6FF458A 680676FF 0876FFFD 5EB6FFFD 60B6FF03 ..Ñ'».Ñ^».v..v.h.E.Ñf».Ñd»j..e.. 0001C0
 5EB6FFFD 60B6FF00 6A006A03 2FE90003 E9037500 FD58BE83 FD588689 10C48300 ..á...X».ƒX».u.õ..õ/.j.j..Ñ'».Ñ^ 0001E0
```

Dump of file SATURN:[PCCOMMON.DUMP.DLL]SA-XFORM.DLL;1 on 18-APR-1990 10:51:47.49
File ID (443,15,0)   End of file block 48 / Allocated 48

Virtual block number 10 (0000000A), 512 (0200) bytes

```
FD588689 14C48300 00048F9A 006AFD64 B6FFFD66 B6FF458D 680676FF 0876FFFD ».v..v.h.E.Ñf».Ñd»j.......á...X» 000000
589A006A FD64B6FF FD66B6FF 27216806 76FF0876 FF02F9E9 0003E903 7500003D =..u.Õ..Õ'..v..v.h!'.Ñf».Ñd»j..X 000020
0006849A 006A37FF 260277FF 26F85EC4 0676FF08 76FFFD58 86890CC4 83000006 ....á...X».v..v.á^½&.w.&.7j..... 000040
26FE069E C45016FD BA868D02 AFE90003 E9037500 FD588E83 FD588689 0AC48300 ..á...X».ƒX».u.Õ..Õ€...¤».Pá..±& 000060
16EE468D 0676FF08 76FFFE0E B6FFFE10 B6FFFD64 B6FFFD66 B6FF37FF 260277FF .w.&.7.Ñf».Ñd».Ñ.±.Ñ.±.v..v..FŸ. 000080
9EC40266 E90003E9 037500FD 588E83FD 5886891C C4830000 06249A00 6A596A50 PjYj..$....á...X».ƒX».u.Õ..Õf.á. 0000A0
0005459A FD6AB6FF FD6CB6FF 0676FF08 76FF0013 E9037502 470B2607 8B26FD6A j»&..&.G.u.Õ...v..v..Ñl».Ñj».E.. 0000C0
89EC5688 EA468800 00028F9A E676FFE8 76FF0676 FF0876FF FDBCE904 F8468300 ..F½.Õ¥».v..v..vÒ.vì......Fõ.V$. 0000E0
F09EC406 76FF0876 FF020DE9 03750247 0B26078B 26FCF09E C4FCF296 89FCF086 .Þ=...=á.Þ=&..&.G.u.Õ...v..v.á.Þ 000100
0003E903 7500003D FD588689 0000026D 9A5016F4 468D036A 37FF2602 77FF26FC =&.w.&.7j..F¶.P.m.....X»=..u.Õ.. 000120
00FFFF9A 5016FDBA 868D016A 37FF2602 77FF26FC F09EC406 76FF0876 FF01E1E9 ÕÄ..v..v.á.Þ=&.w.&.7j...¤».P.... 000140
681EFE0A B6FFFE0C B6FF5016 FDBA868D 01B4E900 03E90375 00003DFD 58868900 ...X»=..u.Õ..ÕÇ...¤».P.Ñ.±.Ñ.±.h 000160
868DFE0E B6FFFE10 B6FF0676 FF0876FF 10C483FF FF009A9A 5016FCF4 8680006D m...¶=.P......á..v..v..Ñ.±.Ñ.±.. 000180
FFFE10B6 FF5016FD 6E868D01 6AFD5886 89FFFF09 089A5016 FD6E868D 5016FCF4 ¶=.P..n».P.......X»j...n».P.Ñ.±. 0001A0
83FD5886 8916C483 0000FFFF 9A006A57 6A5016FD 64868D06 76FF0876 FFFE0EB6 Ñ.±.v..v...d».PjWj.......á...X». 0001C0
66B6FF45 8A680676 FF0876FF FD5EB6FF FD60B6FF 0138E900 03E90375 00FD588E ƒX».u.Õ..Õ8..Ñ'».Ñ^».v..v.h.E.Ñf 0001E0
```

Dump of file SATURN:[PCCOMMON.DUMP.DLL]SA-XFORM.DLL;1 on 18-APR-1990 10:51:47.49
File ID (443,15,0)   End of file block 48 / Allocated 48

Virtual block number 11 (0000000B), 512 (0200) bytes

```
0104E900 03E90375 00FD588E 83FD5886 8910C483 0000018A 9A006AFD 64B6FFFD ».Ñd»j.......á...X».ƒX».u.Õ..Õ.. 000000
83FD5886 890AC483 0000FFFF 9A006A37 FF260277 FF26FCF0 9EC40676 FF0876FF .v..v.á.Þ=&.w.&.7j.......á...X». 000020
F476FFF6 76FFFD64 B6FFFD66 B6FF5016 FDBA868D 0008E900 03E90375 00FD588E ƒX».u.Õ..ÕÄ...¤».P.Ñf».Ñd».v~.v¶ 000040
891CC483 000003CF 9A006A59 6A5016EE 468D0676 FF0876FF FE0EB6FF FE10B6FF .Ñ.±.Ñ.±.v..v..FŸ.PjYj..ü....á.. 000060
036AFD64 B6FFFD66 B6FF0676 FF0876FF 0094E900 03E90375 00FD588E 83FD5886 .X».ƒX».u.Õ..Õ...v..v..Ñf».Ñd»j. 000080
B6FF006A 006A006A E90003E9 03750000 3DFD5886 89000003 FE9A5016 FD42868D ..B».P.±.....X»=..u.Õ..Õj.j.j..Ñ 0000A0
C4830000 07549A00 6AFD64B6 FFFD66B6 FF458D68 0676FF08 76FFFD5E B6FFFD60 '».Ñ^».v..v.h.E.Ñf».Ñd»j..T....á 0000C0
64B6FFFD 66B6FF27 21680676 FF0876FF 0034E900 03E90375 00003DFD 58868914 ...X»=..u.Õ..Õ4..v..v.h!'.Ñf».Ñd 0000E0
FCF08683 0008E900 03E90375 00FD588E 83FD5886 890CC483 0000042D 9A006AFD »j..-....á...X».ƒX».u.Õ..Õ....Þ= 000100
000007A8 9AEA76FF EC76FF06 76FF0876 FF0011E9 0375EC46 0BEA468B FDE3E904 .ÕD=.Fõ.F$u.Õ...v..v..v$.võ.´... 000120
FD588E83 0000052D 9AE676FF E876FF06 76FF0876 FF0011E9 0375E846 0BE6468B .Fì.FÒu.Õ...v..v..vÒ.vì.-....ƒX» 000140
9A016A00 6AFD5886 FF5016FC F4868D00 00FFFF9A 0676FF08 76FF002A E9037500 .u.Õ*..v..v........¶=.P.ÑX»j.j.. 000160
3DFD5886 890000FF FF9A0676 FF0876FF 001AE901 27E90000 880AC483 0000FFFF .....á.j..Õ'.Õ...v..v........X»= 000180
FE16868D 506A0108 68020036 FF261942 068E006A 006AFF7A E90003E9 03750000 ..u.Õ..Õz.j.j...B.&.6..h..jP...± 0001A0
006AFD5E B6FFFD60 B6FF271C 680676FF 0876FF50 16FCF486 8D0000FF FF9A5016 .P.......¶=.P.v..v.h.'.Ñ'».Ñ^»j. 0001C0
9A468D50 16FCF486 8DFF2DE9 0003E903 7500003D FD588689 10C48300 00072A9A .*....á...X»=..u.Õ..Õ-...¶=.P.F. 0001E0
```

Dump of file SATURN:[PCCOMMON.DUMP.DLL]SA-XFORM.DLL;1 on 18-APR-1990 10:51:47.49
File ID (443,15,0)   End of file block 48 / Allocated 48

Virtual block number 12 (0000000C), 512 (0200) bytes

```
C4830886 009A9A50 16FCF486 8D007268 1E50169A 468D08C4 83086C00 109A5016 .P...l..á..F..P.hr...¶=.P......á 000000
76FF0876 FF0CC483 0386009A 9A5016FE 68868D50 16FE1686 8D5016FC F4868D0C ...¶=.P...±.P..h±.P......á..v..v 000020
FE468DFC 76FFFECA E90003E9 03750000 3DFD5886 890000FF FF9A5016 FC468D06 ..F=.P.......X»=..u.Õ..Õb±.v=.F± 000040
9A5016FD 5A868DFE 76FFFEAE E90003E9 03750000 3DFD5886 890000FF FF9A5016 .P.......X»=..u.Õ..ÕÜ±.v±..Z».P. 000060
868D1DB1 68FD5AB6 FFFD5CB6 FFFE91E9 0003E903 75000030 FD588689 0000FFFF ......X»=..u.Õ..Õ.±.Ñ\».ÑZ»hÝ... 000080
5700005C C80004CA C95F5E1F 0000E9FD 58868800 00FFFF9A 006A006A 5016FE68 h±.Pj.j........X»Õ...^_èÒ..à\..W 0000A0
76FF1476 FF0000AE 46C70001 FE46C700 01FC46C7 0000A846 C7D88E00 08881E56 V.¡...ÀúF´..úF=..úF±..ũFÛ...v..v 0000C0
08A65689 A44689AC 5688AA46 88000003 1C9A5016 AA468D03 6A0E76FF 1076FF12 ..v..v.j..F¯.P......F¯.V¯.FÊ.Vì. 0000E0
C404A446 830004E9 00008800 03E90001 880006E9 037400AE 7E83000F E9037500 Àu.Õ...~Û.t.Õ..¡..Õ..¡..Õ...FÊ.á 000100
016A37FF 260277FF 26A45EC4 1276FF14 76FF0068 E9037502 470B2607 8B26A45E ^Ê&..&.G.u.Õh..v..v.á^Ê&.w.&.7j. 000120
16804680 0007E9A8 46880006 E9037500 A87E83A8 46890000 03589A50 1680468D .F¯.P.X....F´.~´.u.Õ...F´Õ=..F¯. 000140
0876FF0A 76FF0C76 FF001CE9 03740000 3D08C483 0A1E0046 9A0A76FF 0C76FF50 P.v..v..F....á.=..t.Õ...v..v..v. 000160
C40051E9 037401AE 7E83FF85 E90001AE 46C7A846 890000FF FF9AFC76 FF0676FF .v..v=......F´úFÛ..Õ...~Û.t.ÕQ.á 000180
FF00000A 659AAA76 FFAC76FF 1276FF14 76FF0011 E9037502 470B2607 8B26AA5E ^¯&..&.G.u.Õ...v..v..v¯.v¯.e.... 0001A0
FF0E76FF 1076FF12 76FF1476 FF08C483 0A780010 9A0A76FF 0C76FF06 76FF0876 v..v..v..v....x..á..v..v..v..v.. 0001C0
26078B26 AA5EC400 34E90374 00AE7E83 03A80908 9A0676FF 0876FF0A 76FF0C76 v..v..v..v....´..~Û.t.Õ4.á^¯&..& 0001E0
```

Dump of file SATURN:[PCCOMMON.DUMP.DLL]SA-XFORM.DLL;1 on 18-APR-1990 10:51:47.49
File ID (443,15,0)   End of file block 48 / Allocated 48

Virtual block number 13 (0000000D), 512 (0200) bytes

```
FF0A76FF 0C76FF00 00078C9A AA76FFAC 76FF1276 FF1476FF 0011E903 7502470B .G.u.Õ...v..v..v˘.v˙......v..v.. 000000
0A083102 03001710 CAC95F5E 1F0000E9 0000B808 C4830855 00109A06 76FF0876 v..v....U..á.¡..Õ...^ èò.....1.. 000020
04099602 03023F00 0A06C802 0300E600 0400CB02 03006400 04089702 03023200 .2.......d...ù...Ì...Ȁ...?...... 000040
0A04AD02 03016F00 0608D002 03007E00 0406F702 03000000 050A3E00 02007000 .p...>.......¼...~...Å...o...Ù.. 000060
02081301 03008A00 04093F02 03000000 0A091300 02000000 0809BA00 02025000 .P...¤...............?.......... 000080
0208F901 03026A00 08090702 0301FF00 0807D002 03009600 04058002 03009000 .............Å.......■...j...'.. 0000A0
0608B302 03004000 0400AB02 0300BB00 04015302 0300AF00 040A0B02 03003D00 .=.......£...S...£...¨...ā...•.. 0000C0
00000000 00000000 00000000 00000300 0407BD02 03004C00 0407E702 0301B900 .¿...Ö...L...§...Æ.............. 0000E0
0C868900 00FFFF9A 5016FE0C 86800676 FF0876FF D88EFFFF B81E5657 0002F4C8 à¶..WV.¡...Å.v..v....±.P........ 000100
E3C1F25E 88F246FF 0003E900 00F246C7 07D2E9FD 0C868B00 07E90375 00003DFD »=..u.Õ.....»Õ0.úF·..Õ...F·.^·èD 000120
0876FF00 28E90375 02F27E83 FFE4E900 03E90375 02400B26 008B26FE 0CB6C402 .áÑ.±&..&.ə.u.Õ..Õõ..~·.u.Õ(..v. 000140
B806C483 00000183 9A016A00 6A983568 00000199 9AFE0CB6 FFFE0EB6 FF0676FF .v..Ñ.±.Ñ.±.....h5.j.j.......á.¡ 000160
000000CC 9A5016E8 468037FF 260277FF 26FE0C9E C40676FF 0876FF07 7DE90000 ..Õ)..v..v.á..±&.w.&.7.FÒ.P.ä... 000180
77FF26FE 0C9EC406 76FF0876 FF074FE9 FD0C868B 0007E903 7500003D FD0C8689 ...»=..u.Õ.....»ÕO..v..v.á..±&.w 0001A0
FD0C868B 0007E903 7500003D FD0C8689 0000027F 9A5016FD 70868004 77FF2606 .&.w...p».P........»=..u.Õ.....» 0001C0
00FD2286 C600FD72 86C600AD E903751F FD70BE83 00B7E903 751FE87E 83071FE9 Õ...–Ò.u.Õñ../p».u.ÕÙ.6.r».6."». 0001E0
```

Dump of file SATURN:[PCCOMMON.DUMP.DLL]SA-XFORM.DLL;1 on 18-APR-1990 10:51:47.49
File ID (443,15,0)   End of file block 48 / Allocated 48

Virtual block number 14 (0000000E), 512 (0200) bytes

```
0001559A 006A37FF 260277FF 26FE0C9E C4271C68 0676FF08 76FF5016 FD72868D ..r».P.v..v.h.'á..±&.w.&.7j..U.. 000000
0876FF50 16FD2286 8D06CBE9 FD0C868B 0007E903 7500003D FD0C8689 10C48300 ..á....»=..u.Õ.....»ÕÙ..."».P.v. 000020
FD0C8689 10C48300 00FFFF9A 006A0477 FF260677 FF26FE0C 9EC4271C 680676FF .v.h.'á..±&.w.&.w.j.......á....» 000040
006A9836 685016FD 72868D50 16FD2286 8D0693E9 FD0C868B 0007E903 7500003D ¤..u.Õ.....»Õ...."».P..r».Ph6.j. 000060
00008800 0002CD9A FE0CB6FF FE0EB6FF 0676FF08 76FF0EC4 83000002 609A016A j..'....á..v..v..Ñ.±.Ñ.±.ë...¡.. 000080
8826FE0C 9EC4FD0E 8689FD70 8688EA46 89E8468B 0036E903 741FE87E 83065FE9 Õ ..–Ò.t.Õ6..FÒ.FÕ..p»...»á..±&. 0000A0
E9F05689 EE468906 57882604 4788226FE 0C9EC4FD 1C9689FD 1A868902 57882607 .Ẍ.W....»...»á..±&.G.&.W..FŸ.VÞÕ 0000C0
5689EE46 8902578B 26078826 FE0C9EC4 FD0E8689 E84688EA 4689FD70 86880033 3...p».FÕ.FÒ...»á..±&..&.W..FŸ.V 0000E0
FFFD1CB6 FF0676FF 0876FFFD 1C9689FD 1A868906 57882604 478826FE 0C9EC4F0 Þá..±&.G.&.W....»...».v..v..Ñ.». 000100
E9FD0C86 880007E9 03750000 30FD0C86 890000FF FF9A5016 F8468D03 6AFD1AB6 Ñ.»j..F½.P........»=..u.Õ.....»Õ 000120
9A016A00 6A983868 0015E903 74FA5639 001DE903 74F84639 F0568BEE 468805C0 å..FŸ.VÞ9F½t.Õ..9V*t.Õ..h8.j.j.. 000140
FF9A5016 EC468DF8 76FFFA76 FF0676FF 0876FF05 95E90000 8806C483 000002B1 Ÿ....á.¡..Õ...v..v..v".v½.FŠ.P.. 000160
83001FE9 037522EC 7E83056C E9FD0C86 880007E9 03750000 30FD0C86 890000FF ......»=..u.Õ.....»Õl..–š"u.Õ... 000180
76FF0544 E90000B8 06C48300 00FFFF9A 016A006A 98406800 15E90375 22FD0EBE ƒ.»"u.Õ..hə.j.j.......á.¡..ÕD..v 0001A0
6AFD1AB6 FFFD1CB6 FF0676FF 0876FF00 00FFFF9A FE0CB6FF FE0EB6FF 0676FF08 ..v..Ñ.±.Ñ.±......v..v..Ñ.».Ñ.»j 0001C0
76FF0504 E9FD0C86 880007E9 03750000 30FD0C86 89000003 379A5016 FC468D04 ..F•.P.7......»=..u.Õ.....»Õ...v 0001E0
```

Dump of file SATURN:[PCCOMMON.DUMP.DLL]SA-XFORM.DLL;1 on 18-APR-1990 10:51:47.49
File ID (443,15,0)   End of file block 48 / Allocated 48

Virtual block number 15 (0000000F), 512 (0200) bytes

```
04E2E9FD 0C868800 07E90375 00003DFD 0C868900 00FFFF9A 0078681E 0676FF08 ..v..hx.........»=..u.Õ.....»Õã. 000000
30FD0C86 890000FF FF9A5016 FD1E868D 0F6AFD1A B6FFFD1C B6FF0676 FF0876FF .v..v..Ñ.».Ñ.»j....».P........»= 000020
E90000FD 1886C704 A9E9FD0C 86880000 FFFF9A06 76FF0876 FF0012E9 03750000 ..u.Õ...v..v.........»Õ˙.ú..»..Õ 000040
0876FF00 8AE90375 02400B26 008B26FD 1EB6C402 E3C1FD18 9E88FD18 86FF0004 .....»...»èD.áÑ.»&..&.ə.u.Õ...v. 000060
6A30FF26 0270FF26 FD1EB6C4 02E3C1FD 189E880F 6AFD1AB6 FFFD1CB6 FF0676FF .v..Ñ.».Ñ.»j....»èD.áÑ.»&.p.&.0j 000080
0C868800 0003F99A 0676FF08 76FF0012 E9037500 003DFD0C 86890000 05239A02 ..#......»=..u.Õ...v..v..'...... 0000A0
FF9A006A 30FF2602 70FF26FD 1EB6C402 E3C1FD18 9E880676 FF0876FF 043EE9FD »Õ>..v..v....»èD.áÑ.»&.p.&.0j... 0000C0
0C868800 00044C9A 0676FF08 76FF0012 E9037500 003DFD0C 86890AC4 830000FF ....á....»=..u.Õ...v..v..L...... 0000E0
0676FF08 76FF0000 04649AFD 1EB6FFFD 20B6FF06 76FF0876 FFFF5BE9 03FEE9FD »Õ±.Õ[..v..v..Ñ ».Ñ.».d....v..v. 000100
00003DFD 0C868900 00FFFF9A 37FF2602 77FF26FC 5EC4046A FD1AB6FF FD1CB6FF .Ñ.».Ñ.»j.á^•&.w.&.7........»=.. 000120
FE76FF06 76FF0876 FF03ABE9 FD0C8688 00000496 9A0676FF 0876FF00 12E90375 u.Õ...v..v.........»Õ¨..v..v..v± 000140
FF9AEE76 FFF076FF 046AFD1A B6FFFD1C B6FF0676 FF0876FF 00000592 9AFC76FF .v•......v..v..Ñ.».Ñ.»j..vÞ.vŸ.. 000160
61E9FD0C 86880000 04CF9A06 76FF0876 FF0012E9 03750000 30FD0C86 890000FF ......»=..u.Õ...v..v..ü......»Õa 000180
FD0C8689 000002E7 9A5016FD 10868005 6AFD1AB6 FFFD1CB6 FF0676FF 0876FF03 ..v..v..Ñ.».Ñ.»j....».P.Ó......» 0001A0
0000FD18 86C70328 E9FD0C86 88000005 3A9A0676 FF0876FF 0012E903 7500003D ¤..u.Õ...v..v..:.......»Õ(.ú..».. 0001C0
76FF0085 E9037502 400B2600 8B26FD10 86C402E3 C1FD189E 88FD1886 FF0004E9 Õ.....»...»èD.áÑ.»&..&.ə.u.Õ...v 0001E0
```

Dump of file SATURN:[PCCOMMON.DUMP.DLL]SA-XFORM.DLL;1 on 18-APR-1990 10:51:47.49
File ID (443,15,0)   End of file block 48 / Allocated 48

Virtual block number 16 (00000010), 512 (0200) bytes

```
30FF2602 70FF26FD 10B6C402 E3C1FD18 9E88056A FD1AB6FF FD1CB6FF 0676FF08 ..v..Ñ.».Ñ.»j....»èD.áÑ.»&.p.&.0 000000
868B0000 05759A06 76FF0876 FF0012E9 03750000 30FD0C86 890000FF FF9A046A j.........»=..u.Õ...v..v..u..... 000020
FFFF9A30 FF260270 FF26FD10 B6C402E3 C1FD189E 8B0676FF 0876FF02 BDE9FD0C .»Õ§..v..v....»èD.áÑ.»&.p.&.0... 000040
0282E9FD 0C868800 0005909A 0676FF08 76FF0012 E9037500 003DFD0C 86890000 .....»=..u.Õ...v..v.........»Õ.. 000060
00034E9A 0676FF08 76FF0000 006C9AFD 10B6FFFD 12B6FF06 76FF0876 FFFF60E9 Õ'..v..v..Ñ.».Ñ.».l....v..v..N.. 000080
0000FFFF 9A5016FD 72868D01 6AFD1AB6 FFFD1CB6 FF0676FF 0876FFFD 0C868900 ....».v..v..Ñ.».Ñ.»j...r».P..... 0000A0
068E006A 006A00ED E9FD0E86 8B022FE9 FD0C868B 0007E903 7500003D FD0C8689 ...»=..u.Õ.....»Õ/....»ÕÚ.j.j... 0000C0
F076FF06 76FF0876 FF000006 3F9A5016 FD0C868D 4B6A0103 68020036 FF261944 D.&.6..h..jK..á».P.?....v..v..vÞ 0000E0
FD0C868B 0007E903 7500003D FD0C8689 00000658 9A5016FD 22868D01 6AEE76FF .vŸj..."».P.X.......»=..u.Õ.....» 000100
8B9A5016 FDC0868D 4B6A0100 68020036 FF261944 068E006A 006A00BC E901DFE9 ÕÕ.Õ¥.j.j...D.&.6..h..jK..á».P.. 000120
FD0C8689 000006A4 9A5016FD 22868D01 6AEE76FF F076FF06 76FF0876 FF000006 .....v..v..vÞ.vŸj..."».P.Ê......» 000140
68020036 FF261944 068E006A 006A0070 E90193E9 FD0C868B 0007E903 75000030 =..u.Õ.....»Õ..Õp.j.j...D.&.6..h 000160
22868D01 6AEE76FF F076FF06 76FF0876 FF000006 FB9A5016 FDC0868D 4B6A0104 ..jK..á».P.«....v..v..vÞ.vŸj..." 000180
42880024 E90147E9 FD0C8689 0007E903 75000030 0000058C 9A5016FD ».P.¥......»=..u.Õ....»ÕG.Õ$.¡B 0001A0
E9FF47E9 03750022 3DFF03E9 03750021 3DFFA3E9 0375001E 3D001BE9 013EE998 .Õ>.Õ..=..u.ÕÉ.=!.u.Õ..=".u.ÕG.Õ 0001C0
8D0000FF FF9A5016 FE5C868D 506A0107 68020036 FF261944 068E006A 006AFFDC É.j.j...D.&.6..h..jP..\±.P...... 0001E0
```

Dump of file SATURN:[PCCOMMON.DUMP.DLL]SA-XFORM.DLL;1 on 18-APR-1990 10:51:47.49
File ID (443,15,0)   End of file block 48 / Allocated 48

Virtual block number 17 (00000011), 512 (0200) bytes

```
72868D00 87681E50 16FE1086 8D08C483 07260010 9A5016FE 10868D50 16FD7286 .r».P...±.P...&..á....±.P.h....r 000000
8D08C483 07520010 9A5016FE 10868D50 16FD2286 8D0CC483 073A009A 9A5016FD ».P...:.á..."».P...±.P...R..á.. 000020
C0868D50 16FD2286 8D0CC483 0778009A 9A5016FD 22868D00 8C681E50 16FE1086 ..±.P.h...."».P...x..á...."».P..á 000040
0876FF14 C483FFFF 009A9A50 16FEAE86 8D5016FE 5C868D50 16FD7286 8D5016FD ».P..r».P..\±.P..Ü±.P......á..v. 000060
0062E9FD 0C868800 07E90375 00003DFD 0C868900 00FFFF9A 5016F446 8D0676FF .v..F¶.P.........»=..u.Õ.....»Õb. 000080
0042E9FD 0C868800 07E90375 00003DFD 0C868900 00FFFF9A 5016F646 8DF476FF .v¶.F-.P.........»=..u.Õ.....»ÕB. 0000A0
21E9FD0C 868B0007 E9037500 003DFD0C 86890000 FFFF9A50 16FD1486 8DF676FF .v-...».P.........»=..u.Õ.....»Õ! 0000C0
E9FD0C86 8B0000FF FF9A006A 006A5016 FEAE868D 1DB168FD 14B6FFFD 16B6FF00 ..Ñ.».Ñ.»hÝ...Ü±.Pj.j.........»Õ 0000E0
00190203 00640004 07890203 0232000A 011D0203 00169000 04CAC95F 5E1F0000 ...^_èÒ............2.........d..... 000100
03DF0203 016F0006 07CA0203 00FC0004 047F0203 00700004 060C0203 00E60004 ..ß.......p.......■...Ò....o....Ö. 000120
05F30103 008A0004 04B80203 0000000A 00080002 00000008 070E0002 0250000A ..P.......................j........µ. 000140
03A20203 01FF0008 00780203 00960004 022B0203 01100004 04350203 00900002 ..........5........+.........x.......Â. 000160
03090203 00B80004 009C0203 00AF0004 04160203 00300002 07F70103 00A30004 ..É...¥...=.......£............£.... 000180
00000000 004C0004 03B90203 01B90006 07A90203 00C90004 055E0203 00400004 ..ä...^...è...'...¿...¿...L...... 0001A0
3DFE0E86 890000FF FF9A0092 681E0676 FF0876FF D88EFFFF B81E5657 000240C8 ää..WV.j....Ã.v..v..h.........±= 0001C0
86890000 FFFF9A50 16AC4680 0676FF08 76FF0507 E9FE0E86 8B0007E9 03750000 ..u.Õ.....±Õ...v..v..F¯.P....... 0001E0
```

Dump of file SATURN:[PCCOMMON.DUMP.DLL]SA-XFORM.DLL;1 on 18-APR-1990 10:51:47.49
File ID (443,15,0)   End of file block 48 / Allocated 48

Virtual block number 18 (00000012), 512 (0200) bytes

```
26AC5EC4 04D9E9FE 0E868800 0000729A 0676FF08 76FF0012 E9037500 003DFE0E .±=..u.Õ...v..v..r......±Õ1.á^¯& 000000
01069A01 6A006A98 3A680000 00BE9A06 76FF0876 FF0020E9 03740247 08260788 ..&.G.t.Õ ..v..v../...h:.j.j.... 000020
20868D10 6A37FF26 0277FF26 AC5EC406 76FF0876 FF04AAE9 0000B806 C4830000 ...á.j..Õ¯..v..v..á^¯&.w.&.7j.... 000040
FFFF9A06 76FF0876 FF005CE9 037484A0 FE0E8E81 FE0E8689 0000FFFF 9A5016FE ±.P.........±./.±..t.Õ\..v..v.... 000060
FFFF9A00 6A37FF26 0277FF26 AC5EC427 1C680676 FF0876FF 5016FDC0 86800000 ....á».P.v..v.h.'á^¯&.w.&.7j.... 000080
39685016 FDC0868D 043DE9FE 0E868800 07E90375 00003DFE 0E868910 C4830000 ...á.....±=..u.Õ.....±Õ=...á».Ph9 0000A0
1E9689FE 1C868908 56880646 880422E9 0000880A C4830000 FFFF9A01 6A006A98 .j.j.........á.j..Õ"..F..V.....±... 0000C0
0E868800 07E90375 00003DFE 0E868900 00FFFF9A 5016FC46 8D0676FF 0876FFFE ±.v..v..F=.P.........±=..u.Õ..... 0000E0
0E868800 07E90375 00003DFE 0E868900 00FFFF9A 5016FE46 8DFC76FF 03F1E9FE ±Õþ..v•.F±.P.........±=..u.Õ..... 000100
86880007 E9037500 003DFE0E 86890000 FFFF9A50 16FE1086 8DFE76FF 03D1E9FE ±Õ1..v±...±.P.........±=..u.Õ.... 000120
020036FF 26194606 8EFFFF68 FFFF68FE 1086FFFE 1286FF01 6A006A03 B0E9FE0E .±Õ¯.j.j..Ñ.±.Ñ.±h..h.....F \.6.. 000140
FF0876FF 0011E903 7402FE0E 8E83FE0E 86890000 FFFF9A50 16FE1C86 80020068 h.......±.P.........±./.±.t.Õ.  v.. 000160
E3C1FE1A 9E88FE1A 86FF0004 E90000FE 1A86C703 68E90000 88000002 259A0676 v..X...j..Õh.ú..±..Õ.......±...±èÕ 000180
AC76C402 E3C1FE1A 9E880676 FF0876FF 01F9E903 75024008 26008826 AC76C402 .áv¯&..&.ä.u.Õ¹..v..v.....±èÕ.áv¯ 0001A0
76FF0012 E9037500 003DFE0E 86890000 FFFF9A50 16FE1486 8D30FF26 0270FF26 &.p.&.0...±.P.........±=..u.Õ...v 0001C0
0676FF08 76FF0063 E9037522 FE148E83 0305E9FE 0E868800 0002419A 0676FF08 ..v..A......±Õ..../.±"u.Õc..v..v. 0001E0
```

```
Dump of file SATURN:[PCCOMMON.DUMP.DLL]SA-XFORM.DLL;1 on 18-APR-1990 10:51:47.49
File ID (443,15,0)   End of file block 48 / Allocated 48

Virtual block number 19 (00000013), 512 (0200) bytes

 FF26AC76 C402E3C1 FE1A9E88 271C6806 76FF0876 FF5016FD C0868000 0002D49A .å.....â».P.v..v.h.'...±êD.év¯&. 000000
 E9FE0E86 880007E9 03750000 30FE0E86 8910C483 00000319 9A006A30 FF260270 p.&.0j.......é....±=..u.Õ.....±Õ 000020
 0876FF02 98E90000 880AC483 00000341 9A016A00 6A983968 5016FDC0 86800283 °...â».Ph9.j.j..A....é.|..Õ...v. 000040
 0000A49A 5016FE16 868D046A 30FF2602 70FF26AC 76C402E3 C1FE1A9E 880676FF .v....±êD.év¯&.p.&.0j....±.P.Ê.. 000060
 86880257 E90000B8 000002F2 9A0676FF 0876FF00 11E90375 00003DFE 0E868900 ....±=..u.Õ...v..v..·...|..ÕW... 000080
 FF0876FF 5016FDC0 86800000 03809A06 76FF0876 FF0063E9 0375FE18 860BFE16 .±...±u.Õc..v..v.........â».P.v.. 0000A0
 10C48300 0003739A 006A30FF 260270FF 26AC76C4 02E3C1FE 1A9E8827 1C680676 v.h.'...±êD.év¯&.p.&.0j..s....é. 0000C0
 016A006A 98386850 16FDC086 8D0202E9 FE0E868B 0007E903 7500003D FE0E8689 ...±=..u.Õ.....±Õ....â».Ph;.j.j. 0000E0
 88458A68 0676FF08 76FFFE24 86FFFE26 86FF01E7 E90000B8 0AC48300 00007E9A .-....á.|..ÕÓ..Ñ&±.Ñ$±.v..v.h.E. 000100
 003DFE0E 868910C4 83000003 C19A006A 30FF2602 70FF26AC 76C402E3 C1FE1A9E ..±êD.év¯&.p.&.0j..è....é....±=. 000120
 FE2686FF 006A006A 019DE9FE 0E868800 00030B9A 0676FF08 76FF0012 E9037500 .u.Õ...v..v..Û......±Õ..j.j..Ñ&± 000140
 006A30FF 260270FF 26AC76C4 02E3C1FE 1A9E8B45 8D680676 FF0876FF FE2486FF .Ñ$±.v..v.h.E...±êD.év¯&.p.&.0j. 000160
 8B000000 519A0676 FF0876FF 0012E903 7500003D FE0E8689 14C48300 0000DE9A .8....é....±=..u.Õ...v..v..Q.... 000180
 00043E9A 006AFE24 B6FFFE26 B6FF2721 680676FF 0876FFFD EDE9014F E9FE0E86 ..±ÕO.ÕÚ».v..v.h!'.Ñ&±.Ñ$±j..>.. 0001A0
 E9FE0E86 88000004 589A0676 FF0876FF 0012E903 7500003D FE0E8689 0CC48300 ..é....±=..u.Õ...v..v..X......±Õ 0001C0
 04B69A00 6AFE24B6 FFFE2686 FF458D68 0676FF08 76FF006A 006A006A 006A0113 ..j.j.j.j..v..v.h.E.Ñ&±.Ñ$±j..Ñ. 0001E0

Dump of file SATURN:[PCCOMMON.DUMP.DLL]SA-XFORM.DLL;1 on 18-APR-1990 10:51:47.49
File ID (443,15,0)   End of file block 48 / Allocated 48

Virtual block number 20 (00000014), 512 (0200) bytes

 FE0E868B 000001C3 9A0676FF 0876FF00 12E90375 00003DFE 0E868914 C4830000 ...é....±=..u.Õ...v..v..û......± 000000
 6A0000FF FF9A0676 FF0876FF 0000FFFF 9AAC76FF AE76FF06 76FF0876 FF000E29 Õ0..v..v..vÛ.v¯......v..v......j 000020
 FDC0868D 0000FFFF 9A5016FE 28868D50 6A010668 020036FF 26194606 8E006A00 .j...F.&.6..h..jP..(±.P.......â» 000040
 0E868910 C4830000 02689A00 6AFE24B6 FFFE2686 FF271C68 0676FF08 76FF5016 .P.v..v.h.'.Ñ&±.Ñ$±j..h...  é.... 000060
 04F50010 9A501680 468D5016 FDC0868D 0065E9FE 0E868800 07E90375 000030FE ±=..u.Õ.....±Õe...â».P.F¯.›  ..¥. 000080
 5016FDC0 86800CC4 83050F00 9A9A5016 FDC0868D 00A8681E 50168046 8008C483 .é..F¯.P.h´...â».P......é...  .P 0000A0
 8D10B168 FE1086FF FE1286FF 0CC483FF FF009A9A 5016FE7A 868D5016 FE28868D ..(±.P..z±.P......é..Ñ.±.Ñ.±hÝ.. 0000C0
 FD020300 1304CAC9 5F5E1F00 00E9FE0E 86880000 FFFF9A00 6A006A50 16FE7A86 .z±.Pj.j.........±Õ...^_èò.....» 0000E0
 AA010300 00000301 92000200 E6000400 3A020300 64000401 20020302 32000A03 ...2...-...d...:...]..........¯ 000100
 98010300 00000A00 08000200 00000804 DE000201 6F000601 6E020300 7D000201 ...}...n...o...8................ 000120
 2A010301 FF000802 90020301 DF000301 95000500 96000402 B0020300 90000204 .......§...........Ô...........* 000140
 4D020300 40000400 17020300 88000402 0E020300 AF000404 70020300 30000205 ...=...p...£.......£.......ə...M 000160
 00000000 00000000 00000000 D3000404 17020300 4C000404 7B020301 B9000601 ...¿...(...Ŀ.......ₐ............ 000180
 8ED88CFE 880A76C5 1EDE88D7 88EC8855 00000000 00000000 00000000 00000000 ................U.š.■.8.év..±.Ä. 0001A0
 88F388A4 F3C913A5 F3E90149 A4027401 A8C78806 7EC4D1F7 AEF2FFFF B9C033C0 å3ä¿..·ÚÁ1é~..ú´.t.ÊÌ1ÕµÊ.èµÊ.µ. 0001C0
 F3F928D1 F7AEF2FF FFB9C033 0A7EC406 76C51EDE 88D788EC 8855CB5D C28C1FFA ª..ô)ùU.š.■.8.év.é~.3ä¿..·ÚÁi+ªµ 0001E0

Dump of file SATURN:[PCCOMMON.DUMP.DLL]SA-XFORM.DLL;1 on 18-APR-1990 10:51:47.49
File ID (443,15,0)   End of file block 48 / Allocated 48

Virtual block number 21 (00000015), 512 (0200) bytes

 4E880F88 0A76C506 7EC41E56 57EC8855 00CB5DFA 88F3881F FFFF1DC0 1B0574A6 ¦t..å.....µ.ª]ù.U.šWV.é~.év..Õ.N 000000
 56570000 16C8C85D E5885F5E 1FC28CC3 88AAF3C0 32F8E2AA 0374C00A AC0CE30E .D.¯.åt.¯ä½2äµ¯.ü.ö.^ .[]ùà...WV 000020
 08568806 4688420A 47C626F8 5EC4FE56 8CFC4689 0E468DFA 568CF846 89EC468D .F§.F½.Vª.F..F=.V±é^½Ī6G.B.F..V. 000040
 060A76FF 0C76FFFC 76FF167F FF0447C7 26025789 26078926 08578926 06478926 &.G.&.W.&..&.W.&úG.....v=.v..v.. 000060
 02478E26 07FF263F 8826C02A 1278044F FF26F85E C4F0880C C483010F 02909A53 S......é..Þé^½&.O.x.*ä&.?&..&.G. 000080
 56570000 08C8CBC9 5F5EC688 06C483FF FF011A9A 006A53FA 76FF900F EB058826 &..Š...vªSj.......é..6^ èùà...WV 0000A0
 05E0D1C1 03E0D1C8 88F9F700 0CB99905 002DC388 FA4689E4 2A0B478A 26085EC4 é^.&.G.*ô.Fª.û-...¿..¼ª¯àÌÁ.éÌÁ. 0000C0
 28E9FFFF 88200A4F 8026085E C40F7440 0A47F626 0774830A 47F626F8 468910F4 ¶..F½&-G..t.&-G.ət.é^.&.O. |..Õ+ 0000E0
 26020A4F 802690E2 EB000004 47C72620 0A4F8026 0E74010A 47F62608 5EC49001 ..é^.&-G..t.&.O. &úG...Šã.&.O..& 000100
 F7000CB9 9905002D C3884C75 0C0A47F6 26FC7689 F0880447 8926C028 EF0A6780 .g.ÿ+â&.G..Þ.v=&-G..uĿ.û-...¿..¼ 000120
 16750518 087E810E 7401C30A 7E810775 050C087E 81377501 10F487F6 06D868F9 ªkÄ.-.¶..u7.-...u..-.û.t..-...u. 000140
 830C51E8 0876FF0A 76FF0C75 C00802C4 83023610 A89AFA76 FF0F75FF FF0A7E81 .-...u..vª.´.6..á..âu..v..v.ÒQ.. 000160
 740110F4 87F60608 68F9F700 0CB99905 002DC388 1575080A 47F62608 5EC404C4 é.é^.&-G..u..û-...¿..¼ªkÄ.-.¶..t 000180
 4588F87E 88025789 26078926 40085788 26064788 2606772B 26378826 085E8867 g.^.&.7&+w.&.G.&.W.ə&..&.W..-½.E 0001A0
 19E8FC46 8908C483 02540EF8 9AFA76FF 0677FF26 5256167E F60B0447 89264802 .H&.G..-~.VR&.w..vª.½.T..é..F=Š. 0001C0
 065FC426 085EC408 C4830277 0EBA9A53 006A006A 026A0F74 20170587 F6FA5E88 .^ª-... t.j.j.j.S.¤.w..é.é^.&é_. 0001E0
```

Dump of file SATURN:[PCCOMMON.DUMP.DLL]SA-XFORM.DLL;1 on 18-APR-1990 10:51:47.49
File ID (443,15,0)   End of file block 48 / Allocated 48

Virtual block number 22 (00000016), 512 (0200) bytes

```
 39FC4689 08C48300 E40EF89A FA76FF50 1606468D 560001BE 17EB0788 2606468A .F.&..Š./..V.F..P.v*.%.ŏ..ó..F=9 000000
 56A31A5C B801CD10 CC9A000A B8EC8855 CBC95F5E E42A0646 8AFECCE9 0374FC76 v=t.Õò±.F.*ð^_èüU.š¦...ä.ë.¦\.ÈV 000020
 C71A2E16 891A2CA3 08568806 46881A48 16891A46 A3105688 0E46881A 581E8C1A ...X..F..V.ÈF¯..H..F..V.È,.....ú 000040
 A3C02800 011A5406 C7030BE9 037425F6 7E80038D E900001A 5006C700 001A5206 .R...ú.P...Ō...—%t.Ő..ú.Ť...+ŏÈ 000060
 00201BBC 06C71A44 A31A2AA3 1A30A31A 4AA31A4C A31A34A3 1A4EA31A 32A31A36 6.È2.ÈN.È4.ÈL.ÈJ.È0.È*.ÈD.ú.¥. . 000080
 FF007528 3F80260A 5E8B903E EB00301B BC06C70A 46FF4975 30017F80 260A5EC4 ó^.&...0uI.F.ú.¥.0.Š>..^.&.?+u.. 0000A0
 9014EB1A 4A06FF1A 75001A36 3E830E75 203F8026 9028EB00 001A4A06 C71A3606 .6.ú.J...Š(.&.? u..>6..u...J.Š.. 0000C0
 E80E5098 078A260A 5E880A46 FF1A4406 FFC7752D 3F80260A 5EC400EB 1A2A06FF ..*.Š.ó^.&.?-uú..D..F..^.&...P.Ò 0000E0
 0C56890A 468908C4 8308C7E8 0E1A5A68 1E0A76FF 0C76FFDD 75C00802 C4830978 x..ó..âuǏ.v..v..hZ..Òú..ó..F..V. 000100
 75301BBC 3E830D74 001A443E 831A5AA3 D8F71A5A A11A4406 FF0C7D00 1A5A3E83 .>Z..)...D.ÀZ.%ÀÈZ..>D..t..>¥.0u 000120
 0E1A5468 1E0A76FF 060A46FF 1A4C06FF 2D752E3F 80260A5E C400201B BC06C706 .ú.¥. .ó^.&.?.u-..L..F...v..hT.. 000140
 0A5EC41A 4C0EFF00 011A5406 C70A7D00 1A543E83 0C56890A 468908C4 83087BE8 Ò(..ó..F..V..>T..).ú.T... .L.ó^. 000160
 3E830002 1A3406C7 0675006C 3D2B7400 68304074 004E3D3D 7400463D 98078A26 &...=F.t==N.t@=h.t+=l.u.ú.....> 000180
 06C79002 4EE91C75 003F8026 0A5EC40A 46FF0375 4C3F8026 0A5EC409 75001A34 4..u.ó^.&.?Lu..F.ó^.&.?.u.Č" .ú. 0001A0
 004530F8 46899807 8A26C8E8 00081A34 06C7D0E8 00101A34 06C7D8E8 00011A34 4...ŠÀú.4...ŠÀú.4...Šà&....F½=E. 0001C0
 91E9037E 78740069 3DF84688 20F84683 1A3206FF 08750058 3D057400 47300A74 t.=G.t.=X.u...2..F½ .F½=i.tx~.Ŏ. 0001E0
```

Dump of file SATURN:[PCCOMMON.DUMP.DLL]SA-XFORM.DLL;1 on 18-APR-1990 10:51:47.49
File ID (443,15,0)   End of file block 48 / Allocated 48

Virtual block number 23 (00000017), 512 (0200) bytes

```
 75021A34 3E839001 59E90140 E9037500 25300152 E9037E01 3FE90375 00633001 .=c.u.Ŏ?.~.ŎR.=%.u.Ŏ@.ŎY...>4..u 000000
 1A50A11F C4261A46 1EC400EB 00000247 C7260789 261A50A1 1FC4261A 461EC415 .ó.F.&ó.ÀP.&..&úG...Š.ó.F.&ó.ÀP. 000020
 1A2C1EC4 018DE903 74001A50 3E830170 E9037500 1A523E83 041A4606 83078926 &....F...>R..u.Ŏp..>P..t.Ŏ§.ó.,. 000040
 019EE80E 0A6A0000 1A2A06C7 1A4E06FF 01ACE9FF FFB801AF E9037520 0A47F626 &-G. u.Ŏ€.¦..Ŏ¯...N.ú.*...j..Ò.. 000060
 1A343E83 00041A54 06C71A4C 06FF1A32 06FF1A30 06FFF2EB 086A90C3 E802C483 .ó.Šû.j.Š·..0...2...L.ú.T....>4. 000080
 46891A5A A128741A 5A0639FA 46891A34 A3C0287A 74011A34 3E830081 E9037508 .u.Ŏ...>4..tz+ŏÈ4..F*9.Z.t(ÀZ..F 0000A0
 C028027D C0081A5A A1051A5A 2E839090 13EB0000 1A5A06C7 0A74001A 443E83FA *.>D..t.ú.Z...Š.....Z..ÀZ..ó).+ŏ 0000C0
 227400FA 7E8302C4 83048DE8 0E3A6A02 C4830130 E80E106A 021A4606 831A5AA3 ÈZ...F..j..Ò0..ó.j:.Ŏ...ó..-*.t" 0000E0
 1A5A06C7 9007EB1A 5AA3C02B 027DC00B 1A5AA300 052DFA46 88157400 1A443E83 .>D..t..F*-..ÈZ..ó).+ŏÈZ.Š..ú.Z. 000100
 006A90FF 3FE9106A FF10E902 1A460683 02C48300 F1E80E10 6A041A46 2E830000 ....F..j..Òþ..ó...F..Ŏ..j.Ŏ7..j. 000120
 90FF21E9 0428E80E 256AFF2A E90349E8 0EF876FF F4EB016A 90FF39E9 026EE80E .Òn.Ŏ9..j.Š¶.v½.ÒI.Ŏ*.j%.Ò(.ŎI.. 000140
 FF0C5688 0A468809 74001A34 3E830A7E 00673005 7C006530 FF0CE903 7500643D =d.u.Ŏ..=e.|.=g.~Ŏ.>4..t..F..V.. 000160
 E9037500 6F30FE80 E9037500 6E30903A EBFE5689 FC468940 0C56880A 46880A4E N..F..V.@.F=.V±Š:.=n.u.Ŏ.±=o.u.Ŏ 000180
 EBFF79E9 03750078 3DFEB9E9 03750075 3D8F7400 7330FEE0 E9037500 703DFEE4 ŏ±=p.u.ŎÀ±=s.t.=u.u.Ŏ¿±=x.u.Ŏy.Š 0001A0
 462BC388 EC75253C 0474C00A F6468807 8A26FC5E C4FC46FF 9034EB0A 46FF9081 Ý..F.Š4..F=ó^=&...F-.ât.<%uš.ú+F 0001C0
 8A260A5E C40C5689 0A4689FE 5688FC46 8B06C483 044CE80E 0A76FF0C 76FF500A .P.v..v..ÒL..ó..F=.V±.F..V.ó^.&. 0001E0
```

Dump of file SATURN:[PCCOMMON.DUMP.DLL]SA-XFORM.DLL;1 on 18-APR-1990 10:51:47.49
File ID (443,15,0)   End of file block 48 / Allocated 48

Virtual block number 24 (00000018), 512 (0200) bytes

```
 12C8C8C9 1A50A1FE 51E90374 200A47F6 261A2C1E C4FC63E9 0374C00A F6468807 ..F-.ât.Ŏc=ó.,.&-G. t.ŎQ±ÀP.èùà. 000000
 021A343E 831A4E06 FF04740A 067E8300 201B8C06 C7067400 1A4C3E83 56570000 ..WV.>L..t.ú.¥. ..~..t...N..>4.. 000020
 EB041A46 0683FE56 89FC4689 02578826 0788261A 461EC419 75101A34 3E830774 t..>4..u.ó.F.&..&.W..F=.V±..F..Š 000040
 88261A46 1EC40EEB 0000FE46 C7FC4689 0788261A 461EC411 74001A4E 3E83902C ,...>N..t.ó.F.&...F=úF±..Š.ó.F.&. 000060
 EB064688 0674FE46 08FC4688 0E74001A 2A3E8302 1A460683 FE5689FC 46899907 ...F=.V±..F...>*..t..F=.F±t..F.Š 000080
 7D00FE7E 83317500 1A4E3E83 F45689F2 46891A58 16881A56 A11BBAA3 C02B9003 ..+âÈ¤.ÀV...X..F·.V¶.>N..u1.~±.) 0000A0
 46890AF7 000283D8 F7FE5688 FC46882D 07C626F2 46FFF25E C410750A 067E832B +.~..u.ó^·.F·&6.-.F=.V±%À.@.%Ŏ.F 0000C0
 FF501E06 76FFFA5E 8CF84689 1A388800 00F646C7 9006E800 01F646C7 FE5689FC =.V±úF-..Š..úF-..¦8..F½.^*.v..P. 0000E0
 83029910 869AF876 FFFA76FF 4574001A 4C3E830A C483077D 109E9AFC 76FFFE76 v±.v=...)..ó..>L..tE.v*.v½...... 000100
 C4F04E88 00001B8A 06C70675 081B8A3E 83007EC9 08F04E89 C82B1A54 0E8804C4 ó...T.+à.Nþ.è~..>¤..u.ú.¤....Nþó 000120
 EE5E8C1A 320E88F0 4E89F446 8CF27E89 F47FC008 49C18847 3005C626 05E8F27E ~·Š.&6.0G.èI.ó.¶.~·.F¶.Nþ..2..^Ÿ 000140
 E375003F 8026F846 FF46202C 80037C61 3C0774C9 08048807 8A26F85E C4F276C5 év·ó^½&.....èt.<a|.., F.F½&.?.uD 000160
 B8057500 F67E830B 741A4A06 081A36A1 1475001A 4E3E83EE 5E8EF45E 8CF27689 .v·.^¶.^Ÿ.>N..u.Àó...J.t..—.u.| 000180
 018E1874 00067E83 56570000 10C8C8C9 5F5E02C4 8302FFE8 0E50C028 02E80001 ..Š.+âP.Ò...ó.^_èùà...WV.~..t./. 0001A0
 461EC413 74081A34 3E83008F E9021A46 0683FA56 89F84689 1A481688 1A46A100 .ÀF...H..F½.V*.¯F..Ŏ...>4..t.ó.F 0001C0
 FA5E8CF8 4689FC46 89078826 1A461EC4 10E8FA56 89F84689 02578826 0788261A .&..&.W..F½.V*Š.ó.F.&...F=.F½.^* 0001E0
```

```
Dump of file SATURN:[PCCOMMON.DUMP.DLL]SA-XFORM.DLL;1 on 18-APR-1990 10:51:47.49
File ID (443,15,0)   End of file block 48 / Allocated 48

Virtual block number 25 (00000019), 512 (0200) bytes

097500FC 7E83900A EB00AEB8 1575FA46 08F84688 0E74081A 343E8304 1A460683 ..F...>4..t..F½.F*u.¦Ö.Š...~*.u. 000000
540E881C 741A4C36 39F62BF4 5689F246 89FA568B F8468BFA 5E8CF846 890085B8 ¦ç..F½.^*.F½.V*.F·.V¶+-96L.t...T 000020
26F246FF F25EC446 90EDEB10 7ECE3B46 1574003F 8026F246 FFF25EC4 900EEB1A .Š..á^·.F·&.?.t.F;ö-.ŠÜ.Fá^·.F·& 000040
76FFFA76 FF5602C4 830159E8 0E570875 001A443E 83FE281A 5A3E8BF3 75003F80 .7.u¥.>Z.+±.>D..u.W.ÔY..á.V.v*.v 000060
000006C8 90CBC95F 5E02C483 013CE80E 57087400 1A443E83 06C48301 83E80EF8 ½.Ô*..á..>D..t.W.Ò<..á.^_èù.à... 000080
C02A9003 E801B005 7547067E 83067467 067E83FE 5689FC46 891A4816 881A46A1 ÀF...H..F*.V±.~.gt..~.Gu.¯.Š..*á 0000A0
5406C706 75001A54 3E830074 00FA7E80 00061A54 06C70675 001A4C3E 83FA4688 .F*.>L..u.ú.T....~*.t..>T..u.ú.T 0000C0
1948068E FC76FFFE 76FF1A56 36FF1A58 36FF0676 FF1A5436 FF1A3236 FF00011A ....62..6T..v..6X..6V..v±.v*..H. 0000E0
48068E1A 5636FF1A 5836FF14 75001A2A 3E831B74 00FA7E80 0EC48304 E01EFF26 &..Å..á..~*.t..>*..u..6X..6V...H 000100
8E1A5636 FF1A5836 FF147500 1A543E83 1B74001A 2A3E8304 C48304E4 1EFF2619 .&..ö..á..>*..t..>T..u..6X..6V.. 000120
FF1B741A 4A06081A 36A10000 1BBA06C7 081A4606 8304C483 04EC1EFF 26194806 .H.&..š..á...F..ú.¤...À6...J.t.. 000140
29E80E50 C02B02EB 0001B805 74C00B04 C48304F0 1EFF2619 48068EFC 76FFFE76 v±.v*..H.&..Þ..á..ât.¦..Š.+áP.Ò) 000160
378B2606 468A1478 044FFF26 1A2C1EC4 3C75001A 523E8356 000000C8 90CBC901 .èù.à...V.>R..u<á.,.&.O.x..F.&.7 000180
754006C4 830A5501 1A9A0676 FF531A2E 36FF10EB E42A0488 2602478E 2607FF26 &..&.G.&..*ôŠ..6..S.v....U..á.àu 0001A0
06768B57 75001A52 3E835657 000002C8 90CBC95E 1A5006FF 9005EB1A 5206FF07 ...R.Š....P.^èù.à...WV.>R..uW.v. 0001C0
5206FF04 754006C4 830AB001 1A9A1B8C 36FF1A2C 36FF1A2E 36FF1BEB 507EF60B .~-PŠ..6...6,..6¥....§..á.àu...R 0001E0

Dump of file SATURN:[PCCOMMON.DUMP.DLL]SA-XFORM.DLL;1 on 18-APR-1990 10:51:47.49
File ID (443,15,0)   End of file block 48 / Allocated 48

Virtual block number 26 (0000001A), 512 (0200) bytes

2602478E 2607FF26 3F8B261B 8CA0047B 044FFF26 1A2C1EC4 1E7EC00B 4EC68B1A ..6N.à~.á.,..&.O.x&.¥.&.?&..&.G.& 000000
76885657 000002C8 CBC95F5E 1A500601 06468807 75001A52 3E8304EB E42A0588 ..*ôŠà.>R..u..F...P.^_èùà...WV.v 000020
830B2F01 1A9A5098 078A2606 5EC41A2C 36FF1A2E 36FF22EB 5E75001A 523E830A ..>R..u^Š".6...6,.á^.Ï...P.../.. 000040
065EC4CD 78044FFF 261A2C1E C42574C0 0B4EC68B 0646FF1A 5206FF04 754006C4 á.àu...R..F..6N.át%á.,.&.O.xëá^. 000060
88077500 1A523E83 CAEBE42A 05882602 478E2607 FF263F88 261A2C1E C4078A26 &..á.,.&.?&..&.G.&..*ôŠò.>R..u.. 000080
4689C02B F65689F4 46891A58 168B1A56 A1560000 0CC8CBC9 5F5E1A50 06010A46 F...P.^_èùà...VÀV....X..F¶.V-+á.F 0000A0
1BBA3E83 06762BF0 2BF84689 04C48307 6810869A F476FF52 1A5A368B FA4689FC *.F*.6Z̄R.v¶...h..á..F½+Þ+v..>¤. 0000C0
197520 3F 8026F45E C4227500 1A443E83 4E017508 1BBA3E83 08EB02EE 83057510 .u..Y.Š..>¤..u.N.>D..u"á^¶&.?-u. 0000E0
0B743018 8C3E83F8 4EFF02C4 83FE71E8 0E509807 8A26F446 FF127530 1BBC3E83 .>¥.0u..F¶&...P.Òq±.á..N½.>¥.0t. 000100
FF077400 1BBA3E83 0066E80E FA46FF07 7400067E 831B7400 1A443E83 077EF60B .~-.>D..t..~..t..F*.Òf..>¤..t.. 000120
7500FA7E 830A7400 067E8302 C483FE7E E80E5629 75001A44 3E830070 E80EFC46 F*.Òp..>D..u)V.Ò~±.á..~..t..~*.u 000140
0EF476FF F676FFF8 76FF0040 E80E0475 00FC7E83 0A74001B BA3E8300 39E80E04 ..Ò9..>¤..t..~*.u..Òà..v½.v~.v¶. 000160
3E83C8C9 5E02C483 FE38E80E 5600201B BC06C70E 74001A44 3E8306C4 83FEB5E8 Òç±.á..>D..t.ú.¥..V.Ò8±.á.^èù.> 000180
8302C483 FDCBE80E 306ACB02 C483FDD2 E80E5000 20B803EB 002BB805 74001A36 6..t.¦+.Š.¦ .P.Òð».á.ùjÒ.Òà».á.. 0001A0
06C8CB02 C483FDAA E80E5000 788803EB 0058B805 74001A32 3E831775 101BBA3E >¤..u..>2..t.¦X.Š.¦X.P.Ò¯».á.ùà. 0001C0
46FF021A 46068337 8B261A46 1EC41275 2A3F8026 0A5EC400 01FE46C7 56570000 ..WVúF±..á^.&.?*u.á.F.&.7..F...F 0001E0

Dump of file SATURN:[PCCOMMON.DUMP.DLL]SA-XFORM.DLL;1 on 18-APR-1990 10:51:47.49
File ID (443,15,0)   End of file block 48 / Allocated 48

Virtual block number 27 (0000001B), 512 (0200) bytes

FA468807 8A260A5E 88F62B0A 46FFFFFF FE46C708 75203F80 260A5EC4 9060EB0A .Š'.á^.&.?-u.úF±...F.+-.^.&...F* 000000
39308026 06EBFB88 00301B8C 06C70675 303C0A75 1A4C3639 3B7F393C 3F7C303C <0|?<9.;96L.u.<0u.ú.¥.0..«Š.&.=9 000020
0A7E890F 7D303D80 2647F18B 30E983C8 03E1D1CE 0302E1C1 CE889805 8A261B7F ..á....ôêÃ..öiÃ.à.Ö0.þG&.=0)Ö.-. 000040
88570000 04C8CBC9 5F5E0C56 8B0A468B 37892606 5EC4F08B EEF7FE46 8B0C468C .F..F±¼Y.Þá^.&.7.F..V.^_èùà...W¦ 000060
890001B8 F4750038 26117400 3D802647 01EBFC7E C4064E8A FE5EBCFC 468900BC ¥..F*.^±.N.á~*Š.G&.=.t.Ž8.u¶¦... 000080
00FFFF9A 5016C48B 50EC8855 90CBC95F C02BFE46 8CFC7E89 9009EBFE 468CFC7E ~*.F±Š...~*.F±+á.èù.U.ŠP.á.P.... 0000A0
B80A1911 E09A03B6 E80021E8 0000FFFF 9A00C268 1E00C468 1E16FEA3 E0865800 .X.Àɱ..há..hô.¯....Òì.ÒÑ..À...¦ 0000C0
068EFF33 000DBB1E 00CA16FF 00FF6800 4A00FA9A 003D00A6 9A50CB5D E5880001 ...¦]ùP.Ì.*..*.J.h....ò..£..3... 0000E0
330874CA 88A6F3CB 88D18804 CEBE3174 003D8026 47017500 3080267F FFB900C4 á.¿..&.*.u.G&.*.t1/ö..Ì.ù¥Ì.òt.3 000100
C20A0572 412CAC92 C4E0C00E 72412CAC 1705BF1F F7B8071E 061CEBE7 74AEF2C0 á·ÜtóŠ.....¼.¢..¯Ar.áÀ..¯,Ar..ô 000120
00FFB804 DC1EFF04 74002^DE 3E83004F 0DFA9A50 00FCB8EC 885500C3 1FEDEBAA ¯ŠÜ.ú.U.$¦*.P.*.O..>8..t...É.¦.. 000140
74C23BAD 19528E06 5688C08E D88E01B5 B85756EC 8855CB5D E58800B0 00FA9A50 P.*.¯..¦]ùU.ŠVW¦ç..Ä.á.V./R.Ù;ôt 000160
76FF57EC 88550002 CA5DE588 5E5F96EB EBF788AE F2FFFFB9 C033970C 74964010 .à.t..3á¿..·Ò.¼ŠŠ._^.¦]ò..U.ŠW.v 000180
521E5300 02B8C48B 5049D1F7 AEF2FFFF B9C033FA 88921F74 C00B00C4 00CA9A06 ..ò.á..át...*3á¿..¯Ò¼1IP.áÉ..S.R 0001A0
B9990500 2D044688 191606FF 000004C8 0002CA5D E5885F5B 0000FFFF 9A501651 Q.P.....[_.¦]ò..à........F.-...¿ 0001C0
02C4830E 04139B9A 020068FE 5E8CFC46 8910F405 E001C103 E001C88B F9F7000C ..¼*.àÌÁ.ËÌÁ.¶..F*.^±h........á. 0001E0
```

Dump of file SATURN:[PCCOMMON.DUMP.DLL]SA-XFORM.DLL;1 on 18-APR-1990 10:51:47.49
File ID (443,15,0)   End of file block 48 / Allocated 48

Virtual block number 28 (0000001C), 512 (0200) bytes

```
9021EB02 000247C7 26FC5EC4 080A4F80 261174D0 0B085789 26064789 26045EC4 á^.&.G.&.W..Åt.&.O..á^=&úG...Š!. 000000
00010247 C726FC5E C4085789 26064789 2640FE56 8BFC468B 040A4F80 26045EC4 á^.&.O...F=.V±@&.G.&.W.á^=&úG... 000020
065E8BEC 8B55C3C9 00000447 C7260257 89260789 2608578B 2606478B 26045EC4 á^.&.G.&.W.&..&.W.&úG...èùU.š.^. 000040
0C76FF08 76FF0A76 FF53CC8B 04EC8304 78E9046C E9C03300 098A0872 17031E3B ;...r.¤..3àÒl.Õx..š..äS.v..v..v. 000060
5E8B0CEC 83EC8B55 00CB5DE5 8BFD1705 A78091E1 75C0855A 590000FF FF9A5116 .Q.....YZ.áuÅ..Ì..».Í]ù.U.š.š..^ 000080
46805141 415151C9 33531274 20170587 F6042BE9 C0330009 BA087217 031E3806 .;...r.¤..3äÕ+.-... t.S3èQQAAQ.F 0000A0
FC4689FE 4689C033 0856C50A 468EFA5E 8C667480 170587F6 00000EE3 9A5016F4 ¶.P.D...-....tf.^ª.F.éV.3ä.F±.F= 0000C0
8BE22B00 808ADC8B 02EC833B 75AEF20A B049E30C 4E8BF866 89F28BFA 8B5657FC =WV.ª.·.f½.N.DI¯.·Úu;.š..Ė¤..+ã. 0000E0
0375FB3B 00B0009A E9002BE8 F4E2AA1A 74FB3B0D 740A3CAC 0C4E8B07 16FA8BD4 å.ª...N.¯<.t.;«t.`ã¶Ó+.Õ..¯.;«u. 000100
10CC9AFF FC8B7AEB 0093E9FA 5E8E5F5E E1EB0014 E8E2EBFC 46FF0A80 AA001FE8 Ò..`¯..F=ŠäÒ..ŠÄ^_.^ªÕ..Šz¡=..ä. 000120
0800000E 249A5016 F4468D51 521E5306 5E8B1FE3 CA2BCF8B 1F061E51 53500E58 [.PSQ....ü+ÒD..^.Š.RQ.F¶.P.$.... 000140
7400603D 1874C00B 08C4831F C3FA8B58 5B591F07 740B08FE 5E01F45E 8B1175C0 âu..^¶.^±.Ût..Y[X.ªû..á..ât.=m.t 000160
5E8E0E74 40170587 F6FE5E8E 26EBF900 20BA03EB 001CBA08 7500098A 00013D00 .=..¤..u.¤..Š.¤ .ªŠ&.^±-...@t..^ 000180
8E5F5EF8 668BFC46 28FE468B 06EBF9C0 33001CBA 0EEBF803 751A3F80 085E880A ..^..?.u.½Š.¤..3äªŠ..F±+F=.f½^_. 0001A0
46805152 1E530856 C51EEEE8 C18B0475 C90B0C4E 88030FE9 CB5DE58B 0472FA5E ^ªr..Í]ùÒ...N..èu..êŠŸ.éV.S.RQ.F 0001C0
EB001CBA CC750009 8A000130 0D740060 3D1774C0 081F071E 00000FB8 9A5016F4 ¶.P.£.......ât.=m.t.=..¤..uä¤..Š 0001E0
```

Dump of file SATURN:[PCCOMMON.DUMP.DLL]SA-XFORM.DLL;1 on 18-APR-1990 10:51:47.49
File ID (443,15,0)   End of file block 48 / Allocated 48

Virtual block number 29 (0000001D), 512 (0200) bytes

```
1CBAA6EB 02751A3F 80260A8B 0A744017 0587F6B7 75C00BF4 468BC2EB 0020BAC7 ú¤ .Šô.F¶.âuñ-...@t..Õ&.?.u.ŠÌ¤. 000000
8B5500CB 50FA8B91 49D1F7AE F2FFFFB9 C033067E C4D78BEC 8B5500A3 EBC03300 .3äŠÈ.U.š.=á~.3ä¿..·Ü¼Í|..ª]ù.U. 000020
05744017 0587F60C 7C00FB83 117D1703 1E3B065E 8BEC8B55 0442E900 B35756EC ÈVW°.Õ8.U.š.^.;...)..«.|.-...@t. 000040
A1CB5152 E38B0572 04FE1E3B 0872D82B DC8B5A59 00CB50E5 8BC03302 EB0001B8 ¡..Š.3á.Í]ù.YZ.Ê+Är.;.±.r..DRQùÀ 000060
1653C48B 50B71705 A7800488 520002B8 04FA2EFF 5152FC5C E9C03305 754004FA ª.@u.3äÕ\=RQ..ª.Ê..R.å.Ì..ñP.áS. 000080
4817058F 08088106 7500023D 07740001 30408112 7558C00B 0000FFFF 9A521650 P.R.......âXu.Ÿ@=..t.=..u.Ÿ.....K 0000A0
C28C1936 06C401AE E9037319 2E1EFFDB 33C28C19 3206C41E E319300E 885AD479 yåZ..0.D.á.2..ô3Ü....s.ÕÜ.á.6..ô 0000C0
74193E3D 193AB800 73E8193A BF193ABE 007CE819 3ABF193A BE192E1E FF0003B8 £......ƒ:.¢:.Ò|.ƒ:.¢:.Òs.¡:.=>.t 0000E0
6A006A03 6A0051E8 193EBF19 3ABED8BE 0D0088C3 0000FFFF 9A116068 0E016A0B .j..hm......û¡Å..Äƒ:.¢>.ÒQ.j.j.j 000100
EC8B5503 E80031E8 193EBF19 3ABE003A E81B8EBF 1B8EBEEC 8B550000 11689A00 ..h...U.ãƒƒ.¢ƒ.Ò:.ƒ:.¢>.Ò1.Š.U.ã 000120
0E8B0000 FFFF9A50 06468A50 C033001A E8193EBF 193EBE00 23E8193E BF193EBE ƒ>.¢>.Ò#.ƒ>.¢>.Ò..3âP.F.P........ 000140
00C3EEEB 1DFFF274 02450B05 8804EF83 0E73F73B C3192E1E FF0002B8 07E31930 0.D.£.......û;½s..ÿ....E.t·..ŠŸû. 000160
89F25689 F04689C0 2B00C416 8800F0E9 037500C4 3639FF2B F6285657 000014C8 å...WV+-+.96á.u.Õb...á.+å.FÞ.V·. 000180
FE814619 74C0080A C4831254 14AE9A04 CE681EF6 76FFF876 FF0C6AF8 5689F646 F-.V½j..v½.v-.hö..Ü.T..á..ât.F.± 0001A0
003F8026 F646FFF6 5EC40CEB 47EA7500 3F8026F6 46FFF65E C4008CE9 03767FFF ..v.Õ¥.á^-.F-&.?.uõGŠ.á^-.F-&.?. 0001C0
56EE5689 EC468904 C4831263 14569A04 6A500145 8DBA7500 3F8026F6 5E8BF475 u¶.^-&.?.u¤.E.Pj..V.c..á..Fš.VŸV 0001E0
```

Dump of file SATURN:[PCCOMMON.DUMP.DLL]SA-XFORM.DLL;1 on 18-APR-1990 10:51:47.49
File ID (443,15,0)   End of file block 48 / Allocated 48

Virtual block number 30 (0000001E), 512 (0200) bytes

```
EC468B66 74C20BFC 46886074 EE460BEC 468BFE56 89FC4689 02C48312 9913989A ......á..F=.V±.Fš.FŸtm.F=.ôtf.Fš 000000
C00B0AC4 830FA014 AE9A04CE 681EF076 FFF276FF 0C6A1900 16891908 A3EE568B .VŸÈ......j..v·.vÞ.hö..Û....á..â 000020
C4078A26 F046FFF0 5EC404EC 46830257 89260789 26FE568B FC468BEC 5EC42C74 t,á^š.F=.V±&..&.W..Fš.á^Þ.FÞ&..á 000040
3F8026F0 5EC4F475 003F8026 F046FFF0 5EC4E8E8 0E74C00A 078826FC 46FFFC5E ^=.F=&...ât.ŠÒá^Þ.FÞ&.?.u¶á^Þ&.? 000060
0C090C08 0C070906 00051804 02030202 1601FA58 E90002B8 90CBC95F 5EA77500 .uÌ^_èù.¡..ÕXª................... 000080
006C0B59 00570053 00520243 00410235 02121211 0010120F 1600160C 080B070A .................5.A.C.R.S.W.Y.l. 0000A0
FA168917 01A31608 00000B07 02CE0BA4 00840982 0A810A80 16060972 1C70206D m p.r...........Ê.ö.■.....Ê....ª 0000C0
75E40A00 24B912EE BB1701A3 CB5DE58B 99FFFFB8 0008E8CB 5DE58B99 FFFFB816 .¡....Í]ùÒ..¡....Í]ùÊ..£Ÿ.¿$..ðu 0000E0
01478A2E 430176CA 3C0472BC 3C430A76 243C0472 133CF7E2 43431674 073A2E1B ..:.t.CCã¼<.r.<$v.C<¥r.<òv.C..G. 000100
EC83EC8B 55CB5DE5 8B01FE4F 80260574 C30BC08C 065EC4EC 8B5500C3 16FAA398 .Èª.ù.U.ãá^..á.ût.&.O±..Í]ùU.š.ã 000120
E8157500 82E81922 A3127400 25E80875 0019223E 831E73FF F1300646 8B575602 .VW.F.=þ.s..>".u.Ò%.t.È".Ò..u.Ò 000140
065E3900 F08BCB50 E58B5E5F 02C48312 1415A09A 0676FF0B 750078E8 05740018 ..t.Òx.u..v.......á._^.Í]ùÈÞ.9^. 000160
08C48313 CF174C9A 5002B051 0E4F8050 501EC033 FE5EB9FE E3834306 5E880776 v..^.C.D±.^±3å.PP.O.Q¯.P.L.ü..á. 000180
08A3C033 088EFE5E 880008A3 DA8E0574 D2081926 A3192416 87C28B38 74FFFA83 .ª.t8.ô..$.È&..øt..ÕÈ...^±.Ä3ãÈ. 0001A0
8CC31FD8 8C0006A3 00000500 0AA30147 800002A3 0000A300 0AB80C47 89484800 .HH.G.¡..È..È...G.È.....È...Ä.ü. 0001C0
0876FF00 6A560000 0AC8C309 8EC18CD2 0B019AE8 19261E8E DB33064E 8BC08ED8 Ä.å.N.3Ü..&.Ò...ø.ê.Ìûà...Vj..v. 0001E0
```

```
Dump of file SATURN:[PCCOMMON.DUMP.DLL]SA-XFORM.DLL;1 on 18-APR-1990 10:51:47.49
File ID (443,15,0)   End of file block 48 / Allocated 48

Virtual block number 31 (0000001F), 512 (0200) bytes

 56F8768B 902FE899 C02B0674 FFFFC2F7 FA5689F8 46891483 184A9A06 76FF006A j..v..J....F½.V•%ô..t.+ä.$/..v½V 000000
 C48313FB 18029A50 FE76FF00 6A561274 D008FE56 89FC4689 02C48314 9C13989A ......á..F=.V±.Àt.Vj..v±P...«..á 000020
 F78B067E C4D98B27 E30E4E88 1E5657EC 8B5590CB C95EFE56 8BFC468B 9007E808 .Š...F=.V±^èù.U.šWV..N.D'.1á-..¾ 000040
 D1F74949 04740477 FF453A26 C933FF44 8AA6F30A 76C5FE8B CB0309F7 AEF2C033 3â·Ú%).ù.±év.µ].D.3è&:E.w.t.II%I 000060
 1374C00A 93FC071E 570A7EC5 1E085688 06468B0E 4E8800CB 5DE58B5F 5E1FC18B .ê.^_.[]ù..N..F..V..é~.W..=..ät. 000080
 F793F1F7 0274C00B D23392F7 8BDAF700 D283DBF7 AA2DB00A 79D2080E 750AF983 .•.u..@y.¯-¨%Ú.@.%Ö.%.30.ât.%þ.% 0000A0
 3B01448D FF448805 86AC4F05 88E275C3 0BC28BAA 27040276 393C3004 D38792F1 þ..Æ.0<9v..'`.ô.ûuã..O¯...D..D.; 0000C0
 1CEBF62B FC5E8CFA 46890500 B8560000 06C800C8 5DE58B5E 5F1F580A 8CF272C7 úr·.ÖX._^.[]ù.à...V|...F•.^=+-Š. 0000E0
 8B16EEA1 0CFA4683 46017440 04C48314 68187E9A 53060E74 830A47F6 26FA5EC4 á^•&-G..t..S.-.h..á.@t.F.F•.ÀY.. 000100
 CB5DE58B 01FE4F80 04740B0B 065E88EC 8B5590CB C95EC68B D876FA46 3916F016 .Þ.9F•vÀ.6^èù.U.š.^..Ût..O±..[]ù 000120
 A3FE2440 24EB99C0 33057501 76E80005 88071E29 75003F83 1918BB57 56EC8B55 U.$VWE...?.u)..|..Òv.u.3â.$$@$±È 000140
 0009E8C0 8ED88C06 4E8B191E 3689FFFE FE44C704 C6830001 04C79619 1AA31918 ..È...ú....ó.úD±±..6...N..Ä.êO.. 000160
 48437401 A8FE8BAD FC02778B F273EEF9 83FEE180 FA744100 D0E9CB5D E58B5E5F _^.[]ùÖÄ.At•.Ä±.•Ys·.w.•Ù.±´.tCH 000180
 89F9030C 74FE88E6 EBFE4489 F78B0002 05C20335 7401A8AD F0030088 1573C13B ;ês..Å.ÞÙ´.t5.ô....%.D±Š].±t..•. 0001A0
 7F891926 1E8C2605 74D13811 6EB9DA8C C68BFE4C FEF90305 EB058948 C12BFE4C L±+êH.:Š..•±L±.6.Ö¿n.;ìt.&..&... 0001C0
 03D0888C 73C13B48 FE8BF274 01A8ADF0 03FE8B25 74FFFE3D 02192A06 C626C302 .û&ó.•..=±.tX.±.ÞÙ´.t·.±H;ès¥.Å. 0001E0

Dump of file SATURN:[PCCOMMON.DUMP.DLL]SA-XFORM.DLL;1 on 18-APR-1990 10:51:47.49
File ID (443,15,0)   End of file block 48 / Allocated 48

Virtual block number 32 (00000020), 512 (0200) bytes

 0EFE2615 EBD88E04 74C00808 478BE6EB FE4489F7 8B000205 C203E274 01A8ADF0 ÞÙ´.tã.ò....%.D±Š].G..ât..ÄŠ.&±. 000000
 C638006B E8C03306 778BBBEB 37881922 1E8E2605 74C73816 33BFD88C 1274192A *.t..Äe3.;ût.&.."..7ŠE.w.3äÒk.;ó 000020
 C13B1687 B9D88C98 EB4E4E96 0574001D E8FE4DFE 0074005F E8984040 01240074 t.$.@@.Ò_.t.±M±Ò..t..NNŠ..Ä¿..;ê 000040
 267FFFBA 414149C8 2B037401 A8FE458B 51C399C0 33024789 07881926 A3260474 t.&È&....G.3ä.ûQ.E±´.t.+àIAAo..& 000060
 F7087500 0CE8C62B C22302F7 0D72C203 1572C603 C18BF575 EAD10476 1928163B ;.(.v.ìõu¥.ê.ór..ór.%@#ô+6Ò..u.% 000080
 8B067789 FFFEFE44 C7F203F0 8BFE8857 1874001D E85152C3 59C033E5 75EAD1D2 @ìõu[3äYûRQÒ..t.W.±.Þ.·ûD±±..w.. 0000A0
 C483156F 174C9A1F 06500001 8B505252 1ED23350 53C35A59 58FE5589 4AD72BD6 @+■J.U±XYZûSP3@.RRP|..P...L.o..á 0000C0
 46880856 8800CCBF 3875000A 7E830657 56EC8855 C3D20B02 745B5A1F FFFA8308 ..•..Z[t..@ûU.$VW..~..uB¢ä..V..F 0000E0
 003EE856 0E468902 44880074 F73B1174 4804CC36 8B4CEB27 720057E8 07754806 .Hu.ÒW.r'ŠL.6ë.Ht.;¼t..D..F.VÒ>. 000100
 9A50C033 501652C4 8B5021EB 99FFFFB8 0675D208 047304CC FE8104C6 8334735E ^s4.6..±ë.s..@u.|...ŠlP.6R.P3âP. 000120
 4E88CB5D E58B5E5F 07C03303 8B04CC36 89025C89 1489E675 C085F95B 0000FFFF ....[•.âul...\..6ë..Æ3â._^.[]ù.N 000140
 F738C18E D38B2672 1C03DA8B 2CEBF9F2 7504CCFE 8104C683 0C74024C 39F78B0E ..%9L.t..ó..±ä.u·•Š,.Ö..r&.Æ.ê;¼ 000160
 D18B0487 9200C616 890475F7 3BDE75C0 850000FF FF9A5153 137300C6 1E390675 u.9.6.s.$Q......âuB;¼u...ó.....Ì 000180
 D12BD187 D103D323 DB1BD128 0C740AF7 D78B067E C45738E3 0C4E88EC 8B5500C3 û.U.$.N.D8Wé-..■¼Öt.+Ì.Ù#Æ.Ì.Ì+Ì 0001A0
 F3C913AB F3E9D1C3 8EFFFFC3 81C38C10 E3D187AA F3C913AB F3E9D1E0 8A0A468B .F..ÀìÕµ¨.èµ¯.ÌD..û.û...ûìÕµ¨.èµ 0001C0
 8BE3F706 46880875 0A5E8BD8 080C5E88 08468BEC 8B55CB5D 08568806 46885FAA ¯_.F..V.]ûU.š.F..^..Ä.^.u..F.%D. 0001E0

Dump of file SATURN:[PCCOMMON.DUMP.DLL]SA-XFORM.DLL;1 on 18-APR-1990 10:51:47.49
File ID (443,15,0)   End of file block 48 / Allocated 48

Virtual block number 33 (00000021), 512 (0200) bytes

 04C80008 CA5DE58B D103E3F7 06468BC8 030C66F7 06468BC8 8BE3F700 08CA5DE5 []ò..%D.à.F.%f..à.F.%D.Ì.[]ò..à. 000000
 B9990500 2DC38B15 75080A47 F6265575 023C0324 0A478A26 065EC4F6 28560000 ..V+-á^.&.G.$.<.ûU&-G..u..û-...¿ 000020
 50287EC0 0BFC4689 06472B26 07882606 5E883974 0110F487 F606D86B F9F7000C ..%•kÄ.-.¶..t9.^.&..&+G..F•.â~(P 000040
 26065EC4 0B74FC46 3B08C483 173C0EF8 9A50E42A 0B478A26 0677FF26 0877FF26 &.w.&.w.&.G.*ôP.%.<..á.;F•t.á^.& 000060
 88000004 47C72602 57892607 89260857 8B260647 8B26065E C4FFFFBE 200A4F80 .O. ƒ..á^.&.G.&.W.&..&.W.&úG.... 000080
 00020000 000818D2 00020007 00031182 01030005 0003118A 0103000C CBC95EC6 6^èù....¤...............@....... 0000A0
 0203003A 00030F24 01030026 000317E8 01030022 000317A0 01030000 000A16BC ¥..........."...Š...&...$...:... 0000C0
 0103005B 00030D30 01030088 00031835 01050040 00031104 01030282 000C1044 D...........M...S.......O...[... 0000E0
 542D6E75 5220534D 00000000 00000000 00000000 00000000 0000005C 00030D1D ....\..................MS Run-T 000100
 38383931 20296328 20746867 69727970 6F432020 20797261 7262694C 20656D69 ime Library - Copyright (c) 1988 000120
 656E6547 0020656C 646E6148 00000011 70726F43 2074666F 736F7263 694D202C , Microsoft Corp....Handle .Gene 000140
 25732500 73257325 006E6F69 736F6C70 78652073 7365636F 72500020 65746172 rate .Process explosion.%s%s.%s% 000160
 22732522 00227325 2200776F 6C662074 63656E6E 6F636552 00002273 25220073 s."%s"..Reconnect flow."%s"."%s" 000180
 6E280000 22732522 00797261 646E756F 62207373 65636F72 7020656B 61400000 ..Make process boundary."%s"..(n 0001A0
 19481BC0 119D1BC0 1BC00000 00000000 23202D2B 00296C6C 756E2800 296C6C75 ull).(null).+- #......â.â...â.H. 0001C0
 00000000 00000000 00000000 00000000 00000000 00000000 00000000 00000000 ................................ 0001E0
```

```
Dump of file SATURN:[PCCOMMON.DUMP.DLL]SA-XFORM.DLL;1 on 18-APR-1990 10:51:47.49
File ID (443,15,0)   End of file block 48 / Allocated 48

Virtual block number 34 (00000022), 512 (0200) bytes

00000000 00000000 00000000 00000000 00000000 00000000 00000000 00000000 ................................ 000000
00000000 00000000 00000000 00000000 00000000 00000000 00000000 00000000 ................................ 000020
00000000 00000000 00000000 00000000 00000000 00000000 00000000 00000000 ................................ 000040
00000000 00000000 00000000 00000000 00000000 00000000 00000000 00000000 ................................ 000060
00000000 00000000 00000000 00000000 00000000 00000000 00000000 00000000 ................................ 000080
00000000 00000000 00000000 00000000 00000000 00000000 00000000 00000000 ................................ 0000A0
00000000 00000000 00000000 00000000 00000000 00000000 00000000 00000000 ................................ 0000C0
00000000 00000000 00000000 00000000 00000000 00000000 00000000 00000000 ................................ 0000E0
00000000 00000000 00000000 00000000 00000000 00000000 00000000 00000000 ................................ 000100
00000000 00000000 00000000 00000000 00000000 00000000 00000000 00000000 ................................ 000120
00000000 00000000 00000000 00000000 00000000 00000000 00000000 00000000 ................................ 000140
00000000 00000000 00000000 00000000 00000000 00000000 00000000 00000000 ................................ 000160
00000000 00000000 00000000 00000000 00000000 00000000 00000000 00000000 ................................ 000180
00000000 00000000 00000000 00000000 00000000 00000000 00000000 00000000 ................................ 0001A0
00000000 00000000 00000000 00000000 00000000 00000000 00000000 00000000 ................................ 0001C0
00000000 00000000 00000000 00000000 00000000 00000000 00000000 00000000 ................................ 0001E0

Dump of file SATURN:[PCCOMMON.DUMP.DLL]SA-XFORM.DLL;1 on 18-APR-1990 10:51:47.49
File ID (443,15,0)   End of file block 48 / Allocated 48

Virtual block number 35 (00000023), 512 (0200) bytes

00000000 00000000 00000000 00000000 00000000 00000000 00000000 00000000 ................................ 000000
00000000 00000000 00000000 00000000 00000000 00000000 00000000 00000000 ................................ 000020
00000000 00000000 00000000 00000000 00000000 00000000 00000000 00000000 ................................ 000040
00000000 00000000 00000000 00000000 00000000 00000000 00000000 00000000 ................................ 000060
00000000 00000000 00000000 00000000 00000000 00000000 00000000 00000000 ................................ 000080
00000000 00000000 00000000 00000000 00000000 00000000 00000000 00000000 ................................ 0000A0
00000000 00000000 00000000 00000000 00000000 00000000 00000000 00000000 ................................ 0000C0
00000000 00000000 00000000 00000000 00000000 00000000 00000000 00000000 ................................ 0000E0
00000000 00000000 00000000 00000000 00000000 00000000 00000000 00000000 ................................ 000100
00000000 00000000 00000000 00000000 00000000 00000000 00000000 00000000 ................................ 000120
00000000 00000000 00000000 00000000 00000000 00000000 00000000 00000000 ................................ 000140
00000000 00000000 00000000 00000000 00000000 00000000 00000000 00000000 ................................ 000160
00000000 00000000 00000000 00000000 00000000 00000000 00000000 00000000 ................................ 000180
00000000 00000000 00000000 00000000 00000000 00000000 00000000 00000000 ................................ 0001A0
435F00CC 00000000 00000000 00000000 00000000 00000000 00000000 00000000 .............................ä._C 0001C0
04EA12E8 04E612E8 04E212E8 FFFF12E8 00000000 00304F46 4E495F45 4C49465F _FILE_INFO=.....Ò...Ò.ã.Ò.Ì.Ò.Ó. 0001E0

Dump of file SATURN:[PCCOMMON.DUMP.DLL]SA-XFORM.DLL;1 on 18-APR-1990 10:51:47.49
File ID (443,15,0)   End of file block 48 / Allocated 48

Virtual block number 36 (00000024), 512 (0200) bytes

00000000 00011946 00000000 05080000 0200FFFF FFFF0101 00000000 04EE12E8 Ò.Ÿ.....................F....... 000000
00000000 00000000 00000000 02020000 00000000 00000000 01020000 00000000 ................................ 000020
00000000 00000000 00000000 00000000 00000000 00000000 00000000 00000000 ................................ 000040
00000000 00000000 00000000 00000000 00000000 00000000 00000000 00000000 ................................ 000060
00000000 00000000 00000000 00000000 00000000 00000000 00000000 00000000 ................................ 000080
00000000 00000000 00000000 00000000 00000000 00000000 00000000 00000000 ................................ 0000A0
00000000 00000000 00000000 00000000 00000000 00000000 00000000 00000000 ................................ 0000C0
00000000 00000000 00000000 00000000 00000000 00000000 00000000 00000000 ................................ 0000E0
00000000 00000000 00000000 00000000 00000000 00000000 00000000 00000000 ................................ 000100
00000000 00000000 00000000 00000000 00000000 00000000 00000000 00000000 ................................ 000120
00000000 00000000 00000000 00000000 00000000 00000000 00000000 00000000 ................................ 000140
00000000 00000000 00000000 00000000 00000000 00000000 00000000 00000000 ................................ 000160
00000000 00000000 00000000 00000000 00000000 00000000 00000000 00000000 ................................ 000180
00000000 00000000 00000000 00000000 00000000 00000000 00000000 00000000 ................................ 0001A0
00000000 00000000 00000000 00000000 00000000 00000000 00000000 00000000 ................................ 0001C0
00000000 00000000 00000000 00000000 00000000 00000000 00000000 00000000 ................................ 0001E0
```

```
Dump of file SATURN:[PCCOMMON.DUMP.DLL]SA-XFORM.DLL;1 on 18-APR-1990 10:51:47.49
File ID (443,15,0)    End of file block 48 / Allocated 48

Virtual block number 37 (00000025), 512 (0200) bytes

 00000000 00000000 00000000 00000000 00000000 00000000 00000000 00000000 ................................ 000000
 00000000 00000000 00000000 00000000 00000000 00000000 00000000 00000000 ................................ 000020
 00000000 00000000 00000000 00000000 00000000 00000000 00000000 00000000 ................................ 000040
 00000000 00000000 00000000 00000000 00000000 00000000 00000000 00000000 ................................ 000060
 00000000 00000000 00000000 00000000 00000000 00000000 00000000 00000000 ................................ 000080
 00000000 00000000 00000000 00000000 00000000 00000000 00000000 00000000 ................................ 0000A0
 00000000 00000000 00000000 00000000 00000000 00000000 00000000 00000000 ................................ 0000C0
 00000000 00000000 00000000 00000000 00000000 00000000 00000000 00000000 ................................ 0000E0
 00000000 00000000 00000000 00000000 00000000 00000000 00000000 00000000 ................................ 000100
 00000000 00000000 00000000 00000000 00000000 00000000 00000000 00000000 ................................ 000120
 00000000 00000000 00000000 00000000 00000000 00000000 00000000 00000000 ................................ 000140
 00000000 00000000 00000000 00000000 00000000 00000000 00000000 00000000 ................................ 000160
 00000000 00000000 00000000 00000000 00000000 00000000 00000000 00000000 ................................ 000180
 00000000 00000000 00000000 00000000 00000000 00000000 00000000 00000000 ................................ 0001A0
 00000000 00000000 00000000 00000000 00000000 00000000 00000000 00000000 ................................ 0001C0
 00000000 00000000 00000000 00000000 00000000 00000000 00000000 00000000 ................................ 0001E0

Dump of file SATURN:[PCCOMMON.DUMP.DLL]SA-XFORM.DLL;1 on 18-APR-1990 10:51:47.49
File ID (443,15,0)    End of file block 48 / Allocated 48

Virtual block number 38 (00000026), 512 (0200) bytes

 00000000 00000000 00000000 00000000 00000000 00000000 00000000 00000000 ................................ 000000
 00000000 00000000 00000000 00000000 00000000 00000000 00000000 00000000 ................................ 000020
 00000000 00000000 00000000 00000000 00000000 00000000 00000000 00000000 ................................ 000040
 00000000 00000000 00000000 00000000 00000000 00000000 00000000 00000000 ................................ 000060
 00000000 00000000 00000000 00000000 00000000 00000000 00000000 00000000 ................................ 000080
 00000000 00000000 00000000 00000000 00000000 00000000 00000000 00000000 ................................ 0000A0
 00000000 00000000 00000000 00000000 00000000 00000000 00000000 00000000 ................................ 0000C0
 00000000 00000000 00000000 00000000 00000000 00000000 00000000 00000000 ................................ 0000E0
 00000000 00000000 00000000 00000000 00000000 00000000 00000000 00000000 ................................ 000100
 00000000 00000000 00000000 00000000 00000000 00000000 00000000 00000000 ................................ 000120
 00000000 00000000 00000000 00000000 00000000 00000000 00000000 00000000 ................................ 000140
 00000000 00000000 00000000 00000000 00000000 00000000 00000000 00000000 ................................ 000160
 00000000 00000000 00000000 00000000 00000000 00000000 00000000 00000000 ................................ 000180
 00000000 00000000 00000000 00000000 00000000 00000000 00000000 00000000 ................................ 0001A0
 00000000 00000000 00000000 00000000 00000000 00000000 00000000 00000000 ................................ 0001C0
 00000000 00000000 00000000 00000000 00000000 00000000 00000000 00000000 ................................ 0001E0

Dump of file SATURN:[PCCOMMON.DUMP.DLL]SA-XFORM.DLL;1 on 18-APR-1990 10:51:47.49
File ID (443,15,0)    End of file block 48 / Allocated 48

Virtual block number 39 (00000027), 512 (0200) bytes

 00000000 00000000 00000000 00000000 00000000 00000000 00000000 00000000 ................................ 000000
 00000000 00000000 00000000 00000000 00000000 00000000 00000000 00000000 ................................ 000020
 00000000 00000000 00000000 00000000 00000000 00000000 00000000 00000000 ................................ 000040
 00000000 00000000 00000000 00000000 00000000 00000000 00000000 00000000 ................................ 000060
 00000000 00000000 00000000 00000000 00000000 00000000 00000000 00000000 ................................ 000080
 00000000 00000000 00000000 00000000 00000000 00000000 00000000 00000000 ................................ 0000A0
 00000000 00000000 00000000 00000000 00000000 00000000 00000000 00000000 ................................ 0000C0
 00000000 00000000 00000000 00000000 00000000 00000000 00000000 00000000 ................................ 0000E0
 00000000 00000000 00000000 00000000 00000000 00000000 00000000 00000000 ................................ 000100
 00000000 00000000 00000000 00000000 00000000 00000000 00000000 00000000 ................................ 000120
 00000000 00000000 00000000 00000000 00000000 00000000 00000000 00000000 ................................ 000140
 00000000 00000000 00000000 00000000 00000000 00000000 00000000 00000000 ................................ 000160
 00000000 00000000 00000000 00000000 00000000 00000000 00000000 00000000 ................................ 000180
 00000000 00000000 00000000 00000000 00000000 00000000 00000000 00000000 ................................ 0001A0
 00000000 00000000 00000000 00000000 00000000 00000000 00000000 00000000 ................................ 0001C0
 00000000 00000000 00000000 00000000 00000000 00000000 00000000 00000000 ................................ 0001E0
```

```
Dump of file SATURN:[PCCOMMON.DUMP.DLL]SA-XFORM.DLL;1 on 18-APR-1990 10:51:47.49
File ID (443,15,0)   End of file block 48 / Allocated 48

Virtual block number 40 (00000028), 512 (0200) bytes

00000000 00000000 00000000 00000000 00000000 00000000 00000000 00000000 ................................ 000000
00000000 00000000 00000000 00000000 00000000 00000000 00000000 00000000 ................................ 000020
00000000 00000000 00000000 00000000 00000000 00000000 00000000 00000000 ................................ 000040
00000000 00000000 00000000 00000000 00000000 00000000 00000000 00000000 ................................ 000060
00000000 00000000 00000000 00000000 00000000 00000000 00000000 00000000 ................................ 000080
00000000 00000000 00000000 00000000 00000000 00000000 00000000 00000000 ................................ 0000A0
00000000 00000000 00000000 00000000 00000000 00000000 00000000 00000000 ................................ 0000C0
00000000 00000000 00000000 00000000 00000000 00000000 00000000 00000000 ................................ 0000E0
00000000 00000000 00000000 00000000 00000000 00000000 00000000 00000000 ................................ 000100
00000000 00000000 00000000 00000000 00000000 00000000 00000000 00000000 ................................ 000120
00000000 00000000 00000000 00000000 00000000 00000000 00000000 00000000 ................................ 000140
00000000 00000000 00000000 00000000 00000000 00000000 00000000 00000000 ................................ 000160
00000000 00000000 00000000 00000000 00000000 00000000 00000000 00000000 ................................ 000180
00000000 00000000 00000000 00000000 00000000 00000000 00000000 00000000 ................................ 0001A0
00000000 00000000 00000000 00000000 00000000 00000000 00000000 00000000 ................................ 0001C0
00000000 00000000 00000000 00000000 00000000 00000000 00000000 00000000 ................................ 0001E0

Dump of file SATURN:[PCCOMMON.DUMP.DLL]SA-XFORM.DLL;1 on 18-APR-1990 10:51:47.49
File ID (443,15,0)   End of file block 48 / Allocated 48

Virtual block number 41 (00000029), 512 (0200) bytes

00000000 00000000 00000000 00000000 00000000 00000000 00000000 00000000 ................................ 000000
00000000 00000000 00000000 00000000 00000000 00000000 00000000 00000000 ................................ 000020
00000000 00000000 00000000 00000000 00000000 00000000 00000000 00000000 ................................ 000040
00000000 00000000 00000000 00000000 00000000 00000000 00000000 00000000 ................................ 000060
00000000 00000000 00000000 00000000 00000000 00000000 00000000 00000000 ................................ 000080
00000000 00000000 00000000 00000000 00000000 00000000 00000000 00000000 ................................ 0000A0
00000000 00000000 00000000 00000000 00000000 00000000 00000000 00000000 ................................ 0000C0
00000000 00000000 00000000 00000000 00000000 00000000 00000000 00000000 ................................ 0000E0
00000000 00000000 00000000 00000000 00000000 00000000 00000000 00000000 ................................ 000100
00000000 00000000 00000000 00000000 00000000 00000000 00000000 00000000 ................................ 000120
00000000 00000000 00000000 00000000 00000000 00000000 00000000 00000000 ................................ 000140
00000000 00000000 00000000 00000000 00000000 00000000 00000000 00000000 ................................ 000160
00000000 00000000 00000000 00000000 00000000 00000000 00000000 00000000 ................................ 000180
00000000 00000000 00000000 00000000 00000000 00000000 00000000 00000000 ................................ 0001A0
00000000 00000000 00000000 00000000 00000000 00000000 00000000 00000000 ................................ 0001C0
00000000 00000000 00000000 00000000 00000000 00000000 00000000 00000000 ................................ 0001E0

Dump of file SATURN:[PCCOMMON.DUMP.DLL]SA-XFORM.DLL;1 on 18-APR-1990 10:51:47.49
File ID (443,15,0)   End of file block 48 / Allocated 48

Virtual block number 42 (0000002A), 512 (0200) bytes

00000000 00000000 00000000 00000000 00000000 00000000 02000001 00000000 ................................ 000000
00000000 00000000 00000000 00000000 00000000 00000000 00000000 00000000 ................................ 000020
00000000 00000000 00000000 00000000 00000000 00000000 00000000 00000000 ................................ 000040
00000000 00000000 00000000 00000000 00000000 00000000 00000000 00000000 ................................ 000060
00000000 00000000 00000000 00000000 00000000 00000000 00000000 00000000 ................................ 000080
00000000 00000000 00000000 00000000 00000000 00000000 00000000 00000000 ................................ 0000A0
00000000 00000000 00000000 00000000 00000000 00000000 00000000 00000000 ................................ 0000C0
00000000 00000000 00000000 00000000 00000000 00000000 00000000 00000000 ................................ 0000E0
00000000 00000000 00000000 00000000 00000000 00000000 00000000 00000000 ................................ 000100
00000000 00000000 00000000 00000000 00000000 00000000 00000000 00000000 ................................ 000120
00000000 00000000 00000000 00000000 00000000 00000000 00000000 00000000 ................................ 000140
00000000 00000000 00000000 00000000 00000000 00000000 00000000 00000000 ................................ 000160
00000000 00000000 00000000 00000000 00000000 00000000 00000000 00000000 ................................ 000180
00000000 00000000 00000000 00000000 00000000 00000000 00000000 00000000 ................................ 0001A0
00000000 00000000 00000000 00000000 00000000 00000000 00000000 00000000 ................................ 0001C0
00000000 00000000 00000000 00000000 00000000 00000000 00000000 00000000 ................................ 0001E0
```

```
Dump of file SATURN:[PCCOMMON.DUMP.DLL]SA-XFORM.DLL;1 on 18-APR-1990 10:51:47.49
File ID (443,15,0)   End of file block 48 / Allocated 48

Virtual block number 43 (0000002B), 512 (0200) bytes

00000000 00000000 00000000 00000000 00000000 00000000 00000000 00000000 ................................ 000000
00000000 00000000 00000000 00000000 00000000 00000000 00000000 00000000 ................................ 000020
00000000 00000000 00000000 00000000 00000000 00000000 00000000 00000000 ................................ 000040
00000000 00000000 00000000 00000000 00000000 00000000 00000000 00000000 ................................ 000060
00000000 00000000 00000000 00000000 00000000 00000000 00000000 00000000 ................................ 000080
00000000 00000000 00000000 00000000 00000000 00000000 00000000 00000000 ................................ 0000A0
00000000 00000000 00000000 00000000 00000000 00000000 00000000 00000000 ................................ 0000C0
00000000 00000000 00000000 00000000 00000000 00000000 00000000 00000000 ................................ 0000E0
00000000 00000000 00000000 00000000 00000000 00000000 00000000 00000000 ................................ 000100
00000000 00000000 00000000 00000000 00000000 00000000 00000000 00000000 ................................ 000120
00000000 00000000 00000000 00000000 00000000 00000000 00000000 00000000 ................................ 000140
00000000 00000000 00000000 00000000 00000000 00000000 00000000 00000000 ................................ 000160
00000000 00000000 00000000 00000000 00000000 00000000 00000000 00000000 ................................ 000180
00000000 00000000 00000000 00000000 00000000 00000000 00000000 00000000 ................................ 0001A0
00000000 00000000 00000000 00000000 00000000 00000000 00000000 00000000 ................................ 0001C0
00000000 00000000 00000000 00000000 00000000 00000000 00000000 00000000 ................................ 0001E0

Dump of file SATURN:[PCCOMMON.DUMP.DLL]SA-XFORM.DLL;1 on 18-APR-1990 10:51:47.49
File ID (443,15,0)   End of file block 48 / Allocated 48

Virtual block number 44 (0000002C), 512 (0200) bytes

00000000 00000000 00000000 00000000 00000000 00000000 00000000 00000000 ................................ 000000
00000000 00000000 00000000 00000000 00000000 00000000 00000000 00000000 ................................ 000020
00000000 00000000 00000000 00000000 00000000 00000000 00000000 00000000 ................................ 000040
00000000 00000000 00000000 00000000 00000000 00000000 00000000 00000000 ................................ 000060
00000000 00000000 00000000 00000000 00000000 00000000 00000000 00000000 ................................ 000080
00000000 00000000 00000000 00000000 00000000 00000000 00000000 00000000 ................................ 0000A0
00000000 00000000 00000000 00000000 00000000 00000000 00000000 00000000 ................................ 0000C0
00000000 00000000 00000000 00000000 00000000 00000000 00000000 00000000 ................................ 0000E0
00000000 00000000 00000000 00000000 00000000 00000000 00000000 00000000 ................................ 000100
00000000 00000000 00000000 00000000 00000000 00000000 00000000 00000000 ................................ 000120
00000000 00000000 00000000 00000000 00000000 00000000 00000000 00000000 ................................ 000140
00000000 00000000 00000000 00000000 00000000 00000000 00000000 00000000 ................................ 000160
00000000 00000000 00000000 00000000 00000000 00000000 00000000 00000000 ................................ 000180
00000000 00000000 00000000 00000000 00000000 00000000 00000000 00000000 ................................ 0001A0
00000000 00000000 00000000 00000000 00000000 00000000 00000000 00000000 ................................ 0001C0
10E80000 00000000 00000000 00000000 00000000 00000000 00000000 00000000 ..............................ò. 0001E0

Dump of file SATURN:[PCCOMMON.DUMP.DLL]SA-XFORM.DLL;1 on 18-APR-1990 10:51:47.49
File ID (443,15,0)   End of file block 48 / Allocated 48

Virtual block number 45 (0000002D), 512 (0200) bytes

00000000 00000000 81818101 00000001 00000000 00000000 00000000 000000CE ö............................... 000000
00000000 00000000 00000000 00000000 00000000 00000000 00000000 00000000 ................................ 000020
00000000 00000000 00000000 00000000 00000000 00000000 00000000 00000000 ................................ 000040
00000000 00000000 00000000 00000000 00000000 00000000 00000000 00000000 ................................ 000060
00000000 00000000 00000000 00000000 00000000 00000000 00000000 00000000 ................................ 000080
00000000 00000000 00000000 00000000 00000000 00000000 00000000 00000000 ................................ 0000A0
00000000 00000000 00000000 00000000 00000000 00000000 00000000 00000000 ................................ 0000C0
00000000 00000000 00000000 00000000 00000000 00000000 00000000 00000000 ................................ 0000E0
0A0A0A0A 0A0A0A0A 0A0A0A00 00000000 00000000 00000000 00000000 00000000 ................................ 000100
0A0A0A0A 0A0A0A0A 0A0A0A0A 0A0A0A0A 0A0A0A0A 0A0A0A0A 0A0A0A0A 0A0A0A0A ................................ 000120
0A0A0A0A 0A0A0A0A 0A0A0A0A 0A0A0A0A 0A0A0A0A 0A0A0A0A 0A0A0A0A 0A0A0A0A ................................ 000140
0A0A0A0A 0A0A0A0A 0A0A0A0A 0A0A0A0A 0A0A0A0A 0A0A0A0A 0A0A0A0A 0A0A0A0A ................................ 000160
0A0A0A0A 0A0A0A0A 0A0A0A0A 0A0A0A0A 0A0A0A0A 0A0A0A0A 0A0A0A0A 0A0A0A0A ................................ 000180
0A0A0A0A 0A0A0A0A 0A0A0A0A 0A0A0A0A 0A0A0A0A 0A0A0A0A 0A0A0A0A 0A0A0A0A ................................ 0001A0
0A0A0A0A 0A0A0A0A 0A0A0A0A 0A0A0A0A 0A0A0A0A 0A0A0A0A 0A0A0A0A 0A0A0A0A ........................... ..... 0001C0
0A0A0A0A 0A0A0A0A 0A0A0A0A 0A0A0A0A 0A0A0A0A 0A0A0A0A 0A0A0A0A 0A0A0A0A ............................. ... 0001E0
```

```
Dump of file SATURN:[PCCOMMON.DUMP.DLL]SA-XFORM.DLL;1 on 18-APR-1990 10:51:47.49
File ID (443,15,0)    End of file block 48 / Allocated 48

Virtual block number 46 (0000002E), 512 (0200) bytes

00000000 00000000 0000000A 0A0A0A0A 0A0A0A0A 0A0A0A0A 0A0A0A0A 0A0A0A0A ................................ 000000
00000000 00002000 00000000 00000000 00000000 00000000 00000000 00000000 .......................... ...... 000020
4753404E 3C3CFFFF 19441942 1940193E FFFF04F2 154E0000 00000000 00000000 ..........N.·...>.@.B.D...<<NMSG 000040
0003000A 00776F6C 66726576 6F206863 61747320 200A0030 30303652 00003E3E >>..R6000..- stack overflow..... 000060
08000A0D 30207962 20656469 76696420 72656765 746E6920 200A0033 30303652 R6003..- integer divide by 0.... 000080
6120726F 66206563 61707320 6867756F 6E652074 6F6E2020 0A003830 30365200 .R6008..- not enough space for a 0000A0
6867756F 6E652074 6F6E202D 0A003930 30365200 09000A0D 73746E65 6D756772 rguments.....R6009..- not enough 0000C0
00FF000A 0D00FC00 0A0D746E 656D6E6F 7269766E 6520726F 66206563 61707320  space for environment...*...... 0000E0
74616F6C 66202D0A 0D323030 36520002 0020726F 72726520 656D6974 2D6E7572 run-time error ...R6002..- float 000100
193C0002 0003FFFF FF000A0D 64656461 6F6C2074 6F6E2074 6E696F70 20676E69 ing point not loaded..........<. 000120
00000000 00000000 00000000 0000000A 16F00002 00000009 05020002 00000008 ..............b................. 000140
0100442F 53040065 726F7453 0600776F 6C460500 01007373 65636F72 50080352 R..Process....Flow..Store..S/D.. 000160
25207972 61646E75 6F622073 7365636F 72502077 656E2064 65746165 72432000 . Created new Process boundary % 000180
00732520 7325206F 74207325 20776F6C 46206465 7463656E 6E6F6365 52100073 s..Reconnected Flow %s to %s %s. 0001A0
01000100 01000100 01000100 73252073 7365636F 72502064 65646F6C 70784514 .Exploded Process %s............ 0001C0
00000000 FFFF0001 000E0352 00000184 00000000 00000000 00000000 00000100 ................Ç...R........... 0001E0

Dump of file SATURN:[PCCOMMON.DUMP.DLL]SA-XFORM.DLL;1 on 18-APR-1990 10:51:47.49
File ID (443,15,0)    End of file block 48 / Allocated 48

Virtual block number 47 (0000002F), 512 (0200) bytes

00000000 0134FFFF 0100004F 00B40005 003C1400 0090011C 00170001 00000008 .............<...Ç.0.....4..... 000000
00000000 0000FFFF FFFF0101 003800AA 00160005 80030002 0138000F 00050000 ......8..........^.8............ 000020
00030000 00000000 FFFFFFFF 0102000A 00A0003C 000A8002 00040148 00120003 .....H.......<.................. 000040
00120003 00000000 0000FFFF FFFF0103 000A00A0 0030000A 80020004 015B001A ..[.......0..................... 000060
0189001B 00030000 00000000 FFFFFFFF 0104000A 00A00024 000A8002 00040176 v.......$....................... 000080
040001A5 00020003 00000000 0000FFFF FFFF0105 000A00A0 0018000A 80020004 ..........................É..... 0000A0
80020000 01A80006 00030000 00000000 FFFFFFFF 0001000C 00230005 00198003 ......#.....................´..... 0000C0
00738002 010001AF 00040003 00000000 0000FFFF FFFF0002 000C0023 00050046 F...#...................£.....s. 0000E0
74616D72 6F66736E 61727420 61206573 6F6F6843 FFFFFFFF 0106000C 00230005 ..#.........Choose a transformat 000100
65646F6C 7078457E 00736E6F 6974616D 726F6673 6E617254 00000003 006E6F69 ion.....Transformations.~Explode 000120
756F627E 20737365 636F7270 2077656E 20656B61 4D007373 65636F72 70206120  a process.Make new process ~bou 000140
6E6E6F63 65527E00 73746365 6A626F20 6F777420 65677265 4D7E0079 7261646E ndary.~Merge two objects.~Reconn 000160
48006C65 636E6143 004B4F00 776F6C66 206E6F69 74616D72 6F666E69 20746365 ect information flow.OK.Cancel.H 000180
00000000 FFFF0001 000E0352 00000108 00000000 00000000 00000000 00706C65 elp.................R........... 0001A0
00000000 000AFFFF 0200002D 00B40038 00671400 009000C2 00170001 00000005 ........ó.....g.8.Ç.-.....Ö..... 0001C0
00000000 0000FFFF FFFF0201 00080078 00200005 80000001 000E0018 00050000 ......8....... .x............... 0001E0

Dump of file SATURN:[PCCOMMON.DUMP.DLL]SA-XFORM.DLL;1 on 18-APR-1990 10:51:47.49
File ID (443,15,0)    End of file block 48 / Allocated 48

Virtual block number 48 (00000030), 512 (0200) bytes

00030000 00000000 FFFFFFFF 02020008 00AA0016 00058002 000C00F7 00000006 ....%........^................. 000000
00060003 00000000 0000FFFF FFFF0001 000C0023 0005001C 80020400 00F80003 ..½.........#............ ...... 000020
01030004 00030000 00000000 FFFFFFFF 0001000C 00230005 00498002 000000FC ª.....I...#.............. .... 000040
6F727020 746E6572 61702077 654EFFFF FFFF0203 000C0023 00050075 80020100 ....u...#.........New parent pro 000060
73736563 6F727020 746E6572 61702077 654E0000 00030065 6D616E20 73736563 cess name.....New parent process 000080
00000000 00000000 00706C65 48006C65 636E6143 004B4F7E 00003A65 6D616E20  name:..~OK.Cancel.Help......... 0000A0
00000000 00000000 00000000 00000000 00000000 00000000 00000000 00000000 ................................ 0000C0
00000000 00000000 00000000 00000000 00000000 00000000 00000000 00000000 ................................ 0000E0
00000000 00000000 00000000 00000000 00000000 00000000 00000000 00000000 ................................ 000100
00000000 00000000 00000000 00000000 00000000 00000000 00000000 00000000 ................................ 000120
00000000 00000000 00000000 00000000 00000000 00000000 00000000 00000000 ................................ 000140
00000000 00000000 00000000 00000000 00000000 00000000 00000000 00000000 ................................ 000160
00000000 00000000 00000000 00000000 00000000 00000000 00000000 00000000 ................................ 000180
00000000 00000000 00000000 00000000 00000000 00000000 00000000 00000000 ................................ 0001A0
00000000 00000000 00000000 00000000 00000000 00000000 00000000 00000000 ................................ 0001C0
00000000 00000000 00000000 00000000 00000000 00000000 00000000 00000000 ................................ 0001E0
```

```
Dump of file SATURN:[PCCOMMON.DUMP.DLL]SADADESK.TMP;1 on 18-APR-1990 10:51:54.61
File ID (902,31,0)   End of file block 102 / Allocated 104

Virtual block number 1 (00000001), 512 (0200) bytes

 00000000 00000040 00000000 000000B8 0000FFFF 00000004 0000005A 01A45A4D MZÊ.Z...........¡.......ã....... 000000
 00000080 00000000 00000000 00000000 00000000 00000000 00000000 00000000 ................................ 000020
 6F6E6E61 63206061 72676F72 70207369 685421CD 4C018821 CD09B400 0EBA1F0E ..¤..Ç.ël¦.LèlThis program canno 000040
 00000000 00000024 0A0D0D2E 65646F6D 20534F44 206E6920 6E757220 65622074 t be run in DOS mode....$....... 000060
 000C0024 00000000 00000000 00000000 00108009 0CC4D83F 001405AA 0505454E NE..ˆ...?Äá.................$... 000080
 00000000 00000000 00010014 00040000 0000063E 020E01F6 01B00160 0040002C ,.@.'.¯.-...>................... 0000A0
 1F540F00 1F5403D4 11C80F00 11C802AF 13780F00 1378015F 0E040F00 0E040067 g......._.x...x.È.à...à.Å.T...T. 0000C0
 009C0F00 009C0665 01B00F00 01B00646 023E0F00 023D0620 038E0F00 038E05E0 À.......¯.=...>.F.¯...¯.e....... 0000E0
 000A0F00 000A06C4 00920F00 009206B8 02160F00 02160694 01DE0F00 01DE0672 r.B...B.........¦.......á.Ö...Ö. 000100
 2DE00F21 2C4A0883 02020E21 00000000 1A440F00 1A4406D8 000F0F00 000F06D6 ø.......Ä.D...D.....!.....J,!.Å- 000120
 011B1EB1 011B0B9C 00ED1EB1 00ED088D 000A1EF1 000A0B8C 04201EF1 0420084A J. .þ. .....þ.....Ú.Ý.Ú.....Ý... 000140
 000A1EB1 000A08CA 00751EB1 007508C2 00801EB1 00800BBA 00C01EB1 00C00BAE Ô.â.Ý.â.¤...Ý...ô.u.Ý.u.ò.Ö.Ý.Ö. 000160
 00521EB1 00520BFD 00A01EB1 00A008F3 00E31EB1 00E30BE4 00BE1EB1 00BE0BD8 Ä.ƒ.Ý.ƒ.ð.Ð.Ý.Ð.µ...Ý...».R.Ý.R. 000180
 00700EB1 00700C31 01691EB1 01690C1A 000D1EB1 000D0C0C 00891EB1 00890C03 ....Ý.....Ï.Ý.Ï...i.Ý.i.1.p.Ý.p. 0001A0
 02881EB1 02880C7E 015D1EB1 015D0C68 01361EB1 01360C54 01BE1EB1 01BE0C38 ß.ƒ.Ý.ƒ,T.6.Ý.6.h.].Ý.].-...Ý... 0001C0
 00060005 00050005 00040005 00030005 00020005 00010005 01900003 01900001 ................................ 0001E0

Dump of file SATURN:[PCCOMMON.DUMP.DLL]SADADESK.TMP;1 on 18-APR-1990 10:51:54.61
File ID (902,31,0)   End of file block 102 / Allocated 104

Virtual block number 2 (00000002), 512 (0200) bytes

 01900008 000F0005 000C0005 000B0005 000A0005 00090005 00080005 00070005 ................................ 000000
 4B534544 1100004B 53454441 44415308 03000004 02580004 04000004 01000004 ..........X......SADADESK...DESK 000020
 0003454C 49464F52 50544547 4B534544 0E00024D 5448454C 49464F52 50544547 GETPROFILEHTM...DESKGETPROFILE.. 000040
 0025001F 00190010 00010000 04434F52 50574F44 4E49574B 53454441 44415312 .SADADESKWINDOWPROC...........%. 000060
 44085249 44525543 51534F44 0A4F4953 0300037D 035E0342 02ED0255 01390061 a.9.U.Ú.B.^.)...SIO.DOSQCURDIR.D 000080
 54414552 434D454D 00404540 03495047 4D50054E 49574D50 05534C4C 4143534F OSCALLS.PMWIN.PMGPI.MEM.MEMCREAT 0000A0
 4F4C4243 4F4C4C41 4D454D00 50414548 594F5254 5345444D 454D0E50 41454845 EHEAP.MEMDESTROYHEAP.MEMALLOCBLO 0000C0
 4F544554 41455243 4954475F 0E495447 0348434F 4C424545 52464D45 4D0C4B43 CK.MEMFREEBLOCK.GTI._GTICREATETO 0000E0
 54470A43 4F52504C 4F4F5446 45444954 470E4C4F 4F544C4C 49484954 470B4C4F OL.GTIKILLTOOL.GTIDEFTOOLPROC.GT 000100
 4C4F4F54 59524555 51495447 1247534D 444E4553 4954470A 47534D54 534F5049 IPOSTMSG.GTISENDMSG.GTIQUERYTOOL 000120
 59524555 51495447 12574F44 4E49574C 4F4F5454 45534954 4710574F 444E4957 WINDOW.GTISETTOOLWINDOW.GTIQUERY 000140
 54471052 54504154 41445855 41595245 55514954 47124C4F 4F54574F 444E4957 WINDOWTOOL.GTIQUERYAUXDATAPTR.GT 000160
 4C494249 5349564C 4F4F5454 45534954 47145254 50415441 44585541 54455349 ISETAUXDATAPTR.GTISETTOOLVISIBIL 000180
 4C4F4F54 59524555 51495447 13535543 4F464C4F 4F545445 53495447 0F595449 ITY.GTISETTOOLFOCUS.GTIQUERYTOOL 0001A0
 4C45444F 4D4C4D44 0E524944 4C45444F 4D4C4D44 086C6D64 03504F54 4B534544 DESKTOP.dml.DMLMODELDIR.DMLMODEL 0001C0
 004C4544 4F4D5745 4E4C4D44 084C4544 4F4D4E45 504F4C4D 440C454D 414E4552 RENAME.DMLOPENMODEL.DMLNEWMODEL. 0001E0

Dump of file SATURN:[PCCOMMON.DUMP.DLL]SADADESK.TMP;1 on 18-APR-1990 10:51:54.61
File ID (902,31,0)   End of file block 102 / Allocated 104

Virtual block number 3 (00000003), 512 (0200) bytes

 08534145 5641534C 4D440945 5641534C 4D44074D 54484552 49555143 414C4D44 DMLACQUIREHTM.DMLSAVE.DMLSAVEAS. 000000
 4F4D4545 52464C4D 440C4E58 54504F54 534C4D44 0A4E5854 54524154 534C4D44 DMLSTARTTXN.DMLSTOPTXN.DMLFREEMO 000020
 59524555 514C4D44 12454C44 4E41484C 45444F4D 59524555 514C4D44 134C4544 DEL.DMLQUERYMODELHANDLE.DMLQUERY 000040
 4C4D440D 454D414E 4C45444F 4D595245 55514C4D 4411454D 414E4E47 49534544 DESIGNNAME.DMLQUERYMODELNAME.DML 000060
 55514C4D 44114F44 45524C4D 44074F44 4E554C4D 4407444C 45494659 52455551 QUERYFIELD.DMLUNDO.DMLREDO.DMLQU 000080
 45544C49 46455649 54434159 52455551 4C4D4414 4D544859 4649544F 4E595245 ERYNOTIFYHTM.DMLQUERYACTIVEFILTE 0000A0
 4E4E4947 4F4C5952 4555514C 4D441145 4C494647 4F4C5952 4555514C 4D440F52 R.DMLQUERYLOGFILE.DMLQUERYLOGINN 0000C0
 52474142 4C545513 524F5352 55435449 4E494741 424C5455 10545544 03454D41 AME.DUT.UTLBAGINITCURSOR.UTLBAGR 0000E0
 524F5352 55434554 41524554 49474142 4C545513 524F5352 55434553 41454C45 ELEASECURSOR.UTLBAGITERATECURSOR 000100
 52514553 4C54550E 4548414D 4E555145 534C5455 0C454B41 4D514553 4C54550A .UTLSEQMAKE.UTLSEQUNMAKE.UTLSEQR 000120
 48535550 5145534C 54550C4C 45545352 49465145 534C5455 004C4545 564F4D45 EMOVEEL.UTLSEQFIRSTEL.UTLSEQPUSH 000140
 0F4C5455 03455441 4552435A 53505455 440C5954 504D4551 45534C54 550B4C45 EL.UTLSEQEMPTY.DUTPSZCREATE.UTL. 000160
 550E4547 41535345 4D544547 4C54555F 0E574F44 4E495752 45544E45 434C5455 UTLCENTERWINDOW._UTLGETMESSAGE.U 000180
 4C545513 474C4445 4C494645 5641534C 54550E47 4C44454C 49464B43 49504C54 TLPICKFILEDLG.UTLSAVEFILEDLG.UTL 0001A0
 41455243 53434809 54494E49 53434807 544F4F52 4E414D48 43414259 52455551 QUERYBACHMANROOT.HCSINIT.HCSCREA 0001C0
 5443454A 424F444E 464A424F 17444E46 4A424F06 4554454C 45445343 48094554 TE.HCSDELETE.OBJFND.OBJFNDOBJECT 0001E0
```

```
Dump of file SATURN:[PCCOMMON.DUMP.DLL]SADADESK.TMP;1 on 18-APR-1990 10:51:54.61
File ID (902,31,0)   End of file block 102 / Allocated 104

Virtual block number 4 (00000004), 512 (0200) bytes

 4F425455 4F424159 414C5053 49440F54 554F4241 054B4341 485F5245 444E4946 FINDER_HACK.ABOUT.DISPLAYABOUTBO 000000
 4F150000 0CF00301 01000003 01170306 02087003 01014554 49525753 4F440858 X.DOSWRITE...p............Þ....O 000020
 544B5345 44414441 53100000 706F7468 73654420 41442F41 53204D50 20322F53 S/2 PM SA/DA Desktop...SA.ADESKT 000040
 0042681E DB8EFFFF B81E5657 0002AEC8 00000000 00000000 01434F52 504C4F4F OOLPROC.........àÙ..WV.|.. ì.hB. 000060
 8D646A00 B4680200 36FF262B 60068E00 6A006A08 C483FFFF 00569A50 16DE468D .FB.P.V....á.j.j...'+&.6..hv.jd. 000080
 0000FF5A 86C7D03F FF5886C7 0000F046 C70813EE 46C70000 FFFF9A50 16FF7686 .v..P.....ÚFÝ..ÚFÞ..ú.X.?ÂÚ.Z... 0000A0
 76FF016A 006A0000 FFFF9A00 6A006A00 6AFFFF68 FFFF6850 16DE468D 006A006A j.j..FB.Ph..h..j.j.j.......j.j..v 0000C0
 36FF262B 60068E00 6A006A50 16FF7686 8D5016DE 468D5016 FF58868D EE76FFF0 Þ.vÝ..X..P.FB.P..v..Pj.j...'+&.6 0000E0
 18E90374 DC460BDA 468BDC56 890A4689 0000FFFF 9A5016FF 5C868001 90680200 ..h....\..P......FÖ.VÉ.FÖ.FÉt.Ö. 000100
 16FF6486 80026A07 16E9FF68 868BFF6A 9689FF68 86890000 FFFF9A00 6A006A00 .j.j........h...j...h.Ö..j...d.. 000120
 6AFF64B6 FF06F4E9 FD52868B 0007E903 7500FD52 BE83FD52 86890000 FFFF9A50 P.......R».ƒR».u.Ö....R»Ö¶..Ñd.j 000140
 9AFF64B6 FF0010E9 037500FD 52BE83FD 52868900 0001779A 5016F446 8D306A23 #j0.F¶.P.w.....R».ƒR».u.Ö...Ñd.. 000160
 C4024789 260A468B F45EC407 8926FF64 868BF45E C406C4E9 FD52868B 0000018E .......R»Öé.á^¶..d.&..á^¶.F.&.G.á 000180
 50520004 05F6568B F4468BFF 64B6FF00 001047C7 26F45EC4 00010847 C726F45E ^¶&ÚG...á^¶&ÚG....Ñd..F¶.V-...RP 0001A0
 6A236AFF 64B6FF00 00FFFF9A 5052000A 05F6568B F4468B00 6A006A00 00FFFF9A .....j.j...F¶.V-...RP......Ñd.j#j 0001C0
 01BA9AFF 64B6FF00 10E90375 00FD52BE 83FD5286 890000FF FF9A5016 F8468D06 ..F½.P.......R».ƒR».u.Ö...Ñd..¤. 0001E0

Dump of file SATURN:[PCCOMMON.DUMP.DLL]SADADESK.TMP;1 on 18-APR-1990 10:51:54.61
File ID (902,31,0)   End of file block 102 / Allocated 104

Virtual block number 5 (00000005), 512 (0200) bytes

 00FD52BE 83FD5286 890000FF FF9A0101 685016FE 56868D06 46E9FD52 868B0000 ....R»ÖF...V±.Ph.........R».ƒR». 000000
 01EC0086 9A5016FE 56868D06 1AE9FD52 868B0000 02149AFF 64B6FF00 10E90375 u.Ö...Ñd........R»Ö....V±.P.Ñ.&. 000020
 C483022E 00109A50 16FD5486 8D004D68 1E0012E9 03755CFD 538A80F0 8B04C483 .á..Þ.¤S»\u.Ö...hM...T».P......á 000040
 FF0010E9 037500FD 52BE83FD 52868900 00FFFF9A 5016FF6C 868D00FF 6C86C608 .ó.l....l..P.......R».ƒR».u.Ö... 000060
 02400056 9A5016FD 54868D50 16FE5686 8D05C0E9 FD52868B 0000FFFF 9AFF64B6 Ñd........R»Öà...V±.P..T».P.V.ª. 000080
 16FD5486 8D5016FF 6C868D08 C4830254 00109A50 16FD5486 8D004F68 1E08C483 .á..hO...T».P...T..á...l..P..T». 0000A0
 16FD5486 8D08C483 02960010 9A5016FD 54868D00 58681E08 C4830266 00109A50 P...f..á..hX...T».P......á...T». 0000C0
 54868D50 16FE5686 8D0026E9 03750000 300000FF FF9A006A 006A5016 F2468D50 P.F·.Pj.j......=..u.Ö&...V±.P..T 0000E0
 FF096A08 C4830018 00109A50 16FD5486 8D005D68 1E08C483 02A80056 9A5016FD ».P.V.´..á..h]...T».P......á.j.. 000100
 24E90375 00FD52BE 83FD5286 890000FF FF9A5016 FF60868D 5016FD54 86800A76 v...T».P..'..P.......R».ƒR».u.Ö$ 000120
 206A006A 0071681E 0077681E 016A006A 016A006A FF608689 FF628689 0000B800 .j....b...'.j.j.j.j..hw..hq.j.j  000140
 04578926 02478926 FF629688 FF60868B F85EC400 0907C726 F85EC400 00FFFF9A .....á^½&ú...á^½..'...b.&.G.&.W. 000160
 1477FF26 1677FF26 F45EC41F A5A5A50A 8E1EF08B 127F8DFA 568BF846 8BF45EC4 á^¶.F½.V¹....Þ..ÖÉÉÉ.á^¶&.w.&.w. 000180
 FD528689 0000044A 9A5016F8 468D066A 236AFF64 B6FF0000 FFFF9A50 16FC468D .F•.P......Ñd.j#j..F½.P.J.....R» 0001A0
 77FF26F4 5EC40475 E9FD5286 88000004 619AFF64 B6FF0010 E9037500 FD528E83 .ƒR».u.Ö...Ñd..a.....R»Öu.á^¶&.w 0001C0
 468D5016 FD54868D 00000486 9A5016FD 54868D05 6AFC76FF FE76FF14 77FF2616 .&.w..v±.v•j...T».P.......T».P.F 0001E0

Dump of file SATURN:[PCCOMMON.DUMP.DLL]SADADESK.TMP;1 on 18-APR-1990 10:51:54.61
File ID (902,31,0)   End of file block 102 / Allocated 104

Virtual block number 6 (00000006), 512 (0200) bytes

 04809A01 01685016 FD54868D 0020E903 7500003D 0000049A 9A006A00 6A5016F2 ·.Pj.j......=..u.Ö ...T».Ph...¯. 000000
 8D5016FD 5486800A 76FF0A6A 08C48304 C100109A 5016FD54 868D0098 681E0000 ...h....T».P...é..á.j..v...T».P. 000020
 89FF6286 89000088 0024E903 7500FD52 BE83FD52 86890000 04D89A50 16FF6086 .'..P.Ä.....R».ƒR».u.Ö$.|....b.. 000040
 26F85EC4 0000050A 9A206A00 6A00AC68 1E008268 1E016A00 6A016A00 6AFF6086 .'.j.j.j.j..hý..h¯.j.j .....á^½& 000060
 FA568BF8 468BF45E C4045789 26024789 26FF6296 88FF6086 88F85EC4 000A07C7 ú...á^½..'...b.&.G.&.W.á^¶.F½.V¹ 000080
 86890000 054C9A50 16F8468D 066A236A FF64B6FF 1FA5A5A5 DA8E1EF0 88187F8D ....Þ..ÖÉÉÉ..Ñd.j#j..F½.P.L..... 0000A0
 26F45EC4 0373E9FD 52868800 0005639A FF64B6FF 0010E903 7500FD52 BE83FD52 R».ƒR».u.Ö...Ñd..c.....R»Ös.á^¶& 0000C0
 5016FD54 86800000 05889A50 16FD5486 8D046AFC 76FFFE76 FF1477FF 261677FF .w.&.w..v±.v•j...T».P.......T».P 0000E0
 9A010168 5016FD54 868D0020 E9037500 00300000 059C9A00 6A006A50 16F2468D .F·.Pj.j......=..u.Ö ...T».Ph... 000100
 16FD5486 800A76FF 086A08C4 8305C300 109A5016 FD54868D 0006681E 000005B2 ý....h•...T».P...û..á.j..v...T». 000120
 62868900 00B80024 E9037500 FD52BE83 FD528689 0000050A 9A5016FF 60868D50 P..'..P.Ö.....R».ƒR».u.Ö$.|....b 000140
 5EC40000 060C9A20 6A006A00 EA681E00 F0681E01 6A006A01 6A006AFF 608689FF ...'.j.j.j.j..hÞ..hõ.j.j .....á^ 000160
 88F8468B F45EC404 57892602 478926FF 629688FF 60868BF8 5EC4000B 07C726F8 ½&ú...á^½..'...b.&.G.&.W.á^¶.F½. 000180
 0000064E 9A5016F8 468D066A 236AFF64 B6FF1FA5 A5A5DA8E 1EF08B24 7F8DFA56 V¹..$.Þ..ÖÉÉÉ..Ñd.j#j..F½.P.N... 0001A0
 5EC40271 E9FD5286 88000006 659AFF64 B6FF0010 E9037500 FD52BE83 FD528689 ..R».ƒR».u.Ö...Ñd..e.....R»Öq.á^ 0001C0
 FD54868D 0000068A 9A5016FD 54868D03 6AFC76FF FE76FF14 77FF2616 77FF26F4 ¶&.w.&.w..v±.v•j...T».P.......T» 0001E0
```

```
Dump of file SATURN:[PCCOMMON.DUMP.DLL]SADADESK.TMP;1 on 18-APR-1990 10:51:54.61
File ID (902,31,0)   End of file block 102 / Allocated 104

Virtual block number 7 (00000007), 512 (0200) bytes

 01685016 FD54868D 0020E903 7500003D 0000069E 9A006A00 6A5016F2 468D5016 .P.F·.Pj.j......=..u.Õ ...T».Ph. 000000
 54868D0A 76FF0C6A 08C48301 CE00109A 5016FD54 8680011A 681E0000 01A39A01 ..È....h....T».P...ö..á.j..v...T 000020
 890000B8 0024E903 7500FD52 BE83FD52 86890000 02BF9A50 16FF6086 8D5016FD ».P..'..P.¢.....R».ƒR».u.Õ$.¡... 000040
 000002F1 9A206A00 6A012E68 1E013468 1E016A00 6A016A00 6AFF6086 89FF6286 .b...'.j.j.j.j..h4..h..j.j .þ... 000060
 468BF45E C4045789 26024789 26FF6296 8BFF6086 8BF85EC4 000C07C7 26F85EC4 á^½&ú...á^½..'...b.&.G.&.W.á^¶.F 000080
 00F99A50 16F8468D 066A236A FF64B6FF 1FA5A5A5 DA8E1EF0 881E7F8D FA568BF8 ½.V"....Þ..ÖÉÉÉ..Ñd.j#j..F½.P.'. 0000A0
 016FE9FD 52868B00 0001109A FF64B6FF 0010E903 7500FD52 BE83FD52 86890000 ....R».ƒR».u.Õ...Ñd........R»Õo. 0000C0
 868D0000 FFFF9A50 16FD5486 8D026AFC 76FFFE76 FF1477FF 261677FF 26F45EC4 á^¶&.w.&.w..v±.v=j...T».P....... 0000E0
 5016FD54 868D0020 E9037500 003D0000 027B9A00 6A006A50 16F2468D 5016FD54 T».P.F·.Pj.j..{...=..u.Õ ...T».P 000100
 8D0A76FF 006A08C4 8303BF00 109A5016 FD54868D 0158681E 000003AE 9A010168 h...Ü....h[...T».P...¢..á.j..v.. 000120
 0088000B E9037500 FD52BE83 FD528689 00000306 9A5016FF 60868D50 16FD5486 .T».P..'..P.●.....R».ƒR».u.Õ..¡. 000140
 02478926 FF62968B FF608688 F85EC400 0007C726 F85EC4FF 608689FF 62868900 ...b...'.á^½&ú...á^½..'...b.&.G. 000160
 FFDC76FF 0A76FF1F A5A5A50A 8E1EF088 2A7F8DFA 568BF846 8BF45EC4 04578926 &.W.á^¶.F½.V"..*.Þ..ÖÉÉÉ..v..vÊ. 000180
 FF0A76FF 0093E9FD 52868B00 07E90375 00FD52BE 83FD5286 890000FF FF9ADA76 vö.......R».ƒR».u.Õ....R»Õ...v.. 0001A0
 FF0070E9 FD528688 0007E903 7500FD52 BE83FD52 86890000 FFFF9AF4 76FFF676 v-.v¶.......R».ƒR».u.Õ....R»Õp.. 0001C0
 C483079F 038E9ADA 76FFDC76 FF01E768 016AFD52 868902C4 83078C00 009A0A76 v.......á...R»j.hÓ..vÉ.vö......á 0001E0

Dump of file SATURN:[PCCOMMON.DUMP.DLL]SADADESK.TMP;1 on 18-APR-1990 10:51:54.61
File ID (902,31,0)   End of file block 102 / Allocated 104

Virtual block number 8 (00000008), 512 (0200) bytes

 9ADA76FF DC76FF02 2A68016A 08C48307 B2038E9A DA76FFDC 76FF01F9 68016A08 .j.h"..vÉ.vÖ...ý..á.j.h*..vÉ.vÖ. 000000
 DA76FFDC 76FF08C4 83FFFF03 8E9ADA76 FFDC76FF 022C6801 6A08C483 07C5038E ..é..á.j.h,..vÉ.vÖ......á..vÉ.vÖ 000020
 0008881E 56570000 0AC80006 CAC95F5E 1F0000E9 FD528688 04C483FF FF00779A .w....á...R»Õ...^_èò..à...WV.¡.. 000040
 E9F64688 0006E903 7500F67E 83F64689 04C483FF FF03159A 0676FF02 3068088E .ÄhO..v.......á..F-.--.u.Õ...F-Õ 000060
 26FC5EC4 0000FFFF 9A5016F8 468D0676 FF0000FF FF9A5016 FC468006 76FF0059 Y..v..F=.P......v..F½.P.....á^=& 000080
 00011047 C726FC5E C4000003 5F9A37FF 26FC5EC4 0000FFFF 9A0A77FF 260C77FF .w.&.w......á^=&.7._....á^=&úG... 0000A0
 C8C95F5E 1F0000E9 00008800 00FFFF9A 006A006A 006A006A 2A6AF876 FFFA76FF .v".v½j*j.j.j.j......¡..Õ...^_èù 0000C0
 005A0000 9A0A76FF 0C76FF10 76FF0434 E90E468B D88E07EE 881E5657 00001EC8 à...WV.¡Ÿ..Ä.F.Õ4..v..v..v....Z. 0000E0
 57882604 478826FC 5EC40000 0818 9A50 16FC468D 1076FF04 50E9E846 8BE84689 .FÒ.FÒÕP..v..F=.P.....á^=&.G.&.W 000100
 EE468DF2 76FFF476 FF0000FF FF9AF276 FFF476FF 0000E646 C7F45689 F2468906 ..F·.V¶úFl...v¶.v·......v¶.v·.FŸ 000120
 F476FF00 13E90374 0739260A 468BEE5E C40024E9 03740000 3D0000FF FF9A5016 .P.....=..t.Õ$.á^Ÿ.F.&9.t.Õ...v¶ 000140
 E90000B8 0006E903 7400E67E 83FFC4E9 0003E900 01E646C7 0000FFFF 9AF276FF .v·.....úFl..Õ..Õá..-l.t.Õ..¡..Õ 000160
 8B26EE5E C40000FF FF9A5016 F6468D01 6A006AEE 76FFF076 FF5016F2 468D03D7 ■..F·.P.vÞ.vŸj.j..F-.P.....á^Ÿ&. 000180
 027F8326 EE5EC400 0DE90375 0080027F 8126EE5E C40047E9 03750647 08260447 G.&.G.u.ÕG.á^Ÿ&.....u.Õ..á^Ÿ&... 0001A0
 26FC5EC4 0000FFFF 9A008687 FF2600B8 B7FF2604 5FC426EE 5EC4002C E9037425 Xt.Õ,.á^Ÿ&á_.&.ñ¡.&.ñÑ......á^=& 0001C0
 FF9AEE76 FFF076FF 37FF26FC 5EC40000 098F9A04 77FF2606 77FF26EE 5EC437FF .7á^Ÿ&.w.&.w......á^=&.7.vÞ.vŸ.. 0001E0

Dump of file SATURN:[PCCOMMON.DUMP.DLL]SADADESK.TMP;1 on 18-APR-1990 10:51:54.61
File ID (902,31,0)   End of file block 102 / Allocated 104

Virtual block number 9 (00000009), 512 (0200) bytes

 9A5016EA 468D0A76 FF0C76FF 0345E900 008802C4 830B4D00 009A1076 FF0000FF ....v....M..á.¡..ÕE..v..v..Fõ.P. 000000
 689A5016 FC468D10 76FF0323 E9E8468B 0006E903 7500E87E 83E84689 0000FFFF .....FÒ.-Õ.u.Õ...FÒÕ#..v..F=.P.h 000020
 46800477 FF260677 FF26FC5E C400000A D59A0477 FF260677 FF26FC5E C400000A ...á^=&.w.&.w..{...á^=&.w.&.w..F 000040
 5689E246 8906578B 2604478B 26EE5EC4 0059E903 7400003D 00000AE5 9A5016EE Ÿ.P.l...=..t.ÕY.á^Ÿ&.G.&.W..Fã.V 000060
 260027E9 037400B6 873926EC 568BEA46 8BE25EC4 003AE903 75E4460B E2468BE4 õ.Fã.Fõu.Õ:.á^ã.Fõ.Vš&9.Ñ.t.Õ'.& 000080
 069A0477 FF260677 FF26FC5E C4000100 8487C726 E25EC400 1DE90374 00B89739 9.¡.t.Õ..á^ã&ú.Ç...á^=&.w.&.w... 0000A0
 00067E83 00000A8B 9A5016FC 46801076 FF028AE9 000088FF 8AE90003 E900000B ...Õ..Õ..¡..Õ...v..F=.P......-.. 0000C0
 C400000B 619A5016 FC468010 76FF00D0 E9037400 107F8326 FC5EC400 0DE90375 u.Õl.á^=&....t.ÕÅ..v..F=.P.●...á 0000E0
 00000BA2 9A5016EE 468DF276 FFF476FF F45689F2 46890657 8B260447 8B26FC5E ^=&.G.&.W..F·.V¶.v¶.v·.FŸ.P.Å... 000100
 76FF0000 E646C700 89E90375 0739260A 468BEE5E C40097E9 0375F046 08EE468B .FŸ.FÞu.Õ..á^Ÿ.F.&9.u.Õ..úFl...v 000120
 24E90374 00003D00 0008D39A 5016EE46 8DF276FF F476FF00 0008C39A F276FFF4 ¶.v·.ü....v¶.v·.FŸ.P.Æ...=..t.Õ$ 000140
 E90001E6 46C70000 08F49AF2 76FFF476 FF0013E9 03740739 260A468B EE5EC400 .á^Ÿ.F.&9.t.Õ...v¶.v·.¶...úFl..Õ 000160
 F6468001 6A006AEE 76FFF076 FF5016F2 468D0034 E9037500 E67E83FF C4E90003 ..Õá..-l.u.Õ4..F·.P.vÞ.vŸj.j..F- 000180
 830B8900 009A1076 FF0000FF FF9AEE76 FFF076FF 5016F246 80000009 279A5016 .P.'....F·.P.vÞ.vŸ......v....... 0001A0
 0477FF26 0677FF26 FC5EC400 0008A29A 5016FC46 8D1076FF 0191E900 008802C4 á.¡..Õ...v..F=.P.Å...á^=&.w.&.w. 0001C0
 90E902C4 830BD400 009A1076 FF000EE9 037500FA 7E830000 FFFF9A50 16FA468D .F".P......~'.u.Õ...v....Å..á.Õ. 0001E0
```

Dump of file SATURN:[PCCOMMON.DUMP.DLL]SADADESK.TMP;1 on 18-APR-1990 10:51:54.61
File ID (902,31,0) End of file block 102 / Allocated 104

Virtual block number 10 (0000000A), 512 (0200) bytes

```
26EE5EC4 003FE90A 46880000 FFFF9A50 16EE468D 0477FF26 0677FF26 FC5EC400 .6^=&.w.&.w..FŸ.P......F.Õ7.6^Ÿ& 000000
76FF0A47 89260A46 88EE5EC4 0015E903 750A4739 260A468B EE5EC400 010847C7 úG...6^Ÿ.F.&9G.u.Õ..6^Ÿ.F.&.G..v 000020
03760069 300036E9 0039E900 000847C7 26EE5EC4 0045E902 C4830775 00009A10 ....u..6.ÕE.6^Ÿ&úG...Õ9.Õ6.=i.v. 000040
8130FF9E E9037500 6C3DFFD6 E9FFA9E9 03750032 3DFFB1E9 03720068 300013E9 Õ..=h.r.ÕŸ.=2.u.Õ`.Õ•.=l.u.Õ..=. 000060
1076FF00 66E90375 00067E83 00C5E9FF BBE9FF8E E9037700 823DFFC6 E9037300 .s.Õ6.=..w.Õ..ÕE.Õé..~..u.Õf..v. 000080
83000008 769A5016 FA468004 77FF2606 77FF26FC 5EC40000 09CF9A50 16FC468D .F=.P.ü...6^=&.w.&.w..F*.P.v.... 0000A0
EE5EC400 000AAC9A 5016EE46 8D0477FF 260677FF 26FC5EC4 002DE903 7400FA7E ~*.t.Õ-.6^=&.w.&.w..FŸ.P.¯...6^Ÿ 0000C0
07FB0315 9A1076FF 0A76FF00 00FFFF9A 006A006A 0A76FF0C 76FF0E76 FF37FF26 &.7.v..v..v.j.j.......v..v....«. 0000E0
0000FFFF 9A0676FF 0876FF0A 76FF0C76 FF0E76FF 1076FF00 50E90000 8804C483 .6.|..ÕP..v..v..v..v..v..v...... 000100
AE3DFCD6 E9037510 CC3DFBD3 E9037510 053DFBC4 E9037510 03300033 E90036E9 Õ6.Õ3.=..u.Õ6«=..u.Õ£«=ä.u.Õ••=Û 000120
000CCAC9 5F5E1FFF 80E9FE72 E903751D 833DFF46 E903751D AF3DFD89 E903751D .u.Õ.»=£.u.ÕF.=°.u.Õr±Õ¯..^_èb.. 000140
00329A50 16FE468D 1076FF12 76FF00CE E90E4688 D88E0878 881E5657 000016C8 à...WV.|x..Ä.F.Õö..v..v..F±¯P.2. 000160
16FE468D 1076FF12 76FF00D6 E90000BA 0000B802 C483088E 07E69AFE 76FF0000 ...v±.Ì....6.|..¤..Õ•..v..v..F±. 000180
00BA0000 880000FF FF9A016A 006A0A76 FF0C76FF 1DAF68FE 76FF0000 FFFF9A50 P......v±h€..v..v.j.j......j..¤. 0001A0
76FF008E E900008A 00008806 C4830999 045A9A10 76FF1276 FF0A76FF 00A8E900 .Õ´..v..v..v..Z....6.|..¤..Õ...v 0001C0
4680EA76 FFEC76FF EC5689EA 46890000 FFFF9A50 16EE468D 006A006A 1076FF12 ..v.j.j..FŸ.P......Fõ.Vš.vš.võ.F 0001E0
```

Dump of file SATURN:[PCCOMMON.DUMP.DLL]SADADESK.TMP;1 on 18-APR-1990 10:51:54.61
File ID (902,31,0) End of file block 102 / Allocated 104

Virtual block number 11 (0000000B), 512 (0200) bytes

```
004CE900 00BA0000 880000FF FF9AEA76 FFEC76FF 0000FFFF 9AEC6AFF 6A5016EE Ÿ.Pj.jš......vš.võ.....|..¤..ÕL. 000000
0023E900 2FE90000 FFFF9A06 76FF0876 FF0A76FF 0C76FF0E 76FF1076 FF1276FF .v..v..v..v..v..v..v......Õ/.Õ#. 000020
FF64E903 7500333D FF1AE903 7500293D FF8EE903 7500233D FF4EE903 7500203D = .u.ÕN.=#.u.Õ..=).u.Õ..=3.u.Õd. 000040
02030000 00010018 0002002F 90000ECA C95F5E1F 0000E900 008A0000 88FF80E9 Õ§.¡..¤..Õ...^_èb.../.......... 000060
02030000 00030060 000200F3 00030086 01030000 00020C8E 000202C7 00080843 C...ú...........Ñ...µ...`....... 000080
020302D4 00080C48 02030CF0 0001005D 00050158 000706DC 020300DC 00060C36 6...É...É...X...]...Þ...K...Å... 0000A0
010300EF 00060756 02030003 00030066 0103034A 000A0165 02030259 0008090F Õ...Y...e...J...f.......V...ÿ... 0000C0
020301EE 00070384 02030354 000A0838 0203008C 0003009C 01030088 00030408 ................8...T.......Ÿ... 0000E0
00020090 00030036 01030080 00060CAC 02030000 000C07D3 0002026A 00080A4F O...j...Æ.......¯.......6....... 000100
02030000 00100CF8 0002008F 00060047 0203027E 000809F4 02030000 000E06C5 é.......¶...-...G.......%....... 000120
0203002E 000300A3 01030020 0003007E 010300AD 00030098 0103020C 00070980 ¯...........Ü...-...-...È....... 000140
02030292 00080151 02030029 00050002 02030082 000300C6 0103009A 00060C81 ........6...ý...Ø...)...Q....... 000160
02030037 00050843 02030045 00030861 01030048 00020398 010300A5 00060828 (...É.......K...a...E...C...7... 000180
020301B5 00070336 020302AA 00080833 02030088 00060733 020301A8 00070968 h...´...3...|...3...¨...6...ç... 0001A0
020300C9 0006000E 020302B9 00080C69 0203032E 000906B4 02030046 00050348 H...F...Ç.......i...¿.......è... 0001C0
8D0676FF D88EFFFF 881E5657 000068C8 00000054 0005097E 02030243 000701FD »...C...~...T...àh..WV.|...Ä.v.. 0001E0
```

Dump of file SATURN:[PCCOMMON.DUMP.DLL]SADADESK.TMP;1 on 18-APR-1990 10:51:54.61
File ID (902,31,0) End of file block 102 / Allocated 104

Virtual block number 12 (0000000C), 512 (0200) bytes

```
50169C46 8D646A08 76FF0200 36FF2628 62068E00 6A006A00 00FFFF9A 50169846 F..P.....j.j...b+&.6...v.jd.F..P 000000
FF9A206A 006A5016 9C468D01 70681E98 76FF9A76 FF9876FF 9A76FF00 00FFFF9A ......v..v..v..v..hp..F..Pj.j .. 000020
0000159A 50169846 8D0676FF D88E0008 881E5657 0000CCC8 C8C95F5E 1F0000FF ....^_èùàä..WV.|...Á.v..F..P.... 000040
006A0000 00A69A50 16FF3486 8D646A08 76FF0200 36FF262B 62068E00 6A006A00 .j.j.¯..b+&.6...v.jd..4..P.Ì...j. 000060
9876FF9A 76FF0000 00319A50 169C468D 646A0A76 FF020036 FF262862 068E006A j...b+&.6...v.jd.F..P.1....v..v. 000080
C8C8C95F 5E1F0000 004F9A20 6A006A50 16FF3486 8D50169C 468D9876 FF9A76FF .v..v..F..P..4..Pj.j .O....^_èùà 0000A0
AA9A5052 000002A3 9A006A03 6A016A00 6A016A00 6AD88E00 60881E56 57000024 $..WV.|'..Äj.j.j.j.j.j..È...R̄P.´ 0000C0
0C5688 0A 46880E76 FF1076FF 1276FF14 76FF0030 E903750C 46080A46 88000002 ....F..F.u.Õ0..v..v..v..v..F..V. 0000E0
76FF0022 E9DC4689 14C48300 0001469A 0676FF08 76FF5016 FA468D50 52009105 ...RP.F*.P.v..v..F....6..FÉÕ"..v 000100
DC468910 C4830000 FFFF9A06 76FF0876 FF5016FA 468D0E76 FF1076FF 1276FF14 ..v..v..v..F*.P.v..v.......6..FÉ 000120
47892600 0088165E C404C483 FFFF0000 9A0676FF 00896800 21E90375 000C7E83 .~É.u.Õ!.h¿..v.......å.6^.|..&.G 000140
6A236A37 FF26FC5E C40000FF FF9A5016 FC468D06 76FF014D E90C4688 07892602 .&...FÉÕM..v..F=.P.....6^=&.7j#j 000160
5EC40247 89260846 88E65EC4 078926FA 4688E65E C40000FF FF9A5016 E6468D0C ..FÌ.P.....6^Ì.F*&..6^Ì.F.&.G.6^ 000180
000A47C7 26E65EC4 00000847 C726E65E C4065789 26044789 260C5688 0A4688E6 Ì.F..V.&.G.&.W.6^Ì&úG...6^Ì&úG.. 0001A0
E8568BE6 4688165E C40000FF FF9AE676 FFE876FF 50520004 05FE5688 FC468800 ..F=.V±...RP.vÒ.vÌ.....6^..FÌ.VÒ 0001C0
0086E903 74000C7E 830C4689 00000238 9A5016E2 4680FA76 FF025789 26078926 &..&.W..v*.Fã.P.8....FÉ.~É.t.Õ.. 0001E0
```

```
Dump of file SATURN:[PCCOMMON.DUMP.DLL]SADADESK.TMP;1 on 18-APR-1990 10:51:54.61
File ID (902,31,0)   End of file block 102 / Allocated 104

Virtual block number 13 (0000000D), 512 (0200) bytes

 FF0055E9 0000FFFF 9AE276FF E476FF00 58E90846 8B007BE9 0375E446 0BE2468B .Fã.Fõu.Õ(..F.ÕX..vÕ.vã.....ÕU.. 000000
 16EA468D 50520000 FFFF9A80 0868DE76 FFE076FF 0000006D 9A5016DE 468D0676 v..FB.P.m....vÀ.vBh.......RP.Fõ. 000020
 FF9A036A F676FFF2 76FFEE76 FFEA76FF 006A006A E276FFE4 76FF0000 FFFF9A50 P......vÕ.vãj.j..võ.vŸ.v·.v-j... 000040
 76FF0000 FFFF9A01 6AFA76FF FFABE9FF A0E90375 003C3D00 0BE9000E E90000FF ...Õ..Õ..=<.u.Õ..Õ¨..v!j.......v 000060
 76FF0000 FFFF9A50 520000FF FF9A006A 016A016A 006A016A 006A0000 FFFF9AFA !.....j.j.j.j.j.j......RP......v 000080
 000004C8 CBC95F5E 1F0000E9 0000B800 00FFFF9A 006A006A 006A006A 1DAD68FA !hÙ.j.j.j.j.......|..Õ...^_èùà... 0000A0
 890000FF FF9A006A 006A5016 FE46801D B06837FF 26065EC4 D88E00D7 B8TE5657 WV.|■..Äб^.&.7h¯..F±.Pj.j¯...... 0000C0
 0000E900 00B80006 E90001B8 0006E903 7400FE7E 830009E9 037400FC 7E83FC46 F■.~■.t.Õ...~±.t.Õ..|..Õ..|..Õ.. 0000E0
 839A5016 F8468D06 76FF00C8 EC46C7D8 8E02D4B8 1E565700 033EC8CB C95F5E1F .^_èùà>..WV.|å..ÄúFšà..v..F½.P.. 000100
 FFEE76FF F076FF00 0003FD9A 5016EE46 8D37FF26 F85EC40E 36E90846 8B000001 ...¯.F.Õ6.б^½&.7.FŸ.P.»....vÞ.vŸ. 000120
 BE83001B E91001E9 0006E903 7402FCD2 BE83FCD2 868906C4 83041915 699A0676 v..i....б...Ø■.ƒØ■.t.Õ..Õ..Õ...ƒ 000140
 8DEE76FF F076FF0F E9E9FCD2 868B0007 E9037500 FCD2BE83 0011E903 7501FCD2 Ø■.u.Õ...ƒØ■.u.Õ....Ø■ÕÕ..vÞ.vŸ. 000160
 E8468D0F C5E9FCD2 86880007 E9037500 003DFCD2 86890000 05729A50 16FCC286 .ô■.P.r.....Ø■=..u.Õ....Ø■Õé..FÒ 000180
 14C48304 6E00CF9A 0676FF00 8068FCC2 B6FFFCC4 B6FF006A 006A006A 006A5016 .Pj.j.j.j..Ñá■.Ñô■h...v..ü.n..б. 0001A0
 7BE90000 048F9AEE 76FFF076 FF0F8FE9 FCD2868B 0007E903 7500003D FCD28689 ..Ø■=..u.Õ....Ø■Õ...vÞ.vŸ.....Õ( 0001C0
 C2868D50 16FCD486 8DF476FF F676FF00 00FFFF9A 5016F446 8D37FF26 F85EC40F .б^½&.7.F¶.P......v-.v¶..å■.P..ò 0001E0
```

```
Dump of file SATURN:[PCCOMMON.DUMP.DLL]SADADESK.TMP;1 on 18-APR-1990 10:51:54.61
File ID (902,31,0)   End of file block 102 / Allocated 104

Virtual block number 14 (0000000E), 512 (0200) bytes

 E90F3DE9 0006E903 7402FCD2 BE83FCD2 86890EC4 8304A203 979A0676 FF5016FC ■.P.v....Å..б...Ø■.ƒØ■.t.Õ..Õ=.Õ 000000
 E8468D0F 25E9FCD2 868B0007 E9037500 FCD2BE83 0011E903 7501FCD2 BE83001B ...ƒØ■.u.Õ...ƒØ■.u.Õ....Ø■Õ%..FÒ 000020
 050200CF 9A0676FF 256AFCC2 B6FFFCC4 B6FFF476 FFF676FF 5016FCD4 868D5016 .P..å■.P.v-.v¶.Ñб■.Ñô■j%.v..ü... 000040
 FF9AF476 FFF676FF 0EEAE9FC D2868B00 07E90375 00FCD2BE 83FCD286 8914C483 .б...Ø■.ƒØ■.u.Õ....Ø■Õõ..v-.v¶.. 000060
 02FCD2BE 83FCD286 8906C483 FFFF0064 9A0676FF 5016FCC2 868D0ED6 E90000FF ...Õ■...ô■.P.v..d....б...Ø■.ƒØ■. 000080
 8B0007E9 037500FC D28E8300 11E90375 01FCD28E 83001BE9 0EB4E900 06E90374 t.Õ..ÕÇ.Õ...ƒØ■.u.Õ...ƒØ■.u.Õ... 0000A0
 006A006A 006A5016 E8468D00 29E90374 0100B28F 8326FCC2 9EC40E9C E9FCD286 .Ø■Õ..б.ô■&.¢ý..t.Õ)..FÒ.Pj.j.j. 0000C0
 9EC4003F E9FCD286 8914C483 053B00CF 9A0676FF 256AFCC2 B6FFFCC4 B6FF006A j..Ñá■.Ñô■j%.v..ü.;..б...Ø■Õ?.б. 0000E0
 B6FFFCC4 B6FF006A 006A006A 006A5016 E8468D00 2AE90374 0300B28F 8326FCC2 ô■&.¢ý..t.Õ*..FÒ.Pj.j.j.j..Ñá■.Ñ 000100
 D28E8300 01FCD286 C70006E9 FCD28689 14C48301 6200CF9A 0676FF00 8068FCC2 ô■h...v..ü.b..б...Ø■Õ..ú.¶■...ƒØ 000120
 16E8468D 0477FF26 0677FF26 F85EC40E 0BE90E14 E9FCD286 8B0007E9 037500FC ■.u.Õ....Ø■Õ..Õ..б^½&.w.&.w..FÒ. 000140
 016A006A 016A006A 000BE903 750000B4 BF832604 5FC426E8 5EC40000 FFFF9A50 P.....б^Õ&б_.&.¢Ç..u.ÕU.j., ¡.j. 000160
 FFFF0225 9A0477FF 260677FF 26E85EC4 000005CB 9A505200 0005C49A 006A036A j.j..б...RP¯ù...б^Õ&.w.&.w..%... 000180
 FF000000 EF9A5052 000000E8 9A006A01 6A016A00 6A016A00 6AFCD286 8904C483 .б...Ø■j.j.j.j.j.j..Õ...RP.ÿ.... 0001A0
 FF260677 FF26E85E C40051E9 037500FC D28E8300 0002009A 5016FD18 868D0676 v....».P......ƒØ■.u.ÕQ.б^Õ&.w.&. 0001C0
 C4830000 FFFF9A04 6A5016FF 20868D50 16EC468D 0174681E 0171681E 016A0477 w.j..hq..ht..Fš.P.. ..Pj.......б 0001E0
```

```
Dump of file SATURN:[PCCOMMON.DUMP.DLL]SADADESK.TMP;1 on 18-APR-1990 10:51:54.61
File ID (902,31,0)   End of file block 102 / Allocated 104

Virtual block number 15 (0000000F), 512 (0200) bytes

 6A5016FF 20868D01 79681EFD 1886FFFD 1AB6FFFD 1886FFFD 1AB6FFFC D286891B ...Ø■.Ñ.».Ñ.».Ñ.».Ñ.».hy... ..Pj 000000
 6837FF26 E85EC400 29E9FCD2 86880007 E9037500 FCD2BE83 000000C6 9A206A00 .j .б....ƒØ■.u.Õ....Ø■Õ).б^Õ&.7h 000020
 C48303CB 00009A06 76FF0086 68000EE9 000002BD 9A016A00 6A0876FF 006A1DAF £.j..v.j.j..§...Õ..hÑ..v....ù..б 000040
 00009A50 16FCF686 8D096A06 76FF0000 089C9A50 16FD1886 8D0676FF 0CF8E904 .Õ½..v....».P......v.j...-■.P... 000060
 FCD2BE83 FCD28689 0000FFFF 9A5016FC C6868D50 16FCF686 8D0676FF 096AFFFF ..j..v...-■.P..ó■.P.......Ø■.ƒØ■ 000080
 890000FF FF9A5016 FC4680FC C6B6FFFC C8B6FF0C 85E9FCD2 868B0007 E9037500 .u.Õ....Ø■Õç..Ñà■.Ñó■.F■.P...... 0000A0
 C6B6FFFC C8B6FF00 FE1C86C6 0C8EE9FC D2868B00 07E90375 00FCD2BE 83FCD286 .Ø■.ƒØ■.u.Õ....Ø■Õ..ó..±..Ñà■.Ñó 0000C0
 E9037500 FCD2BE83 FCD28689 0000FFFF 9A5016FE 1C868D01 6AFC76FF FE76FFFC ■.v±.v■j....±.P.......Ø■.ƒØ■.u.Õ 0000E0
 8491FCD2 BE81FCD2 86890000 FFFF9AFC C6B6FFFC C8B6FF0C 59E9FCD2 86880007 ....Ø■ÕY..Ñà■.Ñó■.......Ø■.ƒØ■.. 000100
 000007A3 9A006A00 6A5016F2 468D5016 FE1C8680 0C36E9FC D2868800 07E90374 t.Õ....Ø■Õ6....±.P.F·.Pj.j..È... 000120
 83FCD286 890000FF FF9A0101 685016FE 1C868000 66E90374 10F246F6 FF1E8689 ....-F·.t.Õf....±.Ph..........Ø■. 000140
 FFFF0010 9A5016FE 1C868001 7A681E00 42E900FE 1C86C600 08E90375 00FCD2BE ƒØ■.u.Õ..ó..±.ÕB..hz....±.P..... 000160
 00FF1EBE 83FF1E86 890000FF FF9A006A 006A5016 F2468D50 16FE1C86 8D08C483 .б....±.P.F·.Pj.j...........ƒ... 000180
 468D0477 FF260677 FF26F85E C400FE1C 86C60005 E9037410 F246F600 09E90374 t.Õ..-F·.t.Õ..ó..±.б^½&.w.&.w..F 0001A0
 9E8CFCCE 86890182 B8002DE9 00B2878B 26045FC4 26E85EC4 00000871 9A5016E8 Ò.P.q...б^Õ&б_.&..ý.Õ-.|....ö■.. 0001C0
 16E9FCD0 9E8CFCCE 8689018D B80024E9 FCD09E8C FCCE8689 0187B800 32E9FCD0 Å■Õ2.|....ö■..¯Å■Õ$.|....ö■..Å■Õ. 0001E0
```

```
Dump of file SATURN:[PCCOMMON.DUMP.DLL]SADADESK.TMP;1 on 18-APR-1990 10:51:54.61
File ID (902,31,0)   End of file block 102 / Allocated 104

Virtual block number 16 (00000010), 512 (0200) bytes

 FFFD1AB6 FF016A00 6AFFDCE9 FFD1E903 7500033D FFCBE903 7500013D 0013E900 .Õ..=..u.Õù.=..u.Õî.Õ€.j.j..Ñ.». 000000
 FFFF9A50 16FD1C86 8D019168 1E006AFC CEB6FFFC D0B6FF50 16FE1C86 8DFD18B6 Ñ.»...±.P.ÑÅ•.Ñö•j..h......».P... 000020
 5016E846 8D0477FF 260677FF 26F85EC4 00E2E900 CAE9FF1E 868BFF1E 86890000 ...........Õò.Õã.ó^½&.w.&.w..FÒ.P 000040
 868908C4 8305AE02 949A0477 FF260677 FF26E85E C45016FD 1C868D00 0003969A .........».Pó^Ò&.w.&.w....Ü..ó... 000060
 5016FD1C 868D004C E9037500 FCD2BE83 000005D9 9A5016FD 18868D06 76FFFCD2 Ø•.v.....».P.\..../Ø•.u.ÕL.....».P 000080
 8918C483 0000060A 9A046A50 16FF2086 8D5016EC 468D019F 681E019C 681E016A j..h...h...F$.P.. ..Pj.........ó.. 0000A0
 6A006A50 16FF2086 8D01A468 1EFD18B6 FFFD1AB6 FFFD18B6 FFFD1AB6 FFFCD286 .Ø=.Ñ.».Ñ.».Ñ.».Ñ.».hÉ... ..Pj.j 0000C0
 1DAF6837 FF26E85E C40A6BE9 FCD2868B 0007E903 7500FCD2 BE830000 06349A20  .4...../Ø•.u.Õ.....Ø=Õk.ó^Ò&.7h£. 0000E0
 3DFFF2E9 03730001 3D001BE9 001EE900 21E90000 065C9A01 6A006A08 76FF006A j..v.j.j..\...Õ!.Õ..Õ..=..s.Õ·.= 000100
 095F0000 9A0676FF 00B5680A 27E9FFDF E9FF1EE9 03750003 3DFF29E9 03770002 ..w.Õ).=..u.Õ..ÕÓ.Õ'.hç..v...._. 000120
 00009A06 76FF00B5 680A05E9 04C48309 7000009A 0676FF00 B5680A16 E904C483 .ó.Õ..hç..v....p..ó.Õ..hç..v.... 000140
 26F85EC4 09E0E906 C483FFFF 00009AF8 76FFFA76 FF0676FF 09F4E904 C4830A13 ...ó.Õ¶..v..vª.v½.......ó.ÕÅ.ó^½& 000160
 6A0876FF 006A1DAF 6837FF26 E85EC400 000A629A 5016E846 8D0477FF 260677FF .w.&.w..FÒ.P.b...ó^Ò&.7h£.j..v.j 000180
 D2BE83FC D2868904 C483FFFF 00009AF8 76FFFA76 FF09B1E9 00000AB2 9A016A00 .j..ý...ÕŸ..vª.v½.......ó...Ø=./Ø 0001A0
 83FFFF00 009AF876 FFFA76FF 0676FF09 8BE90994 E9FCD286 8B0007E9 037500FC •.u.Õ.....Ø•Õ..Õ...v..vª.v½...... 0001C0
 0676FF00 B5680962 E9096BE9 FCD2868B 0007E903 7500FCD2 BE83FCD2 868906C4 ó...Ø=./Ø=.u.Õ.....Ø=Õk.Õb.hç..v. 0001E0

Dump of file SATURN:[PCCOMMON.DUMP.DLL]SADADESK.TMP;1 on 18-APR-1990 10:51:54.61
File ID (902,31,0)   End of file block 102 / Allocated 104

Virtual block number 17 (00000011), 512 (0200) bytes

 18B6FFFD 1AB6FF00 000A4D9A 5016FD18 868D0676 FF0951E9 04C4830B 5A00009A ...Z..ó.ÕQ..v.....».P.M....Ñ.».Ñ. 000000
 00067E9A 5016FD18 868D0676 FF0929E9 0000FFFF 9A006A00 6A006A00 6A296AFD »j)j.j.j.j......Õ)..v.....».P.~.. 000020
 1886FFFD 1AB6FF06 76FF0000 0A9B9A50 16E8468D 0477FF26 0677FF26 F85EC400 .ó^½&.w.&.w..FÒ.P......v..Ñ.».Ñ. 000040
 77FF26F8 5EC408E2 E90000FF FF9A00B6 B7FF2600 B8B7FF26 045FC426 E85EC4FD »ó^Ò&ó .&.ñ¡.&.ñÑ......Õã.ó^½&.w 000060
 6A006A08 76FF006A 1DAF6837 FF26E85E C4000008 739A5016 E8468D04 77FF2606 .&.w..FÒ.P.s...ó^Ò&.7h€.j..v.j.j 000080
 00FCD28E 83FCD286 8904C483 0AE80000 9AF876FF FA76FF08 B3E90000 091A9A01 .......Õ°..vª.v½...Ò..ó...Ø•./Ø•. 0000A0
 D2868904 C48308E0 003F9AF8 76FFFA76 FF088DE9 0896E9FC D2868B00 07E90375 u.Õ.....Ø•Õ..Õ...vª.v½.?....ó...Ø 0000C0
 0834000B 9AF876FF FA76FF08 67E90870 E9FCD286 8B0007E9 037500FC D28E83FC •./Ø=.u.Õ.....Ø=Õp.Õg..vª.v½.Ä.4. 0000E0
 76FFFA76 FF0841E9 084AE9FC D2868B00 07E90375 00FCD28E 83FCD286 8904C483 .ó...Ø=./Ø=.u.Õ.....Ø•ÕJ.ÕA..vª.v 000100
 1BE90824 E9FCD286 8B0007E9 ü37500FC D28E83FC D2868904 C483FFFF 01179AF8 ½.......ó...Ø•./Ø•.u.Õ.....Ø•Õ$.Õ. 000120
 E8468D04 77FF2606 77FF26F8 5EC4080A E904C483 066C0000 9A0676FF 00B56808 .hç..v.....l..ó.Õ..ó^½&.w.&.w..FÒ 000140
 FF9A5016 FCCA868D 008687FF 2600B887 FF26045F C426E85E C4000007 D49A5016 .P.å...ó^Ò&ó_.&.ñ¡.&.ñÑ...ò•.P.. 000160
 FCCC8608 FCCA8688 07CAE9FC D2868B00 07E90375 00FCD28E 83FCD286 890000FF ......Ø=./Ø=.ū.Õ.....Ø•Õò...ò•..ä• 000180
 0677FF26 F85EC400 2CE906C4 83094E00 589A0676 FF00EA68 00EB6800 14E90374 t.Õ..hŠ.hõ..v..X.N..ó.Õ,.ó^½&.w. 0001A0
 016A006A 0876FF00 6A1DAF68 37FF26E8 5EC40000 0C099A50 16E8468D 0477FF26 &.w..FÒ.P.....ó^Ò&.7h€.j..v.j.j. 0001C0
 E85EC400 000C8B9A 5016E846 8D0477FF 260677FF 26F85EC4 0774E900 000C209A . ...Õt.ó^½&.w.&.w..FÒ.P.....ó^Ò 0001E0

Dump of file SATURN:[PCCOMMON.DUMP.DLL]SADADESK.TMP;1 on 18-APR-1990 10:51:54.61
File ID (902,31,0)   End of file block 102 / Allocated 104

Virtual block number 18 (00000012), 512 (0200) bytes

 5016FD18 868D0676 FF0745E9 00000CA2 9A016A00 6A0876FF 006A1DAF 6837FF26 &.7h£.j..v.j.j..Å...Õ€..v.....».P 000000
 FFFD1AB6 FF0E77FF 26F85EC4 006A0019 E9037500 0E7F8326 F85EC400 000CB39A .°...ó^½&....u.Õ..j.ó^½&.w..Ñ.». 000020
 08C4830C D8038E9A FD18B6FF FD1AB6FF 0876FF01 6A08C483 0C68038E 9AFD18B6 Ñ.»...k..ó.j..v..Ñ.».Ñ.»...Ä..ó. 000040
 C400000C EE9A5016 E8468D04 77FF2606 77FF26F8 5EC40E47 89260846 8BF85EC4 ó^½.F.&.G.ó^½&.w.&.w..FÒ.P.Ÿ...ó 000060
 FD18868D 0676FF06 C3E90000 0D059A01 6A006A08 76FF006A 1DAF6837 FF26E85E ^Ò&.7h£.j..v.j.j......Õû..v.....» 000080
 1AB6FF0E 77FF26F8 5EC4006A 0019E903 75000E7F 8326F85E C400000D 169A5016 .P......ó^½&....u.Õ..j.ó^½&.w..Ñ. 0000A0
 0DF39A50 16E8468D 0477FF26 0677FF26 F85EC408 C4830028 038E9AFD 18B6FFF0 ».Ñ.»...(..ó.ó^½&.w.&.w..FÒ.P.µ. 0000C0
 8D0676FF 0660E900 0000609A 016A006A 0876FF00 6A1DAF68 37FF26E8 5EC40000 ..ó^Ò&.7h£.j..v.j.j..m...Õ'..v.. 0000E0
 F85EC406 C4830093 03EE9AFD 18B6FFFD 1AB6FF08 76FF0000 0D819A50 16FD1886 ..».P......v..Ñ.».Ñ.».Ÿ....ó.ó^½ 000100
 0D899A50 16E8468D 0477FF26 0677FF26 F85EC400 0000A49A 0477FF26 0677FF26 &.w.&.w..Ê...ó^½&.w.&.w..FÒ.P.¿. 000120
 0000D89A 016A006A 0876FF00 6A1DAF68 37FF26E8 5EC4001A E9037400 00300000 ..=..t.Õ..ó^Ò&.7h£.j..v.j.j..Ä.. 000140
 FD18B6FF FD1AB6FF 0876FF00 000E769A 5016FD18 868D0676 FF05F5E9 FFC9E900 .Õè.Õ%..v.....».P.v....v..Ñ.».Ñ.» 000160
 260677FF 26F85EC4 00000E99 9A0477FF 260677FF 26F85EC4 06C4830E 8803EE9A .Ÿ....ó.ó^½&.w.&.w......ó^½&.w.& 000180
 006A1DAF 6837FF26 E85EC400 1AE90374 00003D00 000EAE9A 5016E846 8D0477FF .w..FÒ.P.Û...=..t.Õ..ó^Ò&.7h£.j. 0001A0
 E8468D04 77FF2606 77FF26F8 5EC4058A E9FFC9E9 00000E0A 9A016A00 6A0876FF .v.j.j.......Õè.Õ..ó^½&.w.&.w..FÒ 0001C0
 5BE90000 0E399A01 6A006A08 76FF006A 1DAF6837 FF26E85E C400000E 229A5016 .P."...ó^Ò&.7h£.j..v.j.j..9...Õ[ 0001E0
```

```
Dump of file SATURN:[PCCOMMON.DUMP.DLL]SADADESK.TMP;1 on 18-APR-1990 10:51:54.61
File ID (902,31,0)   End of file block 102 / Allocated 104

Virtual block number 19 (00000013), 512 (0200) bytes

 6A1DAF68 37FF26E8 5EC40000 099D9A50 16E8468D 0477FF26 0677FF26 F85EC405 .á^½&.w.&.w..FÒ.P.....á^Ò&.7h£.j 000000
 FF00009A F876FFFA 76FF0876 FF0676FF 052CE900 000ECD9A 016A006A 0876FF00 ..v.j.j..ë...Õ,..v..v..v°.v½.... 000020
 8D0676FF 0500E905 09E9FCD2 86880007 E9037500 FCD28E83 FCD28689 08C483FF ..á...Ø=./Ø=.u.Õ....Ø=Õ..Õ...v.. 000040
 F85EC406 C483FFFF 03EE9AFD 1886FFFD 1AB6FF08 76FF0000 0A259A50 16FD1886 ..».P.X....v..Ñ.».Ñ.».Ÿ....á.á^½ 000060
 FFFF9A50 16E8468D 0477FF26 0677FF26 F85EC400 00FFFF9A 0477FF26 0677FF26 &.w.&.w......á^½&.w.&.w..FÒ.P... 000080
 0009B49A 016A006A 0876FF00 6A1DAF68 37FF26E8 5EC4001A E9037400 003D0000 ..=..t.Õ..á^Ò&.7h£.j..v.j.j..Ç.. 0000A0
 B6FFFD1A B6FF022B 68006A00 000F639A 5016FD18 86800676 FF0495E9 FFC9E900 .Õè.Õ...v....».P.c...j.h+..Ñ.».Ñ 0000C0
 C408C483 0F77038E 9AFD1886 FFFD1AB6 FF022C68 016A08C4 830F0A03 8E9AFD18 .»......á.j.h,..Ñ.».Ñ.»...w..á.á 0000E0
 9A5016E8 46800477 FF260677 FF26F85E C400000F 9D9A0477 FF260677 FF26F85E ^½&.w.&.w......á^½&.w.&.w..FÒ.P. 000100
 D19A016A 006A0876 FF006A1D AF6837FF 26E85EC4 001AE903 7400003D 00000FB2 ÿ...=..t.Õ..á^Ò&.7h£.j..v.j.j..ì 000120
 FD1AB6FF 022B6801 6A000010 079A5016 FD18868D 0676FF04 13E9FFC9 E900000F ...Õè.Õ...v....».P.....j.h+..Ñ.» 000140
 C4830C56 038E9AFD 1886FFFD 1AB6FF02 2C68006A 08C4830F 8C038E9A FD1886FF .Ñ.»......á.j.h,..Ñ.».Ñ.»...V..á 000160
 16E8468D 0477FF26 0677FF26 F85EC400 0010179A 0477FF26 0677FF26 F85EC408 .á^½&.w.&.w......á^½&.w.&.w..FÒ. 000180
 016A006A 0876FF00 6A1DAF68 37FF26E8 5EC4001A E9037400 003D0000 102C9A50 P.,...=..t.Õ..á^Ò&.7h£.j..v.j.j. 0001A0
 FF008568 0380E904 C4830FF5 00009A06 76FF00B5 680391E9 FFC9E900 0008F19A .þ...Õè.Õ..hç..v....¾..á.Õ..hç.. 0001C0
 FF26F85E C4000011 459A5016 FD18868D 0676FF03 6FE904C4 83104900 009A0676 v....I..á.Õo..v....».P.E...á^½&. 0001E0

Dump of file SATURN:[PCCOMMON.DUMP.DLL]SADADESK.TMP;1 on 18-APR-1990 10:51:54.61
File ID (902,31,0)   End of file block 102 / Allocated 104

Virtual block number 20 (00000014), 512 (0200) bytes

 000010AF 9A5016E8 46800477 FF260677 FF26F85E C4000010 9A9A0477 FF260677 w.&.w......á^½&.w.&.w..FÒ.P.£... 000000
 868908C4 8310EF02 CC9AE876 FFEA76FF FD1886FF FD1AB6FF 003EE903 7400003D =..t.Õ>..Ñ.».Ñ.».võ.vÒ.ä.ÿ..á... 000020
 FCD2868B 0000FFFF 9A0477FF 260677FF 26F85EC4 0017E903 7500FCD2 BE83FCD2 Ø=./Ø=.u.Õ..á^½&.w.&.w........Ø= 000040
 5EC40000 100F9A50 52000010 D89A006A 036A016A 006A016A 006AFFA5 E902FFE9 Õ..Õ£.j.j.j.j.j.j..Ä...RP.Õ...á^ 000060
 4E9A5016 E8468D04 77FF2606 77FF26F8 5EC40000 00399A04 77FF2606 77FF26F8 ½&.w.&.w..9...á^½&.w.&.w..FÒ.P.N 000080
 6A016A00 6AFFD3E9 0000FFFF 9A006A37 FF26E85E C40010E9 03740000 30000000 ...=..t.Õ..á^Ò&.7j......Õ£.j.j.j 0000A0
 0000009A 0676FF00 B5680286 E9000005 9C9A5052 00000595 9A006A01 6A016A00 .j.j.j......RP.....Õ..hç..v..... 0000C0
 009A0676 FF008568 0264E904 C4831111 00009A06 76FF00B5 680275E9 04C48311 ..á.Õu.hç..v.......á.Õd.hç..v... 0000E0
 0676FF00 B5680242 E904C483 11330000 9A0676FF 00B56802 53E904C4 83112200 ."..á.ÕS.hç..v....3..á.ÕB.hç..v. 000100
 1886FFFD 1AB6FF00 000C319A 5016FD18 86800676 FF0231E9 04C4830B C100009A ...è..á.Õ1..v....».P.1....Ñ.».Ñ. 000120
 2D01F0E9 0200E902 03E90000 FFFF9A00 6A006A00 6A505200 0002469A 800868FD »h...F...RPj.j.j......Õ..Õ..Õ».- 000140
 09450674 05611169 04960339 03F11182 A7FF2E93 C003FFEF E9037600 F43D01A6 Ì.=¶.v.Õÿ..å...Ì..þ.9...i.a.t.E. 000160
 11690A1B 11690A0A 09E11169 09BB098C 098C1169 09780967 098C1169 09561169 i.V.i...g.x.i.....£.i.Ã...i....i. 000180
 11691169 0B510B51 11690A8A 0A8A0A8A 0A8A1169 0B2B0B05 0ADF0AB9 11690A43 C.i.¿.Õ...+.i..........i.Q.Q.i.i. 0001A0
 0A8A0A8A 0A8A0A8A 0A8A0A8A 11690A8A 0A8A0A8A 0A8A1169 0A8A0A8A 0A8A1169 i.......i..........i............. 0001C0
 0C7A0C7A 11691169 0BF80B62 11690A8A 0A8A0A8A 0A8A0A8A 11690A8A 0A8A0A8A ......i............i.b.½.i.i.z.z. 0001E0

Dump of file SATURN:[PCCOMMON.DUMP.DLL]SADADESK.TMP;1 on 18-APR-1990 10:51:54.61
File ID (902,31,0)   End of file block 102 / Allocated 104

Virtual block number 21 (00000015), 512 (0200) bytes

 0D0C0D0C 11690077 11690C7A 0C7A0C7A 0C7A0C7A 11690C7A 0C7A0C7A 11690C7A z.i.z.z.z.i.z.z.z.z.z.i.w.i..... 000000
 0DE20DE2 0DE20DE2 11690CA9 0C270C27 0C270C27 0C270C27 0C270C27 11691169 i.i.'.'.'.'.'.'.'.`.i.ā.ā.ā.ā. 000020
 0E110E11 0E110E11 11690E11 0E111169 0E110E11 0E110E11 11690DE2 0DE21169 i.ā.ā.i.........i.....i......... 000040
 0F590ED7 0E6C1169 0E400E40 0E400E40 0E401169 0E110E11 11691169 0E110E11 ....i.i.....i.a.a.a.a.a.i.l.■.Y. 000060
 11691169 11691169 11691138 112A1119 110810F7 10E61169 0FFD0FEC 0FDB1169 i.Û.$.».i.Ì.¥.....*.;.i.i.i.i.i. 000080
 11691169 11691169 11691169 11691169 11691169 11691169 11691169 11691169 i.i.i.i.i.i.i.i.i.i.i.i.i.i.i.i. 0000A0
 11691169 11691169 11691169 11691169 11691169 11691169 11691169 11691169 i.i.i.i.i.i.i.i.i.i.i.i.i.i.i.i. 0000C0
 11691169 11691169 11691169 11691169 11691169 11691169 11691169 11691169 i.i.i.i.i.i.i.i.i.i.i.i.i.i.i.i. 0000E0
 11691169 11691169 11691169 11691169 11691169 11691169 11691169 11691169 i.i.i.i.i.i.i.i.i.i.i.i.i.i.i.i. 000100
 11691169 11691169 11691169 11691169 11691169 11691169 11691169 11691169 i.i.i.i.i.i.i.i.i.i.i.i.i.i.i.i. 000120
 E9000088 0DE21169 11691169 11691169 11691169 11691169 11691169 11691169 i.i.i.i.i.i.i.i.i.i.i.i.i.ā.¡..Õ 000140
 0006032F 02030000 00020FE4 000202C7 000801E3 02030030 90CBC95F 5E1F0000 ...^ èù.0...D...ú...ð......./... 000160
 00060121 02030000 00050889 00020000 00040355 00020000 00030EF5 0002000C É...Ï.......U................!... 000180
 0003026F 01030000 00070AC2 00020259 00080F1B 02030000 00060690 00020065 e...............Y...ð.......o... 0001A0
 000610C4 02030000 000909C4 0002008B 000308F2 01030000 000809ED 00020008 ....Û...............á.......á... 0001C0
 00081068 02030171 000706A4 02030000 000A0E4F 000201EE 00070700 02030074 t.......Ÿ...O.......Ê...q...h... 0001E0
```

```
Dump of file SATURN:[PCCOMMON.DUMP.DLL]SADADESK.TMP;1 on 18-APR-1990 10:51:54.61
File ID (902,31,0)   End of file block 102 / Allocated 104

Virtual block number 22 (00000016), 512 (0200) bytes

 00030252 01030100 0006028A 02030000 00080984 00020013 00031155 0103026A j...U......................R... 000000
 00080A83 020302F1 00090228 02030000 000E078E 00020090 0003008A 0103001A ...................(...þ....... 000020
 00060292 02030000 0010031D 0002008F 00060F4F 0203027E 00080F30 02030365 e...0...~...O.................. 000040
 00060EE1 02030292 00080345 0203009A 000602EB 02030301 000908C8 02030115 ....à.......Š.......E.......Ă... 000060
 000803EA 0203004B 0002074C 0103021E 0007088F 02030030 00030A3C 010300A5 Ë...<...=...........L...K...õ... 000080
 000706CB 0203031F 0009084E 02030383 000C1162 020301A8 00070722 0203029D ...."...´...b.......N.......ù... 0000A0
 00090767 0203005C 0003108A 0103005B 00031083 01030046 00050197 02030185 ç.......F.......[.......\...g... 0000C0
 016A006A D88EFFFF B81E5657 000086C8 00000000 00000289 00080BDA 0203032E ....Ö...¿.......à...WV.¡...Äj.j. 0000E0
 00FFFF9A 5016FC46 8D0676FF 0000FFFF 9A505200 00FFFF9A 006A036A 016A006A j.j.j.j......RP......v..F•.P.... 000100
 C70009E9 037500FA 7E830000 FFFF9A50 16FA468D 0477FF26 0677FF26 FC5EC400 .á^•&.w.&.w..Fª.P......~ª.u.Õ..ú 000120
 A05EC400 00FFFF9A 5016A046 8D0477FF 260677FF 26FC5EC4 0093E900 00FF7A86 .z...Õ..á^•&.w.&.w..F..P.....á^. 000140
 E90004FF 7A86C700 62E90002 FF7A86C7 006BE900 01FF7A86 C70039E9 0A478B26 &.G.Õ9.ú.z...Õk.ú.z...Õb.ú.z...Õ 000160
 003BE900 3EE90000 FF7A86C7 0047E900 10FF7A86 C70050E9 0008FF7A 86C70059 Y.ú.z...ÕP.ú.z...ÕG.ú.z...Õ>.Õ;. 000180
 FFB9E903 75006930 FFDCE9FF BBE90375 00323000 08E90376 FFE3E903 7500683D =h.u.Õ0.v.Õ..=2.u.ÕE.ÕE.=i.u.Õ¿. 0001A0
 46800676 FFFFB9E9 FF8FE903 7700823D FFC4E903 7300813D FFBAE903 75006C3D =l.u.Õ¤.=..s.Õá.=..w.Õ..Õ¿..v..F 0001C0
 26FC5EC4 B65689B4 46890000 FFFF9A80 05689876 FF9A76FF 0000FFFF 9A501698 ..P......v..v.h........FÇ.VÑá^•& 0001E0

Dump of file SATURN:[PCCOMMON.DUMP.DLL]SADADESK.TMP;1 on 18-APR-1990 10:51:54.61
File ID (902,31,0)   End of file block 102 / Allocated 104

Virtual block number 23 (00000017), 512 (0200) bytes

 52E90374 009C7E83 00000847 C726FC5E C40009E9 0375009C 7E839C46 89084788 .G..F..~..u.Õ..á^•&úG....~..t.ÕR 000000
 A8878080 7E8D189E 5E68003D E9037200 949E7E81 9E46FF00 03E90000 9E46C700 .úF...Õ...F..~...r.Õ=.k^...~..ñ´ 000020
 00D22B8E 46880181 688476FF B676FF00 1FE90375 00847E83 A5F2000C B9071601 ...¿..·Ë.~..u.Õ...vÑ.vÇh...F.+Ø. 000040
 7E819E46 FF0003E9 00009E46 C7FFB6E9 000001F6 9A006A00 6A505201 CA830000 ...ò.RPj.j..~...ÕÑ.úF...Õ...F..~ 000060
 03740084 7E83A5F2 000CB907 1601A887 8D807E8D 189E5E68 0168E903 7200949E ...r.Õh.k^...~..ñ´...¿..·Ë.~..t. 000080
 2CE90375 804685FF 7A868800 0CE90375 1F807E83 0141E903 75009C7E 830009E9 Õ...~..u.ÕA..~..u.Õ....z..F.u.Õ, 0000A0
 505201CA 8300000D D22B8446 88018268 8476FFB6 76FF0031 E9037500 847E8301 ..~..u.Õ1..vÑ.vÇh...F.+Ø....ò.RP 0000C0
 5688B446 88000EE9 FF7E9689 FF7C8689 AE5688AC 46880000 FFFF9A50 16A4468D .FË.P......F¯.VÚ..|...~.Õ...FÇ.V 0000E0
 A44689B8 46881FA5 F20008B9 1F161E07 1688768D B87E8DFF 7E9689FF 7C868986 Ñ..|...~..~|.v......¿..·Ë..F|.FË 000100
 4688AE56 89AC4689 C25688C0 4688AA46 89BE468B A84689BC 4688A646 89BA468B .F¤.F|.F¥.F´.Fƒ.F¨.Fâ.Vô.F¯.VÛ.F 000120
 1E046AFF 6AFF7CB6 FFFF7EB6 FF003FE9 03750086 7E83B256 89804689 C65688C4 á.Vô.F¯.Vý.~..u.Õ?..Ñ~..Ñ|.j.j.. 000140
 6A8676FF 036A006A FF7CB6FF FF7EB6FF 006A006A 006A006A 006A0200 6801A668 h¦.h..j.j.j.j.j..Ñ~..Ñ|.j.j..v.j 000160
 8E006A00 6A0039E9 03750082 7E83AE56 89AC4689 0000FFFF 9A006A00 6A006A00 .j.j.j.......F¯.VÛ.~..u.Õ9.j.j.. 000180
 68FF7CB6 FFFF7EB6 FF0000FF FF9A5016 C8468D32 6A8276FF 020036FF 26286406 .d+&.6...v.j2.Fà.P......Ñ~..Ñ|.h 0001A0
 8D018068 FF7CB6FF FF7EB6FF 0019E900 00017C9A 5016C846 8D5016A4 468D0180 ...FË.P.Fà.P.|...Õ...Ñ~..Ñ|.h... 0001C0
 0000199A 006A016A 016A006A 016A006A FE8BE900 0002DD9A 006A006A 5016A446 FË.Pj.j..Ì...Õ.±j.j.j.j.j.j..... 0001E0

Dump of file SATURN:[PCCOMMON.DUMP.DLL]SADADESK.TMP;1 on 18-APR-1990 10:51:54.61
File ID (902,31,0)   End of file block 102 / Allocated 104

Virtual block number 24 (00000018), 512 (0200) bytes

 FFD88E00 08881E56 57000004 C8CBC95F 5E1F0000 E9000088 00000020 9A505200 .RP. ...¡..Õ...^_èùà...WV.¡...Ă. 000000
 76FFFE56 89FC4689 00000102 9A800568 50520000 FFFF9A00 6A056A06 76FF0876 v..v.j.j......RPħ........F•.V±.v 000020
 0000B800 06E90375 000C7E83 505201CA 83000000 D2280A46 88019268 FC76FFFE ±.v•h...F.+Ø....ò.RP.~..u.Õ..¡.. 000040
 04C8CBC9 5F5E1F00 0002F99A 505200CA 83400000 C02B0088 D2284000 B80003E9 Õ..¡.ə+Ø.Å+ä..ə.ò.RP.ª....^_èùà. 000060
 76FFFE56 89FC4689 00000344 9A800568 0676FF08 76FFD88E 032B881E 56570000 ..WV.¡+..Ă.v..v.h...D....F•¯V±.v 000080
 2000B800 06E90375 000C7E83 505201CA 8300000D D2280A46 88019268 FC76FFFE ±.v•h...F.+Ø....ò.RP.~..u.Õ..¡. 0000A0
 06C8CBC9 5F5E1F00 0003859A 505200CA 8320000D C0280088 D2280000 B80003E9 Õ..¡..+Ø.Å+ä.. .ò.RP......^_èùà. 0000C0
 76FFFE56 89FC4689 000003A4 9A800568 0676FF08 76FFD88E 0396B81E 56570000 ..WV.¡...Ă.v..v.h...Ê....F•¯V±.v 0000E0
 46890000 03E59A20 0068006A 505201CA 83000000 D2280A46 88019168 FC76FFFE ±.v•h...F.+Ø....ò.RPj.h. .Ì....F 000100
 038E9A06 76FF0876 FF0A76FF 502000B8 0003E900 00B80006 E9037500 FA7E83FA ª.~ª.u.Õ..¡..Õ..¡. P.v..v..v.... 000120
 16FA468D 0676FF08 76FFD88E 03F6881E 56570000 1EC8CBC9 5F5E1F08 C483FFFF ...á..^_èùà...WV.¡~..Ă.v..v..Fª. 000140
 46800477 FF260677 FF26FC5E C4000000 2D9A5016 FC468DFA 76FF0000 FFFF9A50 P......v̄ª.F•.P.-...á^•&.w.&.w..F 000160
 B80000E6 46C7F446 89F64689 00008800 1FE90375 00F87E83 00000042 9A5016F8 ½.P.B....~½.u.Õ..¡...F~.F¶úF|..¡ 000180
 5016F446 8D0477FF 260677FF 26FC5EC4 003AE900 00EA46C7 E24689E4 46890000 ...Fõ.FãúFõ..Õ:.á^•&.w.&.w..F¶.P 0001A0
 E45689E2 46890657 88260447 8826F45E C4E64689 0A478826 F45EC400 0000699A .i...á^¶&.G..F|á^¶&.G.&.W..Fã.Võ 0001C0
 05210323 9A0676FF 0876FF01 A568016A 0C02E90A 4688EA46 89084788 26F45EC4 á^¶&.G..Fõ.F.Õ..j.hË..v..v..#.!. 0001E0
```

Dump of file SATURN:[PCCOMMON.DUMP.DLL]SADADESK.TMP;1 on 18-APR-1990 10:51:54.61
File ID (902,31,0)   End of file block 102 / Allocated 104

Virtual block number 25 (00000019), 512 (0200) bytes

```
76FF0876 FF01B868 016A08C4 83053403 239A0676 FF0876FF 01A86801 6A08C483 .á.j.h´..v..v..#.4..á.j.h£..v..v 000000
B968016A 08C48305 5A03239A 0676FF08 76FF01AF 68016A08 C4830547 03239A06 ..#.G..á.j.h£..v..v..#.Z..á.j.h¿ 000020
0003E900 01B80006 E90375E4 4608E246 8808C483 05850323 9A0676FF 0876FF01 ..v..v..#....á..Fã.Fõu.Õ..|..Õ.. 000040
01AB68E8 76FF08C4 83059903 239A0676 FF0876FF 01AA68E8 76FFE846 890000B8 |...FÒ.vÒh¯..v..v..#....á..vÒh¨. 000060
8305C103 239A0676 FF0876FF 01AC68E8 76FF08C4 8305AD03 239A0676 FF0876FF .v..v..#.Ù..á..vÒh¯..v..v..#.è.. 000080
FF0876FF 01B868E8 76FF08C4 8305D503 239A0676 FF0876FF 01AE68E8 76FF08C4 á..vÒhÛ..v..v..#.Í..á..vÒh|..v.. 0000A0
7E8308C4 83060703 239A0676 FF0876FF 01B668E8 76FF08C4 8305E903 239A0676 v..#.Õ..á..vÒhÑ..v..v..#....á..- 0000C0
6A0BAEE9 08C48306 1D03239A 0676FF08 76FF01B3 68E876FF E8468940 C01B01EA õ..âª.FÒ.vÒh°..v..v..#....á.ÕÛ.j 0000E0
03239A06 76FF0876 FF01A768 016A08C4 83063003 239A0676 FF0876FF 01A66801 .hÏ..v..v..#.0..á.j.hÏ..v..v..#. 000100
01B16801 6A08C483 06590323 9A0676FF 0876FF01 B268016A 0B85E908 C4830646 F..á.Õ..j.hý..v..v..#.Y..á.j.hÝ. 000120
76FF01B0 68E876FF E8468940 C01B01EA 7E8308C4 83045003 239A0676 FF0876FF .v..v..#.P..á..-õ..âª.FÒ.vÒh¯..v 000140
FF01B468 E876FFE8 468940C0 1B01EA7E 83083EE9 08C48306 9803239A 0676FF08 ..v..#....á.Õ>..-õ..âª.FÒ.vÒhÇ.. 000160
C483060A 03239A06 76FF0876 FF01B568 E876FF08 C48306AC 03239A06 76FF0876 v..v..#.˜..á..vÒhç..v..v..#.Ö..á 000180
8D68E876 FFE84689 0000B800 03E90001 B80006E9 0375E446 08E2468B 0B09E908 .Õ...Fã.Fõu.Õ..|..Õ..|...FÒ.vÒh§ 0001A0
07020323 9A0676FF 0876FF01 BF68E876 FF08C483 06EE0323 9A0676FF 0876FF01 ..v..v..#.Ÿ..á..vÒh¢..v..v..#... 0001C0
0876FF01 C168E876 FF08C483 07160323 9A0676FF 0876FF01 C068E876 FF08C483 .á..vÒhá..v..v..#....á..vÒhè..v. 0001E0
```

Dump of file SATURN:[PCCOMMON.DUMP.DLL]SADADESK.TMP;1 on 18-APR-1990 10:51:54.61
File ID (902,31,0)   End of file block 102 / Allocated 104

Virtual block number 26 (0000001A), 512 (0200) bytes

```
FF08C483 073E0323 9A0676FF 0876FF01 C268E876 FF08C483 072A0323 9A0676FF .v..#.*..á..vÒhô..v..v..#.>..á.. 000000
9A0676FF 0876FF01 C568E876 FF08C483 07520323 9A0676FF 0876FF01 C468E876 vÒhá..v..v..#.R..á..vÒhé..v..v.. 000020
C768E876 FF08C483 077A0323 9A0676FF 0876FF01 C668E876 FF08C483 07660323 #.f..á..vÒhó..v..v..#.z..á..vÒhú 000040
07A20323 9A0676FF 0876FF01 C968E876 FF08C483 078E0323 9A0676FF 0876FF01 ..v..v..#....á..vÒhè..v..v..#.Å. 000060
0876FF01 CC68E876 FF08C483 07B60323 9A0676FF 0876FF01 CA68E876 FF08C483 .á..vÒhò..v..v..#.Ñ..á..vÒhä..v. 000080
76FF01CD 68E876FF E8468940 C01B01EA 7E8309FF E908C483 07D70323 9A0676FF .v..#.■..á.Õ...-õ..âª.FÒ.vÒhë..v 0000A0
08C48307 FF03239A 0676FF08 76FF01D1 68E876FF 08C48307 EB03239A 0676FF08 ..v..#.Š..á..vÒhl..v..v..#....á. 0000C0
0676FF08 76FF01E0 68E876FF 08C48308 1303239A 0676FF08 76FF01D6 68E876FF .vÒh■..v..v..#....á..vÒhÁ..v..v. 0000E0
76FF0876 FF01CE68 E876FFE8 468940C0 1B01EA7E 8309A2E9 08C48308 3403239A .#.4..á.ÕÅ..-õ..âª.FÒ.vÒhö..v..v 000100
E876FF08 C483085C 03239A06 76FF0876 FF01CF68 E876FF08 C4830848 03239A06 ..#.H..á..vÒhü..v..v..#.\..á..vÒ 000120
76FFE846 8940C01B 01EA7E83 0959E908 C483087D 03239A06 76FF0876 FF01D068 hÅ..v..v..#.)..á.ÕY..-õ..âª.FÒ.v 000140
239A0676 FF0876FF 01D368E8 76FF08C4 83089103 239A0676 FF0876FF 01D268E8 Òh■..v..v..#....á..vÒhÆ..v..v..# 000160
01D568E8 76FF08C4 83088903 239A0676 FF0876FF 01D468E8 76FF08C4 8308A503 .È..á..vÒhå..v..v..#.¿..á..vÒhí. 000180
D768E876 FFE84689 40C01801 EA7E8308 FCE908C4 83080A03 239A0676 FF0876FF .v..v..#.Ö..á.Õ=..-õ..âª.FÒ.vÒh■ 0001A0
09020323 9A0676FF 0876FF01 D868E876 FF08C483 08EE0323 9A0676FF 0876FF01 ..v..v..#.Ÿ..á..vÒhÄ..v..v..#... 0001C0
0876FF01 DA68E876 FF08C483 09160323 9A0676FF 0876FF01 D968E876 FF08C483 .á..vÒhl..v..v..#....á..vÒhÖ..v. 0001E0
```

Dump of file SATURN:[PCCOMMON.DUMP.DLL]SADADESK.TMP;1 on 18-APR-1990 10:51:54.61
File ID (902,31,0)   End of file block 102 / Allocated 104

Virtual block number 27 (0000001B), 512 (0200) bytes

```
FF08C483 093E0323 9A0676FF 0876FF01 DB68E876 FF08C483 092A0323 9A0676FF .v..#.*..á..vÒhÛ..v..v..#.>..á.. 000000
9A0676FF 0876FF01 DC68E876 FF08C483 09520323 9A0676FF 0876FF01 DD68E876 vÒhÏ..v..v..#.R..á..vÒhÉ..v..v.. 000020
DE68E876 FF08C483 097A0323 9A0676FF 0876FF01 DF68E876 FF08C483 09660323 #.f..á..vÒhÔ..v..v..#.z..á..vÒhß 000040
68E876FF E8468940 C01B01EA 7E83083B E908C483 09B00323 9A0676FF 0876FF01 ..v..v..#....á.Õ;..-õ..âª.FÒ.vÒh 000060
0E03239A 0676FF08 76FF01E2 68E876FF 08C48309 AF03239A 0676FF08 76FF01E1 Ä..v..v..#.£..á..vÒhä..v..√..#.. 000080
76FF01E4 68E876FF 08C48309 D703239A 0676FF08 76FF01E3 68E876FF 08C48305 ..á..vÒhD..v..v..#.■..á..vÒ ò..v 0000A0
08C4830A 1903239A 0676FF08 76FF01E5 68E876FF 08C48309 EB03239A 0676FF08 ..v..#.Š..á..vÒhÍ..v..v..#....á. 0000C0
01E868E8 76FFE846 890000B8 0003E900 01B80006 E90375E4 4608E246 8B07CAE9 Õò..Fã.Fõu.Õ..|..Õ..|...FÒ.vÒhÒ. 0000E0
830A4E03 239A0676 FF0876FF 01E768E8 76FF08C4 830A2D03 239A0676 FF0876FF .v..v..#.-..á..vÒhÓ..v..v..#.N.. 000100
0A620323 9A0676FF 0876FF01 EA68E876 FFE84689 40C01B01 EA7E8307 8BE908C4 á.Õ...-õ..âª.FÒ.vÒhõ..v..v..#.b. 000120
0876FF01 F468E876 FF08C483 0A760323 9A0676FF 0876FF01 F368E876 FF08C483 .á..vÒh¤..v..v..#.v..á..vÒh¶..v. 000140
FF08C483 0A9E0323 9A0676FF 0876FF01 F568E876 FF08C483 0A8A0323 9A0676FF .v..#....á..vÒh%..v..v..#....á.. 000160
9A0676FF 0876FF01 FB68E876 FF08C483 0AB20323 9A0676FF 0876FF01 F968E876 vÒh°..v..v..#.ý..á..vÒh«..v..v.. 000180
FE68E876 FF08C483 0ADA0323 9A0676FF 0876FF01 FC68E876 FF08C483 0AC60323 #.6..á..vÒh=..v..v..#.Ö..á..vÒh± 0001A0
08190323 9A0676FF 0876FF02 0768E876 FF08C483 0AEE0323 9A0676FF 0876FF01 ..v..v..#.Ÿ..á..vÒh...v..v..#... 0001C0
01F668E8 76FFE846 890000B8 0003E900 01B80006 E90375E4 460BE246 8B08C483 .á..Fã.Fõu.Õ..|..Õ..|...FÒ.vÒh-. 0001E0
```

Dump of file SATURN:[PCCOMMON.DUMP.DLL]SADADESK.TMP;1 on 18-APR-1990 10:51:54.61
File ID (902,31,0)   End of file block 102 / Allocated 104

Virtual block number 28 (0000001C), 512 (0200) bytes

```
83084903 239A0676 FF0876FF 01F768E8 76FF08C4 83082D03 239A0676 FF0876FF .v..v..#.-..6..vÒh%..v..v..#.I.. 000000
016A08C4 83085C03 239A0676 FF0876FF 01EB6801 6A011BE9 E6468806 88E908C4 6.Õ...FlÕ..j.hŠ..v..v..#.\..6.j. 000020
9A0676FF 0876FF01 ED68016A 0128E908 C4830B72 03239A06 76FF0876 FF01EC68 hš..v..v..#.r..6.Õ(.j.hÚ..v..v.. 000040
805016F0 46801082 6837FF26 F45EC400 00F246C7 0068F046 C708C483 088F0323 #.¢..6.úFÞh.úF·..6^¶&.7hý..FÞ.P. 000060
E8468900 00880003 E90001B8 0006E903 75F24608 F0468800 000C1E9A 5016EC46 F$.P......FÞ.F·u.Õ..|..Õ..|...FÒ 000080
FF0876FF 01ED6801 6A00C5E9 08C48308 D503239A 0676FF08 76FF01F1 68E876FF .vÒhþ..v..v..#.Í..6.Õé.j.hÚ..v.. 0000A0
68016A08 C48308F8 03239A06 76FF0876 FF01EF68 016A08C4 8308E803 239A0676 v..#.Õ..6.j.hÿ..v..v..#.«..6.j.h 0000C0
37FF26F4 5EC40000 F246C700 68F046C7 08C4830C 4803239A 0676FF08 76FF01F0 Þ..v..v..#.H..6.úFÞh.úF·..6^¶&.7 0000E0
0001B800 06E90375 F24608F0 46880000 FFFF9A50 16EC468D 5016F046 801D8268 hý..FÞ.P.F$.P......FÞ.F·u.Õ..|.. 000100
003CE908 C4830CA8 03239A06 76FF0876 FF01F168 E876FFE8 46890000 B80003E9 Õ..|...FÒ.vÒhþ..v..v..#.´..6.Õ<. 000120
DFE9FEF6 E9037500 323DFF61 E9037200 68300013 E9037600 693D0036 E90039E9 Õ9.Õ6.=i.v.Õ..=h.r.Õa.=2.u.Õ-±ÕÕ 000140
83052EE9 FFC4E9FE 82E90377 00823DFF CFE90373 00813DFF 4EE90375 006C3DFF .=l.u.ÕN.=..s.Õü.=..w.Õý±Õé.Õ... 000160
E876FF08 C4830CBC 03239A06 76FF0876 FF01FF68 E876FFE8 468940C0 1801EA7E ~õ..ãa.FÒ.vÒh...v..v..#.¥..6..vÒ 000180
03239A06 76FF0876 FF020168 E876FF08 C4830CD0 03239A06 76FF0876 FF020068 h...v..v..#.Å..6..vÒh...v..v..#. 0001A0
FF020368 E876FF08 C4830CF8 03239A06 76FF0876 FF020268 E876FF08 C4830CE4 õ..6..vÒh...v..v..#.½..6..vÒh... 0001C0
C4830D20 03239A06 76FF0876 FF020468 E876FF08 C4830D0C 03239A06 76FF0876 v..v..#....6..vÒh...v..v..#. ..6 0001E0
```

Dump of file SATURN:[PCCOMMON.DUMP.DLL]SADADESK.TMP;1 on 18-APR-1990 10:51:54.61
File ID (902,31,0)   End of file block 102 / Allocated 104

Virtual block number 29 (0000001D), 512 (0200) bytes

```
76FF0876 FF020668 E876FF08 C4830D34 03239A06 76FF0876 FF020568 E876FF08 ..vÒh...v..v..#.4..6..vÒh...v..v 000000
0000B800 03E90001 B80006E9 0375E446 08E24688 0481E908 C4830677 03239A06 ..#.w..6.Õ...Fã.FÕu.Õ..|..Õ..|.. 000020
0876FF02 0A68E876 FF08C483 0D760323 9A0676FF 0876FF02 0968E876 FFE84689 .FÒ.vÒh...v..v..#.v..6..vÒh...v. 000040
FF08C483 0D9E0323 9A0676FF 0876FF02 0B68E876 FF08C483 0D8A0323 9A0676FF .v..#....6..vÒh...v..v..#....6.. 000060
9A0676FF 0876FF02 0E68E876 FF08C483 0D820323 9A0676FF 0876FF02 0C68E876 vÒh...v..v..#.ý..6..vÒh...v..v.. 000080
7E8303EF E908C483 0DF20323 9A0676FF 0876FF02 0F68E876 FF08C483 0DC60323 #.6..6..vÒh...v..v..#.·..6.Õý..~ 0000A0
9A0676FF 0876FF02 1B68E876 FFE84689 0000B800 03E90001 B80006E9 037432E6 l2t.Õ..|..Õ..|...FÒ.vÒh...v..v.. 0000C0
1968E876 FF08C483 0E1A0323 9A0676FF 0876FF02 1C68E876 FF08C483 0E060323 #....6..vÒh...v..v..#....6..vÒh. 0000E0
00B80003 E90001B8 0006E903 7468E67E 8308C483 0E430323 9A0676FF 0876FF02 ..v..v..#.C..6..~lht.Õ..|..Õ..|. 000100
76FF0222 68E876FF 08C4830E 5703239A 0676FF08 76FF0221 68E876FF E8468900 ..FÒ.vÒh!..v..v..#.W..6..vÒh"..v 000120
0006E903 740081E6 7E81000A E9037500 82E67E81 08C4830E 8A03239A 0676FF08 ..v..#....6..~l..u.Õ...~l..t.Õ.. 000140
FF08C483 0E9E0323 9A0676FF 0876FF02 1368016A E8468900 00B80003 E90001B8 |..Õ..|...FÒj.h...v..v..#....6.. 000160
9A0676FF 0876FF02 1D68E876 FF08C483 0EB20323 9A0676FF 0876FF02 1468E876 vÒh...v..v..#.ý..6..vÒh...v..v.. 000180
4608E246 8808C483 0EF10323 9A0676FF 0876FF02 1E68E876 FF08C483 0EC60323 #.6..6..vÒh...v..v..#.þ.. ..Fã.F 0001A0
239A0676 FF0876FF 021168E8 76FFE846 89000088 0003E900 01880006 E90375E4 õu.Õ..|..Õ..|...FÒ.vÒh...v  v..# 0001C0
021568E8 76FF08C4 830F1903 239A0676 FF0876FF 021268E8 76FF08C4 830F0503 ....6..vÒh...v..v..#....6..vuh.. 0001E0
```

Dump of file SATURN:[PCCOMMON.DUMP.DLL]SADADESK.TMP;1 on 18-APR-1990 10:51:54.61
File ID (902,31,0)   End of file block 102 / Allocated 104

Virtual block number 30 (0000001E), 512 (0200) bytes

```
830F4103 239A0676 FF0876FF 021A68E8 76FF08C4 830F2D03 239A0676 FF0876FF .v..v..#.-..6..vÒh...v..v..#.A.. 000000
75E44608 E2468802 74E908C4 830F6F03 239A0676 FF0876FF 022068E8 76FF08C4 6..vÒh ..v..v..#.o..6.Õt..Fã.FÕu 000020
8303239A 0676FF08 76FF0216 68E876FF E8468900 00880003 E90001B8 0006E903 .Õ..|..Õ..|...FÒ.vÒh...v..v..#.. 000040
1801EA7E 830232E9 08C4830F A303239A 0676FF08 76FF0217 68E876FF 08C4830F ..6..vÒh...v..v..#.È..6.Õ2..~õ.. 000060
0876FF02 2568016A 08C4830F 8603239A 0676FF08 76FF0224 68016AE8 468940C0 ãa.FÒj.h$..v..v..#.Ñ..6.j.h%..v. 000080
016A08C4 830FDC03 239A0676 FF0876FF 02266801 6A08C483 0FC90323 9A0676FF .v..#.è..6.j.h&..v..v..#.É..6.j. 0000A0
0303239A 0676FF08 76FF0228 68016A08 C4830FEF 03239A06 76FF0876 FF022768 h'..v..v..#.ÿ..6.j.h(..v..v..#.. 0000C0
76FF022B 68E876FF 08C48310 1703239A 0676FF08 76FF022A 68E876FF 08C48310 ..6..vÒh*..v..v..#....6..vÒh+..v 0000E0
08C48310 4103239A 0676FF08 76FF022C 68E876FF 08C48310 2803239A 0676FF08 ..v..#.+..6..vÒh,..v..v..#.A..6. 000100
76FF0876 FF022F68 016A08C4 83105403 239A0676 FF0876FF 022E6801 6A018AE9 Õ..j.h...v..v..#.T..6.j.h/..v..v 000120
E8468900 00880003 E90001B8 0006E903 75E44608 E2468808 C483107F 03239A06 ..#....6..Fã.FÕu.Õ..|..Õ..|...FÒ 000140
FF0876FF 02326801 6A0136E9 08C48310 9503239A 0676FF08 76FF0230 68E876FF .vÒh0..v..v..#....6.Õ6.j.h2..v.. 000160
68016A08 C48310B8 03239A06 76FF0876 FF023368 016A08C4 8310A803 239A0676 v..#.´..6.j.h3..v..v..#.£..6.j.h 000180
10E10323 9A0676FF 0876FF02 3568016A 08C48310 CE03239A 0676FF08 76FF0234 4..v..v..#.ö..6.j.h5..v..v..#.Ã. 0001A0
76FF0876 FF023768 016A08C4 8309C303 239A0676 FF0876FF 02366801 6A08C483 .6.j.h6..v..v..#.ú..6.j.h7..v..v 0001C0
3D0053E9 0376F878 E9037501 E03D0088 E9008EE9 00C1E908 C4830062 03239A06 ..#.b..6.Õè.Õƒ.ÕE.=Á.u.Õx½v.ÕS.= 0001E0
```

```
Dump of file SATURN:[PCCOMMON.DUMP.DLL]SADADESK.TMP;1 on 18-APR-1990 10:51:54.61
File ID (902,31,0)   End of file block 102 / Allocated 104

Virtual block number 31 (0000001F), 512 (0200) bytes

 7501AF3D F4E3E903 7501A53D F3DCE903 7501A43D 001BE903 76F568E9 037501B3 °.u.Õh%v.Õ..=£.u.Õ£µ=£.u.ÕD¶=£.u 000000
 3DF6CCE9 037501CD 3DF677E9 037501CC 3DF575E9 037501BC 3DFFC5E9 F504E903 .Õ.%Õé.=¥.u.ÕuK=ä.u.Õw-=ë.u.Õä-= 000020
 3D0023E9 0376FBD2 E9037502 083DFF9A E9F762E9 037501D6 3DF70DE9 037501D1 ì.u.Õ.¼=ø.u.Õb¼Õ..=..u.Õø«v.Õ#.= 000040
 E9FB00E9 037501FE 3DF9AEE9 037501EA 3DF8B6E9 037501E9 3DF87CE9 037501E6 ì.u.Õ|½=Õ.u.ÕÑ½=õ.u.ÕÜ'=±.u.Õ.«Õ 000060
 E9037502 2D3DFDE1 E9037502 233DFDA7 E9037502 153DFC34 E9037502 103DFF6A j.=..u.Õ4==..u.ÕÏ»=#.u.ÕÃ»=-.u.Õ 000080
 0006047F 0203000F CBC95F5E 1F0000E9 000088FF 3FE9FECD E9037502 313DFE81 .±=1.u.Õë±Õ7.¡..Õ...^_èù........ 0000A0
 00030404 01030006 00030298 010302D4 00080494 02030000 000310F4 0002000C É...¶...........å........  ..... 0000C0
 00060B95 02030000 00100462 0002009D 000302C3 01030019 0003033A 01030013 ....:.......û.......b.....  ..... 0000E0
 00030314 0103005B 00030300 010300A5 000600F4 0203003D 0003042A 0103009A ....*...=...¶...È.......[....... 000100
 00000000 00000000 00000000 000000C9 00060472 020302B9 000804D1 0203005C \...1...¿...r...è............... 000120
 FE5689FC 46890000 FFFF9A0A 76FF0676 FF0876FF D88EFFFF B81E5657 000004C8 à...WV.¡...Ä.v..v..v.......F=.V± 000140
 76FFD88E 0008B81E 56570000 04C8C8C9 5F5E1F00 00FFFF9A 016AFC76 FFFE76FF .v±.v=j.......^_èùà...WV.¡...Ä.v 000160
 1F000000 299A006A FC76FFFE 76FFFE56 89FC4689 00000016 9A0A76FF 0676FF08 ..v..v.......F=.V±.v±.v=j..).... 000180
 868D0676 FFFDB486 89FDB686 890000B8 D88E003A B81E5657 00024CC8 CBC95F5E ^_èùàL..WV.¡:..Ä¡....Ñ»..Ç».v... 0001A0
 868D0676 FF096AFF FF00009A 5016FDC0 868D096A 0676FF00 00FFFF9A 5016FDE2 ã».P......v.j...à».P.....j..v... 0001C0
 FDBE868B 0007E903 7500FDBE BE83FDBE 86890000 FFFF9A50 16EC468D 5016FDC0 â».P.FŠ.P.......ƒ».ƒƒ».u.Õ....ƒ» 0001E0

Dump of file SATURN:[PCCOMMON.DUMP.DLL]SADADESK.TMP;1 on 18-APR-1990 10:51:54.61
File ID (902,31,0)   End of file block 102 / Allocated 104

Virtual block number 32 (00000020), 512 (0200) bytes

 07E90375 00FDBEBE 83FDBE86 890000FF FF9A5016 FC468DEC 76FFEE76 FF02CFE9 Õü..vŸ.vš.F=.P.......ƒ».ƒƒ».u.Õ. 000000
 16FEEA86 8D016AFC 76FFFE76 FFEC76FF EE76FF00 FEEA86C6 02AAE9FD BE868800 ...ƒ»Õ^.6.õ±..vŸ.vš.v±.v=j...õ±. 000020
 76FFEE76 FF0277E9 FDBE868B 0007E903 7500FDBE BE83FDBE 86890000 FFFF9A50 P.......ƒ».ƒƒ».u.Õ....ƒ»Õw..vŸ.v 000040
 FEEA868D 0256E9FD BE868800 07E90374 8491FDBE BE81FDBE 86890000 FFFF9AEC š.......ƒ».ƒƒ»..t.Õ....ƒ»ÕV...õ± 000060
 FEEA868D 0064E903 7410F846 F6F04689 000001A2 9A006A00 6A5016F8 468D5016 .P.F½.Pj.j..Å....FÞ-F½.t.Õd...õ± 000080
 0040E900 FEEA86C6 0008E903 7500FDBE BE83FDBE 86890000 FFFF9A01 01685016 .Ph.........ƒ».ƒƒ».u.Õ..6.õ±.Õa. 0000A0
 6A006A50 16F8468D 5016FEEA 868D08C4 83FFFF00 109A5016 FEEA868D 0F88681E .h....õ±.P......6...õ±.P.F½.Pj.j 0000C0
 00FEEA86 C60005E9 037410F8 46F60009 E9037400 F07E83F0 46890000 FFFF9A00 .......FÞ.-Þ.t.Õ..-F½.t.Õ..6.õ±. 0000E0
 90681E00 6A0F9B68 1E5016FE EA868DFD E2B6FFFD E4B6FF01 6A006A00 00FA46C7 úF°..j.j..Ñõ».Ñä»..õ±.P.h..j..h. 000100
 0124E901 95E90002 B80112E9 FDBE868B FDBE8689 0000FFFF 9A5016FD E8868D0F ...Õ».P.......ƒ»..ƒ»Õ..¡..Õ..Õ$. 000120
 006A006A 00000235 9A5016F2 468D056A 00AD6802 0036FF26 2B66068E 006A006A j.j...f+&.6..hÜ.j..F·.P.5...j.j. 000140
 16FDE886 8D2E6A00 00FFFF9A 5016FDB8 868D056A 00AC6802 0036FF26 2B66068E ..f+&.6..h¯.j...¡».P.....j...Õ». 000160
 B6FF0027 E90375FD B68608FD B48688FD B69689FD B4868906 C483026F 01789A50 P.x.o..6...Ç»..Ñ»..Ç»..Ñ»u.Õ'..Ñ 000180
 FDE686C7 0009E903 7400003D 08C48302 A2008C9A 5016FDB8 868DFDB4 B6FFFDB6 Ñ».ÑÇ»..¡».P...Å..6.=..t.Õ..ú.Ì» 0001A0
 9A5016F2 468DFDB4 86FFFDB6 B6FF0026 E90375FD B68608FD B4868800 54E90001 ..ÕT...Ç»..Ñ»u.Õ&..ÑÑ».ÑÇ».F·.P. 0001C0
 6A006A00 01FA46C7 0021E900 03FDE686 C70009E9 03740000 3D08C483 018D008C .....6.=..t.Õ..ú.Ì»..Õ!.úF°..j.j 0001E0

Dump of file SATURN:[PCCOMMON.DUMP.DLL]SADADESK.TMP;1 on 18-APR-1990 10:51:54.61
File ID (902,31,0)   End of file block 102 / Allocated 104

Virtual block number 33 (00000021), 512 (0200) bytes

 01FA46C7 0048E9F0 46890000 02F69A20 6A006A00 6A006A0F 9F681E01 6A006A01 .j.j..h..j.j.j.j .-....FÞÕH.úF°. 000000
 0024E9F0 46890000 FFFF9A20 6A006A00 6A006A0F 82681E01 6A006A01 6A006A00 .j.j.j.j..hý.j.j.j.j ......FÞÕ$. 000020
 06E90375 00033DFE E7E90375 00023DFF CBE90375 00013D00 1BE9008C E9FFFFB8 ¡..Õ..Õ..=..u.Õù.=..u.ÕÕ±=..u.Õø 000040
 50520000 03809A00 6A036A01 6A006A01 6A006AFE 93E90375 01FA7E83 FFDCE9FE ±ÕÉ..-°.u.Õ.±j.j.j.j.j.j......RP 000060
 0CC483FF FF019C9A 0676FF50 16FDE886 8DFDE686 FF0876FF 0A76FF00 0003879A ......v..v..Ñ|»..Õ».P.v.......6. 000080
 9A006A01 6A016A00 6A016A00 6A001FE9 FDBE868B 0007E903 7500003D FDBE8689 ..ƒ»=..u.Õ....ƒ»Õ..j.j.j.j.j.j.. 0000A0
 6C881E56 5700015C C8C8C95F 5E1F0000 E9FDBE86 880000FF FF9A5052 0000FFFF ....RP.......ƒ»Õ...^_èùà\..WV.¡l 0000C0
 EB468912 56881046 8800C846 C600FEC7 86C60001 FEC586C7 00FEA486 C6D88E00 ..Ã6.Ê±.ú.é±..6.ú±.6Fà..F..V..FŠ 0000E0
 FFE94689 078B26FC 5EC40000 FFFF9A50 16FC468D 0676FFEF 46890646 8BED5689 .VÚ.F..Fÿ.v..F=.P.....6^=&...FÕ. 000100
 2B66068E FFFF68FF FF68F476 FFF676FF 016A006A 00000085 9A5016F4 468D0676 v..F¶.P.....j.j..v-.v¶h..h....f+ 000120
 9AF876FF FA76FFFA 5689F846 890000FF FF9A5016 FEA4868D 03006802 0036FF26 &.6..h....Ê±.P......F½.V°.v°.v½. 000140
 0004989A 006A036A 016A006A 016A006A 0073E903 7401F27E 83F24689 0000FFFF .....F·.-·.t.Õs.j.j.j.j.j.j..... 000160
 9A0676FF 5016FEC7 868D5016 FEA4868D 016A0876 FF0A76FF 0000049F 9A505200 .RP......v..v.j...Ê±.P..ú±.P.v.. 000180
 0E76FF50 16C8468D 0031E9F2 46880006 E9037500 003DF246 8910C483 035B0132 2.[..6..F·=..u.Õ...F·Õ1..Fà.P.v. 0001A0
 419A5052 0000033A 9A006A01 6A016A00 6A016A00 6A08C483 02440056 9A0C76FF .v..V.D..6.j.j.j.j.j.j..:...RP.A 0001C0
 0000FECA 86C7D88E 039FB81E 56570001 B4C8C8C9 5F5E1F00 00E9F246 88000003 ....F·Õ...^_èùàÇ..WV.¡...Ãú.ò±.. 0001E0
```

Dump of file SATURN:[PCCOMMON.DUMP.DLL]SADADESK.TMP;1 on 18-APR-1990 10:51:54.61
File ID (902,31,0)   End of file block 102 / Allocated 104

Virtual block number 34 (00000022), 512 (0200) bytes

```
76FF0000 05749A50 52000005 6D9A006A 036A016A 006A016A 006A0C84 E90E4688 .F.Õ..j.j.j.j.j.j..m...RP.t....v 000000
FF1276FF 0000FFFF 9A0676FF 0876FF00 6A1076FF 1276FF00 00FFFF9A 1076FF12 ..v.......v..v.j..v..v.......v.. 000020
43680305 681076FF 1276FF00 00052A9A 006A006A 086A006A 01436803 02681076 v.h..hC.j.j.j.j..*....v..v.h..hC 000040
006A206A 006A0143 68030768 1076FF12 76FF0000 05439A00 6A006A20 6A006A01 .j.j j.j..C....v..v.h..hC.j.j j. 000060
000005C7 9A006A00 6A206A00 6A014368 03096810 76FF1276 FF000005 5C9A006A j..\....v..v.h..hC.j.j j.j..ú... 000080
8E006A00 6A0BFAE9 00000444 9A505200 0004309A 006A016A 016A006A 016A006A j.j.j.j.j.j..=...RP.D...Õ".j.j.. 0000A0
76FF1276 FF016A00 6A000002 189A5016 A0468D50 6A008568 020036FF 26286606 .f+&.6..hç.jP.F..P.....j.j..v..v 0000C0
006A0126 68036A10 76FF1276 FF000002 D29A206A 006A006A 006A5016 A0468D10 ..F..Pj.j.j.j .@....v..v.j.h&.j. 0000E0
FF9A006A 006A016A 006A0126 68016A10 76FF1276 FF000005 DF9A006A 006A006A j.j.j..Õ....v..v.j.h&.j.j.j.j... 000100
468B0B77 E90000FF FF9A016A 006A026A 006A206A 1076FF12 76FF088F E90000FF ...Õ...v..v.j j.j.j.j......Õw..F 000120
FE4E9689 FE4C8689 0000FFFF 9A006A10 76FF1276 FFFECE86 890C4688 9C46890A ..F..F...ö±.v..v.j........L±..N± 000140
1276FF00 69E90003 E9037501 FECEBE83 0000E903 7505FECE BE830075 E99C4688 .F.Õu../ö±.u.Õ.../ö±.u.Õ..Õi..v. 000160
FF1076FF 1276FF98 46890000 067B9A00 6A006A00 6A006A01 65689C76 FF1076FF .v..v.he.j.j.j.j..(....F..v..v.. 000180
FF000007 2C9AFE4C B6FFFE4E B6FF5052 21CA8300 0000D22B 98468B01 68689C76 v.hh..F.+@....òIRP.ÑN±.ÑL±.,.... 0001A0
0375030B 3D0008E9 000EE900 0008609A FE4CB6FF FE4EB6FF 03096810 76FF1276 v..v.h...ÑN±.ÑL±.'...Õ..Õ..=..u. 0001C0
5016FED8 868D216A 03096810 76FF1276 FF0A55E9 0A46880A CCE90000 E9FF83E9 Õ..Õ..Õä..F.ÕU..v..v.h..jl..Ä±.P 0001E0
```

Dump of file SATURN:[PCCOMMON.DUMP.DLL]SADADESK.TMP;1 on 18-APR-1990 10:51:54.61
File ID (902,31,0)   End of file block 102 / Allocated 104

Virtual block number 35 (00000023), 512 (0200) bytes

```
00003D04 C4830945 119D9A50 16FED886 8D0016E9 03750128 2DC58800 0009299A .)....é-(.u.Õ....Ä±.P...E..6.=.. 000000
006A0000 08009A20 6A006A00 6A006A0F D3681E00 6A006A01 6A006A00 66E90374 t.Õf.j.j.j.j..h&.j.j.j.j .....j. 000020
03006810 76FF1276 FF000008 9C9A5052 00000895 9A030968 1076FF12 76FF016A j..v..v.h.......RP......v..v.h.. 000040
6A016A00 6A012668 016A1076 FF1276FF 00000744 9A006A00 6A006A00 6A012668 h&.j.j.j.j..D....v..v.j.h&.j.j.j 000060
FE4E9689 FE4C8689 000008DD 9A006A10 76FF1276 FF090CE9 00000819 9A006A00 .j......ÕÉ..v..v.j..T.....L±..N± 000080
9EC40000 FFFF9A01 47B7FF26 0149B7FF 26FE4C9E C4FFFFFA 46C70000 FECA86C7 ú.ò±..úF"..6.L±&.ñl.&.ñG......6. 0000A0
FF0040E9 03740000 3D0000FF FF9A5016 FED4868D 0147B7FF 260149B7 FF26FE4C L±&.ñl.&.ñG...å±.P.....=..t.Õa.. 0000C0
001CE903 7400003D 08C48304 86008C9A FED4B6FF FED6B6FF 5016FED8 868DFA46 F"..Ä±.P.Ñø±.Ñå±......6.=..t.Õ.. 0000E0
83FF9FE9 0003E900 00FFFF9A 0147B7FF 260149B7 FF26FE4C 9EC40001 FECA86C7 ú.ò±..6.L±&.ñl.&.ñG......Õ..Õ... 000100
9A206A00 6A006A00 6A0FE668 1E1076FF 1276FF01 6A006A00 4FE90374 00FECABE /ò±.t.ÕO.j.j..v..v..hl.j.j.j.j . 000120
1276FF00 0008319A 006A006A 006A006A 01266803 0D681076 FF1276FF 00000967 g....v..v.h..h&.j.j.j.j..1....v. 000140
08681076 FF1276FF 08EFE900 00084E9A 006A006A 016A006A 01266801 6A1076FF .v.j.h&.j.j.j.j..N...Õÿ..v..v.h. 000160
9A100168 1E030968 1076FF12 76FF0000 08859A00 6A006AFA 76FF006A 01636803 .hc.j..v"j.j..ç....v..v.h...h... 000180
F2468D01 6A006AFE D4B6FFFE D6B6FF50 52014705 FE4E9688 FE4C8688 000009C6 6.....L±..N±.G.RP.Ñø±.Ñå±j.j..F· 0001A0
00000980 9A505200 0009799A 03096810 76FF1276 FF016A00 6A0000FF FF9A5016 .P.....j.j..v..v.h...y...RP..... 0001C0
6A1076FF 1276FF00 0008CD9A 006A006A 006A006A 01266803 0D681076 FF1276FF .v..v.h..h&.j.j.j.j..ë....v..v.j 0001E0
```

Dump of file SATURN:[PCCOMMON.DUMP.DLL]SADADESK.TMP;1 on 18-APR-1990 10:51:54.61
File ID (902,31,0)   End of file block 102 / Allocated 104

Virtual block number 36 (00000024), 512 (0200) bytes

```
0006149A 006A1076 FF1276FF 0853E900 0009999A 006A006A 016A006A 01266801 .h&.j.j.j.j......ÕS..v..v.j..... 000000
00FFFF9A 5016FED0 868D216A 006A0145 B7FF26FE 4C9EC4FE 4E9689FE 4C868900 ...L±..N±6.L±&.ñE.j.jl..Ä±.P.... 000020
216A0309 681076FF 1276FF08 81E999FE CC868800 08E90375 00003DFE CC868900 ...ä±=..u.Õ....ä±.Õ...v..v.h..jl 000040
B6FFFED2 B6FF0018 E90375FE D28608FE D0868800 00FFFF9A FED0B6FF FED2B6FF .Ñ0±.ÑÄ±.......Ä±..@±u.Õ...Ñ0±.Ñ 000060
006A1003 681E006A 006A016A 006A0066 E9037400 003D04C4 8303F711 909AFED0 Ä±...¼..6.=..t.Õf.j.j.j.j..h..j. 000080
9A505200 0000489A 03096810 76FF1276 FF016A00 6A000005 AF9A206A 006A006A j.j.j .£...j.j..v..v.h...H...RP. 0000A0
1276FF00 0009B19A 006A006A 006A006A 01266803 0C681076 FF1276FF 0000FFFF .....v..v.h..h&.j.j.j.j..Ý....v. 0000C0
09681076 FF1276FF 076FE900 0005119A 006A006A 016A006A 01266801 6A1076FF .v.j.h&.j.j.j.j......Õo..v..v.h. 0000E0
139A5052 0000070C 9A030968 1076FF12 76FF016A 006A0000 FFFF9A10 13681E03 ..h.......j.j..v..v.h.......RP.. 000100
86C7010B E90003E9 03740000 3D04C483 07B30086 9AFED0B6 FFFED2B6 FF000007 ....Ñ0±.ÑÄ±.Ñ.°..6.=..t.Õ..Õ..ú. 000120
0149B7FF 26FE4C9E C4000007 7A9A0147 B7FF2601 49B7FF26 FE4C9EC4 0000FECA ò±..6.L±&.ñl.&.ñG..z...6.L±&.ñl. 000140
FED0B6FF FED2B6FF 0090E903 74000030 00000793 9A5016FE D4868001 4787FF26 &.ñG...å±.P.....=..t.Õ...Ñ0±.ÑÄ± 000160
2B66068E 006A006A 006DE903 74000030 08C4830A 8A008C9A FED4B6FF FED6B6FF .Ñø±.Ñå±......6.=..t.Õm.j.j...f+ 000180
16A0468D FED0B6FF FED2B6FF 00000593 9A5016A0 468D516A 00E56802 0036FF26 &.6..hl.jQ.F..P......Ñ0±.ÑÄ±.F.. 0001A0
6A5016FE 50868010 76FF1276 FF016A00 6A0CC483 0C5900F8 9A5016FE 50868050 P..P±.P.½.Y..6.j.j..v..v...P±.Pj 0001C0
C7000007 D59A0147 B7FF2601 49B7FF26 FE4C9EC4 000006FA 9A206A00 6A006A00 .j.j.j .°...6.L±&.ñl.&.ñG..í...ú 0001E0
```

Dump of file SATURN:[PCCOMMON.DUMP.DLL]SADADESK.TMP;1 on 18-APR-1990 10:51:54.61
File ID (902,31,0)   End of file block 102 / Allocated 104

Virtual block number 37 (00000025), 512 (0200) bytes

```
006A0161 68030B68 1076FF12 76FF0037 E9037400 FECABE83 FF4FE900 01FECA86 .ò±..ÕO../ò±.t.Õ7..v..v.h..ha.j. 000000
FED2B6FF 50520147 05FE4E96 8BFE4C86 8B00000B 1E9AFED0 B6FFFED2 B6FF006A j..Ñ0±.ÑÂ±.......L±..N±.G.RP.Ñ0± 000020
0B369A00 6A006A00 6A006A01 2668030C 681076FF 1276FF00 00FFFF9A FED0B6FF .ÑÂ±......v..v.h..h&.j.j.j.j..6. 000040
6A006A05 EAE90000 06529A00 6A006A01 6A006A01 2668016A 1076FF12 76FF0000 ...v..v.j.h&.j.j.j.j..R...Õõ.j.j 000060
07549A00 6A1076FF 1276FF00 0004DA9A 50520000 04D39A00 6A036A01 6A006A01 .j.j.j.j..Æ...RP.Ö....v..v.j..T. 000080
002305FE 4E968BFE 4C868B20 6A030268 1076FF12 76FFFE4E 9689FE4C 86890000 ....L±..N±.v..v.h..j ..L±..N±.#. 0000A0
FF00000B B89AFE4C B6FFFE4E B6FF206A 03056810 76FF1276 FF00000B 9B9A5052 RP......v..v.h..j .ÑN±.ÑL±.¡.... 0000C0
FE4C9EC4 00000BFC 9A505201 2405FE4E 968BFE4C 868B206A 03076810 76FF1276 v..v.h..j ..L±..N±.$.RP.•...ó.L± 0000E0
0008E903 7500003D FECC8689 000008FD 9A5016FE D0868021 6A006A01 45B7FF26 &.ñE.j.j!..Â±.P.».....ä±=..u.Õ.. 000100
000006C1 9AFED0B6 FFFED2B6 FF216A03 09681076 FF1276FF 05AEE999 FECC868B ..ä±.ÕÜ..v..v.h..j!.Ñ0±.ÑÂ±.ê... 000120
03E90374 00003D0A C4830C34 12BA9A10 76FF1276 FFFE4CB6 FFFE4EB6 FF030568 h...ÑN±.ÑL±.v..v..¤.4..ó.=..t.Õ. 000140
1DE90374 00003D04 C4830C77 119D9A50 52012405 FE4E968B FE4C868B 0503E900 .Õ....L±..N±.$.RP...w..ó.=..t.Õ. 000160
076808C4 830CCA00 569A5052 012405FE 4E968BFE 4C868BFE 4CB6FFFE 4EB6FF00 ..ÑN±.ÑL±..L±..N±.$.RP.V.ò..ó.h. 000180
7400003D 0AC4830C B212BA9A 1076FF12 76FF5052 012405FE 4E968BFE 4C868B03 ...L±..N±.$.RP.v..v..¤.ý..ó.=..t 0001A0
0D3A9A50 52012405 FE4E968B FE4C868B 03076810 76FF1276 FF04A0E9 0003E903 .Õ..Õ..:v..v.h....L±..N±.$.RP.:. 0001C0
FF0064E9 03740000 3D04C483 06D8119D 9A505200 2305FE4E 968BFE4C 86880000 ....L±..N±.#.RP...Â..ó.=..t.Õd.. 0001E0
```

Dump of file SATURN:[PCCOMMON.DUMP.DLL]SADADESK.TMP;1 on 18-APR-1990 10:51:54.61
File ID (902,31,0)   End of file block 102 / Allocated 104

Virtual block number 38 (00000026), 512 (0200) bytes

```
FFFE4EB6 FF0020E9 0372099A 7E839A46 8904C483 0CF300B6 9AFE4CB6 FFFE4EB6 ÑN±.ÑL±.Ñ.µ..ó..F..~..r.Õ ..ÑN±. 000000
4EB6FF09 6A0028E9 08C48300 1500569A 50520023 05FE4E96 8BFE4C86 8BFE4C86 ÑL±..L±..N±.#.RP.V....ó.Õ(.j..ÑN 000020
C626FE4C 9EC40AC4 8309EE00 CE9A5052 002305FE 4E968BFE 4C868BFE 4CB6FFFE ±.ÑL±..L±..N±.#.RP.ö.Ÿ..ó.ó.L±&ó 000040
9EC40000 06919A50 52002305 FE4E968B FE4C868B 03026810 76FF1276 FF002B47 G+..v..v.h....L±..N±.#.RP.....ó. 000060
D8868D09 6A014BB7 FF26FE4C 9EC40000 03E89A50 16FEFA86 8D014BB7 FF26FE4C L±&.ñK...ª±.P.Õ...ó.L±&.ñK.j...Ä 000080
AA9A5016 94468D50 16FED886 8D014BB7 FF26FE4C 9EC4096A 00970000 9A5016FE ±.P.....j.ó.L±&.ñK...Ä±.P.F..P.ˆ 0000A0
8D9476FF 9676FF03 FDE999FE CC868B00 08E90375 00FECCBE 83FECC86 89000000 .....ä±./ä±.u.Õ....ä±.Õ»..v..v.. 0000C0
FF03D7E9 99FECC86 8B0008E9 037500FE CCBE83FE CC868900 0000CF9A 5016FC46 F•.P.ü.....ä±./ä±.u.Õ....ä±.Õ■.. 0000E0
FECCBE83 FECC8689 00000102 9A5016FE FE868D01 6AFC76FF FE76FF94 76FF9676 v..v..v±.v•j....±±.P.......ä±./ä± 000100
CCBE81FE CC868900 0001229A 9476FF96 76FF03A8 E999FECC 86880008 E9037500 .u.Õ....ä±.Õ´..v..v..ª.....ä±./ä 000120
9A006A00 6A5016F6 468D5016 FEFE868D 0386E999 FECC868B 0008E903 748491FE ±..t.Õ....ä±.Õ....±±.P.F-.Pj.j.. 000140
685016FE FE868D00 64E90374 10F646F6 0009E903 74009A7E 839A4689 0000014C L....F..-..t.Õ..-F-.t.Õd...±±.Ph 000160
15681E00 40E900FE FE86C600 08E90375 00FECCBE 83FECC86 89000001 669A0101 ...f.....ä±./ä±.u.Õ..6.±±.Õə..h. 000180
209A006A 006A5016 F6468D50 16FEFE86 8D08C483 0EEA0010 9A5016FE FE868D10 ...±±.P...õ..ó...±±.P.F-.Pj.j.. 0001A0
FE8E8000 FEFE86C6 0005E903 7410F646 F60009E9 0374009A 7E839A46 8900000E ....F..-..t.Õ..-F-.t.Õ..6.±±../± 0001C0
C6FEFE86 884004F8 468A0000 FFFF9A50 1690468D 5016F846 8D003AE9 037400FE ±.t.Õ:..F½.P.F..P......F½.ə..±±6 0001E0
```

Dump of file SATURN:[PCCOMMON.DUMP.DLL]SADADESK.TMP;1 on 18-APR-1990 10:51:54.61
File ID (902,31,0)   End of file block 102 / Allocated 104

Virtual block number 39 (00000027), 512 (0200) bytes

```
00FFFF9A 50169E46 8D5016FF 01868DF8 76FF0091 9E46C75C FF0086C6 3AFEFF86 ..±:6...\úF....v½.....P.F..P.... 000000
8D101D68 1E0012E9 03755CFE FDBA80F0 8804C483 0F0800B6 9A5016FE FE868D00 ...±±.P.Ñ....ó..Þ.¤»±\u.Õ...h... 000020
8D506A00 AC680200 36FF262B 66068E00 6A006A08 C4830F3F 00109A50 16FEFE86 .±±.P...7..ó.j.j...f+&.6..h˜.jP. 000040
5200109A 5016FEFE 86805052 002305FE 4E968BFE 4C868B00 00101E9A 5016A046 F..P.......L±..N±.#.RP..±±.P...R 000060
5016FEFE 86800302 6808C483 0F8F0010 9A5016FE FE868D50 16A0468D 08C4830F ..ó..F..P..±±.P......ó.h....±±.P 000080
8B5016FE FE868D01 AEE90003 E9037400 003D0AC4 830C1412 BA9A1076 FF1276FF .v..v..¤....ó.=..t.Õ..ÕÜ...±±.P. 0000A0
F900B69A FED0B6FF FED2B6FF 08C4830F 9F00569A 50520023 05FE4E96 8BFE4C86 .L±..N±.#.RP.V....ó..Ñ0±.ÑÂ±.Ñ.ª 0000C0
0147B7FF 260149B7 FF26FE4C 9EC40000 FECA86C7 011CE903 7500003D 04C4830F ..ó.=..u.Õ..ú.ò±..ó.L±&.ñI.&.ñG. 0000E0
003D0000 0A2C9A50 16FED486 8D0147B7 FF260149 B7FF26FE 4C9EC400 000A139A .....ó.L±&.ñI.&.ñG...å±.P.,...=. 000100
003D08C4 83103800 8C9AFED4 B6FFFED6 B6FFFED0 B6FFFED2 B6FF00BB E9037400 .t.ÕE..Ñ0±.ÑÂ±.Ñ0±.Ñå±...8..ó.=. 000120
0A709A50 16A0468D 516A00E5 68020036 FF262B66 068E006A 006A0098 E9037400 .t.Õ..j.j...f+&.6..hÍ.jQ.F..P.p. 000140
6A006A0C C4830A4B 00F89A50 16FE5086 8D5016A0 468DFED0 B6FFFED2 B6FF0000 ...Ñ0±.ÑÂ±.F..P..P±.P.½.K..ó.j.j 000160
1076FF12 76FF0000 0AA89A20 6A006A00 6A006A50 16FE5086 8D1076FF 1276FF01 ..v..v...P±.Pj.j.j.j .´....v..v. 000180
50520000 09D89A03 09681076 FF1276FF 016A006A 00000C9E 9A101F68 1E030968 h...h.......j.j..v..v.h...Ä...RP 0001A0
24E90001 FECA86C7 00000ABB 9A0147B7 FF260149 B7FF26FE 4C9EC400 0009DF9A .Õ...ó.L±&.ñI.&.ñG..£...ú.ò±..Õ$ 0001C0
FFFED2B6 FF505201 4705FE4E 968BFE4C 86880079 E90003E9 037500FE CABE83FF ../ò±.u.Õ..Õy...L±..N±.G.RP.Ñ0±. 0001E0
```

Dump of file SATURN:[PCCOMMON.DUMP.DLL]SADADESK.TMP;1 on 18-APR-1990 10:51:54.61
File ID (902,31,0)   End of file block 102 / Allocated 104

Virtual block number 40 (00000028), 512 (0200) bytes

```
000010F7 9A1076FF 1276FF00 0010EC9A 016A1076 FF1276FF 00000805 9AFED086 ÑÀ±......v..v.j..š....v..v..¼... 000000
26E90029 E90000FF FF9A1076 FF1276FF 0000FFFF 9A026A10 76FF1276 FF0044E9 ÕO..v..v.j.......v..v......Õ).Õ& 000020
75030030 F78BE903 75030C30 FFCFE903 75000230 FA31E903 75000130 0023E900 .Õ#.=..u.Õ1'=..u.Õü.=..u.Õ¡¼=..u 000040
9A0676FF 0876FF0A 76FF0C76 FF0E76FF 1076FF12 76FF004B E9FFD7E9 F58BE903 .Õ.‰Õ=.ÕK..v..v..v..v..v..v..v.. 000060
E9037500 2930F421 E9037500 2230F557 E9037500 2030002B E9004FE9 0000FFFF ....ÕO.Õ+.= .u.ÕW%=".u.Õl¶=).u.Õ 000080
6A016A01 6A006A01 6A006AFF B5E9F354 E9037500 3B30F494 E9037500 3030F484 .¶=0.u.Õ.¶=;.u.ÕT¤Õç.j.j.j.j.j.j 0000A0
0004C800 0ECAC95F 5E1F0000 E90000BA 0000B800 0008519A 50520000 0B4A9A00 ..J...RP.Q...|..¤..Õ...^_èò..à.. 0000C0
0006E903 74003F80 26065EC4 000CE903 7508460B 06468B08 8E04B6B8 1E565700 .WV.¡Ñ..Ä.F..F.u.Õ..á^.Ã.7.t.Õ.. 0000E0
FF0003E9 0000FC46 C7FE4689 04C4830E 6A00B69A 0676FF08 76FF0045 E90000B8 ¡..ÕE..v..v..Ñ.j..á..F±úF•..Õ... 000100
E90001B8 0006E903 75203880 260676C4 FC5E8B00 18E90372 FC4639FE 468BFC46 F=.F±9F=r.Õ...^=áv.&.8 u.Õ..|..Õ 000120
0B06468B D88E11A5 B81E5657 000006C8 CBC95F5E 1F0000E9 00008BFF DAE90009 ..ÕÕ.|..Õ...^_èùà...WV.|É..Ä.F.. 000140
46C7FE46 8904C483 11CF00B6 9A0676FF 0876FF00 88E90000 B80006E9 03740846 F.t.Õ..|..Õ...v..v..Ñ.ü..á..F±úF 000160
FA468800 8A260676 C4FC5E8B 005BE903 72FC4639 FE4688FC 46FF0003 E90000FC •..Õ...F=.F±9F=r.Õ[..^=áv.&...F' 000180
E903752D FA7E8000 33E90375 20FA7E80 003CE903 740711CF 87F6088B 98FA468A .F'..Ä~.ü..t.Õ<..~' u.Õ3..-'-u.Õ 0001A0
FA7E8000 0FE90375 24FA7E80 0018E903 7526FA7E 800021E9 03755FFA 7E80002A *..~'_u.Õ!..~'&u.Õ...~'$u.Õ...~' 0001C0
56570000 04C8CBC9 5F5E1F00 00E90000 B8FF97E9 0009E900 01B80006 E9037523 #u.Õ..|..Õ..Õ..|..Õ...^_èùà...WV 0001E0
```

Dump of file SATURN:[PCCOMMON.DUMP.DLL]SADADESK.TMP;1 on 18-APR-1990 10:51:54.61
File ID (902,31,0)   End of file block 102 / Allocated 104

Virtual block number 41 (00000029), 512 (0200) bytes

```
00000E7F 9A006A00 6A5016FE 468D0A76 FF0C76FF 026DE90E 468BD88E 1218881E .|...Ä.F.Õm..v..v..F±.Pj.j...... 000000
9A206A00 6A006A00 6A102168 1E0676FF 0876FF01 6A006A00 A0E9FC46 88FC4689 .F=.F=Õ..j.j..v..v..hl.j.j.j.j . 000020
0000B800 0010819A 50520000 107A9A0E 76FF0676 FF0876FF 016A006A 00001056 V...j.j..v..v..v..z...RP.....|.. 000040
0009E900 03E90375 D00806C4 83123601 789A0A76 FF0C76FF 206A0075 E90241E9 ÕA.Õu.j .v..v..x.6..á..Äu.Õ..Õ.. 000060
9A206A00 6A006A00 6A102F68 1E0676FF 0876FF01 6A006A00 52E9021E E90001B8 |..Õ..ÕR.j.j..v..v..h/.j.j.j.j . 000080
0000B800 0013FA9A 50520000 13F39A0E 76FF0676 FF0876FF 016A006A 000013E1 Ä...j.j..v..v..v..µ...RP.'...|.. 0000A0
76FF01C6 E9FFAEE9 FF8EE903 75000230 FF59E903 75C00B00 12E90015 E901E1E9 ÕÄ.Õ..Õ...âu.ÕY.=..u.Õ..ÕÛ.Õ6..v 0000C0
83141611 9D9A0A76 FF0C76FF 0016E903 74000030 04C48313 BD12109A 0A76FF0C ..v....§..á.=..t.Õ...v..v....... 0000E0
206A006A 006A006A 1041681E 0676FF08 76FF016A 006A003A E9037400 003D04C4 á.=..t.Õ:.j.j..v..v..hA.j.j.j.j 000100
00B80000 14539A50 52000014 4C9A0E76 FF0676FF 0876FF01 6A006A00 00143A9A .:...j.j..v..v..v..L...RP.S...|. 000120
03750000 3D04C483 0F691210 9A0A76FF 0C76FF01 57E9015A E90001B8 0160E900 .Õ'.|..ÕZ.ÕW..v..v....i..á.=..u. 000140
006A0000 13009A20 6A006A00 6A006A10 59681E06 76FF0876 FF016A00 6A003AE9 Õ:.j.j..v..v..hY.j.j.j.j .....j. 000160
0001B801 07E90000 B8000013 199A5052 00001312 9A0E76FF 0676FF08 76FF016A j..v..v..v......RP.....|..Õ..|.. 000180
FF0C76FF 0016E903 7400003D 04C48314 8512109A 0A76FF0C 76FF00FE E90101E9 Õ..Õ±..v..v.......á.=..t.Õ...v.. 0001A0
1074681E 0676FF08 76FF016A 006A0030 E9037400 003D04C4 8313A711 9D9A0A76 v....Ï..á.=..t.Õ=.j.j..v..v..ht. 0001C0
52000015 109A0E76 FF0676FF 0876FF01 6A006A00 0014FE9A 206A006A 006A006A j.j.j.j .±...j.j..v..v..v......R 0001E0
```

Dump of file SATURN:[PCCOMMON.DUMP.DLL]SADADESK.TMP;1 on 18-APR-1990 10:51:54.61
File ID (902,31,0)   End of file block 102 / Allocated 104

Virtual block number 42 (0000002A), 512 (0200) bytes

```
3D06C483 04620000 9A0A76FF 0C76FF01 6A0095E9 0098E900 00B80000 15179A50 P.....|..Õ..Õ..j..v..v....b..á.= 000000
13609A20 6A006A00 6A006A10 87681E06 76FF0876 FF016A00 6A0030E9 03740001 ..t.Õ=.j.j..v..v..h..j.j.j.j .'. 000020
43E90000 B8000013 799A5052 00001372 9A0E76FF 0676FF08 76FF016A 006A0000 ..j.j..v..v..v..r...RP.y...|..ÕC 000040
8BE90375 026C3000 2BE9002E E90031E9 00008800 37E9003A E90001B8 0040E900 .Õa.|..Õ:.Õ7.|..Õ1.Õ..Õ+.=l.u.Õ. 000060
ACE90375 03093DFE 45E90375 03073DFF 15E90375 03053DFD 83E90375 03023DFD »=..u.Õ.»=..u.Õ..=..u.ÕE±=..u.Õ¯ 000080
00FEC786 C60003FE C586C7D8 8E12C2B8 1E565700 0160C8CB C95F5E1F FFC9E9FE ±Õè..^_èùà'..WV.|ô..Äú.é±..ó.ú±. 0000A0
FFF676FF 016A006A 00000D4E 9A5016F4 46800676 FFEF4689 06468B00 FEA486C6 ó.Ê±..F..Fÿ.v..F¶.P.N...`.j..v~. 0000C0
89000004 0F9A5016 FEA4868D 02586802 0036FF26 2B66068E FFFF6814 6F68F476 v¶ho.h....f+&.6..hX...Ê±.`...... 0000E0
8BFE5689 FC468900 00FFFF9A 006A006A 0015E903 74FA460B F84688FA 5689F846 F¼.V'.F¼.F't.Õ..j.j........`.V±. 000100
9A006A03 6A016A00 6A016A00 6AF24689 00000420 9AF876FF FA76FF00 AEE9FC46 F=ÕÕ..v'.v¼. ....F·j.j.j.j.j.j.. 000120
83133101 EC9A5016 FEA4868D 0061E903 7401F27E 83000016 899A5052 00001682 ....RP......~·.t.Õa...Ê±.P.Ã.1.. 000140
C48314DA 01329A06 76FF5016 FEC7868D 5016FEA4 868D036A 5016FEA0 868D04C4 á....±.Pj...Ê±.P..ú±.P.v..2.Õ..á 000160
9AFEA0B6 FFFEA2B6 FF501608 468D0041 E9F2468B 0006E903 7500003D F2468910 ..F·=..u.Õ...F·ÕA..F..P.ÑÀ±.Ñ.±. 000180
6A016A01 6A006A01 6A006A00 1EE9F246 8B0006E9 03750000 3DF24689 000010C4 á....F·=..u.Õ...F·Õ..j.j.j.j.j.j 0001A0
B81E5657 000246C8 CBC95F5E 1F0000E9 F2468B00 0011899A 50520000 11829A00 ......RP......F·Õ...^_èùàF..WV.| 0001C0
006A1076 FF1276FF FDBC9689 FDBA8689 08568B06 46880519 E90E468B D88E1571 q..Ä.F.Õ...F..V...¤»..¥».v..v.j. 0001E0
```

```
Dump of file SATURN:[PCCOMMON.DUMP.DLL]SADADESK.TMP;1 on 18-APR-1990 10:51:54.61
File ID (902,31,0)   End of file block 102 / Allocated 104

Virtual block number 43 (0000002B), 512 (0200) bytes

 50520000 172F9A00 6A036A01 6A006A01 6A006A00 0004F89A FDBAB6FF FDBCB6FF .Ñ¥».Ñ¤».½...j.j.j.j.j.j../...RP 000000
 206A006A 01436802 6C681076 FF1276FF 000004E5 9A1076FF 1276FF00 0017369A .6....v..v..l....v..v.hl.hC.j.j  000020
 0AEB9A00 6A006A08 6A006A01 43680271 681076FF 1276FF00 00171E9A 006A006A j.j.......v..v.hq.hC.j.j.j.j..S. 000040
 6A006A04 A9E90000 16079A50 52000016 009A006A 016A016A 006A016A 006A0000 ..j.j.j.j.j.......RP.....Õ`.j.j  000060
 1276FF01 6A006A00 000F259A 5016A646 8D506A00 B5680200 36FF262B 66068E00 ...f+&.6..hç.jP.Fl.P.%...j.j..v. 000080
 206A1076 FF1276FF 046EE900 0014A99A 206A006A 006A006A 5016A646 8D1076FF .v..Fl.Pj.j.j.j .`...Õn..v..v.j  0000A0
 5E9A006A 1076FF12 76FF03F7 E90A4688 0456E900 0005F79A 016A006A 026A006A j.j.j.j..¼...ÕV..F.Õ¼..v..v.j..^ 0000C0
 0018869A 5016FDBE 868D216A 026C6810 76FF1276 FFFDBC96 89FDBA86 8900000B ......¤»..¥».v..v.hl.jl..ƒ».P.... 0000E0
 76FF1276 FF016A00 6A0037E9 03740000 3D04C483 186E00B6 9A5016FD BE868D00 ...ƒ».P.Ñ.n..á.=..t.Õ7.j.j..v..v 000100
 9A026C68 1076FF12 76FF016A 006A0000 18309A20 6A006A10 9C681E10 AB681E10 ..h¨..h..j.j .=....j.j..v..v.hl.. 000120
 013D06C4 83163C00 009A5016 FDBE868D 036A0392 E9000018 569A5052 0000184F O...RP.V...Õ..j...ƒ».P...<..á.=. 000140
 0017719A 206A006A 10CB681E 10DA681E 1076FF12 76FF016A 006A0037 E9037400 .t.Õ7.j.j..v..v..hÕ..hù.j.j .q.. 000160
 BE868D03 43E90000 14C29A50 52000014 BB9A026C 681076FF 1276FF01 6A006A00 .j.j..v..v.hl..É....RP.Õ...ÕC.../ 000180
 8D009168 02716810 76FF1276 FF08C483 18930056 9AFDBAB6 FFFDBCB6 FF5016FD ».P.Ñ¥».Ñ¤».V....á..v..v.hq.h... 0001A0
 003DE903 7400003D 04C48318 AE00B69A 5016FF12 868D0000 0B839A50 16FF1286 ....P..........P.Ñ.Õ..á.=..t.Õ=. 0001C0
 16FF1286 8D5016FD BE868D09 6A08C483 18C40272 9A5016FF 12868D00 6A009168 h..j......P.r.á..á.j...ƒ».P..... 0001E0

Dump of file SATURN:[PCCOMMON.DUMP.DLL]SADADESK.TMP;1 on 18-APR-1990 10:51:54.61
File ID (902,31,0)   End of file block 102 / Allocated 104

Virtual block number 44 (0000002C), 512 (0200) bytes

 12868D00 0010689A 5016FF12 868D0271 681076FF 1276FF0A C48318F3 02149A50 P...µ..á..v..v.hq......P.h ..... 000000
 2B66068E 006A006A 08C48319 2900569A 50520023 05FDBC96 88FDBA86 885016FF ..P..¤»..¥».#.RP.V.)..á.j.  ...f+ 000020
 BC968BFD BA868B50 16A6468D 00001755 9A5016A6 468D506A 00AD6802 0036FF26 &.6..hÙ.jP.Fl.P.U....Fl.P.¤...¥ 000040
 15949A50 16FE0486 8D014BB7 FF26FDBA 9EC408C4 831A4B00 109A5052 002305FD ».#.RP...K..á.á.¤»&.ñK.....±.P... 000060
 FF26FDBA 9EC4096A 0D660000 9A5016FD E2868D09 6A014BB7 FF26FDBA 9EC40000 ..á.¤»&.ñK.j...ã».P...f.j.á.¤»&. 000080
 E9037500 FDE08E83 FDE08689 0000007F 9A5016FF 0E868D50 16FDE286 8D014BB7 ñK...ã».P.....P.......Á».ƒÁ».u.Õ 0000A0
 FDE08689 000000A5 9A5016FC 468DFF0E B6FFFF10 B6FF0265 E999FDE0 86880008 ....Á».Õe..Ñ...Ñ...F•.P.É.....Á» 0000C0
 FFFF0EB6 FFFF10B6 FF00FE08 86C6023D E999FDE0 86880008 E9037500 FDE0BE83 .ƒÁ».u.Õ.....Á».Õ=.ó..±..Ñ...Ñ... 0000E0
 0008E903 7500FDE0 BE83FDE0 86890000 00D49A50 16FE0886 8D016AFC 76FFFE76 v±.v•j....±.P.å.....Á».ƒÁ».u.Õ.. 000100
 748491FD E08E81FD E0868900 000DF59A FF0EB6FF FF10B6FF 0207E999 FDE08688 ..Á».Õ...Ñ...Ñ...¾.....Á».ƒÁ»..t 000120
 00001A60 9A006A00 6A5016F8 468D5016 FE08868D 01E3E999 FDE0868B 0008E903 .Õ....Á».ÕÐ.....±.P.F½.Pj.j..'... 000140
 681EFDE0 86890000 0E439A01 01685016 FE08868D 0092E903 7410F846 F6A44689 .FÉ-F½.t.Õ.....±.Ph...C.....Á».h 000160
 9A006A00 6A5016F8 468D5016 FE08868D 08C4831A C700109A 5016FE08 868D10F1 Þ....±.P...ú..á.....±.P.F½.Pj.j.. 000180
 037410F8 46F60009 E9037400 A47E8300 12E90374 00FDE0BE 83A44689 000012DC É....FÉ.ƒÁ».t.Õ...-É.t.Õ..-F½.t. 0001A0
 FE0986C6 FE088688 4004FA46 8A00000E B29A5016 FF0A868D 5016FA46 8D0038E9 Õ;..F•.P.....P.ý....F•.ª...±ó..± 0001C0
 868D0000 0EDD9A50 16A4468D 5016FE08 868DFA76 FF0101A4 46C75CFE 0A86C63A :ó..±\úFÉ...v•...±.P.FÉ.P.Ï..... 0001E0

Dump of file SATURN:[PCCOMMON.DUMP.DLL]SADADESK.TMP;1 on 18-APR-1990 10:51:54.61
File ID (902,31,0)   End of file block 102 / Allocated 104

Virtual block number 45 (0000002D), 512 (0200) bytes

 FE08868D 10F9681E 0012E903 755CFE07 BA80F08B 04C4831A E500B69A 5016FE08 .±.P.Ñ.l..á..Þ.¤.±\u.Õ...h•....± 000000
 00109A50 16FE0886 8D505200 2305FDBC 968BFDBA 868B08C4 83180000 109A5016 .P.......á...¤»..¥».#.RP...±.P... 000020
 74000030 0AC48315 A3128A9A 1076FF12 76FF5016 FE08868D 026C6808 C483161D ...á.hl....±.P.v..v..¤.É..á.=..t 000040
 8317CA00 569A5052 002305FD 8C968BFD BA868B50 16FE0886 8D0079E9 0003E903 .Õ..Õy....±.P..¤»..¥».#.RP.V.Õ.. 000060
 0000BA00 00B80000 187A9A10 76FF1276 FF00001B 6F9A016A 1076FF12 76FF08C4 á..v..v.j...o....v..v..z...|...¤.. 000080
 00B80000 100C9A10 76FF1276 FF000010 D19A006A 1076FF12 76FF003A E9008CE9 Õ..Õ:..v..v.j...l....v..v..É...j. 0000A0
 FFE7E9FF C9E90375 00023DFC 01E90375 00013000 13E90016 E90068E9 0000BA00 .¤..Õh.Õ..Õ...=...u.Õ.»•...u.Õè.ÕÕ. 0000C0
 002FE900 0011409A 0676FF08 76FF0A76 FF0C76FF 0E76FF10 76FF1276 FF0043E9 ÕC..v..v..v..v..v..v..v..ª...Õ/. 0000E0
 03750038 3DFB9DE9 03750029 3DFB6AE9 03750022 3DFBC5E9 03750020 3D0023E9 Õ#.= .u.Õé«=".u.Õj«=).u.Õ.«=;.u. 000100
 16A0881E 56570000 4EC8000E CAC95F5E 1F0000E9 0000BA00 0088FFBD E9FAC7E9 Õú•Õ§.|..¤..Õ...^_èÒ..àN..WV.|.. 000120
 46C608C4 831C9300 569A5016 B8468D50 52009105 02578B26 07882608 5EC4D88E .Áó^.&..&.W....RP¯F|.P.V....á.6F 000140
 1768B476 FF8676FF 016A006A 0000193E 9A501684 468D0676 FF0000FA 46C70009 ].úF•...v..FÇ.P.>...j.j..vÑ.vÇh. 000160
 FE5689FC 46890000 15B89A50 16884680 04006802 0036FF26 2B66068E FFFF6818 .h....f+&.6..h...F|.P.É.....F•.V± 000180
 16884680 0035E982 468B0006 E9037500 003D8246 89000015 EC9AFC76 FFFE76FF .v±.v•.š....Fý=..u.Õ...FýÕ5..F|. 0001A0
 0E76FF50 1609468D 08C4831C A600569A 50520091 0502578B 26078826 085EC450 Pó^.&..&.W....RP.V.l..á..Fl.P.v. 0001C0
 1BFEB81E 56570000 56C8C8C9 5F5E1F00 00E98246 8808C483 1B3D0056 9A0C76FF .v..V.=..á..FýÕ...^_èÙàV..WV.|±. 0001E0
```

```
Dump of file SATURN:[PCCOMMON.DUMP.DLL]SADADESK.TMP;1 on 18-APR-1990 10:51:54.61
File ID (902,31,0)   End of file block 102 / Allocated 104

Virtual block number 46 (0000002E), 512 (0200) bytes

 00001D68 9A505200 001D649A 006A036A 016A006A 016A006A 022CE90E 468BD88E .Ă.F.Õ,.j.j.j.j.j.j..d...RP.k... 000000
 76FF0000 16C99A06 76FF0876 FF006A10 76FF1276 FF000016 EC9A1076 FF1276FF .v..v..š....v..v.j..v..v..è....v 000020
 04046810 76FF1276 FF00001D 2C9A006A 006A206A 006A0143 68040268 1076FF12 ..v.h..hC.j.j j.j..,....v..v.h.. 000040
 AA468900 001DEF9A 006A1076 FF1276FF 00001705 9A006A00 6A206A00 6A014368 hC.j.j j.j.......v..v.j..ÿ....F¯ 000060
 6A016A00 6A016A00 6A000018 D99AAA76 FFAC76FF 04026810 76FF1276 FFAC5689 .V¯.v..v.h...v¯.v¯.l...j.j.j.j.j 000080
 68020036 FF262B66 068E006A 006A01AD E900001D E29A5052 00001DDB 9A006A01 .j..Ù...RP.â...ÕÙ.j.j...f+&.6..h 0000A0
 6A006A50 16AE468D 1076FF12 76FF016A 006A0000 1E479A50 16AE468D 506A00B5 ç.jP.FÛ.P.G...j.j..v..v..FÛ.Pj.j 0000C0
 17899A01 6A006A02 6A006A20 6A1076FF 1276FF01 72E90000 1E639A20 6A006A00 .j.j .c...Õr..v..v.j j.j.j.j.... 0000E0
 52000016 DA9A006A 036A016A 006A016A 006A00F0 E90A468B 0157E901 5AE90000 ..ÕZ.ÕW..F.Õ▸.j.j.j.j.j.j..Õ...R 000100
 681076FF 1276FFAC 5689AA46 89000017 9F9A006A 1076FF12 76FF0000 16E19A50 P.Ă....v..v.j.......F¯.V¯.v..v.h 000120
 9A505200 2105AC56 88AA468B 000017BD 9A505200 2105AC56 88AA468B 206A0404 ..j .F¯.V¯.I.RP.§....F¯.\¯.I.RP. 000140
 6A00E368 020036FF 26286606 8E006A00 6A003BE9 03740000 3D04C483 1C190086 Ñ....6.=..t.Õ;.j.j...f+&.. .hD.j 000160
 006A006A 006A5016 AE468D10 76FF1276 FF016A00 6A000019 109A5016 AE468D50 P.FÛ.P.....j.j..v..v..FÛ.Pj.j.j. 000180
 1CDC9A50 5200001C D59A006A 016A016A 006A016A 006A0067 E9000017 EE9A206A j .Ÿ...Õg.j.j.j.j.j.j..[...RP.Ê. 0001A0
 1276FF00 34E90000 1EB19A10 76FF1276 FF00001E A69A016A 1076FF12 76FF0000 ...v..v.j..Ì....v..v..Ÿ...Õ4..v. 0001C0
 01300013 E90016E9 0019E900 001B569A 1076FF12 76FF0000 1B4B9A02 6A1076FF .v.j..K....v..v..V...Õ..Õ..Õ..=. 0001E0

Dump of file SATURN:[PCCOMMON.DUMP.DLL]SADADESK.TMP;1 on 18-APR-1990 10:51:54.61
File ID (902,31,0)   End of file block 102 / Allocated 104

Virtual block number 47 (0000002F), 512 (0200) bytes

 0C76FF0E 76FF1076 FF1276FF 004BE9FF E7E9FFCF E9037500 023DFF08 E9037500 .u.Õ..=..u.ÕÜ.ÕÕ.ÕK..v..v..v..v. 000000
 7500223D FECCE903 7500203D 002BE900 37E90000 1B899A06 76FF0876 FF0A76FF .v..v..v..¿...Õ7.Õ+.= .u.Õë±=".u 000020
 B8FFB5E9 FDACE903 75003B3D FEB1E903 7500303D FEA1E903 7500293D FE6EE903 .Õn±=).u.ÕÃ±=0.u.ÕŸ±=;.u.Õ¯»Õç.| 000040
 468D0676 FFD88E1C 8E881E56 57000004 C8000ECA C95F5E1F 0000E900 00BA0000 ..¤..Õ...^_èÒ..à...WV.|/..Ă.v..F 000060
 010302C7 00081660 0203002D 90CBC95F 5E1F0000 E90000B8 00001C30 9A5016FC ■.P.0...¡.¯Õ...^_èÙ.-...'...ú... 000080
 01030000 00041C3F 00020005 00011ABA 0203000C 00060302 020300F3 00031505 {...µ...■...É...¤.......?....... 0000A0
 0103007E 00031E88 0103007C 00031C67 01030000 00051819 0002007A 00031C56 V...z...........g...|.......-... 0000C0
 01030259 00080FC1 02031698 000415A6 00050000 00061956 0002007F 00031D13 ........V.......Ì.......ė...Y... 0000E0
 010302E0 00080800 02030007 00031E96 01030087 00031E10 01030086 00031D53 S.......................Å...Å... 000100
 02030171 00071970 020301EE 000719CE 02030088 00031DA6 0103000B 0003005B [.......Ì.......ö...Ÿ...p...q... 000120
 01030090 00031D8A 010304AE 000403FA 00050013 00031800 0103026A 00081094 ....j...........■...Ù........... 000140
 02030000 000E1E22 0002001F 00031D39 01031CB6 00041C42 0005001E 00031CFA ■.......B...Ñ...9.......".......  000160
 020300B3 00031EEA 01030000 00101F37 0002027E 00080FDA 020302F1 00091CE7 Ô...þ...Ö...~...7.......õ...°... 000180
 0103004B 00021A1C 01030048 00021A8F 01030310 000901E8 020300A5 00061F44 D...É...Ò...........H.......K... 0001A0
 020302AA 00080883 0203004D 00031807 010301A8 000719F1 02030045 00031DBE /...E...þ...'.......M.......¯... 0001C0
 0000032E 00091A36 0203005C 00031E7E 0103005B 00031E77 010301B5 00071998 ....ç...w...[...~...\...6....... 0001E0

Dump of file SATURN:[PCCOMMON.DUMP.DLL]SADADESK.TMP;1 on 18-APR-1990 10:51:54.61
File ID (902,31,0)   End of file block 102 / Allocated 104

Virtual block number 48 (00000030), 512 (0200) bytes

 00000060 9A50160E 468D016A 0A76FF00 000A46C7 D88EFFFF B81E5657 000026C8 à&..WV.|...ĂúFÕ...v.j..FB.P.'... 000000
 50160E46 8D0676FF 0876FF00 20E90374 000A7E83 0057E903 74000C7E 830C4689 .FÉ.-É.t.ÕW..-Õ.t.Õ ..v..v..FB.P 000020
 9A50160E 468D006A 0A76FF00 01DA46C7 0005E903 7400003D 08C483FF FF01A69A .Ì....6.=..t.Õ..úFÕ...v.j..FB.P. 000040
 0009E90C 46880006 E9037584 90DC7E81 0010E903 75000C7E 830C4689 0000FFFF .....FÉ.-É.u.Õ...-É..u.Õ...FÉÕ.. 000060
 FC468006 76FFD88E 0008B81E 56570000 0AC8CBC9 5F5E1F00 00E9DA46 88FFA0E9 Õ...FÖÕ...^_èùà...WV.|...Ă.v..F■ 000080
 FFFF9A50 16F6468D 008A6823 6AFA76FF FA468907 8826FC5E C40000FF FF9A5016 .P.....6^■&¯...F*.v*j#hα..F-.P... 0000A0
 76FF0A76 FF08C483 00EA0056 9A505200 9105F856 88F6468B 0C76FF0E 76FF0000 ...v..v..F-.V½...RP.V.Õ..6..v..v 0000C0
 87C726F6 5EC400B2 87892610 468BF65E C408C483 00430056 9AF676FF F876FF08 ..v½.v-.V.C..6.6^-.F.&..ý.6^-&ú. 0000E0
 F8568BF6 468B165E C400B897 892600B6 87892614 56881246 8BF65EC4 000000B4 Ç...6^-.F..V.&..Ñ.&..|.6^..F-.V½ 000100
 76FFD88E 0096881E 56570000 0AC8CBC9 5F5E1F00 00E90000 B8025789 26078926 &..&.W.|..Õ...^_èùà...WV.|...Ă.v 000120
 000030F6 46890000 FFFF9A50 16F84680 0C76FF0E 76FF0876 FF0A76FF 0676FF10 ..v..v..v..v..v¯.F½.P......F-=.. 000140
 0C76FF0E 76FF1076 FFF876FF FA76FF12 76FF1476 FF002CE9 F6468800 06E90375 u.Õ...F-Õ,..v..v..v*.v½.v..v..v. 000160
 00002CC8 C8C95F5E 1F0000E9 F6468814 C483FFFF 008E9A06 76FF0876 FF0A76FF .v..v..v.......6..F-Õ...^_èùà,.. 000180
 46890000 FFFF9A50 16FC4680 0876FF0A 76FF0676 FF0C76FF D88E013A B81E5657 WV.|:..Ă.v..v..v..v..F■.P¯.....F 0001A0
 9A5016D6 46805016 DA4680FC 76FFFE76 FF0051E9 D4468800 06E90375 00003004 å=..u.Õ...FåÕQ..v±.v■.FÕ.P.F■.P. 0001C0
 76FFFE76 FF0E76FF 1076FF00 2BE9D446 880006E9 03750000 30D44689 0000FFFF .....Få=..u.Õ...FåÕ+..v..v..v±.v 0001E0
```

```
Dump of file SATURN:[PCCOMMON.DUMP.DLL]SADADESK.TMP;1 on 18-APR-1990 10:51:54.61
File ID (902,31,0)   End of file block 102 / Allocated 104

Virtual block number 49 (00000031), 512 (0200) bytes

 0000E900 008814C4 83018C00 8E9A0676 FF0876FF 0A76FF50 16DA468D 0C76FFFC ■.v..FÖ.P.v..v..v.......á.¡..Õ.. 000000
 681E00B6 B7FF2600 B8B7FF26 065EC4D8 8E01A4B8 1E565700 0002C8CB C95F5E1F .^_èùà...WV.¡Ê..Äá^.&.ñ¡.&.ñÑ..h 000020
 00B8B7FF 26065EC4 0037E9FE 46880006 E9037500 003DFE46 890000FF FF9A10FC ■.......F±=..u.Õ...F±Õ7.á^.&.ñ¡. 000040
 C40000FF FF9A0086 B7FF2600 B8B7FF26 065EC4FE 46890000 FFFF9A00 B6B7FF26 &.ñÑ.......F±á^.&.ñ¡.&.ñÑ......á 000060
 D88E022D B81E5657 000002C8 CBC95F5E 1F0000E9 FE468800 0000B487 C726065E ^.&ú.Ç....F±Õ...^_èùà...WV.¡-..Ä 000080
 06E90375 00003DFE 46890000 02439A11 09681E00 B6B7FF26 00B8B7FF 26065EC4 á^.&.ñ¡.&.ñÑ..h...C....F±=..u.Õ. 0000A0
 890000FF FF9A0A76 FF0C76FF 00B6B7FF 2600B8B7 FF26065E C4003DE9 FE468800 ..F±Õ=.á^.&.ñ¡.&.ñÑ..v..v....... 0000C0
 46880000 00B487C7 26065EC4 0000027B 9A00B6B7 FF2600B8 B7FF2606 5EC4FE46 F±á^.&.ñ¡.&.ñÑ..(...á^.&ú.Ç....F 0000E0
 B7FF2600 B8B7FF26 065EC4D8 8E029CB8 1E565700 0002C8CB C95F5E1F 0000E9FE ±Õ...^_èùà...WV.¡...Äá^.&.ñ¡.&.ñ 000100
 26065EC4 004CE9FE 46880006 E9037500 003DFE46 89000002 B29A1124 681E00B6 Ñ..h$..ÿ....F±=..u.Õ...F±ÕL.á^.& 000120
 2600B8B7 FF26065E C4FE4689 0000FFFF 9A0A76FF 0C76FF00 B6B7FF26 00B8B7FF .ñ¡.&.ñÑ..v..v.......F±á^.&.ñ¡.& 000140
 8300D600 569A5052 00910508 56880646 880A76FF 0C76FF00 0002F09A 00B6B7FF .ñÑ..Þ....v..v..F..V....RP.V.ø.. 000160
 00DC0006 00A30203 01490007 03500203 000E90CB C95F5E1F 0000E900 008808C4 á.¡..Õ...^_èù.....P...!...È...É. 000180
 01650007 01560203 01DC0007 01E00203 00000005 02150002 01580007 01BA0203 ..¤...X...........Á...É...V...e. 0001A0
 00000010 03110002 01870007 02D80203 0000000E 037D0002 017F0007 02660203 ..f.......).......Ü............. 0001C0
 013D0007 001C0203 00460005 00BE0203 019D0007 03650203 01910007 03270203 ..'.......e.......ƒ...F.......=. 0001E0

Dump of file SATURN:[PCCOMMON.DUMP.DLL]SADADESK.TMP;1 on 18-APR-1990 10:51:54.61
File ID (902,31,0)   End of file block 102 / Allocated 104

Virtual block number 50 (00000032), 512 (0200) bytes

 16F6468D F476FF00 00FFFF9A 5016F446 8D0C76FF D88EFFFF B81E5657 00000CC8 à...WV.¡...Ä.v..F¶.P......v¶.F-. 000000
 A5DA8E1E 0716F08B FA7E8D00 1205F856 8BF6468B 008EE90A 46880000 FFFF9A50 P......F.Õ...F-.V½....-■.Þ....ÕE 000020
 0085E91F A5A5A5DA 8E1E0716 F08BFA7E 8D001805 F8568BF6 468B009F E91FA5A5 ÊE.Õ...F-.V½....-■.Þ....ÕEEE.Õ.. 000040
 F8568BF6 468B006B E91FA5A5 A5DA8E1E 0716F08B FA7E8D00 2405F856 8BF6468B .F-.V½.$..-■.Þ....ÕEEE.Õk..F-.V½ 000060
 FA7E8D00 2A05F856 8BF6468B 0051E91F A5A5A5DA 8E1E0716 F08BFA7E 8D001E05 ....-■.Þ....ÕEEE.ÕQ..F-.V½.*..-■ 000080
 E9037500 0930002B E9002EE9 005CE99E 59B80037 E91FA5A5 A5DA8E1E 0716F08B .Þ....ÕEEE.Õ7.¡Y.Õ\.Õ..Õ+.=..u.Õ 0000A0
 E9037500 003DFFA0 E9037500 0C3DFF8E E9037500 0B3DFF7C E9037500 0A3DFF6A j.=..u.Õ|.=..u.Õ..=..u.Õ..=..u.Õ 0000C0
 00FFFF9A 0676FF08 76FFFC76 FFFE76FF 001AE903 75FE460B FC468BFF C9E9FFB2 ý.Õè..F■.F±u.Õ...v±.v■.v..v..... 0000E0
 08B81E56 5700000C C80008CA C95F5E1F 0000E99E 58B80006 E90009E9 0000B800 .¡..Õ..Õ..¡X.Õ...^_èò..à...WV.¡. 000100
 0E468800 0000229A 5016F646 8DF476FF 00000015 9A5016F4 468D1076 FFD88E00 ..Ä.v..F¶.P......v¶.F-.P."....F. 000120
 F6468B00 9FE91FA5 A5A5DA8E 1E0716F0 8BFA7E8D 001205F8 568BF646 8B008EE9 Õ...F-.V½....-■.Þ....ÕEEE.Õ...F- 000140
 002405F8 568BF646 8B0085E9 1FA5A5A5 DA8E1E07 16F08BFA 7E8D0018 05F8568B .V½....-■.Þ....ÕEEE.Õ...F-.V½.$. 000160
 16F08BFA 7E8D001E 05F8568B F6468B00 6BE91FA5 A5A5DA8E 1E0716F0 8BFA7E8D .-■.Þ....ÕEEE.Õk..F-.V½....-■.Þ. 000180
 A5A5DA8E 1E0716F0 8BFA7E8D 002A05F8 568BF646 8B0051E9 1FA5A5A5 DA8E1E07 ...ÕEEE.ÕQ..F-.V½.*..-■.Þ....ÕEE 0001A0
 7CE90375 000A3DFF 6AE90375 00093D00 2BE9002E E9006CE9 9E59B800 37E91FA5 Ê.Õ7.¡Y.Õl.Õ..Õ+.=..u.Õj.=..u.Õ| 0001C0
 08FC468B FFC9E9FF 82E90375 00003DFF A0E90375 000C3DFF 8EE90375 000B3DFF .=..u.Õ..=..u.Õ..=..u.Õý.Õè..F■. 0001E0

Dump of file SATURN:[PCCOMMON.DUMP.DLL]SADADESK.TMP;1 on 18-APR-1990 10:51:54.61
File ID (902,31,0)   End of file block 102 / Allocated 104

Virtual block number 51 (00000033), 512 (0200) bytes

 5688FC46 88065EC4 000000FD 9A0A76FF 0C76FFFC 76FFFE76 FF002AE9 0375FE46 F±u.Õ*..v±.v■.v..v..»...á^..F■.V 000000
 0300040C CAC95F5E 1F0000E9 9E588800 06E90009 E90000B8 02578926 078926FE ±&..&.W.¡..Õ..Õ..¡X.Õ...^_èò.... 000020
 00012500 06012C02 03000000 10011F00 02000C00 06013902 0301C900 07021402 .....è...9...É...............X.. 000040
 00FFFF9A 5016FC46 8D0477FF 260677FF 26065EC4 D88EFFFF B81E5657 000004C8 à...WV.¡...Äá^.&.w.&.w..F■.P.... 000060
 C8CBC95F 5E1F0000 E90000FF FF9A0086 B7FF2600 B8B7FF26 045FC426 FC5EC400 .á^■&á_.&.ñ¡.&.ñÑ......Õ...^_èùà 000080
 FFFF9A50 16F6468D 1134681E 01006850 16FEF686 8DD88E00 08B81E56 5700010C ...WV.¡...Ä..-±.Ph...h4..F-.P... 0000A0
 00FFFF9A 5016FC46 8D113068 1EF676FF 0063E900 01B80006 E9037500 003D0000 ..=..u.Õ..¡..Õc..v-.h=..F■.P.... 0000C0
 FF260677 FF26065E C4003CE9 0001B800 0000C89A F676FF00 0EE90375 00003D00 .=..u.Õ...v-.à...¡..Õ<.á^.&.w.&. 0000E0
 FC5EFF00 B6B7FF26 00B8B7FF 26045FC4 26F85EC4 0000001D 9A5016F8 46800477 w..F½.P.....á^½&á_.&.ñ¡.&.ñÑ..^■ 000100
 B81E5657 000004C8 CBC95F5E 1F0000E9 FEF4868B 0000FFFF 9AF676FF FEF48689 ..¶±.v-.......¶±Õ...^_èùà...WV.¡ 000120
 045FC426 FC5EC400 0000A89A 5016FC46 8D0477FF 260677FF 26065EC4 D88E0047 G..Äá^.&.w.&.w..F■.P.....á^■&á_. 000140
 E0B81E56 5700010C C8CBC95F 5E1F0000 E90000FF FF9A0086 B7FF2600 B8B7FF26 &.ñ¡.&.ñÑ......Õ...^_èùà...WV.¡Á 000160
 E9037500 003D0000 005E9A50 16F6468D 114C681E 01006850 16FEF686 8DD88E00 ..Ä..-±.Ph...hL..F-.P.^...=..u.Õ 000180
 0EE90375 00003000 00007D9A 5016FC46 8D115568 1EF676FF 0063E900 01B80006 ..¡..Õc..v-.hU..F■.P.)...=..u.Õ. 0001A0
 9A5016F8 46800477 FF260677 FF26065E C4003CE9 0001B800 0001A09A F676FF00 ..v-.....¡..Õ<.á^.&.w.&.w..F½.P. 0001C0
 9AF676FF FEF48689 FC5EFF00 B6B7FF26 00B8B7FF 26045FC4 26F85EC4 000000F5 ¥...á^½&á_.&.ñ¡.&.ñÑ..^■..¶±.v-. 0001E0
```

```
Dump of file SATURN:[PCCOMMON.DUMP.DLL]SADADESK.TMP;1 on 18-APR-1990 10:51:54.61
File ID (902,31,0)   End of file block 102 / Allocated 104

Virtual block number 52 (00000034), 512 (0200) bytes

00020136 010301FC 00070033 02030007 CBC95F5E 1F0000E9 FEF4868B 0000008D ......¶±Õ...^_èù....3...■...6... 000000
0010011F 0002002E 00020165 0103002D 00020155 01030204 00070108 0203002C ,...........U...-...e........... 000020
FEF6868D D88EFFFF B81E5657 00010CC8 00000000 000002B9 00080180 02030000 ........¿.......à...WV.|...Ä..-± 000040
65E90001 B80006E9 03750000 300000FF FF9A5016 FA468D11 64681E01 00685016 .Ph...hd..F*.P.....=..u.Õ..|..Õe 000060
00889AFA 76FF000E E9037500 00300000 FFFF9A50 16F6468D 116C681E FA76FF00 ..v*.hl..F-.P.....=..u.Õ...v*... 000080
0A76FF00 00FFFF9A 5016FC46 8D0477FF 260677FF 26065EC4 003EE900 01B80000 ..|..Õ>.á^.&.w.&.w..F■.P......v. 0000A0
8B0000FF FF9AFA76 FFFEF486 89F65EFF 50520091 05065788 26044788 26FC5EC4 á^=&.G.&.W....RP.^-..¶±.v*...... 0000C0
0103002D 0002003E 0103002C 0002001F 01030005 90CBC95F 5E1F0000 E9FEF486 .¶±Õ...^_èù..........,...>...-... 0000E0
00000000 00000000 000002B9 00080069 02030000 00100008 0002002E 0002004E N...............i...¿........... 000100
16F6468D 0477FF26 0677FF26 065EC400 C8FA46C7 D88EFFFF B81E5657 0001D4C8 àà..WV.|...ÄúF*à.á^.&.w.&.w..F-. 000120
00FFFF9A 5016FC46 8D008687 FF260088 B7FF2604 5FC426F6 5EC40000 FFFF9A50 P.....á^-&á_.&.ñ|.&.ñÑ..F■.P.... 000140
FFFF9A11 A2681E11 7E681E01 00685016 FE2C868D 00F6E903 74FE4608 FC468800 ..F■.F±t.Õ-...,±.Ph...h-..hÅ.... 000160
0000969A 11A8681E 1182681E 11A236FF 0169E900 01B80006 E9037500 00300000 ..=..u.Õ..|..Õi..6Å..h...h´..... 000180
E9037500 00300000 FFFF9A11 A4681E11 8C681E11 A236FF00 19E90374 00003000 .=..t.Õ...6Å..h...hÊ......=..u.Õ 0001A0
B7FF2600 B8B7FF26 045FC426 F65EC401 28E90001 B80000FF FF9A11A2 36FF000F ...6Å......|..Õ(.á^-&á_.&.ñ|.&.ñ 0001C0
95681E00 6A00FEE9 FF2C868B 0007E903 7500FF2C BE83FF2C 868911A8 1EFF0086 Ñ...´...,..ƒ,..u.Õ....,.Õ±.j..h. 0001E0

Dump of file SATURN:[PCCOMMON.DUMP.DLL]SADADESK.TMP;1 on 18-APR-1990 10:51:54.61
File ID (902,31,0)   End of file block 102 / Allocated 104

Virtual block number 53 (00000035), 512 (0200) bytes

BE83FF2C 868914C4 830000FF FF9A016A 5016FF2E 868D5016 FA468D11 96681E11 ..h...F*.P.....Pj.......á.......ƒ 000000
00B6B7FF 2600B8B7 FF26045F C426F65E C400CAE9 FF2C868B 0007E903 7500FF2C ,..u.Õ.....,.Õò.á^-&á_.&.ñ|.&.ñÑ. 000020
E9009AE9 FF2C868B 0007E903 7500FF2C BE83FF2C 868911A4 1EFF5016 FF2E868D .....P..Ê....,..ƒ,..u.Õ....,.Õ..Õ 000040
C4830000 00F39A02 6A5016FF 2E868050 16FA468D 119C681E 119B681E 006A0097 ..j..h...h...F*.P.....Pj..µ....á 000060
B7FF2604 5FC426F6 5EC40063 E9FF2C86 8B0007E9 037500FF 2CBE83FF 2C868914 ......ƒ,..u.Õ.....,.Õc.á^-&á_.&.ñ 000080
8B0007E9 037500FF 2CBE83FF 2C868911 A41EFF50 16FF2E86 8D00B6B7 FF260088 |.&.ñÑ......P..Ê.......ƒ,..u.Õ... 0000A0
83FF2C86 8911A81E FF00B687 FF260088 B7FF2604 5FC426F6 5EC40033 E9FF2C86 .,.Õ3.á^-&á_.&.ñ|.&.ñÑ...´...,.. 0000C0
0007C8C9 5F5E1F00 0000A79A 11A236FF 0009E9FF 2C868800 07E90375 00FF2C8E ƒ,..u.Õ.....,.Õ...6Å..Ì....^_èù.. 0000E0
00000010 00080002 002E0002 01D50103 00200002 007D0103 002C0002 005E0103 ..^....,...)...-...1............. 000100
00000000 00000000 02B90008 00220203 02330007 00300203 03010009 015A0203 ..Z.......=...3..."...¿.......... 000120
9A5016FE FA868D11 AC681E01 00685016 FEFC868D D88EFFFF B81E5657 000110C8 à...WV.|...Ä..■±.Ph...h¯...*±.P. 000140
9A5016FC 468D11B0 681EFEFA B6FF010F E90001B8 0006E903 75000030 0000FFFF ....=..u.Õ..|..ÕÕ..Ñ*±.h¯..F■.P. 000160
86890000 B801B6E9 0001B800 0001949A FEFAB6FF 000FE903 75000030 0000FFFF ....=..u.Õ...Ñ*±.....|..ÕÑ.|.... 000180
FEF0868D 1477FF26 1677FF26 065EC409 6A0C76FF 00F8E90A 468BFEF0 8689FEF2 ·±..Þ±.F.Õ½..v.j.á^.&.w.&.w...Þ± 0001A0
0C76FF00 F2E9FEF8 9689FEF6 86890014 0508568B 064688FE F48689FC 5EFF5016 .P.^■..¶±.F..V......-±..½±Õ·..v. 0001C0
08568806 468BFEF4 8689FC5E FF5016FE F0868D1A 77FF261C 77FF2606 5EC40A6A j.á^.&.w.&.w...Þ±.P.^■..¶±.F..V. 0001E0

Dump of file SATURN:[PCCOMMON.DUMP.DLL]SADADESK.TMP;1 on 18-APR-1990 10:51:54.61
File ID (902,31,0)   End of file block 102 / Allocated 104

Virtual block number 54 (00000036), 512 (0200) bytes

868D2077 FF262277 FF26065E C40C6A0C 76FF00C1 E9FEF896 89FEF686 89001A05 .....-±..½±Õê..v.j.á^.&.w"&.w .. 000000
FF0090E9 FEF89689 FEF68689 00200508 56880646 88FEF486 89FC5EFF 5016FEF0 Þ±.P.^■..¶±.F..V.. ...-±..½±Õ... 000020
8B06468B FEF48689 FC5EFF50 16FEF086 8D2677FF 262877FF 26065EC4 0B6A0C76 v.j.á^.&.w(&.w&..Þ±.P.^■..¶±.F.. 000040
2C77FF26 2E77FF26 065EC400 6A0C76FF 005FE9FE F89689FE F6868900 26050856 V..&...-±..½±Õ_..v.j.á^.&.w.&.w, 000060
2EE9FEF8 9689FEF6 8689002C 0508568B 064688FE F48689FC 5EFF5016 FEF0868D ..Þ±.P.^■..¶±.F..V.,....-±..½±Õ. 000080
75022730 FF52E903 75022630 FF29E903 75022530 FF00E903 75022430 002BE900 .Õ+.=$.u.Õ..=%.u.Õ).=&.u.ÕR.='.u 0000A0
E9037500 FEF4BE83 0000FFFF 9AFEFAB6 FFD000E9 FFA4E903 75022830 FF7BE903 .Õ(.=(.u.ÕÊ.Õ...Ñ*±......ƒ¶±.u.Õ 0000C0
9688FEF0 8688FEF6 9EC40055 E90375FE F2860BFE F0868B00 68E9FEF4 86880007 ....¶±Õh...Þ±..·±u.ÕU.á.-±..Þ±.. 0000E0
FF9A37FF 260277FF 26FEF69E C40038E9 03750257 39260009 E9037407 3926FEF2 ·±&9.t.Õ..&9W.u.Õ8.á.-±&.w.&.7.. 000100
FEF0868B FEF69EC4 0019E9FE F4868800 07E90375 00FEF4BE 83FEF486 890000FF .....¶±./¶±.u.Õ....¶±Õ..á.-±..Þ± 000120
002C0002 00200103 0005CBC9 5F5E1F00 00E90000 B8025789 26078926 FEF29688 ..·±&..&.W.|..Õ...^_èù.... ...,. 000140
01A80007 01DF0203 00000010 00080002 002E0002 00510103 002D0002 00400103 ..a...-...Q................Õ...´. 000160
FF9A5016 FE468D11 BA681E01 00685016 FEFE868D D88EFFFF B81E5657 00010AC8 à...WV.|...Ä..±±.Ph...ho..F±.P.. 000180
FF9A5016 FEFA868D 11BE681E FE76FF00 58E90001 B80006E9 03750000 300000FF ...=..u.Õ..|..Õ[..v±.hƒ...*±.P.. 0001A0
FEF6868D 0A76FF00 33E90001 B8000000 829AFE76 FF000EE9 03750000 300000FF ...=..u.Õ...v±.....|..Õ3..v...-± 0001C0
76FFFEFA 9EFF0A77 FF260C77 FF26065E C4FEF686 FFFEF886 FF0000FF FF9A5016 .P......Ñ½±.Ñ-±á^.&.w.&.w...*±.v 0001E0
```

```
Dump of file SATURN:[PCCOMMON.DUMP.DLL]SADADESK.TMP;1 on 18-APR-1990 10:51:54.61
File ID (902,31,0)   End of file block 102 / Allocated 104

Virtual block number 55 (00000037), 512 (0200) bytes

 003F0103 002C0002 001F0103 000590CB C95F5E1F 0000E900 00B80000 FFFF9AFE ±.....¡..Õ...^_èù............?. 000000
 00000000 00A50006 00630203 00000010 00080002 002E0002 004F0103 002D0002 ..-...O...............c...É..... 000020
 74D00BFF 2A9689FF 28868900 00FFFF9A 016A006A D88EFFFF B81E5657 000008C8 àÄ..WV.¡...Äj.j........(...*..Åt 000040
 FFFF9A50 16FF3086 8D000D068 006AFF28 B6FFFF2A B6FF0048 E90000B8 0006E903 .Õ..¡..ÕH..Ñ*..Ñ(.j.hÅ...0..P... 000060
 9689FF2C 86890000 FFFF9A26 6A016A00 6A0000FF FF9AFF28 B6FFFF2A B6FF0000 ...Ñ*..Ñ(......j.j.j&.......,... 000080
 08881E56 5700000A C8C8C95F 5E1F0000 E9FF2C86 03FF7C86 03E001A0 468BFF2E ...F.ÌÅ..|...,.Õ...^_èùà...WV.¡. 0000A0
 89000000 569A156A 016A006A FC5689FA 46890000 009B9A14 6A016A00 6AD88E00 ..Äj.j.j.......F*.V=J.j.j..V.... 0000C0
 8BFA76FF FE76FF00 6A006A00 6A0676FF 0876FFFE 4689FFFF 00009AF8 5689F646 F-.V½......F±.v..v.j.j.j..v±.v*. 0000E0
 00CA0103 000790CB C95F5E1F 0000E900 00B80000 FFFF9A08 036850FE 462BF646 F-+F±Ph.......¡..Õ...^_èù.....ð. 000100
 007F0002 009F0004 003E0103 0000000C 00A80002 00950003 008A0103 00080003 ..............´.......>......... 000120
 00000000 00000000 00000000 002C0003 004B0103 002B0003 00110103 00000010 ..........+...K................. 000140
 00000000 00000000 00000F00 02000200 01CB0001 B81F0200 3E89D88E FFFFB81E .¡...Ä.>...¡..ù................. 000160
 FFFFB9C0 33067EC4 1EDE8BD7 8BEC8B55 00000000 00000000 00000000 00000000 ................U.š.■.B.á-.3â¿.. 000180
 01C6F706 468BFE87 08468ED8 8EC08CF9 2BD1F7AE F2FFFFB9 0A7EC4FF 758DAEF2 ·Û.u.á-.¿..·Ü¼ì+*.â.Ä.F..±.F.¼6. 0001A0
 76C51EDE 8BD78BEC 8B55CB5D C28C1FFA 8BF38BA4 F3C913A5 F3E9D149 A4027400 .t.ÊlìÕµÊ.èµÊ.µ.*..ô]ùU.š.■.B.év 0001C0
 13A5F3E9 D149A402 7401A8C7 8B067EC4 D1F7AEF2 FFFFB9C0 33C08ED8 8CFE8B0A ..±.Ä.â3â¿..·Ü¼ìá-..ú´.t.ÊlìÕµÊ. 0001E0

Dump of file SATURN:[PCCOMMON.DUMP.DLL]SADADESK.TMP;1 on 18-APR-1990 10:51:54.61
File ID (902,31,0)   End of file block 102 / Allocated 104

Virtual block number 56 (00000038), 512 (0200) bytes

 F2FFFFB9 C0330A7E C40676C5 1EDE8BD7 8BEC8B55 CB5DC28C 1FFA8BF3 8BA4F3C9 èµÊ.µ.*..ô]ùU.š.■.B.év.á-.3â¿..· 000000
 C033067E C4D78BEC 8B5500CB 5DFA8BF3 8B1FFFFF 1DC01B05 74A6F3F9 2BD1F7AE Û¼ì+*µlt..â.....µ.*]ù.U.š.■á-.3â 000020
 E30E4E8B DF8B0A76 C5067EC4 1E5657EC 8B5500CB 5DFA8B91 4901F7AE F2FFFFB9 ¿..·Ü¼ìl..*]ù.U.šWV.á-.év..Ô.N.D 000040
 46805657 000016C8 CB5DE58B 5F5E1FC2 8CC38BAA F3C032F8 E2AA0374 C00AAC0C .¯.ât.¨ã½2âµ´.û.ô.^_.Í]ùà...WV.F 000060
 89260856 8B06468B 420A47C6 26F85EC4 FE568CFC 46890E46 8DFA568C F84689EC š.F½.V*.F..F=.V±á^½ÏóG.B.F..V.&. 000080
 9A53060A 76FF0C76 FFFC76FF 167FFF04 47C72602 57892607 89260857 89260647 G.&.W.&..&.W.&úG.....v•.v..v..S. 0000A0
 88260247 8E2607FF 263F8B26 C02A1278 044FFF26 F85EC4F0 8B0CC483 016D0430 0.m..á..þá^½&.O.x.*â&.7&..&.G.&. 0000C0
 8B067EC4 57EC8B55 CBC95F5E C68B06C4 83FFFF02 BA9A006A 53FA76FF 900FEB05 .Š...v*Sj..¤....á..ó^_èùU.šWá-.. 0000E0
 C28CC78B C78EFF33 04740538 264FAEF2 FB8B0A46 8AD9F741 AEF2FFFF B9C033DF Õ3â¿..·ÜA¼).F..«·ÜO&8¯t.3..ú.ú.ô 000100
 74E03A43 278A26AC 2D74C00A FF80065E C40A76C5 1ED68BEC 8B5500CB 5DE58B5F _.Í]ù.U.š.ø.év.á^.¯..ât-¯&.'C:Åt 000120
 74C43A41 04C10220 E180C91A 1A3C412C E0864104 C10220E1 80C91A1A 3C412CF3 µ,A<..è.Ã .ê.A.Á,A<..è.Ã .ê.A:át 000140
 1A3C612C 1174C00A 078AD38B 065EC5D9 8CEC8B55 00CB5DF2 8B1F98FF 1CC01AD3 Æ.â.....·]ù.U.š.]é^..Æ...ât.,a<. 000160
 C556571E 4EE30E4E 8BEC8B55 CB5DD98E DA8C92EF 75C00A07 8A430788 41040473 s..A..C...âuÿ..Ö.)]ùU.š.N.DN.WVé 000180
 C203C323 DB1BC22B D2F7D68B C203C323 DB1BC22B D2F7D78B 48C1BB06 7EC40A76 v.á~..êH.■¼Ø+ô.Ü#û.ô.ø¼Ø+ô.Ü#û.ô 0001A0
 C0BCC775 FF0BD88E FFFF05D8 8C0775F6 0B18E391 A4F3C913 A5F3E9D1 C12B9140 ∂.+èìÕµÊ.èµÊ.D..-u..Ä....Ä..uú.ã 0001C0
 D78B067E C45738E3 0C4E8BEC 8B55CB5D 08568B06 46881F5F 5EBEEBC0 8E025605 .V..âŠƒ^_..F..V.]ùU.š.N.D8Wá~..■ 0001E0

Dump of file SATURN:[PCCOMMON.DUMP.DLL]SADADESK.TMP;1 on 18-APR-1990 10:51:54.61
File ID (902,31,0)   End of file block 102 / Allocated 104

Virtual block number 57 (00000039), 512 (0200) bytes

 E3D187AA F3C913AB F3E9D1E0 8A0A468B D12BD187 D1030323 DB1BD12B 0C74DAF7 ¼Öt.+ì.Ü#Æ.ì.ì+ì.F..ÅìÕµ¨.èµ´.ìD 000000
 56570000 08C8CB5D 08568B06 46885FAA F3C913AB F3E9D1C3 8E0261C3 81C38C10 ..û.ûa..ûìÕµ¨.èµ´_.F..V.]ùà...WV 000020
 05E0D1C1 03E0D1C8 8BF9F700 0CB99917 222DC38B FA4689E4 2A0B478A 26085EC4 á^.&.G.*ð.F*.û-"..¿..¼*.àìÅ.èìÅ. 000040
 2BE9FFFF B8200A4F 8026085E C40F7440 0A47F626 0774830A 47F626F8 46892316 .#.F½&-G..t.&-G.@t.á^.&.O. ¡..Ô+ 000060
 26020A4F 802690E2 EB000004 47C72620 0A4F8026 0E74010A 47F62608 5EC49001 ..á^.&-G..t.&.O. &úG...Šã.&.O..& 000080
 F7000CB9 99172220 C3884C75 0C0A47F6 26FC7689 F0880447 8926C02B EF0A6780 .g.ÿ+â&.G..Þ.v=&-G..uL.û-"..¿..¼ 0000A0
 1675173A 087E810E 7403630A 7E810775 172E087E 81377501 231687F6 06D868F9 *kÄ.-..#.u7.-...u..-.c.t..-.:.u. 0000C0
 830C51E8 0876FF0A 76FF0C75 C00B02C4 83030612 309AFA76 FF0F75FF FF0A7E81 .~...u..v*.0.■..á..âu..v...v.ÒQ.. 0000E0
 74012316 87F606D8 6BF9F700 0CB99917 222DC38B 1575080A 47F62608 5EC404C4 á.á^.&-G..u..û-"..¿..¼*kÄ.-..#.t 000100
 458BF87E 88025789 26078926 40085788 26064788 2606772B 26378826 085E8B67 g.^.&.7&+w.&.G.&.W.@&..&.W..-½.E 000120
 19EBFC46 8908C483 03F4109B 9AFA76FF 0677FF26 5256167E F60B0447 89264802 .H&.G..--.VR&.w..v*...¶..á..F=Š. 000140
 065FC426 085EC408 C4830417 105A9A53 006A006A 026A0F74 20292787 F6FA5E8B .^*-.') t.j.j.j.S.Z....á.á^.&á_. 000160
 39FC4689 08C48301 4210989A FA76FF50 1606468D 560001BE 17EB0788 2606468A .F.&..Š.ƒ..V.F..P.v*...B..á..F=9 000180
 76A32C7C B8036012 549A000A BBEC8B55 CBC95F5E E42A0646 8AFECCE9 0374FC76 v•t.Õâ±.F.*ð^_èùU.š¡...T.m.¡|,Êv 0001A0
 C72C4E16 892C4CA3 08568B06 46882C68 16892C66 A310568B 0E468B2C 781E8C2C ,...x,.F..V.Êf¯,..h,.F..V.ÈL,..N,ú 0001C0
 A3C02800 012C7406 C7030BE9 037425F6 7E80038D E900002C 7006C700 002C7206 .r,..ú.p,..Õ...—Xt.Õ..ú.t,..+âÈ 0001E0
```

Dump of file SATURN:[PCCOMMON.DUMP.DLL]SADADESK.TMP;1 on 18-APR-1990 10:51:54.61
File ID (902,31,0)   End of file block 102 / Allocated 104

Virtual block number 58 (0000003A), 512 (0200) bytes

```
00202DDC 06C72C64 A32C4AA3 2C50A32C 6AA32C6C A32C54A3 2C6EA32C 52A32C56 V,ÈR,Èn,ÈT,Èl,Èj,ÈP,ÈJ,Èd,ú.É- . 000000
FF00752B 3F80260A 5E88903E EB00302D DC06C70A 46FF4975 30017F80 260A5EC4 á^.&...0uI.F.ú.É-0.Š>..^.&.?+u.. 000020
9014EB2C 6A06FF1A 75002C56 3E830E75 203F8026 9028EB00 002C6A06 C72C5606 .V,ú.j,..Š(.&.? u..>V,.u...j,Š.. 000040
EB0E5098 078A260A 5E880A46 FF2C6406 FFC7752D 3F80260A 5EC400EB 2C4A06FF ..J,Š.á^.&.?-uú..d,.F..^.&...P.Ò 000060
0C56890A 468908C4 8308C7E8 0E2C7A68 1E0A76FF 0C76FFD0 75C00802 C4830978 x..á..áuI.v..v..hz,.Òú..á..F..V. 000080
75302DDC 3E830074 002C643E 832C7AA3 D8F72C7A A12C6406 FF0C7D00 2C7A3E83 .>z,.)...d,Àz,ׯÈz,.>d,.t..>É-0u 0000A0
0E2C7468 1E0A76FF 060A46FF 2C6C06FF 2D752E3F 80260A5E C400202D DC06C706 .ú.É- .á^.&.?.u-..l,.F...v..ht,. 0000C0
0A5EC42C 6C0EFF00 012C7406 C70A7D00 2C743E83 0C56890A 468908C4 83087BE8 Ò(..á..F..V..>t,.).ú.t,....l,á^. 0000E0
3E830002 2C5406C7 0675006C 3D2B7400 68304074 004E3D3D 74004630 98078A26 &...=F.t==N.t@=h.t+=l.u.ú.T,...> 000100
06C79002 4EE91C75 003F8026 0A5EC40A 46FF0375 4C3F8026 0A5EC409 75002C54 T,.u.á^.&.?Lu..F.á^.&.?.u.ÕN..ú. 000120
004530F8 46899B07 8A26C8EB 00082C54 06C7D0EB 00102C54 06C7D8EB 00012C54 T,..ŠÀú.T,..ŠÀú.T,..Šà&....F½=E. 000140
91E9037E 78740069 30F8468B 20F84683 2C5206FF 08750058 3D057400 473D0A74 t.=G.t.=X.u...R,.F½ .F½=i.tx-.Õ. 000160
75022C54 3E839001 59E90140 E9037500 25300152 E9037E01 3FE90375 00633D01 .=c.u.Õ?.-.ÕR.=X.u.Õ@.ÕY...>T,.u 000180
2C70A11F C4262C66 1EC400EB 00000247 C7260789 262C70A1 1FC4262C 661EC415 .á.f,&á.Àp,&..&úG...Š.á.f,&á.Àp, 0001A0
2C4C1EC4 01B0E903 74002C70 3E830170 E9037500 2C723E83 042C6606 83078926 &....f,..>r,.u.Õp..>p,.t.Õ§.á.L, 0001C0
019EEB0E 0A6A0000 2C4A06C7 2C6E06FF 01ACE9FF FFB801AF E9037520 0A47F626 &-G. u.Õ€.¡..Õ¯...n,ú.J,..j..Ò.. 0001E0
```

Dump of file SATURN:[PCCOMMON.DUMP.DLL]SADADESK.TMP;1 on 18-APR-1990 10:51:54.61
File ID (902,31,0)   End of file block 102 / Allocated 104

Virtual block number 59 (0000003B), 512 (0200) bytes

```
2C543E83 00042C74 06C72C6C 06FF2C52 06FF2C50 06FFF2EB 086A90C3 EB02C483 .á.Šû.j.Š·..P,..R,..l,ú.t,...>T, 000000
46892C7A A128742C 7A0639FA 46892C54 A3C0287A 74012C54 3E830081 E9037508 .u.Õ...>T,.tz+áÈT,.F*9.z,t(Àz,.F 000020
C028027D C00B2C7A A1052C7A 2E839090 13E80000 2C7A06C7 0A74002C 643E83FA *.>d,.t.û.z,..Š.....z,.Àz,.á).+à 000040
227400FA 7E8302C4 83048DE8 0E3A6A02 C4830130 E80E106A 022C6606 832C7AA3 Èz,..f,.j..ÒO..á.j:.Ò...á..-*.t" 000060
2C7A06C7 9007EB2C 7AA3C02B 027DC008 2C7AA300 052DFA46 8B157400 2C643E83 .>d,.t..F*-..Èz,.à).+àÈz,Š..ú.z, 000080
006A90FF 3FE9106A FF10E902 2C660683 02C48300 F1E80E10 6A042C66 2E830000 ....f,.j..Òþ..á...f,.Õ..j.5?..j. 0000A0
90FF21E9 0428EB0E 256AFF2A E90349EB 0EF876FF F4EB016A 90FF39E9 026EEB0E .Òn.Õ9..j.Š¶.v½.ÕI.Õ*.jX.Õ¢.ÕI.. 0000C0
FF0C568B 0A468809 74002C54 3E830A7E 00673D05 7C00653D FF0CE903 7500643D =d.u.Õ..=e.|.=g.-Õ.>T,.t..F..V.. 0000E0
E9037500 6F30FE80 E9037500 6E30903A EBFE5689 FC468940 0C56880A 46880A4E N..F..V.@.F=.V±Š:.=n.u.Õ.±=o.u.Õ 000100
EBFF79E9 03750078 30FEB9E9 03750075 3DBF7400 7330FEE0 E9037500 7030FEE4 Õ±=p.u.ÕÀ±=s.t.=u.u.Õ¿±=x.u.Õy.Š 000120
462BC38B EC75253C 0474C00A F6468807 8A26FC5E C4FC46FF 9034EB0A 46FF90B1 Ý..F.Š4..F=á^=&...F-.át.<Xu$.ú+F 000140
8A260A5E C40C5689 0A4689FE 5688FC46 8B06C483 044CEB0E 0A76FF0C 76FF500A .P.v..v..ÒL..á..F=.V±.F..V.á^.&. 000160
12C8CBC9 2C70A1FE 51E90374 200A47F6 262C4C1E C4FC63E9 0374C00A F6468807 ..F-.ât.Õc=á.L,&-G. t.ÕO±Àp,èùà. 000180
022C543E 832C6E06 FF04740A 067E8300 202DDC06 C7067400 2C6C3E83 56570000 ..WV.>l,.t.ú.É- ..-..t...n,.>T,. 0001A0
EB042C66 0683FE56 89FC4689 02578B26 078B262C 661EC419 75102C54 3E830774 t..>T,.u.á.f,&..&.W..F=.V±..f,.Š 0001C0
8B262C66 1EC40EEB 0000FE46 C7FC4689 078B262C 661EC411 74002C6E 3E83902C ,..>n,.t.á.f,&...F=úF±..Š.á.f,&. 0001E0
```

Dump of file SATURN:[PCCOMMON.DUMP.DLL]SADADESK.TMP;1 on 18-APR-1990 10:51:54.61
File ID (902,31,0)   End of file block 102 / Allocated 104

Virtual block number 60 (0000003C), 512 (0200) bytes

```
EB06468B 0674FE46 0BFC468B 0E74002C 4A3E8302 2C660683 FE5689FC 46899907 ...F=.V±..f,..>J,.t..F=.F±t..F.Š 000000
7D00FE7E 83317500 2C6E3E83 F45689F2 46892C78 16882C76 A120DAA3 C0289003 ..+áÈÖ·Àv,..x,.F·.V¶.>n,.u1.-±.) 000020
4689DAF7 00D283D8 F7FE568B FC46882D 07C626F2 46FFF25E C41D750A 067E832B +.-..u.á^·.F·&ó.-.F=.V±¾Ä.@.¾Ö.F 000040
FF501E06 76FFFA5E 8CF84689 2C588800 00F646C7 9006EB00 01F646C7 FE5689FC =.V±ÚF-..Š..úF-..|X,.F½.^*.v..P. 000060
83043900 B69AF876 FFFA76FF 4574002C 6C3E830A C483091D 12269AFC 76FFFE76 v±.v=.&....á..>l,.tE.v*.v½.Ñ.9.. 000080
C4F04E8B 00002DDA 06C70675 0820DA3E 83007EC9 0BF04E89 C82B2C74 0E8B04C4 á...t,+à.NÞ.è-..>Ö-.u.ú.Õ-...NÞá 0000A0
EE5E8C2C 520E8BF0 4E89F446 8CF27E89 F47FC00B 49C18B47 3005C626 05EBF27E -·Š.&ó.0G.èl.à.¶.-·.F¶.NÞ..R,.^Ý 0000C0
E375003F 8026F846 FF46202C 80037C61 3C0774C9 08048807 8A26F85E C4F276C5 év·á^¾&.....èt.<a|.., F.F¾&.?.uÐ 0000E0
B8057500 F67E830B 742C6A06 0B2C56A1 1475002C 6E3E83EE 5E8EF45E 8CF27689 .v·.^¶.^Ý.>n,.u.ÀV,..j,t..-—.u.| 000100
018E1874 00067E83 56570000 10C8CBC9 5F5E02C4 8302FFE8 0E50C02B 02E80001 ..Š.+àP.Ò...á.^_èùà...WV.-..t.ƒ. 000120
661EC413 74082C54 3E83008F E9022C66 0683FA56 89F84689 2C68168B 2C66A100 .Àf,..h,.F½.V*.¯f,.Õ...>T,.t.á.f 000140
FA5E8CF8 4689FC46 89078B26 2C661EC4 10EBFA56 89F84689 02578B26 078B262C ,&..&.W..F½.V*Š.á.f,&...F=.F½.^* 000160
097500FC 7E83900A EB12D0B8 1575FA46 0BF8468B 0E74082C 543E8304 2C660683 ..f,..>T,.t..F½.F*u.|À.Š...~=.u. 000180
740E8B1C 742C6C36 39F62BF4 5689F246 89FA568B F84688FA 5E8CF846 89120788 |=..F½.^*.F½.V*.F·.V¶+-96l,t...t 0001A0
26F246FF F25EC446 90EDEB10 7ECE3B46 1574003F 8026F246 FFF25EC4 900EEB2C ,Š..á^·.F·&.?.t.F;ö-.ŠÚ.Fá^·.F·& 0001C0
76FFFA76 FF5602C4 830159E8 0E570875 002C643E 83FE2B2C 7A3E88F3 75003F80 .?.u¥.>z,+±.>d,.u.W.ÕY..á.V.v*.v 0001E0
```

Dump of file SATURN:[PCCOMMON.DUMP.DLL]SADADESK.TMP;1 on 18-APR-1990 10:51:54.61
File ID (902,31,0)   End of file block 102 / Allocated 104

Virtual block number 61 (0000003D), 512 (0200) bytes

```
000006C8 90CBC95F 5E02C483 013CE80E 57087400 2C643E83 06C48301 B3E80EF8 ½.Ò°..á..>d,.t.W.Ò<..á.^_èù.à... 000000
C02A9003 EB01B005 7547067E 83067467 067EB3FE 5689FC46 892C6816 8B2C66A1 Àf,..h,.F■.V±.~.gt..~.Gu¯.Š..*ã 000020
7406C706 75002C74 3E830D74 00FA7E80 00062C74 06C70675 002C6C3E 83FA4688 .F*.>l,.u.ú.t,...~*.t..>t,.u.ú.t 000040
2B68068E FC76FFFE 76FF2C76 36FF2C78 36FF0676 FF2C7436 FF2C5236 FF00012C ,...6R,.6t,.v..6x,.6v,.v±.v■..h+ 000060
68068E2C 7636FF2C 7836FF14 75002C4A 3E831B74 00FA7E80 0EC48317 021EFF26 &.....á..~*.t..>J,.u..6x,.6v,..h 000080
8E2C7636 FF2C7836 FF147500 2C743E83 1B74002C 4A3E8304 C4831706 1EFF262B +&.....á..>J,.t..>t,.u..6x,.6v,. 0000A0
FF1B742C 6A06082C 56A10000 2DDA06C7 082C6606 8304C483 170E1EFF 262B6806 .h+&.....á...f,.ú.Ö-..ÀV,..j,t.. 0000C0
29E80E50 C02B02EB 00018805 74C00B04 C4831712 1EFF262B 68068EFC 76FFFE76 v±.v■..h+&.....á..ât.|..Š.+âP.Ò) 0000E0
37882606 468A1478 044FFF26 2C4C1EC4 3C75002C 723E8356 000000C8 90CBC901 .èù.à...V.>r,.u<á.L,&.O.x..F.&.7 000100
754006C4 830BF502 BA9A0676 FF532C4E 36FF10EB E42A0488 2602478E 2607FF26 &..&.G.&..*ðŠ..6N,S.v..¤.%..á.ðu 000120
06768857 75002C72 3E835657 000002C8 90CBC95E 2C7006FF 9005EB2C 7206FF07 ...r,Š....p,^èù.à...WV.>r,.uW.v. 000140
7206FF04 754006C4 830C5D02 BA9A2DDC 36FF2C4C 36FF2C4E 36FF1BEB 507EF60B .~-PŠ..6N,.6L,.6É-.¤.]..á.ðu...r 000160
2602478E 2607FF26 3F8B262D DCA00478 044FFF26 2C4C1EC4 1E7EC00B 4EC68B2C ,.6N.â~.á.L,&.O.xå.É-&.?&..&.G.& 000180
768B5657 000002C8 CBC95F5E 2C700601 06468B07 75002C72 3E8304EB E42A0588 ..*ðŠå.>r,.u..F...p,^_èùà.  WV.v 0001A0
830CCF02 8A9A5098 078A2606 5EC42C4C 36FF2C4E 36FF22EB 5E75002C 723E830A ..>r,.u^Š".6N,.6L,á^.Ï...P.. .. 0001C0
065EC4CD 78044FFF 262C4C1E C42574C0 084EC68B 0646FF2C 7206FF04 754006C4 á.ðu...r,.F..6N.ât%á.L,&.O.xëá^. 0001E0
```

Dump of file SATURN:[PCCOMMON.DUMP.DLL]SADADESK.TMP;1 on 18-APR-1990 10:51:54.61
File ID (902,31,0)   End of file block 102 / Allocated 104

Virtual block number 62 (0000003E), 512 (0200) bytes

```
8B077500 2C723E83 CAEBE42A 05882602 478E2607 FF263F8B 262C4C1E C4078A26 &..á.L,&.?&..&.G.&..*ðŠð.>r,.u.. 000000
4689C02B F65689F4 46892C78 16882C76 A1560000 0CC8C8C9 5F5E2C70 06010A46 F...p,^_èùà...VÀv,..x,.F¶.V-+â.F 000020
2DDA3E83 067628F0 2BF84689 04C48309 0800B69A F476FF52 2C7A3688 FA4689FC ■.F*.6z,R.v¶.Ñ....á..F½+Þ+v..>Ö- 000040
1975203F 8026F45E C4227500 2C643E83 4E017508 2DDA3E83 08EB02EE 83057510 .u..Ÿ.Š..>Ö-.u.N.>d,.u"á^¶&.7-u. 000060
0B74302D DC3E83F8 4EFF02C4 83FE71E8 0E509807 8A26F446 FF127530 20DC3E83 .>É-0u..F¶&...P.Òq±.á..N½.>É-0t. 000080
FF077400 2DDA3E83 0066E80E FA46FF07 7400067E 831B7400 2C643E83 077EF60B .~~..>d,.t..~..t..F*.Òf..>Ö-.t.. 0000A0
7500FA7E 830A7400 067E8302 C483FE7E E80E5629 75002C64 3E830070 E80EFC46 F■.Òp..>d,.u)V.Ò-±.á..~..t..~*.u 0000C0
0EF476FF F676FFF8 76FF0040 E80E0475 00FC7E83 0A74002D DA3E8300 39E80E04 ..Ò9..>Ö-.t..~■.u..Òa..v½.v~.v¶. 0000E0
3E83CBC9 5E02C483 FE38E80E 5600202D DC06C70E 74002C64 3E8306C4 83FE85E8 Òç±.á..>d,.t.ú.É- .V.Ò8±.á.^èù.> 000100
8302C483 FDC8E80E 306ACB02 C483FD02 E80E5000 20B803EB 002B8805 74002C56 V,.t.¡+.Š.¡ .P.Ò0».á.ùj0.Òà».á.. 000120
06C8CB02 C483FDAA E80E5000 7BB803EB 00588805 74002C52 3E831775 1020DA3E >Ö-.u..>R,.t.¡X.Š.¡x.P.Ò^».á.ùà. 000140
46FF022C 66068337 8B262C66 1EC41275 2A3F8026 0A5EC400 01FE46C7 56570000 ..WVúF±..á^.&.7*u.á.f,&.7..f,..F 000160
FA468807 8A260A5E 8BF6280A 46FFFFFF FE46C708 752D3F80 260A5EC4 9060E80A .Š'.á^.&.?-u.úF±...F.+-.^.&...F* 000180
393D8026 06E8F8B8 003020DC 06C70675 303C0A75 2C6C3639 3B7F393C 3F7C303C <0|?<9.;96l,u.<0u.ú.É-0..«Š.&.=9 0001A0
0A7E890F 7D303D80 2647F188 30E983C8 03E1D1CE 0302E1C1 CE8B9805 8A261B7F ..&....öèÅ..öiÅ.à.ÒO.þG&.=0)Ò.~. 0001C0
8B570000 04C8C8C9 5F5E0C56 880A4688 37892606 5EC4F08B EEF7FE46 8B0C468C .F..F±¾Ÿ.Þá^.&.7.F..V.^_èùà...W| 0001E0
```

Dump of file SATURN:[PCCOMMON.DUMP.DLL]SADADESK.TMP;1 on 18-APR-1990 10:51:54.61
File ID (902,31,0)   End of file block 102 / Allocated 104

Virtual block number 63 (0000003F), 512 (0200) bytes

```
890001B8 F4750D38 26117400 3D802647 01EBFC7E C4064E8A FE5E8CFC 468912DE B..F■.^±.N.á-■Š.G&.=.t.&8.u¶|... 000000
00FFFF9A 5016C48B 50EC8855 90CBC95F C02BFE46 8CFC7E89 9009EBFE 468CFC7E ~■.F±Š...~■.F±+â_èù.U.ŠP.á.P.... 000020
B80BB913 689A039E E80021E8 0000FFFF 9A12E468 1E12E668 1E2920A3 E0865800 .X.ÀÈ ).hl..hð......Òl.Ò...h.¿.| 000040
068EFF33 0000B81E 12EC16FF 00FF680E EA0F9A9A 0EDD0F46 9A50CB5D E5880001 ...Í]ùP.F.Ï....ō.h....š..£..3... 000060
330874CA 8BA6F3CB 88D18B16 F0BE3174 003D8026 47017500 3D80267F FFB912E6 Ì.¿..&.=.u.G&.=.t1/Þ..Ì.ùµÌ.ðt.3 000080
C20A0572 412CAC92 04E0C00E 72412CAC 2927BF1F F78B071E 061CEBE7 74AEF2C0 â·ÙtÓŠ.....¥.€')˜,Ar.âÀ..¯,Ar..ô 0000A0
00FFB816 FE1EFF04 74001700 3E830EEF 0F9A9A50 00FCB8EC 885500C3 1FEDEBAA ˆŠÚ.ù.U.š|■.P...ÿ..>...t...±.|.. 0000C0
74C238AD 2B72BE06 5688C08E D88E0355 B85756EC 8855CB5D E5880F50 0F9A9A50 P...P..Í]ùW.ŠVW¡U..Ä.â.V./r+Ù;ôt 0000E0
76FF57EC 88550002 CA5DE588 5E5F96EB EBF788AE F2FFFF89 C033970C 74964010 .ə.t..3â¿..·O.¥ŠŠ._^.Í]ò..U.ŠW.v 000100
521E5300 02B8C48B 5049D1F7 AEF2FFFF B9C033FA 8B921F74 C0080F64 0F6A9A06 ..j.d..ât...ª3â¿..¯Ú¼ÌÌP.áÉ..S.R 000120
B9991722 2D044688 2B3806FF 000004C8 0002CA5D E5885F5B 0000FFFF 9A501651 Q.P.....[_.Í]ò..à.....8+.F.-"..¿ 000140
02C4830F A415239A 020068FE 5E8CFC46 89231605 E0D1C103 E0D1C88B F9F7000C ..¥ª.àÌÀ.ĕÌÀ..#.F■.^±h...#.Ê..á. 000160
9021EB02 000247C7 26FC5EC4 080A4F80 26117400 08085789 26064789 26045EC4 á^.&.G.&.W..Àt.&.O..á^■&úG...ŠÌ. 000180
00010247 C726FC5E C4085789 26064789 2640FE56 88FC468B 040A4F80 26045EC4 á^.&.O...F■.V±ə&.G.&.W.á^■&úG... 0001A0
065E8BEC 8855C3C9 00000447 C7260257 89260789 26085788 2606478B 26045EC4 á^.&.G.&.W.&..&.W.&úG...èùU.š.^. 0001C0
0C76FF08 76FF0A76 FF53CC8B 04EC8304 60E90454 E9C03300 098A0B72 29251E3B ;.X)r.¤..3âÒÏ.Ò'..š..äS.v..v..v. 0001E0
```

```
Dump of file SATURN:[PCCOMMON.DUMP.DLL]SADADESK.TMP;1 on 18-APR-1990 10:51:54.61
File ID (902,31,0)   End of file block 102 / Allocated 104

Virtual block number 64 (00000040), 512 (0200) bytes

 5E880CEC 83EC8855 00CB5DE5 8BFD2927 A78091E1 75C0855A 590000FF FF9A5116 .Q.....YZ.âuÄ..Ï')».[]ù.U š.š..^ 000000
 468D5141 415151C9 33531274 20292787 F60413E9 C0330009 BA087229 251E3806 .;.%)r.¤..3äÕ..-.') t.S3è ?AAQ.F 000020
 FC4689FE 4689C033 0856C50A 468EFA5E 8C667480 292787F6 00001083 9A5016F4 ¶.P.....-.').tf_^*.F.éV.3â `t.F• 000040
 8BE22B00 808ADC8B 02EC833B 75AEF20A B049E30C 4E8BF866 89F28BFA 8B5657FC •WV.*.·.f½.N.DI¯.·Üu;.š..É¤..+ã. 000060
 0375FB3B 0DB0009A E9002BE8 F4E2AA1A 74FB3B0D 740A3CAC 0C4E8807 16FA8B04 å.*...N.¯<.t.;«t.`ã¶Ò+.Õ..¯.;«u. 000080
 12549AFF FCB87AEB 0093E9FA 5E8E5F5E E1EB0014 E8E2EBFC 46FF0AB0 AA001FE8 Ò..`¯..F•ŠãÒ..ŠÃ^_.^*Õ..Šz|•..T. 0000A0
 0B00000F C49A5016 F4468D51 521E5306 5E8B1FE3 CA2BCF8B 1F061E51 53500FFB «.PSQ....ü+ÒD..^.Š.RQ.F¶.P.á.... 0000C0
 74006D3D 1874C008 08C4831F C3FA8B58 5B591F07 74D80BFE 5E01F45E 8B1175C0 âu..^¶.^±.Üt..Y[X.*ù..á..ât.=m.t 0000E0
 5E8E0E74 40292787 F6FE5E8E 26EBF900 20BA03EB 001CBA08 7500098A 00013000 .=..¤..u.¤..Š.¤ .*Š&.^±-.')ât..^ 000100
 8E5F5EF8 668BFC46 2BFE468B 06EBF9C0 33001CBA 0EEBF803 751A3F80 085E880A ..^..?.u.½Š.¤..3â*Š..F±+F•.f½^_. 000120
 468D5152 1E530856 C51EEEEB C18B0475 C9080C4E 8802F7E9 CB50E58B 0472FA5E ^*r..[]ùÕ%..N..èu..êŠŸ.éV.S.RQ¯F 000140
 EB001CBA CC750009 BA000130 00740060 301774C0 081F071E 0000115B 9A5016F4 ¶.P.[.......ât.=m.t.=..¤..uä¤..Š 000160
 1CBAA6EB 02751A3F 80260A8B 0A744029 2787F687 75C00BF4 4688C2EB 00208AC7 ú¤ .Šó.F¶.âuñ-.')ât..Õ&.?.u.Šl¤. 000180
 7C00FB83 11702925 1E38065E 88EC8855 0442E900 B35756EC 885500A3 EBC03300 .3âŠÉ.U.šVW*.ÕB.U.š.^.;.%))..«.| 0001A0
 17201E38 0872D828 DC8B5A59 00CB5DE5 8BC03302 EB0001B8 05744029 2787F60C .-.')ât.|..Š.3á.[]ù.YZ.É+Är.;. . 0001C0
 A780048B 5200028B 171C2EFF 5152FC74 E9C03305 7540171C A1CB5152 E3880572 r..DRQùÀ..âu.3äÕt•RQ....E..R.å.Ï 0001E0

Dump of file SATURN:[PCCOMMON.DUMP.DLL]SADADESK.TMP;1 on 18-APR-1990 10:51:54.61
File ID (902,31,0)   End of file block 102 / Allocated 104

Virtual block number 65 (00000041), 512 (0200) bytes

 7500023D 07740001 30408112 7558C008 0000FFFF 9A521650 1653C48B 50872927 ')ñP.áS.P.R......âXu.Ÿ∂=..t.=..u 000000
 E903732B 501EFFD8 33C28C2B 5406C41E E32B520E 885AD479 4B29278F 0808B106 .Ÿ...')KyâZ..R+D.á.T+.ô3Ü..P+s.Õ 000020
 73E82B5C BF2B5CBE 007CE82B 5CBF2B5C BE2B501E FF0003B8 C28C2B58 06C401AE Û.á.X+.ôÉ....P+/\+«\+Ò|./\+«\+Òs 000040
 2B60BF2B 5CBED88E 0F7088C3 0000FFFF 9A12F568 0E016A08 742B603D 2B5CB800 .¡\+='+t.j..h%......ü|p..Ä/\+«'+ 000060
 2B60BF2B 5CBE003A E82DDEBF 2DDEBEEC 8B550000 12F09A00 6A006A03 6A0051E8 ÒQ.j.j.j..Þ...U.Š/B-«B-Ò:./\+«'+ 000080
 06468A50 C033001A E82B60BF 2B60BE00 23E82B60 BF2B60BE EC8B5503 E80031E8 Ò1.Š.U.š/'+«'+Ò#./'+«'+Ò..3âP.F. 0000A0
 02450B05 8B04EF83 0E73F738 C32B501E FF00028B 07E32B52 0E8B0000 FFFF9A50 P.......R+D.£....P+û;%s..ÿ....E. 0000C0
 2B12E616 8B00F0E9 037512E6 3639FF2B F62B5657 000014C8 00C3EEEB 1DFFF274 t·..ŠŸû.à...WV+-+.96Ï.u.ÕÞ...|.+ 0000E0
 C483130C 16369A16 F0681EF6 76FFF876 FF0C6AF8 5689F646 89F25689 F04689C0 å.FÞ.V·.F-.V½j..v½.v-.hÞ..6.É..á 000100
 5EC40CEB 47EA7500 3F8026F6 46FFF65E C4008CE9 03767FFF FE814619 74C0080A ..ât.F.±..v.Õ¥.á^-.F-&.?.uõGŠ.á^ 000120
 C48313EB 150E9A04 6A500145 8DBA7500 3F8026F6 5E88F475 003F8026 F646FFF6 -.F-&.?.u¶.^-&.?.u¤.E.Pj..B.Š..á 000140
 468B6D74 EE4608EC 468BFE56 89FC4689 02C48314 2115239A 56EE5689 EC468904 ..Fš.VŸV.#.!..á..F•.V±.Fš.FŸtm.F 000160
 369A16F0 681EF076 FFF276FF 0C6A282F 1689282D A3EE568B EC468B66 74C208FC •.ôtf.Fš.VŸÉ-+../+j..v·.vÞ.hÞ..6 000180
 5EC404EC 46830257 89260789 26FE568B FC468BEC 5EC42C74 C0080AC4 83114016 .∂..á..ât,á^š.F•.V±&..&.W..Fš.á^ 0001A0
 003F8026 F046FFF0 5EC4E8EB 0E74C00A 078826FC 46FFFC5E C4078A26 F046FFF0 Þ.FÞ&..á^•.F•&...ât.ŠÒá^Þ.FÞ&.?. 0001C0
 00051804 02030202 1601FA70 E900028B 90CBC95F 5EA77500 3F8026F0 5EC4F475 u¶á^Þ&.?.uÏ^_èÙ.¡..Õp*......... 0001E0

Dump of file SATURN:[PCCOMMON.DUMP.DLL]SADADESK.TMP;1 on 18-APR-1990 10:51:54.61
File ID (902,31,0)   End of file block 102 / Allocated 104

Virtual block number 66 (00000042), 512 (0200) bytes

 0D520243 00410235 02121211 0010120F 1600160C 0808070A 0C090C08 0C070906 ........................5.A.C.R. 000000
 000008D7 02CE08A4 00840982 0A810A80 16060972 1C702060 006C0B59 00570053 S.W.Y.l.m p.r...........É.ö.•... 000020
 BB2923A3 CB5DE58B 99FFFFB8 0008E8CB 5DE58899 FFFFB829 1C168929 23A31608 ..É#)...)¡....[]ùÒ..¡....[]ùÉ#)£ 000040
 3C0472BC 3C430A76 243C0472 133CF7E2 43431674 073A2E1B 75E40A00 24B91476 v.¿$..ðu..:.t.CCã%<.r.<$v.C<¥r.< 000060
 8B01FE4F 80260574 C308C08C 065EC4EC 8B5500C3 291CA398 01478A2E 430176CA òv.C..G..È.)û.U.šá^..á.ût.&.O±.. 000080
 A3127400 25E80875 0028443E 831E73FF F1300646 88575602 EC83EC8B 55CB50E5 []ùW.š.š.VW.F.=þ.•..>D+.u.ÒX.t.È 0000A0
 E58B5E5F 02C48313 9C17289A 0676FF0B 750078E8 05740018 E8157500 82E82844 D+Ò..u.Ò..t.Òx.u..v..(....á._^.Ï 0000C0
 50028051 0E4F8D50 501EC033 FE5E89FE E3834306 5E880776 065E3900 F0BBCB5D ]ùÉÞ.9^.v..^.C.D±.^±3â.PP.O.Q¯.P 0000E0
 BB0008A3 DA8E0574 D2082848 A32B4616 87C28838 74FFFA83 08C48315 5718049A .å.W..á..*.tB.õ..F+ÈH+.Øt..ÕÈ... 000100
 000D0500 0AA30147 8D0002A3 0000A300 0AB80C47 89484800 08A3C033 D88EFE5E ^±.Ä3ãÈ..HH.G.¡..È..È...G.È..... 000120
 0AC8C3D9 8EC18CD2 0B019AE8 2B481E8E DB33064E 88C08ED8 8CC31FD8 8C0006A3 È...Ä.û.Ä.ã.N.3Ü..H+Ò...Ø.ê.ìùà. 000140
 C02B0674 FFFFC2F7 FA5689F8 4689160B 198A9A06 76FF006A 0876FF00 6A560000 ..Vj..v.j..v.......F½.V*%õ..t.+â 000160
 FE76FF00 6A561274 D008FE56 89FC4689 02C48316 2415239A 56F8768B 902FE899 .Š/..v½V.#.$..á..F•.V±.Ât.Vj..v± 000180
 E30E4E8B 1E5657EC 885590CB C95EFE56 88FC468B 9007E808 C4831583 02729A50 P.r....á.Š...F•.V±^èù.U.šWV..N.D 0001A0
 FF453A26 C933FF44 8AA6F30A 76C5FE88 CB03D9F7 AEF2C033 F788067E C4D98B27 '.Ìá~..¥3â·ÚÄ).ù.±év.µÏ.D.3è&:E. 0001C0
 570A7EC5 1E08568B 0646880E 4E8800CB 5DE5885F 5E1FC18B D1F74949 04740477 w.t.IIÌ%Ï.ê.^_.[]ù..N..F..V..é-.W 0001E0
```

Dump of file SATURN:[PCCOMMON.DUMP.DLL]SADADESK.TMP;1 on 18-APR-1990 10:51:54.61
File ID (902,31,0)   End of file block 102 / Allocated 104

Virtual block number 67 (00000043), 512 (0200) bytes

```
D23392F7 8BDAF700 D283DBF7 AA2DB00A 79D2080E 750AF983 1374C00A 93FC071E ..■..ât..'.u..@y.¯-`%Ü.@.%Ö.%.3@ 000000
86AC4F05 88E275C3 0BC288AA 27040276 393C3004 D38792F1 F793F1F7 0274C00B .ât.%b.%b..Æ.0<9v..'`.ô.ûuã..O`. 000020
46891722 8B560000 06C800CB 5DE58B5E 5F1F58DA 8CF272C7 3B014480 FF448805 ..D.;.D.;ùr·.ÖX._^.[]ù.à...V¦"..F 000040
46017440 04C48315 F019BE9A 53060E74 830A47F6 26FA5EC4 1CEBF62B FC5E8CFA '.^■+-Š.á^'&-G.¯t..S./.Þ..á.@t.F 000060
04740808 065E88EC 885590CB C95EC68B D876FA46 39291216 8B2910A1 0CFA4683 .F'.À.)...)9F'vÄ.ó^èù.U.š.^..Üt. 000080
33057501 76E80005 88071E29 75003F83 283A8857 56EC8855 CB50E588 01FE4F80 .O±..[]ùU.šVWE:+.7.u)..|..Òv.u.3 0000A0
4E882B40 3689FFFE FE44C704 C6830001 04C7962B 3CA3283A A3FE2440 24EB99C0 â.Š$@$±Ê:+Ê<+.ú....ó.úO±±..6@+.N 0000C0
FC027788 F273EEF9 83FEE180 FA744100 D0E9CB5D E5885E5F 0009E8C0 8ED88C06 ..Ä.àÒ.._^.[]ùÖÅ.At'.Ä±.'Ys·.w.■ 0000E0
E8FE4489 F78B0002 05C20335 7401A8AD F003D088 1573C138 48437401 A8FE8BAD Ù.±´.tCH;ês..Å.ÞÙ´.tS.ô....%.D±Š 000100
74D13B12 F6B9DA8C C68BFE4C FEF90305 EB058948 C12BFE4C 89F9030C 74FE8BE6 l.±t..'.L±+êH..Š..'±L±.ó.Ö¿-.;ìt 000120
FE88F274 01A8ADF0 03FE8B25 74FFFE3D 022B4C06 C626C302 7F892B48 1E8C2605 .&..H+...ü&ó.L+.=±.t%.±.ÞÙ´.t·.± 000140
74C00808 4788E6EB FE4489F7 88000205 C203E274 01A8ADF0 03D08B8C 73C13B48 H;ês¥.Å.ÞÙ´.tã.ô....%.D±Š].G..ât 000160
77888BEB 37882B44 1E8E2605 74C73817 BBBFD88C 12742B4C 0EFE2615 EBD88E04 ..ÄŠ.&±.L+t..Ä¢E.;út.&..D+.7ŠE.w 000180
EB4E4E96 0574001D E8FE4DFE 0D74005F E8984040 01240074 C638006B E8C03306 .3àÒk.;ót.$.@@.Ò_.t.±M±Ò..t..NNŠ 0001A0
28037401 A8FE4588 51C399C0 33024789 07882B48 A3260474 C138180F B9D88C98 ..Ä¿..;êt.&ÈH+..¯G.3à.ûQ.E±´.t.+ 0001C0
C22302F7 0D72C203 1572C603 C188F575 EAD10476 2B4A163B 267FFFBA 414149C8 à|AA¤..&;.J+v.ìõu%.è.ór..ôr.%@#ô 0001E0
```

Dump of file SATURN:[PCCOMMON.DUMP.DLL]SADADESK.TMP;1 on 18-APR-1990 10:51:54.61
File ID (902,31,0)   End of file block 102 / Allocated 104

Virtual block number 68 (00000044), 512 (0200) bytes

```
C7F203F0 8BFE8B57 1874001D E85152C3 59C033E5 75EAD1D2 F7087500 0CE8C62B +6Ò..u.%@ìõu[3àYûRQÒ..t.W.±.Þ.·ú 000000
06500001 B8505252 1ED23350 53C35A59 58FE5589 4AD72BD6 88067789 FFFEFE44 D±±..W..■+■J.U±XYZûSP3@.RRP¦..P. 000020
3875000A 7E830657 56EC8855 C3D20802 74585A1F FFFA8308 C48316F7 18D49A1F ..å.%..á..'..Z[t..@ûU.šVW..-..uß 000040
44880074 F73B1174 4816EE36 884CEB27 720057E8 07754806 46880856 8812EEBF «Ÿ..V..F.Hu.ÒW.r'ŠL.6Ÿ.Ht.;%t..D 000060
885021EB 99FFFF88 0675D20B 047316EE FE8104C6 8334735E 003EE856 0E468902 ..F.VÒ>.^s4.ó..±Ÿ.s..@u.|...ŠIP. 000080
07C03303 8816EE36 89025C89 1489E675 C085F95B 0000FFFF 9A50C033 501652C4 áR.P3âP.....['.âu]...\..6Ÿ..Æ3à. 0000A0
1C03DA88 2CEBF9F2 7516EEFE 8104C683 0C74024C 39F7880E 4E88CB5D E5885E5F _^.[]ù.N..%9L.t..ó..±Ÿ.u·'Š,.Ö.. 0000C0
890475F7 38DE75C0 850000FF FF9A5153 137312E8 1E390675 F738C18E D3882672 F&.Æ.è;%u.9.Ò.s.SQ......âuß;%u.. 0000E0
88E3F706 46880875 0A5E8808 0B0C5E88 084688EC 885500C3 D1880487 9212E816 .Ò.....ìû.U.š.F..^..Ä.^.u..F.%D. 000100
04C80008 CA5DE588 D103E3F7 064688C8 030C66F7 064688C8 88E3F700 08CA5DE5 []ò..%D.à.F.%f..à.F.%D.].[]ò..à. 000120
89991722 2DC38815 75080A47 F6265575 023C0324 0A478A26 065EC4F6 28560000 ..V+-6^.&.G.$.<.uU&-G..u..û-"..¿ 000140
50287EC0 0BFC4689 06472B26 07882606 5E883974 01231687 F6060868 F9F7000C ..%'kÄ.-..#.t9.^.&..&+G..F■.â-(P 000160
26065EC4 0874FC46 3808C483 18C41098 9A50E42A 08478A26 0677FF26 0877FF26 &.w.&.w.&.G.*óP...6..6.;F■t.6^.& 000180
88000004 47C72602 57892607 89260857 88260647 8826065E C4FFFFBE 200A4F80 .O. ƒ..6^.&.G.&.W.&..&.W.&úG.... 0001A0
01030393 000111E4 02030007 0002130A 01030005 00021342 0103000C CBC95EC6 6^èù....B................ô....... 0001C0
01050000 00101844 00020000 000E1A12 00020026 00021973 01030022 00021928 (..."...s...&...........D....... 0001E0
```

Dump of file SATURN:[PCCOMMON.DUMP.DLL]SADADESK.TMP;1 on 18-APR-1990 10:51:54.61
File ID (902,31,0)   End of file block 102 / Allocated 104

Virtual block number 69 (00000045), 512 (0200) bytes

```
01030058 00020ED0 0103004D 0002128C 0103003A 000210C4 01030088 000202A5 E.......6...:.......M...Å...[... 000000
54206E75 5220534D 00000000 00000000 00000000 00000000 0000005C 00020E8D §...\...................MS Run-T 000020
38383931 20296328 20746867 69727970 6F43202D 20797261 7262694C 20656069 ime Library - Copyright (c) 1988 000040
50005C00 68736544 2041442F 41530011 70726F43 2074666F 736F7263 694D202C , Microsoft Corp..SA/DA Desk.\.P 000060
7275702E 6E616068 6361625C 656C6966 6F727000 5255502E 005C454C 49464F52 ROFILE\..PUR.profile\bachman.pur 000080
70207265 73752074 6C756166 65642064 616F6C20 74276E61 4300524F 52524500 .ERROR.Can't load default user p 0000A0
4F525245 00727070 2E6E616D 68636162 5C656C69 666F7270 002E656C 69666F72 rofile..profile\bachman.ppr.ERRO 0000C0
6F727020 7265746E 69727020 746C7561 66656420 64616F6C 2074276E 61430052 R.Can't load default printer pro 0000E0
00524F52 5245006D 70702E6E 616D6863 61625C65 6C69666F 7270002E 656C6966 file..profile\bachman.ppm.ERROR. 000100
6C65646F 6D207373 65636F72 7020746C 75616665 64206461 6F6C2074 276E6143 Can't load default process model 000120
5245006D 64702E6E 616D6863 61625C65 6C69666F 7270002E 656C6966 6F727020  profile..profile\bachman.pdm.ER 000140
65646F6D 20617461 6420746C 75616665 64206461 6F6C2074 276E6143 00524F52 ROR.Can't load default data mode 000160
00003264 702E6E61 6D686361 625C656C 69666F72 70002E65 6C69666F 7270206C l profile..profile\bachman.pd2.. 000180
2A2E2A00 3242442E 2A004E41 2E2A0053 4E474953 45440000 6B736564 00732500 .%s.desk..DESIGNS.*.AN.*.DB2.*.* 0001A0
01A40000 0001001F 00000000 00687365 64007325 006C6564 6F6D2065 76615300 .Save model.%s.desk...........È. 0001C0
01A50000 0011FFFF 01A501A4 0002001F 00000000 00000000 01A40000 0011FFFF ......È.............È.È.......È. 0001E0
```

```
Dump of file SATURN:[PCCOMMON.DUMP.DLL]SADADESK.TMP;1 on 18-APR-1990 10:51:54.61
File ID (902,31,0)   End of file block 102 / Allocated 104

Virtual block number 70 (00000046), 512 (0200) bytes

 00000000 00000000 01A60000 0001FFFF 000001A5 0003001F 00000000 00000000 ............Ê.........Î......... 000000
 000001A4 0005001F 00000000 00000000 01A70000 0001FFFF 000001A5 00040001 ....Ê.........Ï.............Ê... 000020
 00000000 0004FFFF 000001A4 0000001F 00000000 00000000 01A80000 0001FFFF ......´.............Ê........... 000040
 00000000 00000000 01AA0000 0001FFFF 000001A4 0006001F 00000000 00000000 ............Ê.........ˆ......... 000060
 000001A4 00080001 00000000 00000000 01AB0000 0001FFFF 000001A4 0007001F ....Ê.........¨.............Ê... 000080
 00000000 0004FFFF 000001A4 0000001F 00000000 00000000 01AC0000 0001FFFF ......˜.............Ê........... 0000A0
 00000000 00000000 01AE0000 0001FFFF 000001A4 00090001 00000000 00000000 ............Ê.........Û......... 0000C0
 000001AF 0008001F 00000000 00000000 01AF0000 0011FFFF 01AF01A4 000A001F ....Ê.Ê.......Ê.............Ê... 0000E0
 01B10000 0001FFFF 000001AF 000C0001 00000000 00000000 01B00000 0001FFFF ......¯.............Ê.........Ý. 000100
 00000000 00000000 01B20000 0001FFFF 000001AF 000D001F 00000000 00000000 ............Ê.........ý......... 000120
 000001B3 000F001F 00000000 00000000 01B30000 0011FFFF 01B301A4 000E001F ....Ê.°.......°.............°... 000140
 01B50000 0001FFFF 000001B3 0010001F 00000000 00000000 01B40000 0001FFFF ......Ç.............°.........ç. 000160
 00000000 00000000 01B60000 0001FFFF 000001A4 0011001F 00000000 00000000 ............Ê.........Ñ......... 000180
 000001A4 0012001F 00000000 00000000 00000000 0004FFFF 000001A4 0000001F ....Ê.......................Ê... 0001A0
 01B90000 0001FFFF 000001A4 00130001 00000000 00000000 01B80000 0001FFFF ......¡.............Ê.........¿. 0001C0
 00000000 00000000 00000000 0004FFFF 000001A4 0000001F 00000000 00000000 ............Ê................... 0001E0

Dump of file SATURN:[PCCOMMON.DUMP.DLL]SADADESK.TMP;1 on 18-APR-1990 10:51:54.61
File ID (902,31,0)   End of file block 102 / Allocated 104

Virtual block number 71 (00000047), 512 (0200) bytes

 01BC0000 0015001F 00000000 00000000 01BB0000 0001FFFF 000001A4 0014001F ....£.........£...............¥. 000000
 01BD0000 0001FFFF 000001BC 0016001F 00000000 00000000 01BC0000 0011FFFF ......¥.............¥.........§. 000020
 00000000 00000000 00000000 0004FFFF 000001BC 0000001F 00000000 00000000 ............¥................... 000040
 000001BC 00180000 00000000 00000000 01BF0000 0001FFFF 000001BC 00170000 ....¥.........«.............¥... 000060
 01C10000 0001FFFF 000001BC 00190000 00000000 00000000 01C00000 0001FFFF ......à.............¥.........è. 000080
 00000000 00000000 01C20000 0001FFFF 000001BC 001A0000 00000000 00000000 ............¥.........ò......... 0000A0
 000001BC 001B001F 00000000 00000000 00000000 0004FFFF 000001BC 00000000 ....¥.......................¥... 0000C0
 01C50000 0001FFFF 000001BC 001C0001 00000000 00000000 01C40000 0001FFFF ......á.............¥.........é. 0000E0
 00000000 00000000 01C60000 0001FFFF 000001BC 001D0001 00000000 00000000 ............¥.........ó......... 000100
 000001BC 00000001 00000000 00000000 01C70000 0001FFFF 000001BC 001E001F ....¥.........ú.............¥... 000120
 01C90000 0001FFFF 000001BC 001F0001 00000000 00000000 00000000 0004FFFF ....................¥.........è. 000140
 00000000 00000000 01CA0000 0001FFFF 000001BC 00200001 00000000 00000000 .......... .¥.........ò.......... 000160
 01CC01BC 00210001 00000000 00000000 00000000 0004FFFF 000001BC 00000001 ....¥.......................!.¥.ä. 000180
 01CD0000 0011FFFF 01CD01CC 0022001F 00000000 00000000 01CC0000 0011FFFF ......ä...........".ä.ë.......ë. 0001A0
 00000000 00000000 01CE0000 0001FFFF 000001CD 0023001F 00000000 00000000 ..........#.ë.........ö......... 0001C0
 000001CD 0025001F 00000000 00000000 01CF0000 0001FFFF 000001CD 0024001F ..$.ë.........ü...........%.ë... 0001E0

Dump of file SATURN:[PCCOMMON.DUMP.DLL]SADADESK.TMP;1 on 18-APR-1990 10:51:54.61
File ID (902,31,0)   End of file block 102 / Allocated 104

Virtual block number 72 (00000048), 512 (0200) bytes

 01D10000 0011FFFF 01D101CC 00260001 00000000 00000000 01D00000 0001FFFF ......Å...........&.ä.Ì.......Ì. 000000
 00000000 00000000 01D20000 0001FFFF 000001D1 0027001F 00000000 00000000 ..........'.Ì.........Ì......... 000020
 000001D1 0029001F 00000000 00000000 01D30000 0001FFFF 000001D1 0028001F ..(.Ì.........Æ...........).Ì... 000040
 01D50000 0001FFFF 000001D1 002A001F 00000000 00000000 01D40000 0001FFFF ......å...........*.Ì.........Í. 000060
 00000000 00000000 01D60000 0011FFFF 01D601CC 002B0001 00000000 00000000 ..........+.ä.ø.......ø......... 000080
 000001D6 002D001F 00000000 00000000 01D70000 0001FFFF 000001D6 002C001F ..,.ø.........×...........-.ø... 0000A0
 01D90000 0001FFFF 000001D6 002E001F 00000000 00000000 01D80000 0001FFFF ......Ã.............ø.........Ì. 0000C0
 00000000 00000000 01DA0000 0001FFFF 000001D6 002F001F 00000000 00000000 ........../.ø.........Ö.. ...... 0000E0
 000001D6 0032001F 00000000 00000000 01DB0000 0001FFFF 000001D6 0030001F ..0.ø.........Ü...........`.ø... 000100
 01DC0000 0001FFFF 000001D6 0031001F 00000000 00000000 01D00000 0001FFFF ......Ì...........1.ø.........É. 000120
 00000000 00000000 01DF0000 0001FFFF 000001D6 0034001F 00000000 00000000 ..........4.ø.........Ö......... 000140
 01E001CC 0035001F 00000000 00000000 01DE0000 0001FFFF 000001D6 0033001F ..3.ø.........ß...........5.ä.À. 000160
 01E10000 0001FFFF 000001E0 0036001F 00000000 00000000 01E00000 0011FFFF ......Á...........6.À.........À. 000180
 00000000 00000000 01E20000 0001FFFF 000001E0 0037001F 00000000 00000000 ..........7.À.........â......... 0001A0
 000001E0 0039001F 00000000 00000000 01E30000 0001FFFF 000001E0 0038001F ..8.À.........D...........9.À... 0001C0
 01E50000 0001FFFF 000001E0 003A001F 00000000 00000000 01E40000 0001FFFF ......ô...........:.À.........Í. 0001E0
```

```
Dump of file SATURN:[PCCOMMON.DUMP.DLL]SADADESK.TMP;1 on 18-APR-1990 10:51:54.61
File ID (902,31,0)   End of file block 102 / Allocated 104

Virtual block number 73 (00000049), 512 (0200) bytes

 00000000 00000000 01E60000 0011FFFF 01E60000 003C001F 00000000 00000000 ..........<...Ì.......Ì......... 000000
 000001E6 003E001F 00000000 00000000 01E70000 0001FFFF 000001E6 003D001F ..=.Ì.........Ó...........>.Ì... 000020
 01E90000 0011FFFF 01E90000 0046001F 00000000 00000000 01E80000 0001FFFF ......Ò...........F...Õ.......Õ. 000040
 00000000 00000000 01EA0000 0011FFFF 01EA01E9 0047001F 00000000 00000000 ..........G.Õ.õ.......õ......... 000060
 000001EA 00490001 00000000 00000000 01EB0000 0001FFFF 000001EA 00480001 ..H.õ.........Š...........I.õ... 000080
 01ED0000 0001FFFF 000001EA 004A001E 00000000 00000000 01EC0000 0001FFFF ......š...........J.õ.........Ú. 0000A0
 00000000 00000000 00000000 0004FFFF 000001EA 0000001E 00000000 00000000 ............õ................... 0000C0
 000001EA 004C001C 00000000 00000000 01EF0000 0001FFFF 000001EA 004B001C ..K.õ.........ÿ...........L.õ... 0000E0
 01F10000 0001FFFF 000001EA 004D001E 00000000 00000000 01F00000 0001FFFF ......Þ...........M.õ.........þ. 000100
 00000000 00000000 00000000 0004FFFF 000001E9 00000007 00000000 00000000 ............Õ................... 000120
 000001E9 004F0007 00000000 00000000 01F30000 0001FFFF 000001E9 004E0007 ..N.Õ.........µ...........O.Õ... 000140
 01F50000 0001FFFF 000001E9 00500007 00000000 00000000 01F40000 0001FFFF ......¶...........P.Õ.........¥. 000160
 00000000 00000000 01F60000 0001FFFF 000001E9 0051000C 00000000 00000000 ..........Q.Õ.........-......... 000180
 000001E9 0000001F 00000000 00000000 01F70000 0001FFFF 000001E9 00520000 ..R.Õ.........¥.............Õ... 0001A0
 01F90000 0001FFFF 000001E9 00530001 00000000 00000000 00000000 0004FFFF ......,...........S.Õ.........'. 0001C0
 00000000 00000000 00000000 0004FFFF 000001E9 00000001 00000000 00000000 ............Õ................... 0001E0

Dump of file SATURN:[PCCOMMON.DUMP.DLL]SADADESK.TMP;1 on 18-APR-1990 10:51:54.61
File ID (902,31,0)   End of file block 102 / Allocated 104

Virtual block number 74 (0000004A), 512 (0200) bytes

 000001E9 0055001F 00000000 00000000 01FB0000 0001FFFF 000001E9 0054001F ..T.Õ.........«.............!.Õ... 000000
 00000000 0004FFFF 000001E9 0000001F 00000000 00000000 01FC0000 0001FFFF ......■.............Õ...... .... 000020
 00000000 00000000 01FE0000 0011FFFF 01FE01E9 0056001F 00000000 00000000 ..........V.Õ.±.......±.....  .. 000040
 000001FE 0058001F 00000000 00000000 01FF0000 0001FFFF 000001FE 0057001F ..W.±.....................X.±... 000060
 02010000 0001FFFF 000001FE 0059001F 00000000 00000000 02000000 0001FFFF ..................Y.±........... 000080
 00000000 00000000 02020000 0001FFFF 000001FE 005A001F 00000000 00000000 ..........Z.±................... 0000A0
 000001FE 005C001F 00000000 00000000 02030000 0001FFFF 000001FE 005B001F ..[.±.....................\.±... 0000C0
 02050000 0001FFFF 000001FE 005D001F 00000000 00000000 02040000 0001FFFF ..................].±........... 0000E0
 00000000 00000000 02060000 0001FFFF 000001FE 005E001F 00000000 00000000 ..........^.±................... 000100
 02080000 0064001F 00000000 00000000 02070000 0001FFFF 000001E9 005F001F .._.Õ.....................d..... 000120
 02090000 0001FFFF 00000208 00650001 00000000 00000000 02080000 0011FFFF ..................e............. 000140
 00000000 00000000 020A0000 0001FFFF 00000208 00660001 00000000 00000000 ..........f..................... 000160
 00000208 00680001 00000000 00000000 020B0000 0001FFFF 00000208 00670001 ..g.......................h..... 000180
 00000000 0004FFFF 00000208 00000001 00000000 00000000 020C0000 0001FFFF ................................ 0001A0
 00000000 00000000 020E0000 0001FFFF 00000208 00690002 00000000 00000000 ..........i..................... 0001C0
 02100000 006E001F 00000000 00000000 020F0000 0001FFFF 00000208 006A0001 ..j.......................n..... 0001E0

Dump of file SATURN:[PCCOMMON.DUMP.DLL]SADADESK.TMP;1 on 18-APR-1990 10:51:54.61
File ID (902,31,0)   End of file block 102 / Allocated 104

Virtual block number 75 (0000004B), 512 (0200) bytes

 02110000 0001FFFF 00000210 006F001E 00000000 00000000 02100000 0011FFFF ..................o............. 000000
 00000000 00000000 02120000 0001FFFF 00000210 0070001E 00000000 00000000 ..........p..................... 000020
 00000210 00720001 00000000 00000000 02130000 0001FFFF 00000210 00710001 ..q.......................r..... 000040
 02150000 0011FFFF 02150210 0073001F 00000000 00000000 02140000 0001FFFF ..................s............. 000060
 00000000 00000000 02160000 0001FFFF 00000215 0074001F 00000000 00000000 ..........t..................... 000080
 00000210 0000001F 00000000 00000000 02170000 0001FFFF 00000215 0075001F ..u............................. 0000A0
 02190000 0001FFFF 00000210 0076001F 00000000 00000000 00000000 0004FFFF ..................v............. 0000C0
 00000000 00000000 021A0000 0001FFFF 00000210 0077001F 00000000 00000000 ..........w..................... 0000E0
 00000210 00790002 00000000 00000000 02180000 0001FFFF 00000210 00780002 ..x.......................y..... 000100
 021D0000 0001FFFF 00000210 007A0001 00000000 00000000 021C0000 0001FFFF ..................z............. 000120
 00000000 00000000 021E0000 0001FFFF 00000210 007B0001 00000000 00000000 ..........(..................... 000140
 02200210 007C001F 00000000 00000000 00000000 0004FFFF 00000210 0000001F ..........................|... . 000160
 02210000 0001FFFF 00000220 007D001F 00000000 00000000 02200000 0011FFFF ..... ............). .........!. 000180
 00000000 00000000 02220000 0001FFFF 00000220 007E001F 00000000 00000000 ..........~. ........"......... 0001A0
 00000223 0083001F 00000000 00000000 02230000 0011FFFF 02230000 0082001F ......#.......#.............#... 0001C0
 02250000 0001FFFF 00000223 0084001F 00000000 00000000 02240000 0001FFFF ......$.............#.........%. 0001E0
```

```
Dump of file SATURN:[PCCOMMON.DUMP.DLL]SADADESK.TMP;1 on 18-APR-1990 10:51:54.61
File ID (902,31,0)   End of file block 102 / Allocated 104

Virtual block number 76 (0000004C), 512 (0200) bytes

00000000 00000000 02260000 0001FFFF 00000223 0085001F 00000000 00000000 ............#.........&......... 000000
00000223 00870001 00000000 00000000 02270000 0001FFFF 00000223 0086001F ....#.........'.............#... 000020
00000000 0004FFFF 00000223 00000001 00000000 00000000 02280000 0001FFFF ......(.............#........... 000040
00000000 00000000 022A0000 0001FFFF 00000223 00880001 00000000 00000000 ............#.........*......... 000060
00000223 008A0001 00000000 00000000 022B0000 0001FFFF 00000223 00890001 ....#.........+.............#... 000080
022D0000 0011FFFF 022D0000 0096001F 00000000 00000000 022C0000 0001FFFF ......,...................-....-. 0000A0
00000000 00000000 022E0000 0001FFFF 0000022D 00970001 00000000 00000000 ......................-......... 0000C0
0000022D 0099001F 00000000 00000000 022F0000 0001FFFF 0000022D 00980001 ....-........./..............-... 0000E0
02310000 0011FFFF 02310000 00A0001F 00000000 00000000 02300000 0001FFFF ......0...............1.......1. 000100
00000000 00000000 02320000 0001FFFF 00000231 00A1001F 00000000 00000000 ..........À.1.........2......... 000120
00000231 00A3001F 00000000 00000000 02330000 0001FFFF 00000231 00A2001F ..À.1.........3...........È.1... 000140
02350000 0001FFFF 00000231 00A4001F 00000000 00000000 02340000 0001FFFF ......4...........È.1.... ...5. 000160
00000000 00000000 02360000 0001FFFF 00000231 00A5001F 00000000 00000000 ..........È.1.........6....  ... 000180
00534E47 49534544 00000000 00000000 02370000 0001FFFF 00000231 00A6001F ..Ì.1.........7.........DESIGNS. 0001A0
6E6F6973 6E657478 65206C61 67656C6C 49002A2E 2A006C65 646F6020 6E65704F Open model.*.*.Illegal extension 0001C0
69662067 6E697473 69786520 6E612065 736F6F68 63207473 756D2075 6F59002E ..You must choose an existing fi 0001E0

Dump of file SATURN:[PCCOMMON.DUMP.DLL]SADADESK.TMP;1 on 18-APR-1990 10:51:54.61
File ID (902,31,0)   End of file block 102 / Allocated 104

Virtual block number 77 (0000004D), 512 (0200) bytes

73736563 6F727020 6F4E002E 6574656C 6564206F 7420676E 6968746F 4E00656C le.Nothing to delete..No process 000000
6461206F 7420676E 6968746F 4E000000 6574656C 6564206F 74206C65 646F6D20  model to delete...Nothing to ad 000020
4900656C 69662067 6E697473 69784500 00005C00 534E4749 53454400 00002E64 d....DESIGNS.\...Existing file.I 000040
6F6D2061 74616420 6C616765 6C6C4900 656D616E 20656C69 66206C61 67656C6C llegal file name.Illegal data mo 000060
6E206C65 646F6D20 73736563 6F727020 6C616765 6C6C4900 656D616E 206C6564 del name.Illegal process model n 000080
726C6120 6C65646F 4D00656D 616E206C 65646F6D 206C6167 656C6C49 00656D61 ame.Illegal model name.Model alr 0000A0
7361656C 50006E67 69736564 20324244 2077654E 00737473 69786520 79646165 eady exists.New DB2 design.Pleas 0000C0
44207765 4E002E65 6D616E20 6E676973 65642065 6874206E 69206C6C 69662065 e fill in the design name..New D 0000E0
2E737473 69786520 79646165 72606120 6E676973 6544006E 67697365 64203242 B2 design.Design already exists. 000100
20676E69 76615300 6C65646F 6D20676E 69766153 00005C00 534E4749 53454400 .DESIGNS.\..Saving model.Saving  000120
646F6D20 676E696D 616E6552 00656D61 6E207765 6E206874 6977206C 65646F6D model with new name.Renaming mod 000140
474F4C52 00474F4C 4F444E55 57454956 4C4D4400 57454956 474F4C55 00006C65 el..ULOGVIEW.DMLVIEWUNDOLOG.RLOG 000160
43454843 004E494B 43454843 00474F4C 4F444552 57454956 4C4D4400 57454956 VIEW.DMLVIEWREDOLOG.CHECKIN.CHEC 000180
57474F4C 00454C47 474F5447 4F4C0047 4F4C0045 53414241 5441444F 544E494B KINTODATABASE.LOG.LOGTOGGLE.LOGW 0001A0
004F5250 00000000 00000000 00000000 6B736564 00006B73 65640000 45544952 RITE..desk..desk............PRO. 0001C0
20000000 4E454552 4353544E 49525053 43480053 43480000 54524154 534F5250 PROSTART..HCS.HCSPRINTSCREEN...  0001E0

Dump of file SATURN:[PCCOMMON.DUMP.DLL]SADADESK.TMP;1 on 18-APR-1990 10:51:54.61
File ID (902,31,0)   End of file block 102 / Allocated 104

Virtual block number 78 (0000004E), 512 (0200) bytes

48202020 20202020 20202020 20202020 20202028 28282828 20202020 20202020         (((((               H 000000
10101010 10101084 84848484 84848484 84101010 10101010 10101010 10101010 ................................ 000020
10101010 10100101 01010101 01010101 01010101 01010101 01018181 81818181 ................................ 000040
00201010 10100202 02020202 02020202 02020202 02020202 02028282 82828282 ............................... . 000060
00000000 00000000 00000000 00000000 00000000 00000000 00000000 00000000 ................................ 000080
00000000 00000000 00000000 00000000 00000000 00000000 00000000 00000000 ................................ 0000A0
00000000 00000000 00000000 00000000 00000000 00000000 00000000 00000000 ................................ 0000C0
00000000 00000000 00000000 00000000 00000000 00000000 00000000 00000000 ................................ 0000E0
2DE01325 2DE02DE0 00000000 00002320 20280029 6C6C756E 2800296C 6C756E28 (null).(null).+- #......À-À-%.À- 000100
00000000 00000000 00000000 00000000 00000000 00000000 00000000 00002B68 h+.............................. 000120
00000000 00000000 00000000 00000000 00000000 00000000 00000000 00000000 ................................ 000140
00000000 00000000 00000000 00000000 00000000 00000000 00000000 00000000 ................................ 000160
00000000 00000000 00000000 00000000 00000000 00000000 00000000 00000000 ................................ 000180
00000000 00000000 00000000 00000000 00000000 00000000 00000000 00000000 ................................ 0001A0
00000000 00000000 00000000 00000000 00000000 00000000 00000000 00000000 ................................ 0001C0
00000000 00000000 00000000 00000000 00000000 00000000 00000000 00000000 ................................ 0001E0
```

```
Dump of file SATURN:[PCCOMMON.DUMP.DLL]SADADESK.TMP;1 on 18-APR-1990 10:51:54.61
File ID (902,31,0)   End of file block 102 / Allocated 104

Virtual block number 79 (0000004F), 512 (0200) bytes

00000000 00000000 00000000 00000000 00000000 00000000 00000000 00000000 ................................ 000000
00000000 00000000 00000000 00000000 00000000 00000000 00000000 00000000 ................................ 000020
00000000 00000000 00000000 00000000 00000000 00000000 00000000 00000000 ................................ 000040
00000000 00000000 00000000 00000000 00000000 00000000 00000000 00000000 ................................ 000060
00000000 00000000 00000000 00000000 00000000 00000000 00000000 00000000 ................................ 000080
00000000 00000000 00000000 00000000 00000000 00000000 00000000 00000000 ................................ 0000A0
00000000 00000000 00000000 00000000 00000000 00000000 00000000 00000000 ................................ 0000C0
00000000 00000000 00000000 00000000 00000000 00000000 00000000 00000000 ................................ 0000E0
00000000 00000000 00000000 00000000 00000000 00000000 00000000 00000000 ................................ 000100
00000000 00000000 00000000 00000000 00000000 00000000 00000000 00000000 ................................ 000120
00000000 00000000 00000000 00000000 00000000 00000000 00000000 00000000 ................................ 000140
00000000 00000000 00000000 00000000 00000000 00000000 00000000 00000000 ................................ 000160
00000000 00000000 00000000 00000000 00000000 00000000 00000000 00000000 ................................ 000180
00000000 00000000 00000000 00000000 00000000 00000000 00000000 00000000 ................................ 0001A0
00000000 00000000 00000000 00000000 00000000 00000000 00000000 00000000 ................................ 0001C0
00000000 00000000 00000000 00000000 00000000 00000000 00000000 00000000 ................................ 0001E0

Dump of file SATURN:[PCCOMMON.DUMP.DLL]SADADESK.TMP;1 on 18-APR-1990 10:51:54.61
File ID (902,31,0)   End of file block 102 / Allocated 104

Virtual block number 80 (00000050), 512 (0200) bytes

00000000 00000000 00000000 00000000 00000000 00000000 00000000 00000000 ................................ 000000
00000000 00000000 00000000 00000000 00000000 00000000 00000000 00000000 ................................ 000020
00000000 00000000 00000000 00000000 00000000 00000000 00000000 00000000 ................................ 000040
00000000 00000000 00000000 00000000 00000000 00000000 00000000 00000000 ................................ 000060
00000000 00000000 00000000 00000000 00000000 00000000 00000000 00000000 ................................ 000080
00000000 00000000 00000000 00000000 00000000 00000000 00000000 00000000 ................................ 0000A0
00000000 00000000 00000000 00000000 00000000 00000000 00000000 00000000 ................................ 0000C0
12EE0000 00000000 00000000 00000000 00000000 00000000 00000000 00000000 ................................ 0000E0
14701708 14701704 1470FFFF 14700000 00000030 4F464E49 5F454C49 465F435F ..............................Ÿ. 000100
00000001 28660000 0000172A 00000200 FFFFFFFF 01010000 00001710 1470170C _C_FILE_INFO=.....p...p...p...p. 000120
00000000 00000000 00000202 00000000 00000000 00000102 00000000 00000000 ..p.................*.....f+.... 000140
00000000 00000000 00000000 00000000 00000000 00000000 00000000 00000000 ................................ 000160
00000000 00000000 00000000 00000000 00000000 00000000 00000000 00000000 ................................ 000180
00000000 00000000 00000000 00000000 00000000 00000000 00000000 00000000 ................................ 0001A0
00000000 00000000 00000000 00000000 00000000 00000000 00000000 00000000 ................................ 0001C0
00000000 00000000 00000000 00000000 00000000 00000000 00000000 00000000 ................................ 0001E0

Dump of file SATURN:[PCCOMMON.DUMP.DLL]SADADESK.TMP;1 on 18-APR-1990 10:51:54.61
File ID (902,31,0)   End of file block 102 / Allocated 104

Virtual block number 81 (00000051), 512 (0200) bytes

00000000 00000000 00000000 00000000 00000000 00000000 00000000 00000000 ................................ 000000
00000000 00000000 00000000 00000000 00000000 00000000 00000000 00000000 ................................ 000020
00000000 00000000 00000000 00000000 00000000 00000000 00000000 00000000 ................................ 000040
00000000 00000000 00000000 00000000 00000000 00000000 00000000 00000000 ................................ 000060
00000000 00000000 00000000 00000000 00000000 00000000 00000000 00000000 ................................ 000080
00000000 00000000 00000000 00000000 00000000 00000000 00000000 00000000 ................................ 0000A0
00000000 00000000 00000000 00000000 00000000 00000000 00000000 00000000 ................................ 0000C0
00000000 00000000 00000000 00000000 00000000 00000000 00000000 00000000 ................................ 0000E0
00000000 00000000 00000000 00000000 00000000 00000000 00000000 00000000 ................................ 000100
00000000 00000000 00000000 00000000 00000000 00000000 00000000 00000000 ................................ 000120
00000000 00000000 00000000 00000000 00000000 00000000 00000000 00000000 ................................ 000140
00000000 00000000 00000000 00000000 00000000 00000000 00000000 00000000 ................................ 000160
00000000 00000000 00000000 00000000 00000000 00000000 00000000 00000000 ................................ 000180
00000000 00000000 00000000 00000000 00000000 00000000 00000000 00000000 ................................ 0001A0
00000000 00000000 00000000 00000000 00000000 00000000 00000000 00000000 ................................ 0001C0
00000000 00000000 00000000 00000000 00000000 00000000 00000000 00000000 ................................ 0001E0
```

```
Dump of file SATURN:[PCCOMMON.DUMP.DLL]SADADESK.TMP;1 on 18-APR-1990 10:51:54.61
File ID (902,31,0)   End of file block 102 / Allocated 104

Virtual block number 82 (00000052), 512 (0200) bytes

00000000 00000000 00000000 00000000 00000000 00000000 00000000 00000000 ................................ 000000
00000000 00000000 00000000 00000000 00000000 00000000 00000000 00000000 ................................ 000020
00000000 00000000 00000000 00000000 00000000 00000000 00000000 00000000 ................................ 000040
00000000 00000000 00000000 00000000 00000000 00000000 00000000 00000000 ................................ 000060
00000000 00000000 00000000 00000000 00000000 00000000 00000000 00000000 ................................ 000080
00000000 00000000 00000000 00000000 00000000 00000000 00000000 00000000 ................................ 0000A0
00000000 00000000 00000000 00000000 00000000 00000000 00000000 00000000 ................................ 0000C0
00000000 00000000 00000000 00000000 00000000 00000000 00000000 00000000 ................................ 0000E0
00000000 00000000 00000000 00000000 00000000 00000000 00000000 00000000 ................................ 000100
00000000 00000000 00000000 00000000 00000000 00000000 00000000 00000000 ................................ 000120
00000000 00000000 00000000 00000000 00000000 00000000 00000000 00000000 ................................ 000140
00000000 00000000 00000000 00000000 00000000 00000000 00000000 00000000 ................................ 000160
00000000 00000000 00000000 00000000 00000000 00000000 00000000 00000000 ................................ 000180
00000000 00000000 00000000 00000000 00000000 00000000 00000000 00000000 ................................ 0001A0
00000000 00000000 00000000 00000000 00000000 00000000 00000000 00000000 ................................ 0001C0
00000000 00000000 00000000 00000000 00000000 00000000 00000000 00000000 ................................ 0001E0

Dump of file SATURN:[PCCOMMON.DUMP.DLL]SADADESK.TMP;1 on 18-APR-1990 10:51:54.61
File ID (902,31,0)   End of file block 102 / Allocated 104

Virtual block number 83 (00000053), 512 (0200) bytes

00000000 00000000 00000000 00000000 00000000 00000000 00000000 00000000 ................................ 000000
00000000 00000000 00000000 00000000 00000000 00000000 00000000 00000000 ................................ 000020
00000000 00000000 00000000 00000000 00000000 00000000 00000000 00000000 ................................ 000040
00000000 00000000 00000000 00000000 00000000 00000000 00000000 00000000 ................................ 000060
00000000 00000000 00000000 00000000 00000000 00000000 00000000 00000000 ................................ 000080
00000000 00000000 00000000 00000000 00000000 00000000 00000000 00000000 ................................ 0000A0
00000000 00000000 00000000 00000000 00000000 00000000 00000000 00000000 ................................ 0000C0
00000000 00000000 00000000 00000000 00000000 00000000 00000000 00000000 ................................ 0000E0
00000000 00000000 00000000 00000000 00000000 00000000 00000000 00000000 ................................ 000100
00000000 00000000 00000000 00000000 00000000 00000000 00000000 00000000 ................................ 000120
00000000 00000000 00000000 00000000 00000000 00000000 00000000 00000000 ................................ 000140
00000000 00000000 00000000 00000000 00000000 00000000 00000000 00000000 ................................ 000160
00000000 00000000 00000000 00000000 00000000 00000000 00000000 00000000 ................................ 000180
00000000 00000000 00000000 00000000 00000000 00000000 00000000 00000000 ................................ 0001A0
00000000 00000000 00000000 00000000 00000000 00000000 00000000 00000000 ................................ 0001C0
00000000 00000000 00000000 00000000 00000000 00000000 00000000 00000000 ................................ 0001E0

Dump of file SATURN:[PCCOMMON.DUMP.DLL]SADADESK.TMP;1 on 18-APR-1990 10:51:54.61
File ID (902,31,0)   End of file block 102 / Allocated 104

Virtual block number 84 (00000054), 512 (0200) bytes

00000000 00000000 00000000 00000000 00000000 00000000 00000000 00000000 ................................ 000000
00000000 00000000 00000000 00000000 00000000 00000000 00000000 00000000 ................................ 000020
00000000 00000000 00000000 00000000 00000000 00000000 00000000 00000000 ................................ 000040
00000000 00000000 00000000 00000000 00000000 00000000 00000000 00000000 ................................ 000060
00000000 00000000 00000000 00000000 00000000 00000000 00000000 00000000 ................................ 000080
00000000 00000000 00000000 00000000 00000000 00000000 00000000 00000000 ................................ 0000A0
00000000 00000000 00000000 00000000 00000000 00000000 00000000 00000000 ................................ 0000C0
00000000 00000000 00000000 00000000 00000000 00000000 00000000 00000000 ................................ 0000E0
00000000 00000000 00000000 00000000 00000000 00000000 00000000 00000000 ................................ 000100
00000000 00000000 00000000 00000000 00000000 00000000 00000000 00000000 ................................ 000120
00000000 00000000 00000000 00000000 00000000 00000000 00000000 00000000 ................................ 000140
00000000 00000000 00000000 00000000 00000000 00000000 00000000 00000000 ................................ 000160
00000000 00000000 00000000 00000000 00000000 00000000 00000000 00000000 ................................ 000180
00000000 00000000 00000000 00000000 00000000 00000000 00000000 00000000 ................................ 0001A0
00000000 00000000 00000000 00000000 00000000 00000000 00000000 00000000 ................................ 0001C0
00000000 00000000 00000000 00000000 00000000 00000000 00000000 00000000 ................................ 0001E0
```

```
Dump of file SATURN:[PCCOMMON.DUMP.DLL]SADADESK.TMP;1 on 18-APR-1990 10:51:54.61
File ID (902,31,0)    End of file block 102 / Allocated 104

Virtual block number 85 (00000055), 512 (0200) bytes

00000000 00000000 00000000 00000000 00000000 00000000 00000000 00000000 ................................ 000000
00000000 00000000 00000000 00000000 00000000 00000000 00000000 00000000 ................................ 000020
00000000 00000000 00000000 00000000 00000000 00000000 00000000 00000000 ................................ 000040
00000000 00000000 00000000 00000000 00000000 00000000 00000000 00000000 ................................ 000060
00000000 00000000 00000000 00000000 00000000 00000000 00000000 00000000 ................................ 000080
00000000 00000000 00000000 00000000 00000000 00000000 00000000 00000000 ................................ 0000A0
00000000 00000000 00000000 00000000 00000000 00000000 00000000 00000000 ................................ 0000C0
00000000 00000000 00000000 00000000 00000000 00000000 00000000 00000000 ................................ 0000E0
00000000 00000000 00000000 00000000 00000000 00000000 00000000 00000000 ................................ 000100
00000000 00000000 00000000 00000000 00000000 00000000 00000000 00000000 ................................ 000120
00000000 00000000 00000000 00000000 00000000 00000000 00000000 00000000 ................................ 000140
00000000 00000000 00000000 00000000 00000000 00000000 00000000 00000000 ................................ 000160
00000000 00000000 00000000 00000000 00000000 00000000 00000000 00000000 ................................ 000180
00000000 00000000 00000000 00000000 00000000 00000000 00000000 00000000 ................................ 0001A0
00000000 00000000 00000000 00000000 00000000 00000000 00000000 00000000 ................................ 0001C0
00000000 00000000 00000000 00000000 00000000 00000000 00000000 00000000 ................................ 0001E0

Dump of file SATURN:[PCCOMMON.DUMP.DLL]SADADESK.TMP;1 on 18-APR-1990 10:51:54.61
File ID (902,31,0)    End of file block 102 / Allocated 104

Virtual block number 86 (00000056), 512 (0200) bytes

00000000 00000000 00000000 00000000 00000000 00000000 00000000 00000000 ................................ 000000
00000000 00000000 00000000 00000000 00000000 00000000 00000000 00000000 ................................ 000020
00000000 00000000 00000000 00000000 00000000 00000000 00000000 00000000 ................................ 000040
00000000 00000000 00000000 00000000 00000000 00000000 00000000 00000000 ................................ 000060
00000000 00000000 00000000 00000000 00000000 00000000 00000000 00000000 ................................ 000080
00000000 00000000 00000000 00000000 00000000 00000000 00000000 00000000 ................................ 0000A0
00000000 00000000 00000000 00000000 00000000 00000000 00000000 00000000 ................................ 0000C0
00000000 00000000 00000000 00000000 00000000 00000000 00000000 00000000 ................................ 0000E0
00000000 00000000 00000000 00000000 00000000 00000000 00000000 00000000 ................................ 000100
00000000 00000000 00000000 00000000 00000000 00000200 00010000 00000000 ................................ 000120
00000000 00000000 00000000 00000000 00000000 00000000 00000000 00000000 ................................ 000140
00000000 00000000 00000000 00000000 00000000 00000000 00000000 00000000 ................................ 000160
00000000 00000000 00000000 00000000 00000000 00000000 00000000 00000000 ................................ 000180
00000000 00000000 00000000 00000000 00000000 00000000 00000000 00000000 ................................ 0001A0
00000000 00000000 00000000 00000000 00000000 00000000 00000000 00000000 ................................ 0001C0
00000000 00000000 00000000 00000000 00000000 00000000 00000000 00000000 ................................ 0001E0

Dump of file SATURN:[PCCOMMON.DUMP.DLL]SADADESK.TMP;1 on 18-APR-1990 10:51:54.61
File ID (902,31,0)    End of file block 102 / Allocated 104

Virtual block number 87 (00000057), 512 (0200) bytes

00000000 00000000 00000000 00000000 00000000 00000000 00000000 00000000 ................................ 000000
00000000 00000000 00000000 00000000 00000000 00000000 00000000 00000000 ................................ 000020
00000000 00000000 00000000 00000000 00000000 00000000 00000000 00000000 ................................ 000040
00000000 00000000 00000000 00000000 00000000 00000000 00000000 00000000 ................................ 000060
00000000 00000000 00000000 00000000 00000000 00000000 00000000 00000000 ................................ 000080
00000000 00000000 00000000 00000000 00000000 00000000 00000000 00000000 ................................ 0000A0
00000000 00000000 00000000 00000000 00000000 00000000 00000000 00000000 ................................ 0000C0
00000000 00000000 00000000 00000000 00000000 00000000 00000000 00000000 ................................ 0000E0
00000000 00000000 00000000 00000000 00000000 00000000 00000000 00000000 ................................ 000100
00000000 00000000 00000000 00000000 00000000 00000000 00000000 00000000 ................................ 000120
00000000 00000000 00000000 00000000 00000000 00000000 00000000 00000000 ................................ 000140
00000000 00000000 00000000 00000000 00000000 00000000 00000000 00000000 ................................ 000160
00000000 00000000 00000000 00000000 00000000 00000000 00000000 00000000 ................................ 000180
00000000 00000000 00000000 00000000 00000000 00000000 00000000 00000000 ................................ 0001A0
00000000 00000000 00000000 00000000 00000000 00000000 00000000 00000000 ................................ 0001C0
00000000 00000000 00000000 00000000 00000000 00000000 00000000 00000000 ................................ 0001E0
```

```
Dump of file SATURN:[PCCOMMON.DUMP.DLL]SADADESK.TMP;1 on 18-APR-1990 10:51:54.61
File ID (902,31,0)   End of file block 102 / Allocated 104

Virtual block number 88 (00000058), 512 (0200) bytes

00000000 00000000 00000000 00000000 00000000 00000000 00000000 00000000 ................................ 000000
00000000 00000000 00000000 00000000 00000000 00000000 00000000 00000000 ................................ 000020
00000000 00000000 00000000 00000000 00000000 00000000 00000000 00000000 ................................ 000040
00000000 00000000 00000000 00000000 00000000 00000000 00000000 00000000 ................................ 000060
00000000 00000000 00000000 00000000 00000000 00000000 00000000 00000000 ................................ 000080
00000000 00000000 00000000 00000000 00000000 00000000 00000000 00000000 ................................ 0000A0
00000000 00000000 00000000 00000000 00000000 00000000 00000000 00000000 ................................ 0000C0
00000000 00000000 00000000 00000000 00000000 00000000 00000000 00000000 ................................ 0000E0
00000000 00000000 00000000 00000000 00000000 00000000 00000000 00000000 ................................ 000100
00000000 00000000 00000000 00000000 00000000 00000000 00000000 00000000 ................................ 000120
00000000 00000000 00000000 00000000 00000000 00000000 00000000 00000000 ................................ 000140
00000000 00000000 00000000 00000000 00000000 00000000 00000000 00000000 ................................ 000160
00000000 00000000 00000000 00000000 00000000 00000000 00000000 00000000 ................................ 000180
00000000 00000000 00000000 00000000 00000000 00000000 00000000 00000000 ................................ 0001A0
00000000 00000000 00000000 00000000 00000000 00000000 00000000 00000000 ................................ 0001C0
00000000 00000000 00000000 00000000 00000000 00000000 00000000 00000000 ................................ 0001E0

Dump of file SATURN:[PCCOMMON.DUMP.DLL]SADADESK.TMP;1 on 18-APR-1990 10:51:54.61
File ID (902,31,0)   End of file block 102 / Allocated 104

Virtual block number 89 (00000059), 512 (0200) bytes

00000000 00000000 00000000 00000000 00000000 00000000 00000000 00000000 ................................ 000000
00000000 00000000 00000000 00000000 00000000 00000000 00000000 00000000 ................................ 000020
00000000 00000000 00000000 00000000 00000000 00000000 00000000 00000000 ................................ 000040
00000000 00000000 00000000 00000000 00000000 00000000 00000000 00000000 ................................ 000060
00000000 00000000 00000000 00000000 00000000 00000000 00000000 00000000 ................................ 000080
00000000 00000000 00000000 00000000 00000000 00000000 00000000 00000000 ................................ 0000A0
00000000 00000000 00000000 00000000 00000000 00000000 00000000 00000000 ................................ 0000C0
00000000 00000000 00000000 00000000 00000000 00000000 00000000 00000000 ................................ 0000E0
00000000 00000000 00000000 00000000 00000000 00000000 00000000 00000000 ................................ 000100
00000000 00000000 00000000 00000000 00000000 00000000 00000000 00000000 ................................ 000120
00000000 00008181 81010000 00010000 00000000 00000000 00000000 12F0230A .#p............................. 000140
00000000 00000000 00000000 00000000 00000000 00000000 00000000 00000000 ................................ 000160
00000000 00000000 00000000 00000000 00000000 00000000 00000000 00000000 ................................ 000180
00000000 00000000 00000000 00000000 00000000 00000000 00000000 00000000 ................................ 0001A0
00000000 00000000 00000000 00000000 00000000 00000000 00000000 00000000 ................................ 0001C0
00000000 00000000 00000000 00000000 00000000 00000000 00000000 00000000 ................................ 0001E0

Dump of file SATURN:[PCCOMMON.DUMP.DLL]SADADESK.TMP;1 on 18-APR-1990 10:51:54.61
File ID (902,31,0)   End of file block 102 / Allocated 104

Virtual block number 90 (0000005A), 512 (0200) bytes

00000000 00000000 00000000 00000000 00000000 00000000 00000000 00000000 ................................ 000000
00000000 00000000 00000000 00000000 00000000 00000000 00000000 00000000 ................................ 000020
0A0A0A0A 0A0A0A0A 0A000000 00000000 00000000 00000000 00000000 00000000 ................................ 000040
0A0A0A0A 0A0A0A0A 0A0A0A0A 0A0A0A0A 0A0A0A0A 0A0A0A0A 0A0A0A0A 0A0A0A0A ................................ 000060
0A0A0A0A 0A0A0A0A 0A0A0A0A 0A0A0A0A 0A0A0A0A 0A0A0A0A 0A0A0A0A 0A0A0A0A ................................ 000080
0A0A0A0A 0A0A0A0A 0A0A0A0A 0A0A0A0A 0A0A0A0A 0A0A0A0A 0A0A0A0A 0A0A0A0A ................................ 0000A0
0A0A0A0A 0A0A0A0A 0A0A0A0A 0A0A0A0A 0A0A0A0A 0A0A0A0A 0A0A0A0A 0A0A0A0A ................................ 0000C0
0A0A0A0A 0A0A0A0A 0A0A0A0A 0A0A0A0A 0A0A0A0A 0A0A0A0A 0A0A0A0A 0A0A0A0A ................................ 0000E0
0A0A0A0A 0A0A0A0A 0A0A0A0A 0A0A0A0A 0A0A0A0A 0A0A0A0A 0A0A0A0A 0A0A0A0A ................................ 000100
0A0A0A0A 0A0A0A0A 0A0A0A0A 0A0A0A0A 0A0A0A0A 0A0A0A0A 0A0A0A0A 0A0A0A0A ................................ 000120
00000000 00000000 000A0A0A 0A0A0A0A 0A0A0A0A 0A0A0A0A 0A0A0A0A 0A0A0A0A ................................ 000140
00000000 20000000 00000000 00000000 00000000 00000000 00000000 00000000 ................................ 000160
47534D4E 3C3CFFFF 2B642B62 2B60FFFF 17141606 00000000 00000000 00000000 ...........#.....'+b+d+..<<NMSG 000180
0003000A 0D776F6C 66726576 6F206B63 61747320 2D0A0D30 30303652 00003E3E >>..R6000..- stack overflow..... 0001A0
0B000A0D 30207962 20656469 76696420 72656765 746E6920 2D0A0D33 30303652 R6003..- integer divide by 0.... 0001C0
6120726F 66206563 61707320 6867756F 6E652074 6F6E202D 0A0D3830 30365200 .R6008..- not enough space for a 0001E0
```

```
Dump of file SATURN:[PCCOMMON.DUMP.DLL]SADADESK.TMP;1 on 18-APR-1990 10:51:54.61
File ID (902,31,0)   End of file block 102 / Allocated 104

Virtual block number 91 (0000005B), 512 (0200) bytes

6867756F 6E652074 6F6E202D 0A0D3930 30365200 09000A0D 73746E65 6D756772 rguments.....R6009..- not enough 000000
00FF000A 0D00FC00 0A0D746E 656D6E6F 7269766E 6520726F 66206563 61707320  space for environment...*...... 000020
74616F6C 66202D0A 00323030 36520002 0020726F 72726520 656D6974 2D6E7572 run-time error ...R6002..- float 000040
2B5E0002 0003FFFF FF000A0D 64656461 6F6C2074 6F6E2074 6E696F70 20676E69 ing point not loaded..........^+ 000060
00000000 00000000 00000000 00000010 29120002 0000000F 17240002 0000000E ......$.........)................ 000080
FFFFFF00 00000001 00010040 00200000 000C0000 00200010 00100000 01204349 IC ....... ....... .a........... 0000A0
FCFFFF3F FCFFFF3F FCFFFF3F FCFFFF3F FCFFFF3F F8FFFF1F 00000000 00000000 ...........½?..*?..*?..*?..*?..* 0000C0
7CD5AB3E 7C8A513E 7C25A43E 7C724E3E 7CFC3F3E 7CFFFF3E FCFFFF3F FCFFFF3F ?..*?..*>..|>?*|>Nr|>EX|>Q.|>¨ï| 0000E0
FCFFFF3F FCFFFF3F FCFFFF3F 7CFFFF3E 7CFC3F3E 7C724E3E 7C25A43E 7C8A513E >Q.|>EX|>Nr|>?*|>..|?..*?..*?..* 000100
00000000 00000000 F8FFFF1F FCFFFF3F FCFFFF3F FCFFFF3F FCFFFF3F FCFFFF3F ?..*?..*?..*?..*?..*...½........ 000120
00000000 00000000 00000000 00000000 00000000 00000000 00000000 00000000 ................................ 000140
00C00300 00800100 00000000 00000000 00000000 00000000 00000000 00000000 ...............................à. 000160
00000000 00000000 00000000 00000000 00000000 00000000 00000000 00800100 ................................ 000180
00000000 00000000 00000000 00000000 00000000 00000000 00000000 00000000 ................................ 0001A0
FFE7FFFF FFFFCFFF FFE7FF0F C0FFCFFF FFE7FF07 80FFCFFF FFE7FFE3 1FFFCFFF .Ü..Ð.Ö..Ü....Ö..Ü.å..Ö..Ü....Ö. 0001C0
FF3FFF7F FCFFF9FF FF9FFFFF FEFFF3FF FFCFFFFF FFFFE7FF FFE7FFFF FFFFCFFF .Ü....Ö....Ö....Ü..µ.±.....ª.*..?. 0001E0

Dump of file SATURN:[PCCOMMON.DUMP.DLL]SADADESK.TMP;1 on 18-APR-1990 10:51:54.61
File ID (902,31,0)   End of file block 102 / Allocated 104

Virtual block number 92 (0000005C), 512 (0200) bytes

FFFFF37F FC9FFFFF FFFFF93F F83FFFFF FFFFFC1F F07FFEFF FF7FFE3F F8FFFCFF .*.½?±...±.Þ.*....?½?ª......*.µ.. 000000
FF83FF7F FCFFFFFF FFFF1F00 00F0FFFF FFFF0F00 00E0FFFF FFFFE77F FCCFFFFF ..Ü*.Ö....À.......Þ.........*.... 000020
7FFEF93F F93F9FFF 7FFEFC7F FC7FC0FF FF7CFE7F FCFFE0FF FF01FF7F FCFFFFFF ...*......À.*.±|..å.*.*±...?ª?ª±. 000040
FFFC1FF0 1FF09FFF 7FFECFE7 CFE73FFF 7FFEE7CF E7CF3FFF 7FFEF39F F39F3FFF .?.µ.µ±..?ÜÖÜÖ±..?ÖÜÖÜ±...Þ.Þ.*. 000060
FFFFFFFF FFFFFFFF FFFFFFFF FFFFFFFF FFFFFFFF FFFFEFFF FFF93FF8 3FF8CFFF .Ü½?½?ª..ÿ...................... 000080
FFFFFFFF FFFFFFFF FFFFFFFF FFFFFFFF FFFFFFFF FFFFFFFF FFFFFFFF FFFFFFFF ................................ 0000A0
00000000 00000000 00000000 00000000 00000000 00000000 00000000 00000000 ................................ 0000C0
00000000 00000000 00000000 00000000 00000000 00000000 00000000 00000000 ................................ 0000E0
00000000 00000000 00000000 00000000 00000000 00000000 00000000 00000000 ................................ 000100
00000000 00000000 00000000 00000000 00000000 00000000 00000000 00000000 ................................ 000120
00000000 00000000 00000000 00000000 00000000 00000000 00000000 00000000 ................................ 000140
00000000 00000000 00000000 00000000 00000000 00000000 00000000 00000000 ................................ 000160
00000000 00000000 00000000 00000000 00000000 00000000 00000000 00000000 ................................ 000180
00000000 00000000 00000000 00000000 00000000 00000000 00000000 00000000 ................................ 0001A0
00000000 00000000 00000000 00000000 00000000 00000000 00000000 00000000 ................................ 0001C0
00000000 00000000 00000000 00000000 00000000 00000000 00000000 00000000 ................................ 0001E0

Dump of file SATURN:[PCCOMMON.DUMP.DLL]SADADESK.TMP;1 on 18-APR-1990 10:51:54.61
File ID (902,31,0)   End of file block 102 / Allocated 104

Virtual block number 93 (0000005D), 512 (0200) bytes

00000000 00000000 00000000 00000000 00000000 00000000 00000000 00000000 ................................ 000000
00000000 00000000 00000000 00000000 00000000 00000000 00000000 00000000 ................................ 000020
00000000 00000000 00000000 00000000 00000000 00000000 00000000 00000000 ................................ 000040
00000000 00000000 00000000 00000000 00000000 00000000 00000000 00000000 ................................ 000060
00000000 00000000 00000000 00000000 00000000 00000000 00000000 00000000 ................................ 000080
00000000 00000000 00000000 00000000 00000000 00000000 00000000 00000000 ................................ 0000A0
77654E7E 0500656C 69467E06 00010352 00000000 00000000 00040352 0000000A ....R...........R....~File..~New 0000C0
6E676973 65642032 42447E0F 002E2E2E 6C65646F 6D207473 796C616E 417E1200 ..~Analyst model.....~DB2 design 0000E0
6C727443 09657661 537E0D00 4F2B6C72 7443092E 2E2E6E65 704F7E10 002E2E2E .....~Open....Ctrl+O..~Save.Ctrl 000100
42207473 6F502820 74726576 7E655211 002E2E2E 73617E20 65766153 0C00532B +S..Save ~as.....Re~vert (Post B 000120
0C00746E 6972507E 07002942 2074736F 5028202E 2E2E656D 616E6552 7E140029 )..~Rename... (Post B)..~Print.. 000140
1C002942 2074736F 5028202E 2E2E656C 69467E12 002E2E2E 60617267 6169447E ~Diagram.....~File... (Post B).. 000160
6972500F 006E6565 72635374 6E697250 2B6C7274 43092E2E 2E6E6565 7263537E ~Screen....Ctrl+PrintScreen..Pri 000180
00000000 2E2E2E74 756F7961 6C206567 61507E10 00736E6F 6974706F 20747E6E n~t options..~Page layout....... 0001A0
43092E2E 2E676F4C 7E0F002E 2E2E7265 746E6972 70206567 6E616843 7E130352 R..~Change printer.....~Log....C 0001C0
202E2E2E 74756F20 68636568 437E1700 6E697E20 68636568 430A004C 2B6C7274 trl+L..Check ~in..~Check out...  0001E0
```

```
Dump of file SATURN:[PCCOMMON.DUMP.DLL]SADADESK.TMP;1 on 18-APR-1990 10:51:54.61
File ID (902,31,0)   End of file block 102 / Allocated 104

Virtual block number 94 (0000005E), 512 (0200) bytes

7E110074 6964457E 06005828 6C727443 09746978 7E450000 29422074 736F5028 (Post B)..E-xit.Ctrl+X..-Edit..~ 000000
73686361 4228746C 41096F64 6E557E14 00374628 6C727443 092E2E2E 646E6946 Find....Ctrl+F7..-Undo.Alt+Backs 000020
28746669 6853096F 6465527E 0F002E2E 2E676F6C 206F646E 7E550000 65636170 pace..U-ndo log.....-Redo.Shift+ 000040
50282079 706F437E 1800747E 75430500 2E2E2E67 6F6C206F 64657E52 00003846 F8..R-edo log.....Cu-t..-Copy (P 000060
29422074 736F5028 20657473 61507E1A 00736E49 286C7274 43092942 2074736F ost B).Ctrl+Ins..-Paste (Post B) 000080
68531D00 6C65442B 74666968 53097261 656C7E43 1100736E 492B7466 69685309 .Shift+Ins..C-lear.Shift+Del..Sh 0000A0
00000000 00002942 2074736F 5028202E 2E2E7473 696C2074 63656C65 7320776F ow select list... (Post B)...... 0000C0
54060029 42207473 6F502820 2E2E2E64 72616F62 70696C63 20776F68 53180352 R..Show clipboard... (Post B)..T 0000E0
65487E08 00726569 7275437E 08002965 63694E28 20746E6F 467E0000 74787E65 e-xt..-Font (Nice)..-Curier..-He 000100
50282065 6C797453 7E10006E 61606F72 20736560 69547E00 00616369 7465766C lvetica..-Times roman..-Style (P 000120
0063696C 6174497E 0800646C 6F427E06 006C6160 726F4E7E 08002942 2074736F ost B)..-Normal..-Bold..-Italic. 000140
42207473 6F502820 6E6F6974 61636966 69747375 4A7E1800 65686972 74537E08 .-Strike..-Justification (Post B 000160
00706F54 7E050074 68676952 7E070074 66654C7E 06007265 746E6543 7E080029 )..-Center..-Left..-Right..-Top. 000180
746F6220 74667E65 4C0D0070 6F742074 66657E4C 0A00606F 74746F42 7E080352 R..-Bottom..L-eft top..Le-ft bot 0001A0
0000606F 74746F62 20746867 7E69520E 00706F74 20746867 697E5208 00606F74 tom..R-ight top..Ri-ght bottom.. 0001C0
00367E31 0400327E 31040030 7E310400 387E0300 29656369 4E282065 7A7E6953 Si-ze (Nice)..-8..1-0..1-2..1-6. 0001E0

Dump of file SATURN:[PCCOMMON.DUMP.DLL]SADADESK.TMP;1 on 18-APR-1990 10:51:54.61
File ID (902,31,0)   End of file block 102 / Allocated 104

Virtual block number 95 (0000005F), 512 (0200) bytes

0001002E 2E2E6560 6F537E09 006C6C41 7E050077 6569567E 06000100 38317E04 .-18....-View..-All..-Some...... 000000
69642077 654E7E00 00606172 67616944 7E090001 00010001 00010001 00010352 R..............-Diagram..-New di 000020
457E0500 2E6C6552 7E203242 440A002E 73796850 7E203242 44080060 61726761 agram..DB2 -Phys...DB2 -Rel...-E 000040
727E206E 69206E67 696C410E 004C4450 7E050044 467E0400 4446447E 05005220 -R..-DFD..-FD..-PDL..Align in -r 000060
00000000 00000000 00000000 6E6D756C 6F637E20 6E69206E 67696C41 1100776F ow..Align in -column............ 000080
00726562 7E6D756E 65520A00 657A6973 20657A69 64726164 6E617453 7E120352 R..-Standardize size..Renum-ber. 0000A0
74736F50 28206574 74656C61 507E1200 6C656261 6C20776F 6C662070 616E5310 .Snap flow label..-Palette (Post 0000C0
1400606F 6F5A7E06 00646E75 6F627E20 64697247 0C006469 72477E06 00294220 B)..-Grid..Grid -bound..-Zoom.. 0000E0
2D2D2D2D 2D2D2D2D 20327E12 002D2D2D 2D2D2D2D 2D2D2D2D 2D2D2D2D 2020317E -1 ---------------..-2 -------- 000100
2D2D2D2D 20347E0E 002D2D2D 2D2D2D2D 2D2D2D2D 2020337E 10002020 2D2D2D2D ------..-3 ------------..-4 ---- 000120
08002D2D 2D2D2D2D 20367E0A 002D2D2D 2D2D2D2D 2D20357E 0C002D2D 2D2D2D2D ------..-5 --------..-6 ------.. 000140
00000000 00000065 6D6F4809 7469467E 0A002D2D 20387E06 002D2D2D 2020377E -7 ----..-8 --..-Fit.Home....... 000160
29422074 736F5028 2060726F 467E0F00 6D7E726F 46060001 00010001 00010352 R..........For-m..-Form (Post B) 000180
74706F7E 20646C65 69462300 29422074 736F5028 20657461 6C706065 547E1300 ..-Template (Post B).#Field -opt 0001A0
67697661 4E7E1C00 4F2B746C 41092965 6C626172 69736544 282E2E2E 736E6F69 ions...(Desirable).Alt+O..-Navig 0001C0
61206574 61657243 7E1C004E 2B746C41 09294220 74736F50 28202E2E 2E657461 ate... (Post B).Alt+N..-Create a 0001E0

Dump of file SATURN:[PCCOMMON.DUMP.DLL]SADADESK.TMP;1 on 18-APR-1990 10:51:54.61
File ID (902,31,0)   End of file block 102 / Allocated 104

Virtual block number 96 (00000060), 512 (0200) bytes

77656976 20657461 6572437E 1000412B 6C727443 092E2E2E 65747562 69727474 ttribute....Ctrl+A..-Create view 000000
0000002E 2E2E7472 6F706049 7E080073 68736154 7E070001 00010001 002E2E2E ...........-Tasks..-Import...... 000020
6E65477E 00002E2E 2E657275 74706143 7E0C002E 2E2E7472 6F707845 7E080352 R..-Export.....-Capture.....-Gen 000040
2E2E2E6C 65646F6D 20617461 447E0F00 65677265 4D7E0700 2E2E2E65 74617265 erate.....-Merge..-Data model... 000060
092E2E2E 6E676973 65447E12 002E2E2E 6C65646F 6D207373 65636F72 507E1200 ..-Process model......-Design.... 000080
4E7E0E00 54286C72 7443092E 2E2E6D72 6F66736E 6172547E 1500442B 6C727443 Ctrl+D..-Transform....Ctrl+T..-N 0000A0
0C002E2E 2E656C75 72207373 656E6973 75427E12 002E2E2E 657A696C 6160726F ormalize.....-Business rule..... 0000C0
726F7065 527E0900 2E2E2E65 73726576 7E65520C 002E2E2E 64726177 726F467E -Forward.....Re-verse.....-Repor 0000E0
74726F70 6552204D 414C7E20 4C445010 0074726F 70655220 4C44507E 0C007374 ts..-PDL Report..PDL -LAM Report 000100
00656C69 666F7250 7E090001 00010352 00000000 00000000 00000000 00000100 ................R.......-Profile. 000120
6F6D2061 7461447E 0F002E2E 2E726574 6E697250 7E0C002E 2E2E7265 73557E09 .-User.....-Printer.....-Data mo 000140
20327E42 440F002E 2E2E6C65 646F6D20 73736563 6F727E50 12002E2E 2E6C6564 del.....P-rocess model.....DB-2 000160
6C61756E 614D7E17 00736C65 62616C20 776F6853 7E0D002E 2E2E6E67 69736564 design.....-Show labels..-Manual 000180
746E6520 6563616C 70206F74 75417E15 00736569 7469746E 65206563 616C7020 place entities..-Auto place ent 0001A0
7E080001 00010001 00010001 00010352 00010001 00010001 00010073 65697469 ities...........R..............~ 0001C0
656C6954 7E0F0029 42207473 6F502820 65646163 7361437E 1200776F 646E6957 Window..-Cascade (Post B)..-Tile 0001E0
```

```
Dump of file SATURN:[PCCOMMON.DUMP.DLL]SADADESK.TMP;1 on 18-APR-1990 10:51:54.61
File ID (902,31,0)   End of file block 102 / Allocated 104

Virtual block number 97 (00000061), 512 (0200) bytes

 00010001 00010001 0001006C 6C612065 736F6C7E 43080029 42207473 6F502820  (Post B)..C-lose all........... 000000
 20706C65 487E1200 706C6548 7E060352 00000000 00000000 00000000 00000001 ................R..~Help..~Help  000020
 0E002E2E 2E706C65 68206465 646E6574 78457E12 002E2E2E 706C6568 20726F66 for help.....~Extended help..... 000040
 7E00002E 2E2E7865 646E697E 20706C65 480F002E 2E2E706C 65682073 7965487E ~Keys help.....Help ~index.....~ 000060
 2E2A0500 01000100 01002E2E 2E74756F 62417E0A 002E2E2E 6C616972 6F747554 Tutorial.....~About...........*. 000080
 00000000 00000000 01000100 3242442E 05004E41 2E040052 41562E2A 06004E41 AN..*.VAR...AN...DB2............ 0000A0
 43414220 20206C61 69746E65 6469666E 6F43202A 2A310001 00010001 00010352 R.........1** Confidential   BAC 0000C0
 746F4E13 002A2A20 6C616974 6E656469 666E6F43 20202030 312E3320 4E414D48 HMAN 3.10   Confidential **..Not 0000E0
 6220746F 6E207361 68206C65 646F4D1C 0021656C 62616C69 61766120 74657920  yet available!..Model has not b 000100
 20732520 6C65646F 4D440047 4E494E52 41570800 64656966 69646F60 206E6565 een modified..WARNING.DModel %s  000120
 2E646576 61732074 6F6E2064 6E612064 65696669 646F6D20 6E656562 20736168 has been modified and not saved. 000140
 6F727245 15003F65 756E6974 6E6F6320 6F742074 6E617720 756F7920 6F442020   Do you want to continue?..Erro 000160
 00000000 01000100 01000100 01000100 726F7469 64652067 6E696E65 706F2072 r opening editor................ 000180
 64206E69 20747369 78652074 6F6E2073 656F6420 73252065 6C694627 00010352 R...'File %s does not exist in d 0001A0
 73206562 20747375 6D20656D 616E2065 6C69461C 00732520 79726F74 63657269 irectory %s..File name mus  be s 0001C0
 65707320 65622074 73756D20 656D616E 206C6564 6F4D1D00 64656966 69636570 pecified..Model name must b. spe 0001E0

Dump of file SATURN:[PCCOMMON.DUMP.DLL]SADADESK.TMP;1 on 18-APR-1990 10:51:54.61
File ID (902,31,0)   End of file block 102 / Allocated 104

Virtual block number 98 (00000062), 512 (0200) bytes

 15007374 73697865 20796461 65726C61 20732520 656C6946 17006465 69666963 cified..File %s already exists.. 000000
 75602073 2520656C 69462E00 73747369 78652079 64616572 6C612073 25204D50 PM %s already exists..File %s mu 000020
 746E6574 78652073 2520726F 20732520 61207265 68746965 20657661 68207473 st have either a %s or %s extent 000040
 73206562 20747375 6D206C65 646F6020 6E6F6974 6160726F 666E4924 006E6F69 ion.$Information model must be s 000060
 6D207373 65636F72 5020656E 6F207473 61656C20 74412D00 64656966 69636570 pecified.-At least one Process m 000080
 616E204D 50206F4E 1C006465 69666963 65707320 65622074 73756D20 6C65646F odel must be specified..No PM na 0000A0
 4E22006C 6C612077 65695609 00796C70 7041206F 74206465 7265746E 65206560 me entered to Apply..View all."N 0000C0
 2E646569 6C707061 20796C74 6E657272 75632065 72612073 7265746C 6966206F o filters are currently applied. 0000E0
 01AA0073 001101A8 006F0011 03520012 00000000 00000000 01000100 01000100 .....................R...o.´...s.´. 000100
 002201BD 00260012 02340020 000201BB 00780011 01B6006C 001101B2 00190012 ....ý...l.Ñ...x.£...  .4...&.§.". 000120
 00140002 01C7001B 000A01C6 001A000A 01C5001A 001201C1 0027000A 01BF0005 ..e...'.è.....é.....ó.....ú..... 000140
 021A0074 00110219 00640011 020E0061 0011020C 004E0021 020B004F 00210207 ..!.O...!.N.....a.....d.....t... 000160
 00279400 00900176 00040001 00000008 00000000 FFFF0001 000E0352 000001BE ƒ...R....................v.....'. 000180
 00890005 80000001 017F000A 00050000 00000000 017BFFFF 01000099 00CE0010 ..ö.......(...................... 0001A0
 00500089 004D8002 000C018A 00040006 00000000 0000FFFF FFFF0101 00080030 0.........................M...P. 0001C0
 00080036 007F0005 80010001 018F000A 00050000 00000000 FFFFFFFF 01020008 .............................6... 0001E0

Dump of file SATURN:[PCCOMMON.DUMP.DLL]SADADESK.TMP;1 on 18-APR-1990 10:51:54.61
File ID (902,31,0)   End of file block 102 / Allocated 104

Virtual block number 99 (00000063), 512 (0200) bytes

 01040008 0078007F 004B8001 0001019A 00000005 00000000 0000FFFF FFFF0103 ......................K...x..... 000000
 FFFF0105 00080018 00750005 80010001 01980005 00050000 00000000 FFFFFFFF ........................u....... 000020
 FFFFFFFF 01060050 00540023 00058002 000001A1 00000007 00000000 0000FFFF ............À........#.T.P........ 000040
 0000FFFF FFFF0107 00080032 00750074 80010001 01A20008 00050000 00000000 ..........Å.....t.u.2........... 000060
 00000000 FFFFFFFF 01080050 00540023 00748002 000001AE 00000007 00000000 ..........Ö.....t.#.T.P.......... 000080
 00000000 0000FFFF FFFF0001 000C0026 000A0027 80030400 01AF0002 00030000 ......£.....'...&............... 0000A0
 00030000 00000000 FFFFFFFF 0002000C 0026000A 00578002 000001B2 00060003 ....ý.....W...&................. 0000C0
 46000000 03006E65 704FFFFF FFFF0109 000C0026 000A0087 80020100 01B90004 ..¿.........&.........Open.....F 0000E0
 73656C69 4600003A 79726F74 63657269 44004E41 2E2A003A 656D616E 20656C69 ile name:.*.AN.Directory:..Files 000100
 00000070 6C654800 6C65636E 6143004B 4F000073 6569726F 74636572 69440000 ..Directories..OK.Cancel.Help... 000120
 006E9400 009000FE 000C0001 00000007 00000000 FFFF0001 000E0352 00000136 6...R....................±.....n. 000140
 003D000C 80010001 010F000A 00050000 00000000 010BFFFF 04000054 00C60050 P.6.T...........................=. 000160
 004F002A 000C8001 0001011A 000A0005 00000000 0000FFFF FFFF0401 0008004A J............................*.O. 000180
 000A0062 003B0059 8002000C 01250000 00060000 00000000 FFFFFFFF 04030008 ..................X.....Y.;.b.... 0001A0
 0404000A 00620027 00598002 000C0126 00000006 00000000 0000FFFF FFFF0402 .................&.....Y.'.b.... 0001C0
 FFFF0001 000C0026 000A0020 80030400 01270002 00030000 00000000 FFFFFFFF ...............'..... ...&....... 0001E0
```

```
Dump of file SATURN:[PCCOMMON.DUMP.DLL]SADADESK.TMP;1 on 18-APR-1990 10:51:54.61
File ID (902,31,0)   End of file block 102 / Allocated 104

Virtual block number 100 (00000064), 512 (0200) bytes

 FFFFFFFF 0002000C 0026000A 00508002 0000012A 00060003 00000000 0000FFFF ............*.....P...&. ....... 000000
 6552FFFF FFFF0405 000C0026 000A0080 80020100 01310004 00030000 00000000 ..........1.........&.... ....Re 000020
 6F6D2077 654E003A 6C65646F 6D20646C 4F000000 03006C65 646F6D20 6560616E name model.....Old model:... mo 000040
 00000000 00000000 00000070 6C654800 6C65636E 6143004B 4F000000 3A6C6564 del:...OK.Cancel.Help........... 000060
 00071400 0090011C 000E0001 00000008 00000000 FFFF0001 000E0352 0000015D ]...R........................... 000080
 00350005 80010001 012F000A 00050000 00000000 012BFFFF 0258004A 00BC0023 #.¥.J.X...+.........../.......5. 0000A0
 00500036 004B8002 0008013A 00000006 00000000 0000FFFF FFFF0264 0008002F /...d...............:.....K.6.P. 0000C0
 00080017 0033009E 80010001 013B0004 00050000 00000000 FFFFFFFF 02710008 ..q..............;.......3...... 0000E0
 02620008 003E0020 00058001 00010140 000C0005 00000000 0000FFFF FFFF0263 c...............@....... .>...b. 000100
 FFFF026C 00080050 0022004B 8002000C 014D0000 00060000 00000000 FFFFFFFF ..............M.....K.".P...l... 000120
 FFFFFFFF 0001000C 00260005 001A8003 0400014E 00020003 00000000 0000FFFF ............N.........&......... 000140
 0000FFFF FFFF0002 000C0026 0005004A 80020000 01510006 00030000 00000000 ..........Q.....J...&........... 000160
 2077654E FFFFFFFF 028A000C 00260005 007A8002 01000158 00040003 00000000 ........X.....z...&.........New  000180
 00324244 2E00003A 6560616E 20656C69 46000000 03006E67 69736564 20324244 DB2 design.....File name:...DB2. 0001A0
 00000000 706C6548 006C6563 6E614300 4B4F0000 3A656D61 6E206E67 69736544 Design name:..OK.Cancel.Help.... 0001C0
 00609400 0090020C 00110001 00000010 00000000 FFFF0001 000E0352 00000288 ....R.........................'. 0001E0

Dump of file SATURN:[PCCOMMON.DUMP.DLL]SADADESK.TMP;1 on 18-APR-1990 10:51:54.61
File ID (902,31,0)   End of file block 102 / Allocated 104

Virtual block number 101 (00000065), 512 (0200) bytes

 00AF0005 80010001 0222000A 00050000 00000000 021EFFFF 030000C8 00C8000A ..à.à.................".......È. 000000
 00500082 005C8002 000C022D 00000006 00000000 0000FFFF FFFF0301 00080032 2.....................-.....\.ý.P. 000020
 00080014 00AF00AF 80000001 022E0003 00050000 00000000 FFFFFFFF 03020008 ........................È.È..... 000040
 03040008 0050009B 00058000 00010232 00080005 00000000 0000FFFF FFFF0303 .................2.........P..... 000060
 FFFF0305 00080050 009D005C 8002000C 023E0000 00060000 00000000 FFFFFFFF ..............>.....\...P....... 000080
 FFFFFFFF 03060008 00500087 00058000 0001023F 00080005 00000000 0000FFFF ............?.........P......... 0000A0
 0000FFFF FFFF0307 00080050 0089005C 8002000C 02480000 00060000 00000000 ..........K.....\...P........... 0000C0
 00000000 FFFFFFFF 03080008 00500073 00058000 0001024C 000E0005 00000000 ........L........s.P............ 0000E0
 00000000 0000FFFF FFFF0309 00080050 0075005C 8002000C 02580000 00060000 ......[.....\.u.P............... 000100
 00030000 00000000 FFFFFFFF 030C0000 00260044 009A8002 0000025C 00040003 ....\.......D.&................. 000120
 000E0005 00000000 0000FFFF FFFF030D 000D0026 002F009A 80020000 02610007 ..a......./.&................... 000140
 02780000 00070000 00000000 FFFFFFFF 030A0008 00500063 00058000 00010269 i.......c.P....................x. 000160
 04000279 00020003 00000000 0000FFFF FFFF030B 0040008A 00220005 80020008 ......"...@.................y... 000180
 80020000 027C0006 00030000 00000000 FFFFFFFF 0001000C 0026000A 00218003 ..|...&....................|..... 0001A0
 00818002 01000283 00040003 00000000 0000FFFF FFFF0002 000C0026 000A0051 Q...&........................... 0001C0
 0003006C 65646F6D 20747379 6C616E41 2077654E FFFFFFFF 0003000C 0026000A ..&.........New Analyst model... 0001E0

Dump of file SATURN:[PCCOMMON.DUMP.DLL]SADADESK.TMP;1 on 18-APR-1990 10:51:54.61
File ID (902,31,0)   End of file block 102 / Allocated 104

Virtual block number 102 (00000066), 512 (0200) bytes

 4400003A 6560616E 206C6564 6F4D004E 412E0000 3A656D61 6E20656C 69460000 ..File name:...AN.Model name:..D 000000
 6464417E 00003A6C 65646F6D 20737365 636F7250 00003A6C 65646F6D 20617461 ata model:..Process model:..~Add 000020
 636E6143 004B4F00 00736C65 646F6D20 73736563 6F725000 6574656C 65447E00 .~Delete.Process models..OK.Canc 000040
 00000000 00000000 00000000 00000000 00000000 00000000 00706C65 48006C65 el.Help......................... 000060
 00000000 00000000 00000000 00000000 00000000 00000000 00000000 00000000 ................................ 000080
 00000000 00000000 00000000 00000000 00000000 00000000 00000000 00000000 ................................ 0000A0
 00000000 00000000 00000000 00000000 00000000 00000000 00000000 00000000 ................................ 0000C0
 00000000 00000000 00000000 00000000 00000000 00000000 00000000 00000000 ................................ 0000E0
 00000000 00000000 00000000 00000000 00000000 00000000 00000000 00000000 ................................ 000100
 00000000 00000000 00000000 00000000 00000000 00000000 00000000 00000000 ................................ 000120
 00000000 00000000 00000000 00000000 00000000 00000000 00000000 00000000 ................................ 000140
 00000000 00000000 00000000 00000000 00000000 00000000 00000000 00000000 ................................ 000160
 00000000 00000000 00000000 00000000 00000000 00000000 00000000 00000000 ................................ 000180
 00000000 00000000 00000000 00000000 00000000 00000000 00000000 00000000 ................................ 0001A0
 00000000 00000000 00000000 00000000 00000000 00000000 00000000 00000000 ................................ 0001C0
 00000000 00000000 00000000 00000000 00000000 00000000 00000000 00000000 ................................ 0001E0
```

```
Dump of file SATURN:[PCCOMMON.DUMP.DLL]SAFORMS.TMP;1 on 18-APR-1990 10:52:11.20
File ID (907,31,0)   End of file block 22 / Allocated 24

Virtual block number 1 (00000001), 512 (0200) bytes

 00000000 00000040 00000000 000000B8 0000FFFF 00000004 00000016 00385A4D MZ8.............|.......a....... 000000
 00000080 00000000 00000000 00000000 00000000 00000000 00000000 00000000 ................................ 000020
 6F6E6E61 63206061 72676F72 70207369 685421CD 4C01B821 C0098400 0E8A1F0E ..¤..Ç.ël|.Lë!This program canno 000040
 00000000 00000024 0A0D002E 65646F6D 20534F44 206E6920 6E757220 65622074 t be run in DOS mode....$....... 000060
 00000003 00000000 00000000 00000000 00038009 7BC78C70 00070063 0505454E NE..c...p.ú(.................... 000080
 00000000 00000000 00010000 00040000 000000EA 00630063 00580058 00400036 6.a.X.X.c.c.õ................... 0000A0
 534D524F 46415307 2A540E21 2858001E 00360E00 0036001A 006C0F00 006C0012 ..l...l...6...6...X(!.T*.SAFORMS 0000C0
 736D726F 46204D49 2030312E 33204E41 4D484341 421C0000 00000301 01000000 ...........BACHMAN 3.10 IM Forms 0000E0
 00000145 4D414E4C 4C445952 45555153 4D524F46 41531300 00606574 73795320  System...SAFORMSQUERYDLLNAME... 000100
 0000BF83 0102FE5E 69FE46FF 0003E900 00FE46C7 D88EFFFF 881E5657 000002C8 à...WV.|...ÄúF±..Õ...F±i^±...¢.. 000120
 FE466900 1EE90374 00008739 0A468801 02FE5E69 0038E99A 71B80006 E9037400 .t.Õ..|q.Õ8.i^±...F.9...t.Õ..iF± 000140
 7188FFB6 E90009E9 0000B808 C483FFFF 00009A06 76FF0876 FF501E00 02050102 ......P.v..v.......é.|..Õ..ÕR.|q 000160
 00000000 00030008 00020000 00020050 00020002 900006CA C95F5E1F 0000E99A .Õ...^_èò.......P............... 000180
 A8C78806 7EC4D1F7 AEF2FFFF B9C033C0 8ED88CFE 880A76C5 1EDE88D7 88EC8855 U.š.■.B̄.év..±.Ä.ä3ä¿..·Ú¼Ï6~..ú´ 0001A0
 00000000 00000000 0000C85D C28C1FFA 8BF388A4 F3C913A5 F3E90149 A4027401 .t.ÈIiÕµÊ.èµÊ.µ.'..õ]ù.......... 0001C0
 00000000 00000000 00000000 00000000 00000000 00000046 44544E45 41440002 ..DAENTDF....................... 0001E0

Dump of file SATURN:[PCCOMMON.DUMP.DLL]SAFORMS.TMP;1 on 18-APR-1990 10:52:11.20
File ID (907,31,0)   End of file block 22 / Allocated 24

Virtual block number 2 (00000002), 512 (0200) bytes

 00000000 00000000 00000000 00000000 00000000 00000000 00000000 00000000 ................................ 000000
 00000000 00000000 00000000 00000000 00000000 00000000 00000000 00000000 ................................ 000020
 00000000 00000000 00000000 00000000 00000000 00000000 00000000 00000000 ................................ 000040
 00000000 00000000 00000000 00000000 00000000 00000000 00000000 00000000 ................................ 000060
 00000000 00000000 00000000 00000000 00000000 00000000 00000000 00000000 ................................ 000080
 00000000 00000000 00000000 00000000 00000000 00000000 00000000 00000000 ................................ 0000A0
 00000000 00000000 00000000 00000000 00000000 00000000 00000000 00000000 ................................ 0000C0
 00000000 00000000 00000000 00000000 00000000 00004644 4D494144 00010000 ....DAIMDF...................... 0000E0
 00000000 00000000 00000000 00000000 00000000 00000000 00000000 00000000 ................................ 000100
 00000000 00000000 00000000 00000000 00000000 00000000 00000000 00000000 ................................ 000120
 00000000 00000000 00000000 00000000 00000000 00000000 00000000 00000000 ................................ 000140
 00000000 00000000 00000000 00000000 00000000 00000000 00000000 00000000 ................................ 000160
 00000000 00000000 00000000 00000000 00000000 00000000 00000000 00000000 ................................ 000180
 00000000 00000000 00000000 00000000 00000000 00000000 00000000 00000000 ................................ 0001A0
 00000000 00000000 00000000 00000000 00000000 00000000 00000000 00000000 ................................ 0001C0
 00000000 00000000 00000000 00000000 00004644 54455350 41440003 00000000 ......DAPSETDF.................. 0001E0

Dump of file SATURN:[PCCOMMON.DUMP.DLL]SAFORMS.TMP;1 on 18-APR-1990 10:52:11.20
File ID (907,31,0)   End of file block 22 / Allocated 24

Virtual block number 3 (00000003), 512 (0200) bytes

 00000000 00000000 00000000 00000000 00000000 00000000 00000000 00000000 ................................ 000000
 00000000 00000000 00000000 00000000 00000000 00000000 00000000 00000000 ................................ 000020
 00000000 00000000 00000000 00000000 00000000 00000000 00000000 00000000 ................................ 000040
 00000000 00000000 00000000 00000000 00000000 00000000 00000000 00000000 ................................ 000060
 00000000 00000000 00000000 00000000 00000000 00000000 00000000 00000000 ................................ 000080
 00000000 00000000 00000000 00000000 00000000 00000000 00000000 00000000 ................................ 0000A0
 00000000 00000000 00000000 00000000 00000000 00000000 00000000 00000000 ................................ 0000C0
 00000000 00000000 00000000 00000000 00000000 00000000 00040000 00000000 ................................ 0000E0
 00000000 00000000 00000000 00000000 00000000 00000000 00000000 00000000 ................................ 000100
 00000000 00000000 00000000 00000000 00000000 00000000 00000000 00000000 ................................ 000120
 00000000 00000000 00000000 00000000 00000000 00000000 00000000 00000000 ................................ 000140
 00000000 00000000 00000000 00000000 00000000 00000000 00000000 00000000 ................................ 000160
 00000000 00000000 00000000 00000000 00000000 00000000 00000000 00000000 ................................ 000180
 00000000 00000000 00000000 00000000 00000000 00000000 00000000 00000000 ................................ 0001A0
 00000000 00000000 00000000 00000000 00000000 00000000 00000000 00000000 ................................ 0001C0
 00000000 00000000 00000000 00004644 52545441 41440005 00000000 00000000 .........DAATTRDF............... 0001E0
```

```
Dump of file SATURN:[PCCOMMON.DUMP.DLL]SAFORMS.TMP;1 on 18-APR-1990 10:52:11.20
File ID (907,31,0)    End of file block 22 / Allocated 24

Virtual block number 4 (00000004), 512 (0200) bytes

00000000 00000000 00000000 00000000 00000000 00000000 00000000 00000000 ................................ 000000
00000000 00000000 00000000 00000000 00000000 00000000 00000000 00000000 ................................ 000020
00000000 00000000 00000000 00000000 00000000 00000000 00000000 00000000 ................................ 000040
00000000 00000000 00000000 00000000 00000000 00000000 00000000 00000000 ................................ 000060
00000000 00000000 00000000 00000000 00000000 00000000 00000000 00000000 ................................ 000080
00000000 00000000 00000000 00000000 00000000 00000000 00000000 00000000 ................................ 0000A0
00000000 00000000 00000000 00000000 00000000 00000000 00000000 00000000 ................................ 0000C0
00000000 00000000 00000000 0046444D 49444144 00060000 00000000 00000000 ............DADIMDF............. 0000E0
00000000 00000000 00000000 00000000 00000000 00000000 00000000 00000000 ................................ 000100
00000000 00000000 00000000 00000000 00000000 00000000 00000000 00000000 ................................ 000120
00000000 00000000 00000000 00000000 00000000 00000000 00000000 00000000 ................................ 000140
00000000 00000000 00000000 00000000 00000000 00000000 00000000 00000000 ................................ 000160
00000000 00000000 00000000 00000000 00000000 00000000 00000000 00000000 ................................ 000180
00000000 00000000 00000000 00000000 00000000 00000000 00000000 00000000 ................................ 0001A0
00000000 00000000 00000000 00000000 00000000 00000000 00000000 00000000 ................................ 0001C0
00000000 00000000 00000046 444D4F44 41440007 00000000 00000000 00000000 ..............DADOMDF........... 0001E0

Dump of file SATURN:[PCCOMMON.DUMP.DLL]SAFORMS.TMP;1 on 18-APR-1990 10:52:11.20
File ID (907,31,0)    End of file block 22 / Allocated 24

Virtual block number 5 (00000005), 512 (0200) bytes

00000000 00000000 00000000 00000000 00000000 00000000 00000000 00000000 ................................ 000000
00000000 00000000 00000000 00000000 00000000 00000000 00000000 00000000 ................................ 000020
00000000 00000000 00000000 00000000 00000000 00000000 00000000 00000000 ................................ 000040
00000000 00000000 00000000 00000000 00000000 00000000 00000000 00000000 ................................ 000060
00000000 00000000 00000000 00000000 00000000 00000000 00000000 00000000 ................................ 000080
00000000 00000000 00000000 00000000 00000000 00000000 00000000 00000000 ................................ 0000A0
00000000 00000000 00000000 00000000 00000000 00000000 00000000 00000000 ................................ 0000C0
00000000 00000000 00000000 00000000 00080000 00000000 00000000 00000000 ................................ 0000E0
00000000 00000000 00000000 00000000 00000000 00000000 00000000 00000000 ................................ 000100
00000000 00000000 00000000 00000000 00000000 00000000 00000000 00000000 ................................ 000120
00000000 00000000 00000000 00000000 00000000 00000000 00000000 00000000 ................................ 000140
00000000 00000000 00000000 00000000 00000000 00000000 00000000 00000000 ................................ 000160
00000000 00000000 00000000 00000000 00000000 00000000 00000000 00000000 ................................ 000180
00000000 00000000 00000000 00000000 00000000 00000000 00000000 00000000 ................................ 0001A0
00000000 00000000 00000000 00000000 00000000 00000000 00000000 00000000 ................................ 0001C0
00000000 00000046 4459454B 41440009 00000000 00000000 00000000 00000000 .................DAKEYDF........ 0001E0

Dump of file SATURN:[PCCOMMON.DUMP.DLL]SAFORMS.TMP;1 on 18-APR-1990 10:52:11.20
File ID (907,31,0)    End of file block 22 / Allocated 24

Virtual block number 6 (00000006), 512 (0200) bytes

00000000 00000000 00000000 00000000 00000000 00000000 00000000 00000000 ................................ 000000
00000000 00000000 00000000 00000000 00000000 00000000 00000000 00000000 ................................ 000020
00000000 00000000 00000000 00000000 00000000 00000000 00000000 00000000 ................................ 000040
00000000 00000000 00000000 00000000 00000000 00000000 00000000 00000000 ................................ 000060
00000000 00000000 00000000 00000000 00000000 00000000 00000000 00000000 ................................ 000080
00000000 00000000 00000000 00000000 00000000 00000000 00000000 00000000 ................................ 0000A0
00000000 00000000 00000000 00000000 00000000 00000000 00000000 00000000 ................................ 0000C0
00000000 0046444E 59534144 000A0000 00000000 00000000 00000000 00000000 ...................DASYNDF...... 0000E0
00000000 00000000 00000000 00000000 00000000 00000000 00000000 00000000 ................................ 000100
00000000 00000000 00000000 00000000 00000000 00000000 00000000 00000000 ................................ 000120
00000000 00000000 00000000 00000000 00000000 00000000 00000000 00000000 ................................ 000140
00000000 00000000 00000000 00000000 00000000 00000000 00000000 00000000 ................................ 000160
00000000 00000000 00000000 00000000 00000000 00000000 00000000 00000000 ................................ 000180
00000000 00000000 00000000 00000000 00000000 00000000 00000000 00000000 ................................ 0001A0
00000000 00000000 00000000 00000000 00000000 00000000 00000000 00000000 ................................ 0001C0
00000046 44545641 41440008 00000000 00000000 00000000 00000000 00000000 .......................DAA.'DF.. 0001E0
```

```
Dump of file SATURN:[PCCOMMON.DUMP.DLL]SAFORMS.TMP;1 on 18-APR-1990 10:52:11.20
File ID (907,31,0)   End of file block 22 / Allocated 24

Virtual block number 7 (00000007), 512 (0200) bytes

00000000 00000000 00000000 00000000 00000000 00000000 00000000 00000000 ................................ 000000
00000000 00000000 00000000 00000000 00000000 00000000 00000000 00000000 ................................ 000020
00000000 00000000 00000000 00000000 00000000 00000000 00000000 00000000 ................................ 000040
00000000 00000000 00000000 00000000 00000000 00000000 00000000 00000000 ................................ 000060
00000000 00000000 00000000 00000000 00000000 00000000 00000000 00000000 ................................ 000080
00000000 00000000 00000000 00000000 00000000 00000000 00000000 00000000 ................................ 0000A0
00000000 00000000 00000000 00000000 00000000 00000000 00000000 00000000 ................................ 0000C0
00000000 00000000 00000000 00000000 00000000 00000000 00000000 00000000 ................................ 0000E0
00000000 00000000 00000000 00000000 00000000 00000000 00000000 00000000 ................................ 000100
00000000 00000000 00000000 00000000 00000000 00000000 00000000 00000000 ................................ 000120
00000000 00000000 00000000 00000000 00000000 00000000 00000000 00000000 ................................ 000140
00000000 00000000 00000000 00000000 00000000 00000000 00000000 00000000 ................................ 000160
00000000 00000000 00000000 00000000 00000000 00000000 00000000 00000000 ................................ 000180
00000000 00000000 00000000 00000000 00000000 00000000 00000000 00000000 ................................ 0001A0
00000000 00000000 00000000 00000000 00000000 00000000 00000000 00000000 ................................ 0001C0
00000000 0000000E 00000000 00000000 00000000 00000000 00000000 00000000 ................................ 0001E0

Dump of file SATURN:[PCCOMMON.DUMP.DLL]SAFORMS.TMP;1 on 18-APR-1990 10:52:11.20
File ID (907,31,0)   End of file block 22 / Allocated 24

Virtual block number 8 (00000008), 512 (0200) bytes

00000000 00000000 00000000 00000000 00000000 00000000 00000000 00000000 ................................ 000000
00000000 00000000 00000000 00000000 00000000 00000000 00000000 00000000 ................................ 000020
00000000 00000000 00000000 00000000 00000000 00000000 00000000 00000000 ................................ 000040
00000000 00000000 00000000 00000000 00000000 00000000 00000000 00000000 ................................ 000060
00000000 00000000 00000000 00000000 00000000 00000000 00000000 00000000 ................................ 000080
00000000 00000000 00000000 00000000 00000000 00000000 00000000 00000000 ................................ 0000A0
00000000 00000000 00000000 00000000 00000000 00000000 00000000 00000000 ................................ 0000C0
00000000 000F0000 00000000 00000000 00000000 00000000 00000000 00000000 ................................ 0000E0
00000000 00000000 00000000 00000000 00000000 00000000 00000000 00000000 ................................ 000100
00000000 00000000 00000000 00000000 00000000 00000000 00000000 00000000 ................................ 000120
00000000 00000000 00000000 00000000 00000000 00000000 00000000 00000000 ................................ 000140
00000000 00000000 00000000 00000000 00000000 00000000 00000000 00000000 ................................ 000160
00000000 00000000 00000000 00000000 00000000 00000000 00000000 00000000 ................................ 000180
00000000 00000000 00000000 00000000 00000000 00000000 00000000 00000000 ................................ 0001A0
00000000 00000000 00000000 00000000 00000000 00000000 00000000 00000000 ................................ 0001C0
00000010 00000000 00000000 00000000 00000000 00000000 00000000 00000000 ................................ 0001E0

Dump of file SATURN:[PCCOMMON.DUMP.DLL]SAFORMS.TMP;1 on 18-APR-1990 10:52:11.20
File ID (907,31,0)   End of file block 22 / Allocated 24

Virtual block number 9 (00000009), 512 (0200) bytes

00000000 00000000 00000000 00000000 00000000 00000000 00000000 00000000 ................................ 000000
00000000 00000000 00000000 00000000 00000000 00000000 00000000 00000000 ................................ 000020
00000000 00000000 00000000 00000000 00000000 00000000 00000000 00000000 ................................ 000040
00000000 00000000 00000000 00000000 00000000 00000000 00000000 00000000 ................................ 000060
00000000 00000000 00000000 00000000 00000000 00000000 00000000 00000000 ................................ 000080
00000000 00000000 00000000 00000000 00000000 00000000 00000000 00000000 ................................ 0000A0
00000000 00000000 00000000 00000000 00000000 00000000 00000000 00000000 ................................ 0000C0
00110000 00000000 00000000 00000000 00000000 00000000 00000000 00000000 ................................ 0000E0
00000000 00000000 00000000 00000000 00000000 00000000 00000000 00000000 ................................ 000100
00000000 00000000 00000000 00000000 00000000 00000000 00000000 00000000 ................................ 000120
00000000 00000000 00000000 00000000 00000000 00000000 00000000 00000000 ................................ 000140
00000000 00000000 00000000 00000000 00000000 00000000 00000000 00000000 ................................ 000160
00000000 00000000 00000000 00000000 00000000 00000000 00000000 00000000 ................................ 000180
00000000 00000000 00000000 00000000 00000000 00000000 00000000 00000000 ................................ 0001A0
00000000 00000000 00000000 00000000 00000000 00000000 00000000 00000000 ................................ 0001C0
00000000 00000000 00000000 00000000 00000000 00000000 00000000 00000000 ................................ 0001E0
```

```
Dump of file SATURN:[PCCOMMON.DUMP.DLL]SAFORMS.TMP;1 on 18-APR-1990 10:52:11.20
File ID (907,31,0)   End of file block 22 / Allocated 24

Virtual block number 10 (0000000A), 512 (0200) bytes

 00000000 00000000 00000000 00000000 00000000 00000000 00000000 00000012 ................................ 000000
 00000000 00000000 00000000 00000000 00000000 00000000 00000000 00000000 ................................ 000020
 00000000 00000000 00000000 00000000 00000000 00000000 00000000 00000000 ................................ 000040
 00000000 00000000 00000000 00000000 00000000 00000000 00000000 00000000 ................................ 000060
 00000000 00000000 00000000 00000000 00000000 00000000 00000000 00000000 ................................ 000080
 00000000 00000000 00000000 00000000 00000000 00000000 00000000 00000000 ................................ 0000A0
 00000000 00000000 00000000 00000000 00000000 00000000 00000000 00000000 ................................ 0000C0
 00000000 00000000 00000000 00000000 00000000 00000000 00000000 00000000 ................................ 0000E0
 00000000 00000000 00000000 00000000 00000000 00000000 00000000 00130000 ................................ 000100
 00000000 00000000 00000000 00000000 00000000 00000000 00000000 00000000 ................................ 000120
 00000000 00000000 00000000 00000000 00000000 00000000 00000000 00000000 ................................ 000140
 00000000 00000000 00000000 00000000 00000000 00000000 00000000 00000000 ................................ 000160
 00000000 00000000 00000000 00000000 00000000 00000000 00000000 00000000 ................................ 000180
 00000000 00000000 00000000 00000000 00000000 00000000 00000000 00000000 ................................ 0001A0
 00000000 00000000 00000000 00000000 00000000 00000000 00000000 00000000 ................................ 0001C0
 00000000 00000000 00000000 00000000 00000000 00000000 00000000 00000000 ................................ 0001E0

Dump of file SATURN:[PCCOMMON.DUMP.DLL]SAFORMS.TMP;1 on 18-APR-1990 10:52:11.20
File ID (907,31,0)   End of file block 22 / Allocated 24

Virtual block number 11 (0000000B), 512 (0200) bytes

 00000000 00000000 00000000 00000000 00000000 00000000 00000014 00000000 ................................ 000000
 00000000 00000000 00000000 00000000 00000000 00000000 00000000 00000000 ................................ 000020
 00000000 00000000 00000000 00000000 00000000 00000000 00000000 00000000 ................................ 000040
 00000000 00000000 00000000 00000000 00000000 00000000 00000000 00000000 ................................ 000060
 00000000 00000000 00000000 00000000 00000000 00000000 00000000 00000000 ................................ 000080
 00000000 00000000 00000000 00000000 00000000 00000000 00000000 00000000 ................................ 0000A0
 00000000 00000000 00000000 00000000 00000000 00000000 00000000 00000000 ................................ 0000C0
 00000000 00000000 00000000 00000000 00000000 00000000 00000000 00000000 ................................ 0000E0
 00000000 00000000 00000000 00000000 46444554 4F4E4144 00150000 00000000 ........DANOTEDF................ 000100
 00000000 00000000 00000000 00000000 00000000 00000000 00000000 00000000 ................................ 000120
 00000000 00000000 00000000 00000000 00000000 00000000 00000000 00000000 ................................ 000140
 00000000 00000000 00000000 00000000 00000000 00000000 00000000 00000000 ................................ 000160
 00000000 00000000 00000000 00000000 00000000 00000000 00000000 00000000 ................................ 000180
 00000000 00000000 00000000 00000000 00000000 00000000 00000000 00000000 ................................ 0001A0
 00000000 00000000 00000000 00000000 00000000 00000000 00000000 00000000 ................................ 0001C0
 00000000 00000000 00000000 00000000 00000000 00000000 00000000 00000000 ................................ 0001E0

Dump of file SATURN:[PCCOMMON.DUMP.DLL]SAFORMS.TMP;1 on 18-APR-1990 10:52:11.20
File ID (907,31,0)   End of file block 22 / Allocated 24

Virtual block number 12 (0000000C), 512 (0200) bytes

 00000000 00000000 00000000 00000000 00000000 00000017 00000000 00000000 ................................ 000000
 00000000 00000000 00000000 00000000 00000000 00000000 00000000 00000000 ................................ 000020
 00000000 00000000 00000000 00000000 00000000 00000000 00000000 00000000 ................................ 000040
 00000000 00000000 00000000 00000000 00000000 00000000 00000000 00000000 ................................ 000060
 00000000 00000000 00000000 00000000 00000000 00000000 00000000 00000000 ................................ 000080
 00000000 00000000 00000000 00000000 00000000 00000000 00000000 00000000 ................................ 0000A0
 00000000 00000000 00000000 00000000 00000000 00000000 00000000 00000000 ................................ 0000C0
 00000000 00000000 00000000 00000000 00000000 00000000 00000000 00000000 ................................ 0000E0
 00000000 00000000 00000000 00000000 00000000 00180000 00000000 00000000 ................................ 000100
 00000000 00000000 00000000 00000000 00000000 00000000 00000000 00000000 ................................ 000120
 00000000 00000000 00000000 00000000 00000000 00000000 00000000 00000000 ................................ 000140
 00000000 00000000 00000000 00000000 00000000 00000000 00000000 00000000 ................................ 000160
 00000000 00000000 00000000 00000000 00000000 00000000 00000000 00000000 ................................ 000180
 00000000 00000000 00000000 00000000 00000000 00000000 00000000 00000000 ................................ 0001A0
 00000000 00000000 00000000 00000000 00000000 00000000 00000000 00000000 ................................ 0001C0
 00000000 00000000 00000000 00000000 00000000 00000000 00000000 00000000 ................................ 0001E0
```

```
Dump of file SATURN:[PCCOMMON.DUMP.DLL]SAFORMS.TMP;1 on 18-APR-1990 10:52:11.20
File ID (907,31,0)   End of file block 22 / Allocated 24

Virtual block number 13 (0000000D), 512 (0200) bytes

 00000000 00000000 00000000 00000000 00000019 00000000 00000000 00000000 ................................ 000000
 00000000 00000000 00000000 00000000 00000000 00000000 00000000 00000000 ................................ 000020
 00000000 00000000 00000000 00000000 00000000 00000000 00000000 00000000 ................................ 000040
 00000000 00000000 00000000 00000000 00000000 00000000 00000000 00000000 ................................ 000060
 00000000 00000000 00000000 00000000 00000000 00000000 00000000 00000000 ................................ 000080
 00000000 00000000 00000000 00000000 00000000 00000000 00000000 00000000 ................................ 0000A0
 00000000 00000000 00000000 00000000 00000000 00000000 00000000 00000000 ................................ 0000C0
 00000000 00000000 00000000 00000000 00000000 00000000 00000000 00000000 ................................ 0000E0
 00000000 00000000 00000000 00000000 001A0000 00000000 00000000 00000000 ................................ 000100
 00000000 00000000 00000000 00000000 00000000 00000000 00000000 00000000 ................................ 000120
 00000000 00000000 00000000 00000000 00000000 00000000 00000000 00000000 ................................ 000140
 00000000 00000000 00000000 00000000 00000000 00000000 00000000 00000000 ................................ 000160
 00000000 00000000 00000000 00000000 00000000 00000000 00000000 00000000 ................................ 000180
 00000000 00000000 00000000 00000000 00000000 00000000 00000000 00000000 ................................ 0001A0
 00000000 00000000 00000000 00000000 00000000 00000000 00000000 00000000 ................................ 0001C0
 00000000 00000000 00000000 00000000 00000000 00000000 00000000 00000000 ................................ 0001E0

Dump of file SATURN:[PCCOMMON.DUMP.DLL]SAFORMS.TMP;1 on 18-APR-1990 10:52:11.20
File ID (907,31,0)   End of file block 22 / Allocated 24

Virtual block number 14 (0000000E), 512 (0200) bytes

 00000000 00000000 00000000 0000001B 00000000 00000000 00000000 00000000 ................................ 000000
 00000000 00000000 00000000 00000000 00000000 00000000 00000000 00000000 ................................ 000020
 00000000 00000000 00000000 00000000 00000000 00000000 00000000 00000000 ................................ 000040
 00000000 00000000 00000000 00000000 00000000 00000000 00000000 00000000 ................................ 000060
 00000000 00000000 00000000 00000000 00000000 00000000 00000000 00000000 ................................ 000080
 00000000 00000000 00000000 00000000 00000000 00000000 00000000 00000000 ................................ 0000A0
 00000000 00000000 00000000 00000000 00000000 00000000 00000000 00000000 ................................ 0000C0
 00000000 00000000 00000000 00000000 00000000 00000000 00000000 00000000 ................................ 0000E0
 00000000 00000000 00000000 001C0000 00000000 00000000 00000000 00000000 ................................ 000100
 00000000 00000000 00000000 00000000 00000000 00000000 00000000 00000000 ................................ 000120
 00000000 00000000 00000000 00000000 00000000 00000000 00000000 00000000 ................................ 000140
 00000000 00000000 00000000 00000000 00000000 00000000 00000000 00000000 ................................ 000160
 00000000 00000000 00000000 00000000 00000000 00000000 00000000 00000000 ................................ 000180
 00000000 00000000 00000000 00000000 00000000 00000000 00000000 00000000 ................................ 0001A0
 00000000 00000000 00000000 00000000 00000000 00000000 00000000 00000000 ................................ 0001C0
 00000000 00000000 00000000 00000000 00000000 00000000 00000000 00000000 ................................ 0001E0

Dump of file SATURN:[PCCOMMON.DUMP.DLL]SAFORMS.TMP;1 on 18-APR-1990 10:52:11.20
File ID (907,31,0)   End of file block 22 / Allocated 24

Virtual block number 15 (0000000F), 512 (0200) bytes

 00000000 4D524F46 4D50001D 00000000 00000000 00000000 00000000 00000000 ......................PMFORM.... 000000
 00000000 00000000 00000000 00000000 00000000 00000000 00000000 00000000 ................................ 000020
 00000000 00000000 00000000 00000000 00000000 00000000 00000000 00000000 ................................ 000040
 00000000 00000000 00000000 00000000 00000000 00000000 00000000 00000000 ................................ 000060
 00000000 00000000 00000000 00000000 00000000 00000000 00000000 00000000 ................................ 000080
 00000000 00000000 00000000 00000000 00000000 00000000 00000000 00000000 ................................ 0000A0
 00000000 00000000 00000000 00000000 00000000 00000000 00000000 00000000 ................................ 0000C0
 00000000 00000000 00000000 00000000 00000000 00000000 00000000 00000000 ................................ 0000E0
 00004D52 4F464453 001E0000 00000000 00000000 00000000 00000000 00000000 ........................SDFORM.. 000100
 00000000 00000000 00000000 00000000 00000000 00000000 00000000 00000000 ................................ 000120
 00000000 00000000 00000000 00000000 00000000 00000000 00000000 00000000 ................................ 000140
 00000000 00000000 00000000 00000000 00000000 00000000 00000000 00000000 ................................ 000160
 00000000 00000000 00000000 00000000 00000000 00000000 00000000 00000000 ................................ 000180
 00000000 00000000 00000000 00000000 00000000 00000000 00000000 00000000 ................................ 0001A0
 00000000 00000000 00000000 00000000 00000000 00000000 00000000 00000000 ................................ 0001C0
 00000000 00000000 00000000 00000000 00000000 00000000 00000000 00000000 ................................ 0001E0
```

```
Dump of file SATURN:[PCCOMMON.DUMP.DLL]SAFORMS.TMP;1 on 18-APR-1990 10:52:11.20
File ID (907,31,0)   End of file block 22 / Allocated 24

Virtual block number 16 (00000010), 512 (0200) bytes

4D524F46 4C46001F 00000000 00000000 00000000 00000000 00000000 00000000 ..........................FLFORM 000000
00000000 00000000 00000000 00000000 00000000 00000000 00000000 00000000 ................................ 000020
00000000 00000000 00000000 00000000 00000000 00000000 00000000 00000000 ................................ 000040
00000000 00000000 00000000 00000000 00000000 00000000 00000000 00000000 ................................ 000060
00000000 00000000 00000000 00000000 00000000 00000000 00000000 00000000 ................................ 000080
00000000 00000000 00000000 00000000 00000000 00000000 00000000 00000000 ................................ 0000A0
00000000 00000000 00000000 00000000 00000000 00000000 00000000 00000000 ................................ 0000C0
00000000 00000000 00000000 00000000 00000000 00000000 00000000 00000000 ................................ 0000E0
4F465349 00210000 00000000 00000000 00000000 00000000 00000000 00000000 ..........................!.ISFO 000100
00000000 00000000 00000000 00000000 00000000 00000000 00000000 00004D52 RM.............................. 000120
00000000 00000000 00000000 00000000 00000000 00000000 00000000 00000000 ................................ 000140
00000000 00000000 00000000 00000000 00000000 00000000 00000000 00000000 ................................ 000160
00000000 00000000 00000000 00000000 00000000 00000000 00000000 00000000 ................................ 000180
00000000 00000000 00000000 00000000 00000000 00000000 00000000 00000000 ................................ 0001A0
00000000 00000000 00000000 00000000 00000000 00000000 00000000 00000000 ................................ 0001C0
00000000 00000000 00000000 00000000 00000000 00000000 00000000 00000000 ................................ 0001E0
```

```
Dump of file SATURN:[PCCOMMON.DUMP.DLL]SAFORMS.TMP;1 on 18-APR-1990 10:52:11.20
File ID (907,31,0)   End of file block 22 / Allocated 24

Virtual block number 17 (00000011), 512 (0200) bytes

52500022 00000000 00000000 00000000 00000000 00000000 00000000 00000000 ............................".PR 000000
00000000 00000000 00000000 00000000 00000000 00000000 00000000 4D524F46 FORM............................ 000020
00000000 00000000 00000000 00000000 00000000 00000000 00000000 00000000 ................................ 000040
00000000 00000000 00000000 00000000 00000000 00000000 00000000 00000000 ................................ 000060
00000000 00000000 00000000 00000000 00000000 00000000 00000000 00000000 ................................ 000080
00000000 00000000 00000000 00000000 00000000 00000000 00000000 00000000 ................................ 0000A0
00000000 00000000 00000000 00000000 00000000 00000000 00000000 00000000 ................................ 0000C0
00000000 00000000 00000000 00000000 00000000 00000000 00000000 00000000 ................................ 0000E0
00260000 00000000 00000000 00000000 00000000 00000000 00000000 00000000 ..............................&. 000100
00000000 00000000 00000000 00000000 00000000 00000000 00004D52 4F464C46 FLFORM.......................... 000120
00000000 00000000 00000000 00000000 00000000 00000000 00000000 00000000 ................................ 000140
00000000 00000000 00000000 00000000 00000000 00000000 00000000 00000000 ................................ 000160
00000000 00000000 00000000 00000000 00000000 00000000 00000000 00000000 ................................ 000180
00000000 00000000 00000000 00000000 00000000 00000000 00000000 00000000 ................................ 0001A0
00000000 00000000 00000000 00000000 00000000 00000000 00000000 00000000 ................................ 0001C0
00000000 00000000 00000000 00000000 00000000 00000000 00000000 00000000 ................................ 0001E0
```

```
Dump of file SATURN:[PCCOMMON.DUMP.DLL]SAFORMS.TMP;1 on 18-APR-1990 10:52:11.20
File ID (907,31,0)   End of file block 22 / Allocated 24

Virtual block number 18 (00000012), 512 (0200) bytes

00000000 00000000 00000000 00000000 00000000 00000000 00000000 00000000 ................................ 000000
00000000 00000000 00000000 00000000 00000000 00000000 4D524F46 4C460027 '.FLFORM........................ 000020
00000000 00000000 00000000 00000000 00000000 00000000 00000000 00000000 ................................ 000040
00000000 00000000 00000000 00000000 00000000 00000000 00000000 00000000 ................................ 000060
00000000 00000000 00000000 00000000 00000000 00000000 00000000 00000000 ................................ 000080
00000000 00000000 00000000 00000000 00000000 00000000 00000000 00000000 ................................ 0000A0
00000000 00000000 00000000 00000000 00000000 00000000 00000000 00000000 ................................ 0000C0
00000000 00000000 00000000 00000000 00000000 00000000 00000000 00000000 ................................ 0000E0
00000000 00000000 00000000 00000000 00000000 00000000 00000000 00000000 ................................ 000100
00000000 00000000 00000000 00000000 00000000 00004D52 4F464C46 00280000 ..(.FLFORM...................... 000120
00000000 00000000 00000000 00000000 00000000 00000000 00000000 00000000 ................................ 000140
00000000 00000000 00000000 00000000 00000000 00000000 00000000 00000000 ................................ 000160
00000000 00000000 00000000 00000000 00000000 00000000 00000000 00000000 ................................ 000180
00000000 00000000 00000000 00000000 00000000 00000000 00000000 00000000 ................................ 0001A0
00000000 00000000 00000000 00000000 00000000 00000000 00000000 00000000 ................................ 0001C0
00000000 00000000 00000000 00000000 00000000 00000000 00000000 00000000 ................................ 0001E0
```

```
Dump of file SATURN:[PCCOMMON.DUMP.DLL]SAFORMS.TMP;1 on 18-APR-1990 10:52:11.20
File ID (907,31,0)   End of file block 22 / Allocated 24

Virtual block number 19 (00000013), 512 (0200) bytes

00000000 00000000 00000000 00000000 00000000 00000000 00000000 00000000 ................................ 000000
00000000 00000000 00000000 00000000 00000000 4D524F46 53490029 00000000 ....).ISFORM.................... 000020
00000000 00000000 00000000 00000000 00000000 00000000 00000000 00000000 ................................ 000040
00000000 00000000 00000000 00000000 00000000 00000000 00000000 00000000 ................................ 000060
00000000 00000000 00000000 00000000 00000000 00000000 00000000 00000000 ................................ 000080
00000000 00000000 00000000 00000000 00000000 00000000 00000000 00000000 ................................ 0000A0
00000000 00000000 00000000 00000000 00000000 00000000 00000000 00000000 ................................ 0000C0
00000000 00000000 00000000 00000000 00000000 00000000 00000000 00000000 ................................ 0000E0
00000000 00000000 00000000 00000000 00000000 00000000 00000000 00000000 ................................ 000100
00000000 00000000 00000000 00000000 00004D52 4F465349 002A0000 00000000 ......*.ISFORM.................. 000120
00000000 00000000 00000000 00000000 00000000 00000000 00000000 00000000 ................................ 000140
00000000 00000000 00000000 00000000 00000000 00000000 00000000 00000000 ................................ 000160
00000000 00000000 00000000 00000000 00000000 00000000 00000000 00000000 ................................ 000180
00000000 00000000 00000000 00000000 00000000 00000000 00000000 00000000 ................................ 0001A0
00000000 00000000 00000000 00000000 00000000 00000000 00000000 00000000 ................................ 0001C0
00000000 00000000 00000000 00000000 00000000 00000000 00000000 00000000 ................................ 0001E0

Dump of file SATURN:[PCCOMMON.DUMP.DLL]SAFORMS.TMP;1 on 18-APR-1990 10:52:11.20
File ID (907,31,0)   End of file block 22 / Allocated 24

Virtual block number 20 (00000014), 512 (0200) bytes

00000000 00000000 00000000 00000000 00000000 00000000 00000000 00000000 ................................ 000000
00000000 00000000 00000000 00000000 4D524F46 53490028 00000000 00000000 ........+.ISFORM................ 000020
00000000 00000000 00000000 00000000 00000000 00000000 00000000 00000000 ................................ 000040
00000000 00000000 00000000 00000000 00000000 00000000 00000000 00000000 ................................ 000060
00000000 00000000 00000000 00000000 00000000 00000000 00000000 00000000 ................................ 000080
00000000 00000000 00000000 00000000 00000000 00000000 00000000 00000000 ................................ 0000A0
00000000 00000000 00000000 00000000 00000000 00000000 00000000 00000000 ................................ 0000C0
00000000 00000000 00000000 00000000 00000000 00000000 00000000 00000000 ................................ 0000E0
00000000 00000000 00000000 00000000 00000000 00000000 00000000 00000000 ................................ 000100
00000000 00000000 00000000 00000000 00000000 00230000 00000000 00000000 ..........#..................... 000120
00000000 00000000 00000000 00000000 00000000 00000000 00000000 00000000 ................................ 000140
00000000 00000000 00000000 00000000 00000000 00000000 00000000 00000000 ................................ 000160
00000000 00000000 00000000 00000000 00000000 00000000 00000000 00000000 ................................ 000180
00000000 00000000 00000000 00000000 00000000 00000000 00000000 00000000 ................................ 0001A0
00000000 00000000 00000000 00000000 00000000 00000000 00000000 00000000 ................................ 0001C0
00000000 00000000 00000000 00000000 00000000 00000000 00000000 00000000 ................................ 0001E0

Dump of file SATURN:[PCCOMMON.DUMP.DLL]SAFORMS.TMP;1 on 18-APR-1990 10:52:11.20
File ID (907,31,0)   End of file block 22 / Allocated 24

Virtual block number 21 (00000015), 512 (0200) bytes

00000000 00000000 00000000 00000000 00000000 00000000 00000000 00000000 ................................ 000000
00000000 00000000 00000000 00000000 00000024 00000000 00000000 00000000 ............$................... 000020
00000000 00000000 00000000 00000000 00000000 00000000 00000000 00000000 ................................ 000040
00000000 00000000 00000000 00000000 00000000 00000000 00000000 00000000 ................................ 000060
00000000 00000000 00000000 00000000 00000000 00000000 00000000 00000000 ................................ 000080
00000000 00000000 00000000 00000000 00000000 00000000 00000000 00000000 ................................ 0000A0
00000000 00000000 00000000 00000000 00000000 00000000 00000000 00000000 ................................ 0000C0
00000000 00000000 00000000 00000000 00000000 00000000 00000000 00000000 ................................ 0000E0
00000000 00000000 00000000 00000000 00000000 00000000 00000000 00000000 ................................ 000100
00000000 00000000 00000000 00000000 00250000 00000000 00000000 00000000 ...............%................ 000120
00000000 00000000 00000000 00000000 00000000 00000000 00000000 00000000 ................................ 000140
00000000 00000000 00000000 00000000 00000000 00000000 00000000 00000000 ................................ 000160
00000000 00000000 00000000 00000000 00000000 00000000 00000000 00000000 ................................ 000180
00000000 00000000 00000000 00000000 00000000 00000000 00000000 00000000 ................................ 0001A0
00000000 00000000 00000000 00000000 00000000 00000000 00000000 00000000 ................................ 0001C0
00000000 00000000 00000000 00000000 00000000 00000000 00000000 00000000 ................................ 0001E0
```

```
Dump of file SATURN:[PCCOMMON.DUMP.DLL]SAFORMS.TMP;1 on 18-APR-1990 10:52:11.20
File ID (907,31,0)   End of file block 22 / Allocated 24

Virtual block number 22 (00000016), 512 (0200) bytes

 00000000 00000000 00000000 00000000 00000000 00000000 00000000 00000000 ................................ 000000
 00000000 00000000 4D524F46 4E41002F 00000000 00000000 00000000 00000000 ................/.ANFORM........ 000020
 00000000 00000000 00000000 00000000 00000000 00000000 00000000 00000000 ................................ 000040
 00000000 00000000 00000000 00000000 00000000 00000000 00000000 00000000 ................................ 000060
 00000000 00000000 00000000 00000000 00000000 00000000 00000000 00000000 ................................ 000080
 00000000 00000000 00000000 00000000 00000000 00000000 00000000 00000000 ................................ 0000A0
 00000000 00000000 00000000 00000000 00000000 00000000 00000000 00000000 ................................ 0000C0
 00000000 00000000 00000000 00000000 00000000 00000000 00000000 00000000 ................................ 0000E0
 00000000 00000000 00000000 00000000 00000000 00000000 00000000 00000000 ................................ 000100
 00000000 00000000 00000000 00000000 00000000 00000000 00000000 00000000 ................................ 000120
 00000000 00000000 00000000 00000000 00000000 00000000 00000000 00000000 ................................ 000140
 00000000 00000000 00000000 00000000 00000000 00000000 00000000 00000000 ................................ 000160
 00000000 00000000 00000000 00000000 00000000 00000000 00000000 00000000 ................................ 000180
 00000000 00000000 00000000 00000000 00000000 00000000 00000000 00000000 ................................ 0001A0
 00000000 00000000 00000000 00000000 00000000 00000000 00000000 00000000 ................................ 0001C0
 00000000 00000000 00000000 00000000 00000000 00000000 00000000 00000000 ................................ 0001E0

Dump of file SATURN:[PCCOMMON.DUMP.DLL]SAFREE2.TMP;1 on 18-APR-1990 10:52:15.22
File ID (908,21,0)   End of file block 53 / Allocated 56

Virtual block number 1 (00000001), 512 (0200) bytes

 00000000 00000040 00000000 000000B8 0000FFFF 00000004 00000022 008A5A4D MZ.."...........|.......@....... 000000
 00000080 00000000 00000000 00000000 00000000 00000000 00000000 00000000 ................................ 000020
 6F6E6E61 63206D61 72676F72 70207369 685421CD 4C01B821 CD09B400 0EBA1F0E ..¤..Ç.ë|.LëIThis program canno 000040
 00000000 00000024 0A0D0D2E 65646F6D 20534F44 206E6920 6E757220 65622074 t be run in DOS mode....$....... 000060
 00070006 00000000 00020000 00000000 00058009 FF3CE269 000A01FD 0505454E NE..».. .iâ<..................... 000080
 00000000 00000000 00010001 00040000 00000287 0090008F 00740070 0040003C <.@.p.t......................... 0000A0
 02020E21 00000000 18800F00 188000F9 000F0F00 000F00F7 0B760F00 0B75002D -.u...v.%.......•.¯... ¯.....!... 0000C0
 430D0000 32454552 46415307 02D70001 27381EF1 2738042A 18700F21 19D0028B ..Å.!.p.*.8'þ.8'..■..SAFREE2...C 0000E0
 50050001 53014301 14003D00 10000700 01000002 434F5250 444E5754 4E45494C LIENTWNDPROC.........=...C.S...P 000100
 0C4D5448 45524955 5143414C 4D44006C 60640353 4C4C4143 534F4408 4E495740 MWIN.DOSCALLS.dml.DMLACQUIREHTM. 000120
 5F0E4954 4703444C 45494659 52455551 4C4D4400 4C45444F 4D454552 464C4D44 DMLFREEMODEL.DMLQUERYFIELD.GTI._ 000140
 46454449 54470E4C 4F4F544C 4C494B49 54470B4C 4F4F5445 54414552 43495447 GTICREATETOOL.GTIKILLTOO'.GTIDEF 000160
 47124753 4D444E45 53495447 0A47534D 54534F50 4954470A 434F5250 4C4F4F54 TOOLPROC.GTIPOSTMSG.GTISENDMSG.G 000180
 444E4957 4C4F4F54 54455349 54471057 4F444E49 574C4F4F 54595245 55514954 TIQUERYTOOLWINDOW.GTISETTC'' WIND 0001A0
 55415952 45555149 5447124C 4F4F5457 4F444E49 57595245 55514954 4712574F OW.GTIQUERYWINDOWTOOL.GTIQUERYAU 0001C0
 54455349 54471452 54504154 41445855 41544553 49544710 52545041 54414458 XDATAPTR.GTISETAUXDATAPTR.GTISET 0001E0

Dump of file SATURN:[PCCOMMON.DUMP.DLL]SAFREE2.TMP;1 on 18-APR-1990 10:52:15.22
File ID (908,21,0)   End of file block 53 / Allocated 56

Virtual block number 2 (00000002), 512 (0200) bytes

 47125355 434F464C 4F4F5454 45534954 470F5954 494C4942 49534956 4C4F4F54 TOOLVISIBILITY.GTISETTOOLFOCUS.G 000000
 48455441 4552434D 454D0D4D 454D0354 4E455241 504C4F4F 54595245 55514954 TIQUERYTOOLPARENT.MEM.MEMCREATEH 000020
 4B434F4C 42434F4C 4C414D45 4D0D5041 4548594F 52545345 44D4540 0E504145 EAP.MEMDESTROYHEAP.MEMALLOCBLOCK 000040
 03010245 54495257 534F4408 4F495303 52545354 45475455 41530A54 55415304 .SAUT.SAUTGETSTR.SIO.DOSWRITE... 000060
 6544206C 616E6F69 74636E75 46204153 204D5020 322F534F 23000002 05030398 .......#OS/2 PM SA Functional De 000080
 434F5250 4C4F4F54 524F5449 44454446 41531200 00726F74 69644520 70606F63 comp Editor...SAFDEDITORTOOLPROC 0000A0
 890042B8 D88EFFFF B81E5657 0000EAC8 00000000 00000000 00000000 00000001 ................àö..WV.|...Ä|B.. 0000C0
 868D026A 0000FF26 86C75033 FF2486C7 FF208689 FF228689 000088F6 5E8CF446 F¶.^-|....".... .ú.$.3Pú.&...j... 0000E0
 8688FC5E C40000FF FF9A5016 FC468D7F 6A6C6AFF 6AB6FF00 00FFFF9A 5016FF6A j..P......Ñj.jlj..F=.P.....á^=.. 000100
 01660010 9AFC76FF FE76FFFC 77FF26FE 77FF2606 5EC40406 46832747 8926FF6A j.&.G'.F..á^.&.w±&.w=.v±.v=...f. 000120
 0A76FF7D 5789267B 478926FC 5EC4FE57 8B26FC47 8B26065E C4040646 8308C483 .á..F..á^.&.G=&.W±á^=&.G(&.W).v. 000140
 3F47C726 FC5EC400 003D47C7 26FC5EC4 0000FFFF 9A505200 2105FE56 8BFC468B .F=.V±.|.RP.....á^=&úG=..á^=&úG? 000160
 B6FF0000 4147C726 FC5EC423 4789260A 4688FC5E C4000041 47C726FC 5EC40001 ..á^=&úGA..á^=.F.&.G#á^=&úGA...Ñ 000180
 016A0000 FFFF9A00 6A046A02 0068FFFF 68FFFF68 F476FFF6 76FFFF20 B6FFFF22 "..Ñ ..v-.v¶h..h..h..j.j......j. 0001A0
 C40000E9 03750000 3DFF1E86 890000FF FF9A5016 AE468DFC 76FFFE76 FF0A76FF .v..v±.v=.FÚ.P.........=..u.Õ..á 0001C0
 77FF267D 77FF26FC 5EC4AE76 FFB076FF 28578926 29478926 B05688AE 4688FC5E ^=.FÚ.V¯&.G)&.W+.v¯.vÚá^=&.w)&.w 0001E0
```

```
Dump of file SATURN:[PCCOMMON.DUMP.DLL]SAFREE2.TMP;1 on 18-APR-1990 10:52:15.22
File ID (908,21,0)   End of file block 53 / Allocated 56

Virtual block number 3 (00000003), 512 (0200) bytes

 86800000 FFFF9A46 6A5016FF 6C868D03 EE680000 FFFF9A50 16FF2886 80026A7B (j...(..P.....hY...l..PjF....... 000000
 10FF1686 C710C483 FFFF0046 9A5016B2 468D004D 681E5016 FF6C868D 5016FF28 (..P..l..P.hM..Fý.P.F....ó.ú.... 000020
 80F476FF F676FF50 16FF2486 80FF1686 FFFF18B6 FF016A00 6A0000FF 1886C708 .ú.:....j.j..Ñ...Ñ....$..P.v-.v¶. 000040
 86890000 FFFF9A50 16F8468D 02D76802 0036FF26 18EC068E 006A006A 50168246 Fý.Pj.j...š.&.6..h■..F½.P....... 000060
 8BF84688 FC5EC42F 5789262D 478926FF 1C9688FF 1A8688FC 5EC4FF1C 9689FF1A ......ó^■........&.G-&.W/Á^•.F½. 000080
 FE76FF0A 76FF0000 FFFF9AFF 1AB6FFFF 1CB6FF0A 76FF3357 89263147 8926FA56 V¹&.G1&.W3.v..Ñ...Ñ....... v..v± 0000A0
 8E0008B8 1E565700 0030C800 06CAC95F 5E1F0000 E90000B8 0000FFFF 9AFC76FF .v•.....|..Õ...^ èò..àO..W. ı... 0000C0
 02AB9A50 16E8468D 1076FF12 76FF0038 E903750C 460B0A46 8B013AE9 0E468BD8 Ä.F.Õ:..F..F.u.Õ8..v..v..FÒ.r..¨. 0000E0
 FF505299 E84688 1D AE682177 FF26FC5E C4000002 B89A5016 FC468DE8 76FF0000 ...vÒ.F■.P.|...ó^■&.wIhÛ..FÒ.RP. 000100
 EC468D00 6A006A10 76FF1276 FF012EE9 0000BA00 00B80000 03289A0A 76FF0C76 v..v..+...|..¤..Õ...v..v.j.j..Fš 000120
 00FFFF9A EC6AFF6A 5016EC46 8D0476FF D676FFD6 5689D446 890000FF FF9A5016 .P......Få.Vø.vø.vå.Fš.Pj.jš.... 000140
 FF000003 179A5016 E8468D10 76FF1276 FF00D5E9 0000FFFF 9AD476FF D676FF00 ..vø.vå.....Õ(..v..v..FÒ.P...... 000160
 801076FF 1276FF00 3FE90375 003D7F83 26FC5EC4 0000FFFF 9A5016FC 468DE876 vÒ.F■.P.....ó^■&..=.u.Õ?..v..v.. 000180
 D076FFD2 76FF0000 FFFF9A50 16D0468D 3D77FF26 FC5EC400 00FFFF9A 50160846 FÁ.P.....ó^■&.w=.FÁ.P......vØ.vÀ 0001A0
 76FF1276 FF0069E9 0000FFFF 9A080368 E476FFE0 76FFDC76 FFD876FF 006A006A j.j..vÄ.vÉ.vÀ.vòh.......Õi..v..v 0001C0
 830000FF FF9A006A 006A5016 EA468D1D B068E876 FF0000FF FF9A5016 E8468010 ..FÒ.P......vÒh¯..Fõ.Pj.j....... 0001E0

Dump of file SATURN:[PCCOMMON.DUMP.DLL]SAFREE2.TMP;1 on 18-APR-1990 10:52:15.22
File ID (908,21,0)   End of file block 53 / Allocated 56

Virtual block number 4 (00000004), 512 (0200) bytes

 23E90026 E90046E9 00008A00 00B80000 FFFF9A00 6AE876FF 000AE903 7500EA7E ~õ.u.Õ...vÒj......|..¤..ÕF.Õ&.Õ# 000000
 9AE90375 00293OFE FAE90375 00233DFE B6E90375 00003DFF 46E90375 00073D00 .=..u.ÕF.=..u.ÕÑ±=#.u.Õ¹±=).u.Õ. 000020
 00E90000 FFFF9A06 76FF0876 FF0A76FF 0C76FF0E 76FF1076 FF1276FF FFD7E9FF .Õ■..v..v..v..v..v..v..v......Õ. 000040
 0000BA00 00B80739 E90E4688 D88E020D B81E5657 00015CC8 000ECAC9 5F5E1F00 ..^_èò..à\..WV.|...Ä.F.Õ9.|..¤.. 000060
 03E49A50 16FC468D 1076FFFE AC868900 DD00009A 0A76FF0C 76FF1076 FF07BCE9 Õ¥.¯v..v..v....ї...¯±.v..F■.P.õ. 000080
 16FF0E86 8D1076FF 00000507 9A5016FC 468D1076 FF0794E9 0000BA00 00B80000 ..|..¤..Õ...v..F•.P......v...... 0000A0
 FC5EC47B 77FF267D 77FF26FC 5EC4FECA 968CFEC8 8689FEB6 868D0000 04599A50 P.Y.....Ñ±..à±..ò±ó^■&.w)&.w(ó^■ 0000C0
 AC868912 C4830000 FFFF9A10 76FF586A 5016FF54 868DFC76 FFFE76FF 2377FF26 &.w#.v±.v■..T..PjX.v.......ó...¯ 0000E0
 B6FF3D47 8926FF54 8688FC5E C4072CE9 99FEAC86 880008E9 037500FE ACBE83FE ±./¯±.u.Õ....¯±.Õ,.ó^•..T.&.G=.Ñ 000100
 00FF54BE 83007FE9 037400FE ACBE83FE AC868900 00047F9A 5016FEA4 868DFF54 T...Ê±.P.......¯±./¯±.t.Õ.../T.. 000120
 16FEB686 8DFEB0B6 FFFEB286 FF000002 E69A5016 FEB0868D 1076FF00 75E90375 u.Õu..v...¯±.P.l....Ñý±.Ñ¯±..Ñ±. 000140
 8689F9F7 00048999 FEB88688 FEB48689 F9F70004 8999FEBA 86880000 FFFF9A50 P.......¤±.¿..¼¹..Ç±..|±.¿..¼¹.. 000160
 50FEAE86 03FEBC86 8B50FEB4 8603FEBE 8688006A 006AFEA4 B6FFFEA6 B6FFFEAE Û±.Ñl±.ÑÊ±j.j.../±..Ç±P..¥±..Û±P 000180
 016AFF54 B6FF0000 03049A08 036850FE AE862BFE B8868B50 FEB4862B FEBA8688 ..¤±+.Ç±P..|±+.Û±Ph........ÑT.j. 0001A0
 FF26FC5E C4000005 349A5016 FC468D10 76FF0000 FFFF9AFF 5486FF00 00FFFF9A ......ÑT.......v..F■.P.4...ó^•&. 0001C0
 468D1076 FF0644E9 0000BA00 00B80000 FFFF9A00 6A006A00 6A006A1D AD683D77 w=hÜ.j.j.j.j......|..¤..ÕD..v..F 0001E0

Dump of file SATURN:[PCCOMMON.DUMP.DLL]SAFREE2.TMP;1 on 18-APR-1990 10:52:15.22
File ID (908,21,0)   End of file block 53 / Allocated 56

Virtual block number 5 (00000005), 512 (0200) bytes

 FC5EC425 4789260A 468BFC5E C4000AE9 03750846 0B06468B 0000057A 9A5016FC •.P.z....F..F.u.Õ..ó^■.F.&.G%ó^• 000000
 FEE90000 BA0000B8 00000595 9A0676FF 0876FF50 52991046 881DAE68 2177FF26 &.wIhÛ..F..RP.v..v......|..¤..Õ± 000020
 76FF0A76 FF0C76FF 10B26830 77FF26FC 5EC40000 05AB9A50 16FC468D 1076FF05 ..v..F■.P.¨...ó^■&.w=hý..v..v..v 000040
 C4000005 E69A5016 FC468D10 76FF05CD E90000BA 00008800 00067C9A 0676FF08 ..v..|...j..¤..Õë..v..F■.P.l...ó 000060
 57892607 8926065E C42F5788 26204788 26FC5EC4 07892602 47892600 00B80A5E ^.|..&.G.&..ó^■&.G-&.W/ó^.&...&.W 000080
 77FF26FC 5EC40000 06619A50 16FC468D 1076FF05 89E90595 E90000BA 00008802 .|..¤..Õ..Õ...v..F■.P.a...ó^■&.w 0000A0
 03EE6800 00013A9A 5016FECC 868D026A 7B77FF26 7D77FF26 FC5EC429 77FF262B +&.w)ó^■&.w)&.w(j...ä±.P.:...hY. 0000C0
 BA468D00 54681E50 16FF1286 8D5016FE CC868D00 00014A9A 466A5016 FF128680 .....PjF.J.....ä±.P.....P.hT..F¤ 0000E0
 B80000FF FF9A5016 BA468D20 77FF262F 77FF26FC 5EC410C4 83006E00 469A5016 .P.F.n..ó.ó^■&.w/&.w-.F¤.P.....| 000100
 FF1DB068 3D77FF26 FC5EC400 00023B9A 5016FC46 8D1076FF 0517E900 00BA0000 ..¤..Õ...v..F■.P.;...ó^•&.w=h¯.. 000120
 9EC4FEAA 9689FEA8 86890C56 880A4688 00000256 9A0676FF 0876FF0A 76FF0C76 v..v..v..v..V....F..V...´±..`±ó. 000140
 FC5EC400 0006E99A 5016FC46 8D1076FF 04CFE900 00BA0000 B8000107 C726FEA8 ´±&ú...|..¤..ÕÜ..v..F■.P.Õ...ó^■ 000160
 FF262B77 FF26FC5E C40000FF FF9A2777 FF26FC5E C4000003 3E9A006A 3D77FF26 &.w=j..>...ó^■&.w'.....ó^•&.w+&. 000180
 FC5EC400 0007119A 5016FC46 8D1076FF 048FE900 00BA0000 B80000FF FF9A2977 w).....|..¤..Õ...v..F■.P.....ó^■ 0001A0
 5016FC46 8D1076FF 0467E900 00BA0000 B8000025 47C726FC 5EC40000 3D47C726 &úG=..ó^■&úG%..|..¤..Õg..v..F■.P 0001C0
 0000075D 9A0676FF 0876FF0A 76FF0C76 FF10CC68 3D77FF26 FC5EC400 0007429A .B...ó^■&.w=hä..v..v..v..v..]... 0001E0
```

```
Dump of file SATURN:[PCCOMMON.DUMP.DLL]SAFREE2.TMP;1 on 18-APR-1990 10:52:15.22
File ID (908,21,0)   End of file block 53 / Allocated 56

Virtual block number 6 (00000006), 512 (0200) bytes

 0E76FF21 77FF26FC 5EC40000 077C9A50 16FC468D 1076FF04 36E90000 BA000088 |..¤..Õ6..v..F=.P.|...á^=&.wl.v. 000000
 0A468804 02E999FE AC8688FE AC868900 0005649A 0676FF08 76FF0A76 FF0C76FF .v..v..v..v..d.....¯±..¯±.Õ...F. 000020
 FC5EC400 1FE90375 003D7F83 26FC5EC4 000007C1 9A5016FC 468D1076 FF01CAE9 Õò..v..F=.P.ė...á^=&..=.u.Õ..á^= 000040
 830317E9 FEAC8689 000007F1 9A0676FF 0876FF0A 76FF0C76 FF1DAF68 3D77FF26 &.w=h€..v..v..v..v..þ.....¯±Õ... 000060
 6A036A01 6A006A01 6A006A00 0008289A 5016FC46 8D1076FF 0055E903 7401067E ~..t.ÕU..v..F=.P.(...j.j.j.j.j.j 000080
 016A006A 01F16800 6A1DAF68 2177FF26 FC5EC400 0008099A 50520000 08029A01 ......RP.....á^=&.wlh€.j.hþ.j.j. 0000A0
 0000B800 0008409A 50520000 08399A01 6A016A01 6A006A01 6A006A00 0008589A .X...j.j.j.j.j.j..9...RP.ə...|.. 0000C0
 016A006A 00000909 9A5016FC 468D1076 FF0055E9 03740106 7E830359 E900008A ¤..ÕY..~..t.ÕU..v..F=.P.....j.j. 0000E0
 006A1DAF 682177FF 26FC5EC4 00000870 9A505200 0008699A 016A036A 016A006A j.j.j.j..i...RP.p...á^=&.wlh€.j. 000100
 9A505200 00FFFF9A 016A016A 016A006A 016A006A 0000092D 9A016A00 6A01EF68 hÿ.j.j..-...j.j.j.j.j.j......RP. 000120
 6A5016FF 56868D03 E968002B E9037401 067E8302 F2E90000 BA000088 0000FFFF ....|..¤..Õ·..~..t.Õ+.hÕ...V..Pj 000140
 0008EA9A 206A006A 006A006A 5016FF56 868D016A 006A016A 006A0000 08CF9A64 d.ü...j.j.j.j...V..Pj.j.j.j .õ.. 000160
 199A646A 5016FF56 868D03ED 68002BE9 03740106 7E8302B5 E900008A 00008800 .|..¤..Õç..~..t.Õ+.hÙ...V..Pjd.. 000180
 00880000 FFFF9A20 6A006A00 6A006A50 16FF5686 8D016A00 6A016A00 6A000006 ...j.j.j.j...V..Pj.j.j.j .....|. 0001A0
 067E8300 0003CE9A 5016FC46 8D1076FF 026FE900 008A0000 880278E9 00008A00 .¤..Õx.|..¤..Õo..v..F=.P.ö....~. 0001C0
 00051E9A 0676FF08 76FF0A76 FF0C76FF 0E76FF21 77FF26FC 5EC4001B E9037401 .t.Õ..á^=&.wl.v..v..v..v..v..... 0001E0

Dump of file SATURN:[PCCOMMON.DUMP.DLL]SAFREE2.TMP;1 on 18-APR-1990 10:52:15.22
File ID (908,21,0)   End of file block 53 / Allocated 56

Virtual block number 7 (00000007), 512 (0200) bytes

 0950A7FF 2E93C003 FFB8E903 76008A3D 01A52D01 89E90235 E900008A 00008800 .|..¤..Õ5.Õ..-Ē.=¤.v.Õ|..å...ÌP. 000000
 07730900 087D087D 07730900 087D0900 087D087D 087D0900 087D0900 0900087D )......)...).).)...)...s.).)...s. 000020
 08F70900 087D087D 087D087D 0900087D 0900087D 09000900 09000900 087D0773 s.)........)...)...).).).)...¥. 000040
 07730773 07730900 07730773 07730900 09000900 09000900 090008F7 07730773 s.s.¥.............s.s.s...s.s.s. 000060
 07730773 07730773 09000773 07730773 07730773 07730773 07730773 09000773 s...s.s.s.s.s.s.s.s.s...s.s.s.s. 000080
 09000900 090007AF 087D0816 0900087D 09000900 09000900 087D087D 09000773 s...).).........)......).€....... 0000A0
 07730773 07730773 07730773 09000900 07730773 0900087D 09000900 07730900 ..s.....)...s.s.....s.s.s.s.s.s. 0000C0
 0900087D 0900087D 09000900 09000900 09000900 09000900 087D0773 07730773 s.s.s.)...................)...)... 0000E0
 09000900 09000900 087D0900 087D087D 0900087D 087D087D 09000900 0900087D )........).).)...).)...)......... 000100
 088A088A 088A088A 087D087D 087D0900 08F708F7 087D0900 09000900 09000900 ..........).¥.¥...).).).¤.¤.¤.¤. 000120
 09000900 09000900 09000900 09000900 09000900 09000900 0900088A 088A088A ¤.¤.¤........................... 000140
 09000900 09000900 09000900 09000900 09000900 09000900 09000900 09000900 ................................ 000160
 FF0C76FF 0E76FF10 76FF0773 07730773 088A07AF 08160900 09000900 09000900 ............€.¤.s.s.s..v..v..v.. 000180
 0033E903 76FA40E9 03751DAE 3D0083E9 008FE900 00FFFF9A 0676FF08 76FF0A76 v..v..v......Õ..Õ..=Ù.u.Õə¹v.Õ3. 0001A0
 FBD0E903 7510053D FB98E903 7510043D F8B3E903 7510033D F8B2E903 7510013D =..u.Õý½=..u.Õ°½=..u.Õ.«=..u.ÕÅ« 0001C0
 0013E903 76FC0EE9 03751DB1 3DFFA3E9 F9DEE903 751DAD3D FBF0E903 7510CC3D =ä.u.Õþ«=Ù.u.Õß¹ÕÊ.=Ý.u.Õ.=v.Õ.. 0001E0

Dump of file SATURN:[PCCOMMON.DUMP.DLL]SAFREE2.TMP;1 on 18-APR-1990 10:52:15.22
File ID (908,21,0)   End of file block 53 / Allocated 56

Virtual block number 8 (00000008), 512 (0200) bytes

 03751DB4 3DFA26E9 03751DB2 3DFF83E9 FB18E903 751DB03D FC35E903 751DAF3D =£.u.Õ5==¯.u.Õ.«Õ..=ý.u.Õ&ª=Ç.u. 000000
 1F0000E9 00008A00 0088FF60 E9FA7AE9 03753A33 3DF880E9 03751DB6 3DFA4FE9 ÕO¹=Ñ.u.Õ.½=3:u.Õz¹Õ`.|..¤..Õ... 000020
 02006800 0407A402 03000300 0100EA01 03000000 01038F00 0200250C CAC95F5E ^ èÒ.%...ê........Õ.......Ê...k.. 000040
 02008800 0108AD01 0300F100 0404FA02 03000800 0104E601 03000000 03063500 .5.......|.......ª...þ...Ù...... 000060
 03001000 01064801 03007600 04072C02 03008C00 0101AA01 03000000 0503A000 ..........^........v...K....... 000080
 05001A00 01020501 03008100 0403F202 03010100 04009C02 03009300 01049201 ....................f....... 0000A0
 0300AD00 01028D01 03009400 0401E602 03001400 0300FF02 03020500 0100E000 .À.......................Ù.. 0000C0
 03002200 03060302 03008200 01038A01 03002E00 01029801 03002D00 01027301 .s...-..............ý...Æ...". 0000E0
 03012600 0506C302 03002F00 03060902 0300A500 04022E02 03011800 05003502 .5..........Ê......./...û...&.. 000100
 03005800 01070201 03004100 04042602 03013500 05004702 03008800 0406A902 .`....|...G...5...&...A...®...[.. 000120
 03014800 06089202 03005000 04068702 0300CB00 0401F402 03005C00 0107D901 .\...\...¶...ù...ñ...P.......H.. 000140
 01CB0001 B81F0200 3E89D88E FFFF881E 00005C00 040AD902 03000C00 0404F102 .þ...Ê...\...\...|...Ä.>...|..ù. 000160
 00000000 00000000 00000000 00000000 00000000 00000000 00000400 02000200 ................................ 000180
 A8C78806 7EC4D1F7 AEF2FFFF B9C033C0 8ED88CFE 880A76C5 1EDE88D7 8BEC8855 U.ã.a.ã.év..±.Ã.ã3ã¿..ÙÄ1é~..ú´ 0001A0
 89EC468D 56570000 16C8CB5D C28C1FFA 8BF388A4 F3C913A5 F3E90149 A4027401 .t.ÉIÌÕµÉ.ê¤É.¤.ª..õ]ùà...WV.FÌ. 0001C0
 06478926 08568806 4688420A 47C626F8 5EC4FE56 8CFC4689 0E468DFA 568CF846 F%.V¹.F..F=.V±á^¥&6G.B.F..V.&.G. 0001E0
```

```
Dump of file SATURN:[PCCOMMON.DUMP.DLL]SAFREE2.TMP;1 on 18-APR-1990 10:52:15.22
File ID (908,21,0)   End of file block 53 / Allocated 56

Virtual block number 9 (00000009), 512 (0200) bytes

 023C9A53 060A76FF 0C76FFFC 76FF167F FF0447C7 26025789 26078926 08578926 &.W.&..&.W.&úG.....v=.v..v..S.<. 000000
 EB058826 02478E26 07FF263F 8B26C02A 1278044F FF26F85E C4F0880C C48300BB £..6..Þ6^½&.O.x.*à&.?&..&.G.&..Š 000020
 26085EC4 56570000 08C8CBC9 5F5EC68B 06C483FF FF00C69A 006A53FA 76FF900F ...v*Sj..6....6..6^_èùà...WV6^.& 000040
 468910A2 05E001C1 03E0D1C8 8BF9F700 0CB99904 AE2DC38B FA4689E4 2A0B478A .G.*ð.F*.ú-Û..¿..¥*¯àîÁ.èîÁ.Á..F 000060
 5EC49001 2BE9FFFF B8200A4F 8026085E C40F7440 0A47F626 0774830A 47F626F8 ½&-G..t.&-G.@t.6^.&.O. ¡..Ö+..6^ 000080
 EF0A6780 26020A4F 802690E2 EB000004 47C72620 0A4F8026 0E74010A 47F62608 .&-G..t.&.O. &úG...Šã.&.O..&.g.ÿ 0000A0
 06D86BF9 F7000CB9 9904AE2D C3884C75 0C0A47F6 26FC7689 F08B0447 8926C02B +à&.G..Þ.v=&-G..uL.ù-Û..¿..¥*kÄ. 0000C0
 FF0A7E81 167504C6 087E810E 74016F0A 7E810775 048A087E 81377501 10A287F6 -.Å..u7.-.¤.u..-.o.t..-.6.u..-.. 0000E0
 5EC404C4 830C51E8 0876FF0A 76FF0C75 C00B02C4 8301E210 549AFA76 FF0F75FF .u..v*.T.ã..6..âu..v..v.ÒQ..6.6^ 000100
 085E8B67 740110A2 87F606D8 68F9F700 0CB99904 AE2DC38B 1575080A 47F62608 .&-G..u..ù-Û..¿..¥*kÄ.-.Å..tg.^. 000120
 89264802 458BF87E 88025789 26078926 4008578B 2606478B 2606772B 26378B26 &.7&+w.&.G.&.W.@&..&.W..-½.E.H&. 000140
 F6FA5E8B 19EBFC46 8908C483 02000EA4 9AFA76FF 0677FF26 5256167E F60B0447 G..--.VR&.w..v*.Ê....6..F=Š..^*- 000160
 2606468A 065FC426 085EC408 C4830223 0E669A53 006A006A 026A0F74 20168387 .*. t.j.j.j.S.f.#..6.6^.&6_..F.& 000180
 0374FC76 39FC4689 08C48300 900EA49A FA76FF50 1606468D 5600018E 17EB0788 ..Š./..V.F..P.v*.Ê....6..F=9v=t. 0001A0
 FE1E8C19 FCA31A02 88017910 789A000A 88EC8855 CBC95F5E E42A0646 8AFECCE9 Õä±.F.*ð^_èÙU.š¡...x.y.¡..Ê=...± 0001C0
 0019F806 C719D416 8919D2A3 08568806 468819EE 168919EC A310568B 0E468819 ..F..V.Èš¯...Ÿ..F..V.È0...à.ú.½.. 0001E0

Dump of file SATURN:[PCCOMMON.DUMP.DLL]SAFREE2.TMP;1 on 18-APR-1990 10:52:15.22
File ID (908,21,0)   End of file block 53 / Allocated 56

Virtual block number 10 (0000000A), 512 (0200) bytes

 D8A319DC A3C02800 0119FA06 C7030BE9 037425F6 7E80038D E9000019 F606C700 .ú.-...Õ...—%t.Õ..ú.*...+àÈÈ.ÈÄ 000000
 260A5EC4 00201B62 06C719EA A319D0A3 1906A319 F0A319F2 A319DAA3 19F4A319 .È¶.ÈÖ.È·.Èþ.È=.ÈÄ.Èõ.ú.b. .6^.& 000020
 C719DC06 FF0D7528 3F80260A 5E88903E EB00301B 6206C70A 46FF4975 30017F80 ...0uI.F.ú.b.0.Š>..^.&.?+u...É.ú 000040
 190006FF 9014EB19 F006FF1A 750019DC 3E830E75 203F8026 9028EB00 0019F006 .Þ...Š(.&.? u..>É..u...Þ.Š....Á. 000060
 C483097B E80E5098 078A260A 5E880A46 FF19EA06 FFC7752D 3F80260A 5EC40DE8 Š.6^.&.?-uú..ð..F..^.&...P.Òx..6 000080
 1A003E83 0C56890A 468908C4 8308C7E8 0E1A0068 1E0A76FF 0C76FFDD 75C00802 ..àuI.v..v..h...Òú..6..F..V..>.. 0000A0
 6206C706 75301862 3E830D74 0019EA3E 831A00A3 D8F71A00 A119EA06 FF0C7D00 .)...ð.À..¥ÀÈ...>ð..t..>b.0u.ú.b 0000C0
 83087BE8 0E19FA68 1E0A76FF 060A46FF 19F206FF 20752E3F 80260A5E C400201B . .6^.&.?.u-..·..F...v..h*..Ò(.. 0000E0
 98078A26 0A5EC419 F20EFF00 0119FA06 C70A7D00 19FA3E83 0C56890A 468908C4 6..F..V..>*..).ú.*.....·.6^.&... 000100
 750019DA 3E830002 19DA06C7 0675006C 302B7400 68304074 004E3030 7400463D =F.t==N.t@=h.t+=l.u.ú.Ŏ....>Ŏ..u 000120
 0001190A 06C79002 4EE91C75 003F8026 0A5EC40A 46FF0375 4C3F8026 0A5EC409 .6^.&.?Lu..F.6^.&.?.u.ÕN..ú.Ŏ... 000140
 47300A74 00453DF8 46899807 8A26C8EB 0008190A 06C7D0EB 0010190A 06C7D8EB ŠÃú.Ŏ...ŠÃú.Ŏ...Šà&....F½=E.t.=G 000160
 00633D01 91E9037E 78740069 30F84688 20F84683 19D806FF 08750058 3D057400 .t.=X.u...Ä..F½ .F½=i.tx-.Õ..=c. 000180
 EC1EC415 7502190A 3E839001 59E90140 E9037500 25300152 E9037E01 3FE90375 u.Õ?.-.ÕR.=%.u.Õ@.ÕY...>Ŏ..u.6.š 0001A0
 83078926 19F6A11F C42619EC 1EC40DEB 00000247 C7260789 2619F6A1 1FC42619 .&6.À-.&..&úG...Š.6.š.&6.À-.&... 0001C0
 0A47F626 19D21EC4 018DE903 740019F6 3E830170 E9037500 19F83E83 0419EC06 .š...>½..u.Õp..>-..t.Õ§.6.0.&-G. 0001E0

Dump of file SATURN:[PCCOMMON.DUMP.DLL]SAFREE2.TMP;1 on 18-APR-1990 10:52:15.22
File ID (908,21,0)   End of file block 53 / Allocated 56

Virtual block number 11 (0000000B), 512 (0200) bytes

 EB02C483 019EE80E 0A6A0000 19D006C7 19F406FF 01ACE9FF FF8801AF E9037520  u.Õ£.¡..Õ¯...¶.ú.Å...j..Ò...6.Š 000000
 E9037508 19DA3E83 000419FA 06C719F2 06FF19D8 06FF19D6 06FFF2EB 086A90C3 ū.j.Š·..ø...Ä...·.ú.*....>Ŏ..u.Ŏ 000020
 EA3E83FA 46891A00 A128741A 000639FA 4689190A A3C0287A 740119DA 3E830081 ...>Ŏ..tz+àÈÖ..F*9...t(Å...F*.>ð 000040
 831A00A3 C028027D C00B1A00 A1051A00 2E839090 13EB0000 1A0006C7 0A740019 ..t.ú.....Š........Å...à).+àÈ... 000060
 19EA3E83 227400FA 7E8302C4 83048DE8 0E3A6A02 C4830130 E80E106A 0219EC06 .š..j..Ò0..6.j:.Ò...6..-*.t".>ð. 000080
 2E830000 1A0006C7 9007EB1A 00A3C02B 027DC008 1A00A300 052DFA46 88157400 .t..F*-..È...à).+àÈ..Š..ú....... 0000A0
 026EE80E 006A90FF 3FE9106A FF10E902 19EC0683 02C48300 F1E80E10 6A0419EC š..j..Òþ..6...š..Ŏ..j.Ŏ?..j..Òn. 0000C0
 7500643D 90FF21E9 0428E80E 256AFF2A E90349E8 0EF876FF F4EB016A 90FF39E9 Ŏ9..j.Š¶.v½.ÒI.Ŏ*.j%.Ò(.ÒI..=d.u 0000E0
 46880A4E FF0C5688 0A468809 740019DA 3E83DA7E 00673D05 7C00653D FF0CE903 .Ŏ..=e.|.=g.-Ŏ.>Ŏ..t..F..V..N..F 000100
 7030FEE4 E9037500 6F30FE80 E9037500 6E3D903A EBFE5689 FC468940 0C56880A ..V.@.F=.V±Š:.=n.u.Ŏ.±=o.u.ŎŎ±=p 000120
 46FF9081 EBFF79E9 03750078 30FEB9E9 03750075 308F7400 7330FEE0 E9037500 .u.ŎÀ±=s.t.=u.u.Ŏ¿±=x.u.Ŏy.ŠŸ..F 000140
 76FF500A 462BC38B EC75253C 0474C00A F6468807 8A26FC5E C4FC46FF 9034EB0A .Š4..F=6^=&...F-.àt.<%uš.ú+F.P.v 000160
 F6468807 8A260A5E C40C5689 0A4689FE 568BFC46 8806C483 044CE80E 0A76FF0C ..v..ÒL..6..F=.V±.F..V.6^.&...F- 000180
 56570000 12C8CBC9 19F6A1FE 51E90374 200A47F6 2619D21E C4FC63E9 0374C00A .ât.Òc=6.0.&-G. t.ÒQ±À-.èùà...WV 0001A0
 3E830774 02190A3E 8319F406 FF04740A 067E8300 20186206 C7067400 19F23E83 .>·..t.ú.b. ..-..t...¶..>Ŏ..t..> 0001C0
 3E83902C EB0419EC 0683FE56 89FC4689 02578826 07882619 EC1EC419 7510190A Ŏ..u.6.š.&..&.W..F=.V±..š..Š,..> 0001E0
```

Dump of file SATURN:[PCCOMMON.DUMP.DLL]SAFREE2.TMP;1 on 18-APR-1990 10:52:15.22
File ID (908,21,0) End of file block 53 / Allocated 56

Virtual block number 12 (0000000C), 512 (0200) bytes

```
46899907 8B2619EC 1EC40EEB 0000FE46 C7FC4689 07882619 EC1EC411 740019F4 ¶..t.ó.š.&...F=úF±..Š.á.š.&....F 000000
C02B9003 E8064688 0674FE46 0BFC4688 0E740019 D03E8302 19EC0683 FE5689FC =.V±..š...>Å..t..F=.F±t..F.Š..+á 000020
067E832B 7D00FE7E 83317500 19F43E83 F45689F2 468919FE 168B19FC A11B60A3 È'.À=...±..F·.V¶.>¶..u1.~±.)+.~. 000040
FE5689FC 4689DAF7 00D28308 F7FE5688 FC468820 07C626F2 46FFF25E C41D750A .u.á^·.F·&ó.-.F=.V±%Ä.@.%Ö.F=.V± 000060
76FFFE76 FF501E06 76FFFA5E 8CF84689 190E8800 00F646C7 9006EB00 01F646C7 úF-..Š..úF-..¦ß..F½.^*.v..P.v±.v 000080
0E8804C4 83024510 329AF876 FFFA76FF 45740019 F23E830A C4830729 104A9AFC =.J.)..á..>·..tE.v*.v½.2.E..á... 0000A0
05E8F27E C4F04E88 00001B60 06C70675 0818603E 83007EC9 0BF04E89 C82B19FA *.+à.Nÿ.è~..>'..u.ú.'....Nÿá~·Š. 0000C0
C4F276C5 EE5E8C19 D80E8BF0 4E89F446 8CF27E89 F47FC00B 49C18847 3005C626 &ó.0G.èl.â.¶.~·.F¶.Nÿ..Ä..^Ÿév·á 0000E0
8CF27689 E375003F 8026F846 FF46202C 80037C61 3C0774C9 0B048807 8A26F85E ^Y&.....èt.<a|.., F.F%&.?.uD.v·. 000100
02EB0001 B8057500 F67E830B 7419F006 08190CA1 14750019 F43E83EE 5E8EF45E ^¶.^Ÿ.>¶..u.ÀÉ...Þ.t..—.u.¦..Š. 000120
19ECA100 01BE1874 00067E83 56570000 10C8CBC9 5F5E02C4 8302FFE8 0E50C028 +âP.Ò...á.^_èùà...WV.~..t./..À±. 000140
07882619 EC1EC413 7408190A 3E83008F E90219EC 0683FA56 89F84689 19EE168B ..Ÿ..F½.V*..š..Ö...>Ö..t.ó.š.&.. 000160
19EC0683 FA5E8CF8 4689FC46 89078826 19EC1EC4 10EBFA56 89F84689 02578826 &.W..F½.V*Š.ó.š.&...F=.F½.^*..š. 000180
890063B8 097500FC 7E83900A EB005CB8 1575FA46 0BF84688 0E740819 DA3E8304 ..>Ö..t..F½.F*u.¦\.Š...~=.u.¦c.. 0001A0
900EEB19 FA0E881C 7419F236 39F62BF4 5689F246 89FA5688 F84688FA 5E8CF846 F½.^*.F½.V*.F·.V¶+-96·.t...*.Š.. 0001C0
75003F80 26F246FF F25EC446 90EDEB10 7ECE3B46 1574003F 8026F246 FFF25EC4 á^·.F·&.?.t.F;ö-.ŠÚ.Fá^·.F·&.?.u 0001E0
```

Dump of file SATURN:[PCCOMMON.DUMP.DLL]SAFREE2.TMP;1 on 18-APR-1990 10:52:15.22
File ID (908,21,0) End of file block 53 / Allocated 56

Virtual block number 13 (0000000D), 512 (0200) bytes

```
83E80EF8 76FFFA76 FF5602C4 830159E8 0E570875 0019EA3E 83FE2B1A 003E8BF3 µ.>..+±.>õ..u.W.ÒY..á.V.v*.v½.Ò* 000000
8819ECA1 000006C8 90CBC95F 5E02C483 013CE80E 57087400 19EA3E83 06C48301 ..á..>õ..t.W.Ò<..á.^_èù.à...À±.. 000020
83FA4688 C02A9003 EB01B005 7547067E 83067467 067E83FE 5689FC46 8919EE16 .Ÿ..F=.V±.~.gt..~.Gu.¯.Š..*â.F*. 000040
FF000119 FA06C706 750019FA 3E830074 00FA7E80 000619FA 06C70675 0019F23E >·..u.ú.*....~*.t..>*..u.ú.*.... 000060
8E1EFF26 18EE068E FC76FFFE 76FF19FC 36FF19FE 36FF0676 FF19FA36 FF19D836 6Ä..6*..v..6±..6=..v±.v=..Ÿ.&... 000080
1EFF2618 EE068E19 FC36FF19 FE36FF14 750019D0 3E831B74 00FA7E80 0EC48304 ..á..~*.t..>À..u..6±..6=...Ÿ.&.. 0000A0
2618EE06 8E19FC36 FF19FE36 FF147500 19FA3E83 1B740019 D03E8304 C4830492 ...á..>À..t..>*..u..6±..6=...Ÿ.& 0000C0
76FFFE76 FF1B7419 F0060B19 DCA10000 1B6006C7 0819EC06 8304C483 049A1EFF .....ó...š..ú.'...ÀÉ...Þ.t..v±.v 0000E0
90CBC901 29E80E50 C02B02EB 0001B805 74C00B04 C483049E 1EFF2618 EE068EFC =..Ÿ.&.....á..ãt.¦..Š.+âP.Ò).èù. 000100
2607FF26 37882606 468A1478 044FFF26 19D21EC4 3C750019 F83E8356 000000C8 à...V.>½..u<ó.@.&.0.x..F.&.7&..& 000120
F806FF07 754006C4 830A0100 C69A0676 FF531904 36FF10EB E42A0488 2602478E .G.&..*õŠ..6â.S.v..ó....á.ãu...½ 000140
507EF60B 06768857 750019F8 3E835657 000002C8 90C8C95E 19F606FF 9005EB19 .Š....-.^èù.à...WV.>½..uW.v..~~P 000160
4EC68819 F806FF04 754006C4 830A6900 C69A1B62 36FF1902 36FF1904 36FF1BEB Š..6â..6@..6b..ó.i..á.ãu...½..6N 000180
E42A0588 2602478E 2607FF26 3F8B261B 62A0D478 044FFF26 19D21EC4 1E7EC00B .â~.á.@.&.0.xâ.b.&.?&..&.G.&..*õ 0001A0
F83E830A 76885657 000002C8 CBC95F5E 19F60601 06468807 750019F8 3E83D4EB Šâ.>½..u..F...~.^_èùà...WV.v..>½ 0001C0
754006C4 830AD800 C69A5098 078A2606 5EC41902 36FF1904 36FF22EB 5E750019 ..u^Š".6â..6@.á^.Ž...P.ó.Ü..á.ãu 0001E0
```

Dump of file SATURN:[PCCOMMON.DUMP.DLL]SAFREE2.TMP;1 on 18-APR-1990 10:52:15.22
File ID (908,21,0) End of file block 53 / Allocated 56

Virtual block number 14 (0000000E), 512 (0200) bytes

```
C4078A26 065EC4CD 78044FFF 2619D21E C42574C0 084EC688 0646FF19 F806FF04 ...½..F..óN.ât%ó.@.&.0.xëá^.&..á 000000
06010A46 8B077500 19F83E83 CAE8E42A 05882602 478E2607 FF263F88 2619D21E .@.&.?&..&.G.&..*õŠò.>½..u..F... 000020
FA4689FC 4689C02B F65689F4 468919FE 168B19FC A1560000 0CC8CBC9 5F5E19F6 -.^_èùà...VÀ=...±..F¶.V-+â.F=.F* 000040
83057510 1B603E83 06762BF0 2BF84689 04C48307 1410329A F476FF52 1A003688 .6.¯R.v¶.2....á..F½+Þ+v..>'..u.. 000060
1B623E83 19752D3F 8026F45E C4227500 19EA3E83 4E017508 1B603E83 08EB02EE Ÿ.Š..>'..u.N.>õ..u"á^¶&.?·u..>b. 000080
077EF60B 0B74301B 623E83F8 4EFF02C4 83FE71E8 0E509807 8A26F446 FF127530 0u..F¶&...P.Òq±.á..N½.>b.:?..~. 0000A0
E80EFC46 FF077400 1B603E83 0066E80E FA46FF07 7400067E 831B7400 19EA3E83 .>õ..t..~..t..F*.Òf..>'..t. F=.Ò 0000C0
39E80E04 7500FA7E 830A7400 067E8302 C483FE7E E80E5629 750019EA 3E830070 p..>õ..u)V.Ò-±.á..~..t..~*.u..Ò9 0000E0
83FE85E8 0EF476FF F676FFF8 76FF0040 E80E0475 00FC7E83 0A74001B 603E8300 ..>'..t..~=.u..Òa..v½.v~.v¶.Òç±. 000100
740019DC 3E83CBC9 5E02C483 FE38E80E 5600201B 6206C70E 740019EA 3E8306C4 á..>õ..t.ú.b. .V.Ò8±.á.^èù.>É..t 000120
101B603E 8302C483 FDC8E80E 306ACB02 C483FD02 E80E5000 20B803EB 002BB805 .¦+.Š.¦ .P.Ò@».á.ùj0.Òà».á..>'.. 000140
56570000 06C8CB02 C483FDAA E80E5000 78B803EB 0058B805 74001908 3E831775 u..>Ä..t.¦X.Š.¦x.P.Ò`».á.ùà...WV 000160
9060E80A 46FF0219 EC068337 8B2619EC 1EC41275 2A3F8026 0A5EC400 01FE46C7 úF±..á^.&.?*u.ó.š.&.7..š...F.Š'. 000180
3F7C303C FA468807 8A260A5E 8BF62B0A 46FFFFFF FE46C708 75203F80 260A5EC4 á^.&.?-u.úF±...F.+-.^.&...F*<0|? 0001A0
8A261B7F 39308026 06E8FB8B 00301B62 06C70675 303C0A75 19F23639 3B7F393C <9.;96·.u.<0u.ú.b.0..«Š.&.=9..&. 0001C0
880C468C 0A7E89DF 7D303080 2647F188 30E983C8 03E1D1CE 0302E1C1 CE889805 ...öèÄ..öÍÄ.à.Õ0.þG&.=0)Ò.~..F.. 0001E0
```

```
Dump of file SATURN:[PCCOMMON.DUMP.DLL]SAFREE2.TMP;1 on 18-APR-1990 10:52:15.22
File ID (908,21,0)   End of file block 53 / Allocated 56

Virtual block number 15 (0000000F), 512 (0200) bytes

 4689006A 88570000 04C8C8C9 5F5E0C56 880A4688 37892606 5EC4F088 EEF7FE46 F±¼Ÿ.Þá^.&.7.F..V.^ èùà...W¡j..F 000000
 468CFC7E 890001B8 F4750038 26117400 30802647 01E8FC7E C4064E8A FE5E8CFC ▪.^±.N.á-▪Š.G&.=.t.Ž8.u¶¦...-▪.F 000020
 E0865800 00FFFF9A 5016C488 50EC8855 90C8C95F C028FE46 8CFC7E89 9009E8FE ±Š...-▪.F±+ã_èù.U.šP.á.P.....X.À 000040
 E5880001 8809C511 8C9A0386 E80021E8 0000FFFF 9A007068 1E007268 1E16ACA3 £¯..hr..hp.¯....Ò!.ÒÑ....é.¦...! 000060
 FFB90072 068EFF33 0000BB1E 007816FF 00FF680C F600A69A 0CE90052 9A50CB5D ]ùP.R.Õ..].-.h....x..£..3...r.¿. 000080
 74AEF2C0 330874CA 8BA6F3CB 88D18804 7CBE3174 003D8026 47017500 3D80267F .&.=.u.G&.=.t1ƒ|..!.ùµ!.ðt.3à·Ût 0000A0
 1FEDEBAA C20A0572 412CAC92 04E0C00E 72412CAC 1683BF1F F788071E 061CE8E7 ÓŠ.....¥.¢°.¯,Ar.àÀ..¯,Ar..ô˙ŠÚ. 0000C0
 00A69A50 00FF8804 8A1EFF04 7400048C 3E830CFB 00A69A50 00FC88EC 885500C3 û.U.ŝ¦▪.P.!.«..>...t.....¦..P.!. 0000E0
 74964010 74C238AD 18F88E06 5688C08E D88E0161 885756EC 8855CB5D E588005C \..[]ùU.$VW¦a..Ä.â.V.ƒ½.Ù;ðt.ª.t 000100
 00769A06 76FF57EC 88550002 CA5DE588 5E5F96EB E8F788AE F2FFFF89 C033970C ..3â¿..·Û.¼ŜŠ._^.[]ò..U.šW.v..v. 000120
 9A501651 521E5300 028BC488 50490 1F7 AEF2FFFF 89C033FA 88921F74 C00B0D70 p..ât...▪3â¿..¯Ü‰¦P.áE..S.RQ.P. 000140
 F9F7000C 899904AE 2D044688 18C406FF 000004C8 0002CA5D E5885F58 0000FFFF ....(_.[]ò..à.....á..F.·Ô..¿..¼▪ 000160
 26045EC4 02C4830D 8013479A 020068FE 5E8CFC46 8910A205 E001C103 E001C888 .à!À.ē!À.À..F▪.^±h...G.¯..á.á^.& 000180
 26045EC4 9021E802 000247C7 26FC5EC4 080A4F80 26117400 08085789 26064789 .G.&.W..Àt.&.O..á^▪&úG...Š!.á^.& 0001A0
 26045EC4 00010247 C726FC5E C4085789 26064789 2640FE56 88FC4688 040A4F80 .O...F▪.V±ª&.G.&.W.á^▪&úG...á^.& 0001C0
 16811E3B 065E88EC 8855C3C9 00000447 C7260257 89260789 26085788 26064788 .G.&.W.&..&.W.&úG...èùU.š.^.;.Ÿ. 0001E0

Dump of file SATURN:[PCCOMMON.DUMP.DLL]SAFREE2.TMP;1 on 18-APR-1990 10:52:15.22
File ID (908,21,0)   End of file block 53 / Allocated 56

Virtual block number 16 (00000010), 512 (0200) bytes

 FF9A5116 0C76FF08 76FF0A76 FF53CC88 04EC8304 78E9046C E9C03300 09BA0872 r.¤..3âÕl.Õx..š..äS.v..v..v. Ω.. 000000
 B11E3B06 5E880CEC 83EC8855 00CB5DE5 88FD1683 A78091E1 75C0855A 590000FF ...YZ.åuÄ..]°.».[]ù.U.š.š..^.;.Ÿ 000020
 9A5016F4 46805141 415151C9 33531274 20168387 F6042BE9 C0330009 BA087216 .r.¤..3âÕ+.-.°. t.S3èQQAAQ.F¶.P. 000040
 885657FC FC4689FE 4689C033 0856C50A 468EFA5E 8C667480 168387F6 00000E8F ....-.°..tf.^▪.F.éV.3ä.F±.F▪▪WV. 000060
 16FA88D4 88E22800 808ADC88 02EC8338 75AEF20A 8049E30C 4E88F866 89F288FA ▪.·.f½.N.DI¯.·Ûu;.¢..£¤..+ã.â.▪. 000080
 AA001FE8 0375F838 00B0009A E9002BE8 F4E2AA1A 74F83800 740A3CAC 0C4E8807 ..N.¯<.t.;«t.¯ã¶Ò+.Õ..¯.;«u.Ò..˙ 0000A0
 53500E07 10789AFF FCB87AE8 0093E9FA 5E8E5F5E E1E80014 E8E2EBFC 46FF0A80 ¯..F▪ŠäÒ..ŠÃ^_.^▪Õ..Šz¦▪..x...PS 0000C0
 8B1175C0 0B000000 D09A5016 F4468051 521E5306 5E881FE3 CA28CF8B 1F061E51 Q....ü+ðD..^.Š.RQ.F¶.P.À....ãu.. 0000E0
 00013000 7400603D 1874C008 08C4831F C3FA8858 58591F07 74080BFE 5E01F45E ^¶.^±.Ût..Y(X.▪ū..á..ât.=m.t.=.. 000100
 085E880A 5E8E0E74 40168387 F6FE5E8E 26E8F900 208A03E8 001CBA08 7500098A ¤..u.¤..Š.¤ .▪Š&.^±-.°.ªt..^..^. 000120
 0472FA5E 8E5F5EF8 668BFC46 28FE4688 06E8F9C0 33001CBA 0EE8F803 751A3F80 .?.u.½Š.¤..3â▪Š..F±+F▪.f½^_.^▪r. 000140
 9A5016F4 46805152 1E530856 C51EEEEB C1880475 C9080C4E 88030FE9 C85DE588 .[]ùÕ...N..èu..èŠŸ.éV.S.RQ¯F¶.P. 000160
 0020BAC7 EB001C8A CC750009 8A00013D 0D74006D 3D1774C0 081F071E 00000F67 g.......ât.=m.t.=..¤..uä¤..Šú¤ . 000180
 E8C03300 1C8AA6EB 02751A3F 80260A88 0A744016 8387F687 75C00BF4 4688C2E8 Šò.F¶.âuñ-.°.ªt..Õ&.?.u.Š!¤..3âŠ 0001A0
 835756EC 885500C8 5DFA8891 49D1F7AE F2FFFFB9 C033067E C4078BEC 885500A3 È.U.š.▪á-.3â¿..·Û‰¦|..▪]ù.U.šVW° 0001C0
 E80001B8 05744016 8387F60C 7C00F883 117D1681 1E3B065E 88EC8855 0442E900 .ÕB.U.š.^.;.Ÿ.)..«.|.-.°.ªt.¡..Š 0001E0

Dump of file SATURN:[PCCOMMON.DUMP.DLL]SAFREE2.TMP;1 on 18-APR-1990 10:52:15.22
File ID (908,21,0)   End of file block 53 / Allocated 56

Virtual block number 17 (00000011), 512 (0200) bytes

 754004A8 A1C85152 E3880572 04AC1E38 0B72D82B DC885A59 00CB5DE5 88C03302 .3ä.[]ù.YZ.É+Ãr.;.¯.r..DRQùÀ´.ªu 000000
 9A521650 1653C488 50871683 A7800488 52000288 04A82EFF 5152FC5C E9C03305 .3äÕ\▪RQ..´.E..R.â.[°.ñP.áS.P.R. 000020
 885AD479 4B16838F 08088106 75000230 07740001 3D408112 7558C008 0000FFFF .....âXu.Ÿª=..t.=..u.Ÿ...°.KyâZ. 000040
 FF0003B8 C28C18E4 06C401AE E9037318 DC1EFFD8 33C28C18 E006C41E E318DE0E .8.D.á.À..ó3Ü..É.s.Õ0.á.ô..ôE... 000060
 0E016A08 7418EC3D 18E88800 73E818E8 8F18E88E 007CE818 E88F18E8 8E18DC1E .É.ƒò.¢ò.ò|.ƒò.¢ò.òs.¦ò.=š.t.j.. 000080
 11149A00 6A006A03 6A0051E8 18ECBF18 E88ED88E 0D7CB8C3 0000FFFF 9A111968 h.......ù¡|..Ãƒò.¢š.òQ.j.j.j.... 0000A0
 8F18ECBE EC885503 E80031E8 18ECBF18 E88E003A E81864BF 18648EEC 88550000 ..U.šƒd.¢d.ò:.ƒò.¢š.ò1.Š.U.šƒš.¢ 0000C0
 07E318DE 0E880000 FFFF9A50 06468A50 C033001A E818ECBF 18ECBE00 23E818EC š.ò#.ƒš.¢š.ò..3äP.F.P.......8.D. 0000E0
 000014C8 00C3EEEB 1DFFF274 02450805 8804EF83 0E73F738 C318DC1E FF0002B8 £....É.û;¼s..ÿ....E.t·..ŠŸû.à... 000100
 5689F646 89F25689 F04689C0 28007216 8800F0E9 03750072 3639FF2B F6285657 WV+-+.96r.u.Õþ...r.+á.Fþ.V·.F-.V 000120
 03767FFF FE814619 74C0080A C4831200 145A9A04 7C681EF6 76FFF876 FF0C6AF8 ½j..v½.v-.h|..Z....á..ât.F.±..v. 000140
 5E88F475 003F8026 F646FFF6 5EC40CEB 47EA7500 3F8026F6 46FFF65E C4008CE9 Õ¥.á^-.F-&.?.uõGŠ.á^-.F-&.?.u¶.^ 000160
 4513479A 56EE5689 EC468904 C483120F 14029A04 6A500145 808A7500 3F8026F6 -&.?.u¤.E.Pj.......á..Fš.VŸV.G.E 000180
 A3EE5688 EC468866 74C208FC 46886074 EE460BEC 468BFE56 89FC4689 02C48312 ..á..F▪.V±.Fš.FŸtm.F▪.ðtf.Fš.VŸÈ 0001A0
 5EC42C74 C00B0AC4 830F4C14 5A9A047C 681EF076 FFF276FF 0C6A1888 16891889 ¿...£.j..v·.vþ.h|..Z.L..á..ât,á^ 0001C0
 46FFFC5E C4078A26 F046FFF0 5EC404EC 46830257 89260789 26FE5688 FC4688EC š.F▪.V±&..&.W..Fš.á^þ.Fþ&..á^▪.F 0001E0
```

Dump of file SATURN:[PCCOMMON.DUMP.DLL]SAFREE2.TMP;1 on 18-APR-1990 10:52:15.22
File ID (908,21,0)   End of file block 53 / Allocated 56

Virtual block number 18 (00000012), 512 (0200) bytes

```
5EA77500 3F8026F0 5EC4F475 003F8026 F046FFF0 5EC4E8EB 0E74C00A 078826FC =&...ät.Šòé^Þ.FÞ&.?.u¶é^Þ&.?.uÍ^ 000000
0808070A 0C090C08 0C070906 00051804 02030202 1601FA58 E90002B8 90C8C95F _èÙ.¦..ÕX*...................... 000020
1C70206D 006C0859 00570053 00520243 00410235 02121211 0010120F 1600160C ...........S.A.C.R.S.W.Y.l.m p. 000040
FFFFB816 A8168916 AFA31608 000008D7 02CE08A4 00840982 0A810A80 16060972 r..........Ê.ö.m.....ÊÊ...´.¦.. 000060
073A2E1B 75E40A00 24B9129A BB16AFA3 CB5DE588 99FFFFB8 0008E8CB 5DE58899 ..[]ùÒ..¦....[]ùËÊ.Ê..¿$..ðu..:. 000080
16A8A398 01478A2E 430176CA 3C0472BC 3C430A76 243C0472 133CF7E2 43431674 t.CCã¼<.r.<$v.C<¥r.<ðv.C..G..È´. 0000A0
88575602 EC83EC88 55C85DE5 8801FE4F 80260574 C308C08C 065EC4EC 885500C3 û.U.šé^..â.ût.&.O±..[]ùU.š.š.VW. 0000C0
05740018 E8157500 82E818D0 A3127400 25E80875 0018D03E 831E73FF F13D0646 F.=þ.s..>Å..u.Ò%.t.ÈÅ.Ò..· .Ò..t. 0000E0
5E880776 065E3900 F088C85D E5885E5F 02C48311 C0154C9A 0676FF08 750078E8 Òx.u..v..L.â..ó._^.[]ùÈÞ.9  v..^ 000100
74FFFA83 08C48313 7B16F89A 5002B051 0E4F8D50 501EC033 FE5E89FE E3834306 .C.D±.^±3â.PP.O.O¯.P.½.(..ó..*.t 000120
89484800 08A3C033 D88EFE5E 880008A3 DA8E0574 D20818D4 A318D216 87C28838 8.ô..Ø.Èâ..Øt..ÒÈ...^±.Ä3âÈ..HH. 000140
88C08ED8 8CC31FD8 8C0006A3 00000500 0AA30147 8D0002A3 0000A300 0AB80C47 G.¦..È..È...G.È.....È...Ä.û.Ä.â. 000160
76FF006A 0876FF00 6A560000 0AC8C3D9 8EC18CD2 08019AE8 18D41E8E DB33064E N.3Ù..â.Ò...Ø.è.lûâ...Vj..v.j..v 000180
4813479A 56F87688 902FE899 C02B0674 FFFFC2F7 FA5689F8 4689142F 17F69A06 ..~./..F½.V*¼ò..t.+â.Š/..v½V.G.H 0001A0
9007EB08 C48313A7 17AE9A50 FE76FF00 6A561274 D00BFE56 89FC4689 02C48314 ..é..F=.V±.Åt.Vj..v±P.Û.Ï..é.Š.. 0001C0
AEF2C033 F788067E C4D98827 E30E4E88 1E5657EC 885590CB C95EFE56 88FC4688 .F=.V±^èù.U.šWV..N.D'.lé~..¼3â·Ù 0001E0
```

Dump of file SATURN:[PCCOMMON.DUMP.DLL]SAFREE2.TMP;1 on 18-APR-1990 10:52:15.22
File ID (908,21,0)   End of file block 53 / Allocated 56

Virtual block number 19 (00000013), 512 (0200) bytes

```
5E1FC188 D1F74949 04740477 FF453A26 C933FF44 8AA6F30A 76C5FE8B CB03D9F7 %l.ù.±év.µÍ.D.3è&:E.w.t.II%Í.è.^ 000000
750AF983 1374C00A 93FC071E 570A7EC5 1E085688 0646880E 4E8800CB 5DE5885F _.[]ù..N..F..V..é~.W..=..ât..*.u 000020
D38792F1 F793F1F7 0274C008 D23392F7 880AF700 D2830BF7 AA2D800A 79020B0E ¯..Øy.¯-¯¼Ù.Ø.¼Ò.¼.3Ø.ât.¼þ.¼þ..Æ 000040
8CF272C7 3801448D FF448805 86AC4F05 88E275C3 0BC288AA 27040276 393C3004 .0<9v..'´.ô.ûuã..O¯...D..D.;úr·. 000060
26FA5EC4 1CEBF628 FC5E8CFA 468904AE B8560000 06C800CB 5DE5885E 5F1F58DA ÖX._^.[]ù.â...V¦Û..F*.^=+-Š.é^*& 000080
39169E16 8B169CA1 0CFA4683 46017440 04C48314 14182A9A 53060E74 830A47F6 -G..t..S.*....é.ðt.F.F*.Å......9 0000A0
56EC8B55 CB5DE588 01FE4F80 0474D808 065E88EC 885590CB C95EC688 D876FA46 F*vÄ.ó^èù.U.š.^..Ût..O±..[]ùU.šV 0000C0
C8A318C6 A3FE2440 24EB99C0 33057501 76E80005 B8071E29 75003F83 18C68857 WÊó..7.u)..¦..Òv.u.3â.Š$ð$±Êó.Èà 0000E0
E5885E5F 0009E8C0 8ED88C06 4E8818CC 3689FFFE FE44C704 C6830001 04C79618 ..ú....ó.ùD±±..óä..N..Ä.âÒ.._^.Í 000100
1573C138 48437401 A8FE88AD FC027788 F273EEF9 83FEE180 FA744100 D0E9C85D ]ùÕÅ.At*.Ä±.*Ÿs·.w.=Ü.±´.tCH;ês. 000120
C128FE4C 89F9030C 74FE88E6 E8FE4489 F7880002 05C20335 7401A8AD F0030088 .Å.ÞÙ´.t5.ô....¼.D±ŠÍ.±t..*.L±+ê 000140
C626C302 7F8918D4 1E8C2605 74D13B11 1AB9DA8C C688FE4C FEF90305 EB058948 H..Š..*±L±.6.Ô¿..;Ít.&..â....û&6 000160
01A8ADF0 03D088BC 73C13848 FE88F274 01A8ADF0 03FE8825 74FFFE3D 0218D806 .Å..=±.tX.±.ÞÙ´.t·.±H;ês¥.Å.ÞÙ´. 000180
12741808 0EFE2615 E8D88E04 74C00808 4788E6E8 FE4489F7 88000205 C203E274 tã.ô....¼.D±ŠÍ.G..ât..ÄŠ.&±.Ä.t. 0001A0
01240D74 C63B006B E8C03306 7788B8E8 37881800 1E8E2605 74C73815 DFBFD88C .Ä¢Ô.;út.&..Å..7ŠÊ.w.3âÒk.;ót.$. 0001C0
A3260474 C13B1633 89D88C98 EB4E4E96 0574001D E8FE4DFE 0074005F E8984040 ªª.Ò_.t.±M±Ò..t..NNŠ..Á¿3.;èt.&È 0001E0
```

Dump of file SATURN:[PCCOMMON.DUMP.DLL]SAFREE2.TMP;1 on 18-APR-1990 10:52:15.22
File ID (908,21,0)   End of file block 53 / Allocated 56

Virtual block number 20 (00000014), 512 (0200) bytes

```
18D6163B 267FFFBA 414149C8 28037401 A8FE4588 51C399C0 33024789 07881BD4 â....G.3â.ûQ.E±´.t.+âIAA¤..&;.ø. 000000
75EAD1D2 F7087500 0CE8C628 C223D2F7 0072C203 1572C603 C188F575 EAD10476 v.Íõu¼.è.ór..ór.¼Ø#ô+óÒ..u.¼ØÍõu 000020
4AD72B06 88067789 FFFEFE44 C7F203F0 88FE8857 1874001D E85152C3 59C033E5 Í3âYûRQÒ..t.W.±.Þ.·ûD±±..w..ø+øJ 000040
FFFA8308 C483151B 16F89A1F 06500001 B8505252 1ED23350 53C35A59 58FE5589 .U±XYZûSP3Ø.RRP¦..P...½....é..*. 000060
07754806 46880856 88007ABF 3875000A 7E830657 56EC8855 C3D20B02 74585A1F .Z[t..ØûU.ÊVW..~..uß¢z..V..F.Hu. 000080
8334735E 003EE856 0E468902 44880D74 F7381174 48047A36 884CE827 720057E8 ÒW.r'ŠL.6z.Ht.;¼t..D..F.VÒ>.^s4. 0000A0
0000FFFF 9A50C033 501652C4 885021E8 99FFFFB8 06750208 0473047A FE8104C6 6..±z.s..Øu.¦...ŠIP.óR.P3âP..... 0000C0
39F7880E 4E88CB5D E5885E5F 07C033D3 88047A36 89025C89 1489E675 C085F958 [*.âu]...\..6z..Æ3â._^.[]ù.N..¼9 0000E0
1E390675 F738C18E D3882672 1C03DA88 2CE8F9F2 75047AFE 8104C683 0C74024C L.t..ó..±z.u·*Š,.Ö..r&.Æ.è;¼u.9. 000100
885500C3 D1880487 92007416 890475F7 38DE75C0 850000FF FF9A5153 13730074 t.s.SQ......âuß;¼u...t.....Íû.U. 000120
8A0A4688 D128D187 D103D323 D818D128 0C74DAF7 D788067E C45738E3 0C4E88EC â.N.D8Wé~..m¼Òt.+Í.ÛWÆ.Í.Í+Í.F.. 000140
46885FAA F3C913AB F3E9D1C3 8EFFFFC3 81C38C10 E3D187AA F3C913AB F3E9D1E0 ÅÍÕµ¨.èµ`.ÍD..û.û...ûÍÕµ¨.èµ´_.F 000160
08CA5DE5 88E3F706 46880875 0A5E8808 080C5E88 084688EC 8855C85D 08568806 ..V.]ùU.š.F..^..Ä.^.u..F.¼D.[Ï]ò. 000180
28560000 04C80008 CA5DE588 D103E3F7 064688C8 030C66F7 064688C8 88E3F700 .¼D.â.F.¼f..â.F.¼D.Í.[]ò..â...V+ 0001A0
F9F7000C 899904AE 2DC38815 75080A47 F6265575 023C0324 0A478A26 065EC4F6 -é^.&.G.$.<.uU&-G..u..û-Û..¿..¼* 0001C0
0877FF26 50287EC0 08FC4689 06472826 07882606 5E883974 0110A287 F6060868 kÄ.-.Å..t9.^.&..&+G..F=.â-(P&.w. 0001E0
```

```
Dump of file SATURN:[PCCOMMON.DUMP.DLL]SAFREE2.TMP;1 on 18-APR-1990 10:52:15.22
File ID (908,21,0)   End of file block 53 / Allocated 56

Virtual block number 21 (00000015), 512 (0200) bytes

 200A4F80 26065EC4 0B74FC46 3B08C483 16E80EA4 9A50E42A 08478A26 0677FF26 &.w.&.G.*ðP.Ê.Ò..é.;F=t.é^.&.O.  000000
 CBC95EC6 8B000004 47C72602 57892607 89260857 8B260647 8B26065E C4FFFFBE ƒ..é^.&.G.&.W.&..&.W.&ùG....ó^èù 000020
 00021166 01030000 00051668 00020157 00070FF0 02030000 0003187E 0002000C ....~.......Þ...W...h.......f... 000040
 000217E1 01050026 00021797 01030022 0002174C 01030007 0002112E 01030005 ...........L..."........&...Ã... 000060
 00020CC9 0103005B 00020CDC 0103004D 00021080 0103003A 00020ED0 01030088 ....Å...:... ...M...É...[...è... 000080
 54206E75 5220534D 00000000 00000000 00000000 00000000 00000000 0000005C \.......................MS Run-T 0000A0
 38383931 20296328 20746867 69727970 6F432020 20797261 7262694C 20656069 ime Library - Copyright (c) 1988 0000C0
 3A732500 60617267 61694420 44460011 70726F43 2074666F 736F7263 694D202C , Microsoft Corp..FD Diagram.%s: 0000E0
 00002320 202B0029 6C6C756E 2800296C 6C756E28 00007325 203A7325 00732520  %s.%s: %s..(null).(null).+- #.. 000100
 00000000 00000000 00000000 00000000 000018EE 1B701149 1B701B70 00000000 ....p.p.I.p.Ÿ................... 000120
 00000000 00000000 00000000 00000000 00000000 00000000 00000000 00000000 ................................ 000140
 00000000 00000000 00000000 00000000 00000000 00000000 00000000 00000000 ................................ 000160
 00000000 00000000 00000000 00000000 00000000 00000000 00000000 00000000 ................................ 000180
 00000000 00000000 00000000 00000000 00000000 00000000 00000000 00000000 ................................ 0001A0
 00000000 00000000 00000000 00000000 00000000 00000000 00000000 00000000 ................................ 0001C0
 00000000 00000000 00000000 00000000 00000000 00000000 00000000 00000000 ................................ 0001E0

Dump of file SATURN:[PCCOMMON.DUMP.DLL]SAFREE2.TMP;1 on 18-APR-1990 10:52:15.22
File ID (908,21,0)   End of file block 53 / Allocated 56

Virtual block number 22 (00000016), 512 (0200) bytes

 00000000 00000000 00000000 00000000 00000000 00000000 00000000 00000000 ................................ 000000
 00000000 00000000 00000000 00000000 00000000 00000000 00000000 00000000 ................................ 000020
 00000000 00000000 00000000 00000000 00000000 00000000 00000000 00000000 ................................ 000040
 00000000 00000000 00000000 00000000 00000000 00000000 00000000 00000000 ................................ 000060
 00000000 00000000 00000000 00000000 00000000 00000000 00000000 00000000 ................................ 000080
 00000000 00000000 00000000 00000000 00000000 00000000 00000000 00000000 ................................ 0000A0
 00000000 00000000 00000000 00000000 00000000 00000000 00000000 00000000 ................................ 0000C0
 00000000 00000000 00000000 00000000 00000000 00000000 00000000 00000000 ................................ 0000E0
 00000000 00000000 00000000 00000000 00000000 00000000 00000000 00000000 ................................ 000100
 00000000 00000000 00000000 00000000 00000000 00000000 00000000 00000000 ................................ 000120
 00000000 00000000 00000000 00000000 00000000 00000000 00000000 00000000 ................................ 000140
 00000000 00000000 00000000 00000000 00000000 00000000 00000000 00000000 ................................ 000160
 00000000 00000000 00000000 00000000 00000000 00000000 00000000 00000000 ................................ 000180
 00000000 00000000 00000000 00000000 00000000 00000000 00000000 00000000 ................................ 0001A0
 00000000 00000000 00000000 00000000 00000000 00000000 00000000 00000000 ................................ 0001C0
 00000000 00000000 00000000 00000000 00000000 00000000 00000000 00000000 ................................ 0001E0

Dump of file SATURN:[PCCOMMON.DUMP.DLL]SAFREE2.TMP;1 on 18-APR-1990 10:52:15.22
File ID (908,21,0)   End of file block 53 / Allocated 56

Virtual block number 23 (00000017), 512 (0200) bytes

 00000000 00000000 00000000 00000000 00000000 00000000 00000000 00000000 ................................ 000000
 00000000 00000000 00000000 00000000 00000000 00000000 00000000 00000000 ................................ 000020
 00000000 00000000 00000000 00000000 00000000 00000000 00000000 00000000 ................................ 000040
 00000000 00000000 00000000 00000000 00000000 00000000 00000000 00000000 ................................ 000060
 00000000 00000000 00000000 00000000 00000000 00000000 00000000 00000000 ................................ 000080
 00000000 00000000 00000000 00000000 00000000 00000000 00000000 00000000 ................................ 0000A0
 00000000 00000000 00000000 00000000 00000000 00000000 00000000 00000000 ................................ 0000C0
 00000000 00000000 00000000 00000000 00000000 00000000 00000000 00000000 ................................ 0000E0
 00000000 00000000 00000000 00000000 00000000 00000000 00000000 00000000 ................................ 000100
 12940000 0000003D 4F464E49 5F454C49 465F435F 007A0000 00000000 00000000 ..........z._C_FILE_INFO=....... 000120
 00000200 FFFFFFFF 01010000 0000049C 12940498 12940494 12940490 1294FFFF ................................ 000140
 00000000 00000000 00000102 00000000 00000000 00000001 18EC0000 000004B6 Ñ.....š......................... 000160
 00000000 00000000 00000000 00000000 00000000 00000000 00000000 00000202 ................................ 000180
 00000000 00000000 00000000 00000000 00000000 00000000 00000000 00000000 ................................ 0001A0
 00000000 00000000 00000000 00000000 00000000 00000000 00000000 00000000 ................................ 0001C0
 00000000 00000000 00000000 00000000 00000000 00000000 00000000 00000000 ................................ 0001E0
```

```
Dump of file SATURN:[PCCOMMON.DUMP.DLL]SAFREE2.TMP;1 on 18-APR-1990 10:52:15.22
File ID (908,21,0)   End of file block 53 / Allocated 56

Virtual block number 24 (00000018), 512 (0200) bytes

00000000 00000000 00000000 00000000 00000000 00000000 00000000 00000000 ................................ 000000
00000000 00000000 00000000 00000000 00000000 00000000 00000000 00000000 ................................ 000020
00000000 00000000 00000000 00000000 00000000 00000000 00000000 00000000 ................................ 000040
00000000 00000000 00000000 00000000 00000000 00000000 00000000 00000000 ................................ 000060
00000000 00000000 00000000 00000000 00000000 00000000 00000000 00000000 ................................ 000080
00000000 00000000 00000000 00000000 00000000 00000000 00000000 00000000 ................................ 0000A0
00000000 00000000 00000000 00000000 00000000 00000000 00000000 00000000 ................................ 0000C0
00000000 00000000 00000000 00000000 00000000 00000000 00000000 00000000 ................................ 0000E0
00000000 00000000 00000000 00000000 00000000 00000000 00000000 00000000 ................................ 000100
00000000 00000000 00000000 00000000 00000000 00000000 00000000 00000000 ................................ 000120
00000000 00000000 00000000 00000000 00000000 00000000 00000000 00000000 ................................ 000140
00000000 00000000 00000000 00000000 00000000 00000000 00000000 00000000 ................................ 000160
00000000 00000000 00000000 00000000 00000000 00000000 00000000 00000000 ................................ 000180
00000000 00000000 00000000 00000000 00000000 00000000 00000000 00000000 ................................ 0001A0
00000000 00000000 00000000 00000000 00000000 00000000 00000000 00000000 ................................ 0001C0
00000000 00000000 00000000 00000000 00000000 00000000 00000000 00000000 ................................ 0001E0

Dump of file SATURN:[PCCOMMON.DUMP.DLL]SAFREE2.TMP;1 on 18-APR-1990 10:52:15.22
File ID (908,21,0)   End of file block 53 / Allocated 56

Virtual block number 25 (00000019), 512 (0200) bytes

00000000 00000000 00000000 00000000 00000000 00000000 00000000 00000000 ................................ 000000
00000000 00000000 00000000 00000000 00000000 00000000 00000000 00000000 ................................ 000020
00000000 00000000 00000000 00000000 00000000 00000000 00000000 00000000 ................................ 000040
00000000 00000000 00000000 00000000 00000000 00000000 00000000 00000000 ................................ 000060
00000000 00000000 00000000 00000000 00000000 00000000 00000000 00000000 ................................ 000080
00000000 00000000 00000000 00000000 00000000 00000000 00000000 00000000 ................................ 0000A0
00000000 00000000 00000000 00000000 00000000 00000000 00000000 00000000 ................................ 0000C0
00000000 00000000 00000000 00000000 00000000 00000000 00000000 00000000 ................................ 0000E0
00000000 00000000 00000000 00000000 00000000 00000000 00000000 00000000 ................................ 000100
00000000 00000000 00000000 00000000 00000000 00000000 00000000 00000000 ................................ 000120
00000000 00000000 00000000 00000000 00000000 00000000 00000000 00000000 ................................ 000140
00000000 00000000 00000000 00000000 00000000 00000000 00000000 00000000 ................................ 000160
00000000 00000000 00000000 00000000 00000000 00000000 00000000 00000000 ................................ 000180
00000000 00000000 00000000 00000000 00000000 00000000 00000000 00000000 ................................ 0001A0
00000000 00000000 00000000 00000000 00000000 00000000 00000000 00000000 ................................ 0001C0
00000000 00000000 00000000 00000000 00000000 00000000 00000000 00000000 ................................ 0001E0

Dump of file SATURN:[PCCOMMON.DUMP.DLL]SAFREE2.TMP;1 on 18-APR-1990 10:52:15.22
File ID (908,21,0)   End of file block 53 / Allocated 56

Virtual block number 26 (0000001A), 512 (0200) bytes

00000000 00000000 00000000 00000000 00000000 00000000 00000000 00000000 ................................ 000000
00000000 00000000 00000000 00000000 00000000 00000000 00000000 00000000 ................................ 000020
00000000 00000000 00000000 00000000 00000000 00000000 00000000 00000000 ................................ 000040
00000000 00000000 00000000 00000000 00000000 00000000 00000000 00000000 ................................ 000060
00000000 00000000 00000000 00000000 00000000 00000000 00000000 00000000 ................................ 000080
00000000 00000000 00000000 00000000 00000000 00000000 00000000 00000000 ................................ 0000A0
00000000 00000000 00000000 00000000 00000000 00000000 00000000 00000000 ................................ 0000C0
00000000 00000000 00000000 00000000 00000000 00000000 00000000 00000000 ................................ 0000E0
00000000 00000000 00000000 00000000 00000000 00000000 00000000 00000000 ................................ 000100
00000000 00000000 00000000 00000000 00000000 00000000 00000000 00000000 ................................ 000120
00000000 00000000 00000000 00000000 00000000 00000000 00000000 00000000 ................................ 000140
00000000 00000000 00000000 00000000 00000000 00000000 00000000 00000000 ................................ 000160
00000000 00000000 00000000 00000000 00000000 00000000 00000000 00000000 ................................ 000180
00000000 00000000 00000000 00000000 00000000 00000000 00000000 00000000 ................................ 0001A0
00000000 00000000 00000000 00000000 00000000 00000000 00000000 00000000 ................................ 0001C0
00000000 00000000 00000000 00000000 00000000 00000000 00000000 00000000 ................................ 0001E0
```

```
Dump of file SATURN:[PCCOMMON.DUMP.DLL]SAFREE2.TMP;1 on 18-APR-1990 10:52:15.22
File ID (908,21,0)   End of file block 53 / Allocated 56

Virtual block number 27 (0000001B), 512 (0200) bytes

 00000000 00000000 00000000 00000000 00000000 00000000 00000000 00000000 ................................ 000000
 00000000 00000000 00000000 00000000 00000000 00000000 00000000 00000000 ................................ 000020
 00000000 00000000 00000000 00000000 00000000 00000000 00000000 00000000 ................................ 000040
 00000000 00000000 00000000 00000000 00000000 00000000 00000000 00000000 ................................ 000060
 00000000 00000000 00000000 00000000 00000000 00000000 00000000 00000000 ................................ 000080
 00000000 00000000 00000000 00000000 00000000 00000000 00000000 00000000 ................................ 0000A0
 00000000 00000000 00000000 00000000 00000000 00000000 00000000 00000000 ................................ 0000C0
 00000000 00000000 00000000 00000000 00000000 00000000 00000000 00000000 ................................ 0000E0
 00000000 00000000 00000000 00000000 00000000 00000000 00000000 00000000 ................................ 000100
 00000000 00000000 00000000 00000000 00000000 00000000 00000000 00000000 ................................ 000120
 00000000 00000000 00000000 00000000 00000000 00000000 00000000 00000000 ................................ 000140
 00000000 00000000 00000000 00000000 00000000 00000000 00000000 00000000 ................................ 000160
 00000000 00000000 00000000 00000000 00000000 00000000 00000000 00000000 ................................ 000180
 00000000 00000000 00000000 00000000 00000000 00000000 00000000 00000000 ................................ 0001A0
 00000000 00000000 00000000 00000000 00000000 00000000 00000000 00000000 ................................ 0001C0
 00000000 00000000 00000000 00000000 00000000 00000000 00000000 00000000 ................................ 0001E0

Dump of file SATURN:[PCCOMMON.DUMP.DLL]SAFREE2.TMP;1 on 18-APR-1990 10:52:15.22
File ID (908,21,0)   End of file block 53 / Allocated 56

Virtual block number 28 (0000001C), 512 (0200) bytes

 00000000 00000000 00000000 00000000 00000000 00000000 00000000 00000000 ................................ 000000
 00000000 00000000 00000000 00000000 00000000 00000000 00000000 00000000 ................................ 000020
 00000000 00000000 00000000 00000000 00000000 00000000 00000000 00000000 ................................ 000040
 00000000 00000000 00000000 00000000 00000000 00000000 00000000 00000000 ................................ 000060
 00000000 00000000 00000000 00000000 00000000 00000000 00000000 00000000 ................................ 000080
 00000000 00000000 00000000 00000000 00000000 00000000 00000000 00000000 ................................ 0000A0
 00000000 00000000 00000000 00000000 00000000 00000000 00000000 00000000 ................................ 0000C0
 00000000 00000000 00000000 00000000 00000000 00000000 00000000 00000000 ................................ 0000E0
 00000000 00000000 00000000 00000000 00000000 00000000 00000000 00000000 ................................ 000100
 00000000 00000000 00000000 00000000 00000000 00000000 00000000 00000000 ................................ 000120
 00000000 00000000 00000000 00000000 00000000 00000000 00000000 00000000 ................................ 000140
 00000000 00000000 00000000 00000000 00000000 00000000 00000000 00000000 ................................ 000160
 00000000 00000000 00000000 00000000 00000000 00000000 00000000 00000000 ................................ 000180
 00000000 00000000 00000000 00000000 00000000 00000000 00000000 00000000 ................................ 0001A0
 00000000 00000000 00000000 00000000 00000000 00000000 00000000 00000000 ................................ 0001C0
 00000000 00000000 00000000 00000000 00000000 00000000 00000000 00000000 ................................ 0001E0

Dump of file SATURN:[PCCOMMON.DUMP.DLL]SAFREE2.TMP;1 on 18-APR-1990 10:52:15.22
File ID (908,21,0)   End of file block 53 / Allocated 56

Virtual block number 29 (0000001D), 512 (0200) bytes

 00000000 00000000 00000000 00000000 00000000 00000000 00000000 00000000 ................................ 000000
 00000000 00000000 00000000 00000000 00000000 00000000 00000000 00000000 ................................ 000020
 00000000 00000000 00000000 00000000 00000000 00000000 00000000 00000000 ................................ 000040
 00000000 00000000 00000000 00000000 00000000 00000000 00000000 00000000 ................................ 000060
 00000000 00000000 00000000 00000000 00000000 00000000 00000000 00000000 ................................ 000080
 00000000 00000000 00000000 00000000 00000000 00000000 00000000 00000000 ................................ 0000A0
 00000000 00000000 00000000 00000000 00000000 00000000 00000000 00000000 ................................ 0000C0
 00000000 00000000 00000000 00000000 00000000 00000000 00000000 00000000 ................................ 0000E0
 00000000 00000000 00000000 00000000 00000000 00000000 00000000 00000000 ................................ 000100
 00000000 00000000 00000000 00000000 00000000 00000000 00000000 00000000 ................................ 000120
 00000000 00000000 00000200 00010000 00000000 00000000 00000000 00000000 ................................ 000140
 00000000 00000000 00000000 00000000 00000000 00000000 00000000 00000000 ................................ 000160
 00000000 00000000 00000000 00000000 00000000 00000000 00000000 00000000 ................................ 000180
 00000000 00000000 00000000 00000000 00000000 00000000 00000000 00000000 ................................ 0001A0
 00000000 00000000 00000000 00000000 00000000 00000000 00000000 00000000 ................................ 0001C0
 00000000 00000000 00000000 00000000 00000000 00000000 00000000 00000000 ................................ 0001E0
```

```
Dump of file SATURN:[PCCOMMON.DUMP.DLL]SAFREE2.TMP;1 on 18-APR-1990 10:52:15.22
File ID (908,21,0)   End of file block 53 / Allocated 56

Virtual block number 30 (0000001E), 512 (0200) bytes

00000000 00000000 00000000 00000000 00000000 00000000 00000000 00000000 ................................ 000000
00000000 00000000 00000000 00000000 00000000 00000000 00000000 00000000 ................................ 000020
00000000 00000000 00000000 00000000 00000000 00000000 00000000 00000000 ................................ 000040
00000000 00000000 00000000 00000000 00000000 00000000 00000000 00000000 ................................ 000060
00000000 00000000 00000000 00000000 00000000 00000000 00000000 00000000 ................................ 000080
00000000 00000000 00000000 00000000 00000000 00000000 00000000 00000000 ................................ 0000A0
00000000 00000000 00000000 00000000 00000000 00000000 00000000 00000000 ................................ 0000C0
00000000 00000000 00000000 00000000 00000000 00000000 00000000 00000000 ................................ 0000E0
00000000 00000000 00000000 00000000 00000000 00000000 00000000 00000000 ................................ 000100
00000000 00000000 00000000 00000000 00000000 00000000 00000000 00000000 ................................ 000120
00000000 00000000 00000000 00000000 00000000 00000000 00000000 00000000 ................................ 000140
00000000 00000000 00000000 00000000 00000000 00000000 00000000 00000000 ................................ 000160
00000000 00000000 00000000 00000000 00000000 00000000 00000000 00000000 ................................ 000180
00000000 00000000 00000000 00000000 00000000 00000000 00000000 00000000 ................................ 0001A0
00000000 00000000 00000000 00000000 00000000 00000000 00000000 00000000 ................................ 0001C0
00000000 00000000 00000000 00000000 00000000 00000000 00000000 00000000 ................................ 0001E0

Dump of file SATURN:[PCCOMMON.DUMP.DLL]SAFREE2.TMP;1 on 18-APR-1990 10:52:15.22
File ID (908,21,0)   End of file block 53 / Allocated 56

Virtual block number 31 (0000001F), 512 (0200) bytes

00000000 00000000 00000000 00000000 00000000 00000000 00000000 00000000 ................................ 000000
00000000 00000000 00000000 00000000 00000000 00000000 00000000 00000000 ................................ 000020
00000000 00000000 00000000 00000000 00000000 00000000 00000000 00000000 ................................ 000040
00000000 00000000 00000000 00000000 00000000 00000000 00000000 00000000 ................................ 000060
00000000 00000000 00000000 00000000 00000000 00000000 00000000 00000000 ................................ 000080
00000000 00000000 00000000 00000000 00000000 00000000 00000000 00000000 ................................ 0000A0
00000000 00000000 00000000 00000000 00000000 00000000 00000000 00000000 ................................ 0000C0
00000000 00000000 00000000 00000000 00000000 00000000 00000000 00000000 ................................ 0000E0
00000000 00000000 00000000 00000000 00000000 00000000 00000000 00000000 ................................ 000100
00000000 00000000 00000000 00000000 00000000 00000000 00000000 00000000 ................................ 000120
00000000 00000000 00000000 00000000 00000000 00000000 00000000 00000000 ................................ 000140
00000000 00000000 00000000 00000000 00000000 00000000 00000000 00000000 ................................ 000160
00000000 00000000 00000000 00000000 00000000 00000000 00000000 00000000 ................................ 000180
00000000 00000000 00000000 00000000 00000000 00000000 00000000 00000000 ................................ 0001A0
00000000 00000000 00000000 00000000 00000000 00000000 00000000 00000000 ................................ 0001C0
00000000 00000000 00000000 00000000 00000000 00000000 00000000 00000000 ................................ 0001E0

Dump of file SATURN:[PCCOMMON.DUMP.DLL]SAFREE2.TMP;1 on 18-APR-1990 10:52:15.22
File ID (908,21,0)   End of file block 53 / Allocated 56

Virtual block number 32 (00000020), 512 (0200) bytes

00000000 00000000 00000000 00000000 00000000 00000000 00000000 00000000 ................................ 000000
00000000 00000000 00000000 00000000 00000000 00000000 00000000 00000000 ................................ 000020
00000000 00000000 00000000 00000000 00000000 00000000 00000000 00000000 ................................ 000040
00000000 00000000 00000000 00000000 00000000 00000000 00000000 00000000 ................................ 000060
00000000 00000000 00000000 00000000 00000000 00000000 00000000 00000000 ................................ 000080
00000000 00000000 00000000 00000000 00000000 00000000 00000000 00000000 ................................ 0000A0
00000000 00000000 00000000 00000000 00000000 00000000 00000000 00000000 ................................ 0000C0
00000000 00000000 00000000 00000000 00000000 00000000 00000000 00000000 ................................ 0000E0
00000000 00000000 00000000 00000000 00000000 00000000 00000000 00000000 ................................ 000100
00000000 00000000 00000000 00000000 00000000 00000000 00000000 00000000 ................................ 000120
00010000 00000000 00000000 00000000 007C1096 00000000 00000000 00000000 ..............|................. 000140
00000000 00000000 00000000 00000000 00000000 00000000 00008181 81010000 ................................ 000160
00000000 00000000 00000000 00000000 00000000 00000000 00000000 00000000 ................................ 000180
00000000 00000000 00000000 00000000 00000000 00000000 00000000 00000000 ................................ 0001A0
00000000 00000000 00000000 00000000 00000000 00000000 00000000 00000000 ................................ 0001C0
00000000 00000000 00000000 00000000 00000000 00000000 00000000 00000000 ................................ 0001E0
```

```
Dump of file SATURN:[PCCOMMON.DUMP.DLL]SAFREE2.TMP;1 on 18-APR-1990 10:52:15.22
File ID (908,21,0)   End of file block 53 / Allocated 56

Virtual block number 33 (00000021), 512 (0200) bytes

 00000000 00000000 00000000 00000000 00000000 00000000 00000000 00000000 ................................ 000000
 00000000 00000000 00000000 00000000 00000000 00000000 00000000 00000000 ................................ 000020
 00000000 00000000 00000000 00000000 00000000 00000000 00000000 00000000 ................................ 000040
 0A0A0A0A 0A0A0A0A 0A0A0A0A 0A0A0A0A 0A0A0A0A 0A0A0A0A 0A0A0A0A 0A000000 ................................ 000060
 0A0A0A0A 0A0A0A0A 0A0A0A0A 0A0A0A0A 0A0A0A0A 0A0A0A0A 0A0A0A0A 0A0A0A0A ................................ 000080
 0A0A0A0A 0A0A0A0A 0A0A0A0A 0A0A0A0A 0A0A0A0A 0A0A0A0A 0A0A0A0A 0A0A0A0A ................................ 0000A0
 0A0A0A0A 0A0A0A0A 0A0A0A0A 0A0A0A0A 0A0A0A0A 0A0A0A0A 0A0A0A0A 0A0A0A0A ................................ 0000C0
 0A0A0A0A 0A0A0A0A 0A0A0A0A 0A0A0A0A 0A0A0A0A 0A0A0A0A 0A0A0A0A 0A0A0A0A ................................ 0000E0
 0A0A0A0A 0A0A0A0A 0A0A0A0A 0A0A0A0A 0A0A0A0A 0A0A0A0A 0A0A0A0A 0A0A0A0A ................................ 000100
 0A0A0A0A 0A0A0A0A 0A0A0A0A 0A0A0A0A 0A0A0A0A 0A0A0A0A 0A0A0A0A 0A0A0A0A ................................ 000120
 0A0A0A0A 0A0A0A0A 0A0A0A0A 0A0A0A0A 0A0A0A0A 0A0A0A0A 0A0A0A0A 0A0A0A0A ................................ 000140
 00000000 00000000 00000000 00000000 00000000 00000000 00000000 000A0A0A ................................ 000160
 FFFFFFFF 04A014FA 00000000 00000000 00000000 00000000 20000000 00000000 ....... ................•....... 000180
 6F6C6672 65766F20 68636174 73202D0A 0D303030 36520000 3E3E4753 4D4E3C3C <<NMSG>>..R6000..- stack overflo 0001A0
 79622065 64697669 64207265 6765746E 69202D0A 0D333030 36520003 000A0D77 w.....R6003..- integer divide by 0001C0
 65636170 73206867 756F6E65 20746F6E 202D0A0D 38303036 52000800 0A0D3020  0.....R6008..- not enough space 0001E0

Dump of file SATURN:[PCCOMMON.DUMP.DLL]SAFREE2.TMP;1 on 18-APR-1990 10:52:15.22
File ID (908,21,0)   End of file block 53 / Allocated 56

Virtual block number 34 (00000022), 512 (0200) bytes

 20746F6E 202D0A0D 39303036 52000900 0A0D7374 6E656D75 67726120 726F6620  for arguments.....R6009..- not  000000
 FC000A0D 746E656D 6E6F7269 766E6520 726F6620 65636170 73206867 756F6E65 enough space for environment...• 000020
 2D0A0D32 30303652 00020020 726F7272 6520656D 69742D6E 757200FF 000A0D00 ......run-time error ...R6002..- 000040
 FFFFFF00 0A0D6465 64616F6C 20746F6E 20746E69 6F702067 6E697461 6F6C6620  floating point not loaded...... 000060
 00000000 00000000 0005169E 00020000 000404B0 00020000 000318EA 00020003 ....õ.......-................... 000080
 0000000C 00000438 00200020 0000001A 49430000 00000000 00780000 00284142 BA(...x.......CI.... . .8....... 0000A0
 0000000C 00000838 00200020 0000001A 4943FFFF FF000000 00010001 00800040 a.............CI.... . .8....... 0000C0
 FFFF0000 FFFF00FF 00FF00FF FF000000 00FFFFFF FF000000 00040001 00400040 a.a............................. 0000E0
 00F00000 00284142 C0C0C078 34000080 80008000 80008080 00000000 80404040 aaa................4xâââBA(...b. 000100
 00010001 00400020 0000000C 00001038 00100010 0000001A 494301E0 02800000 ....Å.CI........8....... .a..... 000120
 00040001 00200020 0000000C 00001138 00100010 0000001A 4943FFFF FF000000 ......CI........8....... . ..... 000140
 00000000 80404040 FFFF0000 FFFF00FF 00FF00FF FF000000 00FFFFFF FF000000 ..........................aaa..... 000160
 49430300 04000000 00000000 00284142 C0C0C078 34000080 80008000 80008080 ...........4xâââBA(...........CI 000180
 4943FFFF FF000000 00010001 00800040 0000000C 00001338 00200020 0000001A .... . .8.......a.............CI 0001A0
 66663131 31000000 00080001 00400040 0000000C 00001738 00200020 0000001A .... . .8.......a.a........111ff 0001C0
 F3E5E4FF FFD688AF D4CF8CE8 B8FFFFBF FF000000 4080FFFF FFCECECE 99999966 f...ööö....a....¢..ÈÒ¥üåÉ¦ø..ðÌµ 0001E0

Dump of file SATURN:[PCCOMMON.DUMP.DLL]SAFREE2.TMP;1 on 18-APR-1990 10:52:15.22
File ID (908,21,0)   End of file block 53 / Allocated 56

Virtual block number 35 (00000023), 512 (0200) bytes

 FFFFFFFF FFFFFFFF FFFFFFFF FFFFFFFF FFFFFFFF FFFFFFFF 0000FFFF FF00FFBD §............................... 000000
 FFFFFFFF FFFFFFFF FFFFFFFF FFFFFFFF FFFFFFFF FFFFFFFF FFFFFFFF FFFFFFFF ................................ 000020
 FFFFFFFF FFFFFFFF FFFFFFFF FFFFFFFF FFFFFFFF FFFFFFFF FFFFFFFF FFFFFFFF ................................ 000040
 FFFFFFFF FFFFFFFF FFFFFFFF FFFFFFFF FFFFFFFF FFFFFFFF FFFFFFFF FFFFFFFF ................................ 000060
 FFFFFFFF FFFFFFFF FFFFFFFF FFFFFFFF FFFFFFFF FFFFFFFF FFFFFFFF FFFFFFFF ................................ 000080
 FFFFFFFF FFFFFFFF FFFFFFFF FFFFFFFF FFFFFFFF FFFFFFFF FFFFFFFF FFFFFFFF ................................ 0000A0
 FFFFFFFF FFFFFFFF FFFFFFFF FFFFFFFF FFFFFFFF FFFFFFFF FFFFFFFF FFFFFFFF ................................ 0000C0
 FFFFFFFF FFFFFFFF FFFFFFFF FFFFFFFF FFFFFFFF FFFFFFFF FFFFFFFF FFFFFFFF ................................ 0000E0
 FFFFFFFF FFFFFFFF FFFFFFFF FFFFFFFF FFFFFFFF FFFFFFFF FFFFFFFF FFFFFFFF ................................ 000100
 FFFFFFFF FFFFFFFF FFFFFFFF FFFFFFFF FFFFFFFF FFFFFFFF FFFFFFFF FFFFFFFF ................................ 000120
 FFFFFFFF FFFFFFFF FFFFFFFF FFFFFFFF FFFFFFFF FFFFFFFF FFFFFFFF FFFFFFFF ................................ 000140
 FFFFFFFF FFFFFFFF FFFFFFFF FFFFFFFF FFFFFFFF FFFFFFFF FFFFFFFF FFFFFFFF ................................ 000160
 FFFFFFFF FFFFFFFF FFFFFFFF FFFFFFFF FFFFFFFF FFFFFFFF FFFFFFFF FFFFFFFF ................................ 000180
 FFFFFFFF FFFFFFFF FFFFFFFF FFFFFFFF FFFFFFFF FFFFFFFF FFFFFFFF FFFFFFFF ................................ 0001A0
 FFFFFFFF FFFFFFFF FFFFFFFF FFFFFFFF FFFFFFFF FFFFFFFF FFFFFFFF FFFFFFFF ................................ 0001C0
 FFFFFFFF FFFFFFFF FFFFFFFF FFFFFFFF FFFFFFFF FFFFFFFF FFFFFFFF FFFFFFFF ................................ 0001E0
```

```
Dump of file SATURN:[PCCOMMON.DUMP.DLL]SAFREE2.TMP;1 on 18-APR-1990 10:52:15.22
File ID (908,21,0)   End of file block 53 / Allocated 56

Virtual block number 36 (00000024), 512 (0200) bytes

 FFFFFFFF FFFFFFFF FFFFFFFF FFFFFFFF FFFFFFFF FFFFFFFF FFFFFFFF FFFFFFFF ................................ 000000
 FFFFFFFF FFFFFFFF FFFFFFFF FFFFFFFF FFFFFFFF FFFFFFFF FFFFFFFF FFFFFFFF ................................ 000020
 FFFFFFFF FFFFFFFF FFFFFFFF FFFFFFFF FFFFFFFF FFFFFFFF FFFFFFFF FFFFFFFF ................................ 000040
 FFFFFFFF FFFFFFFF FFFFFFFF FFFFFFFF FFFFFFFF FFFFFFFF FFFFFFFF FFFFFFFF ................................ 000060
 FFFFFFFF FFFFFFFF FFFFFFFF FFFFFFFF FFFFFFFF FFFFFFFF FFFFFFFF FFFFFFFF ................................ 000080
 FFFFFFFF FFFFFFFF FFFFFFFF FFFFFFFF FFFFFFFF FFFFFFFF FFFFFFFF FFFFFFFF ................................ 0000A0
 00000000 00000000 FFFFFFFF FFFFFFFF FFFFFFFF FFFFFFFF FFFFFFFF FFFFFFFF ................................ 0000C0
 00000000 00000000 00000000 00000000 00000000 00000000 00000000 00000000 ................................ 0000E0
 00000000 00000000 00000000 00000000 00000000 00000000 00000000 00000000 ................................ 000100
 00000000 00000000 00000000 00000000 00000000 00000000 00000000 00000000 ................................ 000120
 00000000 00000000 00000000 00000000 00000000 00000000 00000000 00000000 ................................ 000140
 00000000 00000000 00000000 00000000 00000000 00000000 00000000 00000000 ................................ 000160
 00000000 00000000 00000000 00000000 00000000 00000000 00000000 00000000 ................................ 000180
 00000000 00000000 00000000 00000000 00000000 00000000 00000000 00000000 ................................ 0001A0
 00000000 00000000 00000000 00000000 00000000 00000000 00000000 00000000 ................................ 0001C0
 00000000 00000000 00000000 00000000 00000000 00000000 00000000 00000000 ................................ 0001E0

Dump of file SATURN:[PCCOMMON.DUMP.DLL]SAFREE2.TMP;1 on 18-APR-1990 10:52:15.22
File ID (908,21,0)   End of file block 53 / Allocated 56

Virtual block number 37 (00000025), 512 (0200) bytes

 00000000 00000000 00000000 00000000 00000000 00000000 00000000 00000000 ................................ 000000
 00000000 00000000 00000000 00000000 00000000 00000000 00000000 00000000 ................................ 000020
 00000000 00000000 00000000 00000000 00000000 00000000 00000000 00000000 ................................ 000040
 00000000 00000000 00000000 00000000 00000000 00000000 00000000 00000000 ................................ 000060
 00000000 00000000 00000000 00000000 00000000 00000000 00000000 00000000 ................................ 000080
 00000000 00000000 00000000 00000000 00000000 00000000 00000000 00000000 ................................ 0000A0
 FFFFFFFF FF3FFFFF 00000000 00000000 00000000 00000000 00000000 00000000 ..........................?..... 0000C0
 FF030000 803FFFFF FF070000 C03FFFFF FF0F0000 E03FFFFF FFFFFFFF FF3FFFFF ..?.......?Å......?å......?..... 0000E0
 FF030000 003FFFFF FF030000 0000FFFF FF030000 0000FFFF FF030000 003FFFFF ..?.......................?..... 000100
 FFFFFFFF FF3FFFFF FF1F0000 C03FFFFF FF0F0000 803FFFFF FF070000 003FFFFF ..?.......?.......?å......?..... 000120
 FF0F0000 E03FFFFF FFFFFFFF FF3FFFFF FFFFFFFF FF3FFFFF FFFFFFFF FF3FFFFF ..?.......?.......?.......?Å.... 000140
 FF030000 0000FFFF FF030000 003FFFFF FF030000 803FFFFF FF070000 C03FFFFF ..?å......?.......?............. 000160
 FF0F0000 803FFFFF FF070000 003FFFFF FF030000 003FFFFF FF030000 0000FFFF ..........?.......?.......?..... 000180
 FFFFFFFF FF3FFFFF FFFFFFFF FF3FFFFF FFFFFFFF FF3FFFFF FF1F0000 C03FFFFF ..?å......?.......?.......?..... 0001A0
 FF030000 803FFFFF FF070000 C03FFFFF FF0F0000 E03FFFFF FFFFFFFF FF3FFFFF ..?.......?Å......?å......?..... 0001C0
 FF030000 003FFFFF FF030000 0000FFFF FF030000 0000FFFF FF030000 003FFFFF ..?.......................?..... 0001E0

Dump of file SATURN:[PCCOMMON.DUMP.DLL]SAFREE2.TMP;1 on 18-APR-1990 10:52:15.22
File ID (908,21,0)   End of file block 53 / Allocated 56

Virtual block number 38 (00000026), 512 (0200) bytes

 FFFFFFFF FF3FFFFF FF1F0000 C03FFFFF FF0F0000 803FFFFF FF070000 003FFFFF ..?.......?.......?å......?..... 000000
 0F000000 000000E0 FFFFFFFF FF3FFFFF FFFFFFFF FF3FFFFF FFFFFFFF FF3FFFFF ..?.......?.......?.....Å....... 000020
 03000000 00000000 03000000 00000000 03000000 00000080 07000000 000000C0 å............................... 000040
 03000000 00000000 03000000 00000000 03000000 00000000 03000000 00000000 ................................ 000060
 FFFFFFFF FFFFFFFF 1F000000 000000C0 0F000000 00000080 07000000 00000000 ................å............... 000080
 FFFFFFFF FFFFFFFF FFFFFFFF FFFFFFFF FFFFFFFF FFFFFFFF FFFFFFFF FFFFFFFF ................................ 0000A0
 00000000 00000000 FFFFFFFF FFFFFFFF FFFFFFFF FFFFFFFF FFFFFFFF FFFFFFFF ................................ 0000C0
 00000000 00000000 00000000 00000000 00000000 00000000 00000000 00000022 "............................... 0000E0
 00000000 00000000 00000000 00000000 00000000 00000000 00000000 00000022 "............................... 000100
 00000000 00000000 00000000 00001211 11111111 11111111 11110200 00000022 "............................... 000120
 00000000 00000000 00000000 00101111 11111111 11111111 11111100 00000022 "............................... 000140
 00000000 00000000 00000000 00121111 11111111 11111111 11111101 00000022 "............................... 000160
 00000000 00000000 00000000 00111111 11111111 11111111 11111121 00000022 "...!............................ 000180
 00000000 00000000 00000000 00111153 55555555 55555555 55553511 22222222 """".SUUUUUUUUUUS............... 0001A0
 00000000 00000000 00000000 00111155 55555555 55555555 55555511 22222222 """".UUUUUUUUUUUU............... 0001C0
 00000000 00000000 00000000 00121155 55555555 55555555 55555511 00000022 "....UUUUUUUUUUUU............... 0001E0
```

```
Dump of file SATURN:[PCCOMMON.DUMP.DLL]SAFREE2.TMP;1 on 18-APR-1990 10:52:15.22
File ID (908,21,0)   End of file block 53 / Allocated 56

Virtual block number 39 (00000027), 512 (0200) bytes

 00000000 00000000 00000000 00101153 55555555 55555555 55553521 00000022 "...15UUUUUUUUUUS............... 000000
 00000000 00000000 00000000 00001111 11111111 11111111 11111101 00000022 "............................... 000020
 00000000 00000000 00000000 00002011 11111111 11111111 11112100 00000022 "....!........... .............. 000040
 00000000 00000000 00000000 00000000 00000000 00000000 00000000 00000022 "............................... 000060
 00000000 00000000 00000000 00000000 00000000 00000000 00000000 00000022 "............................... 000080
 00000000 00000000 00000000 00000000 00000000 00000000 00000000 00000022 "............................... 0000A0
 00000000 00000000 00000000 00000000 00000000 00000000 00000000 00000022 "............................... 0000C0
 00000000 00000000 00000000 00001211 11111111 11111111 11110200 00000022 "............................... 0000E0
 00000000 00000000 00000000 00101111 11111111 11111111 11111100 00000022 "............................... 000100
 00000000 00000000 00000000 00121111 11111111 11111111 11111101 00000022 "............................... 000120
 00000000 00000000 00000000 00111111 11111111 11111111 11111121 00000022 "...!........................... 000140
 00000000 00000000 00000000 00111153 55555555 55555555 55553511 22222222 """"".5UUUUUUUUUUS............... 000160
 00000000 00000000 00000000 00111155 55555555 55555555 55555511 22222222 """"".UUUUUUUUUUUU............... 000180
 00000000 00000000 00000000 00121155 55555555 55555555 55555511 00000022 "....UUUUUUUUUUUU............... 0001A0
 00000000 00000000 00000000 00101153 55555555 55555555 55553521 00000022 "...15UUUUUUUUUUS............... 0001C0
 00000000 00000000 00000000 00001111 11111111 11111111 11111101 00000022 "............................... 0001E0

Dump of file SATURN:[PCCOMMON.DUMP.DLL]SAFREE2.TMP;1 on 18-APR-1990 10:52:15.22
File ID (908,21,0)   End of file block 53 / Allocated 56

Virtual block number 40 (00000028), 512 (0200) bytes

 00000000 00000000 00000000 00002011 11111111 11111111 11112100 00000022 "....!........... .............. 000000
 00000000 00000000 00000000 00000000 00000000 00000000 00000000 00000022 "............................... 000020
 00000000 00000000 00000000 00000000 00000000 00000000 00000000 00000022 "............................... 000040
 00000000 00000000 00000000 00000000 00000000 00000000 00000000 00000022 "............................... 000060
 00000000 00000000 00000000 00000000 00000000 00000000 00000000 00000022 "............................... 000080
 00000000 00000000 00000000 00001211 11111111 11111111 11110200 00000022 "............................... 0000A0
 00000000 00000000 00000000 00101111 11111111 11111111 11111100 00000022 "............................... 0000C0
 00000000 00000000 00000000 00121111 11111111 11111111 11111101 00000022 "............................... 0000E0
 00000000 00000000 00000000 00111111 11111111 11111111 11111121 00000022 "...!........................... 000100
 00000000 00000000 00000000 00111153 55555555 55555555 55553511 22222222 """"".5UUUUUUUUUUS............... 000120
 00000000 00000000 00000000 00111155 55555555 55555555 55555511 22222222 """"".UUUUUUUUUUUU............... 000140
 00000000 00000000 00000000 00121155 55555555 55555555 55555511 00000022 "....UUUUUUUUUUUU............... 000160
 00000000 00000000 00000000 00101153 55555555 55555555 55553521 00000022 "...15UUUUUUUUUUS............... 000180
 00000000 00000000 00000000 00001111 11111111 11111111 11111101 00000022 "............................... 0001A0
 00000000 00000000 00000000 00002011 11111111 11111111 11112100 00000022 "....!........... .............. 0001C0
 00000000 00000000 00000000 00000000 00000000 00000000 00000000 00000022 "............................... 0001E0

Dump of file SATURN:[PCCOMMON.DUMP.DLL]SAFREE2.TMP;1 on 18-APR-1990 10:52:15.22
File ID (908,21,0)   End of file block 53 / Allocated 56

Virtual block number 41 (00000029), 512 (0200) bytes

 00000000 00000000 00000000 00000000 00000000 00000000 00000000 00000022 "............................... 000000
 00000000 00000000 00000000 00000000 00000000 00000000 00000000 00000022 "............................... 000020
 11111111 11110200 00000000 00000000 00000000 00000000 00000000 00000022 "............................... 000040
 11111111 11111100 00001211 11111111 11111111 11111111 11111101 11111122 "............................... 000060
 11111111 11111101 00101111 11111111 11111111 11111111 11111111 11111122 "............................... 000080
 11111111 11111121 00121111 11111111 11111111 11111111 11111111 11111111 ........................!....... 0000A0
 55555555 55553511 00111111 11111111 11111111 11111111 11111111 11111111 ..........................5UUUUUU 0000C0
 55555555 55555511 00111153 55555555 55555555 55555555 55555555 55555555 UUUUUUUUUUUUUUUUUUUUS....UUUUUUU 0000E0
 55555555 55555511 00111155 55555555 55555555 55555555 55555555 55555555 UUUUUUUUUUUUUUUUUUUUU....UUUUUUU 000100
 55555555 55555511 00111155 55555555 55555555 55555555 55555555 55555555 UUUUUUUUUUUUUUUUUUUUU....UUUUUUU 000120
 55555555 55555511 00111155 55555555 55555555 55555555 55555555 55555555 UUUUUUUUUUUUUUUUUUUUU....UUUUUUU 000140
 55555555 55553521 00121155 55555555 55555555 55555555 55555555 55555555 UUUUUUUUUUUUUUUUUUUUU...15UUUUUU 000160
 11111111 11111101 00101153 55555555 55555555 55555555 55555555 55555555 UUUUUUUUUUUUUUUUUUUUS........... 000180
 11111111 11112100 00001111 11111111 11111111 11111111 11111111 11111111 ........................!...... 0001A0
 00000000 00000000 00002011 11111111 11111111 11111111 11111111 11111111 ..................... .......... 0001C0
 00000000 00000000 00000000 00000000 00000000 00000000 00000000 00000000 ................................ 0001E0
```

```
Dump of file SATURN:[PCCOMMON.DUMP.DLL]SAFREE2.TMP;1 on 18-APR-1990 10:52:15.22
File ID (908,21,0)   End of file block 53 / Allocated 56

Virtual block number 42 (0000002A), 512 (0200) bytes

 00000000 00000000 00000000 00000000 00000000 00000000 00000000 00000000 ................................ 000000
 00000000 00000000 00000000 00000000 00000000 00000000 00000000 00000000 ................................ 000020
 00000000 00000000 00000000 00000000 00000000 00000000 00000000 00000000 ................................ 000040
 00000000 00000000 00000000 00000000 00000000 00000000 00000000 00000000 ................................ 000060
 00000000 00000000 00000000 00000000 00000000 00000000 00000000 00000000 ................................ 000080
 00000000 00000000 00000000 00000000 00000000 00000000 00000000 00000000 ................................ 0000A0
 00000000 00000000 00000000 00000000 00000000 00000000 00000000 00000000 ................................ 0000C0
 00000000 00000000 00000000 00000000 00000000 00000000 00000000 00000000 ................................ 0000E0
 00000000 00000000 00000000 00000000 00000000 00000000 00000000 00000000 ................................ 000100
 00000000 00000000 00000000 00000000 00000000 00000000 00000000 00000000 ................................ 000120
 1F0078FF FFFF7FFF 00000000 00000000 00000000 00000000 00000000 00000000 .............................x.. 000140
 0F0070FF 1F0078FF FFFF7FFF FFFF7FFF 1F0078FF 0F0070FF 0F0000FF 0F0070FF .p.......p...x...........x...p.. 000160
 0F0000FF 0F0070FF 1F0078FF FFFF7FFF FFFF7FFF 1F0078FF 0F0070FF 0F0000FF .....p...x...........x...p...... 000180
 01000000 01000000 01000000 03000080 FFFF7FFF FFFF7FFF 1F0078FF 0F0070FF .p...x.......................... 0001A0
 00000080 00000000 FFFFFFFF FFFFFFFF FFFFFFFF FFFFFFFF 03000080 01000000 ................................ 0001C0
 88880080 00000000 00008088 88888888 88080080 00000000 00000000 00000000 ................................ 0001E0

Dump of file SATURN:[PCCOMMON.DUMP.DLL]SAFREE2.TMP;1 on 18-APR-1990 10:52:15.22
File ID (908,21,0)   End of file block 53 / Allocated 56

Virtual block number 43 (0000002B), 512 (0200) bytes

 11810080 00000000 00008811 11111111 11818888 00000000 00008888 88888888 ................................ 000000
 00000080 00000000 00008088 88888888 88080080 00000000 00008811 11111111 ................................ 000020
 88080080 00000000 00000000 00000000 00000080 00000000 00000000 00000000 ................................ 000040
 11818888 00000000 00008888 88888888 88880080 00000000 00008088 88888888 ................................ 000060
 88080080 00000000 00008811 11111111 11810080 00000000 00008811 11111111 ................................ 000080
 00000080 00000000 00000000 00000000 00000080 00000000 00008088 88888888 ................................ 0000A0
 88880080 00000000 00008088 88888888 88080080 00000000 00000000 00000000 ................................ 0000C0
 11810080 00000000 00008811 11111111 11818888 00000000 00008888 88888888 ................................ 0000E0
 00000080 00000000 00008088 88888888 88080080 00000000 00008811 11111111 ................................ 000100
 88888888 88888808 00000000 00000000 00000080 00000000 00000000 00000000 ................................ 000120
 11111111 11111181 80888888 88888888 88888888 88888888 00888888 88888888 ................................ 000140
 11111111 11111181 80181111 11111111 11111111 11111181 80181111 11111111 ................................ 000160
 00000000 00000000 00888888 88888888 88888888 88888808 80181111 11111111 ................................ 000180
 00000000 00000000 00000000 00000000 00000000 00000000 00000000 00000000 ................................ 0001A0
 00000000 00000000 00000000 00000000 00000000 00000000 00000000 00000000 ................................ 0001C0
 00000000 00000000 00000000 00000000 00000000 00000000 00000000 00000000 ................................ 0001E0

Dump of file SATURN:[PCCOMMON.DUMP.DLL]SAFREE2.TMP;1 on 18-APR-1990 10:52:15.22
File ID (908,21,0)   End of file block 53 / Allocated 56

Virtual block number 44 (0000002C), 512 (0200) bytes

 00000000 00000000 00000000 00000000 00000000 00000000 00000000 00000000 ................................ 000000
 00000000 00000000 00000000 00000000 00000000 00000000 00000000 00000000 ................................ 000020
 00000000 00000000 00000000 00000000 00000000 00000000 00000000 00000000 ................................ 000040
 00000000 00000000 00000000 00000000 00000000 00000000 00000000 00000000 ................................ 000060
 00000000 00000000 00000000 00000000 00000000 00000000 00000000 00000000 ................................ 000080
 00000000 00000000 00000000 00000000 00000000 00000000 00000000 00000000 ................................ 0000A0
 00000000 00000000 00000000 00000000 00000000 00000000 00000000 00000000 ................................ 0000C0
 00000000 00000000 00000000 00000000 00000000 00000000 00000000 00000000 ................................ 0000E0
 00000000 00000000 00000000 00000000 00000000 00000000 00000000 00000000 ................................ 000100
 00000000 00000000 00000000 00000000 00000000 00000000 00000000 00000000 ................................ 000120
 00000000 00000000 00000000 00000000 00000000 00000000 00000000 00000000 ................................ 000140
 00000000 00000000 00000000 00000000 00000000 00000000 00000000 00000000 ................................ 000160
 00000000 00000000 00000000 00000000 00000000 00000000 00000000 00000000 ................................ 000180
 00000000 00000000 00000000 00000000 00000000 00000000 00000000 00000000 ................................ 0001A0
 FFFFFFFF FF3FFFFF 00000000 00000000 00000000 00000000 00000000 00000000 ...........................?.... 0001C0
 FF030000 803FFFFF FF070000 C03FFFFF FF0F0000 E03FFFFF FFFFFFFF FF3FFFFF ..?.......?À......?à......?..... 0001E0
```

```
Dump of file SATURN:[PCCOMMON.DUMP.DLL]SAFREE2.TMP;1 on 18-APR-1990 10:52:15.22
File ID (908,21,0)   End of file block 53 / Allocated 56

Virtual block number 45 (0000002D), 512 (0200) bytes

 FF030000 003FFFFF FF030000 0000FFFF FF030000 0000FFFF FF030000 003FFFFF ..?.......................?..... 000000
 FFFFFFFF FF3FFFFF FF1F0000 C03FFFFF FF0F0000 803FFFFF FF070000 003FFFFF ..?.......?.......?â......?..... 000020
 FF0F0000 E03FFFFF FFFFFFFF FF3FFFFF FFFFFFFF FF3FFFFF FFFFFFFF FF3FFFFF ..?.......?.......?.......?Â.... 000040
 FF030000 0000FFFF FF030000 003FFFFF FF030000 803FFFFF FF070000 C03FFFFF ..?â......?.......?............. 000060
 FF0F0000 803FFFFF FF070000 003FFFFF FF030000 003FFFFF FF030000 0000FFFF ..........?.......?.......?..... 000080
 FFFFFFFF FF3FFFFF FFFFFFFF FF3FFFFF FFFFFFFF FF3FFFFF FF1F0000 C03FFFFF ..?â......?.......?.......?..... 0000A0
 FF030000 803FFFFF FF070000 C03FFFFF FF0F0000 E03FFFFF FFFFFFFF FF3FFFFF ..?.......?Â......?â......?..... 0000C0
 FF030000 003FFFFF FF030000 0000FFFF FF030000 0000FFFF FF030000 003FFFFF ..?.......................?..... 0000E0
 FFFFFFFF FF3FFFFF FF1F0000 C03FFFFF FF0F0000 803FFFFF FF070000 003FFFFF ..?.......?.......?â......?..... 000100
 0F000000 000000E0 FFFFFFFF FF3FFFFF FFFFFFFF FF3FFFFF FFFFFFFF FF3FFFFF ..?.......?.......?.....Â....... 000120
 03000000 00000000 03000000 00000000 03000000 00000080 07000000 000000C0 â............................... 000140
 03000000 00000000 03000000 00000000 03000000 00000000 03000000 00000000 ................................ 000160
 FFFFFFFF FFFFFFFF 1F000000 000000C0 0F000000 00000080 07000000 00000000 ...............â................ 000180
 FFFFFFFF FFFFFFFF FFFFFFFF FFFFFFFF FFFFFFFF FFFFFFFF FFFFFFFF FFFFFFFF ................................ 0001A0
 00000000 00000000 FFFFFFFF FFFFFFFF FFFFFFFF FFFFFFFF FFFFFFFF FFFFFFFF ................................ 0001C0
 00000000 00000000 00000000 00000000 00000000 00000202 00000000 00000000 ................................ 0001E0

Dump of file SATURN:[PCCOMMON.DUMP.DLL]SAFREE2.TMP;1 on 18-APR-1990 10:52:15.22
File ID (908,21,0)   End of file block 53 / Allocated 56

Virtual block number 46 (0000002E), 512 (0200) bytes

 00000000 00000000 00000000 00000000 00000000 00000000 00000000 00000000 ................................ 000000
 00000000 00000000 00000000 00000000 00000000 00000202 00000000 00000000 ................................ 000020
 00000000 00000000 00000000 00000000 00000000 00000000 00000000 00000000 ................................ 000040
 01010101 01010101 01010101 02000000 00000000 00000202 00000000 00000000 ................................ 000060
 00000000 00000000 00000000 00000000 00000000 02010101 01010101 01010101 ................................ 000080
 01010101 01010101 01010101 01010000 00000000 00000202 00000000 00000000 ................................ 0000A0
 00000000 00000000 00000000 00000000 00000001 01010101 01010101 01010101 ................................ 0000C0
 01010101 01010101 01010101 01010100 00000000 00000202 00000000 00000000 ................................ 0000E0
 00000000 00000000 00000000 00000000 00000201 01010101 01010101 01010101 ................................ 000100
 01010101 01010101 01010101 01010102 00000000 00000202 00000000 00000000 ................................ 000120
 00000000 00000000 00000000 00000000 00000101 01010101 01010101 01010101 ................................ 000140
 05050505 05050505 05050505 05030101 02020202 02020202 00000000 00000000 ................................ 000160
 00000000 00000000 00000000 00000000 00000101 01010305 05050505 05050505 ................................ 000180
 05050505 05050505 05050505 05050101 02020202 02020202 00000000 00000000 ................................ 0001A0
 00000000 00000000 00000000 00000000 00000101 01010505 05050505 05050505 ................................ 0001C0
 05050505 05050505 05050505 05050101 00000000 00000202 00000000 00000000 ................................ 0001E0

Dump of file SATURN:[PCCOMMON.DUMP.DLL]SAFREE2.TMP;1 on 18-APR-1990 10:52:15.22
File ID (908,21,0)   End of file block 53 / Allocated 56

Virtual block number 47 (0000002F), 512 (0200) bytes

 00000000 00000000 00000000 00000000 00000201 01010505 05050505 05050505 ................................ 000000
 05050505 05050505 05050505 05030102 00000000 00000202 00000000 00000000 ................................ 000020
 00000000 00000000 00000000 00000000 00000001 01010305 05050505 05050505 ................................ 000040
 01010101 01010101 01010101 01010100 00000000 00000202 00000000 00000000 ................................ 000060
 00000000 00000000 00000000 00000000 00000000 01010101 01010101 01010101 ................................ 000080
 01010101 01010101 01010101 01020000 00000000 00000202 00000000 00000000 ................................ 0000A0
 00000000 00000000 00000000 00000000 00000000 00020101 01010101 01010101 ................................ 0000C0
 00000000 00000000 00000000 00000000 00000000 00000202 00000000 00000000 ................................ 0000E0
 00000000 00000000 00000000 00000000 00000000 00000000 00000000 00000000 ................................ 000100
 00000000 00000000 00000000 00000000 00000000 00000202 00000000 00000000 ................................ 000120
 00000000 00000000 00000000 00000000 00000000 00000000 00000000 00000000 ................................ 000140
 00000000 00000000 00000000 00000000 00000000 00000202 00000000 00000000 ................................ 000160
 00000000 00000000 00000000 00000000 00000000 00000000 00000000 00000000 ................................ 000180
 00000000 00000000 00000000 00000000 00000000 00000202 00000000 00000000 ................................ 0001A0
 00000000 00000000 00000000 00000000 00000000 00000000 00000000 00000000 ................................ 0001C0
 01010101 01010101 01010101 02000000 00000000 00000202 00000000 00000000 ................................ 0001E0
```

```
Dump of file SATURN:[PCCOMMON.DUMP.DLL]SAFREE2.TMP;1 on 18-APR-1990 10:52:15.22
File ID (908,21,0)   End of file block 53 / Allocated 56

Virtual block number 48 (00000030), 512 (0200) bytes

00000000 00000000 00000000 00000000 00000000 02010101 01010101 01010101 ................................ 000000
01010101 01010101 01010101 01010000 00000000 00000202 00000000 00000000 ................................ 000020
00000000 00000000 00000000 00000000 00000001 01010101 01010101 01010101 ................................ 000040
01010101 01010101 01010101 01010100 00000000 00000202 00000000 00000000 ................................ 000060
00000000 00000000 00000000 00000000 00000201 01010101 01010101 01010101 ................................ 000080
01010101 01010101 01010101 01010102 00000000 00000202 00000000 00000000 ................................ 0000A0
00000000 00000000 00000000 00000000 00000101 01010101 01010101 01010101 ................................ 0000C0
05050505 05050505 05050505 05030101 02020202 02020202 00000000 00000000 ................................ 0000E0
00000000 00000000 00000000 00000000 00000101 01010305 05050505 05050505 ................................ 000100
05050505 05050505 05050505 05050101 02020202 02020202 00000000 00000000 ................................ 000120
00000000 00000000 00000000 00000000 00000101 01010505 05050505 05050505 ................................ 000140
05050505 05050505 05050505 05050101 00000000 00000202 00000000 00000000 ................................ 000160
00000000 00000000 00000000 00000000 00000201 01010505 05050505 05050505 ................................ 000180
05050505 05050505 05050505 05030102 00000000 00000202 00000000 00000000 ................................ 0001A0
00000000 00000000 00000000 00000000 00000001 01010305 05050505 05050505 ................................ 0001C0
01010101 01010101 01010101 01010100 00000000 00000202 00000000 00000000 ................................ 0001E0

Dump of file SATURN:[PCCOMMON.DUMP.DLL]SAFREE2.TMP;1 on 18-APR-1990 10:52:15.22
File ID (908,21,0)   End of file block 53 / Allocated 56

Virtual block number 49 (00000031), 512 (0200) bytes

00000000 00000000 00000000 00000000 00000000 01010101 01010101 01010101 ................................ 000000
01010101 01010101 01010101 01020000 00000000 00000202 00000000 00000000 ................................ 000020
00000000 00000000 00000000 00000000 00000000 00020101 01010101 01010101 ................................ 000040
00000000 00000000 00000000 00000000 00000000 00000202 00000000 00000000 ................................ 000060
00000000 00000000 00000000 00000000 00000000 00000000 00000000 00000000 ................................ 000080
00000000 00000000 00000000 00000000 00000000 00000202 00000000 00000000 ................................ 0000A0
00000000 00000000 00000000 00000000 00000000 00000000 00000000 00000000 ................................ 0000C0
00000000 00000000 00000000 00000000 00000000 00000202 00000000 00000000 ................................ 0000E0
00000000 00000000 00000000 00000000 00000000 00000000 00000000 00000000 ................................ 000100
00000000 00000000 00000000 00000000 00000000 00000202 00000000 00000000 ................................ 000120
00000000 00000000 00000000 00000000 00000000 00000000 00000000 00000000 ................................ 000140
01010101 01010101 01010101 02000000 00000000 00000202 00000000 00000000 ................................ 000160
00000000 00000000 00000000 00000000 00000000 02010101 01010101 01010101 ................................ 000180
01010101 01010101 01010101 01010000 00000000 00000202 00000000 00000000 ................................ 0001A0
00000000 00000000 00000000 00000000 00000001 01010101 01010101 01010101 ................................ 0001C0
01010101 01010101 01010101 01010100 00000000 00000202 00000000 00000000 ................................ 0001E0

Dump of file SATURN:[PCCOMMON.DUMP.DLL]SAFREE2.TMP;1 on 18-APR-1990 10:52:15.22
File ID (908,21,0)   End of file block 53 / Allocated 56

Virtual block number 50 (00000032), 512 (0200) bytes

00000000 00000000 00000000 00000000 00000201 01010101 01010101 01010101 ................................ 000000
01010101 01010101 01010101 01010102 00000000 00000202 00000000 00000000 ................................ 000020
00000000 00000000 00000000 00000000 00000101 01010101 01010101 01010101 ................................ 000040
05050505 05050505 05050505 05030101 02020202 02020202 00000000 00000000 ................................ 000060
00000000 00000000 00000000 00000000 00000101 01010305 05050505 05050505 ................................ 000080
05050505 05050505 05050505 05050101 02020202 02020202 00000000 00000000 ................................ 0000A0
00000000 00000000 00000000 00000000 00000101 01010505 05050505 05050505 ................................ 0000C0
05050505 05050505 05050505 05050101 00000000 00000202 00000000 00000000 ................................ 0000E0
00000000 00000000 00000000 00000000 00000201 01010505 05050505 05050505 ................................ 000100
05050505 05050505 05050505 05030102 00000000 00000202 00000000 00000000 ................................ 000120
00000000 00000000 00000000 00000000 00000001 01010305 05050505 05050505 ................................ 000140
01010101 01010101 01010101 01010100 00000000 00000202 00000000 00000000 ................................ 000160
00000000 00000000 00000000 00000000 00000000 01010101 01010101 01010101 ................................ 000180
01010101 01010101 01010101 01020000 00000000 00000202 00000000 00000000 ................................ 0001A0
00000000 00000000 00000000 00000000 00000000 00020101 01010101 01010101 ................................ 0001C0
00000000 00000000 00000000 00000000 00000000 00000202 00000000 00000000 ................................ 0001E0
```

```
Dump of file SATURN:[PCCOMMON.DUMP.DLL]SAFREE2.TMP;1 on 18-APR-1990 10:52:15.22
File ID (908,21,0)   End of file block 53 / Allocated 56

Virtual block number 51 (00000033), 512 (0200) bytes

 00000000 00000000 00000000 00000000 00000000 00000000 00000000 00000000 ................................ 000000
 00000000 00000000 00000000 00000000 00000000 00000202 00000000 00000000 ................................ 000020
 00000000 00000000 00000000 00000000 00000000 00000000 00000000 00000000 ................................ 000040
 00000000 00000000 00000000 00000000 00000000 00000202 00000000 00000000 ................................ 000060
 00000000 00000000 00000000 00000000 00000000 00000000 00000000 00000000 ................................ 000080
 00000000 00000000 00000000 00000000 00000000 00000202 00000000 00000000 ................................ 0000A0
 01010101 02000000 00000000 00000000 00000000 00000000 00000000 00000000 ................................ 0000C0
 01010101 01010101 01010101 01010101 01010101 01010202 01010101 01010101 ................................ 0000E0
 01010101 01010000 00000000 02010101 01010101 01010101 01010101 01010101 ................................ 000100
 01010101 01010101 01010101 01010101 01010101 01010202 01010101 01010101 ................................ 000120
 01010101 01010100 00000001 01010101 01010101 01010101 01010101 01010101 ................................ 000140
 01010101 01010101 01010101 01010101 01010101 01010101 01010101 01010101 ................................ 000160
 01010101 01010102 00000201 01010101 01010101 01010101 01010101 01010101 ................................ 000180
 01010101 01010101 01010101 01010101 01010101 01010101 01010101 01010101 ................................ 0001A0
 05050505 05030101 00000101 01010101 01010101 01010101 01010101 01010101 ................................ 0001C0
 05050505 05050505 05050505 05050505 05050505 05050505 05050505 05050505 ................................ 0001E0

Dump of file SATURN:[PCCOMMON.DUMP.DLL]SAFREE2.TMP;1 on 18-APR-1990 10:52:15.22
File ID (908,21,0)   End of file block 53 / Allocated 56

Virtual block number 52 (00000034), 512 (0200) bytes

 05050505 05050101 00000101 01010305 05050505 05050505 05050505 05050505 ................................ 000000
 05050505 05050505 05050505 05050505 05050505 05050505 05050505 05050505 ................................ 000020
 05050505 05050101 00000101 01010505 05050505 05050505 05050505 05050505 ................................ 000040
 05050505 05050505 05050505 05050505 05050505 05050505 05050505 05050505 ................................ 000060
 05050505 05050101 00000101 01010505 05050505 05050505 05050505 05050505 ................................ 000080
 05050505 05050505 05050505 05050505 05050505 05050505 05050505 05050505 ................................ 0000A0
 05050505 05050101 00000101 01010505 05050505 05050505 05050505 05050505 ................................ 0000C0
 05050505 05050505 05050505 05050505 05050505 05050505 05050505 05050505 ................................ 0000E0
 05050505 05030102 00000201 01010505 05050505 05050505 05050505 05050505 ................................ 000100
 05050505 05050505 05050505 05050505 05050505 05050505 05050505 05050505 ................................ 000120
 01010101 01010100 00000001 01010305 05050505 05050505 05050505 05050505 ................................ 000140
 01010101 01010101 01010101 01010101 01010101 01010101 01010101 01010101 ................................ 000160
 01010101 01020000 00000000 01010101 01010101 01010101 01010101 01010101 ................................ 000180
 01010101 01010101 01010101 01010101 01010101 01010101 01010101 01010101 ................................ 0001A0
 00000000 00000000 00000000 00020101 01010101 01010101 01010101 01010101 ................................ 0001C0
 00000000 00000000 00000000 00000000 00000000 00000000 00000000 00000000 ................................ 0001E0

Dump of file SATURN:[PCCOMMON.DUMP.DLL]SAFREE2.TMP;1 on 18-APR-1990 10:52:15.22
File ID (908,21,0)   End of file block 53 / Allocated 56

Virtual block number 53 (00000035), 512 (0200) bytes

 00000000 00000000 00000000 00000000 00000000 00000000 00000000 00000000 ................................ 000000
 00000000 00000000 00000000 00000000 00000000 00000000 00000000 00000000 ................................ 000020
 00000000 00000000 00000000 00000000 00000000 00000000 00000000 00000000 ................................ 000040
 00000000 00000000 00000000 00000000 00000000 00000000 00000000 00000000 ................................ 000060
 00000000 00000000 00000000 00000000 00000000 00000000 00000000 00000000 ................................ 000080
 00000000 00000000 00000000 00000000 00000000 00000000 00000000 00000000 ................................ 0000A0
 00000000 00000000 00000000 00000000 00000000 00000000 00000000 00000000 ................................ 0000C0
 00000000 00000000 00000000 00000000 00000000 00000000 00000000 00000000 ................................ 0000E0
 00000000 00000000 00000000 00000000 00000000 00000000 00000000 00000000 ................................ 000100
 00000000 00000000 00000000 00000000 00000000 00000000 00000000 00000000 ................................ 000120
 00000000 00000000 00000000 00000000 00000000 00000000 00000000 00000000 ................................ 000140
 00000000 00000000 00000000 00000000 00000000 00000000 00000000 00000000 ................................ 000160
 00000000 00000000 00000000 00000000 00000000 00000000 00000000 00000000 ................................ 000180
 00000000 00000000 00000000 00000000 00000000 00000000 00000000 00000000 ................................ 0001A0
 00000000 00000000 00000000 00000000 00000000 00000000 00000000 00000000 ................................ 0001C0
 00000000 00000000 00000000 00000000 00000000 00000000 00000000 00000000 ................................ 0001E0
```

```
Dump of file SATURN:[PCCOMMON.DUMP.MSG]SAFRMUTL.MSG;1 on 18-APR-1990 10:54:07.43
File ID (1015,27,0)   End of file block 11 / Allocated 12

Virtual block number 1 (00000001), 512 (0200) bytes

 37000000 00000000 00000000 00000000 01000104 0C464153 00464753 4D4B40FF .MKMSGF.SAF....................7 000000
 67086408 61085E08 5B085808 55085208 4F084C08 49084608 43084008 3D083A08 .:.=.@.C.F.I.L.O.R.U.X.[.^.a.d.g 000020
 97089408 91088E08 8B088808 85088208 7F087C08 79087608 73087008 6D086A08 .j.m.p.s.v.y.|.................. 000040
 C708C408 C108BE08 BB08B808 B508B208 AF08AC08 A908A608 A308A008 9D089A08 .......É.Ì.`.¨.£.ý.ç.¡.£./.è.á.ú 000060
 F708F408 F108EE08 EB08E808 E508E208 DF08DC08 D908D608 D308D008 CD08CA08 .ò.ë.Å.Æ.ø.).É.Ô.ã.Î.Ó.Š.Ý.þ.¶.¥ 000080
 27092409 21091E09 1B091809 15091209 0F090C09 09090609 03090008 FD08FA08 .!.».........................!.$.' 0000A0
 57095409 51094E09 4B094809 45094209 3F093C09 39093609 33093009 2D092A09 .*.-.0.3.6.9.<.?.B.E.H.K.N.Q.T.W 0000C0
 87098409 81097E09 7B097809 75097209 6F096C09 69096609 63096009 5D095A09 .Z.].`.c.f.i.l.o.r.u.x.{.~...... 0000E0
 B709B409 B109AE09 AB09A809 A509A209 9F099C09 99099609 93099009 8D098A09 ................Á.Ê.´.¨.Û.Ý.Ç.ñ 000100
 E709E409 E109DE09 DB09D809 D509D209 CF09CC09 C909C609 C309C009 BD09BA09 .¤.§.â.û.ó.è.ä.ü.Ø.Í.Ä.Û.ß.Ã.õ.Ô 000120
 170A140A 110A0E0A 0B0A080A 050A0209 FF09FC09 F909F609 F309F009 ED09EA09 .õ.Ú.Þ.µ.-.!.■.................. 000140
 470A440A 410A3E0A 3B0A380A 350A320A 2F0A2C0A 290A260A 230A200A 1D0A1A0A ..... .#.&.).,./.2.5.8.;.>.A.D.G 000160
 770A740A 710A6E0A 6B0A680A 650A620A 5F0A5C0A 590A560A 530A500A 4D0A4A0A .J.M.P.S.V.Y.\._.b.e.h.k.n.q.t.w 000180
 A70AA40A A10A9E0A 9B0A980A 950A920A 8F0A8C0A 890A860A 830A800A 7D0A7A0A .z.}.......................À.Ê.Ï 0001A0
 D70AD40A D10ACE0A CB0AC80A C50AC20A BF0ABC0A B90AB60A B30AB00A AD0AAA0A .^.Ù.¯.°.Ñ.¿.¥.¢.ô.é.à.ù.ö.ì.å.■ 0001C0
 070B040B 010AFE0A FB0AF80A F50AF20A EF0AEC0A E90AE60A E30AE00A DD0ADA0A .Õ.Ï.Á.D.Ì.Ó.š.ÿ.·.¾.½.«.±...... 0001E0

Dump of file SATURN:[PCCOMMON.DUMP.MSG]SAFRMUTL.MSG;1 on 18-APR-1990 10:54:07.43
File ID (1015,27,0)   End of file block 11 / Allocated 12

Virtual block number 2 (00000002), 512 (0200) bytes

 370B340B 310B2E0B 2B0B280B 250B220B 1F0B1C0B 190B160B 130B100B 0D0B0A0B ................".%.(.+...1.4.7 000000
 670B640B 610B5E0B 5B0B580B 550B520B 4F0B4C0B 490B460B 430B400B 3D0B3A0B .:.=.@.C.F.I.L.O.R.U.X.[.^.a.d.g 000020
 970B940B 910B8E0B 8B0B880B 850B820B 7F0B7C0B 790B760B 730B700B 6D0B6A0B .j.m.p.s.v.y.|.................. 000040
 C70BC40B C10BBE0B BB0BB80B B50BB20B AF0BAC0B A90BA60B A30BA00B 9D0B9A0B .......É.Ì.`.¨.£.ý.ç.¡.£./.è.á.ú 000060
 F70BF40B F10BEE0B EB0BE80B E50BE20B DF0BDC0B D90BD60B D30BD00B CD0BCA0B .ò.ë.Å.Æ.ø.).É.Ô.ã.Î.Ó.Š.Ý.þ.¶.¥ 000080
 270C240C 210C1E0C 1B0C180C 150C120C 0F0C0C0C 090C060C 030C000B FD0BFA0B .!.».........................!.$.' 0000A0
 570C540C 510C4E0C 4B0C480C 450C420C 3F0C3C0C 390C360C 330C300C 2D0C2A0C .*.-.0.3.6.9.<.?.B.E.H.K.N.Q.T.W 0000C0
 870C840C 810C7E0C 7B0C780C 750C720C 6F0C6C0C 690C660C 630C600C 5D0C5A0C .Z.].`.c.f.i.l.o.r.u.x.{.~...... 0000E0
 B70CB40C B10CAE0C AB0CA80C A50CA20C 9F0C9C0C 990C960C 930C900C 8D0C8A0C ................Á.Ê.´.¨.Û.Ý.Ç.ñ 000100
 E70CE40C E10CDE0C DB0CD80C D50CD20C CF0CCC0C C90CC60C C30CC00C BD0CBA0C .¤.§.â.û.ó.è.ä.ü.Ø.Í.Ä.Û.ß.Ã.õ.Ô 000120
 170D140D 110D0E0D 0B0D080D 0500020C FF0CFC0C F90CF60C F30CF00C ED0CEA0C .õ.Ú.Þ.µ.-.!.■.................. 000140
 470D440D 410D3E0D 3B0D380D 350D320D 2F0D2C0D 290D260D 230D200D 1D0D1A0D ..... .#.&.).,./.2.5.8.;.>.A.D.G 000160
 770D740D 710D6E0D 6B0D680D 650D620D 5F0D5C0D 590D560D 530D500D 4D0D4A0D .J.M.P.S.V.Y.\._.b.e.h.k.n.q.t.w 000180
 A70DA40D A10D9E0D 9B0D980D 950D920D 8F0D8C0D 890D860D 830D800D 7D0D7A0D .z.}.......................À.Ê.Ï 0001A0
 D70DD40D D10DCE0D CB0DC80D C50DC20D BF0DBC0D B90DB60D B30DB00D AD0DAA0D .^.Ù.¯.°.Ñ.¿.¥.¢.ô.é.à.ù.ö.ì.å.■ 0001C0
 070E040E 010DFE0D FB0DF80D F50DF20D EF0DEC0D E90DE60D E30DE00D DD0DDA0D .Õ.Ï.Á.D.Ì.Ó.š.ÿ.·.¾.½.«.±...... 0001E0

Dump of file SATURN:[PCCOMMON.DUMP.MSG]SAFRMUTL.MSG;1 on 18-APR-1990 10:54:07.43
File ID (1015,27,0)   End of file block 11 / Allocated 12

Virtual block number 3 (00000003), 512 (0200) bytes

 370E340E 310E2E0E 2B0E280E 250E220E 1F0E1C0E 190E160E 130E100E 0D0E0A0E ................".%.(.+...1.4.7 000000
 670E640E 610E5E0E 5B0E580E 550E520E 4F0E4C0E 490E460E 430E400E 3D0E3A0E .:.=.@.C.F.I.L.O.R.U.X.[.^.a.d.g 000020
 970E940E 910E8E0E 8B0E880E 850E820E 7F0E7C0E 790E760E 730E700E 6D0E6A0E .j.m.p.s.v.y.|.................. 000040
 C70EC40E C10EBE0E BB0EB80E B50EB20E AF0EAC0E A90EA60E A30EA00E 9D0E9A0E .......É.Ì.`.¨.£.ý.ç.¡.£./.è.á.ú 000060
 F70EF40E F10EEE0E EB0EE80E E50EE20E DF0EDC0E D90ED60E D30ED00E CD0ECA0E .ò.ë.Å.Æ.ø.).É.Ô.ã.Î.Ó.Š.Ý.þ.¶.¥ 000080
 270F240F 210F1E0F 1B0F180F 150F120F 0F0F0C0F 090F060F 030F000F FD0EFA0E .!.».........................!.$.' 0000A0
 570F540F 510F4E0F 4B0F480F 450F420F 3F0F3C0F 390F360F 330F300F 2D0F2A0F .*.-.0.3.6.9.<.?.B.E.H.K.N.Q.T.W 0000C0
 870F840F 810F7E0F 7B0F780F 750F720F 6F0F6C0F 690F660F 630F600F 5D0F5A0F .Z.].`.c.f.i.l.o.r.u.x.{.~...... 0000E0
 B70FB40F B10FAE0F AB0FA80F A50FA20F 9F0F9C0F 990F960F 930F900F 8D0F8A0F ................Á.Ê.´.¨.Û.Ý.Ç.ñ 000100
 E70FE40F E10FDE0F DB0FD80F D50FD20F CF0FCC0F C90FC60F C30FC00F BD0FBA0F .¤.§.â.û.ó.è.ä.ü.Ø.Í.Ä.Û.ß.Ã.õ.Ô 000120
 17101410 11100E10 0B100810 0510020F FF0FFC0F F90FF60F F30FF00F ED0FEA0F .õ.Ú.Þ.µ.-.!.■.................. 000140
 47104410 41103E10 3B103810 35103210 2F102C10 29102610 23102010 1D101A10 ..... .#.&.).,./.2.5.8.;.>.A.D.G 000160
 77107410 71106E10 6B106810 65106210 5F105C10 59105610 53105010 4D104A10 .J.M.P.S.V.Y.\._.b.e.h.k.r.q.t.w 000180
 A710A410 A1109E10 9B109810 95109210 8F108C10 89108610 83108010 7D107A10 .z.}.......................À.Ê.Ï 0001A0
 D710D410 D110CE10 CB10C810 C510C210 BF10BC10 B910B610 B310B010 AD10AA10 .^.Ù.¯.°.Ñ.¿.¥.¢.ô.é.à.ù.ö.. ^.■ 0001C0
 07110411 0110FE10 FB10F810 F510F210 EF10EC10 E910E610 E310E010 DD10DA10 .Õ.Ï.Á.D.Ì.Ó.š.ÿ.·.¾.½.«.±...... 0001E0
```

```
Dump of file SATURN:[PCCOMMON.DUMP.MSG]SAFRMUTL.MSG;1 on 18-APR-1990 10:54:07.43
File ID (1015,27,0)   End of file block 11 / Allocated 12

Virtual block number 4 (00000004), 512 (0200) bytes

 37113411 31112E11 28112811 25112211 1F111C11 19111611 13111011 0D110A11 ................".%.(.+...1.4.7 000000
 67116411 61115E11 5B115811 55115211 4F114C11 49114611 43114011 3D113A11 .:.=.@.C.F.I.L.O.R.U.X.[.^.a.d.g 000020
 97119411 91118E11 8B118811 85118211 7F117C11 79117611 73117011 6D116A11 .j.m.p.s.v.y.|.................. 000040
 C711C411 C111BE11 BB11B811 B511B211 AF11AC11 A911A611 A311A011 9D119A11 .......È.I.`.^.£.ý.ç.¡.£./.ė.á.ú 000060
 F711F411 F111EE11 EB11E811 E511E211 DF11DC11 D911D611 D311D011 CD11CA11 .ð.ë.Å.Æ.ø.\.É.Ô.ã.Ì.Ó.Š.Ÿ.þ.¶.¥ 000080
 27122412 21121E12 1B121812 15121212 0F120C12 09120612 03120011 FD11FA11 .•.»......................!.$.' 0000A0
 57125412 51124E12 4B124812 45124212 3F123C12 39123612 33123012 2D122A12 .*.-.0.3.6.9.<.?.B.E.H.K.N.Q.T.W 0000C0
 87128412 81127E12 7B127812 75127212 6F126C12 69126612 63126012 5D125A12 .Z.].'.c.f.i.l.o.r.u.x.{.~...... 0000E0
 B712B412 B112AE12 AB12A812 A512A212 9F129C12 99129612 93129012 8D128A12 ..................Å.E.´.¨.Ö.Ý.Ç.ñ 000100
 E712E412 E112DE12 DB12D812 D512D212 CF12CC12 C912C612 C312C012 BD128A12 .¤.§.å.ū.ó.è.ä.ü.ø.{.Ä.Ü.ß.Ā.ō.Ó 000120
 17131413 11130E13 0B130813 05130212 FF12FC12 F912F612 F312F012 ED12EA12 .ð.Ú.Þ.µ.−.•.■.................. 000140
 47134413 41133E13 3B133813 35133213 2F132C13 29132613 23132013 1D131A13 ..... .#.&.).,./.2.5.8.;.>.A.D.G 000160
 77137413 71136E13 6B136813 65136213 5F135C13 59135613 53135013 4D134A13 .J.M.P.S.V.Y.\._.b.e.h.k.n.q.t.w 000180
 A713A413 A1139E13 9B139813 95139213 8F138C13 89138613 83138013 7D137A13 .z.}....................À.É.Ï 0001A0
 D713D413 D113CE13 CB13C813 C513C213 BF13BC13 B913B613 B313B013 AD13AA13 .˚.Ú.¯.°.Ñ.¿.¥.¢.ô.é.à.ù.ö.ï.å.■ 0001C0
 77146114 5E144F14 41143114 21141514 0613EC13 E913E613 E313E013 DD130A13 .Ő.ï.Å.Ð.Ì.Ó.š.....!.1.A.O.^.a.w 0001E0

Dump of file SATURN:[PCCOMMON.DUMP.MSG]SAFRMUTL.MSG;1 on 18-APR-1990 10:54:07.43
File ID (1015,27,0)   End of file block 11 / Allocated 12

Virtual block number 5 (00000005), 512 (0200) bytes

 16151315 10150015 0A150715 04150114 ED14D914 C914BA14 AD149F14 91148514 .......Û.¤.è.].Ú................ 000000
 0A00490A 00490A00 4915CD15 BD15BA15 AF159715 87158415 58154815 37152415 .$.7.H.X.......£.¤.§.ë.I..I..I.. 000020
 00490A00 490A0049 0A00490A 00490A00 490A0049 0A00490A 00490A00 490A0049 I..I..I..I..I..I..I..I..I..I..I. 000040
 490A0049 0A00490A 00490A00 490A0049 0A00490A 00490A00 490A0049 0A00490A .I..I..I..I..I..I..I..I..I..I..I 000060
 0A00490A 00490A00 490A0049 0A00490A 00490A00 490A0049 0A00490A 00490A00 ..I..I..I..I..I..I..I..I..I..I.. 000080
 00490A00 490A0049 0A00490A 00490A00 490A0049 0A00490A 00490A00 490A0049 I..I..I..I..I..I..I..I..I..I..I. 0000A0
 490A0049 0A00490A 00490A00 490A0049 0A00490A 00490A00 490A0049 0A00490A .I..I..I..I..I..I..I..I..I..I..I 0000C0
 0A00490A 00490A00 490A0049 0A00490A 00490A00 490A0049 0A00490A 00490A00 ..I..I..I..I..I..I..I..I..I..I.. 0000E0
 00490A00 490A0049 0A00490A 00490A00 490A0049 0A00490A 00490A00 490A0049 I..I..I..I..I..I..I..I..I..I..I. 000100
 490A0049 0A00490A 00490A00 490A0049 0A00490A 00490A00 490A0049 0A00490A .I..I..I..I..I..I..I..I..I..I..I 000120
 0A00490A 00490A00 490A0049 0A00490A 00490A00 490A0049 0A00490A 00490A00 ..I..I..I..I..I..I..I..I..I..I.. 000140
 00490A00 490A0049 0A00490A 00490A00 490A0049 0A00490A 00490A00 490A0049 I..I..I..I..I..I..I..I..I..I..I. 000160
 490A0049 0A00490A 00490A00 490A0049 0A00490A 00490A00 490A0049 0A00490A .I..I..I..I..I..I..I..I..I..I..I 000180
 0A00490A 00490A00 490A0049 0A00490A 00490A00 490A0049 0A00490A 00490A00 ..I..I..I..I..I..I..I..I..I..I.. 0001A0
 00490A00 490A0049 0A00490A 00490A00 490A0049 0A00490A 00490A00 490A0049 I..I..I..I..I..I..I..I..I..I..I. 0001C0
 490A0049 0A00490A 00490A00 490A0049 0A00490A 00490A00 490A0049 0A00490A .I..I..I..I..I..I..I..I..I..I..I 0001E0

Dump of file SATURN:[PCCOMMON.DUMP.MSG]SAFRMUTL.MSG;1 on 18-APR-1990 10:54:07.43
File ID (1015,27,0)   End of file block 11 / Allocated 12

Virtual block number 6 (00000006), 512 (0200) bytes

 0A00490A 00490A00 490A0049 0A00490A 00490A00 490A0049 0A00490A 00490A00 ..I..I..I..I..I..I..I..I..I..I.. 000000
 00490A00 490A0049 0A00490A 00490A00 490A0049 0A00490A 00490A00 490A0049 I..I..I..I..I..I..I..I..I..I..I. 000020
 490A0049 0A00490A 00490A00 490A0049 0A00490A 00490A00 490A0049 0A00490A .I..I..I..I..I..I..I..I..I..I..I 000040
 0A00490A 00490A00 490A0049 0A00490A 00490A00 490A0049 0A00490A 00490A00 ..I..I..I..I..I..I..I..I..I..I.. 000060
 00490A00 490A0049 0A00490A 00490A00 490A0049 0A00490A 00490A00 490A0049 I..I..I..I..I..I..I..I..I..I..I. 000080
 490A0049 0A00490A 00490A00 490A0049 0A00490A 00490A00 490A0049 0A00490A .I..I..I..I..I..I..I..I..I..I..I 0000A0
 0A00490A 00490A00 490A0049 0A00490A 00490A00 490A0049 0A00490A 00490A00 ..I..I..I..I..I..I..I..I..I..I.. 0000C0
 00490A00 490A0049 0A00490A 00490A00 490A0049 0A00490A 00490A00 490A0049 I..I..I..I..I..I..I..I..I..I..I. 0000E0
 490A0049 0A00490A 00490A00 490A0049 0A00490A 00490A00 490A0049 0A00490A .I..I..I..I..I..I..I..I..I..I..I 000100
 0A00490A 00490A00 490A0049 0A00490A 00490A00 490A0049 0A00490A 00490A00 ..I..I..I..I..I..I..I..I..I..I.. 000120
 00490A00 490A0049 0A00490A 00490A00 490A0049 0A00490A 00490A00 490A0049 I..I..I..I..I..I..I..I..I..I..I. 000140
 490A0049 0A00490A 00490A00 490A0049 0A00490A 00490A00 490A0049 0A00490A .I..I..I..I..I..I..I..I..I..I..I 000160
 0A00490A 00490A00 490A0049 0A00490A 00490A00 490A0049 0A00490A 00490A00 ..I..I..I..I..I..I..I..I..I..I.. 000180
 00490A00 490A0049 0A00490A 00490A00 490A0049 0A00490A 00490A00 490A0049 I..I..I..I..I..I..I..I..I..I..I. 0001A0
 490A0049 0A00490A 00490A00 490A0049 0A00490A 00490A00 490A0049 0A00490A .I..I..I..I..I..I..I..I..I..I..I 0001C0
 0A00490A 00490A00 490A0049 0A00490A 00490A00 490A0049 0A00490A 00490A00 ..I..I..I..I..I..I..I..I..I..I.. 0001E0
```

```
Dump of file SATURN:[PCCOMMON.DUMP.MSG]SAFRMUTL.MSG;1 on 18-APR-1990 10:54:07.43
File ID (1015,27,0)   End of file block 11 / Allocated 12

Virtual block number 7 (00000007), 512 (0200) bytes

0D490A0D 490A0D49 0A0D490A 0D490A0D 490A0D49 0A0D490A 0D490A0D 490A0D49 I..I..I..I..I..I..I..I..I..I..I. 000000
490A0D49 0A0D490A 0D490A0D 490A0D49 0A0D490A 0D490A0D 490A0D49 0A0D490A .I..I..I..I..I..I..I..I..I..I..I 000020
0A0D490A 0D490A0D 490A0D49 0A0D490A 0D490A0D 490A0D49 0A0D490A 0D490A0D ..I..I..I..I..I..I..I..I..I..I.. 000040
0D490A0D 490A0D49 0A0D490A 0D490A0D 490A0D49 0A0D490A 0D490A0D 490A0D49 I..I..I..I..I..I..I..I..I..I..I. 000060
490A0D49 0A0D490A 0D490A0D 490A0D49 0A0D490A 0D490A0D 490A0D49 0A0D490A .I..I..I..I..I..I..I..I..I..I..I 000080
0A0D490A 0D490A0D 490A0D49 0A0D490A 0D490A0D 490A0D49 0A0D490A 0D490A0D ..I..I..I..I..I..I..I..I..I..I.. 0000A0
0D490A0D 490A0D49 0A0D490A 0D490A0D 490A0D49 0A0D490A 0D490A0D 490A0D49 I..I..I..I..I..I..I..I..I..I..I. 0000C0
490A0D49 0A0D490A 0D490A0D 490A0D49 0A0D490A 0D490A0D 490A0D49 0A0D490A .I..I..I..I..I..I..I..I..I..I..I 0000E0
0A0D490A 0D490A0D 490A0D49 0A0D490A 0D490A0D 490A0D49 0A0D490A 0D490A0D ..I..I..I..I..I..I..I..I..I..I.. 000100
0D490A0D 490A0D49 0A0D490A 0D490A0D 490A0D49 0A0D490A 0D490A0D 490A0D49 I..I..I..I..I..I..I..I..I..I..I. 000120
490A0D49 0A0D490A 0D490A0D 490A0D49 0A0D490A 0D490A0D 490A0D49 0A0D490A .I..I..I..I..I..I..I..I..I..I..I 000140
0A0D490A 0D490A0D 490A0D49 0A0D490A 0D490A0D 490A0D49 0A0D490A 0D490A0D ..I..I..I..I..I..I..I..I..I..I.. 000160
0D490A0D 490A0D49 0A0D490A 0D490A0D 490A0D49 0A0D490A 0D490A0D 490A0D49 I..I..I..I..I..I..I..I..I..I..I. 000180
490A0D49 0A0D490A 0D490A0D 490A0D49 0A0D490A 0D490A0D 490A0D49 0A0D490A .I..I..I..I..I..I..I..I..I..I..I 0001A0
0A0D490A 0D490A0D 490A0D49 0A0D490A 0D490A0D 490A0D49 0A0D490A 0D490A0D ..I..I..I..I..I..I..I..I..I..I.. 0001C0
0D490A0D 490A0D49 0A0D490A 0D490A0D 490A0D49 0A0D490A 0D490A0D 490A0D49 I..I..I..I..I..I..I..I..I..I..I. 0001E0

Dump of file SATURN:[PCCOMMON.DUMP.MSG]SAFRMUTL.MSG;1 on 18-APR-1990 10:54:07.43
File ID (1015,27,0)   End of file block 11 / Allocated 12

Virtual block number 8 (00000008), 512 (0200) bytes

490A0D49 0A0D490A 0D490A0D 490A0D49 0A0D490A 0D490A0D 490A0D49 0A0D490A .I..I..I..I..I..I..I..I..I..I..I 000000
0A0D490A 0D490A0D 490A0D49 0A0D490A 0D490A0D 490A0D49 0A0D490A 0D490A0D ..I..I..I..I..I..I..I..I..I..I.. 000020
0D490A0D 490A0D49 0A0D490A 0D490A0D 490A0D49 0A0D490A 0D490A0D 490A0D49 I..I..I..I..I..I..I..I..I..I..I. 000040
490A0D49 0A0D490A 0D490A0D 490A0D49 0A0D490A 0D490A0D 490A0D49 0A0D490A .I..I..I..I..I..I..I..I..I..I..I 000060
0A0D490A 0D490A0D 490A0D49 0A0D490A 0D490A0D 490A0D49 0A0D490A 0D490A0D ..I..I..I..I..I..I..I..I..I..I.. 000080
0D490A0D 490A0D49 0A0D490A 0D490A0D 490A0D49 0A0D490A 0D490A0D 490A0D49 I..I..I..I..I..I..I..I..I..I..I. 0000A0
490A0D49 0A0D490A 0D490A0D 490A0D49 0A0D490A 0D490A0D 490A0D49 0A0D490A .I..I..I..I..I..I..I..I..I..I..I 0000C0
0A0D490A 0D490A0D 490A0D49 0A0D490A 0D490A0D 490A0D49 0A0D490A 0D490A0D ..I..I..I..I..I..I..I..I..I..I.. 0000E0
0D490A0D 490A0D49 0A0D490A 0D490A0D 490A0D49 0A0D490A 0D490A0D 490A0D49 I..I..I..I..I..I..I..I..I..I..I. 000100
490A0D49 0A0D490A 0D490A0D 490A0D49 0A0D490A 0D490A0D 490A0D49 0A0D490A .I..I..I..I..I..I..I..I..I..I..I 000120
0A0D490A 0D490A0D 490A0D49 0A0D490A 0D490A0D 490A0D49 0A0D490A 0D490A0D ..I..I..I..I..I..I..I..I..I..I.. 000140
0D490A0D 490A0D49 0A0D490A 0D490A0D 490A0D49 0A0D490A 0D490A0D 490A0D49 I..I..I..I..I..I..I..I..I..I..I. 000160
490A0D49 0A0D490A 0D490A0D 490A0D49 0A0D490A 0D490A0D 490A0D49 0A0D490A .I..I..I..I..I..I..I..I..I..I..I 000180
0A0D490A 0D490A0D 490A0D49 0A0D490A 0D490A0D 490A0D49 0A0D490A 0D490A0D ..I..I..I..I..I..I..I..I..I..I.. 0001A0
0D490A0D 490A0D49 0A0D490A 0D490A0D 490A0D49 0A0D490A 0D490A0D 490A0D49 I..I..I..I..I..I..I..I..I..I..I. 0001C0
490A0D49 0A0D490A 0D490A0D 490A0D49 0A0D490A 0D490A0D 490A0D49 0A0D490A .I..I..I..I..I..I..I..I..I..I..I 0001E0

Dump of file SATURN:[PCCOMMON.DUMP.MSG]SAFRMUTL.MSG;1 on 18-APR-1990 10:54:07.43
File ID (1015,27,0)   End of file block 11 / Allocated 12

Virtual block number 9 (00000009), 512 (0200) bytes

0A0D490A 0D490A0D 490A0D49 0A0D490A 0D490A0D 490A0D49 0A0D490A 0D490A0D ..I..I..I..I..I..I..I..I..I..I.. 000000
0D490A0D 490A0D49 0A0D490A 0D490A0D 490A0D49 0A0D490A 0D490A0D 490A0D49 I..I..I..I..I..I..I..I..I..I..I. 000020
490A0D49 0A0D490A 0D490A0D 490A0D49 0A0D490A 0D490A0D 490A0D49 0A0D490A .I..I..I..I..I..I..I..I..I..I..I 000040
0A0D490A 0D490A0D 490A0D49 0A0D490A 0D490A0D 490A0D49 0A0D490A 0D490A0D ..I..I..I..I..I..I..I..I..I..I.. 000060
0D490A0D 490A0D49 0A0D490A 0D490A0D 490A0D49 0A0D490A 0D490A0D 490A0D49 I..I..I..I..I..I..I..I..I..I..I. 000080
490A0D49 0A0D490A 0D490A0D 490A0D49 0A0D490A 0D490A0D 490A0D49 0A0D490A .I..I..I..I..I..I..I..I..I..I..I 0000A0
0A0D490A 0D490A0D 490A0D49 0A0D490A 0D490A0D 490A0D49 0A0D490A 0D490A0D ..I..I..I..I..I..I..I..I..I..I.. 0000C0
0D490A0D 490A0D49 0A0D490A 0D490A0D 490A0D49 0A0D490A 0D490A0D 490A0D49 I..I..I..I..I..I..I..I..I..I..I. 0000E0
490A0D49 0A0D490A 0D490A0D 490A0D49 0A0D490A 0D490A0D 490A0D49 0A0D490A .I..I..I..I..I..I..I..I..I..I..I 000100
0A0D490A 0D490A0D 490A0D49 0A0D490A 0D490A0D 490A0D49 0A0D490A 0D490A0D ..I..I..I..I..I..I..I..I..I..I.. 000120
0D490A0D 490A0D49 0A0D490A 0D490A0D 490A0D49 0A0D490A 0D490A0D 490A0D49 I..I..I..I..I..I..I..I..I..I..I. 000140
490A0D49 0A0D490A 0D490A0D 490A0D49 0A0D490A 0D490A0D 490A0D49 0A0D490A .I..I..I..I..I..I..I..I..I..I..I 000160
0A0D490A 0D490A0D 490A0D49 0A0D490A 0D490A0D 490A0D49 0A0D490A 0D490A0D ..I..I..I..I..I..I..I..I..I..I.. 000180
0D490A0D 490A0D49 0A0D490A 0D490A0D 490A0D49 0A0D490A 0D490A0D 490A0D49 I..I..I..I..I..I..I..I..I..I..I. 0001A0
490A0D49 0A0D490A 0D490A0D 490A0D49 0A0D490A 0D490A0D 490A0D49 0A0D490A .I..I..I..I..I..I..I..I..I..I..I 0001C0
0A0D490A 0D490A0D 490A0D49 0A0D490A 0D490A0D 490A0D49 0A0D490A 0D490A0D ..I..I..I..I..I..I..I..I..I..I.. 0001E0
```

```
Dump of file SATURN:[PCCOMMON.DUMP.MSG]SAFRMUTL.MSG;1 on 18-APR-1990 10:54:07.43
File ID (1015,27,0)   End of file block 11 / Allocated 12

Virtual block number 10 (0000000A), 512 (0200) bytes

 0D490A0D 490A0D49 0A0D490A 0D490A0D 490A0D49 0A0D490A 0D490A0D 490A0D49 I..I..I..I..I..I..I..I..I..I..I. 000000
 490A0D49 0A0D490A 0D490A0D 490A0D49 0A0D490A 0D490A0D 490A0D49 0A0D490A .I..I..I..I..I..I..I..I..I..I..I 000020
 0A0D490A 0D490A0D 490A0D49 0A0D490A 0D490A0D 490A0D49 0A0D490A 0D490A0D ..I..I..I..I..I..I..I..I..I..I.. 000040
 0D490A0D 490A0D49 0A0D490A 0D490A0D 490A0D49 0A0D490A 0D490A0D 490A0D49 I..I..I..I..I..I..I..I..I..I..I. 000060
 490A0D49 0A0D490A 0D490A0D 490A0D49 0A0D490A 0D490A0D 490A0D49 0A0D490A .I..I..I..I..I..I..I..I..I..I..I 000080
 0A0D490A 0D490A0D 490A0D49 0A0D490A 0D490A0D 490A0D49 0A0D490A 0D490A0D ..I..I..I..I..I..I..I..I..I..I.. 0000A0
 0D490A0D 490A0D49 0A0D490A 0D490A0D 490A0D49 0A0D490A 0D490A0D 490A0D49 I..I..I..I..I..I..I..I..I..I..I. 0000C0
 490A0D49 0A0D490A 0D490A0D 490A0D49 0A0D490A 0D490A0D 490A0D49 0A0D490A .I..I..I..I..I..I..I..I..I..I..I 0000E0
 0A0D490A 0D490A0D 490A0D49 0A0D490A 0D490A0D 490A0D49 0A0D490A 0D490A0D ..I..I..I..I..I..I..I..I..I..I.. 000100
 0D490A0D 490A0D49 0A0D490A 0D490A0D 490A0D49 0A0D490A 0D490A0D 490A0D49 I..I..I..I..I..I..I..I..I..I..I. 000120
 490A0D49 0A0D490A 0D490A0D 490A0D49 0A0D490A 0D490A0D 490A0D49 0A0D490A .I..I..I..I..I..I..I..I..I..I..I 000140
 0A0D490A 0D490A0D 490A0D49 0A0D490A 0D490A0D 490A0D49 0A0D490A 0D490A0D ..I..I..I..I..I..I..I..I..I..I.. 000160
 0D490A0D 490A0D49 0A0D490A 0D490A0D 490A0D49 0A0D490A 0D490A0D 490A0D49 I..I..I..I..I..I..I..I..I..I..I. 000180
 490A0D49 0A0D490A 0D490A0D 490A0D49 0A0D490A 0D490A0D 490A0D49 0A0D490A .I..I..I..I..I..I..I..I..I..I..I 0001A0
 0A0D490A 0D490A0D 490A0D49 0A0D490A 0D490A0D 490A0D49 0A0D490A 0D490A0D ..I..I..I..I..I..I..I..I..I..I.. 0001C0
 69203225 206D6F72 66203125 203A726F 72724545 0A0D490A 0D490A0D 490A0D49 I..I..I..I..EError: %1 from %2 i 0001E0

Dump of file SATURN:[PCCOMMON.DUMP.MSG]SAFRMUTL.MSG;1 on 18-APR-1990 10:54:07.43
File ID (1015,27,0)   End of file block 11 / Allocated 12

Virtual block number 11 (0000000B), 512 (0200) bytes

 0D657461 6572436C 6D44450A 0D726F72 7265206D 65747379 53450A0D 3325206E n %3..ESystem error..EDmlCreate. 000000
 0D646C65 69467972 6575516C 6D44450A 0D44494C 4D447972 6575516C 6D44450A .EDmlQueryDMLID..EDmlQueryField. 000020
 0D490A0D 316E6C52 79726575 516C6D44 450A0D6E 6C527972 6575516C 6D44450A .EDmlQueryRln..EDmlQueryRln1..I. 000040
 54646165 526C6D44 450A0065 74617453 7463656C 65537972 6575516C 6D44450A .EDmlQuerySelectState..EDmlReadT 000060
 450A0D64 6C656946 7465536C 6D44450A 0D657461 6C65526C 6D44450A 0D747865 ext..EDmlRelate..EDmlSetField..E 000080
 72576C6D 44450A0D 6E785470 6F74536C 6D44450A 0D6E7854 74726174 536C6D44 DmlStartTxn..EDmlStopTxn..EDmlWr 0000A0
 6E65536E 6957450A 0D6B636F 6C42636F 6C6C4160 654D450A 0D747865 54657469 iteText..EMemAllocBlock..EWinSen 0000C0
 0D747865 546D6574 49676C44 7465536E 6957450A 0D67734D 6D657449 676C4464 dDlgItemMsg..EWinSetDlgItemText. 0000E0
 4D646E65 53687465 4D450A0D 490A0D49 0A0D490A 0D490A0D 490A0D49 0A0D490A .I..I..I..I..I..I..I..EMethSendM 000100
 6C654473 75636F46 450A0D65 6C746954 6574656C 65447375 636F4645 0A0D6773 sg..EFocusDeleteTitle..EFocusDel 000120
 78655474 696E4945 0A0D786F 42746365 6C655374 696E4945 0A0D6773 4D657465 eteMsg..EInitSelectBox..EInitTex 000140
 65546574 61647055 20450909 09455441 4450555F 524F5252 455F4641 530A0D74 t..SAF_ERROR_UPDATE...E UpdateTe 000160
 20676E69 74746567 450A0D6C 65646F4D 636F7250 74696E49 450A0D49 0A0D7478 xt..I..EInitProcModel..Egetting  000180
 6E49450A 0D490A0D 656D614E 74696E49 450A0D6C 65646F6D 20737365 636F7270 process model..EInitName..I..EIn 0001A0
 00000000 00000A0D 0A0D7473 694C7469 6E49450A 0D726562 6D754E6A 624F7469 itObjNumber..EInitList.......... 0001C0
 00000000 00000000 00000000 00000000 00000000 00000000 00000000 00000000 ................................ 0001E0

Dump of file SATURN:[PCCOMMON.DUMP.DLL]SAM.TMP;1 on 18-APR-1990 10:52:28.45
File ID (911,26,0)   End of file block 69 / Allocated 72

Virtual block number 1 (00000001), 512 (0200) bytes

 00000000 00000040 00000000 00000088 0000FFFF 00000004 0000003B 01EA5A4D MZõ.;...........|.......a....... 000000
 00000080 00000000 00000000 00000000 00000000 00000000 00000000 00000000 ................................ 000020
 6F6E6E61 63206061 72676F72 70207369 685421CD 4C01B821 CD09B400 0EBA1F0E ..¤..Ç.ë!¡.LèIThis program canno 000040
 00000000 00000024 0A0D0D2E 65646F6D 20534F44 206E6920 6E757220 65622074 t be run in DOS mode....$....... 000060
 00080016 00000000 00070000 00000400 000A800E AFA99E82 003E040D 0505454E NE....>...`£.................... 000080
 00000000 00000000 0001000C 00040000 000004CB 02260210 012000F0 0040001D ..a.Þ. ...&.ù.................... 0000A0
 03960F00 039600C7 035C0F00 035B008C 03300F00 032F0052 00180F00 0018004F O.......R./...0...[...\.ú....... 0000C0
 197C0F00 197C041E 000F0F00 000F041C 12880F00 128802EF 1D860F00 1D860108 ........ÿ.................|...|. 0000E0
 03811EB1 03810796 02DA1EB1 02DA0768 1C400F01 1AA0058C 02020E01 00000000 ........¥.....a.h.Ö.Ý.Ö.....Ý... 000100
 00B31EB1 00B30809 01211EB1 012107F6 01011EB1 010107E5 015A1EB1 015A07CF ü.Z.Ý.Z.!...Ý...-.!.Ý.!...°.Ý.°. 000120
 01BB1EB1 01BB084F 019F1EB1 019F0835 018E1EB1 018E0819 00371EB1 00370815 ..7.Ý.7.../.Ý./.5...Ý...O.£.Ý.£. 000140
 00410005 00310005 00210005 00110005 019E1EB1 019E087B 01001EB1 0100086B k...Ý...{...Ý.........!...1...A. 000160
 01F40004 01900004 012C0004 00C80004 00640004 00220005 00910005 00510005 ..Q.......".. d...à...,........¶. 000180
 4D414E45 54414449 4C415610 00024453 4554454C 45444D41 530B0000 4D415303 .SAM...SAMDELETESD...VALIDATENAM 0001A0
 52434D41 530E0004 53534543 4F525045 54454C45 44404153 10000352 54464145 EAFTR...SAMDELETEPROCESS...SAMCR 0001C0
 434D4153 0C000657 4F4C4645 54414552 434D4153 0D000553 434F5250 45544145 EATEPROCS...SAMCREATEFLOW...SAMC 0001E0
```

```
Dump of file SATURN:[PCCOMMON.DUMP.DLL]SAM.TMP;1 on 18-APR-1990 10:52:28.45
File ID (911,26,0)   End of file block 69 / Allocated 72

Virtual block number 2 (00000002), 512 (0200) bytes

 0E000847 4E495254 53524F52 52455445 474D4153 5F120007 53445345 54414552 REATESDS..._SAMGETERRORSTRING... 000000
 000A574F 4C464554 454C4544 4D41530D 00094552 4F545345 54454C45 444D4153 SAMDELETESTORE...SAMDELETEFLOW.. 000020
 54414449 4C41560F 00085245 54464154 4E455241 50535345 434F5250 4D415315 .SAMPROCESSPARENTAFTER...VALIDAT 000040
 41535F10 00005345 524F5453 45544145 52434D41 530F000C 52464245 4D414E45 ENAMEBFR...SAMCREATESTORES..._SA 000060
 015A0148 00680036 002D0027 00150001 00000E52 4F525245 53534543 4F52504D MPROCESSERROR.......'.-.6.k.H.Z. 000080
 646D6669 0654494E 49424F4C 474C4D44 08626F6C 676C6D64 070001DA 01C60185 ..6.Ö...dmlglob.DMLGLOBINIT.ifmd 0000A0
 49544703 534C4C41 43534F44 084E4957 4D500554 494E494C 4D444046 490A6C6D ml.IFMDMLINIT.PMWIN.DOSCALLS.GTI 0000C0
 4712574F 444E4957 4C4F4F54 59524555 51495447 1247534D 444E4553 4954470A .GTISENDMSG.GTIQUERYTOOLWINDOW.G 0000E0
 58545452 4154534C 4D440B6C 6D640354 4E455241 504C4F4F 54595245 55514954 TIQUERYTOOLPARENT.dml.DMLSTARTTX 000100
 52455551 4C4D440D 49544759 52455551 4C4D440B 4E585450 4F54534C 4D440A4E N.DMLSTOPTXN.DMLQUERYGTI.DMLQUER 000120
 440C4E4C 52595245 55514C4D 440B444C 45494654 45534C4D 440B444C 45494659 YFIELD.DMLSETFIELD.DMLQUERYRLN.D 000140
 4C454552 464C4D44 08455441 4C45524E 554C4D44 0?314E4C 52595245 55514C4D MLQUERYRLN1.DMLUNRELATE.DMLFREEL 000160
 464C4D44 13455445 4C45444C 4D440944 494C4D44 59524555 514C4D44 00545349 IST.DMLQUERYDMLID.DMLDELETE.DMLF 000180
 464C4D44 0C4E4F52 45544C49 464C4D44 08455441 54535952 45555152 45544C49 ILTERQUERYSTATE.DMLFILTERON.DMLF 0001A0
 494C4D44 12484341 424C4C4F 524E5854 504F5453 4C4D4412 46464F52 45544C49 ILTEROFF.DMLSTOPTXNROLLBACK.DMLI 0001C0
 4D455449 44444151 45534C54 55005455 44034445 54454C45 44544345 4A424F53 SOBJECTDELETED.DUT.UTLSEQADDITEM 0001E0

Dump of file SATURN:[PCCOMMON.DUMP.DLL]SAM.TMP;1 on 18-APR-1990 10:52:28.45
File ID (911,26,0)   End of file block 69 / Allocated 72

Virtual block number 3 (00000003), 512 (0200) bytes

 45444854 454D5F12 45544149 544E4154 534E4948 5445405F 10444F48 54454D06 .METHOD._METHINSTANTIATE._METHDE 000000
 4D4F4345 4D414E54 554C414E 41115455 4C414E41 06455441 49544E41 54534E49 INSTANTIATE.ANALUT.ANALUTNAMECOM 000020
 54554C41 4E411245 43415053 50495254 53454D41 4E54554C 414E4114 45524150 PARE.ANALUTNAMESTRIPSPACE.ANALUT 000040
 574F444E 49575245 544E4543 4C54550F 4C545503 45544144 494C4156 454D414E NAMEVALIDATE.UTL.UTLCENTERWINDOW 000060
 03016A03 03010317 03020101 CE030000 03030245 54495257 534F4408 4F495303 .SIO.DOSWRITE......ö.........j.. 000080
 01008A03 00000302 02013803 019C0303 02000003 06010217 03000003 01510304 ..Q..................8.......... 0000A0
 44404153 09000072 6579614C 20617465 4D204153 00000010 98030601 01840304 ..Ç.........SA Meta Layer...SAMD 0000C0
 E90001B8 D88EFFFF B81E5657 000000C8 00000000 00000000 00000145 54454C45 ELETE...........à...WV.¡...Ã¡..Õ 0000E0
 00000000 00000000 00000000 00000000 000A0008 00020001 90CBC95F 5E1F0000 ...^_èù......................... 000100
 5689FC46 89165688 14468800 0FE90374 04127E83 D88EFFFF B81E5657 000016C8 à...W̄V.¡...Ã.~..t.Õ...F..V..F=.V 000120
 89F64689 0000B8EC 4689EE46 890000B8 FE5689FC 46891056 880E4688 000CE9FE ±Õ...F..V..F•.V±¡...FŸ.F§¡...F-. 000140
 FC76FFFE 76FF1876 FF1A76FF F84689FA 46890000 B8F04689 F2468900 00B8F446 F¶¡...F·.FÞ¡...F°.F½.v..v..v±.v= 000160
 0000B800 06E9EA46 880006E9 03750000 3DEA4689 0000FFFF 9A5016EC 468D036A j..F§.P......Fõ=..u.Õ...FõÕ..¡.. 000180
 FF52868D 0676FF08 76FFD88E 0008B81E 56570000 AEC80016 CAC95F5E 1F0000E9 Õ...^_èò..àÛ..WV.¡...Ã.v..v...R. 0001A0
 0009E903 7400003D 04C483FF FF008C9A 5016FF52 868008C4 8300B300 569A5016 .P.V.▼..á...R..P......á.=..t.Õ.. 0001C0
 03749431 3DEA4689 0000FFFF 9A006A00 6A5016FF 52868D02 47E9EA46 89981BB8 ¡...FõÕG...R..Pj.j.......Fõ=1.t. 0001E0

Dump of file SATURN:[PCCOMMON.DUMP.DLL]SAM.TMP;1 on 18-APR-1990 10:52:28.45
File ID (911,26,0)   End of file block 69 / Allocated 72

Virtual block number 4 (00000004), 512 (0200) bytes

 810211E9 EA468998 1CB80009 E9037494 32EA7E81 0224E9EA 4689981A B80009E9 Õ..¡...FõÕ$..~õ2.t.Õ..¡...FõÕ... 000000
 46800C76 FF0E76FF 1076FF12 76FF01FE E9EA4689 98188800 09E90374 9430EA7E ~õ0.t.Õ..¡...FõÕ±..v..v..v..v..F 000020
 C7004DE9 F2468801 D7E9EA46 880006E9 03750000 3DEA4689 0000FFFF 9A5016F2 ·.P......Fõ=..u.Õ...FõÕ■..F·ÕM.ú 000040
 46C70010 F046C700 5EE90006 F446C700 0AF046C7 0068E900 26F446C7 0007F046 FÞ..úF¶&.Õk.úFÞ..úF¶..Õ^.úFÞ..úF 000060
 0037E900 05F446C7 000AF046 C70044E9 0004F446 C7000CF0 46C70051 E90003F4 ¶..ÕQ.úFÞ..úF¶..ÕD.úFÞ..úF¶..Õ7. 000080
 75001F3D FFB0E903 75001E3D FFABE903 75001D3D 002BE901 87E9EA46 890000B8 ¡...FõÕ..Õ+.=..u.Õ¨.=..u.Õ¯.*..u 0000A0
 F6468D10 76FF1276 FFFFC9E9 FFA5E903 7500223D FFBAE903 7500213D FFCFE903 .Õü.=¡.u.Õα.=".u.ÕÉ.Õè..v..v..F- 0000C0
 76FF1276 FF0000FF FF9A1076 FF1276FF 000BE903 7500F67E 830000FF FF9A5016 .P......—.u.Õ...v..v.......v..v 0000E0
 83001AE9 03750000 3DEA4689 0000FFFF 9A5016EC 468DF076 FF0C76FF 0E76FF10 ..v..v..vÞ.F§.P......Fõ=..u.Õ... 000100
 FF1076FF 1276FF00 F7E9EA46 88000002 4D9A1076 FF1276FF 000BE903 7500F67E —.u.Õ...v..v..M....FõÕ¼..v..v.. 000120
 F67E8300 1AE90375 00003DEA 46890000 FFFF9A50 16F8468D F476FFEC 76FFEE76 vŸ.v&.v¶.F½.P......Fõ=..u.Õ...~— 000140
 FC4689FA 568BF846 8800B9E9 EA468800 00FFFF9A 1076FF12 76FF000B E9037500 .u.Õ...v..v.......FõÕ¿..F½.V°.F= 000160
 260277FF 26FC5EC4 1076FF12 76FF0073 E9037502 47082607 8826FC5E C4FE5689 .V±á^=&..&.G.u.Õs..v..v.á^=&.w.& 000180
 FC5EC400 48E90003 E9037500 0030EA46 890000FF FF9A5016 9E468D0A 76FF37FF .7.v..F..P......Fõ=..u.Õ..ÕH.á^= 0001A0
 468DFFA5 E904FC46 830007E9 03740257 39260010 E9037407 39260E56 880C4688 .F..V.&9.t.Õ..&9W.t.Õ...F=.ÕE..F 0001C0
 46830007 E99819EA 46C70008 E9037400 00300000 FFFF9A50 16FF5286 8050169E ..P..R..P.....=..t.Õ..úFõ..Õ...F 0001E0
```

```
Dump of file SATURN:[PCCOMMON.DUMP.DLL]SAM.TMP;1 on 18-APR-1990 10:52:28.45
File ID (911,26,0)   End of file block 69 / Allocated 72

Virtual block number 5 (00000005), 512 (0200) bytes

 FF0008E9 037500F6 7E830000 FFFF9AF8 76FFFA76 FF1076FF 1276FFFF 7EE904FC •.Õ~..v..v..v¹.v½......~.u.Õ... 000000
 92B81E56 57000000 C8000ECA C95F5E1F 0000E9EA 468B0000 020F9A10 76FF1276 v..v.......FõÕ...^_èò..à...WV.¡. 000020
 DD000601 24020300 D1000602 F2020300 0D12CAC9 5F5E1F00 00E90000 B8D88E00 ..Ä¡..Õ...^_èò..........Ì...$...Ì 000040
 09000603 06020300 00000A03 1F000200 F5000601 C3020300 00000800 A5000200 ...Ë.......ũ...¥................ 000060
 8C000902 CA020300 A0000600 68020301 15000601 D7020300 92000602 8B020301 ...........■.......h.......ò.... 000080
 00000000 00000001 83000900 D4020300 B8000601 F0020300 AC000602 2E020301 .......¯...Þ...¦...å...°........ 0000A0
 FE468D0A 76FF0C76 FF0E76FF 1076FF00 00FE46C7 D88EFFFF B81E5657 000006C8 à...WV.¡...ÄúF±...v..v..v..v..F± 0000C0
 06E90375 00FE7E83 00F9E9FA 468B0006 E9037500 003DFA46 890000FF FF9A5016 .P......F¹=..u.Õ...F¹Õ¹..-±.u.Õ. 0000E0
 5016FC46 800A76FF 0C76FF0E 76FF1076 FF000107 C726065E C400EAE9 0000B800 .¡..Õõ.á^.&ú....v..v..v..v..F•.P 000100
 FF1076FF 0080E9FC 468B00BB E9FA468B 0006E903 7500003D FA468900 00FFFF9A ......F¹=..u.Õ...F¹ÕЄ..F=Õ...v.. 000120
 9A0A76FF 0C76FF0E 76FF1076 FF0098E9 FA468900 A201CE9A 0A76FF0C 76FF0E76 v..v..v..ö.Å..F¹Õ...v..v..v..v.. 000140
 6AE9FA46 8900D001 389A0A76 FF0C76FF 0E76FF10 76FF0081 E9FA4689 00B9016A j.¿..F¹Õ...v..v..v..v..8.Å..F¹Õj 000160
 76FF0E76 FF1076FF 0053E9FA 4689FFFF 019C9A0A 76FF0C76 FF0E76FF 1076FF00 ..v..v..v..v.......F¹ÕS..v..v..v 000180
 3D001E2D 002FE900 0007C726 065EC400 40E90AC4 830000FF FF9A006A 0A76FF0C ..v.j.......á.Õa.á^.&ú...Õ/.-..= 0001A0
 D8000800 F1000800 9300C100 F100AA00 7C010FA7 FF2E93C0 03FFEAE9 0376000D ..v.Õõ..ã...Ì..|.ˆ.þ.ê...Ä.þ.Ä.Ä 0001C0
 B81E5657 000002C8 000CCAC9 5F5E1F00 00E9FA46 8800D800 D800D800 D800D800 .Ä.Ä.Ä.Ä.Ä..F¹Õ...^_èò..à...WV.¡ 0001E0

Dump of file SATURN:[PCCOMMON.DUMP.DLL]SAM.TMP;1 on 18-APR-1990 10:52:28.45
File ID (911,26,0)   End of file block 69 / Allocated 72

Virtual block number 6 (00000006), 512 (0200) bytes

 FE468BFE 46890AC4 83000000 E79A006A 0676FF08 76FF0A76 FF0C76FF D88E0008 ...Ä.v..v..v..v.j..Ó....á..F±.F± 000000
 FF0876FF 0A76FF0C 76FFD88E 0140B81E 56570000 02C80008 CAC95F5E 1F0000E9 Õ...^_èò..à...WV.¡a..Ä.v..v..v.. 000020
 000002C8 0008CAC9 5F5E1F00 00E9FE46 8BFE4689 0AC48300 0001539A 006A0676 v.j..Š....á..F±.F±Õ...^_èò..à... 000040
 46890AC4 83000001 859A006A 0676FF08 76FF0A76 FF0C76FF D88E0172 B81E5657 WV.¡r..Ä.v..v..v..v.j.......á..F 000060
 0A76FF0C 76FFD88E 01A4B81E 56570000 0EC80008 CAC95F5E 1F0000E9 FE468BFE ±.F±Õ...^_èò..à...WV.¡Ê..Ä.v..v. 000080
 F2468B00 06E90375 00003DF2 46890000 026D9A50 16FC468D 046A0676 FF0876FF .v..v.j..F•.P.m....F·=..u.Õ...F· 0000A0
 76FF002A E9037502 470B2607 8826F85E C4FA5689 F84689FE 5688FC46 880152E9 ÕR..F•.V±.F½.V¹á^½&..&.G.u.Õ*..v 0000C0
 07E90003 E9037500 0030F246 8902B001 389A37FF 260277FF 26F85EC4 0A76FF0C ..v.á^½&.w.&.7.8.¯..F·=..u.Õ..Õ. 0000E0
 FF0A76FF 0C76FF00 00FFFF9A FC76FFFE 76FF0A76 FF0C76FF FFC7E904 FB468300 ..F½.Õú..v..v..v±.v•......v..v.. 000100
 E9F2468B 0006E903 7500003D F2468900 00FFFF9A 5016FC46 80056A06 76FF0876 v..v.j..F•.P......F·=..u.Õ...F·Õ 000120
 0C76FF00 2AE90375 02470B26 07882 6F8 5EC4FA56 89F84689 FE5688FC 468B0003 Æ..F•.V±.F½.V¹á^½&..&.G.u.Õ*..v. 000140
 0007E900 03E90375 00003DF2 4689008B 01389A37 FF260277 FF26F85E C40A76FF .v.á^½&.w.&.7.8....F·=..u.Õ..Õ.. 000160
 76FF0A76 FF0C76FF 00000255 9AFC76FF FE76FF0A 76FF0C76 FFFFC7E9 04F84683 .F½.Õú..v..v..v±.v•.U....v..v..v 000180
 54E9F246 880006E9 03750000 3DF24689 0000FFFF 9A5016F4 468D0A6A 0676FF08 ..v.j..F¶.P......F·=..u.Õ...F·ÕT 0001A0
 3DF24689 0000FFFF 9A066AF4 76FFF676 FF0A6A06 76FF0876 FF0A76FF 0C76FF00 ..v..v..v..v.j..v-.v¶j.......F·= 0001C0
 46890000 FFFF9A06 76FF0876 FF0A76FF 0C76FF00 28E9F246 880006E9 03750000 ..u.Õ...F·Õ(..v..v..v..v.......F 0001E0

Dump of file SATURN:[PCCOMMON.DUMP.DLL]SAM.TMP;1 on 18-APR-1990 10:52:28.45
File ID (911,26,0)   End of file block 69 / Allocated 72

Virtual block number 7 (00000007), 512 (0200) bytes

 D4020300 0A08CAC9 5F5E1F00 00E9F246 880006E9 F2468B00 06E90375 00003DF2 ·=..u.Õ...F·Õ...F·Õ...^_èò.....å 000000
 D6000200 EB000603 3A020300 D0000600 61020300 00000302 31000200 D1000602 ...Ì...1.......a...Ì...:...S...ø 000020
 EC020301 35000600 23020300 AC000601 EE020301 72000801 B7020300 00000A01 .......ñ...r...Ÿ...¯...#...5...š 000040
 8B06468B D88EFFFF B81E5657 00002AC8 00000000 C5000603 18020300 B8000602 ...¦........é....à*..WV.¡...Ä.F.. 000060
 EA5689E8 46890C56 8B0A468B E25689E0 46891856 8B16468B E65689E4 46890856 V..Fõ.VÌ.F..V..FÅ.Vã.F..V..Fò.Võ 000080
 76FF1676 FF1876FF FA5689F8 46891056 8B0E468B F65689F4 46891456 8B12468B .F..V..F¶.V-.F..V..F½.V¹.v..v..v 0000A0
 FF000BE9 D6468B00 06E90375 00003D06 46890000 00819A50 16D8468D 1276FF14 ..v..FÄ.P......Fø=..u.Õ...FøÕÜ.. 0000C0
 0006E903 7500003D D6468900 00FFFF9A 5016DE46 8D0E76FF 1076FF16 76FF1876 v..v..v..v..FB.P......Fø=..u.Õ.. 0000E0
 46801676 FF1876FF 0076E903 7522DE7E 83007FE9 03752208 7E830084 E9D6468B .FøÕÇ..-Ä"u.Õ...-8"u.Õv..v..v..F 000100
 16FE468D FC76FF00 81E90646 880006E9 03750000 3D064689 0000FFFF 9A5016FC •.P......Fø=..u.Õ...FøÕ...v•.F±. 000120
 9A5016DA 468DFE76 FF0063E9 D6468B00 06E90375 00003D06 46890000 FFFF9A50 P......Fø=..u.Õ...FøÕc..v±.FÕ.P. 000140
 9B9ADA76 FFDC76FF 98406800 45E9D646 880006E9 03750000 3D064689 0000FFFF .....Fø=..u.Õ...FøÕE.ha..vÊ.vÖ.. 000160
 FFFF027A 9A1676FF 1876FF1F 6A5016E0 468D0026 E9000206 46C706C4 83FFFF10 ....á.úFø..Õ&..FÅ.Pj..v..v..z... 000180
 14CAC95F 5E1F0000 E9D6468B 00000646 C70005E9 037401D6 7E83D646 890AC483 .á..Fø.-ø.t.Õ..úFø...FøÕ...^_èò. 0001A0
 89105688 0E468BEA 5689E846 89085688 06468BD8 8E000888 1E565700 001EC800 .à...WV.¡...Ä.F..V..Fò.Võ.F.¯V.. 0001C0
 7A9A0E76 FF1076FF 226A5016 E4468DEE 5689EC46 890C5688 0A468BE6 5689E446 Fõ.VÌ.F..V..Fš.VŸ.Fõ.Pj".v..v..z 0001E0
```

Dump of file SATURN:[PCCOMMON.DUMP.DLL]SAM.TMP;1 on 18-APR-1990 10:52:28.45
File ID (911,26,0)   End of file block 69 / Allocated 72

Virtual block number 8 (00000008), 512 (0200) bytes

```
5F5E1F00 00E9E246 880000E2 46C70005 E9037401 E27E83E2 46890AC4 83012E02 ....á..Fã.~ã.t.Õ..úFã...FãÕ...^_ 000000
880E4688 EA5689E8 46890856 88064688 D88E0159 881E5657 00001EC8 000CCAC9 èò..à...WV.¡Y..Ä.F..V..FÒ.Võ.F.. 000020
76FF1076 FF216A50 16E4468D EE5689EC 46890C56 880A4688 E65689E4 46891056 V..FÒ.Vì.F..V..F§.VŸ.FÕ.Pj!.v..v 000040
0000E9E2 46880000 E246C700 05E90374 01E27E83 E246890A C4830191 027A9A0E ..z....á..Fã.~ã.t.Õ..úFã...FãÕ.. 000060
88EA5689 E8468908 56880646 88D88E01 8CB81E56 5700001E C8000CCA C95F5E1F .^_èò..à...WV.¡¥..Ä.F..V..FÒ.Võ. 000080
76FF1E6A 5016E446 8DEE5689 EC46890C 56880A46 88E65689 E4468910 56880E46 F.¯V..FÒ.Vì.F..V..F§.VŸ.FÕ.Pj..v 0000A0
E2468800 00E246C7 0005E903 7401E27E 83E24689 0AC48301 F4027A9A 0E76FF10 ..v..z.¶..á..Fã.~ã.t.Õ..úFã...Fã 0000C0
64F246C7 0063E90A 468BD88E 021FB81E 56570000 12C8000C CAC95F5E 1F0000E9 Õ...^_èò..à...WV.¡...Ä.F.Õc.úF·d 0000E0
006AE902 8DF046C7 FFFFEE46 C700C8F2 46C7007C E902ABF0 46C7FFFF EE46C700 .úFŸ.¯úFÞ¨.Õ|.úF·à.úFŸ..úFÞ§.Õj. 000100
E1F046C7 FFFFEE46 C70190F2 46C70058 E902CFF0 46C7FFFF EE46C701 2CF246C7 úF·,.úFŸ..úFÞü.ÕX.úF·..úFŸ..úFÞÄ 000120
30002BE9 00A5E900 01880034 E9FFFFF0 46C7FFFF EE46C701 F4F246C7 0046E902 .ÕF.úF·¶.úFŸ..úFÞ..Õ4.¡..ÕE.Õ+.= 000140
3DFF8FE9 03750022 3DFFA9E9 03750021 3DFFC3E9 0375001F 3DFF95E9 0375001E ..u.Õ..=..u.Õú.=!.u.Õ¨.=".u.Õ..= 000160
00003DF4 46890000 00849A50 16FA468D 0676FF08 76FFFFCC E9FFBDE9 03750030 0.u.Õ§.Õä..v..v..Fª.P.Ç....F¶=.. 000180
0000FFFF 9A5016FC 46805016 F6468D10 8468FA76 FF0056E9 F4468800 06E90375 u.Õ...F¶ÕV..vªhÇ..F-.P.F=.P..... 0001A0
76FFF076 FFFC76FF FE76FF01 6A006A00 30E9F446 880006E9 03750000 3DF44689 .F¶=..u.Õ...F¶ÕÕ.j.j..v±.v=.vÞ.v 0001C0
00E9F446 8BF44689 0000FFFF 9A0C76FF 0E76FFF2 76FF0200 36FF2619 B8068EEE Ÿ..¡.&.6...v·.v..v.......F¶.F¶Õ. 0001E0
```

Dump of file SATURN:[PCCOMMON.DUMP.DLL]SAM.TMP;1 on 18-APR-1990 10:52:28.45
File ID (911,26,0)   End of file block 69 / Allocated 72

Virtual block number 9 (00000009), 512 (0200) bytes

```
00000004 02570002 00D00006 005A0203 00580005 00020203 000FCBC9 5F5E1F00 ..^_èù....@...X...Z...Ì...W..... 000000
00000005 02940005 00000006 01110002 007D0003 03840103 00000005 02990002 ...............)................ 000020
109E0005 020C0005 04970005 02A60005 00860006 03260203 0000000A 02820002 ..........&.......Ì.......É..... 000040
00D90005 02CA0005 00450005 00F00203 003A0005 034C0203 09370005 02880005 ..¡...7...L...:...Þ...E...ò...ì. 000060
FF109689 FF0E8689 08568806 46880452 E90E4688 D88EFFFF B81E5657 000142C8 àB..WV.¡...Ä.F.ÕR..F..V......... 000080
FF0000FF FF9AFF0E B6FFFF10 B6FF006A 1076FF12 76FF0000 1247C726 FF0E9EC4 á...&úG....v..v.j..Ñ...Ñ........ 0000A0
FFFF9A00 6A006A48 6A006A01 4368686A 1076FF12 76FF0000 FFFF9A10 76FF1276 v..v.......v..v.jhhC.j.jKj.j.... 0000C0
01B8FEBE 86890000 FFFF9A50 520000FF FF9A686A 1076FF12 76FF016A 006A0000 ..j.j..v..v.jh.....RP......ƒ±¡. 0000E0
FF9A5016 AE468D50 6A090268 020036FF 26198A06 8E006A00 6A0409E9 00008A00 .¤..Õ..j.j...¤.&.6..h..jP.ºÛ.P.. 000100
E90000FF FF9A206A 006A006A 006A5016 AE468D10 76FF1276 FF016A00 6A0000FF ...j.j..v..v..FÛ.Pj.j.j.j . ...Õ 000120
E90EC483 01A41607 9A1076FF 1276FF0E 76FF0A76 FF0C76FF 0676FF08 76FF03C5 é..v..v..v..v..v..v..v..■.Ê..■.Õ 000140
1276FFFF 109689FF 0E868900 0002AA9A 006A1076 FF1276FF 033EE90A 468B03A5 Ë..F.Õ>..v..v.j..ˆ............v. 000160
FF5E868D 486A686A 1076FF12 76FF0000 01239A50 16FEC086 8D4C6A66 6A1076FF .v.jfjL..â±.P.#....v..v.jhjK..^. 000180
FF000002 F99A5052 0000027B 9A686A10 76FF1276 FF016A00 6A000002 C79A5016 .P.ú...j.j..v..v.jh.(...RP.ª.... 0001A0
FFFF0CBE 83FF0C86 89000001 859A006A 006A006A 006A0165 686A6A10 76FF1276 v..v.jjhe.j.j.j.j...........ƒ... 0001C0
86805052 48CA8300 000D0228 FF0C8688 0168686A 6A1076FF 1276FF00 6EE90375 u.Õn..v..v.jjhh.....+@....òKRP.. 0001E0
```

Dump of file SATURN:[PCCOMMON.DUMP.DLL]SAM.TMP;1 on 18-APR-1990 10:52:28.45
File ID (911,26,0)   End of file block 69 / Allocated 72

Virtual block number 10 (0000000A), 512 (0200) bytes

```
76FF1276 FFFF0CB6 FF1E6A50 16FF1286 8D5016FF 5E868D00 00026E9A 5016FF12 ...P.n.....^..P.....Pj..Ñ...v..v 000000
FFFEBEB6 FF5016FF 5E868D00 1BE90375 00003DFE BE868910 C48301E2 1AEF9A10 ..ÿ.ã..á...ƒ±=..u.Õ....^..P.Ñ/±. 000020
9A5016FE C0868D50 16FF5E86 8D0087E9 0271E90A C4830206 109B9A10 76FF1276 v..v.......á.Õq.Õ....^..P..â±.P. 000040
1276FFFE BEB6FF50 16FF5E86 8D001BE9 03750000 3DFEBE86 8908C483 022413B1 Ý.$..á...ƒ±=..u.Õ....^..P.Ñ/±.v. 000060
76FF1276 FF1E6A50 16FF5E86 8D5016AA 46800233 E90AC483 0248109B 9A1076FF .v....H..á.Õ3..F¯.P..^..Pj..v..v 000080
FFFEBEB6 FF5016FF 5E868D00 1BE90375 00003DFE BE86890E C4830362 18789A10 ..(.b..á...ƒ±=..u.Õ....^..P.Ñ/±. 0000A0
1076FF12 76FF0001 1247C726 FF0E9EC4 01F1E90A C483039B 109B9A10 76FF1276 v..v.......á.Õþ.á...&úG....v..v. 0000C0
52000002 919A656A 1076FF12 76FF0000 03119A00 6A006AFF 6A006A01 64686A6A jjhd.j.j.j.j.......v..v.je.....R 0000E0
A0E90000 FFFF9A01 6A505200 0002F29A 666A1076 FF1276FF 0000029A 9A016A50 Pj.......v..v.jf.·...RPj......Õ. 000100
4C6A666A 1076FF12 76FFFF10 9689FF0E 86890000 FFFF9A00 6A1076FF 1276FF01 ..v..v.j...............v..v.jfjL 000120
0000FFFF 9A5016FF 5E86804B 6A686A10 76FF1276 FF000002 DC9A5016 FEC0868D ..â±.P.É....v..v.jhjK..^..P..... 000140
1276FF00 0000769A 50520000 006F9A68 6A1076FF 1276FF01 6A006A00 FF1286C6 6....j.j..v..v.jh.o...RP.v....v. 000160
0375FFFF 0CBE83FF 0C868900 0003439A 006A006A 006A006A 0165686A 6A1076FF .v.jjhe.j.j.j.j..C........ƒ...u. 000180
FF12868D 50524BCA 8300000D D22BFF0C 86880168 686A6A10 76FF1276 FF004BE9 ÕK..v..v.jjhh.....+@....òKRP.... 0001A0
9A1076FF 1276FFFF 0C86FF1E 6A5016FF 12868050 16FF5E86 8D000000 5E9A5016 .P.^.....^..P.....Pj..Ñ...v..v.. 0001C0
83038913 819A5016 FEC0868D 5016FF5E 86800054 E9FEBE86 8910C483 037D1AEF ÿ.)..á...ƒ±ÕT...^..P..â±.P.Ý.¿.. 0001E0
```

```
Dump of file SATURN:[PCCOMMON.DUMP.DLL]SAM.TMP;1 on 18-APR-1990 10:52:28.45
File ID (911,26,0)   End of file block 69 / Allocated 72

Virtual block number 11 (0000000B), 512 (0200) bytes

 06C483FF FF10989A 1076FF12 76FFFEBE B6FF0015 E9037500 003DFEBE 868908C4 6.../±=..u.Õ...Ñ/±.v..v.......6. 000000
 86890EC4 83FFFF18 7B9A1076 FF1276FF 1E6A5016 FF5E868D 5016AA46 8D009EE9 Õ...F¯.P..^..Pj..v..v..(.. .6... 000020
 00127F83 26FF0E9E C4001EE9 0374981B FEBEBE81 0019E903 7500FEBE BE83FEBE f±.ff±.u.Õ...ff±..t.Õ..6.. ..... 000040
 FFFEBEB6 FF5016FF 5E868D00 18E90000 FFFF9A01 6A1076FF 1276FF00 10E90375 u.Õ...v..v.j......Õ....^..P.Ñf±. 000060
 0021E900 0003EE9A 026A1076 FF1276FF 0031E90A C48301C8 10989A10 76FF1276 v..v....à..6.Õ1..v..v.j..Ÿ...ÜI. 000080
 DFE9FCAA E9037500 683DFFDA E9037500 023DFE73 E9037500 013D001B E9001EE9 Õ..Õ..=..u.Õs±=..u.ÕÕ.=k.u.Õ¯=ÕÕ 0000A0
 2FE90000 FFFF9A06 76FF0876 FF0A76FF 0C76FF0E 76FF1076 FF1276FF 0043E9FF .ÕC..v..v..v..v..v..v......Õ/ 0000C0
 75003B3D FC46E903 7500303D FC13E903 7500223D FC76E903 7500203D 0023E900 .Õ#.= .u.Õv==".u.Õ.==0.u.ÕF==;.u 0000E0
 08881E56 57000142 C8000ECA C95F5E1F 0000E900 00BA0000 B8FFBDE9 FB8EE903 .Õ.«Õ§.|..¤..Õ...^_èò..àB..WV.|. 000100
 001247C7 26FF0E9E C4FF1096 89FF0E86 89085688 06468804 5BE90E46 88D88E00 ..Ä.F.Õ[..F..V..........6...&úG.. 000120
 0000469A 1076FF12 76FF0000 003B9AFF 0EB6FFFF 1086FF00 6A1076FF 1276FF00 ..v..v.j..Ñ...Ñ...;....v..v..F.. 000140
 76FF016A 006A0000 05F09A00 6A006A4B 6A006A01 436800CC 681076FF 1276FF00 ..v..v.hä.hC.j.jKj.j..Þ...j.j..v 000160
 0410E900 00BA0001 B8FEBE86 89000005 D79A5052 000005D0 9A00CC68 1076FF12 ..v.hä..Å...RP.■.....f±|..¤..Õ.. 000180
 016A006A 0000009F 9A5016AA 468D506A 09026802 0036FF26 19BA068E 006A006A j.j...¤.&.6..h..jP.F¯.P.....j.j. 0001A0
 76FF0876 FF03CCE9 000000BB 9A206A00 6A006A00 6A5016AA 468D1076 FF1276FF .v..v..F¯.Pj.j.j.j .£...Õë..v..v 0001C0
 45E90A46 8B03ACE9 0EC48306 4216D79A 1076FF12 76FF0E76 FF0A76FF 0C76FF06 ..v..v..v..v..v..■.B..6.Õ¯..F.ÕE 0001E0

Dump of file SATURN:[PCCOMMON.DUMP.DLL]SAM.TMP;1 on 18-APR-1990 10:52:28.45
File ID (911,26,0)   End of file block 69 / Allocated 72

Virtual block number 12 (0000000C), 512 (0200) bytes

 6A00CA68 1076FF12 76FFFF10 9689FF0E 86890000 07459A00 6A1076FF 1276FF03 ..v..v.j..E............v..v.hò.j 000000
 07639A50 16FF5E86 804B6A00 CC681076 FF1276FF 0000058E 9A5016FE C08680AC L..â±.P./....v..v.hä.jK..^..P.c. 000020
 76FF1276 FF000001 3B9A5052 00000715 9A00CC68 1076FF12 76FF016A 006A0000 ..j.j..v..v.hä......RP.;....v..v 000040
 E90375FF FF0CBE83 FF0C8689 00000623 9A006A00 6A006A00 6A016568 00CE6810 .hö.he.j.j.j.j..#........f...u.Õ 000060
 FF12868D 505248CA 83000000 D22BFF0C 86880168 6800CE68 1076FF12 76FF006F o..v..v.hö.hh.....+■....òKRP.... 000080
 9A1076FF 1276FFFF 0CB6FF22 6A5016FF 12868D50 16FF5E86 80000007 079A5016 .P.......^..P.....Pj".Ñ...v..v.. 0000A0
 1276FFFE BEB6FF50 16FF5E86 8D001BE9 03750000 3DFEBE86 8910C483 06801AEF ÿ....6...f±=..u.Õ....^..P.Ñf±.v. 0000C0
 13B19A50 16FEC086 8D5016FF 5E868000 81E90273 E90AC483 069E109B 9A1076FF .v.......6.Õs.Õ....^..P..â±.P.Ÿ. 0000E0
 06E0109B 9A1076FF 1276FFFE BE86FF00 15E90375 00003DFE BE868908 C483068C ¥..6...f±=..u.Õ...Ñf±.v..v....Å. 000100
 C483000A 18789A10 76FF1276 FF226A50 16FF5E86 8D5016FC 468D023B E906C483 .6.Õ;..F■.P..^..Pj".v..v..(.Ö..6 000120
 10989A10 76FF1276 FFFEBEB6 FF5016FF 5E868D00 1BE90375 00003DFE BE86890E ...f±=..u.Õ....^..P.Ñf±.v..v.... 000140
 006A0164 6800CE68 1076FF12 76FF0001 1247C726 FF0E9EC4 01F9E90A C4830408 ...6.Õ¹.6...&úG....v..v.hö.hd.j. 000160
 07359A01 6A505200 00072C9A 00C96810 76FF1276 FF000001 539A006A 006AFF6A j.j.j..S....v..v.hè..,...RPj..5. 000180
 FF1276FF 01A5E900 0002849A 016A5052 00000134 9A00CA68 1076FF12 76FF0000 ...v..v.hò..4...RPj......ÕE..v.. 0001A0
 FEC0868D 4C6A00CA 681076FF 1276FFFF 109689FF 0E868900 0000F19A 006A1076 v.j..Þ............v..v.hò.jL..â± 0001C0
 1286C600 00010E9A 5016FF5E 86804B6A 00CC6810 76FF1276 FF000007 799A5016 .P.y....v..v.hä.jK..^..P.....6.. 0001E0

Dump of file SATURN:[PCCOMMON.DUMP.DLL]SAM.TMP;1 on 18-APR-1990 10:52:28.45
File ID (911,26,0)   End of file block 69 / Allocated 72

Virtual block number 13 (0000000D), 512 (0200) bytes

 76FF1276 FF000005 0F9A5052 00000508 9A00CC68 1076FF12 76FF016A 006A00FF ..j.j..v..v.hä......RP......v..v 000000
 E90375FF FF0CBE83 FF0C8689 000007E3 9A006A00 6A006A00 6A016568 00CE6810 .hö.he.j.j.j.j..D........f...u.Õ 000020
 FF12868D 50524BCA 83000000 D22BFF0C 86880168 6800CE68 1076FF12 76FF004C L..v..v.hö.hh.....+■....òKRP.... 000040
 9A1076FF 1276FFFF 0CB6FF22 6A5016FF 12868D50 16FF5E86 8D000004 F69A5016 .P.-.....^..P.....Pj".Ñ...v..v.. 000060
 83085913 819A5016 FEC0868D 5016FF5E 86800054 E9FEBE86 8910C483 081D1AEF ÿ....6...f±ÕT...^..P..â±.P.Ÿ.Y.. 000080
 06C48308 A810989A 1076FF12 76FFFEBE 86FF0015 E9037500 003DFEBE 868908C4 6...f±=..u.Õ...Ñf±.v..v....´..6. 0000A0
 86890EC4 83057318 7B9A1076 FF1276FF 226A5016 FF5E868D 5016FC46 8D009EE9 Õ...F■.P..^..Pj".v..v..(.s..6... 0000C0
 00127F83 26FF0E9E C4001EE9 0374981B FEBEBE81 0019E903 7500FEBE BE83FEBE f±.ff±.u.Õ...ff±..t.Õ..6...&.... 0000E0
 FFFEBEB6 FF5016FF 5E868D00 18E90000 08B99A01 6A1076FF 1276FF00 10E90375 u.Õ...v..v.j..¿...Õ....^..P.Ñf±. 000100
 0021E900 0004199A 026A1076 FF1276FF 0031E90A C4830666 10989A10 76FF1276 v..v....f..6.Õ1..v..v.j......ÕI. 000120
 DFE9FCA3 E9037500 CF3DFFDA E9037500 023DFE6E E9037500 0130001B E9001EE9 Õ..Õ..=..u.Õn±=..u.ÕÕ.=ü.u.ÕE=ÕÕ 000140
 2FE90000 045A9A06 76FF0876 FF0A76FF 0C76FF0E 76FF1076 FF1276FF 0043E9FF .ÕC..v..v..v..v..v..v..v..Z...Õ/ 000160
 75003B3D FC3FE903 7500303D FC0CE903 7500223D FC6FE903 75002030 0023E900 .Õ#.= .u.Õo=".u.Õ.==0.u.Õ?==;.u 000180
 9FB81E56 57000142 C8000ECA C95F5E1F 0000E900 00BA0000 B8FFBDE9 FB85E903 .Õ.«Õ§.|..¤..Õ...^_èò..àB..WV.|. 0001A0
 001247C7 26FF129E C4FF1496 89FF1286 89085688 06468804 5DE90E46 88D88E04 ..Ä.F.Õ]..F..V..........6...&úG.. 0001C0
 0004DD9A 1076FF12 76FF0000 04D29AFF 12B6FFFF 14B6FF00 6A1076FF 1276FF00 ..v..v.j..Ñ...Ñ...■....v..v..Ï.. 0001E0
```

```
Dump of file SATURN:[PCCOMMON.DUMP.DLL]SAM.TMP;1 on 18-APR-1990 10:52:28.45
File ID (911,26,0)   End of file block 69 / Allocated 72

Virtual block number 14 (0000000E), 512 (0200) bytes

 76FF016A 006A0000 0A909A00 6A006A4B 6A006A01 43680130 681076FF 1276FF00 ..v..v.h0.hC.j.jKj.j......j.j..v 000000
 0412E900 00BA0001 B8FEC286 8900000A 779A5052 00000A70 9A013068 1076FF12 ..v.h0..p...RP.w.....ô±¡..¤..Õ.. 000020
 016A006A 00000538 9A5016AE 468D506A 09026802 0036FF26 19BA068E 006A006A j.j...¤.&.6..h..jP.FÚ.P.8...j.j. 000040
 76FF0876 FF03CEE9 00000554 9A206A00 6A006A00 6A5016AE 468D1076 FF1276FF .v..v..FÛ.Pj.j.j.j .T...Õö..v..v 000060
 47E90A46 8803AEE9 0EC4830A E216D79A 1076FF12 76FF0E76 FF0A76FF 0C76FF06 ..v..v..v..v..v..■.ã..á.ÕÜ..F.ÕG 000080
 6A012E68 1076FF12 76FFFF14 9689FF12 86890000 058A9A00 6A1076FF 1276FF03 ..v..v.j..............v..v.h..j 0000A0
 05A89A50 16FF6286 8D4B6A01 30681076 FF1276FF 00000A5E 9A5016FE C4868D4C L..á±.P.^....v..v.h0.jK..b..P.´. 0000C0
 76FF1276 FF000007 979A5052 00000790 9A013068 1076FF12 76FF016A 006A0000 ..j.j..v..v.h0......RP......v..v 0000E0
 E90375FF FF108E83 FF108689 00000AC3 9A006A00 6A006A00 6A016568 01326810 .h2.he.j.j.j.j..ü........ƒ...u.Õ 000100
 FF16868D 50524BCA 8300000D D228FF10 86880168 68013268 1076FF12 76FF006F o..v..v.h2.hh.....+Ø....òKRP.... 000120
 9A1076FF 1276FFFF 10B6FF21 6A5016FF 16868D50 16FF6286 8D000007 B09A5016 .P.¯.....b..P.....Pj!.Ñ...v..v.. 000140
 1276FFFE C2B6FF50 16FF6286 8D001BE9 03750000 3DFEC286 8910C483 08201AEF ÿ. ..á...õ±=..u.Õ....b..P.Ñõ±.v. 000160
 13B19A50 16FEC486 8D5016FF 62868D00 82E90275 E90AC483 0B3E109B 9A1076FF .v....>..á.Õu.Õ....b..P..á±.P.Ý. 000180
 083B109B 9A1076FF 1276FFFE C2B6FF00 15E90375 00003DFE C2868908 C483085D ]..á...ô±=..u.Õ...Ñô±.v..v....;. 0001A0
 83080218 7B9A1076 FF1276FF 216A5016 FF62868D 5016FEBE 86800230 E906C483 .á.Õ=...ƒ±.P..b..Pj!.v..v..(.... 0001C0
 9B9A1076 FF1276FF FEC2B6FF 5016FF62 868D001B E9037500 003DFEC2 86890EC4 á...ô±=..u.Õ....b..P.Ñô±.v..v... 0001E0

Dump of file SATURN:[PCCOMMON.DUMP.DLL]SAM.TMP;1 on 18-APR-1990 10:52:28.45
File ID (911,26,0)   End of file block 69 / Allocated 72

Virtual block number 15 (0000000F), 512 (0200) bytes

 6A016468 01326810 76FF1276 FF000112 47C726FF 129EC401 FAE90AC4 830CDC10 .É..á.Õ¹.á...&úG....v..v.h2.hd.j 000000
 D69A016A 50520000 0BCD9A01 2D681076 FF1276FF 00000C51 9A006A00 6AFF6A00 .j.j.j..Q....v..v.h-..ë...RPj..● 000020
 1276FF01 A6E90000 071E9A01 6A505200 000C319A 012E6810 76FF1276 FF00000B ....v..v.h...1...RPj......ÕÏ..v. 000040
 C4868D4C 6A012E68 1076FF12 76FFFF14 9689FF12 86890000 0A2A9A00 6A1076FF .v.j..*...........v..v.h..jL..á 000060
 86C60000 0A489A50 16FF6286 8D4B6A01 30681076 FF1276FF 00000C1A 9A5016FE ±.P......v..v.h0.jK..b..P.H...ó. 000080
 FF1276FF 000009AF 9A505200 0009A89A 01306810 76FF1276 FF016A00 6A00FF16 ...j.j..v..v.h0..´...RP.£....v.. 0000A0
 0375FFFF 10BE83FF 10868900 000C849A 006A006A 006A006A 01656801 32681076 v.h2.he.j.j.j.j...........ƒ...u. 0000C0
 16868D50 524BCA83 000000D2 2BFF1086 88016868 01326810 76FF1276 FF004CE9 ÕL..v..v.h2.hh.....+Ø....òKRP... 0000E0
 1076FF12 76FFFF10 B6FF216A 5016FF16 86805016 FF62868D 00000996 9A5016FF ..P.......b..P.....Pj!.Ñ...v..v. 000100
 0CFB13B1 9A5016FE C4868D50 16FF6286 8D0055E9 FEC28689 10C4830C BE1AEF9A .ÿ.ƒ..á...ô±ÕU...b..P..á±.P.Ý.«. 000120
 C48304A 109B9A10 76FF1276 FFFEC286 FF0015E9 03750000 3DFEC286 8908C483 .á...ô±=..u.Õ...Ñô±.v..v....J..á 000140
 0EC4830A 13187B9A 1076FF12 76FF216A 5016FF62 86805016 FEBE8680 009FE906 .Õ....ƒ±.P..b..Pj!.v..v..(....á. 000160
 7F8326FF 129EC400 1EE90374 981BFEC2 BE810019 E9037500 FEC2BE83 FEC28689 ..ô±./ô±.u.Õ...ƒô±..t.Õ..á...&.. 000180
 C2B6FF50 16FF6286 8D0018E9 0000005B 9A016A10 76FF1276 FF0010E9 03750012 ..u.Õ...v..v.j..[...Õ....b..P.Ñô 0001A0
 E9000008 8E9A026A 1076FF12 76FF0031 E90AC483 0B06109B 9A1076FF 1276FFFE ±.v..v.......á.Õ1..v..v.j......Õ 0001C0
 FCA1E903 7501333D FFDAE903 7500023D FE6DE903 7500013D 001BE900 1EE90021 !.Õ..Õ..=..u.Õm±=..u.ÕÕ.=3.u.ÕÀ● 0001E0

Dump of file SATURN:[PCCOMMON.DUMP.DLL]SAM.TMP;1 on 18-APR-1990 10:52:28.45
File ID (911,26,0)   End of file block 69 / Allocated 72

Virtual block number 16 (00000010), 512 (0200) bytes

 000008FA 9A0676FF 0876FF0A 76FF0C76 FF0E76FF 1076FF12 76FF0043 E9FFDFE9 ÕÕ.ÕC..v..v..v..v..v..v..v..¹... 000000
 3B30FC3D E9037500 3030FC0A E9037500 2230FC60 E9037500 20300023 E9002FE9 Õ/.Õ#.= .u.Õm==".u.Õ.==0.u.Õ===; 000020
 1E565700 00B2C800 0ECAC95F 5E1F0000 E90000BA 0000B8FF BDE9FB83 E9037500 .u.Õ.«Õ§.¡..¤..Õ...^_èò..àý..WV. 000040
 76FF0000 09729A06 76FF0876 FF006A10 76FF1276 FF0288E9 0E4688D8 8E093FB8 ¡?..Ä.F.Õ...v..v.j..v̄..v..r....v 000060
 08A89A00 6A006A4B 6A006A01 43680192 681076FF 1276FF00 00097D9A 1076FF12 ..v..}....v..v.h..hC.j.jKj.j..´. 000080
 0009089A 5016AE46 8D506A09 02680200 36FF2619 BA068E00 6A006A02 69E90000 ..Õi.j.j...¤.&.6..h..jP.FÚ.P.Ä.. 0000A0
 022EE900 0009F49A 206A006A 006A006A 5016AE46 8D1076FF 1276FF01 6A006A00 .j.j..v..v..FÛ.Pj.j.j.j .¶...Õ.. 0000C0
 76FF1276 FFFF5E96 89FF5C86 8900000B E69A006A 1076FF12 76FF0107 E90A468B .F.Õ■..v..v.j..Ì.....\...^..v..v 0000E0
 B69A0192 681076FF 1276FF01 6A006A00 000C049A 5016FF60 868D4B6A 01926810 .h..jK..'..P.....j.j..v..v.h...Ñ 000100
 7B9A1076 FF1276FF 1F6A5016 FF60868D 5016FF58 86800000 0C389A50 5200000B ...RP.8.....X..P..'..Pj..v..v..( 000120
 FF1276FF FF4EB6FF 5016FF60 868D001E E9037500 003DFF4E 86890EC4 830CA318 .È..á...N.=..u.Õ....'..P.ÑN..v.. 000140
 26FF5C9E C437FF26 0277FF26 FF5C9EC4 0134E901 63E90AC4 830B8110 9B9A1076 v.......á.Õc.Õ4.á.\.&.w.&.7á.\.& 000160
 0008E903 7500FF4E BE83FF4E 86890000 FFFF9A50 16FF5686 8D1877FF 261A77FF .w.&.w...V..P........N..ƒN..u.Õ.. 000180
 8D1477FF 261677FF 26FF5C9E C437FF26 0277FF26 FF5C9EC4 016FE999 FF4E8688 ..N..Õo.á.\.&.w.&.7á.\.&.w.&.w.. 0001A0
 0137E999 FF4E868B 0008E903 7500FF4E BE83FF4E 86890000 0F0E9A50 16FF5486 .T..P.......N..ƒN..u.Õ....N..Õ7. 0001C0
 08E90374 21FF548E 83004AE9 0036AC46 C70052E9 0038AC46 C7003FE9 FF56868B ..V.Õ?.úF¯;.ÕR.úF¯6.ÕJ..ƒT.!t.Õ. 0001E0
```

Dump of file SATURN:[PCCOMMON.DUMP.DLL]SAM.TMP;1 on 18-APR-1990 10:52:28.45
File ID (911,26,0)   End of file block 69 / Allocated 72

Virtual block number 17 (00000011), 512 (0200) bytes

```
00F7E999 FF4E8688 0008E903 7500FF4E BE830036 AC46C700 05E9003C AC46C700 .úF¯<.Õ..úF¯6..ƒN..u.Õ....N..Õ%. 000000
00E9FFB9 E9037500 223DFFB1 E9037500 213DFFC1 E9037500 1E3D001B E9001EE9 Õ..Õ..=..u.Õė.=!.u.ÕŸ.=".u.Õ¿.Õ. 000020
FF260277 FF26FF5C 9EC4FF58 B6FFFF5A B6FF5016 FF608680 AC76FF00 6A006A00 .j.j..v¯..`..P.ÑZ..ÑX.ó.\.&.w.&. 000040
00001030 9A016A10 76FF1276 FF1AC483 0000FFFF 9A006A66 6A5016FF 50868037 7..P..Pjfj.......ó..v..v.j..0... 000060
FF4E8688 0008E903 7500003D FF4E8689 0000FFFF 9A37FF26 0277FF26 FF5C9EC4 ó.\.&.w.&.7.......N.=..u.Õ....N. 000080
00013000 13E90016 E90019E9 00000030 9A026A10 76FF1276 FF0029E9 0073E999 .Õs.Õ)..v..v.j..0...Õ..Õ..Õ..=.. 0000A0
FF0C76FF 0E76FF10 76FF1276 FF003BE9 FFE7E9FF DAE90375 00023DFE 21E90375 u.Õ!±=..u.ÕÕ.ÕÕ.Õ;..v..v..v..v.. 0000C0
03750022 3DFDE5E9 03750020 3D001BE9 0027E900 0000C9A 0676FF08 76FF0A76 v..v..v......Õ'.Õ..= .u.Õ|»=".u. 0000E0
A8C8000E CAC95F5E 1F0000E9 0000BA00 0088FFC5 E9F060E9 0375003B 3DFDA2E9 ÕÅ»=;.u.Õ'»Õé.¡..¤..Õ...^_èò..à´ 000100
FA9A0676 FF0876FF 006A1076 FF1276FF 0206E90E 4688D88E 0DE1B81E 56570000 ..WV.¡Ä..Ä.F.Õø..v..v.j..v̄..v..ª 000120
006A016A 006A0125 6801F768 1076FF12 76FF0000 0E059A10 76FF1276 FF000000 ....v..v.......v..v.h%.h%.j.j.j. 000140
00001294 9A006A00 6A4B6A00 6A014368 01F66810 76FF1276 FF000010 FC9A006A j..▪....v..v.h-.hC.j.jKj.j...... 000160
6A00000E 3D9A5016 AE468D50 6A09026B 020036FF 2619BA06 8E006A00 6A029EE9 Õ..j.j...¤.&.6..h..jP.FÜ.P.=...j 000180
46880263 E900000E 599A206A 006A006A 006A5016 AE468D10 76FF1276 FF016A00 .j..v..v..FÜ.Pj.j.j.j .Y...Õc..F 0001A0
681076FF 1276FFFF 5C9689FF 5A868900 000E6F9A 006A1076 FF1276FF 020CE90A .Õ...v..v.j..o.....Z...\..v..v.h 0001C0
000E9F9A 01F66810 76FF1276 FF016A00 6A00000E 8D9A5016 FF62868D 4B6A01F6 -.jK..b..P.....j.j..v..v.h-..... 0001E0
```

Dump of file SATURN:[PCCOMMON.DUMP.DLL]SAM.TMP;1 on 18-APR-1990 10:52:28.45
File ID (911,26,0)   End of file block 69 / Allocated 72

Virtual block number 18 (00000012), 512 (0200) bytes

```
FF588689 0000FFFF 9A004468 1E37FF26 0277FF26 FF5A9EC4 00000EA6 9A505200 .RP.Ï...ó.Z.&.w.&.7.hD........X. 000000
FF261A77 FF26FF5A 9EC45016 FF628680 01FAE999 FF58868B 0008E903 7500003D ▪..u.Õ....X..Õ'...b..Pó.Z.&.w.&. 000020
FF26FF5A 9EC40877 FF260A77 FF26FF5A 9EC41477 FF261677 FF26FF5A 9EC41877 w.ó.Z.&.w.&.w.ó.Z.&.w.&.w.ó.Z.&. 000040
03750000 3DFF5886 891CC483 00000FEC 9A006A59 6A5016FF 5E868D37 FF260277 w.&.7..^..PjYj..š....ó...X.=..u. 000060
26FF5A9E C40AC483 0EE5109B 9A1076FF 1276FFFF 5886FF50 16FF6286 8D0028E9 Õ+...b..P.ÑX..v..v....Ï..ó.ó.Z.& 000080
006A006A 006A0477 FF260677 FF26FF5A 9EC40109 E90000FF FF9A37FF 260277FF .w.&.7.....Õ..ó.Z.&.w.&.w.j.j.j. 0000A0
49E999FF 58868B00 08E90375 00003DFF 58868900 00FFFF9A FF5EB6FF FF60B6FF .Ñ`..Ñ^........X.=..u.Õ....X..Õ| 0000C0
FF000010 47C726FF 5A9EC400 000C47C7 26FF5A9E C400000E 47C726FF 5A9EC401 .ó.Z.&úG...ó.Z.&úG...ó.Z.&úG.... 0000E0
0000E903 7400013D 00000E1E 9A006A00 6A006A00 6A012468 01F86810 76FF1276 v..v.h%.h$.j.j.j.j......=..t.Õ.. 000100
6A006A00 6A006A01 246801F9 681076FF 1276FF00 59E90001 0E47C726 FF5A9EC4 ó.Z.&úG...ÕY..v..v.h'.h$.j.j.j.j 000120
76FF1276 FF002BE9 00011047 C726FF5A 9EC4000D E9037400 013D0000 12F09A00 ..Þ...=..t.Õ..ó.Z.&úG...Õ+..v..v 000140
FF5A9EC4 000AE903 7400013D 000010E3 9A006A00 6A006A00 6A012468 01F76810 .h%.h$.j.j.j.j..Ð...=..t.Õ..ó.Z. 000160
0C9A37FF 260277FF 26FF5A9E C4000013 439A016A 1076FF12 76FF0001 0C47C726 &úG....v..v.j..C...ó.Z.&.w.&.7.. 000180
1076FF12 76FF0029 E90073E9 99FF5886 880008E9 03750000 3DFF5886 89000010 .....X.=..u.Õ....X..Õs.Õ)..v..v. 0001A0
FFDAE903 7500023D FDECE903 7500013D 0013E900 16E90019 E900000F FC9A026A j..▪...Õ..Õ..Õ..=..u.Õš»=..u.ÕÕ. 0001C0
00001069 9A0676FF 0876FF0A 76FF0C76 FF0E76FF 1076FF12 76FF003B E9FFE7E9 ÕÕ.Õ;..v..v..v..v..v..v..v..i... 0001E0
```

Dump of file SATURN:[PCCOMMON.DUMP.DLL]SAM.TMP;1 on 18-APR-1990 10:52:28.45
File ID (911,26,0)   End of file block 69 / Allocated 72

Virtual block number 19 (00000013), 512 (0200) bytes

```
C5E9FD12 E9037500 3B3DFD60 E9037500 223DFDB0 E9037500 2030001B E90027E9 Õ'.Õ..= .u.Õ¯»=".u.Õm»=;.u.Õ.»Õé 000000
0876FFD8 8E10A6B8 1E565700 0064C800 0ECAC95F 5E1F0000 E900008A 000088FF .¦..¤..Õ...^_èò..àd..WV.¡Ï..Ä.v. 000020
C48313FE 008C9A0A 76FF0C76 FF0038E9 03750000 3D04C483 13DC008C 9A0676FF .v....É..ó.=¯..u.Õ8..v..v....±..ó 000040
141A008C 9A0676FF 0876FF00 1CE90374 2A3F8026 065EC400 22E90375 00003D04 .=..u.Õ".ó^.&.?*t.Õ...v..v...... 000060
3D04C483 143C008C 9A0676FF 0876FF02 C1E90000 B80006E9 03740001 3D04C483 .ó.▪..t.Õ..¡..Õë..v..v....<..ó.= 000080
C4831461 008C9A0A 76FF0C76 FF0025E9 03743F3F 8026065E C40031E9 03740001 ..t.Õ1.ó^.&.??t.Õ%..v..v....▪..ó 0000A0
8C9A0A76 FF0C76FF 027AE998 1DB80006 E90283E9 00008800 09E90374 00013004 .=..t.Õ..¡..Õ..Õ..¡..Õz..v..v... 0000C0
0006E903 7700483D C60304C4 83149100 8C9AF08B 0676FF08 76FF04C4 83147100 .q..ó..v..v..Þ......ó..ó=K.w.Õ.. 0000E0
76FF2A6A 9E56899C 468906C4 8314A701 4E9A0676 FF0876FF 2A6A024C E99B23B8 ¡#.ÕL.j*.v..v..N.Ï..ó..F..V.j*.v 000100
83140301 4E9A0676 FF0876FF 3F6AFE56 89FC4689 06C48314 BD017C9A 0676FF08 ..v..|.§..ó..F▪.V±j?.v..v..N.Æ.. 000120
4688A256 89A04689 06C48315 10017C9A 0676FF08 76FF3F6A A85689A6 468906C4 ó..FÏ.V´j?.v..v..|....ó..F..VÅ.F 000140
A8460BA6 46880108 E9981EB8 0006E903 759E4608 9C468800 11E90375 A8460BA6 Ï.F´u.Õ...F..F.u.Õ..¡..ÕÄ..FÏ.F´ 000160
0876FF2A 6AFE5689 FC468906 C483152A 017C9A06 76FF0876 FF2A6A00 D4E90374 t.Õâ.j*.v..v..|.*..ó..F▪.V±j*.v. 000180
0375D73B 0007E903 74C63B9E 56899C46 8906C483 1563014E 9AFA88F0 880676FF .v..Þ.ª.N.c..ó..F..V.;ót.Õ..;▪u. 0001A0
9C76FF9E 76FF0178 E99B2188 0006E903 749E4608 9C468801 89E9981F B80006E9 Õ..¡..Õ...F..F.t.Õ..¡|.Õx..v..v. 0001C0
A476FFA4 4689C62B 04C48315 8E008C9A F0880676 FF0876FF 04C48315 73008C9A ...s..ó..v..v..Þ......ó.+6.FÊ.vÊ 0001E0
```

```
Dump of file SATURN:[PCCOMMON.DUMP.DLL]SAM.TMP;1 on 18-APR-1990 10:52:28.45
File ID (911,26,0)   End of file block 69 / Allocated 72

Virtual block number 20 (00000014), 512 (0200) bytes

 0A76FF0C 76FF00AE 42C6A476 8B0AC483 15A800A4 9A5016AE 468D0676 FF0876FF .v..v..FÛ.P.Ê.´..ó..vÊóBÛ..v..v. 000000
 15D10010 9A5016AE 468D5052 409E5658 9C468808 C48315BE 00109A50 16AE468D .FÛ.P.../..ó..F..V.@RP.FÛ.P...Ì. 000020
 46880000 FA46C700 F3E908C4 83FFFF00 569A0A76 FF0C76FF 5016AE46 8D08C483 .ó..FÛ.P.v..v..V....ó.Õµ.ÚF'...F 000040
 88FFEBE9 FA46FFAA 46FF0009 E903743F 3F8026AA 5EC4AC56 89AA4689 A85688A6 Ì.V´.F¯.V¯ó^¯&.??t.Õ...F´.F'ÕŠ.. 000060
 74AA4638 40A25688 A0468800 1DE90375 A8563900 08E90374 A64639A2 5688A046 F..VÅ9FÌt.Õ..9V´u.Õ...F..VÅ∂;F¯t 000080
 04C48316 57008C9A 0A76FF0C 76FF00A0 E99820B8 0006E903 75AC5638 0008E903 .Õ..;V¯u.Õ..¡ .Õ...v..v....W..ó. 0000A0
 FF0876FF 04C48316 67008C9A A676FFA8 76FF0084 E99822B8 0006E903 75FA4638 ;F'u.Õ..¡".Õ...v´.vÌ...g..ó..v.. 0000C0
 9A5016AE 468D0676 FF0876FF A476FFA4 4689C62B 04C48316 82008C9A F08B0676 v..Þ......ó.+ó.FÊ.vÊ.v..v..FÛ.P. 0000E0
 C48316B4 00109A50 16AE468D 0A76FF0C 76FF00AE 42C6A476 8B0AC483 169C00A4 Ê....ó..vÊóBÛ..v..v..FÛ.P...Ç..ó 000100
 76FF5016 AE468D08 C48316C7 00109A50 16AE468D 5052A856 8BA64603 FA468B08 ..F'.FÌ.V´RP.FÛ.P...ú..ó..FÛ.P.v 000120
 B9B81E56 57000004 C8CBC95F 5E1F0000 E90000B8 08C48313 C600569A 0A76FF0C ..v..V.ó..ó.¡..Õ..._èùà...WV.¡¿ 000140
 666A0033 E90023E9 FC468800 C0E9FE46 8BFC4689 0E4688FE 46890C46 8BD88E13 ..Ä.F..F±.F..F=.F±Õå¯.F=Õ#.Õ3.jf 000160
 013D0013 E90016E9 0019E90C C483174F 17DB9A06 76FF0876 FFFE76FF 686A656A jejh.v±.v..v..Û.O..ó.Õ..Õ..Õ..=. 000180
 00C96800 CA680036 E90026E9 FC468BFF E7E9FFCD E9037500 053DFFD8 E9037500 .u.ÕÄ.=..u.Õë.ÕÕ..F=Õ&.Õ6.hò.hè. 0001A0
 00013D00 13E90016 E90019E9 0CC48317 8E17DB9A 0676FF08 76FFFE76 FF00CC68 hä..v±.v..v..Û....ó.Õ..Õ..Õ..=.. 0001C0
 68012D68 012E6800 36E90026 E9FC468B FFE7E9FF CAE90375 00053DFF D5E90375 u.Õ(.=..u.Õò.ÕÕ..F=Õ&.Õ6.h..h-.h 0001E0

Dump of file SATURN:[PCCOMMON.DUMP.DLL]SAM.TMP;1 on 18-APR-1990 10:52:28.45
File ID (911,26,0)   End of file block 69 / Allocated 72

Virtual block number 21 (00000015), 512 (0200) bytes

 7500013D 0013E900 16E90019 E90CC483 0EC117D8 9A0676FF 0876FFFE 76FF0130 0..v±.v..v..Û.ê..ó.Õ..Õ..Õ..=..u 000000
 00CE3DFF 38E90375 006A3000 1BE9001E E9FFE7E9 FFCAE903 7500053D FFD5E903 .Õ(.=..u.Õò.ÕÕ.Õ..Õ..=j.u.Õ8.=ö. 000020
 5700004E C8CBC95F 5E1F0000 E90000B8 FFDFE9FF A3E90375 01323DFF 6CE90375 u.ÕL.=2.u.ÕE.ÕÕ.¡..Õ..._èùàN..W 000040
 0000182B 9A006A00 6A006A00 6A016568 0A76FF06 76FF0876 FFD88E16 DFB81E56 V.¡Õ..Ä.v..v..v.he.j.j.j¯j..+... 000060
 00000DD2 2BB24688 0168680A 76FF0676 FF0876FF 0064E903 75FFB27E 83B24689 .Fÿ.-ÿ.u.Õd..v..v..v.hh..Fÿ+@... 000080
 FFFF9A50 16B4468D 0C76FF06 76FF0876 FF000012 C29A5016 B4468D50 5248CA83 .ÕKRP.FÇ.P.ò....v..v..v..FÇ.P... 0000A0
 FF0676FF 0876FF00 00186C9A 006A5052 00001863 9A0E76FF 0676FF08 76FF0000 ...v..v..v..c...RPj..l....v..v.. 0000C0
 57000056 C8CBC95F 5E1F0000 E90000B8 000008BF 9A006A50 52000011 7D9A1076 v..}...RPj..€...¡..Õ..._èùàV..W 0000E0
 0C76FF0E 76FFB256 89B04689 0000114D 9A006A06 76FF0876 FFD88E17 E3B81E56 V.¡D..Ä.v..v.j..M....F¯.Vÿ.v..v. 000100
 5016B446 8D022FE9 AC468B00 06E90375 000030AC 46890000 FFFF9A50 16B44680 .FÇ.P......F¯=..u.Õ...F¯Õ/..FÇ.P 000120
 163B0056 9A0C76FF 0E76FF50 16B4468D 0013E903 75000030 04C48318 DE008C9A ...B..ó.=..u.Õ...FÇ.P.v..v..V.;. 000140
 06E90375 00003DAC 46890000 11989A00 57681E37 FF260277 FF26805E C408C483 .ó.ó^¯&.w.&.7.hW.......F¯=..u.Õ. 000160
 76FF0E76 FF006A00 6A0068AE 46C7006A AA46C701 0FE90A46 8801E3E9 AC468B00 ..F¯ÕD..F.Õ..úF¯j.úFÛh.j.j..v..v 000180
 006A566A 1076FF12 76FF37FF 260277FF 26805EC4 0877FF26 0A77FF26 B05EC40C .ó^¯&.w.&.w.ó^¯&.w.&.7.v..v.jVj. 0001A0
 0C76FF0E 76FF016A 00CCAE46 C700CEAA 46C700F1 E9AC4689 18C48300 0019809A ......ó..F¯Õþ.úF´ö.úFÛë.j..v..v. 0001C0
 9A006A57 6A1076FF 1276FF37 FF260277 FF26805E C40877FF 260A77FF 26805EC4 ó^¯&.w.&.w.ó^¯&.w.&.7.v..v.jWj.. 0001E0

Dump of file SATURN:[PCCOMMON.DUMP.DLL]SAM.TMP;1 on 18-APR-1990 10:52:28.45
File ID (911,26,0)   End of file block 69 / Allocated 72

Virtual block number 22 (00000016), 512 (0200) bytes

 B05EC40C 76FF0E76 FF0130AE 46C70132 AA46C700 82E9AC46 8916C483 000019BD §....ó..F¯Õÿ.úF¯2.úFÛ0..v..v.ó^¯ 000000
 001A069A 006A586A 1076FF12 76FF37FF 260277FF 26805EC4 0877FF26 0A77FF26 &.w.&.w.ó^¯&.w.&.7.v..v.jXj..... 000020
 FF26805E C41877FF 261A77FF 26805EC4 0C76FF0E 76FF0075 E9AC4689 14C48300 ..ó..F¯Õu..v..v.ó^¯&.w.&.w.ó^¯&. 000040
 76FF1276 FF37FF26 0277FF26 B05EC408 77FF260A 77FF2680 5EC41477 FF261677 w.&.w.ó^¯&.w.&.w.ó^¯&.w.&.7.v..v 000060
 75001E3D 0023E900 D1E90000 B8002CE9 AC46891C C4830000 11F09A00 6A596A10 .jYj..Þ....ó..F¯Õ..¡..Õ1.Ѡ.=..u 000080
 83FFD4E9 FF12E903 7500223D FF59E903 7500213D FF9EE903 75001F3D FEE9E903 .ÕÕ±=..u.Õ..=!.u.ÕY.=".u.Õ..`}.. 0000A0
 B05EC400 8DE9AC46 88000012 279A37FF 260277FF 26805EC4 0015E903 7500AC7E ~¯.u.Õ..ó^¯&.w.&.7.'....F¯Õ..ó^¯ 0000C0
 AC468900 0012499A 37FF2602 77FF2610 5EC4006A 006A006A 0477FF26 0677FF26 &.w.&.w.j.j.j.ó^.&.w.&.7.I....F¯ 0000E0
 AA76FF06 76FF0876 FF002DE9 03751F0A 7E83005C E9AC4688 0006E903 7500003D =..u.Õ...F¯Õ\..~..u.Õ-..v..v..v´ 000100
 9A006A68 1EAE76FF 0676FF08 76FF0000 17FC9A0C 76FF0E76 FF006A00 6A016168 ha.j.j..v..v..•....v..v..vÛ.hj.. 000120
 46880006 E9037500 003DAC46 89000013 1F9A37FF 260277FF 26805EC4 0000183E >...ó^¯&.w.&.7......F¯=..u.Õ...F 000140
 00009E46 C7D88E18 83B81E56 57000064 C8CBC95F 5E1F0000 E90000B8 0006E9AC ¯Õ..¡..Õ..._èùàd..WV.¡...ÄúF... 000160
 0000A846 C7AE4689 B0468900 00B8A046 89A24689 0000B8AA 4689AC46 890000B8 ¡...F¯.F¯¡...FÅ.F.¡...F¯.FÛúF´.. 000180
 A69A5016 B2468D12 76FF1476 FFAC5689 AA468900 0018909A 006A0676 FF0876FF .v..v.j.......F´.V¯.v..v..Fÿ.P.Ì 0001A0
 C4831B77 008C9A50 16B2468D 022CE99E 46880006 E9037500 003D9E46 89000018 ....F.=..u.Õ...F.Õ,..Fÿ.P...w..ó 0001C0
 E90C468B 08C48318 C300569A 1276FF14 76FF5016 B2468D00 13E90375 00003D04 .=..u.Õ...Fý.P.v..v..V.û..ó..F.Õ 0001E0
```

```
Dump of file SATURN:[PCCOMMON.DUMP.DLL]SAM.TMP;1 on 18-APR-1990 10:52:28.45
File ID (911,26,0)   End of file block 69 / Allocated 72

Virtual block number 23 (00000017), 512 (0200) bytes

 46C70001 FE46C700 52E90068 A446C700 6A9C46C7 0006A646 C70001FE 46C7004E N.úF±..úF|..úF.j.úFÊh.ÕR.úF±..úF 000000
 C701329C 46C70004 A646C700 01FE46C7 0038E900 CCA446C7 00CE9C46 C70003A6 |..úF.ö.úFÊë.Õ;.úF±..úF|..úF.2.ú 000020
 FFD0E903 75002130 FFAAE903 75001E30 0018E901 B3E90000 B80024E9 0130A446 FÊ0.Õ$.|..Õ°.Õ..=..u.Õ`.=1.u.ÕÅ. 000040
 0877FF26 0A77FF26 AA5EC437 FF260277 FF26AA5E C4FFDCE9 FFB1E903 75002230 =".u.ÕÝ.ÕÉ.á^`&.w.&.7á^`&.w.&.w. 000060
 46C70162 E99E468B 0006E903 7500003D 9E468900 00FFFF9A 5016AE46 8DA676FF .v|.FÛ.P......F.=..u.Õ...F.Õb.úF 000080
 5EC4006C E9037502 400B2600 8826AE76 C402E3C1 A85E88A8 46FF0003 E90000A8 `..Õ...F`.^´èD.ávÛ&..&.∂.u.Õl.á^ 0000A0
 5016B246 8DFE76FF 30FF2602 70FF26AE 76C402E3 C1A85E88 37FF2602 77FF26AA `&.w.&.7.^´èD.ávÛ&.p.&.0.v±.Fý.P 0000C0
 16B24680 0E76FF10 76FF010A E99E4688 0006E903 7500003D 9E468900 00FFFF9A ......F.=..u.Õ...F.Õ...v..v..Fý. 0000E0
 46890250 8B260088 26AE76C4 02E3C1A8 5E8B0019 E9037400 00300000 FFFF9A50 P.....=..t.Õ...^´èD.ávÛ&..&.P..F 000100
 8B0000FF FF9AAE76 FFB076FF 37FF2602 77FF26AA 5EC4FF7C E90003E9 A25689A0 ..VÅÕ..Õ|.á^`&.w.&.7.v¯.vÛ...... 000120
 9E468900 0018F29A 006C681E 37FF2602 77FF26AA 5EC400B0 E90375A2 460BA046 F..FÅu.Õ`.á^`&.w.&.7.hl..·....F. 000140
 76FFA076 FFA276FF 37FF2602 77FF26AA 5EC40092 E99E4688 0006E903 7500003D =..u.Õ...F.Õ..á^`&.w.&.7.vÅ.v..v 000160
 FF260277 FF26AA5E C40015E9 03750000 3D9E4689 0000FFFF 9A1276FF 1476FFFE ±.v..v.......F.=..u.Õ..á^`&.w.&. 000180
 003D9E46 8900001A CF9A37FF 260277FF 26AA5EC4 0054E99E 468B0000 1A539A37 7.S....F.ÕT.á^`&.w.&.7.ü....F.=. 0001A0
 1476FF0A 76FF006A 0166689C 76FF0676 FF0876FF 0034E99E 468B0006 E9037500 .u.Õ...F.Õ4..v..v..v.hf.j..v..v. 0001C0
 0000E900 00B80000 1AC09A00 7F681EA4 76FF0676 FF0876FF 00001AAE 9A1276FF .v..Û....v..v..vÊ.h...â...|..Õ.. 0001E0

Dump of file SATURN:[PCCOMMON.DUMP.DLL]SAM.TMP;1 on 18-APR-1990 10:52:28.45
File ID (911,26,0)   End of file block 69 / Allocated 72

Virtual block number 24 (00000018), 512 (0200) bytes

 00D00006 0F460203 014C0007 1A790203 00D10006 1CB80203 001D90CB C95F5E1F .^_èù.....£...ï...y...L...F...ï. 000000
 00000006 12160002 007F0003 1D640103 007E0003 130F0103 00000005 17100002 ..............~...d............. 000020
 006F0006 1CD90203 00870003 116B0103 00860003 1D760103 01CA000A 10CA0203 ..ò...ò...v.......k.......l...o. 000040
 00880003 11370103 00080003 18550103 01610008 19410203 00000008 185C0002 ..\.......A...a...U.......7..... 000060
 00900003 11180103 007B0006 1D370203 00130003 184C0103 0000000A 1AF70002 ..¥.......L.......7...(......... 000080
 00830003 137C0103 00920006 1C610203 001F0003 18290103 001E0003 10BF0103 ..¢.......)........a.......|...°. 0000A0
 00AC0006 1C090203 018C0009 1C820203 01220006 1D220203 00A00006 1D080203 ..........."..."..............¯. 0000C0
 890E468D D88EFFFF 881E5657 00033CC8 019E0009 183F0203 004D0003 11840103 ......M...?.....à<..WV.|...Ä.F.. 0000E0
 FC77FF26 FE77FF26 FC5EC404 FC468300 20FCC486 C70FE2E9 06468BFE 568CFC46 F=.V±.F.Õã.ú.á= ..F=.á^=&.w±&.w= 000100
 68020036 FF26198C 068E006A 006A0CC4 83FFFF00 CE9A5016 FD14668D 0082681E .h.....».P.ö....á.j.j...¥.&.6..h 000120
 FE64868D 5016FD62 86805016 FD148680 000000BE 9A5016FD 62868001 00680100 ..h....b».P./......».P..b».P..d± 000140
 FF26FE77 FF26FC5E C404FC46 830020FC C486C70F F3E90CC4 83009F00 CE9A5016 .P.ö....á.Õµ.ú.á= ..F=.á^=&.w±&. 000160
 0036FF26 19BC068E 006A006A 0CC48300 D700CE9A 5016FD14 86800087 681EFC77 w=.h.....».P.ö.=..á.j.j...¥.&.6. 000180
 86805016 FD62868D 5016FD14 86800000 01209A50 16FD6286 80010068 01016802 .h..h....b».P. ......».P..b».P.. 0001A0
 FE77FF26 FC5EC404 FC468300 20FCC486 C70F91E9 0CC48301 0100CE9A 5016FE64 d±.P.ö....á.Õ..ú.á= ..F=.á^=&.w± 0001C0
 FF26198C 068E006A 006A0CC4 83013900 CE9A5016 FD14868D 008C681E FC77FF26 &.w=.h.....».P.ö.9..á.j.j...¥.&. 0001E0

Dump of file SATURN:[PCCOMMON.DUMP.DLL]SAM.TMP;1 on 18-APR-1990 10:52:28.45
File ID (911,26,0)   End of file block 69 / Allocated 72

Virtual block number 25 (00000019), 512 (0200) bytes

 5016FD62 86805016 FD14868D 00000161 9A5016FD 62868001 00680102 68020036 6..h..h....b».P.a......».P..b».P 000000
 26198C06 8E006A00 6A0020FC C486C70F 2FE90CC4 83017400 CE9A5016 FE64868D ..d±.P.ö.t..á.Õ/.ú.á= .j.j...¥.& 000020
 16FE6486 8D5016FD 62868000 00019C9A 5016FD62 86800100 68010368 020036FF .6..h..h....b».P.......b».P..d±. 000040
 68020036 FF26198C 068E006A 006A0020 FCC486C7 0EF4E908 C48301AF 00569A50 P.V.£..á.Õ¶.ú.á= .j.j...¥.&.6..h 000060
 EA00569A 5016FE64 86805016 FD628680 000001D7 9A5016FD 62868001 00680104 ..h....b».P.=.....b».P..d±.P.V.õ 000080
 01006801 05680200 36FF2619 BC068E00 6A006A00 20FCC486 C70EB9E9 08C48301 ..á.Õ¿.ú.á= .j.j...¥.&.6..h..h.. 0000A0
 E908C483 02250056 9A5016FE 64868050 16FD6286 80000002 129A5016 FD62868D ..b».P.......b».P..d±.P.V.%..á.Õ 0000C0
 16FD6286 80010068 01076802 0036FF26 19BC068E 006A006A 0020FCC4 86C70E7E ~.ú.á= .j.j...¥.&.6..h..h....b». 0000E0
 C486C70E 43E908C4 83026000 569A5016 FE648680 5016FD62 86800000 02409A50 P.M.....b».P..d±.P.V.`..á.ÕC.ú.á 000100
 0002889A 5016FD62 86800100 68010668 020036FF 26198C06 8E006A00 6A0020FC = .j.j...¥.&.6..h..h....b».P.... 000120
 006A0020 FCC486C7 0E08E908 C483029B 00569A50 16FE6486 8D5016FD 62868D00 ...b».P..d±.P.V....á.Õ..ú.á= .j. 000140
 FD62868D 000002C3 9A5016FD 62868001 0068010A 68020036 FF26198C 068E006A j...¥.&.6..h..h....b».P.û.....b» 000160
 BC068E00 6A006A00 20FCC486 C70DCDE9 08C48302 D600569A 5016FE64 86805016 .P..d±.P.V.=..á.Õë.ú.á= .j.j...¥ 000180
 64868050 16FD6286 80000002 FE9A5016 FD62868D 01006801 08680200 36FF2619 .&.6..h..h....b».P.±.....b».P..d 0001A0
 0036FF26 198C068E 006A006A 0020FCC4 86C70092 E908C483 03110056 9A5016FE ±.P.V....á.Õ..ú.á= .j.j...¥.&.6. 0001C0
 569A5016 FE64868D 5016FD62 86800000 FFFF9A50 16FD6286 80010068 01096802 .h..h....b».P.......b».P..d±.P.V 0001E0
```

```
Dump of file SATURN:[PCCOMMON.DUMP.DLL]SAM.TMP;1 on 18-APR-1990 10:52:28.45
File ID (911,26,0)   End of file block 69 / Allocated 72

Virtual block number 26 (0000001A), 512 (0200) bytes

68010868 020036FF 26198C06 8E006A00 6A0020FC C486C700 57E908C4 83003D00 .=..á.ÕW.ú.á= .j.j...¥.&.6..h..h 000000
C4830387 00569A50 16FE6486 8D5016FD 62868D00 0003749A 5016FD62 868D0100 ....b».P.t.....b».P..d±.P.V....á 000020
62868D01 00680202 68020036 FF26198C 068E006A 006A0020 FCC486C7 0D1CE908 .Õ..ú.á= .j.j...¥.&.6..h..h....b 000040
C70CE1E9 08C48303 8100569A 5016FE64 868D5016 FD62868D 000003F1 9A5016F0 ».P.þ.....b».P..d±.P.V.Ý..á.ÕÅ.ú 000060
CE9A5016 FD14868D 0091681E FC77FF26 FE77FF26 FC5EC404 FC468300 20FCC486 .á= ..F=.á^=&.w±&.w=.h.....».P.ö 000080
9A5016FC C6868D00 96681EFC 77FF26FE 77FF26FC 5EC404FC 46830CC4 83030200 .@..á..F=.á^=&.w±&.w=.h.. .ó=.P. 0000A0
5016FD62 868D0100 68020168 020036FF 26198C06 8E006A00 6A0CC483 041000CE ö....á.j.j...¥.&.6..h..h. ..b».P 0000C0
00CE9A50 16FE6486 8D5016FD 62868050 16FD1486 8D5016FC C6868D00 00047A9A .z.....ó=.P...».P..b».P..d· º.ö. 0000E0
98681EFC 77FF26FE 77FF26FC 5EC404FC 46830020 FCC486C7 0C58E910 C483043A :..á.ÕX.ú.á= ..F=.á^=&.w±&.w=.h. 000100
681EFC77 FF26FE77 FF26FC5E C404FC46 830CC483 045800CE 9A5016FD 14868D00 ....».P.ö.[..á..F=.á^=&.w±&.w=.h 000120
02036802 0036FF26 198C068E 006A006A 0CC48304 9900CE9A 5016FCC6 868D00A0 ....ó=.P.ö....á.j.j...¥.&.6..h.. 000140
5016FD62 868D5016 FD14868D 5016FCC6 868D0000 05039A50 16FD6286 8D010068 h....b».P.......ó=.P...».P..b».P 000160
FF26FC5E C404FC46 830020FC C486C708 CFE910C4 8304C300 CE9A5016 FE64868D ..d±.P.ö.û..á.ÕÜ.ú.á= ..F=.á^=&. 000180
26FC5EC4 04FC4683 0CC48304 E400CE9A 5016FD14 868D00A5 681EFC77 FF26FE77 w±&.w=.hÊ....».P.ö.Õ..á..F=.á^=& 0001A0
BC068E00 6A006A0C C4830522 00CE9A50 16FCC686 8D00AA68 1EFC77FF 26FE77FF .w±&.w=.h¯...ó=.P.ö."..á.j.j...¥ 0001C0
14868D50 16FCC686 8D000005 8C9A5016 FD62868D 01006802 04680200 36FF2619 .&.6..h..h....b».P.......ó=.P... 0001E0

Dump of file SATURN:[PCCOMMON.DUMP.DLL]SAM.TMP;1 on 18-APR-1990 10:52:28.45
File ID (911,26,0)   End of file block 69 / Allocated 72

Virtual block number 27 (0000001B), 512 (0200) bytes

0020FCC4 86C70846 E910C483 054C00CE 9A5016FE 64868D50 16FD6286 8D5016FD ».P..b».P..d±.P.ö.L..á.ÕF.ú.á= . 000000
C483056D 00CE9A50 16FD1486 8D00AF68 1EFC77FF 26FE77FF 26FC5EC4 04FC4683 .F=.á^=&.w±&.w=.hÉ....».P.ö.m..á 000020
8305AB00 CE9A5016 FCC6868D 0084681E FC77FF26 FE77FF26 FC5EC404 FC46830C ..F=.á^=&.w±&.w=.hÇ...ó=.P.ö.¨.. 000040
00000615 9A5016FD 62868D01 00680205 68020036 FF26198C 068E006A 006A0CC4 á.j.j...¥.&.6..h..h....b».P..... 000060
10C48305 D500CE9A 5016FE64 868D5016 FD62868D 5016FD14 868D5016 FCC6868D ..ó=.P...».P..b».P..d±.P.ö.f..á. 000080
FD14868D 0089681E FC77FF26 FE77FF26 FC5EC404 FC468300 11FCC486 C70A8DE9 Õ§.ú.á=...F=.á^=&.w±&.w=.h¿....» 0000A0
C6868D00 BE681EFC 77FF26FE 77FF26FC 5EC404FC 46830CC4 8305F600 CE9A5016 .P.ö.-..á..F=.á^=&.w±&.w=.hƒ...ó 0000C0
868D0100 68020668 020036FF 26198C06 8E006A00 6A0CC483 063400CE 9A5016FC =.P.ö.4..á.j.j...¥.&.6..h..h.... 0000E0
16FE6486 8D5016FD 62868D50 16FD1486 8D5016FC C6868D00 00069E9A 5016FD62 b».P.......ó=.P...».P..b».P..d±. 000100
77FF26FE 77FF26FC 5EC404FC 46830011 FCC486C7 0A34E910 C483065E 00CE9A50 P.ö.^..á.Õ4.ú.á=...F=.á^=&.w±&.w 000120
FF26FE77 FF26FC5E C404FC46 830CC483 067F00CE 9A5016FD 14868D00 C3681EFC =.hû....».P.ö....á..F=.á^=&.w±&. 000140
0036FF26 198C068E 006A006A 0CC48306 8D00CE9A 5016FCC6 868D00C8 681EFC77 w=.hà...ó=.P.ö.§..á.j.j...¥.&.6. 000160
868D5016 FD14868D 5016FCC6 868D0000 005C9A50 16FD6286 8D010068 02066802 .h..h....b».P.\.....ó=.P...».P.. 000180
C404FC46 830011FC C486C709 ABE910C4 83007500 CE9A5016 FE64868D 5016FD62 b».P..d±.P.ö.u..á.Õ¨.ú.á=...F=.á 0001A0
006A006A 0CC48307 1F00CE9A 5016FD14 868D00CD 681EFC77 FF26FE77 FF26FC5E ^=&.w±&.w=.hë....».P.ö....á.j.j. 0001C0
5016FD14 868D0000 07689A50 16FD6286 8D010068 02086802 0036FF26 198C068E ..¥.&.6..h..h....b».P.h......».P 0001E0

Dump of file SATURN:[PCCOMMON.DUMP.DLL]SAM.TMP;1 on 18-APR-1990 10:52:28.45
File ID (911,26,0)   End of file block 69 / Allocated 72

Virtual block number 28 (0000001C), 512 (0200) bytes

FC468300 11FCC486 C70949E9 0CC48307 4900CE9A 5016FE64 868D5016 FD62868D ..b».P..d±.P.ö.I..á.ÕI.ú.á=...F= 000000
006A0CC4 83078100 CE9A5016 FD14868D 00D2681E FC77FF26 FE77FF26 FC5EC404 .á^=&.w±&.w=.hØ....».P.ö....á.j. 000020
FD14868D 00000339 9A5016FD 62868D01 00680209 68020036 FF26198C 068E006A j...¥.&.6..h..h....b».P.9......» 000040
830011FC C486C708 E7E90CC4 83034C00 CE9A5016 FE64868D 5016FD62 868D5016 .P..b».P..d±.P.ö.L..á.ÕÕ.ú.á=... 000060
0CC48307 E300CE9A 5016FD14 868D00D7 681EFC77 FF26FE77 FF26FC5E C404FC46 F=.á^=&.w±&.w=.h=....».P.ö.D..á. 000080
868D0000 082C9A50 16FD6286 8D010068 020A6802 0036FF26 198C068E 006A006A j.j...¥.&.6..h..h....b».P.,..... 0000A0
11FCC486 C70885E9 0CC48308 0000CE9A 5016FE64 868D5016 FD62868D 5016FD14 .».P..b».P..d±.P.ö....á.Õ..ú.á=. 0000C0
83084500 CE9A5016 FD14868D 00DC681E FC77FF26 FE77FF26 FC5EC404 FC468300 ..F=.á^=&.w±&.w=.hÉ....».P.ö.E.. 0000E0
0000088E 9A5016FD 62868D01 00680208 68020036 FF26198C 068E006A 006A0CC4 á.j.j...¥.&.6..h..h....b».P..... 000100
C486C708 23E90CC4 83086F00 CE9A5016 FE64868D 5016FD62 868D5016 FD14868D ...».P..b».P..d±.P.ö.o..á.Õ#.ú.á 000120
A700CE9A 5016FD14 868D00E1 681EFC77 FF26FE77 FF26FC5E C404FC46 830011FC =...F=.á^=&.w±&.w=.hÃ....».P.ö.Ī 000140
08F09A50 16FD6286 8D010068 020C6802 0036FF26 198C068E 006A006A 0CC48308 ..á.j.j...¥.&.6..h..h....b».P.þ. 000160
C707C1E9 0CC48308 D100CE9A 5016FE64 868D5016 FD62868D 5016FD14 868D0000 .....».P..b».P..d±.P.ö.Ì..á.Õë.ú 000180
CE9A5016 FD14868D 00E6681E FC77FF26 FE77FF26 FC5EC404 FC468300 11FCC486 .á=...F=.á^=&.w±&.w=.hÌ....».P.ö 0001A0
9A5016FD 62868D01 00680200 68020036 FF26198C 068E006A 006A0CC4 83090900 ....á.j.j...¥.&.6..h..h....b».P. 0001C0
5FE90CC4 83093300 CE9A5016 FE64868D 5016FD62 868D5016 FD14868D 00000952 R......».P..b».P..d±.P.ö.3..á.Õ_ 0001E0
```

```
Dump of file SATURN:[PCCOMMON.DUMP.DLL]SAM.TMP;1 on 18-APR-1990 10:52:28.45
File ID (911,26,0)   End of file block 69 / Allocated 72

Virtual block number 29 (0000001D), 512 (0200) bytes

 5016FD14 868000E8 681EFC77 FF26FE77 FF26FC5E C404FC46 830011FC C486C707 .ú.á=...F=.á^=&.w±&.w=.h§....».P 000000
 16FD6286 80010068 02116802 0036FF26 19BC068E 006A006A 0CC48309 6800CE9A .ö.k..á.j.j...¥.&.6..h..h....b». 000020
 0CC48309 9500CE9A 5016FE64 868D5016 FD62868D 5016FD14 868D0000 09849A50 P.Ç......».P..b».P..d±.P.ö....á. 000040
 FD14868D 00F0681E FC77FF26 FE77FF26 FC5EC404 FC468300 11FCC486 C706FDE9 Õ».ú.á=...F=.á^=&.w±&.w=.hÞ....» 000060
 62868D01 00680212 68020036 FF26198C 068E006A 006A0CC4 8309CD00 CE9A5016 .P.ö.ë..á.j.j...¥.&.6..h..h....b 000080
 8309F700 CE9A5016 FE64868D 5016FD62 868D5016 FD14868D 00000A16 9A5016FD ».P........».P..b».P..d±.P.ö.%.. 0000A0
 868D00F5 681EFC77 FF26FE77 FF26FC5E C404FC46 830011FC C486C706 9BE9DCC4 á.Õ..ú.á=...F=.á^=&.w±&.w=.h%... 0000C0
 80010068 02136802 0036FF26 19BC068E 006A006A 0CC4830A 2F00CE9A 5016FD14 .».P.ö./..á.j.j...¥.&.6..h..h... 0000E0
 5900CE9A 5016FE64 868D5016 FD62868D 5016FD14 868D0000 0A789A50 16FD6286 .b».P.x......».P..b».P..d±.P.ö.Y 000100
 00FA681E FC77FF26 FE77FF26 FC5EC404 FC468300 11FCC486 C70639E9 0CC4830A ..á.Õ9.ú.á=...F=.á^=&.w±&.w=.h°. 000120
 00680212 68020036 FF26198C 068E006A 006A0CC4 830A9100 CE9A5016 FD14868D ...».P.ö....á.j.j...¥.&.6..h..h. 000140
 CE9A5016 FE64868D 5016FD62 868D5016 FD14868D 00000AB9 9A5016FD 62868D01 ...b».P.¿......».P..b».P..d±.P.ö 000160
 68020E68 020036FF 26198C06 8E006A00 6A0020FC C486C705 D7E90CC4 830ACC00 .ä..á.Õ=.ú.á= .j.j...¥.&.6..h..h 000180
 C4830807 00569A50 16FE6486 8D5016FD 62868D00 000AF49A 5016FD62 868D0100 ....b».P.¶.....b».P..d±.P.V....á 0001A0
 62868D01 0068020F 68020036 FF26198C 068E006A 006A0020 FCC486C7 059CE908 .Õ..ú.á= .j.j...¥.&.6..h..h....b 0001C0
 C70561E9 08C48306 E700569A 5016FE64 868D5016 FD62868D 0000082F 9A5016FD ».P./.....b».P..d±.P.V.Ó..á.Õa.ú 0001E0

Dump of file SATURN:[PCCOMMON.DUMP.DLL]SAM.TMP;1 on 18-APR-1990 10:52:28.45
File ID (911,26,0)   End of file block 69 / Allocated 72

Virtual block number 30 (0000001E), 512 (0200) bytes

 069A5016 FD62868D 01006802 10680200 36FF2619 BC068E00 6A006A00 20FCC486 .á= .j.j...¥.&.6..h..h....b».P.. 000000
 0020FCC4 86C70526 E908C483 07AB0056 9A5016FE 64868D50 16FD6286 8D000007 .....b».P..d±.P.V.¨..á.Õ&.ú.á= . 000020
 868D0000 08A59A50 16FD6286 8D010068 09036802 0036FF26 19BC068E 006A006A j.j...¥.&.6..h..h....b».P.E..... 000040
 8E006A00 6A0020FC C486C704 E8E908C4 830BB800 569A5016 FE64868D 5016FD62 b».P..d±.P.V.|..á.ÕŠ.ú.á= .j.j.. 000060
 8D5016FD 62868000 000C229A 5016FD62 868D0100 68030068 020036FF 26198C06 .¥.&.6..h..h....b».P."....b».P. 000080
 77FF26FC 5EC404FC 46830020 FCC486C7 04B0E908 C4830BE2 00569A50 16FE6486 .d±.P.V.ã..á.Õ¯.ú.á= ..F=.á^=&.w 0000A0
 FF26FC5E C404FC46 830CC483 0C0300CE 9A5016FD 14868D00 FF681EFC 77FF26FE ±&.w=.h.....».P.ö....á..F=.á^=&. 0000C0
 19BC068E 006A006A 0CC4830C 4100CE9A 5016FCC6 868D0104 681EFC77 FF26FE77 w±&.w=.h....ó=.P.ö.A..á.j.j...¥. 0000E0
 FD14868D 5016FCC6 868D0000 0CAB9A50 16FD6286 8D010068 03016802 0036FF26 &.6..h..h....b».P.¨.....ó=.P...» 000100
 830020FC C486C704 27E910C4 830C6800 CE9A5016 FE64868D 5016FD62 868D5016 .P..b».P..d±.P.ö.k..á.Õ'.ú.á= .. 000120
 0CC4830C 8C00CE9A 5016FD14 868D0109 681EFC77 FF26FE77 FF26FC5E C404FC46 F=.á^=&.w±&.w=.h.....».P.ö....á. 000140
 C4830CCA 00CE9A50 16FCC686 8D010E68 1EFC77FF 26FE77FF 26FC5EC4 04FC4683 .F=.á^=&.w±&.w=.h....ó=.P.ö.ò..á 000160
 8D00000C F29A5016 FD62868D 01006803 01680200 36FF2619 BC068E00 6A006A0C .j.j...¥.&.6..h..h....b».P.·.... 000180
 E910C483 000500CE 9A5016FE 64868D50 16FD6286 8D5016FD 14868050 16FCC686 .ó=.P...».P..b».P..d±.P.ö....á.Õ 0001A0
 16FD6286 80010068 03036802 0036FF26 19BC068E 006A006A 0020FCC4 86C7039E ..ú.á= .j.j...¥.&.6..h..h....b». 0001C0
 C486C703 63E908C4 83004000 569A5016 FE64868D 5016FD62 868D0000 002D9A50 P.·.....b».P..d±.P.V.∂..á.Õc.ú.á 0001E0

Dump of file SATURN:[PCCOMMON.DUMP.DLL]SAM.TMP;1 on 18-APR-1990 10:52:28.45
File ID (911,26,0)   End of file block 69 / Allocated 72

Virtual block number 31 (0000001F), 512 (0200) bytes

 000D899A 5016FD62 868D0100 68040068 020036FF 26198C06 8E006A00 6A0020FC = .j.j...¥.&.6..h..h....b».P.... 000000
 46830020 FCC486C7 0328E908 C483006A 00569A50 16FE6486 8D5016FD 62868D00 ...b».P..d±.P.V.j..á.Õ(.ú.á= ..F 000020
 6A0CC483 00A200CE 9A5016FD 14868D01 13681EFC 77FF26FE 77FF26FC 5EC404FC =.á^=&.w±&.w=.h.....».P.ö.Å..á.j 000040
 14868D00 000DEB9A 5016FD62 868D0100 68040168 020036FF 26198C06 8E006A00 .j...¥.&.6..h..h....b».P.Š...... 000060
 0020FCC4 86C702C6 E90CC483 00CC00CE 9A5016FE 64868D50 16FD6286 8D5016FD ».P..b».P..d±.P.ö.ä..á.Õ6.ú.á= . 000080
 C4830E04 00CE9A50 16FD1486 8D011868 1EFC77FF 26FE77FF 26FC5EC4 04FC4683 .F=.á^=&.w±&.w=.h.....».P.ö....á 0000A0
 8D00000E 2C9A5016 FD62868D 01006804 02680200 36FF2619 8C068E00 6A006A0C .j.j...¥.&.6..h..h....b».P.,.... 0000C0
 FCC486C7 0264E90C C4830E3F 00CE9A50 16FE6486 8D5016FD 62868D50 16FD1486 ..».P..b».P..d±.P.ö.7..á.Õd.ú.á= 0000E0
 00000E88 9A5016FD 62868D01 00680500 68020036 FF26198C 068E006A 006A0020  .j.j...¥.&.6..h..h....b».P..... 000100
 FC468300 20FCC486 C70229E9 08C4830E 6900569A 5016FE64 868D5016 FD62868D ..b».P..d±.P.V.i..á.Õ).ú.á= ..F= 000120
 006A0CC4 830EA100 CE9A5016 FD14868D 0110681E FC77FF26 FE77FF26 FC5EC404 .á^=&.w±&.w=.h.....».P.ö.À..á.j. 000140
 FD14868D 00000EC9 9A5016FD 62868D01 00680501 68020036 FF26198C 068E006A j...¥.&.6..h..h....b».P.è......» 000160
 6A0020FC C486C701 C7E90CC4 830EDC00 CE9A5016 FE64868D 5016FD62 868D5016 .P..b».P..d±.P.ö.É..á.Õú.ú.á= .j 000180
 62868D00 0007CA9A 5016FD62 868D0100 68050268 020036FF 26198C06 8E006A00 .j...¥.&.6..h..h....b».P.ò.....b 0001A0
 5EC404FC 46830020 FCC486C7 018CE908 C4830B42 00569A50 16FE6486 8D5016FD ».P..d±.P.V.B..á.Õ..ú.á= ..F=.á^ 0001C0
 8E006A00 6A0CC483 0F3E00CE 9A5016FD 14868D01 22681EFC 77FF26FE 77FF26FC =&.w±&.w=.h"....».P.ö.>..á.j.j.. 0001E0
```

Dump of file SATURN:[PCCOMMON.DUMP.DLL]SAM.TMP;1 on 18-APR-1990 10:52:28.45
File ID (911,26,0)   End of file block 69 / Allocated 72

Virtual block number 32 (00000020), 512 (0200) bytes

```
8D5016FD 14868D00 000F669A 5016FD62 868D0100 68050368 020036FF 26198C06 .¥.&.6..h..h....b».P.f......».P. 000000
006A006A 0020FCC4 86C7012A E90CC483 0F7900CE 9A5016FE 64868D50 16FD6286 .b».P..d±.P.ö.y..é.Õ*.ú.é■ .j.j. 000020
5016FD62 868D0000 0FA19A50 16FD6286 8D010068 09006802 0036FF26 198C068E ..¥.&.6..h..h....b».P.À.....b».P 000040
26198C06 8E006A00 6A0020FC C486C700 EFE908C4 830F8400 569A5016 FE64868D ..d±.P.V.Ç..é.Õÿ.ú.é■ .j.j...¥.& 000060
16FE6486 8D5016FD 62868D00 000FDC9A 5016FD62 868D0100 68090168 020036FF .6..h..h....b».P.É.....b».P..d±. 000080
68020036 FF26198C 068E006A 006A0020 FCC486C7 00B4E908 C4830FF2 00569A50 P.V.·..é.ÕÇ.ú.é■ .j.j...¥.&.6..h 0000A0
9A5016FE 64868050 16FD6286 8D0676FF 00000B6A 9A5016FD 62868D01 00680904 ..h....b».P.j....v...b».P..d±.P. 0000C0
1010A7FF 2E93C003 FFB4E903 76002F30 98182D00 73E90076 E90AC483 108800CE ö....é.Õv.Õs.-..=/.v.ÕÇ..ä...Ì.. 0000E0
04180354 038F0F8C 03190268 022D020E 02A301F2 0187017C 0141000F 007D001B ..}.Ô.A.|.ñ.·.É.B.-.h...¥...T... 000100
0C4908C0 0B850B0F 0AD40A99 08AF084D 07EB0789 072706C5 063C0583 052A04A1 À.*.*.<.ë.'...Š.M.£...å.....á.I. 000120
0A370905 09730911 0FBC0B4A 0F810F46 0EE40EA9 0E470E0C 00AA0000 00480CD2 ●.H...`...G.`.Õ.F...J.¥...s.I.7. 000140
0AC4830B 7D00A49A 0A76FF0C 76FF5016 FE64868D 0876FFFC 4689FE46 890000B8 |...F±.F■.v...d±.P.v..v..É.}..é. 000160
FE568CFC 46890C46 8D088E00 08881E56 570001A0 C8CBC95F 5E1F0000 E906468B .F.Õ...^_èùà...WV.|...À.F..F■.V± 000180
0040FE60 86C708C4 8310F100 009A0A76 FF019668 5016FE62 868D010B E90A468B .F.Õ....b±.Ph...v....þ..é.ú.'±ª. 0001A0
009A0A76 FF019668 5016FE62 868DFC77 FF26FE77 FF26FC5E C404FC46 830161E9 Õa..F■.é^■&.w±&.w■..b±.Ph...v... 0001C0
4683FC77 FF26FE77 FF26FC5E C404FC46 830135E9 0040FE60 86C70CC4 83112C00 .,..é.ú.'±ª.Õ5..F■.é^■&.w±&.w■.F 0001E0
```

Dump of file SATURN:[PCCOMMON.DUMP.DLL]SAM.TMP;1 on 18-APR-1990 10:52:28.45
File ID (911,26,0)   End of file block 69 / Allocated 72

Virtual block number 33 (00000021), 512 (0200) bytes

```
C4831158 00009A0A 76FF0196 685016FE 62868DFC 77FF26FE 77FF26FC 5EC404FC ■.é^■&.w±&.w■..b±.Ph...v....X..á 000000
685016FE 62868DFC 77FF26FE 77FF26FC 5EC404FC 468300FA E90040FE 6086C710 .ú.'±ª.Õ'..F■.é^■&.w±&.w■..b±.Ph 000020
77FF26FC 5EC404FC 468300CE E90021FE 6086C70C C4831193 00009A0A 76FF0196 ...v.......á.ú.'±!.Õö..F■.é^■&.w 000040
0A76FF01 96685016 FE62868D FC77FF26 FE77FF26 FC5EC404 FC4683FC 77FF26FE ±&.w■.F■.é^■&.w±&.w■..b±.Ph...v. 000060
00009A0A 76FF0196 685016FE 62868D00 93E90021 FE6086C7 10C48311 B000009A ...¯..á.ú.'±!.Õ....b±.Ph...v.... 000080
2E93C003 FFD5E903 76002F30 98182D00 73E90076 E90040FE 6086C708 C483FFFF ...á.ú.'±ª.Õv.Õs.-..=/.v.ÕÍ..ä.. 0000A0
10FF11A1 10B610B6 10B610B6 10B610B6 10B610B6 10B610D3 10031003 1104A7FF .Ìå.Æ.Æ.Æ.Ñ.Ñ.Ñ.Ñ.Ñ.Ñ.Ñ.Ñ.À... 0000C0
10B610B6 10B610B6 113A113A 113A113A 113A113A 11661166 10FF10FF 10FF10B6 Ñ.......f.f.:.:.:.:.:.:.Ñ.Ñ.Ñ.Ñ. 0000E0
113A113A 11A110B6 10B610B6 10031086 10031086 10031086 10031086 10FF10FF ....Ñ.Æ.Ñ.Æ.Ñ.Æ.Ñ.Æ.Ñ.Ñ.Ñ.À.:.:. 000100
016A006A FA5689F8 46890000 FFFF9A01 6A006AFC 4689FE46 89000088 113A113A :.:.|...F±.F■j.j.......F½.V*j.j. 000120
006A0A46 890000FF FF9AFE60 B6FF006A 006A006A 5016FE62 868D0676 FF0876FF .v..v...b±.Pj.j..j..Ñ'±......F.j. 000140
000610C5 00020007 CBC95F5E 1F0000E9 0A468800 00FFFF9A F876FFFA 76FF016A j..v*.v½......F.Õ...^_èù....é... 000160
00030F25 01030000 000A10A3 00020088 00031267 01030000 00080F06 00020000 ............g.......È.......X... 000180
00000000 00000000 00000000 0000005D 00031242 0103005C 00031279 01030090 ....y...\...B...]............... 0001A0
00000000 00000000 00000900 02000200 01CB0001 881F0200 3E89088E FFFFB81E .|...Ä.>...|..ù................. 0001C0
FFFFB9C0 33067EC4 1EDE88D7 88EC8855 00000000 00000000 00000000 00000000 ...............U.š.■.8.á~.3â¿.. 0001E0
```

Dump of file SATURN:[PCCOMMON.DUMP.DLL]SAM.TMP;1 on 18-APR-1990 10:52:28.45
File ID (911,26,0)   End of file block 69 / Allocated 72

Virtual block number 34 (00000022), 512 (0200) bytes

```
01C6F706 4688FE87 08468ED8 8EC08CF9 28D1F7AE F2FFFFB9 0A7EC4FF 758DAEF2 ·Û.u.é~.¿...ÚÄ1+*.ã.Ä.F..±.F.¼ó. 000000
76C51EDE 88D788EC 8855CB5D C28C1FFA 88F388A4 F3C913A5 F3E90149 A4027400 .t.È!!ÕµÈ.èµÈ.µ.*..ô]ìÜ.š.■.B.év 000020
13A5F3E9 D149A402 7401A8C7 88067EC4 D1F7AEF2 FFFFB9C0 33C08ED8 8CFE880A ..±.Ä.ä3â¿...ÚÄ!é~..ú´.t.È!!ÕµÈ. 000040
889149D1 F7AEF2FF FFB9C033 067EC4D7 88EC8855 CB5DC28C 1FFA88F3 88A4F3C9 èµÈ.µ.*..ô]ìÜ.š.■é~.3â¿...ÚÄ!!.. 000060
32F8E2AA 0374C00A AC0CE30E 4E88DF88 0A76C506 7EC41E56 57EC8855 00CB50FA *]ù.U.šWV.é~.év..Ô.N.D.¯.ât.¯ã½2 000080
0E468DFA 568CF846 89EC468D 56570000 16C8CB5D E5885F5E 1FC28CC3 88AAF3C0 åµ¯.û.ô.^_.Í]ùà...WV.Fš.F½.V*.F. 0000A0
26078926 08578926 06478926 08568806 4688420A 47C626F8 5EC4FE56 8CFC4689 .F■.V±é^½Ï6G.B.F..V.&.G.&.W.&..& 0000C0
C4F0880C C4830143 03209A53 060A76FF 0C76FFFC 76FF167F FF0447C7 26025789 .W.&úG.....v■.v..v..S. .C..é..þé 0000E0
006A53FA 76FF900F E8058826 02478E26 07FF263F 8826C02A 1278044F FF26F85E ^½&.O.x.*ã&.?&..&.G.&..Š...v*$j. 000100
F741AEF2 FFFFB9C0 330F8806 7EC457EC 8855C8C9 5F5EC68B 06C483FF FF01AA9A .`....é..ó^_èùU.šWé~..Õ3â¿...ÚA¼ 000120
57EC8855 00CB5DE5 885FC28C C788C78E FF330474 0538264F AEF2F88B 0A468AD9 \.F..«·ÚO&8¯t.3..ú.ú.ó_.Í]ù.U.šW 000140
04E8D08B C0330674 05382647 AEF2FD0A 468A4FD9 F741AEF2 FFFFB9C0 33067EC4 é~.3â¿...ÚA¼1O.F.»·ÚG&8̄.t.3é.ÅŠ. 000160
7A2DC38B FA4689E4 2A08478A 26085EC4 56570000 08C8CB5D E5885FFC C28CC78B .ú.ó■_.Í]ùà...WVé^.&.G.*ô.F*.Û-z 000180
0A47F626 0774830A 47F626F8 4689116E 05E0D1C1 03E0D1C8 88F9F700 0CB99905 ..¿..Ẍ*.àÌÀ.èÌÀ.n..F½&-G..t.&-G. 0001A0
0A4F8026 0E74010A 47F62608 5EC49001 28E9FFFF 88200A4F 8026085E C40F7440 ªt.é^.&.O. |..Õ+..é^.&-G..t.&.O. 0001C0
26FC7689 F0880447 8926C02B EF0A6780 26020A4F 802690E2 EB000004 47C72620 &úG...Šã.&.O..&.g.ÿ+ã&.G..Þ.v■& 0001E0
```

```
Dump of file SATURN:[PCCOMMON.DUMP.DLL]SAM.TMP;1 on 18-APR-1990 10:52:28.45
File ID (911,26,0)   End of file block 69 / Allocated 72

Virtual block number 35 (00000023), 512 (0200) bytes

0586087E 81377501 116E87F6 06D868F9 F7000CB9 99057A2D C38B4C75 0C0A47F6 -G..uL.ū-z..¿..¼ªkÄ.-.n..u7.-... 000000
8302C611 209AFA76 FF0F75FF FF0A7E81 16750592 087E810E 7402530A 7E810775 u..-.S.t..-...u..-...u..vª. .ó.. 000020
7A20C38B 1575080A 47F62608 5EC404C4 830C51E8 0876FF0A 76FF0C75 C00802C4 á..âu..v..v.ÒQ..á.á^.&-G..u..ū-z 000040
2606478B 2606772B 26378826 085E8867 7401116E 87F60608 68F9F700 0CB99905 ..¿..¼ªkÄ.-.n..tg.^.&.7&+w.&.G.& 000060
0677FF26 5256167E F60B0447 89264802 458BF87E 88025789 26078926 4008578B .W.a&..&.W..-½.E.H&.G..--.VR&.w. 000080
006A006A 026A0F74 20177F87 F6FA5E88 19EBFC46 8908C483 02E40F88 9AFA76FF .vª...õ..á..F•Š..^ª-... t.j.j.j. 0000A0
1606468D 560001BE 17E80788 2606468A 065FC426 085EC408 C4830307 0F4A9A53 S.J....á.á^.&á_..F.&..Š.ƒ..V.F.. 0000C0
CBC95F5E E42A0646 8AFECCE9 0374FC76 39FC4689 08C48301 180F889A FA76FF50 P.vª......á..F•9vet.Õä±.F.*õ^_èù 0000E0
16891ABC A310568B 0E46881A CE1E8C1A CCA31AD2 B8025D11 449A000A 88EC8B55 U.$¦...D.].¦@.Èä...ö..F..V.È¥‾... 000100
7E80038D E900001A C606C700 001AC806 C71AA416 891AA2A3 08568806 46881ABE ƒ..F..V.ÈÀ...Ê.ú.à...ú.ó...Õ...- 000120
C0A31AC2 A31AAAA3 1AC4A31A A8A31AAC A3C02800 011ACA06 C7030BE9 037425F6 -%t.Õ..ú.ò...+âÈ¯.È´.Èá.È^.Èö.Èâ 000140
3206C70A 46FF4975 30017F80 260A5EC4 00201C32 06C71ABA A31AA0A3 1AA6A31A .È|.È..È¤.ú.2. .á^.&...0u|.F.ú.2 000160
203F8026 9028E800 001AC006 C71AAC06 FF0D752B 3F80260A 5E88903E EB00301C .0.Š>..^.&.?+u...¯.ú.â...Š(.&.? 000180
FFC7752D 3F80260A 5EC400EB 1AA006FF 9014EB1A C006FF1A 75001AAC 3E830E75 u..>¯..u...â.Š......Š.á^.&.?-uú. 0001A0
1E0A76FF 0C76FFDD 75C00B02 C4830978 E80E5098 078A260A 5E880A46 FF1ABA06 .¤..F..^.&...P.Òx..á..âuï.v..v.. 0001C0
D8F71AD0 A11ABA06 FF0C7D00 1AD03E83 0C56890A 468908C4 8308C7E8 0E1AD068 hÅ..Òú..á..F..V..>Å..)...¤.ÀÅ.¼Å 0001E0

Dump of file SATURN:[PCCOMMON.DUMP.DLL]SAM.TMP;1 on 18-APR-1990 10:52:28.45
File ID (911,26,0)   End of file block 69 / Allocated 72

Virtual block number 36 (00000024), 512 (0200) bytes

20752E3F 80260A5E C400201C 3206C706 75301C32 3E830D74 001ABA3E 831AD0A3 ÈÅ..>¤..t..>2.0u.ú.2. .á^.&.?.u- 000000
1ACA3E83 0C56890A 468908C4 83087BE8 0E1ACA68 1E0A76FF 060A46FF 1AC206FF ..ò..F...v..hò..Ò(..á..F..V..>ò. 000020
68304074 004E3D3D 7400463D 98078A26 0A5EC41A C20EFF00 011ACA06 C70A7D00 .).ú.ò.....ò.á^.&...=F.t==N.tə=h 000040
46FF0375 4C3F8026 0A5EC409 75001AAA 3E830002 1AAA06C7 0675006C 3D2B7400 .t+=l.u.ú.¯....>¯..u.á^.&.?Lu..F 000060
06C7D0EB 00101AAA 06C7D8EB 00011AAA 06C79002 4EE91C75 003F8026 0A5EC40A .á^.&.?.u.ÕN..ú.¯...ŠÄú.¯...ŠÄú. 000080
1AA806FF 08750058 30057400 473D0A74 00453DF8 46899807 8A26C8EB 00081AAA ¯...Šà&....F½=E.t.=G.t.=X.u...´. 0000A0
253D0152 E9037E01 3FE90375 00633D01 91E9037E 78740069 3DF8468B 20F84683 .F½ .F½=i.tx-.Õ..=c.u.Õ7.-.ÕR.=% 0000C0
C7260789 261AC6A1 1FC4261A BC1EC415 75021AAA 3E839001 59E90140 E9037500 .u.Õə.ÕY...>¯..u.á.¥.&á.Àó.&..&ú 0000E0
E9037500 1AC83E83 041ABC06 83078926 1AC6A11F C4261ABC 1EC400EB 00000247 G...Š.á.¥.&á.Àó.&....¥...>à..u.Õ 000100
01ACE9FF FFB801AF E9037520 0A47F626 1AA21EC4 01BDE903 74001AC6 3E830170 p..>ó..t.Õ§.á.Å.&-G. u.ÕÈ.|..Õ˜. 000120
06FF1AA6 06FFF2EB 086A90C3 EB02C483 019EE80E 0A6A0000 1AA006C7 1AC406FF ..á.ú.....j..Ò...á.Šù.j.Š·..Î... 000140
A3C02B7A 74011AAA 3E830081 E9037508 1AAA3E83 00041ACA 06C71AC2 06FF1AA8 ´...ò.ú.ò....>¯..u.Õ...>¯..tz+âÈ 000160
13E80000 1AD006C7 0A74001A 8A3E83FA 46891AD0 A128741A D00639FA 46891AAA ¯..Fª9.Å.t(ÀÅ..Fª.>¤..t.ú.Å ..Š. 000180
C4830130 E80E106A 021ABC06 831AD0A3 C02B027D C0081AD0 A1051AD0 2E839090 ....Å..ÀÅ..á).+âÈÅ...¥..j..ᒧ..á 0001A0
1AD0A300 052DFA46 8B157400 1ABA3E83 227400FA 7E8302C4 83048DE8 0E3A6A02 .j:.Ò...á..-ª.t".>¤..t..Fª-..`ª. 0001C0
02C48300 F1E80E10 6A041ABC 2E830000 1AD006C7 9007EB1A D0A3C02B 027DC00B .á).+âÈÅ.Š..ú.Å.....¥..j..Òþ..á. 0001E0

Dump of file SATURN:[PCCOMMON.DUMP.DLL]SAM.TMP;1 on 18-APR-1990 10:52:28.45
File ID (911,26,0)   End of file block 69 / Allocated 72

Virtual block number 37 (00000025), 512 (0200) bytes

0EF876FF F4EB016A 90FF39E9 026EE80E 006A90FF 3FE9106A FF10E902 1ABC0683 ..¥..Õ..j.Õ?..j..Òn.Õ9..j.Š¶.v½. 000000
00673005 7C00653D FF0CE903 7500643D 90FF21E9 0428E80E 256AFF2A E90349E8 ÒI.Õ*.j%.Ò(.ÕI..=d.u.Õ..=e.|.=g. 000020
EBFE5689 FC468940 0C56880A 46880A4E FF0C568B 0A468809 74001AAA 3E830A7E -Õ.>¯..t..F..V..N..F..V.ə.F•.V±Š 000040
308F7400 733DFEE0 E9037500 703DFEE4 E9037500 6F3DFE80 E9037500 6E3D903A :.=n.u.Õ.±=o.u.ÕÕ±=p.u.ÕÄ±=s.t.= 000060
8A26FC5E C4FC46FF 9034EB0A 46FF90B1 EBFF79E9 03750078 3DFEB9E9 03750075 u.u.Õ¿±=x.u.Õy.ŠŸ..F.Š4..F•á^•&. 000080
8B06C483 044CE80E 0A76FF0C 76FF500A 4628C38B EC75253C 0474C00A F6468807 ..F-.ât.<%uš.û+F.P.v..v..ÒL..á.. 0000A0
261AA21E C4FC63E9 0374C00A F6468807 8A260A5E C40C5689 0A4689FE 5688FC46 F•.V±.F..V.á^.&...F-.ât.Õc•á.Å.& 0000C0
201C3206 C7067400 1AC23E83 56570000 12C8CBC9 1AC6A1FE 51E90374 200A47F6 -G. t.Õ¤±Àó.èùà...WV.>ô..t.ú.2. 0000E0
078B261A BC1EC419 75101AAA 3E830774 021AAA3E 831AC406 FF04740A 067E8300 ..~..t...á..>¯..t..>¯..u.á.¥.&.. 000100
078B261A BC1EC411 74001AC4 3E83902C EB041ABC 0683FE56 89FC4689 02578B26 &.W..F•.V±..¥..Š,..>á..t.á.¥.&.. 000120
A03E8302 1ABC0683 FE5689FC 46899907 8B261ABC 1EC40EEB 0000FE46 C7FC4689 .F•úF±..Š.á.¥.&....F•.V±..¥...>. 000140
46891ACE 168B1ACC A11C30A3 C0289003 EB06468B 0674FE46 0BFC4688 0E74001A ..t..F•.F±t..F.Š..+âÈ0.Àä...ö..F 000160
07C626F2 46FFF25E C41D750A 067E832B 7D00FE7E 83317500 1AC43E83 F45689F2 ·.V¶.>á..u1.-±.)+.-..u.á^·.F·&6. 000180
00F646C7 9006EB00 01F646C7 FE5689FC 46890AF7 00028308 F7FE5688 FC46882D -.F•.V±¥Å.@.¥Õ.F•.V±úF-..Š..úF-. 0001A0
C23E830A C483080D 11169AFC 76FFFE76 FF501E06 76FFFA5E 8CF84689 1AAEB800 .¦Õ..F½.^ª.v..P.v±.v•......á..>ò 0001C0
83007EC9 0BF04E89 C82B1ACA 0E8804C4 83032900 8C9AF876 FFFA76FF 4574001A ..tE.vª.v½...)..á...ò.+à.Nþ.è-.. 0001E0
```

```
Dump of file SATURN:[PCCOMMON.DUMP.DLL]SAM.TMP;1 on 18-APR-1990 10:52:28.45
File ID (911,26,0)   End of file block 69 / Allocated 72

Virtual block number 38 (00000026), 512 (0200) bytes

 F47FC00B 49C18847 3005C626 05EBF27E C4F04E8B 00001C30 06C70675 081C303E >0..u.ú.0....Nbé~·Š.&6.0G.èl.â.¶ 000000
 3C0774C9 0B048807 8A26F85E C4F276C5 EE5E8C1A A80E8BF0 4E89F446 8CF27E89 .~·.F¶.Nb..´..^Ÿév·é^½&.....èt.< 000020
 1475001A C43E83EE 5E8EF45E 8CF27689 E375003F 8026F846 FF46202C 80037C61 a|.., F.F½&.?.uD.v·.^¶.^Ÿ.>é..u. 000040
 5F5E02C4 8302FFE8 0E50C02B 02E80001 88057500 F67E830B 741AC006 0B1AACA1 À¯...ã.t..—.u.|..Š.+âP.Ò...é.^_ 000060
 0683FA56 89F84689 1ABE1688 1ABCA100 01BE1874 00067E83 56570000 10C8CBC9 èùà...WV.~..t.ƒ..À¥...ƒ..F½.V'.. 000080
 10EBFA56 89F84689 02578826 078B261A BC1EC413 74081AAA 3E83008F E9021ABC ¥..Õ...>˘..t.é.¥.&..&.W..F½.V'Š. 0000A0
 0BF84688 0E74081A AA3E8304 1ABC0683 FA5E8CF8 4689FC46 89078826 1ABC1EC4 é.¥.&...F=.F½.^'..¥...>˘..t..F½. 0000C0
 89FA568B·F84688FA 5E8CF846 89012FB8 097500FC 7E83900A E8012888 1575FA46 F'u.¡(.Š...~•.u.|/..F½.^'.F½.V'. 0000E0
 1574003F 8026F246 FFF25EC4 900EEB1A CA0E8B1C 741AC236 39F62BF4 5689F246 F·.V¶+-96ò.t...ò.Š..é^·.F·&.?.t. 000100
 001ABA3E 83FE2B1A D03E8BF3 75003F80 26F246FF F25EC446 90EDE810 7ECE3B46 F;ö~.ŠÚ.Fé^·.F·&.?.uæ.>Å.+±.>¤.. 000120
 57087400 1ABA3E83 06C48301 B3E80EF8 76FFFA76 FF5602C4 830159E8 0E570875 u.W.ÒY..é.V.v'.v½.Ò*..é..>¤..t.W 000140
 067E83FE 5689FC46 891ABE16 8B1ABCA1 000006C8 90CBC95F 5E02C483 013CE80E .Ò<..é.^_èù.à...À¥...ƒ..F=.V±.-. 000160
 00061ACA 06C70675 001AC23E 83FA4688 C02A9003 EB01B005 7547067E 83067467 gt..~.Gu.¯.Š..*â.F'.>ô..u.ú.ò... 000180
 36FF0676 FF1ACA36 FF1AA836 FF00011A CA06C706 75001ACA 3E830074 00FA7E80 .~'.t..>ò..u.ú.ò....6´..6ò..v..6 0001A0
 3E831B74 00FA7E80 0EC48305 5A1EFF26 19BE068E FC76FFFE 76FF1ACC 36FF1ACE ö..6ä..v±.v•..ƒ.&..Z..é..~'.t..> 0001C0
 1B74001A A03E8304 C483055E 1EFF2619 BE068E1A CC36FF1A CE36FF14 75001AA0 ...u..6ö..6ä...ƒ.&..^..é..>...t. 0001E0

Dump of file SATURN:[PCCOMMON.DUMP.DLL]SAM.TMP;1 on 18-APR-1990 10:52:28.45
File ID (911,26,0)   End of file block 69 / Allocated 72

Virtual block number 39 (00000027), 512 (0200) bytes

 081ABC06 8304C483 05661EFF 2619BE06 8E1ACC36 FF1ACE36 FF147500 1ACA3E83 .>ò..u..6ö..6ä...ƒ.&..f..é...´.. 000000
 C483056A 1EFF2619 BE068EFC 76FFFE76 FF1B741A C00601A ACA10000 1C3006C7 ú.0...À¯...â.t..v±.v•..ƒ.&..j..ˆ 000020
 3C75001A C83E8356 000000C8 90CBC901 29E80E50 C02B02E8 0001B805 74C00804 ..ât.|..Š.+âP.Ò).èù.à...V.>à..u< 000040
 36FF10EB E42A0488 2602478E 2607FF26 37882606 468A1478 044FFF26 1AA21EC4 é.À.&.0.x..F.&.7&..&.G.&..*ôŠ..6 000060
 90CBC95E 1AC606FF 9005EB1A C806FF07 754006C4 830AE501 AA9A0676 FF531AA4 Ê.S.v..˘.Í..é.ƏU...à.Š....6.^èù. 000080
 36FF1AA2 36FF1AA4 36FF1BEB 507EF60B 06768B57 75001AC8 3E835657 000002C8 à...WV.>à..uW.v..--PŠ..6Ê..6À..6 0000A0
 044FFF26 1AA21EC4 1E7EC00B 4EC6881A C806FF04 754006C4 83084D01 AA9A1C32 2..˘.M..é.Əu...à..6N.ã~.é.À.&.0. 0000C0
 06468807 75001AC8 3E8304E8 E42A0588 2602478E 2607FF26 3F88261C 32A00478 xâ.2.&.?&..&.G.&..*ôŠâ.>à..u..F. 0000E0
 36FF1AA4 36FF22EB 5E75001A C83E830A 76885657 000002C8 CBC95F5E 1AC60601 ..6.^_èùà...WV.v..>à..u^Š".6Ê..6 000100
 084EC688 0646FF1A C806FF04 754006C4 83088F01 AA9A5098 078A2606 5EC41AA2 À.é^.Ì...P.˘.¢..é.Əu...à..F..6N. 000120
 478E2607 FF263F88 261AA21E C4078A26 065EC4CD 78044FFF 261AA21E C42574C0 âtXé.À.&.0.xëé^.&..é.À.&.?&..&.G 000140
 A1560000 0CC8CBC9 5F5E1AC6 06010A46 88077500 1AC83E83 CAEBE42A 05882602 .&..*ôŠò.>à..u..F...6.^_èùà...VÀ 000160
 F8008C9A F476FF52 1AD0368B FA4689FC 4689C02B F65689F4 46891ACE 16881ACC ä...ö..F¶.V-+â.F=.F'.6À¯R.v¶...½ 000180
 4E017508 1C303E83 08EB02EE 83057510 1C303E83 06762BF0 2BF84689 04C48307 ..é..F½+Þ+v..>0..u..Ÿ.Š..>0..u.N 0001A0
 0E509807 8A26F446 FF127530 1C323E83 1975203F 8026F45E C4227500 1ABA3E83 .>¤..u"é^¶&.?-u..>2.0u..F¶&...P. 0001C0
 7400067E 83187400 1ABA3E83 077EF60B 0874301C 323E83F8 4EFF02C4 83FE71E8 Òq±.é..N½.>2.0t..--..>¤..t..~..t 0001E0

Dump of file SATURN:[PCCOMMON.DUMP.DLL]SAM.TMP;1 on 18-APR-1990 10:52:28.45
File ID (911,26,0)   End of file block 69 / Allocated 72

Virtual block number 40 (00000028), 512 (0200) bytes

 E80E5629 75001ABA 3E830070 E80EFC46 FF077400 1C303E83 0066E80E FA46FF07 ..F'.Òf..>0..t..F•.Òp..>¤..u)V.Ò 000000
 00FC7E83 0A74001C 303E8300 39E80E04 7500FA7E 830A7400 067E8302 C483FE7E ~±.é..~..t..~'.u..Ò9..>0..t..~•. 000020
 3206C70E 74001ABA 3E8306C4 83FEB5E8 0EF476FF F676FFF8 76FF0040 E80E0475 u..Òə..v½.v~.v¶.Òç±.é..>¤..t.ú.2 000040
 E80E5000 208803E8 0028B805 74001AAC 3E83CBC9 5E02C483 FE38E80E 5600201C . .V.Ò8±.é.^èù.>¯..t.|+.Š.| .P.Ò 000060
 0058B805 74001AA8 3E831775 101C303E 8302C483 FDC8E80E 306ACB02 C483FDD2 ●».é.ùj0.Òà».é..>0..u..>´..t.|X. 000080
 2A3F8026 0A5EC400 01FE46C7 56570000 06C8CB02 C483FDAA E80E5000 788803EB Š.|x.P.Ò˘».é.ùà...WVúF±..é^.&.?* 0000A0
 FE46C708 752D3F80 260A5EC4 9060EB0A 46FF021A BC068337 88261ABC 1EC41275 u.é.¥.&.7..¥...F.Š'.é^.&.?-u.úF± 0000C0
 303C0A75 1AC23639 387F393C 3F7C303C FA468807 8A260A5E 8BF6280A 46FFFFFF ...F.+-.^.&...F'<0|?<9.;96ò.u.<0 0000E0
 03E1D1CE 0302E1C1 CE889805 8A261B7F 393D8026 06EBFB88 00301C32 06C70675 u.ú.2.0..«Š.&.=9..&....öêÀ..öÌÀ. 000100
 37892606 5EC4F08B EEF7FE46 880C468C 0A7E89DF 7D303080 2647F188 30E983C8 à.Õ0.þG&.=0)Ò.~..F..F±¼Ÿ.Þé^.&.7 000120
 01EBFC7E C4064E8A FE5E8CFC 46890136 B8570000 04C8CBC9 5F5E0C56 880A4688 .F..V.^_èùà...W|6..F•.^±.N.é-=Š. 000140
 C02BFE46 8CFC7E89 9009EBFE 468CFC7E 890001B8 F4750038 26117400 30802647 G&.=.t.Ì8.u¶|...~•.F±Š...~•.F±+â 000160
 9A013C68 1E013E68 1E1778A3 E0865800 00FFFF9A 5016C48B 50EC8855 90CBC95F _èù.U.£P.é.P.....X.ÂÈx..h>..h<.. 000180
 DA0E8A9A 00CD0E36 9A50CB5D E5880001 880AA912 589A039E E80021E8 0000FFFF ¯....Òl.Ò...X.`.|...Í]ùP.6.ë....Ö 0001A0
 003D8026 47017500 3D80267F FFB9013E 068EFF33 000D8B1E 014416FF 00FF6800 .h....D..£..3...>.¿..&.=.u.G&.=. 0001C0
 177FBF1F F788071E 061CE8E7 74AEF2C0 330874CA 88A6F3C8 88D18805 488E3174 t1/H..Ì.ùµÌ.òt.3â·ÚtÓŠ.....¼.¢.. 0001E0
```

Dump of file SATURN:[PCCOMMON.DUMP.DLL]SAM.TMP;1 on 18-APR-1990 10:52:28.45
File ID (911,26,0)   End of file block 69 / Allocated 72

Virtual block number 41 (00000029), 512 (0200) bytes

```
 0E8A9A50 00FCB8EC 885500C3 1FEDEBAA C20A0572 412CAC92 04E0C00E 72412CAC ¯,Ar.åÁ..¯,Ar..ô˙ŠÚ.û.U.Š¡=.P... 000000
 B85756EC 8855CB5D E5880E40 0E8A9A50 00FFB805 561EFF04 74000558 3E830DDF Ô..>X..t...V.¡..P...∂..[]ùU.ŠVW¡ 000020
 EBF78BAE F2FFFFB9 C033970C 74964010 74C238AD 19C88E06 568BC08E D88E0245 E..Ä.ã.V.ƒà.Ù;öt.∂.t..3â¿..·Û.¼Š 000040
 B9C033FA 88921F74 C00B0E54 0E5A9A06 76FF57EC 88550002 CA50E58B 5E5F96EB Š._^.[]ð..U.ŠW.v..Z.T..ât...*3â¿ 000060
 0002CA5D E5885F58 0000FFFF 9A501651 521E5300 028BC48B 504901F7 AEF2FFFF ..¯Ú%1IP.åE..S.RQ.P.....[_.[]ð.. 000080
 89116E05 E001C103 E001C888 F9F7000C B999057A 20044688 199006FF 000004C8 à........F.-z..¿..%*.à1Á.ÈïÁ.n.. 0000A0
 261174D0 08085789 26064789 26045EC4 02C4830E 9414139A 020068FE 5E8CFC46 F=.^±h........á.á^.&.G.&.W..Ât.& 0000C0
 2640FE56 88FC4688 040A4F80 26045EC4 9021E802 000247C7 26FC5EC4 080A4F80 .O..á^=&úG...Š!.á^.&.O...F=.V±∂& 0000E0
 89260789 26085788 26064788 26045EC4 00010247 C726FC5E C4085789 26064789 .G.&.W.á^=&úG...á^.&.G.&.W.&..&. 000100
 60E90454 E9C03300 098A0872 177D1E38 065E88EC 8855C3C9 00000447 C7260257 W.&úG...èúU.š.^.;.).r.¤..3âÕT.Ô' 000120
 A78091E1 75C0855A 590000FF FF9A5116 0C76FF08 76FF0A76 FF53CC8B 04EC8304 ..š..äS.v..v..v..Q.....YZ.âuÃ..Ï 000140
 F60413E9 C0330009 8A087217 7D1E3806 5E8B0CEC 83EC8B55 00CB5DE5 88FD177F ..».[]ù.U.š.š..^.;.).r.¤..3âÕ..- 000160
 8C667480 177F87F6 00000F73 9A5016F4 468D5141 415151C9 33531274 20177F87 ... t.S3èQQAAQ.F¶.P.s...-....tf. 000180
 8049E30C 4E8BF866 89F288FA 885657FC FC4689FE 4689C033 0856C50A 468EFA5E ^*.F.éV.3ê.F±.F==WV.*.·.f½.N.DI¯ 0001A0
 74FB3800 740A3CAC 0C4E8807 16FA88D4 8BE22800 808ADC88 02EC8338 75AEF20A .·Úu;.š..É¤..+ã.å.*...N.˜<.t.;«t 0001C0
 E1EB0014 E8E2EBFC 46FF0AB0 AA001FE8 0375F838 00B0009A E9002BE8 F4E2AA1A .˙ã¶Ö+.Õ..¯.;«u.Ò..˙¯..F=Šãð..ŠÃ 0001E0
```

Dump of file SATURN:[PCCOMMON.DUMP.DLL]SAM.TMP;1 on 18-APR-1990 10:52:28.45
File ID (911,26,0)   End of file block 69 / Allocated 72

Virtual block number 42 (0000002A), 512 (0200) bytes

```
 5E8B1FE3 CA28CF88 1F061E51 53500EEB 11449AFF FCB87AEB 0093E9FA 5E8E5F5E ^_.^*Õ..Šz¡=..D.Š.PSQ....ü+ðD..^ 000000
 5B591F07 740B08FE 5E01F45E 8B1175C0 0800000E B49A5016 F4468D51 521E5306 .S̄.RQ.F¶.P.Ç....âu..^¶.^±.Ût..Y[ 000020
 208A03EB 001CBA08 7500098A 00013000 74006030 1874C00B 08C4831F C3FA8858 X.*û..á..ât.=m.t.=..¤..u.¤..Š.¤ 000040
 33001CBA 0EEBF803 751A3F80 085E880A 5E8E0E74 40177F87 F6FE5E8E 26EBF900 .*Š&.^±-...∂t..^..^..?.u.½Š.¤..3 000060
 C90B0C4E 8802F7E9 C850E588 0472FA5E 8E5F5EF8 668BFC46 28FE468B 06EBF9C0 å*Š..F±+F=.f½^_.^*r..[]ùÕ%..N..è 000080
 3D1774C0 081F071E 0000104B 9A5016F4 468D5152 1E530856 C51EEEEB C1880475 u..êŠŸ.éV.S.RQ̄.F¶.P.K.......ât.= 0000A0
 7F87F687 75C008F4 468BC2EB 00208AC7 EB001CBA CC750009 8A00013D 0074006D m.t.=..¤..uëɑ..Šúɑ .Šô.F¶.âuñ-.. 0000C0
 0442E900 B35756EC 885500A3 EBC03300 1CBAA6EB 02751A3F 80260A88 0A744017 .∂t..Ö&.?.u.Š1ɑ..3âŠÈ.U.ŠVW*.Õ8. 0000E0
 88C03302 E80001B8 05744017 7F87F60C 7C00FB83 117D177D 1E38065E 88EC8855 U.š.^.;.).)..«.|.-...∂t.¡..Š.3â. 000100
 E9C03305 75400574 A1CB5152 E3880572 05781E38 0872D82B DC885A59 00C850E5 [}ù.YZ.É+Ãr.;.x.r..DRQÙÂt.∂u.3âÕ 000120
 0000FFFF 9A521650 1653C48B 5087177F A780048B 520002BB 05742EFF 5152FC74 t=RQ..t.£..R.å.Ï..ñP.åS.P.R..... 000140
 E319AA0E 885AD479 4B177F8F 08088106 7500023D 07740001 30408112 7558C00B .âXu.Ÿ∂=..t.=..u.Ÿ.....KyåZ..˙.D 000160
 BE19A81E FF00038B C28C1980 06C401AE E9037319 A81EFFDB 33C28C19 AC06C41E .á.¯..ô3Ù..˙.s.ÕÙ.á.¯..ô£....˙.ƒ 000180
 9A11E568 0E016A08 74198830 19848800 73E81984 BF19848E 007CE819 B48F1984 Ç.¢Ç.Ò|./Ç.¢Ç.Òs.¡Ç.=¡.t.j..hÍ.. 0001A0
 88550000 11E09A00 6A006A03 6A0051E8 19888F19 B48ED88E 0E6088C3 0000FFFF ....û¡˙..Ã/Ç.¢¡.ÒQ.j.j.j..Ã...U. 0001C0
 23E81988 BF1988BE EC885503 E80031E8 19888F19 B48E003A E81C348F 1C348EEC š/4.¢4.Ò:./Ç.¢¡.Ò1.Š.U.š/¡.¢¡.Ò# 0001E0
```

Dump of file SATURN:[PCCOMMON.DUMP.DLL]SAM.TMP;1 on 18-APR-1990 10:52:28.45
File ID (911,26,0)   End of file block 69 / Allocated 72

Virtual block number 43 (0000002B), 512 (0200) bytes

```
 FF00028B 07E319AA 0E880000 FFFF9A50 06468A50 C033001A E81988BF 19888E00 .ƒ¡.¢¡.Ò..3âP.F.P.......˙.D.£... 000000
 F6285657 000014C8 00C3EEEB 1DFFF274 02450805 8804EF83 0E73F73B C319A81E .˙.û;¼s..ÿ....E.t·..ŠŸû.à...WV+- 000020
 FF0C6AF8 5689F646 89F25689 F04689C0 28013E16 8800F0E9 0375013E 3639FF2B +.96>.u.Õþ...>.+â.Fþ.V·.F-.V½j.. 000040
 C4008CE9 03767FFF FE814619 74C0080A C48312CC 15269A05 48681EF6 76FFF876 V½.v-.hH..&.ä..á..ât.F.±..v.ÕŸ.á 000060
 3F8026F6 5E88F475 003F8026 F646FFF6 5EC40CEB 47EA7500 3F8026F6 46FFF65E ^-.F-&.?.uõGŠ.á^-.F-&.?.u¶.^-&.? 000080
 02C48313 1114139A 56EE5689 EC468904 C483120B 14CE9A04 6A500145 808A7500 .u¤.E.Pj..ö.Ü..á..FŠ.VŸV......á. 0000A0
 16891985 A3EE5688 EC468866 74C208FC 46886074 EE4608EC 468BFE56 89FC4689 .F=.V±.FŠ.FŸtm.F=.ôtf.FŠ.VŸÈ.... 0000C0
 FC468BEC 5EC42C74 C00B0AC4 83103015 269A0548 681EF076 FFF276FF 0C6A1987 ..j..v·.vþ.hH..&.O..á..ât,á^Š.F= 0000E0
 078826FC 46FFFC5E C4078A26 F046FFF0 5EC404EC 46830257 89260789 26FE5688 .V±&..&.W..FŠ.á^þ.Fþ&..á^=.F=&.. 000100
 90CBC95F 5EA77500 3F8026F0 5EC4F475 003F8026 F046FFF0 5EC4E8EB 0E74C00A .ât.ŠÒá^þ.Fþ&.?.u¶á^þ&.?.uÏ^_èù. 000120
 1600160C 0808070A 0C090C08 0C070906 00051804 02030202 1601FA70 E90002B8 ¡..Õp*.......................... 000140
 16060972 1C70206D 006C0859 00570053 00520243 00410235 02121211 0010120F ........5.A.C.R.S.W.Y.l.m p.r... 000160
 5DE58B99 FFFFB817 74168917 7BA31608 000008D7 02CE0BA4 00840982 0A810A80 ........Ê.ö.=.....È(...t.¡....[] 000180
 43431674 073A2E18 75E40A00 24891366 BB177BA3 CB50E588 99FFFFB8 0008E8CB ùÕ..¡....[]ùÈ(.£f.¿$..Õu..:.t.CC 0001A0
 885500C3 1774A398 01478A2E 430176CA 3C04728C 3C430A76 243C0472 133CF7E2 ã¼<.r.<$v.C<¥r.<ðv.C..G..Èt.û.U. 0001C0
 F13D0646 88575602 EC83EC88 55CB5DE5 8801FE4F 80260574 C308C08C 065EC4EC Šá^..â.ût.&.O±..[]ùU.Š.Š.VW.F.=þ 0001E0
```

Dump of file SATURN:[PCCOMMON.DUMP.DLL]SAM.TMP;1 on 18-APR-1990 10:52:28.45
File ID (911,26,0)   End of file block 69 / Allocated 72

Virtual block number 44 (0000002C), 512 (0200) bytes

```
750078E8 05740018 E8157500 82E8199C A3127400 25E80875 00199C3E 831E73FF .s..>...u.ÒX.t.È..Ò..u.Ò..t.Òx.u 000000
E3834306 5E880776 065E3900 F0B8CB5D E5885E5F 02C48312 8C16189A 0676FF08 ..v.......6._^.[]ùEÞ.9^.v..^.C.D 000020
87C28838 74FFFA83 08C48314 4717C49A 50028051 0E4F8050 501EC033 FE5E89FE ±.^±3å.PP.O.Q¯.P.á.G..á..ª.t8.ô. 000040
0AB80C47 89484800 08A3C033 D88EFE5E 880008A3 DA8E0574 D20B19A0 A3199E16 ...È...Øt..ÖÈ...^±.Ä3âÈ..HH.G.¡. 000060
DB33064E 88C08ED8 8CC31FD8 8C0006A3 00000500 0AA30147 800002A3 0000A300 .È..È...G.È.....È...Ä.û.Ä.â.N.3Û 000080
18C29A06 76FF006A 0876FF00 6A560000 0AC8C3D9 8EC18CD2 0B019AE8 19A01E8E ....Ò...Ø.è.\ûà...Vj..v.j..v..ô. 0000A0
02C48315 1414139A 56F8768B 902FEB99 C02B0674 FFFFC2F7 FA5689F8 468914FB «..F½.Vª¼ô..t.+â.Š/..v½V......á. 0000C0
88FC4688 9007EB08 C4831473 187A9A50 FE76FF00 6A561274 D008FE56 89FC4689 .F▪.V±.Åt.Vj..v±P.z.s..á.Š...F▪. 0000E0
CB03D9F7 AEF2C033 F78B067E C4D98827 E30E4E88 1E5657EC 885590CB C95EFE56 V±^èù.U.ŠWV..N.D'.\ó~..¼3â·ÚÄ\.ù 000100
5DE5885F 5E1FC188 D1F74949 04740477 FF453A26 C933FF44 8AA6F30A 76C5FE88 .±év.µ[.D.3è&:E.w.t.II¼\.è.^_.[] 000120
79D2080E 750AF983 1374C00A 93FC071E 570A7EC5 1E08568B 0646880E 4E8800CB ù..N..F..V..é~.W..▪..ât..ª.u..Øy 000140
393C3004 D38792F1 F793F1F7 0274C008 D23392F7 88DAF700 D2830BF7 AA2D800A .¯-`¼Û.Ø.¼Ö.¼.3Ø.ât.¼þ.¼þ..Æ.0<9 000160
5F1F58DA 8CF272C7 38014480 FF448805 86AC4F05 88E275C3 08C288AA 27040276 v..'`.ô.ûuã..O˜...D..D.;úr·.ÖX._ 000180
830A47F6 26FA5EC4 1CEBF628 FC5E8CFA 4689057A 88560000 06C800CB 5DE5885E ^.[]ù.à...V|z..Fª.^▪+-Š.6^ª&-G.¯ 0001A0
D876FA46 39176A16 881768A1 0CFA4683 46017440 04C48314 E018F69A 53060E74 t..S.-.Å..á.@t.F.Fª.Åh...j.9Fªvİ 0001C0
19928857 56EC8855 CB5DE588 01FE4F80 04740808 065E88EC 885590CB C95EC688 .6^èù.U.Š.^..Üt..O±..[]ùW.ŠVWE.. 0001E0
```

Dump of file SATURN:[PCCOMMON.DUMP.DLL]SAM.TMP;1 on 18-APR-1990 10:52:28.45
File ID (911,26,0)   End of file block 69 / Allocated 72

Virtual block number 45 (0000002D), 512 (0200) bytes

```
04C79619 94A31992 A3FE2440 24EB99C0 33057501 76E80005 88071E29 75003F83 .?.u)..¡..Òv.u.3â.Š$@$±È..È...ú. 000000
D0E9CB5D E5885E5F 0009E8C0 8ED88C06 4E881998 3689FFFE FE44C704 C6830001 ...6.úD±±..6...N..Ä.âÒ.._^.[]ùÒÅ 000020
F003D08B 1573C138 48437401 A8FE88AD FC027788 F273EEF9 83FEE180 FA744100 .Atª.Ä±.ªŸs·.w.▪Ü.±´.tCH;ês..Å.þ 000040
E8058948 C12BFE4C 89F9030C 74FE88E6 E8FE4489 F78B0002 05C20335 7401A8AD Ü´.t5.ò....¼.D±Š[.±t..ª.L±+êH..Š 000060
0219A406 C626C302 7F8919A0 1E8C2605 74D13811 E689DA8C C688FE4C FEF90305 ..ª±L±.6.Ö¿[.;1t.&.......Ü&6.È.. 000080
C203E274 01A8ADF0 03D088BC 73C13848 FE88F274 01A8ADF0 03FE8825 74FFFE30 =±.t%.±.þÜ´.t·.±H;ês¥.Å.þÜ´.tã.6 0000A0
ABBFD88C 127419A4 0EFE2615 EBD88E04 74C00808 4788E6EB FE4489F7 88000205 ....¼.D±Š[.G..ât..ÄŠ.&±.È.t..Äe¨ 0000C0
E8984040 01240074 C63B0068 E8C03306 77888BEB 3788199C 1E8E2605 74C73816 .;út.&.....7ŠE.w.3âÒk.;ôt.$.@@.Ò 0000E0
078819A0 A3260474 C13816FF B9088C98 E84E4E96 0574001D E8FE4DFE 0074005F _.t.±M±Ò..t..NNŠ..Ä¿..;èt.&È.... 000100
EAD10476 19A21638 267FFFBA 414149C8 28037401 A8FE4588 51C399C0 33024789 ¯G.3â.ÙQ.E±´.t.+â[AA¤..&;.Å.v.1ô 000120
59C033E5 75EAD1D2 F7087500 0CE8C628 C22302F7 0072C203 1572C603 C188F575 uX.è.ór..ôr.¼Ø#ô+6Ò..u.¼Ø1ôu[3âY 000140
58FE5589 4AD72806 88067789 FFFEFE44 C7F203F0 88FE8857 18740010 E85152C3 ÛRQÒ..t.W.±.Þ.·ÙD±±..w..ø+▪J.U±X 000160
745B5A1F FFFA8308 C48315E7 17C49A1F 06500001 88505252 1ED23350 53C35A59 YZûSP3Ø.RRP¡..P...á.Ò..á..ª..Z[t 000180
720057E8 07754806 46880856 880146BF 3875000A 7E830657 56EC8855 C3D20802 ..ØÙU.ŠVW..~..uB¢F..V..F.Hu.ÒW.r 0001A0
FE8104C6 8334735E 003EE856 0E468902 44880D74 F73B1174 48054636 884CEB27 'ŠL.6F.Ht.;¼t..D..F.VÒ>.^s4.6..± 0001C0
C085F95B 0000FFFF 9A50C033 501652C4 885021EB 99FFFF88 0675D20B 04730546 F.s..Øu.|...Š[P.6R.P3âP.....[ª.â 0001E0
```

Dump of file SATURN:[PCCOMMON.DUMP.DLL]SAM.TMP;1 on 18-APR-1990 10:52:28.45
File ID (911,26,0)   End of file block 69 / Allocated 72

Virtual block number 46 (0000002E), 512 (0200) bytes

```
0C74024C 39F7880E 4E88CB5D E5885E5F 07C03303 88054636 89025C89 1489E675 ul...\..6F..Æ3â._^.[]ù.N..¼9L.t. 000000
13730140 1E390675 F738C18E D3882672 1C030A88 2CE8F9F2 750546FE 8104C683 .6..±F.u·ªŠ,.Ö..F&.Æ.ê;¼u.9.@.s. 000020
0C4E88EC 885500C3 D1880487 92014016 890475F7 38DE75C0 850000FF FF9A5153 SQ......âuB;¼u...@.....1û.U.Š.N. 000040
F3E9D1E0 8A0A4688 D128D187 D1030323 D81BD12B 0C74DAF7 D788067E C45738E3 DØWá~..▪¼Öt.+1.ÜWÆ.1.1+1.F..Å1Öµ 000060
08568806 46885FAA F3C913AB F3E9D1C3 8EFFFFC3 81C38C10 E3D187AA F3C913AB ¨.èµ`.1D..û.û...û1Öµ¨.èµ¯_.F..V. 000080
88E3F700 08CA5DE5 88E3F706 46880875 0A5E8808 080C5E88 084688EC 8855CB5D ]ùW.Š.F..^..Ä.^.u..F.¼D.[]ò..¼D. 0000A0
065EC4F6 28560000 04C80008 CA5DE588 D103E3F7 064688C8 030C66F7 064688C8 à.F.¼f..à.F.¼D.1.[]ò..à...V+-á^. 0000C0
F606086B F9F7000C 8999057A 20C38815 75080A47 F6265575 023C0324 0A478A26 &.G.$.<.ùU&-G..u..û-z..¿..¼ªkÄ.- 0000E0
0677FF26 0877FF26 50287EC0 08FC4689 06472826 07882606 5E883974 01116E87 .n..t9.^.&..&+G..F▪.â-(P&.w.&.w. 000100
C4FFFFBE 200A4F80 26065EC4 0874FC46 3808C483 17840F88 9A50E42A 08478A26 &.G.*ÒP...Ç..á.;F▪t.6^.&.O. ƒ..á 000120
0105000C CBC95EC6 88000004 47C72602 57892607 89260857 88260647 8826065E ^.&.G.&.W.&..&.W.&ûG....6^èù.... 000140
00020007 000411FA 01030005 00041232 01030000 0008194A 00020088 000418AD Ù.......J.......2.......ª....... 000160
01030026 00041863 01030022 00041818 010301DE 00081004 02030000 000A1734 4.......â...B.......ª...c...&... 000180
0000005C 00040DAD 0103005B 000400C0 0103004D 0004117C 0103003A 00040F84 Ç...:...|...M...á...[...Ù...\... 0001A0
6F43202D 20797261 7262694C 20656069 54206E75 5220534D 00000000 00000000 ........MS Run-Time Library - Co 0001C0
70726F43 2074666F 736F7263 6940202C 38383931 20296328 20746867 69727970 pyright (c) 1988, Microsoft Corp 0001E0
```

```
Dump of file SATURN:[PCCOMMON.DUMP.DLL]SAM.TMP;1 on 18-APR-1990 10:52:28.45
File ID (911,26,0)   End of file block 69 / Allocated 72

Virtual block number 47 (0000002F), 512 (0200) bytes

 6169746E 6174736E 49007463 656A626F 20657461 69746E61 74736E49 00000011 ....Instantiate object.Instantia 000000
 0000656D 616E2074 63656A62 6F206567 6E616843 00000074 63656A62 6F206574 te object...Change object name.. 000020
 00227325 22002273 25220022 73252200 22732522 00227325 22002273 25220000 .."%s"."%s"."%s"."%s"."%s"."%s". 000040
 25220022 73252200 22732522 00227325 22002273 25220022 73252200 22732522 "%s"."%s"."%s"."%s"."%s"."%s"."% 000060
 22732522 00227325 22002273 25220022 73252200 22732522 00227325 22002273 s"."%s"."%s"."%s"."%s"."%s"."%s" 000080
 22002273 25220022 73252200 22732522 00227325 22002273 25220022 73252200 ."%s"."%s"."%s"."%s"."%s"."%s"." 0000A0
 73252200 22732522 00227325 22002273 25220022 73252200 22732522 00227325 %s"."%s"."%s"."%s"."%s"."%s"."%s 0000C0
 00000000 00002320 2D2B0029 6C6C756E 2800296C 6C756E28 00002273 25220022 "."%s"..(null).(null).+- #...... 0000E0
 00000000 00000000 00000000 00000000 00000000 000019BE 1C401215 1C401C40 a.a...a.f....................... 000100
 00000000 00000000 00000000 00000000 00000000 00000000 00000000 00000000 ................................ 000120
 00000000 00000000 00000000 00000000 00000000 00000000 00000000 00000000 ................................ 000140
 00000000 00000000 00000000 00000000 00000000 00000000 00000000 00000000 ................................ 000160
 00000000 00000000 00000000 00000000 00000000 00000000 00000000 00000000 ................................ 000180
 00000000 00000000 00000000 00000000 00000000 00000000 00000000 00000000 ................................ 0001A0
 00000000 00000000 00000000 00000000 00000000 00000000 00000000 00000000 ................................ 0001C0
 00000000 00000000 00000000 00000000 00000000 00000000 00000000 00000000 ................................ 0001E0

Dump of file SATURN:[PCCOMMON.DUMP.DLL]SAM.TMP;1 on 18-APR-1990 10:52:28.45
File ID (911,26,0)   End of file block 69 / Allocated 72

Virtual block number 48 (00000030), 512 (0200) bytes

 00000000 00000000 00000000 00000000 00000000 00000000 00000000 00000000 ................................ 000000
 00000000 00000000 00000000 00000000 00000000 00000000 00000000 00000000 ................................ 000020
 00000000 00000000 00000000 00000000 00000000 00000000 00000000 00000000 ................................ 000040
 00000000 00000000 00000000 00000000 00000000 00000000 00000000 00000000 ................................ 000060
 00000000 00000000 00000000 00000000 00000000 00000000 00000000 00000000 ................................ 000080
 00000000 00000000 00000000 00000000 00000000 00000000 00000000 00000000 ................................ 0000A0
 00000000 00000000 00000000 00000000 00000000 00000000 00000000 00000000 ................................ 0000C0
 00000000 00000000 00000000 00000000 00000000 00000000 00000000 00000000 ................................ 0000E0
 00000000 00000000 00000000 00000000 00000000 00000000 00000000 00000000 ................................ 000100
 00000000 00000000 00000000 00000000 00000000 00000000 00000000 00000000 ................................ 000120
 00000000 00000000 00000000 00000000 00000000 00000000 00000000 00000000 ................................ 000140
 00000000 00000000 00000000 00000000 00000000 00000000 00000000 00000000 ................................ 000160
 00000000 00000000 00000000 00000000 00000000 00000000 00000000 00000000 ................................ 000180
 00000000 00000000 00000000 00000000 00000000 00000000 00000000 00000000 ................................ 0001A0
 00000000 00000000 00000000 00000000 00000000 00000000 00000000 00000000 ................................ 0001C0
 00000000 00000000 00000000 00000000 00000000 00000000 00000000 00000000 ................................ 0001E0

Dump of file SATURN:[PCCOMMON.DUMP.DLL]SAM.TMP;1 on 18-APR-1990 10:52:28.45
File ID (911,26,0)   End of file block 69 / Allocated 72

Virtual block number 49 (00000031), 512 (0200) bytes

 00000000 00000000 00000000 00000000 00000000 00000000 00000000 00000000 ................................ 000000
 00000000 00000000 00000000 00000000 00000000 00000000 00000000 00000000 ................................ 000020
 00000000 00000000 00000000 00000000 00000000 00000000 00000000 00000000 ................................ 000040
 00000000 00000000 00000000 00000000 00000000 00000000 00000000 00000000 ................................ 000060
 00000000 00000000 00000000 00000000 00000000 00000000 00000000 00000000 ................................ 000080
 00000000 00000000 00000000 00000000 00000000 00000000 00000000 00000000 ................................ 0000A0
 00000000 00000000 00000000 00000000 00000000 00000000 00000000 00000000 ................................ 0000C0
 00000000 00000000 00000000 00000000 00000000 00000000 00000000 00000000 ................................ 0000E0
 1360FFFF 13600000 0000003D 4F464E49 5F454C49 465F435F 01460000 00000000 ......F._C_FILE_INFO=.....`...`. 000100
 00000582 00000200 FFFFFFFF 01010000 00000568 13600564 13600560 1360055C \.`.`.`.a.`.h................... 000120
 00000202 00000000 00000000 00000102 00000000 00000000 00000001 198C0000 ..¥............................. 000140
 00000000 00000000 00000000 00000000 00000000 00000000 00000000 00000000 ................................ 000160
 00000000 00000000 00000000 00000000 00000000 00000000 00000000 00000000 ................................ 000180
 00000000 00000000 00000000 00000000 00000000 00000000 00000000 00000000 ................................ 0001A0
 00000000 00000000 00000000 00000000 00000000 00000000 00000000 00000000 ................................ 0001C0
 00000000 00000000 00000000 00000000 00000000 00000000 00000000 00000000 ................................ 0001E0
```

```
Dump of file SATURN:[PCCOMMON.DUMP.DLL]SAM.TMP;1 on 18-APR-1990 10:52:28.45
File ID (911,26,0)   End of file block 69 / Allocated 72

Virtual block number 50 (00000032), 512 (0200) bytes

 00000000 00000000 00000000 00000000 00000000 00000000 00000000 00000000 ................................ 000000
 00000000 00000000 00000000 00000000 00000000 00000000 00000000 00000000 ................................ 000020
 00000000 00000000 00000000 00000000 00000000 00000000 00000000 00000000 ................................ 000040
 00000000 00000000 00000000 00000000 00000000 00000000 00000000 00000000 ................................ 000060
 00000000 00000000 00000000 00000000 00000000 00000000 00000000 00000000 ................................ 000080
 00000000 00000000 00000000 00000000 00000000 00000000 00000000 00000000 ................................ 0000A0
 00000000 00000000 00000000 00000000 00000000 00000000 00000000 00000000 ................................ 0000C0
 00000000 00000000 00000000 00000000 00000000 00000000 00000000 00000000 ................................ 0000E0
 00000000 00000000 00000000 00000000 00000000 00000000 00000000 00000000 ................................ 000100
 00000000 00000000 00000000 00000000 00000000 00000000 00000000 00000000 ................................ 000120
 00000000 00000000 00000000 00000000 00000000 00000000 00000000 00000000 ................................ 000140
 00000000 00000000 00000000 00000000 00000000 00000000 00000000 00000000 ................................ 000160
 00000000 00000000 00000000 00000000 00000000 00000000 00000000 00000000 ................................ 000180
 00000000 00000000 00000000 00000000 00000000 00000000 00000000 00000000 ................................ 0001A0
 00000000 00000000 00000000 00000000 00000000 00000000 00000000 00000000 ................................ 0001C0
 00000000 00000000 00000000 00000000 00000000 00000000 00000000 00000000 ................................ 0001E0

Dump of file SATURN:[PCCOMMON.DUMP.DLL]SAM.TMP;1 on 18-APR-1990 10:52:28.45
File ID (911,26,0)   End of file block 69 / Allocated 72

Virtual block number 51 (00000033), 512 (0200) bytes

 00000000 00000000 00000000 00000000 00000000 00000000 00000000 00000000 ................................ 000000
 00000000 00000000 00000000 00000000 00000000 00000000 00000000 00000000 ................................ 000020
 00000000 00000000 00000000 00000000 00000000 00000000 00000000 00000000 ................................ 000040
 00000000 00000000 00000000 00000000 00000000 00000000 00000000 00000000 ................................ 000060
 00000000 00000000 00000000 00000000 00000000 00000000 00000000 00000000 ................................ 000080
 00000000 00000000 00000000 00000000 00000000 00000000 00000000 00000000 ................................ 0000A0
 00000000 00000000 00000000 00000000 00000000 00000000 00000000 00000000 ................................ 0000C0
 00000000 00000000 00000000 00000000 00000000 00000000 00000000 00000000 ................................ 0000E0
 00000000 00000000 00000000 00000000 00000000 00000000 00000000 00000000 ................................ 000100
 00000000 00000000 00000000 00000000 00000000 00000000 00000000 00000000 ................................ 000120
 00000000 00000000 00000000 00000000 00000000 00000000 00000000 00000000 ................................ 000140
 00000000 00000000 00000000 00000000 00000000 00000000 00000000 00000000 ................................ 000160
 00000000 00000000 00000000 00000000 00000000 00000000 00000000 00000000 ................................ 000180
 00000000 00000000 00000000 00000000 00000000 00000000 00000000 00000000 ................................ 0001A0
 00000000 00000000 00000000 00000000 00000000 00000000 00000000 00000000 ................................ 0001C0
 00000000 00000000 00000000 00000000 00000000 00000000 00000000 00000000 ................................ 0001E0

Dump of file SATURN:[PCCOMMON.DUMP.DLL]SAM.TMP;1 on 18-APR-1990 10:52:28.45
File ID (911,26,0)   End of file block 69 / Allocated 72

Virtual block number 52 (00000034), 512 (0200) bytes

 00000000 00000000 00000000 00000000 00000000 00000000 00000000 00000000 ................................ 000000
 00000000 00000000 00000000 00000000 00000000 00000000 00000000 00000000 ................................ 000020
 00000000 00000000 00000000 00000000 00000000 00000000 00000000 00000000 ................................ 000040
 00000000 00000000 00000000 00000000 00000000 00000000 00000000 00000000 ................................ 000060
 00000000 00000000 00000000 00000000 00000000 00000000 00000000 00000000 ................................ 000080
 00000000 00000000 00000000 00000000 00000000 00000000 00000000 00000000 ................................ 0000A0
 00000000 00000000 00000000 00000000 00000000 00000000 00000000 00000000 ................................ 0000C0
 00000000 00000000 00000000 00000000 00000000 00000000 00000000 00000000 ................................ 0000E0
 00000000 00000000 00000000 00000000 00000000 00000000 00000000 00000000 ................................ 000100
 00000000 00000000 00000000 00000000 00000000 00000000 00000000 00000000 ................................ 000120
 00000000 00000000 00000000 00000000 00000000 00000000 00000000 00000000 ................................ 000140
 00000000 00000000 00000000 00000000 00000000 00000000 00000000 00000000 ................................ 000160
 00000000 00000000 00000000 00000000 00000000 00000000 00000000 00000000 ................................ 000180
 00000000 00000000 00000000 00000000 00000000 00000000 00000000 00000000 ................................ 0001A0
 00000000 00000000 00000000 00000000 00000000 00000000 00000000 00000000 ................................ 0001C0
 00000000 00000000 00000000 00000000 00000000 00000000 00000000 00000000 ................................ 0001E0
```

```
Dump of file SATURN:[PCCOMMON.DUMP.DLL]SAM.TMP;1 on 18-APR-1990 10:52:28.45
File ID (911,26,0)   End of file block 69 / Allocated 72

Virtual block number 53 (00000035), 512 (0200) bytes

00000000 00000000 00000000 00000000 00000000 00000000 00000000 00000000 ................................ 000000
00000000 00000000 00000000 00000000 00000000 00000000 00000000 00000000 ................................ 000020
00000000 00000000 00000000 00000000 00000000 00000000 00000000 00000000 ................................ 000040
00000000 00000000 00000000 00000000 00000000 00000000 00000000 00000000 ................................ 000060
00000000 00000000 00000000 00000000 00000000 00000000 00000000 00000000 ................................ 000080
00000000 00000000 00000000 00000000 00000000 00000000 00000000 00000000 ................................ 0000A0
00000000 00000000 00000000 00000000 00000000 00000000 00000000 00000000 ................................ 0000C0
00000000 00000000 00000000 00000000 00000000 00000000 00000000 00000000 ................................ 0000E0
00000000 00000000 00000000 00000000 00000000 00000000 00000000 00000000 ................................ 000100
00000000 00000000 00000000 00000000 00000000 00000000 00000000 00000000 ................................ 000120
00000000 00000000 00000000 00000000 00000000 00000000 00000000 00000000 ................................ 000140
00000000 00000000 00000000 00000000 00000000 00000000 00000000 00000000 ................................ 000160
00000000 00000000 00000000 00000000 00000000 00000000 00000000 00000000 ................................ 000180
00000000 00000000 00000000 00000000 00000000 00000000 00000000 00000000 ................................ 0001A0
00000000 00000000 00000000 00000000 00000000 00000000 00000000 00000000 ................................ 0001C0
00000000 00000000 00000000 00000000 00000000 00000000 00000000 00000000 ................................ 0001E0

Dump of file SATURN:[PCCOMMON.DUMP.DLL]SAM.TMP;1 on 18-APR-1990 10:52:28.45
File ID (911,26,0)   End of file block 69 / Allocated 72

Virtual block number 54 (00000036), 512 (0200) bytes

00000000 00000000 00000000 00000000 00000000 00000000 00000000 00000000 ................................ 000000
00000000 00000000 00000000 00000000 00000000 00000000 00000000 00000000 ................................ 000020
00000000 00000000 00000000 00000000 00000000 00000000 00000000 00000000 ................................ 000040
00000000 00000000 00000000 00000000 00000000 00000000 00000000 00000000 ................................ 000060
00000000 00000000 00000000 00000000 00000000 00000000 00000000 00000000 ................................ 000080
00000000 00000000 00000000 00000000 00000000 00000000 00000000 00000000 ................................ 0000A0
00000000 00000000 00000000 00000000 00000000 00000000 00000000 00000000 ................................ 0000C0
00000000 00000000 00000000 00000000 00000000 00000000 00000000 00000000 ................................ 0000E0
00000000 00000000 00000000 00000000 00000000 00000000 00000000 00000000 ................................ 000100
00000000 00000000 00000000 00000000 00000000 00000000 00000000 00000000 ................................ 000120
0000C000 00000000 00000000 00000000 00000000 00000000 00000000 00000000 ................................ 000140
00000000 00000000 00000000 00000000 00000000 00000000 00000000 00000000 ................................ 000160
00000000 00000000 00000000 00000000 00000000 00000000 00000000 00000000 ................................ 000180
00000000 00000000 00000000 00000000 00000000 00000000 00000000 00000000 ................................ 0001A0
00000000 00000000 00000000 00000000 00000000 00000000 00000000 00000000 ................................ 0001C0
00000000 00000000 00000000 00000000 00000000 00000000 00000000 00000000 ................................ 0001E0

Dump of file SATURN:[PCCOMMON.DUMP.DLL]SAM.TMP;1 on 18-APR-1990 10:52:28.45
File ID (911,26,0)   End of file block 69 / Allocated 72

Virtual block number 55 (00000037), 512 (0200) bytes

00000000 00000000 00000000 00000000 00000000 00000000 00000000 00000000 ................................ 000000
00000000 00000000 00000000 00000000 00000000 00000000 00000000 00000000 ................................ 000020
00000000 00000000 00000000 00000000 00000000 00000000 00000000 00000000 ................................ 000040
00000000 00000000 00000000 00000000 00000000 00000000 00000000 00000000 ................................ 000060
00000000 00000000 00000000 00000000 00000000 00000000 00000000 00000000 ................................ 000080
00000000 00000000 00000000 00000000 00000000 00000000 00000000 00000000 ................................ 0000A0
00000000 00000000 00000000 00000000 00000000 00000000 00000000 00000000 ................................ 0000C0
00000000 00000000 00000000 00000000 00000000 00000000 00000000 00000000 ................................ 0000E0
00000000 00000000 00000000 00000200 00010000 00000000 00000000 00000000 ................................ 000100
00000000 00000000 00000000 00000000 00000000 00000000 00000000 00000000 ................................ 000120
00000000 00000000 00000000 00000000 00000000 00000000 00000000 00000000 ................................ 000140
00000000 00000000 00000000 00000000 00000000 00000000 00000000 00000000 ................................ 000160
00000000 00000000 00000000 00000000 00000000 00000000 00000000 00000000 ................................ 000180
00000000 00000000 00000000 00000000 00000000 00000000 00000000 00000000 ................................ 0001A0
00000000 00000000 00000000 00000000 00000000 00000000 00000000 00000000 ................................ 0001C0
00000000 00000000 00000000 00000000 00000000 00000000 00000000 00000000 ................................ 0001E0
```

```
Dump of file SATURN:[PCCOMMON.DUMP.DLL]SAM.TMP;1 on 18-APR-1990 10:52:28.45
File ID (911,26,0)    End of file block 69 / Allocated 72

Virtual block number 56 (00000038), 512 (0200) bytes

00000000 00000000 00000000 00000000 00000000 00000000 00000000 00000000 ................................ 000000
00000000 00000000 00000000 00000000 00000000 00000000 00000000 00000000 ................................ 000020
00000000 00000000 00000000 00000000 00000000 00000000 00000000 00000000 ................................ 000040
00000000 00000000 00000000 00000000 00000000 00000000 00000000 00000000 ................................ 000060
00000000 00000000 00000000 00000000 00000000 00000000 00000000 00000000 ................................ 000080
00000000 00000000 00000000 00000000 00000000 00000000 00000000 00000000 ................................ 0000A0
00000000 00000000 00000000 00000000 00000000 00000000 00000000 00000000 ................................ 0000C0
00000000 00000000 00000000 00000000 00000000 00000000 00000000 00000000 ................................ 0000E0
00000000 00000000 00000000 00000000 00000000 00000000 00000000 00000000 ................................ 000100
00000000 00000000 00000000 00000000 00000000 00000000 00000000 00000000 ................................ 000120
00000000 00000000 00000000 00000000 00000000 00000000 00000000 00000000 ................................ 000140
00000000 00000000 00000000 00000000 00000000 00000000 00000000 00000000 ................................ 000160
00000000 00000000 00000000 00000000 00000000 00000000 00000000 00000000 ................................ 000180
00000000 00000000 00000000 00000000 00000000 00000000 00000000 00000000 ................................ 0001A0
00000000 00000000 00000000 00000000 00000000 00000000 00000000 00000000 ................................ 0001C0
00000000 00000000 00000000 00000000 00000000 00000000 00000000 00000000 ................................ 0001E0

Dump of file SATURN:[PCCOMMON.DUMP.DLL]SAM.TMP;1 on 18-APR-1990 10:52:28.45
File ID (911,26,0)    End of file block 69 / Allocated 72

Virtual block number 57 (00000039), 512 (0200) bytes

00000000 00000000 00000000 00000000 00000000 00000000 00000000 00000000 ................................ 000000
00000000 00000000 00000000 00000000 00000000 00000000 00000000 00000000 ................................ 000020
00000000 00000000 00000000 00000000 00000000 00000000 00000000 00000000 ................................ 000040
00000000 00000000 00000000 00000000 00000000 00000000 00000000 00000000 ................................ 000060
00000000 00000000 00000000 00000000 00000000 00000000 00000000 00000000 ................................ 000080
00000000 00000000 00000000 00000000 00000000 00000000 00000000 00000000 ................................ 0000A0
00000000 00000000 00000000 00000000 00000000 00000000 00000000 00000000 ................................ 0000C0
00000000 00000000 00000000 00000000 00000000 00000000 00000000 00000000 ................................ 0000E0
00000000 00000000 00000000 00000000 00000000 00000000 00000000 00000000 ................................ 000100
00000000 00000000 00000000 00000000 00000000 00000000 00000000 00000000 ................................ 000120
00000000 00000000 00000000 00000000 00000000 00000000 00000000 00000000 ................................ 000140
00000000 00000000 00000000 00000000 00000000 00000000 00000000 00000000 ................................ 000160
00000000 00000000 00000000 00000000 00000000 00000000 00000000 00000000 ................................ 000180
00000000 00000000 00000000 00000000 00000000 00000000 00000000 00000000 ................................ 0001A0
00000000 00000000 00000000 00000000 00000000 00000000 00000000 00000000 ................................ 0001C0
00000000 00000000 00000000 00000000 00000000 00000000 00000000 00000000 ................................ 0001E0

Dump of file SATURN:[PCCOMMON.DUMP.DLL]SAM.TMP;1 on 18-APR-1990 10:52:28.45
File ID (911,26,0)    End of file block 69 / Allocated 72

Virtual block number 58 (0000003A), 512 (0200) bytes

00000000 00000000 00000000 00000000 00000000 00000000 00000000 00000000 ................................ 000000
00000000 00000000 00000000 00000000 00000000 00000000 00000000 00000000 ................................ 000020
00000000 00000000 00000000 00000000 00000000 00000000 00000000 00000000 ................................ 000040
00000000 00000000 00000000 00000000 00000000 00000000 00000000 00000000 ................................ 000060
00000000 00000000 00000000 00000000 00000000 00000000 00000000 00000000 ................................ 000080
00000000 00000000 00000000 00000000 00000000 00000000 00000000 00000000 ................................ 0000A0
00000000 00000000 00000000 00000000 00000000 00000000 00000000 00000000 ................................ 0000C0
00000000 00000000 00000000 00000000 00000000 00000000 00000000 00000000 ................................ 0000E0
00000000 00000000 00000000 00000000 00000000 00000000 00000000 00000000 ................................ 000100
81010000 00010000 00000000 00000000 00000000 01481162 00000000 00000000 ........b.H..................... 000120
00000000 00000000 00000000 00000000 00000000 00000000 00000000 00008181 ................................ 000140
00000000 00000000 00000000 00000000 00000000 00000000 00000000 00000000 ................................ 000160
00000000 00000000 00000000 00000000 00000000 00000000 00000000 00000000 ................................ 000180
00000000 00000000 00000000 00000000 00000000 00000000 00000000 00000000 ................................ 0001A0
00000000 00000000 00000000 00000000 00000000 00000000 00000000 00000000 ................................ 0001C0
00000000 00000000 00000000 00000000 00000000 00000000 00000000 00000000 ................................ 0001E0
```

```
Dump of file SATURN:[PCCOMMON.DUMP.DLL]SAM.TMP;1 on 18-APR-1990 10:52:28.45
File ID (911,26,0)    End of file block 69 / Allocated 72

Virtual block number 59 (0000003B), 512 (0200) bytes

 00000000 00000000 00000000 00000000 00000000 00000000 00000000 00000000 ................................ 000000
 0A000000 00000000 00000000 00000000 00000000 00000000 00000000 00000000 ................................ 000020
 0A0A0A0A 0A0A0A0A 0A0A0A0A 0A0A0A0A 0A0A0A0A 0A0A0A0A 0A0A0A0A 0A0A0A0A ................................ 000040
 0A0A0A0A 0A0A0A0A 0A0A0A0A 0A0A0A0A 0A0A0A0A 0A0A0A0A 0A0A0A0A 0A0A0A0A ................................ 000060
 0A0A0A0A 0A0A0A0A 0A0A0A0A 0A0A0A0A 0A0A0A0A 0A0A0A0A 0A0A0A0A 0A0A0A0A ................................ 000080
 0A0A0A0A 0A0A0A0A 0A0A0A0A 0A0A0A0A 0A0A0A0A 0A0A0A0A 0A0A0A0A 0A0A0A0A ................................ 0000A0
 0A0A0A0A 0A0A0A0A 0A0A0A0A 0A0A0A0A 0A0A0A0A 0A0A0A0A 0A0A0A0A 0A0A0A0A ................................ 0000C0
 0A0A0A0A 0A0A0A0A 0A0A0A0A 0A0A0A0A 0A0A0A0A 0A0A0A0A 0A0A0A0A 0A0A0A0A ................................ 0000E0
 0A0A0A0A 0A0A0A0A 0A0A0A0A 0A0A0A0A 0A0A0A0A 0A0A0A0A 0A0A0A0A 0A0A0A0A ................................ 000100
 000A0A0A 0A0A0A0A 0A0A0A0A 0A0A0A0A 0A0A0A0A 0A0A0A0A 0A0A0A0A 0A0A0A0A ................................ 000120
 00000000 00000000 00000000 00000000 00000000 00000000 00000000 00000000 ................................ 000140
 FFFF19BA 1988FFFF 056C15C6 00000000 00000000 00000000 00000000 20000000 ... .................6.l...j.¤... 000160
 6F6C6672 65766F20 68636174 7320200A 00303030 36520000 3E3E4753 4D4E3C3C <<NMSG>>..R6000..- stack overflo 000180
 79622065 64697669 64207265 6765746E 6920200A 00333030 36520003 000A0077 w.....R6003..- integer divide by 0001A0
 65636170 73206867 756F6E65 20746F6E 20200A00 38303036 52000800 0A003020  0.....R6008..- not enough space 0001C0
 20746F6E 20200A00 39303036 52000900 0A007374 6E656D75 67726120 726F6620  for arguments.....R6009..- not  0001E0

Dump of file SATURN:[PCCOMMON.DUMP.DLL]SAM.TMP;1 on 18-APR-1990 10:52:28.45
File ID (911,26,0)    End of file block 69 / Allocated 72

Virtual block number 60 (0000003C), 512 (0200) bytes

 FC000A00 746E6560 6E6F7269 766E6520 726F6620 65636170 73206867 756F6E65 enough space for environme ...  000000
 200A0032 30303652 00020020 726F7272 65206560 6974206E 757200FF 000A0000 ......run-time error ...R60U2..- 000020
 FFFFFF00 0A006465 64616F6C 20746F6E 20746E69 6F702067 6E697461 6F6C6620  floating point not loaded...... 000040
 00000000 00000000 000A176A 00020000 0009057C 00020000 00081986 00020003 ....R.......|.......j........... 000060
 74207373 656C2065 62207473 75602073 25206560 616E2074 63656A62 4F390352 R.9Object name %s must be less t 000080
 6A624F20 00687467 6E656C20 6E692073 72657463 61726168 63203537 206E6168 han 75 characters in length.-Obj 0000A0
 68742073 65737520 79646165 726C6120 65707974 20736968 7420666F 20746365 ect of this type already uses th 0000C0
 6F206E41 202E6469 6C617620 746F6E20 73692073 25790073 25206560 616E2065 e name %s.y%s is not valid. An o 0000E0
 20656874 20796C6E 6F206E69 61746E6F 63207961 60206560 616E2074 63656A62 bject name may contain only the  000100
 73656361 7073202C 39203020 2C7A2061 202C5A20 41207372 65746361 72616863 characters A-Z, a-z, 0-9, spaces 000120
 726F202C 24202C26 202C7365 726F6373 7265646E 75202C73 6E656870 7968202C , hyphens, underscores, &, $, or 000140
 69666963 65707320 65622074 73756020 6560616E 20746365 6A624F1E 002E2320  #...Object name must be specifi 000160
 6C6C6120 65622074 6F6E6E61 63206560 616E2074 63656A62 6F206E41 24006465 ed.$An object name cannot be all 000180
 656A626F 20726574 63617261 68632065 6E6F2079 6C6E4F28 00736563 61707320  spaces.(Only one character obje 0001A0
 6E696873 61602064 696C6176 6E493600 2E646577 6F6C6C61 20656061 6E207463 ct name allowed..6Invalid maskin 0001C0
 72612027 3F272065 726F6E20 272A2720 72656874 69656E20 3A646C65 69662067 g field: neither '*' nore '?' ar 0001E0

Dump of file SATURN:[PCCOMMON.DUMP.DLL]SAM.TMP;1 on 18-APR-1990 10:52:28.45
File ID (911,26,0)    End of file block 69 / Allocated 72

Virtual block number 61 (0000003D), 512 (0200) bytes

 203A646C 65696620 676E6968 73616D20 64696C61 766E4938 002E6465 73752065 e used..8Invalid masking field:  000000
 2E646573 75206562 20746F6E 6E616320 273F2720 646E6120 272A2720 68746F62 both '*' and '?' cannot be used. 000020
 6E6F2079 6C6E6F20 3A646C65 69662067 6E696B73 61602064 696C6176 6E493100 .1Invalid masking field: only on 000040
 6873616D 2064696C 61766E49 47002E64 65737520 6562206E 61632027 2A272065 e '*' can be used..GInvalid mask 000060
 70756F72 67206562 20747375 6D20273F 2E2E2E3F 27203A64 6C656966 20676E69 ing field: '?...?' must be group 000080
 61766E49 4D002E64 6C656966 20687361 6D206E69 20726568 7465676F 74206465 ed together in mask field..MInva 0000A0
 6620656D 616E2074 63656A62 6F203A64 6C656966 20676E69 6B73616D 2064696C lid masking field: object name f 0000C0
 74206562 20747375 6D20273F 2720666F 20726562 6D756E20 646E6120 646C6569 ield and number of '?' must be t 0000E0
 3A646C65 69662067 6E696B73 616D2064 696C6176 6E494800 2E656D61 73206568 he same..HInvalid masking field: 000100
 6F207364 65656378 65206560 616E2074 63656A62 6F20746E 61746C75 73657220  resultant object name exceeds o 000120
 00000000 00000001 00010001 00010068 74676E65 6C20656D 616E2074 63656A62 bject name length............... 000140
 7420746F 6E206572 61207325 20646E61 20732520 73746365 6A624F28 00010352 R...(Objects %s and %s are not t 000160
 7463656A 626F206F 77742079 6C746361 78452F00 65707974 20656D61 73206568 he same type./Exactly two object 000180
 6C464200 65677265 6D20726F 66206465 7463656C 65732065 62207473 756D2073 s must be selected for merge.BFl 0001A0
 656D6173 20656874 20657661 68207473 756D2073 2520646E 61207325 2073776F ows %s and %s must have the same 0001C0
 00737463 656A626F 206E6F69 74616E69 74736564 20646E61 20656372 756F7320  source and destination objects. 0001E0
```

```
Dump of file SATURN:[PCCOMMON.DUMP.DLL]SAM.TMP;1 on 18-APR-1990 10:52:28.45
File ID (911,26,0)   End of file block 69 / Allocated 72

Virtual block number 62 (0000003E), 512 (0200) bytes

656C6269 74617060 6F636E69 20657261 20732520 646E6120 73252073 442F5345 ES/Ds %s and %s are incompatible 000000
6920656E 6F20646E 6120442F 53206065 74737973 20612073 6920656E 4F20202E .  One is a system S/D and one i 000020
69206572 61207325 20646E61 20732520 73657373 65636F72 50470074 6F6E2073 s not.GProcesses %s and %s are i 000040
61206576 69746960 69727020 73692065 6E4F2020 2E656C62 69746170 606F636E ncompatible.  One is primitive a 000060
73252073 6C65646F 60207373 65636F72 504F0074 6F6E2073 6920656E 6F20646E nd one is not.OProcess models %s 000080
20676E69 68637461 60206E69 61746E6F 6320746F 6E206F64 20732520 646E6120  and %s do not contain matching  0000A0
5346003F 65677265 60206575 6E69746E 6F432020 2E73442F 53206065 74737973 system S/Ds.  Continue merge?.FS 0000C0
746E6F63 20746F6E 206F6420 73252064 6E612073 25207344 2F53206D 65747379 ystem S/Ds %s and %s do not cont 0000E0
65602065 756E6974 6E6F4320 202E7377 6F6C6620 676E6968 63746160 206E6961 ain matching flows.  Con'inue me 000100
73797320 6120746F 6E207369 20732520 442F5320 65637275 6F533400 3F656772 rge?.4Source S/D %s is no  a sys 000120
65677261 5434003F 65677265 60206575 6E69746E 6F432020 2E442F53 20606574 tem S/D.  Continue merge?.4:arge 000140
4320202E 442F5320 60657473 79732061 20746F6E 20736920 73252044 2F532074 t S/D %s is not a system S/D.  C 000160
6F642073 2520442F 53206065 74737953 38003F65 6772656D 2065756E 69746E6F ontinue merge?.8System S/D %s do 000180
65756E69 746E6F43 20202E77 6F6C666E 69206E61 20657661 6820746F 6E207365 es not have an inflow.  Continue 0001A0
6E6F2064 6C756F68 73207325 20442F53 20606574 7379533C 003F6567 72656020  merge?.<System S/D %s should on 0001C0
656D2065 756E6974 6E6F4320 202E776F 6C666E69 20656E6F 20657661 6820796C ly have one inflow.  Continue me 0001E0

Dump of file SATURN:[PCCOMMON.DUMP.DLL]SAM.TMP;1 on 18-APR-1990 10:52:28.45
File ID (911,26,0)   End of file block 69 / Allocated 72

Virtual block number 63 (0000003F), 512 (0200) bytes

76616820 746F6E20 73656F64 20732520 442F5320 60657473 79533900 3F656772 rge?.9System S/D %s does not hav 000000
30003F65 67726560 2065756E 69746E6F 4320202E 776F6C66 74756F20 6E612065 e an outflow.  Continue merge?.= 000020
6F206576 61682079 6C6E6F20 646C756F 68732073 2520442F 53206065 74737953 System S/D %s should only have o 000040
6F433C00 3F656772 656D2065 756E6974 6E6F4320 202E776F 6C667475 6F20656E ne outflow.  Continue merge?.<Co 000060
6F727020 6C65646F 4D207373 65636F72 50207373 65636361 20746F6E 20646C75 uld not access Process Model pro 000080
65636F72 5026002E 656C6966 6F727020 68636568 43202E61 74616420 656C6966 file data. Check profile..&Proce 0000A0
2E64616F 6C206F74 2064656C 69616620 656C6966 6F727020 6C65646F 4D207373 ss Model profile failed to load. 0000C0
6F732064 6E612077 6F6C6620 41420352 00000000 00000000 00000000 00000000 ................R.BA flow and so 0000E0
64657463 656C6573 20656220 7473756D 20746365 6A626F20 72656874 6F206560 me other object must be selected 000100
73252072 65687469 654E4C00 2E6D726F 66736E61 72742073 69687420 726F6620  for this transform..LNeither %s 000120
6D207463 656A626F 20656E4F 20202E73 776F6C66 20657261 20732520 726F6E20  nor %s are flows.  One object m 000140
60726F66 736E6172 74207369 68742062 6F662077 6F6C6620 61206562 20747375 ust be a flow for this transform 000160
6C662068 746F6220 65726120 73252064 6E612073 25207374 63656A62 4F55002E ..UObjects %s and %s are both fl 000180
63656C65 73206562 206E6163 20776F6C 6620656E 6F20796C 6E4F2020 2E73776F ows.  Only one flow can be selec 0001A0
20656372 756F5359 002E6D72 6F66736E 61727420 73696874 20726F66 20646574 ted for this transform..YSource  0001C0
4620202E 65606173 20737463 656A626F 206E6F69 74616E69 74736564 20646E61 and destination objects same.  F 0001E0

Dump of file SATURN:[PCCOMMON.DUMP.DLL]SAM.TMP;1 on 18-APR-1990 10:52:28.45
File ID (911,26,0)   End of file block 69 / Allocated 72

Virtual block number 64 (00000040), 512 (0200) bytes

65637275 6F732065 60617320 65687420 65766168 20746F6E 6E616320 73776F6C lows cannot have the same source 000000
00010001 00010001 00010001 0001002E 6E6F6974 616E6974 73656420 646E6120  and destination................ 000020
73756020 73736563 6F727020 41380352 00000000 00000001 00010001 00010001 ................R.8A process mus 000040
61646E75 6F622061 20657461 65726320 6F742064 65746365 6C657320 65622074 t be selected to create a bounda 000060
70206120 746F6E20 73692073 25207463 656A624F 50002E64 6E756F72 61207972 ry around..PObject %s is not a p 000080
73206562 206E6163 20736573 7365636F 72702079 6C6E4F20 202E7373 65636F72 rocess.  Only processes can be s 0000A0
6A624F5A 002E6D72 6F66736E 61727420 73696874 20726F66 20646574 63656C65 elected for this transform..ZObj 0000C0
4F20202E 73736563 6F727020 746F6F72 20612074 6F6E2073 69207325 20746365 ect %s is not a root process.  O 0000E0
7463656C 65732065 62206E61 63207365 73736563 6F727020 746F6F72 20796C6E nly root processes can be select 000100
01000100 01000100 01002E6D 726F6673 6E617274 20736968 7420726F 66206465 ed for this transform........... 000120
00000000 00000000 00000000 00000000 01000100 01000100 01000100 01000100 ................................ 000140
6F742064 65746365 6C657320 65622074 73756D20 73736563 6F727020 41270352 R.'A process must be selected to 000160
6F6C6620 6F6E2073 61682073 25207373 65636F72 505E002E 65646F6C 70786520  explode..^Process %s has no flo 000180
73736563 6F727020 4120202E 74692066 6F207475 6F20726F 206F746E 69207377 ws into or out of it.  A process 0001A0
70786520 6F742072 6564726F 206E6920 73776F6C 66206576 61682074 73756D20  must have flows in order to exp 0001C0
63656A62 6F207373 65636F72 7020656E 6F20796C 6E4F3400 2E746920 65646F6C lode it..4Only one process objec 0001E0
```

```
Dump of file SATURN:[PCCOMMON.DUMP.DLL]SAM.TMP;1 on 18-APR-1990 10:52:28.45
File ID (911,26,0)    End of file block 69 / Allocated 72

Virtual block number 65 (00000041), 512 (0200) bytes

 254A002E 65646F6C 70786520 6F742064 65746365 6C657320 65622079 61602074 t may be selected to explode..J% 000000
 7365636F 72702079 6C6E4F20 202E7373 65636F72 70206120 746F6E20 73692073 s is not a process.  Only proces 000020
 78652072 6F662064 65746365 6C657320 6562206E 61632073 7463656A 626F2073 s objects can be selected for ex 000040
 01000100 01000100 01000100 01000100 01000100 01000100 2E6E6F69 736F6C70 plosion......................... 000060
 62207473 756D2077 6F6C6620 413B0352 00000000 00000000 00000000 00000000 ................R.;A flow must b 000080
 6C207461 20746120 73736563 6F727020 61206F74 20646574 63656E6E 6F632065 e connected to a process at at l 0000A0
 61207465 7920746F 6E206572 75746165 461A002E 646E6520 656E6F20 74736165 east one end...Feature not yet a 0000C0
 656C6261 6C696176 61207465 7920746F 6E20706C 65481700 656C6261 6C696176 vailable..Help not yet available 0000E0
 6F6E686E 55120072 6F727265 204D524F 46582041 53206C61 6E726574 6E491800 ..Internal SA-XFORM error..Unkno 000100
 01000100 01000100 01000100 01000100 01000100 7825203A 726F7272 65206E77 wn error: %x.................... 000120
 6772656D 206C616E 7265746E 49160352 00000000 00000000 00000000 00000100 ................R..Internal merg 000140
 01000100 01000100 01000100 01000100 01000100 01000100 2E726F72 72652065 e error......................... 000160
 00000000 FFFF0001 000E0352 000001BE 00000000 00000000 00000100 01000100 ................/...R........... 000180
 00000000 0173FFFF 00640070 00840038 00671400 00900158 001A0001 0000000A ........X.....g.8.Ç.p.d...s..... 0001A0
 00000000 0000FFFF FFFF0065 0008003C 00630005 80000001 01770005 00050000 ......w.......c.<...e........... 0001C0
 00050000 00000000 FFFFFFFF 00660008 00AA0059 00058002 000C017D 00000006 ....).......Y.¨...f............. 0001E0

Dump of file SATURN:[PCCOMMON.DUMP.DLL]SAM.TMP;1 on 18-APR-1990 10:52:28.45
File ID (911,26,0)    End of file block 69 / Allocated 72

Virtual block number 66 (00000042), 512 (0200) bytes

 00000006 00000000 0000FFFF FFFF0067 0008005A 004F0005 80000001 017E0013 ..~.......O.Z...g............... 000000
 01930013 00050000 00000000 FFFFFFFF 00680008 00AA0045 00058002 000C0192 ........E.¨...h................. 000020
 000001A7 00000007 00000000 0000FFFF FFFF0069 0008005A 003B0005 80000001 ......;.Z...i...............Ï... 000040
 80020000 01A80003 00030000 00000000 FFFFFFFF 006A0020 00AA0019 00058000 ......'. .j...............´..... 000060
 00328003 040001AC 00050003 00000000 0000FFFF FFFF0001 000C0023 00050005 ....#....................¯.....2. 000080
 0005005F 80020000 01820006 00030000 00000000 FFFFFFFF 0068000C 00230005 ..#...k...............ý....._... 0000A0
 00230005 008C8002 010001B9 00040003 00000000 0000FFFF FFFF0002 000C0023 #...................¿.........#. 0000C0
 6F697461 6E697473 65642F65 6372756F 73206574 61657243 FFFFFFFF 006C000C ..l.....Create source/destinatio 0000E0
 6E6F6974 616E6974 7365642F 65637275 6F530000 3A687361 4D000000 0300736E ns.....Mask:..Source/destination 000100
 6C707041 004B4F7E 0000736E 6F697461 6E697473 65642F65 6372756F 5300003A :..Source/destinations..~OK.Appl 000120
 00000000 FFFF0001 000E0352 0000019F 00000070 6C654800 6C65636E 61430079 y.Cancel.Help.......R........... 000140
 00000000 0169FFFF 00C80070 00840038 00671400 00900158 00100001 0000000A ........X.....g.8.Ç.p.à...i..... 000160
 00000000 0000FFFF FFFF00C9 0008003C 00630005 80000001 01600005 00050000 ......m.......c.<...è........... 000180
 00050000 00000000 FFFFFFFF 00CA0008 00AA0059 00058002 000C0173 00000006 ...s.......Y.¨...ò............. 0001A0
 00000006 00000000 0000FFFF FFFF00CB 0008005A 004F0005 80000001 01740008 ...t.......O.Z...ù.............. 0001C0
 017E0009 00050000 00000000 FFFFFFFF 00CC0008 00AA0045 00058002 000C017D )........E.¨...ä...............~. 0001E0

Dump of file SATURN:[PCCOMMON.DUMP.DLL]SAM.TMP;1 on 18-APR-1990 10:52:28.45
File ID (911,26,0)    End of file block 69 / Allocated 72

Virtual block number 67 (00000043), 512 (0200) bytes

 00000188 00000007 00000000 0000FFFF FFFF00CD 0008005A 003B0005 80000001 ......;.Z...ë.................... 000000
 80020000 01890003 00030000 00000000 FFFFFFFF 00CE0020 00AA0019 00058000 ......'. .ö...................... 000020
 00328003 0400018D 00050003 00000000 0000FFFF FFFF0001 000C0023 00050005 ....#.........................2. 000040
 0005005F 80020000 01930006 00030000 00000000 FFFFFFFF 00CF000C 00230005 ..#...ü.......................... 000060
 00230005 008C8002 0100019A 00040003 00000000 0000FFFF FFFF0002 000C0023 #............................_.#. 000080
 73614D00 00000300 73657373 65636F72 70206574 61657243 FFFFFFFF 0000000C ..À.....Create processes.....Mas 0000A0
 70704100 4B4F7E00 00736573 7365636F 72500000 3A737365 636F7250 00003A6B k:..Process:..Processes..~OK.App 0000C0
 00000000 FFFF0001 000E0352 0000018B 0000706C 6548006C 65636E61 4300796C ly.Cancel.Help..£...R........... 0000E0
 00000000 0172FFFF 012C0070 00840038 00671400 00900158 00190001 0000000A ........X.....g.8.Ç.p.,...r..... 000100
 00000000 0000FFFF FFFF012D 0008003C 00630005 80000001 01760005 00050000 ......v.......c.<...¯........... 000120
 00050000 00000000 FFFFFFFF 012E0008 00AA0059 00058002 000C017C 00000006 ...|.......Y.¨................. 000140
 00000006 00000000 0000FFFF FFFF012F 00080050 004F0005 80000001 017D0012 ..}.......O.P.../............... 000160
 01910012 00050000 00000000 FFFFFFFF 01300008 00AA0045 00058002 000C0190 ........E.¨...0.................. 000180
 000001A4 00000007 00000000 0000FFFF FFFF0131 0008005A 003B0005 80000001 ......;.Z...1...............£... 0001A0
 80020000 01A50003 00030000 00000000 FFFFFFFF 01320020 00AA0019 00058000 ......'. .2...............£..... 0001C0
 00328003 040001A9 00050003 00000000 0000FFFF FFFF0001 000C0023 00050005 ....#...................`.....2. 0001E0
```

Dump of file SATURN:[PCCOMMON.DUMP.DLL]SAM.TMP;1 on 18-APR-1990 10:52:28.45
File ID (911,26,0)   End of file block 69 / Allocated 72

Virtual block number 68 (00000044), 512 (0200) bytes

```
0005005F 80020000 01AF0006 00030000 00000000 FFFFFFFF 0133000C 00230005 ..#...3...............£....._... 000000
00230005 008C8002 010001B6 00040003 00000000 0000FFFF FFFF0002 000C0023 #...................Ñ.........#. 000020
65726F74 73206E6F 6974616D 726F666E 69206574 61657243 FFFFFFFF 0134000C ..4.....Create information store 000040
003A6572 6F747320 6E6F6974 616D726F 666E4900 003A6873 614D0000 00030073 s.....Mask:..Information store:. 000060
4300796C 70704100 4B4F7E00 00736572 6F747320 6E6F6974 616D726F 666E4900 .Information stores..~OK.Apply.C 000080
00000000 FFFF0001 000E0352 00000100 00000000 0000706C 6548006C 65636E61 ancel.Help..........R........... 0000A0
00000000 00DAFFFF 01900033 00B40062 004E1400 009000C2 00170001 00000005 ........ó.....N.b.Ç.3.....Ö..... 0000C0
00000000 0000FFFF FFFF0191 00080064 00260005 80000001 000E0011 00050000 ......8.......&.d............... 0000E0
00030000 00000000 FFFFFFFF 01920008 00A6001C 00078002 000C00F0 00000006 ....Þ.........Ì................. 000100
00060003 00000000 0000FFFF FFFF0001 000C0023 0005001C 80030400 00F10002 ..Þ.........#................... 000120
00FB0004 00030000 00000000 FFFFFFFF 0002000C 00230005 00498002 000000F4 ¶.....I...#....................«. 000140
616D726F 666E6920 65746165 7243FFFF FFFF0193 000C0023 00050076 80020100 ....v...#.........Create informa 000160
003A776F 6C66206E 6F697461 6D726F66 6E490000 00030077 6F6C6620 6E6F6974 tion flow.....Information flow:. 000180
00000000 FFFF0001 000E0352 0000019E 00706C65 48006C65 636E6143 004B4F00 .OK.Cancel.Help.....R........... 0001A0
00000000 0152FFFF 01F40055 00B40037 00211400 0090013A 00170001 00000009 .......:.....I.7.Ç.U.¶...R..... 0001C0
00000000 0000FFFF FFFF01F5 0008004F 00470005 80000001 01560011 00050000 ......V.......G.O...¾.......... 0001E0
```

Dump of file SATURN:[PCCOMMON.DUMP.DLL]SAM.TMP;1 on 18-APR-1990 10:52:28.45
File ID (911,26,0)   End of file block 69 / Allocated 72

Virtual block number 69 (00000045), 512 (0200) bytes

```
00050000 00000000 FFFFFFFF 01F60008 00A70038 00058002 000C0168 00000006 ....h........;.Ï...~............ 000000
00070003 00000000 0000FFFF FFFFFFFF 001900AA 00180005 80000002 01690000 ..i.........'.................... 000020
017F0007 00030000 00000000 FFFFFFFF 01F7000C 002C001F 000B8003 00040177 w...........,...¥................ 000040
00040187 00070003 00000000 0000FFFF FFFF01F8 000C002C 001F0040 80000004 ....@...,...½.................. 000060
80030400 018F0002 00030000 00000000 FFFFFFFF 01F9000C 002C001F 00768000 ..v...,...'..................... 000080
00498002 00000192 00060003 00000000 0000FFFF FFFF0001 000C0023 0005001C ....#.......................I. 0000A0
00050076 80020100 01990004 00030000 00000000 FFFFFFFF 0002000C 00230005 ..#.......................v... 0000C0
6F6C6620 6E6F6974 616D726F 666E6920 65746165 7243FFFF FFFF01FA 000C0023 #...'.....Create information flo 0000E0
61747320 4C445000 003A776F 6C66206E 6F697461 6D726F66 6E490000 00030077 w.....Information flow:..PDL sta 000100
4F006574 656C6544 7E007472 65736E49 7E006574 61647055 7E00746E 656D6574 tement.~Update.~Insert.~Delete.O 000120
00000000 00000000 00000000 00000000 00000070 6C654800 6C65636E 6143004B K.Cancel.Help................... 000140
00000000 00000000 00000000 00000000 00000000 00000000 00000000 00000000 ................................ 000160
00000000 00000000 00000000 00000000 00000000 00000000 00000000 00000000 ................................ 000180
00000000 00000000 00000000 00000000 00000000 00000000 00000000 00000000 ................................ 0001A0
00000000 00000000 00000000 00000000 00000000 00000000 00000000 00000000 ................................ 0001C0
00000000 00000000 00000000 00000000 00000000 00000000 00000000 00000000 ................................ 0001E0
```

Dump of file SATURN:[PCCOMMON.DUMP.DLL]SAUT.TMP;1 on 18-APR-1990 10:52:37.75
File ID (915,21,0)   End of file block 46 / Allocated 48

Virtual block number 1 (00000001), 512 (0200) bytes

```
00000000 00000040 00000000 000000B8 0000FFFF 00000004 00000022 00845A4D MZ.."...........¡.......@....... 000000
00000080 00000000 00000000 00000000 00000000 00000000 00000000 00000000 ................................ 000020
6F6E6E61 63206D61 72676F72 70207369 685421CD 4C01B821 CD09B400 0EBA1F0E ..¤..Ç.ëÌ¦.LëÌThis program canno 000040
00000000 00000024 0A0D0D2E 65646F6D 20534F44 206E6920 6E757220 65622074 t be run in DOS mode....$....... 000060
00040020 00000000 00040000 00000800 0007800E 596AF2BB 003602F5 0505454E NE..%.6.£·jY................ ... 000080
00000000 00000000 00010019 00040000 000003AB 028E0286 01A40140 0040000C ..@.@.£....¨.................... 0000A0
000F0F00 000F00C7 001A0F00 001A00C4 064C0F00 064B005D 01C80F00 01C7003C <.ú...à.].K...L.á.......ú....... 0000C0
01841EF1 0184043C 1C800F01 1AEA0288 02020E01 00000000 1B840F00 1B8300C9 è.*...Ç...........ð.....<...þ... 0000E0
02651EF1 02650485 01541EF1 0154046F 009D1EF1 009D0465 00FA1EF1 00FA0455 U.*.þ.*.e...þ...o.T.þ.T...e.þ.e. 000100
00991EF1 00990519 03221EF1 032204E6 03521EF1 035204B0 003A1EF1 003A04AC ¯.:.þ.:.¯.R.þ.R.|.".þ."....þ... 000120
00851EF1 0085053B 00711EF1 00710533 007B1EF1 007B0528 007C1EF1 007C0523 #.|.þ.|.+.(.þ.(.3.q.þ.q.;...þ... 000140
00651EF1 00650564 00901EF1 0090055B 00C91EF1 00C9054E 00981EF1 00980544 D...þ...N.è.þ.è.[...þ...d.e.þ.e. 000160
00B31EF1 00B30585 00CD1EF1 00CD0578 003C1EF1 003C0574 008A1EF1 008A056B k...þ...t.<.þ.<.x.ë.þ.ë...*.þ.*. 000180
00301EF1 003005B2 00E61EF1 00E605A3 00301EF1 003005A0 00E11EF1 00E10591 ..Ã.þ.Ã...0.þ.0.£.|.þ.|.ý.0.þ.0. 0001A0
00180005 001A0005 00000005 00140005 00030005 00130005 00020005 00010005 ................................ 0001C0
00230005 002A0005 00210005 00280005 00260005 00240005 00250005 00270005 ..'...%...$...&...(...!...*...#. 0001E0
```

```
Dump of file SATURN:[PCCOMMON.DUMP.DLL]SAUT.TMP;1 on 18-APR-1990 10:52:37.75
File ID (915,21,0)   End of file block 46 / Allocated 48

Virtual block number 2 (00000002), 512 (0200) bytes

004C0005 00450005 00400005 003F0005 002B0005 00220005 00290005 00200005 .. ...)..."...+...?...@...E...L. 000000
52545354 55415300 00015455 50525453 54554153 0A000054 55415304 004D0005 ..M..SAUT...SAUTSTRPUT...SAUTSTR 000020
53544547 54554153 5F100003 52545348 53414854 5541530B 0002454D 414E5049 IPNAME...SAUTHASHSTR..._SAUTGETS 000040
52505450 52545541 530F0005 45534143 50555455 41530A00 044D4152 41505254 TRPARAM...SAUTUPCASE..._SAUTRPTPR 000060
4C4D4454 55415312 0007474E 49525453 54454754 55415300 0006544D 5453544E NTSTMT...SAUTGETSTRING...SAUTDML 000080
5541530A 00094E58 54545241 54535455 41530C00 08454D41 4E594259 52455551 QUERYBYNAME...SAUTSTARTTXN...SAU 0000A0
53545541 530A0008 554E454D 45544144 50555455 41530E00 0A525453 54454754 TGETSTR...SAUTUPDATEMENU...SAUTS 0000C0
4E54494D 494C4544 54554153 0F000054 55504449 54554153 09000C54 41435254 TRCAT...SAUTIDPUT...SAUTDELIMITN 0000E0
6403534C 4C414353 4F44084E 49574D50 0500005A 00100007 00010000 0E454041 AME.........Z...PMWIN.DOSCALLS.d 000100
444E4148 4C45444F 4D595245 55514C4D 44134E58 54545241 54534C4D 44086C6D ml.DMLSTARTTXN.DMLQUERYMODELHAND 000120
4C4D4408 4E4C5259 52455551 4C4D4408 444C4549 46595245 55514C4D 44004S4C LE.DMLQUERYFIELD.DMLQUERYRLN.DML 000140
02570305 620300F2 03020745 54495257 534F4408 4F495303 5453494C 45455246 FREELIST.SIO.DOSWRITE...·..b..W. 000160
02030000 03030100 40030201 017E0300 00030102 00000302 DA0304FF 03008603 .......ö.........~....@........ 000180
00000000 00000000 00000000 4C4C442E 74756173 08000005 D5030204 03018C03 .......f....saut.DLL............ 0001A0
83012501 5A9A5016 FF56868D 0A76FF0C 76FF4B6A D88EFFFF B81E5657 0000AAC8 à^..WV.|...ÃjK.v..v...V..P.Z.X.. 0001C0
F2468900 00FFFF9A 5016EE46 8D1076FF 1276FF01 0904FF9A 5016FF56 868D0AC4 á...V..P......v..v..FŸ.P......F· 0001E0

Dump of file SATURN:[PCCOMMON.DUMP.DLL]SAUT.TMP;1 on 18-APR-1990 10:52:37.75
File ID (915,21,0)   End of file block 46 / Allocated 48

Virtual block number 3 (00000003), 512 (0200) bytes

E90001F8 46C70003 FA46C700 23E90E46 880128E9 F2468B00 06E90375 00F27E83 .~·.u.ð...F·ð(..F.ð#.úF*..úF½..ð 000000
FFE2E903 7500023D 0013E901 02E98499 88001CE9 0002F846 C70018FA 46C70029 ).úF*..úF½..ð..|..ð..ð..=..u.ðä. 000020
9A5016F4 468DFA76 FFEE76FF F076FF10 76FF1276 FFFFE4E9 FFCDE903 7500223D ="u.ðë.ðð..v..v..vÞ.vŸ.v*.F¶.P. 000040
89FC4689 F6568BF4 468B00C1 E9F2468B 0006E903 7500F27E 83F24689 0000FFFF .....F·.~·.u.ð...F·ðé..F¶.V~.F=. 000060
5EC41076 FF1276FF 0088E903 7502470B 26078B26 FC5EC404 FC468300 04E9FE56 V±ð...F=.á^=&..&.G.u.ð...v..v.á^ 000080
0DE90374 00F27E83 F2468900 00FFFF9A 5016A246 8DF876FF 37FF2602 77FF26FC =&.w.&.7.v½.FÀ.P......F·.~·.t.ð. 0000A0
A2468D50 16FF5686 8D0046E9 037400F2 7E83F246 89FFFF04 FF9A5016 A2468D00 ..FÀ.P......F·.~·.t.ðF...V..P.FÀ 0000C0
26065EC4 02578826 078826FC 5EC40028 E9037400 003D08C4 83FFFF00 DC9A5016 .P.É....á.=..t.ð+.á^=&..&.W.á^.& 0000E0
FF65E900 1AE90000 B8000001 6D9AF476 FFF676FF 1076FF12 76FF0257 89260789 ..&.W..v..v..v~.v¶.m...|..ð..ðe. 000100
02C8000E CAC95F5E 1F0000E9 8499B800 00FFFF9A F476FFF6 76FF1076 FF1276FF .v..v..v~.v¶.....|..ð...^_èð..à. 000120
83FEFE86 89002B00 409A0100 685016FF 00868D06 76FFD88E 0008881E 56570001 ..WV.|....Ã.v......Ph...@.+...±±. 000140
00FFFF9A 5016FF00 868D0876 FF0A76FF 0011E9FE FE868800 07E90375 00FEFEBE ƒ±±.u.ð....±±ð...v..v......P.... 000160
00000701 86000200 00000500 10000200 00000201 99000200 0806CAC9 5F5E1F00 ..^_èð.......................... 000180
42000300 A0020300 34000300 F1020300 20000300 39020300 14000301 BD020300 ...§........9... ...þ....4.......B 0001A0
006A006A D88EFFFF B81E5657 000002C8 00000000 00000000 4E000301 53020300 ...S....N........à...WV.|. .Ãj.j. 0001C0
260876C4 FE5E88FE 46890000 FFFF9A08 76FF0A76 FF504806 46880C76 FF0E76FF .v..v..F.HP.v..v........F±.^±áv.& 0001E0

Dump of file SATURN:[PCCOMMON.DUMP.DLL]SAUT.TMP;1 on 18-APR-1990 10:52:37.75
File ID (915,21,0)   End of file block 46 / Allocated 48

Virtual block number 4 (00000004), 512 (0200) bytes

006A006A D88E0008 B81E5657 000002C8 000ACAC9 5F5E1F00 00E90000 B80000C6 ó..|..ð...^_èð..à...WV.|...Ãj.j. 000000
8BFE4689 00000022 9A0876FF 0A76FF50 4806468B 0C76FF02 0036FF26 1A06068E ....&.6...v..F.HP.v..v..".....F±. 000020
0048881E 56570001 06C80008 CAC95F5E 1F0000E9 00008800 00C62608 76C4FE5E ^±áv.&6..|..ð...^_èð..à...WV.|H. 000040
00000068 9A5016FE FA868D00 FF680676 FF020036 FF261A06 068E006A 006AD88E .Ãj.j......&.6...v.h....*±.P.h.... 000060
5016FEFA 868DFC76 FFFE76FF FE568CFC 46890E46 8D00FEFA 82C6FA76 8BFA4689 .F*.v*ó.*±..F..F=.V±.v±.v=..*±.P 000080
5F5E1F00 00E90000 B8FC4689 FE468900 00B80CC4 83FFFF01 849A0876 FF0A76FF .v..v.........á.|...F±.F=|..ð...^_ 0000A0
05FE4689 04C48301 5101069A 0A76FF0C 76FFD88E 008EB81E 56570000 02C8C8C9 èüà...WV.|...Ã.v..v....Q..á..F±. 0000C0
E9037E00 FE7E83FE 46890002 20078B26 065EC400 0CE9037F 07382606 5EC40002 ..á^.&;...ð..á^.&..·...F±.~±.~.ð 0000E0
1E9A0E76 FF1076FF 0A76FF0C 76FF5000 022D078B 26065EC4 004DE990 4AB80006 ..|J.ðM.á^.&..·..P.v..v..v..v... 000100
76FF1076 FF004268 1E504807 8826065E C4072926 FE468806 5EC40AC4 83017401 .t..á.á^..F±&).á^.&..HP.hB..v..v 000120
000002C8 000CCAC9 5F5E1F00 00E90000 B80FFF26 065EC40A C4830009 011E9A0E ....)..á.á^.&..|..ð...^_èð..à... 000140
26065EC4 000205FE 468904C4 8301E901 069A0A76 FF0C76FF D88E00FA B81E5657 WV.|*..Ã.v..v.....ð..á..F±...á^.& 000160
E9904A88 0006E903 7E00FE7E 83FE4689 00022D07 8826065E C4000CE9 037F0738 ;...ð..á^.&..·...F±.~±.~.ð..|J.ð 000180
5EC40AC4 83010701 1E9A0E76 FF1076FF 0A76FF0C 76FF5048 07882606 5EC4002B +.á^.&..HP.v..v..v..v.........á.á^ 0001A0
D88E0194 B81E5657 000102C8 000CCAC9 5F5E1F00 00E90000 B8072926 FE468806 ..F±&).|..ð...^_èð..à...WV.|...Ã 0001C0
880007E9 037500FE FEBE83FE FE868902 4B00409A 01006850 16FF0086 8D0E76FF .v......Ph...@.K...±±.ƒ±±.u.ð... 0001E0
```

Dump of file SATURN:[PCCOMMON.DUMP.DLL]SAUT.TMP;1 on 18-APR-1990 10:52:37.75
File ID (915,21,0)   End of file block 46 / Allocated 48

Virtual block number 5 (00000005), 512 (0200) bytes

```
0000E9FF FF00F29A 0676FF08 76FF5016 FF00868D 0A76FF0C 76FF001A E9FEFE86 .±±Õ...v..v......P.v..v..·...Õ.. 000000
260E5EC4 FC4689FE 46890000 8BD88E02 0CB81E56 57000004 C8000ACA C95F5E1F .^_èò..à...WV.|...Ä|...F±.F=á^.& 000020
F980C9FE D2D1E001 0011E903 7500F980 02B1FE56 8BFC4688 003AE903 75003F80 .7.u.Õ:..F=.V±Y..ª.u.Õ..ÌÀÌ@±è.ª 000040
E9FE5689 FC468900 0283C103 ED2A0F8A 260E46FF 0E5EC4FF EFE90003 E9037500 .u.Õ..Õÿ.á^..F.&..*Ú.é.@..F=.V±Õ 000060
00008802 57892607 8926065E C401A101 FC9AFC76 FFFE76FF 0A76FF0C 76FFFFBA ¤..v..v..v±.v=.=.À.á^.&..&.W.|.. 000080
C70005E9 0377120A 7E83088E 025F881E 56570000 60C8000C CAC95F5E 1F0000E9 Õ...^_èò..à'..WV.|...Ä.~..w.Õ..ú 0000A0
7E8301E4 E9037500 3F802606 5EC4A246 8908F700 4E2002E0 C10A4688 00120A46 F....F.èÀ.-N.¾Ä.FÀ3^.&.?.u.Õõ..~ 0000C0
681E0044 681E0019 E903720A 4638FE46 FFFE4688 0000FE46 C7002CE9 0375000A ..u.Õ,.úF±...F±.F±;F.r.Õ...hD..h 0000E0
16A4468D 0676FF08 76FFA276 FFFFD9E9 0CC48303 5400109A 0C76FF0E 76FF0049 Ì..v..v....T..á.ÕÌ..vÀ.v..v..FÊ. 000100
72A04639 A24688A0 468904C4 83038001 069A5016 A44680DA C4830361 015A9A50 P.Z.=..á..FÊ.P......á..F..FÀ9F.r 000120
76FF004F 681E5016 A4468008 C4830397 00609A50 16A4468D 004C681E 0031E903 .ÕÌ..hL..FÊ.P.'....á..FÊ.P.hO..v 000140
74203880 260676C4 A05E8801 4AE90646 01A04688 0CC48303 C000109A 0C76FF0E ..v....à..á..F..F.ÕJ..^.áv.&.8 t 000160
76FF0055 681E5016 A4468008 C48303D7 00609A50 16A4468D 0052681E 0031E903 .ÕÌ..hR..FÊ.P.'.=..á..FÊ.P.hU..v 000180
7520A47A 80A07688 A04EFF01 0AE90646 01A04688 0CC48304 2200109A 0C76FF0E ..v....".,á..F..F.Õ...N..v..zÊ u 0001A0
26065EC4 009AE903 7400A07E 83FFE5E9 A04EFF00 06E90377 00A07E83 000FE903 .Õ...~..w.Õ...N.ÕÌ..~..t.Õ..á^.& 0001C0
3F802606 5EC40646 FF0AC483 04580010 9A0C76FF 0E76FF00 58681E50 E42A078A ..*ÕP.hX..v..v....X..á..F.á^.&.? 0001E0
```

Dump of file SATURN:[PCCOMMON.DUMP.DLL]SAUT.TMP;1 on 18-APR-1990 10:52:37.75
File ID (915,21,0)   End of file block 46 / Allocated 48

Virtual block number 6 (00000006), 512 (0200) bytes

```
FF005868 1E50E42A 078A2606 5EC40021 E9037500 3F802606 5EC40020 E9037520  u.Õ-.á^.&.?.u.ÕÌ.á^.&..*ÕP.h[.. 000000
C4001EE9 0374203F 8026065E C4FFC7E9 0646FF0A C4830485 00109A0C 76FF0E76 v..v.......á..F.Õú.á^.&.? t.Õ..á 000020
61681E06 46FF0AC4 83049E00 109A0C76 FF0E76FF 005E681E 50E42A07 8A26065E ^.&..*ÕP.h^..v..v.......á .F..ha 000040
66681E00 A442C6A0 768B0049 E90CC483 04B90010 9A0C76FF 0E76FF00 63681E00 ..hc..v..v....¿..á.ÕÌ..v.c ª..hf 000060
00109A0C 76FF0E76 FF006968 1E5016A4 468D08C4 8304D000 609A5016 A4468D00 ..FÊ.P.'.À..á..FÊ.P.hi..v..v.... 000080
E9085689 06468948 08568806 460304C4 8302C101 069A5016 A4468D0C C48304DD Ì..á..FÊ.P...é..á..F..V.H.F..V.Õ 0000A0
56880646 8BD88E02 E2881E56 57000004 C8000ACA C95F5E1F 0000E900 0088FE10 .±|..Õ...^_èò..à...WV.|ã..Ä.F..V 0000C0
2A1F8A26 FC5EC400 2CE90375 003F8026 FC5EC4FC 46FF0003 E9FE5689 FC468908 ..F=.V±Õ..¯F=á^=&.?.u.Õ,.á^=&..* 0000E0
26FC5EC4 078A26FC 5EC40006 E9202C07 8A26FC5E C4000BE9 03750200 6087F6FF .-,m..u.Õ..á^=&.., Õ..á^=&..á^=& 000100
5EC4D88E 0507B81E 56570000 4EC80004 CAC95F5E 1F0000E9 0000B8FF C5E90788 ..Õé.|..Õ...^_èò..àN..WV.|...Äá^ 000120
468904C4 8305A901 069A0676 FF0876FF 004EE900 00880006 E9037527 3F802606 .&.?'u.Õ..|..ÕN..v..v.... ..á..F 000140
76880AC4 8305C301 5A9A5016 82468D50 52400856 8B06468B 50000220 FE4688FE ±.F±-..P.F..V.aRP.Fý.P.Z.û..á..v 000160
5E1F0000 E900008B 08C48303 3800A69A 0676FF08 76FF5016 82468D00 8042C6FE ±6B¯..Fý.P.v..v..Ì.;..á.|..Õ...^ 000180
00008800 06E90374 273F8026 065EC4D8 8E056A88 1E565700 004EC800 04CAC95F _èò..àN..WV.|j..Äá^.&.?'t.Õ..|.. 0001A0
76FF0876 FFFE76FF 278246C6 FE468904 C4830619 01069A06 76FF0876 FF0052E9 ÕR..v..v.......á..F±6Fý'.v±.v..v 0001C0
16824680 008442C6 FE768B27 8342C6FE 76880AC4 83063A01 5A9A5016 83468D06 ..F°.P.Z.:..á..v±6B°'.v±6BÇ..Fý. 0001E0
```

Dump of file SATURN:[PCCOMMON.DUMP.DLL]SAUT.TMP;1 on 18-APR-1990 10:52:37.75
File ID (915,21,0)   End of file block 46 / Allocated 48

Virtual block number 7 (00000007), 512 (0200) bytes

```
1F000200 0404CAC9 5F5E1F00 00E90000 B808C483 058900A6 9A0676FF 0876FF50 P.v..v..Ì....á.|..Õ...^_èò...... 000000
00000000 90000100 AC010300 00000705 DD000200 00000505 FC000200 00000202 .......=........Ì......._........ 000020
00080002 00019000 0CCAC95F 5E1F0000 E900008B D88EFFFF 881E5657 000008C8 à...WV.|...Ä|..Õ...^_èò......... 000040
01CB0001 881F0200 3E89D88E FFFF881E 00000000 00000000 00000000 00000007 ................|..¯À.>...|..ù. 000060
00000000 00000000 00000000 00000000 00000000 00000000 00000600 02000200 ................................ 000080
FFF08804 C4830044 03DE9A06 76FF0876 FFFC568C FA46890E 468D5657 000008C8 à...WV.F..Fª.V=.v..v..8.D..á..Þ. 0000A0
76FF0876 FFF8880C C4830055 05589A06 76FF0876 FF0A76FF 0C76FFFA 76FFFC76 v=.vª.v..v..v..v..X.U..á..½.v..v 0000C0
FFFFB9C0 33067EC4 1EDE88D7 8BEC8855 CBC95F5E C78806C4 83FFFF04 849A5606 .V.Ç....á..ú^_èùU.š.=.8.á~.3á¿.. 0000E0
01C6F706 4688FE87 08468ED8 8EC08CF9 2BD1F7AE F2FFFFB9 0A7EC4FF 758DAEF2 ·0.u.á~.¿..·ÚÌ+ª.à.Ä.F..±.F.¼ó. 000100
76C51EDE 8BD788EC 8855C850 C28C1FFA 8BF388A4 F3C913A5 F3E9D149 A4027400 .t.ÊÌÌÕµÊ.èµÊ.µ.ª..õ]ùU.š.=.8.év 000120
13A5F3E9 D149A402 7401A8C7 8B067EC4 D1F7AEF2 FFFFB9C0 33C08ED8 8CFE880A ..±.Ä.à3á¿..·ÚÌá~..ú´.t.ÊÌÌÕµÊ. 000140
F2FFFFB9 C0330A7E C40676C5 1EDE88D7 8BEC8855 CB50C28C 1FFA8BF3 8BA4F3C9 èµÊ.µ.ª..õ]ùU.š.=.8.év.á~.3á¿..· 000160
C033067E C4D788EC 885500CB 5DFA88F3 881FFFFF 1DC01805 74A6F3F9 2BD1F7AE ÚÌ+ªµÌt..á.....µ.ª]ù.U.š.=á~.3á 000180
AEF2FFFF B9C03307 88067EC4 1E5657EC 885500C8 5DFA8891 49D1F7AE F2FFFFB9 ¿..·ÚÌÌ..ª]ù.U.šWV.á~..=3á¿..·Û 0001A0
AAA4F307 1F06F388 FE88D9F7 0E4E2B41 0175AEF2 0E4E88DF 880A7EC4 06F7884F O.¼.á~..Õ.N.·Úu.A+N.¼Ì.±.µ...µÊ¯ 0001C0
C00AAC0C E30E4E88 DF880A76 C5067EC4 1E5657EC 885500C8 505F5E1F C28CC288 .ô.ô.^_]ù.U.šWV.á~.év..Ô.N.D.¯.á 0001E0
```

```
Dump of file SATURN:[PCCOMMON.DUMP.DLL]SAUT.TMP;1 on 18-APR-1990 10:52:37.75
File ID (915,21,0)   End of file block 46 / Allocated 48

Virtual block number 8 (00000008), 512 (0200) bytes

 FC4689F0 46805657 000012C8 CB50E588 5F5E1FC2 8CC388AA F3C032F8 E2AA0374 t.¯ã½2äµ^.û.ô.^_.Î]ùà...WV.Fþ.F= 000000
 02578926 07892608 57892606 47892608 56880646 88420A47 C626FC5E C4FE568C .V±á^=&6G.B.F..V̄.&.G.&.W.&..&.W. 000020
 5EC4F088 0CC48301 F105589A 53060A76 FF0C76FF 0E76FF10 76FF7FFF 0447C726 &úG....v..v..v..v..S.X.þ..á..þá^ 000040
 689A006A 53FE76FF 0EEB0588 2602478E 2607FF26 3F8B26C0 2A117804 4FFF26FC =&.O.x.*ã&.7&..&.G.&..S..v±Sj..h 000060
 F7023308 46880A4E 881575C0 080C4688 53EC8855 CBC95F5E C68806C4 83002802 .(..á..ó^_èùU.šS.F..âu..N..F.3Ø% 000080
 0BD8D1EA D1D8D1E9 D106468B 08568B0A 5E8BC88B 45E8D233 C288F1F7 06468BF1 þ.F.¥þ.õ3ØŠE.à.^..V..F.ÎÕÎÜÎõÎÀ. 0000A0
 46280676 06463808 72077708 56380C72 D1030A66 F7910C66 F7C888F3 F7F475C9 èu¶¼µ.à¼f..¼f..Îr.;V.w.r.;F.v.+F 0000C0
 5EC45657 000008C8 0008CA5D E5885800 DA830BF7 DAF70856 1806462B 0C56180A ..V.+F..V.¼Õ¼Ä.Õ.[.Î]ò..à...WVá^ 0000E0
 11BE05E0 D1C103E0 D1C888F9 F7000CB9 9905CA2D C388FA46 89E42A0B 478A2608 .&.G.*õ.F°.û-ò..¿..¼°.àÎÀ.èÎÀ.ƒ. 000100
 90012BE9 FFFFB820 0A4F8026 085EC40F 74400A47 F6260774 830A47F6 26F84689 .F½&-G..t.&-G.ât.á^.&.O. |..Õ+.. 000120
 67802602 0A4F8026 90E2EB00 000447C7 26200A4F 80260E74 010A47F6 26085EC4 á^.&-G..t.&.O. &úG...Šã.&.O..&.g 000140
 68F9F700 0CB99905 CA2DC388 4C750C0A 47F626FC 7689F088 04478926 C02BEF0A .ÿ+â&.G..þ.v=&-G..uL.û-ò..¿..¼°k 000160
 7E811675 05E2087E 810E7403 110A7E81 07750506 087E8137 750111BE 87F60608 Ä.-.ƒ..u7.-.ø.u..-...t..-.ã.u..~ 000180
 04C48300 CBE80876 FF0A76FF 0C75C008 02C48303 8414AE9A FA76FF0F 75FFFF0A ...u..v°.Û....á..âu..v..v.Òù..á. 0001A0
 88677401 118E87F6 06D868F9 F7000CB9 9905CA2D C3881575 080A47F6 26085EC4 á^.&-G..u..û-ò..¿..¼°kÄ.-.ƒ..tg. 0001C0
 48024588 F87E8802 57892607 89264008 57882606 47882606 77282637 88260B5E ^.&.7&+w.&.G.&.W.ã&..&.W..-½.E.H 0001E0

Dump of file SATURN:[PCCOMMON.DUMP.DLL]SAUT.TMP;1 on 18-APR-1990 10:52:37.75
File ID (915,21,0)   End of file block 46 / Allocated 48

Virtual block number 9 (00000009), 512 (0200) bytes

 5E8819E8 FC468908 C48303A2 12469AFA 76FF0677 FF265256 167EF608 04478926 &.G..-~.VR&.w..v°.F.Å..á..F=Š..^ 000000
 468A065F C426085E C408C483 03C51208 9A53006A 006A026A 0F742017 CF87F6FA °-.ü. t.j.j.j.S...é..á.á^.&á_..F 000020
 FC7639FC 468908C4 8301C712 469AFA76 FF501606 46805600 018E17E8 07882606 .&..Š.ƒ..V.F..P.v°.F.ú..á..F=9v= 000040
 7E810E75 05D6067E 8105A806 FF560000 04C8CBC9 5F5EE42A 06468AFE CCE90374 t.Õä±.F.*õ^_èùà...V..´..-.ø.u..- 000060
 C40001FE 46C72475 0303087E 81287505 E2067E81 13E80000 FE46C707 75040608 ...u.úF±..Š¯.~.ã.u+.-...uŠúF±..á 000080
 C02B0674 0111BE87 F606D868 F9F7000C B99905CA 2DC38815 750C0A47 F626065E ^.&-G..u..û-ò..¿..¼°kÄ.-.ƒ..t.+â 0000A0
 02C48304 F113E99A 02006814 75024408 0488016E C68102E6 C1FE7688 90907EEB Š-...v±èl..ón....D.u.h...õ.þ..á. 0000C0
 11BE05E0 D1C103E0 D1C888F9 F7000CB9 9905CA2D 064688D5 74D00802 54890489 ...T..Åtf.F.-ò..¿..¼°.àÎÀ.èÎÀ.ƒ. 0000E0
 26078926 08578926 06478926 01709488 016E8488 02E6C1FE 7688065E C4FC4689 .F=á^..v±èl...n...p.&.G.&.W.&..& 000100
 00018802 0A4F8026 065E8811 07C6DE88 04478926 02448902 0088FC76 88025789 .W..v=|...D.&.G..Bó...^.&.O..|.. 000120
 89118E05 E001C103 E001C888 F9F7000C B99905CA 20084688 000004C8 90CBC95E ^èù.à....F.-ò..¿..¼°.àÎÀ.èÎÀ.ƒ.. 000140
 AE9A50E4 2A08478A 26085EC4 72741007 F626FC5E C4517400 067E83FE 5E8CFC46 F=.^±.~..tQá^=&-..trá^.&.G.*õP.Û 000160
 260007C6 26FC5EC4 04C48305 4211829A 0876FF0A 76FF5C74 C00802C4 83050314 ....á..ât\.v..v....B..á.á^=&á..& 000180
 26FC5EC4 2AE80857 89260647 89260257 89260789 2699C028 085EC400 000247C7 úG...á^.+ã.&..&.W.&.G.&.W.Š*á^=& 0001A0
 76FF0A76 FF0874C0 0802C483 055414AE 9A50E42A 08478A26 085EC421 741007F6 -..tlá^.&.G.*õP.Û.T..á..ât..v..v 0001C0
 0E46881B 181E8C1B 16A3181C 88044814 D29A000A 88EC8855 C8C9031B 11829A08 ......èùU.š|...Ø.K.|..È.......F. 0001E0

Dump of file SATURN:[PCCOMMON.DUMP.DLL]SAUT.TMP;1 on 18-APR-1990 10:52:37.75
File ID (915,21,0)   End of file block 46 / Allocated 48

Virtual block number 10 (0000000A), 512 (0200) bytes

 1006C700 00181206 C71AEE16 891AECA3 08568806 46881808 16891806 A3105688 .V.È.......F..V.Èš...Ÿ.ú.....ú.. 000000
 180EA31A F2A31AF6 A3C02800 01181406 C70308E9 037425F6 7E80038D E900018 ...Õ...—Xt.Õ..ú.....+âÈ-.È·.È.. 000020
 30017F80 260A5EC4 00201C7C 06C71804 A31AEAA3 1AF0A318 0AA3180C A31AF4A3 È¶.È..È..Èþ.Èõ.È..ú.|. .á^.&...0 000040
 00180A06 C71AF606 FF00752B 3F80260A 5E88903E EB00301C 7C06C70A 46FF4975 uÎ.F.ú.|.O.Š>..^.&.?+u...-.ú.... 000060
 5EC40DEB 1AEA06FF 9014EB18 0A06FF1A 75001AF6 3E830E75 203F8026 9028EB00 .Š(.&.? u..>-..u.....Š....õ.Š.á^ 000080
 75C00802 C4830978 E80E5098 078A260A 5E880A46 FF180406 FFC7752D 3F80260A .&.?-uú.....F..^.&...P.Òx..á..âu 0000A0
 FF0C7D00 181A3E83 0C56890A 468908C4 8308C7E8 0E181A68 1E0A76FF 0C76FFDD Î.v..v..h...Òú..á..F..V..>...).. 0000C0
 C400201C 7C06C706 75301C7C 3E830074 0018043E 83181AA3 D8F7181A A1180406 ...Å..¼ÅÈ...>...t..>|.Ou.ú.|. .á 0000E0
 468908C4 83087BE8 0E181468 1E0A76FF 060A46FF 180C06FF 20752E3F 80260A5E ^.&.?.u-.....F...v..h...Ò(..á..F 000100
 7400463D 98078A26 0A5EC418 0C0EFF00 01181406 C70A7D00 18143E83 0C56890A ..V..>...).ú.........á^.&...=F.t 000120
 0A5EC409 75001AF4 3E830002 1AF406C7 0675006C 302B7400 68304074 004E303D ==N.tâ=h.t+=(.u.ú.¶....>¶..u.á^. 000140
 06C7D8EB 00011AF4 06C79002 4EE91C75 003F8026 0A5EC40A 46FF0375 4C3F8026 &.7Lu..F.á^.&.?.u.ÒN..ú.¶...ŠÀú. 000160
 30057400 47300A74 00453DF8 46899807 8A26C8E8 00081AF4 06C7D0EB 00101AF4 ¶...ŠÀú.¶...Šâ&....F½=E.t.=G.t.= 000180
 3FE90375 00633D01 91E9037E 78740069 30F84688 20F84683 1AF206FF 08750058 X.u....·..F½ .F½=Î.tx~.Õ..=c.u.Õ? 0001A0
 1FC4261B 061EC415 75021AF4 3E839001 59E90140 E9037500 25300152 E9037E01 .-.ÕR.=X.u.ÕQ.ÕY...>¶..u.á...&á. 0001C0
 04180606 83078926 1810A11F C4261806 1EC40DEB 00000247 C7260789 261810A1 À..&..&úG...Š.á...&á.À..&....... 0001E0
```

```
Dump of file SATURN:[PCCOMMON.DUMP.DLL]SAUT.TMP;1 on 18-APR-1990 10:52:37.75
File ID (915,21,0)   End of file block 46 / Allocated 48

Virtual block number 11 (0000000B), 512 (0200) bytes

 E9037520 0A47F626 1AEC1EC4 01BDE903 74001B10 3E830170 E9037500 1B123E83 .>...u.Õp..>...t.Õ§.á.š.&-G. u.Õ 000000
 086A90C3 EB02C483 019EE80E 0A6A0000 1AEA06C7 1B0E06FF 01ACE9FF FFB801AF £.¡..Õ¯.....ú.õ...j..Ò...á.Šù.j. 000020
 3E830081 E9037508 1AF43E83 00041B14 06C71B0C 06FF1AF2 06FF1AF0 06FFF2EB Š·..Þ...·.....ú......>¶..u.Õ...> 000040
 0A74001B 043E83FA 46891B1A A128741B 1A0639FA 46891AF4 A3C0287A 74011AF4 ¶..tz+âÈ¶..F*9...t(À...F*.>...t. 000060
 021B0606 831B1AA3 C028027D C00B1B1A A1051B1A 2E839090 13EB0000 1B1A06C7 ú.....Š.........À...â).+âÈ....... 000080
 8B157400 1B043E83 227400FA 7E8302C4 830480E8 0E3A6A02 C4830130 E80E106A j..ÒO..á.j:.Ò...á..-*.t".>...t.. 0000A0
 6A041B06 2E830000 1B1A06C7 9007EB1B 1AA3C02B 027DC00B 1B1AA300 0520FA46 F*-..È...â).+âÈ..Š..ú.........j 0000C0
 90FF39E9 026EE80E 006A90FF 3FE9106A FF10E902 1B060683 02C48300 F1E80E10 ..Òp..á......Õ..j.Õ7..j..Òn.Õ9.. 0000E0
 FF0CE903 7500643D 90FF21E9 0428E80E 256AFF2A E90349E8 0EF876FF F4EB016A j.Š¶.v½.ÒI.Õ*.jX.Ò(.ÕI..=d.u.Õ.. 000100
 0C5688OA 46880A4E FF0C5688 0A468809 74001AF4 3E830A7E 00673D05 7C006530 =e.|.=g.-Õ.>¶..t..F..V..N..F..V. 000120
 E9037500 703DFEE4 E9037500 6F30FE80 E9037500 6E3D903A EBFE5689 FC468940 ∂.F=.V±Š:.=n.u.Õ.±=o.u.ÕÕ±=p.u.Õ 000140
 9034EB0A 46FF90B1 EBFF79E9 03750078 30FEB9E9 03750075 308F7400 733DFEE0 Å±=s.t.=u.u.Õ¿±=x.u.Õy.ŠŸ..F.Š4. 000160
 0A76FF0C 76FF500A 462BC38B EC75253C 0474C00A F6468807 8A26FC5E C4FC46FF .F=á^=&...F-.ât.<%uš.ù+F.P.v..v. 000180
 0374C00A F6468807 8A260A5E C40C5689 0A4689FE 5688FC46 8806C483 044CE80E .ÒL..á..F=.V±.F..V.á^.&...F-.ât. 0001A0
 1B0C3E83 56570000 12C8CBC9 1B10A1FE 51E90374 200A47F6 261AEC1E C4FC63E9 Õc=á.š.&-G. t.ÕÕ±À..èùà...WV.>.. 0001C0
 75101AF4 3E830774 021AF43E 831B0E06 FF04740A 067E8300 201C7C06 C7067400 .t.ú.|. ..~..t......>¶..t..>¶..u 0001E0

Dump of file SATURN:[PCCOMMON.DUMP.DLL]SAUT.TMP;1 on 18-APR-1990 10:52:37.75
File ID (915,21,0)   End of file block 46 / Allocated 48

Virtual block number 12 (0000000C), 512 (0200) bytes

 74001B0E 3E83902C EB041B06 0683FE56 89FC4689 02578B26 078B261B 061EC419 .á...&..&.W..F=.V±.....Š,..>...t 000000
 FE5689FC 46899907 8B261B06 1EC40EEB 0000FE46 C7FC4689 078B261B 061EC411 .á...&...F=úF±..Š.á...&....F=.V± 000020
 A11C7AA3 C0289003 EB06468B 0674FE46 0BFC468B 0E74001A EA3E8302 1B060683 ......>õ..t..F=.F±t..F.Š..+âÈz.À 000040
 C41D750A 067E832B 7D00FE7E 83317500 1B0E3E83 F45689F2 46891B1B 168B1B16 .......F·.V¶.>...u1.-±.)+.-..u.á 000060
 01F646C7 FE5689FC 4689DAF7 00028308 F7FE568B FC468B2D 07C626F2 46FFF25E ^·.F·&6.-.F=.V±¼Ä.@.¼Ö.F=.V±úF-. 000080
 14A49AFC 76FFFE76 FF501E06 76FFFA5E 8CF84689 1AF8B800 00F646C7 9006EB00 .Š..úF-..|½..F½.^*.v..P.v±.v=.È. 0000A0
 C82B1B14 0E8B04C4 83056101 069AF876 FFFA76FF 4574001B 0C3E830A C4830A45 E..á..>...tE.v*.v½...a..á.....+à 0000C0
 3005C626 05EBF27E C4F04E8B 00001C7A 06C70675 081C7A3E 83007EC9 0BF04E89 .NÞ.è~..>z..u.ú.z....NÞá-·Š.&6.0 0000E0
 8A26F85E C4F276C5 EE5E8C1A F20E8BF0 4E89F446 8CF27E89 F47FC00B 49C1BB47 G.èI.á.¶.-·.F¶.NÞ..·..^Ÿév·á^½&. 000100
 5E8EF45E 8CF27689 E375003F 8026F846 FF46202C 80037C61 3C0774C9 0B048807 ....èt.<a|.., F.F½&.?.uÒ.v·.^¶.^ 000120
 0E50C02B 02EB0001 B8057500 F67E830B 741B0A06 0B1AF6A1 1475001B 0E3E83EE Ÿ.>...u.À-.....t..--.u.¡..Š.+âP. 000140
 1B08168B 1B06A100 01BE1874 00067E83 56570000 10C8CBC9 5F5E02C4 8302FFE8 Ò...á.^_èùà...WV.-..t.ƒ..À...... 000160
 02578B26 078B261B 061EC413 74081AF4 3E83008F E9021B06 0683FA56 89F84689 .F½.V*.....Õ...>¶..t.á...&..&.W. 000180
 F43E8304 1B060683 FA5E8CF8 4689FC46 89078B26 1B061EC4 10EBFA56 89F84689 .F½.V*Š.á...&...F=.F½.^*......>¶ 0001A0
 5E8CF846 89017DB8 097500FC 7E83900A EB0176B8 1575FA46 0BF8468B 0E74081A ..t..F½.F*u.¡v.Š...-=.u.¡)..F½.^ 0001C0
 FFF25EC4 900EEB1B 140E8B1C 741B0C36 39F62BF4 5689F246 89FA568B F8468BFA *.F½.V*.F·.V¶+-96..t.....Š..á^·. 0001E0

Dump of file SATURN:[PCCOMMON.DUMP.DLL]SAUT.TMP;1 on 18-APR-1990 10:52:37.75
File ID (915,21,0)   End of file block 46 / Allocated 48

Virtual block number 13 (0000000D), 512 (0200) bytes

 1A3E8BF3 75003F80 26F246FF F25EC446 90EDEB10 7ECE3B46 1574003F 8026F246 F·&.?.t.F;õ-.ŠÚ.Fá^·.F·&.?.u¤.>. 000000
 06C48301 B3E80EF8 76FFFA76 FF5602C4 830159E8 0E570875 0018043E 83FE2B1B .+±.>...u.W.ÒY..á.V.v*.v½.Ò*..á. 000020
 891B0B16 8B1B06A1 000006C8 90CBC95F 5E02C483 013CE80E 57087400 1B043E83 .>...t.W.Ò<..á.^_èù.à...À....... 000040
 001B0C3E 83FA468B C02A9003 EB01B005 7547067E 83067467 067E83FE 5689FC46 F=.V±.-.gt..-.Gu.¯.Š..*á.F*.>... 000060
 FF1AF236 FF00011B 1406C706 75001B14 3E830074 00FA7E80 00061B14 06C70675 u.ú......-*.t..>...u.ú.....6·.. 000080
 0EC48305 AA1EFF26 1A08068E FC76FFFE 76FF1B16 36FF1B1B 36FF0676 FF1B1436 6...v..6...6...v±.v=....&..¨..á. 0000A0
 C48305AE 1EFF261A 08068E1B 1636FF1B 1836FF14 75001AEA 3E831B74 00FA7E80 .-*.t..>õ..u..6...6......&..Û..á 0000C0
 05B61EFF 261A0806 8E1B1636 FF1B1836 FF147500 1B143E83 1B74001A EA3E8304 ..>õ..t..>...u..6...6......&..Ñ. 0000E0
 08068EFC 76FFFE76 FF1B741B 0A060B1A F6A10000 1C7A06C7 081B0606 8304C483 .á......ú.z...À-.....t..v±.v=... 000100
 000000C8 90CBC901 29EB0E50 C02B02EB 0001B805 74C00B04 C48305BA 1EFF261A .&..¤..á..át.¡..Š.+âP.Ò).èù.à... 000120
 2602478E 2607FF26 378B2606 468A1478 044FFF26 1AEC1EC4 3C75001B 123E8356 V.>...u<á.š.&.O.x..F.&.7&..&.G.& 000140
 9005EB1B 1206FF07 754006C4 83001D02 689A0676 FF531AEE 36FF10EB E42A048B ..*õŠ..6Ÿ.S.v..h....á.∂u.....Š.. 000160
 36FF1BEB 507EF60B 06768857 75001B12 3E835657 000002C8 90CBC95E 1B1006FF ....^èù.à...WV.>...uW.v..--PŠ..6 000180
 1E7EC00B 4EC6881B 1206FF04 754006C4 83008502 689A1C7C 36FF1AEC 36FF1AEE Ÿ..6š..6|..h....á.∂u......6N.á~. 0001A0
 3E8304EB E42A058B 2602478E 2607FF26 3F8B261C 7CA00478 044FFF26 1AEC1EC4 á.š.&.O.xá.|.&.?&..&.G.&..*õŠá.> 0001C0
 5E75001B 123E830A 76885657 000002C8 CBC95F5E 1B100601 06468807 75001B12 ...u..F.....^_èùà...WV.v..>...u^ 0001E0
```

```
Dump of file SATURN:[PCCOMMON.DUMP.DLL]SAUT.TMP;1 on 18-APR-1990 10:52:37.75
File ID (915,21,0)   End of file block 46 / Allocated 48

Virtual block number 14 (0000000E), 512 (0200) bytes

 1206FF04 754006C4 8300F702 689A5098 078A2606 5EC41AEC 36FF1AEE 36FF22EB Š".6Ÿ..6š.á^.&...P.h.%..á.âu.... 000000
 261AEC1E C4078A26 065EC4CD 78044FFF 261AEC1E C42574C0 084EC68B 0646FF1B ..F..6N.âtXá.$.&.O.xëá^.&..á.š.& 000020
 5F5E1B10 06010A46 88077500 1B123E83 CAEBE42A 05882602 478E2607 FF263F8B .?&..&.G.&..*ôŠò.>...u..F.....^_ 000040
 1B1A368B FA4689FC 4689C02B F65689F4 46891B18 168B1B16 A1560000 0CC8CBC9 èùà...VÀ.......F¶.V-+â.F•.F*.6._ 000060
 08EB02EE 83057510 1C7A3E83 06762BF0 28F84689 04C4830A 3001069A F476FF52 R.v¶...0..á..F½+Þ+v..>z..u..Ÿ.Š. 000080
 FF127530 1C7C3E83 1975203F 8026F45E C4227500 1B043E83 4E017508 1C7A3E83 .>z..u.N.>...u"á^¶&.?-u..>|.0u.. 0000A0
 1B043E83 077EF60B 0B74301C 7C3E83F8 4EFF02C4 83FE71E8 0E509807 8A26F446 F¶&...P.Òq±.á..N½.>|.0t..--..>.. 0000C0
 3E830070 E80EFC46 FF077400 1C7A3E83 0066E80E FA46FF07 7400067E 83187400 .t..~..t..F*.Òf..>z..t..F•.Òp..> 0000E0
 7A3E8300 39E80E04 7500FA7E 830A7400 067E8302 C483FE7E E80E5629 75001B04 ...u)V.Ò-±.á..~..t..~*.u..Ò9..>z 000100
 3E8306C4 83FEB5E8 0EF476FF F676FFF8 76FF0040 E80E0475 00FC7E83 0A74001C ..t..~•.u..Òâ..v½.v-.v¶.Òç±.á..> 000120
 002B8805 74001AF6 3E83CBC9 5E02C483 FE38E80E 5600201C 7C06C70E 74001B04 ...t.ú.|. .V.Ò8±.á.^èù.>-..t.¡+. 000140
 3E831775 101C7A3E 8302C483 FDC8E80E 306ACB02 C483FDD2 E80E5000 20B803EB Š.¡ .P.Ò0».á.ùj0.Òà».á..>z..u..> 000160
 01FE46C7 56570000 06C8CB02 C483FDAA E80E5000 788803EB 0058B805 74001AF2 ·..t.¡X.Š.¡x.P.Ò^».á.ùà...WVúF±. 000180
 260A5EC4 9060E80A 46FF021B 06068337 8B261B06 1EC41275 2A3F8026 0A5EC400 .á^.&.?*u.á...&.7......F.Š`.á^.& 0001A0
 387F393C 3F7C303C FA468807 8A260A5E 8BF6280A 46FFFFFF FE46C708 752D3F80 .?-u.úF±...F.+-.^.&...F*<0|?<9.; 0001C0
 CE8B9805 8A261B7F 39308026 06EBFB8B 00301C7C 06C70675 303C0A75 1B0C3639 96..u.<0u.ú.|.0..«Š.&.=9..&....ö 0001E0

Dump of file SATURN:[PCCOMMON.DUMP.DLL]SAUT.TMP;1 on 18-APR-1990 10:52:37.75
File ID (915,21,0)   End of file block 46 / Allocated 48

Virtual block number 15 (0000000F), 512 (0200) bytes

 EEF7FE46 880C468C 0A7E89DF 7D303D80 2647F18B 30E983C8 03E1D1CE 0302E1C1 èÅ..ö1Å.à.Ò0.þG&.=0)Ò.~..F..F±%Ÿ 000000
 FE5E8CFC 46890184 88570000 04C8CBC9 5F5E0C56 880A468B 37892606 5EC4F08B .þá^.&.7.F..V.^ èùà...W¡...F•.^± 000020
 9009E8FE 468CFC7E 890001BB F4750D38 26117400 3D802647 01E8FC7E C4064E8A .N.á-•Š.G&.=.t.Ž8.u¶¡...-•.F±Š.. 000040
 1E17C8A3 E0865800 00FFFF9A 5016C488 50EC8B55 90C8C95F C02BFE46 8CFC7E89 .-•.F±+â_èù.U.$P.á.P.....X.ÅÈà.. 000060
 9A50CB5D E5880001 880CE115 E69A04F4 E80021E8 0000FFFF 9A018A68 1E018C68 h...h.......Òl.Ò¶..l.Ä.¡...[]ùP. 000080
 3D80267F FF89018C 068EFF33 000DBB1E 019216FF 00FF6810 1210C29A 1005106E n....ô...h.......E..3.....¿..&.= 0000A0
 061CEBE7 74AEF2C0 330874CA 88A6F3C8 88D18805 968E3174 00308026 47017500 .u.G&.=.t1ƒ...l.ùµl.òt.3á·ÙtÒŠ.. 0000C0
 885500C3 1FEDEBAA C20A0572 412CAC92 04E0C00E 72412CAC 17CFBF1F F788071E ...¥.¢ü.¯,Ar.áÅ..¯,Ar..ò¯ŠÚ.Û.U. 0000E0
 E5881078 10C29A50 00FFB805 A41EFF04 740005A6 3E831017 10C29A50 00FCB8EC $¡•.P.ô....>l..t...Ê.¡..P.ò.x..l 000100
 C033970C 74964010 74C23BAD 1A12BE06 5688C08E D88E03F1 885756EC 8855CB5D ]ùW.$VW¡b..Ä.ä.V.ƒ..Ù;òt.ª.t..3â 000120
 C00B108C 10929A06 76FF57EC 88550002 CA5DE58B 5E5F96E8 E8F788AE F2FFFFB9 ¿...·Ò.¥Š$._^.[]ò..U.ŠW.v.......â 000140
 0000FFFF 9A501651 521E5300 028BC48B 5049D1F7 AEF2FFFF B9C033FA 88921F74 t...•3â¿..¯ÙÅïIP.áE..S.RQ.P..... 000160
 E0D1C88B F9F7000C B99905CA 2D04468B 05A806FF 000004C8 0002CA5D E5885F5B [_.[]ò..à.....´..F.-ò..¿..¥*.àïÅ 000180
 26064789 26045EC4 02C48310 CC13E99A 020068FE 5E8CFC46 89118E05 E0D1C103 .ëïÅ.ƒ..F•.^±h...Õ.ä..á.á^.&.G.& 0001A0
 040A4F80 26045EC4 9021E802 000247C7 26FC5EC4 080A4F80 261174D0 08085789 .W..Ât.&.O..á^•&ùG...Šl.á^.&.O.. 0001C0
 2606478B 26045EC4 00010247 C726FC5E C4085789 26064789 2640FE56 88FC468B .F•.V±â&.G.&.W.á^•&ùG...á^.&.G.& 0001E0

Dump of file SATURN:[PCCOMMON.DUMP.DLL]SAUT.TMP;1 on 18-APR-1990 10:52:37.75
File ID (915,21,0)   End of file block 46 / Allocated 48

Virtual block number 16 (00000010), 512 (0200) bytes

 0A478A26 065EC4F6 28560000 04C8C3C9 00000447 C7260257 89260789 2608578B .W.&..&.W.&ùG...èùà...V+-á^.&.G. 000000
 0111BE87 F606D86B F9F7000C B99905CA 20C38815 75080A47 F6265575 023C0324 $.<.ùU&-G..u..û-ò..¿..¥*kÄ.-.ƒ.. 000020
 08478A26 0677FF26 0877FF26 50287EC0 08FC4689 06472B26 07882606 5E883974 t9.^.&..&+G..F•.â~(P&.W.&.W.&.G. 000040
 8B26065E C4FFFFBE 200A4F80 26065EC4 0874FC46 3808C483 11231246 9A50E42A *ÒP.F.#..á.;F•t.á^.&.O. ƒ..á^.&. 000060
 1E38065E 88EC8855 CBC95EC6 88000004 47C72602 57892607 89260857 88260647 G.&.W.&..&.W.&ùG....ó^èùU.$.^.;. 000080
 51160C76 FF0876FF 0A76FF53 CC8804EC 830530E9 0524E9C0 3300098A 087217CD ë.r.¤..3âÕ$.Ò0..$..âS.v..v..v..Q 0000A0
 38065E88 0CEC83EC 885500C8 5DE588FD 17CFA780 91E175C0 855A5900 00FFFF9A .....YZ.âuÄ..Iü.».[]ù.U.$.$..^.; 0000C0
 16F44680 51414151 51C93353 12742017 CF87F604 E3E9C033 0009BA08 7217CD1E .ë.r.¤..3âÒ0.-.ü. t.S3èQQAAQ.F¶. 0000E0
 57FCFC46 89FE4689 C0330856 C50A468E FA5E8C66 748017CF 87F60000 12319A50 P.1...-.ü..tf.^*.F.éV.3â.F±.F••W 000100
 8B048BE2 28008084 DC8802EC 833875AE F20AB049 E30C4E88 F86689F2 88FA8856 V.*.-.f½.N.0l¯.·Òu;.$..É¤..+ã.á. 000120
 1FE80375 FB3B0080 009AE900 2BE8F4E2 AA1A74FB 3B0D740A 3CAC0C4E 880716FA *...N.¯<.t.;«t.¯â¶Ò+.Ò..¯. •u.Ò. 000140
 11D614D2 9AFFFCB8 7AE80093 E9FA5E8E 5F5EE1E8 0014E8E2 EBFC46FF 0AB0AA00 .¯¯..F•Šâò..ŠÄ^.^*Ò..Šz¡•..´.•. 000160
 75C00800 0010EC9A 5016F446 8D51521E 53065E88 1FE3CA28 CF8B1F06 1E515350 PSQ....ù+ÞD..^.Š.RQ.F¶.P.$....âu 000180
 30D07400 603D1874 C00B08C4 831FC3FA 88585859 1F07740B 08FE5E01 F45E8B11 ..^¶.^±.Ùt..Y[X.*û..á..ât.=m.t.= 0001A0
 880A5E8E 0E744017 CF87F6FE 5E8E26EB F90020BA 03EB001C 8A087500 098A0001 ..¤..u.¤..Š.¤ .*Š&.^±-.ü.ªt..^.. 0001C0
 FA5E8E5F 5EF8668B FC462BFE 468806EB F9C03300 1C8A0EEB F803751A 3F80085E ^..?.u.½Š.¤..3â*Š..F±+F•.f½^_.^* 0001E0
```

Dump of file SATURN:[PCCOMMON.DUMP.DLL]SAUT.TMP;1 on 18-APR-1990 10:52:37.75
File ID (915,21,0)   End of file block 46 / Allocated 48

Virtual block number 17 (00000011), 512 (0200) bytes

```
16F4468D 51521E53 0856C51E EEEBC188 0475C908 0C4E8803 C7E9CB5D E5880472 r..[]üÕú..N..èu..êŠŸ.éV.S.RQ.F¶. 000000
BAC7EB00 1CBACC75 00098A00 01300074 006D3017 74C0081F 071E0000 13099A50 P.........ât.=m.t.=..¤..uëa..Šúa 000020
33001CBA A6EB0275 1A3F8026 DA880A74 4017CF87 F68775C0 0BF44688 C2EB0020  .Šõ.F¶.âuñ-.ü.ãt..Õ&.7.u.Š|¤..3 000040
5602EC83 EC8855CB 5DE58801 FE4F8026 0574C308 C08C065E C4EC8855 00A3EBC0 âŠÈ.U.±ó^..â.ût.&.O±..[]üU.$.$.V 000060
0018E815 750082E8 19EAA312 740025E8 08750019 EA3E831E 73FFF13D 06468857 W.F.=þ.s..>õ..u.ÕX.t.Èõ.Õ..u.Õ.. 000080
0776065E 3900F08B CB50E588 5E5F02C4 8312EE17 DE9A0676 FF0B7500 78E80574 t.Õx.u..v..B.Ÿ..ó._^.[]üEÞ.9^.v. 0000A0
FA8308C4 83141D19 E29A5002 80510E4F 8D50501E C033FE5E 89FEE383 43065E88 .^.C.D±.^±3â.PP.O.Õ¯.P.ã....ó..* 0000C0
480008A3 C033D88E FE5E8800 08A30A8E 05740208 19EEA319 EC1687C2 883874FF .t8.õ..š.ÈŸ..Øt..ÕÈ...^±.Ä3âÈ..H 0000E0
8ED88CC3 1FD88C00 06A30000 05000AA3 01478D00 02A30000 A3000A88 0C478948 H.G.|..È..È...G.È.....È...Ä.ü.Ä. 000100
88550626 E900B357 56EC8855 C3D98EC1 8CD20803 8AE819EE 1E8E0833 064E88C0 ó.N.3Ü..Ÿ.Õ...Ø.ê.\üU.$VW*.Õ&.U. 000120
5DE588C0 3302EB00 01880574 4017CF87 F60C7C00 F883117D 17CD1E38 065E88EC š.^.;.ë.)..«.|.-.ü.ãt.|..Š.3â.[] 000140
FB1EE9C0 33057540 05C4A1C8 5152E388 057205C8 1E380872 082B0C88 5A5900C8 ù.YZ.É+Är.;.à.r..DRQùÁó.ãu.3âÕ.« 000160
C0080000 FFFF9A52 16501653 C4885087 17CFA780 D4885200 028805C4 2EFF5152 RQ..ó.E..R.â.Iü.ñP.óS.P.R......â 000180
C41EE319 FC0E885A D4794817 CF8F0808 81067500 02300774 00013040 81127558 Xu.Ÿã=..t.=..u.Ÿ...ü.KyâZ..•.D.ó 0001A0
1A068E19 FA1EFF00 038BC28C 1A0206C4 01AEE903 7319FA1E FFD833C2 8C19FE06 .±..õ3Ü..*.s.ÕÜ.ó....õÈ....*./.. 0001C0
FFFF9A15 73680E01 6A087419 F83019F4 880073E8 1A068F1A 068E007C E81A068F ¢..Õ|./..¢..Õs.¡¶.=½.t.j..hs.... 0001E0
```

Dump of file SATURN:[PCCOMMON.DUMP.DLL]SAUT.TMP;1 on 18-APR-1990 10:52:37.75
File ID (915,21,0)   End of file block 46 / Allocated 48

Virtual block number 18 (00000012), 512 (0200) bytes

```
8EEC8855 0000156E 9A006A00 6A036A00 51E819F8 8F19F48E D88E1098 88C30000 ..û|...Ä/¶.¢½.Õo.j.j.j..n...U.š/ 000000
8E0023E8 1A068F1A 068EEC88 5503E800 31E819F8 8F19F48E 003AE81C 7E8F1C7E -.¢-.Õ:./¶.¢½.Õ1.Š.U.š/..¢..Õ#./ 000020
FA1EFF00 02B807E3 19FC0E88 0000FFFF 9A500646 8A50C033 001AE81A 068F1A06 ..¢..Õ..3âP.F.P.......•.D.È....* 000040
FF2BF62B 56570000 14C800C3 EEEB1DFF F2740245 08058804 EF830E73 F73BC319 .û;¼s..ÿ....E.t·..ŠŸü.â...WV+-+. 000060
F876FF0C 6AF85689 F64689F2 5689F046 89C02801 8C168800 F0E90375 018C3639 96..u.Õþ.....+â.FÞ.V·.F-.V½j..v½ 000080
F65EC400 8CE90376 7FFFFE81 461974C0 080AC483 165A1A98 9A059668 1EF676FF .v-.h.....Z..ó..ât.F.±..v.ÕŸ.ó^- 0000A0
75003F80 26F65E88 F475003F 8026F646 FFF65EC4 0CEB47EA 75003F80 26F646FF .F-&.?.uõGŠ.ó^-.F-&.?.u¶.^-&.?.u 0000C0
468902C4 83169F13 E99A56EE 5689EC46 8904C483 1669198A 9A046A50 014580BA ¤.E.Pj....i..ó..Fš.VŸV.Õ....ó..F 0000E0
19D71689 19D5A3EE 5688EC46 886674C2 08FC4688 6074EE46 08EC4688 FE5689FC •.V±.Fš.FŸtm.F•.õtf.Fš.VŸÈ[...•. 000100
5688FC46 88EC5EC4 2C74C008 0AC48314 491A989A 0596681E F076FFF2 76FF0C6A j..v·.vÞ.h.....I..ó..ât,ó^š.F•.V 000120
C00A0788 26FC46FF FC5EC407 8A26F046 FFF05EC4 04EC4683 02578926 078926FE ±&..&.W..Fš.ó^Þ.FÞ&..ó^•.F•&...â 000140
028890C8 C95F5EA7 75003F80 26F05EC4 F475003F 8026F046 FFF05EC4 E8E80E74 t.Šõó^Þ.FÞ&.?.u¶ó^Þ&.?.uI^_èü.|. 000160
120F1600 160C0808 070A0C09 0C080C07 09060005 18040203 02021601 F91AE900 .Õ.*............................ 000180
0A801606 09721C70 2060006C 08590057 00530052 02430041 02350212 12110010 ......5.A.C.R.S.W.Y.l.m p.r..... 0001A0
E8CB5DE5 8899FFFF 8817C416 8917CBA3 16080000 08D702CE 08A40084 09820A81 ......È.ö.•.....Èù...ó.|....[]üÕ 0001C0
F7E24343 1674073A 2E1875E4 0A0024B9 16F48817 CBA3CB5D E58899FF FF880008 ..|....[]üÈù.É¶.¿$..õu..:.t.CCã½ 0001E0
```

Dump of file SATURN:[PCCOMMON.DUMP.DLL]SAUT.TMP;1 on 18-APR-1990 10:52:37.75
File ID (915,21,0)   End of file block 46 / Allocated 48

Virtual block number 19 (00000013), 512 (0200) bytes

```
000006C8 00C317C4 A3980147 8A2E4301 76CA3C04 728C3C43 0A76243C 0472133C <.r.<$v.C<¥r.<õv.C..G..Èó.û.à... 000000
83161A11 829A5306 0E74830A 47F626FA 5EC41CEB F628FC5E 8CFA4689 05CA8856 V|õ..F*.^•+-Š.ó^*&-G..t..S...... 000020
88EC8855 90C8C95E C688D876 FA463917 8A168817 88A10CFA 46834601 744004C4 ó.ãt.F.F*.Å|...¤.9F*vÄ.ó^èü.U.š. 000040
00058807 1E297500 3F8319E0 885756EC 8855CB50 E58801FE 4F800474 D808065E ^..Üt..O±..[]üU.$VWEÅ..7.u)..|.. 000060
FFFEFE44 C704C683 000104C7 9619E2A3 19E0A3FE 244024E8 99C03305 750176E8 Õv.u.3â.$$ã$±ÈÅ.Èã..ú....ó.úD±±. 000080
EEF983FE E180FA74 41000DE9 C85DE588 5E5F0009 E8C08ED8 8C064E88 19E63689 .ó[..N..Ä.âÕ.._^.[]üÕÅ.At*.Ä±.*Ÿ 0000A0
000205C2 03357401 A8ADF003 D0881573 C1384843 7401A8FE 88ADFC02 7788F273 ¢·.w.=Ü.±´.tCH;ès..Å.ÞÜ´.t5.õ... 0000C0
DA8CC688 FE4CFEF9 0305E805 8948C128 FE4C89F9 030C74FE 88E6EBFE 4489F788 .%.D±Š].±t..*.L±+èH..Š..*±L±.ó.Ö 0000E0
ADF003FE 882574FF FE3D0219 F206C626 C3027F89 19EE1E8C 26057401 38157489 ¿t.;]t.&..Ÿ....û&ó.·..=±.t%.±.ÞÜ 000100
E6E8FE44 89F78800 0205C203 E27401A8 ADF00300 888C73C1 3848FE88 F27401A8 ´.t·.±H;ês¥.Å.ÞÜ´.tã.õ....%.D±Š] 000120
19EA1E8E 260574C7 3818718F 088C1274 19F20EFE 2615E808 8E0474C0 0808478B .G..ât..ÄŠ.&±.·.t..Ä¢q.;út.&..õ. 000140
0010E8FE 40FE0074 005FE898 40400124 0074C638 0068E8C0 33067788 88E83788 .7ŠE.w.3âÕk.;õt.$.ãã.Õ_.t.±M±Õ.. 000160
458851C3 99C03302 4789078B 19EEA326 0474C138 18C5890B 8C98EB4E 4E960574 t..NNŠ..Ä¿é.;èt.&ÈŸ....G.3â.ûQ.E 000180
C2031572 C603C188 F575EAD1 047619F0 1638267F FFBA4141 49C82803 7401A8FE ±´.t.+â|AA¤..&;.Þ.v.lõu%.è.ór..õ 0001A0
88571874 001DE851 52C359C0 33E575EA D1D2F708 75000CE8 C628C223 D2F70072 r.%Ø#õ+óÕ..u.%Ø1õu[3ãYûRQÕ..t.W. 0001C0
52521ED2 335053C3 5A5958FE 55894AD7 28D68806 7789FFFE FE44C7F2 03F088FE ±.Þ.·úD±±..w..Ø+•J.U±XYZûSP3Ø.RR 0001E0
```

```
Dump of file SATURN:[PCCOMMON.DUMP.DLL]SAUT.TMP;1 on 18-APR-1990 10:52:37.75
File ID (915,21,0)   End of file block 46 / Allocated 48

Virtual block number 20 (00000014), 512 (0200) bytes

 6A560000 0AC8C3D2 0B02745B 5A1FFFFA 8308C483 17AD19E2 9A1F0650 0001B850 P|..P...ã.Ù..á..ª..Z[t..@ûà...Vj 000000
 902FEB99 C02B0674 FFFFC2F7 FA5689F8 46891987 1B809A06 76FF006A 0876FF00 ..v.j..v....ñ..F½.V¹¼ô..t.+à.$/. 000020
 18389A50 FE76FF00 6A561274 D00BFE56 89FC4689 02C48319 D013E99A 56F8768B .v½V.Ö.Å..é..F•.V±.Åt.Vj..v±P.8. 000040
 948F3875 000A7E83 065756EC 8B5590CB C95EFE56 8BFC468B 9007EB08 C483197A z..á.Š...F=.V±^èù.U.šVW..~..uß¢. 000060
 8902448B 0074F73B 11744805 94368B4C EB277200 57EB0775 4806468B 08568B01 ..V..F.Hu.ÒW.r'ŠL.6..Ht.;¼t..D.. 000080
 52C48B50 21EB99FF FF8B0675 D20B0473 0594FE81 04C68334 735E003E E8560E46 F.VÒ>.^s4.6..±..s..@u.|...Š!P.6R 0000A0
 5E5F07C0 33D38B05 94368902 5C891489 E675C085 F95B0000 FFFF9A50 C0335016 .P3àP.....[ª.àu]...\..6...Æ3â._^ 0000C0
 26721C03 DA8B2CEB F9F27505 94FE8104 C6830C74 024C39F7 8B0E4E8B CB5DE58B .Ì]ù.N..¼9L.t..6..±..u·ª$,.Ö..r& 0000E0
 8E168904 75F73BDE 75C08500 00FFFF9A 51531373 018E1E39 0675F738 C18ED38B .Æ.è;¼u.9...s.SQ......åuß;¼u.... 000100
 D9F7AEF2 C033F78B 067EC4D9 8B27E30E 4E8B1E56 57EC8B55 00C3D18B 04879201 .....ìû.U.šWV..N.D'.ìá~..¼3à·Û%ì 000120
 8B5F5E1F C18BD1F7 49490474 0477FF45 3A26C933 FF448AA6 F30A76C5 FE8BCB03 .ù.±év.µÌ.D.3è&:E.w.t.II%Ì.ê.^_. 000140
 0B0E750A F9831374 C00A93FC 071E570A 7EC51E08 568B0646 8B0E4E8B 00CB5DE5 Ì]ù..N..F..V..é-.W..=..åt..ª.u_. 000160
 3004D387 92F1F793 F1F70274 C00BD233 92F78BDA F700D283 DBF7AA2D B00A79D2 @y.¯-¯¼Ù.@.¼Ö.¼.3@.åt.¼þ.¼ ..Æ.0 000180
 58DA8CF2 72C73B01 448DFF44 8B0586AC 4F0588E2 75C30BC2 8BAA2704 0276393C <9v..'`.ô.ûuã..O¯...D..D.;L ·.ÖX 0001A0
 D3230B1B D12B0C74 DAF7D78B 067EC457 38E30C4E 8BEC8B55 00CB5DE5 8B5E5F1F ._^.Ì]ù.U.š.N.D8Wá-..■¼Öt.+Ì.u#Æ 0001C0
 D1C38EFF FFC381C3 8C10E3D1 87AAF3C9 13ABF3E9 D1E08A0A 468BD12B D187D103 .Ť.ì+Ì.F..ÅìÕµ¨.èµ^.ìD..û.ù...ûì 0001E0

Dump of file SATURN:[PCCOMMON.DUMP.DLL]SAUT.TMP;1 on 18-APR-1990 10:52:37.75
File ID (915,21,0)   End of file block 46 / Allocated 48

Virtual block number 21 (00000015), 512 (0200) bytes

 0B750A5E 8BD8080C 5E8B0846 8BEC8B55 CB5D0856 8B064688 5FAAF3C9 13ABF3E9 Õµ¨.èµ¯_.F..V.]ùU.š.F..^..Ä.^.u. 000000
 E58B0103 E3F70646 8BC8030C 66F70646 8BC88BE3 F70008CA 5DE58BE3 F706468B .F.%D.Ì]ò..%D.à.F.%f..à.F.%D.Ì.Ì 000020
 FA000200 07000215 8B010300 05000215 C0010300 00000519 9C000200 0C08CA5D ]ò.............å...............ª 000040
 72010300 8B00021B 6B010500 2600021A 81010300 2200021A 36010300 00000718 .......6..."......&...k.......r 000060
 92020300 5C00020F E5010300 5B00020F F8010300 4D000215 0A010300 3A000212 ...:.......M...½...[...Ì...\.... 000080
 54206E75 52205340 00000000 00000000 00000000 00000000 00000000 5E000413 ...^....................MS Run-T 0000A0
 38383931 20296328 20746867 69727970 6F43202D 20797261 7262694C 20656D69 ime Library - Copyright (c) 1988 0000C0
 2500000A 00732500 20202020 00200011 70726F43 2074666F 736F7263 694D202C , Microsoft Corp.. .    .%s....% 0000E0
 20202000 00732500 000A0073 25000A00 63250063 25006325 00732500 000A0073 s....%s.%c.%c.%c...%s....%s..    000100
 10104820 20202020 20202020 20202020 20202020 20282828 28282020 20202020       (((((               H.. 000120
 81811010 10101010 10848484 84848484 84848410 10101010 10101010 10101010 ................................ 000140
 82821010 10101010 01010101 01010101 01010101 01010101 01010101 81818181 ................................ 000160
 00000020 10101010 02020202 02020202 02020202 02020202 02020202 82828282 ............................ ... 000180
 00000000 00000000 00000000 00000000 00000000 00000000 00000000 00000000 ................................ 0001A0
 00000000 00000000 00000000 00000000 00000000 00000000 00000000 00000000 ................................ 0001C0
 00000000 00000000 00000000 00000000 00000000 00000000 00000000 00000000 ................................ 0001E0

Dump of file SATURN:[PCCOMMON.DUMP.DLL]SAUT.TMP;1 on 18-APR-1990 10:52:37.75
File ID (915,21,0)   End of file block 46 / Allocated 48

Virtual block number 22 (00000016), 512 (0200) bytes

 00000000 00000000 00000000 00000000 00000000 00000000 00000000 00000000 ................................ 000000
 1C800000 00000000 2320202B 00296C6C 756E2800 296C6C75 6E280000 00000000 ......(null).(null).+- #........ 000020
 00000000 00000000 00000000 00000000 00000000 00000000 1A081C80 15A31C80 ..È............................. 000040
 00000000 00000000 00000000 00000000 00000000 00000000 00000000 00000000 ................................ 000060
 00000000 00000000 00000000 00000000 00000000 00000000 00000000 00000000 ................................ 000080
 00000000 00000000 00000000 00000000 00000000 00000000 00000000 00000000 ................................ 0000A0
 00000000 00000000 00000000 00000000 00000000 00000000 00000000 00000000 ................................ 0000C0
 00000000 00000000 00000000 00000000 00000000 00000000 00000000 00000000 ................................ 0000E0
 00000000 00000000 00000000 00000000 00000000 00000000 00000000 00000000 ................................ 000100
 00000000 00000000 00000000 00000000 00000000 00000000 00000000 00000000 ................................ 000120
 00000000 00000000 00000000 00000000 00000000 00000000 00000000 00000000 ................................ 000140
 00000000 00000000 00000000 00000000 00000000 00000000 00000000 00000000 ................................ 000160
 00000000 00000000 00000000 00000000 00000000 00000000 00000000 00000000 ................................ 000180
 00000000 00000000 00000000 00000000 00000000 00000000 00000000 00000000 ................................ 0001A0
 00000000 00000000 00000000 00000000 00000000 00000000 00000000 00000000 ................................ 0001C0
 00000000 00000000 00000000 00000000 00000000 00000000 00000000 00000000 ................................ 0001E0
```

```
Dump of file SATURN:[PCCOMMON.DUMP.DLL]SAUT.TMP;1 on 18-APR-1990 10:52:37.75
File ID (915,21,0)   End of file block 46 / Allocated 48

Virtual block number 23 (00000017), 512 (0200) bytes

 00000000 00000000 00000000 00000000 00000000 00000000 00000000 00000000 ................................ 000000
 00000000 00000000 00000000 00000000 00000000 00000000 00000000 00000000 ................................ 000020
 00000000 00000000 00000000 00000000 00000000 00000000 00000000 00000000 ................................ 000040
 00000000 00000000 00000000 00000000 00000000 00000000 00000000 00000000 ................................ 000060
 00000000 00000000 00000000 00000000 00000000 00000000 00000000 00000000 ................................ 000080
 00000000 00000000 00000000 00000000 00000000 00000000 00000000 00000000 ................................ 0000A0
 00000000 00000000 00000000 00000000 00000000 00000000 00000000 00000000 ................................ 0000C0
 00000000 00000000 00000000 00000000 00000000 00000000 00000000 00000000 ................................ 0000E0
 00000000 00000000 00000000 00000000 00000000 00000000 00000000 00000000 ................................ 000100
 00000000 00000000 00000000 00000000 00000000 00000000 00000000 00000000 ................................ 000120
 00000000 00000000 00000000 00000000 00000000 00000000 00000000 00000000 ................................ 000140
 00000000 00000000 00000000 00000000 00000000 00000000 00000000 00000000 ................................ 000160
 00000000 00000000 00000000 00000000 00000000 00000000 00000000 00000000 ................................ 000180
 00000000 00000000 00000000 00000000 00000000 00000000 00000000 00000000 ................................ 0001A0
 00000000 00000000 00000000 00000000 00000000 00000000 00000000 00000000 ................................ 0001C0
 00000000 00000000 00000000 00000000 00000000 00000000 00000000 00000000 ................................ 0001E0

Dump of file SATURN:[PCCOMMON.DUMP.DLL]SAUT.TMP;1 on 18-APR-1990 10:52:37.75
File ID (915,21,0)   End of file block 46 / Allocated 48

Virtual block number 24 (00000018), 512 (0200) bytes

 00000000 00000000 00000000 00000000 00000000 00000000 00000000 00000000 ................................ 000000
 00000000 00000000 00000000 00000000 00000000 00000000 00000000 00000000 ................................ 000020
 16EE19F6 16EE0000 00000000 00304F46 4E495F45 4C49465F 435F0194 00000000 ......C_FILE_INFO=.......Ÿ.-.Ÿ. 000040
 000005D2 00000200 FFFFFFFF 01010000 000005B8 16EE05B4 16EE05B0 16EE05AC ¯.Ÿ.¯.Ÿ.Ç.Ÿ.¡...............●... 000060
 00000202 00000000 00000000 00000102 00000000 00000000 00000001 1A060000 ................................ 000080
 00000000 00000000 00000000 00000000 00000000 00000000 00000000 00000000 ................................ 0000A0
 00000000 00000000 00000000 00000000 00000000 00000000 00000000 00000000 ................................ 0000C0
 00000000 00000000 00000000 00000000 00000000 00000000 00000000 00000000 ................................ 0000E0
 00000000 00000000 00000000 00000000 00000000 00000000 00000000 00000000 ................................ 000100
 00000000 00000000 00000000 00000000 00000000 00000000 00000000 00000000 ................................ 000120
 00000000 00000000 00000000 00000000 00000000 00000000 00000000 00000000 ................................ 000140
 00000000 00000000 00000000 00000000 00000000 00000000 00000000 00000000 ................................ 000160
 00000000 00000000 00000000 00000000 00000000 00000000 00000000 00000000 ................................ 000180
 00000000 00000000 00000000 00000000 00000000 00000000 00000000 00000000 ................................ 0001A0
 00000000 00000000 00000000 00000000 00000000 00000000 00000000 00000000 ................................ 0001C0
 00000000 00000000 00000000 00000000 00000000 00000000 00000000 00000000 ................................ 0001E0

Dump of file SATURN:[PCCOMMON.DUMP.DLL]SAUT.TMP;1 on 18-APR-1990 10:52:37.75
File ID (915,21,0)   End of file block 46 / Allocated 48

Virtual block number 25 (00000019), 512 (0200) bytes

 00000000 00000000 00000000 00000000 00000000 00000000 00000000 00000000 ................................ 000000
 00000000 00000000 00000000 00000000 00000000 00000000 00000000 00000000 ................................ 000020
 00000000 00000000 00000000 00000000 00000000 00000000 00000000 00000000 ................................ 000040
 00000000 00000000 00000000 00000000 00000000 00000000 00000000 00000000 ................................ 000060
 00000000 00000000 00000000 00000000 00000000 00000000 00000000 00000000 ................................ 000080
 00000000 00000000 00000000 00000000 00000000 00000000 00000000 00000000 ................................ 0000A0
 00000000 00000000 00000000 00000000 00000000 00000000 00000000 00000000 ................................ 0000C0
 00000000 00000000 00000000 00000000 00000000 00000000 00000000 00000000 ................................ 0000E0
 00000000 00000000 00000000 00000000 00000000 00000000 00000000 00000000 ................................ 000100
 00000000 00000000 00000000 00000000 00000000 00000000 00000000 00000000 ................................ 000120
 00000000 00000000 00000000 00000000 00000000 00000000 00000000 00000000 ................................ 000140
 00000000 00000000 00000000 00000000 00000000 00000000 00000000 00000000 ................................ 000160
 00000000 00000000 00000000 00000000 00000000 00000000 00000000 00000000 ................................ 000180
 00000000 00000000 00000000 00000000 00000000 00000000 00000000 00000000 ................................ 0001A0
 00000000 00000000 00000000 00000000 00000000 00000000 00000000 00000000 ................................ 0001C0
 00000000 00000000 00000000 00000000 00000000 00000000 00000000 00000000 ................................ 0001E0
```

```
Dump of file SATURN:[PCCOMMON.DUMP.DLL]SAUT.TMP;1 on 18-APR-1990 10:52:37.75
File ID (915,21,0)   End of file block 46 / Allocated 48

Virtual block number 26 (0000001A), 512 (0200) bytes

00000000 00000000 00000000 00000000 00000000 00000000 00000000 00000000 ................................ 000000
00000000 00000000 00000000 00000000 00000000 00000000 00000000 00000000 ................................ 000020
00000000 00000000 00000000 00000000 00000000 00000000 00000000 00000000 ................................ 000040
00000000 00000000 00000000 00000000 00000000 00000000 00000000 00000000 ................................ 000060
00000000 00000000 00000000 00000000 00000000 00000000 00000000 00000000 ................................ 000080
00000000 00000000 00000000 00000000 00000000 00000000 00000000 00000000 ................................ 0000A0
00000000 00000000 00000000 00000000 00000000 00000000 00000000 00000000 ................................ 0000C0
00000000 00000000 00000000 00000000 00000000 00000000 00000000 00000000 ................................ 0000E0
00000000 00000000 00000000 00000000 00000000 00000000 00000000 00000000 ................................ 000100
00000000 00000000 00000000 00000000 00000000 00000000 00000000 00000000 ................................ 000120
00000000 00000000 00000000 00000000 00000000 00000000 00000000 00000000 ................................ 000140
00000000 00000000 00000000 00000000 00000000 00000000 00000000 00000000 ................................ 000160
00000000 00000000 00000000 00000000 00000000 00000000 00000000 00000000 ................................ 000180
00000000 00000000 00000000 00000000 00000000 00000000 00000000 00000000 ................................ 0001A0
00000000 00000000 00000000 00000000 00000000 00000000 00000000 00000000 ................................ 0001C0
00000000 00000000 00000000 00000000 00000000 00000000 00000000 00000000 ................................ 0001E0

Dump of file SATURN:[PCCOMMON.DUMP.DLL]SAUT.TMP;1 on 18-APR-1990 10:52:37.75
File ID (915,21,0)   End of file block 46 / Allocated 48

Virtual block number 27 (0000001B), 512 (0200) bytes

00000000 00000000 00000000 00000000 00000000 00000000 00000000 00000000 ................................ 000000
00000000 00000000 00000000 00000000 00000000 00000000 00000000 00000000 ................................ 000020
00000000 00000000 00000000 00000000 00000000 00000000 00000000 00000000 ................................ 000040
00000000 00000000 00000000 00000000 00000000 00000000 00000000 00000000 ................................ 000060
00000000 00000000 00000000 00000000 00000000 00000000 00000000 00000000 ................................ 000080
00000000 00000000 00000000 00000000 00000000 00000000 00000000 00000000 ................................ 0000A0
00000000 00000000 00000000 00000000 00000000 00000000 00000000 00000000 ................................ 0000C0
00000000 00000000 00000000 00000000 00000000 00000000 00000000 00000000 ................................ 0000E0
00000000 00000000 00000000 00000000 00000000 00000000 00000000 00000000 ................................ 000100
00000000 00000000 00000000 00000000 00000000 00000000 00000000 00000000 ................................ 000120
00000000 00000000 00000000 00000000 00000000 00000000 00000000 00000000 ................................ 000140
00000000 00000000 00000000 00000000 00000000 00000000 00000000 00000000 ................................ 000160
00000000 00000000 00000000 00000000 00000000 00000000 00000000 00000000 ................................ 000180
00000000 00000000 00000000 00000000 00000000 00000000 00000000 00000000 ................................ 0001A0
00000000 00000000 00000000 00000000 00000000 00000000 00000000 00000000 ................................ 0001C0
00000000 00000000 00000000 00000000 00000000 00000000 00000000 00000000 ................................ 0001E0

Dump of file SATURN:[PCCOMMON.DUMP.DLL]SAUT.TMP;1 on 18-APR-1990 10:52:37.75
File ID (915,21,0)   End of file block 46 / Allocated 48

Virtual block number 28 (0000001C), 512 (0200) bytes

00000000 00000000 00000000 00000000 00000000 00000000 00000000 00000000 ................................ 000000
00000000 00000000 00000000 00000000 00000000 00000000 00000000 00000000 ................................ 000020
00000000 00000000 00000000 00000000 00000000 00000000 00000000 00000000 ................................ 000040
00000000 00000000 00000000 00000000 00000000 00000000 00000000 00000000 ................................ 000060
00000000 00000000 00000000 00000000 00000000 00000000 00000000 00000000 ................................ 000080
00000000 00000000 00000000 00000000 00000000 00000000 00000000 00000000 ................................ 0000A0
00000000 00000000 00000000 00000000 00000000 00000000 00000000 00000000 ................................ 0000C0
00000000 00000000 00000000 00000000 00000000 00000000 00000000 00000000 ................................ 0000E0
00000000 00000000 00000000 00000000 00000000 00000000 00000000 00000000 ................................ 000100
00000000 00000000 00000000 00000000 00000000 00000000 00000000 00000000 ................................ 000120
00000000 00000000 00000000 00000000 00000000 00000000 00000000 00000000 ................................ 000140
00000000 00000000 00000000 00000000 00000000 00000000 00000000 00000000 ................................ 000160
00000000 00000000 00000000 00000000 00000000 00000000 00000000 00000000 ................................ 000180
00000000 00000000 00000000 00000000 00000000 00000000 00000000 00000000 ................................ 0001A0
00000000 00000000 00000000 00000000 00000000 00000000 00000000 00000000 ................................ 0001C0
00000000 00000000 00000000 00000000 00000000 00000000 00000000 00000000 ................................ 0001E0
```

```
Dump of file SATURN:[PCCOMMON.DUMP.DLL]SAUT.TMP;1 on 18-APR-1990 10:52:37.75
File ID (915,21,0)   End of file block 46 / Allocated 48

Virtual block number 29 (0000001D), 512 (0200) bytes

00000000 00000000 00000000 00000000 00000000 00000000 00000000 00000000 ................................ 000000
00000000 00000000 00000000 00000000 00000000 00000000 00000000 00000000 ................................ 000020
00000000 00000000 00000000 00000000 00000000 00000000 00000000 00000000 ................................ 000040
00000000 00000000 00000000 00000000 00000000 00000000 00000000 00000000 ................................ 000060
00000000 00000000 00000000 00000000 00000000 00000000 00000000 00000000 ................................ 000080
00000000 00000000 00000000 00000000 00000000 00000000 00000000 00000000 ................................ 0000A0
00000000 00000000 00000000 00000000 00000000 00000000 00000000 00000000 ................................ 0000C0
00000000 00000000 00000000 00000000 00000000 00000000 00000000 00000000 ................................ 0000E0
00000000 00000000 00000000 00000000 00000000 00000000 00000000 00000000 ................................ 000100
00000000 00000000 00000000 00000000 00000000 00000000 00000000 00000000 ................................ 000120
00000000 00000000 00000000 00000000 00000000 00000000 00000000 00000000 ................................ 000140
00000000 00000000 00000000 00000000 00000000 00000000 00000000 00000000 ................................ 000160
00000000 00000000 00000000 00000000 00000000 00000000 00000000 00000000 ................................ 000180
00000000 00000000 00000000 00000000 00000000 00000000 00000000 00000000 ................................ 0001A0
00000000 00000000 00000000 00000000 00000000 00000000 00000000 00000000 ................................ 0001C0
00000000 00000000 00000000 00000000 00000000 00000000 00000000 00000000 ................................ 0001E0

Dump of file SATURN:[PCCOMMON.DUMP.DLL]SAUT.TMP;1 on 18-APR-1990 10:52:37.75
File ID (915,21,0)   End of file block 46 / Allocated 48

Virtual block number 30 (0000001E), 512 (0200) bytes

00000000 00000000 00000000 00000000 00000000 00000000 00000000 00000000 ................................ 000000
00000000 00000000 00000000 00000000 00000000 00000000 00000000 00000000 ................................ 000020
00000000 00000000 00000000 00000000 00000000 00000000 00000000 00000000 ................................ 000040
00000000 00000000 00000000 00000200 00010000 00000000 00000000 00000000 ................................ 000060
00000000 00000000 00000000 00000000 00000000 00000000 00000000 00000000 ................................ 000080
00000000 00000000 00000000 00000000 00000000 00000000 00000000 00000000 ................................ 0000A0
00000000 00000000 00000000 00000000 00000000 00000000 00000000 00000000 ................................ 0000C0
00000000 00000000 00000000 00000000 00000000 00000000 00000000 00000000 ................................ 0000E0
00000000 00000000 00000000 00000000 00000000 00000000 00000000 00000000 ................................ 000100
00000000 00000000 00000000 00000000 00000000 00000000 00000000 00000000 ................................ 000120
00000000 00000000 00000000 00000000 00000000 00000000 00000000 00000000 ................................ 000140
00000000 00000000 00000000 00000000 00000000 00000000 00000000 00000000 ................................ 000160
00000000 00000000 00000000 00000000 00000000 00000000 00000000 00000000 ................................ 000180
00000000 00000000 00000000 00000000 00000000 00000000 00000000 00000000 ................................ 0001A0
00000000 00000000 00000000 00000000 00000000 00000000 00000000 00000000 ................................ 0001C0
00000000 00000000 00000000 00000000 00000000 00000000 00000000 00000000 ................................ 0001E0

Dump of file SATURN:[PCCOMMON.DUMP.DLL]SAUT.TMP;1 on 18-APR-1990 10:52:37.75
File ID (915,21,0)   End of file block 46 / Allocated 48

Virtual block number 31 (0000001F), 512 (0200) bytes

00000000 00000000 00000000 00000000 00000000 00000000 00000000 00000000 ................................ 000000
00000000 00000000 00000000 00000000 00000000 00000000 00000000 00000000 ................................ 000020
00000000 00000000 00000000 00000000 00000000 00000000 00000000 00000000 ................................ 000040
00000000 00000000 00000000 00000000 00000000 00000000 00000000 00000000 ................................ 000060
00000000 00000000 00000000 00000000 00000000 00000000 00000000 00000000 ................................ 000080
00000000 00000000 00000000 00000000 00000000 00000000 00000000 00000000 ................................ 0000A0
00000000 00000000 00000000 00000000 00000000 00000000 00000000 00000000 ................................ 0000C0
00000000 00000000 00000000 00000000 00000000 00000000 00000000 00000000 ................................ 0000E0
00000000 00000000 00000000 00000000 00000000 00000000 00000000 00000000 ................................ 000100
00000000 00000000 00000000 00000000 00000000 00000000 00000000 00000000 ................................ 000120
00000000 00000000 00000000 00000000 00000000 00000000 00000000 00000000 ................................ 000140
00000000 00000000 00000000 00000000 00000000 00000000 00000000 00000000 ................................ 000160
00000000 00000000 00000000 00000000 00000000 00000000 00000000 00000000 ................................ 000180
00000000 00000000 00000000 00000000 00000000 00000000 00000000 00000000 ................................ 0001A0
00000000 00000000 00000000 00000000 00000000 00000000 00000000 00000000 ................................ 0001C0
00000000 00000000 00000000 00000000 00000000 00000000 00000000 00000000 ................................ 0001E0
```

```
Dump of file SATURN:[PCCOMMON.DUMP.DLL]SAUT.TMP;1 on 18-APR-1990 10:52:37.75
File ID (915,21,0)   End of file block 46 / Allocated 48

Virtual block number 32 (00000020), 512 (0200) bytes

00000000 00000000 00000000 00000000 00000000 00000000 00000000 00000000 ................................ 000000
00000000 00000000 00000000 00000000 00000000 00000000 00000000 00000000 ................................ 000020
00000000 00000000 00000000 00000000 00000000 00000000 00000000 00000000 ................................ 000040
00000000 00000000 00000000 00000000 00000000 00000000 00000000 00000000 ................................ 000060
00000000 00000000 00000000 00000000 00000000 00000000 00000000 00000000 ................................ 000080
00000000 00000000 00000000 00000000 00000000 00000000 00000000 00000000 ................................ 0000A0
00000000 00000000 00000000 00000000 00000000 00000000 00000000 00000000 ................................ 0000C0
00000000 00000000 00000000 00000000 00000000 00000000 00000000 00000000 ................................ 0000E0
00000000 00000000 00000000 00000000 00000000 00000000 00000000 00000000 ................................ 000100
00000000 00000000 00000000 00000000 00000000 00000000 00000000 00000000 ................................ 000120
00000000 00000000 00000000 00000000 00000000 00000000 00000000 00000000 ................................ 000140
00000000 00000000 00000000 00000000 00000000 00000000 00000000 00000000 ................................ 000160
00000000 00000000 00000000 00000000 00000000 00000000 00000000 00000000 ................................ 000180
00000000 00000000 00000000 00000000 00000000 00000000 00000000 00000000 ................................ 0001A0
00000000 00000000 00000000 00000000 00000000 00000000 00000000 00000000 ................................ 0001C0
00000000 00000000 00000000 00000000 00000000 00000000 00000000 00000000 ................................ 0001E0

Dump of file SATURN:[PCCOMMON.DUMP.DLL]SAUT.TMP;1 on 18-APR-1990 10:52:37.75
File ID (915,21,0)   End of file block 46 / Allocated 48

Virtual block number 33 (00000021), 512 (0200) bytes

00000000 00000000 00000000 00000000 00000000 00000000 00000000 00000000 ................................ 000000
00000000 00000000 00000000 00000000 00000000 00000000 00000000 00000000 ................................ 000020
81010000 00010000 00000000 00000000 00000000 00000000 00000000 00000000 ................................ 000040
00000000 00000000 00000000 00000000 00000000 01961182 00000000 00000000 ........ÿ....................... 000060
00000000 00000000 00000000 00000000 00000000 00000000 00000000 00008181 ................................ 000080
00000000 00000000 00000000 00000000 00000000 00000000 00000000 00000000 ................................ 0000A0
00000000 00000000 00000000 00000000 00000000 00000000 00000000 00000000 ........................    .... 0000C0
00000000 00000000 00000000 00000000 00000000 00000000 00000000 00000000 ..............................  .. 0000E0
00000000 00000000 00000000 00000000 00000000 00000000 00000000 00000000 ................................ 000100
00000000 00000000 00000000 00000000 00000000 00000000 00000000 00000000 ................................ 000120
0A000000 00000000 00000000 00000000 00000000 00000000 00000000 00000000 ................................ 000140
0A0A0A0A 0A0A0A0A 0A0A0A0A 0A0A0A0A 0A0A0A0A 0A0A0A0A 0A0A0A0A 0A0A0A0A ................................ 000160
0A0A0A0A 0A0A0A0A 0A0A0A0A 0A0A0A0A 0A0A0A0A 0A0A0A0A 0A0A0A0A 0A0A0A0A ................................ 000180
0A0A0A0A 0A0A0A0A 0A0A0A0A 0A0A0A0A 0A0A0A0A 0A0A0A0A 0A0A0A0A 0A0A0A0A ................................ 0001A0
0A0A0A0A 0A0A0A0A 0A0A0A0A 0A0A0A0A 0A0A0A0A 0A0A0A0A 0A0A0A0A 0A0A0A0A ................................ 0001C0
0A0A0A0A 0A0A0A0A 0A0A0A0A 0A0A0A0A 0A0A0A0A 0A0A0A0A 0A0A0A0A 0A0A0A0A ................................ 0001E0

Dump of file SATURN:[PCCOMMON.DUMP.DLL]SAUT.TMP;1 on 18-APR-1990 10:52:37.75
File ID (915,21,0)   End of file block 46 / Allocated 48

Virtual block number 34 (00000022), 512 (0200) bytes

0A0A0A0A 0A0A0A0A 0A0A0A0A 0A0A0A0A 0A0A0A0A 0A0A0A0A 0A0A0A0A 0A0A0A0A ................................ 000000
0A0A0A0A 0A0A0A0A 0A0A0A0A 0A0A0A0A 0A0A0A0A 0A0A0A0A 0A0A0A0A 0A0A0A0A ................................ 000020
0A0A0A0A 0A0A0A0A 0A0A0A0A 0A0A0A0A 0A0A0A0A 0A0A0A0A 0A0A0A0A 0A0A0A0A ................................ 000040
000A0A0A 0A0A0A0A 0A0A0A0A 0A0A0A0A 0A0A0A0A 0A0A0A0A 0A0A0A0A 0A0A0A0A ................................ 000060
00000000 00000000 00000000 00000000 00000000 00000000 00000000 00000000 ................................ 000080
47534D4E 3C3CFFFF FFFF0000 00000000 00000000 00000000 FFFF178C 00002000 . .......................<<NMSG 0000A0
0003000A 00776F6C 66726576 6F206863 61747320 200A0030 30303652 00003E3E >>..R6000..- stack overflow..... 0000C0
08000A00 30207962 20656469 76696420 72656765 746E6920 200A0033 30303652 R6003..- integer divide by 0.... 0000E0
6120726F 66206563 61707320 6867756F 6E652074 6F6E202D 0A003830 30365200 .R6008..- not enough space for a 000100
6867756F 6E652074 6F6E2020 0A003930 30365200 09000A00 73746E65 60756772 rguments.....R6009..- not enough 000120
00FF000A 0000FC00 0A00746E 65606E6F 7269766E 6520726F 66206563 61707320  space for environment...■...... 000140
74616F6C 6620200A 00323030 36520002 0020726F 72726520 65606974 206E7572 run-time error ...R6002..- float 000160
05BC0002 0003FFFF FF000A00 64656461 6F6C2074 6F6E2074 6E696F70 20676E69 ing point not loaded..........¥. 000180
00000000 00000000 00000000 00000007 17BA0002 00000006 05CC0002 00000005 ......&.......¤................. 0001A0
75422600 73736563 6F727020 79747060 65206E61 20676E69 74616572 431A0352 R..Creating an empty process.&Bu 0001C0
6C20646E 6160606F 63206568 7420606F 72662060 61726761 69642061 20646C69 ild a diagram from the command l 0001E0
```

Dump of file SATURN:[PCCOMMON.DUMP.DLL]SAUT.TMP;1 on 18-APR-1990 10:52:37.75
File ID (915,21,0)    End of file block 46 / Allocated 48

Virtual block number 35 (00000023), 512 (0200) bytes

```
 206F7420 73736563 6F727020 4D502065 68742067 6E697461 6C65522B 00656E69 ine.+Relating the PM process to  000000
 7972616E 69622061 20676E69 6464411B 00737365 636F7270 204C4450 20656874 the PDL process..Adding a binary 000020
 70786520 78696665 72702061 20676E69 6464411B 006E6F69 73736572 70786520  expression..Adding a prefix exp 000040
 6464411B 00726569 66696C61 75712061 20676E69 6464411B 006E6F69 73736572 ression..Adding a qualifier..Add 000060
 73616C20 676E6964 64411700 65646F6E 20646C69 68632074 73726966 20676E69 ing first child node..Adding las 000080
 6E20676E 696C6269 73206120 676E6964 64411600 65646F6E 20646C69 68632074 t child node..Adding a sibling n 0000A0
 6E697474 75431200 65646F6E 2077656E 20612067 6E697461 65724314 0065646F ode..Creating a new node..Cuttin 0000C0
 65657274 62757320 6120676E 69747361 50120001 00656572 74627573 20612067 g a subtree....Pasting a subtree 0000E0
 20676E69 74746553 1C007265 66667562 20747865 7420676E 69796C70 70411500 ..Applying text buffer..Setting  000100
 20656874 20676E69 7661530F 00796C6C 61697469 6E69204D 50206568 74207075 up the PM initially..Saving the  000120
 44502061 20676E69 74616572 43140352 00000000 00000000 00000000 00444644 DFD.............R..Creating a PD 000140
 20676E69 68614D10 0065646F 6E204C44 5020676E 69766F4D 10006564 6F6E204C L node..Moving PDL node..Making  000160
 6C707845 10007478 65742044 46442067 6E697469 72571100 74786574 20444644 DFD text..Writing DFD text..Expl 000180
 65726F74 73206576 6F4D0800 44532065 766F4D08 00737365 636F7270 2065646F ode process..Move SD..Move store 0001A0
 6572430F 00776F6C 66206574 61657243 0C007373 65636F72 70206576 6F4D0000 ..Move process..Create flow..Cre 0001C0
 74616572 430A0065 726F7473 20657461 65724300 00737365 636F7270 20657461 ate process..Create store..Creat 0001E0
```

Dump of file SATURN:[PCCOMMON.DUMP.DLL]SAUT.TMP;1 on 18-APR-1990 10:52:37.75
File ID (915,21,0)    End of file block 46 / Allocated 48

Virtual block number 36 (00000024), 512 (0200) bytes

```
 46442074 75430F00 6D617267 61696420 44464420 65746165 72431300 44532065 e SD..Create DFD diagram..Cut DF 000000
 72756F73 20746365 6C655315 00776F6C 66206576 61530A00 7463656A 626F2044 D object..Save flow..Select sour 000020
 00010001 00010001 00010001 00010352 00000000 00000074 63656A62 6F206563 ce object.......R............... 000040
 68746977 20746361 736E6172 74207427 6E61432A 00010001 00010001 00010001 ............*Can't transact with 000060
 72742074 276E6143 2B007478 65742067 6E696B61 6D20656C 69687720 4C4D4420  DML while making text.+Can't tr 000080
 65742067 6E697469 72772065 6C696877 204C4D44 20687469 77207463 61736E61 ansact with DML while writing te 0000A0
 69727564 204C4D44 20687469 77207463 61736E61 72742074 276E6143 29007478 xt.)Can't transact with DML duri 0000C0
 6E697473 65642074 63656C65 531A0352 00000000 6E6F6973 6F6C7078 6520676E ng explosion....R..Select destin 0000E0
 6E6E6143 26006465 74616572 6320776F 6C460000 7463656A 626F206E 6F697461 ation object..Flow created.&Cann 000100
 63656A62 6F207369 68742068 74697720 776F6C66 20612065 74616572 6320746F ot create a flow with this objec 000120
 6E676973 73411100 73657373 65636F72 5020676E 69726562 6D756E65 52160074 t..Renumbering Processes..Assign 000140
 29007373 65636F72 7020646C 69686320 65766F4D 13007265 6260754E 20676E69 ing Number..Move child process.) 000160
 7320676E 69727564 204C4D44 20687469 77207463 61736E61 72742074 276E6143 Can't transact with DML during s 000180
 4D442068 74697720 74636173 6E617274 2074276E 61432800 6E787420 74726174 tart txn.(Can't transact with DM 0001A0
 61726761 69642067 6E69766F 4D17006E 78742070 6F747320 676E6972 7564204C L during stop txn..Moving diagra 0001C0
 7463656A 626F206D 61726761 69642067 6E69766F 4D160073 7463656A 626F206D m objects..Moving diagram object 0001E0
```

Dump of file SATURN:[PCCOMMON.DUMP.DLL]SAUT.TMP;1 on 18-APR-1990 10:52:37.75
File ID (915,21,0)    End of file block 46 / Allocated 48

Virtual block number 37 (00000025), 512 (0200) bytes

```
 74786574 20676E69 766F4D0C 006C6562 616C2077 6F6C6620 676E6976 6F4D1200 ..Moving flow label..Moving text 000000
 00010079 74696C69 62697369 76207373 65636F72 7020676E 69676E61 68431C00 ..Changing process visibility... 000020
 6361736E 61727420 74276E61 43280352 00000000 00000000 00000000 00010001 ................R.(Can't transac 000040
 276E6143 2B004453 20676E69 766F6D20 656C6968 77204C4D 44206874 69772074 t with DML while moving SD.+Can' 000060
 676E6976 6F6D2065 6C696877 204C4D44 20687469 77207463 61736E61 72742074 t transact with DML while moving 000080
 204C4D44 20687469 77207463 61736E61 72742074 276E6143 2D006572 6F747320  store.-Can't transact with DML  0000A0
 6E617274 2074276E 61432C00 73736563 6F727020 676E6976 6F6D2065 6C696877 while moving process.,Can't tran 0000C0
 6F6C6620 676E6974 61657263 20656C69 6877204C 4D442068 74697720 74636173 sact with DML while creating flo 0000E0
 656C6968 77204C4D 44206874 69772074 6361736E 61727420 74276E61 432D0077 w.-Can't transact with DML while 000100
 20746361 736E6172 74207427 6E61432D 00737365 636F7270 20657461 65726320  create process.-Can't transact  000120
 432A0065 726F7473 20676E69 74616572 6320656C 69687720 4C4D4420 68746977 with DML while creating store.*C 000140
 65726320 656C6968 77204C4D 44206874 69772074 6361736E 61727420 74276E61 an't transact with DML while cre 000160
 4D442068 74697720 74636173 6E617274 2074276E 61432D00 44532067 6E697461 ating SD.-Can't transact with DM 000180
 72742074 276E6143 26006D61 72676169 64206574 61657263 20656C69 6877204C L while create diagram.&Can't tr 0001A0
 432A0067 6E697474 75632065 6C696877 204C4D44 20687469 77207463 61736E61 ansact with DML while cutting.*C 0001C0
 76617320 656C6968 77204C4D 44206874 69772074 6361736E 61727420 74276E61 an't transact with DML while sav 0001E0
```

```
Dump of file SATURN:[PCCOMMON.DUMP.DLL]SAUT.TMP;1 on 18-APR-1990 10:52:37.75
File ID (915,21,0)    End of file block 46 / Allocated 48

Virtual block number 38 (00000026), 512 (0200) bytes

 7365636F 72702065 74616572 6320676E 69726574 6E451E00 776F6C66 20676E69 ing flow..Entering create proces 000000
 6F6D2077 6F6C6620 65746165 72632067 6E697265 746E451A 00206564 6F6D2073 s mode ..Entering create flow mo 000020
 28006564 6F6D2065 726F7473 20657461 65726320 676E6972 65746E45 18006564 de..Entering create store mode.( 000040
 6974616E 69747365 642F6563 72756F73 20657461 65726320 676E6972 65746E45 Entering create source/destinati 000060
 6574756F 72657220 6C61756E 616D2067 6E697265 746E451D 0065646F 6D206E6F on mode..Entering manual reroute 000080
 00000000 00000000 00000000 7365646F 6D20676E 69766165 4C0E0065 646F6D20  mode..Leaving modes............ 0000A0
 4F525020 74756320 74276E61 43190001 00010001 00010001 00010001 00010352 R..................Can't cut PRO 0000C0
 00000000 00000001 00010001 00010001 00010001 00212065 646F6E20 53534543 CESS node !...................... 0000E0
 72662073 69687420 2C726F72 72652078 61746E79 53203A6E 79736C64 50480352 R.HPdlsyn: Syntax error, this fr 000100
 6C657320 65687420 6574656C 706D6F63 20746F6E 2073656F 6420746E 656D6761 agment does not complete the sel 000120
 206E6F20 64657463 65707845 203A6E79 736C6450 4600746F 6C732064 65746365 ected slot.FPdlsyn: Expected on  000140
 776F646E 69772073 6E6F6974 706F2065 6874206E 6920736E 65686F74 20656874 the tokens in the options window 000160
 7265746E 49203A6E 79736C64 5028006E 6F697469 736F7020 73696874 20746120  at this position.(Pdlsyn: Inter 000180
 736C6450 3200776F 6C667265 766F2068 63617453 202D2072 6F727265 206C616E nal error - Stack overflow.2Pdls 0001A0
 6920656C 62617420 78654C20 2D20726F 72726520 6C616E72 65746E49 203A6E79 yn: Internal error - Lex table i 0001C0
 63207369 20606574 49203A6E 79736C64 5032006E 6F697461 7A696C61 6974696E nitialization.2Pdlsyn: Item is c 0001E0

Dump of file SATURN:[PCCOMMON.DUMP.DLL]SAUT.TMP;1 on 18-APR-1990 10:52:37.75
File ID (915,21,0)    End of file block 46 / Allocated 48

Virtual block number 39 (00000027), 512 (0200) bytes

 74636572 726F6320 796C6C61 63696361 746E7973 20646E61 20657465 6C70606F omplete and syntacically correct 000000
 20646E65 20726574 66612074 75706E69 20617274 7845203A 6E79736C 64502F00 ./Pdlsyn: Extra input after end  000020
 6E697475 6F52203A 6E79736C 64503100 6465726F 6E676920 646C6569 6620666F of field ignored.1Pdlsyn: Routin 000040
 706C612D 65727020 726F6620 6465746E 6560656C 70606920 746F6E20 73692065 e is not-implemented for pre-alp 000060
 79736C64 503C0072 6F727265 206C616E 7265746E 493A6E79 736C6450 16006168 ha..Pdlsyn:Internal error.<Pdlsy 000080
 73756D20 73646E61 7265706F 206E6F69 73736572 70786520 7869666E 49203A6E n: Infix expression operands mus 0000A0
 203A6E79 736C6450 18007365 74756269 72747461 20656C67 6E697320 65622074 t be single attributes..Pdlsyn:  0000C0
 6E6E6143 203A6E79 736C6450 35006564 6F632072 6F727265 206E776F 6E686E55 Unknown error code.5Pdlsyn: Cann 0000E0
 65606173 20656874 206D6F72 462F6F54 20657669 65636552 2F646E65 5320746F ot Send/Receive To/From the same 000100
 6D726F66 6E492064 696C6176 2041203A 6E79736C 64504700 73736563 6F727020  process.GPdlsyn: A valid Inform 000120
 69206465 72697571 65722073 69207974 69746E65 206C6564 6F4D206E 6F697461 ation Model entity is required i 000140
 74746120 6E41203A 6E79736C 64504F00 746E656D 65746174 73207369 6874206E n this statement.OPdlsyn: An att 000160
 6C656220 746F6E20 64696420 74616874 206E6565 73207361 77206574 75626972 ribute was seen that did not bel 000180
 73656974 69746E65 206E6576 69672065 68742066 6F20796E 61206F74 20676E6F ong to any of the given entities 0001A0
 6120736E 6F697373 65727078 65207972 616E6942 203A6E79 736C6450 38000100 ...;Pdlsyn: Binary expressions a 0001C0
 52007478 65746E6F 63207369 6874206E 69206465 776F6C6C 6120746F 6E206572 re not allowed in this context.R 0001E0

Dump of file SATURN:[PCCOMMON.DUMP.DLL]SAUT.TMP;1 on 18-APR-1990 10:52:37.75
File ID (915,21,0)    End of file block 46 / Allocated 48

Virtual block number 40 (00000028), 512 (0200) bytes

 65687420 606F7266 20736574 75626972 74746120 796C6E4F 203A6E79 736C6450 Pdlsyn: Only attributes fr.n the 000000
 20646573 75206562 2079616D 20646569 66696365 70732073 65697469 746E6520  entities specified may be . ed  000020
 00000000 00000000 00000000 00000074 6E656065 74617473 20736968 74206E69 in this statement............... 000040
 73657475 62697274 74612065 68742066 6F20656E 4F203A6E 79736C64 50490352 R.IPdlsyn: One of the attributes 000060
 20747369 6C206568 74206E69 2073756F 75676962 60612073 69206E65 76696720  given is ambiguous in the list  000080
 20726F20 65726568 77204120 3A6E7973 6C645068 00736569 7469746E 6520666F of entities.kPdlsyn: A where or  0000A0
 2061206E 6961746E 6F632074 6F6E2064 69642065 7375616C 63207373 656C6E75 unless clause did not contain a  0000C0
 206E6576 69672065 74756269 72747461 206E6120 6F742065 636E6572 65666572 reference to an attribute given  0000E0
 3A6E7973 6C645062 00736569 7469746E 6520666F 20747369 6C206568 74206E69 in the list of entities.bPdlsyn: 000100
 64696420 64657463 656C6573 20676E69 65622065 74756269 72747461 206E4120  An attribute being selected did 000120
 6E6F6974 636E7566 20786966 65725020 61206E69 20726165 70706120 746F6E20  not appear in a Prefix function 000140
 736C6450 5A006573 75616C63 20796220 70756F72 47206568 74206E69 20726F20  or in the Group by clause.ZPdls 000160
 616C6320 676E6976 61482061 206E6920 65747562 69727474 61206E41 203A6E79 yn: An attribute in a Having cla 000180
 6F207473 696C2065 6874206E 69207261 65707061 20746F6E 20646964 20657375 use did not appear in the list o 0001A0
 41203A6E 79736C64 50620073 65747562 69727474 61206465 7463656C 65732066 f selected attributes.bPdlsyn: A 0001C0
 20794220 72656472 4F206E61 206E6920 6E656573 20657475 62697274 7461206E n attribute seen in an Order By  0001E0
```

```
Dump of file SATURN:[PCCOMMON.DUMP.DLL]SAUT.TMP;1 on 18-APR-1990 10:52:37.75
File ID (915,21,0)   End of file block 46 / Allocated 48

Virtual block number 41 (00000029), 512 (0200) bytes

 73696C20 65687420 6E692072 61657070 6120746F 6E206469 64206573 75616C63 clause did not appear in the lis 000000
 6E79736C 64503900 73657475 62697274 74612064 65746365 6C657320 666F2074 t of selected attributes.9Pdlsyn 000020
 6C707061 20656220 746F6E20 6C6C6977 20746E65 6D657461 74732065 6854203A : The statement will not be appl 000040
 20656854 203A6E79 736C6450 58006061 72676169 64206568 74206F74 20646569 ied to the diagram.XPdlsyn: The  000060
 61747320 74726573 6E49206E 6120726F 66207365 756C6176 20666F20 7473696C list of values for an Insert sta 000080
 65702079 72746E65 20656E6F 20656475 6C636E69 20747375 6D20746E 656D6574 tement must include one entry pe 0000A0
 7375616C 63207465 53204120 3A6E7973 6C64506B 00657475 62697274 74612072 r attribute.kPdlsyn: A Set claus 0000C0
 6E692074 73756D20 746E656D 65746174 73206574 61647055 206E6120 6E692065 e in an Update statement must in 0000E0
 74756269 72747461 206E6120 6F742065 636E6572 65666572 20612065 64756C63 clude a reference to an attribut 000100
 3A6E7973 6C645038 00797469 746E6520 6E657669 67206568 74206D6F 72662065 e from the given entity.;Pdlsyn: 000120
 6E207361 77207461 68742064 65696669 63657073 20736177 20776F6C 66204120  A flow was specified that was n 000140
 00010001 00010001 00010001 00796C74 63657272 6F632064 6574756F 7220746F ot routed correctly............ 000160
 55505455 4F0A0054 55505455 4F070352 00000000 00000000 00000000 00000001 ................R..OUTPUT..OUTPU 000180
 08005049 48535F50 07005445 535F5006 00455349 57524548 544F0A00 44495F54 T_ID..OTHERWISE..P_SET..P_SHIP.. 0001A0
 434F5250 08005952 414D4952 50080052 45574F50 06002B02 0052454E 54524150 PARTNER..+..POWER..PRIMARY..PROC 0001C0
 4E49414D 45520A00 45564945 43455208 0044495F 53534543 4F52500B 00535345 ESS..PROCESS_ID..RECEIVE..REMAIN 0001E0

Dump of file SATURN:[PCCOMMON.DUMP.DLL]SAUT.TMP;1 on 18-APR-1990 10:52:37.75
File ID (915,21,0)   End of file block 46 / Allocated 48

Virtual block number 42 (0000002A), 512 (0200) bytes

 0900454D 55534552 07005345 54414349 4C505544 5F45564F 4D455212 00524544 DER..REMOVE_DUPLICATES..RESUME.. 000000
 434F5250 5F4C414E 5245544E 49130352 00000000 00000000 45564549 52544552 RETRIEVE........R..INTERNAL_PROC 000020
 4C050059 454B0400 44495F43 4F525049 09004449 4C41564E 49080045 52554445 EDURE..INVALID..IPROC_ID..KEY..L 000040
 54414D08 003C0200 504F4F4C 05004854 474E454C 0700303C 03002802 00545341 AST..(..<=..LENGTH..LOOP..<..MAT 000060
 54554E49 4D08002D 02004055 4D494E49 4D08004D 554D4958 414D0800 53454843 CHES..MAXIMUM..MINIMUM..-..MINUT 000080
 4E454708 003D3E03 004D4F52 46050352 00000000 00474E49 5353494D 08005345 ES..MISSING.....R..FROM..>=..GEN 0000A0
 554F4805 00474E49 56414807 003E0200 50554F52 47060001 0044495F 43495245 ERIC_ID....GROUP..>..HAVING..HOU 0000C0
 4F54535F 4F464E49 0B00574F 4C465F4F 464E490A 00464903 00564944 49050052 R..IDIV..IF..INFO_FLOW..INFO_STO 0000E0
 5F545550 4E490900 5455504E 49060044 495F4552 4F54535F 4F464E49 0E004552 RE..INFO_STORE_ID..INPUT..INPUT_ 000100
 444F4D0C 00534549 4649444F 4D090352 00000000 00004554 41455243 07004449 ID..CREATE......R..MODIFIE' ..MOD 000120
 0200454E 4F5F4E41 48545F45 524F4D0E 0048544E 4F4D0600 44495F53 45494649 IFIES_ID..MONTH..MORE_THAN_ "F.. 000140
 545F4554 4F4E0A00 45544F4E 0500544F 4E04003E 3C030045 54414745 4E07002A *..NEGATE..<>..NOT..NOTE..NOTE_T 000160
 52454452 4F060052 4F030045 4E4F0400 4E4F0300 464F0300 33323104 00545845 EXT..123..OF..ON..ONE..OR..ORDER 000180
 4F520600 2902004E 52555445 52070352 00000000 00000000 00000000 00000000 ................R..RETURN..)..RO 0001A0
 4E44494D 5F45434E 49535F53 444E4F43 45531700 53444E4F 43455308 00444E55 UND..SECONDS..SECONDS_SINCE_MIDN 0001C0
 4E474953 07005445 53040052 4F544152 45504553 0A00444E 45530500 54484749 IGHT..SEND..SEPERATOR..SET..SIGN 0001E0

Dump of file SATURN:[PCCOMMON.DUMP.DLL]SAUT.TMP;1 on 18-APR-1990 10:52:37.75
File ID (915,21,0)   End of file block 46 / Allocated 48

Virtual block number 43 (0000002B), 512 (0200) bytes

 45444454 53070054 52515305 00525153 04005452 4F530500 50494B53 05004C41 AL..SKIP..SORT..SQR..SQRT..STDDE 000000
 00000000 00000000 00000000 464F5F54 45534255 530A0047 4E495254 53070056 V..STRING..SUBSET_OF............ 000020
 454E4942 4D4F4308 003A0200 45534143 05005954 494C414E 49445241 430C0352 R..CARDINALITY..CASE..:..COMBINE 000040
 4F430900 5443454E 4E4F4308 00544143 4E4F4307 0054494D 4D4F4307 002C0200 ..,..COMMIT..CONCAT..CONNECT..CO 000060
 59414410 00594144 0400454C 43594306 00544E45 52525543 0800534E 4941544E NTAINS..CURRENT..CYCLE..DAY..DAY 000080
 10004854 4E4F4D5F 4548545F 464F5F59 41441100 4B454557 5F454854 5F464F5F _OF_THE_WEEK..DAY_OF_THE_MONTH.. 0000A0
 00000000 00000000 00455445 4C454407 00524145 595F4548 545F464F 5F594144 DAY_OF_THE_YEAR..DELETE......... 0000C0
 48545F46 4F5F4B45 45571100 48544E4F 4D5F4548 545F464F 5F4B4545 57120352 R..WEEK_OF_THE_MONTH..WEEK_OF_TH 0000E0
 06004552 45485706 00455059 545F4E45 48570A00 4E454857 05005241 45595F45 E_YEAR..WHEN..WHEN_TYPE..WHERE.. 000100
 444F4854 454D0700 44495F44 53060052 41455905 00485449 57050045 4C494857 WHILE..WITH..YEAR..SD_ID..METHOD 000120
 4E452044 494C4156 4E490F00 45524F54 53204F46 4E492044 494C4156 4E491300 ..INVALID INFO STORE..INVALID EN 000140
 535F5020 44494C41 564E490E 0045554C 41562044 494C4156 4E490E00 59544954 TITY..INVALID VALUE..INVALID P_S 000160
 41204449 4C41564E 49120057 4F4C465F 4F464E49 2044494C 41564E49 12005445 ET..INVALID INFO_FLOW..INVALID_A 000180
 4C450500 45544143 494C5055 440A0352 00000000 00000000 45545542 49525454 TTRIBUTE........R..DUPLICATE..EL 0001A0
 0A005954 49544E45 07005954 504D4506 00444E45 04004649 45534C45 07004553 SE..ELSEIF..END..EMPTY..ENTITY.. 0001C0
 55444543 4F52505F 4C414E52 45545845 13000100 3D020044 495F5954 49544E45 ENTITY_ID..=....EXTERNAL_PROCEDU 0001E0
```

```
Dump of file SATURN:[PCCOMMON.DUMP.DLL]SAUT.TMP;1 on 18-APR-1990 10:52:37.75
File ID (915,21,0)   End of file block 46 / Allocated 48

Virtual block number 44 (0000002C), 512 (0200) bytes

 46464944 5F444E49 4610004E 4F4D4D4F 435F444E 49460C00 54495845 05004552 RE..EXIT..FIND_COMMON..FIND_DIFF 000000
 00484341 45524F46 08004449 5F574F4C 46080054 53524946 06004543 4E455245 ERENCE..FIRST..FLOW_ID..FOREACH. 000020
 52545441 0A00444E 41040053 42410400 54524F42 41060001 00010001 00010352 R.........ABORT..ABS..AND..ATTR 000040
 41420600 45474152 45564108 0044495F 45545542 49525454 41000045 54554249 IBUTE..ATTRIBUTE_ID..AVER GE..BA 000060
 45555254 05004553 4C414606 004E4545 57544542 08004E49 47454206 00444553 SED..BEGIN..BETWEEN..FALSE  TRUE 000080
 55530400 474E4952 54534255 530A0352 00000000 00000000 00000000 59420300 ..BY............R..SUBSTRING..SU 0000A0
 54060048 47554F52 48540800 4E454854 0500464F 5F544553 52455055 530C004D M..SUPERSET_OF..THEN..THROUGH..T 0000C0
 494E5507 00535345 4C4E5507 00444552 45474749 52540A00 4F540300 53454D49 IMES..TO..TRIGGERED..UNLESS..UNI 0000E0
 54534555 5145525F 52455355 00004554 41445055 07004C49 544E5506 00455551 QUE..UNTIL..UPDATE..USER_REQUEST 000100
 00000000 00000045 4D554C4F 56070045 434E4149 52415609 0045554C 41560600 ..VALUE..VARIANCE..VOLUME....... 000120
 54434E49 54534944 09002F02 00544345 4E4E4F43 5349440B 00435345 44050352 R..DESC..DISCONNECT../..DISTINCT 000140
 00000000 00010001 00010001 00010001 00010001 00010001 002E0200 4F440300 ..DO............................ 000160
 4D1A0059 54494C41 4E494452 41432059 5449544E 45204D55 4D495841 4D1B0352 R..MAXIMUM ENTITY CARDINALITY..M 000180
 554D494E 494D1A00 5954494C 414E4944 52414320 5445535F 50204D55 4D495841 AXIMUM P_SET CARDINALITY..MINIMU 0001A0
 494E5520 474E4953 53494D17 00595449 4C414E49 44524143 20544553 5F50204D M P_SET CARDINALITY..MISSING UNI 0001C0
 52415020 544E4552 52554320 474E4953 53494D18 0052454E 54524150 20455551 QUE PARTNER..MISSING CURRENT PAR 0001E0

Dump of file SATURN:[PCCOMMON.DUMP.DLL]SAUT.TMP;1 on 18-APR-1990 10:52:37.75
File ID (915,21,0)   End of file block 46 / Allocated 48

Virtual block number 45 (0000002D), 512 (0200) bytes

 444E450A 0059454B 20595241 4D495250 20455441 43494C50 55441600 52454E54 TNER..DUPLICATE PRIMARY KEY..END 000000
 4E4F4954 41564952 45440800 4F544E49 05005345 554C4156 07005055 4F524720  GROUP..VALUES..INTO..DERIVATION 000020
 00010001 00010001 00010001 00010352 00000000 01000100 01000100 01000100 ................R............... 000040
 20657461 6572430F 0021656C 62616C69 61766120 74657920 746F4E13 00010001 .....Not yet available!..Create  000060
 531E0072 6F727245 20737365 636F7250 20657461 65724315 00737365 636F7250 Process..Create Process Error..S 000080
 65481A00 203A7373 65636F72 5020726F 66206E6F 69746973 6F702074 63656C65 elect position for Process: ..He 0000A0
 67616964 2044460B 00216465 746E656D 656C706D 69207465 7920746F 6E20706C lp not yet implemented!..FD diag 0000C0
 656C706D 6F63206E 6F697461 65726320 73736563 6F725020 77654E1E 00606172 ram..New Process creation comple 0000E0
 70207265 626D756E 65522044 46160352 00000000 00000000 00000000 00006574 te..............R..FD Renumber p 000100
 65521800 6E6F6974 69736F70 65722073 7365636F 72501300 73657373 65636F72 rocesses..Process reposition..Re 000120
 52207373 65636F72 501C0020 3A737365 636F7250 20676E69 6E6F6974 69736F70 positioning Process: ..Process R 000140
 69686320 6120676E 69646441 67006574 656C706D 6F43206E 6F697469 736F7065 eposition Complete.gAdding a chi 000160
 6C666E69 20687469 7720746E 65726170 2061206F 74207373 65636F72 7020646C ld process to a parent with infl 000180
 20646577 6F6C6C61 20796C6E 6F207369 2073776F 6C667475 6F20726F 2073776F ows or outflows is only allowed  0001A0
 01000100 01002E6E 6F69736F 6C707845 20737365 636F7250 20686775 6F726874 through Process Explosion....... 0001C0
 00000000 00000000 00000000 00000000 01000100 01000100 01000100 01000100 ................................ 0001E0

Dump of file SATURN:[PCCOMMON.DUMP.DLL]SAUT.TMP;1 on 18-APR-1990 10:52:37.75
File ID (915,21,0)   End of file block 46 / Allocated 48

Virtual block number 46 (0000002E), 512 (0200) bytes

 206F4E0F 00010001 00010001 00010001 00010001 00010001 00010001 00010352 R............................No  000000
 666E4920 6E616068 6361421C 00010352 00010001 00737473 69786520 656C6966 file exists.....R....Bachman Inf 000020
 73796C61 6E412073 6D657473 79531000 73606574 73795320 6E6F6974 6160726F ormation Systems..Systems Analys 000040
 6F697463 6E754620 79622073 746E656D 65726975 71655220 65676173 551F0074 t..Usage Requirements by Functio 000060
 73736563 6F72500E 00747379 6C616E41 20606574 7379530F 00657461 4405006E n..Date..System Analyst..Process 000080
 20737365 636F7250 00007265 626D754E 20737365 636F7250 0F006C65 646F4D20  Model..Process Number..Process  0000A0
 520E0065 74615220 65636E65 72727563 634F2073 7365636F 72501800 656D614E Name..Process Occurrence Rate..R 0000C0
 72616553 00006272 65560500 79746974 6E450700 656D6954 2065736E 6F707365 esponse Time..Entity..Verb..Sear 0000E0
 00000000 00000000 00000063 63410400 6560756C 6F560700 73727474 41206863 ch Attrs..Volume..Acc........... 000100
 00010001 00010001 00010001 00010073 72747441 20646574 63656666 450F0352 R..Effected Attrs............... 000120
 00000000 00000000 00000000 00000000 00010001 00010001 00010001 00010001 ................................ 000140
 00000000 00000000 00000000 00000000 00000000 00000000 00000000 00000000 ................................ 000160
 00000000 00000000 00000000 00000000 00000000 00000000 00000000 00000000 ................................ 000180
 00000000 00000000 00000000 00000000 00000000 00000000 00000000 00000000 ................................ 0001A0
 00000000 00000000 00000000 00000000 00000000 00000000 00000000 00000000 ................................ 0001C0
 00000000 00000000 00000000 00000000 00000000 00000000 00000000 00000000 ................................ 0001E0
```

```
Dump of file SATURN:[PCCOMMON.DUMP.DLL]SDFORM.TMP;1 on 18-APR-1990 10:52:44.38
File ID (918,23,0)   End of file block 46 / Allocated 48

Virtual block number 1 (00000001), 512 (0200) bytes

 00000000 00000040 00000000 00000088 0000FFFF 00000004 0000002A 018E5A4D MZ..*...........|.......a....... 000000
 00000080 00000000 00000000 00000000 00000000 00000000 00000000 00000000 ................................ 000020
 6F6E6E61 63206D61 72676F72 70207369 685421CD 4C01B821 CD09B400 0E8A1F0E ..¤..Ç.ël|.LèlThis program canno 000040
 00000000 00000024 0A0D0D2E 65646F6D 20534F44 206E6920 6E757220 65622074 t be run in DOS mode....$....... 000060
 00080007 00000000 00030000 00000000 00068009 68852562 000704A5 0505454E NE..Ê...b%.k.................... 000080
 00000000 00000000 00010001 00040000 0000052C 009C0086 007C0078 00400038 8.a.x.|......................... 0000A0
 187A0F00 187A0207 000F0F00 000F0205 0CCE0F00 0CCE0124 0A3A0F00 0A3A0057 W.:...:.$.ö...ö...........z...z. 0000C0
 46445306 01000004 072E1EB1 072E053A 1B000F21 1A340395 02020E21 00000000 ....!.....4.!.Å.:...Ý........SDF 0000E0
 4D500500 03FC02FF 02E80278 01DF01CB 015E0022 00100007 00010000 004D524F ORM.........".^.ù.Ô.x.Ò...*...PM 000100
 44034B43 4F4C4243 4F4C4C41 4D454D00 4D454D03 534C4C41 43534F44 084E4957 WIN.DOSCALLS.MEM.MEMALLOCBLOCK.D 000120
 55444C45 49465952 4555514D 4644154D 524F4653 5345434F 52504D46 440E4D46 FM.DFMPROCESSFORM.DFMQUERYFIELDU 000140
 48595245 55514D46 440F5041 45484248 59524555 514D4644 0E415441 44524553 SERDATA.DFMQUERYHBHEAP.DFMQUERYH 000160
 44444E57 48595245 55514D46 440F4D54 48595245 55514D46 44084A42 4F4C4D44 DMLOBJ.DFMQUERYHTM.DFMQUERYHWNDD 000180
 55595245 55514D46 44105355 54415453 54464948 53595245 55514D46 4413474C LG.DFMQUERYSHIFTSTATUS.DFMQUERYU 0001A0
 43544553 4D46440D 444C4549 46524554 53494745 524D4644 10415441 44524553 SERDATA.DFMREGISTERFIELD.DFMSETC 0001C0
 4E4F4354 45534D46 440F4E46 444E414D 4D4F4354 45534D46 440F4E46 45534F4C LOSEFN.DFMSETCOMMANDFN.DFMSETCON 0001E0

Dump of file SATURN:[PCCOMMON.DUMP.DLL]SDFORM.TMP;1 on 18-APR-1990 10:52:44.38
File ID (918,23,0)   End of file block 46 / Allocated 48

Virtual block number 2 (00000002), 512 (0200) bytes

 4F4E5445 534D4644 0E4E4645 54414749 56414E54 45534D46 44104E46 4C4F5254 TROLFN.DFMSETNAVIGATEFN.DFMSETNO 000000
 53555445 534D4644 0E4E4653 4752414C 4F4F5454 45534D46 44104E46 59464954 TIFYFN.DFMSETTOOLARGSFN.DFMSETUS 000020
 4C4F5254 4E4F4354 49444554 53494C53 5345434F 52504D46 44194154 41445245 ERDATA.DFMPROCESSLISTEDITCONTROL 000040
 44086C6D 6403444E 414D4D4F 43544944 45545349 4C535345 434F5250 4D464419 .DFMPROCESSLISTEDITCOMMAND.dml.D 000060
 54475952 4555514C 4D44084E 5854504F 54534C4D 440A4E58 54545241 54534C4D MLSTARTTXN.DMLSTOPTXN.DMLQUERYGT 000080
 514C4D44 0C444C45 49465445 534C4D44 08444C45 49465952 4555514C 4D440049 I.DMLQUERYFIELD.DMLSETFIELD.DMLQ 0000A0
 45534544 4C4D440E 5443454A 424F5443 454C4553 4C4D440F 314E4C52 59524555 UERYRLN1.DMLSELECTOBJECT.DMLDESE 0000C0
 4F464144 0647534D 444E4553 4854454D 5F0C444F 4854454D 064C4C41 5443454C LECTALL.METHOD._METHSENDMSG.DAFO 0000E0
 4E595354 494E494A 424F0A4F 464E4952 45535554 494E494D 524F4641 44124D52 RM.DAFORMINITUSERINFO.OBJINITSYN 000100
 4F0A4E59 53504552 4A424F09 4E59534C 45444A42 4F094E59 53444441 4A424F09 .OBJADDSYN.OBJDELSYN.OBJREPSYN.O 000120
 424F0944 574B4C45 444A424F 0944574B 4444414A 424F0944 574B5449 4E494A42 BJINITKWD.OBJADDKWD.OBJDELKWD.OB 000140
 4F0A4554 4F4E4444 414A424F 0A45544F 4E54494E 494A424F 0B44574B 5045524A JREPKWD.OBJINITNOTE.OBJADDNOTE.O 000160
 54554C4D 44165455 4C4D4405 45544F4E 5045524A 424F0A45 544F4E4C 45444A42 BJDELNOTE.OBJREPNOTE.DMLUT.DMLUT 000180
 53524554 53494745 5254554C 4D441052 454C444E 41485946 49544F4E 4548414D MAKENOTIFYHANDLER.DMLUTREGISTERS 0001A0
 45434F52 5054554C 4D441245 54495257 52455453 49474552 54554C4D 44125445 ET.DMLUTREGISTERWRITE.DMLUTPROCE 0001C0
 45524E55 4554414C 45525245 54534947 45525455 4C4D441B 59464954 4F4E5353 SSNOTIFY.DMLUTREGISTERRELATEUNRE 0001E0

Dump of file SATURN:[PCCOMMON.DUMP.DLL]SDFORM.TMP;1 on 18-APR-1990 10:52:44.38
File ID (918,23,0)   End of file block 46 / Allocated 48

Virtual block number 3 (00000003), 512 (0200) bytes

 52464153 08525450 41544144 58554159 52455551 49544712 49544703 4554414C LATE.GTI.GTIQUERYAUXDATAPTR.SAFR 000000
 524C5455 4D524641 531B524F 52524554 494E494C 54554D52 46415311 4C54554D MUTL.SAFRMUTLINITERROR.SAFRMUTLR 000020
 5354494E 494C5455 4D524641 53154D46 49455441 4C45524E 55524554 53494745 EGISTERUNRELATEIFM.SAFRMUTLINITS 000040
 584F4254 43454C45 53455441 4450554C 54554D52 46415317 584F4254 43454C45 ELECTBOX.SAFRMUTLUPDATESELECTBOX 000060
 45544144 50554C54 554D5246 41531254 58455454 494E494C 54554D52 46415310 .SAFRMUTLINITTEXT.SAFRMUTLUPDATE 000080
 4E494C54 554D5246 41531545 54414749 56414E4C 54554D52 46415310 54584554 TEXT.SAFRMUTLNAVIGATE.SAFRMUTLIN 0000A0
 4F4E5449 44454554 41445055 4C54554D 52464153 174C4544 4F4D434F 52505449 ITPROCMODEL.SAFRMUTLUPDATEEDITNO 0000C0
 4450554C 54554D52 46415312 454D414E 54494E49 4C54554D 52464153 1056414E NAV.SAFRMUTLINITNAME.SAFRMUTLUPD 0000E0
 534F4408 4F495303 5453494C 54494E49 4C54554D 52464153 10454D41 4E455441 ATENAME.SAFRMUTLINITLIST.SIO.DOS 000100
 442F6563 72756F53 20415320 4D502032 2F534F22 00000944 03010145 54495257 WRITE...D..."OS/2 PM SA Source/D 000120
 41525453 544F4F42 4D524F46 44530F00 0060726F 46206E6F 6974616E 69747365 estination Form...SDFORMBOOTSTRA 000140
 890A468B D88EFFFF 8B1E5657 00001AC8 00000000 00000000 00000000 00000150 P...............à...WV.|...Ã.F.. 000160
 EC468D0E 76FF1076 FF00B3E9 E8468800 ECE90374 01FA7E83 FA46890C 468BE846 Fò.F..F*.-*.t.Õš..FÒÕ"..v..v..Fš 000180
 E876FFF2 76FFF476 FF0000FF FF9A5016 F2468D0E 76FF1076 FF0000FF FF9A5016 .P......v..v..F·.P......v¶.v·.vÒ 0001A0
 E90000B8 0009E903 74FFEA7E 83EA4689 0000008B 9A006A00 6A006A00 6A016568 he.j.j.j.j.......Fõ.-õ.t.Õ..|..Õ 0001C0
 890000FF FF9A006A 006AEA76 FF006A01 6A68E876 FFF276FF F476FF00 62E90123 #.Õb..v¶.v·.vÒhj.j..võj.j....... 0001E0
```

```
Dump of file SATURN:[PCCOMMON.DUMP.DLL]SDFORM.TMP;1 on 18-APR-1990 10:52:44.38
File ID (918,23,0)   End of file block 46 / Allocated 48

Virtual block number 4 (00000004), 512 (0200) bytes

 0000FFFF 9A5016E6 468D0E76 FF1076FF 0037E903 75FE4608 FC4688FE 5689FC46 F=.V±.F=.F±u.07..v..v..F!.P..... 000000
 FC76FFFE 76FFEC76 FFEE76FF 0000FFFF 9AEC76FF EE76FF00 0BE90374 00E67E83 .-|.t.Õ...vŸ.v§......vŸ.v§.v±.v= 000020
 E9037501 4130FF30 E9037501 3730FF45 E9037501 26300033 E90000FF FF9A016A j......Õ3.=&.u.ÕE.=7.u.Õ=.=A.u.Õ 000040
 E8468800 00E9FF1D E9037503 A83DFF25 E9037503 943DFF2D E9037501 4E3DFF35 5.=N.u.Õ-.=..u.Õ%.=´.u.Õ..Õ...FÒ 000060
 16F0468D 0E76FF10 76FF0000 FFFF9A50 16F6468D E876FF0E 76FF1076 FF005FE9 Õ_..v..v..vÒ.F-.P......v..v..Fþ. 000080
 FF0C76FF F276FFF4 76FF0000 00439A50 16F2468D 0E76FF10 76FF0000 FFFF9A50 P.......v..v..F·.P.C....v¶.v·.v.. 0000A0
 E90026E9 00008800 2CE90000 FFFF9AF0 76FFF676 FFF876FF 0676FF08 76FF0A76 v..v..v..v½.v-.vþ.....Õ,.|..Õ&.Õ 0000C0
 E9037501 4E3DFF89 E9037501 4C3DFF91 E9037501 263DFF99 E9037501 24300023 #.=$.u.Õ..=&.u.Õ..=L.u.Õ..=N.u.Õ 0000E0
 76FFF446 890A4688 D88E0008 B81E5657 00000CC8 000CCAC9 5F5E1FFF D4E9FF81 ..Õå..^_èò..à...WV.|...Ã.F..F¶.v 000100
 0002069A 5016F646 8D0E76FF 1076FF00 0001F69A 5016FC46 8DF476FF 0E76FF10 ..v..v¶.F=.P.-.....v..v..F-.P.... 000120
 F476FF0E 76FF1076 FF005FE9 F4468800 0002169A 5016F846 800E76FF 1076FF00 ..v..v..F½.P......F¶Õ_..v..v..v¶ 000140
 0E76FF10 76FF0000 01329A50 16F6468D 0E76FF10 76FF0000 01229A50 16FC468D .F=.P."....v..v..F-.P.2....v..v. 000160
 FFFE76FF 0676FF08 76FF0A76 FF0C76FF F876FFFA 76FF0000 01429A50 16F8468D .F½.P.B....v'.v½.v..v..v..v..v±. 000180
 293DFFEF E9037301 27300023 E90026E9 00008800 2CE90000 FFFF9AF6 76FFFC76 v=.v-.....Õ,.|..Õ&.Õ#.='.s.Õy.=) 0001A0
 000CCAC9 5F5E1FFF D4E9FF81 E9037701 513DFFDF E9037301 4F3DFF91 E9037701 .w.Õ..=Q.s.ÕÕ.=O.w.Õ..ÕÃ..^_èò.. 0001C0
 0000FFFF 9A008468 1E016A06 76FF0876 FF0A76FF D88E01A4 B81E5657 000000C8 à...WV.|É..Ã.v..v..v.j..h....... 0001E0

Dump of file SATURN:[PCCOMMON.DUMP.DLL]SDFORM.TMP;1 on 18-APR-1990 10:52:44.38
File ID (918,23,0)   End of file block 46 / Allocated 48

Virtual block number 5 (00000005), 512 (0200) bytes

 6A1276FF 1476FF16 76FFD88E 0278B81E 56570000 00C80006 CAC95F5E 1F0000E9 Õ...^_èò..à...WV.|x..Ã.v..v..v.j 000000
 CAC95F5E 1F0000E9 0000FFFF 9A0676FF 0876FF0A 76FF0C76 FF0E76FF 1076FF01 ..v..v..v..v..v..v......Õ...^_èò 000020
 00E90000 FFFF9A0A 6A0676FF 0876FF0A 76FFD88E 02A2B81E 56570000 00C80012 ..à...WV.|Ã..Ã.v..v..v.j......Õ. 000040
 9A0B6A06 76FF0876 FF0A76FF D88E02DA B81E5657 000000C8 0006CAC9 5F5E1F00 ..^_èò..à...WV.|Õ..Ã.v..v..v.j.. 000060
 1476FF16 76FFD88E 0300B81E 56570000 00C80006 CAC95F5E 1F0000E9 0000FFFF ....Õ...^_èò..à...WV.|...Ã.v..v. 000080
 1F0000E9 0000FFFF 9A0676FF 0876FF0A 76FF0C76 FF0E76FF 1076FF08 6A1276FF .v.j..v..v..v..v..v..v......Õ... 0000A0
 01DD9A50 16F6468D 0876FF0A 76FFD88E 0326B81E 56570000 12C80012 CAC95F5E ^_èò..à...WV.|&..Ã.v..v..F-.P.T. 0000C0
 FFFF9A50 16FC468D 0876FF0A 76FF0000 00339A50 16F0468D 0876FF0A 76FF0000 ...v..v..Fþ.P.3....v..v..F=.P... 0000E0
 EE7E83EE 46890000 FFFF9A50 16F4468D 086AFC76 FFFE76FF F076FFF2 76FF0000 ...v'.vþ.v±.v=j..F¶.P......FŸ.-Ÿ 000100
 E9012EFA 46C70047 E9012FFA 46C7002C E9F4468B 0074E9EE 46880006 E9037500 .u.Õ...FŸÕt..F¶Õ,.úF'/.ÕG.úF'..Õ 000120
 013D0023 E90026E9 0048E900 0088002F E90130FA 46C70037 E9012DFA 46C7003F ?.úF'-.Õ7.úF'0.Õ/.|..ÕH.Õ&.Õ#.=. 000140
 D1E9FFCC E9037500 043DFFCC E9037500 033DFFCC E9037500 023DFFCC E9037500 .u.Õä.=..u.Õä.=..u.Õä.=..u.Õä.Õ! 000160
 0000E900 00880000 005C9A00 6A006A01 6A006A01 2568FA76 FFF676FF F876FFFF ..v½.v-.v'h%.j.j.j.j..\...|..Õ.. 000180
 6E9A5016 F8468014 76FF1676 FFD88E03 5EB81E56 57000010 C80006CA C95F5E1F .^_èò..à...WV.|^..Ã.v..v..F½.P.n 0001A0
 8E9A5016 FC468014 76FF1676 FF000003 7E9A5016 F2468014 76FF1676 FF000003 ....v..v..F·.P.-....v..v..F=.P.. 0001C0
 2EE90001 F646C700 36E90002 F646C700 3EE90003 F646C700 23E91246 8B000003 ....F.Õ#.úF-..Õ>.úF-..Õ6.úF-..Õ. 0001E0

Dump of file SATURN:[PCCOMMON.DUMP.DLL]SDFORM.TMP;1 on 18-APR-1990 10:52:44.38
File ID (918,23,0)   End of file block 46 / Allocated 48

Virtual block number 6 (00000006), 512 (0200) bytes

 75012F30 FFD5E903 75012E30 FFD5E903 75012D30 0023E900 26E90004 F646C700 .úF-..Õ&.Õ#.=-.u.Õ(.=..u.Õ(.=/.u 000000
 46890000 FFFF9A00 97681EF2 76FFF476 FF0000E9 FFD5E903 75013030 FFD5E903 .Õ(.=0.u.Õ(.Õ...v¶.v·.h........F 000020
 FFFF9A50 16F6468D 086AFC76 FFFE76FF F276FFF4 76FF0018 E9037400 F07E83F0 þ.-þ.t.Õ...v¶.v·.v±.v=j..F-.P... 000040
 00A6681E F076FF00 23E90375 00F07E83 0000FFFF 9AF276FF F476FFF0 46890000 ...Fþ.v¶.v·.......-þ.u.Õ#..vþ.h|. 000060
 260E5EC4 000EE9F0 46880002 07C7260E 5EC40AC4 83FFFF00 109A0A76 FF0C76FF .v..v.......á.á^.&ú....FþÕ..á^.& 000080
 0A76FFD8 8E043FB8 1E565700 0000C800 12CAC95F 5E1F0000 E9F0468B 000107C7 ú....FþÕ...^_èò..à...WV.|?..Ã.v. 0000A0
 49B81E56 57000000 C80006CA C95F5E1F 0000E900 00FFFF9A 046A0676 FF0876FF .v..v.j......Õ...^_èò..à...WV.|I 0000C0
 0000C800 06CAC95F 5E1F0000 E9000005 599A056A 0676FF08 76FF0A76 FFD88E05 ..Ã.v..v..v.j..Y...Õ...^_èò..à.. 0000E0
 006AFFFF 68FFFF68 FFFF68FF FF6803A9 680676FF 0876FFD8 8E056FB8 1E565700 .WV.|o..Ã.v..v.h`.h..h..h̄..h..j. 000100
 006AFFFF 6805E368 FFFF6805 C9680105 680676FF 0876FF00 0005D59A 006A006A j.j..(....v..v.h..hè.h..hD.h..j. 000120
 016AFFFF 68FFFF68 FFFF6806 036803A8 680676FF 0876FF00 0005F59A 006A006A j.j..%....v..v.h`.h..h..h..h..j. 000140
 006AFFFF 68074B68 FFFF6806 09680119 680676FF 0876FF00 0006159A 006A006A j.j.......v..v.h..h..h..hK.h..j. 000160
 0042681E 016A006A 006A006A 006A0124 680676FF 0876FF00 0006319A 006A006A j.j..1....v..v.h$.j.j.j.j.j..hB. 000180
 609A0042 681E016A 006A006A FFFF68FF FF680126 680676FF 0876FF00 00064F9A .O....v..v.h&.h..h..j.j.j..hB..m 0001A0
 0006889A 0042681E 006AFFFF 68FFFF68 006A006A 01276806 76FF0876 FF000006 ....v..v.h'.j.j.h..h..j..hB..... 0001C0
 FF000006 A99A0042 681E006A FFFF68FF FF68006A 006A0128 680676FF 0876FF00 ..v..v.h(.j.j.h..h..j..hB..`.... 0001E0
```

99600

```
Dump of file SATURN:[PCCOMMON.DUMP.DLL]SDFORM.TMP;1 on 18-APR-1990 10:52:44.38
File ID (918,23,0)   End of file block 46 / Allocated 48

Virtual block number 7 (00000007), 512 (0200) bytes

0876FF00 0006C59A 0042681E 006AFFFF 68FFFF68 006A006A 01296806 76FF0876 v..v.h).j.j.h..h..j..hB..é....v. 000000
680676FF 0876FF00 0006E39A 0058681E 006A006A 006A006A 006A0392 680676FF .v.h..j.j.j.j.j..hX..D....v..v.h 000020
03956806 76FF0876 FF000007 019A0058 681E006A 006A006A FFFF68FF FF680394 ..h..h..j.j.j..hX.......v..v.h.. 000040
006A0396 680676FF 0876FF00 00071F9A 0058681E 006AFFFF 68FFFF68 006A006A j.j.h..h..j..hX.......v..v.h..j. 000060
006A006A 03976806 76FF0876 FF000007 309A0058 681E006A FFFF68FF FF68006A j.h..h..j..hX..=....v..v.h..j.j. 000080
FFFF6807 5168012D 680676FF 0876FF00 00075D9A 0058681E 006AFFFF 68FFFF68 h..h..j..hX..]....v..v.h-.hQ.h.. 0000A0
8068006A 006A012E 680676FF 0876FF00 00077B9A 006A006A 006A0772 68076F68 ho.hr.j.j.j..(....v..v.h..j.j.h. 0000C0
6807AB68 006A006A 012F6806 76FF0876 FF000007 999A006A 006A006A 07906807 .h..j.j.j.......v..v.h/.j.j.h¨.h 0000E0
FFFF6807 C568006A 006A0130 680676FF 0876FF00 0007B79A 006A006A 006A07AE Û.j.j.j..ñ....v..v.h0.j.j.hé.h.. 000100
016A006A 006AFFFF 6807E368 01376806 76FF0876 FF000007 D59A006A 006A006A j.j.j..f....v..v.h7.hD.h..j.j.j. 000120
006A016A 006A006A FFFF68FF FF680141 680676FF 0876FF00 0007F39A 006A006A j.j..æ....v..v.hA.h..h..j.j.j.j. 000140
2D9A006E 681E016A 006A006A 006A006A 014C6806 76FF0876 FF000008 0F9A006A j.......v..v.hL.j.j.j.j.j..hn..- 000160
00084B9A 006E681E 016A006A 006AFFFF 68FFFF68 014E6806 76FF0876 FF000008 ....v..v.hN.h..h..j.j.j..hn..K.. 000180
FF000008 699A006E 681E006A FFFF68FF FF68006A 006A014F 680676FF 0876FF00 ..v..v.hO.j.j.h..h..j..hn..i.... 0001A0
0876FF00 0008879A 006E681E 006AFFFF 68FFFF68 006A006A 01506806 76FF0876 v..v.hP.j.j.h..h..j..hn.......v. 0001C0
76FF0876 FF000008 A59A006E 681E006A FFFF68FF FF68006A 006A0151 680676FF .v.hQ.j.j.h..h..j..hn..É....v..v 0001E0

Dump of file SATURN:[PCCOMMON.DUMP.DLL]SDFORM.TMP;1 on 18-APR-1990 10:52:44.38
File ID (918,23,0)   End of file block 46 / Allocated 48

Virtual block number 8 (00000008), 512 (0200) bytes

680676FF 0876FF00 00FFFF9A 006A006A 006A006A 006A0886 68088368 00906806 .h..h°.hÑ.j.j.j.j.j.......v..v.h 000000
009C6806 76FF0876 FF000008 E19A006A 006A006A 006A006A FFFF68FF FF68009E ..h..h..j.j.j.j.j..Ã....v..v.h.. 000020
006800A0 680676FF 0876FF00 0008FF9A 006A006A 006A006A 006A08F2 6808EF68 hÿ.h·.j.j.j.j.j.......v..v.h..h. 000040
68092B68 00A16806 76FF0876 FF000009 1D9A006A 006A006A 006A006A 09106809 .h..j.j.j.j.j.......v..v.hÀ.h+.h 000060
08986808 9568009F 680676FF 0876FF00 00093B9A 006A006A 006A006A 006A092E ..j.j.j.j.j..;....v..v.h..h..h.. 000080
D88E0595 B81E5657 000008C8 CBC95F5E 1F000005 B59A006A 006A006A 006A006A j.j.j.j.j..ç....^_èùà...WV.[...Ä 0000A0
00FFFF9A 5016FC46 8D0A6A5C 6AFA76FF 000001CD 9A5016FA 46800676 FF0876FF .v..v..F°.P.ë....v°j\j..F=.P.... 0000C0
C48309CE 058D9A06 76FF0876 FF00AFE9 F8468B00 06E90375 00F87E83 F8468900 ..F½.-½.u.Õ...F½Ö£..v..v....ö..é 0000E0
76FFFE76 FF0676FF 0876FF08 C483098D 0AE39A06 76FF0876 FFFC76FF FE76FF04 ..v±.v=.v..v..Ð.§..á..v..v..v±.v 000100
09DF6806 76FF0876 FF0000FF FF9AFFFF 68FFFF68 0676FF08 76FF0000 FFFF9AFC =......v..v.h..h........v..v.hô. 000120
680676FF 0876FF00 00FFFF9A FFFF6805 C3680676 FF0876FF 0000FFFF 9AFFFF68 h........v..v.hû.h........v..v.h 000140
6A0676FF 0876FF00 00FFFF9A 006A006A 0676FF08 76FF0000 FFFF9AFF FF68FFFF ..h........v..v.j.j........v..v.j 000160
E90000FF FF9A0200 36FF2619 50068E01 00680676 FF0876FF 0000FFFF 9A006A00 .j.......v..v.h....P.&.6.......Ô 000180
098C0002 02220007 06060205 01E60007 08D10202 00519000 04CAC95F 5E1F0000 ...^_èò...Q...Î...Ì...ø..."..... 0001A0
09A00002 0A480002 09C00005 05670001 07E60005 007F0001 04260103 00000001 ......&.......Ì...g...â...H..... 0001C0
09F60203 01620005 04CA0203 006A0004 045F0203 026D0007 08500202 00000002 ......]...m..._...j...ò...b...-. 0001E0

Dump of file SATURN:[PCCOMMON.DUMP.DLL]SDFORM.TMP;1 on 18-APR-1990 10:52:44.38
File ID (918,23,0)   End of file block 46 / Allocated 48

Virtual block number 9 (00000009), 512 (0200) bytes

05C60005 00000004 05190002 022D0007 06F80205 034C000A 05AC0205 00EA0004 ..õ...¯...L...½...-...........ó. 000000
028C0203 016E0005 04FC0203 00760004 044F0203 01F90007 063F0202 02700001 ..p...?...•...O...v...•...n..... 000020
09C30203 02F80001 06060005 00000006 094C0002 02370007 07340205 03C7000A ..û...4...7...L...........¼...Û. 000040
00AC0203 02410007 07160205 00000001 09D10005 02040007 06610202 00FB0004 ..«...a.......Ñ...........,  ..¯. 000060
08200205 010A0004 0A050203 020E0007 06900202 030B000A 02C40203 00860004 ......á...Ä................   . 000080
03100203 0388000A 09F00202 01850005 03A60203 00140003 096D0203 02480007 ..K...m.......Î.......Þ......... 0000A0
04EE0203 029A0001 05CC0005 02570007 08420205 02180007 067F0202 0364000A ..d...........B...W...ä.......Ý. 0000C0
06030202 019C0001 09E20005 01180004 09820203 03EB000A 057F0203 01930005 ..........Š...ý.......ã.......Æ. 0000E0
08D40205 0375000A 03480203 02620007 087E0205 031E0001 060C0005 02220007 ..Ñ...........~...b...H...u...Â. 000100
01620203 022D0007 06F50202 0388000A 09F30205 00260004 0A2B0203 01E60007 ..Ì...+...&...æ.......¾...-...b. 000120
00030203 02370007 07310202 026D0007 08600205 00AB0004 08C30203 012A0004 ..*...û...¨...'...m...1...7...Æ. 000140
06420205 03AF000A 05E90202 04370001 07540005 00350004 01BD0203 01AC0005 ..¯...§...5...T...7...Õ...£...B. 000160
07C80005 0336000A 05A30202 02410007 07130202 00BC0004 0A140203 01F90007 ..'.......¥.......A...È...6...à. 000180
081D0202 02040007 06640205 01440004 02360203 018C0005 00C00203 05410001 ..A...å...¥...6...D...d......... 0001A0
06A00205 004B0004 095C0203 00CA0004 09E50203 0399000A 02EA0203 024B0007 ..K...õ.......Î...ò...\...K..... 0001C0
05A90202 02570007 083F0202 02D20001 05E60005 03AF000A 05EC0205 020E0007 ......â...£...Î...Ø...?...W...`. 0001E0
```

```
Dump of file SATURN:[PCCOMMON.DUMP.DLL]SDFORM.TMP;1 on 18-APR-1990 10:52:44.38
File ID (918,23,0)   End of file block 46 / Allocated 48

Virtual block number 10 (0000000A), 512 (0200) bytes

 046F0203 02180007 06820205 0336000A 05A60205 03560001 074E0005 034C000A ..L...N...V...!...6...........o. 000000
 00000000 00000000 00000000 02620007 08780202 000A0004 09040203 005A0004 ..Z...Å...Ö...(...b............. 000020
 80FA76FF 0000FFFF 9A5016FA 46800A76 FF0C76FF D88EFFFF B81E5657 00000AC8 à...WV.|...Ä.v..v..F'.P......v'. 000040
 39FE568B FC468800 00FFFF9A 5016FC46 80F676FF F876FF00 00FFFF9A 5016F646 F-.P......v½.v-.F=.P......F=.V±9 000060
 709A0105 68F676FF F876FF00 11E90000 B80006E9 03751056 390008E9 03740E46 F.t.Ö..9V.u.Ö..|..Ö...v½.v-h...p 000080
 F646800A 76FF0C76 FFD88E00 08881E56 57000014 C8C8C95F 5E1F0000 E9FFFF02 ...Ö...^_èùà...WV.|...Ä.v..v..F- 0000A0
 9A5016FC 4680EC76 FFEE76FF 00000025 9A5016EC 4680F676 FF000000 189A5016 .P......v-.F$.P.X....vY.v$.F=.P. 0000C0
 FC76FFFE 76FF0A76 FF0C76FF 0000FFFF 9A5016F2 4680EC76 FFEE76FF 00000035 5....vY.v$.F·.P......v..v..v±.v= 0000E0
 76FFF276 FFF476FF 0016E903 7500F07E 83F04689 0000FFFF 9A5016F8 46800A6A j..F½.P......Fþ.-þ.u.Ö...v¶.v·.v 000100
 75105639 0008E903 740E4639 FA568BF8 468B002D E90000FF FF9A106A 03EE68F0 þhY.j......Ö-...F½.V'9F.t.Ö..9V.u 000120
 C8C95F5E 1F0000E9 00610202 9A03A868 EC76FFEE 76FF0011 E90000B8 0006E903 .Ö..|..Ö...vY.v$h´..ø.a.Ö...^_èù 000140
 80FA76FF 00000083 9A5016FA 46800A76 FF0C76FF D88E0073 B81E5657 000010C8 à...WV.|s..Ä.v..v..F'.P......v'. 000160
 FF0A76FF 0C76FF00 0000A09A 5016FC46 80F076FF F276FF00 0000909A 5016F046 Fþ.P......v·.vþ.F=.P......v..v.. 000180
 E903740E 4639F856 8BF6468B F4468900 0000C89A 5016F646 80086AFC 76FFFE76 v±.v=j..F-.P.à....F¶.F-.V½9F.t.Ö 0001A0
 00E90116 02F89A01 1968F076 FFF276FF 0011E900 00B80006 E9037510 56390008 ..9V.u.Ö..|..Ö...v·.vþh...½...Ö. 0001C0
 01389A50 16FA4680 0A76FF0C 76FFD88E 0128B81E 56570000 0AC8CBC9 5F5E1F00 ..^_èùà...WV.|(..Ä.v..v..F'.P.8. 0001E0

Dump of file SATURN:[PCCOMMON.DUMP.DLL]SDFORM.TMP;1 on 18-APR-1990 10:52:44.38
File ID (918,23,0)   End of file block 46 / Allocated 48

Virtual block number 11 (0000000B), 512 (0200) bytes

 8B000001 559A5016 FC4680F6 76FFF876 FF000001 459A5016 F64680FA 76FF0000 ...v'.F-.P.E....v½.v-.F=.P.U.... 000000
 03741246 39FE568B FC468800 1CE90375 10563900 08E90374 0E4639FE 568BFC46 F=.V±9F.t.Ö..9V.u.Ö...F=.V±9F.t. 000020
 E90000FF FF9A0126 68F676FF F876FF00 11E90000 B80006E9 03751456 390008E9 Ö..9V.u.Ö..|..Ö...v½.v-h&......Ö 000040
 BE9A5016 F24680 0A 76FF0C76 FFD88E01 AEB81E56 5700001A C8C8C95F 5E1F0000 ...^_èùà...WV.|Ü..Ä.v..v..F·.P./ 000060
 000001DB 9A5016F8 4680E676 FFE876FF 000001CB 9A5016E6 4680F276 FF000001 ....v·.F|.P.ù....vÖ.v|.F½.P.Ü... 000080
 2713680A 76FF0C76 FF066A50 16FC4680 00000080 9A5016EE 4680E676 FFE876FF .vÖ.v|.FY.P.¯....F=.Pj..v..v.h.' 0000A0
 FFF076FF 0016E903 7500EA7E 83EA4689 12C48300 00FFFF9A 006AF876 FFFA76FF .v'.v½j.......á..Fõ.-õ.u.Ö...vþ. 0000C0
 0000EC46 C7F44689 F6468900 00B800A6 E9000000 E79A246A 03FE68EA 76FFEE76 vY.võh±.j$.Ö...Ö|.|...F-.F¶úF$.. 0000E0
 E3C1EC5E 88003CE9 03750240 08260088 26FC76C4 02E3C1EC 5E88EC46 FF0003E9 Ö...F$.^$èÖ.áv=&..&.@.u.Ö<..^$èÖ 000100
 E3C1EC5E 880019E9 03740250 39260022 E9037400 39261056 880E468B FC76C402 .áv=.F..V.&9.t.Ö".&9P.t.Ö...^$èÖ 000120
 0C76FFFC 76FFFE76 FFFFACE9 0003E9F6 5689F446 8902508B 26008826 FC76C402 .áv=&..&.P..F¶.V-Ö..Ö¯..v±.v=.v. 000140
 06E90374 F6460BF4 468B10C4 83000002 899A006A 0E76FF10 76FF2715 680A76FF .v.h.'.v..v.|.......á..F¶.F-t.Ö. 000160
 0010C8C8 C95F5E1F 0000E900 0002189A 012668E6 76FFE876 FF0011E9 0000B800 .|..Ö...vÖ.v|h&......Ö...^_èùà.. 000180
 16F04680 F876FF00 00023F9A 5016F846 800A76FF 0C76FF08 8E022FB8 1E565700 .WV.|/..Ä.v..v..F½.P.?....v½.Fþ. 0001A0
 740E4639 FE568BFC 468B0000 025C9A50 16FC4680 F076FFF2 76FF0000 024C9A50 P.L....v·.vþ.F=.P.\....F=.V±9F.t 0001C0
 086A0E76 FF1076FF 0A76FF0C 76FF0087 E9000088 0006E903 75105639 0008E903 .Ö..9V.u.Ö..|..Ö...v..v..v..v.j. 0001E0

Dump of file SATURN:[PCCOMMON.DUMP.DLL]SDFORM.TMP;1 on 18-APR-1990 10:52:44.38
File ID (918,23,0)   End of file block 46 / Allocated 48

Virtual block number 12 (0000000C), 512 (0200) bytes

 E9F6468B 005DE9F4 468B0006 E9037500 F47E83F4 46890000 FFFF9A50 16F6468D .F-.P......F¶.-¶.u.Ö...F¶Ö]..F-Ö 000000
 E90130FA 46C7002E E9012DFA 46C70036 E9012EFA 46C7003E E9012FFA 46C70023 #.úF'/.Ö>.úF'..Ö6.úF'-.Ö..úF'0.Ö 000020
 00043DFF D5E90375 00033DFF D5E90375 00023DFF D5E90375 00013D00 23E90026 &.Ö#.=..u.Ö(.=..u.Ö(.=..u.Ö(.=.. 000040
 0AC8CBC9 5F5E1F00 00E9019C 03569AFA 76FFF076 FFF276FF 0000E9FF D5E90375 u.Ö(.Ö...v·.vþ.v'.V...Ö...^_èùà. 000060
 F64680FA 76FF0000 03759A50 16FA4680 0A76FF0C 76FFD88E 0365B81E 56570000 ..WV.|e..Ä.v..v..F'.P.u....v'.F- 000080
 0E4639FE 568BFC46 88000003 929A5016 FC4680F6 76FFF876 FF000003 829A5016 .P......v½.v-.F=.P......F=.V±9F. 0000A0
 03751456 390008E9 03741246 39FE5688 FC468800 1CE90375 10563900 08E90374 t.Ö..9V.u.Ö...F=.V±9F.t.Ö..9V.u. 0000C0
 5F5E1F00 00E90000 FFFF9A1A 76FF1876 FFF676FF F876FF00 14E90000 B80006E9 Ö..|..Ö...v½.v-.v..v......Ö...^_ 0000E0
 FF1076FF 1276FF14 76FF1676 FF013768 046AD88E 044688 1E 56570000 00C8CBC9 èùà...WV.|F..Äj.h7..v..v..v..v.¯ 000100
 00C8CBC9 5F5E1F00 00E916C4 83FFFF04 3E9A0676 FF0876FF 0A76FF0C 76FF0E76 v..v..v..v..v..>....á.Ö...^_èùà. 000120
 76FF0E76 FF1076FF 1276FF14 76FF1676 FF014168 056AD88E 04CAB81E 56570000 ..WV.|ò..Äj.hA..v..v..v..v.¯v..v 000140
 56570000 1AC8CBC9 5F5E1F00 00E916C4 8304F104 3E9A0676 FF0876FF 0A76FF0C ..v..v..v..>.þ..á.Ö...^_èùà...WV 000160
 639A5016 E64680F6 76FF0000 04569A50 16F64680 0A76FF0C 76FFD88E 0506B81E .|...Ä.v..v..F-.P.V....v-.F|.P.c 000180
 6C9A5016 F24680E6 76FFE876 FF000004 739A5016 FC4680E6 76FFE876 FF000004 ....vÖ.v|.F=.P.s....vÖ.v|.F·.P.l 0001A0
 00032F9A 006AFC76 FFFE76FF 2713680A 76FF0C76 FF1476FF 5016EC46 80000002 ....F$.P.v..v..v.h.'.v±.v=j../.. 0001C0
 AB9A276A 03FE68EA 76FFF276 FFF476FF 0016E903 7500EA7E 83EA4689 12C48300 ..á..Fõ.-õ.u.Ö...v¶.v· võh± j' ¨ 0001E0
```

Dump of file SATURN:[PCCOMMON.DUMP.DLL]SDFORM.TMP;1 on 18-APR-1990 10:52:44.38
File ID (918,23,0)   End of file block 46 / Allocated 48

Virtual block number 13 (0000000D), 512 (0200) bytes

```
 02E3C1F0 5E88F046 FF0003E9 0000F046 C7F84689 FA468900 00B800A9 E9000002 ...Õ`.¡...F".F½úFÞ..Õ...FÞ.^ÞèÐ. 000000
 39261056 880E4688 EC76C402 E3C1F05E 88003CE9 03750240 0B260088 26EC76C4 ávš&..&.a.u.Õ<..^ÞèÐ.ávš.F..V.&9 000020
 89025088 26008826 EC76C402 E3C1F05E 880019E9 03740250 39260022 E9037400 .t.Õ".&9P.t.Õ...^ÞèÐ.ávš&..&.P.. 000040
 0E76FF10 76FF2715 680A76FF 0C76FFEC 76FFEE76 FFFFACE9 0003E9FA 5689F846 F½.V"Õ..Õ¯..vÝ.vš.v..v.h.'.v..v. 000060
 76FFE876 FF0014E9 00008800 06E90374 FA460BF8 468810C4 83000005 9D9A006A j.......á..F½.F"t.Õ..¡..Õ...vÒ.v 000080
 D88E0542 881E5657 000000C8 CBC95F5E 1F0000E9 000004B6 9A1476FF 1276FFE6 ¦.v..v..Ñ...Õ...^_èùà...k'/.¡B..Ã 0000A0
 E910C483 0520053A 9A0676FF 0876FF0A 76FF0C76 FF0E76FF 1076FF01 3768046A j.h7..v..v..v..v..v..v..:. ..á.Õ 0000C0
 76FF0E76 FF1076FF 01416805 6AD88E06 7CB81E56 57000000 C8CBC95F 5E1F0000 ...^_èùà...WV.¡|..Ãj.hA..v. "..v 0000E0
 56570000 0AC8CBC9 5F5E1F00 00E910C4 83069A05 3A9A0676 FF0876FF 0A76FF0C ..v..v..v..:.....á.Õ...^_èùà...WV 000100
 5F9A5016 F6468DFA 76FF0000 05529A50 16FA468D 0A76FF0C 76FFD88E 06AFB81E .¡£..Ã.v..v..F".P.R.....v".F-.P._ 000120
 08E90374 0E4639FE 5688FC46 88000005 6F9A5016 FC468DF6 76FFF876 FF000005 ....V½.v-.F•.P.o....F•.V±9F.t.Õ. 000140
 B80006E9 03751456 390008E9 03741246 39FE5688 FC468B00 1CE90375 10563900 .9V.u.Õ...F•.V±9F.t.Õ..9V.u.Õ..¡ 000160
 5700001A C8CBC95F 5E1F0000 E90000FF FF9A0394 68F676FF F876FF00 11E90000 ..Õ...V½.v-h.......Õ...^_èùà...W 000180
 9A5016E6 468DF676 FF000006 F29A5016 F6468D0A 76FF0C76 FFD88E06 E2B81E56 V.¡ã..Ã.v..v..F-.P.·....v-.Fl.P. 0001A0
 9A5016F2 468DE676 FFE876FF 0000070F 9A5016FC 468DE676 FFE876FF 000006FF .....vÒ.vl.F•.P......vÒ.vl.F·.P. 0001C0
 0008639A 006AFC76 FFFE76FF 2713680A 76FF0C76 FF0D6A50 16EC468D 0000057F .....Fš.Pj..v..v.h.'.v±.v•j..c.. 0001E0
```

Dump of file SATURN:[PCCOMMON.DUMP.DLL]SDFORM.TMP;1 on 18-APR-1990 10:52:44.38
File ID (918,23,0)   End of file block 46 / Allocated 48

Virtual block number 14 (0000000E), 512 (0200) bytes

```
 BF9A256A 03FE68EA 76FFF276 FFF476FF 0016E903 7500EA7E 83EA4689 12C48300 ..á..Fõ.-õ.u.Õ...v¶.v·.võh±.j%.¢ 000000
 02E3C1F0 5E88F046 FF0003E9 0000F046 C7F84689 FA468900 00B800A6 E9000005 ...Õl.¡...F".F½úFÞ..Õ...FÞ.^ÞèÐ. 000020
 39261056 880E4688 EC76C402 E3C1F05E 88003CE9 03750240 0B260088 26EC76C4 ávš&..&.a.u.Õ<..^ÞèÐ.ávš.F..V.&9 000040
 89025088 26008826 EC76C402 E3C1F05E 880019E9 03740250 39260022 E9037400 .t.Õ".&9P.t.Õ...^ÞèÐ.ávš&..&.P.. 000060
 0E76FF10 76FF2715 680A76FF 0C76FFEC 76FFEE76 FFFFACE9 0003E9FA 5689F846 F½.V"Õ..Õ¯..vÝ.vš.v..v.h.'.v..v. 000080
 76FFE876 FF0011E9 00008800 06E90374 FA460BF8 468810C4 83000006 439A006A j..C....á..F½.F"t.Õ..¡..Õ...vÒ.v 0000A0
 0C76FFD8 8E076388 1E565700 000AC8CB C95F5E1F 0000E900 00074F9A 039468E6 lh...O...Õ...^_èùà...WV.¡c..Ã.v. 0000C0
 F676FFF8 76FF0000 07809A50 16F6468D FA76FF00 0007739A 5016FA46 8D0A76FF .v..F".P.s.....v".F-.P......V½.v- 0000E0
 001CE903 75105639 0008E903 740E4639 FE5688FC 46880000 07909A50 16FC468D .F•.P......F•.V±9F.t.Õ..9V.u.Õ.. 000100
 FFF876FF 0011E900 00880006 E9037514 56390008 E9037412 4639FE56 88FC4688 .F•.V±9F.t.Õ..9V.u.Õ..¡..Õ...V½. 000120
 76FFD88E 0899881E 56570000 1AC8CBC9 5F5E1F00 00E90000 FFFF9A01 4E68F676 v-hN......Õ...^_èùà...WV.¡...Ã.v 000140
 76FFE876 FF000008 869A5016 E6468DF6 76FF0000 08A99A50 16F6468D 0A76FF0C ..v..F-.P.`....v-.Fl.P.Ñ.....vÒ.v 000160
 5016EC46 8D000007 A09A5016 F2468DE6 76FFE876 FF000008 C69A5016 FC468DE6 l.F•.P.ó....vÒ.vl.F·.P......Fš.P 000180
 7E83EA46 8912C483 00000A1A 9A006AFC 76FFFE76 FF271368 0A76FF0C 76FF076A j..v..v.h.'.v±.v•j.......á..Fõ.~ 0001A0
 0000B800 A6E90000 07DF9A26 6A03FE68 EA76FFF2 76FFF476 FF0016E9 037500EA õ.u.Õ...v¶.v·.võh±.j&.Õ...Õl.¡.. 0001C0
 40082600 8826EC76 C402E3C1 F05E88F0 46FF0003 E90000F0 46C7F846 89FA4689 .F".F½úFÞ..Õ...FÞ.^ÞèÐ.ávš&..&.a 0001E0
```

Dump of file SATURN:[PCCOMMON.DUMP.DLL]SDFORM.TMP;1 on 18-APR-1990 10:52:44.38
File ID (918,23,0)   End of file block 46 / Allocated 48

Virtual block number 15 (0000000F), 512 (0200) bytes

```
 50392600 22E90374 00392610 5688DE46 88EC76C4 02E3C1F0 5E88003C E9037502 .u.Õ<..^ÞèÐ.ávš.F..V.&9.t.Õ".&9P 000000
 E90003E9 FA5689F8 46890250 88260088 26EC76C4 02E3C1F0 5E880019 E9037402 .t.Õ...^ÞèÐ.ávš&..&.P..F½.V"Õ..Õ 000020
 C4830000 07BD9A00 6A0E76FF 1076FF27 15680A76 FF0C76FF EC76FFEE 76FFFFAC ¯..vÝ.vš.v..v.h.'.v..v.j..§....á 000040
 00000906 9A014E68 E676FFE8 76FF0011 E90000B8 0006E903 74FA4608 F8468810 ..F½.F"t.Õ..¡..Õ...vÒ.vlhN...... 000060
 9A5016F8 468D0E76 FF1076FF D88E091A 881E5657 00000AC8 CBC95F5E 1F0000E9 Õ...^_èùà...WV.¡...Ã.v..v..F½.P. 000080
 FC468B00 0009479A 5016FC46 8D0E76FF 1076FF00 3AE90374 0C087E83 0000FFFF ......~..t.Õ:..v..v..F•.P.G....F• 0000A0
 00FFFF9A 03A9680E 76FF1076 FF000EE9 03740C56 390016E9 03740A46 39FE5688 .V±9F.t.Õ..9V.t.Õ...v..v.h`..... 0000C0
 0A76FF0C 76FF0277 FF260477 FF26F85E C4000107 C726F85E C40035E9 00008800 .¡..Õ5.á^½&ú...á^½&.w.&.w...v..v. 0000E0
 C95F5E1F 0000E9F6 46880000 07C726F8 5EC4F646 890000FF FF9A0676 FF0876FF .v..v.......F-á^½&ú....F-Õ...^_è 000100
 FF0000FF FF9A5016 FE468D06 76FF0876 FFD88E0A 50881E56 57000006 C8000CCA ò..à...WV.¡P..Ã.v..v..F±.P...... 000120
 02050C56 880A4688 FA76FFFC 76FFFE76 FF0000FF FF9A5016 FA468D06 76FF0876 v..v..F".P......v±.v•.v".F..V... 000140
 260A5EC4 0000FFFF 9A0A6A1E 6A0277FF 260477FF 260A5EC4 0000FFFF 9A505200 .RP.......á^.&.w.&.w.j.j......á^.& 000160
 77FF2604 77FF260A 5EC40000 0B6C9AFF FF680866 68016A1E 6A0277FF 260477FF .w.&.w.j.j.hf.h...l...á^.&.w.&.w 000180
 FF680896 680277FF 260477FF 260A5EC4 00000BBC 9AFFFF68 087C6802 6A1D6A02 .j.j.h|.h...¥...á^.&.w.&.w.h..h. 0001A0
 FF6808B6 68089F68 089C6806 6A1E6A02 77FF2604 77FF260A 5EC40000 FFFF9AFF ......á^.&.w.&.w.j.j.h..h..hÑ.h. 0001C0
 00000BD6 9AFFFF68 0BD06802 6A0A6A02 77FF2604 77FF260A 5EC40000 0BF69AFF ..-...á^.&.w.&.w.j.j.hÃ.h...ø... 0001E0
```

Dump of file SATURN:[PCCOMMON.DUMP.DLL]SDFORM.TMP;1 on 18-APR-1990 10:52:44.38
File ID (918,23,0)   End of file block 46 / Allocated 48

Virtual block number 16 (00000010), 512 (0200) bytes

```
77FF260A 5EC40000 0C109AFF FF680BEA 68086A1E 6A0277FF 260477FF 260A5EC4 6^.&.w.&.w.j.j.hõ.h.......6^.&.w 000000
77FF260A 5EC40000 0C309AFF FF680C0A 680BF368 08F06804 6A1E6A02 77FF2604 .&.w.j.j.hb.hµ.h..h...0...6^.&.w 000020
6A0277FF 260477FF 260A5EC4 00000C4A 9AFFFF68 0C246801 6A1F6A02 77FF2604 .&.w.j.j.h$.h...J...6^.&.w.&.w.j 000040
6A0277FF 260477FF 260A5EC4 00000C6A 9AFFFF68 0C44680C 2D680C2A 68056A1E .j.h*.h-.hD.h...j...6^.&.w.&.w.j 000060
0C646800 6A1E6A02 77FF2604 77FF260A 5EC40000 0C849AFF FF680C5E 68016A1F .j.h^.h.......6^.&.w.&.w.j.j.hd. 000080
0C986802 6A0D6A02 77FF2604 77FF260A 5EC40000 0CA49AFF FF680C7E 680C6768 hg.h~.h...Ê...6^.&.w.&.w.j.j.h.. 0000A0
0CB8680C A1680C9E 68076A1E 6A0277FF 260477FF 260A5EC4 00000CBE 9AFFFF68 h...ƒ...6^.&.w.&.w.j.j.h..hÅ.h¡. 0000C0
FFFF9AFF FF6806CD 68026A15 6A0277FF 260477FF 260A5EC4 0000FFFF 9AFFFF68 h.......6^.&.w.&.w.j.j.hë.h..... 0000E0
04C20002 0BED0005 01D20006 09740203 002790CB C95F5E1F 0000E900 00B80000 ..¦..Õ...^_èù.'...t...Ø...Û...ô. 000100
00000002 0B4C0002 0336000A 0A9D0203 00000001 04340002 024B0007 0A3C0203 ..<...K...Z..........6...L...... 000120
00000006 0AEB0002 00760004 09570203 02CC0008 0BA20203 006A0004 0B0B0203 ......j...Å...ä...W...v...Š..... 000140
01790005 092A0203 035D0002 0BD30005 075B0002 0C810005 060A0002 0C610005 ..a...Ó.......[...Æ...]...*...y. 000160
02EC0009 09370203 01F90007 03510203 01850005 03C60203 006B0002 0B690005 ..i...k...6.......Q...*...7...š. 000180
04FE0002 0C270005 03EB000A 06680203 009A0004 0A600203 06740002 0C0D0005 ......t...'.......h...Š...'...±. 0001A0
08910002 0C9B0005 019F0005 01600203 00000002 0B4F0005 027E0008 0B240203 ..$...~...O.......m............. 0001C0
02220007 08850203 0308000A 09960203 02950008 08520203 09120002 0CBB0005 ..£.......R...................". 0001E0
```

Dump of file SATURN:[PCCOMMON.DUMP.DLL]SDFORM.TMP;1 on 18-APR-1990 10:52:44.38
File ID (918,23,0)   End of file block 46 / Allocated 48

Virtual block number 17 (00000011), 512 (0200) bytes

```
06A70002 0C470005 02A60008 08820203 01A60002 08990005 01200002 087F0005 ...... .......I.......I...G...I. 000000
02890008 0AC70203 00480004 0AF80203 031A000A 08380203 02270002 08B90005 ..¿...'...8.......«...K...ú...¿. 000020
01C80001 881F0200 3E89D88E FFFFB81E 00000000 00000000 005A0004 0A790203 ..y...Z..........|...Ã.>...|..ù. 000040
00000000 00000000 00000000 00000000 00000000 00000000 00000500 02000200 ................................ 000060
420A47C6 26F85EC4 FE568CFC 46890E46 8DFA568C F84689EC 46805657 000016C8 à...WV.Fš.F½.V*.F..F=.V±á^½&6G.B 000080
FFFC76FF 167FFF04 47C72602 57892607 89260857 89260647 89260856 88064688 .F..V.&.G.&.W.&..&.W.&úG.....v=. 0000A0
263F8B26 C02A1278 044FFF26 F85EC4F0 880CC483 00850206 9A53060A 76FF0C76 v..v..S......6..Þ6^½&.O.x.*6&.7& 0000C0
CBC95F5E C68806C4 83FFFF00 909A006A 53FA76FF 900FE805 88260247 8E2607FF ..&.G.&..Š...v*Sj.......6..6^_èù 0000E0
D1C888F9 F7000C89 9905122D C388FA46 89E42A08 478A2608 5EC45657 000008C8 à...WV6^.&.G.*ð.F*.û-...¿..¥*¯.à¹ 000100
0A4F8026 085EC40F 74400A47 F6260774 830A47F6 26F84689 110605E0 D1C103E0 Å.ê1Å....F½&-G..t.&-G.@t.6^.&.O. 000120
90E2EB00 000447C7 26200A4F 80260E74 010A47F6 26085EC4 90012BE9 FFFFB820  ¡..Õ+..6^.&-G..t.&.O. &úG...Šã. 000140
1220C388 4C750C0A 47F626FC 7689F088 04478926 C02BEF0A 67802602 0A4F8026 &.O..&.g.ÿ+ã&.G..Þ.v=&-G..uL.û-. 000160
810E7401 390A7E81 0775051E 087E8137 75011106 87F60608 6BF9F700 0C899905 ..¿..¥*kÃ.-....u7.-...u..-.9.t.. 000180
FF0A76FF 0C75C008 02C48301 AC101E9A FA76FF0F 75FFFF0A 7E811675 052A087E -.*.u..-...u..v*...¯..6..âu..v.. 0001A0
06D868F9 F7000C89 9905122D C3881575 080A47F6 26085EC4 04C4830C 51E80876 v.ÒQ..6.6^.&-G..u..û-...¿..¥*kÃ. 0001C0
57892607 89264008 57882606 47882606 77282637 8B26085E 8B677401 110687F6 -....tg.^.&.7&+w.&.G.&.W.@&..&.W 0001E0
```

Dump of file SATURN:[PCCOMMON.DUMP.DLL]SDFORM.TMP;1 on 18-APR-1990 10:52:44.38
File ID (918,23,0)   End of file block 46 / Allocated 48

Virtual block number 18 (00000012), 512 (0200) bytes

```
C48301CA 0E6E9AFA 76FF0677 FF265256 167EF60B 04478926 4802458B F87E8802 ..~½.E.H&.G..--.VR&.w..v*.n.ò..6 000000
C408C483 01ED0E30 9A53006A 006A026A 0F742017 1787F6FA 5E8B19EB FC468908 ..F=Š..^*-... t.j.j.j.S.0.Ú..6.6 000020
83005A0E 6E9AFA76 FF501606 46805600 01BE17EB 07882606 468A065F C426085E ^.&6_..F.&..Š.ƒ..V.F..P.v*.n.Z.. 000040
4310429A 000AB8EC 8855CBC9 5F5EE42A 06468AFE CCE90374 FC7639FC 468908C4 6..F=9v=t.Õä±.F.*ð^_èùU.š¡...B.C 000060
36A30856 88064688 1A521689 1A50A310 56880E46 881A621E 8C1A60A3 1A668801 .¡f.È'...b..F..V.ÈP¯...R..F..V.È6 000080
5E06C703 0BE90374 25F67E80 038DE900 001A5A06 C700001A 5C06C71A 3816891A ...8.ú.\...ú.Z...Õ...--%t.Õ..ú.^ 0000A0
1A4EA31A 34A31A3A A31A54A3 1A56A31A 3EA31A58 A31A3CA3 1A40A3C0 2800011A ...+âÈ@.È<.ÈX.È>.ÈV.ÈT.È:.È4.ÈN. 0000C0
260A5E88 903EEB00 301BC606 C70A46FF 49753001 7F80260A 5EC40020 1BC606C7 ú.6. .6^.&...0uI.F.ú.6.0.Š>..^.& 0000E0
FF1A7500 1A403E83 0E75203F 80269028 EB00001A 5406C71A 4006FF0D 752B3F80 .?+u...@.ú.T...Š(.&.? u..>@..u.. 000100
260A5E88 0A46FF1A 4E06FFC7 752D3F80 260A5EC4 00EB1A34 06FF9014 EB1A5406 .T.Š....4.Š.6^.&.?-uú..N..F..^.& 000120
08C48308 C7E80E1A 64681E0A 76FF0C76 FFDD75C0 0802C483 0978E80E 5098078A ...P.Òx..6..6uÏ.v..v..hd..Òú..6. 000140
0D74001A 4E3E831A 64A3D8F7 1A64A11A 4E06FF0C 7D001A64 3E830C56 890A4689 .F..V..>d..)...N.Àd.¥ÃÈd..>N..t. 000160
76FF060A 46FF1A56 06FF2D75 2E3F8026 0A5EC400 201BC606 C7067530 18C63E83 .>6.0u.ú.6. .6^.&.?.u-..V..F...v 000180
FF00011A 5E06C70A 7D001A5E 3E830C56 890A4689 08C48308 7BE80E1A 5E681E0A ..h^..Ò(..6..F..V..>^..).ú.^.... 0001A0
06C70675 006C3D2B 74006830 4074004E 303D7400 46309807 8A260A5E C41A560E .V.6^.&...=F.t==N.t@=h.t+=l.u.ú. 0001C0
1C75003F 80260A5E C40A46FF 03754C3F 80260A5E C4097500 1A3E3E83 00021A3E >....>>..u.6^.&.?Lu..F.6^.&.?.u. 0001E0
```

Dump of file SATURN:[PCCOMMON.DUMP.DLL]SDFORM.TMP;1 on 18-APR-1990 10:52:44.38
File ID (918,23,0) End of file block 46 / Allocated 48

Virtual block number 19 (00000013), 512 (0200) bytes

```
98078A26 C8EB0008 1A3E06C7 D0EB0010 1A3E06C7 D8EB0001 1A3E06C7 90024EE9 ÕN..ú.>...ŠÀú.>...ŠÀú.>...Šà&... 000000
00693DF8 468820F8 46831A3C 06FF0875 00583D05 7400473D 0A740045 3DF84689 .F½=E.t.=G.t.=X.u...<..F½ .F½=i. 000020
900159E9 0140E903 7500253D 0152E903 7E013FE9 03750063 3D0191E9 037E7874 tx~.Õ..=c.u.Õ?.~.ÕR.=X.u.Õa.ÕY.. 000040
1A501EC4 00EB0000 0247C726 0789261A 5AA11FC4 261A501E C4157502 1A3E3E83 .>>..u.á.P.&á.ÀZ.&..&úG...Š.á.P. 000060
E9037400 1A5A3E83 0170E903 75001A5C 3E83041A 50068307 89261A5A A11FC426 &á.ÀZ.&....P...>\..u.Õp..>Z..t.Õ 000080
00001A34 06C71A58 06FF01AC E9FFFFB8 01AFE903 75200A47 F6261A36 1EC401BD §.á.6.&-G. u.Õ€.¡..Õ¯...X.ú.4... 0000A0
1A5E06C7 1A5606FF 1A3C06FF 1A3A06FF F2EB086A 90C3EB02 C483019E E80E0A6A j..Ò...á.Šú.j.Š·..:...<...V.ú.^. 0000C0
741A6406 39FA4689 1A3EA3C0 2B7A7401 1A3E3E83 0081E903 75081A3E 3E830004 ...>>..u.Õ...>>..tz+âÈ>..F°9.d.t 0000E0
1A64A105 1A642E83 909013EB 00001A64 06C70A74 001A4E3E 83FA4689 1A64A128 (Àd..F°.>N..t.ú.d...Š.....d..Àd. 000100
02C48304 8DE80E3A 6A02C483 0130E80E 106A021A 5006831A 64A3C02B 027DC00B .à).+âÈd...P..j..Ò0..á.j:.Ò...á. 000120
EB1A64A3 C02B027D C00B1A64 A300052D FA468B15 74001A4E 3E832274 00FA7E83 .~°.t".>N..t..F°-..Èd..à).+âÈd.Š 000140
106AFF10 E9021A50 068302C4 8300F1E8 0E106A04 1A502E83 00001A64 06C79007 ..ú.d.....P..j..Òþ..á...P..Õ..j. 000160
E80E256A FF2AE903 49E80EF8 76FFF4EB 016A90FF 39E9026E E80E006A 90FF3FE9 Õ?..j..Òn.Õ9..j.Š¶.v½.ÒI.Õ*.jX.Ò 000180
88097400 1A3E3E83 DA7E0067 30057C00 653DFF0C E9037500 643D90FF 21E90428 (.ÕI..=d.u.Õ..=e.|.=g.~Õ.>>..t.. 0001A0
FE80E903 75006E3D 903AEBFE 5689FC46 89400C56 880A4688 0A4EFF0C 56880A46 F..V..N..F..V.a.F•.V±Š:.=n.u.Õ.± 0001C0
00783DFE 89E90375 0075308F 7400733D FEE0E903 7500703D FEE4E903 75006F3D =o.u.Õõ±=p.u.ÕÀ±=s.t.=u.u.Õ¿±=x. 0001E0
```

Dump of file SATURN:[PCCOMMON.DUMP.DLL]SDFORM.TMP;1 on 18-APR-1990 10:52:44.38
File ID (918,23,0) End of file block 46 / Allocated 48

Virtual block number 20 (00000014), 512 (0200) bytes

```
253C0474 C00AF646 88078A26 FC5EC4FC 46FF9034 EB0A46FF 90B1EBFF 79E90375 u.Õy.ŠÝ..F.Š4..F=á^=&...F-.ât.<% 000000
56890A46 89FE568B FC468B06 C483044C E80E0A76 FF0C76FF 500A462B C38BEC75 uš.ú+F.P.v..v..ÒL..á..F•.V±.F..V 000020
A1FE51E9 0374200A 47F6261A 361EC4FC 63E90374 C00AF646 88078A26 0A5EC40C .á^.&...F-.ât.Õc=á.6.&-G. t.ÕQ±À 000040
5806FF04 740A067E 8300201B C606C706 74001A56 3E835657 000012C8 CBC91A5A Z.èùà...WV.>V..t.ú.6. ..~..t...X 000060
FE5689FC 46890257 88260788 261A501E C4197510 1A3E3E83 0774021A 3E3E831A ..>>..t..>>..u.á.P.&..&.W..F•.V± 000080
0EEB0000 FE46C7FC 46890788 261A501E C4117400 1A583E83 902CEB04 1A500683 ..P..Š,..>X..t.á.P.&...F•úF±..Š. 0000A0
FE4608FC 46880E74 001A343E 83021A50 0683FE56 89FC4689 99078826 1A501EC4 á.P.&....F•.V±..P...>4..t..F•.F± 0000C0
75001A58 3E83F456 89F24689 1A62168B 1A60A11B C4A3C02B 9003E806 46880674 t..F.Š..+âÈá.À'...b..F·.V¶.>X..u 0000E0
83D8F7FE 5688FC46 882D07C6 26F246FF F25EC41D 750A067E 832B7D00 FE7E8331 1.~±.)+.~..u.á^·.F·&ó.-.F•.V±¼Ä. 000100
FA5E8CF8 46891A42 B80000F6 46C79006 EB0001F6 46C7FE56 89FC4689 DAF70002 •.¼Ö.F•.V±úF-..Š..úF-..¡8..F½.^° 000120
F876FFFA 76FF4574 001A563E 830AC483 06F31014 9AFC76FF FE76FF50 1E0676FF .v..P.v±.v=...µ..á..>V..tE.v°.v½ 000140
18C406C7 0675081B C43E8300 7EC90BF0 4E89C82B 1A5E0E8B 04C48302 0F0FFC9A .•....á...^.+à.NÞ.è-..>á..u.ú.á. 000160
88F04E89 F4468CF2 7E89F47F C00B49C1 88473005 C62605EB F27EC4F0 4E880000 ...NÞá-·Š.&ó.0G.èI.à.¶.-·.F¶.NÞ. 000180
F846FF46 202C8003 7C613C07 74C90804 88078A26 F85EC4F2 76C5EE5E 8C1A3C0E .<..^Ÿév·á^¥&.....èt.<a|.., F.F½ 0001A0
8308741A 5406081A 40A11475 001A583E 83EE5E8E F45E8CF2 7689E375 003F8026 &.?.uD.v·.^¶.^Ÿ.>X..u.Àa...T.t.. 0001C0
7E835657 000010C8 CBC95F5E 02C48302 FFE80E50 C02B02EB 0001B805 7500F67E ~-.u.¡..Š.+âP.Ò...á.^_èùà...WV.~ 0001E0
```

Dump of file SATURN:[PCCOMMON.DUMP.DLL]SDFORM.TMP;1 on 18-APR-1990 10:52:44.38
File ID (918,23,0) End of file block 46 / Allocated 48

Virtual block number 21 (00000015), 512 (0200) bytes

```
1A3E3E83 008FE902 1A500683 FA5689F8 46891A52 16881A50 A10001BE 18740006 ..t./..ÀP...R..F½.V°..P..Õ...>>. 000000
FC468907 8B261A50 1EC410EB FA5689F8 46890257 88260788 261A501E C4137408 .t.á.P.&..&.W..F½.V°Š.á.P.&...F• 000020
900AEB00 C0881575 FA4608F8 46880E74 081A3E3E 83041A50 0683FA5E 8CF84689 .F½.^°..P...>>..t..F½.F°u.¡á.Š.. 000040
563639F6 2BF45689 F24689FA 5688F846 8BFA5E8C F8468900 C7B80975 00FC7E83 .-•.u.¡ú..F½.^°.F½.V°.F·.V¶+-96V 000060
C44690ED EB107ECE 3B461574 003F8026 F246FFF2 5EC4900E EB1A5E0E 8B1C741A .t...^.Š..á^·.F·&.?.t.F;ö~.ŠÚ.Fá 000080
02C48301 59E80E57 0875001A 4E3E83FE 2B1A643E 8BF37500 3F8026F2 46FFF25E ^·.F·&.?.uµ.>d.+±.>N..u.W.ÒY..á. 0000A0
C95F5E02 C483013C E80E5708 74001A4E 3E8306C4 8301B3E8 0EF876FF FA76FF56 V.v°.v½.Ò°..á..>N..t.W.Ò<..á.^_è 0000C0
B0057547 067E8306 7467067E 83FE5689 FC46891A 5216881A 50A10000 06C890CB ù.à...ÀP...R..F•.V±.~.gt..~.Gu. 0000E0
1A5E3E83 007400FA 7E800006 1A5E06C7 0675001A 563E83FA 4688C02A 9003EB01 .Š..*â.F°.>V..u.ú.^....-°.t..>^. 000100
FFFE76FF 1A6036FF 1A6236FF 0676FF1A 5E36FF1A 3C36FF00 011A5E06 C7067500 .u.ú.^....6<..6^..v..6b..6'..v±. 000120
FF1A6236 FF147500 1A343E83 1B7400FA 7E800EC4 8304F21E FF261952 068EFC76 v•..R.&..·..á..-°.t..>4..u..6b.. 000140
6236FF14 75001A5E 3E831874 001A343E 8304C483 04F61EFF 26195206 8E1A6036 6'...R.&..-..á..>4..t..>^..u..6b 000160
081A40A1 00001BC4 06C7081A 50068304 C48304FE 1EFF2619 52068E1A 6036FF1A ..6'...R.&..±..á...P..ú.á...Àa.. 000180
02EB0001 B80574C0 0804C483 05021EFF 26195206 8EFC76FF FE76FF1B 741A5406 .T.t..v±.v=..R.&.....á..ât.¡..Š. 0001A0
1478044F FF261A36 1EC43C75 001A5C3E 83560000 00C890CB C90129E8 0E50C02B +âP.Ò).èù.à...V.>\..u<á.6.&.O.x. 0001C0
CB00909A 0676FF53 1A3836FF 10E8E42A 04882602 478E2607 FF263788 2606468A .F.&.7&..&.G.&..*õŠ..68.S.v....ù 0001E0
```

Dump of file SATURN:[PCCOMMON.DUMP.DLL]SDFORM.TMP;1 on 18-APR-1990 10:52:44.38
File ID (918,23,0)  End of file block 46 / Allocated 48

Virtual block number 22 (00000016), 512 (0200) bytes

```
1A5C3E83 56570000 02C890CB C95E1A5A 06FF9005 E81A5C06 FF077540 06C48309 ..á.au...\.S....Z.^èù.à...WV.>\. 000000
06C4830A 3300909A 1BC636FF 1A3636FF 1A3836FF 18E8507E F60B0676 8B577500 .uW.v..--PS..68..66..66....3..á. 000020
FF263F8B 261BC6A0 D478044F FF261A36 1EC41E7E C0084EC6 881A5C06 FF047540 au...\..6N.á~.á.6.&.O.xá.6.&.?&. 000040
02C8CBC9 5F5E1A5A 06010646 8B077500 1A5C3E83 D4EBE42A 05882602 478E2607 .&.G.&..*õSá.>\..u..F...Z.^ èùà. 000060
5098078A 26065EC4 1A3636FF 1A3836FF 22EB5E75 001A5C3E 830A768B 56570000 ..WV.v..>\..u^S".68..66.á^.Ë...P 000080
4FFF261A 361EC425 74C00B4E C68B0646 FF1A5C06 FF047540 06C4830A A500909A ...É..á.au...\..F..6N.ât%á.6.&.O 0000A0
3E83CAEB E42A0588 2602478E 2607FF26 3F8B261A 361EC407 8A26065E C4CD7804 .xëá^.&..á.6.&.?&..&.G.&..*õSò.> 0000C0
89F44689 1A621688 1A60A156 00000CC8 CBC95F5E 1A5A0601 0A468B07 75001A5C \..u..F...Z.^_èùà...VÀ'...b..F¶. 0000E0
2BF02BF8 468904C4 8306DE0F FC9AF476 FF521A64 368BFA46 89FC4689 C02BF656 V-+á.F=.F².6d.R.v¶.=.B..á..F½+Þ+ 000100
F45EC422 75001A4E 3E834E01 75081BC4 3E8308EB 02EE8305 75101BC4 3E830676 v..>á..u..Ý.S..>á..u.N.>N..u"á^¶ 000120
83F84EFF 02C483FE 71E80E50 98078A26 F446FF12 75301BC6 3E831975 2D3F8026 &.?-u..>ó.0u..F¶&...P.Òq±.á..N½. 000140
3E830066 E80EFA46 FF077400 067E831B 74001A4E 3E83077E F60B0874 301BC63E >ó.0t..--..>N..t..-..t..F².Òf..> 000160
7400067E 8302C483 FE7EE80E 56297500 1A4E3E83 0070E80E FC46FF07 74001BC4 á..t..F=.Òp..>N..u)V.Ò~±.á..-..t 000180
FFF876FF 0040E80E 047500FC 7E830A74 0018C43E 830039E8 0E047500 FA7E830A ..~².u..Ò9..>á..t..-=.u..Òa..v½. 0001A0
C483FE38 E80E5600 201BC606 C70E7400 1A4E3E83 06C483FE B5E80EF4 76FFF676 v-.v¶.Òç±.á..>N..t.ú.6. .V.Ò8±.á 0001C0
E80E306A CB02C483 FDD2E80E 50002088 03EB002B B8057400 1A403E83 CBC95E02 .^èù.>a..t.¡+.S.¡ .P.ÒØ».á.ùj0.Ò 0001E0
```

Dump of file SATURN:[PCCOMMON.DUMP.DLL]SDFORM.TMP;1 on 18-APR-1990 10:52:44.38
File ID (918,23,0)  End of file block 46 / Allocated 48

Virtual block number 23 (00000017), 512 (0200) bytes

```
FDAAE80E 500078B8 03EB0058 B8057400 1A3C3E83 1775101B C43E8302 C483FDC8 à».á..>á..u..><..t.¡X.S.¡x.P.Ò^» 000000
83378B26 1A501EC4 12752A3F 80260A5E C40001FE 46C75657 000006C8 CB02C483 .á.ùà...WVúF±..á^.&.?*u.á.P.&.7. 000020
0A5E8BF6 280A46FF FFFFFE46 C708752D 3F80260A 5EC49060 EB0A46FF 021A5006 .P...F.S'.á^.&.?-u.úF±...F.+-.^. 000040
FB8B0030 1BC606C7 0675303C 0A751A56 36393B7F 393C3F7C 303CFA46 88078A26 &...F²<0|?<9.;96V.u.<0u.ú.6.0..« 000060
3D802647 F18830E9 83C803E1 D1CE0302 E1C1CE8B 98058A26 1B7F393D 802606EB S.&.=9..&....öèÀ..öìÀ.à.ÒO.þG&.= 000080
CBC95F5E 0C568B0A 46883789 26065EC4 F08BEEF7 FE468B0C 468C0A7E 89DF7D30 0)Ò.-..F..F±¥Y.Þá^.&.7.F..V.^ èù 0000A0
00382611 74003080 264701EB FC7EC406 4EBAFE5E 8CFC4689 00CEB857 000004C8 à...W¡ö..F=.^±.N.á~=S.G&.=.t.Ï8. 0000C0
C48B50EC 8B5590CB C95FC028 FE468C FC 7E899009 EBFE468C FC7E8900 018BF475 u¶|...-=.F±S...-=.F±+â_èù.U.SP.á 0000E0
0386E800 21E80000 FFFF9A00 D4681E00 D6681E17 10A3E086 580000FF FF9A5016 .P.....X.ÁÈ...h=..hå.....Ò1.ÒÑ. 000100
BB1E000C 16FF00FF 680CC000 709A0C83 001C9A50 CB5DE58B 0001B809 8F11569A .V...¡...¦]ùP...°..p.á.h....É..É 000120
F3C8BBD1 8B04E0BE 31740030 80264701 75003080 267FFFB9 000D6068E FF330000 ..3...=.¿..&.=.u.G&.=.t1/Á...¦.ùµ 000140
AC9204E0 C00E7241 2CAC1717 8F1FF78B 071E061C EBE774AE F2C03308 74CA8BA6 ¦.Òt.3á.ÙtÒS.....¥.¢..¯,Ar.äÀ..¯ 000160
FF047400 04F03E83 0CC50D70 9A5000FC B8EC8B55 00C31FED EBAAC20A 0572412C ,Ar..ò¯SÙ.Ù.Ù.S¡=.P.p.é..>½..t.. 000180
BE06568B C08ED88E 012BB857 56EC8B55 CB5DE58B 00260D70 9A5000FF B804EE1E .Ÿ.¡..P.p.&..¦]ùU.SVW¡+..Ä ¦.V./ 0001A0
0002CA5D E58B5E5F 96EBEBF7 88AEF2FF FFB9C033 970C7496 401074C2 3BAD195C \.Ù;òt.a.t..3á¿...Ù.¥SS._^. '½.. 0001C0
C4885049 D1F7AEF2 FFFFB9C0 33FA8B92 1F74C00B 003A0040 9A0676FF 57EC8B55 U.SW.v..a.:..ät...*3á¿..¯Ù%¦¦P.á 0001E0
```

Dump of file SATURN:[PCCOMMON.DUMP.DLL]SDFORM.TMP;1 on 18-APR-1990 10:52:44.38
File ID (918,23,0)  End of file block 46 / Allocated 48

Virtual block number 24 (00000018), 512 (0200) bytes

```
46881928 06FF0000 04C80002 CA5DE58B 5F5B0000 FFFF9A50 1651521E 530002BB £..S.RQ.P.....[_.¦]ò..à.....(..F 000000
119A0200 68FE5E8C FC468911 0605E0D1 C103E0D1 C88BF9F7 000CB999 05122D04 .-...¿..¥².àìÁ.ÈìÁ....F=.^±h.... 000020
47C726FC 5EC4080A 4F802611 74D00B08 57892606 47892604 5EC402C4 830D7A13 .z..á.á^.&.G.&.W..Åt.&.O..á^=&ùG 000040
FC5EC408 57892606 47892640 FE5688FC 4688040A 4F802604 5EC49021 E8020002 ...S¦.á^.&.O...F=.V±a&.G.&.W.á^= 000060
C3C90000 0447C726 02578926 07892608 57882606 47882604 5EC40001 0247C726 &ùG...á^.&.G.&.W.&..&.W.&ùG...èù 000080
0A76FF53 CC8804EC 830478E9 046CE9C0 3300098A 08721715 1E3B065E 8BEC8B55 U.&.^.;...r.a..3âÒ¦.Òx..&..âS.v. 0000A0
8B5500CB 5DE588FD 1717A780 91E175C0 855A5900 00FFFF9A 51160C76 FF0876FF .v..v..Q.....YZ.âuÁ..I..».¦]ù.U. 0000C0
51C93353 12742017 1787F604 28E9C033 00098A08 7217151E 38065E8B 0CEC83EC S.&..^.;...r.a..3âÒ+.-... t.S3èQ 0000E0
C0330856 C50A468E FA5E8C66 74801717 87F60000 0E599A50 16F4468D 51414151 QAAQ.F¶.P.Y...-....tf.^².F.éV.3â 000100
DC8B02EC 833875AE F20AB049 E30C4E8B F86689F2 88FA8856 57FCFC46 89FE4689 .F±.F==WV.².·.f½.N.DI¯.·Ùu;.S..É 000120
009AE900 2BE8F4E2 AA1A74FB 3B0D740A 3CAC0C4E 880716FA 88048BE2 2B00808A a..+ã.â.²...N.¯<.t.;«t.¯â¶Ò+.Ò.. 000140
7AEB0093 E9FA5E8E 5F5EE1EB 0014E8E2 EBFC46FF 0AB0AA00 1FE80375 FB3B0DB0 ¯.;«u.Ò..¯..F=SâÒ..SÅ^_.^*Ò..Sz 000160
5016F446 8D51521E 53065E88 1FE3CA28 CF8B1F06 1E515350 00D11042 9AFFFC88 ¡=..B.¦.PSQ.....ù+ÒÐ..^.S.RQ.F¶.P 000180
C00B08C4 831FC3FA 88585859 1F07740B 08FE5E01 F45E8811 75C00B00 00009A9A ......âu..^¶.^±.Ùt..Y(X.*ù..á..â 0001A0
1787F6FE 5E8E26EB F900208A 03EB001C 8A087500 098A0001 30007400 603D1874 t.=m.t.=..a..u.a..S.a .*S&.^±-.. 0001C0
FC462BFE 468806EB F9C03300 1CBA0EEB F803751A 3F80085E 880A5E8E 0E744017 .at..^..^..?.u.½S.a..3á'S..F±+F= 0001E0
```

Dump of file SATURN:[PCCOMMON.DUMP.DLL]SDFORM.TMP;1 on 18-APR-1990 10:52:44.38
File ID (918,23,0)   End of file block 46 / Allocated 48

Virtual block number 25 (00000019), 512 (0200) bytes

```
0856C51E EEEBC188 0475C908 0C4E8803 0FE9CB5D E5880472 FA5E8E5F 5EF86688 .f½^_.^*r..[]ùÕ...N..èu..èSY.éV. 000000
00098A00 013D0074 00603D17 74C0081F 071E0000 0F319A50 16F4468D 51521E53 $.RQ.F¶.P.1.......ât.=m.t.=..¤.. 000020
1A3F8026 DA880A74 40171787 F68775C0 08F4468B C2EB0020 8AC7EB00 1CBACC75 uä¤..Šú¤ .Šô.F¶.âu⌐...ât..Ö&.?. 000040
88914901 F7AEF2FF FFB9C033 067EC4D7 8BEC8855 00A3EBC0 33001CBA A6EB0275 u.Š]¤..3äŠÈ.U.‡.»ó-.3â¿..ÚK]].. 000060
F60C7C00 F883117D 17151E38 065E8BEC 88550442 E900B357 56EC8855 00CB5DFA *]ù.U.ŠVW*.Õ8.U.‡.^.;...)..«.|.- 000080
05720510 1E380872 D82BDC8B 5A5900CB 5DE58BC0 3302EB00 01880574 40171787 ...@t.|..Š.3â.[]ù.YZ.É+Ãr.;...r. 0000A0
1717A780 D48B5200 028B050C 2EFF5152 FC5CE9C0 33057540 050CA1CB 5152E388 .DRQùÀ..@u.3âÕ\=RQ....£..R.â.Ï.. 0000C0
81067500 023D0774 00013040 81127558 C0080000 FFFF9A52 16501653 C48B5087 ñP.âS.P.R......âXu.Ý@=..t.=..u.Ý 0000E0
01AEE903 7319401E FFDB33C2 8C194406 C41EE319 420E8B5A D4794817 178F0808 .....Kyâz..B.D.á.D..ô3Ü..@.s.ÕÜ. 000100
880073E8 194CBF19 4CBE007C E8194CBF 194CBE19 401EFF00 03BBC28C 194806C4 á.H..ôÉ....@./L.«L.Ò|./L.«L.Òs.¡ 000120
51E81950 BF194CBE D88E0046 88C30000 FFFF9A10 E3680E01 6A0B7419 503D194C L.=P.t.j..hD......û|F..Ã/L.«P.Òo 000140
31E81950 BF194CBE 003AE818 C88F18C8 8EEC8855 000010DE 9A006A00 6A036A00 .j.j.j..8...U.Š/à.«à.Ò:./L.«P.Ò1 000160
9A500646 8A50C033 001AE819 508F1950 8E0023E8 19508F19 508EEC88 5503E800 .Š.U.Š/P.«P.Ò#./P.«P.Ò..3âP.F.P. 000180
F2740245 08058804 EF830E73 F738C319 401EFF00 028807E3 19420E88 0000FFFF ......8.D.£....@.û;%s..ÿ....E.t· 0001A0
89C02800 D6168800 F0E90375 00063639 FF28F628 56570000 14C800C3 EEEB1DFF ..ŠYù.à...WV+-+.96ø.u.Õþ...ø.+â. 0001C0
080AC483 11CA1424 9A04E068 1EF676FF F876FF0C 6AF85689 F64689F2 5689F046 Fþ.V·.F-.V½j..v½.v-.hÀ..$.ò..á.. 0001E0
```

Dump of file SATURN:[PCCOMMON.DUMP.DLL]SDFORM.TMP;1 on 18-APR-1990 10:52:44.38
File ID (918,23,0)   End of file block 46 / Allocated 48

Virtual block number 26 (0000001A), 512 (0200) bytes

```
FFF65EC4 0CE847EA 75003F80 26F646FF F65EC400 BCE90376 7FFFFE81 461974C0 ât.F.±..v.Õ¥.á^-.F-&.?.uõ ".á^-. 000000
8904C483 11D913CC 9A046A50 014580BA 75003F80 26F65E8B F475003F 8026F646 F-&.?.u¶.^-&.?.u¤.E.Pj..ä.  .á.. 000020
0BFC4688 6D74EE46 08EC468B FE5689FC 468902C4 83120F13 119A56EE 5689EC46 FŠ.VŸV......á..F•.V±.FŠ.FŸtm.F•. 000040
1614249A 04E0681E F076FFF2 76FF0C6A 191F1689 191DA3EE 5688EC46 886674C2 ôtf.FŠ.VŸÈ......j..v·.vþ.hÀ..$.. 000060
FFF05EC4 04EC4683 02578926 078926FE 5688FC46 8BEC5EC4 2C74C008 0AC4830F ..á..ât,á^Š.F•.V±&..&.W..FŠ.á^þ. 000080
F475003F 8026F046 FFF05EC4 E8EB0E74 C00A0788 26FC46FF FC5EC407 8A26F046 Fþ&..á^•.F•&...ât.ŠÒá^þ.Fþ&.?.u¶ 0000A0
09060005 18040203 02021601 FA58E900 028890C8 C95F5EA7 75003F80 26F05EC4 á^þ&.?.uÏ^_èù.|..ÕX*............ 0000C0
00530052 02430041 02350212 12110D10 120F1600 160C0808 070A0C09 0C080C07 ......................S.A.C.R.S. 0000E0
16080000 080702CE 08A40084 09820A81 0A801606 09721C70 206D006C 08590057 W.Y.l.m p.r...........È.ö.•..... 000100
1264BB17 13A3CB5D E58899FF FFB80008 E8CB5DE5 8899FFFF B8170C16 891713A3 È......|....[]ùÒ..|....[]ùÈ..Éd. 000120
76CA3C04 72BC3C43 0A76243C 0472133C F7E24343 1674073A 2E1B75E4 0A002489 ¿$..Õu..:.t.CCã%<.r.<$v.C<¥r.<ðv 000140
5DE58801 FE4F8026 0574C308 C08C065E C4EC8855 00C3170C A3980147 8A2E4301 .C..G..È..û.U.Šá^..â.ût.&.O±..[] 000160
1934A312 740025E8 08750019 343E831E 73FFF13D 06468857 5602EC83 EC8855CB ùU.Š.Š.VW.F.=þ.s..>4..u.Ò%.t.È4. 000180
CB5DE588 5E5F02C4 83118A15 169A0676 FF087500 78E80574 0018E815 750082E8 ò..u.Ò..t.Òx.u..v.......á._^.[]ù 0001A0
C29A5002 B0510E4F 8D50501E C033FE5E 89FEE383 43065E88 0776065E 3900F088 £þ.9^.v..^.C.D±.^±3â.PP.O.Q .P.ô 0001C0
FE5E8800 08A30A8E 0574D208 1938A319 361687C2 883874FF FA8308C4 83134516 .E..á..*.t8.ô..6.È8..øt..ÖÈ...^± 0001E0
```

Dump of file SATURN:[PCCOMMON.DUMP.DLL]SDFORM.TMP;1 on 18-APR-1990 10:52:44.38
File ID (918,23,0)   End of file block 46 / Allocated 48

Virtual block number 27 (0000001B), 512 (0200) bytes

```
06A30000 05000AA3 01478D00 02A30000 A3000A88 0C478948 480008A3 C033088E .Ã3âÈ..HH.G.|..È..È...G.È.....È. 000000
00000AC8 C3098EC1 8CD20801 9AE81938 1E8ED833 064E88C0 8ED88CC3 1FD88C00 ..Ã.û.Ã.á.N.3Ü..8.Ò...ø.ê.lûà... 000020
EB99C028 0674FFFF C2F7FA56 89F84689 13F917C0 9A0676FF 006A0876 FF006A56 Vj..v.j..v..á.*..F½.V*%ô..t.+â.Š 000040
9A50FE76 FF006A56 1274D008 FE5689FC 468902C4 83141213 119A56F8 7688902F /..v½V......á..F•.V±.Ât.Vj..v±P. 000060
8827E30E 4E881E56 57EC8855 90CBC95E FE5688FC 46889007 EB08C483 13711778 x.q..á.Š...F•.V±^èù.U.ŠWV..N.D'. 000080
0477FF45 3A26C933 FF448AA6 F30A76C5 FE8BCB03 D9F7AEF2 C033F788 067EC4D9 \á-..%3â·ÚK).ù.±év.µ[.D.3è&:E.w. 0000A0
071E570A 7EC51E08 56880646 880E4E88 00CB5DE5 885F5E1F C188D1F7 49490474 t.II%1.ê.^_.[]ù..N..F..V..é-.W.. 0000C0
C0080233 92F788DA F7000283 D8F7AA2D 800A79D2 080E750A F9831374 C00A93FC •..ât..*.u..øy.¯-¯%Ü.ø.%Ö.%.3ø.â 0000E0
880586AC 4F0588E2 75C308C2 88AA2704 0276393C 30040387 92F1F793 F1F70274 t.%þ.%þ..Æ.0<9v..'¯.ô.ûuã..0¯... 000100
8CFA4689 05128856 000006C8 00CB5DE5 885E5F1F 580A8CF2 72C73801 4480FF44 D..D.;úr·.ÕX._^.[]ù.à...V|...F*. 000120
46834601 744004C4 8313DE17 F49A5306 0E74830A 47F626FA 5EC41CEB F628FC5E ^=+-Š.á^*&-G.¯t..S.¶.8..á.@t.F.F 000140
4F800474 D80B065E 8BEC8855 90CBC95E C68BD876 FA463917 02168817 00A10CFA *.À......9F*vÃ.ó^èù.U.Š.^..Üt..0 000160
99C03305 750176E8 0005B807 1E297500 3F83192A 8B5756EC 8B55CB5D E58801FE ±..[]ùU.ŠVWE*..?.u)..|..Òv.u.3â. 000180
8C064E88 19303689 FFFEFE44 C704C683 000104C7 96192CA3 192AA3FE 244024EB Š$@Š±È*.È...û....ô.ûD±±..60..N.. 0001A0
88ADFC02 7788F273 EEF983FE E180FA74 4100D0E9 CB5DE588 5E5F0009 E8C08ED8 Ã.âÒ.._^.[]ùÕÃ.At*.Ã±.*Ys·.W.•Ü. 0001C0
88E6E8FE 4489F788 000205C2 03357401 A8ADF003 00881573 C1384843 7401A8FE ±´.tCH;ês..Ã.þÙ´.t5.ô....%.D±Š]. 0001E0
```

```
Dump of file SATURN:[PCCOMMON.DUMP.DLL]SDFORM.TMP;1 on 18-APR-1990 10:52:44.38
File ID (918,23,0)   End of file block 46 / Allocated 48

Virtual block number 28 (0000001C), 512 (0200) bytes

 26057401 3B10E4B9 DA8CC68B FE4CFEF9 0305EB05 8948C12B FE4C89F9 030C74FE ±t..ª.L±+êH..Š..ª±L±.6.Ö¿ð.;ît.& 000000
 3B48FE8B F27401A8 ADF003FE 8B2574FF FE300219 3C06C626 C3027F89 19381E8C ..8....ü&6.<..=±.t%.±.ÞÙ´.t·.±H; 000020
 8E0474C0 0B08478B E6EBFE44 89F78B00 0205C203 E27401A8 ADF003D0 8B8C73C1 ès¥.Å.ÞÙ˙.tã.õ....¼.D±Šl.G..àt.. 000040
 3306778B 8BEB378B 19341E8E 260574C7 3B15A98F D88C1274 193C0EFE 2615EBD8 ÄŠ.&±.<.t..Ä¢`.;út.&..4..7ŠE.w.3 000060
 8C98EB4E 4E960574 001DE8FE 4DFE0074 005FE898 40400124 0074C63B 006BE8C0 äÒk.;ót.$.@@.Ò_.t.±M±Ò..t..NNŠ.. 000080
 49C82B03 7401A8FE 458B51C3 99C03302 4789078B 1938A326 0474C13B 15FDB908 Ä¿».;êt.&ÈB....G.3â.üQ.E±´.t.+àl 0000A0
 C62BC223 D2F70072 C2031572 C603C18B F575EAD1 0476193A 1638267F FFBA4141 AA¤..&;.:.v.ïõu¼.ê.ór..ôr.¼Ø₩õ+ó 0000C0
 FE44C7F2 03F0BBFE 8B571874 001DE851 52C359C0 33E575EA D1D2F708 75000CE8 Ò..u.¼Øîõul3àYÜRQÒ..t.W.±.Þ.·ÚD± 0000E0
 9A1F0650 0001B850 52521ED2 335053C3 5A5958FE 55894AD7 2BD68B06 7789FFFE ±..w..ø+■J.U±XYZûSP3Ø.RRP|..P... 000100
 DEBF3875 000A7E83 065756EC 8B55C3D2 0B02745B 5A1FFFFA 8308C483 14E516C2 ō.|..ś..ª..Z[t..ØÜU.ŠVW..~..u8¢B 000120
 89024488 0074F73B 11744804 DE368B4C EB277200 57E80775 48064688 08568800 ..V..F.Hu.ÒW.r'ŠL.6B.Ht.;¼t..D.. 000140
 52C4885D 21EB99FF FFB80675 D20B0473 04DEFE81 04C68334 735E003E E8560E46 F.VÒ>.^s4.6..±B.s..Øu.¡...Š!P.6R 000160
 5E5F07C0 33D38B04 DE368902 5C891489 E675C085 F95B0000 FFFF9A50 C0335016 .P3àP.....[ª.àul...\..6B..Æ3à._^ 000180
 26721C03 DA8B2CEB F9F27504 DEFE8104 C6830C74 024C39F7 8B0E4E8B CB5DE58B .Ì]ù.N..¼9L.t..6..±B.u·ªŠ,.Ö..r& 0001A0
 D8168904 75F73BDE 75C08500 00FFFF9A 51531373 00D81E39 0675F73B C18ED38B .Æ.ê;¼u.9.Ä.s.SQ......âuB;¼u...Ä 0001C0
 D3230B1B D12B0C74 DAF7D78B 067EC457 38E30C4E 8BEC8B55 00C3D18B 04879200 .....ïü.U.š.N.D8Wá~..■¼Öt.+ì.Ü₩Æ 0001E0

Dump of file SATURN:[PCCOMMON.DUMP.DLL]SDFORM.TMP;1 on 18-APR-1990 10:52:44.38
File ID (918,23,0)   End of file block 46 / Allocated 48

Virtual block number 29 (0000001D), 512 (0200) bytes

 D1C38EFF FFC381C3 8C10E3D1 87AAF3C9 13ABF3E9 D1E08A0A 468BD12B D187D103 .Ì.Ì+Ì.F..ÄìÕµ¨.èµ˙.ÌD..û.û...ûÌ 000000
 0B750A5E 8BD80B0C 5E8B0846 8BEC8B55 CB5D0856 8B06468B 5FAAF3C9 13ABF3E9 Õµ¨.èµ˙_.F..V.]ùU.$.F..^..Ä.^.u. 000020
 E58BD103 E3F70646 8BC8030C 66F70646 8BC8BBE3 F70008CA 5DE58BE3 F706468B .F.¼D.[Ĵò..¼D.à.F.¼f..à.F.¼D.ì.Ì 000040
 8B157508 0A47F626 5575023C 03240A47 8A26065E C4F62B56 000004C8 0008CA5D ]ò..à...V+-6^.&.G.$.<.uU&-G..u.. 000060
 46890647 2B26078B 26065E8B 39740111 0687F606 D868F9F7 000CB999 051220C3 Ù-...¿..¼ªkÅ.-....t9.^.&..&+G..F 000080
 FC463B08 C4831682 0E6E9A50 E42A0847 8A260677 FF260877 FF265028 7EC00BFC •.á-(P&.w.&.w.&.G.*ôP.n.ÿ..6.;F• 0000A0
 26025789 26078926 08578826 06478826 065EC4FF FFBE200A 4F802606 5EC40B74 t.6^.&.O. ƒ..6^.&.G.&.W.&..&.W.& 0000C0
 10F80103 00050002 11300103 00000004 18480002 000CCBC9 5EC68800 000447C7 úG....ó^èù....H.......O.......½. 0000E0
 17AB0105 00260002 17610103 00220002 17160103 00000006 16320002 00070002 ......2...........ª...a...&...¨. 000100
 0CA60103 00400002 107A0103 0400000B 0FBA0203 003A0002 0E9A0103 00880002 ..........:...¤.......z...M...Ì. 000120
 54206E75 5220534D 00000000 00000000 00000000 005C0002 0C930103 00580002 ..[.......\.............MS Run-T 000140
 38383931 20296328 20746867 69727970 6F43202D 20797261 7262694C 20656D69 ime Library - Copyright (c) 1988 000160
 00000129 01280127 01260124 00480011 70726F43 2074666F 736F7263 694D202C , Microsoft Corp..K.$.&.'.(.)... 000180
 00480000 00000000 00000000 03970396 03950394 0392004B 00000000 00000000 ........K......................K. 0001A0
 69747365 44206563 72756F53 00000000 00000000 00000151 0150014F 014E014C L.N.O.P.Q...........Source Desti 0001C0
 60616E20 44532074 65530065 70797420 44532065 676E6168 43006E6F 6974616E nation.Change SD type.Set SD nam 0001E0

Dump of file SATURN:[PCCOMMON.DUMP.DLL]SDFORM.TMP;1 on 18-APR-1990 10:52:44.38
File ID (918,23,0)   End of file block 46 / Allocated 48

Virtual block number 30 (0000001E), 512 (0200) bytes

 20280029 6C6C756E 2800296C 6C756E28 00006C6D 4420606F 72662064 25203A65 e: %d from Dml..(null).(null).+- 000000
 00000000 00000000 00000000 00001952 18D01113 18D01800 00000000 00002320 #......Å.Å...Å.R............... 000020
 00000000 00000000 00000000 00000000 00000000 00000000 00000000 00000000 ................................ 000040
 00000000 00000000 00000000 00000000 00000000 00000000 00000000 00000000 ................................ 000060
 00000000 00000000 00000000 00000000 00000000 00000000 00000000 00000000 ................................ 000080
 00000000 00000000 00000000 00000000 00000000 00000000 00000000 00000000 ................................ 0000A0
 00000000 00000000 00000000 00000000 00000000 00000000 00000000 00000000 ................................ 0000C0
 00000000 00000000 00000000 00000000 00000000 00000000 00000000 00000000 ................................ 0000E0
 00000000 00000000 00000000 00000000 00000000 00000000 00000000 00000000 ................................ 000100
 00000000 00000000 00000000 00000000 00000000 00000000 00000000 00000000 ................................ 000120
 00000000 00000000 00000000 00000000 00000000 00000000 00000000 00000000 ................................ 000140
 00000000 00000000 00000000 00000000 00000000 00000000 00000000 00000000 ................................ 000160
 00000000 00000000 00000000 00000000 00000000 00000000 00000000 00000000 ................................ 000180
 00000000 00000000 00000000 00000000 00000000 00000000 00000000 00000000 ................................ 0001A0
 00000000 00000000 00000000 00000000 00000000 00000000 00000000 00000000 ................................ 0001C0
 00000000 00000000 00000000 00000000 00000000 00000000 00000000 00000000 ................................ 0001E0
```

```
Dump of file SATURN:[PCCOMMON.DUMP.DLL]SDFORM.TMP;1 on 18-APR-1990 10:52:44.38
File ID (918,23,0)   End of file block 46 / Allocated 48

Virtual block number 31 (0000001F), 512 (0200) bytes

 00000000 00000000 00000000 00000000 00000000 00000000 00000000 00000000 ................................ 000000
 00000000 00000000 00000000 00000000 00000000 00000000 00000000 00000000 ................................ 000020
 00000000 00000000 00000000 00000000 00000000 00000000 00000000 00000000 ................................ 000040
 00000000 00000000 00000000 00000000 00000000 00000000 00000000 00000000 ................................ 000060
 00000000 00000000 00000000 00000000 00000000 00000000 00000000 00000000 ................................ 000080
 00000000 00000000 00000000 00000000 00000000 00000000 00000000 00000000 ................................ 0000A0
 00000000 00000000 00000000 00000000 00000000 00000000 00000000 00000000 ................................ 0000C0
 00000000 00000000 00000000 00000000 00000000 00000000 00000000 00000000 ................................ 0000E0
 00000000 00000000 00000000 00000000 00000000 00000000 00000000 00000000 ................................ 000100
 00000000 00000000 00000000 00000000 00000000 00000000 00000000 00000000 ................................ 000120
 00000000 00000000 00000000 00000000 00000000 00000000 00000000 00000000 ................................ 000140
 00000000 00000000 00000000 00000000 00000000 00000000 00000000 00000000 ................................ 000160
 00000000 00000000 00000000 00000000 00000000 00000000 00000000 00000000 ................................ 000180
 00000000 00000000 00000000 00000000 00000000 00000000 00000000 00000000 ................................ 0001A0
 00000000 00000000 00000000 00000000 00000000 00000000 00000000 00000000 ................................ 0001C0
 00000000 00000000 00000000 00000000 00000000 00000000 00000000 00000000 ................................ 0001E0

Dump of file SATURN:[PCCOMMON.DUMP.DLL]SDFORM.TMP;1 on 18-APR-1990 10:52:44.38
File ID (918,23,0)   End of file block 46 / Allocated 48

Virtual block number 32 (00000020), 512 (0200) bytes

 00000000 00000000 00000000 00000000 00000000 00000000 00000000 00000000 ................................ 000000
 00000030 4F464E49 5F454C49 465F435F 000E0000 00000000 00000000 00000000 ..............8._C_FILE_INFO=... 000020
 FFFFFFFF 01010000 00000500 125E04FC 125E04F8 125E04F4 125EFFFF 125E0000 ..^...^.¶.^.%.^.=.^............. 000040
 00000000 00000102 00000000 00000000 00000001 19500000 0000051A 00000200 ..........P..................... 000060
 00000000 00000000 00000000 00000000 00000000 00000000 00000202 00000000 ................................ 000080
 00000000 00000000 00000000 00000000 00000000 00000000 00000000 00000000 ................................ 0000A0
 00000000 00000000 00000000 00000000 00000000 00000000 00000000 00000000 ................................ 0000C0
 00000000 00000000 00000000 00000000 00000000 00000000 00000000 00000000 ................................ 0000E0
 00000000 00000000 00000000 00000000 00000000 00000000 00000000 00000000 ................................ 000100
 00000000 00000000 00000000 00000000 00000000 00000000 00000000 00000000 ................................ 000120
 00000000 00000000 00000000 00000000 00000000 00000000 00000000 00000000 ................................ 000140
 00000000 00000000 00000000 00000000 00000000 00000000 00000000 00000000 ................................ 000160
 00000000 00000000 00000000 00000000 00000000 00000000 00000000 00000000 ................................ 000180
 00000000 00000000 00000000 00000000 00000000 00000000 00000000 00000000 ................................ 0001A0
 00000000 00000000 00000000 00000000 00000000 00000000 00000000 00000000 ................................ 0001C0
 00000000 00000000 00000000 00000000 00000000 00000000 00000000 00000000 ................................ 0001E0

Dump of file SATURN:[PCCOMMON.DUMP.DLL]SDFORM.TMP;1 on 18-APR-1990 10:52:44.38
File ID (918,23,0)   End of file block 46 / Allocated 48

Virtual block number 33 (00000021), 512 (0200) bytes

 00000000 00000000 00000000 00000000 00000000 00000000 00000000 00000000 ................................ 000000
 00000000 00000000 00000000 00000000 00000000 00000000 00000000 00000000 ................................ 000020
 00000000 00000000 00000000 00000000 00000000 00000000 00000000 00000000 ................................ 000040
 00000000 00000000 00000000 00000000 00000000 00000000 00000000 00000000 ................................ 000060
 00000000 00000000 00000000 00000000 00000000 00000000 00000000 00000000 ................................ 000080
 00000000 00000000 00000000 00000000 00000000 00000000 00000000 00000000 ................................ 0000A0
 00000000 00000000 00000000 00000000 00000000 00000000 00000000 00000000 ................................ 0000C0
 00000000 00000000 00000000 00000000 00000000 00000000 00000000 00000000 ................................ 0000E0
 00000000 00000000 00000000 00000000 00000000 00000000 00000000 00000000 ................................ 000100
 00000000 00000000 00000000 00000000 00000000 00000000 00000000 00000000 ................................ 000120
 00000000 00000000 00000000 00000000 00000000 00000000 00000000 00000000 ................................ 000140
 00000000 00000000 00000000 00000000 00000000 00000000 00000000 00000000 ................................ 000160
 00000000 00000000 00000000 00000000 00000000 00000000 00000000 00000000 ................................ 000180
 00000000 00000000 00000000 00000000 00000000 00000000 00000000 00000000 ................................ 0001A0
 00000000 00000000 00000000 00000000 00000000 00000000 00000000 00000000 ................................ 0001C0
 00000000 00000000 00000000 00000000 00000000 00000000 00000000 00000000 ................................ 0001E0
```

```
Dump of file SATURN:[PCCOMMON.DUMP.DLL]SDFORM.TMP;1 on 18-APR-1990 10:52:44.38
File ID (918,23,0)   End of file block 46 / Allocated 48

Virtual block number 34 (00000022), 512 (0200) bytes

 00000000 00000000 00000000 00000000 00000000 00000000 00000000 00000000 ................................ 000000
 00000000 00000000 00000000 00000000 00000000 00000000 00000000 00000000 ................................ 000020
 00000000 00000000 00000000 00000000 00000000 00000000 00000000 00000000 ................................ 000040
 00000000 00000000 00000000 00000000 00000000 00000000 00000000 00000000 ................................ 000060
 00000000 00000000 00000000 00000000 00000000 00000000 00000000 00000000 ................................ 000080
 00000000 00000000 00000000 00000000 00000000 00000000 00000000 00000000 ................................ 0000A0
 00000000 00000000 00000000 00000000 00000000 00000000 00000000 00000000 ................................ 0000C0
 00000000 00000000 00000000 00000000 00000000 00000000 00000000 00000000 ................................ 0000E0
 00000000 00000000 00000000 00000000 00000000 00000000 00000000 00000000 ................................ 000100
 00000000 00000000 00000000 00000000 00000000 00000000 00000000 00000000 ................................ 000120
 00000000 00000000 00000000 00000000 00000000 00000000 00000000 00000000 ................................ 000140
 00000000 00000000 00000000 00000000 00000000 00000000 00000000 00000000 ................................ 000160
 00000000 00000000 00000000 00000000 00000000 00000000 00000000 00000000 ................................ 000180
 00000000 00000000 00000000 00000000 00000000 00000000 00000000 00000000 ................................ 0001A0
 00000000 00000000 00000000 00000000 00000000 00000000 00000000 00000000 ................................ 0001C0
 00000000 00000000 00000000 00000000 00000000 00000000 00000000 00000000 ................................ 0001E0

Dump of file SATURN:[PCCOMMON.DUMP.DLL]SDFORM.TMP;1 on 18-APR-1990 10:52:44.38
File ID (918,23,0)   End of file block 46 / Allocated 48

Virtual block number 35 (00000023), 512 (0200) bytes

 00000000 00000000 00000000 00000000 00000000 00000000 00000000 00000000 ................................ 000000
 00000000 00000000 00000000 00000000 00000000 00000000 00000000 00000000 ................................ 000020
 00000000 00000000 00000000 00000000 00000000 00000000 00000000 00000000 ................................ 000040
 00000000 00000000 00000000 00000000 00000000 00000000 00000000 00000000 ................................ 000060
 00000000 00000000 00000000 00000000 00000000 00000000 00000000 00000000 ................................ 000080
 00000000 00000000 00000000 00000000 00000000 00000000 00000000 00000000 ................................ 0000A0
 00000000 00000000 00000000 00000000 00000000 00000000 00000000 00000000 ................................ 0000C0
 00000000 00000000 00000000 00000000 00000000 00000000 00000000 00000000 ................................ 0000E0
 00000000 00000000 00000000 00000000 00000000 00000000 00000000 00000000 ................................ 000100
 00000000 00000000 00000000 00000000 00000000 00000000 00000000 00000000 ................................ 000120
 00000000 00000000 00000000 00000000 00000000 00000000 00000000 00000000 ................................ 000140
 00000000 00000000 00000000 00000000 00000000 00000000 00000000 00000000 ................................ 000160
 00000000 00000000 00000000 00000000 00000000 00000000 00000000 00000000 ................................ 000180
 00000000 00000000 00000000 00000000 00000000 00000000 00000000 00000000 ................................ 0001A0
 00000000 00000000 00000000 00000000 00000000 00000000 00000000 00000000 ................................ 0001C0
 00000000 00000000 00000000 00000000 00000000 00000000 00000000 00000000 ................................ 0001E0

Dump of file SATURN:[PCCOMMON.DUMP.DLL]SDFORM.TMP;1 on 18-APR-1990 10:52:44.38
File ID (918,23,0)   End of file block 46 / Allocated 48

Virtual block number 36 (00000024), 512 (0200) bytes

 00000000 00000000 00000000 00000000 00000000 00000000 00000000 00000000 ................................ 000000
 00000000 00000000 00000000 00000000 00000000 00000000 00000000 00000000 ................................ 000020
 00000000 00000000 00000000 00000000 00000000 00000000 00000000 00000000 ................................ 000040
 00000000 00000000 00000000 00000000 00000000 00000000 00000000 00000000 ................................ 000060
 00000000 00000000 00000000 00000000 00000000 00000000 00000000 00000000 ................................ 000080
 00000000 00000000 00000000 00000000 00000000 00000000 00000000 00000000 ................................ 0000A0
 00000000 00000000 00000000 00000000 00000000 00000000 00000000 00000000 ................................ 0000C0
 00000000 00000000 00000000 00000000 00000000 00000000 00000000 00000000 ................................ 0000E0
 00000000 00000000 00000000 00000000 00000000 00000000 00000000 00000000 ................................ 000100
 00000000 00000000 00000000 00000000 00000000 00000000 00000000 00000000 ................................ 000120
 00000000 00000000 00000000 00000000 00000000 00000000 00000000 00000000 ................................ 000140
 00000000 00000000 00000000 00000000 00000000 00000000 00000000 00000000 ................................ 000160
 00000000 00000000 00000000 00000000 00000000 00000000 00000000 00000000 ................................ 000180
 00000000 00000000 00000000 00000000 00000000 00000000 00000000 00000000 ................................ 0001A0
 00000000 00000000 00000000 00000000 00000000 00000000 00000000 00000000 ................................ 0001C0
 00000000 00000000 00000000 00000000 00000000 00000000 00000000 00000000 ................................ 0001E0
```

```
Dump of file SATURN:[PCCOMMON.DUMP.DLL]SDFORM.TMP;1 on 18-APR-1990 10:52:44.38
File ID (918,23,0)   End of file block 46 / Allocated 48

Virtual block number 37 (00000025), 512 (0200) bytes

00000000 00000000 00000000 00000000 00000000 00000000 00000000 00000000 ................................ 000000
00000000 00000000 00000000 00000000 00000000 00000000 00000000 00000000 ................................ 000020
00000000 00000000 00000000 00000000 00000000 00000000 00000000 00000000 ................................ 000040
00000000 00000000 00000000 00000000 00000000 00000000 00000000 00000000 ................................ 000060
00000000 00000000 00000000 00000000 00000000 00000000 00000000 00000000 ................................ 000080
00000000 00000000 00000000 00000000 00000000 00000000 00000000 00000000 ................................ 0000A0
00000000 00000000 00000000 00000000 00000000 00000000 00000000 00000000 ................................ 0000C0
00000000 00000000 00000000 00000000 00000000 00000000 00000000 00000000 ................................ 0000E0
00000000 00000000 00000000 00000000 00000000 00000000 00000000 00000000 ................................ 000100
00000000 00000000 00000000 00000000 00000000 00000000 00000000 00000000 ................................ 000120
00000000 00000000 00000000 00000000 00000000 00000000 00000000 00000000 ................................ 000140
00000000 00000000 00000000 00000000 00000000 00000000 00000000 00000000 ................................ 000160
00000000 00000000 00000000 00000000 00000000 00000000 00000000 00000000 ................................ 000180
00000000 00000000 00000000 00000000 00000000 00000000 00000000 00000000 ................................ 0001A0
00000000 00000000 00000000 00000000 00000000 00000000 00000000 00000000 ................................ 0001C0
00000000 00000000 00000000 00000000 00000000 00000000 00000000 00000000 ................................ 0001E0

Dump of file SATURN:[PCCOMMON.DUMP.DLL]SDFORM.TMP;1 on 18-APR-1990 10:52:44.38
File ID (918,23,0)   End of file block 46 / Allocated 48

Virtual block number 38 (00000026), 512 (0200) bytes

00000000 00000000 00000000 00000000 00000000 00000000 00000000 00000000 ................................ 000000
00000000 00000000 00000000 00000000 00000000 00000000 00000000 00000000 ................................ 000020
00000000 00000200 00010000 00000000 00000000 00000000 00000000 00000000 ................................ 000040
00000000 00000000 00000000 00000000 00000000 00000000 00000000 00000000 ................................ 000060
00000000 00000000 00000000 00000000 00000000 00000000 00000000 00000000 ................................ 000080
00000000 00000000 00000000 00000000 00000000 00000000 00000000 00000000 ................................ 0000A0
00000000 00000000 00000000 00000000 00000000 00000000 00000000 00000000 ................................ 0000C0
00000000 00000000 00000000 00000000 00000000 00000000 00000000 00000000 ................................ 0000E0
00000000 00000000 00000000 00000000 00000000 00000000 00000000 00000000 ................................ 000100
00000000 00000000 00000000 00000000 00000000 00000000 00000000 00000000 ................................ 000120
00000000 00000000 00000000 00000000 00000000 00000000 00000000 00000000 ................................ 000140
00000000 00000000 00000000 00000000 00000000 00000000 00000000 00000000 ................................ 000160
00000000 00000000 00000000 00000000 00000000 00000000 00000000 00000000 ................................ 000180
00000000 00000000 00000000 00000000 00000000 00000000 00000000 00000000 ................................ 0001A0
00000000 00000000 00000000 00000000 00000000 00000000 00000000 00000000 ................................ 0001C0
00000000 00000000 00000000 00000000 00000000 00000000 00000000 00000000 ................................ 0001E0

Dump of file SATURN:[PCCOMMON.DUMP.DLL]SDFORM.TMP;1 on 18-APR-1990 10:52:44.38
File ID (918,23,0)   End of file block 46 / Allocated 48

Virtual block number 39 (00000027), 512 (0200) bytes

00000000 00000000 00000000 00000000 00000000 00000000 00000000 00000000 ................................ 000000
00000000 00000000 00000000 00000000 00000000 00000000 00000000 00000000 ................................ 000020
00000000 00000000 00000000 00000000 00000000 00000000 00000000 00000000 ................................ 000040
00000000 00000000 00000000 00000000 00000000 00000000 00000000 00000000 ................................ 000060
00000000 00000000 00000000 00000000 00000000 00000000 00000000 00000000 ................................ 000080
00000000 00000000 00000000 00000000 00000000 00000000 00000000 00000000 ................................ 0000A0
00000000 00000000 00000000 00000000 00000000 00000000 00000000 00000000 ................................ 0000C0
00000000 00000000 00000000 00000000 00000000 00000000 00000000 00000000 ................................ 0000E0
00000000 00000000 00000000 00000000 00000000 00000000 00000000 00000000 ................................ 000100
00000000 00000000 00000000 00000000 00000000 00000000 00000000 00000000 ................................ 000120
00000000 00000000 00000000 00000000 00000000 00000000 00000000 00000000 ................................ 000140
00000000 00000000 00000000 00000000 00000000 00000000 00000000 00000000 ................................ 000160
00000000 00000000 00000000 00000000 00000000 00000000 00000000 00000000 ................................ 000180
00000000 00000000 00000000 00000000 00000000 00000000 00000000 00000000 ................................ 0001A0
00000000 00000000 00000000 00000000 00000000 00000000 00000000 00000000 ................................ 0001C0
00000000 00000000 00000000 00000000 00000000 00000000 00000000 00000000 ................................ 0001E0
```

```
Dump of file SATURN:[PCCOMMON.DUMP.DLL]SDFORM.TMP;1 on 18-APR-1990 10:52:44.38
File ID (918,23,0)   End of file block 46 / Allocated 48

Virtual block number 40 (00000028), 512 (0200) bytes

00000000 00000000 00000000 00000000 00000000 00000000 00000000 00000000 ................................ 000000
00000000 00000000 00000000 00000000 00000000 00000000 00000000 00000000 ................................ 000020
00000000 00000000 00000000 00000000 00000000 00000000 00000000 00000000 ................................ 000040
00000000 00000000 00000000 00000000 00000000 00000000 00000000 00000000 ................................ 000060
00000000 00000000 00000000 00000000 00000000 00000000 00000000 00000000 ................................ 000080
00000000 00000000 00000000 00000000 00000000 00000000 00000000 00000000 ................................ 0000A0
00000000 00000000 00000000 00000000 00000000 00000000 00000000 00000000 ................................ 0000C0
00000000 00000000 00000000 00000000 00000000 00000000 00000000 00000000 ................................ 0000E0
00000000 00000000 00000000 00000000 00000000 00000000 00000000 00000000 ................................ 000100
00000000 00000000 00000000 00000000 00000000 00000000 00000000 00000000 ............................ .... 000120
00000000 00000000 00000000 00000000 00000000 00000000 00000000 00000000 ............................. ... 000140
00000000 00000000 00000000 00000000 00000000 00000000 00000000 00000000 ................................ 000160
00000000 00000000 00000000 00000000 00000000 00000000 00000000 00000000 ................................ 000180
00000000 00000000 00000000 00000000 00000000 00000000 00000000 00000000 ................................ 0001A0
00000000 00000000 00000000 00000000 00000000 00000000 00000000 00000000 ................................ 0001C0
00000000 00000000 00000000 00000000 00000000 00000000 00000000 00000000 ................................ 0001E0

Dump of file SATURN:[PCCOMMON.DUMP.DLL]SDFORM.TMP;1 on 18-APR-1990 10:52:44.38
File ID (918,23,0)   End of file block 46 / Allocated 48

Virtual block number 41 (00000029), 512 (0200) bytes

00000000 00000000 00000000 00000000 00000000 00000000 00000000 00000000 ................................ 000000
00000000 00000000 00000000 00000000 00000000 00000000 00000000 00000000 ................................ 000020
00000000 00000000 00000000 00E010FA 00000000 00000000 00000000 00000000 ...............•.Á.............. 000040
00000000 00000000 00000000 00000000 00000000 00008181 81010000 00010000 ................................ 000060
00000000 00000000 00000000 00000000 00000000 00000000 00000000 00000000 ................................ 000080
00000000 00000000 00000000 00000000 00000000 00000000 00000000 00000000 ................................ 0000A0
00000000 00000000 00000000 00000000 00000000 00000000 00000000 00000000 ................................ 0000C0
00000000 00000000 00000000 00000000 00000000 00000000 00000000 00000000 ................................ 0000E0
00000000 00000000 00000000 00000000 00000000 00000000 00000000 00000000 ................................ 000100
00000000 00000000 00000000 00000000 00000000 00000000 00000000 00000000 ................................ 000120
00000000 00000000 00000000 00000000 00000000 00000000 00000000 00000000 ................................ 000140
0A0A0A0A 0A0A0A0A 0A0A0A0A 0A0A0A0A 0A0A0A0A 0A0A0A0A 0A000000 00000000 ................................ 000160
0A0A0A0A 0A0A0A0A 0A0A0A0A 0A0A0A0A 0A0A0A0A 0A0A0A0A 0A0A0A0A 0A0A0A0A ................................ 000180
0A0A0A0A 0A0A0A0A 0A0A0A0A 0A0A0A0A 0A0A0A0A 0A0A0A0A 0A0A0A0A 0A0A0A0A ................................ 0001A0
0A0A0A0A 0A0A0A0A 0A0A0A0A 0A0A0A0A 0A0A0A0A 0A0A0A0A 0A0A0A0A 0A0A0A0A ................................ 0001C0
0A0A0A0A 0A0A0A0A 0A0A0A0A 0A0A0A0A 0A0A0A0A 0A0A0A0A 0A0A0A0A 0A0A0A0A ................................ 0001E0

Dump of file SATURN:[PCCOMMON.DUMP.DLL]SDFORM.TMP;1 on 18-APR-1990 10:52:44.38
File ID (918,23,0)   End of file block 46 / Allocated 48

Virtual block number 42 (0000002A), 512 (0200) bytes

0A0A0A0A 0A0A0A0A 0A0A0A0A 0A0A0A0A 0A0A0A0A 0A0A0A0A 0A0A0A0A 0A0A0A0A ................................ 000000
0A0A0A0A 0A0A0A0A 0A0A0A0A 0A0A0A0A 0A0A0A0A 0A0A0A0A 0A0A0A0A 0A0A0A0A ................................ 000020
0A0A0A0A 0A0A0A0A 0A0A0A0A 0A0A0A0A 0A0A0A0A 0A0A0A0A 0A0A0A0A 0A0A0A0A ................................ 000040
00000000 00000000 00000000 00000000 00000000 00000000 000A0A0A 0A0A0A0A ................................ 000060
050414C4 00000000 00000000 00000000 00000000 20000000 00000000 00000000 ........... ...............6... 000080
65766F20 6B636174 73202D0A 00303030 36520000 3E3E4753 4D4E3C3C FFFFFFFF ....<<NMSG>>..R6000..- stack ove 0000A0
64697669 64207265 6765746E 69202D0A 00333030 36520003 000A0077 6F6C6672 rflow.....R6003..- integer divid 0000C0
73206867 756F6E65 20746F6E 202D0A00 38303036 52000800 0A003020 79622065 e by 0.....R6008..- not enough s 0000E0
202D0A00 39303036 52000900 0A007374 6E656D75 67726120 726F6620 65636170 pace for arguments.....R6009..-  000100
746E656D 6E6F7269 766E6520 726F6620 65636170 73206867 756F6E65 20746F6E not enough space for environment 000120
30303652 00020020 726F7272 6520656D 6974206E 757200FF 000A0D00 FC000A00 ...•......run-time error ...R600 000140
0A006465 64616F6C 20746F6E 20746E69 6F702067 6E697461 6F6C6620 2D0A0D32 2..- floating point not loaded.. 000160
00000000 00061702 00020000 00050514 00020000 0004194E 00020003 FFFFFF00 ........N....................... 000180
00B89400 009005EA 00000001 00000031 00000000 FFFF0001 000E0352 0000072E ....R...........1.......õ.....£. 0001A0
02640005 80010001 05EF0005 00050000 00000000 05EBFFFF 01000287 00FAFFA7 Ï.•.......Š...........ÿ.......d. 0001C0
00EC0258 00078002 000805F5 00000006 00000000 0000FFFF FFFF0104 00080060 `...................X.......X.š. 0001E0
```

Dump of file SATURN:[PCCOMMON.DUMP.DLL]SDFORM.TMP;1 on 18-APR-1990 10:52:44.38
File ID (918,23,0)   End of file block 46 / Allocated 48

Virtual block number 43 (0000002B), 512 (0200) bytes

```
00080060 02460005 80010001 05F6000F 00050000 00000000 FFFFFFFF 01050008 ..................-.......F.`... 000000
01180008 00600228 00058001 00010606 000C0005 00000000 0000FFFF FFFF010E ......................(.`..... 000020
FFFF0123 00080060 01E60005 80010001 06130008 00050000 00000000 FFFFFFFF ......................|.`...#... 000040
FFFFFFFF 01240008 00C101DA 00078002 0008061C 00000006 00000000 0000FFFF .....................Ö.é...$..... 000060
0000FFFF FFFF0125 00080060 01CE0005 80010001 061D0009 00050000 00000000 ....................ö.`...X...... 000080
00000000 FFFFFFFF 01260030 00C5019C 00058000 00000627 00000007 00000000 ........'.........é.0.&......... 0000A0
00000000 0000FFFF FFFF0127 000C0026 01C000CF 80020400 06280003 00030000 ......(.....ü.à.&...'........... 0000C0
00030000 00000000 FFFFFFFF 0128000C 002601AE 00CF8002 0000062C 00070003 ....,.....ü.Û.&...(............. 0000E0
00040005 00000000 0000FFFF FFFF0129 000C0026 019C00CF 80020000 06340006 ..4.....ü...&...)............... 000100
06400013 00030000 00000000 FFFFFFFF 012C0022 00F00118 00058001 0002063B ;.........Þ.".,................@. 000120
00040654 00040003 00000000 0000FFFF FFFF012D 0008006E 0126000A 80020004 ......&.n...-...............T... 000140
80020004 06590006 00030000 00000000 FFFFFFFF 012E0008 00700126 007D8002 ..).&.p..................Y..... 000160
007D8002 00040660 00050003 00000000 0000FFFF FFFF012F 0008006E 011B000A ....n.../...............`.....). 000180
01080005 80010001 06660009 00050000 00000000 FFFFFFFF 01300008 0070011B ..p...0..............f.......... 0001A0
00F000D6 00058000 00000670 00000007 00000000 0000FFFF FFFF0136 00080060 `...6...............p.......ø.Þ. 0001C0
00080060 00C60005 80010001 0671000A 00050000 00000000 FFFFFFFF 01370030 0.7...............q.......6.`... 0001E0
```

Dump of file SATURN:[PCCOMMON.DUMP.DLL]SDFORM.TMP;1 on 18-APR-1990 10:52:44.38
File ID (918,23,0)   End of file block 46 / Allocated 48

Virtual block number 44 (0000002C), 512 (0200) bytes

```
01410030 00F00094 00058000 0000067C 00000007 00000000 0000FFFF FFFF0140 @...............|.........Þ.0.A. 000000
FFFF014B 00080060 00840005 80010001 067D0004 00050000 00000000 FFFFFFFF ...............}.........`...K... 000020
FFFFFFFF 014C0008 00C10078 00078002 00080682 00000006 00000000 0000FFFF ...................x.é...L..... 000040
0000FFFF FFFF014D 00080060 006C0005 80010001 06830006 00050000 00000000 ...................l.`...M....... 000060
00000000 FFFFFFFF 014E0030 00C5003A 00058000 0000068A 00000007 00000000 ...............:.é.0.N......... 000080
00000000 0000FFFF FFFF014F 000C0026 005E00CF 80020400 068B0003 00030000 ............ü.^.&...O........... 0000A0
00030000 00000000 FFFFFFFF 0150000C 0026004C 00CF8002 0000068F 00070003 ..........ü.L.&...P............. 0000C0
00080005 00000000 0000FFFF FFFF0151 000C0026 003A00CF 80020000 06970006 ........ü.:.&...Q............... 0000E0
06A70000 00060000 00000000 FFFFFFFF 03910008 0034018C 00058001 0001069E ..........4.....................Ï. 000100
000106A8 00080005 00000000 0000FFFF FFFF0392 000800C1 01800007 80020008 ........ê....................´... 000120
80020000 06B10000 00070000 00000000 FFFFFFFF 03930008 00460174 00058001 ....t.F.....................Ÿ..... 000140
00CF8002 000006B2 00030003 00000000 0000FFFF FFFF0394 003000C5 01420005 ..B.é.0.................ý.....ü. 000160
015400CF 80020000 06B60007 00030000 00000000 FFFFFFFF 0395000C 00260166 f.&..................Ñ.....ü.T. 000180
00260143 00CF8002 0000068E 00060003 00000000 0000FFFF FFFF0396 000C0026 &...................ƒ.....ü.C.&. 0001A0
002D00F0 00050005 80010002 06C50010 00050000 00000000 FFFFFFFF 0397000C ...................é.........Þ.-. 0001C0
039E0008 00270014 000A8001 00010606 00070005 00000000 0000FFFF FFFF039D ...............ø.........'..... 0001E0
```

Dump of file SATURN:[PCCOMMON.DUMP.DLL]SDFORM.TMP;1 on 18-APR-1990 10:52:44.38
File ID (918,23,0)   End of file block 46 / Allocated 48

Virtual block number 45 (0000002D), 512 (0200) bytes

```
FFFF039F 0008002B 0009000A 80010001 060E0007 00050000 00000000 FFFFFFFF ...............B.........+....... 000000
FFFFFFFF 03A00008 0018001F 00388001 000106E6 00040005 00000000 0000FFFF .............Ï.....8............. 000020
0000FFFF FFFF03A1 0008001B 001F0078 80010001 06E80004 00050000 00000000 ...........Š.....x.......À....... 000040
00000000 FFFFFFFF 03A20008 001C001F 00B88001 000106F0 00040005 00000000 .........Þ.....|........Å........ 000060
00000000 0000FFFF FFFF009C 00080036 00140038 80010001 06F50007 00050000 ......%.....8...6............... 000080
00050000 00000000 FFFFFFFF 009D0008 00360014 00788001 000106FD 00070005 ....».....x...6................. 0000A0
00070005 00000000 0000FFFF FFFF009E 00080036 001400B8 80010001 07050007 ........¡...6..................... 0000C0
07150007 00050000 00000000 FFFFFFFF 009F0008 00360009 00388001 0001070D ......8...6...................... 0000E0
0001071D 00070005 00000000 0000FFFF FFFF00A0 00080036 00090078 80010001 ....x...6.......................... 000100
80030007 07250000 000A0000 00000000 FFFFFFFF 00A10008 00370009 00B88001 ..¡...7...À................%..... 000120
00078002 00000726 00000007 00000000 0000FFFF FFFF0119 002F00EE 01F50007 ..%.Ÿ./..................&....... 000140
02740005 80020002 07270006 00030000 00000000 FFFFFFFF 03AB000B 00ED0237 7.Û...´...............'.......t. 000160
6D207373 65636F72 502A0000 3A656D61 4E000000 0000FFFF FFFF03A9 000A00ED Ú...`..........Name:..*Process m 000180
79532A00 003A6D79 6E6F6E79 53003A6E 6F697470 69726373 6544003A 6C65646F odel:.Description:.Synonym:..*Sy 0001A0
00657079 54006574 656C6544 00656361 6C706552 00646441 0000736D 796E6F6E nonyms..Add.Replace.Delete.Type. 0001C0
006D6574 73795300 656C6F52 0074696E 75206C61 6E6F6974 617A696E 6167724F Organizational unit.Role.System. 0001E0
```

```
Dump of file SATURN:[PCCOMMON.DUMP.DLL]SDFORM.TMP;1 on 18-APR-1990 10:52:44.38
File ID (918,23,0)   End of file block 46 / Allocated 48

Virtual block number 46 (0000002E), 512 (0200) bytes

 746F4E00 0073776F 6C662D74 754F2A00 0073776F 6C662D6E 492A0072 6568744F Other.*In-flows..*Out-flows..Not 000000
 65480065 74656C65 44006563 616C7065 52006464 41000073 65746F4E 2A000065 e..*Notes..Add.Replace.Delete.Ke 000020
 65440065 63616C70 65520064 64410000 7364726F 7779654B 00003A64 726F7779 yword:..Keywords..Add.Replace.De 000040
 70550064 65746165 7243006E 6F697461 6D726F66 6E692072 65735500 6574656C lete.User information.Created.Up 000060
 5F5F5F00 5F5F5F5F 5F5F5F00 72657355 00656D69 54006574 61440064 65746164 dated.Date.Time.User._______.___ 000080
 5F5F5F00 5F5F5F5F 5F5F5F00 5F5F5F5F 5F5F5F00 5F5F5F5F 5F5F5F00 5F5F5F5F ____._______._______._______.___ 0000A0
 00000000 00000000 00000000 00000000 00000074 63656C65 53000000 5F5F5F5F ____...Select.................... 0000C0
 00000000 00000000 00000000 00000000 00000000 00000000 00000000 00000000 ................................ 0000E0
 00000000 00000000 00000000 00000000 00000000 00000000 00000000 00000000 ................................ 000100
 00000000 00000000 00000000 00000000 00000000 00000000 00000000 00000000 ................................ 000120
 00000000 00000000 00000000 00000000 00000000 00000000 00000000 00000000 ................................ 000140
 00000000 00000000 00000000 00000000 00000000 00000000 00000000 00000000 ................................ 000160
 00000000 00000000 00000000 00000000 00000000 00000000 00000000 00000000 ................................ 000180
 00000000 00000000 00000000 00000000 00000000 00000000 00000000 00000000 ................................ 0001A0
 00000000 00000000 00000000 00000000 00000000 00000000 00000000 00000000 ................................ 0001C0
 00000000 00000000 00000000 00000000 00000000 00000000 00000000 00000000 ................................ 0001E0

Dump of file SATURN:[PCCOMMON.DUMP.DLL]SHP.TMP;1 on 18-APR-1990 10:52:51.06
File ID (922,23,0)   End of file block 111 / Allocated 112

Virtual block number 1 (00000001), 512 (0200) bytes

 00000000 00000040 00000000 00000088 0000FFFF 00000004 0000006F 00EB5A4D MZŠ.o...........|.......ə....... 000000
 00000080 00000000 00000000 00000000 00000000 00000000 00000000 00000000 ................................ 000020
 6F6E6E61 63206D61 72676F72 70207369 685421CD 4C01B821 CD09B400 0EBA1F0E ..¤..Ç.ë|¡.LëIThis program canno 000040
 00000000 00000024 0A0D0D2E 65646F6D 20534F44 206E6920 6E757220 65622074 t be run in DOS mode....$....... 000060
 0006000B 00000000 000A2666 00000000 000B8009 4622DBE6 025C0AD1 0505454E NE..Ì.\.|Û"F........f&.......... 000080
 00000000 00000000 00010000 00040000 00000DAD 0A3C0A30 00980098 0040004A J.ə.....0.<.Ü................... 0000A0
 16260F00 1625053A 238A0F00 238902FD 14500F00 145001B5 001C0F00 001B00E0 À.......ç.P...P.».#...#:.X...&. 0000C0
 0F420F00 0F4208A0 10DA0F00 10DA078F 0ABA0F00 0AB906E0 03D40F00 03D406A0 ..å...å.Å.¿...¤...Ö...Ö...B...B. 0000E0
 53170000 50485303 0F500F21 0F390CDA 32A70F00 32A709A9 00CC0F00 00CC099A ..ä...ä.¨.Ì2..I2ö.9.Ì.P..SHP...S 000100
 454E494C 5048530E 00014E4F 49544345 53524554 4E495952 45555147 45535048 HPSEGQUERYINTERSECTION...SHPLINE 000120
 54504853 10000353 45545942 54455342 54585450 48530F00 02594F52 54534544 DESTROY...SHPTXTBSETBYTES...SHPT 000140
 48474945 48595245 55514254 58545048 53120004 5453554A 59524555 51425458 XTBQUERYJUST...SHPTXTBQUERYHEIGH 000160
 51435241 50485311 0006454C 474E4159 52455551 504F5244 54504853 12000554 T...SHPTDROPQUERYANGLE...SHPARCQ 000180
 5349444D 49525459 52455551 454E494C 50485314 00075245 544E4543 59524555 UERYCENTER...SHPLINEQUERYTRIMDIS 0001A0
 4E415952 45555143 52415048 53150009 45544145 5243584F 42504853 0C000854 T...SHPBOXCREATE...SHPARCQUERYAN 0001C0
 44545048 5311000B 594F5254 53454443 52415048 5300000A 50454557 53454C47 GLESWEEP...SHPARCDESTROY...SHPTD 0001E0

Dump of file SATURN:[PCCOMMON.DUMP.DLL]SHP.TMP;1 on 18-APR-1990 10:52:51.06
File ID (922,23,0)   End of file block 111 / Allocated 112

Virtual block number 2 (00000002), 512 (0200) bytes

 55514254 58544445 444F4C50 58455048 531A000C 45534142 59524555 51504F52 ROPQUERYBASE...SHPEXPLODEDTXTBQU 000000
 4C504853 10000E59 4F525453 45444745 53504853 00000D54 4E455458 45595245 ERYEXTENT...SHPSEGDESTROY...SHPL 000020
 53494440 49525454 4553454E 494C5048 5312000F 53525454 4159504F 43454E49 INECOPYATTRS...SHPLINESETTRIMDIS 000040
 54504853 13001154 5349444D 49525459 52455551 504F5244 54504853 15001054 T...SHPTDROPQUERYTRIMDIST...SHPT 000060
 594F5254 53454442 54585450 48530E00 12545349 444D4952 54544553 504F5244 DROPSETTRIMDIST...SHPTXTBDESTROY 000080
 44454E49 41544E4F 43584F42 50485314 00144854 44495758 4F425048 530B0013 ...SHPBOXWIDTH...SHPBOXCONTAINED 0000A0
 53100016 584F4244 4E554F42 59524555 51425458 54504853 14001558 4F424E49 INBOX...SHPTXTBQUERYBOUNDBOX...S 0000C0
 47494548 54455342 54585450 48531000 17594F52 54534544 454C4352 49435048 HPCIRCLEDESTROY...SHPTXTBSETHEIG 0000E0
 45595245 5551504F 52445450 48531300 19454C47 4E415450 5048530A 00185448 HT...SHPPTANGLE...SHPTDROPQUERYE 000100
 44545050 48530C00 1B455341 42544553 504F5244 54504853 0F001A54 4E455458 XTENT...SHPTDROPSETBASE...SHPPTD 000120
 0A001D4D 4944444E 4F4D4149 44544553 454E494C 50485314 001C594F 52545345 ESTROY...SHPLINESETDIAMONDDIM... 000140
 48530F00 1F524145 4C43454C 43524943 5048530E 001E5453 49444454 50504853 SHPPTDDIST...SHPCIRCLECLEAR...SH 000160
 42534554 59425445 53425458 54504853 15002054 5045564F 4D455245 4E494C50 PLINEREMOVEPT ..SHPTXTBSETBYTESB 000180
 43524150 48530F00 22454449 53544649 4853584F 42504853 0F002153 48414552 REAKS!..SHPBOXSHIFTSIDE"..SHPARC 0001A0
 10002454 50444549 46495453 554A584F 42504853 11002353 55494441 52544553 SETRADIUS#..SHPBOXJUSTIFIEDPT$.. 0001C0
 00265241 454C4343 52415048 530B0025 54504543 414C5045 52454E49 4C504853 SHPLINEREPLACEPT%..SHPARCCLEAR&. 0001E0
```

Dump of file SATURN:[PCCOMMON.DUMP.DLL]SHP.TMP;1 on 18-APR-1990 10:52:51.06
File ID (922,23,0)   End of file block 111 / Allocated 112

Virtual block number 3 (00000003), 512 (0200) bytes

```
50545341 4C595245 5551454E 494C5048 53120027 4E4F494E 55584F42 50485308 .SHPBOXUNION'..SHPLINEQUERYLASTP 000000
51454352 41504853 08002958 4F425345 53534F52 43454E49 4C504853 11002854 T(..SHPLINECROSSESBOX)..SHPARCEQ 000020
5551504F 52445450 48531200 28455441 45524345 4E494C50 48530000 2A4C4155 UAL*..SHPLINECREATE+..SHPTDROPQU 000040
45535048 5310002D 594F5254 53454458 4F425048 5300002C 5450444E 45595245 ERYENDPT,..SHPBOXDESTROY-..SHPSE 000060
4E4F4954 43455352 45544E49 584F4250 48531200 2E474553 53455353 4F524347 GCROSSESSEG...SHPBOXINTERSECTION 000080
00314745 534E4F54 50504853 0A003052 54544154 4553454E 494C5048 530E002F /..SHPLINESETATTRO..SHPPTONSEG1. 0000A0
4F425048 530A0032 534B4145 52425345 54594259 52455551 42545854 50485317 .SHPTXTBQUERYBYTESBREAKS2..SHPBO 0000C0
34534B41 45524253 45545942 544E554F 43425458 54504853 17003354 53494458 XDIST3..SHPTXTBCOUNTBYTESBREAKS4 0000E0
454C4352 49435048 53140035 53554944 41525445 53454C43 52494350 48531200 ..SHPCIRCLESETRADIUS5..SHPCIRCLE 000100
5453544E 4F465952 45555142 54585450 48531500 36535549 44415259 52455551 QUERYRADIUS6..SHPTXTBQUERYFONTST 000120
504F4345 4E494C50 48531500 38455441 45524342 54585450 48530000 37454C59 YLE7..SHPTXTBCREATE8..SHPLINECOP 000140
54434553 5245544E 49584F42 47455350 48531800 39535254 5441504F 52445459 YTDROPATTRS9..SHPSEGBOXINTERSECT 000160
454C4352 49435048 5313003B 45564F4D 454E494C 50485308 003A5354 504E4F49 IONPTS:..SHPLINEMOVE;..SHPCIRCLE 000180
1500305B 4F425345 53534F52 43474553 50485310 003C584F 42534553 534F5243 CROSSESBOX<..SHPSEGCROSSESBOX=.. 0001A0
51454E49 4C504853 12003E4D 4944444E 4F4D4149 44544553 504F5244 54504853 SHPTDROPSETDIAMONDDIM>..SHPLINEQ 0001C0
50454557 53454C47 4E415445 53435241 50485313 003F5450 5458454E 59524555 UERYNEXTPT?..SHPARCSETANGLESWEEP 0001E0
```

Dump of file SATURN:[PCCOMMON.DUMP.DLL]SHP.TMP;1 on 18-APR-1990 10:52:51.06
File ID (922,23,0)   End of file block 111 / Allocated 112

Virtual block number 4 (00000004), 512 (0200) bytes

```
554E494D 54505048 530A0041 53554944 41525445 53504F52 44545048 53110040 @..SHPTDROPSETRADIUSA..SHPPTMINU 000000
51584F42 5048530F 0043544E 45545845 59524555 51454E49 4C504853 12004253 SB..SHPLINEQUERYEXTENTC..SHPBOXQ 000020
0045454C 59545354 4E4F4654 45534254 58545048 53130044 45444953 59524555 UERYSIDED..SHPTXTBSETFONTSTYLEE. 000040
52455551 42545854 50485314 00465453 49445041 4C524556 4F584F42 50485311 .SHPBOXOVERLAPDISTF..SHPTXTBQUER 000060
5048530A 00484554 41455243 504F5244 54504853 0E004745 43414654 4E4F4659 YFONTFACEG..SHPTDROPCREATEH..SHP 000080
53454C43 52494350 48531200 4A545349 44545050 48530900 49574F52 47584F42 BOXGROWI..SHPPTDISTJ..SHPCIRCLES 0000A0
5048530A 004C4554 41455243 454C4352 49435048 530F004B 5245544E 45435445 ETCENTERK..SHPCIRCLECREATEL..SHP 0000C0
530C004E 45434146 544E4F46 54455342 54585450 48531200 4D584F42 4E495450 PTINBOXM..SHPTXTBSETFONTFACEN..S 0000E0
41504853 11005045 54414552 43545050 48530800 4F524145 4C434254 58545048 HPTXTBCLEARO..SHPPTCREATEP..SHPA 000100
4E554F43 59524555 51454E49 4C504853 11005153 55494441 52595245 55514352 RCQUERYRADIUSQ..SHPLINEQUERYCOUN 000120
4F524454 50485312 0053544E 45545845 59524555 51425458 54504853 12005254 TR..SHPTXTBQUERYEXTENTS..SHPTDRO 000140
52415445 53504554 41455243 43524150 48531300 54545054 52415453 54455350 PSETSTARTPTT..SHPARCCREATEPSETAR 000160
50485313 0056404D 44444E4F 40414944 59524555 51454E49 4C504853 16005543 CU..SHPLINEQUERYDIAMONDDIMV..SHP 000180
4E415445 53504F52 44545048 53100057 53554944 41525952 45555150 4F524454 TDROPQUERYRADIUSW..SHPTDROPSETAN 0001A0
50485314 00595254 50534554 59425952 45555142 54585450 48531400 58454C47 GLEX..SHPTXTBQUERYBYTESPTRY..SHP 0001C0
45544145 52434352 41504853 0C005A54 50545241 54535952 45555150 4F524454 TDROPQUERYSTARTPTZ..SHPARCCREATE 0001E0
```

Dump of file SATURN:[PCCOMMON.DUMP.DLL]SHP.TMP;1 on 18-APR-1990 10:52:51.06
File ID (922,23,0)   End of file block 111 / Allocated 112

Virtual block number 5 (00000005), 512 (0200) bytes

```
454C4352 49435048 5314005C 52545441 59524555 51504F52 44545048 5311005B [..SHPTDROPQUERYATTR\..SHPCIRCLE 000000
4F4D4149 44595245 5551504F 52445450 48531700 5D524554 4E454359 52455551 QUERYCENTER]..SHPTDROPQUERYDIAMO 000020
584F4250 48531000 5F525454 41544553 504F5244 54504853 0F005E4D 4944444E NDDIM^..SHPTDROPSETATTR_..SHPBOX 000040
54504853 12006145 54414552 43474553 5048530C 0060584F 42534553 534F5243 CROSSESBOX`..SHPSEGCREATEa..SHPT 000060
0063454C 43524943 4E495450 5048530D 0062584F 42444E55 4F425445 53425458 XTBSETBOUNDBOXb..SHPPTINCIRCLEc. 000080
4E49454E 494C5048 53110064 54524154 53454C47 4E415445 53435241 50485313 .SHPARCSETANGLESTARTd..SHPLINEIN 0000A0
48530F00 66525454 41595245 5551454E 494C5048 53100065 54505458 454E5449 ITNEXTPTe..SHPLINEQUERYATTRf..SH 0000C0
48530E00 68455441 544F5254 50504853 0B006759 4F525453 4544504F 52445450 PTDROPDESTROYg..SHPPTROTATEh..SH 0000E0
006A5453 554A5445 53504F52 44545048 530F0069 54505952 45555145 4E494C50 PLINEQUERYPTi..SHPTDROPSETJUSTj. 000100
006C5453 554A5445 53425458 54504853 0E006854 50444441 454E494C 5048530C .SHPLINEADDPTk..SHPTXTBSETJUSTl. 000120
45545845 59524555 51435241 50485311 00605241 454C4350 4F524454 50485300 .SHPTDROPCLEARm..SHPARCQUERYEXTE 000140
1100704C 41555145 42545854 5048530C 006F5355 4C505450 50485309 006E544E NTn..SHPPTPLUSo..SHPTXTBEQU.'p.. 000160
544E554F 43425458 54504853 11007153 45545942 59524555 51425458 54504853 SHPTXTBQUERYBYTESq..SHPTXTBCUNT 000180
48531500 73545054 53524946 59524555 51454E49 4C504853 13007253 45545942 BYTESr..SHPLINEQUERYFIRSTPTs..SH 0001A0
45555145 4E494C50 48531400 744D4944 574F5252 41595245 5551504F 52445450 PTDROPQUERYARROWDIMt..SHPLINEQUE 0001C0
4D494457 4F525241 54455350 4F524454 50485313 00754D49 44574F52 52415952 RYARROWDIMu..SHPTDROPSETARROWDIM 0001E0
```

Dump of file SATURN:[PCCOMMON.DUMP.DLL]SHP.TMP;1 on 18-APR-1990 10:52:51.06
File ID (922,23,0)   End of file block 111 / Allocated 112

Virtual block number 6 (00000006), 512 (0200) bytes

```
4E454358 4F425048 530C0077 5453554A 59524555 51504F52 44545048 53110076 v..SHPTDROPQUERYJUSTw..SHPBOXCEN 000000
49504F52 44545048 53000079 54534944 4F485452 4F545050 48530E00 78524554 TERx..SHPPTORTHODISTy..SHPTDROPI 000020
7C414552 41584F42 5048530A 00785950 4F43454E 494C5048 5308007A 584F424E NBOXz..SHPLINECOPY(..SHPBOXAREA| 000040
41595245 55514352 41504853 15007052 45544E45 43544553 43524150 48530F00 ..SHPARCSETCENTER)..SHPARCQUERYA 000060
494C5048 5312007F 54484749 4548584F 42504853 0C007E54 52415453 454C474E NGLESTART-..SHPBOXHEIGHT...SHPLI 000080
4D500500 0088003B 002F0010 00070001 0000804D 4944574F 52524154 4553454E NESETARROWDIM........./.;.....PM 0000A0
4D0C4B43 4F4C4243 4F4C4C41 4D45400D 4D454003 534C4C41 43534F44 084E4957 WIN.DOSCALLS.MEM.MEMALLOCBLOCK.M 0000C0
544D4744 0F4D4744 03574152 44454254 07454254 0348434F 4C424545 52464D45 EMFREEBLOCK.TBE.TBEDRAW.DGM.DGMT 0000E0
440C4854 474E454C 4D524F46 534E4152 544D4744 12584F42 4D524F46 534E4152 RANSFORMBOX.DGMTRANSFORMLENGTH.D 000100
59524555 514D4744 0C535048 59524555 514D4744 08504145 48595245 55514D47 GMQUERYHEAP.DGMQUERYHPS.DGMQUERY 000120
08A10308 03011C03 04012001 03030145 54495257 534F4408 4F495303 45425448 HTBE.SIO.DOSWRITE.... ........À. 000140
03030F03 06020000 03020100 79030401 02680306 01048003 07010546 0305EC03 .š..F.........h....y............ 000160
A40300AA 0307020C A9030EF9 03040200 83030301 00000309 01033203 07010057 W....2..............'..`....¯..Ê 000180
03010105 9C030801 00600305 0104EC03 080108E2 0300F903 02020212 03080108 .........'..ã....š....m......... 0001A0
040100BF 03050102 ED030101 14110304 01008103 010102E2 03056E03 07020477 w....n..ã..............Ú....¢... 0001C0
A9030601 07D10304 01022903 02010661 03060105 84030201 08820308 01059C03 ......ý.........a....)....î....` 0001E0
```

Dump of file SATURN:[PCCOMMON.DUMP.DLL]SHP.TMP;1 on 18-APR-1990 10:52:51.06
File ID (922,23,0)   End of file block 111 / Allocated 112

Virtual block number 7 (00000007), 512 (0200) bytes

```
03020102 37030701 00970304 01011A03 06010FE0 0309CC03 04020DC5 03020100 ....é....ä..Å..............7.... 000000
088C0302 010AB603 08010AB8 0301010C F9030401 10890302 01142003 030100AA ¨.... .........'....|....Ñ....¥. 000020
011A0403 03011555 03040100 00030781 03080201 1E0301CC 03050209 EC030801 ...š....ä...............U. ..... 000040
03070107 82030601 12430304 010CFC03 0701037E 03030102 80030501 10F40304 ..¶.........~....•....C.... .... 000060
06E10308 01062F03 0201072F 03080113 64030201 0A270304 01015703 01010388 .....W....'....d..../..../..  Ä. 000080
8F030802 06270301 01000003 02290305 0201DE03 01010502 03020100 00030701 ..............ß....)......'..... 0000A0
03060101 88030701 03990308 0101CF03 04010213 03060100 00030101 01310306 ..1..............Ü.............. 0000C0
07010000 03060101 E1030701 07CF0308 01042E03 03080307 0214BF03 040107FD ».....¢....Ä........ü....Å....... 0000E0
01040503 08010000 03030109 FF030201 0BF4030E E2030702 01730305 0100F503 .%....s....ã..¶................. 000100
089C0304 01084203 01010139 03070100 C4031188 03040207 07030601 094A0301 ..J.............é....9....B...... 000120
08030000 03010103 5D030601 00640307 01063A03 08010348 03040104 CE030701 ...ö....H....:....d....]....Å... 000140
0520030C 76030702 13980304 010E6C03 07010971 03040109 9E030824 03029703 ....$.......q....l..........v_. . 000160
C10306B0 03060201 A2030201 0E390304 010F7803 070103B3 03010104 AC030201 ...¯....•....x....9....Å....¯..ê 000180
20606574 73797362 7553206D 61726761 69444600 00131503 0401014D 03020102 ....M........FDiagram Subsystem  0001A0
726F666E 49206E61 60686361 42203938 39312074 68676972 79706F43 20296328 (c) Copyright 1989 Bachman Infor 0001C0
00000000 00000000 00000000 2E636E49 202C736D 65747379 53206E6F 6974616D mation Systems, Inc............. 0001E0
```

Dump of file SATURN:[PCCOMMON.DUMP.DLL]SHP.TMP;1 on 18-APR-1990 10:52:51.06
File ID (922,23,0)   End of file block 111 / Allocated 112

Virtual block number 8 (00000008), 512 (0200) bytes

```
0006E903 7408460B 06468800 08E90375 000A7E83 D88EFFFF 881E5657 000006C8 à...WV.|...Ä.~..u.Õ...F..F.t.Õ.. 000000
037500FA 7E83FA46 890000FF FF9A5016 FC468008 6A0C6A0A 76FF0054 E98C6388 |c.ÕT..v.j.j..F•.P......Fª.~ª.u. 000020
06478926 0000B8FC 5EC40789 26024789 260000B8 FC5EC400 31E98C62 B80006E9 Õ..|b.Õ1.é^•|..&.G.&..é^•|..&.G. 000040
06CAC95F 5E1F0000 E90000B8 02578926 078926FE 5688FC46 8B065EC4 04478926 &.G.é^..F•.V±&..&.W.|..Õ...^_èò. 000060
06E90374 08460B06 4688000B E9037500 0A7E8308 8E000888 1E565700 0000C800 .à...WV.|...Ä.~..u.Õ...F..F.t̄.Õ. 000080
8C62B800 06E90375 00003D00 00FFFF9A 0676FF08 76FF0A76 FF0022E9 8C638800 .|c.Õ"..v..v..v......•..u.Õ..|b. 0000A0
080E4688 D88E0089 881E5657 000000C8 0006CAC9 5F5E1F00 00E90000 B80006E9 Õ..|..Õ...^_èò..à...WV.|...Ä.F.. 0000C0
D0080856 89064689 0000BA00 00B80013 E903750C 46080A46 88001EE9 03751046 F.u.Õ...F..F̄.u.Õ..|..¤...F..V..Å 0000E0
C4025713 26070326 0A5EC402 57882607 88260E5E C40045E9 8C638800 06E90375 u.Õ..|c.ÕE.é^.&..&.W.é^.&..&.W.é 000100
C4065713 26044703 260A5EC4 06578826 04478826 0E5EC402 57892607 8926065E ^.&..&.W.é^.&.G.&.W.é^.&.G.&.W.é 000120
D8881E56 57000000 C8000CCA C95F5E1F 0000E900 00B80657 89260447 8926065E ^.&.G.&.W.|..Õ...^_èò..à...WV.|Ä 000140
890000BA 00008800 13E90375 0C46080A 4688001E E9037510 46080E46 88088E00 ..Ä.F..F.u.Õ...F..F̄.u.Õ..|..¤... 000160
260A5EC4 02578826 0788260E 5EC40045 E98C6388 0006E903 75000808 56890646 F..V..Åu.Õ..|c.ÕE.é^.&..&.W.é^.& 000180
28260A5E C4065788 26044788 260E5EC4 02578926 07892606 5EC40257 1B26072B +.&.W.é^.&..&.W.é^.&.G.&.W.é^.&+ 0001A0
18C8000C CAC95F5E 1F0000E9 0000B806 57892604 47892606 5EC40657 1B260447 G.&.W.é^.&.G.&.W.|..Õ...^_èò..à. 0001C0
0008E903 750C460B 0A468800 16E90375 1046080E 4688D88E 015F881E 56570000 ..WV.|_..Ä.F..F.u.Õ...F..F̄.u.Õ.. 0001E0
```

```
Dump of file SATURN:[PCCOMMON.DUMP.DLL]SHP.TMP;1 on 18-APR-1990 10:52:51.06
File ID (922,23,0)   End of file block 111 / Allocated 112

Virtual block number 9 (00000009), 512 (0200) bytes

 2B260E5E C40257B8 26078B26 0A5EC400 D5E98C63 B80006E9 03740846 0B064688 .F..F.t.Õ..¡c.Õ{.á^.&..&.W.á^.&+ 000000
 571B2604 472B260E 5EC40657 8B260447 8B260A5E C4F65689 F4468902 571B2607 .&.W..F¶.V-á^.&.G.&.W.á^.&+G.&.W 000020
 9AF05E8D 02620648 9A025A02 459AF45E 8D025502 459AF45E 8DF25689 F0468906 ..FÞ.V·.^¶.E.U..^¶.E.Z..H.b..^Þ. 000040
 02830375 9ADC8B08 EC83027E 06579A02 7406489A 026F0245 9AF05E8D 026A0245 E.j..^Þ.E.o..H.t..W.~..š..É.u... 000060
 8D024D01 B89AF85E 8D1FA5A5 A5A5DA8E 1E0716F0 8BF87E8D 08C483FF FF073B9A .;....á..-½.Þ....ÕEEEE..^½.¡.M.. 000080
 16F08BE8 7E8D08C4 8302CF07 839A0285 03759ADC 8B08EC83 02B0061F 9A00221E ."........š..É.u.ç....ü..á..-Ò.Þ. 0000A0
 02578926 07892606 5EC40290 042C9A02 D401B89A E85E8D1F A5A5A5A5 DA8E1E07 ...ÕEEEE..^Ò.¡.à..,...á^.&..&.W. 0000C0
 7510460B 0E468B08 8E01E6B8 1E565700 0008C800 0CCAC95F 5E1F0000 E90000B8 ¡..Õ...^_èò..à...WV.¡Ì..Ä.F..F.u 0000E0
 008CE98C 63B80006 E9037408 46080646 8B000BE9 03750C46 0B0A468B 0016E903 .Õ...F..F.u.Õ...F..F.t.Õ..¡c.Õ.. 000100
 478B260A 5EC4FE56 89FC4689 02571B26 072B260E 5EC40257 8B26078B 260A5EC4 á^.&..&.W.á^.&+.&.W..F•.V±á^.&.G 000120
 5E8D0364 02459AFC 5E8DFA56 89F84689 06571B26 04472B26 0E5EC406 578B2604 .&.W.á^.&+G.&.W..F½.V•.^•.E.d..^ 000140
 03830648 9A037E02 459AF85E 8D037902 459AF85E 8D037106 489A0369 02459AFC •.E.i..H.q..^½.E.y..^½.E.-..H... 000160
 8E1EF08B FB8B065E C408C483 02A6073B 9A039203 759ADC8B 08EC8303 8D06579A .W....š..É.u....;.Ì..á.á^ .«.Þ.. 000180
 8BD88E02 F5B81E56 5700000C C8000CCA C95F5E1F 0000E900 00B81FA5 A5A5A5DA ÕEEEE.¡..Õ...^_èò..à...WV. ¥..Ä. 0001A0
 001AE903 7408460B 06468B00 0BE90375 0C46080A 468B0016 E9037510 46080E46 F..F.u.Õ...F..F.u.Õ...F..F.  Õ.. 0001C0
 478B260A 5EC4FE56 89FC4689 02571B26 072B260E 5EC40257 8B26078B 260A5EC4 á^.&..&.W.á^.&+.&.W..F•.V±á^.&.G 0001E0

Dump of file SATURN:[PCCOMMON.DUMP.DLL]SHP.TMP;1 on 18-APR-1990 10:52:51.06
File ID (922,23,0)   End of file block 111 / Allocated 112

Virtual block number 10 (0000000A), 512 (0200) bytes

 8B0010E9 037C00FA 7E83FA56 89F84689 06571B26 04472B26 0E5EC406 578B2604 .&.W.á^.&+G.&.W..F½.V•.~•.|.Õ... 000000
 7C00FE7E 83F65689 F44689FA 568BF846 8B0006E9 DAF70002 83D8F7FA 568BF846 F½.V•¼Ä.@.¼ÕÕ...F½.V•.F¶.V-.~±.| 000020
 F65613F4 4603FE56 8BFC4688 0006E90A F7000283 D8F7FE56 8BFC4688 0010E903 .Õ...F•.V±¼Ä.@.¼ÕÕ...F•.V±.F¶.V- 000040
 B8B81E56 57000012 C8000CCA C95F5E1F 0000E900 00B80257 89260789 26065EC4 á^.&..&.W.¡..Õ...^_èò..à...WV.¡E 000060
 7408460B 06468B00 0BE90375 0C46080A 468B0016 E9037510 46080E46 8BD88E03 ..Ä.F..F.u.Õ...F..F.u.Õ...F..F.t 000080
 46890257 1B260728 260E5EC4 02578B26 078B260A 5EC400E9 E98C63B8 0006E903 .Õ..¡c.ÕÕ.á^.&..&.W.á^.&+.&.W..F 0000A0
 F05689EE 46890657 1B260447 2B260E5E C4065788 26044788 260A5EC4 F45689F2 ·.V¶á^.&.G.&.W.á^.&+G.&.W..FŸ.VÞ 0000C0
 0BE90374 F4460BF2 46B80097 E9000007 C726065E C4000BE9 0374F046 0BEE4688 .FŸ.FÞt.Õ..á^.&ú...Õ...F·.F¶t.Õ. 0000E0
 2906409A 051F0245 9AF25E8D 051A0245 9AEE5E8D 0081E900 5A07C726 065EC400 .á^.&ú.Z.Õ...^Ÿ.E....^·.E....M.) 000100
 A5A5A5DA 8E1E0716 F08BF87E 8D08C483 05480771 9A052E03 759ADC8B 08EC8305 ..š..É.u....q.H..á..-½.Þ....ÕEEE 000120
 51042C9A 055F05EF 9A00321E 8D051205 D79A002A 1E8D035C 01B89AF8 5E8D1FA5 Ë..^½.¡.\...*..•.....2..ÿ._...,.Q 000140
 C70005E9 037400B4 F67E8100 0FE900B4 F6468100 08E9037C 00F67E83 F6468905 ..F-.—.|.Õ...F-Ç.Õ...—Ç.t.Õ..ú 000160
 56570000 00C8000C CAC95F5E 1F0000E9 00008807 8926F646 88065EC4 0000F646 F-..á^..F-&..¡..Õ...^_èò..à...WV 000180
 0B06468B 0008E903 750C460B 0A468B00 16E90375 1046080E 468BD88E 047FB81E .¡...Ä.F..F.u.Õ...F..F.u.Õ...F.. 0001A0
 E9037407 39260E5E C40257B8 26078B26 0A5EC400 53E98C63 B80006E9 03740846 F.t.Õ..¡c.ÕS.á^.&..&.W.á^.&9.t.Õ 0001C0
 E9037404 4739260E 5EC40657 8B260447 8B260A5E C40026E9 03740257 3926002F /.&9W.t.Õ&.á^.&.G.&.W.á^.&9G.t.Õ 0001E0

Dump of file SATURN:[PCCOMMON.DUMP.DLL]SHP.TMP;1 on 18-APR-1990 10:52:51.06
File ID (922,23,0)   End of file block 111 / Allocated 112

Virtual block number 11 (0000000B), 512 (0200) bytes

 0000E900 00B80789 26065EC4 00008800 03E90001 B80006E9 03740657 3926000F ..&9W.t.Õ..¡..Õ..¡..á^.&..¡..Õ.. 000000
 46B80016 E9037514 46081246 8BD88E05 A2B81E56 57000022 C8000CCA C95F5E1F .^_èò..à"..WV.¡Å..Ä.F..F.u.Õ...F 000020
 1056880E 468B02E9 E98C63B8 0006E903 740C460B 0A468B00 0BE90375 1046080E ..F.u.Õ...F..F.t.Õ..¡c.ÕÕ..F..V. 000040
 037E0031 E9037DF0 5639F856 8BF6468B 1FA5F200 08B90A8E 1E0716F0 8BEE7E8D .~Ÿ.Þ....Õ¿..·È..F-.V½VÞ).Õ1.-. 000060
 EE4689F8 568BF646 8BE45689 E24689F0 568BEE46 8B0024E9 0377EE46 390008E9 Õ..9FŸw.Õ$..FŸ.VÞ.Fã.VÕ.F-.V½.FŸ 000080
 E9037E00 31E9037D F45639FC 568BFA46 8BF85689 F64689E4 568BE246 8BF05689 .VÞ.Fã.VÕ.F-.V½.F•.V•9V¶).Õ1.-.Õ 0000A0
 89F24689 FC568BFA 468BE056 89DE4689 F4568BF2 46B80024 E90377F2 46390008 ..9F·w.Õ$..F·.V¶.FB.VÅ.F•.V=.F·. 0000C0
 0072E903 7D025739 26F0568B EE468B12 5EC4FC56 89FA4689 E05688DE 468BF456 V¶.FB.VÅ.F•.V=á^..FŸ.VÞ&9W.).Õr. 0000E0
 7D0053E9 037E0257 3926F856 8BF6468B 125EC400 65E90373 07392600 08E9037E -.Õ..&9.s.Õe.á^..F-.V½&9W.-.ÕS.) 000100
 037E0034 E9037D06 573926F4 568BF246 8B125EC4 0046E903 76073926 0008E903 .Õ..&9.v.ÕF.á^..F·.V¶&9W.).Õ4.-. 000120
 037D0014 E9037E06 573926FC 568BFA46 8B125EC4 0026E903 73044739 260009E9 Õ..&9G.s.Õ&.á^..F•.V=&9W.-.Õ..). 000140
 83260A5E C4078926 0A5EC400 00B80003 E90001B8 0006E903 76044739 260009E9 Õ..&9G.v.Õ..¡..Õ..¡..á^.&..á^.&. 000160
 B8078926 02478926 00008806 5EC4000D E9037508 46080646 8B0021E9 0374003F ?.t.Õ¡..F..F.u.Õ..á^.|..&.G.&..¡ 000180
 26078B26 125EC401 8AE90000 B80006E9 03740846 0B06468B 0011E901 9EE90000 ..Õ..Õ...F..F.t.Õ..¡..Õ..á^.&..& 0001A0
 571B2607 2B26F056 8BEE468B 125EC400 13E9037C 00FA83F0 561BEE46 2B02578B .W.+FŸ.VÞ.•.|.Õ..á^..FŸ.VÞ&+.&.W 0001C0
 E90000FE 46C7E856 89E64689 F0561BEE 462B0257 8B26078B 26125EC4 0010E902 .Õ..á^.&..&.W.+FŸ.VÞ.F¦.VÒÚF±..Õ 0001E0
```

```
Dump of file SATURN:[PCCOMMON.DUMP.DLL]SHP.TMP;1 on 18-APR-1990 10:52:51.06
File ID (922,23,0)   End of file block 111 / Allocated 112

Virtual block number 12 (0000000C), 512 (0200) bytes

 072B2612 5EC4F856 8BF6468B 00D5E9FE 4688011F E9037203 FE7E83FE 46FF0003 ...F±.~±.r.Õ...F±Õf..F~.V%á^.&+. 000000
 880010E9 F8561BF6 46280257 8B26078B 26125EC4 0013E903 7C00FA83 02571B26 &.W..*.|.Õ..á^.&..&.W.+F~.V%Õ... 000020
 2604478B 26125EC4 00ABE9EC 5689EA46 8902571B 26072B26 125EC4F8 568BF646 F~.V%á^.&+.&.W..Fö.VšÕ¨.á^.&.G.& 000040
 1B260447 2B26F456 8BF2468B 125EC400 14E9037C 00FA83F4 561BF246 2B06578B .W.+F·.V¶.*.|.Õ..á^..F·.V¶&+G.&. 000060
 880064E9 EC5689EA 4689F456 1BF2462B 06578B26 04478B26 125EC400 11E90657 W.Õ..á^.&.G.&.W.+F·.V¶.Fö.VšÕd.. 000080
 2604478B 26125EC4 0014E903 7C00FA83 06571B26 04472B26 125EC4FC 568BFA46 F*.V=á^.&+G.&.W..*.|.Õ..á^.&.G.& 0000A0
 EA468906 571B2604 472B2612 5EC4FC56 8BFA468B 0011E9FC 561BFA46 2B06578B .W.+F*.V=Õ...F*.V=á^.&+G.&.W..Fõ 0000C0
 FF9FE903 7500023D FF60E903 7500013D FF24E903 75C00800 1AE9001D E9EC5689 .VšÕ..Õ...âu.Õ$.=..u.Õ'.=..u.Õ.. 0000E0
 468B000C E90372EA 46390008 E9037D00 19E9037E EC5639E8 568BE646 880000E9 Õ...F|.VÒ9Vš~.Õ..}.Õ..9Fõr.Õ...F 000100
 00008802 57892607 8926E856 8BE6468B 065EC4FE D5E9E856 89E64689 EC568BEA õ.Vš.F|.VÒÕf±á^..F|.VÒ&..&.W.|.. 000120
 89F44689 1056880E 468BD88E 062FB81E 56570000 1CC80010 CAC95F5E 1F0000E9 Õ...^_èò..à...WV.|/..Ä.F..V..F¶. 000140
 03740C46 0B0A468B 000BE903 7510460B 0E468B00 16E90375 14460812 468BF656 V~.F..F.u.Õ...F..F.u.Õ...F..F.t. 000160
 46890657 1B260447 2B26F45E C402578B 26078B26 125EC401 28E98C63 B80006E9 Õ..¡c.Õ(.á^.&..&.W.á^¶&+G.&.W..F 000180
 EE5689EC 46890A57 1B260847 2B26F45E C406578B 2604478B 26125EC4 F25689F0 Þ.V·á^.&.G.&.W.á^¶&+G.&.W..Fś.VÝ 0001A0
 EC5E8009 E302459A EC5E8009 DB06489A 09D30245 9AF05E8D 09CE0245 9AF05E8D .^Þ.E.ö..^Þ.E.Æ..H.Ü..^š.E.D..^š 0001C0
 C483055A 073B9A09 FC03759A DC8808EC 8309F706 579A09ED 06489A09 E802459A .E.Ò..H.Ú..W.¥..š..É.u.=..;.Z..á 0001E0

Dump of file SATURN:[PCCOMMON.DUMP.DLL]SHP.TMP;1 on 18-APR-1990 10:52:51.06
File ID (922,23,0)   End of file block 111 / Allocated 112

Virtual block number 13 (0000000D), 512 (0200) bytes

 02499A1F 8DF45EC4 0A200188 9AF85E8D 1FA5A5A5 A5DA8E1E 0716F08B F87E8D08 ..~½.Þ....ÕEEEE..^½.|. .á^¶...I. 000000
 8D0049E9 03750846 0B06468B 000107C7 260A5EC4 005FE903 730A4506 5C9A0A25 %..\.E.s.Õ_.á^.&ú....F..F.u.ÕI.. 000020
 830A7707 839A0A5D 03759ADC 8808EC83 0A58061F 9A0D221E 8D0A4E01 B89AF85E ^½.|.N...".....X..š..Ê.u.]....w.. 000040
 5EC409C6 042C9A0A 7C01B89A E45E8D1F A5A5A5A5 DA8E1E07 16F08BE4 7E8D08C4 á..~õ.Þ....ÕEEEE..^õ.|.|...,ó.á^ 000060
 5EC4000D E9037508 460B0646 88000007 C7260A5E C40020E9 02578926 07892606 .&..&.W.Õ .á^.&ú....F..F.u.Õ..á^ 000080
 B81E5657 000010C8 0010CAC9 5F5E1F00 00E90000 B8078926 02478926 0000B806 .|..&.G.&..|..Õ...^_èò..à...WV.| 0000A0
 0C460B0A 4688000B E9037510 460B0E46 880016E9 03751446 0B12468B D88E0952 R..Ä.F..F.u.Õ...F..F.u.Õ...F..F. 0000C0
 A5A5A5DB 8E1E0716 F28BF888 0C5E880A 568BF046 8D0050E9 8C638800 06E90374 t.Õ..¡c.ÕP..FÞ.V..^..½.·....ÜEEE 0000E0
 FF1276FF 1476FF1F A5A5A5A5 DB8E1E07 16F288F8 880C5E88 0A568BF8 468D1FA5 Ê..F½.V..^..½.·....ÜEEEE..v..v.. 000100
 CAC95F5E 1F0000E9 000088FF FF037E9A 0676FF08 76FF5016 F0468D0E 76FF1076 v..v..FÞ.P.v..v..~...|..Õ...^_èò 000120
 74084608 06468800 08E90375 0C460B0A 4688D88E 0AC0881E 56570000 30C80010 ..àO..WV.|ã..Ä.F..F.u.Õ...F..F.t 000140
 26078826 0A5EC401 9CE90000 880006E9 0374000E 7E8301AB E98C6388 0006E903 .Õ..¡c.Õ¨..~..t.Õ..|..Õ..á^.&..& 000160
 26044729 26065EC4 06578B26 04478B26 0A5EC402 57192607 2926065E C402578B .W.á^.&).&.W.á^.&.G.&.W.á^.&)G.& 000180
 E05E8D0B C305EF9A 0D2A1E8D 08B805D7 9A0D321E 8D0B8202 529A0E5E 8D065719 .W..^..R.ý...2..■.£...*..ÿ.û..^Á 0001A0
 0716F08B F87E8D08 C4830BF7 07449AE0 76FFE276 FFE476FF E676FF08 D403759A .u.å..v|.vÕ.vã.vÁ.D.¥..á..~½.Þ.. 0001C0
 88F07E8D 08C4830C 1307409A E076FFE2 76FFE476 FFE676FF 1FA5A5A5 A5DA8E1E ..ÕEEEE..v|.vÕ.vã.vÁ.M....á..~Þ. 0001E0

Dump of file SATURN:[PCCOMMON.DUMP.DLL]SHP.TMP;1 on 18-APR-1990 10:52:51.06
File ID (922,23,0)   End of file block 111 / Allocated 112

Virtual block number 14 (0000000E), 512 (0200) bytes

 065EC40C 2605C89A F05E8D0C 1B02499A 1F8D065E C41FA5A5 A5A5DA8E 1E0716F0 Þ....ÕEEEE.á^....I....^Þ.à.&.á^. 000000
 EC830C46 061F9A0D 221E8D0C 3C063E9A 0C3305C8 9AF85E8D 0C2E0249 9A045F8D ._..I....^½.à.3..>.<...".....F..š 000020
 8D1FA5A5 A5A5DA8E 1E0716F0 8BD87E8D 08C4830C 6507839A 0C4B0375 9ADC8808 ..Ê.u.K....e..á..~Ä.Þ....ÕEEEE.. 000040
 F05E8D0C 8302499A 045F8D06 5EC4EE56 89EC4689 0C7B042C 9A0C6A01 B89AD85E ^Ä.|.j..,.(..Fš.VÝá^.._..I....^Þ 000060
 00221E8D 0CA30657 9A0C9A05 C89AF85E 8D0C9502 499A1F8D 065EC40C 8D05C89A .à...á^....I....^½.à..._.W.È...". 000080
 8E1E0716 F08BD07E 8D08C483 0CCC0783 9A0CB203 759ADC88 08EC830C AD061F9A ...Ü..š..Ê.u.ý....ä..á..~Å.Þ.... 0000A0
 26078B26 0A5EC4EA 5689E846 890A1604 2C9A0CD1 01B89AD0 5E8D1FA5 A5A5A50A ÕEEEE..^Å.|.Ì..,....FÒ.Võá^.&..& 0000C0
 46030657 8B260447 8B260A5E C4025789 26078926 065EC4EE 5613EC46 0302578B .W..Fš.VÝá^.&..&.W.á^.&.G.&.W..F 0000E0
 33000200 050ACAC9 5F5E1F00 00E90000 88065789 26044789 26065EC4 EA5613E8 Ò.Võá^.&.G.&.W.|..Õ...^_èò.....3 000100
 B1020300 14000300 33020300 0000080B 4A000200 00000A0B A9000200 0000030B .......`........J........3.......Ý 000120
 000A7E83 D88EFFFF B81E5657 000006C8 00000000 00000000 00000000 22000300 ..."............à...WV.|...Ä.~.. 000140
 FC468D10 6A0C6A0A 76FF007D E98C6388 0006E903 7408460B 06468B00 08E90375 u.Õ...F..F.t.Õ..|c.Õ)..v.j.j..F= 000160
 07892602 47892600 0088065E C40013E9 037500FA 7E83FA46 890000FF FF9A5016 .P......F*.~*.u.Õ..á^.|..&.G.&.. 000180
 47892606 47892600 0088FC5E C4078926 02478926 000088FC 5EC4004D E98C62B8 |b.ÕM.á^=|..&.G.&..á^=|..&.G.&.G 0001A0
 065EC40C 4789260E 47892600 0088FC5E C4084789 260A4789 260000B8 FC5EC404 .á^=|..&.G.&.G.á^=|..&.G.&.G.á^. 0001C0
 56570000 00C80006 CAC95F5E 1F0000E9 00008802 57892607 8926FE56 88FC468B .F=.V±&..&.W.|..Õ...^_èò..à...WV 0001E0
```

Dump of file SATURN:[PCCOMMON.DUMP.DLL]SHP.TMP;1 on 18-APR-1990 10:52:51.06
File ID (922,23,0)   End of file block 111 / Allocated 112

Virtual block number 15 (0000000F), 512 (0200) bytes

```
0022E98C 63B80006 E9037408 460B0646 8B000BE9 0375000A 7E83088E 0008881E .|...Ä.-..u.Õ...F..F.t.Õ..¡c.Õ". 000000
E90000B8 0006E98C 62B80006 E9037500 00300000 FFFF9A06 76FF0876 FF0A76FF .v..v..v......=..u.Õ..¡b.Õ..¡..Õ 000020
0008E903 750C460B 0A468BD8 8E00B2B8 1E565700 0000C800 06CAC95F 5E1F0000 ...^_èò..à...WV.|ý..Ä.F..F.u.Õ.. 000040
260A5EC4 0A578B26 08478B26 0A5EC400 25E98C63 B80006E9 03740846 0B06468B .F..F.t.Õ..¡c.ÕX.á^.&.G.&.W.á^.& 000060
0000C800 08CAC95F 5E1F0000 E90000B8 02578926 07892606 5EC40257 1B26072B +.&.W.á^.&..&.W.|..Õ...^_èò..à.. 000080
B80006E9 03740846 0B06468B 0008E903 750C460B 0A468BD8 8E0101B8 1E565700 .WV.|...Ä.F..F.u.Õ...F..F.t.Õ..| 0000A0
8926065E C406571B 2604472B 260A5EC4 0E578B26 0C478B26 0A5EC400 26E98C63 c.Õ&.á^.&.G.&.W.á^.&+G.&.W.á^.&. 0000C0
468BD88E 0155881E 56570000 08C80008 CAC95F5E 1F0000E9 00008802 57892607 .&.W.|..Õ...^_èò..à...WV.¡U..Ä.F 0000E0
478B260A 5EC40058 E98C63B8 0006E903 74084608 06468B00 08E90375 0C460B0A ..F.u.Õ...F..F.t.Õ..¡c.ÕX.á^.&.G 000100
578B2608 478B260A 5EC4FE56 89FC4689 06571B26 04472B26 0A5EC40E 578B260C .&.W.á^.&+G.&.W..F=.V±á^.&.G.&.W 000120
01249AFC 76FFFE76 FFF876FF FA76FFFA 5689F846 8902571B 26072B26 0A5EC40A .á^.&+.&.W..F½.Vª.vª.v½.v±.v=.$. 000140
1E565700 0008C800 08CAC95F 5E1F0000 E90000B8 02578926 07892606 5EC4FFFF ..á^.&..&.W.|..Õ...^_èò..à...WV. 000160
54E98C63 B80006E9 03740846 0B06468B 0008E903 750E460B 0C468BD8 8E01AAB8 |^..Ä.F..F.u.Õ...F..F.t.Õ..¡c.ÕT 000180
0C5EC4FE 5689FC46 8906571B 2604472B 260C5EC4 0E578B26 0C478B26 0C5EC402 .á^.&.G.&.W.á^.&+G.&.W..F=.V±á^. 0001A0
5EC401EB E90A468B FA5689F8 46890257 1B26072B 260C5EC4 0A578B26 08478B26 &.G.&.W.á^.&+.&.W..F½.Vª.F.ÕS.á^ 0001C0
02578B26 078B260C 5EC401F9 E91FA5A5 A5A5DA8E 1EF08BFB 8B0E568B 0C468B06 ..F..V..«.Þ..ÕÉÉÉÉ.Õª.á^.&..&.W. 0001E0
```

Dump of file SATURN:[PCCOMMON.DUMP.DLL]SHP.TMP;1 on 18-APR-1990 10:52:51.06
File ID (922,23,0)   End of file block 111 / Allocated 112

Virtual block number 16 (00000010), 512 (0200) bytes

```
044F8B26 0C5EC402 1000889A FC76FFFE 76FF026A 006A0257 89260789 26065EC4 á^.&..&.W.j.j..v±.v=.....á^.&.O. 000000
02578B26 078B260C 5EC401B9 E9067789 26044F89 26065EC4 F213C803 06778B26 &.w..à.·á^.&.O.&.w.Õ¿.á^.&..&.W. 000020
06578926 04478926 065EC40E 578B260C 478B260C 5EC40257 89260789 26065EC4 á^.&..&.W.á^.&.G.&.W.á^.&.G.&.W. 000040
F213C803 02778B26 0F8B260C 5EC40360 00889AF8 76FFFA76 FF026A00 6A018CE9 Õ..j.j..vª.v½...'.á^.&..&.w..à.· 000060
06578926 04478926 065EC406 578B2604 478B260C 5EC40277 89260F89 26065EC4 á^.&..&.w.á^.&.G.&.W.á^.&.G.&.W. 000080
F213C803 02778B26 0F8B260C 5EC40387 00889AF8 76FFFA76 FF026A00 6A014CE9 ÕL.j.j..vª.v½.....á^.&..&.w..à.· 0000A0
044F8B26 0C5EC403 8300889A FC76FFFE 76FF026A 006A0277 89260F89 26065EC4 á^.&..&.w.j.j..v±.v=...*.á^.&.O. 0000C0
F876FFFA 76FF026A 006A00F9 E9067789 26044F89 26065EC4 F213C803 06778B26 &.w..à.·á^.&.O.&.w.Õª.j.j..vª.v½ 0000E0
0C5EC402 7789260F 8926065E C4F213C8 03027788 260F8B26 0C5EC404 3600889A ...6.á^.&..&.w..à.·á^.&..&.w.á^. 000100
578B2608 478B260C 5EC400B9 E9065789 26044789 26065EC4 0E578B26 0C478B26 &.G.&.W.á^.&.G.&.W.Õ¿.á^.&.G.&.W 000120
57892604 47892606 5EC40657 8B260447 8B260C5E C4025789 26078926 065EC40A .á^.&..&.W.á^.&.G.&.W.á^.&.G.&.W 000140
FE76FF02 6A006A02 57892607 8926065E C40A578B 2608478B 260C5EC4 008BE906 .Õ..á^.&.G.&.W.á^.&..&.W.j.j..v± 000160
8926044F 8926065E C4F213C8 0306778B 26044F8B 260C5EC4 02C7008B 9AFC76FF .v=...ú.á^.&.O.&.w..à.·á^.&.O.&. 000180
002FE91F A5A5A5A5 DA8E1EF0 8BFB8B00 08050E56 8B0C468B 065EC400 4AE90677 w.ÕJ.á^..F..V.....«.Þ..ÕÉÉÉ.Õ/. 0001A0
7003A603 13035304 89A7FF2E 93C003FF EFE90376 000A3000 26E9002F E98C63B8 ¡c.Õ/.Õ&.=..v.Õÿ..à...Ï..S...Ï.p 0001C0
000000C8 000ACAC9 5F5E1F00 00E90000 B8045503 E6041404 7002E602 8E02A604 .Ï...Ì.p...Ì.U.|..Õ...^_èò..à... 0001E0
```

Dump of file SATURN:[PCCOMMON.DUMP.DLL]SHP.TMP;1 on 18-APR-1990 10:52:51.06
File ID (922,23,0)   End of file block 111 / Allocated 112

Virtual block number 17 (00000011), 512 (0200) bytes

```
63B80006 E9037408 460B0646 8B000BE9 03750C46 0B0A468B D88E0231 B81E5657 WV.¡1..Ä.F..F.u.Õ...F..F.t.Õ..¡c 000000
B80006E9 03750000 3DFFFF02 299A0676 FF0876FF 006A0A76 FF0C76FF 0027E98C .Õ'..v..v.j..v..v..)...=..u.Õ..| 000020
468BD88E 0484B81E 56570000 04C80008 CAC95F5E 1F0000E9 0000B800 06E90001 ..Õ..|..Õ...^_èò..à...WV.|Ç..Ä.F 000040
46890320 00889A06 76FF0876 FF026A00 6A005EE9 8C63B800 06E90374 0C460B0A ..F.t.Õ..¡c.Õ¯.j.j..v..v.... ..F 000060
470126FE 568BFC46 8B0A5EC4 02571926 072926FE 568BFC46 8B0A5EC4 FE5689FC =.V±á^..F=.V±&).&.W.á^..F=.V±&.G 000080
26FE568B FC468B0A 5EC40657 19260447 2926FE56 8BFC468B 0A5EC40A 57112608 .&.W.á^..F=.V±&)G.&.W.á^..F=.V±& 0000A0
D88E050A B81E5657 000000C8 0008CAC9 5F5E1F00 00E90000 B80E5711 260C4701 .G.&.W.|..Õ...^_èò..à...WV.|...Ä 0000C0
08568B06 468B0C5E C4005BE9 0A468B00 87E98C63 B80006E9 03740E46 0B0C468B .F..F.t.Õ..¡c.Õ¯...F.ÕX.á^..F..V. 0000E0
5EC40054 E90A5711 26084701 2608568B 06468B0C 5EC40068 E9025711 26070126 &..&.W.Õh.á^..F..V.&.G.&.W.ÕT.á^ 000100
260C4701 2608568B 06468B0C 5EC40040 E9065711 26044701 2608568B 06468B0C ..F..V.&.G.&.W.Õ@.á^..F..V.&.G.& 000120
3DFFD3E9 03750002 3DFFC7E9 03750001 3D0023E9 002CE98C 63B8002C E90E5711 .W.Õ,.¡c.Õ,.Õ#.=..u.Õú.=..u.Õ«.= 000140
C8000ACA C95F5E1F 0000E900 008BFFD4 E9FF9BE9 03750008 3DFF90E9 03750004 ..u.Õ..=..u.Õ..Õå.|..Õ...^_èò..à 000160
8902571B 26072B26 0E5EC402 578B2607 8B26125E C408BE05 8CB81E56 57000024 $..WV.|...Äá^.&..&.W.á^.&+.&.W.. 000180
E25689E0 46890A57 1B260847 2B26125E C402578B 26078B26 0E5EC4EA 5689E846 FÕ.Võá^.&..&.W.á^.&+G.&.W..FÅ.Vã 0001A0
260E5EC4 E65689E4 46890657 1B260447 2B260E5E C406578B 2604478B 26125EC4 á^.&.G.&.W.á^.&+G.&.W..FÕ.VÌá^.& 0001C0
563BEA56 8BE8468B FE5689FC 46890E57 1B260C47 2B26125E C406578B 2604478B .G.&.W.á^.&+G.&.W..F=.V±.FÕ.Võ;V 0001E0
```

Dump of file SATURN:[PCCOMMON.DUMP.DLL]SHP.TMP;1 on 18-APR-1990 10:52:51.06
File ID (922,23,0) End of file block 111 / Allocated 112

Virtual block number 18 (00000012), 512 (0200) bytes

```
8BFA5689 F84689E0 468BE256 8B0006E9 0372E046 3B0008E9 037D0013 E9037EE2 ã-.Õ..).Õ..;FÁr.Õ...Vã.FÁ.F½.V'. 000000
FC468BFE 568B0006 E90372FC 463B0008 E9037D00 13E9037E FE563BE6 568BE446 Fõ.V|;V±-.Õ..).Õ..;F•r.Õ...V±.F• 000020
72F4463B 0008E903 7D0013E9 037EF656 3BFA568B F8468B06 5EC4F656 89F44689 .F¶.V-á^..F½.V';V--.Õ..).Õ..;F¶r 000040
E2568BE0 468B0010 E9037C00 E27E8302 57892607 8926F446 8BF6568B 0006E903 .Õ...V-.F¶&..&.W..-ã.|.Õ...FÁ.Vã 000060
8B0010E9 037C00EA 7E830E56 89DC4689 E2568BE0 468B0006 E9DAF700 D283D8F7 ¼Ä.Ø.¼ÖÕ...FÁ.Vã.FÉ.VB.-õ.|.Õ... 000080
E9037D00 34E9037E DE563BEA 568BE846 8B0006E9 DAF700D2 83D8F7EA 568BE846 FÒ.Võ¼Ä.Ø.¼ÖÕ...FÒ.Võ;VB-.Õ4.).Õ 0000A0
DAF700D2 83D8F7EA 568BE846 8B0010E9 037C00EA 7E830027 E90372DC 463B0008 ..;FÉr.Õ'..-õ.|.Õ...FÒ.Võ¼Ä.Ø.¼Ö 0000C0
E2568BE0 468B0010 E9037C00 E27E8300 24E90004 EE46C7F2 4689E846 8B0003E9 Õ...FÒ.F·úFŸ..Õ$..-ã.|.Õ...FÁ.Vã 0000E0
468B0010 E9037C00 FE7E8300 08EE46C7 F24689E0 468B0003 E9DAF700 D283D8F7 ¼Ä.Ø.¼ÖÕ...FÁ.F·úFŸ...-±.|.Õ...F 000100
037C00E6 7E83DE56 89DC4689 FE568BFC 468B0006 E9DAF700 D283D8F7 FE568BFC •.V±¼Ä.Ø.¼ÖÕ...F•.V±.FÉ.VB.-Ì.|. 000120
34E9037E DE563BE6 568BE446 8B0006E9 DAF700D2 83D8F7E6 568BE446 8B0010E9 Õ...FÕ.V|¼Ä.Ø.¼ÖÕ...FÕ.V|;VB-.Õ4 000140
83D8F7E6 568BE446 8B0010E9 037C00E6 7E830027 E90372DC 463B0008 E9037D00 .).Õ..;FÉr.Õ'..-Ì.|.Õ...FÕ.V|¼Ä. 000160
468B0010 E9037C00 FE7E8300 24E90001 EC46C7F0 4689E446 8B0003E9 DAF70002 Ø.¼ÖÕ...FÕ.FÞúF§..Õ$..-±.|.Õ...F 000180
7CF24639 F0468B00 02EC46C7 F04689FC 468B0003 E9DAF700 D283D8F7 FE568BFC •.V±¼Ä.Ø.¼ÖÕ...F•.FÞúF§...FÞ9F·| 0001A0
001FE903 7D00027F 8326065E C4078926 0A5EC4EC 468B0003 E9EE468B 0006E903 .Õ...FŸÕ...F§á^.&..á^.&....).Õ.. 0001C0
B8025789 26078926 065EC499 F04603F2 468B0011 E9037700 3F832600 09E9037E -.Õ..&.?.w.Õ...F·.FÞ.á^.&..&.W.¡ 0001E0
```

Dump of file SATURN:[PCCOMMON.DUMP.DLL]SHP.TMP;1 on 18-APR-1990 10:52:51.06
File ID (922,23,0) End of file block 111 / Allocated 112

Virtual block number 19 (00000013), 512 (0200) bytes

```
8B26078B 26125EC4 D88E0637 8B1E5657 000018C8 0010CAC9 5F5E1F00 00E90000 ..Õ...^_èò..à...WV.¡7..Äá^.&..&. 000000
125EC402 578B2607 8B260E5E C4F25689 F046890A 57182608 4728260E 5EC40257 W.á^.&+Ḡ.&.W..FÞ.V·á^.&..&.W.á^. 000020
0C472B26 0E5EC406 578B2604 478B2612 5EC4EA56 89E84689 0A571B26 08472B26 &+G.&.W..FÒ.Võá^.&.G.&.W.á^.&+G. 000040
0E571B26 0C472B26 125EC406 578B2604 478B260E 5EC4EE56 89EC4689 0E571B26 &.W..F§.VŸá^.&.G.&.W.á^.&+G.&.W. 000060
06E90372 E8463B00 08E9037D 0013E903 7EEA563B F2568BF0 468BFE56 89FC4689 .F•.V±.FÞ.V·;Võ~.Õ..).Õ..;FÒr.Õ. 000080
0008E903 7D0013E9 037EFE56 3BEE568B EC468BFA 5689F846 89E8468B EA568B00 ..Võ.FÒ.F½.V'.F§.VŸ;V±-.Õ..).Õ.. 0000A0
8B0016E9 03751446 0B12468B F65689F4 4689FC46 8BFE568B 0006E903 72FC463B ;F•r.Õ...V±.F•.F¶.V-.F..F.u.Õ... 0000C0
00B8065E C4004DE9 8C638B00 06E90374 08460806 468B0008 E9037514 46081246 F..F.u.Õ...F..F.t.Õ..¡c.ÕM.á^.¡. 0000E0
037C00F6 7E83F846 89FA4689 0000B800 09E9037C 00FA7E83 07892602 47892600 .&.G.&...-'.|.Õ..¡...F'.F½.--.|. 000100
89260789 26F65613 F44603FA 568BF846 8B065EC4 F44689F6 46890000 B80009E9 Õ..¡...F-.F¶á^..F½.V'.F¶.V-&..&. 000120
460B0E46 8B088E08 C4B81E56 5700002C C80010CA C95F5E1F 0000E900 00B80257 W.¡..Õ...^_èò..à,..WV.¡á..Ä.F..F 000140
E98C63B8 0006E903 7408460B 06468B00 0BE90375 0C460B0A 468B0016 E9037510 .u.Õ...F..F̄.u.Õ...F..F.t.Õ..¡c.Õ 000160
5639FA56 8BF8468B 1FA5F200 0889DA8E 1E0716F0 8BF07E8D 10568B0E 468B01A9 `..F..V..-Þ.Þ....Õ¿...·È..F½.V'9V 000180
8BDE5689 DC4689F2 568BF046 8B0024E9 0377F046 390008E9 037E0031 E9037DF2 ·).Õ1.-.Õ..9FÞw.Õ$..FÞ.V·.FÉ.VB. 0001A0
F65639FE 568BFC46 8BFA5689 F84689DE 568BDC46 8BF25689 F04689FA 568BF846 F½.V'.FÞ.V·.FÉ.VB.F½.V'.F•.V±9V- 0001C0
468BDA56 89D84689 F6568BF4 468B0024 E90377F4 46390008 E9037E00 31E9037D ).Õ1.-.Õ..9F¶w.Õ$..F¶.V-.FÄ.VÕ.F 0001E0
```

Dump of file SATURN:[PCCOMMON.DUMP.DLL]SHP.TMP;1 on 18-APR-1990 10:52:51.06
File ID (922,23,0) End of file block 111 / Allocated 112

Virtual block number 20 (00000014), 512 (0200) bytes

```
8BE07E8D 0C568B0A 468BFE56 89FC4689 DA568BD8 468BF656 89F44689 FE568BFC •.V±.F¶.V-.FÄ.VÕ.F•.V±.F..V..-Á. 000000
390008E9 037E0031 E9037DE2 5639EA56 8BE8468B 1FA5F200 0889DA8E 1E0716F0 Þ....Õ¿...·È..FÒ.Võ9Vã).Õ1.-.Õ..9 000020
8BE25689 E04689EA 568BE846 8B065689 D44689E2 568BE046 8B0024E9 0377E046 FÁw.Õ$..FÁ.Vã.Få.Vø.FÒ.Võ.FÁ.Vã. 000040
46390008 E9037E00 31E9037D E65639EE 568BEC46 8BEA5689 E84689D6 568BD446 Få.Vø.FÒ.Võ.F§.VŸ9V|).Õ1.-.Õ..9F 000060
468BE656 89E44689 EE568BEC 468BDA56 89D84689 E6568BE4 468B0024 E90377E4 õw.Õ$..FÕ.V|.FÄ.VÕ.F§.VŸ.FÕ.V|.F 000080
F0463900 08E9037D 0064E903 7EF25639 EA568BE8 468BEE56 89EC4689 DA568BD8 Ä.VÕ.F§.VŸ.FÒ.Võ9V·-.Õd.).Õ..9FÞ 0000A0
003CE903 76E04639 0008E903 7D0049E9 037EE256 39FA568B F8468B00 57E90376 v.ÕW..F½.V'9Vã~.ÕI.).Õ..9FÁv.Õ<. 0000C0
568BFC46 8B0021E9 0376F446 390008E9 037D002E E9037EF6 5639EE56 8BEC468B .F§.VŸ9V--.Õ..).Õ..9F¶v.ÕI..F•.V 0000E0
C400008B 0003E900 01B80006 E90376E4 46390008 E9037D00 13E9037E E65639FE ±9V|~.Õ..).Õ..9Fõv.Õ..¡..Õ..¡..á 000100
468BD88E 0A07B81E 56570000 2CC8000C CAC95F5E 1F0000E9 00008807 8926065E ^.&..¡..Õ...^_èò..à,..WV.¡...Ä.F 000120
B80006E9 03740846 0806468B 0008E903 750C460B 0A468B00 16E90375 1046080E ..F.u.Õ...F..F̄.u.Õ...F..F.t.Õ..¡ 000140
568BF846 8B1FA5F2 000889DA 8E1E0716 F08BF07E 8D10568B 0E468B01 A9E98C63 c.Õ`..F..V..-Þ.Þ....Õ¿...·È..F½.V 000160
89DC4689 F2568BF0 468B0024 E90377F0 46390008 E9037E00 31E9037D F25639FA '9V·).Õ1.-.Õ..9FÞw.Õ$..FÞ.V·.FÉ. 000180
FE568BFC 468BFA56 89F84689 DE568BDC 468BF256 89F04689 FA568BF8 468BDE56 VB.F½.V'.FÞ.V·.FÉ.VB.F½.V'.F•.V± 0001A0
56890846 89F6568B F4468B00 24E90377 F4463900 08E9037E 0031E903 7DF65639 9V-).Õ1.-.Õ..9F¶w.Õ$..F¶.V-.FÄ.V 0001C0
8D0C568B 0A468BFE 5689FC46 89DA568B D8468BF6 5689F446 89FE568B FC468BDA Õ.F•.V±.F¶.V-.FÄ.VÕ.F•.V±.F..V.. 0001E0
```

```
Dump of file SATURN:[PCCOMMON.DUMP.DLL]SHP.TMP;1 on 18-APR-1990 10:52:51.06
File ID (922,23,0)   End of file block 111 / Allocated 112

Virtual block number 21 (00000015), 512 (0200) bytes

 E9037E00 31E9037D E25639EA 568BE846 8B1FA5F2 0008B90A 8E1E0716 F08BE07E ~Å.Þ....Õ¿...É..FÒ.Võ9Vã).Õ1.-.Õ 000000
 89E04689 EA568BE8 46880656 89D44689 E2568BE0 46880024 E90377E0 46390008 ..9FÅw.Õ$..FÅ.Vã.Få.Vø.FÒ.Võ.FÅ. 000020
 08E9037E 0031E903 7DE65639 EE568BEC 468BEA56 89E84689 D6568BD4 468BE256 Vã.Få.Vø.FÒ.Võ.F$.VŸ9V|).Õ1.-.Õ. 000040
 5689E446 89EE568B EC4688DA 56890846 89E6568B E4468B00 24E90377 E4463900 .9FÕw.Õ$..FÕ.V|.FÄ.VÖ.F$.VŸ.FÕ.V 000060
 0008E903 7E0064E9 037DF256 39E2568B E0468BEE 5689EC46 89DA568B D8468BE6 |.FÄ.VÖ.F$.VŸ.FÅ.Vä9V·).Õd.~.Õ.. 000080
 0376F846 390008E9 037D0049 E9037EFA 5639EA56 8BE8468B 0057E903 73F04639 9FÞs.ÕW..FÒ.Võ9V'~.ÕI.).Õ..9F½v. 0000A0
 46880021 E90373F4 46390008 E9037E00 2EE9037D F65639E6 568BE446 8B003CE9 Õ<..FÕ.V|9V~).Õ..-.Õ..9F¶s.Õ1..F 0000C0
 880003E9 00018800 06E90376 FC463900 08E9037D 0013E903 7EFE5639 EE568BEC $.VŸ9V±~.Õ..).Õ..9F•v.Õ..|..Õ..| 0000E0
 8E08EAB8 1E565700 002CC800 0CCAC95F 5E1F0000 E9000088 07892606 5EC40000 ..á^.&..|..Õ...^_èò..à,..WV.|õ.. 000100
 0A468800 48E90374 10460B0E 468802A0 E98C63B8 0006E903 74084608 06468BD8 Ä.F..F.t.Õ..|c.Õ...F..F.t.ÕH..F. 000120
 26064789 26000088 065EC407 89260247 89260000 88065EC4 003DE903 740C4608 .F.t.Õ=.á^.|..&.G.&..á^.|..&.G.& 000140
 880C4789 260E4789 26000088 065EC408 4789260A 47892600 0088065E C4044789 .G.á^.|..&.G.&.G.á^.|..&.G.&.G.| 000160
 DA8E1E07 16F088F0 7E8D1056 880E4688 0094E903 7510460B 0E468802 4DE98C63 c.ÕM..F..F.u.Õ...F..V..-Þ.Þ....Õ 000180
 24E90377 F0463900 08E9037E 0031E903 7DF25639 FA568BF8 46881FA5 F20008B9 ¿...É..F½.V'9V·).Õ1.-.Õ..9FÞw.Õ$ 0001A0
 89DE568B DC468BF2 5689F046 89FA568B F8468B0E 56890C46 89F2568B F0468800 ..FÞ.V·.FÉ.VB.F½.V'.FÞ.V·.FÉ.VB. 0001C0
 0024E903 77F44639 0008E903 7E0031E9 037DF656 39FE568B FC468BFA 5689F846 F½.V'.F•.V±9V-).Õ1.-.Õ..9F¶w.Õ$. 0001E0

Dump of file SATURN:[PCCOMMON.DUMP.DLL]SHP.TMP;1 on 18-APR-1990 10:52:51.06
File ID (922,23,0)   End of file block 111 / Allocated 112

Virtual block number 22 (00000016), 512 (0200) bytes

 46890A56 88D8468B F65689F4 4689FE56 88FC4688 DA5689D8 4689F656 88F4468B .F¶.V~.FÄ.VÖ.F•.V±.F¶.V~.FÄ.VÖ.F 000000
 B9DA8E1E 0716F08B E07E8D0C 56880A46 880094E9 03750C46 080A468B FE5689FC •.V±.F..F.u.Õ...F..V..~Å.Þ....Õ¿ 000020
 0024E903 77E04639 0008E903 7E0031E9 037DE256 39EA568B E84688 1F A5F20008 ..·É..FÒ.Võ9Vã).Õ1.-.Õ..9FÅw.Õ$. 000040
 46890656 88D4468B E25689E0 4689EA56 88E8468B D65689D4 4689E256 88E0468B .FÅ.Vã.Få.Vø.FÒ.Võ.FÅ.Vã.Få.Vø.F 000060
 880024E9 0377E446 390008E9 037E0031 E9037DE6 5639EE56 88EC468B EA5689E8 Ò.Võ.F$.VŸ9V|).Õ1.-.Õ..9FÕw.Õ$.. 000080
 EC4689DA 56880846 8BE65689 E44689EE 568BEC46 8BDA5689 D84689E6 568BE446 FÕ.V|.FÄ.VÖ.F$.VŸ.FÕ.V|.FÄ.VÖ.F$ 0000A0
 768DF888 065EC400 17E90375 0C460B0A 46880022 E9037410 460B0E46 88EE5689 .VŸ.F..F.t.Õ"..F..F.u.Õ..¿^..«.v 0000C0
 460B0E46 880022E9 03740C46 080A4688 00E2E900 00881FA5 F20008B9 1F161EE0 Å...¿...É.|..Õã..F..F.t.Õ" F..F 0000E0
 065EC400 85E90000 881FA5F2 0008891F 161EF076 8DF88806 5EC40017 E9037510 .u.Õ..á^..«.vÞ...¿...É.|..Õ, ^^. 000100
 468BE256 880006E9 0377E046 380008E9 037E0013 E9037DE2 563BF256 8BF0468B .FÞ.V·;Vã).Õ..-.Õ..;FÅw.Õ...Vã.F 000120
 463B0008 E9037E00 13E9037D E6563BF6 568BF446 88065EC4 02578926 078926E0 Å&..&.W.á^..F¶.V-;V|).Õ..-.Õ..;F 000140
 EA563BFA 568BF846 8B065EC4 06578926 04478926 E4468BE6 56880006 E90377E4 Õw.Õ...V|.FÕ&.G.&.W.á^..F½.V';Võ 000160
 0A578926 08478926 E8468BEA 56880006 E90372E8 463B0008 E9037D00 13E9037E -.Õ..).Õ..;FÒr.Õ...Võ.FÒ&.G.&.W. 000180
 56880006 E90372EC 463B0008 E9037D00 13E9037E EE563BFE 568BFC46 8B065EC4 á^..F•.V±;VŸ-.Õ..).Õ..;F$r.Õ...V 0001A0
 1E565700 002CC800 0CCAC95F 5E1F0000 E9000088 0E578926 0C478926 EC468BEE Ÿ.F$&.G.&.W.|..Õ...^_èò..à,..WV. 0001C0
 460B0E46 880016E9 03751446 0B12468B 0021E903 750C460B 0A4688D8 8E0DCD88 |ë..Ä.F..F.u.Õ|..F..F̄.u.Õ...F..F 0001E0

Dump of file SATURN:[PCCOMMON.DUMP.DLL]SHP.TMP;1 on 18-APR-1990 10:52:51.06
File ID (922,23,0)   End of file block 111 / Allocated 112

Virtual block number 23 (00000017), 512 (0200) bytes

 F07E8D14 56881246 8B0296E9 8C63B800 06E90374 08460B06 4688000B E9037510 .u.Õ...F..F.t.Õ..|c.Õ...F..V..-Þ 000000
 0008E903 7E0031E9 037DF256 39FA568B F8468B1F A5F20008 B9DA8E1E 0716F08B .Þ....Õ¿...É..F½.V'9V·).Õ1.-.Õ.. 000020
 F25689F0 4689FA56 8BF8468B DE5689DC 4689F256 88F0468B 0024E903 77F04639 9FÞw.Õ$..FÞ.V·.FÉ.VB.F½.V'.FÞ.V· 000040
 390008E9 037E0031 E9037DF6 5639FE56 88FC468B FA5689F8 4689DE56 88DC4688 .FÉ.VB.F½.V'.F•.V±9V-).Õ1.-.Õ..9 000060
 88F65689 F44689FE 568BFC46 88DA5689 D84689F6 568BF446 880024E9 0377F446 F¶w.Õ$..F¶.V-.FÄ.VÖ.F•.V±.F¶.V-. 000080
 A5F20008 B9DA8E1E 0716F08B E07E8D10 56880E46 88FE5689 FC4689DA 56880846 FÄ.VÖ.F•.V±.F..V..~Å.Þ....Õ¿...É 0000A0
 88E0468B 0024E903 77E04639 0008E903 7E0031E9 037DE256 39EA568B E84688 1F ..FÒ.Võ9Vã).Õ1.-.Õ..9FÅw.Õ$..FÅ. 0000C0
 EA5689E8 46890656 88D4468B E25689E0 4689EA56 88E8468B D65689D4 4689E256 Vã.Få.Vø.FÒ.Võ.FÅ.Vã.Få.Vø.FÒ.Võ 0000E0
 568BE446 880024E9 0377E446 390008E9 037E0031 E9037DE6 5639EE56 88EC468B .F$.VŸ9V|).Õ1.-.Õ..9FÕw.Õ$..FÕ.V 000100
 88EE5689 EC4689DA 56880846 8BE65689 E44689EE 568BEC46 88DA5689 D84689E6 |.FÄ.VÖ.F$.VŸ.FÕ.V|.FÄ.VÖ.F$.VŸ. 000120
 EE568BEC 46880051 E90376F0 46390008 E9037D00 5EE9037E F25639EA 568BE846 FÒ.Võ9V·~.Õ^.).Õ..9FÞv.ÕQ..F$.VŸ 000140
 037DFA56 39E2568B E0468800 36E90376 F4463900 08E9037D 0043E903 7EF65639 9V~~.ÕC.).Õ..9F¶v.Õ6..FÅ.Vä9V'). 000160
 037D0052 E9037EFE 5639E656 88E4468B 001BE903 73F84639 0008E903 7E0028E9 Õ(.-.Õ..9F½s.Õ...FÕ.V|9V±~.ÕR.). 000180
 89260000 880A5EC4 07892602 47892600 00880A5E C40045E9 0372FC46 390008E9 Õ..9F•r.ÕE.á^.|..&.G.&..á^.|..&. 0001A0
 89260E47 89260000 880A5EC4 08478926 0A478926 0000880A 5EC40447 89260647 G.&.G.á^.|..&.G.&.G.á^.|..&.G.&. 0001C0
 568BF046 880A5EC4 000107C7 26065EC4 00BDE900 00880000 07C72606 5EC40C47 G.á^.&ú...|..Õ§.á^.&ú...á^..FÞ.V 0001E0
```

Dump of file SATURN:[PCCOMMON.DUMP.DLL]SHP.TMP;1 on 18-APR-1990 10:52:51.06
File ID (922,23,0)   End of file block 111 / Allocated 112

Virtual block number 24 (00000018), 512 (0200) bytes

```
26078926 E04688E2 56880006 E90372E0 463B0008 E9037D00 13E9037E E25638F2 ·;Vã-.Õ..).Õ..;FÁr.Õ...Vã.FÂ&..& 000000
06E90372 E4463800 08E9037D 0013E903 7EE6563B F6568BF4 46880A5E C4025789 .W.á^..F¶.V-;V|-.Õ..).Õ..;Fõr.Õ. 000020
0013E903 7DEA563B FA568BF8 46880A5E C4065789 26044789 26E4468B E6568800 ..V|.FÕ&.G.&.W.á^..F½.V';Võ).Õ.. 000040
46880A5E C40A5789 26084789 26E8468B EA568800 06E90377 E8463800 08E9037E ~.Õ..;FÒw.Õ...Võ.FÒ&.G.&.W.á^..F 000060
26EC468B EE568800 06E90377 EC463800 08E9037E 0013E903 7DEE563B FE568BFC •.V±;VÝ).Õ..-.Õ..;Fšw.Õ...VÝ.F$& 000080
D88E1091 B81E5657 000008C8 0010CAC9 5F5E1F00 00E90000 B80E5789 260C4789 .G.&.W.¦..Õ...^_èò..à...WV.¦...Ä 0000A0
01B80006 E9037402 57392600 0FE90374 0739260A 5EC40257 8B26078B 260E5EC4 á^.&..&.W.á^.&9¯t.Õ..&9W.t.Õ..¦. 0000C0
000FE903 74084739 260E5EC4 02578B26 078B260A 5EC4FA46 89000088 0003E900 .Õ..¦...F'á^.&..&.W.á^.&9G.t.Õ.. 0000E0
06578B26 04478B26 0E5EC4FE 46890000 B80003E9 0001B800 06E90374 0A573926 &9W.t.Õ..¦..Õ..¦...F±á^.&.G.&.W. 000100
46890000 B80003E9 0001B800 06E90374 06573926 000FE903 74044739 260A5EC4 á^.&9G.t.Õ..&9W.t.Õ..¦..Õ..¦...F 000120
06E90374 06573926 000FE903 74044739 260A5EC4 0E578B26 0C478B26 0E5EC4F8 ½á^.&.G.&.W.á^.&9G.t.Õ..&9W.t.Õ. 000140
E0C1FE46 8BF00303 E0C1F846 8B04E6C1 FA768BFC 46890000 B80003E9 0001B800 .¦..Õ..¦...F•.v'èl..F½éÂ..Þ.F±êÂ 000160
90000CCA C95F5E1F 0000E900 00B80789 26065EC4 0042808B E3D1FC5E 8BF00302 ..Þ.^•¦D..B.á^.&..¦..Õ...^_èò... 000180
00030033 02030000 000B136C 00020000 000A052C 00020000 000204E5 00020005 ....!.......,........l.......3... 0001A0
6A0A76FF D88EFFFF B81E5657 000006C8 00000000 00000022 000300DA 02030014 ....Õ..."........à...WV.¦...Ä.v.j 0001C0
C4004DE9 8C62B800 06E90375 00FE7E83 FE468900 00FFFF9A 5016FA46 8D106A0C .j..F'.P......F±.-±.u.Õ..¦b.ÕM.á 0001E0
```

Dump of file SATURN:[PCCOMMON.DUMP.DLL]SHP.TMP;1 on 18-APR-1990 10:52:51.06
File ID (922,23,0)   End of file block 111 / Allocated 112

Virtual block number 25 (00000019), 512 (0200) bytes

```
00008BFA 5EC40447 89260647 89260000 B8FA5EC4 07892602 47892600 00B8FA5E ^'¦..&.G.&..á^'¦..&.G.&.G.á^'¦.. 000000
26FC568B FA468B06 5EC40C47 89260E47 89260000 B8FA5EC4 08478926 0A478926 &.G.&.G.á^'¦..&.G.&.G.á^..F'.V•& 000020
8BD88E00 08B81E56 57000000 C80006CA C95F5E1F 0000E900 00B80257 89260789 ..&.W.¦..Õ...^_èò..à...WV.¦...Ä. 000040
003D0000 FFFF9A06 76FF0876 FF0A76FF 0022E98C 63B80006 E9037408 460B0646 F..F.t.Õ..¦c.Õ"..v..v..v......•. 000060
1E565700 0026C800 06CAC95F 5E1F0000 E90000B8 0006E98C 62B80006 E9037500 .u.Õ..¦b.Õ..¦..Õ...^_èò..à&..WV. 000080
E90000FA 46C7F856 89F64689 0C56880A 4688F456 8CF24689 E2468D08 8E008BB8 ¦...Ä.Fã.F·.V¶.F..V.¯F-.V¼úF'..Õ 0000A0
078B26F6 5EC40269 E9037C02 FA7E83FA 46FFF856 89F64689 14568B12 4688000F ...F..V..F-.V½.F'.-'.|.Õi.á^-&.. 0000C0
04478926 F25EC406 57882604 478B26F6 5EC40257 89260789 26F25EC4 02578B26 &.W.á^·&..&.W.á^-&.G.&.W.á^·&.G. 0000E0
04478B26 0E5EC40A 57892608 478926F2 5EC40257 8B26078B 260E5EC4 06578926 &.W.á^.&..&.W.á^·&.G.&.W.á^.&.G. 000100
0A573926 F25EC402 57882607 8826F25E C40E5789 260C4789 26F25EC4 06578B26 &.W.á^·&.G.&.W.á^·&..&.W.á^·&9W. 000120
DE468902 57882607 8826F25E C40036E9 03720847 39260009 E9037D00 44E9037E -.ÕD.).Õ..&9G.r.Õ6.á^·&..&.W..FB 000140
5688DE46 88F25EC4 02578926 078926F2 5EC40A57 8B260847 8826F25E C4E05689 .VÁá^·&.G.&.W.á^·&..&.W.á^·.FB.V 000160
0046E903 7D065739 26F25EC4 0E578B26 0C478B26 F25EC40A 57892608 478926E0 Á&.G.&.W.á^·&.G.&.W.á^·&9W.).ÕF. 000180
C4DC5689 DA468906 57882604 478826F2 5EC40038 E9037704 47392600 09E9037E ~.Õ..&9G.w.Õ8.á^·&.G.&.W..FÖ.VÉá 0001A0
89260C56 88DA4688 F25EC406 57892604 478926F2 5EC40E57 8B260C47 8826F25E ^·&.G.&.W.á^·&.G.&.W.á^·.FÖ.VÉ&. 0001C0
037E00FA 8302571B 26072B26 F25EC40A 57882608 478826F2 5EC40E57 89260C47 G.&.W.á^·&.G.&.W.á^·&+.&.W..'.~. 0001E0
```

Dump of file SATURN:[PCCOMMON.DUMP.DLL]SHP.TMP;1 on 18-APR-1990 10:52:51.06
File ID (922,23,0)   End of file block 111 / Allocated 112

Virtual block number 26 (0000001A), 512 (0200) bytes

```
2B26F25E C40E578B 260C478B 26F25EC4 0031E903 7200023D 0008E903 7D003EE9 Õ>.).Õ..=..r.Õ1.á^·&.G.&.W.á^·&+ 000000
03E90001 B80006E9 03720002 3D0008E9 037D0013 E9037E00 FA830657 1B260447 G.&.W..'.-.Õ..).Õ..=..r.Õ..¦..Õ. 000020
82E9037D 0A573926 065EC402 57882607 8826F25E C4FE5689 FC468999 0000B800 .¦....F•.V±á^·&..&.W.á^.&9W.).Õ. 000040
0A573926 F25EC402 57882607 8826065E C40074E9 03730847 39260009 E9037E00 .~.Õ..&9G.s.Õt.á^.&..&.W.á^·&9W. 000060
5EC40E57 8B260C47 8826065E C40050E9 03730847 39260009 E9037E00 5EE9037D ).Õ^.~.Õ..&9G.s.ÕP.á^.&.G.&.W.á^ 000080
260C478B 26F25EC4 002BE903 76044739 260009E9 037D0039 E9037E06 573926F2 ·&9W.-.Õ9.).Õ..&9G.v.Õ+.á^·&.G.& 0000A0
0001B800 06E90376 04473926 0009E903 7D0014E9 037E0657 3926065E C40E578B .W.á^.&9W.-.Õ..).Õ..&9G.v.Õ..¦.. 0000C0
26165EC4 0001B800 0FE90375 FE460BFC 46880044 E9037500 003D0000 B80003E9 Õ..¦..=..u.ÕD..F•.F±u.Õ..¦..á^.& 0000E0
1056BB0E 46880A5E C40003E9 125EC400 06E90374 00FA7E83 002AE900 44E90789 ..ÕD.Õ*..-'.t.Õ..á^.Õ..á^..F..V. 000100
0003E900 03E90375 FE460BFC 46880017 E90000B8 1FA5A5A5 A5DA8E1E F08BFB8B .«.Þ..ÕEEEE.¦..Õ...F•.F±u.Õ..Õ.. 000120
14460B12 4688D88E 0001B81E 56570000 50C8C8C9 5F5E1F00 00E90001 B8FD7FE9 Õ.»¦..Õ...^_èùàP..WV.¦1..Ä.F..F. 000140
460B0646 88000BE9 03750C46 080A4688 0016E903 7510460B 0E468800 21E90375 u.Õ!..F..F.ū.Õ...F..F.u.Õ...F..F 000160
8B05ECE9 8C638800 0007C726 065EC400 08E90375 08460806 46880019 E9037408 .t.Õ...F..F.u.Õ..á^.&ú...¦c.Õ$.. 000180
5EC4FE56 8CFC4689 EC468D1F A5F20008 B9DA8E1E 0716F08B EC7E8D0C 56880A46 F..V..~$.Þ....Õ¿..·Ë..F$.F•.V±á^ 0001A0
E9037208 47392600 09E9037D 0044E903 7E0A5739 26FC5EC4 02578B26 078B26FC •&..&.W.á^•&9W.-.ÕD.).Õ..&9G.r.Õ 0001C0
FC5EC40A 57882608 478B26FC 5EC4EA56 89E84689 02578B26 078B26FC 5EC40036 6.á^•&..&.W..FÒ.Võá^•&.G.&.W.á^• 0001E0
```

```
Dump of file SATURN:[PCCOMMON.DUMP.DLL]SHP.TMP;1 on 18-APR-1990 10:52:51.06
File ID (922,23,0)   End of file block 111 / Allocated 112

Virtual block number 27 (0000001B), 512 (0200) bytes

 260C4788 26FC5EC4 0A578926 08478926 EA568BE8 4688FC5E C4025789 26078926 &..&.W.á^=.FÒ.Võ&.G.&.W.á^=&.G.& 000000
 FC5EC400 38E90377 04473926 0009E903 7E0046E9 037D0657 3926FC5E C40E5788 .W.á^=&9W.).ÕF.-.Õ..&9G.w.Õ8.á^= 000020
 04478926 FC5EC40E 5788260C 478826FC 5EC4E656 89E44689 06578826 04478826 &.G.&.W..FÕ.V|á^=&.G.&.W.á^=&.G. 000040
 06578826 04478826 0E5EC40E 5789260C 478926E6 5688E446 88FC5EC4 06578926 &.W.á^=.FÕ.V|&.G.&.W.á^.&.G.&.W. 000060
 C4025788 26078826 0E5EC400 1EE90375 06573926 0009E903 74044739 26125EC4 á^.&9G.t.Õ..&9W.u.Õ..á^.&..&.W.á 000080
 26125EC4 E2568CE0 46890046 8D01C5E9 03740257 392601CE E9037407 3926125E ^.&9.t.Õö.&9W.t.Õé..FÅ.FÅ.Vëá^.& 0000A0
 8926E05E C4065788 26044788 26125EC4 02578926 078926E0 5EC40257 88260788 ..&.W.á^Å&..&.W.á^.&.G.&.W.á^Å&. 0000C0
 88260E5E C40A5789 26084789 26E05EC4 02578826 0788260E 5EC40657 89260447 G.&.W.á^.&..&.W.á^Å&.G.&.W.á^.&. 0000E0
 3926E05E C4025788 26078826 E05EC40E 5789260C 478926E0 5EC40657 88260447 G.&.W.á^Å&.G.&.W.á^Å&..&.W.á^Å&9 000100
 89025788 26078826 E05EC400 36E90372 08473926 0009E903 7D0044E9 037E0A57 W.-.ÕD.).Õ..&9G.r.Õ6.á^Å&..&.W.. 000120
 E44688E0 5EC40257 89260789 26E05EC4 0A578826 08478826 E05EC4E6 5689E446 FÕ.V|á^Å&.G.&.W.á^Å&..&.W.á^Å.FÕ 000140
 E9037D06 573926E0 5EC40E57 88260C47 8826E05E C40A5789 26084789 26E65688 .V|&.G.&.W.á^Å&.G.&.W.á^Å&9W.).Õ 000160
 5689E846 89065788 26044788 26E05EC4 0038E903 77044739 260009E9 037E0046 F.-.Õ..&9G.w.Õ8.á^Å&.G.&.W..FÒ.V 000180
 EA568BE8 4688E05E C4065789 26044789 26E05EC4 0E578826 0C478826 E05EC4EA Õá^Å&.G.&.W.á^Å&.G.&.W.á^Å.FÒ.Võ 0001A0
 037E0082 E9037D0A 573926FC 5EC40257 88260788 26E05EC4 0E578926 0C478926 &.G.&.W.á^Å&..&.W.á^=&9W.).Õ..-. 0001C0
 E9037D0A 573926E0 5EC40257 88260788 26FC5EC4 0074E903 73084739 260009E9 Õ..&9G.s.Õt.á^=&..&.W.á^Å&9W.).Õ 0001E0

Dump of file SATURN:[PCCOMMON.DUMP.DLL]SHP.TMP;1 on 18-APR-1990 10:52:51.06
File ID (922,23,0)   End of file block 111 / Allocated 112

Virtual block number 28 (0000001C), 512 (0200) bytes

 3926E05E C40E5788 260C4788 26FC5EC4 0050E903 73084739 260009E9 037E005E ^.-.Õ..&9G.s.ÕP.á^=&.G.&.W.á^Å&9 000000
 0E578826 0C478826 E05EC400 28E90376 04473926 0009E903 7D0039E9 037E0657 W.-.Õ9.).Õ..&9G.v.Õ+.á^Å&.G.&.W. 000020
 0003E900 01880006 E9037604 47392600 09E9037D 0014E903 7E065739 26FC5EC4 á^=&9W.-.Õ..).Õ..&9G.v.Õ..|..Õ.. 000040
 D246C700 C8D046C7 0300E903 16E90000 B80F8926 065EC441 C9180001 30000088 |..=...èAá^.&..|..Õ..Õ..ÚFÅà.ÚF# 000060
 07392600 08E9037E 0081E903 7D025739 26125EC4 02578826 078826FC 5EC40000 ..á^=&..&.W.á^.&9W.).Õ..-.Õ..&9. 000080
 0009E903 7E005EE9 037D0A57 3926FC5E C4025788 26078826 125EC400 74E90373 s.Õt.á^.&..&.W.á^=&9W.).Õ^.-.Õ.. 0000A0
 0039E903 7D065739 26125EC4 06578826 04478826 FC5EC400 50E90373 08473926 &9G.s.ÕP.á^=&.G.&.W.á^.&9W.).Õ9. 0000C0
 06573926 125EC40E 5788260C 478826FC 5EC4002B E9037304 47392600 09E9037E -.Õ..&9G.s.Õ+.á^=&.G.&.W.á^.&9W. 0000E0
 7400003D 00008800 03E90001 B80006E9 03760447 39260009 E9037D00 14E9037E -.Õ..).Õ..&9G.v.Õ..|..Õ..|..=..t 000100
 260008E9 037E0081 E9037D02 5739260E 5EC40257 88260788 26FC5EC4 00A2E903 .ÕÅ.á^=&..&.W.á^.&9W.).Õ..-.Õ..& 000120
 E9037E00 5EE9037D 0A573926 FC5EC402 57882607 88260E5E C40074E9 03730739 9.s.Õt.á^.&..&.W.á^=&9W.).Õ^.-.Õ 000140
 E9037D06 5739260E 5EC40657 88260447 8826FC5E C40050E9 03730847 39260009 ..&9G.s.ÕP.á^=&.G.&.W.á^.&9W.).Õ 000160
 39260E5E C40E5788 260C4788 26FC5EC4 002BE903 73044739 260009E9 037E0039 9.-.Õ..&9G.s.Õ+.á^=&.G.&.W.á^.&9 000180
 00300000 B80003E9 00018800 06E90376 04473926 0009E903 7D0014E9 037E0657 W.-.Õ..).Õ..&9G.v.Õ..|..Õ..|..=. 0001A0
 88124688 000007C7 26065EC4 0187E900 00880001 07C72606 5EC4000E E9037500 .u.Õ..á^.&ú...|..Õñ.á^.&ú....F.. 0001C0
 8E1E0716 F088BC7E 8D105688 0E46881F A5A5A5A5 DA8E1E07 16F088C8 7E801456 V..-à.Þ....ÕÉÉÉ..F..V..-¥.Þ.... 0001E0

Dump of file SATURN:[PCCOMMON.DUMP.DLL]SHP.TMP;1 on 18-APR-1990 10:52:51.06
File ID (922,23,0)   End of file block 111 / Allocated 112

Virtual block number 29 (0000001D), 512 (0200) bytes

 568CC446 898C468D BA568CB8 46898046 8DE2568C E04689C8 46801FA5 A5A5A5DA ÕÉÉÉ..Fà.FÅ.Vã.F¯.F|.V¤.F¥.Fá.V 000000
 CA568BC8 4688026A 006A011E E90375D0 0800025E 8301D06E 83025688 D04688C6 á.FÅ.V#.nÅ..^#..Åu.Õ..j.j..Fà.Vò 000020
 C04603CE 5688CC46 88026A00 6AB25689 B0468908 9800889A 50528E56 13BC4603 .F¥.V/RP......F¯.Vÿj.j..Fä.Vö.Fá 000040
 57392688 5EC40257 88260788 26FC5EC4 B6568984 4689FFFF 00889A50 52C25613 .VÕRP......FÇ.VÑá^=&..&.W.á^|&9W 000060
 FC5EC402 57882607 8826885E C40074E9 03730739 260008E9 037E0081 E9037D02 .).Õ..-.Õ..&9.s.Õt.á^|&..&.W.á^= 000080
 88260447 8826FC5E C40050E9 03730847 39260009 E9037E00 5EE9037D 0A573926 &9W.).Õ^.-.Õ..&9G.s.ÕP.á^=&.G.&. 0000A0
 26FC5EC4 002BE903 73044739 260009E9 037E0039 E9037D06 57392688 5EC40657 W.á^|&9W.).Õ9.-.Õ..&9G.s.Õ+.á^=& 0000C0
 06E90376 04473926 0009E903 7D0014E9 037E0657 3926885E C40E5788 260C4788 .G.&.W.á^|&9W.-.Õ..).Õ..&9G.v.Õ. 0000E0
 0068E900 00880001 07C72606 5EC4000E E9037500 00300000 B80003E9 00018800 .|..Õ..|..=..u.Õ..á^.&ú...|..Õk. 000100
 C99AFC76 FFFE76FF E076FFE2 76FF8876 FF8A76FF C476FFC6 76FF0676 FF0876FF .v..v..vó.vá.v¤.v|.vã.vÅ.v±.v=.è 000120
 E9037000 28E9037E 00D27E83 FECDE900 03E90003 E9037500 003D14C4 83FFFF00 ....á.=..u.Õ..Õ..Õè±.-#.-.Õ(.).Õ 000140
 10406800 6A006268 1E007A68 1E016A00 6A016A00 6A001AE9 03760000 7E830009 ...-Å.v.Õ..j.j.j.j..hz..h¬.j.hã. 000160
 4688088E 0386881E 56570000 46C80010 CAC95F5E 1F0000E9 00008800 00FFFF9A .....|..Õ...^_èò..àF..WV., ..Ä.F 000180
 56880846 88078926 DC468900 0088105E C40002DE 46C7E256 89E04689 0A568808 ..V..FÅ.VãúFB¯.á^.|...FÉ&.. °..V 0001A0
 7E0031E9 037DC856 39005688 CE46881F A5F20008 B9DA8E1E 0716F088 C67E800A ..-ó.Þ....Õ¿..·E..FÕ.VÅ9Vã).Õ1.- 0001C0
 46890056 88CE4688 C45689C2 4689C856 88C64688 0024E903 77C64639 0008E903 .Õ..9Fóu.Õs..Fó.Vã.FÕ.Vá.FÕ.VÅ.F 0001E0
```

Dump of file SATURN:[PCCOMMON.DUMP.DLL]SHP.TMP;1 on 18-APR-1990 10:52:51.06
File ID (922,23,0)   End of file block 111 / Allocated 112

Virtual block number 30 (0000001E), 512 (0200) bytes

037E0031 E9037DCC 56390456 8BD2468B D05689CE 4689C456 8BC2468B C85689C6 6.Và.Fò.Vá.Fö.VÅ.F@.Vå9Vä).ô1.-. 000000
CA4689D4 568BD246 8BC05689 BE4689CC 568BCA46 8B0024E9 0377CA46 390008E9 Õ..9Fòw.Õ$..Fò.Vä.Ff.Vå.F@.Vå.Fò 000020
89DA8E1E 0716F08B EC7E8D0E 568B0C46 8BD45689 D24689C0 568BBE46 8BCC5689 .Vä.Ff.Vå.F@.Vå.F..V..-š.Þ....Õ¿ 000040
0024E903 77EC4639 0008E903 7E0031E9 037DEE56 39F6568B F446881F A5F20008 ..·É..F¶.V-9VŸ).Õ1.-.Õ..9Fšw.Õ$. 000060
46898C56 8B8A468B EE5689EC 4689F656 8BF4468B 8C5689BA 4689EE56 8BEC468B .Fš.VŸ.Fα.V¥.F¶.V-.Fš.VŸ.Fα.V¥.F 000080
8B0024E9 0377F046 390008E9 037E0031 E9037DF2 5639FA56 8BF8468B F65689F4 ¶.V-.F½.V°9V·).Õ1.-.Õ..9FÞw.Õ$.. 0000A0
F84689C0 568BBE46 8BF25689 F04689FA 568BF846 8BC05689 BE4689F2 568BF046 FÞ.V·.Ff.Vå.F½.V°.FÞ.V·.Ff.Vå.F½ 0000C0
46890E56 8B0C468B 001EE9FE 568CFC46 89EC468D D8568CD6 4689C646 8DFA5689 .V°.Fó.Fø.VÄ.Fš.F=.V±Õ...F..V..F 0000E0
7500003D DE4EFFDE 468BFE56 8CFC4689 C6468DD8 568CD646 89EC468D E25689E0 Å.Vä.Fš.Fø.VÄ.Fó.F=.V±.FB.NB=..u 000100
32E9037C 02DA7E83 DA46FF00 03E90000 DA46C701 49E9037C 02DC7E83 0152E903 .ÕR..-É.|.Õ1.úFÕ..Õ...FÕ.-Õ.|.Õ2 000120
E906468B 1FA5A5A5 A5DA8E1E 0716F08B E47E8DD8 568BD646 0303E0C1 DA468B01 ..FÕêÅ..Fø.VÄ.-Õ.Þ....ÕÉÉÉ..F.Õ 000140
20E90376 07392600 08E9037D 002DE903 7E025739 26E6568B E4468BFC 5EC40094 ..é^=.FÕ.V|&9W.-.Õ-.).Õ..&9.v.Õ 000160
03E90372 08473926 0009E903 7D0011E9 037E0A57 3926E656 8BE4468B FC5EC400 .é^=.FÕ.V|&9W.-.Õ..).Õ..&9G.r.Õ. 000180
39260009 E9037D00 2EE9037E 06573926 EA568BE8 468BFC5E C40062E9 FF91E900 .Õ..Õb.é^=.FÕ.Võ&9W.-.Õ..).Õ..&9 0001A0
39260009 E9037D00 11E9037E 0E573926 EA568BE8 468BFC5E C40020E9 03760447 G.v.Õ .é^=.FÕ.Võ&9W.-.Õ..).Õ..&9 0001C0
023DFF64 E9037500 013D0013 E90092E9 8C638800 1CE9FF4B E90003E9 03720C47 G.r.Õ..ÕK.Õ..¡c.Õ..Õ..=..u.Õd.=. 0001E0

Dump of file SATURN:[PCCOMMON.DUMP.DLL]SHP.TMP;1 on 18-APR-1990 10:52:51.06
File ID (922,23,0)   End of file block 111 / Allocated 112

Virtual block number 31 (0000001F), 512 (0200) bytes

A5A5A51F 161EE476 8DF88814 5EC40013 E9037400 DC7E83FF E4E9FFA1 E9037500 .u.ÕÅ.Õõ..-É.t.Õ..é^..«.vÕ...ÉÉÉ 000000
C4001EE9 03740257 39260027 E9037407 3926E656 8BE4468B 145EC400 48E91FA5 É.ÕH.é^..FÕ.V|&9.t.Õ'.&9W.t.Õ..é 000020
185EC4FE D8E90003 E9037406 57392600 0CE90374 04473926 EA568BE8 468B145E ^..FÕ.Võ&9G.t.Õ..&9W.t.Õ..ÕÅ±é^. 000040
88078926 DC468810 5EC4FE82 E9FEC2E9 DC46FF1F A5A5A5A5 1F161EE4 7680F88B .«.vÕ...ÉÉÉÉ..FÉÕõ±Õ.±é^..FÉ&..¡ 000060
89DC4689 08568806 468BD88E 09CA881E 56570000 48C8C8C9 5F5E1F00 00E90000 ..Õ...^ èùàH..WV.¡ò..Ä.F..V..FÉ. 000080
89DA8E1E 0716F08B C47E8D08 568B0646 88000007 C7260E5E C40002DA 46C7DE56 VBúFÕ..Ā^.&ú....F..V..-é.Þ....Õ¿ 0000A0
568BCC46 881FA5F2 00088 9DA 8E1E0716 F08BEC7E 8D0C5688 0A468B1F A5F20008 ...·É..F..V..-š.Þ....Õ¿...·É .Fä.V 0000C0
89C04689 C6568BC4 46880024 E90377C4 46390008 E9037E00 31E9037D C65639CE ö9Vó).Õ1.-.Õ..9Fów.Õ$..Fé.\ .Fé. 0000E0
D25688D0 468BCE56 89CC4689 C25688C0 468BC656 89C44689 CE5688CC 468BC256 Vó.Fä.Vö.Fé.Vó.Fâ.Vó.Fä.Vö.Fa.V@ 000100
56898C46 89CA568B C8468800 24E90377 C8463900 08E9037E 0031E903 7DCA5639 9Vò).Õ1.-.Õ..9Fàw.Õ$..Fà.Vò.F¥.V 000120
39F6568B F4468B02 56890046 898E568B BC468BCA 5689C846 8902568B D04688BE f.FÅ.V@.Fà.Vò.F¥.Vf.FÅ.V@.F¶.V-9 000140
8A56898B 4689EE56 88EC468B 0024E903 77EC4639 0008E903 7E0031E9 037DEE56 VŸ).Õ1.-.Õ..9Fšw.Õ$..Fš.VŸ.F¡.Vα 000160
5639FA56 8BF8468B F65689F4 46898A56 88884688 EE5689EC 4689F656 8BF4468B .F¶.V-.Fš.VŸ.F¡.Vα.F¶.V-.F½.V°9V 000180
888E5689 BC4689F2 568BF046 8B0024E9 0377F046 390008E9 037E0031 E9037DF2 ·).Õ1.-.Õ..9FÞw.Õ$..FÞ.V·.F¥.Vf. 0001A0
D6568CD4 4689C446 8DFA5689 F84689BE 568BBC46 88F25689 F04689FA 568BF846 F½.V°.FÞ.V·.F¥.Vf.F½.V°.Fé.Få.Vø 0001C0
568CD446 89EC468D DE5689DC 46890C56 880A4688 001EE9FE 568CFC46 89EC468D .Fš.F=.V±Õ...F..V..FÉ.VB.Fš.Få.V 0001E0

Dump of file SATURN:[PCCOMMON.DUMP.DLL]SHP.TMP;1 on 18-APR-1990 10:52:51.06
File ID (922,23,0)   End of file block 111 / Allocated 112

Virtual block number 32 (00000020), 512 (0200) bytes

7C023F83 260E5EC4 0142E903 7500003D DA4EFFDA 468BFE56 8CFC4689 C4468DD6 ø.Fé.F=.V±.FÕ.NÕ=..u.ÕB.é^.&.?.| 000000
460303E0 C1D8468B 011FE903 7C02D87E 83D846FF 0003E900 000846C7 0136E903 .Õ6.úFÄ..Õ...FÄ.-Ä.|.Õ...FÄêÄ..F 000020
02573926 E2568BE0 468BFC5E C41FA5A5 A5A5DA8E 1E0716F0 8BE07E8D D6568BD4 å.Vø.-Å.Þ....ÕÉÉÉÉ.é^=.FÅ.Vä&9W. 000040
7D0A5739 26E2568B E0468BFC 5EC40060 E9037607 39260008 E9037D00 6DE9037E -.Õm.).Õ..&9.v.Õ'.é^=.FÅ.Vä&9W.) 000060
7E065739 26E6568B E4468BFC 5EC40040 E9037308 47392600 09E9037E 004EE903 .ÕN.-.Õ..&9G.s.Õ@.é^=.FÕ.V|&9W.- 000080
7E0E5739 26E6568B E4468BFC 5EC40020 E9037604 47392600 09E9037D 002EE903 .Õ..).Õ..&9G.v.Õ .é^=.FÕ.V|&9W.- 0000A0
003D07FF 26078826 0E5EC4FF 57E90003 E903720C 47392600 09E9037D 0011E903 .Õ..).Õ..&9G.r.Õ..ÕW.é^.&..&..=. 0000C0
5689E846 89185688 16468800 44E9EA56 89E84689 14568812 4688000F E9037400 .t.Õ...F..V..FÕ.VõÕÕ..F..V..FÕ.V 0000E0
4688125E C4001EE9 03740257 39260027 E9037407 3926E256 88E0468B 125EC4EA Õé^..FÅ.Vä&9.t.Õ'.&9W.t.Õ..é^..F 000100
C1D8468B E85EC4FE F3E90003 E9037406 57392600 0CE90374 04473926 E6568BE4 ö.V|&9G.t.Õ..&9W.t.Õ..Õµ±é^Õ.FÄé 000120
0000E900 0088FE92 E9FED5E9 1FA5A5A5 A5DA8E1E F08BF888 DE5688DC 460303E0 Å..FÉ.VB.«.Þ..ÕÉÉÉ.Õ(±Õ.±¡..Õ.. 000140
0C478826 065EC400 0007C726 0E5EC4D8 8E0CC288 1E565700 0068C8CB C95F5E1F .^_èùàh..WV.¡ó..Äé^.&ú...é^.&.G. 000160
065EC40F EE02459A AC5E8DAC 4689AE56 8906571B 2604472B 26065EC4 0E578826 &.Ŵ.é^.&+G.&.W..VÕ.F¯.^¯.E.Ÿ.é^. 000180
0FF30245 9AA85E8D A84689AA 56890257 1826072B 26065EC4 0A578826 08478826 &.G.&.W.é^.&+.&.W..V˙.F´.^´.E.µ. 0001A0
2604472B 260A5EC4 0E578826 0C478826 0A5EC410 1F03759A C85E8D0F FB064D9A .M.«..^à.u...é^.&.G.&.W.é^.&+G.& 0001C0
260A5EC4 0A578826 08478826 0A5EC410 4202459A A85E8DA8 4689AA56 8906571B .W..V˙.F´.^´.E.B.é^.&.G.&.W.é^.& 0001E0

Dump of file SATURN:[PCCOMMON.DUMP.DLL]SHP.TMP;1 on 18-APR-1990 10:52:51.06
File ID (922,23,0)   End of file block 111 / Allocated 112

Virtual block number 33 (00000021), 512 (0200) bytes

```
5A03759A C05E8D10 4F064D9A 10470245 9AAC5E8D AC4689AE 56890257 1B26072B +.&.W..VÛ.F˜.^˜.E.G..M.O..^å.u.Z 000000
3E9A1071 05C89AC8 5E8D106C 02499A1F 8D065EC4 10640249 9A045F8D 065EC410 .é^.._..I.d.é^....I.l..^à.à.q..> 000020
10960249 9A1F8D0A 5EC4108E 02499A04 5F8D0A5E C4108403 759AD85E 8D107906 .y..^Ä.u...é^.._..I...é^....I... 000040
C85E8D10 B301B89A C05E8D10 A803759A D05E8D10 A3063E9A 109805C8 9AC05E8D .^å.à....>.È..^Ä.u.¨..^å.|.°..^à 000060
9A10D201 B89AD85E 8D10CD01 B89AD05E 8D004CE9 037410C5 065C9A10 B801B89A .|.|..\.é.t.ÕL..^Å.|.ë..^Å.|.@.. 000080
76FF0C76 FF0E76FF 1076FF12 76FF1476 FF1676FF 1876FF00 2CE90374 1111065C \...t.Õ,..v..v..v..v..v..v..v..v 0000A0
B89AC05E 8D0310E9 00008800 06E90319 E914C483 09710C8A 9A0676FF 0876FF0A ..v..v..α.q..é.Õ..Õ..|..Õ...^å.| 0000C0
989AD85E 8D113101 B89AD05E 8D112903 759AE85E 8D112105 989AC85E 8D111901 ....^à...|..^Õ.u.)..^Å.|.1..^Ä.. 0000E0
EC831156 061F9A00 3A1E8D08 7B064D9A 114304A1 9A113E01 B89AE85E 8D113905 .9..^Õ.|.>..À.C..M.(...:....V..å 000100
8D1FA5A5 A5A50A8E 1E0716F0 88A07E8D 08C48311 7507839A 115B0375 9ADC8B08 ..É.u.[....u..á..~..Þ....ÕEEEE.. 000120
05C89AD8 5E8D1190 01B89AC0 5E8DE656 89E44689 1188042C 9A117A01 B89AA05E ^..|.z.,.,....Fõ.VÌ.^å.|....^Ä.à. 000140
8D11B605 E09AE85E 8D11AD06 3E9A11A5 05C89AD0 5E8D11A0 01B89AC8 5E8D1198 ...^à.|....^Å.à.È..>.Ù..^Õ.Á.Ñ.. 000160
16F08B98 7E8D08C4 8311DF07 839A11C5 03759ADC 8808EC83 11C0061F 9A003A1E .:....å..§..É.u.é....Ô..é..~..Þ. 000180
88064688 E25689E0 46890FCB 042C9A11 E401B89A 985E8D1F A5A5A5A5 DA8E1E07 ...ÕEEEE..^..|.õ..,..ù..FÁ.Vã.F.. 0001A0
1E0716F0 88F07E8D 0C5680A 468B1FA5 F2000889 DA8E1E07 16F088B0 7E8D0856 V..~¯.Þ....Õ¿..·E..F..V..·Þ.Þ... 0001C0
0377B046 390008E9 037E0031 E9037DB2 56398A56 88B8468B 1FA5F200 0889DA8E .Õ¿..·E..F|.Vα9Vý).Õ1.~.Õ. 9F¯w. 0001E0
```

Dump of file SATURN:[PCCOMMON.DUMP.DLL]SHP.TMP;1 on 18-APR-1990 10:52:51.06
File ID (922,23,0)   End of file block 111 / Allocated 112

Virtual block number 34 (00000022), 512 (0200) bytes

```
5688A846 88B25689 B046898A 5688B846 88AA5689 A84689B2 5688B046 880024E9 Õ$..F¯.Vý.F´.V`.F|.Vα.F¯.Vý.F´.V 000000
E90377B4 46390008 E9037E00 31E9037D B656398E 5688BC46 888A5689 B84689AA ˆ.F|.Vα.F¥.V/9VÑ).Õ1.~.Õ..9FÇw.Õ 000020
9A5688B98 46888656 89B44689 BE5688BC 46889A56 89984689 B65688B4 46880024 $..FÇ.VÑ.F..V..F¥.V/.FÇ.VÑ.F..V. 000040
24E90377 F0463900 08E9037E 0031E903 7DF25639 FA5688F8 4688BE56 89BC4689 .F¥.V/.F½.V¹9V·).Õ1.~.Õ..9FÞw.Õ$ 000060
89A25688 A04688F2 5689F046 89FA5688 F84688A2 5689A046 89F25688 F0468800 ..FÞ.V·.F..VÅ.F½.V¹.FÞ.V·.F..VÅ. 000080
0024E903 77F44639 0008E903 7E0031E9 037DF656 39FE5688 FC4688FA 5689F846 F½.V¹.F=.V±9V-).Õ1.-.Õ..9F¶w.Õ$. 0000A0
46899A56 88984688 F65689F4 4689FE56 88FC4688 9A568998 4689F656 88F44688 .F¶.V-.F..V..F=.V±.F¶.V-.F..V..F 0000C0
8800E6E9 03768046 390008E9 037D00F3 E9037E82 5639E656 88E44688 FE5689FC =.V±.Fõ.VÌ9Vý-.Õµ.).Õ..9F¯v.ÕÌ.. 0000E0
E25688E0 468800C8 E90373B8 46390008 E9037E00 D8E9037D BA5639E6 5688E446 Fõ.VÌ9Vα).ÕÅ.-.Õ..9F|s.Õù..FÁ.Vã 000100
037D8E56 39E25688 E0468800 B0E90376 B4463900 08E9037D 008DE903 7EB65639 9VÑ-.Õ§.).Õ..9FÇv.Õ¯..FÁ.Vã9V/). 000120
037D0087 E9037EF2 5639E656 88E44688 0095E903 73BC4639 0008E903 7E00A2E9 ÕÅ.-.Õ..9F¥s.Õ...Fõ.VÌ9V·-.Õ..). 000140
46390008 E9037E00 6CE9037D FA5639E6 5688E446 88007AE9 0376F046 390008E9 Õ..9FÞv.Õz..Fõ.VÌ9V¹).Õl.-.Õ..9F 000160
44E90376 F4463900 08E9037D 0051E903 7EF65639 E25688E0 4688005F E90373F8 ¥s.Õ_..FÁ.Vã9V--.ÕQ.).Õ..9F¶v.ÕÕ 000180
260E5EC4 0029E903 73FC4639 0008E903 7E0036E9 037DFE56 39E25688 E0468800 ..FÁ¯Vã9V±).Õ6.-.Õ..9F=s.Õ).á^.& 0001A0
478926E2 5688E046 88125EC4 02578926 078926E6 5688E446 88125EC4 000107C7 ú...á^..Fõ.VÌ&..&.W.á^..FÁ.Vã&.G 0001C0
260E5EC4 D88E0F9D 881E5657 000024C8 CBC95F5E 1F0000E9 00008806 57892604 .&.W.|..Õ...^_èùà$..WV.|...Äá^.& 0001E0
```

Dump of file SATURN:[PCCOMMON.DUMP.DLL]SHP.TMP;1 on 18-APR-1990 10:52:51.06
File ID (922,23,0)   End of file block 111 / Allocated 112

Virtual block number 35 (00000023), 512 (0200) bytes

```
0C46080A 46880016 E9037518 460B1646 880021E9 03751846 0B16468B 000007C7 ú....F..F.u.ÕI..F..F.u.Õ...F..F. 000000
FF1476FF 1676FF18 76FF0597 E90000B8 0006E903 74084608 06468800 08E90375 u.Õ...F..F.t.Õ..|..Õ...v..v..v.. 000020
E9037500 F07E83F0 46891504 20019A50 16F2468D 5016F446 8D5016FA 468D1276 v..F¹.P.F¶.P.F·.P.. ...FÞ.-Þ.u.Õ 000040
83000107 C7260E5E C40556E9 0000B800 06E90374 00F27E83 0565E9F0 46880006 ...FÞÕe..~·.t.Õ..|..ÕV.á^.&ú.... 000060
26165EC4 06578B26 04478B26 125EC400 4BE90374 01F47E83 0054E903 7401FA7E ~¹.t.ÕT..~¶.t.ÕK.á^.&.G.&.W.á^.& 000080
1076FF0A 76FF0C76 FF0676FF 0876FF00 28E90374 06573926 0031E903 74044739 9G.t.Õ1.&9W.t.Õ(..v..v..v..v..v. 0000A0
02FA7E83 04E8E916 C48310FA 09C29A01 6A1676FF 1876FF12 76FF1476 FF0E76FF .v..v..v..v..v.j..ô.¹..á.Õ$..~¹. 0000C0
03740739 26165EC4 02578B26 078B2612 5EC40049 E9037402 F47E8300 52E90374 t.ÕR..~¶.t.ÕI.á^.&..&.W.á^.&9.t. 0000E0
76FF0E76 FF1076FF 0A76FF0C 76FF0676 FF0876FF 0028E903 74025739 260031E9 Õ1.&9W.t.Õ(..v..v..v..v..v..v..v 000100
0036E903 7401FA7E 830490E9 16C48314 8409C29A 026A1676 FF1876FF 1276FF14 ..v..v..v.j..ô....á.Õ...~¹.t.Õ6. 000120
165EC402 57892607 89260A5E C40257B8 26078B26 125EC400 2DE90374 02F47E83 .~¶.t.Õ-.á^.&..&.W.á^.&..&.W.á^. 000140
830036E9 037402FA 7E830451 E9065789 26044789 260A5EC4 06578B26 04478B26 &.G.&.W.á^.&.G.&.W.Õα..~¹.t.Õ6.. 000160
26125EC4 02578926 0789260A 5EC40257 8826078B 26165EC4 002DE903 7401F47E ~¶.t.Õ-.á^.&..&.W.á^.&..&.W.á^.& 000180
7E8300F1 E9037402 FA7E8304 12E90657 89260447 89260A5E C40657B8 2604478B .G.&.W.á^.&.G.&.W.Õ...~¹.t.Õþ..~ 0001A0
E6568906 571B2604 47282612 5EC40E57 88260C47 8826125E C400E8E9 037400F4 ¶.t.ÕÕ.á^.&.G.&.W.á^.&+G.&.W..VÌ 0001C0
02571B26 072B2612 5EC40A57 88260847 8826125E C4163C02 459AE45E 8DE44689 .Fõ.^õ.E.<.á^.&.G.&.W.á^.&+.&.W. 0001E0
```

Dump of file SATURN:[PCCOMMON.DUMP.DLL]SHP.TMP;1 on 18-APR-1990 10:52:51.06
File ID (922,23,0)   End of file block 111 / Allocated 112

Virtual block number 36 (00000024), 512 (0200) bytes

```
125EC402 57882607 8826165E C4166306 4D9A1641 02459AE0 5E8DE046 89E25689 .Vã.FÁ.^Á.E.A..M.c.ó^.&..&.W.ó^. 000000
045F8D12 5EC41673 06489A16 6802459A DC5E8DDC 4689DE56 8902571B 26072826 &+.&.W..VB.FÉ.^É.E.h..H.s.ó^.._. 000020
07839A16 9003759A DC8808EC 83168806 1F9A003A 1E8D1681 06579A16 7802499A .I.x..W.......:......å..É.u...... 000040
13042C9A 16AF01B8 9AE85E8D 1FA5A5A5 A5DA8E1E 0716F088 E87E8008 C48316AA `..ó..-Õ.Þ....ÕEEEE..^Õ.|.É...,.. 000060
46880A5E C4025789 26078926 0A5EC402 57882607 8826165E C4F85689 F6468917 ..F-.V½ó^.&..&.W.ó^.&..&.W.ó^..F 000080
E8E90374 00FA7E83 00F1E903 7402F47E 830318E9 06578926 04478926 F85688F6 -.V½&.G.&.W.Õ...-¶.t.Õþ..-*.t.ÕÕ 0000A0
DC5E8DDC 4689DE56 89065718 26044728 26165EC4 0E578826 0C478826 165EC400 .ó^.&.G.&.W.ó^.&+G.&.W..VB.FÉ.^É 0000C0
E04689E2 56890257 18260728 26165EC4 0A578826 08478826 165EC417 3602459A .E.6.ó^.&.G.&.W.ó^.&+.&.W..Vã.FÁ 0000E0
571B2607 2826165E C4025788 26078826 125EC417 5D064D9A 17380245 9AE05E8D .^Á.E.;..M.].ó^.&..&.W.ó^.&+.&.W 000100
9A177202 499A045F 8D165EC4 17600648 9A176202 459AE45E 8DE44689 E6568902 ..VÌ.FÕ.^Õ.E.b..H.m.ó^.._..I.r.. 000120
8D08C483 17A40783 9A178A03 759ADC88 08EC8317 85061F9A 003A1E8D 17780657 W.(...:.......å..É.U......É..ó.. 000140
5689F646 89180D04 2C9A17A9 01889AE8 5E8D1FA5 A5A5A5DA 8E1E0716 F088E87E -Õ.Þ...:.ÕEEEE..^Õ.|.`..,.....F-.V 000160
8926F856 88F64688 0A5EC402 57892607 89260A5E C4025788 26078826 125EC4F8 ½ó^.&..&.W.ó^.&..&.W.ó^..F-.V½&. 000180
8826165E C400EAE9 037400F4 7E8300F3 E9037401 FA7E8302 1EE90657 89260447 G.&.W.Õ...-*.t.Õµ..-¶.t.ÕÕ.ó^.&. 0001A0
C4183102 459ADC5E 8DDC4689 DE568906 571B2604 47282612 5EC40657 88260447 G.&.W.ó^.&+G.&.W..VB.FÉ.^É.E.1.ó 0001C0
459AE05E 8DE04689 E2568906 571B2604 47282612 5EC40E57 88260C47 8826125E ^.&.G.&.W.ó^.&+G.&.W..Vã.FÁ.^Á.E 0001E0
```

Dump of file SATURN:[PCCOMMON.DUMP.DLL]SHP.TMP;1 on 18-APR-1990 10:52:51.06
File ID (922,23,0)   End of file block 111 / Allocated 112

Virtual block number 37 (00000025), 512 (0200) bytes

```
5E8DE446 89E65689 02571826 07282612 5EC40A57 88260847 8826125E C4185402 .T.ó^.&.G.&.W.ó^.&+.&.W..VÌ.FÕ.^ 000000
8D187606 579A186D 02499A1F 8D125EC4 1868064D 9A185E06 4D9A1859 02459AE4 Õ.E.Y..M.^..M.h.ó^....I.m..W.v.. 000020
16F088E8 7E8D08C4 83189F07 839A1885 03759ADC 8808EC83 1880061F 9A003A1E .:........å..É.u..........ó..-Õ.Þ. 000040
880A5EC4 FE5689FC 4689114C 042C9A18 A401B89A E85E8D1F A5A5A5A5 DA8E1E07 ...ÕEEEE..^Õ.|.É...,.L..F*.V±ó^.. 000060
89260447 89260A5E C4065788 26044788 26165EC4 02578926 078926FE 5688FC46 F*.V±&..&.W.ó^.&.G.&.W.ó^.&.G.&. 000080
88260447 8826125E C400EAE9 037400FA 7E8300F3 E9037401 F47E8301 22E90657 W.Õ"..-¶.t.Õµ..-*.t.ÕÕ.ó^.&.G.&. 0000A0
8826165E C4192D02 459ADC5E 8DDC4689 DE568906 571B2604 47282616 5EC40657 W.ó^.&+G.&.W..VB.FÉ.^É.E.-.ó^.&. 0000C0
C4195002 459AE05E 8DE04689 E2568906 571B2604 47282616 5EC40E57 88260C47 G.&.W.ó^.&+G.&.W..Vã.FÁ.^Á.E.P.ó 0000E0
02459AE4 5E8DE446 89E65689 02571826 07282616 5EC40A57 88260847 8826165E ^.&.G.&.W.ó^.&+.&.W..VÌ.FÕ.^Õ.E. 000100
9A003A1E 8D197206 579A1969 02499A1F 8D165EC4 1964064D 9A195A06 4D9A1955 U..M.Z..M.d.ó^....I.|..W.r....:.. 000120
DA8E1E07 16F088E8 7E8D08C4 83199807 839A1981 03759ADC 8808EC83 197C061F ..|..å..É.u..........ó..-Õ.Þ....Õ 000140
5688FC46 880A5EC4 FE5689FC 46891619 042C9A19 A001B89A E85E8D1F A5A5A5A5 EEEE..^Õ.|..........F*.V±ó^..F*.V 000160
26E90657 89260447 89260A5E C4065788 26044788 26125EC4 02578926 078926FE ±&..&.W.ó^.&.G.&.W.ó^.&.G.&.W.Õ& 000180
9A1676FF 1876FF12 76FF1476 FF0E676FF 1076FF0A 76FF0C76 FF0676FF 0876FF00 ..v..v..v..v..v..v..v..v..v..v.. 0001A0
D88E1428 881E5657 00006AC8 0014CAC9 5F5E1F00 00E90000 8814C483 155F0F95 ......ó.|..Õ...^_èÕ..àj..WV.|(..Ã 0001C0
46080E46 880021E9 03751446 08124688 002CE903 7518460B 16468800 00B246C7 ÚF¥...F..F.u.Õ,..F..F.u.Õ|..F..F 0001E0
```

Dump of file SATURN:[PCCOMMON.DUMP.DLL]SHP.TMP;1 on 18-APR-1990 10:52:51.06
File ID (922,23,0)   End of file block 111 / Allocated 112

Virtual block number 38 (00000026), 512 (0200) bytes

```
E98C6388 0006E903 74084608 06468800 08E90375 0C46080A 46880016 E9037510 .u.Õ...F..F.u.Õ...F..F.t.Õ..|c.Õ 000000
1FA5F200 0889DA8E 1E0716F0 88A27E8D 18568816 46880000 07C7260E 5EC405A8 `.ó^.&ú....F..V..-Ã.Þ....Õ¿..`É. 000020
5688A246 880024E9 0377A246 390008E9 037E0031 E9037DA4 5639AC56 88AA4688 .F`.V¯9VÉ).Õ1.-.Õ..9FÁw.Õ$..FÁ.V 000040
88AC5689 AA4689AC 5688E946 88A45689 A24689A0 5688AA46 88A05689 9E4689A4 É.F..V..F`.V¯.FÁ.VÉ.F..V..F`.V`. 000060
A8568BA6 46880024 E90377A6 46390008 E9037E00 31E9037D A8563980 5688AE46 FÕ.V¯9V`).Õ1.-.Õ..9FÌw.Õ$..FÌ.V` 000080
46888056 89AE4689 9C56889A 4688A856 89A64689 805688AE 46889C56 899A4689 .F..V..FÕ.V¯.FÌ.V`.F..V..FÕ.V¯.F 0000A0
E9037D88 5639C056 888E4688 1FA5F200 0889DA8E 1E0716F0 88867E8D 14568812 ..V..-Ñ.Þ....Õ¿..`É..Ff.Vã9V|).Õ 0000C0
56888E46 88985689 96468988 56888646 880024E9 0377B646 390008E9 037E0031 1.-.Õ..9FÑw.Õ$..FÑ.V|.F..V..Ff.V 0000E0
31E9037D 8C5639C4 5688C246 88C05689 8E468998 56889646 88885689 864689C0 à.FÑ.V|.F..V..Ff.Vã.FÕ.Vá9V¥).Õ1 000100
C45688C2 46889C56 899A4689 8C56888A 46880024 E90377BA 46390008 E9037E00 .-.Õ..9Fɑw.Õ$..Fɑ.V¥.F..V..FÕ.Vá 000120
005EE903 7EA45639 C05688BE 4688C456 89C24689 9C56889A 46888C56 89844689 .Fɑ.V¥.F..V..FÕ.Vá.Ff.Vá9VÉ-.Õ^. 000140
0008E903 7E0043E9 037DAC56 39885688 86468800 51E90376 A2463900 08E9037D ).Õ..9FÁv.ÕQ..FÑ.V|9V¯).ÕC.-.Õ.. 000160
0376A646 390008E9 037D0028 E9037EA8 5639C456 88C24688 0036E903 73AA4639 9F`s.Õ6..FÕ.Vá9V`-.Õ(.).Õ..9FÌv. 000180
00880006 E90372AE 46390008 E9037D00 13E9037E 8056398C 5688A46 880018E9 Õ...Fɑ.V¥9V¯-.Õ..).Õ..9FÚr.Õ..|. 0001A0
8DE9037C 04D67E83 0396E903 7C02B27E 830646FF 0003E900 000646C7 0406E900 .Õ..ÚF#..Õ...F#.-ý.|.Õ...-#.|.Õ. 0001C0
E90376A2 46390008 E9037D00 5EE9037E A45639C0 5688BE46 880288E9 D6468803 ..F#Õ...Ff.Vã9VÉ-.Õ^.).Õ..9FÁv.Õ 0001E0
```

```
Dump of file SATURN:[PCCOMMON.DUMP.DLL]SHP.TMP;1 on 18-APR-1990 10:52:51.06
File ID (922,23,0)   End of file block 111 / Allocated 112

Virtual block number 39 (00000027), 512 (0200) bytes

 C2468800 36E90373 AA463900 08E9037E 0043E903 7DAC5639 B85688B6 46880051 Q..FÑ.V¦9V¯).ÕC.-.Õ..9F´s.Õ6..Fô 000000
 5639C456 88C24688 001BE903 76A64639 0008E903 7D0028E9 037EA856 39C4568B .Vé9V´~.Õ(.).Õ..9F|v.Õ...Fô.Vé9V 000020
 89C64689 B85688B6 4688FF76 E90003E9 0372AE46 390008E9 037D0010 E9037EB0 ¯-.Õ..).Õ..9FÛr.Õ..Õv..FÑ.V¦.F6. 000040
 C45688C2 4688D056 89CE4689 C05688BE 4688CC56 89CA4689 C45688C2 4688C856 Và.Fò.Vé.Fò.Vä.Ff.Vâ.Fö.VÅ.Fó.Vé 000060
 76A24639 0008E903 7D005EE9 037EA456 39C05688 BE468802 08E9D456 89D24689 .F0.VåÕ...Ff.Vä9VÊ-.Õ^.).Õ..9FÅv 000080
 8B0036E9 0373AA46 390008E9 037E0043 E9037DAC 5639B856 8BB64688 0051E903 .ÕQ..FÑ.V¦9V¯).ÕC.-.Õ..9F´s.Õ6.. 0000A0
 BC5688BA 46880018 E90376A6 46390008 E9037D00 28E9037E A85639BC 56888A46 F¤.V¥9V´~.Õ(.).Õ..9F|v.Õ...F¤.V¥ 0000C0
 4689B856 88B64688 FED4E900 03E90372 AE463900 08E9037D 0010E903 7EB05639 9V¯~.Õ..).Õ..9FÛr.Õ..Õå±.FÑ.V¦.F 0000E0
 8BBA4688 D05689CE 4689C056 88BE4688 CC5689CA 4689BC56 88BA4688 C85689C6 6.Và.F¤.V¥.Fò.Vä.Ff.Vâ.Fö.VÅ.F¤. 000100
 46390008 E9037D00 5EE9037E A45639B8 56888646 880166E9 D45689D2 4689BC56 V¥.F0.VåÕf..FÑ.V¦9VÊ-.Õ^.).Õ..9F 000120
 36E90373 AA463900 08E9037E 0043E903 7DAC5639 B85688B6 46880051 E90376A2 Åv.ÕQ..FÑ.V¦9V¯).ÕC.-.Õ..9F¯s.Õ6 000140
 8BBA4688 001BE903 76A64639 0008E903 7D0028E9 037EA856 39C4568B C2468800 ..Fô.Vá9V´~.Õ(.).Õ..9F|v.Õ...F¤. 000160
 B85688B6 4688FE32 E90003E9 0372AE46 390008E9 037D0010 E9037EB0 5639BC56 V¥9V¯-.Õ..).Õ..9FÛr.Õ..Õ2±.FÑ.V¦ 000180
 4688D056 89CE4689 B85688B6 4688CC56 89CA4689 BC5688BA 4688C856 89C64689 .F6.Và.F¤.V¥.Fò.Vä.FÑ.V¦.Fö.VÅ.F 0001A0
 0008E903 7D005EE9 037EA456 39C05688 BE468800 C4E9D456 89D24689 C45688C2 ô.Vé.F0.VåÕá..Ff.Vä9VÊ-.Õ^.).Õ.. 0001C0
 0373AA46 390008E9 037E0043 E9037DAC 5639C056 88BE4688 0051E903 76A24639 9FÅv.ÕQ..Ff.Vä9V¯).ÕC.-.Õ..9F¯s. 0001E0

Dump of file SATURN:[PCCOMMON.DUMP.DLL]SHP.TMP;1 on 18-APR-1990 10:52:51.06
File ID (922,23,0)   End of file block 111 / Allocated 112

Virtual block number 40 (00000028), 512 (0200) bytes

 4688001B E90376A6 46390008 E9037D00 28E9037E A85639C4 5688C246 8B0036E9 Õ6..Fò.Vé9V´~.Õ(.).Õ..9F|v.Õ...F 000000
 88BE4688 FD90E900 03E90372 AE463900 08E9037D 0010E903 7EB05639 BC56888A ¤.V¥9V¯~.Õ..).Õ..9FÛr.Õ..Õ.».Ff. 000020
 D05689CE 4689C056 88BE4688 CC5689CA 4689BC56 88BA4688 C85689C6 4689C056 Vä.Fó.Và.F¤.V¥.Fò.Vë.Ff.Vä.Fö.VÅ 000040
 023DFE08 E9037500 013DF071 E90375C0 0B0022E9 D45689D2 4689C456 88C2468B .Fó.Vé.F0.VåÕ"..âu.Õq»=..u.Õ.±=. 000060
 1684468D 5016C646 8D1676FF 1876FF00 00E9FF3F E9037500 033DFEA5 E9037500 .u.ÕE±*..u.Õ7.Õ...v..v..Fó.P.FÇ. 000080
 00FE46C7 FD10E900 03E9037C 01847E83 19F21420 9A5016F0 468D5016 E8468D50 Þ.FÒ.P.FÞ.P. .·..-Ç.|.Õ..Õ.»úF±. 0000A0
 B2468BFC 46FF0003 E90000FC 46C70099 E9037CFE 4639B446 8BFE46FF 0003E900 .Õ...F±.FÇ9F±|.Õ..úF▪..Õ...F▪.Fý 0000C0
 E90374D8 423903E6 C1FC768B EA528BE8 428803E6 C1FE768B 004AE903 7CFC4639 9F▪|.ÕJ..v±è|..BÒ.Rõ.v▪è|.9BÄt.Õ 0000E0
 74DC4239 03E6C1FC 768BEE52 8BEC428B 03E6C1FE 76880025 E90374DA 5239002D ·.9RÖt.Õ%..v±è|..B$.RŸ.v▪è|.9BÉt 000100
 C7260E5E C4000EE9 037F01B2 7E83FFA8 E90039E9 0003E903 74DE5239 0008E903 .Õ..9R8t.Õ..Õ9.Õ´..~ý...Õ..é^.&ú 000120
 0716E872 8DD87B8D 03E7C1B2 46FFB27E 8B03E6C1 FE768800 81E90001 B8000007 ...¦..Õ...v±è|..-ý.Fýèò..(Ä.rò.. 000140
 7CFE4639 B2468BFE 46FF0003 E90000FE 46C7FC5E E9FF59E9 1FA5A5A5 A51F161E ...ÊÊÊÊ.ÕY.Õ^▪úF±..Õ...F±.Fý9F±| 000160
 89F84689 08568B06 46880006 E90C5688 0A468800 09E90374 00FE7E83 0037E903 .Õ7..~±.t.Õ...F..V.Õ...F..V..F½. 000180
 46880E5E C4FF8BE9 1FA5A5A5 A51F161E D8728DFB 8803E6C1 FE768BF8 5EC4FA56 V▪é^½.v±è|..«.rÄ...ÊÊÊÊ.ÕÊ.é^..F 0001A0
 16468BD8 8E1A0C88 1E565700 007CC800 14CAC95F 5E1F0000 E90000B8 07892682 ý&..¦..Õ...^_èò..à|..WV.¦...Ä.F. 0001C0
 63B80006 E9037408 46080646 880008E9 03751446 08124688 0016E903 75184608 .F.u.Õ...F..F.u.Õ...F..F.t.Õ..¦c 0001E0

Dump of file SATURN:[PCCOMMON.DUMP.DLL]SHP.TMP;1 on 18-APR-1990 10:52:51.06
File ID (922,23,0)   End of file block 111 / Allocated 112

Virtual block number 41 (00000029), 512 (0200) bytes

 14568812 46881FA5 F2000889 DA8E1E07 16F088F0 7E801856 88164688 034FE98C .ÕO..F..V..~Þ.Þ....Õ¿..·Ê..F..V. 000000
 0716F076 8DC87E8D 000107C7 26065EC4 1FA5F200 0889DA8E 1E0716F0 8BE07E8D .~Å.Þ....Õ¿..·Ê.é^.&ú....~à.vÞ.. 000020
 E90000AE 46C71FA5 F2000889 1F161E07 16E0768D B87E8D1F A5F20008 891F161E ...¿..·Ê..~¦.vÅ.....¿..·Ê.úFÛ..Õ 000040
 08891F16 1E0716F0 768DB87E 8D1FA5F2 0008891F 161E0716 E0768DC8 7E800025 %..~à.vÅ.....¿..·Ê..~¦.vÞ.....¿. 000060
 7C02AC7E 83AC46FF 0003E900 00AC46C7 01EDE903 7C02AE7E 83AE46FF 1FA5F200 .·Ê..FÛ.-Û.|.ÕÙ.úF¯..Õ...F¯.-¯.| 000080
 46881FA5 A5A5A51F 161E0716 F088087E 8DC103B8 4E8D03E0 C1AC468B 00D8E903 .ÕÄ..F¯êÅ..N¦.è.~Ä.Þ.....ÊÊÊÊ..F 0000A0
 89213401 249A5052 CA561BC8 462BD256 88D0468B 5052CE56 1BCC462B DE5688DC Ê.V8+Fä.VÖRP.FÅ.V0+Fâ.VÒRP.$.4|. 0000C0
 52CE561B CC462BD6 5688D446 885052CA 561BC846 2BDA5688 D84688AA 5689A846 F´.V´.FÄ.VÖ+Fâ.VÒRP.Få.V▪+Fä.VöR 0000E0
 E90374AA 5639001D E90374A8 4639A656 88A4468B A65689A4 46891909 01249A50 P.$....FÊ.V|.FÊ.V|9F´t.Õ..9V´t.Õ 000100
 AA5639A6 5688A446 880042E9 00008042 C7F003E0 D1AC4688 02E6C1AE 76880015 ...vÛè|..F¯1Å.ÞúB¯..ÕB..FÊ.V|9V¯ 000120
 C7F003E0 D1AC468B 02E6C1AE 76880015 E90377A8 46390008 E9037E00 22E9037D ).Õ".-.Õ..9F´w.Õ...vÛè|..F¯1Å.Þú 000140
 C1AE7688 FF1CE900 088042C7 F003E0D1 AC468802 E6C1AE76 880012E9 0004B042 B¯..Õ...vÛè|..F¯1Å.ÞúB¯..Õ...vÛè 000160
 D25688D0 4688008E E9037400 827A8302 E6C1AE76 8800CDE9 03740080 7A8302E6 |..z¯.t.Õë..vÛè|..zý.t.Õf..FÅ.V0 000180
 56390013 E90374CC 4639D656 88D4468B 0021E903 74CA5639 0029E903 74C84639 9Fât.Õ).9Vòt.Õ|..Få.V▪9Fät.Õ..9V 0001A0
 CC468896 56899446 89CA568B C8468800 84E90001 07C72606 5EC4000B E90374CE õt.Õ..é^.&ú...Õ...Fâ.Vò.F..V..Fä 0001C0
 5689A046 89D0568B D446889E 56899C46 89D2568B D046889A 56899846 89CE5688 .Vö.F..V..FÅ.V0.F..V..Få.V▪.F..V 0001E0
```

```
Dump of file SATURN:[PCCOMMON.DUMP.DLL]SHP.TMP;1 on 18-APR-1990 10:52:51.06
File ID (922,23,0)   End of file block 111 / Allocated 112

Virtual block number 42 (0000002A), 512 (0200) bytes

 89C2568B C046888A 56898846 89BE568B BC468886 56898446 89BA568B B8468BA2 Å.F¡.V¤.F..V..F¥.Vƒ.F..V..Fâ.Vð. 000000
 76FF0876 FF501684 468D5016 94468092 56899046 89C6568B C446888E 56898C46 F..V..Fá.Vó.F..V..F..P.F..P.v..v 000020
 428802E6 C1AE768B 0022E900 28E90003 E9037500 3F832606 5EC4FFFF 09FF9A06 ......á^.&.?.u.Õ..Õ(.Õ"..vÛè¦..B 000040
 0E4688FD E5E90003 E9000007 C726065E C4000BE9 03748042 3902E6C1 AE768882 ý.vÛè¦.9B¯t.Õ..á^.&ú...Õ..Õ¦».F. 000060
 260014E9 03740447 3926165E C40E578B 260C478B 26165EC4 005DE903 7510460B .F.u.Õ].á^.&.G.&.W.á^.&9G.t.Õ..& 000080
 165EC402 57882607 8B26165E C40032E9 000107C7 260E5EC4 0008E903 74065739 9W.t.Õ..á^.&ú...Õ2.á^.&..&.W.á^. 0000A0
 0E5EC400 08E90002 07C7260E 5EC4000B E903740A 57392600 14E90374 08473926 &9G.t.Õ..&9W.t.Õ..á^.&ú...Õ..á^. 0000C0
 3926125E C40E578B 260C478B 26125EC4 005DE903 750C460B 0A468800 0007C726 &ú....F..F.u.Õ].á^.&.G.&.W.á^.&9 0000E0
 8B26125E C40032E9 000107C7 260A5EC4 0008E903 74065739 260014E9 03740447 G.t.Õ..&9W.t.Õ..á^.&ú...Õ2.á^.&. 000100
 07C7260A 5EC4000B E903740A 57392600 14E90374 08473926 125EC402 57882607 .&.W.á^.&9G.t.Õ..&9W.t.Õ..á^.&ú. 000120
 02227400 02000714 CAC95F5E 1F0000E9 00008800 0007C726 0A5EC400 08E90002 ..Õ..á^.&ú...¦..Õ...^_èò.....t". 000140
 08200900 02000000 0A210000 02008800 01098101 03000000 031EDE00 02000000 .....8.......Ý........¯!....... . 000160
 00000000 00000000 00000000 00002200 0300AA02 03001400 03001902 03000000 .............ˆ..."............... 000180
 0006E903 740A460B 08468800 08E90375 00067E83 D88EFFFF 881E5657 000004C8 à...WV.¡...Ä.~..u.Õ...F..F.t.Õ.. 0001A0
 880006E9 03750000 300000FF FF9A5016 FC468010 6A0C6A06 76FF006C E98C63B8 ¡c.Õl..v.j.j..F=.P.....=..u.Õ..¡ 0001C0
 4789260E 47892600 0088FC5E C4084789 260A4789 260000B8 FC5EC400 4DE98C62 b.ÕM.á^=¡..&.G.&.G.á^=¡..&.G.&.G 0001E0

Dump of file SATURN:[PCCOMMON.DUMP.DLL]SHP.TMP;1 on 18-APR-1990 10:52:51.06
File ID (922,23,0)   End of file block 111 / Allocated 112

Virtual block number 43 (0000002B), 512 (0200) bytes

 8B085EC4 04478926 06478926 000088FC 5EC40789 26024789 260000B8 FC5EC40C .á^=¡..&.G.&..á^=¡..&.G.&.G.á^.. 000000
 08881E56 57000004 C8CBC95F 5E1F0000 E90000B8 02578926 078926FE 568BFC46 F=.V±&..&.W.¡..Õ...^_èûà...WV.¡. 000020
 0A76FF00 58E98C63 880006E9 03740846 0B06468B 0008E903 75000A7E 83D88E00 ..Ä.~..u.Õ...F..F.t.Õ..¡c.ÕX..v. 000040
 02478926 00008806 5EC40013 E9037500 00300000 00339A50 16FC468D 2E6A0C6A j.j..F=.P.3...=..u.Õ..á^.¡..&.G. 000060
 C4078926 0A4688FC 5EC4A5F2 0017B900 A4BEFB88 FC5EC400 2CE98C62 88078926 &..¡b.Õ,.á^=.«ƒÊ.¿..·Êá^=.F.&..á 000080
 00000EC8 0006CAC9 5F5E1F00 00E90000 88025789 26078926 FE568BFC 4688065E ^..F=.V±&..&.W.¡..Õ...^_èò..à... 0000A0
 880006E9 0374F446 0BF2468B F45689F2 46890856 88064688 D88E009F 881E5657 WV.¡...Ä.F..V..F·.V¶.F·¯F¶t.Õ..¡ 0000C0
 88FA5689 F8468924 57882622 478826F2 5EC4F646 89078826 F25EC400 83E90000 ..Õ..á^·&...F−á^·&.G"&.W$.F½.V'. 0000E0
 76FFF676 FFFE5689 FC46890E 5788260C 478826F8 5EC4003C E90375FA 460BF846 F½.F'u.Õ<.á^½&.G.&.W..F=.V±.v−.v 000100
 F84689FE 568BFC46 880031E9 8C628800 06E90375 00003000 0001809A F876FFFA '.v½.¯...=..u.Õ..¡b.Õ1..F=.V±.F½ 000120
 E98C62B8 0006E903 7500003D 0000FFFF 9AF276FF F476FFF6 76FFFFB9 E9FA5689 .V'Õ¿..v−.v¶.v·.....=..u.Õ..¡b.Õ 000140
 56880A46 88D88E01 24881E56 57000004 C80004CA C95F5E1F 0000E900 00880006 ..¡..Õ...^_èò..à...WV.¡$..Ä.F..V 000160
 8C638800 06E90374 08460806 46880008 E90375FE 460BFC46 88FE5689 FC46890C ..F=.V±.F=¯F±u.Õ...F..F.t.Õ..¡c. 000180
 5E1F0000 E9000088 02578926 07892606 5EC40457 88260247 8826FC5E C4001BE9 Õ..á^=&.G.&.W.á^.&..&.W.¡..Õ...^ 0001A0
 0B0E4688 0008E903 7508460B 06468808 8E010788 1E565700 0008C800 08CAC95F _èò..à...WV.¡=..Ä.F..F.u.Õ...F.. 0001C0
 468900DA 8300012D 04578826 02478826 065EC400 F6E98C63 880006E9 03741046 ¯F.t.Õ..¡c.Õ−.á^.&.G.&.W.·...Õ..F 0001E0

Dump of file SATURN:[PCCOMMON.DUMP.DLL]SHP.TMP;1 on 18-APR-1990 10:52:51.06
File ID (922,23,0)   End of file block 111 / Allocated 112

Virtual block number 44 (0000002C), 512 (0200) bytes

 0008E903 7E0058E9 037D0C56 3BFFFF00 889AF876 FFFA76FF 026A006A FA5689F8 ½.V'j.j..v'.v½.....;V.).Õ, −.Õ.. 000000
 26FC5EC4 0011E9FE 5689FC46 8924578B 2622478B 26065EC4 004BE903 730A463B ;F.s.ÕK.á^.&.G"&.W$.F=.V±ò  á^=& 000020
 6E830C56 880A468B 0018E903 75FE460B FC468BFE 5689FC46 890E578B 260C478B .G.&.W..F=.V±.F=.F±u.Õ...F.....n 000040
 890C561B 0A462BFA 568BF846 88005AE9 FFCCE900 03E90375 D00B000C 5E83010A ...^...Åu.Õ..Õä.ÕZ..F½.V'+F..V.. 000060
 08478826 FC5EC400 11E9FE56 89FC4689 28578826 26478826 065EC40C 56890A46 F..V.á^.&.G&&.W(.F=.V±Õ..á^=&.G. 000080
 83010A6E 830C568B 0A468800 18E90375 FE460BFC 468BFE56 89FC4689 0A578826 &.W..F=.V±.F=.F±u.Õ...F..V..n... 0000A0
 00008802 57892607 8926FE56 88FC4688 0E5EC4FF CCE90003 E90375D0 08000C5E ^...Åu.Õ..Õä.á^..F=.V±&..&.W.¡.. 0000C0
 F25689F0 46891256 8810468B D88E022D 881E5657 000014C8 CBC95F5E 1F0000E9 Õ...^_èûà...WV.¡-..Ä.F..V..Fþ.V· 0000E0
 C40020E9 037D000E 7E830029 E9037508 460B0646 880034E9 0375F246 0BF0468B .Fþ.F¯u.Õ4..F..F.u.Õ)..~..).Õ .á 000100
 880006E9 03720247 39260009 E9037D00 14E9037E 04573926 0E56880C 468BF05E ^þ.F..V.&9W.~.Õ..).Õ..&9G.r.Õ..¡ 000120
 56880646 88EC5EC4 06C48305 2200009A 37FF26F0 5EC45016 EC468001 F0E98C63 c.Õþ..F§.Pá^þ&.7..."..á.á^§.F..V 000140
 26000AE9 037D0057 E9037E00 047F8326 F05EC41F A5A5A5A5 DA8E1EF0 8BF88808 ..«.þ..ÕEEEE.á^þ&....~.ÕW.).Õ..& 000160
 EC468BF0 5EC4019B E98C63B8 0006E903 750E460B 0C468800 48E90372 01027F83 ....r.ÕH..F..F.u.Õ..¡c.Õ..á^þ.F§ 000180
 26F05EC4 28578926 26478926 EE568BEC 468BF05E C4245789 26224789 26EE568B .VŸ&.G"&.W$á^þ.F§.VŸ&.G&&.W(á^þ& 0001A0
 0E56880C 46880009 E9037400 0A7E8301 64E90000 88000004 47C72600 010247C7 úG...&úG...¡..Õd..~..t.Õ...F..V. 0001C0
 F6460BF4 468BF656 89F44689 0E5618OC 462B0457 88260247 8826F05E C40011E9 Õ..á^þ&.G.&.W.+F..V..F¶.V−.F¶.F− 0001E0
```

```
Dump of file SATURN:[PCCOMMON.DUMP.DLL]SHP.TMP;1 on 18-APR-1990 10:52:51.06
File ID (922,23,0)   End of file block 111 / Allocated 112

Virtual block number 45 (0000002D), 512 (0200) bytes

 26FA5688 F84688EC 5EC4FA56 89F84689 24578826 22478826 F05EC400 47E90374 t.ÕG.á^Þ&.G"&.W$.F½.V*á^ś.F½.V*& 000000
 5688EC46 8BF05EC4 0A578926 08478926 EE5688EC 4688F85E C40E5789 260C4789 .G.&.W.á^½.F&.VY&.G.&.W.á^Þ.F&.V 000020
 39260050 E9037402 473926F6 5688F446 8BF05EC4 00D6E924 57892622 478926EE Y&.G"&.W$Õø.á^Þ.F¶.V-&9G.t.ÕP.&9 000040
 5688F846 8BEC5EC4 FA5689F8 46892857 88262647 8826F05E C40047E9 03740457 W.t.ÕG.á^Þ&.G&&.W(.F½.V*á^ś.F½.V 000060
 EC4688F0 5EC40E57 89260C47 8926EE56 8BEC4688 F85EC40A 57892608 478926FA *&.G.&.W.á^½.F&.VY&.G.&.W.á^Þ.F& 000080
 9AF076FF F276FFF4 76FFF676 FF5016FC 46800074 E9285789 26264789 26EE5688 .VY&.G&&.W(Õt..F=.P.v~.v¶.v·.vÞ. 0000A0
 0A578826 08478826 FC5EC400 60E90001 880006E9 03750000 300CC483 FFFF0225 %....á.=..u.Õ..|..Õ'.á^=&.G.&.W. 0000C0
 26FC5EC4 0E578926 0C478926 FE5688FC 4688EC5E C40A5789 26084789 26EC5EC4 á^ś&.G.&.W.á^ś.F=.V±&.G.&.W.á^=& 0000E0
 89260847 8926EE56 8BEC4688 FC5EC40E 5789260C 478926EE 5688EC46 8B085FC4 á_..F&.VY&.G.&.W.á^=.F&.VY&.G.&. 000100
 00000CC8 000ECAC9 5F5E1F00 00E90000 88000457 83260102 478326F0 5EC40A57 W.á^Þ&.G..&.W..|..Õ...^_èÒ..à... 000120
 830029E9 0375F646 08F44688 F65689F4 46890E56 880C4688 D88E0350 881E5657 WV.|P..Ä.F..V..F¶.V-.F¶.F-u.Õ).. 000140
 260009E9 037D0014 E9037E04 5739260A 56880846 8BF45EC4 0020E903 7D000A7E ~..).Õ .á^¶.F..V.&9W.-.Õ..).Õ..& 000160
 00047F83 26006FE9 03740102 7F8326F4 5EC401DC E98C6388 0006E903 76024739 9G.v.Õ..|c.ÕÉ.á^¶&....t.Õo.&.... 000180
 26F45EC4 37FF26F4 5EC401B4 E98C6388 0006E903 750A4608 08468800 65E90374 t.Õe..F..F u.Õ..|c.ÕÇ.á^¶&.7á^¶& 0001A0
 000088F4 5EC40190 E98C6288 0006E903 7500003D 00000185 9A2277FF 262477FF .W$&.W"......=..u.Õ..|b.Õ..á^¶|.. 0001C0
 04478926 000088F4 5EC42647 89262847 89260000 88F45EC4 22478926 24478926 &.G$&.G"á^¶|..&.G(&.G&á^¶|..&.G. 0001E0

Dump of file SATURN:[PCCOMMON.DUMP.DLL]SHP.TMP;1 on 18-APR-1990 10:52:51.06
File ID (922,23,0)   End of file block 111 / Allocated 112

Virtual block number 46 (0000002E), 512 (0200) bytes

 26F45EC4 0017E90A 56880846 880009E9 03740006 7E830160 E90000B8 02478926 &.G.|..Õ`..~..t.Õ...F..V.Õ..á^¶& 000000
 74FA4608 F84688FA 5689F846 89000A83 00012D0A 56180846 28045788 26024788 .G.&.W.+F..V.-...Õ..F½.V*.F½.F*t 000020
 0E578826 0C478826 FC5EC4FE 5689FC46 89245788 26224788 26F45EC4 003CE903 .Õ<.á^¶&.G"&.W$.F=.V±á^=&.G.&.W. 000040
 008BE908 4789260A 47892600 0088225F C426F45E C4245789 26224789 26F45EC4 á^¶&.G"&.W$á^¶&á_"|..&.G.&.G.Õ|. 000060
 3CE90374 FA563800 44E90374 F8463800 DA830001 2D045788 26024788 26F45EC4 á^¶&.G.&.W.-...Õ.;F½t.ÕD.;V*t.Õ< 000080
 F45EC40A 57882608 478826FC 5EC4FE56 89FC4689 28578826 26478826 F45EC400 .á^¶&.G&&.W(.F=.V±á^=&.G.&.W.á^¶ 0000A0
 FC468D00 5BE90C47 89260E47 89260000 88265FC4 26F45EC4 28578926 26478926 &.G&&.W(á^¶&á_&|..&.G.&.G.Õ[..F= 0000C0
 01880006 E9037500 003D0CC4 83038302 259AF476 FFF676FF F876FFFA 76FF5016 .P.v*.v½.v~.v¶.X.*..á.=..u.Õ..|. 0000E0
 5EC40E57 89260C47 8926085F C426FC5E C40E5788 260C4788 26FC5EC4 0066E900 .Õf.á^=&.G.&.W.á^=&á_.&.G.&.W.á^ 000100
 76FF37FF 26F45EC4 0A578926 08478926 0C5FC426 FC5EC40A 57882608 478826FC =&.G.&.W.á^=&á_.&.G.Ī.W.á^¶&.7.v 000120
 2601026F 8326F45E C40013E9 8C628800 06E90375 00003000 0006289A FC76FFFE ±.v=.(...=..u.Õ..|b.Õ..á^) .o..& 000140
 10468808 8E05A4B8 1E565700 0008C800 0ACAC95F 5E1F0000 E90000B8 00045F83 ...|..Õ...^_èÒ..à...WV.|É.....F. 000160
 830029E9 03750846 08064688 0034E903 75FA4608 F84688FA 5689F846 89125688 .V..F½.V*.F½.F*u.Õ4..F..F.u.Õ).. 000180
 260009E9 037D0014 E9037E04 5739260E 56880C46 8BF85EC4 0020E903 7D000E7E ~..).Õ .á^½.F..V.&9W.-.Õ..).Õ..& 0001A0
 880C4688 0009E903 74000A7E 835016FC 468D0067 E98C6388 0006E903 76024739 9G.v.Õ..|c.Õg..F=.P.~..t.Õ...F.. 0001C0
 76FF5052 000A8300 012D0E56 180C4628 04578826 02478826 F85EC400 17E90E56 V.Õ..á^½&.G.&.W.+F..V.-...Õ.RP.v 0001E0

Dump of file SATURN:[PCCOMMON.DUMP.DLL]SHP.TMP;1 on 18-APR-1990 10:52:51.06
File ID (922,23,0)   End of file block 111 / Allocated 112

Virtual block number 47 (0000002F), 512 (0200) bytes

 064688FC 5EC4001B E90001B8 0006E903 7500003D 0CC48307 5102259A F876FFFA *.v½.X.Q..á.=..u.Õ..|..Õ..á^=.F. 000000
 00000CC8 000ECAC9 5F5E1F00 00E90000 881FA5A5 A5A5DA8E 1EF088FB 88085688 .V..«.Þ..ÕEEEE.|..Õ...^_èÒ..à... 000020
 880034E9 0375F646 08F44688 F65689F4 46891256 88104688 D88E07D9 881E5657 WV.|)..Ä.F..V..F¶.V-.F¶.F-u.Õ4.. 000040
 04573926 0E56880C 4688F45E C40020E9 037D000E 7E830029 E9037508 46080646 F..F.u.Õ)..~..).Õ .á^¶.F..V.&9W. 000060
 E9037400 0A7E8300 71E98C63 880006E9 03760247 39260009 E9037D00 14E9037E ~.Õ..}.Õ..&9G.v.Õ..|c.Õq..~..t.Õ 000080
 8300012D 0E56180C 46280457 88260247 8826F45E C40017E9 0E56880C 46880009 ...F..V.Õ..á^¶&.G.&.W.+F..V.-... 0000A0
 C4830867 02259AF4 76FFF676 FFF876FF FA76FF50 16FC468D FA5689F8 4689000A Õ..F½.V*.F=.P.v*.v½.v~.v¶.X.g..á 0000C0
 A5DA8E1E F088FB88 FE5688FC 4688065E C4001BE9 00018800 06E90375 00003D0C .=..u.Õ..|..Õ..á^..F=.V±.«.Þ..ÕE 0000E0
 0A4688D8 8E08A4B8 1E565700 0004C800 0ECAC95F 5E1F0000 E90000B8 1FA5A5A5 EEE.|..Õ...^_èÒ..à...WV.|É..Ä.F. 000100
 880006E9 03740846 08064688 0008E903 75FE4608 FC4688FE 5689FC46 890C5688 .V..F=.V±.F=.F±u.Õ...F..F.t.Õ..| 000120
 881FA5A5 A5A5DA8E 1EF088FB 88065EC4 24578826 22478826 FC5EC400 20E98C63 c.Õ .á^=&.G"&.W$á^..«.Þ..ÕEEEE.| 000140
 46890C56 880A4688 D88E0979 881E5657 000004C8 0008CAC9 5F5E1F00 00E90000 ..Õ...^_èÒ..à...WV.|y..Ä.F..V..F 000160
 0020E98C 63880006 E9037408 46080646 88000BE9 0375FE46 08FC4688 FE5689FC =.V±.F=.F±u.Õ...F..F.t.Õ..|c.Õ . 000180
 0000E900 00881FA5 A5A5A5DA 8E1EF088 FB88065E C4285788 26264788 26FC5EC4 á^=&.G&&.W(á^..«.Þ..ÕEEEE.|..Õ.. 0001A0
 88F65689 F446890E 56880C46 88D88E09 D4881E56 5700000C C80008CA C95F5E1F .^_èÒ..à...WV.|å..Ä.F..V..F¶.V-. 0001C0
 0088065E C40247E9 8C638800 06E90374 08460806 46880008 E90375F6 460BF446 F¶.F-u.Õ...F..F.t.Õ..|c.ÕG.á^.|. 0001E0
```

Dump of file SATURN:[PCCOMMON.DUMP.DLL]SHP.TMP;1 on 18-APR-1990 10:52:51.06
File ID (922,23,0) End of file block 111 / Allocated 112

Virtual block number 48 (00000030), 512 (0200) bytes

```
0A478926 0000B806 5EC40447 89260647 89260000 88065EC4 07892602 47892600 .&.G.&..á^.|..&.G.&.G.á^.|..&.G. 000000
0A7E8300 14E90375 F64608F4 46880C47 89260E47 89260000 88065EC4 08478926 &.G.á^.|..&.G.&.G..F¶.F-u Õ...~. 000020
7E00047F 8326F45E C401EBE9 8C638800 06E90374 08460806 4688000B E9037001 .).Õ...F..F.t.Õ..|c.ÕŠ.á^;....~ 000040
22478826 F45EC401 C9E98C68 880006E9 03720202 7F832600 0AE9037D 0015E903 .Õ..).Õ..&....r.Õ..|h.Õè.á '%.G" 000060
02578826 078826F8 5EC4FA56 89F84689 FE5688FC 4688FE56 89FC4689 24578826 &.W$.F=.V±.F=.V±.F½.V*á^½&..&.W. 000080
06578926 04478926 065EC406 57882604 478826F8 5EC40257 89260789 26065EC4 á^.&..&.W.á^½&.G.&.W.á^.&.G.&.W. 0000A0
06578826 04478826 F85EC40A 57892608 47892606 5EC40257 88260788 26F85EC4 á^½&..&.W.á^.&.G.&.W.á^½&.G.&.W. 0000C0
0374000B FE5689FC 46890E57 88260C47 8826FC5E C40E5789 260C4789 26065EC4 á^.&.G.&.W.á^=&.G.&.W..F=.V±.Ât. 0000E0
26F85EC4 02578826 07882606 5EC4FA56 89F84689 FE5688FC 468800FB E90003E9 Õ..Õ«..F=.V±.F½.V*á^.&..&.W.á^½& 000100
C402578B 26078826 F85EC400 17E90372 07392600 08E9037D 0024E903 7E025739 9W.-.Õ$.).Õ..&9.r.Õ..á^½&..&.W.á 000120
E9037E0A 57392606 5EC40257 8826078B 26F85EC4 0039E902 57892607 8926065E ^.&..&.W.Õ9.á^½&..&.W.á^.&9W.-.Õ 000140
47892606 5EC40257 88260788 26F85EC4 0015E903 72084739 260009E9 03700023 #.).Õ..&9G.r.Õ..á^½&..&.W.á^.&.G 000160
09E9037D 0027E903 7E065739 26F85EC4 06578826 04478826 065EC40A 57892608 .&.W.á^.&.G.&.W.á^½&9W.-.Õ'.).Õ. 000180
06578926 04478926 065EC406 57882604 478826F8 5EC40019 E9037204 47392600 .&9G.r.Õ..á^½&.G.&.W.á^.&.G.&.W. 0001A0
260009E9 037E0024 E9037006 573926F8 5EC40E57 88260C47 8826065E C4003BE9 Õ;.á^.&.G.&.W.á^½&9W.).Õ$.-.Õ..& 0001C0
EAE90E57 89260C47 8926065E C406578B 2604478B 26F85EC4 0016E903 77044739 9G.w.Õ..á^½&.G.&.W.á^.&.G.&.W.Õõ 0001E0
```

Dump of file SATURN:[PCCOMMON.DUMP.DLL]SHP.TMP;1 on 18-APR-1990 10:52:51.06
File ID (922,23,0) End of file block 111 / Allocated 112

Virtual block number 49 (00000031), 512 (0200) bytes

```
46880657 19260447 2926065E C4990A46 88025719 26072926 065EC499 0A468BFE ±.F..á^.&).&.W..F..á^.&)G.&.W..F 000000
E90000B8 0E571126 0C470126 065EC499 0A46880A 57112608 47012606 5EC4990A ..á^.&.G.&.W..F..á^.&.G.&.W.|..Õ 000020
5689FC46 890C568B 0A4688D8 8E0A2FB8 1E565700 0004C800 0ACAC95F 5E1F0000 ...^_èò..à...WV.|/..Ä.F..V..F=.V 000040
4688FC5E C40017E9 8C638800 06E9037C 00087E83 0009E903 75FE460B FC4688FE ±.F=.F±u.Õ...~..|.Õ..|c.Õ..á^=.F 000060
1E565700 0008C800 08CAC95F 5E1F0000 E90000B8 08578926 06478926 08568806 ..V.&.G.&.W.|..Õ...^_èò..à...WV. 000080
E98C63B8 0006E903 74FA460B F84688FA 5689F846 890E568B 0C4688D8 8E0CB1B8 |Ÿ..Ä.F..V..F½.V*.F½.F*t.Õ..|c.Õ 0000A0
03750006 7E83FE56 89FC4689 008E9088 008C8088 02E3C10A 5E880C08 76680050 P.kv...^.èD..........F=.V±.~..u. 0000C0
FE5688FC 4688F85E C40015E9 20570926 1E470926 FE5688FC 4688F85E C40014E9 Õ..á^½.F=.V±&.G.&.W Õ..á^½.F=.V± 0000E0
1E565700 0004C800 0ACAC95F 5E1F0000 E90000B8 20572126 1E472126 D2F7D0F7 %Å%Ø&!G.&!W |..Õ...^_èò..à...WV. 000100
E98C63B8 0006E903 74FE460B FC4688FE 5689FC46 890C568B 0A4688D8 8E0001B8 |...Ä.F..V..F=.V±.F=.F±t.Õ..|c.Õ 000120
5F5E1F00 00E90000 B8025789 26078926 065EC408 57882606 478826FC 5EC4001B ..á^=&.G.&.W.á^.&..&.W.|..Õ...^_ 000140
0BF8468B FA5689F8 46891056 880E4688 D88E0081 B81E5657 000008C8 0008CAC9 èò..à...WV.|...Ä.F..V..F½.V*.F½. 000160
89008E90 88008C80 8802E3C1 0C5E880C 0A766800 45E98C63 B80006E9 0374FA46 F*t.Õ..|c.ÕE.kv...^.èD.......... 000180
00018800 06E90375 D00BFE56 23FC4623 20578826 1E478826 F85EC4FE 5689FC46 F=.V±á^½&.G.&.W #F=#V±.Åu.Õ..|.. 0001A0
1E565700 0014C800 0CCAC95F 5E1F0000 E90000B8 07892606 5EC40000 B80003E9 Õ..|..á^.&..|..Õ...^_èò..à...WV. 0001C0
EC468BFE 5689FC46 8908568B 064688EE 5689EC46 890C568B 0A4688D8 8E0DCCB8 |ë..Ä.F..V..F$.VŸ.F..V..F=.V±.F$ 0001E0
```

Dump of file SATURN:[PCCOMMON.DUMP.DLL]SHP.TMP;1 on 18-APR-1990 10:52:51.06
File ID (922,23,0) End of file block 111 / Allocated 112

Virtual block number 50 (00000032), 512 (0200) bytes

```
FF0A76FF 0C76FF00 79E98C63 B80006E9 0374EE46 0BEC468B 000BE903 75EE460B .FŸu.Õ...F$.FŸt.Õ..|c.Õy..v..v.. 000000
4689FA46 890000B8 005AE98C 61B80006 E9037500 003D0EAE 0EF99A06 76FF0876 v..v..*.Õ.=..u.Õ..|ø.ÕZ.|...F*.F 000020
76FF0C76 FF00FA56 8301F846 830008E9 0EC91188 9A006A00 6A0A76FF 0C76FFF8 ½.v..v.j.j....è.Õ...F½..V*..v..v 000040
80016A00 6A006A06 76FF0876 FF0019E9 03740000 300EE712 439A5016 F0468D0A ..Fþ.P.C.Õ.=..t.Õ...v..v.j.j.j.. 000060
1E565700 0008C800 08CAC95F 5E1F0000 E90000B8 FFC7E909 3C03489A 5016F046 Fþ.P.H.<.Õú.|..Õ...^_èò..à...WV. 000080
F8468BFE 5689FC46 8908568B 064688FA 5689F846 890C568B 0A4688D8 8E0E41B8 |A..Ä.F..V..F½.V*.F..V..F=.V±.F½ 0000A0
06478826 F85EC400 A0E98C63 B80006E9 0374FE46 0BFC468B 000BE903 75FA460B .F*u.Õ...F=.F±t.Õ..|c.Õ..á^½&.G. 0000C0
478926FC 5EC40C57 8B260A47 8826F85E C4085789 26064789 26FC5EC4 08578826 &.W.á^=&.G.&.W.á^½&.G.&.W.á^=&.G 0000E0
8826F85E C4105789 260E4789 26FC5EC4 10578826 0E478826 F85EC40C 5789260A .&.W.á^½&.G.&.W.á^=&.G.&.W.á^½&. 000100
26FC5EC4 18578826 16478826 F85EC414 57892612 478926FC 5EC41457 8B261247 G.&.W.á^=&.G.&.W.á^½&.G.&.W.á^=& 000120
F85EC41C 5789261A 478926FC 5EC41C57 8B261A47 8826F85E C4185789 26164789 .G.&.W.á^½&.G.&.W.á^=&.G.&.W.á^½ 000140
0008CAC9 5F5E1F00 00E90000 B8205789 261E4789 26FC5EC4 20578826 1E478826 &.G.&.W á^=&.G.&.W |..Õ...^_èò.. 000160
E903750C 46080A46 880016E9 03751046 080E4688 D88E0F01 B81E5657 000018C8 à...WV.|...Ä.F..F.u.Õ...F..F.u.Õ 000180
76FF1076 FF000007 C726065E C400DAE9 8C638800 06E90374 08460806 4688000B ...F..F.t.Õ..|c.ÕÕ.á^.&ú....v..v 0001A0
E9037202 E87E8300 09E9037D 0014E903 7E00EA7E 83105C01 CF9A5016 E8468D0E ..FÒ.P.Ü.\..-õ.~.Õ..).Õ...-Õ.r.Õ 0001C0
46C71085 089C9A50 16EC468D 006A006A 006A0E76 FF1076FF 00A5E900 00B80006 ..|..ÕÉ..v..v.j.j.j..F$.P.....úF 0001E0
```

Dump of file SATURN:[PCCOMMON.DUMP.DLL]SHP.TMP;1 on 18-APR-1990 10:52:51.06
File ID (922,23,0)   End of file block 111 / Allocated 112

Virtual block number 51 (00000033), 512 (0200) bytes

```
006A0E76 FF1076FF 1FA5A5A5 A51F161E 0716EC76 8DF87E8D 0000F646 C70001F4 ¶..úF-...~½.v$.....EEEE..v..v.j. 000000
A5A5A51F 161E0716 EC768DF8 7E8D00F6 568301F4 46830018 E910B011 889A016A j....¯.Õ...F¶..V-..~½.v$.....EEE 000020
8D5016F8 468D002D E9037400 00300E88 12439A50 16EC468D 0E76FF10 76FF1FA5 È..v..v..F$.P.C...=..t.Õ-..F½.P. 000040
03E90375 003F8326 065EC4FF FF037E9A 0676FF08 76FF0A76 FF0C76FF 5016EC46 F$.P.v..v..v..v..~...á^.&.?.u.Õ. 000060
D88E0FE8 881E5657 00000CC8 000CCAC9 5F5E1F00 00E90000 B8FFA3E9 0003E900 .Õ..ÕÈ.|..Õ...^_èò..à...WV.|Õ..Ä 000080
890000B8 0065E98C 63880006 E9037408 460B0646 88000BE9 03750C46 080A4688 .F..F.u.Õ...F..F.t.Õ..|c.Õe.|... 0000A0
FF00FE56 8301FC46 830008E9 11401188 9A006A00 6A0A76FF 0C76FFFC 4689FE46 F±.F=.v..v.j.j....M.Õ...F=..V±.. 0000C0
57882607 8826065E C40024E9 03740000 30102912 439A5016 F4468D0A 76FF0C76 v..v..F¶.P.C.).=..t.Õ$.á^.&..&.W 0000E0
00E90000 B8FFBCE9 FA5611F8 46010657 88260447 8826065E C4F65611 F4460102 ..F¶.V-á^.&.G.&.W..F½.V°Õ¥.|..Õ. 000100
F65689F4 46890C56 880A4688 D88E10FC 881E5657 00000CC8 0008CAC9 5F5E1F00 ..^_èò..à...WV.|=..Ä.F..V..F¶.V- 000120
3201CF9A 5016F846 8D0A76FF 0C76FF00 88E98C63 880006E9 0374F646 0BF44688 .F¶¯F-t.Õ..|c.Õ...v..v..F½.P.ü.2 000140
E98C63B8 0006E903 73064639 0008E903 7E0013E9 037D0856 39FA5688 F8468811 ..F½.V°9V.).Õ..~.Õ..9F.s.Õ..|c.Õ 000160
26FC5EC4 24578826 22478826 F45EC4FE 5689FC46 89002A05 F65688F4 4688005A Z..F¶.V-.*..F=.V±á^¶&.G"&.W$á^=& 000180
C426FC5E C4001BE9 03750008 00085E83 01066E83 08568806 46880257 89260789 ..&.W..F..V..n...^...Äu.Õ..á^=&á 0001A0
C95F5E1F 0000E900 0088FFD0 E9025789 26078926 FC5EC40E 578B260C 478B261F .&.G.&.W.á^=&..&.W.ÕÄ.|..Õ...^_è 0001C0
460BF846 88FA5689 F846890C 56880A46 88D88E11 90881E56 57000008 C80008CA ò..à...WV.|...Ä.F..V..F½.V°.F½¯F 0001E0
```

Dump of file SATURN:[PCCOMMON.DUMP.DLL]SHP.TMP;1 on 18-APR-1990 10:52:51.06
File ID (922,23,0)   End of file block 111 / Allocated 112

Virtual block number 52 (00000034), 512 (0200) bytes

```
002A05FA 568BF846 880097E9 8C63B800 06E90374 08460806 46880008 E90375FA °u.Õ...F..F.t.Õ..|c.Õ...F½.V°.*. 000000
02478926 00008806 5EC40024 E903742C 4708262A 478826F8 5EC4FE56 89FC4689 .F=.V±á^½&.G*&.G,t.Õ$.á^.|..&.G. 000020
078826FC 5EC40019 E90057E9 8C6A8804 47892606 47892600 0088065E C4078926 &..á^.|..&.G.&.G.|j.ÕW.Õ..á^=&.. 000040
E9037402 47082607 8826FC5E C41FA5A5 A5A5DA8E 1EF088F8 88065EC4 02578826 &.W.á^..«.Þ..ÕEEEE.á^=&..&.G.t.Õ 000060
5EC40E57 88260C47 88261FC4 26FC5EC4 000EE924 57882622 478826F8 5EC4000E ..á^½&.G"&.W$Õ..á^=&á.&.G.&.W.á^ 000080
8E1248B8 1E565700 0004C800 08CAC95F 5E1F0000 E90000B8 02578926 078926FC =&..&.W.|..Õ...^_èò..à...WV.|K.. 0000A0
7E830056 E98C63B8 0006E903 74FE4608 FC4688FE 5689FC46 89105688 0E4688D8 Ä.F..V..F=.V±.F=¯F±t.Õ..|c.ÕV..~ 0000C0
89260C56 880A4688 FC5EC400 11E90377 000A7E83 0009E903 7E001FE9 037D000C ..).Õ..~.Õ...~..w.Õ..á^=.F..V.&. 0000E0
FC5EC400 11E90377 00067E83 0009E903 7E001FE9 037D0008 7E830C57 89260A47 G.&.W..~..).Õ..~.Õ...~..w.Õ..á^= 000100
57000004 C8000CCA C95F5E1F 0000E900 00881057 89260E47 89260856 88064688 .F..V.&.G.&.W.|..Õ...^_èò..à...W 000120
63880006 E90374FE 460BFC46 88FE5689 FC468910 56880E46 88D88E13 10881E56 V.|...Ä.F..V..F=.V±.F=¯F±t.Õ..|c 000140
0789260A 5EC40C57 88260A47 8826FC5E C40015E9 03750C46 080A4688 0046E98C .ÕF..F..F.u.Õ..á^=&.G.&.W.á^.&.. 000160
07892606 5EC41057 88260E47 8826FC5E C40015E9 03750846 08064688 02578926 &.W..F..F.u.Õ..á^=&.G.&.W.á^.&.. 000180
124688D8 8E13A3B8 1E565700 0004C800 0CCAC95F 5E1F0000 E90000B8 02578926 &.W.|..Õ...^_èò..à...WV.|È..Ä.F. 0001A0
037D0010 7E83007E E98C63B8 0006E903 74FE4608 FC4688FE 5689FC46 89145688 .V..F=.V±.F=¯F±t.Õ..|c.Õ~..~..). 0001C0
89261247 89261056 880E4688 FC5EC400 11E90377 000E7E83 0009E903 7E001FE9 Õ..~.Õ...~..w.Õ..á^=.F..V.&.G.&. 0001E0
```

Dump of file SATURN:[PCCOMMON.DUMP.DLL]SHP.TMP;1 on 18-APR-1990 10:52:51.06
File ID (922,23,0)   End of file block 111 / Allocated 112

Virtual block number 53 (00000035), 512 (0200) bytes

```
880A4688 FC5EC400 11E90377 000A7E83 0009E903 7E001FE9 037D000C 7E831457 W..~..).Õ..~.Õ...~..w.Õ..á^=.F.. 000000
11E90377 00067E83 0009E903 7E001FE9 037D0008 7E831857 89261647 89260C56 V.&.G.&.W..~..).Õ..~.Õ...~..w.Õ. 000020
C80010CA C95F5E1F 0000E900 00881C57 89261A47 89260856 88064688 FC5EC400 .á^=.F..V.&.G.&.W.|..Õ...^_èò..à 000040
E90374FE 460BFC46 88FE5689 FC468914 56881246 88D88E14 19881E56 57000004 ...WV.|...Ä.F..V..F=.V±.F=.F±t.Õ 000060
5EC41457 88261247 8826FC5E C40015E9 03751046 080E4688 0066E98C 63880006 ..|c.Õf..F..F.u.Õ..á^=&.G.&.W.á^ 000080
5EC41857 88261647 8826FC5E C40015E9 03750C46 080A4688 02578926 0789260E .&..&.W..F..F.u.Õ..á^=&.G.&.W.á^ 0000A0
5EC41C57 88261A47 8826FC5E C40015E9 03750846 08064688 02578926 0789260A .&..&.W..F..F.u.Õ..á^=&.G.&.W.á^ 0000C0
8E14C7B8 1E565700 0008C800 10CAC95F 5E1F0000 E90000B8 02578926 07892606 .&..&.W.|..Õ...^_èò..à...WV.|ú.. 0000E0
750C460B 0A4688FE 5689FC46 89085688 064688FA 5689F846 890C5688 0A4688D8 Ä.F..V..F½.V°.F..V..F=.V±.F..F.u 000100
16578826 14478826 FC5EC400 8AE98C63 880006E9 03740846 08064688 0008E903 .Õ...F..F.t.Õ..|c.Õ..á^=&.G.&.W. 000120
5789260A 478926F8 5EC41A57 88261847 8826FC5E C4085789 26064789 26F85EC4 á^½&.G.&.W.á^=&.G.&.W.á^½&.G.&.W 000140
88262047 8826FC5E C4105789 260E4789 26F85EC4 1E578826 1C478826 FC5EC40C .á^=&.G.&.W.á^½&.G.&.W.á^=&.G &. 000160
26164789 26F85EC4 26578826 24478826 FC5EC414 57892612 478926F8 5EC42257 W"á^½&.G.&.W.á^=&.G$&.W&á^½&.G.& 000180
1F0000E9 00008820 5789261E 478926F8 5EC42E57 88262C47 8826FC5E C4185789 .W.á^=&.G,&.W.á^½&.G.&.W |..Õ... 0001A0
02000000 0A027100 02000000 0411BF00 02000000 03100300 02000608 CAC95F5E ^_èò.....¿........¢.......q...... 0001C0
00000000 00000000 00002200 0307A502 03001400 0300CA02 03000000 08155000 .Ţ.......ò.......E..."........... 0001E0
```

```
Dump of file SATURN:[PCCOMMON.DUMP.DLL]SHP.TMP;1 on 18-APR-1990 10:52:51.06
File ID (922,23,0)   End of file block 111 / Allocated 112

Virtual block number 54 (00000036), 512 (0200) bytes

 0006E903 74084608 06468800 0BE90375 000A7E83 D88EFFFF B81E5657 000004C8 à...WV.¡...Ä.~..u.Õ...F..F.t.Õ.. 000000
 B80006E9 03750000 3D0000FF FF9A5016 FC4680DC 6A0C6A0A 76FF0040 E98C6388 ¡c.Õ@..v.j.j..F•.P.....=..u.Õ..¡ 000020
 02578926 078926FE 568BFC46 8B065EC4 FFFF00BF 9AFC76FF FE76FF00 21E98C62 b.Õ!..v±.v•.¢...á^..F•.V±&..&.W. 000040
 89085688 06468808 8E000888 1E565700 0004C800 06CAC95F 5E1F0000 E9000088 ¡..Õ...^_èò..à...WV.¡...Ä.F..V.. 000060
 9AFC76FF FE76FF0A 76FF0022 E98C6388 0006E903 74FE4608 FC468BFE 5689FC46 F•.V±.F•.F±t.Õ..¡c.Õ"..v..v±.v•. 000080
 C80006CA C95F5E1F 0000E900 00B80006 E98C62B8 0006E903 7500003D 0000FFFF ....=..u.Õ..¡b.Õ..¡..Õ...^_èò..à 0000A0
 E90374FE 460BFC46 8BFE5689 FC468908 56880646 8BD88E00 75B81E56 57000004 ...WV.¡u..Ä.F..V..F•.V±.F•.F±t.Õ 0000C0
 26064789 260000B8 FC5EC407 89260247 89260000 8BFC5EC4 002FE98C 63B80006 ..¡c.Õ/.á^•¡..&.G.&..á^•¡..&.G.& 0000E0
 04C80004 CAC95F5E 1F0000E9 00008808 4789260A 47892600 00B8FC5E C4044789 .G.á^•¡..&.G.&.G.¡..Õ...^_èò..à. 000100
 0BE90375 FE460BFC 4688FE56 89FC4689 0C5688DA 4688D88E 00C7B81E 56570000 ..WV.¡ú..Ä.F..V..F•.V±.F•.F±u.Õ. 000120
 26065EC4 02578826 078826FC 5EC4001A E98C6388 0006E903 74084608 06468800 ..F..F.t.Õ..¡c.Õ..á^•&..&.W.á^.& 000140
 88D88E01 26881E56 57000004 C80008CA C95F5E1F 0000E900 00B80257 89260789 ..&.W.¡.:.Õ...^_èò..à...WV.¡&..Ä. 000160
 06E90374 08460806 4688000B E90375FE 460BFC46 8BFE5689 FC46890C 5688DA46 F..V..F•.V±.F•.F±u.Õ...F..F.t.Õ. 000180
 B81FA5A5 A5A5DA8E 1EF08BFB 8B000405 FE568BFC 46880G5E C4001EE9 8C638800 .¡c.Õ..á^..F•.V±....«.Þ..ÕEEEE.¡ 0001A0
 46890C56 8B0A4688 D88E017B B81E5657 000004C8 0008CAC9 5F5E1F00 00E90000 ..Õ...^_èò..à...WV.¡(..Ä.F..V..F 0001C0
 067E8300 09E9037D 0014E903 7E00087E 830017E9 0375FE46 0BFC4688 FE5689FC •.V±.F•.F±u.Õ...~..~.Õ..).Õ...~. 0001E0

Dump of file SATURN:[PCCOMMON.DUMP.DLL]SHP.TMP;1 on 18-APR-1990 10:52:51.06
File ID (922,23,0)   End of file block 111 / Allocated 112

Virtual block number 55 (00000037), 512 (0200) bytes

 E90000B8 02578926 07892608 56880646 8BFC5EC4 0016E98C 63B80006 E9037201 .r.Õ..¡c.Õ..á^•.F..V.&..&.W.¡..Õ 000000
 5689FC46 890C5688 0A4688D8 8E01D488 1E565700 0004C800 08CAC95F 5E1F0000 ...^_èò..à...WV.¡å..Ä.F..V..F•.V 000020
 FC5EC400 1CE98C63 B80006E9 03740846 08064688 000BE903 75FE4608 FC468BFE ±.F•.F±u.Õ...F..F.t.Õ..¡c.Õ..á^• 000040
 0008CAC9 5F5E1F00 00E90000 B81FA5A5 A5A5DA8E 1EF08804 7F8D0856 8B06468B .F..V.....Þ..ÕEEEE.¡..Õ...^_èò.. 000060
 03750C46 080A4688 E65689E4 46891056 880E4688 D88E0231 B81E5657 00001CC8 à...WV.¡1..Ä.F..V..FÒ.VÌ.F..F.u. 000080
 880100E9 8C63B800 06E90374 08460806 4688000B E9037510 460B0E46 880016E9 Õ...F..F.u.Õ...F..F.t.Õ..¡c.Õ... 0000A0
 5EC4EA56 89E84689 02578826 078826E4 5EC4EE56 89EC4689 000405E6 5688E446 FÕ.VÌ....F§.VŸá^Õ&..&.W..FÒ.Võá^ 0000C0
 2B06578B 2604478B 26EC5EC4 F25689F0 4689EA56 1BE8462B 02578826 078826EC §&..&.W.+FÒ.Võ.FÞ.V·á^§&.G.&.W.+ 0000E0
 5689F846 89EA5613 E8460302 578B2607 8B26EC5E C4F65689 F44689EA 561BE846 FÒ.Võ.F¶.V-á^§&..&.W..FÒ.Võ.F½.V 000100
 568BF046 8B0A5EC4 FE5689FC 4689EA56 13E84603 06578826 04478826 EC5EC4FA *á^§&.G.&.W..FÒ.Võ.F•.V±á^..FÞ.V 000120
 568BF846 8B0A5EC4 0065E903 73084739 260009E9 037E0073 E9037D0A 573926F2 ·&9W.).Õs.~.Õ..&9G.s.Õe.á^..F½.V 000140
 F6568BF4 4688OA5E C40046E9 03760739 260008E9 037D0053 E9037E02 573926FA *&9W.~.ÕS.).Õ..&9.v.ÕF.á^..F¶.V- 000160
 FE568BFC 46880A5E C40026E9 03730C47 39260009 E9037E00 34E9037D 0E573926 &9W.).Õ4.~.Õ..&9G.s.Õ&.á^..F•.V± 000180
 00008800 03E90001 B80006E9 03760447 39260009 E9037D00 14E9037E 06573926 &9W.~.Õ..).Õ..&9G.v.Õ..¡..Õ..¡.. 0001A0
 00020000 0005004E 00020004 90000CCA C95F5E1F 0000E900 00B80789 26065EC4 á^.&..¡..Õ...^_èò.......N....... 0001C0
 00000000 00000000 00000022 000300A0 02030014 00030033 02030000 00080288 ........3..........".......... 0001E0

Dump of file SATURN:[PCCOMMON.DUMP.DLL]SHP.TMP;1 on 18-APR-1990 10:52:51.06
File ID (922,23,0)   End of file block 111 / Allocated 112

Virtual block number 56 (00000038), 512 (0200) bytes

 FA468900 00FFFF9A 5016FC46 8D106A0C 6A0A76FF D88EFFFF B81E5657 000006C8 à...WV.¡...Ä.v.j.j..F•.P......F* 000000
 FC468806 5EC4FFFF 00A99AFC 76FFFE76 FF0021E9 8C628800 06E90375 00FA7E83 .~*.u.Õ..¡b.Õ!..v±.v•.`...á^..F• 000020
 08881E56 57000004 C80006CA C95F5E1F 0000E900 00B80257 89260789 26FE568B .V±&..&.W.¡..Õ...^_èò..à...WV.¡. 000040
 0022E98C 63880006 E90374FE 460BFC46 8BFE5689 FC468908 56880646 8BD88E00 ..Ä.F..V..F•.V±.F•.F±t.Õ..¡c.Õ". 000060
 E90000B8 0006E98C 62B80006 E9037500 003D0000 FFFF9AFC 76FFFE76 FF0A76FF .v..v±.v•.....=..u.Õ..¡b.Õ..¡..Õ 000080
 5689FC46 89085688 06468808 8E005FB8 1E565700 0004C800 06CAC95F 5E1F0000 ...^_èò..à...WV.¡_..Ä.F..V..F•.V 0000A0
 04478926 06478926 000088FC 5EC40041 E98C6388 0006E903 74FE4608 FC468BFE ±.F•.F±t.Õ..¡c.ÕA.á^•¡..&.G.&.G. 0000C0
 C726FC5E C4078926 02478926 0000B8FC 5EC40847 89260A47 89260000 8BFC5EC4 á^•¡..&.G.&.G.á^•¡..&.G.&..á^•&ú 0000E0
 56570000 08C80004 CAC95F5E 1F0000E9 00008800 000E47C7 26FC5EC4 00000C47 G...á^•&úG...¡..Õ...^_èò..à...WV 000100
 5EC4FA56 89F84689 0C5688DA 4688FE56 89FC4689 105688DE 4688D88E 00B1B81E .¡Ý..Ä.F..V..F•.V±.F..V..F½.V*á^ 000120
 E98C6388 0006E903 74FA4608 F8468800 08E90375 FE460BFC 46880000 07C72606 .&ú....F•.F±u.Õ...F½.F*t.Õ..¡c.Õ 000140
 0006E903 75025739 260009E9 03740739 26FC5EC4 02578826 078826F8 5EC400AA ^.á^½&..&.W.á^•&9.t.Õ..&9W.u.Õ.. 000160
 C40060E9 00008800 06E90375 0C473926 FC5EC40C 478826F8 5EC40086 E90000B8 ¡..Õ..á^½&.G.á^•&9G.u.Õ..¡..Õm.á 000180
 2604478B 26F85EC4 0054E900 00B80006 E903750E 473926FC 5EC40E47 8B26F85E ^½&.G.á^•&9G.u.Õ..¡..ÕT.á^½&.G.& 0001A0
 2608478B 26F85EC4 0020E903 74065739 260029E9 03740447 3926FC5E C406578B .W.á^•&9G.t.Õ).&9W.t.Õ .á^½&.G.& 0001C0
 5EC4000E E90000B8 0006E903 750A5739 260009E9 03740847 3926FC5E C40A578B .W.á^•&9G.t.Õ..&9W.u.Õ..¡..Õ..á^ 0001E0
```

```
Dump of file SATURN:[PCCOMMON.DUMP.DLL]SHP.TMP;1 on 18-APR-1990 10:52:51.06
File ID (922,23,0)   End of file block 111 / Allocated 112

Virtual block number 57 (00000039), 512 (0200) bytes

8BD88E01 22B81E56 57000004 C8000CCA C95F5E1F 0000E900 00880001 07C72606 .&ú...|..Õ...^_èò..à...WV.|"..Ä. 000000
06E90374 08460B06 4688000B E90375FE 460BFC46 8BFE5689 FC46890C 56880A46 F..V..F=.V±.F=.F±u.Õ...F..F.t.Õ. 000020
00E90000 B8025789 26078926 065EC402 578B2607 8B26FC5E C4001AE9 8C638800 .|c.Õ..á^=&..&.W.á^.&..&.W.|..Õ. 000040
FE5689FC 46890C56 8B0A468B D88E021B 8B1E5657 000004C8 0008CAC9 5F5E1F00 ..^_èò..à...WV.|...Ä.F..V..F=.V± 000060
88065EC4 001EE98C 63B80006 E9037408 460B0646 8B000BE9 0375FE46 0BFC468B .F=.F±u.Õ...F..F.t.Õ..|c.Õ..á^.. 000080
08CAC95F 5E1F0000 E90000B8 1FA5A5A5 A5DA8E1E F08BFB8B 000405FE 568BFC46 F=.V±....«.Þ..ÕEEEE.|..Õ...^_èò. 0000A0
75FE460B FC468BFE 5689FC46 890C568B 0A468B08 8E02708B 1E565700 0004C800 .à...WV.|p..Ä.F..V..F=.V±.F=.F±u 0000C0
26065EC4 0C478826 FC5EC400 13E98C63 B80006E9 03740846 0B06468B 000BE903 .Õ...F..F.t.Õ..|c.Õ..á^=&.G.á^.& 0000E0
56880A46 8BD88E02 C9B81E56 57000004 C80008CA C95F5E1F 0000E900 00B80789 ..|..Õ...^_èò..à...WV.|è..Ä.F..V 000100
8C63B800 06E90374 08460B06 4688000B E90375FE 460BFC46 8BFE5689 FC46890C ..F=.V±.F=.F±u.Õ...F..F.t.Õ..|c. 000120
0050C800 08CAC95F 5E1F0000 E90000B8 07892606 5EC40E47 8B26FC5E C40013E9 Õ..á^=&.G.á^.&..|..Õ...^_èò..àP. 000140
000BE903 75FA460B F8468BFA 5689F846 890E568B 0C468BD8 8E03178B 1E565700 .WV.|...Ä.F..V..F½.Vª.F½.Fªu.Õ.. 000160
FE5689FC 46890004 05FA568B F8468B02 C9E98C63 B80006E9 03740846 0B06468B .F..F.t.Õ..|c.Õè..F½.Vª....F=.V± 000180
E90000EC 46C7F646 890C478B 26F85EC4 E25689E0 46890257 8B26078B 26F85EC4 á^½&..&.W..FÄ.Vãá^½&.G..F-úF§..Õ 0001A0
8D03D405 D79A0D42 1E8DFFFF 02529AF6 5E8D0148 E9037C02 EC7E83EC 46FF0003 ...F&.-&.|.ÕH..^-.R.....B..=.å.. 0001C0
190740 9A E476FFE6 76FFE876 FFEA76FF 03FF0375 9AE45E8D 03EE05EF 9A004A1E .J..ÿ.Ÿ..^õ.u....võ.vò.vÌ.võ.M.. 0001E0
```

```
Dump of file SATURN:[PCCOMMON.DUMP.DLL]SHP.TMP;1 on 18-APR-1990 10:52:51.06
File ID (922,23,0)   End of file block 111 / Allocated 112

Virtual block number 58 (0000003A), 512 (0200) bytes

C89AC85E 8D042102 459AE05E 8D1FA5A5 A5A5DA8E 1E0716F0 8BC87E8D 08C48304 ..á..-à.Þ....ÕEEEE..^Å.E.I..^à.à 000000
7E8D08C4 83045307 839A0439 03759A0C 8B08EC83 0434061F 9A0D521E 8D03DD05 .Ï...R....4..§..É.u.9....S..á..- 000020
F45689F2 4689046F 042C9A04 5801B89A C05E8D1F A5A5A5A5 DA8E1E07 16F08BC0 å.Þ....ÕEEEE..^á.|.X..,.o..F·.V¶ 000040
A5A5DA8E 1E0716F0 8B8B7E8D 08C48304 8907449A E476FFE6 76FFE876 FFEA76FF .võ.vò.vÌ.võ.D....á..~|.Þ....ÕEE 000060
8B08EC83 04A4061F 9A0D521E 8D049A05 C89AB85E 8D049102 459AE05E 8D1FA5A5 ÉE..^Å.E....^|.à......R....É..§.. 000080
B05E8D1F A5A5A5A5 DA8E1E07 16F08BB0 7E8D08C4 8304C307 839A04A9 03759ADC É.u.`....Û..á..-¯.Þ....ÕEEEE..^¯ 0000A0
F45613F2 46030257 8B26078B 26FC5EC4 F05689EE 468903E6 042C9A04 C801B89A .|.à..,.Ì..FŸ.VÞá^=&..&.W..F·.V¶ 0000C0
EC768BF0 5613EE46 0306578B 2604478B 26FC5EC4 D2528900 428903E6 C1EC768B .v§èl..BÅ.Røá^=&.G.&.W..FŸ.VÞ.v§ 0000E0
26D2568B D0468806 5EC4FEAC E9F64601 0E478B26 F85EC406 52890442 8903E6C1 èl..Bå.Røá^½&.G..F-Õ¯±á^..FÅ.VØ& 000100
DA568808 4688065E C4065789 26044789 2606568B D4468806 5EC40257 89260789 ..&.W.á^..Få.Vø&.G.&.W.á^..FÄ.VÖ 000120
26078826 065EC40E 5789260C 4789260E 568BDC46 8B065EC4 0A578926 08478926 &.G.&.W.á^..FÉ.VB&.G.&.W.á^.&..& 000140
065EC400 36E90372 08473926 0009E903 7D0044E9 037E0A57 3926065E C402578B .W.á^.&9W.-.ÕD.).Õ..&9G.r.Õ6.á^. 000160
89260789 26065EC4 0A578826 08478826 065EC4B2 56898046 8902578B 26078826 &..&.W..F¯.Výá^.&.G.&.W.á^.&..&. 000180
5EC40E57 8B260C47 8B26065E C40A5789 26084789 2682568B 80468806 5EC40257 W.á^..F¯.Vý&.G.&.W.á^.&.G.&.W.á^ 0001A0
2604478B 26065EC4 0038E903 77044739 260009E9 037E0046 E9037D06 57392606 .&9W.}.ÕF.-.Õ..&9G.w.Õ8.á^.&.G.& 0001C0
C4065789 26044789 26065EC4 0E578826 0C478826 065EC48A 56898846 8906578B .W..F|.V¤á^.&.G.&.W.á^.&.G.&.W.á 0001E0
```

```
Dump of file SATURN:[PCCOMMON.DUMP.DLL]SHP.TMP;1 on 18-APR-1990 10:52:51.06
File ID (922,23,0)   End of file block 111 / Allocated 112

Virtual block number 59 (0000003B), 512 (0200) bytes

065EC499 0A468800 3BE9037F 010A7E83 0E578926 0C478926 8A56888B 4688065E ^..F|.V¤&.G.&.W..~....Õ;..F..á^. 000000
47012606 5EC4990A 46880657 19260447 2926065E C4990A46 8B025719 26072926 &).&.W..F..á^.&)G.&.W..F..á^.&.G 000020
0ACAC95F 5E1F0000 E90000B8 0E571126 0C470126 065EC499 0A46880A 57112608 .&.W..F..á^.&.G.&.W.|..Õ...^_èò. 000040
75FE460B FC468BFE 5689FC46 890C568B 0A468B08 8E0365B8 1E565700 0004C800 .à...WV.|e..Ä.F..V..F=.V±.F=.F±u 000060
26078926 08568806 4688FC5E C40016E9 8C638800 06E9037C 00087E83 0009E903 .Õ...-..|.Õ..|c.Õ..á^=.F..V.&..& 000080
8B0A468B D88E0669 8B1E5657 000004C8 0008CAC9 5F5E1F00 00E90000 B8025789 .W.|..Õ...^_èò..à...WV.|i..Ä.F.. 0000A0
63B80006 E9037408 460B0646 8B000BE9 0375FE46 0BFC468B FE5689FC 46890C56 V..F=.V±.F=.F±u.Õ...F..F.t.Õ..|c 0000C0
0000E900 00B81FA5 A5A5A50A 8E1EF08B 047F8D08 568B0646 8BFC5EC4 001CE98C .Õ..á^=.F..V.....Þ..ÕEEEE.|..Õ.. 0000E0
8BFE5689 FC46890A 56880846 8BD88E06 B8B81E56 57000004 C80008CA C95F5E1F .^_èò..à...WV.||..Ä.F..V..F=.V±. 000100
06468801 6889000C E9037F01 68067E81 004BE98C 63B80006 E90374FE 460BFC46 F=.F±t.Õ..|c.ÕK..-.h...Õ..¿h..F. 000120
0003E908 F706468B 0008E903 7C00067E 83001CE9 037C0006 7E830656 89F9F799 .%ª.V..-..|.Õ...-..|.Õ...F.%ÄÕ.. 000140
CAC95F5E 1F0000E9 0000B80C 47892606 4688FC5E C4064689 D8F70168 2D06468B .F.-h.%Ä.F.á^=.F.&.G.|..Õ...^_èò 000160
FE460BFC 468BFE56 89FC4689 0A568808 468BD88E 070FB81E 56570000 04C80006 ..à...WV.|...Ä.F..V..F=.V±.F=.F± 000180
5689F9F7 9906468B 0168B900 0CE9037F 0168067E 81004BE9 8C638800 06E90374 t.Õ..|c.ÕK..-.h...Õ..¿h..F..%ª.V 0001A0
68200646 8B0003E9 D8F70646 8B0008E9 037C0006 7E83001C E9037C00 067E8306 ..-..|.Õ...-..|.Õ...F.%ÄÕ...F.-h 0001C0
0022C800 06CAC95F 5E1F0000 E90000B8 0E478926 064688FC 5EC40646 89D8F701 .%Ä.F.á^=.F.&.G.|..Õ...^_èò..à". 0001E0
```

```
Dump of file SATURN:[PCCOMMON.DUMP.DLL]SHP.TMP;1 on 18-APR-1990 10:52:51.06
File ID (922,23,0)   End of file block 111 / Allocated 112

Virtual block number 60 (0000003C), 512 (0200) bytes

 006CE903 75F0460B EE468BF0 5689EE46 8918568B 16468B08 8E078AB8 1E565700 .WV.|...Ä.F..V..FŸ.VÞ.FŸ.FÞu.Õl. 000000
 E9037510 460B0E46 880055E9 03730112 7E830009 E9037E00 63E9037D 00147E83 .~..).Õc.~.Õ...~..s.ÕU..F..F.u.Õ 000020
 83002DE9 037D0006 7E830036 E9037D01 087E8300 3FE90375 0C460B0A 468B004A J..F..F.u.Õ?..~..).Õ6..~..).Õ-.. 000040
 03750106 7E830018 E9037508 067E8300 21E90375 04067E83 0024E903 7E0A067E ~..~.Õ$..~..u.Õ!..~..u.Õ...~..u. 000060
 46C7FA46 8900D287 88E30106 5E880221 E98C6388 0006E903 7502067E 83000FE9 Õ...~..u.Õ..|c.Õ!..^.1D..ø..F'úF 000080
 0C56880A 460303E0 C1EA468B 0166E903 7CEA4639 08468BEA 46FF0003 E90000EA õ..Õ...Fõ.F.9Fõ|.Õf..FõêÁ..F..V. 0000A0
 FE5689FC 46890257 1B26072B 260E5EC4 02578826 07882 6F2 5EC4F456 89F24689 .F·.V¶á^·&..&.W.á^.&+.&.W..F=.V± 0000C0
 08FC4688 F85689F6 46890657 1B260447 2B260E5E C406578B 2604478B 26F25EC4 á^·&.G.&.W.á^.&+G.&.W..F-.V½.F=. 0000E0
 88EC4689 5AC06800 01B80003 E9FFFFB8 0006E903 7C00FE7E 830018E9 0374FE46 F±t.Õ...~±.|.Õ..|..Õ..|..káZ.F$. 000100
 06E90377 00FC7E83 0009E903 7E0014E9 037D00FE 7E830026 E90374F8 460BF646 F-.F½t.Õ&..~±.).Õ..~.Õ...~=.W.Õ. 000120
 03759ADC 8808EC83 09600245 9AFC5E8D 005DE9EC 468900B4 B80003E9 0000B800 .|..Õ..|Ç..F$Õ]..^=.E.`..$..É.u. 000140
 88DE7E8D 10C48309 91077A9A 09770375 9ADC8B08 EC830972 02459AF6 5E8D0968 h..^-.E.r..$..É.u.w..z....á..-B. 000160
 0D421E8D 09A305D7 9A004A1E 80099A01 8B9ADE5E 8D1FA5A5 A5A5DA8E 1E0716F0 Þ....ÕEEEE..^B.|.....J..■.È...B. 000180
 4CEC7E81 EC4601FA 46880027 E9037500 FA7E83EC 4689042A 042C9A09 A805EF9A .ÿ.´..,.*..F$.-'.u.Õ'..F'.F$.-$L 0001A0
 EA7E8301 68EC6E81 0005E903 7F00B4EC 7E81000F E9016BEC 46810008 E9037CFF .|.Õ...F$h.Õ...-$Ç...Õ...n$h..-õ 0001C0
 EC468800 09E9037C EC4639E8 46880025 E9E84689 E64689EC 4688000C E9037400 .t.Õ...F$.F|.FÕÕ%..FÕ9F$|.Õ...F$ 0001E0

Dump of file SATURN:[PCCOMMON.DUMP.DLL]SHP.TMP;1 on 18-APR-1990 10:52:51.06
File ID (922,23,0)   End of file block 111 / Allocated 112

Virtual block number 61 (0000003D), 512 (0200) bytes

 124688EE 5EC4FE8C E9E64689 EC468800 06E9037F EC4639E6 46880011 E9E84689 .FÒÕ...F|9F$..Õ...F$.F|Õ.±á^Ÿ.F. 000000
 1FA5A5A5 A5DA8E1E F088047F 8D10568B 0E4688EE 5EC40257 89260789 2614568B .V.&..&.W.á^Ÿ.F..V.....Þ..ÕEEEE. 000020
 478926EE 5EC4E846 28E6468B 0006E9E6 462BE846 880009E9 037CE646 39E8468B .FÒ9F||.Õ...FÒ+F|Õ...F|+FÒá^Ÿ&.G 000040
 E90168E8 46810008 E9037CFF 4CE87E81 E84629FA 46880027 E9037500 FA7E830E ..~'.u.Õ'..F')FÒ.~ÕL.|.Õ...FÒh.Õ 000060
 016805E8 46880009 E9037C00 E87E8301 68E86E81 0005E903 7F00B4E8 7E81000F ...~ÒÇ...Õ...nÒh..~Ò.|.Õ...FÒ.h. 000080
 06003800 02000514 CAC95F5E 1F0000E9 0000B80C 478926EE 5EC4E846 880003E9 Õ...FÒá^Ÿ&.G.|..Õ...^_èò.....8.. 0000A0
 03008A02 03001400 03001902 03000000 08080500 02000000 0A095600 02000000 .....V.......................... 0000C0
 6A0A76FF D88EFFFF B81E5657 000006C8 00000000 00000000 00000000 00002200 ."..............à...WV.|...Ä.v.j 0000E0
 260000B8 065EC400 13E90375 00FA7E83 FA468900 00FFFF9A 5016FC46 8D306A0C .jO.F=.P......F'.~'.u.Õ..á^.|..& 000100
 FE5688FC 4688065E C4FFFF00 649AFC76 FFFE76FF 0021E98C 62B80789 26024789 .G.&..|b.Õ|..v±.v=.d...á^..F=.V± 000120
 D88E0008 B81E5657 000004C8 0006CAC9 5F5E1F00 00E90000 B8025789 26078926 &..&.W.|..Õ...^_èò..à...WV.|...Ä 000140
 000088FC 5EC40847 89260A47 89260000 88FC5EC4 FE5689FC 46890856 8B06468B .F..V..F=.V±á^=|..&.G.&.G.á^=|.. 000160
 000088FC 5EC40000 1247C726 FC5EC400 001047C7 26FC5EC4 0C478926 0E478926 &.G.&.G.á^=&úG...á^=&úG...á^=|.. 000180
 00061C47 C726FC5E C400001A 47C72600 081847C7 26FC5EC4 14478926 16478926 &.G.&.G.á^=&úG...&úG...á^=, 'G... 0001A0
 C7260006 2447C726 FC5EC400 002247C7 26000820 47C726FC 5EC40000 1E47C726 &úG...á^=&úG ..&úG"..á^=&úG» &ú 0001C0
 4789262E 47892600 0088FC5E C400002A 47C72600 042847C7 26FC5EC4 00002647 G&..á^=&úG(..&úG*..á^=|..&.G.&.G 0001E0

Dump of file SATURN:[PCCOMMON.DUMP.DLL]SHP.TMP;1 on 18-APR-1990 10:52:51.06
File ID (922,23,0)   End of file block 111 / Allocated 112

Virtual block number 62 (0000003E), 512 (0200) bytes

 E90000B8 04478926 06478926 000088FC 5EC40789 26024789 260000B8 FC5EC42C ,á^=|..&.G.&..á^=|..&.G.&.G.|..Õ 000000
 5689FC46 890A568B 08468BD8 8E006C88 1E565700 0004C800 04CAC95F 5E1F0000 ...^_èò..à...WV.|l..Ä.F..V..F=.V 000020
 0000FFFF 9AFC76FF FE76FF06 76FF0022 E98C6388 0006E903 74FE460B FC4688FE ±.F=.F±t.Õ..|c.Õ"..v..v±.v=..... 000040
 57000004 C80006CA C95F5E1F 0000E900 00B80006 E98C6288 0006E903 7500003D =..u.Õ..|b.Õ..|..Õ...^_èò..à...W 000060
 4688000B E90375FE 460BFC46 88FE5689 FC46890C 56880A46 88D88E01 41B81E56 V.|A..Ä.F..V..F=.V±.F=.F±u.Õ...F 000080
 A5DA8E1E F088F888 08568806 4688FC5E C4001BE9 8C638800 06E90374 08460806 ..F.t.Õ..|c.Õ..á^=.F..V..«.Þ..ÕE 0000A0
 0A4688D8 8E019388 1E565700 0004C800 08CAC95F 5E1F0000 E90000B8 1FA5A5A5 EEE.|..Õ...^_èò..à...WV.|...Ä.F. 0000C0
 B80006E9 03740846 08064688 0008E903 75FE460B FC4688FE 5689FC46 890C568B .V..F=.V±.F=.F±u.Õ...F..F.t.Õ..| 0000E0
 0000E900 00881FA5 A5A5A5DA 8E1EF088 F888FE56 88FC4688 065EC400 18E98C63 c.Õ..á^..F=.V±.«.Þ..ÕEEEE.|..Õ.. 000100
 88FE5689 FC46890C 56880A46 88D88E01 E9881E56 57000004 C80008CA C95F5E1F .^_èò..à...WV.|Õ..Ä.F..V..F=.V±. 000120
 4688065E C40070E9 8C638800 06E90374 08460806 4688000B E90375FE 460BFC46 F=.F±u.Õ...F..F.t.Õ..|c.Õp.á^..F 000140
 0126065E C40A5788 2608478B 26FC5EC4 1FA5A5A5 A5DA8E1E F088F888 FE5688FC =.V±.«.Þ..ÕEEEE.á^=&.G.&.W.á^.&. 000160
 125F8826 FC5EC400 32E90000 880006E9 03740212 7F8326FC 5EC40657 11260447 G.&.W.á^=&....t.Õ..|..Õ2.á^=&._. 000180
 880006E9 03750000 30FFFF0B 429A0676 FF0876FF FC76FFFE 76FF00E8 B7FFE3D1 1D.ñÕ..v±.v=.v..v..B...=..u.Õ..| 0001A0
 4688D88E 023F881E 56570000 04C80008 CAC95F5E 1F0000E9 0000B800 06E98C69 i.Õ..|..Õ...^_èò..à...WV.|?..Ä.F 0001C0
 63B80006 E9037C00 087E8300 09E90375 FE460BFC 468BFE56 89FC4689 0C568B0A ..V..F=.V±.F=.F±u.Õ...~..|.Õ..|c 0001E0
```

Dump of file SATURN:[PCCOMMON.DUMP.DLL]SHP.TMP;1 on 18-APR-1990 10:52:51.06
File ID (922,23,0) End of file block 111 / Allocated 112

Virtual block number 63 (0000003F), 512 (0200) bytes

```
CAC95F5E 1F0000E9 0000B80A 57892608 47892608 56880646 88FC5EC4 0017E98C .Õ..á^=.F..V.&.G.&.W.|..Õ...^_èò 000000
FE4608FC 4688FE56 89FC4689 0C56880A 4688D88E 02EA881E 56570000 04C80008 ..à...WV.|ò..Ã.F..V..F=.V±.F=.F± 000020
57882608 478826FC 5EC4001B E98C6388 0006E903 74084608 06468800 08E90375 u.Õ...F..F.t.Õ..|c.Õ..á^=&.G.&.W 000040
881E5657 000004C8 0008CAC9 5F5E1F00 00E90000 88025789 26078926 065EC40A .á^.&..&.W.|..Õ...^_èò..à...WV.| 000060
7C00087E 830009E9 0375FE46 08FC4688 FE5689FC 46890C56 880A4688 D88E033A :..Ã.F..V..F=.V±.F=.F±u.Õ...~..| 000080
00E90000 880E5789 260C4789 26085688 064688FC 5EC40017 E98C6388 0006E903 .Õ..|c.Õ..á^=.F..V.&.G.&.W.|..Õ. 0000A0
FE5689FC 46890C56 880A4688 D88E0390 881E5657 000004C8 0008CAC9 5F5E1F00 ..^_èò..à...WV.|...Ã.F..V..F=.V± 0000C0
26FC5EC4 001BE98C 63880006 E9037408 46080646 88000BE9 0375FE46 08FC4688 .F=.F±u.Õ...F..F.t.Õ..|c.Õ..á^=& 0000E0
04C80008 CAC95F5E 1F0000E9 00008802 57892607 8926065E C40E5788 260C4788 .G.&.W.á^.&..&.W.|..Õ...^_èò..à. 000100
12E90375 FE4608FC 4688FE56 89FC4689 0A568808 4688D88E 03E0881E 56570000 ..WV.|Á..Ã.F..V..F=.V±.F=.F±u.Õ. 000120
26064688 FC5EC400 10E98C63 880006E9 037F5906 7E830009 E9037D01 067E8300 ..~..).Õ...~.Y..Õ..|c.Õ..á^=.F.& 000140
880A4688 D88E0436 881E5657 000004C8 0006CAC9 5F5E1F00 00E90000 88104789 .G.|..Õ...^_èò..à...WV.|6..Ã.F.. 000160
63880006 E9037408 46080646 88000BE9 0375FE46 08FC4688 FE5689FC 46890C56 V..F=.V±.F=.F±u.Õ...F..F.t.Õ..|c 000180
04C80008 CAC95F5E 1F0000E9 00008807 8926065E C4104788 26FC5EC4 0013E98C .Õ..á^=&.G.á^.&..|..Õ...^_èò..à. 0001A0
12E90375 FE4608FC 4688FE56 89FC4689 0A568808 4688D88E 0488881E 56570000 ..WV.|...Ã.F..V..F=.V±.F=.F±u.Õ. 0001C0
26064688 FC5EC400 10E98C63 880006E9 037F0A06 7E830009 E9037D00 067E8300 ..~..).Õ...~....Õ..|c.Õ..á^=.F.& 0001E0
```

Dump of file SATURN:[PCCOMMON.DUMP.DLL]SHP.TMP;1 on 18-APR-1990 10:52:51.06
File ID (922,23,0) End of file block 111 / Allocated 112

Virtual block number 64 (00000040), 512 (0200) bytes

```
880A4688 D88E04D6 881E5657 000004C8 0006CAC9 5F5E1F00 00E90000 88124789 .G.|..Õ...^_èò..à...WV.|ø. ¼.F.. 000000
63880006 E9037408 46080646 88000BE9 0375FE46 08FC4688 FE5689FC 46890C56 V..F=.V±.F=.F±u.Õ...F..F.t.. .|c 000020
62C80008 CAC95F5E 1F0000E9 00008807 8926065E C4124788 26FC5EC4 0013E98C .Õ..á^=&.G.á^.&..|..Õ...^_èò..àb 000040
08E90375 E04608DE 4688E056 89DE4689 0E56880C 4688D88E 0528881E 56570000 ..WV.|(..Ã.F..V..F8.VÅ.F8.FÅu.Õ. 000060
260E5EC4 EE468912 4788260E 5EC405FB E98C6388 0006E903 74084608 06468800 ..F..F.t.Õ..|c.Õ«.á^8&.G..FŸá^8& 000080
26078826 F85EC4FA 5689F846 89E05688 DE4688C8 5689C646 890E5788 260C4788 .G.&.W..Fó.Và.F8.VÅ.F½.V²á^½&..& 0000A0
105F8DDE 5EC4FE56 89FC4689 06578826 04478826 F85EC4CC 5689CA46 89025788 .W..Fò.Väá^½&.G.&.W..F=.V±á^8._. 0000C0
FF061E03 759ACE5E 8D060D05 EF9A0062 1E8D05F3 05D79A0D 5A1E8DFF FF02569A .V.....Z..■.µ...b..ÿ....^ö.u.... 0000E0
A5A5A5DA 8E1E0716 F088BE7E 8D08C483 0641074D 9ACE76FF D076FFD2 76FFD476 vå.vø.vÅ.vö.M.A..á..~ƒ.Þ....ÖÉÉÉ 000100
DA8E1E07 16F088B6 7E8D08C4 83065B07 449ACE76 FFD076FF D276FFD4 76FF1FA5 É..vå.vø.vÅ.vö.D.[..á..~Ñ.Þ....Ö 000120
4D9A0671 05BF9A0D 6A1E8D05 FC01B89A B65E8D06 6301B89A BE5E8D1F A5A5A5A5 ÉÉÉÉ..^ƒ.|.c..^Ñ.|.■...j..¢.q..M 000140
06960657 9A068E02 499A085F 8DDE5EC4 06890648 9A067E02 459AC65E 80067906 .y..^6.E.-..H...á^8._..I....W... 000160
7E83014B E9037504 EE7E8306 0503759A E65E8D06 A306579A 06980245 9AC65E8D .^6.E....W.É..^I.u....~Ÿ.u.ÕK..~ 000180
E9037500 EE7E8301 30E90375 02EE7E83 0139E903 7501EE7E 830142E9 037508EE Ÿ.u.Õ8..~Ÿ.u.Õ9..~Ÿ.u.Õ0..~Ÿ.u.Õ 0001A0
9ACE76FF D076FFD2 76FFD476 FF06F203 759ACE5E 8D06E101 DC9A0072 1E8D0127 '...r..É.Ã..^ö.u.·..vå.vø.vÅ.vö. 0001C0
8D071501 DC9A0D6A 1E8D1FA5 A5A5A5DA 8E1E0716 F088F07E 8008C483 07000740 M....á..~Þ.Þ....ÖÉÉÉÉ...j..É.... 0001E0
```

Dump of file SATURN:[PCCOMMON.DUMP.DLL]SHP.TMP;1 on 18-APR-1990 10:52:51.06
File ID (922,23,0) End of file block 111 / Allocated 112

Virtual block number 65 (00000041), 512 (0200) bytes

```
E65E8D07 3406489A 07280245 9AC65E8D 072605A7 9A006A1E 8D071E05 E09AF05E ^Þ.Å.....j..Ì.&..^6.E.+..H.4..^Ì 000000
007A1E8D 066C05C8 9AE65E8D 074A0188 9AF05E8D 07420375 9A5B073A 06109A53 S...:.[.u.B..^Þ.|.J..^Ì.à.l...z. 000020
8E1E0716 F088AE7E 8D08C483 077C0783 9A076203 759ADC88 08EC8307 5D061F9A ...]..ã..É.u.b....|..á..~Û.Þ.... 000040
FFD276FF D476FFE4 5689E246 89079804 2C9A0781 01889AAE 5E8D1FA5 A5A5A5DA ÖÉÉÉÉ..^Û.|..........Fã.Vö.vå.vø. 000060
9AA65E8D 1FA5A5A5 A5DA8E1E 0716F088 A67E8D08 C48307B2 07449ACE 76FFD076 vÅ.vö.D.ý..á..~Ì.Þ....ÖÉÉÉÉ..^Ì. 000080
9A07D203 759ADC88 08EC8307 CD061F9A 007A1E8D 07C305C8 9AE65E8D 078A0188 |.¤..^Ì.à.û...z....ë..ã..É.u.ø.. 0000A0
2C9A07F1 01889A9E 5E8D1FA5 A5A5A5DA 8E1E0716 F0889E7E 8008C483 07EC0783 ..ã..á..~..Þ....ÖÉÉÉÉ..^..|.Þ.., 0000C0
9ADC8808 EC830812 061F9A0D 7A1E8D08 0801889A E65E8DDC 5689DA46 8907FF04 ....FÖ.VÉ.^Ì.|.....z.......ã..É. 0000E0
889A9E5E 8D1FA5A5 A5A5DA8E 1E0716F0 889E7E8D 08C48308 3107839A 08170375 u......1..á..~..Þ....ÖÉÉÉÉ..^..| 000100
C6462BCC 5688CA46 88065EC4 02E8E9EE 46880856 89064689 06D9042C 9A083601 .6..,..\..Fø.VÄ.FŸÖÖ.á^..Fò.Vë+Fö 000120
4688065E C4065789 26044789 26FE5688 FC468806 5EC40257 89260789 26C85618 .Vå&..&.W.á^..F=.V±&.G.&.W.á^..F 000140
56130646 03FE5688 FC468806 5EC40A57 89260847 8926C856 13C64603 CC5688CA ò.Vä.Fó.Vå&.G.&.W.á^..F=.V±.Fø.V 000160
89260789 26E4561B E2462BCC 5688CA46 88065EC4 02B7E90E 5789260C 47892608 Ä&.G.&.W.Õñ.á^..Fò.Vë+Fã.VÖ&..&. 000180
08478926 CC5688CA 4688065E C4065789 26044789 26FE5688 FC468806 5EC40257 W.á^..F=.V±&.G.&.W.á^..Fò.Vö&.G. 0001A0
5EC40265 E90E5789 260C4789 260C5613 DA4603FE 5688FC46 88065EC4 0A578926 &.W.á^..F=.V±.FÖ.VÉ&.G.&.W.Õe.á^ 0001C0
C6462BFE 5688FC46 88065EC4 02578926 07892608 561B0646 28CC5688 CA468806 ..Fò.Vë+Fø.VÄ&..&.W.á^..F=.V±+Fó 0001E0
```

```
Dump of file SATURN:[PCCOMMON.DUMP.DLL]SHP.TMP;1 on 18-APR-1990 10:52:51.06
File ID (922,23,0)    End of file block 111 / Allocated 112

Virtual block number 66 (00000042), 512 (0200) bytes

 8B065EC4 0A578926 08478926 CC568BCA 468B065E C4065789 26044789 26C8561B .V&&.G.&.W.&^..Fò.V&&.G.&.W.&^.. 000000
 2BCC568B CA468B06 5EC4020D E90E5789 260C4789 26C85613 C64603FE 568BFC46 F=.V±.Fó.V&&.G.&.W.Õ..&^..Fò.Vë+ 000020
 26044789 260C561B DA462BFE 568BFC46 8B065EC4 02578926 078926E4 561BE246 Fã.V&&..&.W.&^..F=.V±+FÖ.VÉ&.G.& 000040
 478926FE 568BFC46 8B065EC4 0A578926 08478926 CC568BCA 468B065E C4065789 .W.&^..Fò.Vë&.G.&.W.&^..F=.V±&.G 000060
 5EC40257 89260789 26C8561B C6462BCC 568BCA46 8B065EC4 01BBE90E 5789260C .&.W.ÕÉ.&^..Fò.Vë+Fó.V&&..&.W.&^ 000080
 4603CC56 8BCA468B 065EC406 57892604 478926D8 561BD646 2BFE568B FC468B06 ..F=.V±+F#.VÄ&.G.&.W.&^..Fò.Vë.F 0000A0
 0163E90E 5789260C 478926FE 568BFC46 8B065EC4 0A578926 08478926 C85613C6 ó.V&&.G.&.W.&^..F=.V±&.G.&.W.Õc. 0000C0
 260C561B DA462BFE 568BFC46 8B065EC4 02578926 078926CC 568BCA46 8B065EC4 &^..Fò.Vë&..&.W.&^..F=.V±+FÖ.VÉ& 0000E0
 5EC40A57 89260847 8926E456 13E24603 CC568BCA 468B065E C4065789 26044789 .G.&.W.&^..Fò.Vë.Fã.VÕ&.G.&.W.&^ 000100
 89260789 26CC568B CA468B06 5EC40111 E90E5789 260C4789 26FE568B FC468B06 ..F=.V±&.G.&.W.Õ..&^..Fò.Vë&..&. 000120
 8BCA468B 065EC406 57892604 478926C8 561BC646 2BFE568B FC468B06 5EC40257 W.&^..F=.V±+Fó.V&&.G.&.W.&^..Fò. 000140
 26C85613 C64603FE 568BFC46 8B065EC4 0A578926 08478926 D85613D6 4603CC56 Vë.F#.VÄ&.G.&.W.&^..F=.V±.Fó.V&& 000160
 FC468B06 5EC40257 89260789 26CC568B CA468B06 5EC40089 E90E5789 260C4789 .G.&.W.Õ¿.&^..Fò.Vë&..&.W.&^..F= 000180
 89260847 8926E456 13E24603 CC568BCA 468B065E C4065789 26044789 26FE568B .V±&.G.&.W.&^..Fò.Vë.Fã.VÕ&.G.&. 0001A0
 8B065EC4 0067E90E 5789260C 4789260C 5613DA46 03FE568B FC468B06 5EC40A57 W.&^..F=.V±.FÖ.VÉ&.G.&.W.Õg.&^.| 0001C0
 47892600 00B8065E C4044789 26064789 260000B8 065EC407 89260247 89260000 ..&.G.&..&^.|..&.G.&.G.&^.|..&.G 0001E0

Dump of file SATURN:[PCCOMMON.DUMP.DLL]SHP.TMP;1 on 18-APR-1990 10:52:51.06
File ID (922,23,0)    End of file block 111 / Allocated 112

Virtual block number 67 (00000043), 512 (0200) bytes

 3000012D 0027E900 74E98C67 B80C4789 260E4789 260000B8 065EC408 4789260A .&.G.&^.|..&.G.&.G.|g.Õt.Õ'.-..= 000000
 F00A420A EC089C09 4608EE0A EC084409 9B083FA7 FF2E93C0 03FFB5E9 03760009 ..v.Õç..&...Î?...D.š.Ÿ.F...š.B.Þ 000020
 5EC4990A 468B0257 19260729 26065EC4 990A468B 003BE903 7F010A7E 830A9A09 ....-...Õ;..F..&^.&).&.W..F..&^ 000040
 26065EC4 990A468B 0A571126 08470126 065EC499 0A468B06 57192604 47292606 .&)G.&.W..F..&^.&.G.&.W..F..&^.& 000060
 D88E0576 B81E5657 000004C8 000ACAC9 5F5E1F00 00E90000 B80E5711 260C4701 .G.&.W.|..Õ...^_èò..à...WV.|v..Ä 000080
 0006E903 7C00087E 830009E9 0375FE46 0BFC468B FE5689FC 46890C56 8B0A468B .F..V..F=.V±.F=.F±u.Õ...-..|.Õ.. 0000A0
 5F5E1F00 00E90000 B8165789 26144789 26085688 06468BFC 5EC40017 E98C63B8 |c.Õ..&^=.F..V.&.G.&.W.|..Õ...^ 0000C0
 0BF8468B FA5689F8 46890C56 8B0A468B D88E0BAC B81E5657 000008C8 0008CAC9 èò..à...WV.|¨..Ä.F..V..F%.V°.F%. 0000E0
 8E978B26 008C878B 26008206 8E02E3C1 085E8800 52E98C63 B80006E9 0374FA46 F°t.Õ..|c.ÕR..^.èD.....&....&.... 000100
 5709262C 470926FE 568BFC46 8BF85EC4 0014E903 7500067E 83FE5689 FC468900 ..F=.V±.-..u.Õ..&^%.F=.V±&.G.&.W 000120
 1F0000E9 0000B82E 5721262C 47212602 F7D0F7FE 568BFC46 8BF85EC4 0015E92E .Õ..&^%.F=.V±%Ä%Ø&!G,&!W.|..Õ... 000140
 468BFE56 89FC4689 1056880E 468B088E 0BFC881E 56570000 04C80008 CAC95F5E ^_èò..à...WV.|=..Ä.F..V..F=.V±.F 000160
 0A7E8300 09E9037E 001FE903 7D000C7E 830056E9 8C63B800 06E90374 FE460BFC =.F±t.Õ..|c.ÕV..-..).Õ..-.Õ...-. 000180
 001FE903 7D00087E 831A5789 26184789 260C568B 0A468BFC 5EC40011 E9037700 .w.Õ..&^=.F..V.&.G.&.W..-..).Õ.. 0001A0
 B81E5789 261C4789 26085688 06468BFC 5EC40011 E9037700 067E8300 09E9037E -.Õ...-..w.Õ..&^=.F..V.&.G.&.W.| 0001C0
 46891456 88124688 D88E0C7E B81E5657 000004C8 000CCAC9 5F5E1F00 00E90000 ..Õ...^_èò..à...WV.|-..Ä.F..V..F 0001E0

Dump of file SATURN:[PCCOMMON.DUMP.DLL]SHP.TMP;1 on 18-APR-1990 10:52:51.06
File ID (922,23,0)    End of file block 111 / Allocated 112

Virtual block number 68 (00000044), 512 (0200) bytes

 037E001F E9037D00 107E8300 7EE98C63 B80006E9 0374FE46 0BFC4688 FE5689FC =.V±.F=.F±t.Õ..|c.Õ-..-..).Õ..-. 000000
 0C7E8322 57892620 47892610 56880E46 8BFC5EC4 0011E903 77000E7E 830009E9 Õ...-..w.Õ..&^=.F..V.&.G &.W".-. 000020
 4789260C 56880A46 8BFC5EC4 0011E903 77000A7E 830009E9 037E001F E9037D00 .).Õ..-.Õ...-..w.Õ..&^=.F..V.&.G 000040
 8BFC5EC4 0011E903 7700067E 830009E9 037E001F E9037D00 087E8326 57892624 $&.W&.-..).Õ..-.Õ...-..w.Õ..&^=. 000060
 56570000 04C80010 CAC95F5E 1F0000E9 0000B82A 57892628 47892608 56880646 F..V.&.G(&.W*|..Õ...^_èò..à...WV 000080
 8C63B800 06E90374 FE460BFC 4688FE56 89FC4689 0C568B0A 468BD88E 0004B81E .|...Ä.F..V..F=.V±.F=.F±t.Õ..|c. 0000A0
 5E1F0000 E9000088 02578926 07892606 5EC41657 8B261447 8B26FC5E C4001BE9 Õ..&^=&.G.&.W.&^.&..&.W.|..Õ...^ 0000C0
 F84688FA 5689F846 890E5688 0C4688D8 8E0D8288 1E565700 0008C800 08CAC95F _èò..à...WV.|ý..Ä.F..V..F%.V°.F% 0000E0
 97882600 8C878826 0082068E 02E3C10A 5E880047 E98C63B8 0006E903 74FA460B ¯F°t.Õ..|c.ÕG..^.èD.....&....&... 000100
 0006E903 75000BFE 5623FC46 232E5788 262C4788 26F85EC4 FE5689FC 4689008E ...F=.V±&^½&.G,&.W.#F=#V±.Äu.Õ.. 000120
 000004C8 000ACAC9 5F5E1F00 00E90000 B8078926 065EC400 00B80003 E90001B8 |..Õ..|..&^.&..|..Õ...^_èò..à... 000140
 B80006E9 0374FE46 0BFC4688 FE5689FC 46891056 880E4688 D88E00FD 881E5657 WV.|»..Ä.F..V..F=.V±.F=¯F±t.Õ..| 000160
 89260A5E C41A5788 26184788 26FC5EC4 0015E903 750C4608 0A468800 46E98C63 c.ÕF..F..F.u.Õ..&^=&.G.&.W.&^.&. 000180
 8926065E C41E5788 261C4788 26FC5EC4 0015E903 75084608 06468802 57892607 .&.W..F..F.u.Õ..&^=&.G.&.W.&^.&. 0001A0
 4688D88E 0E74B81E 56570000 04C8000C CAC95F5E 1F0000E9 0000B802 57892607 .&.W.|..Õ...^_èò..à...WV.|t..Ä.F 0001C0
 46080E46 880066E9 8C63B800 06E90374 FE460BFC 4688FE56 89FC4689 14568B12 ..V..F=.V±.F=¯F±t.Õ..|c.Õf..F..F 0001E0
```

```
Dump of file SATURN:[PCCOMMON.DUMP.DLL]SHP.TMP;1 on 18-APR-1990 10:52:51.06
File ID (922,23,0)   End of file block 111 / Allocated 112

Virtual block number 69 (00000045), 512 (0200) bytes

 460B0A46 88025789 26078926 0E5EC422 57882620 478826FC 5EC40015 E9037510 .u.Õ..á^=&.G &.W"á^.&..&.W..F..F 000000
 46080646 88025789 26078926 0A5EC426 57882624 478826FC 5EC40015 E903750C .u.Õ..á^=&.G$&.W&á^.&..&.W..F..F 000020
 00E90000 88025789 26078926 065EC42A 57882628 478826FC 5EC40015 E9037508 .u.Õ..á^=&.G(&.W*á^.&..&.W.|..Õ. 000040
 8B0016E9 03751046 080E4688 D88E0EEA 881E5657 000028C8 0010CAC9 5F5E1F00 ..^ èò..à(..WV.|õ..Ä.F..F.u.Õ... 000060
 56880A46 880127E9 8C63B800 06E90374 08460806 4688000B E903750C 460B0A46 F..F.u.Õ...F..F.t.Õ..|c.Õ'..F..V 000080
 7E0031E9 037DE256 39EA5688 E8468B1F A5F20008 890A8E1E 0716F08B E07E8D0C ..~Á.Þ....Õ¿..·Ë..FÒ.VÕ9Vã).Õ1.~ 0000A0
 4689EA56 88E84688 DE56890C 4689E256 88E04688 0024E903 77E04639 0008E903 .Õ..9FÀw.Õ$..FÁ.Vã.FÉ.V8.FÒ.VÕ.F 0000C0
 037E0031 E9037DE6 5639EE56 88EC4688 EA5689E8 46890E56 88DC4688 E25689E0 Á.Vã.FÉ.V8.FÒ.VÕ.F$.VŸ9VÌ).Õ1.~. 0000E0
 E44689EE 5688EC46 880A5689 D84689E6 5688E446 880024E9 0377E446 390008E9 Õ..9FÕw.Õ$..FÕ.VÌ.FÄ.VÕ.F$.VŸ.FÕ 000100
 45056E9A 5016F046 8D016A0E 76FF1076 FFEE5689 EC46890A 5688D846 88E65689 .VÌ.FÄ.VÕ.F$.VŸ.v..v.j..FÞ.P.n.E 000120
 88F84688 0057E903 76F04639 0008E903 7D0064E9 037EF256 39EA5688 E8468800 ..FÒ.VÕ9V·-.Õd.).Õ..9FÞv.ÕW..F½. 000140
 F65639EE 5688EC46 88003CE9 0376E046 390008E9 037D0049 E9037EE2 5639FA56 V"9Vã-.Õ1.).Õ..9FÀv.Õ<..F$.VŸ9V- 000160
 0013E903 7EE65639 FE5688FC 46880021 E90376F4 46390008 E9037D00 2EE9037E -.Õ..).Õ..9F¶v.Õ|..F=.V±9VÌ-.Õ.. 000180
 E90000B8 07892606 5EC40000 B80003E9 00018800 06E90376 E4463900 08E9037D ).Õ..9FÕv.Õ..|..Õ..|..á^.&..|..Õ 0001A0
 07530002 00000007 104F0002 00000001 02C50002 00069000 0CCAC95F 5E1F0000 ...^_èò.......é.......O.......S. 0001C0
 00000000 00220003 016C0203 00140003 00190203 0000000B 0F800002 0000000A ......................l...".... 0001E0

Dump of file SATURN:[PCCOMMON.DUMP.DLL]SHP.TMP;1 on 18-APR-1990 10:52:51.06
File ID (922,23,0)   End of file block 111 / Allocated 112

Virtual block number 70 (00000046), 512 (0200) bytes

 0006E903 7408460B 06468800 0BE90375 000A7E83 D88EFFFF B81E5657 00000CC8 à...WV.|...Ä.~..u.Õ...F..F.t.Õ.. 000000
 B80006E9 03750000 300000FF FF9A5016 FC468D22 6A0C6A0A 76FF0104 E98C63B8 |c.Õ...v.j.j".F=.P.....=..u.Õ..| 000020
 C726FC5E C4000004 47C726FC 5EC40789 26024789 260000B8 FC5EC400 E5E98C62 b.Õl.á^=|..&.G.&..á^=&úG...á^=&ú 000040
 26FC5EC4 00001C47 C726FC5E C400001A 47C726FC 5EC40000 0847C726 00000647 G...&úG...á^=&úG...á^=&úG...á^=& 000060
 89260247 89260000 B8F45EC4 F65689F4 4689000A 05FE5688 FC468800 001E47C7 úG....F=.V±....F¶.V-á^¶|..&.G.&. 000080
 F45EC408 4789260A 47892600 00B8F45E C4044789 26064789 260000B8 F45EC407 .á^¶|..&.G.&.G.á^¶|..&.G.&.G.á^¶ 0000A0
 7500003D 00000033 9A5016F8 468D016A 0C6A0A76 FF0C4789 260E4789 260000B8 |..&.G.&.G..v.j.j..F½.P.3...=..u 0000C0
 57892607 8926FA56 88F84688 FC5EC400 07C626F8 5EC40040 E98C62B8 0006E903 .Õ..|b.Õa.á^½&ó..á^=.F½.V"&..&.W 0000E0
 078926FE 5688FC46 88065EC4 20478926 0A4688FC 5EC40000 0447C726 FC5EC402 .á^=&úG...á^=.F.&.G á^..F=.V±&.. 000100
 064688D8 8E0008B8 1E565700 0004C800 06CAC95F 5E1F0000 E90000B8 02578926 &.W.|..Õ...^_èò..à...WV.|...Ä.F. 000120
 078826FC 5EC400B1 E98C63B8 0006E903 74FE4608 FC4688FE 5689FC46 89085688 .V..F=.V±.F=¯F±t.Õ..|c.ÕŸ.á^=&.. 000140
 300000FF FF9A37FF 260277FF 26FC5EC4 2077FF26 FC5EC400 24E90375 02470826 &.G.u.Õ$.á^=&.w á^=&.w.&.7.....= 000160
 47C726FC 5EC40789 26024789 260000B8 FC5EC400 7EE98C62 B80006E9 03750000 ..u.Õ..|b.Õ-.á^=|..&.G.&..á^=&úG 000180
 C726FC5E C400001A 47C726FC 5EC40000 0847C726 00000647 C726FC5E C4000004 ...á^=&úG...&úG...á^=&úG...á^=&ú 0001A0
 00B8FC5E C40A4789 260C4789 260000B8 FC5EC400 001E47C7 26FC5EC4 00001C47 G...á^=&úG...á^=|..&.G.&.G.á^=|. 0001C0
 47892600 00B8FC5E C4124789 26144789 260000B8 FC5EC40E 47892610 47892600 .&.G.&.G.á^=|..&.G.&.G.á^=|..&.G 0001E0

Dump of file SATURN:[PCCOMMON.DUMP.DLL]SHP.TMP;1 on 18-APR-1990 10:52:51.06
File ID (922,23,0)   End of file block 111 / Allocated 112

Virtual block number 71 (00000047), 512 (0200) bytes

 468BD88E 0139B81E 56570000 04C80004 CAC95F5E 1F0000E9 0000B816 47892618 .&.G.|..Õ...^_èò..à...WV.|9..Ä.F 000000
 74FE4608 FC468B00 57E98C63 B80006E9 0374000A 7E83FE56 89FC4689 08568B06 ..V..F=.V±.~..t.Õ..|c.ÕW..F=.F±t 000020
 00000278 9A37FF26 0277FF26 FC5EC420 77FF26FC 5EC40046 E90000B8 0006E903 .Õ..|..ÕF.á^=&.w á^=&.w.&.7.x... 000040
 7500003D 0000017B 9AFC76FF FE76FF0A 76FF0022 E98C62B8 0006E903 75000030 =..u.Õ..|b.Õ"..v..v±.v=.(...=..u 000060
 1AB81E56 57000008 C80006CA C95F5E1F 0000E900 00B80006 E98C62B8 0006E903 .Õ..|b.Õ..|..Õ...^_èò..à...WV.|. 000080
 460BFC46 8BFA5689 F846890C 568B0A46 8BFE5689 FC468910 568B0E46 8B088E02 ..Ä.F..V..F=.V±.F..V..F½.V".F=.F 0000A0
 E98C63B8 0006E903 7408460B 06468B00 0BE90375 FA460BF8 468B0016 E90375FE ±u.Õ...F½.F"u.Õ...F..F.t.Õ..|c.Õ 0000C0
 00008800 0007C726 065EC400 0EE90375 04473926 FC5EC404 478826F8 5EC400B0 ¯.á^½&.G.á^=&9G.u.Õ..á^.&ú...|.. 0000E0
 03750857 39260009 E9037406 473926FC 5EC40857 8B260647 8826F85E C4008FE9 Õ..á^½&.G.&.W.á^=&9G.t.Õ..&9W.u. 000100
 751A4739 26FC5EC4 1A478B26 F85EC400 61E90000 B8000007 C726065E C4000EE9 Õ..á^.&ú...|..Õa.á^½&.G.á^=&9G.u 000120
 26FC5EC4 37FF2602 77FF26F8 5EC40040 E90000B8 000007C7 26065EC4 000EE903 .Õ..á^.&ú...|..Õa.á^½&.w.&.7á^=& 000140
 00B80000 07C72606 5EC4000E E9037500 003008C4 83FFFF00 469A37FF 260277FF .w.&.7.F....á.=..u.Õ..á^.&ú...|. 000160
 1E565700 0006C800 0CCAC95F 5E1F0000 E90000B8 000107C7 26065EC4 000EE900 .Õ..á^.&ú...|..Õ...^_èò..à...WV. 000180
 08064688 000BE903 75FE4608 FC468BFE 5689FC46 890C5688 0A468B08 8E029FB8 |...Ä.F..V..F=.V±.F=¯F±u.Õ...F.. 0001A0
 9AFC76FF FE76FF0E 76FF1076 FF0676FF 0876FF00 31E98C63 B80006E9 03740846 F.t.Õ..|c.Õ1..v..v..v..v..v±.v=. 0001C0
 5E1F0000 E90000B8 0006E9FA 46880006 E9037500 003DFA46 890CC483 FFFF0CB4 Ç....á..F"=..u.Õ...F"Õ..|..Õ...^ 0001E0
```

```
Dump of file SATURN:[PCCOMMON.DUMP.DLL]SHP.TMP;1 on 18-APR-1990 10:52:51.06
File ID (922,23,0)    End of file block 111 / Allocated 112

Virtual block number 72 (00000048), 512 (0200) bytes

 EC4688EE 5689EC46 890C5688 0A4688D8 8E03A1B8 1E565700 001CC800 0CCAC95F  _èÐ..à...WV.|Á..Ä.F..V..F§.VŸ.F§ 000000
 8D085688 06468800 ACE98C63 880006E9 03740846 08064688 000BE903 75EE4608  .FŸu.Õ...F..F.t.Õ..|c.Õ¨..F..V.. 000020
 E9037E00 31E9037D F25639FA 5688F846 881FA5F2 00088B9DA 8E1E0716 F088F07E  ~Þ.Þ....Õ¿..·É..F½.V°9V·).Õ1.~.Õ 000040
 89F04689 FA5688F8 4688EA56 89E84689 F25688F0 46880024 E90377F0 46390008  ..9FÞw.Õ$..FÞ.V·.FÕ.VÕ.F½.V°.FÞ. 000060
 08E9037E 0031E903 7DF65639 FE5688FC 4688FA56 89F84689 EA5688E8 4688F256  V·.FÕ.VÕ.F½.V°.F=.V±9V-}.Õ1.~.Õ. 000080
 5689F446 89FE5688 FC4688E6 5689E446 89F65688 F4468800 24E90377 F4463900  .9F¶w.Õ$..F¶.V-.FÕ.V|.F=.V±.F¶.V 0000A0
 881FA5F2 0008891F 161EF076 8D0A7F8D EC5EC4FE 5689FC46 89E65688 E44688F6  -.FÕ.V|.F=.V±é^ä....vÞ...¿..·É.| 0000C0
 46890C56 880A4688 D88E0400 881E5657 000004C8 0008CAC9 5F5E1F00 00E90000  ..Õ...^_èÐ..à...WV.|...Ä.F..V..F 0000E0
 001FE98C 63880006 E9037408 46080646 88000BE9 0375FE46 08FC4688 FE5689FC  =.V±.F=.F±u.Õ...F..F.t.Õ..|c.Õ.. 000100
 1F0000E9 0000881F A5F20008 890A8E1E F088F888 000A05FE 5688FC46 88065EC4  é^..F=.V±....«.Þ..Õ¿..·É.|...Õ... 000120
 4688FE56 89FC4689 0C56880A 4688D88E 04F4881E 56570000 04C80008 CAC95F5E  ^_èÐ..à...WV.|¶..Ä.F..V..F=.V±.F 000140
 478826FC 5EC40018 E98C6388 0006E903 7408460B 06468800 08E90375 FE460BFC  =.F±u.Õ...F..F.t.Õ..|c.Õ..é^=&.G 000160
 000004C8 0008CAC9 5F5E1F00 00E90000 88025789 26078926 065EC408 57882606  .&.W.é^.&..&.W.|...Õ...^_èÐ..à... 000180
 830009E9 0375FE46 08FC4688 FE5689FC 46890C56 880A4688 D88E054E 881E5657  WV.|N..Ä.F..V..F=.V±.F=.F±u.Õ... 0001A0
 88085789 26064789 26085688 064688FC 5EC40017 E98C6388 0006E903 7C00087E  ~..|.Õ..|c.Õ..é^=.F..V.&.G.&.W.| 0001C0
 46890C56 880A4688 D88E05A4 881E5657 000004C8 000CCAC9 5F5E1F00 00E90000  ..Õ...^_èÐ..à...WV.|É..Ä.F..V..F 0001E0

Dump of file SATURN:[PCCOMMON.DUMP.DLL]SHP.TMP;1 on 18-APR-1990 10:52:51.06
File ID (922,23,0)    End of file block 111 / Allocated 112

Virtual block number 73 (00000049), 512 (0200) bytes

 0013E98C 63880006 E9037408 46080646 88000BE9 0375FE46 08FC4688 FE5689FC  =.V±.F=.F±u.Õ...F..F.t.Õ..|c.Õ.. 000000
 56570000 04C80008 CAC95F5E 1F0000E9 0000B807 8926065E C41A4788 26FC5EC4  é^=&.G.é^.&..|..Õ...^_èÐ..à...WV 000020
 8C638800 06E90374 FE460BFC 4688FE56 89FC4689 0A568808 4688D88E 05F4881E  .|¶..Ä.F..V..F=.V±.F=.F±t.Õ..|c. 000040
 89260646 88FC5EC4 0010E900 00880006 E903741A 47392606 4688FC5E C40025E9  Õ%.é^=.F.&9G.t.Õ..|..Õ..é^=.F.&. 000060
 56880846 88D88E06 42881E56 57000004 C80006CA C95F5E1F 0000E900 00881A47  G.|..Õ...^_èÐ..à...WV.|B..Ä.F..V 000080
 7F02067E 830009E9 037D0006 7E830012 E90375FE 460BFC46 88FE5689 FC46890A  ..F=.V±.F=.F±u.Õ...~..).Õ...~... 0000A0
 06CAC95F 5E1F0000 E90000B8 1C478926 064688FC 5EC40010 E98C6388 0006E903  .Õ..|c.Õ..é^=.F.&.G.|..Õ...^_èÐ. 0000C0
 75FE4608 FC4688FE 5689FC46 890C5688 0A4688D8 8E0697B8 1E565700 0004C800  .à...WV.|...Ä.F..V..F=.V±.F=.F±u 0000E0
 26065EC4 1C478826 FC5EC400 13E98C63 880006E9 03740846 08064688 000BE903  .Õ...F..F.t.Õ..|c.Õ..é^=&.G.é^.& 000100
 56880846 88D88E06 E9881E56 57000004 C80008CA C95F5E1F 0000E900 00880789  ..|..Õ...^_èÐ..à...WV.|Õ..Ä.F..V 000120
 7F08067E 830009E9 037D0006 7E830012 E90375FE 460BFC46 88FE5689 FC46890A  ..F=.V±.F=.F±u.Õ...~..).Õ...~... 000140
 06CAC95F 5E1F0000 E90000B8 1E478926 064688FC 5EC40010 E98C6388 0006E903  .Õ..|c.Õ..é^=.F.&.G.|..Õ...^_èÐ. 000160
 75FE460B FC4688FE 5689FC46 890C5688 0A4688D8 8E0737B8 1E565700 0004C800  .à...WV.|7..Ä.F..V..F=.V±.F=.F±u 000180
 26065EC4 1E478826 FC5EC400 13E98C63 880006E9 03740846 08064688 000BE903  .Õ...F..F.t.Õ..|c.Õ..é^=&.G.é^.& 0001A0
 56880A46 88D88E07 89881E56 57000004 C80008CA C95F5E1F 0000E900 00880789  ..|..Õ...^_èÐ..à...WV.|...Ä.F..V 0001C0
 8C638800 06E90374 08460806 46880008 E90375FE 460BFC46 88FE5689 FC46890C  ..F=.V±.F=.F±u.Õ...F..F.t.Õ..|c. 0001E0

Dump of file SATURN:[PCCOMMON.DUMP.DLL]SHP.TMP;1 on 18-APR-1990 10:52:51.06
File ID (922,23,0)    End of file block 111 / Allocated 112

Virtual block number 74 (0000004A), 512 (0200) bytes

 5F5E1F00 00E90000 88025789 26078926 065EC402 57882607 8826FC5E C4001AE9  Õ..é^=&..&.W.é^.&..&.W.|..Õ...^_ 000000
 08FC4688 FE5689FC 46891056 880E4688 D88E07D7 881E5657 000004C8 0008CAC9  èÐ..à...WV.|×..Ä.F..V..F=.V±.F=. 000020
 00047F83 26FC5EC4 0042E98C 63880006 E903740C 46080A46 88000BE9 0375FE46  F±u.Õ...F..F.t.Õ..|c.ÕB.é^=&.... 000040
 0007E908 C4830369 00109A0A 76FF0C76 FF37FF26 0277FF26 FC5EC400 18E9037F  ..Õ..é^=&.w.&.7.v..v....i..Ä.Õ.. 000060
 0CCAC95F 5E1F0000 E90000B8 07892606 5EC40447 8826FC5E C40007C6 260A5EC4  é^.&Õ..é^=&.G.é^.&..|..Õ...^_èÐ. 000080
 75FC4608 FA4688D8 5689FA46 890C5688 0A4688D8 8E082C88 1E565700 0006C800  .à...WV.|,..Ä.F..V..F°.V=.F°.F=u 0000A0
 09500070 9A0676FF 0876FF00 C2E98C63 880006E9 03740846 08064688 000BE903  .Õ...F..F.t.Õ..|c.ÕÕ..v..v..p.P. 0000C0
 0277FF26 FA5EC420 77FF26FA 5EC40055 E9037F04 473826FA 5EC4FE46 8904C483  .é..F±é^°&;G...ÕU.é^°&.w é °&.w. 0000E0
 880C6A20 77FF26FA 5EC40081 E98C6288 0006E903 7500003D 0000025C 9A37FF26  &.7.\...=..u.Õ..|b.Õ..é^°&.. |.. 000100
 FA5EC400 5AE98C62 880006E9 03750000 30000000 D89AFA76 FFFC76FF 5040FE46  F±@P.v=.v°.Ä...=..u.Õ..|b.ÕZ..^° 000120
 0876FF00 18E90377 00003004 C4830970 00709A06 76FF0876 FF044789 26FE4688  .F±&.G..v..v..p.p..é.=..w.Õ...v. 000140
 0826078B 26FA5EC4 0019E908 C4830878 00109A37 FF260277 FF26FA5E C40676FF  .v.é^°&.w.&.7...x..é.Õ..é^°&..&. 000160
 04C8000C CAC95F5E 1F0000E9 0000B800 07C6261F C426FA5E C4000AE9 03750247  G.u.Õ..é^°&é.&é..|..Õ...^_èÐ..à. 000180
 08E90375 FE460BFC 4688FE56 89FC4689 0C56880A 4688D88E 08A9881E 56570000  ..WV.|^..Ä.F..V..F=.V±.F=.F±u.Õ. 0001A0
 88078926 065EC404 478826FC 5EC40013 E98C6388 0006E903 7408460B 06468800  ..F..F.t.Õ..|c.Õ..é^=&.G.é^.&..| 0001C0
 46891056 880E4688 D88E09A6 881E5657 00000EC8 0008CAC9 5F5E1F00 00E90000  ..Õ...^_èÐ..à...WV.|¦..Ä.F..V..F 0001E0
```

```
Dump of file SATURN:[PCCOMMON.DUMP.DLL]SHP.TMP;1 on 18-APR-1990 10:52:51.06
File ID (922,23,0)   End of file block 111 / Allocated 112

Virtual block number 75 (0000004B), 512 (0200) bytes

 750C4608 0A468800 16E90375 FC460BFA 46880000 F246C700 00F446C7 FC5689FA *.V=úF¶..úF·...F*.F=u.Õ...F..F.u 000000
 89025788 26078826 FA5EC400 7AE98C63 B80006E9 03740846 08064688 0008E903 .Õ...F..F.t.Õ..¡c.Õz.á^*&..&.W.. 000020
 03740000 3DFE4EFF FE4688F6 46FF0003 E9FE4689 04478826 FA5EC4F8 5689F646 F-.V½á^*&.G..F±Õ...F-.F±.N±=..t. 000040
 8026F65E C40016E9 0374003F 8026F65E C40028E9 0375003F 8026F65E C4000CE9 Õ..á^-&.?.u.Õ(.á^-&.?.t.Õ..á^-&. 000060
 078926F4 46880A5E C4FFBBE9 F446FF00 03E9F246 FFF646FF 0003E903 740A017F ...t.Õ...F-.F·Õ...F¶Õ£.á^..F¶&.. 000080
 09F4B81E 56570000 0EC8000C CAC95F5E 1F0000E9 00008807 8926F246 88065EC4 á^..F·&..¡..Õ..._èò..à...WV.¡¶. 0000A0
 FC468800 00F246C7 0000F446 C70000F6 46C7FE56 89FC4689 18568816 46880D88E .Ä.F..V..F=.V±úF-..úF¶..úF·...F= 0000C0
 46880016 E9037514 46081246 880021E9 0375FA46 08F84688 002CE903 75FE460B .F±u.Õ...F½.F*u.Õ|..F..F.u.Õ...F 0000E0
 078B26FC 5EC40091 E98C63B8 0006E903 74084608 06468800 08E90375 0C4600B0A ..F.u.Õ...F..F.t.Õ..¡c.Õ..á^=&.. 000100
 E9037E04 473926F2 4688FC5E C4F246FF F846FF00 06E9FA56 89F84689 02578826 &.W..F½.V*Õ...F½.F·á^=.F·&9G.-.Õ 000120
 7F8026F8 5EC40024 E903740D 3F8026F8 5EC40045 E9037500 3F8026F8 5EC4000C ..á^½&.?.u.ÕE.á^½&.?.t.Õ$.á^½&.. 000140
 5EC40012 E9008926 F246880A 76C4E301 F446FFF4 5E88F846 FF0003E9 03740A01 ..t.Õ...F½.^¶.F¶ïDáv..F·&..Õ..á^ 000160
 88065EC4 078926F6 46880E5E C4FF9AE9 00882612 76C4F646 FFF65E88 078A26F8 ½&...^-.F-áv.&..Õ..á^..F-&..á^.. 000180
 4688D88E 0ABEB81E 56570000 0EC80014 CAC95F5E 1F0000E9 0000B807 8926F446 F¶&..¡..Õ..._èò..à...WV.¡/..Ä.F 0001A0
 75FE460B FC468800 00F246C7 0000FA46 C70000F4 46C7FE56 89FC4689 14568812 ..V..F=.V±úF¶..úF*..úF·...F=.F±u 0001C0
 0005E903 740A460B 08468800 B8E98C63 B80006E9 03741046 080E4688 0008E903 .Õ...F..F.t.Õ..¡c.Õ|..F..F.t.Õ.. 0001E0

Dump of file SATURN:[PCCOMMON.DUMP.DLL]SHP.TMP;1 on 18-APR-1990 10:52:51.06
File ID (922,23,0)   End of file block 111 / Allocated 112

Virtual block number 76 (0000004C), 512 (0200) bytes

 7E83F246 FFF646FF 0006E9F8 5689F646 89025788 26078826 FC5EC400 000646C7 úF...á^=&..&.W..F-.V½Õ...F-.F·.- 000000
 003926F2 46880876 C4E301F4 5E88002A E9037CF4 46390646 880058E9 037C50F2 ·P|.Õ[..F.9F¶|.Õ*..^¶ïDáv..F·&9. 000020
 390C4688 0023E9F4 46FF0A07 C626F65E C4F646FF 0007C626 F65EC400 17E90374 t.Õ..á^-&6...F-á^-&6...F¶Õ#..F.9 000040
 E90003E9 0003E907 8826F65E C4008A26 0E76C4FA 46FFFA5E 880015E9 037CFA46 F*|.Õ...^*.F*áv.&..á^-&..Õ..Õ..Õ 000060
 06E90375 F2463806 46030C46 88044789 26F24688 FC5EC400 07C626F6 5EC4FF96 ..á^-&6..á^*.F·&.G..F..F.;F·u.Õ. 000080
 D88E08BA B81E5657 000066C8 0014CAC9 5F5E1F00 00E90000 B80006E9 00018800 .|..Õ..|..Õ..._èò..àf..WV.|¤..Ä 0000A0
 5016FC46 8D0A76FF 0C76FF00 00FFFF9A 5016A446 8D0A76FF 0C76FF00 01AA46C7 úF¯...v..v..FÊ.P̄......v..v..F=.P 0000C0
 5EC4A846 891A4788 26065EC4 F65689F4 4689000A 05085688 06468800 00FFFF9A ......F..V.....F¶.V-á^.&.G..F´á^ 0000E0
 003F8026 F85EC400 0CE90375 FA460BF8 4688FA56 89F84689 02578826 07882606 .&..&.W..F½.V*.F½.F*u.Õ..á^½&.?. 000100
 56889A46 880E5EC4 FFFF0229 9A50169A 468DA876 FFF476FF F676FF00 5CE90374 t.Õ\..v-.v¶.v´.F..P.)...á^..F..V 000120
 889A4688 0E5EC406 57892604 478926A0 56889E46 880E5EC4 02578926 0789269C .&..&.W.á^..F..V.&.G.&.W.á^..F.. 000140
 88E90000 880E5789 260C4789 26A05688 9E46880E 5EC40A57 89260847 89269C56 V.&.G.&.W.á^..F..V.&.G.&.W.|..ÕE 000160
 002CE903 740A5739 260035E9 03740847 3926F45E C4025788 26078826 F45EC401 .á^¶&..&.W.á^¶&9G.t.Õ5.&9W.t.Õ,. 000180
 000CE903 74065739 260015E9 03740447 3926F45E C40E5788 260C4788 26F45EC4 á^¶&.G.&.W.á^¶&9G.t.Õ..&9W.t.Õ.. 0001A0
 8DF476FF F676FF01 6A026AA8 76FF0A76 FF0C76FF 0069E9CC 4689CE46 89000088 |...Fö.FäÕi..v..v..v´j.j. v-.v¶. 0001C0
 89260789 26E65688 E44688CC 5EC4CE56 8CCC4689 8C468000 00FFFF9A 5016E446 Fö.P......F¥.Fä.Vöá^ä.FÕ.V'&..&. 0001E0

Dump of file SATURN:[PCCOMMON.DUMP.DLL]SHP.TMP;1 on 18-APR-1990 10:52:51.06
File ID (922,23,0)   End of file block 111 / Allocated 112

Virtual block number 77 (0000004D), 512 (0200) bytes

 04478926 EA5688E8 4688CC5E C40A5789 26084789 26EE5688 EC4688CC 5EC40257 W.á^ä.Fä.V¥&.G.&.W.á^ä.FÒ.Võ&.G. 000000
 C4016A02 6A0A76FF 0C76FF0E 5789260C 478926F2 5688F046 88CC5EC4 06578926 &.W.á^ä.FÞ.V·&.G.&.W..v..v.j.j.á 000020
 FFFA76FF 016AFC76 FFFE76FF 0000FFFF 9A5016D0 46800677 FF260877 FF26065E ^.&.w.&.w..FÅ.P......v±.v=j..v*. 000040
 C41C77FF 26065EC4 A876FFA4 76FFA676 FFCC76FF CE76FF04 77FF2606 5EC4F876 v½á^.&.w..vö.vë.vÌ.vÊ.v´á^.&.w.á 000060
 E9037500 A27E83A2 46890000 FFFF9A50 16AC468D AA76FFD0 76FF1E77 FF26065E ^.&.w..vÅ.v¯.F¯.P......FÅ.-Å.u.Õ 000080
 260000B8 0E5EC407 89260247 89260000 B80E5EC4 0030E903 758789A2 7E810047 G..-Å¿.u.Õ=.á^.|..&.G.&..á^.|..& 0000A0
 260E4789 260000B8 0E5EC408 4789260A 47892600 00880E5E C4044789 26064789 .G.&.G.á^.|..&.G.&.G.á^.|..&.G.& 0000C0
 56890C46 89865688 84468806 56890446 89AE5688 AC468800 53E98C66 880C4789 .G.⊥f.ÕS..F¯.VÛ.Få.V⌀.FÇ.VÑ.FÉ.V 0000E0
 FF0A76FF 0C76FFE2 5689E046 89BA5688 B846880A 56890846 89825688 B046880E ß.F¯.Vý.FÅ.VÖ.F|.Vα.FÅ.Vã.v..v.. 000100
 C95F5E1F 0000E900 00880000 0DE59A0E 76FF1076 FF501604 4680026A 016AA876 v´j.j..Få.P.v..v..Î...|..Õ...^_è 000120
 0CE10203 00000008 03E20002 006F0005 0CD10203 00000002 00360002 000890C8 ù.....6.......Î...o...ä.......Ä. 000140
 09040203 00140003 09280203 00000008 0CBC0002 0000000A 08DE0002 00780005 ..(...8.......¥.......+........ 000160
 00000000 004F0005 0E500203 003F0005 0F320203 00330004 0E920203 00220003 .."......3...2...?...P...O..... 000180
 8DFE76FF 0000FFFF 9A5016FE 468D1876 FF1A76FF D88EFFFF B81E5657 000006C8 à...WV.|...Ä.v..v..F±.P......v±. 0001A0
 0054059C 9A1076FF 1276FFFA 76FFFC76 FF1876FF 1A76FF00 3E00009A 5016FA46 F*.P...>..v..v..v=.v*.v..v....T. 0001C0
 76FF003E E9037400 00300073 063A9A0A 76FFFA76 FFFC76FF 0054E903 74000030 =..t.ÕT..v=.v*.v..:.s.=..t.Õ>..v 0001E0
```

```
Dump of file SATURN:[PCCOMMON.DUMP.DLL]SHP.TMP;1 on 18-APR-1990 10:52:51.06
File ID (922,23,0)   End of file block 111 / Allocated 112

Virtual block number 78 (0000004E), 512 (0200) bytes

 1A76FF00 1FE90374 00003000 9208A19A 1476FF16 76FFFA76 FFFC76FF 1876FF1A ..v..v=.v*.v..v..Å...=..t.Õ...v. 000000
 FFFE76FF 0014E903 7500003D 00A80399 9A0676FF 0876FFFA 76FFFC76 FF1876FF .v..v=.v*.v..v....´.=..u.Õ...v±. 000020
 0088FFFF 02129AFA 76FFFC76 FFFE76FF 0014E98C 63B8008C 02129AFA 76FFFC76 v=.v*...¥.|c.Õ...v±.v=.v*.....|. 000040
 00020000 00080027 00020062 00050018 02030003 900016CA C95F5E1F 0000E900 .Õ...^_èò...........b...'....... 000060
 00000000 00000000 00000000 00000000 00000000 00000000 00000000 00080008 ................................ 000080
 A8C78806 7EC4D1F7 AEF2FFFF B9C033C0 8ED88CFE 880A76C5 1EDE8807 88EC8855 U.å.m.B.év..±.Ä.å3å¿..·Ô%1é-..ú´ 0000A0
 76C51EDE 8807888EC 8855CB5D C28C1FFA 88F388A4 F3C913A5 F3E90149 A4027401 .t.Ê l1ÕµÊ.èµÊ.µ.*..õ]ìU.å.m.B.év 0000C0
 00CB50FA 88F38B1F FFFF1DC0 1B0574A6 F3F92BD1 F7AEF2FF FFB9C033 0A7EC406 .å~.3å¿..·Ô%1+*µ!t..å.....µ.*]ù. 0000E0
 FF335356 57EC8855 00CB5DFA 8B9149D1 F7AEF2FF FFB9C033 067EC4D7 88EC8855 U.å.mé~.3å¿..·Ô%!!..*]ù.U.$WVS3. 000100
 47117DC0 080C4688 06568908 46890000 1DDAF7D8 F7065688 47117DC0 08084688 .F..å).G.V.%Ä%Õ....F..V..F .å).G 000120
 D888F1F7 D2330846 880A4E88 1575C00B 0A56890C 46890000 1DDAF7D8 F70A5688 .V.%Ä%Õ....F..V..åu..N..F.: %þ.Ä 000140
 F475D808 D8D1EAD1 D901EB01 06468808 56880A4E 8BD88B38 EBD388F1 F7064688 .F.%þ.Æ$8.Ä.N..V..F.1$1115tÀ.'¹¶ 000160
 D2334E01 7606463B 06720777 0856380C 72D103E6 F70A4688 910C66F7 F08BF1F7 %þ.Þ%f...F.%!.1r.;V.w.r.;F.v.N3Ø 000180
 8BD8080C 5E8B0846 88EC8855 0008CA5D E5885F5E 58000A83 D8F7DAF7 07754F96 .Ou.%Õ%Ä.Õ.[^_.[]ò..U.å.F..^..Ä. 0001A0
 E3F70646 88C8030C 66F70646 88C888E3 F70008CA 50E588E3 F7064688 0B750A5E ^.u..F.%D.[]ò¯.%D.à.F.%f..à.F.%D 0001C0
 C08ED08C CB5E5FA5 F3000AB9 01688F00 FE8EC08E D88C5756 0008CA5D E588D103 .[.[]ò..VW.Ä.â/±.¢h.¿..µÊ_^ù.Ä.â 0001E0

Dump of file SATURN:[PCCOMMON.DUMP.DLL]SHP.TMP;1 on 18-APR-1990 10:52:51.06
File ID (922,23,0)   End of file block 111 / Allocated 112

Virtual block number 79 (0000004F), 512 (0200) bytes

 575616EB F388D98E A5A5FCD8 8EC18ED9 8CC08CFB 880CC383 047A1E88 F3885756 VW.µ..z..Û..«.å.).ê.Ä=ÊÊ.).µŠ.VW 000000
 7789047A 1E894E74 0466FB81 F388A5A5 FCC18ED9 8CFB880C C383047A 1E88F388 .µ..z..Û..«.).ê=ÊÊ.µ.«f.tN..z..w 000020
 8EC18ED9 8CC08CFB 880CC383 047A1E88 F3885756 C08ED08C CB5E5F03 FE47C6FC =6G±. ^ù.Ä.åVW.µ..z..Û..«.å.).ê. 000040
 A5A5FCC1 8ED98CFB 880CC383 047A1E88 F3885756 18EBF388 D98EA5A5 A5A5FCD8 Ä=ÊÊÊÊ.).µŠ.VW.µ..z..Û..«.).ê=ÊÊ 000060
 EBD08C57 56060DE9 CB5E5FFC 778907FE 47C6047A 1E890E74 0466FB81 F388A5A5 ÊÊ.µ.«f.t...z.6G±..w=_^ùÕ..VW.ÄŠ 000080
 74033CA5 A5FE4588 ADFB880C C383047A 1E88F388 FCD88EC1 8ED98CD8 8C575604 .VW.Ä.).ê.Ä=.µ..z..Û.¯«Ù.E±ÊÊ<.t 0000A0
 02578B26 078826C0 8ED08CCB 5E5FD98E FC5F8904 7A1E89CF 740466FB 81A5A502 .ÊÊ.«f.tù..z.._=.)_^ù.Ä.å&..&.W. 0000C0
 8024C78A D088DA88 57569907 8803E802 57880788 0AE89907 8826C08E D08C14EB Š..Ä.å&...Š....¯W.Š¯....VW.Õ.Ä.ú$. 0000E0
 8ED98CFC 7D89047A 3E891C74 0466FF81 0CC78304 7A3E8800 D883DAF7 D8F70779 y.%Ù%Õ.Û..>z..ú...f.t..>z..)=.). 000100
 33C88887 60BD5507 FE45C6FF 63E9CB5E 5F082EE8 9EB403FE 45C60F75 00FF80C1 ê...u.6E±.Ç.Ò.. ^ùÕc.6E±.U§'..ù3 000120
 66FF810C C783FE45 8AFC7588 047A3E88 C08ED88C 5756CB5E 5F5D0E8D E8F888D8 Ù.«Ò..]_^ùVW.Ä.Ĕ.>z..u=.E±.ú...f 000140
 83047A3E 885756CB 5E5FA5A5 0274033C A5A5FCFE 4588FC7D 89047A3E 89817404 .tÝ.>z..¯)=.E±=ÊÊ<.t.ÊÊ ^ùVW.>z.. 000160
 8CCB5E5F ABABFCC0 33C08ED8 8C03FE45 C6FC7D89 047A3E89 8C740466 FF810CC7 ú...f.t..>z..)=6E±..Ä.ã3å=¨¨ ^ù. 000180
 56C08ED8 8C02E8D0 8C11EB0C 047A0683 047A1E88 FCF88857 56C08ED8 8C02E8D0 ÄŠ..Ä.åVW.«=..z...z..Š..ÄŠ..Ä.âV 0001A0
 018A2689 55CB5E5F 0C047A2E 83A5A5FC 778B0D75 03FE7F80 047A1E88 FCF88857 W.«=..z...±.u..w=ÊÊ..z.._^ìU.&.. 0001C0
 0683047A 1E88FCFB 885756C0 8ED88C02 EBD08CE4 EB5DDE88 5F0550E8 57FC778B .w=WÒP._.B]ŠÕ.ÄŠ..Ä.åVW.«=..z... 0001E0

Dump of file SATURN:[PCCOMMON.DUMP.DLL]SHP.TMP;1 on 18-APR-1990 10:52:51.06
File ID (922,23,0)   End of file block 111 / Allocated 112

Virtual block number 80 (00000050), 512 (0200) bytes

 A5FC7788 0F7507FE 7F80047A 1E88FCFB 885756C0 8ED88C02 EBD08C11 EB0C047A z..Š..ÄŠ..Ä.åVW.«=..z...±.u..w=Ê 000000
 5756C08E D88C02EB D08CE9EB DF87F788 1CC4E8DF 87CB5E5F 0C047A2E 83A5A5A5 ÊÊÊ..z.._^ù.ÒÒå..%.ÒŠÕ.ÄŠ..Ä.åVW 000020
 8AF38804 7A1E8BFB 885756C0 8ED88C02 EBD08C10 EB0C047A 0683047A 1E88F888 .«..z...z̄..Š..ÄŠ..Ä.åVW.«..z..µ. 000040
 BA09C188 50EB099D 8A0993B8 CB5E5FA5 A5027403 3CA5A5A8 FC0C047A 2E83FE47 G±..z..=¨ÊÊ<.t.ÊÊ_^ù|..¤..ŠP|ê.¤ 000060
 E805E6E8 9010EB05 E7E836EB 040CBA04 0688012E 26889FFF FF04659A 48EB09C6 6.ŠH.e.....&..|..¤̄..Š6ÒÒ.Š..Ò1.Š 000080
 F704659A C3DAF700 02830BF7 0773589E 012E268A 5005F9E8 9004EB06 34E8900A ..Ò4.Š..Ò*.P.&...Xs.%Ä.Ø.%Òù.e.% 0000A0
 047A3689 0CEE8304 7A368B51 53018A26 89555756 0418BA04 12B8012E 26889F03 ...&..|..¤..VWU.&..SQ.6z..Ÿ..6z. 0000C0
 F6FF32FE 5D8A047A 3E8857CB 5E5F5D5B 59D2FF02 E8D0FF04 75087488 030A7C80 .|...t.u..ÄŠ..ØY[]_^ùW.>z..]±2.- 0000E0
 CBE40B03 755F8001 F6F87480 FF41F6C8 5F0875F0 FF41F608 7403FB80 13757F01 ..u..«.t.-A.Þu._ù-Ā..t¥-.._u..Õù 000100
 75F738FC 758BFE5D 8A047A3E 885756CB 5F7F2180 FF32FE5D 8A047A3E 8857CBF9 *ùW.>z..]±2..|._ùVW.>z..]±.u=;%u 000120
 A5C85E5F AB80F480 AD087503 FB80A5FC C18ED98C FC7D89CB 5E5F8031 80FF3208 .2..1._^ù.)=.).Ĕ=E.«.u.Ù.¶.¨_^ùÊ 000140
 EB0008B8 F3885756 04EB1850 E8575602 EBC08ED0 8C5756CB 5E5FAB80 F480ADA5 ÊÙ.¶.¨¯^ùVW.Ä.åŠ.VWÒP.Š.VW.µ|..Š 000160
 EBC08ED0 8C57565E E8000488 F3885756 04EB1838 E8575602 EBC08ED0 8C575676 vVW.Ä.ãŠ.VWÒ8.Š.VW.µ|..Š^VW.Ä.åŠ 000180
 04EB1808 E8575602 EBC08ED0 8C575646 E8000C88 F3885756 04EB1820 E8575602 .VWÒ .Š.VW.µ|..ŠFVW.Ä.åŠ.VWÒ..Š. 0001A0
 E8001088 F3885756 04EB1AF0 E8575602 EBC08ED0 8C57562E E80014B8 F3885756 VW.µ|..Š.VW.Ä.åŠ.VWÒP.Š.VW.µ|..Š 0001C0
 8ED98C04 7A3E88D8 88000088 F3885756 04EB1AD8 E8575602 EBC08ED0 8C575616 .VW.Ä.åŠ.VWÒÄ.Š.VW.µ|...Ä.>z..). 0001E0
```

```
Dump of file SATURN:[PCCOMMON.DUMP.DLL]SHP.TMP;1 on 18-APR-1990 10:52:51.06
File ID (922,23,0)   End of file block 111 / Allocated 112

Virtual block number 81 (00000051), 512 (0200) bytes

 1AE3E802 FCBF02C3 83CB5E5F 50011297 FF018A26 8955FC7D 87107407 FE7D80C1 è.)±.t..)=U.&......]_^ù.û.¢=.ÒD. 000000
 76EB000A B8F38857 5604EB1A A7E85756 02EBC08E D08C5756 DFEB047A 3E88F788 .¥.>z.ŠÖVW.Å.åŠ.VWÒĪ.Š.VW.µ|..Šv 000020
 02EBC08E D08C5756 5EEB0006 B8F38857 5604EB1A 8FE85756 02EBC08E D08C5756 VW.Å.åŠ.VWÒ..Š.VW.µ|..Š^VW.Å.åŠ. 000040
 5604EB1A 5FE85756 02EBC08E D08C5756 46EB000E B8F38857 5604EB1A 77E85756 VWÒw.Š.VW.µ|..ŠFVW.Å.åŠ.VWÒ_.Š.V 000060
 16EB0012 B8F38857 5604EB1A 47E85756 02EBC08E D08C5756 2EEB0016 B8F38857 W.µ|..Š.VW.Å.åŠ.VWÒG.Š.VW.µ|..Š. 000080
 C18ED98C 047A3E8B D88B0002 B8F38857 5604EB1A 2FE85756 02EBC08E D08C5756 VW.Å.åŠ.VWÒ/.Š.VW.µ|...Ä.>z..).è 0000A0
 0010BB17 EB000CBB 1CEB0008 BB21EB00 04BBFF39 E95E1A2A E8560574 07FE7D80 .)±.t.VÒ*.^Õ9.£..Š1£..Š.£..Š.£.. 0000C0
 397407FE 7D80047A 3E885756 0018BB03 EB001CBB 08EB0000 BB00EB00 14BB12EB Š.£..Š.£..Š.£..Š.£..VW.>z..)±.t9 0000E0
 832F731C FB83087D 8BFC7D89 FC758BC0 8ED88C04 7A3E890C EF832B74 07F27D80 .)·.t+.ÿ..>z..Ä.å.u=.)=.)..«.s/. 000100
 07F27D80 02C383CD EB19BDE8 02C383C8 5E5F5D01 1297FF01 8A268955 3E7318FB «.ε>U.&......]_^ù.û.Ò§.Šë.û..)·. 000120
 5F5D010E 97FF018A 2689550C 047A2E83 F7878FEB 19A8E804 7A3E890C EF83C474 tá.ÿ..>z.Ò´.Š¢.¥..z..U.&......]_ 000140
 D0CB9E5E 5FE00AE4 D0E8D141 00259F5D 011297FF 018A2689 550C047A 2E83CB5E ^ù..z..U.&......].X.AìÒÅõ.Å_^.ùÏ 000160
 2BFE884E 4E047A36 8BFCC08E D88C5756 000C8B03 EBFF32DF 02E7D0F8 8AE3D0E3 ÐÅD.«ÅÓ.Ó2.Š.£..VW.Ä.å=.6z.ÑN.±+ 000180
 07FE7D80 047A3E8B 5756EC8B 55CB5E5F F4E24747 1D8BFE44 890587AD 000589FB «¿..Ü...D±..GGã¶_^ùU.ŠVW.>z..)±. 0001A0
 013CBB0E 77E917D0 BA0137BB 0E80E916 B3BA0131 BBCB5DE5 885E5F19 2FE80374 t.Ò/._^.|]ùË1.¤°.Õ..£7.¤Å.Õw.£<. 0001C0
 53E918EC BA0140BB 0E5CE918 EFBA0147 BB0E65E9 1771BA01 41BB0E6E E917B7BA ¤ñ.Õn.£A.¤q.Õe.£G.¤ÿ.Õ\.£M.¤š.ÕS 0001E0
```

```
Dump of file SATURN:[PCCOMMON.DUMP.DLL]SHP.TMP;1 on 18-APR-1990 10:52:51.06
File ID (922,23,0)   End of file block 111 / Allocated 112

Virtual block number 82 (00000052), 512 (0200) bytes

 8B5E5F00 1BE8C032 5756EC8B 550E29E9 1929BA01 59BB0E4A E918508A 0153BB0E .£S.¤P.ÕJ.£Y.¤).Õ).U.ŠVW2åÒ.._^. 000000
 7CBF0676 8D071EFC CB5DE58B 5E5F8004 83368000 0BE880B0 5756EC8B 55CB5DE5 |]ùU.ŠVW¯.Ò...6..._^.|]ù=...v.¢| 000020
 F60340E8 55047A36 89047CBE 047A36FF FF443036 FF4530A5 36A536A5 36A53604 .6E6E6E6E0E.600..6z.ƒ|..6z.UÒa.- 000040
 07FDE801 60BF0674 047CBEC0 8ED88E58 04BFE81E 0716067E 8D555D1B 79800744 D..y.]U.-....Ò¢.X.Å.å/|.t.¢'.Ò». 000060
 06C712EB 83B03330 018606C7 1CEB84B0 34300186 06C700C3 DA8C9604 7A068F5D ]..z...Õû.ú...04¯.Š.ú...03¯.Š.ú. 000080
 C706758C 3C02F81E FF047400 02FA3E83 8A803031 018606C7 08EB8180 31300186 ..01¯.Š.ú...10¯..>ª..t...½.<.u.ú 0000A0
 084521FC 9A5000FD B8083D24 5E9A0182 B8042F21 A29A0188 A3E42A32 31018606 ...12*ðÊ...Å!/.£...^$*.¡».P.=!E. 0000C0
 0254880C 8BFC047A 3E88C308 5A21489A 018836FF 084E21FC 9A50FFE4 050188A1 Å...ð.P.=!N..6...H!Z.û.>z.=...T. 0000E0
 00C2818F E680D8D1 D9D1FAD1 D8D1D9D1 FAD1D8D1 D9D1FAD1 29747F80 C2F7C033 3å¾ð..t)!ª!)!Ä!ª!)!Ä!ª!)!Ä.].ð. 000100
 ADC88BAD FC047A3E 8BEAEB00 8AC88BC3 F78B0655 89044D89 02458900 0005C738 ðú....E..M..U..%û.à.ÅŠð.>z.=Ù.àÙ 000120
 B101CA80 0374CD0A D3D1E2D1 D3D1E2D1 D3D1E2D1 F88AADDC 8AF08AAD D48AC80A .à.åÙ.Þ.ÉÙ.%!å!Æ!å!Æ!å!Æ.ët..ð.Ý 000140
 15720777 D13AE0D1 E0D1E0D1 38723800 20307747 E03D7FF0 25E922EC 8AF90A80 ..ª.ǎ"ÕXÞ.=ÁGw=-.8r;!Å!Å!Å;!w.r. 000160
 E50AC70A 7FE7B016 74C00B17 747FB03D 00800508 73000383 01C68010 7401C6F6 -6.t..6..Æ.s....=..t..åt..Õ..ú.! 000180
 8BD08B0A 8B0233C3 F78B0245 89058 9C0 33FED8E9 C3F78B05 89C68AE3 8A024589 .E..D.6...%ûÕÙ±3å...E..%û3ø.Õ.Å. 0001A0
 00DB830A F7D8F707 79C00BC3 8BD08BDA 8B11EBDA F71579D2 08DB33D0 8B1DEBC3 ûŠ..Å3Ù.øy.%ÕŠ..Õ.Å.û.åy.%Ù%Õ.Ù. 0001C0
 8B11EBD9 F71579C9 0BDB33C8 8B1DEBC3 8BC88BDA 8BD23304 74E99E84 8024C48A .6$.Ç.Õt.3ø.Õ.à.ûŠ..à3Ù.èy.%!Š.. 0001E0
```

```
Dump of file SATURN:[PCCOMMON.DUMP.DLL]SHP.TMP;1 on 18-APR-1990 10:52:51.06
File ID (922,23,0)   End of file block 111 / Allocated 112

Virtual block number 83 (00000053), 512 (0200) bytes

 3AE807B5 E9856080 D233FF33 8024C48A 00DB83D9 F7D8F707 79C008C3 8BC88BDA Õ.à.Ù.åy.%Ù%).Ù..6$.3.3ø§'.Õç.Ò: 000000
 E80DEB00 9CE8C3C8 D1677500 D283C0D1 0026E803 EB0035E8 08EB002B E80DEB00 .Š.Ò+.Š.Ò5.Š.Ò&.1å.ø.ug!àûÒ..Š.Ò 000020
 03EB007B E808EB00 2CE800EB 002CE8C3 4E75D208 0039E803 EB005DE8 08EB003E >.Š.Ò].Š.Ò9..øuNûÒ,.Š.Ò,.Š.Ò(.Š. 000040
 C3CAD121 7500D183 C2D100D1 83000283 F508F7D2 F7D1F70D 79FF08C9 330041E8 ÒA.3è..y.%!%ø%Å%.ø..!.!ð.!.u!!òû 000060
 E9E9C301 7200D283 C3130B13 F581F980 CD0AE822 01B50B33 001CE803 EB0056E8 ÒV.Š.Ò..3Ûç."Ò.ë.ª.%.Û.û.ø.r.ûÒÕ 000080
 D1E9D17F E58010CE 80F1220F B6F98B08 EE8391AD 91AD93AD D60A92AD 00A4E9FD »ÕÉ.Ù..øÙ.Ù.Ù..Ÿ..ªÑ."þ.ð..!.1Õ1 0000A0
 F88AACDA 8AD2332F EB25E983 CA7F20F9 83787203 FEE981D8 74C908E9 D1E9D1E9 Õ1Õ1Õ.ètÄ.Õ±.rx.ª .ð.ÕXŠ/3ø.Õ¯.½ 0000C0
 47727EE9 804D74C9 0BDCD0F9 D1D0E4D0 7FE183F9 88E98A04 EE83C186 ACC88AAD Ù.à¯.ê.Ÿ..Õ.ª.Ä.ÅðÅ!ªÅÉ.ètM.Õ-rG 0000E0
 C48AF88A DF8AD30A 01E280D2 D0F501FA 801A7C08 F980D9F7 20E98399 7F20F983 .ª ...Õ %).ª.|..ª.%Åø.ã..Æ.Õ.½.á 000100
 F3E20002 800AD00B D1D8D1EE D000DA80 01B201FA 8015E3E1 EB08E980 F632E68A .!2-.Õ.ŠÅD..ª.ý..Õ.ÅŸ!Å!ÙÅÕ.ø.ãµ 000120
 7A368801 31E807B0 0068E8FD 35E9C3D0 88C03300 D1800081 F9C3C388 D088CA8A .ð.Å.Ûûªÿ..1.3å.ÅûÕ5»Òh.¯.Õ1..6z 000140
 03B00087 E8FD0FE9 C3FE8806 7C89E073 7FF0FA81 7FE680D7 8810EF83 067C0304 ..|..ÿ..ø.!..ªþ.sÅ.|..±ûÕ.»Ò..¯. 000160
 E8C3FE88 027C890F 737F80FA 817FE680 D78B0080 EF81027C 03047A36 880108E8 Ò...6z..|..ÿ...ø.!..ª..øÕ.|..±ûÒ 000180
 C3FE8802 7C010080 EF81047A 36880053 E8C3FE88 067C0110 EF83047A 3688001E ...6z..ÿ..|..±ûÒS..6z..ÿ...|..±û 0001A0
 0FE183F9 8B064C8B 00108A04 7A3688C0 8EA5A5A5 A5C18ED9 8CC08C04 7A3E88FC ø.>z..å.).êÉÉÉÉ.å.6z.¤...L..ª.Ä. 0001C0
 D9F7047D 0433E981 E9D1E9D1 E9D1E9D1 0035B87F E580CF8B F0E78306 4C89CA0A .ð.L..Õþ.Ù.!.¡5.1Õ1Õ1Õ1Õ.Õ3.).%1 0001E0
```

```
Dump of file SATURN:[PCCOMMON.DUMP.DLL]SHP.TMP;1 on 18-APR-1990 10:52:51.06
File ID (922,23,0)   End of file block 111 / Allocated 112

Virtual block number 84 (00000054), 512 (0200) bytes

 F98B024C 8800808A 047A368B C08EA5A5 C18ED98C C08C047A 3E8BFC00 82E93FEB S?Ö..•.>z..å.).èEE.å.6z.¤...L...• 000000
 F7487D00 96E981ED 32CD8AE1 D1001888 7FE580CF 8880E783 024C89CA 0A7FE183 .Ã..ò.L..Ö..ü.[.¡..1Ã.ë2Ú.Õ..)H% 000020
 08F980D2 33EA2880 00E581EF 88C8880A 74C838FA 088000E7 81147CEF 88C83BD9 );à.ÿ|..Ö...•;àt..à.ÿ.|..+ö3Ø.•. 000040
 D7C18A01 8CBB0CE3 348AE7E8 4608E980 0004C614 0A000280 0082F501 FA80147C |..•.¾ý..Ø...ó...Õ.FSÖ.4D.£...è■ 000060
 22D70AFA E2D7D0EA D106E3E1 8AEF8A00 01BBC334 8AD188C9 33C32C88 E822EE8A .Ÿ"Ò.,û3è.1.4ûE...ÿ.ÃD.1ðÅ■ã•.■" 000080
 3488F202 CE2BC803 98047A0E 88E2D3CC 8AFD8802 74000A80 018281FA 80D30ADE 8.Æ.•.ÿ..Ö.t..».ãÆã..z...à+ö.·.4 0000A0
 26024488 C3E4D07F CC80F8C8 E9C3F5D3 D14C747F 80C3F7C3 FAE20014 804606E3 D.F...ã•Ü%û..tL1Æ%ûÕà«.ä.Äöû.D.& 0000C0
 78EF32EC 8AD874D3 F77F80C3 F7D3F7E2 74D0F77F 80A9D0F7 E1747F80 A9025D88 .].`..tÃ¥Ã`..¥ÃtãÆ¥û..¥ÆtÃ.$2ÿx 0000E0
 7FF0C3F7 C3053826 048B0575 C33B0A8E C18ED98C C28CF787 930873E0 D1E3D1D5 ∫1Ð1Ås...¥.ð.).è.Ö;ûu...&;.ü%ûÞ. 000100
 7FF0A900 F7E1747F F0A9065D 8B260644 88C3E4D0 7FCC80F8 75E9C3F5 D3015E74 t^1Æ%ûÕu«.ã.Äöû.D.&.].`Þ.tÃ¥Ã`Þ. 000120
 8CC28CF7 87930873 E0D1E301 D578EF32 EC8AD874 D3F77FF0 C3F7D3F7 E27400F7 %ÃtãÆ¥Æ%ûÞ.¥ÆtÃ.$2ÿx∫1D1Ås...¥.ð. 000140
 05382604 88057502 453B2602 4488E75 04453826 04448817 75C3380A 8EC18ED9 ).è.Ö;ûu..D.&;E.u..D.&;E.u...&;. 000160
 7488FF7C 88024C88 80CF8000 B2358A01 5D880245 8803E880 F4800245 88F787C3 û.¥.E..¶.Š..E..]..Sý..ü..L..|..t 000180
 E52A91FA 87F38705 73EC3A5B 74E40A65 74ED0AC0 D1C1D180 00CE81FF 00E78101 ..Ö...ö..1è1â.Üte.ðt[:šs..µ.•.*| 0001A0
 01CB8003 74D20812 7C0EF980 55E300B5 CD8A91D9 D0E8D0C9 D0497718 FC80DCF6 -É.•.w1ÃèÃÒÃ)..ëç.DU.•.|..Øt..ù. 0001C0
 80FD8ADF 8AF38AD6 8A01CE80 0374D20A 2B7E05F9 803E741D 7210E980 DB33D38B .Æ3Ü.Õ.r.t>.•.-+.Øt..ö..ø.µ.Ô.». 0001E0

Dump of file SATURN:[PCCOMMON.DUMP.DLL]SHP.TMP;1 on 18-APR-1990 10:52:51.06
File ID (922,23,0)   End of file block 111 / Allocated 112

Virtual block number 85 (00000055), 512 (0200) bytes

 03743FC2 F60097E9 E8D0C188 D78BDE88 19E8F875 C1FED301 E2D12374 177708E9 Õ.w.t#1ã1Æ±èu%Š..8.■.èÃÒÕ..-ô?t. 000000
 FEDAD1D8 D150730E 13D70314 70E00020 CA800374 3FC2F6FA E2DAD1EB D120CA80 .ò 1S1Öã•-ô?t..ò ÃÃp..■.8sP1Ü1Ö± 000020
 75D8080D0 F6000383 F5DAF7D3 F70A73DE 88D788F3 18FA28FA 41E94575 FFFC80C4 ó.■.uEÖÃ•+•.µ.■.8s.¥Æ¥Ö%.Æ.-Ã.Üu 000040
 78FF0AD2 32F28ADE 8AFB8A5B 7608EC80 0F75FF0A 64740808 DA876A76 10EC8008 ..ã.vj.Ö.Ütd..u..ã.v[.«.B.·2Ø..x 000060
 7401C6F6 14720777 80FA8001 7CE90374 0001943E 80F67103 D1E2D148 74CCFE0A .±ãtK1ã1Æq¬.>...t.Ö|..•.w.r.-ó.t 000080
 C70A7FE7 80802417 747F80A9 D8D1E000 3A74FFFC 80C4FE07 73000383 01C6800F ..ó..Æ.■.±á.■.t:ÃÃ1Ã`..t.$..Ö..ú 0000A0
 047A3E8B C033017E E9037400 01943E80 C3F78805 89C68AE3 8A024589 047A3E88 .>z..E..D.ó...¥û.>...t.Õ~.3ã.>z. 0000C0
 D0E1D102 4D88D674 E40AD8D0 E0D19634 88ADFCF9 9DE9E679 C3F78805 89024589 .E....¥ûy1Ö.•■Ü.4.1ÃÃÃ.Öt■.M.1ÃÃ 0000E0
 FF3250CD 74FFFC80 80C480D3 70E5027F ED8080EC 80C13208 8B3088C8 74ED0AD9 ).Ütù.=.Ã2è.ã..Ü..|pÆ.ó..■.tëP2. 000100
 8BFA8800 D2830803 E7F7C588 509FC008 DA88E7F7 C688EB88 80C98080 CB80EF8A .ÿ.ù..è..Š.6%ó.Ö.â.P.é%Ö.Ã.Ø..•. 000120
 D3D1E2D1 0878FF0A 5893D388 C703E1F6 C58801CB 8003749E 58FA13D8 03E6F7C1 è¥1.Ã.•X.t..ù..é-Ã.ú.Æ.X..x.1ã1Æ 000140
 D0E00102 448BD900 E1D10240 88F787FF 1AE9AD74 FFFC80C4 FEFF69E9 0A75E40A .ðu.Õi.±á.■.tÜÖ...¥.M.1ÃÃ).D.1ÃÃ 000160
 0375FFFC 8080C480 FF7BE903 71E52A7F ED8081EC 80C13208 74E40A5C 74ED0AD8 Ã.Üt\.ÖtÜ2è.ã..Ü.*1q.Ö(..á..■.u. 000180
 01548850 01943E02 D9D1E8D1 08740001 943E8080 CF80C932 2D8A015D 88FF78E9 Õx..]..-2è.Ü..>...t.1S1).>..P.T. 0001A0
 76E90D88 01CA8003 740688C2 080011E8 EE88001A E8D8D1EA D180CE80 C032248A .$2ã.ö.1ö1ÃÖ...ŸÖ...ð.Øt..ò..ÏÖv 0001C0
 C1034E07 73D788FA 18D8F7E1 F7C688FA 8815E3C0 3396F3F7 1D73D338 F880E9FF .Õ¯½;Æs.¥µ.3ãÖ..•.6%Ã¥Ã.•.■s.N.è 0001E0

Dump of file SATURN:[PCCOMMON.DUMP.DLL]SHP.TMP;1 on 18-APR-1990 10:52:51.06
File ID (922,23,0)   End of file block 111 / Allocated 112

Virtual block number 86 (00000056), 512 (0200) bytes

 ED800774 ED0A0196 2E8A0001 9406C6C3 ED73C188 D003C12B FFFFBEC3 F9730313 .Æs•Û/..+ê.Ã.èsÙû6.........Út..Ú 000000
 58585AFE 4EE8DB32 D2335253 50019704 7A06C704 7A36FF38 74E40A3C 77EC3A0E .:ãw<.ðt8.6z.ú.z...PSR3Ø2ÜÒN±Z[X 000020
 94A20233 DB33C033 FE33E904 7A068F58 5B5AFE0F E8FF3252 53500198 047A06C7 ú.z...PSR2.Ò.±Z[X..z.Õ3±3ã3Ü3ØÃ. 000040
 0660D88F7 87D3E801 99A30197 A3C033FE 1AE85253 50019804 7A06C704 7A36FF01 ..6z.ú.z...PSRÒ.±3ãÈ..È..ŠÆ.¥.m. 000060
 C3FE8804 7A368BAB E60A80E6 807FE480 ADA5A5A5 047A3E8B F7881DEB 8000F581 .¥..Š..¥.>z.ÈÈÈÙ.ð..|..|¨.6z..±ù 000080
 D68695F7 870977E8 38E0E583 D274FFE0 25DAD0E0 D1DED0E5 D1064488 FC066D88 .m.■.D.1|Ã81ÃÃÖ%Ã.tØ.1Ã;Òw..¥..■ 0000A0
 F888E086 C0D1C0D1 C00157D0 D1E2D000 D1E60089 7706A030 D8F7C528 C274C008 .ãtö+é¥Ã=..w¿Ã11Ããi1W1ã1ã1ã.Ã.½ 0000C0
 C9800374 D208187C 0EFF8363 74FF0810 CC800FE4 80AD93AD 91AD92C0 32E08AAC ¯.Ã2â.Ù.Ù.Ù.ð..ã...tc...|..Øt..è 0000E0
 D68A01CE 800374D2 0A287C06 FF832372 4874E777 10EF83C0 33088BCB 88D18801 ..1.ù.Ã3ã.ÿ.wÖtHr#...|+.Øt..ð..■ 000100
 F57547D0 D1D3D1D1 D1E2D123 740F7708 EF83E432 C48AF88A DF8AE88A CD8AF18A .þ.ë.Š.Ö.½.ó2ð.ÿ.w.t#1ã111Æ1ÃGu¥ 000120
 8003743F C2F6975E CF87F6E2 DAD1DFD1 D8D1E8D1 20CA8003 743FC2F6 CF8716E8 Š..ü-ô?t..ò 1Ö1Ü1Ö1Öã-.ü^.-ô?t.. 000140
 1000CE81 0FFFE681 05748850 9F50035C 13014C13 3402D800 E5D13870 E5D120CA ò 1|p;1|ÃÃ.4.L...\.P.P.t..|...ö.. 000160
 88E9F6EC E90375E0 FD8320C5 83DAD1D9 D1D8D1DF D1137420 00C7F7FE 13589E58 X.X.±¥ú. t.1Ö1Ü111Ö.é .»Ãu.Öã-Ö. 000180
 1373FE1B 9E1000CE 810FFFE6 819F0574 88035C1B 014C1B34 2AD0F608 D0E5D100 .1|ÃÃ-Ã*4.L...\..t...|...ö....±s. 0001A0
 1375E0C7 F61875FF 080004BE FCFE130E 13CE13F5 DAF7D1F7 D3F7D7F7 D0F6F633 3--Ã¥■¥Æ¥1¥Ö¥.ð.8.±■/....u.-úÃu. 0001C0
 97277601 00ED8118 751FE0C7 F7E4EBD2 33CA88D9 88FB8830 744E4076 0200ED81 .Ü..vØNt=.«.).ð3Ø5ð¥úÃ.u..Ü..v'. 0001E0
```

Dump of file SATURN:[PCCOMMON.DUMP.DLL]SHP.TMP;1 on 18-APR-1990 10:52:51.06
File ID (922,23,0)   End of file block 111 / Allocated 112

Virtual block number 87 (00000057), 512 (0200) bytes

```
D1D1E2D1 717420ED 83127510 00C7F797 00B2F28A CE8AE98A D08AFB8A C78AE08A .Â.ú.«.Ï.Õ.ö.·ÿ..Xú..u..Ú tqÌãÌÌ 000000
1A7401C6 F61F7207 7780FA80 0385E903 740001AC 3E80FC90 65E8EBE8 D7D1D3D1 ÌÆÌ■ŠŠŠe.■.>¯..t.Õ...*.w.r.-6.t. 000020
047A3E88 F7883074 E0FD8320 C5830874 2000C7F7 00078300 03830001 8301C680 .6..1..Æ..■.Xú. t..é .»ÂtO.X.>z. 000040
88ABC188 AAC68A05 5D880645 89C70AC5 0BC032E0 862274ED D10FE780 8024DE87 .8$..Ô.ÌÚt".Á2à.é.ú.E..]..ó˙.ë¨. 000060
F788047A 3E88C033 0377E903 740001AC 3E80FCF5 FDE90379 C3F78805 EF83ABC6 6¨.ÿ..Xúy.Õ»X■.>¯..t.Õw.3â.>z..X 000080
D1E0D1D0 747FF0E1 81D13306 4D880B74 7FF025D0 88064488 FCC3FE88 ABABABAB ¨¨¨¨¨.±ü■.D..ÀXÞ.tÙ.M.31.Ãþ.tÄÌÄÌ 0000A0
CA800374 0181E850 D8D1E6D0 B674FFE0 30800005 8C70C103 7FE0E981 80002DE1 Ã-...ÕÁ..èp¥...=Á.tÑÃÌÌÄPÒ..t..ò 0000C0
E0FD8320 C58393E8 0A75ED08 D7D1D3D1 D1D1E2D1 0E751000 C7F7D800 E5015D01 .]ÌÌÄÄXú..u.Ìãììì£Ì■.Úu.Š..é .»Á 0000E0
9B747FF0 25003306 4488EF74 7FF0E181 D18B064D 8BFCF787 F58CE9FF 24E98874 t.Õ$.Õ.X.¥=.M..Ì.Ãþ.tÿ.D.3ÀXÞ.t. 000100
32E88AAC 5008D1E6 D09874FF E0308000 059B70C1 287FE0E9 8180202D E1D1E001 ÌÁÌÃ- ..ÕÁ.+èp....=Á.t.ÂÌÌÄP¯.Ò2 000120
A5AB10CC 800FE480 ADFD01AA 8F05C683 F7885092 10CC800F E480AD92 AD93ADC9 èÙ.Ù.Ù.ŏ..ä..P.X.6.€˙.»Ù.Õ..ë.¨E 000140
D1AB01AC 2602E8D1 E888ADF7 8801AABF FD1F7400 01AC3E80 0005C6FC A44746A5 ÉFGÊ=6...>¯..t.»€˙..XÙ.ÒÌÒ.&¯.¨Ì 000160
E857003B E857003F E8D9D1D8 D1D8D1EA D158FCA8 D8D1ADA8 D8D1ADA8 D8D1ADED ÚÙÌÄ¨ÙÌÄ¨ÙÌÄ¨=XÌÕÌÄÌÙÌÌÒ?.WÒ;.WÒ 000180
EFD108CA 80037407 C2F601CA 8003745F 5859D788 C208C108 C3080033 E8570037 7.WÒ3..û.ê.ô.■Y[ t..ò.-ô.t..ò.Ìÿ 0001A0
3BFF3301 AA3688FF 08E9DAD1 D9D1D8D1 EFD1DAD1 D9D1D8D1 EFD1DAD1 D9D1D8D1 ÌÙÌÌÌÕÌÿÌÙÌÌÌÕÌÿÏÙÌÌÌÕÕ...6˙.3.; 0001C0
A150F288 E7F70474 C00801A4 A1F588ED 339752F6 F73877F0 3B0475D2 085C7306 øs\.Øu.;Þw;X-R.3Ù.XÀÊ..ät.XÓ.·PÀ 0001E0
```

Dump of file SATURN:[PCCOMMON.DUMP.DLL]SHP.TMP;1 on 18-APR-1990 10:52:51.06
File ID (922,23,0)   End of file block 111 / Allocated 112

Virtual block number 88 (00000058), 512 (0200) bytes

```
CE18DAF7 5A9200D2 83E803E7 F70874C0 0801A8A1 EA13F003 E7F70674 C00801A6 Ì..ät.XÓ.Þ.õÀ´..ät.XÓ.Ò.Ø..2XÖ.ö 000000
4FC3ED73 01AA1613 01A80613 01A61E13 01A40E03 4F137393 919295E8 185D0D18 .Ì].Ò....s.O..Ê...Ì...´...˙.sÚÙO 000020
06448AC9 E8F501A4 1688C213 01A81E13 01A60E03 01A8061B 01A61E1B 01A40E2B +.Ê...Ì...´...Ì...´..ô..Ê.XŠè.D. 000040
08E30D88 911AE30C 88E888D8 3301A2A3 100C0F24 06458A01 A0A3100C 0F24E432 2Ô$...È...E.$...ÈÂ.3Ù.Š..D....D. 000060
880E74C0 0802448B ED3355DA 13C803E2 F70674D2 08025588 0488CA88 E888E1F7 XÃ.Ò.ò...U..Øt.Xã.à.ÖU3Ù.D..ät.. 000080
F70674D2 08025588 0D74C008 02448850 C1085805 D1DA13C8 03E2F708 74D20815 ..Øt.Xã.à.ÖÌÌX.èP.D..ät..U..Øt.X 0000A0
0804448B D1D1EA13 D803E2F7 0874D208 0455880F 74C00804 88C933EA 130803E2 ã.Ä.õ3è...ät..U..Øt.Xã.Ä.õÌÌ.D.. 0000C0
01A226F7 0874C008 048850C3 085800D1 83EA130B 03E2F709 74D20815 880F74C0 ät....Øt.Xã.Ä.õ.Ì.X.ûP...ät.X&Â. 0000E0
D2080455 880F74C0 0802448B DB33CA13 E80301A0 26F70874 C0080588 CA13E803 .Ò.ò...ät.X&...Ò.ò3Ù.D..ät..U..Ø 000100
D383CA13 E803E2F7 09740208 02558810 74C00804 4488D301 CA13E803 E2F70874 t.Xã.Ò.òÌÆ.D..ät..U..Øt.Xã.Ò.ò.Æ 000120
C80301A2 26F70874 C0080244 880A13C8 0301A026 F70874C0 08024588 ED335500 .U3Ù.E..ät.X&...à.Ö.D..ät.X&Â..à 000140
0301A226 F704448B D5D1DA13 C803E2F7 0874D208 0455881A 74C00804 4488DA13 .Ö.D..ät..U..Øt.Xã.à.ÖÌÌ.D.X&Â.. 000160
D1E2D15A 97C50301 A226F601 A0A0EA13 D80301A0 26F70874 C0080445 88EA1308 Ä.õ.E..ät.X&...Ä.õ...-&Â..é.ZÌãÌ 000180
36880001 AC06C6C3 F6085ED7 D1D3D1D1 D1E2D1D7 D1D3D1D1 D1E2D1D7 D1D3D1D1 ÌÌÆÌ■ÌãÌÌÌÆÌ■ÌãÌÌÌÆÌ■^.-ûó.¯...6 0001A0
53525150 01AF047A 06C7047A 36FF4C74 ED085077 F53804C0 EE810874 F60801AD Ù..-t..Ÿâ.;XwP.ÚtL.6z.ú.z.€.PQRS 0001C0
E8FF3357 55535251 5001B704 7A06C758 595A5B5D 5FFC3EE8 D233C933 DB335755 UW3Ù3è3ØÒ>■_]{ZYXú.z.ñ.PQRSUW3.Ò 0001E0
```

Dump of file SATURN:[PCCOMMON.DUMP.DLL]SHP.TMP;1 on 18-APR-1990 10:52:51.06
File ID (922,23,0)   End of file block 111 / Allocated 112

Virtual block number 89 (00000059), 512 (0200) bytes

```
36FF01AC A2FF33ED 330B33D2 33C933C0 33FC1AE9 047A068F 58595A58 5D5FFB01 Ì«_]{ZYX..z.Õ.■3ã3è3ø3Ù3Ó3.Â¯..6 000000
56EC8855 C6E8ABAB ABABC033 01AF8FFB F8E85755 53525150 01B7047A 06C7047A z.Ù.z.ñ.PQRSUWÒX«€£.3ã¨¨¨¨¨ŠÓU.ŠV 000020
BF06768D 071EFC57 56EC8855 08E8A536 A536A536 A53601CE 8F0E768D 071EFC57 W«...v.€ð.6È6È6È6ÈŠ.U.ŠVW«...v.€ 000040
5850D2FF 555301D6 047A06C7 047A36FF 01CE8F01 C68EA536 A536A536 A53601C6 6.6È6È6È6È[6.€ð..6z.ú.z.ø.SU.Ø][ 000060
ED06C601 C41E8C01 C21E89C8 8AC933C8 5DE5885E 5FDA8C01 06880872 047A068F ..z.r.|ø..Ô_^.]ÌÙ3è.à..Ô...á.6.Ú 000080
ABABC033 1874033C 0C74073C 127403FC 8001D68F 0101ED06 C6057503 02300001 ..■..u.6.Ù..€ø..■.t.<.t.<.t.3ã¨¨ 0000A0
8801C00E 89A5A5A5 A507CCBE 07E88001 D00E80A5 A5A5A507 CCBE0381 17EBABAB ¨¨Š.Ÿ.ƒã.ÈÈÈÈ..Ì..Š.ƒã.ÈÈÈÈ..â.. 0000C0
0301C03E 83077500 01ED3E80 21809475 C00804C4 83086324 C39A5001 C0881EF1 Þ.|â.P.ûßc..â..âu.¯Ì.>Ù..u..>â.. 0000E0
9A01EA88 1659245E 9A4801C2 1E881874 F60801DC 8488E601 0484A398 22800272 r.¨".È..ÌÌ.ÇÈ..-t...ô.K.^$Y.Èô.. 000100
88ABF300 0489C033 FE88047A 3688C3F9 0501B8FF 59E91692 21FC9A56 168A245E ^$..V.«Ì..ÕY.|..¹Ù.6z..±3â¿..µ¯. 000120
88034C88 055C8A3F E02D0778 FFF025E1 747FF0A9 F88A0644 8807EEBF FCC3F8FE ±XÙ«€Y..D..½˙Þ.tÀXÞ.x■-Â?.\..L.. 000140
D1001005 097410A8 80CF8003 D1D1D1E2 D1D3D1D1 D1E2D1D3 D1D1D1E2 D1560154 T.VÌãÌÌÌÆÌãÌÌÌÆÌãÌÌÌÆ.ü.´.  ...Ì 000160
EA0357D8 80E3F7AF 81885236 E8F90372 FEF88306 45893FE0 05F8D1DA D1D9D1E8 $Ì)ÌÖÌX.Â7.E..«±r.ªS6R|ŸÆXÐ;¨¨/.ö 000180
F5F7C188 D3880D01 E813F9F5 F7C188D3 880001E8 03F5F7C0 33D388FF FF8D0373 ■.Š...Æ3âXX.ÒÌÌ.Æ.âXXª.ÒÌÌ.Æ.âXX 0001A0
D1D0D1D3 D1E1D1D0 D1D3D1E1 D1D0D1D3 D1E1D1C0 330E03C8 880D88F5 F758F088 .ÞXXX.Ì.â.ã3âÌÄÌÆÌÄÌÆÌÄÌÆÌÄÌÆÌÄÌ 0001C0
F8100660 83F8A5E8 5FF813E8 575E0000 05C7024D 89045D89 06450800 D1D3D1E1 ÄÌÆÌÄ.E..]..M.ú...^WÒ.«_ÒE½.m..½ 0001E0
```

Dump of file SATURN:[PCCOMMON.DUMP.DLL]SHP.TMP;1 on 18-APR-1990 10:52:51.06
File ID (922,23,0)   End of file block 111 / Allocated 112

Virtual block number 90 (0000005A), 512 (0200) bytes

```
E8047A36 880DC6E8 00E5E800 B6E8004E E800D8E8 1C7341A0 307FE480 06448BC3 û.D..ô.=.As.ôU.ôN.ôR.ôI.ô6..6z.ô 000000
FACAE807 DEBE0874 7FF0A906 44881472 FFD1E8C3 F90405B8 FAE2E900 D3E80025 %.ôE.ôã'|..'ûôI.r..D.`Þ.t./8.ôô' 000020
10E801B0 C3F8FE8B 0056E807 DEBE0A77 3E40307F F0250644 8BC3F908 02B8C3F8 %û|..'û.D.%Þ.=ə>w./8.ôV..±%û¯.Š. 000040
41A0067C 817F0764 800D37E8 01EEA2FC 80240744 8AEA763E 40307FF0 25064488 .D.%Þ.=ə>vô.D.$.•ÃŸ.ô7..d...|..A 000060
06EBF7DF E807D6BF 08798007 44F61474 0101EE06 F6FA1CE8 01EFBF0D 46E8A673 sÎôF.¢ÿ.ô.'-.Ÿ..t.-D..y.¢ø.ôô%Š. 000080
F7BDE807 D6BF0674 0101EE06 F68001EE 36800573 0DA8E8F2 ACE8F7FA E807D6BF ¢ø.ô'%ô¯·ô´.s..6Ÿ..-.Ÿ..t.¢ø.ô§% 0000A0
C3074430 802401EE A0F7C9E8 07FEBF0E 00E8C933 0207BB0E 11E801FF B901F7BB £%.¿..ô..É..3èô..¢±.ôè%.Ÿ.$.ôô.û 0000C0
047A3E88 07DEBE0C 723FF006 7C8100B0 7F076480 0CC2E802 4CA28024 07448AFC •.D.$.ÂL.ôô..d..¯..|.Þ?r./8..>z. 0000E0
E8F75EE8 07DEBFF9 8EE80255 BF0CB4E8 2676F421 E8025DBF 024AA210 B0FA07E8 ô.'¯.ÂJ.¢].ôI¶v&ôÇ.¢U.ô.'¢8.ô^%ô 000100
7FF02506 44B8047A 36880802 4A0680F9 D9E807F6 BE0C3BE8 024DBE0C B1E80C44 D.ôŸ./M.ô;./-.ô)'..J...6z..D.%Þ. 000120
BF800774 80047210 024A3E83 F74CE807 FEBF0083 E802B7B9 0295BB0F 723E4030 =ə>r.£..¿ñ.ô..¢±.ôL%.>J..r..t..¢ 000140
F801EBF9 C3F90001 B85858C3 80077480 04748002 4C06F6F7 37E8024A 3E030275 u..>J.ô7%-.L..t..t..ûXX|..'û'Š.% 000160
565E0C2D E8F6E2E8 07DEBEFE 885602FC BEA5A5A5 A502FCBF 0A75047A 3638509F .P;6z.u.¢=.ÉÉÉƒ=.V.±/8.ôã-ô-.^V 000180
7FF0C3F7 065C8BF7 8702739E 585EFD91 E8C67580 0744F60B D1E8F6FA E807DEBF ¢8.ô'-ôI.-D..uôô.»^X.s..%.\.%ûÞ. 0001A0
6480FF02 E8F92FE8 1E747FF0 A902DA26 88064588 02D83E88 80E7807F E7800375 u..ô..ô..>Û..E..&ô.`Þ.t.ô/'ô...d 0001C0
020CBE10 747FF006 44F7C307 440802DB A0F68EE8 02E48E06 748002DA 06F67F07 ..-.ô..t./ô.ô.-.Û..D.û%D.Þ.t./É. 0001E0
```

Dump of file SATURN:[PCCOMMON.DUMP.DLL]SHP.TMP;1 on 18-APR-1990 10:52:51.06
File ID (922,23,0)   End of file block 111 / Allocated 112

Virtual block number 91 (0000005B), 512 (0200) bytes

```
078A2606 5EC45657 04EC83EC 8855C3F9 010188C3 FE88075C 08020B1E 8A08ABE8 ô¨...Û..\..±û|..'ûU.$.$.WVé^.&.. 000000
00653098 078A2606 5E8807EB 00200598 078A2606 5E880C74 0106A587 F6D88898 ..Ã-.E..t..^.&.... .Š..^.&...=e. 000020
8898078A 26065EC4 08468C06 7E89F275 0406A587 F6D88898 058A2647 FB8B1674 t..«G&....Ã-.E..u·.-..F.é^ &.... 000040
89E975C0 0A0646FF F7880788 26C688F8 8898078A 26065E88 2E07C626 0646FFF0 Þ.F.&6...^.&....%.6&...%.F. 4uô. 000060
30802647 07742E3D 80269008 EB067EC4 565706EC 83EC8855 CB5DE58B 5F5EFC7E -•^_.Î]ûU.$.$.WVé~.Š..&.=.t. °.= 000080
0D74653D 8026900E EB067E8B 6774003F 80260646 FFDF8808 468C067E 89F37500 .u¤.-..F..Ô.F.&.?.tg.-.Š..&.=et. 0000A0
FE5689FC 4689064E FFC28CC7 8808468C 067E89ED 75003D80 26470774 45308026 &.=Et.G&.=.uÛ.-..F..û.ô.N..F=.V± 0000C0
5E8C064E FF03752E 3F80260F 8808468C 067E89F9 74303D80 264F9002 EB067E88 .-.Š..O&.=0t'.-..F..Ô&.?.u..N..^ 0000E0
5DE5885F 5EFA5E8E FE5E8CFC 7689F275 C00A0788 26AC065E C40646FF FC76C5FA 'év•.F.é^.¯&...âu·.v•.^±.^'^_.Î] 000100
0001B805 721ACD06 5C9A1AA9 018C9A06 5EC41AA4 01DC9A0D 841E80EC 885590CB û.U.$.....É.É.é^..¥.`..\.ê.r¯.|.. 000120
831AF122 329A0C76 FF0E76FF 24740006 7E835657 08EC83EC 8855CB5D C02BCB5D ]û+é]ûU.$.$.WV.-..t$.v..v..2"Þ.. 000140
329A0C76 FF0E76FF 90CB5DE5 885F5E1F A5A5A5A5 DA8E1EF0 88FB8808 5EC404C4 é.é^..«.Þ..ÔÉÉÉÉ.^_.Î]û..v..v..2 000160
085EC41B 1301DC9A F85E8D1F A5A5A5A5 DA8E1E07 16F088F8 7E8D04C4 83180822 "...é..-%.Þ....ÔÉÉÉÉ..^%.É...é^. 000180
16880F3A A1477400 02F23E80 56570AEC 83EC8855 90CB5DE5 885F5E18 87032F9A ./...^_.Î]û.U.$.$.WV.>·..tGÀ:.... 0001A0
46890C56 8B0A4603 C02802EB 0001B805 752D3F83 26F85EC4 FA5689F8 46890F3C <..F%.V'é^%&.?-u.|..Š.+â.F..V..F 0001C0
06C48304 5DE80EFC 76FFFE76 FF50C02B 9003E800 01B8067E 000E7E83 FE5689FC •.V±.-..-.|..Š..+âP.v±.v•.Ô]..é. 0001E0
```

Dump of file SATURN:[PCCOMMON.DUMP.DLL]SHP.TMP;1 on 18-APR-1990 10:52:51.06
File ID (922,23,0)   End of file block 111 / Allocated 112

Virtual block number 92 (0000005C), 512 (0200) bytes

```
89F84689 08C4831B C524789A 37FF2602 77FF2604 77FF2606 77FF2606 5EC458EB ŠXé^.&.w.&.w.&.w.&.7.x$é..é..F%. 000000
752D3F83 26F88BF8 5EC4C02B 02EB0001 88057E00 0E7E8350 400E468B 5052FA56 V'RP.F.əP.-..-.|..Š.+âé^%.%&.?-u 000020
0C568B0A 46880AC4 831C1F22 889A5052 0C568B0A 4603C703 C02802EB 0001B805 .|..Š.+â.ú.F..V.RP.."...é..F..V. 000040
C4147E00 0E7E832D 07C626FC 46FFFC5E C40A752D 3F8326F8 5EC4FE56 89FC4689 .F•.V±é^%&.?-u.é^•.F•&6.-.~..-.é 000060
F7C01B01 02F23E80 501E02EC B82E07C6 26FC5E8B FC46FF07 88260147 8A26FC5E ^•&.G.&...F•.^•&6..|$..P.>·...â% 000080
07740010 7E83FE56 89FC4689 08C4831D 5900109A 5052FE56 88FC4603 0E460308 Ã.F..F•.V±RP...Ÿ..é..F•.V±.-..t. 0000A0
88480247 8826F85E C45E7430 3F802606 5FC426F8 5EC4FC46 FF4507C6 26FC5EC4 é^•&6.E.F•é^%&é_.&.?0t^é^%&.G.H. 0000C0
F9F70064 B999C688 157C64FE 83FC46FF 2D07C626 FC5EC4F0 88D8F70B 7DF60BF0 Þ.-).%Ã.Þé^•&6.¯.F•.±d|..6.¿d.%' 0000E0
FC5EC4F9 F7000AB9 99C68815 7C0AFE83 FC46FFF2 88F9F799 C6880700 26FC5EC4 é^•&...6.%'.·.F•.±.|..ô.¿..%'é^• 000100
5DE5885F 5E0C568B 0A468807 0026C688 FC5EC4FC 46FFF288 F9F799C6 88070026 &...6.%'.·.F•é^•.6&...F..V.^_.Î] 000120
0E0676FF 0876FF0A 76FF0C76 FF0E76FF 1076FF01 02F206C6 04EC83EC 885590CB û.U.$.$.6.·...v..v..v..v..v..v.. 000140
02F23E80 00F246C6 12EC83EC 8855CB50 E5880002 F206C6FE 5689FC46 89FE49E8 ÔI±.F•.V±6.·...Î]ûU.$.$.6F·..>·. 000160
C02802EB 0001B805 752D3F83 26F45EC4 F65689F4 46890F3C 16880F3A A1517400 .tQÀ:...<..F¶.V-é^¶&.?-u.|..Š.+â 000180
5689EE46 8902F406 03FC4688 6A750E46 3902F4A1 FE5689FC 46890C56 8B0A4603 .F..V..F•.V±Ã¶.9F.uj.F•..¶..FŸ.V 0001A0
260477FF 260677FF 26065EC4 4AEB0007 C626EE5E 883007C6 26EE46FF EE5EC4F0 Þé^Ÿ.FŸ&6.0.^Ÿ&6..ŠJé^.&.w.&.w.& 0001C0
0E460302 478B26F4 5EC45052 F65689F4 468908C4 831D8924 789A37FF 260277FF .w.&.7.x$...é..F¶.V-RPé^¶&.G..F. 0001E0
```

```
Dump of file SATURN:[PCCOMMON.DUMP.DLL]SHP.TMP;1 on 18-APR-1990 10:52:51.06
File ID (922,23,0)   End of file block 111 / Allocated 112

Virtual block number 93 (0000005D), 512 (0200) bytes

 46880AC4 83169822 889A5052 0C56880A 4603C028 02EB0001 B805752D 3F832650 P&.?-u.|..Š.+á.F..V.RP.."...á..F 000000
 F45EC42D 07C626FC 46FFFC5E C40A752D 3F8326F4 5EC4FE56 89FC4689 0C56880A ..V..F=.V±á^¶&.?-u.á^=.F=&6.-á^¶ 000020
 C626FC46 FFFC5EC4 06C48302 05E80EFC 76FFFE76 FF500001 B81D7F00 027F8326 &......|..P.v±.v=.Ò...á.á^=.F=&6 000040
 E80EFC76 FFFE76FF 500001B8 687E000E 7E83FC46 01024788 26F45EC4 0AEB3007 .0Š.á^¶&.G..F=.-..~h|..P.v±.v=.Ò 000060
 08740002 F23E8043 7D00027F 8326F45E C42E07C6 26FC46FF FC5EC406 C48301D8 Ä..á.á^=.F=&6..á^¶&....)C.>·..t. 000080
 FC76FFFE 76FF500E 46890E46 8B037E0E 463BD8F7 02478826 0EEBD8F7 02478826 &.G.%ÄŠ.&.G.%Ä;F.-..F..F.P.v±.v= 0000A0
 880A4688 08C4831E A024169A FC76FFFE 76FF5000 30880E76 FF06C483 0196E80E .Ò...á..v.|0.P.v±.v=..$...á..F.. 0000C0
 0676FF08 76FF0A76 FF0C76FF 0E76FF01 02F206C6 04EC83EC 8855CB50 E5880C56 V..[]ùU.š.š.6.·...v..v..v..v..v. 0000E0
 FF26065E C45606EC 83EC8855 90CB50E5 880002F2 06C6FE56 89FC4689 FE6EE80E .Òn±.F=.V±6.·...[]ù.U.š.š.V6^.&. 000100
 0F3A1EC4 0F3C1689 0F3AA308 C4831EDC 24789A37 FF260277 FF260477 FF260677 w.&.w.&.w.&.7.x$É..á.È:...<.á.:. 000120
 89FC4689 0C56880A 4603C028 9003EB00 01880675 2D3F8326 02F4A348 02478826 &.G.HÉ¶.&.?-u.|..Š..+á.F..V..F=. 000140
 047D02F4 36394E02 7788260F 3A1EC40A C4831FDC 22889A50 520E76FF 5306FE56 V±.S.v.RP.."É..á.á.:.&.w.N96¶.). 000160
 FF0E76FF 1076FF1F 7F0E4639 C688077C FCFE8302 F4368902 F6A2C02A 02EB01B0 ¯.Š.*áÀ-..6¶..±=|..69F... v..v.. 000180
 8C1E7400 02F63E80 90CB50E5 885E0CC4 83FD93E8 0E0676FF 0876FF0A 76FF0C76 v..v..v..v..Ò.».á.^.[]ù..>-..t.. 0001A0
 0E76FF00 FE47C626 FC5EC4FA 5E8EFE5E 8CFC7689 F97500FF 7C8046FC 76C5FA5E ^*év=F.|..u*.v=.^±.^*á^=&6(  .v. 0001C0
 74650E7E 83EC8855 C850E588 5E0AC483 FEF6E80E 0676FF08 76FF0A76 FF0C76FF .v..v..v..v..Ò-±.á.^.[]ùU.š.~.et 0001E0

Dump of file SATURN:[PCCOMMON.DUMP.DLL]SHP.TMP;1 on 18-APR-1990 10:52:51.06
File ID (922,23,0)   End of file block 111 / Allocated 112

Virtual block number 94 (0000005E), 512 (0200) bytes

 9035EBFB 8FE80E06 76FF0876 FF0A76FF 0C76FF10 76FF1276 FF197545 0E7E8306 ..-.Eu..v..v..v..v..v..v..Ò.«Š5. 000000
 76FFCB5D 0AC483FD 39E80E06 76FF0876 FF0A76FF 0C76FF10 76FF1875 660E7E83 .-.fu..v..v..v..v..v..Ò9».á.]ù.v 000020
 0A7E83EC 885590CB 5D0CC483 FEC0E80E 0676FF08 76FF0A76 FF0C76FF 1076FF12 ..v..v..v..v..v..Òä±.á.]ù.U.š.-. 000040
 88064603 0A468806 76FF0876 FF504004 C4831FF7 00709A06 76FF0876 FF297400 .t).v..v..p.%..á.@P.v..v..F..F.. 000060
 74127703 FB83088E 1EEC8855 4590088C C888CB5D 0AC4831A 9C234C9A 50520856 V.RP.L#...á.]ù.à.Ä.EU.š..Ä.«.w.t 000080
 0A2D047A A1CB405D 1FE58802 ED83F802 FA168902 F80E8908 EB030A04 7A06C708 .ú.z...Š...%...*.%.Ù..[.]MùÄz.-. 0000A0
 FC8FF388 C302FC8E D98EA5A5 FCD88EC1 8ED98CC0 8C02FCBF F38BCBF3 F60CB303 .°.-µù.µ¢=..â.).è.Ä=ÈÈ.)ƒ=.û.µ¢= 0000C0
 03EB07FE 45C6FC7D 89FC7588 C302FC8E D98EA5A5 A5A5FCD8 8EC18ED9 8CC08C02 ..â.).è.Ä=ÈÈÈÈ.)ƒ=.û.u=.)=6E±.Š. 0000E0
 D1D8D1D9 D1FAD1D8 D1D9D1FA D1058925 747F80C2 F702548B 0C8BC033 FCFC7588 .u==3á...T.%ó..t%..Ì*ÌÌÌÄÌ*ÌÌÌÄÌ 000100
 45890445 89024589 0589C306 55893800 C2818FE6 80044D89 02458908 D1D9D1FA *ÌÌÌÄ.E..M..]..ô.8.U.û...E..E..E 000120
 81127558 C0080000 FFFF9A52 16501653 C4885087 048FA780 04885200 028BC306 .ûE..R.å.I..ñP.áS.P.R......âXu.Ý 000140
 8C001A06 C41EE300 180E885A D4794804 8F8F0808 81067500 023D0774 00013040 @=..t.=..u.Ý.....KyåZ....D.á.... 000160
 E80D228F 0D228E0D 161EFF00 038BC28C 001E06C4 00CAE903 730D161E FF0B33C2 ó3Ù....±.Òò.á....óÉ......ƒ".¢".Ò 000180
 B8C30000 FFFF9A21 2F680E01 6A0B740D 223D0D22 880073E8 0D148F0D 0CBE007C |.ƒ..¢..Òs.¡".=".t.j..h/!.....û¡ 0001A0
 468F0F46 8EEC8855 0000212A 9A006A00 6A036A00 51E80D22 8F0D228E D88EFFFF ...Äƒ".¢".Òq.j.j.j..*!..U.šƒF.¢F 0001C0
 228F0D22 8E0023E8 0D228F0D 228EEC88 5503E800 31E80D22 8F0D228E 003AE80F .Ò:.ƒ".¢".Ò1.Š.U.šƒ".¢".Ò#.ƒ".¢" 0001E0

Dump of file SATURN:[PCCOMMON.DUMP.DLL]SHP.TMP;1 on 18-APR-1990 10:52:51.06
File ID (922,23,0)   End of file block 111 / Allocated 112

Virtual block number 95 (0000005F), 512 (0200) bytes

 F73BC30D 161EFF00 028807E3 0D180E88 0000FFFF 9A500646 8A50C033 001AE800 .Ò..3âP.F.P.........D.£......û;% 000000
 3E831E47 21FC9A50 00FCB8EC 885500C3 EEEB1DFF F2740245 08058804 EF830E73 s..ÿ....E.t·..ŠYÒ.U.š|=.P.=!G..> 000020
 56EC8855 04CCE900 028BCB5D E58821AC 21FC9A50 00FF8806 A01EFF04 740006A2 Å..t.....|..P.=!¯!.[]ù|..Òä.U.šV 000040
 88AEF2FF FFB9C033 970C7496 401074C2 38AD0094 8E06568B C08ED88E 21308857 W|01.Ä.å.V./..Ù;ôt.@.t..3â¿..·0. 000060
 33FA8892 1F74C00B 21C021CC 9A0676FF 57EC8855 0002CA5D E5885E5F 96E8EBF7 %Š$._^.[]ò..U.šW.v..äÌâÌ.ât...*3 000080
 CA5DE588 5F580000 FFFF9A50 1651521E 53000288 C4885049 D1F7AEF2 FFFF89C0 â¿..¯0%!!P.á£..S.RQ.P.....[_.[]ò 0000A0
 8C067E89 F2750806 A587F608 8898058A 26479002 EB067EC4 56570000 00C80002 ..à...WVá-.Š..G&....Ä-.£..u¯.-.. 0000C0
 0008050A C4832206 27309A57 0876FF50 04C48322 6800709A 5706006A 006A0846 F.j.j..W.p.h".á.P.v.W.=′.".á.... 0000E0
 46885657 00000AC8 CBC95F5E DA8C0F3E B81FA5A5 A5A5DA8E 1E071EF0 880F3E8F ¢>..Þ....ÒEEEE.|>..Ò^_èùà...WV.F 000100
 46FFF85E C4FE5689 FC468908 57882606 4788260C 5EC4FA56 89F84689 08568806 ..V..F%.V*á^.&.G.&.W.¯F=.V±á^%.F 000120
 FC46FF09 74003F80 26FC5EC4 F876C5F6 5E8C0A4E 882E7E00 0A7E8330 07C626F8 %&6.0.-..-..N..^-év%á^=&.?.t..F= 000140
 0007C626 F85EC40A 4E89F65E 8EFA5E8C F87689E7 E2460488 30809003 EB078A26 &..Š..¯0..FäÒ.v%.^*.^-.N.á^%&6.. 000160
 3080264F 3005C626 9006EBF8 7EC4F84E FF1F7C35 3F8026FC 5EC4287C 000A7E83 .-..|(á^=&.?5|..N%á-%Š..&6.00&.= 000180
 15E80247 FF260C5E C4097531 3F802606 5EC407FE 26DF88FA 468CF87E 89F57439 9t%.-%.F*.Ò&±.á^.&.71u.á^.&.G.Š. 0001A0
 88EC8855 000090C8 C95F5E08 C483225B 00109A06 76FF5250 52400856 88064688 .F..V.@RPR.v....[".á.^_èù...U.š. 0001C0
 D20B0E4E 88234026 F89A5706 561E067E C40A76C5 56571E00 85E90375 C90B0E4E N..èu.Òç..WVév.á-..V.W¯%&@#.N..@ 0001E0
```

Dump of file SATURN:[PCCOMMON.DUMP.DLL]SHP.TMP;1 on 18-APR-1990 10:52:51.06
File ID (922,23,0)   End of file block 111 / Allocated 112

Virtual block number 96 (00000060), 512 (0200) bytes

```
C08E2381 05C08C07 73F903D8 8EFFFF05 D88C0773 F1034950 73000A83 C12B5778 xW+ê.Ö.sPI.þs..Ã....Ã.'s..â..#.â 000000
835CE391 FCA4F3FD C1289140 C603C323 DB18C62B C703C323 DB1BC72B 48C18841 A.êH+ú.Û#û.ú+ó.Û#û.óa.+ê»µÊ=.D\. 000020
D2F7D78B 48C188C8 EBC08E23 B72DC08C D175FFFF 83D88E23 8C2D088C 0775FFFE ±.u..Ã-.#.Ã...uî.â-ñ#.âšà.êH.ø¼ø 000040
A4F3C913 A5F3E9D1 C1289140 C203C323 DB1BC22B D2F7D68B C203C323 DB1BC22B +ó.Û#û.ó.ø¼ø+ó.Û#û.óa.+êîÕµÊ.èµÊ 000060
46881F5F 5E8EEBC0 8E23FA05 C08CC775 FF0BD88E 23C305D8 8C0775F6 0B18E391 .D..-u..Ã.ú#.Ã..uú.â.'#.âŠƒ^ ..F 000080
D103D323 DB18D12B 0C74DAF7 D78B067E C45738E3 0C4E88EC 8855CB5D 08568806 ..V.]ìU.‡.N.D8W6-..ø¼Öt.+1.Û#Æ.1 0000A0
F3E9D1C3 8E2405C3 81C38C10 E30187AA F3C913AB F3E9D1E0 8A0A4688 D128D187 .1+1.F..Ã1Õµ¨.èµ¨.1D..û.û.$.ûîÕµ 0000C0
1650521E 510002B9 DC885301 578DE42A 078ACB5D 08568806 46885FAA F3C913AB ¨.èµ¨_.F..V.]ù..*ö.W.S.Ê¿..Q.RP. 0000E0
A536A536 A536A536 07B08F06 768DC08E D88CFC57 56EC8B55 CB5B0000 22269A53 S.£"..[ìU.‡VW=.Ã.â.v.€¯.6E6E6E6E 000100
40890255 891D89FF 3207A68F AA91A4F3 9198ACC8 8807B88F 50038BE8 5507B08E ƒ¯.UÒ..]¢¡..à¨..µÊ.˜¢1.2....U..M 000120
07D406C6 CB5DE58B C033EC8B 55CB5DE5 8B5E5FC7 88DA8C08 5D8C07B8 0645C704 .ÚE.¡..]..Ö.ú ^.]]ìU.‡3ã.]]ù6.â. 000140
ED27E907 EE8F047A 3688EB07 E907EE8F 047A3688 EB34E907 EE8F047A 3688C801 .ù.6z.€Ÿ.Ö4Š.Õz.€Ÿ.Ö.Š.6z.€Ÿ.Ö'Ù 000160
5750ED6C E907EE8E 047A3E88 EAE9E907 EEBE047A 3E88ED80 E907EEBF 047A3688 .6z.€Ÿ.Ö.Ù.>z.ƒŸ.ÖÕõ.>z.ƒŸ.ÖlÙPW 000180
A5A5047A 3E8807EE 8EC30875 F73B047A 3E88C358 5FABABAB A8047A3E 88FCC033 3â=.>z.¨¨¨¨_Xû.>z.;¼u.ûƒŸ..>z.EE 0001A0
08EE83A5 A5A5A507 F68FC308 EE83A5A5 A5A507EE BF047A36 88C3047A 3688A5A5 EE.6z.û.6z.€Ÿ.EEEE.Ÿ.û€-.EEEE.Ÿ. 0001C0
7A368804 EB07EEBE E0FF34FF 0274FF04 74FF0674 FF58047A 368804EB 07EEBEC3 ûƒŸ.Š..6z.X.t..t..t..4.ÃƒŸ.Š..6z 0001E0
```

Dump of file SATURN:[PCCOMMON.DUMP.DLL]SHP.TMP;1 on 18-APR-1990 10:52:51.06
File ID (922,23,0)   End of file block 111 / Allocated 112

Virtual block number 97 (00000061), 512 (0200) bytes

```
C90B91AD F38BA5A5 A5A507EE BF047A36 8BE0FF06 448F0444 8F02448F 048F5804 .X...D..D..D..Ã.6z.€Ÿ.EEEE.µÙ..è 000000
8B565EEC 6AE807EE BF047A36 8B56511C E3A5A5A5 A5047A3E 8B17EB51 ED320579 y.2ÚÖŠ..>z.EEEED.QV.6z.€Ÿ.Òj‡^V. 000020
C02D2B74 7FF025E8 8A064488 C3F78B04 7A3E88E4 E208C683 595EEA5A E8047A3E >z.ÒZõ^Y.6.ãõ.>z..¼û.D..Ò%Þ.t+-â 000040
6C8610CD 800BF7D8 8898E800 E8D0E8D0 4107E180 C88AE8D3 04B12377 03703D3F ?=p.w#Ÿ.ÆÒ.à.Ã.AÃÒÃÒÃÒ..Ã¼Ù.ë..ì 000060
A5A50806 BFEC0CE8 FE8808EE 83A5A5A5 A507FEBF 5351C306 6C88E0D2 06408A06 ..ã.øÁ.l.ûQS¢±.EEEE.Ÿ..±Ò.‡¢..EE 000080
C3F9FF51 E8FEF3E8 08068EA5 A5A5A508 0E8F1174 DB0B5BFF 66E85B08 EE83A5A5 EE.Ÿ.[Òf.[.Ût.¢..EEEEƒ..Òµ±ÒQ.'û 0000A0
F88BFEF8 E851E8CD E907FEBF FFECE8EB D6E90806 BFEC3FE8 080EBE06 73FFC7E8 Òú.s.ƒ..Ò?‡¢..ÕøŠÒŠ.¢±.ÕëŠQÒ½±.« 0000C0
FF9A5016 C48850EC 8B55E987 E907EEBE EB87E807 F68E5FFE E2E8FEA8 E8EBC4E8 ÒâŠÒ'±Òã±_ƒ-.ÒñŠƒŸ.Ö.ÕU.‡P.6.P.. 0000E0
6929229A FA26E800 21E80000 FFFF9A08 16681E08 18681E04 88A3E086 580000FF ...X.ÃE...h...h.......Ò!.Ò&'.")î 000100
FF33000D 8B1E081E 16FF00FF 68269C21 FC9A268F 21A29A50 CB5DE58B 0001B823 #¡...[]ûP.Ãî.&.=l.&h.......£..3. 000120
74CA8BA6 F3CB88D1 8B0C22BE 3174003D 80264701 75003D80 267FFFB9 0818068E ....¿..&.=.u.G&.=.t1ƒ"..Î.ùµÎ.Òt 000140
0572412C AC9204E0 C00E7241 2CAC048F BF1FF788 071E061C EBE774AE F2C03308 .3â·ÙtÖŠ.....¼.¢..¯,Ar.âÃ..¯,Ar. 000160
D3180A46 2BEBD3EA D3FFFFB9 0C5E8808 56880646 88EC8B55 00C31FED E8AAC20A .ô'ŠÙ.û.U.‡.F..V..^.¿..ÆõÆŠ+F..Æ 000180
0A763B00 0CC506C6 0028E801 0CC506C6 0E56880B 335756EC 8B550008 CA5DE58B .[]ò..U.‡VW3Ù.V.6.é..Ò(.6.é..;v. 0001A0
CB5DE58B 5E5F0006 E80E5E8B D2335756 EC8B55CB 5DE58B5E 5F0D8940 C9800573 s..èã.._^.[]ìU.‡VW3ø.^.Ò.._^.]]ù 0001C0
0A4E8BD8 8EA4F30C 42BF0676 C527EBF6 33408106 7664F983 0A4E8BC0 8ED88CFC =.Ã.â.N¯..'dv.Ÿã3-Š'év.€B.µÊ.Ã.N. 0001E0
```

Dump of file SATURN:[PCCOMMON.DUMP.DLL]SHP.TMP;1 on 18-APR-1990 10:52:51.06
File ID (922,23,0)   End of file block 111 / Allocated 112

Virtual block number 98 (00000062), 512 (0200) bytes

```
890D890C 308F0A76 0306762B 5D0456E8 550C388F 064E010C 46880676 890C42BE /8..v..F..N.€8.UÒV.]+v..v.€0.... 000000
0AC68316 75C43A80 80250947 8A2E0964 8A5653C3 DA8CC78B 065D8904 45890275 u..E..]..ú.ÖûSV.d...G.X..:âu..6. 000020
FF33AD93 AD92AD95 AD56C358 5EF3E107 382E0488 02E88302 EE830005 B90AC383 .û.¿...Ÿ..Š....;.Ãµ^[ûVÙ.Ù.Ù.Ù3. 000040
893C895E 03FE20DB D1F50001 3D0001E3 D1F4E20F D1DDD1DA D1D801E8 D1000589 ¿..ÌÒÌÙÌÒÌÌÌÒã¶ÌDÌÃ=..¾ÌÙ-±.^.<. 000060
FFFDCCCC CCCCCCCC CCCD0000 FFFFFFFF FFFFFC66 C3084489 065C8904 5489026C l..T..\..D.Ûf=........ëããããããã». 000080
F30004B9 570CA6BF FCC08ED8 8C06C307 5B40008B C0333001 44C60104 C60CB2BE ƒÿ.6..6D.03â.Ãã[.û..Ã.â=¢l.W¿..µ 0000A0
0CADBEFF 33FF7BE8 532D8302 79C90B06 747FF0C1 F720B37F 07648006 4C8B5EA5 Ê^.L..d..* ¼èÞ.t..èy.*-SÒ(.3./Ù. 0000C0
03E7F69A B0D713C8 03E4F64D B091E2F7 4D10BAC8 883FFE05 ADF88ABB 7480A8AC ¨'.tÉ.¼Ù.±?.âα.M¼ã.¯M-ö.â.ø¯.-ö. 0000E0
B8574709 725FFF13 E827FCB8 078CE80C A68EDFF7 5713430F 8112F4E9 81FA13C8 â.*.Ò¶..ÒC.W¼Òƒ[.Ò..£='Ò.. r.GWÉ 000100
D1DDD1DA D1E8D10C E3C033F7 8809F791 AD93AD92 AD95AD97 AD575F06 15E82806 .(Ò.. WÙ.Ù.Ù.Ù.Ù.¾).¾3âD.1Š1Ò1ÌÌ 000120
50565552 5351C032 0010890C B38FD913 D113E913 039AD681 56C480F4 E2DCD00E âÃÉã¶.6V.ø...Õ.1.)¢°.¿..2âQSRUVP 000140
1359F113 59E50259 D00003D1 D2D1D5D1 D601E4D0 D00003D1 D2D1D5D1 D601E4D0 ÃÒÌøÌÌÌøÌÆÃÃÃÒÌøÌÌÌøÌÆÃÃY.ÌY.þY. 000160
FD308049 4F8DE259 AA3004D0 D0030D102 D1D5D1D6 D1E40000 14D91359 D11359E9 ÕY.1Y.)..ÃÒÌøÌÌÌøÌÆÃÃ.0¨YãŠOI¯0» 000180
08183639 FF2BF628 56570000 14C8C307 5B5A0001 B80C880C B28E12C1 83FCAEF3 µ0=.è.ƒÿ...¡..Z[.ûà...WV+-+.96.. 0001A0
1EF676FF F876FF0C 6AF85689 F64689F2 5689F046 89C02B08 18168800 F0E90375 u.ÖÞ.....+â.FÞ.V·.F-.V½j..v½.v-. 0001C0
26F646FF F65EC400 BCE90376 7FFFFE81 461974C0 080AC483 29962B52 9A0C2268 h"..R+.).â..ât.F.±..v.Ö¥.6^-.F-& 0001E0
```

```
Dump of file SATURN:[PCCOMMON.DUMP.DLL]SHP.TMP;1 on 18-APR-1990 10:52:51.06
File ID (922,23,0)   End of file block 111 / Allocated 112

Virtual block number 99 (00000063), 512 (0200) bytes

 01458DBA 75003F80 26F65E88 F475003F 8026F646 FFF65EC4 0CEB47EA 75003F80 .?.uõGŠ.á^-.F-&.?.u¶.^-&.?.u¤.E. 000000
 FE5689FC 468902C4 8329DB2A 3F9A56EE 5689EC46 8904C483 29A52AFA 9A046A50 Pj..ª*E).á..F£.VŸV.?*Û).á..F=.V± 000020
 76FF0C6A 06971689 0695A3EE 5688EC46 8B6674C2 0BFC4688 6D74EE46 0BEC4688 .F£.FŸtm.F=.ôtf.F£.VŸÈ......j..v 000040
 078926FE 5688FC46 8BEC5EC4 2C74C008 0AC48326 A12B529A 0C22681E F076FFF2 ·.vÞ.h"..R+Å&.á..át,á^£.F=.V±&.. 000060
 E8EB0E74 C00A0788 26FC46FF FC5EC407 8A26F046 FFF05EC4 04EC4683 02578926 &.W..F£.á^Þ.FÞ&..á^=.F=&...át.ŠÒ 000080
 065EC4EC 8B5590CB C95F5EA7 75003F80 26F05EC4 F475003F 8026F046 FFF05EC4 á^Þ.FÞ&.?.u¶á^Þ&.?.uÎ^ èÙ.U.£á^. 0000A0
 831E73FF F1300646 8B575602 EC83EC88 55CB5DE5 8B01FE4F 80260574 C30BC08C .á.Ùt.&.O±..Î]ÙU.£.£.VÛ.F.=þ.s.. 0000C0
 0676FF08 750078E8 05740018 E8157500 82E80002 A3127400 25E80875 0000023E >...u.ÒX.t.È..Ò..u.Ò..t.Òx.u..v. 0000E0
 FE5E89FE E3834306 5E8B0776 065E3900 F08BCB5D E58B5E5F 02C48329 5630469A .FOV).á._^.Î]ÙEÞ.9^.v..^.C.D±.^± 000100
 A3000416 87C28B38 74FFFA83 08C4832A 7331F29A 50028051 0E4F8D50 501EC033 3á.PP.O.Q¯.P.·1s*.á..*.t8.ô....È 000120
 0000A300 0AB80C47 89484800 08A3C033 D88EFE5E 8B0008A3 DA8E0574 D2080006 ...Øt..ÖÈ...^±.Ã3áÈ..HH.G.|..È.. 000140
 0D061E8E DB33064E 8BC08ED8 8CC31FD8 8C0006A3 00000500 0AA30147 800002A3 È...G.È.....È...Ã.Ù.Ã.á.N.3Ù.... 000160
 46892B27 01249A06 76FF006A 0876FF00 6A560000 0AC8C309 8EC18CD2 08059CE8 Ò...Ø.è.)ÙÀ...Vj..v.j..v..$.'+.F 000180
 89FC4689 02C4832B 402A3F9A 56F8768B 902FEB99 C02B0674 FFFFC2F7 FA5689F8 ½.VªÅó..t.+á.Š/..v½V.?*ª+.á..F=. 0001A0
 C95EFE56 8BFC468B 9007EB08 C4832A9F 24169A50 FE76FF00 6A561274 D008FE56 V±.Ât.Vj..v±P..$.*.á.Š...F=.V±^è 0001C0
 76C5FE8B CB03D9F7 AEF2C033 F78B067E C4D98B27 E30E4E8B 1E5657EC 8B5590CB Ù.U.£WV..N.D'.)á~..Ã3á·ÛÅ).Ù.±év 0001E0

Dump of file SATURN:[PCCOMMON.DUMP.DLL]SHP.TMP;1 on 18-APR-1990 10:52:51.06
File ID (922,23,0)   End of file block 111 / Allocated 112

Virtual block number 100 (00000064), 512 (0200) bytes

 C98058CB 5DE5885F 5E1FC18B D1F74949 04740477 FF453A26 C933FF44 8AA6F30A .µÎ.D.3è&:E.w.t.IIÅÎ.è.^_.Î]ÙX.è 000000
 E8F888E1 72020CE8 DB330CD2 1E8900AC E9DB3301 85E8EF88 FF33078B 40C98030 0.èª.¤3..ÿÒ..3ÛÕ¯...Ø.3ÛÕ..rÃ.½Ò 000020
 588E72D8 8BC503C4 75D2080C D22EF7C3 8BEA8BF8 880CD226 F7C78850 E0720205 ..rÁP.Ú¼&Ø..½.õ.Ú½.Ø..Øuá.é.Ãr/X 000040
 0CCEA3C0 330CD616 890CD4A3 0CCA0E89 CE030CC8 3E89FC85 EBD87300 D383F803 .½.Æ.ªÃŠç¤.>à..ö..ò.Èá...ø.3áÈö. 000060
 443C4E41 7401FDE8 DB3300E7 E89F750B 0B80CD80 037501AD E8910CD0 A30CCCA3 Èä.ÈÁ..ÒÙ.u..ë..Ûu.ÒÒ.3ÛÒ».tAN<D 000080
 C98003EB 0402C981 4E277502 742D3C06 742B3C31 74000CC5 3E801274 453C1C74 t.<Et..>é..t1<+t.<-t.u'N.è..Š..è 0000A0
 3E88D8F7 02759E58 40C98003 7502C5F6 0088E850 9F016CE8 4600000C D406C70E .ú.à...FÒl..PÒ..-é.u..èªX.u.½Û.> 0000C0
 FF810CD6 3E2B0475 10C5F60C D03E03F8 0330C980 03741872 C1F70675 FF0B0CD4 à...u.½èr.t..èO.«.>Ã.-é.u.+>ø... 0000E0
 880CD8A1 38755E59 01ACE800 0CE606C6 0CC83E88 0394E80C DCBE5156 507F0190 ...PVQ/É.Ò...>à.6.Î..Ò¯.Y^uBÀÃ.. 000100
 070CCE3E 83800740 8004747F F00645F7 000383F5 D8F7D3F7 137480C5 F60CDA1E .Ö.-é.t.½Æ½Ã½.Æ.½E.Þ.t..M...>ö.. 000120
 0A0CD206 C63FFFBB C301C980 C302CD80 0375000C CE3E830C E62E8A08 C9800376 v..è...Î..>ö..u..ë.Û.è.ÛÈ.?6.Ø.. 000140
 88FF33C3 DFE80E78 D803E3D1 E301C303 E30102CD 80ED770C CCFB8117 7200E4E8 ÒÕ.r..«ä.wÚ.ë.1Ð.Ú1Ð1Ð.Äx8ŠÒÜ3.. 000160
 E5721999 FF8100D7 8300D583 00038300 0358008A E8502872 0006E8D7 88DF88EF ÿ.Ô.¤Ò¤.r(PÒ..X.Ã.Æ..Í..¤.....rÎ 000180
 7480C7F6 16750CD0 060BC50B C78BEEEB 0CD006FF 01CA8003 74C00A0D 7200BBE8 ÒÈ.r..ât..ò...Ã.ŠŸ.ú.é..Ã.u.-ú.t 0001A0
 0CDA1E89 0CD81689 20C98010 C98006EB 0575020B 09758000 FB810F74 80C5F617 .-é.t..«..u..Øu.Š..è..è ..Ã...Ö. 0001C0
 0678FF0B 0040B8F1 EB0CD00E FF0025E8 09731999 FF811C74 C20BC30B C50BC78B .ú.é.û.ôt.....s.ÒX...Ã.Šþ|ª...x. 0001E0

Dump of file SATURN:[PCCOMMON.DUMP.DLL]SHP.TMP;1 on 18-APR-1990 10:52:51.06
File ID (922,23,0)   End of file block 111 / Allocated 112

Virtual block number 101 (00000065), 512 (0200) bytes

 000EE8C2 88535557 C35EAB92 AB96AB95 AB93AB92 0CDCBFF7 8856F6EB 002AE848 HÒ*.Š-V.½«É..¨.¨.¨.¨^ÚWUS.õÒ.. 000000
 0674203C 0874005E E8C307D1 D5D1D301 E201F813 58E81358 D8135800 03000BE8 Ò...ÃX.ÃX.ÒX.½Îãι¤Í¤Ú¤ÚÒ^.t.<-t. 000020
 37E810EB 397D0CD2 063A072C 027E093C 4572302C 4A74004E E8C34E46 0175283C <+u.FNÚÒN.tJ,OrE<.~.,.:.Ø.)9Š.Ò7 000040
 320CCE06 FF08CD80 0CD00EFF 0E7410C5 F6267709 3C2A7230 2C20742E 3C337400 .t3<.t ,Or*<.w&-é.t...Ã..ë...ö.2 000060
 80AC2373 0CCA363B C3F94EC9 EB10CD80 0CCC06FF 097510C5 F6F4EB20 CD80C3E4 öÙ.ë Š¶-é.u...ä..ë.ŠèN*û;6ò.s#¯. 000080
 5F240277 7A3C0672 613CE274 003CE674 0A3CEA74 093CEE74 203C1074 000CC43E >á..t.< tŸ<.tõ<.t|<.tã<ar.<zw.$  0000A0
 E8D1E7D1 3E7803FE 05AD4974 C208C108 C50BF88B AD95AD91 AD92AD57 C3C032C3 Û2âÛWÛ.Ù.Ù.Ù.½.é.è.ôtIÙ.±.x>1Ò1Õ 0000C0
 8001FA81 F633D30A D92243F0 75C8FED7 D000D1D7 D10501D1 D1E20100 05880F01 1ÒÉ..1ã11111¤1ÃÃ¤±ÙÜÞC"1.Æ3-.ª.. 0000E0
 33010CE6 0E800FEB 000780F5 7FF030DE 74FFF0A9 000780C6 13FE13EE 13CE13F5 ½.ö.Ÿ.±.ó.¤.¨Þ.t.=Þ.½.¤.Š...Î..3 000100
 0008890C E880C3FF 0A064589 04758902 6D890089 5FF788F8 88E888C8 880888C0 à.Ã.à.Ò.½.½ ...m..u..E...ÛŠÒ.¿.. 000120
 980404D8 F6C42AC4 2AE022C7 28000488 0007BF08 44010847 882EA8F3 C033FD88 .»3áª¨..G..Ð.é..|..+ú"Ã*á*á-Ã... 000140
 3E025611 3E004601 3E27F72E 048806C6 83F728F1 0308C383 DF28D928 5653C888 .àSV+)+Ò.Ù..þ+½.ó....½'>.F.>.V.> 000160
 08ADC808 AD91ADF5 870EED83 8C754F02 C58358E5 E6E202C3 8302EE83 00045683 .V...Ÿ..Ù.ãÎ^[.é.OuÑ.Ù..½Ù.Ù.àÙ. 000180
 D1D3D1D1 D1D7D1E2 D1084CFF 0078C008 F588AD93 AD91AD97 AD010A92 ADCD0AC8 à.ëÙ..1Ù.Ù.Ù.Ù.½.àx..L.1ã1¤111Æ1 0001A0
 C50BCD01 086C01D5 D1C51300 13CD13FD 13F58001 FA81ED33 D508EF23 00018000 ÃŠ..#ÿ.13Ù.ª..½.».È.Ÿ.é11.1.1ë.é 0001C0
 0007C800 00000000 00000004 A0000000 00000000 C3064489 045C8902 4C893C89 .<.L..\..D.Ù.................à.. 0001E0
```

Dump of file SATURN:[PCCOMMON.DUMP.DLL]SHP.TMP;1 on 18-APR-1990 10:52:51.06
File ID (922,23,0)   End of file block 111 / Allocated 112

Virtual block number 102 (00000066), 512 (0200) bytes

```
B59E0036 8E1BC98F 04000000 001B8EBC 20000000 0000000E 9C400000 00000000 ......a........ ¥/......¢è..6..ç 000000
9DF9DE8E 01AA93BA 47C980E9 8CE000D5 C2781F49 FFCFA605 006B9DC5 ADA82B70 p+¨Ué.k.Iïü.I.xôÍ.Å.Õ.èG¤.^..8ª. 000020
1758E219 652CFFFA A3D70A3D 70A3D70A FFFDCCCC CCCCCCCC CCCD0353 AA7EEBFB «š~¨S.ëëëëëëëë»..mÉp=.mȪ.,e.äX. 000040
CFB11EAD 4539948A FFCBE695 94BEC44D E15BFFE6 ABCC7711 8461CEFD FFF3D1B7 ñI¤.»öa..wë¨[.[ÄMæ/..Iü.¤.9ÉU.Ýü 000060
FCAEC031 4325637A 193AFE57 DDD0467C 64BCE4A1 FF2CA87F EA27A539 E9A5FF96 ..EÖ9E'ö.´..AÖ¥d|FÁIW±:.zc%C1âÖ= 000080
5FFE7BEB 5753F573 EFD10D74 FF0B0AC3 830AEB83 DFF72FB6 BB0579FF 0B2F5CBB É\/..y.£Ñ/¼Ô.Š..ú...t.Iÿs%SWÒ(± 0000A0
3F830CF8 BB5756EC 8855CB5D E58B01FE 4F800474 DB0B065E 8BEC8855 C3ECEB5B [ŠšÙU.š.^..Ût..O±..[]ûU.$VWE%..? 0000C0
000104C7 960CFAA3 0CF8A3FE 244024EB 99C03305 750176E8 00058807 1E297500 .u)..|..Òv.u.3å.$$a$±E%.È ª..ú... 0000E0
41000DE9 CB5DE588 5E5F0009 E8C08ED8 8C064E88 0CFE3689 FFFEFE44 C704C683 .ó.úD±±..6±..N..Å.äÒ.._^.[]ûÕÅ.A 000100
A8ADF003 D08B1573 C13B4843 7401A8FE 88ADFC02 778BF273 EEF983FE E180FA74 t ª.Å±.ªYs·.w.«Ü.±´.tCH;ès..Å.ÞÙ´ 000120
0305EB05 8948C128 FE4C89F9 030C74FE 88E6EBFE 4489F788 000205C2 03357401 .t5.ô....%.D±Š!.±t..ª.L±+èH..Š.. 000140
FE3D020D 0A06C626 C3027F89 00061E8C 260574D1 3B21D2B9 DA8CC688 FE4CFEF9 ª±L±.6.Õ¿@!;!t.&.......üÆ6....=± 000160
0205C203 E27401A8 ADF003D0 8B8C73C1 3B48FE88 F27401A8 ADF003FE 882574FF .t%.±.ÞÙ´.t´.±H;ès¥.Å.ÞÙ´.tå.ô.. 000180
3830D98F D88C1274 0D0A0EFE 2615E8D8 8E0474C0 0B084788 E6EBFE44 89F78800 ..%.D±Š!.G..åt..ÅŠ.å±...t..Åe10; 0001A0
005FE898 40400124 0D74C638 0068E8C0 33067788 8BEB3788 00021E8E 260574C7 út.&.....7ŠE.w.3äÒk.;ót.$.aa.Ò_. 0001C0
47890788 0D06A326 0474C138 312DB9D8 8C98EB4E 4E960574 001DE8FE 4DFE0D74 t.±M±Ò..t..NNŠ..Å¿-1;èt.&È.....G 0001E0
```

Dump of file SATURN:[PCCOMMON.DUMP.DLL]SHP.TMP;1 on 18-APR-1990 10:52:51.06
File ID (922,23,0)   End of file block 111 / Allocated 112

Virtual block number 103 (00000067), 512 (0200) bytes

```
F575EAD1 04760008 163B267F FFBA4141 49C82B03 7401A8FE 458B51C3 99C03302 .3å.ûQ.E±´.t.+èIAA¤..&;...v.Ïõu% 000000
52C359C0 33E575EA D1D2F708 75000CE8 C628C223 D2F70D72 C2031572 C603C18B .è.ór..ór.%Ø#ô+6Ò..u.%@Iõu[3åYÛR 000020
5A5958FE 55894AD7 2BD68B06 7789FFFE FE44C7F2 03F08BFE 8B571874 001DE851 QÒ..t.W.±.Þ.·ÜD±±..W..ø+¤J.U±XYZ 000040
0B02745B 5A1FFFFA 8308C483 2B0C31F2 9A1F0650 0001B850 52521ED2 335053C3 ÜSP3@.RRP¡..P...·1.+.á..ª..Z[t.. 000060
EB277200 57E80775 48064688 08568808 20BF3875 000A7E83 065756EC 8855C3D2 @ÜU.$VW..~..uÐ¢ ..V..F.Hu.ÖW.r'Š 000080
0C20FE81 04C68334 735E003E E8560E46 89024488 0074F738 1174480C 2036884C L.6 .Ht.;%t..D..F.VÒ>.^s4.6..± . 0000A0
E675C085 F95B0000 FFFF9A50 C0335016 52C48B50 21EB99FF FFB80675 D20B0473 s..@u.|...ŠIP.åR.P3åP.....[ª.åuI 0000C0
C6830C74 024C39F7 880E4E88 CB5DE588 5E5F07C0 33D3880C 20368902 5C891489 ...\..6 ..£3å._^.[]ü.N..%9L.t..6 0000E0
51531373 081A1E39 0675F73B C18E038B 26721C03 DA882CEB F9F2750C 20FE8104 ..± .u·ªŠ,.Ö..Få.£.è;%u.9....s.SQ 000100
05000221 7C010300 0CC3D18B 04879208 1A168904 75F73B0E 75C08500 00FFFF9A ......åu8;%u.........Iü....||... 000120
22000232 46010300 00000B31 62000200 00000A31 E2000200 07000221 44010300 ...D!......ã1.......b1......F2..." 000140
88000224 49010500 87000227 05010500 8C000624 72020300 26000232 91010300 ....2..&...r$.......'......I$... 000160
00000000 00000000 5C000226 6F010300 5B000226 82010300 4D000220 C6010300 ...6 ..M....&..[...o&..\........ 000180
6F43202D 20797261 7262694C 20656069 542D6E75 5220534D 00000000 00000000 ........MS Run-Time Library - Co 0001A0
70726F43 2074666F 736F7263 694D202C 38383931 20296328 20746867 69727970 pyright (c) 1988, Microsoft Corp 0001C0
00080008 00050008 00080006 00040008 00090008 0001000A 00080002 00080011 ................................ 0001E0
```

Dump of file SATURN:[PCCOMMON.DUMP.DLL]SHP.TMP;1 on 18-APR-1990 10:52:51.06
File ID (922,23,0)   End of file block 111 / Allocated 112

Virtual block number 104 (00000068), 512 (0200) bytes

```
646E6520 6E490029 28786F42 73657373 6F724367 65537068 53203A50 48530008 ..SHP: ShpSegCrossesBox().In end 000000
00000008 00000002 00000010 00000004 00000001 00002170 6F6F6C20 7373656C less loop!...................... 000020
00040000 00060000 00080000 00060000 00080000 00000000 00000000 00000020 ................................ 000040
00000000 00840000 FFA6005A 00000000 00000000 00000000 00000000 00000000 ......................Z.I...Ç..... 000060
1F68013B 00E1010E 0000002D 0087005A 00000000 00840000 00000000 00000000 ...........Ç.....Z....-.....Å.;.h. 000080
0E5D0FEB 0CF10FED 0CF31010 0CF8010C 1A920108 19820104 1AB60100 19F8FFFF ..%...Ñ...........«...µ.Ü.þ.Š.]. 0000A0
00736F63 03006E69 73030074 72717304 00000C9F 0C4C1278 0EE1127A 0EE31217 ..D.z.Å.x.L.......sqrt..sin..cos. 0000C0
0000326E 61746105 006E6174 61040073 6F636104 006E6973 61040000 6E617403 .tan...asin..acos..atan..atan2.. 0000E0
00000000 017621C6 017221C6 016E21C6 016A21C6 0D0E21C6 3FF00000 00000000 ......Þ?6I..6Ij.6In.6Ir.6Iv..... 000100
00000000 00000000 00000000 80C0E0F0 F8FCFEFF 00000000 78783136 4D050101 ...M61xx.....±=½ÞÅà............. 000120
00000000 00000000 00000000 00000000 00000000 00000000 00000000 00000000 ................................ 000140
00780000 00000000 00000000 00000000 00000000 00000000 00000000 00000000 ..............................x. 000160
C5400921 F8000000 003F045F 306DC9C8 83000020 3A020000 007A0000 00000079 y.....z....: ...àèm0 å7....%!.aé 000180
E6123C68 6AD4308D 6AE4200C 08499C3C E880FF69 930F9500 073EDAA2 2168C234 4óh|ÅÖ>...Ö.!..Ö<.I.Ë öj§0åjh<.I 0001A0
81111111 1110B0BF 2A01A01A 013E1A3E C71DE3A5 24F063BE 5AE64548 5DC0AB3D ="å]KEIZ/cÞ$ÉD.ú>.>....*¢...... 0001C0
9ECD563F E76CF500 B099553F FBB67AE8 584CAA00 000000BF C5555555 5555553F ?UUUUUéé....´LXÒzÑ«7U.¯Å%Ió7Vë. 0001E0
```

```
Dump of file SATURN:[PCCOMMON.DUMP.DLL]SMP.TMP;1 on 18-APR-1990 10:52:51.06
File ID (922,23,0)   End of file block 111 / Allocated 112

Virtual block number 105 (00000069), 512 (0200) bytes

 2D736600 00000000 00000040 0921FB54 442D183F F921FB54 442D183F 0126145E ^.&1?.-DT«!ª?.-DT«!.a........fs- 000000
 63BFEACD 7AD9B187 BD00033F F0C15238 2D73663F F921FB54 442D183F E0C15238 8RêÂ?.-DT«!ª?fs-8Rèb?..§.Ÿ!zëõ¢c 000020
 2E0C49E1 4AC71080 04C02B60 A651061C E2C03481 7FB9E2BC CBC020FD 3F5C8D6A j.\?» åù¥ã¿..4ââ..Q!'+â...úJÂI.. 000040
 54442D18 00000040 44887CBC C495A940 558A1204 0B60A540 4DCA0A32 0DA3D740 a■È.2.òM@Èm....Ua`.á¥|.Da....-DT 000060
 00000000 00000000 00000000 00000030 30302865 400921FB 54442D18 3FF921FB «!ª?.-DT«!.ae+000............... 000080
 00000000 00000000 00000000 00000000 00000000 00000000 00000000 00000000 ................................ 0000A0
 00000000 00000000 00000000 00000000 00000000 00000000 00000000 00000000 ................................ 0000C0
 00000000 00000000 00000000 00000000 00000000 00000000 00000000 00000000 ................................ 0000E0
 00000000 00000000 00000000 00000000 00000000 00000000 00000000 00000000 ................................ 000100
 00000000 00000000 00000000 00000000 00000000 00000000 00000000 00000000 ................................ 000120
 00000000 00000000 00000000 00000000 00000000 00000000 00000000 00000000 ................................ 000140
 00000000 00000000 00000000 00000000 00000000 00000000 00000000 00000000 ................................ 000160
 00000000 00000000 00000000 00000000 00000000 00000000 00000000 00000000 ................................ 000180
 00000000 00000000 00000000 00000000 00000000 00000000 00000000 00000000 ................................ 0001A0
 00000000 00000000 00000000 00000000 00000000 00000000 00000000 00000000 ................................ 0001C0
 00000000 00000000 00000000 00000000 00000000 00000000 00000000 00000000 ................................ 0001E0

Dump of file SATURN:[PCCOMMON.DUMP.DLL]SMP.TMP;1 on 18-APR-1990 10:52:51.06
File ID (922,23,0)   End of file block 111 / Allocated 112

Virtual block number 106 (0000006A), 512 (0200) bytes

 00000000 030A0000 00000000 00000000 00000000 00000000 00000000 00000000 ................................ 000000
 00000000 00000000 00000000 00008181 81010000 00010000 00000000 00000000 ................................ 000020
 00000000 00000000 00000000 00000000 00000000 00000000 00000000 00000000 ................................ 000040
 00000000 00000000 00000000 00000000 00000000 00000000 00000000 00000000 ................................ 000060
 00000000 00000000 00000000 00000000 00000000 00000000 00000000 00000000 ................................ 000080
 00000000 00000000 00000000 00000000 00000000 00000000 00000000 00000000 ................................ 0000A0
 00000000 00000000 00000000 00000000 00000000 00000000 00000000 00000000 ................................ 0000C0
 00000000 00000000 00000000 00000000 00000000 00000000 00000000 00000000 ................................ 0000E0
 00000000 00000000 00000000 00000000 00000000 00000000 00000000 00000000 ................................ 000100
 0A0A0A0A 0A0A0A0A 0A0A0A0A 0A0A0A0A 0A000000 00000000 00000000 00000000 ................................ 000120
 0A0A0A0A 0A0A0A0A 0A0A0A0A 0A0A0A0A 0A0A0A0A 0A0A0A0A 0A0A0A0A 0A0A0A0A ................................ 000140
 0A0A0A0A 0A0A0A0A 0A0A0A0A 0A0A0A0A 0A0A0A0A 0A0A0A0A 0A0A0A0A 0A0A0A0A ................................ 000160
 0A0A0A0A 0A0A0A0A 0A0A0A0A 0A0A0A0A 0A0A0A0A 0A0A0A0A 0A0A0A0A 0A0A0A0A ................................ 000180
 0A0A0A0A 0A0A0A0A 0A0A0A0A 0A0A0A0A 0A0A0A0A 0A0A0A0A 0A0A0A0A 0A0A0A0A ................................ 0001A0
 0A0A0A0A 0A0A0A0A 0A0A0A0A 0A0A0A0A 0A0A0A0A 0A0A0A0A 0A0A0A0A 0A0A0A0A ................................ 0001C0
 0A0A0A0A 0A0A0A0A 0A0A0A0A 0A0A0A0A 0A0A0A0A 0A0A0A0A 0A0A0A0A 0A0A0A0A ................................ 0001E0

Dump of file SATURN:[PCCOMMON.DUMP.DLL]SMP.TMP;1 on 18-APR-1990 10:52:51.06
File ID (922,23,0)   End of file block 111 / Allocated 112

Virtual block number 107 (0000006B), 512 (0200) bytes

 0A0A0A0A 0A0A0A0A 0A0A0A0A 0A0A0A0A 0A0A0A0A 0A0A0A0A 0A0A0A0A 0A0A0A0A ................................ 000000
 00000000 00000000 00000000 00000000 000A0A0A 0A0A0A0A 0A0A0A0A 0A0A0A0A ................................ 000020
 20202020 20202020 20202020 20282828 28282020 20202020 20202000 00000000 .....          (((((             000040
 10848484 84848484 84848410 10101010 10101010 10101010 10104820 20202020      H........................... 000060
 01010101 01010101 01010101 01010101 01010101 81818181 81811010 10101010 ................................ 000080
 02020202 02020202 02020202 02020202 02020202 82828282 82821010 10101010 ................................ 0000A0
 00000000 00000000 00000000 00000000 00000000 00000000 00000020 10101010 .... ........................... 0000C0
 00000000 00000000 00000000 00000000 00000000 00000000 00000000 00000000 ................................ 0000E0
 00000000 00000000 00000000 00000000 00000000 00000000 00000000 00000000 ................................ 000100
 00000000 00000000 00000000 00000000 00000000 00000000 00000000 00000000 ................................ 000120
 00000000 00000000 00000000 00000000 00000000 00000000 00000000 00000000 ................................ 000140
 00003FE0 00000000 00000000 7FEFFFFF FFFFFFFF 00000000 00000000 00000000 ..................ÿ.........Å?.. 000160
 00000000 00000000 00000000 00000000 00004000 00000000 00003FF0 00000000 ....þ?.......a.................. 000180
 215F0F50 0F500000 00000000 00000000 00000000 00000000 00000000 00000000 ........................P.P._! 0001A0
 00000000 00000000 00000000 00000000 00000000 00000000 00000000 00820F50 P............................... 0001C0
 00000000 00000000 00000000 00000000 00000000 00000000 00000000 00000000 ................................ 0001E0
```

```
Dump of file SATURN:[PCCOMMON.DUMP.DLL]SHP.TMP;1 on 18-APR-1990 10:52:51.06
File ID (922,23,0)   End of file block 111 / Allocated 112

Virtual block number 108 (0000006C), 512 (0200) bytes

00000000 00000000 00000000 00000000 00000000 00000000 00000000 00000000 ......................... ..... 000000
00000000 00000000 00000000 00000000 00000000 00000000 00000000 00000000 ............................ .... 000020
00000000 00000000 00000000 00000000 00000000 00000000 00000000 00000000 ................................ 000040
00000000 00000000 00000000 00000000 00000000 00000000 00000000 00000000 ................................ 000060
00000000 00000000 00000000 00000000 00000000 00000000 00000000 00000000 ................................ 000080
00000000 00000000 00000000 00000000 00000000 00000000 00000000 00000000 ................................ 0000A0
00000000 00000000 00000000 00000000 00000000 00000000 00000000 00000000 ................................ 0000C0
00000000 00000000 00000000 00000000 00000000 00000000 00000000 00000000 ................................ 0000E0
00000000 00000000 00000000 00000000 00000000 00000000 00000000 00000000 ................................ 000100
00000000 00000000 00000000 00000000 00000000 00000000 00000000 00000000 ................................ 000120
00000000 00000000 00000000 00000000 00000000 00000000 00000000 00000000 ................................ 000140
00000000 00000000 00000000 00000000 00000000 00000000 00000000 00000000 ................................ 000160
00000000 00000000 00000000 00000000 00000000 00000000 00000000 00000000 ................................ 000180
00000000 00000000 00000000 00000000 00000000 00000000 00000000 00000000 ................................ 0001A0
00000000 00000000 00000000 00000000 00000000 00000000 00000000 00000000 ................................ 0001C0
00000000 00000000 00000000 00000000 00000000 00000000 00000000 00000000 ................................ 0001E0

Dump of file SATURN:[PCCOMMON.DUMP.DLL]SHP.TMP;1 on 18-APR-1990 10:52:51.06
File ID (922,23,0)   End of file block 111 / Allocated 112

Virtual block number 109 (0000006D), 512 (0200) bytes

00000000 00000000 00000000 00000000 00000000 00000000 00000000 00000000 ................................ 000000
00000000 00000000 00000000 00000000 00000000 00000000 00000000 00000000 ................................ 000020
00000000 00000000 00000000 00000000 00000000 00000000 00000000 00000000 ................................ 000040
00000000 00000000 00000000 00000000 00000000 00000000 00000000 00000000 ................................ 000060
00000000 00000000 00000000 00000000 00000000 00000000 00000000 00000000 ................................ 000080
00000000 00000000 00000000 00000000 00000000 00000000 00000000 00000000 ................................ 0000A0
00000000 00000000 00000000 00000000 00000000 00000000 00000000 00000000 ................................ 0000C0
00000000 00000000 00000000 00000000 00000000 00000000 00000000 00000000 ................................ 0000E0
00000000 00000000 00000000 00000000 00000000 00000000 00000000 00000000 ................................ 000100
00000000 00000000 00000000 00000000 00000000 00000000 00000000 00000000 ................................ 000120
00000000 00000000 00000000 00000000 00000000 00000000 00000000 00000000 ................................ 000140
00000000 00000000 00000000 00000000 00000000 00000000 00000000 00000000 ................................ 000160
00000000 00000000 00000000 00000000 00000000 00000000 00000000 00000000 ................................ 000180
00000000 00000000 00000000 00000000 00000000 00000000 00000000 00000000 ................................ 0001A0
00000000 00000000 00000000 00000000 003D4F46 4E495F45 4C49465F 435F0820 ._C_FILE_INFO=.................. 0001C0
00000000 00000000 00000000 00000000 00000000 00000000 00000000 00000000 ................................ 0001E0

Dump of file SATURN:[PCCOMMON.DUMP.DLL]SHP.TMP;1 on 18-APR-1990 10:52:51.06
File ID (922,23,0)   End of file block 111 / Allocated 112

Virtual block number 110 (0000006E), 512 (0200) bytes

00000000 00000000 00000000 00000000 00000000 00000000 00000000 00000000 ................................ 000000
00000000 00000000 00000000 00000000 00000000 00000000 00000000 00000000 ................................ 000020
00000000 00000000 00000000 00000000 00000000 00000000 00000000 00000000 ................................ 000040
00000000 00000000 00000000 00000000 00000000 00000000 00000000 00000000 ................................ 000060
00000000 00000000 00000000 00000000 00000000 00000000 00000000 00000000 ................................ 000080
082B0000 0000017A 1FFE0000 002024CC 01100158 00002000 00000000 00000000 ......... ..X...ä$ ...±.z.....+. 0000A0
00000000 00004009 21FB5443 D6F44066 80000000 00003FE0 00000000 00000018 ........Å?......fə¶øCT«!.ə...... 0000C0
21FB5443 D6F43FE0 00000000 00004066 80000000 00004009 21FB5443 D6F43FE0 Å?¶øCT«!.ə......fə......Å?¶øCT«! 0000E0
00000000 00003FE9 21FB5443 D6F43FF0 00000000 00004066 80000000 00004009 .ə......fə......Þ?¶øCT«!Ö?...... 000100
20200A00 4854414D 203A00FD 3E3E4753 4D4E3C3C 00000000 00000000 FFFF3FE0 Å?..........<<NMSG>>ʚ.: MATH..-  000120
64696C61 766E6900 6500203A 726F7272 6520746E 696F702D 676E6974 616F6C66 floating-point error: .e.invalid 000140
000A0D77 6F6C6672 65766F00 68000A0D 30207962 20656469 76696400 67000A0D ...g.divide by 0...h.overflow... 000160
20796C74 6963696C 70786500 70000A0D 776F6C66 7265766F 20686361 7473006E n.stack overflow...p.explicitly  000180
53007900 0A0D726F 72726520 4E49414D 4F440078 000A0064 65746172 656E6567 generated...x.DOMAIN error...y.S 0001A0
36520000 000A0D72 6F727265 2053534F 4C54007A 000A0D72 6F727265 20474E49 ING error...z.TLOSS error.....R6 0001C0
0D333030 36520003 000A0D77 6F6C6672 65766F20 68636174 7320200A 0D303030 000..- stack overflow.....R6003. 0001E0
```

```
Dump of file SATURN:[PCCOMMON.DUMP.DLL]SHP.TMP;1 on 18-APR-1990 10:52:51.06
File ID (922,23,0)   End of file block 111 / Allocated 112

Virtual block number 111 (0000006F), 512 (0200) bytes

 38303036 52000800 0A0D3020 79622065 64697669 64207265 6765746E 6920200A .- integer divide by 0.....R6008 000000
 6E656075 67726120 726F6620 65636170 73206867 756F6E65 20746F6E 20200A00 ..- not enough space for argumen 000020
 65636170 73206867 756F6E65 20746F6E 20200A00 39303036 52000900 0A0D7374 ts.....R6009..- not enough space 000040
 6974206E 757200FF 000A0D00 FC000A0D 746E6560 6E6F7269 766E6520 726F6620  for environment...•......run-ti 000060
 6F702067 6E697461 6F6C6620 200A0D32 30303652 00020020 726F7272 65206560 me error ...R6002..- floating po 000080
 00000000 00000000 00000000 00FFFF00 0A006465 64616F6C 20746F6E 20746E69 int not loaded.................. 0000A0
 0A001200 020002FF 00000000 00000000 00000000 00000000 00000000 00000000 ................................ 0000C0
 00000000 00000000 00000000 00000000 00000000 00000000 0B082200 02000000 .....".......................... 0000E0
 00000000 00000000 00000000 00000000 00000000 00000000 00000000 00000000 ................................ 000100
 00000000 00000000 00000000 00000000 00000000 00000000 00000000 00000000 ................................ 000120
 00000000 00000000 00000000 00000000 00000000 00000000 00000000 00000000 ................................ 000140
 00000000 00000000 00000000 00000000 00000000 00000000 00000000 00000000 ................................ 000160
 00000000 00000000 00000000 00000000 00000000 00000000 00000000 00000000 ................................ 000180
 00000000 00000000 00000000 00000000 00000000 00000000 00000000 00000000 ................................ 0001A0
 00000000 00000000 00000000 00000000 00000000 00000000 00000000 00000000 ................................ 0001C0
 00000000 00000000 00000000 00000000 00000000 00000000 00000000 00000000 ................................ 0001E0

Dump of file SATURN:[PCCOMMON.DUMP.DLL]SIO.TMP;1 on 18-APR-1990 10:53:05.89
File ID (926,21,0)   End of file block 32 / Allocated 32

Virtual block number 1 (00000001), 512 (0200) bytes

 00000000 00000040 00000000 00000088 0000FFFF 00000004 00000020 01765A4D MZv. ...........|.......@....... 000000
 00000080 00000000 00000000 00000000 00000000 00000000 00000000 00000000 ................................ 000020
 6F6E6E61 63206D61 72676F72 70207369 685421CD 4C01B821 CD09B400 0EBA1F0E ..¤..Ç.ë!|.Lë!This program canno 000040
 00000000 00000024 0A0D0D2E 65646F6D 20534F44 206E6920 6E757220 65622074 t be run in DOS mode....$....... 000060
 00020005 00000000 00020000 00000000 00058005 2D5DE121 00190002 0505454E NE..#...!Á]-.................... 000080
 00000000 00000000 00010000 00040000 0000016B 00C200BE 00680068 00400023 #.@.h.h.ƒ.ö.k................... 0000A0
 02020E21 00000000 18800F00 1880009F 00000F00 00000090 07880F00 07880019 ..|...|...........¯...¯.....|... 0000C0
 534F4C43 534F4408 00014441 4552534F 44070000 4F495303 1DE00F21 1C4C0231 1.L.!.Á..SIO...DOSREAD...DOSCLOS 0000E0
 4F534F44 0700044F 464E4953 4651534F 440A0003 45544952 57534F44 08000245 E...DOSWRITE...DOSQFSINFO...DOSO 000100
 00010000 07524944 52554351 534F440A 00065249 44484353 4F440800 054E4550 PEN...DOSCHDIR...DOSQCURDIR..... 000120
 07130305 D403067E 03062903 01074E49 57405005 534C4C41 43534F44 0800000A ....DOSCALLS.PMWIN...)..~..å.... 000140
 4220726F 66206D65 74737973 204F4920 65666153 1F000007 650306C4 03056A03 .j..á..e....Safe IO system for B 000160
 FF9A006A D88EFFFF B81E5657 000000C8 00000000 0030312E 33206E61 60686361 achman 3.10.....à...WV.|...Äj... 000180
 0006FEF0 86C7D88E 0008B81E 56570001 3CC8CBC9 5F5E1F00 00E90001 B80000FF ...|..Õ...^_èùà<..WV.|...Äú.Þ±.. 0001A0
 7401FF1A BE830000 FFFF9A50 16FEC686 805016FF 1A868050 16FEC486 800676FF .v...á±.P.¯...P..ó±.P......ƒ...t 0001C0
 00FFFF9A 00C86800 6A0013E9 037402FF 1ABE8300 55E90497 E90001B8 0009E903 .Õ..|..Õ..ÕU..ƒ...t.Õ..j.hà..... 0001E0

Dump of file SATURN:[PCCOMMON.DUMP.DLL]SIO.TMP;1 on 18-APR-1990 10:53:05.89
File ID (926,21,0)   End of file block 32 / Allocated 32

Virtual block number 2 (00000002), 512 (0200) bytes

 BE830024 E9037502 FEC6BE83 0028E903 7508FEC4 BE830038 E9047AE9 0001B800 .|..Õz.Õ8..ƒá±.u.Õ(..ƒó±.u.Õ$..ƒ 000000
 E90000B8 0006E903 7505FEC4 BE830010 E903750B FEC4BE83 001AE903 7507FF1A ...u.Õ...ƒá±.u.Õ...ƒá±.u.Õ..|..Õ 000020
 FEF2868D 0042681E 0141E906 46880002 FEF086C7 0006E903 7402FEC6 BE83043F ?..ƒó±.t.Õ..ú.Þ±...F.ÕA..hB...·± 000040
 E908C483 00FF0010 9A5016FE F2868000 50681E01 AFE908C4 8300EA00 109A5016 .P...õ..á.Õ€..hP...·±.P......á.Õ 000060
 16FEF286 80006668 1E0185E9 08C48301 1400109A 5016FEF2 8680005C 681E019A ...h\...·±.P......á.Õ...hf...·±. 000080
 5BE908C4 83013E00 109A5016 FEF2868D 0070681E 0170E908 C4830129 00109A50 P...)..á.Õp..hp...·±.P...>..á.Õ[ 0000A0
 5016FEF2 8680008C 681E0146 E908C483 01530010 9A5016FE F2868D00 7D681E01 ..h}...·±.P...S..á.ÕF..h....·±.P 0000C0
 011CE908 C483017D 00109A50 16FEF286 80009B68 1E0131E9 08C48301 6800109A ...h..á.Õ1..h....·±.P...}..á.Õ.. 0000E0
 9A5016FE F2868000 BA681E01 07E908C4 83019200 109A5016 FEF2868D 00AD681E .hÙ...·±.P......á.Õ...h¤...·±.P. 000100
 1E000DE9 08C48301 BC00109A 5016FEF2 868000C6 681E00F2 E908C483 01A70010 ..Ì..á.Õ·..hó...·±.P...¥..á.ÕÏ.. 000120
 109A5016 FEF2868D 00ED681E 00C8E908 C48301D1 00109A50 16FEF286 80000568 hÍ...·±.P...Ì..á.Õà..hÙ...·±.P.. 000140
 76FF009E E908C483 01FE0010 9A5016FE F2868000 FF681E00 B3E908C4 8301E600 .Ì..á.Õ°..h....·±.P...±..á.Õ...v 000160
 5FE90375 001A3D00 83E90086 E90AC483 029F0046 9A5016FE F2868D01 13681E06 ..h....·±.P.F....á.Õ..Õ..=..u.Õ_ 000180
 0530FFAB E9037500 0430FF74 E9037500 0330FF13 E9037500 02300033 E90376FF .v.Õ3.=..u.Õ..=..u.Õt.=..u.Õ¨.=¯ 0001A0
 8CE90375 005230FF A5E9FEAC E9037500 1530FF08 E9037500 0C30FE92 E9037500 .u.Õ.±=..u.Õ..=..u.Õ¯±ÕE.=R.u.Õ. 0001C0
 EAE90375 005730FF 85E9FF49 E9037500 2430FF66 E9037500 20300013 E90376FE ±v.Õ..= .u.Õf.=$.u.ÕI.Õ..=W.u.Õõ 0001E0
```

```
Dump of file SATURN:[PCCOMMON.DUMP.DLL]SIO.TMP;1 on 18-APR-1990 10:53:05.89
File ID (926,21,0)   End of file block 32 / Allocated 32

Virtual block number 3 (00000003), 512 (0200) bytes

 FEC4868B FF62E9FE 7EE90375 00703DFF 04E90375 006E3DFE A3E90375 006C3DFE ±=l.u.õÊ±=n.u.õ..=p.u.õ~±õb...á± 000000
 50160646 8D012F68 1E014CE9 08C483FF FF00109A 50160646 8D011E68 1E012FE9 õ/..h...Fø.P......á.õL..h/..Fø.P 000020
 1E0124E9 08C48302 DB00109A 50160646 8D013F68 1E0138E9 08C48302 C700109A ...ú..á.õ8..h?..Fø.P...Ü..á.õ$.. 000040
 0300109A 50160646 8D015D68 1E0110E9 08C48302 EF00109A 50160646 8D014D68 hM..Fø.P...ÿ..á.õ...h]..Fø.P.... 000060
 8D017C68 1E00E8E9 08C48303 1700109A 50160646 8D016B68 1E00FCE9 08C48303 ..á.õ=..hk..Fø.P......á.õò..h|.. 000080
 08C48303 3F00109A 50160646 8D018B68 1E0004E9 08C48303 2B00109A 50160646 Fø.P...+..á.õå..h...Fø.P...?..á. 0000A0
 50160646 8D01AA68 1E00ACE9 08C48303 5300109A 50160646 8D019B68 1E00C0E9 õå..h...Fø.P...S..á.õ¯..h`..Fø.P 0000C0
 1E0084E9 08C48303 7B00109A 50160646 8D01BA68 1E0098E9 08C48303 6700109A ...g..á.õ...h¤..Fø.P...(..á.õ... 0000E0
 A300109A 50160646 8D01DB68 1E0070E9 08C48303 8F00109A 50160646 8D01CA68 hò..Fø.P......á.õp..hÛ..Fø.P...È 000100
 8D01FA68 1E0048E9 08C48303 B700109A 50160646 8D01EC68 1E005CE9 08C48303 ..á.õ\..hš..Fø.P...ñ..á.õH..hº.. 000120
 93C00300 26E90376 000E3000 01200031 E90034E9 08C48304 0700109A 50160646 Fø.P......á.õ4.õ1.-..=..v.õ&..à. 000140
 E303AB02 93033303 1F02CF03 4702A703 6F02F703 0802BB03 83035B03 D5A7FF2E ..Ïí.[...£...¼.o.Ï.G.ü...3...¨.0 000160
 C70088E9 08C48304 2200109A 5016FEC8 86800207 681E0072 E9FF1A86 88039702 .......õr..h....à±.P..."..á.õ..ú 000180
 86800222 681E006D E908C483 04370010 9A5016FE C8868002 14681E00 02FEF086 .Þ±...h....à±.P...7..á.õm..h"... 0001A0
 C4830461 00109A50 16FEC886 80023068 1E0058E9 08C48304 4C00109A 5016FEC8 à±.P...L..á.õX..h0...à±.P...a..á 0001C0
 7500033D 002BE900 2EE908C4 83048B00 109A5016 FEC8868D 0230681E 0043E908 .õC..h=...à±.P...£..á.õ..õ+.=..u 0001E0

Dump of file SATURN:[PCCOMMON.DUMP.DLL]SIO.TMP;1 on 18-APR-1990 10:53:05.89
File ID (926,21,0)   End of file block 32 / Allocated 32

Virtual block number 4 (00000004), 512 (0200) bytes

 7500073D FF9EE903 7500063D FFBBE903 7500053D FF7EE903 7500043D FFE0E903 .õÁ.=..u.õ~.=..u.õ£.=..u.õ..=..u 000000
 681E5016 FEF2868D 50160646 8D5016FE C8868D08 76FF0A76 FF0000E9 FF7BE903 .õ(.õ...v..v...à±.P.Fø.P...±.P.h 000020
 F69A5016 FF1C868D 0289681E FEF0B6FF 18C48300 D500469A 5016FF1C 86800249 I......P.F.í..á..Ñþ±.h.......P.- 000040
 00E90000 B80006E9 0009E900 01B80009 E9037404 FE7E83FE 46890AC4 83FFFF04 ....á..F±.-±.t.õ..|..õ..õ..|..õ. 000060
 00FFFF9A 5016F646 8D5016FC 4680D88E 0026B81E 56570000 0AC8CBC9 5F5E1F00 ..^_èùà...WV.¡&..Ä.F=.P.F-.P.... 000080
 6A006A01 6A006A00 31E90374 030E7F80 26F85EC4 FA5689F8 4689C02B F6568B00 ..V̄+â.F½.Vª̇á^½&....t.õ1.j.j.j.j 0000A0
 9A506040 00E4688 006A0A76 FF0C76FF 0676FF08 76FF5052 0000FFFF 9A006A01 .j......RP.v..v..v..v.j..F..ə'P. 0000C0
 56570000 02C8CBC9 5F5E1F00 00E9FE46 880002FE 46C70005 E9FE4689 0000FFFF .....F±õ..úF±...F±õ...^_èùà...WV 0000E0
 76FF1076 FF1276FF 1476FF16 76FF1876 FF1A76FF 1C76FF1E 76FFD88E 04FEB81E .¡±..Ä.v..v..v..v..v..v̄..v..v..v 000100
 0017E900 03E90374 00003DFE 46890000 FFFF9A06 76FF0876 FF0A76FF 0C76FF0E ..v..v..v..v.......F±=..t.õ..õ.. 000120
 5F5E1F00 00E9FE46 88FFAFE9 03740000 3D06C483 04D1001E 9AFE76FF 0298681E .h...v±...ì..á.=..t.õ£..F±õ...^_ 000140
 FF0876FF 0A76FF0C 76FF0E76 FF1076FF D88E0572 B81E5657 000002C8 001ACAC9 èò..à...WV.¡r..Ä.v..v..v..v..v.̄ 000160
 BA001E9A FE76FF02 A0681E00 17E90003 E9037400 003DFE46 890000FF FF9A0676 v.......F±=..t.õ..õ...h...v±...¤ 000180
 1E565700 0002C800 0CCAC95F 5E1F0000 E9FE4688 FFC4E903 7400003D 06C48305 ..á.=..t.õá..F±õ...^_èò..à...WV. 0001A0
 3DFE4689 0000FFFF 9A0676FF 0876FF0A 76FF0C76 FF0E76FF 1076FFD8 8E05DC88 ¡É..Ä.v..v..v..v..v.̄v.......F±= 0001C0
 C4E90374 00003D06 C483060F 001E9AFE 76FF02A9 681E0017 E90003E9 03740000 ..t.õ..õ...h`..v±......á.=..t.õá 0001E0

Dump of file SATURN:[PCCOMMON.DUMP.DLL]SIO.TMP;1 on 18-APR-1990 10:53:05.89
File ID (926,21,0)   End of file block 32 / Allocated 32

Virtual block number 5 (00000005), 512 (0200) bytes

 FFFF9A06 76FFD88E 0631B81E 56570000 02C8000C CAC95F5E 1F0000E9 FE4688FF ..F±õ...^_èò..à...WV.¡1..Ä.v.... 000000
 3D06C483 0664001E 9AFE76FF 02B1681E 0017E900 03E90374 00003DFE 46890000 ...F±=..t.̄õ..õ...hÝ..v±...d..á.= 000020
 D88E0686 B81E5657 000002C8 0002CAC9 5F5E1F00 00E9FE46 8BFFD3E9 03740000 ..t.õ€..F±õ...^_èò..à...WV.|...Ä 000040
 1E0017E9 0003E903 7400003D FE468900 00FFFF9A 0676FF08 76FF0A76 FF0C76FF .v..v..v..v.......̄F±=..t.õ..õ... 000060
 C95F5E1F 0000E9FE 468BFFCA E9037400 003D06C4 8306AA00 1E9AFE76 FF02BA68 h¤..v±...`..á.=..t.õò..F±õ...^_è 000080
 FF9A0676 FF0876FF 0A76FF0C 76FF0E76 FFD88E06 CCB81E56 57000002 C80008CA ò..à...WV.|ë..Ä.v..v..v..v..v.̄ 0000A0
 06C48306 F9001E9A FE76FF02 C3681E00 17E90003 E9037400 003DFE46 890000FF ....F±=..t.õ..õ...hû..v±...ª..á. 0000C0
 8E071BB8 1E565700 0002C800 0ACAC95F 5E1F0000 E9FE468B FFC7E903 7400003D =..t.õú..F±õ...^_èò..à...WV.|... 0000E0
 0003E903 7400003D FE468900 00FFFF9A 0676FF08 76FF0A76 FF0C76FF 0E76FFD8 Ä.v..v..v..v..v.̄......F±=..t.õ.. 000100
 0000E9FE 468BFFC7 E9037400 003D06C4 83074B00 1E9AFE76 FF02CE68 1E0017E9 õ...hö..v±...K..á.=..t.õú..F±õ.. 000120
 000302B3 00020000 0001079D 00020078 0001000F 01030010 90000ACA C95F5E1F .^_èò...........x...........ª... 000140
 00010046 0103008A 000105F3 01030089 00010648 01030008 0001050D 01030000 ............H.......µ.......F... 000160
 000106DD 01030020 0001006D 01030088 00020550 01030000 0005076D 00020088 ....m.......P.......m... ...Ï... 000180
 0001072F 01030047 00010781 01030046 0001059E 01030038 0001068E 01030039 9.......;.......F.......G. ./... 0001A0
 020002CB 1FFFFF00 009AD88E FFFFB81E 00000000 00000050 00020534 0103004C L...4...P........|...Ä..... ù... 0001C0
 00000000 00000000 00000000 00000000 00000000 05000200 02000000 01000900 ............................. .. 0001E0
```

```
Dump of file SATURN:[PCCOMMON.DUMP.DLL]SIO.TMP;1 on 18-APR-1990 10:53:05.89
File ID (926,21,0)   End of file block 32 / Allocated 32

Virtual block number 6 (00000006), 512 (0200) bytes

 A8C78806 7EC4D1F7 AEF2FFFF B9C033C0 8ED88CFE 880A76C5 1EDE88D7 8BEC8855 U.‹.м.‹.év..±.Ä.ã3ã¿.. Ü%ìá~..ú´ 000000
 89EC468D 56570000 16C8CB5D C28C1FFA 8BF388A4 F3C913A5 F3E9D149 A4027401 .t.Êl1ÕµÊ.èµÊ.µ.¹..ó]ùà...WV.F‰. 000020
 06478926 08568806 4688420A 47C626F8 5EC4FE56 8CFC4689 0E468DFA 568CF846 F½.V¹.F..F•.V±á^½&óG.8.F..V.&.G. 000040
 023C9A53 060A76FF 0C76FFFC 76FF167F FF0447C7 26025789 26078926 08578926 &.W.&..&.W.&úG.....v•.v..v..S.<. 000060
 EB058826 02478E26 07FF263F 8826C02A 1278044F FF26F85E C4F0880C C48300B8 £..á..Þá^½&.O.x.*ã&.7&..&.G.&..$ 000080
 26085EC4 56570000 08C8CBC9 5F5EC688 06C483FF FF00C69A 006A53FA 76FF900F ...v¹Sj..ó....á..ó^_èùà...WVá^.& 0000A0
 46891320 05E0D1C1 03E001C8 8BF9F700 0CB99907 2C2DC388 FA4689E4 2A08478A .G.*ð.F¹.û-,..¿..¼¹¯àìÁ.èìÁ. ..F 0000C0
 5EC49001 2BE9FFFF 88200A4F 8026085E C40F7440 0A47F626 0774830A 47F626F8 ¥&-G..t.&-G.ət.á^.&.O. ¡..Ö+..á^ 0000E0
 EF0A6780 26020A4F 802690E2 EB000004 47C72620 0A4F8026 0E74010A 47F62608 .&-G..t.&.O. &úG...Šã.&.O..&.g.ÿ 000100
 06D86BF9 F7000CB9 99072C2D C38B4C75 0C0A47F6 26FC7689 F0880447 8926C028 +ã&.G..Þ.v=&-G..uL.û-,..¿..¼¹kÄ. 000120
 FF0A7E81 16750744 087E810E 74016F0A 7E810775 0738087E 81377501 132087F6 -. ..u7.~.B.u..~.o.t..~.D.u..~.. 000140
 5EC404C4 830C51E8 0876FF0A 76FF0C75 C00B02C4 8301E210 549AFA76 FF0F75FF .u..v¹.T.ã..á..ãu..v..v.ÒQ..á.á^ 000160
 085E8B67 74011320 87F6060B 6BF9F700 0CB99907 2C2DC388 1575080A 47F62608 .&-G..u..û-,..¿..¼¹kÄ.-. ..tg.^. 000180
 89264802 4588F87E 88025789 26078926 40085788 26064788 2606772B 26378B26 &.7&+w.&.G.&.W.ə&..&.W..-½.E.H&. 0001A0
 F6FA5E8B 19E8FC46 8908C483 02000EA4 9AFA76FF 0677FF26 5256167E F60B0447 G..-~.VR&.w..v¹.Ê....á..F•$..^¹- 0001C0
 2606468A 065FC426 085EC408 C4830223 0E669A53 006A006A 026A0F74 20193187 .1. t.j.j.j.S.f.#..á.á^.&á_..F.& 0001E0
```

```
Dump of file SATURN:[PCCOMMON.DUMP.DLL]SIO.TMP;1 on 18-APR-1990 10:53:05.89
File ID (926,21,0)   End of file block 32 / Allocated 32

Virtual block number 7 (00000007), 512 (0200) bytes

 0374FC76 39FC4689 08C48300 900EA49A FA76FF50 1606468D 560001BE 17EB0788 ..Š.ƒ..V.F..P.v¹.Ê....á..F•9v•t. 000000
 7A1E8C1C 78A31C7E B8017910 789A000A B8EC8B55 C8C95F5E E42A0646 8AFECCE9 Õä±.F.*ð^_èùU.$¦...x.y.¦~.Êx...z 000020
 001C7406 C71C5016 891C4EA3 08568806 46881C6A 16891C68 A310568B 0E46881C ..F..V.Êh¯..j..F..V.ÊN...P.ú.t.. 000040
 54A31C58 A3C02B00 011C7606 C70308E9 037425F6 7E80038D E900001C 7206C700 .ú.r...Õ...—%t.Õ..ú.v...+áÊX.ÊT 000060
 260A5EC4 00201D0E 06C71C66 A31C4CA3 1C52A31C 6CA31C6E A31C56A3 1C70A31C .Êp.ÊV.Ên.Êl.ÊR.ÊL.Êf.ú.8. .á^.& 000080
 C71C5806 FF0D752B 3F80260A 5E88903E EB00301D DE06C70A 46FF4975 30017F80 ...Oul.F.ú.8.0.Š>..^.&.7+u...X.ú 0000A0
 1C4C06FF 9014EB1C 6C06FF1A 75001C58 3E830E75 203F8026 9028EB00 001C6C06 .l...Š(.&.? u..>X..u...l.Š....l. 0000C0
 C4830978 E80E5098 078A260A 5E880A46 FF1C6606 FFC77520 3F80260A 5EC400EB Š.á^.&.7-uú..f..F..^.&...P.Òx..á 0000E0
 1C7C3E83 0C56890A 468908C4 8308C7E8 0E1C7C68 1E0A76FF 0C76FFD0 75C00B02 ..âuí.v..v..h|..Òú..á..F..V..>|. 000100
 DE06C706 75301D0E 3E830D74 001C663E 831C7CA3 D8F71C7C A11C6606 FF0C7D00 .)...f.À|.%ÄÈ|..>f..t..>8.0u.ú.8 000120
 83087BE8 0E1C7668 1E0A76FF 060A46FF 1C6E06FF 2D752E3F 80260A5E C400201D . .á^.&.7.u-..n..F...v..hv..Ò(.. 000140
 98078A26 0A5EC41C 6E0EFF00 011C7606 C70A7D00 1C763E83 0C56890A 468908C4 á..F..V..>v..).ú.v.....n.á^.&... 000160
 75001C56 3E830002 1C5606C7 0675006C 302B7400 68304074 004E303D 7400463D •F.t==N.tə=h.t+=l.u.ú.V....>V..u 000180
 00011C56 06C79002 4EE91C75 003F8026 0A5EC40A 46FF0375 4C3F8026 0A5EC409 .á^.&.?Lu..F.á^.&.?.u.ÕN..ú.V... 0001A0
 47300A74 00453DF8 46899807 8A26C8EB 00081C56 06C7D0EB 00101C56 06C7D8EB ŠÄú.V...ŠÄú.V...Šà&....F½=E.t.=G 0001C0
 00633D01 91E9037E 78740069 3DF84688 20F84683 1C5406FF 08750058 30057400 .t.=X.u...T..F½ .F½=i.tx~.Õ..=c. 0001E0
```

```
Dump of file SATURN:[PCCOMMON.DUMP.DLL]SIO.TMP;1 on 18-APR-1990 10:53:05.89
File ID (926,21,0)   End of file block 32 / Allocated 32

Virtual block number 8 (00000008), 512 (0200) bytes

 681EC415 75021C56 3E839001 59E90140 E9037500 25300152 E9037E01 3FE90375 u.Õ?.~.ÕR.=%.u.Õə.ÕY...>V..u.á.h 000000
 83078926 1C72A11F C4261C68 1EC400E8 00000247 C7260789 261C72A1 1FC4261C .&á.Àr.&..&úG...Š.á.h.&á.À¡.&... 000020
 0A47F626 1C4E1EC4 01BDE903 74001C72 3E830170 E9037500 1C743E83 041C6806 .h...>t..u.Õp..>r..t.Õ§.á.h.t-G. 000040
 EB02C483 019EE80E 0A6A0000 1C4C06C7 1C7006FF 01ACE9FF FFB801AF E9037520 u.Õ£.¡..Õ¯...p.ú.L...j..Õ.....Š 000060
 E9037508 1C563E83 00041C76 06C71C6E 06FF1C54 06FF1C52 06FFF2EB 086A90C3 û.j.Š·..R...T...n.ú.v....>V..u.Õ 000080
 663E83FA 46891C7C A128741C 7C0639FA 46891C56 A3C02B7A 74011C56 3E830081 ...>V..tz+áÊV..F¹9.|.t(À|..F¹.>f 0000A0
 831C7CA3 C028027D C0081C7C A1051C7C 2E839090 13EB0000 1C7C06C7 0A74001C ..t.ú.|...Š.....|..À|..á).+áÊ|.. 0000C0
 1C663E83 227400FA 7E8302C4 83048DE8 0E3A6A02 C4830130 E80E106A 021C6806 .h..j..Ò0..á.j:.Õ...á..-¹.t".>f. 0000E0
 2E830000 1C7C06C7 9007EB1C 7CA3C02B 027DC008 1C7CA300 052DFA46 8B157400 .t..F¹-..È|..á).+áÊ|.Š..ú.|..... 000100
 026EE80E 006A90FF 3FE9106A FF10E902 1C680683 02C48300 F1E80E10 6A041C68 h..j..Òp..á...h..Õ..j.Õ?..j..Òn. 000120
 7500643D 90FF21E9 0428E80E 256AFF2A E90349E8 0EF876FF F4E8016A 90FF39E9 Õ9..j.Š¶.v½.Õl.Õ*.j%.Õ(.Õl..=d.u 000140
 46880A4E FF0C568B 0A468B09 74001C56 3E830A7E 00673005 7C00653D FF0CE903 .Õ..=e.|.=g.~Õ.>V..t..F..V..N..F 000160
 7030FEE4 E9037500 6F30FE80 E9037500 6E30903A EBFE5689 FC468940 0C5688OA ..V.ə.F•.V±Š:.=n.u.Õ.±=o.u.Õõ±=p 000180
 46FF9081 EBFF79E9 03750078 30FEB9E9 03750075 308F7400 7330FEE0 E9037500 .u.ÕÁ±=s.t.=u.u.Õ¿±=x.u.Õy.ŠŸ..F 0001A0
 76FF500A 462BC38B EC75253C 0474C00A F6468807 8A26FC5E C4FC46FF 9034EB0A .Š4..F=á^=&...F-.ât.<%u&.û+F.P.v 0001C0
 F6468807 8A260A5E C40C5689 0A4689FE 568BFC46 8B06C483 044CE80E 0A76FF0C ..v..ÒL..á..F•.V±.F..V.á^.&...F- 0001E0
```

Dump of file SATURN:[PCCOMMON.DUMP.DLL]SIO.TMP;1 on 18-APR-1990 10:53:05.89
File ID (926,21,0)   End of file block 32 / Allocated 32

Virtual block number 9 (00000009), 512 (0200) bytes

```
56570000 12C8C8C9 1C72A1FE 51E90374 200A47F6 261C4E1E C4FC63E9 0374C00A .ât.Ôc=á.N.&-G. t.ÕQ±Ar.èùà...WV 000000
3E830774 021C563E 831C7006 FF04740A 067E8300 201DDE06 C7067400 1C6E3E83 .>n..t.ú.B. ..¬..t...p..>V..t..> 000020
3E83902C EB041C68 0683FE56 89FC4689 02578B26 078B261C 681EC419 75101C56 V..u.á.h.&..&.W..F=.V±..h..Š,..> 000040
46899907 8B261C68 1EC40EEB 0000FE46 C7FC4689 078B261C 681EC411 74001C70 p..t.á.h.&...F=úF±..Š.á.h.&....F 000060
C02B9003 EB06468B 0674FE46 0BFC468B 0E74001C 4C3E8302 1C680683 FE5689FC =.V±..h...>L..t..F=.F±t..F.Š..+å 000080
067E832B 7D00FE7E 83317500 1C703E83 F45689F2 46891C7A 16881C78 A11DDCA3 ÈÉ.Àx...z..F·.V¶.>p..u1.-±.)+.-. 0000A0
FE5689FC 46890AF7 00D283D8 F7FE568B FC46882D 07C626F2 46FFF25E C41D750A .u.á^·.F·&ó.-.F=.V±XÀ.@.XÖ.F=.V± 0000C0
76FFFE76 FF501E06 76FFFA5E 8CF84689 1C5AB800 00F646C7 9006E800 01F646C7 úF-..Š..úF-..¡Z..F½.^ª.v..P.v±.v 0000E0
0E8B04C4 83024510 329AF876 FFFA76FF 4574001C 6E3E830A C4830729 104A9AFC =.J.)..á..>n..tE.vª.v½.2.E..á... 000100
05EBF27E C4F04E8B 00001DDC 06C70675 081DDC3E 830D7EC9 0BF04E89 C82B1C76 v.+à.NÞ.è¬..>É..u.ú.É....NÞá~·Š. 000120
C4F276C5 EE5E8C1C 540E8BF0 4E89F446 8CF27E89 F47FC008 49C18847 3005C626 &ó.0G.èI.à.¶.-·.F¶.NÞ..T..^Ÿév·á 000140
8CF27689 E375003F 8026F846 FF46202C 80037C61 3C0774C9 0B048807 8A26F85E ^½&.....èt.<a|.., F.F½&.?.uÐ.v·. 000160
02EB0001 B8057500 F67E8308 741C6C06 0B1C58A1 1475001C 703E83EE 5E8EF45E ^¶.^Ÿ.>p..u.ÀX...l.t..—.u.¡..Š. 000180
1C68A100 01BE1874 00067E83 56570000 10C8C8C9 5F5E02C4 8302FFE8 0E50C028 +âP.Ò...á.^_èùà...WV.-..t.ƒ..Àh. 0001A0
078B261C 681EC413 74081C56 3E83008F E9021C68 0683FA56 89F84689 1C6A168B ..j..F½.Vª.¯h..Ö...>V..t.á.h.&.. 0001C0
1C680683 FA5E8CF8 4689FC46 89078B26 1C681EC4 10EBFA56 89F84689 02578B26 &.W..F½.VªŠ.á.h.&...F=.F½.´`..h. 0001E0
```

Dump of file SATURN:[PCCOMMON.DUMP.DLL]SIO.TMP;1 on 18-APR-1990 10:53:05.89
File ID (926,21,0)   End of file block 32 / Allocated 32

Virtual block number 10 (0000000A), 512 (0200) bytes

```
8902E1B8 097500FC 7E83900A EB020AB8 1575FA46 0BF8468B 0E74081C 563E8304 ..>V..t..F½.Fªu.¡Ö.Š...-=.u.¡Å.. 000000
900EEB1C 760E8B1C 741C6E36 39F62BF4 5689F246 89FA568B F84688FA 5E8CF846 F½.^ª.F½.Vª.F·.V¶+-96n.t...v.Š.. 000020
75003F80 26F246FF F25EC446 90EDEB10 7ECE3B46 1574003F 8026F246 FFF25EC4 á^·.F·&.?.t.F;ö-.ŠÚ.Fá^·.F·&.?.u 000040
83E80EF8 76FFFA76 FF5602C4 830159E8 0E570875 001C663E 83FE2B1C 7C3E8BF3 µ.>|.+±.>f..u.W.ÒY..á.V.vª.v½.Òª 000060
8B1C68A1 000006C8 90CBC95F 5E02C483 013CE80E 57087400 1C663E83 06C48301 ..á..>f..t.W.Ò<..á.^_èù.à...Àh.. 000080
83FA468B C02A9003 EB01B005 7547067E 83067467 067E83FE 5689FC46 891C6A16 .j..F=.V±.~.gt..~.Gu.¯.Š..ªâ.Fª. 0000A0
FF00011C 7606C706 75001C76 3E830074 00FA7E80 00061C76 06C70675 001C6E3E >n..u.ú.v....~ª.t..>v..u.ú.v.... 0000C0
0C1EFF26 1B6A068E FC76FFFE 76FF1C78 36FF1C7A 36FF0676 FF1C7636 FF1C5436 6T..6v..v..6z..6x..v±.v=..j.&... 0000E0
1EFF261B 6A068E1C 7836FF1C 7A36FF14 75001C4C 3E831B74 00FA7E80 0EC48307 ..á..-ª.t..>L..u..6z..6x...j.&.. 000100
261B6A06 8E1C7836 FF1C7A36 FF147500 1C763E83 1B74001C 4C3E8304 C4830710 ...á..>L..t..>v..u..6z..6x...j.& 000120
76FFFE76 FF1B741C 6C060B1C 58A10000 1DDC06C7 081C6806 8304C483 07181EFF .....á...h..ú.É...ÀX...l.t..v±.v 000140
90CBC901 29E80E50 C02B02E8 0001B805 74C00B04 C483071C 1EFF261B 6A068EFC =..j.&.....á..ât.¡..Š.+âP.Ò).èù. 000160
2607FF26 37882606 468A1478 044FFF26 1C4E1EC4 3C75001C 743E8356 000000C8 à...V.>t..u<á.N.&.O.x..F.&.7&..& 000180
7406FF07 754006C4 830A0100 C69A0676 FF531C50 36FF10EB E42A0488 2602478E .G.&..ªóŠ..6P.S.v..6....á.ǝu...t 0001A0
507EF60B 06768B57 75001C74 3E835657 000002C8 90CBC95E 1C7206FF 9005EB1C .Š....r.^èù.à...WV.>t..uW.v..--P 0001C0
4EC68B1C 7406FF04 754006C4 830A6900 C69A1DDE 36FF1C4E 36FF1C50 36FF1BEB Š..6P..6N..6B..6.i..á.ǝu...t..6N 0001E0
```

Dump of file SATURN:[PCCOMMON.DUMP.DLL]SIO.TMP;1 on 18-APR-1990 10:53:05.89
File ID (926,21,0)   End of file block 32 / Allocated 32

Virtual block number 11 (0000000B), 512 (0200) bytes

```
E42A0588 2602478E 2607FF26 3F8B261D DEA00478 044FFF26 1C4E1EC4 1E7EC008 .â~.á.N.&.O.xâ.B.&.?&..&.G.&..ªó 000000
743E830A 76885657 000002C8 CBC95F5E 1C720601 06468807 75001C74 3E8304EB Šâ.>t..u..F...r.^_èùà...WV.v..>t 000020
754006C4 830AD800 C69A5098 078A2606 5EC41C4E 36FF1C50 36FF22EB 5E75001C ..u^Š".6P..6N.á^.Ë...P.6.Û..á.ǝu 000040
C4078A26 065EC4CD 78044FFF 261C4E1E C42574C0 084EC68B 0646FF1C 7406FF04 ...t..F..6N.átXá.N.&.O.xëá^.&..á 000060
06010A46 8B077500 1C743E83 CAE8E42A 05882602 478E2607 FF263F8B 261C4E1E .N.&.7&..&.G.&..ªóŠò.>t..u..F... 000080
FA4689FC 4689C02B F65689F4 46891C7A 16881C78 A1560000 0CC8CBC9 5F5E1C72 r.^_èùà...VÀx...z..F¶.V-+á.F=.Fª 0000A0
83057510 1DDC3E83 06762BF0 2BF84689 04C48307 1410329A F476FF52 1C7C368B .6|¯R.v¶.2....á..F½+Þ+v..>É..u.. 0000C0
1DDE3E83 1975203F 8026F45E C4227500 1C663E83 4E017508 1DDC3E83 08EB02EE Ÿ.Š..>É..u.N.>f..u"á^¶&.?-u..>B. 0000E0
077EF60B 0B743010 DE3E83F8 4EFF02C4 83FE71E8 0E509807 8A26F446 FF127530 Ou..F¶&...P.Òq±.á..N½.>B.Ot..-~. 000100
E80EFC46 FF077400 1DDC3E83 0066E80E FA46FF07 7400067E 83187400 1C663E83 .>f..t..¬..t..Fª.Òf..>É..t..F=.Ò 000120
39E80E04 7500FA7E 830A7400 067E8302 C483FE7E E80E5629 75001C66 3E830070 p..>f..u)V.Ò-±.á..¬..t..-ª.u..Ò9 000140
83FEB5E8 0EF476FF F676FFF8 76FF0040 E80E0475 00FC7E83 0A74001D DC3E8300 ..>É..t..~=.u..Òǝ..v½.v-.v¶.Òç±. 000160
74001C58 3E83CBC9 5E02C483 FE38E80E 5600201D DE06C70E 74001C66 3E8306C4 á..>f..t.ú.B. .V.Ò8±.á.^èù.>X..t 000180
101DDC3E 8302C483 FDC8E80E 306ACB02 C483FDD2 E80E5000 208803EB 002BB805 .¡+.Š.¡ .P.Ò@».á.ùj0.Òà».á..>É.. 0001A0
56570000 06C8CB02 C483FDAA E80E5000 788803EB 005BB805 74001C54 3E831775 u..>T..t.¡X.Š.¡x.P.Ò`».á.ùà...WV 0001C0
9060EB0A 46FF021C 68068337 88261C68 1EC41275 2A3F8026 0A5EC400 01FE46C7 úF±..á^.&.?*u.á.h.&.7..h...F.Š'. 0001E0
```

```
Dump of file SATURN:[PCCOMMON.DUMP.DLL]SIO.TMP;1 on 18-APR-1990 10:53:05.89
File ID (926,21,0)   End of file block 32 / Allocated 32

Virtual block number 12 (0000000C), 512 (0200) bytes

 3F7C303C FA468807 8A260A5E 8BF62B0A 46FFFFFF FE46C708 752D3F80 260A5EC4 6^.&.?-u.úF±...F.+-.^.&...F*<0|? 000000
 8A261B7F 393D8026 06E8FB88 00301D0E 06C70675 303C0A75 1C6E3639 3B7F393C <9.;96n.u.<0u.ú.8.0..«Š.&.=9..&. 000020
 8B0C468C 0A7E890F 7D303080 2647F188 30E983C8 03E1D1CE 0302E1C1 CE8B9805 ...öéÃ..öìÃ.à.Õ0.þG&.=0)Ö.-..F.. 000040
 468902E8 B8570000 04C8CBC9 5F5E0C56 8B0A4688 37892606 5EC4F08B EEF7FE46 F±¥Ÿ.Þá^.&.7.F..V.^_èùà...W¡Ò..F 000060
 468CFC7E 890001B8 F4750038 26117400 30802647 01E8FC7E C4064E8A FE5E8CFC •.^±.N.á-•Š.G&.=.t.Ï8.u¶¦ ..-•.F 000080
 E0865800 00FFFF9A 5016C488 50EC8855 90C8C95F C02BFE46 8CFC7E89 9009E8FE ±Š...-•.F±+á_èù.U.šP.á.P.. ..X.Á 0000A0
 E58B0001 B809C511 8C9A03B6 E80021E8 0000FFFF 9A02EE68 1E02F068 1E192AA3 Ê*..hÞ..hŸ......Ò!.ÒÑ....é., ..! 0000C0
 FFB902F0 068EFF33 0000B81E 02F616FF 00FF680C F600A69A 0CE90D52 9A50CB5D ]ùP.R.Õ..Ì.-.h....-..£..3...Þ.¿. 0000E0
 74AEF2C0 330874CA 8BA6F3CB 8BD18B06 FABE3174 003D8026 47017500 3D80267F .&.=.u.G&.=.t1/*..!.ùµ!.Òt.3á·Ut 000100
 1FEDEBAA C20A0572 412CAC92 04E0C00E 72412CAC 1931BF1F F78B071E 061CEBE7 ÓŠ.....¥.¢1.¯,Ar.âÁ..¯,Ar..ð¯ŠÙ. 000120
 0DA69A50 00FFB807 081EFF04 7400070A 3E830CFB 00A69A50 00FCB8EC 8B5500C3 û.U.š|•.P.Ì.«..>...t.....|..P.Ì. 000140
 74964010 74C23BAD 1B748E06 568BC08E D88E0161 B85756EC 8B55CB5D E58B005C \..Ì]ùU.šVW|a..Ã.á.V./t.Ù;òt.ə.t 000160
 0D769A06 76FF57EC 8B550002 CA5DE58B 5E5F96E8 EBF78BAE F2FFFFB9 C033970C ..3á¿..·Ù.¥ŠŠ._^.Ì]ò..U.šW.v..v. 000180
 9A501651 521E5300 02B8C488 50490 1F7 AEF2FFFF B9C033FA 8B921F74 C00B0070 p..át...*3á¿..¯Ù%!!P.áE..S.RQ.P. 0001A0
 F9F7000C B999072C 2D04468B 1B4206FF 000004C8 0002CA5D E58B5F5B 0000FFFF ....[_.Ì]ò..à.....B..F._...¿..¥* 0001C0
 26045EC4 02C48300 8013479A 020068FE 5E8CFC46 89132005 E0D1C103 E0D1C8B8 .à1Á.ē1Á. ..F•.^±h...G.¯..á.á^.& 0001E0

Dump of file SATURN:[PCCOMMON.DUMP.DLL]SIO.TMP;1 on 18-APR-1990 10:53:05.89
File ID (926,21,0)   End of file block 32 / Allocated 32

Virtual block number 13 (0000000D), 512 (0200) bytes

 26045EC4 9021EB02 000247C7 26FC5EC4 080A4F80 261174D0 0B085789 26064789 .G.&.W..Àt.&.O..á^=&úG...Š!.á^.& 000000
 26045EC4 00010247 C726FC5E C4085789 26064789 2640FE56 8BFC468B 040A4F80 .O...F•.V±ə&.G.&.W.á^=&úG...á^.& 000020
 192F1E38 065E8BEC 8B55C3C9 00000447 C7260257 89260789 26085788 26064788 .G.&.W.&..&.W.&úG...èÙU.š.^.;./. 000040
 FF9A5116 0C76FF08 76FF0A76 FF53CC88 04EC8304 78E9046C E9C03300 09BA0872 r.¤..3áÕl.Õx..š..äS.v..v..v..Q.. 000060
 2F1E3806 5E880CEC 83EC8B55 00CB5DE5 88FD1931 A78091E1 75C0855A 590000FF ...YZ.áuÃ..Ì1.».Ì]ù.U.š.š..^.;./ 000080
 9A5016F4 46805141 415151C9 33531274 20193187 F6042BE9 C0330009 BA087219 .r.¤..3áÕ+.-.1. t.S3èQQAAQ.F¶.P. 0000A0
 8B5657FC FC4689FE 4689C033 0856C50A 468EFA5E 8C667480 193187F6 00000E8F ....-.1..tf.^*.F.éV.3á.F±.F••WV. 0000C0
 16FA8B04 8BE22B00 80BADC8B 02EC833B 75AEF20A B049E30C 4E8BF866 89F28BFA *.·.f%.N.DI¯.·Ùu;.š..£¤..+ã.å.*. 0000E0
 AA001FE8 0375FB38 0DB0009A E9002BE8 F4E2AA1A 74F83B00 740A3CAC 0C4E8B07 _.N.¯<.t.;«t.¯ã¶Ò+.Õ..¯.;«u.Ò..^ 000100
 53500E07 10789AFF FCB87AEB 0093E9FA 5E8E5F5E E1EB0014 E8E2EBFC 46FF0AB0 ¯..F•ŠãÒ..ŠÃ^_.^*Õ..Šz|•..x...PS 000120
 8B1175C0 0B00000D D09A5016 F4468051 521E5306 5E8B1FE3 CA2BCF8B 1F061E51 Q....ü+ÒD..^.Š.RQ.F¶.P.Å....àu.. 000140
 00013000 74006030 1874C00B 08C4831F C3FA8858 58591F07 74DB0BFE 5E01F45E ^¶.^±.Ùt..Y[X.*ü..á..át.=m.t.=.. 000160
 085E8B0A 5E8E0E74 40193187 F6FE5E8E 26EBF900 20BA03E8 001CBA08 7500098A ¤..u.¤..Š.¤ .*Š&.^±-.1.ət..^..^. 000180
 0472FA5E 8E5F5EF8 668BFC46 2BFE468B 06EBF9C0 33001CBA 0EEBF803 751A3F80 .?.u.%Š.¤..3á*Š..F±+F•.f%^_.^*r. 0001A0
 9A5016F4 46805152 1E530856 C51EEEEB C18B0475 C90B0C4E 8B030FE9 CB5DE588 .Ì]ùÕ...N..èu..êŠŸ.éV.S.RQ.F¶.P. 0001C0
 00208AC7 EB001CBA CC750009 8A00013D 0074006D 3D1774C0 0B1F071E 00000F67 g.......át.=m.t.=..¤..uä¤..Šú¤ . 0001E0

Dump of file SATURN:[PCCOMMON.DUMP.DLL]SIO.TMP;1 on 18-APR-1990 10:53:05.89
File ID (926,21,0)   End of file block 32 / Allocated 32

Virtual block number 14 (0000000E), 512 (0200) bytes

 EBC03300 1CBAA6EB 02751A3F 80260A88 0A744019 3187F687 75C00BF4 468BC2EB Šõ.F¶.áu¬-.1.ət..Õ&.?.u.Š|¤..3áŠ 000000
 835756EC 8B5500C8 5DFA8891 49D1F7AE F2FFFFB9 C033067E C4D78BEC 8B5500A3 Ê.U.š.•á-.3á¿..·Ù%!!..*]ù.U.šVW* 000020
 EB0001B8 05744019 3187F60C 7C00FB83 117D192F 1E3B065E 8BEC8B55 0442E900 .ÕB.U.š.^.;./.}..«.|.-.1.ət.¡..Š 000040
 75400726 A1C85152 E38B0572 072A1E3B 0B72D82B DC8B5A59 00CB5DE5 8BC03302 .3á.Ì]ù.YZ.É+Ãr.;.*.r..DRQÙÅ&.əu 000060
 9A521650 1653C488 50871931 A7800488 5200028B 07262EFF 5152FC5C E9C03305 .3áÕ\•RQ..&.£..R.å.Ì1.ñP.áS.P.R. 000080
 8B5AD479 4B19318F 0808B106 75000230 07740001 3D40B112 7558C00B 0000FFFF .....áXu.Ÿə=..t.=..u.Ÿ...1.KyåZ. 0000A0
 FF00038B C28C1B62 06C401AE E903731B 5A1EFFDB 33C28C1B 5E06C41E E31B5C0E .\.Ð.á.^..ó3Ü..Z.•.ÕÜ.á.b..ðE... 0000C0
 0E016A0B 741B6A3D 1B668800 73E81B66 BF1B668E 007CE81B 668F1B66 BE1B5A1E .Z.ff.¢f.Ò|.ff.¢f.Òs.¡f.=j.t.j.. 0000E0
 11149A00 6A006A03 6A0051E8 1B6ABF1B 668ED88E 007CB8C3 0000FFFF 9A111968 h.......ü¡|..Ãff.¢j.ÒQ.j.j.j.... 000100
 BF1B6ABE EC8B5503 EB0031E8 1B6ABF1B 668E003A E81DE0BF 1DE0BEEC 8B550000 ..U.š/Å.¢Å.Ò:./f.¢j.Ò1.Š.U.š/j.¢ 000120
 07E31B5C 0E8B0000 FFFF9A50 06468A50 C033001A E81B6ABF 1B6ABE00 23E81B6A j.Ò#./j.¢j.Ò..3áP.F.P.......\.Ð. 000140
 000014C8 00C3EEEB 1DFFF274 02450B05 8B04EF83 0E73F73B C31B5A1E FF00028B £....Z.û;¥s..ÿ....E.t·..ŠŸû.à... 000160
 5689F646 89F25689 F04689C0 2B02F016 8B00F0E9 037502F0 3639FF2B F62B5657 WV+-+.96Þ.u.ÕÞ...Þ.+å.FÞ.V·.F-.V 000180
 03767FFF FE814619 74C00B0A C4831200 145A9A06 FA681EF6 76FFF876 FF0C6AF8 %j..v%.v-.h*..Z....á..át.F.±..v. 0001A0
 5E8BF475 003F8026 F646FFF6 5EC40CEB 47EA7500 3F8026F6 46FFF65E C400BCE9 Õ¥.á^-.F-&.?.uõGŠ.á^-.F-&.?.u¶.^ 0001C0
 4513479A 56EE5689 EC468904 C483120F 14029A04 6A500145 8DBA7500 3F8026F6 -&.?.u¤.E.Pj.......á..FŠ.VŸV.G.E 0001E0
```

```
Dump of file SATURN:[PCCOMMON.DUMP.DLL]SIO.TMP;1 on 18-APR-1990 10:53:05.89
File ID (926,21,0)   End of file block 32 / Allocated 32

Virtual block number 15 (0000000F), 512 (0200) bytes

 A3EE568B EC468B66 74C20BFC 46886D74 EE4608EC 4688FE56 89FC4689 02C48312 ..ő..F▪.V±.Fš.FŸtm.F▪.ôtf.Fš.VŸÈ 000000
 5EC42C74 C0080AC4 830F4C14 5A9A06FA 681EF076 FFF276FF 0C6A1839 16891837 7...9.j..v·.vÞ.h°..Z.L..ő..ðt,ő^ 000020
 46FFFC5E C4078A26 F046FFF0 5EC404EC 46830257 89260789 26FE568B FC468BEC š.F▪.V±&..&.W..Fš.ő^Þ.FÞ&..ő^▪.F 000040
 5EA77500 3F8026F0 5EC4F475 003F8026 F046FFF0 5EC4E8EB 0E74C00A 078826FC ▪&...ât.Šôő^Þ.FÞ&.?.u¶ő^Þ&.?.uÏ^ 000060
 0808070A 0C090C08 0C070906 00051804 02030202 1601FA58 E90002B8 90CBC95F _èù.¡..ÕX°...................... 000080
 1C702060 006C0859 00570053 00520243 00410235 02121211 0010120F 1600160C ............5.A.C.R.S.W.Y.l.m p. 0000A0
 FFFFB819 26168919 20A31608 00000807 02CE08A4 00840982 0A810A80 16060972 r...........Ê.ö.▪.....Ê-...&.¡.. 0000C0
 073A2E18 75E40A00 24B9129A BB192DA3 CB5DE588 99FFFF88 0008E8C8 50E58899 ..Î]ùÒ..¡....Î]ùÊ-.£..¿$..ðu..:. 0000E0
 1926A398 01478A2E 430176CA 3C04728C 3C430A76 243C0472 133CF7E2 43431674 t.CCã¼<.r.<$v.C<¥r.<òv.C..G..È&. 000100
 88575602 EC83EC88 55C85DE5 8801FE4F 80260574 C308C08C 065EC4EC 885500C3 û.U.šő^..å.ût.&.O±..Î]ùU.š.š.VW. 000120
 05740018 E8157500 82E8184E A3127400 25E80875 00184E3E 831E73FF F1300646 F.=þ.s..>N..u.ÒX.t.ÈN.Ò..u.Ò..t. 000140
 5E880776 065E3900 F0BBCB5D E5885E5F 02C48311 C0154C9A 0676FF08 750078E8 Òx.u..v..L.å..ő._^.Î]ùEÞ.9^.v..^ 000160
 74FFFA83 08C48313 7B16F89A 5002B051 0E4F8D50 501EC033 FE5E89FE E3834306 .C.D±.^±3å.PP.O.Q¯.P.½.{..ő..°.t 000180
 89484800 08A3C033 D88EFE5E 8B0008A3 DA8E0574 D20B1B52 A31B5016 87C28B38 8.ô..P.ÈR..øt..ÖÈ...^±.Ä3âÈ..HH. 0001A0
 88C08ED8 8CC31FD8 8C0006A3 000D0500 0AA30147 800002A3 0000A300 0AB80C47 G.¡..È..È...G.È.....È...Ä.û.Ä.â. 0001C0
 76FF006A 0876FF00 6A560000 0AC8C3D9 8EC18CD2 08019AE8 18521E8E DB33064E N.3Ù..R.Ò...ø.ê.1ûà...Vj..v.j..v 0001E0

Dump of file SATURN:[PCCOMMON.DUMP.DLL]SIO.TMP;1 on 18-APR-1990 10:53:05.89
File ID (926,21,0)   End of file block 32 / Allocated 32

Virtual block number 16 (00000010), 512 (0200) bytes

 4813479A 56F8768B 902FEB99 C02B0674 FFFFC2F7 FA5689F8 4689142F 17F69A06 ..-./..F½.V°¼ô..t.+å.Š/..v½V.G.H 000000
 9007EB08 C48313A7 17AE9A50 FE76FF00 6A561274 D00BFE56 89FC4689 02C48314 ..ő..F▪.V±.Ât.Vj..v±P.Û.Ï..ő.Š.. 000020
 AEF2C033 F78B067E C4D98B27 E30E4E88 1E5657EC 885590CB C95EFE56 88FC4688 .F▪.V±^èù.U.šWV..N.D'.lő~..¼3ä·Ü 000040
 5E1FC18B D1F74949 04740477 FF453A26 C933FF44 8AA6F30A 76C5FE8B C803D9F7 ¼l.ù.±év.µÏ.D.3è&:E.w.t.ÌÌ¼Ì.ë.^ 000060
 750AF983 1374C00A 93FC071E 570A7EC5 1E08568B 0646880E 4E8800CB 5DE5885F _.Î]ù..N..F..V..é-.W..▪..åt..°.u 000080
 D38792F1 F793F1F7 0274C00B D23392F7 88DAF700 D283D8F7 AA2D800A 79D2080E ¯..øy.¯-¯¼Û.ø.¼Ö.¼.3ø.åt.¼þ.¼þ..Æ 0000A0
 8CF272C7 38014480 FF448805 86AC4F05 88E275C3 0BC28BAA 27040276 393C3004 .0<9v..'^.ô.ûuã..O¯...D..D.;úr·. 0000C0
 26FA5EC4 1CE8F628 FC5E8CFA 4689072C 88560000 06C800CB 5DE5885E 5F1F58DA ÖX._^.Î]ù.à...V¡,..F°.^▪+-Š.ő^°& 0000E0
 39191C16 88191AA1 0CFA4683 46017440 04C48314 14182A9A 53060E74 830A47F6 -G.¯t..S.*....ő.ât.F.F°.Å......9 000100
 56EC8855 CB5DE588 01FE4F80 0474D808 065E88EC 885590C8 C95EC68B D876FA46 F°vÅ.ő^èù.U.š.^..Ût..O±..Î]ùU.šV 000120
 46A31844 A3FE2440 24E899C0 33057501 76E80005 88071E29 75003F83 18448857 WED..?.u)..¡..Òv.u.3å.Šsaš±ÈD.ÈF 000140
 E5885E5F 0009E8C0 8ED88C06 4E8B1B4A 3689FFFE FE44C704 C6830001 04C7961B ..ú....ő.úD±±..őJ..N..Ä.âO.._^.Ì 000160
 1573C138 48437401 A8FE8BAD FC027788 F273EEF9 83FEE180 FA744100 D0E9CB5D ]ûÕÅ.At°.Ã±.°Ÿs·.w.▪Ù.±´.tCH;ês. 000180
 C128FE4C 89F9030C 74FE88E6 E8FE4489 F7880002 05C20335 7401A8AD F0030088 .Å.ÞÙ´.t5.ô....¼.D±Šl.±t..°.L±+è 0001A0
 C626C302 7F891852 1E8C2605 74D13811 1AB9DA8C C688FE4C FEF90305 E8058948 H..Š..°±L±.ő.Õ¿..;ìt.&..R....û&ő 0001C0
 01A8ADF0 03D088BC 73C13848 FE8BF274 01A8ADF0 03FE8825 74FFFE3D 02185606 .V..=±.t%.±.ÞÙ´.t·.±H;êsV.Å.ÞÙ´. 0001E0

Dump of file SATURN:[PCCOMMON.DUMP.DLL]SIO.TMP;1 on 18-APR-1990 10:53:05.89
File ID (926,21,0)   End of file block 32 / Allocated 32

Virtual block number 17 (00000011), 512 (0200) bytes

 12741B56 0EFE2615 EBD88E04 74C00808 4788E6EB FE4489F7 8B000205 C203E274 tã.ô....¼.D±Šl.G..ât..ÃŠ.&±.V.t. 000000
 01240074 C63B0068 E8C03306 778BBBEB 37881B4E 1E8E2605 74C73815 DFBFD88C .Ä¢Ô.;út.&..N..7ŠE.w.3åÒk.;ôt.$. 000020
 A3260474 C13B1633 89D88C98 EB4E4E96 0574001D E8FE4DFE 0074005F E8984040 ªª.Ò_.t.±M±Ò..t..NNŠ..Ä¿3.;èt.&È 000040
 18541638 267FFFBA 414149C8 28037401 A8FE4588 51C399C0 33024789 07881852 R....¯G.3ã.ÛQ.E±´.t.+âIAAq..&;.T. 000060
 75EAD102 F7087500 0CE8C628 C22302F7 0072C203 1572C603 C188F575 EAD10476 v.Ìõu¼.è.ór..ôr.¼ø#ô+ôÒ..u.¼øÌõu 000080
 4AD72BD6 88067789 FFFEFE44 C7F203F0 88FE8857 1874001D E85152C3 59C033E5 Ì3âYûRQÒ..t.W.±.Þ.·úD±±..w..ø+▪J 0000A0
 FFFA8308 C483151B 16F89A1F 06500001 88505252 1ED23350 53C35A59 58FE5589 .U±XYZûSP3ø.RRP¡..P...½....ő..°. 0000C0
 07754806 46880856 8802F88F 3875000A 7E830657 56EC8855 C3020802 745B5A1F .Z[t..øÛU.šVW..~..uB¢½..V..F.Hu. 0000E0
 8334735E 003EE856 0E468902 44880074 F7381174 4806F836 884CE827 720057E8 ÒW.r'ŠL.6½.Ht.;¼t..D..F.VÒ>.^s4. 000100
 0000FFFF 9A50C033 501652C4 885021E8 99FFFF88 06750208 047306F8 FE8104C6 ó..±½.s..øu.¡...ŠlP.őR.P3âP..... 000120
 39F78B0E 4E88C85D E5885E5F 07C03303 8806F836 89025C89 1489E675 C085F958 {°.âul...\..6½..Æ3å._^.Î]ù.N..¼9 000140
 1E390675 F73BC18E D3882672 1C030A88 2CE8F9F2 7506F8FE 8104C683 0C74024C L.t..ő..±½.u·°Š,.Ö..r&.Æ.ê;¼u.9. 000160
 885500C3 D1880487 9202F216 890475F7 38DE75C0 850000FF FF9A5153 137302F2 ·.▪.SQ......âuB;¼u..·.....Ìû.U. 000180
 8A0A4688 D128D187 D1030323 DB18D128 0C74DAF7 D788067E C45738E3 0C4E88EC š.N.D8Wő~..▪¼Öt.+Ì.ÛWÆ.Ì.Ì+Ì.F.. 0001A0
 46885FAA F3C913AB F3E9D1C3 8EFFFFC3 81C38C10 E30187AA F3C913AB F3E9D1E0 ÂÌÕµ¨.èµ^.ÌD..û.û...ûÌÕµ¨.èµ^_.F 0001C0
 08CA5DE5 88E3F706 46880875 0A5E88D8 080C5E88 08468BEC 8855CB5D 08568B06 ..V.]ùU.š.F..^..Ä.^.u..F.¼D.Î]ò. 0001E0
```

```
Dump of file SATURN:[PCCOMMON.DUMP.DLL]SIO.TMP;1 on 18-APR-1990 10:53:05.89
File ID (926,21,0)   End of file block 32 / Allocated 32

Virtual block number 18 (00000012), 512 (0200) bytes

 2B560000 04C80008 CA5DE58B D103E3F7 064688C8 030C66F7 064688C8 88E3F700 .%D.à.F.%f..à.F.%D.(.[]ò..à...V+ 000000
 F9F7000C B999072C 2DC38815 75080A47 F6265575 023C0324 0A478A26 065EC4F6 -á^.&.G.$.<.uU&-G..u..û-,..¿..%' 000020
 0877FF26 50287EC0 08FC4689 06472B26 07882606 5E883974 01132087 F6060868 kÀ.-. ..t9.^.&..&+G..F=.á-(P&.w. 000040
 200A4F80 26065EC4 0874FC46 3B08C483 16E80EA4 9A50E42A 0B478A26 0677FF26 &.w.&.G.*õP.Ê.Ò..á.;F=t.á^.&.O.  000060
 CBC95EC6 88000004 47C72602 57892607 89260857 88260647 8826065E C4FFFFBE ƒ..á^.&.G.&.W.&..&.W.&úG....ó^èù 000080
 00010FF0 01030007 0001112E 01030005 00011166 01030000 0003187E 0002000C ....~.......f...............Þ... 0000A0
 00011797 01030022 0001174C 01030088 000117E1 01050000 00051668 0002008A ....h.......Ã.......L...".......  0000C0
 00010CC9 0103005B 00010CDC 0103004D 000110B0 0103003A 00010E00 01030026 &...Å...:...¯...M...É...[...è... 0000E0
 54206E75 5220534D 00000000 00000000 00000000 00000000 00000000 0000005C \.......................MS Run-T 000100
 38383931 20296328 20746867 69727970 6F43202D 20797261 7262694C 20656069 ime Library - Copyright (c) 1988 000120
 00646569 6E654420 73736563 63410011 70726F43 2074666F 736F7263 694D202C , Microsoft Corp..Access Denied. 000140
 006C6C75 46206873 69440079 64616552 20746F4E 00656B61 4D20746F 6E6E6143 Cannot Make.Not Ready.Disk Full. 000160
 61766E49 00646E75 6F462074 6F4E2065 6C694600 64656B63 6F4C2065 76697244 Drive Locked.File Not Found.Inva 000180
 746F4E00 72657465 6D617261 50206469 6C61766E 49007373 65636341 2064696C lid Access.Invalid Parameter.Not 0001A0
 4620746F 4E206874 61500064 656C6961 46206E65 704F006B 73694420 736F4420  Dos Disk.Open Failed.Path Not F 0001C0
 61685300 64656465 65637845 20726566 66754220 676E6972 61685300 646E756F ound.Sharing Buffer Exceeded.Sha 0001E0

Dump of file SATURN:[PCCOMMON.DUMP.DLL]SIO.TMP;1 on 18-APR-1990 10:53:05.89
File ID (926,21,0)   End of file block 32 / Allocated 32

Virtual block number 19 (00000013), 512 (0200) bytes

 6C694620 6E65704F 20796E61 4D206F6F 54006E6F 6974616C 6F695620 676E6972 ring Violation.Too Many Open Fil 000000
 45005944 4145524C 415F5353 414C4352 52450064 25206E77 6F6E6B6E 55007365 es.Unknown %d.ERRCLASS_ALREADY.E 000020
 52524500 48545541 5F535341 4C435252 45005252 45505041 5F535341 4C435252 RRCLASS_APPERR.ERRCLASS_AUTH.ERR 000040
 4C435252 4500544E 41435F53 53414C43 52524500 54404644 41425F53 53414C43 CLASS_BADFMT.ERRCLASS_CANT.ERRCL 000060
 4C435252 45004E52 544E495F 5353414C 43525245 004C4941 46445248 5F535341 ASS_HRDFAIL.ERRCLASS_INTRN.ERRCL 000080
 414C4352 52450041 4944454D 5F535341 4C435252 45004445 4B434F4C 5F535341 ASS_LOCKED.ERRCLASS_MEDIA.ERRCLA 0000A0
 414C4352 52450053 45525455 4F5F5353 414C4352 52450044 4E46544F 4E5F5353 SS_NOTFND.ERRCLASS_OUTRES.ERRCLA 0000C0
 43525245 00544953 504D4554 5F535341 4C435252 45004C49 41465359 535F5353 SS_SYSFAIL.ERRCLASS_TEMPSIT.ERRC 0000E0
 42415F54 43415252 45004B4E 555F5353 414C4352 52450045 4D49545F 5353414C LASS_TIME.ERRCLASS_UNK.ERRACT_AB 000100
 0045524F 4E47495F 54434152 52450054 4552544E 495F5443 41525245 0054524F ORT.ERRACT_INTRET.ERRACT_IGNORE. 000120
 203A726F 72724500 52455355 5F544341 52524500 43494E41 505F5443 41525245 ERRACT_PANIC.ERRACT_USER.Error:  000140
 74636120 64657473 65676775 530A7325 203A7373 616C4320 726F7272 450A7325 %s.Error Class: %s.Suggested act 000160
 206E6920 6F695300 0A732520 3A495041 20746972 706C7543 0A732520 3A6E6F69 ion: %s.Culprit API: %s..Sio in  000180
 64616552 736F4400 65746972 57736F44 006E6570 4F736F44 00216E6F 69746341 Action!.DosOpen.DosWrite.DosRead 0001A0
 6F44006F 666E4953 4651736F 44007269 44684373 6F440065 736F6C43 736F4400 .DosClose.DosChDir.DosQFSInfo.Do 0001C0
 00000000 2320202B 00296C6C 756E2800 296C6C75 6E280000 72694472 75435173 sQCurDir..(null).(null).+- #.... 0001E0

Dump of file SATURN:[PCCOMMON.DUMP.DLL]SIO.TMP;1 on 18-APR-1990 10:53:05.89
File ID (926,21,0)   End of file block 32 / Allocated 32

Virtual block number 20 (00000014), 512 (0200) bytes

 00000000 00000000 00000000 00000000 00000000 1B6A1DE0 11491DE0 1DE00000 ..À.À.I.À.j..................... 000000
 00000000 00000000 00000000 00000000 00000000 00000000 00000000 00000000 ................................ 000020
 00000000 00000000 00000000 00000000 00000000 00000000 00000000 00000000 ................................ 000040
 00000000 00000000 00000000 00000000 00000000 00000000 00000000 00000000 ................................ 000060
 00000000 00000000 00000000 00000000 00000000 00000000 00000000 00000000 ................................ 000080
 00000000 00000000 00000000 00000000 00000000 00000000 00000000 00000000 ................................ 0000A0
 00000000 00000000 00000000 00000000 00000000 00000000 00000000 00000000 ................................ 0000C0
 00000000 00000000 00000000 00000000 00000000 00000000 00000000 00000000 ................................ 0000E0
 00000000 00000000 00000000 00000000 00000000 00000000 00000000 00000000 ................................ 000100
 00000000 00000000 00000000 00000000 00000000 00000000 00000000 00000000 ................................ 000120
 00000000 00000000 00000000 00000000 00000000 00000000 00000000 00000000 ................................ 000140
 00000000 00000000 00000000 00000000 00000000 00000000 00000000 00000000 ................................ 000160
 00000000 00000000 00000000 00000000 00000000 00000000 00000000 00000000 ................................ 000180
 00000000 00000000 00000000 00000000 00000000 00000000 00000000 00000000 ................................ 0001A0
 00000000 00000000 00000000 00000000 00000000 00000000 00000000 00000000 ................................ 0001C0
 00000000 00000000 00000000 00000000 00000000 00000000 00000000 00000000 ................................ 0001E0
```

```
Dump of file SATURN:[PCCOMMON.DUMP.DLL]SIO.TMP;1 on 18-APR-1990 10:53:05.89
File ID (926,21,0)    End of file block 32 / Allocated 32

Virtual block number 21 (00000015), 512 (0200) bytes

00000000 00000000 00000000 00000000 00000000 00000000 00000000 00000000 ................................ 000000
00000000 00000000 00000000 00000000 00000000 00000000 00000000 00000000 ................................ 000020
00000000 00000000 00000000 00000000 00000000 00000000 00000000 00000000 ................................ 000040
00000000 00000000 00000000 00000000 00000000 00000000 00000000 00000000 ................................ 000060
00000000 00000000 00000000 00000000 00000000 00000000 00000000 00000000 ................................ 000080
00000000 00000000 00000000 00000000 00000000 00000000 00000000 00000000 ................................ 0000A0
00000000 00000000 00000000 00000000 00000000 00000000 00000000 00000000 ................................ 0000C0
00000000 00000000 00000000 00000000 00000000 00000000 00000000 00000000 ................................ 0000E0
00000000 00000000 00000000 00000000 00000000 00000000 00000000 00000000 ................................ 000100
00000000 00000000 00000000 00000000 00000000 00000000 00000000 00000000 ................................ 000120
00000000 00000000 00000000 00000000 00000000 00000000 00000000 00000000 ................................ 000140
00000000 00000000 00000000 00000000 00000000 00000000 00000000 00000000 ................................ 000160
00000000 00000000 00000000 00000000 00000000 00000000 00000000 00000000 ................................ 000180
00000000 00000000 00000000 00000000 00000000 00000000 00000000 00000000 ................................ 0001A0
00000000 00000000 00000000 00000000 00000000 00000000 00000000 00000000 ................................ 0001C0
00000000 00000000 00000000 00000000 00000000 00000000 00000000 00000000 ................................ 0001E0

Dump of file SATURN:[PCCOMMON.DUMP.DLL]SIO.TMP;1 on 18-APR-1990 10:53:05.89
File ID (926,21,0)    End of file block 32 / Allocated 32

Virtual block number 22 (00000016), 512 (0200) bytes

FFFF1294 00000000 003D4F46 4E495F45 4C49465F 435F02F8 00000000 00000000 ........½._C_FILE_INFO=......... 000000
07340000 0200FFFF FFFF0101 00000000 071A1294 07161294 07121294 070E1294 ..............................4. 000020
02020000 00000000 00000000 01020000 00000000 00000000 0001FFFF 00000000 ................................ 000040
00000000 00000000 00000000 00000000 00000000 00000000 00000000 00000000 ................................ 000060
00000000 00000000 00000000 00000000 00000000 00000000 00000000 00000000 ................................ 000080
00000000 00000000 00000000 00000000 00000000 00000000 00000000 00000000 ................................ 0000A0
00000000 00000000 00000000 00000000 00000000 00000000 00000000 00000000 ................................ 0000C0
00000000 00000000 00000000 00000000 00000000 00000000 00000000 00000000 ................................ 0000E0
00000000 00000000 00000000 00000000 00000000 00000000 00000000 00000000 ................................ 000100
00000000 00000000 00000000 00000000 00000000 00000000 00000000 00000000 ................................ 000120
00000000 00000000 00000000 00000000 00000000 00000000 00000000 00000000 ................................ 000140
00000000 00000000 00000000 00000000 00000000 00000000 00000000 00000000 ................................ 000160
00000000 00000000 00000000 00000000 00000000 00000000 00000000 00000000 ................................ 000180
00000000 00000000 00000000 00000000 00000000 00000000 00000000 00000000 ................................ 0001A0
00000000 00000000 00000000 00000000 00000000 00000000 00000000 00000000 ................................ 0001C0
00000000 00000000 00000000 00000000 00000000 00000000 00000000 00000000 ................................ 0001E0

Dump of file SATURN:[PCCOMMON.DUMP.DLL]SIO.TMP;1 on 18-APR-1990 10:53:05.89
File ID (926,21,0)    End of file block 32 / Allocated 32

Virtual block number 23 (00000017), 512 (0200) bytes

00000000 00000000 00000000 00000000 00000000 00000000 00000000 00000000 ................................ 000000
00000000 00000000 00000000 00000000 00000000 00000000 00000000 00000000 ................................ 000020
00000000 00000000 00000000 00000000 00000000 00000000 00000000 00000000 ................................ 000040
00000000 00000000 00000000 00000000 00000000 00000000 00000000 00000000 ................................ 000060
00000000 00000000 00000000 00000000 00000000 00000000 00000000 00000000 ................................ 000080
00000000 00000000 00000000 00000000 00000000 00000000 00000000 00000000 ................................ 0000A0
00000000 00000000 00000000 00000000 00000000 00000000 00000000 00000000 ................................ 0000C0
00000000 00000000 00000000 00000000 00000000 00000000 00000000 00000000 ................................ 0000E0
00000000 00000000 00000000 00000000 00000000 00000000 00000000 00000000 ................................ 000100
00000000 00000000 00000000 00000000 00000000 00000000 00000000 00000000 ................................ 000120
00000000 00000000 00000000 00000000 00000000 00000000 00000000 00000000 ................................ 000140
00000000 00000000 00000000 00000000 00000000 00000000 00000000 00000000 ................................ 000160
00000000 00000000 00000000 00000000 00000000 00000000 00000000 00000000 ................................ 000180
00000000 00000000 00000000 00000000 00000000 00000000 00000000 00000000 ................................ 0001A0
00000000 00000000 00000000 00000000 00000000 00000000 00000000 00000000 ................................ 0001C0
00000000 00000000 00000000 00000000 00000000 00000000 00000000 00000000 ................................ 0001E0
```

```
Dump of file SATURN:[PCCOMMON.DUMP.DLL]SIO.TMP;1 on 18-APR-1990 10:53:05.89
File ID (926,21,0)   End of file block 32 / Allocated 32

Virtual block number 24 (00000018), 512 (0200) bytes

 00000000 00000000 00000000 00000000 00000000 00000000 00000000 00000000 ................................ 000000
 00000000 00000000 00000000 00000000 00000000 00000000 00000000 00000000 ................................ 000020
 00000000 00000000 00000000 00000000 00000000 00000000 00000000 00000000 ................................ 000040
 00000000 00000000 00000000 00000000 00000000 00000000 00000000 00000000 ................................ 000060
 00000000 00000000 00000000 00000000 00000000 00000000 00000000 00000000 ................................ 000080
 00000000 00000000 00000000 00000000 00000000 00000000 00000000 00000000 ................................ 0000A0
 00000000 00000000 00000000 00000000 00000000 00000000 00000000 00000000 ................................ 0000C0
 00000000 00000000 00000000 00000000 00000000 00000000 00000000 00000000 ................................ 0000E0
 00000000 00000000 00000000 00000000 00000000 00000000 00000000 00000000 ................................ 000100
 00000000 00000000 00000000 00000000 00000000 00000000 00000000 00000000 ................................ 000120
 00000000 00000000 00000000 00000000 00000000 00000000 00000000 00000000 ................................ 000140
 00000000 00000000 00000000 00000000 00000000 00000000 00000000 00000000 ................................ 000160
 00000000 00000000 00000000 00000000 00000000 00000000 00000000 00000000 ................................ 000180
 00000000 00000000 00000000 00000000 00000000 00000000 00000000 00000000 ................................ 0001A0
 00000000 00000000 00000000 00000000 00000000 00000000 00000000 00000000 ................................ 0001C0
 00000000 00000000 00000000 00000000 00000000 00000000 00000000 00000000 ................................ 0001E0

Dump of file SATURN:[PCCOMMON.DUMP.DLL]SIO.TMP;1 on 18-APR-1990 10:53:05.89
File ID (926,21,0)   End of file block 32 / Allocated 32

Virtual block number 25 (00000019), 512 (0200) bytes

 00000000 00000000 00000000 00000000 00000000 00000000 00000000 00000000 ................................ 000000
 00000000 00000000 00000000 00000000 00000000 00000000 00000000 00000000 ................................ 000020
 00000000 00000000 00000000 00000000 00000000 00000000 00000000 00000000 ................................ 000040
 00000000 00000000 00000000 00000000 00000000 00000000 00000000 00000000 ................................ 000060
 00000000 00000000 00000000 00000000 00000000 00000000 00000000 00000000 ................................ 000080
 00000000 00000000 00000000 00000000 00000000 00000000 00000000 00000000 ................................ 0000A0
 00000000 00000000 00000000 00000000 00000000 00000000 00000000 00000000 ................................ 0000C0
 00000000 00000000 00000000 00000000 00000000 00000000 00000000 00000000 ................................ 0000E0
 00000000 00000000 00000000 00000000 00000000 00000000 00000000 00000000 ................................ 000100
 00000000 00000000 00000000 00000000 00000000 00000000 00000000 00000000 ................................ 000120
 00000000 00000000 00000000 00000000 00000000 00000000 00000000 00000000 ................................ 000140
 00000000 00000000 00000000 00000000 00000000 00000000 00000000 00000000 ................................ 000160
 00000000 00000000 00000000 00000000 00000000 00000000 00000000 00000000 ................................ 000180
 00000000 00000000 00000000 00000000 00000000 00000000 00000000 00000000 ................................ 0001A0
 00000000 00000000 00000000 00000000 00000000 00000000 00000000 00000000 ................................ 0001C0
 00000000 00000000 00000000 00000000 00000000 00000000 00000000 00000000 ................................ 0001E0

Dump of file SATURN:[PCCOMMON.DUMP.DLL]SIO.TMP;1 on 18-APR-1990 10:53:05.89
File ID (926,21,0)   End of file block 32 / Allocated 32

Virtual block number 26 (0000001A), 512 (0200) bytes

 00000000 00000000 00000000 00000000 00000000 00000000 00000000 00000000 ................................ 000000
 00000000 00000000 00000000 00000000 00000000 00000000 00000000 00000000 ................................ 000020
 00000000 00000000 00000000 00000000 00000000 00000000 00000000 00000000 ................................ 000040
 00000000 00000000 00000000 00000000 00000000 00000000 00000000 00000000 ................................ 000060
 00000000 00000000 00000000 00000000 00000000 00000000 00000000 00000000 ................................ 000080
 00000000 00000000 00000000 00000000 00000000 00000000 00000000 00000000 ................................ 0000A0
 00000000 00000000 00000000 00000000 00000000 00000000 00000000 00000000 ................................ 0000C0
 00000000 00000000 00000000 00000000 00000000 00000000 00000000 00000000 ................................ 0000E0
 00000000 00000000 00000000 00000000 00000000 00000000 00000000 00000000 ................................ 000100
 00000000 00000000 00000000 00000000 00000000 00000000 00000000 00000000 ................................ 000120
 00000000 00000000 00000000 00000000 00000000 00000000 00000000 00000000 ................................ 000140
 00000000 00000000 00000000 00000000 00000000 00000000 00000000 00000000 ................................ 000160
 00000000 00000000 00000000 00000000 00000000 00000000 00000000 00000000 ................................ 000180
 00000000 00000000 00000000 00000000 00000000 00000000 00000000 00000000 ................................ 0001A0
 00000000 00000000 00000000 00000000 00000000 00000000 00000000 00000000 ................................ 0001C0
 00000000 00000000 00000000 00000000 00000000 00000000 00000000 00000000 ................................ 0001E0
```

```
Dump of file SATURN:[PCCOMMON.DUMP.DLL]SIO.TMP;1 on 18-APR-1990 10:53:05.89
File ID (926,21,0)   End of file block 32 / Allocated 32

Virtual block number 27 (0000001B), 512 (0200) bytes

00000000 00000000 00000000 00000000 00000000 00000000 00000000 00000000 ................................ 000000
00000000 00000000 00000000 00000000 00000000 00000000 00000000 00000000 ................................ 000020
00000000 00000000 00000000 00000000 00000000 00000000 00000000 00000000 ................................ 000040
00000000 00000000 00000000 00000000 00000000 00000000 00000000 00000000 ................................ 000060
00000000 00000000 00000000 00000000 00000000 00000000 00000000 00000000 ................................ 000080
00000000 00000000 00000000 00000000 00000000 00000000 00000000 00000000 ................................ 0000A0
00000000 00000000 00000000 00000000 00000000 00000000 00000000 00000000 ................................ 0000C0
00000000 00000000 00000000 00000000 00000000 00000000 00000000 00000000 ................................ 0000E0
00000000 00000000 00000000 00000000 00000000 00000000 00000000 00000000 ................................ 000100
00000000 00000000 00000000 00000000 00000000 00000000 00000000 00000000 ................................ 000120
00000000 00000000 00000000 00000000 00000000 00000000 00000000 00000000 ................................ 000140
00000000 00000000 00000000 00000000 00000000 00000000 00000000 00000000 ................................ 000160
00000000 00000000 00000000 00000000 00000000 00000000 00000000 00000000 ................................ 000180
00000000 00000000 00000000 00000000 00000000 00000000 00000000 00000000 ................................ 0001A0
00000000 00000000 00000000 00000000 00000000 00000000 00000000 00000000 ................................ 0001C0
00000000 00000000 00000000 00000000 00000000 00000000 00000000 00000000 ................................ 0001E0

Dump of file SATURN:[PCCOMMON.DUMP.DLL]SIO.TMP;1 on 18-APR-1990 10:53:05.89
File ID (926,21,0)   End of file block 32 / Allocated 32

Virtual block number 28 (0000001C), 512 (0200) bytes

00000000 00000000 00000000 00000000 00000000 00000000 00000000 00000000 ................................ 000000
00000000 00000000 00000000 02000001 00000000 00000000 00000000 00000000 ................................ 000020
00000000 00000000 00000000 00000000 00000000 00000000 00000000 00000000 ................................ 000040
00000000 00000000 00000000 00000000 00000000 00000000 00000000 00000000 ................................ 000060
00000000 00000000 00000000 00000000 00000000 00000000 00000000 00000000 ................................ 000080
00000000 00000000 00000000 00000000 00000000 00000000 00000000 00000000 ................................ 0000A0
00000000 00000000 00000000 00000000 00000000 00000000 00000000 00000000 ................................ 0000C0
00000000 00000000 00000000 00000000 00000000 00000000 00000000 00000000 ................................ 0000E0
00000000 00000000 00000000 00000000 00000000 00000000 00000000 00000000 ................................ 000100
00000000 00000000 00000000 00000000 00000000 00000000 00000000 00000000 ................................ 000120
00000000 00000000 00000000 00000000 00000000 00000000 00000000 00000000 ................................ 000140
00000000 00000000 00000000 00000000 00000000 00000000 00000000 00000000 ................................ 000160
00000000 00000000 00000000 00000000 00000000 00000000 00000000 00000000 ................................ 000180
00000000 00000000 00000000 00000000 00000000 00000000 00000000 00000000 ................................ 0001A0
00000000 00000000 00000000 00000000 00000000 00000000 00000000 00000000 ................................ 0001C0
00000000 00000000 00000000 00000000 00000000 00000000 00000000 00000000 ................................ 0001E0

Dump of file SATURN:[PCCOMMON.DUMP.DLL]SIO.TMP;1 on 18-APR-1990 10:53:05.89
File ID (926,21,0)   End of file block 32 / Allocated 32

Virtual block number 29 (0000001D), 512 (0200) bytes

00000000 00000000 00000000 00000000 00000000 00000000 00000000 00000000 ................................ 000000
00000000 00000000 00000000 00000000 00000000 00000000 00000000 00000000 ................................ 000020
00000000 00000000 00000000 00000000 00000000 00000000 00000000 00000000 ................................ 000040
00000000 00000000 00000000 00000000 00000000 00000000 00000000 00000000 ................................ 000060
00000000 00000000 00000000 00000000 00000000 00000000 00000000 00000000 ................................ 000080
00000000 00000000 00000000 00000000 00000000 00000000 00000000 00000000 ................................ 0000A0
00000000 00000000 00000000 00000000 00000000 00000000 00000000 00000000 ................................ 0000C0
00000000 00000000 00000000 00000000 00000000 00000000 00000000 00000000 ................................ 0000E0
00000000 00000000 00000000 00000000 00000000 00000000 00000000 00000000 ................................ 000100
00000000 00000000 00000000 00000000 00000000 00000000 00000000 00000000 ................................ 000120
00000000 00000000 00000000 00000000 00000000 00000000 00000000 00000000 ................................ 000140
00000000 00000000 00000000 00000000 00000000 00000000 00000000 00000000 ................................ 000160
00000000 00000000 00000000 00000000 00000000 00000000 00000000 00000000 ................................ 000180
00000000 00000000 00000000 00000000 00000000 00000000 00000000 00000000 ................................ 0001A0
00000000 00000000 00000000 00000000 00000000 00000000 00000000 00000000 ................................ 0001C0
00000000 00000000 00000000 00000000 00000000 00000000 00000000 00000000 ................................ 0001E0
```

```
Dump of file SATURN:[PCCOMMON.DUMP.DLL]SIO.TMP;1 on 18-APR-1990 10:53:05.89
File ID (926,21,0)   End of file block 32 / Allocated 32

Virtual block number 30 (0000001E), 512 (0200) bytes

 00000000 00000000 00000000 00000000 00000000 00000000 00000000 00000000 ................................ 000000
 00000000 00000000 00000000 00000000 00000000 00000000 00000000 00000000 ................................ 000020
 00000000 00000000 00000000 00000000 00000000 00000000 00000000 00000000 ................................ 000040
 00000000 00000000 00000000 00000000 00000000 00000000 00000000 00000000 ................................ 000060
 00000000 00000000 00000000 00000000 00000000 00000000 00000000 00000000 ................................ 000080
 00000000 00000000 00000000 00000000 00000000 00000000 00000000 00000000 ................................ 0000A0
 00000000 00000000 00000000 00000000 00000000 00000000 00000000 00000000 ................................ 0000C0
 00000000 00000000 00000000 00000000 00000000 00000000 00000000 00000000 ................................ 0000E0
 00000000 00000000 00000000 00000000 00000000 00000000 00000000 00000000 ................................ 000100
 00000000 00000000 00000000 00000000 00000000 00000000 00000000 00000000 ................................ 000120
 00000000 00000000 00000000 00000000 00000000 00000000 00000000 00000000 ................................ 000140
 00000000 00000000 00000000 00000000 00000000 00000000 00000000 00000000 ................................ 000160
 00000000 00000000 00000000 00000000 00000000 00000000 00000000 00000000 ................................ 000180
 00000000 00000000 00000000 00000000 00000000 00000000 00000000 00000000 ................................ 0001A0
 00000000 00000000 00000000 00000000 00000000 00000000 00000000 00000000 ................................ 0001C0
 00000000 00000000 00000000 00000000 00000000 00000000 00000000 00000000 ................................ 0001E0

Dump of file SATURN:[PCCOMMON.DUMP.DLL]SIO.TMP;1 on 18-APR-1990 10:53:05.89
File ID (926,21,0)   End of file block 32 / Allocated 32

Virtual block number 31 (0000001F), 512 (0200) bytes

 00000000 00000000 00000000 00000000 00000000 00000000 00000000 00000000 ................................ 000000
 00000001 00000000 00000000 00000000 000002FA 13140000 00000000 00000000 ............*................... 000020
 00000000 00000000 00000000 00000000 00000000 00000000 00000000 81818101 ................................ 000040
 00000000 00000000 00000000 00000000 00000000 00000000 00000000 00000000 ................................ 000060
 00000000 00000000 00000000 00000000 00000000 00000000 00000000 00000000 ................................ 000080
 00000000 00000000 00000000 00000000 00000000 00000000 00000000 00000000 ................................ 0000A0
 00000000 00000000 00000000 00000000 00000000 00000000 00000000 00000000 ................................ 0000C0
 00000000 00000000 00000000 00000000 00000000 00000000 00000000 00000000 ................................ 0000E0
 00000000 00000000 00000000 00000000 00000000 00000000 00000000 00000000 ................................ 000100
 00000000 00000000 00000000 00000000 00000000 00000000 00000000 00000000 ................................ 000120
 0A0A0A0A 0A0A0A0A 0A0A0A0A 0A0A0A0A 0A0A0A0A 0A0A0A0A 0A0A0A0A 0A0A0A00 ................................ 000140
 0A0A0A0A 0A0A0A0A 0A0A0A0A 0A0A0A0A 0A0A0A0A 0A0A0A0A 0A0A0A0A 0A0A0A0A ................................ 000160
 0A0A0A0A 0A0A0A0A 0A0A0A0A 0A0A0A0A 0A0A0A0A 0A0A0A0A 0A0A0A0A 0A0A0A0A ................................ 000180
 0A0A0A0A 0A0A0A0A 0A0A0A0A 0A0A0A0A 0A0A0A0A 0A0A0A0A 0A0A0A0A 0A0A0A0A ................................ 0001A0
 0A0A0A0A 0A0A0A0A 0A0A0A0A 0A0A0A0A 0A0A0A0A 0A0A0A0A 0A0A0A0A 0A0A0A0A ................................ 0001C0
 0A0A0A0A 0A0A0A0A 0A0A0A0A 0A0A0A0A 0A0A0A0A 0A0A0A0A 0A0A0A0A 0A0A0A0A ................................ 0001E0

Dump of file SATURN:[PCCOMMON.DUMP.DLL]SIO.TMP;1 on 18-APR-1990 10:53:05.89
File ID (926,21,0)   End of file block 32 / Allocated 32

Virtual block number 32 (00000020), 512 (0200) bytes

 0A0A0A0A 0A0A0A0A 0A0A0A0A 0A0A0A0A 0A0A0A0A 0A0A0A0A 0A0A0A0A 0A0A0A0A ................................ 000000
 0A0A0A0A 0A0A0A0A 0A0A0A0A 0A0A0A0A 0A0A0A0A 0A0A0A0A 0A0A0A0A 0A0A0A0A ................................ 000020
 00000000 00000000 00000000 00000000 00000000 00000000 00000000 0000000A ................................ 000040
 4D4E3C3C FFFF071E 14FA0000 00000000 00000000 00000000 00002000 00000000 ..... ................*.....<<NM 000060
 000A0D77 6F6C6672 65766F20 68636174 73202D0A 0D303030 36520000 3E3E4753 SG>>..R6000..- stack overflow... 000080
 0A0D3020 79622065 64697669 64207265 6765746E 69202D0A 0D333030 36520003 ..R6003..- integer divide by 0.. 0000A0
 726F6620 65636170 73206867 756F6E65 20746F6E 202D0A0D 38303036 52000800 ...R6008..- not enough space for 0000C0
 756F6E65 20746F6E 202D0A0D 39303036 52000900 0A0D7374 6E656D75 67726120  arguments.....R6009..- not enou 0000E0
 000A0D00 FC000A0D 746E656D 6E6F7269 766E6520 726F6620 65636170 73206867 gh space for environment...*.... 000100
 6F6C6620 2D0A0D32 30303652 00020020 726F7272 6520656D 6974206E 757200FF ..run-time error ...R6002..- flo 000120
 00020003 FFFFFF00 0A0D6465 64616F6C 20746F6E 20746E69 6F702067 6E697461 ating point not loaded.......... 000140
 00000000 00000000 00000000 0005191C 00020000 0004072E 00020000 00031B68 h............................... 000160
 00000000 00000000 00000000 00000000 00000000 00000000 00000000 00000000 ................................ 000180
 00000000 00000000 00000000 00000000 00000000 00000000 00000000 00000000 ................................ 0001A0
 00000000 00000000 00000000 00000000 00000000 00000000 00000000 00000000 ................................ 0001C0
 00000000 00000000 00000000 00000000 00000000 00000000 00000000 00000000 ................................ 0001E0
```

```
Dump of file SATURN:[PCCOMMON.DUMP.DLL]SME.TMP;1 on 18-APR-1990 10:53:10.83
File ID (927,24,0)   End of file block 3 / Allocated 4

Virtual block number 1 (00000001), 512 (0200) bytes

00000000 00000040 00000000 00000088 0000FFFF 00000004 00000003 00BC5A4D MZ¥.............|.......a....... 000000
00000080 00000000 00000000 00000000 00000000 00000000 00000000 00000000 ................................ 000020
6F6E6E61 63206061 72676F72 70207369 685421CD 4C01B821 CD098400 0EBA1F0E ..¤..Ç.ë!|.LëiThis program canno 000040
00000000 00000024 0A0D002E 65646F6D 20534F44 206E6920 6E757220 65622074 t be run in DOS mode....$....... 000060
00010002 00000000 00000000 00000000 00028009 22394E18 00000098 0505454E NE.......N9".................... 000080
00000000 00000000 00010000 00040000 00000125 00850083 00500050 00400008 ..a.P.P.....%................... 0000A0
49534E41 5254454D 530A0000 454D5303 00020E21 00000000 03720F00 03720013 ..r...r.....!....SME...SMETRANSI 0000C0
544E4556 45444C49 5542454D 53000002 544E4556 45454B41 4D454D53 0C000154 T...SMEMAKEEVENT...SMEBUILDEVENT 0000E0
00000301 9E030103 4B434F4C 42434F4C 4C414D45 4D004D45 4D030000 01000003 .......MEM.MEMALLOCBLOCK........ 000100
6A0A76FF D88EFFFF B81E5657 000000C8 0000004C 4C442E65 6D730700 00002803 .+....sme.DLL...à...WV.|...Ä.v.j 000120
57000000 C80006CA C95F5E1F 0000E900 00B80000 FFFF9A06 76FF0876 FF0E6A01 .j..v..v.......|..Õ...^_èò..à...W 000140
57892602 47892614 56881246 88065EC4 07892616 46880 65E C4D88E00 08881E56 V.|...Äé^..F.&..é^..F.^V.&.G.&.W 000160
89260C56 880A468B 065EC408 4789260E 4688065E C4064789 26104688 065EC404 .é^..F.&.G.é^..F.&.G.é^..F..V.&. 000180
C4D88E00 33881E56 5700000A C80012CA C95F5E1F 0000E900 00880C57 89260A47 G.&.W.|..Õ...^_èò..à...WV.|3..Äé 0001A0
0003E900 00FA46C7 00F1E900 02880006 E9037408 46080646 8BFFFF07 C7260E5E ^.&ú....F..F.t.Õ..|..Õþ.úF³..Õ.. 0001C0
0676C40C FA5E6807 88260A5E C4000DE9 0375FF38 83260676 C40CFA5E 6BFA46FF .F³k^³.év.&.8.u.ÕÄ.é^.&..k^³.év. 0001E0

Dump of file SATURN:[PCCOMMON.DUMP.DLL]SME.TMP;1 on 18-APR-1990 10:53:10.83
File ID (927,24,0)   End of file block 3 / Allocated 4

Virtual block number 2 (00000002), 512 (0200) bytes

FC4688FE 5689FC46 89045088 2602408B 26065EC4 0CFA766B 0088E903 74003926 &9.t.Õ|.kv³.é^.&.a.&.P..F=.V±.F= 000000
5EC40277 FF260477 FF260A5E C4008DE9 0375FE46 0BFC4688 003AE903 75FE4608 .F±u.Õ:..F=.F±u.Õ..é^.&.w.&.w.é^ 000020
E9037500 003DFC5E FF0A77FF 260C77FF 260A5EC4 0877FF26 0A5EC406 77FF260A .&.w.é^.&.w.é^.&.w.&.w..^==..u.Õ 000040
E90375F8 460BF646 8BF85689 F6468908 50882606 40882606 5EC40CFA 7668005E ^.kv³.é^.&.a.&.P..F-.V½.F-.F½u.Õ 000060
FF260A5E C40877FF 260A5EC4 0677FF26 0A5EC402 77FF2604 77FF260A 5EC40027 '.é^.&.w.&.w.é^.&.w.é^.&.w.é^.&. 000080
0009E900 01880789 260E5EC4 0A408826 065EC40C FA7668F6 5EFF0A77 FF260C77 w.&.w..^-kv³.é^.&.a.é^.&..|..Õ.. 0000A0
1056880E 4688088E 0088881E 56570000 16C8C8C9 5F5E1F00 00E90002 88FF1DE9 Õ..|..Õ...^_èùà...WV.|...Ä.F..V. 0000C0
46890450 88260240 88260A5E C406F476 6BF44689 07882606 5EC4FA56 89F84689 .F½.V³é^.&.._F¶kv¶.é^.&.a.&.P..F 0000E0
83024A00 839A0877 FF260A77 FF26EE5E C4F876FF FA76FF50 16F6468D F05689EE Ÿ.Vþ.F-.P.v³.v½é^Ÿ&.w.&.w.....J.. 000100
6826EE5E C4006CE9 0375FF02 7F8326EE 5EC40079 E9037402 F27E83F2 46890CC4 &..F·.~·.t.Õy.é^Ÿ&....u.Õl.é^Ÿ&k 000120
46E90375 FF027F83 26EA5EC4 EC5689EA 46890450 88260240 88260A5E C4060277 w..é^.&.a.&.P..FÕ.V±é^Õ&....u.ÕF 000140
830CC483 02CC0083 9A0877FF 260A77FF 26EA5EC4 F876FFFA 76FF5016 F6468D00 ..F-.P.v³.v½é^Õ&.w.&.w....ë..é.. 000160
46890450 88260240 88260A5E C4060277 6826EA5E C4001CE9 0003E903 75FFF67E —.u.Õ..Õ..é^Õ&kw..é^.&.a.&.P..F 000180
8BF4468B F44689F6 468800E4 E90002B8 0006E903 74FFF67E 83FFADE9 EC5689EA Õ.VšÕÙ..—.t.Õ..|..ÕÕ..F-.F¶.F¶. 0001A0
8D005CE9 0374003F 8326FC5E C4FE5689 FC46890C 56880A46 03E001C1 03E001C8 àlÁ.ëlÁ.F..V..F=.V±é^=&.7.t.Õ\.. 0001C0
C483FFFF 00839A04 77FF2606 77FF2602 5FC426FC 5EC4F876 FFFA76FF 5016F646 F-.P.v³.v½é^=&é_.&.w.&.w.......é 0001E0

Dump of file SATURN:[PCCOMMON.DUMP.DLL]SME.TMP;1 on 18-APR-1990 10:53:10.83
File ID (927,24,0)   End of file block 3 / Allocated 4

Virtual block number 3 (00000003), 512 (0200) bytes

46890C47 8826025F C426FC5E C40008E9 F6468800 06E90375 FFF67E83 F246890C ..F·.—.u.Õ...F-Õ..é^=&é_.&.G..F 000000
C406F476 6BFF98E9 FE5689FC 46890C56 880A4603 E001C103 E001C88B F44688F4 ¶.F¶.àlÁ.ëlÁ.F..V...F=.V±Õ..kv¶.é 000020
002BE903 7506470B 26044788 26EE5EC4 E05689EE 46890450 88260240 88260A5E ^.&.a.&.P..FŸ.Vþé^Ÿ&.G.&.G.u.Õ+. 000040
0C77FF26 F85EC408 77FF26F8 5EC40677 FF26F85E C40277FF 260477FF 26F85EC4 é^Ÿ&.w.&.w.é^Ÿ&.w.é^Ÿ&.w.é^Ÿ&.w. 000060
0CCAC95F 5E1F0000 E90001B8 078926F4 4688065E C4045FFF 26EE5EC4 0A77FF26 &.w.é^Ÿ&._.é^..F¶&..|..Õ...`_èò. 000080
00000000 00050001 001A0203 00000002 01A60002 00000001 01E00002 00039000 .......Ù.......|................ 0000A0
00000000 00000000 00000000 00000000 00000000 00000000 00000000 00000000 ................................ 0000C0
00000000 00000000 00000000 00000000 00000000 00000000 00000000 00000000 ................................ 0000E0
00000000 00000000 00000000 00000000 00000000 00000000 00000000 00000000 ................................ 000100
00000000 00000000 00000000 00000000 00000000 00000000 00000000 00000000 ................................ 000120
00000000 00000000 00000000 00000000 00000000 00000000 00000000 00000000 ................................ 000140
00000000 00000000 00000000 00000000 00000000 00000000 00000000 00000000 ................................ 000160
00000000 00000000 00000000 00000000 00000000 00000000 00000000 00000000 ................................ 000180
00000000 00000000 00000000 00000000 00000000 00000000 00000000 00000000 ................................ 0001A0
00000000 00000000 00000000 00000000 00000000 00000000 00000000 00000000 ................................ 0001C0
00000000 00000000 00000000 00000000 00000000 00000000 00000000 00000000 ................................ 0001E0
```

```
Dump of file SATURN:[PCCOMMON.DUMP.DLL]DAENTDF.TMP;1 on 18-APR-1990 10:40:49.05
File ID (561,28,0)   End of file block 116 / Allocated 116

Virtual block number 1 (00000001), 512 (0200) bytes

 00000000 00000040 00000000 000000B8 0000FFFF 00000004 00000067 00045A4D MZÅ.g...........¡.......ə....... 000000
 00000080 00000000 00000000 00000000 00000000 00000000 00000000 00000000 ................................ 000020
 6F6E6E61 63206061 72676F72 70207369 685421CD 4C01B821 CD09B400 0EBA1F0E ..¤..Ç.ë!¡.LëIThis program canno 000040
 00000000 00000024 0A0D0D2E 65646F60 20534F44 206E6920 6E757220 65622074 t be run in DOS mode....$....... 000060
 000C000E 00000000 00050000 00000000 00078009 E4420978 00070871 0505454E NE..g...x.Bõ.................... 000080
 00000000 00000000 00010006 00040000 000008F8 00EB0003 00C80080 0040002E ..ə.¨.à.Æ.$.%................... 0000A0
 260A0F00 260A0A18 095E0F00 095E0971 0A7E0F00 0A7D08B7 7CA80F00 7CA70093 ..Ï|..´|ñ.)...~.q.^...^....&...& 0000C0
 01980E21 00000000 02400F21 023A0CAD 01180E00 01180C9B 000F0F00 000F0C99 ...............Ü.:.Ï.ə.....!... 0000E0
 0F7A1EB1 0F7A0D22 01091EF1 01090011 02BF1EF1 02BF0CE5 011E1EF1 011E0CD3 Æ...þ...Ï.є.þ.є.....þ...".z.Ÿ.z. 000100
 00640004 00040005 00030005 00020005 02141EB1 02140E51 03651EB1 03650E1A ..e.Ÿ.e.Q...Ÿ.................d. 000120
 8D038E03 A5026E00 43000700 01000000 4644544E 45414407 03800004 03810004 .........DAENTDF.......C.n.Ê.ƒ.. 000140
 45544145 52434045 4D004045 4D034E49 574D5005 00077106 ED069F06 7104AA04 .¨.q...Ú.q...PMWIN.MEM.MEMCREATE 000160
 434F4C42 434F4C4C 414D454D 00504145 48594F52 54534544 4D454D0E 50414548 HEAP.MEMDESTROYHEAP.MEMALLOCBLOC 000180
 45544944 44415453 494C4D46 440E4D46 44034B43 4F4C4245 4552464D 454D0C48 K.MEMFREEBLOCK.DFM.DFMLISTADDITE 0001A0
 494C4D46 44124445 5443454C 45534D45 54495952 45555154 53494C40 4644184D M.DFMLISTQUERYITEMSELECTED.DFMLI 0001C0
 4D464415 4D524F46 53534543 4F52504D 46440E4D 45544945 43414C50 45525453 STREPLACEITEM.DFMPROCESSFORM.DFM 0001E0

Dump of file SATURN:[PCCOMMON.DUMP.DLL]DAENTDF.TMP;1 on 18-APR-1990 10:40:49.05
File ID (561,28,0)   End of file block 116 / Allocated 116

Virtual block number 2 (00000002), 512 (0200) bytes

 41454842 48595245 55514D46 440E4154 41445245 5355444C 45494659 52455551 QUERYFIELDUSERDATA.DFMQUERYHBHEA 000000
 46440F4D 54485952 4555514D 4644084A 424F4C4D 44485952 4555514D 46440F50 P.DFMQUERYHDMLOBJ.DFMQUERYHTM.DF 000020
 55544154 53544649 48535952 4555514D 46441347 4C44444E 57485952 4555514D MQUERYHWNDDLG.DFMQUERYSHIFTSTATU 000040
 10415441 44524553 55595245 55514D46 44104C4F 4F545952 4555514D 46440C53 S.DFMQUERYTOOL.DFMQUERYUSERDATA. 000060
 440F4E46 45534F4C 43544553 4D46440D 444C4549 46524554 53494745 524D4644 DFMREGISTERFIELD.DFMSETCLOSEFN.D 000080
 44104E46 4C4F5254 4E4F4354 45534D46 440F4E46 444E414D 4D4F4354 45534D46 FMSETCOMMANDFN.DFMSETCONTROLFN.D 0000A0
 44104E46 59464954 4F4E5445 534D4644 0E4E4645 54414749 56414E54 45534D46 FMSETNAVIGATEFN.DFMSETNOTIFYFN.D 0000C0
 44134154 41445245 53555445 534D4644 0E4E4653 4752414C 4F4F5454 45534D46 FMSETTOOLARGSFN.DFMSETUSERDATA.D 0000E0
 45544944 44415453 454E4D46 440E4D52 4F46474E 4F4C4554 41474956 414E4D46 FMNAVIGATELONGFORM.DFMNESTADDITE 000100
 45454B41 4D545345 4E4D4644 144D4554 49455445 4C454454 53454E4D 4644114D M.DFMNESTDELETEITEM.DFMNESTMAKEE 000120
 4F52504D 4644194D 45544959 52455551 5453454E 4D464410 50554F52 47544944 DITGROUP.DFMNESTQUERYITEM.DFMPRO 000140
 494C5353 45434F52 504D4644 194C4F52 544E4F43 54494445 5453494C 53534543 CESSLISTEDITCONTROL.DFMPROCESSLI 000160
 54494445 5453454E 53534543 4F52504D 46441944 4E414D4D 4F435449 44455453 STEDITCOMMAND.DFMPROCESSNESTEDIT 000180
 4E414D4D 4F435449 44455453 454E5353 45434F52 504D4644 194C4F52 544E4F43 CONTROL.DFMPROCESSNESTEDITCOMMAN 0001A0
 4144106D 61640344 45544345 4C455358 4F425453 494C5952 4555514D 46441744 D.DFMQUERYLISTBOXSELECTED.dam.DA 0001C0
 434D4144 15544E45 45544145 52434D41 440C454D 414E5443 454A424F 5445474D MGETOBJECTNAME.DAMCREATEENT.DAMC 0001E0

Dump of file SATURN:[PCCOMMON.DUMP.DLL]DAENTDF.TMP;1 on 18-APR-1990 10:40:49.05
File ID (561,28,0)   End of file block 116 / Allocated 116

Virtual block number 3 (00000003), 512 (0200) bytes

 0F525454 41455441 4552434D 41440D50 4948534E 4F495441 4C455245 54414552 REATERELATIONSHIP.DAMCREATEATTR. 000000
 4D41440B 59454B45 54414552 434D4144 0C535254 54415443 454E4E4F 434D4144 DAMCONNEÇTATTRS.DAMCREATEKEY.DAM 000020
 454C4544 4D414413 5443454A 424F5055 4B4F4F4C 4D41440F 5453494C 45455246 FREELIST.DAMLOOKUPOBJECT.DAMDELE 000040
 45444D41 440C5254 54414554 454C4544 4D41440D 52545441 44455241 48534554 TESHAREDATTR.DAMDELETEATTR.DAMDE 000060
 41455243 4D41440D 54434A52 54544145 54454C45 444D4144 1059454B 4554454C LETEKEY.DAMDELETEATTRJCT.DAMCREA 000080
 55514D41 44155352 5454414C 4C41544E 45595245 55514D41 44134854 454D4554 TEMETH.DAMQUERYENTALLATTRS.DAMQU 0000A0
 440D4B4F 5F544553 5059454B 4D41440D 53525454 414B464C 4C41544E 45595245 ERYENTALLFKATTRS.DAMKEYPSET_OK.D 0000C0
 5252454D 41444E4F 4E59414C 50534944 4D414413 4B4F5F52 54544159 454B4D41 AMKEYATTR_OK.DAMDISPLAYNONDĀMERR 0000E0
 414E5455 4C414E41 1154554C 414E4106 52524559 4E415441 4D524F46 4D41440F .DAMFORMATANYERR.ANALUT.ANALUTNA 000100
 4F54534C 4D440A4E 58545452 4154534C 4D44086C 6D640345 5241504D 4F43454D MECOMPARE.dml.DMLSTARTTXN.DMLSTO 000120
 52455551 4C4D440B 454C444E 41484C45 444F4D59 52455551 4C4D4413 4E585450 PTXN.DMLQUERYMODELHANDLE.DMLQUER 000140
 444C4549 46595245 55514C4D 4400544E 554F4359 52455551 4C4D4400 49544759 YGTI.DMLQUERYCOUNT.DMLQUERYFIELD 000160
 4555514C 4D440B54 4553454C 504D4953 4C4D440C 444C4549 46544553 4C4D440B .DMLSETFIELD.DMLSIMPLESET.DMLQUE 000180
 4C4D440B 4554414C 45524C4D 4409314E 4C525952 4555514C 4D440C4E 4C525952 RYRLN.DMLQUERYRLN1.DMLRELATE.DML 0001A0
 5854504F 54534C4D 44124449 4C4D4459 52455551 4C4D440D 5453494C 45455246 FREELIST.DMLQUERYDMLID.DMLSTOPTX 0001C0
 4416736C 6E616405 4C4C4154 43454C45 5345444C 4D440E4B 4341424C 4C4F524E NROLLBACK.DMLDESELECTALL.danls.D 0001E0
```

```
Dump of file SATURN:[PCCOMMON.DUMP.DLL]DAENTDF.TMP;1 on 18-APR-1990 10:40:49.05
File ID (561,28,0)   End of file block 116 / Allocated 116

Virtual block number 4 (00000004), 512 (0200) bytes

 4E535509 4D524F46 41440645 4D414E59 4259414C 50534944 54524F53 534C4E41 ANLSSORTDISPLAYBYNAME.DAFORM.USN 000000
 5F54494E 495F4644 0E525245 4D454D59 414C5053 49444D41 44105052 45424D55 UMBERP.DAMDISPLAYMEMERR.DF_INIT_ 000020
 5F54494E 495F4644 0D54524F 4853555F 45544144 50555F46 44105452 4F485355 USHORT.DF_UPDATE_USHORT.DF_INIT_ 000040
 54494E49 4D524F46 41441247 4E4F4C55 5F455441 4450555F 46440F47 4E4F4C55 ULONG.DF_UPDATE_ULONG.DAFORMINIT 000060
 5354494E 494A424F 0D454C54 49545445 534D524F 4641440E 4F464E49 52455355 USERINFO.DAFORMSETTITLE.OBJINITS 000080
 4D414E54 494E494A 424F0B54 43454C45 53455441 4450554A 424F0F54 43454C45 ELECT.OBJUPDATESELECT.OBJINITNAM 0000A0
 544E4F43 54494E49 4A424F16 454D414E 5355434F 46455441 4450554A 424F1245 E.OBJUPDATEFOCUSNAME.OBJINITCONT 0000C0
 494E494A 424F0B43 53454445 54414450 554A424F 0D4C4542 414C444E 41545845 EXTANDLABEL.OBJUPDATEDESC.OBJINI 0000E0
 45444A42 4F094E59 53444441 4A424F09 4E595354 494E494A 424F0A43 53454454 TDESC.OBJINITSYN.OBJADDSYN.OBJDE 000100
 4444414A 424F0944 574B5449 4E494A42 4F0A4E59 53504552 4A424F09 4E59534C LSYN.OBJREPSYN.OBJINITKWD.OBJADD 000120
 4E54494E 494A424F 0B44574B 5045524A 424F0944 574B4C45 444A424F 0944574B KWD.OBJDELKWD.OBJREPKWD.OBJINITN 000140
 5045524A 424F0A45 544F4E4C 45444A42 4F0A4554 4F4E4444 414A424F 0A45544F OTE.OBJADDNOTE.OBJDELNOTE.OBJREP 000160
 574F5449 4E494A42 4F0C544E 455F4554 41455243 5F4D524F 46414411 45544F4E NOTE.DAFORM_CREATE_ENT.OBJINITOW 000180
 424F0952 424D5449 4E494A42 4F0A5245 4E574F45 54414450 554A424F 0E52454E NER.OBJUPDATEOWNER.OBJINITMBR.OB 0001A0
 49544703 52424D50 45524A42 4F093152 424D4C45 444A424F 0A52424D 4444414A JADDMBR.OBJDELMBR1.OBJREPMBR.GTI 0001C0
 59524555 51495447 1247534D 54534F50 4954470A 4C4F4F54 4C4C494B 4954470B .GTIKILLTOOL.GTIPOSTMSG.GTIQUERY 0001E0

Dump of file SATURN:[PCCOMMON.DUMP.DLL]DAENTDF.TMP;1 on 18-APR-1990 10:40:49.05
File ID (561,28,0)   End of file block 116 / Allocated 116

Virtual block number 5 (00000005), 512 (0200) bytes

 13524F53 52554354 494E4947 41424C54 55105455 44035254 50415441 44585541 AUXDATAPTR.DUT.UTLBAGINITCURSOR. 000000
 550C454B 414D5145 534C5455 0A524F53 52554345 54415245 54494741 424C5455 UTLBAGITERATECURSOR.UTLSEQMAKE.U 000020
 44165455 4C4D4405 4C454853 55505145 534C5455 0C454B41 4D4E5551 45534C54 TLSEQUNMAKE.UTLSEQPUSHEL.DMLUT.D 000040
 53494745 5254554C 4D441352 454C444E 41485946 49544F4E 454B414D 54554C4D MLUTMAKENOTIFYHANDLER.DMLUTREGIS 000060
 54554C4D 44125445 53524554 53494745 5254554C 4D441045 54454C45 44524554 TERDELETE.DMLUTREGISTERSET.DMLUT 000080
 59464954 4F4E5353 45434F52 5054554C 4D441245 54495257 52455453 49474552 REGISTERWRITE.DMLUTPROCESSNOTIFY 0000A0
 50414407 4554414C 45524E55 4554414C 45525245 54534947 45525455 4C4D4418 .DMLUTREGISTERRELATEUNRELATE.DAP 0000C0
 4D502032 2F534F18 0000707E 03010153 59454846 48544957 544E450C 53444552 REDS.ENTWITHFKEYS...~p...OS/2 PM 0000E0
 5453544F 4F42544E 450C0000 6D726F46 20676E6F 4C207974 69746E45 20414420  DA Entity Long Form...ENTBOOTST 000100
 890A4688 D88EFFFF B81E5657 0000C6C8 00000000 00000000 00000000 01504152 RAP.............àó..WV.|...Ä.F.. 000120
 FFFF9A50 1692468D 0E76FF10 76FF0108 E9037401 8E7E838E 46890C46 8BFF3E86 .>..F..F..~..t.Õ...v..v..F..P... 000140
 FF9A5016 9C468D0E 76FF1076 FF0941E9 90468800 06E90375 00003D90 46890000 ...F.=..u.Õ...F.ÕA..v..v..F..P.. 000160
 5016FC46 8D0064E9 FF3E868B 0920E990 46880006 E9037500 00309046 890000FF ....F.=..u.Õ...F.Õ ...>.Õd..F•.P 000180
 90468800 06E90375 00003D90 46890AC4 8302290F C19A0E76 FF1076FF FF3E86FF .Ñ>..v..v..è.)..á..F.=..u.Õ...F. 0001A0
 9276FF94 76FF001C E90003E9 0374019C 7E830028 E90375FE 460BFC46 8B08F1E9 Õþ..F•.F±u.Õ(..~..t.Õ..Õ...v..v. 0001C0
 30005BE9 005EE900 61E908BE E990468B 0006E903 7500003D 90468900 00FFFF9A ......F.=..u.Õ...F.Õƒ.Õa.Õ^.Õ[.= 0001E0

Dump of file SATURN:[PCCOMMON.DUMP.DLL]DAENTDF.TMP;1 on 18-APR-1990 10:40:49.05
File ID (561,28,0)   End of file block 116 / Allocated 116

Virtual block number 6 (00000006), 512 (0200) bytes

 7500903D FF7FE903 7500863D FF87E903 7500723D 0023E903 76FF94E9 037500A7 Ī.u.Õ..v.Õ#.=r.u.Õ..•..u.Õ..=..u 000000
 3DFF5CE9 03750088 3DFF64E9 03750080 3DFFCAE9 FF6FE903 7500A33D FF77E903 .Õw.=Ê.u.Õo.Õò.=¯.u.Õd.=|.u.Õ\.= 000020
 A8E9FF3E 8688FF9F E9FF44E9 03750006 3DFF4CE9 037500CD 3DFF54E9 037500C3 û.u.ÕĪ.=ë.u.ÕL.=ø.u.ÕO.Õ....>.Õ´ 000040
 50169646 8D0E76FF 1076FF00 0001989A 5016A246 8DFF3EB6 FF0E76FF 1076FF07 ..v..v..Ñ>..FÅ.P......v..v..F..P 000060
 76FF0C76 FF9876FF 9A76FF00 0001B89A 50169846 8D0E76FF 1076FF00 0001A89A .´....v..v..F..P.|....v..v..v..v 000080
 B6FF0E76 FF1076FF 07FCE900 0001DC9A 9676FFA2 76FFA476 FF0676FF 0876FF0A ..v..v..vÊ.vÅ.v..Ê...Õ•..v..v..Ñ 0000A0
 FF1076FF 00000203 9A501696 468D0E76 FF1076FF 000001F3 9A5016F8 468DFF3E >..F½.P.ø....v..v..F..P......v.. 0000C0
 5EC40676 FF0876FF 0A76FF0C 76FF9876 FF9A76FF 00000213 9A501698 468D0E76 v..F..P......v..v..v..v..v..v.á^ 0000E0
 F8468DFF 3EB6FF0E 76FF1076 FF07A1E9 0000031B 9A9676FF 37FF2602 77FF26F8 ¼&.w.&.7.v......ÕÀ..v..v..Ñ>..F½ 000100
 9846800E 76FF1076 FF000003 429A5016 9646800E 76FF1076 FF000003 329A5016 .P.2....v..v..F..P.B....v..v..F. 000120
 46890AC4 83038A0F C19A0E76 FF1076FF FF3EB6FF 5016FC46 80000003 529A5016 .P.R....F•.P.Ñ>..v..v..è....á..F 000140
 00000078 06C7004E E90375FE 460BFC46 8B0745E9 90468800 06E90375 00003D90 .=..u.Õ...F.ÕE..F•.F±u.ÕN.ú.x... 000160
 00B86898 76FF9A76 FF000002 7A9A016A 50520000 02719A00 B6689876 FF9A76FF .v..v.hÑ..q...RPj..z....v..v.hÉ. 000180
 016A5052 0000028A 9A008968 9876FF9A 76FF0000 02919A01 6A505200 0002889A .....RPj.......v..v.h¿..¤...RPj. 0001A0
 0000FFFF 9A000068 1E00B668 9876FF9A 76FF0001 007806C7 0063E900 0002C39A .Û...Õc.ú.x.....v..v.hÑ..h....... 0001C0
 00B86898 76FF9A76 FF000002 DA9A006A 50520000 02D19A00 B6689876 FF9A76FF .v..v.hÑ..Ī...RPj..Ö....v..v.hÉ. 0001E0
```

```
Dump of file SATURN:[PCCOMMON.DUMP.DLL]DAENTDF.TMP;1 on 18-APR-1990 10:40:49.05
File ID (561,28,0)   End of file block 116 / Allocated 116

Virtual block number 7 (00000007), 512 (0200) bytes

 006A5052 0000FFFF 9A00B968 9876FF9A 76FF0000 02F19A00 6A505200 0002E89A .Ò...RPj..þ....v..v.h¿......RPj. 000000
 F85EC406 76FF0876 FF0A76FF 0C76FF98 76FF9A76 FF0689E9 0000B800 00FFFF9A .....|..Ö...v..v..v..v..v..v.é^½ 000020
 16F8468D FF3EB6FF 0E76FF10 76FF0662 E90000FF FF9A9676 FF37FF26 0277FF26 &.w.&.7.v......Öb..v..v..Ñ>..F½. 000040
 16984680 0E76FF10 76FF0000 FFFF9A50 1696468D 0E76FF10 76FF0000 FFFF9A50 P.......v..v..F..P......v..v..F.. 000060
 6A006A00 6A012568 00C16898 76FF9A76 FF0148E9 0374018E 7E830000 FFFF9A50 P......~..t.ÖH..v..v.hê.h%.j.j.j 000080
 890AC483 FFFF0FC1 9A0E76FF 1076FFFF 3EB6FF50 16FC468D 0000FFFF 9A006A00 .j.......F=.P.Ñ>..v..v..è....á.. 0000A0
 76FF9476 FF0099E9 0375FE46 0BFC468B 05E4E990 46880006 E9037500 003D9046 F.=..u.Ö...F.Öõ..F=.F±u.Ö...v..v 0000C0
 46880006 E9037500 003D9046 890000FF FF9A5016 8C468D04 6AFC76FF FE76FF92 ..v±.v•j..F..P......F.=..u.Ö...F 0000E0
 6A006A01 6A006A01 256800C1 689876FF 9A76FF00 19E90374 598C7E80 05B0E990 .Ö¯..~.Yt.Ö...v..v.hê.h%.j.j.j.j 000100
 269A016A 50520000 041D9A00 C0689876 FF9A76FF 0000007A 06C70000 065D9A00 ..]...ú.z....v..v.há......RPj..& 000120
 9876FF9A 76FF0000 04309A01 6A505200 0004349A 00C66898 76FF9A76 FF000004 ....v..v.hó..4...RPj..*....v..v. 000140
 9876FF9A 76FF0001 007A06C7 0063E900 00046F9A 016A5052 00000466 9A00C468 há..f...RPj..o...Õc.ú.z....v..v. 000160
 869A006A 50520000 047D9A00 C0689876 FF9A76FF 00000631 9A000168 1E00C068 há..h...1....v..v.hè..)...RPj... 000180
 9876FF9A 76FF0000 049D9A00 6A505200 0004949A 00C66898 76FF9A76 FF000004 ....v..v.hó......RPj.......v..v. 0001A0
 0C76FF98 76FF9A76 FF04DDE9 0000B800 0006E69A 006A5052 0000060D 9A00C468 há..Ť...RPj..Ì...¡..Õï..v..v..v. 0001C0
 76FF04B6 E9000001 819A9676 FF37FF26 0277FF26 F85EC406 76FF0876 FF0A76FF .v..v..v.á^½&.w.&.7.v......ÖÑ..v 0001E0
```

```
Dump of file SATURN:[PCCOMMON.DUMP.DLL]DAENTDF.TMP;1 on 18-APR-1990 10:40:49.05
File ID (561,28,0)   End of file block 116 / Allocated 116

Virtual block number 8 (00000008), 512 (0200) bytes

 FF0495E9 90468B00 06E90375 00003D90 46890000 05439A50 16984680 0E76FF10 ..v..F.:P.C....F.=..u.Ö...F.Ö... 000000
 880006E9 03750000 3D904689 00000569 9A5016FF 3A868DFF 3EB6FF0E 76FF1076 v..v..Ñ>...:..P.í....F.=..u.Ö... 000020
 9AFF3AB6 FFFF3CB6 FF0676FF 0876FF0A 76FF0C76 FF9876FF 9A76FF04 6FE99046 F.Õo..v..v..v..v..v..v..Ñ<..Ñ:.. 000040
 E9037500 003D9046 89000001 619A5016 9846800E 76FF1076 FF044DE9 00000599 ....ÕM..v..v..F..P.a....F.=..u.Õ 000060
 90468900 0001419A 5016FF3A 868DFF3E B6FF0E76 FF1076FF 042CE990 46880006 ...F.Õ,..v..v..Ñ>...:..P.A....F. 000080
 0676FF08 76FF0A76 FF0C76FF 9876FF9A 76FF0406 E990468B 0006E903 7500003D =..u.Õ...F.Õ...v..v..v..v..v..v. 0000A0
 03D4E99E 46880006 E9037500 08A05689 9E468900 00FFFF9A FF3AB6FF FF3CB6FF .Ñ<..Ñ:.......F..V..Âu.Õ...F.Õå. 0000C0
 0800A69A 5016FF40 868D0000 FFFF9A50 16FF4086 8D486A00 AE689876 FF9A76FF .v..v.hÛ.jK..@..P.......@..P.Ì.. 0000E0
 0058E903 742CFF41 BE80000A E903752C FF428E80 006CE903 7700033D 04C48306 ..é.=..w.Õl../B.,u.Õ.../A.,t.ÕX. 000100
 0013E908 C483061E 00469A50 16A8468D 5016FF43 868D0016 E903742C FF428E80 ./B.,t.Õ....C..P.F´.P.F....á.Õ.. 000120
 0002681E 00AE6898 76FF9A76 FF08C483 FFFF0046 9A5016A8 46805016 FF42868D ..B..P.F´.P.F....é..v..v.hÛ..h.. 000140
 B0689876 FF9A76FF 000002AC 9A5016A8 468000AE 689876FF 9A76FF00 0006449A .D....v..v.hÛ..F´.P.¯....v..v.h¯ 000160
 1076FF02 5DE90375 FFA67E83 A6468900 0003749A 006A006A 006A006A 01656800 .he.j.j.j.j..t....FÌ.~Ì.u.Õ]..v. 000180
 478B26F4 5EC40010 E9037500 627F8326 F45EC400 00FFFF9A 5016F446 8D0E76FF .v..F¶.P.....é^¶&..b.u.Õ..é^¶&.G 0001A0
 5EC46247 8B26F45E C40131E9 03740062 7F8326F4 5EC4000D E90373A6 463B4862 bH;FÌs.Õ..é^¶&..b.t.Õ1.é^¶&.Gbé^ 0001C0
 7406C700 00007606 C70006E9 03740100 763E8300 8CE90377 A6463B64 470326F4 ¶&.Gd;FÌw.Õ...>v..t.Õ..ú.v...ú.t 0001E0
```

```
Dump of file SATURN:[PCCOMMON.DUMP.DLL]DAENTDF.TMP;1 on 18-APR-1990 10:40:49.05
File ID (561,28,0)   End of file block 116 / Allocated 116

Virtual block number 9 (00000009), 512 (0200) bytes

 9876FF9A 76FF0000 06FD9A00 6A505200 0006F49A 00AE6898 76FF9A76 FF000100 ....v..v.hÛ..¶...RPj..»....v..v. 000000
 52000007 229A00B1 689876FF 9A76FF00 0007149A 006A5052 00000708 9A00A068 hÛ......RPj.......v..v.hÝ..".. R 000020
 FF000007 429A006A 50520000 07399A00 B3689876 FF9A76FF 00000728 9A006A50 Pj..+....v..v.h°..9...RPj..B.... 000040
 83000100 7606C700 8CE90000 02639A00 6A505200 00025A9A 00DA6898 76FF9A76 v..v.hÖ..Z...RPj..c...Õ..ú.v.... 000060
 0000078C 9A016A50 52000007 839A00AE 689876FF 9A76FF00 20E90374 0100743E >t..t.Õ ..v..v.hÛ......RPj...... 000080
 0000040F 9A006A50 52000004 069A00AD 689876FF 9A76FF00 5CE90000 007406C7 ú.t...Õ\..v..v.hÙ......RPj...... 0000A0
 00B36898 76FF9A76 FF000007 BA9A006A 50520000 07B19A00 B1689876 FF9A76FF .v..v.hÝ..Ý...RPj..¤....v..v.h°. 0000C0
 006A5052 000007EC 9A00DA68 9876FF9A 76FF0000 07D19A00 6A505200 0007C89A .à...RPj..Ì....v..v.hÖ..ł...RPj. 0000E0
 00000803 9A00AE68 9876FF9A 76FF007C E9037401 00743E83 00F2E900 0007F59A .%...Õ·..>t..t.Õ|..v..v.hÛ...... 000100
 00000823 9A016A50 52000008 1A9A00AD 689876FF 9A76FF00 00080C9A 016A5052 RPj........v..v.hÙ......RPi..#... 000120
 00B36898 76FF9A76 FF000008 3A9A016A 50520000 08319A00 B1689876 FF9A76FF .v..v.hÝ..1...RPj..:....v. v.h°. 000140
 016A5052 00000872 9A00DA68 9876FF9A 76FF0000 08519A01 6A505200 0008489A .H...RPj..Q....v..v.hÖ..r.  RPj. 000160
 AD689876 FF9A76FF 0062E903 74010076 3E83006C E9000000 7406C700 0008789A .(...ú.t...Õl..>v..t.Õb..v..v.hÙ 000180
 6A505200 0008A09A 00B16898 76FF9A76 FF000008 929A016A 50520000 08899A00 ......RPj.......v..v.hÝ......RPj 0001A0
 9A76FF00 0008C09A 016A5052 000008B7 9A008368 9876FF9A 76FF0000 08A99A01 ..`....v..v.h°..ñ...RPj..à....v. 0001C0
 00B4E900 00B80000 007606C7 0000076C 9A016A50 52000007 639A000A 689876FF .v.hÖ..c...RPj..l...ú.v...¡..ÕÇ. 0001E0
```

```
Dump of file SATURN:[PCCOMMON.DUMP.DLL]DAENTDF.TMP;1 on 18-APR-1990 10:40:49.05
File ID (561,28,0)   End of file block 116 / Allocated 116

Virtual block number 10 (0000000A), 512 (0200) bytes

 0376F843 E9037500 72300043 E90376F8 A7E90375 00A53000 ABE900AE E9000088 ¡..ÕÛ.Õ¨.=E.u.ÕI½v.ÕC.=r.u.ÕC½v. 000000
 863DF823 E9037500 8430FFCA E9F82EE9 03750070 3DF836E9 03750069 3D0013E9 Õ..=i.u.Õ6½=p.u.Õ.½Õò.=..u.Õ#½=. 000020
 57E90375 00863DFF A7E9F80B E9037500 903DF813 E9037500 8E3DF818 E9037500 .u.Õ.½=..u.Õ.½=..u.Õ.½ÕI.=Ñ.u.ÕW 000040
 B03DFB80 E9037700 AE3DFF8A E9037300 AD3DF84A E9037500 A73D0023 E90376F8 ½v.Õ#.=I.u.ÕJ½=Û.s.Õ..=Û.w.Õ.«=¯ 000060
 81E90375 00C33DF8 1FE90375 00C03DF8 82E90375 00883DFF 77E9FBE1 E9037500 .u.ÕÃ«Õw.=¡.u.Õ.½=â.u.Õ.½=û.u.ÕÝ 000080
 5700001A C8000CCA C95F5E1F FF4CE9F8 07E90375 00D63DF8 0FE90375 00043DF9 *=å.u.Õ.½=ø.u.Õ.½ÕL..^_èò..à...W 0000A0
 1076FF00 0001519A 5016F246 800E76FF 1076FFEC 46890A46 88D88E00 08881E56 V.¡...Ã.F..Fš.v..v..F·¯P.Q....v. 0000C0
 EC468800 00002E9A 5016EE46 800E76FF 1076FF00 0004DA9A 5016F446 800E76FF .v..F¶.P.Õ....v..v..FÝ.P......Fš 0000E0
 FF0E76FF 1076FF01 58E90000 09F89A50 16F84680 EC76FF0E 76FF1076 FF00C5E9 Õé..v..v..vš.F½.P.½...ÕX..v..v.. 000100
 0A349A50 16FC468D EC76FF0E 76FF1076 FF0142E9 00000A0E 9A5016F8 468DEC76 vš.F½.P.....ÕB..v..v..vš.F•.P.4. 000120
 468DEC76 FF0E76FF 1076FF01 1CE9FA56 89F84689 02578826 078826FC 5EC40000 ..é^•&..&.W..F½.V•Õ...v..v..vš.F 000140
 76FF1076 FF00F6E9 FA5689F8 46890257 88260788 26FC5EC4 00000A5A 9A5016FC •.P.Z...é^•&..&.W..F½.V•Õ-..v..v 000160
 FF00F5E9 EA468B00 06E90375 000030EA 46890000 05009A50 16E6468D EC76FF0E ..vš.F|.P......Fõ=..u.Õ...FõÕ%.. 000180
 B80005E9 0000FFFF 9AE676FF E876FF06 76FF0876 FF0A76FF 0C76FFF4 76FFF676 v-.v¶.v..v..v..v..vÒ.v|.....Õf.¡ 0001A0
 FF23E903 75007630 FF57E903 7200A830 004BE903 7600AA30 00A9E900 CFE90000 ..ÕÜ.Õ`.=`.v.ÕK.=´.r.ÕW.=v.u.Õ#. 0001C0
 FFBFE903 73008730 FFC7E9FF 0EE90377 00743DFF D2E90373 00733000 13E90376 v.Õ..=s.s.Õø.=t.w.Õ..ÕÚ.=..s.Õ¢. 0001E0

Dump of file SATURN:[PCCOMMON.DUMP.DLL]DAENTDF.TMP;1 on 18-APR-1990 10:40:49.05
File ID (561,28,0)   End of file block 116 / Allocated 116

Virtual block number 11 (0000000B), 512 (0200) bytes

 037600C6 3DFFA4E9 FF01E903 77009330 FFAFE903 7300913D FF11E903 7700893D =..w.Õ..=..s.Õ€.=..w.Õ..ÕE.=6.v. 000000
 037300B9 3DFF40E9 037700B3 3DFF8CE9 037300B1 3DFF2AE9 037200C4 3D002BE9 Õ+.=á.r.Õ*.=Ý.s.Õ..=*.w.Õ?.=¿.s. 000020
 DA3DFED1 E9037700 D93DFF69 E9037300 D73DFF71 E9FEE4E9 037700BB 3DFF7CE9 Õ|.=E.w.Õõ±Õq.=•.s.ÕI.=).» 5I±=Õ 000040
 0876FF0A 76FF0C76 FFF476FF F676FFFF 4EE9FEC1 E9037500 D83DFF15 E9037500 .u.Õ..=Û.u.Õé±ÕN..v-.v¶.v..  .v. 000060
 5700013A C8000CCA C95F5E1F 0000E900 00FFFF9A F276FFF8 76FFFA76 FF0676FF .v..v•.v½.v·.....Õ...^_èò..à:..W 000080
 FF1CB6FF FF1EB6FF 000009B9 9A5016FF 1C868D08 76FF0A76 FFD88E09 93B81E56 V.¡...Ã.v..v......P.¿¯...Ñ...Ñ.. 0000A0
 FF1CB6FF FF1EB6FF 01B7E903 74000606 7E81F256 89F04689 0000079A 9A0676FF .v.......Fb.V·.-.ø.t.Õñ..Ñ...Ñ.. 0000C0
 FFFF9A50 16FF2086 800876FF 0A76FF00 00FFFF9A 00806850 16FF7086 800676FF .v...p..Ph........v..v... ..P... 0000E0
 FF18868D 0876FF0A 76FF0348 E999FF14 86880008 E9037500 003DFF14 86890000 ......=..u.Õ........ÕH..v..v..... 000100
 FFFF1AB6 FF0323E9 99FF1486 880008E9 03750000 3DFF1486 89000009 C99A5016 .P.è.......=..u.Õ........Õ#..Ñ... 000120
 7500003D FF148689 0000FFFF 9A5016FF 68868019 6AFF2086 FFFF2286 FFFF1886 Ñ...Ñ"..Ñ .j...h..P.........=..u 000140
 89FF6A96 8BFF6886 8BFF6C86 89FF6E86 89000088 02F2E999 FF14868B 0008E903 .Õ.......Õ·.j....n...l...h...j.. 000160
 5EC4FF18 B6FFFF1A B6FF0065 E9037500 0420C588 04FC4683 0004E9FE 5689FC46 F•.V±Õ...F•..é-..u.Õe..Ñ...Ñ..é^ 000180
 03E90375 000030FF 14868900 0003BF9A 5016FEC6 8680026A 37FF2602 77FF26FC •&.w.&.7j...ó±.P.¢.......=..u.Õ. 0001A0
 037400FF 148E83FF 14868900 00FFFF9A 5016FF70 86805016 FEC6868D FFC4E900 .Õá...ó±.P..p..P.........../...t. 0001C0
 FFFF1AB6 FFFF8DE9 0003E9FF 6E9689FF 6C868902 57882607 8826FC5E C40015E9 Õ..é^•&..&.W...l...n.Õ..Õ...Ñ... 0001E0

Dump of file SATURN:[PCCOMMON.DUMP.DLL]DAENTDF.TMP;1 on 18-APR-1990 10:40:49.05
File ID (561,28,0)   End of file block 116 / Allocated 116

Virtual block number 12 (0000000C), 512 (0200) bytes

 FF14868B 0008E903 7500003D FF148689 0000FFFF 9AFF6886 FFFF6AB6 FFFF1886 Ñ...Ñj..Ñh..........=..u.Õ...... 000000
 800876FF 0A76FF02 25E999FF 14868800 08E90374 FF6E860B FF6C868B 023AE999 .Õ:...l...n.t.Õ.......Õ%..v..v.. 000020
 6C8688F4 5EC40000 06799A50 16F4468D 0876FF0A 76FF0000 0E179A50 16FF1686 ....P......v..v..F¶.P.y...é^¶..l 000040
 6C86FFFF 6E86FF01 F168006A 10AF68FF 1686FF5A 57892658 478926FF 6E9688FF ...n.&.GX&.WZ.Ñ..h£.j.hb..Ñn..Ñl 000060
 FFFF9A50 16FF2486 8D406AF0 76FFF276 FF01CFE9 0000BA00 00B80000 FFFF9AFF ......¡..¤..ÕÜ..v·.vbjã..$..P... 000080
 05CF00BE 9A5016FF 25868D01 A9E90000 BA000088 0009E903 7523FF24 8E800000 .../$.Ñu.Õ..¡..¤..Õ`...X..P.f.ü. 0000A0
 FFFF668E 830026E9 037407FF 648E83FF 669689FF 648689FF CA830000 0D04C483 .é.....ò...d...f..fd..t.Õ&..ff.. 0000C0
 39E90000 088D9A00 80685016 FF70868D 0676FFFF 1CB6FFFF 1EB6FF00 1CE90374 t.Õ...Ñ...Ñ...v...p..Ph...§...Õ9 0000E0
 0676FFFF 1CB6FFFF 1EB6FF00 1CE90374 FFFF668E 830026E9 037406FF 648E8300 ..fd..t.Õ&..ff..t.Õ...Ñ...Ñ...v. 000100
 0876FF0A 76FF0124 E90000BA 0000B800 09E90000 05C29A50 16FF7086 80008068 h....p..P.ô...Õ..¡..¤..Õ$..v..v. 000120
 C483007D 0FC19A08 76FF0A76 FF0676FF 5016F846 800000FF FF9A5016 FF16868D .....P......F½.P.v..v..v..è.}..é 000140
 000AE903 75008806 7E810014 E9037500 C3067E81 000AE903 74FA460B F84688OA ..F½.F*t.ÕÕ..-.û.u.Õ...-.¡.u.Õ.. 000160
 009E681E FF1CB6FF FF1EB6FF 0039E903 7400C306 7E8100BC E9037400 CD067E81 .~.ë.t.Õ¥..-.ü.t.Õ9..Ñ...Ñ...h.. 000180
 E9037500 003DFF14 86890000 0EC59A50 16F8468D 5016FEC6 86805016 FF12868D .....P..ó±.P.F½.P.é........=..u.Õ 0001A0
 1EFF1CB6 FFFF1EB6 FF0039E9 037400B8 067E8100 79E90094 E999FF14 86880008 ........Õ..Õy..-.¡.t.Õ9..Ñ...Ñ... 0001C0
 000030FF 14868900 000EFE9A 5016F846 805016FE C6868050 16FF1286 80007C68 h|......P..ó±.P.F½.P.±........=.. 0001E0
```

Dump of file SATURN:[PCCOMMON.DUMP.DLL]DAENTDF.TMP;1 on 18-APR-1990 10:40:49.05
File ID (561,28,0)  End of file block 116 / Allocated 116

Virtual block number 13 (00000000), 512 (0200) bytes

```
FF128680 005E681E FF1CB6FF FF1EB6FF 0036E900 51E999FF 14868800 08E90375 u.Õ.......ÕQ.Õ6..Ñ...Ñ...h^..... 000000
86880008 E9037500 0030FF14 86890000 FFFF9A50 16F84680 5016FEC6 86805016 .P..6±.P.F½.P.........=..u.Õ.... 000020
5E1F0000 E90000FF FF9A5016 FF708680 F876FFFA 76FFFF16 B6FF0018 E999FF14 ...Õ...Ñ...vª.v½..p..P.....Õ...^ 000040
8D0A76FF 0C76FF00 0107C726 065EC4D8 8E0B73B8 1E565700 000EC800 06CAC95F _èò..à...WV.¡s..Äá^.&ú....v..v.. 000060
8D0A76FF 0C76FF00 0009A99A 5016FC46 8D0A76FF 0C76FF00 0008849A 5016F846 F½.P......v..v..F=.P.`....v..v.. 000080
FFF676FF FC76FF00 0000169A 5016FE46 8D0A76FF 0C76FF00 0000269A 5016F446 F¶.P.&....v..v..F±.P......v=.v-. 0000A0
9A010E68 1EF276FF F876FFFA 76FF0012 E9037500 003DF246 890000FF FF9AF476 v¶......F·=..u.Õ...vª.v½.v·.h... 0000C0
0876FFD8 8E0F3DB8 1E565700 0064C800 08CAC95F 5E1F0000 E90000B8 0000FFFF ....¡..Õ...^_èò..àd..WV.¡=..Ä.v. 0000E0
76FF031E E9EE468B 0006E903 7500003D EE468900 0008F39A 5016F246 8D0676FF .v..F·.P.µ....FŸ=..u.Õ...FŸÕ...v 000100
FF02FDE9 EE468800 06E90375 00003DEE 46890000 10439A50 169C4680 0676FF08 ..v..F..P.C....FŸ=..u.Õ...FŸÕ».. 000120
020CE9EE 46880006 E9037500 003DEE46 8900000F 559A5016 F6468006 76FF0876 v..v..F-.P.U....FŸ=..u.Õ...FŸÕÉ. 000140
C7000AF0 46C702C2 E900000B CE9A0C76 FF0E76FF 0676FF08 76FF018A E90A4688 .F.Õ...v..v..v..v..ö...Õ¿ úFÞ..ú 000160
0DF046C7 01B7E900 0010879A 4B6A5016 A0468D0A 76FFF676 FFF876FF 0011EC46 F£...v½.v-.v..F..PjK.....ι´.úFÞ. 000180
46C70195 E9000010 A99A4B6A 5016A046 8D0A76FF F676FFF8 76FF0016 EC46C700 .úF§...v½.v-.v..F..PjK.`.... .úF 0001A0
0173E900 0010CB9A 4B6A5016 A0468D0A 76FFF676 FFF876FF 0018EC46 C70015F0 Þ..úF§...v½.v-.v..F..PjK.ù...Õs. 0001C0
E9000010 ED9A4B6A 5016A046 8D0A76FF F676FFF8 76FF0014 EC46C700 02F046C7 úFÞ..úF§...v½.v-.v..F..PjK.Ú...Õ 0001E0
```

Dump of file SATURN:[PCCOMMON.DUMP.DLL]DAENTDF.TMP;1 on 18-APR-1990 10:40:49.05
File ID (561,28,0)  End of file block 116 / Allocated 116

Virtual block number 14 (0000000E), 512 (0200) bytes

```
00110F9A 4B6A5016 A0468D0A 76FFF676 FFF876FF 0013EC46 C70009F0 46C70151 Q.úFÞ..úF§...v½.v-.v..F..PjK.... 000000
319A4B6A 5016A046 8D0A76FF F676FFF8 76FF0012 EC46C700 03F046C7 012FE900 .Õ/.úFÞ..úF§...v½.v-.v..F..PjK.1 000020
4B6A5016 A0468D0A 76FFF676 FFF876FF 0019EC46 C70016F0 46C70100 E9000011 ...Õ..úFÞ..úF§...v½.v-.v..F..PjK 000040
A0468D4B 6A00A368 F676FFF8 76FF000F EC46C700 02F046C7 00EBE900 0000CA9A .ò...ÕS.úFÞ..úF§...v½.v-hÈ.jK.F. 000060
468D4B6A 696AF676 FFF876FF 0010EC46 C70001F0 46C700C9 E9000011 749A5016 .P.t...Õè.úFÞ..úF§...v½.v-jijK.F 000080
9A006A00 6A006A00 6A016568 00B068F6 76FFF876 FF00A8E9 000000FA 9A5016A0 ..P.ª...Õ´..v½.v-h¯.he.j.j.j.j.. 0000A0
0003F29A 006A006A FA76FF00 6A016A68 00B068F6 76FFF876 FFFA4689 000011AD Ù....Fª.v½.v-h¯.hj.j..vªj.j..·.. 0000C0
00673000 23E90376 FEC6E903 7500903D 0063E900 66E90069 E9FE5689 FC468900 ..F=.V±Õi.Õf.Õc.=..u.Õó±v.Õ#.=g. 0000E0
FFCAE9FE 7FE90375 008630FE 65E90375 007230FF 70E90375 006930FE 61E90375 u.Õa±=i.u.Õ).=r.u.Õe±=..u.Õ.±Õò. 000100
FEE4E903 7500883D FF73E903 7500803D FEB0E903 7500A73D FF40E903 7500A33D =È.u.Õa.=I.u.Õ¯±=¯.u.Õs.=¡.u.Õõ± 000120
F476FF00 36E90375 00B00A7E 81FF97E9 FEF6E903 7500063D FEBAE903 7500C33D =û.u.Õo±=ø.u.Õ-±Õ...-.¯.u.Õ6..v¶ 000140
890000FF FF9A0C76 FF0E76FF 9C76FF9E 76FFEC76 FF5016A0 468DF076 FFF276FF .v·.vÞ.F..P.v§.v..v..v..v....... 000160
8DFC76FF FE76FFF2 76FFF476 FF00A3E9 00ACE9EE 46880006 E9037500 003DEE46 FŸ=..u.Õ...FŸÕ¯.ÕÈ..v¶.v·.v±.v=. 000180
03740EF0 7E830082 E9EE468B 0006E903 7500003D EE468900 00FFFF9A 5016F046 FÞ.P......FŸ=..u.Õ...FŸÕ...-Þ.t. 0001A0
30EE4689 000120E 9A0C76FF 0E76FF04 6AFC76FF FE76FFF2 76FFF476 FF002DE9 Õ-..v¶.v·.v±.v=j..v..v..ß....FŸ= 0001C0
FFF276FF F476FF00 2DE90374 0FF07E83 0046E900 4FE9EE46 880006E9 03750000 ..u.Õ...FŸÕ0.ÕF..-Þ.t.Õ-..v¶.v·. 0001E0
```

Dump of file SATURN:[PCCOMMON.DUMP.DLL]DAENTDF.TMP;1 on 18-APR-1990 10:40:49.05
File ID (561,28,0)  End of file block 116 / Allocated 116

Virtual block number 15 (0000000F), 512 (0200) bytes

```
EE468800 06E90375 00003DEE 46890000 FFFF9A0C 76FF0E76 FF056AFC 76FFFE76 v±.v=j..v..v.......FŸ=..u.Õ...FŸ 000000
C95F5E1F 0000E9EE 46880257 89260789 26FE5688 FC46880C 5EC40010 E90019E9 Õ..Õ..á^..F=.V±&..&.W..FŸÕ...^_è 000020
FF0C76FF 0E76FF10 76FF1276 FF1476FF 1676FF08 8E0FC988 1E565700 0002C8CB ùà...WV.¡è..Ä.v..v..v..v..v..v¯. 000040
46880006 E9037500 003DFE46 890000FF FF9AFFFF 680E2C68 0676FF08 76FF0A76 v..v..v.h,.h........F±=..u.Õ...F 000060
0006E9FE 46880006 E9037500 003DFE46 890000FF FF9A1476 FF1676FF 0022E9FE ±Õ"..v..v.......F±=..u.Õ...F±Õ.. 000080
8D0E76FF 1076FFD8 8E1319B8 1E565700 0004C800 12CAC95F 5E1F0000 E90000B8 ¡..Õ...^_èò..à...WV.¡...Ä.v..v.. 0000A0
FFFF9A00 6A0A76FF 0C76FF06 76FF0876 FFFC76FF FE76FF00 000FD99A 5016FC46 F=.P.\¯...v±.v=.v..v..v..v.j.... 0000C0
5B9A0876 FF0A76FF D88E1385 881E5657 000006C8 000CCAC9 5F5E1F00 00E90000 ..Õ...^_èò..à...WV.¡...Ä.v..v..[ 0000E0
9A5016FC 468D0876 FF0A76FF 0077E9FA 46880006 E9037500 003DFA46 89000013 ....Fª=¯.u.Õ...FªÕw..v..v..F=.P. 000100
686A0676 FF0876FF 0A76FF00 56E9FA46 880006E9 03750000 3DFA4689 0000101B .....Fª=..u.Õ...FªÕV..v..v..v.jh 000120
680676FF FC76FFFE 76FF0035 E9FA4688 0006E903 7500003D FA468900 00FFFF9A ......Fª=..u.Õ...FªÕ5..v±.v=.v.h 000140
006A5052 00000894 9A686AFC 76FFFE76 FF000011 909A006A 006A4B6A 006A0143 C.j.jKj.j.......v±.v=jh.....RPj. 000160
5EC4D88E 13C4B81E 56570000 A6C80006 CAC95F5E 1F0000E9 FA468800 0007A39A .È....FªÕ...^_èò..àI..WV.¡á..Äá^ 000180
06E90375 00003DF6 46890000 13959A50 16F8468D 1476FF16 76FF0002 07C7260E .&ú....v..v..F½.P......F-=..u.Õ. 0001A0
E9037500 003DF646 89000013 F09A5016 FC468014 76FF1676 FF00CCE9 F6468800 ..F-Õã..v..v..F=.P.Þ....F-=..u.Õ 0001C0
03750000 3DF64689 0000FFFF 9A5016A6 468DF876 FFFA76FF 00ABE9F6 46880006 ...F-Õ¨..vª.v½.FÎ.P......F-=..u. 0001E0
```

Dump of file SATURN:[PCCOMMON.DUMP.DLL]DAENTDF.TMP;1 on 18-APR-1990 10:40:49.05
File ID (561,28,0) End of file block 116 / Allocated 116

Virtual block number 16 (00000010), 512 (0200) bytes

```
76FF0000 11539A50 16FF5A86 8D4B6A69 6AFC76FF FE76FF00 8AE9F646 880006E9 Õ...F-Õ...v±.v=jijK..Z..P.S....v 000000
06E90375 00003DF6 46890000 0C819A50 16AA468D 2F6AA676 FFA876FF F876FFFA ª.v½.v´.v¦j/.F¨.P......F-=..u.Õ. 000020
E9037400 003D08C4 83D08E00 7C9A5016 FF5A868D 5016AA46 8D004CE9 F6468800 ..F-ÕL..F¨.P..Z..P.|....ö.=..t.Õ 000040
682A6A01 9636FF26 0234068E 006A006A 0023E900 00880001 07C7260E 5EC4000E ..ó^.&ú...|..Õ#.j.j...4.&.6..j*h 000060
56570000 D2C80012 CAC95F5E 1F0000E9 F6468800 00FFFF9A 0A76FF0C 76FF0196 ...v..v.......F-Õ...^ èò..à0..WV 000080
FF0876FF 0A76FFF6 4689F846 89000088 0000F446 C70000FE 46C7D88E 146AB81E .¡j..ÄúF±..úF¶..¡...F%.F-.v..v.. 0000A0
76FF0545 E9844688 0006E903 75000030 84468900 0009E29A 5016FF2E 868D0676 v......P.ã....F.=..u.Õ...F.ÕE..v 0000C0
FF0524E9 84468800 06E90375 00003084 46890000 14829A50 168A4680 0876FF0A ..v..F..P......F.=..u.Õ...F.Õ$.. 0000E0
02E98446 880006E9 03750000 30844689 00000FFA 9A5016FF 32868D08 76FF0A76 v..v...2..P.ª....F.=..u.Õ...F.Õ. 000100
E9844688 0006E903 7500003D 84468900 000F659A 50169246 8D0876FF 0A76FF05 ..v..v..F..P.e....F.=..u.Õ...F.Õ 000120
84468800 06E90375 00003D84 46890000 14A39A50 168E468D 0876FF0A 76FF04E1 Ä..v..v..F..P.È....F.=..u.Õ...F. 000140
46880006 E9037500 003D8446 8900000F 759A5016 FA468D08 76FF0A76 FF04C0E9 Õä..v..v..Fª.P.u....F.=..u.Õ...F 000160
FF000066 47C726FA 5EC40000 6447C726 FA5EC400 006247C7 26FA5EC4 049FE984 .Õ..ó^ª&úGb..ó^ª&úGd..ó^ª&úGf... 000180
AD688E76 FF9076FF 0000169D 9A006A00 6A4B6A00 6A014368 00AE688E 76FF9076 v..v.hÜ.hC.j.jKj.j.......v..v.hÜ 0001A0
B6FFFF34 86FF9276 FF8A76FF 8C76FF00 001439A 006A006A 056A006A 01436800 .hC.j.j.j.j..;....v..v..v..Ñ4..Ñ 0001C0
7500003D 84468900 00FFFF9A 5016EC46 8D505200 6205FC56 88FA4688 1E6AFF32 2.j..Fª.V=.b.RP.Fš.P......F.=..u 0001E0
```

Dump of file SATURN:[PCCOMMON.DUMP.DLL]DAENTDF.TMP;1 on 18-APR-1990 10:40:49.05
File ID (561,28,0) End of file block 116 / Allocated 116

Virtual block number 17 (00000011), 512 (0200) bytes

```
77624739 26FE4688 FA5EC4FE 46FF0003 E90000FE 46C70419 E9844688 0006E903 .Õ...F.Õ..úF±..Õ...F±ó^ª.F±&9Gbw 000000
FFFF9A50 16A0468D 30FF2602 70FF26EC 76C40CFE 5E688A76 FF8C76FF 0244E903 .ÕD..v..v.k^±.óvš&.p.&.0.F..P... 000020
C2E98446 8800000F 939AEC76 FFEE76FF 9276FF00 14E90375 00003084 46890000 ...F.=..u.Õ...v..vŸ.vš......F.Õö 000040
00FFFF9A 5016F646 8D116A30 FF260270 FF26EC76 C40CFE5E 688A76FF 8C76FF03 ..v..v.k^±.óvš&.p.&.0j..F-.P.... 000060
0009E903 7E0113E9 037D00F8 7E830391 E9844688 0006E903 75000030 84468900 ..F.=..u.Õ...F.Õ...-½.).Õ..-.Õ.. 000080
8D116A30 FF260270 FF26EC76 C40CFE5E 688A76FF 8C76FF01 05E90377 00F67E83 .—.w.Õ...v..v.k^±.óvš&.p.&.0j.. 0000A0
F2568BF0 46880349 E9844688 0006E903 75000030 84468900 000C249A 5016F046 Fþ.P.$....F.*..u.Õ...F.ÕI..Fþ.V· 0000C0
FF8C76FF 005FE903 7502470B 26078B26 9C5EC404 9C468300 04E99E56 899C4689 .F..V.Õ...F..ó^.&..&.G.u.Õ_..v.. 0000E0
03750000 3D844689 00001502 9A501682 468D046A 37FF2602 77FF269C 5EC48A76 v.ó^.&.w.&.7j..F..P......F.=..u. 000100
03745982 7E8002E9 E9844688 00001838 9AF076FF F276FF8A 76FF8C76 FF0017E9 Õ...v..v..v·.vþ.8....F.ÕÕ..-.Ýt. 000120
76FF8C76 FFFF8EE9 0003E908 C4831849 00469A50 16FF3686 8D011A68 1E0015E9 Õ...h....6..P.F.I..ó.Õ..Õ...v..v 000140
003D08C4 83186300 7C9A5016 FF36868D 011E681E 00000CDC 9AF076FF F276FF8A ..v·.vþ.É....h....6..P.|.c..ó.=. 000160
36868D50 16A0468D 08C48318 7600469A 5016FF36 868D0122 681E0012 E9037500 .u.Õ...h"...6..P.F.v..ó..F..P..6 000180
C4831525 00469A50 16FF3686 8D5016A0 468D0013 E908C483 188C0000 9A5016FF ..P......ó.Õ...F..P..6..P.F.%..ó 0001A0
FFFF30B6 FF8E76FF 9076FF00 49E90374 06400B26 04408B26 EC5EC40C FE766808 .kv±.ó^š&.ə.&.ə.t.ÕI..v..v..ÑO.. 0001C0
FF26EC76 C40CFE5E 685016FF 36868008 70FF26EC 5EC40CFE 7668FE76 FFFF2EB6 Ñ...v±kv±.ó^š&.p...6..Pk^±.óvš&. 0001E0
```

Dump of file SATURN:[PCCOMMON.DUMP.DLL]DAENTDF.TMP;1 on 18-APR-1990 10:40:49.05
File ID (561,28,0) End of file block 116 / Allocated 116

Virtual block number 18 (00000012), 512 (0200) bytes

```
76FF0047 E90208E9 84468800 06E90375 00003084 46890000 19209A30 FF260270 p.&.0. ....F.=..u.Õ...F.Õ..ÕG..v 000000
5016FF36 868D0870 FF26EC5E C40CFE76 68FE76FF FF2EB6FF FF30B6FF 8E76FF90 ..v..ÑO..Ñ...v±kv±.ó^š&.p...6..P 000020
880006E9 03750000 3D844689 0000FFFF 9A0470FF 260670FF 26EC5EC4 0CFE7668 kv±.ó^š&.p.&.p.......F.=..u.Õ... 000040
12A89A50 1694468D 0F6AFF32 B6FFFF34 B6FF8A76 FF8C76FF FDAAE901 BEE98446 F.Õf.Õ`».v..v..Ñ4..Ñ2.j..F..P.´. 000060
76FF003C E9037596 46089446 880190E9 84468800 06E90375 00003D84 46890000 ...F.*..u.Õ...F.Õ...F..F.u.Õ<..v 000080
76FF8C76 FF9476FF 9676FF92 76FF8E76 FF9076FF FF2EB6FF FF30B6FF FA76FFFC =.vª.ÑO..Ñ...v..v..v..v..v..v..v 0000A0
8A76FF8C 76FF0149 E9844688 0006E903 75000030 84468916 C4831339 46739A8A ..sF9..ó..F.=..u.Õ...F.ÕI..v..v. 0000C0
FFFF9A50 1698468D 50520066 05FC5688 FA46881E 6AFF32B6 FFFF34B6 FF9276FF .v..Ñ4..Ñ2.j..Fª.V=.f.RP.F..P... 0000E0
0006E903 7400667F 8326FA5E C40110E9 84468800 06E90375 00003D84 46890000 ...F.*..u.Õ...F.Õ..ó^ª&..f.t.Õ.. 000100
89000016 849A006A 006A006A 006A0160 6800B068 8E76FF90 76FF00FD E9844688 .F.Õ»..v..v.h¯.h'.j.j.j.j....... 000120
7502470B 26078B26 865EC404 86468300 04E98856 89864689 9A568898 4688F446 F¶.F..V..F..V.Õ...F..ó^.&..&.G.u 000140
46890000 170E9A50 16A0468D 37FF2602 77FF2686 5EC48A76 FF8C76FF 00ABE903 .Õ¯..v..v.ó^.&.w.&.7.F..P......F 000160
26681E00 86E98446 8800001A D29A9876 FF9A76FF 9276FF00 14E90375 00003D84 .=..u.Õ...v..v..v..ø....F.Õ...h& 000180
83182000 009A5016 FF36868D 5016A046 8D08C483 1A8D0046 9A5016FF 36868D01 ...6..P.F....ó..F..P..6..P... .. 0001A0
5EC45016 FF36868D 006AF446 FFF476FF FF2EB6FF FF30B6FF 8E76FF90 76FF08C4 ó..v..v..ÑO..Ñ...v¶.F¶j...6..Pó^ 0001C0
76FF9A76 FF9276FF 0014E903 7500003D 84468900 0018D69A 37FF2602 77FF2686 .&.w.&.7.ø....F.*..u.Õ...v..v..v 0001E0
```

Dump of file SATURN:[PCCOMMON.DUMP.DLL]DAENTDF.TMP;1 on 18-APR-1990 10:40:49.05
File ID (561,28,0) End of file block 116 / Allocated 116

Virtual block number 19 (00000013), 512 (0200) bytes

```
84468800 0017279A 9876FF9A 76FF9276 FFFF42E9 0017E984 46880000 1AE99A98 ..Ő....F.Ő..ŐB..v..v..v..'....F. 000000
0000E646 C70000FA 46C7D88E 1572881E 56570000 D8C80006 CAC95F5E 1F0000E9 Ő...^_èò..àÄ..WV.¡r..ÄúF*..úF|.. 000020
000407C7 260E5EC4 E84689EA 46890000 880000CA 46C70000 F446C700 00C846C7 úFà..ŰF¶..úFò..¡...Fő.FÒ6^.&ú... 000040
30D04689 00001599 9A5016FF 28868012 76FF1476 FF1676FF 00AE07C7 26065EC4 á^.&ú.Ü..v..v..v...(..P......FÅ= 000060
9A0A76FF 0C76FF01 9668216A 019636FF 26023406 8E006A00 6A0023E9 03750000 ..u.Ő#.j.j...4.&.6..j!h...v..v.. 000080
00003D00 46890000 15BA9A50 160E468D 1476FF16 76FF0889 E9D04688 00001BAE Ü....FÅÖ...v..v..FB.P.¤....FÅ=.. 0000A0
18ED9A0A 76FF0C76 FF019668 216A0196 36FF2602 34068E00 6A006A00 23E90375 u.Ő#.j.j...4.&.6..j!h...v..v..Ú. 0000C0
75000030 D0468900 0015DC9A 5016FF2C 86801476 FF1676FF 084BE9D0 46880000 ...FÅÖK..v..v...,..P.É....FÅ=..u 0000E0
001C2B9A 0A76FF0C 76FF0196 68216A01 9636FF26 0234068E 006A006A 0023E903 .Ő#.j.j...4.&.6..j!h...v..v..+.. 000100
E9037500 00300046 89000016 1E9A5016 E2468014 76FF1676 FF080CE9 D0468800 ..FÅÖ...v..v..Fő.P......FÅ=..u.Ő 000120
88000015 599A0A76 FF0C76FF 01966821 6A019636 FF260234 068E006A 006A0023 #.j.j...4.&.6..j!h...v..v..Y.... 000140
4B6A00AE 68E276FF E476FF00 00163F9A 5016F646 801476FF 1676FF07 CEE90046 FÅÖö..v..v..F−.P.7....vő.vähÜ.jK 000160
0EE90374 00003D04 C4831C9C 00A69A50 16FF3086 8D00001C 909A5016 FF308680 ..0..P.......0..P.Ì....á.=..t.Ő. 000180
9A5016D8 46804B6A 00AD68E2 76FFE476 FF0784E9 00008800 0307C726 0E5EC400 .á^.&ú...¡..Ő...vő.vähÜ.jK.FÄ.P. 0001A0
627F8326 F65EC400 32E90374 00003D04 C4831A7A 00A69A50 16D8468D 000014EA ő....FÄ.P.Ì.z..á.=..t.Ő2.á^-&..b 0001C0
5EC4C846 89486247 8826F65E C4000BE9 C8468962 47882 6F6 5EC4000D E9037400 .t.Ő..á^-&.Gb.FàŐ..á^-&.GbH.Fàá^ 0001E0
```

Dump of file SATURN:[PCCOMMON.DUMP.DLL]DAENTDF.TMP;1 on 18-APR-1990 10:40:49.05
File ID (561,28,0) End of file block 116 / Allocated 116

Virtual block number 20 (00000014), 512 (0200) bytes

```
E9037400 00300000 FFFF9A50 16E8468D 50160846 8D00A3E9 E6468962 478826F6 -&.Gb.FÌŐÉ..FÄ.P.FÒ.P.....=..t.Ő 000000
B800001D 999A0A76 FF0C76FF 01966823 6A019636 FF260234 068E006A 006A0023 #.j.j...4.&.6..j#h...v..v......| 000020
00E90374 00627F83 26F65EC4 0032E903 72624739 26E84688 F65EC406 EEE90000 ..ŐŸ.á^-.FÒ&9Gbr.Ő2.á^-&..b.t.Ő. 000040
62478826 F65EC4C8 46894862 478826F6 5EC4000B E9C84689 62478826 F65EC400 .á^-&.Gb.FàŐ..á^-&.GbH.Fàá^-&.Gb 000060
4689C846 890000B8 000CE903 7400EA7E 830015E9 037401E8 7E830028 E9E64689 .FÌŐ(..-Ő.t.Ő...-ő.t.Ő..¡...Fà.F 000080
01966811 6A019636 FF260234 068E006A 006AC846 89E64689 48E84688 000AE9E6 ÌŐ...FÒH.FÌ.Fàj.j...4.&.6..j.h.. 0000A0
0000FFFF 9A5052FF FFBA0000 B8DE76FF E076FF00 001DD49A 50521DA7 8A000088 ¡..¤Ì.RP.å....vÅ.vB¡..¤..RP..... 0000C0
0C76FF01 9668246A 019636FF 26023406 8E006A00 6A0023E9 03750000 30D04689 .FÅ=..u.Ő#.j.j...4.&.6..j$h...v. 0000E0
16F0468D 5016EC46 80025DE9 037400E6 7E830625 E9D04688 00001E97 9A0A76FF .v.......FÅŐ%..~Ì.t.Ő]..F$.P.Fþ. 000100
1F7F240A 9ADE76FF E076FFFF 2CB6FFFF 2EB6FF50 16FF3086 8D006A00 6A016A50 Pj.j.j...0..P.Ñ...Ñ,..vÅ.vB..$.. 000120
FF0000FF FF9A0A76 FF0C76FF 019668D0 76FF0022 E9037500 00300046 891AC483 .á..FÅ=..u.Ő"..vÅh...v..v....... 000140
E476FF01 70E90375 00627F83 26F65EC4 05C3E900 46880000 1EA29ADE 76FFE076 vÅ.vÑ.Å....FÅŐú.á^-&..b.u.Őp..vő 000160
FF9A5016 CC468D50 16FF7C86 8D5016FA 468DC876 FFFF2886 FFFF2A86 FFE276FF .vä.Ñ*..Ñ(..và.F*.P..|..P.Fä.P.. 000180
01966822 6A019636 FF260234 068E006A 006A002E E9037500 00300046 890000FF ....FÅ=..u.Ő..j.j...4.&.6..j"h.. 0001A0
FFE076FF 0557E900 46880000 1EF19ADE 76FFE076 FF00001E E69A0A76 FF0C76FF .v..v..Ì....vÅ.vB.þ....FÅŐW..vÅ. 0001C0
6A006A00 2EE90375 000030D0 46890000 12759A50 16064680 CC76FFCE 76FFDE76 vB.vő.vä.Fø.P.u....FÅ=..u.Ő..j.j 0001E0
```

Dump of file SATURN:[PCCOMMON.DUMP.DLL]DAENTDF.TMP;1 on 18-APR-1990 10:40:49.05
File ID (561,28,0) End of file block 116 / Allocated 116

Virtual block number 21 (00000015), 512 (0200) bytes

```
DE76FFE0 76FF0000 1F409A0A 76FF0C76 FF019668 226A0196 36FF2602 34068E00 ...4.&.6..j"h...v..v..a....vÅ.vB 000000
CC76FFCE 76FFDE76 FFE076FF 0054E903 740ED67E 830508E9 D0468800 001F489A .K....FÅŐ...~ø.t.ŐT..vÅ.vB.vő.vä 000020
26023406 8E006A00 6A002EE9 03750000 30D04689 0000194E 9A501602 4680036A j..Fø.P.N....FÅ=..u.Ő..j.j...4.& 000040
8800001F 839ADE76 FFE076FF 00001FA8 9A0A76FF 0C76FF01 9668226A 019636FF .6..j"h...v..v..'....vÅ.vB.".... 000060
F076FFF2 76FF016A 016AD456 89D24689 FF2E9688 FF2C8688 000EE904 AEE9D046 FÅŐÜ.Ő..........Fø.Vâj.j..v·.vþ 000080
6A002EE9 03750000 30D04689 10C48319 9424F99A DE76FFE0 76FF0276 FFD476FF .vå.vø.vÅ.vB.'$...á..FÅ=..u.Ő..j 0000A0
FFE076FF 0000202C 9A0A76FF 0C76FF01 9668266A 019636FF 26023406 8E006A00 .j...4.&.6..j&h...v..v.., ...vÅ. 0000C0
4689F256 8BF04688 000FE903 74EE4608 EC468804 46E9D046 88000020 379ADE76 vB.7 ...FÅŐF..F$.FŸt.Ő...Fþ.V·.F 0000E0
2886FFFF 2AB6FFE2 76FFE476 FFFE5689 FC4689EE 568BEC46 8B000CE9 FE5689FC =.V±Ő...F$.VŸ.F=.V±.vő.vä.Ñ*..Ñ( 000100
03750000 30D04689 00001A89 9AFC76FF FE76FF50 16FF3086 8DFA76FF E676FFFF ..vÌ.v*..0..P.v±.v=.¿....FÅ=..u. 000120
00001870 9A0A76FF 0C76FF01 9668276A 019636FF 26023406 8E006A00 6A002EE9 Ő..j.j...4.&.6..j'h...v..v..p... 000140
B6FFFF2A B6FFE276 FFE476FF 0364E903 C2E9D046 880000FF FF9ADE76 FFE076FF .vÅ.vB......FÅŐő.Őd..vő.vä.Ñ*..Ñ 000160
00003D00 46890000 1E6F9A50 16CC468D 5016FF7C 86805016 FA4680C8 76FFFF28 (..và.F*.P..|..P.Fä.P.o....FÅ=.. 000180
200D9A0A 76FF0C76 FF019668 216A0196 36FF2602 34068E00 6A006A00 2EE90375 u.Ő..j.j...4.&.6..j!h...v..v..î 0001A0
8DCC76FF CE76FFDE 76FFE076 FF0360E9 D0468800 0020E89A DE76FFE0 76FF0000 ...vÅ.vB.Ò ...FÅŐ'..vÅ.vB.vő.vä. 0001C0
9636FF26 0234068E 006A006A 002EE903 75000030 D0468900 001EBE9A 50160646 Fø.P.ƒ....FÅ=..u.Ő..j.j...4.&.6. 0001E0
```

Dump of file SATURN:[PCCOMMON.DUMP.DLL]DAENTDF.TMP;1 on 18-APR-1990 10:40:49.05
File ID (561,28,0) End of file block 116 / Allocated 116

Virtual block number 22 (00000016), 512 (0200) bytes

```
E9D0468B 00002142 9ADE76FF E076FF00 0021379A 0A76FF0C 76FF0196 68226A01 .j"h...v..v..7!...vÅ.vB.B!...FÅÕ 000000
189A5016 D2468003 6ACC76FF CE76FFDE 76FFE076 FF00A5E9 03740ED6 7E830311 ...-ø.t.ÕE..vÅ.vB.vö.väj..F@.P.. 000020
01966822 6A019636 FF260234 068E006A 006A002E E9037500 003D0046 8900001F ....FÅ=..u.Õ..j.j...4.&.6..j"h.. 000040
FFE076FF 02B7E9D0 46880000 21939ADE 76FFE076 FF000021 889A0A76 FF0C76FF .v..v...!...vÅ.vB..!...FÅÕñ..vÅ. 000060
6A002EE9 03750000 3D004689 000021B4 9A5016CA 468D026A CC76FFCE 76FFDE76 vB.vö.väj..Fò.P.Ç!...FÅ=..u.Õ..j 000080
FFE076FF 000021DC 9A0A76FF 0C76FF01 9668226A 019636FF 26023406 8E006A00 .j...4.&.6..j"h...v..v..É!...vÅ. 0000A0
4680146A CC76FFCE 76FFDE76 FFE076FF 005AE902 66E9D046 88000021 E79ADE76 vB.Õ!...FÅÕf.ÕZ..vÅ.vB.vö.väj..F 0000C0
019636FF 26023406 8E006A00 6A002EE9 03750000 3D004689 000017E4 9A5016CA ò.P.Õ....FÅ=..u.Õ..j.j...4.&.6.. 0000E0
12E9D046 88000022 5A9ADE76 FFE076FF 000022B4 9A0A76FF 0C76FF01 9668226A j"h...v..v..Ç"...vÅ.vB.Z"...FÅÕ. 000100
F0468D50 16EC4680 CA46FF00 03E90375 C84639E6 4688D246 89044689 0000B802 .|...Få.F@.F|9Fàu.Õ...Fò.Fš.P.Fþ 000120
9ADE76FF E076FFFF 2CB6FFFF 2EB6FF50 16FF3086 8DD276FF D476FFCA 76FF5016 .P.vò.vå.v@..0..P.Ñ...Ñ,..vÅ.vB. 000140
2B9A0A76 FF0C76FF 019668D0 76FF0022 E9037500 003D0046 891AC483 228B240A .$.".6..FÅ=..u.Õ"..vÅh...v..v..+ 000160
6A005DE9 0374D446 08D2468B 019FE9D0 46880000 228F9ADE 76FFE076 FF00001E ....vÅ.vB.e"...FÅÕ...F@.Fåt.Õ].j 000180
10C48322 E624F99A DE76FFE0 76FFFF2C B6FFFF2E B6FFF076 FFF276FF CA76FF01 ..vò.v·.vþ.Ñ...Ñ,..vÅ.vB."$|".6. 0001A0
0C76FF01 9668266A 019636FF 26023406 8E006A00 6A002EE9 03750000 3D004689 .FÅ=..u.Õ..j.j...4.&.6...j&h...v. 0001C0
76FF016A 0058E901 3AE9D046 88000023 1A9ADE76 FFE076FF 0000230F 9A0A76FF .v...#...vÅ.vB..#...FÅÕ:.ÕX.j..v 0001E0
```

Dump of file SATURN:[PCCOMMON.DUMP.DLL]DAENTDF.TMP;1 on 18-APR-1990 10:40:49.05
File ID (561,28,0) End of file block 116 / Allocated 116

Virtual block number 23 (00000017), 512 (0200) bytes

```
003DD046 8910C483 1E0E24F9 9ADE76FF E076FFD2 76FFD476 FFF076FF F276FFCA ò.v·.vþ.vå.v@.vÅ.vB."$...6..FÅ=. 000000
939A0A76 FF0C76FF 01966826 6A019636 FF260234 068E006A 006A002E E9037500 .u.Õ..j.j...4.&.6..j&h...v..v... 000020
88000FE9 0374EE46 08EC468B 000FE9D0 46880000 239E9ADE 76FFE076 FF000023 #...vÅ.vB..#...FÅÕÕ..Fš.FŸt.Õ... 000040
E276FFE4 76FFFE56 89FC4689 EE5688EC 4688000C E9FE5689 FC4689F2 5688F046 Fþ.V·.F=.V±Õ...Fš.VŸ.F=.V±.vÕ.vã 000060
89000020 049AFC76 FFFE76FF 5016FF30 868DFA76 FFE676FF FF2886FF FF2A86FF .Ñ*..Ñ(..v|.v*..0..P.v±.v=.. ... 000080
FF0C76FF 01966827 6A019636 FF260234 068E006A 006A002E E9037500 003DD046 FÅ=..u.Õ..j.j...4.&.6..j'h...v.. 0000A0
FF9ADE76 FFE076FF 005BE9D0 46880000 1E369ADE 76FFE076 FF00001D 0B9A0A76 v.......vÅ.vB.6....FÅÕ[..vÅ.vB.. 0000C0
C7260E5E C46247FF 26F65EC4 003FE9D0 46880006 E9037500 003DD046 890000FF ....FÅ=..u.Õ...FÅÕ?.6^-&.Gb6^.&ú 0000E0
FF000023 F99A00A1 681476FF 1676FF00 0023EB9A 00A06814 76FF1676 FF000307 ....v..v.h...Š#...v..v.hÅ..*#... 000100
56570000 02C80012 CAC95F5E 1F0000E9 D0468B00 00FFFF9A 009F6814 76FF1676 v..v.h........FÅÕ...^_èò..à...WV 000120
07892602 47892600 0088185E C4078926 02478926 0000881C 5EC4D88E 1802881E .|...Ä6^.|..&.G.&..6^¯.|..&.G.&.. 000140
FF0C76FF 0676FF08 76FF00A8 E9037500 003D04C4 831C6400 A69A0E76 FF1076FF .v..v..ǐ.d..6.=..u.Õ´..v..v..v.. 000160
00FFFF9A 006A1C76 FF1E76FF 0E76FF10 76FF1876 FF1A76FF 1276FF14 76FF0A76 v..v..v..v..v..v..v..v..v.j..... 000180
30E90374 02470826 078B261C 5EC40072 E9FE468B 0006E903 7500003D FE468900 ..F±=..u.Õ...F±Õr.6^.&..&.G.t.Õ0 0001A0
FE468900 0024D99A 50161646 8D146A37 FF260277 FF26185E C40676FF 0876FF00 ..v..v.6^.&.w.&.7j..F..P.)$...F± 0001C0
FF260277 FF261C5E C40676FF 0876FF00 2DE90036 E9FE468B 0006E903 7500003D =..u.Õ...F±Õ6.Õ-..v..v.6^.&.w.&. 0001E0
```

Dump of file SATURN:[PCCOMMON.DUMP.DLL]DAENTDF.TMP;1 on 18-APR-1990 10:40:49.05
File ID (561,28,0) End of file block 116 / Allocated 116

Virtual block number 24 (00000018), 512 (0200) bytes

```
46880006 E9FE468B 0006E903 7500003D FE468900 00FFFF9A 50161646 8D026A37 7j..F..P......F±=..u.Õ...F±Õ...F 000000
0676FF08 76FF0000 EC46C7D8 8E2412B8 1E565700 001AC8C8 C95F5E1F 0000E9FE ±Õ...^_èùà...WV.|.$.ÄüFš...v..v. 000020
70E9EA46 880006E9 03750000 3DEA4689 000020B5 9A5016F2 46800A76 FF0C76FF .v..v..F·.P.ç ...Fõ=..u.Õ...FõÕþ 000040
26639A50 16F8468D 156A0A76 FF0C76FF 0676FF08 76FF0115 E9037402 F27E8302 ..-·.t.Õ...v..v..v..v.j..F½.P.c& 000060
E9F65689 F44689FA 568BF846 8B023EE9 EA468800 06E90375 000030EA 46890000 ...Fõ=..u.Õ...FõÕ>..F½.V*.F¶.V-Õ 000080
FF26F45E C40676FF 0876FF00 B6E90375 02470826 078826F4 5EC404F4 46830004 ...F¶.6^¶&..&.G.u.ÕÑ..v..v.6^¶&. 0000A0
FF0876FF 0017E903 75000030 EA468900 0026F09A 5016EC46 8D146A37 FF260277 w.&.7j..Fš.P.Þ&...Fõ=..u.Õ...v.. 0000C0
5EC4006A E90373EC 46391246 8801DEE9 EA468800 00262E9A F876FFFA 76FF0676 v..v*.v½..&...FõÕB..F.9Fšs.Õj.6^ 0000E0
06E90374 01147E83 0050E903 75025739 260009E9 03740739 2610568B 0E4688F4 ¶.F..V.&9.t.Õ..&9W.u.ÕP..-..t.Õ. 000100
16EC468D 146A37FF 260277FF 26F45EC4 0676FF08 76FFEC4E FF0003E9 EC46FF00 ..FšÕ...Nš.v..v.6^¶&.w.&.7j..Fš. 000120
26489AF8 76FFFA76 FF0676FF 0876FF00 17E90375 00003DEA 46890000 27619A50 P.a'...Fõ=..u.Õ...v..v..v*.v½.H& 000140
FF014CE9 000026CE 9AF876FF FA76FF06 76FF0876 FFFF37E9 0169E9EA 46880000 ...FõÕi.Õ7..v..v..v*.v½.ö&..ÕL.. 000160
E9037500 0030EA46 89000017 959A5016 EE468D08 6A0A76FF 0C76FF06 76FF0876 v..v..v..v.j..FŸ.P......Fõ=..u.Õ 000180
8826E65E C404E646 830004E9 E85689E6 4689F056 88EE4688 0129E9EA 46880006 ...FõÕ)..FŸ.Vþ.F|.VÒÕ...F|.6^l&. 0001A0
16FC4680 046A37FF 260277FF 26E65EC4 0676FF08 76FF00F0 E9037502 470B2607 .&.G.u.Õþ..v..v.6^l&.w.&.7j..F=. 0001C0
270C9AEE 76FFF076 FF0676FF 0876FF00 17E90375 00003DEA 46890000 210F9A50 P..!...Fõ=..u.Õ...v..v..vþ.vŸ..' 0001E0
```

```
Dump of file SATURN:[PCCOMMON.DUMP.DLL]DAENTDF.TMP;1 on 18-APR-1990 10:40:49.05
File ID (561,28,0)   End of file block 116 / Allocated 116

Virtual block number 25 (00000019), 512 (0200) bytes

 9A5016EC 468D026A 37FF2602 77FF26E6 5EC40676 FF0876FF 00C9E9EA 468B0000 ...Fõõè..v..v.á^I&.w.&.7j..F$.P. 000000
 0000277D 9AEE76FF F076FF06 76FF0876 FF0017E9 03750000 3DEA4689 00002160 '!...Fõ=..u.Õ...v..v..vÞ.vŸ.}'.. 000020
 390008E9 0374FC46 39105688 0E468800 66E90373 EC463912 46880088 E9EA4688 .Fõõ...F.9F$s.Õf..F..V.9F=t.Õ..9 000040
 C40676FF 0876FFEC 4EFF0003 E9EC46FF 0006E903 7401147E 830050E9 0375FE56 V±u.ÕP..~..t.Õ...F$Õ...N$.v..v.á 000060
 0017E903 7500003D EA468900 0024A99A 5016EC46 8D026A37 FF260277 FF26E65E ^I&.w.&.7j..F&.P.`$...Fõ=..u.Õ.. 000080
 0676FF08 76FFFEFD E9001AE9 EA468800 0027979A EE76FFF0 76FF0676 FF0876FF .v..v..vÞ.vŸ..'...Fõõ..Õ=±.v..v. 0000A0
 2501B81E 56570000 04C8CBC9 5F5E1F00 00E9EA46 88000018 009AEE76 FFF076FF .vÞ.vŸ......Fõõ...^_èùà...WV.|.% 0000C0
 0A5EC400 0FE9037F 0E763900 17E90375 00388026 0A5EC446 0001E900 008ED88E .Ä/..Õ..Fá^.&.8.u.Õ¯.9v...Õ..á^. 0000E0
 01C62606 5EC4000A E9037F0E 7E394700 01E9FE88 FFDCE900 8826065E C4008A26 &..á^.&..Õé..±Õ..G9-...Õ..á^.&6. 000100
 08468E06 5E030E5E 88000EE9 037500FF 7F802608 468E065E 030E5E88 FFEDE900 .ÕÜ..^..^..F.&....u.Õ...^..^..F. 000120
 0000FE46 C7D88E27 AE881E56 57000132 C8CBC95F 5E1F0000 E9C68800 FF47C626 &6G...6Õ...^_èùà2..WV.|Û'.ÄúF±.. 000140
 5EC49246 89944689 00008800 00FF7286 C7000090 46C70000 EA46C700 008E46C7 úF...úFõ..úF¯..ú.r...|...F..F.á^ 000160
 16FECE86 8D1276FF 1476FF16 76FF0098 46C600AE 07C72606 5EC40004 07C7260E .&ú...á^.&ú.Û.6F...v..v..v...ö±. 000180
 8D1476FF 1676FF11 56E9FF78 86880007 E9037500 003DFF78 86890000 18489A50 P.H.....x.=..u.Õ....x.ÕV..v..v.. 0001A0
 FF1676FF 1133E9FF 78868800 07E90375 00003DFF 78868900 001B869A 50168646 F..P.......x.=..u.Õ....x.Õ3..v.. 0001C0
 110FE9FF 78868800 07E90375 00003DFF 78868900 001BC59A 5016FED2 868D1476 v...Ø±.P.é.....x.=..u.Õ....x.Õ.. 0001E0

Dump of file SATURN:[PCCOMMON.DUMP.DLL]DAENTDF.TMP;1 on 18-APR-1990 10:40:49.05
File ID (561,28,0)   End of file block 116 / Allocated 116

Virtual block number 26 (0000001A), 512 (0200) bytes

 FF78868B 0007E903 7500003D FF788689 00001C03 9A50168A 468D1476 FF1676FF .v..v..F..P.......x.=..u.Õ....x. 000000
 6A016568 00B0688A 76FF8C76 FF00001C 419A5016 FA468D14 76FF1676 FF10ECE9 Õ$..v..v..F*.P.A....v..v.h¯.he.j 000020
 000307C7 260E5EC4 000EE903 74FFEC7E 83EC4689 0000294C 9A006A00 6A006A00 .j.j.j..L)...F$.-&.t.Õ..á^.&ú... 000040
 00001A0B 9A006A00 6AEC76FF 006A016A 68008068 8A76FF8C 76FF10A9 E90000B8 |..Õ`..v..v.h¯.hj.j..v$j.j...... 000060
 00763E83 00001C57 9A5016FE D6868D4B 6A00AE68 8A76FF8C 76FFF056 89EE4689 .FŸ.VÞ.v..v.hÛ.jK..Ø±.P.W....>v. 000080
 89000025 9D9A5016 FF22868D 026AEE76 FFF076FF 8676FF88 76FF027E E9037401 .t.Õ-..v..v..vÞ.vŸj..."..ı..X... 0000A0
 7C9A5016 FF22868D 5016FED6 868D103D E9FF7886 880007E9 03750000 3DFF7886 .x.=..u.Õ....x.Õ=...Ø±.P..  .P.| 0000C0
 01966811 6A019636 FF260234 068E006A 006A0187 E9037500 003D08C4 832A5900 .Y*.á.=..u.Õ..j.j...4.&.6..,.ı.. 0000E0
 00001DAC 9A50521D 94BA0000 B88676FF 8876FF00 00208E9A 505229E7 BA0000B8 |..¤Õ)RP.. ...v..v.|..¤..RP.¯... 000100
 6AEE76FF F076FF86 76FF8876 FF0FDCE9 FF78868B 0007E903 7500003D FF788689 ..x.=..u.Õ....x.ÕÉ..v..v..vÞ.vŸj 000120
 FF019668 FF7886FF 0024E903 7500003D FF788689 00002612 9A5016FE D6868D02 ...Ø±.P..&....x.=..u.Õ$..Ñx.h... 000140
 012A681E 0F93E9FF 78868800 002AAD9A 8676FF88 76FF0000 2AA29A0A 76FF0C76 v..v..Å*...v..v..Ü*....x.Õ...h*. 000160
 83243900 009A5016 FF22868D 5016FED6 868D08C4 832A6D00 469A5016 FF22868D .."..P.F.m*.á...Ø±.P..".P...9$. 000180
 7500003D FF788689 0000FFFF 9AEC76FF FECEB6FF FED0B6FF 8A76FF8C 76FF08C4 á..v..v..ÑÅ±.Ñö±.v$.......x.=..u 0001A0
 0020999A 8676FF88 76FF0000 224F9A0A 76FF0C76 FF019668 FF7886FF 0024E903 .Õ$..Ñx.h...v..v..O"...v..v... . 0001C0
 16FF2286 8D006AEC 76FFFECE B6FFFED0 B6FF8A76 FF8C76FF 0F27E9FF 78868800 ...x.Õ'..v..v..ÑÅ±.Ñö±.v$j...".. 0001E0

Dump of file SATURN:[PCCOMMON.DUMP.DLL]DAENTDF.TMP;1 on 18-APR-1990 10:40:49.05
File ID (561,28,0)   End of file block 116 / Allocated 116

Virtual block number 27 (0000001B), 512 (0200) bytes

 419A8676 FF8876FF 0012E903 7500003D FF788689 0000236B 9AEE76FF F076FF50 P.vÞ.vŸ.k#....x.=..u.Õ...v..v..A 000000
 A1681476 FF1676FF 00002812 9A00A068 1476FF16 76FF0EE5 E9FF7886 8800002A *....x.Õ!..v..v.h....+...v..v.hÀ 000020
 89000023 AF9A8676 FF8876FF 000023DD 9A009F68 1476FF16 76FF0000 28209A00 .. +...v..v.h...Ý#...v..v..£#... 000040
 681E00AE 688A76FF 8C76FF00 3EE90E9D E9FF7886 880007E9 03750000 3DFF7886 .x.=..u.Õ....x.Õ..Õ>..v..v.hÛ..h 000060
 688A76FF 8C76FF00 002C999A 012F681E 00AD688A 76FF8C76 FF00002B 659A012E ...e+...v..v.hÙ..h/...,...v..v.h 000080
 002BA49A 00AD688A 76FF8C76 FF00002C 149A006A 006AEC76 FF006A01 646800B0 ¯.hd.j..v$j.j...,...v..v.hÙ..Ê+. 0000A0
 002BC49A 016A5052 00002BBB 9A00B168 8A76FF8C 76FF0000 2BAD9A01 6A505200 .RPj..Ù+...v..v.hŸ..£+..RPj..á+. 0000C0
 DA688A76 FF8C76FF 00002BD8 9A016A50 5200002B D29A00B3 688A76FF 8C76FF00 ..v..v.h*..Ø+..RPj..Ù+...v..v.hÖ 0000E0
 78868800 0307C726 0E5EC400 00007606 C700002C 2B9A016A 50520000 2C229A00 ..",..RPj..+,..ú.v...á^.&ú.....x 000100
 6AEC76FF 006A0164 68008068 8A76FF8C 76FF00C5 E9037401 00743E83 00EBE9FF .Õ$..>t..t.Õé..v..v.h¯.hd.j..v$j 000120
 FF00002C 429A016A 50520000 2C399A00 AE688A76 FF8C76FF 00002918 9A006A00 .j...)...v..v.hÛ..9,..RPj..B,... 000140
 9A00B168 8A76FF8C 76FF0000 2C599A01 6A505200 002C509A 00AD688A 76FF8C76 v..v.hÙ..P,..RPj..Y,...v..v.hŸ.. 000160
 9A016A50 5200002C 7E9A00B3 688A76FF 8C76FF00 002C709A 016A5052 00002C67 g,..RPj..p,...v..v.h*..~,..RPj.. 000180
 76FF8C76 FF000014 519A016A 50520000 14489A00 DA688A76 FF8C76FF 00002C87 .,...v..v.hÖ..H...RPj..Q....v..v 0001A0
 C7000004 589A0131 681E00A0 688A76FF 8C76FF00 002CAB9A 0130681E 00AE688A .hÙ..h0..¨,...v..v.hÙ..h1..X...ú 0001C0
 868D4B6A 00AD688A 76FF8C76 FF0D1CE9 00008800 0307C726 0E5EC400 00007406 .t...á^.&ú...|..Õ...v..v.hÙ.jK.. 0001E0
```

```
Dump of file SATURN:[PCCOMMON.DUMP.DLL]DAENTDF.TMP;1 on 18-APR-1990 10:40:49.05
File ID (561,28,0)   End of file block 116 / Allocated 116

Virtual block number 28 (0000001C), 512 (0200) bytes

06E90374 00003000 001CE69A 50169246 8D5016FF 7C868D00 0029689A 5016FF7C |..P.h)....|..P.F..P.]...=..t.ó. 000000
92463800 08E90373 001AE903 7694563B D22B6247 8826FA5E C40CE8E9 00008800 .j..ðð.á^*&.Gb+Ø;V.v.Õ..s.Õ..;F. 000020
268E468B FA5EC48E 46894892 46880007 E98E4689 62478B26 FA5EC400 00E90372 r.Õ..á^*&.Gb.F.Õ...F.H.F.á^*.F.& 000040
5016FE46 8D50488E 4688FECE B6FFFED0 B6FF8A76 FF8C76FF 003EE903 74624739 9Gbt.Õ>..v..v..ÑÅ±.Ñö±.F.HP.F±.P 000060
FF78868B 0007E903 7500003D FF788689 00002D98 9A5016F6 46805016 FF22868D .."..P.F-.P..-....x.=..u.Õ....x. 000080
FF22868D 5016FE46 808E76FF FECEB6FF FED0B6FF 8A76FF8C 76FF0039 E90C6CE9 Õl.Õ9..v..v..ÑÅ±.Ñö±.v..F±.P..". 0000A0
FF0C30E9 FF78868B 0007E903 7500003D FF788689 00002066 9A5016F6 46805016 .P.F-.P.f ....x.=..u.Õ....x.ÕÕ.. 0000C0
07E90375 00003DFF 78868900 00251C9A 50169646 80EE76FF F076FF86 76FF8876 v..v..vÞ.vŸ.F..P..%....x.=..u.Õ. 0000E0
8E800253 E90374F0 5639025B E90374EE 4639F856 8BF6468B 0C07E9FF 78868B00 ...x.Õ...F-.V¼9FŸt.Õ[.9VÞt.ÕS..ƒ 000100
7400003D 08C4832E 47007C9A 5016FED6 86805016 FF25868D 0040E903 742CFF24 $.,t.Õã...%..P..ø±.P.|.G..á.=..t 000120
50169846 8D5016FF 22868D04 6A0BBCE9 FF78868B 000307C7 260E5EC4 000FE903 .Õ..á^.&ú.....x.Õ¥.j..."..P.F..P 000140
7400003D 08C48329 B1007C9A 5016FED6 86805016 FF22868D 0AC48322 3227A69A .|'2".á..."..P..ø±.P.|.Ý).á.=..t 000160
FF002FE9 03740E96 7E8301DB E90B7CE9 FF78868B 000307C7 260E5EC4 0012E903 .Õ..á^.&ú.....x.Õ|.ÕÚ..~..t.Õ/.. 000180
7500003D FF788689 0000305E 9A5016FF 6E868D04 6AEE76FF F076FF86 76FF8876 v..v..vÞ.vŸj...n..P.^0....x.=..u 0001A0
006A006A FF709689 FF6E8689 F05688EE 4688000E E90844E9 FF78868B 0007E903 .Õ....x.ÕÕ.Õ...FŸ.VÞ..n...p.j.j. 0001C0
76FF8876 FF000029 D99A5052 2ED5BA00 00B80196 68116A01 9636FF26 0234068E ..4.&.6..j.h..¡..¤(.RP.})...v..v 0001E0

Dump of file SATURN:[PCCOMMON.DUMP.DLL]DAENTDF.TMP;1 on 18-APR-1990 10:40:49.05
File ID (561,28,0)   End of file block 116 / Allocated 116

Virtual block number 29 (0000001D), 512 (0200) bytes

EEE9FF78 86880007 E9037500 003DFF78 86890000 29EC9A50 5229D4BA 00008886 .¡..¤å)RP.š)....x.=..u.Õ....x.ÕŸ 000000
FF788689 00002A18 9A5016FE D6868D02 6AFF6EB6 FFFF70B6 FF8676FF 8876FF0A ..v..v..Ñp..Ñn.j...ø±.P..*....x. 000020
8676FF88 76FF0000 2A369A0A 76FF0C76 FF019668 FF78B6FF 0024E903 7500003D =..u.Õ$..Ñx.h...v..v..6*...v..v. 000040
2A849AEC 76FFFECE B6FFFED0 B6FF8A76 FF8C76FF 0AA3E9FF 78868B00 002F659A .e/....x.ÕÈ..v..v..ÑÅ±.Ñö±.vš..* 000060
0A6FE9FF 78868B00 002FC39A 8676FF88 76FF0012 E9037500 003DFF78 86890000 ....x.=..u.Õ...v..v..û/....x.Õo. 000080
FF8C76FF 08C4832E 0700009A 50169846 8D5016FE D6868D00 58E90375 0098 7E80 .~..u.ÕX...ø±.P.F..P......á..v.. 0000A0
00002FF2 9AEE76FF F076FF50 1698468D FE76FF8E 76FFFECE B6FFFED0 B6FF8A76 v..ÑÅ±.Ñö±.v..v±.F..P.vÞ.vŸ.·/.. 0000C0
43E90A11 E9FF7886 88000030 099A8676 FF8876FF 0012E903 7500003D FF788689 ..x.=..u.Õ...v..v...0....x.Õ..ÕC 0000E0
76FFF076 FF5016FE D6868DFE 76FF8E76 FFFECEB6 FFFED0B6 FF8A76FF 8C76FF00 ..v..v..ÑÅ±.Ñö±.v..v±..ø±.P.vÞ.v 000100
78868B00 002AEF9A 8676FF88 76FF0012 E9037500 003DFF78 86890000 2AD89AEE Ÿ.Ä*....x.=..u.Õ...v..v..ÿ*....x 000120
E9FF7886 880007E9 03750000 30FF7886 8900002B 289A8676 FF8876FF 09CBE9FF .Õù..v..v..++....x.=..u.Õ....x.Õ 000140
8676FF88 76FF0089 E903740E 967E8309 9EE9FF78 86880003 07C7260E 5EC409AD Ù.á^.&ú.....x.Õ...~..t.Õ¿..v..v. 000160
86880007 E9037500 003DFF78 86890000 30859A50 1682468D 036AEE76 FFF076FF .vÞ.vŸj..F..P.çO....x.=..u.Õ.... 000180
78868900 0030E39A 5016EA46 8D026AEE 76FFF076 FF8676FF 8876FF09 6AE9FF78 x.Õj..v..v..vÞ.vŸj..FÕ.P.DO....x 0001A0
868D046A EE76FFF0 76FF8676 FF8876FF 093FE9FF 78868B00 07E90375 00003DFF .=..u.Õ....x.Õ?..v..v..vÞ.vŸj... 0001C0
FF8876FF 0913E9FF 78868B00 07E90375 00003DFF 78868900 0031C59A 5016FF6E n..P.é1....x.=..u.Õ....x.Õ...v.. 0001E0

Dump of file SATURN:[PCCOMMON.DUMP.DLL]DAENTDF.TMP;1 on 18-APR-1990 10:40:49.05
File ID (561,28,0)   End of file block 116 / Allocated 116

Virtual block number 30 (0000001E), 512 (0200) bytes

03750000 30FF7886 89000031 259A5016 FF22868D 026AFF6E 86FFFF70 B6FF8676 v..Ñp..Ñn.j..."..P.%1....x.=..u. 000000
56898246 89FED496 88FED286 880078E9 0002FF7A 86C708E5 E9FF7886 880007E9 Õ....x.Õ1.ú.z...Õ(...ø±..å±.F..V 000020
00003DFF 78868900 0031619A 5016EA46 8D146AEE 76FFF076 FF8676FF 8876FF84 ..v..v..vÞ.vŸj..Fõ.P.a1....x.=.. 000040
8676FF88 76FFFF70 9689FF6E 8689F056 88EE468B 08A3E9FF 78868B00 07E90375 u.Õ....x.ÕÈ..FŸ.VÞ..n...p..v..v. 000060
07E90375 00003DFF 78868900 0031F09A 5016FF22 868D026A FF6E86FF FF70B6FF .Ñp..Ñn.j..."..P.Þ1....x.=..u.Õ. 000080
9A5016E8 468DF676 FFF876FF 8676FF88 76FF0014 FF7A86C7 0867E9FF 78868B00 ...x.Õg.ú.z....v..v..v½.v~.FÕ.P. 0000A0
005AE903 740EE87E 830838E9 FF78868B 0007E903 7500003D FF788689 00002DC1 è-....x.=..u.Õ....x.Õ8..~Õ.t.ÕZ. 0000C0
00003DFF 78868900 0026829A 5016FF74 868D036A F676FFF8 76FF8676 FF8876FF .v..v..v½.v~j...t..P.ý&....x.=.. 0000E0
9A501690 468D026A F676FFF8 76FF8676 FF8876FF 0803E9FF 78868B00 07E90375 u.Õ....x.Õ...v..v..v½.v~j..F..P. 000100
968BFED2 86880038 E907D8E9 FF78868B 0007E903 7500003D FF788689 00002988 .)....x.=..u.Õ....x.ÕÄ.Õ;...ø±.. 000120
30899A50 1690468D 146AF676 FFF876FF 8676FF88 76FFFF76 9689FF74 8689FED4 å±..t...v..v..v..v½.v~j..F..P..0 000140
748639FF 709688FF 6E868B07 9AE9FF78 86880007 E9037500 003DFF78 86890000 ....x.=..u.Õ....x.Õ....n...p.9.t 000160
9668296A 019636FF 26023406 8E006A00 6A0024E9 0374FF76 9639002D E90374FF .t.Õ-.9.v.t.Õ$.j.j...4.&.6..j)h. 000180
03748246 39FF7696 88FF7486 88075CE9 FF78868B 000032B6 9A0A76FF 0C76FF01 ..v..v..Ñ2....x.Õ\...t...v.9F.t. 0001A0
00008801 9668116A 019636FF 26023406 8E006A00 6A0287E9 03748456 39028FE9 Õ..9V.t.Õ..j.j...4.&.6..j.h..¡.. 0001C0
78868900 0035509A 50523538 BA0000B8 8676FF88 76FF0000 35309A50 5232C4BA ¤62RP.=5...v..v.|..¤85RP.P5....x 0001E0
```

```
Dump of file SATURN:[PCCOMMON.DUMP.DLL]DAENTDF.TMP;1 on 18-APR-1990 10:40:49.05
File ID (561,28,0)   End of file block 116 / Allocated 116

Virtual block number 31 (0000001F), 512 (0200) bytes

 FF7AB6FF EE76FFF0 76FF8676 FF8876FF 06FFE9FF 78868800 07E90375 00003DFF .=..u.Õ....x.Õ...v..v..vÞ.vŸ.Ñz. 000000
 0C76FF01 9668FF78 B6FF0024 E9037500 003DFF78 86890000 33F59A50 1690468D .F..P.%3....x.=..u.Õ$..Ñx.h...v. 000020
 EA463990 468B06B5 E9FF7886 88000033 6F9A8676 FF8876FF 00003413 9A0A76FF .v...4...v..v..o3....x.Õç..F.9Fö 000040
 76FF9676 FF9076FF EA76FF82 76FF8476 FFFF6EB6 FFFF7086 FF016A00 48E90377 w.ÕH.j..Ñp..Ñn..v..v..võ.v..v..v 000060
 B79A8676 FF8876FF 0012E903 7500003D FF788689 14C48333 9F41B39A 8676FF88 ..v..*A.3.á...x.=..u.Õ...v..v..ñ 000080
 9076FF82 76FF8476 FFFF6EB6 FFFF70B6 FF006A00 45E90665 E9FF7886 88000033 3....x.Õe.ÕE.j..Ñp..Ñn..v..v..v. 0000A0
 0012E903 7500003D FF788689 14C4832E 3341B39A 8676FF88 76FF9676 FFEA76FF .võ.v..v..v..*A3..á...x.=..u.Õ.. 0000C0
 7C9A5016 FED6868D 5016FF22 86800610 E9FF7886 88000034 1E9A8676 FF8876FF .v..v...4....x.Õ....".P..ø±.P.| 0000E0
 868D026A FF6EB6FF FF70B6FF 8676FF88 76FF004B E9037500 003D08C4 83347400 .t4.á.=..u.ÕK..v..v..Ñp..Ñn.j... 000100
 FF0C76FF 019668FF 7886FF00 24E90375 00003DFF 78868900 002F089A 5016FED6 ø±.P../....x.=..u.Õ$..Ñx.h...v.. 000120
 FF8A76FF 8C76FF05 B6E9FF78 86880000 34529A86 76FF8876 FF000035 9C9A0A76 v...5...v..v..R4....x.ÕÑ..v..v.. 000140
 76FF8876 FF0012E9 03750000 3DFF7886 8900002F 4E9AEC76 FFFECEB6 FFFED0B6 ÑÁ±.Ñö±.v$.N/....x.=..u.Õ...v..v 000160
 1698468D 5016FED6 86800058 E9037500 987E8005 82E9FF78 86880000 34B09A86 ..¯4....x.Õ...~..u.ÕX...ø±.P.F.. 000180
 984680FE 76FF8E76 FFFECEB6 FFFED0B6 FF8A76FF 8C76FF08 C4832F87 00009A50 P..../.á..v..v..ÑÁ±.Ñö±.v..v±.F. 0001A0
 9A8676FF 8876FF00 12E90375 00003DFF 78868900 0034DF9A EE76FFF0 76FF5016 .P.vÞ.vŸ.Õ4....x.=..u.Õ...v..v.. 0001C0
 FF8E76FF FECEB6FF FED0B6FF 8A76FF8C 76FF0043 E90524E9 FF78868B 000034F6 -4....x.Õ$.ÕC..v..v..ÑÁ±.Ñö±.v.. 0001E0

Dump of file SATURN:[PCCOMMON.DUMP.DLL]DAENTDF.TMP;1 on 18-APR-1990 10:40:49.05
File ID (561,28,0)   End of file block 116 / Allocated 116

Virtual block number 32 (00000020), 512 (0200) bytes

 FF0012E9 03750000 3DFF7886 8900002F AC9AEE76 FFF076FF 5016FED6 868DFE76 v±..ø±.P.vÞ.vŸ.¯/....x.=..u.Õ... 000000
 FF788689 0000301B 9A8676FF 8876FF04 DEE9FF78 86880000 35A79A86 76FF8876 v..v..ï5....x.ÕB..v...v...0....x. 000020
 6A019636 FF260234 068E006A 006A0484 E904C0E9 FF78868B 0007E903 7500003D =..u.Õ....x.Õá.Õ..j.j...4.£.6..j 000040
 9A50522E C28A0000 888676FF 8876FF00 002EC79A 5052354B 8A000088 01966811 .h..|..¤K5RP.ú....v..v.|..¤ó.RP. 000060
 70B6FF86 76FF8876 FF0478E9 FF78868B 0007E903 7500003D FF788689 00002EDA Õ.....x.=..u.Õ....x.Õx..v..v..Ñp 000080
 B6FF0024 E9037500 003DFF78 86890000 FFFF9A50 16FED686 8D026AFF 6EB6FFFF ..Ñn.j...ø±.P.......x.=..u.Õ$..Ñ 0000A0
 E9FF7886 8800002F 319A8676 FF8876FF 00002F26 9A0A76FF 0C76FF01 9668FF78 x.h...v..v..&/...v..v..1/....x.Õ 0000C0
 335724F9 9A8676FF 8876FF82 76FF8476 FFFF6EB6 FFFF70B6 FFEA76FF 006A042D -.j..võ.Ñp..Ñn..v..v..v..v..'$W3 0000E0
 EEE9FF78 86880000 331F9A86 76FF8876 FF0012E9 03750000 3DFF7886 8910C483 .á...x.=..u.Õ...v..v...3....x.ÕŸ 000100
 3DFF7886 890000FF FF9AEE76 FFF076FF 8676FF88 76FF01BF E903740E 967E8303 ..~..t.Õ¢..v..v..vÞ.vŸ.......x.= 000120
 9A8676FF 8876FF00 00367E9A 0A76FF0C 76FF0196 68FF7886 FF0024E9 03750000 ..u.Õ$..Ñx.h...v..v..~6...v..v.. 000140
 B6FFFF76 B6FF8676 FF8876FF 0089E903 740EE87E 8303A4E9 FF78868B 00003689 .6....x.ÕÈ..~Ò.t.Õ¿..v..v..Ñv..Ñ 000160
 0024E903 7500003D FF788689 000037D5 9A5016E4 468DFF6E B6FFFF70 B6FFFF74 t..Ñp..Ñn..Fõ.P.ï7....x.=..u.Õ$. 000180
 78868B00 0036E39A 8676FF88 76FF0000 36D89A0A 76FF0C76 FF019668 FF78B6FF .Ñx.h...v..v..Ä6...v..v..D6....x 0001A0
 FFE676FF 8676FF88 76FF9046 FF0003E9 03746247 39268E46 88FA5EC4 034BE9FF .ÕK.á^'.F.&9Gbt.Õ...F..v..v..vì. 0001C0
 9668FF78 B6FF0024 E9037500 003DFF78 86890000 37749A50 1690468D 026AE476 võj..F..P.t7....x.=..u.Õ$..Ñx.h. 0001E0

Dump of file SATURN:[PCCOMMON.DUMP.DLL]DAENTDF.TMP;1 on 18-APR-1990 10:40:49.05
File ID (561,28,0)   End of file block 116 / Allocated 116

Virtual block number 33 (00000021), 512 (0200) bytes

 468B02F1 E9FF7886 88000037 419A8676 FF8876FF 00003736 9A0A76FF 0C76FF01 ..v..v..67...v..v..A7....x.Õþ..F 000000
 70B6FF15 6AFED2B6 FFFED4B6 FF8676FF 8876FF00 B9E9F456 89F24689 E6568BE4 õ.Vì.F·.V¶Õ¿..v..v..ÑÁ±.Ñø±j..Ñp 000020
 FF019668 FF78B6FF 0024E903 7500003D FF788689 0000FFFF 9A0A6AFF 6EB6FFFF ..Ñn.j........x.=..u.Õ$..Ñx.h... 000040
 88FA5EC4 0293E9FF 78868B00 0037909A 8676FF88 76FF0000 37929A0A 76FF0C76 v..v...7...v..v...7....x.Õ..á^'. 000060
 468D146A FF6EB6FF FF70B6FF 8676FF88 76FF9046 FF0003E9 03746247 39268E46 F.&9Gbt.Õ...F..v..v..Ñp..Ñn.j..F 000080
 76FF0C76 FF019668 FF78B6FF 0024E903 7500003D FF788689 0000382F 9A501690 ..P./8....x.=..u.Õ$..Ñx.h...v..v 0000A0
 FF709688 FF6E868B 0237E9FF 78868B00 0037FE9A 8676FF88 76FF0000 37F39A0A ..µ7...v..v..±7....x.Õ7...n...p. 0000C0
 8DFF6EB6 FFFF70B6 FFFF74B6 FFFF76B6 FF8676FF 8876FF00 B6E9F456 89F24689 .F·.V¶ÕÑ..v..v..Ñv..Ñt..Ñp..Ñn.. 0000E0
 FF0C76FF 019668FF 7886FF00 24E90375 00003DFF 78868900 00FFFF9A 5016E446 Fõ.P.......x.=..u.Õ$..Ñx.h...v.. 000100
 268E4688 FA5EC401 D6E9FF78 86880000 38589A86 76FF8876 FF000038 4D9A0A76 v..M8...v..v..X8....x.Õø.á^'.F.& 000120
 F69A5016 90468D02 6AE476FF E676FF86 76FF8876 FF9046FF 0003E903 74624739 9Gbt.Õ...F..v..v..vì.võj..F..P.- 000140
 0033149A 0A76FF0C 76FF0196 68FF7886 FF0024E9 03750000 3DFF7886 89000032 2....x.=..u.Õ$..Ñx.h...v..v...3. 000160
 6AF45689 F24689E6 5688E446 88017CE9 FF78868B 000038A5 9A8676FF 8876FF00 ..v..v..È8....x.Õ|..Fõ.Vì.F·.V¶j 000180
 8335CE24 F99A8676 FF8876FF FF74B6FF FF76B6FF FF6EB6FF FF70B6FF 9076FF01 ..v..Ñp..Ñn..Ñv..Ñt..v..v..'$öS. 0001A0
 012FE9FF 78868B00 0038D99A 8676FF88 76FF0012 E9037500 003DFF78 868910C4 á...x.=..u.Õ...v..v..ì8....x.Õ/. 0001C0
 E9037500 003DFF78 86890000 343B9AEC 76FFFECE B6FFFED0 86FF8A76 FF8C76FF .v..v..ÑÁ±.Ñö±.v$.;4....x.=..u.Õ 0001E0
```

```
Dump of file SATURN:[PCCOMMON.DUMP.DLL]DAENTDF.TMP;1 on 18-APR-1990 10:40:49.05
File ID (561,28,0)   End of file block 116 / Allocated 116

Virtual block number 34 (00000022), 512 (0200) bytes

 D6868000 58E90375 00987E80 00FBE9FF 78868800 0039379A 8676FF88 76FF0012 ...v..v..79....x.Õ«..~..u.ÕX...ø 000000
 76FFFECE B6FFFED0 B6FF8A76 FF8C76FF 08C48333 D100009A 50169846 8D5016FE ±.P.F..P...ì3.á..v..v..ÑÄ±.Ñö±.v 000020
 0012E903 7500003D FF788689 00003966 9AEE76FF F076FF50 16984680 FE76FF8E ..v±.F..P.vÞ.vŸ.f9....x.=..u.Õ.. 000040
 FFFED086 FF8A76FF 8C76FF00 43E9009D E9FF7886 88000039 7D9A8676 FF8876FF .v..v..)9....x.Õ..ÕC..v..v..ÑÄ±. 000060
 003DFF78 86890000 34999AF2 76FFF476 FF5016FE D68680FE 76FF8E76 FFFECE86 Ñö±.v..v±..ø±.P.v¶.v·..4....x.=. 000080
 089A8676 FF8876FF 0057E9FF 78868800 0035E69A 8676FF88 76FF0012 E9037500 .u.Õ...v..v..Ì5....x.ÕW..v..v... 0000A0
 76FF0003 07C7260E 5EC40039 E9FF7886 880007E9 03750000 3DFF7886 89000035 5....x.=..u.Õ....x.Õ9.á^.&ú....v 0000C0
 1476FF16 76FF0000 39D49A00 A1681476 FF1676FF 000039C6 9A00A068 1476FF16 ..v.h...69...v..v.hÀ..á9...v..v. 0000E0
 2827B81E 56570000 EEC80012 CAC95F5E 1F0000E9 FF78868B 00002B04 9A009F68 h....+....x.Õ...^_èò..àŸ..WV.¡'( 000100
 C7E24689 E4468900 00880000 EC46C700 008E46C7 0000DC46 C70000FE 46C7D88E .ÄúF±..úFÉ..úFƒ..ŨFš..¦...FÕ.Fãú 000120
 12868D12 76FF1476 FF1676FF 00AE07C7 26065EC4 000407C7 260E5EC4 0000FC46 F▪..á^.&ú...á^.&ü.Ò..v..v..v.... 000140
 8D1476EF 1676FF06 28E9C046 880006E9 03750000 3DC04689 00002872 9A5016FF ..P.r(...Fâ=..u.Õ...FàÕ(..v..v.. 000160
 1476FF16 76FF0607 E9C04688 0006E903 7500003D C0468900 0028959A 50160246 Fø.P..(...Fâ=..u.Õ...FàÕ...v..v. 000180
 FF1676FF 05E5E9C0 46880006 E9037500 003DC046 89000028 B99A5016 FF16868D .....P.¿(...Fâ=..u.Õ...FàÕ[..v.. 0001A0
 1676FF05 C4E9C046 880006E9 03750000 3DC04689 0000280C 9A5016D8 468D1476 v..FÄ.P.É(...Fâ=..u.Õ...FàÕá..v. 0001C0
 76FF05A3 E9C04688 0006E903 7500003D C0468900 0015FD9A 50160646 8D1476FF .v..Fø.P.»....Fâ=..u.Õ...FàÕÈ..v 0001E0

Dump of file SATURN:[PCCOMMON.DUMP.DLL]DAENTDF.TMP;1 on 18-APR-1990 10:40:49.05
File ID (561,28,0)   End of file block 116 / Allocated 116

Virtual block number 35 (00000023), 512 (0200) bytes

 006A006A 006A0165 6800B068 D876FFDA 76FF0000 28FF9A50 16F8468D 1476FF16 ..v..F½.P..(...vÕ.vÄh¯.he.j.j.j. 000000
 60E90000 88000307 C7260E5E C4000EE9 0374FFEE 7E83EE46 8900003B 279A006A j..';...FŸ.-Ÿ.t.Õ..á^.&ú...¦..Õ' 000020
 5689F046 8900002B 7F9A006A 006AEE76 FF006A01 6A6800B0 68D876FF DA76FF05 ..vÕ.vÄh¯.hj.j..vŸj.j...+...FÞ.V 000040
 6A00AE68 D876FFDA 76FF0000 3B589A50 16C8468D 4B6A00AD 68D876FF DA76FFF2 ·.vÕ.vÄhÙ.jK.Fà.P.X;...vÕ.vÄhÛ.j 000060
 03740000 3D00002C E59A5016 E2468D50 16C8468D 00002CD5 9A5016FF 1A868D4B K.....P.Í,...Fà.P.Fã.P.Í,..=..t. 000080
 3B0008E9 0373001A E90376E4 563BD22B 62478826 F85EC404 F8E90000 880006E9 Õ..¦..Õ½.á^½&.Gb+ø;VÕv.Õ..s.Õ..; 0000A0
 4688F85E C4DC4689 48E24688 0007E9DC 46896247 8826F85E C40000E9 0372E246 Fãr.Õ..á^½&.Gb.FÉÕ...FãH.FÉá^½.F 0000C0
 FE468D50 48DC4688 FF12B6FF FF14B6FF D876FFDA 76FF003C E9037462 473926DC É&9Gbt.Õ<..vÕ.vÄ.Ñ...Ñ...FÉHP.F± 0000E0
 C0468800 06E90375 00003DC0 46890000 3C189A50 16C4468D 5016FF66 868D5016 .P..f..P.Fá.P..<...Fâ=..u.Õ...Fâ 000100
 FF66868D 5016FE46 8DDC76FF FF12B6FF FF14B6FF D876FFDA 76FF0037 E9047EE9 Õ~.Õ7..vÕ.vÄ.Ñ...Ñ...vÉ.F±.P..f. 000120
 C4468804 44E9C046 880006E9 03750000 3DC04689 00002D5C 9A5016C4 468D5016 .P.Fá.P.\-...Fâ=..u.Õ...FàÕD..Fá 000140
 20E9C046 88000307 C7260E5E C4000EE9 0374F256 390016E9 0374F046 39C6568B .V69FÞt.Õ..9V·t.Õ..á^.&ú....FàÕ 000160
 E9037500 003DC046 8900003C 8A9A5016 E6468DF0 76FFF276 FFD276FF D476FF04 ..vå.vø.v·.vÞ.F|.P..<...Fâ=..u.Õ 000180
 46890000 31909A50 16C2468D C476FFC6 76FFD276 FFD476FF 03F9E9C0 46880006 ...FàÕ'..vå.vø.vó.vá.Fô.P..1...F 0001A0
 0234068E 006A006A 0023E903 7405E67E 830302E9 C0468800 06E90375 00003DC0 â=..u.Õ...FàÕø..-Ì.t.Õ#.j.j...4. 0001C0
 76FFD476 FF03A6E9 C0468800 003E6C9A 0A76FF0C 76FF0196 68296A01 9636FF26 &.6..j)h...v..v..l>...FàÕÍ..vå.v 0001E0

Dump of file SATURN:[PCCOMMON.DUMP.DLL]DAENTDF.TMP;1 on 18-APR-1990 10:40:49.05
File ID (561,28,0)   End of file block 116 / Allocated 116

Virtual block number 36 (00000024), 512 (0200) bytes

 46880006 E9037500 003DC046 8900003D 559A5016 8A468D04 6AF076FF F276FFD2 ø.v·.vÞj..F¤.P.U=...Fâ=..u.Õ...F 000000
 468D0000 FFFF9A50 16CE468D D676FF00 003D0A9A 50168646 8DD676FF 037DE9C0 àÕ)..vø.FÑ.P..=...vø.Fö.P......F 000020
 E9037500 003DC046 890CC483 3D7E4078 9AD276FF D476FFBA 76FFBC76 FF501686 Ñ.P.v¥.v¤.vå.vø.xâ~=.á..Fâ=..u.Õ 000040
 80046AC4 76FFC676 FFD276FF D476FF00 56E90374 0EC27E83 0339E9C0 46880006 ...FàÕ9..~ô.t.ÕV..vå.vø.vó.váj.. 000060
 FF5016CE 468D0307 E9C04688 0006E903 7500003D C0468900 002E849A 5016DE46 F8.P......Fâ=..u.Õ...FàÕ...Fö.P. 000080
 46880006 E9037500 003DC046 890CC483 30B74078 9AD276FF D476FFDE 76FFE076 vÅ.vB.vå.vø.xâñ=.á..Fâ=..u.Õ...F 0000A0
 76FFC476 FFC676FF 5016CE46 8DE05689 DE4689C6 5688C446 880036E9 02DDE9C0 àÕÌ.Õ6..Fá.Vó.FB.VÅ.Fö.P.vó.vá.v 0000C0
 8876FF02 A4E9C046 880006E9 03750000 3DC04689 0CC4833F 6640789A D276FF04 å.vø.xâf?.á..Fâ=..u.Õ...FàÕÉ..v¦ 0000E0
 0044E903 7400003D 00003E07 9A5016F4 468D8676 FF8876FF 00003DF7 9AB676FF .vÑ.¥=...v¦.vÑ.F¶.P..>..=..t.ÕD. 000100
 03740000 3D0000FF FF9A5016 B2468DCE 76FFD076 FF0000FF FF9ACE76 FFD076FF .vÅ.vö......vÅ.vö.Fý.P.....=..t. 000120
 CAE90001 FC46C700 05E90374 F6563900 0DE90374 F44639B4 5688B246 8B001EE9 Õ...Fý.VÇ9F¶t.Õ..9V-t.Õ..úF▪..Õò 000140
 037401FC 7E830000 FFFF9ACE 76FFD076 FF00003E 469AB676 FFB876FF FFA4E9FF .ÕÉ..v¦.vÑ.F>...vÅ.vö......-▪.t. 000160
 00003E91 9A0A76FF 0C76FF01 9668296A 019636FF 26023406 8E006A00 6A0023E9 Õ#.j.j...4.&.6..j)h...v..\ ..>.. 000180
 50523E9F 8A000088 01966811 6A019636 FF260234 068E006A 006A01FB E9C0468B .FàÕ«.j.j...4.&.6..j.h..¡. ℩.>RP 0001A0
 03750000 3DC04689 000032C9 9A505232 81BA0000 880276FF D476FF00 0032789A .x2...vå.vø|..¤Ÿ2RP.è2...Fâ- .u. 0001C0
 5016E846 8DBA76FF BC76FFDE 76FFE076 FFD276FF D476FF01 B8E9C046 880006E9 Õ...FàÕ|..vå.vø.vÅ.vB.v¥.v¤.FÒ.P 0001E0
```

```
Dump of file SATURN:[PCCOMMON.DUMP.DLL]DAENTDF.TMP;1 on 18-APR-1990 10:40:49.05
File ID (561,28,0)   End of file block 116 / Allocated 116

Virtual block number 37 (00000025), 512 (0200) bytes

 003F379A 0A76FF0C 76FF0196 68C076FF 0022E903 7500003D C0468900 0036609A .'6...Fâ=..u.Õ"..vâh...v..v..7?. 000000
 EA76FFD2 76FFD476 FF0001BE 46C7016F E9C04688 00003F42 9AD276FF D476FF00 ..vå.v@.B?...FäÕo.úFƒ...vå.v@.võ 000020
 019668C0 76FF0022 E9037500 003DC046 89000036 BA9A5016 BE468D02 6AE876FF .vÒj..fƒ.P.¤6...Fâ=..u.Õ"..vâh.. 000040
 76FF016A 0125E9C0 46880000 3F7D9AD2 76FFD476 FF000036 259A0A76 FF0C76FF .v..v..%6...vå.v@.}?...FäÕX.j..v 000060
 003DC046 8910C483 388D24F9 9AD276FF D476FFDE 76FFE076 FFBA76FF BC76FFBE ƒ.v¥.vα.vÅ.vB.vå.v@.'$.8.6..Fâ=. 000080
 473926DC 468BF85E C400EAE9 C0468B00 003FCD9A D276FFD4 76FF0011 E9037500 .u.Õ...vå.v@.ë?...FâÕõ.6^½.FÉ&9G 0000A0
 5016FF1A 868DFE76 FFDC76FF FF12B6FF FF14B6FF D876FFDA 76FF0044 E9037462 bt.Õ0..vÖ.vÄ.Ñ...Ñ...vÉ.v±.....P 0000C0
 0040139A D276FFD4 76FF0011 E9037500 003DC046 8900003F FD9AE876 FFEA76FF .võ.vÒ.»?...Fâ=..u.Õ...vå.v@..@. 0000E0
 FE76FF50 40DC4688 FF12B6FF FF14B6FF D876FFDA 76FF0043 E9009AE9 C0468B00 ..FâÕ..ÕC..vÖ.vÄ.Ñ...Ñ...FÉ@P.v± 000100
 FFD476FF 0011E903 7500003D C0468900 0039209A E876FFEA 76FF5016 FF1A868D .....P.võ.vÒ. 9...Fâ=..u.Õ...vå. 000120
 03750000 30C04689 0000398F 9AD276FF D476FF00 54E9C046 88000036 309AD276 v@.06...FâÕT..vå.v@..9...Fâ=..u. 000140
 FF000040 599A00A0 681476FF 1676FF00 0307C726 0E5EC400 38E9C046 880006E9 Õ...FäÕ8.6^.&ú....v..v.h...Y@... 000160
 00E9C046 88000039 B89A009F 681476FF 1676FF00 0040679A 00A16814 76FF1676 v..v.hÀ..g@...v..v.h...¡9...FäÕ. 000180
 0A76FF0C 76FF0676 FF0876FF D88E39EE B81E5657 000012C8 0012CAC9 5F5E1F00 ..^_èò..à...WV.¡Ÿ9.Ä.v..v..v..v. 0001A0
 F8468801 01E9EE46 880006E9 03750000 30EE4689 0000174D 9A5016F8 468D096A j..F½.P.M....FŸ=..u.Õ...FŸÕ...F½ 0001C0
 FF000FE9 EE468800 00FFFF9A 0A76FF0C 76FF0E76 FF1076FF 0017E903 74FA4608 .F't.Õ...v..v..v..v.......FŸÕÕ.. 0001E0

Dump of file SATURN:[PCCOMMON.DUMP.DLL]DAENTDF.TMP;1 on 18-APR-1990 10:40:49.05
File ID (561,28,0)   End of file block 116 / Allocated 116

Virtual block number 38 (00000026), 512 (0200) bytes

 E9037500 003DEE46 89000025 4E9A5016 F4468D09 6A0A76FF 0C76FF06 76FF0876 v..v..v..v.j..F¶.P.N%...FŸ=..u.Õ 000000
 8B26F05E C404F046 830004E9 F25689F0 46B9F656 8BF4468B 00B6E9EE 46880006 ...FŸÕÑ..F¶.V-.Fþ.V·Õ...Fþ.6^þ&. 000020
 16FC468D 036A37FF 260277FF 26F05EC4 0676FF08 76FF007D E9037502 470B2607 .&.G.u.Õ)..v..v.6^þ&.w.&.7j..F=. 000040
 418A9AF4 76FFF676 FF0676FF 0876FF00 17E90375 00003DEE 46890000 3CDF9A50 P.Õ<...FŸ=..u.Õ...v..v..v-.v¶..A 000060
 83302240 789A0676 FF0876FF FC76FFFE 76FF0E76 FF1076FF 0056E9EE 46880000 ...FŸÕV..v..v..v±.v=.v..v..x@"=. 000080
 46880000 41A49AF4 76FFF676 FF0676FF 0876FF00 17E90375 00003DEE 46890CC4 6..FŸ=..u.Õ...v..v..v-.v¶.ÉA...F 0000A0
 5E1F0000 E9EE4688 000025B9 9AF476FF F676FF06 76FF0876 FFFF70E9 001AE9EE ŸÕ..Õp..v..v..v-.v¶.¿%...FŸÕ...^ 0000C0
 76FF0676 FF0876FF 0031E903 740E0A7E 83D88E40 80B81E56 5700000E C8CBC95F _èùà...WV.¡.@.Ä.~..t.Õ1..v..v..v 0000E0
 32E9F646 880006E9 03750000 30F64689 0000420D 9A5016FC 468D086A 1076FF12 ¯.v.j..F=.P..B...F-=..u.Õ...F-Õ2 000100
 0040E39A 5016FC46 80156A10 76FF1276 FF0676FF 0876FF00 2EE90002 F846C701 .úF½..Õ...v..v..v..v.j..F=.P.D@. 000120
 F24689FE 568BFC46 880014F8 46C70101 E9F64688 0006E903 7500003D F6468900 ..F-=..u.Õ...F-Õ..úF½...F=.V±.F· 000140
 C40676FF 0876FF00 C3E90375 02470B26 078B26F2 5EC404F2 46830004 E9F45689 .V¶Õ...F·.6^·&..&.G.u.Õù..v..v.6 000160
 17E90375 00003DF6 46890000 322E9A50 16FA468D F876FF37 FF260277 FF26F25E ^·&.w.&.7.v½.F'.P..2...F-=..u.Õ. 000180
 0373FA46 390C4688 009BE9F6 46880000 42FF9AFC 76FFFE76 FF0676FF 0876FF00 ..v..v..v±.v=..B...F-Õ...F.9F's. 0001A0
 260009E9 03740739 2616568B 14468BF2 5EC4006B E90376FA 46390E46 8B0076E9 Õv..F.9F'v.Õk.6^··.F..V.&9.t.Õ..& 0001C0
 0676FF08 76FFFA4E FF0003E9 FA46FF00 06E90374 01187EB3 0051E903 75025739 9W.u.Õα..-..t.Õ...F'Õ...N'.v..v. 0001E0

Dump of file SATURN:[PCCOMMON.DUMP.DLL]DAENTDF.TMP;1 on 18-APR-1990 10:40:49.05
File ID (561,28,0)   End of file block 116 / Allocated 116

Virtual block number 39 (00000027), 512 (0200) bytes

 E9037500 003DF646 8900003F 1B9A5016 FA468DF8 76FF37FF 260277FF 26F25EC4 6^·&.w.&.7.v½.F'.P..?...F·=..u.Õ 000000
 FF0876FF FF2AE900 1AE9F646 88000043 199AFC76 FFFE76FF 0676FF08 76FF0017 ...v..v..v±.v=..C...F-Õ..Ĉ  .v.. 000020
 B81E5657 00002CC8 CBC95F5E 1F0000E9 F6468B00 00414E9A FC76FFFE 76FF0676 v..v±.v=.NA...F-Õ...^_èùà,.. ˇv.¡ 000040
 76FF00AE 07C72606 5EC40004 07C7260E 5EC40000 FE46C700 00F046C7 D88E41BB ÉA.ÄúFþ..úF±..6^.&ú..¯6^.&ú.Õ..v 000060
 E9DC4688 0006E903 7500003D DC468900 003A349A 5016D446 8D1276FF 1476FF16 ..v..v..Få.P.4:...FÉ=..u.Õ...FÉÕ 000080
 DC468B00 06E90375 00003DDC 46890000 3A559A50 16E0468D 1476FF16 76FF02FA '..v..v..FÅ.P.U:...FÉ=..u.Õ...FÉ 0000A0
 46880006 E9037500 003DDC46 8900003A 779A5016 D8468014 76FF1676 FF0209E9 Õ1..v..v..FÄ.P.w:...FÉ=..u.Õ...F 0000C0
 880006E9 03750000 3DDC4689 00003A98 9A5016E4 46801476 FF1676FF 028BE9DC ÉÕ¡..v..v..FÕ.P..:...FÉ=..u.Õ... 0000E0
 656800B0 68E476FF E676FF00 003ADA9A 5016FA46 8D1476FF 1676FF02 97E9DC46 FÉÕ...v..v..F'.P.Ö:...v¦.vÕh¯.he 000100
 07C7260E 5EC4000E E90374FF F67E83F6 46890000 442E9A00 6A006A00 6A006A01 .j.j.j.j...D...F-.~-.t.Õ..6^.&ú. 000120
 3AF39A00 6A006AF6 76FF006A 016A6800 B068E476 FFE676FF 0254E900 00B80003 ..¡..ÕT..v¦.vÕh¯.hj.j..v-j.j..µ: 000140
 46890000 3C639A50 16DE468D EC76FFEE 76FFE076 FFE276FF EE5689EC 46890000 ...Fš.VŸ.vã.vÅ.vŸ.vš.FB.P.c<...F 000160
 76FFE076 FFE276FF 007EE903 740EDE7E 83020DE9 DC468800 06E90375 00003DDC É=..u.Õ...FÉÕ...~B.t.Õ~..vã.vÅ.v 000180
 DBE9DC46 880006E9 03750000 3DDC4689 000044A5 9A5016F2 468D036A EC76FFEE Ÿ.všj..F·.P.ÉD...FÉ=..u.Õ...FÉÕÜ 0001A0
 7500003D DC468900 0041329A 5016E846 8D046AEC 76FFEE76 FFE076FF E276FF01 ..vã.vÅ.vŸ.všj..FÒ.P.2A...FÉ=..u 0001C0
 45129A50 16FB468D 026AEC76 FFEE76FF E076FFE2 76FF01B2 E9DC4688 0006E903 .Õ...FÉÕÿ..vã.vÅ.vŸ.všj..F½.P..E 0001E0
```

```
Dump of file SATURN:[PCCOMMON.DUMP.DLL]DAENTDF.TMP;1 on 18-APR-1990 10:40:49.05
File ID (561,28,0)   End of file block 116 / Allocated 116

Virtual block number 40 (00000028), 512 (0200) bytes

 89E84689 EE5688EC 46880041 E90189E9 DC468800 06E90375 00003DDC 46890000 ...FÉ=..u.Õ...FÉÕ..ÕA..F§.VŸ.FÒ. 000000
 16F8468D 146AEC76 FFEE76FF E076FFE2 76FFF456 89F24689 DA5688D8 4688EA56 Võ.FÄ.VÖ.F·.V¶.vã.vÅ.vŸ.všj..F½. 000020
 26023406 8E006A00 6A0145E9 DC468800 06E90375 00003DDC 46890000 42629A50 P.b8...FÉ=..u.Õ...FÉÕE.j.j...4.& 000040
 8A0000B8 E076FFE2 76FF0000 3CC19A50 5245508A 0000B801 9668136A 019636FF .6..j.h..¡..¤PERP.ê<...vã.vÅ¡..¤ 000060
 FFF876FF 006A0102 E9DC468B 0006E903 7500003D DC468900 003EA49A 50523E8C .>RP.Ê>...FÉ=..u.Õ...FÉÕ..j..v½. 000080
 7500003D DC468910 C483416D 24F99AE0 76FFE276 FFF276FF F476FFE8 76FFEA76 võ.vÒ.v¶.v·.vã.vÅ.¹$mA.á..FÉ=..u 0000A0
 76FF0030 E9037405 DE7E8300 C7E9DC46 88000045 D19AE076 FFE276FF 0011E903 .Õ...vã.vÅ.¦E...FÉÕú..~8.t.ÕÕ..v 0000C0
 E076FFE2 76FF0011 E9037500 003DDC46 890000FF FF9AE876 FFEA76FF E076FFE2 ã.vÅ.võ.vÒ......FÉ=..u.Õ...vã.vÅ 0000E0
 EC76FFEE 76FFE876 FFEA76FF E076FFE2 76FF0033 E90091E9 DC468800 0046079A ..F...FÉÕ..Õ3..vã.vÅ.võ.vÒ.vŸ.vš 000100
 58E9DC46 8800003E F89AE076 FFE276FF 0011E903 7500003D DC468900 00FFFF9A ......FÉ=..u.Õ...vã.vÅ.½>...FÉÕ[ 000120
 46880006 E9037500 003DDC46 89000040 249AE076 FFE276FF 624FFF26 FA5EC400 .á^¹&.Ob.vã.vÅ.$ə...FÉ=..u.Õ...F 000140
 1476FF16 76FF0000 46549A00 A0681476 FF1676FF 000107C7 260E5EC4 0038E9DC ÉÕ8.á^.&ú....v..v.h...TF...v..v. 000160
 C95F5E1F 0000E9DC 46880000 4048A900 9F681476 FF1676FF 00004662 9A00A168 hÅ..bF...v..v.h...Kə...FÉÕ...^_è 000180
 0A76FF0C 76FF0676 FF0876FF 0000FE46 C7D88E43 30881E56 570000A8 C80012CA ò..à´..WV.¡0C.ÄúF±...v..v..v..v̄. 0001A0
 A8468801 85E9A446 880006E9 03750000 3DA44689 0000447C 9A5016A8 46800F6A j..F´.P.|D...FÊ=..u.Õ...FÉÕç..F´ 0001C0
 AA76FF0E 76FF1076 FF1276FF 1476FF16 76FF1876 FF1A76FF 003AE903 75AA4608 .F˙u.Õ:..v..v..v..v..v..v..v..v˙ 0001E0

Dump of file SATURN:[PCCOMMON.DUMP.DLL]DAENTDF.TMP;1 on 18-APR-1990 10:40:49.05
File ID (561,28,0)   End of file block 116 / Allocated 116

Virtual block number 41 (00000029), 512 (0200) bytes

 E9A44688 0006E903 7500003D A4468916 C4834584 46739A06 76FF0876 FFA876FF .v'.v..v..sF.E.á..FÊ=..u.Õ...FÊÕ 000000
 16C59A50 16F8468D 5016A646 8D1E6A0A 76FF0C76 FF0E76FF 0676FF08 76FF0170 p..v..v..v..v..v.j..F¦.P.F½.P.é. 000020
 6A016068 00806810 76FF1276 FF013FE9 A4468800 06E90375 00003DA4 46890000 ...FÊ=..u.Õ...FÊÕ?..v..v.h¯.h'.j 000040
 03E90000 FE46C764 470126A6 4688185E C4FC4689 000043FA 9A006A00 6A006A00 .j.j.j..¹C...F=á^..F¦&.GdúF±..Õ. 000060
 0270FF26 F876C40C FE5E6806 76FF0876 FF00FDE9 0372FE46 39A6468B FE46FF00 ..F±.F¦9F±r.Õ»..v..v.k^±.áv½&.p. 000080
 681E0004 E9A44688 0006E903 7500003D A4468900 001A4A9A 5016AC46 8D30FF26 &.0.F¯.P.J....FÊ=..u.Õ...FÊÕá..h 0000A0
 38FB0000 9A5016FF 58868D50 16AC468D 08C48347 AE00469A 5016FF58 868D0132 2...X..P.F.ÜG.á..F¯.P..X..P...«8 0000C0
 1676FF10 76FF1276 FF004AE9 03740640 08260440 8826F85E C40CFE76 6808C483 .á.kv±.á^½&.ə.&.ə.t.ÕJ..v..v..v. 0000E0
 76C40CFE 5E685016 FF58868D 0870FF26 F85EC40C FE7668FC 46FFFC76 FF1476FF .v..v=.F=kv±.á^½&.p...X..Pk^±.áv 000100
 48E90054 E9A44688 0006E903 7500003D A4468900 0048449A 30FF2602 70FF26F8 ½&.p.&.0.DH...FÊ=..u.Õ...FÊÕT.ÕH 000120
 868D0870 FF26F85E C40CFE76 68FC46FF FC76FF14 76FF1676 FF1076FF 1276FF00 ..v..v..v..v..v=.F=kv±.á^½&.p... 000140
 03750000 3DA44689 00003FB7 9A0470FF 260670FF 26F85EC4 0CFE7668 5016FF58 X..Pkv±.á^½&.p.&.p..ñ?...FÊ=..u. 000160
 78881E56 5700006A C8CBC95F 5E1F0000 E9A44688 FEF5E900 09E9A446 880006E9 Õ...FÊÕ..Õ%±.FÊÕ...^_èùàj..WV.¡( 000180
 46880006 E9037500 003DEA46 89000043 7E9A5016 F0468D08 76FF0A76 FFD88E46 F.Ä.v..v..FÞ.P.-C...F̄õ=..u.Õ...F 0001A0
 880006E9 03750000 3DEA4689 0000439F 9A501696 46800876 FF0A76FF 01CEE9EA õÕö..v..v..F..P..C...Fõ=..u.Õ... 0001C0
 0006E903 7500003D EA468900 0043C09A 5016F446 8D0876FF 0A76FF01 ADE9EA46 FõÕÜ..v..v..F¶.P.âC...Fõ=..u.Õ.. 0001E0

Dump of file SATURN:[PCCOMMON.DUMP.DLL]DAENTDF.TMP;1 on 18-APR-1990 10:40:49.05
File ID (561,28,0)   End of file block 116 / Allocated 116

Virtual block number 42 (0000002A), 512 (0200) bytes

 06E90375 00003DEA 46890000 43E19A50 16FC468D 0876FF0A 76FF018C E9EA4688 .FõÕ...v..v..F=.P.ÄC...Fõ=..u.Õ. 000000
 89000046 989A5016 F8468D0F 6A9676FF 9876FFF0 76FFF276 FF016BE9 EA468800 ..FõÕk..v·.vÞ.v..v.j..F½.P..F... 000020
 76FFF676 FF002BE9 0375FA46 08F84688 0142E9EA 46880006 E9037500 003DEA46 Fõ=..u.Õ...FõÕB..F½.F¹u.Õ+..v-.v 000040
 0006E903 7500003D EA46890C C483460C 4A699AF0 76FFF276 FFF876FF FA76FFF4 ¶.v¹.v½.v·.vÞ.iJÉF.á..Fõ=..u.Õ.. 000060
 6A486A00 6A014368 00B668F4 76FFF676 FF000068 47C726FC 5EC4010C E9EA4688 .FõÕ..á^=&úGh...v-.v¶hÑ.hC.j.jKj 000080
 000041DC 9A5016EC 468D126A 9676FF98 76FFF076 FFF276FF 00004738 9A006A00 .j..8G...v·.vÞ.v..v.j..F§.P.ÉA.. 0000A0
 0004E99C 56899A46 89EE5688 EC468800 C1E9EA46 880006E9 03750000 3DEA4689 .Fõ=..u.Õ...FõÕè..F§.VŸ.F..V.Õ.. 0000C0
 F076FFF2 76FF6847 FF26FC5E C40088E9 03750247 08260788 269A5EC4 049A4683 .F..á^.&..&.G.u.Õ..á^=&.Gh.v·.vÞ 0000E0
 17E90375 00003DEA 46890000 44CE9A50 169E468D 026A37FF 260277FF 269A5EC4 á^.&.w.&.7j..F..P.öD...Fõ=..u.Õ. 000100
 681EF476 FFF676FF 005AE9EA 46880000 4A3E9AEC 76FFEE76 FFF076FF F276FF00 ..v·.vÞ.vŸ.vš.>J...FõÕZ..v-.v¶.h 000120
 17E90375 00003DEA 46890000 FFFF9A37 FF260277 FF269A5E C450169E 468D007C |..F..Pá^.&.w.&.7......Fõ=..u.Õ. 000140
 76FFF276 FFFF65E9 001AE9EA 46880000 4A589AEC 76FFEE76 FFF076FF F276FF00 ..v·.vÞ.vŸ.vš.XJ...FõÕ..Õe..v·.v 000160
 1E565700 00A6C800 06CAC95F 5E1F0000 E9EA4688 0000427E 9AEC76FF EE76FFF0 Þ.vŸ.vš.~B...FõÕ...^_èò..à!..WV. 000180
 AA468900 0049089A 50168046 8D0F6A0A 76FF0C76 FF0676FF 0876FFD8 8E486FB8 ¡oH.Ä.v..v..v..v.j..F¯.P..I...F¯ 0001A0
 FF0E76FF 1076FF00 28E90375 82460880 46880145 E9AA4688 0006E903 7500003D =..u.Õ...F˙ÕE..F¯.Fýu.Õ+..v..v.. 0001C0
 46880006 E9037500 003DAA46 890CC483 49404A69 9A0676FF 0876FFB0 76FFB276 vý.v¯.v..v..iJəI.á..F˙=..u.Õ...F 0001E0
```

```
Dump of file SATURN:[PCCOMMON.DUMP.DLL]DAENTDF.TMP;1 on 18-APR-1990 10:40:49.05
File ID (561,28,0)   End of file block 116 / Allocated 116

Virtual block number 43 (0000002B), 512 (0200) bytes

 30AA4689 0000498C 9A5016AC 468D126A 0A76FF0C 76FF0676 FF0876FF 010FE9AA ¨Õ...v..v..v..v.j..F¯.P..l...F¯= 000000
 86830005 E9FF5C96 89FF5A86 89AE568B AC468B00 E6E9AA46 8B0006E9 03750000 ..u.Õ...F¨Öl..F˜.VÜ..Z... .Õ.... 000020
 77FF26FF 5A9EC406 76FF0876 FF00A9E9 03750247 0B26078B 26FF5A9E C404FF5A Z..é.Z.&..&.G.u.Õ`..v..v.« ?.&.w 000040
 76FF0876 FF0017E9 03750000 30AA4689 000049E2 9A501684 468D026A 37FF2602 .&.7j..FÇ.P.ãI...F^=..u.Õ.. ´..v 000060
 8200469A 5016FF5E 86800136 681E0081 E9AA468B 00004BBF 9AAC76FF AE76FF06 ..vÜ.v¯.¢K...F^Õ...h6...^..P.F.. 000080
 7C681E0E 76FF1076 FF08C483 479B0000 9A5016FF 5E868D50 16B44680 08C4834B K.é..FÇ.P..^..P....G.é..v..v..h| 0000A0
 E9037500 003DAA46 8900004A 229A37FF 260277FF 26FF5A9E C45016FF 5E868D00 ...^..Pé.Z.&.w.&.7."J...F¯=..u.Õ 0000C0
 FF0876FF FF42E900 1AE9AA46 8B00004B D99AAC76 FFAE76FF 0676FF08 76FF0017 ...v..v..vÜ.v˜.)K...F`Õ..ÕB..v.. 0000E0
 B81E5657 000006C8 CBC95F5E 1F0000E9 AA468B00 0049FE9A AC76FFAE 76FF0676 v..vÜ.v˜.±l...F¯Õ...^_èùà...WV.¡ 000100
 009A0A76 FF0C76FF 0E76FF10 76FF2076 FF2276FF 000107C7 26065EC4 D88E4A71 qJ.Äé^.&ú....v".v .v..v..v..v... 000120
 FC468D20 76FF2276 FF0042E9 037401FA 7E83006E E9037500 003DFA46 89FFFF00 ....F*=..u.Õn..~*.t.ÕB..v".v .F= 000140
 9A1A76FF 1C76FF01 9668326A 019636FF 26023406 8E006A00 6A000048 C19A5016 .P.èH..j.j...4.&.6..j2h...v..v.. 000160
 34068E00 6A006A00 1DE90000 2B539A01 3A681E00 8668FC76 FFFE76FF 00004C82 .L...v±.v=hÑ..h:..S+..Õ..j.j...4 000180
 E900008B 0006E9FA 468B0000 45429A1A 76FF1C76 FF019668 346A0196 36FF2602 .&.6..j4h...v..v..BE...F*Õ..¡..Õ 0001A0
 065EC400 0407C726 0E5EC4D8 8E4BF0B8 1E565700 0008C800 1ECAC95F 5E1F0000 ...^_èò..à...WV.¡ÞK.Äé^.&ú...é^. 0001C0
 06E90375 000030F8 46890000 4C339A50 16FA468D 1476FF16 76FF0789 2612468B .F.&¯...v..v..F*.P.3L...F½=..u.Õ. 0001E0
```

```
Dump of file SATURN:[PCCOMMON.DUMP.DLL]DAENTDF.TMP;1 on 18-APR-1990 10:40:49.05
File ID (561,28,0)   End of file block 116 / Allocated 116

Virtual block number 44 (0000002C), 512 (0200) bytes

 6A006A01 6568008B 68FA76FF FC76FF00 98E90374 0100783E 8300C5E9 F8468B00 ..F½Õé..>x..t.Õ...v=.v*h¡.he.j.j 000000
 6800B868 FA76FFFC 76FF001A E90375FF FE7E83FE 46890000 4D1C9A00 6A006A00 .j.j...M...F±.~±.u.Õ...v=.v*h¡.h 000020
 9A00B668 FA76FFFC 76FF0000 007806C7 00004974 9A006A00 6AFE76FF 006A0164 d.j..v±j.j..tI..ú.x....v=.v*hÑ.. 000040
 9A016A50 5200004D 5E9A00B8 68FA76FF FC76FF00 004D509A 016A5052 00004D47 GM..RPj..PM...v=.v*h£..^M..RPj.. 000060
 C7260E5E C400002B 969A016A 50520000 2B8D9A00 B968FA76 FFFC76FF 00004D67 gM...v=.v*h¿...+..RPj...+..á^.&ú 000080
 76FF0A76 FF0C76FF 0E76FF10 76FF1276 FF1476FF 1676FF00 23E90000 B8000307 ...¡..Õ#..v..v..v..v..v..v..v..v 0000A0
 FFD88E4C A1B81E56 5700006A C80012CA C95F5E1F 0000E900 00FFFF9A 0676FF08 ..v.......Õ...^_èò..àj..WV.¡ÀL.Ä. 0000C0
 01CEE9EA 46880006 E9037500 003DEA46 89000048 7F9A5016 F0468008 76FF0A76 v..v..FÞ.P..H...Fõ=..u.Õ...FõÕö. 0000E0
 ADE9EA46 8B0006E9 03750000 30EA4689 000048A0 9A501696 468D0876 FF0A76FF .v..v..F..P..H...Fõ=..u.Õ...FõÕÜ 000100
 E9EA468B 0006E903 7500003D EA468900 004CC29A 5016F446 8D0876FF 0A76FF01 ..v..v..F¶.P.òL...Fõ=..u.Õ...FõÕ 000120
 EA468B00 06E90375 00003DEA 46890000 48E29A50 16FC468D 0876FF0A 76FF018C ...v..v..F=.P.ãH...Fõ=..u.Õ...Fõ 000140
 003DEA46 8900004A 899A5016 F8468D0F 6A9676FF 9876FFF0 76FFF276 FF016BE9 Õk..v·.vÞ.v..v.j..F½.P..J...Fõ=. 000160
 FA76FFF4 76FFF676 FF002BE9 0375FA46 0BF8468B 0142E9EA 46880006 E9037500 .u.Õ...FõÕB..F½.F*u.Õ+..v-.v¶.v* 000180
 E9EA468B 0006E903 75000030 EA46890C C4834ABE 55389AF0 76FFF276 FFF876FF .v½.v·.vÞ.BUƒJ.é..Fõ=..u.Õ...FõÕ 0001A0
 9A006A00 6A4B6A00 6A014368 00C068F4 76FFF676 FF00006A 47C726FC 5EC4010C ..é^=&úGj...v-.v¶hà.hC.j.jKj.j.. 0001C0
 3DEA4689 00004AE8 9A5016EC 468D136A 9676FF98 76FFF076 FFF276FF 00004CF6 -L...v·.vÞ.v..v.j..F§.P.ÒJ...Fõ= 0001E0
```

```
Dump of file SATURN:[PCCOMMON.DUMP.DLL]DAENTDF.TMP;1 on 18-APR-1990 10:40:49.05
File ID (561,28,0)   End of file block 116 / Allocated 116

Virtual block number 45 (0000002D), 512 (0200) bytes

 049A4683 0004E99C 56899A46 89EE568B EC468B00 C1E9EA46 8B0006E9 03750000 ..u.Õ...FõÕê..F§.VŸ.F..V.Õ...F.. 000000
 269A5EC4 F076FFF2 76FF6A47 FF26FC5E C4008BE9 03750247 0B26078B 269A5EC4 é^.&..&.G.u.Õ..é^=&.Gj.v·.vÞé^.& 000020
 F276FF00 17E90375 00003DEA 46890000 4B3C9A50 169E468D 026A37FF 260277FF .w.&.7j..F..P.<K...Fõ=..u.Õ...v· 000040
 468D009E 681EF476 FFF676FF 005AE9EA 46880000 4F7A9AEC 76FFEE76 FFF076FF .vÞ.vŸ.v§.zO...FõÕZ..v-.v¶.h...F 000060
 F276FF00 17E90375 00003DEA 46890000 4BA39A37 FF260277 FF269A5E C450169E ..Pé^.&.w.&.7.ÈK...Fõ=..u.Õ...v· 000080
 EE76FFF0 76FFF276 FFFF65E9 001AE9EA 46880000 4F949AEC 76FFEE76 FFF076FF .vÞ.vŸ.v§..O...FõÕ..Õe..v·.vÞ.vŸ 0000A0
 8E4DABB8 1E565700 0006C800 06CAC95F 5E1F0000 E9EA468B 00004B58 9AEC76FF .v§.XK...FõÕ...^_èò..à...WV.¡¨M. 0000C0
 00FFFF9A 0676FF08 76FF0A76 FF0C76FF 0E76FF10 76FF1276 FF1476FF 1676FFD8 Ä.v..v..v..v..v..v..v..v..v..... 0000E0
 4DFD9A50 16FC468D 1476FF16 76FF0078 E9FA468B 0006E903 75000030 FA468900 ..F*=..u.Õ...F*Õx..v..v..F=.P.=M 000100
 6A016E68 00B068FC 76FFFE76 FF0057E9 FA468B00 06E90375 00003DFA 46890000 ...F*=..u.Õ...F*ÕW..v±.v=h¯.hn.j 000120
 00003DFA 46894E7C 156A9A00 B0681476 FF1676FF 00005050 9A006A00 6A006A00 .j.j.j..PP...v..v.h¯..j.|N.F*=.. 000140
 9A006A00 6A006A00 6A012568 00C168FC 76FFFE76 FF001FE9 FA468B00 06E90375 u.Õ...F*Õ...v±.v=hê.hX.j.j.j.j.. 000160
 0E5EC4D8 8E4FADB8 1E565700 00B2C800 12CAC95F 5E1F0000 E90000B8 00004EB0 ¯N..¡..Õ...^_èò..àÿ..WV.¡UO.Äé^. 000180
 46890000 4DBB9A50 16EE468D 1476FF16 76FF0789 2612468B 065EC400 0407C726 &ú...é^..F.&¯...v..v..FŸ.P.£H...F 0001A0
 8900004F EE9A5016 F2468D14 76FF1676 FF0306E9 E8468800 06E90375 000030E8 Ò=..u.Õ...FÒÕ®..v..v..F·.P.ŸO... 0001C0
 F276FFF4 76FF0098 E9037401 007A3E83 0385E9E8 46880006 E9037500 003DE846 FÒ=..u.Õ...FÒÕç..>z..t.Õ...v¶.v· 0001E0
```

```
Dump of file SATURN:[PCCOMMON.DUMP.DLL]DAENTDF.TMP;1 on 18-APR-1990 10:40:49.05
File ID (561,28,0)   End of file block 116 / Allocated 116

Virtual block number 46 (0000002E), 512 (0200) bytes

FF001AE9 0375FFF6 7E83F646 89000051 059A006A 006A006A 006A0165 6800C368 hû.he.j.j.j.j...Q...F-.--.u.Õ... 000000
FF000000 7A06C700 0050189A 006A006A F676FF00 6A016468 00C368F2 76FFF476 v¶.v·hú.hd.j..v-j.j...P..ú.z.... 000020
9A00C668 F276FFF4 76FF0000 51399A01 6A505200 0051309A 00C068F2 76FFF476 v¶.v·hà..0Q..RPj..9Q...v¶.v·hó.. 000040
9A016A50 5200004D 309A00C4 68F276FF F476FF00 0051509A 016A5052 00005147 GQ..RPj..PQ...v¶.v·há..0M..RPj.. 000060
4E8680 4B 6A00C068 F276FFF4 76FF0313 E90000B8 000307C7 260E5EC4 00004D39 9M..á^.&ú...|..Õ...v¶.v·hà.jK..N 000080
5EC4000E E9037400 003004C4 83525A00 A69A5016 FF4E8680 00003842 9A5016FF ..P.B;....N..P.Ì.ZR.á.=..t.Õ..á^ 0000A0
50169A46 805016FA 4680009E 681EF276 FFF476FF 02D9E900 00B80003 07C7260E .&ú...|..Õ)..v¶.v·.h...F*.P.F..P 0000C0
76FFF076 FF02AAE9 E8468800 06E90375 000030E8 46890000 0E829A50 16FC468D .F•.P......FÒ=..u.Õ...FÒÕ^..vÞ.v 0000E0
46880006 E9037500 0030E846 8900004F 1E9A5016 EC468D04 6AFC76FF FE76FFEE Ÿ.v±.v▪j..F§.P..O...FÒ=..u.Õ...F 000100
00003D00 0052C79A 006A006A 006A006A 01246800 C168F276 FFF476FF 0281E9E8 ÒÕ...v¶.v·hè.h$.j.j.j.j..úR..=.. 000120
E90001EA 46C759E6 46C60009 E90000EA 46C70008 E9037459 EC7E8000 1DE90375 u.Õ...-§Yt.Õ..úFõ..Õ..6F|YúFõ..Õ 000140
FF4E868D 0001EA46 C74EE646 C60009E9 0000EA46 C70008E9 03744EEC 7E80001A ...~§Nt.Õ..úFõ..Õ..6F|NúFõ....N. 000160
C70005E9 0000F846 C70008E9 03740000 3D08C483 4B6F007C 9A50169A 46805016 .P.F..P.|.oK.á.=..t.Õ..úF½..Õ..ú 000180
009E681E F276FFF4 76FF0053 E9037400 EA7E8300 5CE90374 00F87E83 0001F846 F½...-½.t.Õ\..-õ.t.ÕS..v¶.v·.h.. 0001A0
E9E8468B 0006E903 7500003D E8468900 0053CB9A FC76FFFE 76FF5016 FF4E8680 ..N..P.v±.v▪.ùS...FÒ=..u.Õ...FÒÕ 0001C0
C7260E5E C4000054 009A006A 006A006A 006A0125 6800C168 F276FFF4 76FF01C3 û..v¶.v·hè.h%.j.j.j.j...T..á^.&ú 0001E0
```

```
Dump of file SATURN:[PCCOMMON.DUMP.DLL]DAENTDF.TMP;1 on 18-APR-1990 10:40:49.05
File ID (561,28,0)   End of file block 116 / Allocated 116

Virtual block number 47 (0000002F), 512 (0200) bytes

02BA0000 B8019668 306A0196 36FF2602 34068E00 6A006A01 9CE9E846 8B000307 ....FÒÕ..j.j...4.&.6..j0h..|..¤. 000000
0030E846 89000045 559A5052 4530BA00 00B8EE76 FFF076FF 0000532F 9A505253 SRP./S...vÞ.vŸ|..¤=ERP.UE...FÒ=. 000020
339A0A76 FF0C76FF 01966824 6A019636 FF260234 068E006A 006A0023 E9037500 .u.Õ#.j.j...4.&.6..j$h...v..v..3 000040
046AFC76 FFFE76FF EE76FFF0 76FF0034 E9037401 EA7E8301 3CE9E846 8B000054 T...FÒÕ<..-õ.t.Õ4..vÞ.vŸ.v±.v▪j. 000060
000053AA 9AEE76FF F076FF00 11E90375 00003DE8 46890000 53949A50 16E6468D .F|.P..S...FÒ=..u.Õ...vÞ.vŸ.^S.. 000080
4E868D02 6AFC76FF FE76FFEE 76FFF076 FF0035E9 037401F8 7E8300FF E9E8468B .FÒÕ...-½.t.Õ5..vÞ.vŸ.v±.v▪j...N 0000A0
46880000 53E19AEE 76FFF076 FF0011E9 03750000 3DE84689 000042E3 9A5016FF ..P.DB...FÒ=..u.Õ...vÞ.vŸ.ÄS...F 0000C0
890000FF FF9AFC76 FFFE76FF 5016FF4E 868D009E 681EF276 FFF476FF 00C1E9E8 ÒÕè..v¶.v·.h....N..P.v±.v▪...... 0000E0
76FFF476 FF008AE9 E8468800 00459B9A EE76FFF0 76FF0011 E9037500 0030E846 FÒ=..u.Õ...vÞ.vŸ..E...FÒÕ...v¶.v 000100
89000046 1F9AEE76 FFF076FF 000050DF 9A006A00 6A006A00 6A012568 00C168F2 ·hè.h%.j.j.j.j..ÕP...vÞ.vŸ..F... 000120
FF0C76FF 01966824 6A019636 FF260234 068E006A 006A0023 E9037500 0030E846 FÒ=..u.Õ#.j.j...4.&.6..j$h...v.. 000140
469A00A0 681476FF 1676FF00 0307C726 0E5EC400 38E9E846 8800004C 509A0A76 v..PL...FÒÕ8.á^.&ú....v..v.h...F 000160
88000054 4F9A009F 681476FF 1676FF00 0054689A 00A16814 76FF1676 FF000046 F...v..v.hÀ..kT...v..v.h...OT... 000180
76FF1476 FF1676FF D88E5069 B81E5657 000006C8 0012CAC9 5F5E1F00 00E9E846 FÒÕ...^_èò..à...WV.¡iP.Á.v..v..v 0001A0
03750000 3DFA4689 0000FFFF 9A0676FF 0876FF0A 76FF0C76 FF0E76FF 1076FF12 ..v..v..v..v..v..v.......F*=..u. 0001C0
7500003D FA468900 0050AB9A 5016FC46 8D1476FF 1676FF00 78E9FA46 880006E9 Õ...F*Õx..v..v..F▪.P.¨P...F*=..u 0001E0
```

```
Dump of file SATURN:[PCCOMMON.DUMP.DLL]DAENTDF.TMP;1 on 18-APR-1990 10:40:49.05
File ID (561,28,0)   End of file block 116 / Allocated 116

Virtual block number 48 (00000030), 512 (0200) bytes

279A006A 006A006A 006A016E 68008068 FC76FFFE 76FF0057 E9FA468B 0006E903 .Õ...F*ÕW..v±.v▪h¯.hn.j.j.j.j..' 000000
E9FA468B 0006E903 7500003D FA468950 28156A9A 00806814 76FF1676 FF000055 U...v..v.h¯..j.(P.F*=..u.Õ...F*Õ 000020
00E90000 8B000052 099A006A 006A006A 006A0125 6800C168 FC76FFFE 76FF001F ...v±.v▪hè.h%.j.j.j.j...R..|..Õ. 000040
0A76FF0C 76FF0676 FF0876FF D88E5484 B81E5657 0000A6C8 0012CAC9 5F5E1F00 ..^_èò..àÌ..WV.¡.T.Ä.v..v..v..v. 000060
B0468B01 45E9AA46 8B0006E9 03750000 3DAA4689 00004E47 9A501680 468D0F6A j..F¯.P.GN...F^=..u.Õ...F^ÕE..F¯ 000080
8354FF55 389A0676 FF0876FF 8076FFB2 76FF0E76 FF1076FF 002BE903 75B2460B .Fýu.Õ+..v..v..vý.v¯.v..v..8U.T. 0000A0
6A0A76FF 0C76FF06 76FF0876 FF010FE9 AA468800 06E90375 00003DAA 46890CC4 á..F^=..u.Õ...F^Õ...v..v..v..v.j 0000C0
0BAC468B 00E6E9AA 46880006 E9037500 003DAA46 8900004E C89A5016 AC468D13 ..F¯.P.àN...F^=..u.Õ...F^ÕÌ..F¯. 0000E0
E9037502 47082607 8826FF5A 9EC404FF 5A868300 05E9FF5C 9689FF5A 8689AE56 VÛ..Z...\.Õ....Z..á.Z.&..&.G.u.Õ 000100
89000051 DF9A5016 B4468D02 6A37FF26 0277FF26 FF5A9EC4 0676FF08 76FF00A9 ^..v..v.á.Z.&.w.&.7j..FÇ.P.ÕQ... 000120
81E9AA46 8B000056 8E9AAC76 FFAE76FF 0676FF08 76FF0017 E9037500 003DAA46 F^=..u.Õ...v..v..vÛ.v¯..V...F^Õ. 000140
009A5016 FF5E868D 50168446 8D08C483 56510046 9A5016FF 5E868D01 38681E00 ..h;...^..P.F.QV.á..FÇ.P..^..P.. 000160
FF260277 FF26FF5A 9EC45016 FF5E868D 009E681E 0E76FF10 76FF08C4 83518100 ..Q.á..v..v..h....^..Pá.Z.&.w.&. 000180
56A89AAC 76FFAE76 FF0676FF 0876FF00 17E90375 00003DAA 46890000 4F5E9A37 7.^O...F^=..u.Õ...v..v..vÛ.v¯.¯V 0001A0
E9AA468B 00004F3A 9AAC76FF AE76FF06 76FF0876 FFFF42E9 001AE9AA 46880000 ...F^Õ..ÕB..v..v..vÛ.v¯.:O...F^Õ 0001C0
76FF2276 FF000107 C726065E C4088E55 40881E56 57000006 C8CBC95F 5E1F0000 ...^_èùà...WV.|@U.Äá^.&ú....v".v 0001E0
```

```
Dump of file SATURN:[PCCOMMON.DUMP.DLL]DAENTDF.TMP;1 on 18-APR-1990 10:40:49.05
File ID (561,28,0)   End of file block 116 / Allocated 116

Virtual block number 49 (00000031), 512 (0200) bytes

 FA7E8300 87E90375 000030FA 4689FFFF 00009A0A 76FF0C76 FF0E76FF 1076FF20  .v..v..v..v.......F*=..u.Õ...~* 000000
 FF260234 068E006A 006A0000 54C59A50 16FC4680 2076FF22 76FF005B E9037401 .t.Õ[..v".v .F=.P.éT..j.j...4.&. 000020
 6A012568 00C168FC 76FFFE76 FF000057 6A9A1A76 FF1C76FF 01966831 6A019636 6..j1h...v..v..jW...v±.v=hé.h%.j 000040
 1DE90000 4C629A01 3F681E00 C068FC76 FFFE76FF 000054EF 9A006A00 6A006A00 .j.j.j..ÿT...v±.v=hå..h?..bL..Õ. 000060
 46880000 52F49A1A 76FF1C76 FF019668 336A0196 36FF2602 34068E00 6A006A00 .j.j...4.&.6..j3h...v..v..¶R...F 000080
 0A76FFD8 8E568F88 1E565700 0014C800 1ECAC95F 5E1F0000 E90000B8 0006E9FA *Õ..|..Õ...^_èò..à...WV.|¢V.Ä.v. 0000A0
 76FF010A E9F04688 0006E903 75000030 F0468900 00508A9A 5016F246 8D0876FF .v..F·.P..P...FÞ=..u.Õ...FÞÕ...v 0000C0
 FF00E9E9 F0468800 06E90375 00003DF0 46890000 4DDC9A50 16EC468D 0876FF0A ..v..F$.P.ÉM...FÞ=..u.Õ...FÞÕÕ.. 0000E0
 00C8E9F0 46880006 E9037500 003DF046 89000057 029A5016 F6468D08 76FF0A76 v..v..F-.P..W...FÞ=..u.Õ...FÞÕà. 000100
 03750000 3DF04689 00005558 9A5016FA 468D0F6A EC76FFEE 76FFF276 FFF476FF .v¶.v·.vŸ.v$j..F*.P.XU...FÞ=..u. 000120
 FA76FFFC 76FFF676 FFF876FF 002BE903 75FC460B FA468800 9FE9F046 880006E9 Õ...FÞÕ...F*.F=u.Õ+..v½.v—.v=.v* 000140
 FF0069E9 F0468800 06E90375 000030F0 46890CC4 83589C5E 3F9AF276 FFF476FF .v¶.v·.?^.X.á..FÞ=..u.Õ...FÞÕi.. 000160
 0006E903 7500003D F0468900 00FFFF9A 5016FE46 8DEC76FF EE76FFF2 76FFF476 v¶.v·.vŸ.v$.F±.P......FÞ=..u.Õ.. 000180
 F876FFEC 76FFEE76 FF006A00 33E90000 B80006E9 037400FE 7E830042 E9F04688 .FÞÕB..~±.t.Õ..|..Õ3.j..vŸ.v$.v½ 0001A0
 E9F04688 0006E903 7500003D F046890E C483558D 588F9AF2 76FFF476 FFF676FF .v~.v¶.v·.¢X.U.á..FÞ=..u.Õ...FÞÕ 0001C0
 76FF0876 FFD88E57 89B81E56 57000114 C80006CA C95F5E1F 0000E9F0 46880006 ...FÞÕ...^_èò..à...WV.|.W.Ä.v..v 0001E0
```

```
Dump of file SATURN:[PCCOMMON.DUMP.DLL]DAENTDF.TMP;1 on 18-APR-1990 10:40:49.05
File ID (561,28,0)   End of file block 116 / Allocated 116

Virtual block number 50 (00000032), 512 (0200) bytes

 0007E903 7500003D FF428689 00005A3B 9A5016FF 44868D12 6A0E76FF 1076FF06 ..v..v.]...D..P.;Z....B.=..u.Õ.. 000000
 C404FEF0 86830005 E9FEF296 89FEF086 89FF4696 88FF4486 8B0543E9 FF428688 ..B.ÕC...D...F...Þ±...±Õ....Þ±.á 000020
 37FF2602 77FF26FE F09EC406 76FF0876 FF0502E9 03750247 08260788 26FEF09E .Þ±&..&.G.u.Õ...v..v.á.Þ±&.w.&.7 000040
 B6FF0676 FF0876FF 001AE903 7500003D FF428689 0000597C 9A5016A4 468D036A j..FÊ.P.|Y....B.=..u.Õ...v..v..Ñ 000060
 0277FF26 FEF09EC4 0676FF08 76FF04D8 E9FF4286 88000059 9B9AFF44 B6FFFF46 F..ÑD...Y....B.ÕÄ..v..v.á.Þ±&.w. 000080
 FF0876FF 001AE903 7500003D FF428689 00005B9E 9A5016FF 4C868D04 6A37FF26 &.7j...L..P..[....B.=..u.Õ...v.. 0000A0
 FEF09EC4 0676FF08 76FF0494 E9FF4286 88000059 DE9AFF44 B6FFFF46 B6FF0676 v..ÑF..ÑD..BY....B.Õ...v..v.á.Þ± 0000C0
 FF001AE9 03750000 3DFF4286 89000040 989A5016 FB468D13 6A37FF26 0277FF26 &.w.&.7j..F½.P..ə....B.=..u.Õ... 0000E0
 037401FF 4CBE8304 51E9FF42 86880000 5A5A9AFF 44B6FFFF 46B6FF06 76FF0876 v..v..ÑF..ÑD..ZZ....B.Õɑ../L..t. 000100
 83040FE9 037400A6 7E830418 E9037401 A47E8304 21E90374 00FF4EBE 83042BE9 Õ+../N..t.Õ!..~Ê.t.Õ...~Î.t.Õ... 000120
 260277FF 26FEF09E C40676FF 0876FF03 FDE90374 00FA7E83 0406E903 7401F87E ~½.t.Õ...~*.t.Õ»..v..v.á.Þ±&.w.& 000140
 76FF0876 FF001AE9 03750000 3DFF4286 8900005B DC9A5016 FEEC868D 136A37FF .7j...$±.P.É[....B.=..u.Õ...v..v 000160
 F44689FE EE9688FE EC868803 D5E9FF42 86880000 5AAA9AFF 44B6FFFF 46B6FF06 ..ÑF..ÑD..ˆZ....B.Õ(...$±..Ÿ±.F¶ 000180
 8900005A FB9A5016 9C468D00 6A37FF26 0277FF26 F45EC406 76FF0876 FFF65689 .V~.v..v.á^¶&.w.&.7j..f..P.«Z... 0001A0
 76FF0000 5ABD9AFE ECB6FFFE EEB6FF06 76FF0876 FF002DE9 03750000 30FF4286 .B.=..u.Õ-..v..v..ÑŸ±.Ñ$±.§Z...v 0001C0
 8B9C4688 FEF09EC4 0372E9FF 42868800 005B1A9A FF44B6FF FF46B6FF 0676FF08 ..v..ÑF..ÑD...[....B.Õr.á.Þ±.F.. 0001E0
```

```
Dump of file SATURN:[PCCOMMON.DUMP.DLL]DAENTDF.TMP;1 on 18-APR-1990 10:40:49.05
File ID (561,28,0)   End of file block 116 / Allocated 116

Virtual block number 51 (00000033), 512 (0200) bytes

 0277FF26 F45EC406 76FF0876 FF0055E9 03740257 3926005E E9037407 39269E56 V.&9.t.Õ^.&9W.t.ÕU..v..v.á^¶&.w. 000000
 76FF0876 FF002DE9 03750000 3DFF4286 8900005B 5F9A5016 9C468D0E 6A37FF26 &.7j..F..P._[....B.=..u.Õ-..v..v 000020
 0058479A FF44B6FF FF46B6FF 0676FF08 76FF0000 5B2D9AFE ECB6FFFE EEB6FF06 ..ÑŸ±.Ñ$±.-[...v..v..ÑF..ÑD..G[. 000040
 76FF0876 FF00005B 7E9AFEEC B6FFFEEE B6FF0676 FF0876FF 0302E9FF 42868800 ...B.Õ...v..v..ÑŸ±.Ñ$±.~[...v..v 000060
 FF001AE9 03750000 30FF4286 8900005B 049A5016 FC468D10 6A9C76FF 9E76FF06 ..v..v.j..F=.P..X....B.=..u.Õ... 000080
 FF0676FF 0876FF02 B1E9FF42 86880000 5BBD9AFF 44B6FFFF 46B6FF06 76FF0876 v..v..ÑF..ÑD..§[....B.ÕŸ..v..v.. 0000A0
 76FF001A E9037500 003DFF42 86890000 56089A50 16FF5086 8D026AFC 76FFFE76 v±.v=j...P..P..V....B.=..u.Õ...v 0000C0
 76FF0676 FF0876FF 0272E9FF 42868800 005BFB9A FF44B6FF FF46B6FF 0676FF08 ..v..ÑF..ÑD..«[....B.Õr..v..v..v 0000E0
 FF0876FF 001AE903 7500003D FF428689 00005587 9A5016A0 468D136A FC76FFFE ±.v=j..F..P.ñU....B.=..u.Õ...v.. 000100
 FF488689 A25688A0 46880234 E9FF4286 88000056 279AFF44 B6FFFF46 B6FF0676 v..ÑF..ÑD..'V....B.Õ4..F..VÅ..H. 000120
 FF0876FF 01E1E903 75024708 26078826 FF489EC4 04FF4886 830005E9 FF4A9689 ..J.Õ....H..á.H.&..&.G.u.ÕÄ..v.. 000140
 003DFF42 86890000 5CA59A50 16FF4086 80046A37 FF260277 FF26FF48 9EC40676 v.á.H.&.w.&.7j...ə..P.É\....B.=. 000160
 FF0676FF 0876FF00 005C769A FF44B6FF FF46B6FF 0676FF08 76FF0028 E9037500 .u.Õ+..v..v..ÑF..ÑD..v\...v..v.. 000180
 76FF0876 FF017FE9 037459FF 40BE8001 B9E9FF42 86880000 5CC49AA0 76FFA276 vÅ.v..á\....B.Õ¿../ə.Yt.Õ...v..v 0001A0
 00003DFF 42868900 0059389A 5016FEF4 868D026A 37FF2602 77FF26FF 489EC406 .á.H.&.w.&.7j...¶±.P.8Y....B.=.. 0001C0
 76FF0676 FF0876FF 00005CD5 9AFF4486 FFFF4686 FF0676FF 0876FF00 28E90375 u.Õ+..v..v..ÑF..ÑD..(\...v .v..v 0001E0
```

Dump of file SATURN:[PCCOMMON.DUMP.DLL]DAENTDF.TMP;1 on 18-APR-1990 10:40:49.05
File ID (561,28,0)   End of file block 116 / Allocated 116

Virtual block number 52 (00000034), 512 (0200) bytes

```
50868D01 40681E00 80E90374 00127E83 015AE9FF 42868800 005D4A9A A076FFA2 Å.v..J]....B.ÕZ..-..t.Õ...hà...P 000000
FF08C483 5D750000 9A5016FF 50868D50 16FEF486 8D08C483 5D0A0000 9A5016FF ..P....].á...¶±.P..P..P...u].á.. 000020
8900005D CC9A37FF 260277FF 26FF489E C45016FF 50868D00 5E681E0A 76FF0C76 v..v..h^...P..Pá.H.&.w.&.7.ä]... 000040
76FF0000 5D5B9AFF 4486FFFF 4686FF06 76FF0876 FF002BE9 03750000 30FF4286 .B.=..u.Õ+..v..v..ÑF..ÑD..(]...v 000060
A8468D01 42681E00 9EE90004 E9FF4286 8B00005D EB9AA076 FFA276FF 0676FF08 ..v..vÅ.v..Š]....B.Õå.Õ...hB..F´ 000080
45681E08 C4835D99 00009A50 16A8468D 5016FF50 868D08C4 835D8800 469A5016 .P.F..].á...P..P.F´.P....].á..hE 0000A0
C483563E 00009A50 16A8468D 5016FEF4 868D08C4 835DAC00 009A5016 A8468D01 ..F´.P...¯].á...¶±.P.F´.P...>V.á 0000C0
00005672 9A37FF26 0277FF26 FF489EC4 5016A846 8D005E68 1E0A76FF 0C76FF08 ..v..v..h^..F´.Pá.H.&.w.&.7.rV.. 0000E0
FF00005D FC9AFF44 B6FFFF46 B6FF0676 FF0876FF 002BE903 7500003D FF428689 ..B.=..u.Õ+..v..v..ÑF..ÑD..•]... 000100
0876FFFE 0AE90003 E90033E9 FF42868B 00005E1A 9AA076FF A276FF06 76FF0876 v..v..vÅ.v...^....B.Õ3.Õ..Õ.±.v. 000120
9AFF44B6 FFFF46B6 FF0676FF 0876FFFA E9E90000 5E309AA0 76FFA276 FF0676FF .v..vÅ.v..0^..ÕÕ*.v..v..ÑF..ÑD.. 000140
76FF0876 FFD88E58 C7B81E56 57000006 C8CBC95F 5E1F0000 E90000B8 00005957 WY..|..Õ...^_èùà...WV.¡üX.Å.v..v 000160
46880006 E9037500 003DFA46 8900005A 889A5016 FC468D0F 6A0A76FF 0C76FF06 ..v..v.j..F=¯P..Z...F*=..u.Õ...F 000180
76FF0876 FFFC76FF FE76FF0E 76FF1076 FF002BE9 0375FE46 0BFC468B 0069E9FA *Õi..F=.F±u.Õ+..v..v..v±.v•.v..v 0001A0
FF0C76FF 016A0033 E9FA4688 0006E903 7500003D FA46890C C4835EC1 5E3F9A06 ..?^ê^.á..F*=..u.Õ...F*Õ3.j..v.. 0001C0
06E90375 00003DFA 46890EC4 83583958 BF9A0676 FF0876FF 0E76FF10 76FF0A76 v..v..v..v..v..¢X9X.á..F*=..u.Õ. 0001E0
```

Dump of file SATURN:[PCCOMMON.DUMP.DLL]DAENTDF.TMP;1 on 18-APR-1990 10:40:49.05
File ID (561,28,0)   End of file block 116 / Allocated 116

Virtual block number 53 (00000035), 512 (0200) bytes

```
76FFD88E 5E47B81E 56570000 06C8CBC9 5F5E1F00 00E90000 B80006E9 FA468800 ..F*Õ..|..Õ...^_èùà...WV.¡G^.Ä.v 000000
FF1476FF 1676FF18 76FF0001 07C72606 5EC40000 57DB9A50 16FC468D 2076FF22 ".v .F•.P.ÛW..á^.&ú....v..v..v.. 000020
0006E903 7500003D FA468900 00FFFF9A 006A0A76 FF0C76FF 0E76FF10 76FF1276 v..v..v..v..v.j.......F*=..u.Õ.. 000040
C4D88E5E EAB81E56 5700001C C8001ECA C95F5E1F 0000E900 00B80006 E9FA468B .F*Õ..|..Õ...^_èò..à...WV.|õ^.Äá 000060
89000057 999A5016 EC468D14 76FF1676 FF000407 C726065E C4000407 C7260E5E ^.&ú...á^.&ú.á¯..v..v..F$.P..W... 000080
000057BA 9A5016E4 468D1476 FF1676FF 012DE9E8 46880006 E9037500 003DE846 Fò=..u.Õ...FòÕ-..v..v..FÕ.P.¤W.. 0000A0
005EFA9A 5016F246 8D1476FF 1676FF01 0CE9E846 880006E9 03750000 3DE84689 .Fò=..u.Õ...FòÕ...v..v..F·.P.*^. 0000C0
3AB99A50 16F0468D 1476FF16 76FF00EB E9E84688 0006E903 7500003D E8468900 ..Fò=..u.Õ...FòÕ5..v..v..Fþ.P.¿: 0000E0
6A016568 00D668F2 76FFF476 FF00CAE9 E8468800 06E90375 00003DE8 46890000 ...FÒ=..u.Õ...FòÕò..v¶.v·h•.he.j 000100
000307C7 260E5EC4 000EE903 74FFFA7E 83FA4689 0000602C 9A006A00 6A006A00 .j.j.j..,'...F*.-*.t.Õ..á^.&ú... 000120
00005738 9A006A00 6AFA76FF 006A016A 68000668 F276FFF4 76FF0097 E90000B8 |..Õ...v¶.v·h•.hj.j..v*j.j..9W.. 000140
06E90375 00003DE8 46890000 0F859A50 16EA468D 1476FF16 76FFF856 89F64689 .F-.V½.v..v..Fõ.P......Fò=..u.Õ. 000160
E9037500 003DE846 8900004E 1E9A5016 FC468014 76FF1676 FF0056E9 E8468800 ..FòÕV..v..v..F•.P..N...Fò=..u.Õ 000180
6A1DAF68 EA76FF5A 57892658 478926F8 568BF646 8BFC5EC4 0035E9E8 46880006 ...FòÕ5.á^•.F-.V½&.GX&.WZ.võh£.j 0001A0
5F5E1F00 00E9E846 88000307 C7260E5E C400000D 529AF676 FFF876FF 01F16800 .hþ..v½.v-.R...á^.&ú....FòÕ...^_ 0001C0
5D9A5016 FA468006 76FF0876 FF0A76FF D88E5F4B B81E5657 000006C8 0012CAC9 èò..à...WV.¡K_.Ä.v..v..v..F*.P.Ĵ 0001E0
```

Dump of file SATURN:[PCCOMMON.DUMP.DLL]DAENTDF.TMP;1 on 18-APR-1990 10:40:49.05
File ID (561,28,0)   End of file block 116 / Allocated 116

Virtual block number 54 (00000036), 512 (0200) bytes

```
0876FF0A 76FF008E E906468B 0085E9FE 46880006 E9037500 003DFE46 89000043 C...F±=..u.Õ...F±Õç..F.Õ...v..v. 000000
88E9FE46 8B0006E9 03750000 3DFE4689 0000612B 9AFA76FF FC76FF06 76FF036A j..v..v•.v*.+a...F±=..u.Õ...F±Õ. 000020
89000061 5A9A5052 000405FC 568BFA46 8B0676FF 056A0876 FF0A76FF 007FE900 .Õ...v..v.j..v..F*.V•...RP.Za... 000040
46880676 FF046A08 76FF0A76 FF0050E9 0059E9FE 46880006 E9037500 003DFE46 F±=..u.Õ...F±ÕY.ÕP..v..v.j..v..F 000060
E9002AE9 FE468B00 06E90375 00003DFE 46890000 FFFF9A50 52000805 FC568BFA *.V•...RP......F±=..u.Õ...F±Õ*.Õ 000080
FFB3E903 7500E23D FF8CE903 7500E03D FF6AE903 7500E03D 001BE900 1EE90021 !.Õ..Õ..=ß.u.Õj.=Å.u.Õ..=ã.u.Õ*. 0000A0
00FE46C7 D88E60BC B81E5657 000006C8 0006CAC9 5F5E1F00 00E9FE46 8BFFDFE9 ÕÕ..F±Õ...^_èò..à...WV.¡¥'.ÄüF±. 0000C0
5EC40000 571F9A0A 76FF0C76 FF019668 2B6A0196 36FF2602 34068E00 6A006A00 .j.j...4.&.Õ..j+h...v..v...W..á^ 0000E0
75000030 FE468900 0060CF9A 5016FA46 8D1276FF 1476FF16 76FF0002 07C7260E .&ú....v..v..v..F*.P.ü'...F±=..u 000100
76FFFC76 FF1276FF 036A1476 FF1676FF 0115E912 46880175 E9FE468B 0006E903 .Õ...F±Õu..F.Õ...v..v.j..v..v•.v 000120
3EED9A0A 76FF0C76 FF019668 FE76FF00 17E90375 00003DFE 46890000 FFFF9AFA *......F±=..u.Õ...v±h...v..v..Û> 000140
9A00E268 1476FF16 76FF6252 60849A00 E0681476 FF1676FF 0137E9FE 46880000 ...F±Õ7..v..v.hÅ..Ç'Rb.v..v.hã.. 000160
62CA9A50 52000405 FC568BFA 468B1276 FF056A14 76FF1676 FF0009E9 62A060B4 Ç'.bÕ1..v..v.j..v..F*.V•...RP.òb 000180
46880000 62E69A0A 76FF0C76 FF019668 FE76FF00 17E90375 00003DFE 46890000 ...F±=..u.Õ...v±h...v..v..lb...F 0001A0
62FC60B4 9A00E268 1476FF16 76FF62AE 60B49A00 DE681476 FF1676FF 000BE9FE ±ÕÜ..v..v.hß..Ç'Ûb.v..v.hã..Ç'•b 0001C0
46890000 62129A50 52000805 FC568BFA 468B1276 FF046A14 76FF1676 FF007DE9 Õ)..v..v.j..v..F*.V•...RP..b...F 0001E0
```

```
Dump of file SATURN:[PCCOMMON.DUMP.DLL]DAENTDF.TMP;1 on 18-APR-1990 10:40:49.05
File ID (561,28,0)   End of file block 116 / Allocated 116

Virtual block number 55 (00000037), 512 (0200) bytes

 007FE9FE 46880000 622E9A0A 76FF0C76 FF019668 FE76FF00 17E90375 00003DFE ±=..u.Õ...v±h...v..v...b...F±Õ.. 000000
 E90021E9 5E946084 9A00E068 1476FF16 76FF630A 60849A00 DE681476 FF1676FF .v..v.hB..Ç'.c.v..v.hÀ..Ç'.^Õ!.Õ 000020
 FFDFE9FF 86E90375 00E23DFF 32E90375 00E03DFE E3E90375 00DE3000 1BE9001E ..Õ..=B.u.ÕD±=À.u.Õ2.=ã.u.Õ..ÕÕ. 000040
 1676FF00 0063579A 00A06814 76FF1676 FF000107 C7260E5E C40007C6 260A5EC4 á^.&ó..á^.&ú....v..v.h...Wc...v. 000060
 1F0000E9 FE468800 0054509A 009F6814 76FF1676 FF000063 659A00A1 681476FF .v.hÀ..ec...v..v.h...]T...F±Õ... 000080
 5016F046 800676FF 0876FF0A 76FFD88E 61A8881E 56570000 14C80012 CAC95F5E ^_èò..à...WV.¡´a.Ã.v..v..v..FÞ.P 0000A0
 16F64680 0876FF0A 76FF011D E9F44688 0006E903 7500030D F4468900 0061E59A .Ta...F¶=..u.Õ...F¶Õ...v..v..F-. 0000C0
 FA468D08 76FF0A76 FF00FCE9 F4468800 06E90375 00003DF4 46890000 5F689A50 P.k_...F¶=..u.Õ...F¶Õ•..v..v..Fª 0000E0
 46800876 FF0A76FF 000BE9F4 46880006 E9037500 0030F446 8900005F AD9A5016 .P.Ū_...F¶=..u.Õ...F¶ÕÜ..v..v..F 000100
 FFF676FF F876FF00 8AE9F446 880006E9 03750000 30F44689 00005F8C 9A5016EC &.P.._...F¶=..u.Õ...F¶Õ¤..v½.v-. 000120
 8EB9B800 06E90375 00003000 005C469A 505240F2 568BF046 88086AEC 76FFEE76 vŸ.v$]..FÞ.V·@RP.F\..=..u.Õ..¦¿. 000140
 46C70056 E900F4FE 46C7005E E900F3FE 46C70038 E9980147 8A26F05E C40090E9 Õ..á^Þ&.G..Õ;.úF±µ.Õ^.úF±¶.ÕV.úF 000160
 C626F05E C400F3FE 46C7003E E900F7FE 46C70046 E900F6FE 46C7004E E900F5FE ±%.ÕN.úF±-.ÕF.úF±%.Õ>.úF±µ.á^Þ&6 000180
 C5E90375 00333DFF C5E90375 00323DFF C5E90375 00313000 2BE9002E E9430147 G.CÕ..Õ+.=1.u.Õ¢.=2.u.Õ¢.=3.u.Õ¢ 0001A0
 012568FE 76FFFA76 FFFC76FF FFC2E9FF 9DE90375 00433DFF C5E90375 00343DFF .=4.u.Õ¢.=C.u.Õ..Õõ..v=.vª.v±hX. 0001C0
 56570000 12C80006 CAC95F5E 1F0000E9 00008800 005FF89A 006A006A 016A006A j.j.j.j..½_..¡..Õ...^_èò..à...WV 0001E0

Dump of file SATURN:[PCCOMMON.DUMP.DLL]DAENTDF.TMP;1 on 18-APR-1990 10:40:49.05
File ID (561,28,0)   End of file block 116 / Allocated 116

Virtual block number 56 (00000038), 512 (0200) bytes

 019636FF 26023406 8E006A00 6A000207 C7260E5E C40000F6 46C7D88E 637EB81E .¡~c.ÃúF-..á^.&ú...j.j...4.&.6.. 000000
 919A5016 F2468D12 76FF1476 FF1676FF 0000661A 9A0A76FF 0C76FF01 96682C6A j,h...v..v...f...v..v..v..F·.P.. 000020
 9A5016F8 468D1476 FF1676FF 01B8E9F6 46880006 E9037500 0030F646 89000063 c...F-=..u.Õ...F-Õ£..v..v..F½.P. 000040
 5016FC46 8D1476FF 1676FF01 9AE9F646 880006E9 03750000 30F64689 00006382 ýc...F-=..u.Õ...F-Õ...v..v..F=.P 000060
 16EE4680 1476FF16 76FF0179 E9F64688 0006E903 7500030D F6468900 0063D39A .Æc...F-=..u.Õ...F-Õy..v..v..FŸ. 000080
 F25EC400 35E91246 880158E9 F6468800 06E90375 000030F6 46890000 63F49A50 P.¶c...F-=..u.Õ...F-ÕX..F.Õ5.á^· 0000A0
 C626F25E C40042E9 3207C626 F25EC400 4CE93107 C626F25E C40056E9 4307C626 &6.CÕV.á^·&6.1ÕL.á^·&6.2ÕB.á^·&6 0000C0
 E9037500 F430FFC3 E9037500 F330002B E9002EE9 3407C626 F25EC400 38E93307 .3ÕB.á^·&6.4Õ..Õ+.=µ.u.Õû.=¶.u.Õ 0000E0
 F25EC400 00E9FFCB E9037500 F730FFC9 E9037500 F630FFC7 E9037500 F530FFC5 é.=%.u.Õú.=-.u.Õè.=%.u.Õù.Õ..á^· 000100
 9668156A 019636FF 26023406 8E006A00 6A00A1E9 03750147 3826F25E C4078A26 &..á^·&8G.u.ÕÀ.j.j...4.&.6..j.h. 000120
 0053079A 505252EF 8A0000B8 F876FFFA 76FF0000 61CA9A50 5266288A 0000B801 .¡..¤(fRP.ða...vª.v½¡..¤ÿRRP..S. 000140
 086AEE76 FFF076FF F876FFFA 76FF0090 E9F64688 0006E903 7500030D F6468900 ..F-=..u.Õ...F-Õ...vª.v½.vÞ.vŸj. 000160
 00536C9A F876FFFA 76FF0011 E9037500 0030F646 89000053 569AF276 FFF476FF .v¶.v·.VS...F-=..u.Õ...vª.v½.ìS. 000180
 F6468800 06E90375 000030F6 46890000 54089AF8 76FFFA76 FF0068E9 F6468800 ..F-Õh..vª.v½..T...F-=..u.Õ...F- 0001A0
 FF000107 C7260E5E C40007C6 260A5EC4 01478826 F25EC407 8A26F25E C4004CE9 ÕL.á^·&..á^·&.G.á^.&6..á^.&ú.... 0001C0
 76FF1676 FF000066 D59A00A1 681476FF 1676FF00 0066C79A 00A06814 76FF1676 v..v.h...úf...v..v.hÀ..ff...v..v 0001E0

Dump of file SATURN:[PCCOMMON.DUMP.DLL]DAENTDF.TMP;1 on 18-APR-1990 10:40:49.05
File ID (561,28,0)   End of file block 116 / Allocated 116

Virtual block number 57 (00000039), 512 (0200) bytes

 64D2B81E 56570000 12C80012 CAC95F5E 1F0000E9 F6468800 0063499A 009F6814 .h...Ic...F-Õ...^_èò..à...WV.¡@d 000000
 0006E903 7500030D F2468900 00650F9A 5016FC46 800676FF 0876FF0A 76FFD88E .Ã.v..v..v..F=.P..e...F·=..u.Õ.. 000020
 06E90375 000030F2 46890000 65309A50 16F4468D 0876FF0A 76FF0107 E9F24688 .F·Õ...v..v..F¶.P.0e...F·=..u.Õ. 000040
 E9037500 0030F246 89000065 519A5016 F8468008 76FF0A76 FF00E6E9 F2468800 ..F·Õ!..v..v..F½.P.Qe...F·=..u.Õ 000060
 03750000 30F24689 00006572 9A5016EE 46800876 FF0A76FF 00C5E9F2 46880006 ...F·Õ¢..v..v..FŸ.P.re...F·=..u. 000080
 505240FE 568BFC46 88096AEE 76FFF076 FFF476FF F676FF00 A4E9F246 880006E9 Õ...F·Õ£..v-.v¶.vÞ.vŸj..F=.V±@RP 0000A0
 0035E903 7459017F 8026FC5E C4007AE9 8EB9B800 06E90375 00003000 0064219A .Id..=..u.Õ..¦¿.Õz.á^=&...Yt.Õ5. 0000C0
 68F876FF FA76FF00 0067DE9A 006A006A 006A006A 01256801 0068F876 FFFA76FF .vª.v½h..hX.j.j.j.j..Bg...vª.v½h 0000E0
 256800FB 68F876FF FA76FF00 32E90000 67FA9A00 6A006A01 6A006A01 256800FB «.hX.j.j.j.j..ªg..Õ2..vª.v½h«.hX 000100
 006A016A 006A0125 68010068 F876FFFA 76FF0000 68139A00 6A006A00 6A006A01 .j.j.j.j...h...vª.v½h..hX.j.j.j. 000120
 D88E66EE B81E5657 000012C8 0006CAC9 5F5E1F00 00E90000 B8000064 B99A006A j..¿d..¡..Õ...^_èò..à...WV.¡Ÿf.Ã 000140
 FF019668 206A0196 36FF2602 34068E00 6A006A00 0207C726 0E5EC400 00F246C7 úF·..á^.&ú...j.j...4.&.6..j-h... 000160
 F2468900 0067019A 5016FC46 801276FF 1476FF16 76FF0000 69709A0A 76FF0C76 v..v..pi...v..v..v..F=.P..g...F· 000180
 46890000 67229A50 16F4468D 1476FF16 76FF0108 E9F24688 0006E903 7500030D =..u.Õ...F·ÕÜ..v..v..F¶.P."g...F 0001A0
 89000067 439A5016 F8468014 76FF1676 FF01BAE9 F2468800 06E90375 000030F2 ·=..u.Õ...F·Õ¤..v..v..F½.P.Cg... 0001C0
 00006764 9A5016EE 46801476 FF1676FF 0199E9F2 46880006 E9037500 0030F246 F·=..u.Õ...F·Õ...v..v..FŸ.P.dg.. 0001E0
```

Dump of file SATURN:[PCCOMMON.DUMP.DLL]DAENTDF.TMP;1 on 18-APR-1990 10:40:49.05
File ID (561,28,0)   End of file block 116 / Allocated 116

Virtual block number 58 (0000003A), 512 (0200) bytes

```
76FF5907 C626FC5E C40049E9 12468801 78E9F246 880006E9 03750000 3DF24689 .F·=..u.Õ...F·Õx..F.ÕI.á^=&ó.Y.v 000000
07C626FC 5EC40039 E9000069 269A006A 006A006A 006A0125 68010068 F876FFFA ª.v¼h..h%.j.j.j.j..&i..Õ9.á^=&ó. 000020
0013E900 16E90000 67C59A00 6A006A00 6A006A01 256800FB 68F876FF FA76FF4E N.vª.v¼h«.h%.j.j.j.j..ég..Õ..Õ.. 000040
01473826 FC5EC407 8A26FC5E C40000E9 FFCAE903 7501003D FFAFE903 7500FB3D =«.u.Õ€.=..u.Õò.Õ..á^=&..á^=&8G. 000060
9A505269 7E8A0000 88019668 176A0196 36FF2602 34068E00 6A006A00 C5E90375 u.Õé.j.j...4.&.6..j.h..¦..¤-iRP. 000080
E9037500 003DF246 89000066 2D9A5052 6615BA00 0088F476 FFF676FF 000064FC =d...v-.v¶¦..¤.fRP.-f...F·=..u.Õ 0000A0
F476FFF6 76FF00AF E9F2468B 00006A03 9A014768 1EF276FF F876FFFA 76FF0018 ...vª.v½.v·.hG...j...F·Õ€..v-.v¶ 0000C0
76FF0011 E9037500 003DF246 89000066 579AFC76 FFFE76FF 096AEE76 FFF076FF .vÞ.vŸj..v±.v=.Wf...F·=..u.Õ...v 0000E0
000030F2 46890000 667E9AF4 76FFF676 FF007AE9 F2468B00 006609A F476FFF6 -.v¶.mf...F·Õz..v-.v¶.-f...F·=.. 000100
FC5EC400 4CE9F246 880000FF FF9A015C 681EF276 FFF876FF FA76FF00 18E90375 u.Õ...vª.v½.v·.h\.......F·ÕL.á^= 000120
681476FF 1676FF00 0107C726 0E5EC400 07C6260A 5EC40147 8826FC5E C4078A26 &..á^=&.G.á^.&ó..á^.&ú....v..v.h 000140
899A009F 681476FF 1676FF00 006A4F9A 00A16814 76FF1676 FF00006A 419A00A0 ...Aj...v..v.hÀ..Oj...v..v.h...¿ 000160
FF0A76FF D88E682C 881E5657 000006C8 0012CAC9 5F5E1F00 00E9F246 88000066 f...F·Õ...^_èò..à...WV.¦,h.Ä.v.. 000180
002DE9FA 46880006 E9037500 003DFA46 89000068 699A5016 FC468006 76FF0876 v..v..F=.P.Ïh...Fª=..u.Õ...FªÕ-. 0001A0
06E90375 00003DFA 46890000 FFFF9AFC 76FFFE76 FF0676FF 066A0876 FF0A76FF .v..v.j..v..v±.v=......Fª=..u.Õ. 0001C0
D88E6A68 881E5657 000006C8 0006CAC9 5F5E1F00 00E9FA46 880006E9 FA468800 ..FªÕ...FªÕ...^_èò..à...WV.¦hj.Ä 0001E0
```

Dump of file SATURN:[PCCOMMON.DUMP.DLL]DAENTDF.TMP;1 on 18-APR-1990 10:40:49.05
File ID (561,28,0)   End of file block 116 / Allocated 116

Virtual block number 59 (0000003B), 512 (0200) bytes

```
0E5EC400 0068569A 0A76FF0C 76FF0196 682E6A01 9636FF26 0234068E 006A006A j.j...4.&.6..j.h...v..v..Vh..á^. 000000
03750000 3DFA4689 00006A78 9A5016FC 46801276 FF1476FF 1676FF00 0207C726 &ú....v..v..v..F=.P.(j...Fª=..u. 000020
890000FF FF9AFC76 FFFE76FF 1276FF06 6A1476FF 1676FF00 77E9FA46 880006E9 Õ...FªÕw..v..v.j..v..v±.v=...... 000040
3FE9FA46 88000062 8A9A0A76 FF0C76FF 019668FA 76FF0017 E9037500 003DFA46 Fª=..u.Õ...vªh...v..v...b...FªÕ7 000060
76FF0000 6B789A00 A0681476 FF1676FF 000107C7 260E5EC4 0007C626 0A5EC400 .á^.&ó..á^.&ú....v..v.h...xk...v 000080
0000E9FA 46880000 6A339A00 9F681476 FF1676FF 00006886 9A00A168 1476FF16 ..v.hÀ...k...v..v.h...3j...FªÕ.. 0000A0
16F0468D 0676FF08 76FF0A76 FFD88E6A CC881E56 57000014 C80012CA C95F5E1F .^_èò..à...WV.¦äj.Ä.v..v..v..FÞ. 0000C0
F6468008 76FF0A76 FF00F3E9 F4468800 06E90375 00003DF4 46890000 68049A50 P..k...F¶=..u.Õ...F¶Õµ..v..v..F- 0000E0
46800876 FF0A76FF 0002E9F4 46880006 E9037500 003DF446 89000068 8A9A5016 .P..h...F¶=..u.Õ...F¶Õ●..v..v..F 000100
800876FF 0A76FF00 81E9F446 880006E9 03750000 3DF44689 000068AB 9A5016FA ª.P.¨h...F¶=..u.Õ...F¶ÕŸ..v..v.. 000120
F676FFF8 76FF0090 E9F4468B 0006E903 7500003D F4468900 0068CC9A 5016EC46 Fš.P.äh...F¶=..u.Õ...F¶Õ...v½.v- 000140
89880006 E9037500 003D0000 67919A50 5240F256 88F0468B 076AEC76 FFEE76FF .vŸ.všj..FÞ.V·@RP..g..=..u.Õ..¦¿ 000160
C7002CE9 00E8FE46 C70034E9 00ECFE46 C70021E9 9801478A 26F05EC4 0066E98E .Õf.á^Þ&.G..ÕI.úF±š.Õ4.úF±Š.Õ..ú 000180
FFD7E903 75004D3D FFD7E903 7500443D 001BE900 3DE90000 880024E9 00EAFE46 F±õ.Õ$.¦..Õ=.Õ..=D.u.Õ■.=M.u.Õ■. 0001A0
9A006A00 6A016A00 6A012568 FE76FFFA 76FFFC76 FFFFDCE9 FFD7E903 7500593D =Y.u.Õ■.ÕÉ..v=.vª.v±h%.j.j.j.j.. 0001C0
F646C7D8 8E6B9FB8 1E565700 0012C800 06CAC95F 5E1F0000 E9000088 00006903 .i..¦..Õ...^_èò..à...WV.¦.k.ÀúF- 0001E0
```

Dump of file SATURN:[PCCOMMON.DUMP.DLL]DAENTDF.TMP;1 on 18-APR-1990 10:40:49.05
File ID (561,28,0)   End of file block 116 / Allocated 116

Virtual block number 60 (0000003C), 512 (0200) bytes

```
FF0C76FF 0196682F 6A019636 FF260234 068E006A 006A0002 07C7260E 5EC40000 ..á^.&ú...j.j...4.&.6..j/h...v.. 000000
00003DF6 46890000 6BB29A50 16F2468D 1276FF14 76FF1676 FF00006A E99A0A76 v..Õj...v..v..v..F·.P.ýk...F-=.. 000020
003DF646 8900006B D39A5016 F8468014 76FF1676 FF01BBE9 F6468800 06E90375 u.Õ...F-Õ€..v..v..F½.P.Æk...F-=. 000040
3DF64689 00006BF4 9A5016FC 46801476 FF1676FF 019AE9F6 46880006 E9037500 .u.Õ...F-Õ...v..v..F=.P.¶k...F-= 000060
F6468900 006C159A 5016EE46 801476FF 1676FF01 79E9F646 880006E9 03750000 ..u.Õ...F-Õy..v..v..FŸ.P..l...F- 000080
5EC40032 E95907C6 26F25EC4 0021E912 46880158 E9F6468B 0006E903 7500003D =..u.Õ...F-ÕX..F.ÕI.á^·&ó.YÕ2.á^ 0000A0
00EB3DFF 07E90375 00EA3D00 18E9001E E94407C6 26F25EC4 0028E94D 07C626F2 ·&ó.MÕ(.á^·&ó.DÕ..Õ..=õ.u.Õ■.=Š. 0000C0
E9037501 473826F2 5EC4078A 26F25EC4 0000E9FF DBE90375 00EC3DFF D9E90375 u.Õ).=$.u.ÕU.Õ..á^·&..á^·&8G.u.Õ 0000E0
006CF39A 50526DF8 8A0000B8 01966816 6A019636 FF260234 068E006A 006A00C5 é.j.j...4.&.6..j.h..¦..¤«mRP.µl. 000100
FF0018E9 03750000 3DF64689 00006983 9A505269 6B8A0000 B8F876FF FA76FF00 ..vª.v½¦..¤kiRP..i...F-=:.u.Õ... 000120
F076FFF8 76FFFA76 FF00AFE9 F6468800 006E809A 0171681E F676FFFC 76FFFE76 v±.v=.v-.hq...n...F-Õ€..vª.v½.vÞ 000140
76FFFA76 FF0011E9 03750000 3DF64689 0000698F 9AF276FF F476FF07 6AEE76FF .vŸj..v¶.v·.«i...F-=..u.Õ...vª.v 000160
E9037500 003DF646 89000069 E69AF876 FFFA76FF 007AE9F6 46880000 69D59AF8 ½.(i...F-Õz..vª.v½.li...F-=..u.Õ 000180
078A26F2 5EC4004C E9F6468B 000069A0 9A018968 1EF676FF FC76FFFE 76FF0018 ...v±.v=.v-.h....i...F-ÕL.á^·&.. 0001A0
9A00A068 1476FF16 76FF0001 07C7260E 5EC40007 C6260A5E C4014788 26F25EC4 á^·&.G.á^.&ó..á^.&ú....v..v.h... 0001C0
0000686A 9A009F68 1476FF16 76FF0000 6ECC9A00 A1681476 FF1676FF 00006EBE ƒn...v..v.hÀ..än...v..v.h...jk.. 0001E0
```

Dump of file SATURN:[PCCOMMON.DUMP.DLL]DAENTDF.TMP;1 on 18-APR-1990 10:40:49.05
File ID (561,28,0)   End of file block 116 / Allocated 116

Virtual block number 61 (0000003D), 512 (0200) bytes

```
890C5688 0A468808 8E6CC988 1E565700 000EC800 12CAC95F 5E1F0000 E9F64688 .F-Õ...^_èò..à...WV.¡èl.Ä.F..V.. 000000
0E76FF10 76FF0066 E9078826 F85EC4F6 5689F446 89085688 06468BFA 5689F846 F½.Vª.F.¯V..F¶.V-ó^½&..Õf..v..v. 000020
8826FC5E C40056E9 F2468800 06E90375 00003DF2 46890000 60639A50 16FC4680 .F=.P.c'...F·=..u.Õ...F·ÕV.ó^=&. 000040
002BE907 89260247 89260000 B8F45EC4 02578926 078926F8 5EC45A57 88265847 GX&.WZó^½&..&.W.ó^¶¡..&.G.&..Õ+. 000060
0008E900 0EE90789 26024789 26000088 F45EC407 89260247 89260000 B8F85EC4 ó^½¡..&.G.&..ó^¶¡..&.G.&..Õ..Õ.. 000080
B81E5657 00000AC8 000CCAC9 5F5E1F00 00E90000 B8FFD5E9 FF92E903 7500683D =h.u.Õ..Õí.¡..Õ...^_èò..à...WV.¡ 0000A0
F6468900 006D699A 5016FC46 800E76FF 1076FF00 4AE90374 0C087E83 D88E6EE5 ln.Ä.-..t.ÕJ..v..v.¯F=.P.im...F- 0000C0
740C5639 0015E903 740A4639 FE568BFC 46880089 E9F64688 0006E903 7500003D =..u.Õ...F-Õ¿..F=.V±9F.t.Õ..9V.t 0000E0
F8468D0E 76FF1076 FF0090E9 00008800 00FFFF9A 656A0E76 FF1076FF 000DE903 .Õ...v..v.je.....¡..Õ...v..v..F½ 000100
015C47C7 26F85EC4 006FE9F6 46880006 E9037500 0030F646 8900006F 169A5016 .P..o...F-=..u.Õ...F-Õo.ó^½&úG\. 000120
F6468900 00FFFF9A 0676FF08 76FF0A76 FF0C76FF 5E77FF26 6077FF26 F85EC400 .ó^½&.w'&.w^.v..v..v..v.......F- 000140
00A0680E 76FF1076 FF00005C 47C726F8 5EC40039 E9F64688 0006E903 75000030 =..u.Õ...F-Õ9.ó^½&úG\...v..v.h.. 000160
006EB09A 009F680E 76FF1076 FF000070 609A00A1 680E76FF 1076FF00 00705F9A ._p...v..v.hÀ..mp...v..v.h...¯n. 000180
0676FF08 76FFD88E 6F90B81E 56570000 18C8000C CAC95F5E 1F0000E9 00008800 .¡..Õ...^_èò..à...WV.¡.o.Ä.v..v. 0001A0
0676FF08 76FF0000 5FCE9A50 16FA4680 0676FF08 76FF0000 60489A50 16F64680 .F-.P.Hm.¯.v..v..Fª.P.ö_...v..v. 0001C0
0030EC46 890000FF FF9A5016 EE46806C 6A1E6AFA 76FF0000 60279A50 16F24680 .F·.P.'m...vªj.jl.FŸ.P......Fš=. 0001E0
```

Dump of file SATURN:[PCCOMMON.DUMP.DLL]DAENTDF.TMP;1 on 18-APR-1990 10:40:49.05
File ID (561,28,0)   End of file block 116 / Allocated 116

Virtual block number 62 (0000003E), 512 (0200) bytes

```
46880125 E9000088 00000FB0 9A01A168 1EEC76FF F676FFF8 76FF0018 E9037500 .u.Õ...v½.v~.vš.hÀ..¯...¡..ÕX..F 000000
468DF276 FFF476FF 58478926 5A478926 000088FC 5EC4FE56 89FC4689 F0568BEE Ÿ.Vÿ.F=.V±ó^=¡..&.GZ&.GX.v¶.v·.F 000020
6E1D9A01 AE681EEC 76FFF676 FFF876FF 0018E903 7500003D 000014C4 9A5016E8 Ò.P.ó...=..u.Õ...v½.v~.vš.hÛ...n 000040
89260000 88EE5EC4 02578926 078926EA 5688E846 88EE5EC4 00DBE900 00880000 ..¡..ÕÜ.ó^Ÿ.FÒ.Võ&..&.W.ó^Ÿ¡..&. 000060
FF08C483 FFFF2046 9A0676FF 0876FF50 52005C05 FE568BFC 46880447 89260647 G.&.G..F=.V±.\.RP.v..v..F ...ó.. 000080
00FFFF9A EE76FFF0 76FF0676 FF0876FF 7198721A 9AFC76FF FE76FF06 76FF0876 v..v..v±.v=..r.q.v..v..vÞ.vŸ.... 0000A0
FF9AFFFF 6871BA68 0676FF08 76FF0000 FFFF9AFF FF6871A9 680676FF 0876FF00 ..v..v.h`qh........v..v.hoqh.... 0000C0
FFFF6871 DC680676 FF0876FF 0000FFFF 9AFFFF68 71CB6806 76FF0876 FF0000FF ....v..v.hùqh........v..v.hÊqh.. 0000E0
68624468 0676FF08 76FF0000 FFFF9AFF FF6871ED 680676FF 0876FF00 00FFFF9A ......v..v.hÚqh........v..v.hDbh 000100
00008800 00FFFF9A 019636FF 26023406 8E646A06 76FF0876 FF0000FF FF9AFFFF ........v..v.jd..4.&.6.......¡.. 000120
89FA4689 08568806 46880888E 7086881E 56570000 0CC80004 CAC95F5E 1F0000E9 Õ...^_èò..à...WV.¡.p.Ä.F..V..Fª. 000140
47C62606 5EC40A56 47C62606 5EC40A53 47C62606 5EC40A52 47C62606 5EC4FC56 V=ó^.&óGR.ó^.&óGS.ó^.&óGV.ó^.&óG 000160
FFFF68FF FF68656A 0A76FF0C 76FF0A55 47C62606 5EC40A54 47C62606 5EC40A57 W.ó^.&óGT.ó^.&óGU..v..v.jeh..h.. 000180
68FFFF68 FFFF6867 6A0A76FF 0C76FF00 00729C9A 006A006A 006AFFFF 68FFFF68 h..h..j.j.j...r...v..v.jgh..h..h 0001A0
7E68FFFF 6872AF68 696A0A76 FF0C76FF 000072BB 9A006A00 6A016AFF FF6872A9 `rh..j.j.j..£r...v..v.jih£rh..h- 0001C0
FFFF68FF FF68FFFF 68686A0A 76FF0C76 FF000072 DA9A0004 681E016A FFFF6871 qh..j..h...Õr...v..v.jkh..h..h.. 0001E0
```

Dump of file SATURN:[PCCOMMON.DUMP.DLL]DAENTDF.TMP;1 on 18-APR-1990 10:40:49.05
File ID (561,28,0)   End of file block 116 / Allocated 116

Virtual block number 63 (0000003F), 512 (0200) bytes

```
016A006A 006A006A 006A706A 0A76FF0C 76FF0000 72F59A00 6A006A00 6AFFFF68 h..j.j.j..%r...v..v.jpj.j.j.j.j. 000000
1A681E01 6A006A00 6AFFFF68 FFFF6872 6A0A76FF 0C76FF00 0073129A 001A681E .h....s...v..v.jrh..h..j.j.j..h. 000020
4C9A001A 681E006A FFFF68FF FF68006A 006A736A 0A76FF0C 76FF0000 FFFF9A00 .......v..v.jsj.j.h..h..j..h...L 000040
00007369 9A001A68 1E006AFF FF68FFFF 68006A00 6A746A0A 76FF0C76 FF000073 s...v..v.jtj.j.h..h..j..h...is.. 000060
0C76FF00 0073899A 001A681E 006AFFFF 68FFFF68 006A006A 766A0A76 FF0C76FF .v..v.jvj.j.h..h..j..h....s...v. 000080
065EC400 00730D9A 0030681E 016AFFFF 68FFFF68 FFFF68FF FF6800A3 680A76FF .v.hÊ.h..h..h..h..j..h0..Ïs..ó^. 0000A0
26078B26 FA5EC40E 5F8C260C 47892600 52B8065E C40A5F8C 26084789 26003CB8 ¡<.&.G.&._.ó^.¡R.&.G.&._.ó^ª&..& 0000C0
6A006A00 6A006A00 6A00A568 0A76FF0C 76FF1257 89261047 8926065E C402578B .W.ó^.&.G.¯&.W..v..v.hE.J.j.j.j.j 0000E0
FFFF68FF FF6800A7 680A76FF 0C76FF00 0074029A 50520008 05085688 06468B01 ..F..V....RP..t...v..v.hÏ.h..h.. 000100
6A00A868 0A76FF0C 76FF0000 74279A50 52000805 08568806 4688016A 006A006A j.j.j..F..V....RP.'t...v..v.h´.j 000120
76FF0C76 FF000074 4C9A5052 00080508 56880646 88006A76 2E68762B 68006A00 .j.h+vh.vj..F..V....RP.Lt...v..v 000140
00007471 9A505200 08050856 88064688 006AFFFF 68FFFF68 006A006A 00A9680A .h`.j.j.h..h..j..F..V....RP.qt.. 000160
50520008 0508568B 06468800 6A767868 76756800 6A006A00 AA680A76 FF0C76FF .v..v.h`.j.j.huvhxvj..F..V....RP 000180
0006E903 7500003D F4468900 0070A69A 5016FE46 800A76FF 0C76FF00 0074E29A .ãt...v..v..F±.P.Ïp...F¶=..u.Õ.. 0001A0
F6468000 B3680082 6800B168 00806800 AE6800AD 6848B6AFE 76FF080B E9F44688 .F¶Õ...v±jKhÜ.hÛ.h¯.hŸ.hý.h°..F- 0001C0
AE680A76 FF0C76FF 07D9E9F4 46880006 E9037500 0030F446 890000FF FF9A5016 .P......F¶=..u.Õ...F¶Õ)..v..v.hÛ 0001E0
```

Dump of file SATURN:[PCCOMMON.DUMP.DLL]DAENTDF.TMP;1 on 18-APR-1990 10:40:49.05
File ID (561,28,0)   End of file block 116 / Allocated 116

Virtual block number 64 (00000040), 512 (0200) bytes

```
6A00AD68 0A76FF0C 76FF0000 75009AF6 76FFF876 FF016A00 6A006A00 6A006A00 .j.j.j.j.j..v½.v-..u...v..v.hÙ.j 000000
75326800 B0680A76 FF0C76FF 00007520 9AF676FF F876FF01 6A006A00 6A006A00 .j.j.j.j..v½.v-. u...v..v.h¯.h2u 000020
6A006A00 B1680A76 FF0C76FF 00007540 9AF676FF F876FF01 6A006A00 6AFFFF68 h..j.j.j..v½.v-.@u...v..v.hÝ.j.j 000040
6A006A00 B2680A76 FF0C76FF 00007560 9AF676FF F876FF00 6AFFFF68 75526800 .hRuh..j..v½.v-.'u...v..v.hý.j.j 000060
6A006A00 B3680A76 FF0C76FF 00007580 9AF676FF F876FF00 6AFFFF68 75726800 .hruh..j..v½.v-..u...v..v.h°.j.j 000080
6A006A00 DA680A76 FF0C76FF 000075A0 9AF676FF F876FF00 6AFFFF68 75926800 .h.uh..j..v½.v-..u...v..v.hÖ.j.j 0000A0
8C262047 8926007C B8065EC4 000075F4 9AF676FF F876FF00 6AFFFF68 76026800 .h.vh..j..v½.v-.¶u..á^.¡|.&.G &. 0000C0
47892606 5EC40257 8B260788 26FA5EC4 265F8C26 24478926 00928806 5EC4225F _"á^.¡..&.G$&._&á^"&..&.W.á^.&.G 0000E0
20050856 8B064688 016A006A 006A006A 006A0086 680A76FF 0C76FF2A 57892628 (&.W*.v..v.hÑ.j.j.j.j.j..F..V..  000100
06468B01 6A006A00 6AFFFF68 76506800 B8680A76 FF0C76FF 00007619 9A505200 .RP..v...v..v.h¡.hPvh..j.j.j..F. 000120
FFFF68FF FF68006A 006A00B9 680A76FF 0C76FF00 00763E9A 50520020 0508568B .V.. .RP.>v...v..v.h¿.j.j.h..h.. 000140
68006A00 6A00BA68 0A76FF0C 76FF0000 76639A50 52002005 08568B06 468B006A j..F..V.. .RP.cv...v..v.hº.j.j.h 000160
00BB680A 76FF0C76 FF000076 889A5052 00200508 568B0646 8B006AFF FF687290 .rh..j..F..V.. .RP..v...v..v.h£. 000180
B8065EC4 0000727D 9A505200 20050856 8B06468B 006AFFFF 68FFFF68 006A006A j.j.h..h..j..F..V.. .RP.}r..á^.¡ 0001A0
8B260788 26FA5EC4 325F8C26 30478926 00B48806 5EC42E5F 8C262C47 8926009E ..&.G,&._.á^.¡Ç.&.G0&._2á^"&..&. 0001C0
016A006A 006A006A 006A00C0 680A76FF 0C76FF36 57892634 47892606 5EC40257 W.á^.&.G4&.W6.v..v.hÀ.j.j.j.j.j. 0001E0
```

Dump of file SATURN:[PCCOMMON.DUMP.DLL]DAENTDF.TMP;1 on 18-APR-1990 10:40:49.05
File ID (561,28,0)   End of file block 116 / Allocated 116

Virtual block number 65 (00000041), 512 (0200) bytes

```
6AFFFF68 77136800 C3680A76 FF0C76FF 00007701 9A505200 2C050856 8B06468B .F..V..,.RP..w...v..v.hÃ.h.wh..j 000000
006A00C4 680A76FF 0C76FF00 0077269A 5052002C 0508568B 06468B01 6A006A00 .j.j..F..V..,.RP.&w...v..v.hÄ.j. 000020
0A76FF0C 76FF0000 774B9A50 52002C05 08568B06 468B006A FFFF6877 3868006A j.h8wh..j..F..V..,.RP.Kw...v..v. 000040
FF000077 709A5052 002C0508 568B0646 8B006AFF FF68775D 68006A00 6A00C568 hÅ.j.j.h]wh..j..F..V..,.RP.pw... 000060
9A505200 2C050856 8B06468B 006AFFFF 68777E68 006A006A 00C6680A 76FF0C76 v..v.hÆ.j.j.h~wh..j..F..V..,.RP. 000080
77E29A00 6A006A01 6A006A00 6AFFFF68 78886800 CD680A76 FF0C76FF 0000778E .w...v..v.hÍ.h.xh..j.j.j.j..âw 0000A0
5EC43E5F 8C263C47 89260006 B8065EC4 3A5F8C26 38478926 00C08806 5EC40000 ..á^.¡À.&.G8&._:á^.¡ø.&.G<&._>á^ 0000C0
006A006A 0004680A 76FF0C76 FF425789 26404789 26065EC4 02578826 078B26FA ú&..&.W.á^.&.G@&.WB.v..v.hÐ.j.j. 0000E0
68000668 0A76FF0C 76FF0000 78079A50 52003805 08568B06 468B016A 006A006A j.j.j..F..V..8.RP..x...v..v.hø.h 000100
76FF0C76 FF000078 2C9A5052 00380508 568B0646 8B016A00 6A006A73 EE6873EB ÷shîsj.j.j..F..V..8.RP.,x...v..v 000120
00007851 9A505200 38050856 8B06468B 006A7417 68741468 006A006A 0007680A .hø.j.j.h.th.tj..F..V..8.RP.Qx.. 000140
50520038 0508568B 06468B00 6A743C68 74396800 6A006A00 D8680A76 FF0C76FF .v..v.hØ.j.j.h9th<tj..F..V..8.RP 000160
8B006AFF FF6878A9 68006A00 6A00DB68 0A76FF0C 76FF0000 78B9A50 52003805 .8.RP..x...v..v.hÛ.j.j.h©xh..j.. 000180
D06878D3 6878AF68 00DE680A 76FF0C76 FF000078 C29A5052 00380508 568B0646 F..V..8.RP.Âx...v..v.hÞ.h¯xhÓxhÐ 0001C0
6800E068 0A76FF0C 76FF0000 78E99A50 52004405 08568B06 468B006A 78D96878 xh¦xj..F..V..D.RP.éx...v..v.hà.h 0001E0
```

Dump of file SATURN:[PCCOMMON.DUMP.DLL]DAENTDF.TMP;1 on 18-APR-1990 10:40:49.05
File ID (561,28,0)   End of file block 116 / Allocated 116

Virtual block number 66 (00000042), 512 (0200) bytes

```
0C76FF00 00732F9A 50520044 0508568B 06468B00 6AFFFF68 750E68FF FF6878D6 Öxh..h.uh..j..F..V..D.RP./s...v. 000000
9A505200 44050856 8B06468B 006A78B2 68791E68 78AC6878 FD6800E2 680A76FF .v.hâ.hýxh¬xh.yh²xj..F..V..D.RP. 000020
56880646 8B006A79 4E687945 68794868 79246800 F3680A76 FF0C76FF 00007937 7y...v..v.hó.h$yhHyhEyhNyj .F..V 000040
79756879 6C68796F 68794868 00F4680A 76FF0C76 FF000079 5E9A5052 00520508 ..R.RP.^y...v..v.hô.hKyhoylh yhuy 000060
96687972 6800F568 0A76FF0C 76FF0000 79859A50 52005205 08568B06 468B006A j..F..V..R.RP..y...v..v.hõ.h ryh. 000080
680A76FF 0C76FF00 0079AC9A 50520052 0508568B 06468B00 6A799C68 79936879 yh.yh.yj..F..V..R.RP.¬y...v..v.h 0000A0
00007903 9A505200 52050856 8B06468B 006A79C3 68798A68 79B06879 996800F6 ÷.h.yh°yh.yhÃyj..F..V..R.RP.Æy.. 0000C0
00520508 568B0646 8B006AFF FF6879E1 68FFFF68 79C06800 F7680A76 FF0C76FF .v..v.h÷.hÀyh..háyh..j..F..V..R. 0000E0
4688006A 7A0F687A 0C68FFFF 6879E768 00F8680A 76FF0C76 FF000079 FA9A5052 RP.úy...v..v.hø.hçyh..h.zh.zj..F 000100
FF687A20 68006A00 6A010068 0A76FF0C 76FF0000 7A1F9A50 52005405 08568B06 ..V..T.RP..z...v..v.h..j.j.h z. 000120
687A3368 00E9680A 76FF0C76 FF00007A 469A5052 00540508 568B0646 8B006AFF .j..F..V..T.RP.Fz...v..v.hé.h3zh 000140
0A76FF0C 76FF0000 7A609A50 52005005 08568B06 468B006A FFFF687A 5468FFFF ..hTzh..j..F..V..P.RP.`z...v..v. 000160
007A949A 50520056 0508568B 06468B00 6A7A8468 7A7B687A 7E687A5A 6800EA68 hê.hZzh~zh{zh.zj..F..V..V.RP..z. 000180
56050856 8B06468B 006A7AAB 687AA268 7AA5687A 816800EB 680A76FF 0C76FF00 ..v..v.hë.h.zh¥zh¢zh«zj..F..V..V 0001A0
8B006AFF FF6876EA 68FFFF68 7AA86800 EC680A76 FF0C76FF 00007ABB 9A505200 .RP.»z...v..v.hì.h¨zh..hêvh..j.. 0001C0
006A006A 006A006A 0084680A 76FF0C76 FF00007A D79A5052 00560508 568B0646 F..V..V.RP.×z...v..v.h..j.j.j.j. 0001E0
```

```
Dump of file SATURN:[PCCOMMON.DUMP.DLL]DAENTDF.TMP;1 on 18-APR-1990 10:40:49.05
File ID (561,28,0)   End of file block 116 / Allocated 116

Virtual block number 67 (00000043), 512 (0200) bytes

 006A006A 006AFFFF 68FFFF68 0086680A 76FF0C76 FF00007A F59A00E2 681E006A j..hã..%z...v..v.h..h..h..j.j.j. 000000
 681E006A FFFF68FF FF68006A 006A0087 680A76FF 0C76FF00 007B139A 00E2681E .hã...(...v..v.h..j.j.h..h..j..h 000020
 00E2681E 006AFFFF 68FFFF68 006A006A 0088680A 76FF0C76 FF00007B 319A00E2 ã..1(...v..v.h..j.j.h..h..j..hã. 000040
 6B9A00E2 681E006A FFFF68FF FF68006A 006A0089 680A76FF 0C76FF00 007B4F9A .O(...v..v.h..j.j.h..h..j..hã..k 000060
 FF00007B 899A00FB 681E016A 006A006A 006A006A 008E680A 76FF0C76 FF00007B (...v..v.h..j.j.j.j.j..h%...(... 000080
 0C76FF00 007BA79A 00F8681E 016A006A 006AFFFF 68FFFF68 0090680A 76FF0C76 v..v.h..h..h..j.j.j..h%..I(...v. 0000A0
 76FF0C76 FF00007B C59A00F8 681E006A FFFF68FF FF68006A 006A0091 680A76FF .v.h..j.j.h..h..j..h%..é(...v..v 0000C0
 680A76FF 0C76FF00 007BE39A 00F8681E 006AFFFF 68FFFF68 006A006A 0092680A .h..j.j.h..h..j..h%..D(...v..v.h 0000E0
 009D680A 76FF0C76 FF00007C 019A00FB 681E006A FFFF68FF FF68006A 006A0093 ..j.j.h..h..j..h%...|...v..v.h.. 000100
 FF68009E 680A76FF 0C76FF00 0076DC9A 006A006A 006A006A 006A7C12 687C0F68 h.|h.|j.j.j.j.j..Év...v..v.h..h. 000120
 687C4B68 009C680A 76FF0C76 FF00007C 309A006A 006A006A 006A006A FFFF68FF .h..j.j.j.j.j..=|...v..v.h..hK|h 000140
 7C6C687C 696800A0 680A76FF 0C76FF00 007C5B9A 006A006A 006A006A 006A7C4E N|j.j.j.j.j..[|...v..v.h..hi|h(| 000160
 006A7C8A 687C8768 00A1680A 76FF0C76 FF00007C 799A006A 006A006A 006A006A j.j.j.j.j..y|...v..v.hÀ.h.|h.|j. 000180
 006A006A 7BF4687B F168009F 680A76FF 0C76FF00 007C979A 006A006A 006A006A j.j.j.j...|...v..v.h..hþ(h¶(j.j. 0001A0
 80000872 D1020500 B108CAC9 5F5E1F00 00E9F446 8B000079 109A006A 006A006A j.j.j...y...F¶Õ...^_èò.Ÿ...ír... 0001C0
 62000172 B2000550 61000177 38000504 5100065C 6502036A 6000017A 30000505 ...0z..'j..e\..Q...;w..aP..ýr..b 0001E0

Dump of file SATURN:[PCCOMMON.DUMP.DLL]DAENTDF.TMP;1 on 18-APR-1990 10:40:49.05
File ID (561,28,0)   End of file block 116 / Allocated 116

Virtual block number 68 (00000044), 512 (0200) bytes

 B4000A3D E4020300 0000017B F7000206 0300087B DA020505 E200087B 25020214 ...%(..ã...Ö(......%x......ô=..Ç 000000
 7F00016C B0010366 E6000179 E4000539 E6000175 95000501 EE000304 C7020306 ...ú...Ÿ....u..ì9..ðy..îf..¯l... 000020
 0000024C 11000206 67000878 3E020248 67000176 05000500 6F000352 9D020300 ....R..o....v..gH..>x..g....L... 000040
 73000371 F3020305 0A00087C 30020515 6A000175 11000503 D9000671 14020300 ....q..l....u..j...0|......µq..s 000060
 CC00086A A2020300 00000356 E0000200 04000100 6E01030B 6B000171 DF000501 ...Ôq..k...n.......ÁV......Åj..ë 000080
 86000157 4A010302 ED000445 F1020304 5D000644 4A020305 EC00087B 79020204 ...y(..š...JD..]...þE..Ú...JW... 0000A0
 87000151 74010306 0E00087B BC020505 8E000872 CB020500 F6000360 42020300 ...B'..-...ùr......¥(......tQ... 0000C0
 0B000151 22010306 5200084F CD020302 72000447 79020300 00000471 6A000200 ...jq......yG..r...ëO..R..."Q... 0000E0
 C8000A3C FD020300 0000065C F6000263 76000179 21000505 56000813 3F020300 ...?...V...ly..vc..-\......»<..à 000100
 9A000873 05020500 82000372 09020307 420008 70 29020305 F800087B 9B020206 ....(..%...)p..B....r.......s... 000120
 6B00066E 52020301 0300036F F3020300 13000151 1901031A FA000175 35000505 ...5u..ª....Q......µo......Rn..k 000140
 84000371 8D020306 5C000854 A4020300 00000772 22000204 DB000868 2B020304 ...+k..Ü..."r......ÊT..\....q... 000160
 0000086D E8000202 0800030B 5D020313 7D000113 3C000554 7C000177 60000501 ...'w..|T..<...}...]......Òm... 000180
 81000471 2E020303 01000445 BB020305 80000872 CE020200 00000171 BD000500 ...§q......ör......£E.......q... 0001A0
 0300087B D7020206 D3000A3E 38020302 83000413 AE020357 81000177 81000503 ....w...W..Û.......;>..Æ.. «(... 0001C0
 88000171 9B000506 67000840 95020305 A5000873 26020500 9D000160 ED010306 ...Úm......&s..E....M..g........ 0001E0

Dump of file SATURN:[PCCOMMON.DUMP.DLL]DAENTDF.TMP;1 on 18-APR-1990 10:40:49.05
File ID (561,28,0)   End of file block 116 / Allocated 116

Virtual block number 69 (00000045), 512 (0200) bytes

 0A00087C 2D020203 F9000659 BF020305 69000814 11020300 91000360 0602036F o...m..........i...eY..ª...-|... 000000
 EC000860 FC020306 2B000873 7A020509 8B000171 CE000501 9300030F 27020305 ...'.......öq......zs..+...■'..š 000020
 8E000872 C8020204 7E000600 B1020305 2C000872 6E020501 1400037C 1F020304 ....|.......nr..,...Ÿ...~...àr... 000040
 11000172 93000506 E0000A40 C5020305 AF000873 60020506 0E00087B B9020205 ...¿(......'s..£...éà..Å....r... 000060
 28000270 C702036B 9700017A 57000504 0700066C 42020303 95000468 47020313 ...Gk......Bl......Wz...k..úp..( 000080
 22000305 30020305 B9000873 4302054C 99000176 53000506 38000873 80020500 ....s..8...Sv...L..Cs..¿...0..." 0000A0
 1C000436 07020305 3A000872 74020505 9A000873 02020204 FA000862 6E020302 ...nb..ª....s......tr..:....6... 0000C0
 1F000175 55000501 A7000347 F9020300 A7000374 81020301 25000371 AF020303 ...£q..X....t..Ï...ªG..Ï...Uu... 0000E0
 24000179 EA000505 C300087A E8020540 A3000176 ED000561 A0000179 00000528 (...y...■..Úv..ÈM..Òz..û...õy..$ 000100
 3600021A 6302034F A5000177 16000505 A5000873 23020204 1500066E 3C020368 h..<n......#s..E....w..EO..c...6 000120
 81000960 9B020343 28000175 75000506 47000877 F3020502 A6000424 6D020300 ...m$..Ï...µw..G...uu..(C...'... 000140
 2B000873 77020201 33000371 D1020305 4A000872 8D020505 0A000870 51020306 ...0p.......r..J...îq..3...ws..+ 000160
 B6000338 C2020300 B600036F A9020303 2D00045F 21020305 2C000872 6B020206 ...kr..,...!_..-...`o..Ñ...õ8..Ñ 000180
 5200087B 1C020504 21000635 7E020305 AF000873 5D020205 CE00087B 0A020501 ....(..ö...]s̄..£...~5..!....x..R 0001A0
 B4000178 FA000502 B400043E D1020303 AC00050C A1020302 3C00030A 88020306 .......<...À...¯...Ì>..Ç...ªx..Ç 0001C0
 79000C58 61020305 D800087B 46020506 38000873 7D02020F 35000171 AC000560 '..¯q..5...)s..8...F(..Å...aX..y 0001E0
```

```
Dump of file SATURN:[PCCOMMON.DUMP.DLL]DAENTDF.TMP;1 on 18-APR-1990 10:40:49.05
File ID (561,28,0)   End of file block 116 / Allocated 116

Virtual block number 70 (00000046), 512 (0200) bytes

 43000371 C0020303 38000447 0E020305 3A000872 71020205 B9000873 40020207 ...@s..¿...qr..:....G..;...âq..C 000000
 C6000370 86020305 10000813 CF020306 5C000878 66020513 BC000172 AC000501 ...¯r..¥...fx..\...ü.......Ñp..6 000020
 C100017A 5D000501 C8000374 B3020300 4700035D 28020304 2E000658 E0020300 ...ÀX......+]..G...*t..à...]z..è 000040
 C400017A 36000505 C300087A E502025F 43000178 88000505 E200087B 2802056C l..((..ã....x..C_..{z..û...6z..á 000060
 3A00065E 5F020300 D2000370 96020306 47000877 F0020206 67000878 4102056A j..Ax..g...þw..G....p..@....^..: 000080
 2C00086F D0020301 53000371 E2020364 CA000179 27000505 4A000872 8A020204 ....r..J...'y..òd..âq..S.. To.., 0000A0
 CE00087B 07020200 56000351 86020302 56000310 65020305 EC00087B 7C029505 ...|(..š...e...V...ÑQ..V... (..ö 0000C0
 5200087B 19020203 C200066E 00020304 B100083B 67020303 4F000419 CE020305 ...ô...O...g;..Ý....n..ô...... .R 0000E0
 F800087B 9E020504 47000637 18020301 DD00033B DE020306 A3000A3D D4020306 ...å=..Ê...Ř;..Ï....7..G....(..½ 000100
 64000371 9E020304 B8000870 E4020300 E2000300 4F020305 D800087B 43020205 ...C(..Ä...O...ã...ðp..Ê....q..d 000120
 CE00066E 6302036E D0000171 F0000502 DD000412 4B020306 5C000878 63020201 ...cx..\...K...Ï...þq..În..cn..ö 000140
 00E646C7 D88EFFFF B81E5657 00001EC8 00000000 00000000 00000000 00000003 ................à...WV.¡...ÄÚFÌ. 000160
 00FFFF9A 5016EC46 8D0E76FF 1076FF00 00FFFF9A 5016F046 8D0E76FF 1076FF00 ..v..v..Fþ.P......v..v..Fš.P.... 000180
 00FFFF9A 5016FE46 8D0E76FF 1076FF00 00FFFF9A 5016F446 8D0E76FF 1076FF00 ..v..v..F¶.P......v..v..F±.P.... 0001A0
 E9E6468B 0006E903 7500003D E6468900 00FFFF9A 5016E246 8DEC76FF EE76FF00 ..vŸ.vš.Fã.P......FÌ=..u.Õ...FÌÕ 0001C0
 468B0006 E9037500 003DE646 890000FF FF9A5016 E8468D28 6A1E6AF4 76FF015B [..v¶j.j(.FÒ.P......FÌ=..u.Õ...F 0001E0

Dump of file SATURN:[PCCOMMON.DUMP.DLL]DAENTDF.TMP;1 on 18-APR-1990 10:40:49.05
File ID (561,28,0)   End of file block 116 / Allocated 116

Virtual block number 71 (00000047), 512 (0200) bytes

 478926EE 568BEC46 8BE85EC4 02578926 07892610 568B0E46 8BE85EC4 0139E9E6 Ìõ9.6^Ò.F..V.&..&.W.6^Ò.Fš.VŸ&.G 000000
 8BE8468B 0E76FF10 76FF0A57 89260847 8926E456 8BE2468B E85EC406 57892604 .&.W.6^Ò.Fã.Võ&.G.&.W..v..v..FÒ. 000020
 00008BE8 5EC41047 89261247 89260000 B8E85EC4 0000FFFF 9A505200 0C05EA56 Võ...RP.....6^Ò¡..&.G.&.G.6^Ò¡.. 000040
 8B0A468B E85EC41A 57892618 47892608 568B0646 8BE85EC4 14478926 16478926 &.G.&.G.6^Ò.F..V.&.G.&.W.6^Ò.F.. 000060
 008BE85E C4078926 02478926 0000881C 5FC426E8 5EC41E57 89261C47 89260C56 V.&.G.&.W.6^Ò&6_.¡..&.G.&..6^Ò¡. 000080
 68016A00 6A016A00 6A244789 26264789 260000B8 E85EC420 47892622 47892600 .&.G"&.G 6^Ò¡..Ē.G&&.G$j.j.j.j.h 0000A0
 89F64689 0000FFFF 9AE876FF EA76FF03 81680196 36FF2602 36068EFF FF68FFFF ..h....6.&.6..h...võ.vÒ......F-. 0000C0
 FFF476FF FC5689FA 46890000 FFFF9A00 6A006A00 23E90374 F84608F6 468BF856 V½.F-.F½t.Õ#.j.j.......F*.V•.v¶. 0000E0
 76FFE646 890000FF FF9AF676 FFF876FF 0020E9FA 468B0000 01C39AE8 76FFEA76 võ.vÒ.Û....F*Õ-..v½.v-......FÌ.v 000100
 5F5E1F00 00E9E646 8B0000FF FF9AE876 FFEA76FF F476FF00 00FFFF9A F676FFF8 ½.v-.......v¶.võ.vÒ......FÌÕ...^ 000120
 FC468900 00FFFF9A 006A0876 FF0A76FF D88E0008 B81E5657 0000A2C8 000CCAC9 èò..àÀ..WV.¡...Ä.v..v.j.......F= 000140
 00000221 9A5016B0 46804C6A 686A0876 FF0A76FF 0136E903 7400067E 83FE5689 .V±.~..t.Õ6..v..v.jhjL.F¯.P.¡... 000160
 0477FF26 0677FF26 FC5EC400 00FFFF9A 5016FF5E 86804C6A 6E6A0876 FF0A76FF .v..v.jnjL..^..P.....6^=&.w.&.w. 000180
 77FF261E 77FF26FC 5EC41077 FF261277 FF26FC5E C40C77FF 260E77FF 26FC5EC4 6^=&.w.&.w.6^=&.w.&.w.6^=&.w.&.w 0001A0
 FF9A006A 5016AC46 805016FF 5E868D50 16804680 50520020 05FE568B FC46881C ..F=.V±. .RP.F¯.P..^..P.F¯.Pj... 0001C0
 260277FF 261C5FC4 26FC5EC4 00EAE9AA 468B0006 E9037500 003DAA46 890000FF ....F¯=..u.Õ...F¯Õõ.6^=&6_.&.w.& 0001E0

Dump of file SATURN:[PCCOMMON.DUMP.DLL]DAENTDF.TMP;1 on 18-APR-1990 10:40:49.05
File ID (561,28,0)   End of file block 116 / Allocated 116

Virtual block number 72 (00000048), 512 (0200) bytes

 AA46890E C48302E2 03759A04 77FF2606 77FF26FC 5EC40876 FF0A76FF 7A6A37FF .7jz.v..v.6^=&.w.&.w..u.ã..6..F¯ 000000
 76FF7C6A 37FF2602 77FF261C 5FC426FC 5EC400B0 E9AA468B 0006E903 7500003D =..u.Õ...F¯Õ¯.6^=&6_.&.w.&.7j|.v 000020
 E9037500 003DAA46 890EC483 031C0375 9A0477FF 260677FF 26FC5EC4 0876FF0A ..v.6^=&.w.&.w..u....6..F¯=..u.Õ 000040
 5EC40876 FF0A76FF 7E6A37FF 260277FF 261C5FC4 26FC5EC4 0076E9AA 468B0006 ...F¯Õv.6^=&6_.&.w.&.7j~.v..v.6^ 000060
 E9AA468B 0006E903 7500003D AA46890E C4830150 03759A04 77FF2606 77FF26FC =&.w.&.w..u.P¯..6..F¯=..u.Õ...F¯Õ 000080
 FC5EC400 0003649A 1477FF26 1677FF26 FC5EC404 77FF2606 77FF26FC 5EC4003C <.6^=&.w.&.w.6^=&.w.&.w..d...6^= 0000A0
 5E1F0000 E9AA468B 0000FFFF 9A2477FF 262677FF 26FC5EC4 0477FF26 0677FF26 &.w.&.w.6^=&.w&&.w$......F¯Õ...^ 0000C0
 16EA468D 116A0E76 FF0A76FF 0C76FFD8 8E010C88 1E565700 001AC800 06CAC95F _èò..à...WV.¡É..Ä.v..v..v.j..Fõ. 0000E0
 8FE90000 B80006E9 03740000 3D04C483 FFFF00A6 9A5016EA 46800000 020C9A50 P̄......Fõ.P.Ì....6.=..t.Õ..¡..Õ. 000100
 46880072 E90001B8 0006E903 7400003D 0000FFFF 9A5016E6 46805016 EA468000 ..Fõ.P.FÌ.P.....=..t.Õ..¡..Õr..F 000120
 E9000088 0024E900 04FE46C7 002CE900 05FE46C7 0034E900 03FE46C7 0021E90E .ÕÌ.úF±..Õ4.úF±..Õ,.úF±..Õ$.¡..Õ 000140
 FFDCE9FF D7E90375 007E30FF D7E90375 007C30FF D7E90375 007A3000 18E9004E N.Õ..=z.u.Õ•.=|.u.Õ•.=~.u.Õ•.ÕÉ. 000160
 7500003D FC468900 00FFFF9A 5016E646 8DFE76FF 1076FF12 76FF0676 FF0876FF .v..v..v..v..v±.FÌ.P......F==..u 000180
 8E037D88 1E565700 0054C8C8 C95F5E1F 0000E9FC 468B0006 E9FC468B 0006E903 .Õ...F•Õ...F•Õ...^_èùàT..WV.¡}.. 0001A0
 76FFFC76 FF006A10 76FF1276 FFFC5689 FA468908 568B0646 8B042FE9 0E468BD8 Ä.F.Õ/..F..V..F*.V=.v..v.j..v•.v 0001C0
 16AC468D 0C77FF26 0E77FF26 FA5EC404 77FF2606 77FF26FA 5EC40000 FFFF9AFA *.....6^*&.w.&.w.6^*&.w.&.w..F¯. 0001E0
```

Dump of file SATURN:[PCCOMMON.DUMP.DLL]DAENTDF.TMP;1 on 18-APR-1990 10:40:49.05
File ID (561,28,0)   End of file block 116 / Allocated 116

Virtual block number 73 (00000049), 512 (0200) bytes

```
666A1076 FF1276FF 040AE999 F8468800 07E90375 00003DF8 46890000 FFFF9A50 P......F½=..u.Õ...F½.Õ...v..v.jf 000000
04FE9A00 6A006A4B 6A006A01 4368686A 1076FF12 76FF0000 04E69A50 16AC468D .F¯.P.|....v..v.jhhC.j.jKj.j..±. 000020
1076FF12 76FF0000 050F9A18 77FF261A 77FF26FA 5EC4686A 1076FF12 76FF0000 ...v..v.jhé^ª&.w.&.w.......v..v. 000040
6C9A01BC 681E6A6A 1076FF12 76FF0000 055B9A00 6A006A4B 6A006A01 4368686A jhhC.j.jKj.j..[....v..v.jj.h¥..l 000060
6A0877FF 260A77FF 26FA5EC4 0477FF26 0677FF26 FA5EC410 76FF1276 FF000005 ....v..v.é^ª&.w.&.w.é^ª&.w.&.w.j 000080
686E6A10 76FF1276 FF069309 249A006A 006A5052 001405FC 568BFA46 8B6C6A18 .jl.Fª.V=...RPj.j..$....v..v.jnh 0000A0
0000063E 9A01BD68 1E6E6A10 76FF1276 FF000005 849A006A 006A4B6A 006AB143 C.j.jKj.j.......v..v.jn.h§..>... 0000C0
7A6A1076 FF1276FF 0000059C 9A006A00 6A006A00 6A016E68 706A1076 FF1276FF .v..v.jphn.j.j.j.j.......v..v.jz 0000E0
6A106A00 6A014368 7C6A1076 FF1276FF 000005B4 9A006A00 6A106A00 6A014368 hC.j.j.j.j..Ç....v..v.j|hC.j.j.j 000100
00000606 9A006A00 6A106A00 6A014368 7E6A1076 FF1276FF 000005CC 9A006A00 .j..ä....v..v.j~hC.j.j.j.j...... 000120
E90C468B 0158E90A 468BFC56 89FA4689 000001E9 9A006A10 76FF1276 FF02D6E9 Õ■..v..v.j..Õ....Fª.V•.F.ÖX..F.Õ 000140
1276FFFE 46890000 062C9A00 6A006A00 6A006A01 65686C6A 1076FF12 76FF00AC ¯..v..v.jlhe.j.j.j.j..,....F±.v. 000160
000006C6 9A5016AC 468D5052 4CCA8300 0000D228 FE468801 68680A76 FF1076FF .v..v.hh..F±+■....ðLRP.F¯.P.ó... 000180
26145FC4 26FA5EC4 02E6C1FE 768B0000 06FE9A50 16AC468D 6A6A1076 FF1276FF .v..v.jj.F¯.P.±....v±èl.é^ª&é_.& 0001A0
FF260677 FF26FA5E C41076FF 1276FF12 57892610 478926FA 5EC40250 8B26008B ..&.P.é^ª&.G.&.W..v..v.é^ª&.w.&. 0001C0
006A006A 50520024 05FC568B FA468B70 6A126A10 77FF2612 77FF26FA 5EC40477 w.é^ª&.w.&.w.j.jp.Fª.V•.$.RPj.j. 0001E0
```

Dump of file SATURN:[PCCOMMON.DUMP.DLL]DAENTDF.TMP;1 on 18-APR-1990 10:40:49.05
File ID (561,28,0)   End of file block 116 / Allocated 116

Virtual block number 74 (0000004A), 512 (0200) bytes

```
E90C4688 00ABE9FF EFE9FF4C E9037500 0130000B E9000EE9 0011E902 A809249A .$.´.Õ..Õ..Õ..=..u.ÕL.Õÿ.Õ¨..F.Õ 000000
1276FFFE 46890000 06EC9A00 6A006A00 6A006A01 6568706A 1076FF12 76FF00B1 ...v..v.jphe.j.j.j.j..š....F±.v. 000020
0000FFFF 9A5016AC 468D5052 4CCA8300 0000022B FE468801 68680A76 FF1076FF .v..v.hh..F±+■....ðLRP.F¯.P..... 000040
E6C1FE76 8B001FE9 037D00FE 7E830000 FFFF9A50 16AC468D 6E6A1076 FF1276FF .v..v.jn.F¯.P......~±.}.Õ...v±èl 000060
000EE900 11E92257 89262047 8926FA5E C402508B 26008B26 245FC426 FA5EC402 .é^ª&é_$&..&.P.é^ª&.G &.W"Õ..Õ.. 000080
7500703D FEA0E903 75006C3D 0013E900 16E9FFEF E9FF77E9 03750001 30000BE9 Õ..=..ū.Õw.Õÿ.Õ..Õ..=l.u.Õ.±=p.u 0000A0
0000050C 9A006A10 76FF1276 FF0100E9 00E8E90A 468B014F E9FFE7E9 FF58E903 .ÕX.ÕÕ.ÕO..F.ÕÕ.Õ...v..v.j..É... 0000C0
478B26FA 5EC40000 03929A50 16AC468D 4C6A6E6A 1076FF12 76FFFC56 89FA4689 .Fª.V•.v..v.jnjL.F¯.P.....é^ª&.G 0000E0
6A003AE9 03740000 3D04C483 039E00A6 9A5016AC 468D0015 E9037512 470B2610 .&.G.u.Õ...F¯.P.Ì....é.=..t.Õ:.j 000100
006A018E 681E01DE 681E1076 FF1276FF 016A006A 000007E2 9A006A00 6A016A00 .j.j.j..ã...}.j..v..v..hB..h/.j. 000120
6A1076FF 1276FF00 39E90000 FFFF9A10 76FF1276 FF016A00 6A0000FF FF9A006A j......j.j..v..v......Õ9..v..v.j 000140
83083008 B99A1076 FF1276FF F876FF00 14E90375 00003DF8 4689080D 01D49A00 ..å....F½=..u.Õ...v½.v..v..¿.0.. 000160
01D49A01 6A1076FF 1276FF00 3EE90000 083B9A00 6A1076FF 1276FF00 00E906C4 é.Õ...v..v.j..;...Õ>..v..v.j..å. 000180
FF13E903 7500713D 001BE900 1EE90021 E90000FF FF9A016A 1076FF12 76FF0545 E..v..v.j......Õ!.Õ..Õ..=q.u.Õ.. 0001A0
FF0E76FF 1076FF12 76FF0043 E9FFDFE9 FFC5E903 7500733D FF0BE903 7500723D =r.u.Õ..=s.u.Õé.ÕÕ.ÕC..v..v..v.. 0001C0
2930FECC E9037500 20300023 E9002FE9 0000FFFF 9A0676FF 0876FF0A 76FF0C76 v..v..v..v......Õ/.Õ#.= .u.Õë±=) 0001E0
```

Dump of file SATURN:[PCCOMMON.DUMP.DLL]DAENTDF.TMP;1 on 18-APR-1990 10:40:49.05
File ID (561,28,0)   End of file block 116 / Allocated 116

Virtual block number 75 (0000004B), 512 (0200) bytes

```
E90000BA 0000B8FF 8DE9FB81 E9037500 3B30FD35 E9037500 303DFFCD E9037500 .u.Õë.=0.u.Õ5»=;.u.ÕÝ«Õ§.¡..¤..Õ 000000
9A006A05 6A0676FF 0876FFD8 8E0440B8 1E565700 019AC800 0ECAC95F 5E1F0000 ...^_èð..à...WV.¡M..Ä.v..v.j.j.. 000020
6A868D01 96680A76 FF0000FF FF9A026A 016A006A FE689689 FE668689 0000FFFF ......f±..h±j.j.j.......v.h....j 000040
006A006A 5016FE6A 868D0676 FF0876FF FE6686FF FE6886FF 0000FFFF 9A5016FE ±.P......Ñh±.Ñf±.v..v...j±.Pj.j. 000060
D88E08C1 B81E5657 00006CC8 CBC95F5E 1F0000E9 0000B800 0007D39A 006A006A j.j..Æ...¡..Õ...^_èüàl..WV.¡è..Ä 000080
04CE9A00 6A006A00 6A006A01 6E680E76 FF1A76FF 1C76FF98 46899A46 890000B8 ¡...F..F..v..v..v.hn.j.j.j.j..ö. 0000A0
1698468D 1076FF12 76FF1476 FF1676FF 1876FF00 27E90375 14460812 46880000 ...F..F.u.Õ'..v..v..v..v..v..F.. 0000C0
FF0011E9 03751446 0B12468B 00F3E98E B9B80006 E9037500 003D0000 FFFF9A50 P.....=..u.Õ..¡¿.Õµ..F..F.u.Õ... 0000E0
37FF2602 77FF260A 5EC41676 FF1876FF 0000FFFF 9A9876FF 9A76FF16 76FF1876 v..v..v..v.......v..v.é^.&.w.&.7 000100
0006E903 749A4608 98468802 57892607 89269A56 88984688 0A5EC400 0003499A .I...é^..F..V.&..&.W..F..F.t.Õ.. 000120
26078826 945EC404 94468300 04E99656 89944689 9A568898 468800A1 E90000B8 ¡..ÕÀ..F..V..F..V.Õ...F..é^.&..& 000140
0277FF26 945EC416 76FF1876 FF0029E9 03750846 0B064688 0079E903 7502470B .G.u.Õy..F..F.u.Õ)..v..v.é^.&.w. 000160
FF1876FF 0028E900 4EE98EB9 B80006E9 03750000 30065EFF 50169C46 8037FF26 &.7.F..P.^.=..u.Õ..¡¿.ÕN.Õ(..v.. 000180
B9B80006 E9037500 003D0000 04929A50 169C468D 37FF2602 77FF2694 5EC41676 v.é^.&.w.&.7.F..P.....=..u.Õ..¡¿ 0001A0
74E90000 094E9A50 169C468D FF6A006A 0161680E 76FF1A76 FF1C76FF 0023E98E .Õ#..v..v..v.ha.j.j..F..P.N...Õt 0001C0
05007C00 0101A701 03007A00 01016801 03002318 CAC95F5E 1F0000E9 0000B8FF .¡..Õ...^_èð.#...h...z...Ì...|.. 0001E0
```

```
Dump of file SATURN:[PCCOMMON.DUMP.DLL]DAENTDF.TMP;1 on 18-APR-1990 10:40:49.05
File ID (561,28,0)    End of file block 116 / Allocated 116

Virtual block number 76 (0000004C), 512 (0200) bytes

03000000 0207F400 02007F00 010A6A01 03007E00 01081E01 03044500 02015300 .S...E.......~...j.......¶...... 000000
03000700 0101B501 03008600 0104B601 0300F600 03004D02 03030900 06005002 .]...1...M...~...Ñ.......ç...... 000020
02008800 01091501 03008A00 0108E301 03027200 040A4202 03008700 01078601 .........B...r...D.............. 000040
03001E00 01047201 03001900 01080001 03000000 07092C00 02000000 0607A200 .Å.......,.......Å.......r...... 000060
03002800 02007F02 03039500 0408F402 03029000 04026F02 03001F00 01076C01 .(.......o.......¶...........(.. 000080
03003600 02019602 03041500 06042502 0300A700 03003D02 03008300 01087C01 .|...°...=...|...X...........6.. 0000A0
0300C600 03002D02 03005100 0107B801 03008600 03000802 03049300 07099C02 .........Å...Ñ...|...Q...-...6.. 0000C0
03048100 08038C02 03020100 0409B102 03000200 03001D02 03042E00 06097202 .r...........@...Y...1...¥...Y.. 0000E0
00E446C7 D88EFFFF B81E5657 000024C8 00000000 00000000 0000F300 01018201 .....ø...........à$..WV.|...ÄÚFõ. 000100
E9E4468B 0006E903 7500003D E4468900 00FFFF9A 5016EE46 8D0E76FF 1076FF00 ..v..v..FŸ.P.......Fõ=..u.õ...Fõõ 000120
E4468B00 06E90375 00003DE4 46890000 FFFF9A50 16EA468D 0E76FF10 76FF01C3 Ù..v..v..Fõ.P......Fõ=..u.õ...Fõ 000140
468B0006 E9037500 003DE446 890000FF FF9A5016 F2468D0E 76FF1076 FF01A2E9 ÕÅ..v..v..F·.P......Fõ=..u.õ...F 000160
8B0006E9 03750000 3DE44689 0000FFFF 9A5016F8 468D0E76 FF1076FF 0181E9E4 õõ...v..v..F½.P......Fõ=..u.õ... 000180
0006E903 7500003D E4468900 00FFFF9A 50160C46 8DEA76FF EC76FF01 60E9E446 Fõõ'..vš.võ.FÉ.P......Fõ=..u.õ.. 0001A0
E9037500 003DE446 890000FF FF9A5016 FC468D20 6A1E6AF2 76FF013F E9E4468B .Fõõ?..v·j.j .F•.P......Fõ=..u.õ 0001C0
568BEA46 8BFC5EC4 02578926 07892610 56880E46 8BFC5EC4 011DE9E4 46880006 ...Fõõ..ó^•.F..V.&..&.W.ó^•.Fõ.V 0001E0

Dump of file SATURN:[PCCOMMON.DUMP.DLL]DAENTDF.TMP;1 on 18-APR-1990 10:40:49.05
File ID (561,28,0)    End of file block 116 / Allocated 116

Virtual block number 77 (0000004D), 512 (0200) bytes

0E76FF10 76FF0A57 89260847 89260E56 880C468B FC5EC406 57892604 478926EC &&.G.&.W.ó^•.FÉ.V8&.G.&.W..v..v. 000000
5EC41047 89261247 89260000 8BFC5EC4 0000FFFF 9A505200 0C05FE56 8BFC468B .F•.V±...RP.....ó^•|..&.G.&.G.ó^ 000020
FC5EC41A 57892618 47892608 568B0646 8BFC5EC4 14478926 16478926 00008BFC •|..&.G.&.G.ó^•.F..V.&.G.&.W.ó^• 000040
6A078926 02478926 0000B81C 5FC426FC 5EC41E57 89261C47 89260C56 8B0A468B .F..V.&.G.&.W.ó^•&ó_.|..&.G.&..j 000060
9AFC76FF FE76FF03 80680196 36FF2602 38068EFF FF68FFFF 68016A00 6A016A00 .j.j.j.h..h....8.&.ð..h...v±.v•. 000080
46890000 FFFF9A00 6A006A00 23E90374 E2460BE0 468BE256 89E04689 0000FFFF .....FÅ.Vã.FÅ.Fãt.Õ#.j.j.......F 0000A0
FF9AE076 FFE276FF 002DE9F4 468B0000 01EB9AFC 76FFFE76 FFF276FF F65689F4 ¶.V-.v·.v±.v•.Š....F¶Õ-..vã.vÅ.. 0000C0
8B0000FF FF9AFC76 FFFE76FF F276FF00 00FFFF9A E076FFE2 76FFE446 890000FF ....Fõ.vã.vÅ......v·.v±.v•...... 0000E0
006A0876 FF0A76FF D88E0008 B81E5657 0000AAC8 000CCAC9 5F5E1F00 00E9E446 Fõõ...^_èò..à'..WV.|...Ã.v..v.j. 000100
FF0152E9 03740006 7E830000 FA46C700 00FF5686 C7FE5689 FC468900 00FFFF9A ......F=.V±ú.V....ÚF°...~..t.ÕR.. 000120
0A76FF00 1CE9F446 89000002 629A006A 006AFF6A 006A0165 686A6A08 76FF0A76 v..v.jjhe.j.j.j.j..b....F¶õ...v. 000140
E90375FF F47E83F4 46890000 FFFF9A00 6A006AF4 76FF006A 0165686A 6A0876FF .v.jjhe.j..v¶j.j.......F¶.-¶.u.õ 000160
5689F646 8902508B 26008B26 105FC426 FC5EC402 E6C1F476 8B0001FA 46C7010F ..ÚF°...v¶èl.ó^•&ó_.&..&.P..F-.V 000180
C40477FF 260677FF 26FC5EC4 0042E903 7402470B 26078B26 1C5FC426 FC5EC4F8 ½ó^•&ó_.&..&.G.t.õß.ó^•&.w.&.w.ó 0001A0
1877FF26 1A77FF26 5FC5EC41C 77FF261E 77FF26FC 5EC40C77 FF260E77 FF26FC5E ^•&.w.Ẽ.w.ó^•&.w.&.w.ó^•&.w.&.w. 0001C0
77FF2606 77FF26FC 5EC4009B E90003E9 03750000 30FF5686 890000FF FF9A006A j........V.=..u.õ..õ..ó^•&.w.&.w 0001E0

Dump of file SATURN:[PCCOMMON.DUMP.DLL]DAENTDF.TMP;1 on 18-APR-1990 10:40:49.05
File ID (561,28,0)    End of file block 116 / Allocated 116

Virtual block number 78 (0000004E), 512 (0200) bytes

FF26FC5E C4000003 259A5016 A4468D02 6A37FF26 0277FF26 1C5FC426 FC5EC404 .ó^•&ó_.&.w.&.7j..FÉ.P.X...ó^•&. 000000
0677FF26 FC5EC400 00FFFF9A 5016FF58 868D026A F676FFF8 76FF0477 FF260677 w.&.w..v½.v-j...X..P.....ó^•&.w. 000020
00FFFF9A 116AF676 FFF876FF 086A37FF 260277FF 261C5FC4 26FC5EC4 0477FF26 &.w.ó^•&ó_.&.w.&.7j..v½.v-j..... 000040
261C5FC4 26FC5EC4 0477FF26 0677FF26 FC5EC400 21E90375 00003DFF 56868900 ...V.=..u.õ|.ó^•&.w.&.w.ó^•&ó_.& 000060
7400FF56 8E830120 E9037400 067E83FE CCE90003 E90000FF FF9A37FF 260277FF .w.&.7.....õ..õä±.~..t.õ ..ƒV..t 000080
006A0165 686C6A08 76FF0A76 FF8EF4FF 5686C700 06E90374 00FA7E83 0116E903 .õ...~°.t.õ..ú.V.¶..v..v.jlhe.j. 0000A0
FC5EC402 E6C1F476 8B00E3E9 0375FFF4 7E83F446 89000003 F69A006A 006AFF6A j.j.j..-....F¶.-¶.u.õD..v¶èl.ó^• 0000C0
76FF006A 0165686C 6A0876FF 0A76FFF2 5689F046 8902508B 26008B26 145FC426 &ó_.&..&.P..Fb.V·.v..v.jlhe.j..v 0000E0
0042E903 7402470B 26078B26 1C5FC426 FC5EC4F4 46890000 02439A00 6A006AF4 ¶j.j..C....F¶ó^•&ó_.&..&.G.t.õß. 000100
77FF261E 77FF26FC 5EC40C77 FF260E77 FF26FC5E C40477FF 260677FF 26FC5EC4 ó^•&.w.&.w.ó^•&.w.Ẽ.w.ó^•&.w.&.w 000120
E90003E9 03750000 30FF5686 89000002 D39A006A 1877FF26 1A77FF26 FC5EC41C .ó^•&.w.&.w.j..Æ.....V.=..u.õ..õ 000140
F276FF09 6A37FF26 0277FF26 1C5FC426 FC5EC404 77FF2606 77FF26FC 5EC40058 X.ó^•&.w.&.w.ó^•&ó_.&.w.&.7j..v· 000160
77FF2606 77FF26FC 5EC40021 E9037500 003DFF56 86890000 034D9A12 6AF076FF .vbj..M.....V.=..u.õ|.ó^•&.w.&.w 000180
77FF26FC 5EC4FF14 E90003E9 00000377 9A37FF26 0277FF26 1C5FC426 FC5EC404 .ó^•&ó_.&.w.&.7.w...õ..õ..ó^•&.w 0001A0
0477FF26 0677FF26 FC5EC400 0004DC9A 1077FF26 1277FF26 FC5EC404 77FF2606 .&.w.ó^•&.w.&.w...É...ó^•&.w.&.w. 0001C0
52C80006 CAC95F5E 1F0000E9 FF56868B 0000FFFF 9A1477FF 261677FF 26FC5EC4 ó^•&.w.&.w........V.õ...^_èò..àR 0001E0
```

```
Dump of file SATURN:[PCCOMMON.DUMP.DLL]DAENTDF.TMP;1 on 18-APR-1990 10:40:49.05
File ID (561,28,0)   End of file block 116 / Allocated 116

Virtual block number 79 (0000004F), 512 (0200) bytes

 FF1276FF FE5689FC 46890856 88064688 01A6E90E 4688D88E 0204881E 56570000 ..WV.¡...Ä.F.Ö1..F..V..F•.V±.v.. 000000
 77FF26FC 5EC40477 FF260677 FF26FC5E C40000FF FF9AFC76 FFFE76FF 006A1076 v.j..v±.v•.....á^=&.w.&.w.á^=&.w 000020
 79E999FA 46880007 E9037500 0030FA46 890000FF FF9A5016 AE4680DC 77FF260E .&.w..FÛ.P......F•=..u.Ö...F•.Öy 000040
 FF26FC5E C4686A10 76FF1276 FF000005 779A5016 AE468D66 6A1076FF 1276FF01 ..v..v.jf.FÛ.P.w....v..v.jhá^=&. 000060
 26FC5EC4 0477FF26 0677FF26 FC5EC410 76FF1276 FF0000FF FF9A1877 FF261A77 w.&.w.......v..v.á^=&.w.&.w.á^=& 000080
 FFFF68FF FF68006A 006A5052 001005FE 5688FC46 886A6A15 6A0C77FF 260E77FF .w.&.w.j.jj.F•.V±...RPj.j.h..h.. 0000A0
 77FF260E 77FF26FC 5EC40477 FF260677 FF26FC5E C41076FF 1276FF05 ED06D19A .Ì.Û..v..v.á^=&.w.&.w.á^=&.w.&.w 0000C0
 E9060306 D19AFFFF 68FFFF68 006A006A 50520014 05FE5688 FC4688 6C 6A126A0C .j.jl.F•.V±...RPj.j.h..h...Ì...Ö 0000E0
 0011E903 7500003D FA468906 3C01FC9A 006A1076 FF1276FF 0078E90A 468800CF ü..F.Öx..v..v.j..•.<..F•=..u.Ö.. 000100
 52E90000 06539A00 6A1076FF 1276FF00 00E90000 062A9AFA 76FF1076 FF1276FF .v..v..v•.*...Ö...v..v.j..S...ÖR 000120
 FF1076FF 1276FF00 11E90375 000030FA 46890178 01FC9A01 6A1076FF 1276FF00 ..v..v.j..•.x..F•=..u.Ö...v..v.. 000140
 0013E900 16E90019 E90000FF FF9A016A 1076FF12 76FF000D E9000006 639AFA76 v•.c...Ö...v..v.j......Ö..Ö..Ö.. 000160
 FF0E76FF 1076FF12 76FF0038 E9FFE7E9 FF81E903 75006E30 FF80E903 75006D3D =m.u.Ö..=n.u.ÖŸ.ÖÖ.Ö;..v..v..v.. 000180
 293DFF44 E9037500 2030001B E90027E9 0000FFFF 9A0676FF 0876FF0A 76FF0C76 v..v..v..v......Ö'.Ö..= .u.ÖD.=) 0001A0
 0ECAC95F 5E1F0000 E90000BA 000088FF C5E9FE42 E9037500 3830FFCD E9037500 .u.Öë.=;.u.Ö8±Öé.¡..¤..Ö...^_èò. 0001C0
 681276FF 1E76FF20 76FF9646 89984689 00008808 8E04F688 1E565700 0078C800 .àx..WV.¡−..Ä¡...F..F..v .v.¯v.h 0001E0
```

```
Dump of file SATURN:[PCCOMMON.DUMP.DLL]DAENTDF.TMP;1 on 18-APR-1990 10:40:49.05
File ID (561,28,0)   End of file block 116 / Allocated 116

Virtual block number 80 (00000050), 512 (0200) bytes

 1A76FF1C 76FF0027 E9037518 460B1646 88000003 879A006A 006A006A 006A016E n.j.j.j.j..ñ....F..F.u.Ö'..v..v. 000000
 25E98E89 B80006E9 03750000 300000FF FF9A5016 96468D14 76FF1676 FF1876FF .v..v..v..F..P.....=..u.Ö..¦¿.ÖX 000020
 1C76FF00 00FFFF9A 9676FF98 76FF1A76 FF1C76FF 0011E903 7518460B 16468B02 ..F..F.u.Ö...v..v..v..v.......v. 000040
 89260789 26985688 96468B0E 5EC40000 04C19A37 FF260277 FF260E5E C41A76FF .v.á^.&.w.&.7.ë...á^..F..V.&..&. 000060
 46880127 E9037508 46080646 8801D3E9 00008800 06E90374 98460896 46880257 W..F..F.t.Ö..¡..ÖÆ..F..F.u.Ö'..F 000080
 26078826 925EC488 46FF0492 46830007 E9000088 46C79456 89924689 98568896 ..V..F..V.úF...Ö...F...F.á^.&..& 0000A0
 5EC40492 46830004 E9945689 92468998 56889646 88FFE7E9 0003E903 7502470B .G.u.Ö..ÖÖ..F..V..F..V.Ö...F..á^ 0000C0
 FF260277 FF26925E C4006A00 6A1A76FF 1C76FF00 43E90375 02470826 07882692 .&..&.G.u.ÖC..v..v.j.j.á^.&.w.&. 0000E0
 0000E903 74008A7E 83014FE9 8E898800 06E90375 00003006 5EFF5016 8A468037 7.F..P.^.=..u.Ö..¦¿.ÖO..−..t.Ö.. 000100
 56899246 89985688 96468800 009A46C7 FFAAE907 89260247 89260000 88925EC4 á^.¡..&.G.&..Ö˙.úF....F..V..F..V 000120
 02470826 07882692 5EC4006F E903729A 46398846 88049246 839A46FF 0007E994 .Ö...F..F...F.9F.r.Öo.á^.&..&.G. 000140
 8E46838C 46FF0007 E9905689 8E468994 56889246 888C4689 9A468800 50E90374 t.Ö]..F..F..F..V..F..V.Ö...F..F. 000160
 88268E5E C40024E9 03750247 08260788 268E5EC4 0036E903 728C4639 88468804 ..F.9F.r.Ö6.á^.&..&.G.u.Ö$.á^.&. 000180
 E90003E9 07892602 47892600 00888E5E C4025789 26078926 925EC402 57882607 .&.W.á^.&..&.W.á^.¡..&.G.&..Ö..Ö 0001A0
 08260788 26925EC4 04924683 0004E994 56899246 89985688 96468BFF 7FE9FF88 ¡.Ö...F..V..F..V.Ö...F..á^.&..&. 0001C0
 260277FF 26925EC4 1A76FF1C 76FF0029 E903750C 46080A46 880079E9 03750247 G.u.Öy..F..F.u.Ö)..v..v.á^.&.w.& 0001E0
```

```
Dump of file SATURN:[PCCOMMON.DUMP.DLL]DAENTDF.TMP;1 on 18-APR-1990 10:40:49.05
File ID (561,28,0)   End of file block 116 / Allocated 116

Virtual block number 81 (00000051), 512 (0200) bytes

 76FF1C76 FF0028E9 004EE98E B9880006 E9037500 00300A5E FF50169C 468D37FF .7.F..P.^.=..u.Ö..¦¿.ÖN.Ö(..v..v 000000
 8EB98800 06E90375 00003000 00053B9A 50169C46 8D37FF26 0277FF26 925EC41A .á^.&.w.&.7.F..P.;...=..u.Ö..¦¿. 000020
 FF74E900 0006FB9A 50169C46 8DFF6A00 6A016168 1276FF1E 76FF2076 FF0023E9 Ö#..v .v..v.he.j.j..F..P.«...Öt. 000040
 03730004 05AB0202 007A0001 01900103 00219000 1CCAC95F 5E1F0000 E9000088 ¡..Ö...^_èò...!.......z...¨...s. 000060
 03D90006 00A10203 007F0001 09490103 007E0001 061A0103 007C0001 01CF0103 ..ü...|.......−...I.......À...). 000080
 00070001 010D0103 00860001 055F0103 00F60003 00800203 00000003 05B30002 ..•...........−..._.......Ì..... 0000A0
 001F0001 02110103 001E0001 05180103 00000007 06090002 02720004 09210203 ..!...r...1................ ...... 0000C0
 00830001 069C0103 00280002 00C30203 04070006 03070203 030F0004 04A00203 ..................Û...(... ...•. 0000E0
 04EE0003 017B0005 04930007 07490203 00360002 01BE0203 00A70003 005F0203 .._...I.../...6...I.......( .Y. 000100
 02C40004 043F0203 042E0006 071F0203 00C60003 003E0203 00B60003 011C0203 ......Ñ...>...6...........?...á. 000120
 03730004 05AE0205 02010004 075E0203 00D20003 001D0203 03650004 05E80205 ..Ò...e.......Ø...^...1...Ô...s. 000140
 00000000 00000000 00F30001 01AA0103 04470006 04760203 03650004 05E50202 ..Ì...e...v...G...˘...µ......... 000160
 30F84689 0000FFFF 9A5016FA 46800A76 FF0C76FF 088EFFFF B81E5657 00000CC8 à...WV.¡...Ä.v..v..F•.P......F½= 000180
 00003DF8 46890000 FFFF9A50 16F4468D FA76FF00 4FE9F846 880006E9 03750000 ..u.Ö...F½ÖO..v•.F¶.P......F½=.. 0001A0
 003DF846 890000FF FF9A5016 FC468DF4 76FFF676 FF0031E9 F8468800 06E90375 u.Ö...F½Ö1..v−.v¶.F•.P......F½=. 0001C0
 C95F5E1F 0000E9FF FF13BC9A 696AF476 FFF676FF 0010E9F8 46880006 E9037500 .u.Ö...F½Ö...v−.v¶ji.¥...Ö...^_è 0001E0
```

Dump of file SATURN:[PCCOMMON.DUMP.DLL]DAENTDF.TMP;1 on 18-APR-1990 10:40:49.05
File ID (561,28,0)   End of file block 116 / Allocated 116

Virtual block number 82 (00000052), 512 (0200) bytes

```
F8468900 0000189A 5016FA46 8D0A76FF 0C76FFD8 8E000888 1E565700 000CC8CB ùà...WV.|...Ä.v..v..F*.P......F½ 000000
003DF846 89000000 369A5016 F4468DFA 76FF0087 E9F8468B 0006E903 7500003D =..u.Õ...F½Õ...v*.F¶.P.6....F½=. 000020
3DF84689 00000057 9A5016FC 468DF476 FFF676FF 0069E9F8 46880006 E9037500 .u.Õ...F½Õi..v-.v¶.F•.P.W....F½= 000040
03751056 390008E9 03740E46 39FE5688 FC468800 48E9F846 880006E9 03750000 ..u.Õ...F½ÕH..F•.V±9F.t.Õ..9V.u. 000060
880006E9 03750000 3DF84689 0000FFFF 9AF476FF F676FF00 2CE90000 880006E9 Õ..|..Õ,..v-.v¶......F½=..u.Õ... 000080
56570000 0CC8C8C9 5F5E1F00 00E90000 FFFF9A67 6AF476FF F676FF00 10E9F846 F½Õ...v-.v¶jg.....Õ...^_èùà...WV 0000A0
06E90375 00003DF8 46890000 00999A50 16FA468D 0A76FF0C 76FFD88E 0089BB1E .|...Ä.v..v..F*.P......F½=..u.Õ. 0000C0
880006E9 03750000 3DF84689 000000B7 9A5016F4 468DFA76 FF006BE9 F8468B00 ..F½Õk..v*.F¶.P.ñ....F½=..u.Õ... 0000E0
0006E903 7500003D F8468900 0000D89A 5016FC46 8DF476FF F676FF00 4DE9F846 F½ÕM..v-.v¶.F•.P.Ä....F½=..u.Õ.. 000100
E90000B8 0006E903 75105639 0008E903 740E4639 FE5688FC 4688002C E9F8468B .F½Õ,..F•.V±9F.t.Õ..9V.u.Õ...|..Õ 000120
42B81E56 57000010 C8CBC95F 5E1F0000 E9FFFFB8 0000FFFF 9A006AFA 76FF0010 ...v*j......|..Õ...^_èùà...WV.|B 000140
46880006 E9037500 003DF446 89000001 529A5016 F6468D0A 76FF0C76 FFD88E01 ..Ä.v..v..F-.P.R....F¶=..u.Õ...F 000160
E9F4468B 0006E903 7500003D F4468900 0001709A 5016F046 8DF676FF 0094E9F4 ¶Õ...v-.Fb.P.p....F¶=..u.Õ...F¶Õ 000180
F4468800 06E90375 00003DF4 46890000 01919A50 16FC468D F076FFF2 76FF0076 v..v·.vb.F•.P......F¶=..u.Õ...F¶ 0001A0
003DF446 890000FF FF9A5016 F8468D0E 6AFC76FF FE76FF0A 76FF0C76 FF0055E9 ÕU..v..v..v±.v•j..F½.P......F¶=. 0001C0
E9037510 56390008 E903740E 4639FA56 88F8468B 002CE9F4 46880006 E9037500 .u.Õ...F¶Õ,..F½.V*9F.t.Õ..9V.u.Õ 0001E0
```

Dump of file SATURN:[PCCOMMON.DUMP.DLL]DAENTDF.TMP;1 on 18-APR-1990 10:40:49.05
File ID (561,28,0)   End of file block 116 / Allocated 116

Virtual block number 83 (00000053), 512 (0200) bytes

```
0010C8CB C95F5E1F 0000E900 00FFFF9A 686AF076 FFF276FF 0010E900 00B80006 ..|..Õ...v·.vbjk.....Õ...' èùà.. 000000
7500003D F0468900 0001EF9A 5016FA46 8D0A76FF 0C76FFD8 8E010FB8 1E565700 .WV.|Õ..Ä.v..v..F*.P.ÿ.....'=..u 000020
E9037500 003DF046 89000002 009A5016 F2468DFA 76FF00CB E9F0468B 0006E903 .Õ...FbÕù..v*.F·.P......Fb=..J.Õ 000040
03750000 3DF04689 0000022E 9A5016FC 468DF276 FFF476FF 00ADE9F0 46880006 ...FbÕÙ..v¶.v·.F•.P......Fb=..u. 000060
7500003D F0468900 00FFFF9A 5016F646 8DF276FF F476FF00 8CE9F046 880006E9 Õ...FbÕ...v¶.v·.F-.P......Fb=..u 000080
001CE903 75105639 0008E903 740E4639 FE5688FC 4688006B E9F0468B 0006E903 .Õ...FbÕk..F•.V±9F.t.Õ..9V.u.Õ.. 0000A0
FFF876FF 0039E900 00B80006 E9037514 56390008 E9037412 4639FE56 88FC4688 .F•.V±9F.t.Õ..9V.u.Õ..|..Õ9..v½. 0000C0
006A006A 006A006A 016E6872 6AF676FF F876FF00 00FFFF9A 0222681E 706AF676 v-jp.h"........v½.v-jrhn.j.j.j.j. 0000E0
56570000 18C8CBC9 5F5E1F00 00E90000 FFFF9A72 6AF276FF F476FF00 00FFFF9A ......v¶.v·jr.....Õ...^_èùà...WV 000100
06E90375 00003DEC 46890000 02B59A50 16F64650 0A76FF0C 76FFD88E 02A5B81E .|È..Ä.v..v..F-.P.ç....F§=..u.Õ. 000120
880006E9 03750000 3DEC4689 000002D3 9A5016E8 468DF676 FF0129E9 EC468800 ..F§Õ)..v-.FÕ.P.Æ....F§=..u.Õ... 000140
0006E903 7500003D EC468900 0002F49A 5016FC46 8DE876FF EA76FF01 0BE9EC46 F§Õ...vÕ.vÕ.F•.P.¶....F§=..u.Õ.. 000160
06E90375 00003DEC 46890000 03159A50 16F2468D E876FFEA 76FF00EA E9EC468B .F§Õò..vÕ.vÕ.F·.P......F§=..u.Õ. 000180
890000FF FF9A5016 F8468D11 6AFC76FF FE76FF0A 76FF0C76 FF00C9E9 EC468800 ..F§Õè..v..v..v±.v•j..F½.P...... 0001A0
830004E9 F05689EC 4689FA56 88F8468B 00A0E9EC 46880006 E9037500 003DEC46 F§=..u.Õ...F§Õ...F½.V*.FŸ.VbÕ... 0001C0
03740739 26105688 0E468BEE 5EC40067 E9037502 470B2607 8B26EE5E C404EE46 FŸ.á^Ÿ&..&.G.u.Õg.á^Ÿ.F..V.&9.t. 0001E0
```

Dump of file SATURN:[PCCOMMON.DUMP.DLL]DAENTDF.TMP;1 on 18-APR-1990 10:40:49.05
File ID (561,28,0)   End of file block 116 / Allocated 116

Virtual block number 84 (00000054), 512 (0200) bytes

```
F476FF00 0004E69A F876FFFA 76FF0A76 FF0C76FF 004AE903 74025739 260053E9 ÕS.&9W.t.ÕJ..v..v..v*.v½.|....v¶ 000000
6A006A00 6A006A01 6E68726A F276FFF4 76FF0000 03699A02 23681E70 6AF276FF .v·jp.h#..i.....v¶.v·jrhn.j.j.j.j 000020
FF0A76FF 0C76FFFF 86E9001A E9000003 8E9A726A E876FFEA 76FF0000 03819A00 ........võ.vÕjr.....Õ..Õ...v..v.. 000040
8E03A2B8 1E565700 000CC8CB C95F5E1F 0000E900 00B80000 FFFF9AF8 76FFFA76 v*.v½.....|..Õ...^_èùà...WV.|Ä.. 000060
E9F4468B 0006E903 7500003D F4468900 0003B29A 5016FA46 8D0A76FF 0C76FFD8 Ä.v..v..F*.P.ý....F¶=..u.Õ...F¶Õ 000080
0064E9F4 46880006 E9037500 003DF446 89000003 D09A5016 F6468DFA 76FF0082 ...v*.F-.P.Ä....F¶=..u.Õ...F¶Õd. 0000A0
43E9F446 880006E9 03750000 3DF44689 000003F1 9A5016FC 468DF676 FFF876FF .v½.v-.F•.P.b....F¶=..u.Õ...F¶ÕC 0000C0
124639FE 5688FC46 88001CE9 03751056 390008E9 03740E46 39FE5688 FC468800 ..F•.V±9F.t.Õ..9V.u.Õ...F•.V±9F. 0000E0
00FFFF9A 00A368F6 76FFF876 FF0011E9 00008800 06E90375 14563900 08E90374 t.Õ..9V.u.Õ..|..Õ...v½.v-hÈ..... 000100
5016FA46 800A76FF 0C76FFD8 8E04FDB8 1E565700 0010C8CB C95F5E1F 0000E900 .Õ...^_èùà...WV.|»..Ä.v..v..F*.P 000120
2B9A5016 F4468DFA 76FF0098 E9F8468B 0006E903 7500003D F8468900 0005009A ......F½=..u.Õ...F½Õ...v*.F¶.P.+ 000140
9A5016FC 468DF476 FFF676FF 007AE9F8 46880006 E9037500 003DF846 89000005 ....F½=..u.Õ...F½Õz..v-.v¶.F•.P. 000160
76FFFE76 FF0A76FF 0C76FF00 59E9F846 880006E9 03750000 3DF84689 0000054C L....F½=..u.Õ...F½ÕY..v..v..v±.v 000180
46880030 E9F8468B 0006E903 7500003D F8468900 0002579A 5016F046 8D0F6AFC •j..Fb.P.W....F½=..u.Õ...F½Õ0..F 0001A0
05909A00 A368F476 FFF676FF 0014E903 74F25639 001CE903 74F04639 1056880E ..V.9Fbt.Õ..9V·t.Õ...v-.v¶hÈ..... 0001C0
FFD88E05 B1B81E56 57000010 C8CBC95F 5E1F0000 E90000B8 0006E900 09E90000 ..Õ..Õ..|..Õ...^_èùà...WV.|Ÿ..Ä. 0001E0
```

```
Dump of file SATURN:[PCCOMMON.DUMP.DLL]DAENTDF.TMP;1 on 18-APR-1990 10:40:49.05
File ID (561,28,0)   End of file block 116 / Allocated 116

Virtual block number 85 (00000055), 512 (0200) bytes

 00CEE9F0 46880006 E9037500 003DF046 89000005 C19A5016 FA468D0A 76FF0C76 v..v..F*.P.è....Fÿ=..u.Õ...FÞõö. 000000
 76FF0080 E9F04688 0006E903 7500003D F0468900 0005DF9A 5016F246 8DFA76FF .v*.F·.P.Õ....Fÿ=..u.Õ...FÞÕ¯..v 000020
 FF008FE9 F0468800 06E90375 000030F0 46890000 06009A50 16FC468D F276FFF4 ¶.v·.F=.P......Fÿ=..u.Õ...FÞÕ... 000040
 006EE9F0 46880006 E9037500 003DF046 89000004 129A5016 F6468DF2 76FFF476 v¶.v·.F-.P......Fÿ=..u.Õ...FÞÕn. 000060
 74124639 FE568BFC 4688001C E9037510 56390008 E903740E 4639FE56 8BFC4688 .F=.V±9F.t.Õ..9V.u.Õ...F=.V±9F.t 000080
 9A022468 1E00A568 F676FFF8 76FF003C E9000088 0006E903 75145639 0008E903 .Õ..9V.u.Õ..¡..Õ<..v½.v-hÊ..h$.. 0000A0
 F476FF00 0004C29A 006A006A 006A006A 016E6800 A768F676 FFF876FF 000004AA ˆ....v½.v-hÏ.hn.j.j.j.j..ô....v¶ 0000C0
 FFD88E06 7BB81E56 57000018 C8C8C95F 5E1F0000 E90000FF FF9A00A7 68F276FF .v·hÏ......Õ...^_èùà...WV.¡(..Ä. 0000E0
 012CE9EC 46880006 E9037500 003DEC46 89000006 8B9A5016 F6468D0A 76FF0C76 v..v..F-.P......F§=..u.Õ.  FšÕ,. 000100
 76FF010E E9EC4688 0006E903 7500003D EC468900 0006A99A 5016E846 8DF676FF .v-.FÒ.P.`....Fš=..u.Õ...F )...v 000120
 FF00EDE9 EC468800 06E90375 00003DEC 46890000 06CA9A50 16FC468D E876FFEA õ.vÒ.F=.P.ò....Fš=..u.Õ...FšÜ.. 000140
 00CCE9EC 46880006 E9037500 003DEC46 89000006 EB9A5016 EE468DE8 76FFEA76 vö.vÒ.FŸ.P.Š....Fš=..u.Õ...Fšõë. 000160
 03750000 30EC4689 0000043B 9A5016F8 468D146A FC76FFFE 76FF0A76 FF0C76FF .v..v..v±.v=j..F½.P.;....Fš=..u. 000180
 26F25EC4 04F24683 0004E9F4 5689F246 89FA5688 F8468800 A3E9EC46 880006E9 Õ...FšÕÈ..F½.V*.F·.V¶Õ...F·.ó^·& 0001A0
 02573926 0056E903 74073926 105688OE 4688F25E C4006AE9 03750247 0B26078B ..&.G.u.Õj.ó^·.F..V.&9.t.ÕV.&9W. 0001C0
 1E00A568 EE76FFF0 76FF0000 08C29AF8 76FFFA76 FF0A76FF 0C76FF00 4DE90374 t.ÕM..v..v..v*.v½.ô....vÞ.vŸhÊ.. 0001E0

Dump of file SATURN:[PCCOMMON.DUMP.DLL]DAENTDF.TMP;1 on 18-APR-1990 10:40:49.05
File ID (561,28,0)   End of file block 116 / Allocated 116

Virtual block number 86 (00000056), 512 (0200) bytes

 0007599A 006A006A 006A006A 016E6800 A768EE76 FFF076FF 00000740 9A022568 hX..a....vÞ.vŸhÏ.hn.j.j.j.j..Y.. 000000
 76FFFA76 FF0A76FF 0C76FFFF 83E9001A E9000007 679A00A7 68E876FF EA76FF00 ..võ.vÒhÏ..g...Õ..Õ...v..v..v*.v 000020
 165EC408 8E077BB8 1E565700 0006C8C8 C95F5E1F 0000E900 00880000 04999AF8 ½.....¡..Õ...^_èùà...WV.¡(..Äó^. 000040
 0C563900 08E90374 0A463910 56880E46 8800ABE9 00008800 06E90374 013F8326 &.?.t.Õ..¡..Õ¨¯.F..V.9F.t.Õ..9V. 000060
 C726165E C4000EE9 03740C56 390016E9 03740A46 3914568B 12468800 16E90375 u.Õ...F..V.9F.t.Õ..9V.t.Õ..ó^.&ú 000080
 0006299A 5016FC46 8D0F6A0A 76FF0C76 FF0676FF 0876FF00 71E90000 B8000107 ...¡..Õq..v..v..v..v.j..F=.P.).. 0000A0
 1876FF00 37E90375 FE4608FC 46880048 E9FA4688 0006E903 7500003D FA468900 ..F*=..u.Õ...F*ÕH..F=.F±u.Õ7..v. 0000C0
 FFFF08D1 9A0676FF 0876FFFC 76FFFE76 FF0E76FF 1076FF12 76FF1476 FF1676FF .v..v..v..v..v..v±.v=.v..v..Ï... 0000E0
 C8C8C95F 5E1F0000 E9000088 0006E9FA 46880006 E9037500 003DFA46 8914C483 .ó..F*=..u.Õ...F*Õ..¡..Õ...^_èùà 000100
 003DF046 890000FF FF9A5016 FC468D06 76FF0876 FFD88E08 D9881E56 57000012 ...WV.¡)..Ä.v..v..F=.P......Fÿ=. 000120
 03750000 3DF04689 0000FFFF 9A5016F6 468D006A 00FFE9F0 46880006 E9037500 .u.Õ...FÞÕ..j..F-.P......Fÿ=..u. 000140
 8D5016EE 468D1E6A 0E76FF10 76FFF676 FF0A76FF 0C76FF00 E2E9F046 880006E9 Õ...FÞÕã..v..v..v-.v..v.j..FŸ.P. 000160
 E9F0468B 00000A44 9AF676FF 000EE903 7500003D F0468900 00FFFF9A 5016F846 F½.P......Fÿ=..u.Õ...v-.D....FÞÕ 000180
 000107C7 261A5EC4 0008E903 7500667F 8326FC5E C40023E9 037400EE 7E8300A9 `..~Ÿ.t.Õ#.ó^=&..f.u.Õ..ó^.&ú... 0001A0
 F2468300 04E9F456 89F24689 FA5688F8 4688007D E9000088 00000AB0 9AF676FF .v-.¯...¡..Õ)..F½.V*.F·.V¶Õ...F· 0001C0
 09E90374 07392614 56881246 88F25EC4 004DE903 7502470B 26078B26 F25EC404 .ó^·&..&.G.u.ÕM.ó^·.F..V.&9.t.Õ. 0001E0

Dump of file SATURN:[PCCOMMON.DUMP.DLL]DAENTDF.TMP;1 on 18-APR-1990 10:40:49.05
File ID (561,28,0)   End of file block 116 / Allocated 116

Virtual block number 87 (00000057), 512 (0200) bytes

 74025739 26001FE9 03740739 26185688 16468BF2 5EC4001A E9037502 57392600 .&9W.u.Õ..ó^·.F..V.&9.t.Õ..&9W.t 000000
 F676FFFF A0E90011 E9000088 00000AC1 9AF676FF 000107C7 261A5EC4 0016E903 .Õ..ó^.&ú....v-.è...¡..Õ..Õ...v- 000020
 00E846C7 D88E09A7 B81E5657 000018C8 C8C95F5E 1F0000E9 00008800 00FFFF9A .....¡..Õ...^_èùà...WV.¡Ï..ÄúFÒ. 000040
 06E90375 00003DEA 46890000 07889A50 16FA468D 0A76FF0C 76FF0000 F846C700 .úF½...v..v..F*.P......Fõ=..u.Õ. 000060
 880006E9 03750000 3DEA4689 000007A9 9A5016EC 468DFA76 FF0198E9 EA468800 ..FõÕ...v*.F&.P.¯....Fõ=..u.Õ... 000080
 0006E903 7500003D EA468900 0007CA9A 5016FC46 8DEC76FF EE76FF01 7AE9EA46 FõÕz..vŸ.vš.F=.P.ò....Fõ=..u.Õ.. 0000A0
 06E90375 00003DEA 46890000 07E89A50 16F0468D EC76FFEE 76FF0159 E9EA4688 .FõÕY..vŸ.vš.FÞ.P.Š....Fõ=..u.Õ. 0000C0
 89000009 3D9A5016 F4468D0F 6AFC76FF FE76FF0A 76FF0C76 FF0138E9 EA468800 ..Fõõ8..v..v..v±.v=j..F¶.P.=.... 0000E0
 5016E846 8D0036E9 0375F646 0BF4468B 010FE9EA 46880006 E9037500 003DEA46 Fõ=..u.Õ...FõÕ...F¶.F-u.Õ6..FÒ.P 000100
 14C4830C 0008D19A 0A76FF0C 76FFF476 FFF676FF 0E76FF10 76FF1276 FF1476FF .v..v..v..v..v-.v¶.v..v..Ï....ó. 000120
 FF5016F8 468D0077 E9037400 E87E8300 CEE9EA46 880006E9 03750000 3DEA4689 .Fõ=..u.Õ...Fõõö..~Õ.t.Õw..F½.P. 000140
 099F9AEC 76FFEE76 FF0A76FF 0C76FFFC 76FFFE76 FF0E76FF 1076FF12 76FF1476 v..v..v..v..v±.v=.v..v..vŸ.vš... 000160
 880032E9 037400F8 7E830089 E9EA4688 0006E903 7500003D EA468918 C483097E -..ó..Fõ=..u.Õ...FõÕ...~½.t.Õ2.. 000180
 03741246 39FE5688 FC468800 1CE90375 10563900 08E90374 0E4639FE 568BFC46 F=.V±9F.t.Õ..9V.u.Õ...F=.V±9F.t. 0001A0
 719A0226 681E00AE 68F076FF F276FF00 4EE90000 B80006E9 03751456 390008E9 Õ..9V.u.Õ..¡..ÕN..v·.vÞhÜ..h&..q 0001C0
 6E6800B0 68F076FF F276FF00 0008849A 0227681E 00AD68F0 76FFF276 FF00000C ....v·.vÞhÜ..h'.......v·.vÞh¯.hn 0001E0
```

```
Dump of file SATURN:[PCCOMMON.DUMP.DLL]DAENTDF.TMP;1 on 18-APR-1990 10:40:49.05
File ID (561,28,0)   End of file block 116 / Allocated 116

Virtual block number 88 (00000058), 512 (0200) bytes

 1F0000E9 0077156A 9A008068 EC76FFEE 76FF0000 08909A00 6A006A00 6A006A01 .j.j.j.j.......vŸ.všh¯..j.w.Õ... 000000
 5016FA46 8D0A76FF 0C76FF00 00F846C7 D88E0AD8 881E5657 000012C8 CBC95F5E ^_èùà...WV.¡Ä..ÄÚF½...v..v..F*.P 000020
 109A5016 F0468DFA 76FF0125 E9EE4688 0006E903 7500003D EE468900 000AF29A .¯....FŸ=..u.Õ...FŸÕ%..v*.FÞ.P.. 000040
 9A5016FC 468DF076 FFF276FF 0107E9EE 46880006 E9037500 003DEE46 89000008 ....FŸ=..u.Õ...FŸÕ...v·.vÞ.F=.P. 000060
 5016F446 8DF076FF F276FF00 E6E9EE46 880006E9 03750000 3DEE4689 00000831 1....FŸ=..u.Õ...FŸÕ1..v·.vÞ.F¶.P 000080
 76FF1476 FF5016F8 468D00C5 E9EE4688 0006E903 7500003D EE468900 0008529A .R....FŸ=..u.Õ...FŸÕé..F½.P.v..v 0000A0
 C48308B8 099F9AF0 76FFF276 FF0A76FF 0C76FFFC 76FFFE76 FF0E76FF 1076FF12 ..v..v..v±.v=.v..v..v·.vÞ...£..á 0000C0
 568BFC46 880032E9 037400F8 7E830089 E9EE4688 0006E903 75000030 EE468918 ..FŸ=..u.Õ...FŸÕ...~½.t.Õ2..F=.V 0000E0
 390008E9 03741246 39FE5688 FC468800 1CE90375 10563900 08E90374 0E4639FE ±9F.t.Õ..9V.u.Õ...F=.V±9F.t.Õ..9 000100
 FF00000D CD9A0228 681E00AE 68F476FF F676FF00 4EE90000 880006E9 03751456 V.u.Õ..¡..ÕN..v-.v¶hÙ..h(..ë.... 000120
 6A006A01 6E6800B0 68F476FF F676FF00 000C5F9A 0229681E 00AD68F4 76FFF676 v-.v¶hÙ..h)..¯....v-.v¶h¯.hn.j.j 000140
 CBC95F5E 1F0000E9 0C9A156A 9A008068 F076FFF2 76FF0000 0C8A9A00 6A006A00 .j.j........v·.vÞh¯..j...Õ...^_èù 000160
 000CC19A 5016F646 8D0A76FF 0C76FF00 00F446C7 D88E0CAC 881E5657 000066C8 àf..WV.¡¯..ÄÚF¶...v..v..F-.P.ẽ.. 000180
 8900000C DF9A5016 E6468DF6 76FF015B E9EA4688 0006E903 7500003D EA468900 ..Fõ=..u.Õ...FõÕ[..v-.F¦.P.Õ.... 0001A0
 00000000 9A5016FC 468DE676 FFE876FF 013DE9EA 46880006 E9037500 003DEA46 Fõ=..u.Õ...FõÕ=..vÕ.v¦.F=.P..... 0001C0
 0000219A 5016F046 8DE676FF E876FF01 1CE9EA46 880006E9 03750000 3DEA4689 .Fõ=..u.Õ...FõÕ...vÕ.v¦.FÞ.P.¦.. 0001E0

Dump of file SATURN:[PCCOMMON.DUMP.DLL]DAENTDF.TMP;1 on 18-APR-1990 10:40:49.05
File ID (561,28,0)   End of file block 116 / Allocated 116

Virtual block number 89 (00000059), 512 (0200) bytes

 FFFF9A50 16EE468D E676FFE8 76FF00F8 E9EA4688 0006E903 7500003D EA468900 ..Fõ=..u.Õ...FõÕ«..vÕ.v¦.FŸ.P... 000000
 FFFE76FF EE76FF0A 76FF0C76 FF000AE9 EA468800 06E90375 00003DEA 46890000 ...Fõ=..u.Õ...FõÕÕ..v..v..vŸ.v±. 000020
 46880006 E9037500 003DEA46 890000FF FF9A5016 F8468D50 16F4468D 1E6AFC76 v=j..F¶.P.F½.P......Fõ=..u.Õ...F 000040
 76C40CEC 5E68008D E90372EC 4639F446 88EC46FF 0003E900 00EC46C7 00A9E9EA õÕ^.úFš..Õ...Fš.F¶9Fšr.Õ..k^š.áv 000060
 5E680A76 FF0C76FF 006CE903 74025039 260075E9 03740039 2610568B 0E468BF8 ½.F..V.&9.t.Õu.&9P.t.Õl..v..v.k^ 000080
 06E90375 00003DEA 46890000 FFFF9A50 169A468D 30FF2602 70FF26F8 76C40CEC š.áv½&.p.&.0.F..P......Fõ=..u.Õ. 0000A0
 F076FFF2 76FF0000 0DB89A50 169A468D 00AE68F0 76FFF276 FF0046E9 EA468800 ..FÕÕF..v·.vÞhÙ..F..P.Ẽ....v·.vÞ 0000C0
 F6156A9A 008068E6 76FFE876 FF00000D E69A006A 006A006A 006A016E 6800B068 h¯.hn.j.j.j.j..¦....vÕ.vlh¯..j.- 0000E0
 76FFD88E 0E08881E 56570000 10C8CBC9 5F5E1F00 00E90000 88FF65E9 0009E900 .Õ..Õe.¡..Õ...^_èùà...WV.¡...Ä.v 000100
 FF00CEE9 F0468800 06E90375 00003DF0 46890000 0E1D9A50 16FA468D 0A76FF0C ..v..F*.P......FÞ=..u.Õ...FÞÕö.. 000120
 F476FF00 B0E9F046 880006E9 03750000 3DF04689 00000E38 9A5016F2 468DFA76 v*.F·.P.;....FÞ=..u.Õ...FÞÕ¯..v¶ 000140
 76FF008F E9F04688 0006E903 7500003D F0468900 000E5C9A 5016FC46 8DF276FF .v·.F=.P.\....FÞ=..u.Õ...FÞÕ...v 000160
 88006EE9 F0468800 06E90375 00003DF0 46890000 0E7D9A50 16F6468D F276FFF4 ¶.v·.F-.P.)....FÞ=..u.Õ...FÞÕn.. 000180
 03741246 39FE5688 FC468800 1CE90375 10563900 08E90374 0E4639FE 568BFC46 F=.V±9F.t.Õ..9V.u.Õ...F=.V±9F.t. 0001A0
 569A022A 681E0086 68F676FF F876FF00 3CE90000 880006E9 03751456 390008E9 Õ..9V.u.Õ..¡..Õ<..v½.v-hÑ..h*..V 0001C0
 FFF476FF 00000F6F 9A006A00 6A006A00 6A016E68 008868F6 76FFF876 FF00000F ....v½.v-h¡.hn.j.j.j.j..o....v¶. 0001E0

Dump of file SATURN:[PCCOMMON.DUMP.DLL]DAENTDF.TMP;1 on 18-APR-1990 10:40:49.05
File ID (561,28,0)   End of file block 116 / Allocated 116

Virtual block number 90 (0000005A), 512 (0200) bytes

 76FFD88E 0F9A881E 56570000 18C8CBC9 5F5E1F00 00E90000 08AB9A00 8868F276 v·h¡..¨...Õ...^_èùà...WV.¡...Ä.v 000000
 FF012CE9 EC468800 06E90375 00003DEC 46890000 0FAA9A50 16FA468D 0A76FF0C ..v..F*.P.¯....Fš=..u.Õ...FšÕ,.. 000020
 EA76FF01 0EE9EC46 880006E9 03750000 3DEC4689 00000FC8 9A5016E8 468DFA76 v*.FÕ.P.à....Fš=..u.Õ...FšÕ...vÕ 000040
 76FF00ED E9EC4688 0006E903 7500003D EC468900 000FE99A 5016FC46 8DE876FF .vÕ.F=.P.Õ....Fš=..u.Õ...FšÕÙ..v 000060
 FF00CCE9 EC468800 06E90375 00003DEC 46890000 100A9A50 16F2468D E876FFEA Õ.vÕ.F·.P......Fš=..u.Õ...FšÕë.. 000080
 E9037500 003DEC46 89000008 149A5016 F6468D12 6AFC76FF FE76FF0A 76FF0C76 v..v..v±.v=j..F-.P......Fš=..u.Õ 0000A0
 8B26EE5E C404EE46 830004E9 F05689EE 4689F856 8BF6468B 00A3E9EC 46880006 ...FšÕÈ..F-.V½.FŸ.VÞÕ...FŸ.á^Ÿ&. 0000C0
 74025739 260056E9 03740739 2610568B 0E468BEE 5EC4006A E9037502 470B2607 .&.G.u.Õj.á^Ÿ.F..V.&9.t.ÕV.&9W.t 0000E0
 681E0086 68F276FF F476FF00 0011E19A F676FFF8 76FF0A76 FF0C76FF 004DE903 .ÕM..v..v..v½.v-.Ä....v¶.v·hÑ..h 000100
 00001078 9A006A00 6A006A00 6A016E68 008868F2 76FFF476 FF000010 5F9A022B +.¯.....v¶.v·h¡.hn.j.j.j.j..x... 000120
 F676FFF8 76FF0A76 FF0C76FF FF83E900 1AE90000 10869A00 8868E876 FFEA76FF .vÕ.vÕh¡......Õ..Õ...v..v..v½.v- 000140
 FF0C76FF D88E109A 881E5657 000010C8 CBC95F5E 1F0000E9 00008800 0008729A .r...¡..Õ...^_èùà...WV.¡...Ä.v.. 000160
 FA76FF00 E7E9F046 880006E9 03750000 3DF04689 000010AA 9A5016FA 468D0A76 v..F*.P.¯....FÞ=..u.Õ...FÞÕó..v* 000180
 76FFF476 FF00C9E9 F0468800 06E90375 00003DF0 46890000 10C89A50 16F2468D .F·.P.à....FÞ=..u.Õ...FÞÕè..v¶.v 0001A0
 FFF476FF 00A8E9F0 46880006 E9037500 003DF046 89000010 E99A5016 FC468DF2 ·.F=.P.Õ....FÞ=..u.Õ...FÞÕ¯..v¶. 0001C0
 FC468800 87E9F046 880006E9 03750000 3DF04689 0000110A 9A5016F6 468DF276 v·.F-.P......FÞ=..u.Õ...FÞÕ...F= 0001E0
```

Dump of file SATURN:[PCCOMMON.DUMP.DLL]DAENTDF.TMP;1 on 18-APR-1990 10:40:49.05
File ID (561,28,0)   End of file block 116 / Allocated 116

Virtual block number 91 (0000005B), 512 (0200) bytes

```
08E90374 124639FE 568BFC46 88001CE9 03751056 390008E9 03740E46 39FE5688 .V±9F.t.Õ..9V.u.Õ...F=.V±9F.t.Õ. 000000
6A006A00 6A012568 00C168F6 76FFF876 FF0055E9 00008800 06E90375 14563900 .9V.u.Õ..|..ÕU..v½.v-hė.hX.j.j.j 000020
F676FFF8 76FF0000 11A39A02 2C681E00 C068F676 FFF876FF 000012EF 9A006A00 .j..ÿ....v½.v-hå..h,..È....v½.v- 000040
0011CA9A 00C368F2 76FFF476 FF000011 BC9A006A 006A006A 006A016E 6800C368 hû.hn.j.j.j.j..¥....v¶.v·hû..ò.. 000060
5016F646 800?76FF 0C76FFD8 8E11F888 1E565700 0018C8C8 C95F5E1F 0000E900 .Õ...^_èùà...WV.¡½..Ä.v..v..F-.P 000080
269A5016 E8468DF6 76FF0145 E9EC4688 0006E903 7500030D EC468900 0012089A ......F§=..u.Õ...F§ÕE..v-.FÒ.P.& 0000A0
9A5016FC 468DE876 FFEA76FF 0127E9EC 46880006 E9037500 0030EC46 89000012 ....F§=..u.Õ...F§Õ'..võ.vÒ.F=.P. 0000C0
5016EE46 8DE876FF EA76FF01 06E9EC46 880006E9 03750000 3DEC4689 00001247 G....F§=..u.Õ...F§Õ...võ.vÒ.FŸ.P 0000E0
FFFE76FF 0A76FF0C 76FF00E5 E9EC4688 0006E903 7500030D EC468900 0012689A .h....F§=..u.Õ...F§Õl..v..v..v±. 000100
8E?0BCE9 EC468800 06E90375 00003DEC 46890000 11339A50 16F8468D 136AFC76 v=j..F½.P.3....F§=..u.Õ...F§Õ¥.. 000120
83E90375 02470826 078826F2 5EC404F2 46830004 E9F45689 F24689FA 568BF846 F½.V*.F·.V¶Õ...F·.6^·&..&.G.u.Õ. 000140
76FF0C76 FF0066E9 03740257 3926006F E9037407 39261056 880E4688 F25EC400 .6^·.F..V.&9.t.Õo.&9W.t.Õf..v..v 000160
006A006A 006A006A 01256800 C168EE76 FFF076FF 00001471 9AF876FF FA76FF0A ..v*.v½.q....vÞ.vŸhė.hX.j.j.j.j. 000180
00C368EE 76FFF076 FF000012 D69A022D 681E00C0 68EE76FF F076FF00 00144C9A .L....vÞ.vŸhå..h-..ø....vÞ.vŸhû. 0001A0
1A?90000 12FD9A00 C368E876 FFEA76FF 000012C4 9A006A00 6A006A00 6A016E68 hn.j.j.j.j..6....võ.vÒhû..»...Õ. 0001C0
CB?95F5E 1F0000E9 00008800 0011919A F876FFFA 76FF0A75 FF0C76FF FF6AE900 .Õj..v..v..v*.v½.....|..Õ...^_èù 0001E0
```

Dump of file SATURN:[PCCOMMON.DUMP.DLL]DAENTDF.TMP;1 on 18-APR-1990 10:40:49.05
File ID (561,28,0)   End of file block 116 / Allocated 116

Virtual block number 92 (0000005C), 512 (0200) bytes

```
3DF04689 00001321 9A5016FA 468D0A76 FF0C76FF D88E1311 881E5657 000010C8 à...WV.|...Ä.v..v..F*.P.I....FÞ= 000000
00003DF0 46890000 133F9A50 16F2468D FA76FF00 CEE9F046 880006E9 03750000 ..u.Õ...FÞÕö..v*.F·.P.?....FÞ=.. 000020
0030F046 89000013 609A5016 FC468DF2 76FFF476 FF00B0E9 F0468800 06E90375 u.Õ...FÞÕ¯..v¶.v·.F=.P.'....FÞ=. 000040
3DF04689 00001381 9A5016F6 468DF276 FFF476FF 008FE9F0 46880006 E9037500 .u.Õ...FÞÕ...v¶.v·.F-.P......FÞ= 000060
03751056 390008E9 03740E46 39FE5688 FC468800 6EE9F046 880006E9 03750000 ..u.Õ...FÞÕn..F=.V±9F.t.Õ..9V.u. 000080
FF003CE9 00008800 06E90375 14563900 08E90374 124639FE 568BFC46 88001CE9 Õ...F=.V±9F.t.Õ..9V.u.Õ..|..Õ<.. 0000A0
6A006A01 6E680006 68F676FF F876FF00 0014339A 022E681E 000468F6 76FFF876 v½.v-hå..h...3....v½.v-hø.hn.j.j 0000C0
CBC95F5E 1F0000E9 0000145A 9A000668 F276FFF4 76FF0000 14219A00 6A006A00 .j.j..!....v¶.v·hø..Z...Õ...^_èù 0000E0
3DF04689 00001498 9A5016FA 468D0A76 FF0C76FF D88E1488 881E5657 000018C8 à...WV.|...Ä.v..v..F*.P......FÞ= 000100
00003DF0 46890000 14869A50 16E8468D FA76FF01 2CE9F046 880006E9 03750000 ..u.Õ...FÞÕ,..v*.FÒ.P.Ñ....FÞ=.. 000120
003DF046 89000014 D79A5016 FC468DE8 76FFEA76 FF010EE9 F0468800 06E90375 u.Õ...FÞÕ...võ.vÒ.F=.P.■....FÞ=. 000140
3DF04689 000014F8 9A5016F6 468DE876 FFEA76FF 00EDE9F0 46880006 E9037500 .u.Õ...FÞÕÚ..võ.vÒ.F-.P.½....FÞ= 000160
5016F246 8D196AFC 76FFFE76 FF0A76FF 0C76FF00 CCE9F046 880006E9 03750000 ..u.Õ...FÞÕë..v..v..v±.v=j..F·.P 000180
89EC4689 F4568BF2 468800A3 E9F04688 0006E903 7500030D F0468900 0013AA9A .^....FÞ=..u.Õ...FÞÕÈ..F·.V¶.F§. 0001A0
56880E46 88EC5EC4 006AE903 7502470B 26078826 EC5EC404 EC468300 04E9EE56 VŸÕ...F§.6^§&..&.G.u.Õj.6^§.F..V 0001C0
CF9AF276 FFF476FF 0A76FF0C 76FF004D E9037402 57392600 56E90374 07392610 .&9.t.ÕV.&9W.t.ÕM..v..v..v¶.v·.ü 0001E0
```

Dump of file SATURN:[PCCOMMON.DUMP.DLL]DAENTDF.TMP;1 on 18-APR-1990 10:40:49.05
File ID (561,28,0)   End of file block 116 / Allocated 116

Virtual block number 93 (0000005D), 512 (0200) bytes

```
6E680006 68F676FF F876FF00 0015409A 022F681E 000468F6 76FFF876 FF000016 ....v½.v-hå..h/..M....v½.v-hø.hn 000000
E9001AE9 00001574 9A000668 E876FFEA 76FF0000 15669A00 6A006A00 6A006A01 .j.j.j.j..f....võ.vÒhø..t...Õ..Õ 000020
0CC8CBC9 5F5E1F00 00E90000 88000014 089AF276 FFF476FF 0A76FF0C 76FFFF83 ...v..v..v¶.v·.....|..Õ...^_èùà. 000040
00003DF8 46890000 15989A50 16FA468D 0A76FF0C 76FFD88E 1588881E 56570000 ..WV.|...Ä.v..v..F*.P......F½=.. 000060
03750000 3DF84689 000015B6 9A5016F4 468DFA76 FF006CE9 F8468800 06E90375 u.Õ...F½Õl..v*.F¶.P.Ñ....F½=..u. 000080
7500030D F8468900 0015D79A 5016FC46 8DF476FF F676FF00 4EE9F846 880006E9 Õ...F½ÕN..v-.v¶.F=.P.■....F½=..u 0000A0
0006E903 75105639 0008E903 740E4639 FE568BFC 4688002D E9F84688 0006E903 .Õ...F½Õ-..F=.V±9F.t.Õ..9V.u.Õ.. 0000C0
00000CC8 CBC95F5E 1F0000E9 0F7F60B4 9A000E68 F476FFF6 76FF0011 E90000B8 ¡..Õ...v-.v¶hB..Ç'..Õ...^_èùà... 0000E0
03750000 3DF84689 000016F6 9A5016FA 468D0A76 FF0C76FF D88E16E6 881E5657 WV.¡Ì..Ä.v..v..F*.P.-....F½=..u. 000100
06E90375 00003DF8 46890000 17149A50 16F4468D FA76FF00 6CE9F846 880006E9 Õ...F½Õl..v*.F¶.P......F½=..u.Õ. 000120
E9037500 003DF846 89000017 359A5016 FC468DF4 76FFF676 FF004EE9 F8468800 ..F½ÕN..v-.v¶.F=.P.5....F½=..u.Õ 000140
00880006 E9037510 56390008 E903740E 4639FE56 8BFC4688 002DE9F8 46880006 ...F½Õ-..F=.V±9F.t.Õ..9V.u.Õ..¡. 000160
56570000 0CC8CBC9 5F5E1F00 00E91772 60849A00 E268F476 FFF676FF 0011E900 .Õ...v-.v¶hã..Ç'r.Õ...^_èùà...WV 000180
06E90375 00003DF8 46890000 17949A50 16FA468D 0A76FF0C 76FFD88E 1784881E .¡...Ä.v..v..F*.P......F½=..u.Õ. 0001A0
880006E9 03750000 3DF84689 000017B2 9A5016F4 468DFA76 FF006CE9 F8468800 ..F½Õl..v*.F¶.P.ÿ....F½=..u.Õ... 0001C0
0006E903 7500030D F8468900 0017D39A 5016FC46 8DF476FF F676FF00 4EE9F846 F½ÕN..v-.v¶.F=.P.Æ....F½=..u.Õ.. 0001E0
```

```
Dump of file SATURN:[PCCOMMON.DUMP.DLL]DAENTDF.TMP;1 on 18-APR-1990 10:40:49.05
File ID (561,28,0)   End of file block 116 / Allocated 116

Virtual block number 94 (0000005E), 512 (0200) bytes

 E9000088 0006E903 75105639 0008E903 740E4639 FE568BFC 4688002D E9F8468B .F½Õ-..F▪.V±9F.t.Õ..9V.u.Õ..|..Õ 000000
 B81E5657 00000CC8 CBC95F5E 1F0000E9 181060B4 9A00E068 F476FFF6 76FF0011 ...v-.v¶hÁ..Ç'..Õ...^_èùà...WV.| 000020
 8B0006E9 03750000 3DF84689 00001832 9A5016FA 468D0A76 FF0C76FF D88E1822 "..Ä.v..v..F'.P.2....F½=..u.Õ... 000040
 F8468800 06E90375 00003DF8 46890000 18509A50 16F4468D FA76FF00 A7E9F846 F½ÕI..v'.F¶.P.P....F½=..u.Õ...F½ 000060
 46880006 E9037500 003DF846 89000018 719A5016 FC468DF4 76FFF676 FF0089E9 Õ...v-.v¶.F▪.P.g....F½=..u.Õ...F 000080
 004CE900 00B80006 E9037510 56390008 E903740E 4639FE56 8BFC468B 0068E9F8 ½Õh..F▪.V±9F.t.Õ..9V.u.Õ..|..ÕL. 0000A0
 FFF676FF 19686376 9A00F468 F476FFF6 76FF195A 63769A00 F368F476 FFF676FF .v-.v¶hµ..vcZ..v-.v¶h¶..vch..v-. 0000C0
 F768F476 FFF676FF 19846376 9A00F668 F476FFF6 76FF1976 63769A00 F568F476 v¶h½..vcv..v-.v¶h-..vc...v-.v¶h½ 0000E0
 0C76FFD8 8E18C0B8 1E565700 000CC8CB C95F5E1F 0000E9F8 468B18AE 63769A00 ..vcÙ..F½Õ...^_èùà...WV.|å..Ä.v. 000100
 76FF006C E9F8468B 0006E903 75000030 F8468900 0018D09A 5016FA46 8D0A76FF .v..F'.P.Å....F½=..u.Õ...F½Õl..v 000120
 FFF676FF 004EE9F8 46880006 E9037500 003DF846 89000018 EE9A5016 F4468DFA '.F¶.P.Ÿ....F½=..u.Õ...F½ÕN..v-. 000140
 FC468800 2DE9F846 880006E9 03750000 3DF84689 0000190F 9A5016FC 468DF476 v¶.F▪.P......F½=..u.Õ...F½Õ-..F▪ 000160
 68F476FF F676FF00 11E90000 B80006E9 03751056 390008E9 03740E46 39FE568B .V±9F.t.Õ..9V.u.Õ..|..Õ...v-.v¶h 000180
 76FF0C76 FFD88E19 99B81E56 5700000C C8CBC95F 5E1F0000 E9194C66 E69A00FB «..ÌfL.Õ...^_èùà...WV.|...Ä.v..v 0001A0
 8DFA76FF 008BE9F8 46880006 E9037500 003DF846 89000019 A99A5016 FA468D0A ..F'.P.`....F½=..u.Õ...F½Õ...v'. 0001C0
 F476FFF6 76FF006D E9F8468B 0006E903 7500003D F8468900 0019C79A 5016F446 F¶.P.ú....F½=..u.Õ...F½Õm..v-.v¶ 0001E0
```

```
Dump of file SATURN:[PCCOMMON.DUMP.DLL]DAENTDF.TMP;1 on 18-APR-1990 10:40:49.05
File ID (561,28,0)   End of file block 116 / Allocated 116

Virtual block number 95 (0000005F), 512 (0200) bytes

 5688FC46 88004CE9 F8468800 06E90375 00003DF8 46890000 19E89A50 16FC468D .F▪.P.Ò....F½=..u.Õ...F½ÕL..F▪.V 000000
 00EA68F4 76FFF676 FF0030E9 0000B800 06E90375 10563900 08E90374 0E4639FE ±9F.t.Õ..9V.u.Õ..|..ÕO..v-.v¶hõ. 000020
 2568979A 00EC68F4 76FFF676 FF1ADF68 979A00EB 68F476FF F676FF1A D168979A ..kI..v-.v¶hŠ...kÕ..v-.v¶hš...kX 000040
 46800A76 FF0C76FF D88E1A37 B81E5657 00000CC8 CBC95F5E 1F0000E9 F84688 1A ..F½Õ...^_èùà...WV.|7..Ä.v..v..F 000060
 16F4468D FA76FF00 6CE9F846 880006E9 03750000 3DF84689 00001A47 9A5016FA '.P.G....F½=..u.Õ...F½Õl..v'.F¶. 000080
 FC468DF4 76FFF676 FF004EE9 F8468800 06E90375 00003DF8 46890000 1A659A50 P.e....F½=..u.Õ...F½ÕN..v-.v¶.F▪ 0000A0
 4639FE56 8BFC468B 002DE9F8 46880006 E9037500 003DF846 8900001A 869A5016 .P......F½=..u.Õ...F½Õ-..F▪.V±9F 0000C0
 6A609A00 E968F476 FFF676FF 0011E900 00B80006 E9037510 56390008 E903740E .t.Õ..9V.u.Õ..|..Õ...v-.v¶hÕ..'j 0000E0
 16FA468D 0A76FF0C 76FFD88E 1AF4B81E 56570000 10C8CBC9 5F5E1F00 00E91AC3 û.Õ...^_èùà...WV.|¶..Ä.v..v..F'. 000100
 9A5016F2 468DFA76 FF00CEE9 F0468800 06E90375 00003DF0 46890000 18049A50 P......Fþ=..u.Õ...FþÕö..v'.F·.P. 000120
 5016FC46 8DF276FF F476FF00 80E9F046 880006E9 03750000 3DF04689 00001B22 "....Fþ=..u.Õ...FþÕ¯..v¶.v·.F▪.P 000140
 16F6468D F276FFF4 76FF008F E9F0468B 0006E903 7500003D F0468900 001B439A .C....Fþ=..u.Õ...FþÕ...v¶.v·.F-. 000160
 0E4639FE 568BFC46 8B006EE9 F0468800 06E90375 00003DF0 46890000 15F89A50 P.½....Fþ=..u.Õ...FþÕn..F▪.\ 9F. 000180
 03751456 390008E9 03741246 39FE5688 FC468800 1CE90375 10563900 08E90374 t.Õ..9V.u.Õ...F▪.V±9F.t.Õ..9v. . 0001A0
 76FFF876 FF000016 919A0230 681E0084 68F676FF F876FF00 3CE90000 B80006E9 Õ..|..Õ<..v½.v-h...h0.......v½.v 0001C0
 FFFF9A00 8668F276 FFF476FF 000016AA 9A006A00 6A006A00 6A016E68 008668F6 -h..hn.j.j.j.j..´....v¶.v·h..... 0001E0
```

```
Dump of file SATURN:[PCCOMMON.DUMP.DLL]DAENTDF.TMP;1 on 18-APR-1990 10:40:49.05
File ID (561,28,0)   End of file block 116 / Allocated 116

Virtual block number 96 (00000060), 512 (0200) bytes

 16F2468D 0A76FF0C 76FFD88E 1892B81E 56570000 18C8CBC9 5F5E1F00 00E90000 ..Õ...^_èùà...WV.|...Ä.v..v..F·. 000000
 9A5016E8 468DF276 FF012CE9 EC468800 06E90375 00003DEC 46890000 18A29A50 P.Å....Fš=..u.Õ...FšÕ,..v·.FÒ.P. 000020
 5016FC46 8DE876FF EA76FF01 0EE9EC46 880006E9 03750000 3DEC4689 000018C0 å....Fš=..u.Õ...FšÕ...võ.vÒ.F▪.P 000040
 16EE468D E876FFEA 76FF00ED E9EC4688 0006E903 7500003D EC468900 0018E19A .Ä....Fš=..u.Õ...FšÕÚ..võ.vÒ.FŸ. 000060
 FE76FF0A 76FF0C76 FF00CCE9 EC468800 06E90375 00003DEC 46890000 1C029A50 P......Fš=..u.Õ...FšÕä..v..v..v± 000080
 00A3E9EC 46880006 E9037500 003DEC46 89000016 219A5016 F8468D16 6AFC76FF .v▪j..F½.P.I....Fš=..u.Õ...FšÕÈ. 0000A0
 E9037502 470B2607 8826F45E C404F446 830004E9 F65689F4 4689FA56 8BF8468B .F½.V'.F¶.V-Õ...F¶.â^¶£..£.G.u.Õ 0000C0
 FF0C76FF 004DE903 74025739 260056E9 03740739 2610568B 0E468BF4 5EC4006A j.â^¶.F..V.&9.t.ÕV.&9W.t.ÕM..v.. 0000E0
 FF00001C 579A0231 681E0084 68EE76FF F076FF00 0010D99A F876FFFA 76FF0A76 v..v'.v½.\....vþ.vŸh...h1..W.... 000100
 8668E876 FFEA76FF 00001C70 9A006A00 6A006A00 6A016E68 008668EE 76FFF076 vþ.vŸh..hn.j.j.j.j..p....võ.vÒh. 000120
 0000B800 00167F9A F876FFFA 76FF0A76 FF0C76FF FF83E900 1AE90000 1C7E9A00 ..-...Õ..Õ...v..v..v'.v½.....|.. 000140
 9A5016FA 468D0A76 FF0C76FF D88E1C92 B81E5657 000010C8 CBC95F5E 1F0000E9 Õ...^_èùà...WV.|...Ä.v..v..F'.P. 000160
 1CC09A50 16F2468D FA76FF00 CEE9F046 880006E9 03750000 3DF04689 00001CA2 Å....Fþ=..u.Õ...FþÕö..v'.F·.P.â. 000180
 E19A5016 FC468DF2 76FFF476 FF0080E9 F0468800 06E90375 00003DF0 46890000 ...Fþ=..u.Õ...FþÕ¯..v¶.v·.F▪.P.Ä 0001A0
 9A5016F6 468DF276 FFF476FF 008FE9F0 46880006 E9037500 003DF046 8900001C ....Fþ=..u.Õ...FþÕ...v¶.v·.F-.P. 0001C0
 03740E46 39FE5688 FC468800 6EE9F046 880006E9 03750000 3DF04689 00001D02 .....Fþ=..u.Õ...FþÕn..F▪.V±9F.t. 0001E0
```

```
Dump of file SATURN:[PCCOMMON.DUMP.DLL]DAENTDF.TMP;1 on 18-APR-1990 10:40:49.05
File ID (561,28,0)   End of file block 116 / Allocated 116

Virtual block number 97 (00000061), 512 (0200) bytes

 06E90375 14563900 08E90374 124639FE 568BFC46 88001CE9 03751056 390008E9 Õ..9V.u.Õ...F=.V±9F.t.Õ..9V.u.Õ. 000000
 68F676FF F876FF00 001D9B9A 0232681E 008E68F6 76FFF876 FF003CE9 0000B800 .¡..Õ<..v½.v-h...h2.......v½.v-h 000020
 0000FFFF 9A009068 F276FFF4 76FF0000 1DB49A00 6A006A00 6A006A01 6E680090 ..hn.j.j.j.j..Ç....v¶.v·h....... 000040
 9A5016F2 468D0A76 FF0C76FF D88E1DF0 B81E5657 000018C8 CBC95F5E 1F0000E9 Õ...^_èùà...WV.¡Þ..Ä.v..v..F·.P. 000060
 1E1E9A50 16E8468D F276FF01 2CE9EC46 880006E9 03750000 3DEC4689 00001E00 .....F$=..u.Õ...F$Õ,..v·.FÒ.P... 000080
 3F9A5016 FC468DE8 76FFEA76 FF010EE9 EC468800 06E90375 00003DEC 46890000 ...F$=..u.Õ...F$Õ...võ.vÒ.F=.P.? 0000A0
 9A5016EE 468DE876 FFEA76FF 00EDE9EC 46880006 E9037500 003DEC46 8900001E ....F$=..u.Õ...F$ÕÙ..võ.vÒ.FŸ.P. 0000C0
 76FFFE76 FF0A76FF 0C76FF00 CCE9EC46 880006E9 03750000 3DEC4689 00001E60 `....F$=..u.Õ...F$Õä..v..v..v±.v 0000E0
 468800A3 E9EC4688 0006E903 7500003D EC468900 001D289A 5016F846 8D186AFC =j..F½.P.+....F$=..u.Õ...F$ÕÈ..F 000100
 006AE903 7502470B 26078826 F45EC404 F4468300 04E9F656 89F44689 FA5688F8 ½.V°.F¶.V-Õ...F¶.ó^¶&..&.G.u.Õj. 000120
 0A76FF0C 76FF004D E9037402 57392600 56E90374 07392610 56880E46 88F45EC4 ó^¶.F..V.&9.t.ÕV.&9W.t.ÕM..v..v. 000140
 F076FF00 001E859A 0233681E 008E68EE 76FFF076 FF000020 379AF876 FFFA76FF .v°.v½.7 ...vÞ.vŸh...h3..ç....vÞ 000160
 9A009068 E876FFEA 76FF0000 1ECE9A00 6A006A00 6A006A01 6E680090 68EE76FF .vŸh..hn.j.j.j.j..ö....võ.vÒh... 000180
 00E90000 B800001D 899AF876 FFFA76FF 0A76FF0C 76FFFF83 E9001AE9 00001EDC É...Õ..Õ...v..v..v°.v½.....¡..Õ. 0001A0
 0E9E9A50 16FE468D 0676FF08 76FFD88E 1EF0881E 56570000 08C8CBC9 5F5E1F00 ..^_èùà...WV.¡Þ..Ä.v..v..F±.P... 0001C0
 FF9A5016 FA468D06 76FF0876 FF0591E9 F8468800 06E90375 00003DF8 46890000 ...F½=..u.Õ...F½Õ...v..v..F°.P.. 0001E0

Dump of file SATURN:[PCCOMMON.DUMP.DLL]DAENTDF.TMP;1 on 18-APR-1990 10:40:49.05
File ID (561,28,0)   End of file block 116 / Allocated 116

Virtual block number 98 (00000062), 512 (0200) bytes

 0A468BFA 76FFFC76 FFFE76FF 0570E9F8 46880006 E9037500 003DF846 890000FF ....F½=..u.Õ...F½Õp..v±.v=.v°.F. 000000
 5EC40546 E9F84688 0006E903 7500003D F8468900 00FFFF9A 50520002 050C568B .V....RP......F½=..u.Õ...F½ÕF.ó^ 000020
 03750000 3DF84689 000020FF 9AFFFF68 20F9682F 6A016A02 77FF2604 77FF260A .&.w.&.w.j.j/h° h.... ...F½=..u. 000040
 AB9AFFFF 68212268 026A026A 0277FF26 0477FF26 0A5EC405 1BE9F846 880006E9 Õ...F½Õ..ó^.&.w.&.w.j.j.h"!h...¨ 000060
 6A0277FF 260477FF 260A5EC4 04F0E9F8 46880006 E9037500 003DF846 89000021 !...F½=..u.Õ...F½ÕÞ.ó^.&.w.&.w.j 000080
 0A5EC404 C7E9F846 880006E9 03750000 3DF84689 0000FFFF 9AFFFF68 21496802 .hI!h........F½=..u.Õ...F½Õú.ó^. 0000A0
 46880006 E9037500 003DF846 890000FF FF9AFFFF 68217468 0277FF26 0477FF26 &.w.&.w.ht!h........F½=..u.Õ...F 0000C0
 9AFFFF68 21A56821 7D68217A 68116A02 6A0277FF 260477FF 260A5EC4 04A0E9F8 ½Õ..ó^.&.w.&.w.j.j.hz!h)!hE!h... 0000E0
 0277FF26 0477FF26 0A5EC404 6FE9F846 880006E9 03750000 3DF84689 0000210C É!...F½=..u.Õ...F½Õo.ó^.&.w.&.w. 000100
 0444E9F8 46880006 E9037500 003DF846 89000022 079AFFFF 68210068 026A0A6A j.j.hÀ!h...."...F½=..u.Õ...F½Õ0. 000120
 00002238 9AFFFF68 22016821 D9682106 680F6A02 6A0277FF 260477FF 260A5EC4 ó^.&.w.&.w.j.j.h=!h!!h."h...8".. 000140
 026A026A 0277FF26 0477FF26 0A5EC404 13E9F846 880006E9 03750000 3DF84689 .F½=..u.Õ...F½Õ..ó^.&.w.&.w.j.j. 000160
 260A5EC4 03E8E9F8 46880006 E9037500 003DF846 89000022 639AFFFF 68222C68 h,"h...c"...F½=..u.Õ...F½ÕÒ.ó^.& 000180
 3DF84689 00002294 9AFFFF68 225D6822 35682232 68146A02 6A0277FF 260477FF .w.&.w.j.j.h2"h5"h]"h...."...F½= 0001A0
 68228868 026A026A 0277FF26 0477FF26 0A5EC403 B7E9F846 880006E9 03750000 ..u.Õ...F½Õñ.ó^.&.w.&.w.j.j.h."h 0001C0
 260477FF 260A5EC4 038CE9F8 46880006 E9037500 003DF846 89000022 F09AFFFF ...Þ"...F½=..u.Õ...F½Õ..ó^.&.w.& 0001E0

Dump of file SATURN:[PCCOMMON.DUMP.DLL]DAENTDF.TMP;1 on 18-APR-1990 10:40:49.05
File ID (561,28,0)   End of file block 116 / Allocated 116

Virtual block number 99 (00000063), 512 (0200) bytes

 03750000 3DF84689 000022C5 9AFFFF68 22B96822 9168228E 68156A02 6A0277FF .w.j.j.h."h."h¿"h...é"...F½=..u. 000000
 EA6822C2 68228F68 156A036A 0277FF26 0477FF26 0A5EC403 5BE9F846 880006E9 Õ...F½Õ[.ó^.&.w.&.w.j.j.h¢"hô"hõ 000020
 77FF260A 5EC4032A E9F84688 0006E903 7500003D F8468900 0023219A FFFF6822 "h...!#...F½=..u.Õ...F½Õ*.ó^.&.w 000040
 880006E9 03750000 3DF84689 0000234C 9AFFFF68 23156802 6A056A02 77FF2604 .&.w.j.j.h.#h...L#...F½=..u.Õ... 000060
 FFFF6823 4668231E 68231B68 126A026A 0277FF26 0477FF26 0A5EC402 FFE9F846 F½Õ..ó^.&.w.&.w.j.j.h.#h.#hF#h.. 000080
 77FF2604 77FF260A 5EC402CE E9F84688 0006E903 7500003D F8468900 00237D9A .}#...F½=..u.Õ...F½Õö.ó^.&.w.&.w 0000A0
 A3E9F846 880006E9 03750000 3DF84689 000023A8 9AFFFF68 23716802 6A036A02 .j.j.hq#h...´#...F½=..u.Õ...F½ÕÈ 0000C0
 0023D99A FFFF6823 A268237A 68237768 136A026A 0277FF26 0477FF26 0A5EC402 .ó^.&.w.&.w.j.j.hw#hz#hÂ#h...\#. 0000E0
 6A096A02 77FF2604 77FF260A 5EC40272 E9F84688 0006E903 7500003D F8468900 ..F½=..u.Õ...F½Õr.ó^.&.w.&.w.j.j 000100
 0A5EC402 47E9F846 880006E9 03750000 3DF84689 0000FFFF 9AFFFF68 23C06802 .hë#h........F½=..u.Õ...F½ÕG.ó^. 000120
 F8468900 00FFFF9A FFFF6823 FE6823D6 68230368 196A026A 0277FF26 0477FF26 &.w.&.w.j.j.hÆ#hø#h±#h........F½ 000140
 005C6802 6A166A02 77FF2604 77FF260A 5EC40216 E9F84688 0006E903 7500003D =..u.Õ...F½Õ..ó^.&.w.&.w.j.j.h\. 000160
 0477FF26 0A5EC401 EBE9F846 880006E9 03750000 3DF84689 0000242F 9AFFFF68 h.../$...F½=..u.Õ...F½ÕŠ.ó^.&.w. 000180
 46880006 E9037500 003DF846 89000024 5A9AFFFF 68245468 036A026A 0277FF26 &.w.j.j.hT$h...Z$...F½=..u.Õ...F 0001A0
 46890000 24859AFF FF68247F 68046A02 6A0277FF 260477FF 260A5EC4 01C0E9F8 ½Õà.ó^.&.w.&.w.j.j.h.$h....$...F 0001C0
 AA68056A 026A0277 FF260477 FF260A5E C40195E9 F8468800 06E90375 00003DF8 ½=..u.Õ...F½Õ..ó^.&.w.&.w.j.j.h^ 0001E0
```

```
Dump of file SATURN:[PCCOMMON.DUMP.DLL]DAENTDF.TMP;1 on 18-APR-1990 10:40:49.05
File ID (561,28,0)   End of file block 116 / Allocated 116

Virtual block number 100 (00000064), 512 (0200) bytes

 77FF260A 5EC4016A E9F8468B 0006E903 7500003D F8468900 0024809A FFFF6824 $h...¯$...F½=..u.Õ...F½Õj.á^.&.w 000000
 8B0006E9 03750000 3DF84689 00002004 9AFFFF68 20CE6808 6A026A02 77FF2604 .&.w.j.j.hö h...å ...F½=..u.Õ... 000020
 89000025 069AFFFF 68250068 096A026A 0277FF26 0477FF26 0A5EC401 3FE9F846 F½Õ?.á^.&.w.&.w.j.j.h.%h....%... 000040
 68066A02 6A0277FF 260477FF 260A5EC4 0114E9F8 468B0006 E9037500 003DF846 F½=..u.Õ...F½Õ..á^.&.w.&.w.j.j.h 000060
 FF260A5E C400E9E9 F8468B00 06E90375 00003DF8 46890000 25319AFF FF68252B +%h...1%...F½=..u.Õ...F½ÕÕ.á^.&. 000080
 0006E903 7500003D F8468900 0025809A FFFF6825 5668076A 026A0277 FF260477 w.&.w.j.j.hV%h....%...F½=..u.Õ.. 0000A0
 FF682587 68255F68 255C6816 6A026A02 77FF2604 77FF260A 5EC400BE E9F8468B .F½Õƒ.á^.&.w.&.w.j.j.h\%h_%h.%h. 0000C0
 FF260477 FF260A5E C4008DE9 F8468B00 06E90375 00003DF8 46890000 25BE9AFF ..ƒ%...F½=..u.Õ...F½Õ..á^¯&.w.&. 0000E0
 E9F8468B 0006E903 7500003D F8468900 0025E99A FFFF6825 B268026A 006A0277 w.j.j.hý%h...Õ%...F½=..u.Õ...F½Õ 000100
 21809AFF FF6825E3 68258B68 25B86818 6A026A02 77FF2604 77FF260A 5EC40062 b.á^.&.w.&.w.j.j.h¡%hE%hÐ%h....! 000120
 156A0277 FF260477 FF260A5E C40031E9 F8468B00 06E90375 00003DF8 46890000 ...F½=..u.Õ...F½Õ1.á^.&.w.&.w.j. 000140
 468B0006 E9F8468B 0006E903 7500003D F8468900 0024049A FFFF6824 2968026A j.h)$h....$...F½=..u.Õ...F½Õ...F 000160
 22ED0005 14800004 23D00005 15800004 24010005 004090CB C95F5E1F 0000E9F8 ½Õ...^_èù.ə....$......Å#......Ü" 000180
 1DC20203 00810004 20FC0005 04510006 1FE70203 00000004 20D10005 0E000004 ......T ......Ó...Q...• ......ô. 0001A0
 214F0203 06470008 16B80203 007F0001 20120103 00000001 1B800002 05C30008 ..û........... ......¡...G...O! 0001C0
 25590005 1C8A0004 258A0005 054A0008 012E0203 13090004 23A50005 072F000B ../...È#..........J....%......Y% 0001E0

Dump of file SATURN:[PCCOMMON.DUMP.DLL]DAENTDF.TMP;1 on 18-APR-1990 10:40:49.05
File ID (561,28,0)   End of file block 116 / Allocated 116

Virtual block number 101 (00000065), 512 (0200) bytes

 0F320203 19910004 24D80005 00000004 24D50002 00860001 1FF90103 188A0004 ......*.......1$......Ä$......2. 000000
 24820005 039A0004 21A80005 0F920004 23180005 10920004 23490005 02720004 ..r...1#.......#......'1.......$ 000020
 1F000203 00000007 204E0002 01030003 09B70203 00080002 09D40203 181A0004 ......å.......ñ.......N ........ 000040
 22040005 00190002 0A180203 0CA40004 228C0005 029D0004 21770005 03ED0006 ..Ú...w1.......¥"..Ê............" 000060
 24AD0005 1A2F0004 252E0005 0755000B 25620203 05EC0008 20200203 05A90004 ..`...  ..£...b%..U....%../...Ù$ 000080
 20A90203 00A70003 205E0203 06750009 01C80203 013A0004 21250005 18B80004 ..|...%1..:...à...u...^ ..Ï...` 0000A0
 1F1E0203 0AD00004 22B80005 058E0008 02910203 00B60003 1F3F0203 06F3000B ..µ...?...Ñ............"..Å..... 0000C0
 01100203 033B0004 0ECF0203 059A0008 04CF0203 01D70004 214C0005 068C0009 ......L!..■...Ü.......ü...;..... 0000E0
 21280203 16DE0004 242C0005 00C60003 207F0203 042E0006 1F890203 05100008 .............. ..ó...,$..ß...(! 000100
 1F600203 043A0006 087B0203 1DE80004 25B50005 1EE80004 25E60005 070A000B ......Ì%..Ò...ç%..Ò...(...:...'. 000120
 23740005 034F0004 0A050203 1AEC0004 25030005 062B0008 065E0203 00D20003 ..#...^...+....%..£.......O...t# 000140
 24D80203 04F50004 21D30005 06730004 222F0005 07730004 22600005 11F00004 ..Þ...\"..s.../"..s...Æ!..%...Ù$ 000160
 01CB0001 881F0196 3E89D88E FFFF881E 00000000 177C0004 24570005 071E000B ......W$..|.......|...Ä.>...|..ù. 000180
 FFFFB9C0 33067EC4 1EDE88D7 88EC8855 00000000 00000000 00000800 02000200 ................U.š.■.ß.á~.3â¿.. 0001A0
 01C6F706 4688FE87 08468E08 8EC08CF9 28D1F7AE F2FFFFB9 0A7EC4FF 758DAEF2 ·Û.u.á~.¿..·Ü%ì+!.â.Ä.F..±.F.¼ó. 0001C0
 76C51EDE 88D788EC 8855CB5D C28C1FFA 88F388A4 F3C913A5 F3E90149 A4027400 .t.Êl¡ÕµÊ.èµÊ.µ.!..õ]ùU.š.■.ß.év 0001E0

Dump of file SATURN:[PCCOMMON.DUMP.DLL]DAENTDF.TMP;1 on 18-APR-1990 10:40:49.05
File ID (561,28,0)   End of file block 116 / Allocated 116

Virtual block number 102 (00000066), 512 (0200) bytes

 13A5F3E9 D149A402 7401A8C7 88067EC4 D1F7AEF2 FFFFB9C0 33C08ED8 8CFE8B0A ..±.Ä.â3â¿..·Ü%ì6~..ú´.t.Êl¡ÕµE. 000000
 F2FFFFB9 C0330A7E C40676C5 1EDE88D7 88EC8855 CB5DC28C 1FFA88F3 88A4F3C9 èµÊ.µ.!..õ]ùU.š.■.ß.év.á~.3â¿..· 000020
 C033067E C4D788EC 885500CB 5DFA88F3 881FFFFF 1DC01B05 74A6F3F9 28D1F7AE Ü%ì+!µ!t..å.....µ.!]ù.U.š.■á~.3â 000040
 DB3399C0 330676C5 1E5657EC 88550000 01E900CB 5DFA8891 49D1F7AE F2FFFFB9 ¿..·Ü%ì!..!]ù.Õ...U.šWV.év.3â.3Ü 000060
 88D2D1E3 D1187230 2C1F7739 3CAC0175 2B3C0474 203C50F7 74093CFB 74203CAC ¯< t«<.t%P<-t.<+u.¯<9w.,0r.!D1■. 000080
 D283D8F7 0775932D 3C58DCEB 00028308 03071309 03D2D1E3 D1D2D1E3 D1FA8BCB ù.!!D1■!D1■.l.■.Ä.■.ŠEX<-.u.¥Ä.■ 0000A0
 00000000 00000000 0069004B 00000000 00000000 00000000 CB5D5F5E 1FDAF700 .¥Õ.^_]ù............K.i......... 0000C0
 00000000 00000000 00000076 00740073 00720070 004B0000 00000000 00000000 ..........K.p.r.s.t.v........... 0000E0
 00000000 00000000 00AA00A9 00A800A7 00A5004B 0000005A 0002000F 00140002 ........Z...K.¥.Ï.´.`.¨......... 000100
 00000000 00000000 00000000 00CD0000 004B0000 FFFF0002 000F0014 00020000 ...............K...ë............ 000120
 00000000 00000000 00BB00BA 00B900B8 0086004B 00000000 00000000 00000000 ............K.Ñ.|.¿.¤.£......... 000140
 00000000 000000C6 00C500C4 00C300C0 004B008E 4BE80002 00100012 00030000 ..........ÒKƒ.K.ä.Ü.á.é.ó....... 000160
 00000000 00090008 00070006 0004004B 00E05687 00020006 00130009 00000000 ...........ñVÄ.K.å.ø.■.Ä.).....  000180
 00000089 00880087 00860084 0008FFFF 5EE20002 00030019 00020000 00000000 ..............ã^................ 0001A0
 6E450000 00000000 00000000 00930092 00910090 008E004B 00000000 00000000 ........K......................En 0001C0
 0000002C 4B46002C 4B46002C 4B43002C 4B50002C 4B500065 66446573 6F6C4374 tCloseDfe.PK,.PK,.CK,.FK,.FK,... 0001E0
```

```
Dump of file SATURN:[PCCOMMON.DUMP.DLL]DAENTDF.TMP;1 on 18-APR-1990 10:40:49.05
File ID (561,28,0)   End of file block 116 / Allocated 116

Virtual block number 103 (00000067), 512 (0200) bytes

65746164 7055746E 45002E00 2C49002E 00002C49 2000002C 4920002C 49200000 .. I,. I,.. I,....I,...EntUpdate 000000
684F657A 696C616D 726F4E65 74616470 55746E45 00684F65 7A696C61 6D726F4E NormalizeOk.EntUpdateNormalizeOk 000020
61647055 746E4500 656D6954 65746152 6874776F 72476574 61647055 746E4500 .EntUpdateGrowthRateTime.EntUpda 000040
6E450070 61727453 746F6F42 746E4500 656D6954 65746152 6874776F 72476574 teGrowthRateTime.EntBootStrap.En 000060
616C6552 20657461 65724320 3A726F72 72450000 00007061 72745374 6F6F4274 tBootStrap....Error: Create Rela 000080
6E652064 6E6F6365 73206120 65736F6F 6843006F 666E4920 70696873 6E6F6974 tionship Info.Choose a second en 0000A0
6D616E20 74657370 20646E6F 63657320 61207265 746E6520 646E6120 79746974 tity and enter a second pset nam 0000C0
00000000 00000000 00000000 0000006C 65636E61 43207373 65727020 726F2065 e or press Cancel............... 0000E0
00380203 00000008 02380002 00000001 009C0002 00030236 0234FFFF 00000000 ......4.6.............8.......8. 000100
69206570 79746275 73206464 41200352 00000000 00000000 00000000 06190008 ................R. Add subtype i 000120
74756269 72747461 20646441 22006D72 6F662067 6E6F6C20 79746974 6E65206E n entity long form."Add attribut 000140
61206563 616C7065 52260060 726F6620 676E6F6C 20797469 746E6520 6E692065 e in entity long form.&Replace a 000160
65522500 6D726F66 20676E6F 6C207974 69746E65 206E6920 65747562 69727474 ttribute in entity long form.%Re 000180
6F662067 6E6F6C20 79746974 6E65206E 69206574 75626972 74746120 65766F6D move attribute in entity long fo 0001A0
6470551E 00726564 726F2072 6F662065 756C6176 206C6167 656C6C49 18006D72 rm..Illegal value for order..Upd 0001C0
61647055 21002E6C 6576656C 206D726F 66206C61 6D726F6E 20656874 20657461 ate the normal form level..!Upda 0001E0

Dump of file SATURN:[PCCOMMON.DUMP.DLL]DAENTDF.TMP;1 on 18-APR-1990 10:40:49.05
File ID (561,28,0)   End of file block 116 / Allocated 116

Virtual block number 104 (00000068), 512 (0200) bytes

70552000 74696E75 20656D69 74206574 61722068 74776F72 67206568 74206574 te the growth rate time unit. Up 000000
00010064 6C656946 20796568 4F20657A 696C616D 726F6E20 65687420 65746164 date the normalize Okey Field... 000020
636F2072 6F727265 206E412A 00010352 00000001 00010001 00010001 00010001 ................R...*An error oc 000040
2A006174 6164204D 46442067 6E697972 65757120 656C6968 77206465 72727563 curred while querying DFM data.* 000060
676E6979 72657571 20656C69 68772064 65727275 63636F20 726F7272 65206E41 An error occurred while querying 000080
6E692073 72616863 206C6167 656C6C69 2065606F 53260061 74616420 4C4D4420 DML data.&Some illegal chars in 0000A0
74726174 73206F74 20726F72 72452300 7972746E 65207265 64726F20 65687420 the order entry.#Error to start 0000C0
7563636F 20726F72 72453000 6E6F6974 6361736E 61727420 4C4D4420 646E652F /end DML transaction.0Error occu 0000E0
20657475 62697274 74612077 656E2067 6E696464 6120656C 69687720 64657272 rred while adding new attribute 000100
69786966 20656C69 68772064 65727275 63636F20 726F7272 45280042 44206F74 to DB.(Error occurred while fixi 000120
77206465 72727563 636F2072 6F727245 2D007265 64726F20 73727474 6120676E ng attrs order.-Error occurred w 000140
61433200 4D464420 6F74206D 65746920 7473656E 20676E69 64646120 656C6968 hile adding nest item to DFM.2Ca 000160
20606F72 6620656C 646E6168 20746365 6A626F20 65687420 646E6966 2074276E n't find the object handle from 000180
61206E61 2065766F 6D207427 6E614332 00656D61 6E207463 656A626F 20656874 the object name.2Can't move an a 0001A0
65747562 69727474 61206275 73207374 69207265 646E7520 65747562 69727474 ttribute under its sub-attribute 0001C0
65687420 666F2065 6D616E20 65687420 65676E61 68632074 276E6143 27002E73 s..'Can't change the name of the 0001E0

Dump of file SATURN:[PCCOMMON.DUMP.DLL]DAENTDF.TMP;1 on 18-APR-1990 10:40:49.05
File ID (561,28,0)   End of file block 116 / Allocated 116

Virtual block number 105 (00000069), 512 (0200) bytes

656C6968 77206465 72727563 636F2072 6F727245 2E002E6C 65646F6D 20404920  IM model...Error occurred while 000000
726F7272 4535002E 73656D75 6C6F7620 79746974 6E652067 6E697461 64707520  updating entity volumes..5Error 000020
20797469 746E6520 676E6974 61647075 20656C69 68772064 65727275 63636F20  occurred while updating entity 000040
20646572 72756363 6F20726F 72724534 006C6576 656C2065 7A696C61 6D726F6E normalize level.4Error occurred 000060
20657A69 6C616D72 6F6E2079 7469746E 6520676E 69746164 70752065 6C696877 while updating entity normalize 000080
74616470 7520656C 69687720 64657272 7563636F 20726F72 72453700 67616C66 flag.7Error occurred while updat 0000A0
72453100 65676174 6E656372 65702068 74776F72 67207974 69746E65 20676E69 ing entity growth percentage.1Er 0000C0
69746E65 20676E69 74616470 7520656C 69687720 64657272 7563636F 20726F72 ror occurred while updating enti 0000E0
6E206568 74206563 616C7065 52300352 00006574 61722068 74776F72 67207974 ty growth rate..R.0Replace the n 000100
726F6620 79746974 6E652065 6874206E 69207965 68206568 7420666F 20656D61 ame of the key in the entity for 000120
68206E6F 69746172 65706F20 79656B20 676E6974 61657263 20656854 2F002E6D m../The creating key operation h 000140
676E6974 61657263 20656854 30002E64 656C6C65 636E6163 206E6565 62207361 as been cancelled..0The creating 000160
6C6C6563 6E616320 6E656562 20736168 206E6F69 74617265 706F2074 65737020  pset operation has been cancell 000180
676E6964 64612065 6C696877 20646572 72756363 6F20726F 7272452E 002E6465 ed...Error occurred while adding 0001A0
72727563 636F2072 6F727245 2F007974 69746E65 20656874 206F7420 79656B20  key to the entity./Error occurr 0001C0
69746E65 20656874 206F7420 74657370 20676E69 64646120 656C6968 77206465 ed while adding pset to the enti 0001E0
```

```
Dump of file SATURN:[PCCOMMON.DUMP.DLL]DAENTDF.TMP;1 on 18-APR-1990 10:40:49.05
File ID (561,28,0)   End of file block 116 / Allocated 116

Virtual block number 106 (0000006A), 512 (0200) bytes

 00000000 00000000 01000100 01000100 01000100 01000100 01000100 01007974 ty.............................. 000000
 00951400 00900C7A 00000001 00000069 00000000 FFFF0001 000E0352 00000F7A z...R...........i.......z....... 000020
 04740005 80020002 0C7F0006 00030000 00000000 0C7BFFFF 00640485 00FAFD7D )»*...d...(....................t. 000040
 003C0464 00058001 00010C86 000C0005 00000000 0000FFFF FFFF0065 00080028 (...e......................d.<. 000060
 000800EC 04580007 8002000C 0C930000 00060000 00000000 FFFFFFFF 00660008 ..f.......................X.š... 000080
 00680008 00640446 00058001 00010C94 00130005 00000000 0000FFFF FFFF0067 g.......................F.d...h. 0000A0
 FFFF0069 000800EC 04380007 8002000C 0CA80000 00060000 00000000 FFFFFFFF ..............´.......;.š...i... 0000C0
 FFFFFFFF 006A0008 0034042A 00058001 00010CA9 000C0005 00000000 0000FFFF ............`.......*.4...j..... 0000E0
 0000FFFF FFFF006F 00080020 03EC0005 80010001 0CB60008 00050000 00000000 ..........Ñ.......š.-...o....... 000100
 00000000 FFFFFFFF 00700008 00C103E0 00078002 000C0CBF 00000006 00000000 ........e.......Å.ë...p......... 000120
 00000000 0000FFFF FFFF0072 003000C5 03A20005 80000000 0CC00000 00070000 ......å.......Å.é.0.r........... 000140
 00030000 00000000 FFFFFFFF 0073000C 002603C5 00CF8002 04000CC1 00030003 ....è.....ü.é.&...s............. 000160
 00060003 00000000 0000FFFF FFFF0074 000C0026 03B400CF 80020000 0CC50007 ..é.....ü.Ç.&...t............... 000180
 0CD40008 00050000 00000000 FFFFFFFF 0076000C 002603A2 00CF8002 00000CCD ë.....ü.Å.&...v...............å. 0001A0
 000C0CE0 00000006 00000000 0000FFFF FFFF00A2 00080038 03920005 80010001 ........8...Å...............Å... 0001C0
 80010001 0CE10008 00050000 00000000 FFFFFFFF 00A30008 00C10386 00078002 ......è...È...............Ä..... 0001E0

Dump of file SATURN:[PCCOMMON.DUMP.DLL]DAENTDF.TMP;1 on 18-APR-1990 10:40:49.05
File ID (561,28,0)   End of file block 116 / Allocated 116

Virtual block number 107 (0000006B), 512 (0200) bytes

 00078002 000C0CEA 00000006 00000000 0000FFFF FFFF00A4 00080036 03740005 ..t.6...Ê...............õ....... 000000
 032A0005 80000000 0CE80000 00070000 00000000 FFFFFFFF 00A50008 00C10368 h.è...È...............Š.......*. 000020
 0026034E 00CF8002 04000CEC 00030003 00000000 0000FFFF FFFF00A7 003000C5 é.0.Ï...............š.....ü.N.&. 000040
 000C0026 033C00CF 80020000 0CF00007 00030000 00000000 FFFFFFFF 00A8000C ..´...............Þ.....ü.<.&... 000060
 00AA000C 0026032A 00CF8002 00000CF8 00060003 00000000 0000FFFF FFFF00A9 `...............¥.....ü.*.&...`. 000080
 FFFF00AC 00080068 03190005 80010001 0CFF0018 00050000 00000000 FFFFFFFF ........................h...¯... 0000A0
 FFFFFFFF 00AD0008 001E0300 00078002 000C0D18 00000006 00000000 0000FFFF ..........................Ù..... 0000C0
 0000FFFF FFFF00AE 0008009D 0300002B 8002000C 00190000 00060000 00000000 ................+.......Ù....... 0000E0
 00000000 FFFFFFFF 00B00030 00C502CF 00058000 0000001A 00000007 00000000 ................ü.é.0.¯......... 000100
 00000000 0000FFFF FFFF00B1 000C0026 030B00CF 80020400 00180003 00030000 ...............ü...&...Ý........ 000120
 00030000 00000000 FFFFFFFF 00B2000C 002602F7 00CF8002 0000001F 00070003 ............ü.¥.&...ý........... 000140
 00100005 00000000 0000FFFF FFFF00B3 000C0026 02E300CF 80020000 00270006 ..'.....ü.D.&...*............... 000160
 003F0000 00060000 00000000 FFFFFFFF 00850008 006002BF 00058001 0001002E ........¢.`...ç................?. 000180
 00000040 00000007 00000000 0000FFFF FFFF0086 000800C1 02830007 8002000C ......*.è...Ñ................ə... 0001A0
 80020400 00410006 00030000 00000000 FFFFFFFF 00B80030 00C50275 00058000 ....u.é.0.|...............A..... 0001C0
 00CF8002 00000048 00070003 00000000 0000FFFF FFFF0089 000C0026 029900CF ü...&...¿...............H.....ü. 0001E0

Dump of file SATURN:[PCCOMMON.DUMP.DLL]DAENTDF.TMP;1 on 18-APR-1990 10:40:49.05
File ID (561,28,0)   End of file block 116 / Allocated 116

Virtual block number 108 (0000006C), 512 (0200) bytes

 027500CF 80020000 00500006 00030000 00000000 FFFFFFFF 00BA000C 00260287 ..&...¤...............P.....ü.u. 000000
 00140265 00058001 00010057 00040005 00000000 0000FFFF FFFF00BB 000C0026 &...£...............W.......e... 000020
 000800BB 02590007 8002000C 005C0000 00060000 00000000 FFFFFFFF 00BF0008 ..¢...............\.......Y.£... 000040
 00C10008 002E0257 00C98002 0002005D 00070003 00000000 0000FFFF FFFF00C0 å...............].....è.W.....è. 000060
 FFFF00C3 003000C6 021C0005 80000000 00650000 00070000 00000000 FFFFFFFF .............e.........6.0.û... 000080
 FFFFFFFF 00C4000C 00260240 00CF8002 04000066 00060003 00000000 0000FFFF ...........f.....ü.ə.&...ı ..... 0000A0
 0000FFFF FFFF00C5 000C0026 022E00CF 80020000 00600007 00030000 00000000 ..........m.....ü...&...é... ... 0000C0
 00000000 FFFFFFFF 00C6000C 0026021C 00CF8002 00000075 00060003 00000000 ........u.....ü...&...ó......... 0000E0
 00000000 0000FFFF FFFF00C9 00080060 02110005 80010001 007C0000 00050000 ......|..........`...è.......... 000100
 00050000 00000000 FFFFFFFF 00CD0030 00C501E0 00058000 0000008A 00000007 ............Å.é.0.ë............. 000120
 00000006 00000000 0000FFFF FFFF0003 00080060 01D00005 80010001 00880007 ..........Å.`...Æ............... 000140
 00940000 00070000 00000000 FFFFFFFF 00D40008 00C101C5 00078002 000C0093 ........é.ê...å................. 000160
 04000095 00030003 00000000 0000FFFF FFFF00D6 003000C5 01870005 80000000 ........é.0.ø................... 000180
 80020000 00990007 00030000 00000000 FFFFFFFF 0007000C 002601C3 00CF8002 ..ü.ü.&...■..................... 0001A0
 00CF8002 000000A1 00060003 00000000 0000FFFF FFFF0008 000C0026 01AF00CF ü.€.&...Ä...............À.....ü. 0001C0
 01420005 80010002 00A80007 00050000 00000000 FFFFFFFF 0009000C 0026019B ..&...)...............´.......B. 0001E0
```

```
Dump of file SATURN:[PCCOMMON.DUMP.DLL]DAENTDF.TMP;1 on 18-APR-1990 10:40:49.05
File ID (561,28,0)   End of file block 116 / Allocated 116

Virtual block number 109 (0000006D), 512 (0200) bytes

 00280168 00288001 00010DB0 00080005 00000000 0000FFFF FFFF000C 003D00EF ÿ.*.É...............¯.....(.h.+. 000000
 0008006A 016A005C 8002000C 00B90000 00060000 00000000 FFFFFFFF 000D0008 ..Ï..............¿.....\.j.j... 000020
 000F0008 00280158 00288001 00010DBA 00090005 00000000 0000FFFF FFFF000E ß..............¤.....(.X.+...Ô. 000040
 FFFF00E0 00080069 015A005C 8002000C 00C40000 00060000 00000000 FFFFFFFF ..............á.....\.Z.i...Ä... 000060
 FFFFFFFF 00E10008 002D0147 00288001 00010DC5 00080005 00000000 0000FFFF ............é.....(.G.-...Å..... 000080
 0000FFFF FFFF00E2 00080069 0149005C 8002000C 00CE0000 00060000 00000000 ..........ö.....\.I.i...ã....... 0000A0
 00000000 FFFFFFFF 00E7001D 00F0011D 00058001 000200CF 00080005 00008000 ........ü.........Þ...Ó......... 0000C0
 00000000 0000FFFF FFFF00E8 00080024 0122000A 80010001 00D80008 00050000 ......Ü.......".$...Ð........... 0000E0
 00030000 00000000 FFFFFFFF 00E90008 00180124 00348002 000C00E4 00000006 ....ð.....4.$.....Õ............. 000100
 00060003 00000000 0000FFFF FFFF00EA 00080022 01220059 80020004 00E50005 ..Ï.....Y.".".."..õ............. 000120
 00F20004 00030000 00000000 FFFFFFFF 00E80008 00260122 00878002 000400EB Š.......".&...Š...............·. 000140
 000200F7 00080005 00000000 0000FFFF FFFF00EC 0008001C 0122008A 80020004 ....¤."....Š...............¥... 000160
 80020004 0E030005 00030000 00000000 FFFFFFFF 00F20019 00F000FC 00058001 ....■.Þ...·..................... 000180
 00378002 00040E09 00060003 00000000 0000FFFF FFFF00F3 00080022 0101000A ...."...µ.....................7. 0001A0
 01010061 80020004 0E100007 00030000 00000000 FFFFFFFF 00F40008 00200101 .. ...¶......................a... 0001C0
 00240101 00968002 00040E18 00060003 00000000 0000FFFF FFFF00F5 0008002C ,...%.........................$. 0001E0

Dump of file SATURN:[PCCOMMON.DUMP.DLL]DAENTDF.TMP;1 on 18-APR-1990 10:40:49.05
File ID (561,28,0)   End of file block 116 / Allocated 116

Virtual block number 110 (0000006E), 512 (0200) bytes

 00080026 010100C1 80020004 0E1F0007 00030000 00000000 FFFFFFFF 00F60008 ..-......................ê...&... 000000
 00FA0008 006800EC 00058001 00010E27 00160005 00000000 0000FFFF FFFF00F7 %..............'.......š.h...•. 000020
 FFFF00F8 0008001F 00EC0070 80020004 0E3E0003 00030000 00000000 FFFFFFFF ..............>.....p.š.....«... 000040
 FFFFFFFF 00830008 0060000C 00058001 00010E42 00080005 00000000 0000FFFF ............B.......É.`......... 000060
 0000FFFF FFFF0084 000800C1 00D00007 80020008 0E4B0000 00060000 00000000 ...........K.......Å.ê.......... 000080
 00000000 FFFFFFFF 00860030 00C50093 00058000 00000E4C 00000007 00000000 ........L.........é.0........... 0000A0
 00000000 0000FFFF FFFF0087 000C0026 00B700CF 80020400 0E4D0003 00030000 ......M.....ü.ñ.&............... 0000C0
 00030000 00000000 FFFFFFFF 0088000C 002600A5 00CF8002 00000E51 00070003 ....Q.....ü.É.&................. 0000E0
 00050005 00000000 0000FFFF FFFF0089 000C0026 009300CF 80020000 0E590006 ..Y.....ü...&................... 000100
 0E660000 00060000 00000000 FFFFFFFF 00800008 00600083 00058001 00010E60 `.........`....................f. 000120
 00000E67 00000007 00000000 0000FFFF FFFF008E 000800C1 00770007 8002000C ......w.è...................g... 000140
 80020400 0E680003 00030000 00000000 FFFFFFFF 00900030 00C5003A 00058000 ....:.é.0................h..... 000160
 00CF8002 00000E6C 00070003 00000000 0000FFFF FFFF0091 000C0026 005E00CF Ü.^.&....................l.....Ü. 000180
 003A00CF 80020000 0E740006 00030000 00000000 FFFFFFFF 0092000C 0026004C L.&....................t.....ü.:. 0001A0
 00F00005 00058001 00020E7B 00100005 00000000 0000FFFF FFFF0093 000C0026 &....................(.........Þ. 0001C0
 00080019 001F0038 80010001 0E8C0004 00050000 00000000 FFFFFFFF 0096002D -.....................8....... 0001E0

Dump of file SATURN:[PCCOMMON.DUMP.DLL]DAENTDF.TMP;1 on 18-APR-1990 10:40:49.05
File ID (561,28,0)   End of file block 116 / Allocated 116

Virtual block number 111 (0000006F), 512 (0200) bytes

 00980008 001A001F 00788001 00010E91 00040005 00000000 0000FFFF FFFF0097 .......................x......... 000000
 FFFF0099 0008001A 001F0088 80010001 0E960004 00050000 00000000 FFFFFFFF ......................|.......... 000020
 FFFFFFFF 009A0008 00280014 000A8001 00010E98 00070005 00000000 0000FFFF .......................(......... 000040
 0000FFFF FFFF009B 00080028 0009000A 80010001 0EA30007 00050000 00000000 ..........È.........(........... 000060
 00000000 FFFFFFFF 009C0008 00360014 00388001 00010EAB 000A0005 00000000 ........¨.....8...6............. 000080
 00000000 0000FFFF FFFF009D 00080037 00140078 80010001 0EB6000A 00050000 ......Ñ.....x...7............... 0000A0
 00050000 00000000 FFFFFFFF 009E0008 00360014 00888001 00010EC1 000A0005 ....è.....|...6................. 0000C0
 000A0005 00000000 0000FFFF FFFF009F 00080036 00090038 80010001 0ECC000A ..ã.....8...6................... 0000E0
 0EE2000A 00050000 00000000 FFFFFFFF 00A00008 00370009 00788001 00010ED7 ■.....x...7...................ã. 000100
 00070EED 0000000A 00000000 0000FFFF FFFF00A1 00080037 000900B8 80010001 ....|...7...À.................Ú... 000120
 80010001 0EEE0009 00050000 00000000 FFFFFFFF 0068002C 00F003FC 00058003 ....•.Þ.,.k...............Ÿ..... 000140
 00058001 00010EF8 00090005 00000000 0000FFFF FFFF0071 00080034 03040005 ..å.4...q..............½....... 000160
 03010005 80010001 0F02001F 00050000 00000000 FFFFFFFF 00A60008 0037035C \.7...Ï......................... 000180
 006802A7 00058001 00010F22 00110005 00000000 0000FFFF FFFF00AF 00080088 ....£................"......Ï.h. 0001A0
 0008008E 02400005 80010001 0F34001F 00050000 00000000 FFFFFFFF 00870008 ..ñ...............4.......M..... 0001C0
 00050008 005001B9 00058001 00010F54 00080005 00000000 0000FFFF FFFF00C2 ô...............T.......¿.P...ƒ. 0001E0
```

```
Dump of file SATURN:[PCCOMMON.DUMP.DLL]DAENTDF.TMP;1 on 18-APR-1990 10:40:49.05
File ID (561,28,0)    End of file block 116 / Allocated 116

Virtual block number 112 (00000070), 512 (0200) bytes

 FFFF0085 00080048 00C40005 80010001 0F5D0008 00050000 00000000 FFFFFFFF ..............].......á.H....... 000000
 FFFFFFFF 008F0008 003B006B 00058001 00010F66 00060005 00000000 0000FFFF ............f.......k.;......... 000020
 0000FFFF FFFF0100 0008002E 00EC0093 80020004 0F6D0002 00030000 00000000 ..........m.......ì............. 000040
 00000000 FFFFFFFF 00DA000C 002602CF 00CF8002 00000F70 00050003 00000000 ..........p.....Ü.Ü.&...Ö....... 000060
 53000000 0000FFFF FFFF00D8 000C0026 018700CF 80020000 0F760003 00030000 ......v.....Ü...&...Ü..........S 000080
 61746164 206E6968 7469572A 00003A65 60616E20 79746974 6E450074 63656C65 elect.Entity name:..*Within data 0000A0
 00003A6D 796E6F6E 7953003A 6E6F6974 70697263 73654400 003A6C65 646F6D20  model:..Description:.Synonym:.. 0000C0
 003A6570 79747265 7075532A 00657465 6C654400 6563616C 70655200 64644100 .Add.Replace.Delete.*Super`ype:. 0000E0
 41006574 656C6544 00656361 6C706552 00646441 0000003A 65707974 62755300 .Subtype:...Add.Replace.De. te.A 000100
 52006464 41000000 003A2965 6D616E20 2C726564 726F2820 65747562 69727474 ttribute (order, name):.....'.R 000120
 00003A74 65732D70 69687372 656E7472 61500065 74656C65 44006563 616C7065 eplace.Delete.Partnership-set:.. 000140
 69725000 003A7965 4B006574 656C6544 00656361 6C706552 002E2E2E 64644100 .Add....Replace.Delete.Key:..Pri 000160
 726F462A 00657465 6C654400 6563616C 70655200 2E2E2E64 64410000 7972616D mary..Add....Replace.Delete.*For 000180
 6563616C 70655200 64644100 00003A64 6F687465 4D000073 79656B20 6E676965 eign keys..Method:...Add.Replace 0001A0
 74636570 78450000 3A6D7560 696E694D 00736560 756C6F56 00657465 6C654400 .Delete.Volumes.Minimum:..Expect 0001C0
 65637265 50006574 61722068 74776F72 4700003A 60756D69 78614D00 003A6465 ed:..Maximum:..Growth rate.Perce 0001E0

Dump of file SATURN:[PCCOMMON.DUMP.DLL]DAENTDF.TMP;1 on 18-APR-1990 10:40:49.05
File ID (561,28,0)    End of file block 116 / Allocated 116

Virtual block number 113 (00000071), 512 (0200) bytes

 6F66206C 6160726F 4E007961 447E0068 746E6F4D 7E007261 65597E00 003A746E nt:..~Year.~Month.~Day.Normal fo 000000
 46006472 7E696854 00646E6F 6365537E 00747372 69467E00 656E6F4E 7E006D72 rm.~None.~First.~Second.Thi~rd.F 000020
 6559003A 64657A69 6C616D72 6F6E2079 6C657461 75716564 41006874 7E72756F our~th.Adequately normalized:.Ye 000040
 00657465 6C654400 6563616C 70655200 64644100 00003A64 726F7779 65480073 s.Keyword:...Add.Replace.Delete. 000060
 20726573 55006574 656C6544 00656361 6C706552 00646441 0000003A 65746F4E Note:...Add.Replace.Delete.User  000080
 74616572 43007265 73550065 6D695400 65746144 006E6F69 74616D72 6F666E69 information.Date.Time.User.Creat 0000A0
 5F5F5F5F 5F5F5F5F 5F5F005F 5F5F5F5F 5F5F5F5F 5F006465 74616470 55006465 ed.Updated.__________.__________ 0000C0
 5F5F5F5F 5F5F5F5F 5F005F5F 5F5F5F5F 5F5F5F5F 005F5F5F 5F5F5F5F 5F5F5F00 .__________.__________.________ 0000E0
 65707974 6275532A 00736D79 6E6F6E79 532A0000 5F5F5F5F 5F5F5F5F 5F5F005F _.__________..*Synonyms.*Subtype 000100
 656D616E 202C6570 7974202C 72656472 6F282073 65747562 69727474 412A0073 s.*Attributes (order, type, name 000120
 2C656D61 6E282073 7965482A 00737465 732D7069 68737265 6E747261 502A0029 ).*Partnership-sets.*Keys (name, 000140
 79654B00 73646F68 74654D2A 0029726F 74616369 646E6920 7972616D 69727020  primary indicator).*Methods.Key 000160
 00000000 0000004C 44500065 72616853 006F4E00 7365746F 4E2A0073 64726F77 words.*Notes.No.Share.PDL....... 000180
 00299400 0000020E 00130001 00000017 00000000 FFFF0001 000E0352 00000365 e...R...................8.Å...). 0001A0
 00C90004 80010001 02F6000A 00050000 00000000 02F2FFFF 03810004 00EA0017 ..ö.å.....'...........~.......è. 0001C0
 00AE00C4 00368001 00010301 00000005 00000000 0000FFFF FFFF0065 00080032 2...e.....................6.á.Ü. 0001E0

Dump of file SATURN:[PCCOMMON.DUMP.DLL]DAENTDF.TMP;1 on 18-APR-1990 10:40:49.05
File ID (561,28,0)    End of file block 116 / Allocated 116

Virtual block number 114 (00000072), 512 (0200) bytes

 00080029 00880004 80010001 03020008 00050000 00000000 FFFFFFFF 0066000C ..f.......................|.)... 000000
 00680008 00AC0087 00398002 00080308 00000006 00000000 0000FFFF FFFF0067 g......................9.ñ.¯...h. 000020
 FFFF0069 00080032 00A80001 80000001 030C000A 00050000 00000000 FFFFFFFF ........................`.2...i... 000040
 FFFFFFFF 006A0008 00AC00A7 00398002 00080317 00000006 00000000 0000FFFF ..................9.I.¯...j..... 000060
 0000FFFF FFFF0068 00080028 009A0039 80010001 03180008 00050000 00000000 ................9...(...k....... 000080
 00000000 FFFFFFFF 006C0020 00AE0078 00358003 00000321 00000007 00000000 ........!.....5.x.Ö. .l......... 0000A0
 00000000 0000FFFF FFFF006D 00080028 00680005 80010001 03220008 00050000 ......"........h.(...m.......... 0000C0
 00050000 00000000 FFFFFFFF 006E0008 00AC0068 00388002 00080328 00000006 ....+.....8.h.¯...n............. 0000E0
 00000007 00000000 0000FFFF FFFF006F 00080028 005A0037 80010001 032C0005 ,.......7.Z.(...o............... 000100
 03330007 00050000 00000000 FFFFFFFF 00700020 00800037 00358003 00000332 2.....5.7.¯. .p...............3. 000120
 0001033B 00040005 00000000 0000FFFF FFFF0078 001C00E0 00180005 80010002 .........Å...x...............;... 000140
 80020008 03400000 00060000 00000000 FFFFFFFF 00790008 0014001E 00A18001 ..À.......y...............a.... 000160
 00558001 00010341 00040005 00000000 0000FFFF FFFF007A 00080020 001F008D §... ...z...............A.....U. 000180
 001F0075 80020008 03460000 00060000 00000000 FFFFFFFF 00780008 001A001E ......(...............F.....u... 0001A0
 00180010 00088001 00010347 00040005 00000000 0000FFFF FFFF007C 00080022 "...|...............G........... 0001C0
 00080026 001E0029 80020008 034C0000 00060000 00000000 FFFFFFFF 007D0008 ..)..............L......)...&... 0001E0
```

```
Dump of file SATURN:[PCCOMMON.DUMP.DLL]DAENTDF.TMP;1 on 18-APR-1990 10:40:49.05
File ID (561,28,0)   End of file block 116 / Allocated 116

Virtual block number 115 (00000073), 512 (0200) bytes

 0071000C 00260005 00188002 0000034D 00030003 00000000 0000FFFF FFFF007E ~...............M.........&...q. 000000
 FFFF0072 000C0026 00050048 80020400 03510007 00030000 00000000 FFFFFFFF ..............Q.....H...&...r... 000020
 FFFFFFFF 0073000C 00260005 00778002 00000359 00060003 00000000 0000FFFF ............Y.....w...&...s..... 000040
 7243FFFF FFFF0074 000C0026 000500A7 80020100 03600004 00030000 00000000 ..........`.....Ì...&...t.....Cr 000060
 3A312320 79746974 6E450000 00030070 6968736E 6F697461 6C655220 65746165 eate Relationship.....Entity #1: 000080
 73656974 69746E45 00003A32 23207974 69746E45 00003A31 23207465 73500000 ..Pset #1:..Entity #2:..Entities 0000A0
 003A6E69 4D007365 6D756C6F 56000073 74657350 00003A32 23207465 73500000 ..Pset #2:..Psets..Volumes.Min:. 0000C0
 006C6563 6E614300 74706563 63417E00 4B4F7E00 003A7861 4D00003A 70784500 .Exp:..Max:..~OK.~Accept.Cancel. 0000E0
 00000000 FFFF0001 000E0352 00000214 00000000 00000000 00000000 706C6548 Help................R........... 000100
 00000000 019FFFFF 038000AE 00C8FFC3 00909400 00D00194 000A0001 0000000C ..........Å.....û.à.Û........... 000120
 00000000 0000FFFF FFFF0064 0008008E 009D0005 80010001 01A30029 00050000 ....).È.........ƒ...d........... 000140
 00050000 00000000 FFFFFFFF 00650008 001E008D 00058001 000101CD 00070005 ....ë..............e............ 000160
 00040005 00000000 0000FFFF FFFF0066 00080096 00800023 80010001 01050005 ..(.....#.......f............... 000180
 01E00005 00050000 00000000 FFFFFFFF 00670008 001E007D 00058001 000101D8 Ù.......}.....g...............Á. 0001A0
 000101E6 000A0005 00000000 0000FFFF FFFF0068 00080096 007D001C 80010001 ......}.....h...............Ì... 0001C0
 80030001 01F10000 00070000 00000000 FFFFFFFF 00690008 0032006D 00058001 ....m.2...i................þ..... 0001E0

Dump of file SATURN:[PCCOMMON.DUMP.DLL]DAENTDF.TMP;1 on 18-APR-1990 10:40:49.05
File ID (561,28,0)   End of file block 116 / Allocated 116

Virtual block number 116 (00000074), 512 (0200) bytes

 00058001 000101F2 00100005 00000000 0000FFFF FFFF006A 00200096 004B0005 ..K... .j....................... 000000
 00190005 80030001 02030000 00070000 00000000 FFFFFFFF 00690008 004C003B ;.L...i......................... 000020
 00260005 00218002 00000204 00030003 00000000 0000FFFF FFFF006C 00200096 .. .l.....................l...&. 000040
 000C0026 00050051 80020000 02080006 00030000 00000000 FFFFFFFF 006D000C ..m.....................Q...&... 000060
 006F000C 00260005 00818002 0100020F 00040003 00000000 0000FFFF FFFF006E n.........................&...o. 000080
 726F2065 6E6F2065 736F6F68 43000000 03007965 6B206574 61657243 FFFFFFFF ....Create key.....Choose one or 0000A0
 746E4500 79656B20 65687420 726F6620 73746E65 6E6F706D 6F632065 726F6D20  more components for the key.Ent 0000C0
 73657475 62697274 7441005F 5F5F5F5F 003A7965 4B005F5F 5F5F5F00 3A797469 ity:._____.Key:._____.Attributes 0000E0
 48006C65 636E6143 004B4F7E 00007374 65732070 69687372 656E7472 61500000 ..Partnership sets..~OK.Cancel.H 000100
 00000000 00000000 00000000 00000000 00000000 00000000 00000000 00706C65 elp............................. 000120
 00000000 00000000 00000000 00000000 00000000 00000000 00000000 00000000 ................................ 000140
 00000000 00000000 00000000 00000000 00000000 00000000 00000000 00000000 ................................ 000160
 00000000 00000000 00000000 00000000 00000000 00000000 00000000 00000000 ................................ 000180
 00000000 00000000 00000000 00000000 00000000 00000000 00000000 00000000 ................................ 0001A0
 00000000 00000000 00000000 00000000 00000000 00000000 00000000 00000000 ................................ 0001C0
 00000000 00000000 00000000 00000000 00000000 00000000 00000000 00000000 ................................ 0001E0
```

```
Dump of file SATURN:[PCCOMMON.DUMP.DLL]DADOMDF.TMP;1 on 18-APR-1990 10:40:40.82
File ID (555,17,0)   End of file block 60 / Allocated 60

Virtual block number 1 (00000001), 512 (0200) bytes

00000000 00000040 00000000 00000088 0000FFFF 00000004 00000034 006C5A4D MZl.4...........|.......a....... 000000
00000080 00000000 00000000 00000000 00000000 00000000 00000000 00000000 ................................ 000020
6F6E6E61 63206061 72676F72 70207369 685421CD 4C01B821 CD09B400 0EBA1F0E ..o.:Ç.ël|.LèlThis program canno 000040
00000000 00000024 0A0D0D2E 65646F60 20534F44 206E6920 6E757220 65622074 t be run in DOS mode....$....... 000060
00080009 00000000 00030000 00000000 00058009 D6AD3017 000705F6 0505454E NE..-.....=Üe..................... 000080
00000000 00000000 00010003 00040000 0000067D 00AF009F 00940088 0040002E ..a.......£.)................... 0000A0
009C0E00 009C0655 000F0F00 000F0653 193E0F00 193E04A6 3F8B0F00 3FB8006B k.|?..|?|.>...>.S.......U....... 0000C0
02461EF1 02460696 02C71EF1 02C70669 00FC0E21 00000000 00900F21 008A065F _...!.......!.•.i.ú.þ.ú...F.þ.F. 0000E0
01000000 46444D4F 44414407 00110004 00030005 00020005 0AC41EB1 0AC406B8 Ē.ā.Ÿ.ā..............DADOMDF.... 000100
4C414D45 4D0D4D45 4D034E49 57405005 0004C303 6C017E01 1600F300 26000700 ...&.µ...-.l.Ú...PMWIN.MEM.MEMAL 000120
4154534C 4D440B6C 6D64034B 434F4C42 45455246 4D454D0C 4B434F4C 42434F4C LOCBLOCK.MEMFREEBLOCK.dml.DMLSTA 000140
41484C45 444F4D59 52455551 4C4D4413 4E585450 4F54534C 4D440A4E 58545452 RTTXN.DMLSTOPTXN.DMLQUERYMODELHA 000160
4408444C 45494659 52455551 4C4D4400 49544759 52455551 4C4D4408 454C444E NDLE.DMLQUERYGTI.DMLQUERYFIELD.D 000180
59524555 514C4D44 08544553 454C504D 49534C4D 440C444C 45494654 45534C4D MLSETFIELD.DMLSIMPLESET.DMLQUERY 0001A0
4E554C4D 44084554 414C4552 4C4D4409 314E4C52 59524555 514C4D44 0C4E4C52 RLN.DMLQUERYRLN1.DMLRELATE.DMLUN 0001C0
44494C4D 44595245 55514C4D 440D5453 494C4545 52464C4D 44084554 414C4552 RELATE.DMLFREELIST.DMLQUERYDMLID 0001E0

Dump of file SATURN:[PCCOMMON.DUMP.DLL]DADOMDF.TMP;1 on 18-APR-1990 10:40:40.82
File ID (555,17,0)   End of file block 60 / Allocated 60

Virtual block number 2 (00000002), 512 (0200) bytes

41544345 4C455345 444C4D44 0E4B4341 424C4C4F 524E5854 504F5453 4C4D4412 .DMLSTOPTXNROLLBACK.DMLDESELECTA 000000
41445855 41595245 55514954 47124C4F 4F544C4C 494B4954 470B4954 47034C4C LL.GTI.GTIKILLTOOL.GTIQUERYAUXDA 000020
52434D41 440C454D 414E5443 454A424F 5445474D 4144106D 61640352 54504154 TAPTR.dam.DAMGETOBJECTNAME.DAMCR 000040
54454C45 444D4144 0F544345 4A424F50 554B4F4F 4C4D4144 0F4D4F44 45544145 EATEDOM.DAMLOOKUPOBJECT.DAMDELET 000060
41440F53 4D4F4442 55534C4C 414D4F44 59524555 514D4144 154E4941 4D4F4445 EDOMAIN.DAMQUERYDOMALLSUBDOMS.DA 000080
4D455449 44444154 53494C4D 46440E4D 46440352 5245594E 4154414D 524F464D MFORMATANYERR.DFM.DFMLISTADDITEM 0000A0
45535544 4C454946 59524555 514D4644 154D524F 46535345 434F5250 4D46440E .DFMPROCESSFORM.DFMQUERYFIELDUSE 0000C0
4D444859 52455551 4D46440F 50414548 42485952 4555514D 46440E41 54414452 RDATA.DFMQUERYHBHEAP.DFMQUERYHDM 0000E0
474C4444 4E574859 52455551 4D46440F 4D544859 52455551 4D46440B 4A424F4C LOBJ.DFMQUERYHTM.DFMQUERYHWNDDLG 000100
4F4F5459 52455551 4D46440C 53555441 54535446 49485359 52455551 4D464413 .DFMQUERYSHIFTSTATUS.DFMQUERYTOO 000120
49465245 54534947 45524D46 44104154 41445245 53555952 4555514D 4644104C L.DFMQUERYUSERDATA.DFMREGISTERFI 000140
46444E41 4D4D4F43 5445534D 46440F4E 4645534F 4C435445 534D4644 00444C45 ELD.DFMSETCLOSEFN.DFMSETCOMMANDF 000160
45544147 4956414E 5445534D 4644104E 464C4F52 544E4F43 5445534D 46440F4E N.DFMSETCONTROLFN.DFMSETNAVIGATE 000180
41544144 52455355 5445534D 46440E4E 46594649 544F4E54 45534D46 440E4E46 FN.DFMSETNOTIFYFN.DFMSETUSERDATA 0001A0
49444441 5453454E 4D46440E 4D524F46 474E4F4C 45544147 4956414E 4D464413 .DFMNAVIGATELONGFORM.DFMNESTADDI 0001C0
4B414D54 53454E4D 4644144D 45544945 54454C45 44545345 4E4D4644 114D4554 TEM.DFMNESTDELETEITEM.DFMNESTMAK 0001E0

Dump of file SATURN:[PCCOMMON.DUMP.DLL]DADOMDF.TMP;1 on 18-APR-1990 10:40:40.82
File ID (555,17,0)   End of file block 60 / Allocated 60

Virtual block number 3 (00000003), 512 (0200) bytes

504D4644 194D4554 49595245 55515453 454E4D46 44105055 4F524754 49444545 EEDITGROUP.DFMNESTQUERYITEM.DFMP 000000
53534543 4F52504D 4644194C 4F52544E 4F435449 44455453 494C5353 45434F52 ROCESSLISTEDITCONTROL.DFMPROCESS 000020
44455453 454E5353 45434F52 504D4644 19444E41 4D4D4F43 54494445 5453494C LISTEDITCOMMAND.DFMPROCESSNESTED 000040
4D4D4F43 54494445 5453454E 53534543 4F52504D 4644194C 4F52544E 4F435449 ITCONTROL.DFMPROCESSNESTEDITCOMM 000060
4F464144 06444554 43454C45 53584F42 5453494C 59524555 514D4644 17444E41 AND.DFMQUERYLISTBOXSELECTED.DAFO 000080
50555F46 440F474E 4F4C555F 54494E49 5F46440D 50524542 4D554E53 55094D52 RM.USNUMBERP.DF_INIT_ULONG.DF_UP 0000A0
41440E4F 464E4952 45535554 494E494D 524F4641 4412474E 4F4C555F 45544144 DATE_ULONG.DAFORMINITUSERINFO.DA 0000C0
50554A42 4F0F5443 454C4553 54494E49 4A424F0D 454C5449 54544553 4D524F46 FORMSETTITLE.OBJINITSELECT.OBJUP 0000E0
45544144 50554A42 4F12454D 414E5449 4E494A42 4F0B5443 454C4553 45544144 DATESELECT.OBJINITNAME.OBJUPDATE 000100
4454494E 494A424F 08435345 44455441 4450554A 424F0D45 4D414E53 55434F46 FOCUSNAME.OBJUPDATEDESC.OBJINITD 000120
534C4544 4A424F09 4E595344 44414A42 4F094E59 5354494E 494A424F 0A435345 ESC.OBJINITSYN.OBJADDSYN.OBJDELS 000140
57484444 414A424F 0944574B 54494E49 4A424F0A 4E595350 45524A42 4F094E59 YN.OBJREPSYN.OBJINITKWD.OBJADDKW 000160
544F4E54 494E494A 424F0B44 574B5045 524A424F 0944574B 4C45444A 424F0944 D.OBJDELKWD.OBJREPKWD.OBJINITNOT 000180
4F4E5045 524A424F 0A45544F 4E4C4544 4A424F0A 45544F4E 4444414A 424F0A45 E.OBJADDNOTE.OBJDELNOTE.OBJREPNO 0001A0
574F5449 4E494A42 4F0C4241 5456415F 45544145 52435F4D 524F4641 44134554 TE.DAFORM_CREATE_AVTAB.OBJINITOW 0001C0
414D5455 4C4D4416 54554C4D 44055245 4E574F45 54414450 554A424F 0E52454E NER.OBJUPDATEOWNER.DMLUT.DMLUTMA 0001E0
```

```
Dump of file SATURN:[PCCOMMON.DUMP.DLL]DADOMDF.TMP;1 on 18-APR-1990 10:40:40.82
File ID (555,17,0)   End of file block 60 / Allocated 60

Virtual block number 4 (00000004), 512 (0200) bytes

 4C454452 45545349 47455254 554C4D44 1352454C 444E4148 59464954 4F4E454B KENOTIFYHANDLER.DMLUTREGISTERDEL 000000
 54534947 45525455 4C4D4412 54455352 45545349 47455254 554C4D44 10455445 ETE.DMLUTREGISTERSET.DMLUTREGIST 000020
 54554C4D 441B5946 49544F4E 53534543 4F525054 554C4D44 12455449 52575245 ERWRITE.DMLUTPROCESSNOTIFY.DMLUT 000040
 534F1B00 00385603 01014554 414C4552 4E554554 414C4552 52455453 49474552 REGISTERRELATEUNRELATE...V8...OS 000060
 424D4F44 0C00006D 726F4620 676E6F4C 206E6961 6D6F4420 4144204D 5020322F /2 PM DA Domain Long Form...DOMB 000080
 890A468B D88EFFFF B81E5657 00001EC8 00000000 00000001 50415254 53544F4F OOTSTRAP........à...WV.|...Ä.F.. 0000A0
 00FFFF9A 5016EC46 8D0E76FF 1076FF00 DEE90374 01EA7E83 EA46890C 4688E646 Fl.F..Fõ.~õ.t.Õ8..v..v..F$.P.... 0000C0
 FFFF9A50 16F6468D 0E76FF10 76FF0233 E9E8468B 0006E903 7500003D E8468900 ..FÒ=..u.Õ...FÒÕ3..v..v..F~.P... 0000E0
 76FF5016 FC468D00 63E9E646 8B0212E9 E8468800 06E90375 00003DE8 46890000 ...FÒ=..u.Õ...FÒÕ...FlÕc..F=.P.v 000100
 01E5E9E8 46880006 E9037500 003DE846 890AC483 01840733 9A0E76FF 1076FFE6 l.v..v..3....é..FÒ=..u.Õ...FÒÕl. 000120
 FFFF9AEC 76FFEE76 FF001CE9 0003E903 7401F67E 830028E9 0375FE46 08FC468B .F=.F±u.Õ(..~.t.Õ..Õ...vŸ.v$... 000140
 7500733D 0033E900 36E90039 E901B2E9 E8468800 06E90375 000030E8 46890000 ...FÒ=..u.Õ...FÒÕý.Õ9.Õ6.Õ3.=s.u 000160
 75000830 FF7DE903 7500873D FF85E903 7500813D FF8DE903 7500763D FF95E903 .Õ..=v.u.Õ..=..u.Õ..=..u.Õ).=Ä.u 000180
 4680E676 FF0E76FF 1076FF01 15E9E646 8BFFC7E9 FF6DE903 7500DF3D FF75E903 .Õu.=Õ.u.Õm.Õú..FlÕ...v..v..vl.F 0001A0
 8D0E76FF 1076FF01 4CE9E846 8B0006E9 03750000 3DE84689 0000010C 9A5016F8 ½.P.É....FÒ=..u.Õ...FÒÕL..v..v.. 0001C0
 0E76FF10 76FF0128 E9E8468B 0006E903 7500003D E8468900 00FFFF9A 5016F046 Fb.P......FÒ=..u.Õ...FÒÕ+..v..v. 0001E0

Dump of file SATURN:[PCCOMMON.DUMP.DLL]DADOMDF.TMP;1 on 18-APR-1990 10:40:40.82
File ID (555,17,0)   End of file block 60 / Allocated 60

Virtual block number 5 (00000005), 512 (0200) bytes

 000FE67E 81010AE9 E8468800 06E90375 00003DE8 46890000 01B89A50 16F2468D .F·.P.|....FÒ=..u.Õ...FÒÕ...~lÕ. 000000
 FFF276FF F476FF08 C483FFFF 027C9A0E 76FF1076 FFF276FF F476FF00 14E90374 t.Õ...v¶.v·.v..v..|....é..v¶.v·. 000020
 FF1076FF 00C9E900 00FFFF9A F076FFF8 76FFFA76 FF0676FF 0876FF0A 76FF0C76 v..v..v..v..v*.v½.vÞ.....Õè..v.. 000040
 1076FF00 A8E9E846 8B0006E9 03750000 3DE84689 0000FFFF 9A5016F2 468D0E76 v..F·.P......FÒ=..u.Õ...FÒÕ˙..v. 000060
 84E9E846 8B0006E9 03750000 3DE84689 0000FFFF 9A5016E2 468DE676 FF0E76FF .v..vl.Fä.P......FÒ=..u.Õ...FÒÕ. 000080
 64E90000 FFFF9AE2 76FFE476 FF0676FF 0876FF0A 76FF0C76 FFF276FF F476FF00 ..v¶.v·.v..v..v..v..vÕ.vä.....Õd 0000A0
 3DFED6E9 03750070 300023E9 0376FEE3 E9037500 8530005B E9005EE9 00008800 .|..Õ^.Õ[.=..u.Õ0±v.Õ#.=p.u.Õ#±= 0000C0
 E9037500 8730FFC7 E9FE8EE9 03750081 30FEC6E9 0375007F 30FECEE9 03750073 s.u.Õö±=..u.Õ6±=..u.Õf±Õú.=..u.Õ 0000E0
 E9037500 DF30FF42 E9037500 D830FF4A E9037500 D430FF52 E9037500 D230FEB3 °±=Ø.u.ÕR.=å.u.ÕJ.=Ä.u.Õ8.=Õ.u.Õ 000100
 DF680A76 FF0C76FF D88E0008 B81E5657 00005EC8 000CCAC9 5F5E1FFF 9CE9FE93 .±Õ...^_èò..à^..WV.|...Ä.v..v.hÕ 000120
 0000B800 06E90374 FFFA7E83 FA468900 0002C99A 006A006A 006A006A 01656800 .he.j.j̄.j.j..è....F°.~°.t.Õ..|.. 000140
 FC468900 00FFFF9A 006A006A FA76FF00 6A016A68 000F680A 76FF0C76 FF00F1E9 Õp..v..v.hÕ.hj.j..v°j.j.......F= 000160
 46880006 E9037500 003DEE46 89000000 2D9A5016 F2468D06 76FF0876 FFFE5689 .V±.v..v..F·.P.-....FŸ=..u.Õ...F 000180
 3DEE4689 0000FFFF 9A5016F6 468D0A6A FC76FFFE 76FFF276 FFF476FF 0080E9EE ŸÕ¯..v¶.v·.v±.v=j..F-.P......FŸ= 0001A0
 FF9A5016 F0468DF6 76FFF876 FFF276FF F476FF00 87E9EE46 8B0006E9 03750000 ..u.Õ...FŸÕ...v¶.v·.v½.v-.Fb.P.. 0001C0
 F476FF00 3FE90374 02F07E83 0060E9EE 46880006 E9037500 003DEE46 890000FF ....FŸ=..u.Õ...FŸÕ'..~b.t.Õ7..v¶ 0001E0

Dump of file SATURN:[PCCOMMON.DUMP.DLL]DADOMDF.TMP;1 on 18-APR-1990 10:40:40.82
File ID (555,17,0)   End of file block 60 / Allocated 60

Virtual block number 6 (00000006), 512 (0200) bytes

 0006E903 7500003D EE468900 00FFFF9A 5016A246 8D026AF6 76FFF876 FFF276FF .v·.v½.v~j..FÅ.P......FŸ=..u.Õ.. 000000
 FF0C76FF 0012E900 00FFFF9A 5016A246 8D000B68 0A76FF0C 76FF002E E9EE468B .FŸÕ...v..v.hÙ..FÅ.P.....Õ...v.. 000020
 1E565700 0012C8CB C95F5E1F 0000E900 00B80000 03859A00 7A681E00 D8680A76 v.hÙ..hz......|..Õ...^_èùà...WV. 000040
 0030F246 89000001 359A5016 F6468D0E 76FF1076 FFF44689 0A468B08 8E0284B8 |...Ä.F..F¶.v..v..F~.P.5....F·=. 000060
 3DF24689 00000156 9A5016F8 468D0E76 FF1076FF 0136E9F2 46880006 E9037500 .u.Õ...F·Õ6..v..v..F½.P.V....F·= 000080
 16FC468D F476FF0E 76FF1076 FF009BE9 F4468801 15E9F246 8B0006E9 03750000 ..u.Õ...F·Õ...F¶Õ...v..v..v¶.F=. 0000A0
 0E76FF10 76FF00C5 E900EBE9 F2468800 06E90375 00003DF2 46890000 04399A50 P.9....F·=..u.Õ...F·Õ$.Õé..v..v. 0000C0
 9EE900C4 E9F2468B 0006E903 7500003D F2468900 0004609A 5016FC46 8DF476FF .v¶.F=.P.'....F·=..u.Õ...F·Õé.Õ. 0000E0
 8B0006E9 03750000 3DF24689 00000114 9A5016EE 468DF476 FF0E76FF 1076FF00 ..v..v..v¶.FŸ.P......F·=..u.Õ... 000100
 FFFF9AEE 76FFF076 FF0676FF 0876FF0A 76FF0C76 FFF876FF FA76FF00 9DE9F246 F·Õ...v*.v½.v..v..v..v..vÞ.vŸ... 000120
 B1A7FF2E 93C003FF ECE90376 001E3001 2C2D0051 E90077E9 0000B800 7DE90000 ..Õ).|..Õw.ÕQ.-,.=..v.Õ$..·...IŸ 000140
 03049504 95049504 95049504 95049504 95049504 95049504 95040304 03040304 ............................ .... 000160
 FF042A04 51045104 51040304 03040304 95049504 95049504 95049504 03040304 .....................Q.Q.Q. .. 000180
 E90000FF FF9AF676 FFFC76FF FE76FF06 76FF0876 FF0A76FF 0C76FFF8 76FFFA76 v*.v½.v..v..v..v..v±.v=.v~.....Õ 0001A0
 16FF3086 8D0876FF 0A76FFD8 8E03B1B8 1E565700 0002C800 0CCAC95F 5E1F0000 ...^_èò..àØ..WV.|Ÿ..Ä.v..v...0.. 0001C0
 FFFA76FF FA5689F8 46890000 FFFF9A06 76FFFF30 B6FFFF32 B6FF0000 03E89A50 P.Õ¯...Ñ2..ÑO..v.......F½.V*.v*. 0001E0
```

```
Dump of file SATURN:[PCCOMMON.DUMP.DLL]DADOMDF.TMP;1 on 18-APR-1990 10:40:40.82
File ID (555,17,0)   End of file block 60 / Allocated 60

Virtual block number 7 (00000007), 512 (0200) bytes

 E90000BA 00008800 09E90375 23FF34BE 800000FF FF9A5016 FF34868D 406AF876 v½j@..4..P......f4.#u.Õ..|..¤..Õ 000000
 8E83FF76 9689FF74 8689FFCA 8300000D 04C483FF FF00429A 5016FF35 868D00C4 ó...5..P.B....ó.....ò...t...v..ƒ 000020
 78868D06 76FFFF30 86FFFF32 86FF001C E90374FF FF76BE83 0026E903 7407FF74 t..t.Õ&..ƒv..t.Õ...Ñ2..Ñ0..v...x 000040
 E90374FF FF76BE83 0026E903 7406FF74 BE830039 E90000FF FF9A0080 685016FF ..Ph.......Õ9..ƒt..t.Õ&..ƒv..t.Õ 000060
 00880009 E90000FF FF9A5016 FF78868D 00806806 76FFFF30 B6FFFF32 B6FF001C ...Ñ2..Ñ0..v.h....x..P.....Õ..|. 000080
 0676FF50 16FC468D 0000FFFF 9A5016FF 2E868D08 76FF0A76 FF003FE9 0000BA00 .¤..Õ7..v..v......P......F•.P.v. 0000A0
 FF9A5016 FF78868D FC76FFFE 76FFFF2E B6FF0AC4 83007A07 339A0876 FF0A76FF .v..v..3.z..ó..Ñ...v±.v•..x..P.. 0000C0
 E903740C 087E83D8 8E0521B8 1E565700 000AC800 06CAC95F 5E1F0000 E90000FF ...Õ...^_èò..à...WV.¡|..Ä.-..t.Õ 0000E0
 F6468B00 06E90375 00003DF6 46890000 FFFF9A50 16FC468D 0E76FF10 76FF004A J..v..v..F•.P......F-=..u.Õ...F- 000100
 6A0E76FF 1076FF00 00E90374 0C563900 15E90374 0A4639FE 568BFC46 880089E9 Õ¿..F•.V±9F.t.Õ..9V.t.Õ...v..v.j 000120
 3DF64689 0000FFFF 9A5016F8 46800E76 FF1076FF 0090E900 00880000 FFFF9A77 w.....|..Õ...v..v..F½.P......F-= 000140
 77FF2632 77FF26F8 5EC40001 2E47C726 F85EC400 6FE9F646 880006E9 03750000 ..u.Õ...F-Õo.ó^½&ÚG...ó^½&.w2&.w 000160
 F6468B00 06E90375 00003DF6 46890000 FFFF9A06 76FF0876 FF0A76FF 0C76FF30 0.v..v..v..v.......F-=..u.Õ...F- 000180
 0E76FF10 76FF0000 07149A00 A0680E76 FF1076FF 00002E47 C726F85E C40039E9 Õ9.ó^½&ÚG....v..v.h........v..v. 0001A0
 C95F5E1F 0000E900 00880000 FFFF9A00 9F680E76 FF1076FF 00000722 9A00A168 hÀ.."....v..v.h.......¡..Õ...^_è 0001C0
 89000002 DF9A5016 EE468006 76FF0876 FFD88E06 45881E56 57000064 C8000CCA ò..àd..WV.¡E..Ä.v..v..FŸ.P.Õ.... 0001E0

Dump of file SATURN:[PCCOMMON.DUMP.DLL]DADOMDF.TMP;1 on 18-APR-1990 10:40:40.82
File ID (555,17,0)   End of file block 60 / Allocated 60

Virtual block number 8 (00000008), 512 (0200) bytes

 000007C2 9A5016F2 46800676 FF0876FF 0217E9EA 46880006 E9037500 003DEA46 Fõ=..u.Õ...FõÕ...v..v..F·.P.ò... 000000
 0005329A 5016F646 800676FF 0876FF01 F6E9EA46 880006E9 03750000 30EA4689 .Fõ=..u.Õ...FõÕ-..v..v..F- P.2.. 000020
 88078926 02478926 0000B80C 5EC401D5 E9EA468B 0006E903 7500003D EA468900 ..Fõ=..u.Õ...FõÕf.ó^.¡..&.. &... 000040
 46C7000A EC46C701 AEE90000 065E9A0C 76FF0E76 FF0676FF 0876FF01 14E90A46 F.Õ...v..v..v..v..^...ÕÛ.úF.  úF 000060
 000DEC46 C70121E9 00000806 9A4B6A50 169C468D 0A76FFF6 76FFF876 FF0012E8 Ò...v½.v-.v..F..PjK.....Õf.úF§.. 000080
 EC46C700 FFE90000 08289A4B 6A50169C 46800A76 FFF676FF F876FF00 15E846C7 úFÒ...v½.v-.v..F..PjK.(...Õ..úF§ 0000A0
 C7000DE9 0000084A 9A4B6A50 169C468D 0A76FFF6 76FFF876 FF0019E8 46C70015 ..úFÒ...v½.v-.v..F..PjK.J...Õï.ú 0000C0
 8BE90000 05B79A4B 6A50169C 46800A76 FFF676FF F876FF00 14E846C7 0005EC46 F§..úFÒ...v½.v-.v..F..PjK.ñ...Õ£ 0000E0
 00003DEA 46890000 03089A0C 76FF0E76 FF046AF2 76FFF476 FFEE76FF F076FF00 ..vÞ.vŸ.v¶.v·j..v..v.......Fõ=.. 000100
 6A006A01 65680A76 FFF676FF F876FF00 F6E9EA46 8800FCE9 EA468800 06E90375 u.Õ...FõÕ•..FõÕ-..v½.v-.v.he.j.j 000120
 006AFA76 FF006A01 6A680A76 FFF676FF F876FFFA 46890000 08B39A00 6A006A00 .j.j..°....F².v½.v-.v.hj.j..v²j. 000140
 80E90375 00763D00 43E90081 E9EA468B 004CE9FE 5689FC46 89000002 9D9A006A j.......F•.V±ÕL..FõÕŸ.ÕC.=v.u.Õ. 000160
 1CE90375 00813DFF D7E9FEE3 E9037500 733DFED7 E9037500 6E3D0013 E90376FF .v.Õ..=n.u.Õ•±=s.u.ÕÞ±Õ•.=..u.Õ. 000180
 D80A7E81 FFB4E9FF 26E90375 000F3DFF 80E90375 00083DFE F2E90375 00873DFF .=..u.Õ·±=Ä.u.Õ..=Õ.u.Õ&.ÕÇ..~.Ä 0001A0
 76FFF076 FF0033E9 03750000 3D04C483 057B002A 9A50169C 4680004B E9037500 .u.ÕK..F..P.*.(..ó.=..u.Õ3..vÞ.v 0001C0
 EA468900 00FFFF9A 0C76FF0E 76FFF276 FFF476FF E876FF50 169C468D EC76FFEE Ÿ.vš.F..P.vÒ.v¶.v·.v..v.......Fõ 0001E0

Dump of file SATURN:[PCCOMMON.DUMP.DLL]DADOMDF.TMP;1 on 18-APR-1990 10:40:40.82
File ID (555,17,0)   End of file block 60 / Allocated 60

Virtual block number 9 (00000009), 512 (0200) bytes

 57892607 8926FE56 8BFC4688 0C5EC400 10E90019 E9EA4688 0006E903 7500003D =..u.Õ...FõÕ..Õ..ó^..F•.V±&..&.W 000000
 FF9A0876 FF0A76FF 088E0738 881E5657 000060C8 CBC95F5E 1F0000E9 EA468802 ..FõÕ...^_èÙà'..WV.|;..Ä.v..v... 000020
 9A5016FC 46800876 FF0A76FF 0104E9EC 46880006 E9037500 003DEC46 890000FF ....F§=..ū.Õ...F§Õ...v..v..F•.P. 000040
 5016F846 800876FF 0A76FF00 E3E9EC46 880006E9 03750000 30EC4689 0000076C l....F§=..u.Õ...F§ÕÕ..v..v..F½.P 000060
 16F4468D 0876FF0A 76FF00C2 E9EC4688 0006E903 75000030 EC468900 00078D9A ......F§=..u.Õ...F§Õò..v..v..F¶. 000080
 FE76FFF4 76FFF676 FF00A1E9 EC468800 06E90375 00003DEC 46890000 0748 9A50 P.K....F§=..u.Õ...F§ÕÀ..v-.v¶.v± 0000A0
 0078E9EC 46880006 E9037500 0030EC46 89000008 669A5016 EE468004 6AFC76FF .v=j..FŸ.P.f....F§=..u.Õ...F§Õx. 0000C0
 06E90375 00003DEC 46890000 032F9A50 16F2468D EE76FFF0 76FFF476 FFF676FF .v-.v¶.vÞ.vŸ.F·.P./....F§=..u.Õ. 0000E0
 FFF076FF F476FFF6 76FF0042 E9000088 0006E903 7401F27E 830051E9 EC468800 ..F§ÕQ..-·.t.Õ..|..ÕB..v-.v¶.vÞ. 000100
 FF0019E9 EC468800 06E90375 00003DEC 46890000 03619A50 16A0468D 026AEE76 vŸj..F..P.a....F§=..u.Õ...F§Õ... 000120
 C80006CA C95F5E1F 0000E9EC 46880000 039A9A50 16A0468D 0676FFF8 76FFFA76 v².v½.v..F..P......F§Õ...^_èò..à 000140
 0407C726 0E5EC407 89261246 88065EC4 0000FA46 C7D88E09 84881E56 570000B8 ¡..WV.¡...ÄúF²..ó^..F.&..ó*.&ú.. 000160
 E9E8468B 0006E903 7500003D E8468900 0009F29A 5016EE46 8D1476FF 1676FF00 ..v..v..FŸ.P.·.....FÒ=..u.Õ...FÒÕ 000180
 E8468800 06E90375 00003DE8 46890000 09B09A50 16FC468D 1476FF16 76FF03D0 Ä..v..v..F•.P.¯....FÒ=..u.Õ...FÒ 0001A0
 46880006 E9037500 003DE846 89000009 D19A5016 F2468D14 76FF1676 FF03AFE9 Õ£..v..v..F·.P.Ì....FÒ=..u.Õ...F 0001C0
 30E84689 00000A1B 9A5016F6 4680046A FC76FFFE 76FFEE76 FFF076FF 038EE9E8 ÒÕ...vÞ.vŸ.v±.v=j..F-.P......FÒ= 0001E0
```

```
Dump of file SATURN:[PCCOMMON.DUMP.DLL]DADOMDF.TMP;1 on 18-APR-1990 10:40:40.82
File ID (555,17,0)   End of file block 60 / Allocated 60

Virtual block number 10 (0000000A), 512 (0200) bytes

 05E79A50 16FF4886 8D4B6A76 6AF276FF F476FF03 65E9E846 880006E9 03750000 ..u.Õ...FÒÕe..v¶.v·jvjK..H..P.Ó. 000000
 E8468800 06E90375 00003DE8 46890000 FFFF9A50 1694468D EE76FFF0 76FF0000 ...vÞ.vŸ.F..P......FÒ=..u.Õ...FÒ 000020
 39F8568B F6468800 2FE90374 00003D04 C483091E 002A9A50 16FF4886 8D032FE9 Ö/...H..P.*....á.=..t.Ö/..F-.V¼9 000040
 07C7260E 5EC4000E E90374F8 460BF646 88000BE9 03759656 390008E9 03749446 F.t.Õ..9V.u.Õ...F-.F½t.Õ..á^.&ú. 000060
 0A76FF0C 76FF0196 682C6A00 FA36FF26 0088068E 006A006A 02EAE900 00B80003 ..¡..Õõ.j.j.....&.6ª.j,h...v..v. 000080
 76FFF076 FF0078E9 0375F856 390008E9 0374F646 39965688 94468800 000C689A .h....F..V.9F-t.Õ..9V¼u.Õx..vÞ.v 0000A0
 46880006 E9037500 003DE846 8900000C E69A5016 9C468002 6AF676FF F876FFEE Ÿ.v½.v-j..F..P.Ì....FÒ=..u.Õ...F 0000C0
 6A0026E9 03750000 3D08C483 001A0000 9A5016FF 48868050 169C468D 028EE9E8 ÒÕ...F..P..H..P......á.=..u.Õ&.j 0000E0
 E9E8468B 00000042 9A0A76FF 0C76FF01 96682B6A 00FA36FF 26008806 8E006A00 .j.....&.6ª.j+h...v..v..B....FÒÕ 000100
 6A9476FF 9676FFEE 76FFF076 FF023FE9 00008800 0307C726 0E5EC400 0EE90250 P.Õ..á^.&ú...j..Õ?..vÞ.vŸ.v..v.j 000120
 8BEA468B 0216E9E8 46880006 E9037500 003DE846 890000FF FF9A5016 EA468D16 ..Fõ.P......FÒ=..u.Õ...FÒÕ...Fõ. 000140
 76FF01A2 E9037502 47082607 8826985E C4049846 830004E9 9A568998 4689EC56 V$.F..V.Õ...F..á^.&..&.G.¡ ÕÅ..v 000160
 00003DE8 46890000 0A7A9A50 169C468D 026A37FF 260277FF 26985EC4 EE76FFF0 Þ.vŸá^.&.w.&.7j..F..P.z.... ¨Ò=.. 000180
 169C468D 01B6E9E8 46880000 00719AEA 76FFEC76 FFEE76FF F076FF00 17E90375 u.Õ...vÞ.vŸ.v$.võ.q....FÒÕN..:.. 0001A0
 26008806 8E006A00 6A0146E9 03740000 3D08C483 089C0000 9A5016FF 48868D50 P..H..P......á.=..t.ÕF.j.j.....& 0001C0
 BA0000B8 EE76FFF0 76FF0000 FFFF9A50 520D508A 0000B800 FA681D6A 00FA36FF .6ª.j.hª.¡..¤P.RP......vÞ.vŸ¡..¤ 0001E0

Dump of file SATURN:[PCCOMMON.DUMP.DLL]DADOMDF.TMP;1 on 18-APR-1990 10:40:40.82
File ID (555,17,0)   End of file block 60 / Allocated 60

Virtual block number 11 (0000000B), 512 (0200) bytes

 EA76FFEC 76FFEE76 FFF076FF 0034E903 7500003D E8468900 00FFFF9A 5052FFFF ..RP......FÒ=..u.Õ4..vÞ.vŸ.v$.võ 000000
 0E349A0A 76FF0C76 FF019668 246A00FA 36FF2600 88068E00 6A006A00 00FFFF9A .....j.j.....&.6ª.j$h...v..v..4. 000020
 FF9A046A FC76FFFE 76FF236A 9476FF96 76FFEE76 FFF076FF 012AE9E8 46880000 ...FÒÕ*..vÞ.vŸ.v..v.j#.v±.v=j... 000040
 FFEE76FF F076FF00 000E3F9A EE76FFF0 76FF0022 E9037500 003DE846 890000FF ....FÒ=..u.Õ"..vÞ.vŸ.?....vÞ.vŸ. 000060
 37FF2602 77FF2698 5EC4EE76 FFF076FF 00E2E9E8 46880000 0E179AEA 76FFEC76 v$.võ......FÒÕã..vÞ.vŸá^.&.w.&.7 000080
 EE76FFF0 76FF003F E9037500 003DE846 890000FF FF9A046A FC76FFFE 76FF096A j..v±.v=j.......FÒ=..u.Õ7..vÞ.vŸ 0000A0
 0C76FF01 9668226A 00FA36FF 26008806 8E006A00 6A00000E 7D9AEA76 FFEC76FF .v$.võ.)...j.j.....&.6ª.j"h...v. 0000C0
 9AEE76FF F076FF00 79E9E846 880000FF FF9AEE76 FFF076FF 000008F1 9A0A76FF .v..þ....vÞ.vŸ......FÒÕy..vÞ.vŸ. 0000E0
 FE48E900 03E90001 FA46C700 5DE9E846 880006E9 03750000 3DE84689 0000FFFF .....FÒ=..u.Õ...FÒÕ].úFª..Õ..ÕK± 000100
 1476FF16 76FF0032 E9037401 FA7E8300 0000029A EA76FFEC 76FFEE76 FFF076FF .vÞ.vŸ.v$.võ......-ª.t.Õ2..v..v. 000120
 9A009F68 1476FF16 76FF0000 0EB09A00 A1681476 FF1676FF 00000EA2 9A00A068 h...Å....v..v.hÅ..¯....v..v.h... 000140
 1E565700 0002C800 12CAC95F 5E1F0000 E9E8468B 000107C7 260E5EC4 00000706 ....á^.&ú....FÒÕ...^_èÒ..à...WV. 000160
 0676FF08 76FF0A76 FF0C76FF 0E76FF10 76FF1276 FF1476FF 1676FFD8 8E0AB7B8 ¡ñ..Ä.v..v..v..v..v..v..v..v..v. 000180
 1476FF16 76FF004C E9FE468B 0006E903 7500003D FE468900 00FFFF9A 006A006A j.j.......F±=..u.Õ...F±ÕL..v..v. 0001A0
 9A00A068 1476FF16 76FF0030 E9FE4688 0006E903 7500003D FE468900 00098F9A ......F±=..u.Õ...F±Õ0..v..v.h... 0001C0
 00000E94 9A009F68 1476FF16 76FF0000 0F4C9A00 A1681476 FF1676FF 00000F3E >....v..v.hÅ..L....v..v.h....... 0001E0

Dump of file SATURN:[PCCOMMON.DUMP.DLL]DADOMDF.TMP;1 on 18-APR-1990 10:40:40.82
File ID (555,17,0)   End of file block 60 / Allocated 60

Virtual block number 12 (0000000C), 512 (0200) bytes

 76FF0000 F846C7D8 8E0ED1B8 1E565700 0068C800 12CAC95F 5E1F0000 E90000B8 ¡..Õ...^_èÒ..àh..WV.¡Ì..ÄúF½...v 000000
 E9EA468B 0006E903 7500003D EA468900 0004129A 50169846 8D0676FF 0876FF0A ..v..v..F̄..P......Fõ=..u.Õ...FõÕ 000020
 EA468800 06E90375 00003DEA 46890000 0ADD9A50 16EC468D 0876FF0A 76FF0164 d..v..v..F&.P.Ì....Fõ=..u.Õ...Fõ 000040
 46880006 E9037500 003DEA46 8900000A FE9A5016 F0468008 76FF0A76 FF0143E9 ÕC..v..v..FÞ.P.±....Fõ=..u.Õ...F 000060
 880006E9 03750000 3DEA4689 0000081F 9A5016F4 46800876 FF0A76FF 0122E9EA õÕ"..v..v..F¶.P......Fõ=..u.Õ... 000080
 0006E903 7500003D EA468900 0003C79A 5016FA46 800876FF 0A76FF01 01E9EA46 FõÕ...v..v..Fª.P.ú....Fõ=..u.Õ.. 0000A0
 16FC4680 5016E846 8D1E6AF0 76FFF276 FFFA76FF EC76FFEE 76FF00E0 E9EA468B .FõÕÅ..vŸ.v$.vª.v·.vÞj..FÒ.P.F=. 0000C0
 880000FF FF9AFC76 FFFE76FF FA76FF00 14E90375 00003DEA 46890000 FFFF9A50 P......Fõ=..u.Õ...vª.v±.v=...... 0000E0
 76FFEE76 FF0085E9 0372F846 39E8468B F846FF00 03E90000 F846C700 A1E9EA46 FõÕÅ.úF½..Õ...F½.FÒ9F½r.Õ...vŸ.v 000100
 0030EA46 890000FF FF9A5016 9C468D30 FF260270 FF26FC76 C403E3C1 F85E8BEC &.^½èÐ.áv=&.p.&.0.F..P......Fõ=. 000120
 5EC403E6 C1F8768B 9876FF9A 76FFF476 FFF676FF 005AE9EA 46880006 E9037500 .u.Õ...FõÕZ..v-.v¶.v..v..v½èl.á^ 000140
 FC76C403 E3C1F85E 8850169C 46800470 FF26FC5E C403E6C1 F8768806 70FF26FC =&.p..v½èl.á^=&.p..F..P.^½èÐ.áv= 000160
 FF60E900 09E9EA46 880006E9 03750000 3DEA4689 0000FFFF 9A30FF26 0270FF26 &.p.&.0......Fõ=..u.Õ...FõÕ..Õm. 000180
 46C70000 FE46C7D8 8E0F65B8 1E565700 00CAC800 06CAC95F 5E1F0000 E9EA468B .FõÕ...^_èÒ..àÒ..WV.¡e..ÄúF±..úF 0001A0
 5EC40004 07C7260E 5EC4EE46 89F04689 0000B800 00D446C7 00000246 C70000EC &..úF0..ũFå..¡...FÞ.FŸá^.&ú...á^ 0001C0
 00003DD8 46890000 0F7D9A50 16FF3686 8D1276FF 1476FF16 76FF00D4 07C72606 .&ú.&..v..v..v...6..P.)....FÅ=.. 0001E0
```

Dump of file SATURN:[PCCOMMON.DUMP.DLL]DADOMDF.TMP;1 on 18-APR-1990 10:40:40.82
File ID (555,17,0)   End of file block 60 / Allocated 60

Virtual block number 13 (0000000D), 512 (0200) bytes

```
11AC9A0A 76FF0C76 FF019668 216A00FA 36FF2600 88068E00 6A006A00 23E90375 u.Õ#.j.j.....&.6ª.jlh...v..v..¯. 000000
03750000 3D084689 00000F9E 9A5016E4 468D1476 FF1676FF 0627E908 46880000 ...FÄÕ'..v..v..FÕ.P......FÄ=..u. 000020
000011EA 9A0A76FF 0C76FF01 9668216A 00FA36FF 26008806 8E006A00 6A0023E9 Õ#.j.j.....&.6ª.jlh...v..v..õ... 000040
23E90375 00003D08 46890000 0FBF9A50 16F2468D 1476FF16 76FF05E9 E9084688 .FÄÕÕ..v..v..F·.P.¢....FÄ=..u.Õ# 000060
46880000 12289A0A 76FF0C76 FF019668 216A00FA 36FF2600 88068E00 6A006A00 .j.j.....&.6ª.jlh...v..v..(....F 000080
6A0023E9 03750000 3D084689 00000FE0 9A5016E8 468D1476 FF1676FF 05ABE908 ÄÕ¨..v..v..FÒ.P.Å....FÄ=..u.Õ#.j 0000A0
E9084688 000012E0 9A0A76FF 0C76FF01 9668216A 00FA36FF 26008806 8E086A00 .j.....&.6ª.jlh...v..v..Å....FÄÕ 0000C0
000468E8 76FFEA76 FF000012 599A5016 DE468D4B 6A000268 E876FFEA 76FF056D m..võ.vÒhØ.jK.FB.P.Y....võ.vÒhå. 0000E0
6A006A00 6A006A01 606800D8 68E876FF EA76FF00 00086E9A 5016FF3A 86804B6A jK..:..P.n....võ.vÒhÄ.h'.j.j.j.j 000100
7E830022 E9037400 003004C4 830C4200 2A9A5016 DE468D06 46890000 08969A00 .......Fø.FB.P.*.B..á.=..t.Õ"..~ 000120
009AE9EC 46890646 88D24689 48064688 0007E9D2 46890646 880009E9 03740006 ø.t.Õ...Fø.FØÕ...FøH.FØ.Fø.FšÕ.. 000140
26008806 8E006A00 6A0023E9 03740000 3D0000FF FF9A5016 EE468D50 16DE468D .FB.P.FŸ.P.....=..t.Õ#.j.j.....& 000160
EE4639D6 46880485 E9000088 00001365 9A0A76FF 0C76FF01 9668236A 00FA36FF .6ª.j#h...v..v..e...¡..Õç..Fø9FŸ 000180
E9D24689 D6468800 09E90374 00067E83 0022E903 74F04608 EE468800 0BE90376 v.Õ...FŸ.FÞt.Õ"..~ø.t.Õ...Fø.FØÕ 0001A0
7400F07E 830015E9 037401EE 7E830028 E9EC4689 D64688D2 46894806 46880007 ...FøH.FØ.Fø.FšÕ(..~Ÿ.t.Õ...~Þ.t 0001C0
068E006A 006AD246 89EC4689 48EE4688 000AE9EC 46890246 89000088 000CE903 .Õ..¡...FØ.FšÕ...FŸH.Fš.FØj.j... 0001E0
```

Dump of file SATURN:[PCCOMMON.DUMP.DLL]DADOMDF.TMP;1 on 18-APR-1990 10:40:40.82
File ID (555,17,0)   End of file block 60 / Allocated 60

Virtual block number 14 (0000000E), 512 (0200) bytes

```
B8E476FF E676FF00 0013A09A 50521373 BA0000B8 00FA681D 6A00FA36 FF260088 ..&.6ª.j.hª.¡..¤s.RP......vl.võ¡ 000000
26008806 8E006A00 6A0023E9 03750000 3D084689 00000055 9A505200 3DBA0000 ..¤=.RP.U....FÄ=..u.Õ#.j.j.....& 000020
037400EC 7E8303F5 E9084688 0000008E 9A0A76FF 0C76FF01 9668246A 00FA36FF .6ª.j$h...v..v.......FÄÕ%..~š.t. 000040
1921E99A E476FFE6 76FF5016 FF3A868D F276FFF4 76FF016A 5016F646 8D0179E9 Õy..F-.Pj..v¶.v·..:..P.vl.võ.Õl. 000060
068E006A 006A0000 00C59AE4 76FFE676 FF002EE9 03750000 3D084689 12C48306 ..á..FÄ=..u.Õ...vl.võ.é...j.j... 000080
D67E8303 92E9D846 88000014 5F9A0A76 FF0C76FF 01966825 6A00FA36 FF260088 ..&.6ª.j%h...v..v.._....FÄÕ...~ø 0000A0
1686468D 5016FE46 8D0276FF FF3686FF FF3886FF E876FFEA 76FF0085 E9037500 .u.Õç..võ.vÒ.Ñ8..Ñ6¯..vØ.F±.P.F.. 0000C0
FF260088 068E006A 006A002E E9037500 003D0846 89000015 4D9A5016 FA468D50 P.Fª.P.M....FÄ=..u.Õ..j.j.....&. 0000E0
46880000 14C19AE4 76FFE676 FF000014 B69A0A76 FF0C76FF 01966822 6A00FA36 6ª.j"h...v..v..Ñ....vl.võ.è....F 000100
83165722 809AE476 FFE676FF F276FFF4 76FFF676 FFF876FF 016A016A 032BE908 ÄÕ+.j.j..v½.v~.v¶.v·.vl.võ.."W.. 000120
FF019668 266A00FA 36FF2600 88068E00 6A006A00 2EE90375 00003D08 468910C4 á..FÄ=..u.Õ..j.j.....&.6ª.j&h... 000140
76FFEA76 FF02D4E9 D8468800 00151F9A E476FFE6 76FF0000 15149A0A 76FF0C76 v..v.......vl.võ......FÄÕå..võ.v 000160
0000170E 9AF676FF F876FF50 16FF3A86 8DFE76FF EC76FFFF 3686FFFF 3886FFE8 Ò.Ñ8..Ñ6..vš.v±..:..P.v½.v~..... 000180
0C76FF01 9668276A 00FA36FF 26008806 8E006A00 6A002EE9 03750000 3D084689 .FÄ=..u.Õ..j.j.....&.6ª.j'h...v. 0001A0
FFEA76FF 021FE902 76E9D846 88000015 639AE476 FFE676FF 00001580 9A0A76FF .v.......vl.võ.c....FÄÕv.Õ...võ. 0001C0
00FFFF9A 5016FA46 8D501686 468D5016 FE468D02 76FFFF36 B6FFFF38 B6FFE876 vÒ.Ñ8..Ñ6..vØ.F±.P.F..P.Fª.P.... 0001E0
```

Dump of file SATURN:[PCCOMMON.DUMP.DLL]DADOMDF.TMP;1 on 18-APR-1990 10:40:40.82
File ID (555,17,0)   End of file block 60 / Allocated 60

Virtual block number 15 (0000000F), 512 (0200) bytes

```
26008806 8E006A00 6A000015 B49AE476 FFE676FF 002EE903 7500003D D8468900 ..FÄ=..u.Õ...vl.võ.Ç...j.j.....& 000000
E476FFE6 76FF0215 E908468B 00001501 9A0A76FF 0C76FF01 9668216A 00FA36FF .6ª.jlh...v..v..l....FÄÕ...vl.võ 000020
E676FF00 2EE90375 00003D08 46890000 08489A50 16DA468D 036AFA76 FFFC76FF .v=.vªj..FÕ.P.H....FÄ=..u.Õ...vl 000040
0A76FF0C 76FF0196 68226A00 FA36FF26 0088068E 006A006A 00001605 9AE476FF .võ.....j.j.....&.6ª.j"h...v..v. 000060
1F9A5016 D446B006 6AFA76FF FC76FFE4 76FFE676 FF01C4E9 D8468800 0016229A .ª....FÄÕá..vl.võ.v=.vªj..Få.P.. 000080
88068E00 6A006A00 00166E9A E476FFE6 76FF002E E9037500 003D0846 8900000C ....FÄ=..u.Õ...vl.võ.n...j.j.... 0000A0
39EC4688 0173E908 46880000 16889A0A 76FF0C76 FF019668 226A00FA 36FF2600 .&.6ª.j"h...v..v.......FÄÕs..Fš9 0000C0
76FF5016 FF3A868D DA76FFDC 76FFD476 FF5016F6 468D0446 FF0003E9 0375D246 FØu.Õ...Få.F-.P.vå.vÉ.vÕ..:..P.v 0000E0
16E39AE4 76FFE676 FF002EE9 03750000 3D084689 12C48316 AF21E99A E476FFE6 l.võ.Õl£..á..FÄ=..u.Õ...vl.võ.D. 000100
88000016 D89A0A76 FF0C76FF 01966825 6A00FA36 FF260088 068E006A 006A0000 ..j.j.....&.6ª.j%h...v..v..Ä.... 000120
CF22809A E476FFE6 76FFDA76 FFDC76FF F676FFF8 76FFD476 FF016A01 0AE9D846 FÄÕ..j..vå.v½.v~.vÉ.vÕ.vl.võ.."ü 000140
9668266A 00FA36FF 26008806 8E006A00 6A002EE9 03750000 3D084689 10C48313 ..á..FÄ=..u.Õ..j.j.....&.6ª.j&h. 000160
EA76FF00 B2E9D846 88000017 419AE476 FFE676FF 00001736 9A0A76FF 0C76FF01 ..v..v..6....vl.võ.A....FÄÕý..võ 000180
10089AF6 76FFF876 FF5016FF 3A868DFE 76FFEC76 FFFF3686 FFFF3886 FFE876FF .vÒ.Ñ8..Ñ6..vš.v±..:..P.v½.v~.Ä. 0001A0
FF019668 276A00FA 36FF2600 88068E00 6A006A00 2EE90375 00003D08 46890000 ...FÄ=..u.Õ..j.j.....&.6ª.j'h... 0001C0
76FFE676 FF0054E9 D8468800 0013E69A E476FFE6 76FF0000 116E9A0A 76FF0C76 v..v..n....vl.võ.l....FÄÕT..vl.v 0001E0
```

Dump of file SATURN:[PCCOMMON.DUMP.DLL]DADOMDF.TMP;1 on 18-APR-1990 10:40:40.82
File ID (555,17,0)   End of file block 60 / Allocated 60

Virtual block number 16 (00000010), 512 (0200) bytes

FF000307 C7260E5E C40038E9 D8468800 06E90375 000030D8 46890000 0E509AE4 δ.P....FÄ=..u.Õ...FÄÕ8.á^.&ú.... 000000
76FF1676 FF000017 959A00A1 681476FF 1676FF00 0017879A 00A06814 76FF1676 v..v.h........v..v.hÀ.......v..v 000020
1105B81E 56570000 D2C80012 CAC95F5E 1F0000E9 D8468800 000F309A 009F6814 .h...0....FÄÕ...^_èò..à@..WV.¡.. 000040
46890000 880000CA 46C70000 EC46C700 00F246C7 0000EA46 C70000FE 46C7D88E .ÄúF±..úFõ..úF·..ÜF$..úFò..¡...F 000060
2E868D12 76FF1476 FF1676FF 000407C7 260E5EC4 000407C7 26065EC4 EE4689F0 Þ.FŸá^.&ú.Å.á^.&ú....v..v..v.... 000080
8D1476FF 1676FF07 71E9D246 880006E9 03750000 3DD24689 00001146 9A5016FF ..P.F....F@=..u.Õ...F@Õq..v..v.. 0000A0
1476FF16 76FF0750 E9D2468B 0006E903 75000030 D2468900 0011849A 50160E46 F8.P......F@=..u.Õ...F@ÕP..v..v. 0000C0
76FF1676 FF072FE9 D2468800 06E90375 00003002 46890000 11C29A50 16E2468D .Fã.P.ô....F@=..u.Õ...F@Õ/..v..v 0000E0
FFE876FF 070EE9D2 46880006 E9037500 003D0246 89000012 009A5016 E6468D14 ..F¦.P......F@=..u.Õ...F@Õ...vÒ. 000100
D868E676 FFE876FF F4468900 00189E9A 006A006A 006A006A 01656800 D868E676 vlhÄ.he.j.j.j.j.......F¶.vÒ.vlhÄ 000120
D468E676 FFE876FF F85689F6 46890000 19509A00 6A006AF4 76FF006A 016A6800 .hj.j..v¶j.j..P....F-.V½.vÒ.vlhå 000140
439A5016 D4468D4B 6A00D268 E676FFE8 76FF0000 18CF9A50 16FF3286 8D486A00 .jK..2..P.ü....vÒ.vlh@.jK.Få.P.C 000160
068E006A 006A0023 E9037400 003D0000 12B89A50 16EE468D 50160446 80000012 ....Få.P.FŸ.P.É...=..t.Õ#.j.j... 000180
EE468B06 6DE90001 B8000019 319A0A76 FF0C76FF 0196682D 6A00FA36 FF260088 ..&.6ª.j·h...v..v..1...¡..Õm..FŸ 0001A0
0A76FF0C 76FF0196 682D6A00 FA36FF26 0088068E 006A006A 0023E903 74F0460B .FÞt.Õ#.j.j.....&.6ª.j-h...v..v. 0001C0
9A006A00 6A006A00 6A016068 00D868E6 76FFE876 FF063FE9 00018800 001A179A .....¡..Õ?..vÒ.vlhÄ.h'.j.j.j.j.. 0001E0

Dump of file SATURN:[PCCOMMON.DUMP.DLL]DADOMDF.TMP;1 on 18-APR-1990 10:40:40.82
File ID (555,17,0)   End of file block 60 / Allocated 60

Virtual block number 17 (00000011), 512 (0200) bytes

0AE90373 EE463900 08E90376 0017E903 73F05639 D22BCC46 8BCC4689 00001272 r....Fä.Fä+@9VÞs.Õ..v.Õ..9FŸs.Õ. 000000
FF2EB6FF FF30B6FF E676FFE8 76FFEA46 8948EE46 880007E9 EA468948 CC468800 ..FäH.FõÕ...FŸH.Fõ.vÒ.vÌ.ÑO..Ñ.. 000020
03750000 3DD24689 00001437 9A5016FA 468D5016 FF7EB68D 5016FE46 8DEA76FF .võ.F±.P..~..P.Fª.P.7....F@=..u. 000040
8D00C4E9 0374F856 3900CCE9 0374F646 39FC5688 FA468805 C1E9D246 880006E9 Õ...F@Õè..Fª.V=9F-t.Õä.9V½t.Õá.. 000060
C7260E5E C40011E9 03740000 3D08C483 12810000 9A5016FF 32868D50 16FF7E86 .~..P..2..P......á.=..t.Õ..á^.&ú 000080
00B800FA 681F6A00 FA36FF26 0088068E 006A006A 0097E905 81E9D246 8B000107 ....F@Õ..Õ..j.j.....&.6ª.j.hª.¡. 0000A0
46890000 13789A50 5213608A 0000B8DE 76FFE076 FF000014 039A5052 1A258A00 .¤X.RP......vÅ.vB¡..¤'.RP.x....F 0000C0
32868D02 6AF676FF F876FFDE 76FFE076 FF053BE9 D2468800 06E90375 00003DD2 @=..u.Õ...F@Õ;..vÅ.vB.v½.v-j...2 0000E0
46880000 146A9ADE 76FFE076 FF0011E9 03750000 3DD24689 0000FFFF 9A5016FF ..P......F@=..u.Õ...vÅ.vB.j....F 000100
04EAE9D2 46880006 E9037500 003DD246 89000017 529ADE76 FFE076FF 0506E9D2 @Õ...vÅ.vB.R....F@=..u.Õ...F@Õõ. 000120
003DD246 8900001B 239A5016 DA468D03 6AF676FF F876FFDE 76FFE076 FF043AE9 Õ:..vÅ.vB.v½.v-j..FÕ.P.#....F@=. 000140
9A5016F2 468D066A F676FFF8 76FFDE76 FFE076FF 048EE9D2 46880006 E9037500 .u.Õ...F@Õf..vÅ.vB.v½.v-j..F·.P. 000160
76FFF876 FFDE76FF E076FF04 95E90246 880006E9 03750000 3DD24689 00001AFA ª....F@=..u.Õ...F@Õ...vÅ.vB.v½.v 000180
FF0468E9 D2468800 06E90375 00003DD2 46890000 15EF9A50 16FF7E86 8D026AF6 -j...-..P.ÿ....F@=..u.Õ...F@Õk.. 0001A0
E9037500 003DD246 89000015 9E9A5016 CE468D03 6AFA76FF FC76FFDE 76FFE076 vÅ.vB.v=.vªj..Fö.P......F@=..u.Õ 0001C0
00001AD0 9A5016EC 468D066A FA76FFFC 76FFDE76 FFE076FF 0442E9D2 46880006 ...F@Õ8..vÅ.vB.v=.vªj..F$.P.Å... 0001E0

Dump of file SATURN:[PCCOMMON.DUMP.DLL]DADOMDF.TMP;1 on 18-APR-1990 10:40:40.82
File ID (555,17,0)   End of file block 60 / Allocated 60

Virtual block number 18 (00000012), 512 (0200) bytes

390028E9 0374CE46 39F8568B F6468B04 19E9D246 880006E9 03750000 3DD24689 .F@=..u.Õ...F@Õ...F-.V½9Föt.Õ+.9 000000
9A0A76FF 0C76FF01 96682A6A 00FA36FF 26008806 8E006A00 6A0023E9 0374D056 VÅt.Õ#.j.j.....&.6ª.j*h...v..v.. 000020
0171E903 740C5639 0179E903 740A4639 D0568BCE 468803E0 E9D2468B 00001BCB ù....F@ÕÅ..Fö.VÅ9FÕt.Õy.9VÉt.Õq. 000040
FF00001D 3C9A5052 1B09BA00 00B800FA 681F6A00 FA36FF26 0088068E 006A006A j.j.....&.6ª.j.hª.¡..¤).RP.<.... 000060
D2468800 06E90375 00003D02 46890000 1D4F9A50 521D37BA 0000B8DE 76FFE076 vÅ.vB¡..¤7.RP.O....F@=..u.Õ...F@ 000080
003DD246 8900001C E29A5016 EC468D06 6AF676FF F876FFDE 76FFE076 FF0387E9 Õ...vÅ.vB.v½.v-j..F$.P.ã....F@=. 0000A0
E90377F2 4639EC46 880353E9 D2468800 001C669A DE76FFE0 76FF0011 E9037500 .u.Õ...vÅ.vB.f....F@ÕS..F$9F·w.Õ 0000C0
9023B39A DE76FFE0 76FFEC76 FFF276FF DA76FFDC 76FFF676 FFF876FF 016A0041 A.j..v½.v-.vÉ.vÕ.v·.v$.vÅ.vB.°#. 0000E0
030AE9D2 46880000 1CA79ADE 76FFE076 FF0011E9 03750000 3DD24689 12C4831C ..á..F@=..u.Õ...vÅ.vB.I....F@Õ.. 000100
23B39ADE 76FFE076 FFF276FF EC76FFDA 76FFDC76 FFF676FF F876FF00 6A003EE9 Õ>.j..v½.v-.vÉ.vÕ.v$.v·.vÅ.vB.°# 000120
C9E9D246 8800001C F89ADE76 FFE076FF 0011E903 75000030 D2468912 C4831DB3 °..á..F@=..u.Õ...vÅ.vB.½....F@Õè 000140
E076FF00 35E90375 00003D08 C48319DE 00009A50 16FF3286 8D5016FF 7E868002 ...~..P..2..P...B..á.=..u.Õ5..vÅ 000160
11E90375 00003D02 46890000 1E569A50 16FF3286 8D026AF6 76FFF876 FFDE76FF .vB.v½.v-j...2..P.V....F@=..u.Õ. 000180
D2468900 001EB89A DE76FFE0 76FF0278 E9D24688 00001D8F 9ADE76FF E076FF00 ..vÅ.vB......F@Õx..vÅ.vB.¡....F@ 0001A0
1F6A00FA 36FF2600 88068E00 6A006A01 ACE9025C E9D24688 0006E903 75000030 =..u.Õ...F@Õ\.Õ¯.j.j.....&.6ª.j. 0001C0
2A9A5052 1A12BA00 00B8DE76 FFE076FF 00001903 9A50521D 4ABA0000 8800FA68 hª.¡..¤J.RP......vÅ.vB¡..¤..RP.* 0001E0

```
Dump of file SATURN:[PCCOMMON.DUMP.DLL]DADOMDF.TMP;1 on 18-APR-1990 10:40:40.82
File ID (555,17,0)   End of file block 60 / Allocated 60

Virtual block number 19 (00000013), 512 (0200) bytes

 F676FFF8 76FFDE76 FFE076FF 0216E9D2 46880006 E9037500 0030D246 8900001A ....F0=..u.Õ...F0Õ...vÅ.v8.v½.v- 000000
 CA9ADE76 FFE076FF 0011E903 7500003D D2468900 00FFFF9A 5016FF32 8680026A j...2..P......F0=..u.Õ...vÅ.v8.ò 000020
 DE76FFE0 76FFDA76 FFDC76FF F676FFF8 76FFF276 FF006A01 E1E90246 8800001D ....F0ÕÅ.j..v·.v½.v-.vÉ.vÕ.vÅ.v8 000040
 46880000 1E019ADE 76FFE076 FF0011E9 03750000 3D024689 10C4831E 9022809A .."...é..F0=..u.Õ...vÅ.v8......F 000060
 89000000 AF9A036A F676FFF8 76FF136A DA76FFDC 76FFDE76 FFE076FF 01A6E9D2 0Õ1..vÅ.v8.vÉ.vÕj..v½.v-j..£.... 000080
 76FFE076 FF016FE9 D2468800 001E389A DE76FFE0 76FF0011 E9037500 003DD246 F0=..u.Õ...vÅ.v8.8....F0Õo..vÅ.v 0000A0
 11E90375 00003DD2 46890000 00FB9A03 6AF676FF F876FF13 6ACE76FF D076FFDE 8.vÅ.vöj..v½.v-j..«....F0=..u.Õ. 0000C0
 066AF676 FFF876FF DE76FFE0 76FF0138 E9D2468B 00001E6C 9ADE76FF E076FF00 ..vÅ.v8.l....F0Õ8..vÅ.v8.v½.v-j. 0000E0
 00001EA7 9ADE76FF E076FF00 11E90375 00003DD2 46890000 1A549A50 16EC468D .F§.P.T....F0=..u.Õ...vÅ.v8.Ì... 000100
 22809ADE 76FFE076 FFCE76FF D076FFF6 76FFF876 FFEC76FF 016A0104 E9D2468B .F0Õ..j..vš.v½.v-.vÅ.vö.vÅ.v8.." 000120
 C9E9D246 8800001A 6A9ADE76 FFE076FF 0011E903 7500003D D2468910 C483148D ...é..F0=..u.Õ...vÅ.v8.j....F0Õè 000140
 E876FF00 ADE9D246 880006E9 03750000 3D024689 00001A7B 9ADE76FF E076FF00 ..vÅ.v8.(....F0=..u.Õ...F0ÕÜ..vÕ 000160
 14EC9AF6 76FFF876 FF5016FF 32868DFE 76FFEA76 FFFF2EB6 FFFF3086 FFE676FF .vl.ÑO..Ñ...vÕ.v±..2..P.v½.v-.š. 000180
 76FF006C E9D2468B 00001C1D 9ADE76FF E076FF00 11E90375 00003DD2 46890000 ...F0=..u.Õ...vÅ.v8......F0Õl..v 0001A0
 11E90375 00003DD2 46890000 FFFF9A50 40F4468B FF2EB6FF FF3086FF E676FFE8 Õ.vl.ÑO..Ñ...F¶@P......F0=..u.Õ. 0001C0
 1476FF16 76FF0003 07C7260E 5EC40038 E9D2468B 00001F04 9ADE76FF E076FF00 ..vÅ.v8......F0Õ8.é^.&ú....v..v. 0001E0

Dump of file SATURN:[PCCOMMON.DUMP.DLL]DADOMDF.TMP;1 on 18-APR-1990 10:40:40.82
File ID (555,17,0)   End of file block 60 / Allocated 60

Virtual block number 20 (00000014), 512 (0200) bytes

 9A009F68 1476FF16 76FF0000 1F709A00 A1681476 FF1676FF 00001F62 9A00A068 h...b....v..v.hÅ..p....v..v.h... 000000
 F646C7D8 8E17AEB8 1E565700 0020C800 12CAC95F 5E1F0000 E9D2468B 00001779 y....F0Õ...^_èò..à ..WV.¡Ú..ÄúF- 000020
 1276FF14 76FF1676 FF000407 C726065E C4000407 C7260E5E C40000FE 46C70000 ..úF±..é^.&ú...é^.&ú.å..v..v..v. 000040
 76FF1676 FF0217E9 E4468800 06E90375 00003DE4 46890000 17F49A50 16E0468D .FÅ.P.¶....Fõ=..u.Õ...FõÕ...v..v 000060
 FF1676FF 01F6E9E4 46880006 E9037500 0030E446 89000018 159A5016 E6468D14 ..Fl.P......Fõ=..u.Õ...FõÕ-..v.. 000080
 1676FF01 D5E9E446 880006E9 03750000 3DE44689 00001836 9A5016EA 46801476 v..Fõ.P.6....Fõ=..u.Õ...FõÕ(..v. 0000A0
 76FF01B4 E9E4468B 0006E903 7500003D E4468900 0018579A 5016EE46 8D1476FF .v..FŸ.P.W....Fõ=..u.Õ...FõÕÇ..v 0000C0
 EE76FFF0 76FFFC46 89000020 609A006A 006A006A 006A0165 68000868 EE76FFF0 Þ.vŸhÄ.he.j.j.j.j..' ...F•.vÞ.vŸ 0000E0
 E676FFE8 76FFF456 89F24689 000021A0 9A006A00 6AFC76FF 006A016A 68000868 hÄ.hj.j..v•j.j...l...F·.V¶.vÕ.vl 000100
 E4468800 06E90375 00003DE4 46890000 1AA79A50 16F8468D 036AF276 FFF476FF .v¶.v·j..F%.P.Ì....Fõ=..u.Õ...Fõ 000120
 003DE446 8900001B 4C9A5016 F6468D06 6AF276FF F476FFE6 76FFE876 FF014FE9 ÕO..vÕ.vl.v¶.v·j..F-.P.L....Fõ=. 000140
 00B800FA 681E6A00 FA36FF26 0088068E 006A006A 0126E9E4 46880006 E9037500 .u.Õ...FõÕ&.j.j.....&.6ª.j.hª.j. 000160
 46890000 1BDE9A50 521BC68A 000088E6 76FFE876 FF00001B 909A5052 20E5BA00 .¤l RP......vÕ.vl¡..¤ó.RP.8....F 000180
 F876FFFA 76FFF276 FFF476FF F676FF00 6A00E3E9 E4468800 06E90375 00003DE4 õ=..u.Õ...FõÕD.j..v-.v¶.v·.vª.v½ 0001A0
 9AE676FF E876FF00 11E90375 00003DE4 468910C4 8321B022 809AE676 FFE876FF .vÕ.vl.."¯!.á..Fõ=..u.Õ...vÕ.vl. 0001C0
 003DE446 890000FF FF9AF276 FFF476FF E676FFE8 76FF00A8 E9E4468B 0000215D ]!...FõÕ´..vÕ.vl.v¶.v·......Fõ=. 0001E0

Dump of file SATURN:[PCCOMMON.DUMP.DLL]DADOMDF.TMP;1 on 18-APR-1990 10:40:40.82
File ID (555,17,0)   End of file block 60 / Allocated 60

Virtual block number 21 (00000015), 512 (0200) bytes

 1D099AE6 76FFE876 FF007BE9 E4468800 001F389A E676FFE8 76FF0011 E9037500 .u.Õ...vÕ.vl.8....FõÕ(..vÕ.vl... 000000
 76FFF076 FF000107 C7260E5E C4005FE9 E4468800 06E90375 00003DE4 46890000 ...Fõ=..u.Õ...FõÕ_.é^.&ú....vÞ.v 000020
 0F5D9A00 D8681476 FF1676FF 00001881 9A006A00 6A006A00 6A016E68 000868EE ŸhÄ.hn.j.j.j.j........v..v.hÄ..]. 000040
 76FF0000 21D89A00 A1681476 FF1676FF 000021CA 9A00A068 1476FF16 76FF1C4F O..v..v.h...òl...v..v.hÅ..Äl...v 000060
 1E565700 0002C800 12CAC95F 5E1F0000 E9E4468B 00001F54 9A009F68 1476FF16 ..v.h...T....FõÕ...^_èò..à...WV. 000080
 04C4831C C0002A9A 0A76FF0C 76FF0789 26024789 260000B8 145EC408 8E1F8988 ¡...Äé^.¡..&.G.&...v..v..*.å..é. 0000A0
 0A76FF0C 76FF1476 FF1676FF 0E76FF10 76FF0676 FF0876FF 005DE903 75000030 =..u.Õ]..v..v..v..v..v..v..v..v. 0000C0
 5EC40676 FF0876FF 0033E9FE 46880006 E9037500 0030FE46 890000FF FF9A006A j.......F±=..u.Õ...F±Õ3..v..v.é^ 0000E0
 880006E9 03750000 3DFE4689 00001C07 9A501612 4680066A 37FF2602 77FF2614 .&.w.&.7j..F..P......F±=..u.Õ... 000100
 00FE46C7 D88E21F1 881E5657 00000EC8 CBC95F5E 1F0000E9 FE468800 06E9FE46 F±Õ...F±Õ...^_èùà...WV.¡þl.ÄúF±. 000120
 46890000 0C979A50 16FA468D 136A0A76 FF0C76FF 0676FF08 76FF0000 F846C700 .úF%...v..v..v̄..v.j..Fª.P......F 000140
 46830004 E9F45689 F24689FC 5688FA46 8800EFE9 F6468800 06E90375 00003DF6 -=..u.Õ...F-Õÿ..Fª.V=.F·.V¶Õ...F 000160
 FF260277 FF26F25E C40676FF 0876FF00 B6E90375 02470B26 078826F2 5EC404F2 ·.é^·&..&.G.u.ÕÑ..v..v.é^·&.w.&. 000180
 76FF0676 FF0876FF 0017E903 75000030 F6468900 0020A79A 5016F846 8D066A37 7j..F%.P.Ì ...F-=..u.Õ...v..v..v 0001A0
 0E4688F2 5EC4006A E90373F8 46391246 88008FE9 F6468800 00238A9A FA76FFFC =.vª..#...F-Õ...F.9F%s.Õj.é^·.F. 0001C0
 F846FF00 06E90374 01147E83 0050E903 75025739 260009E9 03740739 26105688 .V.&9.t.Õ..&9W.u.ÕP..~..t.Õ...F% 0001E0
```

Dump of file SATURN:[PCCOMMON.DUMP.DLL]DADOMDF.TMP;1 on 18-APR-1990 10:40:40.82
File ID (555,17,0)   End of file block 60 / Allocated 60

Virtual block number 22 (00000016), 512 (0200) bytes

```
22609A50 16F8468D 066A37FF 260277FF 26F25EC4 0676FF08 76FFF84E FF0003E9 Ö...N%.v..v.á^·&.w.&.7j..F%.P.'= 000000
46880000 23A49AFA 76FFFC76 FF0676FF 0876FF00 17E90375 000030F6 46890000 ...F-=..u.Ö...v..v..v=.v'.É#...F 000020
5E1F0000 E9F64688 00000006 9AFA76FF FC76FF06 76FF0876 FFFF37E9 001AE9F6 -Ö..Ö7..v..v..v=.v'.ø....F-Ö...^ 000040
FC468013 6A0E76FF 1076FF06 76FF0876 FFD88E22 88881E56 5700000C C8CBC95F _èùà...WV.¡."..Ä.v..v..v..v.j..F= 000060
4689FE56 88FC4688 00FAE9F8 46880006 E9037500 003DF846 89000022 AA9A5016 ¯.P.ˆ"...F½=..u.Ö...F½Ö'..F•.V±.F 000080
0676FF08 76FF00C1 E9037502 47082607 8826F45E C404F446 830004E9 F65689F4 ¶.V-Ö...F¶.á^¶&..&.G.u.Öè..v..v. 0000A0
17E90375 000030F8 46890000 22F99A50 16FA468D 066A37FF 260277FF 26F45EC4 á^¶&.w.&.7j..F'.P.'"...F½=..u.Ö. 0000C0
0373FA46 390A4688 009AE9F8 46880000 24BE9AFC 76FFFE76 FF0676FF 0876FF00 ..v..v..v±.v=./$...F½Ö...F.9F's. 0000E0
260009E9 03740739 26145688 12468BF4 5EC4006A E90376FA 46390C46 880075E9 Öu..F.9F'v.Öj.á^¶.F..V.&9.t.Ö..& 000100
0676FF08 76FFFA4E FF0003E9 FA46FF00 06E90374 01167E83 0050E903 75025739 9W.u.ÖP..~..t.Ö...F'Ö...N'.v..v. 000120
17E90375 000030F8 46890000 236E9A50 16FA468D 066A37FF 260277FF 26F45EC4 á^¶&.w.&.7j..F'.P.n#...F½=..u.Ö. 000140
76FF0876 FFFF2CE9 001AE9F8 46880000 24D89AFC 76FFFE76 FF0676FF 0876FF00 ..v..v..v±.v=.Ä$...F½Ö..Ö,..v..v 000160
88881E56 57000062 C8CBC95F 5E1F0000 E9F84688 00002315 9AFC76FF FE76FF06 ..v±.v=..#...F½Ö...^_èùàb..WV.¡É 000180
46880006 E9037500 003DEA46 8900001F D79A5016 EC468D08 76FF0A76 FFD88E23 #.Ä.v..v..F$.P.■....F̄õ=..u.Ö...F 0001A0
880006E9 03750000 3DEA4689 00001FF8 9A5016F8 46800876 FF0A76FF 0136E9EA ÕÖ6..v..v..F½.P.½....Fõ=..u.Ö... 0001C0
0006E903 75000030 EA468900 0020199A 5016F446 800876FF 0A76FF01 15E9EA46 FõÖ...v..v..F¶.P.. ...Fõ=..u.Ö.. 0001E0
```

Dump of file SATURN:[PCCOMMON.DUMP.DLL]DADOMDF.TMP;1 on 18-APR-1990 10:40:40.82
File ID (555,17,0)   End of file block 60 / Allocated 60

Virtual block number 23 (00000017), 512 (0200) bytes

```
46890000 23D39A50 16FC468D 146AF876 FFFA76FF EC76FFEE 76FF00F4 E9EA4688 .FõÖ¶..vŸ.vš.v'.v½j..F•.P.Æ#...F 000000
46830004 E9F25689 F04689FE 5688FC46 8800CBE9 EA468800 06E90375 000030EA õ=..u.Ö...FõÖù..F=.V±.FÞ.V·Ö...F 000020
FF260277 FF26F05E C4EC76FF EE76FF00 81E90375 02470826 07882 6F0 5EC404F0 Þ.á^Þ&..&.G.u.Ö...vŸ.všá^Þ&.w.&. 000040
76FFEC76 FFEE76FF 0017E903 75000030 EA468900 0024229A 50169E46 80026A37 7j..F..P."$...Fõ=..u.Ö...vŸ.vš.v 000060
5EC45016 9E468D00 16681EF4 76FFF676 FF006BE9 EA468800 0026159A FC76FFFE ±.v•..&...FõÖk..v-.v¶.h...F..Pá^ 000080
76FFEC76 FFEE76FF 0017E903 75000030 EA468900 00FFFF9A 37FF2602 77FF26F0 Þ&.w.&.7......Fõ=..u.Ö...vŸ.vš.v 0000A0
3E9AFC76 FFFE76FF EC76FFEE 76FFFF6C E9002BE9 EA468800 00262F9A FC76FFFE ±.v•./&...FõÖ+.Öl..vŸ.vš.v¡ v=.> 0000C0
06CAC95F 5E1F0000 E9EA4688 0006E9EA 46880006 E9037500 003DEA46 89000024 $...Fõ=..u.Ö...FõÖ...FõÖ...ˆ ^ħ. 0000E0
00001FB6 9A5016EE 46800676 FF0876FF 0A76FFD8 8E24EFB8 1E565700 0014C800 .à...WV.¡ÿ$.Ä.v..v..v..FŸ.P.Ř... 000100
0024FF9A 5016F246 800876FF 0A76FF05 9FE9EC46 880006E9 03750000 3DEC4689 .F$=..u.Ö...F$Ö...v..v..F·.P..$. 000120
25419A50 16FA468D 0876FF0A 76FF057E E9EC4688 0006E903 75000030 EC468900 ..F$=..u.Ö...F$Ö~..v..v..F'.P.A% 000140
209A5016 F6468D08 76FF0A76 FF055DE9 EC468800 06E90375 00003DEC 46890000 ...F$=..u.Ö...F$Ö]..v..v..F-.P. 000160
F676FFF8 76FFF276 FFF476FF 053CE9EC 46880006 E9037500 003DEC46 89000025 %...F$=..u.Ö...F$Ö<..v¶.v·.v½.v- 000180
5EC40512 E98EB988 0006E903 75000030 000025B9 9A505240 F05688EE 4688096A j..FŸ.VÞ@RP.¿%..=..u.Ö..¡¿.Ö..á^ 0001A0
006A5052 0000273F 9A00FA68 FA76FFFC 76FF00F2 FE46C704 ABE99801 478A26EE Ÿ&.G..Ö¨.úF±·..v=.v'h'..?'..RPj. 0001C0
FFFC76FF 0000275F 9A006A50 52000027 569A00FE 68FA76FF FC76FF00 0027489A .H'...v=.v'h±..V'..RPj.._'...v=. 0001E0
```

Dump of file SATURN:[PCCOMMON.DUMP.DLL]DADOMDF.TMP;1 on 18-APR-1990 10:40:40.82
File ID (555,17,0)   End of file block 60 / Allocated 60

Virtual block number 24 (00000018), 512 (0200) bytes

```
0027849A 00F968FA 76FFFC76 FF000027 769A006A 50520000 276D9A00 FC68FA76 v'h=..m'..RPj..v'...v=.v'h'...'. 000000
0027A49A 006A5052 0000279B 9A00FD68 FA76FFFC 76FF0000 278D9A00 6A505200 .RPj...'...v=.v'h»...'..RPj..Ê'. 000020
00F3FE46 C70456E9 000027C3 9A006A50 52000027 BA9A00FB 68FA76FF FC76FF00 ..v=.v'h«..¤'..RPj..û'..ÖV.úF±ж. 000040
00FE68FA 76FFFC76 FF000027 DA9A006A 50520000 27D19A00 FA68FA76 FFFC76FF .v=.v'h'..Ì'..RPj..Ö'...v=.v'h±. 000060
006A5052 000027FF 9A00FC68 FA76FFFC 76FF0000 27F19A00 6A505200 0027E89A .ò'..RPj..þ'...v=.v'h=...'..RPj. 000080
FFFC76FF 0000281F 9A006A50 52000028 169A00F9 68FA76FF FC76FF00 0028089A ..(...v=.v'h'...(..RPj...(...v=. 0000A0
00284C9A 00FB68FA 76FFFC76 FF000028 369A006A 50520000 282D9A00 FD68FA76 v'h»..-(..RPj..6(...v=.v'h«..L(. 0000C0
00002863 9A00FA68 FA76FFFC 76FF00F4 FE46C703 C4E90000 28559A00 6A505200 .RPj..U(..Ö6.úF±¶..v=.v'h'..c(.. 0000E0
00002883 9A006A50 52000028 7A9A00FE 68FA76FF FC76FF00 00286C9A 006A5052 RPj..l(...v=.v'h±..z(..RPj...(.. 000100
00F968FA 76FFFC76 FF000028 9A9A006A 50520000 28919A00 FC68FA76 FFFC76FF .v=.v'h=...(..RPj...(...v=.v'h'. 000120
006A5052 000028BF 9A00F068 FA76FFFC 76FF0000 28B19A00 6A505200 0028A89A .´(..RPj..Ÿ(...v=.v'h»..¢(..RPj. 000140
C70332E9 000028E7 9A006A50 52000028 DE9A00FB 68FA76FF FC76FF00 0028C89A .à(...v=.v'h«..ß(..RPj..Ö(..Ö2.ú 000160
76FFFC76 FF000028 FE9A006A 50520000 28F59A00 FA68FA76 FFFC76FF 00F5FE46 F±%..v=.v'h'..%(..RPj..±(...v=.v 000180
00000542 9A00FC68 FA76FFFC 76FF0000 29159A00 6A505200 00290C9A 00FE68FA 'h±...)..RPj...)...v=.v'h=..B... 0001A0
00002943 9A006A50 52000029 3A9A00F9 68FA76FF FC76FF00 00FFFF9A 006A5052 RPj.......v=.v'h'..:)..RPj..C).. 0001C0
00FB68FA 76FFFC76 FF000029 5A9A006A 50520000 29519A00 FD68FA76 FFFC76FF .v=.v'h»..Q)..RPj..Z)...v=.v'h«. 0001E0
```

```
Dump of file SATURN:[PCCOMMON.DUMP.DLL]DADOMDF.TMP;1 on 18-APR-1990 10:40:40.82
File ID (555,17,0)   End of file block 60 / Allocated 60

Virtual block number 25 (00000019), 512 (0200) bytes

 9A00FA68 FA76FFFC 76FF00F6 FE46C702 A0E90000 29799A00 6A505200 0029709A .p)..RPj..y)..Õ..úF±-..v▪.v¹h¹.. 000000
 9A006A50 52000029 9E9A00FE 68FA76FF FC76FF00 0029909A 006A5052 00002987 .)..RPj...)...v▪.v¹h±...)..RPj.. 000020
 76FFFC76 FF000029 BE9A006A 50520000 29B59A00 FC68FA76 FFFC76FF 000029A7 Ì)...v▪;v¹h▪..ç)..RPj..ƒ)...v▪.v 000040
 000029E3 9A00FD68 FA76FFFC 76FF0000 29D59A00 6A505200 0029CC9A 00F968FA ¹h¹..ä)..RPj..Ì)...v▪.v¹h»..D).. 000060
 00002A0B 9A006A50 5200002A 029A00FB 68FA76FF FC76FF00 0029EC9A 006A5052 RPj..š)...v▪.v¹h«...*..RPj...*.. 000080
 FF00002A 229A006A 50520000 2A199A00 FA68FA76 FFFC76FF 00F7FE46 C7020EE9 Õ..úF±%..v▪.v¹h¹...*..RPj.."*... 0000A0
 9A00FC68 FA76FFFC 76FF0000 2A399A00 6A505200 002A309A 00FE68FA 76FFFC76 v▪.v¹h±..0*..RPj..9*...v▪.v¹h▪.. 0000C0
 9A006A50 5200002A 5E9A00F9 68FA76FF FC76FF00 002A509A 006A5052 00002A47 G*..RPj..P*...v▪.v¹h¹..^*..RPj.. 0000E0
 76FFFC76 FF00002A 7E9A006A 50520000 2A759A00 FD68FA76 FFFC76FF 00002A67 g*...v▪.v¹h»..u*..RPj..~*...v▪.v 000100
 FE46C701 74E900F0 FE46C701 7CE90000 2AAD9A00 6A505200 002AA49A 00FB68FA ¹h«..£*..RPj..Ù*..Õ|.úF±Þ.Õt.úF± 000120
 002AC49A 006A5052 00002ABB 9A00FA68 FA76FFFC 76FF00EF FE46C701 6CE900F1 Þ.Õl.úF±ÿ..v▪.v¹h¹..£*..RPj..6*. 000140
 FC68FA76 FFFC76FF 00002ADB 9A006A50 5200002A D29A00FE 68FA76FF FC76FF00 ..v▪.v¹h±..Ø*..RPj..Ù*...v▪.v¹h▪ 000160
 6A505200 002B009A 00F968FA 76FFFC76 FF00002A F29A006A 50520000 2AE99A00 ..Õ*..RPj..·*...v▪.v¹h¹...+..RPj 000180
 FC76FF00 002B209A 006A5052 00002B17 9A00FD68 FA76FFFC 76FF0000 2B099A00 ...+...v▪.v¹h»...+..RPj.. +...v▪ 0001A0
 26EE5EC4 00EFFE46 C7000AE9 00002B47 9A006A50 5200002B 3E9A00FB 68FA76FF .v¹h«..>+..RPj..G+..ÕÕ.úF±ÿ.6^Y& 0001C0
 76FFFC76 FF00002B 5E9A006A 50520000 2B559A00 FA68FA76 FFFC76FF 430147C6 6G.C.v▪.v¹h¹..U+..RPj..^+...v▪.v 0001E0

Dump of file SATURN:[PCCOMMON.DUMP.DLL]DADOMDF.TMP;1 on 18-APR-1990 10:40:40.82
File ID (555,17,0)   End of file block 60 / Allocated 60

Virtual block number 26 (0000001A), 512 (0200) bytes

 00002B83 9A00FC68 FA76FFFC 76FF0000 2B759A00 6A505200 002B6C9A 00FE68FA ¹h±..l+..RPj..u+...v▪.v¹h▪...+.. 000000
 00002BA3 9A006A50 5200002B 9A9A00F9 68FA76FF FC76FF00 002B8C9A 006A5052 RPj...+...v▪.v¹h¹...+..RPj..È+.. 000020
 00FB68FA 76FFFC76 FF00002B BA9A006A 50520000 2BB19A00 FD68FA76 FFFC76FF .v▪.v¹h»..Ý+..RPj..¤+...v▪.v¹h«. 000040
 03FF58E9 03760014 3000422D 003DE900 40E90000 27319A00 6A505200 0027289A .(′..RPj..1′..Õã.Õ=.-B.=..v.ÕX.. 000060
 8D28CF2B 272B272B 2727192B 272B272B 272B272B 272A9528 302BD7A7 FF2E93C0 å...Ì▪+=(.*′+′+′+′+′+.′′+′+′+ü(. 000080
 6A006A01 2568FE76 FFFA76FF FC76FF29 F329612A 852B2727 AB2B272B 272B272A *′+′+′+¨′′+.*a)µ).v▪.v¹.v±h%.j.j 0000A0
 59B81E56 57000012 C80006CA C95F5E1F 0000E900 00B80000 20439A00 6A006A01 .j.j..C ..|..Õ...^_èò..à...WV.¡Y 0000C0
 6C9A5016 F0468D12 76FF1476 FF1676FF 000207C7 260E5EC4 0000EE46 C7D88E26 &.ÄúFŸ..6^.&ú....v..v..v..FÞ.P.l 0000E0
 9A5016F4 468D1476 FF1676FF 0922E9EE 468B0006 E9037500 003DEE46 89000026 &...FŸ=..u.Õ...FŸÕ"..v..v..F¶.P. 000100
 5016F846 8D1476FF 1676FF09 01E9EE46 8B0006E9 03750000 3DEE4689 0000268D .&...FŸ=..u.Õ...FŸÕ...v..v..F½.P 000120
 16FC468D 1476FF16 76FF08E0 E9EE468B 0006E903 7500003D EE468900 0026AE9A .Û&...FŸ=..u.Õ...FŸÕÀ..v..v..F▪. 000140
 F05EC407 6FE91246 8B08BFE9 EE468B00 06E90375 00003DEE 46890000 26CF9A50 P.ü&...FŸ=..u.Õ...FŸÕ¢..F.Õo.6^Þ 000160
 76FFFA76 FF00002C FE9A016A 50520000 2CF59A00 FA68F876 FFFA76FF 4E07C626 &6.N.v¹.v½h¹..%,..RPj..±,...v¹.v 000180
 00002D23 9A00FC68 F876FFFA 76FF0000 2D159A01 6A505200 002D0C9A 00FE68F8 ½h±...-..RPj...-...v¹.v½h▪..#-.. 0001A0
 00002D43 9A016A50 5200002D 3A9A00F9 68F876FF FA76FF00 002D2C9A 016A5052 RPj..,-...v¹.v½h¹..:-..RPj..C-.. 0001C0
 00FB68F8 76FFFA76 FF00002D 5A9A016A 50520000 2D519A00 FD68F876 FFFA76FF .v¹.v½h»..Q-..RPj..Z-...v¹.v½h«. 0001E0

Dump of file SATURN:[PCCOMMON.DUMP.DLL]DADOMDF.TMP;1 on 18-APR-1990 10:40:40.82
File ID (555,17,0)   End of file block 60 / Allocated 60

Virtual block number 27 (0000001B), 512 (0200) bytes

 FF1676FF 2D783580 9A00FA68 1476FF16 76FF0000 2DA59A01 6A505200 002D9C9A ..-..RPj..Ê-...v..v.h¹...5x-.v.. 000000
 C626F05E C40606E9 2E28358D 9A00FC68 1476FF16 76FF2D86 35809A00 FE681476 v.h±...5.-.v..v.h▪...5(.Õø.6^Þ&6 000020
 68F876FF FA76FF00 002DBC9A 006A5052 00002DB3 9A00FA68 F876FFFA 76FF4907 .Ì.v¹.v½h¹..*-..RPj..¥-...v¹.v½h 000040
 50520000 2DE19A00 FC68F876 FFFA76FF 00002DD3 9A006A50 5200002D CA9A00FE ±..ò-..RPj..Æ-...v¹.v½h▪..Ã-..RP 000060
 76FF0000 2E019A00 6A505200 002DF89A 00F968F8 76FFFA76 FF00002D EA9A006A j..ð-...v¹.v½h¹..½-..RPj.......v 000080
 5A9A00FB 68F876FF FA76FF00 002E189A 006A5052 00002E0F 9A00FD68 F876FFFA ¹.v½h»......RPj.......v¹.v½h«..Z 0000A0
 1476FF16 76FF2E36 35809A00 FA681476 FF1676FF 00002E63 9A006A50 5200002E ...RPj..c....v..v.h¹...56..v..v. 0000C0
 5207C626 F05EC406 18E92EE6 358D9A00 FC681476 FF1676FF 2E44358D 9A00FE68 h±...5D..v..v.h▪...5Ì.Õ..6^Þ&6.R 0000E0
 00FE68F8 76FFFA76 FF00002E 7A9A006A 50520000 2E719A00 FA68F876 FFFA76FF .v¹.v½h¹..q...RPj..z....v¹.v½h±. 000100
 006A5052 00002E9F 9A00FC68 F876FFFA 76FF0000 2E919A00 6A505200 002E889A .....RPj.......v¹.v½h▪......RPj. 000120
 FFFA76FF 00002EBF 9A006A50 5200002E B69A00F9 68F876FF FA76FF00 002EA89A .´....v¹.v½h¹..Ñ...RPj..¢....v¹. 000140
 002F189A 00FB68F8 76FFFA76 FF00002E D69A006A 50520000 2ECD9A00 FD68F876 v½h»..ë...RPj..ø....v¹.v½h«.../. 000160
 FE681476 FF1676FF 2EF4358D 9A00FA68 1476FF16 76FF0000 2F219A00 6A505200 .RPj..!/...v..v.h¹...5¶..v..v.h± 000180
 76FF4207 C626F05E C4055AE9 2FA4358D 9A00FC68 1476FF16 76FF2F02 35809A00 ...5./.v..v.h▪...5É/ÕZ.6^Þ&6.B.v 0001A0
 469A00FE 68F876FF FA76FF00 002F389A 006A5052 00002F2F 9A00FA68 F876FFFA ¹.v½h¹..//..RPj..8/...v¹.v½h±..F 0001C0
 669A006A 50520000 2F5D9A00 FC68F876 FFFA76FF 00002F4F 9A006A50 5200002F /..RPj..O/...v¹.v½h▪..]/..RPj..f 0001E0
```

```
Dump of file SATURN:[PCCOMMON.DUMP.DLL]DADOMDF.TMP;1 on 18-APR-1990 10:40:40.82
File ID (555,17,0)   End of file block 60 / Allocated 60

Virtual block number 28 (0000001C), 512 (0200) bytes

 F876FFFA 76FF0000 2F7D9A00 6A505200 002F749A 00F968F8 76FFFA76 FF00002F /...v¹.v½h¹..t/..RPj..)/...v¹.v½ 000000
 5200002F D69A00FB 68F876FF FA76FF00 002F949A 006A5052 00002F8B 9A00FD68 h».../..RPj.../...v¹.v½h«..ø/..R 000020
 9A00FE68 1476FF16 76FF2FB2 358D9A00 FA681476 FF1676FF 00002FDF 9A006A50 Pj..Ö/...v..v.h¹...5ý/.v..v.h±.. 000040
 FFFA76FF 4D07C626 F05EC404 9CE92119 358D9A00 FC681476 FF1676FF 2FC0358D .5à/.v..v.h=...5.!Õ..á^Þ&6.M.v¹. 000060
 0030049A 00FE68F8 76FFFA76 FF000029 2C9A006A 50520000 29239A00 FA68F876 v½h¹..#)..RPj..,)...v¹.v½h±...0. 000080
 0030249A 006A5052 0000301B 9A00FC68 F876FFFA 76FF0000 30009A00 6A505200 .RPj...0...v¹.v½h=...0..RPj..$0. 0000A0
 FD68F876 FFFA76FF 0000303B 9A006A50 52000030 329A00F9 68F876FF FA76FF00 ..v¹.v½h¹..20..RPj..;0...v¹.v½h» 0000C0
 6A505200 0030949A 00FB68F8 76FFFA76 FF000030 529A006A 50520000 30499A00 ..10..RPj..R0...v¹.v½h«...0..RPj 0000E0
 358D9A00 FE681476 FF1676FF 3070358D 9A00FA68 1476FF16 76FF0000 30909A00 ...0...v..v.h¹...5p0.v..v.h±...5 000100
 F876FFFA 76FF5507 C626F05E C403DEE9 3120358D 9A00FC68 1476FF16 76FF307E ~0.v..v.h=...5 1Õ8.á^Þ&6.U.v¹.v½ 000120
 52000030 C29A00FE 68F876FF FA76FF00 0030B49A 006A5052 000030AB 9A00FA68 h¹..¨0..RPj..Ç0...v¹.v½h±..ô0..R 000140
 FF000030 E29A006A 50520000 30D99A00 FC68F876 FFFA76FF 000030CB 9A006A50 Pj..ù0...v¹.v½h=..)0..RPj..ã0... 000160
 9A00FD68 F876FFFA 76FF0000 30F99A00 6A505200 0030F09A 00F968F8 76FFFA76 v¹.v½h¹..Þ0..RPj..¹0...v¹.v½h».. 000180
 9A006A50 52000031 529A00FB 68F876FF FA76FF00 0031109A 006A5052 00003107 .1..RPj...1...v¹.v½h«..R1..RPj.. 0001A0
 313C358D 9A00FE68 1476FF16 76FF312E 358D9A00 FA681476 FF1676FF 0000315B (1...v..v.h¹...5.1.v..v.h±...5<1 0001C0
 FA68F876 FFFA76FF 5407C626 F05EC403 20E931DE 358D9A00 FC681476 FF1676FF .v..v.h=...581Õ .á^Þ&6. .v¹.v½h¹ 0001E0

Dump of file SATURN:[PCCOMMON.DUMP.DLL]DADOMDF.TMP;1 on 18-APR-1990 10:40:40.82
File ID (555,17,0)   End of file block 60 / Allocated 60

Virtual block number 29 (0000001D), 512 (0200) bytes

 6A505200 0031809A 00FE68F8 76FFFA76 FF000031 729A016A 50520000 31699A00 ..i1..RPj..r1...v¹.v½h±...1..RPj 000000
 FA76FF00 0031A09A 016A5052 00003197 9A00FC68 F876FFFA 76FF0000 31899A01 ...1...v¹.v½h=...1..RPj...1...v¹ 000020
 31C59A00 FD68F876 FFFA76FF 000031B7 9A016A50 52000031 AE9A00F9 68F876FF .v½h¹..Û1..RPj..ñ1...v¹.v½h»..é1 000040
 32199A01 6A505200 0032109A 00FB68F8 76FFFA76 FF000031 CE9A016A 50520000 ..RPj..ö1...v¹.v½h«...2..RPj...2 000060
 76FF31FA 358D9A00 FE681476 FF1676FF 31EC358D 9A00FA68 1476FF16 76FF0000 ...v..v.h¹...5ì1.v..v.h±...5¹1.v 000080
 9A00FA68 F876FFFA 76FF5607 C626F05E C40262E9 329C358D 9A00FC68 1476FF16 ..v.h=...5.2Õb.á^Þ&6.V.v¹.v½h¹.. 0000A0
 9A006A50 52000032 3E9A00FE 68F876FF FA76FF00 0032309A 006A5052 00003227 '2..RPj..02...v¹.v½h±..>2..RPj.. 0000C0
 76FFFA76 FF000032 5E9A006A 50520000 32559A00 FC68F876 FFFA76FF 00003247 G2...v¹.v½h=..U2..RPj..^2...v¹.v 0000E0
 00003283 9A00FD68 F876FFFA 76FF0000 32759A00 6A505200 00326C9A 00F968F8 ½h¹..l2..RPj..u2...v¹.v½h»...2.. 000100
 000032D7 9A006A50 52000032 CE9A00FB 68F876FF FA76FF00 00328C9A 006A5052 RPj...2...v¹.v½h«..ö2..RPj..■2.. 000120
 FF1676FF 32B8358D 9A00FE68 1476FF16 76FF32AA 358D9A00 FA681476 FF1676FF .v..v.h¹...5¨2.v..v.h±...5¡2.v.. 000140
 32E59A00 FA68F876 FFFA76FF 4307C626 F05EC401 A4E9335A 358D9A00 FC681476 v.h=...5Z3ÕE.á^Þ&6.C.v¹.v½h¹..Ì2 000160
 33059A00 6A505200 0032FC9A 00FE68F8 76FFFA76 FF000032 EE9A006A 50520000 ..RPj..Ÿ2...v¹.v½h±..■2..RPj...3 000180
 68F876FF FA76FF00 00331C9A 006A5052 00003313 9A00FC68 F876FFFA 76FF0000 ...v¹.v½h=...3..RPj...3...v¹.v½h 0001A0
 50520000 33419A00 FD68F876 FFFA76FF 00003333 9A006A50 52000033 2A9A00F9 ¹..*3..RPj..33...v¹.v½h»..A3..RP 0001C0
 76FF0000 2CE79A00 6A505200 002CDE9A 00FB68F8 76FFFA76 FF000033 4A9A006A j..J3...v¹.v½h«..8,..RPj..Õ,...v 0001E0

Dump of file SATURN:[PCCOMMON.DUMP.DLL]DADOMDF.TMP;1 on 18-APR-1990 10:40:40.82
File ID (555,17,0)   End of file block 60 / Allocated 60

Virtual block number 30 (0000001E), 512 (0200) bytes

 1476FF16 76FF3376 358D9A00 FE681476 FF1676FF 3368358D 9A00FA68 1476FF16 ..v.h¹...5h3.v..v.h±...5v3.v..v. 000000
 000033A3 9A00FA68 F876FFFA 76FF4307 C626F05E C400E6E9 2D6A358D 9A00FC68 h=...5j-Õl.á^Þ&6.C.v¹.v½h¹..È3.. 000020
 000033C3 9A006A50 52000033 BA9A00FE 68F876FF FA76FF00 0033AC9A 006A5052 RPj..¯3...v¹.v½h±..¤3..RPj..û3.. 000040
 00F968F8 76FFFA76 FF000033 DA9A006A 50520000 33D19A00 FC68F876 FFFA76FF .v¹.v½h=..Ì3..RPj..Ö3...v¹.v½h¹. 000060
 006A5052 000033FF 9A00FD68 F876FFFA 76FF0000 33F19A00 6A505200 0033E89A .Ò3..RPj..þ3...v¹.v½h»...3..RPj. 000080
 FF1676FF 00002FF6 9A006A50 5200002F ED9A00FB 68F876FF FA76FF00 0034089A ..4...v¹.v½h«..Ú/..RPj..~/...v.. 0000A0
 FC681476 FF1676FF 3434358D 9A00FE68 1476FF16 76FF3426 358D9A00 FA681476 v.h¹...5&4.v..v.h±...544.v..v.h= 0000C0
 BD344FA7 FF2E93C0 03FF34E9 03760008 3000EF2D 0025E900 28E93062 358D9A00 ...5b0Õ(.Õ%.-ÿ.=..v.Õ4..å...Ì04§ 0000E0
 03750147 3826F05E C4078A26 F05EC431 FF30832F C52F072E 492D882C CD314132 2A1ë,.-I../é/.0.1á^Þ&..á^Þ&8G.u. 000100
 20D79A50 52349CBA 0000B800 FA681C6A 00FA36FF 26008806 8E006A00 6A0004E9 Õå.j.j.....&.6¹.j.h¹.¡..¤.4RP.■ 000120
 0017E903 7500003D EE468900 0020EA9A 50522002 BA0000B8 F476FFF6 76FF0000 ...v~.v¶¡..¤● RP.ö ...FŸ=..u.Õ.. 000140
 FE76FFF4 76FFF676 FF00BFE9 EE468800 0034F89A 0A76FF0C 76FF0196 68EE76FF .vŸh...v..v..¼4...FŸÕ¢..v~.v¶.v± 000160
 9668EE76 FF0022E9 03750000 3DEE4689 000024A2 9AF076FF F276FF09 6AFC76FF .v=j..v·.vÞ.Å$...FŸ=..u.Õ"..vŸh. 000180
 F676FF00 79E9EE46 8B000021 309AF476 FFF676FF 00003530 9A0A76FF 0C76FF01 ..v..v..05...v~.v¶.0!...FŸÕy..v~ 0001A0
 9A0A76FF 0C76FF01 9668EE76 FF0017E9 03750000 3DEE4689 0000216E 9AF476FF .v¶.n!...FŸ=..u.Õ...vŸh...v..v.. 0001C0
 5EC40007 C6260A5E C40147B8 26F05EC4 078A26F0 5EC4004C E9EE468B 0000FFFF .....FŸÕL.á^Þ&..á^Þ&.G.á^.&6..á^ 0001E0
```

```
Dump of file SATURN:[PCCOMMON.DUMP.DLL]DADOMDF.TMP;1 on 18-APR-1990 10:40:40.82
File ID (555,17,0)   End of file block 60 / Allocated 60

Virtual block number 31 (0000001F), 512 (0200) bytes

 357C9A00 A1681476 FF1676FF 0000356E 9A00A068 1476FF16 76FF0001 07C7260E .&ú....v..v.h...n5...v..v.hÀ..|5 000000
 0006C800 12CAC95F 5E1F0000 E9EE468B 000021BC 9A009F68 1476FF16 76FF0000 ...v..v.h...¥!...FŸÕ...^_èò..à.. 000020
 3DFA4689 00002C4F 9A5016FC 46800676 FF0876FF 0A76FFD8 8E2C2FB8 1E565700 .WV.¡/,.Ä.v..v..v..F=.P.Õ,...F*= 000040
 76FF0676 FF0A6A08 76FF0A76 FF008EE9 06468B00 85E9FA46 880006E9 03750000 ..u.Õ...F*Õç..F.Õ...v..v.j..v..v 000060
 0A76FF00 7FE90088 E9FA468B 0006E903 7500003D FA468900 0036049A FC76FFFE ±.v=..6...F*=..u.Õ...F*Õ..Õ...v. 000080
 03750000 3DFA4689 00003633 9A505200 0805FE56 8BFC468B 0676FF08 6A0876FF .v.j..v..F=.V±...RP.36...F*=..u. 0000A0
 000405FE 568BFC46 880676FF 0C6A0876 FF0A76FF 0050E900 59E9FA46 880006E9 Õ...F*ÕY.ÕP..v..v.j..v..F=.V±... 0000C0
 1BE9001E E90021E9 002AE9FA 46880006 E9037500 003DFA46 890000FF FF9A5052 RP......F*=..u.Õ...F*Õ*.Õ!.Õ..Õ. 0000E0
 E9FA4688 FFDFE9FF 84E90375 00FE3DFF 8BE90375 00FC3DFF 6AE90375 00FA3000 .=*.u.Õj.=+.u.Õ£.=±.u.Õ..ÕÕ..F*Õ 000100
 07C7260E 5EC40000 FA46C7D8 8E3595B8 1E565700 0006C800 06CAC95F 5E1F0000 ...^_èò..à...WV.¡.5.ÄüF*..á^.&ú. 000120
 0006E903 7500003D FA468900 0035A89A 5016FC46 8D1276FF 1476FF16 76FF0002 ...v..v..v..F=.P.´5...F*=..u.Õ.. 000140
 372A9AFC 76FFFE76 FF1276FF 0A6A1476 FF1676FF 0131E912 46880199 E9FA4688 .F*Õ...F.Õ1..v..v.j..v..v±.v=.*7 000160
 46880000 37469A0A 76FF0C76 FF019668 FA76FF00 17E90375 00003DFA 46890000 ...F*=..u.Õ...v*h...v..v..F7...F 000180
 375C358D 9A00FC68 1476FF16 76FF370E 35809A00 FE681476 FF1676FF 0158E9FA *Õ(..v..v.h±...5.7.v..v.h=...5\7 0001A0
 46890000 37949A50 52000805 FE568BFC 46881276 FF0B6A14 76FF1676 FF00F5E9 Õ%..v..v.j..v..F=.V±...RP..7...F 0001C0
 00FFE9FA 46880000 37B09A0A 76FF0C76 FF019668 FA76FF00 17E90375 00003DFA *=..u.Õ...v*h...v..v..¯7...F*Õ.. 0001E0
```

```
Dump of file SATURN:[PCCOMMON.DUMP.DLL]DADOMDF.TMP;1 on 18-APR-1990 10:40:40.82
File ID (555,17,0)   End of file block 60 / Allocated 60

Virtual block number 32 (00000020), 512 (0200) bytes

 FF1676FF 3778358D 9A00FE68 1476FF16 76FF376A 35809A00 FA681476 FF1676FF .v..v.h*...5j7.v..v.h±...5x7.v.. 000000
 0405FE56 8BFC468B 1276FF0C 6A1476FF 1676FF00 8BE937C6 35809A00 FC681476 v.h=...567Õ...v..v.j..v..F=.V±.. 000020
 9A0A76FF 0C76FF01 9668FA76 FF0017E9 03750000 3DFA4689 0000FFFF 9A505200 .RP......F*=..u.Õ...v*h...v..v.. 000040
 FC681476 FF1676FF 37D4358D 9A00FA68 1476FF16 76FF0095 E9FA4688 0000348D §4...F*Õ...v..v.h*...5á7.v..v.h= 000060
 00FA3D00 1BE9001E E90021E9 3418358D 9A00FE68 1476FF16 76FF37E2 35809A00 ...5ã7.v..v.h±...5.4Õ!.Õ..Õ..=*. 000080
 000107C7 260E5EC4 FFDFE9FF 0EE90375 00FE3DFF 80E90375 00FC3DFE C7E90375 u.Õü±=+.u.Õ..=±.u.Õ..ÕÕ.á^.&ú... 0000A0
 FF1676FF 00003836 9A00A168 1476FF16 76FF0000 38289A00 A0681476 FF1676FF .v..v.h...(8...v..v.hÀ..68...v.. 0000C0
 1F0000E9 FA468B00 0107C726 0E5EC400 07C6260A 5EC40000 35609A00 9F681476 v.h...'5..á^.&ó..á^.&ú....F*Õ... 0000E0
 2C919A50 16FA468D 0676FF08 76FFD88E 3681881E 56570000 14C80012 CAC95F5E ^_èò..à...WV.¡.6.Ä.v..v..F*.P.., 000100
 2C709A50 16F6468D 0676FF08 76FF0000 10019A50 16FE468D 0676FF08 76FF0000 ...v..v..F±.P......v..v..F-.P.p, 000120
 00B80006 E9037500 003DEC46 890000FF FF9A5016 F246803A 6A1E6AFE 76FF0000 ...v±j.j4.F·.P......Fš=..u.Õ..¡. 000140
 0A1547C6 26EE5EC4 0A1447C6 26EE5EC4 F05689EE 4689F456 8BF2468B 00C9E900 .Õè..F·.V¶.FŸ.Vþá^Ÿ&6G..á^Ÿ&6G.. 000160
 FFEE76FF F076FF08 C483FFFF 14E59A06 76FF0876 FF505200 2E05F056 8BEE468B .FŸ.Vþ...RP.v..v..Í....á..vþ.vŸ. 000180
 76FF0000 FFFF9AF2 76FFF476 FF0676FF 0876FF08 C4833915 39849A06 76FF0876 v..v...9.9.á..v..v..v¶.v·......v 0001A0
 76FF0000 FFFF9A00 6A006A06 76FF0876 FF0000FF FF9AFFFF 68393568 0676FF08 ..v.h59h........v..v.j.j.......v 0001C0
 0000FFFF 9AFFFF68 39576806 76FF0876 FF0000FF FF9AFFFF 68394668 0676FF08 ..v.hF9h........v..v.hW9h....... 0001E0
```

```
Dump of file SATURN:[PCCOMMON.DUMP.DLL]DADOMDF.TMP;1 on 18-APR-1990 10:40:40.82
File ID (555,17,0)   End of file block 60 / Allocated 60

Virtual block number 33 (00000021), 512 (0200) bytes

 36FF2600 88068E11 6A0676FF 0876FF00 00FFFF9A FFFF6837 00680676 FF0876FF .v..v.h.7h........v..v.j.....&.6 000000
 D88E385E B81E5657 00000CC8 0004CAC9 5F5E1F00 00E90000 B80000FF FF9A00FA *......¡..Õ...^_èò..à...WV.¡^8.Ä 000020
 FFFF68FF FF68FFFF 68FFFF68 776A0676 FF0876FF FC5689FA 46890C56 880A4688 .F..V..F*.V=.v..¯v.jwh..h..h..h.. 000040
 6AFFFF68 39E968FF FF6839CA 68766A06 76FF0876 FF000039 D69A006A 006A006A j.j.j..ø9...v..v.jvhò9h..hÖ9h..j 000060
 016AFFFF 683AB168 FFFF68FF FF686E6A 0676FF08 76FF0000 39F59A00 6A006A01 .j.j..%9...v..v.jnh..h..hÝ;h..j. 000080
 6A006AFF FF68FFFF 68FFFF68 FFFF6879 6A0676FF 0876FF00 003A149A 006A006A j.j...:...v..v.jyh..h..h..h..j.j 0000A0
 03750000 3DF84689 0000387E 9A5016FE 46800676 FF0876FF 00003A85 9A006A00 .j...:...v..v..F±.P.~8...F½=..u. 0000C0
 01496801 48680147 6800D868 00D46800 D2684B6A FE76FF05 79E9F846 880006E9 Õ...F½Õy..v±jKh@.hå.hÄ.hG.hH.hI. 0000E0
 76FF0876 FF0547E9 F8468800 06E90375 000030F8 46890000 FFFF9A50 16F4468D .F¶.P......F½=..u.Õ...F½ÕG..v..v 000100
 680676FF 0876FF00 003AA39A F476FFF6 76FF016A 006A006A 006A006A 00046806 .hå.j.j.j.j.j..v~.v¶.È:...v..v.h 000120
 00086806 76FF0876 FF00003A C39AF476 FFF676FF 016A006A 006A006A 006A0002 ø.j.j.j.j.j..v~.v¶.ü:...v..v.hÄ. 000140
 01476806 76FF0876 FF00003A E39AF476 FFF676FF 016A006A 006AFFFF 683AD568 hI:h..j.j.j..v~.v¶.Ð:...v..v.hG. 000160
 01486806 76FF0876 FF00003B 039AF476 FFF676FF 006AFFFF 683AF568 006A006A j.j.h%:h..j..v~.v¶..;...v..v.hH. 000180
 01496806 76FF0876 FF00003B 239AF476 FFF676FF 006AFFFF 683B1568 006A006A j.j.h.;h..j..v~.v¶.#;...v..v..!. 0001A0
 6A706A06 76FF0876 FF00003B 3E9AF476 FFF676FF 006AFFFF 683C7368 006A006A j.j.hs<h..j..v~.v¶.>;...v..v.jpj 0001C0
 FFFF68FF FF68736A 0676FF08 76FF0000 385B9A00 00681E01 6A006A00 6A006A00 .j.j.j.j..h...[;...v..v.jsh..h.. 0001E0
```

```
Dump of file SATURN:[PCCOMMON.DUMP.DLL]DADOMDF.TMP;1 on 18-APR-1990 10:40:40.82
File ID (555,17,0)   End of file block 60 / Allocated 60

Virtual block number 34 (00000022), 512 (0200) bytes

68FFFF68 006A006A 012C6806 76FF0876 FF00003B 799A0000 681E016A 006A006A j.j.j..h...y;...v..v.h,.j.j.h..h 000000
FFFF68FF FF68006A 006A012D 680676FF 0876FF00 003B979A 0000681E 006AFFFF ..j..h....;...v..v.h-.j.j.h..h.. 000020
006AFFFF 68FFFF68 006A006A 012E6806 76FF0876 FF00003B 859A0000 681E006A j..h...ç;...v..v.h..j.j.h..h..j. 000040
002C681E 016A006A 006A006A 006A0085 680676FF 0876FF00 003BD19A 0000681E .h...Ì;...v..v.h..j.j.j.j.j..h,. 000060
0D9A002C 681E006A 006A006A FFFF68FF FF680087 680676FF 0876FF00 003BEF9A .ÿ;...v..v.h..h..h..j.j.j..h,... 000080
003C2B9A 002C681E 006AFFFF 68FFFF68 006A006A 01446806 76FF0876 FF00003C <...v..v.hD.j.j.h..h..j..h,..+<. 0000A0
FF00003C 499A002C 681E006A FFFF68FF FF68006A 006A0145 680676FF 0876FF00 ..v..v.hE.j.j.h..h..j..h,..I<... 0000C0
0876FF00 003C659A 002C681E 006AFFFF 68FFFF68 006A006A 01466806 76FF0876 v..v.hF.j.j.h..h..j..h,..e<...v. 0000E0
680676FF 0876FF00 003C839A 0016681E 016A006A 006A006A 006A000D 680676FF .v.hÏ.j.j.j.j.j..h....<...v..v.h 000100
00E26806 76FF0876 FF00003C A39A0016 681E016A 006A006A FFFF683C B168000F Ô.hÝ<h..j.j.j..h...È<...v..v.hã. 000120
00EF6806 76FF0876 FF00003C CA9A0058 681E016A FFFF68FF FF68FFFF 68FFFF68 h..h..h..h..j..hX..ò<...v..v.hÿ. 000140
76FF0000 3CEF9A50 52001405 0C56880A 468B006A 3CDF683C DC68FFFF 683C8768 hñ<h..hÉ<hÔ<j..F..V....RP.ÿ<...v 000160
149A5052 0014050C 56880A46 88006A3D 04683001 68006A00 6A00F068 0676FF08 ..v.hÞ.j.j.h.=h.=j..F..V....RP.. 000180
14050C56 880A468B 006A3D29 683D2668 006A006A 00F16806 76FF0876 FF00003D =...v..v.hþ.j.j.h&=h)=j..F..V... 0001A0
0A468800 6AFFFF68 38F86800 6A006A00 F2680676 FF0876FF 00003D39 9A505200 .RP.9=...v..v.h·.j.j.h½8h..j..F. 0001C0
3D73683D 7068006A 006A00F3 680676FF 0876FF00 00FFFF9A 50520014 050C5688 .V....RP......v..v.hµ.j.j.hp=hs= 0001E0

Dump of file SATURN:[PCCOMMON.DUMP.DLL]DADOMDF.TMP;1 on 18-APR-1990 10:40:40.82
File ID (555,17,0)   End of file block 60 / Allocated 60

Virtual block number 35 (00000023), 512 (0200) bytes

68006A00 6A00F468 0676FF08 76FF0000 3D839A50 52001405 0C56880A 4688006A j..F..V....RP..=...v..v.h¶.j.j.h 000000
00F56806 76FF0876 FF00003D A89A5052 0014050C 56880A46 88006A3D 9868309S .=h.=j..F..V....RP.´=...v..v.h%. 000020
FF0876FF 00003DCD 9A505200 14050C56 880A4688 006A3D8D 683D8A68 006A006A j.j.hα=h§=j..F..V....RP.ë=...v.. 000040
003DF29A 50520014 050C5688 0A468800 6A3DE268 3DDF6800 6A006A00 F6680676 v.h-.j.j.hÔ=hã=j..F..V....RP.·=. 000060
52001405 0C56880A 4688006A 3CBA683E 0068006A 006A00F7 680676FF 0876FF00 ..v..v.h¼.j.j.h.>hα<j..F..V....R 000080
0A468800 6A3E3068 3E27683E 2A683E06 6800FA68 0676FF08 76FF0000 3E199A50 P..>...v..v.h'.h.>h*>h'>h0>j..F. 0000A0
683E4E68 3E51683E 2D6800FC 680676FF 0876FF00 003E409A 50520016 050C5688 .V....RP.@>...v..v.h•.h->hQ>hN>h 0000C0
3E546800 FE680676 FF0876FF 00003E67 9A505200 16050C56 880A4688 006A3E57 W>j..F..V....RP.g>...v..v.h±.hT> 0000E0
76FF0876 FF00003E 829A5052 0016050C 56880A46 88006AFF FF6839C4 68FFFF68 h..h69h..j..F..V....RP..>...v..v 000100
68008168 0676FF08 76FF0000 3EA09A00 64681E01 6A006A00 6A006A00 6A7F6A06 .j.j.j.j.j..hd...>...v..v.h..h 000120
6A006A01 3B680676 FF0876FF 00003E8E 9A006468 1E016A00 6A006AFF FF68FFFF ..h..j.j.j..hd..ƒ>...v..v.h;.j.j 000140
68006A00 6A013C68 0676FF08 76FF0000 3EDC9A00 64681E00 6AFFFF68 FFFF6800 .h..h..j..hd..É>...v..v.h<.j.j.h 000160
FFFF6800 6A006A01 3D680676 FF0876FF 00003EFA 9A006468 1E006AFF FF68FFFF ..h..j..hd..'>...v..v.h=.j.j.h.. 000180
6A006A3F 29683F26 6800906B 0676FF08 76FF0000 3F189A00 64681E00 6AFFFF68 h..j..hd...?...v..v.h..h&?h)?j.j 0001A0
6A006A00 6A3F4768 3F446800 9E680676 FF0876FF 00003F36 9A006A00 6A006A00 .j.j.j..6?...v..v.h..hD?hG?j.j.j 0001C0
6A006A00 6A006AFF FF68FFFF 68009C68 0676FF08 76FF0000 3F549A00 6A006A00 .j.j..T?...v..v.h..h..h..j.j.j.j 0001E0

Dump of file SATURN:[PCCOMMON.DUMP.DLL]DADOMDF.TMP;1 on 18-APR-1990 10:40:40.82
File ID (555,17,0)   End of file block 60 / Allocated 60

Virtual block number 36 (00000024), 512 (0200) bytes

6A006A00 6A006A00 6A3F8368 3F806800 A0680676 FF0876FF 000039B7 9A006A00 .j..ñ9...v..v.h..h.?h.?j.j.j.i.j 000000
9A006A00 6A006A00 6A006A3F A1683F9E 6800A168 0676FF08 76FF0000 3F909A00 ...?...v..v.hÀ.h.?hÀ?j.j.j.j.,   000020
3D5E9A00 6A006A00 6A006A00 6A3F0B68 3F086800 9F680676 FF0876FF 00003FAE Û?...v..v.h..h.?h.?j.j.j.j..^= 000040
00073E90 02020252 0006393B 02030158 00051032 0203007D 90CBC95F 5E1F0000 ...^_èÙ.)...2...X...;9..R....>.. 000060
00012C16 010301D5 0006388E 02030354 000607E4 02030000 00013D4B 00020466 f...K=......ð...T....8..f....... 000080
000238E4 000224E7 00013C76 000504A7 00073C94 0205006F 000334DC 0203007F ....É4..o....<..Ï...v<..Ó$..ðB.. 0000A0
00010A9E 01030004 0001055B 010302D8 000619A4 02030429 00073BAC 02050000 ....¯;..)...Ê...Û...[.......... 0000C0
0006386E 02030000 00042208 00020087 000118BA 01030472 00073E82 02020086 ....ý>..r...α........"......n8.. 0000E0
00073B8E 0205000B 00013395 0103007B 00031D79 02030262 0006395D 020301E1 Å...]9..b...y...(....3.......;.. 000100
00073A08 0202016E 000536EA 020304B4 00073C9A 02050000 0005398C 00020433 3....9.......<..Ç...ð6..n....:.. 000120
0001338C 01033679 00013E09 0005047D 00073EEE 02020000 00063489 000203FA •....4......Ý>..}....>..y6...3.. 000140
00073BE2 0205097C 000139C7 000502EC 000601A5 0203000B 0002389F 02030013 .....8.......Ê...š...ú9..|...ã;.. 000160
0003256A 020303E7 00070EF5 0203038D 000739A8 020510FD 00013AD8 0005043D =...Å:..»...´9..§...%...Ó...j%.. 000180
0006391B 02031F81 00013B18 000501F1 0006004E 02030000 00013938 00050088 ....89......N...þ....;.......9.. 0001A0
00073C04 0205009D 0001348E 01030488 00073ED0 02020408 00073A02 02020273 ■....:.......Å>.......4.......<.. 0001C0
0003207E 020303C8 000739AE 02050373 0007180E 02030019 0002104B 02030448 H...K.......8...s...Û9..ù...~ .. 0001E0
```

```
Dump of file SATURN:[PCCOMMON.DUMP.DLL]DADOMDF.TMP;1 on 18-APR-1990 10:40:40.82
File ID (555,17,0)   End of file block 60 / Allocated 60

Virtual block number 37 (00000025), 512 (0200) bytes

0006390A 02030182 000625F9 02030414 00073B4B 0202358D 00013E03 00050094 .....>...5..K;......•%.......9.. 000000
0006050B 0203037D 000735D5 02030205 00060604 02030452 00073C40 02050282 ....@<..R...........{5..)....... 000020
0007386D 02020519 0001395A 000500A1 00031E22 0203039B 00073F62 02020306 ....b?......"...À...Z9......m;.. 000040
00063973 02030291 0006062F 0203045C 00073C22 020503DB 000739E6 0205041F ....|9..Ü..."<..\.../.......s9.. 000060
00031DEB 0203011A 00051087 0203002A 000334A1 02030212 000606A8 02030191 ....'........À4..*...........Š... 000080
00013AF8 00050429 00073BA9 020204A7 00073C91 0202038B 000736CE 020300AB ¨...ö6.......<..Ī...`;..)...½:.. 0000A0
00033514 020303A9 00013949 00052C27 00013D4E 00050466 00073E93 020517A6 |....>..f...N=..',..I9..`....5.. 0000C0
0006020A 02030AAF 000139CD 00050433 00073B8B 020200B7 000325D5 02030036 6...{%..ñ....;..3...ë9..£....... 0000E0
0007381A 02030472 00073E85 020504B4 00073C97 020201A0 000636A1 02030320 ...À6.......<..Ç...ç>..r....8.. 000100
0008060E 020302A5 00061EEE 02030223 00063F72 0203012B 00052233 0203039B ....3"..+...r?..#...Ÿ...Ē...B... 000120
00073A0B 0205038D 000739A5 0202043D 0007380F 02020041 00030B7E 02030518 ....-...A...Ô;..=...É9..§....:.. 000140
00050949 0203047D 00073EF1 0205063D 00013918 000500C3 00030A42 020303FA •...B...û....9..=...þ>..)...I... 000160
00063A24 02030448 00073C01 02020234 0006392A 020302B4 00061F22 02030138 8..."...Ç...*9..4....<..H...$:.. 000180
00073ED3 02050408 00073A05 020503CB 000739AB 020203AE 00070F11 020301B6 Ñ.......Ù...¨9..ù....:......Æ>.. 0001A0
00073C3D 0202033A 0006048E 02030EC9 000139EC 00050001 00033503 02030488 .....5..I...ì9..è.......:...=<.. 0001C0
00073B4E 02050242 0006394C 02032651 00013CB4 00050148 00052147 02030452 R...GI..H...Ç<..Q&..L9..B...N, . 0001E0

Dump of file SATURN:[PCCOMMON.DUMP.DLL]DADOMDF.TMP;1 on 18-APR-1990 10:40:40.82
File ID (555,17,0)   End of file block 60 / Allocated 60

Virtual block number 38 (00000026), 512 (0200) bytes

000739E3 020202C6 00063A56 020301C5 00062CB2 0203038D 00070692 02030414 ........§...ý,..é...V:..6...D9.. 000000
000300AE 0203039B 00073F65 02050061 000326FC 0203045C 00073C1F 020203DB Û....<..\...=&..a...e?......Û... 000020
00000000 00000000 00000000 0000041F 00073B70 02050F5D 00013AB4 000500E4 ô...Ç:..]...p;.................. 000040
3DF84689 0000FFFF 9A5016FA 468D0A76 FF0C76FF D88EFFFF BB1E5657 00000CC8 à...WV.|...Ä.v..v..F•.P......F½= 000060
00003DF8 46890000 FFFF9A50 16F4468D FA76FF00 4FE9F846 880006E9 03750000 ..u.Õ...F½ÕO..v•.F¶.P......F½=.. 000080
003DF846 890000FF FF9A5016 FC468DF4 76FFF676 FF0031E9 F8468B00 06E90375 u.Õ...F½Õ1..v-.v¶.F=.P......F½=. 0000A0
C95F5E1F 0000E9FF FF097C9A 766AF476 FFF676FF 0010E9F8 468B0006 E9037500 .u.Õ...F½Õ...v-.v¶jv.|...Õ...^_è 0000C0
F0468900 0000189A 5016FA46 8D0A76FF 0C76FFD8 8E0008B8 1E565700 0010C8CB ùà...WV.|...Ä.v..v..F•.P......F̄Þ 0000E0
003DF046 89000000 369A5016 F2468DFA 76FF00A2 E9F0468B 0006E903 7500003D =..u.Õ...FÞÕÅ..v•.F·.P.6....FÞ=. 000100
3DF04689 00000057 9A5016FC 468DF276 FFF476FF 0084E9F0 468B0006 E9037500 .u.Õ...FÞÕ...v¶.v·.F=.P.W....FÞ= 000120
F0468900 00FFFF9A 5016F646 8DF276FF F476FF00 63E9F046 880006E9 03750000 ..u.Õ...FÞÕc..v¶.v·.F-.P......FÞ 000140
75105639 0008E903 740E4639 FE568BFC 46880042 E9F0468B 0006E903 7500003D =..u.Õ...FÞÕB..F=.V±9F.t.Õ..9V.u 000160
0010E900 00B80006 E9037514 56390008 E9037412 4639FE56 8BFC468B 001CE903 .Õ...F=.V±9F.t.Õ..9V.u.Õ..|..Õ.. 000180
8E0089B8 1E565700 0010C8CB C95F5E1F 0000E900 77097C9A 766AF276 FFF476FF .v¶.v·jv.|.w.Õ...^_èùà...WV.|... 0001A0
E9F0468B 0006E903 7500003D F0468900 0000999A 5016FA46 8D0A76FF 0C76FFD8 Ä.v..v..F•.P......F̄Þ=..u.Õ...FÞÕ 0001C0
0088E9F0 468B0006 E9037500 003DF046 89000000 879A5016 F2468DFA 76FF00A9 `..v•.F·.P.ñ....FÞ=..u.Õ...FÞÕ.. 0001E0

Dump of file SATURN:[PCCOMMON.DUMP.DLL]DADOMDF.TMP;1 on 18-APR-1990 10:40:40.82
File ID (555,17,0)   End of file block 60 / Allocated 60

Virtual block number 39 (00000027), 512 (0200) bytes

6AE9F046 880006E9 03750000 3DF04689 00000008 9A5016FC 468DF276 FFF476FF .v¶.v·.F=.P.Ä....FÞ=..u.Õ...FÞÕj 000000
E9F0468B 0006E903 7500003D F0468900 0000F99A 5016F646 8DF276FF F476FF00 ..v¶.v·.F-.P.•....FÞ=..u.Õ...FÞÕ 000020
4639FE56 8BFC468B 001CE903 75105639 0008E903 740E4639 FE568BFC 46880049 |..F=.V±9F.t.Õ..9V.u.Õ...F=.V±9F 000040
007C681E 6E6AF676 FFF876FF 0017E900 00B80006 E9037514 56390008 E9037412 .t.Õ..9V.u.Õ..|..Õ...v½.v-jn.h|. 000060
FF0C76FF D88E015D BB1E5657 00000CC8 C8C95F5E 1F0000E9 0000B800 00FFFF9A .....|..Õ...^_èùà...WV.|]..Ä.v.. 000080
FA76FF00 87E9F846 880006E9 03750000 3DF84689 0000016D 9A5016FA 468D0A76 v..F•.P.m....F̄½=..u.Õ...F½Õ...v• 0000A0
76FFF676 FF0069E9 F8468B00 06E90375 00003DF8 46890000 01B89A50 16F4468D .F¶.P......F½=..u.Õ...F½Õi..v-.v 0000C0
8BFC468B 0048E9F8 46880006 E9037500 003DF846 89000001 AC9A5016 FC468DF4 ¶.F=.P.¯....F½=..u.Õ...F½ÕH..F=. 0000E0
FF9AF476 FFF676FF 002CE900 00B80006 E9037510 56390008 E903740E 4639FE56 V±9F.t.Õ..9V.u.Õ..|..Õ,..v-.v¶.. 000100
00FFFF9A 6E6AF476 FFF676FF 0010E9F8 46880006 E9037500 003DF846 890000FF ....F½=..u.Õ...F½Õ...v-.v¶jn.... 000120
5016FA46 8D0A76FF 0C76FFD8 8E0238B8 1E565700 000CC8CB C95F5E1F 0000E900 .Õ...^_èùà...WV.|8..Ä.v..v..F•.P 000140
669A5016 F4468DFA 76FF006B E9F8468B 0006E903 7500003D F8468900 0002489A .H....F̄½=..u.Õ...F½Õk..v•.F¶.P.f 000160
9A5016FC 468DF476 FFF676FF 004DE9F8 46880006 E9037500 003DF846 89000002 ....F½=..u.Õ...F½ÕM..v-.v¶.F=.P. 000180
03740E46 39FE568B FC468B00 2CE9F846 880006E9 03750000 3DF84689 00000287 .....F½=..u.Õ...F½Õ,..F=.V±9F.t. 0001A0
00E9FFFF B80000FF FF9A006A FA76FF00 10E90000 B80006E9 03751056 390008E9 Õ..9V.u.Õ..|..Õ...v•j......|..Õ. 0001C0
03019A50 16F6468D 0A76FF0C 76FFD88E 02F1B81E 56570000 10C8CBC9 5F5E1F00 ..^_èùà...WV.|þ..Ä.v..v..F-.P... 0001E0
```

```
Dump of file SATURN:[PCCOMMON.DUMP.DLL]DADOMDF.TMP;1 on 18-APR-1990 10:40:40.82
File ID (555,17,0)   End of file block 60 / Allocated 60

Virtual block number 40 (00000028), 512 (0200) bytes

 0000031F 9A5016F0 468DF676 FF0094E9 F4468800 06E90375 00003DF4 46890000 ...F¶=..u.Õ...F¶Õ...v~.FÞ.P..... 000000
 0003409A 5016FC46 8DF076FF F276FF00 76E9F446 880006E9 03750000 3DF44689 .F¶=..u.Õ...F¶Õv..v·.vÞ.F=.P ?.. 000020
 166AFC76 FFFE76FF 0A76FF0C 76FF0055 E9F4468B 0006E903 7500003D F4468900 ..F¶=..u.Õ...F¶ÕU..v..v..v±.v i. 000040
 568BF846 8B002CE9 F4468800 06E90375 00003DF4 46890000 FFFF9A50 16F84680 .F½.P......F¶=..u.Õ...F¶Õ,..F½.. 000060
 9A796AF0 76FFF276 FF0010E9 00008800 06E90375 10563900 08E90374 0E4639FA ª9F.t.Õ..9V.u.Õ..¡..Õ...v·.vÞjy. 000080
 46800A76 FF0C76FF D88E038E B81E5657 000010C8 CBC95F5E 1F0000E9 0000FFFF ....Õ...^_èùà...WV.¡...Ã.v..v..F 0000A0
 16F2468D.FA76FF00 CBE9F046 880006E9 03750000 3DF04689 0000039E 9A5016FA ª.P......FÞ=..u.Õ...FÞÕù..vª.F·. 0000C0
 FC468DF2 76FFF476 FF00ADE9 F0468800 06E90375 00003DF0 46890000 038C9A50 P.¥....FÞ=..u.Õ...FÞÕU..v¶.v·.F= 0000E0
 468DF276 FFF476FF 008CE9F0 46880006 E9037500 003DF046 89000003 DD9A5016 .P.Ï....FÞ=..u.Õ...FÞÕ...v¶.v·.F 000100
 39FE5688 FC468800 68E9F046 880006E9 03750000 3DF04689 000001C0 9A5016F6 -.P.ë....FÞ=..u.Õ...FÞÕk..F=.V±9 000120
 14563900 08E90374 124639FE 5688FC46 88001CE9 03751056 390008E9 03740E46 F.t.Õ..9V.u.Õ...F=.V±9F.t.Õ..9V. 000140
 FFF876FF 00000221 9A007068 1E706AF6 76FFF876 FF0039E9 00008800 06E90375 u.Õ..¡..Õ9..v½.v~jp.h)..!....v½. 000160
 00FFFF9A 736AF276 FFF476FF 0000FFFF 9A006A00 6A006A00 6A016E68 736AF676 v~jshn.j.j.j.j.......v¶.v·js.... 000180
 5016F646 800A76FF 0C76FF08 8E045488 1E565700 0018C8CB C95F5E1F 0000E900 .Õ...^_èùà...WV.¡Ï..Ã.v..v..F-.P 0001A0
 829A5016 E8468DF6 76FF0129 E9EC4688 0006E903 7500003D EC468900 0004649A .d....F§=..u.Õ...F§Õ)..v~.FÒ.P.. 0001C0
 9A5016FC 468DE876 FFEA76FF 010BE9EC 46880006 E9037500 003DEC46 89000004 ....F§=..u.Õ...F§Õ...võ.vÒ.F=.P. 0001E0

Dump of file SATURN:[PCCOMMON.DUMP.DLL]DADOMDF.TMP;1 on 18-APR-1990 10:40:40.82
File ID (555,17,0)   End of file block 60 / Allocated 60

Virtual block number 41 (00000029), 512 (0200) bytes

 5016F246 8DE876FF EA76FF00 EAE9EC46 880006E9 03750000 3DEC4689 000004A3 È....F§=..u.Õ...F§Õõ..võ.vÒ.F·.P 000000
 FFFE76FF 0A76FF0C 76FF00C9 E9EC4688 0006E903 7500003D EC468900 0004C49A .á....F§=..u.Õ...F§Õè..v..v..v±. 000020
 8800A0E9 EC468800 06E90375 00003DEC 46890000 FFFF9A50 16F8468D 126AFC76 v=j..F½.P......F§=..u.Õ...F§Õ... 000040
 67E90375 02470826 078826EE 5EC404EE 46830004 E9F05689 EE4689FA 568BF846 F½.Vª.FŸ.VÞÕ...FŸ.á^Ÿ&..&.G.u.Õg 000060
 76FF0C76 FF004AE9 03740257 39260053 E9037407 39261056 880E4688 EE5EC400 .á^Ÿ.F..V.&9.t.ÕS.&9W.t.ÕJ..v..v 000080
 F476FF00 0005189A 007E681E 706AF276 FFF476FF 0000FFFF 9AF876FF FA76FF0A ..vª.v½......v¶.v·jp.h~.......v¶ 0000A0
 05309A73 6AE876FF EA76FF00 0005309A 006A006A 006A006A 016E6873 6AF276FF .v·jshn.j.j.j.j..0....võ.vÒjs.=. 0000C0
 1F0000E9 00008800 0006489A F876FFFA 76FF0A76 FF0C76FF FF86E900 1AE90000 ..Õ..Õ...v..v..vª.v½.H...¡..Õ... 0000E0
 00000561 9A5016FA 468D0A76 FF0C76FF D88E0551 B81E5657 000010C8 CBC95F5E ^_èùà...WV.¡Q..Ã.v..v..Fª.P.e... 000100
 46890000 057F9A50 16F2468D FA76FF01 08E9F046 880006E9 03750000 3DF04689 .FÞ=..u.Õ...FÞÕ...vª.F·.P......F 000120
 89000005 A09A5016 FC468DF2 76FFF476 FF00EDE9 F0468800 06E90375 000030F0 Þ=..u.Õ...FÞÕU..v¶.v·.F=.P...... 000140
 000005C1 9A5016F6 468DF276 FFF476FF 00CCE9F0 46880006 E9037500 003DF046 FÞ=..u.Õ...FÞÕä..v¶.v·.F-.P.ê... 000160
 390008E9 03740E46 39FE5688 FC468800 ABE9F046 880006E9 03750000 3DF04689 .FÞ=..u.Õ...FÞÕ¨..F=.V±9F.t.Õ..9 000180
 1076FF00 31E90375 14563900.08E90374 124639FE 5688FC46 880047E9 03751056 V.u.ÕG..F=.V±9F.t.Õ..9V.u.Õ1..v. 0001A0
 E9037500 003DF046 890CC483 FFFF07E1 9A0676FF 0876FF0A 76FF0C76 FF0E76FF .v..v..v..v..v..Ã....á..FÞ=..u.Õ 0001C0
 000007AE 9A007F68 1E000268 F676FFF8 76FF004E E90000B8 0054E9F0 46880006 ...FÞÕT.¡..ÕN..v½.v~h@..h...Û... 0001E0

Dump of file SATURN:[PCCOMMON.DUMP.DLL]DADOMDF.TMP;1 on 18-APR-1990 10:40:40.82
File ID (555,17,0)   End of file block 60 / Allocated 60

Virtual block number 42 (0000002A), 512 (0200) bytes

 006A016E 68000868 F676FFF8 76FF0000 06599A00 80681E00 D468F676 FFF876FF .v½.v~hå..h...Y....v½.v~hÃ.hn.j. 000000
 C95F5E1F 0000E901 480F509A 000868F2 76FFF476 FF000006 719A006A 006A006A j.j.j..q....v¶.v·hÃ..}.K.Õ...^_è 000020
 06BC9A50 16FA468D 0A76FF0C 76FF0000 EA46C7D8 8E06ACB8 1E565700 001AC8CB ùà...WV.¡¯..ÃúFõ...v..v..Fª.P.₮. 000040
 0000060A 9A5016E6 468DFA76 FF013FE9 EC468800 06E90375 00003DEC 46890000 ...F§=..u.Õ...F§Õ?..vª.F¦.P.Õ... 000060
 00071C9A 5016EE46 8DE676FF E876FF01 21E9EC46 880006E9 03750000 3DEC4689 .F§=..u.Õ...F§Õ!..vÒ.v¦.FŸ.P.... 000080
 FFFF9A50 16F4468D E676FFE8 76FF0100 E9EC4688 0006E903 7500003D EC468900 ..F§=..u.Õ...F§Õ...vÒ.v¦.F¶.P... 0000A0
 FB9A5016 FC468DE6 76FFE876 FF000FE9 EC468800 06E90375 00003DEC 46890000 ...F§=..u.Õ...F§ÕÕ..vÒ.v¦.F=.P.« 0000C0
 FE76FFF4 76FF0A76 FF0C76FF 00BEE9EC 46880006 E9037500 003DEC46 89000006 ....F§=..u.Õ...F§Õƒ..v..v..v¶.v± 0000E0
 880006E9 03750000 3DEC4689 0000FFFF 9A5016F6 46805016 EA46801E 6AFC76FF .v=j..Fõ.P.F-.P......F§=..u.Õ... 000100
 E3C1F25E 880071E9 0372F246 39EA4688 F246FF00 03E90000 F246C700 8DE9EC46 F§Õ..úf·..Õ...F·.Fõ9F·r.Õq..^·èD 000120
 76FFF076 FF004EE9 03740250 39260057 E9037400 39261056 880E4688 F676C403 .áv~.F..V.&9.t.ÕW.&9P.t.ÕN..vÞ.v 000140
 FF000007 9C9A0082 681E0004 68EE76FF F076FF00 0009189A 0081681E 000268EE Ÿh@..h........vÞ.vŸhå..h........ 000160
 D868E676 FFE876FF 000007C7 9A006A00 6A006A00 6A016E68 000868EE 76FFF076 vÞ.vŸhÃ.hn.j.j.j.j..ù....vÒ.v¦hÃ 000180
 E9881E56 57000010 C8C8C95F 5E1F0000 E90000B8 FF81E900 09E90707 0F509A00 ..}.=.Õ..Õ..¡..Õ...^_èùà...WV.¡Õ 0001A0
 46880006 E9037500 003DF046 89000007 FE9A5016 FA46800A 76FF0C76 FFD88E07 ..Ã.v..v..Fª.P.±....FÞ=..u.Õ...F 0001C0
 E9F0468B 0006E903 7500003D F0468900 00081C9A 5016F246 8DFA76FF 00CEE9F0 ÞÕö..vª.F·.P......FÞ=..u.Õ...FÞÕ 0001E0
```

Dump of file SATURN:[PCCOMMON.DUMP.DLL]DADOMDF.TMP;1 on 18-APR-1990 10:40:40.82
File ID (555,17,0)   End of file block 60 / Allocated 60

Virtual block number 43 (0000002B), 512 (0200) bytes

```
F0468800 06E90375 000030F0 46890000 087F9A50 16FC468D F276FFF4 76FF00B0 ¯..v¶.v·.F•.P......Fþ=..u.Ō...Fþ 000000
46880006 E9037500 003DF046 89000008 309A5016 F6468DF2 76FFF476 FF008FE9 Ō...v¶.v·.F-.P.=....Fþ=..u.Ō...F 000020
FE5688FC 4688001C E9037510 56390008 E903740E 4639FE56 8BFC4688 006EE9F0 þŌn..F=.V±9F.t.Ō..9V.u.Ō...F=.V± 000040
1E008568 F676FFF8 76FF003C E90000B8 0006E903 75145639 0008E903 74124639 9F.t.Ō..9V.u.Ō..¡..Ō<..v½.v-h... 000060
0009349A 006A006A 006A006A 016E6800 8768F676 FFF876FF 00000909 9A008368 h........v½.v-h..hn.j.j.j.j..4.. 000080
5FB81E56 57000018 C8CBC95F 5E1F0000 E90000FF FF9A0087 68F276FF F476FF00 ..v¶.v·h.......Ō...^_èùà...WV.¡ 0000A0
46880006 E9037500 003DEC46 89000009 6F9A5016 F2468D0A 76FF0C76 FFD88E09 ..Ä.v..v..F·.P.o....F̄š=..u.Ō...F̄ 0000C0
E9EC4688 0006E903 7500003D EC468900 00098D9A 5016E846 8DF276FF 012CE9EC šŌ,..v·.FÒ.P......Fš=..u.Ō...FšŌ 0000E0
EC468800 06E90375 00003DEC 46890000 09AE9A50 16FC468D E876FFEA 76FF010E ...vō.vÒ.F•.P.Ū....Fš=..u.Ō...Fš 000100
46880006 E9037500 003DEC46 89000009 CF9A5016 EE468DE8 76FFEA76 FF00EDE9 ŌÚ..vō.vÒ.FŸ.P.ü....Fš=..u.Ō...F 000120
3DEC4689 000005EA 9A5016F8 468D156A FC76FFFE 76FF0A76 FF0C76FF 00CCE9EC šŌä..v..v..v±.v•j..F½.P.ō....Fš= 000140
04F44683 0004E9F6 5689F446 89FA5688 F8468800 A3E9EC46 880006E9 03750000 ..u.Ō...FšŌÈ..F½.V•.F¶.V-Ō...F¶. 000160
0056E903 74073926 105688OE 4688F45E C4006AE9 03750247 0B26078B 26F45EC4 ô^¶&..&.G.u.Ōj.ô^¶.F..V.&9.t.ŌV. 000180
EE76FFF0 76FF0000 0BA69AF8 76FFFA76 FF0A76FF 0C76FF00 4DE90374 02573926 &9W.t.ŌM..v..v..v•.v½.Ì....vþ.vŸ 0001A0
006A006A 006A006A 016E6800 8768EE76 FFF076FF 00000A24 9A008468 1E008568 h...h...$....vþ.vŸh..hn.j.j.j.j. 0001C0
FF0A76FF 0C76FFFF 83E9001A E900000A 4B9A0087 68E876FF EA76FF00 000A3D9A .=....vō.vÒh...K...Ō..Ō...v..v.. 0001E0
```

Dump of file SATURN:[PCCOMMON.DUMP.DLL]DADOMDF.TMP;1 on 18-APR-1990 10:40:40.82
File ID (555,17,0)   End of file block 60 / Allocated 60

Virtual block number 44 (0000002C), 512 (0200) bytes

```
8E0A5FB8 1E565700 0010C8CB C95F5E1F 0000E900 00B80000 06959AF8 76FFFA76 v•.v½.....¡..Ō...^_èùà...WV.¡_.. 000000
E9F04688 0006E903 7500003D F0468900 000A6F9A 5016FA46 8D0A76FF 0C76FFD8 Ä.v..v..F•.P.o....F̄þ=..u.Ō...F̄þŌ 000020
00AFE9F0 46880006 E9037500 003DF046 8900000A 8D9A5016 F2468DFA 76FF00CD ë..v•.F·.P......Fþ=..u.Ō...FþŌ£. 000040
8EE9F046 880006E9 03750000 3DF04689 00000AAE 9A5016FC 468DF276 FFF476FF .v¶.v·.F•.P.Ū....Fþ=..u.Ō...FþŌ. 000060
E9F04688 0006E903 7500003D F0468900 000ACF9A 5016F646 8DF276FF F476FF00 ..v¶.v·.F-.P.ü....Fþ=..u.Ō...FþŌ 000080
4639FE56 8BFC4688 001CE903 75105639 0008E903 740E4639 FE5688FC 4688006D m..F•.V±9F.t.Ō..9V.u.Ō...F•.V±9F 0000A0
0085681E 7F6AF676 FFF876FF 003BE900 00B80006 E9037514 56390008 E9037412 .t.Ō..9V.u.Ō..¡..Ō;..v½.v-j..h.. 0000C0
76FF0000 0B819A00 6A006A00 6A006A01 6E680081 68F676FF F876FF00 000B689A .h....v½.v-h..hn.j.j.j.j.......v 0000E0
D88E0B8D 881E5657 000018C8 CBC95F5E 1F0000E9 0000FFFF 9A008168 F276FFF4 ¶.v·h.......Ō...^_èùà...WV.¡§..Ä 000100
2BE9EC46 880006E9 03750000 3DEC4689 00000BCD 9A5016F2 468D0A76 FF0C76FF .v..v..F·.P.ë....F̄š=..u.Ō...FšŌ+ 000120
FF010DE9 EC468800 06E90375 00003DEC 46890000 0BE89A50 16E8468D F276FF01 ..v·.FÒ.P.Š....Fš=..u.Ō...FšŌ... 000140
00ECE9EC 46880006 E9037500 003DEC46 8900000C 0C9A5016 FC468DE8 76FFEA76 vō.vÒ.F•.P......Fš=..u.Ō...FšŌš. 000160
CBE9EC46 880006E9 03750000 3DEC4689 00000C2D 9A5016EE 468DE876 FFEA76FF .vō.vÒ.FŸ.P.-....Fš=..u.Ō...FšŌù 000180
7500003D EC468900 000AF89A 5016F846 8D196AFC 76FFFE76 FF0A76FF 0C76FF00 ..v..v..v±.v•j..F½.P.½....Fš=..u 0001A0
F45EC404 F4468300 04E9F656 89F44689 FA5688F8 468800A2 E9EC4688 0006E903 .Ō...FšŌÄ..F½.V•.F¶.V-Ō...F¶.ô^¶ 0001C0
57392600 55E90374 07392610 56880E46 8BF45EC4 0069E903 7502470B 26078B26 &..&.G.u.Ōi.ô^¶.F..V.&9.t.ŌU.&9W 0001E0
```

Dump of file SATURN:[PCCOMMON.DUMP.DLL]DADOMDF.TMP;1 on 18-APR-1990 10:40:40.82
File ID (555,17,0)   End of file block 60 / Allocated 60

Virtual block number 45 (0000002D), 512 (0200) bytes

```
1E7F6AEE 76FFF076 FF00000E 029AF876 FFFA76FF 0A76FF0C 76FF004C E9037402 .t.ŌL..v..v..v•.v½......vþ.vŸj.. 000000
000C9A9A 006A006A 006A006A 016E6800 8168EE76 FFF076FF 00000C81 9A008668 h........vþ.vŸh..hn.j.j.j.j..... 000020
76FFFA76 FF0A76FF 0C76FFFF 84E9001A E900000C A89A0081 68E876FF EA76FF00 ..vō.vÒh...´...Ō..Ō...v..v..v•.v 000040
0C76FFD8 8E0C8C88 1E565700 0010C8CB C95F5E1F 0000E900 00B80000 08569AF8 ½.V...¡..Ō...^_èùà...WV.¡¥..Ä.v. 000060
76FF00BC E9F04688 0006E903 7500003D F0468900 000CCC9A 5016FA46 8D0A76FF .v..F•.P.ä....F̄þ=..u.Ō...FþŌ¥..v 000080
FFF476FF 009EE9F0 46880006 E9037500 003DF046 8900000C EA9A5016 F2468DFA •.F·.P.ō....Fþ=..u.Ō...FþŌ...v¶. 0000A0
F476FF00 7DE9F046 880006E9 03750000 3DF04689 0000000B 9A5016FC 468DF276 v·.F•.P......Fþ=..u.Ō...FþŌ)..v¶ 0000C0
4688005C E9F04688 0006E903 7500003D F0468900 00002C9A 5016F646 8DF276FF .v·.F-.P......Fþ=..u.Ō...FþŌ\..F 0000E0
E9037412 4639FE56 8BFC4688 001CE903 75105639 0008E903 740E4639 FE5688FC •.V±9F.t.Ō..9V.u.Ō...F•.V±9F.t.Ō 000100
006A006A 016E6800 DF68F676 FFF876FF 002AE900 00B80006 E9037514 56390008 ..9V.u.Ō..¡..Ō*..v½.v-hŌ.hn.j.j. 000120
C8CBC95F 5E1F0000 E9094424 E79A00DF 68F276FF F476FF00 0000D09A 006A006A j.j..Ì....v¶.v·hŌ..Ō$D.Ō...^_èùà 000140
003DEC46 8900000E 299A5016 F6468D0A 76FF0C76 FFD88E0E 19881E56 57000018 ...WV.¡...Ä.v..v..F-.P.)....F̄š=. 000160
7500003D EC468900 000E479A 5016E846 8DF676FF 011AE9EC 46880006 E9037500 .u.Ō...FšŌ...v-.FÒ.P.G....Fš=..u 000180
00003DEC 46890000 0E689A50 16FC4680 E876FFEA 76FF00FC E9EC4688 0006E903 .Ō...FšŌ•..vō.vÒ.F•.P.h....Fš=.. 0001A0
003DEC46 8900000E 899A5016 F2468DE8 76FFEA76 FF00DBE9 EC468800 06E90375 u.Ō...FšŌÚ..vō.vÒ.F·.P......Fš=. 0001C0
9A5016F8 468D146A FC76FFFE 76FF0A76 FF0C76FF 00BAE9EC 46880006 E9037500 .u.Ō...FšŌ¤..v..v..v±.v•j..F½.P. 0001E0
```

```
Dump of file SATURN:[PCCOMMON.DUMP.DLL]DADOMDF.TMP;1 on 18-APR-1990 10:40:40.82
File ID (555,17,0)   End of file block 60 / Allocated 60

Virtual block number 46 (0000002E), 512 (0200) bytes

 5689EE46 89FA5688 F8468800 91E9EC46 880006E9 03750000 3DEC4689 00000055 U....Fš=..u.Õ...FšÕ...F½.V'.FŸ.V 000000
 1056880E 4688EE5E C40058E9 03750247 08260788 26EE5EC4 04EE4683 0004E9F0 ÞÕ...FŸ.á^Y&..&.G.u.ÕX.á^Y.F..V. 000020
 103C9AF8 76FFFA76 FF0A76FF 0C76FF00 3BE90374 02573926 0044E903 74073926 &9.t.ÕD.&9W.t.Õ;..v..v..v'.v½.<. 000040
 76FFEA76 FF00000E E59A006A 006A006A 006A016E 6800DF68 F276FFF4 76FF0000 ...v¶.v·hÕ.hn.j.j.j.j..î....võ.v 000060
 000000B3 9AF876FF FA76FF0A 76FF0C76 FFFF95E9 001AE90E F524E79A 00DF68E8 ÕhÕ..Õ$%.Õ..Õ...v..v..v'.v½.°... 000080
 FA4680DA 76FF0C76 FFD88E0F 07B81E56 57000010 C8C8C95F 5E1F0000 E9000088 ¡..Õ...^_èùà...WV.¡...Ã.v..v..F' 0000A0
 5016F246 8DFA76FF 00A3E9F0 46880006 E9037500 003DF046 8900000F 179A5016 .P......F̄Þ=..u.Õ...FÞÕÈ..v'.F·.P 0000C0
 16FC468D F276FFF4 76FF0085 E9F04688 0006E903 7500003D F0468900 000F359A .5....FÞ=..u.Õ...FÞÕ...v¶.v·.F=. 0000E0
 F6468DF2 76FFF476 FF0064E9 F0468800 06E90375 00003DF0 46890000 0F569A50 P.V....FÞ=..u.Õ...FÞÕd..v¶.v·.F- 000100
 4639FE56 8BFC468B 0043E9F0 46880006 E9037500 003DF046 8900000F 779A5016 .P.w....FÞ=..u.Õ...FÞÕC..F=.V±9F 000120
 75145639 0008E903 74124639 FE5688FC 4688001C E9037510 56390008 E903740E .t.Õ..9V.u.Õ...F=.V±9F.t.Õ..9V.u 000140
 CBC95F5E 1F0000E9 0000FFFF 9A00E268 F276FFF4 76FF0011 E9000088 0006E903 .Õ..¡..Õ...v¶.v·hã......Õ...^_èù 000160
 3DF04689 00001063 9A5016F6 468D0A76 FF0C76FF D88E1053 B81E5657 000014C8 à...WV.¡S..Ã.v..v..F-.P.c....F̄Þ= 000180
 00003DF0 46890000 10819A50 16EC468D F676FF00 B6E9F046 880006E9 03750000 ..u.Õ...FÞÕŘ..v-.Fš.P......FÞ=.. 0001A0
 003DF046 89000010 A29A5016 FC468DEC 76FFEE76 FF0098E9 F0468800 06E90375 u.Õ...FÞÕ...vŸ.vš.F=.P.Å....FÞ=. 0001C0
 3DF04689 000010C3 9A5016F2 468DEC76 FFEE76FF 0077E9F0 46880006 E9037500 .u.Õ...FÞÕw..vŸ.vš.F·.P.û....FÞ= 0001E0
```

```
Dump of file SATURN:[PCCOMMON.DUMP.DLL]DADOMDF.TMP;1 on 18-APR-1990 10:40:40.82
File ID (555,17,0)   End of file block 60 / Allocated 60

Virtual block number 47 (0000002F), 512 (0200) bytes

 5016F846 8D076AFC 76FFFE76 FF0A76FF 0C76FF00 56E9F046 880006E9 03750000 ..u.Õ...FÞÕV..v..v..v±.v=j..F½.P 000000
 74F84639 1056880E 4688002D E9F04688 0006E903 7500003D F0468900 0004069A ......FÞ=..u.Õ...FÞÕ-..F..V.9F½t 000020
 00008800 06E90000 11149A00 E268EC76 FFEE76FF 0011E903 74FA5639 0019E903 .Õ..9V't.Õ...vŸ.všhã......Õ..¡.. 000040
 9A5016FA 46800A76 FF0C76FF D88E1128 B81E5657 00000CC8 CBC95F5E 1F0000E9 Õ...^_èùà...WV.¡(..Ã.v..v..F'.P. 000060
 11569A50 16F4468D FA76FF00 D1E9F846 880006E9 03750000 3DF84689 00001138 8....F̄½=..u.Õ...F½Õî..v'.F¶.P.V. 000080
 779A5016 FC468DF4 76FFF676 FF00B3E9 F8468800 06E90375 00003DF8 46890000 ...F½=..u.Õ...F½Õ°..v-.v¶.F=.P.w 0000A0
 E903740E 4639FE56 8BFC4688 0092E9F8 46880006 E9037500 003DF846 89000011 ....F½=..u.Õ...F½Õ...F=.V±9F.t.Õ 0000C0
 76FF12AA 26519A00 EF68F476 FFF676FF 0076E900 00880006 E9037510 56390008 ..9V.u.Õ..¡..Õv..v-.v¶hÿ..Q&˙..v 0000E0
 F476FFF6 76FF12C6 26519A00 F168F476 FFF676FF 12882651 9A00F068 F476FFF6 -.v¶hÞ..Q&¡..v-.v¶hÞ..Q&ó..v-.v¶ 000100
 9A00F468 F476FFF6 76FF12E2 26519A00 F368F476 FFF676FF 12D42651 9A00F268 h·..Q&â..v-.v¶hæ..Q&ã..v-.v¶h¶.. 000120
 10272651 9A00F668 F476FFF6 76FF12FE 26519A00 F568F476 FFF676FF 12F02651 Q&Þ..v-.v¶h%..Q&±..v-.v¶h-..Q&'. 000140
 FA4680DA 76FF0C76 FFD88E12 10B81E56 5700000C C8C8C95F 5E1F0000 E9F8468B .F½Õ...^_èùà...WV.¡...Ã.v..v..F' 000160
 5016F446 8DFA76FF 006CE9F8 46880006 E9037500 003DF846 89000012 209A5016 .P. ....F̄½=..u.Õ...F½Õl..v'.F¶.P 000180
 16FC468D F476FFF6 76FF004E E9F8468B 0006E903 7500003D F8468900 00123E9A .>....F½=..u.Õ...F½ÕN..v-.v¶.F=. 0001A0
 0E4639FE 5688FC46 880020E9 F8468800 06E90375 00003DF8 46890000 125F9A50 P. ....F½=..u.Õ...F½Õ-..F=.V±9F. 0001C0
 9C3580D9A 00FA68F4 76FFF676 FF0011E9 00008800 06E90375 10563900 08E90374 t.Õ..9V.u.Õ..¡..Õ...v-.v¶h'...5. 0001E0
```

```
Dump of file SATURN:[PCCOMMON.DUMP.DLL]DADOMDF.TMP;1 on 18-APR-1990 10:40:40.82
File ID (555,17,0)   End of file block 60 / Allocated 60

Virtual block number 48 (00000030), 512 (0200) bytes

 5016FA46 800A76FF 0C76FFD8 8E131388 1E565700 000CC8CB C95F5E1F 0000E912 .Õ...^_èùà...WV.¡...Ã.v..v..F'.P 000000
 419A5016 F4468DFA 76FF006C E9F84688 0006E903 7500003D F8468900 0013239A .#....F̄½=..u.Õ...F½Õl..v'.F¶.P.A 000020
 9A5016FC 468DF476 FFF676FF 004EE9F8 46880006 E9037500 003DF846 89000013 ....F½=..u.Õ...F½ÕN..v-.v¶.F=.P. 000040
 03740E46 39FE5688 FC468800 2DE9F846 880006E9 03750000 3DF84689 00001362 b....F½=..u.Õ...F½Õ-..F=.V±9F.t. 000060
 E9139F35 8D9A00FC 68F476FF F676FF00 11E90000 B80006E9 03751056 390008E9 Õ..9V.u.Õ..¡..Õ...v-.v¶h=...5..Õ 000080
 C19A5016 FA46800A 76FF0C76 FFD88E13 B1B81E56 5700000C C8C8C95F 5E1F0000 ...^_èùà...WV.¡Ý..Ã.v..v..F'.P.ê 0000A0
 0013DF9A 5016F446 8DFA76FF 006CE9F8 46880006 E9037500 003DF846 89000013 ....F̄½=..u.Õ...F½Õl..v'.F¶.P.Õ.. 0000C0
 14009A50 16FC468D F476FFF6 76FF004E E9F8468B 0006E903 7500003D F8468900 ..F½=..u.Õ...F½ÕN..v-.v¶.F=.P... 0000E0
 08E90374 0E4639FE 5688FC46 880020E9 F8468800 06E90375 00003DF8 46890000 ...F½=..u.Õ...F½Õ-..F=.V±9F.t.Õ. 000100
 0000E914 3035809A 00FE68F4 76FFF676 FF0011E9 00008800 06E90375 10563900 .9V.u.Õ..¡..Õ...v-.v¶h±...5=.Õ.. 000120
 00085E9A 5016FE46 8D0676FF 0876FFD8 8E144FB8 1E565700 0008C8CB C95F5E1F .^_èùà...WV.¡O..Ã.v..v..F±.P.^.. 000140
 FFFF9A50 16FA468D 0676FF08 76FF0427 E9F84688 0006E903 7500003D F8468900 ..F̄½=..u.Õ...F½Õ'..v..v..F'.P... 000160
 880A468B FA76FFFC 76FFFE76 FF0406E9 F8468800 06E90375 00003DF8 46890000 ...F½=..u.Õ...F½Õ...v±.v=.v'.F.. 000180
 0A5EC403 DCE9F846 880006E9 03750000 3DF84689 0000FFFF 9A505200 02050C56 V....RP......F½=..u.Õ...F½ÕÉ.á^. 0001A0
 F8468900 00167B9A FFFF6815 9E68FFFF 68157368 046A076A 0277FF26 0477FF26 &.w.&.w.j.j.hs.h..h..h...(. ..F½ 0001C0
 15C9682F 6A016A02 77FF2604 77FF260A 5EC403AB E9F8468B 0006E903 7500003D =..u.Õ...F½Õ¨.á^.&.w.&.w.j.;'hè. 0001E0
```

```
Dump of file SATURN:[PCCOMMON.DUMP.DLL]DADOMDF.TMP;1 on 18-APR-1990 10:40:40.82
File ID (555,17,0)   End of file block 60 / Allocated 60

Virtual block number 49 (00000031), 512 (0200) bytes

 0477FF26 0A5EC403 80E9F846 8B0006E9 03750000 3DF84689 000015CF 9A15CC68 hä..Ü....F½=..u.Õ...F½Õ..á^.&.w. 000000
 46880006 E9037500 003DF846 89000015 FA9AFFFF 6815F468 026A066A 0277FF26 &.w.j.j.h¶.h...'....F½=..u.Õ...F 000020
 46890000 16A69AFF FF68161D 68026A07 6A0277FF 260477FF 260A5EC4 0355E9F8 ½ÕU.á^.&.w.&.w.j.j.h..h...Ì....F 000040
 68164468 076A0277 FF260477 FF260A5E C4032AE9 F8468800 06E90375 00003DF8 ½=..u.Õ...F½Õ*.á^.&.w.&.w.j.hD.h 000060
 260477FF 260A5EC4 0301E9F8 46880006 E9037500 003DF846 890000FF FF9AFFFF ........F½=..u.Õ...F½Õ..á^.&.w.& 000080
 C402DAE9 F8468800 06E90375 00003DF8 46890000 FFFF9AFF FF68166F 680277FF .w.ho.h........F½=..u.Õ...F½ÕÕ.á 0000A0
 89000016 D79AFFFF 6816A068 16786816 7568126A 076A0277 FF260477 FF260A5E ^.&.w.&.w.j.j.hu.hx.h..h...■.... 0000C0
 68026A0A 6A0277FF 260477FF 260A5EC4 02A9E9F8 46880006 E9037500 003DF846 F½=..u.Õ...F½Õ`.á^.&.w.&.w.j.j.h 0000E0
 FF260A5E C4027EE9 F8468800 06E90375 00003DF8 46890000 17029AFF FF6816CB ù.h........F½=..u.Õ...F½Õ~.á^.&. 000100
 003DF846 890000FF FF9AFFFF 6816FC68 16D46816 D168136A 076A0277 FF260477 w.&.w.j.j.hi.hå.h•.h........F½=. 000120
 FF680772 68026A07 6A0277FF 260477FF 260A5EC4 024DE9F8 46880006 E9037500 .u.Õ...F½ÕM.á^.&.w.&.w.j.j.hr.h. 000140
 FF260477 FF260A5E C40222E9 F8468800 06E90375 00003DF8 46890000 FFFF9AFF .......F½=..u.Õ...F½Õ".á^.&.w.&. 000160
 E9037500 003DF846 89000017 8F9AFFFF 68175868 17306817 2D68156A 076A0277 w.j.j.h-.h0.hX.h........F½=..u.Õ 000180
 17BA9AFF FF681783 68026A0D 6A0277FF 260477FF 260A5EC4 01F1E9F8 46880006 ...F½Õþ.á^.&.w.&.w.j.j.h..h...□. 0001A0
 076A0277 FF260477 FF260A5E C401C6E9 F8468800 06E90375 00003DF8 46890000 ...F½=..u.Õ...F½Õ6.á^.&.w.&.w.j. 0001C0
 46880006 E9037500 003DF846 89000017 EB9AFFFF 6817B468 178C6817 8968146A j.h..h..hÇ.h...Š....F½=..u.Õ...F 0001E0

Dump of file SATURN:[PCCOMMON.DUMP.DLL]DADOMDF.TMP;1 on 18-APR-1990 10:40:40.82
File ID (555,17,0)   End of file block 60 / Allocated 60

Virtual block number 50 (00000032), 512 (0200) bytes

 46890000 18169AFF FF6817DF 68026A05 6A0277FF 260477FF 260A5EC4 0195E9F8 ½Õ..á^.&.w.&.w.j.j.hÕ.h........F 000000
 E568196A 076A0277 FF260477 FF260A5E C4016AE9 F8468800 06E90375 00003DF8 ½=..u.Õ...F½Õj.á^.&.w.&.w.j.j.hÍ 000020
 0139E9F8 46880006 E9037500 003DF846 89000018 479AFFFF 68181068 17E86817 .hÕ.h..h...G....F½=..u.Õ...F½Õ9. 000040
 00003DF8 46890000 18729AFF FF68183B 68026A15 6A0277FF 260477FF 260A5EC4 á^.&.w.&.w.j.j.h;.h...r....F½=.. 000060
 18446818 4168076A 076A0277 FF260477 FF260A5E C4010EE9 F8468800 06E90375 u.Õ...F½Õ..á^.&.w.&.w.j.j.hA.hD. 000080
 260A5EC4 000DE9F8 46880006 E9037500 003DF846 89000015 799AFFFF 68186C68 hl.h...y....F½=..u.Õ...F½ÕÏ.á^.& 0000A0
 06E90375 00003DF8 46890000 18909AFF FF681897 68046A08 6A0277FF 260477FF .w.&.w.j.j.h..h........F½=..u.Õ. 0000C0
 0018C89A FFFF6818 C268096A 076A0277 FF260477 FF260A5E C40082E9 F8468800 ..F½Õý.á^.&.w.&.w.j.j.hô.h...à.. 0000E0
 6A076A02 77FF2604 77FF260A 5EC40087 E9F84688 0006E903 7500003D F8468900 ..F½=..u.Õ...F½Õ..á^.&.w.&.w.i.j 000100
 0A5EC400 5CE9F846 8B0006E9 03750000 3DF84689 000018F3 9AFFFF68 18ED680A .hÚ.h...µ....F½=..u.Õ...F½Õ\. ^. 000120
 E9037500 003DF846 89000019 1E9AFFFF 68191868 086A076A 0277FF26 0477FF26 &.w.&.w.j.j.h..h........F½=..u Õ 000140
 15A49AFF FF68156D 680C6A07 6A0277FF 260477FF 260A5EC4 0031E9F8 46880006 ...F½Õ1.á^.&.w.&.w.j.j.hm.h...Ê. 000160
 0032CBC9 5F5E1F00 00E9F846 8B0006E9 F8468800 06E90375 00003DF8 46890000 ..._F½=..u.Õ...F½Õ...F½Õ...^_èÚ2. 000180
 007F0001 10170103 01D50006 151E0203 00000001 14DB0002 01580005 08B00203 ..¯...X...Ú...........f.......¯... 0001A0
 04C90008 15480203 05490002 16A30005 00000002 17270002 14470002 18F00005 ..Þ...G...'.......È...I...H...è. 0001C0
 01E10006 11980203 00860001 00C40103 044C0002 16720005 104B0002 183E0005 ..>...K...r...L...á...........Ã. 0001E0

Dump of file SATURN:[PCCOMMON.DUMP.DLL]DADOMDF.TMP;1 on 18-APR-1990 10:40:40.82
File ID (555,17,0)   End of file block 60 / Allocated 60

Virtual block number 51 (00000033), 512 (0200) bytes

 00F70004 03770203 01550002 15760005 00000005 14ED0002 03D80007 02DD0203 ..Ī...Ù...Ú.......v...U...w...¼. 000000
 00880003 0FA00203 04660007 0DEB0203 09570002 172A0005 0A570002 175B0005 ..[...W...*...W...Š...f......... 000020
 02E90002 16200005 01030004 147D0203 07E10002 16FF0005 04E00008 16230203 ..#...À.......Ã...)...........Õ. 000040
 04080007 04400203 0EFF0002 17B70005 04F40008 175E0203 00940003 11C10203 ..ê.......^...¶...ñ.......@..... 000060
 03860002 16470005 05050008 164A0203 00810002 15700005 00000002 15A10005 ..À.......p.......J.......G..... 000080
 00B70003 0FFE0203 04140007 067E0203 130B0002 18C50005 12080002 189A0005 ..........é.......~.......±...ñ. 0000A0
 06A40002 16CE0005 11200002 186F0005 04A70007 11F60203 0E110002 17860005 ..........~...Ī...o.......ö...£. 0000C0
 052B0008 17330203 13A90002 191B0005 01B60006 14FD0203 03AE0007 02BF0203 ..¢...O...»...Ñ.......`...3...+. 0000E0
 01C50006 149E0203 0CB40002 18130005 02300002 15F70005 00550003 145F0203 .._...U...¥...0.......Ç.......é. 000100
 01CB0001 B81F00FA 3E89D88E FFFFB81E 0BB50002 17E20005 04300007 08BF0203 ......=...ã...ç..|...Ä.>'..|..ù. 000120
 C0330A7E C40676C5 1EDE8BD7 8BEC8B55 00000000 00000000 00000600 02000200 .................U.š.■.B.év.á-.3à 000140
 C4D78BEC 8B5500CB 50FA8BF3 8B1FFFFF 1DC01B05 74A6F3F9 2B01F7AE F2FFFFB9 ¿..·Ú¼Ì+'µÌt..â.....µ.']ù.U.š.■á 000160
 330676C5 1E5657EC 8B550000 01E900CB 5DFA8B91 49D1F7AE F2FFFFB9 C033067E -.3â¿..·Ú¼ÌÌ..']ù.Õ...U.šWV.év.3 000180
 D11B7230 2C1F7739 3CAC0175 2B3C0474 2D3C50F7 74093CFB 74203CAC DB3399C0 à.3Ù¯< t«<.t¼P<-t.<+u.¯<9w.,0r.Ì 0001A0
 07759320 3C580CEB 00D28308 03071309 03D2D1E3 D1D2D1E3 D1FA8BCB 8BD2D1E3 DÌØ.ù.'ÌDÌØÌDÌØ.).■.Ä.Ø.ŠÉX<-.u. 0001C0
 00000000 012E012D 012C0073 0070004B 00000000 CB505F5E 1FDAF700 D283D8F7 ¼Ä.Ø.¼Õ.^_]ù....K.p.s.,.-....... 0001E0
```

```
Dump of file SATURN:[PCCOMMON.DUMP.DLL]DADOMDF.TMP;1 on 18-APR-1990 10:40:40.82
File ID (555,17,0)   End of file block 60 / Allocated 60

Virtual block number 52 (00000034), 512 (0200) bytes

00850008 00000000 00000000 00000000 00000000 000F0000 00800000 00000000 ........Ï.Ô..................... 000000
00000000 0000014A 000000E2 00800000 00000000 00000000 01460145 01440087 ..D.E.F.............â...J....... 000020
0130013C 01380081 00830080 0000FFFF 00020007 00020007 00000000 00000000 ..........................;.<.=. 000040
00880002 0002FFFF 00000000 00000000 00000000 00000000 00000000 00000000 ................................ 000060
74612072 6F662079 7469746E 451F0352 00000000 04930007 00600203 00000006 ......`.........R..Entity for at 000080
62697274 74612079 7469746E 451B0064 6E756F66 20746F6E 20657475 62697274 tribute not found..Entity attrib 0000A0
73206575 6C617620 676E696E 6E696765 42350064 6E756F66 20746F6E 20657475 ute not found.5Beginning value s 0000C0
6174206E 69206573 75206E69 20796461 65726C61 20736920 64656966 69636570 pecified is already in use in ta 0000E0
6D696E69 6D206568 7420726F 66207265 626D756E 20612065 7079542F 00656C62 ble./Type a number for the minim 000100
20746E69 61727473 6E6F432E 00687467 6E656C20 72657463 61726168 63206D75 um character length..Constraint  000120
676E656C 20726574 63617261 68632060 756D696E 69602072 6F662072 6F727265 error for minimum character leng 000140
6E696D20 6F742064 65746167 61706F72 7020746E 69617274 736E6F43 32006874 th.2Constraint propagated to min 000160
756E2061 20657079 54300068 74676E65 6C207265 74636172 61686320 6D756D69 imum character length.0Type a nu 000180
20726574 63617261 68632064 65746365 70786520 65687420 726F6620 7265626D mber for the expected character  0001A0
70786520 726F6620 726F7272 6520746E 69617274 736E6F43 2F006874 676E656C length./Constraint error for exp 0001C0
69617274 736E6F43 33006874 676E656C 20726574 63617261 68632064 65746365 ected character length.3Constrai 0001E0

Dump of file SATURN:[PCCOMMON.DUMP.DLL]DADOMDF.TMP;1 on 18-APR-1990 10:40:40.82
File ID (555,17,0)   End of file block 60 / Allocated 60

Virtual block number 53 (00000035), 512 (0200) bytes

63617261 68632064 65746365 70786520 6F742064 65746167 61706F72 7020746E nt propagated to expected charac 000000
68742072 6F662072 65626D75 6E206120 65707954 2F006874 676E656C 20726574 ter length./Type a number for th 000020
736E6F43 2E006874 676E656C 20726574 63617261 68632060 756D6978 61602065 e maximum character length..Cons 000040
74636172 61686320 6D756D69 78616D20 726F6620 726F7272 6520746E 69617274 traint error for maximum charact 000060
64657461 6761706F 72702074 6E696172 74736E6F 43320068 74676E65 6C207265 er length.2Constraint propagated 000080
6F431F00 6874676E 656C2072 65746361 72616863 206D7560 69786160 206F7420  to maximum character length..Co 0000A0
64412600 65756C61 7620646E 6520726F 6620726F 72726520 746E6961 7274736E nstraint error for end value.&Ad 0000C0
6620676E 6F6C206E 6961606F 64206F74 206E6961 606F6462 75732077 656E2064 d new subdomain to domain long f 0000E0
606F6420 606F7266 206E6961 606F6462 75732061 20657465 6C654429 006D726F orm.)Delete a subdomain from dom 000100
616D6F64 62757320 61206563 616C7065 52280060 726F6620 676E6F6C 206E6961 ain long form.(Replace a subdoma 000120
00000000 00000000 00006072 6F662067 6E6F6C20 6E69616D 6F64206E 69206E69 in in domain long form.......... 000140
65797120 656C6968 77206465 72727563 636F2072 6F727265 206E412A 00010352 R...*An error occurred while qye 000160
65727275 63636F20 726F7272 65206E41 2A006174 61642040 46442067 6E697972 rying DFM data.*An error occurre 000180
20656D6F 53260061 74616420 4C4D4420 676E6979 72657971 20656C69 68772064 d while qyerying DML data.&Some  0001A0
7972746E 65207265 64726F20 65687420 6E692073 72616863 206C6167 656C6C69 illegal chars in the order entry 0001C0
6361736E 61727420 4C4D4420 646E652F 74726174 73206F74 20726F72 72452300 .#Error to start/end DML transac 0001E0

Dump of file SATURN:[PCCOMMON.DUMP.DLL]DADOMDF.TMP;1 on 18-APR-1990 10:40:40.82
File ID (555,17,0)   End of file block 60 / Allocated 60

Virtual block number 54 (00000036), 512 (0200) bytes

6E696464 6120656C 69687720 64657272 7563636F 20726F72 72453100 6E6F6974 tion.1Error occurred while addin 000000
636F2072 6F727245 2D004244 206F7420 6E69616D 6F642062 75732077 656E2067 g new sub domain to DB.-Error oc 000020
6F206E69 61606F64 20627573 20676E69 78696620 656C6968 77206465 72727563 curred while fixing sub domain o 000040
6E696464 6120656C 69687720 64657272 7563636F 20726F72 72452D00 72656472 rder.-Error occurred while addin 000060
7420646E 69662074 276E6143 32004D46 44206F74 206D6574 69207473 656E2067 g nest item to DFM.2Can't find t 000080
7463656A 626F2065 6874206D 6F726620 656C646E 61682074 63656A62 6F206568 he object handle from the object 0000A0
65657266 20726F66 20796568 20657461 65726320 74276E61 43260065 6D616E20  name.&Can't create key for free 0000C0
6961606F 64206120 65766F6D 2074276E 61432800 2E736574 75626972 74746120  attributes..+Can't move a domai 0000E0
2074276E 61433300 736E6961 606F642D 62757320 27737469 20726564 6E75206E n under its' sub-domains.3Can't  000100
6E6F6973 6E656D69 64206568 7420666F 20656061 6E206568 74206567 6E616863 change the name of the dimension 000120
64207765 6E206574 61657263 2074276E 61432C00 6E69616D 6F642060 6F726620  from domain.,Can't create new d 000140
6C61766E 4927006D 726F6620 6E69616D 6F642060 6F726620 6E6F6973 6E656D69 imension from domain form.'Inval 000160
6F697461 7265706F 20656874 20726F66 20726562 60756E20 72656472 6F206469 id order number for the operatio 000180
00000000 FFFF0001 000E0352 00000AC4 00000000 00000000 00000001 0001006E n...............á...R........... 0001A0
00000000 088BFFFF 00110320 00FAFEB5 00981400 0090088A 00000001 00000049 I.......¤.......ç±". .....£..... 0001C0
00000000 0000FFFF FFFF0077 00080034 03110005 80020002 088F0006 00030000 ......¢.........4...w........... 0001E0
```

Dump of file SATURN:[PCCOMMON.DUMP.DLL]DADOMDF.TMP;1 on 18-APR-1990 10:40:40.82
File ID (555,17,0)   End of file block 60 / Allocated 60

Virtual block number 55 (00000037), 512 (0200) bytes

```
00060000 00000000 FFFFFFFF 00600008 00420301 00058001 000108C6 000C0005 ....6.........B...m............. 000000
000B0005 00000000 0000FFFF FFFF006E 000800EC 02F50007 8002000C 08030000 ..Æ.......¥.š...n............... 000020
08E00000 00060000 00000000 FFFFFFFF 00740008 006402E3 00058001 000108D4 å.......D.d...t...............Å. 000040
000108E1 000C0005 00000000 0000FFFF FFFF0076 000800EC 02D80007 8002000C ......Å.š...v...............Å... 000060
80010001 08EE0008 00050000 00000000 FFFFFFFF 00780008 003402C6 00058001 ....6.4...x...............Ý..... 000080
00078002 000C08F7 00000006 00000000 0000FFFF FFFF006F 0008002C 02840005 ....,...o...............¼....... 0000A0
026C0005 80010001 08F80009 00050000 00000000 FFFFFFFF 00700008 00C10278 x.ê...p...............½.......l. 0000C0
00C5023A 00058000 00000902 00000007 00000000 0000FFFF FFFF0072 00080064 d...r.......................:.é. 0000E0
000C0026 025E00CF 80020400 09030003 00030000 00000000 FFFFFFFF 00730030 0.s.....................ü.^.&... 000100
012D000C 0026024C 00CF8002 00000907 00070003 00000000 0000FFFF FFFF012C ,.......................ü.L.&...-. 000120
FFFF012E 000C0026 023A00CF 80020000 090F0006 00030000 00000000 FFFFFFFF ........................ü.:.&....... 000140
FFFFFFFF 00D10008 0072022A 00058001 00010916 00180005 00000000 0000FFFF ........................*.r...Ï..... 000160
0000FFFF FFFF0002 0008001E 021E0007 8002000C 092F0000 00060000 00000000 ........../.............Ø....... 000180
00000000 FFFFFFFF 00D40008 0090021E 00288002 000C0930 00000006 00000000 ........Ô.....+.......å......... 0001A0
00000000 0000FFFF FFFF0007 00080064 02120005 80010001 09310008 00050000 ......1.........d...■........... 0001C0
00030000 00000000 FFFFFFFF 00D80030 00C501E0 00058000 00000930 00000007 ....=.......Å.é.0.Ä............. 0001E0
```

Dump of file SATURN:[PCCOMMON.DUMP.DLL]DADOMDF.TMP;1 on 18-APR-1990 10:40:40.82
File ID (555,17,0)   End of file block 60 / Allocated 60

Virtual block number 56 (00000038), 512 (0200) bytes

```
00070003 00000000 0000FFFF FFFF0147 000C0026 020400CF 80020400 093E0003 ..>.....Ü...&...G............... 000000
094A0006 00030000 00000000 FFFFFFFF 0148000C 002601F2 00CF8002 00000942 B.....Ü.·.&...H...............J. 000020
00010951 00070005 00000000 0000FFFF FFFF0149 000C0026 01E000CF 80020000 ....Ü.Á.&...I...............Q... 000040
8002000C 09590000 00060000 00000000 FFFFFFFF 000A0008 003201D0 00058001 ....Å.2...Ö...............Y..... 000060
00058001 0001095A 000A0005 00000000 0000FFFF FFFF000B 000800C1 01C50007 ..é.ê...Ü...............Z....... 000080
01A70007 8002000C 09650000 00060000 00000000 FFFFFFFF 00DC0008 003201B3 *.2...É...............e.......Ï. 0000A0
00660198 00058001 00010966 000B0005 00000000 0000FFFF FFFF000D 000800C1 ë...Ï...............f.........f. 0000C0
003000C5 01690005 80000000 09720000 00070000 00000000 FFFFFFFF 00DE0008 ..8...............r.......î.é.Ô. 0000E0
00E10008 005A0159 00058001 00010973 00140005 00000000 0000FFFF FFFF000F Ô...............s.......Y.Z...Ä. 000100
FFFF00E2 000800EC 01400007 8002000C 09880000 00060000 00000000 FFFFFFFF ........................M.š...ã... 000120
FFFFFFFF 00EE0030 00F00113 00058001 00020989 00090005 00000000 0000FFFF ........................Þ.O.Ÿ..... 000140
0000FFFF FFFF00EF 000A0046 012E000A 80020004 09930005 00030000 00000000 ........................F...ÿ....... 000160
00000000 FFFFFFFF 00F1000A 0046012E 00508002 00040999 00000003 00000000 ..............P...F...þ......... 000180
00000000 0000FFFF FFFF00F0 000A003C 012E00AA 80020004 09A70008 00030000 ......Ï.....¯...<...þ........... 0001A0
00030000 00000000 FFFFFFFF 00F2000A 00460122 000A8002 000409B3 00080003 ....•........".F...·............ 0001C0
00080003 00000000 0000FFFF FFFF00F3 000A0046 01220050 80020004 09BC0005 ..¥.....P.".F...µ............... 0001E0
```

Dump of file SATURN:[PCCOMMON.DUMP.DLL]DADOMDF.TMP;1 on 18-APR-1990 10:40:40.82
File ID (555,17,0)   End of file block 60 / Allocated 60

Virtual block number 57 (00000039), 512 (0200) bytes

```
09C80006 00030000 00000000 FFFFFFFF 00F4000A 003C0122 00AA8002 000409C2 ô.....˙.".<...¶...............ù. 000000
000409D2 00060003 00000000 0000FFFF FFFF00F5 000A0045 0116000A 80020004 ........E...¥...............Ø... 000020
80020004 09D90006 00030000 00000000 FFFFFFFF 00F6000A 00460116 00508002 ..P...F...−...............Ì..... 000040
00058001 000209E0 00100005 00000000 0000FFFF FFFF00F7 000A003C 011600AA ˆ...<...¼...............Á....... 000060
00F20014 80010001 09F10004 00050000 00000000 FFFFFFFF 00F8001E 00F000ED Ú.Þ...½...............þ.......·. 000080
001E00F4 002D8002 000C09F6 00000006 00000000 0000FFFF FFFF00F9 00080014 ....ª...............−.....·.¶... 0000A0
0008002C 00F30058 80010001 09F70009 00050000 00000000 FFFFFFFF 00FA0008 ..ª...............¥.....X.µ.,... 0000C0
00FC0008 001E00F4 00898002 000C0A01 00000006 00000000 0000FFFF FFFF00FB «.........................¶.....■. 0000E0
FFFF00FD 00080015 00F20082 80010001 0A020004 00050000 00000000 FFFFFFFF ........................ý.·.....»... 000100
FFFFFFFF 00FE0008 001E00F4 00CD8002 000C0A07 00000006 00000000 0000FFFF ......................ë.¶.....±..... 000120
0000FFFF FFFF0084 0008002C 00000005 80010001 0A080008 00050000 00000000 ......................Ï.,........... 000140
00000000 FFFFFFFF 00850008 00C10002 00078002 00080A11 00000006 00000000 ....................Ø.è............. 000160
00000000 0000FFFF FFFF0086 00080032 00C60005 80010001 0A120008 00050000 ..................6.2............... 000180
00030000 00000000 FFFFFFFF 00870030 00C50094 00058002 00000A1B 00000007 ..................é.0............... 0001A0
00070003 00000000 0000FFFF FFFF0144 000C0026 008800CF 80020400 0A1C0003 ........ü.|.&...D............... 0001C0
0A280006 00030000 00000000 FFFFFFFF 0145000C 002600A6 00CF8002 00000A20 .....ü.Ï.&...E...............(. 0001E0
```

```
Dump of file SATURN:[PCCOMMON.DUMP.DLL]DADOMDF.TMP;1 on 18-APR-1990 10:40:40.82
File ID (555,17,0)   End of file block 60 / Allocated 60

Virtual block number 58 (0000003A), 512 (0200) bytes

 00010A2F 00050005 00000000 0000FFFF FFFF0146 000C0026 009400CF 80020000 ....ü...&...F.............../... 000000
 8002000C 0A350000 00060000 00000000 FFFFFFFF 00820008 003C0084 00058001 ......<..................5..... 000020
 00048001 00010A36 00060005 00000000 0000FFFF FFFF0083 000800C1 00780007 ..x.è..................6....... 000040
 003A0005 80020000 0A3D0000 00070000 00000000 FFFFFFFF 00800008 0064006C l.d.................=.......:. 000060
 0026005E 00CF8002 04000A3E 00030003 00000000 0000FFFF FFFF0081 003000C5 é.0.................>.....ü.^.&. 000080
 000C0026 004C00CF 80020000 0A420007 00030000 00000000 FFFFFFFF 0138000C ..;................B.....ü.L.&... 0000A0
 0130000C 0026003A 00CF8002 00000A4A 00060003 00000000 0000FFFF FFFF013C <.................J.....ü.:.&...=. 0000C0
 FFFF0096 002000F0 00050005 80010002 0A510010 00050000 00000000 FFFFFFFF ...............Q.........þ.-..... 0000E0
 FFFFFFFF 00970008 0019001F 00388001 00010A62 00040005 00000000 0000FFFF ............b.....8............. 000100
 0000FFFF FFFF0098 0008001A 001F0078 80010001 0A670004 00050000 00000000 ..........g.....x................ 000120
 00000000 FFFFFFFF 00990008 001A001F 00888001 00010A6C 00040005 00000000 .........l.....l.................. 000140
 00000000 0000FFFF FFFF009A 00080028 0014000A 80010001 0A710007 00050000 ......q.........(............... 000160
 00050000 00000000 FFFFFFFF 009B0008 00280009 000A8001 00010A79 00070005 ....y.........(.................. 000180
 000A0005 00000000 0000FFFF FFFF009C 00080037 00140038 80010001 0A81000A .........8...7..................... 0001A0
 0A97000A 00050000 00000000 FFFFFFFF 009D0008 00370014 00788001 00010A8C .......x...7....................... 0001C0
 00010AA2 000A0005 00000000 0000FFFF FFFF009E 00080037 00140088 80010001 ....l...7..................Å... 0001E0

Dump of file SATURN:[PCCOMMON.DUMP.DLL]DADOMDF.TMP;1 on 18-APR-1990 10:40:40.82
File ID (555,17,0)   End of file block 60 / Allocated 60

Virtual block number 59 (0000003B), 512 (0200) bytes

 80010001 0AAD000A 00050000 00000000 FFFFFFFF 009F0008 00370009 00388001 ..8...7...................Ù..... 000000
 00888001 00010AB8 000A0005 00000000 0000FFFF FFFF00A0 00080037 00090078 x...7.....................l.....l. 000020
 02940005 80030007 0AC30000 000A0000 00000000 FFFFFFFF 00A10008 00370009 ..7...À.................Û......... 000040
 6D616E20 6E69616D 6F440074 63656C65 53000000 0000FFFF FFFF0079 003000F0 þ.0.y.........Select.Domain nam 000060
 7953003A 6E6F6974 70697263 73654400 003A6E6F 69736E65 6D69442A 00003A65 e:..*Dimension:..Description:.Sy 000080
 44006563 616C7065 52006464 41000073 6D796E6F 6E79532A 00003A6D 796E6F6E nonym:..*Synonyms..Add.Replace.D 0000A0
 00003A29 656D616E 202C7265 64726F28 206E6961 6D6F6462 75530065 74656C65 elete.Subdomain (order, name):.. 0000C0
 6574656C 65440065 63616C70 65520064 64410000 736E6961 6D6F6462 75532A00 .*Subdomains..Add.Replace.Delete 0000E0
 65747562 69727474 412A0000 3A657475 62697274 74410000 3A797469 746E4500 .Entity:..Attribute:..*Attribute 000100
 79742061 74614400 003A656C 62617420 65756C61 76206465 776F6C6C 41000073 s..Allowed value table:..Data ty 000120
 747E6562 6168706C 41006369 72656D75 6E7E6168 706C4100 656E6F4E 7E006570 pe.~None.Alpha~numeric.Alphabe~t 000140
 6761607E 49006E61 656C6F6F 427E006C 6165527E 00726567 65746E49 7E006369 ic.~Integer.~Real.~Boolean.I~mag 000160
 6874676E 656C2072 65746361 72616843 006F6564 69567E00 6F696475 417E0065 e.~Audio.~Video.Character length 000180
 3A64726F 7779654B 00003A78 614D0000 3A646574 63657078 4500003A 6E694D00 .Min:..Expected:..Max:..Keyword: 0001A0
 4E006574 656C6544 00656361 6C706552 00646441 00007364 726F7779 654B0000 ..Keywords..Add.Replace.Delete.N 0001C0
 6574656C 65440065 63616C70 65520064 64410000 7365746F 4E2A0000 3A65746F ote:..*Notes..Add.Replace.Delete 0001E0

Dump of file SATURN:[PCCOMMON.DUMP.DLL]DADOMDF.TMP;1 on 18-APR-1990 10:40:40.82
File ID (555,17,0)   End of file block 60 / Allocated 60

Virtual block number 60 (0000003C), 512 (0200) bytes

 72657355 00656D69 54006574 6144006E 6F697461 6D726F66 6E692072 65735500 .User information.Date.Time.User 000000
 5F5F5F5F 005F5F5F 5F5F5F5F 5F5F5F00 64657461 64705500 64657461 65724300 .Created.Updated.__________.____ 000020
 5F5F5F00 5F5F5F5F 5F5F5F5F 5F5F005F 5F5F5F5F 5F5F5F5F 5F005F5F 5F5F5F5F _______.__________.__________.___ 000040
 00000000 00000000 00000000 00005F5F 5F5F5F5F 5F5F5F5F 005F5F5F 5F5F5F5F _______.__________.............. 000060
 00000000 00000000 00000000 00000000 00000000 00000000 00000000 00000000 ................................ 000080
 00000000 00000000 00000000 00000000 00000000 00000000 00000000 00000000 ................................ 0000A0
 00000000 00000000 00000000 00000000 00000000 00000000 00000000 00000000 ................................ 0000C0
 00000000 00000000 00000000 00000000 00000000 00000000 00000000 00000000 ................................ 0000E0
 00000000 00000000 00000000 00000000 00000000 00000000 00000000 00000000 ................................ 000100
 00000000 00000000 00000000 00000000 00000000 00000000 00000000 00000000 ................................ 000120
 00000000 00000000 00000000 00000000 00000000 00000000 00000000 00000000 ................................ 000140
 00000000 00000000 00000000 00000000 00000000 00000000 00000000 00000000 ................................ 000160
 00000000 00000000 00000000 00000000 00000000 00000000 00000000 00000000 ................................ 000180
 00000000 00000000 00000000 00000000 00000000 00000000 00000000 00000000 ................................ 0001A0
 00000000 00000000 00000000 00000000 00000000 00000000 00000000 00000000 ................................ 0001C0
 00000000 00000000 00000000 00000000 00000000 00000000 00000000 00000000 ................................ 0001E0
```

Dump of file SATURN:[PCCOMMON.DUMP.DLL]DAAVTDF.TMP;1 on 18-APR-1990 10:39:43.51
File ID (539,17,0)   End of file block 55 / Allocated 56

Virtual block number 1 (00000001), 512 (0200) bytes

```
00000000 00000040 00000000 000000B8 0000FFFF 00000004 00000034 01D45A40 MZ8.4...........|.......a....... 000000
00000080 00000000 00000000 00000000 00000000 00000000 00000000 00000000 ................................ 000020
6F6E6E61 63206D61 72676F72 70207369 685421CD 4C01B821 CD09B400 0EBA1F0E ..o..Ç.ël|.LëlThis program canno 000040
00000000 00000024 0A0D0D2E 65646F6D 20534F44 206E6920 6E757220 65622074 t be run in DOS mode....$....... 000060
00080009 00000000 00030000 00000000 00068009 1553360F 00070528 0505454E NE..(...06S..................... 000080
00000000 00000000 00010003 00040000 000005AF 0085009F 00940088 0040003B ;.a.......ç.£................... 0000A0
19620F00 1962033B 000F0F00 000F0339 0C6C0F00 0C680262 1D6C0F00 1D6C005F _.l...l.b.k...l.9.......;.b...b. 0000C0
00AB1EF1 00AB0687 006F1EF1 006F0680 1BF00F21 1A520408 03980E21 00000000 ....!...Ä.R.!.Þ...o.þ.o...¨.þ.¨. 0000E0
01000000 46445456 41414407 00640004 00020005 00010005 04A41EB1 04A40692 ..£.Ý.£...........d..DAAVTDF.... 000100
534F4408 4E49574D 50050004 6603E203 5701CC01 AF012F01 0C002200 10000700 .....".../.£.ë.W.ã.f...PMWIN.DOS 000120
534C4044 086C6D64 034B434F 4C42434F 4C4C414D 454D0D4D 454D0353 4C4C4143 CALLS.MEM.MEMALLOCBLOCK.dml.DMLS 000140
4C45444F 4D595245 55514C4D 44134E58 54504F54 534C4D44 0A4E5854 54524154 TARTTXN.DMLSTOPTXN.DMLQUERYMODEL 000160
444C4549 46595245 55514C4D 44004954 47595245 55514C4D 44084S4C 444E4148 HANDLE.DMLQUERYGTI.DMLQUERYFIELD 000180
52455551 4C4D440C 4E4C5259 52455551 4C4D4408 444C4549 46544553 4C4D4408 .DMLSETFIELD.DMLQUERYRLN.DMLQUER 0001A0
464C4D44 08455441 4C45524E 554C4D44 08455441 4C45524C 4D440931 4E4C5259 YRLN1.DMLRELATE.DMLUNRELATE.DMLF 0001C0
4D440C54 58455444 4145524C 4D440845 54414552 434C4D44 09545349 4C454552 REELIST.DMLCREATE.DMLREADTEXT.DM 0001E0
```

Dump of file SATURN:[PCCOMMON.DUMP.DLL]DAAVTDF.TMP;1 on 18-APR-1990 10:39:43.51
File ID (539,17,0)   End of file block 55 / Allocated 56

Virtual block number 2 (00000002), 512 (0200) bytes

```
4D440F4B 4341424C 4C4F524E 5854504F 54534C4D 44125458 45544554 4952574C LWRITETEXT.DMLSTOPTXNROLLBACK.DM 000000
54415453 5443454C 45535952 4555514C 4D441354 43454A42 4F544345 4C45534C LSELECTOBJECT.DMLQUERYSELECTSTAT 000020
54414458 55415952 45555149 5447124C 4F4F544C 4C494B49 54470B49 54470345 E.GTI.GTIKILLTOOL.GTIQUERYAUXDAT 000040
4552434D 41440E45 4D414E54 43454A42 4F544547 4D414410 6D616403 52545041 APTR.dam.DAMGETOBJECTNAME.DAMCRE 000060
4C454552 464D4144 0B45554C 41564554 41455243 4D41440E 42415456 41455441 ATEAVTAB.DAMCREATEVALUE.DAMFREEL 000080
4A424F45 54454C45 444D4144 0C544345 4A424F50 554B4F4F 4C4D4144 0F545349 IST.DAMLOOKUPOBJECT.DAMDELETEOBJ 0000A0
4E415441 4D524F46 4D41440F 5252454D 41444E4F 4E59414C 50534944 4D414413 .DAMDISPLAYNONDAMERR.DAMFORMATAN 0000C0
4D414E59 4259414C 50534944 54524F53 534C4E41 4416736C 6E616405 52524559 YERR.danls.DANLSSORTDISPLAYBYNAM 0000E0
52455551 5453494C 4D464418 4D455449 44444154 53494C4D 46440E4D 46440345 E.DFM.DFMLISTADDITEM.DFMLISTQUER 000100
4D455449 4543414C 50455254 53494C4D 46441244 45544345 4C45534D 45544959 YITEMSELECTED.DFMLISTREPLACEITEM 000120
45535544 4C454946 59524555 514D4644 1540524F 46535345 434F5250 4D46440E .DFMPROCESSFORM.DFMQUERYFIELDUSE 000140
4D444859 52455551 4D46440F 50414548 42485952 4555514D 46440E41 54414452 RDATA.DFMQUERYHBHEAP.DFMQUERYHDM 000160
474C4444 4E574859 52455551 4D46440F 4D544859 52455551 4D464408 4A424F4C LOBJ.DFMQUERYHTM.DFMQUERYHWNDDLG 000180
44104154 41445245 53555952 4555514D 4644104C 4F4F5459 52455551 4D46440C .DFMQUERYTOOL.DFMQUERYUSERDATA.D 0001A0
46440F4E 4645534F 4C435445 53D4644 00444C45 49465245 54534947 45524D46 FMREGISTERFIELD.DFMSETCLOSEFN.DF 0001C0
4644104E 464C4F52 544E4F43 5445534D 46440F4E 46444E41 4D4D4F43 5445534D MSETCOMMANDFN.DFMSETCONTROLFN.DF 0001E0
```

Dump of file SATURN:[PCCOMMON.DUMP.DLL]DAAVTDF.TMP;1 on 18-APR-1990 10:39:43.51
File ID (539,17,0)   End of file block 55 / Allocated 56

Virtual block number 3 (00000003), 512 (0200) bytes

```
46440E4E 46594649 544F4E54 45534D46 440E4E46 45544147 4956414E 5445534D MSETNAVIGATEFN.DFMSETNOTIFYFN.DF 000000
4D524F46 474E4F4C 45544147 4956414E 4D464413 41544144 52455355 5445534D MSETUSERDATA.DFMNAVIGATELONGFORM 000020
52504D46 44194C4F 52544E4F 43544944 45545349 4C535345 434F5250 4D464419 .DFMPROCESSLISTEDITCONTROL.DFMPR 000040
53494C59 52455551 4D464417 444E414D 4D4F4354 49444554 53494C53 5345434F OCESSLISTEDITCOMMAND.DFMQUERYLIS 000060
454D5941 4C505349 444D4144 104D524F 46414406 44455443 454C4553 584F4254 TBOXSELECTED.DAFORM.DAMDI PLAYME 000080
45534D52 4F464144 0E4F464E 49524553 5554494E 494D524F 46414412 5252454D MERR.DAFORMINITUSERINFO.DA RMSE 0000A0
454D414E 54494E49 4A424F08 5443454C 45535449 4E494A42 4F0D454C 54495454 TTITLE.OBJINITSELECT.OBJINI AME 0000C0
53454445 54414450 554A424F 00454D41 4E535543 4F464554 41445055 4A424F12 .OBJUPDATEFOCUSNAME.OBJUPDATEDES 0000E0
4D441654 554C4D44 0552424D 4444414A 424F0943 53454454 494E494A 424F0B43 C.OBJINITDESC.OBJADDMBR.DMLUT.DM 000100
54534947 45525455 4C4D4413 52454C44 4E414859 4649544F 4E454B41 4D54554C LUTMAKENOTIFYHANDLER.DMLUTREGIST 000120
5254554C 4D441254 45535245 54534947 45525455 4C4D4410 4554454C 45445245 ERDELETE.DMLUTREGISTERSET.DMLUTR 000140
18594649 544F4E53 5345434F 52505455 4C4D4412 45544952 57524554 53494745 EGISTERWRITE.DMLUTPROCESSNOTIFY. 000160
084F4953 03455441 4C45524E 55455441 4C455252 45545349 47455254 554C4D44 DMLUTREGISTERRELATEUNRELATE.SIO. 000180
726F6660 49204144 204D5020 322F534F 26000018 35030101 45544952 57534F44 DOSWRITE...5...&OS/2 PM DA Imfor 0001A0
4F424241 5456410E 00006D72 6F462067 6E6F4C20 6C65646F 4D206E6F 6974616D mation Model Long Form...AVTABBO 0001C0
890A4688 D88EFFFF B81E5657 000012C8 00000000 00000000 01504152 5453544F OTSTRAP.........à...WV.|...Ä.F.. 0001E0
```

```
Dump of file SATURN:[PCCOMMON.DUMP.DLL]DAAVTDF.TMP;1 on 18-APR-1990 10:39:43.51
File ID (539,17,0)   End of file block 55 / Allocated 56

Virtual block number 4 (00000004), 512 (0200) bytes

 003DF046 890000FF FF9A5016 FC468DEE 76FF0E76 FF1076FF 00FCE9EE 468BEE46 FŸ.FŸÕ=..v..v..vŸ.F=.P......Fÿ=. 000000
 FFF676FF FA5689F8 46890257 8B26078B 26FC5EC4 00E3E9F0 46880006 E9037500 .u.Õ...FÞÕO.á^=&..&.W..F%.V*.v-. 000020
 0000FFFF 9A004368 1E008668 F476FFF6 76FF0000 006C9A00 42681E00 8568F476 v¶h...hB..(....v-.v¶h...hC...... 000040
 8EE9F046 880006E9 03750000 3DF04689 0000FFFF 9A5016F2 468D0E76 FF1076FF .v..v..F·.P......FÞ=..u.Õ...FÞÕ. 000060
 E9F0468B 0006E903 7500003D F0468900 00FFFF9A 5016F446 8D0E76FF 1076FF00 ..v..v..F¶.P......FÞ=..u.Õ...FÞÕ 000080
 FFFF9AF2 76FFF876 FFFA76FF 0676FF08 76FF0A76 FF0C76FF F476FFF6 76FF0060 m..v-.v¶.v..v..v..v..v*.v%.v·... 0000A0
 9A0E76FF 1076FFF4 76FFF676 FF003CE9 F0468B00 06E90375 00003DF0 46890000 ...FÞ=..u.Õ...FÞÕ<..v-.v¶.\ .v.. 0000C0
 0EE90000 B80014E9 0017E9F0 46880006 E9037500 003DF046 8908C483 FFFF046D m....á..FÞ=..u.Õ...FÞÕ..Õ..¦  ñ. 0000E0
 0008B81E 56570000 14C8000C CAC95F5E 1FFFECE9 FEFCE903 7500883D 0008E900 .Õ..=..u.Õ=±Õš..^ èò..à...WV.¦.. 000100
 16FC468D F076FF0E 76FF1076 FF0083E9 F0468B00 01EC46C7 F046890A 468B088E .Ã.F..FÞúFš...FÞÕ"..v..v..vÞ.F=. 000120
 578B2607 8B26FC5E C400CCE9 EE468800 06E90375 00003DEE 46890000 00279A50 P.'....FŸ=..u.Õ...FŸÕë.á^=&..&.W 000140
 E9037500 003DEE46 89000000 7C9A5016 F2468D0E 76FF1076 FFFA5689 F8468902 ..F%.V*.v..v..F·.P.|....FŸ=..u.Õ 000160
 03750000 3DEE4689 0000009D 9A5016F4 468D0E76 FF1076FF 009BE9EE 46880006 ...FŸÕ...v..v..F¶.P......FŸ=..u. 000180
 76FFFA76 FF0676FF 0876FF0A 76FF0C76 FFF476FF F676FF00 7AE9EE46 8B0006E9 Õ...FŸÕz..v-.v¶.v..v..v..v..v*.v 0001A0
 0000B800 1CE90049 E9EE468B 0006E903 7500003D EE468900 00FFFF9A F276FFF8 %.v·......FŸ=..u.Õ...FŸÕI.Õ..¦.. 0001C0
 68F476FF F676FFFF E4E9FF3D E9037700 8B3DFFEF E9037300 89300013 E90040E9 Õâ.Õ..=..s.Õÿ.=..w.Õ=.ÕÕ..v-.v¶h 0001E0

Dump of file SATURN:[PCCOMMON.DUMP.DLL]DAAVTDF.TMP;1 on 18-APR-1990 10:39:43.51
File ID (539,17,0)   End of file block 55 / Allocated 56

Virtual block number 5 (00000005), 512 (0200) bytes

 00008800 00005A9A 0067681E 008668F4 76FFF676 FF000002 299A0066 681E0085 ...hf..)....v-.v¶h...hg..Z...¦.. 000000
 FF30868D 0876FF0A 76FFD88E 012E881E 56570000 D4C8000C CAC95F5E 1F0000E9 Õ...^_èò..àå..WV.¦...Ã.v..v...0. 000020
 FA76FFFA 5689F846 890000FF FF9A0676 FFFF3086 FFFF3286 FF000001 A49A5016 .P.Ê....Ñ2..Ñ0..v........F%.V*.v* 000040
 00008A00 00B80009 E9037523 FF348E80 0000FFFF 9A5016FF 34868D40 6AF876FF .v%jâ..4..P....../4.#u.Õ..¦..¤.. 000060
 83FF7696 89FF7486 89FFCA83 00000004 C483FFFF 00889A50 16FF3586 8000DFE9 ÕÕ...5..P......á.....ò...t...v.. 000080
 86800676 FFFF3086 FFFF32B6 FF001CE9 0374FFFF 768E8300 26E90374 07FF748E /t..t.Õ&../v..t.Õ...Ñ2..Ñ0..v... 0000A0
 0374FFFF 768E8300 26E90374 06FF748E 830039E9 0000FFFF 9A008068 5016FF78 x..Ph.......Õ9../t..t.Õ&../v..t. 0000C0
 B80009E9 0000FFFF 9A5016FF 78868D00 80680676 FFFF30B6 FFFF3286 FF001CE9 Õ...Ñ2..Ñ0..v.h....x..P.....Õ..¦ 0000E0
 86805016 FC468D00 00FFFF9A 5016FF2E 86800876 FF0A76FF 005AE900 008A0000 ..¤..ÕZ..v..v......P......F=.P.. 000100
 09E90375 00003DFF 2C86890E C48300F2 1C919A08 76FF0A76 FF0676FF 5016FF78 x..P.v..v..v....·..á...,.=..u.Õ. 000120
 E90000FF FF9A5016 FF78868D FC76FFFE 76FFFF2E B6FF0018 E900008A 00008800 .¦..¤..Õ...Ñ...v±.v=..x..P.....Õ 000140
 5016FC46 8D0E76FF 1076FFD8 8E0242B8 1E565700 000AC800 06CAC95F 5E1F0000 ...^_èò..à...WV.¦B..Ã.v..v..F=.P 000160
 FF004AE9 03740C08 7E8300C0 E9F6468B 0006E903 7500003D F6468900 00FFFF9A ......F-=..u.Õ...F-Õâ..-..t.ÕJ.. 000180
 0096E9F6 46880006 E9037500 0030F646 890000FF FF9A5016 F8468D0E 76FF1076 v..v..F%.P......F-=..u.Õ...F-Õ.. 0001A0
 FF9A656A 0E76FF10 76FF000D E903740C 56390015 E903740A 4639FA56 8BF8468B .F%.V*9F.t.Õ..9V.t.Õ...v..v.je.. 0001C0
 FF0C76FF 0277FF26 0477FF26 FC5EC400 0107C726 FC5EC400 6DE90000 B80000FF ...¦..Õm.á^=&ú...á^=&.w.&.w..v.. 0001E0

Dump of file SATURN:[PCCOMMON.DUMP.DLL]DAAVTDF.TMP;1 on 18-APR-1990 10:39:43.51
File ID (539,17,0)   End of file block 55 / Allocated 56

Virtual block number 6 (00000006), 512 (0200) bytes

 5EC40038 E9F6468B 0006E903 7500003D F6468900 00FFFF9A 0676FF08 76FF0A76 v..v..v.......F-=..u.Õ...F-Õ8.á^ 000000
 045C9A00 A1680E76 FF1076FF 0000044E 9A00A068 0E76FF10 76FF0000 07C726FC =&ú....v..v.h...N....v..v.hÀ..\. 000020
 0518C800 0CCAC95F 5E1F0000 E90000B8 0000FFFF 9A009F68 0E76FF10 76FF0000 ...v..v.h.......¦..Õ...^_èò..à.. 000040
 04AD9A00 6A006A00 6A006A01 65680088 680A76FF 0C76FFD8 8E038188 1E565700 .WV.¦...Ã.v..v.h..he.j.j¯j.j..Ù. 000060
 0004D99A 006A006A FDEEB6FF 006A016A 68008868 0A76FF0C 76FFFDEE 86890000 ....Ÿ».v..v.h..hj.j..ÑŸ»j.j..\.. 000080
 0200CA81 000000D2 28FDEE86 8B016868 0088680A 76FF0C76 FFFE5689 FC468900 ..F=.V±.v..v.h..hh...Ÿ»+ß....ò.. 0000A0
 F0868906 C483051E 010C9A50 16FAE886 8D2C6A00 00FFFF9A 5016FAE8 86805052 RP..Ò*.P.....j,..Ò*.P......á...Þ 0000C0
 FDF2968B FDF0868B 0110E900 00B80006 E90374FD F28608FD F0868BFD F29689FD »..·»..Þ»..·»t.Õ..¦..Õ....Þ»..·» 0000E0
 16FAE886 8D0007C6 26FDF09E C408C483 053A0010 9A5016FD F8868D50 52000205 ...RP..%».P...:..á.á.Þ»&ó....Ò*. 000100
 639A5016 FEFA868D 0084680A 76FF0C76 FF08C483 029C0010 9A5016FE FA868050 P..*±.P......á..v..v.h....*±.P.c 000120
 EA868D06 76FF0876 FF000006 009A5016 FDF8868D 0085680A 76FF0C76 FF000005 ....v..v.h....%».P......v..v...ó 000140
 FFFDECB6 FF008DE9 FDE8868B 0007E903 75000030 FDE88689 0000FFFF 9A5016FD ».P.......Ò»=..u.Õ....Ò»Õ...Ñš». 000160
 E9037500 0030FDE8 86890000 FFFF9A50 16FDF486 8D056AFC 76FFFE76 FFFDEAB6 Ñõ».v±.v=j...¶».P.......Ò»=..u.Õ 000180
 FDECB6FF 004CE900 00B80006 E90374FD F6860BFD F4868800 5FE9FDE8 86880007 ....Ò»Õ_...¶»..-»t.Õ..¦..ÕL..Ñš» 0001A0
 003DFDE8 86890000 FFFF9A50 16FCEC86 8D00FA68 FDF486FF FDF686FF FDEAB6FF .Ñõ».Ñ-».Ñ¶»h*...ž=.P.......Ò»=. 0001C0
 0002179A 5016FCEC 86800086 680A76FF 0C76FF00 1BE9FDE8 86880007 E9037500 .u.Õ....Ò»Õ...v..v.h....ž=.P.... 0001E0
```

Dump of file SATURN:[PCCOMMON.DUMP.DLL]DAAVTDF.TMP;1 on 18-APR-1990 10:39:43.51
File ID (539,17,0)   End of file block 55 / Allocated 56

Virtual block number 7 (00000007), 512 (0200) bytes

8D0876FF 0A76FF08 8E0475B8 1E565700 0010C8C8 C95F5E1F 0000E9FD E8868800 ...Ö»Ö...^_èùà...WV.¡u..Ä.v..v.. 000000
0876FF0A 76FF00AC E9F0468B 0006E903 7500003D F0468900 0005749A 5016F246 F·.P.t....Fÿ=..u.Ö...FÞÖ¯..v..v. 000020
76FF0A76 FF008BE9 F0468800 06E90375 00003DF0 46890000 02539A50 16F6468D .F-.P.S....FÞ=..u.Ö...FÞÖ...v..v 000040
FFF476FF 006AE9F0 46880006 E9037500 003DF046 89000003 BB9A5016 FA468008 ..Fª.P.£....FÞ=..u.Ö...FÞÖj..v¶. 000060
F0468800 06E90375 00003DF0 46890000 FFFF9A50 16FE468D FA76FFFC 76FFF276 v·.v■.vª.F±.P......FÞ=..u.Ö...FÞ 000080
830027E9 F0468800 06E90375 00003DF0 46890000 FFFF9A08 76FF0A76 FF0043E9 ÕC..v..v.......FÞ=..u.Ö...FÞÖ'.. 0000A0
0000048E 9A006A00 6A016A00 6A012568 656AF676 FFF876FF 0018E903 7401FE7E -±.t.Ö...v½.v-jeh%.j.j.j.j...... 0000C0
0007C726 0E5EC4D8 8E0625B8 1E565700 000EC800 06CAC95F 5E1F0000 E9F0468B .FÞÖ...^_èò..à...WV.¡%..Äá^.&ú.. 0000E0
E9F2468B 0006E903 7500003D F2468900 0006359A 5016F446 8D1476FF 1676FF00 ..v..v..F¶.P.5....F·=..u.Ö...F·Ö 000100
F2468B00 06E90375 00003DF2 46890000 06569A50 16F8468D 1476FF16 76FF015A Z..v..v..F½.P.V....F·=..u.Ö...F· 000120
46880006 E9037500 003DF246 89000006 779A5016 FC468014 76FF1676 FF0139E9 Õ9..v..v..F■.P.w....F·=..u.Ö...F 000140
FF9A5052 0790BA02 00880196 68106A03 9636FF26 196E068E 006A006A 0118E9F2 ·Ö..j.j...n.&.6..j.h..¡..¤..RP.. 000160
06E90375 00003DF2 46890000 FFFF9A50 52FFFFBA 020088F4 76FFF676 FF0000FF ....v-.v¶¡..¤..RP......F·=..u.Ö. 000180
3D000006 EC9A006A 006A006A 006A0124 68656AF8 76FFFA76 FF0005E9 F2468B00 ..F·Öí..vª.v½jeh$.j.j.j.j..$...= 0001A0
00003DF2 46890000 08189A01 6AFC76FF FE76FFF4 76FFF676 FF007DE9 03750000 ..u.Ö)..v-.v¶.v±.v■j.......F·=.. 0001C0
FFF476FF F676FF00 2FE90086 E9F2468B 0000082E 9AF476FF F676FF00 14E90375 u.Ö...v-.v¶......F·Ö..Ö/..v-.v¶. 0001E0

Dump of file SATURN:[PCCOMMON.DUMP.DLL]DAAVTDF.TMP;1 on 18-APR-1990 10:39:43.51
File ID (539,17,0)   End of file block 55 / Allocated 56

Virtual block number 8 (00000008), 512 (0200) bytes

FFFF9AF4 76FFF676 FF0011E9 03750000 3DF24689 0000FFFF 9A006AFC 76FFFE76 v±.v■j.......F·=..u.Ö...v-.v¶... 000000
46880006 E9037500 003DF246 890000FF FF9AF476 FFF676FF 0054E9F2 46880000 ...F·ÖT..v-.v¶......F·=..u.Ö...F 000020
1476FF16 76FF0000 08749A00 A0681476 FF1676FF 000107C7 260E5EC4 0038E9F2 ·Ö8.á^.&ú....v..v.h...t....v..v. 000040
C95F5E1F 0000E900 00880000 04409A00 9F681476 FF1676FF 00000882 9A00A168 hÀ........v..v.h...@...¡..Ö...^_è 000060
76FF0E76 FF1076FF 1276FF14 76FF1676 FFD88E07 05B81E56 57000002 C80012CA ò..à...WV.¡...Ä.v..v..v..v..v.¯v 000080
0006E903 7500003D FE468900 00FFFF9A FFFF6803 40680676 FF0876FF 0A76FF0C ..v..v..v.h@.h........F±=..u.Ö.. 0000A0
08FC9A00 A1681476 FF1676FF 000008EE 9A00A068 1476FF16 76FF0030 E9FE468B .F±Ö0..v..v.h...Ÿ....v..v.hÀ..•. 0000C0
000AC800 12CAC95F 5E1F0000 E9000088 00000866 9A009F68 1476FF16 76FF0000 ...v..v.h...f...¡..Ö...^_èò..à.. 0000E0
8DFC76FF FE76FF00 0007109A 5016FC46 8D0E76FF 1076FFD8 8E0898B8 1E565700 .WV.¡...Ä.v..v..F■.P......v±.v■. 000100
FC76FFFE 76FF0020 E9FA468B 0006E903 7500003D FA468900 00FFFF9A 5016F646 F-.P......Fª=..u.Ö...FªÖ ..v±.v■ 000120
0CCAC95F 5E1F0000 E90000FF FF9A006A 0A76FF0C 76FF0676 FF0876FF 006A006A j.j..v..v..v..v.j.......Ö...^_èò. 000140
E8468900 00073E9A 5016EE46 8D0876FF 0A76FFD8 8E0915B8 1E565700 0064C800 .àd..WV.¡...Ä.v..v..FŸ.P.>..¯.FÒ 000160
46890000 09259A50 16EA468D 0876FF0A 76FF0149 E9E8468B 0006E903 7500003D ■..u.Ö...FÒÖI..v..v..Fõ.P.%....F 000180
3D000007 5F9A5016 F4468008 76FF0A76 FF0128E9 E8468800 06E90375 00003DE8 Ò=..u.Ö...FÒÖ(..v..v..F¶.P._...= 0001A0
76FF00F9 E9000088 0006E903 74F6460B F4468801 0AE9E846 880006E9 03750000 ..u.Ö...FÒÖ...F¶.F-t.Ö..¡..Öª..v 0001C0
06E90375 00003DE8 46890000 FFFF9A50 16FC468D 026AF476 FFF676FF EA76FFEC &.võ.v-.v¶j..F■.P......FÒ=..u.Ö. 0001E0

Dump of file SATURN:[PCCOMMON.DUMP.DLL]DAAVTDF.TMP;1 on 18-APR-1990 10:39:43.51
File ID (539,17,0)   End of file block 55 / Allocated 56

Virtual block number 9 (00000009), 512 (0200) bytes

FF04F846 830007E9 0000F246 C7FA5689 F84689FE 568BFC46 8B0000E9 E8468800 ..FÒÕÀ..F■.V±.F½.VªúF·..Ö...F½.. 000000
FF260277 FF26F85E C4EA76FF EC76FF00 8FE90375 02470B26 078826F8 5EC4F246 F·á^½&..&.G.u.Ö...v§.võá^½&.w.&. 000020
FFFE76FF EA76FFEC 76FF0029 E9037500 003DE846 890000FF FF9A5016 9C468037 7.F..P......FÒ=..u.Ö)..v§.võ.v±. 000040
FF0058E9 0000B800 00FFFF9A 0068681E E876FFEE 76FFF076 FF00000A DD9AFC76 v■.Ï....vÞ.vŸ.vÒ.hh......¡..ÖX.. 000060
FFEE76FF F076FF00 000AC59A 50169C46 8DFF6A00 6A016168 0676FFEE 76FFF076 vÞ.vŸ.v.ha.j.j..F..P.é....vÞ.vŸ. 000080
FF5BE900 9C46C600 0007CB9A 37FF2602 77FF26F8 5EC4F276 FF006A01 69680676 v.hi.j..v·á^½&.w.&.7.ù...óF..Ö[. 0000A0
16C80006 CAC95F5E 1F0000E9 00008800 00FFFF9A FC76FFFE 76FFEA76 FFEC76FF .v§.võ.v±.v■.....¡..Ö...^_èò..à. 0000C0
76FF0A76 FF000009 899A5016 FDEE868D 0876FF0A 76FFD88E 0979B81E 56570006 ..WV.¡y..Ä.v..v...Ÿ».P......¯v..v 0000E0
F0B6FF00 0009CB9A 5016FDF8 86800876 FF0A76FF 000009AA 9A5016FD EA868D08 ...õ».P.¯....v..v...½».P.ù....Ñÿ 000100
EEB6FFFD F0B6FF00 000B619A 006A006A 01006800 6A014368 008468FD EEB6FFFD ».ÑŸ»h..hC.j.h..j.j..a....ÑÞ».ÑŸ 000120
FAB6FFFD EAB6FFFD ECB6FF00 000AA59A 006A006A 01006800 6A014368 008568FD »h..hC.j.h..j.j..Ê....Ñš».Ñõ».Ѫ 000140
B6FF0018 E9037500 003DF9EA 86890000 0A029A50 16FDF286 8D036AFD FBB6FFFD ».Ñ½»j...·».P.......õª=..u.Ö...Ñ 000160
EAB6FFFD ECB6FF01 A1E90000 B800000C 429A0078 681EF9EA B6FFFDEE B6FFFDF0 Þ».ÑŸ».Ñõª.hx..B...¡..ÖÀ..Ñš».Ñõ 000180
86C7FDE8 9689FDE6 8689FDF4 968BFDF2 86880000 FFFF9AFD F2B6FFFD F4B6FFFD ».Ѷ».Ñ·»........·»..¶»..Ì»..Ö»ú. 0001A0
013FE903 7502470B 26078826 FDE69EC4 FDF686FF 04FDE686 830009E9 0000FDF6 -»..Ö....Ì»...-»á.Ì»&..&.G.u.Ö?. 0001C0
00000C68 9A5016FE FE868002 6A37FF26 0277FF26 FDE69EC4 FDEAB6FF FDECB6FF .Ñš».Ñõ»á.Ì»&.w.&.7j...±±.P.h... 0001E0

Dump of file SATURN:[PCCOMMON.DUMP.DLL]DAAVTDF.TMP;1 on 18-APR-1990 10:39:43.51
File ID (539,17,0)   End of file block 55 / Allocated 56

Virtual block number 10 (0000000A), 512 (0200) bytes

```
000C899A FDF2B6FF FDF4B6FF FDEAB6FF FDECB6FF 0030E903 7500003D F9EA8689 ..õ¹=..u.ÕO..Ñš».Ñõ».Ñ¶».Ñ·».... 000000
FDECB6FF 00FEE900 00B80000 0C9E9A00 87681EF9 EAB6FFFD EEB6FFFD F0B6FF00 ..Ñb».ÑY».Ñõ¹.h.......¡..Õ±..Ñš» 000020
F9EA8689 0000FFFF 9A5016FD FC868D03 6A37FF26 0277FF26 FDE69EC4 FDEAB6FF .Ñõ»á.Ì»&.w.&.7j...•».P.......õ¹ 000040
F0B6FF00 0000409A FDF2B6FF FDF4B6FF FDEAB6FF FDECB6FF 0030E903 75000030 =..u.ÕO..Ñš».Ñõ».Ñ¶».Ñ·».ə....Ñb 000060
FDEAB6FF FDECB6FF 00A2E900 00B80000 0A859A00 96681EF9 EAB6FFFD EEB6FFFD ».ÑY».Ñõ¹.h.......|..ÕÀ..Ñš».Ñõ» 000080
03750000 3008B81C 039A00FB 685016FC EA868D05 6A37FF26 0277FF26 FDE69EC4 á.Ì»&.w.&.7j...õ•.Ph«....£.=..u. 0000A0
9A5016F9 EC868D00 A5681E50 16FEFE86 8D5016FD FC868D00 71E98E89 880006E9 Õ..¡¿.Õq...•».P..±±.P.hÉ...š¹.P. 0000C0
77FF26FD E69EC450 16F9EC86 8D004468 1EFDEEB6 FFFDF0B6 FF10C483 04E8008C ..Õ..á..Ñb».ÑY».hD...š¹.Pá.Ì»&.w 0000E0
FFFEA8E9 001EE9F9 EA868800 07E90375 00003DF9 EA868900 00FFFF9A 37FF2602 .&.7.......õ¹=..u.Õ....õ¹Õ..Õ´±. 000100
06CAC95F 5E1F0000 E90000B8 00000A73 9AFDF2B6 FFFDF4B6 FFFDEAB6 FFFDECB6 Ñš».Ñõ».Ñ¶».Ñ·».s...|..Õ...^_èò. 000120
86890000 0B079A50 16FDF886 8D1476FF 1676FFD8 8E0AF6B8 1E565700 040EC800 .à...WV.¡–..Ä.v..v...½».P....... 000140
8D010068 008468FD F8B6FFFD FAB6FF00 F9E9FBF2 86880007 E9037500 0030FBF2 ·«=..u.Õ....·«Õ¹..Ñ¹».Ñ½»h..h... 000160
089A5016 FDFC868D 01006800 8568FDF8 B6FFFDFA B6FF0000 0DAF9A50 16FEFE86 .±±.P.£....Ñ¹».Ñ½»h..h....•».P.. 000180
FF9A0676 FF0876FF 0A76FF0C 76FF0E76 FF1076FF 1276FF14 76FF1676 FF000003 ....v..v..v..v..v..v..v..v..v... 0001A0
FEFE868D 5016FDFC 86800094 E9FBF286 8B0007E9 03750000 3DFBF286 890000FF .....·«=..u.Õ....·«Õ....•».P..±± 0001C0
68008868 FDF8B6FF FDFAB6FF 10C4830C F2008C9A 5016FBF4 868D00AC 681E5016 .P.h¯...¶«.P...·..á..Ñ¹».Ñ½»h..h 0001E0
```

Dump of file SATURN:[PCCOMMON.DUMP.DLL]DAAVTDF.TMP;1 on 18-APR-1990 10:39:43.51
File ID (539,17,0)   End of file block 55 / Allocated 56

Virtual block number 11 (0000000B), 512 (0200) bytes

```
00B3681E 008568FD F8B6FFFD FAB6FF00 000B459A 5016FBF4 868D006A 006A0166 f.j.j...¶«.P.E....Ñ¹».Ñ½»h...h°. 000000
681476FF 1676FF00 00054F9A 00B4681E 008668FD F8B6FFFD FAB6FF00 000E459A .E....Ñ¹».Ñ½»h...hÇ..O....v..v.h 000020
E09A009F 681476FF 1676FF00 000E6F9A 00A16814 76FF1676 FF00000E 619A00A0 ...a....v..v.hÀ..o....v..v.h...À 000040
065EC4D8 8E0D59B8 1E565700 0920C800 12CAC95F 5E1F0000 E9FBF286 88000008 .....·«Õ...^_èò..à ..WV.¡Y..Áá^. 000060
89000000 6A9A5016 FCEE868D 1476FF16 76FF0004 07C7260E 5EC40789 2612468B .F.&..á^.&ú.¯...v..v...Ÿ•.P.j.... 000080
6A039636 FF26196E 068E006A 006A0515 E9F9E286 880007E9 03750000 30F9E286 .ã¹=..u.Õ....ã¹Õ..j.j...n.&.6..j 0000A0
16F6E086 8D004468 1EFCEEB6 FFFCF0B6 FF000010 469A0A76 FF0C76FF 01966812 .h...v..v..F....Ñb•.ÑY•.hD...Á–. 0000C0
E2868B00 07E90375 00003DF9 E2868900 00FFFF9A 5016FC46 8D5016F9 E4868D50 P..Õ¹.P.F•.P.......ã¹=..u.Õ....ã 0000E0
F0B6FF00 000F429A 5016FEFA 86800100 68008468 FCEEB6FF FCF0B6FF 04C3E9F9 ¹Õú..Ñb•.ÑY•h..h....¹±.P.B....Ñb 000100
8668FCEE B6FFFCF0 B6FF0000 0F5B9A50 16FCF686 8D010068 008568FC EEB6FFFC •.ÑY•h..h....–•.P.[....Ñb•.ÑY•h. 000120
8D00B568 1E5016FE FA868D50 16FCF686 8D000000 969A5016 F6E2868D 00FA6800 .h¹...ã–.P.......–•.P..¹±.P.hç.. 000140
86890000 0B189A50 16FCEA86 8D1476FF 1676FF10 C4831081 008C9A50 16F7DE86 .B%.P......á..v..v...õ•.P....... 000160
6AFC76FF FE76FFFC EAB6FFFC ECB6FF04 36E9F9E2 86B80007 E9037500 003DF9E2 ã¹=..u.Õ....ã¹Õ6..Ñš•.Ñõ•.v±.v•j 000180
FF0408E9 F9E2868B 0007E903 7500003D F9E28689 00000FE6 9A5016FB E8868D02 ...Õ«.P.Ì.....ã¹=..u.Õ....ã¹Õ... 0001A0
003DF9E2 86890000 0C0C9A50 16FDF886 8D036AFC 76FFFE76 FFFCEAB6 FFFCECB6 Ñš•.Ñõ•.v±.v•j...½».P.......ã¹=. 0001C0
F2868D05 6AFC76FF FE76FFFC EAB6FFFC ECB6FF03 DAE9F9E2 86B80007 E9037500 .u.Õ....ã¹ÕÕ..Ñš•.Ñõ•.v±.v•j...· 0001E0
```

Dump of file SATURN:[PCCOMMON.DUMP.DLL]DAAVTDF.TMP;1 on 18-APR-1990 10:39:43.51
File ID (539,17,0)   End of file block 55 / Allocated 56

Virtual block number 12 (0000000C), 512 (0200) bytes

```
8E006A00 6A03ACE9 F9E2868B 0007E903 75000030 F9E28689 000005A2 9A5016FC •.P.Å.....ã¹=..u.Õ....ã¹Õ¯.j.j.. 000000
B6FFFCEC B6FF0000 078F9A50 5210568A 0200B801 96680E6A 039636FF 26196E06 .n.&.6..j.h..¡..¤V.RP......Ñš•.Ñ 000020
E9F9E286 880007E9 03750000 3DF9E286 89000007 A29A5052 078A8A02 00B8FCEA õ•|..¤..RP.Å.....ã¹=..u.Õ....ã¹Õ 000040
B6FF004D E9037500 003D08C4 8310EA00 469A5016 FBE8868D 5016FEFA 868D0365 e...¹±.P..Õ«.P.F.õ..á.=..u.ÕM..Ñ 000060
00003DF9 E2868900 00110E9A 5016FEFA 868D026A FC76FFFE 76FFFCEA B6FFFCEC š•.Ñõ•.v±.v•j...¹±.P.......ã¹=.. 000080
9AFCEAB6 FFFCECB6 FF000011 2C9A0A76 FF0C76FF 019668F9 E2B6FF00 26E90375 u.Õ&..Ñã¹h...v..v.,.....Ñš•.Ñõ•. 0000A0
3D08C483 115A0046 9A5016FD F8868D50 16FCF686 8D02FCE9 F9E2868B 00001139 9.....ã¹Õ•...–•.P..½».P.F.Z..á.= 0000C0
FFFF9A50 16FCF686 8D036AFC 76FFFE76 FFFCEAB6 FFFCECB6 FF004DE9 03750000 ..u.ÕM..Ñš•.Ñõ•.v±.v•j...–•.P... 0000E0
0000FFFF 9A0A76FF 0C76FF01 9668F9E2 B6FF0026 E9037500 003DF9E2 86890000 ....ã¹=..u.Õ&..Ñã¹h...v..v...... 000100
B4E90374 FCF4860B FCF2868B 0293E9F9 E2868B00 0007FC9A FCEAB6FF FCECB6FF .Ñš•.Ñõ•.•.....ã¹Õ....·•..¶•t.ÕÇ 000120
6AFCEAB6 FFFCECB6 FF009BE9 03750000 3D04C483 00FF0070 9A5016F6 E2868D00 ...ã~.P.p....á.=..u.Õ...Ñš•.Ñõ•j 000140
FF019668 F9E2B6FF 0026E903 7500003D F9E28689 0000FFFF 9A5016FC F2868012 ...·•.P.......ã¹=..u.Õ&..Ñã¹h... 000160
B6FF0229 E9F9E286 88000011 F49AFCEA B6FFFCEC B6FF0000 11E79A0A 76FF0C76 v..v..Ó....Ñš•.Ñõ•.¶.....ã¹Õ)..Ñ 000180
E2868900 00FFFF9A 036AFCF2 B6FFFCF4 B6FF056A FC76FFFE 76FFFCEA B6FFFCEC š•.Ñõ•.v±.v•j..Ñ¶•.Ñ·•j........ã 0001A0
FFFCECB6 FF000012 609A0A76 FF0C76FF 019668F9 E2B6FF00 26E90375 00003DF9 ¹=..u.Õ&..Ñã¹h...v..v..'....Ñš•. 0001C0
12340070 9A5016F6 E2868001 0EE90000 E901D8E9 F9E2868B 00001260 9AFCEAB6 Ñõ•.m.....ã¹ÕÄ.Õ..Õ....ã–.P.p.4. 0001E0
```

```
Dump of file SATURN:[PCCOMMON.DUMP.DLL]DAAVTDF.TMP;1 on 18-APR-1990 10:39:43.51
File ID (539,17,0)   End of file block 55 / Allocated 56

Virtual block number 13 (00000000), 512 (0200) bytes

 16F6E286 8DFCF2B6 FFFCF4B6 FFFCEAB6 FFFCECB6 FF0060E9 03750000 3D04C483 .á.=..u.Õ'..Ñš=.Ñõ=.Ñ¶=.Ñ·=..ã-. 000000
 E9037500 003DF9E2 86890000 FFFF9A50 16F6E286 8D504004 C4830F78 00709A50 P.p.x..ó.@P..ã-.P.......ã'=..u.Õ 000020
 0012C19A FCEAB6FF FCECB6FF 000012B4 9A0A76FF 0C76FF01 9668F9E2 B6FF0026 &..Ñã'h...v..v..Ç....Ñš=.Ñõ=.ê.. 000040
 FFFCF4B6 FF056AFC 76FFFE76 FFFCEAB6 FFFCECB6 FF0098E9 015FE9F9 E2868B00 ...ã'Õ_.Õ...Ñš=.Ñõ=.v±.v=j..Ñ¶=. 000060
 0C76FF01 9668F9E2 B6FF0026 E9037500 003DF9E2 86890000 FFFF9A03 6AFCF2B6 Ñ·=j........ã'=..u.Õ&..Ñã'h...v. 000080
 FCECB6FF 010BE9F9 E2868B00 0013089A FCEAB6FF FCECB6FF 000012FB 9A0A76FF .v..«....Ñš=.Ñõ=.......ã'Õ...Ñš= 0000A0
 E2B6FF00 26E90375 00003DF9 E2868900 00FFFF9A FCF2B6FF FCF4B6FF FCEAB6FF .Ñõ=.Ñ¶=.Ñ·=.......ã'=..u.Õ&..Ñã 0000C0
 F9E2868B 00001345 9AFCEAB6 FFFCECB6 FF000010 C39A0A76 FF0C76FF 019668F9 'h...v..v..Û....Ñš=.Ñõ=.E.....ã' 0000E0
 0000FFFF 9AFC76FF FE76FF50 16F7DE86 8D004468 1EFCEEB6 FFFCF0B6 FF00C4E9 Õá..Ñþ=.ÑŸ=.hD...ß¼.P.v±.v=..... 000100
 0087E9F9 E2868B00 0010D09A FCEAB6FF FCECB6FF 0014E903 7500003D F9E28689 ..ã'=..u.Õ...Ñš=.Ñõ=.Å.....ã'Õ.. 000120
 0067E9F9 E2868B00 07E90375 00003DF9 E2868900 00083F9A FCEAB6FF FCECB6FF .Ñš=.Ñõ=.?.....ã'=..u.Õ....ã'Õg. 000140
 1E008668 FCEEB6FF FCF0B6FF 00001394 9A00BC68 1E008568 FCEEB6FF FCF0B6FF .Ñþ=.ÑŸ=h...h¥.......Ñþ=.ÑŸ=h... 000160
 00A06814 76FF1676 FF000307 C7260E5E C40007C6 260A5EC4 00000E31 9A00BD68 h§..1...á^.&6..á^.&ú....v..v.h.. 000180
 000E539A 009F6814 76FF1676 FF000013 CD9A00A1 681476FF 1676FF00 0013BF9A .¢....v..v.hÅ..ë....v..v.h...S.. 0001A0
 12468B06 5EC4D88E 0E89B81E 56570002 14C80012 CAC95F5E 1F0000E9 0000B800 .¡..Õ...^_èò..à...WV.¡...Äá^..F. 0001C0
 3DFDEE86 8900000E AB9A5016 F8468D14 76FF1676 FF000407 C7260E5E C4078926 &..á^.&ú.¯...v..v..F½.P.¨.....Ÿ»= 0001E0

Dump of file SATURN:[PCCOMMON.DUMP.DLL]DAAVTDF.TMP;1 on 18-APR-1990 10:39:43.51
File ID (539,17,0)   End of file block 55 / Allocated 56

Virtual block number 14 (0000000E), 512 (0200) bytes

 86890000 0F8A9A50 16F4468D 1476FF16 76FF0156 E9FDEE86 880007E9 03750000 ..u.Õ....Ÿ»ÕV..v..v..F¶.P....... 000000
 136A0396 36FF2619 6E068E00 6A006A01 33E9FDEE 86880007 E9037500 003DFDEE Ÿ»=..u.Õ....Ÿ»Õ3.j.j...n.&.6..j. 000020
 868D5016 FDEC868D 0044681E F876FFFA 76FF0000 14BD9A0A 76FF0C76 FF019668 h...v..v..§....v'.v½.hD...š».P.. 000040
 E3E9FDEE 86880007 E9037500 003DFDEE 86890000 0EFD9A50 16FC468D 5016FDF0 Þ».P.F=.P.».....Ÿ»=..u.Õ....Ÿ»ÕD 000060
 6A039636 FF26196E 068E006A 006A0002 E90000B8 0006E903 74FE460B FC468B00 ..F=.F±t.Õ..¡..Õ0.j.j...n.&.6..j 000080
 9A505210 418A0200 88F476FF F676FF00 000EDB9A 505214CB BA020088 0196680F .h..¡..¤ù.RP.Û....v-.v¶¡..¤A.RP. 0000A0
 FE76FFF4 76FFF676 FF008DE9 FDEE8688 0007E903 7500003D FDEE8689 0000105B [.....Ÿ»=..u.Õ....Ÿ»Õ...v-.v¶.v± 0000C0
 88000011 A39AF476 FFF676FF 0012E903 7500003D FDEE8689 000012DD 9AFC76FF .v=.Ï.....Ÿ»=..u.Õ...v-.v¶.É.... 0000E0
 EE868800 07E90375 00003DFD EE868900 0013599A F476FFF6 76FF005E E9FDEE86 .Ÿ»Õ^..v-.v¶.Y.....Ÿ»=..u.Õ....Ÿ 000100
 1476FF16 76FF0000 15549A00 A0681476 FF1676FF 000107C7 260E5EC4 0040E9FD »Õà.á^.&ú....v..v.h...T....v..v. 000120
 EE868800 07C6260A 5EC40000 13B19A00 9F681476 FF1676FF 00001562 9A00A168 hÅ..b....v..v.h...Ÿ...á^.&6....Ÿ 000140
 FF000107 C726065E C4D88E13 E6B81E56 5700030E C80012CA C95F5E1F 0000E9FD »Õ...^_èò..à...WV.¡Ì..Äá^.&ú.... 000160
 FDEE868B 0007E903 7500003D FDEE8689 00001407 9A5016FD F4868D20 76FF2276 v".v ..¯¶».P.......Ÿ»=..u.Õ....Ÿ» 000180
 FDF6B6FF 000015E1 9A5016FF 00868D01 00680085 68FDF4B6 FFFDF6B6 FF027BE9 Õ(..Ñ-».Ñ¶»h..h.......P.Ã....Ñ-» 0001A0
 0006E903 7414460B 12468B00 000F299A 5016FCF2 868D00FA 68008668 FDF4B6FF .Ñ¶»h..h'....=.P.)....F..F.t.Õ.. 0001C0
 8900000B 7E9A5016 FDF8868D 036A1276 FF1476FF 1676FF18 76FF0238 E90000B8 ¡..Õ8..v..v..v..v.j...½».P.~.... 0001E0

Dump of file SATURN:[PCCOMMON.DUMP.DLL]DAAVTDF.TMP;1 on 18-APR-1990 10:39:43.51
File ID (539,17,0)   End of file block 55 / Allocated 56

Virtual block number 15 (0000000F), 512 (0200) bytes

 8EB9B800 0016A69A 1A76FF1C 76FF0196 68FDEEB6 FF0018E9 03750000 3DFDEE86 .Ÿ»=..u.Õ...ÑŸ»h...v..v..Ï...¡¿. 000000
 26FDF09E C404FDF0 86830005 E9FDF296 89FDF086 89FDFA96 8BFDF886 8B01FBE9 Õ«...½»..'»..Þ»..·»Õ....Þ».á.Þ»& 000020
 8680026A 37FF2602 77FF26FD F09EC416 76FF1876 FF008DE9 03750247 0B260788 ..&.G.u.Õ...v..v.á.Þ»&.w.&.7j... 000040
 FFFDFAB6 FF1676FF 1876FF00 28E90375 00003DFD EE868900 000F889A 5016FDFC =».P.¡.....Ÿ»=..u.Õ+..v..v..Ñ'». 000060
 017EE98E B9B80000 173A9A1A 76FF1C76 FF019668 FDEEB6FF 0000160B 9AFDF886 Ñ½».Û....ÑŸ»h...v..v..:...¡¿.Õ-. 000080
 FF1876FF 0019E903 74000030 08C48317 4E00469A 5016FDFC 86800A76 FF0C76FF .v..v...=».P.F.N..á.=..t.Õ...v.. 0000A0
 B6FF1676 FF1876FF FF5EE901 49E98EEE B8000016 F79AFDF8 B6FFFDFA B6FF1676 v..Ñ'».Ñ½».¼...¡Ÿ.ÕI.Õ^..v..v..Ñ 0000C0
 0C76FF0E 76FF1076 FF1276FF 1476FF16 76FF1876 FF0000FF FF9AFDF8 B6FFFDFA '».Ñ½»......v..v..v..v..v..v..v. 0000E0
 FDEEB6FF 0019E903 7500003D FDEE8689 0000FFFF 9A006A50 16FF0086 8D0A76FF .v......Pj........Ÿ»=..u.˜...ÑŸ» 000100
 17AA0070 9A5016FC F2868D00 E9E9FDEE 86880000 17889A1A 76FF1C76 FF019668 h...v..v.........Ÿ»ÕÕ...·=. .p.¯. 000120
 86890000 11789A50 16FEFC86 8D126A16 76FF1876 FF00CCE9 03750000 3D04C483 .á.=..u.Õä..v..v.j...=±.P.x...... 000140
 FDEEB68B 000017D6 9A1A76FF 1C76FF01 9668FDEE B6FF0019 E9037500 003DFDEE Ÿ»=..u.Õ...ÑŸ»h...v..v..ø.....Ÿ» 000160
 4004C483 120E0070 9A5016FC F2868DFE FCB6FFFE FEB6FF16 76FF1876 FF0098E9 Õ...v..v..Ñ±±.Ñ=±..·=.P.p....á.@ 000180
 FF019668 FDEEB6FF 0019E903 7500003D FDEE8689 00001242 9A5016FC F2868D50 P..·=.P.B.....Ÿ»=..u.Õ...ÑŸ»h... 0001A0
 FF260277 FF260E5E C41676FF 1876FF00 4DE9FDEE 86880000 181C9A1A 76FF1C76 v..v.........Ÿ»ÕM..v..v.á^.&.w.&. 0001C0
 B6FF0019 E9037500 003DFDEE 86890000 11C99A03 6AFEFCB6 FFFEFEB6 FF056A37 7j..Ñ±±.Ñ=±j..è.....Ÿ»=..u.Õ...Ñ 0001E0
```

```
Dump of file SATURN:[PCCOMMON.DUMP.DLL]DAAVTDF.TMP;1 on 18-APR-1990 10:39:43.51
File ID (539,17,0)    End of file block 55 / Allocated 56

Virtual block number 16 (00000010), 512 (0200) bytes

5E1F0000 E9FDEE86 880007E9 FDEE868B 00001196 9A1A76FF 1C76FF01 9668FDEE Y»h...v..v........Y»Õ....Y»Õ...^ 000000
00159C9A 5016F246 8D0676FF 0876FFD8 8E158388 1E565700 001CC800 1ECAC95F _èò..à...WV.|...Ä.v..v..F·.P.... 000020
00142A9A 5016EE46 8D0676FF 0876FF00 0001839A 5016F646 8D0676FF 0876FF00 ..v..v..F-.P......v..v..FY.P.*.. 000040
F476FF00 18E90375 00003DE8 46890000 FFFF9A50 16EA468D 146A1E6A F676FF00 ..v-j.j..Fõ.P......Fõ=..u.Õ...v¶ 000060
5689F846 89EC568B EA468B01 21E90000 B80000FF FF9A00BE 681EE876 FFF276FF .v·.vò.h/......|..Õ!..Fõ.V$.F½.V 000080
FFF276FF F476FF00 18E90375 00003D00 0009359A 5016E446 8DEE76FF F076FFFA *.vÞ.vY.Fõ.P.5...=..u.Õ...v¶.v·. 0000A0
57892607 8926E656 88E44688 EA5EC400 E5E90000 88000008 9F9A00CD 681EE876 vò.hë......|..Õ|.ó^õ.Fõ.V|&..&.W 0000C0
195E19CD 9A0676FF 0876FFF8 76FFFA76 FF044789 26064789 260000B8 EA5EC402 .ó^õ|..&.G.&.G..v*.v½.v..v..ë.^. 0000E0
880006E9 03750000 3DE84689 0000187E 9A5016FC 468D066A 1E6AF676 FF08C483 .á..v-j.j..F».P.-....Fõ=..u.Õ... 000100
FFFE76FF 0676FF08 76FFFFFF 0A0E9AFC 76FFFE76 FF0676FF 0876FF00 91E9E846 FõÕ...v..v..v±.v»......v..v..v±. 000120
006A0676 FF0876FF 0000FFFF 9AFFFF68 197E6806 76FF0876 FF0000FF FF9AFC76 v»......v..v.h~.h.........v..v.j. 000140
A0680676 FF0876FF 0000FFFF 9AFFFF68 198F6806 76FF0876 FF0000FF FF9A006A j.......v..v.h..h........v..v.h. 000160
0676FF08 76FF0000 FFFF9AFF FF680CC9 680676FF 0876FF00 00FFFF9A FFFF6819 .h.........v..v.hè.h.........v..v. 000180
0004C800 04CAC95F 5E1F0000 E9000088 0000FFFF 9A039636 FF26196E 068E646A jd..n.&.6.......|..Õ...^_èò..à.. 0001A0
19F46865 6A0676FF 0876FFFE 5689FC46 890C568B 0A468BD8 8E183088 1E565700 .WV.|=..Ä.F..V..F».V±.v.¯v.jeh¶. 0001C0
68FFFF68 676A0676 FF0876FF 00001A1F 9A006A00 6A006AFF FF681A13 68FFFF68 h..h..h..j.j.........v..v.jgh..h 0001E0

Dump of file SATURN:[PCCOMMON.DUMP.DLL]DAAVTDF.TMP;1 on 18-APR-1990 10:39:43.51
File ID (539,17,0)    End of file block 55 / Allocated 56

Virtual block number 17 (00000011), 512 (0200) bytes

FF681A8D 686F6A06 76FF0876 FF00001A 3C9A006A 006A016A FFFF681A 2C68FFFF ..h,.h..j.j.j..<....v..v.joh§.h. 000000
FF68FFFF 68FFFF68 796A0676 FF0876FF 00001A58 9A006A00 6A016A00 6A006AFF .j.j.j.j..[....v..v.jyh..h..h. 000020
0A5EC40A 5F8C2608 47892600 44B80A5E C400001A AF9A006A 006A006A FFFF68FF .h..j.j.j..£....ó^.|D.&.G.&._.ó^. 000040
12578926 10478926 0A5EC402 57882607 8B26FC5E C40E5F8C 260C4789 26005A88 |Z.&.G.&._.ó^»&..&.W.ó^.&.G.&.W. 000060
D49A5052 0008050C 56880A46 88016A00 6A006A00 6A006A00 84680676 FF0876FF .v..v.h..j.j.j.j.j..F..V....RP.å 000080
08050C56 880A468B 016A006A 006AFFFF 681AE668 00886806 76FF0876 FF00001A ....v..v.h..h|.h..j.j.j..F..V... 0000A0
0A468B00 6AFFFF68 18086800 6A006A00 89680676 FF0876FF 00001AF9 9A505200 .RP.*....v..v.h..j.j.h..h..j..F. 0000C0
FFFF681B 3068006A 006A008A 680676FF 0876FF00 001B1E9A 50520008 050C568B .V....RP......v..v.h..j.j.hO.h.. 0000E0
68006A00 6A008B68 0676FF08 76FF0000 1B439A50 52000805 0C568B0A 468B006A j..F..V....RP.C.....v..v.h..j.j.h 000100
009D6806 76FF0876 FF00001B 619A5052 0008050C 5688OA46 8B006AFF FF68190E ..h..j..F..V....RP.a.....v..v.h.. 000120
8D68009E 680676FF 0876FF00 001B7F9A 006A006A 006A006A 006A1B72 68186F68 ho.hr.j.j.j.j.j........v..v.h..h. 000140
681BAB68 009C6806 76FF0876 FF00001B 9D9A006A 006A006A 006A006A 1B90681B .h..j.j.j.j.j........v..v.h..h¨.h 000160
1BCC681B C96800A0 680676FF 0876FF00 001BBB9A 006A006A 006A006A 006A1BAE Û.j.j.j.j.j..£....v..v.h..hè.hë. 000180
006A1BEA 681BE768 00A16806 76FF0876 FF00001B D99A006A 006A006A 006A006A j.j.j.j.j..\....v..v.hÄ.hó.hõ.j. 0001A0
006A006A FFFF68FF FF68009F 680676FF 0876FF00 001BF79A 006A006A 006A006A j.j.j.j..%....v..v.h..h..h..j.j. 0001C0
8BD88E19 D5B81E56 57000004 C8CBC95F 5E1F0000 E90000FF FF9A006A 006A006A j.j.j.......Õ...^_èùà...WV. [..Ä| 0001E0

Dump of file SATURN:[PCCOMMON.DUMP.DLL]DAAVTDF.TMP;1 on 18-APR-1990 10:39:43.51
File ID (539,17,0)    End of file block 55 / Allocated 56

Virtual block number 18 (00000012), 512 (0200) bytes

FF0E76FF 1076FF12 76FF1476 FF0027E9 03751046 080E468B FC4689FE 46890000 ...F±.F».F..F.u.Õ'..v..v..v..v.. 000000
FE460BFC 46880040 E98E8988 0006E903 75000030 00001014 9A5016FC 46800C76 v..F».P.....=..u.Õ..|¿.Õâ..F».F± 000020
E9000005 E69A0876 FF0A76FF 0676FFFC 76FFFE76 FF1276FF 1476FF00 1DE90375 u.Õ...v..v..v±.v».v..v..v..|...Õ 000040
10CAC95F 5E1F0000 E9000088 08C48316 8F00109A 0876FF0A 76FF000C 681E0012 ...hÉ..v..v....¢...ó.|..Õ...^_èò. 000060
0676FF08 76FF0789 26024789 26000088 105EC4D8 8E1C0888 1E565700 0010C800 .à...WV.|...Ää^.|..&.G.&....v..v. 000080
76FF0876 FF009CE9 F0468800 06E90375 00003DF0 46890000 18609A50 16F4468D .F¶.P.m....FÞ=..u.Õ...FÞÕ...v..v 0000A0
E90A468B 007BE9F0 46880006 E9037500 003DF046 89000018 4D9A5016 FA468D06 ..F*.P.M....FÞ=..u.Õ...FÞÕ(..F.Õ 0000C0
8926105E C400000E 1D9A006A 006AFE76 FF006A01 6A686F6A FA76FFFC 76FF0032 2..v».v*johj.j..v±j.j.......ó^.&. 0000E0
FFFFECE9 FFC6E903 75006F30 0008E900 46E90000 B8004CE9 00008802 57892607 .&.W.|..ÕL.|..ÕF.Õ..=o.u.Õõ.Õ$.. 000100
0000FFFF 9A1076FF 1276FF00 6A006AF8 76FF0C76 FF0E76FF F276FFF4 76FFF676 v-.v¶.v·.v..v..v½j.j..v..v....... 000120
02030057 CBC95F5E 1F0000E9 00008800 06E9F046 880006E9 03750000 3DF04689 .FÞ=..u.Õ...FÞÕ..|..Õ...^_èùW.... 000140
0203007F 00011D07 01030437 000A0419 02030000 000119EE 00020153 0006171C ....S...Y............7.......... 000160
0103006B 000410A5 02030000 00021944 000202C8 000819A6 020300E8 000407E6 |...Õ...|...à...Õ.........É...k... 000180
02030087 000115C8 01030AEE 00011AC0 00050086 00011380 01030004 0001027C |...............â...Y...à....... 0001A0
00050100 00080015 02030000 00041C7F 0002036F 00091854 0205024F 00081C86 Ñ...O...T...o...............Å.... 0001C0
02030000 00051488 0002036F 00091851 02020162 00061694 02030971 00011A2F /...q........b...Q...o...|....... 0001E0
```

```
Dump of file SATURN:[PCCOMMON.DUMP.DLL]DAAVTDF.TMP;1 on 18-APR-1990 10:39:43.51
File ID (539,17,0)   End of file block 55 / Allocated 56

Virtual block number 19 (00000013), 512 (0200) bytes

 00050209 00081964 020300F8 0004069E 02030000 00061C99 00020077 0004160B ....W...............½...d...\... 000000
 020306FD 000119F7 00050013 00010263 0103025B 00081CD7 02030379 00011961 a...y...■...[...c.......¼...»... 000020
 00050000 00011981 000503D8 000900CF 020301DF 0008147A 0203016E 00061D4C L...n...z...Ö...ü...Ä........... 000040
 0203035E 0009189B 02030090 0001145A 01030083 00041C38 02030E81 000118OE ........8.......Z............^... 000060
 0203090D 0001088E 00050014 00031920 0203026B 00080325 020302E8 00081953 S...Ò...X...k... ......f....... 000080
 020302F7 0008036B 02030893 00011A16 00050090 000417FE 0203017E 000614F4 ¶...~...±.................k...¥... 0000A0
 0203009A 00041296 020301F8 0008132C 0203027B 00080391 0203036F 00091546 F...o.......x...,...½........... 0000C0
 0203039F 00091A0D 0202039F 00091A10 0205061D 000119F1 0005018B 00061807 ■.......þ....................... 0000E0
 02030289 00081A00 02030126 00011992 000500A6 00040C2D 02030026 000414D0 Å...&...-...|.......&........... 000100
 0203019F 00061629 0203020B 0008198C 0203030B 000800CE 02030382 0009068A ¤.......ö.......¥.......)....... 000120
 0005021A 00080152 02030391 000903EF 020300B2 0004176A 02030032 0004151D ....2...j...ÿ...ÿ.......R....... 000140
 0205003D 000418BD 0203008C 00041C6B 0203029A 00081973 0203023A 000119A3 È...:...s.......k...¥...§...=... 000160
 02030325 000801D5 02030133 00060A57 020303BE 00091A4F 0202038E 00091A52 R...f...O...f...W...3...[...X... 000180
 020301B5 00070BBA 020303CC 00091A4C 020502A8 00081995 020300C8 000417B8 ¡...à.......´...L...ä...¤...ç... 0001A0
 020303AB 000908C1 02030051 00011AE9 000503CC 00091A49 02020230 0008185D ]...O...I...ä...Õ...Q...ê...¨... 0001C0
 0005005D 00041675 020302B8 00081984 02030005 0004150B 02030144 00060963 c...D.......[.......¡...u...]... 0001E0

Dump of file SATURN:[PCCOMMON.DUMP.DLL]DAAVTDF.TMP;1 on 18-APR-1990 10:39:43.51
File ID (539,17,0)   End of file block 55 / Allocated 56

Virtual block number 20 (00000014), 512 (0200) bytes

 00000000 00000000 0000023F 00080B29 0203033F 000802D8 020313DE 00011B33 3...8...Ä...?...)...?........... 000000
 3DF84689 0000FFFF 9A5016FA 468D0A76 FF0C76FF D88EFFFF 881E5657 00000CC8 à...WV.¡...Ä.v..v..F*.P......F½= 000020
 00003DF8 46890000 FFFF9A50 16F4468D FA76FF00 68E9F846 880006E9 03750000 ..u.Õ...F½Ök..v*.F¶.P......F½=.. 000040
 003DF846 890000FF FF9A5016 FC468DF4 76FFF676 FF0040E9 F8468800 06E90375 u.Õ...F½ÕM..v-.v¶.F=.P......F½=. 000060
 E9037510 56390008 E903740E 4639FE56 88FC4688 002CE9F8 46880006 E9037500 .u.Õ...F½Õ,..F=.V±9F.t.Õ. 9V.u.Õ 000080
 000CC8CB C95F5E1F 0000E900 00FFFF9A 676AF476 FFF676FF 0010E900 00880006 ..¡..Õ...v-.v¶jg.....Õ...  èùà.. 0000A0
 7500003D F8468900 0000189A 5016FA46 8D0A76FF 0C76FFD8 8E000888 1E565700 .WV.¡...Ä.v..v..F*.P......-=..u 0000C0
 E9037500 003DF846 89000000 369A5016 F4468DFA 76FF006B E9F8468B 0006E903 .Õ...F½Ök..v*.F¶.P.6....F½=..u.Õ 0000E0
 03750000 3DF84689 00000057 9A5016FC 468DF476 FFF676FF 004DE9F8 46880006 ...F½ÕM..v-.v¶.F=.P.W....F½=..u. 000100
 880006E9 03751056 390008E9 03740E46 39FE5688 FC468800 2CE9F846 880006E9 Õ...F½Õ,..F=.V±9F.t.Õ..9V.u.Õ..¡ 000120
 56570000 10C8CBC9 5F5E1F00 00E9FFFF 880000FF FF9A006A FA76FF00 10E90000 ..Õ...v*j......¡..Õ...^_èùà...WV 000140
 06E90375 00003DF4 46890000 00859A50 16F6468D 0A76FF0C 76FFD88E 00A5881E .¡È..Ä.v..v..F-.P.ç....F¶=..u.Õ. 000160
 880006E9 03750000 3DF44689 00000003 9A5016F0 468DF676 FF0094E9 F4468800 ..F¶Õ...v-.Fþ.P.Æ....F¶=..u.Õ... 000180
 0006E903 7500003D F4468900 0000F49A 5016FC46 8DF076FF F276FF00 76E9F446 F¶Õv..v·.vþ.F=.P.¶....F¶=..u.Õ.. 0001A0
 46890000 FFFF9A50 16F8468D 096AFC76 FFFE76FF 0A76FF0C 76FF0055 E9F4468B .F¶ÕU..v..v..v±.v=j..F½.P......F 0001C0
 10563900 08E90374 0E4639FA 568BF846 88002CE9 F4468800 06E90375 00003DF4 ¶=..u.Õ...F¶Õ,..F½.V*9F.t.Õ..9V. 0001E0

Dump of file SATURN:[PCCOMMON.DUMP.DLL]DAAVTDF.TMP;1 on 18-APR-1990 10:39:43.51
File ID (539,17,0)   End of file block 55 / Allocated 56

Virtual block number 21 (00000015), 512 (0200) bytes

 CBC95F5E 1F0000E9 0000FFFF 9A796AF0 76FFF276 FF0010E9 0000B800 06E90375 u.Õ..¡..Õ...v·.vþjy.....Õ...^_èù 000000
 3DF04689 00000152 9A5016FA 468D0A76 FF0C76FF D88E0142 881E5657 000010C8 à...WV.¡B..Ä.v..v..F*.P.R....F̄þ= 000020
 00003DF0 46890000 01709A50 16F2468D FA76FF00 8AE9F046 880006E9 03750000 ..u.Õ...FþÕ¤..v*.F·.P.p....Fþ=.. 000040
 003DF046 89000001 919A5016 FC468DF2 76FFF476 FF009CE9 F0468800 06E90375 u.Õ...FþÕ...v¶.v·.F=.P......Fþ=. 000060
 3DF04689 0000FFFF 9A5016F6 468DF276 FFF476FF 007BE9F0 46880006 E9037500 .u.Õ...FþÕ(..v¶.v·.F-.P......Fþ= 000080
 03751056 390008E9 03740E46 39FE5688 FC468800 5AE9F046 880006E9 03750000 ..u.Õ...FþÕZ..F=.V±9F.t.Õ..9V.u. 0000A0
 FF0028E9 0000B800 06E90375 14563900 08E90374 124639FE 568BFC46 8B001CE9 Õ...F=.V±9F.t.Õ..9V.u.Õ..¡..Õ(.. 0000C0
 9A6F6AF2 76FFF476 FF0000FF FF9A006A 006A006A 006A016E 686F6AF6 76FFF876 v½.v-john.j.j.j.j.......v¶.v·jo. 0000E0
 76FF0E76 FF1076FF D88E0208 881E5657 000000C8 CBC95F5E 1F0000E9 FFFF0971 q...Õ...^_èùà...WV.¡...Ä.v..v..v 000100
 D88E02F4 881E5657 000000C8 CBC95F5E 1F0000E9 08C483FF FF033C9A 0A76FF0C ..v..<....̄á.Õ...^_èùà...WV.¡¶..Ä 000120
 000018C8 CBC95F5E 1F0000E9 08C48303 07033C9A 0A76FF0C 76FF0E76 FF1076FF .v..v..v..v..<....̄á.Õ...^_èùà... 000140
 03750000 3DF04689 00000218 9A5016FA 468D0676 FF0876FF D88E031C 881E5657 WV.¡...Ä.v..v..F*.P......F̄þ=..u. 000160
 06E90375 00003DF0 46890000 02369A50 16EC468D FA76FF01 18E9F046 880006E9 Õ...FþÕ...v*.Fš.P.6....Fþ=..u.Õ. 000180
 E9037500 003DF046 89000002 579A5016 FC468DEC 76FFEE76 FF00FAE9 F0468800 ..FþÕ*..vŸ.vš.F=.P.W....Fþ=..u.Õ 0001A0
 03750000 3DF04689 00000278 9A5016F6 468DEC76 FFEE76FF 00D9E9F0 46880006 ...FþÕ]..vŸ.vš.F-.P.x....Fþ=..u. 0001C0
 00FFFF9A 5016F246 8D026AFC 76FFFE76 FF0676FF 0876FF00 B8E9F046 880006E9 Õ...FþÕ¡..v..v..v±.v=j..F·.P.... 0001E0
```

```
Dump of file SATURN:[PCCOMMON.DUMP.DLL]DAAVTDF.TMP;1 on 18-APR-1990 10:39:43.51
File ID (539,17,0)   End of file block 55 / Allocated 56

Virtual block number 22 (00000016), 512 (0200) bytes

 04E9EA56 89E84689 F45688F2 4688008F E9F04688 0006E903 7500003D F0468900 ..Fþ=..u.Õ...FþÕ...F·.V¶.FÒ.VõÕ. 000000
 0739260C 56880A46 8BE85EC4 0056E903 75024708 26078826 E85EC404 E8468300 ..FÒ.á^Ò&..&.G.u.ÕV.á^Ò.F..V.&9. 000020
 FF000004 779AF276 FFF476FF 0676FF08 76FF0039 E9037402 57392600 42E90374 t.Õ8.&9W.t.Õ9..v..v..v¶.v·.W.... 000040
 9A6F6AEC 76FFEE76 FF000002 D39A006A 006A006A 006A016E 686F6AF6 76FFF876 v½.v-john.j.j.j.j..£....vŸ.všjo. 000060
 00E90000 B80000FF FF9AF276 FFF476FF 0676FF08 76FFFF97 E9001AE9 02E20971 q.ã.Õ..Õ...v..v..v¶.v·.....¦..Õ. 000080
 03549A50 16FA468D 0A76FF0C 76FFD88E 0344B81E 56570000 10C8CBC9 5F5E1F00 ..^_èùà...WV.¦D..Ä.v..v..F'.P.T. 0000A0
 00000372 9A5016F2 468DFA76 FF00BCE9 F0468B00 06E90375 00003DF0 46890000 ...Fþ=..u.Õ...FþÕ¥..v'.F·.P.r... 0000C0
 0003939A 5016FC46 8DF276FF F476FF00 9EE9F046 880006E9 03750000 3DF04689 .Fþ=..u.Õ...FþÕ...v¶.v·.F▪.P.... 0000E0
 03B49A50 16F6468D F276FFF4 76FF007D E9F04688 0006E903 7500003D F0468900 ..Fþ=..u.Õ...FþÕ)..v¶.v·.F-.P.Ç. 000100
 08E90374 0E4639FE 5688FC46 8B005CE9 F0468B00 06E90375 00003DF0 46890000 ...Fþ=..u.Õ...FþÕ\..F▪.V±9F.t.Õ. 000120
 B80006E9 03751456 390008E9 03741246 39FE5688 FC468800 1CE90375 10563900 .9V.u.Õ...F▪.V±9F.t.Õ..9V.u.Õ..¦ 000140
 76FF0000 04539A00 6A006A00 6A006A01 6E680088 68F676FF F876FF00 2AE90000 ..Õ*..v½.v-h..hn.j.j.j.j..S....v 000160
 D88E048E B81E5657 000018C8 CBC95F5E 1F0000E9 04620AEE 9A008868 F276FFF4 ¶.v·h...Ÿ.b.Õ...^_èùà...WV.¦...Ä 000180
 1AE9F046 880006E9 03750000 3DF04689 0000049E 9A5016FA 468D0A76 FF0C76FF .v..v..F'.P......Fþ=..u.Õ...FþÕ. 0001A0
 FF00FCE9 F0468B00 06E90375 00003DF0 46890000 048C9A50 16EC468D FA76FF01 ..v'.Fš.P.¥....Fþ=..u.Õ...FþÕ▪.. 0001C0
 00DBE9F0 46880006 E9037500 003DF046 89000004 DD9A5016 FC468DEC 76FFEE76 vŸ.vš.F▪.P.ï....Fþ=..u.Õ...FþÕÜ. 0001E0

Dump of file SATURN:[PCCOMMON.DUMP.DLL]DAAVTDF.TMP;1 on 18-APR-1990 10:39:43.51
File ID (539,17,0)   End of file block 55 / Allocated 56

Virtual block number 23 (00000017), 512 (0200) bytes

 BAE9F046 880006E9 03750000 3DF04689 000004FE 9A5016F6 468DEC76 FFEE76FF .vŸ.vš.F-.P.±....Fþ=..u.Õ...FþÕα 000000
 7500003D F0468900 0003DD9A 5016F246 8D036AFC 76FFFE76 FF0A76FF 0C76FF00 ..v..v..v±.v▪j..F·.P.ï....Fþ=..u 000020
 E85EC404 E8468300 04E9EA56 89E84689 F45688F2 46880091 E9F04688 0006E903 .Õ...FþÕ...F·.V¶.FÒ.VõÕ...FÒ.á^Ò 000040
 57392600 44E90374 07392610 56880E46 8BE85EC4 0058E903 75024708 26078826 &..&.G.u.ÕX.á^Ò.F..V.&9.t.ÕD.&9W 000060
 008868F6 76FFF876 FF000006 819AF276 FFF476FF 0A76FF0C 76FF0038 E9037402 .t.Õ;..v..v..v¶.v·.Ÿ....v½.v-h.. 000080
 1AE9056A 0AEE9A00 8868EC76 FFEE76FF 0000055A 9A006A00 6A006A00 6A016E68 hn.j.j.j.j..Z....vŸ.všh...Ÿ.j.Õ. 0000A0
 CBC95F5E 1F0000E9 00008800 0004389A F276FFF4 76FF0A76 FF0C76FF FF95E900 .Õ...v..v..v¶.v·.;...¦..Õ...^_èù 0000C0
 3DF04689 0000058C 9A5016FA 468D0A76 FF0C76FF D88E057C B81E5657 000018C8 à...WV.¦|..Ä.v..v..F'.P......Fþ= 0000E0
 00003DF0 46890000 05AA9A50 16EC468D FA76FF01 1AE9F046 880006E9 03750000 ..u.Õ...FþÕ...v'.Fš.P.¯....Fþ=.. 000100
 003DF046 89000005 C89A5016 FC468DEC 76FFEE76 FF00FCE9 F0468800 06E90375 u.Õ...FþÕ▪..vŸ.vš.F▪.P.ù....Fþ=. 000120
 3DF04689 000005EC 9A5016F6 468DEC76 FFEE76FF 00DBE9F0 46880006 E9037500 .u.Õ...FþÕÜ..vŸ.vš.F-.P.$....Fþ= 000140
 5016F246 8D036AFC 76FFFE76 FF0A76FF 0C76FF00 BAE9F046 880006E9 03750000 ..u.Õ...FþÕα..v..v..v±.v▪j..F·.P 000160
 89E84689 F45688F2 46880091 E9F04688 0006E903 7500003D F0468900 0006159A ......Fþ=..u.Õ...FþÕ...F·.V¶.FÒ. 000180
 56880E46 8BE85EC4 0058E903 75024708 26078826 E85EC404 E8468300 04E9EA56 VõÕ...FÒ.á^Ò&..&.G.u.ÕX.á^Ò.F..V 0001A0
 FD9AF276 FFF476FF 0A76FF0C 76FF0038 E9037402 57392600 44E90374 07392610 .&9.t.ÕD.&9W.t.Õ;..v..v..v¶.v·.» 0001C0
 FFEE76FF 0000068C 9A006A00 6A006A00 6A016E68 008868F6 76FFF876 FF000007 ....v½.v-h..hn.j.j.j.j.......vŸ. 0001E0

Dump of file SATURN:[PCCOMMON.DUMP.DLL]DAAVTDF.TMP;1 on 18-APR-1990 10:39:43.51
File ID (539,17,0)   End of file block 55 / Allocated 56

Virtual block number 24 (00000018), 512 (0200) bytes

 0006739A F276FFF4 76FF0A76 FF0C76FF FF95E900 1AE9069C 0AEE9A00 8868EC76 všh...Ÿ...Õ..Õ...v..v..v¶.v·.s.. 000000
 468D0A76 FF0C76FF D88E06C8 B81E5657 000018C8 CBC95F5E 1F0000E9 00008800 .¦..Õ...^_èùà...WV.¦à..Ä.v..v..F 000020
 16E8468D F276FF00 F8E9EC46 880006E9 03750000 3DEC4689 000006D8 9A5016F2 ·.P.Ä....Fš=..u.Õ...FšÕ%..v·.FÒ. 000040
 FC468DE8 76FFEA76 FF00DAE9 EC468800 06E90375 00003DEC 46890000 06F69A50 P.-....Fš=..u.Õ...FšÕÖ..võ.vÒ.F▪ 000060
 468DE876 FFEA76FF 0089E9EC 46880006 E9037500 003DEC46 89000007 179A5016 .P......Fš=..u.Õ...FšÕ¿..võ.vÒ.F 000080
 FF0A76FF 0C76FF00 98E9EC46 880006E9 03750000 3DEC4689 00000738 9A5016EE Ÿ.P.8....Fš=..u.Õ...FšÕ...v..v.. 0000A0
 E9EC4688 0006E903 75000030 EC468900 0008D69A 5016F846 8D036AFC 76FFFE76 v±.v▪j..F½.P.ø....Fš=..u.Õ...FšÕ 0000C0
 00003DEC 46890000 018A9A50 16F4468D 056AF876 FFFA76FF 0A76FF0C 76FF006F o..v..v..v'.v½j..F¶.P.¤....Fš=.. 0000E0
 06E90375 10563900 08E90374 0E4639F6 5688F446 880046E9 EC468800 06E90375 u.Õ...FšÕF..F¶.V-9F.t.Õ..9V.u.Õ. 000100
 000007D8 9A006A00 6A006A00 6A016E68 008868EE 76FFF076 FF002AE9 00008800 .¦..Õ*..vþ.vŸh..hn.j.j.j.j..Ä... 000120
 0814B81E 56570000 10C8CBC9 5F5E1F00 00E907E8 0AEE9A00 8868E876 FFEA76FF .võ.vÒh...Ÿ.Ò.Õ...^_èùà...WV.¦.. 000140
 F4468800 06E90375 00003DF4 46890000 08249A50 16FA468D 0A76FF0C 76FFD88E .Ä.v..v..F'.P.$....F¶=..u.Õ...F¶ 000160
 88E9F446 880006E9 03750000 3DF44689 00000842 9A5016F0 468DFA76 FF00A6E9 Õ!..v'.Fþ.P.B....F¶=..u.Õ...F¶Õ. 000180
 E9F44688 0006E903 75000030 F4468900 0008849A 5016F646 8DF076FF F276FF00 ..v·.vþ.F-.P......F¶=..u.Õ...F¶Õ 0001A0
 F4468800 06E90375 00003DF4 46890000 08639A50 16FC468D F076FFF2 76FF0067 g..v·.vþ.F▪.P.c....F¶=..u.Õ...F¶ 0001C0
 FF002AE9 00008800 06E90375 10563900 08E90374 0E4639FE 5688FC46 880046E9 ÕF..F▪.V±9F.t.Õ..9V.u.Õ..¦..Õ*.. 0001E0
```

Dump of file SATURN:[PCCOMMON.DUMP.DLL]DAAVTDF.TMP;1 on 18-APR-1990 10:39:43.51
File ID (539,17,0)   End of file block 55 / Allocated 56

Virtual block number 25 (00000019), 512 (0200) bytes

```
8868F076 FFF276FF 0000091C 9A006A00 6A006A00 6A016E68 008868F6 76FFF876 v½.v-h..hn.j.j.j.j.......v·.vÞh. 000000
0A76FF0C 76FFD88E 093EB81E 56570000 08C8CBC9 5F5E1F00 00E9092C 0AEE9A00 ..Ÿ.,.Õ...^ èùà...WV.¦>..Å.v..v. 000020
76FF0C76 FF022AE9 F8468B00 06E90375 000030F8 46890000 FFFF9A50 16FE4680 .F±.P......F½=..u.Õ...F½Õ*..v..v 000040
FFFE76FF 0209E9F8 46880006 E9037500 003DF846 890000FF FF9A5016 FA4680DA ..F*.P......F½=..u.Õ...F½Õ...v±. 000060
0006E903 7500003D F8468900 00FFFF9A 50520002 0508568B 064688FA 76FFFC76 v=:v*.F..V....RP......F½=..u.Õ.. 000080
00000848 9AFFFF68 0ABF6804 6A086A02 77FF2604 77FF2606 5EC401DF E9F8468B .F½ÕÕ.6^.&.w.&.w.j.j.he.h...H... 0000A0
E668086A 0277FF26 0477FF26 065EC401 B4E9F846 880006E9 03750000 3DF84689 .F½=..u.Õ...F½ÕÇ.6^.&.w.&.w.j.hÌ 0000C0
77FF2606 5EC4018B E9F8468B 0006E903 7500003D F8468900 000C239A FFFF680A .h...#....F½=..u.Õ...F½Õ..6^.&.w 0000E0
64E9F846 880006E9 03750000 3DF84689 00000C4A 9AFFFF68 08116802 77FF2604 .&.w.h..h...J....F½=..u.Õ...F½Õd 000100
000BA49A FFFF680B 42680B1A 68081768 026A0B6A 0277FF26 0477FF26 065EC401 .6^.&.w.&.w.j.j.h..h..hB.h...Ê.. 000120
6A076A02 77FF2604 77FF2606 5EC40133 E9F8468B 0006E903 7500003D F8468900 ..F½=..u.Õ...F½Õ3.6^.&.w.&.w.j.j 000140
065EC401 08E9F846 880006E9 03750000 3DF84689 00000B73 9AFFFF68 08606802 .hm.h...s....F½=..u.Õ...F½Õ..6^. 000160
E9037500 003DF846 8900000B CF9AFFFF 680B9868 026A056A 0277FF26 0477FF26 &.w.&.w.j.j.h..h...ü....F½=..u.Õ 000180
08C9680B A168089E 68036A0B 6A0277FF 260477FF 26065EC4 000DE9F8 46880006 ...F½ÕÏ.6^.&.w.&.w.j.j.h..hÅ.hè. 0001A0
0477FF26 065EC400 ACE9F846 880006E9 03750000 3DF84689 0000FFFF 9AFFFF68 h........F½=..u.Õ...F½Õ¯.6^.&.w. 0001C0
46880006 E9037500 003DF846 8900000B FA9AFFFF 680BF468 026A0C6A 0277FF26 &.w.j.j.h¶.h...*....F½=..u.Õ...F 0001E0
```

Dump of file SATURN:[PCCOMMON.DUMP.DLL]DAAVTDF.TMP;1 on 18-APR-1990 10:39:43.51
File ID (539,17,0)   End of file block 55 / Allocated 56

Virtual block number 26 (0000001A), 512 (0200) bytes

```
46890000 FFFF9AFF FF680C1D 68036A0C 6A0277FF 260477FF 26065EC4 0081E9F8 ½Õ..6^.&.w.&.w.j.j.h..h........F 000000
680C4468 0C6A0277 FF260477 FF26065E C40056E9 F8468800 06E90375 00003DF8 ½=..u.Õ...F½ÕV.6^.&.w.&.w.j.hD.h 000020
260477FF 26065EC4 002DE9F8 46880006 E9037500 003DF846 890000FF FF9AFFFF ........F½=..u.Õ...F½Õ-.6^.&.w.& 000040
880006E9 F8468800 06E90375 00003DF8 46890000 FFFF9AFF FF68032F 680277FF .w.h/.h........F½=..u.Õ...F½Õ... 000060
F4010300 0000010A 04000206 C000020B F7000500 2008CAC9 5F5E1F00 00E9F846 F½Õ...^_èò. ...¥...ô...........¶ 000080
61020303 CC000901 F4020302 4F00080A 47020300 0000020A 96000200 7F000109 ...............G...O...¶...ã...a 0000A0
AD020302 5B000809 8D020304 4A000A0B 1D020300 0000060A 16000200 77000407 ...w...............J.......[...Ù 0000C0
71020301 10000501 28020305 7400020B CC000502 EC00020B 45000500 83000408 .......E...ì...ä...t...+.......q 0000E0
BF020301 1C000509 6C020300 0000020A 99000502 0000020B 14000503 E8000A0A ...Ò.....................l.......€ 000100
70000503 FF000A0A C5020308 0C00020C 47000504 8600020B 98000500 A6000407 ...Ï...........G.......é.......p 000120
26020303 9F000900 91020304 13000A0A 9C020300 9000020A C2000503 1400020B .......ô.........................& 000140
E9000509 3600020C 20000504 24000A0A EC020300 51000409 4E020302 3000080A ...0...N...Q...ì...$... ...6...Õ 000160
01C80001 B81F0396 3E89088E FFFFB81E 00000002 3F000809 AE020301 3A00020A ...:...Û...7.....¦...Å.>...¦..ù. 000180
00000000 00000000 00000000 00000000 00000000 00000000 00000500 02000200 ................................ 0001A0
A8C78806 7EC4D1F7 AEF2FFFF 89C033C0 8ED88CFE 880A76C5 1EDE8807 8BEC8B55 U.ì.■.B.év..±.Ã.ã3à¿..·Ú¼ì6~..ú´ 0001C0
76C51EDE 8BD78BEC 8855C85D C28C1FFA 8BF38BA4 F3C913A5 F3E9D149 A4027401 .t.Ê¦ìÕµÊ.èµÊ.µ.*..ò]ìU.ì.■.B.év 0001E0
```

Dump of file SATURN:[PCCOMMON.DUMP.DLL]DAAVTDF.TMP;1 on 18-APR-1990 10:39:43.51
File ID (539,17,0)   End of file block 55 / Allocated 56

Virtual block number 27 (0000001B), 512 (0200) bytes

```
00CB5DFA 8BF38B1F FFFF1DC0 1B0574A6 F3F92BD1 F7AEF2FF FFB9C033 0A7EC406 .6~.3à¿..·Ú¼¦+*µ¦t..ð.....µ.*]ù. 000000
000016C8 000CA9E9 00CB5DFA 8B9149D1 F7AEF2FF FFB9C033 067EC4D7 8BEC8B55 U.ì.■6~.3à¿..·Ú¼¦¦..*]ù.Õ`..à... 000020
8B06468B 420A47C6 26F85EC4 FE568CFC 46890E46 8DFA568C F84689EC 468D5657 WV.Fì.F½.V*.F..F•.V±6^½&6G.B.F.. 000040
76FF0C76 FFFC76FF 167FFF04 47C72602 57892607 89260857 89260647 89260856 V.&.G.&.W.&..&.W.&úG.....v=.v..v 000060
8E2607FF 263F8B26 C02A1278 044FFF26 F85EC4F0 880CC483 01010280 9A53060A ..S.¯....6..Þ6^½&.O.x.*à&.?&..&. 000080
57EC8855 C8C95F5E C68B06C4 83FFFF01 3A9A006A 53FA76FF 900FEB05 88260247 G.&..Š...v*Sj..:....6..6^_èÙU.&W 0000A0
C78EFF33 04740538 264FAEF2 FB8B0A46 8AD9F741 AEF2FFFF B9C033DF 8B067EC4 6~..Õ3à¿..·ÚA¼¦.F..«·ÚÕ&8¯.t.3..ú 0000C0
302DC38B FA4689E4 2A0B478A 26085EC4 56570000 08C800CB 5DE58B5F C28CC78B .ú.ð_.[]ù.à...WV6^.&.G.*Õ.F*.û-0 0000E0
0A47F626 0774830A 47F626F8 46891124 05E0D1C1 03E0D1C8 8BF9F700 0CB99905 ..¿.¯¥*.à¦Á.è¦Á.$..F½&-G..t.&-G. 000100
0A4F8026 0E74010A 47F62608 5EC49001 2BE9FFFF B8200A4F 8026085E C40F7440 ət.6^.&.O. ¦..Õ+..6^.&-G..t.&.O. 000120
26FC7689 F08B0447 8926C02B EF0A6780 26020A4F 802690E2 EB000004 47C72620 &úG...Šã.&.O..&.g.ÿ+à&.G..Þ.v=& 000140
053C087E 81377501 112487F6 060868F9 F7000CB9 9905302D C38B4C75 0C0A47F6 -G..uL.û-0..¿..¥*kÄ.-.$..u7.-.<. 000160
83025611 069AFA76 FF0F75FF FF0A7E81 16750548 087E810E 7401E30A 7E810775 u..-.D.t..-.H.u..-...u..v*...V.. 000180
302DC38B 1575080A 47F62608 5EC404C4 830CA7E8 0876FF0A 76FF0C75 C00802C4 6..&u..v..v.ÒÏ..6.6^.&-G..u..û-0 0001A0
260647B8 2606772B 26378B26 085E8B67 74011124 87F606D8 68F9F700 0CB99905 ..¿..¥*kÄ.-.$..tg.^.&.7&+w.&.G.& 0001C0
0677FF26 5256167E F60B0447 89264802 458BF87E 8B025789 26078926 4008578B .W.ə&..&.W..-½.E.H&.G..--.VR&.w. 0001E0
```

```
Dump of file SATURN:[PCCOMMON.DUMP.DLL]DAAVTDF.TMP;1 on 18-APR-1990 10:39:43.51
File ID (539,17,0)    End of file block 55 / Allocated 56

Virtual block number 28 (0000001C), 512 (0200) bytes

 006A006A 026A0F74 20173587 F6FA5EB8 19EBFC46 8908C483 02740F6E 9AFA76FF .v¹.n.t..á..F•Š..^¹-.5. t.j.j.j. 000000
 16064680 560001BE 17EB0788 2606468A 065FC426 085EC408 C4830297 0F309A53 $.0....á.á^.&á_..F.&..Š./..V.F.. 000020
 CBC95F5E E42A0646 8AFECCE9 0374FC76 39FC4689 08C48300 D60F6E9A FA76FF50 P.v¹.n.ø..á..F=9v•t.Öët.F.*ð^_èù 000040
 16891A6E A3105688 0E46881A 801E8C1A 7EA31A84 8801ED11 2A9A000A 88EC8855 U.š¡...*.Ú.¡..È-......F..V.Èn... 000060
 7E800380 E900001A 7806C700 001A7A06 C71A5616 891A54A3 08568806 46881A70 p..F..V.ÈT...V.ú.z...ú.x...Ö...- 000080
 72A31A74 A31A5CA3 1A76A31A 5AA31A5E A3C02800 011A7C06 C7030BE9 037425F6 -%t.Ö..ú.|...+âÈ^.ÈZ.Èv.È\.Èt.Èr 0000A0
 E406C70A 46FF4975 30017F80 260A5EC4 00201BE4 06C71A6C A31A52A3 1A58A31A .ÈX.ÈR.Èl.ú.ð. .á^.&...0uI.F.ú.ð 0000C0
 203F8026 9028E800 001A7206 C71A5E06 FF0D752B 3F80260A 5EBB903E EB00301B .0.$>..^.&.?+u...^.ú.r...Š(.&.?  0000E0
 FFC77520 3F80260A 5EC400EB 1A5206FF 9014EB1A 7206FF1A 75001A5E 3E830E75 u..>^..u...r.Š....R.Š.á^.&.?-uú. 000100
 1E0A76FF 0C76FFDD 75C00802 C4830978 E80E5098 078A260A 5E8B0A46 FF1A6C06 .l..F..^.&...P.Òx..á..âuÏ.v..v.. 000120
 D8F71A82 A11A6C06 FF0C7D00 1A823E83 0C56890A 468908C4 8308C7E8 0E1A8268 h...Òú..á..F..V..>...)...l.À..%Ä 000140
 2D752E3F 80260A5E C400201B E406C706 75301BE4 3E830D74 001A6C3E 831A82A3 È...>l..t..>ð.0u.ú.ð. .á^.&.?.u- 000160
 1A7C3E83 0C56890A 468908C4 83087BE8 0E1A7C68 1E0A76FF 060A46FF 1A7406FF ..t..F...v..h|..Ò(..á..F..V..>|. 000180
 68304074 004E3D30 7400463D 98078A26 0A5EC41A 740EFF00 011A7C06 C70A7D00 .).ú.|.....t.á^.&...=F.t==N.t@=h 0001A0
 46FF0375 4C3F8026 0A5EC409 75001A5C 3E830002 1A5C06C7 0675006C 3D2B7400 .t+=l.u.ú.\....>\..u.á^.&.?Lu..F 0001C0
 06C7D0EB 00101A5C 06C7D8EB 00011A5C 06C79002 4EE91C75 003F8026 0A5EC40A .á^.&.?.u.ÒN..ú.\...ŠÁú.\...ŠÁú. 0001E0

Dump of file SATURN:[PCCOMMON.DUMP.DLL]DAAVTDF.TMP;1 on 18-APR-1990 10:39:43.51
File ID (539,17,0)    End of file block 55 / Allocated 56

Virtual block number 29 (0000001D), 512 (0200) bytes

 1A5A06FF 08750058 3D057400 47300A74 004530F8 46899807 8A26C8EB 00081A5C \...Šâ&....F½=E.t.=G.t.=X.u...Z. 000000
 25300152 E9037E01 3FE90375 00633001 91E9037E 78740069 30F84688 20F84683 .F½ .F½=i.tx~.Ö..=c.u.Ö?.-.ÖR.=% 000020
 C7260789 261A78A1 1FC4261A 6E1EC415 75021A5C 3E839001 59E90140 E9037500 .u.Ö@.ÖY...>\..u.á.n.&á.Àx.&..&ú 000040
 E9037500 1A7A3E83 041A6E06 83078926 1A78A11F C4261A6E 1EC400EB 00000247 G...Š.á.n.&á.Àx.&....n...>z..u.Ö 000060
 01ACE9FF FFB801AF E9037520 0A47F626 1A541EC4 018DE903 74001A78 3E830170 p..>x..t.Ö§.á.T.&-G. u.Ö€.¡..Ö¯. 000080
 06FF1A58 06FFF2EB 086A90C3 EB02C483 019EEB0E 0A6A0000 1A5206C7 1A7606FF ..v.ú.R...j..Ò...á.Šú.j.Š·..X... 0000A0
 A3C0287A 74011A5C 3E830081 E9037508 1A5C3E83 00041A7C 06C71A74 06FF1A5A Z...t.ú.|....>\..u.Ö...>\..tz+âÈ 0000C0
 13E80000 1A8206C7 0A74001A 6C3E83FA 46891A82 A128741A 820639FA 46891A5C \..F¹9...t(À...F¹.>l..t.ú.....Š. 0000E0
 C4830130 E80E106A 021A6E06 831A82A3 C02B027D C0081A82 A1051A82 2E839090 .......À...â).+âÈ....n..j..Ò0..á 000100
 1A82A300 052DFA46 8B157400 1A6C3E83 227400FA 7E8302C4 83048DE8 0E3A6A02 .j:.Ò...á..-¹.t".>l..t..F¹-..È.. 000120
 02C48300 F1E80E10 6A041A6E 2E830000 1A8206C7 9007EB1A 82A3C028 027DC008 .â).+âÈ..Š..ú.......n..j..Òþ..á. 000140
 0EF876FF F4EB016A 90FF39E9 026EE80E 006A90FF 3FE9106A FF10E902 1A6E0683 ..n..Ö..j.Ö?..j..Òn.Ö9..j.Š¶.v½. 000160
 00673005 7C00653D FF0CE903 7500643D 90FF21E9 0428E80E 256AFF2A E90349E8 Òl.Ö*.j%.Ò(.Öl..=d.u.Ö..=e.|.=g. 000180
 EBFE5689 FC468940 0C56880A 46880A4E FF0C5688 0A468809 74001A5C 3E830A7E ~Ö.>\..t..F..V..N..F..V.@.F•.V±Š 0001A0
 3D8F7400 733DFEE0 E9037500 703DFEE4 E9037500 6F3DFE80 E9037500 6E3D903A :.=n.u.Ö.±=o.u.ÖÖ±=p.u.ÖÁ±=s.t.= 0001C0
 8A26FC5E C4FC46FF 9034EB0A 46FF90B1 EBFF79E9 03750078 3DFEB9E9 03750075 u.u.Ö¿±=x.u.Öy.ŠÝ..F.Š4..F=á^=&. 0001E0

Dump of file SATURN:[PCCOMMON.DUMP.DLL]DAAVTDF.TMP;1 on 18-APR-1990 10:39:43.51
File ID (539,17,0)    End of file block 55 / Allocated 56

Virtual block number 30 (0000001E), 512 (0200) bytes

 8806C483 044CE80E 0A76FF0C 76FF500A 462BC388 EC75253C 0474C00A F6468807 ..F-.ât.<%uš.Û+F.P.v..v..ÒL..á.. 000000
 261A541E C4FC63E9 0374C00A F6468807 8A260A5E C40C5689 0A4689FE 5688FC46 F=.V±.F..V.á^.&...F-.ât.Öc=á.T.& 000020
 201BE406 C7067400 1A743E83 56570000 12C8C8C9 1A78A1FE 51E90374 200A47F6 -G. t.ÖQ±Àx.èùà...WV.>t..ᵗ.ú.ð.  000040
 0788261A 6E1EC419 75101A5C 3E830774 021A5C3E 831A7606 FF04740A 067E8300 ..~..t...v..>\..t..>\..u.  n.&.. 000060
 0788261A 6E1EC411 74001A76 3E83902C EB041A6E 0683FE56 89FC4689 02578826 &.W..F=.V±..n..Š,..>v..t.á ^.&.. 000080
 523E8302 1A6E0683 FE5689FC 46899907 88261A6E 1EC40EEB 0000FE46 C7FC4689 .F•úF±..Š.á.n.&....F=.V±..n...>R 0000A0
 46891A80 16881A7E A11BE2A3 C02B9003 EB06468B 0674FE46 08FC468B 0E74001A ..t..F=.F±t..F.Š..+âÈã.À~......F 0000C0
 07C626F2 46FFF25E C41D750A 067E8328 7D00FE7E 83317500 1A763E83 F45689F2 ·.V¶.>v..u1.~±.)+.~..u.á^·.F·&á. 0000E0
 00F646C7 9006E800 01F646C7 FE5689FC 46890AF7 00028308 F7FE5688 FC46882D -.F=.V±%Ä.@.%Ö.F=.V±úF-..Š..úF-. 000100
 743E830A C4830790 10FC9AFC 76FFFE76 FF501E06 76FFFA5E 8CF84689 1A608800 .¡'..F%.^¹.v..P.v±.v=.=....á..>t 000120
 83007EC9 08F04E89 C82B1A7C 0E8B04C4 83028900 709AF876 FFFA76FF 4574001A ..tE.v¹.v½.p.¿..á...|.+à.Nþ.è~.. 000140
 F47FC008 49C18847 3005C626 05EBF27E C4F04E88 00001BE2 06C70675 081BE23E >ã..u.ú.ã....Nþá-·Š.&á.0G.èI.â.¶ 000160
 3C0774C9 08048807 8A26F85E C4F276C5 EE5E8C1A 5A0E88F0 4E89F446 8CF27E89 .~·.F¶.Nþ..Z..^Ýév·á^½&.....èt.< 000180
 1475001A 763E83EE 5E8EF45E 8CF27689 E375003F 8026F846 FF46202C 80037C61 a|.., F.F½&.?.uÐ.v·.^¶.^Ý.>v..u. 0001A0
 5F5E02C4 8302FFE8 0E50C02B 02E80001 88057500 F67E8308 741A7206 0B1A5EA1 À^...r.t..~-.u.¡..Š.+âP.Ò...á.^_ 0001C0
 0683FA56 89F84689 1A70168B 1A6EA100 01BE1874 00067E83 56570000 10C8CBC9 èùà...WV.~..t./..Àn...p..F%.V¹.. 0001E0
```

```
Dump of file SATURN:[PCCOMMON.DUMP.DLL]DAAVTDF.TMP;1 on 18-APR-1990 10:39:43.51
File ID (539,17,0)   End of file block 55 / Allocated 56

Virtual block number 31 (0000001F), 512 (0200) bytes

 10EBFA56 89F84689 02578826 0788261A 6E1EC413 74081A5C 3E83008F E9021A6E n..ő...>\..t.á.n.&..&.W..F½.V*Š. 000000
 08F8468B 0E74081A 5C3E8304 1A6E0683 FA5E8CF8 4689FC46 89078826 1A6E1EC4 á.n.&...F=.F½.^*..n...>\..t..F½. 000020
 89FA568B F84688FA 5E8CF846 8900E588 097500FC 7E83900A E8000EB8 1575FA46 F*u.¡B.Š...~=.u.¡Í..F½.^*.F½.V*. 000040
 1574003F 8026F246 FFF25EC4 900EEB1A 7C0E881C 741A7436 39F62BF4 5689F246 F·.V¶+-96t.t...|.Š..á^·.F·&.?.t. 000060
 001A6C3E 83FE2B1A 823E88F3 75003F80 26F246FF F25EC446 90EDEB10 7ECE3B46 F;ö–.ŠÚ.Fá^·.F·&.?.uµ.>..+±.>l.. 000080
 57087400 1A6C3E83 06C48301 B3E80EF8 76FFFA76 FF5602C4 830159E8 0E570875 u.W.ÒY..á.V.v*.v½.Ò*..á..>l..t.W 0000A0
 067E83FE 5689FC46 891A7016 881A6EA1 000006C8 90CBC95F 5E02C483 013CE80E .Ò<..á.^_èù.à...Ân...p..F=.V±.~. 0000C0
 00061A7C 06C70675 001A743E 83FA4688 C02A9003 EB018005 7547067E 83067467 gt..~.Gu¯.Š..*à.F*.>t..u.ú.|... 0000E0
 36FF0676 FF1A7C36 FF1A5A36 FF00011A 7C06C706 75001A7C 3E830074 00FA7E80 .~*.t..>|..u.ú.|....6Z..6|..v..6 000100
 3E831B74 00FA7E80 0EC48305 101EFF26 1970068E FC76FFFE 76FF1A7E 36FF1A80 ...6~..v±.v=..p.&.....á..~*.t..> 000120
 1B74001A 523E8304 C4830514 1EFF2619 70068E1A 7E36FF1A 8036FF14 75001A52 R..u..6...6~...p.&.....á..>R..t. 000140
 081A6E06 8304C483 051C1EFF 26197006 8E1A7E36 FF1A8036 FF147500 1A7C3E83 .>|..u..6...6~...p.&.....á...n.. 000160
 C4830520 1EFF2619 70068EFC 76FFFE76 FF1B741A 7206081A 5EA10000 1BE206C7 ú.ã...Â^...r.t..v±.v=..p.&.. ..á 000180
 3C75001A 7A3E8356 000000C8 90CBC901 29E80E50 C02B02EB 00018805 74C00804 ..át.¡..Š.+áP.Ò).èù.à...V.>z..u< 0001A0
 36FF10EB E42A0488 2602478E 2607FF26 378B2606 468A147B 044FFF26 1A541EC4 á.T.&.O.x..F.&.7&..&.G.&..*őŠ..6 0001C0
 90CBC95E 1A7806FF 9005EB1A 7A06FF07 754006C4 830A7501 3A9A0676 FF531A56 V.S.v..:.u..á.àu...z.Š....x.^èù. 0001E0

Dump of file SATURN:[PCCOMMON.DUMP.DLL]DAAVTDF.TMP;1 on 18-APR-1990 10:39:43.51
File ID (539,17,0)   End of file block 55 / Allocated 56

Virtual block number 32 (00000020), 512 (0200) bytes

 36FF1A54 36FF1A56 36FF18E8 507EF608 06768857 75001A7A 3E835657 000002C8 à...WV.>z..uW.v..~~P$..6V..6T..6 000000
 044FFF26 1A541EC4 1E7EC008 4EC6881A 7A06FF04 754006C4 830AD001 3A9A18E4 ő..:.T..á.àu...z..6N.á~.á.T.&.O. 000020
 06468807 75001A7A 3E8304EB E42A0588 2602478E 2607FF26 3F88261B E4A0047B xá.ő.&.7&..&.G.&..*őŠà.>z..u..F. 000040
 36FF1A56 36FF22EB 5E75001A 7A3E830A 76885657 000002C8 CBC95F5E 1A780601 ..x.^_èùà...WV.v..>z..u^Š".6V..6 000060
 084EC688 0646FF1A 7A06FF04 754006C4 83084F01 3A9A5098 078A2606 5EC41A54 T.á^.Ï...P.:.O..á.àu...z..F..6N. 000080
 478E2607 FF263F88 261A541E C4078A26 065EC4CD 78044FFF 261A541E C42574C0 àt%á.T.&.O.xëá^.&..á.T.&.?&..&.G 0000A0
 A1560000 0CC8CBC9 5F5E1A78 06010A46 88077500 1A7A3E83 CAEBE42A 05882602 .&..*őŠò.>z..u..F...x.^_èùà...VÀ 0000C0
 8800709A F476FF52 1A823688 FA4689FC 4689C02B F65689F4 46891A80 16881A7E ~......F¶.V~+à.F=.F*.6.¯R.v¶.p.. 0000E0
 4E017508 1BE23E83 08EB02EE 83057510 1BE23E83 06762BF0 2BF84689 04C48307 ..á..F½+b+v..>ã..u..Ÿ.Š..>ã..u.N 000100
 0E509807 8A26F446 FF127530 1BE43E83 1975203F 8026F45E C4227500 1A6C3E83 .>l..u"á^¶&.?-u..>ő.0u..F¶&...P. 000120
 7400067E 831B7400 1A6C3E83 077EF608 08743018 E43E83F8 4EFF02C4 83FE71E8 Òq±.á..N½.>ő.0t..~~..>l..t..~..t 000140
 E80E5629 75001A6C 3E830070 E80EFC46 FF077400 1BE23E83 0066E80E FA46FF07 ..F*.Òf..>ã..t..F=.Òp..>l..u)V.Ò 000160
 00FC7E83 0A74001B E23E8300 39E80E04 7500FA7E 830A7400 067E8302 C483FE7E ~±.á..~..t..~*.u..Ò9..>ã..t..~=. 000180
 E406C70E 74001A6C 3E8306C4 83FEB5E8 0EF476FF F676FFF8 76FF0040 E80E0475 u..Òà..v½.v~.v¶.Òç±.á..>l .t.ú.ő 0001A0
 E80E5000 20B803EB 002B8805 74001A5E 3E83CBC9 5E02C483 FE38E80E 5600201B . .V.Ò8±.á.^èù.>^..t.¡+.Š.  .P.Ò 0001C0
 0058B805 74001A5A 3E831775 101BE23E 8302C483 FDC8E80E 306AC802 C483FDD2 ●».á.ùj0.Òà».á..>ã..u..>Z....¡X. 0001E0

Dump of file SATURN:[PCCOMMON.DUMP.DLL]DAAVTDF.TMP;1 on 18-APR-1990 10:39:43.51
File ID (539,17,0)   End of file block 55 / Allocated 56

Virtual block number 33 (00000021), 512 (0200) bytes

 2A3F8026 0A5EC400 01FE46C7 56570000 06C8CB02 C483FDAA E80E5000 78B803EB Š.¡x.P.Ò¯».á.ùà...WVúF±..á^.&.?* 000000
 FE46C708 75203F80 260A5EC4 9060EB0A 46FF021A 6E068337 88261A6E 1EC41275 u.á.n.&.7..n...F.Š'.á^.&.?-u.úF± 000020
 303C0A75 1A743639 387F393C 3F7C303C FA468807 8A260A5E 88F6280A 46FFFFFF ...F.+-.^.&...F*<0|?<9.;96t.u.<0 000040
 03E1D1CE 0302E1C1 CE889805 8A26187F 39308026 06EBFB88 00301BE4 06C70675 u.ú.ő.0..«Š.&.=9..&....öêÀ..ö1À. 000060
 37892606 5EC4F088 EEF7FE46 880C468C 0A7E890F 7D303080 2647F188 30E983C8 à.Ő0.þG&.=0)Ő.~..F..F±¥Ÿ.þá^.&.7 000080
 01EBFC7E C4064E8A FE5E8CFC 468900EC 88570000 04C8CBC9 5F5E0C56 880A4688 .F..V.^_èùà...W¡Š..F=.^±.N.á~=Š. 0000A0
 C02BFE46 8CFC7E89 9009EBFE 468CFC7E 890001B8 F4750038 26117400 30802647 G&.=.t.Ï8.u¶¡...~=.F±Š...~=.F±+à 0000C0
 04742D3C 50F77409 3CFB7420 3CACD833 99C03306 76C51E56 57EC8855 90CBC95F _èù.U.£WV.év.3à.3U¯< t«<.t¥P<-t. 0000E0
 13D903D2 D1E3D1D2 D1E301FA 88C88802 D1E3011B 72302C1F 77393CAC 017528 3C ¯<+u.¯<9w.,0r.1D1●.ù.*1D1●1D1●.\. 000100
 C48850EC 8855C85D 5F5E1FDA F7000283 D8F70775 93203C58 DCEB00D2 83D803D7 ●.Ã.●.ŠÉX<-.u.¥Ã.●.¥Ő.^_]ùU.ŠP.á 000120
 039EE800 21E80000 FFFF9A00 F2681E00 F4681E17 2EA3E086 580000FF FF9A5016 .P.....X.ÂE...h¶..h·......Ò¡.Ò.. 000140
 BB1E00FA 16FF00FF 6800C00E 709A0D83 0E1C9A50 CB5DE588 0001B80A 39123E9A .>.9.¡...Í]ùP...*..p.à.h....*..£ 000160
 F3CB88D1 8804FEBE 3174003D 80264701 75003080 267FFF89 00F4068E FF330000 ..3...¶.¿..&.=.u.G&.=.t1ƒ±..Í.ùµ 000180
 AC9204E0 C00E7241 2CAC1735 BF1FF78B 071E061C EBE774AE F2C03308 74CA88A6 Í.òt.3á·ÚtóŠ.....¥.«S.¯,Ar.àÂ..¯ 0001A0
 FF047400 050E3E83 00C50E70 9A5000FC B8EC8855 00C31FED EBAAC20A 0572412C ,Ar..ő¯ŠÚ.ŭ.U.Š¡=.P.p.é..>...t.. 0001C0
 8E065688 C08ED88E 01D5B857 56EC8855 CB5DE588 0E260E70 9A5000FF B8050C1E ...¡..P.p.&..Í]ùU.£VW¡Í..Ã.à.V.ƒ 0001E0
```

```
Dump of file SATURN:[PCCOMMON.DUMP.DLL]DAAVTDF.TMP;1 on 18-APR-1990 10:39:43.51
File ID (539,17,0)   End of file block 55 / Allocated 56

Virtual block number 34 (00000022), 512 (0200) bytes

 0002CA50 E58B5E5F 96EBEBF7 88AEF2FF FFB9C033 970C7496 401074C2 38AD197A z.Ù;ôt.ə.t..3â¿..·Û.%$$._^.|]ò.. 000000
 C48B5049 D1F7AEF2 FFFFB9C0 33FA8B92 1F74C008 0E3A0E40 9A0676FF 57EC8B55 U.šW.v..ə.:..ät...'3â¿..·Ü‰iIP.á 000020
 468B1946 06FF0000 04C80002 CA5DE58B 5F5B0000 FFFF9A50 1651521E 5300028B £..S.RQ.P.....[_.|]ò..à.....F..F 000040
 F99A0200 68FE5E8C FC468911 2405E001 C103E001 C88BF9F7 000CB999 05302D04 .-0..¿..%'.àiÁ.ĕiÁ.$..F=.^±h...' 000060
 47C726FC 5EC4080A 4F802611 74D00808 57892606 47892604 5EC402C4 830E7A13 .z..á.á^.&.G.&.W..Àt.&.O..á^=&úG 000080
 FC5EC408 57892606 47892640 FE5688FC 4688040A 4F802604 5EC49021 EB020002 ...Š!.á^.&.O...F=.V±ə&.G.. .W.á^= 0000A0
 C3C90000 0447C726 02578926 07892608 57882606 47882604 5EC40001 0247C726 &úG...á^.&.G.&.W.&..&.W.&ι ...èû 0000C0
 0A76FF53 CC8804EC 830460E9 0454E9C0 3300098A 08721733 1E3B065E 88EC8855 U.ŝ.^.;.3.r.¤..3äÕ7.Õ'..ŝ...·.v. 0000E0
 885500C8 5DE588FD 1735A780 91E175C0 855A5900 00FFFF9A 51160C76 FF0876FF .v..v..Q.....YZ.âuÀ..Ì5.».|]ù.U. 000100
 51C93353 12742017 3587F604 13E9C033 00098A08 7217331E 38065E88 0CEC83EC ŝ.ŝ..^.;.3.r.¤..3äÕ..-.5. t.S3èQ 000120
 C0330856 C50A468E FA5E8C66 74801735 87F60000 0F599A50 16F4468D 51414151 QAAQ.F¶.P.Y...-.5..tf.^'.F.éV.3à 000140
 DC8802EC 833875AE F20AB049 E30C4E8B F86689F2 88FA8856 57FCFC46 89FE4689 .F±.F==WV.'.·.f½.N.DI¯.·Ûu;.ŝ..É 000160
 009AE900 2BE8F4E2 AA1A74FB 3B00740A 3CAC0C4E 880716FA 88D488E2 2B00808A ¤..+ã.å.'...N.¯<.t.;«t.¯ã¶Ò+.Õ.. 000180
 7AEB0093 E9FA5E8E 5F5EE1EB 0014E8E2 EBFC46FF 0AB0AA00 1FE80375 FB3B00B0 ¯.;«u.Ò..¨¯..F=ŠãÒ..ŠÃ^_.^'Õ..Šz 0001A0
 5016F446 8D51521E 53065E88 1FE3CA2B CF881F06 1E515350 0ED1112A 9AFFFC88 ¡=..*.1.PSQ....ü+òD..^.Š.RQ.F¶.P 0001C0
 C00808C4 831FC3FA 88585859 1F07740B 0BFE5E01 F45E8811 75C00B00 000E9A9A ......âu..^¶.^±.Üt..Y[X.'û..á..â 0001E0

Dump of file SATURN:[PCCOMMON.DUMP.DLL]DAAVTDF.TMP;1 on 18-APR-1990 10:39:43.51
File ID (539,17,0)   End of file block 55 / Allocated 56

Virtual block number 35 (00000023), 512 (0200) bytes

 3587F6FE 5E8E26EB F900208A 03EB001C BA087500 098A0001 3D0D7400 6D301874 t.=m.t.=..¤..u.¤..Ŝ.¤ .'Ŝ&.^±-.5 000000
 FC462BFE 468B06EB F9C03300 1CBA0EEB F803751A 3F80085E 880A5E8E 0E744017 .ət..^..^..?.u.½Ŝ.¤..3â'Ŝ..F±+F= 000020
 0856C51E EEEBC18B 0475C90B 0C4E8B02 F7E9CB5D E58B0472 FA5E8E5F 5EF86688 .f½^_.^'r..|]ùÕ%..N..èu..êŠŸ.éV. 000040
 00098A00 01300074 00603017 74C0081F 071E0000 10319A50 16F4468D 51521E53 S.RQ¯F¶.P.1.......ät.=m.t.=..¤.. 000060
 1A3F8026 DA880A74 40173587 F68775C0 08F4468B C2EB0020 8AC7EB00 1C8ACC75 uä¤..Šu¤ .Šò.F¶.äuñ-.5.ət..Õ&.?. 000080
 17331E38 065E88EC 88550442 E9008357 56EC8855 00A3EBC0 33001CBA A6EB0275 u.Š|¤..3äŜÈ.U.ŝVW*.Õ8.U.ŝ.^.;.3. 0000A0
 D82BDC8B 5A5900CB 5DE588C0 3302EB00 01880574 40173587 F60C7C00 FB83117D )..«.|.-.5.ət.¡..Ŝ.3ã.|]ù.YZ.É+Ä 0000C0
 02B8052A 2EFF5152 FC74E9C0 33057540 052AA1CB 5152E38B 0572052E 1E3B0872 r.;...r..DRQùÀ*.əu.3äÕt=RQ..*.E. 0000E0
 00013D40 B1127558 C0080000 FFFF9A52 16501653 C48850B7 1735A780 D48B5200 .R.å.Ì5.ñP.áS.P.R......åXu.Ŷə=.. 000100
 FFD833C2 8C196206 C41EE319 600E885A 04794817 358F0808 81067500 02300774 t.=..u.Ŷ...5.KyâZ..'.D.á.b..ó3Ü. 000120
 6A8E007C E8196ABF 196ABE19 5E1EFF00 03BBC28C 196606C4 01AEE903 73195E1E .^.s.ÕÜ.á.f..õE....^.ƒj.€j.Ò|.ƒj 000140
 D88E0E46 88C30000 FFFF9A11 CB680E01 6A087419 6E30196A B80073E8 196A8F19 .€j.Òs.¡j.=n.t.j..hù......û¡F..Ä 000160
 003AE818 E6BF1BE6 BEEC8855 000011C6 9A006A00 6A036A00 51E8196E BF196ABE ƒj.€n.ÒQ.j.j.j..ó...U.ŝ/Ì.€Ì.Ò:. 000180
 001AE819 6E8F196E BE0023E8 196EBF19 6EBEEC8B 5503EB00 31E8196E BF196ABE ƒj.€n.Ò1.Ŝ.U.ŝƒn.€n.Ò#.ƒn.€n.Ò.. 0001A0
 EF830E73 F738C319 5E1EFF00 02B807E3 19600E8B 0000FFFF 9A500646 8A50C033 3âP.F.P.......'.D.E....^.ū;%s..ÿ 0001C0
 F0E90375 00F43639 FF2BF62B 56570000 14C800C3 EEEB1DFF F2740245 08058B04 ....E.t·..ŠŸù.à...WV+-+.96¶.u.Õþ 0001E0

Dump of file SATURN:[PCCOMMON.DUMP.DLL]DAAVTDF.TMP;1 on 18-APR-1990 10:39:43.51
File ID (539,17,0)   End of file block 55 / Allocated 56

Virtual block number 36 (00000024), 512 (0200) bytes

 9A04FE68 1EF676FF F876FF0C 6AF85689 F64689F2 5689F046 89C02B00 F4168B00 ...¶.+å.Fþ.V·.F-.V½j..v½.v-.h±.. 000000
 75003F80 26F646FF F65EC400 BCE90376 7FFFFE81 461974C0 080AC483 12B2150C ..ý..á..ät.F.±..v.Õ¥.á^-.F-&.?.u 000020
 9A046A50 01458DBA 75003F80 26F65E88 F475003F 8026F646 FFF65EC4 0CE847EA õGŜ.á^-.F-&.?.u¶.^-&.?.u¤.E.Pj.. 000040
 08EC4688 FE5689FC 468902C4 8312F713 F99A56EE 5689EC46 8904C483 12C114B4 Ç.è..á..FŜ.VŸV.'.¥..á..F=.V±.FŜ. 000060
 F076FFF2 76FF0C6A 19301689 193BA3EE 5688EC46 886674C2 08FC4688 6D74EE46 FŸtm.F=.ôtf.FŜ.VŸÈ;...=.j..v·.vþ 000080
 02578926 078926FE 5688FC46 88EC5EC4 2C74C008 0AC48310 16150C9A 04FE681E .h±.......á..ât,á^Ŝ.F=.V±&..&.W. 0000A0
 FFF05EC4 E8E80E74 C00A0788 26FC46FF FC5EC407 8A26F046 FFF05EC4 04EC4683 .FŜ.á^þ.Fþ&..á^=.F=&...ät.ŜÒá^þ. 0000C0
 02021601 FA70E900 028890C8 C95F5EA7 75003F80 26F05EC4 F475003F 8026F046 Fþ&.?.u¶á^þ&.?.uÏ^_èù.¡..Õp'.... 0000E0
 02350212 12110D10 120F160D 160C0808 070A0C09 0C080C07 09060D05 18040203 ..............................5. 000100
 08A40084 09820A81 0A801606 09721C70 2060006C 08590057 00530052 02430041 A.C.R.S.W.Y.l.m p.r...........Ê. 000120
 E58899FF FF880008 E8CB5DE5 8899FFFF 88172A16 891731A3 16080000 080702CE ö.■.....È1...*.¡....|]ùÒ..¡....Ì 000140
 0A76243C 0472133C F7E24343 1674073A 2E1875E4 0A0024B9 134C8817 31A3C85D ]ùÈ1.£L.¿$..õu..:.t.CCã%<.r.<$v. 000160
 0574C308 C08C065E C4EC8855 00C3172A A3980147 8A2E4301 76CA3C04 728C3C43 C<¥r.<òv.C..G..Ê*.û.U.&á^..å.ût. 000180
 08750019 523E831E 73FFF130 06468857 5602EC83 EC8855CB 5DE58801 FE4F8026 &.O±..|]ìU.ŝ.ŝ.VW.F.=þ.s..>R..u. 0001A0
 83127215 FE9A0676 FF087500 78E80574 0018E815 750082E8 1952A312 740025E8 Õ%.t.ÈR.Ò..u.Ò..t.Òx.u..v..±.r.. 0001C0
 8D50501E C033FE5E 89FEE383 43065E88 0776065E 3900F08B CB5DE58B 5E5F02C4 á._^.|]ùÈþ.9^.v..^.C.D±.^±3â.PP. 0001E0
```

```
Dump of file SATURN:[PCCOMMON.DUMP.DLL]DAAVTDF.TMP;1 on 18-APR-1990 10:39:43.51
File ID (539,17,0)   End of file block 55 / Allocated 56

Virtual block number 37 (00000025), 512 (0200) bytes

 0574D208 1956A319 541687C2 8B3874FF FA8308C4 83142017 AA9A5002 80510E4F O.Q¯.P.ˆ.-..á..ª.t8.ô..T.ÈV..@t. 000000
 01478D00 02A30000 A3000AB8 0C478948 480008A3 C033D88E FE5E8B00 08A3DA8E .ÖÈ...^±.Ã3äÈ..HH.G.|..È..È...G. 000020
 8CD20801 9AE81956 1E8ED833 064E88C0 8ED88CC3 1FD88C00 06A3000D 05000AA3 È.....È...Ã.û.Ã.á.N.3Û..V.Ò...@. 000040
 C2F7FA56 89F84689 14E118A8 9A0676FF 006A0876 FF006A56 00000AC8 C3D98EC1 è.lûà...Vj..v.j..v..´.Ã..F%.Vª%ó 000060
 1274D00B FE5689FC 468902C4 8314FA13 F99A56F8 768B902F EB99C028 0674FFFF ..t.+â.Š/..v%V.ª.ª..á..F=.V±.Ât. 000080
 57EC8855 90CBC95E FE5688FC 46889007 EB08C483 14591860 9A50FE76 FF006A56 Vj..v±P.'.Y..á.Š...F=.V±^èù.U.ŠW 0000A0
 FF448AA6 F30A76C5 FE8BCB03 D9F7AEF2 C033F788 067EC4D9 8827E30E 4E8B1E56 V..N.D'.lá-..%3â·Û%l.ù.±év.µI.D. 0000C0
 56880646 880E4E88 00CB5DE5 885F5E1F C188D1F7 49490474 0477FF45 3A26C933 3è&:E.w.t.II%l.è.^_.[]ù..N..F..V 0000E0
 F700D283 DBF7AA2D B00A79D2 0B0E750A F9831374 C00A93FC 071E570A 7EC51E08 ..é-.W..=..át..ª.u¯.@y.¯-´%Û.@.% 000100
 75C308C2 88AA2704 0276393C 30040387 92F1F793 F1F70274 C008D233 92F788DA Ö.%.3@.át.%þ.%þ..Æ.0<9v..'ˆ.ô.ûu 000120
 000006C8 00CB50E5 885E5F1F 580A8CF2 72C73801 448DFF44 880586AC 4F0588E2 ã..O¯...D..D.;úr·.ÖX._^.[]ù.à... 000140
 8314C618 DC9A5306 0E74830A 47F626FA 5EC41CEB F628FC5E 8CFA4689 05308856 V|0..Fª.^=+-Š.á^ª&-G.¯t..S.É.ó.. 000160
 88EC8855 90CBC95E C688D876 FA463917 20168817 1EA10CFA 46834601 744004C4 á.@t.F.Fª.À.... .9Fª vÃ.ó^èù.U.Š. 000180
 0005B807 1E297500 3F831948 BB5756EC 8855CB5D E58801FE 4F800474 DB0B065E ^..Üt..O±..[]ùU.ŠVWEH..?.u)..|.. 0001A0
 FFFEFE44 C704C683 000104C7 96194AA3 1948A3FE 244024E8 99C03305 750176E8 Òv.u.3â.Š$@$±ÈH.ÈJ..ú....ó.ÚO±±. 0001C0
 EEF983FE E180FA74 41000DE9 CB5DE588 5E5F0009 E8C08ED8 8C064E88 194E3689 .6N..N..Ã.âÒ.._^.[]ùÕÃ.Atª.Ã±.ªŸ 0001E0

Dump of file SATURN:[PCCOMMON.DUMP.DLL]DAAVTDF.TMP;1 on 18-APR-1990 10:39:43.51
File ID (539,17,0)   End of file block 55 / Allocated 56

Virtual block number 38 (00000026), 512 (0200) bytes

 000205C2 03357401 A8ADF003 D0881573 C1384843 7401A8FE 88ADFC02 7788F273 s·.w.=Ù.±´.tCH;ès..Â.þÙ´.t5.ô... 000000
 DA8CC688 FE4CFEF9 0305EB05 8948C128 FE4C89F9 030C74FE 88E6EBFE 4489F788 .%.D±ŠI.±t..ª.L±+èH..Š..ª±L±.6.Ö 000020
 ADF003FE 882574FF FE3D0219 5A06C626 C3027F89 19561E8C 26057401 3811CC89 ¿ä.;!t.&..V....û&6.Z..=±.t%.±.þÙ 000040
 E6EBFE44 89F78800 0205C203 E27401A8 ADF003D0 888C73C1 3848FE88 F27401A8 ´.t·.±H;ès¥.Â.þÙ´.tã.ô....%.D±ŠI 000060
 19521E8E 260574C7 381691BF D88C1274 195A0EFE 2615EBD8 8E0474C0 08084788 .G..ât..ÄŠ.&±.Z.t..Ä¢..;út.&..R. 000080
 001DE8FE 40FE0074 005FE898 40400124 0074C638 0068E8C0 33067788 B8E83788 .7ŠE.w.3âÒk.;ót.$.@@.Ò_.t.±M±Ò.. 0000A0
 45885103 99C03302 47890788 1956A326 0474C138 16E58908 8C98EB4E 4E960574 t..NNŠ..Ã¿I.;èt.&ÈV....G.3â.ûQ.E 0000C0
 C2031572 C603C188 F575EAD1 04761958 163B267F FFBA4141 49C82B03 7401A8FE ±´.t.+àIAA¤..&;.X.v.Iõu%.é.ór..ô 0000E0
 88571874 001DE851 52C359C0 33E575EA D1D2F708 75000CE8 C628C223 D2F70072 r.%@#ö+6Ò..u.%@Iõu[3âYûRQÒ..t.W. 000100
 52521ED2 335053C3 5A5958FE 55894AD7 2B068806 7789FFFE FE44C7F2 03F088FE ±.Þ.·ÚD±±..W..@+@J.U±XYZûSP3@.RR 000120
 065756EC 8855C3D2 0802745B 5A1FFFFA 8308C483 15CD17AA 9A1F0650 00018850 P|..P...ˆ.ë..á..ª..Z{t..@ûU.ŠVW. 000140
 11744804 FC36884C EB277200 57E80775 48064688 08568800 FCBF3875 000A7E83 .-..u8¢=..V..F.Hu.ÒW.r'ŠL.6=.Ht. 000160
 FFB80675 D20B0473 04FCFE81 04C68334 735E003E E8560E46 8902448B 0074F738 ;%t..D..F.VÒ>.^s4.ó..±=.s..@u.|. 000180
 FC368902 5C891489 E675C085 F95B0000 FFFF9A50 C0335016 52C48850 21E899FF ..ŠIP.áR.P3âP.....[ª.âul...\..6= 0001A0
 F9F27504 FCFE8104 C6830C74 024C39F7 880E4E88 CB50E58B 5E5F07C0 33D38B04 ..Æ3â._^.[]ù.N..%9L.t..ó..±=.u·ª 0001C0
 75C08500 00FFFF9A 51531373 00F61E39 0675F738 C18ED388 26721C03 DA8B2CEB Š,.Ö..F&.Æ.è;%u.9.-.s.SQ......âu 0001E0

Dump of file SATURN:[PCCOMMON.DUMP.DLL]DAAVTDF.TMP;1 on 18-APR-1990 10:39:43.51
File ID (539,17,0)   End of file block 55 / Allocated 56

Virtual block number 39 (00000027), 512 (0200) bytes

 DAF7D788 067EC457 38E30C4E 88EC8855 00C3D188 04879200 F6168904 75F738DE 8;%u...-.....Iû.U.Š.N.D8W6~..=%Ö 000000
 8C10E3D1 87AAF3C9 13ABF3E9 D1E08A0A 46880128 D187D103 D323D81B D12B0C74 t.+I.ÛWÆ.I.I+I.F..ÂIÕµ¨.èµˆ.ID.. 000020
 5E880846 88EC8855 CB5D0856 88064688 5FAAF3C9 13ABF3E9 D1C38EFF FFC381C3 û.û...ûIÕµ¨.èµˆ_.F..V.]ûU.Š.F..^ 000040
 88C8030C 66F70646 88C888E3 F70008CA 5DE588E3 F706468B 08750A5E 88D8080C ..Ã.^.u..F.%D.[]ò..%D.à.F.%f..à. 000060
 5575023C 03240A47 8A26065E C4F62856 000004C8 0008CA5D E588D103 E3F70646 F.%D.I.[]ò..à...V+-á^.&.G.$.<.uU 000080
 26065E88 39740111 2487F606 D868F9F7 000CB999 053020C3 88157508 0A47F626 &-G..u..û·0..¿..%ªkÃ.-.$..t9.^.& 0000A0
 0F6E9A50 E42A0B47 8A260677 FF260877 FF265028 7EC008FC 46890647 2B26078B ..&+G..F=.â-(P&.w.&.w.&.G.*ÒP.n. 0000C0
 08578826 06478826 065EC4FF FF8E200A 4F802606 5EC40874 FC463808 C483179A ...á.;F=t.á^.&.O. /..á^.&.G.&.W. 0000E0
 12180103 00000004 19300002 000CC8C9 5EC68800 000447C7 26025789 26078926 &..&.W.&ûG....ó^èù....0......... 000100
 18490103 00220002 17FE0103 00000006 171A0002 00070002 11E00103 00050002 ......Á................±...ª...I. 000120
 11620103 003A0002 0F9A0103 00880002 18930105 046A000B 10BA0203 00260002 ..&...¤...j.................:...b. 000140
 00000000 00000000 00000000 005C0002 00930103 00580002 00A60103 00400002 ..M...I...[.......\............. 000160
 6F43202D 20797261 7262694C 20656069 54206E75 5220534D 00000000 00000000 ........MS Run-Time Library - Co 000180
 70726F43 2074666F 736F7263 6940202C 38383931 20296328 20746867 69727970 pyright (c) 1988, Microsoft Corp 0001A0
 00040003 000C0000 00000000 00000000 0088008A 00890088 0084004B 00000011 ....K........................... 0001C0
 696E4962 61747641 00796264 65735574 696E4962 61747641 0000FFFF 15780002 ..(.....AvtabInitUsedby.AvtabIni 0001E0
```

```
Dump of file SATURN:[PCCOMMON.DUMP.DLL]DAAVTDF.TMP;1 on 18-APR-1990 10:39:43.51
File ID (539,17,0)    End of file block 55 / Allocated 56

Virtual block number 40 (00000028), 512 (0200) bytes

 5674696E 49626174 76410065 756C6156 74696E49 62617476 41006575 6C615674 tValue.AvtabInitValue.AvtabInitV 000000
 76410000 00732520 2C732500 00007325 202C7325 00732520 2C732500 65756C61 alue.%s, %s.%s, %s...%s, %s...Av 000020
 6E280000 00706172 7453746F 6F426261 74764100 70617274 53746F6F 42626174 tabBootStrap.AvtabBootStrap...(n 000040
 19701BF0 11FB1BF0 1BF00000 00000000 23202D2B 00296C6C 756E2800 296C6C75 ull).(null).+- #......Þ.Þ.«.Þ.p. 000060
 00000000 00000000 00000000 00000000 00000000 00000000 00000000 00000000 ................................ 000080
 00000000 00000000 00000000 00000000 00000000 00000000 00000000 00000000 ................................ 0000A0
 00000000 00000000 00000000 00000000 00000000 00000000 00000000 00000000 ................................ 0000C0
 00000000 00000000 00000000 00000000 00000000 00000000 00000000 00000000 ................................ 0000E0
 00000000 00000000 00000000 00000000 00000000 00000000 00000000 00000000 ................................ 000100
 00000000 00000000 00000000 00000000 00000000 00000000 00000000 00000000 ................................ 000120
 00000000 00000000 00000000 00000000 00000000 00000000 00000000 00000000 ................................ 000140
 00000000 00000000 00000000 00000000 00000000 00000000 00000000 00000000 ................................ 000160
 00000000 00000000 00000000 00000000 00000000 00000000 00000000 00000000 ................................ 000180
 00000000 00000000 00000000 00000000 00000000 00000000 00000000 00000000 ................................ 0001A0
 00000000 00000000 00000000 00000000 00000000 00000000 00000000 00000000 ................................ 0001C0
 00000000 00000000 00000000 00000000 00000000 00000000 00000000 00000000 ................................ 0001E0

Dump of file SATURN:[PCCOMMON.DUMP.DLL]DAAVTDF.TMP;1 on 18-APR-1990 10:39:43.51
File ID (539,17,0)    End of file block 55 / Allocated 56

Virtual block number 41 (00000029), 512 (0200) bytes

 00000000 00000000 00000000 00000000 00000000 00000000 00000000 00000000 ................................ 000000
 00000000 00000000 00000000 00000000 00000000 00000000 00000000 00000000 ................................ 000020
 00000000 00000000 00000000 00000000 00000000 00000000 00000000 00000000 ................................ 000040
 00000000 00000000 00000000 00000000 00000000 00000000 00000000 00000000 ................................ 000060
 00000000 00000000 00000000 00000000 00000000 00000000 00000000 00000000 ................................ 000080
 00000000 00000000 00000000 00000000 00000000 00000000 00000000 00000000 ................................ 0000A0
 00000000 00000000 00000000 00000000 00000000 00000000 00000000 00000000 ................................ 0000C0
 00000000 00000000 00000000 00000000 00000000 00000000 00000000 00000000 ................................ 0000E0
 00000000 00000000 00000000 00000000 00000000 00000000 00000000 00000000 ................................ 000100
 00000000 00000000 00000000 00000000 00000000 00000000 00000000 00000000 ................................ 000120
 00000000 00000000 00000000 00000000 00000000 00000000 00000000 00000000 ................................ 000140
 00000000 00000000 00000000 00000000 00000000 00000000 00000000 00000000 ................................ 000160
 00000000 00000000 00000000 00000000 00000000 00000000 00000000 00000000 ................................ 000180
 00000000 00000000 00000000 00000000 00000000 00000000 00000000 00000000 ................................ 0001A0
 00000000 00000000 00000000 00000000 00000000 00000000 00000000 00000000 ................................ 0001C0
 00000000 00000000 00000000 00000000 00000000 00000000 00000000 00000000 ................................ 0001E0

Dump of file SATURN:[PCCOMMON.DUMP.DLL]DAAVTDF.TMP;1 on 18-APR-1990 10:39:43.51
File ID (539,17,0)    End of file block 55 / Allocated 56

Virtual block number 42 (0000002A), 512 (0200) bytes

 00000000 00000000 00000000 00000000 00000000 00000000 00000000 00000000 ................................ 000000
 00000000 00000000 00000000 00000000 00000000 00000000 00000000 00000000 ................................ 000020
 00000000 00000000 00000000 00000000 00000000 00000000 00000000 00000000 ................................ 000040
 435F00FC 00000000 00000000 00000000 00000000 00000000 00000000 00000000 ..........................ü._C 000060
 051A1346 05161346 05121346 FFFF1346 00000000 003D4F46 4E495F45 4C49465F  FILE_INFO=.....F...F...F...F... 000080
 00000000 0001196E 00000000 05380000 0200FFFF FFFF0101 00000000 051E1346 F.................8.....n....... 0000A0
 00000000 00000000 00000000 02020000 00000000 00000000 01020000 00000000 ................................ 0000C0
 00000000 00000000 00000000 00000000 00000000 00000000 00000000 00000000 ................................ 0000E0
 00000000 00000000 00000000 00000000 00000000 00000000 00000000 00000000 ................................ 000100
 00000000 00000000 00000000 00000000 00000000 00000000 00000000 00000000 ................................ 000120
 00000000 00000000 00000000 00000000 00000000 00000000 00000000 00000000 ................................ 000140
 00000000 00000000 00000000 00000000 00000000 00000000 00000000 00000000 ................................ 000160
 00000000 00000000 00000000 00000000 00000000 00000000 00000000 00000000 ................................ 000180
 00000000 00000000 00000000 00000000 00000000 00000000 00000000 00000000 ................................ 0001A0
 00000000 00000000 00000000 00000000 00000000 00000000 00000000 00000000 ................................ 0001C0
 00000000 00000000 00000000 00000000 00000000 00000000 00000000 00000000 ................................ 0001E0
```

```
Dump of file SATURN:[PCCOMMON.DUMP.DLL]DAAVTDF.TMP;1 on 18-APR-1990 10:39:43.51
File ID (539,17,0)   End of file block 55 / Allocated 56

Virtual block number 43 (0000002B), 512 (0200) bytes

00000000 00000000 00000000 00000000 00000000 00000000 00000000 00000000 ................................ 000000
00000000 00000000 00000000 00000000 00000000 00000000 00000000 00000000 ................................ 000020
00000000 00000000 00000000 00000000 00000000 00000000 00000000 00000000 ................................ 000040
00000000 00000000 00000000 00000000 00000000 00000000 00000000 00000000 ................................ 000060
00000000 00000000 00000000 00000000 00000000 00000000 00000000 00000000 ................................ 000080
00000000 00000000 00000000 00000000 00000000 00000000 00000000 00000000 ................................ 0000A0
00000000 00000000 00000000 00000000 00000000 00000000 00000000 00000000 ................................ 0000C0
00000000 00000000 00000000 00000000 00000000 00000000 00000000 00000000 ................................ 0000E0
00000000 00000000 00000000 00000000 00000000 00000000 00000000 00000000 ................................ 000100
00000000 00000000 00000000 00000000 00000000 00000000 00000000 00000000 ................................ 000120
00000000 00000000 00000000 00000000 00000000 00000000 00000000 00000000 ................................ 000140
00000000 00000000 00000000 00000000 00000000 00000000 00000000 00000000 ................................ 000160
00000000 00000000 00000000 00000000 00000000 00000000 00000000 00000000 ................................ 000180
00000000 00000000 00000000 00000000 00000000 00000000 00000000 00000000 ................................ 0001A0
00000000 00000000 00000000 00000000 00000000 00000000 00000000 00000000 ................................ 0001C0
00000000 00000000 00000000 00000000 00000000 00000000 00000000 00000000 ................................ 0001E0

Dump of file SATURN:[PCCOMMON.DUMP.DLL]DAAVTDF.TMP;1 on 18-APR-1990 10:39:43.51
File ID (539,17,0)   End of file block 55 / Allocated 56

Virtual block number 44 (0000002C), 512 (0200) bytes

00000000 00000000 00000000 00000000 00000000 00000000 00000000 00000000 ................................ 000000
00000000 00000000 00000000 00000000 00000000 00000000 00000000 00000000 ................................ 000020
00000000 00000000 00000000 00000000 00000000 00000000 00000000 00000000 ................................ 000040
00000000 00000000 00000000 00000000 00000000 00000000 00000000 00000000 ................................ 000060
00000000 00000000 00000000 00000000 00000000 00000000 00000000 00000000 ................................ 000080
00000000 00000000 00000000 00000000 00000000 00000000 00000000 00000000 ................................ 0000A0
00000000 00000000 00000000 00000000 00000000 00000000 00000000 00000000 ................................ 0000C0
00000000 00000000 00000000 00000000 00000000 00000000 00000000 00000000 ................................ 0000E0
00000000 00000000 00000000 00000000 00000000 00000000 00000000 00000000 ................................ 000100
00000000 00000000 00000000 00000000 00000000 00000000 00000000 00000000 ................................ 000120
00000000 00000000 00000000 00000000 00000000 00000000 00000000 00000000 ................................ 000140
00000000 00000000 00000000 00000000 00000000 00000000 00000000 00000000 ................................ 000160
00000000 00000000 00000000 00000000 00000000 00000000 00000000 00000000 ................................ 000180
00000000 00000000 00000000 00000000 00000000 00000000 00000000 00000000 ................................ 0001A0
00000000 00000000 00000000 00000000 00000000 00000000 00000000 00000000 ................................ 0001C0
00000000 00000000 00000000 00000000 00000000 00000000 00000000 00000000 ................................ 0001E0

Dump of file SATURN:[PCCOMMON.DUMP.DLL]DAAVTDF.TMP;1 on 18-APR-1990 10:39:43.51
File ID (539,17,0)   End of file block 55 / Allocated 56

Virtual block number 45 (0000002D), 512 (0200) bytes

00000000 00000000 00000000 00000000 00000000 00000000 00000000 00000000 ................................ 000000
00000000 00000000 00000000 00000000 00000000 00000000 00000000 00000000 ................................ 000020
00000000 00000000 00000000 00000000 00000000 00000000 00000000 00000000 ................................ 000040
00000000 00000000 00000000 00000000 00000000 00000000 00000000 00000000 ................................ 000060
00000000 00000000 00000000 00000000 00000000 00000000 00000000 00000000 ................................ 000080
00000000 00000000 00000000 00000000 00000000 00000000 00000000 00000000 ................................ 0000A0
00000000 00000000 00000000 00000000 00000000 00000000 00000000 00000000 ................................ 0000C0
00000000 00000000 00000000 00000000 00000000 00000000 00000000 00000000 ................................ 0000E0
00000000 00000000 00000000 00000000 00000000 00000000 00000000 00000000 ................................ 000100
00000000 00000000 00000000 00000000 00000000 00000000 00000000 00000000 ................................ 000120
00000000 00000000 00000000 00000000 00000000 00000000 00000000 00000000 ................................ 000140
00000000 00000000 00000000 00000000 00000000 00000000 00000000 00000000 ................................ 000160
00000000 00000000 00000000 00000000 00000000 00000000 00000000 00000000 ................................ 000180
00000000 00000000 00000000 00000000 00000000 00000000 00000000 00000000 ................................ 0001A0
00000000 00000000 00000000 00000000 00000000 00000000 00000000 00000000 ................................ 0001C0
00000000 00000000 00000000 00000000 00000000 00000000 00000000 00000000 ................................ 0001E0
```

```
Dump of file SATURN:[PCCOMMON.DUMP.DLL]DAAVTDF.TMP;1 on 18-APR-1990 10:39:43.51
File ID (539,17,0)   End of file block 55 / Allocated 56

Virtual block number 46 (0000002E), 512 (0200) bytes

00000000 00000000 00000000 00000000 00000000 00000000 00000000 00000000 ................................ 000000
00000000 00000000 00000000 00000000 00000000 00000000 00000000 00000000 ................................ 000020
00000000 00000000 00000000 00000000 00000000 00000000 00000000 00000000 ................................ 000040
00000000 00000000 00000000 00000000 00000000 00000000 00000000 00000000 ................................ 000060
00000000 00000000 00000000 00000000 00000000 00000000 00000000 00000000 ................................ 000080
00000000 00000000 00000000 00000000 00000000 00000000 00000000 00000000 ................................ 0000A0
00000000 00000000 00000000 00000000 00000000 00000000 00000000 00000000 ................................ 0000C0
00000000 00000000 00000000 00000000 00000000 00000000 00000000 00000000 ................................ 0000E0
00000000 00000000 00000000 00000000 00000000 00000000 00000000 00000000 ................................ 000100
00000000 00000000 00000000 00000000 00000000 00000000 00000000 00000000 ................................ 000120
00000000 00000000 00000000 00000000 00000000 00000000 00000000 00000000 ................................ 000140
00000000 00000000 00000000 00000000 00000000 00000000 00000000 00000000 ................................ 000160
00000000 00000000 00000000 00000000 00000000 00000000 00000000 00000000 ................................ 000180
00000000 00000000 00000000 00000000 00000000 00000000 00000000 00000000 ................................ 0001A0
00000000 00000000 00000000 00000000 00000000 00000000 00000000 00000000 ................................ 0001C0
00000000 00000000 00000000 00000000 00000000 00000000 00000000 00000000 ................................ 0001E0

Dump of file SATURN:[PCCOMMON.DUMP.DLL]DAAVTDF.TMP;1 on 18-APR-1990 10:39:43.51
File ID (539,17,0)   End of file block 55 / Allocated 56

Virtual block number 47 (0000002F), 512 (0200) bytes

00000000 00000000 00000000 00000000 00000000 00000000 00000000 00000000 ................................ 000000
00000000 00000000 00000000 00000000 00000000 00000000 00000000 00000000 ................................ 000020
00000000 00000000 00000000 00000000 00000000 00000000 00000000 00000000 ................................ 000040
00000000 00000000 00000000 00000000 00000000 00000000 00000000 00000000 ................................ 000060
00000000 00000000 00000000 00000000 00000000 00000000 00000000 00000000 ................................ 000080
00000000 00000000 00000000 00000000 00000000 00000000 00000000 00000000 ................................ 0000A0
00000000 00000000 00000000 00000000 00000000 00000000 00000000 00000000 ................................ 0000C0
00000000 00000000 00000000 00000000 00000000 00000000 00000000 00000000 ................................ 0000E0
00000000 00000000 00000000 00000000 00000000 00000000 00000000 00000000 ................................ 000100
00000000 00000000 00000000 00000000 00000000 00000000 00000000 00000000 ................................ 000120
00000000 00000000 00000000 00000000 00000000 00000000 00000000 00000000 ................................ 000140
00000000 00000000 00000000 00000000 00000000 00000000 00000000 00000000 ................................ 000160
00000000 00000000 00000000 00000000 00000000 00000000 00000000 00000000 ................................ 000180
00000000 00000000 00000000 00000000 00000000 00000000 00000000 00000000 ................................ 0001A0
00000000 00000000 00000000 00000000 00000000 00000000 00000000 00000000 ................................ 0001C0
00000000 00000000 00000000 00000000 00000000 00000000 00000000 00000000 ................................ 0001E0

Dump of file SATURN:[PCCOMMON.DUMP.DLL]DAAVTDF.TMP;1 on 18-APR-1990 10:39:43.51
File ID (539,17,0)   End of file block 55 / Allocated 56

Virtual block number 48 (00000030), 512 (0200) bytes

00000000 00000000 00000000 00000000 00000000 00000000 00000000 00000000 ................................ 000000
00000000 00000000 00000000 00000000 00000000 00000000 00000000 00000000 ................................ 000020
00000000 00000000 00000000 00000000 00000000 00000000 00000000 00000000 ................................ 000040
00000000 00000000 00000000 00000000 00000000 00000000 00000000 00000000 ................................ 000060
00000000 00000000 00000000 00000000 00000000 00000000 00000000 00000000 ................................ 000080
00000000 00000000 00000000 00000000 00000000 00000000 02000001 00000000 ................................ 0000A0
00000000 00000000 00000000 00000000 00000000 00000000 00000000 00000000 ................................ 0000C0
00000000 00000000 00000000 00000000 00000000 00000000 00000000 00000000 ................................ 0000E0
00000000 00000000 00000000 00000000 00000000 00000000 00000000 00000000 ................................ 000100
00000000 00000000 00000000 00000000 00000000 00000000 00000000 00000000 ................................ 000120
00000000 00000000 00000000 00000000 00000000 00000000 00000000 00000000 ................................ 000140
00000000 00000000 00000000 00000000 00000000 00000000 00000000 00000000 ................................ 000160
00000000 00000000 00000000 00000000 00000000 00000000 00000000 00000000 ................................ 000180
00000000 00000000 00000000 00000000 00000000 00000000 00000000 00000000 ................................ 0001A0
00000000 00000000 00000000 00000000 00000000 00000000 00000000 00000000 ................................ 0001C0
00000000 00000000 00000000 00000000 00000000 00000000 00000000 00000000 ................................ 0001E0
```

```
Dump of file SATURN:[PCCOMMON.DUMP.DLL]DAAVTDF.TMP;1 on 18-APR-1990 10:39:43.51
File ID (539,17,0)   End of file block 55 / Allocated 56

Virtual block number 49 (00000031), 512 (0200) bytes

00000000 00000000 00000000 00000000 00000000 00000000 00000000 00000000 ................................ 000000
00000000 00000000 00000000 00000000 00000000 00000000 00000000 00000000 ................................ 000020
00000000 00000000 00000000 00000000 00000000 00000000 00000000 00000000 ................................ 000040
00000000 00000000 00000000 00000000 00000000 00000000 00000000 00000000 ................................ 000060
00000000 00000000 00000000 00000000 00000000 00000000 00000000 00000000 ................................ 000080
00000000 00000000 00000000 00000000 00000000 00000000 00000000 00000000 ................................ 0000A0
00000000 00000000 00000000 00000000 00000000 00000000 00000000 00000000 ................................ 0000C0
00000000 00000000 00000000 00000000 00000000 00000000 00000000 00000000 ................................ 0000E0
00000000 00000000 00000000 00000000 00000000 00000000 00000000 00000000 ................................ 000100
00000000 00000000 00000000 00000000 00000000 00000000 00000000 00000000 ................................ 000120
00000000 00000000 00000000 00000000 00000000 00000000 00000000 00000000 ................................ 000140
00000000 00000000 00000000 00000000 00000000 00000000 00000000 00000000 ................................ 000160
00000000 00000000 00000000 00000000 00000000 00000000 00000000 00000000 ................................ 000180
00000000 00000000 00000000 00000000 00000000 00000000 00000000 00000000 ................................ 0001A0
00000000 00000000 00000000 00000000 00000000 00000000 00000000 00000000 ................................ 0001C0
00000000 00000000 00000000 00000000 00000000 00000000 00000000 00000000 ................................ 0001E0

Dump of file SATURN:[PCCOMMON.DUMP.DLL]DAAVTDF.TMP;1 on 18-APR-1990 10:39:43.51
File ID (539,17,0)   End of file block 55 / Allocated 56

Virtual block number 50 (00000032), 512 (0200) bytes

00000000 00000000 00000000 00000000 00000000 00000000 00000000 00000000 ................................ 000000
00000000 00000000 00000000 00000000 00000000 00000000 00000000 00000000 ................................ 000020
00000000 00000000 00000000 00000000 00000000 00000000 00000000 00000000 ................................ 000040
00000000 00000000 00000000 00000000 00000000 00000000 00000000 00000000 ................................ 000060
00000000 00000000 00000000 00000000 00000000 00000000 00000000 00000000 ................................ 000080
00000000 00000000 00000000 00000000 00000000 00000000 00000000 00000000 ................................ 0000A0
00000000 00000000 00000000 00000000 00000000 00000000 00000000 00000000 ................................ 0000C0
00000000 00000000 00000000 00000000 00000000 00000000 00000000 00000000 ................................ 0000E0
00000000 00000000 00000000 00000000 00000000 00000000 00000000 00000000 ................................ 000100
00000000 00000000 00000000 00000000 00000000 00000000 00000000 00000000 ................................ 000120
00000000 00000000 00000000 00000000 00000000 00000000 00000000 00000000 ................................ 000140
00000000 00000000 00000000 00000000 00000000 00000000 00000000 00000000 ................................ 000160
00000000 00000000 00000000 00000000 00000000 00000000 00000000 00000000 ................................ 000180
00000000 00000000 00000000 00000000 00000000 00000000 00000000 00000000 ................................ 0001A0
00000000 00000000 00000000 00000000 00000000 00000000 00000000 00000000 ................................ 0001C0
00000000 00000000 00000000 00000000 00000000 00000000 00000000 00000000 ................................ 0001E0

Dump of file SATURN:[PCCOMMON.DUMP.DLL]DAAVTDF.TMP;1 on 18-APR-1990 10:39:43.51
File ID (539,17,0)   End of file block 55 / Allocated 56

Virtual block number 51 (00000033), 512 (0200) bytes

00000000 00000000 00000000 00000000 00000000 00000000 00000000 00000000 ................................ 000000
00000000 00000000 00000000 00000000 00000000 00000000 00000000 00000000 ................................ 000020
00000000 00000000 00000000 00000000 00000000 00000000 00000000 00000000 ................................ 000040
00000000 00000000 00000000 00000000 00000000 00000000 00000000 00000000 ................................ 000060
11180000 00000000 00000000 00000000 00000000 00000000 00000000 00000000 ................................ 000080
00000000 00000000 81818101 00000001 00000000 00000000 00000000 000000FE *............................... 0000A0
00000000 00000000 00000000 00000000 00000000 00000000 00000000 00000000 ................................ 0000C0
00000000 00000000 00000000 00000000 00000000 00000000 00000000 00000000 ................................ 0000E0
00000000 00000000 00000000 00000000 00000000 00000000 00000000 00000000 ................................ 000100
00000000 00000000 00000000 00000000 00000000 00000000 00000000 00000000 ................................ 000120
00000000 00000000 00000000 00000000 00000000 00000000 00000000 00000000 ................................ 000140
00000000 00000000 00000000 00000000 00000000 00000000 00000000 00000000 ................................ 000160
00000000 00000000 00000000 00000000 00000000 00000000 00000000 00000000 ................................ 000180
0A0A0A0A 0A0A0A0A 0A0A0A00 00000000 00000000 00000000 00000000 00000000 ................................ 0001A0
0A0A0A0A 0A0A0A0A 0A0A0A0A 0A0A0A0A 0A0A0A0A 0A0A0A0A 0A0A0A0A 0A0A0A0A ................................ 0001C0
0A0A0A0A 0A0A0A0A 0A0A0A0A 0A0A0A0A 0A0A0A0A 0A0A0A0A 0A0A0A0A 0A0A0A0A ................................ 0001E0
```

```
Dump of file SATURN:[PCCOMMON.DUMP.DLL]DAAVTDF.TMP;1 on 18-APR-1990 10:39:43.51
File ID (539,17,0)   End of file block 55 / Allocated 56

Virtual block number 52 (00000034), 512 (0200) bytes

 0A0A0A0A 0A0A0A0A 0A0A0A0A 0A0A0A0A 0A0A0A0A 0A0A0A0A 0A0A0A0A 0A0A0A0A ................................ 000000
 0A0A0A0A 0A0A0A0A 0A0A0A0A 0A0A0A0A 0A0A0A0A 0A0A0A0A 0A0A0A0A 0A0A0A0A ................................ 000020
 0A0A0A0A 0A0A0A0A 0A0A0A0A 0A0A0A0A 0A0A0A0A 0A0A0A0A 0A0A0A0A 0A0A0A0A ................................ 000040
 0A0A0A0A 0A0A0A0A 0A0A0A0A 0A0A0A0A 0A0A0A0A 0A0A0A0A 0A0A0A0A 0A0A0A0A ................................ 000060
 0A0A0A0A 0A0A0A0A 0A0A0A0A 0A0A0A0A 0A0A0A0A 0A0A0A0A 0A0A0A0A 0A0A0A0A ................................ 000080
 00000000 00000000 0000000A 0A0A0A0A 0A0A0A0A 0A0A0A0A 0A0A0A0A 0A0A0A0A ................................ 0000A0
 00000000 00002000 00000000 00000000 00000000 00000000 00000000 00000000 ......................... ...... 0000C0
 30303652 00003E3E 47534D4E 3C3CFFFF FFFF0522 15AC0000 00000000 00000000 ..........¯.".....<<NMSG>>..R600 0000E0
 2D0A0D33 30303652 0003000A 0D776F6C 66726576 6F206B63 61747320 2D0A0D30 0..- stack overflow.....R6003..- 000100
 0A0D3830 30365200 08000A0D 30207962 20656469 76696420 72656765 746E6920  integer divide by 0.....R6008.. 000120
 73746E65 6D756772 6120726F 66206563 61707320 6867756F 6E652074 6F6E202D - not enough space for arguments 000140
 66206563 61707320 6867756F 6E652074 6F6E2020 0A0D3930 30365200 09000A0D .....R6009..- not enough space f 000160
 656D6974 2D6E7572 00FF000A 0000FC00 0A0D746E 656D6E6F 7269766E 6520726F or environment...■......run-time 000180
 6E696F70 20676E69 74616F6C 66202D0A 0D323030 36520002 0020726F 72726520  error ...R6002..- floating poin 0001A0
 196C0002 00000001 00640002 0004FFFF FF000A0D 64656461 6F6C2074 6F6E2074 t not loaded..........d.......l. 0001C0
 00000000 00000000 00000000 00000006 17200002 00000005 05320002 00000004 ......2....... .................. 0001E0

Dump of file SATURN:[PCCOMMON.DUMP.DLL]DAAVTDF.TMP;1 on 18-APR-1990 10:39:43.51
File ID (539,17,0)   End of file block 55 / Allocated 56

Virtual block number 53 (00000035), 512 (0200) bytes

 52280001 00010001 00010001 00010001 00010001 00010001 00010001 00010352 R............................(R 000000
 776F6C6C 61206568 7420666F 20736575 6C617620 65687420 676E6963 616C7065 eplacing the values of the allow 000020
 7420666F 20736575 6C617620 65687420 676E6974 656C6544 2700656C 62617420  table.'Deleting the values of t 000040
 7463656C 65732065 74616470 55390352 0000656C 62617420 776F6C6C 61206568 he allow table..R.9Update select 000060
 6920656C 62617420 65756C61 76206465 776F6C6C 6120666F 20737574 61747320  status of allowed value table i 000080
 68772064 65727275 63636F20 726F7272 452A0001 0060726F 6620676E 6F6C206E n long form...*Error occurred wh 0000A0
 20726F72 72452900 7365756C 61762065 68742067 6E696361 6C706572 20656C69 ile replacing the values.)Error  0000C0
 756C6176 20656874 20676E69 74656C65 6420656C 69687720 64657272 7563636F occurred while deleting the valu 0000E0
 00000000 00000100 01000100 01000100 01000100 01000100 01000100 01007365 es.............................. 000100
 00911400 009003B0 00000001 0000001E 00000000 FFFF0001 000E0352 000004A4 Ê...R.....................¯....... 000120
 01670005 80020002 03B50006 00030000 00000000 0381FFFF 00640175 00FAFFAA ˙.ª.u.d...Ý...........ç.......g. 000140
 003C0157 00058001 000103BC 00050005 00000000 0000FFFF FFFF0065 00080028 (...e................¥.......W.<. 000160
 000800EC 01480007 8002000C 03C20000 00060000 00000000 FFFFFFFF 00660008 ..f...............ô.......K.§... 000180
 006E0008 00640139 00058001 000103C3 000E0005 00000000 0000FFFF FFFF0067 g...............û.......9.d...n. 0001A0
 FFFF006F 003000F0 01070005 80000000 03020000 00070000 00000000 FFFFFFFF ..............@.........Þ.0.o... 0001C0
 FFFFFFFF 00780008 003400F7 00058001 000103D3 000C0005 00000000 0000FFFF ............Æ.......½.4...x..... 0001E0

Dump of file SATURN:[PCCOMMON.DUMP.DLL]DAAVTDF.TMP;1 on 18-APR-1990 10:39:43.51
File ID (539,17,0)   End of file block 55 / Allocated 56

Virtual block number 54 (00000036), 512 (0200) bytes

 0000FFFF FFFF0079 003000F0 00C50005 80030007 03E00000 000A0000 00000000 ..........Å.......é.Þ.0.y....... 000000
 00000000 FFFFFFFF 00830008 008A0085 00058001 000103E1 00100005 00000000 ........Ã.......ç................ 000020
 00000000 0000FFFF FFFF0084 000800C1 00A90007 8002000C 03F20000 00060000 ......·.......`.è................ 000040
 00060000 00000000 FFFFFFFF 00850008 00C10091 00078002 000C03F3 00000006 ....µ.........è.................. 000060
 00070005 00000000 0000FFFF FFFF0086 000800C0 00790007 8002000C 03F40000 ..¶.......y.ô.................... 000080
 03FD0000 00070000 00000000 FFFFFFFF 00870008 0064006C 00058001 000103F5 ½.......l.d...................». 0000A0
 040003FE 00030003 00000000 0000FFFF FFFF0088 003000C5 003A0005 80000000 ......:.é.0..................±... 0000C0
 80020000 04020007 00030000 00000000 FFFFFFFF 0089000C 0026005E 00CF8002 ..Ü.^.&......................... 0000E0
 00CF8002 0000040A 00060003 00000000 0000FFFF FFFF008A 000C0026 004C00CF Ü.L.&.......................Ü. 000100
 00050005 80010002 04110010 00050000 00000000 FFFFFFFF 008B000C 0026003A :.&............................. 000120
 0019001F 00388001 00010422 00040005 00000000 0000FFFF FFFF0096 002D00F0 Þ.-.................".....8..... 000140
 0008001A 001F0078 80010001 04270004 00050000 00000000 FFFFFFFF 00970008 ....................'.....x....... 000160
 00990008 001A001F 00B88001 0001042C 00040005 00000000 0000FFFF FFFF0098 ..................,......|......... 000180
 FFFF009A 00080028 0014000A 80010001 04310007 00050000 00000000 FFFFFFFF ..............1.........(....... 0001A0
 FFFFFFFF 00980008 00280009 000A8001 00010439 00070005 00000000 0000FFFF ............9.........(......... 0001C0
 0000FFFF FFFF009C 00080037 00140038 80010001 0441000A 00050000 00000000 ..........A.....8...7........... 0001E0
```

```
Dump of file SATURN:[PCCOMMON.DUMP.DLL]DAAVTDF.TMP;1 on 18-APR-1990 10:39:43.51
File ID (539,17,0)   End of file block 55 / Allocated 56

Virtual block number 55 (00000037), 512 (0200) bytes

 00000000 FFFFFFFF 009D0008 00370014 00788001 0001044C 000A0005 00000000 ........L.....x...7............. 000000
 00000000 0000FFFF FFFF009E 00080037 001400B8 80010001 0457000A 00050000 ......W.....|...7............... 000020
 00050000 00000000 FFFFFFFF 009F0008 00370009 00388001 00010462 000A0005 ....b.....8...7................. 000040
 000A0005 00000000 0000FFFF FFFF00A0 00080037 00090078 80010001 0460000A ..m.....x...7................... 000060
 04830000 00050000 00000000 FFFFFFFF 00A10008 00370009 00B88001 00010478 x.....|...7...A................. 000080
 00010491 00120005 00000000 0000FFFF FFFF007B 0008008A 009D0005 80010001 ............(................... 0000A0
 656D614E 00746365 6C655300 00000000 FFFFFFFF 007C0008 008A0085 00058001 ..........|..........Select.Name 0000C0
 003A6E6F 69747069 72637365 44000079 62206465 636E6572 65666552 2A00003A :..*Referenced by..Description:. 0000E0
 64410000 7365756C 61562A00 0000003A 65756C61 7620676E 696E6E69 67654200 .Beginning value:....*Values..Ad 000100
 6F697461 6D726F66 6E692072 65735500 6574656C 65440065 63616C70 65520064 d.Replace.Delete.User informatio 000120
 64657461 64705500 64657461 65724300 72657355 00656D69 54006574 6144006E n.Date.Time.User.Created.Updated 000140
 5F5F5F5F 5F5F5F5F 5F005F5F 5F5F5F5F 5F5F5F5F 005F5F5F 5F5F5F5F 5F5F5F00 ._________.__________.__________ 000160
 5F5F5F5F 5F5F5F5F 005F5F5F 5F5F5F5F 5F5F5F00 5F5F5F5F 5F5F5F5F 5F5F005F _.__________.__________.________ 000180
 69747069 72637365 64206575 6C615600 3A65756C 61762067 6E69646E 45005F5F __.Ending value:.Value descripti 0001A0
 00000000 00000000 00000000 00000000 00000000 00000000 00000000 003A6E6F on:............................. 0001C0
 00000000 00000000 00000000 00000000 00000000 00000000 00000000 00000000 ................................ 0001E0
```

```
Dump of file SATURN:[PCCOMMON.DUMP.DLL]DAATTRDF.TMP;1 on 18-APR-1990 10:39:32.72
File ID (535,11,0)    End of file block 82 / Allocated 84

Virtual block number 1 (00000001), 512 (0200) bytes

 00000000 00000040 00000000 000000B8 0000FFFF 00000004 0000004A 001A5A4D MZ..J...........|.......a....... 000000
 00000080 00000000 00000000 00000000 00000000 00000000 00000000 00000000 ................................ 000020
 6F6E6E61 63206D61 72676F72 70207369 685421CD 4C01B821 CD09B400 0EBA1F0E ..a..Ç.ël¦.LèlThis program canno 000040
 00000000 00000024 0A0D0D2E 65646F6D 20534F44 206E6920 6E757220 65622074 t be run in DOS mode....$....... 000060
 00080009 00000000 00030000 00000000 00058009 FC82F659 0007066D 0505454E NE..m...Y-_=.................... 000080
 00000000 00000000 00010003 00040000 000006F4 008000A0 00940088 00400038 8.a......¯.¶................... 0000A0
 009C0E00 009C090B 000F0F00 000F0909 1DC40F00 1DC40712 65500F00 65500073 s.Pe..Pe..é...é................. 0000C0
 01F91EF1 01F90948 02351EF1 02350924 01980E21 00000000 00E00F21 00E00915 ..Á.!.Á.....!...$.5.þ.5.H.'.þ.'. 0000E0
 00000046 44525454 41414408 000E0004 00030005 00020005 0CAF1EB1 0CAF0968 h.É.Ý.É..............DAATTRDF... 000100
 414D454D 004D454D 034E4957 4D500500 0539050B 03F10306 02440019 00070001 ......D...þ...9...PMWIN.MEM.MEMA 000120
 4D464418 4D455449 44444154 53494C4D 46440E4D 4644034B 434F4C42 434F4C4C LLOCBLOCK.DFM.DFMLISTADDITEM.DFM 000140
 50455254 53494C4D 46441244 45544345 4C45534D 45544959 52455551 5453494C LISTQUERYITEMSELECTED.DFMLISTREP 000160
 59524555 514D4644 154D524F 46535345 434F5250 4D46440E 4D455449 4543414C LACEITEM.DFMPROCESSFORM.DFMQUERY 000180
 4D46440F 50414548 42485952 4555514D 46440E41 54414452 45535544 4C454946 FIELDUSERDATA.DFMQUERYHBHEAP.DFM 0001A0
 52455551 4D46440F 4D544859 52455551 4D46440B 4A424F4C 4D444859 52455551 QUERYHDMLOBJ.DFMQUERYHTM.DFMQUER 0001C0
 4D46440C 53555441 54535446 49485359 52455551 4D464413 474C4444 4E574859 YHWNDDLG.DFMQUERYSHIFTSTATUS.DFM 0001E0

Dump of file SATURN:[PCCOMMON.DUMP.DLL]DAATTRDF.TMP;1 on 18-APR-1990 10:39:32.72
File ID (535,11,0)    End of file block 82 / Allocated 84

Virtual block number 2 (00000002), 512 (0200) bytes

 45524D46 44104154 41445245 53555952 4555514D 4644104C 4F4F5459 52455551 QUERYTOOL.DFMQUERYUSERDATA.DFMRE 000000
 5445534D 46440F4E 4645534F 4C435445 534D4644 0D444C45 49465245 54534947 GISTERFIELD.DFMSETCLOSEFN.DFMSET 000020
 5445534D 4644104E 464C4F52 544E4F43 5445534D 46440F4E 46444E41 4D4D4F43 COMMANDFN.DFMSETCONTROLFN.DFMSET 000040
 5445534D 4644104E 46594649 544F4E54 45534D46 440E4E46 45544147 4956414E NAVIGATEFN.DFMSETNOTIFYFN.DFMSET 000060
 56414E4D 46441341 54414452 45535554 45534D46 440E4E46 53475241 4C4F4F54 TOOLARGSFN.DFMSETUSERDATA.DFMNAV 000080
 4D464411 4D455449 44444154 53454E4D 46440E4D 524F4647 4E4F4C45 54414749 IGATELONGFORM.DFMNESTADDITEM.DFM 0000A0
 52475449 4445454B 414D5453 454E4D46 44144D45 54494554 454C4544 5453454E NESTDELETEITEM.DFMNESTMAKEEDITGR 0000C0
 4C535345 434F5250 4D464419 4D455449 59524555 51545345 4E4D4644 1050554F OUP.DFMNESTQUERYITEM.DFMPROCESSL 0000E0
 49444554 53494C53 5345434F 52504D46 44194C4F 52544E4F 43544944 45545349 ISTEDITCONTROL.DFMPROCESSLISTEDI 000100
 52544E4F 43544944 45545345 4E535345 434F5250 4D464419 444E414D 4D4F4354 TCOMMAND.DFMPROCESSNESTEDITCONTR 000120
 4D464417 444E414D 4D4F4354 49444554 53454E53 5345434F 52504D46 44194C4F OL.DFMPROCESSNESTEDITCOMMAND.DFM 000140
 4F544547 4D414410 6D616403 44455443 454C4553 584F4254 53494C59 52455551 QUERYLISTBOXSELECTED.dam.DAMGETO 000160
 454E4E4F 434D4144 0F525454 41455441 4552434D 41440045 4D414E54 43454A42 BJECTNAME.DAMCREATEATTR.DAMCONNE 000180
 49444554 41455243 4D41440C 59454B45 54414552 434D4144 0C535254 54415443 CTATTRS.DAMCREATEKEY.DAMCREATEDI 0001A0
 44005443 454A424F 5055484F 4F4C4D41 440F4D4F 44455441 4552434D 41440C4D M.DAMCREATEDOM.DAMLOOKUPOBJECT.D 0001C0
 41441454 434A5254 54414554 454C4544 4D414410 52545441 4554454C 45444D41 AMDELETEATTR.DAMDELETEATTRJCT.DA 0001E0

Dump of file SATURN:[PCCOMMON.DUMP.DLL]DAATTRDF.TMP;1 on 18-APR-1990 10:39:32.72
File ID (535,11,0)    End of file block 82 / Allocated 84

Virtual block number 3 (00000003), 512 (0200) bytes

 4E4F4E59 414C5053 49444D41 44135352 5454414C 4C415254 54415952 4555514D MQUERYATTRALLATTRS.DAMDISPLAYNON 000000
 54534C4D 440B6C6D 64035252 45594E41 54414D52 4F464D41 440F5252 45444144 DAMERR.DAMFORMATANYERR.dml.DMLST 000020
 484C4544 4F4D5952 4555514C 4D44134E 5854504F 54534C4D 440A4E58 54545241 ARTTXN.DMLSTOPTXN.DMLQUERYMODELH 000040
 00544E55 4F435952 4555514C 4D440D49 54475952 4555514C 4D440B45 4C444E41 ANDLE.DMLQUERYGTI.DMLQUERYCOUNT. 000060
 4D49534C 4D440C44 4C454946 5445534C 4D440B44 4C454946 59524555 514C4D44 DMLQUERYFIELD.DMLSETFIELD.DMLSIM 000080
 09314E4C 52595245 55514C4D 440C4E4C 52595245 55514C4D 440B5445 53454C50 PLESET.DMLQUERYRLN.DMLQUERYRLN1. 0000A0
 53494C45 4552464C 4D440B45 54414C45 524E554C 4D440B45 54414C45 524C4D44 DMLRELATE.DMLUNRELATE.DMLFREELIS 0000C0
 41424C4C 4F524E58 54504F54 534C4D44 1244494C 4D445952 4555514C 4D440D54 T.DMLQUERYDMLID.DMLSTOPTXNROLLBA 0000E0
 4C415443 454C4553 45444C4D 440E5443 454A424F 5443454C 45534C4D 440F4B43 CK.DMLSELECTOBJECT.DMLDESELECTAL 000100
 4D454D59 414C5053 49444D41 44105052 45424D55 4E535509 4D524F46 4144064C L.DAFORM.USNUMBERP.DAMDISPLAYMEM 000120
 5445534D 524F4641 440E4F46 4E495245 53555449 4E494D52 4F464144 12525245 ERR.DAFORMINITUSERINFO.DAFORMSET 000140
 4C455345 54414450 554A424F 0F544345 4C455354 494E494A 424F0045 4C544954 TITLE.OBJINITSELECT.OBJUPI 'TESEL 000160
 414E5355 434F4645 54414450 554A424F 12454D41 4E54494E 494A424F 08544345 ECT.OBJINITNAME.OBJUPDATEF. 'USNA 000180
 4A424F0A 43534544 54494E49 4A424F0B 43534544 45544144 50554A42 4F0D454D ME.OBJUPDATEDESC.OBJINITDESC..OBJ 0001A0
 524A424F 094E5953 4C45444A 424F094E 59534444 414A424F 094E5953 54494E49 INITSYN.OBJADDSYN.OBJDELSYN.OBJR 0001C0
 45444A42 4F094457 4B444441 4A424F09 44574B54 494E494A 424F0A4E 59535045 EPSYN.OBJINITKWD.OBJADDKWD.OBJDE 0001E0
```

```
Dump of file SATURN:[PCCOMMON.DUMP.DLL]DAATTRDF.TMP;1 on 18-APR-1990 10:39:32.72
File ID (535,11,0)   End of file block 82 / Allocated 84

Virtual block number 4 (00000004), 512 (0200) bytes

 44414A42 4F0A4554 4F4E5449 4E494A42 4F084457 4B504552 4A424F09 44574B4C LKWD.OBJREPKWD.OBJINITNOTE.OBJAD 000000
 0B495447 0345544F 4E504552 4A424F0A 45544F4E 4C45444A 424F0A45 544F4E44 DNOTE.OBJDELNOTE.OBJREPNOTE.GTI. 000020
 41595245 55514954 47124753 4D54534F 50495447 0A4C4F4F 544C4C49 4B495447 GTIKILLTOOL.GTIPOSTMSG.GTIQUERYA 000040
 48594649 544F4E45 4B414D54 554C4D44 1654554C 4D440552 54504154 41445855 UXDATAPTR.DMLUT.DMLUTMAKENOTIFYH 000060
 54554C4D 44104554 454C4544 52455453 49474552 54554C40 44135245 4C444E41 ANDLER.DMLUTREGISTERDELETE.DMLUT 000080
 44124554 49525752 45545349 47455254 554C4D44 12544553 52455453 49474552 REGISTERSET.DMLUTREGISTERWRITE.D 0000A0
 52524554 53494745 5254554C 4D441B59 4649544F 4E535345 434F5250 54554C4D MLUTPROCESSNOTIFY.DMLUTREGISTERR 0000C0
 20414420 4D502032 2F534F24 00005C41 03010145 54414C45 524E5545 54414C45 ELATEUNRELATE...A\..$OS/2 PM DA  0000E0
 52545441 0000006D 726F4620 676E6F4C 206C6564 6F4D2065 74756269 72747441 Attribute Model Long Form...ATTR 000100
 890A468B D88EFFFF 881E5657 00006EC8 00000000 00000150 41525453 544F4F42 BOOTSTRAP.......àn..WV.¦...Ä.F.. 000120
 00FFFF9A 5016EA46 800E76FF 1076FF01 46E90374 01E67E83 E646890C 46889646 F..F..Fl.-l.t.ÕF..v..v..Fõ.P.... 000140
 FFFF9A50 16F4468D 0E76FF10 76FF03A5 E9E8468B 0006E903 7500003D E8468900 ..FÒ=..u.Õ...FÒÕÊ..v..v..F¶.P... 000160
 76FF5016 FC468D00 A8E99646 880384E9 E8468800 06E90375 00003DE8 46890000 ...FÒ=..u.Õ...FÒÕ...F.Õ¨..F=.P.v 000180
 0357E9E8 46880006 E9037500 003DE846 890AC483 FFFF074B 9A0E76FF 1076FF96 ..v..v..K....6..FÒ=..u.Õ...FÒÕW. 0001A0
 FC76FFFE 76FFEA76 FFEC76FF 0027E903 7401F47E 830070E9 0375FE46 0BFC468B .F=.F±u.Õp..~¶.t.Õ'..vš.võ.v±.v= 0001C0
 76FFEC76 FF0040E9 031FE9E8 46880006 E9037500 003DE846 89000000 F69A016A j..-....FÒ=..u.Õ...FÒÕ..Õa..vš.v 0001E0

Dump of file SATURN:[PCCOMMON.DUMP.DLL]DAATTRDF.TMP;1 on 18-APR-1990 10:39:32.72
File ID (535,11,0)   End of file block 82 / Allocated 84

Virtual block number 5 (00000005), 512 (0200) bytes

 FE76FFEA 76FFEC76 FF0300E9 E8468800 06E90375 00003DE8 46890000 FFFF9AEA õ......FÒ=..u.Õ...FÒÕ...vš.võ.v± 000000
 56E90059 E902DCE9 E8468800 06E90375 00003DE8 46890000 FFFF9A01 6AFC76FF .v=j.......FÒ=..u.Õ...FÒÕÉ.ÕY.ÕV 000020
 38E90375 00763DFF 40E90375 00733000 1BE90376 FF4DE903 7500873D 0053E900 .ÕS.=..u.ÕM.v.Õ..=s.u.Õa.=v.u.Õ8 000040
 75000930 FF1DE903 7500043D FF25E903 7500CB3D FFD2E9FF 30E90375 00813DFF .=..u.Õ0.Õø.=ù.u.Õ%.=å.u.Õ..=).u 000060
 1076FF01 F7E99646 8BFFA7E9 FF05E903 7500E83D FF0DE903 7500E63D FF15E903 .Õ..=l.u.Õ..=Ò.u.Õ..ÕI..F.Õ%..v. 000080
 000001CF 9A5016EE 468D0E76 FF1076FF 00000213 9A5016F6 468D9676 FF0E76FF .v..v..F-.P......v..v..FŸ.P.ü... 0000A0
 FF0876FF 0A76FF0C 76FFF076 FFF276FF 000001DF 9A5016F0 468D0E76 FF1076FF .v..v..Fþ.P.Õ....v·.vþ.v..v..v.. 0000C0
 239A5016 EE468D0E 76FF1076 FF0224E9 000001FD 9AEE76FF F676FFF8 76FF0676 v..v½.v-.vŸ.»...Õ$..v..v..FŸ.P.# 0000E0
 FF0A76FF 0C76FFF0 76FFF276 FF000002 339A5016 F0468D0E 76FF1076 FF000002 ....v..v..Fþ.P.3....v·.vþ.v..v.. 000100
 F6468D96 76FF0E76 FF1076FF 01E3E900 0002EF9A EE76FF00 9A681E06 76FF0876 v..v..h...vŸ.ÿ...ÕD..v..v..v..F- 000120
 F0468D0E 76FF1076 FF0000FF FF9A5016 EE468D0E 76FF1076 FF000003 269A5016 .P.&....v..v..FŸ.P......v..v..Fþ 000140
 006A006A 01256800 D768F076 FFF276FF 0093E903 7401E67E 83000003 029A5016 .P......-l.t.Õ...v·.vþh=.hX.j.j. 000160
 FC468D50 1698468D 5016FA46 8D005868 1EF076FF F276FF00 0002CF9A 006A006A j.j..ü....v·.vþ.hX..F*.P.F..P.F= 000180
 76FFEA76 FFEC76FF 015FE9E8 46880006 E9037500 003DE846 890000FF FF9A5016 .P......FÒ=..u.Õ...FÒÕ_..vš.võ.v 0001A0
 36E9E846 880006E9 03750000 3DE84689 0000FFFF 9A5016E4 468D046A FC76FFFE ±.v=j..Fõ.P......FÒ=..ū.Õ...FÒÕ6 0001C0
 FF9A006A 006A016A 006A0125 68000768 F076FFF2 76FF0019 E9037459 E47E8001 ..-õYt.Õ...v·.vþh=.hX.j.j.j.j... 0001E0

Dump of file SATURN:[PCCOMMON.DUMP.DLL]DAATTRDF.TMP;1 on 18-APR-1990 10:39:32.72
File ID (535,11,0)   End of file block 82 / Allocated 84

Virtual block number 6 (00000006), 512 (0200) bytes

 FF9AEE76 FFF676FF F876FF06 76FF0876 FF0A76FF 0C76FFF0 76FFF276 FF0000FF ....v·.vþ.v..v..v..v..v½.v- ·Ÿ.. 000000
 06E90375 00003DE8 46890000 FFFF9A50 16F0468D 0E76FF10 76FF00F1 E90000FF ...Õþ..v..v..Fþ.P......FÒ=..u.Õ. 000020
 00003DE8 46890000 FFFF9A50 1692468D 9676FF0E 76FF1076 FF0000E9 E8468800 ..FÒÕÅ..v..v..v..F..P......FÒ=.. 000040
 9476FF06 76FF0876 FF0A76FF 0C76FFF0 76FFF276 FF00ACE9 E8468800 06E90375 u.Õ...FÒÕ¯..v·.vþ.v..v..v..v..v. 000060
 33E90376 FF8AE903 7500CE3D 0083E900 86E90000 B8008CE9 0000FFFF 9A9276FF .v......Õ..¦..Õ..Õ..=ö.u.Õ..v.Õ3 000080
 DCE90375 008130FD E4E90375 007F30FD ECE90375 007330FD F4E90375 00703000 .=p.u.Õ¶»=s.u.Õš»=..u.Õõ»=..u.ÕÉ 0000A0
 13E90376 FDC1E903 7500D63D FFB7E9FD CCE90375 00C93DFD D4E90375 00873DFD »=..u.Õå»=è.u.Õë»Õñ.=ø.u.Õê»v.Õ. 0000C0
 7500E63D FE38E903 75000930 FF97E9FF 35E90375 00043DFF 30E90375 00003000 .=Å.u.Õ=.=å.u.Õ5.Õ..=1.u.Õ8±=l.u 0000E0
 16C8000C CAC95F5E 1FFF74E9 FDDFE903 7500FB3D FD91E903 7500E83D FD99E903 .Õ.»=Ò.u.Õ.»=«.u.ÕÕ»Õt..^_èò..à. 000100
 00000455 9A5016F6 468D0E76 FF1076FF F046890A 468B088E 0008881E 56570000 ..WV.¦...Ä.F..Fþ.v..v..F-¯.P.U... 000120
 00000475 9A5016F2 468D0E76 FF1076FF 00000465 9A5016F8 468D0E76 FF1076FF .v..v..F½.P.e....v..v..F·.P.u... 000140
 8D0E76FF 1076FF00 0004889A 5016FC46 8DF076FF 0E76FF10 76FF0093 E9F0468B .FþÕ...v..v..vþ.F=.P......v..v.. 000160
 8D0E76FF 1076FF00 00019C9A 5016F846 8D0E76FF 1076FF00 00018C9A 5016F646 F-.P......v..v..F½.P......v..v.. 000180
 89000001 7C9A5016 EA468DF0 76FF0E76 FF1076FF 008BE900 00002D9A 5016F246 F·.P.-...Õ...v..v..vþ.Fõ.P.|.... 0001A0
 FF0876FF 0A76FF0C 76FFF876 FFFA76FF 008AE9EE 46880006 E9037500 003DEE46 FŸ=..u.Õ...FŸÕ...v*.v½.v..v..v.. 0001C0
 13E90376 01343000 3EE90064 E90000B8 006AE900 00FFFF9A EA76FFEC 76FF0676 v..vš.võ.....Õj.¦..Õd.Õ>.=4.v.Õ. 0001E0
```

Dump of file SATURN:[PCCOMMON.DUMP.DLL]DAATTRDF.TMP;1 on 18-APR-1990 10:39:32.72
File ID (535,11,0) End of file block 82 / Allocated 84

Virtual block number 7 (00000007), 512 (0200) bytes

```
77013730 FF04E903 73013530 FFDCE9FF 9BE90375 010130FF 5DE90372 012C3D00 .=,.r.Õ].=..u.Õ..ÕÉ.=5.s.ÕÅ.=7.w 000000
0C76FFF8 76FFFA76 FFFF89E9 FF32E903 77013A30 FFC4E903 7301383D FF88E903 .Õ..=8.s.Õá.=:.w.Õ2.Õ¿..v'.v½.v. 000020
0CCAC95F 5E1F0000 E90000FF FF9AF676 FFFC76FF FE76FF06 76FF0876 FF0A76FF .v..v..v..v±.v•.v-.....Õ...^_èò. 000040
B6FF0000 041C9A50 16FF3086 8D0876FF 0A76FFD8 8E03F688 1E565700 0002C800 .à@..WV.|-..Ä.v..v...0..P......Ñ 000060
FF34868D 406AF876 FFFA76FF FA5689F8 46890000 FFFF9A06 76FFFF30 B6FFFF32 2..Ñ0..v.......F½.V'.v'.v½ja..4. 000080
5016FF35 868D00C4 E90000BA 0000B800 09E90375 23FF34BE 800000FF FF9A5016 .P....../4.#u.Õ..|..¤..Õá...5..P 0000A0
0026E903 7407FF74 BE83FF76 9689FF74 8689FFCA 83000000 04C483FF FF00429A .B....á.....ò...t...v../t..t.Õ&. 0000C0
FF9A0080 685016FF 78868D06 76FFFF30 B6FFFF32 B6FF001C E90374FF FF76BE83 ./v..t.Õ...Ñ2..Ñ0..v...x..Ph.... 0000E0
B6FFFF32 B6FF001C E90374FF FF768E83 0026E903 7406FF74 BE830039 E90000FF ...Õ9../t..t.Õ&../v..t.Õ...Ñ2..Ñ 000100
FF003FE9 00008A00 00B80009 E90000FF FF9A5016 FF78868D 00806806 76FFFF30 0..v.h....x..P.....Õ..|..¤..Õ7.. 000120
489A0876 FF0A76FF 0676FF50 16FC468D 0000FFFF 9A5016FF 2E868D08 76FF0A76 v..v......P......F=.P.v..v..v..K 000140
5E1F0000 E90000FF FF9A5016 FF78868D FC76FFFE 76FFFF2E B6FF0AC4 83007A07 .z..á..Ñ...v±.v•..x..P.....Õ...^ 000160
0E76FF10 76FF004A E903740C 087E8308 8E0539B8 1E565700 000AC800 06CAC95F _èò..à...WV.|9..Ä.~..t.ÕJ..v..v. 000180
5688FC46 8800B9E9 F6468800 06E90375 00003DF6 46890000 FFFF9A50 16FC468D .F=.P......F-=..u.Õ...F-Õ¿ .F=.V 0001A0
00880000 FFFF9A77 6A0E76FF 1076FF00 0DE90374 0C563900 15E90374 0A4639FE ±9F.t.Õ..9V.t.Õ...v..v.jw.. ..|. 0001C0
880006E9 03750000 3DF64689 0000FFFF 9A5016F8 46800E76 FF1076FF 0090E900 .Õ...v..v..F½.P......F-=..u.u... 0001E0
```

Dump of file SATURN:[PCCOMMON.DUMP.DLL]DAATTRDF.TMP;1 on 18-APR-1990 10:39:32.72
File ID (535,11,0) End of file block 82 / Allocated 84

Virtual block number 8 (00000008), 512 (0200) bytes

```
FF0A76FF 0C76FF14 77FF2616 77FF26F8 5EC40001 1247C726 F85EC400 6FE9F646 F-Õo.á^½&ùG...á^½&.w.&.w..v..v.. 000000
C726F85E C40039E9 F6468800 06E90375 00003DF6 46890000 FFFF9A06 76FF0876 v..v.......F-=..u.Õ...F-Õ9.á^½&ú 000020
0000073A 9A00A168 0E76FF10 76FF0000 072C9A00 A0680E76 FF1076FF 00001247 G....v..v.h........v..v.hÅ..:... 000040
57000064 C8000CCA C95F5E1F 0000E900 00B80000 FFFF9A00 9F680E76 FF1076FF .v..v.h.......j..Õ...^_èò..àd..W 000060
E9037500 0030EA46 89000004 2C9A5016 EE468006 76FF0876 FFD88E06 50B81E56 V.|]..Ä.v..v..FŸ.P.,....Fõ=..u.Õ 000080
03750000 3DEA4689 000007DA 9A5016F6 46800676 FF0876FF 02F8E9EA 46880006 ...FõÕ%..v..v..F-.P.Õ....Fõ=..u. 0000A0
7500003D EA468900 00054A9A 5016F246 800676FF 0876FF02 D7E9EA46 880006E9 Õ...FõÕ•..v..v..F·.P.J....Fõ=..u 0000C0
0876FF01 7AE90A46 88078926 02478926 0000B80C 5EC402B6 E9EA4688 0006E903 .Õ...FõÕÑ.á^.|..&.G.&...F.Õz..v. 0000E0
76FFF476 FF0010E8 46C7000A EC46C702 8FE90000 06769A0C 76FF0E76 FF0676FF .v..v..v..v...Õ..úF$..úFÒ...v¶.v 000100
F476FF00 12E846C7 000DEC46 C701A7E9 0000081E 9A4B6A50 169C468D 0A76FFF2 ·.v..F..PjK.....ÕÏ.úF$..úFÒ...v¶ 000120
FF0017E8 46C70015 EC46C701 85E90000 08409A4B 6A50169C 46800A76 FFF276FF .v·.v..F..PjK.a...Õ..úF$..úFÒ... 000140
11E846C7 0009EC46 C70163E9 00000862 9A4B6A50 169C4680 0A76FFF2 76FFF476 v¶.v·.v..F..PjK.b...Õc.úF$..úFÒ. 000160
FFF276FF F476FF01 41E90000 05CF9A4B 6A50169C 46800A76 FFF276FF F476FF00 ..v¶.v·.v..F..PjK.ü...ÕA..v¶.v·. 000180
6A680A76 FFF276FF F476FFFA 46890000 0B9B9A00 6A006A00 6A006A01 65680A76 v.he.j.j.j.j.......F'.v¶.v·.v.hj 0001A0
E846C700 07EC46C7 0102E9FE 5689FC46 89000002 559A006A 006AFA76 FF006A01 .j..v'j.j..U....F•.V±Õ..úF$..úFÒ 0001C0
C70006EC 46C700E0 E9000008 E59A5016 9C468D4B 6A0A76FF F276FFF4 76FF000C ...v¶.v·.v.jK.F..P.Í...ÕÁ.úF$..ú 0001E0
```

Dump of file SATURN:[PCCOMMON.DUMP.DLL]DAATTRDF.TMP;1 on 18-APR-1990 10:39:32.72
File ID (535,11,0) End of file block 82 / Allocated 84

Virtual block number 9 (00000009), 512 (0200) bytes

```
16EC46C7 00BEE900 0009079A 50169C46 8D4B6A0A 76FFF276 FFF476FF 000BE846 FÒ...v¶.v·.v.jK.F..P.....Õ/.úF$. 000000
76FF009C E9000005 FF9A5016 9C468D4B 6A0A76FF F276FFF4 76FF0018 E846C700 .úFÒ...v¶.v·.v.jK.F..P.....Õ...v 000020
E9037500 0030EA46 8900000A 289A0C76 FF0E76FF 0A6AF676 FFF876FF EE76FFF0 Þ.vŸ.v½.v-j..v..v..(....Fõ=..u.Õ 000040
76FE84E9 03750087 3D0063E9 012CE9EA 46880132 E9EA4688 0138E9EA 46880006 ...FõÕ8..FõÕ2..FõÕ,.Õc.=..u.ÕÇ±v 000060
7500813D FFA2E903 7500763D FE7DE903 7500733D FE71E903 75006E3D 0023E903 .Õ#.=n.u.Õq±=s.u.Õ}±=v.u.ÕÅ.=..u 000080
3DFEB8E9 03750009 3DFEE2E9 03750004 3DFEEAE9 037500CB 3DFFC7E9 FEB1E903 .ÕÝ±Õú.=ù.u.Õõ±=å.u.Õã±=1.u.Õ|±= 0000A0
7500CB0A 7E81FF94 E9FF45E9 037500F4 3DFF2BE9 037500E8 3DFF11E9 037500E6 Ì.u.Õ..=Ò.u.Õ+.=¶.u.ÕE.Õ...-.ù.u 0000C0
03750000 3D04C483 0593002A 9A50169C 4680004B E9037500 D40A7E81 0055E903 .ÕU..-.å.u.ÕK..F..P.*....á.=..u. 0000E0
0C76FF0E 76FFF676 FFF876FF E876FF50 169C468D EC76FFEE 76FFF076 FF0033E9 Õ3..vÞ.vŸ.vš.F..P.vÒ.v½.v-.v..v. 000100
03740004 0A7E8100 61E9006A E9EA4688 0006E903 7500003D EA468900 00FFFF9A ......Fõ=..u.Õ...FõÕj.Õa..-.å.t. 000120
3DEA4689 0000FFFF 9A0C76FF 0E76FF04 6AFC76FF FE76FFEE 76FFF076 FF002DE9 Õ-..vÞ.vŸ.v±.v•j..v..v.......Fõ= 000140
76FF036A FC76FFFE 76FFEE76 FFF076FF 002AE900 33E9EA46 880006E9 03750000 ..u.Õ...FõÕ3.Õ*..vÞ.vŸ.v±.v•j..v 000160
0000E9EA 46880006 E9EA4688 0006E903 7500003D EA468900 0009239A 0C76FF0E ..v..#....Fõ=..u.Õ...FõÕ...FõÕ.. 000180
3DEC4689 0000FFFF 9A0876FF 0A76FFD8 8E0753B8 1E565700 0060C8CB C95F5E1F .^_èùà'..WV.|S..Ä.v..v.......F$= 0001A0
EC468900 0007849A 5016FC46 8D0876FF 0A76FF01 1DE9EC46 880006E9 03750000 ..ū.Õ...F$Õ...v..v..F=.P......F$ 0001C0
46890000 07A59A50 16F8468D 0876FF0A 76FF00FC E9EC4688 0006E903 7500003D =..u.Õ...F$Õ•..v..v..F½.P.E....F 0001E0
```

```
Dump of file SATURN:[PCCOMMON.DUMP.DLL]DAATTRDF.TMP;1 on 18-APR-1990 10:39:32.72
File ID (535,11,0)   End of file block 82 / Allocated 84

Virtual block number 10 (0000000A), 512 (0200) bytes

 89000007 639A5016 F4468008 76FF0A76 FF000BE9 EC468800 06E90375 000030EC ‡=..u.Õ...F$ÕÜ..v..v..F¶.› ¢.... 000000
 46800A6A FC76FFFE 76FFF476 FFF676FF 008AE9EC 46880006 E9037500 0030EC46 F$=..u.Õ...F$Õα..v-.v¶.v±.v ·¹..F 000020
 FFF476FF F676FF00 91E9EC46 880006E9 03750000 3DEC4689 00000A55 9A5016EE Ÿ.P.U....F$=..u.Õ...F$Õ...v-.v¶. 000040
 006AE9EC 46880006 E9037500 0030EC46 890000FF FF9A5016 F24680EE 76FFF076 vÞ.vŸ.F·.P......F$=..u.Õ...F$Õj. 000060
 6A4B6A00 6A014368 0676FFF8 76FFFA76 FF005BE9 00008800 06E90374 01F27E83 .~·.t.Õ..¡..Õ[..v*.v½.v.hC.j.jKj 000080
 0000029C 9A5016A0 4680026A EE76FFF0 76FFF476 FFF676FF 0000087E 9A006A00 .j..~....v-.v¶.vÞ.vŸj..F..P..... 0000A0
 9A5016A0 46800676 FFF876FF FA76FF00 19E9EC46 880006E9 03750000 3DEC4689 .F$=..u.Õ...F$Õ...v*.v½.v..F..P. 0000C0
 FA46C7D8 8E0A7DB8 1E565700 008CC800 06CAC95F 5E1F0000 E9EC4688 0000FFFF .....F$Õ...^_èÒ..à¥..WV.¦)..ÄÚF* 0000E0
 EB9A5016 EE468014 76FF1676 FF000407 C7260E5E C4078926 12468806 5EC40000 ..á^..F.&..á¯.&ú....v..v..FŸ.P.§ 000100
 9A5016FC 46801476 FF1676FF 0405E9E4 46880006 E9037500 0030E446 8900000A ....Fõ=..u.Õ...FõÕ...v..v..F=.P. 000120
 5016F246 801476FF 1676FF03 E4E9E446 880006E9 03750000 3DE44689 00000AA9 `....Fõ=..u.Õ...FõÕÕ..v..v..F·.P 000140
 FFFE76FF EE76FFF0 76FF03C3 E9E44688 0006E903 7500003D E4468900 000ACA9A .Ò....Fõ=..u.Õ...FõÕü..vÞ.vŸ.v±. 000160
 FF039AE9 E4468800 06E90375 00003DE4 46890000 08149A50 16F6468D 0A6AFC76 v=j..F-.P......Fõ=..u.Õ...FõÕ... 000180
 9A501690 4680EE76 FFF076FF 000008C3 9A5016FF 4486804B 6A766AF2 76FFF476 v¶.v·jvjK..D..P.û....vÞ.vŸ.F..P. 0001A0
 09C6002A 9A5016FF 44868003 64E9E446 880006E9 03750000 3DE44689 0000FFFF .....Fõ=..u.Õ...FõÕd...D..P.*.6. 0001C0
 0EE90374 92563900 16E90374 904639F8 5688F646 880024E9 03740000 3004C483 .á.=..t.Õ$..F-.V½9F.t.Õ..9V.t.Õ. 0001E0

Dump of file SATURN:[PCCOMMON.DUMP.DLL]DAATTRDF.TMP;1 on 18-APR-1990 10:39:32.72
File ID (535,11,0)   End of file block 82 / Allocated 84

Virtual block number 11 (0000000B), 512 (0200) bytes

 96682B6A 019636FF 26000E06 8E006A00 6A032AE9 00008800 0307C726 0E5EC400 .á^.&ú...¡..Õ*.j.j...8.&.6..j+h. 000000
 E90375F8 56390008 E90374F6 46399256 8890468B 0000FFFF 9A0A76FF 0C76FF01 ..v..v.......F..V.9F-t.Õ..9V½u.Õ 000020
 00003DE4 46890000 0B8C9A50 1698468D 026AF676 FFF876FF EE76FFF0 76FF005B [..vÞ.vŸ.v½.v-j..F..P......Fõ=.. 000040
 003D08C4 830CAE00 009A5016 FF44868D 50169846 8D02CEE9 E4468800 06E90375 u.Õ...FõÕö..F..P..D..P...Õ..á.=. 000060
 F076FF02 9CE90000 B8000307 C7260E5E C4000EE9 02ADE9E4 46880009 E9037500 .u.Õ...FõÕÜ.Õ..á^.&ú...¡..Õ...vÞ 000080
 0006E903 7500003D E4468900 00FFFF9A 5016E646 80186A90 76FF9276 FFEE76FF .vŸ.v..v.j..Fl.P......Fõ=..u.Õ.. 0000A0
 26078826 945EC404 94468300 04E99656 89944689 E85688E6 46880273 E9E4468B .FõÕs..Fl.VÒ.F..V.Õ...F..á^.&..& 0000C0
 9A501698 4680026A 37FF2602 77FF2694 5EC4EE76 FFF076FF 01FFE903 7502470B .G.u.Õ...vÞ.vŸá^.&.w.&.7j..F..P. 0000E0
 00000E45 9AE676FF E876FFEE 76FFF076 FF0017E9 03750000 3DE44689 00000026 &....Fõ=..u.Õ...vÞ.vŸ.vÒ.vl.E... 000100
 A3E90374 00003008 C4830049 00009A50 16FF4486 80501698 46800213 E9E4468B .FõÕ...F..P..D..P...l..á.=..t.ÕÈ 000120
 E4468900 00FFFF9A 5016EA46 80156A37 FF260277 FF26945E C4EE76FF F076FF01 ..vÞ.vŸá^.&.w.&.7j..Fõ.P......Fõ 000140
 6A01BAE9 E4468800 000FC49A E676FFE8 76FFEE76 FFF076FF 0017E903 75000030 =..u.Õ...vÞ.vŸ.vÒ.vl.á....FõÕ¤.j 000160
 76FF0000 0EA59A50 520E788A 00008801 9668196A 019636FF 26000E06 8E006A00 .j...8.&.6..j.h..¡..¤x.RP.È....v 000180
 006A006A 0023E903 7500003D E4468900 00FFFF9A 5052FFFF BA0000B8 EE76FFF0 Þ.vŸ¡..¤..RP......Fõ=..u.Õ#.j.j. 0001A0
 FF015AE9 E4468800 000CF89A 0A76FF0C 76FF0196 68246A01 9636FF26 000E068E ..8.&.6..j$h...v..v..½....FõÕZ.. 0001C0
 00003DE4 46890000 FFFF9A0A 6AFC76FF FE76FF13 6A9076FF 9276FFEE 76FFF076 vÞ.vŸ.v..v.j..v±.v=j.......Fõ=.. 0001E0

Dump of file SATURN:[PCCOMMON.DUMP.DLL]DAATTRDF.TMP;1 on 18-APR-1990 10:39:32.72
File ID (535,11,0)   End of file block 82 / Allocated 84

Virtual block number 12 (0000000C), 512 (0200) bytes

 000F399A EE76FFF0 76FF0000 0F2E9A0A 76FF0C76 FF019668 E476FF00 22E90375 u.Õ"..vÕh...v..v.......vÞ.vŸ.9.. 000000
 6AFC76FF FE76FF15 6A37FF26 0277FF26 945EC4EE 76FFF076 FF0112E9 E4468800 ..FõÕ...vÞ.vŸá^.&.w.&.7j..v±.v=j 000020
 0F7B9A0A 76FF0C76 FF019668 E476FF00 22E90375 00003DE4 46890000 FFFF9A0A .......Fõ=..u.Õ"..vÕh...v..v..(. 000040
 76FFF076 FF00EC56 8301EA46 8300C6E9 E4468800 000F869A EE76FFF0 76FF0000 ...vÞ.vŸ......FõÕ6..Fõ..V&..vÞ.v 000060
 76FF0022 E9037500 0030E446 890000FF FF9A5016 EA468014 6AFC76FF FE76FFEE Ÿ.v±.v=j..Fõ.P......Fõ=..u.Õ"..v 000080
 0079E9E4 46880000 FFFF9AEE 76FFF076 FF0000FF FF9A0A76 FF0C76FF 019668E4 Õh...v..v........vÞ.vŸ......FõÕy. 0000A0
 01FA46C7 005DE9E4 46880006 E9037500 0030E446 890000FF FF9AEE76 FFF076FF .vÞ.vŸ......Fõ=..u.Õ...FõÕ].úF*. 0000C0
 32E90374 01FA7E83 0000FFFF 9AE676FF E876FFEE 76FFF076 FFFDEEE9 0003E900 .Õ..ÕŸ».vÞ.vŸ.vÒ.vl......~*.t.Õ2 0000E0
 1676FF00 000FF79A 00A16814 76FF1676 FF00000F E99A00A0 681476FF 1676FF00 ..v..v.h...Õ....v..v.hÅ..%....v. 000100
 0012CAC9 5F5E1F00 00E9E446 88000107 C7260E5E C4000007 1E9A009F 681476FF .v.h.......á^.&ú....FõÕ...^_èÒ.. 000120
 76FF0C76 FF0E76FF 1076FF12 76FF1476 FF1676FF D88E0BC9 B81E5657 000002C8 à...WV.¦è..Ä.v..v..v..v..v..¯v..v 000140
 30E9FE46 880006E9 03750000 30FE4689 0000FFFF 9A006A00 6A0676FF 0876FF0A ..v..v.j.j.......F±=..u.Õ...F±Õ0 000160
 1676FF00 0010779A 00A16814 76FF1676 FF000010 699A00A0 681476FF 1676FF00 ..v..v.h...i....v..v.hÅ..w....v. 000180
 B81E5657 000068C8 0012CAC9 5F5E1F00 00E90000 B800000F DB9A009F 681476FF .v.h...Ü...¡..Õ...^_èÒ..àh..WV.¡ 0001A0
 880006E9 03750000 3DE84689 00000BEF 9A5016EA 46800876 FF0A76FF D88E1018 ...Ä.v..v..Fõ.P.ÿ..¯.Fò=..u.Õ... 0001C0
 0006E903 75000030 E8468900 000C109A 5016FA46 800876FF 0A76FF01 75E9E846 FÒÕu..v..v..F*.P......Fò=..u.Õ.. 0001E0
```

```
Dump of file SATURN:[PCCOMMON.DUMP.DLL]DAATTRDF.TMP;1 on 18-APR-1990 10:39:32.72
File ID (535,11,0)   End of file block 82 / Allocated 84

Virtual block number 13 (0000000D), 512 (0200) bytes

 06E90375 00003DE8 46890000 0C319A50 16EE468D 0876FF0A 76FF0154 E9E84688 .FòõT..v..v..FŸ.P.1....Fò=..u.õ. 000000
 000011E9 9A006A00 6A486A00 6A014368 0676FFEE 76FFF076 FF0133E9 E8468800 ..Fòõ3..vþ.vŸ.v.hC.j.jKj.j..õ... 000020
 03750000 30E84689 00000081 9A5016F6 468D096A FA76FFFC 76FFEA76 FFEC76FF .v$.võ.v=.v*j..F-.P......Fò=..u. 000040
 26985EC4 04984683 0004E99A 56899846 89F85688 F6468800 F1E9E846 880006E9 õ...Fòõþ..F-.V½.F..V.õ...F..é^.& 000060
 F2468D03 6A37FF26 0277FF26 985EC4EA 76FFEC76 FF0088E9 03750247 08260788 ..&.G.u.õ|..v$.võé^.&.w.&.7j..F· 000080
 C99AF676 FFF876FF EA76FFEC 76FF0017 E9037500 003DE846 8900000C 5A9A5016 .P.Z....Fò=..u.õ...v$.võ.v½.v-.è 0000A0
 000D009A 50169C46 8D026AF2 76FFF476 FFEA76FF EC76FF00 91E9E846 88000011 ....Fòõ...v$.võ.v¶.v·j..F..P.Å.. 0000C0
 E8468800 0012209A F676FFF8 76FFEA76 FFEC76FF 0017E903 75000030 E8468900 ..Fò=..u.õ...v$.võ.v½.v-. ....Fò 0000E0
 FE468900 00120C9A 50169C46 8DFE6A00 6A016168 0676FFEE 76FFF076 FF0057E9 õW..vþ.vŸ.v.ha.j.j±.F..P......F± 000100
 00000B74 9A37FF26 0277FF26 985EC4FE 76FF006A 01696806 76FFEE76 FFF076FF .vþ.vŸ.v.hi.j..v±é^.&.w.&.7.t... 000120
 06CAC95F 5E1F0000 E9E84688 000000EC 9AF676FF F876FFEA 76FFEC76 FFFF35E9 õ5..v$.võ.v½.v-.$....Fòõ...^_èò. 000140
 0676FF08 76FF0A76 FF0000FE 46C70000 9846C7D8 8E109088 1E565700 006CC800 .àl..WV.¡...ÄúF...úF±...v..v..v. 000160
 76FF0A76 FF01FEE9 E6468800 06E90375 00003DE6 46890000 04459A50 1694468D .F..P.E....Fl=..u.õ...Flõ±..v..v 000180
 FF0A76FF 010DE9E6 46880006 E9037500 003DE646 89000010 A09A5016 E8468D08 ..Fò.P......Fl=..u.õ...Flõï..v.. 0001A0
 0A76FF01 8CE9E646 880006E9 03750000 3DE64689 000010C1 9A5016FA 46800876 v..F*.P.è....Fl=..u.õ...FlõŸ..v. 0001C0
 76FF019B E9E64688 0006E903 75000030 E6468900 00040C9A 5016F046 800876FF .v..Fþ.P......Fl=..u.õ...Flõ...v 0001E0

Dump of file SATURN:[PCCOMMON.DUMP.DLL]DAATTRDF.TMP;1 on 18-APR-1990 10:39:32.72
File ID (535,11,0)   End of file block 82 / Allocated 84

Virtual block number 14 (0000000E), 512 (0200) bytes

 FF017AE9 E6468800 06E90375 00003DE6 46890000 06C09A50 16F2468D 0876FF0A ..v..F·.P.å....Fl=..u.õ...Flõz.. 000000
 0159E9E6 46880006 E9037500 003DE646 89000010 E29A5016 EC468D08 76FF0A76 v..v..F$.P.ã....Fl=..u.õ...FlõŸ. 000020
 68EC76FF EE76FF00 00133E9A 006A006A 486A006A 01436800 D068EC76 FFEE76FF .vŸ.v$hÅ.hC.j.jKj.j..>....vŸ.v$h 000040
 76FFFC76 FFF076FF E876FFEA 76FF0000 110C9A00 6A006A05 6A006A01 436800CE õ.hC.j.j.j.j.......võ.vò.vþ.v=.v 000060
 E6468800 06E90375 000030E6 46890000 FFFF9A50 16F6468D 50169846 8D1E6AFA *j..F..P.F-.P......Fl=..u.õ...Fl 000080
 0372FE46 39984688 FE46FF00 03E90000 FE46C718 47892698 4688F25E C400F6E9 õ-.é^·.F.&.G.úF±..õ...F±.F.9F±r. 0000A0
 00FFFF9A 50169A46 8D30FF26 0270FF26 F676C40C FE5E68E8 76FFEA76 FF0000E9 õÅ..võ.vòk^±.év-&.p.&.0.F..P.... 0000C0
 40082604 408826F6 5EC40CFE 766800A7 E9E64688 0006E903 75000030 E6468900 ..Fl=..u.õ...FlõI.kv±.é^-&.ə.&.ə 0000E0
 0870FF26 F65EC40C FE7668FE 76FF9476 FF9676FF EC76FFEE 76FF0046 E9037406 .t.õF..vŸ.v$.v..v..v±kv±.é^-&.p. 000100
 03750000 30E64689 0000144B 9A30FF26 0270FF26 F676C40C FE5E6850 169A468D .F..Pk^±.év-&.p.&.0.K....Fl=..u. 000120
 C40CFE76 68FE76FF 9476FF96 76FFEC76 FFEE76FF 0044E900 50E9E646 880006E9 õ...FlõP.õõ..vŸ.v$.v..v..v±kv±.é 000140
 890000FF FF9A0470 FF260670 FF26F65E C40CFE76 6850169A 46800870 FF26F65E ^-&.p..F..Pkv±.é^-&.p.&.p....... 000160
 0006CAC9 5F5E1F00 00E9E646 88FF22E9 0009E9E6 46880006 E9037500 003DE646 Fl=..u.õ...Flõ..õ"..Flõ...^_èò.. 000180
 260000B8 185EC407 89260247 89260000 B81C5EC4 D88E1239 B81E5657 000002C8 à...WV.¡9..Äé^.¡..&.G.&..é^.¡..& 0001A0
 FF0876FF 0069E903 75000030 04C4830E 04002A9A 0E76FF10 76FF0789 26024789 .G.&...v..v..*....é.=..u.õi..v.. 0001C0
 1C76FF1E 76FF0E76 FF1076FF 1876FF1A 76FF1276 FF1476FF 0A76FF0C 76FF0676 v..v..v..v..v..v..v..v..v..v..v. 0001E0

Dump of file SATURN:[PCCOMMON.DUMP.DLL]DAATTRDF.TMP;1 on 18-APR-1990 10:39:32.72
File ID (535,11,0)   End of file block 82 / Allocated 84

Virtual block number 15 (0000000F), 512 (0200) bytes

 5EC40676 FF0876FF 0033E9FE 46880006 E9037500 0030FE46 890000FF FF9A006A j.......F±*..u.õ...F±õ3..v..v.é^ 000000
 880006E9 03750000 30FE4689 00000F5F 9A501616 4680026A 37FF2602 77FF261C .&.w.&.7j..F..P._....F±*..u.õ... 000020
 00FA46C7 D88E1478 881E5657 000012C8 CBC95F5E 1F0000E9 FE468800 06E9FE46 F±õ...F±õ...^_èuã...WV.¡x..ÄúF*. 000040
 46890000 11249A50 16F6468D 086A0A76 FF0C76FF 0676FF08 76FF0000 F446C700 .úF¶...v..v..v̄..v.j..F-.P.$....F 000060
 46830004 E9F05689 EE4689F8 5688F646 880129E9 F2468800 06E90375 00003DF2 ·*..u.õ...F·õ)..F-.V½.FŸ.Vþõ...F 000080
 FF260277 FF26EE5E C40676FF 0876FF00 F0E90375 02470826 078826EE 5EC404EE Ÿ.é^Ÿ&..&.G.u.õþ..v..v.é^Ÿ&.w.&. 0000A0
 76FF0676 FF0876FF 0017E903 75000030 F2468900 0011739A 5016FC46 80046A37 7j..F=.P.s....F·*..u.õ...v..v..v 0000C0
 6A37FF26 0277FF26 EE5EC406 76FF0876 FF00C9E9 F2468800 0015F39A F676FFF8 ½.v-.µ....F·õè..v..v.é^Ÿ&.w.&.7j 0000E0
 FFF876FF 0676FF08 76FF0017 E9037500 003DF246 89000011 AD9A5016 F4468D02 ..F¶.P.Ù....F·*..u.õ...v..v..v½. 000100
 46391056 880E4688 0066E903 73F44639 12468800 88E9F246 88000016 649AF676 v-.d....F·õ...F.9F¶s.õf..F..V.9F 000120
 F44EFF00 03E9F446 FF0006E9 03740114 7E830050 E90375FE 56390008 E90374FC *t.õ..9V±u.õP..-..t.õ...F¶õ...N¶ 000140
 30F24689 00001500 9A5016F4 4680026A 37FF2602 77FF26EE 5EC40676 FF0876FF .v..v.é^Ÿ&.w.&.7j..F¶.P......F·= 000160
 FDE9001A E9F24688 0000167E 9AF676FF F876FF06 76FF0876 FF0017E9 03750000 ..u.õ...v..v..v½.v-.-....F·õ..õ» 000180
 000EC8C8 C95F5E1F 0000E9F2 46880000 118F9AF6 76FFF876 FF0676FF 0876FFFE ±.v..v..v½.v-......F·õ...^_èuà.. 0001A0
 00154A9A 5016FC46 80086A0E 76FF1076 FF0676FF 0876FFD8 8E152888 1E565700 .WV.¡(..Ä.v..v..v..v.j..F=.P.J.. 0001C0
 F24689FE 5688FC46 880002F8 46C70101 E9F64688 0006E903 75000030 F6468900 ..F-*..u.õ...F-õ..úF½...F=.V±.F· 0001E0
```

Dump of file SATURN:[PCCOMMON.DUMP.DLL]DAATTRDF.TMP;1 on 18-APR-1990 10:39:32.72
File ID (535,11,0)   End of file block 82 / Allocated 84

Virtual block number 16 (00000010), 512 (0200) bytes

```
C40676FF 0876FF00 C3E90375 02470826 078826F2 5EC404F2 46830004 E9F45689 .V¶Ö...F·.á^·&..&.G.u.Õú..v..v.á 000000
17E90375 000030F6 46890000 15D79A50 16FA468D F876FF37 FF260277 FF26F25E ^·&.w.&.7.v½.F*.P.■....F-=..u.Õ. 000020
0373FA46 390A4688 009BE9F6 46880000 179F9AFC 76FFFE76 FF0676FF 0876FF00 ..v..v..v±.v■......F-Õ...F.9F*s. 000040
260009E9 03740739 26145688 124688F2 5EC4006B E90376FA 46390C46 880076E9 Õv..F.9F*v.Õk.á^·.F..V.&9.t.Õ..& 000060
0676FF08 76FFFA4E FF0003E9 FA46FF00 06E90374 01167E83 0051E903 75025739 9W.u.ÕQ..~..t.Õ...F*Õ...N*.v..v. 000080
E9037500 003DF646 89000016 489A5016 FA468DF8 76FF37FF 260277FF 26F25EC4 á^·&.w.&.7.v½.F*.P.H....F-=..u.Õ 0000A0
FF0876FF FF2AE900 1AE9F646 88000017 B99AFC76 FFFE76FF 0676FF08 76FF0017 ...v..v..v±.v•.¿....F-Õ..Õ*..v.. 0000C0
B81E5657 000004C8 CBC95F5E 1F0000E9 F6468800 0015B59A FC76FFFE 76FF0676 v..v±.v•.ç....F-Õ...^_èùàå..WV.¡ 0000E0
4689EC46 890000B8 0000CE46 C70000CC 46C70000 E446C700 00FE46C7 D88E1695 ...ÄúF±..úFõ..úFä..úFõ..¡...F§.F 000100
5016FF2C 86801276 FF1476FF 1676FF00 D007C726 065EC400 0407C726 0E5EC4EA õá^.&ú...á^.&ú.Å..v..v..v.....,..P 000120
68216A01 9636FF26 00DE068E 006A006A 0023E903 75000030 D0468900 0012569A .V....FÅ=..u.Õ#.j.j...8.&.6..jlh 000140
779A5016 DC468D14 76FF1676 FF06E5E9 D0468800 0018779A 0A76FF0C 76FF0196 ...v..v..w....FÅÕÍ..v..v..FÉ.P.w 000160
01966821 6A019636 FF26000E 068E006A 006A0023 E9037500 003D0046 89000012 ....FÅ=..u.Õ#.j.j...8.&.6..jlh.. 000180
12989A50 16FF7C86 8D1476FF 1676FF06 A7E90046 88000018 B69A0A76 FF0C76FF .v..v..Ñ....FÅÕÍ..v..v...|..P... 0001A0
FF019668 216A0196 36FF2600 DE068E00 6A006A00 23E90375 00003D00 46890000 ...FÅ=..u.Õ#.j.j...8.&.6..jlh... 0001C0
0A6AFF7C B6FFFF7E B6FFDC76 FFDE76FF 0668E900 46880000 191F9A0A 76FF0C76 v..v.......FÅÕh..v8.vÉ.Ñ-..Ñ|.j. 0001E0
```

Dump of file SATURN:[PCCOMMON.DUMP.DLL]DAATTRDF.TMP;1 on 18-APR-1990 10:39:32.72
File ID (535,11,0)   End of file block 82 / Allocated 84

Virtual block number 17 (00000011), 512 (0200) bytes

```
76FF1676 FF0630E9 D0468800 06E90375 00003D00 46890000 15999A50 16F6468D .F-.P......FÅ=..u.Õ...FÅÕ=..v..v 000000
FF26000E 068E006A 006A0023 E9037500 003D0046 89000012 F89A5016 E0468D14 ..FÅ.P.«....FÅ=..u.Õ#.j.j...8.&. 000020
8D1476FF 1676FF05 FFE9D046 88000019 EC9A0A76 FF0C76FF 01966821 6A019636 6..jlh...v..v..š....FÅÕ...v..v.. 000040
E076FFE2 76FF05DE E9D04688 0006E903 75000030 D0468900 0012DA9A 5016E646 F].P.Õ....FÅ=..u.Õ...FÅÕ8..vã.vÅ 000060
50160646 8D4B6A00 CE68E076 FFE276FF 00001971 9A5016FF 3086804B 6A000068 hÅ.jK..0..P.q....vã.vÅhö.jK.Fø.P 000080
7F8326E6 5EC40032 E9037400 003D04C4 83149F00 2A9A5016 D6468D00 000C809A ......Fø.P.*....á.*..t.Õ2.á^Í&.. 0000A0
C4CC4689 48184788 26E65EC4 000BE9CC 46891847 8826E65E C40000E9 03740018 ..t.Õ..á^Í&.G..FäÕ..á^Í&.G.H.Fäá 0000C0
03740000 3D0000FF FF9A5016 EA468D50 1606468D 00A3E9E4 46891847 8826E65E ^Í&.G..FÕÕE..Fø.P.Fõ.P.....*..t. 0000E0
00001A7A 9A0A76FF 0C76FF01 9668236A 019636FF 26000E06 8E006A00 6A0023E9 Õ#.j.j...8.&.6..j#h...v..v..z... 000100
E9037400 187F8326 E65EC400 32E90372 18473926 EA468 8E6 5EC40532 E90000B8 |..Õ2.á^Í.Fõ&9G.r.Õ2.á^Í&....t.Õ 000120
47882 6E6 5EC4CC46 89481847 8826E65E C4000BE9 CC468918 47882 6E6 5EC40000 ..á^Í&.G..FäÕ..á^Í&.G.H.Fäá^Í&.G 000140
89CC4689 00008800 0CE90374 00EC7E83 0015E903 7401EA7E 830028E9 E4468918 ..FõÕ(..~õ.t.Õ...~š.t.Õ..|...Fä. 000160
9668196A 019636FF 2600DE06 8E006A00 6ACC4689 E4468948 EA468800 0AE9E446 FõÕ...FõH.Fõ.Fäj.j...8.&.6..j.h. 000180
000E7D9A 50520E65 BA0000B8 DC76FFDE 76FF0000 1AB59A50 521A888A 0000B801 .|..¤..RP.ç....v8.vÉ|..¤e.RP.).. 0001A0
76FF0196 68246A01 9636FF26 00DE068E 006A006A 0023E903 75000030 D0468900 ..FÅ=..u.Õ#.j.j...8.&.6..j$h...v 0001C0
F2468D50 16EE468D 01DBE903 7400E47E 830469E9 D0468800 001B1A9A 0A76FF0C ..v.......FÅÕi..~õ.t.ÕÜ..FŸ.P.F· 0001E0
```

Dump of file SATURN:[PCCOMMON.DUMP.DLL]DAATTRDF.TMP;1 on 18-APR-1990 10:39:32.72
File ID (535,11,0)   End of file block 82 / Allocated 84

Virtual block number 18 (00000012), 512 (0200) bytes

```
709ADC76 FFDE76FF F676FFF8 76FF5016 FF30868D FF7CB6FF FF7EB6FF 016A5016 .Pj..Ñ-..Ñ|...0..P.v½.v-.v8.vÉ.p 000000
256A0196 36FF2600 DE068E00 6A006A00 2EE90375 00003D00 46891AC4 83063114 .1..á..FÅ=..u.Õ..j.j...8.&.6..j% 000020
C403F9E9 D0468800 000EED9A DC76FFDE 76FF0000 0E6A9A0A 76FF0C76 FF019668 h...v..v..j....v8.vÉ.Ù....FÅÕ*.á 000040
FE468DCC 76FFFF2C B6FFFF2E B6FFE076 FFE276FF 0106E903 7500187F 8326E65E ^Í&....u.Õ...vã.vÅ.Ñ...Ñ,..vä.F± 000060
006A006A 002EE903 75000030 D0468900 001CC49A 5016FA46 8D50168D 468D5016 .P.F..P.F*.P.á....FÅ=..u.Õ..j.j. 000080
9ADC76FF DE76FF00 001BD69A 0A76FF0C 76FF0196 68226A01 9636FF26 00DE068E ..8.&.6..j"h...v..v..ø....v8.vÉ. 0000A0
1D159A50 16D2468D 036AFA76 FFFC76FF DC76FFDE 76FF038E E9D0468B 00001BE1 Å....FÅÕ...v8.vÉ.v■.v*j..Fø.P... 0000C0
FF019668 226A0196 36FF2600 DE068E00 6A006A00 2EE90375 00003D00 46890000 ...FÅ=..u.Õ..j.j...8.&.6..j"h... 0000E0
FF016A01 6A033DE9 D0468800 001C389A DC76FFDE 76FF0000 1C2D9A0A 76FF0C76 v..v..-....v8.vÉ.8....FÅÕ=.j.j.. 000100
7500003D D0468910 C4831DD9 15209ADC 76FFDE76 FFD276FF D476FFF2 76FFF476 v¶.v·.vå.vø.v8.vÉ. .1..á..FÅ=..u 000120
001C889A 0A76FF0C 76FF0196 68266A01 9636FF26 000E068E 006A006A 002EE903 .Õ..j.j...8.&.6..j&h...v..v..... 000140
FF2CB6FF FF2EB6FF E076FFE2 76FF02E6 E9D0468B 00001C96 9ADC76FF DE76FF00 ..v8.vÉ......FÅÕÍ..vã.vÅ.Ñ...Ñ,. 000160
E9037500 003D0046 8900001E 909AEE76 FFF076FF 5016FF30 868DFE76 FFE476FF .võ.v±..0..P.vÞ.vŸ......FÅ=..u.Õ 000180
FF00001C EC9A0A76 FF0C76FF 01966827 6A019636 FF26000E 068E006A 006A002E ..j.j...8.&.6..j'h...v..v..š.... 0001A0
2CB6FFFF 2EB6FFE0 76FFE276 FF022AE9 0288E900 46880000 1CF79ADC 76FFDE76 v8.vÉ.¥....FÅÕ..Õ*..vã.vÅ Ñ...Ñ, 0001C0
03750000 3D004689 0000FFFF 9A5016FA 46805016 80468050 16FE468D CC76FFFF ..vä.F±.P.F..P.F*.P......F.*..u. 0001E0
```

Dump of file SATURN:[PCCOMMON.DUMP.DLL]DAATTRDF.TMP;1 on 18-APR-1990 10:39:32.72
File ID (535,11,0)   End of file block 82 / Allocated 84

Virtual block number 19 (00000013), 512 (0200) bytes

```
00001D3D 9A0A76FF 0C76FF01 9668216A 019636FF 26000E06 8E006A00 6A002EE9 Õ..j.j...8.&.6..jlh...v..v..=... 000000
8D036AFA 76FFFC76 FFDC76FF DE76FF02 27E90046 8800001D 489ADC76 FFDE76FF .v8.vÉ.H....FÅÕ'..v8.vÉ.v=.v'j.. 000020
9636FF26 00DE068E 006A006A 002EE903 7500003D D0468900 0018D69A 50160246 F6.P.ø....FÅ=..u.Õ..j.j...8.&.6. 000040
E9D0468B 00001D99 9ADC76FF DE76FF00 001D8E9A 0A76FF0C 76FF0196 68226A01 .j"h...v..v.......v8.vÉ......FÅÕ 000060
00003DD0 46890000 17029A50 16CE468D 026AFA76 FFFC76FF DC76FFDE 76FF01D6 ø..v8.vÉ.v=.v'j..Fö.P......FÅ=.. 000080
1E029A0A 76FF0C76 FF019668 226A0196 36FF2600 DE068E00 6A006A00 2EE90375 u.Õ..j.j...8.&.6..j"h...v..v.... 0000A0
46FF0003 E90375CC 4639E446 880185E9 D0468800 001E009A DC76FFDE 76FF0000 ...v8.vÉ......FÅÕ...F09Fäu.Õ...F 0000C0
F676FFF8 76FF5016 FF30868D D276FFD4 76FFCE76 FF5016F2 46805016 EE468DCE ö.FŸ.P.F·.P.vö.vå.v6..0..P.v½.v- 0000E0
DE068E00 6A006A00 2EE90375 00003DD0 46891AC4 831E3114 709ADC76 FFDE76FF .v8.vÉ.p.1..6..FÅ=..u.Õ..j.j...8 000100
001E659A DC76FFDE 76FF0000 1E5A9A0A 76FF0C76 FF019668 256A0196 36FF2600 .&.6..jXh...v..v..Z....v8.vÉ.e.. 000120
209ADC76 FFDE76FF D276FF04 76FFF276 FFF476FF CE76FF01 6A0111E9 D0468800 ..FÅÕ..j..vö.v¶.v·.vå.v6.v8.vÉ. 000140
266A0196 36FF2600 DE068E00 6A006A00 2EE90375 00003DD0 468910C4 831AF115 .þ..6..FÅ=..u.Õ..j.j...8.&.6..j& 000160
FF0089E9 D0468800 001EC39A DC76FFDE 76FF0000 1E889A0A 76FF0C76 FF019668 h...v..v..j....v8.vÉ.û....FÅÕ¿.. 000180
9AEE76FF F076FF50 16FF3086 8DFE76FF E476FFFF 2CB6FFFF 2EB6FFE0 76FFE276 vã.vÅ.Ñ...Ñ,..vÕ.v±..0..P.vþ.vŸ. 0001A0
9668276A 019636FF 26000E06 8E006A00 6A002EE9 03750000 3D004689 00001404 .....FÅ=..u.Õ..j.j...8.&.6..j'h. 0001C0
DE76FF00 58E90046 8800001B 259ADC76 FFDE76FF 00001839 9A0A76FF 0C76FF01 ..v..v..9....v8.vÉ.X....FÅÕ[..v8 0001E0
```

Dump of file SATURN:[PCCOMMON.DUMP.DLL]DAATTRDF.TMP;1 on 18-APR-1990 10:39:32.72
File ID (535,11,0)   End of file block 82 / Allocated 84

Virtual block number 20 (00000014), 512 (0200) bytes

```
1847FF26 E65EC400 3FE9D046 880006E9 03750000 3D004689 00000F97 9ADC76FF .vÉ......FÅ=..u.Õ...FÅÕ7.6^Ì&.G. 000000
9A00A168 1476FF16 76FF0000 1F109A00 A0681476 FF1676FF 000307C7 260E5EC4 6^.&ú....v..v.h........v..v.hÅ.. 000020
C80012CA C95F5E1F 0000E900 46880000 10589A00 9F681476 FF1676FF 00001F1E .....v..v.h...[....FÅÕ...^_èò..à 000040
C70000E4 46C70000 F246C700 00E246C7 0000FE46 C7D88E17 D0B81E56 57000008 Ä..WV.¡Å..ÄúF±..úFã..úF·..ũFö..ú 000060
1676FF00 D007C726 065EC400 0407C726 0E5EC4EA 4689EC46 890000B8 0000C846 Fà..|...F&.Fõ6^.&ú...6^.&ú.Ä..v. 000080
E9CE468B 0006E903 7500003D CE468900 0018119A 5016FF28 868D1276 FF1476FF .v..v...(..P......Fö=..u.Ñ...FöÕ 0000A0
CE468800 06E90375 00003DCE 46890000 184F9A50 160A4680 1476FF16 76FF094F O..v..v..FÖ.P.O....Fö=..u.ℷ...Fö 0000C0
46880006 E9037500 003DCE46 89000018 F79A5016 DE468D14 76FF1676 FF092EE9 Õ...v..v..F8.P.%....Fö=..u \...F 0000E0
880006E9 03750000 3DCE4689 00001935 9A5016E6 46801476 FF1676FF 090DE9CE öÕ...v..v..FÌ.P.5....Fö=..u.υ... 000100
46890000 20279A00 6A006A00 6A006A01 65680004 68DE76FF E076FF08 ECE9CE46 FöÕ$..vÅ.v8hå.he.j.j.j.j..' ...F 000120
5689F646 89000013 259A006A 006AF476 FF006A01 6A680004 68DE76FF E076FFF4 ¶.vÅ.v8hå.hj.j..v¶j.j..X....F-.V 000140
00CE680E 76FFE076 FF000020 589A5016 FF2C868D 486A0000 68DE76FF E076FFF8 ½.vÅ.v8hÅ.jK....P.X ...vÅ.v8hö. 000160
03740000 3D000019 C79A5016 EA468D50 16D0468D 0000195C 9A501600 46804B6A jK.FÅ.P.\....FÅ.P.Fõ.P.ú...=..t. 000180
3B0008E9 0373001A E90376EC 5638D228 18478826 E65EC408 68E90000 880006E9 Õ..|..Õh.6^Ì&.G.+0;Všv.Õ..s.Õ..; 0001A0
4688E65E C4E24689 48EA4688 0007E9E2 46891847 8826E65E C4000DE9 0372EA46 Fõr.Õ..6^Ì&.G..FäÕ...FõH.Fä6^Ì.F 0001C0
FE468D50 48E24688 FF2886FF FF2AB6FF DE76FFE0 76FF003C E9037418 473926E2 ã&9G.t.Õ<..vÅ.v8.Ñ*..Ñ(..FäHP.F± 0001E0
```

Dump of file SATURN:[PCCOMMON.DUMP.DLL]DAATTRDF.TMP;1 on 18-APR-1990 10:39:32.72
File ID (535,11,0)   End of file block 82 / Allocated 84

Virtual block number 21 (00000015), 512 (0200) bytes

```
CE468800 06E90375 000030CE 46890000 21189A50 16FA4680 5016FF78 86805016 .P..x..P.F'.P..!...Fö=..u.Õ...Fö 000000
FF78868D 5016FE46 8DE276FF FF2886FF FF2AB6FF DE76FFE0 76FF0037 E907EEE9 ÕY.Õ7..vÅ.v8.Ñ*..Ñ(..vã.F±.P..x. 000020
FA468807 B4E9CE46 880006E9 03750000 30CE4689 0000185D 9A5016FA 46805016 .P.F'.P.]....Fö=..u.Õ...FöÕÇ..F' 000040
9A5016FF 2C868D50 16FF7886 8D017CE9 0374F856 390184E9 0374F646 39FC568B .V=9F-t.Õ..9V½t.Õ|...x..P..,..P. 000060
014FE907 74E9CE46 88000307 C7260E5E C40011E9 03740000 3D08C483 197D0000 ..)..6.=..t.Õ..6^.&ú....FöÕt.ÕO. 000080
03750000 3DCE4689 00001BAE 9A5016C4 4680046A F676FFF8 76FFDA76 FFDC76FF .vÉ.vÕ.v½.v-j..F6.P.Õ....Fö=..u. 0000A0
C2BA0000 88019668 1A6A0196 36FF2600 DE068E00 6A006A07 48E9CE46 880006E9 Õ...FöÕH.j.j...8.&.6..j.h..|..¤ö 0000C0
003DCE46 8900001A 809A5052 1A75BA00 0088DA76 FFDC76FF 00001885 9A505221 !RP......vÉ.vÕ|..¤u.RP......Fö=. 0000E0
5016FF2C 868D026A C476FFC6 76FFDA76 FFDC76FF 0705E9CE 46880006 E9037500 .u.Õ...FöÕ...vÉ.vÕ.v6.vå j...,..P 000100
000EE29A 0A76FF0C 76FF0196 68CE76FF 0022E903 75000030 CE468900 0017839A ......Fö=..u.Õ"..vöh...v..v..ã.. 000120
FF2886FF FF2AB6FF DE76FFE0 76FF068F E9CE4688 0000224A 9ADA76FF DC76FF00 ..vÉ.vÕ.J"...FöÕ¢..vÅ.v8.Ñ*..Ñ(. 000140
46880000 22889ADA 76FFDC76 FF0011E9 03750000 30CE4689 0000FFFF 9AF476FF .v¶......Fö=..u.Õ...vÉ.vÕ.."...F 000160
76FF5016 FF2C868D FE76FFE2 76FFFF28 B6FFFF2A B6FFDE76 FFE076FF 068DE9CE öÕ...vÅ.v8.Ñ*..Ñ(..vã.v±..,..P.v 000180
8800001B 909ADA76 FFDC76FF 0011E903 75000030 CE468900 001C639A F676FFF8 ½.v-.c....Fö=..u.Õ...vÉ.vÕ...... 0001A0
30E9CE46 880006E9 03750000 3DCE4689 00001ED4 9ADA76FF DC76FF06 4CE9CE46 FöÕL..vÉ.vÕ.å....Fö=..u.Õ...FöÕO 0001C0
D6468003 6AF676FF F876FFDA 76FFDC76 FF0622E9 CE468800 0307C726 0E5EC406 .6^.&ú....FöÕ"..vÉ.vÕ.v½.v-j..Fø 0001E0
```

Dump of file SATURN:[PCCOMMON.DUMP.DLL]DAATTRDF.TMP;1 on 18-APR-1990 10:39:32.72
File ID (535,11,0) End of file block 82 / Allocated 84

Virtual block number 22 (00000016), 512 (0200) bytes

```
76FFDA76 FFDC76FF 05F9E9CE 46880006 E9037500 0030CE46 89000023 259A5016 .P.%#...Fö=..u.Õ...Föõ'..vÉ.vÕ.v 000000
D0E9CE46 880006E9 03750000 30CE4689 0000234F 9A5016F2 4680026A F676FFF8 %.v-j..F·.P.O#...Fö=..u.Õ...FöÕÀ 000020
75000030 CE468900 0023789A 5016C446 8D046AF6 76FFF876 FFDA76FF DC76FF05 ..vÉ.vÕ.v%.v-j..F6.P.x#...Fö=..u 000040
A19A5016 FF788680 026AC476 FFC676FF DA76FFDC 76FF05A7 E9CE4688 0006E903 .Õ...FöõI..vÉ.vÕ.v6.v6j...x..P.À 000060
FA76FFFC 76FFDA76 FFDC76FF 057DE9CE 46880006 E9037500 0030CE46 89000023 #...Fö=..u.Õ...FöÕ)..vÉ.vÕ.v•.v' 000080
DC76FF05 54E9CE46 880006E9 03750000 30CE4689 00002184 9A5016CA 4680036A j..Fò.P..!...Fö=..u.Õ...FöÕT..vÉ 0000A0
0006E903 7500030D CE468900 0010669A 5016E446 8D026AFA 76FFFC76 FFDA76FF .vÕ.v•.v'j..FÕ.P.f....Fö=..u.Õ.. 0000C0
006A006A 0023E903 74CC5639 002BE903 74CA4639 C6568BC4 4688052B E9CE4688 .Föõ+..F6.V69Fòt.Õ+.9Vät.Õ#.j.j. 0000E0
8804F2E9 CE468800 0024209A 0A76FF0C 76FF0196 682A6A01 9636FF26 000E068E ..B.&.6..j*h...v..v.. $...FöÕ·.. 000100
36FF2600 DE068E00 6A006A02 28E90374 D8563902 30E90374 D64639CC 5688CA46 Fò.Vä9Føt.Õ0.9VÄt.Õ(.j.j...B.&.6 000120
26438A00 0088DA76 FFDC76FF 00002648 9A505224 2EBA0000 B8019668 1A6A0196 ..j.h..|..α.$RP.H&...vÉ.vÕ|..¤C& 000140
76FFDA76 FFDC76FF 0499E9CE 46880006 E9037500 0030CE46 89000026 5B9A5052 RP.[&...Fö=..u.Õ...FöÕ...vÉ.vÕ.v 000160
9668CE76 FF0022E9 03750000 30CE4689 0000256A 9A5016E4 4680026A F676FFF8 %.v-j..FÕ.P.j%...Fö=..u.Õ"..vöh. 000180
E4468804 54E9CE46 88000024 DD9ADA76 FFDC76FF 000024D2 9A0A76FF 0C76FF01 ..v..v..Ø$...vÉ.vÕ.Ï$...FöÕT..FÕ 0001A0
FFDC76FF E476FFF2 76FFD676 FFD876FF F676FFF8 76FF016A 0052E903 77F24639 9F·w.ÕR.j..v%.v-.vÄ.vø.v·.vÕ.vÉ. 0001C0
76FF0C76 FF019668 CE76FF00 22E90375 000030CE 468912C4 83250716 8D9ADA76 vÕ....%.6..Fö=..u.Õ"..vöh...v..v 0001E0
```

Dump of file SATURN:[PCCOMMON.DUMP.DLL]DAATTRDF.TMP;1 on 18-APR-1990 10:39:32.72
File ID (535,11,0) End of file block 82 / Allocated 84

Virtual block number 23 (00000017), 512 (0200) bytes

```
FFF876FF 006A004F E903FAE9 CE468800 00252F9A DA76FFDC 76FF0000 25249A0A ..$%...vÉ.vÕ./%...FöÕ'.ÕO.j..v%. 000000
30CE4689 12C4831C 041680 9A DA76FFDC 76FFF276 FFE476FF D676FFD8 76FFF676 v-.vÄ.vø.vÕ.v·.vÉ.vÕ......6..Fö= 000020
919ADA76 FFDC76FF 00002586 9A0A76FF 0C76FF01 9668CE76 FF0022E9 03750000 ..u.Õ"..vöh...v..v...%...vÉ.vÕ.. 000040
00003D08 C4832152 00009A50 16FF2C86 8D5016FF 78868D03 A8E9CE46 8B000025 %...FöÕ´...x..P.....P...R!.6.=.. 000060
46890000 21F19A50 16FF2C86 8D026AC4 76FFC676 FFDA76FF DC76FF00 46E90375 u.ÕF..vÉ.vÕ.v6.v6j.......P.þl...F 000080
DA76FFDC 76FF0000 22D09A0A 76FF0C76 FF019668 CE76FF00 22E90375 00003DCE ö=..u.Õ"..vöh...v..v...."...vÉ.vÕ 0000A0
0022349A F476FFFF 2886FFFF 2AB6FFDE 76FFE076 FF0346E9 CE468800 0025C39A .ú%...FöÕF..vÄ.vB.Ñ*..Ñ(..v¶.4". 0000C0
E076FF03 14E9CE46 88000026 049ADA76 FFDC76FF 0011E903 7500030D CE468900 ..Fö=..u.Õ...vÉ.vÕ..&...FöÕ...vÄ 0000E0
22759AF6 76FFF876 FF5016FF 2C868DFE 76FFE276 FFFF2886 FFFF2AB6 FFDE76FF .vB.Ñ*..Ñ(..vä.v±.....P.v%.v-.u" 000100
76FF0203 E9CE4688 00002218 9ADA76FF DC76FF00 11E90375 00003DCE 46890000 ...Fö=..u.Õ...vÉ.vÕ.."...FöÕÆ..v 000120
6A006A02 7CE902B7 E9CE4688 0006E903 7500030D CE468900 00229C9A DA76FFDC É.vÕ.."...Fö=..u.Õ...FöÕñ.Õ|.j.j 000140
FFDC76FF 00002184 9A505226 568A0000 B8019668 1A6A0196 36FF2600 DE068E00 ...B.&.6..j.h..|..¤V&RP.Ç!...vÉ. 000160
0271E9CE 46880006 E9037500 0030CE46 89000021 C79A5052 21AFBA00 0088DA76 vÕ|..¤E!RP.ú!...Fö=..u.Õ...FöÕq. 000180
7500030D CE468900 00FFFF9A 5016FF2C 868D026A C476FFC6 76FFDA76 FFDC76FF .vÉ.vÕ.v6.v6j.......P......Fö=..u 0001A0
00002483 9ADA76FF DC76FF00 0024789A 0A76FF0C 76FF0196 68CE76FF 0022E903 .Õ"..vöh...v..v..x$...vÉ.vÕ..$.. 0001C0
15209ADA 76FFDC76 FFD676FF D876FFC4 76FFC676 FFF276FF 006A022B E9CE4688 .FöÕ+.j..v·.v6.v6.vÄ.vø.vÉ.vÕ. . 0001E0
```

Dump of file SATURN:[PCCOMMON.DUMP.DLL]DAATTRDF.TMP;1 on 18-APR-1990 10:39:32.72
File ID (535,11,0) End of file block 82 / Allocated 84

Virtual block number 24 (00000018), 512 (0200) bytes

```
002728 9A 0A76FF0C 76FF0196 68CE76FF 0022E903 7500030D CE468910 C48327E8 Ò'.6..Fö=..u.Õ"..vöh...v..v..+'. 000000
FF9AF676 FFF876FF DA76FFDC 76FF01DF E9CE4688 00002736 9ADA76FF DC76FF00 ..vÉ.vÕ.6'...FöÕÕ..vÉ.vÕ.v%.v-.. 000020
FF000027 749A0A76 FF0C76FF 019668CE 76FF0022 E9037500 0030CE46 890000FF ....Fö=..u.Õ"..vöh...v..v..t'... 000040
FFC676FF CA76FFCC 76FFDA76 FFDC76FF 01A1E9CE 46880000 277F9ADA 76FFDC76 vÉ.vÕ..'...FöÕÀ..vÉ.vÕ.vä.vò.v6. 000060
0C76FF01 9668CE76 FF0022E9 03750000 30CE4689 0000FFFF 9A5016EE 4680C476 v6.FŸ.P......Fö=..u.Õ"..vöh...v. 000080
FFDA76FF DC76FF01 58E9CE46 8B000027 C49ADA76 FFDC76FF 000027B9 9A0A76FF .v..¿'...vÉ.vÕ.6'...FöÕX..vÉ.vÕ. 0000A0
68CE76FF 0022E903 7500030D CE468900 00245C9A 5016E446 8D026AEE 76FFF076 vÞ.vŸj..FÕ.P.\$...Fö=..u.Õ"..vöh 0000C0
016A0113 E9CE4688 00002810 9ADA76FF DC76FF00 0028059A 0A76FF0C 76FF0196 ...v..v...(...vÉ.vÕ..(...FöÕ..j. 0000E0
CE468910 C48324B5 15209ADA 76FFDC76 FFCA76FF CC76FFC4 76FFC676 FFE476FF .vÕ.v6.v6.vä.vò.vÉ.vÕ. .ç$.6..Fö 000100
9ADA76FF DC76FF00 0026A19A 0A76FF0C 76FF0196 68CE76FF 0022E903 7500030D =..u.Õ"..vöh...v..v..À&...vÉ.vÕ. 000120
000025A0 9AF476FF FF2886FF FF2AB6FF DE76FFE0 76FF00C7 E9CE4688 00002842 B(...FöÕú..vÄ.vB.Ñ*..Ñ(..v¶.Ú%.. 000140
FFE076FF 0095E9CE 46880000 28839ADA 76FFDC76 FF0011E9 03750000 30CE4689 .Fö=..u.Õ...vÉ.vÕ..(...FöÕ...vÄ. 000160
0025EE9A EE76FFF0 76FF5016 FF2C868D FE76FFE2 76FFFF28 B6FFFF2A B6FFDE76 vB.Ñ*..Ñ(..vä.v±.....P.vÞ.vŸ.Ÿ%. 000180
DC76FF00 54E9CE46 88000026 AC9ADA76 FFDC76FF 0011E903 7500030D CE468900 ..Fö=..u.Õ...vÉ.vÕ.˜&...FöÕT..vÉ 0001A0
0307C726 0E5EC400 38E9CE46 880006E9 03750000 30CE4689 00002615 9ADA76FF .vÕ..&...Fö=..u.Õ...FöÕ8.6^.&ú.. 0001C0
1676FF00 0028079A 00A16814 76FF1676 FF000028 C99A00A0 681476FF 1676FF00 ..v..v.h...è(...v..v.hÀ..ø(...v. 0001E0
```

```
Dump of file SATURN:[PCCOMMON.DUMP.DLL]DAATTRDF.TMP;1 on 18-APR-1990 10:39:32.72
File ID (535,11,0)   End of file block 82 / Allocated 84

Virtual block number 25 (00000019), 512 (0200) bytes

 881E5657 000028C8 0012CAC9 5F5E1F00 00E9CE46 8800001F 029A009F 681476FF .v.h........Föõ...^_èò..à(..WV.| 000000
 76FF00D0 07C72606 5EC40004 07C7260E 5EC40000 FE46C700 00F246C7 D88E1F37 7..ÄúF·..úF±..á^.&ú...á^.&ú.Å..v 000020
 E9DC4688 0006E903 75000030 DC468900 001F7D9A 50160846 8D1276FF 1476FF16 ..v..v..FÄ.P.}....FÉ=..u.Õ...FÉÕ 000040
 DC468800 06E90375 00003DDC 46890000 1F9E9A50 160E468D 1476FF16 76FF028A ...v..v..F8.P......FÉ=..u.Õ...FÉ 000060
 46880006 E9037500 003DDC46 89000018 8E9A5016 F4468D14 76FF1676 FF0269E9 Õi..v..v..F¶.P......FÉ=..u.Õ...F 000080
 8B0006E9 03750000 3DDC4689 00001F8F 9A5016E2 46801476 FF1676FF 0248E9DC ÉÕH..v..v..Fã.P.¢....FÉ=..u.Õ... 0000A0
 0006E903 7500003D DC468900 001FE09A 5016EA46 8D1476FF 1676FF02 27E9DC46 FÉÕ'..v..v..Fõ.P.Å....FÉ=..u.Õ.. 0000C0
 89000020 0A9A006A 006A006A 006A0165 68000468 E276FFE4 76FF0206 E9DC4688 .FÉÕ...vÕ.vãhå.he.j.j.j.j... ... 0000E0
 89EE4689 00002BA4 9A006A00 6AFC76FF 006A016A 68000468 E276FFE4 76FFFC46 F=.vÕ.vãhå.hj.j..v=j.j..É+...FŸ. 000100
 00003DDC 46890000 2A2F9A50 16F8468D 036AEE76 FFF076FF DE76FFE0 76FFF056 Vþ.vÅ.vß.vþ.vŸj..F½.P./*...FÉ=.. 000120
 D39A5016 E6468D04 6AEE76FF F076FFDE 76FFE076 FF01A1E9 DC468B00 06E90375 u.Õ...FÉÕÀ..vÅ.vß.vþ.vŸj..Fl.P.Æ 000140
 EE76FFF0 76FFDE76 FFE076FF 0178E9DC 468B0006 E9037500 003DDC46 89000022 "...FÉ=..u.Õ...FÉÕx..vÅ.vß.vþ.vŸ 000160
 6A006A01 4FE9DC46 8B0006E9 03750000 3DDC4689 000022FC 9A5016F2 468D026A j..F·.P.="...FÉ=..u.Õ...FÉÕO.j.j 000180
 FFE076FF 000023E5 9A50522A 968A0000 88019668 1B6A0196 36FF2600 DE068E00 ...8.&.6..j.h..|..¤.*RP.I#...vÅ. 0001A0
 010CE9DC 46880006 E9037500 003DDC46 89000024 339A5052 2418BA00 0088DE76 vß|..¤.$RP.3$...FÉ=..u.Õ...FÉÕ.. 0001C0
 8910C483 2BB41520 9ADE76FF E076FFF8 76FFFA76 FFE676FF E876FFF2 76FF006A j..v·.vÒ.vl.v°.v½.vÅ.vß. .Ç+.á.. 0001E0

Dump of file SATURN:[PCCOMMON.DUMP.DLL]DAATTRDF.TMP;1 on 18-APR-1990 10:39:32.72
File ID (535,11,0)   End of file block 82 / Allocated 84

Virtual block number 26 (0000001A), 512 (0200) bytes

 76FFE076 FF00002B 259A0A76 FF0C76FF 0196680C 76FF0022 E9037500 003DDC46 FÉ=..u.Õ"..vÉh...v..v..%+...vÅ.v 000000
 DC468900 00FFFF9A E676FFE8 76FFDE76 FFE076FF 00C0E9DC 46880000 2B309ADE ß.0+...FÉÕè..vÅ.vß.vÒ.vl......FÉ 000020
 9ADE76FF E076FF00 0026ED9A 0A76FF0C 76FF0196 680C76FF 0022E903 7500003D =..u.Õ"..vÉh...v..v..Ú&...vÅ.vß. 000040
 0006E903 7500003D DC468900 0028949A DE76FFE0 76FF0082 E9DC4688 000026F8 ¥&...FÉÕ...vÅ.vß..(...FÉ=..u.Õ.. 000060
 7D9A00A0 681476FF 1676FF00 0107C726 0E5EC418 4FFF26EA 5EC40066 E9DC4688 .FÉÕf.á^õ&.O.á^.&ú....v..v.h...) 000080
 FF00002B BB9A009F 681476FF 1676FF00 002B8B9A 00A16814 76FF1676 FF00002B +...v..v.hÀ...+...v..v.h...E(... 0000A0
 D4681476 FF1676FF 000029CB 9A006A00 6A006A00 6A016E68 000468E2 76FFE476 vÕ.vãhå.hn.j.j.j.j..ù)...v..v.hå 0000C0
 FFD88E28 F0881E56 57000062 C80012CA C95F5E1F 0000E9DC 46882600 12319A00 ..1.Å&.FÉÕ...^_èò..àb..WV.|Þ(.Ã. 0000E0
 013EE9EA 46880006 E9037500 003DEA46 89000029 3E9A5016 EC468D08 76FF0A76 v..v..F§.P.>)...Fõ=..u.Õ...FõÕ>. 000100
 1DE9EA46 8B0006E9 03750000 3DEA4689 00002980 9A5016F0 46800876 FF0A76FF .v..v..Fþ.P..)...Fõ=..u.Õ...FõÕ. 000120
 E9EA4688 0006E903 7500003D EA468900 00295F9A 5016FC46 8D0876FF 0A76FF01 ..v..v..F=.P._)...Fõ=..u.Õ...FõÕ 000140
 00003DEA 46890000 16AD9A50 16F8468D 116AFC76 FFFE76FF EC76FFEE 76FF00FC =..vŸ.vš.v±.v=j..F½.P.Ù....Fõ=.. 000160
 9A006A00 6A4B6A00 6A014368 000668F0 76FFF276 FF000E39 EA468B00 06E90375 u.Õ...FõÕÆ..v·.vþh=.hC.j.jKj.j.. 000180
 47082607 8B26F45E C404F446 830004E9 F65689F4 4689FA56 8BF8468B 000029E8 Ò)...F½.V°.F¶.V~Õ...F¶.á^¶&..&.G 0001A0
 2A589A50 169E468D 026A37FF 260277FF 26F45EC4 EC76FFEE 76FF0081 E9037502 .u.Õ...vŸ.všá^¶&.w.&.7j..F..P.X* 0001C0
 46880000 2D0A9AF8 76FFFA76 FFEC76FF EE76FF00 17E90375 00003DEA 46890000 ...Fõ=..u.Õ...vŸ.vš.v°.v½..·...F 0001E0

Dump of file SATURN:[PCCOMMON.DUMP.DLL]DAATTRDF.TMP;1 on 18-APR-1990 10:39:32.72
File ID (535,11,0)   End of file block 82 / Allocated 84

Virtual block number 27 (0000001B), 512 (0200) bytes

 FFFF9A37 FF260277 FF26F45E C450169E 468D0058 681EF076 FFF276FF 005AE9EA õÕZ..v·.vþ.hX..F..Pá^¶&.w.&.7... 000000
 46880000 20249AF8 76FFFA76 FFEC76FF EE76FF00 17E90375 00003DEA 46890000 ...Fõ=..u.Õ...vŸ.vš.v°.v½.$-...F 000020
 5E1F0000 E9EA4688 0000171E 9AF876FF FA76FFEC 76FFEE76 FFFF6CE9 001AE9EA õÕ..Õl..vŸ.vš.v°.v½......FõÕ...^ 000040
 07C7260E 5EC40789 26124688 065EC408 8E28C8B8 1E565700 008CC800 06CAC95F _èò..à¥..WV.|ú+.Äá^..F.&..á^.&ú. 000060
 E9037500 003DDE46 8900002B DB9A5016 E6468D14 76FF1676 FF0000FE 46C70004 ..úF±...v..v..Fl.P.Ù+...Fß=..u.Õ 000080
 03750000 3DDE4689 00002BFC 9A5016EA 468D1476 FF1676FF 0551E9DE 46880006 ...FßÕQ..v..v..Fõ.P.=+...Fß=..u. 0000A0
 80000020 439A5016 FF44868D 4B6A0006 68EA76FF EC76FF05 30E9DE46 880006E9 Õ...FßÕ0..vš.vÕh=.jK..D..P.C ... 0000C0
 76FF1676 FF04FEE9 DE468800 06E90374 00003D04 C4832EFF 002A9A50 16FF4486 .D..P.*....á.=..t.Õ...FßÕ±..v..v 0000E0
 FFE876FF 04DDE9DE 46880006 E9037500 003DDE46 8900002C 1D9A5016 F6468D14 ..F-.P.......Fß=..u.Õ...FßÕl..vÕ. 000100
 8B0006E9 03750000 3DDE4689 00002A06 9A5016FA 46800A6A F676FFF8 76FFE676 vl.v½.v-j..F°.P..*...Fß=..u.Õ... 000120
 003DDE46 89000008 3B9A5016 E4468DFA 76FFFC76 FFE676FF E876FF04 B4E9DE46 FßÕÇ..vÕ.vl.v=.v°.Fõ.P.;....Fß=. 000140
 36FF2600 DE068E00 6A006A00 23E90374 01E47E83 048DE9DE 46880006 E9037500 .u.Õ...FßÕ...-õ.t.Õ#.j.j...ß.&.6 000160
 76FFE676 FFE876FF 0461E900 00B80000 2F279A0A 76FF0C76 FF019668 296A0196 ..j)h...v..v..'/..|..Õa..vÕ.vl.v 000180
 38E9DE46 8B0006E9 03750000 3DDE4689 00002C46 9A5016F2 4680136A FA76FFFC =.v°j..F·.P.F,...Fß=..u.Õ...FßÕ8 0001A0
 03750247 08260788 26EE5EC4 04EE4683 0004E9F0 5689EE46 89F45688 F2468B04 ..F·.V¶.FŸ.VþÕ...FŸ.á^Ÿ&..&.G.u. 0001C0
 8900002C AE9A5016 90468D02 6A37FF26 0277FF26 EE5EC4E6 76FFE876 FF01BFE9 Õ¢..vÕ.vlá^Ÿ&.w.&.7j..F..P.Û,... 0001E0
```

```
Dump of file SATURN:[PCCOMMON.DUMP.DLL]DAATTRDF.TMP;1 on 18-APR-1990 10:39:32.72
File ID (535,11,0)   End of file block 82 / Allocated 84

Virtual block number 28 (0000001C), 512 (0200) bytes

 D8E9DE46 8B00002F BF9AF276 FFF476FF E676FFE8 76FF0017 E9037500 003DDE46 FB=..u.Õ...vò.vl.v¶.v·.e/...FBÕÄ 000000
 006A006A 0163E903 7400003D 08C48325 4800009A 50169046 8D5016FF 44868D03 ...D..P.F..P...HX.6.=..t.Õc.j.j. 000020
 76FFE876 FF00002F 629A5052 2F358A00 00B80196 681C6A01 9636FF26 00DE068E ..B.&.6..j.h..|..¤5/RP.b/...vò.v 000040
 DE068E00 6A006A00 23E90375 00003DDE 46890000 2A9B9A50 522A83BA 0000B8E6 Ì|..¤.*RP..*...FB=..u.Õ#.j.j...B 000060
 FFE876FF 035DE9DE 46880000 305D9A0A 76FF0C76 FF019668 246A0196 36FF2600 .&.6..j$h...v..v..]0...FBÕ]..vò. 000080
 003DDE46 8900000F 129A086A 37FF2602 77FF26EE 5EC4116A F676FFF8 76FFE676 vl.v½.v-j.6^Y&.w.&.7j.......FB=. 0000A0
 2FFA9AE6 76FFE876 FF00002A E79A0A76 FF0C76FF 019668DE 76FF0033 E9037500 .u.Õ3..vBh...v..v..Õ*...vò.vl.*/ 0000C0
 1EEA76FF EC76FF03 00E9DE46 8B000030 0B9AF276 FFF476FF E676FFE8 76FF0000 ...vò.vl.v¶.v·..0...FBÕ...vš.võ. 0000E0
 03750000 3DDE4689 00002CEE 9A37FF26 0277FF26 EE5EC450 16FF4486 80005868 hX...D..P6^Y&.w.&.7.Y,...FB=..u. 000100
 8B000030 7F9AF276 FFF476FF E676FFE8 76FF0000 2AF29AE6 76FFE876 FF0022E9 Õ"..vò.vl.·*...vò.vl.v¶.v·..0... 000120
 76FF0000 2C709A00 6A006A00 6A006A01 25680007 68EA76FF EC76FF02 B4E9DE46 FBÕÇ..vš.võh■.hX.j.j.j.j..p,...v 000140
 9636FF26 00DE068E 006A006A 0023E903 7500003D DE468900 002B419A E676FFE8 Ò.vl.A+...FB=..u.Õ#.j.j...B.&.6. 000160
 E90003E9 0001FE46 C70262E9 DE468800 002A889A 0A76FF0C 76FF0196 68246A01 .j$h...v..v...*...FBÕb.úF±..Õ..Õ 000180
 46880006 E9037500 003DDE46 8900002C CA9AF276 FFF476FF E676FFE8 76FFFE2E .±.vò.vl.v¶.v·.ò,...FB=..u.Õ...F 0001A0
 8E006A00 6A021EE9 DE468800 0307C726 0E5EC400 0EE90374 01FE7E83 0235E9DE BÕ5..~±.t.Õ..6^.&ú....FBÕ..j.j.. 0001C0
 E676FFE8 76FF0000 31019A50 5230048A 00008801 96681C6A 019636FF 26000E06 .B.&.6..j.h..|..¤åORP..1...vò.vl 0001E0

Dump of file SATURN:[PCCOMMON.DUMP.DLL]DAATTRDF.TMP;1 on 18-APR-1990 10:39:32.72
File ID (535,11,0)   End of file block 82 / Allocated 84

Virtual block number 29 (0000001D), 512 (0200) bytes

 000E068E 006A006A 0023E903 7500003D DE468900 002F3A9A 50522F22 BA0000B8 |..¤"/RP.:/...FB=..u.Õ#.j.j...B. 000000
 76FFE876 FF01BEE9 DE468800 0032879A 0A76FF0C 76FF0196 68246A01 9636FF26 &.6..j$h...v..v...2...FBÕ/..vò.v 000020
 7500003D DE468900 00FFFF9A 006A5016 FF44868D 5016E046 8DFA76FF FC76FFE6 l.v=.v*.FÀ.P..D..Pj.......FB=..u 000040
 00003194 9AE676FF E876FF00 0031899A 0A76FF0C 76FF0196 68DE76FF 0022E903 .Õ"..vBh...v..v...1...vò.vl..1.. 000060
 002F879A 086AE076 FFE276FF 116AF676 FFF876FF E676FFE8 76FF0173 E9DE468B .FBÕs..vò.vl.v½.v-j...vã.vÀj.../. 000080
 E876FF00 0031F39A 0A76FF0C 76FF0196 68DE76FF 0022E903 7500003D DE468900 ..FB=..u.Õ"..vBh...v..v..µ1...vò 0000A0
 006A006A 006A0124 68000768 EA76FFEC 76FF012B E9DE468B 000031FE 9AE676FF .vl.±1...FBÕ+..vš.võh■.h$.j.j.j. 0000C0
 6AE076FF E276FFE6 76FFE876 FF59DC46 C60049E9 03750000 3D000032 549A006A j..T2..=..u.ÕI.6FÉY.vò.vl.vã.vÀj 0000E0
 FF0C76FF 019668DE 76FF0022 E9037500 003DDE46 89000027 9D9A5016 DC468D04 ..FÉ.P..'...FB=..u.Õ"..vBh...v.. 000100
 681EEA76 FFEC76FF 00C1E9DE 46880000 32359AE6 76FFE876 FF00002F A39A0A76 v..È/...vò.vl.52...FBÕè..vš.võ.h 000120
 76FF0011 E9037500 003DDE46 8900002F E49AE076 FFE276FF 5016FF44 86800058 X...D..P.vã.vÀ.Õ/...FB=..u.Õ...v 000140
 6A006A00 6A012568 000768EA 76FFEC76 FF008AE9 DE468800 002FAE9A E676FFE8 Ò.vl.Û/...FBÕ...vš.võh■.hX.j.j.j 000160
 006A0023 E9037500 003DDE46 89000030 359AE676 FFE876FF 0000302A 9A006A00 .j..*0...vò.vl.50...FB=..u.Õ#.j. 000180
 38E9DE46 8800002E 5E9A0A76 FF0C76FF 01966824 6A019636 FF26000E 068E006A j...B.&.6..j$h...v..v..^....FBÕB 0001A0
 00A16814 76FF1676 FF000032 B19A00A0 681476FF 1676FF00 0307C726 0E5EC400 .6^.&ú....v..v.h...Ý2...v..v.hÀ. 0001C0
 0012CAC9 5F5E1F00 00E9DE46 8800002B 6F9A009F 681476FF 1676FF00 0032BF9A .¢2...v..v.h...o+...FBÕ...^_èò.. 0001E0

Dump of file SATURN:[PCCOMMON.DUMP.DLL]DAATTRDF.TMP;1 on 18-APR-1990 10:39:32.72
File ID (535,11,0)   End of file block 82 / Allocated 84

Virtual block number 30 (0000001E), 512 (0200) bytes

 5EC40789 26124688 065EC4EC 4689F846 890000B8 D88E2D3D B81E5657 000080C8 à¯..WV.|=-.Ä|...F½.Fš6^..F.&..6^ 000000
 06E90375 00003DEA 46890000 2D639A50 16F0468D 1476FF16 76FF0004 07C7260E .&ú....v..v..Fb.P.c-...Fõ=..u.Õ. 000020
 E9037500 003DEA46 8900002D 849A5016 F4468D14 76FF1676 FF0332E9 EA468800 ..FõÕ2..v..v..F¶.P..-...Fõ=..u.Õ 000040
 76FF0000 2DAB9A50 16FF5086 8D4B6A00 D668F476 FFF676FF 0311E9EA 46880006 ...FõÕ...v-.v¶h#.jK..P..P.¨-...v 000060
 3DEA4689 00000273 9A5016FC 468D5016 9C468D50 16FA468D 0058681E F476FFF6 -.v¶.hX..F*.P.F..P.F•.P.s....Fõ= 000080
 5016EE46 8D046AFC 76FFFE76 FFF076FF F276FF02 CCE9EA46 8B0006E9 03750000 ..u.Õ...FõÕä..v·.vb.v±.v=j..FŸ.P 0000A0
 68000768 F476FFF6 76FF02A3 E9EA468B 0006E903 7500003D EA468900 002ECB9A .ü....Fõ=..u.Õ...FõÕÈ..v-.v¶h■.h 0000C0
 0008E903 7459EE7E 80001DE9 03750000 3D000031 B39A006A 006A006A 006A0124 $.j.j.j.j..*1..=..u.Õ...-ŸYt.Õ.. 0000E0
 EC46C700 08E90374 4EEE7E80 001AE900 01EC46C7 59E846C6 0009E900 00EC46C7 úF$..Õ..6FÒYúF$..Õ...-ŸNt.Õ..úF$ 000100
 C4832DB8 00009A50 169C468D 5016FF50 868D0001 EC46C74E E846C600 09E90000 ..Õ..6FÕNúF$....P..P.F..P...|-.6 000120
 83005CE9 037400F8 7E830001 F846C700 05E90000 F846C700 08E90374 00003D08 .=..t.Õ..úF½..Õ..úF½...-½.t.Õ\.. 000140
 9F9AFC76 FFFE76FF 5016FF50 868D0058 681EF476 FFF676FF 0053E903 7400EC7E ~$.t.ÕS..v-.v¶.hX...P..P.v±.v=.. 000160
 01256800 D768F476 FFF676FF 01E5E9EA 46880006 E9037500 003DEA46 89000035 5...Fõ=..u.Õ...FõÕl..v-.v¶h■.hX. 000180
 8E006A00 6A01BEE9 EA468800 0307C726 0E5EC400 0035D49A 006A006A 006A006A j.j.j.j..å5..6^.&ú....FõÕ/.j.j.. 0001A0
 F076FFF2 76FF0000 34E19A50 523484BA 0000B801 96681E6A 019636FF 26000E06 .B.&.6..j.h..|..¤Ç4RP.Ä4...v·.vb 0001C0
 000E068E 006A006A 0023E903 7500003D EA468900 0030099A 505230C1 BA0000B8 |..¤èORP.10...Fõ=..u.Õ#.j.j...B. 0001E0
```

```
Dump of file SATURN:[PCCOMMON.DUMP.DLL]DAATTRDF.TMP;1 on 18-APR-1990 10:39:32.72
File ID (535,11,0)   End of file block 82 / Allocated 84

Virtual block number 31 (0000001F), 512 (0200) bytes

 7401EC7E 83015EE9 EA468800 0036079A 0A76FF0C 76FF0196 68246A01 9636FF26 &.6..j$h...v..v...6...Fõõ^..-š.t 000000
 30EA4689 00003557 9A5016E8 468D046A FC76FFFE 76FFF076 FFF276FF 0045E903 .ÕE..v·.vÞ.v±.v=j..FÒ.P.W5...Fõ= 000020
 7E9AF076 FFF276FF 00003573 9A0A76FF 0C76FF01 9668EA76 FF0022E9 03750000 ..u.Õ"..võh...v..v..s5...v·.vÞ.~ 000040
 026AFC76 FFFE76FF F076FFF2 76FF0046 E9037401 F87E8301 10E9EA46 8B000035 5...FõÕ...-½.t.ÕF..v·.vÞ.v±.v=j. 000060
 FF0C76FF 019668EA 76FF0022 E9037500 003DEA46 89000031 D79A5016 FF50868D ..P..P.■1...Fõ=..u.Õ"..võh...v.. 000080
 681EF476 FFF676FF 00C1E9EA 46880000 35B59AF0 76FFF276 FF000031 419A0A76 v..A1...v·.vÞ.ç5...FõÕê..v-.v¶.h 0000A0
 76FF0011 E9037500 003DEA46 890000FF FF9AFC76 FFFE76FF 5016FF50 868D0058 X...P..P.v±.v=......Fõ=..u.Õ...v 0000C0
 6A006A00 6A012568 00D768F4 76FFF676 FF008AE9 EA468800 00314C9A F076FFF2 ·.vÞ.L1...FõÕ...v-.v¶h■.hX.j.j.j 0000E0
 006A0023 E9037500 003DEA46 89000032 5F9AF076 FFF276FF 0000338B 9A006A00 .j..£3...v·.vÞ._2...Fõ=..u.Õ#.j. 000100
 38E9EA46 8B000030 C69A0A76 FF0C76FF 01966824 6A019636 FF2600DE 068E006A j...8.&.6..j$h...v..v..60...FõÕ8 000120
 00A16814 76FF1676 FF000036 319A00A0 681476FF 1676FF00 0307C726 0E5EC400 .6^.&ú....v..v.h...16...v..v.hÀ. 000140
 0012CAC9 5F5E1F00 00E9EA46 8B000032 A39A009F 681476FF 1676FF00 00363F9A .?6...v..v.h...È2...FõÕ...^_èò.. 000160
 1676FF00 0407C726 0E5EC407 89261246 8B065EC4 D88E3208 B81E5657 000060C8 à'..WV.¡Ä2.Ä6^..F.&..6^.&ú....v. 000180
 76FF01A3 E9EC4688 0006E903 75000030 EC468900 0033029A 5016EE46 8D1476FF .v..FŸ.P..3...Fš=..u.Õ...FšÕÈ..v 0001A0
 FF0182E9 EC468800 06E90375 00003DEC 46890000 33239A50 16F2468D 1476FF16 ..v..F·.P.#3...Fš=..u.Õ...FšÕ... 0001C0
 0161E9EC 46880006 E9037500 003DEC46 8900002D D79A5016 F8468D14 76FF1676 v..v..F½.P.■-...Fš=..u.Õ...FšÕa. 0001E0

Dump of file SATURN:[PCCOMMON.DUMP.DLL]DAATTRDF.TMP;1 on 18-APR-1990 10:39:32.72
File ID (535,11,0)   End of file block 82 / Allocated 84

Virtual block number 32 (00000020), 512 (0200) bytes

 46890000 33689A50 16FC468D 5016A046 8D5016F6 468D0058 681EF276 FFF476FF .v¶.v·.hX..F-.P.F..P.F=.P.h3...F 000000
 96681D6A 019636FF 26000E06 8E006A00 6A0132E9 EC468800 06E90375 00003DEC š=..u.Õ...FšÕ2.j.j...8.&.6..j.h. 000020
 0034B99A 505234A1 BA0000B8 EE76FFF0 76FF0000 34A69A50 523728BA 00008801 .¦..¤(7RP.Ì4...vÞ.vŸ¦..¤À4RP.¿4. 000040
 76FF0196 68246A01 9636FF26 00DE068E 006A006A 0023E903 7500003D EC468900 ..Fš=..u.Õ#.j.j...8.&.6..j$h...v 000060
 FE76FF11 6AF876FF FA76FFEE 76FFF076 FF0002E9 EC468800 0037EF9A 0A76FF0C ..v..ÿ7...FšÕ@..vÞ.vŸ.v¹.v½j..v± 000080
 76FF0C76 FF019668 EC76FF00 22E90375 00003DEC 46890000 0EC69A08 6AFC76FF .v=j..6....Fš=..u.Õ"..vŝh...v..v 0000A0
 000768F2 76FFF476 FF008AE9 EC468800 00352F9A EE76FFF0 76FF0000 35249A0A ..$5...vÞ.vŸ./5...FšÕ...v¶.v·h■. 0000C0
 003DEC46 89000035 DF9AEE76 FFF076FF 00003479 9A006A00 6A006A00 6A012568 hX.j.j.j.j..y4...vÞ.vŸ.Õ5...Fš=. 0000E0
 1A9A0A76 FF0C76FF 01966824 6A019636 FF26000E 068E006A 006A0023 E9037500 .u.Õ#.j.j...8.&.6..j$h...v..v... 000100
 FF000038 199A00A0 681476FF 1676FF00 0107C726 0E5EC400 38E9EC46 88000037 7...FšÕ8.6^.&ú....v..v.h....8... 000120
 00E9EC46 8B000036 239A009F 681476FF 1676FF00 0038279A 00A16814 76FF1676 v..v.hÀ..'8...v..v.h...#6...FšÕ. 000140
 9A5016FC 468D0876 FF0A76FF D88E3658 881E5657 00005EC8 0012CAC9 5F5E1F00 ..^_èò..à^..WV.¡X6.Ä.v..v..F=.P. 000160
 5016F046 8D0876FF 0A76FF00 D8E9EE46 8B0006E9 03750000 30EE4689 000036BB £6.¯.FŸ=..u.Õ...FŸÕÄ..v..v..FÞ.P 000180
 16F8468D 0876FF0A 76FF00B7 E9EE4688 0006E903 75000030 EE468900 0036799A .y6...FŸ=..u.Õ...FŸÕñ..v..v..F½. 0001A0
 FE76FFF0 76FFF276 FF0096E9 EE468800 06E90375 00003DEE 46890000 369A9A50 P..6...FŸ=..u.Õ...FŸÕ...v·.vÞ.v± 0001C0
 006DE9EE 46880006 E9037500 0030EE46 8900002E 009A5016 F4468D0C 6AFC76FF .v=j..F¶.P......FŸ=..u.Õ...FŸÕm. 0001E0

Dump of file SATURN:[PCCOMMON.DUMP.DLL]DAATTRDF.TMP;1 on 18-APR-1990 10:39:32.72
File ID (535,11,0)   End of file block 82 / Allocated 84

Virtual block number 33 (00000021), 512 (0200) bytes

 75F6460B F4468800 0037BC9A 006A006A 4B6A006A 01436806 76FFF876 FFFA76FF .v¹.v½.v.hC.j.jKj.j..¥7...F¶.F-u 000000
 3DEE4689 00003391 9A5016A2 468D026A F476FFF6 76FFF076 FFF276FF 002CE903 .Õ,..v·.vÞ.v-.v¶j..FÅ.P..3...FŸ= 000020
 A2468D06 76FFF876 FFFA76FF 00A246C6 0004E900 20E9EE46 8B0006E9 03750000 ..u.Õ...FŸÕ .Õ..6FÅ..v¹.v½. ..FÅ 000040
 D88E3840 B81E5657 000082C8 0006CAC9 5F5E1F00 00E9EE46 8B00000B B09A5016 .P.¯....FŸÕ...^_èò..àý..WV.¡Õ¹.Ä 000060
 03750000 30EA4689 00003892 9A5016F4 468D1476 FF1676FF 000207C7 260E5EC4 6^.&ú....v..v..F¶.P..8...Fõ=..u. 000080
 FF000033 4A9A5016 FF52868D 4B6A1276 FFF476FF F676FF03 29E9EA46 8B0006E9 Õ...FõÕ)..v-.v¶.v.jK..R..P.J3... 0000A0
 02F2E9EA 46880006 E9037500 003DEA46 89000038 509A5016 F8468D14 76FF1676 v..v..F½.P.P8...Fõ=..u.Õ...FõÕ·. 0000C0
 D1E9EA46 8B0006E9 03750000 30EA4689 00003871 9A5016EC 468D1476 FF1676FF .v..v..Fš.P.q8...Fõ=..u.Õ...FõÕ1 0000E0
 75000030 EA468900 0038B89A 5016F046 8D0C6AF8 76FFFA76 FFEC76FF EE76FF02 ..vŸ.vš.v¹.v½j..FÞ.P.£8...Fõ=..u 000100
 76FFF276 FFEC76FF EE76FF00 4DE90375 F24608F0 468802A8 E9EA4688 0006E903 .Õ...FõÕ'..FÞ.F·u.ÕM..vŸ.vš.v·.v 000120
 868D0274 E9EA4688 0006E903 75000030 EA468900 0039089A 50169E46 8D026AF0 Þj..F..P..9...Fõ=..u.Õ...FõÕt... 000140
 E90253E9 EA468800 06E90374 00003D08 C4833A58 00009A50 169E468D 5016FF52 R..P.F..P...(:.6.=..t.Õ...FõÕS.Õ 000160
 006A0234 E9EA4688 0006E903 7400003D 04C48334 0C002A9A 5016FF52 8680001C ....R..P.*..4.6.=..t.Õ...FõÕ4.j. 000180
 EE76FF00 0037559A 50523A97 8A0000B8 01966817 6A019636 FF26000E 068E006A j...8.&.6..j.h..¡..¤.:RP.U7...vŸ 0001A0
 F1E9EA46 8B0006E9 03750000 3DEA4689 00003720 9A505237 158A0000 B8EC76FF .vš¡..¤.7RP.-7...Fõ=..u.Õ...FõÕþ 0001C0
 F276FFEC 76FFEE76 FF0093E9 03740000 3D04C483 3A3C002A 9A5016FF 52868D01 ...R..P.*.<:.6.=..t.Õ...vŸ.vš.v· 0001E0
```

```
Dump of file SATURN:[PCCOMMON.DUMP.DLL]DAATTRDF.TMP;1 on 18-APR-1990 10:39:32.72
File ID (535,11,0)   End of file block 82 / Allocated 84

Virtual block number 34 (00000022), 512 (0200) bytes

 019668EA 76FF0022 E9037500 003DEA46 8900000E 299A5016 FC468D14 6AF076FF .vÞj..F=.P.)....Fõ=..u.Õ"..võh.. 000000
 FFEE76FF 0196E9EA 46880000 3B399AEC 76FFEE76 FF00003B 4A9A0A76 FF0C76FF .v..v..J;...vŸ.v$.9;...FõÕ...vŸ. 000020
 E9037500 003DEA46 89000037 769A146A F076FFF2 76FF0C6A F876FFFA 76FFEC76 v$.v¹.v½j..v·.vÞj..v7...Fõ=..u.Õ 000040
 46880000 3B839A0A 76FF0C76 FF019668 EA76FF00 003B8E9A EC76FFEE 76FF0022 "..vŸ.v$..;...võh...v..v...;...F 000060
 003DEA46 8900000C 909A5016 FF4E868D EC76FFEE 76FF0008 E900DEE9 014EE9EA õÕN.ÕB.ÕU..vŸ.v$..N..P......Fõ=. 000080
 38E29AEC 76FFEE76 FF00003C 289A0A76 FF0C76FF 019668EA 76FF0022 E9037500 .u.Õ"..võh...v..v..+<...vŸ.v$.ã; 0000A0
 868D5016 9E468D0A 76FF0C76 FF004CE9 0374F246 0BF0468B 010AE9EA 46880000 ...FõÕ...FÞ.F·t.ÕL..v..v..F..P.. 0000C0
 18C4832A CA3CA99A EC76FFEE 76FFFF4E B6FFFF50 B6FFFB76 FFFA76FF 5016FF52 R..P.v¹.v½.ÑP..ÑN..vŸ.v$.`<ò*.á. 0000E0
 FF0046E9 00B6E9EA 46880000 3C1A9AEC 76FFEE76 FF0011E9 03750000 3DEA4689 .Fõ=..u.Õ...vŸ.v$..<...FõÕÑ.ÕF.. 000100
 03750000 3DEA4689 00003508 9A5016FF 52868D02 6AF076FF F276FFEC 76FFEE76 vŸ.v$.v·.vÞj...R..P..5...Fõ=..u. 000120
 88000037 929A0A76 FF0C76FF 019668EA 76FF0000 379D9AEC 76FFEE76 FF0022E9 Õ"..vŸ.v$..7...võh...v..v...7... 000140
 76FFEE76 FF0011E9 03750000 3DEA4689 000037C7 9AEC76FF EE76FF00 6DE9EA46 FõÕm..vŸ.v$.ú7...Fõ=..u.Õ...vŸ.v 000160
 07C7260E 5EC43BCB 40C99A00 E8681476 FF1676FF 0046E9EA 46880000 3B029AEC $..;...FõÕF..v..v.hò..èâù;á^.&ú. 000180
 76FF0000 3C989A00 A1681476 FF1676FF 00003C8A 9A00A068 1476FF16 76FF0001 ...v..v.h....<...v..v.hÀ...<...v 0001A0
 1E565700 001CC800 12CAC95F 5E1F0000 E9EA4688 00003808 9A009F68 1476FF16 ..v.h....8...FõÕ...^_èò..à...WV. 0001C0
 39E59A50 16F8468D 0B6A0E76 FF1076FF 0676FF08 76FF0000 F246C7D8 8E394CB8 ¡L9.ÃúF·...v..v..v..v̄.j..F½.P.Î9 0001E0

Dump of file SATURN:[PCCOMMON.DUMP.DLL]DAATTRDF.TMP;1 on 18-APR-1990 10:39:32.72
File ID (535,11,0)   End of file block 82 / Allocated 84

Virtual block number 35 (00000023), 512 (0200) bytes

 46880000 3D2F9A1A 76FF1C76 FF019668 E876FF00 17E90375 00003DE8 46890000 ...Fò=..u.Õ...vÒh...v..v../=...F 000000
 FC468D09 6AF876FF FA76FF06 76FF0876 FF01A9E9 0375FA46 0BF8468B 03D0E9E8 ÒÕÅ..F½.F¹u.Õ`..v..v..v¹.v½j..F= 000020
 889A1A76 FF1C76FF 019668E8 76FF0017 E9037500 003DE846 8900003A DB9A5016 .P.Ü:...Fò=..u.Õ...vÒh...v..v... 000040
 89FA568B F8468B00 00F246C7 0014E903 74FE460B FC468B03 88E9E846 8B00003D =...FòÕ...F=.F±t.Õ..úF·...F½.V¹. 000060
 00002E7C 9A5016EA 468D096A F876FFFA 76FF0676 FF0876FF 02E1E9F6 5689F446 F¶.V-ÕÅ..v..v..v¹.v½j..Fõ.P.|... 000080
 E9E8468B 00003AF7 9A1A76FF 1C76FF01 9668E876 FF0017E9 03750000 3DE84689 .Fò=..u.Õ...vÒh...v..v..¼:...FòÕ 0000A0
 7502470B 26078826 E45EC404 E4468300 04E9E656 89E44689 EC5688EA 46880332 2..Fõ.V$.Fõ.V|Õ...Fõ.á^ô&..&.G.u 0000C0
 003F799A 1676FF18 76FF026A 37FF2602 77FF26E4 5EC40676 FF0876FF 00C8E903 .Õà..v..v.á^ô&.w.&.7j..v..v..y7. 0000E0
 0876FF00 003E569A 1A76FF1C 76FF0196 68E876FF 0028E903 7500003D E8468900 ..Fò=..u.Õ(..vÒh...v..v..V>...v. 000100
 1676FF18 76FF1276 FF1476FF 02C0E9E8 46880000 3E679AEA 76FFEC76 FF0676FF .v..v$.võ.g>...FòÕä..v..v..v..v. 000120
 0E76FF10 76FF37FF 260277FF 26E45EC4 0059E903 7400003D 08C4833F BF00009A ...¢?.á.=..t.ÕY.á^ô&.w.&.7.v..v. 000140
 FF019668 E876FF00 28E90375 00003DE8 46890CC4 833FE54A 529A0676 FF0876FF .v..v..RJÎ?.á..Fò=..u.Õ(. vÒh... 000160
 53E9E846 8800003E 899AEA76 FFEC76FF 0676FF08 76FF0000 3ED89A1A 76FF1C76 v..v..Ä>...v..v..v$.võ..>. .FòÕS 000180
 F27E8300 003FA69A EA76FFEC 76FF0676 FF0876FF FF25E900 03E90001 F246C702 .úF·..Õ..Õ%..v..v..v$.võ.Î?...~· 0001A0
 76FF0676 FF0876FF 0216E901 94E9F656 89F44689 FA5688F8 4688000F E9037400 .t.Õ...F½.V¹.F¶.V-Õ..Õ...v..v..v 0001C0
 9668E876 FF0017E9 03750000 3DE84689 00003D13 9A5016FC 468D236A 0A76FF0C ..v.j#.F=.P..=...Fò=..u.Õ...vÒh. 0001E0

Dump of file SATURN:[PCCOMMON.DUMP.DLL]DAATTRDF.TMP;1 on 18-APR-1990 10:39:32.72
File ID (535,11,0)   End of file block 82 / Allocated 84

Virtual block number 36 (00000024), 512 (0200) bytes

 468BF656 89F44689 0C568B0A 468B01E2 E9E8468B 00003F34 9A1A76FF 1C76FF01 ..v..v..4?...FòÕã..F..V..F¶.V-.F 000000
 0A76FF0C 76FF0676 FF0876FF 01BAE901 38E90000 F246C700 08E90374 FE460BFC =.F±t.Õ..úF·..Õ8.Õα..v..v..v..v. 000020
 1C76FF01 9668E876 FF0017E9 03750000 3DE84689 00003D6C 9A5016EA 468D236A j#.Fõ.P.l=...Fò=..u.Õ...vÒh...v. 000040
 E4468300 04E9E656 89E44689 EC5688EA 46880186 E9E8468B 00003F95 9A1A76FF .v...?...FòÕ...Fõ.V$.Fõ.V|Õ...Fõ 000060
 37FF2602 77FF26E4 5EC40676 FF0876FF 00C8E903 7502470B 26078826 E45EC404 .á^ô&..&.G.u.Õà..v..v.á^ô&.w.&.7 000080
 76FF0196 68E876FF 0028E903 7500003D E8468900 003A199A 1676FF18 76FF026A j..v..v...:...Fò=..u.Õ(..vÒh...v 0000A0
 0114E9E8 46880000 40139AEA 76FFEC76 FF0676FF 0876FF00 0040029A 1A76FF1C ..v...@...v..v..v$.võ..@...FòÕ.. 0000C0
 26E45EC4 0059E903 7400003D 08C4833A BA00009A 1676FF18 76FF1276 FF1476FF .v..v..v..v....α:.á.=..t.ÕY.á^ô& 0000E0
 00003DE8 46890CC4 833C684A 529A0676 FF0876FF 0E76FF10 76FF37FF 260277FF .w.&.7.v..v..v..v..RJh<.á..Fò=.. 000100
 FFEC76FF 0676FF08 76FF0000 3CEA9A1A 76FF1C76 FF019668 E876FF00 28E90375 u.Õ(..vÒh...v..v..õ<...v..v..v$. 000120
 76FF0676 FF0876FF FF25E900 03E90001 F246C700 A7E9E846 8B000040 359AEA76 võ.5@...FòÕÎ.úF·..Õ..Õ%..v..v..v 000140
 468DF476 FFF676FF 0676FF08 76FF007C E9037400 F27E8300 002EE79A EA76FFEC $.võ.Õ....-·.t.Õ|..v..v..v-.v¶.F 000160
 9668E876 FF0017E9 03750000 3DE84689 0000FFFF 9A006A12 76FF1476 FF5016EE Ÿ.P.v..v.j.......Fò=..u.Õ...vÒh. 000180
 76FF0E76 FF1076FF EE76FFF0 76FF0042 E9E8468B 000040B4 9A1A76FF 1C76FF01 ..v..v..Ç@...FòÕB..vÞ.vŸ.v..v..v 0001A0
 1C76FF01 9668E876 FF0017E9 03750000 3DE84689 0CC4833E 394A529A 0676FF08 ..v..RJ9>.á..Fò=..u.Õ...vÒh...v. 0001C0
 1E565700 005EC8CB C95F5E1F 0000E900 00B80006 E9E8468B 00003DE9 9A1A76FF .v..Õ=...FòÕ..|..Õ...^_èùà^..WV. 0001E0
```

```
Dump of file SATURN:[PCCOMMON.DUMP.DLL]DAATTRDF.TMP;1 on 18-APR-1990 10:39:32.72
File ID (535,11,0)   End of file block 82 / Allocated 84

Virtual block number 37 (00000025), 512 (0200) bytes

0006E903 7500003D EE468900 0039989A 5016FC46 8D0876FF 0A76FFD8 8E3CB188 |Ÿ<.Ä.v..v..F=.P..9...FŸ=..u.Õ.. 000000
06E90375 00003DEE 46890000 398C9A50 16F0468D 0876FF0A 76FF0008 E9EE4688 .FŸÕÄ..v..v..Fb.P.¥9...FŸ=..u.Õ. 000020
E9037500 003DEE46 89000039 649A5016 F4468D08 76FF0A76 FF00B7E9 EE468800 ..FŸÕñ..v..v..F¶.P.d9...FŸ=..u.Õ 000040
00003CCE 9A5016F8 468D086A FC76FFFE 76FFF076 FFF276FF 0096E9EE 46880006 ...FŸÕ...v·.vb.v±.v=j..F½.r.ö<.. 000060
6A006A01 43680676 FFF476FF F676FF00 6DE9EE46 880006E9 03750000 3DEE4689 .FŸ=..u.Õ...FŸÕm..v~.v¶.v.h  j.j 000080
76FFFA76 FFF076FF F276FF00 2CE90375 FA4608F8 46880000 38E59A00 6A006A48 Kj.j..[8...F½.F°u.Õ,..v·.vb.v·.v 0000A0
04E90020 E9EE4688 0006E903 7500003D EE468900 003DCD9A 5016A246 8D026AF8 ½j..FÅ.P.ë=...FŸ=..u.Õ...FŸÕ .Õ. 0000C0
5E1F0000 E9EE4688 00003933 9A5016A2 468D0676 FFF476FF F676FF00 A246C600 .óFÅ..v~.v¶.v..FÅ.P.39...FŸÕ...^ 0000E0
8D1476FF 1676FF00 0207C726 0E5EC4D8 8E4D01B8 1E565700 00B6C800 06CAC95F _èò..àÑ..WV.|1ä.Äá^.&ú....v..v.. 000100
F076FFF2 76FF03D9 E9E6468B 0006E903 7500003D E6468900 0041239A 5016F046 Fb.P.#A...Fl=..u.Õ...FlÕ)..v·.vb 000120
000040E1 9A5016F8 468D1476 FF1676FF 000039B8 9A5016FF 4E86804B 6A1276FF .v.jK..N..P..9...v..v..F½.P.Ää.. 000140
0041029A 5016E846 8D1476FF 1676FF03 A2E9E646 880006E9 03750000 3DE64689 .Fl=..u.Õ...FlÕÄ..v..v..FÕ.P..A. 000160
0B6AF876 FFFA76FF E876FFEA 76FF0381 E9E6468B 0006E903 7500003D E6468900 ..Fl=..u.Õ...FlÕ...võ.vÒ.v°.v½j. 000180
460BF446 8B0358E9 E6468800 06E90375 00003DE6 46890000 43F99A50 16F4468D .F¶.P.¹C...Fl=..u.Õ...FlÕX..F¶.F 0001A0
46890000 41999A50 169A468D 026AF476 FFF676FF E876FFEA 76FF0040 E90375F6 ~u.ÕM..võ.vÒ.v~.v¶j..F..P..A...F 0001C0
8342EC00 009A5016 9A468D50 16FF4E86 8D0324E9 E6468800 06E90375 00003DE6 l=..u.Õ...FlÕ$...N..P.F..P...$B. 0001E0

Dump of file SATURN:[PCCOMMON.DUMP.DLL]DAATTRDF.TMP;1 on 18-APR-1990 10:39:32.72
File ID (535,11,0)   End of file block 82 / Allocated 84

Virtual block number 38 (00000026), 512 (0200) bytes

C4834348 002A9A50 16FF4E86 8D001CE9 0303E9E6 46880006 E9037400 003D08C4 á.=..t.Õ...FlÕ..Õ....N..P.*.KC.á 000000
9668186A 019636FF 26000E06 8E006A00 6A02E4E9 E6468800 06E90374 00003004 .=..t.Õ...FlÕõ.j.j...8.&.6..j.h. 000020
003A9C9A 50523A84 8A0000B8 E876FFEA 76FF0000 3A899A50 5243288A 00008801 .|..¤(CRP..:...võ.vÒ|..¤.:RP..:. 000040
04C4833E 13002A9A 5016FF4E 868D02A1 E9E6468B 0006E903 7500003D E6468900 ..Fl=..u.Õ...FlÕÄ...N..P.*..>.á. 000060
00003EBC 9A5016FC 468D086A F476FFF6 76FFE876 FFEA76FF 013DE903 7400003D =..t.Õ=..võ.vÒ.v~.v¶j..F=.P.¥>.. 000080
FFEA76FF 000043D8 9A0A76FF 0C76FF01 9668E676 FF0022E9 03750000 3DE64689 .Fl=..u.Õ"..vlh...v..v..ÜC...võ. 0000A0
76FFF676 FF086AF8 76FFFA76 FFE876FF EA76FF02 46E9E646 88000043 CA9AE876 vÒ.òC...FlÕF..võ.vÒ.v°.v½j..v~.v 0000C0
76FF0000 440F9AE8 76FFEA76 FF0022E9 03750000 3DE64689 00003823 9A086AF4 ¶j..#;...Fl=..u.Õ"..võ.vÒ..D...v 0000E0
76FFFA76 FFE876FF EA76FF01 FEE9E646 88000044 209A0A76 FF0C76FF 019668E6 lh...v..v.. D...FlÕ±..võ.vÒ.v°.v 000100
529AE876 FFEA76FF 0022E903 7500003D E6468900 00414C9A 5016EC46 8D0C6AF8 ½j..F$.P.LA...Fl=..u.Õ"..võ.vÒ.R 000120
EE4608EC 46880189 E9E6468B 00004078 9A0A76FF 0C76FF01 9668E676 FF00003C <...vlh...v..v..xã...FlÕ¿..F$.FŸ 000140
000043B4 9A146AEC 76FFEE76 FF0C6AF8 76FFFA76 FFE876FF EA76FF00 48E90375 u.ÕH..võ.vÒ.v°.v½j..vŸ.v$j..ÇC.. 000160
FF0C76FF 019668E6 76FF0000 44C99AE8 76FFEA76 FF0022E9 03750000 3DE64689 .Fl=..u.Õ"..võ.vÒ.èD...vlh...v.. 000180
E9000041 C49A00B0 681E00E6 68F076FF F276FF01 66E9E646 88000044 BE9A0A76 v..ƒD...FlÕf..v·.vÞhl..h¯..éA..Õ 0001A0
22E90375 00003DE6 46890000 3B679A50 16FF4A86 8DE876FF EA76FF00 E1E900E4 õ.ÕÄ..võ.vÒ..J..P.g;...Fl=..u.Õ" 0001C0
E6468800 0045239A E876FFEA 76FF0000 456C9A0A 76FF0C76 FF019668 E676FF00 ..vlh...v..v..lE...võ.vÒ.#E...Fl 0001E0

Dump of file SATURN:[PCCOMMON.DUMP.DLL]DAATTRDF.TMP;1 on 18-APR-1990 10:39:32.72
File ID (535,11,0)   End of file block 82 / Allocated 84

Virtual block number 39 (00000027), 512 (0200) bytes

FF5016FF 4E868D50 169A468D 0A76FF0C 76FF0052 E90374F6 460BF446 8B0110E9 Õ...F¶.F-t.ÕR..v..v..F..P..N..P. 000000
C4834097 45EA9AF0 76FFF276 FFE876FF EA76FFFF 4AB6FFFF 4CB6FFF8 76FFFA76 v°.v½.ÑL..ÑJ..võ.vÒ.v·.vb.ÕE.ä.á 000020
0046E900 B6E9E646 8B000045 5B9AE876 FFEA76FF 0011E903 7500003D E646891C ..Fl=..u.Õ...võ.vÒ.[E...FlÕÑ.ÕF. 000040
7500003D E6468900 003C049A 5016FF4E 868D026A F476FFF6 76FFE876 FFEA76FF .võ.vÒ.v~.v¶j...N..P..<...Fl=..u 000060
00004388 9A0A76FF 0C76FF01 9668E676 FF000043 939AE876 FFEA76FF 0022E903 .Õ"..võ.vÒ..C...vlh...v..v...C.. 000080
FFEA76FF 0011E903 7500003D E6468900 003C3C9A E876FFEA 76FF006D E9E6468B .FlÕm..võ.vÒ.<<...Fl=..u.Õ...võ. 0000A0
C7260E5E C4450C38 389A00E6 681476FF 1676FF00 46E9E646 88000044 629AE876 vÒ.bD...FlÕF..v..v.hl..88.Eá^.&ú 0000C0
FF000045 D99A00A1 681476FF 1676FF00 0045CB9A 00A06814 76FF1676 FF000107 ....v..v.h...ùE...v..v.hÀ..)E... 0000E0
56570000 8AC80012 CAC95F5E 1F0000E9 E6468800 003C7C9A 009F6814 76FF1676 v..v.h...|<...FlÕ...^_èò..àα..WV 000100
468D0C6A 1276FF14 76FF0A76 FF0C76FF 0000F046 C70000FE 46C7D88E 41DDB81E .|fA.ÄüF±..úFb...v..v..v..v.j..F 000120
9A1E76FF 2076FF01 96689676 FF0017E9 03750000 30964689 00004276 9A50169C ..P.vB...F.=..u.Õ...v.h...v .v.. 000140
0A76FF0C 76FF00B2 E903759E 46089C46 8800FF4A 86C60413 E996468B 0000467A zF...F.Õ..6.J...F..F.u.Õý..v..v. 000160
9676FF00 17E90375 00003096 46890000 436C9A50 16FA468D 146A9C76 FF9E76FF .v..v.j..F°.P.lC...F.=..u.Õ...v. 000180
9C76FF9E 76FF0A76 FF0C76FF 03C9E996 46880000 46B59A1E 76FF2076 FF019668 h...v .v..çF...F.Õè..v..v..v..v. 0001A0
76FF0196 689676FF 0017E903 7500003D 96468900 0047719A 5016FF4A 868D026A j...J..P.qG...F.=..u.Õ...v.h...v 0001C0
9E76FF0C 6A1276FF 1476FF0A 76FF0C76 FF038EE9 96468800 0046F29A 1E76FF20  .v..·F...F.Õ...v..v..v..v.j..v. 0001E0
```

```
Dump of file SATURN:[PCCOMMON.DUMP.DLL]DAATTRDF.TMP;1 on 18-APR-1990 10:39:32.72
File ID (535,11,0)   End of file block 82 / Allocated 84

Virtual block number 40 (00000028), 512 (0200) bytes

 76FF2076 FF019668 9676FF00 17E90375 00003096 46890000 444C9A14 6A9C76FF .v.j..LD...F.=..u.Õ...v.h...v .v 000000
 9A5016F2 4680166A 0E76FF10 76FF0A76 FF0C76FF 0351E996 46880000 472C9A1E ..,G...F.ÕQ..v..v..v..v.j..F·.P. 000020
 0000478D 9A1E76FF 2076FF01 96689676 FF0017E9 03750000 3D964689 00003F18 .?...F.=..u.Õ...v.h...v .v...G.. 000040
 26078826 A05EC404 A0468300 04E9A256 89A04689 F4568BF2 46880317 E996468B .F.Õ...F·.V¶.F..VÅÕ...F..á^.&..& 000060
 1A76FF1C 76FF026A 37FF2602 77FF26A0 5EC40A76 FF0C76FF 0239E903 7502470B .G.u.Õ9..v..v.á^.&.w.&.7j..v..v. 000080
 0044739A 1E76FF20 76FF0196 689676FF 0028E903 75000030 96468900 0042AA9A .¯B...F.=..u.Õ(..v.h...v .v..sD. 0000A0
 76FF1676 FF1876FF 02A5E996 46880000 3DFA9AF2 76FFF476 FF0A76FF 0C76FF00 ..v..v..v¶.v·.ª=...F.ÕE..v..v..v 0000C0
 1276FF14 76FF0A76 FF0C76FF 01CAE903 7400003D 08C48348 FA00009A 1A76FF1C ..v....ªH.á.=..t.Õò..v..v..v..v. 0000E0
 76FF0028 E9037500 00309646 89000049 FC9A086A 37FF2602 77FF26A0 5EC4086A j.á^.&.w.&.7j..=I...F.=..u.Õ(..v 000100
 0000485B 9AF276FF F476FF0A 76FF0C76 FF000048 4A9A1E76 FF2076FF 01966896 .h...v .v..JH...v..v..v¶.v·.[H.. 000120
 47109A50 1698468D 096A37FF 260277FF 26A05EC4 0A76FF0C 76FF0237 E996468B .F.Õ7..v..v.á^.&.w.&.7j..F..P..G 000140
 76FF0000 48C09A1E 76FF2076 FF019668 9676FF00 28E90375 00003096 46890000 ...F.=..u.Õ(..v.h...v .v..âH...v 000160
 89FF4686 899A5688 98468801 E8E99646 88000048 D19AF276 FFF476FF 0A76FF0C ..v..v¶.v·.ÌH...F.ÕÒ..F..V...F.. 000180
 76FF0C76 FF00EAE9 03750247 08260788 26FF469E C404FF46 86830005 E9FF4896 .H.Õ....F..á.F.&..&.G.u.Õò..v..v 0001A0
 03750000 3D964689 00004699 9A5016A4 4680026A 37FF2602 77FF26FF 469EC40A .á.F.&.w.&.7j..FÊ.P..F...F.=..u. 0001C0
 F276FFF4 76FF0A76 FF0C76FF 0000493E 9A1E76FF 2076FF01 96689676 FF0039E9 Õ9..v.h...v .v..>I...v..v..v¶.v· 0001E0

Dump of file SATURN:[PCCOMMON.DUMP.DLL]DAATTRDF.TMP;1 on 18-APR-1990 10:39:32.72
File ID (535,11,0)   End of file block 82 / Allocated 84

Virtual block number 41 (00000029), 512 (0200) bytes

 FF4A868D 0161E996 46880000 494F9A98 76FF9A76 FF0A76FF 0C76FF00 0048E29A .ãH...v..v..v..v..OI...F.Õa...J. 000000
 260277FF 26FF469E C4006BE9 03740000 3D08C483 42CD0000 9A5016A4 46805016 .P.FÊ.P...ëB.á.=..t.Õk.á.F.&.w.& 000020
 39E90375 00003D96 46890CC4 8345A94A 529A0A76 FF0C76FF 1276FF14 76FF37FF .7.v..v..v..v..RJ`E.á..F.=..u.Õ9 000040
 609AF276 FFF476FF 0A76FF0C 76FF0000 49DB9A1E 76FF2076 FF019668 9676FF00 ..v.h...v .v..ÛI...v..v..v¶.v·.' 000060
 E90001F0 46C700E3 E9964688 00004982 9A9876FF 9A76FF0A 76FF0C76 FF000049 I...v..v..v..v...I...F.ÕO.úFÞ..Õ 000080
 B4E90003 E90001FE 46C70000 499E9A98 76FF9A76 FF0A76FF 0C76FFFF 01E90003 ..Õ...v..v..v..v...I..úF±..Õ..ÕÇ 0000A0
 76FF0C76 FF0077E9 037400FE 7E830000 479E9AF2 76FFF476 FF0A76FF 0C76FFFD ».v..v..v¶.v·..G...~±.t.Õw..v..v 0000C0
 76FF0017 E9037500 00309646 890000FF FF9A006A 1676FF18 76FF5016 F64680DA ..F-.P.v..v.j.......F.=..u.Õ...v 0000E0
 76FF1476 FF0A76FF 0C76FF00 68E99646 8800004A 189A1E76 FF2076FF 01966896 .h...v .v...J...F.Õh..v..v..v..v 000100
 96689676 FF0017E9 03750000 30964689 0000316D 9A086AF6 76FFF876 FF086A12 .j..v½.v-j..m1...F.=..u.Õ...v.h. 000120
 00FF4ABE 80001CE9 037400F0 7E83002B E996468B 00004630 9A1E76FF 2076FF01 ..v .v..OF...F.Õ+..-Þ.t.Õ.../J.. 000140
 5F5E1F00 00E90000 B8000044 889A00B1 681E00E6 680676FF 0876FF00 12E90375 u.Õ...v..v.hl..hÝ...D..¡..Õ...^_ 000160
 FF0C76FF 0676FF08 76FF00FA 46C600F8 46C6D88E 45F2881E 56570000 0EC8C8C9 èùà...WV.¡·E.Ä6F½.6Fª..v..v..v.¯ 000180
 88012EE9 F24688B00 06E90375 00003DF2 46890000 46149A50 16F4468D 0C6A0A76 v.j..F¶.P..F...F·=..u.Õ...F·Õ... 0001A0
 146A0E76 FF1076FF 0C6A0A76 FF0C76FF 0676FF08 76FF0032 E90374F6 460BF446 F¶.F-t.Õ2..v..v..v..v.j..v..v.j. 0001C0
 FF0876FF 00F1E900 00B800F7 E9F2468B 0006E903 7500003D F2468900 0047DF9A .ÕG...F·=..u.Õ...F·Õ%.¡..Õþ..v.. 0001E0

Dump of file SATURN:[PCCOMMON.DUMP.DLL]DAATTRDF.TMP;1 on 18-APR-1990 10:39:32.72
File ID (535,11,0)   End of file block 82 / Allocated 84

Virtual block number 42 (0000002A), 512 (0200) bytes

 8B0006E9 03750000 3DF24689 0000465E 9A5016FC 4680146A F476FFF6 76FF0676 v..v-.v¶j..F=.P.^F...F·=..u.Õ... 000000
 76FF0876 FF0A76FF 0C76FFF4 76FFF676 FF0E76FF 1076FF14 6A0C6A00 C8E9F246 F·Õà.j.j..v..v..v-.v¶.v..v..v..v 000020
 0676FF08 76FF0093 E9F2468B 0006E903 7500003D F2468914 C4834921 4BC29A06 ..ÕKI¦.á..F·=..u.Õ...F·Õ...v..v. 000040
 F24688 00 06E90375 00003DF2 46890000 4B709A50 16F84680 096AF476 FFF676FF .v-.v¶j..F½.P.pK...F·=..u.Õ...F· 000060
 9A5016FA 468D096A 0E76FF10 76FF0676 FF0876FF 005BE903 7500F87E 80006AE9 Õj..-½.u.Õ[..v..v..v..v.j..Fª.P. 000080
 76FF0029 E9037400 FA7E8000 38E9F246 8B0006E9 03750000 3DF24689 000048A4 ÊH...F·=..u.Õ...F·Õ8..-ª.t.Õ)..v 0000A0
 06E90375 00003DF2 46890000 26859A50 16F8468D 096A0E76 FF1076FF 0676FF08 ..v..v..v.j..F½.P..&...F·=..u.Õ. 0000C0
 76FFD88E 4A5AB81E 56570000 02C8C8C9 5F5E1F00 00E90000 B80006E9 F24688 00 ..F·Õ..¡..Õ...^_èùà...WV.¡ZJ.Ä.v 0000E0
 003DFE46 89000046 D69A1676 FF0E76FF 1076FF18 76FF0A76 FF0C76FF 0676FF08 ..v..v..v..v..v¯..v..v..øF...F±=. 000100
 76FF1476 FF1876FF 0A76FF0C 76FF0676 FF0876FF 0034E9FE 46880006 E9037500 .u.Õ...F±Õ4..v..v..v..v..v..v..v 000120
 0000E900 00B80006 E9FE468B 0006E903 7500003D FE468900 004AB19A 1676FF12 ..v..ÝJ...F±=..u.Õ...F±Õ..¡..Õ.. 000140
 0041F59A 5016FC46 8D0876FF 0A76FFD8 8E48CAB8 1E565700 0006C8CB C95F5E1F .^_èùà...WV.¡ÒK.Ä.v..v..F=.P.%A. 000160
 00004C83 9A00F268 FC76FFFE 76FF008E E9FA468B 0006E903 7500003D FA468900 ..Fª=..u.Õ...FªÕƒ..v±.v=h·...L.. 000180
 00004CA3 9A006A50 5200004C 9A9A00EB 68FC76FF FE76FF00 004C8C9A 006A5052 RPj...L...v±.v=hŠ...L..RPj..ÈL.. 0001A0
 00EF68FC 76FFFE76 FF00004C BA9A006A 50520000 4CB19A00 ED68FC76 FFFE76FF .v±.v=hÙ..ÝL..RPj..¤L...v±.v=hÿ. 0001C0
 006A5052 00004CDF 9A00EA68 FC76FFFE 76FF0000 4CD19A00 6A505200 004CC89A .àL..RPj..ÌL...v±.v=hõ..ÕL..RPj. 0001E0
```

```
Dump of file SATURN:[PCCOMMON.DUMP.DLL]DAATTRDF.TMP;1 on 18-APR-1990 10:39:32.72
File ID (535,11,0)   End of file block 82 / Allocated 84

Virtual block number 43 (0000002B), 512 (0200) bytes

 FFFE76FF 00004CFF 9A006A50 5200004C F69A00EC 68FC76FF FE76FF00 004CE89A .ÒL...v±.v=h§..-L..RPj...L...v±. 000000
 00055A9A 00F168FC 76FFFE76 FF00004D 169A006A 50520000 4D0D9A00 EE68FC76 v=hŸ...M..RPj...M...v±.v=hþ..Z.. 000020
 3DB81E56 57000006 C80006CA C95F5E1F 0000E9FA 46880000 FFFF9A00 6A505200 .RPj.......F*Õ...^_èò..à...WV.¡= 000040
 46880006 E9037500 003DFA46 8900004C 4D9A5016 FC468008 76FF0A76 FFD88E4C L.Ä.v..v..F•.P.ML...F*=..u.Õ...F 000060
 76FFFE76 FF00004D 7E9A006A 50520000 4D759A00 E468FC76 FFFE76FF 00ECE9FA *Õ§..v±.v=hõ..uM..RPj..~M...v±.v 000080
 00004DA3 9A00E168 FC76FFFE 76FF0000 4D959A00 6A505200 004D8C9A 00E268FC •hã...M..RPj...M...v±.v=hÂ..ÈM.. 0000A0
 00004DC3 9A006A50 5200004D BA9A00DF 68FC76FF FE76FF00 004DAC9A 006A5052 RPj..¯M...v±.v=hÔ..¤M..RPj..ÚM.. 0000C0
 00DB68FC 76FFFE76 FF00004D DA9A006A 50520000 4DD19A00 DE68FC76 FFFE76FF .v±.v•hB..ÌM..RPj..ÒM...v±.v•hÙ. 0000E0
 006A5052 00004DFF 9A000C68 FC76FFFE 76FF0000 4DF19A00 6A505200 004DE89A .ÒM..RPj..þM...v±.v•hÉ...M..RPj. 000100
 FFFE76FF 00004E1F 9A006A50 5200004E 169A00E0 68FC76FF FE76FF00 004E089A ..N...v±.v=hÁ...N..RPj...N...v±. 000120
 004C6C9A 000068FC 76FFFE76 FF00004E 369A006A 50520000 4E2D9A00 E368FC76 v=hO..-N..RPj..6N...v±.v=hÌ..lL. 000140
 2FB81E56 5700001A C80006CA C95F5E1F 0000E9FA 46880000 4C759A00 6A505200 .RPj..uL...F*Õ...^_èò..à...WV.¡/ 000160
 003DE646 89000042 4D9A5016 EA468D14 76FF1676 FF000407 C7260E5E C4D88E4D M.Äé^.&ú....v..v..F̄õ.P.MB...F|=. 000180
 3DE64689 0000422C 9A5016F8 468D1476 FF1676FF 0108E9E6 46880006 E9037500 .u.Õ...F|Õ...v..v..F½.P.,B...F|= 0001A0
 E6468900 004D3F9A 5016F046 8D1476FF 1676FF00 EAE9E646 880006E9 03750000 ..u.Õ...F|Õõ..v..v..Fþ.P.7M...F| 0001C0
 46890000 12B99A50 16EE468D 1476FF16 76FF00C9 E9E64688 0006E903 7500003D =..u.Õ...F|Õè..v..v..FŸ.P.¿....F 0001E0

Dump of file SATURN:[PCCOMMON.DUMP.DLL]DAATTRDF.TMP;1 on 18-APR-1990 10:39:32.72
File ID (535,11,0)   End of file block 82 / Allocated 84

Virtual block number 44 (0000002C), 512 (0200) bytes

 89000006 1C9A5016 E8468D14 76FF1676 FF00A8E9 E6468800 06E90375 00003DE6 |=..u.Õ...F|Õ´..v..v..FÒ.P...... 000000
 000029A1 9A5016F4 468D1476 FF1676FF 0087E9E6 46880006 E9037500 003DE646 F|=..u.Õ...F|Õ...v..v..F¶.P.À).. 000020
 9A5016FC 468D00F8 681476FF 1676FF00 66E9E646 880006E9 03750000 3DE64689 .F|=..u.Õ...F|Õf..v..v.h½..F=.P. 000040
 E9037444 017F8026 FC5EC400 42E9E646 880006E9 03750000 3DE64689 0000291D .)...F|=..u.Õ...F|ÕB.á^•&...Dt.Õ 000060
 76FF01F1 68006A1D AF68E876 FF105789 260E4789 26FA5688 F8468BF4 5EC40027 '.á^¶.F½.V*&.G.&.W..vÒh€.j.hþ..v 000080
 14C80012 CAC95F5E 1F0000E9 E6468800 0307C726 0E5EC400 00FFFF9A F876FFFA *.v½.....á^.&ú....F|Õ...^_èò..à. 0000A0
 EC468900 004F309A 5016FA46 800676FF 0876FF0A 76FFD88E 4E4FB81E 56570000 ..WV.¡ON.Ä.v..v..v..F*.P.ÕO...F§ 0000C0
 46890000 4E679A50 16EE468D 0876FF0A 76FF0135 E9EC4688 0006E903 7500003D =..u.Õ...F§Õ5..v..v..FŸ.P.gN...F 0000E0
 8900004E A99A5016 F2468D08 76FF0A76 FF0114E9 EC468800 06E90375 00003DEC §=..u.Õ...F§Õ...v..v..F·.P.`N... 000100
 00004E88 9A5016F6 468D0876 FF0A76FF 00F3E9EC 46880006 E9037500 003DEC46 F§=..u.Õ...F§Õµ..v..v..F~.P..N.. 000120
 8B046AF6 76FFF876 FFEE76FF F076FF00 D2E9EC46 880006E9 03750000 3DEC4689 .F§=..u.Õ...F§Õ®..vþ.vŸ.v½.v-j.. 000140
 8A26FA5E C400A8E9 8EB98800 06E90375 00003D00 0048E9A 505240FC 568BFA46 F*.V=ƏRP.>K..=..u.Õ..|¿.Õ¨.á^*&. 000160
 50809A00 6A505200 0050849A 010168F2 76FFF476 FF00F6FE 46C70063 E9980147 G..Õc.úF±-..v¶.v·h....P..RPj...P 000180
 0050AC9A 006A5052 000050A3 9A010168 F276FFF4 76FF00F7 FE46C700 5FE90000 ..Õ_.úF±¼..v¶.v·h...ÈP..RPj..¯P. 0001A0
 00004D67 9A016A50 5200004D 5E9A0101 68F276FF F476FF00 F8FE46C7 0040E900 .Õa¯.úF±½..v¶.v·h...^M..RPj..gM.. 0001C0
 A4E90375 00533DFF 8DE90375 004D3DFF D3E90375 00443000 1BE9001E E90021E9 Õ!.Õ..Õ..=D.u.ÕŒ.=M.u.Õ..=S.u.ÕÊ 0001E0

Dump of file SATURN:[PCCOMMON.DUMP.DLL]DAATTRDF.TMP;1 on 18-APR-1990 10:39:32.72
File ID (535,11,0)   End of file block 82 / Allocated 84

Virtual block number 45 (0000002D), 512 (0200) bytes

 0000B800 0041769A 006A006A 016A006A 012568FE 76FFF276 FFF476FF FFDFE9FF .ÕÕ..v¶.v·.v±h%.j.j.j.j..vA..¡.. 000000
 C7260E5E C40000EE 46C7D88E 4F96B81E 56570000 12C80006 CAC95F5E 1F0000E9 Õ...^_èò..à...WV.¡.O.ÄúFŸ..á^.&ú 000020
 06E90375 000030EE 46890000 4FA99A50 16FC468D 1276FF14 76FF1676 FF000207 ....v..v..v..F=.P.`O...FŸ=..u.Õ. 000040
 E9037500 0030EE46 8900004F CA9A5016 F0468D14 76FF1676 FF01E6E9 EE468800 ..FŸÕ|..v..v..Fþ.P.òO...FŸ=..u.Õ 000060
 03750000 30EE4689 00004FE8 9A5016F4 468D1476 FF1676FF 01C5E9EE 46880006 ...FŸÕé..v..v..F¶.P.ŠO...FŸ=..u. 000080
 7500003D EE468900 00500C9A 5016F846 8D1476FF 1676FF01 A4E9EE46 880006E9 Õ...FŸÕÈ..v..v..F½.P..P...FŸ=..u 0000A0
 010168F4 76FFF676 FF4D07C6 26FC5EC4 0066E912 46880183 E9EE4688 0006E903 .Õ...FŸÕ...F.Õf.á^=&6.M.v~.v¶h.. 0000C0
 0168F476 FFF676FF 5307C626 FC5EC400 60E90000 51089A00 6A505200 0051D29A .ØQ..RPj..ÙQ..Õ'.á^=&6.S.v~.v¶h. 0000E0
 68F476FF F676FF44 07C626FC 5EC4003F E9000051 FC9A006A 50520000 51F39A01 ..µQ..RPj..=Q..Õ?.á^=&6.D.v~.v¶h 000100
 F73DFF92 E9037500 F63D001B E9001EE9 0000506E 9A016A50 52000050 659A0101 ...eP..RPj..nP..Õ..Õ..=-.u.Õ..=% 000120
 03750147 3826FC5E C4078A26 FC5EC400 00E9FFC4 E9037500 F83DFFAB E9037500 .u.Õ¨.=½.u.Õ6.Õ..á^•&..á^=&8G.u. 000140
 431A9A50 52525C8A 0000B801 9668156A 019636FF 2600DE06 8E006A00 6A00B2E9 Õý.j.j...B.&.6..j.h..¡..¤\RRP..C 000160
 0006E903 7500003D EE468900 0043209A 50524315 BA000088 F076FFF2 76FF0000 ...v·.vþ|..¤.CRP.-C...FŸ=..u.Õ.. 000180
 89000045 459AFC76 FFFE76FF 046AF876 FFFA76FF F076FFF2 76FF00A7 E9EE4688 .FŸÕÌ..v·.vþ.v*.v½j..v±.v=.EE... 0001A0
 76FF0C76 FF019668 EE76FF00 0045939A F076FFF2 76FF0022 E9037500 003DEE46 FŸ=..u.Õ"..v·.vþ..E...vŸh...v..v 0001C0
 E9037500 0030EE46 89000045 7D9AF076 FFF276FF 0061E9EE 46880000 47FB9A0A ..«G...FŸÕa..v·.vþ.)E...FŸ=..u.Õ 0001E0
```

```
Dump of file SATURN:[PCCOMMON.DUMP.DLL]DAATTRDF.TMP;1 on 18-APR-1990 10:39:32.72
File ID (535,11,0)   End of file block 82 / Allocated 84

Virtual block number 46 (0000002E), 512 (0200) bytes

 1676FF00 0107C726 0E5EC401 478826FC 5EC4078A 26FC5EC4 0045E9EE 46880006 ...FŸÕE.á^•&..á^•&.G.á^.&ú....v. 000000
 681476FF 1676FF00 0053139A 00A16814 76FF1676 FF000053 059A00A0 681476FF .v.h....S...v..v.hÀ...S...v..v.h 000020
 D88E5102 881E5657 00005AC8 0012CAC9 5F5E1F00 00E9EE46 88000045 8D9A009F ...§E...FŸÕ...^_èò..àZ..WV.¦.Q.Ä 000040
 9DE9F246 880006E9 03750000 3DF24689 00005185 9A5016FC 468D0876 FF0A76FF .v..v..F•.P..Q.¯.F·=..u.Õ...F·Õ. 000060
 E9F24688 0006E903 7500003D F2468900 0051439A 5016F446 8D0876FF 0A76FF00 ..v..v..F¶.P.CQ...F·=..u.Õ...F·Õ 000080
 F2468800 06E90375 00003DF2 46890000 51649A50 16F8468D 0876FF0A 76FF007C |..v..v..F½.P.dQ...F·=..u.Õ...F· 0000A0
 FFF676FF 000050E9 9A006A00 6A4B6A00 6A014368 0676FFF8 76FFFA76 FF005BE9 Õ[..v¹.v½.v.hC.j.jKj.j..ÕP...v¬. 0000C0
 880006E9 03750000 3DF24689 00005039 9A5016A6 468D066A FC76FFFE 76FFF476 v¶.v±.v•j..FÌ.P.9P...F·=..u.Õ... 0000E0
 5E1F0000 E9F24688 00004A43 9A5016A6 46800676 FFF876FF FA76FF00 19E9F246 F·Õ...v¹.v½.v..FÌ.P.CJ...F·Õ...^ 000100
 8D1476FF 1676FF00 0207C726 0E5EC4D8 8E532C88 1E565700 00A6C800 06CAC95F _èò..àÌ..WV.¦,S.Äá^.&ú....v..v.. 000120
 1476FF16 76FF0179 E9F24688 0006E903 7500003D F2468900 00533C9A 5016FC46 F•.P.<S...F·=..u.Õ...F·Õy..v..v. 000140
 76FF1676 FF0158E9 F2468800 06E90375 00003DF2 46890000 53509A50 16F4468D .F¶.P.]S...F·=..u.Õ...F·ÕX..v..v 000160
 FFFA76FF 0137E9F2 46880006 E9037500 003DF246 89000053 7E9A5016 F8468D14 ..F½.P.~S...F·=..u.Õ...F·Õ7..v¹. 000180
 066AFC76 FFFE76FF F476FFF6 76FF0000 421C9A50 16FF5A86 804B6A12 76FFF876 v½.v.jK..Z..P..B...v¬.v¶.v±.v•j. 0001A0
 5016A646 8D00F8E9 F2468800 06E90375 00003DF2 46890000 53C09A50 16A6468D .FÌ.P.âS...F·=..u.Õ...F·Õ½..FÌ.P 0001C0
 FF26000E 068E006A 006A00A5 E9037500 003D08C4 83478700 009A5016 FF5A868D ..Z..P...ñG.á.=..u.ÕÉ.j.j...B.&. 0001E0

Dump of file SATURN:[PCCOMMON.DUMP.DLL]DAATTRDF.TMP;1 on 18-APR-1990 10:39:32.72
File ID (535,11,0)   End of file block 82 / Allocated 84

Virtual block number 47 (0000002F), 512 (0200) bytes

 49BA0000 B8F476FF F676FF00 00524E9A 505254EF BA0000B8 01966816 6A019636 6..j.h..¦..¤ÿTRP.NR...v¬.v¶¦..¤I 000000
 FFF476FF F676FF00 9AE9F246 880006E9 03750000 3DF24689 00005261 9A505252 RRP.aR...F·=..u.Õ...F·Õ...v¬.v¶. 000020
 F676FF00 22E90375 00003DF2 46890000 52889A50 16FF5A86 8D066AFC 76FFFE76 v±.v•j...Z..P..R...F·=..u.Õ"..v¬ 000040
 FF0054E9 F2468800 0052829A 0A76FF0C 76FF0196 68F276FF 000052A1 9AF476FF .v¶.ÀR...v·h...v..v..ýR...F·ÕT.. 000060
 C7260E5E C40038E9 F2468800 06E90375 00003DF2 46890000 52C39AF4 76FFF676 v¬.v¶.ÙR...F·=..u.Õ...F·Õ8.á^.&ú 000080
 FF000055 999A00A1 681476FF 1676FF00 0055889A 00A06814 76FF1676 FF000107 ....v..v.h....U...v..v.hÀ...U... 0000A0
 56570000 12C80012 CAC95F5E 1F0000E9 F2468800 0052F79A 009F6814 76FF1676 v..v.h...÷R...F·Õ...^_èò..à...WV 0000C0
 7500003D EE468900 0051229A 5016F046 8D0676FF 0876FF0A 76FFD88E 53FD881E .¦»S.Ä.v..v..v..FÞ.P.ªQ...FŸ=..u 0000E0
 00003DEE 46890000 54369A50 16F4468D 0876FF0A 76FF0005 E9EE4688 0006E903 .Õ...FŸÕ(..v..v..F¶.P.6T...FŸ=.. 000100
 003DEE46 89000054 579A5016 F8468D08 76FF0A76 FF00B4E9 EE468800 06E90375 u.Õ...FŸÕÇ..v..v..F½.P.WT...FŸ=. 000120
 3DEE4689 00005415 9A5016FC 468D0876 FF0A76FF 0093E9EE 46880006 E9037500 .u.Õ...FŸÕ...v..v..F•.P..T...FŸ= 000140
 5688F046 88036AFC 76FFFE76 FFF476FF F676FF00 72E9EE46 880006E9 03750000 ..u.Õ...FŸÕr..v¬.v¶.v±.v•j..FÞ.V 000160
 7459017F 8026F05E C40048E9 8E898800 06E90375 00003D00 0054969A 505240F2 ·ƏRP..T..=..u.Õ..¦¿.ÕH.á^Þ&...Yt 000180
 0019E900 0056A59A 006A006A 016A006A 01256800 FB68F876 FFFA76FF 001CE903 .Õ...v¹.v½h«.h%.j.j.j.j..EV..Õ.. 0001A0
 1F0000E9 0000B800 0053A89A 006A006A 006A006A 01256800 FB68F876 FFFA76FF .v¹.v½h«.h%.j.j.j.j..´S..¦..Õ... 0001C0
 FF000207 C7260E5E C40000EE 46C7D88E 55828B1E 56570000 12C80006 CAC95F5E ^_èò..à...WV.¦ÿU.ÄúFŸ..á^.&ú.... 0001E0

Dump of file SATURN:[PCCOMMON.DUMP.DLL]DAATTRDF.TMP;1 on 18-APR-1990 10:39:32.72
File ID (535,11,0)   End of file block 82 / Allocated 84

Virtual block number 48 (00000030), 512 (0200) bytes

 EE468800 06E90375 00003DEE 46890000 55C59A50 16F0468D 1276FF14 76FF1676 v..v..v..FÞ.P.éU...FŸ=..u.Õ...FŸ 000000
 46880006 E9037500 003DEE46 89000055 E69A5016 F4468D14 76FF1676 FF01BBE9 ÕÉ..v..v..F¶.P.ÌU...FŸ=..u.Õ...F 000020
 880006E9 03750000 3DEE4689 00005607 9A5016F8 468D1476 FF1676FF 019AE9EE ŸÕ...v..v..F½.P..V...FŸ=..u.Õ... 000040
 0006E903 7500003D EE468900 0056289A 5016FC46 8D1476FF 1676FF01 79E9EE46 FŸÕy..v..v..F•.P.(V...FŸ=..u.Õ.. 000060
 3D000056 899A006A 006A006A 006A0124 6800FB68 F876FFFA 76FF0158 E9EE4688 .FŸÕX..v¹.v½h«.h$.j.j.j.j...V..= 000080
 5EC4078A 26F05EC4 4E07C626 F05EC400 07E95907 C626F05E C4000AE9 03750000 ..u.Õ..á^Þ&6.YÕ..á^Þ&6.Ná^Þ&..á^ 0000A0
 BA000088 01966813 6A019636 FF26000E 068E006A 006A000C E9037501 473826F0 Þ&8G.u.ÕÉ.j.j...B.&.6..j.h. ¦..¤ 0000C0
 3DEE4689 000054F4 9A505254 DCBA0000 B8F476FF F676FF00 0054E19A 505257C3 ÜWRP.ÄT...v¬.v¶¦..¤ÉTRP.¶T.. ªŸ= 0000E0
 76FF00C0 E9EE4688 0000582A 9A0A76FF 0C76FF01 9668EE76 FF0017E9 03750000 ..u.Õ...vŸh...v..v..*X...FŸÕå..v 000100
 E9037500 003DEE46 89000055 1E9AF076 FFF276FF 036AFC76 FFFE76FF F476FFF6 -.v¶.v±.v•j..v·.vÞ..U...FŸ=..u.Õ 000120
 5EC40000 585F9A0A 76FF0C76 FF019668 EE76FF00 0055349A F476FFF6 76FF002A *..v¬.v¶.4U...vŸh...v..v.._X..á^ 000140
 E9037500 003DEE46 89000055 569AF476 FFF676FF 0072E9EE 46880002 07C7260E .&ú....FŸÕr..v¬.v¶.VU...FŸ=..u.Õ 000160
 C4078A26 F05EC400 45E9EE46 88000055 459A0A76 FF0C76FF 019668EE 76FF0017 ...vŸh...v..v..EU...FŸÕE.á^Þ&..á 000180
 FF1676FF 00005896 9A00A068 1476FF16 76FF0001 07C7260E 5EC40147 8826F05E ^Þ&.G.á^.&ú....v..v.h....X...v.. 0001A0
 5E1F0000 E9EE4688 0000557D 9A009F68 1476FF16 76FF0000 58A49A00 A1681476 v.hÀ..ÊX...v..v.h...)U...FŸÕ...^ 0001C0
 9A5016F0 468D0676 FF0876FF 0A76FFD8 8E568EB8 1E565700 0012C800 12CAC95F _èò..à...WV.¦/V.Ä.v..v..v..FÞ.P. 0001E0
```

```
Dump of file SATURN:[PCCOMMON.DUMP.DLL]DAATTRDF.TMP;1 on 18-APR-1990 10:39:32.72
File ID (535,11,0)   End of file block 82 / Allocated 84

Virtual block number 49 (00000031), 512 (0200) bytes

 5016F446 8D0876FF 0A76FF00 D5E9EE46 8B0006E9 03750000 3DEE4689 0000560E 8V...FŸ=..u.Õ...FŸÕ{..v..v..F¶.P 000000
 16F8468D 0876FF0A 76FF00B4 E9EE468B 0006E903 7500003D EE468900 0056FF9A ..V...FŸ=..u.Õ...FŸÕÇ..v..v..F%. 000020
 FC468D08 76FF0A76 FF0093E9 EE468B00 06E90375 000030EE 46890000 57209A50 P. W...FŸ=..u.Õ...FŸÕ...v..v..F= 000040
 76FFF476 FFF676FF 0072E9EE 468B0006 E9037500 0030EE46 89000057 419A5016 .P.AW...FŸ=..u.Õ...FŸÕr..v−.v¶.v 000060
 E98EB988 0006E903 7500003D 00005655 9A505240 F2568BF0 468B056A FC76FFFE ±.v=j..FÞ.V·ØRP.UV..=..u.Õ..|¿.Õ 000080
 6A016A00 6A012568 00FC68F8 76FFFA76 FF001CE9 03745301 7F8026F0 5EC40048 H.á^Þ&...St.Õ...v'.v½h=.hX.j.j.j 0000A0
 9A006A00 6A006A00 6A012568 00FC68F8 76FFFA76 FF0019E9 000059B0 9A006A00 .j..¯Y..Õ...v'.v½h=.hX.j.j.j.j.. 0000C0
 EE46C7D8 8E588DB8 1E565700 0012C800 06CAC95F 5E1F0000 E90000B8 00005768 kW..|..Õ...^_èò..à...WV.|§X.ÀúFŸ 0000E0
 EE468900 0058D09A 5016F046 8D1276FF 1476FF16 76FF0004 07C7260E 5EC40000 ..á^.&ú....v..v..v..FÞ.P.ÀX...FŸ 000100
 46890000 58F19A50 16F4468D 1476FF16 76FF0191 E9EE468B 0006E903 75000030 =..u.Õ...FŸÕ...v..v..F¶.P.þX...F 000120
 89000059 129A5016 F8468D14 76FF1676 FF0170E9 EE468B00 06E90375 00003DEE Ÿ=..u.Õ...FŸÕp..v..v..F%.P..Y... 000140
 00005933 9A5016FC 468D1476 FF1676FF 014FE9EE 468B0006 E9037500 0030EE46 FŸ=..u.Õ...FŸÕO..v..v..F=.P.3Y.. 000160
 6A006A01 246800FC 68F876FF FA76FF01 2EE9EE46 8B0006E9 03750000 3DEE4689 .FŸ=..u.Õ...FŸÕ...v'.v½h=.h$.j.j 000180
 26F05EC4 0007E953 07C626F0 5EC4000A E9037500 00300000 59949A00 6A006A00 .j.j...Y..=..u.Õ..á^Þ&6.SÕ..á^Þ& 0001A0
 36FF2600 DE068E00 6A006A00 B2E90375 01473826 F05EC407 8A26F05E C45507C6 6.Uá^Þ&..á^Þ&8G.u.Õý.j.j...8.&.6 0001C0
 57B0BA00 00B8F476 FFF676FF 000057B5 9A50525A CEBA0000 B8019668 146A0196 ..j.h..|..pöZRP.çW...v−.v¶i..ø¯W 0001E0

Dump of file SATURN:[PCCOMMON.DUMP.DLL]DAATTRDF.TMP;1 on 18-APR-1990 10:39:32.72
File ID (535,11,0)   End of file block 82 / Allocated 84

Virtual block number 50 (00000032), 512 (0200) bytes

 76FFF476 FFF676FF 00A7E9EE 468B0006 E9037500 0030EE46 89000057 C89A5052 RP.ÈW...FŸ=..u.Õ...FŸÕ§..v−.v¶.v 000000
 FFF676FF 0022E903 7500003D EE468900 0058039A F076FFF2 76FF056A FC76FFFE ±.v=j..v·.vÞ..X...FŸ=..u.Õ"..v−. 000020
 76FF0061 E9EE468B 000057E4 9A0A76FF 0C76FF01 9668EE76 FF000058 199AF476 v¶..X...vŸh...v..v..ÕW...FŸÕa..v 000040
 078A26F0 5EC40045 E9EE468B 0006E903 75000030 EE468900 0058439A F476FFF6 −.v¶.CX...FŸ=..u.Õ...FŸÕE.á^Þ&.. 000060
 1676FF00 0058779A 00A06814 76FF1676 FF000107 C7260E5E C4014788 26F05EC4 á^Þ&.G.á^.&ú....v..v.h...w[...v. 000080
 1F0000E9 EE468B00 0058889A 009F6814 76FF1676 FF000058 859A00A1 681476FF .v.hÀ...[...v..v.h....X...FŸÕ... 0000A0
 4688FA56 89F84689 0C5688OA 4688088E 59C9881E 56570000 0EC80012 CAC95F5E ^_èò..à...WV.|èY.Ä.F..V..F%.V'.F 0000C0
 0C9A5016 FC468D0E 76FF1076 FF0066E9 078826F8 5EC4F656 89F44689 08568806 .¯V..F¶.V−á^½&..Õf..v..v..F=.P.. 0000E0
 C4105788 260E4788 26FC5EC4 0056E9F2 46880006 E9037500 0030F246 8900004F O...F·=..u.Õ...F·ÕV.á^=&.G.&.W.6 000100
 26000088 F85EC400 28E90789 26024789 26000088 F45EC402 57892607 8926F85E ^½&..&.W.á^¶|..&.G.&..Õ+.á^½|..& 000120
 92E90375 00683000 08E9000E E9078926 02478926 000088F4 5EC40789 26024789 .G.&..á^¶|..&.G.&..Õ..Õ..=h.u.Õ. 000140
 0876FFD8 8E5B9EB8 1E565700 0018C800 0CCAC95F 5E1F0000 E9000088 FFD5E9FF .Õf.|..Õ...^_èò..à...WV.|.[.Ä.v. 000160
 0876FF00 004ECA9A 5016FA46 8D0676FF 0876FF00 005A2B9A 5016F646 8D0676FF .v..F−.P.+Z...v..v..F'.P.òN...v. 000180
 46890000 FFFF9A50 16EE468D 1A6A1E6A FA76FF00 005A0A9A 5016F246 8D0676FF .v..F·.P..Z...v'j.j..FŸ.P......F 0001A0
 18E90000 B80000FF FF9A00B2 681EEC76 FFF676FF F876FF00 18E90375 000030EC $=..u.Õ...v½.v−.vš.hý......|..Õ. 0001C0
 00003000 0044A29A 5016E846 8DF276FF F476FFFE 5689FC46 89F0568B EE468801 ..FŸ.VÞ.F=.V±.v¶.v·.FÒ.P.ÀD..=.. 0001E0

Dump of file SATURN:[PCCOMMON.DUMP.DLL]DAATTRDF.TMP;1 on 18-APR-1990 10:39:32.72
File ID (535,11,0)   End of file block 82 / Allocated 84

Virtual block number 51 (00000033), 512 (0200) bytes

 EE5EC400 DCE90000 B80000FF FF9A00C0 681EEC76 FFF676FF F876FF00 18E90375 u.Õ...v½.v−.v&.hâ......|..Õ£.á^Ÿ 000000
 5688FC46 88044789 26064789 26000088 EE5EC402 57892607 8926EA56 88E8468B .FÒ.VÕ&..&.W.á^Ÿ|..&.G.&.G..F=.V 000020
 0676FF08 76FFFC76 FFFE76FF 08C483FF FF18B39A 0676FF08 76FF5052 001205FE ±...RP.v..v..'....á..v±.v=.v..v. 000040
 680676FF 0876FF00 00FFFF9A EE76FFF0 76FF0676 FF0876FF 08C4835D 505D009A .Å]P].á..v..v..vÞ.vŸ......v..v.h 000060
 680676FF 0876FF00 00FFFF9A 006A006A 0676FF08 76FF0000 FFFF9AFF FF685D70 p]h........v..v.j.j.......v..v.h 000080
 76FF0876 FF0000FF FF9AFFFF 685D9268 0676FF08 76FF0000 FFFF9AFF FF685D81 .]h........v..v.h.]h.......v..v 0000A0
 0876FF00 00FFFF9A FFFF684B 14680676 FF0876FF 0000FFFF 9AFFFF68 5DA36806 .hÈ]h........v..v.h.Kh........v. 0000C0
 0004CAC9 5F5E1F00 00E90000 B80000FF FF9A0196 36FF2600 DE068E0E 6A0676FF .v.j...B.&.6.......|..Õ...^_èò.. 0000E0
 0A0A47C6 260A5EC4 FC5689FA 46890C56 8B0A468B D88E5C49 B81E5657 00000CC8 à...WV.|I\.Ä.F..V..F'.V=á^.&6G.. 000100
 0A0C47C6 260A5EC4 0A0947C6 260A5EC4 0A0847C6 260A5EC4 0A0847C6 260A5EC4 á^.&6G..á^.&6G..á^.&6G..á^.&6G.. 000120
 006A006A FFFF68FF FF68FFFF 68FFFF68 776A0676 FF0876FF 0A0047C6 260A5EC4 á^.&6G...v..v.jwh..h..h..h..j.j. 000140
 6A006A01 6AFFFF68 5E6568FF FF685E46 68766A06 76FF0876 FF00005E 529A006A j..R^...v..v.jvhF^h..he^h..j.j.j 000160
 006A006A 016AFFFF 685F4C68 FFFF68FF FF686E6A 0676FF08 76FF0000 5E719A00 ..q^...v..v.jnh..h..hL_h..j.j.j. 000180
 9A006A00 6A006AFF FF68FFFF 68FFFF68 FFFF6879 6A0676FF 0876FF00 005E909A ..^...v..v.jyh..h..h..h..j.j.j.. 0001A0
 FF00005E C89A0000 681E016A 006A006A 006A006A 706A0676 FF0876FF 00005EA8 ¨^...v..v.jpj.j.j.j.j..h...à^... 0001C0
 FF0876FF 00005EE6 9A000068 1E016A00 6A006AFF FF68FFFF 68736A06 76FF0876 v..v.jsh..h..j.j.j..h...ì^...v.. 0001E0
```

```
Dump of file SATURN:[PCCOMMON.DUMP.DLL]DAATTRDF.TMP;1 on 18-APR-1990 10:39:32.72
File ID (535,11,0)   End of file block 82 / Allocated 84

Virtual block number 52 (00000034), 512 (0200) bytes

0676FF08 76FF0000 5F049A00 00681E00 6AFFFF68 FFFF6800 6A006A01 2C680676 v.h,.j.j.h..h..j..h...._...v..v. 000000
2E680676 FF0876FF 00005F22 9A000068 1E006AFF FF68FFFF 68006A00 6A012D68 h-.j.j.h..h..j..h..."_...v..v.h. 000020
6A00C968 0676FF08 76FF0000 5F3E9A00 00681E00 6AFFFF68 FFFF6800 6A006A01 .j.j.h..h..j..h...>_...v..v.hè.j 000040
FF685FF9 6800CB68 0676FF08 76FF0000 5F5C9A00 16681E01 6A006A00 6A006A00 .j.j.j.j..h...\_...v..v.hù.h*_h. 000060
00005C69 9A5016FE 46800676 FF0876FF 00005FCD 9A001668 1E016A00 6A006AFF .j.j.j..h...ë_...v..v..F±.P.i\.. 000080
68000468 00006800 CE684B6A FE76FF05 CAE9F446 880006E9 03750000 3DF44689 .F¶=..u.Õ...F¶Òò..v±jKhö.hÅ.hå.h 0000A0
F4468800 06E90375 00003DF4 46890000 FFFF9A50 16F64680 01376801 36680135 5.h6.h7..F-.P......F¶=..u.Õ...F¶ 0000C0
005FE89A F676FFF8 76FF016A 006A006A 006A006A 00006806 76FF0876 FF0598E9 Õ...v..v.hÅ.j.j.j.j.j..v½.v-.Š_. 0000E0
FF000060 089AF676 FFF876FF 016A006A 006A006A 006A00CE 680676FF 0876FF00 ..v..v.hö.j.j.j.j.j.j..v½.v  .'... 000100
FF000060 289AF676 FFF876FF 016A006A 006AFFFF 68601D68 00046806 76FF0876 v..v.hå.h.'h..j.j.j..v½.v-. '... 000120
FF000060 489AF676 FFF876FF 006AFFFF 68603D68 006A006A 01356806 76FF0876 v..v.h5.j.j.h='h..j..v½.v-.K'... 000140
FF000060 689AF676 FFF876FF 006AFFFF 68605D68 006A006A 01366806 76FF0876 v..v.h6.j.j.h]'h..j..v½.v-.k'... 000160
FF000060 879AF676 FFF876FF 006AFFFF 68609568 006A006A 01376806 76FF0876 v..v.h7.j.j.h.'h..j..v½.v-..'... 000180
76FF0876 FF000060 A59A0058 681E016A 006A006A 006A006A 00066806 76FF0876 v..v.h•.j.j.j.j.j..hX..E'...v..v 0001A0
680676FF 0876FF00 0060C39A 0058681E 016A006A 006AFFFF 6860B768 00096806 .h}.hñ'h..j.j.j..hX..û'...v..v.h 0001C0
01396806 76FF0876 FF000060 E19A0058 681E006A FFFF6860 D568006A 006A0138 8.j.j.h('h..j..hX..Ã'...v..v.h9. 0001E0

Dump of file SATURN:[PCCOMMON.DUMP.DLL]DAATTRDF.TMP;1 on 18-APR-1990 10:39:32.72
File ID (535,11,0)   End of file block 82 / Allocated 84

Virtual block number 53 (00000035), 512 (0200) bytes

006A013A 680676FF 0876FF00 0060FF9A 0058681E 006AFFFF 6860F368 006A006A j.j.h¤'h..j..hX...'...v..v.h:.j. 000000
68611368 00E66806 76FF0876 FF000061 1F9A0058 681E006A FFFF6861 0068006A j.h.ah..j..hX...a...v..v.hl.h.ah 000020
68613368 00E86806 76FF0876 FF000061 3F9A006E 681E016A FFFF6861 2068FFFF ..h-ah..j..hn..?a...v..v.hÒ.h3ah 000040
68616B68 00E26806 76FF0876 FF000061 5D9A0084 681E016A FFFF6861 4D68FFFF ..hMah..j..h...]a...v..v.hã.hkah 000060
618C6861 896800E2 680676FF 0876FF00 00617B9A 006A006A 006A006A 006A616E naj.j.j.j.j..{a...v..v.hã.h.ah.a 000080
006AFFFF 685D3368 000F6806 76FF0876 FF0000FF FF9A006A 006A006A 006A006A j.j.j.j.j.......v..v.hÔ.h3]h..j. 0000A0
006A006A 61C86861 C56800E0 680676FF 0876FF00 0061B79A 006A006A 006A006A j.j.j.j..ña...v..v.hÁ.héahàaj.j. 0000C0
006A006A 006A61E6 6861E368 000D6806 76FF0876 FF000061 D59A006A 006A006A j.j.j..ía...v..v.hī.hÐahlaj.j.j. 0000E0
006A006A 006A006A 61506862 016800E4 680676FF 0876FF00 0061F39A 006A006A j.j..µa...v..v.hõ.h.bhPaj.j.j.j. 000100
006A006A 006A006A 006A6222 68621F68 00E86806 76FF0876 FF000062 119A006A j...b...v..v.hŠ.h.bh"bj.j.j.j.j. 000120
4D9A006A 006A006A 006A006A 62406862 306800ED 680676FF 0876FF00 00622F9A ./b...v..v.hÙ.h=bhəbj.j.j.j.j..M 000140
0062689A 006A006A 006A006A 006A625E 68625B68 00EF6806 76FF0876 FF000062 b...v..v.hÿ.h[bh^bj.j.j.j.j..kb. 000160
FF000062 879A006A 006A006A 006A006A FFFF685E 406800F2 680676FF 0876FF00 ..v..v.h·.ha^h..j.j.j.j.j...b... 000180
76FF0876 FF000062 A59A0042 681E006A 006A006A 006A006A 00856806 76FF0876 v..v.h..j.j.j.j.j..hB..Eb...v..v 0001A0
680676FF 0876FF00 0062C39A 0042681E 006A006A 006AFFFF 68FFFF68 00876806 .h..h..h..j.j.j..hB..ùb...v..v.h 0001C0
01306806 76FF0876 FF000062 E19A0042 681E006A FFFF68FF FF68006A 006A012F /.j.j.h..h..j..hB..Ãb...v..v.h0. 0001E0

Dump of file SATURN:[PCCOMMON.DUMP.DLL]DAATTRDF.TMP;1 on 18-APR-1990 10:39:32.72
File ID (535,11,0)   End of file block 82 / Allocated 84

Virtual block number 54 (00000036), 512 (0200) bytes

006A0131 680676FF 0876FF00 005E339A 0042681E 006AFFFF 68FFFF68 006A006A j.j.h..h..j..hB..3^...v..v.h1.j. 000000
6A006A00 6A7F6A06 76FF0876 FF000063 1A9A0042 681E006A FFFF68FF FF68006A j.h..h..j..hB...c...v..v.j.j.j.j 000020
6A006AFF FF68FFFF 68008168 0676FF08 76FF0000 63389A00 2C681E01 6A006A00 .j.j..h,..8c...v..v.h..h..h..j.j 000040
6AFFFF68 FFFF6800 6A006A01 32680676 FF0876FF 00006356 9A002C68 1E016A00 .j..h,..Vc...v..v.h2.j.j.h..h..j 000060
1E006AFF FF68FFFF 68006A00 6A013368 0676FF08 76FF0000 63749A00 2C681E00 ..h,..tc...v..v.h3.j.j.h..h..j.. 000080
2C681E00 6AFFFF68 FFFF6800 6A006A01 34680676 FF0876FF 00006392 9A002C68 h,...c...v..v.h4.j.j.h..h..j..h, 0000A0
9A006A00 6A006AFF FF68638E 68006A00 6A010168 0676FF08 76FF0000 63809A00 .. c...v..v.h..j.j.h/ch..j.j.j.. 0000C0
56880A46 88006A63 EE6863E5 6863E868 63C46800 F7680676 FF0876FF 000063D7 ■c...v..v.h¥.háchÒchÍchŸcj..F..V 0000E0
64156864 0C68640F 6863E868 00F66806 76FF0876 FF000063 FE9A5052 0008050C ....RP.±c...v..v.h-.hŠch.dh.dh.d 000100
FF686412 6800F868 0676FF08 76FF0000 64259A50 52000805 0C56880A 4688006A j..F..V....RP.%d...v..v.h½.h.dh. 000120
680676FF 0876FF00 0064459A 50520008 050C5688 0A468800 6AFFFF68 643368FF .h3dh..j..F..V....RP.Ed...v..v.h 000140
680676FF 0876FF00 00646C9A 006A006A 006AFFFF 68645368 FFFF6864 396800FA ".h9dh..hSdh..j.j.j..ld...v..v.h 000160
00006493 9A505200 0A050C56 880A4688 006AFFFF 68647A68 FFFF6864 596800FB «.hYdh..hzdh..j..F..V....RP..d.. 000180
000C050C 56880A46 88006AFF FF6861A7 68FFFF68 64806800 FC680676 FF0876FF .v..v.h•.h.dh..hlah..j..F..V.... 0001A0
006A006A 006A006A 006A64C2 6864BF68 009D6806 76FF0876 FF000064 B19A5052 RP.Ÿd...v..v.h..hedhòdj.j.j.j.j. 0001C0
ED9A006A 006A006A 006A006A 64E06864 D068009E 680676FF 0876FF00 0064CF9A .üd...v..v.h..hÏdhÁdj.j.j.j.j..Ù 0001E0
```

```
Dump of file SATURN:[PCCOMMON.DUMP.DLL]DAATTRDF.TMP;1 on 18-APR-1990 10:39:32.72
File ID (535,11,0)   End of file block 82 / Allocated 84

Virtual block number 55 (00000037), 512 (0200) bytes

 0065089A 006A006A 006A006A 006A64FE 6864FB68 009C6806 76FF0876 FF000064 d...v..v.h..h«dh±dj.j.j.j.j...e. 000000
 FF000065 299A006A 006A006A 006A006A 651C6865 196800A0 680676FF 0876FF00 ..v..v.h..h.eh.ej.j.j.j.j..)e... 000020
 0876FF00 0065479A 006A006A 006A006A 006A653A 68653768 00A16806 76FF0876 v..v.hÀ.h7eh:ej.j.j.j.j..Ge...v. 000040
 CBC95F5E 1F000061 999A006A 006A006A 006A006A FFFF68FF FF68009F 680676FF .v.h..h..h..j.j.j.j.j...a...^_èù 000060
 000362FF 020302E2 00045CE3 02030169 00030647 020304C0 000662BA 02050093 ....¤b..â...G...i...Ð\..ã....Б.. 000080
 00055AFD 02030000 000163A4 00020443 00065E2A 020504EA 0006634A 020200EA õ...Jc..õ...*^..C...Êc.......»Z.. 0000A0
 00016060 00050000 00025D1F 00020267 00042758 0203007F 00015A76 0103035D ]...vZ.......X'..g....]......''.. 0000C0
 00010573 010304CA 000662F6 02050472 00065E84 020203E2 00050002 020328E8 Ò(..@...ã....^..r...-b..ð...s... 0000E0
 0001547E 010303EE 00015D84 00050086 000153E4 010304F5 00066386 02020004 .....c..%...õS.......]..Ÿ...~T.. 000100
 000548A2 02030000 000454B9 000201F8 00030354 0203045F 0006103C 02030087 ....<..._...T...%...¿T.......ÀK.. 000120
 00055DD8 00020453 00065E62 020500F8 00035D65 02030008 000151BA 01030369 í...¤Q.......e]..«...b^..S...Ä]... 000140
 00015E43 0005017D 0003286D 0203007D 00035F6C 02030404 000662D8 02050000 ....Äb..å...(_..)...m(..)...C^.. 000160
 00065ABB 00020277 00043125 020302F6 00045B24 020353F5 0001643C 00050A75 u...<d..%S..$[..-...X1..w...ÉZ.. 000180
 000151B1 010350FA 000163C7 00050500 00066368 02020480 00065E7E 02020000 ....~^......hc......úc..*P..ÝQ.. 0001A0
 00015D73 000504DE 00066328 02050376 0005482E 02030008 00025C8A 02030013 .....\.......H..v...+c..8...s]... 0001C0
 000449BF 0203018C 0003282C 0203008C 00035A4C 02030109 00035D87 02030000 .....]......LZ......,(......¢l.. 0001E0

Dump of file SATURN:[PCCOMMON.DUMP.DLL]DAATTRDF.TMP;1 on 18-APR-1990 10:39:32.72
File ID (535,11,0)   End of file block 82 / Allocated 84

Virtual block number 56 (00000038), 512 (0200) bytes

 00015F4F 000503F8 00062067 0203009D 00015AC0 0103048C 00065E88 02020284 ....|^.......âZ......g ..%...O .. 000000
 000664A1 020204EA 0006634D 02050382 00054A7A 02030212 000304B9 02031088 ....¿.......zJ......Mc..õ...Àd.. 000020
 0004405C 02031010 00015E68 00050497 00065EDA 02024F8E 000163C1 00050413 ....êc...O..Ö^......h^......\@.. 000040
 00065E87 02050402 00065CA7 0203030A 00055AD3 02030119 00035076 02030291 ....v].......ÆZ......Ì\.......^.. 000060
 00015DA6 000504F5 00066389 0205001D 0003321F 0203009C 00035C79 02030472 r...y\.......2.......c..%...Ì]... 000080
 000409F1 020304A1 00065F16 0202038F 00054C15 0203019E 00035F9E 02035B96 .[............L..........À...þ... 0000A0
 0006636B 02050480 00065E81 020500A8 00035C59 02030316 00055B35 0203029E ....5[......Y\..´....*......kc.. 0000C0
 00065EF8 02020413 00065B69 02030129 00035D98 02030399 000548E7 02030500 ....ÖK.......]..)...i(......%^.. 0000E0
 000161AA 00055324 00016436 0005022C 000307FC 0203002C 000336EA 020304AB ¨...õ6..,...•...,...6d..$S..¯a.. 000100
 00065EBB 020501B3 0003200E 020355AA 00016456 00050321 00055CC9 02034D27 'M..è\..l...Vd..ˆU..8 ..°...É^.. 000120
 000806F6 020304B5 00066295 02020435 00065E21 020203A5 0005480C 0203048C .....H..Ê...!^..5....b..ç...-... 000140
 00015095 000500B8 0003004E 02031F2F 00016040 000502AE 00042B09 0203058E .....+..Ó...@'../...H...|....]... 000160
 000664A4 0205051B 00074F75 0203013A 00035056 02031231 00015FFC 00050531 1...•_..1...V]..:...uO......Êd.. 000180
 00060A88 020358B5 0001647D 00054C35 00016204 00052D35 0001608A 00050413 ....¤ˉ..5-...b..5L..)d..çX...... 0001A0
 000662B7 02023838 00016110 00050497 00065EDD 02055686 0001645C 00050426 &...\d..ŘV..Ì^.......a..88..ñb.. 0001C0
 0004270F 020301C4 0003018C 02030443 00065E27 02020381 00052E27 020304C0 å...'...Ý...'^..C...¥...á....'.. 0001E0

Dump of file SATURN:[PCCOMMON.DUMP.DLL]DAATTRDF.TMP;1 on 18-APR-1990 10:39:32.72
File ID (535,11,0)   End of file block 82 / Allocated 84

Virtual block number 57 (00000039), 512 (0200) bytes

 00015E49 000504A1 00065F19 02050149 00035DA9 02030045 0003344F 0203028C ¥...O4..E...`]..I......À...!^.. 000000
 00034EEB 02032BC3 00016098 000504CA 000662F3 020259C1 00016483 00050BC1 ê....d..ëY..µb..ð....ᵀ..û+..$N.. 000020
 000163A7 000503BF 00055B13 02030435 000606AA 02033944 00016116 000500CC ä....a..D9..¯...5....[..¢...Ìc.. 000040
 00016130 00050341 00054AE0 020317C8 00016020 00050248 000413AD 02034E47 GN..Ù...H... '..à...ÀJ..A...0a.. 000060
 0004135E 020304D4 000662D5 02020453 00065E5F 020204AB 00065EF8 020540C9 è@..«^..¨..._^..S...(b..å...^... 000080
 00035BCF 020332D0 00016008 00053650 000160F6 00050058 00035DBF 020302CD ë...¢]..X...=`..P6..Ä'..Å2..Ü[.. 0000A0
 00065E24 020541D5 00016136 00050655 00015D53 0005015A 00035D45 020300D9 )...E]..Z...S]..U...6a..{A..$^.. 0000C0
 00055960 020304DE 00066328 020201DE 00030523 020304B5 00066298 02050435 5....b..ç...#...8...(c..8...'Y.. 0000E0
 00000000 00000067 000359E9 020303D2 00050083 02030259 000414D3 0203034F O...Æ...Y...°...@...ÓY..g....... 000100
 30F84689 0000FFFF 9A5016FA 468D0A76 FF0C76FF D88EFFFF 881E5657 00000CC8 à...WV.j...Ä.v..v..F°.P.......F½= 000120
 000030F8 46890000 FFFF9A50 16F4468D FA76FF00 4FE9F846 880006E9 03750000 ..u.Õ...F½Õ0..v°.F¶.P......F½=.. 000140
 003DF846 890000FF FF9A5016 FC468DF4 76FFF676 FF0031E9 F8468800 06E90375 u.Õ...F½Õ1..v~.v¶.F•.P......F½=. 000160
 C95F5E1F 0000E9FF FF0A759A 766AF476 FFF676FF 0010E9F8 46880006 E9037500 .u.Õ...F½Õ...v~.v¶jv.u...Õ...^_è 000180
 F0468900 0000189A 5016FA46 8D0A76FF 0C76FFD8 8E00088B 1E565700 0010C8CB ùà...WV.j...Ä.v..v..F°.P.......F̄Þ 0001A0
 0030F046 89000000 369A5016 F2468DFA 76FF00A2 E9F0468B 0006E903 7500003D =..u.Õ...FÞÕÀ..v°.F·.P.6....FÞ=. 0001C0
 30F04689 00000057 9A5016FC 468DF276 FFF476FF 0084E9F0 46880006 E9037500 .u.Õ...FÞÕ...v¶.v·.F=.P.W....FÞ= 0001E0
```

Dump of file SATURN:[PCCOMMON.DUMP.DLL]DAATTRDF.TMP;1 on 18-APR-1990 10:39:32.72
File ID (535,11,0) End of file block 82 / Allocated 84

Virtual block number 58 (0000003A), 512 (0200) bytes

F0468900 00FFFF9A 5016F646 8DF276FF F476FF00 63E9F046 880006E9 03750000 ..u.ő...FÞőc..v¶.v·.F-.P......FÞ 000000
75105639 0008E903 740E4639 FE568BFC 46880042 E9F0468B 0006E903 7500003D =..u.ő...FÞőB..F•.V±9F.t.ő..9V.u 000020
0010E900 00B80006 E9037514 56390008 E9037412 4639FE56 8BFC4688 001CE903 .ő...F•.V±9F.t.ő..9V.u.ő..|..ő.. 000040
8E008988 1E565700 0010C8CB C95F5E1F 0000E900 770A759A 766AF276 FFF476FF .v¶.v·jv.u.w.ő...^_èùà...WV.|... 000060
E9F0468B 0006E903 7500003D F0468900 0000999A 5016FA46 8D0A76FF 0C76FFD8 Ä.v..v..F•.P......F̄Þ=..u.ő...FÞő 000080
008BE9F0 46880006 E9037500 003DF046 89000000 B79A5016 F2468DFA 76FF00A9 `..v•.F·.P.ñ....FÞ=..u.ő...FÞő.. 0000A0
6AE9F046 880006E9 03750000 3DF04689 000000D8 9A5016FC 468DF276 FFF476FF .v¶.v·.F•.P.Ä....FÞ=..u.ő...FÞőj 0000C0
E9F0468B 0006E903 7500003D F0468900 0000F99A 5016F646 8DF276FF F476FF00 ..v¶.v·.F-.P.•....FÞ=..u.ő...FÞő 0000E0
4639FE56 8BFC468B 001CE903 75105639 0008E903 740E4639 FE568BFC 46880049 |..F•.V±9F.t.ő..9V.u.ő...F•.V±9F 000100
00CE681E 6E6AF676 FFF876FF 0017E900 00B80006 E9037514 56390008 E9037412 .t.ő..9V.u.ő..|..ő...v½.v-jn.hö. 000120
FF0C76FF D88E015D B81E5657 00000CC8 CBC95F5E 1F0000E9 00008800 00FFFF9A .....|..ő...^_èùà...WV.|]..Ä.v.. 000140
FA76FF00 87E9F846 880006E9 03750000 30F84689 00000160 9A5016FA 468D0A76 v..F•.P.m....F̄½=..u.ő...F½ő...v• 000160
76FFF676 FF0069E9 F8468800 06E90375 00003DF8 46890000 01889A50 16F4468D .F¶.P......F½=..u.ő...F½ői..v-.v 000180
8BFC468B 0048E9F8 46880006 E9037500 003DF846 89000001 AC9A5016 FC468DF4 ¶.F•.P.¯....F½=..u.ő...F½őH..F•. 0001A0
FF9AF476 FFF676FF 002CE900 00B80006 E9037510 56390008 E903740E 4639FE56 V±9F.t.ő..9V.u.ő..|..ő,..v-.v¶.. 0001C0
00FFFF9A 6E6AF476 FFF676FF 0010E9F8 46880006 E9037500 003DF846 890000FF ....F½=..u.ő...F½ő...v-.v¶jn.... 0001E0

Dump of file SATURN:[PCCOMMON.DUMP.DLL]DAATTRDF.TMP;1 on 18-APR-1990 10:39:32.72
File ID (535,11,0) End of file block 82 / Allocated 84

Virtual block number 59 (0000003B), 512 (0200) bytes

5016FA46 8D0A76FF 0C76FFD8 8E023888 1E565700 000CC8CB C95F5E1F 0000E900 .ő...^_èùà...WV.|8..Ä.v..v..F•.P 000000
669A5016 F4468DFA 76FF0068 E9F8468B 0006E903 7500003D F8468900 0002489A .H....F̄½=..u.ő...F½ők..v•.F¶.P.f 000020
9A5016FC 468DF476 FFF676FF 004DE9F8 46880006 E9037500 003DF846 89000002 ....F½=..u.ő...F½őM..v-.v¶.F•.P. 000040
03740E46 39FE568B FC468800 2CE9F846 880006E9 03750000 3DF84689 00000287 .....F½=..u.ő...F½ő,..F•.V±9F.t. 000060
00E9FFFF B80000FF FF9A006A FA76FF00 10E90000 B80006E9 03751056 390008E9 ő..9V.u.ő..|..ő...v•j......|..ő. 000080
03019A50 16F6468D 0A76FF0C 76FFD88E 02F1B81E 56570000 10C8C8C9 5F5E1F00 ..^_èùà...WV.|Þ..Ä.v..v..F-.P... 0000A0
0000031F 9A5016F0 468DF676 FF0094E9 F4468800 06E90375 00003DF4 46890000 ...F̄¶=..u.ő...F¶ő...v-.FÞ.P..... 0000C0
0003409A 5016FC46 8DF076FF F276FF00 76E9F446 880006E9 03750000 3DF44689 .F¶=..u.ő...F¶őv..v·.vÞ.F•.P.ä.. 0000E0
006AFC76 FFFE76FF 0A76FF0C 76FF0055 E9F4468B 0006E903 7500003D F4468900 ..F¶=..u.ő...F¶őU..v..v..v±.v•j. 000100
568BF846 8B002CE9 F4468800 06E90375 00003DF4 46890000 FFFF9A50 16F8468D .F½.P......F¶=..u.ő...F¶ő,..F½.V 000120
9A796AF0 76FFF276 FF0010E9 00008800 06E90375 10563900 08E90374 0E4639FA •9F.t.ő..9V.u.ő..|..ő...v·.vÞjy. 000140
468D0A76 FF0C76FF D88E038E B81E5657 000010C8 CBC95F5E 1F0000E9 0000FFFF ....ő...^_èùà...WV.|...Ä.v..v..F 000160
16F2468D FA76FF00 CBE9F046 880006E9 03750000 3DF04689 0000039E 9A5016FA •.P......F̄Þ=..u.ő...FÞőÙ..v•.F·. 000180
FC468DF2 76FFF476 FF00ADE9 F0468800 06E90375 00003DF0 46890000 038C9A50 P.¥....FÞ=..u.ő...FÞőÙ..v¶.v·.F= 0001A0
468DF276 FFF476FF 008CE9F0 46880006 E9037500 003DF046 89000003 DD9A5016 .P.Ï....FÞ=..u.ő...FÞő...v¶.v·.F 0001C0
39FE568B FC468800 6BE9F046 880006E9 03750000 3DF04689 000001CD 9A5016F6 -.P.ë....FÞ=..u.ő...FÞők..F•.V±9 0001E0

Dump of file SATURN:[PCCOMMON.DUMP.DLL]DAATTRDF.TMP;1 on 18-APR-1990 10:39:32.72
File ID (535,11,0) End of file block 82 / Allocated 84

Virtual block number 60 (0000003C), 512 (0200) bytes 14563900 08E90374 124639FE 568BFC46 8B001CE9 03751056 390008E9 03740E46 F.t.ő..9V.u.ő...F•.V±9F.t.ő..9V. 000000
FFF876FF 00000221 9A00CF68 1E706AF6 76FFF876 FF0039E9 00008800 06E90375 u.ő..|..ő9..v½.v-jp.hü..!....v½. 000020
00FFFF9A 736AF276 FFF476FF 0000FFFF 9A006A00 6A006A00 6A016E68 736AF676 v-jshn.j.j.j.j.......v¶.v·js.... 000040
5016F646 8D0A76FF 0C76FFD8 8E045488 1E565700 0018C8CB C95F5E1F 0000E900 .ő...^_èùà...WV.|T..Ä.v..v..F-.P 000060
829A5016 E8468DF6 76FF0129 E9EC468B 0006E903 7500003D EC468900 0004649A .d....F̄§=..u.ő...F§ő)..v-.Fò.P.. 000080
9A5016FC 468DE876 FFEA76FF 010BE9EC 46880006 E9037500 003DEC46 89000004 ....F§=..u.ő...F§ő...vŏ.vò.F•.P. 0000A0
5016F246 8DE876FF EA76FF00 EAE9EC46 880006E9 03750000 3DEC4689 000004A3 Ė....F§=..u.ő...F§őŏ..vŏ.vò.F·.P 0000C0
FFFE76FF 0A76FF0C 76FF00C9 E9EC468B 0006E903 7500003D EC468900 0004C49A .é....F§=..u.ő...F§őè..v..v..v±. 0000E0
8B00A0E9 EC468800 06E90375 00003DEC 46890000 FFFF9A50 16F8468D 116AFC76 v•j..F½.P......F§=..u.ő...F§ő... 000100
67E90375 02470B26 078B26EE 5EC404EE 46830004 E9F05689 EE4689FA 568BF846 F½.V•.FŸ.VÞő...FŸ.é^Ÿ&..&.G.u.őg 000120
76FF0C76 FF004AE9 03740257 39260053 E9037407 39261056 880E4688 EE5EC400 .é^Ÿ.F..V.&9.t.őS.&9W.t.őJ..v..v 000140
F476FF00 0005189A 0000681E 706AF276 FFF476FF 0000FFFF 9AF876FF FA76FF0A ..v•.v½......v¶.v·jp.hÅ.......v¶ 000160
05309A73 6AE876FF EA76FF00 0005309A 006A006A 006A006A 016E6873 6AF276FF .v·jshn.j.j.j.j..0....vŏ.vòjs.=. 000180
1F0000E9 00008800 0006489A F876FFFA 76FF0A76 FF0C76FF FF86E900 1AE90000 ..ő..ő...v..v..v•.v½.H...|..ő... 0001A0
00000561 9A5016FA 468D0A76 FF0C76FF D88E0551 B81E5657 000010C8 CBC95F5E ^_èùà...WV.|Q..Ä.v..v..F•.P.a... 0001C0
46890000 057F9A50 16F2468D FA76FF00 ADE9F046 880006E9 03750000 3DF04689 .F̄Þ=..u.ő...FÞőÙ..v•.F·.P......F 0001E0

```
Dump of file SATURN:[PCCOMMON.DUMP.DLL]DAATTRDF.TMP;1 on 18-APR-1990 10:39:32.72
File ID (535,11,0)   End of file block 82 / Allocated 84

Virtual block number 61 (0000003D), 512 (0200) bytes

 89000005 A09A5016 FC468DF2 76FFF476 FF008FE9 F0468800 06E90375 00003DF0 Þ=..u.Õ...FÞÕ...v¶.v·.F=.P...... 000000
 56390008 E903740E 4639FE56 8BFC4688 006EE9F0 46880006 E9037500 003DF046 FÞ=..u.Õ...FÞÕn..F=.V±9F.t.Õ..9V 000020
 E9000088 0006E903 75145639 0008E903 74124639 FE5688FC 4688001C E9037510 .u.Õ...F=.V±9F.t.Õ..9V.u.Õ..¡..Õ 000040
 016E6800 CB68F676 FFF876FF 00000659 9A000168 1E00C968 F676FFF8 76FF003C <..v½.v-hè..hÌ..Y....v½.v-hù.hn. 000060
 5E1F0000 E9014810 889A00CB 68F276FF F476FF00 0006719A 006A006A 006A006A j.j.j.j..q....v¶.v·hù....K.Õ...^ 000080
 89000006 8C9A5016 F2468D0A 76FF0C76 FFD88E06 ACB81E56 5700001C C8CBC95F  èùà...WV.¡¯..Ã.v..v..F·.P.¥.... 0000A0
 E8468900 00060A9A 5016E446 8DF276FF 0145E9E8 46880006 E9037500 003DE846 F̄Õ=..u.Õ...FÕÕE..v·.FÕ.P.Õ....FÕ 0000C0
 46890000 06FB9A50 16FC468D E476FFE6 76FF0127 E9E84688 0006E903 7500003D =..u.Õ...FÕÕ'..vÌ.vÕ.F=.P.«....F 0000E0
 F8468D09 6AFC76FF FE76FF0A 76FF0C76 FF0106E9 E8468800 06E90375 00003DE8 Õ=..u.Õ...FÕÕ...v..v..v±.v=j..F½ 000100
 4689FA56 88F84688 0000E9E8 46880006 E9037500 003DE846 89000005 EA9A5016 .P.Õ....FÕ=..u.Õ...FÕÕÌ..F½.V'.F 000120
 0A76FF0C 76FF00A4 E9037502 47082607 8826F45E C404F446 830004E9 F65689F4 ¶.V-Õ...F¶.á^¶&..&.G.u.ÕÈ..v..v. 000140
 17E90375 00003DE8 46890000 04069A50 16EA468D 036A37FF 260277FF 26F45EC4 á^¶&.w.&.7j..Fõ.P......FÕ=..u.Õ. 000160
 46391056 880E4688 007DE9E8 46880000 08989AF8 76FFFA76 FF0A76FF 0C76FF00 ..v..v..v'.v½......FÕÕ)..F..V.9F 000180
 FF000008 EB9AF876 FFFA76FF 0A76FF0C 76FF004D E90374EC 56390055 E90374EA Õt.ÕU.9Všt.ÕM..v..v..v'.v½.Š.... 0001A0
 6A006A01 6E6800CB 68EE76FF F076FF00 0007509A 0002681E 00C968EE 76FFF076 vÞ.vŸhè..h@..P....vÞ.vŸhù.hn.j.j 0001C0
 76FFFF49 E9001AE9 07791088 9A00CB68 E476FFE6 76FF0000 07699A00 6A006A00 .j.j..i....vÌ.vÕhù....y.Õ..ÕI..v 0001E0

Dump of file SATURN:[PCCOMMON.DUMP.DLL]DAATTRDF.TMP;1 on 18-APR-1990 10:39:32.72
File ID (535,11,0)   End of file block 82 / Allocated 84

Virtual block number 62 (0000003E), 512 (0200) bytes

 56570000 10C8CBC9 5F5E1F00 00E90000 88000006 959AF876 FFFA76FF 0A76FF0C ..v..v'.v½.....¡..Õ...^_èùà...WV 000000
 06E90375 00003DF0 46890000 07989A50 16FA468D 0A76FF0C 76FFD88E 07888B1E .¡...Ã.v..v..F'.P......F̄Þ=..u.Õ. 000020
 880006E9 03750000 3DF04689 000007B9 9A5016F2 468DFA76 FF0108E9 F0468800 ..FÞÕ...v'.F·.P.¿....FÞ=..u.Õ... 000040
 0006E903 7500003D F0468900 0007DA9A 5016FC46 8DF276FF F476FF00 EDE9F046 FÞÕÚ..v¶.v·.F=.P.Õ....FÞ=..u.Õ.. 000060
 06E90375 00003DF0 46890000 05C19A50 16F6468D F276FFF4 76FF00CC E9F04688 .FÞÕä..v¶.v·.F-.P.è....FÞ=..u.Õ. 000080
 FC468800 47E90375 10563900 08E90374 0E4639FE 5688FC46 8800A8E9 F0468800 ..FÞÕ¨..F=.V±9F.t.Õ..9V.u.ÕG..F= 0000A0
 FF0A76FF 0C76FF0E 76FF1076 FF0031E9 03751456 390008E9 03741246 39FE5688 .V±9F.t.Õ..9V.u.Õ1..v..v..v..v.. 0000C0
 00880054 E9F04688 0006E903 7500003D F046890C C483FFFF 0A379AF2 76FFF476 v¶.v·.7....á..FÞ=..u.Õ...FÞÕT.¡. 0000E0
 1E000068 F676FFF8 76FF0000 0A049A00 D3681E00 CE68F676 FFF876FF 004EE900 .ÕN..v½.v-hö..h£.......v½.v-hÅ.. 000100
 0008C69A 006A006A 006A006A 016E6800 D468F676 FFF876FF 000008AD 9A000468 hå..Ü....v½.v-hå.hn.j.j.j.j..ó.. 000120
 02B81E56 5700001A C8CBC95F 5E1F0000 E908D612 319A0004 68F276FF F476FF00 ..v¶.v·hå..1.ø.Õ...^_èùà...WV.¡. 000140
 03750000 3DEA4689 00000912 9A5016F6 468D0A76 FF0C76FF 0000F446 C7D88E09 ..ÃúF¶...v..v..F-.P.¯.....Fõ=..u. 000160
 06E90375 00003DEA 46890000 09309A50 16E6468D F676FF01 3DE9EA46 880006E9 Õ...FõÕ=..v-.FÌ.P.0....Fõ=..u.Õ. 000180
 E9037500 003DEA46 89000009 519A5016 FC468DE6 76FFE876 FF011FE9 EA468800 ..FõÕ...vÕ.vÌ.F=.P.Q....Fõ-..u.Õ 0001A0
 03750000 3DEA4689 00000972 9A5016F0 468DE676 FFE876FF 00FEE9EA 46880006 ...FõÕ±..vÕ.vÌ.FÞ.P.r....Fo¯..u. 0001C0
 7500003D EA468900 00FFFF9A 5016EE46 8DE676FF E876FF00 DDE9EA46 880006E9 Õ...FõÕI..vÕ.vÌ.FŸ.P......Fo ..u 0001E0

Dump of file SATURN:[PCCOMMON.DUMP.DLL]DAATTRDF.TMP;1 on 18-APR-1990 10:39:32.72
File ID (535,11,0)   End of file block 82 / Allocated 84

Virtual block number 63 (0000003F), 512 (0200) bytes

 5016F446 8D1E6AFC 76FFFE76 FFEE76FF 0A76FF0C 76FF00BC E9EA4688 0006E903 .Õ...FõÕ¥..v..v..vŸ.v±.v=j..F¶.P 000000
 0000EC46 C70088E9 EA468800 06E90375 00003DEA 46890000 FFFF9A50 16F8468D .F½.P......Fõ=..u.Õ...FõÕ..úF§.. 000020
 39261056 880E4688 F876C40C EC5E6800 6FE90372 EC4639F4 4688EC46 FF0003E9 Õ...F§.F¶9F§r.Õo.k^§.áv½.F..V.&9 000040
 00086F9A 00D5681E 00CE68F0 76FFF276 FF004EE9 03740250 39260057 E9037400 .t.ÕW.&9P.t.ÕN..v·.vÞhö..hf..o.. 000060
 6A016E68 000468F0 76FFF276 FF000009 F29A0006 681E00D0 68F076FF F276FF00 ..v·.vÞhÅ..hø..·....v·.vÞhå.hn.j 000080
 FF83E900 09E90A20 12319A00 0468E676 FFE876FF 00000A1D 9A006A00 6A006A00 .j.j.j.......vÕ.vÌhå..1.-.Õ..Õ.. 0000A0
 FA468D0A 76FF0C76 FFD88E0A 3F881E56 57000010 C8CBC95F 5E1F0000 E9000088 ¡..Õ...^_èùà...WV.¡7..Ã.v..v..F' 0000C0
 5016F246 8DFA76FF 00CEE9F0 46880006 E9037500 003DF046 8900000A 549A5016 .P.T....F̄Þ=..u.Õ...FÞÕõ..v'.F·.P 0000E0
 16FC468D F276FFF4 76FF0080 E9F04688 0006E903 75000030 F0468900 000A729A .r....FÞ=..u.Õ...FÞÕ¯..v¶.v·.F=. 000100
 F6468DF2 76FFF476 FF008FE9 F0468800 06E90375 00003DF0 46890000 0A939A50 P......FÞ=..u.Õ...FÞÕ...v¶.v·.F- 000120
 4639FE56 8BFC4688 006EE9F0 46880006 E9037500 003DF046 8900000A 849A5016 .P.Ç....FÞ=..u.Õ...FÞÕn..F=.V±9F 000140
 75145639 0008E903 74124639 FE5688FC 4688001C E9037510 56390008 E903740E .t.Õ..9V.u.Õ...F=.V±9F.t.Õ..9V.u 000160
 FFF876FF 0000085D 9A000768 1E000668 F676FFF8 76FF003C E9000088 0006E903 .Õ..¡..Õ<..v½.v-hø..hø..]....v½. 000180
 C39A0009 68F276FF F476FF00 0008889A 006A006A 006A006A 016E6800 0968F676 v-hÌ.hn.j.j.j.j.......v¶.v·hÌ..û 0001A0
 F6468D0A 76FF0C76 FFD88E08 83881E56 57000018 C8CBC95F 5E1F0000 E90B9828 +..Õ...^_èùà...WV.¡°..Ã.v..v..F- 0001C0
 5016E846 8DF676FF 012CE9EC 46880006 E9037500 003DEC46 8900000B C39A5016 .P.û....F̄§=..u.Õ...F§Õ,..v-.FÕ.P 0001E0
```

```
Dump of file SATURN:[PCCOMMON.DUMP.DLL]DAATTRDF.TMP;1 on 18-APR-1990 10:39:32.72
File ID (535,11,0)   End of file block 82 / Allocated 84

Virtual block number 64 (00000040), 512 (0200) bytes

 16FC468D E876FFEA 76FF010E E9EC4688 0006E903 7500003D EC468900 000BE19A .Ä....Fš=..u.Õ...FšÕ...võ.vÒ.F•. 000000
 EE468DE8 76FFEA76 FF00EDE9 EC468800 06E90375 00003DEC 46890000 0C029A50 P......Fš=..u.Õ...FšÕÙ..võ.vÒ.FŸ 000020
 76FF0A76 FF0C76FF 00CCE9EC 46880006 E9037500 003DEC46 8900000C 239A5016 .P.#....Fš=..u.Õ...FšÕë..v..v..v 000040
 A3E9EC46 880006E9 03750000 3DEC4689 00000803 9A5016F8 468D116A FC76FFFE ±.v▪j..F½.P......Fš=..u.Õ...FšÕÈ 000060
 03750247 08260788 26F25EC4 04F24683 0004E9F4 5689F246 89FA568B F8468800 ..F½.V‡.F·.V¶Õ...F·.ó^·&..&.G.u. 000080
 0C76FF00 4DE90374 02573926 0056E903 74073926 105688OE 4688F25E C4006AE9 Õj.ó^·.F..V.&9.t.ÕV.&9W.t.ÕM..v. 0000A0
 00000C78 9A000868 1E000668 EE76FFF0 76FF0000 0DFA9AF8 76FFFA76 FF0A76FF .v..v‡.v½.ª....vÞ.vŸhø..hÄ..x... 0000C0
 68E876FF EA76FF00 000C919A 006A006A 006A006A 016E6800 D968EE76 FFF076FF .vÞ.vŸh).hn.j.j.j.j.......võ.vÒh 0000E0
 00B80000 086E9AF8 76FFFA76 FF0A76FF 0C76FFFF 83E9001A E90CA128 C39A0009 )..û+Å.Õ..Õ...v..v..v‡.v½.n...|. 000100
 5016FA46 8D0A76FF 0C76FFD8 8E0CB3B8 1E565700 0010C8C8 C95F5E1F 0000E900 .Õ...^_èùà...WV.|°..Ä.v..v..F‡.P 000120
 E19A5016 F2468DFA 76FF00CE E9F0468B 0006E903 7500003D F0468900 000CC39A .û....Fþ=..u.Õ...FþÕö..v‡.F·.P.Ä 000140
 9A5016FC 468DF276 FFF476FF 00B0E9F0 46880006 E9037500 003DF046 8900000C ....Fþ=..u.Õ...FþÕ¯..v¶.v·.F•.P. 000160
 5016F646 8DF276FF F476FF00 8FE9F046 880006E9 03750000 3DF04689 00000D02 .....Fþ=..u.Õ...FþÕ...v¶.v·.F-.P 000180
 740E4639 FE568BFC 468B006E E9F0468B 0006E903 7500003D F0468900 0000239A .#....Fþ=..u.Õ...FþÕn..F•.V±9F.t 0001A0
 E9037514 56390008 E9037412 4639FE56 8BFC468B 001CE903 75105639 0008E903 .Õ..9V.u.Õ...F▪.V±9F.t.Õ..9V.u.Õ 0001C0
 F676FFF8 76FF0000 00BC9A00 D9681E00 8568F676 FFF876FF 003CE900 00B80006 ..|..Õ<..v½.v-h...h)..¥....v½.v- 0001E0

Dump of file SATURN:[PCCOMMON.DUMP.DLL]DAATTRDF.TMP;1 on 18-APR-1990 10:39:32.72
File ID (535,11,0)   End of file block 82 / Allocated 84

Virtual block number 65 (00000041), 512 (0200) bytes

 00FFFF9A 008768F2 76FFF476 FF000000 D59A006A 006A006A 006A016E 68008768 h..hn.j.j.j.j..f....v¶.v·h...... 000000
 5016F246 8D0A76FF 0C76FFD8 8E0E11B8 1E565700 0018C8CB C95F5E1F 0000E900 .Õ...^_èùà...WV.|...Ä.v..v..F·.P 000020
 3F9A5016 E8468DF2 76FF012C E9EC4688 0006E903 7500003D EC468900 000E219A .!....F̄š=..u.Õ...FšÕ,..v· ºÒ.P.? 000040
 9A5016FC 468DE876 FFEA76FF 010EE9EC 46880006 E9037500 003DEC46 8900000E ....Fš=..u.Õ...FšÕ...võ.vÇ º•.P. 000060
 5016EE46 8DE876FF EA76FF00 EDE9EC46 880006E9 03750000 3DEC4689 00000E60 '....Fš=..u.Õ...FšÕÙ..võ.vÒ.ŕŸ.P 000080
 FFFE76FF 0A76FF0C 76FF00CC E9EC4688 0006E903 7500003D EC468900 000E819A ......Fš=..u.Õ...FšÕë..v..v..v±. 0000A0
 8800A3E9 EC468800 06E90375 00003DEC 46890000 0D4C9A50 16F8468D 126AFC76 v▪j..F½.P.L....Fš=..u.Õ...FšÕÈ.. 0000C0
 6AE90375 02470826 078826F4 5EC404F4 46830004 E9F65689 F44689FA 568BF846 F½.V‡.F¶.V-Õ...F¶.ó^¶&..&.G.u.Õj 0000E0
 76FF0C76 FF0040E9 03740257 39260056 E9037407 39261056 8B0E468B F45EC400 .ó^¶.F..V.&9.t.ÕV.&9W.t.ÕM..v..v 000100
 76FF0000 0ED69A00 DA681E00 8568EE76 FFF076FF 00001058 9AF876FF FA76FF0A ..v‡.v½.X....vÞ.vŸh...hÖ..ø....v 000120
 008768E8 76FFEA76 FF00000E EF9A006A 006A006A 006A016E 68008768 EE76FFF0 Þ.vŸh..hn.j.j.j.j..ÿ....võ.vÒh.. 000140
 E9000088 000000AA 9AF876FF FA76FF0A 76FF0C76 FFFF83E9 001AE900 000EFD9A .»...Õ..Õ...v..v..v‡.v½.¯...|..Õ 000160
 219A5016 FA4680DA 76FF0C76 FFD88E0F 11B81E56 57000010 C8CBC95F 5E1F0000 ...^_èùà...WV.|...Ä.v..v..F‡.P.| 000180
 000F3F9A 5016F246 8DFA76FF 00CDE9F0 46880006 E9037500 003DF046 8900000F ....F̄þ=..u.Õ...FþÕë..v‡.F·.P.?.. 0001A0
 0F609A50 16FC468D F276FFF4 76FF00AF E9F0468B 0006E903 7500003D F0468900 ..Fþ=..u.Õ...FþÕ£..v¶.v·.F•.P.'. 0001C0
 819A5016 F6468DF2 76FFF476 FF008EE9 F0468800 06E90375 00003DF0 46890000 ...Fþ=..u.Õ...FþÕ...v¶.v·.F-.P.. 0001E0

Dump of file SATURN:[PCCOMMON.DUMP.DLL]DAATTRDF.TMP;1 on 18-APR-1990 10:39:32.72
File ID (535,11,0)   End of file block 82 / Allocated 84

Virtual block number 66 (00000042), 512 (0200) bytes

 E903740E 4639FE56 8BFC4688 0060E9F0 46880006 E9037500 003DF046 8900000F ....Fþ=..u.Õ...FþÕm..F•.V±9F.t.Õ 000000
 0006E903 75145639 0008E903 74124639 FE568BFC 468B001C E9037510 56390008 ..9V.u.Õ...F▪.V±9F.t.Õ..9V.u.Õ.. 000020
 008168F6 76FFF876 FF000010 1A9A000B 681E7F6A F676FFF8 76FF003B E90000B8 |..Õ;..v½.v-j..hÙ.......v½.v-h.. 000040
 00E90000 FFFF9A00 8168F276 FFF476FF 00001033 9A006A00 6A006A00 6A016E68 hn.j.j.j.j..3....v¶.v·h.......Õ. 000060
 107F9A50 16F2468D 0A76FF0C 76FFD88E 106FB81E 56570000 18C8CBC9 5F5E1F00 ..^_èùà...WV.|o..Ä.v..v..F·.P... 000080
 0000109D 9A5016E8 468DF276 FF012BE9 EC468800 06E90375 00003DEC 46890000 ...F̄š=..u.Õ...FšÕ+..v·.FÒ.P..... 0000A0
 0010BE9A 5016FC46 8DE876FF EA76FF01 0DE9EC46 880006E9 03750000 3DEC4689 .Fš=..u.Õ...FšÕ...võ.vÒ.F•.P./.. 0000C0
 100F9A50 16EE468D E876FFEA 76FF00EC E9EC4688 0006E903 7500003D EC468900 ..Fš=..u.Õ...FšÕš..võ.vÒ.FŸ.P.Õ. 0000E0
 6AFC76FF FE76FF0A 76FF0C76 FF00CBE9 EC468800 06E90375 00003DEC 46890000 ...Fš=..u.Õ...FšÕù..v..v..v±.v▪j 000100
 8BF8468B 00A2E9EC 46880006 E9037500 003DEC46 8900000F AA9A5016 F8468D17 ..F½.P.¯....Fš=..u.Õ...FšÕÅ..F½. 000120
 5EC40069 E9037502 470B2607 8826F45E C404F446 830004E9 F65689F4 4689FA56 V‡.F¶.V-Õ...F¶.ó^¶&..&.G.u.Õi.ó^ 000140
 76FF0A76 FF0C76FF 004CE903 74025739 260055E9 03740739 2610568B 0E468BF4 ¶.F..V.&9.t.ÕU.&9W.t.ÕL..v..v..v 000160
 EE76FFF0 76FF0000 11339A00 DC681E7F 6AEE76FF F076FF00 0012B49A F876FFFA ª.v½.Ç....vÞ.vŸj..hÉ..3....vÞ.vŸ 000180
 00115A9A 008168E8 76FFEA76 FF000011 4C9A006A 006A006A 006A016E 68008168 h..hn.j.j.j.j..L....võ.vÒh...Z.. 0001A0
 5E1F0000 E9000088 00001008 9AF876FF FA76FF0A 76FF0C76 FFFF84E9 001AE900 .Õ..Õ...v..v..v‡.v½.....|..Õ...^ 0001C0
 89000011 7E9A5016 FA4680DA 76FF0C76 FFD88E11 6E881E56 57000010 C8CBC95F _èùà...WV.|n..Ä.v..v..F‡.P.-.... 0001E0
```

Dump of file SATURN:[PCCOMMON.DUMP.DLL]DAATTRDF.TMP;1 on 18-APR-1990 10:39:32.72
File ID (535,11,0) End of file block 82 / Allocated 84

Virtual block number 67 (00000043), 512 (0200) bytes

```
F0468900 00119C9A 5016F246 8DFA76FF 00A3E9F0 46880006 E9037500 003DF046 Fÿ=..u.Õ...FÞÕÈ..v*.F·.P......FÞ 000000
46890000 11BD9A50 16FC468D F276FFF4 76FF0085 E9F0468B 0006E903 7500003D =..u.Õ...FÞÕ...v¶.v·.F=.P.§....F 000020
89000011 DE9A5016 F6468DF2 76FFF476 FF0064E9 F0468B00 06E90375 00003DF0 Þ=..u.Õ...FÞÕd..v¶.v·.F-.P.8.... 000040
56390008 E903740E 4639FE56 88FC4688 0043E9F0 46880006 E9037500 003DF046 FÞ=..u.Õ...FÞÕC..F=.V±9F.t.Õ..9V 000060
E9000088 0006E903 75145639 0008E903 74124639 FE5688FC 4688001C E9037510 .u.Õ...F=.V±9F.t.Õ..9V.u.Õ..¦..Õ 000080
881E5657 000014C8 CBC95F5E 1F0000E9 00E53838 9A00E668 F276FFF4 76FF0011 ...v¶.v·hÌ..88Ì.Õ...^_èùà...WV.¦ 0000A0
880006E9 03750000 3DF04689 000012D8 9A5016FA 468D0A76 FF0C76FF D88E12C8 ù..Ä.v..v..F*.P.Ù....F̄Þ=..u.Õ... 0000C0
F0468800 06E90375 00003DF0 46890000 12F99A50 16EC468D FA76FF00 86E9F046 FÞÕÑ..v*.F$.P.*....FÞ=..u.Õ...FÞ 0000E0
46880006 E9037500 003DF046 89000013 1A9A5016 FC468DEC 76FFEE76 FF0098E9 Õ...vŸ.vš.F=.P......FÞ=..u.Õ...F 000100
880006E9 03750000 3DF04689 0000133B 9A5016F6 468DEC76 FFEE76FF 0077E9F0 ÞÕw..vŸ.vš.F-.P.;....FÞ=..u.Õ... 000120
F0468900 0008529A 5016F246 8D0C6AFC 76FFFE76 FF0A76FF 0C76FF00 56E9F046 FÞÕV..v..v..v±.v=j..F·.P.R....FÞ 000140
75F45639 0008E903 74F24639 1056880E 4688002D E9F0468B 0006E903 7500003D =..u.Õ...FÞÕ-..F..V.9F·t.Õ..9V¶u 000160
CBC95F5E 1F0000E9 138E3838 9A00E668 EC76FFEE 76FF0011 E9000088 0006E903 .Õ..¦..Õ...vŸ.všhÌ..88..Õ...^_èù 000180
3DF04689 000013B0 9A5016FA 468D0A76 FF0C76FF D88E13A0 881E5657 000010C8 à...WV.¦...Ä.v..v..F*.P.¯....F̄Þ= 0001A0
00003DF0 46890000 13CE9A50 16F2468D FA76FF00 A3E9F046 880006E9 03750000 ..u.Õ...FÞÕÈ..v*.F·.P.ö....FÞ=.. 0001C0
003DF046 89000013 EF9A5016 FC468DF2 76FFF476 FF0085E9 F0468800 06E90375 u.Õ...FÞÕ...v¶.v·.F=.P.ÿ....FÞ=. 0001E0
```

Dump of file SATURN:[PCCOMMON.DUMP.DLL]DAATTRDF.TMP;1 on 18-APR-1990 10:39:32.72
File ID (535,11,0) End of file block 82 / Allocated 84

Virtual block number 68 (00000044), 512 (0200) bytes

```
3DF04689 00001410 9A5016F6 468DF276 FFF476FF 0064E9F0 46880006 E9037500 .u.Õ...FÞÕd..v¶.v·.F-.P......FÞ= 000000
03751056 390008E9 03740E46 39FE5688 FC468800 43E9F046 880006E9 03750000 ..u.Õ...FÞÕC..F=.V±9F.t.Õ..9V.u. 000020
FF0011E9 00008800 06E90375 14563900 08E90374 124639FE 5688FC46 88001CE9 Õ...F=.V±9F.t.Õ..9V.u.Õ..¦..Õ... 000040
8E148888 1E565700 0010C8CB C95F5E1F 0000E914 7640C99A 00E868F2 76FFF476 v¶.v·hÒ..è@v.Õ...^_èùà...WV.¦... 000060
E9F4468B 0006E903 7500003D F4468900 0014989A 5016F646 8D0A76FF 0C76FFD8 Ä.v..v..F-.P......F̄¶=..u.Õ...F¶Õ 000080
0077E9F4 46880006 E9037500 003DF446 89000014 B69A5016 F0468DF6 76FF0095 ...v-.FÞ.P.Ñ....F¶=..u.Õ...F¶Õw. 0000A0
56E9F446 880006E9 03750000 3DF44689 000014D7 9A5016FC 468DF076 FFF276FF .v·.vÞ.F=.P.■....F¶=..u.Õ...F¶ÕV 0000C0
7500003D F4468900 0014399A 5016F846 8D086AFC 76FFFE76 FF0A76FF 0C76FF00 ..v..v..v±.v=j..F½.P.9....F¶=..u 0000E0
0006E903 75FA5639 0008E903 74F84639 1056880E 4688002D E9F4468B 0006E903 .Õ...F¶Õ-..F..V.9F½t.Õ..9V*u.Õ.. 000100
00000CC8 CBC95F5E 1F0000E9 154840C9 9A00E868 F076FFF2 76FF0011 E9000088 ¦..Õ...v·.vÞhÒ..è@K.Õ...^_èùà... 000120
03750000 3DF84689 0000156D 9A5016FA 468D0A76 FF0C76FF D88E155D 881E5657 WV.¦]..Ä.v..v..F*.P.m....F̄½=..u. 000140
06E90375 00003DF8 46890000 1589A50 16F4468D FA76FF00 6CE9F846 880006E9 Õ...F½Õl..v*.F¶.P......F½=..u.Õ. 000160
E9037500 003DF846 89000015 AC9A5016 FC468DF4 76FFF676 FF004EE9 F8468800 ..F½ÕN..v-.v¶.F=.P.¯....F½=..u.Õ 000180
00880006 E9037510 56390008 E903740E 4639FE56 88FC4688 002DE9F8 46880006 ...F½Õ-..F=.V±9F.t.Õ..9V.u.Õ..¦. 0001A0
56570000 0CC8CBC9 5F5E1F00 00E91612 53249A00 FA68F476 FFF676FF 0011E900 .Õ...v-.v¶h*..$S..Õ...^_èùà...WV 0001C0
06E90375 00003DF8 46890000 16349A50 16FA468D 0A76FF0C 76FFD88E 1624881E .¦$..Ä.v..v..F*.P.4....F̄½=..u.Õ. 0001E0
```

Dump of file SATURN:[PCCOMMON.DUMP.DLL]DAATTRDF.TMP;1 on 18-APR-1990 10:39:32.72
File ID (535,11,0) End of file block 82 / Allocated 84

Virtual block number 69 (00000045), 512 (0200) bytes

```
880006E9 03750000 3DF84689 00001652 9A5016F4 468DFA76 FF0088E9 F8468800 ..F½Õ...v*.F¶.P.R....F½=..u.Õ... 000000
0006E903 7500003D F8468900 0016739A 5016FC46 8DF476FF F676FF00 60E9F846 F½Õm..v-.v¶.F=.P.s....F½=..u.Õ.. 000020
E9000088 0006E903 75105639 0008E903 740E4639 FE5688FC 4688004C E9F8468B .F½ÕL..F=.V±9F.t.Õ..9V.u.Õ..¦..Õ 000040
76FF176A 4F8E9A00 F668F476 FFF676FF 175C4F8E 9A00F768 F476FFF6 76FF0030 0..v-.v¶h¼...O\..v-.v¶h-...0j..v 000060
C2881E56 5700000C C8CBC95F 5E1F0000 E9F8468B 16804F8E 9A00F868 F476FFF6 -.v¶h½...O¯..F½Õ...^_èùà...WV.¦õ 000080
46880006 E9037500 003DF846 89000016 D29A5016 FA468D0A 76FF0C76 FFD88E16 ..Ä.v..v..F*.P.Ò....F̄½=..u.Õ...F 0000A0
E9F8468B 0006E903 7500003D F8468900 0016F09A 5016F446 8DFA76FF 006CE9F8 ½Õl..v*.F¶.P.Þ....F½=..u.Õ...F½Õ 0000C0
F8468800 06E90375 00003DF8 46890000 17119A50 16FC468D F476FFF6 76FF004E N..v-.v¶.F=.P......F½=..u.Õ...F½ 0000E0
FF0011E9 00008800 06E90375 10563900 08E90374 0E4639FE 5688FC46 88002DE9 Õ-..F=.V±9F.t.Õ..9V.u.Õ..¦..Õ... 000100
8E177F88 1E565700 000CC8C8 C95F5E1F 0000E917 4E55AA9A 00FB68F4 76FFF676 v-.v¶h«..¯UN.Õ...^_èùà...WV.¦... 000120
E9F8468B 0006E903 7500003D F8468900 00178F9A 5016FA46 8D0A76FF 0C76FFD8 Ä.v..v..F*.P......F̄½=..u.Õ...F½Õ 000140
004EE9F8 46880006 E9037500 003DF846 89000017 AD9A5016 F4468DFA 76FF006C l..v*.F¶.P.Ù....F½=..u.Õ...F½ÕN. 000160
2DE9F846 880006E9 03750000 3DF84689 000017CE 9A5016FC 468DF476 FFF676FF .v-.v¶.F=.P.ö....F½=..u.Õ...F½Õ- 000180
F676FF00 11E90000 880006E9 03751056 390008E9 03740E46 39FE5688 FC468800 ..F=.V±9F.t.Õ..9V.u.Õ..¦..Õ...v- 0001A0
FFD88E18 1D881E56 57000008 C8CBC95F 5E1F0000 E9180858 859A00FC 68F476FF .v¶h=..çX..Õ...^_èùà...WV.¦...Ä. 0001C0
04DFE9F8 46880006 E9037500 003DF846 8900000A D59A5016 FE468D06 76FF0876 v..v..F±.P.Í....F̄½=..u.Õ...F½ÕÕ. 0001E0
```

Dump of file SATURN:[PCCOMMON.DUMP.DLL]DAATTRDF.TMP;1 on 18-APR-1990 10:39:32.72
File ID (535,11,0) End of file block 82 / Allocated 84

Virtual block number 70 (00000046), 512 (0200) bytes

```
8EE9F846 880006E9 03750000 3DF84689 0000FFFF 9A5016FA 46800676 FF0876FF .v..v..F*.P......F½=..u.Ö...F½Ö/ 000000
00003DF8 46890000 FFFF9A50 52000205 0C56880A 468BFA76 FFFC76FF FE76FF04 ..v±.v•.v*.F..V....RP......F½=.. 000020
FFFF6819 41680A6A 056A0277 FF260477 FF260A5E C40494E9 F8468800 06E90375 u.Ö...F½Ö..á^.&.w.&.w.j.j.hA.h.. 000040
260A5EC4 0463E9F8 46880006 E9037500 003DF846 890000FF FF9AFFFF 68196C68 hl.h........F½=..u.Ö...F½Öc.á^.& 000060
06E90375 00003DF8 46890000 199D9A19 9A681997 682F6A01 6A0277FF 260477FF .w.&.w.j.j/h..h........F½=..u.Ö. 000080
0019C89A FFFF6819 C268026A 026A0277 FF260477 FF260A5E C40438E9 F8468800 ..F½Ö8.á^.&.w.&.w.j.j.hö.h...à.. 0000A0
6A056A02 77FF2604 77FF260A 5EC40400 E9F8468B 0006E903 7500003D F8468900 ..F½=..u.Ö...F½Ö..á^.&.w.&.w.j.j 0000C0
0A5EC403 E2E9F846 880006E9 03750000 3DF84689 0000FFFF 9AFFFF68 19EB6802 .hŠ.h........F½=..u.Ö...F½Öã.á^. 0000E0
0006E903 7500003D F8468900 00FFFF9A FFFF681A 1268056A 0277FF26 0477FF26 &.w.&.w.j.h..h........F½=..u.Ö.. 000100
3DF84689 0000FFFF 9AFFFF68 09C86802 77FF2604 77FF260A 5EC403B9 E9F8468B .F½Ö¿.á^.&.w.&.w.hà.h........F½= 000120
681A4368 106A056A 0277FF26 0477FF26 0A5EC403 92E9F846 880006E9 03750000 ..u.Ö...F½Ö..á^.&.w.&.w.j.j.hC.h 000140
5EC40361 E9F8468B 0006E903 7500003D F8468900 001AA59A FFFF681A 6E681A46 F.hn.h...E....F½=..u.Ö...F½Öa.á^ 000160
03750000 3DF84689 00001AD0 9AFFFF68 1A996802 6A0A6A02 77FF2604 77FF260A .&.w.&.w.j.j.h..h...Å....F½=..u. 000180
CA681AA2 681A9F68 096A056A 0277FF26 0477FF26 0A5EC403 36E9F846 880006E9 Ö...F½Ö6.á^.&.w.&.w.j.j.h..hÅ.hò 0001A0
77FF260A 5EC40305 E9F8468B 0006E903 7500003D F8468900 001B019A FFFF681A .h........F½=..u.Ö...F½Ö..á^.&.w 0001C0
880006E9 03750000 3DF84689 0000182C 9AFFFF68 1AF56802 6A056A02 77FF2604 .&.w.j.j.h%.h...,....F½=..u.Ö... 0001E0
```

Dump of file SATURN:[PCCOMMON.DUMP.DLL]DAATTRDF.TMP;1 on 18-APR-1990 10:39:32.72
File ID (535,11,0) End of file block 82 / Allocated 84

Virtual block number 71 (00000047), 512 (0200) bytes

```
FFFF681B 26681AFE 681AFB68 086A056A 0277FF26 0477FF26 0A5EC402 DAE9F846 F½ÖÖ.á^.&.w.&.w.j.j.h«.h±.h&.h.. 000000
77FF2604 77FF260A 5EC402A9 E9F8468B 0006E903 7500003D F8468900 001B5D9A .]....F½=..u.Ö...F½Ö`.á^.&.w.&.w 000020
7EE9F846 880006E9 03750000 3DF84689 00001B88 9AFFFF68 1B516802 6A056A02 .j.j.hQ.h........F½=..u.Ö...F½Ö~ 000040
001B899A FFFF681B 82681B5A 681B5768 116A056A 0277FF26 0477FF26 0A5EC402 .á^.&.w.&.w.j.j.hW.hZ.h..h...¿.. 000060
6A096A02 77FF2604 77FF260A 5EC4024D E9F8468B 0006E903 7500003D F8468900 ..F½=..u.Ö...F½ÖM.á^.&.w.&.w.j.j 000080
0A5EC402 22E9F846 880006E9 03750000 3DF84689 00001BE4 9AFFFF68 1BAD6802 .hÙ.h...ö....F½=..u.Ö...F½Ö".á^. 0000A0
F8468900 001C159A FFFF681B DE681B86 681BB368 0C6A056A 0277FF26 0477FF26 &.w.&.w.j.j.h°.hÑ.h8.h........F½ 0000C0
1C096802 6A076A02 77FF2604 77FF260A 5EC401F1 E9F8468B 0006E903 7500003D ▪..u.Ö...F½Öþ.á^.&.w.&.w.j.j.h.. 0000E0
0477FF26 0A5EC401 C6E9F846 880006E9 03750000 3DF84689 00001C40 9AFFFF68 h...ə....F½=..u.Ö...F½Ö6.á^.&.w. 000100
7500003D F8468900 001C719A FFFF681C 3A681C12 681C0F68 086A056A 0277FF26 &.w.j.j.h..h..h:.h...q....F½=..u 000120
9AFFFF68 1C656802 6A066A02 77FF2604 77FF260A 5EC40195 E9F8468B 0006E903 .Ö...F½Ö..á^.&.w.&.w.j.j.he.h... 000140
0277FF26 0477FF26 0A5EC401 6AE9F846 880006E9 03750000 3DF84689 00001C9C .....F½=..u.Ö...F½Öj.á^.&.w.&.w. 000160
0006E903 7500003D F8468900 001CCD9A FFFF681C 96681C6E 681C6B68 126A056A j.j.hk.hn.h..h...ë....F½=..u.Ö.. 000180
00001CF8 9AFFFF68 1CC16802 6A0D6A02 77FF2604 77FF260A 5EC40139 E9F8468B .F½Ö9.á^.&.w.&.w.j.j.hê.h...½... 0001A0
176A056A 0277FF26 0477FF26 0A5EC401 0EE9F846 880006E9 03750000 3DF84689 .F½=..u.Ö...F½Ö..á^.&.w.&.w.j.j. 0001C0
E9F8468B 0006E903 7500003D F8468900 0019479A FFFF681C F2681CCA 681CC768 hú.hò.h·.h...G....F½=..u.Ö...F½Ö 0001E0
```

Dump of file SATURN:[PCCOMMON.DUMP.DLL]DAATTRDF.TMP;1 on 18-APR-1990 10:39:32.72
File ID (535,11,0) End of file block 82 / Allocated 84

Virtual block number 72 (00000048), 512 (0200) bytes

```
3DF84689 00001D23 9AFFFF68 1D1D6802 6A156A02 77FF2604 77FF260A 5EC4000D Ï.á^.&.w.&.w.j.j.h..h...#....F½= 000000
681D4868 066A056A 0277FF26 0477FF26 0A5EC400 B2E9F846 880006E9 03750000 ..u.Ö...F½Öý.á^.&.w.&.w.j.j.hH.h 000020
260477FF 260A5EC4 0087E9F8 46880006 E9037500 003DF846 8900001D 4E9AFFFF ...N....F½=..u.Ö...F½Ö..á^.&.w.& 000040
F8468800 06E90375 00003DF8 46890000 1D799AFF FF681D73 68046A05 6A0277FF .w.j.j.hs.h...y....F½=..u.Ö...F½ 000060
F8468900 001DA49A FFFF681D 9E68036A 056A0277 FF260477 FF260A5E C4005CE9 Ö\.á^.&.w.&.w.j.j.h..h...£....F½ 000080
193B6805 6A056A02 77FF2604 77FF260A 5EC40031 E9F8468B 0006E903 7500003D =..u.Ö...F½Ö1.á^.&.w.&.w.j.j.h;. 0000A0
1F0000E9 F8468800 06E9F846 880006E9 03750000 3DF84689 00001972 9AFFFF68 h...r....F½=..u.Ö...F½Ö...F½Ö... 0000C0
01030000 000118A9 000212C3 00021BB0 00050453 000602DD 02030035 CBC95F5E ^_èùS...Ï...S...¯...û...`....... 0000E0
0103044C 00021A40 00050549 00021A71 00050000 00021A3D 0002007F 0001128F ........=.......q...Ì...ə...L... 000100
0005007D 000318C8 02030000 000518B8 000204DE 0006129D 02030086 00011276 v...........B...£........ù...)... 000120
02030376 00051207 02030556 000819F1 02031555 00021C30 00050155 00021944 D...U...=...U...þ...V........v... 000140
020302E9 000219EE 00051067 00021CC4 00051166 00021CF5 0005008C 0003186C l........%...f...á...g...Ÿ...Ö... 000160
0005009C 000318EC 02030480 00060440 0203056A 00081A74 02030382 000515D5 f........t...j...ə.......ǎ....... 000180
0203048C 0006067E 0203057B 00081A18 020308FA 00021AF8 00051777 00021D76 v...w...%...*........(...~....... 0001A0
00050081 0002193E 00051480 00021C0C 00050000 0002196F 000500A8 000314F8 ½...´...o..................>....... 0001C0
00050F09 00021C99 0005050F 00070377 02030386 00021A15 00050783 00021ACD ë...............w............... 0001E0
```

```
Dump of file SATURN:[PCCOMMON.DUMP.DLL]DAATTRDF.TMP;1 on 18-APR-1990 10:39:32.72
File ID (535,11,0)   End of file block 82 / Allocated 84

Virtual block number 73 (00000049), 512 (0200) bytes

 00050426 000602BF 02031815 000210A1 000503A5 00051265 02030E09 00021C68 h.......e...É...À.......«...&... 000000
 02030526 0007184B 02030335 0005182D 0203161C 00021D20 00051398 00021BE1 Ã....... .......-...5...K...&... 000020
 00050CA8 00021B85 000504B5 00061041 020306A4 00021A9C 000505A1 00081A49 I...À.......É...A...ç.......¨... 000040
 00050A37 00021B29 00050230 000219C5 000502CD 00040806 020308AB 00021B54 T...¨.......ë...é...0...)...7... 000060
 01C80001 B81F0196 3E89D88E FFFFB81E 0000053F 00081916 020316BA 00021D4B K...¤.......?....|...Ä.>...|..Ù. 000080
 C0330A7E C40676C5 1EDE8BD7 88EC8855 00000000 00000000 00000600 02000200 ................U.š.■.8.év.á~.3à 0000A0
 C4D788EC 8B5500CB 5DFA8BF3 881FFFFF 1DC01B05 74A6F3F9 2BD1F7AE F2FFFFB9 ¿..·Û%Ì+ªµlt..å.....µ.ª]ù.U.š.■á 0000C0
 330676C5 1E5657EC 8B550000 01E900C8 5DFA8B91 49D1F7AE F2FFFFB9 C033067E ~.3à¿..·Û%Il..ª]ù.Õ...U.šWV.év.3 0000E0
 D1187230 2C1F7739 3CAC0175 2B3C0474 203C50F7 74093CFB 74203CAC DB3399C0 å.3Û¯< t«<.t%P<-t.<+u.¯<9w.,0r.| 000100
 0775932D 3C58DCEB 00D28308 03D71309 03D2D1E3 D1D2D1E3 D1FA8BCB 8BD2D1E3 Ðï■.ù.ªïÐï■ïÐï■.).■.Ä.■.ŠÉX<-.u. 000120
 00000000 012E012D 012C0073 0070004B 00000000 CB5D5F5E 1FDAF700 D283D8F7 %Ä.■.%Ö.^_]ù....K.p.s.,.-....... 000140
 007F004B 00000000 00000000 00000000 00000000 00CB00C9 004B0000 00000000 ......K.è.ù.................K... 000160
 00000131 0130012F 00870085 00080000 00000000 00000000 01340133 01320081 ..2.3.4................./.0.1... 000180
 004B0000 00000000 00000000 013A0139 01380009 00D6004B 00000000 00000000 ........K.■.).8.9.:...........K. 0001A0
 00000000 00000000 00E8004B 00000000 00000000 00000000 00000000 000000E6 Ì....................K.Ò......... 0001C0
 00000000 00000000 00000000 00000000 00000000 004B0000 00000000 00000000 ..........K..................... 0001E0

Dump of file SATURN:[PCCOMMON.DUMP.DLL]DAATTRDF.TMP;1 on 18-APR-1990 10:39:32.72
File ID (535,11,0)   End of file block 82 / Allocated 84

Virtual block number 74 (0000004A), 512 (0200) bytes

 00000070 61727453 746F6F42 72747441 00706172 7453746F 6F427274 74410000 ..AttrBootStrap.AttrBootStrap... 000000
 00000000 00000000 0006000E 00020001 FFFF0000 00000000 00000000 00000000 .....................8.......... 000020
 6E206563 72756F73 20726F66 20726F72 72652074 6E696172 74736E6F 43210352 R.!Constraint error for source n 000040
 74692072 6F202C64 6E756F66 20746F6E 20796568 20797469 746E453B 00656D61 ame.;Entity key not found, or it 000060
 00657475 62697274 74612065 68742073 6E696174 6E6F6320 79646165 726C6120  already contains the attribute. 000080
 65747562 69727474 61206574 61647055 24007965 4B207972 61606972 50202C0E ., Primary Key.$Update attribute 0000A0
 72747461 20657461 64705520 00646C65 69662064 65776F6C 6C61206C 6C756E20  null allowed field. Update attr 0000C0
 74746120 65746164 70551E00 646C6569 6620656C 6261726F 74732065 74756269 ibute storable field..Update att 0000E0
 72747461 20657461 64705523 00646C65 69662065 6372756F 73206574 75626972 ribute source field.#Update attr 000100
 20657461 6470551E 00646C65 69662065 6D616E20 65637275 6F732065 74756269 ibute source name field..Update  000120
 61206574 61647055 2100646C 65696620 6E696160 6F642065 74756269 72747461 attribute domain field.!Update a 000140
 75732064 64412400 646C6569 66206E6F 69736E65 6D696420 65747562 69727474 ttribute dimension field.$Add su 000160
 522A0065 74756269 72747461 20736968 74206F74 20657475 62697274 74612062 b attribute to this attribute.*R 000180
 61207369 6874206D 6F726620 65747562 69727474 61206275 73206563 616C7065 eplace sub attribute from this a 0001A0
 66206574 75626972 74746120 62757320 6574656C 65442900 65747562 69727474 ttribute.)Delete sub attribute f 0001C0
 61206574 616C6552 2F646441 2C006574 75626972 74746120 73696874 20606F72 rom this attribute.,Add/Relate a 0001E0

Dump of file SATURN:[PCCOMMON.DUMP.DLL]DAATTRDF.TMP;1 on 18-APR-1990 10:39:32.72
File ID (535,11,0)   End of file block 82 / Allocated 84

Virtual block number 75 (0000004B), 512 (0200) bytes

 00657475 62697274 74612073 69687420 6F742079 656B2063 69666963 65707320  specific key to this attribute. 000000
 6874206D 6F726620 79656B20 63696669 63657073 20612065 74616C65 726E552C ,Unrelate a specific key from th 000020
 6F20656D 616E2065 68742065 63616C70 65522500 65747562 69727474 61207369 is attribute.%Replace the name o 000040
 00000000 00000000 00000000 01007965 6B206369 66696365 70732065 68742066 f the specific key.............. 000060
 65797120 656C6968 77206465 72727563 636F2072 6F727265 206E412A 00010352 R...*An error occurred while qye 000080
 65727275 63636F20 726F7272 65206E41 2A006174 6164204D 46442067 6E697972 rying DFM data.*An error occurre 0000A0
 20656D6F 53260061 74616420 4C4D4420 676E6979 72657971 20656C69 68772064 d while qyerying DML data.&Some  0000C0
 7972746E 65207265 64726F20 65687420 6E692073 72616863 206C6167 656C6C69 illegal chars in the order entry 0000E0
 6361736E 61727420 4C4D4420 646E652F 74726174 73206F74 20726F72 72452300 .#Error to start/end DML t ansac 000100
 6E696464 6120656C 69687720 64657272 7563636F 20726F72 72453400 6E6F6974 tion.4Error occurred while  addin 000120
 726F7272 452C0042 44206F74 20657475 62697274 74612062 75732077 656E2067 g new sub attribute to DB.,E..or 000140
 73727474 61206275 7320676E 69786966 20656C69 68772064 65727275 63636F20  occurred while fixing sub attrs 000160
 64646120 656C6968 77206465 72727563 636F2072 6F727245 2D007265 64726F20  order.-Error occurred while add 000180
 646E6966 2074276E 61433200 4D464420 6F74206D 65746920 7473656E 20676E69 ing nest item to DFM.2Can't find 0001A0
 656A626F 20656874 206D6F72 6620656C 646E6168 20746365 6A626F20 65687420  the object handle from the obje 0001C0
 72662072 6F662079 656B2065 74616572 63207427 6E614326 00656D61 6E207463 ct name.&Can't create key for fr 0001E0
```

```
Dump of file SATURN:[PCCOMMON.DUMP.DLL]DAATTRDF.TMP;1 on 18-APR-1990 10:39:32.72
File ID (535,11,0)   End of file block 82 / Allocated 84

Virtual block number 76 (0000004C), 512 (0200) bytes

7461206E 61206576 6F6D2074 276E6143 32002E73 65747562 69727474 61206565 ee attributes..2Can't move an at 000000
73657475 62697274 74612062 75732073 74692072 65646E75 20657475 62697274 tribute under its sub-attributes 000020
6D6F7266 20656D61 6E207974 69746E65 20657461 64707520 74276E61 432E002E ...Can't update entity name from 000040
00000000 00000000 01000100 01000100 2E6D726F 66206574 75626972 74746120  attribute form................. 000060
00951400 009009E6 00000001 00000053 00000000 FFFF0001 000E0352 00000CAF £...R...........S.......|....... 000080
04020005 80020002 09EB0006 00030000 00000000 09E7FFFF 000E0410 00FAFFF0 Þ.*.......Ö...........Š......... 0000A0
006403F2 00058001 000109F2 00080005 00000000 0000FFFF FFFF0077 00080028 (...w...........................d. 0000C0
000800EC 03E60007 8002000C 09FB0000 00060000 00000000 FFFFFFFF 00740008 ..t...............«.......|.š... 0000E0
00600008 00480304 00058001 000109FC 000F0005 00000000 0000FFFF FFFF0076 v...............*........å.H...m. 000100
FFFF006E 000800EC 03C80007 8002000C 0A0C0000 00060000 00000000 FFFFFFFF ........................à.ã...n.... 000120
FFFFFFFF 00780008 00340386 00058001 00010A0D 000C0005 00000000 0000FFFF ....................Ñ.4...x..... 000140
0000FFFF FFFF0079 003000F0 03840005 80030007 0A1A0000 000A0000 00000000 ....................Þ.0.y....... 000160
00000000 FFFFFFFF 006F0008 002C0374 00058001 00010A18 00080005 00000000 ................t.,...o......... 000180
00000000 0000FFFF FFFF0070 000800C1 03680007 8002000C 0A240000 00060000 ......$.......h.è...p........... 0001A0
00070000 00000000 FFFFFFFF 00720008 0064035C 00058001 00010A25 00090005 ....%.......\.d...r............. 0001C0
00030003 00000000 0000FFFF FFFF0073 003000C5 032A0005 80000000 0A2F0000 ../.......*.é.0.s............... 0001E0

Dump of file SATURN:[PCCOMMON.DUMP.DLL]DAATTRDF.TMP;1 on 18-APR-1990 10:39:32.72
File ID (535,11,0)   End of file block 82 / Allocated 84

Virtual block number 77 (0000004D), 512 (0200) bytes

0A340007 00030000 00000000 FFFFFFFF 012C000C 0026034E 00CF8002 04000A30 0.....ü.N.&...,................4. 000000
00000A3C 00060003 00000000 0000FFFF FFFF0120 000C0026 033C00CF 80020000 ....Ü.<.&...-................<... 000020
80010001 0A430011 00050000 00000000 FFFFFFFF 012E000C 0026032A 00CF8002 ..Ü.*.&...................C..... 000040
00058000 00000A55 00000007 00000000 0000FFFF FFFF00CA 00080064 031A0005 ....d...ò................U....... 000060
02D80005 80010001 0A560022 00050000 00000000 FFFFFFFF 00CB0030 00C502E8 Ò.é.0.Ù.............".V.......Ä. 000080
001E02CC 00068002 000C0A79 00000006 00000000 0000FFFF FFFF00CC 000800A2 Ä...ä..............y.......ä.... 0000A0
0008009D 02CC002A 8002000C 0A7A0000 00060000 00000000 FFFFFFFF 00CE0008 ..ö..............z......*.ä..... 0000C0
00030008 007802C0 00068001 00010A7B 00150005 00000000 0000FFFF FFFF00D0 Å...............{.......å.x...Æ. 0000E0
FFFF0004 003000C5 028E0004 80000000 0A910000 00070000 00000000 FFFFFFFF ........................é.0.å... 000100
FFFFFFFF 0135000C 002702B2 00CD8002 04000A92 00030003 00000000 0000FFFF ....................ë.ý.'...5..... 000120
0000FFFF FFFF0136 000C0026 02A000CD 80020000 0A960007 00030000 00000000 ................ë...&...6....... 000140
00000000 FFFFFFFF 0137000C 0025028E 00CE8002 00000A9E 00060003 00000000 ...............ö...%...7........ 000160
00000000 0000FFFF FFFF0005 00080050 027E0005 80010001 0AA5000F 00050000 ......É........~.P...|.......... 000180
00030000 00000000 FFFFFFFF 00060008 00BC0272 00078002 000C0AB5 00000006 ....ç........r.¥...µ............ 0001A0
00100005 00000000 0000FFFF FFFF0007 0008002D 027000C9 80020002 0AB60007 ..Ñ.....è.p.-...¶............... 0001C0
0ACF0000 00070000 00000000 FFFFFFFF 00080008 00640266 00058001 00010ABE ƒ.......f.d...Ä................ü. 0001E0

Dump of file SATURN:[PCCOMMON.DUMP.DLL]DAATTRDF.TMP;1 on 18-APR-1990 10:39:32.72
File ID (535,11,0)   End of file block 82 / Allocated 84

Virtual block number 78 (0000004E), 512 (0200) bytes

04000AD0 00030003 00000000 0000FFFF FFFF0009 003000C5 02340005 80000000 ......4.é.0.)..............Å... 000000
80020000 0AD40007 00030000 00000000 FFFFFFFF 0138000C 00260258 00CF8002 ..Ü.X.&...8................å..... 000020
00CF8002 00000ADC 00060003 00000000 0000FFFF FFFF0139 000C0026 024600CF Ü.F.&...9...............É.....Ü. 000040
02240005 80010001 0AE30015 00050000 00000000 FFFFFFFF 013A000C 00260234 4.&...:................D.......$. 000060
00EC0218 00078002 000C0AF9 00000006 00000000 0000FFFF FFFF000B 00080096 ....Ù................*.........å. 000080
0008003C 02060005 80010001 0AFA0007 00050000 00000000 FFFFFFFF 000C0008 ..É...............*..........<... 0000A0
00E60008 00EC01FA 00078002 000C0802 00000006 00000000 0000FFFF FFFF00E5 |.......................*.é...|. 0000C0
FFFF00E7 0008003C 01E80005 80010001 0B03000A 00050000 00000000 FFFFFFFF .....................Ò.<...Ò.... 0000E0
FFFFFFFF 00E80008 00EC01DC 00078002 000C0B0E 00000006 00000000 0000FFFF ....................É.ã...Ò..... 000100
0000FFFF FFFF00E9 006F00F0 01630005 80010002 0B0F001F 00050000 00000000 ....................c.Þ.o.Ò...... 000120
00000000 FFFFFFFF 00EA0008 004A01B9 000A8001 00010B2F 00110005 00000000 ......../.......¿.J...ð......... 000140
00000000 0000FFFF FFFF00EB 00080096 01BB0058 8002000C 0B410000 00060000 ......A.....X.É......Š.......... 000160
00060000 00000000 FFFFFFFF 00EC0008 004A01AB 000A8001 00010B42 000F0005 ....B.......¨.J...ä............. 000180
00120005 00000000 0000FFFF FFFF00ED 00080096 01AD0058 8002000C 0B520000 ..R.....X.Ù.....Ù............... 0001A0
0B660000 00060000 00000000 FFFFFFFF 00EE0008 004A019D 000A8001 00010B53 S.........J...Ý................f. 0001C0
00010B67 00290005 00000000 0000FFFF FFFF00EF 00080096 019F0058 8002000C ....X.......ÿ.............).g... 0001E0
```

```
Dump of file SATURN:[PCCOMMON.DUMP.DLL]DAATTRDF.TMP;1 on 18-APR-1990 10:39:32.72
File ID (535,11,0)   End of file block 82 / Allocated 84

Virtual block number 79 (0000004F), 512 (0200) bytes

80000000 08910000 00070000 00000000 FFFFFFFF 00F10008 00A00190 00538001 ..S.......þ......................... 000000
00058001 00020892 00120005 00000000 0000FFFF FFFF00F2 0028009D 01660054 T.f...(.·......................... 000020
0148000A 80010001 08A5000C 00050000 00000000 FFFFFFFF 00F5004C 00F0010E ..Þ.L.¥...............É.......H. 000040
00E2013C 000C8002 000C0882 00000006 00000000 0000FFFF FFFF00F9 00080046 F...ª...............ý.......<.â. 000060
00080035 012A000A 80010001 0883000C 00050000 00000000 FFFFFFFF 00FA0008 ..ª...............*.......*.5... 000080
00F60008 0032012A 00438002 00040BC0 00060003 00000000 0000FFFF FFFF0100 ...............À.....C.*.2...-. 0000A0
FFFF00F7 00080034 011E0043 80020004 08C70006 00030000 00000000 FFFFFFFF ..............Ú.....C...4...¥... 0000C0
FFFFFFFF 00F80008 00320112 00438002 00040BCE 00070003 00000000 0000FFFF .............ö.....C...2...½..... 0000E0
0000FFFF FFFF0101 000D0026 01120089 80020000 08D60006 00030000 00000000 ..........Ø.........&.......... 000100
00000000 FFFFFFFF 00F80008 004800FE 00058002 000208DD 00000003 00000000 ........Ý.......±.H...«......... 000120
00000000 0000FFFF FFFF00FC 00080048 00EE0005 80020002 08E80008 00030000 ......Š.......Ý.H...=.......... 000140
00060000 00000000 FFFFFFFF 00840008 002C000E 00058001 00010BF4 00080005 ....¶.......ß.,...........  ..... 000160
00080005 00000000 0000FFFF FFFF0085 000800C1 00020007 80020008 08FD0000 ..».......Ø.ê..............  ... 000180
0C070000 00070000 00000000 FFFFFFFF 00860008 003200C6 00058001 00010BFE ±.......ó.2....................... 0001A0
04000C08 00030003 00000000 0000FFFF FFFF0087 003000C5 00940005 80020000 ........é.0....................... 0001C0
80020000 0C0C0007 00030000 00000000 FFFFFFFF 012F000C 002600B8 00CF8002 ..Ü.|.&.../...................... 0001E0
```

```
Dump of file SATURN:[PCCOMMON.DUMP.DLL]DAATTRDF.TMP;1 on 18-APR-1990 10:39:32.72
File ID (535,11,0)   End of file block 82 / Allocated 84

Virtual block number 80 (00000050), 512 (0200) bytes

00CF8002 00000C14 00060003 00000000 0000FFFF FFFF0130 000C0026 00A600CF Ü.Ï.&...0.....................Ü. 000000
00840005 80010001 0C1B0005 00050000 00000000 FFFFFFFF 0131000C 00260094 ..&...1......................... 000020
00C10078 00078002 000C0C21 00000006 00000000 0000FFFF FFFF0082 0008003C <..................!........x.é. 000040
00080064 006C0005 80010001 0C220006 00050000 00000000 FFFFFFFF 007F0008 ..................".......l.d... 000060
00810030 00C5003A 00058002 00000C29 00000007 00000000 0000FFFF FFFF0080 ................).......:.é.0... 000080
FFFF012C 000C0026 005E00CF 80020400 0C2A0003 00030000 00000000 FFFFFFFF ..............*.....Ü.^.&...,... 0000A0
FFFFFFFF 0120000C 0026004C 00CF8002 00000C2E 00070003 00000000 0000FFFF ..................Ü.L.&...-..... 0000C0
0000FFFF FFFF0134 000C0026 003A00CF 80020000 0C360006 00030000 00000000 ..........6.....Ü.:.&...4....... 0000E0
00000000 FFFFFFFF 0096002D 00F00005 00058001 00020C3D 00100005 00000000 ........=.........Þ.-............ 000100
00000000 0000FFFF FFFF0097 00080019 001F0038 80010001 0C4E0004 00050000 ......N.....8.................... 000120
00050000 00000000 FFFFFFFF 00980008 001A001F 00788001 00010C53 00040005 ....S.....x...................... 000140
00070005 00000000 0000FFFF FFFF0099 0008001A 001F0088 80010001 0C580004 ..X.....|........................ 000160
0C650007 00050000 00000000 FFFFFFFF 009A0008 00280014 000A8001 00010C5D ]..........(....................e. 000180
00010C60 000A0005 00000000 0000FFFF FFFF009B 00080028 0009000A 80010001 .........(..................m... 0001A0
80010001 0C78000A 00050000 00000000 FFFFFFFF 009C0008 00370014 00388001 ..8...7....................x..... 0001C0
00888001 00010C83 000A0005 00000000 0000FFFF FFFF009D 00080037 00140078 x...7.........................|. 0001E0
```

```
Dump of file SATURN:[PCCOMMON.DUMP.DLL]DAATTRDF.TMP;1 on 18-APR-1990 10:39:32.72
File ID (535,11,0)   End of file block 82 / Allocated 84

Virtual block number 81 (00000051), 512 (0200) bytes

00090038 80010001 0C8E000A 00050000 00000000 FFFFFFFF 009E0008 00370014 ..7.........................8... 000000
00370009 00788001 00010C99 000A0005 00000000 0000FFFF FFFF009F 00080036 6.........................x...7. 000020
00080037 000900B8 80010001 0CA4000A 00050000 00000000 FFFFFFFF 00A00008 ................É.....|...7... 000040
72747441 00003A79 7469746E 452A0074 63656C65 53000000 0000FFFF FFFF00A1 À..........Select.*Entity:..Attr 000060
6E6F6E79 5300003A 6E6F6974 70697263 73654400 003A656D 616E2065 74756269 ibute name:..Description:..Synon 000080
656C6544 00656361 6C706552 00646441 00007360 796E6F6E 79532A00 003A6D79 ym:..*Synonyms..Add.Replace.Dele 0000A0
20746E65 6E6F7060 6F430000 73657475 62697274 74612072 656E774F 2A006574 te.*Owner attributes..Component  0000C0
706D6F43 2A000000 3A296560 616E202C 72656472 6F282065 74756269 72747461 attribute (order, name):...*Comp 0000E0
65440065 63616C70 65520064 64410000 73657475 62697274 74612074 6E656E6F onent attributes..Add.Replace.De 000100
412A0079 72616069 72500000 3A796568 20646574 6169636F 73734100 6574656C lete.Associated key:..Primary.*A 000120
656C6544 00656361 6C706552 00646441 00007379 65682064 65746169 636F7373 ssociated keys..Add.Replace.Dele 000140
6E69616D 6F440000 3A656C62 61742065 756C6176 20646577 6F6C6C41 2A006574 te.*Allowed value table:..Domain 000160
6E676965 726F6620 666F206E 69676972 4F00003A 6E6F6973 6E656069 4400003A :..Dimension:..Origin of foreign 000180
3A746573 70207965 68206E67 6965726F 46006574 75626972 74746120 79656820  key attribute.Foreign key pset: 0001A0
69727474 61206E67 6965726F 4600003A 79746974 6E65206E 67696572 6F460000 ..Foreign entity:..Foreign attri 0001C0
65747562 69727474 61206E67 6965726F 66206F74 20687461 5000003A 65747562 bute:..Path to foreign attribute 0001E0
```

```
Dump of file SATURN:[PCCOMMON.DUMP.DLL]DAATTRDF.TMP;1 on 18-APR-1990 10:39:32.72
File ID (535,11,0)   End of file block 82 / Allocated 84

Virtual block number 82 (00000052), 512 (0200) bytes

616D726F 666E6920 65637275 6F530000 29207463 656A626F 2E657079 74202820  ( type.object )..Source informa 000000
003A6570 79742065 6372756F 5300003A 6560616E 20656372 756F5300 6E6F6974 tion.Source name:..Source type:. 000020
6C754E00 2E2E2E4C 44500064 65766972 65440060 65747379 53006C61 756E614D Manual.System.Derived.PDL....Nul 000040
654B0000 3A64726F 7779654B 00656C62 61726F74 53006465 776F6C6C 6120736C ls allowed.Storable.Keyword:..Ke 000060
3A65746F 4E006574 656C6544 00656361 6C706552 00646441 00007364 726F7779 ywords..Add.Replace.Delete.Note: 000080
65735500 6574656C 65440065 63616C70 65520064 64410000 7365746F 4E2A0000 ..*Notes..Add.Replace.Delete.Use 0000A0
65724300 72657355 00656069 54006574 6144006E 6F697461 60726F66 6E692072 r information.Date.Time.User.Cre 0000C0
5F5F5F5F 5F5F5F5F 005F5F5F 5F5F5F5F 5F5F5F00 64657461 64705500 64657461 ated.Updated.__________.________ 0000E0
5F5F5F5F 5F5F5F00 5F5F5F5F 5F5F5F5F 5F5F005F 5F5F5F5F 5F5F5F5F 5F005F5F __.__________.__________._______ 000100
00000000 00000000 00000000 00000000 80005F5F 5F5F5F5F 5F5F5F5F 005F5F5F ___.__________.................. 000120
00000000 00000000 00000000 00000000 00000000 00000000 00000000 00000000 ................................ 000140
00000000 00000000 00000000 00000000 00000000 00000000 00000000 00000000 ................................ 000160
00000000 00000000 00000000 00000000 00000000 00000000 00000000 00000000 ................................ 000180
00000000 00000000 00000000 00000000 00000000 00000000 00000000 00000000 ................................ 0001A0
00000000 00000000 00000000 00000000 00000000 00000000 00000000 00000000 ................................ 0001C0
00000000 00000000 00000000 00000000 00000000 00000000 00000000 00000000 ................................ 0001E0
```

```
Dump of file SATURN:[PCCOMMON.DUMP.MSG]PRFORM.MSG;1 on 18-APR-1990 10:54:05.96
File ID (1013,25,0)   End of file block 1 / Allocated 4

Virtual block number 1 (00000001), 512 (0200) bytes

 7B000000 00000000 00000000 00000000 01000100 2E465250 00464753 4D4B4DFF .MKMSGF.PRF....................( 000000
 AB00A800 A500A200 9F009C00 99009600 93009000 8D008A00 87008400 81007E00 .-........................Á.E.´.¨ 000020
 2A012701 24012100 E400CC00 C900C600 C300C000 BD00BA00 B7008400 B100AE00 .0.Ÿ.Ç.ñ.¤.§.â.Û.6.è.ë.ð.!.$.'.* 000040
 0D490A00 4901D801 D801D501 C201B101 A2019101 79016101 4A013301 30012D01 .-.0.3.J.a.y...Å.Ÿ.ô.Í.Ä.Ü.I..I. 000060
 490A0D49 0A0D490A 00490A0D 490A0D49 0A0D490A 0D490A0D 490A0049 0A0D490A .I..I..I..I..I..I..I..I..I..I..I 000080
 0A0D490A 0D490A0D 490A0049 0A0D490A 0D490A0D 490A0049 0A0D490A 0D490A0D ..I..I..I..I..I..I..I..I..I..I.. 0000A0
 646F6D20 73736563 6F727020 676E6974 74656745 0A0D490A 0D490A0D 490A0D49 I..I..I..I..Egetting process mod 0000C0
 4F525245 5F465250 0A0D6C65 646F4D63 6F725063 6F725074 696E4945 0A0D6C65 el..EInitProcProcModel..PRF_ERRO 0000E0
 0D73776F 6C46636F 72507469 6E492045 09090953 574F4C46 52505449 4E495F52 R_INITPRFLOWS...E InitProcFlows. 000100
 65537966 69746F4E 636F7250 450A0D49 0A0D490A 0D490A00 490A0D49 0A0D490A .I..I..I..I..I..I..EProcNotifySe 000120
 00656D61 4E79654B 74655379 6669746F 4E636F72 50450A0D 6560614E 6E795374 tSynName..EProcNotifySetKeyName. 000140
 6F4E636F 7250450A 0D656D61 4E65746F 4E746553 79666974 6F4E636F 7250450A .EProcNotifySetNoteName..EProcNo 000160
 72656260 754E636F 72507469 6E49450A 00656061 4E776F6C 46746553 79666974 tifySetFlowName..EInitProcNumber 000180
 746E6572 6150636F 72507469 6E49450A 0D656D61 4E636F72 5074696E 49450A0D ..EInitProcName..EInitProcParent 0001A0
 74696E49 450A0D49 0A0D490A 0D6E6572 646C6968 43636F72 5074696E 49450A0D ..EInitProcChildren..I..I..EInit 0001C0
 00000000 00000000 00000000 00000000 00000000 00000000 0A0D0A0D 71657246 Freq............................ 0001E0
```

```
Dump of file SATURN:[PCCOMMON.DUMP.DLL]PURMAP.TMP;1 on 18-APR-1990 10:50:05.65
File ID (876,17,0)   End of file block 2 / Allocated 4

Virtual block number 1 (00000001), 512 (0200) bytes

 00000000 00000040 00000000 00000088 0000FFFF 000E0004 00000002 00195A4D MZ..............|........ə....... 000000
 00000080 00000000 00000000 00000000 00000000 00000000 00000000 00000000 ................................ 000020
 6F6E6E61 63206061 72676F72 70207369 685421CD 4C018821 CD09B400 0EBA1F0E ..¤..Ç.ë|¡.Lë!This program canno 000040
 00000000 00000024 0A0D0D2E 65646F60 20534F44 206E6920 6E757220 65622074 t be run in DOS mode....$....... 000060
 00000005 00000000 00020000 00000000 00048009 9E436F00 00070072 0505454E NE..r....oC..................... 000080
 00000000 00000000 00010000 00040000 000000F9 00720072 00680068 00400032 2.ə.h.h.r.r.ª................... 0000A0
 02100E21 00090021 00360E00 00360010 000F0F00 000F0018 006C0F00 006C0013 ..l...l...........6...6.l...l... 0000C0
 616D6863 61421D00 00000003 01010000 0050414D 52555006 00020E21 00000000 ....!....PURMAP...........Bachma 0000E0
 50414D52 55500E00 00606574 73797362 75732079 74696C69 74552053 5542206E n BUS Utility subsystem...PURMAP 000100
 00FE46C7 D88EFFFF B81E5657 000002C8 00000000 00000001 434E5546 474E4950 PINGFUNC........à...WV.|...ÄúF±. 000120
 02FE5E69 0038E9FF FF880006 E9037400 0000BF83 0102FE5E 69FE46FF 0003E900 .Õ...F±i^±...¢...t.Õ..¡..Õ8.i^±. 000140
 00009A06 76FF0876 FF501E00 02050102 FE466900 1EE90374 00008739 0A468801 ..F.9...t.Õ..iF±......P.v..v.... 000160
 00020002 900006CA C95F5E1F 0000E9FF FF88FF86 E90009E9 00008808 C483FFFF ...é.¡..Õ..ÕÑ.¡..Õ...^_èò....... 000180
 01C80001 881F0000 3E89D88E FFFFB81E 00000000 00040008 00020000 00030050 P...............|...Ä.>...|..ù. 0001A0
 8ED88CFE 8B0A76C5 1EDE8BD7 8BEC8855 00000000 00000000 00000500 02000200 ...............U.š.ж.ß.év..±.Ä. 0001C0
 8BF38BA4 F3C913A5 F3E90149 A4027401 A8C78806 7EC4D1F7 AEF2FFFF B9C033C0 â3â¿..·Ú¼ìá~..ù´.t.ÉlïÕµÊ.èµÊ.µ. 0001E0
```

```
Dump of file SATURN:[PCCOMMON.DUMP.DLL]PURMAP.TMP;1 on 18-APR-1990 10:50:05.65
File ID (876,17,0)   End of file block 2 / Allocated 4

Virtual block number 2 (00000002), 512 (0200) bytes

 00000000 00003846 4F525052 55502329 00000000 00000000 0000CB5D C28C1FFA *..õ]ù..........)#PURPROF8...... 000000
 00000000 00000000 00000000 00000000 00000000 00000000 00000000 00000000 ................................ 000020
 00000000 00000000 00000000 00000000 00000000 00000000 00000000 00000000 ................................ 000040
 00000000 00000000 00000000 00000000 00000000 00000000 00000000 00000000 ................................ 000060
 00000000 00000000 00000000 00000000 00000000 00000000 00000000 00000000 ................................ 000080
 00000000 00000000 00000000 00000000 00000000 00000000 00000000 00000000 ................................ 0000A0
 00000000 00000000 00000000 00000000 00000000 00000000 00000000 00000000 ................................ 0000C0
 00000000 00000000 00000000 00000000 00000000 00000000 00000000 00000000 ................................ 0000E0
 00000000 00000000 00000000 00000000 00000000 00000000 00000000 00000000 ................................ 000100
 00000000 00000000 00000000 00000000 00000000 00000000 00000000 00000000 ................................ 000120
 00000000 00000000 00000000 00000000 00000000 00000000 00000000 00000000 ................................ 000140
 00000000 00000000 00000000 00000000 00000000 00000000 00000000 00000000 ................................ 000160
 00000000 00000000 00000000 00000000 00000000 00000000 00000000 00000000 ................................ 000180
 00000000 00000000 00000000 00000000 00000000 00000000 00000000 00000000 ................................ 0001A0
 00000000 00000000 00000000 00000000 00000000 00000000 00000000 00000000 ................................ 0001C0
 00000000 00000000 00000000 00000000 00000000 00000000 00000000 00000000 ................................ 0001E0
```

```
Dump of file SATURN:[PCCOMMON.DUMP.DLL]PURPROF.TMP;1 on 18-APR-1990 10:50:07.18
File ID (881,11,0)   End of file block 28 / Allocated 28

Virtual block number 1 (00000001), 512 (0200) bytes

 00000000 00000040 00000000 000000B8 0000FFFF 00000004 00000018 00205A4D MZ .............¡.......a....... 000000
 00000080 00000000 00000000 00000000 00000000 00000000 00000000 00000000 ................................ 000020
 6F6E6E61 63206D61 72676F72 70207369 685421CD 4C01B821 CD09B400 0EBA1F0E ..¤..Ç.ë!¡.Lë!This program canno 000040
 00000000 00000024 0A0D0D2E 65646F6D 20534F44 206E6920 6E757220 65622074 t be run in DOS mode....$....... 000060
 00050006 00000000 00020000 00000000 00048009 8C9B3883 00070152 0505454E NE..R....8...................... 000080
 00000000 00000000 00010001 00040000 000001D9 0089007F 00740070 00400030 0.a.p.t.....\.................... 0000A0
 02000F21 01F602C3 00A80E00 00A802B8 000F0F00 000F02B6 28260F00 28250021 !.X(..&(Ñ.......¡.´...´.Ú.-.!... 0000C0
 01000000 464F5250 52555007 01040004 09691EB1 096902E3 00020E21 00000000 ....!...D.i.Ý.i......PURPROF.... 0000E0
 4D44166C 6D64034E 49574D50 05534C4C 4143534F 44080000 8E005000 10000A00 .....P.ƒ...DOSCALLS.PMWIN.dml.DM 000100
 004E5854 504F5453 4C4D440A 4F444E55 54554F48 5449574E 58545452 4154534C LSTARTTXNWITHOUTUNDO.DMLSTOPTXN. 000120
 46440E4D 46440344 4C454946 5445534C 4D440844 4C454946 59524555 514C4D44 DMLQUERYFIELD.DMLSETFIELD.DFM.DF 000140
 4D464408 4A424F4C 4D444859 52455551 4D46440F 4D524F46 53534543 4F52504D MPROCESSFORM.DFMQUERYHDMLOBJ.DFM 000160
 49474552 4D464410 474C4444 4E574859 52455551 4D46440F 4D544859 52455551 QUERYHTM.DFMQUERYHWNDDLG.DFMREGI 000180
 4F465445 534D4644 0F4E4645 534F4C43 54455340 46440D44 4C454946 52455453 STERFIELD.DFMSETCLOSEFN.DFMSETFO 0001A0
 616D6863 61421D00 001FF103 0101444E 454F5250 064F5250 03454C54 49544D52 RMTITLE.PRO.PROEND...þ....Bachma 0001C0
 4F4F4252 55500C00 006D6574 73797362 75732079 74696C69 74552053 5542206E n BUS Utility subsystem...PURBOO 0001E0

Dump of file SATURN:[PCCOMMON.DUMP.DLL]PURPROF.TMP;1 on 18-APR-1990 10:50:07.18
File ID (881,11,0)   End of file block 28 / Allocated 28

Virtual block number 2 (00000002), 512 (0200) bytes

 FF0A76FF D88EFFFF B81E5657 00000EC8 00000000 00000000 00015041 52545354 TSTRAP..........à...WV.¡...Ä.v.. 000000
 0876FF0A 76FF028A E90001B8 0006E903 7500003D 0000FFFF 9A5016F2 46800876 v..F·.P.....=..u.Õ..¡..Õ...v..v. 000020
 46800876 FF0A76FF 026CE900 01B80006 E9037500 003D0000 FFFF9A50 16FC468D .F=.P.....=..u.Õ..¡..Õl..v..v..F 000040
 FFFE76FF F276FFF4 76FF024E E90001B8 0006E903 7500003D 0000FFFF 9A5016F8 ½.P.....=..u.Õ..¡..ÕN..v¶.v·.v±. 000060
 00F67E83 0228E900 01B80006 E9037500 003D0000 FFFF9A50 16F6468D 116AFC76 v=j..F-.P.....=..u.Õ..¡..Õ(..~-. 000080
 01B80006 E9037500 003D0000 FFFF9AF2 76FFF476 FF0219E9 00008800 06E90375 u.Õ..¡..Õ...v¶.v·.....=..u.Õ..¡. 0000A0
 0000F89A 5016F646 8D086AFC 76FFFE76 FFF276FF F476FF00 0AF646C7 0200E900 .Õ..úF-...v¶.v·.v±.v=j..F-.P.½.. 0000C0
 FC76FFFE 76FFF276 FFF476FF 0001F646 C701D5E9 0001B800 06E90375 00003000 .=..u.Õ..¡..Õ!.úF-...v¶.v·.v±.v= 0000E0
 FF0002F6 46C701AA E90001B8 0006E903 7500003D 00000123 9A5016F6 4680066A j..F-.P.#...=..u.Õ..¡..Õ¯.úF-... 000100
 B80006E9 03750000 3D000001 4E9A5016 F6468007 6AFC76FF FE76FFF2 76FFF476 v¶.v·.v±.v=j..F-.P.N...=..u.Õ..¡ 000120
 01749A50 16F6468D 096AFC76 FFFE76FF F276FFF4 76FF0004 F646C701 7FE90001 ..Õ..úF-...v¶.v·.v±.v=j..F-.P.t. 000140
 46800A6A FC76FFFE 76FFF276 FFF476FF 0154E900 01B80006 E9037500 003D0000 ..=..u.Õ..¡..ÕT..v¶.v·.v±.v=j..F 000160
 FFFE76FF F276FFF4 76FF012E E90001B8 0006E903 7500003D 0000019A 9A5016F6 -.P.....=..u.Õ..¡..Õ...v¶.v·.v±. 000180
 FFF476FF 0108E900 01B80006 E9037500 003D0000 01C09A50 16F6468D 086AFC76 v=j..F-.P.à...=..u.Õ..¡..Õ...v¶. 0001A0
 E90001B8 0006E903 7500003D 000001E6 9A5016F6 46800C6A FC76FFFE 76FFF276 v·.v±.v=j..F-.P.l...=..u.Õ..¡..Õ 0001C0
 E9037500 003D0000 020C9A50 16F6468D 006AFC76 FFFE76FF F276FFF4 76FF00E2 ã..v¶.v·.v±.v=j..F-.P.....=..u.Õ 0001E0

Dump of file SATURN:[PCCOMMON.DUMP.DLL]PURPROF.TMP;1 on 18-APR-1990 10:50:07.18
File ID (881,11,0)   End of file block 28 / Allocated 28

Virtual block number 3 (00000003), 512 (0200) bytes

 00000232 9A5016F6 46800E6A FC76FFFE 76FFF276 FFF476FF 00BCE900 01B80006 ..¡..Õ¥..v¶.v·.v±.v=j..F-.P.2... 000000
 16F6468D 0F6AFC76 FFFE76FF F276FFF4 76FF0096 E90001B8 0006E903 7500003D =..u.Õ..¡..Õ...v¶.v·.v±.v=j..F-. 000020
 FC76FFFE 76FFF276 FFF476FF 0070E900 01B80006 E9037500 003D0000 02589A50 P.X...=..u.Õ..¡..Õp..v¶.v·.v±.v= 000040
 FF0001F6 46C7004A E90001B8 0006E903 7500003D 00000283 9A5016F6 468D106A j..F-.P.....=..u.Õ..¡..ÕJ.úF-... 000060
 B80006E9 03750000 3D0000FF FF9A5016 F6468D11 6AFC76FF FE76FFF2 76FFF476 v¶.v·.v±.v=j..F-.P.....=..u.Õ..¡ 000080
 00B80006 E90001B8 0006E903 7500003D 0000FFFF 9AF276FF F476FF00 1FE90001 ..Õ...v¶.v·.....=..u.Õ..¡..Õ..¡. 0000A0
 F4468D08 76FF0A76 FFD88E00 08881E56 5700010C C80006CA C95F5E1F 0000E900 .Õ...^_èò..à...WV.¡...Ä.v..v..F¶ 0000C0
 5016FC46 8D0876FF 0A76FF00 A5E90001 B80006E9 03750000 3D000000 189A5016 .P....¯=..u.Õ..¡..ÕE..v..v..F=.P 0000E0
 549A5016 F8468D08 76FF0A76 FF0087E9 0001B800 06E90375 00003D00 0000369A .6...=..u.Õ..¡..Õ...v..v..F½.P.T 000100
 8D016AFC 76FFFE76 FFF476FF F676FF00 69E90001 B80006E9 03750000 3D000000 ...=..u.Õ..¡..Õi..v-.v¶.v±.v=j.. 000120
 76FFF876 FFFA76FF 0042E900 01B80006 E9037500 003D0000 007A9A50 16FEF486 .¶±.P.z...=..u.Õ..¡..ÕB..v'.v½.v 000140
 16FEF486 8D0676FF F876FFFA 76FF0000 FFFF9A00 6A006A00 FF68006A 01436806 .hC.j.h..j.j.......v'.v½.v...¶±. 000160
 06CAC95F 5E1F0000 E90000B8 0006E900 01B80006 E9037500 003D0000 FFFF9A50 P.....=..u.Õ..¡..Õ..¡..Õ...^_èò. 000180
 00003D00 0002D39A 5016F446 8D0876FF 0A76FFD8 8E02C388 1E565700 010CC800 .à...WV.¡û..Ä.v..v..F¶.P.› .¯=.. 0001A0
 03750000 3D000002 F19A5016 FC468D08 76FF0A76 FF00A5E9 0001B800 06E90375 u.Õ..¡..ÕE..v..v..F=.P.þ.. ·..u. 0001C0
 06E90375 00003D00 00030F9A 5016F846 8D0876FF 0A76FF00 87E90001 B80006E9 Õ..¡..Õ...v..v..F½.P.....=....Õ. 0001E0
```

Dump of file SATURN:[PCCOMMON.DUMP.DLL]PURPROF.TMP;1 on 18-APR-1990 10:50:07.18
File ID (881,11,0)   End of file block 28 / Allocated 28

Virtual block number 4 (00000004), 512 (0200) bytes

```
00000336 9A5016FE F4868D05 6AFC76FF FE76FFF4 76FFF676 FF0069E9 0001B800 .j..Õi..v-.v¶.v±.v•j...¶±.P.6... 000000
6A00FF68 006A0143 680676FF F876FFFA 76FF0042 E90001B8 0006E903 7500003D =..u.Õ..j..ÕB..v".v½.v.hC.j.h..j 000020
7500003D 00000372 9A5016FE F4868D06 76FFF876 FFFA76FF 0000035E 9A006A00 .j..^....v".v½.v...¶±.P.r...=..u 000040
99B81E56 5700010C C80006CA C95F5E1F 0000E900 00B80006 E90001B8 0006E903 .Õ..j..Õ..j..Õ...^_èò..à...WV.j. 000060
A5E90001 B80006E9 03750000 3D000003 A99A5016 F4468D08 76FF0A76 FFD88E03 ..Ä.v..v..F¶.P.`...=..u.Õ..j..ÕE 000080
FF0087E9 0001B800 06E90375 00003D00 0003C79A 5016FC46 8D0876FF 0A76FF00 ..v..v..F•.P.ú...=..u.Õ..j..Õ... 0000A0
F676FF00 69E90001 B80006E9 03750000 3D000003 E59A5016 F8468D08 76FF0A76 v..v..F½.P.l...=..u.Õ..j..Õi..v- 0000C0
01B80006 E9037500 003D0000 040C9A50 16FEF486 8D036AFC 76FFFE76 FFF476FF .v¶.v±.v•j...¶±.P.....=..u.Õ..j. 0000E0
76FF0000 04349A00 6A006A00 FF68006A 01436806 76FFF876 FFFA76FF 0042E900 .ÕB..v".v½.v.hC.j.h..j.j..4....v 000100
0006E900 01B80006 E9037500 003D0000 04489A50 16FEF486 8D0676FF F876FFFA ".v½.v...¶±.P.H...=..u.Õ..j..Õ.. 000120
8D0876FF 0A76FF08 8E046FB8 1E565700 010CC800 06CAC95F 5E1F0000 E90000B8 j..Õ...^_èò..à...WV.jo..Ä.v..v.. 000140
FC468D08 76FF0A76 FF00A5E9 0001B800 06E90375 00003D00 00047F9A 5016F446 F¶.P.....=..u.Õ..j..ÕE..v..v..F• 000160
5016F846 8D0876FF 0A76FF00 87E90001 B80006E9 03750000 3D000004 9D9A5016 .P.....=..u.Õ..j..Õ...v..v..F½.P 000180
6AFC76FF FE76FFF4 76FFF676 FF0069E9 0001B800 06E90375 00003D00 0004BB9A .£...=..u.Õ..j..Õi..v-.v¶.v±.v•j 0001A0
F876FFFA 76FF0042 E90001B8 0006E903 7500003D 000004E2 9A5016FE F4868004 ...¶±.P.ā...=..u.Õ..j..ÕB..v".v½ 0001C0
F4868D06 76FFF876 FFFA76FF 0000050A 9A006A00 6A00FF68 006A0143 680676FF .v.hC.j.h..j.j.......v".v½.v...¶ 0001E0
```

Dump of file SATURN:[PCCOMMON.DUMP.DLL]PURPROF.TMP;1 on 18-APR-1990 10:50:07.18
File ID (881,11,0)   End of file block 28 / Allocated 28

Virtual block number 5 (00000005), 512 (0200) bytes

```
C95F5E1F 0000E900 00B80006 E90001B8 0006E903 7500003D 0000051E 9A5016FE ±.P.....=..u.Õ..j..Õ..j..Õ...^_è 000000
3D000005 559A5016 F4468D08 76FF0A76 FFD88E05 45B81E56 5700010C C80006CA ò..à...WV.jE..Ä.v..v..F¶.P.U..¯= 000020
00003D00 0005739A 5016FC46 8D0876FF 0A76FF00 A5E90001 B80006E9 03750000 ..u.Õ..j..ÕE..v..v..F•.P.s...=.. 000040
03750000 3D000005 919A5016 F8468D08 76FF0A76 FF0087E9 0001B800 06E90375 u.Õ..j..Õ...v..v..F½.P.....=..u. 000060
05B89A50 16FEF486 8D026AFC 76FFFE76 FFF476FF F676FF00 69E90001 B80006E9 Õ..j..Õi..v-.v¶.v±.v•j...¶±.P.j. 000080
FF68006A 01436806 76FFF876 FFFA76FF 0042E900 01B80006 E9037500 003D0000 ..=..u.Õ..j..ÕB..v".v½.v.h..j.h. 0000A0
003D0000 05F49A50 16FEF486 8D0676FF F876FFFA 76FF0000 05E09A00 6A006A00 .j.j..Á....v".v½.v...¶±.P.¶ ..=. 0000C0
1E565700 000EC800 06CAC95F 5E1F0000 E90000B8 0006E900 01B80006 E9037500 .u.Õ..j..Õ..j..Õ...^_èò..à....V. 0000E0
0001B800 06E90375 00003D00 0006289A 5016F446 8D0876FF 0A76FFD8 8E061BB8 j...Ä.v..v..F¶.P.+...=..u.Õ..j.. 000100
68E90001 B80006E9 03750000 3D000006 499A5016 FC468D08 76FF0A76 FF0089E9 Õ...v..v..F•.P.I...=..u.Õ..j..Õk 000120
FF0040E9 0001B800 06E90375 00003D00 0006679A 5016F846 8D0876FF 0A76FF00 ..v..v..F½.P.g...=..u.Õ..j..ÕM.. 000140
B80006E9 03750000 3D000006 8E9A5016 F2468D08 6AFC76FF FE76FFF4 76FFF676 v-.v¶.v±.v•j..F·.P.....=..u.Õ..j 000160
0006E903 7500003D 0000FFFF 9A006AF2 76FF0145 68F876FF FA76FF00 27E90001 ..Õ'..v".v½hE..v·j......=..u.Õ.. 000180
FFD88E06 F1B81E56 57000010 C80006CA C95F5E1F 0000E900 00B80006 E90001B8 j..Õ..j..Õ...^_èò..à...WV.jb..Ä. 0001A0
0A76FF09 91E90001 B80006E9 03750000 3D000007 019A5016 F4468D08 76FF0A76 v..v..F¶.P.....=..u.Õ..j..Õ...v. 0001C0
76FF0A76 FF0973E9 0001B800 06E90375 00003D00 00071F9A 5016FC46 8D0876FF .v..F•.P.....=..u.Õ..j..Õs..v..v 0001E0
```

Dump of file SATURN:[PCCOMMON.DUMP.DLL]PURPROF.TMP;1 on 18-APR-1990 10:50:07.18
File ID (881,11,0)   End of file block 28 / Allocated 28

Virtual block number 6 (00000006), 512 (0200) bytes

```
46880000 F046C709 55E90001 B80006E9 03750000 3D000007 3D9A5016 F8468D08 ..F½.P.=...=..u.Õ..j..ÕU.úFÞ...F 000000
7500003D 0000085F 9A5016F2 468D066A FC76FFFE 76FFF476 FFF676FF 07C2E906 .Õô..v-.v¶.v±.v•j..F·.P. ...=..u 000020
76FFF676 FF08E6E9 0001F046 C70005E9 037401F2 7E830924 E90001B8 0006E903 .Õ..j..Õ$..-·.t.Õ..úFÞ..Õl..v-.v 000040
EDE90001 B80006E9 03750000 3D000008 969A5016 F2468D06 6AFC76FF FE76FFF4 ¶.v±.v•j..F·.P.....=..u.Õ..j..ÕÙ 000060
076AFC76 FFFE76FF F476FFF6 76FF08AF E90001F0 46C70005 E9037402 F27E8308 ..-·.t.Õ..úFÞ..Õ€..v-.v¶.v±.v•j. 000080
05E90374 01F27E83 0886E900 01B80006 E9037500 003D0000 08CD9A50 16F2468D .F·.P.ë...=..u.Õ..j..ÕÑ..-·.t.Õ. 0000A0
0007639A 5016F246 8D076AFC 76FFFE76 FFF476FF F676FF08 78E90001 F046C700 .úFÞ..Õx..v-.v¶.v±.v•j..F·.P.c.. 0000C0
0841E900 01F046C7 0005E903 7402F27E 83087FE9 0001B800 06E90375 00003D00 .=..u.Õ..j..Õ...-·.t.Õ..úFÞ..ÕA. 0000E0
0006E903 7500003D 0000093B 9A5016F2 468D096A FC76FFFE 76FFF476 FFF676FF .v-.v¶.v±.v•j..F·.P.;...=..u.Õ.. 000100
FE76FFF4 76FFF676 FF080AE9 0001F046 C70005E9 037401F2 7E830848 E90001B8 j..ÕH..-·.t.Õ..úFÞ..Õ...v-.v¶.v± 000120
F27E8308 11E90001 B80006E9 03750000 3D000009 729A5016 F2468D09 6AFC76FF .v•j..F·.P.r...=..u.Õ..j..Õ...-· 000140
16F2468D 096AFC76 FFFE76FF F476FFF6 76FF07D3 E90001F0 46C70005 E9037402 .t.Õ..úFÞ..Õ€..v-.v¶.v±.v•j..F·. 000160
F046C700 05E90374 03F27E83 07DAE900 01B80006 E9037500 003D0000 09A99A50 P.`...=..u.Õ..j..ÕÚ..-·.t.Õ..úFÞ 000180
00003D00 0009E09A 5016F246 8D096AFC 76FFFE76 FFF476FF F676FF07 9CE90001 ..Õ...v-.v¶.v±.v•j..F·.P.Å...=.. 0001A0
FFF676FF 0765E900 01F046C7 0005E903 7404F27E 8307A3E9 0001B800 06E90375 u.Õ..j..ÕE..-·.t.Õ..úFÞ..Õe..v-. 0001C0
E90001B8 0006E903 7500003D 00000A17 9A5016F2 46800A6A FC76FFFE 76FFF476 v¶.v±.v•j..F·.P.....=..u.Õ..j..Õ 0001E0
```

Dump of file SATURN:[PCCOMMON.DUMP.DLL]PURPROF.TMP;1 on 18-APR-1990 10:50:07.18
File ID (881,11,0)   End of file block 28 / Allocated 28

Virtual block number 7 (00000007), 512 (0200) bytes

```
6AFC76FF FE76FFF4 76FFF676 FF072EE9 0001F046 C70005E9 037401F2 7E83076C l..-·.t.Õ..úFÞ..Õ...v-.v¶.v±.v=j 000000
E9037402 F27E8307 35E90001 B80006E9 03750000 3D00000A 4E9A5016 F246800A ..F·.P.N...=..u.Õ..|..Õ5..-·.t.Õ 000020
0A859A50 16F24680 0A6AFC76 FFFE76FF F476FFF6 76FF06F7 E90001F0 46C70005 ..úFÞ..Õ%..v-.v¶.v±.v=j..F·.P... 000040
C0E90001 F046C700 05E90374 03F27E83 06FEE900 01B80006 E9037500 003D0000 ..=..u.Õ..|..Õ±..-·.t.Õ..úFÞ..Õä 000060
06E90375 00003D00 000ABC9A 5016F246 800A6AFC 76FFFE76 FFF476FF F676FF06 ..v-.v¶.v±.v=j..F·.P.¥...=..u.Õ. 000080
76FFF476 FFF676FF 0689E900 01F046C7 0005E903 7404F27E 8306C7E9 0001B800 .|..Õú..-·.t.Õ..úFÞ..Õ...v-.v¶.v 0000A0
7E830690 E90001B8 0006E903 7500003D 00000AF3 9A5016F2 46800B6A FC76FFFE ±.v=j..F·.P.µ...=..u.Õ..|..Õ...~ 0000C0
F246800B 6AFC76FF FE76FFF4 76FFF676 FF0652E9 0001F046 C70005E9 037401F2 ·.t.Õ..úFÞ..ÕR..v-.v¶.v±.v=j..F· 0000E0
46C70005 E9037402 F27E8306 59E90001 B80006E9 03750000 3D000008 2A9A5016 .P.*...=..u.Õ..|..ÕY..-·.t.Õ..úF 000100
003D0000 0B619A50 16F2468D 0B6AFC76 FFFE76FF F476FFF6 76FF0618 E90001F0 Þ..Õ...v-.v¶.v±.v=j..F·.P.a...=. 000120
F676FF05 E4E90001 F046C700 05E90374 03F27E83 0622E900 01B80006 E9037500 .u.Õ..|..Õ"..-·.t.Õ..úFÞ..Õõ..v- 000140
0001B800 06E90375 00003D00 000B989A 5016F246 800B6AFC 76FFFE76 FFF476FF .v¶.v±.v=j..F·.P.....=..u.Õ..|.. 000160
FC76FFFE 76FFF476 FFF676FF 05ADE900 01F046C7 0005E903 7404F27E 8305EBE9 ÕŠ..-·.t.Õ..úFÞ..ÕÙ..v-.v¶.v±.v= 000180
037401F2 7E8305B4 E90001B8 0006E903 7500003D 00000828 9A5016F2 46800C6A j..F·.P.(...=..u.Õ..|..ÕÇ..-·.t. 0001A0
069A5016 F246800C 6AFC76FF FE76FFF4 76FFF676 FF0576E9 0001F046 C70005E9 Õ..úFÞ..Õv..v-.v¶.v±.v=j. F·.P.. 0001C0
E90001F0 46C70005 E9037402 F27E8305 7DE90001 B80006E9 03750000 3D00000C ...=..u.Õ..|..Õ)..-·.t.Õ.. FÞ..Õ 0001E0
```

Dump of file SATURN:[PCCOMMON.DUMP.DLL]PURPROF.TMP;1 on 18-APR-1990 10:50:07.18
File ID (881,11,0)   End of file block 28 / Allocated 28

Virtual block number 8 (00000008), 512 (0200) bytes

```
E9037500 003D0000 0C3D9A50 16F2468D 0C6AFC76 FFFE76FF F476FFF6 76FF053F ?..v-.v¶.v±.v=j..F·.P.=...=..u.Õ 000000
FFF476FF F676FF05 08E90001 F046C700 05E90374 03F27E83 0546E900 01B80006 ..|..ÕF..-·.t.Õ..úFÞ..Õ...v-.v¶. 000020
83050FE9 0001B800 06E90375 00003D00 000C749A 5016F246 800C6AFC 76FFFE76 v±.v=j..F·.P.t...=..u.Õ..|..Õ... 000040
46800D6A FC76FFFE 76FFF476 FFF676FF 04D1E900 01F046C7 0005E903 7404F27E -·.t.Õ..úFÞ..Õi..v-.v¶.v±.v=j..F 000060
C70005E9 037401F2 7E8304D8 E90001B8 0006E903 7500003D 00000CA8 9A5016F2 ·.P."...=..u.Õ..|..ÕÄ..-·.t.Õ..ú 000080
3D00000C E29A5016 F2468D00 6AFC76FF FE76FFF4 76FFF676 FF049AE9 0001F046 FÞ..Õ...v-.v¶.v±.v=j..F·.P.ã...= 0000A0
76FF0463 E90001F0 46C70005 E9037402 F27E8304 A1E90001 B80006E9 03750000 ..u.Õ..|..ÕÀ..-·.t.Õ..úFÞ..Õc..v 0000C0
01B80006 E9037500 003D0000 0D199A50 16F2468D 0D6AFC76 FFFE76FF F476FFF6 -.v¶.v±.v=j..F·.P.....=..u.Õ..|. 0000E0
76FFFE76 FFF476FF F676FF04 2CE90001 F046C700 05E90374 03F27E83 046AE900 .Õj..-·.t.Õ..úFÞ..Õ,..v-.v¶.v±.v 000100
7404F27E 830433E9 0001B800 06E90375 00003D00 000D509A 5016F246 800D6AFC =j..F·.P.P...=..u.Õ..|..Õ3..-·.t 000120
9A5016F2 46800E6A FC76FFFE 76FFF476 FFF676FF 03F5E900 01F046C7 0005E903 .Õ..úFÞ..Õ%..v-.v¶.v±.v=j..F·.P. 000140
0001F046 C70005E9 037401F2 7E8303FC E90001B8 0006E903 7500003D 00000087 ....=..u.Õ..|..Õ=..-·.t.Õ..úFÞ.. 000160
03750000 3D000000 BE9A5016 F246800E 6AFC76FF FE76FFF4 76FFF676 FF03BEE9 Õƒ..v-.v¶.v±.v=j..F·.P.ƒ...=..u. 000180
F476FFF6 76FF0387 E90001F0 46C70005 E9037402 F27E8303 C5E90001 B80006E9 Õ..|..Õé..-·.t.Õ..úFÞ..Õ...v-.v¶ 0001A0
038EE900 01B80006 E9037500 003D0000 0DF59A50 16F2468D 0E6AFC76 FFFE76FF .v±.v=j..F·.P.¾...=..u.Õ..|..Õ.. 0001C0
800E6AFC 76FFFE76 FFF476FF F676FF03 50E90001 F046C700 05E90374 03F27E83 .-·.t.Õ..úFÞ..ÕP..v-.v¶.v±.v=j.. 0001E0
```

Dump of file SATURN:[PCCOMMON.DUMP.DLL]PURPROF.TMP;1 on 18-APR-1990 10:50:07.18
File ID (881,11,0)   End of file block 28 / Allocated 28

Virtual block number 9 (00000009), 512 (0200) bytes

```
0005E903 7404F27E 830357E9 0001B800 06E90375 00003D00 000E2C9A 5016F246 F·.P.,...=..u.Õ..|..ÕW..-·.t.Õ.. 000000
00000E63 9A5016F2 46800F6A FC76FFFE 76FFF476 FFF676FF 0319E900 01F046C7 úFÞ..Õ...v-.v¶.v±.v=j..F·.P.c... 000020
FF02E2E9 0001F046 C70005E9 037401F2 7E830320 E90001B8 0006E903 7500003D =..u.Õ..|..Õ ..-·.t.Õ..úFÞ..Õã.. 000040
B80006E9 03750000 3D000009 049A5016 F246800F 6AFC76FF FE76FFF4 76FFF676 v-.v¶.v±.v=j..F·.P.....=..u.Õ..| 000060
FFFE76FF F476FFF6 76FF02AB E90001F0 46C70005 E9037402 F27E8302 E9E90001 ..ÕÕ..-·.t.Õ..úFÞ..Õ¨..v-.v¶.v±. 000080
03F27E83 02B2E900 01B80006 E9037500 003D0000 0ED19A50 16F24680 0F6AFC76 v=j..F·.P.Ì...=..u.Õ..|..Õý..~·. 0000A0
5016F246 800F6AFC 76FFFE76 FFF476FF F676FF02 74E90001 F046C700 05E90374 t.Õ..úFÞ..Õt..v-.v¶.v±.v=j..F·.P 0000C0
01F046C7 0005E903 7404F27E 83027BE9 0001B800 06E90375 00003D00 000F089A .....=..u.Õ..|..Õ(..-·.t.Õ..úFÞ. 0000E0
7500003D 00000F3F 9A5016F2 4680106A FC76FFFE 76FFF476 FFF676FF 023DE900 .Õ=..v-.v¶.v±.v=j..F·.P.?...=..u 000100
76FFF676 FF0206E9 0001F046 C70005E9 037401F2 7E830244 E90001B8 0006E903 .Õ..|..ÕD..-·.t.Õ..úFÞ..Õ...v-.v 000120
00E90001 B80006E9 03750000 3D00000F 769A5016 F2468010 6AFC76FF FE76FFF4 ¶.v±.v=j..F·.P.v...=..u.Õ..|..Õ. 000140
106AFC76 FFFE76FF F476FFF6 76FF01CF E90001F0 46C70005 E9037402 F27E8302 ..-·.t.Õ..úFÞ..Õü..v-.v¶.v±.v=j. 000160
05E90374 03F27E83 01D6E900 01B80006 E9037500 003D0000 0FAD9A50 16F2468D .F·.P.Ù...=..u.Õ..|..Õ®..-·.t.Õ. 000180
000BCF9A 5016F246 8D106AFC 76FFFE76 FFF476FF F676FF01 98E90001 F046C700 .úFÞ..Õ...v-.v¶.v±.v=j..F·.P.ü.. 0001A0
0161E900 01F046C7 0005E903 7404F27E 83019FE9 0001B800 06E90375 00003000 .=..u.Õ..|..Õ...-·.t.Õ..úFÞ..Õa. 0001C0
0043E903 76F9AAE9 03750181 3D00A3E9 0376FB0D E9037501 C230015B E9015EE9 Õ^.Õ[.=ô.u.Õ¦«v.ÕÊ.=..u.Õ^'v.ÕC. 0001E0
```

```
Dump of file SATURN:[PCCOMMON.DUMP.DLL]PURPROF.TMP;1 on 18-APR-1990 10:50:07.18
File ID (881,11,0)   End of file block 28 / Allocated 28

Virtual block number 10 (0000000A), 512 (0200) bytes

 FFC0E9F8 07E90375 01273DF8 46E90375 01223000 13E90376 F8C1E903 75013630 =6.u.Õè½v.Õ..=".u.ÕF½='.u.Õ.½Õâ. 000000
 F92EE903 75017C3D FBFFE903 7501773D F800E903 7501723D F86AE903 7501383D =;.u.Õj½=r.u.ÕÄ½=w.u.Õ.½=|.u.Õ.' 000020
 F9B3E903 7501903D F984E903 75018B3D 001BE903 76FA36E9 0375019A 3DFF9DE9 Õ..=..u.Õ6'v.Õ..=..u.Õ.'=..u.Õ°' 000040
 037501AE 3DFA74E9 037501A9 3DFA45E9 037501A4 3DFF75E9 F9E2E903 7501953D =..u.Õã'Õu.=Ê.u.ÕE'=`.u.Õt'=Ù.u. 000060
 0376FD1C E9037501 F93DFF4A E9FB01E9 037501BD 3DFAD2E9 037501B3 3DFAA3E9 ÕÉ'=°.u.Õ@'=§.u.Õ.«ÕJ.='.u.Õ.»v. 000080
 FB79E903 7501CC3D FB4AE903 7501C73D 001BE903 76FBFCE9 037501DB 3D004BE9 ÕK.=Ù.u.Õ=«v.Õ..=ú.u.ÕJ«=ä.u.Õy« 0000A0
 037501EF 3DFC3AE9 037501E5 3DFC0BE9 037501E0 3DFF15E9 FBA8E903 7501063D =ø.u.Õ'«Õ..=Å.u.Õ.==ï.u.Õ:==ÿ.u. 0000C0
 037501FE 3D001BE9 0376FDA0 E9037502 123DFEF2 E9FC98E9 037501F4 3DFC69E9 Õi==¶.u.Õ.=Õ'±=..u.Õ.»v.Õ..=±.u. 0000E0
 213DFDAF E9037502 173DFECA E9FD4CE9 0375020D 3DFD1DE9 03750208 3DFCEEE9 ÕY==..u.Õ.»=..u.ÕL»Õò±=..u.Õ€»=| 000100
 9FE9FE6B E9037502 303DFE3C E9037502 2B3DFE0D E9037502 263DFDDE E9037502 .u.Õß»=&.u.Õ.±=+.u.Õ<±=0.u.Õk±Õ. 000120
 E90375D0 08000006 B69A006A 006AF076 FF006A01 25680676 FFF876FF FA76FFFE ±.v'.v½.v.h%.j..vÞj.j..Ñ....Au.Õ 000140
 8E07AB88 1E565700 0012C800 06CAC95F 5E1F0000 E90000B8 0006E900 01B80006 ..|..Õ..|..Õ...^_èÒ..à...WV.|¨.. 000160
 FF0543E9 0001B800 06E90375 00003D00 0007B89A 5016F246 8D1476FF 1676FF08 Ä.v..v..F·.P.£..=..u.Õ..|..ÕC.. 000180
 1676FF05 25E90001 B80006E9 03750000 30000007 D99A5016 FC468D14 76FF1676 v..v..F=.P.1...=..u.Õ..|..Õ%..v. 0001A0
 76FFFA76 FF0507E9 0001B800 06E90375 00003D00 0007F79A 5016F846 8D1476FF .v..F½.P.½...=..u.Õ..|..Õ...v'.v 0001C0
 E912468B FFFFF646 C7F04689 00001147 9A006A00 6A006A00 6A012468 1276FFF8 ½.v.h$.j.j.j.j..G....FÞúF-...F.Õ 0001E0

Dump of file SATURN:[PCCOMMON.DUMP.DLL]PURPROF.TMP;1 on 18-APR-1990 10:50:07.18
File ID (881,11,0)   End of file block 28 / Allocated 28

Virtual block number 11 (0000000B), 512 (0200) bytes

 05E90374 01F07E83 0463E900 06EE46C7 0002F646 C70005E9 037401F0 7E83031E ...~Þ.t.Õ..úF-..úFŸ..Õc..~Þ.t.Õ. 000000
 07EE46C7 0002F646 C70005E9 037401F0 7E83044D E90006EE 46C70001 F646C700 .úF-..úFŸ..ÕM..~Þ.t.Õ..úF-..úFŸ. 000020
 037401F0 7E830421 E90007EE 46C70001 F646C700 05E90374 01F07E83 0437E900 .Õ7..~Þ.t.Õ..úF-..úFŸ..Õ!..~Þ.t. 000040
 46C70002 F646C700 05E90374 01F07E83 040BE900 09EE46C7 0001F646 C70005E9 Õ..úF-..úFŸ..Õ...~Þ.t.Õ..úF-..úF 000060
 01F07E83 03DFE900 09EE46C7 0003F646 C70005E9 037401F0 7E8303F5 E90009EE Ÿ..Õ%..~Þ.t.Õ..úF-..úFŸ..ÕÕ..~Þ. 000080
 0001F646 C70005E9 037401F0 7E8303C9 E90009EE 46C70004 F646C700 05E90374 t.Õ..úF-..úFŸ..Õè..~Þ.t.Õ..úF-.. 0000A0
 7E83039D E9000AEE 46C70002 F646C700 05E90374 01F07E83 0383E900 0AEE46C7 úFŸ..Õ°..~Þ.t.Õ..úF-..úFŸ..Õ...~ 0000C0
 F646C700 05E90374 01F07E83 0387E900 0AEE46C7 0003F646 C70005E9 037401F0 Þ.t.Õ..úF-..úFŸ..Õ...~Þ.t.Õ..úF- 0000E0
 035BE900 0BEE46C7 0001F646 C70005E9 037401F0 7E830371 E9000AEE 46C70004 ..úFŸ..Õq..~Þ.t.Õ..úF-..úFŸ..Õ[. 000100
 C70005E9 037401F0 7E830345 E9000BEE 46C70002 F646C700 05E90374 01F07E83 .~Þ.t.Õ..úF-..úFŸ..ÕE..~Þ.t.Õ..ú 000120
 E9000BEE 46C70004 F646C700 05E90374 01F07E83 032FE900 0BEE46C7 0003F646 F-..úFŸ..Õ/..~Þ.t.Õ..úF-..úFŸ..Õ 000140
 05E90374 01F07E83 0303E900 0CEE46C7 0001F646 C70005E9 037401F0 7E830319 ...~Þ.t.Õ..úF-..úFŸ..Õ...~Þ.t.Õ. 000160
 0CEE46C7 0003F646 C70005E9 037401F0 7E8302ED E9000CEE 46C70002 F646C700 .úF-..úFŸ..ÕÚ..~Þ.t.Õ..úF-..úFŸ. 000180
 037401F0 7E8302C1 E9000CEE 46C70004 F646C700 05E90374 01F07E83 02D7E900 .Õ■..~Þ.t.Õ..úF-..úFŸ..Õë..~Þ.t. 0001A0
 46C70002 F646C700 05E90374 01F07E83 02ABE900 0DEE46C7 0001F646 C70005E9 Õ..úF-..úFŸ..Õ¨..~Þ.t.Õ..úF-..úF 0001C0
 01F07E83 027FE900 0DEE46C7 0003F646 C70005E9 037401F0 7E830295 E9000DEE Ÿ..Õ...~Þ.t.Õ..úF-..úFŸ..Õ...~Þ. 0001E0

Dump of file SATURN:[PCCOMMON.DUMP.DLL]PURPROF.TMP;1 on 18-APR-1990 10:50:07.18
File ID (881,11,0)   End of file block 28 / Allocated 28

Virtual block number 12 (0000000C), 512 (0200) bytes

 0001F646 C70005E9 037401F0 7E830269 E9000DEE 46C70004 F646C700 05E90374 t.Õ..úF-..úFŸ..Õi..~Þ.t.Õ..úF-.. 000000
 7E83023D E9000EEE 46C70002 F646C700 05E90374 01F07E83 0253E900 0EEE46C7 úFŸ..ÕS..~Þ.t.Õ..úF-..úFŸ..Õ=..~ 000020
 F646C700 05E90374 01F07E83 0227E900 0EEE46C7 0003F646 C70005E9 037401F0 Þ.t.Õ..úF-..úFŸ..Õ'..~Þ.t.Õ..úF- 000040
 01FBE900 0FEE46C7 0001F646 C70005E9 037401F0 7E830211 E9000EEE 46C70004 ..úFŸ..Õ...~Þ.t.Õ..úF-..úFŸ..Õ«. 000060
 C70005E9 037401F0 7E8301E5 E9000FEE 46C70002 F646C700 05E90374 01F07E83 .~Þ.t.Õ..úF-..úFŸ..Õ!..~Þ.t.Õ..ú 000080
 E9000FEE 46C70004 F646C700 05E90374 01F07E83 01CFE900 0FEE46C7 0003F646 F-..úFŸ..Õü..~Þ.t.Õ..úF-..úFŸ..Õ 0000A0
 05E90374 01F07E83 01A3E900 10EE46C7 0001F646 C70005E9 037401F0 7E830189 ¿..~Þ.t.Õ..úF-..úFŸ..ÕÊ..~Þ.t.Õ. 0000C0
 10EE46C7 0003F646 C70005E9 037401F0 7E83018D E90010EE 46C70002 F646C700 .úF-..úFŸ..Õ...~Þ.t.Õ..úF-..úFŸ. 0000E0
 015BE901 5EE90161 E90010EE 46C70004 F646C700 05E90374 01F07E83 0177E900 .Õw..~Þ.t.Õ..úF-..úFŸ..Õa.Õ^.Õ[. 000100
 E9037501 363D0043 E90376F0 67E90375 01813D00 A3E90376 FE50E903 7501C23D =ô.u.ÕP±v.ÕÊ.=..u.Õg»v.ÕC.=6.u.Õ 000120
 E9037501 3B3DFFC0 E9FCC1E9 03750127 3DFCB3E9 03750122 3D0013E9 0376FCEC â=v.Õ..=".u.Õ°==',u.Õ==Õâ.=;.u.Õ 000140
 019A3DFF 9DE9FD0C E9037501 7C3DFCFE E9037501 773DFCF0 E9037501 723DFCE2 â==r.u.ÕÞ==w.u.Õ±==|.u.Õ.»Õ..=.. 000160
 E9037501 953DF02E E9037501 903DFD20 E9037501 8B3D001B E90376FD 6FE90375 u.Õo»v.Õ..=..u.Õ »=..u.Õ.»=..u.Õ 000180
 01833DFD 79E90375 01AE3DFD 6BE90375 01A93DFD 5DE90375 01A43DFF 75E9FD3C <»Õu.=Ê.u.Õ)»=`.u.Õk»=Ù.u.Õy»=°. 0001A0
 01DB3D00 4BE90376 FE66E903 7501F93D FF4AE9FD 95E90375 018D3DFD 87E90375 u.Õ.»=§.u.Õ.»ÕJ.='.u.Õf±v.ÕK.=Ù. 0001C0
 E9037501 D63DFDAA E9037501 CC3DFD9C E9037501 C73D001B E90376FD EBE90375 u.ÕŠ»v.Õ..=ú.u.Õ.»=ä.u.Õ´»=ø.u.Õ 0001E0
```

Dump of file SATURN:[PCCOMMON.DUMP.DLL]PURPROF.TMP;1 on 18-APR-1990 10:50:07.18
File ID (881,11,0)   End of file block 28 / Allocated 28

Virtual block number 13 (0000000D), 512 (0200) bytes

```
01F43DFD F5E90375 01EF3DFD E7E90375 01E53DFD D9E90375 01E03DFF 15E9FD88 ¡»Õ..=Å.u.Õ1»=[.u.ÕÓ»=ÿ.u.Õ%»=¶. 000000
02083DFE 17E90375 01FE3D00 1BE90376 FE66E903 7502123D FEF2E9FE 03E90375 u.Õ.±Õ·±=..u.Õf±v.Õ..=±.u.Õ.±=.. 000020
FE62E903 7502213D FE54E903 7502173D FECAE9FE 33E90375 02003DFE 25E90375 u.Õ%±=..u.Õ3±Õò±=..u.ÕT±=!.u.Õb± 000040
76FFF476 FFFE9FE9 FE8CE903 7502303D FE7EE903 75022B3D FE70E903 7502263D =&.u.Õp±=+.u.Õ~±=0.u.Õ.±Õ.±.v¶.v 000060
FC76FFFE 76FFF276 FFF476FF 004EE900 01B80006 E9037500 003D0000 00A29AF2 ·.Å...=..u.Õ..¦..ÕN..v¶.v·.v±.v= 000080
76FFF476 FF0027E9 0001B800 06E90375 00003D00 0000CD9A 5016F646 8DEE76FF .vŸ.F-.P.ë...=..u.Õ..¦..Õ'..v¶.v 0000A0
E90000B8 000107C7 260E5EC4 000EE900 01B80006 E9037500 003D0000 029C9AF2 ·.....=..u.Õ..¦..Õ..á^.&ú...¦..Õ 0000C0
5016F246 8D1476FF 1676FFD8 8E116D88 1E565700 0110C800 12CAC95F 5E1F0000 ...^_èò..à...WV.¡m..Ä.v..v..F·.P 0000E0
9B9A5016 FC468D14 76FF1676 FF0131E9 0001B800 06E90375 00003D00 00117D9A .)...=..u.Õ..¦..Õ1..v..v..F•.P.. 000100
0011B99A 5016F846 8D1476FF 1676FF01 13E90001 B80006E9 03750000 3D000011 ...=..u.Õ..¦..Õ...v..v..F½.P.¿.. 000120
16FEF086 8D010068 1276FFF8 76FFFA76 FF00F5E9 0001B800 06E90375 00003D00 .=..u.Õ..¦..Õ%..v•.v½.v.h....Þ±. 000140
7400003D 04C48317 83183B9A 5016FEF0 868D001C E9037400 003D0000 FFFF9A50 P.....=..t.Õ....Þ±.P.;....á.=..t 000160
003DE903 7400003D 04C483FF FF183B9A 5016FEF0 868D008A E90001B8 0006E903 .Õ..¦..Õm...Þ±.P.;....á.=..t.Õ=. 000180
0E5EC400 20E90374 10F646F6 0000FFFF 9A006A00 6A5016F6 46805016 FEF0868D ..Þ±.P.F-.Pj.j......-F-.t.Õ .á^. 0001A0
F476FF00 67E90000 B808C483 FFFF0000 9A0A76FF 0C76FF00 00681E00 0207C726 &ú....h...v..v.......á.¦..Õg..v¶ 0001C0
FFFE76FF F276FFF4 76FF004E E90001B8 0006E903 7500003D 00001672 9AF276FF .v·.r...=..u.Õ..¦..ÕN..v¶.v·.v±. 0001E0
```

Dump of file SATURN:[PCCOMMON.DUMP.DLL]PURPROF.TMP;1 on 18-APR-1990 10:50:07.18
File ID (881,11,0)   End of file block 28 / Allocated 28

Virtual block number 14 (0000000E), 512 (0200) bytes

```
F476FF00 27E90001 B80006E9 03750000 3D000016 999A5016 FEF0868D 016AFC76 v•j...Þ±.P.....=..u.Õ..¦..Õ'..v¶ 000000
00B80001 07C7260E 5EC4000E E90001B8 0006E903 7500003D 00001682 9AF276FF .v·.ÿ...=..u.Õ..¦..Õ..á^.&ú...¦. 000020
E9037508 460B0646 8BD88E16 E1B81E56 57000004 C80012CA C95F5E1F 0000E900 .Õ...^_èò..à...WV.¡Ä..Ä.F..F.u.Õ 000040
8317C200 369A0676 FF0B76FF 0045E900 01B80006 E9037400 3F802606 5EC4000C ..á^.&.?.t.Õ..¦..ÕE..v..v..6.ò.. 000060
76C4FC5E 880018E9 0372FC46 39FE468B FC46FF00 03E90000 FC46C7FE 468904C4 á..F±úF=..Õ...F=.F±9F•r.Õ...^=áv 000080
0ECBCBC9 5F5E1F00 00E90001 B8FFDAE9 0009E900 00B80006 E9037520 38802606 .&.8 u.Õ..¦..Õ..Õö.¦..Õ...^_èùà. 0000A0
E9037500 003D0000 16F19A50 16F2468D 1476FF16 76FFD88E 1843B81E 56570001 ..WV.¡C..Ä.v..v..F·.P.þ...=..u.Õ 0000C0
0006E903 7500003D 0000170F 9A5016FC 468D1476 FF1676FF 0139E900 01B80006 ..¦..Õ9..v..v..F=.P.....=..u.Õ.. 0000E0
01B80006 E9037500 003D0000 17209A50 16F8468D 1476FF16 76FF011B E90001B8 ¦..Õ...v..v..F½.P.-...=..u.Õ..¦. 000100
03740000 3D000017 529A5016 FEF2868D 01006812 76FFF876 FFFA76FF 00FDE900 .Õ»..v•.v½.v.h....·±.P.R...=..t. 000120
8D00C2E9 0001B800 06E90374 00003D04 C4831958 183B9A50 16FEF286 8D001CE9 Õ....·±.P.;.X..á.=..t.Õ..¦..Õö.. 000140
5016F646 8D5016FE F2868D00 45E90374 00003D04 C4831767 183B9A50 16FEF286 .·±.P.;.g..á.=..t.ÕE...·±.P.F-.P 000160
07C7260E 5EC40020 E9037510 F646F600 09E90374 00003D00 0017A09A 006A006A j.j......=..t.Õ..-F-.u.Õ .á^.&ú. 000180
F276FFF4 76FF0067 E90000B8 08C4831B 6000009A 0A76FF0C 76FF0026 681E0002 ...h&..v..v....m..á.¦..Õg..v¶.v· 0001A0
6AFC76FF FE76FFF2 76FFF476 FF004EE9 0001B800 06E90375 00003D00 0017D49A .å...=..u.Õ..¦..ÕN..v¶.v·.v±.v•j 0001C0
F276FFF4 76FF0027 E90001B8 0006E903 7500003D 000017FB 9A5016FE F2868D05 ...·±.P.«...=..u.Õ..¦..Õ'..v¶.v· 0001E0
```

Dump of file SATURN:[PCCOMMON.DUMP.DLL]PURPROF.TMP;1 on 18-APR-1990 10:50:07.18
File ID (881,11,0)   End of file block 28 / Allocated 28

Virtual block number 15 (0000000F), 512 (0200) bytes

```
00E90000 B8000107 C7260E5E C4000EE9 00018800 06E90375 00003D00 0018149A .....=..u.Õ..¦..Õ..á^.&ú...¦..Õ. 000000
9A5016F2 468D1476 FF1676FF D88E18B6 B81E5657 00010EC8 0012CAC9 5F5E1F00 ..^_èò..à...WV.¡Ñ..Ä.v..v..F·.P. 000020
18E49A50 16FC468D 1476FF16 76FF0139 E90001B8 0006E903 7500003D 000018C6 ó...=..u.Õ..¦..Õ9..v..v..F=.P.Õ. 000040
00001902 9A5016F8 468D1476 FF1676FF 011BE900 01B80006 E9037500 003D0000 ..=..u.Õ..¦..Õ...v..v..F½.P..... 000060
5016FEF2 868D0100 681276FF F876FFFA 76FF00FD E90001B8 0006E903 7500003D =..u.Õ..¦..Õ»..v•.v½.v.h....·±.P 000080
03740000 3D04C483 1AC2183B 9A5016FE F2868D00 1CE90374 00003D00 0019279A .'...=..t.Õ....·±.P.;.õ..á.=..t. 0000A0
8D0045E9 03740000 3D04C483 193C183B 9A5016FE F2868D00 C2E90001 B80006E9 Õ..¦..Õò...·±.P.;.<..á.=..t.ÕE.. 0000C0
7510F646 F60009E9 03740000 3D000019 759A006A 006A5016 F6468D50 16FEF286 .·±.P.F-.Pj.j..u...=..t.Õ..-F-.u 0000E0
00B808C4 83199F00 009A0A76 FF0C76FF 004C681E 000207C7 260E5EC4 0020E903 .Õ .á^.&ú....hL..v..v.......á.¦. 000100
F476FF00 4EE90001 B80006E9 03750000 3D000019 819AF276 FFF476FF 0067E900 .Õg..v¶.v·.Ÿ...=..u.Õ..¦..ÕN..v¶ 000120
01B80006 E9037500 003D0000 19D89A50 16FEF286 8D046AFC 76FFFE76 FFF276FF .v·.v±.v•j...·±.P.Ä...=..u.Õ..¦. 000140
0E5EC400 0EE90001 B80006E9 03750000 3D000019 F19AF276 FFF476FF 0027E900 .Õ'..v¶.v·.þ...=..u.Õ..¦..Õ..á^. 000160
76FFD88E 1A20B81E 56570001 0EC80012 CAC95F5E 1F0000E9 00008800 0107C726 &ú...¦..Õ...^_èò..à...WV.¦..Ä.v 000180
FF1676FF 0139E900 01B80006 E9037500 003D0000 1A309A50 16F2468D 1476FF16 ..v..F·.P.0...=..u.Õ..¦..Õ9..v.. 0001A0
1476FF16 76FF011B E90001B8 0006E903 7500003D 00001A4E 9A5016FC 468D1476 v..F=.P.N...=..u.Õ..¦..Õ...v..v. 0001C0
76FFF876 FFFA76FF 00FDE900 01B80006 E9037500 003D0000 1A6C9A50 16F8468D .F½.P.l...=..u.Õ..¦..Õ»..v•.v½.v 0001E0
```

```
Dump of file SATURN:[PCCOMMON.DUMP.DLL]PURPROF.TMP;1 on 18-APR-1990 10:50:07.18
File ID (881,11,0)   End of file block 28 / Allocated 28

Virtual block number 16 (00000010), 512 (0200) bytes

 183B9A50 16FEF286 8D001CE9 03740000 3D00001A 919A5016 FEF28680 01006812 .h....±.P.....=..t.Õ....±.P.;. 000000
 C4831AA6 183B9A50 16FEF286 8D00C2E9 0001B800 06E90374 00003D04 C4831C2C ,..á.=..t.Õ..¡..Õö....±.P.;.Ì..á 000020
 00003D00 001ADF9A 006A006A 5016F646 8D5016FE F2868D00 45E90374 00003D04 .=..t.ÕE....±.P.F-.Pj.j..Õ...=.. 000040
 0A76FF0C 76FF0072 681E0002 07C7260E 5EC40020 E9037510 F646F600 09E90374 t.Õ..-F-.u.Õ .á^.&ú....hr..v..v. 000060
 06E90375 00003D00 001B189A F276FFF4 76FF0067 E90000B8 08C4831B 0900009A ......á.¡..Õg..v¶.v......=..u.Õ. 000080
 00001B42 9A5016FE F2868003 6AFC76FF FE76FFF2 76FFF476 FF004EE9 0001B800 .¡..ÕN..v¶.v..v±.v=j....±.P.B... 0000A0
 06E90375 00003D00 001B5B9A F276FFF4 76FF0027 E90001B8 0006E903 7500003D =..u.Õ..¡..Õ'..v¶.v..[...=..u.Õ. 0000C0
 00010EC8 0012CAC9 5F5E1F00 00E90000 B8000107 C7260E5E C4000EE9 0001B800 .¡..Õ..á^.&ú...¡..Õ...^_èò..à... 0000E0
 0006E903 7500003D 0000189A 9A5016F2 46801476 FF1676FF D88E1B8A B81E5657 WV.¡...Ä.v..v..F..P.....=..u.Õ.. 000100
 01B80006 E9037500 003D0000 1BB89A50 16FC468D 1476FF16 76FF0139 E90001B8 ¡..Õ9..v..v..F=.P.¡...=..u.Õ..¡. 000120
 E90001B8 0006E903 7500003D 00001BD6 9A5016FB 46801476 FF1676FF 011BE900 .Õ...v..v..F½.P.ø...=..u.Õ..¡..Õ 000140
 1CE90374 00003D00 001BFB9A 5016FEF2 868D0100 681276FF F876FFFA 76FF00FD »..v°.v½.v.h.....±.P.«...=..t.Õ. 000160
 F2868000 C2E90001 B80006E9 03740000 3D04C483 10961838 9A5016FE F2868D00 ....±.P.;....á.=..t.Õ..¡..Õö.... 000180
 006A5016 F6468050 16FEF286 8D0045E9 03740000 3D04C483 1C10183B 9A5016FE ±.P.;....á.=..t.ÕE....±.P.F-.Pj. 0001A0
 000207C7 260E5EC4 0020E903 7510F646 F60009E9 03740000 3D00001C 499A006A j..I...=..t.Õ..-F-.u.Õ .á^.&ú... 0001C0
 859AF276 FFF476FF 0067E900 008808C4 831C7300 009A0A76 FF0C76FF 0098681E .h...v..v....s..á.¡..Õg..v¶.v... 0001E0
```

```
Dump of file SATURN:[PCCOMMON.DUMP.DLL]PURPROF.TMP;1 on 18-APR-1990 10:50:07.18
File ID (881,11,0)   End of file block 28 / Allocated 28

Virtual block number 17 (00000011), 512 (0200) bytes

 8D026AFC 76FFFE76 FFF276FF F476FF00 4EE90001 B80006E9 03750000 3D00001C ...=..u.Õ..¡..ÕN..v¶.v..v±.v=j.. 000000
 C59AF276 FFF476FF 0027E900 01B80006 E9037500 003D0000 1CAC9A50 16FEF286 ..±.P.¯...=..u.Õ..¡..Õ'..v¶.v..é 000020
 1F0000E9 00008800 0107C726 0E5EC400 0EE90001 B80006E9 03750000 3D00001C ...=..u.Õ..¡..Õ..á^.&ú...¡..Õ... 000040
 EC468D14 76FF1676 FF0001F6 46C7D88E 1CF4B81E 56570000 36C80012 CAC95F5E ^_èò..à6..WV.¡¶..ÄúF-...v..v..Fš 000060
 5016FC46 8D1476FF 1676FF01 65E90001 B80006E9 03750000 3D00001D 049A5016 .P̄.....=..u.Õ..¡..Õe..v..v..F=.P 000080
 409A5016 F8468D14 76FF1676 FF0147E9 0001B800 06E90375 00003D00 001D229A ."...=..u.Õ..¡..ÕG..v..v..F½.P.@ 0000A0
 16CA468D 206A1276 FFF876FF FA76FF01 29E90001 B80006E9 03750000 3D00001D ...=..u.Õ..¡..Õ)..v°.v½.v.j .Fò. 0000C0
 5016CA46 8D0099E9 03740000 3D04C483 1D7A183B 9A5016CA 468D0000 1D659A50 P.e....Fò.P.;.z..á.=..t.Õ...Fò.P 0000E0
 1EE90372 F24639F4 468BF246 FF0003E9 0000F246 C7F44689 04C4831D D000369A .6.ï..á..F¶úF...Õ...F..F¶9F.r.Õ. 000100
 83FFD4E9 0003E900 00F646C7 0008E903 740400F3 87F6D888 9BCA428A F2768800 ..v..Bò..Ä-.µ..t.Õ..úF-..Õ..Õå.. 000120
 13E90375 00F67E83 F0468904 C4831F79 004E9A50 16CA468D 0010E903 7401F67E --.t.Õ...Fò.P.N.y..á..Fþ.--.u.Õ. 000140
 008E681E 000207C7 260E5EC4 0020E903 7F03E7F0 7E81000A E9037D00 F07E8300 ..-þ.).Õ...-þÓ...Õ .á^.&ú....h/. 000160
 3D00001D EF9AEC76 FFEE76FF 0066E900 008808C4 831EF300 009A0A76 FF0C76FF .v..v....µ..á.¡..Õf..vŸ.vš.ÿ...= 000180
 5016F046 8D086AFC 76FFFE76 FFEC76FF EE76FF00 4DE90001 B80006E9 03750000 ..u.Õ..¡..ÕM..vŸ.vš.v±.v=j..Fþ.P 0001A0
 003D0000 1E2F9AEC 76FFEE76 FF0027E9 0001B800 06E90375 00003D00 001E169A .....=..u.Õ..¡..Õ'..vŸ.vš./...=. 0001C0
 12CAC95F 5E1F0000 E90000B8 000107C7 260E5EC4 000EE900 01B80006 E9037500 .u.Õ..¡..Õ..á^.&ú...¡..Õ...^_èò. 0001E0
```

```
Dump of file SATURN:[PCCOMMON.DUMP.DLL]PURPROF.TMP;1 on 18-APR-1990 10:50:07.18
File ID (881,11,0)   End of file block 28 / Allocated 28

Virtual block number 18 (00000012), 512 (0200) bytes

 6A006A00 6AFFFF68 20326800 6A0676FF 0876FFD8 8E1E5EB8 1E565700 0000C800 .à...WV.¡^..Ä.v..v.j.h2 h..j.j.j 000000
 18680676 FF0876FF 07F7E900 01B80006 E9037500 003D0000 20449A00 6A006A00 .j.j..D ..=..u.Õ..¡..Õ%..v  .v.h. 000020
 0006E903 7500003D 00002072 9A006A00 6A006AFF FF682060 68FFFF68 20386801 .h8 h..h' h..j.j.j..r ..=..u.Õ.. 000040
 6A006A00 6AFFFF68 208E68FF FF682066 68010E68 0676FF08 76FF07C9 E90001B8 ¡..Õè..v..v.h..hf h..h. h..j.j.j 000060
 20946801 1A680676 FF0876FF 079BE900 01B80006 E9037500 003D0000 20A09A00 ... ..=..u.Õ..¡..Õ...v..v.h..h.  000080
 E90001B8 0006E903 7500003D 000020CE 9A006A00 6A006AFF FF6820BC 68FFFF68 h..h¥ h..j.j.j..ö ..=..u.Õ..¡..Õ 0000A0
 20FC9A00 6A006A00 6AFFFF68 20EA68FF FF6820C2 68011C68 0676FF08 76FF076D m..v..v.h..hö h..hõ h..j.j.j..•  0000C0
 68FFFF68 20F06801 1E680676 FF0876FF 073FE900 01B80006 E9037500 003D0000 ..=..u.Õ..¡..Õ?..v..v.h..hþ h..h 0000E0
 76FF0711 E90001B8 0006E903 7500003D 0000212A 9A006A00 6A006AFF FF682118 .!h..j.j.j..*!..=..u.Õ..¡..Õ...v 000100
 003D0000 21589A00 6A006A00 6A214F68 21466821 4968211E 68012268 0676FF08 ..v.h".h.!h!!hF!hO!j.j.j..X!..=. 000120
 7D682174 68217768 214C6801 27680676 FF0876FF 06E3E900 01B80006 E9037500 .u.Õ..¡..ÕÕ..v..v.h'.hL!hw!ht!h} 000140
 0676FF08 76FF06B5 E90001B8 0006E903 7500003D 00002186 9A006A00 6A006A21 !j.j.j...!..=..u.Õ..¡..Õç..v..v. 000160
 E9037500 003D0000 21B49A00 6A006A00 6A21AB68 21A26821 A568217A 68013668 h6.hz!hÈ!hÅ!h¨!j.j.j..Ç!..=..u.Õ 000180
 6A006A22 076821D0 68220168 21A86801 3B680676 FF0876FF 0687E900 01B80006 ..¡..Õ...v..v.h;.h´!h."hÅ!h."j.j 0001A0
 68014568 0676FF08 76FF0659 E90001B8 0006E903 7500003D 000021E2 9A006A00 .j..ã!..=..u.Õ..¡..ÕY..v..v.hE.h 0001C0
 01B80006 E9037500 003D0000 22109A00 6A006A00 6AFFFF68 21FE68FF FF6821D6 ø!h..h±!h..j.j.j..."..=..u.Õ..¡. 0001E0
```

```
Dump of file SATURN:[PCCOMMON.DUMP.DLL]PURPROF.TMP;1 on 18-APR-1990 10:50:07.18
File ID (881,11,0)   End of file block 28 / Allocated 28

Virtual block number 19 (00000013), 512 (0200) bytes

9A006A00 6A006A22 3568222C 68222F68 22046801 72680676 FF0876FF 062BE900 .Õ+..v..v.hr.h."h/"h,"h5"j.j.j.. 000000
5D682232 68017768 0676FF08 76FF05FD E90001B8 0006E903 7500003D 0000223E >"..=..u.Õ..|..Õ»..v..v.hw.h2"h] 000020
05CFE900 01B80006 E9037500 003D0000 226C9A00 6A006A00 6A226368 225A6822 "hZ"hc"j.j.j..l"..=..u.Õ..|..Õü. 000040
0000229A 9A006A00 6A006A22 91682288 68228868 22606801 7C680676 FF0876FF .v..v.h|.h`"h."h."h."j.j.j..."..  000060
22866822 8968228E 68018168 0676FF08 76FF05A1 E90001B8 0006E903 7500003D =..u.Õ..|..ÕÀ..v..v.h..h."h¿"hÑ" 000080
FF0876FF 0573E900 01B80006 E9037500 003D0000 22C89A00 6A006A00 6A22BF68 he"j.j.j..à"..=..u.Õ..|..Õs..v.. 0000A0
7500003D 000022F6 9A006A00 6A006A22 ED6822E4 6822E768 22BC6801 8B680676 v.h..h¥"hÓ"hö"hÚ"j.j.j..-"..=..u 0000C0
6A231B68 23126823 156822EA 68019068 0676FF08 76FF0545 E90001B8 0006E903 .Õ..|..ÕE..v..v.h..hö"h.#h.#h.#j 0000E0
95680676 FF0876FF 0517E900 01B80006 E9037500 003D0000 23249A00 6A006A00 .j.j..$#..=..u.Õ..|..Õ...v..v.h. 000100
0006E903 7500003D 00002352 9A006A00 6A006A23 49682340 68234368 23186801 .h.#hC#h@#hI#j.j.j..R#..=..u.Õ.. 000120
6A006A00 6A237768 236E6823 71682346 68019A68 0676FF08 76FF04E9 E90001B8 |..ÕÕ..v..v.h..hF#hq#hn#hw#j.j.j 000140
23746801 A4680676 FF0876FF 04BBE900 01B80006 E9037500 003D0000 23809A00 ...#..=..u.Õ..|..ÕE..v..v.hE.ht# 000160
E90001B8 0006E903 7500003D 0000FFFF 9A006A00 6A006AFF FF68239C 68FFFF68 h..h.#h..j.j.j......=..u.Õ..|..Õ 000180
23DC9A00 6A006A00 6A23D368 23CA6823 CD681EDE 6801A968 0676FF08 76FF0480 ...v..v.h`.hß.hë#hò#h£#j.j.j..É# 0001A0
6823FB68 23D06801 AE680676 FF0876FF 045FE900 01B80006 E9037500 003D0000 ..=..u.Õ..|..Õ_..v..v.hÚ.hÀ#h«#h 0001C0
76FF0431 E90001B8 0006E903 7500003D 0000240A 9A006A00 6A006A24 016823F8 %#h.$j.j.j...$..=..u.Õ..|..Õ1..v 0001E0

Dump of file SATURN:[PCCOMMON.DUMP.DLL]PURPROF.TMP;1 on 18-APR-1990 10:50:07.18
File ID (881,11,0)   End of file block 28 / Allocated 28

Virtual block number 20 (00000014), 512 (0200) bytes

003D0000 24389A00 6A006A00 6A242F68 24266824 296823FE 68018368 0676FF08 ..v.h°.h±#h)$h&$h/$j.j.j..8$..=. 000000
5D682454 68245768 242C6801 B0680676 FF0876FF 0403E900 01B80006 E9037500 .u.Õ..|..Õ...v..v.h§.h,$hW$hT$h] 000020
0676FF08 76FF03D5 E90001B8 0006E903 7500003D 00002466 9A006A00 6A006A24 $j.j.j..f$..=..u.Õ..|..Õ[..v..v. 000040
E9037500 003D0000 24949A00 6A006A00 6A248B68 24826824 8568245A 6801C268 hÕ.hZ$h.$h.$h.$j.j.j...$..=..u.Õ 000060
6A006A24 B96824B0 68248368 24886801 C7680676 FF0876FF 03A7E900 01B80006 ..|..Õ]..v..v.hú.h.$h°$h¯$h¿$j.j 000080
6801CC68 0676FF08 76FF0379 E90001B8 0006E903 7500003D 000024C2 9A006A00 .j..ö$..=..u.Õ..|..Õy..v..v.hä.h 0000A0
01B80006 E9037500 003D0000 24F09A00 6A006A00 6A24E768 24DE6824 E16824B6 Ñ$hÃ$hß$hÓ$j.j.j..b$..=..u.Õ..|. 0000C0
9A006A00 6A006A25 1568250C 68250F68 24E46801 D6680676 FF0876FF 034BE900 .ÕK..v..v.hø.hÕ$h.%h.%h.%j.j.j.. 0000E0
3D682512 6801DB68 0676FF08 76FF031D E90001B8 0006E903 7500003D 0000251E .%..=..u.Õ..|..Õ...v..v.hÜ.h.%h= 000100
02EFE900 01B80006 E9037500 003D0000 254C9A00 6A006A00 6A254368 253A6825 %h:%hC%j.j.j..L%..=..u.Õ..|..Õÿ. 000120
0000257A 9A006A00 6A006A25 71682568 68256B68 25406801 E0680676 FF0876FF .v..v.hÀ.h@%hk%hh%hq%j.j.j .z%.. 000140
25966825 9968256E 6801E568 0676FF08 76FF02C1 E90001B8 0006E903 7500003D =..u.Õ..|..Õé..v..v.hÌ.hn%h.˜h.% 000160
FF0876FF 0293E900 01B80006 E9037500 003D0000 25A89A00 6A006A00 6A259F68 h.%j.j.j..´%..=..u.Õ..|..Õ...v.. 000180
7500003D 000025D6 9A006A00 6A006A25 CD6825C4 6825C768 259C6801 EF680676 v.hÿ.h.%hú%hé%hè%j.j.j..ø%..=..u 0001A0
6A25FB68 25F26825 F56825CA 6801F468 0676FF08 76FF0265 E90001B8 0006E903 .Õ..|..Õe..v..v.h¶.hò%h%%h·%h«%j 0001C0
F9680676 FF0876FF 0237E900 01B80006 E9037500 003D0000 26049A00 6A006A00 .j.j...&..=..u.Õ..|..Õ7..v..v.h' 0001E0

Dump of file SATURN:[PCCOMMON.DUMP.DLL]PURPROF.TMP;1 on 18-APR-1990 10:50:07.18
File ID (881,11,0)   End of file block 28 / Allocated 28

Virtual block number 21 (00000015), 512 (0200) bytes

0006E903 7500003D 00002016 9A006A00 6A006A21 21682006 68211868 25F86801 .h%%h.!h. h!!j.j.j... ..=..u.Õ.. 000000
6A006A00 6A265768 264E6826 51682626 6801FE68 0676FF08 76FF0209 E90001B8 |..Õ...v..v.h±.h&&hQ&hN&hW&j.j.j 000020
26546802 08680676 FF0876FF 01DBE900 01B80006 E9037500 003D0000 26609A00 ..`&..=..u.Õ..|..ÕÛ..v..v.h..hT& 000040
E90001B8 0006E903 7500003D 0000268E 9A006A00 6A006A26 8568267C 68267F68 h.&h|&h.&j.j.j...&..=..u.Õ..|..Õ 000060
268C9A00 6A006A00 6A268368 26AA6826 AD682682 68020D68 0676FF08 76FF01AD Ü..v..v.h..h.&hÜ&h¯&h°&j.j.j..¥& 000080
68260B68 26806802 12680676 FF0876FF 017FE900 01B80006 E9037500 003D0000 ..=..u.Õ..|..Õ...v..v.h..h¯&hÜ&h 0000A0
76FF0151 E90001B8 0006E903 7500003D 000026EA 9A006A00 6A006A26 E1682608 Ä&hÄ&j.j.j..ö&..=..u.Õ..|..ÕQ..v 0000C0
003D0000 27189A00 6A006A00 6A270F68 27066827 0968260E 68021768 0676FF08 ..v.h..hß&h.'h.'h.'j.j.j...'..=. 0000E0
3D682734 68273768 270C6802 21680676 FF0876FF 0123E900 01B80006 E9037500 .u.Õ..|..Õ#..v..v.h!.h.'h7'h4'h= 000100
0676FF08 76FF00F5 E90001B8 0006E903 7500003D 00002746 9A006A00 6A006A27 'j.j.j..F'..=..u.Õ..|..Õ%..v..v. 000120
E9037500 003D0000 27749A00 6A006A00 6A276B68 27626827 6568273A 68022668 h&.h:'he'hb'hk'j.j.j..t'..=..u.Õ 000140
6A006A27 99682790 68279368 27686802 28680676 FF0876FF 00C7E900 01B80006 ..|..Õú..v..v.h+.hh'h.'h.'h.'j.j 000160
68023068 0676FF08 76FF0099 E90001B8 0006E903 7500003D 000027A2 9A006A00 .j..Â'..=..u.Õ..|..Õ...v..v.h0.h 000180
01B80006 E9037500 003D0000 23AE9A00 6A006A00 6A23A568 23A26823 9F682796 .'h.#hÀ#hE#j.j.j..Ü#..=..u.Õ..|. 0001A0
B80006E9 03750000 3D0000FF FF9A00E4 681E00E9 681E0676 FF0876FF 006BE900 .Õk..v..v..hÕ..hÕ......=..u.Õ..| 0001C0
01B80006 E9037500 003D0000 FFFF9AFF FF68FFFF 680676FF 0876FF00 4AE90001 ..ÕJ..v..v.h..h.......=..u.Õ..|. 0001E0
```

Dump of file SATURN:[PCCOMMON.DUMP.DLL]PURPROF.TMP;1 on 18-APR-1990 10:50:07.18
File ID (881,11,0)   End of file block 28 / Allocated 28

Virtual block number 22 (00000016), 512 (0200) bytes

```
03750000 300000FF FF9A0000 36FF2601 F4068E01 04680676 FF0876FF 002BE900 .Õ+..v..v.h....¶.&.6.......=..u. 000000
02006300 041E9102 03002404 CAC95F5E 1F0000E9 0000B800 06E90001 880006E9 Õ..¡..Õ..¡..Õ...^_èÒ.$.......c.. 000020
0206E900 0121D300 05046700 01209100 05116500 01262900 05000000 01262000 . &......)&..e.... ..g...!I..Õ.. 000040
03000000 041FF900 02007F00 0211E001 031CEC00 0120F300 05000000 031F4000 .a.......µ ..š...Á.......  ..... 000060
03008700 021ED201 03008600 0206CA01 03007300 041E7302 03008000 02078401 .........s...s...ò.......@.  ... 000080
03001400 031F8802 03188200 01209700 05000000 01200900 05007F00 041EAF02 .£....... ....... .............. 0000A0
031A1800 0120C500 05061300 0120ED00 05039100 01206300 05008F00 04263202 .2&......c ......Ù ......é ..... 0000C0
05003600 030E9A02 0307A300 01262300 05002800 031FCA02 0300A000 0427E202 .ã'......ò...+...#&..Ê.......6.. 0000E0
0500C200 0527DC02 02004800 011DB301 0300AE00 0427C302 0318AE00 01206900 .i ..Ü...ü'..Ü...°...K...É'..ô.. 000100
0300C200 0527DF02 05053000 0120BF00 05004400 031FB102 03028800 01203500 .5 ..£...Ý...D...¢ ..=...Ô'..ô.. 000120
00000000 00000000 00160900 01203800 051E5600 0121D900 05005400 04280702 ..(..T...\!..V...; ..\.......... 000140
00000000 00000000 00000500 02000200 01C80001 881F0000 3E89D88E FFFF881E .¡...Ä.>...¡..ù................. 000160
A8C78806 7EC4D1F7 AEF2FFFF 89C033C0 8ED88CFE 880A76C5 1EDE88D7 8BEC8B55 U.š.ª.ß.év..±.Ä.ã3â¿..·Ü%ié-..ú¯ 000180
C033067E C4D788EC 8B55CB50 C28C1FFA 8BF38BA4 F3C913A5 F3E90149 A4027401 .t.Ê|iÕµÊ.èµÊ.µ.*..õ]ùU.š.ªá-.3â 0001A0
DB3399C0 330676C5 1E5657EC 8B550000 01E900C8 5DFA8891 49D1F7AE F2FFFF89 ¿..·Ü%i|..*]ù.Õ...U.šWV.év.3â.3Ü 0001C0
8BD2D1E3 D11B7230 2C1F7739 3CAC0175 283C0474 2D3C50F7 74093CFB 74203CAC ¯< t«<.t¼P<-t.<+u.¯<9w.,0r.iDi@. 0001E0
```

Dump of file SATURN:[PCCOMMON.DUMP.DLL]PURPROF.TMP;1 on 18-APR-1990 10:50:07.18
File ID (881,11,0)   End of file block 28 / Allocated 28

Virtual block number 23 (00000017), 512 (0200) bytes

```
D283D8F7 0775932D 3C580CEB 00D283D8 03D713D9 03D2D1E3 D1D2D1E3 D1FA88CB ù.*ìDi@iDi@.\.ª.Ä.@.ŠÉX<-.u.%Ä.@ 000000
61207966 69636570 73206573 61656C50 00000000 00000000 CB5D5F5E 1FDAF700 .%Õ.^_]ù........Please specify a 000020
65707320 65736165 6C50002E 79726F74 63657269 6420676E 69747369 7865206E n existing directory..Please spe 000040
61656C50 002E6874 61702065 6C696620 676E6974 73697865 206E6120 79666963 cify an existing file path..Plea 000060
68746170 20656C69 6620676E 69747369 7865206E 61207966 69636570 73206573 se specify an existing file path 000080
6C696620 676E6974 73697865 206E6120 79666963 65707320 65736165 6C50002E ..Please specify an existing fil 0000A0
69747369 7865206E 61207966 69636570 73206573 61656C50 002E6874 61702065 e path..Please specify an existi 0000C0
20726562 6D756E20 6C616765 6C6C4920 2020002E 68746170 20656C69 6620676E ng file path..   Illegal number  0000E0
656C6966 6F725000 72657355 002E736E 6F697461 7265706F 206F646E 7520666F of undo operations..User.Profile 000100
20202020 20202020 20202020 20202028 28282828 20202020 20202020 20000000 ...          (((((               000120
10101084 84848484 84848484 84101010 10101010 10101010 10101010 48202020    H............................ 000140
10100101 01010101 01010101 01010101 01010101 01018181 81818181 10101010 ................................ 000160
10100202 02020202 02020202 02020202 02020202 02028282 82828282 10101010 ................................ 000180
00000000 00000000 00000000 00000000 00000000 00000000 00000000 00201010 .. ............................. 0001A0
00000000 00000000 00000000 00000000 00000000 00000000 00000000 00000000 ................................ 0001C0
00000000 00000000 00000000 00000000 00000000 00000000 00000000 00000000 ................................ 0001E0
```

Dump of file SATURN:[PCCOMMON.DUMP.DLL]PURPROF.TMP;1 on 18-APR-1990 10:50:07.18
File ID (881,11,0)   End of file block 28 / Allocated 28

Virtual block number 24 (00000018), 512 (0200) bytes

```
00000000 00000000 00000000 00000000 00000000 00000000 00000000 00000000 ................................ 000000
00000000 FFFF0001 000E0352 00000969 00000005 01F40002 0001FFFF 00000000 ..........¶.....i...R........... 000020
00000000 07CBFFFF 0104016E 0119FFAA 003C9400 009007CA 00000001 00000041 A.......ò.....<.¯...n.....ù..... 000040
00000000 0000FFFF FFFF0113 0008006A 015E0005 80010001 07CF0017 00050000 ......ü.......^.j............... 000060
00050000 00000000 FFFFFFFF 01180008 007A0160 008E8002 000C07E7 00000006 ....Ó.......'.z................. 000080
00000006 00000000 0000FFFF FFFF011D 00080056 014A0005 80010001 07E80014 ..Ò.......J.V................... 0000A0
07FE001B 00050000 00000000 FFFFFFFF 011E0008 007A014C 008E8002 000C07FD ».......L.z...................±. 0000C0
000C081A 00000006 00000000 0000FFFF FFFF0119 00080075 01360005 80010001 ......6.u....................... 0000E0
80010001 081B001E 00050000 00000000 FFFFFFFF 011A0008 007A0138 008E8002 ....8.z......................... 000100
008E8002 000C083A 00000006 00000000 0000FFFF FFFF011B 00080087 01220005 ..".....................:....... 000120
010E0005 80010001 08380018 00050000 00000000 FFFFFFFF 011C0008 007A0124 $.z.....................;....... 000140
007A0110 008E8002 000C0854 00000006 00000000 0000FFFF FFFF0109 00080068 h...................T.........z. 000160
00080076 00EE0005 80010001 0855001A 00050000 00000000 FFFFFFFF 010E0008 ..................U.......Ý.v... 000180
0122000A 002000EF 00B98002 00040870 00030003 00000000 0000FFFF FFFF011F ................p.....¿.ÿ. ...". 0001A0
FFFF0127 000A0020 00EF008F 80020004 08740004 00030000 00000000 FFFFFFFF ..............t.......ÿ. ...'... 0001C0
FFFFFFFF 012C0008 007200DF 00058001 00010879 001B0005 00000000 0000FFFF ............y.......Ô.r...,..... 0001E0
```

Dump of file SATURN:[PCCOMMON.DUMP.DLL]PURPROF.TMP;1 on 18-APR-1990 10:50:07.18
File ID (881,11,0)   End of file block 28 / Allocated 28

Virtual block number 25 (00000019), 512 (0200) bytes

```
0000FFFF FFFF013B 000A0020 000F008F 80020004 08950004 00030000 00000000 ..................Ô. ...;....... 000000
00000000 FFFFFFFF 0136000A 0020000F 00BB8002 0004089A 00030003 00000000 ..............£.Ô. ...6......... 000020
00000000 0000FFFF FFFF0140 0008007C 00CF0005 80010001 089E001A 00050000 ..............ü.|...a........... 000040
00050000 00000000 FFFFFFFF 01450008 00420001 008E8002 000C08B9 00000006 ....¿.......1.B...E............. 000060
00040005 00000000 0000FFFF FFFF014A 00090062 00AC0005 80000001 08BA0014 ..¤.......¯.b...J............... 000080
08040004 00050000 00000000 FFFFFFFF 014F0008 001700A8 00908000 000108CF ü.......´.....O................å. 0000A0
000108D9 00010005 00000000 0000FFFF FFFF0154 00080017 00A800EC 80000001 ....š.´.....T................ì... 0000C0
80000001 08080001 00050000 00000000 FFFFFFFF 01590008 00080090 00978000 ..........Y..............Ù..... 0000E0
00038000 000108DD 00010005 00000000 0000FFFF FFFF015E 00080008 009E00B5 ç.......^..............Ì.....Æ. 000100
009E00F2 80000001 080F0001 00050000 00000000 FFFFFFFF 01630008 0007009E ......c...............Ò.....·... 000120
0066008C 00058001 00010BE1 00070005 00000000 0000FFFF FFFF0168 0008000B ....h...............Ã.........f. 000140
000A000A 008C0097 80000004 08E90000 00030000 00000000 FFFFFFFF 016D0008 ..m...............Ö............. 000160
0181000A 000A008C 00F28000 000408EA 00000003 00000000 0000FFFF FFFF0172 r...............õ.....·......... 000180
FFFF017C 000A000A 008C0003 80000004 08EB0000 00030000 00000000 FFFFFFFF ..........,.....Š.....Æ.......|... 0001A0
FFFFFFFF 0177000A 000A008C 00B58000 000408EC 00000003 00000000 0000FFFF .............š.....ç.......w..... 0001C0
0000FFFF FFFF0186 00080066 007C0007 80010001 08ED0009 00050000 00000000 ..........Ú.......|.f........... 0001E0
```

Dump of file SATURN:[PCCOMMON.DUMP.DLL]PURPROF.TMP;1 on 18-APR-1990 10:50:07.18
File ID (881,11,0)   End of file block 28 / Allocated 28

Virtual block number 26 (0000001A), 512 (0200) bytes

```
00000000 FFFFFFFF 019A000A 000A007C 00F28000 000408F7 00000003 00000000 ........¼.....·.|................ 000000
00000000 0000FFFF FFFF0195 000A000A 007C0003 80000004 08F80000 00030000 .......½.....Æ.|................ 000020
00030000 00000000 FFFFFFFF 0190000A 000A007C 00B58000 000408F9 00000003 ....ª.....ç.|................... 000040
000E0005 00000000 0000FFFF FFFF01B8 000A000A 007C0097 80000004 08FA0000 ..ª.......|..................... 000060
090A0000 00030000 00000000 FFFFFFFF 019F0008 0060006D 00058001 000108FB «.......m.'..................... 000080
0004090B 00000003 00000000 0000FFFF FFFF01B3 000A000A 006D00F2 80000004 ....·.m.....•.................... 0000A0
80000004 090C0000 00030000 00000000 FFFFFFFF 01AE000A 000A0060 00038000 ..Æ.m.....Ù..................... 0000C0
00978000 00040900 00000003 00000000 0000FFFF FFFF01A9 000A000A 006D0085 ç.m.....`........................ 0000E0
005D0005 80010001 090E0012 00050000 00000000 FFFFFFFF 01A4000A 000A006D m.....Ê.......................]. 000100
000A005D 00F28000 00040921 00000003 00000000 0000FFFF FFFF01B8 0008005B [...¡...............!.....·.]... 000120
000A000A 005D0003 80000004 09220000 00030000 00000000 FFFFFFFF 01CC000A ..ä..............".....Æ.]..... 000140
01C2000A 000A005D 00B58000 00040923 00000003 00000000 0000FFFF FFFF01C7 Ú..............#.....ç.]......ô. 000160
FFFF01BD 000A000A 005D0097 80000004 09240000 00030000 00000000 FFFFFFFF ..............$.......]......§... 000180
FFFFFFFF 01D10008 0056004D 00058001 00010925 000A0005 00000000 0000FFFF ............%.......M.V...Ì..... 0001A0
0000FFFF FFFF01E5 000A000A 004D00F2 80000004 09300000 00030000 00000000 ..........0.....·.M.....Í....... 0001C0
00000000 FFFFFFFF 01E0000A 000A004D 00038000 00040931 00000003 00000000 ........1.....Æ.M.....À......... 0001E0
```

Dump of file SATURN:[PCCOMMON.DUMP.DLL]PURPROF.TMP;1 on 18-APR-1990 10:50:07.18
File ID (881,11,0)   End of file block 28 / Allocated 28

Virtual block number 27 (0000001B), 512 (0200) bytes

```
00000000 0000FFFF FFFF01DB 000A000A 004D00B5 80000004 09320000 00030000 ......2.....ç.M.....Û........... 000000
00050000 00000000 FFFFFFFF 01D6000A 000A004D 00978000 00040933 00000003 ....3.......M.....ø............. 000020
00000003 00000000 0000FFFF FFFF01EA 00080014 003D0005 80010001 09340005 ..4.......=.....õ............... 000040
093B0000 00030000 00000000 FFFFFFFF 01FE000A 000A003D 00F28000 0004093A :.....·.=.....±...............;. 000060
0004093C 00000003 00000000 0000FFFF FFFF01F9 000A000A 003D00D3 80000004 ....Æ.=.....•...............<... 000080
80000004 09300000 00030000 00000000 FFFFFFFF 01F4000A 000A003D 00B58000 ..ç.=.....¶...............=..... 0000A0
00058001 0001093E 00100005 00000000 0000FFFF FFFF01EF 000A000A 003D0097 ..=.....ÿ...............>....... 0000C0
003000F2 80000004 094F0000 00030000 00000000 FFFFFFFF 02030008 004D0030 0.M.................O.....·.0. 0000E0
000A0030 00038000 00040950 00000003 00000000 0000FFFF FFFF0217 000A000A ....................P.....Æ.0... 000100
000A000A 003000B5 80000004 09510000 00030000 00000000 FFFFFFFF 0212000A ..................Q.....ç.0..... 000120
0208000A 000A0030 00978000 00040952 00000003 00000000 0000FFFF FFFF0200 ................R.......0....... 000140
FFFF021C 00080054 00200005 80010001 09530011 00050000 00000000 FFFFFFFF ..............S....... .T....... 000160
FFFFFFFF 0230000A 000A0020 00F28000 00040965 00000003 00000000 0000FFFF ............e.....·. .....0..... 000180
0000FFFF FFFF0228 000A000A 00200003 80000004 09660000 00030000 00000000 ..........f.....Æ. .....+....... 0001A0
00000000 FFFFFFFF 0226000A 000A0020 00B58000 00040967 00000003 00000000 ........g.....ç. .....&......... 0001C0
44000000 0000FFFF FFFF0221 000A000A 00200097 80000004 09680000 00030000 ......h....... .....!.........D 0001E0
```

```
Dump of file SATURN:[PCCOMMON.DUMP.DLL]PURPROF.TMP;1 on 18-APR-1990 10:50:07.18
File ID (881,11,0)    End of file block 28 / Allocated 28

Virtual block number 28 (0000001C), 512 (0200) bytes

 20746C75 61666544 00003A79 726F7463 65726964 20726573 7520746C 75616665 efault user directory:..Default  000000
 6C65646F 6D206174 61642074 6C756166 65440000 3A656C69 666F7270 20324244 DB2 profile:..Default data model 000020
 6C65646F 6D207373 65636F72 7020746C 75616665 4400003A 656C6966 6F727020  profile:..Default process model 000040
 69666F72 70207265 746E6972 7020746C 75616665 4400003A 656C6966 6F727020  profile:..Default printer profi 000060
 003A6D61 72676169 64206E69 20736C65 62616C20 79616C70 73694400 003A656C le:..Display labels in diagram:. 000080
 656C6170 20656469 6820796C 6C616369 7461606F 74754100 7365597E 006F4E7E ~No.~Yes.Automatically hide pale 0000A0
 65706F20 6F646E75 20666F20 72656260 754E006F 4E7E0073 65597E00 3A657474 tte:.~Yes.~No.Number of undo ope 0000C0
 4C003A6E 6F697463 61726574 6E692072 6F736976 64410000 3A736E6F 69746172 rations:..Advisor interaction:.L 0000E0
 6C615600 00000000 3A6E6769 73654400 34003300 32003100 65726F4D 00737365 ess.More.1.2.3.4.Design:.....Val 000100
 75530000 0000003A 65677265 6D206C61 72656E65 47000000 00003A65 74616469 idate:.....General merge:.....Su 000120
 003A6D72 6F66736E 61725400 00000000 3A656772 656D2065 74616E69 64726F62 bordinate merge:.....Transform:. 000140
 00003A65 73726576 65522F64 72617772 6F460000 0000003A 74696445 00000000 ....Edit:.....Forward/Reverse:.. 000160
 00000000 00000000 00000000 3A657461 72656E65 472F6572 75747061 43000000 ...Capture/Generate:............ 000180
 00000000 00000000 00000000 00000000 00000000 00000000 00000000 00000000 ................................ 0001A0
 00000000 00000000 00000000 00000000 00000000 00000000 00000000 00000000 ................................ 0001C0
 00000000 00000000 00000000 00000000 00000000 00000000 00000000 00000000 ................................ 0001E0

Dump of file SATURN:[PCCOMMON.DUMP.DLL]PURTAB.TMP;1 on 18-APR-1990 10:50:11.65
File ID (885,16,0)    End of file block 3 / Allocated 4

Virtual block number 1 (00000001), 512 (0200) bytes

 00000000 00000040 00000000 00000088 0000FFFF 00000004 00000003 013E5A4D MZ>.............í.......à....... 000000
 00000080 00000000 00000000 00000000 00000000 00000000 00000000 00000000 ................................ 000020
 6F6E6E61 63206D61 72676F72 70207369 685421CD 4C01B821 CD098400 0EBA1F0E ..¤..Ç.ë!.LëIThis program canno 000040
 00000000 00000024 0A0D002E 65646F6D 20534F44 206E6920 6E757220 65622074 t be run in DOS mode....$....... 000060
 00020005 00000000 00020000 00000000 00048009 77AE4C46 00070090 0505454E NE......FLÜw.................... 000080
 00000000 00000000 00010000 00040000 00000124 00760072 00680068 0040002C ,.à.h.h.r.v.$................... 0000A0
 02C00F21 00140052 00480F00 0048004C 00110F00 00110049 02FC0F00 02FB0015 ..«...•.I.......L.H...H.R...!.à. 0000C0
 534C4C41 43534F44 0800000A 00010000 00424154 52555006 00300E21 00000000 ....!.0..PURTAB.........DOSCALLS 0000E0
 0301014E 4654494E 49544553 4C4D440C 544F4C53 54494E49 4C4D4408 6C6D6403 .dml.DMLINITSLOT.DMLSETINITFN... 000100
 74737973 62757320 7974696C 69745520 53554220 6E616D68 6361421D 000002C3 û....Bachman BUS Utility subsyst 000120
 28FE46C7 D88EFFFF 881E5657 000002C8 00000142 41545952 45555108 00006065 em....QUERYTAB...à...WV.¡...ÄúF±( 000140
 6A006A04 6A010068 016A0014 681E08C4 83FFFF00 009A0014 681E006A 02AC6800 .h¯.j..h........á..h..j.h..j.j.j 000160
 006A006A 046A0100 68026A00 14681E00 0005C9A 0000681E 5016FE46 8D006A00 .j..F±.P.h...\....h..j.h..j.j.j. 000180
 6A006A00 6A046A01 0068036A 0014681E 0000007B 9A000168 1E5016FE 468D006A j..F±.P.h...(....h..j.h..j.j.j.j 0001A0
 006A006A 006A046A 01006804 6A001468 1E000000 9A9A0002 681E5016 FE468D00 ..F±.P.h.........h..j.h..j.j.j.j. 0001C0
 8D006A00 6A006A04 6A010068 056A0014 681E0000 00B99A00 03681E50 16FE468D .F±.P.h...¿.....h..j.h..j.j.j.. 0001E0

Dump of file SATURN:[PCCOMMON.DUMP.DLL]PURTAB.TMP;1 on 18-APR-1990 10:50:11.65
File ID (885,16,0)    End of file block 3 / Allocated 4

Virtual block number 2 (00000002), 512 (0200) bytes

 FE468D00 6A006A00 6A016A02 6A066A00 14681E00 0000D79A 0004681E 5016FE46 F±.P.h...■....h..j.j.j.j.j.j..F± 000000
 5016FE46 8D006A00 6A006A01 6A026A07 6A001468 1E000000 F59A0005 681E5016 .P.h...%....h..j.j.j.j.j.j..F±.P 000020
 681E5016 FE468D00 6A006A00 6A016A02 6A086A00 14681E00 0001139A 0006681E .h.......h..j.j.j.j.j.j..F±.P.h 000040
 0008681E 5016FE46 8D006A00 6A006A01 6A026A09 6A001468 1E000001 319A0007 ...1.....h..j.j.j.j.j.j..F±.P.h.. 000060
 609A0009 681E5016 FE468D00 6A006A00 6A016A02 6A0A6A00 14681E00 00014F9A .O....h..j.j.j.j.j.j..F±.P.h...m 000080
 00018B9A 000A681E 5016FE46 8D006A00 6A006A01 6A026A0B 6A001468 1E000001 ....h..j.j.j.j.j.j..F±.P.h...... 0000A0
 1E000001 A99A000B 681E5016 FE468D00 6A006A00 6A016A02 6A0C6A00 14681E00 ..h..j.j.j.j.j.j..F±.P.h...`.... 0000C0
 14681E00 0001C79A 000C681E 5016FE46 8D006A00 6A006A01 6A026A0D 6A001468 h..j.j.j.j.j.j..F±.P.h...ú....h. 0000E0
 6A001468 1E000001 E59A000D 681E5016 FE468D00 6A006A00 6A016A02 6A0E6A00 .j.j.j.j.j.j..F±.P.h...í.....h..j 000100
 6A106A00 14681E00 0002039A 000E681E 5016FE46 8D006A00 6A006A01 6A026A0F .j.j.j.j.j..F±.P.h........h..j.j 000120
 6A026A11 6A001468 1E000002 219A000F 681E5016 FE468D00 6A006A00 6A016A02 .j.j.j.j..F±.P.h.....!....h..j.j.j 000140
 26044789 260014B8 065EC400 00FFFF9A 0010681E 5016FE46 8D006A00 6A006A01 .j.j.j..F±.P.h........á^.¡..&.G.& 000160
 57000002 C8C8C95F 5E1F0A47 8926FE46 88065EC4 00110847 C726065E C4065F8C ._.á^.&úG...á^..F±&.G..^_èùà...W 000180
 A1BA0000 8808C483 001D0000 9A505202 6F8A0000 88006A2D 6A088E00 08881E56 V.¡...Äj-j.¡..¤o.RP......á.¡..¤Á 0001A0
 83FE46FF 0003E900 00FE46C7 0000FFFF 9AFFFF68 FFFF6823 28682329 68505202 .RPh)#h(#h..h.......úF±..Ô...F±. 0001C0
 9FFF2600 12068E2D FE5E6850 52FFFFBA 0000878D 20FE5E68 0020E903 7201FE7E ~±.r.Ô .k^±-.....¤..RPk^±-....&.. 0001E0
```

Dump of file SATURN:[PCCOMMON.DUMP.DLL]PURTAB.TMP;1 on 18-APR-1990 10:50:11.65
File ID (885,16,0)   End of file block 3 / Allocated 4

Virtual block number 3 (00000003), 512 (0200) bytes

```
C4D88E02 53B81E56 57000000 C8C8C95F 5E1F0000 E90001B8 FFD4E904 C4830000 ...á.Õå.¡..Õ...^ èùà...WV.¡S..Äá 000000
0A5EC400 0207C726 065EC423 2907C726 0E5EC402 5F0247C7 26000007 C726125E ^.&ú...&úG._.á^.&ú.)#á^.&ú...á^. 000020
C8000200 00000302 66000200 00000102 7A000200 0710CAC9 5F5E1F00 0007C726 &ú....^ èò.....z.......f.......ù 000040
80020300 00000102 7D000500 0E000200 3D020300 00000502 D8000200 00000402 .......Ū.......=.......)........ 000060
1F02C483 FFFF024B 9A57D88E FFFFB81E 00000000 00000000 00000000 1A000202 ................¡...ÄW.K....á.. 000080
00000000 00000000 00000000 00000000 04000200 02000000 01000A00 020002CB ù............................... 0000A0
468BD12B D187D103 D323D81B D12B0C74 DAF7D78B 067EC457 38E30C4E 8BEC8B55 U.Š.N.DBWá~..■¼Öt.+Ì.Ü#£.Ì.Ì+Ì.F 0000C0
5FAAF3C9 13ABF3E9 D1C38EFF FFC381C3 8C10E3D1 87AAF3C9 13ABF3E9 D1E08A0A ..ÅÌÕµ¨.èµ¯.ÌD..û.û...ûÌÕµ¨.èµ¯_ 0000E0
00000000 00000000 00000000 00000088 00010033 01050001 CB5D0856 8B06468B .F..V.]ù....3.................. 000100
00000000 00050012 00020001 FFFF0000 00000000 00000000 00000000 00000000 ................................ 000120
00000000 00000000 00000000 00000000 00000000 00000000 00000000 00000000 ................................ 000140
00000000 00000000 00000000 00000000 00000000 00000000 00000000 00000000 ................................ 000160
00000000 00000000 00000000 00000000 00000000 00000000 00000000 00000000 ................................ 000180
00000000 00000000 00000000 00000000 00000000 00000000 00000000 00000000 ................................ 0001A0
00000000 00000000 00000000 00000000 00000000 00000000 00000000 00000000 ................................ 0001C0
00000000 00000000 00000000 00000000 00000000 00000000 00000000 00000000 ................................ 0001E0
```

Dump of file SATURN:[PCCOMMON.DUMP.DLL]PDMTAB.TMP;1 on 18-APR-1990 10:49:20.10
File ID (795,38,0)   End of file block 67 / Allocated 68

Virtual block number 1 (00000001), 512 (0200) bytes

```
00000000 00000040 00000000 00000088 0000FFFF 00000004 00000040 01FC5A4D MZ•.ə...........¡.......ə....... 000000
00000080 00000000 00000000 00000000 00000000 00000000 00000000 00000000 ................................ 000020
6F6E6E61 63206061 72676F72 70207369 685421CD 4C01B821 CD09B400 0EBA1F0E ..¤..Ç.ël¡.Lë!This program canno 000040
00000000 00000024 0A00002E 65646F6D 20534F44 206E6920 6E757220 65622074 t be run in DOS mode....$....... 000060
0007000D 00000000 00020000 00000000 000A8009 5F3BA293 011505EB 0505454E NE..Š....Å;_.................... 000080
00000000 00000000 00010003 00040000 00000780 05220514 00B400A8 00400021 !.ə.¨.Ç..."¯.................... 0000A0
19DA0F00 19D90179 07F40F00 07F400F5 00150F00 001500F2 072E0F00 072D0078 (.-.......·.......X.¶...¶.y.)...Ö. 0000C0
28AE0F00 28AD044A 10080F00 10080346 007A0F00 007A033D 01F00F00 01F0031A ..Þ...Þ.=.z...z.F.......J.Ù+..Ù+ 0000E0
02311EB1 02310829 025E1EB1 025E0803 15100F21 0F5A070B 00300E21 00000000 ....!.0...Z.!.....^.Ý.^.).1.Ý.1. 000100
44500000 00424154 4D445006 00030005 00020005 00010005 00B41EB1 00B4084D M.Ç.Ý.Ç..............PDMTAB...PD 000120
41525453 48435441 4D4E4547 5445474D 44501300 02505845 544E4552 5446414D MAFTRENTEXP...PDMGETGENMATCHSTRA 000140
4C554E52 54544154 45474D44 500F0004 47534D52 52455445 474D4450 0C000354 T...PDMGETERRMSG...PDMGETATTRNUL 000160
52425553 524F4642 4D445000 00064E49 4D544E45 524F4642 4D445000 0005534C LS...PDMBFORENTMIN...PDMBFORSUBR 000180
4E494D54 4E49524F 46424D44 50000008 55545247 524F4642 4D445008 00075345 ES...PDMBFORGRTU...PDMBFORINTMIN 0001A0
5345524E 4547524F 46424D44 5000000A 504F4C54 45535054 45474D44 50000009 ...PDMGETPSETLOP...PDMBFORGENRES 0001C0
544E4554 45474D44 500C000C 444E4F4D 41494454 45535054 45474D44 5011000B ...PDMGETPSETDIAMOND...PDMGETENT 0001E0
```

Dump of file SATURN:[PCCOMMON.DUMP.DLL]PDMTAB.TMP;1 on 18-APR-1990 10:49:20.10
File ID (795,38,0)   End of file block 67 / Allocated 68

Virtual block number 2 (00000002), 512 (0200) bytes

```
54455350 5445474D 44500000 0E58414D 544E4552 4F46424D 44500000 00505845 EXP...PDMBFORENTMAX...PDMGETPSET 000000
544E4552 5446414D 44500000 1058414D 544E4952 4F46424D 44500000 0F58414D MAX...PDMBFORINTMAX...PDMAFTRENT 000020
41524148 43544547 4D445000 0012534C 4C554E52 4F46424D 44500C00 114E494D MIN...PDMBFORNULLS...PDMGETCHARA 000040
4C50544E 45544547 4D44500E 00145841 4D544E45 52544641 4D445000 00134756 VG...PDMAFTRENTMAX...PDMGETENTPL 000060
48544E45 5445474D 44501400 16454352 554F5352 4F46424D 44500000 15454341 ACE...PDMBFORSOURCE...PDMG.TENTH 000080
5445474D 44501000 18555452 47544547 4D44500A 00174E45 5454414C 46524549 IERFLATTEN...PDMGETGRTU...P.YGET 0000A0
4D445011 001A5443 50575247 524F4642 4D44500D 00194543 52554F53 52545441 ATTRSOURCE...PDMBFORGRWPCT...PDM 0000C0
500A001C 424D4F43 524F4642 4D44500B 001B5441 52545353 45524E45 47544547 GETGENRESSTRAT...PDMBFORCOMB...P 0000E0
1E544152 54534843 54414D42 55535445 474D4450 13001D50 4F4C524F 46424D44 DMBFORLOP...PDMGETSUBMATCHSTRAT. 000100
524F4642 4D44500E 001F5041 4C524556 4F455059 54425553 5445474D 44501400 ..PDMGETSUBTYPEOVERLAP...PDMBFOR 000120
46424D44 500F0021 54434554 45444B46 5445474D 44500E00 204E494D 4C414552 REALMIN ..PDMGETFKDETECT!..PDMBF 000140
44501000 23455059 54524148 43544547 4D44500E 00225445 5350504F 5250524F ORPROPPSET"..PDMGETCHARTYPE#..PD 000160
46454E45 42524549 48544547 4D445011 00245254 54414B46 4E454752 4F46424D MBFORGENFKATTR$..PDMGETHIERBENEF 000180
41484352 4F46424D 44500E00 2658414D 4C414552 524F4642 4D44500E 00255449 ITX..PDMBFORREALMAX&..PDMBFORCHA 0001A0
4E455445 474D4450 0C002850 58454C41 4552524F 46424D44 500E0027 47564152 RAVG'..PDMBFORREALEXP(..PDMGETEN 0001C0
5445474D 44500000 2A504553 54524F50 4D49524F 46424D44 50100029 58414D54 TMAX)..PDMBFORIMPORTSEP*..PDMGET 0001E0
```

```
Dump of file SATURN:[PCCOMMON.DUMP.DLL]PDMTAB.TMP;1 on 18-APR-1990 10:49:20.10
File ID (795,38,0)   End of file block 67 / Allocated 68

Virtual block number 3 (00000003), 512 (0200) bytes

45474D44 5000002C 4E494052 41484352 4F46424D 44500E00 2B4E494D 52414843 CHARMIN+..PDMBFORCHARMIN,..PDMGE 000000
500E002E 54415254 53534552 42555354 45474D44 5011002D 58414052 41484354 TCHARMAX-..PDMGETSUBRESSTRAT...P 000020
30544345 54454448 46524F46 424D4450 0F002F58 414D5241 4843524F 46424D44 DMBFORCHARMAX/..PDMBFORFKDETECTO 000040
414D4E45 47524F46 424D4450 0F003148 4354414D 42555352 4F46424D 44500F00 ..PDMBFORSUBMATCH1..PDMBFORGENMA 000060
494D544E 45544547 4D44500C 00335443 50575247 5445474D 44500C00 32484354 TCH2..PDMGETGRWPCT3..PDMGETENTMI 000080
45524F46 424D4450 0F003552 5454414B 46574F48 53524F46 424D4450 1100344E N4..PDMBFORSHOWFKATTR5..PDMBFORE 0000A0
4F46424D 44501200 37455A49 4C414954 494E494D 44500000 36454341 4C50544E NTPLACE6..PDMINITIALIZE7..PDMBFO 0000C0
4D44500F 00394D52 4F4E524F 46424D44 50080038 54494645 4E454252 45494852 RHIERBENEFIT8..PDMBFORNORM9..PDM 0000E0
4E4F4D41 49445445 5350524F 46424D44 5012003A 54415254 53424D4F 43544547 GETCOMBSTRAT:..PDMBFORPSETDIAMON 000100
5845544E 49524F46 424D4450 00003C50 5845544E 45524F46 424D4450 00003B44 D;..PDMBFORENTEXP<..PDMBFORINTEX 000120
414C4652 4F46424D 44501200 3E455059 54524148 43524F46 424D4450 0F003D50 P=..PDMBFORCHARTYPE>..PDMBFORFLA 000140
424D4450 15004058 414D5445 5350524F 46424D44 500E003F 52454948 4E455454 TTENHIER?..PDMBFORPSETMAX@..PDMB 000160
009A007F 00140008 00050001 00004150 414C5245 564F4550 59544255 53524F46 FORSUBTYPEOVERLAPA.............. 000180
55514C4D 44136C6D 6403534C 4C414353 4F44084E 49574D50 0547534D 030000BC ¥...MSG.PMWIN.DOSCALLS.dml.DMLQU 0001A0
55514C4D 44124954 47595245 55514C4D 4408454C 444E4148 4C45444F 4D595245 ERYMODELHANDLE.DMLQUERYGTI.DMLQU 0001C0
534C4D44 0C444C45 49465952 4555514C 4D440045 4D414E4E 47495345 44595245 ERYDESIGNNAME.DMLQUERYFIELD.DMLS 0001E0

Dump of file SATURN:[PCCOMMON.DUMP.DLL]PDMTAB.TMP;1 on 18-APR-1990 10:49:20.10
File ID (795,38,0)   End of file block 67 / Allocated 68

Virtual block number 4 (00000004), 512 (0200) bytes

4654494E 49544553 4C4D440C 544F4C53 54494E49 4C4D440B 54455345 4C504D49 IMPLESET.DMLINITSLOT.DMLSETINITF 000000
49544703 4D544845 4C49464F 52505445 474B5345 44114B53 45444144 4153084E N.SADADESK.DESKGETPROFILENTM.GTI 000020
5303544E 45524150 4C4F4F54 59524555 51495447 1247534D 444E4553 4954470A .GTISENDMSG.GTIQUERYTOOLPARENT.S 000040
01003103 05010168 0307010D 16030401 06F50301 01455449 5257534F 44084F49 IO.DOSWRITE...¥.........k....1.. 000060
09030702 02C60304 010B0F03 07010AAB 03044E03 031E0308 02030404 09630307 ..c...........N..¨.........ó.... 000080
04010C08 03070104 9E030C13 030B2303 040308B9 03070108 53030401 0567030E ..g....S....¿....#.............. 0000A0
03070109 03030401 0A000307 650300AA 03070304 E6030401 0EB30307 010E1903 ......ª....]....¨..e............ 0000C0
06030401 0F5D0307 010B5F03 04010000 03021503 07020536 03037603 0402028F ¢....v..6............_....]..... 0000E0
06110307 010B9803 0A4C0308 07030403 005F0307 0105CE03 04010AB7 03070104 ....ñ.....ö.....·....■.·L........ 000100
0301D603 09ED0304 04036903 0CB50307 02099003 04010B61 03070106 16030401 .........a.........ç..i.....Ú..µ.. 000120
03074603 04020000 03030107 BA030586 03040204 BD03068B 03070202 26030276 v..&....£..§.......¤.........F.. 000140
00000780 03093F03 066E0306 FE030AE7 03088203 06860304 07041303 0701038E ƒ..........Ñ..ý..Ó..±..n..?...... 000160
00014241 54595245 55510800 00656C69 666F7250 206C6564 6F4D2061 74614412 .Data Model Profile...QUERYTAB.. 000180
006A2D6A D88EFFFF B81E5657 000002C8 00000000 00000000 00000000 00000000 ................à...WV.¡...Äj-j. 0001A0
FF6823F0 6823F168 50520056 BA000088 08C483FF FF007E9A 50520024 BA000088 ¡..¤$.RP.-.....á.¡..¤V.RPhþ#hþ#h. 0001C0
FE5E6B00 20E90372 01FE7E83 FE46FF00 03E90000 FE46C700 00FFFF9A FFFF68FF .h.......úF±..Ö...F±.~±.r.Ö .k^± 0001E0

Dump of file SATURN:[PCCOMMON.DUMP.DLL]PDMTAB.TMP;1 on 18-APR-1990 10:49:20.10
File ID (795,38,0)   End of file block 67 / Allocated 68

Virtual block number 5 (00000005), 512 (0200) bytes

0001B8FF D4E904C4 8300009F FF2600F6 068E2DFE 5E685052 FFFFBA00 0087802D -....¤..RPk^±-..-.&.....á.Öå.¡.. 000000
FA46C7FC 4689FE46 89000088 D88E0008 B81E5657 000006C8 CBC95F5E 1F0000E9 Ö...^_èùà...WV.¡...Ä¡...F±.F•úF• 000020
6A006A04 6A216A01 6A0F5A68 1E08C483 001B007E 9A0F5A68 1E006A05 A4680028 (.hÊ.j..hZ..~....á..hZ.j.j!j.j.j 000040
6A006A00 6A016A02 6A026A0F 5A681E00 0000D89A 0042681E 5016FA46 8D006A00 .j..F•.P.hB..Ù....hZ.j.j.j.j.j.j 000060
8D006A00 6A006A01 6A026A03 6A0F5A68 1E000000 F99A0047 681E5016 FA468D00 ..F•.P.hG..•....hZ.j.j.j.j.j.j.. 000080
FA468D00 6A006A00 6A056A01 6A046A0F 5A681E00 0001179A 0051681E 5016FA46 F•.P.hQ.......hZ.j.j.j.j.j.j..F• 0000A0
5016FA46 8D006A00 6A006A05 6A016A05 6A0F5A68 1E000001 359A005D 681E5016 .P.h]..5....hZ.j.j.j.j.j.j..F•.P 0000C0
681E5016 FA468D00 6A006A00 6A056A01 6A066A0F 5A681E00 0001539A 0066681E .hf..S....hZ.j.j.j.j.j.j..F•.P.h 0000E0
0074681E 5016FA46 8D006A00 6A006A05 6A016A07 6A0F5A68 1E000001 719A0068 k..q....hZ.j.j.j.j.j.j..F•.P.ht. 000100
AD9A007D 681E5016 FA468D00 6A006A00 6A056A01 6A086A0F 5A681E00 00018F9A ......hZ.j.j.j.j.j.j..F•.P.h)..Ù 000120
0001CB9A 0084681E 5016FA46 8D006A00 6A006A05 6A016A09 6A0F5A68 1E000001 ....hZ.j.j.j.j.j.j..F•.P.h...ù.. 000140
1E000001 E99A0088 681E5016 FA468D00 6A006A00 6A056A01 6A0A6A0F 5A681E00 ..hZ.j.j.j.j.j.j..F•.P.h...Ö.... 000160
5A681E00 0002079A 0090681E 5016FA46 8D006A00 6A006A05 6A016A08 6A0F5A68 hZ.j.j.j.j.j.j..F•.P.h.........hZ 000180
6A0F5A68 1E000002 259A0099 681E5016 FA468D00 6A006A00 6A056A01 6A0C6A0F .j.j.j.j.j.j..F•.P.h...%....hZ.j 0001A0
6A0F6A0F 5A681E00 0002439A 00A2681E 5016FA46 8D006A00 6A006A01 6A046A00 .j.j.j.j.j..F•.P.hÂ..C....hZ.j.j 0001C0
6A046A0E 6A0F5A68 1E000002 619A00A9 681E5016 FA468D00 6A006A00 6A016A04 .j.j.j.j..F•.P.h`..a....hZ.j.j.j 0001E0
```

```
Dump of file SATURN:[PCCOMMON.DUMP.DLL]PDMTAB.TMP;1 on 18-APR-1990 10:49:20.10
File ID (795,38,0)   End of file block 67 / Allocated 68

Virtual block number 6 (00000006), 512 (0200) bytes

 6A016A02 6A106A0F 5A681E00 00027F9A 00B0681E 5016FA46 8D006A00 6A006A01 .j.j.j..F•.P.h¯.......hZ.j.j.j.j 000000
 6A006A05 6A016A11 6A0F5A68 1E000002 9D9A00B7 681E5016 FA468D00 6A006A00 .j.j..F•.P.hñ.......hZ.j.j.j.j.j 000020
 6A006A00 6A056A01 6A126A0F 5A681E00 0002B89A 00BE681E 5016FA46 8D006A00 .j..F•.P.h/..£....hZ.j.j.j.j.j 000040
 8D006A00 6A006A05 6A016A13 6A0F5A68 1E000002 D99A00C3 681E5016 FA468D00 ..F•.P.hù..)....hZ.j.j.j.j.j.j.. 000060
 FA468D00 6A006A00 6A056A01 6A146A0F 5A681E00 0002F79A 00C9681E 5016FA46 F•.P.hè..%....hZ.j.j.j.j.j.j..F• 000080
 5016FA46 8D006A00 6A006A01 6A046A15 6A0F5A68 1E000003 159A00D0 681E5016 .P.hÅ.......hZ.j.j.j.j.j.`..F•.P 0000A0
 681E5016 FA468D00 6A006A00 6A056A01 6A166A0F 5A681E00 0003339A 00D4681E .hå..3....hZ.j.j.j.j.j.j.. •.P.h 0000C0
 00E5681E 5016FA46 8D006A00 6A006A01 6A046A17 6A0F5A68 1E000003 519A00DC É..Q....hZ.j.j.j.j.j.j..F•.r.hÍ. 0000E0
 8D9A00ED 681E5016 FA468D00 6A006A00 6A016A04 6A186A0F 5A681E00 00036F9A .o....hZ.j.j.j.j.j.j..F•.P.hÚ... 000100
 0003AB9A 00F5681E 5016FA46 8D006A00 6A006A01 6A046A19 6A0F5A68 1E000003 ....hZ.j.j.j.j.j.j..F•.P.h%..¨.. 000120
 1E000003 C99A00FD 681E5016 FA468D00 6A006A00 6A016A13 6A1A6A0F 5A681E00 ..hZ.j.j.j.j.j.j..F•.P.h»..è.... 000140
 5A681E00 0003E79A 0104681E 5016FA46 8D006A00 6A006A01 6A136A1B 6A0F5A68 hZ.j.j.j.j.j.j..F•.P.h...Ó....hZ 000160
 6A0F5A68 1E000004 059A0108 681E5016 FA468D00 6A006A00 6A016A13 6A1C6A0F .j.j.j.j.j.j..F•.P.h........hZ.j 000180
 6A1E6A0F 5A681E00 0004239A 0112681E 5016FA46 8D006A00 6A006A01 6A136A1D .j.j.j.j.j..F•.P.h...#....hZ.j.j 0001A0
 6A136A1F 6A0F5A68 1E0000FF FF9A011A 681E5016 FA468D00 6A006A00 6A016A13 .j.j.j.j..F•.P.h........hZ.j.j.j 0001C0
 6A056A01 6A206A0F 5A681E00 00045F9A 0122681E 5016FA46 8D006A00 6A006A01 .j.j.j..F•.P.h"..._....hZ.j j.j.j 0001E0

Dump of file SATURN:[PCCOMMON.DUMP.DLL]PDMTAB.TMP;1 on 18-APR-1990 10:49:20.10
File ID (795,38,0)   End of file block 67 / Allocated 68

Virtual block number 7 (00000007), 512 (0200) bytes

 6A006A05 6A016A21 6A0F5A68 1E000004 7D9A012A 681E5016 FA468D00 6A006A00 .j.j..F•.P.h*..}....hZ.j!j.j.j.j 000000
 6A006A00 6A056A01 6A226A0F 5A681E00 00049B9A 0135681E 5016FA46 8D006A00 .j..F•.P.h5.......hZ.j"j.j.j.j.j 000020
 8D006A00 6A006A05 6A016A23 6A0F5A68 1E000004 B99A013F 681E5016 FA468D00 ..F•.P.h?..¿....hZ.j#j.j.j.j.j.. 000040
 FA468D00 6A006A00 6A056A01 6A246A0F 5A681E00 0004D79A 0149681E 5016FA46 F•.P.hI..■....hZ.j$j.j.j.j.j..F• 000060
 5016FA46 8D006A00 6A006A01 6A026A25 6A0F5A68 1E000004 F59A0155 681E5016 .P.hU..%....hZ.j%j.j.j.j.j..F•.P 000080
 016EB80F D41E8C0F D2A301FE B80FAE1E 8C0FACA3 0206B800 0000BD9A 0161681E .ha..§...¡..È¯...Ù.¡±.È0...å.¡n. 0000A0
 6AA3017E B810461E 8C1044A3 0176B810 201E8C10 1EA3019E B80FFA1E 8C0FF8A3 È%...•.¡..È.... .¡v.ÈD...F.¡~.Èj 0000C0
 8C100CA3 0196B810 B81E8C10 B6A3018E B810921E 8C1090A3 0186B810 6C1E8C10 ...l.¡..È......¡..ÈÑ...¡.¡..ÈÉ.. 0000E0
 501E8C11 4EA30216 B8112A1E 8C1128A3 020EB811 041E8C11 02A301A6 B810DE1E .B.¡Ï.È......¡..È(...*.¡..ÈN...P 000100
 B811C21E 8C11C0A3 022EB811 9C1E8C11 9AA30226 B811761E 8C1174A3 021EB811 .¡..Èt...v.¡&.È......¡..Èã...ô.¡ 000120
 01C6B812 341E8C12 32A301BE B8120E1E 8C120CA3 01B6B811 E81E8C11 E6A301AE Û.Èl...Ò.¡Ñ.È......¡ƒ.È2...4.¡6. 000140
 CAA3023E B812A61E 8C12A4A3 01F6B812 801E8C12 7EA30236 B8125A1E 8C1258A3 ÈX...Z.¡6.È-.....¡~.ÈÈ...Î.¡>.Èò 000160
 8C133CA3 0256B813 181E8C13 16A3024E B812F21E 8C12F0A3 0246B812 CC1E8C12 ...ä.¡F.ÈÞ...·.¡N.È......¡V.È<.. 000180
 B01E8C13 AEA3026E B8138A1E 8C1388A3 0266B813 641E8C13 62A3025E B8133E1E .>.¡^.Èb...d.¡f.È......¡n.ÈÜ...¯ 0001A0
 B814221E 8C1420A3 01CEB813 FC1E8C13 FAA3027E B813D61E 8C13D4A3 0276B813 .¡v.Èå...ø.¡~.È•...•.¡ö.È ...".¡ 0001C0
 01EEB814 941E8C14 92A301E6 B8146E1E 8C146CA3 01DEB814 481E8C14 46A301D6 ø.ÈF...H.¡B.Èl...n.¡Ì.È......¡Ý. 0001E0

Dump of file SATURN:[PCCOMMON.DUMP.DLL]PDMTAB.TMP;1 on 18-APR-1990 10:49:20.10
File ID (795,38,0)   End of file block 67 / Allocated 68

Virtual block number 8 (00000008), 512 (0200) bytes

 9EA3028E B8117A1E 8C1178A3 0296B811 541E8C11 52A30286 B814BA1E 8C14B8A3 È¡...¤.¡..ÈR...T.¡..Èx...z.¡..È. 000000
 8C12F4A3 02AEB813 1C1E8C13 1AA302A6 B812D01E 8C12CEA3 029EB811 A01E8C11 .....¡..Èö...Ã.¡Î.È......¡Ú.È¶.. 000020
 8E1E8C13 8CA302C6 B813681E 8C1366A3 028EB813 421E8C13 40A30286 B812F61E .-.¡Ñ.Èa...B.¡/.Èf...h.¡6.È..... 000040
 C414001E 8C13FEA3 020EB813 DA1E8C13 D8A30206 B813B41E 8C13B2A3 02CEB813 .¡ö.Èý...Ç.¡ø.ÈÄ...Ö.¡B.È±.....á 000060
 0A478926 FA468B06 5EC40025 0847C726 065EC406 5F8C2604 4789260F 5AB8065E ^.¡Z.&.G.&._.á^.&úG.X.á^..F•&.G. 000080
 C4001402 47C72600 0007C726 125EC408 8E0080B8 1E565700 0000C8CB C95F5E1F .^ èùà...WV¯.¡...Äá^.&ú...&úG...á 0000A0
 02000710 CAC95F5E 1F000207 C726065E C4000007 C7260A5E C423F107 C7260E5E ^.Ìú.þ#á^.&ú...á^.&ú....^ èò.... 0000C0
 02007800 01003200 05007200 04003502 03006600 04044102 03000000 01002F00 ./.......A...f...5...r...Z...x.. 0000E0
 00000000 00000000 00000000 0A06FD00 02000000 09070000 02000000 08009E00 ................•............... 000100
 02000000 01000E00 020002CB 1F02C483 FFFF0000 9A57002E 3E89088E FFFFB81E .¡...Ä.>..W.....á..ù............ 000120
 FF0876FF D88EFFFF B81E5657 000008C8 00000000 00000000 00000000 09000200 ................à...WV.¡...Ã.v.. 000140
 0876FF00 5DE9F846 8B0006E9 03750000 3DF84689 0000FFFF 9A5016FA 468D0676 v..F•.P......F½=..u.Õ...F½Õ]..v. 000160
 0006E903 7500003D F8468900 00FFFF9A 5016FE46 8D256AFA 76FFFC76 FF0676FF .v..v=.v•jX.F±.P......F½=..u.Õ.. 000180
 FFFF0091 9A0676FF 0876FFFA 76FFFC76 FF0025E9 037400FE 7E830034 E9F84688 .F½Õ4..-±.t.ÕX..v=.v•.v..v...... 0001A0
 04CAC95F 5E1F0000 E90000B8 0006E9F8 46880006 E9037500 003DF846 8908C483 .á..F½=..u.Õ...F½Õ..¡..Õ...^ èò. 0001C0
 C64EC846 C64FC246 C600008A 46C70033 8846C7D8 8E0008B8 1E565700 0084C800 .à...WV.¡...ÄúF.3.úF...óFóóF̄àNó 0001E0
```

```
Dump of file SATURN:[PCCOMMON.DUMP.DLL]PDMTAB.TMP;1 on 18-APR-1990 10:49:20.10
File ID (795,38,0)   End of file block 67 / Allocated 68

Virtual block number 9 (00000009), 512 (0200) bytes

 90468992 46890000 B8598C46 C6598E46 C654FA46 C6430446 C6430246 C64ECA46 FòNóFøCóFåCóF*TóF.YóF.Y¡...F..F. 000000
 46C659F4 46C60000 FF7C86C7 00988046 C7967FFF 7E86C7CE 46890046 89000088 ¡...FÅ.Föú.-...úF...ú.|...óF¶YóF 000020
 F846C700 01F646C7 4EFE46C6 0098F046 C7967FEE 46C7499E 46C64E82 46C64DFC •MóF.NóF.lúFŸ..úFÞ..óF±NúF-..úF½ 000040
 46C659CC 46C65998 46C60000 9646C700 019446C7 00000846 C70001D6 46C70000 ..úF•..úFÄ..úF...úF...óF.YóFäYóF 000060
 46890000 FFFF9A50 16A0468D 0676FF08 76FF419A 46C659C6 46C64E84 46C620F2 · óF.NóFóYóF.A.v..v..F..P......F 000080
 894EF088 04C483FF FF00109A 5016A046 8D068FE9 9C468800 06E90375 00003D9C .=..u.Õ...F.Õ...F..P......á..ÞN. 0000A0
 016A0A76 FF0C76FF 0676FF08 76FF00A0 42C6C476 880007E9 03740AA0 7A80C476 vá.z..t.Õ...váóB...v..v..v..v.j. 0000C0
 76FF0876 FF0643E9 9C468800 06E90375 00003D9C 46890000 01BF9A50 16A0468D .F..P.¢....F.=..u.Õ...F.ÕC..v..v 0000E0
 46880006 E9037500 003D9C46 89000001 E89A5016 88468D02 6A0A76FF 0C76FF06 ..v..v.j..F..P.Ò....F.=..u.Õ...F 000100
 3D9C4689 00000211 9A50168A 468D036A 0A76FF0C 76FF0676 FF0876FF 061AE99C .Õ...v..v..v..v.j..F..P......F.= 000120
 5016C246 8D046A0A 76FF0C76 FF0676FF 0876FF05 F1E99C46 880006E9 03750000 ..u.Õ...F.Õþ..v..v..v..v.j..Fö.P 000140
 FF0C76FF 0676FF08 76FF05C8 E99C4688 0006E903 7500003D 9C468900 00FFFF9A ......F.=..u.Õ...F.Õà..v..v..v.. 000160
 FF059FE9 9C468800 06E90375 00003D9C 46890000 02639A50 168E468D 056A0A76 v.j..F..P.c....F.=..u.Õ...F.Õ... 000180
 E9037500 003D9C46 89000002 8C9A5016 C8468006 6A0A76FF 0C76FF06 76FF0876 v..v..v..v.j..Fà.P......F.=..u.Õ 0001A0
 000002B5 9A5016CA 468D076A 0A76FF0C 76FF0676 FF0876FF 0576E99C 46880006 ...F.Õv..v..v..v..v.j..Fò.P.ç... 0001C0
 8D086A0A 76FF0C76 FF0676FF 0876FF05 40E99C46 880006E9 03750000 3D9C4689 .F.=..u.Õ...F.ÕM..v..v..v..v.j.. 0001E0
```

```
Dump of file SATURN:[PCCOMMON.DUMP.DLL]PDMTAB.TMP;1 on 18-APR-1990 10:49:20.10
File ID (795,38,0)   End of file block 67 / Allocated 68

Virtual block number 10 (0000000A), 512 (0200) bytes

 0676FF08 76FF0524 E99C4688 0006E903 7500003D 9C468900 0002DE9A 5016D246 Fø.P.ß....F.=..u.Õ...F.Õ$..v..v. 000000
 9C468800 06E90375 00003D9C 46890000 03079A50 16D4468D 096A0A76 FF0C76FF .v..v.j..Få.P......F.=..u.Õ...F. 000020
 003D9C46 89000003 309A5016 FA468D0A 6A0A76FF 0C76FF06 76FF0876 FF04FBE9 Õ«..v..v..v..v.j..F*.P.0....F.=. 000040
 9A50168C 468D0B6A 0A76FF0C 76FF0676 FF0876FF 04D2E99C 46880006 E9037500 .u.Õ...F.Õø..v..v..v..v.j..F..P. 000060
 76FF0C76 FF0676FF 0876FF04 A9E99C46 880006E9 03750000 3D9C4689 00000359 Y....F.=..u.Õ...F.Õ`..v..v..v..v 000080
 76FF0480 E99C4688 0006E903 7500003D 9C468900 0003829A 50169A46 8D0C6A0A .j..F..P......F.=..u.Õ...F.Õ...v 0000A0
 06E90375 00003D9C 46890000 03AB9A50 1690468D 006A0A76 FF0C76FF 0676FF08 ..v..v..v.j..F..P.¨....F.=..u.Õ. 0000C0
 89000003 D59A5016 CE468D0F 6A0A76FF 0C76FF06 76FF0876 FF0457E9 9C468800 ..F.ÕW..v..v..v..v.j..Fö.P.Í.... 0000E0
 86800E6A 0A76FF0C 76FF0676 FF0876FF 042EE99C 46880006 E9037500 003D9C46 F.=..u.Õ...F.Õ...v..v..v..v.j... 000100
 0676FF08 76FF0404 E99C4688 0006E903 7500003D 9C468900 0003FF9A 5016FF7E -..P......F.=..u.Õ...F.Õ...v..v. 000120
 46880006 E9037500 003D9C46 89000004 289A5016 FF7C868D 106A0A76 FF0C76FF .v..v.j...|..P.(....F.=..u.Õ...F 000140
 3D9C4689 00000451 9A5016F4 468D116A 0A76FF0C 76FF0676 FF0876FF 03DAE99C .ÕÕ..v..v..v..v.j..F¶.P.Q....F.= 000160
 50169846 8D206A0A 76FF0C76 FF0676FF 0876FF03 B1E99C46 880006E9 03750000 ..u.Õ...F.ÕŸ..v..v..v..v.j .F..P 000180
 FF0C76FF 0676FF08 76FF0388 E99C4688 0006E903 7500003D 9C468900 00047A9A .z....F.=..u.Õ...F.Õ...v..v..v.. 0001A0
 FF035FE9 9C468800 06E90375 00003D9C 46890000 04A39A50 16CC468D 216A0A76 v.jl.Fä.P.È....F.=..u.Õ...F.Õ_.. 0001C0
 E9037500 003D9C46 89000004 CC9A5016 F246B022 6A0A76FF 0C76FF06 76FF0876 v..v..v..v.j".F·.P.ä....F.=..u.Õ 0001E0
```

```
Dump of file SATURN:[PCCOMMON.DUMP.DLL]PDMTAB.TMP;1 on 18-APR-1990 10:49:20.10
File ID (795,38,0)   End of file block 67 / Allocated 68

Virtual block number 11 (0000000B), 512 (0200) bytes

 000004F5 9A501684 4680236A 0A76FF0C 76FF0676 FF0876FF 0336E99C 46880006 ...F.Õ6..v..v..v..v.j#.F..P.X... 000000
 80246A0A 76FF0C76 FF0676FF 0876FF03 0DE99C46 880006E9 03750000 3D9C4689 .F.=..u.Õ...F.Õ...v..v..v..v.j$. 000020
 0676FF08 76FF02E4 E99C4688 0006E903 7500003D 9C468900 00051E9A 5016C646 Fó.P......F.=..u.Õ...F.Õõ..v..v. 000040
 9C468800 06E90375 00003D9C 46890000 05479A50 1682468D 126A0A76 FF0C76FF .v..v.j..F..P.G....F.=..u.Õ...F. 000060
 003D9C46 89000005 709A5016 FC468D13 6A0A76FF 0C76FF06 76FF0876 FF02BBE9 ÕE..v..v..v..v.j..F•.P.p....F.=. 000080
 9A50169E 468D146A 0A76FF0C 76FF0676 FF0876FF 0292E99C 46880006 E9037500 .u.Õ...F.Õ...v..v..v..v.j..F..P. 0000A0
 76FF0C76 FF0676FF 0876FF02 69E99C46 880006E9 03750000 3D9C4689 00000599 .....F.=..u.Õ...F.Õi..v..v..v..v 0000C0
 76FF0240 E99C4688 0006E903 7500003D 9C468900 0005C29A 5016EE46 8D156A0A .j..FŸ.P.ó....F.=..u.Õ...F.Õa..v 0000E0
 06E90375 00003D9C 46890000 01969A50 16FE468D 166A0A76 FF0C76FF 0676FF08 ..v..v..v.j..F±.P......F.=..u.Õ. 000100
 89000006 149A5016 F6468D17 6A0A76FF 0C76FF06 76FF0876 FF0217E9 9C468800 ..F.Õ...v..v..v..v.j..F-.P...... 000120
 468D196A 0A76FF0C 76FF0676 FF0876FF 01EEE99C 46880006 E9037500 003D9C46 F.=..u.Õ...F.ÕY..v..v..v..v.j..F 000140
 FF0676FF 0876FF01 C5E99C46 880006E9 03750000 3D9C4689 0000063D 9A501694 ..P.=....F.=..u.Õ...F.Õé..v..v.. 000160
 E99C4688 0006E903 7500003D 9C468900 00023A9A 5016D646 8D186A0A 76FF0C76 v..v.j..F•.P.:....F.=..u.Õ...F.Õ 000180
 76FF0C76 FF0676FF 0876FF0A C483069C 00009A50 16DA468D 02E6681E 136A019C ..j..hl..FÖ.P......é..v..v..v..v 0001A0
 136A0160 E99C4688 0006E903 7500003D 9C468900 0006859A 5016DA46 8D1A6A0A .j..FÖ.P.ç....F.=..u.Õ...F.Õ'.j. 0001C0
 8D186A0A 76FF0C76 FF0676FF 0876FF0A C48306D8 00009A50 16DA468D 02E8681E .hÒ..FÖ.P...Ä..á..v..v..v..v.j.. 0001E0
```

Dump of file SATURN:[PCCOMMON.DUMP.DLL]PDMTAB.TMP;1 on 18-APR-1990 10:49:20.10
File ID (795,38,0)   End of file block 67 / Allocated 68

Virtual block number 12 (0000000C), 512 (0200) bytes

```
 02EA681E 136A0124 E99C4688 0006E903 75000030 9C468900 0006F19A 50160A46 FÖ.P.þ....F.=..u.Õ...F.Õ$.j..hõ. 000000
 50160A46 8D1C6A0A 76FF0C76 FF0676FF 0876FF0A C4830714 00009A50 160A468D .FÖ.P......á..v..v..v..v.j..FÖ.P 000020
 160A468D 02EC681E 136A00E8 E99C4688 0006E903 7500003D 9C468900 0007209A .-....F.=..u.Õ...F.ÕÒ.j..hš..FÖ. 000040
 0007699A 50160A46 8D1D6A0A 76FF0C76 FF0676FF 0876FF0A C4830750 00009A50 P...P..á..v..v..v..v.j..FÖ.P.i.. 000060
 00009A50 160A468D 02F0681E 136A00AC E99C4688 0006E903 7500003D 9C468900 ..F.=..u.Õ...F.Õ¯.j..hÞ..FÖ.P... 000080
 9C468900 0007A59A 50160A46 8D1E6A0A 76FF0C76 FF0676FF 0876FF0A C483078C ...á..v..v..v..v.j..FÖ.P.E....F. 0000A0
 C483FFFF 00009A50 160A468D 02F4681E 136A0070 E99C4688 0006E903 7500003D =..u.Õ...F.Õp.j..h¶..FÖ.P......á 0000C0
 7500003D 9C468900 0007D39A 50160A46 8D1F6A0A 76FF0C76 FF0676FF 0876FF0A ..v..v..v..v.j..FÖ.P.Æ....F.=..u 0000E0
 86468D25 6A0A76FF 0C76FF06 76FF0876 FF000186 46C70034 E99C4688 0006E903 .Õ...F.Õ4.úF....v..v..v..v.j%.F. 000100
 5E1F0000 E99C4688 0006E99C 46880006 E9037500 003D9C46 89000005 EB9A5016 .P.Š....F.=..u.Õ...F.Õ...F.Õ...^ 000120
 00020000 00080167 00020000 00060660 00020000 0003006E 00020008 90CBC95F _èù.....n.......'.......g....... 000140
 0203004B 00040041 02030038 0004014A 02030018 00040018 02030000 000A0099 ¯...............J...8...A...K... 000160
 830000BE D88EFFFF B81E5657 000004C8 00000000 00000000 00000059 00040679 y...Y...........à...WV.j...Ä/... 000180
 7C13FE83 46470002 E90000BF 2D07C626 D8030E5E C446C688 000CE903 7500087E ~..u.Õ...óFá^..Ä&ó.-¢..Õ..GF.±.| 0001A0
 D8030E5E C446C688 000CE903 74067E39 0023E903 75003980 260A5EC4 002FE903 .Õ/.á^.&.9.u.Õ#.9-.t.Õ...óFá^..Ä 0001C0
 C6260E5E C4000AE9 037C13FE 83FFC7E9 0088260E 5EC4018A 260A5EC4 2E07C626 &ó..á^.&..á^.&..Õú..±.|.Õ..á^.&ó 0001E0
```

Dump of file SATURN:[PCCOMMON.DUMP.DLL]PDMTAB.TMP;1 on 18-APR-1990 10:49:20.10
File ID (795,38,0)   End of file block 67 / Allocated 68

Virtual block number 13 (0000000D), 512 (0200) bytes

```
 8E0008B8 1E565700 0004C8CB C95F5E1F 0000E900 1247C626 0E5EC400 08E90000 ..Õ..á^.&óG..Õ...^_èùà...WV.j... 000000
 E9037430 38802606 5EC44E00 01E94EF0 8804C483 FFFF0010 9A0676FF 0876FFD8 Ä.v..v.......á..ÞNÕ..Ná^.&.80t.Õ 000020
 E90003E9 03752E38 8026065E C4460001 E90000BE FFE9E900 00C62606 5EC4000A ..á^.&ó..ÕÕ./..Õ..Fá^.&.8.u.Õ..Õ 000040
 8A26065E C40016E9 03750038 8026065E C4460001 E90029E9 0374000A 7E83FFF0 Þ..-..t.Õ).Õ..Fá^.&.8.u.Õ..á^.&. 000060
 065EC446 3000C626 065EC446 0010E9FF DDE90088 26FC468A 065EC4FC 46880140 ə..F•á^..F•&..Õï.Õ..Fá^.&ó.0Fá^. 000080
 065EC400 00FC46C7 D88E008D B81E5657 000006C8 CBC95F5E 1F0000E9 0000C626 &ó..Õ...^_èùà...WV.j...ÄúF•..á^. 0000A0
 0676FF08 76FFFE46 FF0003E9 0000FE46 C70092E9 00008800 06E90374 003F8026 &.?.t.Õ..¯j..Õ..úF±..Õ...F±.v..v. 0000C0
 98FA468A FA468800 8A260676 C4FE5E88 004EE903 77FE463B 04C48301 B700109A ...ñ..á.;F±w.ÕN..^±áv.&...F•.F•. 0000E0
 7E830017 E9037500 0E7E8300 20E90374 2EFA7E80 002FE903 74040385 87F6D888 .Ä~....t.Õ/..-•.t.Õ ..~..u.Õ...~ 000100
 76FFFF99 E90026E9 00008800 06E90001 FC46C700 34E90000 B80006E9 037500FC •.u.Õ..j..Õ4.úF•..Õ..j..Õ&.Õ...v 000120
 00E90001 B81FA5A5 A5A5DA8E 1EF08BFB 880A5EC4 04C48300 9A00289A 0676FF08 ..v..(....á.á^..«.Þ..ÕEEEE.j..Õ. 000140
 E998FE46 8AFE4688 078A2606 5EC4D88E 0124B81E 56570000 02C8CBC9 5F5E1F00 ..^_èùà...WV.j$..Äá^.&...F±.F±.Õ 000160
 4F3DFFE4 E9037500 493DFFEC E9037500 4130001B E90024E9 97518800 24E9000C ..Õ$.jQ.Õ$.Õ..=A.u.Õš.=I.u.ÕÕ.=O 000180
 01DEB81E 56570000 02C8000E CAC95F5E 1F0000E9 0000B8FF DCE9FFDC E9037500 .u.ÕÉ.ÕÉ.j..Õ...^_èò..à...WV.jB. 0001A0
 4E30001B E90024E9 97528800 24E9000C E998FE46 8AFE4688 078A2606 5EC4D88E .Äá^.&...F±.F±.Õ.¯Õ$.jR.Õ$.Õ..=N 0001C0
 1F0000E9 0000B8FF DCE9FFDC E9037F00 543DFFE7 E9037D00 533DFFEC E9037500 .u.Õš.=S.).ÕÕ.=T...ÕÉ.ÕÉ.j..Õ... 0001E0
```

Dump of file SATURN:[PCCOMMON.DUMP.DLL]PDMTAB.TMP;1 on 18-APR-1990 10:49:20.10
File ID (795,38,0)   End of file block 67 / Allocated 68

Virtual block number 14 (0000000E), 512 (0200) bytes

```
 E998FE46 8AFE4688 078A2606 5EC4D88E 022EB81E 56570000 02C8000E CAC95F5E ^_èò..à...WV.j...Äá^.&...F±.F±.Õ 000000
 543DFFE7 E9037D00 533DFFEC E9037500 4E30001B E90024E9 97538800 24E9000C .¯Õ$.jS.Õ$.Õ..=N.u.Õš.=S.).ÕÕ.=T 000020
 027EB81E 56570000 02C8000E CAC95F5E 1F0000E9 0000B8FF DCE9FFDC E9037F00 ...ÕÉ.ÕÉ.j..Õ...^_èò..à...WV.j-. 000040
 433D0023 E9002CE9 97548800 2CE9000C E998FE46 8AFE4688 078A2606 5EC4D88E .Äá^.&...F±.F±.Õ.¯Õ,.jT.Õ,.Õ#.=C 000060
 D4E9FFD4 E9037F00 543DFFDF E9037D00 533DFFE4 E9037500 4B3DFFEC E9037500 .u.Õš.=K.u.ÕÕ.=S.).ÕÕ.=T...Õå.Õå 000080
 078A2606 5EC4D88E 02CEB81E 56570000 02C8000E CAC95F5E 1F0000E9 0000B8FF .j..Õ...^_èò..à...WV.jö..Äá^.&.. 0000A0
 4B3DFFEC E9037500 433D0023 E9002CE9 97558800 2CE9000C E998FE46 8AFE4688 .F±.F±.Õ.¯Õ,.jU.Õ,.Õ#.=C.u.Õš.=K 0000C0
 1F0000E9 0000B8FF D4E9FFD4 E9037F00 543DFFDF E9037D00 533DFFE4 E9037500 .u.ÕÕ.=S.).ÕÕ.=T...Õå.Õå.j..Õ... 0000E0
 E998FE46 8AFE4688 078A2606 5EC4D88E 0326B81E 56570000 02C8000E CAC95F5E ^_èò..à...WV.j&..Äá^.&...F±.F±.Õ 000100
 E4E9FFE4 E9037F00 543DFFEF E9037D00 53300013 E9001CE9 97568800 1CE9000C ..¯Õ..jV.Õ..Õ..=S.).Õÿ.=T...ÕÕ.ÕÕ 000120
 078A2606 5EC4D88E 037EB81E 56570000 02C8000E CAC95F5E 1F0000E9 0000B8FF .j..Õ...^_èò..à...WV.j-..Äá^.&.. 000140
 593DFFEC E9037500 4E300013 E9001CE9 97578800 1CE9000C E998FE46 8AFE4688 .F±.F±.Õ.¯Õ..jW.Õ..Õ..=N.u.Õš.=Y 000160
 03C6B81E 56570000 02C8000E CAC95F5E 1F0000E9 0000B8FF E4E9FFE4 E9037500 .u.ÕÕ.ÕÕ.j..Õ...^_èò..à...WV.jó. 000180
 4E300013 E9001CE9 97588800 1CE9000C E998FE46 8AFE4688 078A2606 5EC4D88E .Äá^.&...F±.F±.Õ.¯Õ..jX.Õ..Õ..=N 0001A0
 02C8000E CAC95F5E 1F0000E9 0000B8FF E4E9FFE4 E9037500 593DFFEC E9037500 .u.Õš.=Y.u.ÕÕ.ÕÕ.j..Õ...^_èò..à. 0001C0
 97598800 24E9000C E998FE46 8AFE4688 078A2606 5EC4D88E 040EB81E 56570000 ..WV.j...Äá^.&...F±.F±.Õ.¯Õ$.jY. 0001E0
```

Dump of file SATURN:[PCCOMMON.DUMP.DLL]PDMTAB.TMP;1 on 18-APR-1990 10:49:20.10
File ID (795,38,0)   End of file block 67 / Allocated 68

Virtual block number 15 (0000000F), 512 (0200) bytes

```
DCE9FFDC E9037500 593DFFE4 E9037500 4D3DFFEC E9037500 443D001B E90024E9 Õ$.Õ..=D.u.Õš.=M.u.Õõ.=Y.u.ÕÉ.ÕÉ 000000
078A2606 5EC4D88E 0456B81E 56570000 02C8000E CAC95F5E 1F0000E9 000088FF .¡..Õ..._èò..à...WV.¡V..Äá^.&.. 000020
593DFFEC E9037500 4E300013 E9001CE9 975A8800 1CE9000C E998FE46 8AFE4688 .F±.F±.Õ.¯Õ..¡Z.Õ..Õ..=N.u.Õš.=Y 000040
04A6B81E 56570000 02C8000E CAC95F5E 1F0000E9 000088FF E4E9FFE4 E9037500 .u.Õõ.Õõ.¡..Õ..._èò..à...WV.¡Ï. 000060
443D001B E90024E9 97588800 24E9000C E998FE46 8AFE4688 078A2606 5EC4D88E .Äá^.&...F±.F±.Õ.¯Õ$.¡[.Õ$.Õ..=D 000080
1F0000E9 000088FF DCE9FFDC E9037500 533DFFE4 E9037500 4D3DFFEC E9037500 .u.Õš.=M.u.Õõ.=S.u.ÕÉ.ÕÉ.¡..Õ... 0000A0
E998FE46 8AFE4688 078A2606 5EC4D88E 04EEB81E 56570000 02C8000E CAC95F5E ^_èò..à...WV.¡Ÿ..Äá^.&...F±.F±.Õ 0000C0
583DFFE4 E9037500 493DFFEC E9037500 4130001B E90024E9 975C8800 24E9000C .¯Õ$.¡\.Õ$.Õ..=A.u.Õš.=I.u.Õõ.=X 0000E0
053EB81E 56570000 02C8000E CAC95F5E 1F0000E9 000088FF DCE9FFDC E9037500 .u.ÕÉ.ÕÉ.¡..Õ..._èò..à...WV.¡>. 000100
4E300013 E9001CE9 975D8800 1CE9000C E998FE46 8AFE4688 078A2606 5EC4D88E .Äá^.&...F±.F±.Õ.¯Õ..¡].Õ..Õ..=N 000120
02C8000E CAC95F5E 1F0000E9 000088FF E4E9FFE4 E9037500 593DFFEC E9037500 .u.Õš.=Y.u.Õõ.Õõ.¡..Õ..._èò..à. 000140
975E8800 1CE9000C E998FE46 8AFE4688 078A2606 5EC4D88E 058EB81E 56570000 ..WV.¡...Äá^.&...F±.F±.Õ.¯Õ..¡^. 000160
1F0000E9 000088FF E4E9FFE4 E9037500 593DFFEC E9037500 4E300013 E9001CE9 Õ..Õ..=N.u.Õš.=Y.u.Õõ.Õõ.¡..Õ... 000180
E998FE46 8AFE4688 078A2606 5EC4D88E 0506B81E 56570000 02C8000E CAC95F5E ^_èò..à...WV.¡ø..Äá^.&...F±.F±.Õ 0001A0
433DFFE4 E9037500 203DFFEC E9037500 20300023 E9002CE9 975F8800 2CE9000C .¯Õ,.¡_.Õ,.Õ#.= .u.Õš.=-.u.Õõ.=C 0001C0
02C8000E CAC95F5E 1F0000E9 000088FF D4E9FFD4 E9037500 5F3DFFDC E9037500 .u.ÕÉ.=_.u.Õå.Õå.¡..Õ..._èò..à. 0001E0
```

Dump of file SATURN:[PCCOMMON.DUMP.DLL]PDMTAB.TMP;1 on 18-APR-1990 10:49:20.10
File ID (795,38,0)   End of file block 67 / Allocated 68

Virtual block number 16 (00000010), 512 (0200) bytes

```
97608800 1CE9000C E998FE46 8AFE4688 078A2606 5EC4D88E 061EB81E 56570000 ..WV.¡...Äá^.&...F±.F±.Õ..Õ..¡'. 000000
1F0000E9 000088FF E4E9FFE4 E9037500 593DFFEC E9037500 4E300013 E9001CE9 Õ..Õ..=N.u.Õš.=Y.u.Õõ.Õõ.¡..Õ... 000020
E998FE46 8AFE4688 078A2606 5EC4D88E 0676B81E 56570000 02C8000E CAC95F5E ^_èò..à...WV.¡v..Äá^.&...F±.F±.Õ 000040
E4E9FFE4 E9037500 593DFFEC E9037500 4E300013 E9001CE9 9761B800 1CE9000C ..¯Õ..¡a.Õ..Õ..=N.u.Õš.=Y.u.Õõ.Õõ 000060
078A2606 5EC4D88E 068EB81E 56570000 02C8000E CAC95F5E 1F0000E9 000088FF .¡..Õ..._èò..à...WV.¡f..Äá^.&.. 000080
543DFFEC E9037500 4E300013 E9001CE9 97628800 1CE9000C E998FE46 8AFE4688 .F±.F±.Õ.¯Õ..¡b.Õ..Õ..=N.u.Õš.=T 0000A0
0706B81E 56570000 02C8000E CAC95F5E 1F0000E9 000088FF E4E9FFE4 E9037500 .u.Õõ.Õõ.¡..Õ..._èò..à...WV.¡.. 0000C0
97638800 06E9037F 63FE7E83 0009E903 7D90FE7E 83FE4689 07882606 5EC4D88E .Äá^.&...F±.-±.).Õ...-±c..Õ..¡c. 0000E0
26065EC4 D88E074E 881E5657 000002C8 000ECAC9 5F5E1F00 00E90000 880006E9 Õ..¡..Õ..._èò..à...WV.¡N..Äá^.& 000100
0000B800 06E99764 880006E9 037F64FE 7E830009 E9037D00 FE7E83FE 46890788 ...F±.-±.).Õ...-±d..Õ..¡d.Õ..¡.. 000120
8AFE4688 078A2606 5EC4D88E 0788B81E 56570000 02C8000E CAC95F5E 1F0000E9 Õ..._èò..à...WV.¡...Äá^.&...F±. 000140
E9037500 4D3DFFEC E9037500 41300013 E9001CE9 97658800 1CE9000C E998FE46 F±.Õ.¯Õ..¡e.Õ..Õ..=A.u.Õš.=M.u.Õ 000160
5EC4D88E 07C2B81E 56570000 04C8000E CAC95F5E 1F0000E9 000088FF E4E9FFE4 õ.Õõ.¡..Õ..._èò..à...WV.¡ó..Äá^ 000180
15E9037D 389AFE7E 810019E9 037D00FE 7E83FE56 89FC4689 02578826 07882606 .&..&.W..F•.V±.-±.).Õ...-..;).Õ. 0001A0
C95F5E1F 0000E900 00880006 E99766B8 0006E903 77C9FFFC 7E81000A E9037E00 .-.Õ...-•.èw.Õ..¡f.Õ..¡..Õ ..^_è 0001C0
83FE5689 FC468902 57882607 8826065E C4D88E08 0A881E56 57000004 C8000ECA ò..à...WV.¡...Äá^.&..&.W..F•.V±. 0001E0
```

Dump of file SATURN:[PCCOMMON.DUMP.DLL]PDMTAB.TMP;1 on 18-APR-1990 10:49:20.10
File ID (795,38,0)   End of file block 67 / Allocated 68

Virtual block number 17 (00000011), 512 (0200) bytes

```
0015E903 7D3B9AFE 7E810019 E9037301 FC7E8300 09E9037E 0027E903 7D00FE7E -±.).Õ'.-.Õ...-•.s.Õ...-±.;).Õ.. 000000
CAC95F5E 1F0000E9 00008800 06E99767 880006E9 0377C9FF FC7E8100 0AE9037E -.Õ...-•.èw.Õ..¡g.Õ..¡..Õ..._èò 000020
7E83FE56 89FC4689 02578826 07882606 5EC4D88E 0858B81E 56570000 04C8000E ..à...WV.¡[..Äá^.&..&.W..F•.V±.- 000040
0006E903 77C9FFFC 7E81000A E9037E00 15E9037D 3B9AFE7E 810019E9 037D00FE ±.).Õ...-±.;).Õ..-.Õ...-•.èw.Õ.. 000060
C4D88E08 BAB81E56 57000002 C8000ECA C95F5E1F 0000E900 00880006 E99768B8 ¡h.Õ..¡..Õ..._èò..à...WV.¡¤..Äá 000080
E99769B8 0006E903 7F2710FE 7E81000A E9037D08 F1FE7E81 FE468907 8826065E ^.&...F±.-±þÄ).Õ...-±.'..Õ..¡i.Õ 0000A0
8826065E C4D88E09 08B81E56 57000004 C8000ECA C95F5E1F 0000E900 00880006 ..¡..Õ..._èò..à...WV.¡...Äá^.&. 0000C0
037E0015 E9037D05 F5FE7E81 0019E903 7D00FE7E 83FE5689 FC468902 57882607 .&.W..F•.V±.-±.).Õ...-±%.).Õ..-. 0000E0
000ECAC9 5F5E1F00 00E90000 880006E9 976A8800 06E90377 E0FFFC7E 81000AE9 Õ...-•.Åw.Õ..¡j.Õ..¡..Õ..._èò.. 000100
037D00FE 7E83FE56 89FC4689 9998078A 26065EC4 D88E0947 881E5657 000004C8 à...WV.¡G..Äá^.&.....F•.V±.-±.). 000120
000AE903 7E0015E9 037D3B9A FE7E8100 19E90373 01FC7E83 0009E903 7E0027E9 Õ'.-.Õ...-•.s.Õ...-±.;).Õ..-.Õ.. 000140
0004C800 0ECAC95F 5E1F0000 E90000B8 0006E997 6B880006 E90377C9 FFFC7E81 .-•.èw.Õ..¡k.Õ..¡..Õ..._èò..à.. 000160
E9037D00 FE7E83FE 5689FC46 89025788 26078826 065EC4D8 8E0998B8 1E565700 .WV.¡...Äá^.&..&.W..F•.V±.-±.).Õ 000180
81000AE9 037E0015 E9037D3B 9AFE7E81 0019E903 7301FC7E 830009E9 037E0027 '.-.Õ...-•.s.Õ...-±.;).Õ..-.Õ... 0001A0
000004C8 000ECAC9 5F5E1F00 00E90000 880006E9 976C8800 06E90377 C9FFFC7E -•.èw.Õ..¡l.Õ..¡..Õ..._èò..à... 0001C0
27E9037D 00FE7E83 FE5689FC 46890257 88260788 26065EC4 D88E09F5 881E5657 WV.¡%..Äá^.&..&.W..F•.V±.-±.).Õ' 0001E0
```

Dump of file SATURN:[PCCOMMON.DUMP.DLL]PDMTAB.TMP;1 on 18-APR-1990 10:49:20.10
File ID (795,38,0)   End of file block 67 / Allocated 68

Virtual block number 18 (00000012), 512 (0200) bytes

```
7E81000A E9037E00 15E9037D 3B9AFE7E 810019E9 037301FC 7E830009 E9037E00 .~.Õ...~•.s.Õ...~±.;).Õ..~.Õ...~ 000000
57000008 C8000ECA C95F5E1F 0000E900 00B80006 E99760B8 0006E903 77C9FFFC •.èw.Õ..¡m.Õ..¡..Õ...^_èò..à...W 000020
7400003D 0AC483FF FF011C9A 0676FF08 76FF5016 F8468000 6AD88E0A 54B81E56 V.¡T..Äj..F½.P.v..v.......á.=..t 000040
B3B81E56 57000008 C8000ECA C95F5E1F 0000E900 00B80006 E9976EB8 0006E903 .Õ..¡n.Õ..¡..Õ...^_èò..à...WV.¡° 000060
0006E903 7400003D 0AC4830A C7011C9A 0676FF08 76FF5016 F8468000 6AD88E0A ..Äj..F½.P.v..v....ú..á.=..t.Õ.. 000080
6AD88E0A EFB81E56 57000008 C8000ECA C95F5E1F 0000E900 00B80006 E9976FB8 ¡o.Õ..¡..Õ...^_èò..à...WV.¡ÿ..Äj 0000A0
E99770B8 0006E903 7400003D 0AC4830B 03011C9A 0676FF08 76FF5016 F8468000 ..F½.P.v..v.......á.=..t.Õ..¡p.Õ 0000C0
F8468D01 6AD88E0B 2BB81E56 57000008 C8000ECA C95F5E1F 0000E900 00B80006 ..¡..Õ...^_èò..à...WV.¡+..Äj..F½ 0000E0
00B80006 E99771B8 0006E903 7400003D 0AC4830B 3F011C9A 0676FF08 76FF5016 .P.v..v....?..á.=..t.Õ..¡q.Õ..¡. 000100
76FF5016 F8468D01 6AD88E0B 67B81E56 57000008 C8000ECA C95F5E1F 0000E900 .Õ...^_èò..à...WV.¡g..Äj..F½.P.v 000120
0000E900 00B80006 E99772B8 0006E903 7400003D 0AC4830B 7B011C9A 0676FF08 ..v....(..á.=..t.Õ..¡r.Õ..¡..Õ.. 000140
0676FF08 76FF5016 F8468D01 6AD88E0B A3B81E56 57000008 C8000ECA C95F5E1F .^_èò..à...WV.¡È..Äj..F½.P.v..v. 000160
C95F5E1F 0000E900 00B80006 E99773B8 0006E903 7400003D 0AC4830B B7011C9A ...ñ..á.=..t.Õ..¡s.Õ..¡..Õ...^_è 000180
FFFE5689 FC468902 57882607 8B260A5E C4D88E0B DFB81E56 5700000E C8000ECA ò..à...WV.¡Õ..Äá^.&..&.W..F=.V±. 0001A0
E9037500 0030F246 8900000C 6C9A5016 F4468D0F 6A1076FF 1276FF14 76FF1676 v..v..v..v.j..F¶.P.l....F·=..u.Õ 0001C0
0000FFFF 9A5016F8 468D0E6A 1076FF12 76FF1476 FF1676FF 00B7E9F2 46880006 ...F·Õñ..v..v..v..v.j..F½.P..... 0001E0
```

Dump of file SATURN:[PCCOMMON.DUMP.DLL]PDMTAB.TMP;1 on 18-APR-1990 10:49:20.10
File ID (795,38,0)   End of file block 67 / Allocated 68

Virtual block number 19 (00000013), 512 (0200) bytes

```
7E0036E9 037DFE56 39F6568B F4468B00 8EE9F246 880006E9 03750000 3DF24689 .F·=..u.Õ...F·Õ...F¶.V-9 ±).Õ6.- 000000
9A5016FC 468D0F6A 1076FF12 76FF1476 FF1676FF 0029E903 77FC4639 0008E903 .Õ..9F•w.Õ)..v..v..v..v.j  F=.P. 000020
037DFE56 39FA568B F8468B00 4AE9F246 880006E9 03750000 3DF24689 00000CF4 ¶....F·=..u.Õ...F·ÕJ..F½.V•yV±). 000040
468D0E6A 1076FF12 76FF1476 FF1676FF 0029E903 77FC4639 0008E903 7E0036E9 Õ6.-.Õ..9F•w.Õ)..v..v..v..v.j..F 000060
1F0000E9 0000B800 06E9F246 880006E9 03750000 3DF24689 0000FFFF 9A5016FC •.P......F·=..u.Õ...F·Õ..¡..Õ... 000080
89F44689 02578B26 078B260A 5EC4D88E 0C1B881E 56570000 0EC80012 CAC95F5E ^_èò..à...WV.¡...Äá^.&..&.W..F¶. 0000A0
00003DF2 46890000 006F9A50 16FC468D 006A1076 FF1276FF 1476FF16 76FFF656 V‾.v..v..v..v.j..F•.P.o....F·=.. 0000C0
439A5016 F8468D0E 6A1076FF 1276FF14 76FF1676 FF00B7E9 F2468800 06E90375 u.Õ...F·Õñ..v..v..v..v.j..F½.P.C 0000E0
E9037EF6 5639FE56 8BFC468B 008EE9F2 46880006 E9037500 003DF246 8900000C ....F·=..u.Õ...F·Õ...F•.V±9V--.Õ 000100
F4468D00 6A1076FF 1276FF14 76FF1676 FF0029E9 0372F446 390008E9 037D0036 6.).Õ..9F¶r.Õ)..v..v..v..v.j..F¶ 000120
5639FA56 8BF8468B 004AE9F2 46880006 E9037500 003DF246 89000000 F79A5016 .P.¥....F·=..u.Õ...F·ÕJ..F½.V•9V 000140
6A1076FF 1276FF14 76FF1676 FF0029E9 0377F446 390008E9 037E0036 E9037DF6 -).Õ6.-.Õ..9F¶w.Õ)..v..v..v..v.j 000160
E90000B8 0006E9F2 46880006 E9037500 003DF246 8900000C B09A5016 F4468D0E ..F¶.P.‾....F·=..u.Õ...F·Õ..¡..Õ 000180
8902578B 26078B26 0A5EC4D8 8E001EB8 1E565700 000EC800 12CAC95F 5E1F0000 ...^_èò..à...WV.¡...Äá^.&..&.W.. 0001A0
F2468900 000E729A 5016FC46 8D006A10 76FF1276 FF1476FF 1676FFFA 5689F846 F½.V‾.v..v..v..v.j..F•.P.r....F· 0001C0
16F4468D 0F6A1076 FF1276FF 1476FF16 76FF00B7 E9F2468B 0006E903 7500003D =..u.Õ...F·Õñ..v..v..v..v.j..F¶. 0001E0
```

Dump of file SATURN:[PCCOMMON.DUMP.DLL]PDMTAB.TMP;1 on 18-APR-1990 10:49:20.10
File ID (795,38,0)   End of file block 67 / Allocated 68

Virtual block number 20 (00000014), 512 (0200) bytes

```
FA5639FE 568BFC46 8B008EE9 F2468B00 06E90375 00003DF2 46890000 00469A50 P.F....F·=..u.Õ...F·Õ...F•.V±9V• 000000
006A1076 FF1276FF 1476FF16 76FF0029 E90372F8 46390008 E9037D00 36E9037E ~.Õ6.).Õ..9F½r.Õ)..v..v..v..v.j. 000020
568BF446 8B004AE9 F2468B00 06E90375 00003DF2 46890000 0EFA9A50 16F8468D .F½.P.•....F·=..u.Õ...F·ÕJ..F¶.V 000040
FF1276FF 1476FF16 76FF0029 E90372F8 46390008 E9037D00 36E9037E FA5639F6 -9V•-.Õ6.).Õ..9F½r.Õ)..v..v..v.. 000060
880006E9 F2468800 06E90375 00003DF2 46890000 00B39A50 16F8468D 0F6A1076 v.j..F½.P.°....F·=..u.Õ...F·Õ..¡ 000080
8B26078B 260A5EC4 D88E0E21 B81E5657 00000EC8 0012CAC9 5F5E1F00 00E90000 ..Õ...^_èò..à...WV.¡!..Äá^.&..&. 0000A0
00000F75 9A5016F4 468D196A 1076FF12 76FF1476 FF1676FF FE5689FC 46890257 W..F•.V±.v..v..v..v.j..F¶.P.u... 0000C0
8D186A10 76FF1276 FF1476FF 1676FF00 B7E9F246 880006E9 03750000 3DF24689 .F·=..u.Õ...F·Õñ..v..v..v..v.j.. 0000E0
F6568BF4 468B008E E9F2468B 0006E903 7500003D F2468900 000E499A 5016F846 F½.P.I....F·=..u.Õ...F·Õ...F¶.V- 000100
76FF1276 FF1476FF 1676FF00 29E90377 FC463900 08E9037E 0036E903 7DFE5639 9V±).Õ6.-.Õ..9F•w.Õ)..v..v..v..v 000120
468B004A E9F2468B 0006E903 7500003D F2468900 000FFD9A 5016FC46 8D196A10 .j..F•.P.»....F·=..u.Õ...F·ÕJ..F 000140
FF1476FF 1676FF00 29E90377 FC463900 08E9037E 0036E903 7DFE5639 FA568BF8 ½.V•9V±).Õ6.-.Õ..9F•w.Õ)..v..v.. 000160
E9F2468B 0006E903 7500003D F2468900 000EB69A 5016FC46 8D186A10 76FF1276 v..v.j..F•.P.Ñ....F·=..u.Õ...F·Õ 000180
8B260A5E C4D88E0F 24B81E56 5700000E C80012CA C95F5E1F 0000E900 00B80006 ..¡..Õ...^_èò..à...WV.¡$..Äá^.&. 0001A0
7B9A5016 FC468D17 6A1076FF 1276FF14 76FF1676 FFF65689 F4468902 57882607 .&.W..F¶.V‾.v..v..v..v.j..F•.P.x 0001C0
1076FF12 76FF1476 FF1676FF 00B7E9F2 46880006 E9037500 003DF246 89000010 ....F·=..u.Õ...F·Õñ..v..v..v..v. 0001E0
```

```
Dump of file SATURN:[PCCOMMON.DUMP.DLL]PDMTAB.TMP;1 on 18-APR-1990 10:49:20.10
File ID (795,38,0)   End of file block 67 / Allocated 68

Virtual block number 21 (00000015), 512 (0200) bytes

FC468800 8EE9F246 880006E9 03750000 3DF24689 00000F4C 9A5016F8 468D186A j..F½.P.L....F·=..u.Õ...F·Õ...F• 000000
76FF1476 FF1676FF 0029E903 72F44639 0008E903 7D0036E9 037EF656 39FE568B .V±9V--.Õ6.).Õ..9F¶r.Õ)..v..v..v 000020
4AE9F246 880006E9 03750000 3DF24689 00001100 9A5016F4 468D176A 1076FF12 ..v.j..F¶.P......F·=..u.Õ...F·ÕJ 000040
FF1676FF 0029E903 77F44639 0008E903 7E0036E9 037DF656 39FA568B F8468800 ..F½.V¹9V-).Õ6.-.Õ..9F¶w.Õ)..v.. 000060
880006E9 03750000 3DF24689 00000FB9 9A5016F4 468D186A 1076FF12 76FF1476 v..v..v.j..F¶.P.¿....F·=..u.Õ... 000080
5EC4D88E 1027881E 56570000 0EC80012 CAC95F5E 1F0000E9 00008800 06E9F246 F·Õ..|..Õ...^_èÒ..à...WV.¡'..Äá^ 0000A0
16FC4680 176A1076 FF1276FF 1476FF16 76FFFA56 89F84689 02578826 0788260A .&..&.W..F½.V¹.v..v..v..v.j..F•. 0000C0
1276FF14 76FF1676 FF0087E9 F2468800 06E90375 00003DF2 46890000 117B9A50 P.(....F·=..u.Õ...F·Õñ..v..v..v. 0000E0
008EE9F2 46880006 E9037500 003DF246 89000010 4F9A5016 F4468D19 6A1076FF .v.j..F¶.P.O....F·=..u.Õ...F·Õ.. 000100
76FF1676 FF0029E9 0372F846 390008E9 037D0036 E9037EFA 5639FE56 8BFC468B .F=.V±9V¹~.Õ6.).Õ..9F½r.Õ)..v..v 000120
46880006 E9037500 003DF246 89000012 039A5016 F8468D17 6A1076FF 1276FF14 ..v..v.j..F½.P......F·=..u.Õ...F 000140
FF0029E9 0372F846 390008E9 037D0036 E9037EFA 5639F656 8BF44688 004AE9F2 ·ÕJ..F¶.V-9V¹~.Õ6.).Õ..9F½r.Õ).. 000160
E9037500 003DF246 89000010 8C9A5016 F8468D19 6A1076FF 1276FF14 76FF1676 v..v..v..v.j..F½.P.¥....F·=..u.Õ 000180
8E112A88 1E565700 0042C800 12CAC95F 5E1F0000 E9000088 0006E9F2 46880006 ...F·Õ..|..Õ...^_èÒ..àB..WV.|*.. 0001A0
76FF1FA5 A5A5A5DA 8E1E0716 F08BDC7E 8D04C483 127F0028 9A0A76FF 0C76FFD8 Ä.v..v..(....á..¯É.Þ....ÕEEEE..v 0001C0
06E90375 00003DBE 46890000 12A79A50 16C04680 1B6A1076 FF1276FF 1476FF16 ..v..v..v.j..Fâ.P.Ì....F/=..u.Õ. 0001E0

Dump of file SATURN:[PCCOMMON.DUMP.DLL]PDMTAB.TMP;1 on 18-APR-1990 10:49:20.10
File ID (795,38,0)   End of file block 67 / Allocated 68

Virtual block number 22 (00000016), 512 (0200) bytes

A5A5DA8E 1E0716F0 8BF87E8D 04C48312 C400289A 5016C046 8D00EFE9 BE468800 ..F/Õÿ..Fâ.P.(.á..á..-½.Þ....ÕEE 000000
003DBE46 89000011 529A5016 E4468D1C 6A1076FF 1276FF14 76FF1676 FF1FA5A5 EE..v..v..v..v.j..FÕ.P.R....F/=. 000020
0716F08B D47E8D04 C483120E 00289A50 16E44680 00AAE9BE 46880006 E9037500 .u.Õ...F/Õ`..FÕ.P.(.B..á..~â.Þ.. 000040
E9037713 2205CA9A 12E80126 9ADC5E8D 12E60126 9AF85E8D 1FA5A5A5 A5DA8E1E ..ÕEEEE..^½.&.|..^É.&.Š..Ò.".w.Õ 000060
003DBE46 89000013 4B9A0A76 FF0C76FF 1B6A1076 FF1276FF 1476FF16 76FF002A *..v..v..v..v.j..v..v..K....F/=. 000080
5305CA9A 132F0126 9ADC5E8D 132A0126 9AD45E8D 004AE9BE 46880006 E9037500 .u.Õ...F/ÕJ..^â.&.*..^É.&./..Ò.S 0000A0
89000011 BF9A0A76 FF0C76FF 1C6A1076 FF1276FF 1476FF16 76FF002A E9037701 .w.Õ*..v..v..v..v.j..v..v..¢.... 0000C0
0042C800 12CAC95F 5E1F0000 E9000088 0006E9BE 46880006 E9037500 003DBE46 F/=..u.Õ...F/Õ..|..Õ...^_èÒ..àB. 0000E0
8E1E0716 F08BF87E 8D04C483 13C70028 9A0A76FF 0C76FFD8 8E122D88 1E565700 .WV.¡-..Ä.v..v..(.ú..á..¯½.Þ.... 000100
46890000 13EF9A50 16E44680 1A6A1076 FF1276FF 1476FF16 76FF1FA5 A5A5A5DA ÕEEEE..v..v..v..v.j..FÕ.P.ÿ....F 000120
88C87E80 04C48314 0C00289A 5016E446 8D00EFE9 BE468800 06E90375 00003DBE f=..u.Õ...F/Õÿ..FÕ.P.(....á..-à. 000140
629A5016 D0468D1C 6A1076FF 1276FF14 76FF1676 FF1FA5A5 A5A5DA8E 1E0716F0 Þ....ÕEEEE..v..v..v..v.j..FÅ.P.b 000160
C4831426 00289A50 16D04680 00AAE9BE 46880006 E9037500 003DBE46 89000012 ....F/=..u.Õ...F/Õ`..FÅ.P.(.&..á 000180
14330126 9AF85E8D 142E0126 9AC85E8D 1FA5A5A5 A5DA8E1E 0716F08B C07E8D04 ..-â.Þ....ÕEEEE..^â.&....^½.&.3. 0001A0
939A0A76 FF0C76FF 1A6A1076 FF1276FF 1476FF16 76FF002A E9037214 6A05CA9A .Ò.j.r.Õ*..v..v..v..v.j..v..v... 0001C0
9AF85E8D 14720126 9AC05E8D 004AE9BE 46880006 E9037500 003DBE46 89000014 ....F/=..u.Õ...F/ÕJ..^â.&.r..^½. 0001E0

Dump of file SATURN:[PCCOMMON.DUMP.DLL]PDMTAB.TMP;1 on 18-APR-1990 10:49:20.10
File ID (795,38,0)   End of file block 67 / Allocated 68

Virtual block number 23 (00000017), 512 (0200) bytes

FF0C76FF 1C6A1076 FF1276FF 1476FF16 76FF002A E9037712 3A05CA9A 14770126 &.w..Ò.:.w.Õ*..v..v..v..v.j..v.. 000000
5E1F0000 E9000088 0006E9BE 46880006 E9037500 003DBE46 89000013 079A0A76 v.......F/=..u.Õ...F/Õ..|..Õ...^ 000020
8D04C483 150F0028 9A0A76FF 0C76FFD8 8E1375B8 1E565700 0042C800 12CAC95F _èÒ..àB..WV.¡u..Ä.v..v..(....á.. 000040
16E44680 1A6A1076 FF1276FF 1476FF16 76FF1FA5 A5A5A5DA 8E1E0716 F08B047E ¬â.Þ....ÕEEEE..v..v..v..v.j..FÕ. 000060
5400289A 5016E446 8D00EFE9 BE468800 06E90375 00003DBE 46890000 15379A50 P.7....F/=..u.Õ...F/Õÿ..FÕ.P.(.T 000080
6A1076FF 1276FF14 76FF1676 FF1FA5A5 A5A5DA8E 1E0716F0 8BDC7E8D 04C48315 ..á..-É.Þ....ÕEEEE..v..v..v..v.j 0000A0
16C04680 00AAE9BE 46880006 E9037500 003DBE46 89000013 AA9A5016 C0468D1B ..Fâ.P.`....F/=..u.Õ...F/Õ`..Fâ. 0000C0
15760126 9ADC5E8D 1FA5A5A5 A5DA8E1E 0716F08B F87E8D04 C4831382 00289A50 P.(....á..-½.Þ....ÕEEEE..^É.&.v. 0000E0
1A6A1076 FF1276FF 1476FF16 76FF002A E9037215 B205CA9A 157B0126 9AD45E8D .^â.&.(..Ò.ý.r.Õ*..v..v..v..v.j. 000100
9AF85E8D 004AE9BE 46880006 E9037500 003DBE46 89000015 DB9A0A76 FF0C76FF .v..v..Ü....F/=..u.Õ...F/ÕJ..^½. 000120
FF1276FF 1476FF16 76FF002A E9037214 CA05CA9A 158F0126 9AD45E8D 158A0126 &.¤..^â.&.¢..Ò.Ò.r.Õ*..v..v..v.. 000140
0006E9BE 46880006 E9037500 003DBE46 89000014 4F9A0A76 FF0C76FF 1B6A1076 v.j..v..v..O....F/=..u.Õ...F/Õ.. 000160
9A0A76FF 0C76FFD8 8E148D88 1E565700 0042C800 12CAC95F 5E1F0000 E9000088 |..Õ...^_èÒ..àB..WV.|§..Ä.v..v.. 000180
FF1276FF 1476FF16 76FF1FA5 A5A5A5DA 8E1E0716 F08BDC7E 8D04C483 16570028 (.W..á..¯É.Þ....ÕEEEE..v..v..v.. 0001A0
8D00EFE9 BE468800 06E90375 00003DBE 46890000 167F9A50 16C04680 1E6A1076 v.j..Fâ.P......F/=..u.Õ...F/Õÿ.. 0001C0
76FF1676 FF1FA5A5 A5A5DA8E 1E0716F0 8BF87E8D 04C48316 9C00289A 5016C046 Fâ.P.(....á..-½.Þ....ÕEEEE..v..v 0001E0
```

```
Dump of file SATURN:[PCCOMMON.DUMP.DLL]PDMTAB.TMP;1 on 18-APR-1990 10:49:20.10
File ID (795,38,0)   End of file block 67 / Allocated 68

Virtual block number 24 (00000018), 512 (0200) bytes

 468B0006 E9037500 003DBE46 89000014 F29A5016 E4468D1F 6A1076FF 1276FF14 ..v..v.j..Fð.P.·....F/=..u.Õ...F 000000
 1FA5A5A5 A5DA8E1E 0716F08B D47E8D04 C48316B6 00289A50 16E4468D 00AAE9BE ƒÕˆ..Fð.P.(.Ñ..á..–å.Þ....ÖËËËË. 000020
 1476FF16 76FF002A E9037716 FA05CA9A 16C30126 9ADC5E8D 16BE0126 9AF85E8D .^½.&.ƒ..^É.&.ú..ò.'.w.Õ*..v..v. 000040
 468B0006 E9037500 003DBE46 89000017 239A0A76 FF0C76FF 1E6A1076 FF1276FF .v..v.j..v..v..#....F/=..u.Õ...F 000060
 76FF002A E9037715 6E05CA9A 17070126 9ADC5E8D 17020126 9AD45E8D 004AE9BE ƒÕJ..^å.&....^É.&....ò.n.w.Õ*..v 000080
 E9037500 003DBE46 89000015 979A0A76 FF0C76FF 1F6A1076 FF1276FF 1476FF16 ..v..v..v.j..v..v.......F/=..u.Õ 0000A0
 8E1605B8 1E565700 0042C800 12CAC95F 5E1F0000 E90000B8 0006E9BE 468B0006 ...F/Õ..¦..Õ...^_èò..àB..WV.¦... 0000C0
 76FF1FA5 A5A5A5DA 8E1E0716 F08BF87E 8D04C483 179F0028 9A0A76FF 0C76FFD8 Ä.v..v..(....á..¯½.Þ....ÖËËËË..v 0000E0
 06E90375 00003DBE 46890000 17C79A50 16E4468D 1D6A1076 FF1276FF 1476FF16 ..v..v..v.j..Fð.P.ú....F/=..u.Õ. 000100
 A5A5DA8E 1E0716F0 8BC87E8D 04C48317 E400289A 5016E446 8D00EFE9 BE468B00 ..F/Õÿ..Fð.P.(.ð..á..–à.Þ....ÖËË 000120
 003DBE46 89000016 3A9A5016 D0468D1F 6A1076FF 1276FF14 76FF1676 FF1FA5A5 ËË..v..v..v..v.j..FÅ.P.:....F/=. 000140
 0716F08B C07E8D04 C48317FE 00289A50 16D0468D 00AAE9BE 468B0006 E9037500 .u.Õ...F/Õˆ..FÅ.P.(.±..á..–ã.Þ.. 000160
 E9037218 4205CA9A 180B0126 9AF85E8D 18060126 9AC85E8D 1FA5A5A5 A5DA8E1E ..ÖËËËË..^à.&....^½.&....ò.B.r.Õ 000180
 003DBE46 89000018 689A0A76 FF0C76FF 1D6A1076 FF1276FF 1476FF16 76FF002A *..v..v..v..v.j..v..v..k....F/=. 0001A0
 1205CA9A 184F0126 9AF85E8D 184A0126 9AC05E8D 004AE9BE 468B0006 E9037500 .u.Õ...F/ÕJ..^ä.&.J..^½.&.O..ò.. 0001C0
 89000016 DF9A0A76 FF0C76FF 1F6A1076 FF1276FF 1476FF16 76FF002A E9037716 .w.Õ*..v..v..v..v.j..v..v..Õ.... 0001E0

Dump of file SATURN:[PCCOMMON.DUMP.DLL]PDMTAB.TMP;1 on 18-APR-1990 10:49:20.10
File ID (795,38,0)   End of file block 67 / Allocated 68

Virtual block number 25 (00000019), 512 (0200) bytes

 0044C800 12CAC95F 5E1F0000 E90000B8 0006E9BE 468B0006 E9037500 003DBE46 F/=..u.Õ...F/Õ..¦..Õ...^_èò..àD. 000000
 8BD47E8D 04C48318 EC00289A 0A76FF0C 76FF0001 BE46C7D8 8E174DB8 1E565700 .WV.¦M..ÄúFƒ...v..v..(.š¯.á..–å. 000020
 149A5016 E4468D1D 6A1076FF 1276FF14 76FF1676 FF1FA5A5 A5A5DA8E 1E0716F0 Þ....ÖËËËË..v..v..v..v.j..Fð.P.. 000040
 C4831931 00289A50 16E4468D 00EFE9BC 468B0006 E9037500 003DBC46 89000019 ....F¥=..u.Õ...F¥Õÿ..Fð.P.(.1..á 000060
 468D1E6A 1076FF12 76FF1476 FF1676FF 1FA5A5A5 A5DA8E1E 0716F08B DC7E8D04 ..–É.Þ....ÖËËËË..v..v..v..v.j..F 000080
 289A5016 C0468D00 AAE9BC46 8B0006E9 03750000 3DBC4689 00001782 9A5016C0 å.P......F¥=..u.Õ...F¥Õˆ..Få.P.( 0000A0
 D45E8D19 5301269A DC5E8D1F A5A5A5A5 DA8E1E07 16F08BF8 7E8D04C4 83194B00 .K..á..–½.Þ....ÖËËËË..^É.&.S..^å 0000C0
 0C76FF1D 6A1076FF 1276FF14 76FF1676 FF002AE9 0372175A 05CA9A19 5801269A .&.X..ò.Z.r.Õ*..v..v..v..v.j..v. 0000E0
 9701269A F85E8D00 4AE9BC46 8B0006E9 03750000 3DBC4689 00001827 9A0A76FF .v..'....F¥=..u.Õ...F¥ÕJ..^½.&.. 000100
 6A1076FF 1276FF14 76FF1676 FF002AE9 037218A7 05CA9A19 9C01269A D45E8D19 ..^å.&....ò.Ì.r.Õ*..v..v..v..v.j 000120
 0000B800 06E9BC46 8B0006E9 03750000 3DBC4689 00001974 9A0A76FF 0C76FF1E ..v..v..t....F¥=..u.Õ...F¥Õ..¦.. 000140
 0A189500 02000000 08198F00 02000000 040BF300 02000512 CAC95F5E 1F0000E9 Õ...^_èò.....µ.................. 000160
 00000000 00000000 00000000 00005900 04198802 03004B00 0418CF02 03000000 .....Ũ...K...¦...Y.............. 000180
 0006E903 7C977506 7E810010 E9037F97 50067EB1 D88EFFFF B81E5657 000000C8 à...WV.¦...Ä.~.P...Õ...–.u.|.Õ.. 0001A0
 0000B8D8 8E0008B8 1E565700 0008C8CB C95F5E1F 0000E900 00880003 E9000188 ¦..Õ..¦..Õ...^_èùà...WV.¦...Ä¦.. 0001C0
 00003D02 C483FFFF 00009A0C 76FF0007 C626065E C4FFFFFE 46C7F846 89FA4689 .F*.F½úF±..á^.Ĩó...v.......á.=.. 0001E0

Dump of file SATURN:[PCCOMMON.DUMP.DLL]PDMTAB.TMP;1 on 18-APR-1990 10:49:20.10
File ID (795,38,0)   End of file block 67 / Allocated 68

Virtual block number 26 (0000001A), 512 (0200) bytes

 468B02E3 C1DE8800 23E9037C 23FE8346 0001E900 00BE9774 0C46C700 05E90374 t.Õ..úF.t.ƒ..Õ..F.±#|.Õ#..BèD..F 000000
 FFFE7E83 FFD4E900 03E9FE46 8902FA87 8802E3C1 0E88000F E9037402 F887390C .9.½.t.Õ...BëD...'..F±Õ..Õå..~±. 000020
 0A76FFFE 76FF002E 36FF2600 F8068EF8 76FFFA76 FF0026E9 0C468B00 06E90374 t.Õ...F.Õ&..v'.v½..½.&.6...v±.v. 000040
 B81E5657 000238C8 0008CAC9 5F5E1F00 00E90000 B80000FF FF9A0676 FF0876FF .v..v......¦..Õ...^_èò..àB..WV.¦ 000060
 390C468B FED286FF 0004E900 00FED286 C7FDCA86 89FDCC86 890000B8 D88E0039 9..Ä¦....ë»..ò»ú.Ø±¯..Õ....Ø±.F.9 000080
 828902E6 C1FED286 8BFE578B 26FC478B 260E5EC4 040E4683 0021E903 7CFED286 .Ø±|.Õ!..F..á^.&.G=&.W±.ÑØ±èl... 0000A0
 003DFDC8 86890000 FFFF9A50 16FEF886 800676FF 0876FFFF CFE9FED6 9289FED4 å±..ø±Õü..v..v...½±.P.......à»=. 0000C0
 FDC88689 0000FFFF 9A5016FE FA868DFE F886FF00 9DE9FDC8 868B0007 E9037500 .u.Õ....à»Õ...Ñ½±..'±.P.......à» 0000E0
 002E36FF 2600F806 8EFDCAB6 FFFDCCB6 FF007BE9 FDC88688 0007E903 7500003D *..u.Õ....à»Õ(..Ñä».Ñò»..½.&.6.. 000100
 868D0C76 FF5016FE D4868DFD CE868900 0000C79A 5016FDD0 868D0101 680A76FF .v.h....Å».P.ú.....ö»..å±.P.v... 000120
 68FEFAB6 FF0000FF FF9A5016 FE468D01 01685016 FEFC8680 FDCEB6FF 5016FDD0 Å».P.Ñö»..•±.Ph...F±.P......Ñ'±h 000140
 C8868800 07E90375 00003DFD C8868900 00FFFF9A 006A006A 5016FEFC 868D1DB1 Ÿ...•±.Pj.j........à»=..u.Õ....à 000160
 00050058 00020003 000101B7 01030007 90CBC95F 5E1F0000 E90000B8 0006E9FD »Õ..¦..Õ...^_èù.....ñ.......X... 000180
 000601CD 0203002C 00040136 0203009D 0002018D 01030000 000A00E0 00020000 ....À.................6...,...ë... 0001A0
 E90000BE D88EFFFF B81E5657 000004C8 00000000 000000A9 00060158 0203009E ....X...ˋ.......à...WV.¦...Äƒ..Õ 0001C0
 065EC400 8A260A5E C4000FE9 037F0E76 390017E9 03750038 80260A5E C4460001 ..Fá^.&.B.u.Õ..9v...Õ..á^.&..á^. 0001E0
```

```
Dump of file SATURN:[PCCOMMON.DUMP.DLL]PDMTAB.TMP;1 on 18-APR-1990 10:49:20.10
File ID (795,38,0)   End of file block 67 / Allocated 68

Virtual block number 27 (0000001B), 512 (0200) bytes

 5E8BFFED E90001C6 26065EC4 000AE903 7F0E7E39 470001E9 FE8BFFDC E9008826 &..õÉ..±õ..G9~...õ..á^.&6..õÙ..^ 000000
 8B00FF47 C6260846 8E065E03 0E5E8B00 0EE90375 00FF7F80 2608468E 065E030E ..^..F.&....u.õ...^..^..F.&6G... 000020
 00000000 00000000 00000000 0000000A 00080002 000190C8 C95F5E1F 0000E9C6 6õ...^_èù....................... 000040
 3D024689 0000FFFF 9A5016FE 46800A76 FF0C76FF 088EFFFF 8B1E5657 00002EC8 à...WV.¡...Ä.v..v..F±.P......FØ= 000060
 00FFFF9A 5016F646 80501604 46800C6A FE76FF00 76E90246 880006E9 03750000 ..u.õ...FØõv..v±j..Få.P.F-.P.... 000080
 FFFF9A50 16FA468D F676FFF8 76FF0051 E9D2468B 0006E903 7500003D D2468900 ..FØ=..u.õ...FØõQ..v½.v-.F*.P... 0000A0
 6AFA76FF FC76FFF6 76FFF876 FF0030E9 D2468800 06E90375 00003DD2 46890000 ...FØ=..u.õ...FØõO..v½.v-.v=.v*j 0000C0
 00008800 06E90246 880006E9 03750000 3D024689 0000FFFF 9A0676FF 0876FF02 ..v..v.......FØ=..u.õ...FØõ..¡.. 0000E0
 16FE468D 0A76FF0C 76FFD88E 0008881E 56570000 30C80008 CAC95F5E 1F0000E9 õ...^_èò..à0..WV.¡...Ä.v..v..F±. 000100
 1602468D 0C6AFE76 FF0080E9 00468800 06E90375 00003D00 46890000 00189A50 P......FÅ=..u.õ...FÅõ...v±j..FØ. 000120
 FFF676FF 0068E900 46880006 E9037500 003D0046 89000000 3D9A5016 F4468D50 P.F¶.P.=....FÅ=..u.õ...FÅõh..v-. 000140
 F676FF00 47E9D046 880006E9 03750000 3D004689 0000005E 9A5016F8 468DF476 v¶.F½.P.^....FÅ=..u.õ...FÅõG..v- 000160
 0006E903 75000030 D0468900 0000889A 5016FC46 8D236AF8 76FFFA76 FFF476FF .v¶.v*.v½j#.F=.P......FÅ=..u.õ.. 000180
 00880789 26065EC4 00008800 03E90001 880006E9 037459FC 7E80001E E9004688 .FÅõ...-=Yt.õ..¡..õ..¡..á^.&..¡. 0001A0
 FE4680OA 76FF0C76 FFD88E00 82881E56 5700002E C80008CA C95F5E1F 0000E900 .õ...^_èò..à...WV.¡ý..Ä.v..v..F± 0001C0
 D4468D0C 6AFE76FF 0076E902 46880006 E9037500 003D0246 89000000 C29A5016 .P.õ...FØ=..u.õ...FØõv..v±j..Få 0001E0

Dump of file SATURN:[PCCOMMON.DUMP.DLL]PDMTAB.TMP;1 on 18-APR-1990 10:49:20.10
File ID (795,38,0)   End of file block 67 / Allocated 68

Virtual block number 28 (0000001C), 512 (0200) bytes

 F876FF00 51E9D246 880006E9 03750000 3D024689 000000E7 9A5016F6 46805016 .P.F-.P.Ô....FØ=..u.õ...FØõQ..v½ 000000
 76FF0030 E9D2468B 0006E903 7500003D D2468900 0001089A 5016FA46 8DF676FF .v-.F*.P......FØ=..u.õ...FØõO..v 000020
 E9037500 003D0246 89000001 319A0676 FF0876FF 066AFA76 FFFC76FF F676FFF8 ½.v-.v=.v*j..v..v..1....FØ=..u.õ 000040
 8E0173B8 1E565700 002EC800 08CAC95F 5E1F0000 E90000B8 0006E9D2 46880006 ...FØõ..¡..õ...^_èò..à...WV.¡s.. 000060
 E9D2468B 0006E903 7500003D D2468900 0001839A 5016FE46 800A76FF 0C76FFD8 Ä.v..v..F±.P......FØ=..u.õ...FØõ 000080
 06E90375 00003D02 46890000 01A89A50 16F6468D 5016D446 8D0C6AFE 76FF0076 v..v±j..Få.P.F-.P.´....FØ=..u.õ. 0000A0
 E9037500 003D0246 89000001 C99A5016 FA468DF6 76FFF876 FF0051E9 D2468800 ..FØõQ..v½.v-.F*.P.è....FØ=..u.õ 0000C0
 0001F39A 0676FF08 76FF076A FA76FFFC 76FFF676 FFF876FF 0030E9D2 46880006 ...FØõO..v½.v-.v=.v*j..v..v..µ.. 0000E0
 C80008CA C95F5E1F 0000E900 00880006 E9D2468B 0006E903 7500003D D2468900 ..FØ=..u.õ...FØõ..¡..õ...^_èò..à 000100
 003D0246 89000002 2D9A5016 FE46800A 76FF0C76 FFD88E02 1D881E56 5700002E ...WV.¡...Ä.v..v..F±.P.-....FØ=. 000120
 00000252 9A5016F6 46805016 D4468D0C 6AFE76FF 0076E9D2 46880006 E9037500 .u.õ...FØõv..v±j..Få.P.F-.P.R... 000140
 0002739A 5016FA46 8DF676FF F876FF00 51E9D246 880006E9 03750000 3D024689 .FØ=..u.õ...FØõQ..v½.v-.F*.P.s.. 000160
 086AFA76 FFFC76FF F676FFF8 76FF0030 E9D2468B 0006E903 7500003D D2468900 ..FØ=..u.õ...FØõO..v½.v-.v=.v*j. 000180
 E90000B8 0006E9D2 46880006 E9037500 003D0246 89000002 9D9A0676 FF0876FF .v..v.......FØ=..u.õ...FØõ..¡..õ 0001A0
 5016FE46 800A76FF 0C76FFD8 8E02C7B8 1E565700 002EC800 08CAC95F 5E1F0000 ...^_èò..à...WV.¡ú..Ä.v..v..F±.P 0001C0
 5016D446 8D0C6AFE 76FF0076 E9D2468B 0006E903 7500003D D2468900 0002D79A .■....FØ=..u.õ...FØõv..v±j..Få.P 0001E0

Dump of file SATURN:[PCCOMMON.DUMP.DLL]PDMTAB.TMP;1 on 18-APR-1990 10:49:20.10
File ID (795,38,0)   End of file block 67 / Allocated 68

Virtual block number 29 (0000001D), 512 (0200) bytes

 76FFF876 FF0051E9 D2468800 06E90375 00003DD2 46890000 02FC9A50 16F6468D .F-.P.■....FØ=..u.õ...FØõQ..v½.v 000000
 FFF876FF 0030E9D2 46880006 E9037500 003D0246 89000003 1D9A5016 FA468DF6 -.F*.P......FØ=..u.õ...FØõO..v½. 000020
 0006E903 7500003D D2468900 0003479A 0676FF08 76FF096A FA76FFFC 76FFF676 v-.v=.v*j..v..v..G....FØ=..u.õ.. 000040
 FFD88E03 71881E56 5700002E C80008CA C95F5E1F 0000E900 00880006 E9D2468B .FØõ..¡..õ...^_èò..à...WV.¡q..Ä. 000060
 0076E9D2 46880006 E9037500 003D0246 89000003 819A5016 FE46800A 76FF0C76 v..v..F±.P......FØ=..u.õ...FØõv. 000080
 880006E9 03750000 3D024689 000003A6 9A5016F6 46805016 D446800C 6AFE76FF .v±j..Få.P.F-.P.¦....FØ=..u.õ... 0000A0
 0006E903 7500003D D2468900 0003C79A 5016FA46 8DF676FF F876FF00 51E9D246 FØõQ..v½.v-.F*.P.ú....FØ=..u.õ.. 0000C0
 89000003 F19A0676 FF0876FF 0A6AFA76 FFFC76FF F676FFF8 76FF0030 E9D2468B .FØõO..v½.v-.v=.v*j..v..v..þ.... 0000E0
 002EC800 08CAC95F 5E1F0000 E90000B8 0006E9D2 46880006 E9037500 003D0246 FØ=..u.õ...FØõ..¡..õ...^_èò..à.. 000100
 7500003D D2468900 0004289A 5016FE46 800A76FF 0C76FFD8 8E041B88 1E565700 .WV.¡...Ä.v..v..F±.P.+....FØ=..u 000120
 46890000 04509A50 16F6468D 5016D446 8D0C6AFE 76FF0076 E9D2468B 0006E903 .õ...FØõv..v±j..Få.P.F-.P.P....F 000140
 89000004 719A5016 FA468DF6 76FFF876 FF0051E9 D2468800 06E90375 00003D02 Ø=..u.õ...FØõQ..v½.v-.F*.P.q.... 000160
 76FF006A FA76FFFC 76FFF676 FFF876FF 0030E9D2 46880006 E9037500 003D0246 FØ=..u.õ...FØõO..v½.v-.v=.v*j..v 000180
 0000E900 00880006 E9D2468B 0006E903 7500003D D2468900 00049B9A 0676FF08 ..v.......FØ=..u.õ...FØõ..¡..õ.. 0001A0
 D59A5016 FE46800A 76FF0C76 FFD88E04 C5881E56 5700002E C80008CA C95F5E1F .^_èò..à...WV.¡é..Ä.v..v..F±.P.f 0001C0
 46805016 D446800C 6AFE76FF 0076E9D2 46880006 E9037500 003D0246 89000004 ....FØ=..u.õ...FØõv..v±j..Få.P.F 0001E0
```

```
Dump of file SATURN:[PCCOMMON.DUMP.DLL]PDMTAB.TMP;1 on 18-APR-1990 10:49:20.10
File ID (795,38,0)   End of file block 67 / Allocated 68

Virtual block number 30 (0000001E), 512 (0200) bytes

 8DF676FF F876FF00 51E9D246 880006E9 03750000 3DD24689 000004FA 9A5016F6 -.P.'....F0=..u.Õ...FØÕQ..v½.v-. 000000
 F676FFF8 76FF0030 E9D2468B 0006E903 7500003D D2468900 000518 9A 5016FA46 F'.P......F0=..u.Õ...FØÕO..v½.v- 000020
 468B0006 E9037500 003DD246 89000005 459A0676 FF0876FF 0F6AFA76 FFFC76FF .v•.v'j..v..v..E....F0=..u.Õ...F 000040
 0C76FFD8 8E056FB8 1E565700 002EC800 08CAC95F 5E1F0000 E90000B8 0006E9D2 ØÕ..¡..Õ...^_èò..à...WV.¡o..Ä.v. 000060
 76FF0076 E9D2468B 0006E903 7500003D D2468900 00057F9A 5016FE46 8D0A76FF .v..F±.P......F0=..u.Õ...FØÕv..v 000080
 D2468B00 06E90375 00003DD2 46890000 05A49A50 16F6468D 5016D446 8D0C6AFE ±j..Få.P.F-.P.Ê....F0=..u.Õ...FØ 0000A0
 468B0006 E9037500 003DD246 89000005 C59A5016 FA468DF6 76FFF876 FF0051E9 ÕQ..v½.v-.F'.P.é....F0=..u.Õ...F 0000C0
 D2468900 0005EF9A 0676FF08 76FF0E6A FA76FFFC 76FFF676 FFF876FF 0030E9D2 ØÕO..v½.v-.v•.v'j..v..v..ÿ....FØ 0000E0
 5700002E C80008CA C95F5E1F 0000E900 00B80006 E9D2468B 0006E903 7500003D =..u.Õ...FØÕ..¡..Õ...^_èò..à...W 000100
 E9037500 003DD246 89000006 299A5016 FE468D0A 76FF0C76 FFD88E06 19B81E56 V.¡...Ä.v..v..F±.P.)....F0=..u.Õ 000120
 3DD24689 0000064E 9A5016F6 468D5016 D4468D0C 6AFE76FF 0076E9D2 468B0006 ...FØÕv..v±j..Få.P.F-.P.N....F0= 000140
 D2468900 00066F9A 5016FA46 8DF676FF F876FF00 51E9D246 880006E9 03750000 ..u.Õ...FØÕQ..v½.v-.F'.P.o....FØ 000160
 FF0876FF 106AFA76 FFFC76FF F676FFF8 76FF0030 E9D2468B 0006E903 7500003D =..u.Õ...FØÕO..v½.v-.v•.v'j..v.. 000180
 5E1F0000 E90000B8 0006E9D2 468B0006 E9037500 003DD246 89000006 999A0676 v.......F0=..u.Õ...FØÕ..¡..Õ...^ 0001A0
 0006039A 5016FE46 8D0A76FF 0C76FFD8 8E06C3B8 1E565700 002EC800 08CAC95F _èò..à...WV.¡û..Ä.v..v..F±.P.Æ.. 0001C0
 16F6468D 5016D446 8D0C6AFE 76FF0076 E9D2468B 0006E903 7500003D D2468900 ¯.F0=..u.Õ...FØÕv..v±j..Få.P.F-. 0001E0

Dump of file SATURN:[PCCOMMON.DUMP.DLL]PDMTAB.TMP;1 on 18-APR-1990 10:49:20.10
File ID (795,38,0)   End of file block 67 / Allocated 68

Virtual block number 31 (0000001F), 512 (0200) bytes

 FA468DF6 76FFF876 FF0051E9 D2468B00 06E90375 00003DD2 46890000 06F89A50 P.½....F0=..u.Õ...FØÕQ..v½.v-.F' 000000
 76FFF676 FFF876FF 0030E9D2 468B0006 E9037500 003DD246 89000007 199A5016 .P......F0=..u.Õ...FØÕO..v½.v-.v 000020
 E9D2468B 0006E903 7500003D D2468900 0007439A 0676FF08 76FF116A FA76FFFC •.v'j..v..v..C....F0=..u.Õ...FØÕ 000040
 76FF0C76 FFD88E07 6DB81E56 5700002E C80008CA C95F5E1F 0000E900 00B80006 ..¡..Õ...^_èò..à...WV.¡m..Ä.v..v 000060
 6AFE76FF 0076E9D2 468B0006 E9037500 003DD246 89000007 7D9A5016 FE468D0A ..F±.P.)....F0=..u.Õ...FØÕv..v±j 000080
 51E9D246 880006E9 03750000 3DD24689 000007A2 9A5016F6 468D5016 D4468D0C ..Få.P.F-.P.Å....F0=..u.Õ...FØÕQ 0000A0
 E9D2468B 0006E903 7500003D D2468900 0007C39A 5016FA46 8DF676FF F876FF00 ..v½.v-.F'.P.û....F0=..u.Õ...FØÕ 0000C0
 003DD246 89000007 ED9A0676 FF0876FF 146AFA76 FFFC76FF F676FFF8 76FF0030 O..v½.v-.v•.v'j..v..v..Ú....F0=. 0000E0
 1E565700 002EC800 08CAC95F 5E1F0000 E90000B8 0006E9D2 468B0006 E9037500 .u.Õ...FØÕ..¡..Õ...^_èò..à...WV. 000100
 0006E903 7500003D D2468900 0008279A 5016FE46 8D0A76FF 0C76FFD8 8E0817B8 ¡...Ä.v..v..F±.P.'....F0=..u.Õ.. 000120
 00003DD2 46890000 084C9A50 16F6468D 5016D446 8D0C6AFE 76FF0076 E9D2468B .FØÕv..v±j..Få.P.F-.P.L....F0=.. 000140
 003DD246 89000008 6D9A5016 FA468DF6 76FFF876 FF0051E9 D2468B00 06E90375 u.Õ...FØÕQ..v½.v-.F'.P.m....F0=. 000160
 0676FF08 76FF156A FA76FFFC 76FFF676 FFF876FF 0030E9D2 468B0006 E9037500 .u.Õ...FØÕO..v½.v-.v•.v'j..v..v. 000180
 C95F5E1F 0000E900 00B80006 E9D2468B 0006E903 7500003D D2468900 0008979A ......F0=..u.Õ...FØÕ..¡..Õ...^_è 0001A0
 89000008 D19A5016 FE468D0A 76FF0C76 FFD88E08 C1B81E56 5700002E C80008CA ò..à...WV.¡é..Ä.v..v..F±.P.Á.... 0001C0
 9A5016F6 468D5016 D4468D0C 6AFE76FF 0076E9D2 468B0006 E9037500 003DD246 F0=..u.Õ...FØÕv..v±j..Få.P.F-.P. 0001E0

Dump of file SATURN:[PCCOMMON.DUMP.DLL]PDMTAB.TMP;1 on 18-APR-1990 10:49:20.10
File ID (795,38,0)   End of file block 67 / Allocated 68

Virtual block number 32 (00000020), 512 (0200) bytes

 5016FA46 8DF676FF F876FF00 51E9D246 880006E9 03750000 3DD24689 000008F6 -....F0=..u.Õ...FØÕQ..v½.v-.F'.P 000000
 FFFC76FF F676FFF8 76FF0030 E9D2468B 0006E903 7500003D D2468900 0009179A ......F0=..u.Õ...FØÕO..v½.v-.v•. 000020
 0006E9D2 468B0006 E9037500 003DD246 89000009 419A0676 FF0876FF 126AFA76 v'j..v..v..A....F0=..u.Õ...FØÕ.. 000040
 8D0A76FF 0C76FFD8 8E0968B8 1E565700 002EC800 08CAC95F 5E1F0000 E90000B8 ¡..Õ...^_èò..à...WV.¡k..Ä.v..v.. 000060
 8D0C6AFE 76FF0076 E9D2468B 0006E903 7500003D D2468900 00097B9A 5016FE46 F±.P.(....F0=..u.Õ...FØÕv..v±j.. 000080
 FF0051E9 D2468B00 06E90375 00003DD2 46890000 09A09A50 16F6468D 5016D446 Få.P.F-.P......F0=..u.Õ...FØÕQ.. 0000A0
 0030E9D2 468B0006 E9037500 003DD246 89000009 C19A5016 FA468DF6 76FFF876 v½.v-.F'.P.è....F0=..u.Õ...FØÕO. 0000C0
 7500003D D2468900 0009EB9A 0676FF08 76FF136A FA76FFFC 76FFF676 FFF876FF .v½.v-.v•.v'j..v..v..Š....F0=..u 0000E0
 15B81E56 5700002E C80008CA C95F5E1F 0000E900 00B80006 E9D2468B 0006E903 .Õ...FØÕ..¡..Õ...^_èò..à...WV.¡. 000100
 468B0006 E9037500 003DD246 8900000A 259A5016 FE468D0A 76FF0C76 FFD88E0A ..Ä.v..v..F±.P.%....F0=..u.Õ...F 000120
 03750000 3DD24689 00000A4A 9A5016F6 468D5016 D4468D0C 6AFE76FF 0076E9D2 ØÕv..v±j..Få.P.F-.P.J....F0=..u. 000140
 7500003D D2468900 000A6B9A 5016FA46 8DF676FF F876FF00 51E9D246 880006E9 Õ...FØÕQ..v½.v-.F'.P.k... F0=..u 000160
 959A0676 FF0876FF 166AFA76 FFFC76FF F676FFF8 76FF0030 E9D2468B 0006E903 .Õ...FØÕO..v½.v-.v•.v'j..  .v... 000180
 08CAC95F 5E1F0000 E90000B8 0006E9D2 468B0006 E9037500 003DD246 8900000A ....F0=..u.Õ...FØÕ..¡..Õ.. ` èò. 0001A0
 D2468900 000ACF9A 5016FE46 8D0A76FF 0C76FFD8 8E0ABFB8 1E565700 002EC800 .à...WV.¡¢..Ä.v..v..F±.P.ü....FØ 0001C0
 0AF49A50 16F6468D 5016D446 8D0C6AFE 76FF0076 E9D2468B 0006E903 7500003D =..u.Õ...FØÕv..v±j..Få.P.F-.P.¶. 0001E0
```

```
Dump of file SATURN:[PCCOMMON.DUMP.DLL]PDMTAB.TMP;1 on 18-APR-1990 10:49:20.10
File ID (795,38,0)   End of file block 67 / Allocated 68

Virtual block number 33 (00000021), 512 (0200) bytes

159A5016 FA468DF6 76FFF876 FF0051E9 D2468B00 06E90375 00003DD2 46890000 ...F0=..u.Õ...FØÕQ..v½.v-.F¹.P.. 000000
FA76FFFC 76FFF676 FFF876FF 0030E9D2 468B0006 E9037500 003DD246 8900000B ....F0=..u.Õ...FØÕO..v½.v-.v=.v¹ 000020
00880006 E9D24688 0006E903 7500003D D2468900 000B3F9A 0676FF08 76FF176A j..v..v..?....F0=..u.Õ...FØÕ..¡. 000040
FE468D0A 76FF0C76 FFD88E08 69B81E56 5700002E C80008CA C95F5E1F 0000E900 .Õ...^_èò..à...WV.¡i..Ä.v..v..F± 000060
D4468D0C 6AFE76FF 0076E9D2 468B0006 E9037500 003DD246 8900000B 799A5016 .P.y....F0=..u.Õ...FØÕv..v±j..Få 000080
F876FF00 51E9D246 8B0006E9 03750000 3DD24689 00000B9E 9A5016F6 46805016 .P.F-.P......F0=..u.Õ...FØÕQ..v½ 0000A0
76FF0030 E9D24688 0006E903 7500003D D2468900 000B8F9A 5016FA46 8DF676FF .v-.F¹.P.¢....F0=..u.Õ...FØÕO..v 0000C0
E9037500 003DD246 8900000B E99A0676 FF0876FF 196AFA76 FFFC76FF F676FFF8 ½.v-.v=.v¹j..v..v..Õ....F0=..u.Õ 0000E0
8E0C13B8 1E565700 002EC800 08CAC95F 5E1F0000 E900008B 0006E9D2 46880006 ...FØÕ..¡..Õ...^_èò..à...WV.¡... 000100
E9D24688 0006E903 7500003D D2468900 000C239A 5016FE46 8D0A76FF 0C76FFD8 Ä.v..v..F±.P.#....F0=..u.Õ...FØÕ 000120
06E90375 00003DD2 46890000 0C489A50 16F6468D 50160446 8D0C6AFE 76FF0076 v..v±j..Få.P.F-.P.H....F0=..u.Õ. 000140
E9037500 003DD246 8900000C 699A5016 FA468DF6 76FFF876 FF0051E9 D2468B00 ..FØÕQ..v½.v-.F¹.P.i....F0=..u.Õ 000160
000C939A 0676FF08 76FF186A FA76FFFC 76FFF676 FFF876FF 0030E9D2 46880006 ...FØÕO..v½.v-.v=.v¹j..v..v..... 000180
C80008CA C95F5E1F 0000E900 00880006 E9D24688 0006E903 7500003D D2468900 ..F0=..u.Õ...FØÕ..¡..Õ...^_èò..à 0001A0
003DD246 8900000C CD9A5016 FE468D0A 76FF0C76 FFD88E0C BDB81E56 5700002E ...WV.¡§..Ä.v..v..F±.P.ë....F0=. 0001C0
00000CF2 9A5016F6 46805016 D4468D0C 6AFE76FF 0076E9D2 46880006 E9037500 .u.Õ...FØÕv..v±j..Få.P.F-.P.·... 0001E0

Dump of file SATURN:[PCCOMMON.DUMP.DLL]PDMTAB.TMP;1 on 18-APR-1990 10:49:20.10
File ID (795,38,0)   End of file block 67 / Allocated 68

Virtual block number 34 (00000022), 512 (0200) bytes

0000139A 5016FA46 8DF676FF F876FF00 51E9D246 8B0006E9 03750000 3DD24689 .F0=..u.Õ...FØÕQ..v½.v-.F¹.P.... 000000
036AFA76 FFFC76FF F676FFF8 76FF0030 E9D24688 0006E903 7500003D D2468900 ..F0=..u.Õ...FØÕO..v½.v-.v=.v¹j. 000020
E900008B 0006E9D2 46880006 E9037500 003DD246 89000000 3D9A0676 FF0876FF .v..v..=....F0=..u.Õ...FØÕ..¡..Õ 000040
5016FE46 8D0A76FF 0C76FFD8 8E0D67B8 1E565700 002EC800 08CAC95F 5E1F0000 ...^_èò..à...WV.¡g..Ä.v..v..F±.P 000060
50160446 8D0C6AFE 76FF0076 E9D24688 0006E903 7500003D D2468900 0000779A .w....F0=..u.Õ...FØÕv..v±j .Få.P 000080
76FFF876 FF0051E9 D2468B00 06E90375 00003DD2 46890000 0D9C9A50 16F6468D .F-.P......F0=..u.Õ...FØÕQ. v½.v 0000A0
FFF876FF 0030E9D2 468B0006 E9037500 003DD246 89000000 8D9A5016 FA468DF6 ~.F¹.P.§....F0=..u.Õ...FØÕO..v½. 0000C0
0006E903 7500003D D2468900 000DE79A 0676FF08 76FF246A FA76FFFC 76FFF676 v-.v=.v¹j$.v..v..Õ....F0=..u.Õ.. 0000E0
FFD88E0E 11B81E56 5700002E C80008CA C95F5E1F 0000E900 00880006 E9D24688 .FØÕ..¡..Õ...^_èò..à...WV.¡...Ä. 000100
0076E9D2 46880006 E9037500 003DD246 8900000E 219A5016 FE468D0A 76FF0C76 v..v..F±.P.!....F0=..u.Õ...FØÕv. 000120
880006E9 03750000 3DD24689 00000E46 9A5016F6 46805016 D4468D0C 6AFE76FF .v±j..Få.P.F-.P.F....F0=..u.Õ... 000140
0006E903 7500003D D2468900 000E679A 5016FA46 8DF676FF F876FF00 51E9D246 FØÕQ..v½.v-.F¹.P.g....F0=..u.Õ.. 000160
8900000E 919A0676 FF0876FF 0C6AFA76 FFFC76FF F676FFF8 76FF0030 E9D24688 .FØÕO..v½.v-.v=.v¹j..v..v....... 000180
002EC800 08CAC95F 5E1F0000 E900008B 0006E9D2 46880006 E9037500 003DD246 F0=..u.Õ...FØÕ..¡..Õ...^_èò..à.. 0001A0
7500003D D2468900 000ECB9A 5016FE46 8D0A76FF 0C76FFD8 8E0EB8B8 1E565700 .WV.¡Ë..Ä.v..v..F±.P.Ù....F0=..u 0001C0
46890000 0EF09A50 16F6468D 50160446 8D0C6AFE 76FF0076 E9D24688 0006E903 .Õ...FØÕv..v±j..Få.P.F-.P.Þ....F 0001E0

Dump of file SATURN:[PCCOMMON.DUMP.DLL]PDMTAB.TMP;1 on 18-APR-1990 10:49:20.10
File ID (795,38,0)   End of file block 67 / Allocated 68

Virtual block number 35 (00000023), 512 (0200) bytes

8900000F 119A5016 FA468DF6 76FFF876 FF0051E9 D2468B00 06E90375 00003DD2 0=..u.Õ...FØÕQ..v½.v-.F¹.P...... 000000
76FF046A FA76FFFC 76FFF676 FFF876FF 0030E9D2 468B0006 E9037500 003DD246 F0=..u.Õ...FØÕO..v½.v-.v=.v¹j..v 000020
0000E900 00880006 E9D24688 0006E903 7500003D D2468900 000F389A 0676FF08 ..v..;....F0=..u.Õ...FØÕ..¡..Õ.. 000040
00040FB8 02030088 00050F9A 02030000 000A0F65 00020005 900008CA C95F5E1F .^_èò.......e...............É... 000060
00000000 00000000 00000000 00000048 00040FE5 0203002C 00040F75 02030018 ....u...,....å....K............. 000080
F7AEF2FF FFB9C033 067EC4D7 8BEC8B55 00000000 00000000 00000000 00000000 ................U.ì.mä-.3à¿..·Ù% 0000A0
08038587 F6D88B98 058A2647 9002EB06 7EC45657 000000C8 00CB5DFA 8B9149D1 Ì1..¹]ù.à...WVä-.Š..GÆ....Ä-.... 0000C0
FFFF1483 9A570876 FF5004C4 83005E00 109A5706 006A006A 08468C06 7E89F275 u·.-..F.j.j..W...^..ó.P.v.W..... 0000E0
8B55CBC9 5F5EDA8C 14FE8B1F A5A5A5A5 DA8E1E07 1EF08B14 FEBF0008 050AC483 .ó....¢±..Þ....ÖEEEE.¡±..Ö^_èùU. 000100
8A0A4688 D128D187 D1030323 DB1BD128 0C74DAF7 D78B067E C45738E3 0C4E88EC $.N.D8Wá-..æ%Öt.+Ï.Ù#Æ.Ï.Ï+Ï.F.. 000120
46885FAA F3C913AB F3E9D1C3 8EFFFFC3 81C38C10 E3D187AA F3C913AB F3E9D1E0 ÀiÕµ¨.èµ¨.ÏD..ù.Ù...ùiÕµ¨.èµ¨_.F 000140
5756C08E D08CCB5E 5FA5F300 0A890488 8F04868E C08ED88C 5756CB5D 08568806 ..V.]ùVW.Ä.å/..¢|.¿..µÉ_^ù.Ä.åVW 000160
F3885756 16E8F388 D98EA5A5 FCD88EC1 8ED98CC0 8CF8880C C3830714 1E88F388 .µ.....ù..«.å.\.è.Ä=ÉÉ.Ï.µŠ.VW.µ 000180
C6FC7789 07141E89 4E740700 FB81F388 A5A5FCC1 8ED98CF8 880CC383 07141E88 .....ù..«.\.è=ÉÉ.µ.«..tN.....w=ó 0001A0
FCD88EC1 8ED98CC0 8CF8880C C3830714 1E88F388 5756C08E D08CCB5E 5F03FE47 G±. ^ù.Å.åVW.µ.....ù..«.å.\.è.Ä= 0001C0
A5A5A5A5 FCC18ED9 8CF8880C C3830714 1E88F388 575618E8 F388D98E A5A5A5A5 ÉÉÉÉ.\.µŠ.VW.µ.....ù..«.\.è=ÉÉÉÉ 0001E0
```

```
Dump of file SATURN:[PCCOMMON.DUMP.DLL]PDMTAB.TMP;1 on 18-APR-1990 10:49:20.10
File ID (795,38,0)   End of file block 67 / Allocated 68

Virtual block number 36 (00000024), 512 (0200) bytes

 5604EBD0 8C575605 4FE9CB5E 5FFC7789 07FE47C6 07141E89 0E740700 FB81F388 .µ.«..t.....6G±..w=_^ùÕO.VW.ÀŠ.V 000000
 A5027403 3CA5A5FE 4588ADFB 880CC383 07141E88 F388FCD8 8EC18ED9 8CD88C57 W.Ä.).è.Ä=.µ.....û.¯«Ü.E±ÉÉ<.t.E 000020
 14EB0257 8B26078B 26C08ED0 8CCB5E5F D98EFC5F 8907141E 89CF7407 00FB81A5 É.«..tü....._=.)_^ù.Å.ã&..&.W.Š. 000040
 07798024 C78AD08B DA8B5756 99078B03 EB02578B 078B0AEB 99078B26 C08ED08C .Å.ã&...Š...¯W.Š¯...VW.Ö.Å.ú$.y. 000060
 80C18ED9 8CFC7D89 07143E89 1C740700 FF810CC7 8307143E 8B000B83 DAF7DBF7 %Ü%Ö.Ü..>...û.....t..>...)•.).ê. 000080
 8BDB33CB 8B8760BD 5507FE45 C6FF63E9 CB5E5F0A 70E89E84 03FE45C6 0F7500FF ..u.6E±.Ç.Òp._^ùÕc.6E±.U§'..ù3Ü. 0000A0
 740700FF 810CC783 FE458AFC 758B0714 3E8BC08E D88C5756 CB5E5F5D 0DCFE8FB «ÒÜ.]_^ùVW.Å.ã.>...u=.E±.ú.....t 0000C0
 0CC78307 143E8857 56CB5E5F A5A50274 033CA5A5 FCFE4588 FC7D8907 143E89B1 Ÿ.>...¯)•.E±•ÉÉ<.t.ÉÉ_^ùVW.>...ú. 0000E0
 EBD08CC8 5E5FABAB FCC033C0 8ED88C03 FE45C6FC 7D890714 3E898C74 0700FF81 ....t..>...)•6E±..Ä.ã3ã•¨¨_^ù.ÀŠ 000100
 8B5756C0 8ED88C02 EBD08C11 EB0C0714 06830714 1E8BFCF8 8B5756C0 8ED88C02 ..Ä.âVW.«=.........Š..ÀŠ..Ä.âVW. 000120
 778B04DA 268955CB 5E5F0C07 142E83A5 A5FC778B 0D7503FE 7F800714 1E8BFCFB «•......±.u..w•ÉÉ....._^ùU.&Ö..w 000140
 07140683 07141E8B FCFB8B57 56C08ED8 8C02EBD0 8CE4EB5D DE8B5F04 92E857FC •WÒ.. .B]Šö.ÀŠ..Ä.âVW.«• ....... 000160
 A5A5A5FC 778B0F75 07FE7F80 07141E8B FCFB8B57 56C08ED8 8C02EBD0 8C11EB0C .Š..ÀŠ..Ä.âVW.«•......±.\ .w•ÉÉÉ 000180
 FB8B5756 C08ED88C 02EBD08C E9EBDF87 F78B18B8 E8DF87CB 5E5F0C07 142E83A5 É....._^ù.ÒÖ|..%.ÒŠÖ.ÀŠ..Ä âVW.« 0001A0
 FE478AF3 8B07141E 8BFB8B57 56C08ED8 8C02EBD0 8C10EB0C 07140683 07141E8B .........Š..ÀŠ..Ä.âVW.«.....µ.G± 0001C0
 0876BA08 71B850EB 084DBA08 4388CB5E 5FA5A502 74033CA5 A5ABFC0C 07142E83 .....• ÉÉ<.t.ÉÉ_^ù|C.nM.ŠP|q.nv. 0001E0

Dump of file SATURN:[PCCOMMON.DUMP.DLL]PDMTAB.TMP;1 on 18-APR-1990 10:49:20.10
File ID (795,38,0)   End of file block 67 / Allocated 68

Virtual block number 37 (00000025), 512 (0200) bytes

 900AEB05 28E89010 EB0529E8 36E8037A BA0374B8 04B62688 9F005103 D39A48EB ŠH.Æ.Q...&Ñ.|t.nz.Š6Ò).Š..Ò(.Š.. 000000
 9F036503 D39AC30A F7000283 D8F70773 589E04B6 268A5005 38E89004 EB0576E8 Òv.Š..Ò;.P.&Ñ..Xs.%Ä.Ø.%Öû.Æ.e.. 000020
 7C800714 36890CEE 83071436 8B515304 DA268955 57560386 BA038088 04B62688 .&Ñ.|..¤..VWU.&Ö.SQ.6...Ÿ..6...| 000040
 7F01F6FF 32FE5D8A 07143E8B 57CB5E5F 5D5B5902 FF02EBD0 FF047508 748B030A ...t.u..ÀŠ..ØY[]_^ùW.>...]±2.-.. 000060
 CBF9CBE4 0B03755F 8001F6F8 7480FF41 F6CB5F08 75F0FF41 F6087403 FB801375 u..«.t.-A.Þu._Ù-Ä..t½-..u..ðù°ù 000080
 320875F7 3BFC758B FE5D8A07 143E8857 56CB5F7F 2180FF32 FE5D8A07 143E8857 W.>...]±2..!.¯ùVW.>...]±¯u=;%u.2 0000A0
 ADA5A5CB 5E5FAB80 F480AD08 7503FB80 A5FCC18E D98CFC7D 89CB5E5F 803180FF ..1._^ù.)•.).ê•É.«.u.Ü.¶.¨_^ùÉÉÜ 0000C0
 5676EB00 0888F388 575604EB 1744E857 5602EBC0 8ED08C57 56CB5E5F AB80F480 .¶.¨¯^ùVW.Å.âŠ.VWÒO.Š.VW.µ|..ŠvV 0000E0
 5602EBC0 8ED08C57 565EEB00 04B8F388 575604EB 172CE857 5602EBC0 8ED08C57 W.Å.ãŠ.VWÒ,.Š.VW.µ|..Š^VW.Å.âŠ.V 000100
 575604EB 16FCE857 5602EBC0 8ED08C57 5646EB00 0CB8F388 575604EB 1714E857 WÒ..Š.VW.µ|..ŠFVW.Å.âŠ.VWÒ•.Š.VW 000120
 5616EB00 10B8F388 575604EB 16E4E857 5602EBC0 8ED08C57 562EEB00 14B8F388 .µ|..Š.VW.Å.âŠ.VWÒÖ.Š.VW.µ|..Š.V 000140
 80C18ED9 8C07143E 8BD88B00 00B8F388 575604EB 16CCE857 5602EBC0 8ED08C57 W.Å.âŠ.VWÒä.Š.VW.µ|...Ä.>...).ê. 000160
 F78B16D7 E80596BF 02C383CB 5E5F5D04 9A97FF04 DA268955 FC7D8710 7407FE7D )±.t..)=U.&Ö.....]_^ù.Û.¢..Ò=..% 000180
 575676E8 000A88F3 8B575604 EB169BE8 575602E8 C08ED08C 57560FE8 07143E8B .>..ŠÒVW.Å.âŠ.VWÒ.¯Š.VW.µ|..ŠvVW 0001A0
 575602E8 C08ED08C 57565EEB 0006B8F3 8B575604 EB1683E8 575602EB C08ED08C .Å.âŠ.VWÒ..Š.VW.µ|..Š^VW.Å.âŠ.VW 0001C0
 8B575604 EB1653E8 575602E8 C08ED08C 575646EB 000EB8F3 8B575604 EB166BE8 Òk.Š.VW.µ|..ŠFVW.Å.âŠ.VWÒS.Š.VW. 0001E0

Dump of file SATURN:[PCCOMMON.DUMP.DLL]PDMTAB.TMP;1 on 18-APR-1990 10:49:20.10
File ID (795,38,0)   End of file block 67 / Allocated 68

Virtual block number 38 (00000026), 512 (0200) bytes

 575616EB 0012B8F3 8B575604 EB163BE8 575602EB C08ED08C 57562EEB 0016B8F3 µ|..Š.VW.Å.âŠ.VWÒ;.Š.VW.µ|..Š.VW 000000
 7D80C18E D98C0714 3E8BD8BB 0002B8F3 8B575604 EB1623E8 575602E8 C08ED08C .Å.âŠ.VWÒ#.Š.VW.µ|...Ä.>...).ê.) 000020
 12EB0010 8B17EB00 0C8B1CEB 00088B21 EB0004BB FF39E95E 161EE856 057407FE ±.t.VÒ..^Ö9.É..Š!É..Š.É..Š.É..Š. 000040
 7D803974 07FE7D80 07143E8B 57560018 B803EB00 1CB808EB 00008B00 EB00148B É..Š.É..Š.É..Š.É..VW.>...)±.t9.) 000060
 18FB832F 731CFB83 087D8BFC 7D89FC75 8BC08ED8 8C07143E 890CEF83 2B7407F2 ·.t+.ÿ..>...Ä.â.u•.)•.)..«.s/.«. 000080
 C47407F2 7D8002C3 83CDEB15 81E802C3 83CB5E5F 5D049A97 FF040A26 89553E73 s>U.&Ö.....]_^ù.Û.ÒŸ.Šë.Û..)·.tá 0000A0
 CB5E5F5D 049697FF 04DA2689 550C0714 2E83F787 BFEB159C EB07143E 890CEF83 .ÿ..>..Ò..Š¢.%.....U.&Ö.....]_^ù 0000C0
 D0E3D0CB 9E5E5FE0 0AE4D0E8 D1410025 9F5D049A 97FF04DA 2689550C 07142E83 .....U.&Ö.....].%.AIÒÀÖ.Ä_^.ùÄDÀ 0000E0
 89FB2BFE 8B4E4E07 14368BFC C08ED88C 5756000C 8B03EBFF 320F02E7 D0FB8AE3 D.«ÀÖ.Ö2.Š.É..VW.Ä.â=.6..ÑN.±+«¿ 000100
 037407FE 7D800714 3E8B5756 EC8B55CB 5E5FF4E2 47471D8B FE448905 87AD0005 ..Ù...D±..GGã¶_^ùU.ŠVW.>...)±.t. 000120
 06C712EB 83B03330 040606C7 1CEB84B0 34300406 06C700CB 50E58B5E 5F1523E8 Ò#._^.|)ù.ú.ø.Ö4¯.Š.ú.ø.03¯.Š.ú. 000140
 C706758C 3C05921E FF047400 05943E83 8AB03031 040606C7 08EB81B0 31300406 ø.0T¯.Š.ú.ø.10¯..>...t.....<.u.ú 000160
 06F51D00 9A5000FD 8806ED1E FA9A04D2 BB03901C A69A04D8 A3E42A32 31040606 .ø.12*ÒÉÄ..Ì...£Ø..°.Ù.|».P...%. 000180
 025488OC 8BFC0714 3E8BC307 0A23129A 04D836FF 06FE1D00 9A50FFE4 050408A1 ÄÄ..Ö.P...±..6Ä...#..û.>..=...Ì. 0001A0
 00C2818F E68008D1 D9D1FAD1 D8D1D9D1 FAD1D8D1 D9D1FAD1 29747F80 C2F7C033 3ã%Ö..t)Ì°ÌÌÌÄÌ°ÌÌÌÄÌ°ÌÌÌÄ.Ì..Ö. 0001C0
 ADC88BAD FC07143E 8BEAEBD0 8AC88BC3 F78B0655 89044D89 02458900 0005C738 Bú....E..M..U..%û.â.ÀŠÖ.>..•Ü.âÜ 0001E0
```

Dump of file SATURN:[PCCOMMON.DUMP.DLL]PDMTAB.TMP;1 on 18-APR-1990 10:49:20.10
File ID (795,38,0)   End of file block 67 / Allocated 68

Virtual block number 39 (00000027), 512 (0200) bytes

```
B101CA80 0374CD0A D3D1E2D1 D3D1E2D1 D3D1E2D1 F88AADDC 8AF08AAD D48AC80A .à.ÀÙ.Þ.ÉÙ.½ìãì€ìãì€ìãì€.ët..ò.Ý 000000
15720777 D13AED01 E001E001 38723800 20307747 E03D7FF0 25E922EC 8AF90A80 ..'.$"Ö%Þ.=ÀGw=-.8r;ìÀìÀìÀ;ìw.r. 000020
E50AC70A 7FE78016 74C00817 747F8030 00800508 73000383 01C68010 7401C6F6 -ó.t..ó..€.s....=..t..êt..Ô..ú.Ì 000040
88D088DA 88D233C3 F78B0245 890589C0 33FED8E9 C3F78B05 89C68AE3 8A024589 .E..D.ó...%ûÕÜ±3â...E..%û3Ø.Ö.Å. 000060
00D8830A F7D8F707 79C008C3 88D088DA 8811EBDA F7157902 08D833D0 881DE8C3 ûŠ..À3Ü.Øy.%ÖŠ..Ö.Å.û.ây.%Ü%Ö.Ü. 000080
8811EBD9 F71579C9 08D833C8 881DE8C3 88C888DA 88D23304 74E99E84 8024C48A .á$.Ç.Õt.3Ø.Ö.à.ûŠ..à3Ü.èy.%)Š.. 0000A0
3AE807B5 E98560BD 0233FF33 8024C48A 00D88309 F7D8F707 79C008C3 88C888DA Ö.à.û.ây.%Ü%).Ü..ó$.3.3Ø§'.Õç.Ò: 0000C0
E800E800 9CE8C3C8 D1677500 D283C001 0026E803 E80035E8 08E8002B E800E800 .Š.Ò+.Š.Ò5.Š.Ò&.ìá.Ø.ugìàûÒ..Š.Ò 0000E0
03E8007B E808E800 2CE800E8 002CE8C3 4E75D208 0039E803 E8005DE8 08E8003E >.Š.Ò].Š.Ò9..ØuÑûÒ,.Š.Ò,.Š.Ò(.Š. 000100
C3CAD121 75000183 C2D100D1 83000283 F5D8F7D2 F7D1F700 79FF08C9 330041E8 ÒA.3è..y.%ì%Ø%À%.Ø..ì.ìó.ì.ulìòû 000120
E9E9C301 72000283 C3130B13 F581F980 CD0AE822 01B5DB33 001CE803 E80056E8 òV.Š.Ò..3Üç."Ò.ë.'.%.Ü.û.Ø.r.ûÒÕ 000140
D1E9017F E58010CE 80F1220F B6F98808 EE8391AD 91AD93AD D60A92AD 00A4E9FD »ÖÉ.Ü..øÜ.Ü.Ü..Ÿ..'Ñ."þ.ö..Ì.ìÒì 000160
F88AACDA 8AD2332F E825E983 CA7F20F9 83787203 FEE981D8 74C908E9 D1E9D1E9 ÕìÕìÕ.ètÄ.Õ±.rx.' .ò.Õ%Š/3Ø.Ö¨.½ 000180
47727EE9 804D74C9 08DCD0F9 D1D0E4D0 7FE183F9 88E98A04 EE83C186 ACC88AAD Ù.à¨.ê.Ÿ..Õ.'.Ã.ÀÕÀì'ÀÉ.ètM.Õ~rG 0001A0
C48AF88A DF8AD30A 01E28002 D0F501FA 801A7C08 F98009F7 20E98399 7F20F983 .' ...Õ %).'.|..'.%ÀØ.ã..€.Ö.½.á 0001C0
F3E20002 800AD00B D1D8D1EE D000DA80 018201FA 8015E3E1 E808E980 F632E68A .Ì2-.Ö.ŠÃD..'.ý..Ö.ÀŸìÀìÜÀÖ.Ø.ãµ 0001E0
```

Dump of file SATURN:[PCCOMMON.DUMP.DLL]PDMTAB.TMP;1 on 18-APR-1990 10:49:20.10
File ID (795,38,0)   End of file block 67 / Allocated 68

Virtual block number 40 (00000028), 512 (0200) bytes

```
14368B01 31E807B0 0068E8FD 35E9C300 88C03300 D18000B1 F9C3C38B D088CA8A .ò.Ã.ûû'Ÿ..Ì.3â.ÀûÕ5»Òh.¯.Ò1..6. 000000
03800087 E8FD0FE9 C3FE8806 7C89E073 7FF0FA81 7FE68007 8810EF83 067C0307 ..|..ÿ..■.Ì..'Þ.sÁ.|..±ûÕ.»Ò..¯. 000020
E8C3FE88 027C890F 737F80FA 817FE680 D7880080 EF81027C 03071436 880108E8 Ò...6...|..ÿ...■.Ì..'..sÒ.|..±ûÒ 000040
C3FE8802 7C010080 EF810714 36880053 E8C3FE88 067C0110 EF830714 3688001E ...6...ÿ..|..±ûÒS..6...ÿ...|..±û 000060
0FE183F9 88064C88 0010BA07 14368BC0 8EA5A5A5 A5C18ED9 8CC08C07 143E88FC •.>...å.).èÉÉÉ.â.6..¤...L..'.Ã. 000080
D9F7047D 0433E981 E901E9D1 E901E9D1 0035B87F E580CF88 F0E78306 4CB9CA0A .ò.L..ÓÞ.ü.Ì.¡5.ìÒìÒìÒìÒ.Ò3.).%) 0000A0
F988024C 880080BA 0714368B C08EA5A5 C18ED98C C08C0714 3E88FC00 82E93FEB Š?Õ..•.>...â.).èÉÉ.â.6..¤...L..' 0000C0
F7487D00 96E981ED 32C08AE1 D1001888 7FE580CF 8880E783 024C89CA 0A7FE183 .Ã..ò.L..Ó..ü.Ì.¡..ìÃ.ë2Ú.Õ..)H% 0000E0
08F98002 33EA2880 00E581EF 88C8880A 74C838FA 088000E7 81147CEF 88C83809 );à.ÿ|..Ó...';àt..à.ÿ.Ì..+õ3Ø.'. 000100
D7C18A04 DCB80CE3 348AE7EB 4608E980 0004C614 0A000280 0082F501 FA80147C |..'.Åý..Ø...ó...Õ.FŠÒ.4D.ÉÉ..ê■ 000120
22D70AFA E2D7D0EA D106E3E1 8AEF8A00 018BC334 8AD188C9 33C32C88 E822EE8A .Ÿ"Ò.,û3è.Ì.4ûÉ...ÿ.ÃD.ìõÂ■ã'.■" 000140
3488F202 CE28C803 9807140E 88E203CC 8AFD8802 74000A80 018281FA 80030ADE 8.€.'.ý..Õ.t..».à€ã......à+ö.·.4 000160
26024488 C3E4D07F CC80F8C8 E9C3F5D3 D14C747F 80C3F7C3 FAE20014 804606E3 D.F...ã'ü%û..tLì€%ûÕà«.ë.ÀÕû.D.& 000180
78EF32EC 8AD874D3 F77F80C3 F7D3F7E2 74D0F77F 80A9D0F7 E1747F80 A9025D88 .].`..tÃ%À`..%Àtã%€%û..%€tÀ.š2ÿx 0001A0
7FF0C3F7 C3053826 04880575 C338DA8E C18ED98C C28CF787 930873E0 D1E301D5 ìÌDìÀs...%.ô.).ê.Ö;ûu...&;.ü%ûÞ. 0001C0
7FF0A9D0 F7E1747F F0A9065D 88260644 88C3E4D0 7FCC80FB 75E9C3F5 D3015E74 t^ì€%ûÕu«.ë.ÀÕû.D.&.].`Þ.tÃ%À`Þ. 0001E0
```

Dump of file SATURN:[PCCOMMON.DUMP.DLL]PDMTAB.TMP;1 on 18-APR-1990 10:49:20.10
File ID (795,38,0)   End of file block 67 / Allocated 68

Virtual block number 41 (00000029), 512 (0200) bytes

```
8CC28CF7 87930B73 E0D1E3D1 0578EF32 EC8AD874 D3F77FF0 C3F7D3F7 E274D0F7 %Àtã%€%ûÞ.%€tÃ.š2ÿx(ìDìÀs...%.ô. 000000
05382604 88057502 45382602 448B0E75 04453826 04448817 75C338DA 8EC18ED9 ).ê.Ö;ûu..D.&;E.u..D.&;E.u...&;. 000020
7488FF7C 88024C88 80CF8000 82358A01 50880245 8803E880 F4800245 88F787C3 û.%.E..¶.Š..E..]..5ÿ..ü..L..|..t 000040
E52A91FA 87F38705 73EC3A58 74E40A65 74ED0AC0 D1C1D180 00CE81FF 00E78101 ..Ó...ö..ìèìâ.Üte.ôt[:šs..µ.'.*Ì 000060
01CB8003 74D20B12 7C0EF980 55E300B5 CD8A91D9 D0E800C9 D0497718 FCB0DCF6 -É.•.wIÀèÀÒÀ)..ëç.DU.'.|..Øt..ù. 000080
80FD8ADF 8AF38AD6 8A01CE80 0374D20A 2B7E05F9 803E741D 7210E980 DB33038B .€3Ü.Õ.r.t>.'.~+.Øt..ö..ø.µ.Ô.». 0000A0
03743FC2 F60097E9 E800C18B D78BDE8B 19E8F875 C1FED3D1 E2D12374 177708E9 Õ.w.t#ìãì€±èu%Š..ß.■.ëÀÒÕ..-õ?t. 0000C0
FEDAD10B D150730E 13D70314 70E00020 CA800374 3FC2F6FA E2DAD1EB D120CA80 .ò ìŠìÕã'-õ?t..ò ÀÀp..■.ßsPìÜìÕ± 0000E0
750B08D0 F6000383 F5DAF7D3 F70A730E 88D788F3 18FA2BFA 41E94575 FFFC80C4 á.•.uEÕÀ'+'.µ.■.ßs.%€%Õ%.€.-Ã.Üu 000100
78FF0AD2 32F28ADE 8AFB8A5B 7608EC80 0F75FF0A 6474D808 DA876A76 10EC800B ..š.vj.Ö.Ütd..u..š.v[.«.ß.·2Ø..x 000120
7401C6F6 14720777 80FA8001 7CE90374 0004E43E 80F671D3 01E2014B 74CCFE0A .±ätKìãì€q¬.>ò..t.Ò|..'.w.r.~ó.t 000140
C70A7FE7 80802417 747F80A9 D8D1E000 3A74FFFC 80C4FE07 73000383 01C6800F ..ó..€.s.±á.•.t:ÀÀìÀ`..t.$..Ô..ú 000160
07143E8B C033017E E9037400 04E43E80 C3F78B05 89C68AE3 8A024589 07143E8B .>...E..D.ó...%û.>ò..t.Õ~.3ã.>.. 000180
D0E1D102 4D88D674 E40AD8D0 E0D19634 88ADFCF9 9DE9E679 C3F78B05 89024589 .E....%ûy|Ö.'=Ü.4.ìÀÀÃ.ôtø.M.ìÃÀ 0001A0
FF3250CD 74FFFC80 80C48003 70E5027F ED8080EC 80C132D8 883D88C8 74ED0AD9 ).Ütû.=.À2ê.š..Ü..Ìp€.á..■.tëP2. 0001C0
88FA8800 D2830803 E7F7C588 509FC00B DA88E7F7 C688E888 80C98080 CB80EF8A .ÿ.ù..è..Š.ó%Ò.Ö.â.P.é%Ó.Ã.Ø..'. 0001E0
```

Dump of file SATURN:[PCCOMMON.DUMP.DLL]PDMTAB.TMP;1 on 18-APR-1990 10:49:20.10
File ID (795,38,0) End of file block 67 / Allocated 68

Virtual block number 42 (0000002A), 512 (0200) bytes

```
D3D1E2D1 0B78FF0A 5893038B C703E1F6 C58B01CB 8003749E 58FA13D8 03E6F7C1 è%|.Ä.*X.t..ù..é—Ã.ú.Æ.X..x.ìãiÆ 000000
D0E00102 4488D900 E1D1024D 8BF787FF 1AE9AD74 FFFC80C4 FEFF69E9 0A75E40A .ðu.Õi.±á.=.tÚÖ...¥.M.iÃÃ1.D.ìÃÃ 000020
0375FFFC 8080C480 FF7BE903 71E52A7F ED8081EC 80C132DB 74E40A5C 74ED0AD8 Ä.Üt\.ðtÜ2è.$..Ú.*lq.Õ(..á..=.u. 000040
01548B50 04E43E02 D901EBD1 08740004 E43E8080 CF80C932 2D8A015D 8BFF78E9 Õx..]..-2è.ü..>ð..t.ìŠì].>ð.P.T. 000060
76E90D88 01CA8003 74D688C2 0B0011E8 EE8B001A E8D801EA D180CE80 C032248A .$2â.ö.ìÕ1AÕ...ŸÕ...ô.øt..ò..ìÕv 000080
C1034E07 73D78BFA 1BD8F7E1 F7C68BFA 8B15E3C0 3396F3F7 1D73D33B F880E9FF .Õ¯½;Æs.¥µ.3àD..*.ó%Ã%Ã.*.ms.N.è 0000A0
ED800774 ED0A04E6 2E8A0004 E406C6C3 ED73C188 D003C128 FFFFBEC3 F9730313 .Æs*Ú/..+è.Ã.èsÚüó.ð....|..Üt..Ü 0000C0
585B5AFE 4EE8DB32 D2335253 5004E707 1406C707 1436FF38 74E40A3C 77EC3A0E .:šw<.ðt8.6..ú...Ó.PSR3ø2ÜÖN±Z[X 0000E0
E4A20233 DB33C033 FE33E907 14068F58 5B5AFE0F E8FF3252 535004EB 071406C7 ú...Š.PSR2.Õ.±Z[X....Õ3±3à3Ü3øÃõ 000100
066D8BF7 87D3EB04 E9A304E7 A3C033FE 1AEB5253 5004EB07 1406C707 1436FF04 ..6..ú...Š.PSRÕ.±3âEÕ.EÕ.ŠÆ.¥.m. 000120
C3FE8B07 14368BAB E60A80E6 807FE480 ADA5A5A5 07143E8B F78B1DEB 8000F581 .¥..Š..¥.>..EEEU.ð..|..|¨.6...±Ü 000140
D68695F7 870977E8 3BE0E583 D274FFE0 250AD0E0 D1ED00E5 D1064488 FC066D88 .m.=.D.ììÃBìÃÃÖXÃ.tø.ìÃ;Ów..¥..ø 000160
F888E086 C001C001 C00157DD D1E2D000 D1E6D0B9 7706A03D D8F7C52B C274C008 .âtõ+é¥Ã=..w¿Ãììì Ãããììwìâìâìâ.Ã.½ 000180
C9800374 D20B187C 0EFF8363 74FF0B10 CC800FE4 80AD93AD 91AD92C0 32E08AAC ¯.Ã2â.Ù.Ù.Ù.Õ..ä...tc...|..øt..è 0001A0
D68A01CE 800374D2 0A2B7C06 FF832372 4874E777 10EF83C0 33D888C8 8BD18B01 ..1.ù.Ã3â.ÿ.wÕtHr#...|+.øt..ö..ø 0001C0
F57547D0 D1D3D1D1 D1E2D123 740F7708 EF83E432 C48AF88A DF8AEB8A C08AF18A .þ.ë.Š.Õ.½.â2õ.ÿ.w.t#ìãììÆìÃGu¥ 0001E0
```

Dump of file SATURN:[PCCOMMON.DUMP.DLL]PDMTAB.TMP;1 on 18-APR-1990 10:49:20.10
File ID (795,38,0) End of file block 67 / Allocated 68

Virtual block number 43 (0000002B), 512 (0200) bytes

```
8003743F C2F6975E CF87F6E2 DAD1DFD1 DBD1E8D1 20CA8003 743FC2F6 CF8716E8 Š..ü–ó?t..ò ìÕìÜìÕìÕã–.ü^.–ó?t.. 000000
1000CE81 0FFFE681 05748B50 9F50035C 13014C13 3402D800 E5D13B70 E5D120CA ò ìlp;ììÃÃ.4.L..\.P.P.t..ì...ö.. 000020
88E9F6EC E90375E0 FD8320C5 830AD1D9 D1DBD1DF D1137420 00C7F7FE 13589E58 X.X.±¥ú. t.ìÕìÜììðìÕ.é .»Ãu.Õš–Õ. 000040
1373FE1B 9E1000CE 810FFFE6 819F0574 8B035C1B 014C1B34 2AD0F608 D0E5D100 .ììÃÃ–Ã*4.L..\..t...ì...ö....±s. 000060
1375E0C7 F61875FF 0B0004BE FCFE13DE 13CE13F5 DAF7D1F7 D3F7D7F7 D0F6F633 3––Ã¥ø¥Æ¥ì¥Õ¥.ö.ß.±ø/....u.–úÃu. 000080
97277601 00ED8118 751FE0C7 F7E4EBD2 33CA8BD9 8BFB8B3D 744E4076 0200ED81 .Ú..vøNt=.«.1.ð3øŠÕ¼úÃ.u..Ú..v'. 0000A0
D1D1E2D1 717420ED 83127510 00C7F797 0082F28A CE8AE98A DD8AFB8A C78AE08A .Ã.ú.«.ì.Õ.ö.·ÿ..¥ú..u..Ü tqìãìì 0000C0
1A7401C6 F61F7207 7780FA80 0385E903 740004FC 3E80FC90 65EBEBEB D7D1D3D1 ìÆì=ŠŠŠe.=.>=..t.Õ...*.w.r.–ó.t. 0000E0
07143E8B F78B3074 E0FD8320 C5830874 2000C7F7 00078300 D3830001 8301C680 .ó..ì..Æ..=.¥ú. t..é .»ÃtÕ.¥.>.. 000100
8BABC18B AAC68A05 5D880645 89C70AC5 0BC032E0 862274ED D10FE780 8024DE87 .ß$..Õ.ìÜt".Ã2â.é.ú.E..]..ó¨.è¨. 000120
F78B0714 3E8BC033 0377E903 740004FC 3E80FCF5 FDE90379 C3F78B05 EF83ABC6 ó¨.ÿ..¥ûy.Õ»¥=.>=..t.Õw.3â.>...¥ 000140
D1E0D1D0 747FF0E1 81D13306 4D8BDB74 7FF02500 8B064488 FCC3FE8B ABABABAB ¨¨¨¨.±ü=.D..Ã¥þ.tÜ.M.3ì.Ãþ.tÃìÃì 000160
CA800374 0181E850 D8D1E6D0 B674FFE0 30800005 BC70C103 7FE0E981 80002DE1 Ã–...ÕÃ..èp¥...=Ã.tÑÃììÃPÒ..t..ò 000180
E0FD8320 C58393E8 0A75ED0B D7D1D3D1 D1D1E2D1 0E751000 C7F7D8D0 E5D15D01 .]ììÃÃ¥ú..u.ìãììÆìa.Úu.Š..é .»Ã 0001A0
9B747FF0 25D03306 4488EF74 7FF0E181 D18B0640 8BFCF787 F58CE9FF 24E98874 t.Õ$.Õ.¥.¥=.M..ì.Ãþ.tÿ.D.3Ã¥þ.t. 0001C0
32E88AAC 50D8D1E6 D09B74FF E0308000 059B70C1 2B7FE0E9 81802020 E1D1E001 ìÃìÃ- ..ÕÃ.+ép....=Ã.t.ÃììÃP¯.Õ2 0001E0
```

Dump of file SATURN:[PCCOMMON.DUMP.DLL]PDMTAB.TMP;1 on 18-APR-1990 10:49:20.10
File ID (795,38,0) End of file block 67 / Allocated 68

Virtual block number 44 (0000002C), 512 (0200) bytes

```
A5AB10CC 800FE480 ADFD04FA BF05C683 F78B5092 10CC800F E480AD92 AD93ADC9 èÜ.Ü.Ü.Õ..ä..P.¥.6.e*.»Ü.Õ..ä.¨E 000000
D1AB04FC 2602E8D1 E88BADF7 8B04FABF FD1F7400 04FC3E80 0005C6FC A44746A5 EFGÊ=6...>=..t.»e*..¥Ü.Õìõ.&=.¨ì 000020
E8570038 E857003F E8D9D1DB D1D8D1EA D158FCAB D8D1ADAB D8D1ADAB D8D1ADED ÜÜìÃ¨ÜìÃ¨ÜìÃ¨=XìõìÃìÜìì07.WÕ;.WÕ 000040
EFD108CA 80037407 C2F601CA 8003745F 5B590788 C208C10B C30B0033 E8570037 7.WÕ3..û.è.ô.øY[ t..ò.–ô.t..ô.ìÿ 000060
3BFF3304 FA3688FF 08E9DAD1 D9D1DBD1 EFD1DAD1 D9D1DBD1 EFD1DAD1 D9D1DBD1 ìÜììììÕìÿìÜììììÕìÿÏÜììììÕÕ...6*.3.; 000080
A150F28B E7F70474 C00B04F4 A1F58BED 339752F6 F73B77F0 3B0475D2 085C73D6 øs\.øu.;Þw;¥–R.3Ú.¥Ã¶..ât.¥Õ.·PÃ 0000A0
CE1BDAF7 5A9200D2 83E803E7 F70874C0 0B04F8A1 EA13F003 E7F70674 C00B04F6 –..ât.¥Õ.Þ.õÃ½..ât.¥Õ.Õ.ø..Z¥Õ.ö 0000C0
4FC3ED73 04FA1613 04F80613 04F61E13 04F40E03 4F137393 919295E8 185DD01B .Ì].Ò....s.O..¶...–...½...*.sÜÜO 0000E0
06448AC9 EBF504F4 168BC213 04F81E13 04F60E03 04F8061B 04F61E1B 04F40E2B +.¶...–...½...–...½..ô..¶.¥Šè.D. 000100
08E3008B 911AE30C 8BEB88DB 3304F2A3 100C0F24 06458A04 F0A3100C 0F24E432 2ð$...Èþ..E.$...È·.3Ü.Š..D....D. 000120
8B0E74C0 0B02448B ED3355DA 13C803E2 F70674D2 0B02558B 048BCA8B E88BE1F7 ¥Ã.Ò.ð...U..øt.¥ã.à.ÕU3Ü.D..ât.. 000140
F70674D2 0B02558B 0074C00B 02448B50 C10B5805 D1DA13C8 03E2F708 74D20B15 ..øt.¥ã.à.ÕììX.èP.D..ât..U..øt.¥ 000160
0B04448B D1D1EA13 D803E2F7 0874D20B 04558B0F 74C00B04 8BC933EA 13D803E2 ã.Ã.õ3è...ât..U..øt.¥ã.Ã.õìì.D.. 000180
04F226F7 0874C00B 048B50C3 08580001 83EA13D8 03E2F709 74D20B15 8B0F74C0 ât....øt.¥ã.Ã.õ.ì.X.ÚP...ât.¥Æ·. 0001A0
D20B0455 8B0F74C0 0B02448B DB33CA13 E80304F0 26F70874 C00B058B CA13E803 .Ò.ò...ât.¥&Þ..Ò.õ3Ü.D..ât..U..ø 0001C0
D383CA13 E803E2F7 0974D20B 02558B10 74C00B04 44B80301 CA13E803 E2F70874 t.¥ã.Ò.òìÆ.D..ât..U..øt.¥ã.Ò.ò.Æ 0001E0
```

Dump of file SATURN:[PCCOMMON.DUMP.DLL]PDMTAB.TMP;1 on 18-APR-1990 10:49:20.10
File ID (795,38,0)   End of file block 67 / Allocated 68

Virtual block number 45 (0000002D), 512 (0200) bytes

C80304F2 26F70874 C00B0244 88DA13C8 0304F026 F70874C0 0B02458B ED335500 .U3Ú.E..åt.¼&Þ..à.Ö.D..åt.¼&·..à 000000
0304F226 F7044488 05D1DA13 C803E2F7 0874D208 0455881A 74C00804 4488DA13 .Ö.D..åt..U..@t.¼ã.à.Öíí.D.¼&·.. 000020
D1E2D15A 97C50304 F226F604 F0A0EA13 D80304F0 26F70874 C00B0445 88EA13D8 Å.ö.E..åt.¼&Þ..Å.ö.Þ.-&·..é.Zíãí 000040
36880004 FC06C6C3 F60B5ED7 D1D3D1D1 D1E2D1D7 D1D3D1D1 D1E2D1D7 D1D3D1D1 ííÆí¤íãííí Æí¤íãíííÆí¤^.-ü6.•...6 000060
53525150 04FF0714 06C70714 36FF4C74 ED0B5077 F53804C0 EE810874 F60B04FD ».·-t..Ÿâ.;¼wP.ÚtL.6..ú.....PQRS 000080
E8FF3357 55535251 50050707 1406C758 595A585D 5FFC3EE8 0233C933 0B335755 UW3Ü3è3@Ò>•_][ZYXú.....PQRSUW3.Ò 0000A0
36FF04FC A2FF33ED 33DB33D2 33C933C0 33FC1AE9 0714068F 58595A58 505FF8D1 Ì«_][ZYX....Ö.•3ä3è3@3Ü3ú3.Å•..6 0000C0
56EC8B55 C6EBABAB ABABC033 04FFBFFB FBE85755 53525150 05070714 06C70714 ..Ü.....PQRSUWÒ½«¢..3ä¨¨¨¨Š6U.§V 0000E0
8B5E5F0D 8940C980 05730A76 3B000B5B 06C60028 E8010B5B 06C60E56 8B0B3357 W3Ü.V.6.[..Ò(.6.[..;v.s..è@.._^. 000100
F9830A4E 8BC08ED8 8CFCCB50 E58B5E5F 0006E80E 5E8BD233 5756EC8B 55CB5DE5 Í]ÙU.§VW3@.^.Ò.._^.Í]Ù•.Ä.å.N..• 000120
010C468B 06768905 22BE0A4E 8BD88EA4 F30522BF 0676C527 EBF63340 81067664 dv.Ÿa3-Š'év.¢".µË.Ä.N.ƒ"..v..F.. 000140
C78B065D 89044589 02758900 8905108F 0A760306 7628500A E2E85505 188F064E N.¢..UÒã.]+v..v.¢.....u..E..]..ú 000160
26065E8B 0C740103 8587F608 8898078A 26065EC4 565704EC 83EC8B55 00C30A8C .Öü.U.§.§.WVá^.&....Ä-....t..^.& 000180
8587F608 8898058A 2647F88B 16740065 3D98078A 26065E8B 07EB0020 0598078A .... .Š..^.&...=e.t..«G&....Ä-.. 0001A0
078A2606 5E8B2E07 C6260646 FFF08898 078A2606 5EC40846 8C067E89 F2750403 ..u·.~..F.á^.&....Þ.F.&6...^.&.. 0001C0
06EC83EC 8B55CB5D E58B5F5E FC7E89E9 75C00A06 46FFF78B 078826C6 8BF88B98 ..½.6&...¼.F..âuÖ.~•^_.Í]ÙU.§.§. 0001E0

Dump of file SATURN:[PCCOMMON.DUMP.DLL]PDMTAB.TMP;1 on 18-APR-1990 10:49:20.10
File ID (795,38,0)   End of file block 67 / Allocated 68

Virtual block number 46 (0000002E), 512 (0200) bytes

0646FFDF 8B08468C 067E89F3 75003D80 26470774 2E3D8026 9008EB06 7EC45657 WVá~.Š..&.=.t.G&.=.uµ.~..F..Ö.F. 000000
89ED7500 3D802647 0774453D 80260D74 65308026 900EEB06 7E8B6774 003F8026 &.?.tg.~.Š..&.=et.&.=Et.G&.=.uÜ. 000020
89F97430 3D80264F 9002EB06 7E8BFE56 89FC4689 064EFFC2 8CC78B08 468C067E ~..F..ú.ö.N..F•.V±.~.Š..O&.=Ot'. 000040
078826AC 065EC406 46FFFC76 C5FA5E8C 064EFF03 752E3F80 260F8B08 468C067E ~..F..Ô&.?.u..N..^'év•.F.á^.¯&.. 000060
1606014A 9A0DFA1E 8DEC8B55 90CB5DE5 8B5F5EFA 5E8EFE5E 8CFC7689 F275C00A .åu·.v•.^±.^'^_.Í]ù.U.Š..'..J... 000080
565708EC 83EC8B55 CB5DC02B CB5D0001 B8057216 2F05CA9A 1608012A 9A065EC4 á^..*....Þ./.r¯¡..]ù+å]ÙU.Š.Š.WV 0000A0
A5A5DA8E 1EF08BFB 8B085EC4 04C48316 5300289A 0C76FF0E 76FF2474 00067E83 .~..t$.v..v..(.S..á.á^..«.Þ..ÖEE 0000C0
1E0716F0 8BF87E8D 04C48316 6D00289A 0C76FF0E 76FF90CB 5DE5885F 5E1FA5A5 EE.^_.Í]ù..v..v..(.m..á..~½.Þ... 0000E0
8B5590CB 5DE5885F 5E16E902 9D9A085E C4167501 4A9AF85E 8D1FA5A5 A5A5DA8E .ÖEEËE..^½.J.u.á^....Ö.^_.Í]ù.U. 000100
3F8326F8 5EC4FA56 89F84689 15081688 1506A147 7400058C 3E805657 0AEC83EC &.Š.WV.>...tGÀ.......F½.V̄'á^½&.? 000120
E80001B8 067E000E 7E83FE56 89FC4689 0C568B0A 4603C02B 02EB0001 B805752D -u.¡..Š.+å.F..V..F•.V±.~..~.¡..Š 000140
260477FF 260677FF 26065EC4 58EB06C4 83045DE8 0EFC76FF FE76FF50 C02B9003 ..+åP.v±.v•.Ò]..á.ŠXá^.&.w.&.w.& 000160
7E000E7E 8350400E 46885052 FA5689F8 468908C4 8317271F 149A37FF 260277FF .w.&.7...'..á..F½.V'RP.F.@P.~..~ 000180
880A4603 C703C02B 02EB0001 B805752D 3F8326F8 8BF85EC4 C02802EB 0001B805 .¡..Š.+åá^½.½&.?-u.¡..Š.+å.ú.F.. 0001A0
752D3F83 26F85EC4 FE5689FC 46890C56 8B0A4688 0AC48317 811D6C9A 50520C56 V.RP.l....á..F..V..F•.V±á^½&.?-u 0001C0
5E8BFC46 FF078826 01478A26 FC5EC414 7E000E7E 832D07C6 26FC46FF FC5EC40A .á^•.F•&6.-.~..~.á^•&.G.&...F•.^ 0001E0

Dump of file SATURN:[PCCOMMON.DUMP.DLL]PDMTAB.TMP;1 on 18-APR-1990 10:49:20.10
File ID (795,38,0)   End of file block 67 / Allocated 68

Virtual block number 47 (0000002F), 512 (0200) bytes

369A5052 FE568BFC 46030E46 0308F7C0 1801058C 3E80501E 0586882E 07C626FC •&6..¡...P.>....å¼Ä.F..F•.V±k┌.6 000000
26F85EC4 FC46FF45 07C626FC 5EC40774 00107E83 FE5689FC 468908C4 8318BB1D .E..á..F•.V±.~..t.á^•&6.E.F•á^½& 000020
C626FC5E C4F08BD8 F70870F6 08F08848 02478826 F85EC45E 74303F80 26065FC4 á_.&.?0t^á^½&.G.H.Þ.-}.¼Ä.Þá^•&6 000040
FFF288F9 F799C68B 070026FC 5EC4F9F7 00648999 C68B157C 64FE83FC 46FF2007 .¯.F•.±d|..6.¿d.¼'á^•&...6.¼'.·. 000060
C4FC46FF F288F9F7 99C68807 0026FC5E C4F9F700 0A8999C6 8B157C0A FE83FC46 F•.±.|..6.¿..¼'á^•&...6.¼'.·.F•á 000080
FF01058C 06C604EC 83EC8B55 90CB5DE5 885F5E0C 56880A46 88070026 C68BFC5E ^•.6&...F..V.^_.Í]ù.U.Š.Š.6..... 0000A0
00058C06 C6FE5689 FC4689FE 49E80E06 76FF0876 FF0A76FF 0C76FF0E 76FF1076 v..v..v..v..v.¯v..ÒI±.F•.V±6.... 0000C0
89F44689 15081688 1506A151 7400058C 3E8000F2 46C612EC 83EC8B55 CB5DE58B .Í]ÙU.Š.Š.6F·..>...tQÀ.......F¶. 0000E0
8EA1FE56 89FC4689 0C56880A 4603C02B 02EB0001 B805752D 3F8326F4 5EC4F656 V-á^¶&.?-u.¡..Š.+å.F..V..F•.V±À. 000100
EE5E8B30 07C626EE 46FFEE5E C4F05689 EE468905 8E0603FC 46886A75 0E463905 .9F.uj.F•.....FŸ.VÞá^Ÿ.FŸ&6.0.^Ÿ 000120
08C48318 EB1F149A 37FF2602 77FF2604 77FF2606 77FF2606 5EC44AEB 0007C626 &6..ŠJá^.&.w.&.w.&.w.&.7...Š..6. 000140
C02B02EB 0001B805 75203F83 26500E46 0302478B 26F45EC4 5052F656 89F44689 .F¶.V-RPá^¶&.G..F.P&.?-u.¡..Š.+å 000160
26F45EC4 FE5689FC 46890C56 8B0A4688 0AC48307 131D6C9A 50520C56 8B0A4603 .F..V.RP.l....á..F..V..F•.V±á^¶& 000180
FE76FF50 0001B81D 7F00027F 8326F45E C42007C6 26FC46FF FC5EC40A 752D3F83 .?-u.á^•.F•&6.-á^¶&......¡..P.v± 0001A0
FC460102 47B826F4 5EC40AEB 3007C626 FC46FFFC 5EC406C4 830205E8 0EFC76FF .v•.Ò...á.á^•.F•&6.0Š.á^¶&.G..F• 0001C0
07C626FC 46FFFC5E C406C483 01D8E80E FC76FFFE 76FF5000 01B8687E 000E7E83 .~..~h¡..P.v±.v•.ÒÄ..á.á^•.F•&6. 0001E0

```
Dump of file SATURN:[PCCOMMON.DUMP.DLL]PDMTAB.TMP;1 on 18-APR-1990 10:49:20.10
File ID (795,38,0)   End of file block 67 / Allocated 68

Virtual block number 48 (00000030), 512 (0200) bytes

 D8F70247 8B260EEB D8F70247 8B260874 00058C3E 80437D00 027F8326 F45EC42E .á^¶&....)C.>...t.&.G.%ÄŠ.&.G.%Ä 000000
 50003088 0E76FF06 C4830196 E80EFC76 FFFE76FF 500E4689 0E468B03 7E0E463B ;F.-..F..F.P.v±.v=.Ò...ó..v.|0.P 000020
 06C604EC 83EC8855 CB50E58B 0C568B0A 468B08C4 831A0200 7E9AFC76 FFFE76FF .v±.v=.-....á..F..V..[]ùU.š.š.ó. 000040
 058C06C6 FE5689FC 4689FE6E E80E0676 FF0876FF 0A76FF0C 76FF0E76 FF01058C ....v..v..v..v..v..Òn±.F=.V±ó... 000060
 9A37FF26 0277FF26 0477FF26 0677FF26 065EC456 06EC83EC 885590CB 5DE58B00 ..[]ù.U.š.š.Vá^.&.w.&.w.&.w.&.7. 000080
 06752D3F 8326058E A3480247 8B261506 1EC41508 16891506 A308C483 1A3E1F14 ..>..ó.È......á...&.G.HÈ..&.7-u. 0000A0
 1B3E1D6C 9A50520E 76FF5306 FE5689FC 46890C56 8B0A4603 C02B9003 EB0001B8 |..Š..+â.F..V..F=.V±.S.v.RP.(.>. 0000C0
 83058E36 890590A2 C02A02EB 01B0047D 058E3639 4E02778B 2615061E C40AC483 .ó.ó...&.w.N96..).¯.Š.*âÅ...6... 0000E0
 93E80E06 76FF0876 FF0A76FF 0C76FF0E 76FF1076 FF1F7F0E 4639C68B 077CFCFE ±=|..69F....v..v..v..v..v..v..Ò. 000100
 7689F975 00FF7C80 46FC76C5 FA5E8C1E 74000590 3E8090C8 5DE58B5E 0CC483FD ».á.^.[]ù..>...t..^*év=F.|..u'.v 000120
 E80E0676 FF0876FF 0A76FF0C 76FF0E76 FF00FE47 C626FC5E C4FA5E8E FE5E8CFC =.^±.^*á^=&óG±..v..v..v..v..v..Ò 000140
 FF1076FF 1276FF19 75450E7E 83067465 0E7E83EC 8855C85D E58B5E0A C483FEF6 -±.ó.^.[]ùU.š.~.et..-.Eu..v..v.. 000160
 76FF0C76 FF1076FF 1875660E 7E839035 EBFB8FE8 0E0676FF 0876FF0A 76FF0C76 v..v..v..v..Ò.«Š5..~.fu..v..v..v 000180
 FF0876FF 0A76FF0C 76FF1076 FF1276FF CB500AC4 83FD39E8 0E0676FF 0876FF0A ..v..v..Ò9».á.]ù.v..v..v..v..v.. 0001A0
 1B590010 9A0676FF 0876FF29 74000A7E 83EC8855 90CB500C C483FEC0 E80E0676 v..Òâ±.á.]ù.U.š.-..t).v..v....Y. 0001C0
 CB500AC4 8315FE1E 309A5052 08568B06 46030A46 8B0676FF 0876FF50 4004C483 .á.@P.v..v..F..F..V.RP.0.±..á.]ù 0001E0
```

```
Dump of file SATURN:[PCCOMMON.DUMP.DLL]PDMTAB.TMP;1 on 18-APR-1990 10:49:20.10
File ID (795,38,0)   End of file block 67 / Allocated 68

Virtual block number 49 (00000031), 512 (0200) bytes

 8905920E 8908EB05 A4071406 C7087412 7703FB83 D88E1EEC 8B554590 D88CC88B .à.Ä.EU.š..Ä.«.w.t.ú...Ê.Š...... 000000
 8CC08C05 968FF38B CBF3F60C B305A42D 0714A1CB 4D5D1FE5 8B02ED83 F8059416 ...½.Ú..[.]MùÅ..-Ê.*.-µù.µ¢...â. 000020
 A5A5A5A5 FCD88EC1 8ED98CC0 8C0596BF F38BC305 96BED98E A5A5FCD8 8EC18ED9 ).è.Ä=ÊÊ.)ƒ..ù.µ¢...â.).è.Ä=ÊÊÊÊ 000040
 80C2F702 548B0C8B C033FCFC 758B03EB 07FE45C6 FC7D89FC 758BC305 96BED98E .)ƒ..ù.u=.)=óE±.Š..u==3â...T.%ô. 000060
 8FE68004 4D890245 89D8D109 D1FAD1D8 D1D9D1FA D1D8D1D9 D1FAD105 8925747F .t%..î*]]ÎÄ]*]]ÎÄ]*]]ÎÄ.E..M..]. 000080
 00FFFF9A 5016C48B 50EC8B55 C3064589 04458902 45890589 C3065589 3800C281 .ô.8.U.ù...E..E..E.ùU.šP.ó.P.... 0000A0
 B819A923 6C9A0642 E80021E8 0000FFFF 9A071668 1E071868 1E0B8AA3 E0865800 .X.ÂÈ...h...h.......Ò!.ÒB..(#`.¡ 0000C0
 068EFF33 000D8B1E 071E16FF 00FF681C 4A1D009A 1C301CA6 9A50C85D E58B0001 ...[]ùP.[.=....J.h.......£. 3... 0000E0
 330874CA 8BA6F3CB 8BD18B0B 22BE3174 003D8026 47017500 3D80267F FFB90718 ..¿..&.=.u.G&.=.t1/"..[.ùµ[.`+.3 000100
 C20A0572 412CAC92 04E0C00E 72412CAC 0B918F1F F78B071E 061CEBE7 74AEF2C0 â·ÙtÓŠ.....¥.¢..¯,Ar.âÅ..¯,Ar..ô 000120
 00FF8808 301EFF04 74000B32 3E831C4F 1D009A50 00FCB8EC 8B5500C3 1FEDEBAA ¯ŠÚ.Ù.U.š¡=.P...O..>2..t...0.¡.. 000140
 BE06568B C08ED88E FFFF8857 56EC8855 FF76E900 028BC85D E5881CB0 1D009A50 P...¯..[]ù¡..Õv.U.šVW¡...Ä.â.V.ƒ 000160
 0002CA5D E58B5E5F 96E8EBF7 8BAEF2FF FFB9C033 970C7496 401074C2 3BAD0E0A ..Ù;ôt.@.t..3â¿..·Ù.¼ŠŠ._^.[]ò.. 000180
 C48B5049 D1F7AEF2 FFFFB9C0 33FA8892 1F74C008 1CC41CD0 9A0676FF 57EC8855 U.šW.v..Å.á..ât...*3â¿..¯ÙÅiIP.á 0001A0
 76C51EDE 8BD78BEC 8B550002 CA50E58B 5F5B0000 FFFF9A50 1651521E 530002B8 £..S.RQ.P.....[_.[]ò..U.š.=.B.év 0001C0
 13A5F3E9 D149A402 7401A8C7 8B067EC4 D1F7AEF2 FFFFB9C0 33C08ED8 8CFE8B0A ..±.Ä.â3â¿..·ÙÅÏá-..ú´.t.ÊIiÕµÊ. 0001E0
```

```
Dump of file SATURN:[PCCOMMON.DUMP.DLL]PDMTAB.TMP;1 on 18-APR-1990 10:49:20.10
File ID (795,38,0)   End of file block 67 / Allocated 68

Virtual block number 50 (00000032), 512 (0200) bytes

 5EC4FA56 89F84689 08568B06 46885657 00000AC8 CB50C28C 1FFA88F3 8BA4F3C9 èµÊ.µ.*..ó]ùâ...WV.F..V..F½.V*á^ 000000
 882E7E00 0A7E8330 07C626F8 46FFF85E C4FE5689 FC468908 578B2606 478B260C .&.G.&.W..F=.V±á^½.F½&ó.0.-..-.. 000020
 E2460488 30809003 EB078A26 FC46FF09 74003F80 26FC5EC4 F876C5F6 5E8C0A4E N..^-év½á^=&.?.t..F=&..Š..¯0..Fã 000040
 3F8026FC 5EC4287C 000A7E83 0007C626 F85EC40A 4E89F65E 8EFA5E8C F87689E7 Ó.v½.^*.^-.N.á^½&ó...~..|(á^=&.? 000060
 260F8BFA 468CF87E 89F57439 3D80264F 3005C626 9006EBF8 7EC4F84E FF1F7C35 5|..N½á-½Š..&ó.0O&.=9t%.-½.F*.Ó& 000080
 76FF5250 52400856 88064688 15EB0247 FF260C5E C4097531 3F802606 5EC407FE ±.á^.&.?1u.á^.&.G.Š..F..V.@RPR.v 0000A0
 56571E00 85E90375 C90B0E4E 8BEC8855 000090C8 C95F5E08 C4831D0A 1D369A06 ..ó....á.^_èù...U.š.N..èu.Õç..WV 0000C0
 F1034950 73000A83 C1285778 D2080E4E 881E2425 D89A5706 561E067E C40A76C5 év.á-..V.W¯Ä%$..N..ØxW+è.Ö.sPI.þ 0000E0
 C703C323 DB18C72B 48C18841 C08E1E65 05C08C07 73F90308 8E00B105 D88C0773 s..Ä.Ý..Ä.*s..â.e..âA.êH+ú.Ù#ù.ú 000100
 83D88E1E 702D088C 0775FFFE 835CE391 FCA4F3FD C1289140 C603C323 DB18C628 +ó.Ù#ù.ó@.+è»µÊ=.D\.±.u..Ä-p..Ä. 000120
 D2F7D68B C203C323 DB18C228 D2F7D78B 48C188C8 EBC08E1E 982DC08C D175FFFF ..u!.ã-...âŠâ.êH.=%Ø+ó.Ù#ù.ó.ø¼Ø 000140
 1EA705D8 8C0775F6 0B18E391 A4F3C913 A5F3E9D1 C1289140 C203C323 DB18C228 +ó.Ù#ù.ó@.+èîÕµÊ.èµÊ.D..-u..Ä.Ï. 000160
 578DE42A 078ACB5D 08568B06 46881F5F 5E8EE8C0 8E1EDE05 C08CC775 FF08D88E .Ä..uú.â.B..âŠƒ^_..F..V.)ù..*Ö.W 000180
 768DC08E D88CFC57 56EC8855 CB5B0000 1D2A9A53 1650521E 510002B9 DC8B5301 .S.É¿..Q.RP.S.*..¯(ùU.šVW=.Ä.â.v 0001A0
 AA91A4F3 919BACC8 880B468F 5D0748E8 550B3E8E A536A536 A536A536 0B3E8F06 .«>.6É6É6É6Éƒ>.UÒH.]«F..à¯..µÊ.^ 0001C0
 58CB50E5 885E5FC7 88DA8C08 5D8C0B46 0645C704 4D890255 891D89FF 320B348F «4.2....U..M.ùÉ.F..]..Ö.ú_^.[]ùX 0001E0
```

```
Dump of file SATURN:[PCCOMMON.DUMP.DLL]PDMTAB.TMP;1 on 18-APR-1990 10:49:20.10
File ID (795,38,0)   End of file block 67 / Allocated 68

Virtual block number 51 (00000033), 512 (0200) bytes

 88E17202 0CE8D833 0B681E89 00ACE90B 330185E8 EF88FF33 D78B40C9 8030C980 .è0.èa.m3..ÿò..3ÜÕ¯...h.3ι...rÄ. 000000
 72D888C5 03C475D2 0B0B682E F7C388EA 88F8880B 6826F7C7 8850E072 0205E8F8 ½ò..rÁP.ú¼&h..½.õ.ú¼.h..®u∟ ⁵.Är 000020
 A3C0330B 6C16890B 6AA30B60 0E89CE03 085E3E89 FCB5E8D8 73000383 F80358BE ƒX.½.Æ.sÄŠç•.>^..ö..'.Êj...l.3âÈ 000040
 4E417401 FDE8D833 00E7E89F 75D80880 CD800375 01ADE891 0B66A30B 62A30B64 d.Èb.Èf..ÒÙ.u..ë..Ùu.ÒÓ.3Ùò».tAN 000060
 03EB0402 C9814E27 7502742D 3C067428 3C317400 085B3E80 1274453C 1C74443C <Dt.<Et..>[..t1<+t.<-t.u'N.è..Š. 000080
 D8F70275 9E5840C9 80037502 C5F6008B E8509F01 6CE84600 00086A06 C70EC980 .è.ú.j...FÒl..PÒ..-é.u..èaX.u.¼Ù 0000A0
 086C3E28 047510C5 F60B663E 03F80330 C9800374 1872C1F7 0675FF08 086A3E88 .>j...u.¼èr.t..è0.«.>f.-é.u.+>l. 0000C0
 6EA13875 5E5901AC E80087C 06C6085E 3E880893 E80B728E 5156507F 0190FF81 .....PVQƒr.Ò...>^.ó.|..Ò¯.Y^uBÀn 0000E0
 643E8380 074D8004 747FF006 45F70003 83F5D8F7 D3F71374 80C5F60B 701E8808 ...p.-é.t.¼Æ¼Ä¼.Æ.¼E.Þ.t..M...>d 000100
 6806C63F FF8BC301 C980C302 CD800375 0008643E 83087C2E 8A08C980 0376070B ..v..è...|..>d..u..ë.û.è.ûE.?6.h 000120
 33C3DFEB DE78D803 E3D1E3D1 C303E3D1 02CD80ED 770CCCF8 81177200 E4E80A0B ..Òð.r..«ä.wÙ.ë.1Ð.ûiÐiÐ.Äx8ŠÒû3 000140
 1999FF81 00D78300 05830003 83D00358 008AE850 28720006 E8D788DF 88EF88FF ..ÿ.Ò.mÒø.r(PÒ..X.Å.Æ..í..m..... 000160
 C7F61675 08660608 C508C788 EEEB0866 06FF01CA 800374C0 0A007200 88E8E572 rÍÒE.r..ât..ò...f.ŠŸ.ú.é..f.u.-ú 000180
 1E89086E 168920C9 8010C980 06E80575 D2080975 8000F881 0F7480C5 F6177480 .t.-é.t..«..u..®u.Š..è..è ..n... 0001A0
 FF080040 88F1EB08 660EFF00 25E80973 1999FF81 1C74C20B C308C50B C7880870 p..ú.é.û.ôt.....s.ÒX...f.Šþ¡a... 0001C0
 E8C28853 5557C35E AB92AB96 AB95AB93 A8920872 8FF78856 F6E8002A E8480678 x.HÒ*.Š-V.¼«r..¨.¨.¨.¨^ûWUS.ôÒ 0001E0

Dump of file SATURN:[PCCOMMON.DUMP.DLL]PDMTAB.TMP;1 on 18-APR-1990 10:49:20.10
File ID (795,38,0)   End of file block 67 / Allocated 68

Virtual block number 52 (00000034), 512 (0200) bytes

 2D3C0874 005EE8C3 D7D10501 D3D1E201 F81358E8 13580813 58D00300 0BE8000E ..Ò...ÃX.ÃX.ÒX.½iâìÆííiaûÒ^.t.<- 000000
 1DEB397D 0B68063A 072C027E 093C4572 302C4A74 004EE8C3 4E460175 2B3C0674 t.<+u.FNÛÒN.tJ,OrE<.~.,.:.h.)9Š. 000020
 6406FF08 CD800866 0EFF0E74 10C5F626 77093C2A 72302C20 742E3C33 740037E8 Ò7.t3<.t ,Or*<.w&-é.t...f..ë...d 000040
 23730860 3638C3F9 4EC9E810 CD800862 06FF0975 10C5F6F4 EB20C080 C3E4320B .2ôû.ë Š¶-é.u...b..ë.ŠèN'û;6'.s# 000060
 02777A3C 0672613C E274003C E6740A3C EA74093C EE74203C 10740008 5A3E80AC ¯.>Z..t.< tŸ<.tõ<.tÌ<.tã<ar.<zw. 000080
 E7D13E78 03FE05AD 4974C20B C10BC50B F88BAD95 AD91AD92 AD57C3C0 32C35F24 $ ûZäÙMÙ.Ù.Ù.Ù.½.é.è.ôtlÙ.±.x>iÒ 0000A0
 FA81F633 D30AD922 43F075CB FED7D0D0 D1D7D1D5 D1D1D1E2 D10005BB 0FD1E8D1 1ÕiÒE..iäiiííiaiÄÅa±ûubC"1.Æ3-.' 0000C0
 0B7C0E80 0FEB0007 80F57FF0 300E74FF F0A90007 80C613FE 13EE13CE 13F58001 ..¾.ö.Ÿ.±.6.m.`Þ.t.=Þ.¾.m.Š...|. 0000E0
 520002BB C3FF0A06 45890475 89026089 00895FF7 88F888E8 88C888D8 88C03301 .3ä.Ä.à.Ò.½.¾_...m..u..E...ûE..R 000100
 07740001 3D408112 7558C00B 0000FFFF 9A521650 1653C488 50870891 A780048B .å.I..ñP.áS.P¯R......áXu.Ÿa=..t. 000120
 EA1EFFD8 33C28C00 EE06C41E E300EC0E 885AD479 4808918F 08088106 7500023D =..u.Ÿ.....KyåZ..Š.D.á.Ÿ..ó3Ù..õ 000140
 8F00E4BE 007CE800 F68F00F6 BE00EA1E FF00038B C28C00F2 06C4FA04 E9037300 .s.Õ.*á.·..õE....õ.ƒ-.€-.Ò|.ƒõ.€ 000160
 F68ED088E 1CD688C3 0000FFFF 9A22F968 0E016A0B 740DF63D 00F68800 73E800E8 Ò.Òs.¡-.=-.t.j..h*"......ûi#..Äƒ- 000180
 F68E003A E8150A8F 150A8EEC 88550000 22F49A00 6A006A03 6A0051E8 0DF68F00 .€-.ÒQ.j.j.j..¶"..U.šƒ..€..Ò:.ƒ- 0001A0
 C033001A E80DF68F 00F68E00 23E800F6 8F00F68E EC885503 E80031E8 0DF68F00 .€-.Ò1.Š.U.šƒ-.€-.Ò#.ƒ-.€-.Ò..3â 0001C0
 8B04EF83 0E73F73B C300EA1E FF0002BB 07E300EC 0E880000 FFFF9A50 06468A50 P.F.P.......š.D.Ê....õ.û;¾s..ÿ.. 0001E0

Dump of file SATURN:[PCCOMMON.DUMP.DLL]PDMTAB.TMP;1 on 18-APR-1990 10:49:20.10
File ID (795,38,0)   End of file block 67 / Allocated 68

Virtual block number 53 (00000035), 512 (0200) bytes

 8B00F0E9 03750718 3639FF28 F62B5657 000014C8 00C3EEE8 1DFFF274 02450B05 ..E.t·..ŠŸû.à...WV+-+.96..u.ðÞ.. 000000
 259C9A08 22681EF6 76FFF876 FF0C6AF8 5689F646 89F25689 F04689C0 28071816 ...+â.FÞ.V·.F-.V½j..v½.v-.h"...¾ 000020
 47EA7500 3F8026F6 46FFF65E C4008CE9 03767FFF FE814619 74C0080A C48323E0 Á#.á..ât.F.±..v.Õ¥.á^-.F-&.?.uõG 000040
 25449A04 6A500145 8D8A7500 3F8026F6 5E88F475 003F8026 F646FFF6 5EC40CEB Š.á^-.F-&.?.u¶.^-&.?.u¤.E.Pj..D¾ 000060
 EE460BEC 4688FE56 89FC4689 02C48324 2524899A 56EE5689 EC468904 C48323EF ÿ#.á..FŠ.VŸV..$¾$.á..F•.V±.FŠ.FŸ 000080
 681EF076 FFF276FF 0C6A0099 16890097 A3EE5688 EC468866 74C208FC 46886074 tm.F•.ôtf.FŠ.VŸÈ......j..v·.vÞ.h 0000A0
 46830257 89260789 26FE5688 FC4688EC 5EC42C74 C0080AC4 831E4D25 9C9A0822 "...¾M..á..ât,á^Š.F=.V±&..&.W..F 0000C0
 F046FFF0 5EC4E8EB 0E74C00A 078826FC 46FFFC5E C4078A26 F046FFF0 5EC404EC Š.á^Þ.FÞ&..á^=.F=&...ât.ŠÒá^Þ.FÞ 0000E0
 0574C30B C08C065E C4EC8855 90C8C95F 5EA77500 3F8026F0 5EC4F475 003F8026 &.?.u¶á^Þ&.?.uÏ^_èû.U.Šá^..á.ût. 000100
 08750000 DA3E831E 73FFF130 06468857 5602EC83 EC8855CB 5DE58801 FE4F8026 &.O±..Í]ûU.Š.Š.VŴ.F.=Þ.s..>Ö..u. 000120
 8323A029 189A0676 FF087500 78E80574 0018E815 750082E8 000AA312 740025E8 Ò¾.t.ÈÖ.Ò..u.Ò..t.Òx.u..v...).#. 000140
 8D50501E C033FE5E 89FEE383 43065E8B 0776065E 3900F08B C85DE588 5E5F02C4 á._^.Í]ûEÞ.9^.v..^.C.D±.^±3â.PP. 000160
 05740208 00DEA300 DC1687C2 8B3874FF FA8308C4 83248D2A C49A5002 B0510E4F O.Õ¯.P.á*§$.á..*.t8.ô..Ê.Ê8..®t. 000180
 01478D00 02A30000 A3000AB8 0C478948 480008A3 C033D88E FE5E8800 08A30A8E .ÖÈ...^±.Ä3âÈ..HH.G.|..È...È...G. 0001A0
 8CD20804 24E800DE 1E8ED833 064E88C0 8ED88CC3 1FD88C00 06A30000 05000AA3 È.....È...Ä.û.Ä.á.N.3Ù..8.Ò$..®. 0001C0
 C2F7FA56 89F84689 2571287A 9A0676FF 006A0876 FF006A56 00000AC8 C3D98EC1 é.Ìûà...Vj..v.j..v..z+q¾.F½.V*¼ô 0001E0
```

```
Dump of file SATURN:[PCCOMMON.DUMP.DLL]PDMTAB.TMP;1 on 18-APR-1990 10:49:20.10
File ID (795,38,0)   End of file block 67 / Allocated 68

Virtual block number 54 (00000036), 512 (0200) bytes

 1274D00B FE5689FC 468902C4 83258A24 899A56F8 768B902F EB99C02B 0674FFFF ..t.+â.Š/..vHV..$.%.6..F=.V±.Àt. 000000
 57EC8B55 90CBC95E FE568BFC 468B9007 E808C483 24E9007E 9A50FE76 FF006A56 Vj..v±P.-.ÕS.á.Š...F=.V±^èù.U.šW 000020
 FF448AA6 F30A76C5 FE8BCB03 D9F7AEF2 C033F78B 067EC409 8B27E30E 4E8B1E56 V..N.D'.1á-..%3â·Ù%].ù.±év.µ].D. 000040
 56880646 8BEC8B55 00CB5DE5 8C5F5E1F C18BD1F7 49490474 0477FF45 3A26C933 3è&:E.w.t.II%Ì.ê.^_.[]ù.U.š.F..V 000060
 2509478A 2E09648A 56530008 CA5DE588 D31B0A46 2BEBD3EA D3FFFFB9 0C5E8B08 ..^.¿..ÃõÄ$+F..Æ.[]ò..SV.d...G.% 000080
 56C35B5E F3E1073B 2E048B72 EB8302EE 83000589 0AC3830A C6831675 C43A8080 ..:áu..6..ù.¿...Y..Š....:.Äµ^[ùV 0000A0
 F500013D D0D1E3D1 F4E2DFD1 DDD1DAD1 DBD1E8D1 0005B9FF 33AD93AD 92AD95AD Ù.Ù.Ù.Ù3.¿..ÎÒÌÜÌÒÌÎÌÒâ¶ÌDÌÀ=..% 0000C0
 CD0000FF FFFFFFFF FFFC66C3 08448906 5C890454 89026C89 3C895E03 FE2DBBD1 1Ù-±.^.<.[..T..\..D.ùf=........ë 0000E0
 C08ED88C 06C3075B 40D08BC0 33300144 C60104C6 0DAEBEFF FDCCCCCC CCCCCCCC ââââââ».ƒÛ.6..6D.03â.Âa[.ù..Ä.â 000100
 2D830279 C90B0674 7FF0C1F7 20B37F07 6480064C 8B5EA5F3 0004B957 0DA2BFFC =¢Â.V¿..µÊ^.L..d..° %èÞ.t..èy.°- 000120
 E4F64D80 91E2F74D 10BAC8B8 3FFE05AD F88A8B74 80A8AC00 A98EFF33 FF7BE853 SÒ(.3./`.¯`.tÉ.%Ù.±7.ào.M%ä.¯M-ð 000140
 2655B802 04E800A2 BEDFF757 1343DF81 12F4E981 FA13C803 E7F69AB0 D713C803 .à.=¯-Ó.a.°.Ó¶..ÒC.W%Ó/À.Ò..EU& 000160
 C033F78B D9F791AD 93AD92AD 95AD97AD 575F008D E8265FBB 57470972 5FFF13E8 Ò.. r.GWE_ÀÒ.._WÙ.Ù.Ù.Ù.Ù.%].%3â 000180
 10B900AF BFD913D1 13E91303 9AD68156 C480F4E2 DCD0DED1 DDD1DAD1 EBD10CE3 D.[ŠÌÒÌÌÌÑÂÉâ¶_áV.ø...Ò.Ì.Ìé€.¿. 0001A0
 D003D1D2 D1D5D1D6 D1E4D000 D003D1D2 D1D5D1D6 D1E4D050 56555253 51C03200 .2âQSRUVPÂÒiøiÌÌØÌÆÀÀÂÒiøiÌÌØÌÆÀ 0001C0
 3004D000 D3D1D2D1 D5D1D6D1 E4D00014 D9135901 1359E913 59F11359 E5025900 ÀY.ÌY.þY.ÒY.ÌY.].ÀÒiøiÌÌØÌÆÀÀ.0 0001E0

Dump of file SATURN:[PCCOMMON.DUMP.DLL]PDMTAB.TMP;1 on 18-APR-1990 10:49:20.10
File ID (795,38,0)   End of file block 67 / Allocated 68

Virtual block number 55 (00000037), 512 (0200) bytes

 08B900C0 B0C3075B 5A0001B8 0C880DAE BE12C183 FCAEF3FD 30B0494F BDE259AA ˆYã§OI¯0»µÛ=.ê./Û...¡..Z[.û§â.¿. 000000
 0404D8F6 C42AC42A E022C728 0004B800 07BF0844 01084788 2EABF3C0 33FD8B00 ..»3âµ¨..G..D.¢..¡..+ú"Å*6*6... 000020
 0256113E 0046013E 27F72E04 8B06C683 F72BF103 08C383DF 2BD92B56 53C88B98 ..àSV+)+Ô.ū..þ+%.6....%'>.F.>.V. 000040
 ADC80BAD 91ADF587 0EED83BC 754F02C5 83585EE6 E202C383 02EE8300 0456833E >.V...Y..ū.ã|^[.é.Ou¥.Ù..%Ù.Ù.àÙ 000060
 D3D1D1D1 D7D1E2D1 084CFF0D 78C00BF5 8BAD93AD 91AD97AD D10A92AD CD0AC80B .à.ëÙ..ÌÙ.Ù.Ù.Ù.%.àx..L.Ìãìøììì Æ 000080
 0BCD0108 6C01D5D1 C5130D13 CD13FD13 F58001FA 81ED33D5 0BEF2300 01B0D001 ÌÀ§..#ÿ.Ì3Ú.°..%.».ë.Ï.éÌÌ.l.Ìë. 0000A0
 07C80000 00000000 000004A0 00000000 000000C3 06448904 5C89024C 893C89C5 é.<.L..\..D.Û.....................à. 0000C0
 9E00368E 18C9BF04 00000000 1B8EBC20 00000000 00000E9C 40000000 00000000 ........@......... ¥ƒ......¢è..6.. 0000E0
 F9DE8E01 AA93BA47 C980E98C E000D5C2 781F49FF CFA6D500 689DC5AD A82B70B5 çp+¯Ùé.k.Ì]ü.Ì.xôÌ.Â.Õ.èGα.¯..ß° 000100
 58E21965 2CFFFAA3 D70A3D70 A3070AFF FDCCCCCC CCCCCCCC CD0353AA 7EE8FB9D .«Š-¯S.ëäââââââ»..aÊp=.aÊ°.,e.ãX 000120
 B11EAD45 3994BAFF CBE69594 BEC44DE1 5BFFE6AB CC771184 61CEFDFF F3D18717 .ñÌµ.»öa..wä¨].(ÃMá/..Ìù.α.9EÙ.Ý 000140
 AEC03143 25637A19 3AFE57DD D0467C64 BCE4A1FF 2CA87FEA 27A539E9 A5FF96CF ü..ÉÒ9É'õ.´,.Àõ¥d|FÀÏW±:.zc%C1âÛ 000160
 FE7BE857 53F573EF D10D74FF 0B0AC383 0AE883DF F72887B8 0579FF0B 282DB8FC =£-(..y.É.(%Ô.$..ù...t.ÌÿS%SWÒ(± 000180
 0D0DBB57 56EC8B55 CB5DE58B 01FE4F80 0474DB08 065EB8EC 885500C3 ECEB5B5F _[ŠŠù.U.š.^..Ùt..O±..[]ùW.ŠVWEÀ. 0001A0
 04C79600 D2A300D0 A3FE2440 24EB99C0 33057501 76E80005 B8071E29 75003F83 ¯.?.u)..¡..Òv.u.3â.$$a$±ÉÀ.È0..ú. 0001C0
 D0E9CB5D E58B5E5F 0009E8C0 8ED88C06 4E8B00D6 3689FFFE FE44C704 C6830001 ...6.úD±±..6ø..N..Ä.âÒ.._^.[]ùÒÀ 0001E0

Dump of file SATURN:[PCCOMMON.DUMP.DLL]PDMTAB.TMP;1 on 18-APR-1990 10:49:20.10
File ID (795,38,0)   End of file block 67 / Allocated 68

Virtual block number 56 (00000038), 512 (0200) bytes

 F003008B 1573C13B 48437401 A8FE88AD FC027788 F273EEF9 83FEE180 FA744100 .At°.Ã±.°Ýs·.w.=Ù.±´.tCH;ês..Â.Þ 000000
 E8058948 C12BFE4C 89F9030C 74FE8BE6 E8FE4489 F78B0002 05C20335 7401A8AD Ù´.t5.ô....%.D±Š|.±t..°.L±+êH..Š 000020
 020DE206 C626C302 7F890DDE 1E8C2605 74D13B22 FAB9DA8C C68BFE4C FEF90305 ..°±L±.6.Õ¿°";|t.&..ß....ù&6.ã.. 000040
 C203E274 01A8ADF0 03D08B8C 73C13B48 FE8BF274 01A8ADF0 03FE8B25 74FFFE3D =±.t%.±.ÞÙ´.t·.±H;ês¥.Â.ÞÙ´.tã.õ 000060
 A8BFD88C 127400E2 0EFE2615 E8D88E04 74C00B08 478BE6E8 FE4489F7 8B000205 ....%.D±Š|.G..ât..ÄŠ.&±.ã.t..Ä¢¨ 000080
 E8984040 01240074 C63B0068 E8C03306 778B8BEB 378B0DDA 1E8E2605 74C73B29 );út.&..Ö..7ŠÉ.w.3âÒk.;ót.$.aa.Ò 0000A0
 078B000E A3260474 C13B29FF B9D88C98 EB4E4E96 0574001D E8FE4DFE 0074005F _.t.±M±Ò..t..NN$..Ä¿.);ēt.&ÈB... 0000C0
 EAD10476 00E01638 267FFFBA 414149C8 2B037401 A8FE458B 51C399C0 33024789 ¯G.3â.úQ.E±´.t.+àIAAα..&;.Â.v.ìõ 0000E0
 59C033E5 75EAD1D2 F7087500 0CE8C62B C22302F7 0D72C203 1572C603 C18BF575 u%.ė.ór..ôr.%0#ô+6Ò..u.%0ìõu|3âY 000100
 58FE5589 4AD72BD6 8B067789 FFFEFE44 C7F203F0 8BFE8B57 18740010 E85152C3 ùROÒ..t.W.±.Þ.·úD±±..w..ø+=J.U±X 000120
 745B5A1F FFFA8308 C4832556 2AC49A1F 06500001 B8505252 1ED23350 53C35A59 YZûSP30.RRP¦..P...á*V%.6..°..Z[t 000140
 720057E8 07754806 46B80856 8B0720BF 3875000A 7E830657 56EC8B55 C3D20B02 ..0ùW.šVW..-..u8¢ ..V..F.Hu.ÒW.r 000160
 FE8104C6 8334735E 003EE856 0E468902 44880074 F73B1174 480B2036 8B4CEB27 'ŠL.6 .Ht.;%t..D..F.VÒ>.^s4.6..± 000180
 C085F95B 0000FFFF 9A50C033 501652C4 8B5021E8 99FFFF88 0675D20B 04730B20 .s..0u.¦...Š!P.áR.P3âP.....[°.â 0001A0
 0C74024C 39F78B0E 4E8BCB5D E58B5E5F 07C03303 8B082036 89025C89 1489E675 ul...\..6 ..Æ3â._^.[]ù.N..%9L.t. 0001C0
 1373071A 1E390675 F73BC18E D3882672 1C030A88 2CEBF9F2 750B20FE 8104C683 .6..± .u·°Š,.Ö..r&.Æ.ē;%u.9...s. 0001E0
```

```
Dump of file SATURN:[PCCOMMON.DUMP.DLL]PDMTAB.TMP;1 on 18-APR-1990 10:49:20.10
File ID (795,38,0)   End of file block 67 / Allocated 68

Virtual block number 57 (00000039), 512 (0200) bytes

 08468BEC 885500C3 D18B0487 92071A16 890475F7 3BDE75C0 850000FF FF9A5153 SQ......âuß;%u.........Iü.U.$.F. 000000
 030C66F7 06468BC8 8BE3F700 08CA5DE5 8BE3F706 46880B75 0A5E8BD8 080C5E8B .^..Ä.^.u..F.%D.Í]ò..%D.à.F.%f.. 000020
 02000700 03230E01 03000500 03234601 03000C08 CA5DE588 D103E3F7 06468BC8 à.F.%D.Í.Í]ò.....F#.......#..... 000040
 03002600 03286301 03002200 03281801 03000000 0A2A3400 02000000 082AB400 .Ç*......4*.......+.."...c+..&.. 000060
 03005800 031C3001 03008800 031EE901 05008700 0325E501 05004D00 03229001 ..".M...ÍX......Õ.......0...(.. 000080
 54206E75 5220534D 00000000 00000000 0000C000 071F0E02 03005C00 031C1D01 .....\.......à..........MS Run-T 0000A0
 38383931 20296328 20746867 69727970 6F43202D 20797261 7262694C 20656D69 ime Library - Copyright (c) 1988 0000C0
 50414C56 4F544255 5300454D 414E0011 70726F43 2074666F 736F7263 694D202C , Microsoft Corp..NAME.SUBTOVLAP 0000E0
 414D4E45 47004D52 4F4E0054 43455445 44484600 54494645 4E454252 45494800 .HIERBENEFIT.FKDETECT.NORM.GENMA 000100
 0042404F 43005345 52425553 00534552 4E454700 48435441 4D425553 00484354 TCH.SUBMATCH.GENRES.SUBRES.COMB. 000120
 00505845 544E4500 4E494D54 4E450045 43414C50 544E4500 54455350 504F5250 PROPPSET.ENTPLACE.ENTMIN.ENTEXP. 000140
 00454352 554F5300 534C4C55 4E005554 52470054 43505752 47005841 4D544E45 ENTMAX.GRWPCT.GRTU.NULLS.SOURCE. 000160
 41484300 4E494D52 41484300 45505954 52414843 0058414D 54455350 00504F4C LOP.PSETMAX.CHARTYPE.CHARMIN.CHA 000180
 4140544E 49005058 45544E49 004E494D 544E4900 47564152 41484300 58414D52 RMAX.CHARAVG.INTMIN.INTEXP.INTMA 0001A0
 4B46574F 48530058 414D4C41 45520050 58454C41 4552004E 494D4C41 45520058 X.REALMIN.REALEXP.REALMAX.SHOWFK 0001C0
 4E455454 414C4600 50455354 524F504D 49005254 54414B46 4E454700 52545441 ATTR.GENFKATTR.IMPORTSEP.FLATTEN 0001E0
```

```
Dump of file SATURN:[PCCOMMON.DUMP.DLL]PDMTAB.TMP;1 on 18-APR-1990 10:49:20.10
File ID (795,38,0)   End of file block 67 / Allocated 68

Virtual block number 58 (0000003A), 512 (0200) bytes

 01D60000 44455A49 4C414954 494E4900 444E4F4D 41494454 45535000 52454948 HIER.PSETDIAMOND.INITIALIZED..ø. 000000
 031E0000 00000190 02C60000 00000188 02760000 00000180 02260000 00000178 x.....&.......v.......ó......... 000020
 044E0000 000001B0 04060000 000001A8 03BE0000 000001A0 03760000 00000198 ......v.......ƒ.´.......¯.....N. 000040
 05860000 000001D0 05360000 000001C8 04E60000 000001C0 049E0000 000001B8 ¡.......å.....Í.à.....6.Å....... 000060
 06B60000 000001F0 066E0000 000001E8 06160000 000001E0 05CE0000 000001D8 Ä.....ö.Å.......Ò.....n.Þ.....Ñ. 000080
 07BA0000 00000210 07800000 00000208 07460000 00000200 06FE0000 000001F8 %.....±.......F..............¤. 0000A0
 09030000 00000230 08820000 00000228 08530000 00000220 08020000 00000218 ........ .....S.(.....ý.0....... 0000C0
 0A4C0000 00000250 09ED0000 00000248 09900000 00000240 093F0000 00000238 8.....?.ə.......H.....Ú.P.....L. 0000E0
 0B5F0000 00000270 0B230000 00000268 0AE70000 00000260 0AAB0000 00000258 X.....¨.'.....Ó.h.....#.p....._. 000100
 0D160000 00000290 0C130000 00000288 0BD70000 00000280 0B9B0000 00000278 x.............■................. 000120
 11220000 000002B0 101F0000 000002A8 0F1C0000 000002A0 0E190000 00000298 ..............´.......¯.....". 000140
 15FD0000 000002D0 14B50000 000002C8 136D0000 000002C0 12250000 000002B8 ¡.....X.å.....m.à.....ç.Å.....». 000160
 00302E30 00300030 00300000 0000FFFF 188D0000 000002E0 17450000 000002D8 Ä.....E.Á.............Ô.0.0.0.0. 000180
 00069756 00059755 00049754 00039753 00029752 00019751 00302E30 00302E30 0.0.0.0.Q...R...S...T...U...V... 0001A0
 000E975E 000D975D 000C975C 000B975B 000A975A 00099759 00089758 00079757 W...X...Y...Z...[...\...]...^... 0001C0
 00159766 00249765 00149764 00139763 00129762 00119761 00109760 000F975F _...'...a...b...c...d...e.$.f... 0001E0
```

```
Dump of file SATURN:[PCCOMMON.DUMP.DLL]PDMTAB.TMP;1 on 18-APR-1990 10:49:20.10
File ID (795,38,0)   End of file block 67 / Allocated 68

Virtual block number 59 (0000003B), 512 (0200) bytes

 001D976E 001C976D 001B976C 001A976B 0019976A 00189769 00179768 00169767 g...h...i...j...k...l...m...n... 000000
 28282020 20202020 20202000 00209773 00239772 001F9771 001E9770 0022976F o.".p...q...r.#.s. ..         (( 000020
 10101010 10101010 10104820 20202020 20202020 20202020 20202020 20282828 (((              H.......... 000040
 01010101 81818181 81811010 10101010 10848484 84848484 84848410 10101010 ................................ 000060
 02020202 82828282 82821010 10101010 01010101 01010101 01010101 01010101 ................................ 000080
 00000000 00000000 00000020 10101010 02020202 02020202 02020202 02020202 ..................... .......... 0000A0
 00000000 00000000 00000000 00000000 00000000 00000000 00000000 00000000 ................................ 0000C0
 00000000 00000000 00000000 00000000 00000000 00000000 00000000 00000000 ................................ 0000E0
 00000000 00000000 00000000 00000000 00000000 00000000 00000000 00000000 ................................ 000100
 16180488 155AFFFF 1ACA0000 00000000 00000000 00000000 00000000 00000000 ....................ð...Z..... 000120
 0D91112A 009310C7 00000E9B 0BA10E9D 0BA30EC0 0BAB0494 15F40490 14E4048C ..Õ...¶...¨.å.È...À.....ú...*... 000140
 00000000 04C61CCA 04C21CCA 04BE1CCA 04BA1CCA 0DE61CCA 0000B4F 0AFC1128 (.▪.O...ð.Ì.ð.¤.ð.ƒ.ð.ð.ð.c..... 000160
 00000000 00000000 00000000 80C0E0F0 FBFCFEFF 00000000 78783136 40050101 ...M61xx.....±▪½Þåã............ 000180
 00000000 00000000 00000000 00000000 00000000 00000000 00000000 00000000 ................................ 0001A0
 00000000 00000000 00000000 00000000 00000000 00000000 00000000 00000000 ................................ 0001C0
 00000000 00000000 00000000 00000000 00000000 00000000 00000000 00000000 ................................ 0001E0
```

```
Dump of file SATURN:[PCCOMMON.DUMP.DLL]PDMTAB.TMP;1 on 18-APR-1990 10:49:20.10
File ID (795,38,0)   End of file block 67 / Allocated 68

Virtual block number 60 (0000003C), 512 (0200) bytes

00000000 00000000 00000000 00000000 00000000 00000000 00000000 00000000 ................................ 000000
00000000 00303030 2B650000 00000000 00000000 00000000 00000000 00000000 ......................e+000..... 000020
00000000 00000000 00000000 00000000 00000000 00000000 00000000 00000000 ................................ 000040
00000000 00000000 00000000 00000000 00000000 00000000 00000000 00000000 ................................ 000060
00000000 00000000 00000000 00000000 00000000 00000000 00000000 00000000 ................................ 000080
00000000 00000000 00000000 00000000 00000000 00000000 00000000 00000000 ................................ 0000A0
00000000 00000000 00000000 00000000 00000000 00000000 00000000 00000000 ................................ 0000C0
00000000 00000000 00000000 00000000 00000000 00000000 00000000 00000000 ................................ 0000E0
00000000 00000000 00000000 00000000 00000000 00000000 00000000 00000000 ................................ 000100
00000000 00000000 00000000 00000000 00000000 00000000 00000000 00000000 ................................ 000120
00000000 00000000 00000000 00000000 00000000 00000000 00000000 00000000 ................................ 000140
00000000 00000000 00000000 00000000 00000000 00000000 00000000 00000000 ................................ 000160
00000000 00000000 00000000 00000000 00000000 00000000 00000000 00000000 ................................ 000180
00000000 00000000 00000000 00000000 00000000 00000000 00000000 00000000 ................................ 0001A0
00000000 00000000 00000000 FFFF1510 23291510 15100000 000005A4 00000000 ....É.........)#................ 0001C0
00000000 00000000 00000000 00000000 00000000 00000000 00000000 00000000 ................................ 0001E0

Dump of file SATURN:[PCCOMMON.DUMP.DLL]PDMTAB.TMP;1 on 18-APR-1990 10:49:20.10
File ID (795,38,0)   End of file block 67 / Allocated 68

Virtual block number 61 (0000003D), 512 (0200) bytes

00000000 00000000 00000000 00000000 00000000 00000000 00000000 00000000 ................................ 000000
00000000 00000000 00000000 00000000 00000000 00000000 00000000 00000000 ................................ 000020
00000000 00000000 00000000 00000000 00000000 00000000 00000000 00000000 ................................ 000040
00000000 00000000 00000000 00000000 00000000 00000000 00000000 00000000 ................................ 000060
00000000 00000000 00000000 00000000 00000000 00000000 00000000 00000000 ................................ 000080
00000000 00000000 00000000 00000000 00000000 00000000 00000000 00000000 ................................ 0000A0
00000000 00000000 00000000 00000000 00000000 00000000 00000000 00000000 ................................ 0000C0
00000000 00000000 00000000 00000000 00000000 00000000 00000000 00000000 ................................ 0000E0
00000000 00000000 00000000 00000000 00000000 00000000 00000000 00000000 ................................ 000100
00000000 00000000 00000000 00000000 00000000 00000000 00000000 00000000 ................................ 000120
00000000 00000000 00000000 00000000 00000000 00000000 00000000 00000000 ................................ 000140
00000000 00000000 00000000 00000000 00000000 00000000 00000000 00000000 ................................ 000160
00000000 00000000 00000000 00000000 00000000 00000000 00000000 00000000 ................................ 000180
00000000 00000000 00000000 00000000 00000000 00000000 00000000 00000000 ................................ 0001A0
00000000 00000000 00000000 00000000 00000000 00000000 00000000 00000000 ................................ 0001C0
00000000 00000000 00000000 00000000 00000000 00000000 00000000 00000000 ................................ 0001E0

Dump of file SATURN:[PCCOMMON.DUMP.DLL]PDMTAB.TMP;1 on 18-APR-1990 10:49:20.10
File ID (795,38,0)   End of file block 67 / Allocated 68

Virtual block number 62 (0000003E), 512 (0200) bytes

00000000 00000000 00000000 00000000 00000000 00000000 00000000 00000000 ................................ 000000
00000000 00000000 00000000 00000000 00000000 00000000 00000000 00000000 ................................ 000020
00000000 00000000 00000000 00000000 00000000 00000000 00000000 00000000 ................................ 000040
00000000 00000000 00000000 00000000 00000000 00000000 00000000 00000000 ................................ 000060
00000000 00000000 00000000 00000000 00000000 00000000 00000000 00000000 ................................ 000080
00000000 00000000 00000000 00000000 00000000 00000000 00000000 00000000 ................................ 0000A0
00000000 00000000 00000000 00000000 00000000 00000000 00000000 00000000 ................................ 0000C0
00000000 00000000 00000000 00000000 00000000 00000000 00000000 00000000 ................................ 0000E0
00000000 00000000 00000000 00000000 00000000 00000000 00000000 00000000 ................................ 000100
00000000 00000000 00000000 00000000 00000000 00000000 00000000 00000000 ................................ 000120
00000000 00000000 00000000 00000000 00000000 00000000 00000000 00000000 ................................ 000140
00000000 00000000 00000000 00000000 00000000 00000000 00000000 00000000 ................................ 000160
00000000 00000000 00000000 00000000 00000000 00000000 00000000 00000000 ................................ 000180
00000000 00000000 00000000 00000000 00000000 00000000 00000000 00000000 ................................ 0001A0
003D4F46 4E495F45 4C49465F 435F0720 00000000 00000000 00000000 00000000 ................._C_FILE_INFO=. 0001C0
00000000 00000000 00000000 00000000 00000000 00000000 00000000 00000000 ................................ 0001E0
```

```
Dump of file SATURN:[PCCOMMON.DUMP.DLL]PDMTAB.TMP;1 on 18-APR-1990 10:49:20.10
File ID (795,38,0)   End of file block 67 / Allocated 68

Virtual block number 63 (0000003F), 512 (0200) bytes

 00000000 00000000 00000000 00000000 00000000 00000000 00000000 00000000 ................................ 000000
 00000001 00000000 00000000 00000000 00000000 00000000 00000000 00000000 ................................ 000020
 00000000 00000000 00000000 00000000 00000000 00000000 00000000 81818101 ................................ 000040
 00000000 00000000 00000000 00000000 00000000 00000000 00000000 00000000 ................................ 000060
 00000000 00000000 00000000 00000000 00000000 00000000 00000000 00000000 ................................ 000080
 00000000 00000000 00000000 00000000 00000000 00000000 00000000 00000000 ................................ 0000A0
 00000000 00000000 00000000 00000000 00000000 00000000 00000000 00000000 ................................ 0000C0
 00000000 00000000 00000000 00000000 00000000 00000000 00000000 00000000 ................................ 0000E0
 00000000 00000000 00000000 00000000 00000000 00000000 00000000 00000000 ................................ 000100
 00000000 00000000 00000000 00000000 00000000 00000000 00000000 00000000 ................................ 000120
 0A0A0A0A 0A0A0A0A 0A0A0A0A 0A0A0A0A 0A0A0A0A 0A0A0A0A 0A0A0A0A 0A0A0A00 ................................ 000140
 0A0A0A0A 0A0A0A0A 0A0A0A0A 0A0A0A0A 0A0A0A0A 0A0A0A0A 0A0A0A0A 0A0A0A0A ............................ .... 000160
 0A0A0A0A 0A0A0A0A 0A0A0A0A 0A0A0A0A 0A0A0A0A 0A0A0A0A 0A0A0A0A 0A0A0A0A ............................. ... 000180
 0A0A0A0A 0A0A0A0A 0A0A0A0A 0A0A0A0A 0A0A0A0A 0A0A0A0A 0A0A0A0A 0A0A0A0A ..............................  . 0001A0
 0A0A0A0A 0A0A0A0A 0A0A0A0A 0A0A0A0A 0A0A0A0A 0A0A0A0A 0A0A0A0A 0A0A0A0A ................................ 0001C0
 0A0A0A0A 0A0A0A0A 0A0A0A0A 0A0A0A0A 0A0A0A0A 0A0A0A0A 0A0A0A0A 0A0A0A0A ................................ 0001E0

Dump of file SATURN:[PCCOMMON.DUMP.DLL]PDMTAB.TMP;1 on 18-APR-1990 10:49:20.10
File ID (795,38,0)   End of file block 67 / Allocated 68

Virtual block number 64 (00000040), 512 (0200) bytes

 0A0A0A0A 0A0A0A0A 0A0A0A0A 0A0A0A0A 0A0A0A0A 0A0A0A0A 0A0A0A0A 0A0A0A0A ................................ 000000
 0A0A0A0A 0A0A0A0A 0A0A0A0A 0A0A0A0A 0A0A0A0A 0A0A0A0A 0A0A0A0A 0A0A0A0A ................................ 000020
 00000000 00000000 00000000 00000000 00000000 00000000 00000000 0000000A ................................ 000040
 00000000 00000000 00000000 00000000 00000000 00000000 00000000 00000000 ................................ 000060
 000004CA 18600000 049800C6 00002000 00000000 00000000 00000000 00000000 ................. ..ó.....'.ð... 000080
 414D203A 00FD3E3E 4753404E 3C3C0000 00000000 000000F6 FFFF0DEC 06D80000 ..Ü.$...-.........<<NMSG>>».: MA 0000A0
 69006500 203A726F 72726520 746E696F 702D676E 6974616F 6C66202D 0A004854 TH..- floating-point error: .e.i 0000C0
 66726576 6F006800 0A003020 79622065 64697669 64006700 0A006469 6C61766E nvalid...g.divide by 0...h.overf 0000E0
 696C7078 65007000 0A00776F 6C667265 766F2068 63617473 006E000A 00776F6C low...n.stack overflow...p.expli 000100
 61747320 2D0A0030 30303652 0000000A 00646574 6172656E 65672079 6C746963 citly generated.....R6000..- sta 000120
 72656765 746E6920 2D0A0033 30303652 0003000A 00776F6C 66726576 6F206B63 ck overflow.....R6003..- integer 000140
 6E652074 6F6E202D 0A003830 30365200 08000A00 30207962 20656469 76696420  divide by 0.....R6008..- not en 000160
 30365200 09000A00 73746E65 6D756772 6120726F 66206563 61707320 6867756F ough space for arguments.....R60 000180
 7269766E 6520726F 66206563 61707320 6867756F 6E652074 6F6E202D 0A003930 09..- not enough space for envir 0001A0
 0020726F 72726520 656D6974 2D6E7572 00FF000A 0000FC00 0A00746E 65606E6F onment...•......run-time error . 0001C0
 6F6C2074 6F6E2074 6E696F70 20676E69 74616F6C 66202D0A 00323030 36520002 ..R6002..- floating point not lo 0001E0

Dump of file SATURN:[PCCOMMON.DUMP.DLL]PDMTAB.TMP;1 on 18-APR-1990 10:49:20.10
File ID (795,38,0)   End of file block 67 / Allocated 68

Virtual block number 65 (00000041), 512 (0200) bytes

 00F80002 00000008 00F40002 00000004 01700002 0004FFFF FF000A0D 64656461 aded..........p.......¶.......%. 000000
 726F4620 64696C61 766E4925 00010352 00000000 0000000A 07220002 00000009 ......"..........R...%Invalid For 000020
 6C61766E 492C002E 65756C61 76206E6F 69746365 74654420 79654B20 6E676965 eign Key Detection value..,Inval 000040
 6C657320 79676574 61727473 20676E69 68637461 4D206C61 72656E65 47206469 id General Matching strategy sel 000060
 6374614D 20657461 6E696472 6F627553 2064696C 61766E49 30002E64 65746365 ected..0Invalid Subordinate Matc 000080
 64696C61 766E492E 002E6465 7463656C 65732079 67657461 72747320 676E6968 hing strategy selected...Invalid 0000A0
 6C657320 79676574 61727473 206E6F69 74756C6F 73655220 6C617265 6E654720  General Resolution strategy sel 0000C0
 6F736552 20657461 6E696472 6F627553 2064696C 61766E49 32002E64 65746365 ected..2Invalid Subordinate Reso 0000E0
 6C61766E 4927002E 64657463 656C6573 20796765 74617274 73206E6F 6974756C lution strategy selected..'Inval 000100
 64657463 656C6573 20796765 74617274 73206E6F 6974616E 6962606F 43206469 id Combination strategy selected 000120
 002E6575 6C617620 6E6F6974 617A696C 6160726F 4E206469 6C61766E 491D002E ...Invalid Normalization value.. 000140
 20736567 6E616863 20656D61 6E206567 61676170 6F725020 64696C61 766E492F /Invalid Propagage name changes  000160
 2068746F 77724720 64696C61 766E4920 002E6575 6C617620 73746573 70206F74 to psets value.. Invalid Grwoth  000180
 20534C4C 554E2064 696C6176 6E491000 2E737469 6E552065 6D695420 65746152 Rate Time Units...Invalid NULLS  0001A0
 76206563 72756F73 2064696C 61766E49 16002E65 756C6176 20646577 6F6C6C61 allowed value...Invalid source v 0001C0
 7265706F 206C6163 69676F4C 20746573 50206469 6C61766E 4925002E 65756C61 alue..%Invalid Pset Logical oper 0001E0
```

```
Dump of file SATURN:[PCCOMMON.DUMP.DLL]PDMTAB.TMP;1 on 18-APR-1990 10:49:20.10
File ID (795,38,0)    End of file block 67 / Allocated 68

Virtual block number 66 (00000042), 512 (0200) bytes

67696572 6F662077 6F687320 64696C61 766E4928 002E6575 6C617620 726F7461 ator value..+Invalid show ... eig 000000
64696C61 766E492F 002E6575 6C617620 73657475 62697274 74612079 6568206E n key attributes value../Invalid 000020
73657475 62697274 74612079 6568206E 67696572 6F662065 74617265 6E656720  generate foreign key attributes 000040
69746172 65706573 2074726F 70606920 64696C61 766E4925 002E6575 6C617620  value..%Invalid import seperati 000060
7474616C 66206469 6C61766E 49200352 0000002E 72657463 61726168 63206E6F on character....R.·Invalid flatt 000080
002E6575 6C617620 79686372 61726569 68206570 79742079 7469746E 65206E65 en entity type hierarchy value.. 0000A0
66207364 6E6F6D61 69642074 65737020 79616C70 73696420 64696C61 766E4933 3Invalid display pset diamonds f 0000C0
61686320 64696C61 766E4918 002E6575 6C617620 73746573 70207965 6820726F or key psets value...Invalid cha 0000E0
70797420 79746974 6E652064 696C6176 6E492E00 2E657079 74207265 74636172 racter type...Invalid entity typ 000100
766E491F 002E726F 74636166 20746966 656E6562 20796863 72617265 69682065 e hierarchy benefit factor...Inv 000120
766E491E 002E6575 6C617620 70616C72 65766F20 65707974 62757320 64696C61 alid subtype overlap value...Inv 000140
61766E49 1E002E65 756C6176 20607560 696E6960 20797469 746E6520 64696C61 alid entity minimum value...Inva 000160
6C61766E 491F002E 65756C61 76206075 60697861 60207974 69746E65 2064696C lid entity maximum value...Inval 000180
6C61766E 4922002E 65756C61 76206465 74636570 78652079 7469746E 65206469 id entity expected value.."Inval 0001A0
6E491C00 2E656761 746E6563 72657020 6874776F 72672079 7469746E 65206469 id entity growth percentage...In 0001C0
6C61766E 4922002E 65756C61 76206075 60697861 60207465 73702064 696C6176 valid pset maximum value.."Inval 0001E0

Dump of file SATURN:[PCCOMMON.DUMP.DLL]PDMTAB.TMP;1 on 18-APR-1990 10:49:20.10
File ID (795,38,0)    End of file block 67 / Allocated 68

Virtual block number 67 (00000043), 512 (0200) bytes

6E492200 2E687467 6E656C20 60756069 6E696020 72657463 61726168 63206469 id character minimum length.."In 000000
002E6874 676E656C 20607560 69786160 20726574 63617261 68632064 696C6176 valid character maximum length.. 000020
676E656C 20646574 63657078 65207265 74636172 61686320 64696C61 766E4923 #Invalid character expected leng 000040
6C617620 60756069 6E696020 72656765 746E6920 64696C61 766E491F 002E6874 th...Invalid integer minimum val 000060
6C617620 60756069 78616020 72656765 746E6920 64696C61 766E491F 002E6575 ue...Invalid integer maximum val 000080
2E65756C 6176206D 756E696D 6960206C 61657220 64696C61 766E491C 002E6575 ue...Invalid real miminum value. 0000A0
206C6165 72206469 6C61766E 491C0352 00000000 00000000 00000000 00000000 ................R..Invalid real  0000C0
726F7272 65204044 5020666F 2074754F 1E002E65 756C6176 20607560 69786160 maximum value...Out of PDM error 0000E0
65207265 6765746E 69206469 6C61766E 4920002E 726F7272 65206567 6E617220 -range error.. Invalid integer e 000100
70786520 6C616572 2064696C 61766E49 1D002E65 756C6176 20646574 63657078 xpected value...Invalid real exp 000120
616C7020 79746974 6E652064 696C6176 6E492000 2E65756C 61762064 65746365 ected value.. Invalid entity pla 000140
00010001 00010001 00010001 00010001 0001002E 65756C61 7620746E 65606563 cement value.................... 000160
00000000 00000000 00000000 00000000 00000000 00000000 00000000 00010001 ................................ 000180
00000000 00000000 00000000 00000000 00000000 00000000 00000000 00000000 ................................ 0001A0
00000000 00000000 00000000 00000000 00000000 00000000 00000000 00000000 ................................ 0001C0
00000000 00000000 00000000 00000000 00000000 00000000 00000000 00000000 ................................ 0001E0
                                                   Dump of file SATURN:[PCCOMMON.DUMP.DLL]PPRTAB.TMP;1 on 18-APR-1990 10:49:50.86
File ID (863,14,0)    End of file block 3 / Allocated 4

Virtual block number 1 (00000001), 512 (0200) bytes

00000000 00000040 00000000 00000088 0000FFFF 00000004 00000003 008A5A4D MZα.............|........a....... 000000
00000080 00000000 00000000 00000000 00000000 00000000 00000000 00000000 ................................ 000020
6F6E6E61 63206D61 72676F72 70207369 685421CD 4C01B821 CD09B400 0EBA1F0E ..α..Ç.ël|.LëlThis program canno 000040
00000000 00000024 0A0D0D2E 65646F6D 20534F44 206E6920 6E757220 65622074 t be run in DOS mode....$....... 000060
00020005 00000000 00020000 00000000 00048009 B219AD17 00070090 0505454E NE.......Ù.ÿ.................... 000080
00000000 00000000 00010000 00040000 00000124 00760072 00680068 0040002C ,.a.h.h.r.v.$.................. 0000A0
02300F21 0010004A 00480F00 00480044 00110F00 00110041 02800F00 02800015 ........A.......D.H....H.J....I.O. 0000C0
534C4C41 43534F44 0800000A 00010000 00424154 52505006 00300E21 00000000 ....!.O..PPRTAB.........DOSCALLS 0000E0
0301014E 4654494E 49544553 4C4D440C 544F4C53 54494E49 4C4D4408 6C606403 .dml.DMLINITSLOT.DMLSETINITFN... 000100
74737973 62757320 7974696C 69745520 53554220 6E616D68 6361421D 00000246 F....Bachman BUS Utility subsyst 000120
28FE46C7 D88EFFFF BB1E5657 000002C8 00000142 41545952 45555108 00006D65 em...QUERYTAB...à...WV.|...ÄüF±( 000140
006A006A 016A026A 016A0010 681E08C4 83FFFF00 009A0010 681E006A 02146800 .h..j..h.........á..h..j.j.j.j.j. 000160
006A006A 006A016A 026A026A 0010681E 0000005A 9A000068 1E5016FE 4680006A j..F±.P.h...Z....h..j.j.j.j.j.j. 000180
4680006A 006A006A 016A026A 036A0010 681E0000 00789A00 01681E50 16FE4680 .F±.P.h...x....h..j.j.j.j.j.j..F 0001A0
16FE4680 006A006A 006A016A 026A046A 0010681E 00000096 9A000268 1E5016FE ±.P.h........h..j.j.j.j.j.j..F±. 0001C0
1E5016FE 4680006A 006A006A 016A026A 056A0010 681E0000 00849A00 03681E50 P.h...Ç....h..j.j.j.j.j.j..F±.P. 0001E0

Dump of file SATURN:[PCCOMMON.DUMP.DLL]PPRTAB.TMP;1 on 18-APR-1990 10:49:50.86
```

```
File ID (863,14,0)   End of file block 3 / Allocated 4

Virtual block number 2 (00000002), 512 (0200) bytes

05681E50 16FE468D 006A006A 006A046A 506A066A 0010681E 00000002 9A000468 h...@....h..j.jPj.j.j.j..F±.P.h. 000000
9A000668 1E5016FE 468D006A 006A006A 046A506A 076A0010 681E0000 00F09A00 ..Þ....h..j.jPj.j.j.j..F±.P.h... 000020
012C9A00 07681E50 16FE468D 006A006A 006A016A 026A086A 0010681E 0000010E .....h..j.j.j.j.j..F±.P.h...,. 000040
0000014A 9A000868 1E5016FE 468D006A 006A006A 016A026A 096A0010 681E0000 ...h..j.j.j.j.j..F±.P.h...J... 000060
681E0000 01689A00 09681E50 16FE468D 006A006A 006A016A 026A0A6A 0010681E .h..j.j.j.j.j..F±.P.h...h....h 000080
0010681E 00000186 9A000A68 1E5016FE 468D006A 006A006A 016A026A 0B6A0010 ..j.j.j.j.j..F±.P.h........h.. 0000A0
006A0010 681E0000 01A49A00 0B681E50 16FE468D 006A006A 006A046A 506A0C6A j.jPj.j.j.j..F±.P.h...Ê....h..j. 0000C0
89260010 B8065EC4 0000FFFF 9A000C68 1E5016FE 468D006A 006A006A 046A506A jPj.j.j.j..F±.P.h.......á^.|..&. 0000E0
02C8CBC9 5F5E1F0A 478926FE 468B065E C4000008 47C72606 5EC4065F 8C260447 G.&._.á^.&úG...á^..F±&.G..^_èùà. 000100
00B808C4 83001D00 009A5052 01F2BA00 00B8006A 206AD88E 0008B81E 56570000 ..WV.|...Áj-j.|..¤·.RP......á.|. 000120
FF0003E9 0000FE46 C70000FF FF9AFFFF 68FFFF68 238C6823 8D685052 0224BA00 .¤$.RPh.#h.#h..h.......úF±..Õ... 000140
000E068E 20FE5E68 5052FFFF BA000087 8D2DFE5E 680020E9 037201FE 7E83FE46 F±.-±.r.Õ .k^±·....¤..RPk^±-.... 000160
0106B81E 56570000 00C8CBC9 5F5E1F00 00E90001 B8FFD4E9 04C48300 009FFF26 &.....á.Õå.|..Õ...^_èùà...WV.|ø. 000180
000207C7 26065EC4 238D07C7 260E5EC4 01E20247 C7260000 07C72612 5EC4D88E .Äá^.&ú...&úG.ã.á^.Ãú..#á^.&ú... 0001A0
000301E9 00020000 000101FD 00020007 900010CA C95F5E1F 000007C7 260A5EC4 á^.&ú....^_èò.......».......Õ... 0001C0
00010200 0005000E 0002003C 02030000 0005025E 00020000 0004024E 00020000 ....N.......^.......<........... 0001E0

Dump of file SATURN:[PCCOMMON.DUMP.DLL]PPRTAB.TMP;1 on 18-APR-1990 10:49:50.86
File ID (863,14,0)   End of file block 3 / Allocated 4

Virtual block number 3 (00000003), 512 (0200) bytes

1F02C483 FFFF01CE 9A57D88E FFFFB81E 00000000 0000001A 00020203 02030000 ................|...ÄW.ö....á.. 000000
00000000 00000000 00000000 00000000 04000200 02000000 01000A00 020002C8 ù............................... 000020
468BD12B D187D103 D323DB18 D12B0C74 DAF7D788 067EC457 38E30C4E 8BEC8B55 U.š.N.DBWá~..ª% Öt.+ì.Ü#£.ì.ì+ì.F 000040
5FAAF3C9 13ABF3E9 D1C38EFF FFC381C3 8C10E3D1 87AAF3C9 13ABF3E9 D1E08A0A ..ÀìÕµ¨.èµ¯.ìD..ú.ú...úìÕµ¨.èµ¯_ 000060
00000000 00000000 00000000 00000088 00010033 01050001 CB500856 8B06468B .F..V.]ù....3................... 000080
00000000 00000000 0005000E 00020001 FFFF0000 00000000 00000000 00000000 ................................ 0000A0
00000000 00000000 00000000 00000000 00000000 00000000 00000000 00000000 ................................ 0000C0
00000000 00000000 00000000 00000000 00000000 00000000 00000000 00000000 ................................ 0000E0
00000000 00000000 00000000 00000000 00000000 00000000 00000000 00000000 ................................ 000100
00000000 00000000 00000000 00000000 00000000 00000000 00000000 00000000 ................................ 000120
00000000 00000000 00000000 00000000 00000000 00000000 00000000 00000000 ................................ 000140
00000000 00000000 00000000 00000000 00000000 00000000 00000000 00000000 ................................ 000160
00000000 00000000 00000000 00000000 00000000 00000000 00000000 00000000 ................................ 000180
00000000 00000000 00000000 00000000 00000000 00000000 00000000 00000000 ................................ 0001A0
00000000 00000000 00000000 00000000 00000000 00000000 00000000 00000000 ................................ 0001C0
00000000 00000000 00000000 00000000 00000000 00000000 00000000 00000000 ................................ 0001E0
```

Dump of file SATURN:[PCCOMMON.DUMP.DLL]SA-IMPRT.DLL;1 on 18-APR-1990 10:51:06.27
File ID (451,16,0)   End of file block 79 / Allocated 80

Virtual block number 1 (00000001), 512 (0200) bytes

```
00000000 00000040 00000000 000000B8 0000FFFF 00000004 0000004A 009E5A4D MZ..J...........|.......ə....... 000000
00000080 00000000 00000000 00000000 00000000 00000000 00000000 00000000 ................................ 000020
6F6E6E61 63206061 72676F72 70207369 685421CD 4C01B821 CD09B400 0EBA1F0E ..¤..Ç.ë|¡.Lë!This program canno 000040
00000000 00000024 0A0D0D2E 65646F6D 20534F44 206E6920 6E757220 65622074 t be run in DOS mode....$....... 000060
000D0000 00000000 00020000 00000000 00098006 4503590E 0007050C 0505454E NE.......Y.E.................... 000080
00000000 00000000 00010004 00040000 00000593 000E00C4 00B800A8 00400021 !.ə.¨.¡.á.ß..................... 0000A0
02A60F00 02A600AF 03F80F00 03F70064 00110F00 00110061 00360F00 0036005C \.6...6.a.......d.¼...½.£.Ī...Ī. 0000C0
02020E01 00000000 35A50F00 35A503F9 08D20F00 08D20369 26C60F00 26C600E0 À.6&..6&i.Ø...Ø.ª.E5..E5........ 0000E0
03341EF1 03340980 04271EF1 0427093D 00F61EF1 00F6092D 20C00F01 1CE4075D ].Õ...å -.–.þ.–.=.’.þ.’...4.þ.4. 000100
72706D69 2D617308 01000004 000A0005 00090005 00010005 01DF1EB1 01DF0984 Ç.Ô.Ÿ.Ô..................sa-impr 000120
06000408 03EE03D6 038802BF 02980224 01E801D6 0022001C 00130001 00000074 t.........ª.ø.Ò.$...¢...ø.Ÿ..... 000140
4E49574D 5005534C 4C414353 4F440854 494E494C 4D444D46 490A6C6D 646D6669 ifmdml.IFMDMLINIT.DOSCALLS.PMWIN 000160
440A4E58 54545241 54534C4D 44084D54 48455249 55514341 4C4D4400 6C6D6403 .dml.DMLACQUIREHTM.DMLSTARTTXN.D 000180
4D595245 55514C4D 44134C45 444F4D45 4552464C 4D440C4E 5854504F 54534C4D MLSTOPTXN.DMLFREEMODEL.DMLQUERYM 0001A0
46544553 4C4D440B 444C4549 46595245 55514C4D 4400454C 444E4148 4C45444F ODELHANDLE.DMLQUERYFIELD.DMLSETF 0001C0
4D440931 4E4C5259 52455551 4C4D440C 4E4C5259 52455551 4C4D440B 444C4549 IELD.DMLQUERYRLN.DMLQUERYRLN1.DM 0001E0
```

Dump of file SATURN:[PCCOMMON.DUMP.DLL]SA-IMPRT.DLL;1 on 18-APR-1990 10:51:06.27
File ID (451,16,0)   End of file block 79 / Allocated 80

Virtual block number 2 (00000002), 512 (0200) bytes

```
00545349 4C454552 464C4D44 08455441 4C45524E 554C4D44 08455441 4C45524C LRELATE.DMLUNRELATE.DMLFREELIST. 000000
45544952 574C4D44 0C455445 4C45444C 4D440944 494C4D44 59524555 514C4D44 DMLQUERYDMLID.DMLDELETE.DMLWRITE 000020
4F524554 4C49464C 4D440C45 50595454 4F4C5359 52455551 4C4D4410 54584554 TEXT.DMLQUERYSLOTTYPE.DMLFILTERO 000040
4F54534C 4D441245 4D414E54 4E495250 44494C4D 44595245 55514C4D 44164646 FF.DMLQUERYDMLIDPRINTNAME.DMLSTO 000060
10535443 454A424F 4C4C4159 52455551 4C4D4412 48434142 4C4C4F52 4E585450 PTXNROLLBACK.DMLQUERYALLOBJECTS. 000080
45544449 4C4D4459 52455551 4C4D4417 455A4953 544F4C53 59524555 514C4D44 DMLQUERYSLOTSIZE.DMLQUERYL⁴LIDTE 0000A0
5445534C 4D441145 4D414E54 4F4C5359 52455551 4C4D4410 5443454A 424F5458 XTOBJECT.DMLQUERYSLOTNAME.[ ¹LSET 0000C0
4D440F44 45544144 5055454D 49545445 534C4D44 11444554 41455243 454D4954 TIMECREATED.DMLSETTIMEUPDATE..DM 0000E0
4D441659 42444554 41445055 5445534C 4D440F59 42444554 41455243 5445534C LSETCREATEDBY.DMLSETUPDATEDBY.DM 000100
41440874 72706D69 2D616408 45544147 4F525255 53485449 57455441 4552434C LCREATEWITHSURROGATE.da-imprt.DA 000120
54534544 4D454D0E 50414548 45544145 52434D45 4D0D4D45 4D035452 4F504D49 IMPORT.MEM.MEMCREATEHEAP.MEMDEST 000140
4F4C4245 4552464D 454D0C4B 434F4C42 434F4C4C 414D454D 0D504145 48594F52 ROYHEAP.MEMALLOCBLOCK.MEMFREEBLO 000160
4F52504C 4F4F5446 45444954 470E4C4F 4F544C4C 49484954 47084954 47034843 CK.GTI.GTIKILLTOOL.GTIDEFTOOLPRO 000180
12574F44 4E49574C 4F4F5459 52455551 49544712 47534D44 4E455349 54470A43 C.GTISENDMSG.GTIQUERYTOOLWINDOW. 0001A0
41544144 58554154 45534954 47105254 50415441 44585541 59524555 51495447 GTIQUERYAUXDATAPTR.GTISETAUXDATA 0001C0
49504C54 550E4C54 5503544E 45524150 4C4F4F54 59524555 51495447 12525450 PTR.GTIQUERYTOOLPARENT.UTL.UTLPI 0001E0
```

Dump of file SATURN:[PCCOMMON.DUMP.DLL]SA-IMPRT.DLL;1 on 18-APR-1990 10:51:06.27
File ID (451,16,0)   End of file block 79 / Allocated 80

Virtual block number 3 (00000003), 512 (0200) bytes

```
65690854 4F4F524E 41404843 41425952 4555514C 54551347 4C44454C 49464B43 CKFILEDLG.UTLQUERYBACHMANROOT.ie 000000
41484545 52464549 0C454C44 4E414844 454D414E 54454745 49106E6F 6D6D6F63 common.IEGETNAMEDHANDLE.IEFREEHA 000020
4F545845 4E544547 45490F54 43454A42 4F545352 49465445 47454910 454C444E NDLE.IEGETFIRSTOBJECT.IEGETNEXTO 000040
00544F4C 53545352 49465445 4745490E 544F4C53 45455246 45490A54 43454A42 BJECT.IEFREESLOT.IEGETFIRSTSLOT. 000060
54454745 49084C4C 54535249 46544547 45490C54 4F4C5354 58454E54 45474549 IEGETNEXTSLOT.IEGETFIRSTLL.IEGET 000080
45490F44 44414853 41484549 0950554B 4F4F4C48 53414845 490C4C4C 5458454E NEXTLL.IEHASHLOOKUP.IEHASHADD.IE 0000A0
41484549 0A495352 41545845 4E544547 45490045 4D414E54 43454A42 4F544547 GETOBJECTNAME.IEGETNEXTARSI.IEHA 0000C0
424C5455 13524F53 52554354 494E4947 41424C54 55105455 4403504F 4F4C4853 SHLOOP.DUT.UTLBAGINITCURSOR.UTLB 0000E0
45534C54 550C454B 414D5145 534C5455 0A524F53 52554345 54415245 54494741 AGITERATECURSOR.UTLSEQMAKE.UTLSE 000100
45440E4B 53454441 44415308 4C454853 55505145 534C5455 0C454B41 4D4E5551 QUNMAKE.UTLSEQPUSHEL.SADADESK.DE 000120
4154534E 49454448 54454D5F 12444F48 54454D06 454C4946 4F525054 45474853 SKGETPROFILE.METHOD._METHDEINSTA 000140
57534F44 0845534F 4C43534F 44084E45 504F534F 44074F49 53034554 4149544E NTIATE.SIO.DOSOPEN.DÕSCLOSE.DOSW 000160
4C4C442E 74727060 69206173 0C000001 43010301 44414552 534F4407 45544952 RITE.DOSREAD...C....sa-imprt.DLL 000180
00000000 00000000 00000000 00000143 4F52504C 4F4F5454 524F504D 490E0000 ...IMPORTTOOLPROC............... 0001A0
7500003D FFFF0000 9A0200A3 2606468B 18FA068E D88EFFFF B81E5657 000000C8 à...WV.¡...Ä..ª..F.&È.......=..u 0001C0
00000006 001A0002 000290CB C95F5E1F 0000E900 01B80006 E90000B8 0006E903 .Õ..|..Õ..|..Õ...^_èù........... 0001E0
```

```
Dump of file SATURN:[PCCOMMON.DUMP.DLL]SA-IMPRT.DLL;1 on 18-APR-1990 10:51:06.27
File ID (451,16,0)   End of file block 79 / Allocated 80

Virtual block number 4 (00000004), 512 (0200) bytes

 1F02C483 FFFF0000 9A57D88E FFFFB81E 00000000 00000000 00000009 00080002 .................|...ÄW......á.. 000000
 00000000 00000000 00000000 00000000 09000200 02000000 01000A00 020002C8 ù............................... 000020
 7500F47E 83F44689 0000FFFF 9A5016F6 468D026A D88EFFFF B81E5657 00000CC8 à...WV.j...Äj..F-.P......F¶.-¶.u 000040
 83F44689 0000FFFF 9A5016FC 468D022B 68606AF6 76FF0114 E9F4468B 0006E903 .Õ...F¶Õ...v-j'h+..F=.P......F¶. 000060
 00F47E83 F4468900 00FFFF9A FC76FFFE 76FF0676 FF00E5E9 0003E903 7500F47E -¶.u.Õ..Õ|..v..v±.v=......F¶.-¶. 000080
 7E83F446 890000FF FF9A5052 002905FE 568BFC46 8B0676FF 00C8E900 03E90375 u.Õ..Õà..v..F=.V±.).RP......F¶.- 0000A0
 26FE77FF 26085EC4 04084683 06478926 F6468BFC 5EC400A6 E90003E9 037500F4 ¶.u.Õ..Õ|.á^=.F-&.G..F..á^.&.w±& 0000C0
 47882608 5EC40408 468308C4 83FFFF02 529A5052 000805FE 568BFC46 8BFC77FF .w=.F=.V±...RP.R....á..F..á^.&.G 0000E0
 76FF37FF 26FC5EC4 04084683 078926F8 468BFC5E C4FA5689 F84689FE 578B26FC =&.W±.F½.V³á^=.F½&...F..á^=&.7.v 000100
 83F44689 0000FFFF 9A505200 0205FE56 8BFC468B 50520008 05FE568B FC468B06 ..F=.V±...RP.F=.V±...RP......F¶. 000120
 7E83F446 890000FF FF9A0277 FF260477 FF26FC5E C40025E9 0003E903 7500F47E -¶.u.Õ..ÕX.á^=&.w.&.w.......F¶.- 000140
 5E1F0000 E9F4468B 0000FFFF 9AF676FF 000EE900 00B80006 E90003E9 037500F4 ¶.u.Õ..Õ..|..Õ...v-......F¶Õ...^ 000160
 E90E468B 0000FFFF 9A5016FC 46801076 FFD88E00 08B81E56 57000016 C8CBC95F _èùà...WV.|...Ä.v..F=.P......F.Õ 000180
 078B26F4 5EC4F256 89F04689 08568B06 468BF656 89F44689 0C568B0A 468B0253 Š..F..V..F¶.V-.F..V..Fþ.V·á^¶&.. 0001A0
 89260247 89260000 B8F05EC4 02578926 0789261C E6168B1C E4A1F45E C40041E9 ÕA.á^¶ÀÕ...|.&..&.W.á^þ¡ .&.G.&. 0001C0
 16E90789 26024789 26000088 F05EC407 89260247 89260000 B8F45EC4 0033E907 .Õ3.á^¶|..&.G.&..á^þ|..&. `.&..Õ. 0001E0

Dump of file SATURN:[PCCOMMON.DUMP.DLL]SA-IMPRT.DLL;1 on 18-APR-1990 10:51:06.27
File ID (451,16,0)   End of file block 79 / Allocated 80

Virtual block number 5 (00000005), 512 (0200) bytes

 0211E900 00BA0000 B8FFCDE9 FFAFE903 75006C30 FFB7E903 7500693D 0013E900 .Õ..=i.u.Õñ.=l.u.Õ£.Õë.|..¤..Õ.. 000000
 FFFF0000 9A1076FF 0A76FF0C 76FF1CE4 A31CE6A3 0000B802 08E90000 BA0001B8 |..¤..Õ..|..Èl.ÈÕ..v..v..v...... 000020
 46890000 FFFF9A50 16EC468D 2977FF26 FC5EC401 E4E999EA 468BEA46 8906C483 .á..FÕ.FÕ.ÕÕ.á^=&.w).F£.P......F 000040
 FF00C5E9 04C483FF FF00009A 2977FF26 FC5EC4EA 76FF0015 E9037500 EA7E83EA Õ.-Õ.u.Õ...võá^=&.w)......á.Õé.. 000060
 C4EA76FF 0015E903 7500EA7E 83EA4689 06C483FF FF00009A 1076FFFC 76FFFE76 v±.v=.v.......á..FÕ.-Õ.u.Õ...võá 000080
 FFFF9A00 6A036A01 6A006A01 6A006A00 93E904C4 8302EF00 009A2977 FF26FC5E ^=&.w)...ÿ..á.Õ..j.j.j.j.j.j.... 0000A0
 FFFF9A01 6A006A50 52991046 8B1DAE68 2977FF26 FC5EC400 00FFFF9A 50520000 ..RP.....á^=&.w)hÙ..F..RPj.j.... 0000C0
 C41CE468 1E5016F8 468D0000 FFFF9A00 42681E02 77FF2604 77FF26FC 5EC40000 ..á^=&.w.&.w..hB.......F½.P.hÕ.á 0000E0
 5EC437FF 26FC5EC4 0677FF26 FC5EC450 52002805 FE5688FC 468B2977 FF26FC5E ^=&.w).F=.V±.+.RPá^=&.w.á^=&.7á^ 000100
 9A0277FF 260477FF 26FC5EC4 18C48302 371AD89A 1076FF02 77FF2604 77FF26FC =&.w.&.w..v..Ä.7..á.á^=&.w.&.w.. 000120
 00685052 002805FE 568BFC46 8BF876FF FA76FF1C E4A31CE6 A30000B8 0000FFFF ....|..Èl.ÈÕ..v³.v½.F=.V±.+.RPh. 000140
 00027E9A 006A016A 016A006A 016A006A 0CC48302 6900009A 2977FF26 FC5EC4CE öá^=&.w)...i..á.j.j.j.j.j.j..-.. 000160
 468B0007 E9037500 EA7E83EA 46890000 FFFF9A00 6A1076FF 00000285 9A505200 .RP......v.j.......FÕ.-Õ.u.Õ...F 000180
 FF9A0277 FF260477 FF26FC5E C40075E9 000107C7 260A5EC4 0080E900 8CE999EA Õ.Õ..Õ..á^.&ú...Õu.á^=&.w.&.w... 0001A0
 76FF0E76 FF1076FF 0059E900 00BA0000 B8000001 349A0677 FF26FC5E C40000FF ...á^=&.w..4...j..¤..ÕY..v..v..v 0001C0
 10033DFE 23E90375 10013D00 33E9003F E90000FF FF9A0676 FF0876FF 0A76FF0C ..v..v..v......Õ?.Õ3.=..u.Õ#±=.. 0001E0

Dump of file SATURN:[PCCOMMON.DUMP.DLL]SA-IMPRT.DLL;1 on 18-APR-1990 10:51:06.27
File ID (451,16,0)   End of file block 79 / Allocated 80

Virtual block number 6 (00000006), 512 (0200) bytes

 1DB23DFF 88E90375 1DB03DFE 38E90375 1DAD3DFF A6E90375 10043DFE 24E90375 u.Õ$±=..u.Õl.=Ù.u.Õ8±=¯.u.Õ..=ý. 000000
 4E000702 1A020300 160CCAC9 5F5E1F00 00E90000 BA000088 FFB0E9FD 70E90375 u.Õ)»Õ¯.|..¤..Õ...^_èÕ.........N 000020
 F7000401 17020300 00000503 28000200 00000402 48000200 00000301 FE000202 ...±.......K.......÷...........% 000040
 00000901 48000201 EC000600 14020300 00000700 B1000202 61000701 58020300 ...X...a...Ý...........š...K.... 000060
 85000700 77020302 09000600 38020302 74000700 55020301 FA000603 88020300 .......ª...U...t...8.......w.... 000080
 28000703 4E020300 40000403 00020300 34000402 B2020300 26000400 F8020302 ...½...&...ý...4.......a...N...( 0000A0
 5C000303 44010300 58000303 30010302 34000703 A8020300 48000403 7F020302 .......K......4...=...[...D...\ 0000C0
 89000088 D88EFFFF B81E5657 000244C8 00000000 00000002 43000702 9E020300 .......C........àD..WV.|...Ä|... 0000E0
 5016FDC8 868D096A 0676FF00 00FFFF9A 5016FDEA 868D0676 FFFDC286 89FDC486 .á»..Õ».v...Õ».P......v.j...à».P 000100
 8E83FDC6 86890000 FFFF9A50 16F2468D 5016FDC8 868D0676 FF096A00 00FFFF9A .....j..v...à».P.F·.P.......ó».ƒ 000120
 890000FF FF9A5016 FC468DF2 76FFF476 FF0242E9 F0C6868B 0007E903 7500FDC6 ó».u.Õ....ó»Õ8..v¶.v·.F=.P...... 000140
 FC76FFFE 76FFF276 FFF476FF 021DE9FD C6868800 07E90375 00FDC68E 83FDC686 .ó».ƒó».u.Õ....ó»Õ...v¶.v·.v±.v= 000160
 E9FDC686 880007E9 037500FD C68E83FD C6868900 00FFFF9A 5016FEF0 868D016A j...Þ±.P.......ó».ƒó».u.Õ....ó»Õ 000180
 46F6F646 89000001 1D9A006A 006A5016 F8468D50 16FEF086 8D00FEF0 86C601EF ÿ.ó.Þ±...Þ±.P.F½.Pj.j.......F--F 0001A0
 037500FD C68E83FD C6868900 00FFFF9A 01016850 16FEF086 8D0064E9 037410F8 ½.t.Õd...Þ±.Ph.........ó».ƒó».u. 0001C0
 F0868D08 C483FFFF 020C9A50 16FEF086 80005468 1E0040E9 00FEF086 C60008E9 Õ..ó.Þ±.Õa..hT...Þ±.P......á...Þ 0001E0
```

Dump of file SATURN:[PCCOMMON.DUMP.DLL]SA-IMPRT.DLL;1 on 18-APR-1990 10:51:06.27
File ID (451,16,0)   End of file block 79 / Allocated 80

Virtual block number 7 (00000007), 512 (0200) bytes

```
F846F600 09E90374 00F67E83 F6468900 00FFFF9A 006A006A 5016F846 8D5016FE ±.P.F½.Pj.j.......F-.-~.t.Õ..-F½ 000000
FF016A00 6A0000FA 46C70000 FFFF9AF2 76FFF476 FF00FEF0 86C60005 E9037410 .t.Õ..6.Þ±..v¶.v·.....úF*..j.j.. 000020
FFFF9A50 16FDEE86 8D005C68 1E006A00 63681E50 16FEF086 8DFDEA86 FFFDECB6 Ñš».Ñõ»..Þ±.P.hc.j..h\...Ý».P... 000040
FF261BFC 068E006A 006A010C E9011EE9 CE008800 FAE9FDC6 868BFDC6 86890000 ....6»..6»Õ*.j.öÕ..Õ..j.j...•.&. 000060
01FD053C 9A5016FD EE868D2E 6A0000FF FF9A5016 FDBC868D 056A009C 68020036 6..h..j...¥».P.....j...Ý».P.<.». 000080
6A006A00 01FA46C7 0024E903 74FDC486 0BFDC286 88FDC496 89FDC286 8906C483 .6...õ»..6»..õ»..6»t.Õ$.úF*..j.j 0000A0
FDC4B6FF 00A6E9F6 46890000 02249A20 6A006A00 6A006A00 69681E01 6A006A01 .j.j..hi.j.j.j.j .$....F-ÕÏ..Ñá» 0000C0
6A0001FA 46C70024 E9037500 003D08C4 83024202 889A5016 FDBC868D FDC286FF .Ñõ»..¥».P...B..6.=..u.Õ$.úF*..j 0000E0
868D0064 E9F64689 00000264 9A206A00 6A006A00 6A008768 1E016A00 6A016A00 .j.j.j..h..j.j.j.j .d....F-Õd... 000100
6A0001FA 46C70048 E908C483 01080252 9A505200 28050A56 88084688 5016FDEE Ý».P.F..V..+.RP.R....6.ÕH.úF*..j 000120
FFB80024 E9F64689 0000FFFF 9A206A00 6A006A00 6A00A568 1E016A00 6A016A00 .j.j.j..hÊ.j.j.j.j ......F-Õ$.j. 000140
E9FEEEE9 03750003 3DFEFFE9 03750002 3DFFCBE9 03750001 3D001BE9 002DE9FF .Õ-.Õ..=..u.Õù.=..u.Õ.±=..u.ÕÝ±Õ 000160
024E0007 00210203 000DCBC9 5F5E1F00 00E90000 B8FEABE9 037501FA 7E83FFDC É..-*.u.Õ¨±¡..Õ...^_èù....!...N. 000180
00000009 00080002 00880003 01E20103 00000007 01AE0002 006C0004 00990203 ......l...Û.......ã.............. 0001A0
00480002 00C70103 00260004 00460203 030F0008 00310203 009D0003 019F0103 ..........1...Õ...F...&...ú...K. 0001C0
00580004 00680203 02AB0008 00E10203 00480004 01420203 029C0008 016E0203 ..n.......B...K...Ã...¨...k...X. 0001E0
```

Dump of file SATURN:[PCCOMMON.DUMP.DLL]SA-IMPRT.DLL;1 on 18-APR-1990 10:51:06.27
File ID (451,16,0)   End of file block 79 / Allocated 80

Virtual block number 8 (00000008), 512 (0200) bytes

```
0080FA46 C700EBE9 08468BF8 568CF646 890A468D D88EFFFF B81E5657 000228C8 à(..WV.¡...Ä.F..F-.V½.F.ÕŠ.úF*.. 000000
0084FA46 C70116E9 0083FA46 C7011EE9 0082FA46 C70126E9 0081FA46 C7012EE9 Õ..úF*..Õ&.úF*..Õ..úF*..Õ..úF*.. 000020
0089FA46 C700F6E9 0088FA46 C700FEE9 0087FA46 C70106E9 0085FA46 C7010EE9 Õ..úF*..Õ..úF*..Õ±.úF*..Õ-.úF*.. 000040
008DFA46 C700D6E9 008CFA46 C700DEE9 008BFA46 C700E6E9 008AFA46 C700EEE9 ÕÝ.úF*..ÕÏ.úF*..ÕB.úF*..Õø.úF*.. 000060
0091FA46 C700B6E9 0090FA46 C700BEE9 008FFA46 C700C6E9 008EFA46 C700CEE9 Õö.úF*..Õ6.úF*..Õ∫.úF*..ÕÑ.úF*.. 000080
0095FA46 C70096E9 0094FA46 C7009EE9 0093FA46 C700A6E9 0092FA46 C700AEE9 ÕÜ.úF*..ÕÏ.úF*..Õ..úF*..Õ..úF*.. 0000A0
0099FA46 C70076E9 0098FA46 C7007EE9 0097FA46 C70086E9 0096FA46 C7008EE9 Õ..úF*..Õ..úF*..Õ~.úF*..Õv.úF*.. 0000C0
0086FA46 C70056E9 009DFA46 C7005EE9 009BFA46 C70066E9 009AFA46 C7006EE9 Õn.úF*..Õf.úF*..Õ^.úF*..ÕV.úF*.. 0000E0
33002B00 23001B01 19A7FF2E 93C003FF EAE90376 001B3DCE 002D004B E9004EE9 ÕN.ÕK.-.ö=..v.Õõ..â...Ï....#.+.3 000100
B300AB00 A3009B00 93008B00 83007B00 73006B00 63004300 5B005300 4B003B00 .;.K.S.[.C.c.k.s.(.........È.¨.* 000120
76FF0200 36FF261B FE068E00 6A006A00 F300E800 E3000800 D300CB00 C3008B00 .É.Û.Ù.Æ.Ü.D.Š.µ.j.j...±.&.6...v 000140
FC478826 F65EC404 F6468303 BFE9FA46 880000FF FF9A5016 FEE8868D 010068FA *h....Ò±.P......F*Õ¢..F-.6^-&.G= 000160
89FDE486 89FE5788 26FC4788 26F65EC4 04F64683 FDDE9689 FDDC8689 FE578826 &.W±..É»..B».F-.6^-&.G•&.W±..Õ». 000180
5EC404F6 4683FDDA 9689FDD8 8689FE57 8826FC47 8826F65E C404F646 83FDE696 .Ì».F-.6^-&.G=&.W±..Ä»..Õ».F-.6^ 0001A0
D8B6FFFD DAB6FFFD E0B6FFFD E2B6FFFD E29689FD E08689FE 578826FC 478826F6 -&.G=&.W±..Á»..ã».Ñã».ÑÄ».ÑÕ».ÑÄ 0001C0
03309A50 16FDE886 8D5016FE E8868DFD DC86FFFD DE86FFFD E486FFFD E686FFFD ».ÑÌ».ÑÕ».ÑB».ÑÉ»..Õ±.P..Õ».P.O. 0001E0
```

Dump of file SATURN:[PCCOMMON.DUMP.DLL]SA-IMPRT.DLL;1 on 18-APR-1990 10:51:06.27
File ID (451,16,0)   End of file block 79 / Allocated 80

Virtual block number 9 (00000009), 512 (0200) bytes

```
83FDDE96 89FDDC86 89FE5788 26FC4788 26F65EC4 04F64683 0373E918 C4830274 t..6.Õs..F-.6^-&.G=&.W±..É»..B». 000000
478826F6 5EC404F6 4683FDE6 9689FDE4 8689FE57 8826FC47 8826F65E C404F646 F-.6^-&.G=&.W±..Õ»..Ì».F-.6^-&.G 000020
DEB6FFFD E4B6FFFD E6B6FFFD E0B6FFFD E2B6FFFD E29689FD E08689FE 578826FC =&.W±..Á»..ã».Ñã».ÑÁ».ÑÌ».ÑÕ».ÑB 000040
04F64683 02FFE914 C48302C9 03309A50 16FDE886 8D5016FE E8868DFD DC86FFFD ».ÑÉ»..Õ±.P..Õ».P.O.è..6.Õ...F-. 000060
8826FC47 8826F65E C404F646 83FDDE96 89FDDC86 89FE5788 26FC4788 26F65EC4 6^-&.G=&.W±..É»..B».F-.6^-&.G•&. 000080
5016FEE8 868DFDDC B6FFFDDE B6FFFDE4 B6FFFDE6 B6FFFDE6 9689FDE4 8689FE57 W±..Õ»..Ì».ÑÌ».ÑÕ».ÑB».ÑÉ»..Õ±.P 0000A0
FE578826 FC478826 F65EC404 F6468302 AAE910C4 83038A03 309A5016 FDE8868D ..Õ».P.O.¤..6.Õ˜..F-.6^-&.G•&.W± 0000C0
83FDE696 89FDE486 89FE5788 26FC4788 26F65EC4 04F64683 FDDE9689 FDDC8689 ..É»..B».F-.6^-&.G•&.W±..Õ»..Ì». 0000E0
478826F6 5EC404F6 4683FDDA 9689FDD8 8689FE57 8826FC47 8826F65E C404F646 F-.6^-&.G=&.W±..Ä»..Õ».F-.6^-&.G 000100
F45689F2 4689FE57 8826FC47 8826F65E C404F646 83FE5689 FC4689FE 578826FC =&.W±.F•.V±.F-.6^-&.G=&.W±.F·.V¶ 000120
FC478826 F65EC404 F64683F0 5689EE46 89FE5788 26FC4788 26F65EC4 04F64683 .F-.6^-&.G•&.W±.FÝ.VÞ.F-.6^-&.G• 000140
76FFEC76 FFE876FF E84689FE 478826F6 5EC402F6 4683EC56 89EA4689 FE578826 &.W±.Fõ.Vš.F-.6^-&.G±.FÒ.vÒ.vš.v 000160
FFFDE686 FFFDD886 FFFDDA86 FFFC76FF FE76FFF2 76FFF476 FFEE76FF F076FFEA õ.vÞ.vÝ.v¶.v·.v±.v=.ÑÕ».ÑÄ».ÑÌ». 000180
E926C483 042E0330 9A5016FD E8868D50 16FEE886 8DFDDC86 FFFDDE86 FFFDE486 ÑÕ».ÑB».ÑÉ»..Õ±.P..Õ».P.O....6&Õ 0001A0
F65EC404 F64683FD DE9689FD DC8689FE 578826FC 478826F6 5EC404F6 468301B9 ¿..F-.6^-&.G=&.W±..É»..B».F-.6^- 0001C0
89FE5788 26FC4788 26F65EC4 04F64683 FDE69689 FDE48689 FE578826 FC478826 &.G•&.W±..Õ»..Ì».F-.6^-&.G•&.W±. 0001E0
```

```
Dump of file SATURN:[PCCOMMON.DUMP.DLL]SA-IMPRT.DLL;1 on 18-APR-1990 10:51:06.27
File ID (451,16,0)   End of file block 79 / Allocated 80

Virtual block number 10 (0000000A), 512 (0200) bytes

 8DFDDCB6 FFFDDEB6 FFFDE4B6 FFFDE6B6 FFFDD8B6 FFFDDAB6 FFFDDA96 89FDD886 .Ä»..Ö».ÑÖ».ÑÄ».Ñ|».Ño».ÑB».ÑÉ». 000000
 478B26F6 5EC404F6 46830145 E914C483 04B00330 9A5016FD E8868050 16FEE886 .Ò±.P..Ò».P.O.§..á.ÕE..F-.á^-&.G 000020
 FDE48689 FE578B26 FC478B26 F65EC404 F64683FD DE9689FD DC8689FE 578B26FC =&.W±..É»..B».F-.á^-&.G=&.W±..Ö» 000040
 C404F646 83FDDA96 89FDD886 89FE578B 26FC478B 26F65EC4 04F64683 FDE69689 ..|».F-.á^-&.G=&.W±..Ä»..Ö».F-.á 000060
 B6FFFDD8 B6FFFDDA B6FFFC76 FFFE76FF FE5689FC 4689FE57 8B26FC47 8B26F65E ^-&.G=&.W±.F=.V±.v±.v=.ÑÖ».ÑÄ».Ñ 000080
 83FFFF03 309A5016 FDE8868D 5016FEE8 868DFDDC B6FFFDDE B6FFFDE4 B6FFFDE6 |».ÑÖ».ÑB».ÑÉ»..Ò±.P..Ò».P.O.... 0000A0
 04F64683 FDDE9689 FDDC8689 FE578B26 FC478B26 F65EC404 F6468300 B6E918C4 á.ÕÑ..F-.á^-&.G=&.W±..É»..B».F-. 0000C0
 FFFDDEB6 FFFDD8B6 FFFDDAB6 FFFDDA96 89FDD886 89FE578B 26FC478B 26F65EC4 á^-&.G=&.W±..Ä»..Ö».ÑÖ».ÑÄ».ÑB». 0000E0
 5016FEE8 868D0061 E910C483 02000330 9A5016FD E8868050 16FEE886 8DFDDC86 ÑÉ»..Ò±.P..Ò».P.O....á.Õa...Ò±.P 000100
 03FFD8E9 03760019 3000842D 0047E900 4AE908C4 83051202 529A5016 FDE8868D ..Ò».P.R....á.ÕJ.ÕG.-..=..v.ÕÜ.. 000120
 D1027C02 7C043602 7C03C203 C2027C02 7C03C205 1A051A04 C50547A7 FF2E93C0 à...IG.é.....ô.|.|.ô.ô.|.ô.|.|.i 000140
 46890000 B8051A05 1A027C02 7C027C02 7C017502 7C020803 C2027C02 7C051A02 ...|.|.ô...|.u.|.|.|.|.....i...F 000160
 1F0000E9 00008800 00FFFF9A 006A006A 5016FDE8 86801D81 680676FF F64689F8 %.F-.v.hÝ...Ò».Pj.j......|..Õ... 000180
 FF5E868D 1076FF12 76FF0676 FF0876FF D88E0008 B81E5657 0000CAC8 CBC95F5E ^ èùàò..WV.|...Ä.v..v..v..v...^. 0001A0
 0006669A 266A5016 88468DFF 5EB6FF06 76FF0876 FF008846 C6000006 4A9A5016 .P.J...óF.·.v..v..Ñ^..F..Pj&.f.. 0001C0
 16FF6286 8D501688 468D266A 0008AE46 C7000AFE 46C70022 E90374FF 147E8300 ..-..t.Õ".ÚF±..ÚFÜ..j&.F..P..b.. 0001E0

Dump of file SATURN:[PCCOMMON.DUMP.DLL]SA-IMPRT.DLL;1 on 18-APR-1990 10:51:06.27
File ID (451,16,0)   End of file block 79 / Allocated 80

Virtual block number 11 (0000000B), 512 (0200) bytes

 16FF6086 8D1476FF 1076FF12 76FF0676 FF0876FF 010CE90A C48306D4 02CA9A50 P.ò.á..á.ÕÉ..v..v..v..v..v...'.. 000000
 1876FF06 76FF0876 FF0005AE 46C70004 FE46C701 90E9FF60 868B0000 FFFF9A50 P.......'.Õ..ÚF±..ÚFÜ...v..v..v. 000020
 628680FF 5CB6FF06 76FF0876 FF00FF62 86C60000 068A9A50 16FF5C86 8D1676FF .v...\..P.....ó.b...v..v..Ñ\...b 000040
 1876FF06 76FF0876 FF0006AE 46C70004 FE46C701 7BE90000 06A69A26 6A5016FF ..Pj&.|...Õ(.ÚF±..ÚFÜ...v..v..v. 000060
 628680FF 5CB6FF06 76FF0876 FF00FF62 86C60000 FFFF9A50 16FF5C86 8D1676FF .v...\..P.....ó.b...v..v..Ñ\...b 000080
 C4509807 8A26165E C4000DAE 46C7000C FE46C701 3BE90000 FFFF9A26 6A5016FF ..Pj&.....Õ;.ÚF±..ÚFÜ..á^.&...Pá 0000A0
 03FE46C7 010CE90C C4830720 03309A50 16FF6286 8D00C668 1E509807 8A26165E ^.&...P.hó...b..P.O. ..á.Õ..ÚF±. 0000C0
 D6468800 00FFFF9A 50160646 8D1476FF FF5EB6FF 0676FF08 76FF0007 AE46C700 .ÚFÜ...v..v..Ñ^..v..F•.P......F• 0000E0
 03309A50 16FF6286 8D00CF68 1E509807 8A26165E C4509807 8A26165E C40062E9 Õb.á^.&...Pá^.&...P.hü...b..P.O. 000100
 0AC48307 5A03309A 5016FF62 868D0008 681E37FF 26165EC4 0058E90C C483073B ;..á.ÕX.á^.&.7.hÄ...b..P.O.Z..á. 000120
 E90CC483 07A00330 9A5016FF 62868D00 DB681E37 FF260277 FF26165E C40030E9 Õ=.á^.&.w.&.7.hÜ...b..P.O....á.Õ 000140
 FFC3E9FF C6E90375 000430FF B3E90375 000230FF 96E90375 00013D00 18E9001E ..Õ..=..u.Õ..*..u.Õ°.=..u.Õó.Õü. 000160
 03309A50 16FF6286 8D000F68 1E1676FF 1876FF00 08AE46C7 0003FE46 C70065E9 Õe.ÚF±..ÚFÜ...v..v..hÕ...b..P.O. 000180
 00013D00 2BE9002E E900FF62 86C60009 AE46C700 09FE46C7 0040E90C C4830529 )..á.Õa.ÚF±..ÚFÜ..ó.b..Õ..Õ+.=.. 0001A0
 000530FF A6E90375 000430FE 58E90375 000330FE A0E90375 000230FF 17E90375 u.Õ..*..u.Õ.±=..u.ÕX±=..u.Õ!.=.. 0001C0
 5016FF36 868D266A FE76FF02 0036FF26 1BFE068E 006A006A FFC0E9FE C8E90375 u.Õà±Õà.j.j...±.&.6...v±j&..6..P 0001E0

Dump of file SATURN:[PCCOMMON.DUMP.DLL]SA-IMPRT.DLL;1 on 18-APR-1990 10:51:06.27
File ID (451,16,0)   End of file block 79 / Allocated 80

Virtual block number 12 (0000000C), 512 (0200) bytes

 0001689A 50168046 8D266AAE 76FF0200 36FF261B FE068E00 6A006A00 00081D9A .....j.j...±.&.6...vÛj&.F¯.P.k.. 000000
 060402CA 9A501608 468D5016 FF36868D 266A0018 E90374FF 147E8300 D846C600 .6FÄ..-..t.Õ..j&..6..P.FÄ.P.Ò... 000020
 1A76FF00 00FFFF9A 50160846 8D1476FF FF5EB6FF 0676FF08 76FF0017 E90AC483 .á.Õ...v..v..Ñ^..v..FÄ.P......v. 000040
 FF260C5E C45016FF 36868D50 1688468D 50160846 8D501680 468D5016 FF62868D ..b..P.F¯.P.FÄ.P.F..P..6..Pá^.&. 000060
 22C483FF FF00009A 0A76FFCE 0F6837FF 260277FF 260C5EC4 040EB7FF 26041087 Ñ..&.Ñ..á^.&.W.&.7h.õ.v.......á" 000080
 001DE903 75030A7E 83088E05 ACB81E56 57000000 C8C8C95F 5E1F0000 E9000088 |..Õ...^_èùà...WV.|¯..Ä.-..u.Õ.. 0000A0
 0A468BFF DAE90A46 8904C483 FFFF01C9 9A0676FF 0876FF00 14E90375 050A7E83 .-..u.Õ.¯.v..v..è....á..F.ÕÕ..F. 0000C0
 0A7E8300 1DE90375 030A7E83 D88E0883 881E5657 000000C8 CBC95F5E 1F0000E9 Õ..._èùà...WV.|°..Ä.-..u.Õ...-. 0000E0
 0374000A 7E83FFDA E90A4689 04C48309 2C01C99A 0676FF08 76FF0014 E9037500 .u.Õ..v..v..è.,...á..F.ÕÕ..-..t. 000100
 5F5E1F00 00E90A46 88FFE3E9 0A468904 C48308D2 01C99A06 76FF0876 FF0014E9 Õ...v..v..è.#..á..F.ÕD..F.Õ...^ 000120
 F4468D12 76FF1476 FF1076FF 0C76FF0E 76FF088E 08F0881E 56570000 0ECBC8C9 èùà...WV.|Þ..Ä.v..v..v..v..v..F¶ 000140
 5016F446 8D156A60 6A0676FF 005EE903 7498E9F2 7E81F246 890000FF FF9A5016 .P......F·.-·Õ.t.Õ^..v.j'j..F¶.P 000160
 18568816 468BF45E C4012CE9 F2468800 06E90375 00F27E83 F2468900 00FFFF9A ......F·.-·.u.Õ....F·Õ,.á^¶.F..V. 000180
 76FF1076 FF0C76FF 0E76FF04 47892606 47892600 0088F45E C4025789 26078926 &..&.W.á^¶|..&.G.&.G..v..v..v..v 0001A0
 E2E9F246 880006E9 037500F2 7E83F246 890000FF FF9AF476 FFF676FF 1276FF14 ..v..v-.v¶......F·.-·.u.Õ...F·Õã 0001C0
 05F65688 F446881A 76FF1C76 FF096A02 57892607 89261856 88164688 F45EC400 .á^¶.F..V.&..&.W.j..v..v..F¶.V-. 0001E0
```

Dump of file SATURN:[PCCOMMON.DUMP.DLL]SA-IMPRT.DLL;1 on 18-APR-1990 10:51:06.27
File ID (451,16,0)   End of file block 79 / Allocated 80

Virtual block number 13 (00000000), 512 (0200) bytes

```
F45EC413 57892611 47892620 568B1E46 88F45EC4 0AC48308 3E02CA9A 50520008 ..RP.ò.>..á.á^¶.F..V &.G.&.W.á^¶ 000000
0000FFFF 9AFC76FF FE76FF00 88E90375 D008FE56 89FC4689 06578826 04478826 &.G.&.W..F•.V±.Åu.Õ...v±.v•..... 000020
5EC40876 FF0A76FF 004CE903 7400003D 0000FFFF 9A5016F8 4680FC76 FFFE76FF .v±.v•.F½.P.....=..t.ÕL..v..v.á^ 000040
00FFFF9A 0677FF26 F85EC416 76FF1876 FF0477FF 26F85EC4 37FF2602 77FF26F8 ½&.w.&.7á^½&.w..v..v.á^½&.w..... 000060
00FFFF9A F876FFFA 76FF0676 FF0030E9 F2468800 06E90375 00F27E83 F2468900 ..F·.~·.u.Õ...F·Õ0..v..v'.v½.... 000080
0000B804 47892606 47892600 00B8F45E C40000FF FF9AFC76 FFFE76FF FF9CE900 .Õ...v±.v•.....á^¶¡..&.G.&.G.¡.. 0000A0
88FE46FF 0003E900 00FE46C7 D88E094A 881E5657 000002C8 CBC95F5E 1F0000E9 Õ...^_èùà...WV.¡J..ÄÚF±..Õ...F±. 0000C0
5EC4040A 878A260C 5EC40028 E9037402 3F832610 5EC40062 E90372FE 46391446 F.9F±r̄.Õb.á^.&.?.t.Õ(.á^.&....á^ 0000E0
5EC4002B E9078926 105EC404 C483090F 01C99A0C 76FF0E76 FF078826 0846FF08 ..F.&...v..v..è....á.á^.&..Õ+.á^ 000100
089B0000 9A0676FF CE116837 FF260277 FF260C5E C4040EB7 FF260410 87FF260C .&.ñ..&.ñ..á^.&.w.&.7h.ö.v...... 000120
D0881E56 57000002 C8CBC95F 5E1F0000 E9000088 FF90E900 09E9CE11 880CC483 .á.¡.öÕ..Õ..¡..Õ...^_èùà...WV.¡Å 000140
023F8326 105EC400 60E90372 FE463914 4688FE46 FF0003E9 0000FE46 C7D88E0A ..ÄÚF±..Õ...F±.F.9F±r̄.Õ'.á^.&.?. 000160
FFCE1168 37FF2602 77FF260C 5EC4040E 87FF2604 1087FF26 0C5EC400 28E90375 u.Õ+.á^.&.ñ..&.ñ..á^.&.w.&.7h.ö. 000180
26020846 83085EC4 040A8788 260C5EC4 002FE9CE 11880CC4 83083E00 009A0676 v....>..á.¡.öÕ/.á^.&....á^..F..& 0001A0
1F0000E9 000088FF 92E90789 26105EC4 04C48308 1001C99A 0C76FF0E 76FF0789 ...v..v..è....á.á^.&..Õ..¡..Õ... 0001C0
46391446 88FE46FF 0003E900 00FE46C7 D88E085F 881E5657 000002C8 CBC95F5E ^_èùà...WV.¡_..ÄÚF±..Õ...F±.F.9F 0001E0
```

Dump of file SATURN:[PCCOMMON.DUMP.DLL]SA-IMPRT.DLL;1 on 18-APR-1990 10:51:06.27
File ID (451,16,0)   End of file block 79 / Allocated 80

Virtual block number 14 (0000000E), 512 (0200) bytes

```
C4040EB7 FF260410 87FF260C 5EC4002B E9037502 3F832610 5EC40069 E90372FE ±r.Õi.á^.&.?.u.Õ+.á^.&.ñ..&.ñ..á 000000
0C5EC400 38E9CE11 880CC483 0BA50000 9A0676FF CE116837 FF260277 FF260C5E ^.&.w.&.7h.ö.v....È..á.¡.öÕ8.á^. 000020
C99A0C76 FF0E76FF 02578926 07892604 08468308 5EC4040C 97882604 0A878826 &....&....á^..F..&..&.W..v..v..è 000040
56570000 0EC8C8C9 5F5E1F00 00E90000 88FF89E9 07892610 5EC404C4 8308CB01 .ù..á.á^.&..Õ..¡..Õ...^_èùà...WV 000060
0000FFFF 9A501620 46805016 F6468050 16F24680 2076FF22 76FFD88E 08ECB81E .¡$..Ä.v".v .F·.P.F-.P.F̄ .P..... 000080
0277FF26 085EC404 0EB7FF26 04108 7FF 26085EC4 0028E903 7500F47E 83F44689 .F¶.~¶.u.Õ+.á^.&.ñ..&.ñ..á^.&.w. 0000A0
0273E903 7400F47E 830282E9 CE12880C C483000C 00009A06 76FFCE12 6837FF26 &.7h.ö.v.......á.¡.öÕ...-¶.t.Õs. 0000C0
0277FF26 085EC404 0EB7FF26 04108 7FF 26085EC4 0028E903 75023F83 260C5EC4 á^.&.?.u.Õ+.á^.&.ñ..&.ñ..á^.&.w. 0000E0
26040A87 8826085E C40242E9 CE11880C C483007C 00009A06 76FFCE11 6837FF26 &.7h.ö.v....|..á.¡.öÕB.á^.&....& 000100
80040A87 FF26040C 87FF2608 5EC4F276 FF1276FF 1476FF01 F6E90375 040C8708 ....u.Õ-..v..v..v·á^.&.ñ..&.ñ... 000120
F8468015 6A606A10 76FF0070 E9037498 E9F47E81 F4468900 0009639A 5016F846 F½.P.c....F¶.~¶Õ.t.Õp..v.j'j..F½ 000140
C4830D08 00009A06 76FFCE08 680014E9 037500F4 7E83F446 89000009 819A5016 .P......F¶.~¶.u.Õ..h.ö.v....Ä..á 000160
89260647 89260000 88F85EC4 07892602 47892600 0088F85E C4010 2E9 CE088804 .¡.öÕØ.á^½¡..&.G.&..á^½¡..&.G.&. 000180
CB9AF876 FFFA76FF 040A87FF 26040C87 FF26085E C4F276FF 1276FF14 76FF0447 G..v..v..v·á^.&.ñ..&.ñ...v'.v½.ù 0001A0
CE088804 C4830C32 00009A06 76FFCE08 680014E9 037500F4 7E83F446 89000009 ....F¶.~¶.u.Õ..h.ö.v....2..á.¡.ö 0001C0
76FF1A76 FF1C76FF 1676FF18 76FF005F E9037502 47082607 8826F85E C40176E9 Õv.á^½&..&.G.u.Õ_..v..v..v..v..v 0001E0
```

Dump of file SATURN:[PCCOMMON.DUMP.DLL]SA-IMPRT.DLL;1 on 18-APR-1990 10:51:06.27
File ID (451,16,0)   End of file block 79 / Allocated 80

Virtual block number 15 (0000000F), 512 (0200) bytes

```
FF002FE9 037500F4 7E83F446 8900000A 7D9AF676 FF37FF26 0277FF26 F85EC41E .á^½&.w.&.7.v-.)....F¶.-¶.u.Õ/.. 000000
1676FF18 76FF0676 FF0876FF 0A76FF1A 76FF1C76 FF1E76FF 1A76FF1C 76FFF476 v¶.v..v..v..v..v..v..v..v..v. v. 000020
33E90374 06470826 04478826 F85EC400 CEE90108 E9CE0F88 16C4830E 8905A49A .È....á.¡.öÕ..Õö.á^½&.G.&.G.t.Õ3 000040
0014E903 7500F47E 83F44689 0000FFFF 9A505200 0405FA56 88F84688 1076FF00 ..v..F½.V'...RP......F¶.-¶.u.Õ.. 000060
5016FC46 80086A60 6A1076FF 00C5E9CE 088804C4 830E8A00 009A0676 FFCE0868 h.ö.v....¤..á.¡.öÕé..v.j'j..F•.P 000080
8804C483 0F140000 9A0676FF CE086800 14E90375 00F47E83 F4468900 0000639A .c....F¶.-¶.u.Õ..h.ö.v.......á.¡ 0000A0
C4044789 261E4688 FC5EC402 57892607 89261C56 881A4688 FC5EC400 94E9CE08 .öÕ..á^•.F..V.&..&.W.á^•.F.&.G.á 0000C0
890000FF FF9AFC76 FFFE76FF 50520004 05FA5688 F8468806 478926F6 4688FC5E ^•.F-&.G..F½.V'...RP.v±.v•...... 0000E0
FF003AE9 CE088804 C4830CCC 00009A06 76FFCE08 680014E9 037500F4 7E83F446 F¶.-¶.u.Õ..h.ö.v....ä..á.¡.öÕ:.. 000100
FF0A76FF F4468900 000C9C9A 50162046 805016F6 46805016 F2468020 76FF2276 v".v .F·.P.F-.P.F .P......F¶.v.. 000120
28C8CBC9 5F5E1F00 00E90000 88FD84E9 0789260C 5EC404C4 830C6101 C99A0876 v..è.a..á.á^.&..Õ.»|..Õ...^_èùà( 000140
040EB7FF 260410B7 FF26205E C4002BE9 03750224 7E83088E 0C82881E 56570004 ..WV.¡...Ä.-$.u.Õ+.á^ &.ñ..&.ñ.. 000160
5EC4067A E924468B 0CC48310 2F00009A 0C76FFCE 076837FF 260277FF 26205EC4 á^ &.w.&.7h.ö.v..../..á..f$Õz.á^ 000180
0000FFFF 9A00E268 1E0876FF 0A76FFE4 5689E246 89040C97 8826040A 87882620  &....&.....Fã.VÕ.v..v..hã...... 0001A0
E9FBDA86 890000FF FF9A5016 FC468D08 76FF0A76 FF0017E9 03741646 39124688 .F.9F.t.Õ...v..v..F•.P.......Õ«Õ 0001C0
83FBDA86 890000FF FF9A5016 FC468DE2 76FFE476 FF1676FF 0876FF0A 76FF001D ...v..v..v..vÕ.vã.F•.P.......Õ«. 0001E0
```

```
Dump of file SATURN:[PCCOMMON.DUMP.DLL]SA-IMPRT.DLL;1 on 18-APR-1990 10:51:06.27
File ID (451,16,0)    End of file block 79 / Allocated 80

Virtual block number 16 (00000010), 512 (0200) bytes

 26205EC4 040EB7FF 26041087 FF26205E C41876FF 1A76FF00 2EE90375 00FBDABE fÖ«.u.Õ...v..v.á^ &.ñ..&.ñ..á^ & 000000
 01C99A20 76FF2276 FF05D0E9 10C48310 7100009A 0C76FFCE 096837FF 260277FF .w.&.7h.ö.v....q..á.ÕÅ..v".v .è. 000020
 5EC4040E B7FF2604 1087FF26 205EC400 28E90375 06247E83 24468904 C4831004 å..á..F$.-$.u.Õ(.á^ &.ñ..&.ñ..á^ 000040
 FF0876FF 0A76FF05 8EE90CC4 8310C300 009A0C76 FFCE0E68 37FF2602 77FF2620  &.w.&.7h.ö.v....ú..á.Õ...v..v.. 000060
 037500FB DABE83FB DA868900 00FFFF9A 50520008 05225688 20468BFC 76FFFE76 v±.v=.F .V"...RP.......Ö«./Ö«.u. 000080
 0C76FFCE 176837FF 260277FF 26205EC4 040EB7FF 26041087 FF26205E C40028E9 Õ(.á^ &.ñ..&.ñ..á^ &.w.&.7h.ö.v. 0000A0
 07247E83 24468904 C4830F45 04EF9A20 76FF2276 FF053CE9 0CC48311 0500009A ......á.Õ<..v".v .ÿ.E..á..F$.-$. 0000C0
 FFCE1568 37FF2602 77FF2620 5EC4040E B7FF2604 1087FF26 205EC400 28E90375 u.Õ(.á^ &.ñ..&.ñ..á^ &.w.&.7h.ö. 0000E0
 0CB7FF26 205EC4FC 76FFFE76 FF0876FF 0A76FF04 FAE90CC4 830E4300 009A0C76 v....C..á.Õ*..v..v..v±.v=á^ &.ñ. 000100
 1087FF26 205EC400 28E90375 00FBDABE 83FBDA86 890000FF FF9A040A B7FF2604 .&.ñ.........Ö«./Ö«.u.Õ(.á^ &.ñ. 000120
 A6E90CC4 83119B00 009A0C76 FFCE1868 37FF2602 77FF2620 5EC4040E B7FF2604 .&.ñ..á^ &.w.&.7h.ö.v.......á.ÕÏ 000140
 FF26205E C40028E9 03750624 7E832446 8904C483 11C601C9 9A2076FF 2276FF04 ..v".v .è.ó..á..F$.-$.u.Õ(.á^ &. 000160
 0CC48311 F700009A 0C76FFCE 0E6837FF 260277FF 26205EC4 040EB7FF 26041087 ñ..&.ñ..á^ &.w.&.7h.ö.v....¾..á. 000180
 2276FF0A C4830A07 02CA9A50 16EA468D 50520008 05225688 20468B09 6A0464E9 Õd.j..F .V"...RP.FÕ.P.ò.....á..v" 0001A0
 26041087 FF26205E C40028E9 03750724 7E832446 8904C483 121804EF 9A2076FF .v .ÿ....á..F$.-$.u.Õ(.á^ &.ñ..& 0001C0
 C4040BE9 0CC48312 9200009A 0C76FFCE 156837FF 260277FF 26205EC4 040EB7FF .ñ..á^ &.w.&.7h.ö.v.......á.Õ..á 0001E0

Dump of file SATURN:[PCCOMMON.DUMP.DLL]SA-IMPRT.DLL;1 on 18-APR-1990 10:51:06.27
File ID (451,16,0)    End of file block 79 / Allocated 80

Virtual block number 17 (00000011), 512 (0200) bytes

 04C48314 6901C99A 2076FF22 76FFF856 89F64689 040C9788 26040A87 8B26205E ^ &....&.....F-.V½.v".v .è.i..á. 000000
 805016FB D8868D50 16F4468D 5016FBDC 86805016 FA468D1C 76FF1E76 FF244689 .F$.v..v..F*.P..É«.P.F¶.P..Ä«.P. 000020
 FBDC8688 0270E903 7400FBDA BE83FBDA 86890000 FFFF9A50 16E6468D 5016DE46 F8.P.FÌ.P.......Ö«./Ö«.t.Õp...É« 000040
 76FF0E76 FF1076FF 0876FF0A 76FFFC76 FFFE76FF FA76FFE6 76FFE876 FF0214E9 Õ...vÕ.vÌ.v*.v±.v=.v..v..v..v..v 000060
 468B01FC E9FBDA86 891EC483 12CB0C7A 9A0C76FF 2076FF22 76FF5016 24468006 ..F$.P.v".v .v..z.ù..á...Ö«Õ«..F 000080
 8D2076FF 2276FF50 1624468D FBD8B6FF 00A0E9E0 468BE046 89FBD8B6 F7D22BF4 ¶+Ø¼ÑÄ«.FÀ.FÀÕ...ÑÄ«.F$.P.v".v . 0000A0
 50162446 8DFBD8B6 FF0094E9 FBDA8689 10C48312 F20AC89A 0C76FF50 16FBDE86 .B«.P.v..à.·..á...Ö«Õ...ÑÄ«.F$.P 0000C0
 B6FF0060 E9FBDA86 8910C483 13190857 9A0C76FF 5016FBDE 86802076 FF2276FF .v".v ..B«.P.v..W.....á...Ö«Õm..Ñ 0000E0
 868910C4 83134508 E49A0C76 FF5016FB DE868D20 76FF2276 FF501624 468DFBD8 Ä«.F$.P.v".v ..B«.P.v..Õ.E..á... 000100
 FFCE1068 37FF2602 77FF2620 5EC4040E B7FF2604 1087FF26 205EC400 46E9FBDA Õ«ÕF.á^ &.ñ..&.ñ..á^ &.w.&.7h.ö. 000120
 FF77E903 7500023D FF58E903 7500013D 001BE902 BAE90CC4 8313C500 009A0C76 v.....é..á.Õo.Õ..=..u.ÕX.=..u.Õw. 000140
 76FF0876 FF0A76FF 028FE900 03E90375 00FBDABE 83FBBAE9 FF96E903 7500043D =..u.Õ..Õo../Ö«.u.Õ..Õ...v......v 000160
 002DE903 7500FBDA BE83FBDA 86890000 141C9A50 16FBDE86 8DFA76FF FC76FFFE ±.v=.v*..B«.P.......Ö«./Ö«.u.Õ-. 000180
 FF0A76FF 0C76FF20 76FF2276 FFFC76FF FE76FFFA 76FF5016 FBDE868D FBDAB6FF .ÑÖ«..B«.P.v*.v±.v=.v".v .v..v.. 0001A0
 1087FF26 205EC400 28E90375 06247E83 00CAE902 3AE916C4 8313F905 A49A0876 v..É.*..á.Õ:.Õö..-$.u.Õ(.á^ &.ñ. 0001C0
 06E90CC4 83145800 009A0C76 FFCE0E68 37FF2602 77FF2620 5EC4040E B7FF2604 .&.ñ..á^ &.w.&.7h.ö.v....X..á.Õ. 0001E0

Dump of file SATURN:[PCCOMMON.DUMP.DLL]SA-IMPRT.DLL;1 on 18-APR-1990 10:51:06.27
File ID (451,16,0)    End of file block 79 / Allocated 80

Virtual block number 18 (00000012), 512 (0200) bytes

 0000FFFF 9A505200 08052256 8B204688 FA76FFFC 76FFFE76 FF0876FF 0A76FF02 ..v..v..v±.v=.v*.F .V"...RP..... 000000
 FA76FF50 52000805 22568B20 4688FBDA 86FF0032 E9037500 FBDABE83 FBDA8689 ..Ö«./Ö«.u.Õ2..ÑÖ«.F .V"...RP.v* 000020
 01A7E916 C4830F93 05A49A08 76FF0A76 FF0C76FF 2076FF22 76FFFC76 FFFE76FF .v±.v=.v".v .v..v..v..É....á.ÕÏ. 000040
 3DFE1FE9 03750001 3D0023E9 0026E924 468904C4 83104001 C99A2076 FF2276FF .v".v .è.ä..á..F$Õ&.Õ#.=..u.Õ.±= 000060
 1C76FF1E 76FF0000 E9FF39E9 03770005 3D000BE9 03730004 3DFDDCE9 03750003 ..u.ÕÉ«=..s.Õ..=..w.Õ9.Õ...v..v. 000080
 5016E646 8D50160E 46805016 FBD8868D 5016F446 8D5016FB DC868D50 16FA468D .F*.P..É«.P.F¶.P..Ä«.P.F8.P.FÌ.P 0000A0
 0028E903 7506247E 830082E9 03741646 39144688 FD86E9FB DA868900 00FFFF9A .......Õ«Õ.».F.9F.t.Õÿ..-$.u.Õ(. 0000C0
 00009A0C 76FFCE0E 6837FF26 0277FF26 205EC404 0EB7FF26 041087FF 26205EC4 á^ &.ñ..&.ñ..á^ &.w.&.7h.ö.v..... 0000E0
 9A505200 08052256 8B204688 FC76FFFE 76FF0876 FF0A76FF 00FFE90C C4831159 Y..á.Õ...v..v..v±.v=.F .V"...RP. 000100
 DABE83FB DA868900 00FFFF9A 50520008 05225688 20468B50 4004C483 11B802B2 ý.¡..á.ÐP.F .V"...RP.......Ö«./Ö 000120
 76FFFC76 FFFE76FF FF6A5052 00080522 56882046 8BFBDAB6 FF0031E9 037500FB «.u.Õ1..ÑÖ«.F .V"...RPj..v±.v=.v 000140
 C99A2076 FF2276FF 008FE916 C4831585 05A49A08 76FF0A76 FF0C76FF 2076FF22 ".v .v..v..v..É.ç..á.Õ...v".v .è 000160
 E276FFE4 76FFFC76 FFFE76FF 5016EA46 8DF676FF F876FF24 468904C4 83116A01 .j..á..F$.v½.v-.FÕ.P.v±.v=.vÕ.vã 000180
 BE83FBDA 86891CC4 8315EE09 429A0676 FF0876FF 0A76FF0E 76FF1076 FF1676FF .v..v..v..v..v..v..B.Ÿ..á...Ö«./ 0001A0
 FF26205E C4040E87 FF260410 87FF2620 5EC41876 FF1A76FF 002EE903 7500FBDA Ö«.u.Õ...v..v.á^ &.ñ..&.ñ..á^ &. 0001C0
 00FFFF9A 0876FF0A 76FF0011 E910C483 15000000 9A0C76FF CE096837 FF260277 w.&.7h.ö.v.......á.Õ...v..v..... 0001E0
```

Dump of file SATURN:[PCCOMMON.DUMP.DLL]SA-IMPRT.DLL;1 on 18-APR-1990 10:51:06.27
File ID (451,16,0)   End of file block 79 / Allocated 80

Virtual block number 19 (00000013), 512 (0200) bytes

```
 000EC8CB C95F5E1F 0000E924 468B0000 FFFF9A08 76FF0A76 FF0011E9 24468B00 ..F$Õ...v..v.......F$Õ...^_èùà.. 000000
 C4040EB7 FF260410 B7FF261C 5EC40028 E9037502 207E83D8 8E0F66B8 1E565700 .WV.¡f..Ä.~ .u.Õ+.á^.&.ñ...ñ..á 000020
 1076FF02 C4E92046 8B0CC483 16C50000 9A0C76FF CE116837 FF260277 FF261C5E ^.&.w.&.7h.ö.v....é..á..F ..v. 000040
 FA468900 0017319A 5016F646 8D040AB7 FF26040C B7FF261C 5EC41276 FF0E76FF .v..v.á^.&.ñ..&.ñ...F-.P.1..  F' 000060
 040CB7FF 261C5EC4 0038E903 7402470B 26078B26 F65EC400 0FE90374 00FA7E83 .~'.t.Õ..á^-&..&.G.t.Õ8.á^.&.ñ.. 000080
 FFCE1468 37FF2602 77FF261C 5EC4040E B7FF2604 10B7FF26 1C5EC404 0AB7FF26 &.ñ..á^.&.ñ..&.ñ..á^.&.w.&.7h.ö. 0000A0
 468904C4 83158101 C99A1C76 FF1E76FF 0251E920 468B10C4 83170A00 009A0C76 v.......á..F ÕQ..v..v..è....á..F 0000C0
 FF260277 FF261C5E C4040EB7 FF260410 B7FF261C 5EC40028 E9037502 207E8320  .~ .u.Õ+.á^.&.ñ..&.ñ..á^.&.w.&. 0000E0
 5EC41676 FF0E76FF 1076FF02 0CE92046 8B0CC483 17680000 9A0C76FF CE116837 7h.ö.v....h..á..F Õ...v..v..v.á^ 000100
 E9037498 E9FA7E81 FA468900 0000459A 5016F246 8D040AB7 FF26040C B7FF261C .&.ñ..&.ñ...F·.P.E....F'.~'Õ.t.Õ 000120
 680014E9 037500FA 7E83FA46 89000018 999A5016 F2468D15 6A606A06 76FF0070 p..v.j'j..F·.P......F'.~'.u.Õ..h 000140
 07892602 47892600 0088F25E C401AEE9 CE088804 C48317C4 00009A0C 76FFCE08 .ö.v....á..á.|.öÕÜ.á^·|..&.G.&.. 000160
 26040CB7 FF261C5E C41676FF 0E76FF10 76FF0447 89260647 89260000 88F25EC4 á^·|..&.G.&.G..v..v..v.á^.&.ñ..& 000180
 76FFCE08 680014E9 037500FA 7E83FA46 8900000D 8F9AF276 FFF476FF 040AB7FF .ñ...v¶.v·.¢....F'.~'.u.Õ..h.ö.v 0001A0
 76FF006B E9037502 470B2607 8826F25E C40152E9 20468804 C483183B 00009A0C ....;..á..F ÕR.á^·&..&.G.u.Õk..v 0001C0
 0F9A1876 FF37FF26 0277FF26 F25EC414 76FF37FF 260277FF 26F65EC4 0876FF0A ..v.á^-&.w.&.7.v.á^·&.w.&.7.v... 0001E0
```

Dump of file SATURN:[PCCOMMON.DUMP.DLL]SA-IMPRT.DLL;1 on 18-APR-1990 10:51:06.27
File ID (451,16,0)   End of file block 79 / Allocated 80

Virtual block number 20 (00000014), 512 (0200) bytes

```
 C41476FF 37FF2602 77FF26F2 5EC4FA76 FF0037E9 037500FA 7E83FA46 8900000E ....F'.~'.u.Õ7..v'á^·&.w.&.7.v.á 000000
 16C48318 8105A49A 0876FF0A 76FF0C76 FF1C76FF 1E76FF37 FF260277 FF26F65E ^-&.w.&.7.v..v..v..v..v..Ê....á. 000020
 88F24688 0676FF00 33E90374 06470826 04478826 F25EC400 D2E9000B E9204688 .F ÕU.Õ0.á^·&.G.&.G.t.Õ3..v..F·. 000040
 009A0C76 FFCE0868 0014E903 7500FA7E 83FA4689 00000E70 9A505200 0405F456 V¶...RP.p....F'.~'.u.Õ..h.ö.v... 000060
 FA468900 000EA19A 5016FC46 8D086A60 6A0676FF 0095E920 468804C4 83188200 .ý..á..F Õ...v.j'j..F=.P.À....F' 000080
 F65EC400 64E92046 8B04C483 15700000 9A0C76FF CE086800 14E90375 00FA7E83 .~'.u.Õ..h.ö.v....p..á..F Õd.á^- 0000A0
 4688FC5E C4044789 26144688 FC5EC402 57892607 8926FC5E C4025788 26078826 &..&.W.á^=&..&.W.á^=.F.&.G.á^=.F 0000C0
 7E83FA46 8900000E FB9AFC76 FFFE76FF 50520004 05F4568B F2468806 47892618 .&.G..F·.V¶...RP.v±.v=.«....F'.~ 0000E0
 00E92046 880006E9 20468804 C4831652 00009A0C 76FFCE08 680014E9 037500FA '.u.Õ..h.ö.v....R..á..F Õ...F Õ. 000100
 59E90374 02470826 07882610 5EC4D88E 1625881E 56570000 1AC8C8C9 5F5E1F00 ..^_èùà...WV.¡X..Äá^.&..&.G.t.ÕY 000120
 76FF0E76 FF0000FF FF9A136A 5016E646 8D0A76FF 0877FF26 0A77FF26 065EC400 .á^.&.w.&.w..v..F|.Pj.......v..v 000140
 FF260C5F C426065E C4040EB7 FF260410 B7FF260C 5FC42606 5EC45016 E646800C ..F|.Pá^.&á .&.ñ..&.ñ..á^.&á _.&. 000160
 77FF2606 5EC400C2 E914C483 19F60000 9A0677FF 26065EC4 CE166837 FF260277 w.&.7h.öá^.Ē.w....-..á.Õö.á^.&.w 000180
 46890000 FFFF9A50 52000805 12568810 468837FF 260277FF 26105EC4 37FF2602 .&.7á^.&.w.&.7.F..V....RP......F 0001A0
 C426065E C4040EB7 FF260410 B7FF260C 5FC42606 5EC40031 E9037500 FA7E83FA '.~'.u.Õ1.á^.&á .&.ñ..&.ñ..á^.&á 0001C0
 FF26065E C40CC483 1A570000 9A0677FF 26065EC4 CE196837 FF260277 FF260C5F _.&.w.&.7h.öá^.Ē.w....W..á.á^.&. 0001E0
```

Dump of file SATURN:[PCCOMMON.DUMP.DLL]SA-IMPRT.DLL;1 on 18-APR-1990 10:51:06.27
File ID (451,16,0)   End of file block 79 / Allocated 80

Virtual block number 21 (00000015), 512 (0200) bytes

```
 890000FF FF9A1177 FF261377 FF26105E C437FF26 0277FF26 105EC437 FF260277 w.&.7á^.&.w.&.7á^.&.w.&.w....... 000000
 26065EC4 040EB7FF 260410B7 FF260C5F C426065E C40031E9 037500FA 7E83FA46 F'.~'.u.Õ1.á^.&á .&.ñ..&.ñ..á^.& 000020
 26105EC4 0CC48319 1000009A 0677FF26 065EC4CE 1A6837FF 260277FF 260C5FC4 á_.&.w.&.7h.öá^.Ē.w.......á.á^.& 000040
 26105EC4 00000A3C 9A0477FF 260677FF 26105EC4 0052E903 7506470B 2604478B .Ḡ.&.G.u.ÕR.á^.&.w.&.w..<...á^.& 000060
 0477FF26 065EC400 15E90374 00003000 000A4C9A 5016FC46 8D0477FF 260677FF .w.&.w..F=.P.L...=..t.Õ..á^.&.w. 000080
 5EC40000 0AAB9A04 77FF2606 77FF2610 5EC4FFCE E900001A CC9AFC76 FFFE76FF .v±.v=.ä...Õö.á^.&.w.&.w..¨...á^ 0000A0
 881E5657 00023EC8 CBC95F5E 1F0000E9 00000A9D 9A1076FF 1276FF04 77FF2606 .&.w..v..v......Õ...^_èùà>..WV.¡ 0000C0
 00FF681E FE8C8689 FE8E8689 00008807 89260247 89260000 881A5EC4 D88E192E ...Äá^.|..&.G.&..|.....±...±.h.. 0000E0
 680014E9 03749A46 08984688 9A568998 468908C4 8318B900 EA9A1076 FF1276FF .v..v..õ.¿..á..F..V..F..F.t.Õ..h 000100
 FF1076FF 1276FF98 76FF9A76 FF088DE9 CE01B804 C4831868 00009A14 76FFCE01 .ö.v....h..á.|.öÕ...v..v..v..v.. 000120
 680011E9 0374FE96 8608FE94 8688FE96 9689FE94 86890AC4 8318B800 8F9A0E76 v....(..á....±...±...±...±t.Õ..h 000140
 04C4831C 1A01C99A FE94B6FF FE96B6FF 0AFAE904 C48318 9D 00009A14 76FFCE08 .ö.v.......á.Õ'..Ñ.±.Ñ.±.è.....á. 000160
 83199208 E89AFE94 B6FFFE96 B6FFFE9C B6FF0018 E9037400 FE9C8E83 FE9C8689 ...±.ƒ.±.t.Õ...Ñ.±.Ñ.±.Ñ.±.Ò.... 000180
 76FF04C4 8318F900 109A9876 FF9A76FF 0028E903 7406FE9C 8E83FE9C 868906C4 á....±.ƒ.±.t.Õ+..v..v....'..á..v 0001A0
 01FE9C8E 830AE5E9 00008800 00FFFF9A 1076FF12 76FF0E76 FF0876FF 0A76FF06 ..v..v..v..v..v......|..Õl..ƒ.±. 0001C0
 003008C4 831C4C02 889A0101 681E5052 000805FE 96968BFE 94868800 21E90374 t.Õl....±...±...RP.h.....L..á.=. 0001E0
```

```
Dump of file SATURN:[PCCOMMON.DUMP.DLL]SA-IMPRT.DLL;1 on 18-APR-1990 10:51:06.27
File ID (451,16,0)    End of file block 79 / Allocated 80

Virtual block number 22 (00000016), 512 (0200) bytes

8904C483 1C5C01C9 9AFE9486 FFFE9686 FF0A5BE9 CE03FE68 86C70009 E9037500 .u.Õ..ú.h±.öÕ[..Ñ.±.Ñ.±.è.\..á.. 000000
0805FE96 968BFE94 86880A34 E9CE03FE 6886C700 09E90375 01FE9CBE 83FE9C86 ..±./.±.u.Õ..ú.h±.öÕ4.....±...±.. 000020
C4831609 01C99AFE 94B6FFFE 9686FF08 C4831522 02529A50 16FDC886 8D505200 .RP..à».P.R."..á..Ñ.±.Ñ.±.è.]..á 000040
868D0876 FF0A76FF 09F2E9CE 03FE6886 C70009E9 037501FE 9CBE83FE 9C868904 ....±./.±.u.Õ..ú.h±.öÕ·..v..v... 000060
09CAE9CE 08FE6886 C70009E9 037500FE 688E83FE 68868900 000FD79A 5016FEEE Ÿ±.P.■.....h±./h±.u.Õ..ú.h±.ööö. 000080
00FE688E 83FE6886 890000FF FF9A5016 FE708680 5016FE90 868D0876 FF0A76FF .v..v.....±.P..p±.P.......h±./h±. 0000A0
89FE7296 88FE7086 880235E9 0374010C 7E83099C E9CE08FE 6886C700 09E90375 u.Õ..ú.h±.öÕ...-..t.Õ5...p±..r±. 0000C0
76FF0A76 FF00CDE9 03750247 0B260788 26EC5EC4 04EC4683 0004E9EE 5689EC46 F$.VŸÕ...F$.á^$&..&.G.u.Õë..v..v 0000E0
7500FE68 8E83FE68 86890000 05C39A50 16FE7C86 8037FF26 0277FF26 EC5EC408 .á^$&.w.&.7..|±.P.ú.....h±./h±.u 000100
01FE7CBE 83000AE9 03751DFE 7CBE8300 14E90375 2FFE7CBE 8300A1E9 0003E903 .Õ..ÕÀ../|±/u.Õ.../|±.u.Õ.../|±. 000120
868D1476 FF00001D D79AFE70 86FFFE72 86FF0876 FF0A76FF FFA0E900 03E90374 t.Õ..Õ...v..v..Ñr±.Ñp±.■.....v... 000140
08EAE9CE 08FE6886 C70009E9 037500FE 688E83FE 68868900 00FFFF9A 5016FE78 x±.P.......h±./h±.u.Õ..ú.h±.ööö. 000160
6A006A00 0008019A 5016FDC8 868D506A 00906802 0036FF26 18FE068E 006A006A j.j....±.&.6..h..jP..à».P.....j.j 000180
FE6886C7 0000FFFF 9A206A00 6A5016FD C8868D01 09681EFE 7886FFFE 7AB6FF01 ..Ñz±.Ñx±.h.....à».Pj.j .....ú.h± 0001A0
00FE688E 8300001E D79AFE70 B6FFFE72 86FF0876 FF0A76FF FF20E908 A5E9CE18 .öÕE.Õ ..v..v..Ñr±.Ñp±.■...../h±. 0001C0
868D206A FEEEB6FF FEF0B6FF 0876FF0A 76FF087C E9CE08FE 6886C700 09E90375 u.Õ..ú.h±.öÕ|..v..v..Ñb±.ÑŸ±j-.. 0001E0

Dump of file SATURN:[PCCOMMON.DUMP.DLL]SA-IMPRT.DLL;1 on 18-APR-1990 10:51:06.27
File ID (451,16,0)    End of file block 79 / Allocated 80

Virtual block number 23 (00000017), 512 (0200) bytes

860BFE6A 86880850 E90003E9 037500FE 688E83FE 68868900 00FFFF9A 5016FE6A j±.P.......h±./h±.u.Õ..ÕP...j±.. 000000
6AFE6AB6 FFFE6C86 FF2D6AFE EEB6FFFE F0B6FF08 76FF0A76 FF00E5E9 0375FE6C l±u.Õl..v..v..Ñb±.ÑŸ±j-.Ñl±.Ñj±j 000020
5016FDC4 868D046A FE6AB6FF FE6CB6FF 0876FF0A 76FFFE68 86890000 FFFF9A03 ........h±.v..v..Ñl±.Ñj±j...á».P 000040
4689FDC6 968BFDC4 868B07F4 E90003E9 037500FE 688E83FE 68868900 00FFFF9A .......h±./h±.u.Õ..Õ¶...á»..ó».F 000060
0876FF0A 76FF002E E9037502 47082607 8826EC5E C404EC46 830004E9 EE5689EC $.VŸÕ...F$.á^$&..&.G.u.Õ...v..v. 000080
E9037500 FE688E83 FE688689 0AC48300 00FFFFF9A 006A37FF 260277FF 26EC5EC4 á^$&.w.&.7j.......á...h±./h±.u.Õ 0000A0
00FE688E 830000FF FF9AFDC4 B6FFFDC6 B6FF0876 FF0A76FF FF8FE900 03E90003 ..Õ..Õ¢..v..v..Ñó».Ñá»......./h±. 0000C0
83FE6886 890000FF FF9AFE6A B6FFFE6C B6FF0876 FF0A76FF 0782E900 03E90375 u.Õ..Õ...v..v..Ñl±.Ñj±........h±. 0000E0
5016FE74 868DFEEE B6FFFEF0 B6FF0876 FF0A76FF 075EE900 03E90375 00FE688E /h±.u.Õ..Õ^..v..v..Ñb±.ÑŸ±..t±.P 000100
FF0A76FF 072EE9CE 08FE6886 C70009E9 037500FE 688E83FE 68868900 001D129A .......h±./h±.u.Õ..ú.h±.öÕ...v.. 000120
08FE6886 C70009E9 037500FE 688E83FE 68868900 00FFFF9A 5016FDC2 868D0876 v...ó».P.......h±./h±.u.Õ..ú.h±. 000140
0805FE96 968BFE94 86885016 FDC8868D 0876FF0A 76FF0C76 FF0E76FF 0706E9CE öÕ...v..v..v..v...à».P...±...±.. 000160
037498E1 FE688E81 FE688689 0000FFFF 9A5016FE 8C868D50 16FE9886 8D505200 .RP...±.P...±.P........h±./h±Å.t. 000180
E900009A 1476FFCE 04685016 FDC8868D 50520008 05FE9696 88FE9486 880024E9 Õ$.....±...±...RP..à».Ph.ö.v....Õ 0001A0
B6FFFE9C B6FF0690 E9CE08FE 6886C700 09E90375 00FE688E 830682E9 0CC4831F ..á.Õÿ../h±.u.Õ..ú.h±.öÕ...Ñ.±.Ñ 0001C0
000088FE 7E8689FE 80868900 0088FE9C 868906C4 83203808 E89AFE94 B6FFFE96 .±.Ñ.±.Õ.; .á.....±|.....±..~±|.. 0001E0

Dump of file SATURN:[PCCOMMON.DUMP.DLL]SA-IMPRT.DLL;1 on 18-APR-1990 10:51:06.27
File ID (451,16,0)    End of file block 79 / Allocated 80

Virtual block number 24 (00000018), 512 (0200) bytes

87FF26FE 949EC405 07E9FE9C 8688053C E9037503 FE9C8E83 FE888689 FE8A8689 ...±....±./.±.u.Õ<.....±Õ..á..±&.ñ 000000
0CC48321 AF00009A 1476FFCE 086837FF 260277FF 26FE949E C4040E87 FF260410 ..&.ñ..á..±&.w.&.7h.ö.v.....£!.á. 000020
868D5016 FE6E868D FE8886FF FE8A86FF 01CFE903 75FE8A86 08FE8886 8804F0E9 Õb.....±...±u.Õü..Ñ.±.Ñ.±...n±.P.. 000040
8EB6FF01 5AE90374 00FE688E 83FE6886 8900000F 359A5016 FE88868D 5016FE76 v±.P....±.P.5......h±./h±.t.ÕZ..Ñ. 000060
037500FE 688E83FE 68868900 0019579A 506A5016 9C4680FE 6EB6FFFE 8CB6FFFE ±.Ñ.±.Ñn±.F..PjP.W.....h±./h±.u. 000080
F503309A 5016FE9E 8680010A 681E5016 FDC8868D 50169C46 8D009C46 C60004E9 Õ..óF...F..P..à».P.h......±.P.Õ.% 0000A0
86880084 E9037701 FEF2BA83 E6D1FE6E 8688FEF2 82FFE6D1 FE6E868B 10C48320 .á..Ñn±ll..·±.Ñn±ll.¤·±.w.Õ...Ñ 0000C0
5016FE18 868D0AC4 83210303 309A5016 FE18868D 010F681E FEF2B2FF E6D1FE6E n±ll.ý·±.h......±.P.Õ..l.á....±.P 0000E0
E9037300 1230C603 04C48321 3102829A F0885116 FE9E8E8D 04C48321 1302829A .ý..l.á.....±.Q.Þ.ý.1l.á..ó=..s.Õ 000100
9E828D0E F712EE83 F08804C4 83214602 829A5016 FE18868D 5016FE18 868D002C ,......±.P...±.P.ý.Fl.á..Þ.Ÿ.%8... 000120
83217A02 0C9A5016 FE9E868D 5016FE18 86800014 E908C483 215D0252 9A5016FE ±.P.R.]l.á.Õ......±.P....±.P....zl. 000140
300AC483 180902F4 9A505200 0805FE96 968BFE94 86885016 FE9E868D 126A08C4 á.j......±.P....±....RP.¶.....á.= 000160
26FE949E C4040E87 FF260410 87FF26FE 949EC450 16FE9E86 8D0030E9 03750000 ..u.ÕÕ.....±.Pó..±&.ñ..&.ñ..á..±& 000180
FFFE9686 FFFE9C86 FFFE51E9 10C48321 C600009A 1476FFCE 136837FF 260277FF .w.&.7h.ö.v.....ól.á.Õ0±.Ñ.±.Ñ.±. 0001A0
8DFE7E86 FFFE8086 FFFE31E9 00019646 C7FE9C86 8906C483 182808E8 9AFE9486 Ñ.±.Õ.(..á.....±úF.....Õl±.Ñ.±.Ñ~±. 0001C0
7500FE68 8E83FE68 86890000 FFFF9A50 16FE8886 8D5016FE 86868050 16FE8286 ...±.P....±.P....±.P........h±./h±.u 0001E0
```

```
Dump of file SATURN:[PCCOMMON.DUMP.DLL]SA-IMPRT.DLL;1 on 18-APR-1990 10:51:06.27
File ID (451,16,0)   End of file block 79 / Allocated 80

Virtual block number 25 (00000019), 512 (0200) bytes

88FDE9E9 0003E903 75FE8A86 0BFE8886 8BFE8886 89FE8A86 89000088 0008E903 .Õ..|.....±...±...±...±u.Õ..ÕÕ». 000000
8EB6FFFE 68868900 00FFFF9A FE7EB6FF FE80B6FF 0039E903 75FE8086 0BFE7E86 .~±...±u.Õ9..Ñ.±.Ñ~±.......h±.Ñ. 000020
86890000 FFFF9A50 16FE7E86 80506A50 16FDC886 805016FE 7CB68DFE 8CB6FFFE ±.Ñ.±..|±.P..à».PjP..~±.P....... 000040
16FE7E86 80506A50 16FDC886 805016FE 7C868DFE 8CB6FFFE 8EB6FF00 25E9FE68 h±Õ%..Ñ.±.Ñ.±..|±.P..à».PjP..~±. 000060
52000805 FE969688 FE948688 0063E903 7500FE68 8E83FE68 86890000 FFFF9A50 P.......h±./h±.u.Õc....±...±...R 000080
1476FFCE 056837FF 260277FF 26FE949E C4040EB7 FF260410 B7FF26FE 949EC450 Pá..±&.ñ..&.ñ..á..±&.w.&.7h.ö.v. 0000A0
FE9CB6FF FE9C8689 04C48318 4501C99A FE94B6FF FE96B6FF 10C48322 E800009A ...Š".á..Ñ.±.Ñ.±.è.E..á....±.Ñ.± 0000C0
94868850 16FDC886 8DFD11E9 FE9C8689 06C48323 4F08AB9A FE94B6FF FE96B6FF .Ñ.±.Ñ.±.¨.O#.á....±Õ.»..à».P... 0000E0
5016FDC8 868D0085 E9037500 003D08C4 83208F02 889A5052 000805FE 969688FE ±...±...RP...¢ .á.=..u.Õç...à».P 000100
26FE949E C4040E87 FF260410 B7FF26FE 949EC450 52000805 FE969688 FE948688 ...±...±...RPá..±&.ñ..&.ñ..á..±& 000120
39E90375 FE80860B FE7E8688 14C48324 6400009A 1476FFCE 0C6837FF 260277FF .w.&.7h.ö.v....d$.á...~±...±u.Õ9 000140
5016FE7C 868DFE8C B6FFFE8E B6FFFE68 86890000 25649AFE 7EB6FFFE 80B6FF00 ..Ñ.±.Ñ~±.d%....h±.Ñ.±.Ñ.±..|±.P 000160
B6FFFE8E B6FF0025 E9FE6886 89000025 899A5016 FE7E868D 506A5016 FDC8868D ..à».PjP..~±.P..%....h±Õ%..Ñ.±.Ñ 000180
83FE6886 89000025 819A5016 FE7E868D 506A5016 FDC8868D 5016FE7C 868DFE8C .±..|±.P..à».PjP..~±.P.Ý%....h±. 0001A0
FE84BE83 FE8486FF 0004E900 00FE8486 C7FF28E9 FEC8E900 03E90375 00FE688E /h±.u.Õ..Õà±Õ(.ú..±..Õ.....±./.± 0001C0
82868DFE 7EB6FFFE 80B6FFFF E3E90000 FEF282C7 E6D1FE84 8688000F E9037252 Rr.Õ...Ñ.±ilú.·±..ÕD..Ñ.±.Ñ~±... 0001E0

Dump of file SATURN:[PCCOMMON.DUMP.DLL]SA-IMPRT.DLL;1 on 18-APR-1990 10:51:06.27
File ID (451,16,0)   End of file block 79 / Allocated 80

Virtual block number 26 (0000001A), 512 (0200) bytes

E9037500 FE68BE83 FE688689 0000FFFF 9A5016FE 88868050 16FE8686 805016FE ±.P...±.P...±.P.......h±./h±.u.Õ 000000
E90374FE 808608FE 7E868800 FEE90000 9646C7FE 888689FE 8A868900 0088000B ..|.....±...±úF...Õ±...~±...±t.Õ 000020
76FFCE06 6837FF26 0277FF26 FE949EC4 040EB7FF 260410B7 FF26FE94 9EC40046 F.á..±&.ñ..&.ñ..á..±&.w.&.7h.ö.v 000040
C48324C8 08AB9AFE 9486FFFE 9686FFFE 9CB6FFFE 6886890C C483247C 00009A14 ....|$.á...h±.Ñ.±.Ñ.±.Ñ.±.¨.à$.á 000060
8686FFFE 9486FFFE 9686FFFE 9CB6FF00 43E90375 00967E83 FB80E9FE 9C868906 ....±Õ.«.~..u.ÕC..Ñ.±.Ñ.±.Ñ.±.Ñ. 000080
FF0A76FF 1476FFFE 8CB6FFFE 8EB6FFFE 7CB6FFFE 82B6FFFE 6EB6FFFE 76B6FFFE ±.Ñv±.Ñn±.Ñ.±.Ñ|±.Ñ.±.Ñ.±.v..v.. 0000A0
FE94B6FF FE96B6FF FE9CB6FF 0046E9FE 9C86891C C4832511 161D9A0E 76FF0876 v..v.....%.á....±ÕF..Ñ.±.Ñ.±.Ñ.± 0000C0
B6FFFE8E B6FFFE74 B6FFFDC2 B6FFFE7C B6FF5016 FDC8868D FE7EB6FF FE80B6FF .Ñ.±.Ñ~±..à».P.Ñ|±.Ñö».Ñt±.Ñ.±.Ñ 0000E0
0013E900 16E9FE9C 868920C4 8325420F 5E9A0E76 FF0876FF 0A76FF14 76FFFE8C .±.v..v..v..v..^.B%.á ...±Õ..Õ.. 000100
9AFE94B6 FFFE96B6 FFFE9CB6 FFFF02E9 FB13E903 75000530 FAF1E903 7500043D =..u.Õþ'=..u.Õ.«Õ...Ñ.±.Ñ.±.Ñ.±. 000120
FFFE8086 FF0039E9 0375FE80 8608FE7E 868BFABA E9FE9C86 8906C483 25E808E8 Õ.Š%.á....±Õα'..~±...±u.Õ9..Ñ.±. 000140
5016FDC8 868D5016 FE7C868D FE8CB6FF FE8EB6FF FE688689 00002235 9AFE7E86 Ñ~±.5"....h±.Ñ.±.Ñ.±..|±.P..à».P 000160
FE7C868D FE8CB6FF FE8EB6FF 0025E9FE 68868900 0026009A 5016FE7E 868D506A jP..~±.P..&....h±Õ%..Ñ.±.Ñ.±..|± 000180
037400FE 688E83FE 68868900 0022829A 5016FE7E 868D506A 5016FDC8 868D5016 .P..à».PjP..~±.P.."....h±./h±.t. 0001A0
260277FF 26FE949E C4040EB7 FF260410 B7FF26FE 949EC450 16FDC886 8D0055E9 ÕU...à».Pá..±&.ñ..&.ñ..á..±&.w.& 0001C0
868D5016 FE7C868D FE8CB6FF FE8EB6FF 10C4831F BF00009A 1476FFCE 0A6837FF .7h.ö.v....¢..á..Ñ.±.Ñ.±..|±.P.. 0001E0

Dump of file SATURN:[PCCOMMON.DUMP.DLL]SA-IMPRT.DLL;1 on 18-APR-1990 10:51:06.27
File ID (451,16,0)   End of file block 79 / Allocated 80

Virtual block number 27 (0000001B), 512 (0200) bytes

46890A56 8B084688 FFA1E9FE 68868900 00225A9A 5016FE7E 868D506A 5016FDC8 à».PjP..~±.P.Z"....h±ÕÀ..F..V..F 000000
868BFA56 89FB4689 FE8E9688 FE8C8688 F6468914 4688F446 890E4688 F25689F0 Þ.V·.F..F¶.F..F~...±...±.F½.V'.. 000020
9AFFFF68 22C36850 16F0468D FE8CB6FF FE8E86FF FE5689FC 4689FE96 9688FE94 .±...±.F=.V±.Ñ.±.Ñ.±.FÞ.Phû"h... 000040
8E860BFE 8C868804 C483265A 00009A14 76FFFE68 B6FF000F E90012E9 0000FFFF ....Õ..Õ...Ñh±.v....Z&.á....±... 000060
C4832300 00109A98 76FF9A76 FF0000FF FF9AFE8C B6FFFE8E B6FF0000 E90375FE ±u.Õ...Ñ.±.Ñ.±.......v..v.....#.á 000080
0000E9FE 68868802 57892607 89261A5E C4041097 8826040E 878826FE 949EC404 .á..±&....&....á^.&..&.W...h±Õ.. 0000A0
00E60004 06220203 033C0009 21F20203 0381000A 18680203 003890C8 C95F5E1F .^_èù.8...h...Ý...·|..<...".... |. 0000C0
038C000A 1ABA0203 016A0004 08590203 01DF0005 18D10203 024E0007 10650203 ..ē...N...|...Ô...Y...j...¤...¥. 0000E0
00000006 22030002 00000005 26740002 02C80009 1F900203 03480009 16790203 ..y...H.......à...t&......£".... 000100
00000007 269C0002 017B0004 11270203 007A0004 138E0203 03C9000A 18F70203 ..¼...è.......z...'...(....&.... 000120
00000009 1AE00002 00880003 10B80103 02D90009 268F0203 03550009 17A80203 ..¨...U....&..)...|........Å..... 000140
01800004 1A180203 035F0009 20910203 00860004 1E610203 01040004 05D00203 ..T........a........ .._......... 000160
036F0009 20680203 009D0003 10990103 00920004 1E050203 02E60009 23870203 ..ñ#..|....................k ..o. 000180
019F0004 10910203 009F0004 17FF0203 01180004 160E0203 02090006 174F0203 ..O............................. 0001A0
02170006 1AA70203 19260005 26500005 037D0009 26600203 02F70009 238F0203 ...#..¥...'&..)...]&..&...|..... 0001C0
03070009 236A0203 01AF0004 19BA0203 012E0004 1CB30203 00A90004 1E420203 ..B...`...°.......¤...£...i#.... 0001E0
```

```
Dump of file SATURN:[PCCOMMON.DUMP.DLL]SA-IMPRT.DLL;1 on 18-APR-1990 10:51:06.27
File ID (451,16,0)   End of file block 79 / Allocated 80

Virtual block number 28 (0000001C), 512 (0200) bytes

 03120009 124A0203 03F5000C 1EAD0203 00B50004 1D570203 00340004 0FBC0203 ..¥...4...W...ç...Ù...%...J..... 000000
 01410004 06F90203 00400004 15FD0203 01BF0004 0FF70203 038C000A 1A780203 ..x.......%...¢...»...ā...•...A. 000020
 00CF0004 1EF70203 0390000A 1A8D0203 03210009 14C10203 00C10004 1F210203 ..I...ê...è...!...........%...ü. 000040
 00090004 15350203 00580004 1C850203 032F0009 24100203 01520004 1F490203 ..1...R....$../.......X...5...\. 000060
 89016EB8 D88EFFFF B81E5657 000008C8 00000000 00000000 02430007 05950203 ......C.........à...WV.¦...Ä¦n.. 000080
 8B26FC5E C40059E9 03750247 0B26078B 26FC5EC4 06FC4683 0004E9FE 5E8CFC46 F•.^±Ö...F•.á^•&..&.G.u.ÖY.á^•&. 0000A0
 F85EC400 34E90375 003F8026 F85EC4F8 46FF0003 E9FA5689 F8468902 578B2607 .&.W..F½.V•Ö...F½á^½&.?.u.Ö4.á^½ 0000C0
 8B98078A 26F85EC4 0022E9CE 02B80006 E9037500 1CE8BF83 E3D1088B 98078A26 &....ÄID.¢Ö..u.Ö..¦.öÖ".á^½&.... 0000E0
 C8CBC95F 5E1F0000 E90000B8 FF94E9FF BDE91CE8 87890444 8B26FC76 C4E3D108 ÄIDáv•&.D...Ö.Ö§.Ö..¦..Ö...^_èùà 000100
 FA468900 00FFFF9A 5016FC46 8D041268 1C6A0676 FFD88E00 08B81E56 57000006 ...WV.¦...Ä.v.j.h...F•.P......F• 000120
 89260789 260A568B 084688FC 5EC4FC46 89FE4689 0000B800 09E90375 00FA7E83 .~•.u.Ö..¦...F±.F•á^•.F..V.&..&. 000140
 FC5EC404 00040887 C726FC5E C4065789 26044789 260E568B 0C4688FC 5EC40257 W.á^•.F..V.&.G.&.W.á^•&ú.....á^• 000160
 000000C8 CBC95F5E 1F0000E9 FE5688FC 46880000 041087C7 26000104 0E87C726 &ú.....&ú......F•.V±Ö...^_èùà... 000180
 76FF0876 FF0026E9 0007B800 06E90375 100A47F6 26065EC4 D88E0097 B81E5657 WV.¦...Äá^.&-G..u.Ö..¦..ÖŽ..v..v 0001A0
 00E91CE8 878BE3D1 D88B9807 8A260A5E C4078826 0A5EC404 C483FFFF 01409A06 ..ā....á.á^.&..á^.&....ÄID..Ö.Ö. 0001C0
 08B80006 E9037600 3F83260E 5EC4D88E 0114B81E 56570000 00C8CBC9 5F5E1F00 ..^_èùà...WV.¦...Äá^.&.?.v.Ö..¦. 0001E0

Dump of file SATURN:[PCCOMMON.DUMP.DLL]SA-IMPRT.DLL;1 on 18-APR-1990 10:51:06.27
File ID (451,16,0)   End of file block 79 / Allocated 80

Virtual block number 29 (0000001D), 512 (0200) bytes

 01409A06 76FF0876 FF0026E9 0007B800 06E90375 100A47F6 26065EC4 0039E900 .Ö9.á^.&-G..u.Ö..¦..Ö&..v..v..ā. 000000
 5F5E1F00 00E91CE8 878BE301 D88B9807 8A260A5E C4078826 0A5EC404 C4830134 4..á.á^.&..á^.&....ÄID..Ö.Ö...^_ 000020
 1E565700 0010C8CB C95F5E1F 0000E900 04B8088E 015EB81E 56570000 00C8CBC9 èùà...WV.¦^..Ä¦..Ö...^_èùà...WV. 000040
 8906578B 2604478B 26065EC4 F25689F0 46890008 0508568B 06468BD8 8E01BA8B ¦¤..Ä.F..V.....FÞ.V·á^.&.G.&.W.. 000060
 26065EC4 040A8789 26040C87 89260000 B8065EC4 0007C626 F05EC4FE 5689FC46 F•.V±á^Þ&ó..á^.¦..&....&....á^.& 000080
 8908C483 0264010C 9AFC76FF FE76FF50 16F4468D 0000F846 C7F64689 0408878B .....F-úF½...F¶.P.v±.v•...d..á.. 0000A0
 0000B800 04109783 2601040E 87832606 5EC402AC E90003B8 028BE9FA 468BFA46 F•.F•Ö..¦..Ö¯.á^.&.....&.....¦.. 0000C0
 06FA7E83 FA468908 C483FFFF 010C9AFC 76FFFE76 FF5016F4 468D0291 E90297E9 Ö..Ö...F¶.P.v±.v•......á..F•.-•. 0000E0
 7E001AE9 037D00F8 7E8300F8 5E8301F6 6E830044 E9037507 FA7E8300 40E90375 u.ÖM..-•.u.ÖD..n-..^%..-%.).Ö..- 000100
 76FF5016 F4468D07 8826F446 8AF046FF F05EC400 0CE90377 00F67E83 0009E903 .Ö...—.w.Ö..á^Þ.FÞ.F¶&...F¶.P.v 000120
 76FFFE76 FF0019E9 037506FA 7E83FFAA E9FA4689 08C48303 2D010C9A FC76FFFE ±.v•...-..á..F•Ö¯..-•.u.Ö...v±.v 000140
 06880007 C626F046 FFF05EC4 0206E900 04B806C4 83035E01 709A5098 F4468AFC •.F¶.P.p.^..á.¦..Ö..á^Þ.FÞ&ó..¦. 000160
 037700F6 7E830009 E9037E00 1AE9037D 00F87E83 00F85E83 01F66E83 01F6E900 .Ö-..n-..^%..-%.).Ö..-.Ö...—.w. 000180
 83038701 0C9AFC76 FFFE76FF 5016F446 8D078826 F4468AF0 46FFF05E C4000CE9 Ö..á^Þ.FÞ.F¶&...F¶.P.v±.v•...ñ.. 0001A0
 FFA4E903 7505FA7E 83FFADE9 037504FA 7E83FFB6 E9037503 FA7E83FA 468908C4 á..F•.-•.u.ÖÑ..~•.u.ÖÙ..-•.u.ÖÉ. 0001C0
 0001B800 07C626F0 46FFF05E C406C483 03810170 9A5098F4 468AFC76 FFFE76FF .v±.v•.F¶.P.p....á.á^Þ.FÞ&ó..¦.. 0001E0

Dump of file SATURN:[PCCOMMON.DUMP.DLL]SA-IMPRT.DLL;1 on 18-APR-1990 10:51:06.27
File ID (451,16,0)   End of file block 79 / Allocated 80

Virtual block number 30 (0000001E), 512 (0200) bytes

 52040A05 08568B06 468B06C4 83039E01 709A5098 F4468AFC 76FFFE76 FF0177E9 Öw..v±.v•.F¶.P.p....á..F..V....R 000000
 76FF5016 F4468D01 41E90002 B80CC483 03D6011E 9AFC76FF FE76FF01 A4681E50 P.hÊ..v±.v•...ø..á.¦..ÖA..F¶.P.v 000020
 468AFC76 FFFE76FF 0016E903 7509FA7E 83FA4689 08C48303 EC010C9A FC76FFFE ±.v•...š..á..F•.-•.u.Ö...v±.v•.F 000040
 C4830448 010C9AFC 76FFFE76 FF5016F4 468D0109 E906C483 04740170 9A5098F4 ¶.P.p.t..á.Ö...F¶.P.v±.v• ..H..á 000060
 830044E9 037501FA 7E83004D E9037507 FA7E8300 56E90375 09FA7E83 FA468908 ..F•.-•.u.ÖV..-•.u.ÖM..-•.ı ÖD.. 000080
 5EC4000C E9037700 F67E8300 09E9037E 001AE903 7D00F87E 8300F85E 8301F66E n-..^%..-%.).Ö..-.Ö...—.w.¿..á^ 0000A0
 FA468908 C48304BD 010C9AFC 76FFFE76 FF5016F4 468D078B 26F4468A F046FFF0 Þ.FÞ.F¶&...F¶.P.v±.v•......á..F• 0000C0
 98F4468A FC76FFFE 76FF0019 E9037509 FA7E8300 07C626F0 46FFF05E C4FFA1E9 ÖÀ.á^Þ.FÞ&ó...-•.u.Ö...v±.v•.F¶. 0000E0
 83022A01 0C9AFC76 FFFE76FF 5016F446 8D0068E9 0004B806 C48304AC 01709A50 P.p.˜..á.¦..Ök..F¶.P.v±.v•...*.. 000100
 C4830190 01709A50 98F4468A FC76FFFE 76FF0019 E9037509 FA7E83FA 468908C4 á..F•.-•.u.Ö...v±.v•.F¶.P.p....á 000120
 FF2E93C0 03FFF2E9 03760009 300024E9 0027E900 2DE90005 B80033E9 0004B806 .¦..Ö3.¦..Ö·.Ö'.Ö$.•..v.Ö·..á... 000140
 C8CBC95F 5E1FFD32 E903A904 B0023802 56037304 BD02F402 53023E02 5304D3A7 Ï&.S.>.S.¶.§.s.V.8.§.˙.Ö2».^_èùà 000160
 03B09A50 16F8468D 04C48305 1004349A 5016F846 8D088E01 D1B81E56 5700001E ...WV.¦1..Ä.F½.P.4....á..F½.P.¯. 000180
 478B2606 5EC4E456 89E24689 00080508 56880646 88F65689 F4468904 C48302D9 )..á..F¶.V-.F..V.....Fš.Vöá^.&.G 0001A0
 87892604 0C878926 0000B806 5EC40007 C626E25E C4FE5689 FC468906 578B2604 .&.W..F•.V±á^ã&ó..á^.¦..&....&.. 0001C0
 010C9AFC 76FFFE76 FF5016EC 468D0000 F046C7EE 46890408 878B2606 5EC4040A ..á^.&.....FŸúFÞ...Fš.P.v±.v•... 0001E0
```

```
Dump of file SATURN:[PCCOMMON.DUMP.DLL]SA-IMPRT.DLL;1 on 18-APR-1990 10:51:06.27
File ID (451,16,0)   End of file block 79 / Allocated 80

Virtual block number 31 (0000001F), 512 (0200) bytes

 97832601 040E8783 26065EC4 0348E900 03B80327 E9F2468B F2468908 C48302B7 ñ..á..F·.F·Ö'.|..ÕH.á^.&.....&.. 000000
 8908C483 0606010C 9AFC76FF FE76FF50 16EC468D 032DE903 33E90000 B8000410 ...|..Õ3.Õ-..Fš.P.v±.v=......á.. 000020
 EE6E8300 44E90375 01F27E83 004DE903 7507F27E 830056E9 037506F2 7E83F246 F·.-·.u.ÕV..-·.u.ÕM..-·.u.ÕO..nŸ 000040
 FFE25EC4 000CE903 7700EE7E 830009E9 037E001A E9037D00 F07E8300 F05E8301 ..^b..~b.).Õ..-.Õ...~Ÿ.w.Õ..á^ã. 000060
 A1E9F246 8908C483 067C010C 9AFC76FF FE76FF50 16EC468D 078826EC 468AE246 Fã.Fš&...Fš.P.v±.v=...|..á..F·ÕÀ 000080
 0004B806 C48306AD 01709A50 98EC468A FC76FFFE 76FF0019 E9037506 F27E83FF ..-·.u.Õ...v±.v=.Fš.P.p.Ù..á.|.. 0000A0
 7D00F07E 8300F05E 8301EE6E 830289E9 0006B800 07C626E2 46FFE25E C40299E9 Õ..á^ã.Fã&ó..|..Õ...nŸ..^b..~b.) 0000C0
 468D0788 26EC468A E246FFE2 5EC4000C E9037700 EE7E8300 09E9037E 001AE903 .Õ..-.Õ...~Ÿ.w.Õ..á^ã.Fã.Fš&...F 0000E0
 F27E83FF B6E90375 03F27E83 F2468908 C4830799 010C9AFC 76FFFE76 FF5016EC š.P.v±.v=......á..F·.-·.u.ÕÑ..-· 000100
 83060001 709A5098 EC468AFC 76FFFE76 FFFFA4E9 037505F2 7E83FFAD E9037504 .u.ÕÙ..-·.u.ÕÊ..v±.v=.Fš.P.p.Å.. 000120
 01709A50 98EC468A FC76FFFE 76FF020A E90001B8 0007C626 E246FFE2 5EC406C4 á.á^ã.Fã&ó..|..Õ...v±.v=.Fš.P.p. 000140
 568BF446 8B505200 0205F656 8BF4468B F476FFF6 76FF5016 E8468006 C4830724 $..á..FÒ.P.v-.v¶.F¶.V-...RP.F¶.V 000160
 8BF4468B 50520008 05F6568B F4468B50 52000605 F6568BF4 468B5052 000405F6 -...RP.F¶.V-...RP.F¶.V-...RP.F¶. 000180
 FFE67E83 E6468924 C4830754 011E9AFC 76FFFE76 FF01A868 1E505200 0A05F656 V-...RP.h´..v±.v=...T..á$.F|.-|. 0001A0
 76FFF676 FF084FFF 26F45EC4 076C0A6F 8126F45E C40191E9 0004B800 06E90374 t.Õ..|..Õ..á^¶&.o.l.á^¶&.O..v-.v 0001C0
 74FF040A BF832606 5EC4040C 97892604 0A878926 065EC404 C48307B8 047E9AF4 ¶.-.|..á.á^.&....&....á^.&.€...t 0001E0

Dump of file SATURN:[PCCOMMON.DUMP.DLL]SA-IMPRT.DLL;1 on 18-APR-1990 10:51:06.27
File ID (451,16,0)   End of file block 79 / Allocated 80

Virtual block number 32 (00000020), 512 (0200) bytes

 5016EC46 8D0141E9 0007B801 47E90004 B80006E9 0374FF04 0CBF8326 0011E903 .Õ..&.€...t.Õ..|..ÕG.|..ÕA..Fš.P 000000
 FC76FFFE 76FF0016 E9037509 F27E83F2 468908C4 8307CE01 0C9AFC76 FFFE76FF .v±.v=...ö..á..F·.-·.u.Õ...v±.v= 000020
 082A010C 9AFC76FF FE76FF50 16EC468D 0109E906 C4830856 01709A50 98EC468A .Fš.P.p.V..á.Õ...Fš.P.v±.v=...*. 000040
 44E90375 01F27E83 004DE903 7507F27E 830056E9 037509F2 7E83F246 8908C483 .á..F·.-·.u.ÕV..-·.u.ÕM..-·.u.ÕO 000060
 000CE903 7700EE7E 830009E9 037E001A E9037D00 F07E8300 F05E8301 EE6E8300 ..nŸ..^b..-b.).Õ..-.Õ...-Ÿ.w.Õ.. 000080
 8908C483 086F010C 9AFC76FF FE76FF50 16EC468D 078826EC 468AE246 FFE25EC4 á^ã.Fã.Fš&...Fš.P.v±.v=...o..á.. 0000A0
 468AFC76 FFFE76FF 0019E903 7509F27E 830007C6 26E246FF E25EC4FF A1E9F246 F·ÕÀ.á^ã.Fã&ó...-·.u.Õ...v±.v=.F 0000C0
 70010C9A FC76FFFE 76FF5016 EC468D00 6BE90004 8806C483 088E0170 9A5098EC &.P.p....á.|..Õk..Fš.P.v±.v=...p 0000E0
 05030170 9A5098EC 468AFC76 FFFE76FF 0019E903 7509F27E 83F24689 08C48305 ..á..F·.-·.u.Õ...v±.v=.Fš.P.p... 000100
 93C003FF F2E90376 00093D00 24E90027 E9002DE9 00058800 33E90004 B806C483 .á.|..Õ3.|..Õ-.Õ'.Õ$.=..v.Õ·..â. 000120
 C95F5E1F FC96E907 8B089F05 7E059C06 C2089F06 43059905 84059908 B5A7FF2E ..Îç.......C...ò...~.....Õ.=.^_è 000140
 00A90203 00000009 04F70002 00000007 06280002 00000006 05AA0002 000490C8 ù.....^.......(........%.......^. 000160
 00000000 00000000 00000000 00000000 00000000 00000000 00000000 02090006 ................................ 000180
 0600ADE9 0374400A 47F62600 87E90375 830A47F6 26065EC4 FFFFBE56 000012C8 à...V/..á^.&-G..u.Õñ.&-G.ət.ÕÙ.. 0001A0
 46891258 878B06D8 68F9F700 0CB99906 602D0646 8BF08B04 C483005A 09B49A53 S.Ç.Z..á..Þ.F.-'..¿..%ªkÄ...X..F 0001C0
 C4830087 20CA9A50 E42A0B47 8A26065E C404C483 006C07D2 9A0676FF 0876FFFA ª.v..v..ø.l..á.á^.&.G.*ÕP.ò ...á 0001E0

Dump of file SATURN:[PCCOMMON.DUMP.DLL]SA-IMPRT.DLL;1 on 18-APR-1990 .10:51:06.27
File ID (451,16,0)   End of file block 79 / Allocated 80

Virtual block number 33 (00000021), 512 (0200) bytes

 89F2468D 08C48300 AB02529A 5016F046 8D01C668 1E617400 FA7E8364 7CC00B02 ..ã|d.-ª.ta.hó..FÞ.P.R.¨..á..F·. 000000
 08C48300 C3020C9A 5016F046 8D01C868 1E13745C FE7F8026 FC5EC4FE 568CFC46 F=.V±á^=&..±\t..hà..FÞ.P...û..á. 000020
 257A9A50 16F0468D 08C48300 D020F49A FA76FFFC 76FFFE76 FF0A6AFC 4EFF03E8 Š..N=j..v±.v=.vª.¶ Å..á..FÞ.P.z% 000040
 749A0000 04C890CB C95EC688 000A47C6 26065EC4 FFFFBE03 74C00B04 C483FFFF ...á..ât.ƒ..á^.&óG...ó^èù.à....t 000060
 08A29A06 76FF0876 FF0A76FF 0C76FF50 FE76FF1B 74D00BFE 5689FC46 89011020  ...F=.V±.Åt..v±P.v..v..v..v..Å. 000080
 0C76FF50 16FE568C FC46890E 468D0000 04C890CB C999C02B 9004EB0C C4830034 4..á.Š..+â.èù.à....F..F=.V±.P.v. 0000A0
 8B261278 044FFF26 065EC456 000000C8 CBC900F1 0A3A9A06 76FF0876 FF0A76FF .v..v..v..:.þ.èùà...Vá^.&.O.x.&. 0000C0
 90CBC95E 04C48301 3C056A9A 530876FF 900DEBE4 2A048A26 02478E26 07FF2637 7&..&.G.&..*õŠ...v.S.j.<..á.^èù. 0000E0
 F6260774 800A47F6 26137501 0A47F626 085EC418 74FFFE83 06768B56 000000C8 à...V.v..±.t.á^.&-G..u.&-G..t.&- 000100
 C404C483 066CE853 06087508 47082606 478B2608 5EC46FEB FFFF8805 74020A47 G..t.|..Šoá^.&.G.&.G.u..SÒl..á.á 000120
 2607FF26 C9750004 7F83260A 75085739 26107506 47392602 578B2607 8826085E ^.&..&.W.&9G.u.&9W.u.&....uè&..& 000140
 400A47F6 26010A4F 8026EF0A 67802608 5EC40788 26C68B1F C4260FFF 260447FF .G.&..&á..ó&..á^.&.g.ÿ&.O..&-G.ə 000160
 8BEC8B55 CBC95EE4 2AC68B04 12548F80 06D868F9 F7000CB9 9906602D C38B1375 u..û-'..¿..%ªkÄ...T...ó*ö^èùU.š. 000180
 8EC08CF9 28D1F7AE F2FFFFB9 0A7EC4FF 758DAEF2 FFFFB9C0 33067EC4 1E0E8BD7 =.ß.á-.3â¿..·Û.u.á-.¿..·Ú%i+ª.â. 0001A0
 C28C1FFA 8BF38BA4 F3C913A5 F3E9D149 A4027400 01C6F706 468BFE87 08468ED8 Ä.F..±.F.%ó..t.ÊlÌÕµÊ.èµÊ.µ.ª..ô 0001C0
 88067EC4 D1F7AEF2 FFFFB9C0 33C08ED8 8CFE8B0A 76C51EDE 8BD78BEC 8855CB5D ]ùU.š.=.ß.év..±.Ä.â3â¿..·Ú%iá~.. 0001E0
```

Dump of file SATURN:[PCCOMMON.DUMP.DLL]SA-IMPRT.DLL;1 on 18-APR-1990 10:51:06.27
File ID (451,16,0)   End of file block 79 / Allocated 80

Virtual block number 34 (00000022), 512 (0200) bytes

```
1EDE8BD7 8BEC8B55 CB5DC28C 1FFA8BF3 8BA4F3C9 13A5F3E9 D149A402 7401A8C7 ú´.t.Êl lÕµE.èµÊ.µ.ª..ô]ÙU.‡.ª.‹. 000000
5DFA8BF3 881FFFFF 10C01805 74A6F3F9 2BD1F7AE F2FFFFB9 C0330A7E C40676C5 év.ó-.3â¿..·Ü%l+ªµlt..å.....µ.ª] 000020
1E5657EC 8B5500CB 50FA8B91 49D1F7AE F2FFFFB9 C033067E C4D78BEC 8B5500CB ù.U.‡.ªó-.3â¿..·Ü%ll..ª]ù.U.‡WV. 000040
5F5E1FC2 8CC38BAA F3C032F8 E2AA0374 C00AAC0C E30E4E8B DF8B0A76 C5067EC4 á-,év..Ô.N.D.¯.ât.¯ã½2âµ´.û.ô.^_ 000060
FE8BC803 D9F7AEF2 C033F78B 067EC4D9 8B27E30E 4E8B1E56 57EC8B55 CB5DE58B .[]ÙU.‡WV..N.D′.\ó-..%3â·Ü%l.ù.± 000080
00CB5DE5 8B5F5E1F C18BD1F7 49490474 0477FF45 3A26C933 FF448AA6 F30A76C5 év.µl.D.3è&:E.w.t.ll%l.ê.  .[]ù. 0000A0
420A47C6 26F85EC4 FE568CFC 46890E46 8DFA568C F84689EC 468D5657 000016C8 à...WV.F‡.F½.Vª.F..F•.V±ó^ ª6G.B 0000C0
FFFC76FF 167FFF04 47C72602 57892607 89260857 89260647 89260856 8B0646B8 .F..V.&.G.&.W.&..&.W.&úG.....v•. 0000E0
263F8B26 C02A1278 044FFF26 F85EC4F0 8B0CC483 03A515F0 9A53060A 76FF0C76 v..v..S.Þ.Ê..ó..Þá^½&.O.x.ªâ&.?& 000100
CBC95F5E C68B06C4 83016706 5C9A006A 53FA76FF 900FEB05 88260247 8E2607FF ..&.G.&..Š...vªSj..\.g..ó..ó^ èù 000120
5689F846 8901FE16 1B01FC06 2B02578B 26078B26 065EC403 D922C89A 000008C8 à....à").ó^.&..&.W.+.=....±..F%.V 000140
3E839045 EB99C028 0675D008 FE5689FC 468904C4 8303FE21 109A5016 F8468DFA ª.F½.P..l±..ó..F•.V±.Âu.+â.$E..> 000160
00FA5683 0E10F846 812574C0 0B04C483 041823A2 9AFC76FF FE76FF37 74000200 ...t7.v±.v•.Å#...ó..âtX.F½...Vª. 000180
8BFC468B 00011047 C726FC5E C4FE5689 FC468904 C483037A 21109A50 16F8468D .F½.P..l±..ó..F•.V±ó^•&úG....F•. 0001A0
468A50F5 468A50F6 468A0084 0000FFFF 9A5016F4 468D0CEC 83EC8B55 CBC9FE56 V±èÙU.‡.Š..F¶.P.....Ç..F-P.F%P.F 0001C0
C40A7400 087E830C C48303B7 24709A50 078C2DFA 468B50F9 468A50F8 468A50F4 ¶P.F%P.FªP.Fª-¥.P.p$ñ..ó..~..t.ó 0001E0
```

Dump of file SATURN:[PCCOMMON.DUMP.DLL]SA-IMPRT.DLL;1 on 18-APR-1990 10:51:06.27
File ID (451,16,0)   End of file block 79 / Allocated 80

Virtual block number 35 (00000023), 512 (0200) bytes

```
7F832623 7C003F83 26065EC4 56570000 08C800CB 5DE58B07 89260257 8926065E ^.&.W.&...[]ù.à...WVó^.&.?.|#&.. 000000
0A7D500A 7F832607 7C00087F 83260E7C 00067F83 26157C00 047F8326 1C7C0002 ..|.&....|.&....|.&....|.&...P). 000020
0126F9F7 000CB999 08478B26 197C0C08 7F832606 5EC49090 900081E9 99FFFFB8 ¡...Õ.....ó^.&....|.&.G..¿..%ª&. 000040
08478B26 0677FF26 0477FF26 0277FF26 37FF2608 578926F9 F7990847 8B260A47 G.&.G..%ª&.W.&.7&.w.&.w.&.w.&.G. 000060
03B09A50 16F8468D FA5689F8 46890CC4 83051024 709A5000 502D0A47 8B265040 ∂P&.G.-P.P.p$...ó..F%.Vª.F%.P.¯. 000080
F20009B9 DA8E1EF0 8BFB8BFE 568B065E C49174D0 0BFE5689 FC468904 C4830464 d..ó..F•.V±.Ât.ó^..V±.«.Þ..Õ¿..· 0000A0
8AD9F741 AEF2FFFF B9C0330F 8B067EC4 57EC8B55 CBC95F5E FA568BF8 46881FA5 Ê..F%.Vª^_èÙU.‡Wó-..Õ3â¿..·ÜA%l. 0000C0
8B560000 02C800CB 5DE58B5F C28CC78B C78EFF33 04740538 264FAEF2 FB8B0A46 F..«·ÜO&8¯t.3..ú.ú.ô .[]ù.à...V. 0000E0
0A47F626 065EC4FE 46891254 05E0D1C1 03E0D1C8 8BF9F700 0CB99906 60200646 F.-ª..¿..%ª.àlÁ.èlÁ.T..F±ó^.&-G. 000100
EB200A4F 80260874 020A47F6 26065EC4 0089E9FF FFB80674 400A47F6 26077483 .t.&-G.∂t.¡..Õ¿.ó^.&-G..t.&.O. $ 000120
000CB999 06602DC3 8B21750C 0A47F626 065E8BFB 2780FE5E 8B010A4F 802690E9 Õ.&.O...^±.′«.^.&-G..u!.û-ª..¿.. 000140
2606478B 26065EC4 12EB04C4 830235E8 0676FF06 0C750112 5487F606 D868F9F7 %ªkÄ.-.T..u...v.ÒS..ó.Š.ó^.&.G.& 000160
2A08478A 260677FF 260877FF 26065EC4 0277FFFE 5E8B0257 89260789 26085788 .W.&..&.W..^±.w.ó^.&.w.&.w.&.G.* 000180
7400047F 83261C75 FFFF3D05 74C00B04 47892606 5EC408C4 8304FD29 489A50E4 ðP.H)»..ó.ó^.&.G..ât.=..u.&....t 0001A0
07FF2637 8B26044F FF2690FF 55E90000 0447C726 0A470826 10B09003 EB20B005 .¯ Š..¯.&.G.&úG...ÕU..&.O.&.7&.. 0001C0
C38BFA46 89E42A08 478A2608 5EC45657 000008C8 CBC95EE4 2A048A26 02478E26 &.G.&..*ô^èùà...WVó^.&.G.*ô.Fª.û 0001E0
```

Dump of file SATURN:[PCCOMMON.DUMP.DLL]SA-IMPRT.DLL;1 on 18-APR-1990 10:51:06.27
File ID (451,16,0)   End of file block 79 / Allocated 80

Virtual block number 36 (00000024), 512 (0200) bytes

```
F6260774 830A47F6 26F84689 125405E0 D1C103E0 D1C88BF9 F7000C89 9906602D -ª..¿..%ª.àlÁ.èlÁ.T..F%&-G..t.&- 000000
80260E74 010A47F6 26085EC4 90012BE9 FFFFB820 0A4F8026 085EC40F 74400A47 G.∂t.ó^.&.O. ¡..Õ+..ó^.&-G..t.&. 000020
7689F08B 04478926 C02BEF0A 67802602 0A4F8026 90E2EB00 000447C7 26200A4F O. &úG...Šã.&.O..&.g.ÿ+ó&.G..Þ.v 000040
087E8137 75011254 87F606D8 68F9F700 0CB99906 6020C38B 4C750C0A 47F626FC •&-G..uL.û-ª..¿..%ªkÄ.-.T..u7.-. 000060
78208A9A FA76FF0F 75FFFF0A 7E811675 0678087E 810E7407 050A7E81 0775066C l.u..-...t..-.x.u..-...u..vª..-x 000080
C38B1575 080A47F6 26085EC4 04C48300 F7E80876 FF0A76FF 0C75C00B 02C48307 ..ó..óu..v..v.Ò%..ó.ó^.&-G..u..û 0000A0
478B2606 772B2637 8B26085E 8B677401 125487F6 06086BF9 F7000CB9 9906602D -ª..¿..%ªkÄ.-.T..tg.^.&.7&+w.&.G 0000C0
FF265256 167EF608 04478926 4802458B F87E8802 57892607 89264008 578B2606 .&.W.∂&..&.W..-%.E.H&.G..-~.VR&. 0000E0
006A026A 0F742019 C187F6FA 5E8B19EB FC468908 C4830796 2A8C9AFA 76FF0677 w..vª..ª...ó..F•Š..^ª-.è. t.j.j. 000100
468D5600 01BE17EB 07882606 468A065F C426085E C408C483 07B9274C 9A53006A j.S.L′¿..ó.ó^.&ó ..F.&..Š./..V.F 000120
5F5EE42A 06468AFE CCE90374 FC7639FC 468908C4 8306152A 8C9AFA76 FF501606 ..P.vª..ª...ó..F=9v•t.Õä±.F.*ô^_ 000140
9A0677FF 260877FF 262E7408 0A47F626 3574830A 47F62606 5EC40000 00C8CBC9 èùà...ó^.&-G..t5&-G..t.&.w.&.w.. 000160
57892606 47892602 57892607 892699C0 2BF70A67 8026065E C404C483 070F2C1A .,...ó.ó^.&.g.%+â.&..&.W.&.G.&.W 000180
E0D1C88B F9F7000C 89990660 2D04468B 185606FF 000004C8 90CBC904 47892608 .&.G.èù.à.....V..F.-ª..¿..%ª.àlÁ 0001A0
26064789 26045EC4 02C48307 F22C2F9A 020068FE 5E8CFC46 89125405 E0D1C103 .èlÁ.T...F•.^±h.../,·..ó.ó^.&.G.& 0001C0
040A4F80 26045EC4 9021EB02 000247C7 26FC5EC4 080A4F80 261174D0 08085789 .W..Ât.&.O..ó^•&úG...Šl.ó^.&.O.. 0001E0
```

Dump of file SATURN:[PCCOMMON.DUMP.DLL]SA-IMPRT.DLL;1 on 18-APR-1990 10:51:06.27
File ID (451,16,0)    End of file block 79 / Allocated 80

Virtual block number 37 (00000025), 512 (0200) bytes

```
2606478B 26045EC4 00010247 C726FC5E C4085789 26064789 2640FE56 8BFC4688 .F=.V±ã&.G.&.W.á^=&úG...á^.&.G.& 000000
613D9807 8A260A5E C4560000 0AC8C3C9 00000447 C7260257 89260789 2608578B .W.&..&.W.&úG...èùà...Vá^.&...=a 000020
9022EB00 01B901FC 46C6F628 9000EEE9 99C02813 7400773D 0C740072 3D277400 .t'=r.t.=w.t.+ã.ÕY..+-6F=.¿..Š". 000040
FC46C6FE E6830002 CE814375 0002C6F7 90F4EB01 09BE90F1 EB02FC46 C603018E ƒ..6F=.Šþ.ƒ..Š¶.%6..uC.ö...]±6F= 000060
30137400 623DD674 00283D98 078A2633 74C90837 74003F80 260A5EC4 0A46FF80 ..F.á^.&.?.t7.èt3&...=+.tø=b.t.= 000080
CE8190C4 E8C92805 74C000A9 C6889000 EB4000CE 810E75C0 00A9C688 15750074 t.u..ó`.àu..ö.ãŠÅ..ó`.ât.+èŠá..ö 0000A0
037DC00B FA468908 C4830843 278A9A06 76FF0876 FF5601A4 68FE4E89 8DEB8000 ..Š§.N±hÈ.V.v..v...'C..á..F².á). 0000C0
E001C88B F9F7000C 89990660 2DC38818 5606FF0A 478826FC 468A0E5E C4FF6AE9 Õj.á^..F=&.G...V..ù-'..¿..%².àiÅ 0000E0
000447C7 F85E8804 4789260E 5E889807 88F85E8B C02AF846 89125405 E001C103 .èlÅ.T..F½*ã.^½....^.&.G..^%úG.. 000100
8CC38808 478826FA 468A0857 89260647 89260257 89260789 2699C02B 0E5E8800 ..^.+ã.&..&.W.&.G.&.W..F²&.G..û. 000120
8B157508 0A47F626 5575023C 03240A47 8A26065E C4F62B56 000004C8 CBC95EC2 ó^èùà...V+-á^.&.G.$.<.uU&-G..u.. 000140
46890647 28260788 26065E88 39740112 5487F606 D86BF9F7 000C8999 06602DC3 ù-'..¿..%²kÅ.-.T..t9.^.&..&+G..F 000160
FC463808 C4830944 2A8C9A50 E42A0B47 8A260677 FF260877 FF265028 7EC00BFC =.â-(P&.w.&.w.&.G.*ÕP..*D..á.;F= 000180
26025789 26078926 08578826 06478826 065EC4FF FFBE200A 4F802606 5EC40874 t.á^.&.O. ƒ..á^.&.G.&.W.&..&.W.& 0001A0
06468800 001EFC06 C756570C 3830169A 010A88EC 8855C8C9 5EC68800 000447C7 úG....ó^èùU.Š¡....08.WVú.=....F. 0001C0
1EF0A31F 10A31F0A A3C02B1F 06168C1F 04A3FEF8 868D1EEC 16891EEA A3085688 .V.Èõ...š...½±È......+âÈ..È..Èþ. 0001E0
```

Dump of file SATURN:[PCCOMMON.DUMP.DLL]SA-IMPRT.DLL;1 on 18-APR-1990 10:51:06.27
File ID (451,16,0)    End of file block 79 / Allocated 80

Virtual block number 38 (00000026), 512 (0200) bytes

```
25E90375 C00AFEF6 8688078A 260A5EC4 1F001689 1EFEA310 56880E46 8B1F16A3 È...F..V.È±.....á^.&....-±.âu.Õ% 000000
08187387 F6088898 078A260A 5EC40A46 FF0AFDE8 0E177408 187387F6 DB889805 ...Ä-.s..t..Õ»..F.á^.&....Ä-.s.. 000020
F2A31F20 A31F1A16 891F18A3 991EF8A3 C02804C4 E9037425 3F80260A 5E88ED75 uÚ.^.&.?%t.Õá.+âÈ½..È......È .È· 000040
00011EF4 06C71EEE A31EFAA3 1F08A31F 0EA398F8 46881F02 A31F0CA3 1EE8A31E .ÈÒ.È..È...F½.È..È..È².ÈŸ.ú.¶... 000060
98078A26 0A5E880A 46FF1F0E 06FF0775 2A3F8026 0A5E880A 46FF0010 1EF606C7 ú.-....F..^.&.?^u......F..^.&... 000080
83C803E1 D11F0C0E 0302E1C1 1F0C0E88 98058A26 0A7E883F 74041873 87F6088B .Ä-.s..t?.-.&.......èÄ.....1Ä.à. 0000A0
06FF0674 C9080C46 8C0A7E89 08750418 7387F608 8898058A 26471F0C 0E8930E9 ÕO....G&....Ä-.s..uÄ.-..F..èt... 0000C0
1EF606C7 900AE809 74004E3D 08740046 3098078A 260A5E88 1EF206FF 04EB1F08 ..Š...·..^.&...=F.t.=N.t.Š..ú.-. 0000E0
6874006C 3D007400 683D6474 00503D3D 74004C3D 98078A26 0A5E880A 46FF0010 ...F..^.&...=L.t==P.td=h.t.=l.th 000100
74011873 87F6088B 98078A26 0A5EC40A 46FF0001 1EF406C7 900AE855 7400703D =p.tUŠ..ú.¶....F.á^.&....Ä-.s..t 000120
F61B7466 FE83F08B 98078A26 0A5E880A 46FF9048 E8002005 98078A26 0A5E8840 M.^.&.......ŠH..F..^.&....Þ.±ft.- 000140
00021EF4 06C70875 67FE8305 7465FE83 F08BC68B 9003E820 448D0674 01187384 .s..t..D Š...ó.Þ.±et..±gu.ú.¶... 000160
FF0085E9 03745BFE 83F08898 078A260A 5EC490ED EB0A46FF 90AAEB0A 4EFFAFEB ŠÉ.N.Š`..F.ŠÚ.á^.&....Þ.±[t.Õ... 000180
0636FF50 98F8468A 0100680A 46FFF846 FE06755E 3F80260A 5E880A46 FF1EFA06 .².F..^.&.?^u.±F½.F.h...F½.P.6. 0001A0
078A260A 46FF3275 5D3F8026 0A5EC401 F8768008 C4830CDA 2DAE9A1F 0436FF1F ..6...Ù-Ö..á..v½.á^.&.?]u2.F.&.. 0001C0
C4D88898 078A261C 745D3F80 260A5EC4 901DE801 8826F846 8A1F043E C4D88898 ..Äá>...F½&..Š..á^.&.?]t.&....Äá 0001E0
```

Dump of file SATURN:[PCCOMMON.DUMP.DLL]SA-IMPRT.DLL;1 on 18-APR-1990 10:51:06.27
File ID (451,16,0)    End of file block 79 / Allocated 80

Virtual block number 39 (00000027), 512 (0200) bytes

```
02EB0073 88057400 3F80260B 75003F80 260A5EC4 0A46FF01 8826F846 8A1F043E >...F½&...F.á^.&.?.uÜ&.?.t.¡s.Š. 000000
742DFE83 F08B08C2 E80E08F6 E80E0001 1F0206C7 009EE903 7469FE83 F08BC02B +â.Þ.±it.Õ..ú......Õ-..Õõ..Þ.±-t 000020
36FF1F16 0EFF9016 EB1F2006 FF1F0C0E FF1EF806 FF04752D FE831475 28FE8305 ..±+u..±-u...½....... .Š.......6 000040
E80E1F20 06FF3875 30FE83F0 880889E8 0E06C483 00140170 9A561EEA 36FF1EEC &..6õ.V.p....á..Õ...Þ.±0u8.. ..Õ 000060
1EEA36FF 1EEC36FF 1F160EFF 9037E800 788E0675 58FE8305 7478FE83 F0880B7A z..Þ.±xt..±Xu.ƒx.Š7......6š..6õ. 000080
9A561EEA 36FF1EEC 36FF1F16 0EFF18EB 006FBE1E EE06FF06 C4830032 01709A56 V.p.2..á...Ÿ.ƒo.Š......6š..6õ.V. 0000A0
C003023D E9037600 15300063 2DC68802 75E90375 F6080064 8E06C483 0A080170 p....á.ƒd..-u.Õu..ó-c.=..v.Õ=..â 0000C0
E902C483 027EE80E 006A1F08 A31F0CA3 0001B809 75001F08 3E830F48 A7FF2E93 ...ÏH..>...u.¡..È..È..¡..Õ-..á.Õ 0000E0
1F12A31F 001681E 0EA1F6E8 086AEAEB 03ACE80E 0A6A1EE8 06FFF2EB 016A0202 ..j.Š-..Õ.j..Õ¯.Šõj.Š-Å±.....È.. 000100
C4137510 1EF63E83 1F001E8C 1EFEA31F 1C881F1E 1E8C1F1C A31F2288 1F141689 ....¡".È......¡..È±.......>-..u.á 000120
6AFE5E8C FC468907 88261F12 1EC400EB FE5689FC 46890257 8826078B 261F121E ...&..&.W..F=.V±Š.á...&...F=.^±j 000140
1F26881F 100EFF04 75001F0E 3E830084 E9037402 1EF43E83 02C48303 57E80E10 ..ÕW..á..>¶..t.Õ...>...u.....¡&. 000160
1AA3C028 2A753AFE 83F08807 67E80E1F 001E8C1E FEA31F1C 881F1E1E 8C1F1CA3 È.......¡..È±.......Õg..Þ.±:u"+âÈ. 000180
89260789 261F2816 081F26A1 1F22168B FC5EC402 C4830312 E80E106A 1F18A31F .È..j..Õ...á.á^=...".Ä&...(.&..&. 0001A0
001F103E 8306C483 0EFE0170 9A561EEA 36FF1EEC 36FF1F16 0EFF9090 38EB0257 W.Š;........6š..6õ.V.p.±..á..>... 0001C0
83078926 1F22A1FC 5EC49001 81E9FFFF 880157E9 0374001F 0A3E8301 61E90374 t.Õa..>....t.ÕW.¡..Õ....á^=Å".&... 0001E0
```

```
Dump of file SATURN:[PCCOMMON.DUMP.DLL]SA-IMPRT.DLL;1 on 18-APR-1990 10:51:06.27
File ID (451,16,0)   End of file block 79 / Allocated 80

Virtual block number 40 (00000028), 512 (0200) bytes

 0374101E F63E831F 0016891E FEA31F14 16881F12 A1021F12 06832675 001F0E3E >...u&.....À......Ê±......>-..t. 000000
 3E839000 C7E91F00 16891EFE A31F1416 881F12A1 90000 9E9 021EFE06 8300E1E9 ÕÄ...±..Õ1..À......Ê±.....Õú...> 000020
 83F08806 9FE80E06 D3E80E00 011F0206 C77E7500 1EEE3E83 0085E903 74001F20  ..t.Õ...>Ÿ..u-ú......ÒÆ..Ò...Þ. 000040
 0EFF9090 17EB1F20 06FF1F0C 0EFF1EF8 06FF0475 2DFE8315 752BFE83 05742DFE ±-t..±+u..±-u...½....... .Š..... 000060
 E80E1A75 30FE83F0 880665E8 0E06C483 0F380170 9A561EEA 36FF1EEC 36FF1F16 ...6š..6ŏ.V.p.8..6..Òe..Þ.±0u..Ò 000080
 1EEC36FF 1F160EFF 1EEE06FF 19EB1F20 06FF0675 58FE8305 7478FE83 F08B065A Z..Þ.±xt..±Xu... .Š...Ÿ......6š. 0000A0
 0F420F42 007A0056 2CE803CA E80EFE3A E9106A06 C4830A43 01709A56 1EEA36FF .6ŏ.V.p.C..6.j.Õ:±.Òò.Š,V.z.B.B. 0000C0
 0F88007A 0F880072 0F880F8B 00860082 00760F8B 0F880F8B 0F880F8B 0F880F42 B.............v.........r...z... 0000E0
 8A260A5E C42B7400 3F80260A 5EC49041 E81F0A06 FF2A7500 1EFC3E83 0EAE0F8B ..Û..>=..u*....ŠA.6^.&.?.t+6^.&. 000100
 1F0A3E83 0A75001F 103E8311 7401FE83 1C74F608 F08B02C4 830598E8 0E509807 ..P.Ò...6..Þ.-t..±.t..>...u..>.. 000120
 3E830E75 1F100639 1EF0A10A 46FFFFFF 1EF006C7 902BEB1F 10A1FEA9 E9037500 .u.Õ`±À..Š+.ú.Þ....F.ÀÞ.9...u..> 000140
 56570000 0AC8CBC9 5F5E90FA 98E91EF0 A31F10A1 DA74001F 0E3E8300 75001EFC •..uÀ.>...tÖÀ..ÈÞ.Õ.•.^_èùà...WV 000160
 88261EFE 1EC400EB FE5689FC 46890257 88260788 261EFE1E C4137510 1EF63E83 .>-..u.6.±.&..&.W..F=.V±Š.6.±.&. 000180
 83021EFE 06831175 001F0E3E 83F85689 F64689FE 568BFC46 8BFE5E8C FC468907 ..F=.^±.F=.V±.F-.V½.>...u...±... 0001A0
 1EF23E83 0550E80E 0475001E FA3E8308 7400067E 83021EFE 06830575 101EF63E >-..u...±...-..t..>•..u..ÒP..>·. 0001C0
 833974C0 0808F7C0 1801F980 C88B0824 1873848A 9026EB06 7E880002 E9037400 .t.Õ#..-.Š&...s.$..à.•..ä¼Á.ât9. 0001E0

Dump of file SATURN:[PCCOMMON.DUMP.DLL]SA-IMPRT.DLL;1 on 18-APR-1990 10:51:06.27
File ID (451,16,0)   End of file block 79 / Allocated 80

Virtual block number 41 (00000029), 512 (0200) bytes

 40F08804 DFE80E1F 74C00805 40E80EFC 46FF0788 26C68BFC 5EC40875 001F0E3E >...u.6^=.6&...F=.ÒM..ât..ÒÕ..Þ@ 000000
 FC06FF07 75FFFE83 90C4E898 008A261F 041EC48F 74001EFA 3E830974 FF081674 t...t1.>•..t«6...&...Š6..±.u...= 000020
 C40F7400 1EFA3E83 2375001F 0C3E832A 74001F08 3E834674 00067E83 904DEB1E .ŠM..~..tF.>...t*.>...u#.>•..t.6 000040
 FF1F160E FF1574C0 08000825 E42A1873 848A900A EB08F7C0 18013880 261F041E ...&.8..ä¼ÀŠ....s.*Õ%...ât...... 000060
 F64639FE 568BFC46 88217500 1F0E3E83 06C48311 8001709A 561EEA36 FF1EEC36 6š..6ŏ.V.p.¯..6..>...ul.F=.V±9F- 000080
 000006C8 CBC95F5E 0007C626 FC5EC407 7400067E 831F1006 FF1174F8 56390575 u.9V½t......~..t.6^=&6..^_èùà... 0000A0
 74001EF2 3E830452 E80E0475 001F023E 830130E9 0374001E E83E8306 76885657 WV.v..>Ò..t.Õ=..>...u..ÒR¯..>·..t 0000C0
 E9037400 1EEE3E83 00C5E903 74001F20 3E83019C E9018 0E9 0374001F 0E3E8300 ..>...t.Õ¯.Õ...> ..t.Õé..>Ÿ..t.Õ 0000E0
 0EFF1EF8 06FF0475 2DFF8300 AEE90374 2BFF8308 7420FF83 F88B03F6 E80E008B Ê..Ò-..½..-t...+t.ÕÙ...-u...½... 000100
 2FF49A1F 1868036A 0C7D38FF 834D7508 FE830080 E9F82800 30B89000 98E91F0C ..Õ...¡0.+½Õ...±.uM..8).j.h...¶/ 000120
 3E8306C4 83126001 709A571E EA36FF1E EC36FF1F 160EFF15 74FFFF83 67EB11C9 è.Šg...t......6š..6ŏ.W.p.'..6..> 000140
 0098E91F 1A16891F 18A30AF7 00028308 F71F1A16 881F18A1 0080E903 75001EF8 ½..u.Õ¯.À......¼Á.#.¼ÕÊ......Õ.. 000160
 1F1A1613 1F180603 F875C9FE D201E001 02B11F1A 16881F18 A18D7404 187385F6 -.s..t§À......Ÿ.1À1#±èu½........ 000180
 38E80E1E EE06FF1F 1A16111F 18060199 C78830EF 831F1A16 891F18A3 D2D1E001 1À1#Ê.......ÿ0.ú...........Ÿ..Ò; 0001A0
 FF64E903 75801873 85F6FF6E E90375FF FF83FF76 E90375C0 08039BE8 0EF88803 ..½.Ò...âu.Õv....u.Õn.-.s..u.Õd. 0001C0
 187385F6 20C78303 74011873 85F60E46 2FF49A1F 1868046A FF46E903 7410FE83 .±.t.ÕF.j.h...¶/F.-.s..t..ú -.s. 0001E0

Dump of file SATURN:[PCCOMMON.DUMP.DLL]SA-IMPRT.DLL;1 on 18-APR-1990 10:51:06.27
File ID (451,16,0)   End of file block 79 / Allocated 80

Virtual block number 42 (0000002A), 512 (0200) bytes

 837C7500 1F0E3E83 00001F1A 06C71F18 A31F16A1 FF1DE900 57B8FF20 E9037502 .u.Õ .¡W.Õ..À..Ê..ú......>...u|. 000000
 89025788 26078826 1EFE1EC4 1475101E F63E835D 74001EE8 3E830775 001EEE3E >Ÿ..u..>Ò..t].>-..u.6.±.&..&.W.. 000020
 A1FC5EC4 1475021E F43E83FE 5E8CFC46 89078826 1EFE1EC4 900EEBFE 5689FC46 F=.V±Š..6.±.&...F=.^±.>¶..u.6^=À 000040
 0675001E E83E8307 89261F18 A1FC5EC4 900AEB02 57892607 89261F1A 16881F18 ......&..&.W.Š..6^=À..&...>Ò..u. 000060
 90CBC95F 5E021EFE 06830575 101EF63E 83021EFE 06831F0E 06FF04EB 1F1006FF ....Š.......±...>-..u...±..^_èù. 000080
 01D8E903 74001F0E 3E830E74 001EF23E 83027DE8 0E0000F6 46C75657 000052C8 àR..WVúF-...Ò)..>·..t..>...t¯ÕÁ. 0000A0
 FE83F08B 0220E80E B05689AE 46890040 05D28CFA 568CF846 89844680 9001C4E9 Õ6...FÇ.F½.V•.#.ə..FÛ.V¯.Ò ..Þ.± 0000C0
 01FCE80E 1F0C0EFF 078826C6 8BF846FF F85EC408 752DFE83 1A752DFE 8305742B +t..±-u..±-u.6^½.F½.6&.......Ò=. 0000E0
 0EF846FF 078826C6 8BF85EC4 471E73F8 46398056 88AE4688 901EEBF6 7E8BF08B .Þ.—Š...FÕ.V¯9F½s.Gá^½.6&...F½. 000100
 74C00802 25E80E40 752EFE83 F67E8907 75C00802 C4830172 E80E56F0 88010 9E8 Ò1..ÞV.Òr..6..âum.—.±.uM.ÒX..ât 000120
 B0568BAE 46889018 E8078826 C68BF846 FFF85EC4 3A73F846 39805688 AE468845 E.FÛ.V¯9F½s:6^½.F½.6&..Š...FÛ.V¯ 000140
 0802C483 0120E80E 56F08801 87E80EF8 46FF0788 26C68BF8 5EC4471E 73F84639 9F½s.Gá^½.6&...F½.Ò...ÞV.Ò ..6.. 000160
 74C00801 C5E80E78 7545FE83 057465FE 830085E9 037500F6 7E83F67E 890775C0 âum.—.-—.u.Õ...±et..±Eu(.Òé..ât 000180
 2DFE83F0 880141E8 0E078826 C688F846 FFF85EC4 6873F846 39805688 AE468873 s.FÛ.V¯9F½sh6^½.F½.6&...ÒA..Þ.±- 0001A0
 C42373F8 46398056 88AE4688 2E752DFE 833974C0 080197E8 0E41752B FE830574 t..±+uA.Ò...ât9.±-u..FÛ.V¯9F½s#6 0001C0
 FF078826 C688F85E C41D73F8 46398056 88AE4688 16E80788 26C688F8 46FFF85E ^½.F½.6&..Š..FÛ.V¯9F½s.6^½.6&... 0001E0
```

```
Dump of file SATURN:[PCCOMMON.DUMP.DLL]SA-IMPRT.DLL;1 on 18-APR-1990 10:51:06.27
File ID (451,16,0)   End of file block 79 / Allocated 80

Virtual block number 43 (0000002B), 512 (0200) bytes

 1EEA36FF 1EEC36FF 1F160EFF 0875C008 02C48300 8FE80E56 F08800F6 E80EF846 F½.ò-..þV.Ò...á..âuÄ.....6š..6õ. 000000
 F63E8300 07C626F8 5EC45174 00F67E83 6875001F 0E3E8306 C4831560 01709A56 V.p.'..á..>...uh.--.tQá^½&6...>- 000020
 89078B26 1EFE1EC4 900EEBFE 5689FC46 8902578B 26078B26 1EFE1EC4 1475101E ..u.á.±.&..&.W..F=.V±Š..á.±.&... 000040
 18601EFF 261C0006 8E500002 251EF4A1 FC76FFFE 76FF5016 B44680FE 5E8CFC46 F=.^±.FÇ.P.v±.v=À¶.X..P....&..'. 000060
 000000C8 CBC95F5E 021EFE06 83057510 1EF63E83 021EFE06 831F1006 FF0AC483 .á.......±...>-..u...±..^_èùà... 000080
 C02B9003 E80001B8 0674C00B 00AEE80E 0E740418 7387F606 5E8B1874 FF067E83 .-..t..^.-.s..t..ÒÜ..ât.¡..Š..+ã 0000A0
 18EBFFFF B80575FF FE8322EB C02B0475 06763BF0 8B0031E8 0E560000 02C8CBC9 èùà...V.Ò1..Þ;v.u.+áŠ".±.u.¡..Š. 0000C0
 1606FF56 90CBC95E 0001B806 C4831594 01709A56 1EEA36FF 1EEC36FF 1F160EFF .....6š..6õ.V.p....á.|..^èù.V... 0000E0
 1EEC36FF 00E8E42A 048A2602 478E2607 FF26378B 26117804 4FFF261E EA1EC41F .á.õ.&.O.x.&.7&..&.G.&..*õŠ..6š. 000100
 FE83F375 08187384 F6F088FF C7E80E56 000002C8 90C85E04 C48315CA 056A9A53 S.j.ò..á.^ù.à...V.Òú..Þ-.s..uµ.± 000120
 5E06C483 10FB0170 9A561EEA 36FF1EEC 36FF1F16 0EFF9016 EB1EFC06 FF0775FF .u...*.Š.......6š..6õ.V.p.«..á.^ 000140
 90CBC02B 90EEEB1F 0C0EFF07 7E001F0C 3E8310EB 0001B805 75001F08 3E83CBC9 èù.>...u.|..Š..>...~.....ŠY.+âù. 000160
 16891F46 A310568B 0E468B1F 581E8C1F 56A31F5C B8149430 169A000A B8EC8B55 U.š¡....0..|\.ÈV...X..F..V.ÈF... 000180
 7E80038D E900001F 5006C700 001F5206 C71F2E16 891F2CA3 08568B06 468B1F48 H..F..V.È,.....ú.R...ú.P...Õ...~ 0001A0
 4AA31F4C A31F34A3 1F4EA31F 32A31F36 A3C02800 011F5406 C7030BE9 037425F6 -X±.Õ..ú.T...+âÈ6.È2.ÈN.È4.ÈL.ÈJ 0001C0
 BC06C70A 46FF4975 30017F80 260A5EC4 0020208C 06C71F44 A31F2AA3 1F30A31F .ÈO.È*.ÈD.ú.¥  .á^.&...OuI.F.ú.¥ 0001E0

Dump of file SATURN:[PCCOMMON.DUMP.DLL]SA-IMPRT.DLL;1 on 18-APR-1990 10:51:06.27
File ID (451,16,0)   End of file block 79 / Allocated 80

Virtual block number 44 (0000002C), 512 (0200) bytes

 203F8026 9028EB00 001F4A06 C71F3606 FF0D752B 3F80260A 5E88903E EB003020  0.Š>..^.&.?+u...6.ú.J...Š(.&.?  000000
 FFC7752D 3F80260A 5EC400EB 1F2A06FF 9014EB1F 4A06FF1A 75001F36 3E830E75 u..>6..u...J.Š....*.Š.á^.&.?-uú. 000020
 1E0A76FF 0C76FFDD 75C00802 C4830978 E80E5098 078A260A 5E880A46 FF1F4406 .D..F..^.&...P.Òx..á..âuï.v..v.. 000040
 D8F71F5A A11F4406 FF0C7D00 1F5A3E83 0C56890A 468908C4 8308C7E8 0E1F5A68 hZ..Òú..á..F..V..>Z..)...D.ÀZ.%Á 000060
 2D752E3F 80260A5E C4002020 8C06C706 753020BC 3E830D74 001F443E 831F5AA3 ÈZ..>D..t..>¥ Ou.ú.¥  .á^.&.?.u- 000080
 1F543E83 0C56890A 468908C4 83087BEB 0E1F5468 1E0A76FF 060A46FF 1F4C06FF ..L..F...v..hT..Ò(..á..F..V..>T. 0000A0
 683D4074 004E3D3D 7400463D 98078A26 0A5EC41F 4C0EFF00 011F5406 C70A7D00 .).ú.T.....L.á^.&...=F.t==N.t@=h 0000C0
 46FF0375 4C3F8026 0A5EC409 75001F34 3E830002 1F3406C7 0675006C 3D2B7400 .t+=l.u.ú.4....>4..u.á^.&.?Lu..F 0000E0
 06C7D0E8 00101F34 06C7D8EB 00011F34 06C79002 4EE91C75 003F8026 0A5EC40A .á^.&.?.u.ÕN..ú.4...ŠÄú.4...ŠÀú. 000100
 1F3206FF 08750058 3D057400 47300A74 00453DF8 46899807 8A26C8EB 00081F34 4...Šà&....F½=E.t.=G.t.=X.u...2. 000120
 253D0152 E9037E01 3FE90375 00633D01 91E9037E 78740069 3DF84688 20F84683 .F½ .F½=i.tx~.Õ..=c.u.Õ?.-.ÕR.=% 000140
 C7260789 261F50A1 1FC4261F 461EC415 75021F34 3E839001 59E90140 E9037500 .u.Õ@.ÕY...>4..u.á.F.&á.ÀP.&..&ú 000160
 E9037500 1F523E83 041F4606 83078926 1F50A11F C4261F46 1EC400EB 00000247 G...Š.á.F.&á.ÀP.&....F...?..u.Õ 000180
 01ACE9FF FFB801AF E9037520 0A47F626 1F2C1EC4 01BDE903 74001F50 3E830170 p..>P..t.Õ§.á.,.&-G. u.Õ€....Õ¯. 0001A0
 06FF1F30 06FFF2EB 086A90C3 EB02C483 019EE80E 0A6A0000 1F2A06C7 1F4ED6FF ..N.ú.*...j..Ò...á.Šù.j.Š-..u... 0001C0
 A3C02B7A 74011F34 3E830081 E9037508 1F343E83 00041F54 06C71F4C 06FF1F32 2...L.ú.T....>4..u.Õ...>4..tz+âÈ 0001E0

Dump of file SATURN:[PCCOMMON.DUMP.DLL]SA-IMPRT.DLL;1 on 18-APR-1990 10:51:06.27
File ID (451,16,0)   End of file block 79 / Allocated 80

Virtual block number 45 (0000002D), 512 (0200) bytes

 13EB0000 1F5A06C7 0A74001F 443E83FA 46891F5A A128741F 5A0639FA 46891F34 4..F*9.Z.t(ÀZ..F*.>D..t.ú.Z...Š. 000000
 C4830130 E80E106A 021F4606 831F5AA3 C02B027D C00B1F5A A1051F5A 2E839090 ....Z..ÀZ..á).+âÈZ...F..j..ÒO..á 000020
 1F5AA300 052DFA46 8B157400 1F443E83 227400FA 7E8302C4 83048DEB 0E3A6A02 .j:.Ò...á..-*.t".>D..t..F*-..ÈZ. 000040
 02C48300 F1E80E10 6A041F46 2E830000 1F5A06C7 9007EB1F 5AA3C02B 027DC00B .á).+âÈZ.Š..ú.Z.....F..j..Òþ..á. 000060
 0EF876FF F4EB016A 90FF39E9 026EE80E 006A90FF 3FE9106A FF10E902 1F460683 ..F..Õ..j.Õ?..j..Òn.Õ9..j.Š¶.v½. 000080
 00673D05 7C00653D FF0CE903 7500643D 90FF21E9 0428E80E 256AFF2A E90349E8 ÒI.Õ*.jX.Ò(.ÕI..=d.u.Õ..=e.|.=g. 0000A0
 E8FE5689 FC468940 0C56880A 46880A4E FF0C568B 0A468809 74001F34 3E83DA7E -Õ.>4..t..F..V..N..F..V.@.F=.V±Š 0000C0
 3D8F7400 733DFEE0 E9037500 703DFEE4 E9037500 6F3DFE80 E9037500 6E3D903A :.=n.u.Õ.±=o.u.ÕÒ±=p.u.ÕÀ±=s.t.= 0000E0
 8A26FC5E C4FC46FF 9034EB0A 46FF90B1 EBFF79E9 03750078 3DFEB9E9 03750075 u.u.Õ¿±=x.u.Õy.ŠY..F.Š4..F=á^=&. 000100
 8806C483 044CE80E 0A76FF0C 76FF500A 462BC38B EC75253C 0474C00A F6468807 ..F-.ât.<%uš.ú+F.P.v..v..ÒL..á.. 000120
 261F2C1E C4FC63E9 0374C00A F6468807 8A260A5E C40C5689 0A4689FE 568BFC46 F=.V±.F..V.á^.&...F-.ât.Õc=á.,.& 000140
 2020BC06 C7067400 1F4C3E83 56570000 12C8CBC9 1F50A1FE 51E90374 200A47F6 -G. t.ÕQ±ÀP.èùà...WV.>L..t.ú.¥ 000160
 0788261F 461EC419 75101F34 3E830774 021F343E 831F4E06 FF04740A 067E8300 ..~..t...N..>4..t..>4..u.á.F.&.. 000180
 0788261F 461EC411 74001F4E 3E83902C EB041F46 0683FE56 89FC4689 02578B26 &.W..F=.V±..F..Š,..>N..t.á.F.&.. 0001A0
 2A3E8302 1F460683 FE5689FC 46899907 8B261F46 1EC40EEB 0000FE46 C7FC4689 .F=úF±..Š.á.F.&....F=.V±..F...>* 0001C0
 46891F58 16881F56 A1208AA3 C02B9003 EB064688 0674FE46 0BFC4688 0E74001F ..t..F=.F±t..F.Š..+âÈ¤ ÀV...X..F 0001E0
```

```
Dump of file SATURN:[PCCOMMON.DUMP.DLL]SA-IMPRT.DLL;1 on 18-APR-1990 10:51:06.27
File ID (451,16,0)   End of file block 79 / Allocated 80

Virtual block number 46 (0000002E), 512 (0200) bytes

 07C626F2 46FFF25E C41D750A 067E832B 7D00FE7E 83317500 1F4E3E83 F45689F2 ·.V¶.>N..u1.~±.)+.~..u.á^·.F·&6. 000000
 00F646C7 9006EB00 01F646C7 FE5689FC 4689DAF7 0002B3D8 F7FE568B FC468B2D -.F▪.V±XÄ.@.XÖ.F▪.V±úF-..Š..úF-. 000020
 4C3E830A C4831ADD 2CEE9AFC 76FFFE76 FF501E06 76FFFA5E 8CFB4689 1F38B800 .¡ß..F½.^*.v..P.v±.v▪.Ÿ,Ì..ó..>L 000040
 83007EC9 0BF04E89 C82B1F54 0E8B04C4 8315F902 B29AF876 FFFA76FF 4574001F ..tE.v*.v½.ý.*..ó...T.+à.NÞ.è~.. 000060
 F47FC008 49C18847 3005C626 05EBF27E C4F04E8B 0000208A 06C70675 0820BA3E >¤ .u.ú.¤ ...NÞó~·Š.&6.0G.èI.ó.¶ 000080
 3C0774C9 0B048807 8A26F85E C4F276C5 EE5E8C1F 320E8BF0 4E89F446 8CF27E89 .~·.F¶.NÞ..2..^Ÿév·ó^½&.....èt.< 0000A0
 1475001F 4E3E83EE 5E8EF45E 8CF27689 E375003F 8026F846 FF46202C 80037C61 a|.., F.F½&.?.uD.v·.^¶.^Ÿ.>N..u. 0000C0
 5F5E02C4 8302FFE8 0E50C02B 02E80001 B8057500 F67E830B 741F4A06 0B1F36A1 Àó...J.t..~~.u.¡..Š.+óP.Ò...ó.^_ 0000E0
 0683FA56 89F84689 1F48168B 1F46A100 01BE1874 00067E83 56570000 10C8CBC9 èùà...WV.~..t./..ÀF...H..F½.V*.. 000100
 10EBFA56 89F84689 02578B26 078B261F 461EC413 74081F34 3E83008F E9021F46 F..Õ...>4..t.ó.F.&..&.W..F½.V*Š. 000120
 0BF8468B 0E74081F 343E8304 1F46068B FA5E8CF8 4689FC46 89078B26 1F461EC4 ó.F.&...F▪.F½.^*..F...>4..t..F½. 000140
 89FA568B F8468BFA 5E8CF846 89010188 097500FC 7E83900A EB01CA8B 1575FA46 F*u.¡ò.Š...~▪.u.¡Ì..F½.^*.F½.V*. 000160
 1574003F 8026F246 FFF25EC4 900EEB1F 540E881C 741F4C36 39F62BF4 5689F246 F·.V¶+-96L.t...T.Š..ó^·.F·&.?.t. 000180
 001F443E 83FE281F 5A3E8BF3 75003F80 26F246FF F25EC446 90EDEB10 7ECE3B46 F;ö~.ŠÚ.Fó^·.F·&.?.uж.>Z.+±.>D.. 0001A0
 57087400 1F443E83 06C48301 83E80EF8 76FFFA76 FF5602C4 830159E8 0E570875 u.W.ÒY..ó.V.v*.v½.Ò°..ó..>D..t.W 0001C0
 067E83FE 5689FC46 891F4816 881F46A1 000006C8 90CBC95F 5E02C483 013CE80E .Ò<..ó.^_èù.à...ÀF...H..F▪.V±.~. 0001E0

Dump of file SATURN:[PCCOMMON.DUMP.DLL]SA-IMPRT.DLL;1 on 18-APR-1990 10:51:06.27
File ID (451,16,0)   End of file block 79 / Allocated 80

Virtual block number 47 (0000002F), 512 (0200) bytes

 00061F54 06C70675 001F4C3E 83FA4688 C02A9003 EB01B005 7547067E 83067467 gt..~.Gu.¯.Š..*à.F*.>L..u.ú.T... 000000
 36FF0676 FF1F5436 FF1F3236 FF00011F 5406C706 75001F54 3E830D74 00FA7E80 .~*.t..>T..u.ú.T....62..6T..v..6 000020
 3E831B74 00FA7E80 0EC48318 581EFF26 1C02068E FC76FFFE 76FF1F56 36FF1F58 X..6V..v±.v▪....&..X..ó..~*.t..> 000040
 1B74001F 2A3E8304 C483185C 1EFF261C 02068E1F 5636FF1F 5836FF14 75001F2A *..u..6X..6V.....&..\..ó..>*..t. 000060
 081F4606 8304C483 18641EFF 261C0206 8E1F5636 FF1F5836 FF147500 1F543E83 .>T..u..6X..6V.....&..d..ó...F.. 000080
 C4831868 1EFF261C 02068EFC 76FFFE76 FF1B741F 4A060B1F 36A10000 208A06C7 ú.¤ ..Àó...J.t..v±.v▪....&..h..ó 0000A0
 3C75001F 523E8356 000000C8 90CBC901 29E80E50 C02B02EB 0001B805 74C00804 ..ât.¡..Š.+âP.Ò).èü.À...V.>R..u< 0000C0
 36FF10EB E42A0488 2602478E 2607FF26 378B2606 468A1478 044FFF26 1F2C1EC4 ó.,.&.O.x..F.&.7&..&.G.&..*ôŠ..6 0000E0
 90CBC95E 1F5006FF 9005EB1F 5206FF07 754006C4 8310B506 5C9A0676 FF531F2E ..Š.v..\.ç..ó.ðu...R.Š....P.^èü. 000100
 36FF1F2C 36FF1F2E 36FF1BEB 507EF60B 06768B57 75001F52 3E835657 000002C8 à...WV.>R..uW.v..~~PŠ..6...6,..6 000120
 044FFF26 1F2C1EC4 1E7EC008 4EC68B1F 5206FF04 754006C4 831E1D06 5C9A208C ¥ .\....ó.ðu...R..6N.ê~.ó.,.&.O. 000140
 06468B07 75001F52 3E8304EB E42A0588 2602478E 2607FF26 3F8B2620 BCA00478 xô.¥ &.?&..&.G.&..*ôŠå.>R..u..F. 000160
 36FF1F2E 36FF22EB 5E75001F 523E830A 76885657 000002C8 CBC95F5E 1F500601 ..P.^_èùà...WV.v..>R..u^Š".6...6 000180
 0B4EC68B 0646FF1F 5206FF04 754006C4 831E8F06 5C9A5098 078A2606 5EC41F2C ,.ó^.Ï...P.\....ó.ðu...R..F..6N. 0001A0
 478E2607 FF263F8B 261F2C1E C4078A26 065EC4CD 78044FFF 261F2C1E C42574C0 âtXó.,.&.O.xëó^.&..ó.,.&.7&..&.G 0001C0
 A1560000 0CC8CBC9 5F5E1F50 06010A46 88077500 1F523E83 CAEBE42A 05882602 .&..*ôŠò.>R..u..F...P.^_èùà...VÀ 0001E0

Dump of file SATURN:[PCCOMMON.DUMP.DLL]SA-IMPRT.DLL;1 on 18-APR-1990 10:51:06.27
File ID (451,16,0)   End of file block 79 / Allocated 80

Virtual block number 48 (00000030), 512 (0200) bytes

 C802B29A F476FF52 1F5A368B FA4689FC 4689C02B F65689F4 46891F58 16881F56 V...X..F¶.V~+à.F▪.F*.6Z.R.v¶.ý.à 000000
 4E017508 20BA3E83 08EB02EE 83057510 20BA3E83 06762BF0 2BF84689 04C4831A ..ó..F½+Þ+v..>¤ .u..Ÿ.Š..>¤ .u.N 000020
 0E509807 8A26F446 FF127530 20BC3E83 19752D3F 8026F45E C4227500 1F443E83 .>D..u"ó^¶&.?-u..>¥ Ou..F¶&...P. 000040
 7400067E 831B7400 1F443E83 077EF608 08743020 BC3E83F8 4EFF02C4 83FE71E8 Òq±.ó..N½.>¥ 0t..~~..>D..t..~..t 000060
 E80E5629 75001F44 3E830070 E80EFC46 FF077400 20BA3E83 0066E80E FA46FF07 ..F*.Òf..>¤ .t..F▪.Òp..>D..u)V.Ò 000080
 00FC7E83 0A740020 BA3E8300 39E80E04 7500FA7E 830A7400 067E8302 C483FE7E ~±.ó..~..t..~*.u..Ò9..>¤ .t..~▪. 0000A0
 BC06C70E 74001F44 3E8306C4 83FEB5E8 0EF476FF F676FFF8 76FF0040 E80E0475 u..Òð..v½.v~.v¶.Òç±.ó..>D..t.ú.¥ 0000C0
 E80E5000 208803EB 002BB805 74001F36 3E83CBC9 5E02C483 FE38E80E 56002020  .V.Òß±.ó.^èù.>6..t.¡+.Š.¡ .P.Ò 0000E0
 0058B805 74001F32 3E831775 10208A3E 8302C483 FDCBE80E 306AC802 C483FD02 @».ó.ùj0.Òà».ó..>¤ .u..>2..t.¡X. 000100
 2A3F8026 0A5EC400 01FE46C7 56570000 06C8CB02 C483FDAA E80E5000 788803EB Š.¡x.P.Ò`».ó.ùà...WVúF±..ó^.&.?* 000120
 FE46C708 752D3F80 260A5EC4 9060EB0A 46FF021F 46068337 88261F46 1EC41275 u.ó.F.&.7..F...F.Š'.ó^.&.?-u.úF± 000140
 303C0A75 1F4C3639 3B7F393C 3F7C303C FA468807 8A260A5E 8BF6280A 46FFFFFF ...F.+-.^.&...F*<0|?<9.;96L.u.<0 000160
 03E1D1CE 0302E1C1 CE889805 8A261B7F 39308026 06EBFB8B 0030208C 06C70675 u.ú.¥ 0..▪Š.&.=9..&....öêÃ..öíÃ. 000180
 37B92606 5EC4F08B EEF7FE46 8B0C468C 0A7E89DF 7D303080 2647F188 30E983C8 à.Õ0.þG&.=0)Ô.~..F..F±XŸ.Þó^.&.7 0001A0
 01EBFC7E C4064E8A FE5E8CFC 468901D8 B8570000 04C8CBC9 5F5E0C56 8B0A468B .F..V.^_èùà...W¡Ã..F▪.^±.N.ó~▪Š. 0001C0
 C02BFE46 8CFC7E89 9009EBFE 468CFC7E 890001B8 F4750038 26117400 30802647 G&.▪.t.Ï8.u¶¡...~▪.F±Š...~▪.F±+à 0001E0
```

```
Dump of file SATURN:[PCCOMMON.DUMP.DLL]SA-IMPRT.DLL;1 on 18-APR-1990 10:51:06.27
File ID (451,16,0)    End of file block 79 / Allocated 80

Virtual block number 49 (00000031), 512 (0200) bytes

478926C0 2B257583 0A47F626 FC5EC4FE 5E8CFC46 89066088 000004C8 90CBC95F  _èù.à...¡'..F=.^±ó^=&-G..uX+â&.G 000000
17E8C28C C388FF08 47C62602 57892607 89260857 89260647 8926990A 47882604  .&.G..&.G.&.W.&..&.W.&óG...ù.ô§. 000020
065E8BEC 8B5590C8 C999C02B 8D751850 163BC375 184E063B 0CFC4683 C28CC388  .ù.ô.F=.;.N.uù;.P.u§+â.èù.U.š.^. 000040
0019C187 C6F375C0 850000FF FF9A5306 2EE90622 E9C03300 098A0872 198F1E3B  ;.¢.r.o..3âÖ".Ö..S......âµó.ê.. 000060
0CF3E908 7EC51E99 01750AF9 83D23306 46880C4E 88018357 56EC8855 CB5DE58B  .[)ùU.šVW°..N..F.3Ø.'.U...é-.Õµ. 000080
0194E999 C02B0673 A6003F81 26077C0F 7F12CE02 7F812606 5EC45657 00000EC8  à...WVá^.&...ö...|.&.?.Is.+ä.Õ.. 0000A0
F70004B9 99405180 68016A01 E8A32159 2E829A37 FF260277 FF263380 6801E168  hÃ.h.3&.w.&.7...Y|ÈÒ.j.h.Qa.¿..¼ 0000C0
5689F246 8937FF26 0277FF26 065EC433 806801E1 6821742F 1E9A5052 99F08BF9  '.b.RP../t!hÃ.h.3ó^.&.w.&.7.F·.V 0000E0
E8A101E1 FC568133 80FA4681 26E8FC56 89FA4689 F4561BF2 462821FF 2F529AF4  ¶.R/.!+F·.V¶.F'.V=Š&.F'.3.V=Ã.ÀÒ 000100
D47C00FC 7E8301E8 0EFF4E01 FC568351 80FA4681 0A75D208 F9F70004 89994001  .ā.¿..¼'.Øu..F'.Q.V=.N..Ò..-=.|à 000120
0D75D208 F9F70064 899901E8 A11F75D2 08F9F700 04899901 E8A107B2 01E80681  ..Ò.ÿ.ÀÒ..¿..¼'.Øu.ÀÒ..¿d.¼'.Øu. 000140
6C01E82E 81F85E8C F6468919 8E8803E8 19748805 75D208F9 F70190B9 9901E8A1  ÀÒ..¿..¼'.Øu.¦t.Š.¦...F-.^½..Ò.ï 000160
5A9A5016 FA468D51 8068016A 01ECA322 112E829A FA76FFFC 76FF5180 68016A07  .j.h.Q.v=.v'...."Èš.j.h.Q.F'.P.Z 000180
89F24689 000205C2 8CC3881F 7D024739 2601ECA1 F65EC400 0101E606 C722682E  .h"ú.Ï...ó^-Âš.&9G.)..ù.ô....F·. 0001A0
D101E63E 8801E60E FF01ECA1 F17C0539 2601ECA1 01E606FF 02C783F2 7EC4F456  V¶ó~·.ú...Ï.Âš.&9.|þÂš...Ï..>Ï.Ï 0001C0
68006A01 E2A3227A 2E829AFA 76FFFC76 FF0E1068 006A01E4 A3012826 F65EC4E7  Óó^-&+.Èõ.j.h...v=.v'...z"Èã.j.h 0001E0

Dump of file SATURN:[PCCOMMON.DUMP.DLL]SA-IMPRT.DLL;1 on 18-APR-1990 10:51:06.27
File ID (451,16,0)    End of file block 79 / Allocated 80

Virtual block number 50 (00000032), 512 (0200) bytes

006A01E0 A3229B2E 829AFA76 FFFC76FF 3C6A006A 22892E5A 9A5016FA 468D0E10  ...F'.P.Z.."j.j<.v=.v'...."ÈÂ.j. 000000
9963CA2D C60301EC 06030160 01E80669 01DEA31D 792F529A FA76FFFC 76FF3C6A  j<.v=.v'.R/y.Èß.i.Ò.m...š..ó-òc. 000020
0E087500 20BE3E83 CBC95F5E DABC01DE 88000001 EE06C701 EA1689F9 F7000789  ¿..¼'..õ.ù.Ÿ...¡ß..Ò^ èù.>ƒ .u.. 000040
0BFC5689 FA468904 C4832311 2CF89A01 F0681E56 000006C8 CB208E06 FF0005E8  Ò....ƒ ùà...V.hÞ..½,.Ŧ.ó..F'.V=. 000060
CA9A0202 36FF0204 36FF5006 036A009C E9037500 3F8026FA 5EC400A8 E9037500  Àu.Ò´.ó^'&.?.u.Ò..j..P.ó...ó...ò 000080
9A505204 C4832332 2CEA9AFA 76FFFC76 FF03FA46 830E1068 006A0AC4 83232802  .(#.ó.j.h...F'..v=.v'.õ,2#.ó.RP. 0000A0
187387F6 D8889800 8A261C74 00388026 FA5EC4F6 2801FE16 8901FCA3 23802F1E  ./.#È=...±.+-ó^'&.8.t.&....Ä-.s. 0000C0
8CC38803 6A1D7400 388026FA 5EC4D87C 03FE8346 06752D38 8026FA5E 88097504  .u..^'&.8-u.F.±.|Ùó^'&.8.t.j..ù. 0000E0
0007C626 02061EC4 9009E80A C4832140 02CA9A02 0636FF02 0836FF50 52C603C2  ô.óRP.ó...ó...ò.ål.ó.Š..ó...&ó.. 000100
7D03087F 8326065E C4560000 06C890C8 C95E0200 A340C018 013F8026 02061EC4  á...&.7..âøÈ..^èù.à...Vá^.&....) 000120
260081E9 037D0908 7F83260A 7E03087F 832600AD E9037E09 087F8326 0087E903  .Õñ.&....-.ÕÙ.&....-.&....).Õ..& 000140
0705198E 878BE3D1 085F8826 10750308 7F832617 7E07C2FE 81076CC6 810A7788  .w..ól..±ô.-.&....u.&._.iD...... 000160
065EC4FA 46FF0375 0003C6F7 FA468919 90878BE3 D1085F88 26065E88 900EEB00  .Š....^.&._.iD.....F'%ó_.u..F'á^. 000180
00078999 000405C1 03016DCE 69FA4603 F9F70004 89990144 8D46EE83 0A778826  &.w..ŸF.D..¿..¼'.F'iöm..ê.....¿.. 0001A0
187C0204 7F832622 75097F0E 47392615 7503087F 8326FE46 89C22BFA 4688F9F7  ¼'.F'+ô.F±&....u.&9G...u"&....|. 0001C0
CBC95EC0 2BE57C01 047F8326 0775EE7C 0E473926 FE468806 5EC49018 E80001B8  ¡..Š..ó^..F±&9G.|Ÿu.&....||+ã^èù 0001E0

Dump of file SATURN:[PCCOMMON.DUMP.DLL]SA-IMPRT.DLL;1 on 18-APR-1990 10:51:06.27
File ID (451,16,0)    End of file block 79 / Allocated 80

Virtual block number 51 (00000033), 512 (0200) bytes

89248E2F 1E9A5052 99F9F700 04899903 448D5180 68016A06 76885657 000020C8  à ..WV.v.j.h.Q.D..¿..¼'.RP..//$. 000000
017E0208 7E830775 D20BF9F7 00048999 C688198C BF8BE3D1 085E8BEC 5689EA46  Fõ.Vš.^.ÏD.¢...ó.¿..¼'.Øu..-..-. 000020
89505299 DA880C46 88C8880E 1068006A 24D82F1E 9A505299 0E468B3C 6A006A47  Gj.j<.F..RP../ÄŠj.h...à.F..Õ.RP. 000040
5299DA88 C703C303 0160DE69 0A468BC8 8B518068 016A24FA 2F1E9AE6 5E89E44E  NÕ.^|../'Šj.h.Q.à.F.ißm..ù.ù.Õ.R 000060
990A8810 4688C888 E65613E4 4603E256 13E04603 252D2F1E 9AE25E89 E04E8950  P.NÂ.^ã../-X.FÁ.Vã.Fõ.V|.à.F..Õ. 000080
A1255E22 C89AFC46 89C7030A 4688EC5E 11EA4E01 12CED381 A600C181 DA13C803  .à.Õ.è.|.&ö..NÕ.^š.F..ú.F=.à"^XÀ 0000A0
83F24689 0C4688F6 46894808 4688F846 89504480 EC5611EA 460101FE 16B801FC  =...±..Fõ.Vš.DP.F½.F.H.F-.F..F·. 0000C0
00EC5E83 0E10EA6E 810974C0 0B04C483 22E423A2 9A5016EE 468D1A74 0002003E  >...t..FŸ.P.ÂØÕ".ó..ät..nÕ...^š. 0000E0
0374C085 0000FFFF 9A5050C0 330676FF 0876FFEC 8B55CBC9 5F5EEC56 88EA4688  .Fõ.Vš^ èùU.š.v..v.3âPP......ât. 000100
1E024868 1E198AA3 E0865800 00FFFF9A 5016C488 50EC8855 00CB5DE5 88017CE9  Õ|..[)ù.U.šP.ó.P.....X.Âèα..hH.. 000120
25C1262A 9A50CB5D E5880001 88248031 2A9A0A7C E80021E8 0000FFFF 9A024668  hf......Õ|.Õ|..'|.$¡...[)ùP.'&èX 000140
47017500 3D80267F FF890248 068EFF33 000D8B1E 024E16FF 00FF6825 CE267E9A  .~ßöXh....N..£..3...H.¿..&.=.u.G 000160
F788071E 061CE8E7 74AEF2C0 330874CA 8BA6F3C8 88D18806 528E3174 003D8026  &.=.t!/R..|.ùµ|.òt.3ã·ÙtóŠ.....¼ 000180
00FC88EC 8B5500C3 1FEDEBAA C20A0572 412CAC92 04E0C00E 72412CAC 19C1BF1F  .¢è.¯,Ar.åÄ..¯,Ar..ó¯ŠÚ.ù.U.Š¦=. 0001A0
8855CB5D E5882634 267E9A50 00FFB818 521EFF04 74001854 3E8325D3 267E9A50  P.~&ÂX.>T..t...R.|..P.~&ó&.[)ùU. 0001C0
F2FFFFB9 C033970C 74964010 74C23BAD 1C0CBE06 5688C08E D88E06F7 8B5756EC  ŠVW|¼..Ã.à.V.ƒ..Ù;ôt.ā.t..3â¿..· 0001E0
```

```
Dump of file SATURN:[PCCOMMON.DUMP.DLL]SA-IMPRT.DLL;1 on 18-APR-1990 10:51:06.27
File ID (451,16,0)   End of file block 79 / Allocated 80

Virtual block number 52 (00000034), 512 (0200) bytes

 8B921F74 C00B2648 264E9A06 76FF57EC 8B550002 CA5DE58B 5E5F96EB EBF78BAE Û.%Š§._^.|]ò..U.šW.v..N&H&.ât... 000000
 E5885F5B 0000FFFF 9A501651 521E5300 02B8C48B 504901F7 AEF2FFFF B9C033FA ¹3ä¿..¯Ü%¡¡P.ðÉ..S.RQ.P.....[_.Í 000020
 120F1600 160C0808 070A0C09 0C080C07 09060005 18040203 02021601 0002CA5D ]ò.............................. 000040
 0A801606 09721C70 2060006C 08590057 00530052 02430041 02350212 12110010 ......5.A.C.R.S.W.Y.l.m p.r..... 000060
 E8CB5DE5 8B99FFFF B8198616 891980A3 16080000 080702CE 08A40084 09820A81 ......Ê.ö.■.....È§...Ñ.¡.....|]ùÒ 000080
 F7E24343 1674073A 2E1B75E4 0A0024B9 26848B19 B0A3CB5D E58B99FF FFB80008 ..¡....|]ùÈ§.ÉÇ&¿$..ðu..:.t.CCã¼ 0000A0
 8BEC8B55 00C31986 A3980147 8A2E4301 76CA3C04 72BC3C43 0A76243C 0472133C <.r.<$v.C<¥r.<òv.C..G..ÈÑ.û.U.š. 0000C0
 FF0876FF 0A76FF53 CC8B04EC 83FFACE9 FFA0E9C0 3300098A 0B72198F 1E38065E ^.;.€.r.¤..3éÔ..Õ¯..š..äS.v..v.. 0000E0
 0EEC83EC 8B5500C8 5DE58BFD 19C1A780 91E175C0 855A5900 00FFFF9A 51160C76 v..Q.....YZ.áuÃ..Ìé.».|]ù.U.š.š. 000100
 A90A4688 018AE80C 4E8B5252 023352F8 568D1652 FE568016 0676FF08 76FF4087 ñ@.v..v...V±R..V¥R3ØRR.N.Ò...F.` 000120
 50160676 FF0876FF FE468D50 02CA8022 740200A9 2A750400 A910CA80 08740100 ..t..ò.`..u*`..t".ò.P.F±.v..v..P 000140
 C03350C7 0A000325 525101CA 8003EBFE 4E880875 58C08500 00FFFF9A 5050C033 3âPP......êXu..N±Š..ò.QR%...úP3ä 000160
 8DE9FEF2 E90011BA 03740002 BAF0C2F6 0E75006E 3D1674C0 080000FF FF9A5050 PP......ât.=n.u.-ôÞ¤..t.¤..Õ·±ò. 000180
 1653F45E 8D165000 8BE4EBC0 330018BA 000020E3 9A500072 19BF063B FE468B00 ..F±;.€.r.P.D ..¤..3éŠò.ÂP..^¶S. 0001A0
 18D306F6 07754000 A90E7580 00A9C933 0A468B61 75C00800 00FFFF9A 50F8468D .F¥P......âua.F.3è`..u.`.ðu.-.₤. 0001C0
 83E908F4 46C60775 023C008E E940F446 C6077501 3CF4468A F24E8880 81027580 .u.Ý..N·.F¶<.u.óF¶ãÕ..<.u.óF¶.Ô. 0001E0

Dump of file SATURN:[PCCOMMON.DUMP.DLL]SA-IMPRT.DLL;1 on 18-APR-1990 10:51:06.27
File ID (451,16,0)   End of file block 79 / Allocated 80

Virtual block number 53 (00000035), 512 (0200) bytes

 50FA468D 16510002 B95151FF FF895273 7400020A 46F77A74 C90AF446 88C03200 .2â.F¶.ètz%F...tsR¿..QQ¿..Q..F¹P 000000
 16500001 8850F646 8D16524F EBC033FE 6EE90374 00833D0C 74C00800 0027759A .u'...ât.=..t.Ôn±3âŠOR..F-P¡..P. 000020
 FC5E8301 FA6E8352 18751AF6 7E833274 F8463923 75C00800 00FFFF9A 50F8468D .F¥P......âu#9F½t2.--.u.R.n¹..^■ 000040
 00002891 9A50FA46 8D165050 50C03352 BE75C00B 0000FFFF 9AFA76FF FC76FF00 ..v■.v¹......âu/R3âPPP..F¹P..(.. 000060
 000027D5 9A5050C0 3350F846 8D160676 FF0876FF 287548C1 F6F44E8A AA75C00B .âu¯.N¶-êHu(.v..v...F¥P3âPP.í'.. 000080
 8F880888 C28801C9 80F24E0A 20C98003 7400080A 46F710C9 80037400 01F846F7 ¼F½..t..è.¼F...t..è .N·.è..ô.Ä.. 0000A0
 C03308EC 83EC8B55 00C301C9 80037580 A8C933C1 23D0F719 88A1CB5D E58819C1 ê..|]ùÀ¡.¼Ä#ë3è¯.u..è.û.U.š.š.3â 0000C0
 87F6087E C40C4E88 02335745 750219C1 87F64CE3 0C4E8B3F 7319BF1E 3B065E88 .^.;.€.s?.N.DL-.ê..uEW3Ø.N.é-.-. 0000E0
 B59A5016 FA468D51 5706530A 1AC187C6 4942AA08 740A3C1A C1878A10 740819C1 ê..t...ê.<.t.¯Bló.ê..S.WQ.F¹.P.ç 000100
 A780CB5D E58B0475 8019C187 F6C203FA 468BFD62 E90009BA 0674C00B 5F000028 (..‗.ât.¤..Õb».F¹.ó—.ê..u..|]ù.| 000120
 C43AAC04 19C18F80 2606750A 3C8000B4 28E3C888 FE8B0876 C5071E57 56FB19C1 ê.«VW..év..±.àD(Ç..<.u.&..ê..¯:ó 000140
 CB5DE588 5E5F1F06 08462BC7 88EAE247 058805EB 0219C18F 80260875 1A3C1E74 t.<.u.&..ê..Š...Gãõ.ú+F..._^.|]ù 000160
 8D515016 F9468D53 1C75DB08 24744019 C187F626 E2EBE774 0A3C8007 7401F983 .¹.t..<.tÓŠã&-.ê.@t$.Ûu.S.F¹.PQ. 000180
 F9468D53 00F946C6 B6EB0AB0 FCEBE95E 5F1F0607 74C00800 00298F9A 5016FA46 F¹.P..)...ât..._^ÕŠ•¯.ŠÑóF¹.S.F¹ 0001A0
 F6263574 010C7E83 3674FFFF FA46F7DC 75C00800 002A159A 5016FA46 8D515016 .PQ.F¹.P..*...âûÉ¼F¹..t6.-..t5&- 0001C0
 E90F750A F97E8000 0028EC9A 5016FC46 8D5008F7 5050FFFF 88531C75 0819C187 .ê..u.S¡..PP¼ÄP.F■.P.š(...-¹.u.Õ 0001E0

Dump of file SATURN:[PCCOMMON.DUMP.DLL]SA-IMPRT.DLL;1 on 18-APR-1990 10:51:06.27
File ID (451,16,0)   End of file block 79 / Allocated 80

Virtual block number 54 (00000036), 512 (0200) bytes

 83EC8B55 0099EBC5 750AF97E 80FF5BE9 00B00274 0A3C1AC1 878826F9 468AFF6F o..F¹&..ê.<.t.¯.Õ[..-¹.uéŠ..U.š. 000000
 415151C9 33531274 2019C187 F6FC5DE9 C0330009 BA087219 BF1E3806 5E880CEC š..^.;.€.r.¤..3âÕ]■-.é. t.S3èQQA 000020
 4689C033 0856C50A 468EFA5E 8C667480 19C187F6 00002A65 9A5016F4 46805141 AQ.F¶.P.e*..-.ë..tf.^¹.F.éV.3ã.F 000040
 80BADCBB 02EC8338 75AEF20A B049E30C 4E8BF866 89F28BFA 8B5657FC FC4689FE ±.F■■VV.¹.·.f½.N.DI¯.·Ûu;.š..Éo. 000060
 00B0009A E9002BE8 F4E2AA1A 74FB3B0D 740A3CAC 0C4E8B07 16FA8BD4 8BE22B00 .+ã.â.¹...N.¯<.t.;«t.`ã¶Ò+.Õ..¯. 000080
 FCB87AEB 0093E9FA 5E8E5F5E E1E80014 E8E2EBFC 46FF0A80 AA001FE8 0375FB38 ;«u.Ò..`¯..F■ŠãÒ..ŠÃ^_.^¹Õ..Šz¡■ 0000A0
 A89A5016 F4468D51 521E5306 5E8B1FE3 CA2BCF88 1F061E51 53502688 30169AFF ...0.&PSQ....Ü+òD..^.Š.RQ.F¶.P.´ 0000C0
 1874C008 08C4831F C3FA8858 5B591F07 740B0BFE 5E01F45E 881175C0 08000026 &...ëu..^¶.^±.Üt..Y[X.¹ü..á..ât. 0000E0
 4019C187 F6FE5E8E 26EBF900 20BA03E8 001C8A08 750009BA 00013000 74006030 =m.t.=..¤..u.¤..Š.¤ .¹Š&.^±-.ê.@ 000100
 6688FC46 2BFE4688 06EBF9C0 33001CBA 0EEBF803 751A3F80 085E880A 5E8E0E74 t..^..^..?.u.½Š.¤..3â¹Š..F±+F•.f 000120
 1E530856 C51EEEEB C1880475 C9080C4E 88FB41E9 CB5DE58B 0472FA5E 8E5F5EF8 ½^_.^¹r..|]ùÕA«.N..èu..êŠŸ.éV.S. 000140
 CC750009 BA000130 00740060 301774C0 0B1F071E 00002B4F 9A5016F4 46805152 RQ¯F¶.P.0+......ât.=m.t.=..¤..uä 000160
 02751A3F 80260A88 0A744019 C187F687 75C00BF4 468BC2EB 0020BAC7 EB001CBA ¤..Šú¤ .Šô.F¶.ðuñ-.ê.@t..Õ&.7.u. 000180
 55CB5DE5 8B01FE4F 80260574 C30BC08C 065EC4EC 8B5500A3 EBC03300 1CBAA6EB Š|¤..3âŠÉ.U.šó^..â.út.&.O±..|]ùU 0001A0
 82E81BDE A3127400 25E80875 0018DE3E 831E73FF F13D0646 8B575602 EC83EC8B .š.š.VW.F.=þ.s..>B..u.Ò%.t.ÈB.Ò. 0001C0
 F0BBCB5D E58B5E5F 02C4832B 34328A9A 0676FF0B 750078E8 05740018 E8157500 .u.Ò..t.Òx.u..v...24+.ó._^.|]ùÉÞ 0001E0
```

```
Dump of file SATURN:[PCCOMMON.DUMP.DLL]SA-IMPRT.DLL;1 on 18-APR-1990 10:51:06.27
File ID (451,16,0)   End of file block 79 / Allocated 80

Virtual block number 55 (00000037), 512 (0200) bytes

 63348E9A 5002B051 0E4F8D50 501EC033 FE5E89FE E3834306 5E880776 065E3900 .9^.v..^.C.D±.^±3â.PP.O.O¯.P..4c 000000
 D88EFE5E 880008A3 DA8E0574 D2081BE2 A31BE016 87C28838 74FFFA83 08C4832C ,.á..*.t8.ô..Á.Èã..Øt..ÖÈ...^±.Á 000020
 8C0006A3 00000500 0AA30147 8D0002A3 0000A300 0AB80C47 89484800 08A3C033 3âÈ..HH.G.|..È..È...G.È.....È... 000040
 88550008 57E9C3D9 8EC18CD2 0805F0E8 1BE21E8E D833064E 88C08ED8 8CC31FD8 Á.Û.Ä.â.N.3Ü..ã.Òþ..Ø.ê.1ÜÖW..U. 000060
 46887674 C208FC56 89FA4689 1BC91688 1BC7A156 000006C8 00FEE900 835756EC šVW°.Õ±.à...VÀú...è..F*.V=.ôtv.F 000080
 5EC404FA 46839090 06EBF088 04C4832D 4402B29A 0676FF08 76FF6E74 08460806 ..F.tn.v..v..ý.D-.á..Þš....F*.á^ 0000A0
 FA5EC4DD 7EC63804 C4832D6D 02829A37 FF260277 FF264A74 02470826 07882 6FA *&..&.G.tJ&.w.&.7.ý.m-.á.;ó-Ÿá^* 0000C0
 832C8F02 F49A37FF 260277FF 26FA5EC4 0676FF08 76FF5601 753D3880 261FC426 &á.&.8=uiV.v..v.á^*&.w.&.7.¶..,. 0000E0
 065E88EC 8855C8C9 5E99C02B 9004EBC2 8C01408D 1FC426FA 5EC48475 C00B0AC4 á..âuÇá^*&á..ə..òŠ..+â.^èùU.š.^. 000100
 885500CB 5DE588C0 3302E800 01880574 4019C187 F60C7C00 F883117D 198F1E38 ;.€.)..«.|.-.ê.ət.¡..Š.3â.[]ù.U. 000120
 8A0A4688 D128D187 D1030323 D818D128 0C74DAF7 D78B067E C45738E3 0C4E88EC š.N.D8Wá-..■¼Öt.+î.Ü#Æ.î.î+î.F.. 000140
 46885FAA F3C913AB F3E9D1C3 8EFFFFC3 81C38C10 E3D187AA F3C913AB F3E9D1E0 ÄïÕµ¨.èµ¯.ïD..ú.ú...úïÕµ¨.èµ¯_.F 000160
 750AF983 1374C00A 93FC071E 570A7EC5 1E085688 0646880E 4E88C85D 08568806 ..V.]ù.N..F..V..é~.W..▪..ât..ī.u 000180
 D38792F1 F793F1F7 0274C00B D23392F7 88DAF700 D2830BF7 AA2D800A 79D2080E ..Øy.¯-¨¼Ü.Ø.¼Ö.¼.3Ø.ât.¼þ.¼þ..Æ 0001A0
 8CF272C7 3B01448D FF448805 86AC4F05 88E275C3 08C288AA 27040276 393C3004 .0<9v..’^.ô.úuã..O¯...D..D.;úr·. 0001C0
 2F529A37 FF260277 FF260A76 FF0C76FF 065EC4EC 885500CB 5DE5885E 5F1F58DA ÖX._^.[]ù.U.šá^..v..v.&.w.&.7.R/ 0001E0

Dump of file SATURN:[PCCOMMON.DUMP.DLL]SA-IMPRT.DLL;1 on 18-APR-1990 10:51:06.27
File ID (451,16,0)   End of file block 79 / Allocated 80

Virtual block number 56 (00000038), 512 (0200) bytes

 7DC00808 4688FF33 535657EC 88550008 CA5DE588 07892602 57892606 5EC42D1F .-á^.&.W.&...[]ò..U.šWVS3..F..â) 000000
 F7D8F70A 56884711 7DC0080C 46880656 89084689 00001DDA F7D8F706 56884711 .G.V.¼Ä¼Ö....F..V..F..â).G.V.¼Ä¼ 000020
 88F1F706 4688088B F1F7D233 0846880A 4E881575 C0080A56 890C4689 00001DDA Ö....F..V..âu..N..F.3Ø¼þ.Ä.F.¼þ. 000040
 66F7F088 F1F7F475 D808D8D1 EAD1D9D1 E8D10646 88085688 0A4E88D8 8838E8D3 ÆŠ8.Ä.N..V..F.ïŠî)îõîÄ.Üu¶¼þ.Þ¼f 000060
 DAF70775 4F96D233 4E017606 463B0672 07770856 3B0C72D1 03E6F70A 4688910C ...F.¼].ïr.;V.w.r.;F.v.N3Ø.Ou.¼Ö 000080
 46880875 0A5E8808 080C5E88 084688EC 88550008 CA5DE588 5F5E5800 DA83D8F7 ¼Ä.Ö.[^_.[]ò..U.š.F..^..Ä.^.u..F 0000A0
 CA5DE588 D103E3F7 064688C8 030C66F7 064688C8 88E3F700 08CA5DE5 88E3F706 .¼D.[]ò¯.¼D.à.F.¼f..à.F.¼D.î.[]ò 0000C0
 56890846 8900001D DAF7D8F7 06568847 117DC008 084688FF 335753EC 88550008 ..U.šSW3..F..â).G.V.¼Ä¼Ö....F..V 0000E0
 880A4E88 1875C008 0A56890C 46890000 10DAF7D8 F70A5688 107DC008 0C468806 ..F..â)..V.¼Ä¼Ö....F..V..âu..N.. 000100
 D1064688 0856880A 4E88D888 48EB4379 4FD233C2 88F1F706 4688F1F7 D2330846 F.3Ø¼þ.F.¼þ.ó3ØOyCŠH.Ä.N..V..F.î 000120
 72077708 563B0C72 D1030A66 F7910C66 F7C888F1 F7F4750B 08D8D1EA D1D9D1EB Šî)îõîÄ.Üu¶¼þ.â¼f..¼f..ïr.;V.w.r 000140
 E58858 5F 000A8308 F7DAF707 794F0856 18064628 0C5618 0A 46280676 06463808 .;F.v.+F..V.+F..V.Oy.¼Ö¼Ä.Ó._[.î 000160
 88025789 0789065E 882E7035 9A9A084E 88025788 0788065E 88EC8855 0008CA5D ]ò..U.š.^....W..N...Sp..^...¯W.. 000180
 33057540 19A8A1C8 5152E388 057219AC 1E380872 D8280C88 5A590000 04CA5DE5 []ò...YZ.É+Är.;.¯.r..DRQùÀ´.əu.3 0001A0
 28359A52 16501653 C4885087 19C1A780 D4885200 02881 9A8 2EFF5152 F596E9C0 âÖ.¼RQ..´.£..R.â.Ïê.ñP.áS.P.R.5( 0001C0
 F00E885A D4794819 C18F0808 81067500 023D0774 00013040 81127558 C00B0000 ...âXu.Ÿə=..t.=..u.Ÿ...ë.Kyâ Z..Þ 0001E0

Dump of file SATURN:[PCCOMMON.DUMP.DLL]SA-IMPRT.DLL;1 on 18-APR-1990 10:51:06.27
File ID (451,16,0)   End of file block 79 / Allocated 80

Virtual block number 57 (00000039), 512 (0200) bytes

 EE1EFF00 0388C28C 18F606C4 01AEE903 731BEE1E FFD833C2 8C1BF206 C41EE31B .D.á.·..ó3Ü..Ÿ.s.ÕÜ.á.-..ô€....Ÿ 000000
 87680E01 6A08741B EC3D1BE8 880073E8 1BFA8F18 FA8E007C E81BFA8F 1BFA8E18 ./*.€*.Ò|./*.€*.Òs.¡Ò.=š.t.j..hñ 000020
 000030B2 9A006A00 6A036A00 51E81BEC 8F1BE88E D88E2654 88C30000 FFFF9A30 0.....ú¡î&.Ä/Ò.€š.Òɑ.j.j.j..ý0.. 000040
 1BFA8F18 FA8EEC88 5503E800 31E81BEC 8F1BE88E 003AE820 C08F20C0 8EEC8855 U.š/â €â Ò:./Ò.€š.Ò1.Š.U.š/*.€*. 000060
 028807E3 18F00E88 0000FFFF 9A500646 8A50C033 001AE81B FA8F18FA 8E0023E8 Ò#./*.€*.Ò..3âP.F.P.......Þ.D.£. 000080
 56570000 14C800C3 EEE81DFF F2740245 08058804 EF830E73 F738C318 EE1EFF00 ...Ÿ.û;¼s..ÿ....E.t·..ŠŸû.à...WV 0000A0
 6AF85689 F64689F2 5689F046 89C02802 48168800 F0E90375 02483639 FF28F628 +-+.96H.u.Õþ...H.+â.Fþ.V·.F-.V½j 0000C0
 8CE90376 7FFFFE81 461974C0 080AC483 319E02F4 9A065268 1EF676FF F876FF0C ..v½.v-.hR..¶..1.á..ât.F.±. v.Õ¥ 0000E0
 26F65E88 F475003F 8026F646 FFF65EC4 0CE847EA 75003F80 26F646FF F65EC400 .á^-.F-&.?.uõGŠ.á^-.F-&.?.u¸ ^-& 000100
 8331E32C 2F9A56EE 5689EC46 8904C483 31AD3436 9A046A50 01458DBA 75003F80 .?.uɑ.E.Pj..64Ü1.á..Fš.VŸV./,D1. 000120
 1BC7A3EE 5688EC46 886674C2 08FC4688 6D74EE46 08EC4688 FE5689FC 468902C4 á..F▪.V±.Fš.FŸtm.F▪.ôtf.Fš.VŸÈú. 000140
 88EC5EC4 2C74C008 0AC48330 0502F49A 0652681E F076FFF2 76FF0C6A 1BC91689 ..è.j..v·.vÞ.hR..¶..0.á..ât,á^š. 000160
 26FC46FF FC5EC407 8A26F046 FFF05EC4 04EC4683 02578926 078926FE 5688FC46 F▪.V±&..&.W..Fš.á^Þ.FÞ&..á^▪.F▪& 000180
 C95F5EA7 75003F80 26F05EC4 F475003F 8026F046 FFF05EC4 E8E80E74 C00A0788 ...ât.ŠÒá^Þ.FÞ&.?.u¶á^Þ&.?.uÏ^_è 0001A0
 47F626FA 5EC41CE8 F628FC5E 8CFA4689 06608856 000006C8 F392E900 028890C8 ù.¡..Õ.µà...V¡'..F*.^▪+-Š.á^*&¯G 0001C0
 FA463918 50168818 4EA10CFA 46834601 744004C4 83315E09 849A5306 0E74830A ..t..S.Ç.^1.á.ət.F.F*.ÀN...P.9F* 0001E0
```

Dump of file SATURN:[PCCOMMON.DUMP.DLL]SA-IMPRT.DLL;1 on 18-APR-1990 10:51:06.27
File ID (451,16,0)   End of file block 79 / Allocated 80

Virtual block number 58 (0000003A), 512 (0200) bytes

```
BB5756EC 8B55CB50 E58B01FE 4F800474 DB0B065E 8BEC8855 90CBC95E C688D876 vÄ.6^èù.U.š.^..Ut..O±..|]ùU.šVWE 000000
961BD6A3 1BD4A3FE 244024EB 99C03305 750176E8 0005B807 1E297500 3F831BD4 å..?.u)..¡..Òv.u.3á.Š$a$±Eå.E#.. 000020
CB5DE58B 5E5F0009 E8C08ED8 8C064E8B 1BDA3689 FFFEFE44 C704C683 000104C7 ú....6.ùD±±..6Ö..N..Ä.áÒ.._^.|]ù 000040
D08B1573 C13B4843 7401A8FE 8BADFC02 778BF273 EEF983FE E180FA74 410000E9 ÒÄ.At*.Ä±.*Ys·.w.=Ü.±´.tCH;ès..Ä 000060
8948C12B FE4CB9F9 030C74FE 8BE6EBFE 4489F788 000205C2 03357401 ABADF003 .ÞÙ´.tS.ô....¥.D±Š|.±t..*.L±+èH. 000080
E606C626 C3027F89 1BE21E8C 260574D1 3B30B8B9 DA8CC68B FE4CFEF9 0305EB05 .Š..*±L±.6.Ö¿¡0;!t.&..ã....ù&6.| 0000A0
E27401A8 ADF00300 888C73C1 3B48FE8B F27401A8 ADF003FE 8B2574FF FE30021B ..=±.tX.±.ÞÙ´.t·.±H;ès¥.Å.ÞÙ´.tã 0000C0
D88C1274 1BE60EFE 2615EBD8 8E0474C0 08084788 E6EBFE44 89F78800 0205C203 .ô....¥.D±Š|.G..åt..ÄŠ.&±.|.t..Å 0000E0
40400124 0D74C638 006BE8C0 33067788 B8EB378B 1BDE1E8E 260574C7 3B331DBF ¢.3;út.&..B..7ŠE.w.3áÒk.;ót.$.ãã 000100
1BE2A326 0474C13B 3371B9D8 8C98EB4E 4E960574 001DE8FE 40FE0074 005FE898 .Ò_.t.±M±Ò..t..NN$..Ä¿q3;èt.&Eã. 000120
04761BE4 163B267F FFBA4141 49C82B03 7401A8FE 458B51C3 99C03302 47890788 ...G.3á.ùQ.E±´.t.+àIAAα..&;.ö.v. 000140
33E575EA D1D2F708 75000CE8 C62BC223 D2F70072 C2031572 C603C18B F575EAD1 Íõu%.é.ór..òr.%0#ó+6Ò..u.%0ïõu|3 000160
55894AD7 2BD68B06 7789FFFE FE44C7F2 03F08BFE 88571874 001DE851 52C359C0 äYùRQÒ..t.W.±.Þ.·ùD±±..W..ø+=J.U 000180
5A1FFFFA 8308C483 3259348E 9A1F0650 0001B850 52521ED2 335053C3 5A5958FE ±XYZùSP3Ø.RRP¡..P....4Y2.6..*..Z 0001A0
FA5689F8 46893463 2F1E9A06 76FF006A 0876FF00 6A560000 0AC8C3D2 0B02745B [t..ØÙà...Vj..v.j..v.../c4.F%.V* 0001C0
D00BFE56 89FC4689 02C48334 7C2C2F9A 56F8768B 902FEB99 C02B0674 FFFFC2F7 %ô..t.+å.Š/..v½V./,|4.é..F•.V±.Å 0001E0
```

Dump of file SATURN:[PCCOMMON.DUMP.DLL]SA-IMPRT.DLL;1 on 18-APR-1990 10:51:06.27
File ID (451,16,0)   End of file block 79 / Allocated 80

Virtual block number 59 (0000003B), 512 (0200) bytes

```
8B5590CB C95EFE56 8BFC468B 9007EB08 C4833426 20AE9A50 FE76FF00 6A561274 t.Vj..v±P.Ù-&4.6.Š...F•.V±^èù.U. 000000
50368B4C EB277200 57E80775 4806468B 08568B02 508F3875 000A7E83 065756EC $VW..~..uB«P..V..F.Hu.ÒW.r'ŠL.6P 000020
D20B0473 0650FE81 04C68334 735E003E E8560E46 8902448B 0074F73B 11744806 .Ht.;¥t..D..F.VÒ>.^s4.6..±P.s..Ø 000040
5C891489 E675C085 F95B0000 FFFF9A50 C0335016 52C48B50 21EB99FF FFB80675 u.¡...Š!P.6R.P3áP.....[*.âu|...\ 000060
50FE8104 C6830C74 024C39F7 8B0E4E8B CB5DE58B 5E5F07C0 33D38B06 50368902 ..6P..Æ3â._^.|]ù.N..%9L.t..6..±P 000080
00FFFF9A 51531373 024A1E39 0675F73B C18ED38B 26721C03 DA8B2CEB F9F27506 .u·*$,.Ö..F&.Æ.ê;%u.9.J.s.SQ.... 0000A0
99C03306 76C51E56 57EC8855 00C3018B 04879202 4A168904 75F73B0E 75C08500 ..âuB;%u...J.....Iù.U.$WV.év.3á. 0000C0
D1E3D118 72302C1F 77393CAC 017528 3C 04742D3C 50F77409 3CFB7420 3CACDB33 3Ù¯< t«<.t%P<-t.<+u.¯<9w.,Or.ÌDÌ 0000E0
D8F70775 93203C58 DCEB0002 83D80307 13D90302 D1E3D102 D1E3D1FA 8BCB8BD2 Ø.ù.*ÌDÌØÌDÌØ.].=.Ä.Ø.ŠÉX<-.u.%Ä 000100
03041000 0028D802 030013CB FAE2D201 E0D106E3 ED32CB5D 5F5E1FDA F7000283 .Ø.%Ö.^_]ù2ÙD.ÌÂÌØã*ù....Ä+..... 000120
02000000 07344800 02000700 0230CC01 03000500 02310401 03042600 002A3902 .9*..&....1......ä0......H4..... 000140
05002600 02352001 03002200 0234E201 03002100 02044001 03000000 0933A600 .|3......@...!...ã4..".. .-5..&.. 000160
03004400 0228D801 03003C00 02258801 03003A00 022AB801 03008800 022DE101 .Ä-.......¡*..:....%..<...Ä(..D.. 000180
03005C00 0225A101 03005B00 0225B401 03004D00 02304E01 03004B00 02290C01 ..)..K...NO..M...Ç%..[...À%..\.. 0001A0
54206E75 5220534D 00000000 00000000 00041400 00281C02 03040C00 0027F302 .µ'.......(.............MS Run-T 0001C0
38383931 20296328 20746867 69727970 6F432020 20797261 7262694C 20656069 ime Library - Copyright (c) 1988 0001E0
```

Dump of file SATURN:[PCCOMMON.DUMP.DLL]SA-IMPRT.DLL;1 on 18-APR-1990 10:51:06.27
File ID (451,16,0)   End of file block 79 / Allocated 80

Virtual block number 60 (0000003C), 512 (0200) bytes

```
6F6D2061 20676E69 74726F70 6D490011 70726F43 2074666F 736F7263 694D202C , Microsoft Corp..Importing a mo 000000
756D2065 6C694600 5241562E 2A007472 6F706D49 00534E47 49534544 006C6564 del.DESIGNS.Import.*.VAR.File mu 000020
7473756D 20656C69 46006E6F 69736E65 74786520 5241562E 20657661 68207473 st have .VAR extension.File must 000040
68632074 73756D20 756F5900 6E6F6973 6E657478 65205241 562E2065 76616820  have .VAR extension.You must ch 000060
27002964 25282763 25270065 6C696620 676E6974 73697865 206E6120 65736F6F oose an existing file.'%c'(%d).' 000080
626F206E 6120676E 69746165 72430073 2500646C 25006425 00296425 28276325 %c'(%d).%d.%ld.%s.Creating an ob 0000A0
25007325 73250000 6E616068 63614200 72007472 6F706D49 206E6F20 7463656A ject on Import.r.Bachman..%s%s.% 0000C0
64636261 5A595857 56555453 5251504F 4E4D4C4B 4A494847 46454443 42410064 d.ABCDEFGHIJKLMNOPQRSTUVWXYZabcd 0000E0
5B265E25 24234021 005F7A79 78777675 74737271 706F6E6D 6C6B6A69 68676665 efghijklmnopqrstuvwxyz_.!@#$%^&[ 000100
01120000 2A002200 2C000A00 0920002D 39383736 35343332 3130002E 3F7D7B50 ]{}?..0123456789-. ....,.".*.... 000120
01940167 0001018E 01650000 01880162 00050182 01560004 017C0148 00030176 v...H.|...V.....b.....e.....g... 000140
20643225 20643425 00646C25 00000000 00000009 FFFF016B 0006019A 01690002 ..i.....k...........%ld.%4d-%2d- 000160
296C6C75 6E28005C 005C0000 646C3625 2E643225 2E643225 2E643225 20643225 %2d-%2d.%2d.%2d.%6ld..\.\.(null) 000180
00000000 00000000 00000000 00000000 00000000 2320202B 00296C6C 756E2800 .(null).+- #.................... 0001A0
6E6F4D6E 75531C02 01F80208 01F40001 00004650 00544445 00545345 00005A54 TZ..EST.EDT.PF....¶...½...SunMon 0001C0
4A79614D 72704172 614D6265 466E614A 00746153 69724675 68546465 57657554 TueWedThuFriSat.JanFebMarAprMayJ 0001E0
```

```
Dump of file SATURN:[PCCOMMON.DUMP.DLL]SA-IMPRT.DLL;1 on 18-APR-1990 10:51:06.27
File ID (451,16,0)   End of file block 79 / Allocated 80

Virtual block number 61 (0000003D), 512 (0200) bytes

30E720C0 20C00000 00000000 63654476 6F4E7463 4F706553 6775416C 754A6E75 unJulAugSepOctNovDec......â â 00 000000
00000000 00000000 00000000 00000000 00000000 00000000 00000000 020420C0 â............................... 000020
00000000 00000000 00000000 00000000 00000000 00000000 00000000 00000000 ................................ 000040
00000000 00000000 00000000 00000000 00000000 00000000 00000000 00000000 ................................ 000060
00000000 00000000 00000000 00000000 00000000 00000000 00000000 00000000 ................................ 000080
00000000 00000000 00000000 00000000 00000000 00000000 00000000 00000000 ................................ 0000A0
00000000 00000000 00000000 00000000 00000000 00000000 00000000 00000000 ................................ 0000C0
00000000 00000000 00000000 00000000 00000000 00000000 00000000 00000000 ................................ 0000E0
00000000 00000000 00000000 00000000 00000000 00000000 00000000 00000000 ................................ 000100
00000000 00000000 00000000 00000000 00000000 00000000 00000000 00000000 ................................ 000120
00000000 00000000 00000000 00000000 00000000 00000000 00000000 00000000 ................................ 000140
00000000 00000000 00000000 00000000 00000000 00000000 00000000 00000000 ................................ 000160
00000000 00000000 00000000 00000000 00000000 00000000 00000000 00000000 ................................ 000180
00000000 00000000 00000000 00000000 00000000 00000000 00000000 00000000 ................................ 0001A0
00000000 00000000 00000000 00000000 00000000 00000000 00000000 00000000 ................................ 0001C0
00000000 00000000 00000000 00000000 00000000 00000000 00000000 00000000 ................................ 0001E0

Dump of file SATURN:[PCCOMMON.DUMP.DLL]SA-IMPRT.DLL;1 on 18-APR-1990 10:51:06.27
File ID (451,16,0)   End of file block 79 / Allocated 80

Virtual block number 62 (0000003E), 512 (0200) bytes

00000000 00000000 00000000 00000000 00000000 00000000 00000000 00000000 ................................ 000000
00000000 00000000 00000000 00000000 00000000 00000000 00000000 00000000 ................................ 000020
00000000 00000000 00000000 00000000 00000000 00000000 00000000 00000000 ................................ 000040
00000000 00000000 00000000 00000000 00000000 00000000 00000000 00000000 ................................ 000060
00000000 00000000 00000000 00000000 00000000 00000000 00000000 00000000 ................................ 000080
00000000 00000000 00000000 00000000 00000000 00000000 00000000 00000000 ................................ 0000A0
00000000 00000000 00000000 00000000 00000000 00000000 00000000 00000000 ................................ 0000C0
00000000 00000000 00000000 00000000 00000000 00000000 00000000 00000000 ................................ 0000E0
00000000 00000000 00000000 00000000 00000000 00000000 00000000 00000000 ................................ 000100
00000000 00000000 00000000 00000000 00000000 00000000 00000000 00000000 ................................ 000120
00000000 00000000 00000000 00000000 00000000 00000000 00000000 00000000 ................................ 000140
00000000 00000000 00000000 00000000 00000000 00000000 00000000 00000000 ................................ 000160
00000000 00000000 00000000 00000000 00000000 00000000 00000000 00000000 ................................ 000180
00000000 00000000 00000000 00000000 00000000 00000000 00000000 00000000 ................................ 0001A0
00000000 00000000 00000000 00000000 00000000 00000000 00000000 00000000 ................................ 0001C0
00000000 00000000 00000000 00000000 00000000 00000000 00000000 00000000 ................................ 0001E0

Dump of file SATURN:[PCCOMMON.DUMP.DLL]SA-IMPRT.DLL;1 on 18-APR-1990 10:51:06.27
File ID (451,16,0)   End of file block 79 / Allocated 80

Virtual block number 63 (0000003F), 512 (0200) bytes

00000000 00000000 00000000 00000000 00000000 00000000 00000000 00000000 ................................ 000000
00000000 00011BFE 00000000 06680000 00304F46 4E495F45 4C49465F 435F0250 P._C_FILE_INFO=...h.....±....... 000020
00000000 00000000 00000000 02020000 00000000 00000000 01020000 00000000 ................................ 000040
00000000 00000000 00000000 00000000 00000000 00000000 00000000 00000000 ................................ 000060
00000000 00000000 00000000 00000000 00000000 00000000 00000000 00000000 ................................ 000080
00000000 00000000 00000000 00000000 00000000 00000000 00000000 00000000 ................................ 0000A0
00000000 00000000 00000000 00000000 00000000 00000000 00000000 00000000 ................................ 0000C0
00000000 00000000 00000000 00000000 00000000 00000000 00000000 00000000 ................................ 0000E0
00000000 00000000 00000000 00000000 00000000 00000000 00000000 00000000 ................................ 000100
00000000 00000000 00000000 00000000 00000000 00000000 00000000 00000000 ................................ 000120
00000000 00000000 00000000 00000000 00000000 00000000 00000000 00000000 ................................ 000140
00000000 00000000 00000000 00000000 00000000 00000000 00000000 00000000 ................................ 000160
00000000 00000000 00000000 00000000 00000000 00000000 00000000 00000000 ................................ 000180
00000000 00000000 00000000 00000000 00000000 00000000 00000000 00000000 ................................ 0001A0
00000000 00000000 00000000 00000000 00000000 00000000 00000000 00000000 ................................ 0001C0
00000000 00000000 00000000 00000000 00000000 00000000 00000000 00000000 ................................ 0001E0
```

```
Dump of file SATURN:[PCCOMMON.DUMP.DLL]SA-IMPRT.DLL;1 on 18-APR-1990 10:51:06.27
File ID (451,16,0)    End of file block 79 / Allocated 80

Virtual block number 64 (00000040), 512 (0200) bytes

00000000 00000000 00000000 00000000 00000000 00000000 00000000 00000000 ................................ 000000
00000000 00000000 00000000 00000000 00000000 00000000 00000000 00000000 ................................ 000020
00000000 00000000 00000000 00000000 00000000 00000000 00000000 00000000 ................................ 000040
00000000 00000000 00000000 00000000 00000000 00000000 00000000 00000000 ................................ 000060
00000000 00000000 00000000 00000000 00000000 00000000 00000000 00000000 ................................ 000080
00000000 00000000 00000000 00000000 00000000 00000000 00000000 00000000 ................................ 0000A0
00000000 00000000 00000000 00000000 00000000 00000000 00000000 00000000 ................................ 0000C0
00000000 00000000 00000000 00000000 00000000 00000000 00000000 00000000 ................................ 0000E0
00000000 00000000 00000000 00000000 00000000 00000000 00000000 00000000 ................................ 000100
00000000 00000000 00000000 00000000 00000000 00000000 00000000 00000000 ................................ 000120
00000000 00000000 00000000 00000000 00000000 00000000 00000000 00000000 ................................ 000140
00000000 00000000 00000000 00000000 00000000 00000000 00000000 00000000 ................................ 000160
00000000 00000000 00000000 00000000 00000000 00000000 00000000 00000000 ................................ 000180
00000000 00000000 00000000 00000000 00000000 00000000 00000000 00000000 ................................ 0001A0
00000000 00000000 00000000 00000000 00000000 00000000 00000000 00000000 ................................ 0001C0
00000000 00000000 00000000 00000000 00000000 00000000 00000000 00000000 ................................ 0001E0

Dump of file SATURN:[PCCOMMON.DUMP.DLL]SA-IMPRT.DLL;1 on 18-APR-1990 10:51:06.27
File ID (451,16,0)    End of file block 79 / Allocated 80

Virtual block number 65 (00000041), 512 (0200) bytes

00000000 00000000 00000000 00000000 00000000 00000000 00000000 00000000 ................................ 000000
00000000 00000000 00000000 00000000 00000000 00000000 00000000 00000000 ................................ 000020
00000000 00000000 00000000 00000000 00000000 00000000 00000000 00000000 ................................ 000040
00000000 00000000 00000000 00000000 00000000 00000000 00000000 00000000 ................................ 000060
00000000 00000000 00000000 00000000 00000000 00000000 00000000 00000000 ................................ 000080
00000000 00000000 00000000 00000000 00000000 00000000 00000000 00000000 ................................ 0000A0
00000000 00000000 00000000 00000000 00000000 00000000 00000000 00000000 ................................ 0000C0
00000000 00000000 00000000 00000000 00000000 00000000 00000000 00000000 ................................ 0000E0
00000000 00000000 00000000 00000000 00000000 00000000 00000000 00000000 ................................ 000100
00000000 00000000 00000000 00000000 00000000 00000000 00000000 00000000 ................................ 000120
00000000 00000000 00000000 00000000 00000000 00000000 00000000 00000000 ................................ 000140
00000000 00000000 00000000 00000000 00000000 00000000 00000000 00000000 ................................ 000160
00000000 00000000 00000000 00000000 00000000 00000000 00000000 00000000 ................................ 000180
00000000 00000000 00000000 00000000 00000000 00000000 00000000 00000000 ................................ 0001A0
00000000 00000000 00000000 00000000 00000000 00000000 00000000 00000000 ................................ 0001C0
00000000 00000000 00000000 00000000 00000000 00000000 00000000 00000000 ................................ 0001E0

Dump of file SATURN:[PCCOMMON.DUMP.DLL]SA-IMPRT.DLL;1 on 18-APR-1990 10:51:06.27
File ID (451,16,0)    End of file block 79 / Allocated 80

Virtual block number 66 (00000042), 512 (0200) bytes

00000000 00000000 00000000 00000000 00000000 00000000 00000000 00000000 ................................ 000000
00000000 00000000 00000000 00000000 00000000 00000000 00000000 00000000 ................................ 000020
00000000 00000000 00000000 00000000 00000000 00000000 00000000 00000000 ................................ 000040
00000000 00000000 00000000 00000000 00000000 00000000 00000000 00000000 ................................ 000060
00000000 00000000 00000000 00000000 00000000 00000000 00000000 00000000 ................................ 000080
00000000 00000000 00000000 00000000 00000000 00000000 00000000 00000000 ................................ 0000A0
00000000 00000000 00000000 00000000 00000000 00000000 00000000 00000000 ................................ 0000C0
00000000 00000000 00000000 00000000 00000000 00000000 00000000 00000000 ................................ 0000E0
00000000 00000000 00000000 00000000 00000000 00000000 00000000 00000000 ................................ 000100
00000000 00000000 00000000 00000000 00000000 00000000 00000000 00000000 ................................ 000120
00000000 00000000 00000000 00000000 00000000 00000000 00000000 00000000 ................................ 000140
00000000 00000000 00000000 00000000 00000000 00000000 00000000 00000000 ................................ 000160
00000000 00000000 00000000 00000000 00000000 00000000 00000000 00000000 ................................ 000180
00000000 00000000 00000000 00000000 00000000 00000000 00000000 00000000 ................................ 0001A0
00000000 00000000 00000000 00000000 00000000 00000000 00000000 00000000 ................................ 0001C0
00000000 00000000 00000000 00000000 00000000 00000000 00000000 00000000 ................................ 0001E0
```

```
Dump of file SATURN:[PCCOMMON.DUMP.DLL]SA-IMPRT.DLL;1 on 18-APR-1990 10:51:06.27
File ID (451,16,0)   End of file block 79 / Allocated 80

Virtual block number 67 (00000043), 512 (0200) bytes

00000000 00000000 00000000 00000000 00000000 00000000 00000000 00000000 ................................ 000000
00000000 00000000 00000000 00000000 00000000 00000000 00000000 00000000 ................................ 000020
00000000 00000000 00000000 00000000 00000000 00000000 00000000 00000000 ................................ 000040
00000000 00000000 00000000 00000000 00000000 00000000 00000000 00000000 ................................ 000060
00000000 00000000 00000000 00000000 00000000 00000000 00000000 00000000 ................................ 000080
00000000 00000000 00000000 00000000 00000000 00000000 00000000 00000000 ................................ 0000A0
00000000 00000000 00000000 00000000 00000000 00000000 00000000 00000000 ................................ 0000C0
00000000 00000000 00000000 00000000 00000000 00000000 00000000 00000000 ................................ 0000E0
00000000 00000000 00000000 00000000 00000000 00000000 00000000 00000000 ................................ 000100
00000000 00000000 00000000 00000000 00000000 00000000 00000000 00000000 ................................ 000120
00000000 00000000 00000000 00000000 00000000 00000000 00000000 00000000 ................................ 000140
00000000 00000000 00000000 00000000 00000000 00000000 00000000 00000000 ................................ 000160
00000000 00000000 00000000 00000000 00000000 00000000 00000000 00000000 ................................ 000180
00000000 00000000 00000000 00000000 00000000 00000000 00000000 00000000 ................................ 0001A0
00000000 00000000 00000000 00000000 00000000 00000000 00000000 00000000 ................................ 0001C0
00000000 00000000 00000000 00000000 00000000 00000000 00000000 00000000 ................................ 0001E0

Dump of file SATURN:[PCCOMMON.DUMP.DLL]SA-IMPRT.DLL;1 on 18-APR-1990 10:51:06.27
File ID (451,16,0)   End of file block 79 / Allocated 80

Virtual block number 68 (00000044), 512 (0200) bytes

00000000 00000000 00000000 00000000 00000000 00000000 00000000 00000000 ................................ 000000
00000000 00000000 00000000 00000000 00000000 00000000 00000000 00000000 ................................ 000020
00000000 00000000 00000000 00000000 00000000 00000000 00000000 00000000 ................................ 000040
00000000 00000000 00000000 00000000 00000000 00000000 00000000 00000000 ................................ 000060
00000000 00000000 00000000 00000000 00000000 00000000 00000000 00000000 ................................ 000080
00000000 00000000 00000000 00000000 00000000 00000000 00000000 00000000 ................................ 0000A0
00000000 00000000 00000000 00000000 00000000 00000000 00000000 00000000 ................................ 0000C0
00000000 00000000 00000000 00000000 00000000 00000000 00000000 00000000 ................................ 0000E0
00000000 00000000 00000000 00000000 00000000 00000000 00000000 00000000 ................................ 000100
00000000 00000000 00000000 00000000 00000000 00000000 00000000 00000000 ................................ 000120
00000000 00000000 00000000 00000000 00000000 00000000 00000000 00000000 ................................ 000140
00000000 00000000 00000000 00000000 00000000 00000000 00000000 00000000 ................................ 000160
00000000 00000000 00000000 00000000 00000000 00000000 00000000 00000000 ................................ 000180
00000000 00000000 00000000 00000000 00000000 00000000 00000000 00000000 ................................ 0001A0
00000000 00000000 00000000 00000000 00000000 00000000 00000000 00000000 ................................ 0001C0
00000000 00000000 00000000 00000000 00000000 00000000 00000000 00000000 ................................ 0001E0

Dump of file SATURN:[PCCOMMON.DUMP.DLL]SA-IMPRT.DLL;1 on 18-APR-1990 10:51:06.27
File ID (451,16,0)   End of file block 79 / Allocated 80

Virtual block number 69 (00000045), 512 (0200) bytes

00000000 00000000 00000000 00000000 00000000 00000000 00000000 00000000 ................................ 000000
00000000 00000000 00000000 00000000 00000000 00000000 02000001 00000000 ................................ 000020
00000000 00000000 00000000 00000000 00000000 00000000 00000000 00000000 ................................ 000040
00000000 00000000 00000000 00000000 00000000 00000000 00000000 00000000 ................................ 000060
00000000 00000000 00000000 00000000 00000000 00000000 00000000 00000000 ................................ 000080
00000000 00000000 00000000 00000000 00000000 00000000 00000000 00000000 ................................ 0000A0
00000000 00000000 00000000 00000000 00000000 00000000 00000000 00000000 ................................ 0000C0
00000000 00000000 00000000 00000000 00000000 00000000 00000000 00000000 ................................ 0000E0
00000000 00000000 00000000 00000000 00000000 00000000 00000000 00000000 ................................ 000100
00000000 00000000 00000000 00000000 00000000 00000000 00000000 00000000 ................................ 000120
00000000 00000000 00000000 00000000 00000000 00000000 00000000 00000000 ................................ 000140
00000000 00000000 00000000 00000000 00000000 00000000 00000000 00000000 ................................ 000160
00000000 00000000 00000000 00000000 00000000 00000000 00000000 00000000 ................................ 000180
00000000 00000000 00000000 00000000 00000000 00000000 00000000 00000000 ................................ 0001A0
00000000 00000000 00000000 00000000 00000000 00000000 00000000 00000000 ................................ 0001C0
00000000 00000000 00000000 00000000 00000000 00000000 00000000 00000000 ................................ 0001E0
```

```
Dump of file SATURN:[PCCOMMON.DUMP.DLL]SA-IMPRT.DLL;1 on 18-APR-1990 10:51:06.27
File ID (451,16,0)   End of file block 79 / Allocated 80

Virtual block number 70 (00000046), 512 (0200) bytes

00000000 00000000 00000000 00000000 00000000 00000000 00000000 00000000 ................................ 000000
00000000 00000000 00000000 00000000 00000000 00000000 00000000 00000000 ................................ 000020
00000000 00000000 00000000 00000000 00000000 00000000 00000000 00000000 ................................ 000040
00000000 00000000 00000000 00000000 00000000 00000000 00000000 00000000 ................................ 000060
00000000 00000000 00000000 00000000 00000000 00000000 00000000 00000000 ................................ 000080
00000000 00000000 00000000 00000000 00000000 00000000 00000000 00000000 ................................ 0000A0
00000000 00000000 00000000 00000000 00000000 00000000 00000000 00000000 ................................ 0000C0
00000000 00000000 00000000 00000000 00000000 00000000 00000000 00000000 ................................ 0000E0
00000000 00000000 00000000 00000000 00000000 00000000 00000000 00000000 ................................ 000100
00000000 00000000 00000000 00000000 00000000 00000000 00000000 00000000 ................................ 000120
00000000 00000000 00000000 00000000 00000000 00000000 00000000 00000000 ................................ 000140
00000000 00000000 00000000 00000000 00000000 00000000 00000000 00000000 ................................ 000160
00000000 00000000 00000000 00000000 00000000 00000000 00000000 00000000 ................................ 000180
00000000 00000000 00000000 00000000 00000000 00000000 00000000 00000000 ................................ 0001A0
00000000 00000000 00000000 00000000 00000000 00000000 00000000 00000000 ................................ 0001C0
00000000 00000000 00000000 00000000 00000000 00000000 00000000 00000000 ................................ 0001E0

Dump of file SATURN:[PCCOMMON.DUMP.DLL]SA-IMPRT.DLL;1 on 18-APR-1990 10:51:06.27
File ID (451,16,0)   End of file block 79 / Allocated 80

Virtual block number 71 (00000047), 512 (0200) bytes

00000000 00000000 00000000 00000000 00000000 00000000 00000000 00000000 ................................ 000000
00000000 00000000 00000000 00000000 00000000 00000000 00000000 00000000 ................................ 000020
00000000 00000000 00000000 00000000 00000000 00000000 00000000 00000000 ................................ 000040
00000000 00000000 00000000 00000000 00000000 00000000 00000000 00000000 ................................ 000060
00000000 00000000 00000000 00000000 00000000 00000000 00000000 00000000 ................................ 000080
00000000 00000000 00000000 00000000 00000000 00000000 00000000 00000000 ................................ 0000A0
00000000 00000000 00000000 00000000 00000000 00000000 00000000 00000000 ................................ 0000C0
00000000 00000000 00000000 00000000 00000000 00000000 00000000 00000000 ................................ 0000E0
00000000 00000000 00000000 00000000 00000000 00000000 00000000 00000000 ................................ 000100
00000000 00000000 00000000 00000000 00000000 00000000 00000000 00000000 ................................ 000120
00000000 00000000 00000000 00000000 00000000 00000000 00000000 00000000 ................................ 000140
00000000 00000000 00000000 00000000 00000000 00000000 00000000 00000000 ................................ 000160
00000000 00000000 00000000 00000000 00000000 00000000 00000000 00000000 ................................ 000180
00000000 00000000 00000000 00000000 00000000 00000000 00000000 00000000 ................................ 0001A0
00000000 00000000 00000000 00000000 00000000 00000000 00000000 00000000 ................................ 0001C0
00000000 00000000 00000000 00000000 00000000 00000000 00000000 00000000 ................................ 0001E0

Dump of file SATURN:[PCCOMMON.DUMP.DLL]SA-IMPRT.DLL;1 on 18-APR-1990 10:51:06.27
File ID (451,16,0)   End of file block 79 / Allocated 80

Virtual block number 72 (00000048), 512 (0200) bytes

12480000 00000000 00000000 00000000 00000000 00000000 00000000 00000000 ..............................H. 000000
00000000 18663232 18623232 185E3232 185A3232 1BEA3232 00000000 00000252 R.......22ō.22Z.22^.22b.22f..... 000020
20202020 20202020 20202020 20202028 28282828 20202020 20202020 20000101 ...          (((((              000040
10101084 84848484 84848484 84101010 10101010 10101010 10101010 48202020    H........................... 000060
10100101 01010101 01010101 01010101 01010101 01018181 81818181 10101010 ................................ 000080
10100202 02020202 02020202 02020202 02020202 02028282 82828282 10101010 ................................ 0000A0
00000000 00000000 00000000 00000000 00000000 00000000 00000000 00201010 .. ............................. 0000C0
00000000 00000000 00000000 00000000 00000000 00000000 00000000 00000000 ................................ 0000E0
00000000 00000000 00000000 00000000 00000000 00000000 00000000 00000000 ................................ 000100
00000000 00000000 00000000 00000000 00000000 00000000 00000000 00000000 ................................ 000120
FFFF016D 014E0130 011100F3 00D400B5 00970078 005A003B 001EFFFF 00000000 ........;.Z.x...ç.å.µ...C.N.m... 000140
00000200 FFFFFFFF 016C0140 012F0110 00F200D3 00840096 00770059 003A001E ..:.Y.w...Ç.Æ.·.../.M.l......... 000160
00000000 00000000 00000000 81818101 00000001 00000000 00000000 00000000 ...........................  ... 000180
00000000 00000000 00000000 00000000 00000000 00000000 00000000 00000000 ................................ 0001A0
00000000 00000000 00000000 00000000 00000000 00000000 00000000 00000000 ................................ 0001C0
00000000 00000000 00000000 00000000 00000000 00000000 00000000 00000000 ................................ 0001E0
```

Dump of file SATURN:[PCCOMMON.DUMP.DLL]SA-IMPRT.DLL;1 on 18-APR-1990 10:51:06.27
File ID (451,16,0)   End of file block 79 / Allocated 80

Virtual block number 73 (00000049), 512 (0200) bytes 00000000 00000000 00000000 00000000 00000000 00000000 00000000 00000000 ................................ 000000
00000000 00000000 00000000 00000000 00000000 00000000 00000000 00000000 ................................ 000020
00000000 00000000 00000000 00000000 00000000 00000000 00000000 00000000 ................................ 000040
00000000 00000000 00000000 00000000 00000000 00000000 00000000 00000000 ................................ 000060
0A0A0A0A 0A0A0A0A 0A0A0A0A 0A0A0A00 00000000 00000000 00000000 00000000 ................................ 000080
0A0A0A0A 0A0A0A0A 0A0A0A0A 0A0A0A0A 0A0A0A0A 0A0A0A0A 0A0A0A0A 0A0A0A0A ................................ 0000A0
0A0A0A0A 0A0A0A0A 0A0A0A0A 0A0A0A0A 0A0A0A0A 0A0A0A0A 0A0A0A0A 0A0A0A0A ................................ 0000C0
0A0A0A0A 0A0A0A0A 0A0A0A0A 0A0A0A0A 0A0A0A0A 0A0A0A0A 0A0A0A0A 0A0A0A0A ................................ 0000E0
0A0A0A0A 0A0A0A0A 0A0A0A0A 0A0A0A0A 0A0A0A0A 0A0A0A0A 0A0A0A0A 0A0A0A0A ................................ 000100
0A0A0A0A 0A0A0A0A 0A0A0A0A 0A0A0A0A 0A0A0A0A 0A0A0A0A 0A0A0A0A 0A0A0A0A ................................ 000120
0A0A0A0A 0A0A0A0A 0A0A0A0A 0A0A0A0A 0A0A0A0A 0A0A0A0A 0A0A0A0A 0A0A0A0A ................................ 000140
0A0A0A0A 0A0A0A0A 0A0A0A0A 0A0A0A0A 0A0A0A0A 0A0A0A0A 0A0A0A0A 0A0A0A0A ................................ 000160
00000000 00000000 00000000 0000000A 0A0A0A0A 0A0A0A0A 0A0A0A0A 0A0A0A0A ................................ 000180
00000000 FFFF3238 00002000 00000000 00000000 00000000 00000000 00000000 ......................82...... 0001A0
36520000 3E3E4753 4D4E3C3C 1C000170 1BFC1BFA FFFF0000 00000000 00000000 ...........*.=.p...<<NMSG>>..R6 0001C0
00333030 36520003 000A0077 6F6C6672 65766F20 68636174 7320200A 00303030 000..- stack overflow.....R6003. 0001E0

Dump of file SATURN:[PCCOMMON.DUMP.DLL]SA-IMPRT.DLL;1 on 18-APR-1990 10:51:06.27
File ID (451,16,0)   End of file block 79 / Allocated 80

Virtual block number 74 (0000004A), 512 (0200) bytes 38303036 52000800 0A003020 79622065 64697669 64207265 6765746E 6920200A .- integer divide by 0.....R6008 000000
6E656D75 67726120 726F6620 65636170 73206867 756F6E65 20746F6E 20200A00 ..- not enough space for argumen 000020
65636170 73206867 756F6E65 20746F6E 20200A00 39303036 52000900 0A007374 ts.....R6009..- not enough space 000040
6974206E 757200FF 000A0D00 FC000A00 746E656D 6E6F7269 766E6520 726F6620 for environment...*......run-ti 000060
6F702067 6E697461 6F6C6620 200A0032 30303652 00020020 726F7272 6520656D me error ...R6002..- floating po 000080
00020000 0007186A 00020003 FFFFFF00 0A006465 64616F6C 20746F6E 20746E69 int not loaded..........j. .... 0000A0
7920746F 6E207369 20706C65 481A0352 00000000 00091850 00020000 00080662 b.......P.......R..Help is ot y 0000C0
73206562 20747375 6D20656D 616E656C 69461B00 656C6261 6C696176 61207465 et available..Filename must be s 0000E0
74736978 6520746F 6E207365 6F642073 2520656C 69462700 64656966 69636570 pecified.'File %s does not exist 000100
6C655207 00646C65 69662074 65530A00 73252079 726F7463 65726964 206E6920 in directory %s..Set field..Rel 000120
006E6F69 74616C65 7220403A 3000006E 6F697461 6C657220 313A3000 00657461 ate..0:1 relation..0:M relation. 000140
0A006E77 6F6E6B6E 55080067 6E697274 53070064 6C656966 20797261 6E69420D .Binary field..String..Unknown.. 000160
68632074 65731400 6B636F6C 62747865 74204C4D 440E0074 78657465 74697257 Writetext..DML textblock..set ch 000180
6C656966 20636972 656D756E 6168706C 41130064 6C656966 20726574 63617261 aracter field..Alphanumeric fiel 0001A0
6C65636E 61432074 726F706D 492E0352 00000000 00000000 00000001 00010064 d...............R..Import Cancel 0001C0
2E646574 726F706D 69206E65 65622073 6168206C 65646F6D 206F4E20 2C64656C led, No model has been imported. 0001E0

Dump of file SATURN:[PCCOMMON.DUMP.DLL]SA-IMPRT.DLL;1 on 18-APR-1990 10:51:06.27
File ID (451,16,0)   End of file block 79 / Allocated 80

Virtual block number 75 (0000004B), 512 (0200) bytes

65646F6D 206F4E20 2C646E75 6F662074 6F6E2065 6C696620 74726F70 6D493300 .3Import file not found, No mode 000000
73617720 74726F70 6D494C00 2E646574 726F706D 69206E65 65622073 6168206C l has been imported..LImport was 000020
6F727020 666C6573 74692065 7A696C61 6974696E 69206F74 20656C62 616E7520 unable to initialize itself pro 000040
6574726F 706D6920 6E656562 20736168 206C6564 6F6D206F 4E202C79 6C726570 perly, No model has been importe 000060
2064657A 696E676F 63657220 746F6E20 73617720 656C6966 20736968 54620064 d.bThis file was not recognized 000080
726F706D 69207878 2E332061 20726F20 78782E32 20612072 65687469 65207361 as either a 2.xx or a 3.xx impor 0000A0
726F706D 69206E65 65622073 6168206C 65646F6D 206F4E20 202E656C 69662074 t file.  No model has been impor 0000C0
7420656C 62612072 65676E6F 6C206F6E 20736920 74726F70 6D494500 2E646574 ted..EImport is no longer able t 0000E0
65656220 73616820 6C65646F 6D206F6E 202C7325 20732520 74726F70 6D69206F o import %s %s, no model has bee 000100
65207472 6F706D69 206C616E 7265746E 69206E41 3F006465 74726F70 6D69206E n imported.?An internal import e 000120
6E656562 20736168 206C6564 6F6D206F 6E202C64 65727275 63636F20 726F7272 rror occurred, no model has been 000140
61206465 7265746E 756F636E 65207472 6F706D49 2F002E64 6574726F 706D6920  imported../Import encountered a 000160
25287325 4E002E65 646F6320 726F7272 65206465 7A696E67 6F636572 6E75206E n unrecognized error code..N%s(% 000180
65207361 77207475 706E6920 65687420 666F2064 6E652065 6854203A 2029646C ld) : The end of the input was e 0001A0
6F207374 63656A62 6F207265 766F2067 6E697070 69687320 2C646574 63657078 xpected, skipping over objects o 0001C0
77207463 656A626F 206E4120 3A202964 6C252873 255C0073 25206570 79742066 f type %s.\%s(%ld) : An object w 0001E0

```
Dump of file SATURN:[PCCOMMON.DUMP.DLL]SA-IMPRT.DLL;1 on 18-APR-1990 10:51:06.27
File ID (451,16,0)   End of file block 79 / Allocated 80

Virtual block number 76 (0000004C), 512 (0200) bytes

68206F6E 20736177 20657265 68742068 63696877 20726F66 206E6565 73207361 as seen for which there was no h 000000
20747372 69662065 6874206C 69746E75 20676E69 70706968 73202C72 65646165 eader, skipping until the first  000020
656E696C 20746365 6A626F20 6E41203A 2029646C 25287325 54007265 64616568 header.T%s(%ld) : An object line 000040
74697720 6E696765 6220746F 6E206469 64207461 6874206E 65657320 73617720  was seen that did not begin wit 000060
2873254B 00746365 6A626F20 6E612072 6F662044 49552064 696C6176 20612068 h a valid UID for an object.K%s( 000080
6F662064 656C6961 66206E6F 69746165 72632074 63656A62 4F203A20 29646C25 %ld) : Object creation failed fo 0000A0
69207463 656A626F 202C7325 20657079 7420666F 20746365 6A626F20 6E612072 r an object of type %s, object i 0000C0
646E4520 65727574 61606572 50203A20 29646C25 28732542 002E6465 726F6E67 gnored..B%s(%ld) : Premature End 0000E0
75622064 65746365 70786520 7325206E 6F697463 6573202C 656C6966 20666F20  of file, section %s expected bu 000100
7A696E67 6F636572 6E55203A 2029646C 25287325 30006E65 65732074 6F6E2074 t not seen.0%s(%ld) : Unrecogniz 000120
28732550 00646570 70696B73 20656E69 6C202C6E 65657320 6E65686F 74206465 ed token seen, line skipped.P%s( 000140
69746365 73206E65 68772073 25206E6F 69746365 73207761 53203A20 29646C25 %ld) : Saw section %s when secti 000160
206F7420 676E6970 70696B73 202C6465 74636570 78652073 61772073 25206E6F on %s was expected, skipping to  000180
64207472 6F706D49 203A2029 646C2528 73251600 6E6F6974 63657320 7478656E next section..%s(%ld) : Import d 0001A0
676E6972 74732061 20646574 63657078 45203A20 29646C25 28732532 00656E6F one.2%s(%ld) : Expected a string 0001C0
00000000 00000000 00006465 726F6E67 69207463 656A626F 202C646C 65696620  field, object ignored.... ..... 0001E0

Dump of file SATURN:[PCCOMMON.DUMP.DLL]SA-IMPRT.DLL;1 on 18-APR-1990 10:51:06.27
File ID (451,16,0)   End of file block 79 / Allocated 80

Virtual block number 77 (0000004D), 512 (0200) bytes

726F7272 6520746E 69617274 736E6F43 20732520 3A202964 6C252873 25650352 R.e%s(%ld) : %s Constraint error 000000
76202C29 73252873 25203D20 646C6569 66202C73 25203D20 7463656A 626F2820  (object = %s, field = %s(%s), v 000020
20746365 6A626F20 2C296425 20302074 6C757365 72202C73 25203D20 65756C61 alue = %s, result = %d), object  000040
69662064 65776F6C 6C617369 44203A20 29646C25 2873253B 00646572 6F6E6769 ignored.;%s(%ld) : Disallowed fi 000060
6F6E6769 20746365 6A626F20 2C746365 6A626F20 726F6620 657A6973 20646C65 eld size for object, object igno 000080
69726560 756E2061 20646574 63657078 45203A20 29646C25 2873254A 00646572 red.J%s(%ld) : Expected a numeri 0000A0
202C6E6F 69746973 6F702073 69687420 6E692065 756C6176 20646C65 69662063 c field value in this position,  0000C0
6E726574 6E49203A 2029646C 25287325 46006465 726F6E67 69207463 656A626F object ignored.F%s(%ld) : Intern 0000E0
6F207369 68742072 6F662064 696C6176 6E692065 6C626174 20495352 41206C61 al ARSI table invalid for this o 000100
3A202964 6C252873 25430064 65726F6E 67692074 63656A62 6F202C74 63656A62 bject, object ignored.C%s(%ld) : 000120
69687420 726F6620 27732527 20656C62 61742070 61602064 65746365 70784520  Expected map table '%s' for thi 000140
6C252873 25470064 65707069 6B73206E 6F697463 6573202C 7463656A 626F2073 s object, section skipped.G%s(%l 000160
6D20656C 62617420 70616D20 61206E69 20646C25 20746365 6A624F20 3A202964 d) : Object %ld in a map table m 000180
616D2065 6874206E 69206573 75206F74 20726F69 72702074 73697865 20747375 ust exist prior to use in the ma 0001A0
65696620 65746164 20612064 65746365 70784520 3A202964 6C252873 25300070 p.0%s(%ld) : Expected a date fie 0001C0
7325203A 2029646C 25287325 41006465 726F6E67 69207463 656A626F 202C646C ld, object ignored.A%s(%ld) : %s 0001E0

Dump of file SATURN:[PCCOMMON.DUMP.DLL]SA-IMPRT.DLL;1 on 18-APR-1990 10:51:06.27
File ID (451,16,0)   End of file block 79 / Allocated 80

Virtual block number 78 (0000004E), 512 (0200) bytes

6968736E 6F697461 6C657220 61206E6F 20646563 6E657265 66657220 646C2520  %ld referenced on a relationshi 000000
203A2029 646C2528 73253B00 64656E69 66656420 72657665 6E20747S 62202C70 p, but never defined.;%s(%ld) :  000020
79622064 65746165 7263206C 6D642065 68742067 6E697474 65732072 6F727245 Error setting the dml created by 000040
6F727245 203A2029 646C2528 73253A00 6465726F 6E676920 7463656A 624F202C , Object ignored.:%s(%ld) : Erro 000060
6A624F20 2C656D69 74206E6F 69746165 72632065 68742067 6E697474 65732072 r setting the creation time, Obj 000080
74657320 726F7272 45203A20 29646C25 28732527 00646572 6F6E6769 20746365 ect ignored.'%s(%ld) : Error set 0000A0
45203A20 29646C25 28732528 00796220 64657461 64707520 65687420 676E6974 ting the updated by.(%s(%ld) : E 0000C0
562E0500 65606974 20657461 64707520 65687420 676E6974 74657320 726F7272 rror setting the update time...V 0000E0
206F746E 69206465 776F6C6C 6120796C 6E6F2073 69207472 6F706D49 2C005241 AR.,Import is only allowed into  000100
00000000 00000000 00000000 00010001 006E6769 73656420 7974706D 65206E61 an empty design................. 000120
00699400 00900176 000C0001 00000008 00000000 FFFF0001 000E0352 000001DF Ô...R..................v.....i. 000140
007C0005 80000001 0187000A 00050000 00000000 0183FFFF 01000080 00F40036 6.¶..........................|. 000160
0083007E 00618002 000C0192 00050006 00000000 0000FFFF FFFF0101 00080045 E.......................a.~... 000180
0008004F 00600005 80000001 01980012 00050000 00000000 FFFFFFFF 01020008 .........................m.O... 0001A0
01040008 00870060 005F8000 000101A8 00100005 00000000 0000FFFF FFFF0103 ..............¯......_.m....... 0001C0
FFFF0105 00080045 00600005 80000001 018C0005 00050000 00000000 FFFFFFFF ..............¥.......ᵀ.E....... 0001E0
```

Dump of file SATURN:[PCCOMMON.DUMP.DLL]SA-IMPRT.DLL;1 on 18-APR-1990 10:51:06.27
File ID (451,16,0)    End of file block 79 / Allocated 80

Virtual block number 79 (0000004F), 512 (0200) bytes

```
FFFFFFFF 01060040 0064001E 00058002 000001C2 00000007 00000000 0000FFFF ............ô.........d.a....... 000000
0000FFFF FFFF0107 00080045 00600082 80000001 01C3000B 00050000 00000000 ..........ü.......`.E........... 000020
00000000 FFFFFFFF 01080040 0064001E 00828002 000001CF 00000007 00000000 ........ü.........d.a........... 000040
00000000 0000FFFF FFFF0001 000C0026 000A0037 80020400 01D00002 00030000 ......&.....7...&............... 000060
00030000 00000000 FFFFFFFF 0002000C 0026000A 00678002 000001D3 00060003 ....&.....g...&................. 000080
646F6020 74726F70 6049FFFF FFFF0109 000C0026 000A0097 80020100 01DA0004 ..ö.........&.........Import mod 0000A0
20746E65 72727543 00524156 2E2A003A 6560616E 20656C69 46000000 03006C65 el.....File name:.*.VAR.Current  0000C0
656C6946 005C4154 41445C4E 414D4843 41425C3A 43003A79 726F7463 65726964 directory:.C:\BACHMAN\DATA\.File 0000E0
6F00706C 6548006C 65636E61 43004B4F 00007365 69726F74 63657269 44000073 s..Directories..OK.Cancel.Help.o 000100
00000000 00000000 00000000 00000000 00000000 00000000 00000000 00000000 ................................ 000120
00000000 00000000 00000000 00000000 00000000 00000000 00000000 00000000 ................................ 000140
00000000 00000000 00000000 00000000 00000000 00000000 00000000 00000000 ................................ 000160
00000000 00000000 00000000 00000000 00000000 00000000 00000000 00000000 ................................ 000180
00000000 00000000 00000000 00000000 00000000 00000000 00000000 00000000 ................................ 0001A0
00000000 00000000 00000000 00000000 00000000 00000000 00000000 00000000 ................................ 0001C0
00000000 00000000 00000000 00000000 00000000 00000000 00000000 00000000 ................................ 0001E0
```

Dump of file SATURN:[PCCOMMON.DUMP.DLL]SA-DGFD.DLL;1 on 18-APR-1990 10:50:15.11
File ID (447,10,0)    End of file block 66 / Allocated 68

Virtual block number 1 (00000001), 512 (0200) bytes

```
00000000 00000040 00000000 000000B8 0000FFFF 00000004 00000042 001F5A4D MZ..B...........|.......a....... 000000
00000080 00000000 00000000 00000000 00000000 00000000 00000000 00000000 ................................ 000020
6F6E6E61 63206061 72676F72 70207369 685421CD 4C01B821 CD09B400 0EBA1F0E ..¤..Ç.ël|.LèlThis program canno 000040
00000000 00000024 0A0D002E 65646F6D 20534F44 206E6920 6E757220 65622074 t be run in DOS mode....$....... 000060
000E000E 00000000 00090000 00000000 000B8009 BB789A71 000A062B 0505454E NE..+...q.x£.................... 000080
00000000 00000000 00010002 00040000 00000685 00F00004 00B800B0 00400035 5.a.¯.¦.ô.Þ.ç................... 0000A0
09BE0F00 09BE02CF 08020F00 08020240 0B300F00 0B300193 102A0F00 1029006F o.)...*...0...0.M.......ü.ƒ...ƒ. 0000C0
18D40F00 18D30672 01D80F00 01D80650 01C20F00 01C2062C 2A1C0F00 2A1B0370 p..*...*,.ô...ô.P.Ä...Ä.r.&...å. 0000E0
00020E21 00000000 00A00F21 00950819 00930E00 0093080F 000F0F00 000F080D ..................!.......!...  000100
44464744 20415307 02590003 02580003 004C1EB1 004C082A 00671EB1 00670823 #.g.Ÿ.g.*.L.Ÿ.L...X...Y..SA-DGFD 000120
01CD00E5 00A90019 00070001 00000243 4F525057 4F444E49 57444641 530E0000 ...SAFDWINDOWPROC.........`.Í.ë. 000140
4F4C5455 004C5455 034E4957 4D500500 04A80494 04770431 03EF039E 03BB0376 v.....ÿ.1.w...´...PMWIN.UTL.UTLO 000160
46454449 54470E4C 4F4F544C 4C494B49 54470B49 54470355 4E454D4E 4F495450 PTIONMENU.GTI.GTIKILLTOOL.GTIDEF 000180
47124753 4D444E45 53495447 0A47534D 54534F50 4954470A 434F5250 4C4F4F54 TOOLPROC.GTIPOSTMSG.GTISENDMSG.G 0001A0
444E4957 4C4F4F54 54455349 54471057 4F444E49 574C4F4F 54595245 55514954 TIQUERYTOOLWINDOW.GTISETTOOLWIND 0001C0
55415952 45555149 5447124C 4F4F5457 4F444E49 57595245 55514954 4712574F OW.GTIQUERYWINDOWTOOL.GTIQUERYAU 0001E0
```

Dump of file SATURN:[PCCOMMON.DUMP.DLL]SA-DGFD.DLL;1 on 18-APR-1990 10:50:15.11
File ID (447,10,0)    End of file block 66 / Allocated 68

Virtual block number 2 (00000002), 512 (0200) bytes

```
454D0D4D 454D0352 54504154 41445855 41544553 49544710 52545041 54414458 XDATAPTR.GTISETAUXDATAPTR.MEM.ME 000000
4C414D45 4D0D5041 4548594F 52545345 444D4540 0E504145 48455441 4552434D MCREATEHEAP.MEMDESTROYHEAP.MEMAL 000020
5143414C 4D44D06C 6D64034B 434F4C42 45455246 4D454D0C 4B434F4C 42434F4C LOCBLOCK.MEMFREEBLOCK.dml.DMLACQ 000040
0D4C4544 4F4D4545 52464C4D 440C4E58 54504F54 534C4D44 0A4D5448 45524955 UIREHTM.DMLSTOPTXN.DMLFREEMODEL. 000060
4555514C 4D440844 4C454946 5445534C 4D440844 4C454946 59524555 514C4D44 DMLQUERYFIELD.DMLSETFIELD.DMLQUE 000080
44005453 494C4545 52464C4D 440B314E 4C525952 4555514C 4D440C4E 4C525952 RYRLN.DMLQUERYRLN1.DMLFREELIST.D 0000A0
45544154 53595245 55515245 544C4946 4C4D4413 44494C4D 44595245 55514C4D MLQUERYDMLID.DMLFILTERQUERYSTATE 0000C0
4555514C 4D441146 464F5245 544C4946 4C4D440C 4E4F5245 544C4946 4C4D440B .DMLFILTERON.DMLFILTEROFF.DMLQUE 0000E0
440F4B43 41424C4C 4F524E58 54504F54 534C4D44 12544942 5245544C 49465952 RYFILTERBIT.DMLSTOPTXNROLLBACK.D 000100
4744034C 4C415443 454C4553 45444C4D 440E5443 454A424F 5443454C 45534C4D MLSELECTOBJECT.DMLDESELECTALL.DG 000120
55524145 4C434D47 4411594F 52545345 444D4744 0A455441 4552434D 4744094D M.DGMCREATE.DGMDESTROY.DGMCLEARU 000140
4F424853 45524645 524D4744 0D485345 52464552 4D47440A 5345444F 4D524553 SERMODES.DGMREFRESH.DGMREFRESHBO 000160
47440F4D 4F4F5A50 55544553 4D47440C 4D415247 41494457 4152444D 47440E58 X.DGMDRAWDIAGRAM.DGMSETUPZOOM.DG 000180
45534D47 44004E46 4E45504F 5445534D 47440C45 54554C4F 5342414D 4F4F5A4D MZOOMABSOLUTE.DGMSETOPENFN.DGMSE 0001A0
4C435445 53404744 0D4E4654 4E455458 45544553 4D47440E 4E46544E 49415054 TPAINTFN.DGMSETEXTENTFN.DGMSETCL 0001C0
4F425741 52444D47 440A584F 42544946 4D474409 5449464D 4744064E 4645534F OSEFN.DGMFIT.DGMFITBOX.DGMDRAWBO 0001E0
```

Dump of file SATURN:[PCCOMMON.DUMP.DLL]SA-DGFD.DLL;1 on 18-APR-1990 10:50:15.11
File ID (447,10,0)   End of file block 66 / Allocated 68

Virtual block number 3 (00000003), 512 (0200) bytes

4F4C5058 45574152 44404744 13584F42 4445444E 554F5257 4152444D 47441158 X.DGMDRAWROUNDEDBOX.DGMDRAWEXPLO 000000
44124E4F 47594C4F 50444544 4F4C5058 45574152 44404744 16454E49 4C444544 DEDLINE.DGMDRAWEXPLODEDPOLYGON.D 000020
45444F4C 50584557 4152444D 47441558 4F424445 444F4C50 58455741 52444047 GMDRAWEXPLODEDBOX.DGMDRAWEXPLODE 000040
50595245 55514047 44085450 40524F46 534E4152 54404744 0E474E49 52545344 DSTRING.DGMTRANSFORMPT.DGMQUERYP 000060
47440A4E 45505445 53404744 094F464E 49524553 55595245 55514047 44104E45 EN.DGMQUERYUSERINFO.DGMSETPEN.DG 000080
59524555 51404744 164F464E 49524553 55544553 4D47440E 54494E55 5445534D MSETUNIT.DGMSETUSERINFO.DGMQUERY 0000A0
49524759 504F4344 52414854 45534047 4417454C 444E4148 59504F43 44524148 HARDCOPYHANDLE.DGMSETHARDCOPYGRI 0000C0
0E404153 03584F42 53455353 4F524358 4F425048 53105048 5303444E 554F4244 DBOUND.SHP.SHPBOXCROSSESBOX.SAM. 0000E0
45544145 52434544 4F404047 4400444F 4D035343 4F525045 54414552 43404153 SAMCREATEPROCS.MOD.DGMMODECREATE 000100
45444F4D 4D474411 4C4C5550 45444F4D 4D47440B 48535550 45444F4D 4D47440B .DGMMODEPUSH.DGMMODEPULL.DGMMODE 000120
0354434E 55464553 554F4054 45534544 4F404047 44145453 52494659 52455551 QUERYFIRST.DGMMODESETMOUSEFUNCT. 000140
534C5455 00454B41 4D4E5551 45534C54 550C454B 414D5145 534C5455 0A545544 DUT.UTLSEQMAKE.UTLSEQUNMAKE.UTLS 000160
54504D45 5145534C 54550B4C 45504F50 5145534C 54550B4C 45545352 49465145 EQFIRSTEL.UTLSEQPOPEL.UTLSEQEMPT 000180
4F505343 48115245 544E4952 5045474E 41484354 534F5053 43481453 43480359 Y.HCS.HCSPOSTCHANGEPRINTER.HCSPO 0001A0
544E4952 50534348 0F444952 47544553 5343480A 54554F59 414C4547 41505453 STPAGELAYOUT.HCSSETGRID.HCSPRINT 0001C0
52415453 54554153 0C525453 54454754 5541530A 54554153 044D4152 47414944 DIAGRAM.SAUT.SAUTGETSTR.SAUTSTAR 0001E0

Dump of file SATURN:[PCCOMMON.DUMP.DLL]SA-DGFD.DLL;1 on 18-APR-1990 10:50:15.11
File ID (447,10,0)   End of file block 66 / Allocated 68

Virtual block number 4 (00000004), 512 (0200) bytes 44165455 4C4D4405 47534044 4E455348 5445405F 0C444F48 54454006 4E585454 TTXN.METHOD._METHSENDMSG.DMLUT.D 000000
53494745 5254554C 4D441352 454C444E 41485946 49544F4E 454B414D 54554C4D MLUTMAKENOTIFYHANDLER.DMLUTREGIS 000020
54554C4D 44125445 53524554 53494745 5254554C 4D441045 54454C45 44524554 TERDELETE.DMLUTREGISTERSET.DMLUT 000040
54414C45 52524554 53494745 5254554C 4D441859 4649544F 4E535345 434F5250 PROCESSNOTIFY.DMLUTREGISTERRELAT 000060
5154554C 4D441141 54414458 55415445 5354554C 4D440F45 54414C45 524E5545 EUNRELATE.DMLUTSETAUXDATA.DMLUTQ 000080
6F697463 6E754620 41532200 000F4C03 02980301 02415441 44585541 59524555 UERYAUXDATA......L..."SA Functio 0000A0
54444641 530C0000 726F7469 6445206E 6F697469 736F706D 6F636544 206C616E nal Decomposition Editor...SAFDT 0000C0
4680026A D88EFFFF B81E5657 000026C8 00000000 00000000 01434F52 504C4F4F OOLPROC.........ê&..WV.¡...Äj..F 0000E0
F0468BF8 5EC40000 FFFF9A50 16F8468D 011E6858 6AF076FF 0000FFFF 9A5016F0 Þ.P......vÞjXh...F½.P.....á^½.FÞ 000100
83FFFF00 469AF876 FFFA76FF FC77FF26 FE77FF26 065EC404 06468300 D2878926 &..ø..F..á^.&.w±&.w¤.vª.v½.F.... 000120
FC478B26 065EC404 06468300 CA878926 F85EC4FE 47882606 5EC40206 468308C4 á..F..á^.&.G±á^½&..ò..F..á^.&.G¤ 000140
26F85EC4 00CC8789 260A468B F85EC400 9A978926 00988789 26F85EC4 FE578826 &.W±á^½&....&....á^½.F.&..ë.á^½& 000160
000000DE 87C726F8 5EC4000A 87892600 DC878926 0000B8F8 5EC40000 000487C7 ú.å...á^½|..&..É.&..Ö.á^½&ú.ê... 000180
9A5016EC 468DF876 FFFA76FF 00CCB7FF 26F85EC4 016A0001 00E487C7 26F85EC4 á^½&ú.ö...j.á^½&.ñä..vª.v½.F§.P. 0001A0
EC76FFEE 76FF00C4 97892600 C2878926 EE5688EC 4688F85E C4E24689 0000FFFF .....Fãá^½.F§.VŸ&..ö.&..á..vŸ.v§ 0001C0
5EC40000 FFFF9AEC 76FFEE76 FF000BE9 037500F2 7E830000 FFFF9A50 16F2468D .F·.P......~·.u.Õ...vŸ.v§.....á^ 0001E0

Dump of file SATURN:[PCCOMMON.DUMP.DLL]SA-DGFD.DLL;1 on 18-APR-1990 10:50:15.11
File ID (447,10,0)   End of file block 66 / Allocated 68

Virtual block number 5 (00000005), 512 (0200) bytes

EE76FF00 08E90375 00F27E83 FFFF0000 9AF876FF FA76FF00 D8878926 F2468BF8 ½.F·&..Ä..vª.v½......~·:u.Õ...vŸ 000000
890000B8 000000E4 87C726F8 5EC40000 00D887C7 26F85EC4 0000FFFF 9AEC76FF .v§.....á^½&ú.Ä...á^½&ú.ö...¡... 000020
F676FF00 6A006A00 00DC46C7 08100A46 C70000EA 46C710C8 E846C7F6 5E8CF446 F¶.^-úFÒà.úFõ..úFÖ..úFÉ..j.j..v~ 000040
8DDA76FF DC76FF01 6A006A00 00FFFF9A 046A046A 220068FF FF680257 68F476FF .v¶hW.h..h."j.j......j.j..vÉ.vÖ. 000060
0000FFFF 9A5016FC 4680006A 006A006A 006A0008 681EF476 FFF676FF 5016E846 FÖ.P.v~.v¶.h..j.j.j.j..F¤.P..... 000080
FFE076FF 0A76FF00 C8978926 00C68789 26FE5688 FC468BF8 5EC4E056 890E4689 .FB.VÁá^½.F¤.V±&..ó.&..à..v..vÁ. 0000A0
8DDE76FF E076FF00 6A006A00 00FFFF9A F876FFFA 76FF0A76 FF0000FF FF9ADE76 vB......v..vª.v½.....j.j..vÁ.vB. 0000C0
FFE676FF 00D09789 2600CE87 8926E656 88E44688 F85EC400 00FFFF9A 5016E446 FÖ.P.....á^½.FÖ.V¦&..ö.&..Á..v¦. 0000E0
76FF0000 FFFF9A00 0A681E11 6AE476FF E676FF00 00FFFF9A F876FFFA 76FFE476 vÖ.vª.v½......v¦.vÖj..h........v 000100
0000FFFF 9AFFFF68 FFFF68E4 76FFE676 FF0000FF FF9AFFFF 68FFFF68 E476FFE6 ¦.vÖh..h........v¦.vÖh..h....... 000120
FFFF9AFF FF68FFFF 68E476FF E676FF00 00FFFF9A FFFF6802 6868E476 FFE676FF .v¦.vÖhh.h........v¦.vÖh..h..... 000140
00E90000 B8FFFF17 B39AE476 FFE676FF 04C483FF FF00009A E476FFE6 76FF0000 ...v¦.vÖ......á..v¦.vÖ.°...¡..Õ. 000160
0C76FF10 76FF0C30 E90E4688 D88E0008 B81E5657 000138C8 0006CAC9 5F5E1F00 ..^_èò..àB..WV.¡...Ä.F.Õ0..v..v. 000180
16F6468D 1076FF0C 7CE90000 B80C82E9 FED8868B FED88689 01740000 9A0A76FF .v....t...Ä±..Ä±Õ..¡..Õ|..v..F~. 0001A0
89260000 B8F65EC4 0000FFFF 9A00CEB7 FF260000 B7FF26F6 5EC40000 FFFF9A50 P.....á^~&.ñÅ.&.ñö......á^~¡..&. 0001C0
FFFF9A00 6A006A50 52991046 8B1DAE68 00CAB7FF 26F65EC4 00CE8789 26000087 .Å.&..ö.á^~&.ñò.hÛ..F..RPj.j.... 0001E0

```
Dump of file SATURN:[PCCOMMON.DUMP.DLL]SA-DGFD.DLL;1 on 18-APR-1990 10:50:15.11
File ID (447,10,0)   End of file block 66 / Allocated 68

Virtual block number 6 (00000006), 512 (0200) bytes

 00FFFF9A 00C2B7FF 2600C4B7 FF26F65E C40000FF FF9A0002 B7FF26F6 5EC40000 ..á^-&.ñ@......á^-&.ñá.&.ñó..... 000000
 468D1076 FF0BFAE9 0000B80C 00E90000 B8000107 C7260A5E C40C0EE9 00008800 .|..Õ..á^.&ú...|..Õ..|..Õ*..v..F 000020
 8D00C2B7 FF2600C4 B7FF26F6 5EC40001 00E487C7 26F65EC4 00000401 9A5016F6 -.P......á^-&ú.ŏ...á^-&.ñá.&.ñó.. 000040
 C2B7FF26 00C4B7FF 26F65EC4 0012E903 7500FEF0 BE830000 04239A50 16FEF086 .Þ±.P.#..../Þ±.u.Õ..á^-&.ñá.&.ñó 000060
 04C48304 5808A79A F676FFF8 76FF00D8 878926FE F0868BF6 5EC40000 043F9A00 ..?...á^-..Þ±&..Ä..v½.v-.Ï.X..á. 000080
 26F65EC4 00000475 9A00C2B7 FF2600C4 B7FF26F6 5EC40012 E9037500 FEF0BE83 ./Þ±.u.Õ..á^-&.ñá.&.ñó..u...á^-& 0000A0
 00E487C7 26F65EC4 0000049F 9A00CEB7 FF260000 B7FF26F6 5EC40000 00D887C7 ú.Ä...á^-&.ñÅ.&.ñö......á^-&ú.ŏ. 0000C0
 C4000100 E487C726 F65EC400 0004BC9A 5016F646 8D1076FF 084DE900 00880000 ..|..ÕM..v..F-.P.¥...á^-&ú.ŏ...á 0000E0
 12E90375 00FEF0BE 83000000 F69A5016 FEF0868D 00C2B7FF 2600C4B7 FF26F65E ^-&.ñá.&.ñó...Þ±.P.-..../Þ±.u.Õ. 000100
 FF00D887 8926FEF0 868BF65E C4000001 0A9A00C2 B7FF2600 C4B7FF26 F65EC400 .á^-&.ñá.&.ñó......á^-..Þ±&..Ä.. 000120
 2600C4B7 FF26F65E C40012E9 037500FE F0BE8304 C483048C 08A79AF6 76FFF876 v½.v-.Ï....á../Þ±.u.Õ..á^-&.ñá.& 000140
 C4830509 08A79AF6 76FFF876 FF000000 D887C726 F65EC400 0001349A 00C2B7FF .ñó..4...á^-&ú.Ä....v½.v-.Ï....á 000160
 00008800 0000E487 C726F65E C4000005 1C9A00CE B7FF2600 D0B7FF26 F65EC404 .á^-&.ñÅ.&.ñö......á^-&ú.ŏ...|.. 000180
 87C726F6 5EC40000 00E687C7 26F65EC4 0000052F 9A5016F6 468D1076 FF0A92E9 Õ...v..F-.P./...á^-&ú.|...á^-&ú. 0001A0
 FFFF9A06 76FF0876 FF0A76FF 0C76FF00 EAB7FF26 00ECB7FF 26F65EC4 000000E8 Ò...á^-&.ñš.&.ñõ..v..v..v..v.... 0001C0
 5EC404C4 83012205 A69AF676 FFF876FF 0020E903 750000E6 BF8326F6 5EC40000 ..á^-&.«Ì..u.Õ ..v½.v-.Ï."..á.á^ 0001E0

Dump of file SATURN:[PCCOMMON.DUMP.DLL]SA-DGFD.DLL;1 on 18-APR-1990 10:50:15.11
File ID (447,10,0)   End of file block 66 / Allocated 68

Virtual block number 7 (00000007), 512 (0200) bytes

 D29A5016 F6468D10 76FF0A1F E90000B8 0000FFFF 9A00CEB7 FF2600D0 B7FF26F6 -&.ñÅ.&.ñö......|..Õ...v..F-.P.@ 000000
 B7FF2600 C4B7FF26 F65EC4FA 46890846 8BFE5689 FC46890C 56880A46 88000002 ....F..V..F=.V±.F..F*á^-&.ñá.&.ñ 000020
 FE76FF01 21E90374 22FEDEBE 830000FF FF9A5016 FEDE868D FC76FFFE 76FF00C2 ô..v±.v=..ß±.P....../ß±"t.ÕÌ..v± 000040
 0074E903 7500E287 0B2600E0 878B26F6 5EC40289 00BD9AF6 76FFF876 FFFC76FF .v=.v½.v-.§...á^-&..Å.&..ã.u.Õt. 000060
 D0B7FF26 F65EC400 DA878926 000C8789 260000B8 F65EC400 68E90374 00FA7E83 .-*.t.Õk.á^-|..&..É.&..Ö.á^-&.ñÅ 000080
 F65EC400 00FFFF9A 50520085 0500E297 8B2600E0 878B26F6 5EC400CE B7FF2600 .&.ñö.á^-&..Å.&..ã....RP.....á^- 0000A0
 286A006A 50520085 0500E297 8B2600E0 878B26F6 5EC400CE B7FF2600 D0B7FF26 &.ñÅ.&.ñö.á^-&..Å.&..ã....RPj.j( 0000C0
 E2870B26 00E0878B 26F65EC4 0065E900 0007159A 016A066A 006A016A 286A006A j.j(j.j.j.j......Õe.á^-&..Å.&..ã 0000E0
 26F65EC4 00E2978B 2600E087 8B26F65E C4004AE9 037500FA 7E830053 E9037500 .u.ÕS..-*.u.ÕJ.á^-&..Å.&..ã.á^-& 000100
 8B2600E0 878B26F6 5EC400CE B7FF2600 D0B7FF26 F65EC400 DC978926 000A8789 ..Ö.&..É.á^-&.ñÅ.&.ñö.á^-&..Å.&. 000120
 E0878B26 F65EC400 00073C9A 286A006A 286A006A 066A086A 50520085 0500E297 .ã....RPj.j.j.j(j.j(.<...á^-&..Å 000140
 BE8300BC E9000A87 8926000C 87892600 00B8F65E C40010E9 037400E2 870B2600 .&..ã.t.Õ..á^-|..&..É.&..Ö.Õ¥../ 000160
 C70000FE EA86C701 90FEE886 C7FEE086 89FEE286 890000B8 00B2E903 741DFEDE ß±.t.Õÿ.|....ã±..Å±ú.Õ±..ú.õ±..ú 000180
 C4004DE9 037400FA 7E83FEEC 8689FEEE 86890000 B8FFFFFE E686C7FF B0FEE486 .Õ±¯.ú.Ì±..|....Ý±..š±.-*.t.ÕM.á 0001A0
 0005C99A 5016FEE0 868D00CE B7FF2600 D0B7FF26 F65EC400 00000E87 C726F65E ^-&ú.B...á^-&.ñÅ.&.ñö...Å±.P.è.. 0001C0
 006A016A 146A006A 146A006A 5016FEE0 868D00CE B7FF2600 D0B7FF26 F65EC400 .á^-&.ñÅ.&.ñö...Å±.Pj.j.j.j.j.j. 0001E0

Dump of file SATURN:[PCCOMMON.DUMP.DLL]SA-DGFD.DLL;1 on 18-APR-1990 10:50:15.11
File ID (447,10,0)   End of file block 66 / Allocated 68

Virtual block number 8 (00000008), 512 (0200) bytes

 6A5016FE E0868000 CEB7FF26 00D0B7FF 26F65EC4 002EE900 00FFFF9A 016A046A j.j......Õ..á^-&.ñÅ.&.ñö...Å±.Pj 000000
 07F5E900 00B80001 00DE87C7 26F65EC4 0000FFFF 9A146A00 6A146A00 6A046A08 .j.j.j.j.j......á^-&ú.B...|..Õ%. 000020
 76FF0A76 FF0C76FF 0E76FF00 CAB7FF26 F65EC400 0007889A 5016F646 8D1076FF .v..F-.P.....á^-&.ñò..v..v..v..v 000040
 FED88689 00000934 9A5016F6 468D1076 FF07C6E9 00008800 00030E9A 0676FF08 ..v......|..Õó..v..F-.P.4.....Ä± 000060
 8B0176E9 037400FE D8BE83FE DC9689FE DA868900 D0978B26 00CE878B 26F65EC4 á^-&..ö.&..Å...Õ±..É±./Ä±.t.Õv.. 000080
 00EFE903 7400027F 832600F9 E9037468 3F83260A 5EC4016B E90375F8 460BF646 F-.F½u.Õk.á^.&.7ht.Õ*.&....t.Õÿ. 0000A0
 74000C87 0B26000A 878B26F6 5EC40000 FFFF9A50 16F6468D FEDAB6FF FEDCB6FF .ÑÉ±.ÑÖ±.F-.P.....á^-&..Ö.&...É.t 0000C0
 C2B7FF26 00C4B7FF 26F65EC4 008BE907 89260247 89260000 B80A5EC4 0010E903 .Õ..á^.|...&.G.&..Õ|.á^-&.ñá.&.ñó 0000E0
 D8868900 00FFFF9A 5016FED0 8680056A 37FF2602 77FF2600 DA9FC426 F65EC400 .á^-&á.Ö.&.w.&.7j...Å±.P.......Ä 000100
 00C4*7FF 26F65EC4 001AE903 75FED286 0BFED086 8B002EE9 037500FE D8BE83FE ±./Ä±.u.Õ....Å±..@±u.Õ..á^-&.ñá. 000120
 078B26FE D09EC406 DCE9FED8 86880000 08B89AFE D086FFFE D286FF00 C2B7FF26 &.ñö..Ñ@±.ÑÅ±.|.....Å±ÕÉ.á.Å±&.. 000140
 89260789 260A5EC4 02578B26 078B2600 DA9FC426 F65EC400 1CE90374 02470B26 &.G.t.Õ..á^-&á.Ö.&..&.W.á^.&..&. 000160
 FF00C2B7 FF2600C4 B7FF26F6 5EC40789 26024789 260000B8 0A5EC400 0DE90257 W.Õ..á^.|..&.G.&..á^-&.ñá.&.ñó.. 000180
 00027FB3 26000AE9 0374693F 83260A5E C40059E9 0000FFFF 9AFED086 FFFED286 Ñ@±.ÑÅ±.....ÕY.á^.&.7it.Õ..&.... 0001A0
 8B26F65E C40020E9 03740002 7F832600 2AE90374 6C3F8326 0A5EC400 16E90375 u.Õ..á^.&.7(t.Õ*.&....t.Õ .á^-&. 0001C0
 00B80A5E C40000E9 063DE900 00880257 89260789 260A5EC4 009A978B 26009887 ...&....á^.&..&.W.|..Õ=.Õ..á^.|. 0001E0
```

Dump of file SATURN:[PCCOMMON.DUMP.DLL]SA-DGFD.DLL;1 on 18-APR-1990 10:50:15.11
File ID (447,10,0)   End of file block 66 / Allocated 68

Virtual block number 9 (00000009), 512 (0200) bytes

```
46801076 FF061AE9 00008807 89260247 89260000 88065EC4 07892602 47892600 .&.G.&..é^.¡..&.G.&..¡..Õ...v..F 000000
8B26F65E C405FAE9 FED8868B 0007E903 75000030 FED88689 00000354 9A5016F6 -.P.T.....Ä±=..u.Õ....Ä±Õ°.é^-&. 000020
D4868D00 CEB7FF26 00008 7FF 26F65EC4 FEDC9689 FEDA8689 00009788 2600CE87 .ö.&..Ä...Ö±..É±é^-&.ñÄ.&.ñö...å 000040
97392600 0AE90374 010E8739 26FED696 8BFED486 8BF65EC4 0000FFFF 9A5016FE ±.P.....é^-..å±..ø±&9...t.Õ..&9. 000060
00CAB7FF 26F65EC4 0000FFFF 9A010068 5016FEF6 868003EF 68003BE9 03750110 ..u.Õ;.hÿ...-±.Ph.......é^-&.ñò. 000080
83027B01 949AFEDA B6FFFEDC B6FF0000 07759A00 6A006A50 16FEF686 8D1DB168 hŸ...-±.Pj.j..u....ÑÉ±.ÑÖ±...(.. 0000A0
09A49A01 00685016 FEF6868D 03E96800 2CE90374 01067E83 03C2E90A 468B04C4 é..F.Õò..-..t.Õ,.hÕ...-±.Ph...É. 0000C0
00008800 00FFFF9A 206A006A 006A006A 5016FEF6 868D016A 006A016A 006A0000 ..j.j.j.j...-±.Pj.j.j.j .....¡.. 0000E0
9A505200 000A529A 016A036A 016A006A 016A006A 0041E903 7401067E 830532E9 Õ2..-..t.ÕA.j.j.j.j.j.j..R...RP. 000100
6A016A01 6A006A01 6A006AFE D8868900 00FFFF9A FEDAB6FF FEDCB6FF 00000A59 Y....ÑÉ±.ÑÖ±.......Ä±j.j.j.j.j.j 000120
DCB6FF00 0FE90374 01067E83 04E1E9FE D8868800 00FFFF9A 50520000 FFFF9A01 ......RP.......Ä±ÕÄ..-..t.Õ...ÑÉ 000140
FFFEDCB6 FF000FE9 03740106 7E8304C3 E90000B8 00000A96 9A016AFE DAB6FFFE ±.ÑÖ±j.......¡..Õù..-..t.Õ...ÑÉ±. 000160
DAB6FFFE DCB6FF00 0FE90374 01067E83 04A5E900 00B80000 0AB49A03 6AFEDAB6 ÑÖ±j..Ç...¡..ÕÉ..-..t.Õ...ÑÉ±.ÑÖ 000180
6AFEDAB6 FFFEDCB6 FF000FE9 03740106 7E830487 E90000B8 00000AD2 9A056AFE ±j..●...¡..Õ...-..t.Õ...ÑÉ±.ÑÖ±j 0001A0
9A096AFE DAB6FFFE DCB6FF00 0FE90374 01067E83 0469E900 00B80000 0AF09A07 ..Þ...¡..Õí..-..t.Õ...ÑÉ±.ÑÖ±j.. 0001C0
0B2C9A08 6AFEDAB6 FFFEDCB6 FF000FE9 03740106 7E83044B E90000B8 0000080E ....¡..ÕK..-..t.Õ...ÑÉ±.ÑÖ±j..,. 0001E0
```

Dump of file SATURN:[PCCOMMON.DUMP.DLL]SA-DGFD.DLL;1 on 18-APR-1990 10:50:15.11
File ID (447,10,0)   End of file block 66 / Allocated 68

Virtual block number 10 (0000000A), 512 (0200) bytes

```
0000084A 9A006AFE DAB6FFFE DCB6FF00 0FE90374 01067E83 042DE900 00B80000 ..¡..Õ-..-..t.Õ...ÑÉ±.ÑÖ±j..J... 000000
00B80000 FFFF9A0E 6AFEDAB6 FFFEDCB6 FF000FE9 03740106 7E83040F E90000B8 ¡..Õ...-..t.Õ...ÑÉ±.ÑÖ±j......¡. 000020
46801076 FF000008 D59A5016 FEC8868D 1076FF00 5FE90374 01067E83 03F1E900 .Õþ..-..t.Õ ..v...à±.P.Í.  .v..F 000040
00000BFA 9A5016FE F2868D00 CEB7FF26 00008 7FF 26F65EC4 000008E2 9A5016F6 -.P.ã...é^-Ē.ñÄ.&.ñö...·±.ı *... 000060
FF00CEB7 FF260000 B7FF26F6 5EC4006A 006AFFFF 68FFFF68 FEC886FF FECAB6FF .Ñò±.Ñà±h..h..j.j.é^-&.ñÄ.&.nó.. 000080
868D1076 FF0065E9 03740106 7E830383 E90000B8 0000FFFF 9AFEF286 FFFEF4B6 Ñ¶±.Ñ·±.....¡..Õ...-..t.Õe..v... 0000A0
FF2600D0 B7FF26F6 5EC40000 0C569A50 16F6468D 1076FF00 000C499A 5016FEC8 à±.P.Ì....v..F-.P.V...é^-&.ñÄ.&. 0000C0
8926F65E C4D8F7C0 18010004 8F8326F6 5EC40000 FFFF9A50 16FEF286 8D00CEB7 ñö...·±.P.....é^-&.¢å...å¥Äé^-&. 0000E0
0000FFFF 9A0004B7 FF26F65E C4FEF2B6 FFFEF4B6 FFFEC8B6 FFFECAB6 FF0004B7 .å..Ñò±.Ñà±.Ñ¶±.Ñ·±é^-&.ñå...... 000100
1076FF00 00FFFF9A 5016FEC8 868D1076 FF0045E9 03740106 7E83030F E90000B8 ¡..Õ...-..t.ÕE..v...à±.P......v. 000120
FF000687 8926F65E C4D8F7C0 18010006 8F8326F6 5EC40000 07599A50 16F6468D .F-.P.Y...é^-&.¢ø...å¥Äé^-&..ø.. 000140
03740106 7E8302B8 E90000B8 0000FFFF 9A0006B7 FF26F65E C4FEDAB6 FFFEDCB6 ÑÉ±.ÑÖ±é^-&.ñø......¡..ÕE..-..t. 000160
9A5016FE F2868DFE DAB6FFFE DCB6FF00 000CE29A 5016FEC8 868D1076 FF0036E9 Õ6..v...à±.P.ã....ÑÉ±.ÑÖ±..·±.P. 000180
830276E9 0000B800 00FFFF9A FEF2B6FF FEF4B6FF FEC8B6FF FECAB6FF 00000CF5 %....Ñò±.Ñà±.Ñ¶±.Ñ·±.....¡..Õv.. 0001A0
868DFEDA B6FFFEDC B6FF0000 0B679A50 16FEC886 8D1076FF 0036E903 7401067E -..t.Õ6..v...à±.P.g....ÑÉ±.ÑÖ±.. 0001C0
00B80000 FFFF9AFE F2B6FFFE F4B6FFFE C8B6FFFE CAB6FF00 000B8C9A 5016FEF2 ·±.P......Ñò±.Ñà±.Ñ¶±.Ñ·±.....¡. 0001E0
```

Dump of file SATURN:[PCCOMMON.DUMP.DLL]SA-DGFD.DLL;1 on 18-APR-1990 10:50:15.11
File ID (447,10,0)   End of file block 66 / Allocated 68

Virtual block number 11 (0000000B), 512 (0200) bytes

```
000DE903 7401067E 83021EE9 0000B8FF FF00009A FEDAB6FF FEDCB6FF 0231E900 .Õ1..ÑÉ±.ÑÖ±.....¡..Õ...-..t.Õ.. 000000
FEDCB6FF 000DE903 7401067E 830202E9 0000B800 57015E9A FEDAB6FF FEDCB6FF .ÑÉ±.ÑÖ±.^.W.¡..Õ...-..t.Õ...ÑÉ± 000020
01067E83 00000874 9A5016F6 46801076 FF01E6E9 0000B8FF FF00029A FEDAB6FF .ÑÖ±.●...¡..Õl..v..F-.P.t....-.. 000040
00FFFF9A 0676FF08 76FF0A76 FF0C76FF 0E76FF00 CAB7FF26 F65EC400 1CE90374 t.Õ..é^-&.ñò..v..v..v..v..v..... 000060
E9037600 4B3D01B0 2000ABE9 0376FE94 E9037501 FC3D0123 E901AEE9 0000B800 .¡..ÕÛ.Õ#.=•.u.Õ.±v.Õ¨.-¯.•K.v.Õ 000080
005F005F 005F005F 005F0CCF 0C8A005F 005F005F 0B540D8A A7FF2E93 C003FFAD Ù..å...Ìα.T._._._...ü._._._._. 0000A0
005F005F 005F005F 09D8090B 005F005F 005F005F 005F005F 005F005F 005F005F _._._._._._._._._._._.Ä.Ä._._._. 0000C0
09D809D8 09D809D8 005F09D8 09D809D8 09D8005F 09D809D8 09D8005F 005F005F ¯._._.Ä.Ä.Ä.¯.Ä.Ä.Ä.Ä._.Ä.Ä.Ä.Ä. 0000E0
005F005F 005F005F 005F09D8 09D809D8 09D809D8 005F09D8 09D809D8 09D809D8 Ä.Ä.Ä.Ä.Ä._.Ä.Ä.Ä.Ä.Ä._._._._. 000100
005F005F 005F005F 002709D8 09D809D8 005F005F 005F005F 005F005F 005F005F _._._._._._._._.Ä.Ä.Ä.'._._._._. 000120
3DFC13E9 03750200 3DFBFDE9 037501FF 3D0028E9 0376FCA0 E9037502 04300BC2 Õ.=..u.Õ.•v.Õ+.=..u.Õ••=..u.Õ.•= 000140
E9037502 0530FED5 E9FC55E9 03750203 3DFC3FE9 03750202 3DFC29E9 03750201 ..u.Õ)•=..u.Õ?•=..u.ÕU•Õ)±=..u.Õ 000160
E9037502 5E30FE6A E9037502 5030FB71 E9037502 0730FC9C E9037502 0630FC86 .•=..u.Õ.•=..u.Õq«=).u.Õj±=^.u.Õ 000180
9A0676FF 0876FF0A 76FF0C76 FF0E76FF 1076FFFE A2E9FE89 E9037502 5F30FE75 u±=_.u.Õ.±ÕÄ±.v..v..v..v..v..v.. 0001A0
30F304E9 03751001 3D0028E9 0376F469 E9037510 CF300068 E9006EE9 0000FFFF ...¯Õn.Õk.=ü.u.Õi¶v.Õ+.=..u.Õåµ= 0001C0
E9F4E9E9 037510CE 3DF5ACE9 037510CC 3DF3CAE9 03751004 3DF3B3E9 03751003 ..u.Õ°µ=..u.Õòµ=ä.u.Õ¯¼=ö.u.ÕÕ¶Õ 0001E0
```

```
Dump of file SATURN:[PCCOMMON.DUMP.DLL]SA-DGFD.DLL;1 on 18-APR-1990 10:50:15.11
File ID (447,10,0)   End of file block 66 / Allocated 68

Virtual block number 12 (0000000C), 512 (0200) bytes

 E903751D B03DFA01 E903751D AF3DF423 E903751D AD3DF60C E9037510 D03DFFAB ".=Ã.u.Õ.-=Ù.u.Õ#¶=£.u.Õ.'=¯.u.Õ 000000
 000006C8 000CCAC9 5F5E1FFF 78E9F80E E903751D B43DF845 E903751D B23DF405 .¶=ý.u.ÕE½=Ç.u.Õ.½Õx..^_èò..à... 000020
 8D1076FF 1276FF00 39E90375 0C460B0A 468B006D E90E468B 088E02A0 B81E5657 WV.¡...Ä.F.Õm..F..F.u.Õ9..v..v.. 000040
 AE6800CA B7FF26FC 5EC40000 00689A50 16FC468D FA76FF00 00FFFF9A 5016FA46 F'.P......v'.F=.P.h...á^=&.ñò.hÛ 000060
 76FF1276 FF002BE9 00008A00 00B80000 09BE9A0A 76FF0C76 FF505299 FA468B1D ..F'.RP.v..v../...¡..¤..Õ+..v..v 000080
 0375000D 3D000BE9 000EE900 00FFFF9A 0676FF08 76FF0A76 FF0C76FF 0E76FF10 ..v..v..v..v..v......Õ..Õ..=..u. 0000A0
 9A0676FF 0876FFD8 8E0F54B8 1E565700 0000C800 0ECAC95F 5E1FFFD5 E9FF8BE9 Õ..Õf..^_èò..à...WV.¡T..Ä.v..v.. 0000C0
 0876FFD8 8E0FE5B8 1E565700 0004C800 04CAC95F 5E1F0000 E90000B8 00000A3D =...¡..Õ¯...^_èò..à...WV.¡l..Ä.v. 0000E0
 0601F502 03004204 CAC95F5E 1F0000E9 00008800 0007DE9A 5016FC46 8D0676FF .v..F=.P.ß...¯¡..Õ...^_èò.B...¥.. 000100
 02023500 02025800 06024C02 03015C00 05037602 03000000 0102B600 0201D100 .Ñ...Ñ.......v...\...Ĺ...X...5.. 000120
 03024600 0201D800 0602E402 03000300 01018101 03007200 030F7502 03000000 .....u...r...........õ...Û...F.. 000140
 09097402 03000000 0403A800 02035E00 060C8002 03043500 0B000A02 03000000 .........5.......^...¨.......t.. 000160
 0101AC01 03000000 0509CD00 02008800 010A0901 0300E900 0500D002 0303C800 .à...Ä...Õ...........ë.......¯.. 000180
 07003B00 02000000 06001F00 02017000 0503C802 03026700 06026E02 03008C00 .....n...g...à...p...........;.. 0001A0
 080CC502 03100100 01026800 05000000 08057C00 02008500 030F8202 03000000 ............|.......k.......é.. 0001C0
 0603E402 03000000 0A004000 02027500 060FF002 03017C00 05039202 03044A00 .J.......|...Þ...u...M.......ð.. 0001E0

Dump of file SATURN:[PCCOMMON.DUMP.DLL]SA-DGFD.DLL;1 on 18-APR-1990 10:50:15.11
File ID (447,10,0)   End of file block 66 / Allocated 68

Virtual block number 13 (0000000D), 512 (0200) bytes

 0301E102 03000000 08100900 02010200 05032002 03021100 06089902 0201F800 .½...........-...............Ã.. 000000
 080B8802 03008200 010FC101 03045C00 080C2C02 03020300 0606ED02 03009800 .....Ú.......,...\...è...ý...¡.. 000020
 06101902 03002900 030ED002 03029100 06066502 03000000 02023800 05046700 .g...B.......e.......Å...)...... 000040
 05082902 03003800 030D8D02 03022000 06022A02 0300AD00 04001402 03031200 .........Ù...*... .......8...).. 000060
 030F9E02 03008B00 04031802 0304EA00 0E04EE02 03021100 06089C02 05012900 .)...........Ÿ...õ.......£...... 000080
 010A2901 03000000 03024900 05022D00 060A7802 03047C00 0C09EE02 03004300 .C...Ÿ...|...x...-...I.......).. 0000A0
 04002602 03033800 06021902 03004E00 030C9D02 03005C00 010A3001 03005800 .[...0...\.......N.......8...&.. 0000C0
 05055F02 03023D00 06025D02 030F4C00 01017700 05014200 05085E02 0300CA00 .ð...^...B...w...L...]...*...... 0000E0
 01025A00 05024A00 06023B02 03006100 0301D302 03034700 060CB002 03014E00 .N...¯...G...Æ...a...;...J...Z.. 000100
 FF0C76FF D88EFFFF 881E5657 000004C8 00000000 0002CE00 0605FD02 030FD000 .Ï...»...ö.......à...WV.¡...Ã.v.. 000120
 6A0A76FF 0C76FF00 00FFFF9A 016A0A76 FF0C76FF 0000FFFF 9A5016FC 46800A76 v..F=.P.......v..v.j.......v..v.j 000140
 0CC483FF FF00509A FC76FFFE 76FF0A76 FF0C76FF 0676FF08 76FF0000 FFFF9A02 .......v..v..v..v..v±.v=.]....á. 000160
 89FA4689 00008808 8E000888 1E565700 0008C800 08CAC95F 5E1F0000 E9000088 ¡..Õ...^_èò..à...WV.¡...Ä¡...F'. 000180
 FF0876FF 5016F846 8D0A76FF 0C76FF0E 76FF1076 FFFC4689 FE468900 008BF846 F½¡...F±¯F=.v..v..v..v..F½.P.v.. 0001A0
 46800A76 FF0C76FF 0E76FF10 76FF00FE 5E8350FC 6E8310C4 8300C103 589A0676 v..X.ê..á..n=P.^±..v..v..v..v..F 0001C0
 C95F5E1F 0000E900 008810C4 83004800 D19A5052 009C0508 56880646 8B5016F8 ½.P.F..V....RP.Ì.K..á.¡..Õ...^_è 0001E0

Dump of file SATURN:[PCCOMMON.DUMP.DLL]SA-DGFD.DLL;1 on 18-APR-1990 10:50:15.11
File ID (447,10,0)   End of file block 66 / Allocated 68

Virtual block number 14 (0000000E), 512 (0200) bytes

 F0468900 02830030 05025788 26078826 0A5EC4D8 8E006588 1E565700 0014C8CB ùà...WV.¡e..Äá^.&..&.W..0..é..Fþ 000000
 74084708 2606478B 26065EC4 F65689F4 46890657 88260447 8B260A5E C4F25689 .V·á^.&.G.&.W..F¶.V-á^.&.G.&.G.t 000020
 015C0650 9A0676FF 0876FF50 16F0468D 0E76FF10 76FF1276 FF1476FF 0022E903 .Õ"..v..v..v..v..Fþ.P.v..v..P.\. 000040
 46800E76 FF1076FF 1276FF14 76FF0022 E9037400 3F832606 5EC4014F E910C483 .á.Õ0.á^.&.?.t.Õ"..v..v..v..v..F 000060
 47282606 5EC4F656 88F4468B 0121E910 C48301A9 07709A06 76FF0876 FF5016F0 þ.P.v..v..p.`..á.Õl..F¶.V-á^.&+G 000080
 FF00F6E9 03760C47 38260009 E9037D01 04E9037E 0E573826 125EC404 57182602 .&.W.á^.&;W.-.Õ..).Õ..&;G.v.Õ-.. 0000A0
 76FF10C4 8301CD06 509A0676 FF0876FF 5016F046 8D0E76FF 1076FF12 76FF1476 v..v..v..v..Fþ.P.v..v..P.ë..á..v 0000C0
 83024908 929A5016 F0468D02 77FF2604 77FF2606 5EC40E76 FF1076FF 1276FF14 ..v..v..v.á^.&.w.&.w..Fþ.P...I.. 0000E0
 8900D283 004305F2 5688F046 88EE5689 EC468908 57882606 47882606 5EC410C4 á.á^.&.G.&.W..F§.VŸ.Fþ.V·.C..é.. 000100
 88125EC4 FE5689FC 4689000A 83002D2D 06578826 04478826 0A5EC4FA 5689F846 F½.V'á^.&.G.&.W.--..Õ..F=.V±á^.. 000120
 FF0056E9 0003E903 77044739 260009E9 037E0011 E9037D06 573926FE 5688FC46 F=.V±&9W.).Õ..-.Õ..&9G.w.Õ..ÕV.. 000140
 5EC410C4 83009502 909AEC76 FFEE76FF 5016F846 8D0E76FF 1076FF12 76FF1476 v..v..v..v..F½.P.vŸ.v§......á.á^ 000160
 75478826 EC5EC400 FE5E8324 FC6E83FE 5619FC46 29008397 88260081 878826EC §&....&....)F=.V±.n=$.^±.á^§&.Gu 000180
 CBC95F5E 1F0000E9 000088FF 87E90374 EE4608EC 4688EE56 89EC4689 77578826 &.Ww.F§.VŸ.F§.FŸt.Õ..¡..Õ...^_èù 0001A0
 89F84689 000A8300 432D0257 8826078B 260A5EC4 088E0009 881E5657 000010C8 à...WV.¡)..Äá^.&..&.W.-C..Ö..Ï½. 0001C0
 26078826 0A5EC4FE 5689FC46 8900DA83 00282D06 57882604 4788260A 5EC4FA56 V'á^.&.G.&.W.-(..Ö..F=.V±á^.&..& 0001E0
```

```
Dump of file SATURN:[PCCOMMON.DUMP.DLL]SA-DGFD.DLL;1 on 18-APR-1990 10:50:15.11
File ID (447,10,0)    End of file block 66 / Allocated 68

Virtual block number 15 (0000000F), 512 (0200) bytes

F65689F4 4689000A 83007820 06578826 04478826 0A5EC4F2 5689F046 89025788 .V..FÞ.V·á^.&.G.&.V.-x..Ö..F¶.V- 000000
FF1276FF 1476FF0C C4830324 090F9A50 16F8468D 0E76FF10 76FF1276 FF1476FF .v..v..v..v..F½.P.Ö.$..á..v..v.. 000020
FF1276FF 1476FF10 C4830348 04689A06 76FF0876 FF0A76FF 0C76FF0E 76FF1076 v..v..v..v..v..v..h.H..á..v..v.. 000040
00008810 C483012E 00D19A50 52009505 08568806 46885016 F0468D0E 76FF1076 v..v..FÞ.P.F..V....RP.Ñ....á.Ä.. 000060
46890257 88260788 260A5EC4 088E0298 881E5657 000012C8 CBC95F5E 1F0000E9 Ö...^_èùà...WV.Ä...Äá^.&..&.V..F 000080
4788260A 5EC4F856 89F64689 00028301 90050257 88260788 260A5EC4 F05689EE Ÿ.Vðá^.&..&.V.....@..F-.V½á^.&.G 0000A0
89F24689 000A8300 50200657 88260447 88260A5E C4FC5689 FA468906 57882604 .&.V..F°.V=á^.&.G.&.V.-P..Ö..F·. 0000C0
008DE903 7500FE7E 830000FF FF9A5016 FE468012 76FF1476 FF5016EE 468DF456 V¶.FŸ.P.v..v..F±.P.......-±.u.Ö.. 0000E0
76FF1076 FF0025E9 03750000 3004C483 FFFF007C 9A505200 4C050856 88064688 .F..V..L.RP.|....á.=..u.Ö%..v..v 000100
0000FFFF 9A006A00 6A006A50 16EE468D 286A006A 5052004C 05085688 0646880E ..F..V..L.RPj.j(.FŸ.Pj.j.j...... 000120
6A006A04 6A086A50 16EE468D 0E76FF10 76FF001F E9037500 000E8F83 26065EC4 á^.&.éB..u.Ö...v..v..FŸ.Pj.j.j.j 000140
146A006A 146A006A 5016EE46 800E76FF 1076FF00 20E90000 FFFF9A14 6A006A14 .j.j......Ö ..v..v..FŸ.Pj.j.j.j. 000160
881E5657 000026C8 CBC95F5E 1F0000E9 00008800 00FFFF9A 016A046A 006A016A j.j.j.j.......Ä...Ö...^_èùà&..WV.Ä 000180
46890257 88260788 260A5EC4 00000018 9A5016FA 468D0E76 FF1076FF 088E0360 `..Ä.v..v..F°.P.....á^.&..&.V..F 0001A0
D2830230 05025788 26078826 0A5EC400 87978926 00858789 26065EC4 EC5689EA ö.V±á^.&....&....á^.&..&.V..Ö..@ 0001C0
89065788 26044788 260A5EC4 008F9789 26008087 8926065E C4F45689 F2468900 ..F·.V¶á^.&....&....á^.&.G.&.V.. 0001E0

Dump of file SATURN:[PCCOMMON.DUMP.DLL]SA-DGFD.DLL;1 on 18-APR-1990 10:50:15.11
File ID (447,10,0)    End of file block 66 / Allocated 68

Virtual block number 16 (00000010), 512 (0200) bytes

00782006 57882604 4788260A 5EC40093 97892600 91878926 065EC4F8 5689F646 F-.V½á^.&....&....á^.&.G.&.V.-x. 000000
76FF1476 FF5016EA 46800088 97892600 89878926 065EC4F0 5689EE46 89000A83 .Ö..FŸ.Vðá^.&....&.....Fõ.P.v..v 000020
DC56890A 4689EC56 88EA4688 0121E903 7500FE7E 83000003 C39A5016 FE468012 ..F±.P.Ù....-±.u.ÖÌ..Fõ.V$.FÖ.VÉ 000040
4688E056 890E4689 00028300 3C05F056 88EE4688 E45689E2 4689F456 88F24688 .F·.V¶.Fã.VÖ.FŸ.VÞ.<..@..FB.VÄ.F 000060
97392600 29E90374 000A8739 26085688 064688FA 5EC4E856 89E64689 E05688DE 8.VÄ.Fl.Vðá^°.F..V.&9.Ö.t.Ö).&9. 000080
369A286A 006A286A 006A066A 086A5016 EA468D0E 76FF1076 FF001FE9 0374000C É.t.Ö...v..v..Fõ.Pj.j.j.j(j.j(.6 0000A0
6A066A00 6A016A28 6A006A28 6A006A50 16EA468D 0E76FF10 76FF0020 E9000004 ...Ö ..v..v..Fõ.Pj.j(j.j(j.j.j.j 0000C0
0000FFFF 9A016A00 6A006A50 160A468D 026A006A 0E76FF10 76FF0000 04599A01 ..Y....v..v.j.j..FÖ.Pj.j.j...... 0000E0
6A006A50 52005005 08568806 46880E76 FF1076FF F05689EE 4689E056 88DE4688 .FB.VÄ.FŸ.VÞ.v..v..F..V..P.RPj.j 000100
065EC4F8 5689F646 89F05688 EE468800 0006419A 006A006A 006A5016 EA468028 (.Fõ.Pj.j.j..A....FŸ.VÞ.F-.V½á^. 000120
52000405 08568806 46880E76 FF1076FF F05689EE 46890088 97882600 89878826 &....&.....FŸ.VÞ.v..v..F..V....R 000140
CBC95F5E 1F0000E9 00008800 00040C9A 006A006A 006A5016 EA468D28 6A006A50 Pj.j(.Fõ.Pj.j.j.......Ä...Ö...^_èù 000160
89064689 000A8300 1F200257 88260788 260A5EC4 088E0470 881E5657 00002AC8 à°..WV.|p..Äá^.&..&.V.-...Ö..Fø. 000180
83001F05 02578826 0788260A 5EC4E056 89DE4689 02578826 0788260A 5EC40856 VÄá^.&..&.V..FB.VÄá^.&..&.V..... 0001A0
04478826 0A5EC4DC 56890A46 89065788 26044788 260A5EC4 E85689E6 46890002 @..Fl.Vðá^.&.G.&.V..FÖ.VÉá^.&.G. 0001C0
5689EA46 89065788 26044788 260A5EC4 E45689E2 4689000A 8300182D 06578826 &.V.-...Ö..Fã.Vðá^.&.G.&.V..Fõ.V 0001E0

Dump of file SATURN:[PCCOMMON.DUMP.DLL]SA-DGFD.DLL;1 on 18-APR-1990 10:50:15.11
File ID (447,10,0)    End of file block 66 / Allocated 68

Virtual block number 17 (00000011), 512 (0200) bytes

5688E646 88065EC4 10578926 0E478926 F05689EE 46890856 88064688 065EC4EC ±á^..Fø.VÄ.FŸ.VÞ&.G.&.V.á^..Fl.V 000000
8926F456 89F24689 E45688E2 4688065E C4185789 26164789 26F85689 F64689E8 Ö.F-.V½&.G.&.V.á^..Fã.VÖ.F·.V¶&. 000020
EE468D1C 5789261A 478926FC 5689FA46 89DC5688 DA468806 5EC41457 89261247 G.&.V.á^..FÖ.VÉ.F°.V=&.G.&.V..FŸ 000040
76FF1076 FF001AE9 037500FE 7E830000 05179A50 16FE468D 1276FF14 76FF5016 .P.v..v..F±.P.......-±.u.Ö...v..v 000060
CBC95F5E 1F0000E9 00008800 0005CC9A 016A006A 006A5016 D6468D03 6A006A0E .j.j..Fø.Pj.j.j..ä...|..Ö...^_èù 000080
89064689 000A8300 1F200257 88260788 260A5EC4 088E0658 881E5657 00002AC8 à°..WV.|X..Äá^.&..&.V.-...Ö..Fø. 0000A0
83001F05 02578826 0788260A 5EC4E056 89DE4689 02578826 0788260A 5EC40856 VÄá^.&..&.V..FB.VÄá^.&..&.V..... 0000C0
04478826 0A5EC4DC 56890A46 89065788 26044788 260A5EC4 E85689E6 46890002 @..Fl.Vðá^.&.G.&.V..FÖ.VÉá^.&.G. 0000E0
5689EA46 89065788 26044788 260A5EC4 E45689E2 4689000A 8300182D 06578826 &.V.-...Ö..Fã.Vðá^.&.G.&.V..Fõ.V 000100
5688E646 88065EC4 10578926 0E478926 F05689EE 46890856 88064688 065EC4EC ±á^..Fø.VÄ.FŸ.VÞ&.G.&.V.á^..Fl.V 000120
8926F456 89F24689 E45688E2 4688065E C4185789 26164789 26F85689 F64689E8 Ö.F-.V½&.G.&.V.á^..Fã.VÖ.F·.V¶&. 000140
EE468D1C 5789261A 478926FC 5689FA46 89DC5688 DA468806 5EC41457 89261247 G.&.V.á^..FÖ.VÉ.F°.V=&.G.&.V..FŸ 000160
76FF1076 FF001CE9 037500FE 7E830000 073E9A50 16FE468D 1276FF14 76FF5016 .P.v..v..F±.P.>....-±.u.Ö...v..v 000180
5F5E1F00 00E90000 880000FF FF9A016A 006A006A 036A5016 D6468D03 6A006A0E .j.j..Fø.Pj.j.j.j.......Ä..Ö...^ 0001A0
5EC4E056 89DE4689 02578826 07882606 5EC4088E 0778881E 56570000 3AC8CBC9 èùà:..WV.|x..Äá^.&..&.V..FB.VÄá^ 0001C0
89000A83 00182006 57882604 47882606 5EC4E856 89E64689 02578826 07882606 .&..&.V..Fl.Vðá^.&.G.&.V.-...Ö.. 0001E0
```

```
Dump of file SATURN:[PCCOMMON.DUMP.DLL]SA-DGFD.DLL;1 on 18-APR-1990 10:50:15.11
File ID (447,10,0)   End of file block 66 / Allocated 68

Virtual block number 18 (00000012), 512 (0200) bytes

 26065EC4 EC5689EA 46890C56 1B0A462B 06578B26 04478B26 065EC4E4 5689E246 Fã.Vðá^.&.G.&.W.+F..V..Fõ.Všá^.& 000000
 89CE4689 00028300 1F050257 8B26078B 26065EC4 C85689C6 46890257 8B26078B ..&.W..Fó.Vàá^.&..&.W.....@..Fö. 000020
 4688CC56 89CA4689 EC5688EA 4688D856 89064689 02578B26 078B2606 5EC4D056 VÀá^.&..&.W..Fø.VÄ.Fõ.Vš.Fò.Vä.F 000040
 89DA4689 00028300 1905EC56 8BEA4688 D45689D2 46890002 83000C05 EC5688EA õ.Vš....@..F@.Vå.Fõ.Vš....@..FÖ. 000060
 EC5688EA 4688F856 89F64689 D05688CE 4688F056 89EE4689 E05688DE 4688DC56 VÉ.FB.VÁ.FŸ.Vþ.Fö.VÅ.F-.V½.Fõ.Vš 000080
 FE468D12 76FF1476 FF5016EE 4680FC56 89FA4689 E45688E2 4688F456 89F24689 .F·.V¶.Fã.VÕ.F².V=.FŸ.P.v..v..F± 0000A0
 6A5016DE 4680026A 006A0E76 FF1076FF 0034E903 7500FE7E 83000008 5E9A5016 .P.^....~±.u.Ö4..v..v.j.j..FB.Pj 0000C0
 9A016A00 6A006A50 16C64680 036A006A 0E76FF10 76FF0000 09D09A01 6A006A00 .j.j..Å....v..v.j.j..Fó.Pj.j.j.. 0000E0
 8B26065E C4088E08 9AB81E56 5700003A C8CBC95F 5E1F0000 E9000088 00000761 a...¦..Õ...^_èùà:..WV.¦...Äá^.&. 000100
 5689DE46 89000283 001F0502 578B2607 8B26065E C4D85689 D6468902 578B2607 .&.W..Fø.VÀá*.&..&.W.....@..FB.V 000120
 83000C2D 06578B26 04478B26 065EC4E8 5689E646 8902578B 26078B26 065EC4E0 Áá^.&..&.W..F¦.VÒá^.&.G.&.W.-... 000140
 04478B26 065EC4E4 5689E246 8906578B 2604478B 26065EC4 DC56890A 4689000A Ö..FÖ.VÉá^.&.G.&.W..Fã.Vðá^.&.G. 000160
 8BDE4688 C85689C6 4689E056 8BDE468B EC5689EA 46890002 83000C05 06578B26 &.W.....@..Fõ.Vš.FB.VÁ.Fó.Và.FB. 000180
 C4CC5689 CA468906 578B2604 478B2606 5EC4D056 89CE4689 00028300 2405E056 VÁ.$..@..Fö.VÀá^.&.G.&.W..Fò.Väá 0001A0
 8BCE4688 F05689EE 46890856 8BD6468B D45689D2 46890657 8B260447 8B26065E ^.&.G.&.W..F@.Vå.Fø.VÄ.FŸ.Vþ.Fö. 0001C0
 FC5689FA 4689EC56 8BEA468B F45689F2 46890C56 8BDA468B F85689F6 46890056 VÅ.F-.V½.FÖ.VÉ.F·.V¶.Fõ.Vš.F².V= 0001E0

Dump of file SATURN:[PCCOMMON.DUMP.DLL]SA-DGFD.DLL;1 on 18-APR-1990 10:50:15.11
File ID (447,10,0)   End of file block 66 / Allocated 68

Virtual block number 19 (00000013), 512 (0200) bytes

 76FF0036 E9037500 FE7E8300 0009939A 5016FE46 8D0E76FF 1076FF50 16EE468D .FŸ.P.v..v..F±.P......~±.u.Õ6..v 000000
 0A76FF0C 76FF0000 08839A01 6A006A00 6A036A50 1606468D 036A006A 0A76FF0C ..v.j.j..Fø.Pj.j.j.j.......v..v. 000020
 90CBC95F 5E1F0000 E90000B8 000009B6 9A016A00 6A006A50 16C6468D 026A006A j.j..Fó.Pj.j.j..Ñ...¦..Õ...^_èù. 000040
 000B09E7 00020000 000A03DE 000202E1 000605FD 02030000 00020304 0002000C ............»...Ã...ß.......Õ... 000060
 00060025 02030312 00060480 02030291 0006058F 0203037A 00070AE1 02030000 ....Ä...z....................%... 000080
 000605B2 020302B7 00060B06 0203032D 00060032 020302A3 00060B20 02030323 #... ...È...2...-.......ñ...ý... 0000A0
 FF0C76FF D88EFFFF B81E5657 000014C8 00000000 00000000 00000000 000002CE ö...............à...WV.¦...Ä.v.. 0000C0
 28260000 8A0001B8 EC5EC4F0 4689F246 89000088 0000FFFF 9A5016EC 46800A76 v..Fš.P.....¦...F·.Fþá^š¦..¤..&+ 0000E0
 0A830001 2D008C97 8B26008A 878B26EC 5EC4F656 89F44689 00C0971B 26008E87 .ƒ.&..â..F¶.V-á^š&..¤.&..¥.-...Ö 000100
 F8B8065E C40011E9 03750846 0B06468B FC4689FE 46890000 8BFA5689 F8468900 ..F½.V²¦...F±.F=.F..F.u.Õ..á^..« 000120
 1E565700 0020C800 08CAC95F 5E1F0000 E90000B8 1FA5F200 08891F16 1EF0768D .vþ...¿..·È.¦..Õ...^_èò..à ..WV. 000140
 1005E256 8BE0468B FFFFE646 C7FFB0E4 46C7E046 89E24689 0000B8D8 8E0008B8 ¦...Ä¦...Fã.FÀüFõ¯.úF¦...FÁ.Vã.. 000160
 8BE4468B F25689F0 46890002 83004E05 E25688E0 4688FA56 89F84689 00028300 ..@..F½.V².FÁ.Vã.N..@..Fþ.V·.FÕ. 000180
 F846880A 5EC4EA56 89E84689 000A8300 172DE656 8BE4468B F65689F4 4689E656 V¦.F¶.V-.Fõ.V¦-...Ö..FÖ.Vðá^..F½ 0001A0
 8BF0468B 0A5EC400 82E90373 07392600 08E9037E 008FE903 7D025739 26FA568B .V²&9W.).Õ..-.Õ..&9.s.Õ..á^..Fþ. 0001C0
 568BF446 8B0A5EC4 0063E903 76073926 0008E903 7D0070E9 037E0257 3926F256 V·&9W.-.Õp.).Õ..&9.v.Õc.á^..F¶.V 0001E0

Dump of file SATURN:[PCCOMMON.DUMP.DLL]SA-DGFD.DLL;1 on 18-APR-1990 10:50:15.11
File ID (447,10,0)   End of file block 66 / Allocated 68

Virtual block number 20 (00000014), 512 (0200) bytes

 568BE846 8B0A5EC4 0043E903 76044739 260009E9 037D0051 E9037E06 573926F6 -&9W.-.ÕQ.).Õ..&9G.v.ÕC.á^..Fò.V 000000
 568B0646 8B125EC4 0023E903 73044739 260009E9 037E0031 E9037D06 573926EA õ&9W.).Õ1.-.Õ..&9G.s.Õ#.á^..F..V 000020
 5016FC46 8D005EE9 07892602 47892600 00B80E5E C4025789 26078926 009C0508 ....&..&.W.á^.¦..&.G.&..Õ^..F=.P 000040
 FFFF01F4 9A505200 9C050856 8B06468B 5016E046 8D0A76FF 0C76FF50 16EC468D .Fš.P.v..v..FÅ.P.F..V....RP.¶... 000060
 46880257 89260789 26EE568B EC46880E 5EC40010 E9037510 460B0E46 8B14C483 .á..F..F.u.Õ..á^..Fš.VŸ&..&.W..F 000080
 1F0000E9 0000B802 57892607 8926FE56 8BFC468B 125EC400 10E90375 14460B12 ..F.u.Õ..á^..F=.V±&..&.W.¦..Õ... 0000A0
 89FE4689 0000B8E4 4689E646 890000B8 D88E0091 B81E5657 000024C8 CBC95F5E ^_èùà$..WV.¦...Ä¦...F¦.Fõ¦...F±. 0000C0
 00300502 578B2607 8B260A5E C4DE5689 DC468908 578B2606 478B2606 5EC4FC46 F=á^.&.G.&.W..FÉ.VBá^.&..&.W..O. 0000E0
 FA5689F8 4689000A 83002D2D 06578B26 04478B26 0A5EC4F6 5689F446 89000283 .@..F¶.V-á^.&.G.&.W.--..Ö..F½.V² 000100
 8B260447 8B260A5E C40211E9 0375DE46 0BDC468B 021CE903 75003F83 26065EC4 á^.&.?.u.Õ...FÉ.FBu.Õ..á^.Ä.G.&. 000120
 3B260009 E9037D01 EFE9037E 06573B26 0E5EC404 57182602 472B2606 5EC40657 W.á^.&+G.&.W.á^.&;W.-.Õÿ.).٦..&; 000140
 FFDE76FF 5016F446 8D0E76FF 1076FF50 16E4468D 5016FC46 8D01E1E9 03760447 G.v.ÕÄ..F=.P.FÕ.P.v..v..F¶.Þ. B. 000160
 00818788 260C5EC4 0090E900 03E90374 DE460BDC 468B14C4 8301AE04 A39ADC76 vÉ.È.Û..á..FÉ.FBt.Õ..Õ..á^É&.... 000180
 06573926 FA568BF8 46880E5E C400FA5E 8324F86E 83FA5619 F8462900 83978B26 &....)F½.V².n¾$.^².á^..F½.V²&9W. 0001A0
 578B2675 478B260C 5EC40052 E90003E9 03770447 39260009 E9037E00 11E9037D ).Õ..-.Õ..&9G.w.Õ..ÕR.á^É&.Gu&.W 0001C0
 FC468800 2BE90374 E6460BE4 46880036 E90375DE 460BDC46 8BDE5689 DC468977 w.FÉ.VB.FÉ.FBu.Õ6..FÕ.Flt.Õ+..F= 0001E0
```

Dump of file SATURN:[PCCOMMON.DUMP.DLL]SA-DGFD.DLL;1 on 18-APR-1990 10:50:15.11
File ID (447,10,0)   End of file block 66 / Allocated 68

Virtual block number 21 (00000015), 512 (0200) bytes

```
260009E9 037EFF4D E9037D06 573926FA 568BF846 8B0E5EC4 0020E903 74FE460B .F±t.Õ .ő^..F½.V*&9W.).ÕM.~.Õ..& 000000
4688010A E90374E6 460BE446 8B0115E9 0374FE46 0BFC4688 FF3FE903 77044739 9G.w.Õ?..F=.F±t.Õ...FÕ.F|t.Õ...F 000020
260A5EC4 EA5689E8 46890002 83001F05 F6568BF4 468BF256 89F04689 F6568BF4 ¶.V-.Fþ.V·.F¶.V-.....@..FÕ.Võő^.& 000040
5EC4EE56 89EC4689 00028300 1A050457 1B260247 2B26065E C406578B 2604478B .G.&.W.ő^.&+G.&.W.....@..F&.VŸő^ 000060
E25689E0 46890002 83000105 04571B26 02472B26 065EC406 578B2604 478B260A .&.G.&.W.ő^.&+G.&.W.....@..FÀ.Vã 000080
C40089E9 03730739 260008E9 037E0096 E9037D02 573926F2 568BF046 8B0E5EC4 ő^..Fþ.V·&9W.).Õ..~.Õ..&9.s.Õ..ő 0000A0
5EC4006A E9037607 39260008 E9037D00 77E9037E 02573926 EA568BE8 46880E5E ^..FÕ.Võ&9W.~.Õw.).Õ..&9.v.Õj.ő^ 0000C0
5EC4004A E9037604 47392600 09E9037D 0058E903 7E065739 26EE568B EC46880E ..F&.VŸ&9W.~.ÕX.).Õ..&9G.v.ÕJ.ő^ 0000E0
4688002A E9037304 47392600 09E9037E 0038E903 7D065739 26E2568B E046880E ..FÀ.Vã&9W.).Õ8.~.Õ..&9G.s.Õ*..F 000100
5EC40000 008387C7 26DC5EC4 00000085 87C726DC 5EC4E656 89E44689 DE568BDC É.V8.FÕ.V|ő^É&ú.ç....ő^É&ú.°...ő^ 000120
568BFC46 8B165EC4 02578926 078926E6 568BE446 8B125EC4 00010087 87C7260C É&ú.ñ...ő^..FÕ.V|&..&.W.ő^..F=.V 000140
C4D88E01 FCB81E56 57000018 CBCBC95F 5E1F0000 E9000088 02578926 078926FE ±&..&.W.|..Õ...^_èùà...WV.|=..Äő 000160
89000283 001E0502 578B2607 8B260A5E C4FE5689 FC468902 578B2607 8B260A5E ^.&..&.W..F=.V±ő^.&..&.W.....@.. 000180
260A5EC4 FA5689F8 4689000A 83001D2D 06578B26 04478B26 0A5EC4F6 5689F446 F¶.V-ő^.&.G.&.W.-...Õ..F½.V*ő^.& 0001A0
02573926 FE568BFC 46880E5E C4F25689 F0468900 DA830035 2D06578B 2604478B .G.&.W.-5..Õ..Fþ.V·ő^..F=.V±&9W. 0001C0
7E025739 26F6568B F446880E 5EC40090 E9037307 39260008 E9037E00 90E9037D ).Õ..~.Õ..&9.s.Õ..ő^..F¶.V-&9W.~ 0001E0
```

Dump of file SATURN:[PCCOMMON.DUMP.DLL]SA-DGFD.DLL;1 on 18-APR-1990 10:50:15.11
File ID (447,10,0)   End of file block 66 / Allocated 68

Virtual block number 22 (00000016), 512 (0200) bytes

```
037E0657 3926FA56 8BF8468B 0E5EC400 71E90376 07392600 08E9037D 007EE903 .Õ~.).Õ..&9.v.Õq.ő^..F½.V*&9W.~. 000000
037D0657 3926F256 8BF0468B 0E5EC400 51E90376 04473926 0009E903 7D005FE9 Õ_.).Õ..&9G.v.ÕQ.ő^..Fþ.V·&9W.). 000020
57892607 89260856 8B06468B 125EC400 31E90373 04473926 0009E903 7E003FE9 Õ?.~.Õ..&9G.s.Õ1.ő^..F..V.&..&.W 000040
E9000000 B787C726 065EC400 00008387 C726065E C4000100 B587C726 065EC402 .ő^.&ú.ç...ő^.&ú.°...ő^.&ú.ñ...Õ 000060
3005FE56 8BFC468B FE5689FC 46890002 83004305 02578B26 078B260A 5EC40244 D.ő^.&..&.W..C..@..F=.V±.F=.V±.0 000080
8B260A5E C4FA5689 F8468906 578B2604 478B260A 5EC4F656 89F44689 00028302 ..@..F¶.V-ő^.&.G.&.W..F½.V*ő^.&. 0000A0
7D025739 26FE568B FC46880E 5EC4F256 89F04689 000A8300 782D0657 8B260447 G.&.W.-x..Õ..Fþ.V·ő^..F=.V±&9W.) 0000C0
037E0257 3926F656 8BF4468B 0E5EC400 90E90373 07392600 08E9037E 009DE903 .Õ..~.Õ..&9.s.Õ..ő^..F¶.V-&9W.~. 0000E0
E9037E06 573926FA 568BF846 8B0E5EC4 0071E903 76073926 0008E903 7D007EE9 Õ~.).Õ..&9.v.Õq.ő^..F½.V*&9W.~.Õ 000100
E9037D06 573926F2 568BF046 8B0E5EC4 0051E903 76044739 260009E9 037D005F _.).Õ..&9G.v.ÕQ.ő^..Fþ.V·&9W.).Õ 000120
02578926 07892608 56880646 8B125EC4 0031E903 73044739 260009E9 037E003F ?.~.Õ..&9G.s.Õ1.ő^..F..V.&..&.W. 000140
45E90000 008787C7 26065EC4 00000085 87C72606 5EC40001 008387C7 26065EC4 ő^.&ú.°...ő^.&ú.ç...ő^.&ú.ñ...ÕE 000160
57882607 88260A5E C4FE5689 FC468900 02830053 05025788 26078826 0A5EC401 .ő^.&..&.W..S..@..F=.V±ő^.&..&.W 000180
4689000A 8300782D 06578826 04478826 0A5EC4F6 5689F446 89000283 00910502 .....@..F¶.V-ő^.&.G.&.W.-x..Õ..F 0001A0
46880E5E C4F25689 F0468900 DA830090 2D065788 26044788 260A5EC4 FA5689F8 ½.V*ő^.&.G.&.W.-...Õ..Fþ.V·ő^..F 0001C0
F446880E 5EC40075 E9037307 39260008 E9037E00 82E9037D 02573926 FE5688FC =.V±&9W.).Õ..~.Õ..&9.s.Õu.ő^..F¶ 0001E0
```

Dump of file SATURN:[PCCOMMON.DUMP.DLL]SA-DGFD.DLL;1 on 18-APR-1990 10:50:15.11
File ID (447,10,0)   End of file block 66 / Allocated 68

Virtual block number 23 (00000017), 512 (0200) bytes

```
8BF8468B 0E5EC400 56E90376 07392600 08E9037D 0063E903 7E025739 26F6568B .V-&9W.~.Õc.).Õ..&9.v.ÕV.ő^..F½. 000000
8BF0468B 0E5EC400 36E90376 04473926 0009E903 7D0044E9 037E0657 3926FA56 V*&9W.~.ÕD.).Õ..&9G.v.Õ6.ő^..Fþ. 000020
8B06468B 165EC400 16E90373 04473926 0009E903 7E0024E9 037D0657 3926F256 V·&9W.).Õ$.~.Õ..&9G.s.Õ..ő^..F.. 000040
89000283 00430502 578B2607 8B260A5E C40057E9 02578926 07892600 95050856 V....&..&.W.ÕW.ő^.&..&.W..C..@.. 000060
FF1876FF EE5689EC 4689000A 8300782D 06578B26 04478B26 0A5EC4EA 5689E846 FÒ.Võő^.&.G.&.W.-x..Õ..F&.VŸ.v.. 000080
F49A5052 00950508 56880646 8B5016E8 468D0E76 FF1076FF 1276FF14 76FF1676 v..v..v..v..v..FÒ.P.F..V....RP.¶ 0000A0
04AB0002 00000003 07F10002 000390CB C95F5E1F 0000E900 00B814C4 83028501 .ç..ő.|..Õ...^_èù.....þ.......¯. 0000C0
26065EC4 D88EFFFF B81E5657 00000EC8 00000000 03120006 00180203 0000000B ................à...WV.|...Äő^.& 0000E0
B7FF2600 9AB7FF26 065EC4F8 76FFFA76 FFFA5689 F8468900 C4978B26 00C2878B ..ô.&..ő..F½.V*.v*.v½ő^.&.ñ..&.ñ 000100
26009887 8826065E C4F64689 0000FFFF 9A505200 4C050856 8806468B 026A0098 ..j..F..V..L.RP......F-ő^.&....& 000120
FFFF9A50 16F2468D 036AFC76 FFFE76FF FB76FFFA 76FFFE56 89FC4689 009A978B .....F=.V±.v*.v½.v±.v•j..F·.P... 000140
C4B7FF26 065EC400 18E90375 F4460BF2 468B0029 E9037500 F67EB3F6 46890000 ...F-.—.u.Õ)..F·.F¶u.Õ..ő^.&.ñő 000160
FF0008B7 FF26065E C4004CE9 F6468800 0000DB9A F276FFF4 76FF00C2 B7FF2600 .&.ñõ..v¶.v·.Û....F-ÕL.ő^.&.ñÄ.. 000180
2600C4B7 FF26065E C40EC483 00E800FA 9A0676FF 0876FF00 6A006AF2 76FFF476 v¶.v·j.j..v..v..*.Ò..ő.ő^.&.ñő.& 0001A0
0000B804 C483FFFF 05A69A06 76FF0876 FF0000FF FF9AF276 FFF476FF 00C2B7FF .ñõ..v¶.v·......v..v..Ì....ő.|.. 0001C0
8BF44689 F6468900 00B8D88E 0008B81E 56570000 1CC80004 CAC95F5E 1F0000E9 Õ...^_èò..à...WV.|...Ä|...F-.F¶¡ 0001E0
```

Dump of file SATURN:[PCCOMMON.DUMP.DLL]SA-DGFD.DLL;1 on 18-APR-1990 10:50:15.11
File ID (447,10,0)   End of file block 66 / Allocated 68

Virtual block number 24 (00000018), 512 (0200) bytes

```
8B06468B 0020E903 740C4608 0A468BEC 4689EE46 89000088 FC4689FE 46890000 ...F±.F=¦...FŸ.FŠ.F..F.t.Õ ..F.. 000000
8B0A468B 0020E90A 4789260C 47892600 00B8F05E C4F25689 F0468900 9C050856 V.....FÞ.V·á^Þ¦..&.G.&.G.Õ ..F.. 000020
26065EC4 0C578926 0A478926 0C5688OA 4688F05E C4F25689 F0468900 95050C56 V.....FÞ.V·á^Þ.F..V.&.G.&.W.á^.& 000040
06478926 08478926 0000B8F0 5EC40001 07C726F0 5EC40008 E9037500 00E48F83 .¢õ..u.Õ..á^Þ&ú...á^Þ¦..&.G.&.G. 000060
75024708 26078B26 0E5EC402 F2E90000 B80006E9 03740247 0B26078B 260E5EC4 á^.&..&.G.t.Õ..¦..Õ·.á^.&..&.G.u 000080
F4468D04 6A37FF26 0277FF26 0E5EC400 C2B7FF26 00C4B7FF 26065EC4 007EE903 .Õ~.á^.&.ñá.&.ñõ.á^.&.w.&.7j..F¶ 0000A0
0E468300 07E90375 F6460BF4 46880012 E903740C 460B0A46 88000002 139A5016 .P......F..F.t.Õ...F¶.F~u.Õ...F. 0000C0
FC468D1C 6A37FF26 0277FF26 0E5EC400 C2B7FF26 00C4B7FF 26065EC4 FFB1E904 .ÕÝ.á^.&.ñá.&.ñõ.á^.&.w.&.7j..F= 0000E0
E90003E9 0003E9FF 7CE9040E 4683000A E90375FE 460BFC46 88000002 8F9A5016 .P......F=.F±u.Õ...F..Õ|.Õ..Õ..Õ 000100
460BEC46 8B0051E9 03750012 7E83EE56 89EC4689 02578826 0788260E 5EC4FF73 s.á^.&..&.W..FŠ.VŸ.~..u.ÕQ..FŠ.F 000120
7400EA7E 830000FF FF9A5016 E8468D50 16EA468D EC76FFEE 76FF0046 E90375EE Ÿu.ÕF..vŸ.vš.Fõ.P.FÒ.P......~õ.t 000140
FF9A5016 EC468D1D 6AEC76FF EE76FF00 C2B7FF26 00C4B7FF 26065EC4 0022E903 .Õ".á^.&.ñá.&.ñõ..vŸ.vŠj..Þ›.P.. 000160
FF0876FF 5016E446 8D01EAE9 0375EE46 0BEC468B FFAFE900 03E90003 E90000FF ...Õ..Õ..ÕE..FŠ.FŸu.Õõ..Fõ.Þ. ·.. 000180
89260000 B8E45EC4 75478926 77478926 0000B8E4 5EC408C4 8300C208 6A9A0676 v..j.õ..á.á^õ¦..&.Gw&.Guá^õ¦..&. 0001A0
E6568BE4 4688F05E C4735789 26714789 260C568B 0A468BE4 5EC47947 89267B47 G(&.Gyá^õ.F..V.&.Gq&.Wsá^Þ.Fõ.Vl 0001C0
049C9A06 76FF0876 FFE476FF E676FFEC 76FFEE76 FF1276FF 08578926 06478926 &.G.&.W..v..vŸ.vš.vl.võ.v..v.... 0001E0
```

Dump of file SATURN:[PCCOMMON.DUMP.DLL]SA-DGFD.DLL;1 on 18-APR-1990 10:50:15.11
File ID (447,10,0)   End of file block 66 / Allocated 68

Virtual block number 25 (00000019), 512 (0200) bytes

```
9A5016EC 468D1D6A EC76FFEE 76FF00C2 B7FF2600 C4B7FF26 065EC40E C4830380 ...á.á^.&.ñá.&.ñõ..vŸ.všj..FŠ.P. 000000
7500127E 830146E9 0375EE46 0BEC468B FA5689F8 4689E656 8BE4468B 0000048A .....Fõ.Vl.F½.V°.FŠ.FŸu.ÕF..~..u 000020
E9037401 EA7E8300 0002679A 5016E846 8D5016EA 468DEC76 FFEE76FF 009EE903 .Õ...vŸ.vš.Fõ.P.FÒ.P.g....~õ.t.Õ 000040
26774789 260000B8 E45EC408 C483030E 086A9A06 76FF0876 FF5016E4 468D007D )..Fõ.P.v..v..j.B..á.á^õ¦..&.Gw& 000060
4789260C 5688OA46 8BE45EC4 7B578926 79478926 FA568BF8 4688E45E C4754789 .Guá^õ.F½.V°&.Gy&.W(á^õ.F..V.&.G 000080
FFEC76FF EE76FF12 76FF7757 89267547 8926E656 8BE4468B F85EC473 57892671 q&.Wsá^½.Fõ.Vl&.Gu&.Ww.v..vŸ.vš. 0000A0
E9FA5689 F84689E6 5688E446 880EC483 0400049C 9A0676FF 0876FFE4 76FFE676 vl.võ.v..v.......á..Fõ.Vl.F½.V°õ 0000C0
26774789 260000B8 E45EC408 C483045E 086A9A06 76FF0876 FF5016E4 468D007D )..Fõ.P.v..v..j.^..á.á^õ¦..&.Gw& 0000E0
4789260C 5688OA46 8BE45EC4 7B578926 79478926 FA568BF8 4688E45E C4754789 .Guá^õ.F½.V°&.Gy&.W(á^õ.F..V.&.G 000100
FFEC76FF EE76FF12 76FF7757 89267547 8926E656 8BE4468B F85EC473 57892671 q&.Wsá^½.Fõ.Vl&.Gu&.Ww.v..vŸ.vš. 000120
C4FA5689 F84689E6 5688E446 880EC483 02B5049C 9A0676FF 0876FFE4 76FFE676 vl.võ.v..v....ç..á..Fõ.Vl.F½.V°á 000140
AFE90000 01D39A50 16EC468D 1D6AEC76 FFEE76FF 00C2B7FF 2600C4B7 FF26065E ^.&.ñá.&.ñõ..vŸ.všj..FŠ.P.Æ...ÕE 000160
5688OE46 8B0A5EC4 088E0102 B81E5657 000006C8 CBC95F5E 1F0000E9 000088FE ±¦..Õ...^_èùà...WV.¦...Ãá^..F..V 000180
0A468B01 6A0E76FF 1076FF00 C2B7FF26 00C4B7FF 26065EC4 02578926 07892610 .&..&.W.á^.&.ñá.&.ñõ..v..v.j..F. 0001A0
0050050C 5688OA46 8B216A00 5047C626 0A5EC400 0000409A 50520004 050C568B .V....RP.ə...á^.&6GP.j!.F..V..P. 0001C0
830000FF FF9A006A 0E76FF10 76FF271F 6800C2B7 FF2600C4 B7FF2606 5EC45052 RPá^.&.ñá.&.ñõ.h.'.v..v.j....... 0001E0
```

Dump of file SATURN:[PCCOMMON.DUMP.DLL]SA-DGFD.DLL;1 on 18-APR-1990 10:50:15.11
File ID (447,10,0)   End of file block 66 / Allocated 68

Virtual block number 26 (0000001A), 512 (0200) bytes

```
00006E9A 5016FA46 8D056A0E 76FF1076 FF00C2B7 FF2600C4 B7FF2606 5EC412C4 á.á^.&.ñá.&.ñõ..v..v.j..F°.P.n.. 000000
00C4B7FF 26065EC4 0018E903 75FC4608 FA468B00 29E90375 00FE7E83 FE468900 ..F±.-±.u.Õ)..F°.F=u.Õ..á^.&.ñá. 000020
FFFA76FF FC76FF12 76FF0038 E9FE468B 00000597 9AFA76FF FC76FF00 C2B7FF26 &.ñõ..v=.v°......F±Õ;..v..v=.v°. 000040
00C2B7FF 2600C4B7 FF26065E C40EC483 031000FA 9A0676FF 0876FF0A 76FF0C76 v..v..v..v..°....á.á^.&.ñá.&.ñõ. 000060
04A4B81E 56570000 08C8CBC9 5F5E1F00 00E90000 B8000000 9D9AFA76 FFFC76FF .v=.v°.....¦..Õ...^_èùà...WV.¦È. 000080
F85EC400 8DE90375 003F8326 F85EC4FA 5689F846 89009C05 08568B06 468BD88E .Ã.F..V.....F½.V°á^¶&.?.u.Õ..á^½ 0000A0
08C48305 7E07609A F876FFFA 76FF5016 FC468D00 7DE90375 08470B26 06478B26 &.G.&.G.u.Õ)..F=.P.v°.v½.`.~..á. 0000C0
8CBF8326 065EC400 8C978926 00BA8789 2600D283 007305FE 568BFC46 88065EC4 á^..F=.V±.s..Ø.&..¤.&..¥.á^.&.¢¥ 0000E0
00BA87C7 26065EC4 0011E903 72019100 8ABF8126 000CE903 7D0022E9 037E0000 ..~.Õ".).Õ..&.¢¤...r.Õ..á^.&ú.¤. 000100
87892606 5EC400D2 83005105 04578B26 02478B26 F85EC400 0000BC87 C7260191 ..&ú.¥...á^½&.G.&.W..Q..Ø.á^.&.. 000120
C726065E C4000000 BC87C726 0191008A 87C72606 5EC40022 E900C097 892600BE ƒ.&...&.Õ".á^.&ú.¤...&ú.¥...á^.&ú 000140
AE881E56 57000008 C8CBC95F 5E1F0000 E9000088 000000C0 87C72600 6900BE87 .ƒ.i.&ú.&...¦..Õ...^_èùà...WV.¦Û 000160
5EC40087 E9037500 3F8326F8 5EC4FA56 89F84689 00950508 5688O646 8BD88E05 ..Ã.F..V.....F½.V°á^¶&.?.u.Õ..á^ 000180
C48305EB 07609AF8 76FFFA76 FF5016FC 46800077 E9037508 47082606 47B826F8 ½&.G.&.G.u.Õw..F=.P.v°.v½.'.Š..á 0001A0
007F7F83 26065EC4 7F578926 7D478926 00028300 7305FE56 8BFC468B 065EC408 .á^..F=.V±.s..Ø.&.G)&.W.á^.&.... 0001C0
C7260231 7D47C726 065EC400 0FE90372 02317D7F 8126000B E9037D00 1FE9037E ~.Õ..).Õ..&..)1.r.Õ..á^.&úG)1.&ú 0001E0
```

```
Dump of file SATURN:[PCCOMMON.DUMP.DLL]SA-DGFD.DLL;1 on 18-APR-1990 10:50:15.11
File ID (447,10,0)   End of file block 66 / Allocated 68

Virtual block number 27 (0000001B), 512 (0200) bytes

97892600 81878926 065EC400 D2830079 05045788 26024788 26F85EC4 00007F47 G...é^½&.G.&.W..y..@.é^.&....&.. 000000
C7260091 008187C7 26065EC4 00007F47 C7260231 7D47C726 065EC400 20E90083 ..Ö .é^.&úG)1.&úG...é^.&ú.....&ú 000020
89000088 D88E068F B81E5657 00000CC8 CBC95F5E 1F0000E9 00008800 00008387 .....|..Ö...^_èùà...WV.|...Ä|... 000040
F65689F4 46890857 88260647 8826065E C40000FA 46C70018 F846C7FC 4689FE46 F±.F•úF½..úF•..é^.&.G.&.W..F¶.V- 000060
06CC0687 9AF476FF F676FF00 00FA46C7 002CF846 C70098E9 0375F646 08F44688 .F¶.F-u.Ö..úF½,.úF•...v-.v¶...ë. 000080
03777D47 39260009 E9037E00 1FE9037D 7F573926 FE5688FC 4688F45E C404C483 .é.é^¶.F•.V±&9W.).Ö..~.Ö..&9G)w. 0000A0
83978826 00818788 26F45EC4 FE5689FC 46897F57 88267D47 8826F45E C40011E9 Ö..é^¶&.G)&.W..F•.V±é^¶&....&... 0000C0
F65689F4 46897757 88267547 8826F45E C400FA56 8324F846 83FA5611 F8460100 ..F½.V•.F½$.V•.é^¶&.Gu&.Ww.F¶.V- 0000E0
8319F846 8300FA56 830AF846 8300FA5E 8324F86E 83FF8AE9 0374F646 08F44688 .F¶.F-t.Ö...n½$.^•..F½..V•..F½.. 000100
C40010E9 03750C46 080A4688 04578926 02478926 FA5688F8 4688065E C400FA56 V•.é^..F½.V•&.G.&.W..F..F.u.Ö..é 000120
56570000 00C8CBC9 5F5E1F00 00E90000 B8025789 26078926 FE5688FC 46880A5E ^..F•.V±&..&.W.|..Ö...^_èùà...WV 000140
003D0000 FFFF9A0A 76FF0C76 FF008968 586A0002 87FF2606 5EC4D88E 0768881E .|h..Äé^.&.ñ@.jXh¿..v..v......*. 000160
72881E56 57000008 C8CBC95F 5E1F0000 E9000088 0006E900 01880006 E9037500 .u.Ö..|..Ö..|..Ö...^_èùà...WV.|r 000180
F8468908 578B2606 478826FC 5EC4FE56 89FC4689 009C0508 56880646 88D88E08 ..Ä.F..V.....F•.V±é^•&.G.&.W..F½ 0001A0
00009A06 76FF0876 FF08C483 08F008FD 9A0676FF 0876FFF8 76FFFA76 FFFA5689 .V•.v•.v½.v..v..».Þ..é..v..v.... 0001C0
750C4608 0A4688D8 8E08AFB8 1E565700 000CC8C8 C95F5E1F 0000E900 008807AE Û.|..Ö...^_èùà...WV.|£..Ä.F..F.u 0001E0

Dump of file SATURN:[PCCOMMON.DUMP.DLL]SA-DGFD.DLL;1 on 18-APR-1990 10:50:15.11
File ID (447,10,0)   End of file block 66 / Allocated 68

Virtual block number 28 (0000001C), 512 (0200) bytes

5EC4FE56 89FC4689 0095050C 56880A46 88005CE9 03750C46 080A4688 0067E903 .Ög..F..F.u.Ö\..F..V.....F•.V±é^ 000000
09670986 9A0676FF 0876FF0A 76FF0C76 FFF65689 F4468977 57882675 4788260A .&.Gu&.Ww.F¶.V-.v..v..v..v....g. 000020
88F44688 08C48308 E208FD9A 0676FF08 76FF0677 FF260877 FF26FC5E C408C483 .é.é^•&.w.&.w..v..v..».ã..é..F¶. 000040
0905881E 56570000 00C8C8C9 5F5E1F00 00E90000 B8FF99E9 0C56890A 4689F656 V-.F..V.Ö..|..Ö...^_èùà...WV.|.. 000060
00018800 06E90375 00003000 00FFFF9A 0A76FF0C 76FF0002 87FF2606 5EC4D88E .Äé^.&.ñ@..v..v......*..u.Ö..|.. 000080
00000004 094E0002 049B0000 050B0203 000ACBC9 5F5E1F00 00E90000 880006E9 Ö..|..Ö...^_èü...........N..... 0000A0
01290005 052D0203 010F0005 04D90203 01890005 03650203 00000008 098E0002 ..........e.......\.......-...). 0000C0
00D80004 09A10203 00CA0004 088A0203 01420005 055C0203 01350005 03300203 ..0...S...\...B.......ò...À...Ä. 0000E0
26FC5EC4 0000FFFF 9A5016FC 46800676 FF0876FF D88EFFFF B81E5657 000016C8 à...WV.|...Ä.v..v..F•.P.....é^•& 000100
68005068 076AF476 FFF676FF 0000009C 9A5016F4 468DF276 FFF24689 00028788 ..@..F·.v·.F¶.P......v-.v¶j.hP.h 000120
F476FFF6 76FF0000 00699AFF FF680063 68056AF4 76FFF676 FF000000 569AFFFF ...V....v-.v¶j.hc.h...i....v-.v¶ 000140
0000008F 9AFFFF68 00896809 6AF476FF F676FF00 00007C9A FFFF6800 7668086A j.hv.h...|....v-.v¶j.h..h....... 000160
000000CF 9A5016EE 468DF276 FF000000 AF9AFFFF 6800A968 0A6AF476 FFF676FF .v-.v¶j.h .h...£....v·.FŸ.P.ü... 000180
FF68000C 68026AEE 76FFF076 FF000000 C29AFFFF 6800BC68 006AEE76 FFF076FF .vÞ.vŸj.h¥.h...ô....vÞ.vŸj.hÉ.h. 0001A0
FF6800EF 68056AF8 76FFFA76 FF000001 029A5016 F8468DF2 76FF0000 00E29AFF ..ã....v·.F½.P......v•.v½j.hÿ.h. 0001C0
16EA468D F276FF00 0001159A FFFF6801 0F68076A F876FFFA 76FF0000 00F59AFF ..¾....v•.v½j.h..h........v·.Fõ. 0001E0

Dump of file SATURN:[PCCOMMON.DUMP.DLL]SA-DGFD.DLL;1 on 18-APR-1990 10:50:15.11
File ID (447,10,0)   End of file block 66 / Allocated 68

Virtual block number 29 (0000001D), 512 (0200) bytes

6AEA76FF EC76FF00 0001289A FFFF6801 2268006A EA76FFEC 76FF0000 FFFF9A50 P......vê.võj.h".h...(....vê.võj 000000
C4011097 8926010E 878926F6 5688F446 88FC5EC4 0000FFFF 9AFFFF68 FFFF6804 .h..h.......é^•.F¶.V-&....&....é 000020
01168789 26EC5688 EA4688FC 5EC40114 97892601 12878926 FA5688F8 4688FC5E ^•.F½.V•&....&....é^•.Fô.Vê&.... 000040
76FF0676 FF0876FF 011C9789 26011A87 8926F056 88EE4688 FC5EC401 18978926 &....é^•.FŸ.VÞ&....&.....v..v..v 000060
D88E0008 B81E5657 000026C8 CBC95F5E 1F0000E9 00008800 00FFFF9A F476FFF6 -.v¶.....|..Ö...^_èùà&..WV.|...Ä 000080
76FF0876 FF0000FF FF9A0676 FF0876FF 00000018 9A5016F6 468D0676 FF0876FF .v..v..F-.P......v..v.......v..v 0000A0
00C4978B 2600C287 8826F65E C4000001 859A010E 87FF2601 1087FF26 F65EC406 .é^-&.ñ..&.ñ.......é^-&..ô.&..é. 0000C0
8DFA76FF FC76FFFC 5689FA46 8900F097 882600EE 878826F6 5EC4E656 89E44689 .Fô.V|é^-&..Ÿ.&..Þ..F•.V•.v•.v•. 0000E0
5689EE46 89009C05 F85688F6 4688021E E9037400 FE7E8300 00FFFF9A 5016FE46 F±.P......~±.t.Ö...F-.V½....FŸ.V 000100
DA5EC400 24E90375 DC460BDA 46880C56 89DA4689 08578826 06478826 EE5EC4F0 Þé^Ÿ&.G.&.W..FÖ.VÊ.FÖ.FÉu.Ö$.é^Ö 000120
DCE9DC56 89DA4689 77578826 75478826 DA5EC400 14E90375 77470826 75478826 &.Gu&.Gwu.Ö..é^Ö&.Gu&.Ww.FÖ.VÉÖÉ 000140
7500003D E2468900 00FFFF9A 5016F246 805016FA 46800181 E9037400 FE7E83FF ..~±.t.Ö...F•.P.F·.P......Fã=..u 000160
E2468908 C483FFFF 086A9AF6 76FFF876 FF5016E8 468D01AC E9E24688 0006E903 .Ö...FãÖ˜..FÖ.P.v½.v-.j....é..Fã 000180
76FF0257 89260789 26F45688 F24688E8 5EC40188 E9E24688 0006E903 7500003D ±..u.Ö...FãÖ..é^Ö.F·.V¶&..&.W..v 0001A0
30E24689 0000FFFF 9A505200 0405EA56 88E84688 016AF276 FFF476FF E476FFE6 l.vÖ.v¶.v·j..FÖ.Võ...RP......Fã= 0001C0
2D9A006A F276FFF4 76FF2721 68E476FF E676FF01 49E9E246 880006E9 03750000 ..u.Ö...FãÖl..vl.vöhl'.v¶.v·j..- 0001E0
```

Dump of file SATURN:[PCCOMMON.DUMP.DLL]SA-DGFD.DLL;1 on 18-APR-1990 10:50:15.11
File ID (447,10,0)   End of file block 66 / Allocated 68

Virtual block number 30 (0000001E), 512 (0200) bytes

```
76FFE676 FF505200 5005EA56 88E84688 216A0050 47C626E8 5EC40CC4 83000003 ....á.á^Ò&6GP.j!.FÒ.Võ.P.RP.v].v 000000
C40022E9 0374DC46 08DA4688 12C48300 00FFFF9A 006AF276 FFF476FF 271F68E4 ðh.'.v¶.v·j.......á..FÖ.Fέt.Õ".á 000020
27E97147 89267347 89260000 88E85EC4 08578926 06478926 EA5688E8 4688EE5E ^Ÿ.FÒ.Võ&.G.&.W.á^Ò¡..&.Gs&.Gqõ' 000040
EA5688E8 4688DA5E C4735789 26714789 26E85EC4 73578826 71478826 DA5EC400 .á^Ö&.Gq&.Wsá^Ò&.Gq&.Wsá^Ö.FÒ.Võ 000060
26000088 E85EC47B 57892679 4789260C 5688DA46 88E85EC4 77578926 75478926 &.Gu&.Wwá^Ò.FÖ.VÉ&.Gy&.W(á^Ò¡..& 000080
5EC40001 07C7260E 5EC4E056 89DE4689 009505EA 5688E846 88754789 26774789 .Gw&.Gu.FÒ.Võ....F8.VÁá^B&ú...á^ 0000A0
4680FA76 FFFC76FF DC5689DA 4689EA56 88E84688 06478926 08478926 0000B8DE 8¡..&.G.&.G..FÒ.Võ.FÖ.VÉ.v=.v'.F 0000C0
F087FF26 F65EC4E2 46890000 FFFF9AE4 76FFE676 FFFE76E9 00000205 9A5016FE ±.P.....Õv±.v].vö......Fãá^-&.ñÞ 0000E0
05A69AF6 76FFF876 FF0019E9 0375003F 8326EE5E C40000FF FF9A00EE 87FF2600 .&.ñŸ......á^Ÿ&.?.u.Õ...v½.v-.!. 000100
5700001C C8C8C95F 5E1F0000 E90000B8 0000FFFF 9A0676FF 0876FF04 C4830298 ...á..v..v......¡..Õ...^_èùà...W 000120
16E44680 5016F846 80000001 AC9A5016 FC468D0C 76FF0E76 FFD88E01 9C881E56 V.¡...Ä.v..v..F=.P.¯....F½.P.Fõ. 000140
87082600 DA878826 FC5EC410 C483FFFF 00899AFC 76FFFE76 FF0876FF 0A76FF50 P.v..v..v±.v=......á.á^=&..Ö.&.. 000160
C4EA5689 E8468900 87978826 00858788 2600DA9F C426FC5E C400C3E9 0375000C É.u.Õù.á^=&á.Ö.&....&.....FÒ.Võá 000180
2600DA9F C426FC5E C4EE5689 EC468900 88978826 00898788 2600DA9F C426FC5E ^=&á.Ö.&....&.....F§.VŸá^=&á.Ö.& 0001A0
93978826 00918788 2600DA9F C426FC5E C4F25689 F0468900 8F978826 00808788 ....&.....FÞ.V·á^=&á.Ö.&....&... 0001C0
0277FF26 000A9FC4 26FC5EC4 00C2B7FF 2600C4B7 FF26FC5E C4F65689 F4468900 ..F¶.V-á^=&.ñá.&.ñò.á^=&á.Ö.&.w. 0001E0
```

Dump of file SATURN:[PCCOMMON.DUMP.DLL]SA-DGFD.DLL;1 on 18-APR-1990 10:50:15.11
File ID (447,10,0)   End of file block 66 / Allocated 68

Virtual block number 31 (0000001F), 512 (0200) bytes

```
0C76FF0E 76FF000A 87892600 DC878926 000088FC 5EC40000 05A89A00 6A37FF26 &.7j..¨...á^=¡..&..É.&..Ö..v..v. 000000
6A016A28 6A006A28 6A006A50 16E84680 0C76FF0E 76FF0000 05C59A50 16E84680 .FÒ.P.é....v..v..FÒ.Pj.j(j.j(j.j 000020
4689EA46 890000B8 0091E903 7500000E BF8326FC 5EC40000 05E59A01 6A066A00 .j.j..Í...á^=&.¢8..u.Õ..¡...Fõ.F 000040
88F44688 F25689F0 468900D2 83019005 EA5688E8 4688F446 89F64689 000088E8 Ò¡...F-.F¶.FÒ.Võ....●..FÞ.V·.F¶. 000060
FF26FC5E C400C2B7 FF2600C4 B7FF26FC 5EC4EE56 89EC4689 00DA8300 502DF656 V--P..Ö..F§.VŸá^=&.ñá.&.ñò.á^=&. 000080
800C76FF 0E76FF00 00000E87 C726FC5E C40000FF FF9A006A 00988 7FF 26009AB7 ñ..&.ñ..j......á^=&ú.8....v..v.. 0000A0
006A016A 146A006A 146A006A 5016E846 800C76FF 0E76FF00 00FFFF9A 5016E846 FÒ.P......v..v..FÒ.Pj.j.j.j.j.j. 0000C0
4608E446 880000FF FF9A00C2 B7FF2600 C4B7FF26 FC5EC400 00FFFF9A 016A046A j.j......á^=&.ñá.&.ñò.......Fõ.F 0000E0
0000E900 00B808C4 83003D06 279A0C76 FF0E76FF E476FFE6 76FF0014 E90375E6 ]u.Õ...v].võ.v..v..'.=..á.¡..Õ.. 000100
539A5016 FC468006 76FF0876 FFD88E04 43881E56 57000014 C8000ECA C95F5E1F .^_èò..à...WV.¡C..Ä.v..v..F=.P.S 000120
260A5EC4 0099E903 75000083 8F83260A 5EC400A7 E903750C 460B0A46 88000004 ..¯.F..F.u.ÕÏ.á^.&.¢°..u.Õ..á^.& 000140
89F04689 00889788 26008987 88260A5E C4EE5689 EC468900 87978826 00858788 ....&.....F§.VŸá^.&....&.....FÞ. 000160
97882600 91878826 0A5EC4F6 5689F446 89008F97 8826008D 8788260A 5EC4F256 V·á^.&....&.....F¶.V-á^.&....&.. 000180
6A37FF26 0277FF26 0A5EC400 C2B7FF26 00C4B7FF 26FC5EC4 FA5689F8 46890093 ...F½.V'á^=&.ñá.&.ñò.á^.&.w.&.7j 0001A0
FFFF9A28 6A006A28 6A006A06 6A086A50 16EC468D 0676FF08 76FF0000 05069A01 .......v..v..F§.Pj.j.j.j(j.j(... 0001C0
C8C95F5E 1F0000E9 00008800 DC978926 000A8789 260C568B 0A4688FC 5EC40000 ..á^=.F..V.&..Ö.&..É.¡..Õ...^_èù 0001E0
```

Dump of file SATURN:[PCCOMMON.DUMP.DLL]SA-DGFD.DLL;1 on 18-APR-1990 10:50:15.11
File ID (447,10,0)   End of file block 66 / Allocated 68

Virtual block number 32 (00000020), 512 (0200) bytes

```
16F84680 0000063F 9A5016FC 46800C76 FF0E76FF D88E062F 881E5657 000034C8 à4..WV.¡/..Ä.v..v..F=.P.?....F½. 000000
FA4608F8 468810C4 83047000 899AFC76 FFFE76FF 0876FF0A 76FF5016 CC468D50 P.Fä.P.v..v..v±.v=...p..á..F½.F' 000020
08E90374 013F8326 F85EC400 E4E90375 08470826 06478826 F85EC400 F4E90375 u.Õ¶.á^½&.G.&.G.u.ÕÕ.á^½&.?.t.Õ. 000040
75084708 26064788 26F85EC4 000107C7 26F85EC4 0008E900 0007C726 F85EC400 .á^½&ú...Õ..á^½&ú...á^½&.G.&.G.u 000060
0099E900 00042C9A 0C76FF0E 76FF04C4 83042005 A69AFC76 FFFE76FF 001CE903 .Õ...v±.v=.Ï. ..á..v..v.,...Õ.. 000080
89044689 14578826 12478826 F85EC402 56890046 89105788 260E4788 26F85EC4 á^½&.G.&.W..FÁ.V●á^½&.G.&.W..Fá. 0000A0
46891C57 88261A47 8826F85E C4DA5689 08468918 57882616 478826F8 5EC40656 V●á^½&.G.&.W..FÄ.VÖá^½&.G.&.W..F 0000C0
001DE903 75003F83 26F85EC4 00000526 9A5016D0 46800C76 FF0E76FF DE5689DC É.V8.v..v..FÁ.P.&...á^½&.?.u.Õ.. 0000E0
0E76FF00 1CE90000 FFFF9A01 6A006A00 6A5016E0 4680036A 006A0C76 FF0E76FF .v..v.j.j..FÁ.Pj.j.j......Õ...v. 000100
1F0000E9 00008800 00FFFF9A 016A006A 006A036A 5016E046 8D036A00 6A0C76FF .v.j.j..FÁ.Pj.j.j.j......¡..Õ... 000120
07189A50 16F44680 0C76FF0E 76FFD88E 070881E 56570000 2EC8000E CAC95F5E ^_èò..à...WV.¡...Ä.v..v..F¶.P... 000140
00028301 9005EE56 88EC4688 F84689FA 46890000 88EC4689 EE468900 00880000 ..¡...FŸ.F§¡...F'.F½.F§.VŸ....●. 000160
5688EC46 88085EC4 EA5689E8 4689000A 8300502D FA5688F8 4688FE56 89FC4689 .F=.V±.F½.V'-P..Õ..FÒ.Võá^..F§.V 000180
FE5688FC 4688085E C4014CE9 03730739 260008E9 037E0159 E9037D02 573926EE Ÿ&9W.).ÕY.-.Õ..&9.s.ÕL.á^..F=.V± 0001A0
26EA568B E8468808 5EC4012D E9037607 39260008 E9037D01 3AE9037E 02573926 &9W.-.Õ:.).Õ..&9.v.Õ-.á^..FÒ.Võ& 0001C0
26FA568B F8468808 5EC40100 E9037304 47392600 09E9037E 011BE903 7D065739 9W.).Õ..-.Õ..&9G.s.Õ..á^..F½.V'& 0001E0
```

Dump of file SATURN:[PCCOMMON.DUMP.DLL]SA-DGFD.DLL;1 on 18-APR-1990 10:50:15.11
File ID (447,10,0) End of file block 66 / Allocated 68

Virtual block number 33 (00000021), 512 (0200) bytes

```
0B26000A 878B26F4 5EC400ED E9037604 47392600 09E9037D 00FBE903 7E065739 9W.-.Õ«.).Õ..&9G.v.ÕÚ.ó^¶&..Õ.&. 000000
77FF2600 DA9FC426 F45EC400 C2B7FF26 00C4B7FF 26F45EC4 0033E903 75000C87 .É.u.Õ3.ó^¶&.ñó.&.ñö.ó^¶&ó.Õ.&.w 000020
FF26F45E C4000A87 8926000C 87892600 008BF45E C4000009 8A9A006A 37FF2602 .&.7j......ó^¶¡..&..É.&..Õ.ó^¶&. 000040
B7FF26F4 5EC400C2 87FF2600 C4B7FF26 F45EC400 0005F79A 00C2B7FF 2600C4B7 ñó.&.ñö..¥...ó^¶&.ñó.&.ñö.ó^¶&.ñ 000060
FE5688FC 4688DA56 89D84689 EE5688EC 46880000 0A659A01 6A0098B7 FF26009A ..&.ñ..j..e....F&.VŸ.FÄ.VÖ.F•.V± 000080
5EC4E656 89E44689 FA5688F8 4688DE56 89DC4689 EA5688E8 4688E256 89E04689 .FÁ.Vã.FÒ.Võ.FÉ.VÑ.F½.Vª.FÕ.V|ó^ 0000A0
9A146A00 6A146A00 6A046A08 6A5016D8 46800C76 FF0E76FF 0001000E 87C726F4 ¶&ú.ß....v..v..FÄ.Pj.j.j.j.j.j.. 0000C0
D6468900 00FFFF9A 016A006A 029A6800 6A1DAF68 00CAB7FF 26F45EC4 0000060E ß...ó^¶&.ñò.h€.j.h..j.j.......F# 0000E0
C4830735 00899AF4 76FFF676 FF0876FF 0A76FF50 1602468D 5016F046 8D0125E9 ÕX..FÞ.P.F@.P.v..v..v—.v¶...5..ó 000100
BF8326F4 5EC40004 E9037500 00B3BF83 26D25EC4 00E2E903 75D4460B D2468B10 ..F@.Fåu.Õã.ó^@&.¢°..u.Õå.ó^¶&.¢ 000120
B7FF2600 9AB7FF26 F45EC400 C2B7FF26 00C4B7FF 26F45EC4 0081E903 7500000E ß..u.Õ..ó^¶&.ñó.&.ñö.ó^¶&.ñ..&.ñ 000140
5688EC46 8BE44689 E6468900 008BD846 890A4689 00008800 0006C29A 006A0098 ..j..ö...|...FÖ.FÄ|...F|.FÕ.F$.V 000160
FFDE5689 DC468900 DA830050 2DFA5688 F84688E2 5689E046 89000283 019005EE Ÿ....@..FÁ.Vã.F½.Vª-P..Ö..FÉ.VB. 000180
C4000005 469A016A 046A006A 016A146A 006A146A 006A5016 D8468D0C 76FF0E76 v..v..FÄ.Pj.j.j.j.j.j.j..F...ó 0001A0
76FFD476 FF000009 699A00C2 B7FF2600 C4B7FF26 F45EC400 00000E87 C726F45E ^¶&ú.ß...ó^¶&.ñó.&.ñö..i....vå.v 0001C0
6A029A68 006A1DAF 6800CAB7 FF26F45E C408C483 08260627 9A0C76FF 0E76FFD2 @.v..v..'.&..ó.ó^¶&.ñò.h€.j.h..j 0001E0
```

Dump of file SATURN:[PCCOMMON.DUMP.DLL]SA-DGFD.DLL;1 on 18-APR-1990 10:50:15.11
File ID (447,10,0) End of file block 66 / Allocated 68

Virtual block number 34 (00000022), 512 (0200) bytes

```
0876FF0A 76FF0C76 FF0E76FF 1076FF12 76FF001A E9D64689 000009F9 9A016A00 .j..ª....F#Õ...v..v..v..v..v..v. 000000
8E084E88 1E565700 0030C800 0ECAC95F 5E1F0000 E9000088 06150700 9A0676FF .v......¡..Õ...^_èò..à0..WV.¡N.. 000020
FF0E76FF 0253E903 74200646 F6025CE9 03741006 46F60265 E9037408 0646F608 Ä-F..t.Õe.-F..t.Õ\.-F. t.ÕS..v.. 000040
FFEE76FF 0876FF0A 76FF5016 D0468D50 16E8468D 0000085E 9A5016EC 46800C76 v..F&.P.^....FÒ.P.FÁ.P.v..v..vŸ. 000060
9A5016F0 46800876 FF0A76FF 016A026A 0C76FF0E 76FF10C4 830A1C00 899AEC76 v$......ó..v..v.j.j..v..v..FÞ.P. 000080
26EC5EC4 FE5689FC 4689F656 8BF4468B FA5689F8 4689F256 8BF0468B 0000FFFF .....FÞ.V·.F½.Vª.F¶.V—.F•.V±ó^$& 0000A0
8BD8468B E44689E6 46890000 8BD84689 DA468900 00880091 E9037500 00DEBF83 .¢B..u.Õ..|...FÖ.FÄ|...F|.FÕ.FÄ. 0000C0
DE56890C 4689000A 8300502D E6568BE4 468BE256 89E04689 00D28301 90050A56 VÖ....@..FÁ.Vã.FÕ.V|-P..Ö..FÉ.VB 0000E0
0C76FF0E 76FF0000 0C869A50 16D8468D 0C76FF0E 76FF0000 00DE87C7 26EC5EC4 ó^$&ú.ß....v..v..FÄ.P......v..v. 000100
B7FF26EC 5EC40000 0CBA9A01 6A046A00 6A016A14 6A006A14 6A006A50 16D84680 .FÄ.Pj.j.j.j.j.j.j..¤...ó^$&.ñ 000120
8B26EC5E C400000C DD9A006A 00988 7FF 26009AB7 FF26EC5E C400C2B7 FF2600C4 ó.&.ñö.ó^$&.ñ..&.ñ..j..T...ó^$&. 000140
000C978B 2600DA87 8B26EC5E C40C76FF 0E76FF00 84E90375 000C870B 2600DA87 .Ö.&..É.u.Õ...v..v.ó^$&..Ö.&..É. 000160
2600DA87 8B26EC5E C400CEB7 FF2600D0 B7FF26EC 5EC40000 07F09A50 52008505 ...RP.Þ...ó^$&.ñÁ.&.ñö.ó^$&..Ö.& 000180
5EC40000 0ABB9A01 6A066A00 6A016A28 6A006A28 6A006A50 52008505 000C978B ..É....RPj.j(j.j(j.j.j.j..£...ó^ 0001A0
0009479A 006A37FF 260277FF 2600DA9F C426EC5E C400C2B7 FF2600C4 B7FF26EC $&.ñó.&.ñö.ó^$&ó.Ö.&.w.&.7j..G.. 0001C0
D79A00C2 87FF2600 C4B7FF26 EC5EC400 DA878926 000C8789 26000088 EC5EC400 .ó^$|..&..É.&..Ö.ó^$&.ñó.&.ñö..■ 0001E0
```

Dump of file SATURN:[PCCOMMON.DUMP.DLL]SA-DGFD.DLL;1 on 18-APR-1990 10:50:15.11
File ID (447,10,0) End of file block 66 / Allocated 68

Virtual block number 35 (00000023), 512 (0200) bytes

```
FFD276FF 0042E903 75000083 BF832600 5EC40050 E9037502 4608D046 8800000A ....FÅ.F@u.ÕP.ó^Å&.¢°..u.ÕB..v@. 000000
02596800 C6B7FF26 00C887FF 26EC5EC4 08C4830A EA06279A 0C76FF0E 76FFD076 vÅ.v..v..'.õ..ó.ó^$&.ñà.&.ñó.hY. 000020
5EC4002B E9D64689 00000082 9A501604 46805016 F8468000 0036FF26 0092068E ....&.ó...F½.P.Få.P......F#Õ+.ó^ 000040
16D4468D 5016F846 8D000036 FF260092 068E0258 6800C6B7 FF2600C8 B7FF26EC $&.ñà.&.ñó.hX.....&.ó...F½.P.Få. 000060
D4468810 AF6800CA B7FF26EC 5EC4001D E90375FF D47E8306 46890000 FFFF9A50 P......F#.-å.u.Õ..ó^$&.ñò.h€..Få 000080
00018AC8 000ECAC9 5F5E1F00 00E90000 88D64689 0000FFFF 9A016A00 6A505299 .RPj.j.......F#|..Õ...^_èò..à... 0000A0
00C2878B 26F25EC4 00000B68 9A5016F2 46800C76 FF0E76FF D88E0830 B81E5657 WV.¡=..Ä.v..v..F·.P.h...ó^·&..ó. 0000C0
FC5689FA 468900F0 97882600 EE878826 F25EC4FE D29689FE D0868900 C4978826 &..ó...Á±..@±ó^·&..Ÿ.&..Þ..Fª.V= 0000E0
10C4830B 8500899A F276FFF4 76FF0876 FF0A76FF 5016FE7A 86805016 FEE2868D ..ã±.P..z±.P.v..v..v¶.v·......ó. 000100
FE7A9EC4 002DE903 74000085 BF8326FE 7A9EC400 1EE90375 FE7C860B FE7A8688 ..z±..|±u.Õ..ó.z±&.¢ç..t.Õ-.ó.z± 000120
06478826 FEE29EC4 069CE903 75FEE486 08FEE286 88001EE9 03740000 B7BF8326 &.¢ñ..t.Õ....ã±..Õ±u.Õ..ó.ã±&.G. 000140
0374FE7C 8608FE7A 8688011D E90375FE E4860BFE E2868806 88E90374 08470826 &.G.t.Õ....ã±..Õ±u.Õ....z±..|±t. 000160
FEDC868D FED086FF FED286FF 00FFE903 750C4708 260A4788 26FEE29E C40110E9 Õ..ó.ã±&.G.&.G.u.Õ...Ñ@±.¹Å±..É± 000180
86FF0000 FFFF9AFE D086FFFE D286FF00 00E90375 00FEDC8E 830000FF FF9A5016 .P....../É±.u.Õ...Ñ@±.ÑÅ±. ....Ñ 0001A0
000F149A 5016EE46 8D126A37 FF260277 FF260A5F C426FEE2 9EC4FED0 B6FFFED2 @±.ÑÅ±ó.ã±&ó_.&.w.&.7j..FŸ.ƒ ... 0001C0
FEE29EC4 FED086FF FED286FF 0606E9FE CE868800 07E90375 000030FE CE868900 ...ò±=..u.Õ....ò±Õ...Ñ@±.ÑÅ±ó.ã± 0001E0
```

```
Dump of file SATURN:[PCCOMMON.DUMP.DLL]SA-DGFD.DLL;1 on 18-APR-1990 10:50:15.11
File ID (447,10,0)   End of file block 66 / Allocated 68

Virtual block number 36 (00000024), 512 (0200) bytes

 7500003D FECE8689 0000FFFF 9A5016FE DE868D13 6A37FF26 0277FF26 0A5FC426 &6_.&.w.&.7j...8±.P.......ö±=..u 000000
 FFFF9AFE D0B6FFFE D2B6FF00 0DE90375 00FEDCBE 8305CFE9 FECE8688 0007E903 .Õ....ö±Õü../É±.u.Õ...Ñ0±.ÑÂ±... 000020
 32E90375 02470B26 078826FE DE9EC400 10E90374 02470B26 078826EE 5EC40000 ..á^Y&..&.G.t.Õ..á.ß±&..&.G.u.Õ2 000040
 5016FEEA 868D016A 006A016A 006A0000 FFFF9A01 00685016 FEEA868D 03F46800 .h¶...õ±.Ph.......j.j.j.j...õ±.P 000060
 759A5016 FEE6868D 5016FA46 800567E9 0000B800 00FFFF9A 206A006A 006A006A j.j.j.j .....|..Õg..F°.P..Ì±.P.u 000080
 FFF476FF 5016FED4 868D0544 E9FECE86 880007E9 03750000 3DFECE86 89000002 .....ö±=..u.Õ....ö±ÕD...å±.P.v¶. 0000A0
 D49EC405 1DE9FECE 86880007 E9037500 003DFECE 868908C4 83078D08 6A9AF276 v·.j....á...ö±=..u.Õ....ö±Õ..á.å 0000C0
 FEE6B6FF FEE8B6FF FED0B6FF FED2B6FF 02578926 078926FE E8968BFE E6868BFE ±..Ì±..Ò±&..&.W..Ñ0±.ÑÂ±.ÑÒ±.Ñl± 0000E0
 0007E903 7500003D FECE8689 000002D8 9A505200 0405FED6 9688FED4 8688016A j...å±..ø±...RP.Ä.....ö±=..u.Õ.. 000100
 267B4789 26000088 FED49EC4 004DE903 75FEE486 0BFEE286 8B0403E9 FECE868B ..ö±Õ€...ã±..ö±u.ÕM.á.å±|..&.G(& 000120
 8926FED6 9688FED4 868BFEE2 9EC47547 89267747 89260000 8BFED49E C4794789 .Gyá.å±|..&.Gw&.Guá.ã±..å±..ø±&. 000140
 87E97357 89267147 8926FED4 9EC40C57 88260A47 8826FEE2 9EC40857 89260647 G.&.W.á.ã±&.G.&.W.á.å±&.Gq&.WsÕñ 000160
 FED88689 73578826 71478826 FE7A9EC4 0062E903 750000B7 BF8326FE 7A9EC401 .á.z±&.¢ñ..u.Õb.á.z±&.Gq&.Ws..Ä± 000180
 260000B8 FED49EC4 73578926 71478926 FEDA9688 FED8868B FED49EC4 FEDA9689 ..Ö±á.å±..Ä±..Ö±&.Gq&.Wsá.å±|..& 0001A0
 8BFE7A9E C47B5789 26794789 26FE7C96 8BFE7A86 8BFED49E C4754789 26774789 .Gw&.Guá.å±..z±..|±&.Gy&.W(á.z±. 0001C0
 03747B47 0B267947 8B26FE7A 9EC40146 E9775789 26754789 26FED696 8BFED486 .å±..ø±&.Gu&.WwÕF.á.z±&.Gy&.G(t. 0001E0

Dump of file SATURN:[PCCOMMON.DUMP.DLL]SA-DGFD.DLL;1 on 18-APR-1990 10:50:15.11
File ID (447,10,0)   End of file block 66 / Allocated 68

Virtual block number 37 (00000025), 512 (0200) bytes

 8BFED886 8BFED49E C4FEDA96 89FED886 8973578B 2671478B 26FE7A9E C400BEE9 Õ/.á.z±&.Gq&.Ws..Ä±..Ö±á.å±..Ä±. 000000
 FEDA968B FED8868B 002AE903 75FEDA86 0BFED886 88735789 26714789 26FEDA96 .Ö±&.Gq&.Ws..Ä±..Ö±u.Õ*...Ä±..Ö± 000020
 E9085789 26064789 26FED696 8BFED486 8BFEE29E C4FEE496 89FEE286 89009505 .....ã±..Ö±á.ã±..å±..ø±&.G.&.W.Õ 000040
 26FED696 8BFED486 8BFEE29E C4FEE496 89FEE286 89009C05 F4568BF2 468B0025 X..F·.V¶.....ã±..Ö±á.ã±..å±..ø±& 000060
 8BFED49E C4775789 26754789 26FE7C96 8BFE7A86 8BFED49E C4085789 26064789 .G.&.W.á.å±..z±..|±&.Gu&.Wwá.å±¡ 000080
 77E97B57 89267947 8926FED6 9688FED4 868BFE7A 9EC47947 89267B47 89260000 ..&.G(&.Gyá.z±..å±..ø±&.Gy? W(Õw 0000A0
 7A868BFE D49EC473 57892671 478926FE D49EC473 57882671 478826FE 7A9EC400 .á.z±&.Gq&.Wsá.å±&.Gq&.Wsá.á±..z 0000C0
 C4F85689 F646897B 57882679 478826FE 7A9EC477 57892675 478926FE 7C968BFE ±..|±&.Gu&.Wwá.z±&.Gy&.W(.F-.v⅄á 0000E0
 478926FE D6968BFE D4868BFE 7A9EC47B 57892679 478926F8 568BF646 8BFED49E .å±.F-.VY&.Gy&.W(á.z±..å±..ø±&.G 000100
 FED6968B FED4868B 77578926 75478926 FED6968B FED4868B F65EC47B 57892679 y&.W(á^-..å±..ø±&.Gu&.Ww..å±..ø± 000120
 26084789 26000088 FE7E9EC4 000107C7 26FE7E9E C4FE8096 89FE7E86 89009505 .....~±...±á.~±&ú...á.~±|..&.G.& 000140
 2671478B 26FED49E C40C5789 260A4789 26FED696 8BFED486 8BFE7E9E C4064789 .G.á.~±..å±..ø±&.G.&.W.á.å±&.Gq& 000160
 68FED086 FFFED2B6 FF37FF26 0277FF26 715FC426 FED49EC4 0032E903 7573470B .Gsu.Õ2.á.å±&á_q&.w.&.7.Ñ0±.ÑÂ±h 000180
 B6FFFED2 B6FF0020 E910C483 000012D3 9A006A37 FF260277 FF26FED4 9EC4458A .Eá.å±&.w.&.7j..Æ....á.Õ ..Ñ0±.Ñ 0001A0
 8826FED4 9EC40CC4 83000002 FF9A006A 37FF2602 77FF26FE D49EC445 8968FED0 Â±h.Eá.å±&.w.&.7j.......á.á.å±&. 0001C0
 9689FE76 86890257 8826078B 26715FC4 26FED49E C4001AE9 03757347 0B267147 Gq&.Gsu.Õ..á.å±&á_q&..&.W...v±.. 0001E0

Dump of file SATURN:[PCCOMMON.DUMP.DLL]SA-DGFD.DLL;1 on 18-APR-1990 10:50:15.11
File ID (447,10,0)   End of file block 66 / Allocated 68

Virtual block number 38 (00000026), 512 (0200) bytes

 18E90375 77470B26 75478826 FED49EC4 FE768689 FE788689 0000B800 0BE9FE78 x±Õ..|....x±..v±á.å±&.Gu&.Gwu.Õ. 000000
 89EC4689 0000B800 09E9EC56 89EA4689 02578B26 07882675 5FC426FE D49EC400 .á.å±&á_u&..&.W...Fõ.VšÕ..|...Fš. 000020
 FFFEE8B6 FF458D68 FED0B6FF FED2B6FF FE76B6FF FE78B6FF EA76FFEC 76FFEA46 Fõ.vš.võ.Ñx±.Ñv±.Ñ0±.ÑÂ±h.E.ÑÒ±. 000040
 2168FED0 B6FFFED2 B6FF0050 47C626FE D49EC414 C4830000 138C9A00 6AFEE6B6 Ñl±j.......á.á.å±&6GP..Ñ0±.ÑÂ±hl 000060
 868B216A 005047C6 26FED49E C40CC483 000013C1 9A006AFE E6B6FFFE E8B6FF27 '.ÑÒ±.Ñl±j..è....á.á.å±&6GP.j!.. 000080
 006AFEE6 B6FFFEE8 B6FF271F 68FED0B6 FFFED2B6 FF505200 5005FED6 9688FED4 å±..ø±.P.RP.Ñ0±.ÑÂ±h.'.ÑÒ±.Ñl±j. 0000A0
 0007999A 0C76FF0E 76FF04C4 830FC505 A69AF276 FFF476FF 12C48300 0012809A .‾....á..v¶.v·.Ì.é..á..v..v..... 0000C0
 0C76FF0E 76FF0067 E9037500 FE7E8300 0003E49A 5016FE46 80FA76FF FC76FF00 ..v•.v°.F±.P.Õ....~±.u.Õg..v..v. 0000E0
 CE868900 0003F29A 00C2B7FF 2600C4B7 FF26F25E C40000FF FF9A1076 FF1276FF .v..v......á^·&.ñá.&.ñÕ..·.....ö 000100
 9A010068 5016FEEA 868D03EF 68000004 079A00EE 87FF2600 F0B7FF26 F25EC4FE ±á^·&.ñÞ.&.ñŸ......hÿ...õ±.Ph... 000120
 93E90000 14F09A00 6A006A50 16FEEA86 8D10B168 00CAB7FF 26F25EC4 0000146E n...á^·&.ñÕ.hŸ...õ±.Pj.j..Þ...Õ. 000140
 FF9A5016 FEE6868D FA76FFFC 76FF0000 0F6E9A01 00685016 FEEA868D 03EC6800 .hš...õ±.Ph...n....v•.v°..Ì±.P.. 000160
 B6FFFED0 B6FFFED2 B6FF0064 E9FECE86 880007E9 03750000 3DFECE86 890000FF .....ö±=..u.Õ....ö±Õd..Ñ0±.ÑÂ±.Ñ 000180
 880007E9 03750000 3DFECE86 89000010 109A5016 FE828680 016AFEE6 B6FFFEE8 Ò±.Ñl±j....±.P.......ö±=..u.Õ... 0001A0
 B7FF26F2 5EC408C4 83FFFF00 009A5016 FEEA8680 5016FE82 86800034 E9FECE86 .ö±Õ4....±.P..õ±.P......á.á^·&.ñ 0001C0
 0ECAC95F 5E1F0000 E9000088 00000804 9A006A00 6A5016FE EA868D1D B16800CA ò.hÝ...õ±.Pj.j......|..Õ...^_èò. 0001E0
```

```
Dump of file SATURN:[PCCOMMON.DUMP.DLL]SA-DGFD.DLL;1 on 18-APR-1990 10:50:15.11
File ID (447,10,0)   End of file block 66 / Allocated 68

Virtual block number 39 (00000027), 512 (0200) bytes

 FC5EC400 0000D49A 5016FC46 8D0C76FF 0E76FFD8 8E0DC488 1E565700 0146C800 .àF..WV.|á..Ä.v..v..F=.P.å...á^= 000000
 FC5EC401 06878926 01088789 26000088 FC5EC401 02878926 01048789 26000088 ¡..&....&....á^=¡..&....&....á^= 000020
 FF0876FF 0A76FF50 16FEBA86 8D5016FE F8868D01 0A878926 010C8789 26000088 ¡..&....&......½±.P..¤±.P.v..v.. 000040
 8326FEBA 9EC40348 E90375FE 8C860BFE BA868810 C4830E18 00899AFC 76FFFE76 v±.v=......á...¤±..¥±u.ÕH.á.¤±&. 000060
 FF26FC5E C4006DE9 0375000C 87082600 DA878826 FC5EC403 39E90375 000085BF ¢ç..u.Õ9.á^=&..Õ.&..É.u.Õm.á^=&. 000080
 76FF0000 167B9A00 6A37FF26 0277FF26 000A9FC4 26FC5EC4 00C287FF 2600C487 ñá.&.ñó.á^=&á.Õ.&.w.&.7j..(....v 0000A0
 76FF0E76 FF00000C 169A5052 00850500 DC978826 000A8788 26FC5EC4 0C76FF0E ..v.á^=&..Õ.&..É....RP......v..v 0000C0
 6A006A01 6A286A00 6A286A00 6A505200 8505000C 97882600 DA878826 FC5EC40C .á^=&..Õ.&..É....RPj.j(j.j(j.j.j 0000E0
 FC868003 F2680000 0CFF9A00 C2B7FF26 00C4B7FF 26FC5EC4 00000C36 9A016A06 .j..6...á^=&.ñá.&.ñó......h·...= 000100
 009A5016 FEFC8680 50520004 05FEBC96 8BFEBA86 8B000014 409A0100 685016FE ±.Ph...ə.....¤±..¥±...RP..=±.P.. 000120
 0000145A 9A006A00 6A5016FE FC868D1D B16800CA B7FF26FC 5EC408C4 83140500 .{..á.á^=&.ñò.hÝ...=±.Pj.j..Z... 000140
 FF00000C 579A016A 37FF2602 77FF26FE 8A9EC400 C287FF26 00C487FF 26FC5EC4 á^=&.ñá.&.ñö.á.¤±&.w.&.7j..W.... 000160
 E09A286A 006A286A 006A066A 086A5052 008505FE BC968BFE BA86880C 76FF0E76 v..v...¤±..¥±...RPj.j.j.j(j.j(.Á 000180
 8BFEBA86 8BFC5EC4 000C9789 26000A87 8926FEBC 968BFEBA 868BFC5E C4000009 ...á^=..¤±..¥±&..Õ.&..É.á^=..¤±. 0001A0
 26010287 8926FC5E C4025788 26078826 085EC401 0C978926 010A8789 26FEBC96 .¥±&....&....á^.&..&.W.á^·&....& 0001C0
 FF0E76FF 01089789 26010687 8926FC5E C4065788 2604478B 26085EC4 01049789 ....á^.&.G.&.W.á^=&....&..  .v.. 0001E0

Dump of file SATURN:[PCCOMMON.DUMP.DLL]SA-DGFD.DLL;1 on 18-APR-1990 10:50:15.11
File ID (447,10,0)   End of file block 66 / Allocated 68

Virtual block number 40 (00000028), 512 (0200) bytes

 878826FC 5EC40000 FFFF9A02 6A0C76FF 0E76FF00 00FFFF9A 5016FEF6 868D0C76 v...-±.P......v..v.j.......á^=&.. 000000
 83001F05 0104978B 26010287 8826FC5E C4FED096 89FECE86 89010497 88260102 ..&......ö±..Å±á^=&....&........ 000020
 C4FEE096 89FEDE86 89010497 88260102 878826FC 5EC4FED8 9689FED6 86890002 ●...ø±..Å±á^=&....&......ß±..Å±á 000040
 08978826 01068788 26FC5EC4 FED49689 FED28689 01089788 26010687 8826FC5E ^=&....&......●±..å±á^=&....&... 000060
 8300182D 0108978B 26010687 8826FC5E C4FEDC96 89FEDA86 8900DA83 00082001 .·...Õ...Õ±..É±á^=&....&....-... 000080
 006A006A 026A5016 FECE868D 036A006A 0C76FF0E 76FFFEE4 9689FEE2 8689000A Õ...ä±..õ±.v..v.j.j...ö±.Pj.j.j. 0000A0
 05FED896 8BFED686 8BFEC096 89FEBE86 89FED896 8BFED686 8B000008 359A006A j..5.....ø±..Ä±..ƒ±..å±..ø±..Ä±. 0000C0
 DA868BFE C49689FE C28689FE DC968BFE DA868BFE C89689FE C6868900 D2830024 $..●...ó±..à±..Õ±..É±..ô±..á±..Õ 0000E0
 6A006A50 16FEBE86 8D026A00 6A0C76FF 0E76FFFE CC9689FE CA8689FE DC968BFE ±..É±..ò±..ä±.v..v.j.j.../±.Pj.j 000100
 FEE8968B FEE6868B FEE89689 FEE68689 FEC8968B FEC6868B 00000816 9A016A00 .j........ó±..à±..Ì±..Ò±..Ì±..Ò± 000120
 FEEA8689 000A8300 502DFECC 968BFECA 868BFEF0 9689FEEE 86890002 83023105 .1..●...Ÿ±..Þ±..Þ±..ä±·P..Õ...õ± 000140
 0C76FF0E 76FFFEF4 9689FEF2 868900D2 83002705 FECC968B FECA868B FEEC9689 ..š±..Þ±..ä±.'..●...:±..¶±.v..v. 000160
 76FF0E76 FF000016 049A026A 006A006A 016A286A 006A286A 006A5016 FEE6868D ..Ì±.Pj.j(j.j(j.j.j.j.......v..v 000180
 01CF9A01 1AB7FF26 011C87FF 26FC5EC4 0C76FF0E 76FF0000 17169AFE F686FF0C ..Ñ-±......v..v.á^=&.ñ..&.ñ...ü. 0001A0
 76FF0E76 FFD88E15 09881E56 57000056 C8000ECA C95F5E1F 0000E900 00880000 ..¡..Õ...^_èò..àV..WV.¡...Ä.v..v 0001C0
 5689EE46 89735788 26714788 26010A9F C426F45E C4000015 199A5016 F446800C ..F¶.P.....á^¶&á...&.Gq&.Ws.FŸ.V 0001E0

Dump of file SATURN:[PCCOMMON.DUMP.DLL]SA-DGFD.DLL;1 on 18-APR-1990 10:50:15.11
File ID (447,10,0)   End of file block 66 / Allocated 68

Virtual block number 41 (00000029), 512 (0200) bytes

 4688000F E9AC5689 AA468900 9505F056 88EE4688 0012E903 75F04608 EE4688F0 Þ.FŸ.FÞu.Õ...FŸ.VÞ....F˙.V¯Õ...F 000000
 5EC4FE56 89FC4689 14578826 12478826 AA5EC4AC 5689AA46 89009C05 F65688F4 ¶.V-....F˙.V˜á^˜&.G.&.W..F=.V±á^ 000020
 14578826 12478826 AA5EC4FA 5689F846 89000283 001F0510 5788260E 478826AA ˜&.G.&.W.....●..F½.V°á^˜&.G.&.W. 000040
 BE4689FA 5688F846 88C45689 C2468900 02830031 0504571B 2602472B 26AA5EC4 á^˜&+G.&.W..1..●..Fó.Vá.F½.V°.Fƒ 000060
 03770447 39260009 E9037E03 26E9037D 06573926 FE5688FC 4688085E C4C05689 .Vàá^..F=.V±&9W.).Õ&.~.Õ..&9G.w. 000080
 02F8E903 75010897 3926000A E9037401 06873926 FE5688FC 4688F45E C40318E9 Õ..á^¶.F=.V±&9...t.Õ..&9...u.Õ%. 0000A0
 F45EC400 0018A69A 026A0C76 FF0E76FF 00001709 9A5016F2 46800C76 FF0E76FF .v..v..F·.P......v..v.j..Ì...á^¶ 0000C0
 001F0501 04978826 01028788 26F45EC4 C85689C6 46890104 97882601 02878826 &....&.....Fó.Vàá^¶&....&....... 0000E0
 26F45EC4 D85689D6 46890104 97882601 02878826 F45EC4D0 5689CE46 89000283 .●..Fö.VÄá^¶&....&.....Fø.VÄá^¶& 000100
 8300082D 0108978B 26010687 8826F45E C4CC5689 CA468901 08978826 01068788 ....&.....Fò.Väá^¶&....&....-... 000120
 56890A46 89000A83 00182D01 08978826 01068788 26F45EC4 D4568902 4689000A Õ..F●.Vàá^¶&....&....-...Õ..FÕ.V 000140
 CE468800 0017C39A 006A006A 006A026A 5016C646 8D036A00 6A0C76FF 0E76FFDC É.v..v.j.j..Fó.Pj.j.j.j..û....Fö 000160
 5688D246 88885689 86468900 02830024 05005688 CE468880 5689AE46 89005688 .VÅ.FÛ.V˜.Fö.VÅ.$..●..FŘ.V¡.F●.V 000180
 AE468002 6A006A0C 76FF0E76 FF8C5689 8A468904 56880246 88845689 82468904 å.Fý.VÇ.F●.Vå.F¤.V¥.v..v.j.j..FÛ 0001A0
 05E0568B DE4688E0 56890E46 89885688 86468800 0018249A 016A006A 006A5016 .Pj.j.j..$....FŘ.V¡.FB.VÅ.FB.VÅ. 0001C0
 BA4688E4 5689E246 89000A83 00502D8C 56888A46 88E85689 E6468900 D2830231 1..●..FÌ.VÒ.F¤.V¥-P..Õ..Fã.VÕ.F¤ 0001E0
```

```
Dump of file SATURN:[PCCOMMON.DUMP.DLL]SA-DGFD.DLL;1 on 18-APR-1990 10:50:15.11
File ID (447,10,0)   End of file block 66 / Allocated 68

Virtual block number 42 (0000002A), 512 (0200) bytes

 006A286A 006A5016 DE46800C 76FF0E76 FFEC5689 EA468900 D2830027 05BC5688 .V¥.'..Ø..Fõ.Vš.v..v..FB.Pj.j(j. 000000
 97892601 06878926 FE568BFC 4688F45E C4000018 979A026A 006A006A 016A286A j(j.j.j.j......á^¶.F=.V±&....&.. 000020
 97882601 02878826 F45EC401 04978926 01028789 26FA5688 F8468BF4 5EC40108 ..á^¶.F½.V¹&....&....á^¶&....&.. 000040
 5689CE46 89000283 001F0501 04978826 0102878B 26F45EC4 C85689C6 46890104 ...Fó.Vàá^¶&....&........Ø..Fö.V 000060
 08978826 0106878B 26F45EC4 08568906 46890104 97882601 02878826 F45EC400 Áá^¶&....&.....Fø.VÄá^¶&....&... 000080
 D45689D2 468900DA 830082D 01089788 26010687 8826F45E C4CC5689 CA468901 ..Fò.Väá^¶&....&....-...Ö..FØ.Vå 0000A0
 6A0C76FF 0E76FFDC 56890A46 89000A83 00182D01 08978826 0106878B 26F45EC4 á^¶&....&....-...Ö..FÖ.VÉ.v..v.j 0000C0
 5689AE46 89D05688 CE468800 001D819A 006A006A 006A026A 5016C646 8D036A00 _j..Fó.Pj.j.j.j..Ÿ....Fö.VÅ.FÛ.V 0000E0
 88845689 B24689D4 5688D246 88885689 B6468900 D2830024 05D05688 CE4688B0 ¯.Fö.VÅ.$..Ø..FÑ.V¦.FØ.Vå.Fý.VÇ. 000100
 016A006A 006A5016 AE468D02 6A006A0C 76FF0E76 FFBC5689 BA4689D4 5688D246 FØ.Vå.Fα.V¥.v..v.j.j..FÛ.Pj.j.j. 000120
 E6468900 D2830231 05E05688 DE4688E0 5689DE46 89885688 B6468800 001E019A ......FÑ.V¦.FB.VÅ.FB.VÅ.1..Ø..Fì 000140
 D2830027 05BC5688 BA4688E4 5689E246 89000A83 00502DBC 5688BA46 88E85689 .VÒ.Fα.V¥-P..Ö..Fã.VÕ.Fα.V¥.'..Ø 000160
 006A006A 016A286A 006A286A 006A5016 DE46800C 76FF0E76 FFEC5689 EA468900 ..Fõ.Vš.v..v..FB.Pj.j(j.j(j.j.j. 000180
 4688085E C4061FE9 0000E900 001D119A F276FF0C 76FF0E76 FF00001E 639A026A j..c....v..v..v·.....Õ..Õ..á^..F 0001A0
 4688F45E C40318E9 03720447 39260009 E9037D03 26E9037E 06573926 C45688C2 ò.Vá&9W.-.Õ&.).Õ..&9G.r.Õ..á^¶.F 0001C0
 46800C76 FF0E76FF 02F8E903 75010897 3926000A E9037401 06873926 C45688C2 ò.Vá&9...t.Õ..&9...u.Õ½..v..v..F 0001E0

Dump of file SATURN:[PCCOMMON.DUMP.DLL]SA-DGFD.DLL;1 on 18-APR-1990 10:50:15.11
File ID (447,10,0)   End of file block 66 / Allocated 68

Virtual block number 43 (0000002B), 512 (0200) bytes

 97882601 02878826 F45EC400 0019D99A 026A0C76 FF0E76FF 000019CC 9A5016F2 ·.P.ä....v..v.j..)...á^¶&....&.. 000000
 5689CE46 89000283 001F0501 04978826 0102878B 26F45EC4 C85689C6 46890104 ...Fó.Vàá^¶&....&........Ø..Fö.V 000020
 08978826 0106878B 26F45EC4 08568906 46890104 97882601 02878826 F45EC400 Áá^¶&....&.....Fø.VÄá^¶&....&... 000040
 D45689D2 4689000A 830082D 01089788 26010687 8826F45E C4CC5689 CA468901 ..Fò.Väá^¶&....&....-...Ö..FØ.Vå 000060
 6A0C76FF 0E76FFDC 56890A46 89000A83 00182D01 08978826 0106878B 26F45EC4 á^¶&....&....-...Ö..FÖ.VÉ.v..v.j 000080
 5689AE46 89D05688 CE468800 001F299A 006A006A 006A026A 5016C646 8D036A00 _j..Fó.Pj.j.j.j..)....Fö.VÅ.FÙ.V 0000A0
 88845689 B24689D4 5688D246 88885689 B6468900 D2830024 05D05688 CE4688B0 ¯.Fö.VÅ.$..Ø..FÑ.V¦.FØ.Vå.Fý.VÇ. 0000C0
 016A006A 006A5016 AE468002 6A006A0C 76FF0E76 FFBC5689 BA4689D4 5688D246 FØ.Vå.Fα.V¥.v..v.j.j..FÛ.Pj.j.j. 0000E0
 E6468900 D2830231 05E05688 DE4688E0 5689DE46 89885688 B6468800 001AC99A .è....FÑ.V¦.FB.VÅ.FB.VÅ.1..Ø..Fì 000100
 D2830027 05BC5688 BA4688E4 5689E246 89000A83 00502DBC 5688BA46 88E85689 .VÒ.Fα.V¥-P..Ö..Fã.VÕ.Fα.V¥.'..Ø 000120
 006A006A 016A286A 006A286A 006A5016 DE46800C 76FF0E76 FFEC5689 EA468900 ..Fõ.Vš.v..v..FB.Pj.j(j.j(j.j.j. 000140
 8E468BF4 5EC40108 97892601 06878926 C45688C2 4688F45E C400001B 289A026A j..+...á^¶.Fó.Vá&....&....á^¶.Ff 000160
 C85689C6 46890104 97882601 02878826 F45EC401 04978926 01028789 26C05688 .Vå&....&....á^¶&....&.....Fó.Và 000180
 02878826 F45EC4D0 5689CE46 89000283 001F0501 04978826 0102878B 26F45EC4 á^¶&....&........Ø..Fö.VÄá^¶&... 0001A0
 C4CC5689 CA468901 08978826 0106878B 26F45EC4 08568906 46890104 97882601 .&.....Fø.VÄá^¶&....&.....Fò.Väá 0001C0
 0106878B 26F45EC4 D45689D2 4689000A 830082D 01089788 26010687 8826F45E ^¶&....&....-...Ö..FØ.Vàá^¶&.... 0001E0

Dump of file SATURN:[PCCOMMON.DUMP.DLL]SA-DGFD.DLL;1 on 18-APR-1990 10:50:15.11
File ID (447,10,0)   End of file block 66 / Allocated 68

Virtual block number 44 (0000002C), 512 (0200) bytes

 5016C646 8D036A00 6A0C76FF 0E76FFDC 56890A46 89000A83 00182001 08978826 &....-...Ö..FÖ.VÉ.v..v.j.j..Fó.P 000000
 05D05688 CE4688B0 5689AE46 89D05688 CE468800 001A799A 006A006A 006A026A j.j.j.j..y....Fö.VÅ.FÛ.V¯.Fö.VÅ. 000020
 BA4689D4 5688D246 88845689 B24689D4 5688D246 88885689 B6468900 D2830024 $..Ø..FÑ.V¦.FØ.Vå.Fý.VÇ.FØ.Vå.Fα 000040
 B6468800 001C419A 016A006A 006A5016 AE468D02 6A006A0C 76FF0E76 FFBC5689 .V¥.v..v.j.j..FÛ.Pj.j.j..A....FÑ 000060
 5688BA46 88E85689 E6468900 D2830231 05E05688 DE4688E0 56890E46 89885688 .V¦.FB.VÅ.FB.VÅ.1..Ø..Fì.VÒ.Fα.V 000080
 FFEC5689 EA468900 D2830027 05BC5688 BA4688E4 5689E246 89000A83 00502DBC ¥-P..Ö..Fã.VÕ.Fα.V¥.'..Ø..Fõ.Vš. 0000A0
 FF000021 5E9A026A 006A006A 016A286A 006A286A 006A5016 DE46800C 76FF0E76 v..v..FB.Pj.j(j.j(j.j.j.j..^l... 0000C0
 049A5016 F246800C 76FF0E76 FF02E7E9 0000E900 00200C9A F276FF0C 76FF0E76 v..v..v·.. ..Õ..ÕÕ..v..v..F·.P.. 0000E0
 C6468901 04978826 0102878B 26F45EC4 000022D6 9A026A0C 76FF0E76 FF00001D ....v..v.j..ø"..á^¶&....&.....Fó 000100
 26F45EC4 D05689CE 46890002 83001F05 01049788 26010287 8826F45E C4C85689 .Vàá^¶&....&........Ø..Fö.VÄá^¶& 000120
 89CA4689 01089788 26010687 8826F45E C4D85689 D6468901 04978826 0102878B ....&.....Fø.VÄá^¶&....&.....Fò. 000140
 8826F45E C4D45689 D2468900 DA83000B 2D010897 88260106 878826F4 5EC4CC56 Väá^¶&....&....-...Ö..FØ.Vàá^¶&. 000160
 4680036A 006A0C76 FF0E76FF DC56890A 4689000A 8300182D 01089788 26010687 ...&....-...Ö..FÖ.VÉ.v..v.j.j..F 000180
 88CE4688 B05689AE 46890056 88CE4688 00002216 9A006A00 6A006A02 6A5016C6 ó.Pj.j.j.j..."...Fö.VÅ.FÛ.V¯.Fö. 0001A0
 D45688D2 46888456 89B24689 D45688D2 46888856 89B64689 00028300 2405D056 VÅ.$..Ø..FÑ.V¦.FØ.Vå.Fý.VÇ.FØ.Vå 0001C0
 00002266 9A016A00 6A006A50 16AE468D 026A006A 0C76FF0E 76FFBC56 89BA4689 .Fα.V¥.v..v.j.j..FÛ.Pj.j.j..f".. 0001E0
```

Dump of file SATURN:[PCCOMMON.DUMP.DLL]SA-DGFD.DLL;1 on 18-APR-1990 10:50:15.11
File ID (447,10,0)   End of file block 66 / Allocated 68

Virtual block number 45 (0000002D), 512 (0200) bytes

```
4688E856 89E64689 00D28302 3105E056 88DE4688 E05689DE 46898856 88B64688 .FÑ.V¡.FB.VÁ.FB.VÁ.1..@..F|.VÒ.F 000000
89EA4689 00028300 2705BC56 88BA4688 E45689E2 468900DA 83005020 BC5688BA ¤.V¥-P..Ö..Fã.VÒ.F¤.V¥.'..@..Fõ. 000020
22C89A02 6A006A00 6A016A28 6A006A28 6A006A50 160E468D 0C76FF0E 76FFEC56 V$.v..v..FB.Pj.j(j.j(j.j.j.j..à" 000040
878826F4 5EC40108 97892601 06878926 F45EC406 57882604 47882608 5EC40000 ..ô^.&.G.&.W.ô^¶&....&....ô^¶&.. 000060
00028300 1F050104 97882601 02878826 F45EC4C8 5689C646 89010497 88260102 ..&.....Fó.Vàô^¶&....&........@. 000080
06878826 F45EC408 56890646 89010497 88260102 878826F4 5EC40056 89CE4689 .Fö.VÄô^¶&....&.....F¤.VÄô^¶&... 0000A0
89000A83 000B2001 08978826 01068788 26F45EC4 CC5689CA 46890108 97882601 .&.....Fò.Väô^¶&....&....-...Ö.. 0000C0
76FFDC56 890A4689 000A8300 18200108 97882601 06878826 F45EC404 56890246 F@.Vàô^¶&....&....·...Ö..FÖ.VÊ.v 0000E0
D05688CE 46880000 18F19A00 6A006A00 6A026A50 16C6468D 036A006A 0C76FF0E ..v.j.j..Fó.Pj.j.j.j..þ....Fö.VÅ 000100
46890456 88024688 885689B6 46890002 83002405 D05688CE 46888056 89AE4689 .FÜ.V¯.Fö.VÅ.$..@..FÑ.V¡.F@.Vå.F 000120
6A5016AE 4680026A 006A0C76 FF0E76FF BC5689BA 46890456 88024688 B45689B2 ÿ.VÇ.F@.Vå.F¤.V¥.v..v.j.j..FÜ.Pj 000140
83023105 E05688DE 4688E056 890E4689 88568886 46880000 1F799A01 6A006A00 .j.j..y....FÑ.V¡.FB.VÁ.FB.VÁ.1.. 000160
8C5688BA 4688E456 89E24689 000A8300 5020BC56 88BA4688 E85689E6 46890002 @..F|.VÒ.F¤.V¥-P..Ö..Fã.VÒ.F¤.V¥ 000180
6A286A00 6A286A00 6A50160E 468D0C76 FF0E76FF EC5689EA 46890002 83002705 .'..@..Fõ.V$.v..v..FB.Pj.j(j.j(j 0001A0
0000E900 00B80000 1CB19AF2 76FF0C76 FF0E76FF 00001CA3 9A026A00 6A006A01 .j.j.j..Ê....v..v..v·.Ý...¡..Ö.. 0001C0
00C49788 2600C287 88260655E C4088E18 D7881E56 5700001A C8000ECA C95F5E1F .^_èò..à...WV.¡■..Äô^.&..ô.&..ó. 0001E0
```

Dump of file SATURN:[PCCOMMON.DUMP.DLL]SA-DGFD.DLL;1 on 18-APR-1990 10:50:15.11
File ID (447,10,0)   End of file block 66 / Allocated 68

Virtual block number 46 (0000002E), 512 (0200) bytes

```
08F84688 FA5689F8 46897357 88267147 8826010A 9FC42606 5EC4F656 89F44689 .F¶.V-ó^.&ó...&.Gq&.Ws.F½.V'.F½. 000000
065EC400 13E9E856 89E64689 0090978B 26009887 8826F85E C40016E9 0375FA46 F'u.Õ..ó^½&....&.....F|.VÒÕ..ó^. 000020
75E8460B E64688FC 4689FE46 890000B8 E85689E6 468900A4 97882600 A2878826 &..À.&..Ê..F|.VÒ|...F±.F•.F|.FÒu 000040
037E0657 38260A5E C4000A83 00332000 93978826 00918788 26E65EC4 0050E903 .ÕP.ó^|&....&....-3..Õ.ó^.&;W.~. 000060
FE5689FC 4689E856 88E64688 0020E900 03E90376 04473826 0009E903 7D0011E9 Õ..).Õ..&;G.v.Õ..Õ ..F|.VÒ.F•.V± 000080
C40226E9 0375E846 08E64688 FFA5E9E8 5689E646 89775788 26754788 26E65EC4 ó^|&.Gu&.Ww.F|.VÒÕE..F|.FÒu.Õ&.ó 0000A0
26065EC4 0206E903 75010C97 3926000A E9037401 0A873926 E8568BE6 4688065E ^..F|.VÒ&9...t.Õ..&9...u.Õ..ó^.& 0000C0
88267547 8826010A 9FC42606 5EC4F256 89F04689 78578826 79478826 010A9FC4 ó...&.Gy&.W(.FÞ.V·ó^.&ó...&.Gu&. 0000E0
75478926 EC5688EA 4688F05E C40014E9 0375F246 08F04688 EC5689EA 46897757 Ww.Fõ.V$.FÞ.F·u.Õ..ó^Þ.Fõ.V$&.Gu 000100
00988789 26EC5688 EA4688F8 5EC40016 E90375FA 4608F846 880034E9 77578926 &.WwÕ4..F½.F'u.Õ..ó^½.Fõ.V$&.... 000120
4608EA46 8800A497 892600A2 878926EC 5688EA46 88065EC4 0013E900 90978926 &....Õ..ó^..Fõ.V$&..À.&..Ê..Fõ.F 000140
88267947 8826E65E C4785789 26794789 26F25688 F04688EA 5EC40011 E90375EC &u.Õ..ó^õ.FÞ.V·&.Gy&.W(ó^|&.Gy&. 000160
010C9788 26010A87 8826065E C4001BE9 0375F246 08F04688 F25689F0 46897857 W(.FÞ.V·.FÞ.F·u.Õ..ó^.&....&.... 000180
0A878826 065EC400 1DE90375 FA4608F8 46880042 E9775789 26754789 26F05EC4 ó^Þ&.Gu&.WwÕB..F½.F'u.Õ..ó^.&... 0001A0
8826010A 87882606 5EC4001A E9009097 89260098 878926F8 5EC4010C 97882601 .&....ó^½&....&....Õ..ó^.&....&. 0001C0
8926F256 88F04688 010A9FC4 26065EC4 00A49789 2600A287 8926065E C4010C97 ...ó^.&..À.&..Ê.ó^.&ó....FÞ.V·&. 0001E0
```

Dump of file SATURN:[PCCOMMON.DUMP.DLL]SA-DGFD.DLL;1 on 18-APR-1990 10:50:15.11
File ID (447,10,0)   End of file block 66 / Allocated 68

Virtual block number 47 (0000002F), 512 (0200) bytes

```
26E65EC4 77578926 75478926 E85688E6 4688010A 9FC42606 5EC47857 89267947 Gy&.W(ó^.&ó....F|.VÒ&.Gu&.Wwó^|& 000000
26010A87 8826065E C4735789 26714789 26010A9F C426065E C473578B 2671478B .Gq&.Wsó^.&ó...&.Gq&.Wsó^.&....& 000020
EE468900 00FFFF9A 03F168F4 76FFF676 FF785789 26794789 26E65EC4 010C9788 ....ó^|&.Gy&.W(.v-.v¶hþ.......FŸ 000040
FF37FF26 0277FF26 F85EC437 FF260277 FF26E65E C40039E9 0375FA46 08F84688 .F½.F'u.Õ9.ó^|&.w.&.7ó^½&.w.&.7. 000060
C4830000 25CD9A00 6A37FF26 0277FF26 010A9FC4 26065EC4 458D68F4 76FFF676 v-.v¶h.Eó^.&ó...&.w.&.7j..ë%...ó 000080
C426065E C4458D68 F476FFF6 76FF006A 006A37FF 260277FF 26E65EC4 0030E914 .Õ0.ó^|&.w.&.7j.j..v-.v¶h.Eó^.&ó 0000A0
89000014 199AF476 FFF676FF 14C48300 0013669A 006A37FF 260277FF 26010A9F ...&.w.&.7j..f....ó..v-.v¶...... 0000C0
E9037501 0C973926 000AE903 74010A87 3926FE56 88FC4688 065EC401 9BE9EE46 FŸÕ..ó^..F•.V±&9...t.Õ..&9...u.Õ 0000E0
010A9FC4 26065EC4 F25689F0 46897857 88267947 8826010A 9FC42606 5EC4017E ~.ó^.&ó...&.Gy&.W(.FÞ.V·ó^.&ó... 000100
88EA4688 F05EC400 14E90375 F24608F0 4688EC56 89EA4689 77578826 75478826 &.Gu&.Ww.Fõ.V$.FÞ.F·u.Õ..ó^Þ.Fõ. 000120
5688EA46 88F85EC4 0016E903 75FA4608 F8468800 34E97757 89267547 8926EC56 V$&.Gu&.WwÕ4..F½.F'u.Õ..ó^½.Fõ.V 000140
A4978926 00A28789 26EC5688 EA468806 5EC40013 E9009097 89260098 878926EC &&....&....Õ..ó^..Fõ.V$&..À.&..Ê 000160
065EC47B 57892679 478926F2 5688F046 8BEA5EC4 0011E903 75EC4608 EA468800 ..Fõ.F&u.Õ..ó^õ.FÞ.V·&.Gy&.W(ó^. 000180
FC468801 0A9FC426 065EC477 57892675 478926FC 5EC4010C 97882601 0A878826 &....&....ó^•&.Gu&.Wwó^.&ó....F• 0001A0
5EC47547 89267747 89260000 88010A9F C426065E C4785789 26794789 26FE5688 .V±&.Gy&.W(ó^.&ó...|..&.Gw&.Guó^ 0001C0
68F476FF F676FF73 57892671 47892601 0A9FC426 065EC473 57882671 478826FC •&.Gq&.Wsó^.&ó...&.Gq&.Ws.v-.v¶h 0001E0
```

Dump of file SATURN:[PCCOMMON.DUMP.DLL]SA-DGFD.DLL;1 on 18-APR-1990 10:50:15.11
File ID (447,10,0) End of file block 66 / Allocated 68

Virtual block number 48 (00000030), 512 (0200) bytes

```
 0277FF26 F85EC400 6A006A00 33E90375 FA460BF8 468BEE46 89000025 599A03F1 þ..Y%...FŸ.F½.F*u.Õ3.j.j.á^½&.w. 000000
 276B9A00 6A37FF26 0277FF26 010A9FC4 26065EC4 458D68F4 76FFF676 FF37FF26 &.7.v-.v¶h.Eá^.&á...&.w.&.7j..k' 000020
 0A9FC426 065EC445 8D68F476 FFF676FF 006A006A 006A006A 002AE914 C4830000 ...á.Õ*.j.j.j.j..v-.v¶h.Eá^.&á.. 000040
 EE468900 0025DB9A F476FFF6 76FF14C4 83000025 9A9A006A 37FF2602 77FF2601 .&.w.&.7j...%...á..v-.v¶.Ü%...FŸ 000060
 FC468D0C 76FF0E76 FFD88E22 EFB81E56 57000104 C8CBC95F 5E1F0000 E9000088 ¡..Õ..."_èùà...WV.¡ÿ".Ä.v..v..F= 000080
 76FFFE76 FF08C483 002B22E7 9AFC76FF FE76FF08 76FF0A76 FF000018 E79A5016 .P.Õ....v..v..v±.v=.Õ"+..á..v±.v 0000A0
 1076FF12 76FF0C76 FF0E76FF 0000130D 9A0C76FF 0E76FF04 C48313D1 05A69AFC =.Ì.1..á..v..v..Ì....v..v..v..v. 0000C0
 B16800CA B7FF26FC 5EC40000 16279A01 00685016 FEFC868D 03F36800 0014079A .....hµ...=±.Ph...'...á^=&.ñò.hÝ 0000E0
 000CC800 0ECAC95F 5E1F0000 E90000B8 0000165C 9A006A00 6A5016FE FC86801D ...=±.Pj.j..\...¡..Õ...^_èò..à.. 000100
 46805016 F8468000 0027A39A 5016FC46 8D0C76FF 0E76FFD8 8E279388 1E565700 .WV.¡.'.Ä.v..v..F=.P.È'...F½.P.F 000120
 E90374F6 460BF446 8810C483 15680089 9AFC76FF FE76FF08 76FF0A76 FF5016F4 ¶.P.v..v..v±.v=...h..á..F¶.F-t.Õ 000140
 2600F287 8926FC5E C402578B 26078B26 085EC400 9DE90374 FA460BF8 468B00A8 ´..F½.F*t.Õ..á^.&..&.W.á^=&...·.& 000160
 26085EC4 00F89789 2600F687 8926FC5E C406578B 2604478B 26085EC4 00F49789 ..¶.á^.&.G.&.W.á^=&..-.&..½.á^.& 000180
 5EC40657 8B260447 8B26085E C400FC97 892600FA 878926FC 5EC40257 8B26078B ..&.W.á^=&..*.&..=.á^.&.G.&.W.á^ 0001A0
 46880C76 FF0E76FF 00001FE9 9A026A0C 76FF0E76 FF010097 892600FE 878926FC =&..±.&.....v..v.j..Õ....v..v..F 0001C0
 01188 7FF 26FC5EC4 0C76FF0E 76FF0000 FFFF9A01 6A036A50 5200F205 FE568BFC =.V±.·.RPj.j.......v..v.á^=&.ñ.. 0001E0
```

Dump of file SATURN:[PCCOMMON.DUMP.DLL]SA-DGFD.DLL;1 on 18-APR-1990 10:50:15.11
File ID (447,10,0) End of file block 66 / Allocated 68

Virtual block number 49 (00000031), 512 (0200) bytes

```
 25B81E56 57000004 C8000ECA C95F5E1F 0000E900 00B80000 188E9A01 16B7FF26 &.ñ...ƒ...¡..Õ...^_èò..à...WV.¡% 000000
 05FE5688 FC468B0C 76FF0E76 FF000028 359A5016 FC468D0C 76FF0E76 FFD88E28 (.Ä.v..v..F=.P.5(...v..v..F=.V±. 000020
 2600FA87 8926FC5E C402578B 26078B26 085EC400 0029929A 016A036A 505200F2 ·.RPj.j...)..á^.&..&.W.á^=&..*.& 000040
 FF0E76FF 01009789 2600FE87 8926FC5E C406578B 2604478B 26085EC4 00FC9789 ..=.á^.&.G.&.W.á^=&..±.&.....v.. 000060
 C95F5E1F 0000E900 00B80000 28EE9A01 6A036A50 5200F205 FE568BFC 468B0C76 v..F=.V±.·.RPj.j..Ÿ(..¡..Õ...^_è 000080
 FF000029 2F9A5016 FC468D0C 76FF0E76 FFD88E29 1FB81E56 57000004 C8000ECA ò..à...WV.¡.).Ä.v..v..F=.P./)... 0000A0
 6A0C76FF 0E76FF00 0029499A 016A036A 505200F2 05FE5688 FC468B0C 76FF0E76 v..v..F=.V±.·.RPj.j..I)...v..v.j 0000C0
 FC468B0C 76FF0E76 FF000027 E19A1076 FF1276FF 0C76FF0E 76FF0000 28D49A01 ..å(...v..v..v..v..Ä'...v..v..F= 0000E0
 3E020300 340ECAC9 5F5E1F00 00E90000 B80000FF FF9A026A 505200F2 05FE5688 .V±.·.RPj......¡..Õ...^_èò.4...> 000100
 C4000200 00000328 52000203 BC000929 F3020301 5C00050E A3020304 9B000027 '......È...\...µ)..¥...Ř(......á 000120
 3E020301 E6000601 B7020300 00000527 B6000200 B800010F 89010300 00000427 '..............Ñ'......ñ...Ì...> 000140
 66000507 00000500 DF000500 F7000527 79020300 0B000200 54020301 7000050F ...p...T.......y'..%...Õ.......f 000160
 D0020302 F7000608 A0020301 7C00050E BA020303 DA000900 43020315 01000500 .......C...Ö...¤...|.......¼...Å 000180
 0B020300 00000B29 AB000227 8B000500 BF000500 00000A16 41000201 F8000627 '..½...A.......€....'..")....... 0001A0
 12000502 86000629 D5020303 0600061F FF020302 03000615 D7020302 7C00062A *..|...■................f)....... 0001C0
 B8020302 91000616 9F020328 1D000500 8C000501 0F000514 AF020329 17000501 ....)..€............(..........£ 0001E0
```

Dump of file SATURN:[PCCOMMON.DUMP.DLL]SA-DGFD.DLL;1 on 18-APR-1990 10:50:15.11
File ID (447,10,0) End of file block 66 / Allocated 68

Virtual block number 50 (00000032), 512 (0200) bytes

```
 D0020300 38000300 A8020303 FE000A14 2F020329 A3000501 25000503 12000629 )......%...È)../...±...´...Ͻ  .ƒ 000000
 BA020308 35000500 79000503 23000629 E2020302 A3000620 FC020301 2900050E ...)...■ ..È...ã)..#...y...5...¤ 000020
 F2000504 0B000A14 7F020300 43000328 0C020304 3B000500 40000501 AE000515 ...Û...ª...;....(..C...........· 000040
 AC020301 BE000516 16020308 46000500 53000504 7C000C27 F2020300 BC000500 ...¥....'..|...S...F.......ƒ...¯ 000060
 AC000503 A2000900 30020304 19000A0F 9F020304 87000C27 03020302 B7000620  ..ñ....'..............0...Å...¯ 000080
 00000002 CE00061F DB020303 B0000929 06020304 25000A13 ED020318 CF000500 ...ü...Û...%....)..¯...Ü...ö.... 0000A0
 26F65EC4 0000FFFF 9A5016F6 46800676 FF0876FF D88EFFFF B81E5657 000260C8 à'..WV.¡...Ä.v..v..F-.P.....á^-& 0000C0
 F0978926 00EE8789 26FC5688 FA4688F6 5EC40000 FFFF9A50 16FA468D 00D287FF .ñ@..F*.P.....á^-.F*.V=&..Ÿ.&..Þ 0000E0
 EA68FDEE B6FFFDF0 B6FFFDF0 9689FDEE 868900C4 97882600 C2878B26 F65EC400 .á^-&..ô.&..á...Ÿ»..Þ».ÑÞ».ÑŸ»hõ 000100
 0036FF26 0094068E 006A006A 0040E903 7500FDEC BE83FDEC 86890000 FFFF9A03 ........Š».ƒŠ».u.Õª.j.j.....&.6. 000120
 5016FDF2 8680016A 006A016A 006A0000 FFFF9A50 16FDF286 8D010068 03EB6800 .hŠ.h....·».P.....j.j.j.j....·».P 000140
 26F65EC4 FDEEB6FF FDF0B6FF 0106E9FD EC868800 00FFFF9A 206A006A 006A006A j.j.j.j .......Š»Õ...ÑÞ».ÑŸ»á^-& 000160
 0013E903 7500030D FDEC8689 0000FFFF 9AFA76FF FC76FF00 98B7FF26 009AB7FF .ñ..&.ñ...v=.v*.......Š»=..u.Õ.. 000180
 FF9A5016 FE468DFA 76FFFC76 FF00C7E9 0001B800 00FFFF9A FDEEB6FF FDF0B6FF .Ñþ».ÑŸ».....¡..Õú..v=.v*.F±.P.. 0001A0
 9A0112B7 FF260114 87FF26F6 5EC40676 FF0876FF 00A8E903 7400FE7E 830000FF ....~±.t.Õ´..v..v.á^-&.ñ..&.ñ... 0001C0
 5016F246 8DFA76FF FC76FF00 00FFFF9A 01006850 16FEF286 8D03EC68 0000FFFF ....hŠ...·±.Ph........v=.v*.F·.P 0001E0
```

Dump of file SATURN:[PCCOMMON.DUMP.DLL]SA-DGFD.DLL;1 on 18-APR-1990 10:50:15.11
File ID (447,10,0)   End of file block 66 / Allocated 68

Virtual block number 51 (00000033), 512 (0200) bytes

```
FDEEB6FF FDF0B6FF 0062E9FD EC868800 07E90375 000030FD EC868900 00FFFF9A .......$»=..u.Õ....$»Õb..Rb».RY» 000000
880007E9 03750000 30FDEC86 890000FF FF9A5016 FDA08680 016AF276 FFF476FF .v¶.v·j....».P.......$»=..u.Õ... 000020
87FF26F6 5EC408C4 83FFFF00 009A5016 FEF28680 5016FDA0 868D0034 E9FDEC86 .$»Õ4....».P..·±.P......6.6^-&.ñ 000040
04CAC95F 5E1F0000 E90000B8 0000FFFF 9A006A00 6A5016FE F28680 1D B16800CA ò.hÿ...·±.Pj.j......|..Õ...^_èò. 000060
00080002 0000000A 01950002 009D0001 008E0103 00880001 00A90103 000F9000 ......`......................... 000080
00E90203 03F3000A 002A0203 03120006 00180203 010F0005 016F0203 0000000B ......o.......-.......*...µ...Õ. 0000A0
01310203 040B000A 01410203 00430003 01800203 038F0008 00000203 01980005 ......Å.......¯...C...A...-...1. 0000C0
00000000 03800009 01200203 0425000A 00FF0203 0487000C 00620203 047C000C ..|...b...........X... ...¯..... 0000E0
FC46C7F8 5689F646 89085788 26064788 260A5EC4 D88EFFFF 881E5657 00000AC8 à...WV.|...Äé^.&.G.&.W..F-.V¼úF• 000100
260277FF 26F65EC4 0676FF08 76FF0095 E90375F8 460BF646 880000FE 46C70001 ..úF±...F-.F¼u.Õ...v..v.6^-&.w.& 000120
0060E9FA 46880006 E9037500 FA7E83FA 46890000 FFFF9A50 16FC468D 096A37FF .7j..F•.P......F'.-'.u.Õ...F'Õm. 000140
5EC4271F 680676FF 0876FF50 52005005 F85688F6 4688216A 005047C6 26F65EC4 6^-&6GP.j|.F-.V½.P.RP.v..v.h.'6^ 000160
0876FF50 52009505 F85688F6 468812C4 830000FF FF9A006A 37FF2602 77FF26F6 -&.w.&.7j.......6..F-.V½...RP.v. 000180
46897757 88267547 8826F65E C400FE56 8301FC46 8308C483 FFFF0000 9A0676FF .v.......6..F•..V±.6^-&.Gu&.Ww.F 0001A0
76FFD88E 0008881E 56570000 0CC8CBC9 5F5E1F00 00E90000 88FF60E9 F85689F6 -.V½Õ'.|..Õ...^_èùà...WV.|...Ä.v 0001C0
5689F846 8900C497 882600C2 878826FC 5EC40000 FFFF9A50 16FC468D 0676FF08 ..v..F•.P.....6^•&..ô.&..6..F½.V 0001E0
```

Dump of file SATURN:[PCCOMMON.DUMP.DLL]SA-DGFD.DLL;1 on 18-APR-1990 10:50:15.11
File ID (447,10,0)   End of file block 66 / Allocated 68

Virtual block number 52 (00000034), 512 (0200) bytes

```
FFFF9A03 F068F876 FFFA76FF F65689F4 4689000C 97882600 DA878826 FC5EC4FA •6^•&..Ö.&..É..F¶.V-.v'.V½hb.... 000000
76FFFA76 FF08C483 00A60000 9AF876FF FA76FF50 52009505 F65688F4 46880000 ...F¶.V-...RP.v'.v½...1..6..v'.v 000020
08C80004 CAC95F5E 1F0000E9 00008800 00FFFF9A 0676FF08 76FF0000 FFFF9AF8 ½......v..v......|..Õ...^_èò..à. 000040
878826FC 5EC40000 00EA9A50 16FC468D 0676FF08 76FFD88E 000A881E 56570000 ..WV.|Õ..Ä.v..v..F•.P.ô..6^•&.. 000060
5688FC46 88000001 1E9A03F0 68F876FF FA76FFFA 5689F846 8900C497 882600C2 ô.&..6..F½.V'.v'.V½hb......F•.V 000080
FF000001 429AF876 FFFA76FF 08C48301 3600009A F876FFFA 76FF5052 009C05FE ±...RP.v'.v½...6..6..v'.v½.B.... 0000A0
00000088 02030008 900004CA C95F5E1F 0000E900 00880000 01409A06 76FF0876 v..v..M...|..Õ...^_èò........... 0000C0
00080166 000201F8 000601C6 020300F7 000501B8 02030000 000701AF 00020498 ....€.......£...¥..ó...½...f... 0000E0
00000000 00000487 000C0197 0203011D 0005004A 02030312 00060176 02030000 ....v.......J................... 000100
000088FA 5689F846 89085788 26064788 260E5EC4 D88EFFFF 881E5657 000008C8 à...WV.|...Äé^.&.G.&.W..F½.V'|.. 000120
E9037407 39260C56 880A4688 F85EC400 6FE90375 FA460BF8 4688FC46 89FE4689 .F±.F•.F½.F'u.Õo.6^½.F..V.&? t.Õ 000140
FA5688F8 4688001B E9FE5689 FC4689FA 5688F846 88000FE9 03740257 39260018 ..&9W.t.Õ...F½.V'.F•.V±Õ...F½.V' 000160
0014E903 74FE4608 FC4688FF FF00009A 5016FC46 8D0A76FF 0C76FF50 52009505 ...RP.v..v..F•.P......F•.F±t.Õ.. 000180
FF86E9F8 4689FA46 89000088 0009E9FA 5689F846 89775788 26754788 26F85EC4 6^½&.Gu&.Ww.F½.V'Õ..|...F'.F½Õ.. 0001A0
0006C800 0CCAC95F 5E1F0000 E9000088 02578926 078926FE 5688FC46 88065EC4 6^..F•.V±&..&.W.|..Õ...^_èò..à.. 0001C0
0C76FF50 52009C05 08568806 4688FC46 89FE4689 00008808 8E000888 1E565700 .WV.|...Ä|...F±.F•.F..V....RP.v. 0001E0
```

Dump of file SATURN:[PCCOMMON.DUMP.DLL]SA-DGFD.DLL;1 on 18-APR-1990 10:50:15.11
File ID (447,10,0)   End of file block 66 / Allocated 68

Virtual block number 53 (00000035), 512 (0200) bytes

```
892600E0 878926FE 5688FC46 88065EC4 FA468900 7300009A 5016FC46 8D0A76FF .v..F•.P...s..F'6^..F•.V±&..Å.&. 000000
FF0876FF 088E00C5 881E5657 00001AC8 0008CAC9 5F5E1F00 00E9FA46 8800E297 .&..F'Õ...^_èò..à...WV.|é..Ä.v.. 000020
F2468900 E8008D9A FC76FFFE 76FF0E76 FF1076FF 0000FFFF 9A5016FC 46800676 v..F•.P.......v..v..v±.v•.§.Š..F· 000040
0006E903 7500E287 082600E0 878826FC 5EC4031C E9F24688 0006E903 7500030D =..u.Õ...F·Õ..6^=&..Å.&..ã.u.Õ.. 000060
0375009A 97392600 0AE90374 00988739 26145688 124688FC 5EC40304 E90000B8 |..Õ..6^=.F..V.&9...t.Õ..&9...u. 000080
30F24689 08C483FF FF086A9A FC76FFFE 76FF5016 F4468002 E1E90000 B80006E9 Õ..|..ÕÄ..F¶.P.v±.v•.j....6..F·= 0000A0
0C76FF02 57892607 89261056 880E4688 F45EC402 8DE9F246 880006E9 03750000 ..u.Õ...F·Õ§.6^¶.F..V.&..&.W..v. 0000C0
003DF246 89000002 069A5052 000405F6 5688F446 88016A0E 76FF1076 FF0A76FF .v..v..v.j..F¶.V-...RP......F·=. 0000E0
F65688F4 4688096A 0E76FF10 76FF0A76 FF0C76FF 027EE9F2 46880006 E9037500 .u.Õ...F·Õ-..v..v..v..v.j..F¶.V- 000100
76FF0C76 FF024FE9 F2468800 06E90375 000030F2 46890000 FFFF9A50 52005005 .P.RP......F·=..u.Õ...F·ÕÕ..v..v 000120
D3E90374 E84608E6 4688F246 890000FF FF9A5016 E6468004 6A0E76FF 1076FF0A ..v..v.j..F|.P......F·.F|.FÕt.Õ€ 000140
0076E903 75084708 26064788 26F85EC4 FA5689F8 4689009C 05FE5688 FC468800 ..F•.V±....F½.V'6^½&.G.&.G.u.Õv. 000160
14E90375 77470826 75478826 EA5EC4EC 5689EA46 89085788 26064788 26F85EC4 6^½&.G.&.W..Fõ.V$6^õ&.Gu&.Gwu.Õ. 000180
8926F656 88F44688 EA5EC4FF DCE9EC56 89EA4689 77578826 75478826 EA5EC400 .6^õ&.Gu&.Ww.Fõ.V$ÕÉ.6^õ.F¶.V-&. 0001A0
47892600 0088F45E C4785789 26794789 26EC5688 EA4688F4 5EC47757 89267547 Gu&.Ww6^¶.Fõ.V$&.Gy&.W(6^¶|..&.G 0001C0
26F65688 F44688F8 5EC40038 E9754789 26774789 26000088 F45EC471 47892673 s&.Gq6^¶|..&.Gw&.GuÕ;.6^½.F¶.V-& 0001E0
```

```
Dump of file SATURN:[PCCOMMON.DUMP.DLL]SA-DGFD.DLL;1 on 18-APR-1990 10:50:15.11
File ID (447,10,0)   End of file block 66 / Allocated 68

Virtual block number 54 (00000036), 512 (0200) bytes

 26734789 26000088 F45EC479 4789267B 47892600 0088F45E C4085789 26064789 .G.&.W.á^¶¡..&.G(&.Gyá^¶¡..&.Gs& 000000
 FC76FFFE 76FFE676 FFE876FF 0110E975 47892677 47892600 0088F45E C4714789 .Gqá^¶¡..&.Gw&.GuÕ...vÒ.v|.v±.v= 000020
 8B2600E0 878B26FC 5EC40134 E9F2468B 0006E903 7500003D F2468901 38008D9A .§.;..F·=..u.Õ...F·Ö4.á^=&. \.&. 000040
 2606478B 26F85EC4 FA5689F8 46890095 05EC568B EA468BEC 5689EA46 8900E297 .ã..Fõ.Vš.Fõ.Vš....F½.V'á^½&.^ & 000060
 75478B26 EA5EC4EC 5689EA46 8908578B 2606478B 26F85EC4 007EE903 7508470B .G.u.Õ-.á^½&.G.&.W..Fõ.Všá^õ&.Gu 000080
 EA5EC4FF DCE9EC56 89EA4689 77578B26 75478B26 EA5EC400 14E90375 77470B26 &.Gwu.Õ..á^õ&.Gu&.Ww.Fõ.VšÕÉ.á^õ 0000A0
 C47B5789 26794789 26EC568B EA468BF4 5EC47757 89267547 8926F656 8BF4468B .F¶.V-&.Gu&.Wwá^¶.Fõ.Vš&.Gy&.W(á 0000C0
 26774789 26000088 F45EC473 57892671 478926F4 5EC47357 8B267147 8B26EA5E ^õ&.Gq&.Wsá^¶&.Gq&.Wsá^¶¡..&.Gw& 0000E0
 47892600 0088F45E C4085789 26064789 26F6568B F4468BF8 5EC4003E E9754789 .GuÕ>.á^½.F¶.V-&.G.&.W.á^¶¡..&.G 000100
 77478926 000088F4 5EC47357 89267147 8926EC56 8BEA468B F45EC479 4789267B (&.Gyá^¶.Fõ.Vš&.Gq&.Wsá^¶¡..&.Gw 000120
 0088EE5E C4000107 C726EE5E C4F05689 EE468900 9505F656 8BF4468B 75478926 &.Gu.F¶.V-....FŸ.Vbá^Ÿ&ú...á^Ÿ¡. 000140
 87C726FC 5EC40C57 89260A47 8926F656 8BF4468B EE5EC406 47892608 47892600 .&.G.&.G.á^Ÿ.F¶.V-&.G.&.W.á^=&ú. 000160
 76FF0876 FFD88E01 18B81E56 57000026 C8C8C95F 5E1F0000 E90000B8 000100E6 |...|..Õ...^_èùà&..WV.¡...Ä.v..v 000180
 3926000A E9037400 98873926 14568812 468BF45E C4000001 289A5016 F4468D06 ..F¶.P.(...á^¶.F..V.&9...t.Õ..&9 0001A0
 89032300 BD9AF476 FFF676FF 0E76FF10 76FF035A E90000B8 0006E903 75009A97 ...u.Õ..|..ÕZ..v..v..v-.v¶.§.#.. 0001C0
 000A8789 26000C87 89260000 8BF45EC4 0338E90E 46880006 E9037500 0030DE46 F8=..u.Õ...FãÕ8.á^¶¡..&..É.&..Ö. 0001E0

Dump of file SATURN:[PCCOMMON.DUMP.DLL]SA-DGFD.DLL;1 on 18-APR-1990 10:50:15.11
File ID (447,10,0)   End of file block 66 / Allocated 68

Virtual block number 55 (00000037), 512 (0200) bytes

 8900E297 8B2600E0 878B26F4 5EC40310 E9037500 E2870B26 00E0878B 26F45EC4 á^¶&..Å.&..ã.u.Õ..á^¶&..Å.&..ã.. 000000
 7508470B 2606478B 26EC5EC4 EE5689EC 46890095 05FE568B FC468BFE 5689FC46 F=.V±.F=.V±....Fš.VŸá^š&.G.&.G.u 000020
 7B578B26 79478B26 FC5EC4FA 5689F846 8908578B 2606478B 26EC5EC4 01F3E903 .Õµ.á^š&.G.&.W..F½.V'á^=&.Gy&.W( 000040
 8B267147 8B26FC5E C4DC5689 DA468977 57882675 478B26FC 5EC4E256 89E04689 .FÅ.Vãá^=&.Gu&.Ww.FÖ.VÉá^=&.Gq&. 000060
 75478926 DC568BDA 468BE05E C40014E9 0375E246 0BE0468B EA5689E8 46897357 Ws.FÒ.Võ.FÅ.Fãu.Õ..á^Å.FÖ.VÉ&.Gu 000080
 009B8789 260C568B DA468BE8 5EC40016 E90375EA 460BE846 8B0034E9 77578926 &.WwÕ4..FÒ.Fõu.Õ..á^Ò.FÖ.VÉ&.... 0000A0
 460BDA46 8B00A497 892600A2 878926DC 568BDA46 8BF45EC4 0013E900 90978926 &....Õ..á^¶.FÖ.VÉ&..Å.&..É..FÖ.F 0000C0
 E90375EA 460BE846 8B7B5789 26794789 26E2568B E0468BDA 5EC40011 E90375DC Éu.Õ..á^Ò.FÅ.Vã&.Gy&.W(.FÒ.Fõu.Õ 0000E0
 0027E903 75F2460B F0468BF2 5689F046 89009D97 8B26009B 878B26E8 5EC4005B [.á^Õ&....&.....Fþ.V·.Fþ.F·u.Õ'. 000100
 5689F046 89775788 26754788 26F05EC4 0014E903 7577470B 26754788 26F05EC4 á^þ&.Gu&.Gwu.Õ..á^þ&.Gu&.Ww.Fþ.V 000120
 F45EC400 58E90090 97892600 98878926 FA568BF8 468BE85E C40013E9 FFDCE9F2 ·ÕÉ.Õ..á^Õ.F½.V'&....&....ÕX.á^¶ 000140
 8B26F05E C40027E9 0375F246 0BF0468B F25689F0 468900A4 978B2600 A2878B26 &..Å.&..É..Fþ.V·.Fþ.F·u.Õ'.á^þ&. 000160
 E9FFDCE9 F25689F0 46897757 8B267547 8B26F05E C40014E9 03757747 0B267547 Gu&.Gwu.Õ..á^þ&.Gu&.Ww.Fþ.V·ÕÉ.Õ 000180
 0011E903 75F2460B F0468B00 A4978926 00A28789 26FA568B F8468BF4 5EC40013 ..á^¶.F½.V'&..Å.&..É..Fþ.F·u.Õ.. 0001A0
 89267947 8926F256 8BF0468B F85EC477 57892675 478926FA 568BF846 8BF05EC4 á^þ.F½.V'&.Gu&.Wwá^½.Fþ.V·&.Gy&. 0001C0
 C4DC5689 DA4689FA 568BF846 8B735789 26714789 26EA568B E8468BF8 5EC47B57 W(á^½.FÒ.Võ&.Gq&.Ws.F½.V'.FÖ.VÉá 0001E0

Dump of file SATURN:[PCCOMMON.DUMP.DLL]SA-DGFD.DLL;1 on 18-APR-1990 10:50:15.11
File ID (447,10,0)   End of file block 66 / Allocated 68

Virtual block number 56 (00000038), 512 (0200) bytes

 DC5689DA 46897757 8B267547 8B26DA5E C40025E9 03757747 0B267547 8B26DA5E ^Ö&.Gu&.Gwu.Õ%.á^Ö&.Gu&.Ww.FÖ.VÉ 000000
 0B267947 8B26FC5E C400CDE9 FFC8E973 57892671 478926EA 568BE846 8BDA5EC4 á^Ö.FÒ.Võ&.Gq&.WsÕù.Õë.á^=&.Gy&. 000020
 2675478B 26FC5EC4 E25689E0 46897B57 8B267947 8B26FC5E C40052E9 03757B47 G(u.ÕR.á^=&.Gy&.W(.FÅ.Vãá^=&.Gu& 000040
 DC460BDA 46887757 89267547 8926DC56 8BDA468B E05EC4DC 5689DA46 8977578B .Ww.FÖ.VÉá^Å.FÖ.VÉ&.Gu&.Ww.FÖ.FÉ 000060
 75478B26 FC5EC400 68E97B57 89267947 8926E256 8BE0468B DA5EC400 11E90375 u.Õ..á^Ö.FÅ.Vã&.Gy&.W(Õk.á^=&.Gu 000080
 E90375D0 0BEA5689 E8468973 57882671 478B26FC 5EC4DC56 89DA4689 77578B26 &.Ww.FÖ.VÉá^=&.Gq&.Ws.FÒ.Võ.Åu.Õ 0000A0
 568BDA46 8BF45EC4 0013E900 90978926 00988789 260C568B DA468BE8 5EC40016 ..á^Ò.FÖ.VÉ&....&....Õ..á^¶.FÖ.V 0000C0
 78478926 00008BDA 5EC4000E E90375DC 460BDA46 8B00A497 892600A2 8789260C É&..Å.&..É..FÖ.FÉu.Õ..á^Õ¡..&.G( 0000E0
 00E687C7 26F45EC4 08C48301 9709869A F476FFF6 76FFFC76 FFFE76FF 79478926 &.Gy.v±.v=.v-.v¶......á.á^¶&ú.Ì. 000100
 800676FF 0876FFD8 8E0477B8 1E565700 0014C8C8 C95F5E1F 0000E900 00B80001 ..¡..Õ...^_èùà...WV.|w..Ä.v..v.. 000120
 00022F9A 5016FC46 8D106A0E 76FF1076 FF0A76FF 0C76FF00 0004879A 5016F446 F¶.P......v̄..v..v..v.j..F=.P./.. 000140
 00B80006 E9037500 9A973926 000AE903 74009B87 3926FE56 8BFC468B F45EC400 .á^¶.F=.V±&9...t.Õ..&9...u.Õ..|. 000160
 06E90374 009A9739 260010E9 03740098 87392614 56881246 8BF45EC4 0274E900 .Õt.á^¶.F..V.&9...t.Õ..&9...t.Õ. 000180
 001FE903 7500003D 08E1008D 9AF476FF F676FF0E 76FF1076 FF0251E9 00008800 .|..Õq..v..v..v-.v¶.§.Ä.=..u.Õ.. 0001A0
 C40219E9 0001B800 0009009A 0A76FF0C 76FF0008 E9037500 00E88F83 26F45EC4 á^¶&.«Ò..u.Õ...v..v......|..Õ..á 0001C0
 BD9AF476 FFF676FF 1276FF14 76FFFA56 89F84689 00E2978B 2600E087 8B26F45E ^¶&..Å.&..ã..F½.V'.v..v..v-.v¶.§ 0001E0
```

```
Dump of file SATURN:[PCCOMMON.DUMP.DLL]SA-DGFD.DLL;1 on 18-APR-1990 10:50:15.11
File ID (447,10,0)   End of file block 66 / Allocated 68

Virtual block number 57 (00000039), 512 (0200) bytes

 9A0A76FF 0C76FF00 0BE90375 0000E8BF 8326F45E C4001FE9 03750000 3D04BD00 .§.=..u.Ö..á^¶&.¢Ò..u.Ö...v..v.. 000000
 F85EC4F2 5689F046 8900E297 882600E0 878826F4 5EC401CE E9000188 0000FFFF ....¡..Öö.á^¶&..Å.&..ã..Fÿ.V·á^½ 000020
 26795FC4 26F85EC4 77578826 75478826 F85EC400 47E90375 78470826 79478826 &.Gy&.G(u.ÖG.á^½&.Gu&.Wwá^½&á_y& 000040
 88267947 8826F85E C4001AE9 03757747 08267547 8826F85E C4775789 26754789 .Gu&.Wwá^½&.Gu&.Gwu.Ö..á^½&.Gy&. 000060
 75734708 26714788 26F85EC4 0087E97B 57892679 47892675 5FC426F8 5EC47857 W(á^½&á_u&.Gy&.W(Ö..á^½&.Gq&.Gsu 000080
 26F85EC4 00909789 26009887 8926F05E C4775788 26754788 26F85EC4 003DE903 .Ö=.á^½&.Gu&.Wwá^Þ&....&....á^½& 0000A0
 3AE97947 89267847 89260000 88755FC4 26F85EC4 0012E903 7577470B 26754788 .Gu&.Gwu.Ö..á^½&á_u¦..&.G(&.GyÖ: 0000C0
 75478826 F85EC400 A4978926 00A28789 26F45EC4 77578826 75478826 F85EC400 .á^½&.Gu&.Wwá^¶&.¯Å.&..Ê.á^½&.Gu 0000E0
 8826F05E C4794789 26784789 26000088 755FC426 F85EC400 12E90375 77470826 &.Gwu.Ö..á^½&á_u¦..&.G(&.Gyá^Þ&. 000100
 EE5689EC 46890090 97882600 98878826 F05EC400 78E90375 0090870B 26009887 ...&....u.Ö(.á^Þ&....&.....F&.VŸ 000120
 5689EC46 89775788 26754788 26EC5EC4 0014E903 7577470B 26754788 26EC5EC4 á^$&.Gu&.Gwu.Ö..á^$&.Gu&.Ww.F&.V 000140
 8926EE56 88EC4688 F85EC477 57892675 478926FA 568BF846 88EC5EC4 FFDCE9EE ŸÖÉ.á^&.F½.V*&.Gu&.Wwá^½.F&.VŸ&. 000160
 478926F2 5688F046 88F85EC4 75478926 77478926 000088F8 5EC47857 89267947 Gy&.W(á^½¦..&.Gw&.Guá^½.FÞ.V·&.G 000180
 4688F85E C4009D97 8926009B 878926FA 5688F846 88F05EC4 0040E973 57892671 q&.WsÖ∂.á^Þ.F½.V*&....&....á^½.F 0001A0
 000088F8 5EC47947 89267847 89260000 88F85EC4 73578926 71478926 F25688F0 Þ.V·&.Gq&.Wsá^½¦..&.G(&.Gyá^½¦.. 0001C0
 0000C8CB C95F5E1F 0000E900 00880001 00E687C7 26F45EC4 75478926 77478926 &.Gw&.Guá^¶&ú.|...¦..Ö...^_èùà.. 0001E0

Dump of file SATURN:[PCCOMMON.DUMP.DLL]SA-DGFD.DLL;1 on 18-APR-1990 10:50:15.11
File ID (447,10,0)   End of file block 66 / Allocated 68

Virtual block number 58 (0000003A), 512 (0200) bytes

 D88E0AE5 881E5657 000028C8 CBC95F5E 1F0000E9 000088D8 8E0815B8 1E565700 .WV.¦...Ä¦..Ö...^_èùà(..WV.¦Ì..Ä 000000
 08259A50 16FC468D 0676FF08 76FFF846 89FA4689 000088D8 46890A46 89000088 ¦...FÖ.FÄ¦...F*.F½.v..v..F•.P.%. 000020
 BD9AFC76 FFFE76FF 0E76FF10 76FF00E0 87892600 E2878926 000088FC 5EC40000 ..á^•¦..&..ã.&..Å..v..v..v±.v•.§ 000040
 9A0A76FF 0C76FF00 08E90375 0000E88F 8326FC5E C4001FE9 03750000 30089C00 ...=..u.Ö..á^•&.¢Ò..u.Ö...v..v.. 000060
 FC5EC4DA 56890846 8900E297 882600E0 878826FC 5EC404C4 E9000088 00000888 £...¦..Öó.á^•&..Å.&..ã..FÄ.VÖá^• 000080
 003D0896 00BD9AFC 76FFFE76 FF1276FF 1476FF00 E0878926 00E28789 26000088 ¦..&..ã.&..Å..v..v..v±.v•.§...=. 0000A0
 B800000C 669A0A76 FF0C76FF 0008E903 750000E8 BF8326FC 5EC4001F E9037500 .u.Ö..á^•&.¢Ò..u.Ö...v..v..f...¦ 0000C0
 0375DA46 08D8468B FA5689F8 468900E2 97882600 E0878826 FC5EC404 69E90000 ..Öi.á^•&..Å.&..ã..F½.V*.FÄ.FÖu. 0000E0
 5EC40027 E903757B 47082679 47882608 5EC4043A E90375FA 460BF846 880445E9 ÖE..F½.F*u.Ö:.á^Ä&.Gy&.G(u.Ö'.á^ 000100
 E9000088 0009E903 74025739 260012E9 03740739 2614568B 12468879 5FC42608 Ä&á_y.F..V.&9.t.Ö..&9W.t.Ö..¦..Ö 000120
 FFFF9A00 6A0E76FF 1076FF27 14680A76 FF0C76FF 106A5016 E0468D04 03E9040C ..Ö¯...FÅ.Pj..v..v.h.'.v..v.j.... 000140
 FF0008E9 03750000 E88F8326 FC5EC400 1FE90375 00E47E83 E4468912 C4830000 ...á..Fö.-ö.u.Ö..á^•&.¢Ò..u.Ö... 000160
 002EE903 7577470B 26754788 26D85EC4 038EE900 00880000 08B59A0A 76FF0C76 v..v..ç...¦..Öf.á^Ä&.Gu&.Gwu.Ö.. 000180
 46C70008 E9037502 57392600 09E90374 073926E2 5688E046 88755FC4 26D85EC4 á^Ä&á_u.FÅ.Vã&9.t.Ö..&9W.u.Ö..úF 0001A0
 05E90001 EE46C700 08E90375 E2460BE0 46880018 E90000EE 46C70005 E90001EE Ÿ..Ö.¯úFŸ..Ö...FÅ.Fãu.Ö..úFŸ..Ö. 0001C0
 E85689E6 46897857 88267947 8826085E C4012AE9 037500EE 7E830000 EE46C700 .úFŸ...~Ÿ.u.Ö*.á^Ä&.Gy&.W(.FÌ.VÒ 0001E0

Dump of file SATURN:[PCCOMMON.DUMP.DLL]SA-DGFD.DLL;1 on 18-APR-1990 10:50:15.11
File ID (447,10,0)   End of file block 66 / Allocated 68

Virtual block number 59 (0000003B), 512 (0200) bytes

 88E65EC4 0014E903 75E8460B E64688DE 56890C46 8977578B 26754788 26D85EC4 á^Ä&.Gu&.Ww.FÉ.V8.FÌ.FÒu.Ö..á^Ì. 000000
 5689F046 89735788 26714788 26D85EC4 004AE977 57892675 4789260E 5688DC46 FÉ.V8&.Gu&.WwÖJ.á^Ä&.Gq&.Ws.FÞ.V 000020
 FE5688FC 4688000F E9F65689 F4468900 9505F256 88F04688 0012E903 75D008F2 ·.Åu.Ö...FÞ.V·....F¶.V-Ö...F•.V± 000040
 DE460BDC 46880857 89260647 89260E56 880C4688 F45EC4F6 5689F446 89009C05 ....F¶.V-á^¶.FÉ.V8&.G.&.W..FÉ.F8 000060
 57882675 478826F8 5EC47857 89267947 8926E856 88E6468B DC5EC400 11E90375 u.Ö..á^É.FÌ.VÒ&.Gy&.W(á^½&.Gu&.W 000080
 5688F846 88085EC4 77578926 75478926 DA5688D8 4688F85E C4DE5689 DC468977 w.FÉ.V8á^½.FÄ.VÖ&.Gu&.Wwá^Ä.F½.V 0000A0
 DE460BDC 46887757 89267547 8926DE56 88DC4688 D85EC478 57892679 478926FA *&.Gy&.W(á^Ä.FÉ.V8&.Gu&.Ww.FÉ.F8 0000C0
 57882671 478826F8 5EC47857 89267947 89260A56 88084688 DC5EC400 11E90375 u.Ö..á^É.FÄ.VÖ&.Gy&.W(á^½&.Gq&.W 0000E0
 1C6A5016 EA468D02 2FE90001 00E687C7 26FC5EC4 73578926 71478926 D85EC473 sá^Ä&.Gq&.Wsá^•&ú.Ì...Ö/..Fö.Pj. 000100
 00E47E83 E4468912 C4830000 0C3E9A00 6A1276FF 1476FF27 14680A76 FF0C76FF .v..v.h.'.v..v.j..>....á..Fö.~ö. 000120
 01B80000 08609A0A 76FF0C76 FF0008E9 03750000 E88F8326 FC5EC400 1FE90375 u.Ö..á^•&.¢Ò..u.Ö...v..v..'...¦. 000140
 5688EA46 88795FC4 26F85EC4 002EE903 757B470B 2679478B 26F85EC4 01EAE900 .Öõ.á^½&.Gy&.G(u.Ö..á^½&á_y.Fö.V 000160
 E90000EE 46C70005 E90001EE 46C70008 E9037502 57392600 09E90374 073926EC $&9.t.Ö..&9W.u.Ö..úFŸ..Ö.¯úFŸ..Ö 000180
 037500EE 7E830000 EE46C700 05E90001 EE46C700 08E90375 EC460BEA 46880018 ...Fõ.F$u.Ö..úFŸ..Ö..úFŸ...~Ÿ.u. 0001A0
 8977578B 26754788 26F85EC4 E85689E6 46897857 88267947 8826F85E C40185E9 Ö..á^½&.Gy&.W(.FÌ.VÒá^½&.Gu&.Ww. 0001C0
 57892675 4789260E 5688DC46 88E65EC4 0014E903 75E8460B E64688DE 56890C46 FÉ.V8.FÌ.FÒu.Ö..á^Ì.FÉ.V8&.Gu&.W 0001E0
```

Dump of file SATURN:[PCCOMMON.DUMP.DLL]SA-DGFD.DLL;1 on 18-APR-1990 10:50:15.11
File ID (447,10,0)   End of file block 66 / Allocated 68

Virtual block number 60 (0000003C), 512 (0200) bytes

```
8BF0468B 0012E903 75000BF2 5689F046 8973578B 2671478B 26085EC4 004AE977 wÕJ.á^Ä&.Gq&.Ws.Fþ.V·.Åu.Õ...Fþ. 000000
F45EC4F6 5689F446 89009C05 FE568BFC 468B000F E9F65689 F4468900 9505F256 V·....F¶.V-Õ...F•.V±....F¶.V-á^¶ 000020
8BE6468B DC5EC400 11E90375 DE460BDC 468B0857 89260647 89260E56 8B0C468B .FÉ.VR&.G.&.W..FÉ.FRu.Õ..á^É.F|. 000040
460BE646 8BE85689 E646897B 578B2679 478B26D8 5EC47B57 89267947 8926E856 VÒ&.Gy&.W(á^Ä&.Gy&.W(.F|.VÒ.F|.F 000060
478B26D8 5EC4005B E9775789 26754789 26FA568B F8468BE6 5EC40014 E90375E8 Òu.Õ..á^|.F½.V•&.Gu&.WwÕ[.á^Ä&.G 000080
5689F446 89009505 F2568BF0 468B0023 E90375D0 0BF25689 F0468973 578B2671 q&.Ws.Fþ.V·.Åu.Õ#..Fþ.V·....F¶.V 0000A0
4689009C 05FE568B FC468B00 20E90857 89260647 8926FA56 8BF8468B F45EC4F6 -á^¶.F½.V•&.G.&.W.Õ ..F•.V±....F 0000C0
8926E856 8BE6468B F85EC408 57892606 478926FA 568BF846 8BF45EC4 F65689F4 ¶.V-á^¶.F½.V•&.G.&.W.á^½.F|.VÒ&. 0000E0
FA568BF8 468BD85E C4775789 26754789 260A568B D8468BF8 5EC47B57 89267947 Gy&.W(á^½.FÄ.VÖ&.Gu&.Wwá^Ä.F½.V• 000100
5EC47357 89267147 8926F85E C473578B 2671478B 26085EC4 7B578926 79478926 &.Gy&.W(á^Ä&.Gq&.Wsá^½&.Gq&.Wsá^ 000120
B8D8BE0A FCB81E56 57000000 C8CBC95F 5E1F0000 E90000B8 000100E6 87C726FC •&ú.|...¡..Õ...^_èùà...WV.¡•..Ä¡ 000140
B8E04689 E2468900 00B8D88E 103BB81E 56570000 20C8CBC9 5F5E1F00 00E90000 ..Õ...^_èùà ..WV¯¡;..Ä¡...Fã.FÁ¡ 000160
89260000 B8FC5EC4 0000B1E 9A5016FC 468D0676 FF0876FF F84689FA 46890000 ...F•.F½.v..v..F•.P.....á^•¡..&. 000180
1FE90375 00003D10 F200BD9A FC76FFFE 76FF0E76 FF1076FF 00E08789 2600E287 .ã.&..Å..v..v..v±.v•.§.·.=..u.Õ. 0001A0
03CCE900 00B80000 11119A0A 76FF0C76 FF000BE9 03750000 E8BF8326 FC5EC400 .á^•&.¢Ò..u.Õ...v..v......¡..Õä. 0001C0
892600E2 87892600 00B8FC5E C4E25689 E0468900 E2978B26 00E0878B 26FC5EC4 á^•&..Å.&..ã..FÅ.Vãá^•¡..&..ã.&. 0001E0
```

Dump of file SATURN:[PCCOMMON.DUMP.DLL]SA-DGFD.DLL;1 on 18-APR-1990 10:50:15.11
File ID (447,10,0)   End of file block 66 / Allocated 68

Virtual block number 61 (0000003D), 512 (0200) bytes

```
26FC5EC4 001FE903 7500003D 0B41008D 9AFC76FF FE76FF12 76FF1476 FF00E087 .Å..v..v..v±.v•.§.A.=..u.Õ..á^•& 000000
8B26FC5E C40371E9 00008800 0011BC9A 0A76FF0C 76FF0008 E9037500 00E8BF83 .¢Ò..u.Õ...v..v..¥...¡..Õq.á^•&. 000020
75FA460B F8468B03 4DE90375 E2460BE0 468BFA56 89F84689 00E2978B 2600E087 .Å.&..ã..F½.V•.FÅ.Fãu.ÕM..F½.F•u 000040
568B1246 8B755FC4 26E05EC4 0027E903 7577470B 2675478B 26E05EC4 0342E903 .ÕB.á^Ä&.Gu&.Gwu.Õ'.á^Ä&á_u.F..V 000060
5016F246 8D030BE9 0314E900 00B80009 E9037402 57392600 12E90374 07392614 .&9.t.Õ..&9W.t.Õ..¡..Õ..Õ¯..F·.P 000080
7E83EC46 8912C483 00000E12 9A006A0E 76FF1076 FF271468 0A76FF0C 76FF1C6A j..v..v.h.'.v..v.j.......á..F§.~ 0000A0
00000E3A 9A0A76FF 0C76FF00 0BE90375 0000E8BF 8326FC5E C4001FE9 037500EC §.u.Õ..á^•&.¢Ò..u.Õ...v..v..:... 0000C0
F2468B79 5FC426E0 5EC4002E E903757B 470B2679 478B26E0 5EC402C6 E90000B8 ¡..Õó.á^Ä&.Gy&.G(u.Õ..á^Ä&á_y.F· 0000E0
00F646C7 0005E900 01F646C7 0008E903 75025739 260009E9 03740739 26F4568B .V¶&9.t.Õ..&9W.u.Õ..úF-..Õ.¯úF-. 000100
00F67E83 0000F646 C70005E9 0001F646 C70008E9 0375F446 0BF2468B 0018E900 .Õ...F·.F¶u.Õ..úF-..Õ..úF-...--. 000120
578B2675 478B26E0 5EC4F056 89EE4689 7B578B26 79478B26 E05EC400 DDE90375 u.ÕŸ.á^Ä&.Gy&.W(.FŸ.Vþá^Ä&.Gu&.W 000140
26754789 26E6568B E4468BEE 5EC40011 E90375F0 460BEE46 8BE65689 E4468977 w.FÕ.V|.FŸ.Fþu.Õ..á^Ÿ.FÕ.V|&.Gu& 000160
C47B5789 26794789 26F0568B EE468BE4 5EC40011 E90375E6 460BE446 8B775789 .Ww.FÕ.F|u.Õ..á^Õ.FŸ.Vþ&.Gy&.W(á 000180
468BEE5E C40011E9 0375F046 0BEE468B F05689EE 46897B57 8B267947 8B26F85E ^½&.Gy&.W(.FŸ.Vþ.FŸ.Fþu.Õ..á^Ÿ.F 0001A0
E05EC47B 57892679 478926F0 568BEE46 8BE05EC4 77578926 75478926 E2568BE0 Å.Vã&.Gu&.Wwá^Å.FŸ.Vþ&.Gy&.W(á^Å 0001C0
C47B5789 26794789 26E2568B E0468BF8 5EC47757 89267547 8926FA56 8BF8468B .F½.V•&.Gu&.Wwá^½.FÅ.Vã&.Gy&.W(á 0001E0
```

Dump of file SATURN:[PCCOMMON.DUMP.DLL]SA-DGFD.DLL;1 on 18-APR-1990 10:50:15.11
File ID (447,10,0)   End of file block 66 / Allocated 68

Virtual block number 62 (0000003E), 512 (0200) bytes

```
E9000100 E687C726 FC5EC473 57892671 478926E0 5EC47357 8B267147 8B26F85E ^½&.Gq&.Wsá^Ä&.Gq&.Wsá^•&ú.|...Õ 000000
83000011 949A006A 1276FF14 76FF2714 680A76FF 0C76FF1C 6A5016E8 468D0184 ...FÒ.Pj..v..v.h.'.v..v.j....... 000020
FF0C76FF 000BE903 750000E8 BF8326FC 5EC4001F E9037500 EC7E83EC 468912C4 á..F§.-§.u.Õ..á^•&.¢Ò..u.Õ...v.. 000040
F85EC400 2EE90375 77470B26 75478B26 F85EC401 3FE90001 8B000010 B69A0A76 v..Ñ...¡..Õ?.á^½&.Gu&.Gwu.Õ..á^½ 000060
0001F646 C70008E9 03750257 39260009 E9037407 3926EA56 8BE8468B 755FC426 &á_u.FÒ.Võ&9.t.Õ..&9W.u.Õ..úF-.. 000080
46C70005 E90001F6 46C70008 E90375EA 460BE846 8B0018E9 0000F646 C70005E9 Õ.¯úF-..Õ...FÒ.Fõu.Õ..úF-..Õ..úF 0000A0
F85EC4F0 5689EE46 897B5788 26794788 26F85EC4 000AE903 7500F67E 830000F6 -...--.u.ÕÖ.á^½&.Gy&.W(.FŸ.Vþá^½ 0000C0
8BE4468B EE5EC400 11E90375 F0460BEE 468BE656 89E44689 77578B26 75478B26 &.Gu&.Ww.FÕ.V|.FŸ.Fþu.Õ..á^Ÿ.FÕ. 0000E0
8926F056 8BEE468B E45EC400 11E90375 E6460BE4 468B7757 89267547 8926E656 V|&.Gu&.Ww.FÕ.F|u.Õ..á^Õ.FŸ.Vþ&. 000100
FA568BF8 468BE05E C4E65689 E4468977 578B2675 478B26E0 5EC47B57 89267947 Gy&.W(á^Ä&.Gu&.Ww.FÕ.V|á^Å.F½.V• 000120
8BE4468B F85EC47B 57892679 478926E2 568BE046 8BF85EC4 77578926 75478926 &.Gu&.Wwá^½.FÅ.Vã&.Gy&.W(á^½.FÕ. 000140
8926FA56 8BF8468B E45EC400 11E90375 E6460BE4 468B7757 89267547 8926E656 V|&.Gu&.Ww.FÕ.F|u.Õ..á^Õ.F½.V•&. 000160
26FC5EC4 73578926 71478926 F85EC473 578B2671 478B26E0 5EC47B57 89267947 Gy&.W(á^Ä&.Gq&.Wsá^½&.Gq&.Wsá^•& 000180
00008B08 8E10528B 1E565700 0000C8CB C95F5E1F 0000E900 00B80001 00E687C7 ú.|...¡..Õ...^_èùà...WV.¡R..Ä¡.. 0001A0
9A5016FC 468D0676 FF0876FF D88E1499 B81E5657 000006C8 CBC95F5E 1F0000E9 Õ...^_èùà...WV¯¡...Ä.v..v..F•.P. 0001C0
3A336800 CAB7FF26 FC5EC400 54E9FA46 8B0006E9 03750000 3DFA4689 00001074 t....F•=..u.Õ...F•ÕT.á^•&.ñò.h3: 0001E0
```

```
Dump of file SATURN:[PCCOMMON.DUMP.DLL]SA-DGFD.DLL;1 on 18-APR-1990 10:50:15.11
File ID (447,10,0)   End of file block 66 / Allocated 68

Virtual block number 63 (0000003F), 512 (0200) bytes

 B7FF26FC 5EC400C2 B7FF2600 C4B7FF26 FC5EC400 00FFFF9A 006A006A 006A006A j.j.j.j......ó^=&.ñó.&.ñò.ó^=&.ñ 000000
 E687C726 FC5EC400 0001D79A 5052004C 05FE568B FC468B02 6A009887 FF26009A ..&.ñ..j..F=.V±.L.RP.=...ó^=&ú.Ì 000020
 0676FF08 76FFDB8E 14B0B81E 56570000 06C8C8C9 5F5E1F00 00E90000 B8000100 ...¡..Õ...^_èùà...WV.¡¯..Ä.v..v. 000040
 468BFC5E C40038E9 FA468B00 06E90375 00003DFA 46890000 14C09A50 16FC468D .F=.P.ó....F̄'=..u.Õ...F'Õ8.ó^=.F 000060
 5EC40015 E90000B8 0006E903 75009A97 3926000A E9037400 98873926 10568B0E ..V.&9...t.Õ..&9...u.Õ..¡..Õ..ó^ 000080
 B81E5657 00005AC8 CBC95F5E 1F0000E9 0001B800 00FFFF9A 016A00CA B7FF26FC =&.ñò.j......¡..Õ...^_èùàZ..WV.¡ 0000A0
 0E76FF10 76FF0A76 FF0C76FF 00001546 9A5016F8 468D0676 FF0876FF D88E1536 6..Ä.v..v..F½.P.F....v̄..v..v..v. 0000C0
 26000AE9 03740098 873926FE 568BFC46 8BF85EC4 0000083D 9A5016FC 468D106A j..F=.P.=...ó^½.F=.V±&9...t.Õ..& 0000E0
 109700BD 9AF876FF FA76FF0E 76FF1076 FF00C8E9 0000B800 06E90375 009A9739 9...u.Õ..¡..Õà..v..v..v'.v½.§... 000100
 0016859A 0A76FF0C 76FF0008 E9037500 00E8BF83 26F85EC4 001FE903 7500003D =..u.Õ..ó^½&.¢Ò..u.Õ...v..v..... 000120
 E0878826 F85EC400 78E90375 00E28708 2600E087 8826F85E C40090E9 0001B800 .¡..Õ..ó^½&..Ä.&..ã.u.Õx.ó^½&..Ä 000140
 9A5016AA 468D016A 0E76FF10 76FF0A76 FF0C76FF A85689A6 468900E2 978B2600 .&..ã..FÌ.V´.v..v..v..v.j..F˙.P. 000160
 76FF000B E9037500 00E8BF83 26F85EC4 001FE903 7500F67E 83F64689 00001515 .....F-.—.u.Õ..ó^½&.¢Ò..u.Õ...v 000180
 9A505200 0405A856 8BA6468B 5016AA46 800028E9 0001B800 0013439A 0A76FF0C ..v..C...¡..Õ(..F¯.P.FÌ.V´...RP. 0001A0
 00000CC8 CBC95F5E 1F0000E9 0000B800 0100E687 C726F85E C408C483 FFFF0046 F....ó.ó^½&ú.Ì...¡..Õ...^_èùà... 0001C0
 76FF0A76 FF0C76FF 000015B0 9A5016F8 468D0676 FF0876FF D88E15A0 B81E5657 WV.¡...Ä.v..v..F½.P.¯....v̄..v..v 0001E0

Dump of file SATURN:[PCCOMMON.DUMP.DLL]SA-DGFD.DLL;1 on 18-APR-1990 10:50:15.11
File ID (447,10,0)   End of file block 66 / Allocated 68

Virtual block number 64 (00000040), 512 (0200) bytes

 03740098 873926FE 568BFC46 8BF85EC4 000015C8 9A5016FC 468D106A 0E76FF10 ..v.j..F=.P.à...ó^½.F=.V±&9...t. 000000
 9AF876FF FA76FF0E 76FF1076 FF009BE9 0000B800 06E90375 009A9739 26000AE9 Õ..&9...u.Õ..¡..Õ...v..v..v'.v½. 000020
 0A76FF0C 76FF000B E9037500 00E8BF83 26F85EC4 001FE903 7500003D 15FE00BD §.±.=..u.Õ..ó^½&.¢Ò..u.Õ...v..v. 000040
 F85EC400 4BE90375 00E28708 2600E087 8826F85E C40063E9 0001B800 00161D9A .....¡..Õc.ó^½&..Ä.&..ã.u.ÕK.ó^½ 000060
 F6568BF4 468B216A 005047C6 26F45EC4 F65689F4 468900E2 978B2600 E0878826 &..Ä.&..ã..F¶.V-ó^¶&6GP.j!.F¶.V- 000080
 5EC412C4 83000013 1B9A006A 0E76FF10 76FF271F 680A76FF 0C76FF50 52005005 .P.RP.v..v.h.'.v..v.j.......ó.ó^ 0000A0
 FFD88E16 C4B81E56 5700000E C8C8C95F 5E1F0000 E90000B8 000100E6 87C726F8 ½&ú.Ì...¡..Õ...^_èùà...WV.¡ó..Ä. 0000C0
 878B26FC 5EC4FA46 89000287 8B26FC5E C40000FF FF9A5016 FC468D06 76FF0876 v..v..F=.P.....ó^=&..@..F'ó^=&.. 0000E0
 0000FFFF 9A5016F2 468DF676 FFF876FF FA76FFF8 5689F646 8900C497 8B2600C2 ó.&..ó..F-.V½.v'.v½.v-.F·.P..... 000100
 9AFC76FF FE76FFF2 76FFF476 FF00EC97 892600EA 878926F4 568BF246 8BFC5EC4 ó^=.F·.V¶&..õ.&..ã..v¶.v·.v±.v=. 000120
 FF0000FF FF9AFFFF 68172268 FFFF6818 3568106A 226AF276 FFF476FF 0000FFFF .....v¶.v·j"j.h5.h..h".h........ 000140
 F276FFF4 76FF0000 18719AFF FF681865 68FFFF68 18506804 6A226AF2 76FFF476 v¶.v·j"j.hP.h..he.h...q....v¶.v· 000160
 68026A1D 6AF276FF F476FF00 00183B9A FFFF6818 8068FFFF 68186B68 1C6A226A j"j.hk.h..h..h...;....v¶.v·j.j.h 000180
 F476FF00 00FFFF9A FFFF6818 A8681D6A F276FFF4 76FF0000 18AE9AFF FF681893 ..h...Û....v¶.v·j.h´.h........v¶ 0001A0
 68182F68 096A226A F276FFF4 76FF0000 18C39AFF FF6818BD 68016A22 6AF276FF .v·j"j.h§.h...û....v¶.v·j"j.h/.h 0001C0
 20020304 98000017 97020300 1B04CAC9 5F5E1F00 00E90000 B80000FF FF9AFFFF .......¡..Õ...^_èò............   0001E0

Dump of file SATURN:[PCCOMMON.DUMP.DLL]SA-DGFD.DLL;1 on 18-APR-1990 10:50:15.11
File ID (447,10,0)   End of file block 66 / Allocated 68

Virtual block number 65 (00000041), 512 (0200) bytes

 AB000501 10000818 32000500 00000407 F3000208 00000818 40000505 19000E18 .......M.......µ........2.......¨ 000000
 4A000200 F7000517 41020304 AE000E17 FC020305 29000E16 D4020315 98000818 .......ó...)...=...Û...A...%...J 000020
 96000500 00000817 8B000214 A8000818 83000500 00000A16 A2000200 00000818 .......Å...........´...£........ 000040
 60020304 C5000E18 99020300 1D000315 89020310 33000818 6E000515 2E000818 .......n...3...............é...' 000060
 E9020304 D9000E18 86020303 12000617 CB020316 BC000818 C0000501 0F000516 .......ó...¥...ù..........  1...Õ 000080
 38000504 FD000E18 5602030A D0000818 53000501 35000516 EC020300 43000314 ...C...š...5...S...Ì...V...÷...8 0000A0
 01CB0001 B81F0000 3E89D88E FFFFB81E 0000000A F4000818 68000504 6F000818 ...o...h...¶.....|...Ä.>...¡..ù. 0000C0
 FFFFB9C0 33067EC4 1EDE8BD7 8BEC8B55 00000000 00000000 00000C00 02000200 ................U.š.=.B.ó~.3â¿.. 0000E0
 01C6F706 468BFE87 08468ED8 8EC08CF9 2BD1F7AE F2FFFFB9 0A7EC4FF 758DAEF2 ·Û.u.ó-.¿..·Û%Ì+'.å.Ä.F..±.F.%ó. 000100
 76C51EDE 8BD78BEC 8B55CB5D C28C1FFA 8BF38BA4 F3C913A5 F3E90149 A4027400 .t.ÊÌÌÕµÊ.èµÊ.µ.'..õ]ùU.š.=.B.év 000120
 13A5F3E9 D149A402 7401A8C7 8B067EC4 D1F7AEF2 FFFFB9C0 33C08ED8 8CFE8B0A ..±.Ä.â3â¿..·Û%Ìó~..ù´.t.ÊÌÌÕµÊ. 000140
 8B9149D1 F7AEF2FF FFB9C033 067EC4D7 8BEC8B55 CB5DC28C 1FFA8BF3 8BA4F3C9 èµÊ.µ.'..õ]ùU.š.=ó~.3â¿..·Û%ÌÌ.. 000160
 00000000 00000000 00404744 44464153 00000000 00000000 00000000 00CB5DFA ']ù.............SAFDDGM......... 000180
 39581062 4DD33FDB 020C49BA 5E353FE2 04189374 BC6A3FE8 00000000 00003FF0 Þ?......Ò7j¥t...ã?5^αI..Û?ÆMb.X9 0001A0
 99999999 999A3FC1 0624DD2F 1AA03FC6 C8843958 10623FCE 56041893 74BC3FD4 å?¥t...Vö7b.X9Çàó7../Ì$.è7...... 0001C0
 624DD2F1 A9FC3FA5 810624DD 2F1B3FAC AC083126 E9793FB3 33333333 33333FB9 ¿7333333°7yÕ&1.¨¨7./Ì$..É7=`þ@Mb 0001E0
```

```
Dump of file SATURN:[PCCOMMON.DUMP.DLL]SA-DGFD.DLL;1 on 18-APR-1990 10:50:15.11
File ID (447,10,0)   End of file block 66 / Allocated 68

Virtual block number 66 (00000042), 512 (0200) bytes

 7AE147AE 147B3F8A 9FBE76C8 B4393F92 6E978D4F DF3B3F98 9374BC6A 7EFA3FA0 .?ª~j¥t..?;ÕO..n.?9Çàv/..?(.ÚGÃz 000000
 00000000 00110001 00040352 00000067 00000000 0C009400 02000192 FFFF3FB4 .?..............g...R........... 000020
 73736563 6F725020 65746165 72437E02 5D000000 01000500 04035200 00005600 .V...R.........].~Create Process 000040
 04006061 72676169 44207265 626D756E 65527E02 5E000000 01FFFF40 00000400 ....a......^.~Renumber Diagram.. 000060
 00000000 00000000 0000726F 74696445 20444644 7E025A00 000001FF FF400000 ..a......Z.~DFD Editor.......... 000080
 5F000000 01000300 04035200 00003B00 00000000 00110001 00040352 0000004C L...R............;...R.........._ 0000A0
 025B0000 0001FFFF 40000004 006E6572 646C6968 43207265 626D756E 65527E02 .~Renumber Children....a......(. 0000C0
 00000000 00000000 00000000 00000000 00000000 00726F74 69644520 4C44507E ~PDL Editor..................... 0000E0
 00000000 00000000 00000000 00000000 00000000 00000000 00000000 00000000 ................................ 000100
 00000000 00000000 00000000 00000000 00000000 00000000 00000000 00000000 ................................ 000120
 00000000 00000000 00000000 00000000 00000000 00000000 00000000 00000000 ................................ 000140
 00000000 00000000 00000000 00000000 00000000 00000000 00000000 00000000 ................................ 000160
 00000000 00000000 00000000 00000000 00000000 00000000 00000000 00000000 ................................ 000180
 00000000 00000000 00000000 00000000 00000000 00000000 00000000 00000000 ................................ 0001A0
 00000000 00000000 00000000 00000000 00000000 00000000 00000000 00000000 ................................ 0001C0
 00000000 00000000 00000000 00000000 00000000 00000000 00000000 00000000 ................................ 0001E0

Dump of file SATURN:[PCCOMMON.DUMP.DLL]SADGM.TMP;1 on 18-APR-1990 10:52:08.50
File ID (905,18,0)   End of file block 12 / Allocated 12

Virtual block number 1 (00000001), 512 (0200) bytes

 00000000 00000040 00000000 000000B8 0000FFFF 00000004 0000000C 000A5A4D MZ..............|.......a....... 000000
 00000080 00000000 00000000 00000000 00000000 00000000 00000000 00000000 ................................ 000020
 6F6E6E61 63206D61 72676F72 70207369 685421CD 4C01B821 CD09B400 0EBA1F0E ..¤..Ç.ë|.LèIThis program canno 000040
 00000000 00000024 0A0D0D2E 65646F6D 20534F44 206E6920 6E757220 65622074 t be run in DOS mode....$....... 000060
 0002000B 00000000 00010000 00000800 000B800E 41062489 00070148 0505454E NE..H....$.A.................... 000080
 00000000 00000000 00010000 00040000 000001CF 00B200AE 00980098 00400031 1.a.....Û.ý.ü................... 0000A0
 04F60F00 04F60055 01F00F00 01F00032 00CA0F00 00CA0023 00110F00 00110020 ........#.ò...ò.2.Þ...Þ.U.-...-. 0000C0
 01E20F00 01E20119 006A0F00 006A0110 00980F00 00980104 055C0F00 055C00AA ^.\...\...........j...j...ã...ã. 0000E0
 00004D47 44415305 00C60F01 00C00151 00D20E00 00D10143 003A0F00 003A013B ;.:...:.C.Ì...Ø.Q.å...ó..SADGM.. 000100
 4854454D 5F12444F 4854454D 0600001B 00010000 0154494E 494D4744 41535F0A ._SADGMINIT.........METHOD._METH 000120
 4D474416 584F4257 4152444D 47440A4D 47440353 53414C43 52455453 49474552 REGISTERCLASS.DGM.DGMDRAWBOX.DGM 000140
 4F4C5058 45574152 444D4744 154E4F47 594C4F50 4445444F 4C505845 57415244 DRAWEXPLODEDPOLYGON.DGMDRAWEXPLO 000160
 4D474415 584F4244 45444F4C 50584557 4152444D 47441245 4C435249 43444544 DEDCIRCLE.DGMDRAWEXPLODEDBOX.DGM 000180
 44094E45 50595245 55514D47 4408474E 49525453 4445444F 4C505845 57415244 DRAWEXPLODEDSTRING.DGMQUERYPEN.D 0001A0
 20737463 656A626F 20636968 70617247 2D000000 00030901 4E455054 45534D47 GMSETPEN.......-Graphic objects  0001C0
 0000006D 65747379 73204153 206E6920 64657375 2073646F 6874656D 20646E61 and methods used in SA system... 0001E0

Dump of file SATURN:[PCCOMMON.DUMP.DLL]SADGM.TMP;1 on 18-APR-1990 10:52:08.50
File ID (905,18,0)   End of file block 12 / Allocated 12

Virtual block number 2 (00000002), 512 (0200) bytes

 08000200 02000000 09000A00 020002C8 1F02C483 FFFF0000 9A57D88E FFFFB81E .|...ÄW......á..ù............... 000000
 260A5EC4 D88EFFFF B81E5657 000000C8 00000000 00000000 00000000 00000000 ...............à...WV.|...Äá^.& 000020
 E90000B8 D88E0008 B81E5657 000000C8 CBC95F5E 1F0000E9 00008800 010447C7 ÚG...|..Õ...^_èùà...WV.|...Ä|..Õ 000040
 5EC4FE47 8B260E5E C4020E46 83D88E00 28B81E56 57000000 C8CBC95F 5E1F0000 ...^_èùà...WV.|(..Ä.F..á^.&.G±á^ 000060
 E90000B8 D88E003F B81E5657 000000C8 CBC95F5E 1F0000E9 0000B804 4789260A .&.G.|..Õ...^_èùà...WV.|?..Ä|..Õ 000080
 1F0000E9 00020508 568B0646 8BD88E00 68B81E56 57000000 C8CBC95F 5E1F0000 ...^_èùà...WV.|h..Ä.F..V....Õ... 0000A0
 066A0000 681E016A 006AFFFF 68FFFF68 D88E007F B81E5657 000000C8 CBC95F5E ^_èùã...WV.|...Äh..h..j.j..h..j. 0000C0
 00A10002 0004C8C9 5F5E1F00 00E918C4 830000FF FF9A006A 026A016A 006A006A j.j.j.j.j.......á.Õ...^_èù....Ä. 0000E0
 00000000 00770002 00A40005 00000008 009C0002 00080001 00BB0203 00000002 ......£..............£...w..... 000100
 C7260003 5447C726 0A5EC400 045847C7 260A5EC4 D88EFFFF B81E5657 000000C8 à...WV.|...Äá^.&úGX..á^.&úGT..&ú 000120
 00E90000 B8D88E00 08B81E56 57000000 C8CBC95F 5E1F0000 E90000B8 00005647 GV..|..Õ...^_èùà...WV.|...Ä|..Õ. 000140
 0000C8CB C95F5E1F 0000E900 00B8D88E 0037B81E 56570000 00C8CBC9 5F5E1F00 ..^_èùà...WV.|7..Ä|..Õ...^_èùà.. 000160
 08050C56 8B0A468B FC77FF26 FE77FF26 0E5EC404 0E4683D8 8E004EB8 1E565700 .WV.|N..Ä.F..á^.&.w±&.w•.F..V... 000180
 0065B81E 56570000 00C8CBC9 5F5E1F00 00E90000 B808C483 FFFF0000 9A505200 .RP......á.|..Õ...^_èùà...WV.|e. 0001A0
 E90000B8 56578926 54478926 0A5EC4FE 578B26FC 478B260E 5EC4040E 4683D88E .Ä.F..á^.&.G•&.W±á^.&.GT&.WV|..Õ 0001C0
 8B26FC47 8B260E5E C4040E46 83D88E00 9EB81E56 57000020 C8CBC95F 5E1F0000 ...^_èùà ..WV.|...Ä.F..á^.&.G•&. 0001E0
```

Dump of file SATURN:[PCCOMMON.DUMP.DLL]SADGM.TMP;1 on 18-APR-1990 10:52:08.50
File ID (905,18,0)   End of file block 12 / Allocated 12

Virtual block number 3 (00000003), 512 (0200) bytes

```
0E4683E6 5689E446 89FE5788 26FC4788 260E5EC4 040E4683 EA5689E8 4689FE57 W±.FÒ.Võ.F..á^.&.G=&.W±.Fõ.V].F. 000000
88E44688 0000FE46 C70064FC 46C7E256 89E04689 FE578826 FC478826 0E5EC404 .á^.&.G=&.W±.FÁ.VãúF=d.úF±...Fõ. 000020
E65688E4 4688F256 89F04689 00DA8300 012DE256 88E04688 EE5689EC 4689E656 V].F$.VŸ.FÁ.Vã-...Ö..FÞ.V·.Fõ.V] 000040
F84689E2 5613E046 03565788 26544788 260A5EC4 F65689F4 4689FE56 13FC4603 .F=.V±.F¶.V-á^.&.GT&.WV.FÁ.Võ.F½ 000060
8D5477FF 265677FF 260A5EC4 50520008 050C5688 0A4688E8 76FFEA76 FFFA5689 .V".võ.vÒ.F..V....RPá^.&.·V&.wT. 000080
000000C8 CBC95F5E 1F0000E9 0000FFFF 9A006A00 6A5877FF 260A5EC4 5016EC46 F$.Pá^.&.wXj.j......Õ...^_`ùà... 0000A0
1E565700 0000C8CB C95F5E1F 0000E900 02050856 88064688 D88E00CF 881E5657 WV.¡ü..Ä.F..V....Õ...^_èùÈ.  WV. 0000C0
9A006A03 6A016A00 6A006A5A 6A001868 1E016A02 6AFFFF68 FFFF68D8 8E01A488 ¡È..Äh..h..j.j..h..jZj.j.j.j.j.. 0000E0
000101E0 02030000 000301C6 00020006 90CBC95F 5E1F0000 E918C483 0000FFFF .....á.Õ...^_èù.....ó.......Á... 000100
000301C9 0005006A 00020190 02030000 000B01C1 00020000 000A0086 00020008 ............È............j...è... 000120
040E4683 D88EFFFF 881E5657 000004C8 00000000 00000000 00000000 0000019C ................à...WV.¡...Ä.F.. 000140
1EF08808 7F80FE56 88FC4688 0A5EC4FE 5689FC46 89FE5788 26FC4788 260E5EC4 á^.&.G=&.W±.F=.V±á^..F=.V±....Þ. 000160
88D88E00 08881E56 57000000 C8CBC95F 5E1F0000 E90000B8 1FA5F200 0889DA8E .Õ¿..·È.¡..Õ...^_èùà...WV.¡...Ä¡ 000180
4788260E 5EC4040E 4683D88E 0048881E 56570000 1EC8CBC9 5F5E1F00 00E90000 ..Õ...^_èùà...WV.¡K..Ä.F..á^.&.G 0001A0
EA5689E8 4689FE57 8826FC47 88260E5E C4040E46 83EE5689 EC4689FE 578826FC =&.W±.F$.VŸ.F..á^.&.G=&.W±.FÒ.Võ 0001C0
FE478826 0E5EC402 0E4683E6 5689E446 89FE5788 26FC4788 260E5EC4 040E4683 .F..á^.&.G=&.W±.Fõ.V].F..á^.&.G± 0001E0
```

Dump of file SATURN:[PCCOMMON.DUMP.DLL]SADGM.TMP;1 on 18-APR-1990 10:52:08.50
File ID (905,18,0)   End of file block 12 / Allocated 12

Virtual block number 4 (00000004), 512 (0200) bytes

```
4689EA56 13E84603 0A578826 08478826 0A5EC406 478926E2 46880A5E C4E24689 .Fãá^..Fã&.G.á^.&.G.&.W..FÒ.Võ.F 000000
88260A5E C4FA5689 F84689EA 5613E846 03125788 26104788 260A5EC4 F25689F0 Þ.V·á^.&.G.&.W..FÒ.Võ.F½.V"á^.&. 000020
E4460316 57882614 4788260A 5EC4F656 89F44689 E65613E4 46030E57 88260C47 G.&.W..FÒ.V].F¶.V-á^.&.G.&.W..Fõ 000040
6AE276FF 006A006A 006A006A 5016F046 8DEC76FF EE76FFFE 5689FC46 89E65613 .V].F=.V±.vŸ.v$.FÞ.Pj.j.j.j..vãj 000060
8E006288 1E565700 0000C8CB C95F5E1F 0000E900 00880000 FFFF9A01 6A006A00 .j.j......¡..Õ...^_èùà...WV.¡b.. 000080
260E5EC4 040E4683 D88E014D 881E5657 000004C8 CBC95F5E 1F0000E9 00008808 Ä¡..Õ...^_èùà...WV.¡M..Ä.F..á^.& 0000A0
02578926 07892600 08050C56 880A4688 FC5EC4FE 5689FC46 89FE5788 26FC4788 .G=&.W±.F=.V±á^=.F..V....&..&.W. 0000C0
88260E5E C4040E46 83D88E01 64881E56 5700001C C8CBC95F 5E1F0000 E9000088 ¡..Õ...^_èùà...WV.¡d..Ä.F..á^.&. 0000E0
5689E846 89FE5788 26FC4788 260E5EC4 040E4683 EE5689EC 4689FE57 8826FC47 G=&.W±.F$.VŸ.F..á^.&.G=&.W±.FÒ.V 000100
57882608 4788260A 5EC4E656 89E44689 FE578826 FC478826 0E5EC404 0E4683EA õ.F..á^.&.G=&.W±.Fõ.V]á^.&.G.&.W 000120
4689E656 13E44603 0E578826 0C478826 0A5EC4F2 5689F046 89EA5613 E846030A ..FÒ.Võ.FÞ.V·á^.&.G.&.W..Fõ.V].F 000140
88260A5E C4FA5689 F84689EA 5613E846 03125788 26104788 260A5EC4 F65689F4 ¶.V-á^.&.G.&.W..FÒ.Võ.F½.V"á^.&. 000160
6A086A50 16F0468D EC76FFEE 76FFFE56 89FC4689 E65613E4 46031657 88261447 G.&.W..Fõ.V].F=.V±.vŸ.v$.FÞ.Pj.j 000180
5EC4040E 4683D88E 01A3881E 56570000 1EC8CBC9 5F5E1F00 00E90000 FFFF9A08 ......Õ...^_èùà...WV.¡È..Ä.F..á^ 0001A0
4689FE57 8826FC47 88260E5E C4040E46 83EC5689 EA4689FE 578826FC 4788260E .&.G=&.W±.Fõ.V$.F..á^.&.G=&.W±.F 0001C0
08478826 0A5EC4E4 5689E246 89FE5788 26FC4788 260E5EC4 040E4683 E85689E6 |.VÒ.F..á^.&.G=&.W±.Fã.Võá^.&.G. 0001E0
```

Dump of file SATURN:[PCCOMMON.DUMP.DLL]SADGM.TMP;1 on 18-APR-1990 10:52:08.50
File ID (905,18,0)   End of file block 12 / Allocated 12

Virtual block number 5 (00000005), 512 (0200) bytes

```
5613E246 030E5788 260C4788 260A5EC4 F05689EE 4689E856 13E64603 0A578826 &.W..F].VÒ.FŸ.VÞá^.&.G.&.W..Fã.V 000000
5EC4F856 89F64689 E85613E6 46031257 88261047 88260A5E C4F45689 F24689E4 õ.F·.V¶á^.&.G.&.W..F].VÒ.F-.V½á^ 000020
5016FE46 8DEA76FF EC76FFFC 5689FA46 89E45613 E2460316 57882614 4788260A .&.G.&.W..Fã.VÒ.F".V=.v$.võ.F±.P 000040
6A016A50 16EE468D EA76FFEC 76FF0000 03409A03 6AEA76FF EC76FF00 00FFFF9A ......v$.võj..ə....v$.võ.FŸ.Pj.j 000060
6A5016EE 468DEA76 FFEC76FF 0000FFFF 9AFE76FF EA76FFEC 76FF0000 02529A08 ..R....v$.võ.v±......v$.võ.FŸ.Pj 000080
000004C8 CBC95F5E 1F0000E9 00000136 9A016A00 6A006A00 6A006A00 6A006A00 .j.j.j.j.j.j.j..6...Õ...^_èùà... 0000A0
0A5EC4FE 5689FC46 89FE5788 26FC4788 260E5EC4 040E4683 D88E0266 881E5657 WV.¡f..Ä.F..á^.&.G=&.W±.F=.V±á^. 0000C0
0000B802 57892607 8926FC5E C40A5718 2608472B 260A5EC4 12578826 10478826 &.G.&.W.á^.&+G.&.W.á^=&..&.W.¡.. 0000E0
26FC4788 260E5EC4 040E4683 D88E0374 881E5657 000004C8 CBC95F5E 1F0000E9 Õ...^_èùà...WV.¡t..Ä.F..á^.&.G=& 000100
C40E5718 260C472B 260A5EC4 16578826 14478826 0A5EC4FE 5689FC46 89FE5788 .W±.F=.V±á^.&.G.&.W.á^.&+G.&.W.á 000120
D88E03C0 881E5657 00000EC8 CBC95F5E 1F0000E9 0000B802 57892607 8926FC5E ^=&..&.W.¡..Õ...^_èùà...WV.¡á..Ä 000140
FC478826 0E5EC404 0E4683FA 5689F846 89FE5788 26FC4788 260E5EC4 040E4683 .F..á^.&.G=&.W±.F½.V".F..á^.&.G= 000160
26144788 260A5EC4 F64689FE 4788260E 5EC4020E 4683F456 89F24689 FE578826 &.W±.F·.V¶.F..á^.&.G±.F-á^.&.G.& 000180
F876FFFA 76FFF276 FFF476FF FE5689FC 46890E57 18260C47 28260A5E C4165788 .W.á^.&+G.&.W..F=.V±.v¶.v·.v".v½ 0001A0
6AF676FF 50520008 050C5688 0A468850 52FFFF00 369AFC76 FFFE76FF 046A006A j.j..v±.v=.6...RP.F..V....RP.v-j 0001C0
88D88E04 0C881E56 57000000 C8CBC95F 5E1F0000 E90000B8 0000FFFF 9A006A00 .j......¡..Õ...^_èùà...WV.¡...Ä. 0001E0
```

Dump of file SATURN:[PCCOMMON.DUMP.DLL]SADGM.TMP;1 on 18-APR-1990 10:52:08.50
File ID (905,18,0)   End of file block 12 / Allocated 12

Virtual block number 6 (00000006), 512 (0200) bytes

```
68FFFF68 D88E04AB B81E5657 000000C8 CBC95F5E 1F0000E9 00020508 568B0646 F..V....Õ...^_èùà...WV.¡¨..Äh..h 000000
00E918C4 830000FF FF9A006A 056A016A 006A006A 186A0036 681E016A 026AFFFF ..j.j..h6.j.j.j.j.j.j.......é.Õ. 000020
00000004 04CD0002 00080001 04E70203 00800002 03110203 000ACBC9 5F5E1F00 ..^_èù............Ö.......ë..... 000040
00000008 04C80002 0000000A 047D0002 04A30004 04D00005 008C0002 031E0203 ..........Å...È...}.......à..... 000060
00000000 00000000 006A0002 04940203 00570002 03600203 001F0002 03320203 ..2.......`...W.......j......... 000080
5689FA46 89FE578B 26FC478B 260E5EC4 040E4683 D88EFFFF B81E5657 000006C8 à...WV.¡...Ä.F..é^.&.G=&.W±.F*.V 0000A0
08478B26 FA5EC402 6A006A01 3CE9FE46 8BFE4689 FE478B26 0E5EC402 0E4683FC ▪.F..é^.&.G±.F±.F±Õ<.j.j.é^*&.G. 0000C0
0A578926 08478926 0A5EC401 0500369A 50520257 13260703 26FA5EC4 0A578B26 &.W.é^*&..&.W.RP.6...é^.&.G.&.W. 0000E0
02578B26 078B26FA 5EC40E57 89260C47 89260A5E C406578B 2604478B 26FA5EC4 é^*&.G.&.W.é^.&.G.&.W.é^*&..&.W. 000100
57892614 4789260A 5EC40E57 8B260C47 8B26FA5E C4125789 26104789 260A5EC4 é^.&.G.&.W.é^*&.G.&.W.é^.&.G.&.W 000120
8B260C47 8B26FA5E C41A5789 26184789 260A5EC4 0A578B26 08478B26 FA5EC416 .é^*&.G.&.W.é^.&.G.&.W.é^*&.G.&. 000140
89260A5E C40A578B 2608478B 26FA5EC4 00B4E91E 5789261C 4789260A 5EC40E57 W.é^.&.G.&.W.ÕÇ.é^*&.G.&.W.é^.&. 000160
0E571326 0C470326 FA5EC406 578B2604 478B26FA 5EC4026A 006A0A57 89260B47 G.&.W.j.j.é^*&.G.&.W.é^*&.G.&.W. 000180
260A5EC4 02578B26 078B26FA 5EC40E57 89260C47 89260A5E C4FFFF00 369A5052 RP.6...é^.&.G.&.W.é^*&..&.W.é^.& 0001A0
FA5EC416 57892614 4789260A 5EC40E57 8B260C47 8B26FA5E C4125789 26104789 .G.&.W.é^*&.G.&.W.é^.&.G.&.W.é^* 0001C0
0A5EC406 578B2604 478B26FA 5EC41A57 89261847 89260A5E C402578B 26078B26 &..&.W.é^.&.G.&.W.é^*&.G.&.W.é^. 0001E0
```

Dump of file SATURN:[PCCOMMON.DUMP.DLL]SADGM.TMP;1 on 18-APR-1990 10:52:08.50
File ID (905,18,0)   End of file block 12 / Allocated 12

Virtual block number 7 (00000007), 512 (0200) bytes

```
4FE90375 00033DFE BCE90375 00013D00 13E90016 E90019E9 1E578926 1C478926 &.G.&.W.Õ..Õ..Õ..=..u.ÕV±=..u.Õo 000000
00E90000 B8088E00 08B81E56 57000000 C8CBC95F 5E1F0000 E90000B8 FFE7E9FF .Õó.¡..Õ...^_èùà...WV.¡...Ä¡..Õ. 000020
578B26FC 478B260E 5EC4040E 4683D88E 0197B81E 56570000 28C8CBC9 5F5E1F00 ..^_èùÀ(..WV.¡...Ä.F..é^.&.G=&.W 000040
040E4683 E05689DE 4689FE57 8B26FC47 8B260E5E C4040E46 83E45689 E24689FE ±.Fõ.VÕ.F..é^.&.G=&.W±.FB.VÀ.F.. 000060
C4D84689 FE478B26 0E5EC402 0E4683DC 5689DA46 89FE578B 26FC478B 260E5EC4 é^.&.G=&.W±.FÖ.VÉ.F..é^.&.G±.FÄé 000080
E6768B00 49E90372 03E67E83 E646FF00 03E90000 E646C706 478926D8 468B0A5E ^..FÄ&.G.úF¦..Õ...F¦.~¦.r.Õ¦..v¦ 0000A0
EA5289E8 428903E6 C1E6768B E05613DE 46030A50 8B260840 8B260A5E C403E6C1 è¦.é^.&.a.&.P..FB.VÀ.v¦è¦..BÒ.Rõ 0000C0
EC428903 E6C1E676 8BDC5613 DA46030E 508B260C 408B260A 5EC403E6 C1E6768B .v¦è¦.é^.&.a.&.P..FÖ.VÉ.v¦è¦..B$ 0000E0
FF9A006A 006A006A D876FF50 16E8468D 036A006A E276FFE4 76FFFFAB E9EE5289 .RYÕ¨..vÕ.vãj.j..FÒ.P.vÄj.j.j... 000100
5EC4040E 4683D88E 01AEB81E 56570000 2AC8CBC9 5F5E1F00 00E90000 B80000FF ...¦..Õ...^_èùà*..WV.¡Ü..Ä.F..é^ 000120
4689FE57 8B26FC47 8B260E5E C4040E46 83E25689 E04689FE 578B26FC 478B260E .&.G=&.W±.FÄ.Vã.F..é^.&.G=&.W±.F 000140
0E5EC402 0E4683DA 56890846 89FE578B 26FC478B 260E5EC4 040E4683 DE56890C É.VB.F..é^.&.G=&.W±.FÄ.VÖ.F..é^. 000160
E6C1E476 8B0049E9 037203E4 7E83E446 FF0003E9 0000E446 C7D64689 FE478B26 &.G±.FøúFÕ..Õ...FÕ.-Õ.r.Õ¦..vÕè¦ 000180
768BE852 89E64289 03E6C1E4 768BDE56 13DC4603 0A508B26 08408B26 0A5EC403 .é^.&.a.&.P..FÉ.VB.vÕè¦..B¦.RÒ.v 0001A0
5289EA42 8903E6C1 E4768BDA 56130B46 030E508B 260C408B 260A5EC4 03E6C1E4 Õè¦.é^.&.a.&.P..FÄ.VÖ.vÕè¦..Bõ.R 0001C0
E276FF00 00FFFF9A 5016FE46 8DE076FF E276FF00 47E90374 03D67E83 FFABE9EC $Õ¨..~ø.t.ÕG..vã.vÀ.F±.P......vã 0001E0
```

Dump of file SATURN:[PCCOMMON.DUMP.DLL]SADGM.TMP;1 on 18-APR-1990 10:52:08.50
File ID (905,18,0)   End of file block 12 / Allocated 12

Virtual block number 8 (00000008), 512 (0200) bytes

```
6A006A00 6A036A50 16E6468D 036A006A E076FFE2 76FF0000 03909A03 6AE076FF .vÀj.......vã.vÀj.j..F¦.Pj.j.j.j 000000
468D036A 006AE076 FFE276FF 0000FFFF 9AFE76FF E076FFE2 76FF0000 027F9A00 .......vã.vÀ.v±......vã.vÀj.j..F 000020
5700002A C8CBC95F 5E1F0000 E90000B8 00000382 9A006A00 6A006A02 6A5016E6 ¦.Pj.j.j.j......¡..Õ...^_èùà*..W 000040
040E4683 E25689E0 4689FE57 8B26FC47 8B260E5E C4040E46 83088E02 96B81E56 V.¡...Ä.F..é^.&.G=&.W±.FÄ.Vã.F.. 000060
FE578B26 FC478B26 0E5EC404 0E4683DE 56890C46 89FE578B 26FC478B 260E5EC4 é^.&.G=&.W±.FÉ.VB.F..é^.&.G=&.W± 000080
83E446FF 0003E900 00E446C7 D64689FE 478B260E 5EC4020E 46830A56 89D84689 .FÄ.VÖ.F..é^.&.G±.FøúFõ..Õ...Fõ. 0000A0
8BDE5613 DC46030A 508B2608 408B260A 5EC403E6 C1E4768B 0049E903 7203E47E -õ.r.Õ¦..vÕè¦.é^.&.a.&.P..FÉ.VB. 0000C0
13D84603 0E508B26 0C408B26 0A5EC403 E6C1E476 8BE85289 E6428903 E6C1E476 vÕè¦..B¦.RÒ.vÕè¦.é^.&.a.&.P..FÄ. 0000E0
E076FFE2 76FF0067 E9037401 D67E83FF ABE9EC52 89EA4289 03E6C1E4 768BDA56 VÖ.vÕè¦..Bõ.Rsõ¨..-ø.t.Õg..vã.vÀ 000100
6A006AE0 76FFE276 FF000004 BD9A036A E076FFE2 76FF0000 03599A50 16FE468D .F±.P.Y....vã.vÀj..§....vã.vÀj.j 000120
0003669A FE76FFE0 76FFE276 FF000004 DA9A006A 006A006A 026A5016 E6468D03 ..F¦.Pj.j.j.j..Ö....vã.vÀ.v±.f.. 000140
1CE90000 04F99A00 6A006A00 6AD676FF 5016E646 8D036A00 6AE076FF E276FF00 ..vã.vÀj.j..F¦.P.vøj.j.j..'...Õ. 000160
0000B800 0003AC9A 006A006A 006A036A 5016E646 8D036A00 6AE076FF E276FF00 ..vã.vÀj.j..F¦.Pj.j.j.j..¯...¡.. 000180
0000E900 02050856 8B06468B D88E03C3 B81E5657 000000C8 CBC95F5E 1F0000E9 Õ...^_èùà...WV.¡Ü..Ä.F..V....Õ.. 0001A0
6A007268 1E016A02 6AFFFF68 FFFF68D8 8E0510B8 1E565700 0000C8CB C95F5E1F .^_èùã...WV.¡...Äh..h..j.j..hr.j 0001C0
02030008 90CBC95F 5E1F0000 E918C483 0000FFFF 9A006A04 6A016A00 6A006A20  j.j.j.j.j.......é.Õ...^_èù..... 0001E0
```

```
Dump of file SATURN:[PCCOMMON.DUMP.DLL]SADGM.TMP;1 on 18-APR-1990 10:52:08.50
File ID (905,18,0)   End of file block 12 / Allocated 12

Virtual block number 9 (00000009), 512 (0200) bytes

 0002008C 00020493 02030000 00050532 00020008 0001054C 02030080 00020486 ........L.......2............... 000000
 0000002A 000204AF 02030000 00080520 00020508 00050535 00050000 000A0053 S.......5.......·.......£...*... 000020
 08B81E56 57000000 C8CBC95F 5E1F0000 E90000B8 D88EFFFF B81E5657 000000C8 à...WV.|...Ä|..Õ...^_èùà...WV.|. 000040
 0000E900 00B8D88E 001FB81E 56570000 00C8CBC9 5F5E1F00 00E90000 B8D88E00 ..Ä|..Õ...^_èùà...WV.|...Ä|..Õ.. 000060
 5F5E1F00 00E90002 05085688 06468808 8E003688 1E565700 0000C8C8 C95F5E1F .^_èùà...WV.|6..Ä.F..V....Õ...^_ 000080
 006A186A 0090681E 016A056A FFFF68FF FF68D88E 0040B81E 56570000 00C8CBC9 èùã...WV.|M..Äh..h..j.j..h..j.j. 0000A0
 00060072 00050004 CBC95F5E 1F0000E9 18C48300 00FFFF9A 006A066A 016A006A j.j.j.j.......á.Õ...^_èü....r... 0000C0
 00000000 00000000 0008006A 00020000 0006006F 00020008 00010089 02030045 E...........o.......j........... 0000E0
 08B81E56 57000000 C8CBC95F 5E1F0000 E90000B8 D88EFFFF B81E5657 000000C8 à...WV.|...Ä|..Õ...^_èùà...WV.|. 000100
 D88E001F B81E5657 000000C8 CBC95F5E 1F0000E9 00020508 56880646 88D88E00 ..Ä.F..V....Õ...^_èùã...WV.|...Ä 000120
 830000FF FF9A006A 086A016A 006A006A 186A00A2 681E016A 026AFFFF 68FFFF68 h..h..j.j..hÂ.j.j.j.j.j.j....... 000140
 003C0002 00000007 00410002 00080001 00580203 0004CBC9 5F5E1F00 00E918C4 á.Õ...^_èü....[.......A.......<. 000160
 040E4683 D88EFFFF B81E5657 000004C8 00000000 00170007 00440005 00000008 ......D.........à...WV.|...Ä.F.. 000180
 0A578B26 08478B26 FC5EC402 6A006AFE 5689FC46 89FE578B 26FC478B 260E5EC4 á^.&.G=&.W±.F=.V±j.j.á^=&.G.&.W. 0001A0
 026A006A 0A578926 08478926 0A5EC400 6800369A 50520257 13260703 26FC5EC4 á^=&..&.W.RP.6.k.á^.&.G.&.W.j.j. 0001C0
 0A5EC400 9600369A 50520E57 13260C47 0326FC5E C406578B 2604478B 26FC5EC4 á^=&.G.&.W.á^=&.G.&.W.RP.6...á^. 0001E0

Dump of file SATURN:[PCCOMMON.DUMP.DLL]SADGM.TMP;1 on 18-APR-1990 10:52:08.50
File ID (905,18,0)   End of file block 12 / Allocated 12

Virtual block number 10 (0000000A), 512 (0200) bytes

 571B2607 2B26FC5E C40A578B 2608478B 26FC5EC4 026A006A 0E578926 0C478926 &.G.&.W.j.j.á^=&.G.&.W.á^=&+.&.W 000000
 00C8CBC9 5F5E1F00 00E90000 B8125789 26104789 260A5EC4 FFFF0036 9A505202 .RP.6...á^.&.G.&.W.|..Õ...^_èùà. 000020
 8E00B688 1E565700 0016C8C8 C95F5E1F 0000E900 00B8D88E 0008B81E 56570000 ..WV.|...Ä|..Õ...^_èùà...WV.|Ř.. 000040
 478B260E 5EC4040E 4683F656 89F44689 FE578B26 FC478B26 0E5EC404 0E468308 Ä.F..á^.&.G=&.W±.F¶.V-.F..á^.&.G 000060
 EE5689EC 4689FE57 8B26FC47 8B260E5E C4040E46 83F25689 F04689FE 578B26FC =&.W±.FÞ.V·.F..á^.&.G=&.W±.F$.VŸ 000080
 5689F846 89F25613 F046030A 578B2608 478B260A 5EC4EA46 8906478B 260A5EC4 á^.&.G..Fõá^.&.G.&.W..FÞ.V·.F½.V 0000A0
 468DF476 FFF676FF FE5689FC 4689EE56 13EC4603 0E578B26 0C478B26 0A5EC4FA ¤á^.&.G.&.W..F$.VŸ.F=.V±.v-.v¶.F 0000C0
 E90000B8 0000FFFF 9A006A00 6A006AEA 76FF1077 FF261277 FF260A5E C45016F8 ½.Pá^.&.w.&.w..võj.j.j......|..Õ 0000E0
 00C8CBC9 5F5E1F00 00E90000 B8D88E00 CD881E56 57000000 C8CBC95F 5E1F0000 ...^_èùà...WV.|ë..Ä|..Õ...^_èùà. 000100
 57000000 C8CBC95F 5E1F0000 E9000205 08568806 4688D88E 017FB81E 56570000 ..WV.|...Ä.F..V....Õ...^_èùã...W 000120
 6A076A01 6A006A00 6A146A00 AE681E01 6A026AFF FF68FFFF 68D88E01 96881E56 V.|...Äh..h..j.j..hÛ.j.j.j.j.j.j 000140
 01D20203 018E0008 01B80005 000690C8 C95F5E1F 0000E918 C4830000 FFFF9A00 .......á.Õ...^_èù.....£.......@. 000160
 01680203 00000008 01B30002 0000000A 003F0002 00000008 01B80002 00080001 ......|.......7.......°.......h. 000180
 FF00949A D88EFFFF B81E5657 000000C8 00000000 00000000 00000000 00410002 ..A.............à...WV.|...Ä.... 0001A0
 B8FFFF00 349AFFFF 01AB9AFF FF05259A FFFF0062 9AFFFF04 C09AFFFF 01B99AFF ..¿....ė....b....X....¨....4...| 0001C0
 00190002 00000003 00140002 00000002 000F0002 0008CBC9 5F5E1F00 00E90001 ..Õ...^_èù...................... 0001E0

Dump of file SATURN:[PCCOMMON.DUMP.DLL]SADGM.TMP;1 on 18-APR-1990 10:52:08.50
File ID (905,18,0)   End of file block 12 / Allocated 12

Virtual block number 11 (0000000B), 512 (0200) bytes

 00280002 00000007 00200002 00000006 001E0002 00000005 00230002 00000004 ......#...............·.......(. 000000
 8ED88CFE 880A76C5 1EDE88D7 88EC8855 00000000 0000000B 00080002 00000008 ................U.$.m.8.év..±.Ä. 000020
 88F388A4 F3C913A5 F3E9D149 A4027401 A8C78806 7EC4D1F7 AEF2FFFF B9C033C0 á3á¿..·Ú%1á~..ú´.t.Ê1ÌÕµÉ.èµÊ.µ. 000040
 00001DDA F7D8F706 56884711 7DC00808 4688FF33 535657EC 8855C85D C28C1FFA ª..õ]ÙW.$WVS3..F..à).G.V.%Ä%Ö... 000060
 C00B0A56 890C4689 00001DDA F7D8F70A 56884711 7DC00B0C 46880656 89084689 .F..V..F..à).G.V.%Ä%Ö....F..V..à 000080
 88085688 0A4E88D8 8B38EB03 8BF1F706 46880888 F1F7D233 0846880A 4E881575 u..N..F.30%b.Ä.F.%b.ÆSB.Ä.N..V.. 0000A0
 3B0C72D1 03E6F70A 4688910C 66F7F08B F1F7F475 D80B0801 EAD1D901 EBD10646 F.1$1116 1Ä.Üu¶%b.Þkf...F.%|.1r.; 0000C0
 CA5DE58B 5F5E5B00 DA8308F7 DAF70775 4F960233 4E017606 46380672 07770856 V.w.r.;F.v.N3Ø.Ou.%Ö%Ä.Ö.[^_.|]ò 0000E0
 00370326 00100020 0325000A 00000001 00000000 00000000 00000000 00000008 ......................X. ...&.7. 000100
 FFFF00C7 0320002E 005003E9 00280046 03E80022 00000001 00000000 0000FFFF ............".Ò.F.(.Õ.]... .ú... 000120
 03250052 01450323 004C025E 03270046 01980321 0040005A 03200000 00000000 ...... .Z.@.|...F.'.^.L.#.E.R.X. 000140
 00000000 FFFF0404 057B006A 03B8057A 0064036C 0579005E 015C0578 00580000 ..X.x.\.^.y.l.d.z.|.j.(......... 000160
 00000000 0000FFFF 03BB0327 0088028E 03210082 00000325 007C01A6 03200000 .. .Ï.|.X.....|.....'.£......... 000180
 03200000 00000000 FFFF0000 03200000 00000000 FFFF002E 0323009A 00170320  .....#.......... .......... . 0001A0
 0003001C 00020000 00020004 00020007 FFFF0000 0325008E 01770323 008800C5 é.|.#.w./.X..................... 0001C0
 000700A6 00020000 00060094 00020000 00050076 00020000 0004003A 00020000 ....:.......v...............Ï... 0001E0
```

```
Dump of file SATURN:[PCCOMMON.DUMP.DLL]SADGM.TMP;1 on 18-APR-1990 10:52:08.50
File ID (905,18,0)   End of file block 12 / Allocated 12

Virtual block number 12 (0000000C), 512 (0200) bytes

00000000 00000000 00000000 00000000 00000000 00000000 00080082 00020000 ....ÿ........................... 000000
00000000 00000000 00000000 00000000 00000000 00000000 00000000 00000000 ................................ 000020
00000000 00000000 00000000 00000000 00000000 00000000 00000000 00000000 ................................ 000040
00000000 00000000 00000000 00000000 00000000 00000000 00000000 00000000 ................................ 000060
00000000 00000000 00000000 00000000 00000000 00000000 00000000 00000000 ................................ 000080
00000000 00000000 00000000 00000000 00000000 00000000 00000000 00000000 ................................ 0000A0
00000000 00000000 00000000 00000000 00000000 00000000 00000000 00000000 ................................ 0000C0
00000000 00000000 00000000 00000000 00000000 00000000 00000000 00000000 ................................ 0000E0
00000000 00000000 00000000 00000000 00000000 00000000 00000000 00000000 ................................ 000100
00000000 00000000 00000000 00000000 00000000 00000000 00000000 00000000 ................................ 000120
00000000 00000000 00000000 00000000 00000000 00000000 00000000 00000000 ................................ 000140
00000000 00000000 00000000 00000000 00000000 00000000 00000000 00000000 ................................ 000160
00000000 00000000 00000000 00000000 00000000 00000000 00000000 00000000 ................................ 000180
00000000 00000000 00000000 00000000 00000000 00000000 00000000 00000000 ................................ 0001A0
00000000 00000000 00000000 00000000 00000000 00000000 00000000 00000000 ................................ 0001C0
00000000 00000000 00000000 00000000 00000000 00000000 00000000 00000000 ................................ 0001E0

Dump of file SATURN:[PCCOMMON.DUMP.DLL]SA-MERGE.DLL;1 on 18-APR-1990 10:51:16.75
File ID (417,12,0)   End of file block 105 / Allocated 108

Virtual block number 1 (00000001), 512 (0200) bytes

00000000 00000040 00000000 000000B8 0000FFFF 00000004 00000067 012E5A4D MZ..g...........|.......a....... 000000
00000080 00000000 00000000 00000000 00000000 00000000 00000000 00000000 ................................ 000020
6F6E6E61 63206D61 72676F72 70207369 685421CD 4C01B821 CD09B400 0EBA1F0E ..¤..Ç.ë|¡.LêIThis program canno 000040
00000000 00000024 0A0D0D2E 65646F6D 20534F44 206E6920 6E757220 65622074 t be run in DOS mode....$....... 000060
000C0011 00000000 000A0000 00000400 0000800E 79469EB3 00170476 0505454E NE..v...°.Fy.................... 000080
00000000 00000000 00010004 00040000 0000050D 01410129 000800C8 0040001E ..a.à.Ä.).A..................... 0000A0
209E0F00 209E038C 08EE0F00 08EE02C9 1DB20F00 1DB2000D 07EE0F00 07ED0053 S.Ú...Ý.Ï.ý...ý.è.Ý...Ý.... ...  0000C0
062C0F00 062C08D4 04620F00 0462088A 18CE0F00 18CE06C0 10FA0F00 10FA05AA ^.ª...ª.â.ö...ö...b...b.å.,...,. 0000E0
020C0E01 00000000 18DA0F00 18DA099A 000F0F00 000F0998 04E60F00 04E60945 E.Ì...Ì...........Ö...Ö......... 000100
02551EB1 02550CEA 00FC1EB1 00FCOCDA 00351EB1 00350C06 1C000F01 1A640B2E ..d.....■.5.Ý.5.Ö.■.Ý.■.õ.U.Ý.U. 000120
47524540 2D415308 00C80004 00640004 00210005 00110005 00FB1EB1 00FB0D10 ..«.Ý.«.......!...d...à..SA-MERG 000140
41465245 544E4945 4752454D 41531000 024C4C55 46454752 454D4153 0B000045 E...SAMERGEFULL...SAMERGEINTERFA 000160
4F4F5754 45475245 4D415311 00045340 50544143 45475245 4D415300 00034543 CE...SAMERGECATPMS...SAMERGETWOO 000180
28031002 C102AD02 54021C00 D1005D00 2E002500 1F000100 00055354 43454A42 BJECTS.......%...].Ì...T.Ù.è...( 0001A0
45544145 52435245 54464157 4F4C464F 464E494C 4D44166C 6D646D66 69060003 ...ifmdml.DMLINFOFLOWAFTERCREATE 0001C0
41454845 54414552 434D4540 004D454D 03534C4C 4143534F 44084E49 574D5005 .PMWIN.DOSCALLS.MEM.MEMCREATEHEA 0001E0

Dump of file SATURN:[PCCOMMON.DUMP.DLL]SA-MERGE.DLL;1 on 18-APR-1990 10:51:16.75
File ID (417,12,0)   End of file block 105 / Allocated 108

Virtual block number 2 (00000002), 512 (0200) bytes

47034B43 4F4C4243 4F4C4C41 4D454D0D 50414548 594F5254 5345444D 454D0E50 P.MEMDESTROYHEAP.MEMALLOCBLOCK.G 000000
54470A43 4F52504C 4F4F5446 45444954 470E4C4F 4F544C4C 49484954 47084954 TI.GTIKILLTOOL.GTIDEFTOOLPROC.GT 000020
51495447 12574F44 4E49574C 4F4F5459 52455551 49544712 47534D44 4E455349 ISENDMSG.GTIQUERYTOOLWINDOW.GTIQ 000040
12525450 41544144 58554154 45534954 47105254 50415441 44585541 59524555 UERYAUXDATAPTR.GTISETAUXDATAPTR. 000060
52495551 43414C4D 44006C6D 6403544E 45524150 4C4F4F54 59524555 51495447 GTIQUERYTOOLPARENT.dml.DMLACQUIR 000080
464C4D44 0C4E5854 504F5453 4C4D440A 4E585454 52415453 4C4D4408 4D544845 EHTM.DMLSTARTTXN.DMLSTOPTXN.DMLF 0000A0
4C4D440B 454C444E 41484C45 444F4D59 52455551 4C4D4413 4C45444F 4D454552 REEMODEL.DMLQUERYMODELHAND E.DML 0000C0
46595245 55514C4D 4400544E 554F4359 52455551 4C4D4400 49544759 52455551 QUERYGTI.DMLQUERYCOUNT.DMLQ. RYF 0000E0
4D440B54 4553454C 504D4953 4C4D440C 444C4549 46544553 4C4D440B 444C4549 IELD.DMLSETFIELD.DMLSIMPLESE1.DM 000100
4554414C 45524C4D 4409314E 4C525952 4555514C 4D440C4E 4C525952 4555514C LQUERYRLN.DMLQUERYRLN1.DMLRELATE 000120
52455551 4C4D4400 5453494C 45455246 4C4D440B 4554414C 45524E55 4C4D440B .DMLUNRELATE.DMLFREELIST.DMLQUER 000140
424C4C4F 524E5854 504F5453 4C4D4412 4554454C 45444C4D 44094449 4C4D4459 YDMLID.DMLDELETE.DMLSTOPTXNROLLB 000160
4D441554 53494C54 43454C45 53444552 4544524F 59524555 514C4D44 19484341 ACK.DMLQUERYORDEREDSELECTLIST.DM 000180
4C455245 4C504D49 534C4D44 13545349 4C544345 4C45534C 4C415952 4555514C LQUERYALLSELECTLIST.DMLSIMPLEREL 0001A0
454D0654 4F4C5345 54414C45 524E5545 4C504D49 534C4D44 15544F4C 53455441 ATESLOT.DMLSIMPLEUNRELATESLOT.ME 0001C0
4149544E 4154534E 49485445 4D5F1047 534D444E 45534854 454D5F0C 444F4854 THOD._METHSENDMSG._METHINSTANTIA 0001E0
```

```
Dump of file SATURN:[PCCOMMON.DUMP.DLL]SA-MERGE.DLL;1 on 18-APR-1990 10:51:16.75
File ID (417,12,0)   End of file block 105 / Allocated 108

Virtual block number 3 (00000003), 512 (0200) bytes

 414E4117 54554C41 4E410645 54414954 4E415453 4E494544 4854454D 5F124554 TE._METHDEINSTANTIATE.ANALUT.ANA 000000
 4D505445 4754554C 414E4113 53455441 4E494452 4F4F4354 53554A44 4154554C LUTADJUSTCOORDINATES.ANALUTGETPM 000020
 414E4111 4D554E44 4E455050 41454D41 4E54554C 414E4113 59524144 4E554F42 BOUNDARY.ANALUTNAMEAPPENDNUM.ANA 000040
 444E4957 5245544E 45434C54 550F4C54 55034552 41504D4F 43454D41 4E54554C LUTNAMECOMPARE.UTL.UTLCENTERWIND 000060
 434F5250 4554454C 45444D41 53104453 4554454C 45444D41 530B4D41 5303574F OW.SAM.SAMDELETESD.SAMDELETEPROC 000080
 45524F54 53455445 4C45444D 41530E57 4F4C4645 54454C45 444D4153 0D535345 ESS.SAMDELETEFLOW.SAMDELETESTORE 0000A0
 47485345 440E4B53 45444144 41530852 4F525245 53534543 4F52504D 41535F10 ._SAMPROCESSERROR.SADADESK.DESKG 0000C0
 02720306 03017403 08014554 49525753 4F44084F 49530345 4C49464F 52505445 ETPROFILE.SIO.DOSWRITE...t....r. 0000E0
 45475245 4D41530F 00006567 72654D20 41530800 00000003 02010A85 03000003 ..............SA Merge...SAMERGE 000100
 E90E468B DB8EFFFF B81E5657 0000F0C8 00000000 00000001 434F5250 4C4F4F54 TOOLPROC........àb..WV.|...Ä.F.Õ 000120
 0000FFFF 9A1076FF 1276FF00 00FFFF9A 0676FF08 76FF006A 1076FF12 76FF022C ,..v..v.j..v..v.......v..v...... 000140
 6A1076FF 1276FF00 00FFFF9A 006A006A 4B6A006A 01436800 CA681076 FF1276FF .v..v.hò.hC.j.jKj.j.......v..v.j 000160
 FF265777 FF26FC5E C45177FF 265377FF 26FC5EC4 FE5689FC 46890000 FFFF9A00 .......F•.V±á^•&.wS&.wQá^•&.wW&. 000180
 8B0007E9 03750000 30A84689 0000FFFF 9A5016FF 5C868059 77FF26FC 5EC45577 wUá^•&.wY..\..P......F´=..u.Õ... 0001A0
 6A006A01 ACE90000 FFFF9A50 16FF5C86 8D00CA68 1076FF12 76FF01CC E999A846 F´.Õä..v..v.hò...\..P.....Õ˜.j.j 0001C0
 1276FF01 6A006A00 00FFFF9A 5016AA46 80506A98 43680204 36FF2619 72068E00 ...r.&.6..hC.jP.F`.P.....j.j..v. 0001E0

Dump of file SATURN:[PCCOMMON.DUMP.DLL]SA-MERGE.DLL;1 on 18-APR-1990 10:51:16.75
File ID (417,12,0)   End of file block 105 / Allocated 108

Virtual block number 4 (00000004), 512 (0200) bytes

 76FF011A E90A468B 0171E900 00FFFF9A 206A006A 006A006A 5016AA46 8D1076FF .v..F`.Pj.j.j.j .....Õq..F.Õ...v 000000
 FF5C868D 4C6A00CA 681076FF 1276FFFE 5689FC46 89000000 529A006A 1076FF12 ..v.j..R....F•.V±.v..v.hò.jL..\. 000020
 1276FF01 6A006A00 0000A69A 0042681E 00CA6810 76FF1276 FF0000FF FF9A5016 .P......v..v.hò..hB..[...j.j..v. 000040
 FC5EC451 77FF2653 77FF26FC 5EC40000 FFFF9A50 520000FF FF9A00CA 681076FF .v.hò......RP.....á^•&.wS&.wQá^• 000060
 00003DA8 46890000 00809A50 16FF1086 805977FF 26FC5EC4 5577FF26 5777FF26 &.wW&.wUá^•&.wY.....P......F´=.. 000080
 00003D00 00FFFF9A 5016FF5C 86805016 FF10868D 00E6E999 A8468800 07E90375 u.Õ...F`.Õl......P..\..P.....=.. 0000A0
 FF26FC5E C45577FF 265777FF 26FC5EC4 5177FF26 5377FF26 FC5EC400 4DE90375 u.ÕM.á^•&.wS&.wQá^•&.wW&.wUá^•&. 0000C0
 76FF5016 FF5C868D 001AE903 7500003D A8468900 00FFFF9A 5016FF5C 86805977 wY..\..P......F´=..u.Õ....\..P.v 0000E0
 E9000001 FB9A016A 1076FF12 76FF0039 E90AC483 0000FFFF 9A1076FF 1276FFA8 ´.v..v.......á.Õ9..v..v.j..«...Õ 000100
 FEDEE903 7500013D 0013E900 16E90019 E90000FF FF9A026A 1076FF12 76FF0029 )..v..v.j......Õ..Õ..Õ..=..u.Õ8± 000120
 0876FF0A 76FF0C76 FF0E76FF 1076FF12 76FF003B E9FFE7E9 FFDAE903 7500023D •..u.ÕÕ.ÕÕ.Õ;..v..v..v..v..v..v. 000140
 3B3DFE5F E9037500 223DFEA2 E9037500 203D001B E90027E9 0000FFFF 9A0676FF .v......Õ'.Õ..= .u.ÕÅ±=".u.Õ_±=; 000160
 1E565700 0068C800 0ECAC95F 5E1F0000 E90000BA 000088FF C5E9FDBC E9037500 .u.Õ¥»Õé.¦..¤..Õ...^_èò..àh.¯WV. 000180
 76FF0000 00219A06 76FF0876 FF006A10 76FF1276 FF0540E9 0E4688D8 8E000888 ¦...Ä.F.Õã..v..v.j..v..v..!....v 0001A0
 26F85EC4 FA5689F8 46890000 00F79A00 6A1076FF 1276FF00 00002C9A 1076FF12 ..v..,....v..v.j..%....F%.V‡á^%& 0001C0
 46880007 E9037500 003D9846 890000FF FF9A5016 F2468D01 0887FF26 010AB7FF .ñ..&.ñ...F·.P......F.=..u.Õ...F 0001E0

Dump of file SATURN:[PCCOMMON.DUMP.DLL]SA-MERGE.DLL;1 on 18-APR-1990 10:51:16.75
File ID (417,12,0)   End of file block 105 / Allocated 108

Virtual block number 5 (00000005), 512 (0200) bytes

 9A5016FC 468D266A F276FFF4 76FF0108 B7FF2601 0AB7FF26 F85EC405 12E99998 ..Õ..á^%&.ñ..&.ñ...v¶.v·j&.F•.P. 000000
 46FF0003 E900009C 46C704E1 E9999846 880007E9 03750000 30984689 0000FFFF .....F.=..u.Õ...F..ÕÅ.úF...Õ...F 000020
 FF26010A B7FF26F8 5EC40088 E9037502 400B2600 8826FC76 C402E3C1 9C5E8B9C ..^.èD.áv•&..&.ã.u.Õ..á^%&.ñ..&. 000040
 5052004C 05FA568B F8468802 6A30FF26 0270FF26 FC76C402 E3C19C5E 88010887 ñ...^.èD.áv•&.p.&.0j..F%.V‡.L.RP 000060
 686E6A10 76FF1276 FF0480E9 9998468B 0007E903 7500003D 98468900 0001669A .f....F.=..u.Õ...F..Õ...v..v.jnh 000080
 6A1076FF 1276FF98 46890000 03A49A50 52004C05 FA568BF8 4688006A 006A0161 a.j.j..F%.V‡.L.RP.Ê....F..v..v.j 0000A0
 5EC4FF60 E9984689 00000045 9A505200 4C05FA56 8BF84688 006A006A 0161686F oha.j.j..F%.V‡.L.RP.E....F.Õ'.á^ 0000C0
 64686E6A 1076FF12 76FF0000 FFFF9AFC 76FFFE76 FF0108B7 FF26010A B7FF26F8 %&.ñ..&.ñ...v±.v•......v..v.jnhd 0000E0
 6A006A00 6A006A01 64686F6A 1076FF12 76FF0000 03F29A01 6A006A00 6A006A01 .j.j.j.j..·....v..v.johd.j.j.j.j 000100
 5EC40000 04969A00 6A006A01 6A006A01 2568666A 1076FF12 76FF0000 040A9A01 .......v..v.jfh%.j.j.j.j......á^ 000120
 A0468D50 6A984368 020436FF 26197206 8E006A00 6A03C3E9 000900E4 87C726F8 %&ú.Õ...Õü.j.j...r.&.6..hC.jP.F. 000140
 E19A206A 006A006A 006A5016 A0468D10 76FF1276 FF016A00 6A000000 C59A5016 .P.é...j.j..v..v..F..Pj.j.j.j .Å 000160
 89000006 E09A006A 1076FF12 76FF9A46 890C468B F646890A 46880388 E9000000 ...Õ...F..F-.F..F..v..v.j..Å.... 000180
 6A006A01 6568F676 FF1076FF 1276FF00 D8E99A46 880230E9 F64688FA 5689F846 F%.V‡.F-Õ0..F.ÕÄ..v..v..v-he.j.j 0001A0
 0000D22B 9E468801 6868F676 FF1076FF 1276FF9E 46890000 04C29A00 6A006A00 .j.j..ò....F..v..v..v-hh..F.+•.. 0001C0
 46886C6A 1076FF12 76FF0000 04F69A50 52004C05 FA568BF8 46885052 4CCA8300 ..òLRP.F%.V‡.L.RP.-....v..v.jl.F 0001E0
```

```
Dump of file SATURN:[PCCOMMON.DUMP.DLL]SA-MERGE.DLL;1 on 18-APR-1990 10:51:16.75
File ID (417,12,0)   End of file block 105 / Allocated 108

Virtual block number 6 (00000006), 512 (0200) bytes

 6A006A01 6568F676 FF1076FF 1276FF00 88E90000 053A9A50 52004C05 FA568BF8 %.V*.L.RP.:...ö...v..v..v-he.j.j 000000
 0000D22B 9E468B01 6868F676 FF1076FF 1276FF9E 46890000 05229A00 6A006A00 .j.j..*....F..v..v..v-hh..F.+@.. 000020
 46886C6A 1076FF12 76FF0000 058A9A50 52004C05 FA568BF8 46885052 4CCA8300 ..öLRP.F%.V*.L.RP......v..v.jl.F 000040
 439A016A 006A016A 006A206A 1076FF12 76FF0000 05CE9A50 52004C05 FA568BF8 %.V*.L.RP.ö....v..v.j j.j.j.j..C 000060
 88015FE9 0000E9FF 78E90375 00053DFF 20E90375 00013D00 13E90016 E9000006 ...ö..ö..=..u.ö .=..u.öx.ö..ö_.. 000080
 46890000 05869A00 6A006A00 6A006A01 6568F676 FF1076FF 1276FF00 D8E99A46 F,öÄ..v..v..v-he.j.j.j.j..Ñ..¯.F 0000A0
 FA568BF8 46885052 4CCA8300 0000D22B 9E468B01 6868F676 FF1076FF 1276FF9E ..v..v..v-hh..F.+@....öLRP.F%.V* 0000C0
 062E9A50 52009805 FA568BF8 468B6D6A 1076FF12 76FF0000 05EA9A50 52009805 ...RP.ö....v..v.jm.F%.V*...RP... 0000E0
 46890000 06169A00 6A006A00 6A006A01 6568F676 FF1076FF 1276FF00 88E90000 ..ö...v..v..v-he.j.j.j.j.. ....F 000100
 FA568BF8 46885052 4CCA8300 0000D22B 9E468B01 6868F676 FF1076FF 1276FF9E ..v..v..v-hh..F.+@....öLRP ¯%.V* 000120
 01259A50 52009805 FA568BF8 468B606A 1076FF12 76FF0000 03829A50 52009805 ...RP......v..v.jm.F%.V*...►'.%. 000140
 00013D00 13E90016 E90000FF FF9A016A 006A016A 006A206A 1076FF12 76FF0000 ...v..v.j j.j.j.j......ö..ö..=.. 000160
 E487C726 F85EC400 0DE99A46 88006BE9 0000E9FF 78E90375 00053DFF 20E90375 u.ö .=..u.öx.ö..ök..F.ö..á^½&ú.ö 000180
 87C726F8 5EC4000D E99A4688 004AE900 00E9FFEB E9037500 013D0008 E9000900 ...ö..=..u.öS.ö..öJ..F.ö..á^½&ú. 0001A0
 03750066 3D0023E9 0026E900 29E90000 E9FFEBE9 03750001 3D0008E9 000A00E4 ö...ö..=..u.öS.ö..ö).ö&.ö#.=f.u. 0001C0
 00E9FFD7 E9FEA4E9 0375006F 3DFDB8E9 0375006E 3DFFC9E9 03750067 3DFFB0E9 ö¯.=g.u.öè.=n.u.ö|»=o.u.öE±ö■.ö. 0001E0

Dump of file SATURN:[PCCOMMON.DUMP.DLL]SA-MERGE.DLL;1 on 18-APR-1990 10:51:16.75
File ID (417,12,0)   End of file block 105 / Allocated 108

Virtual block number 7 (00000007), 512 (0200) bytes

 1076FF12 76FFFA56 89F84689 000002A2 9A006A10 76FF1276 FF00AEE9 0A468801 ..F.öÜ..v..v.j..Å....F%.V*.v..v. 000000
 46884C6A 6D6A1076 FF1276FF 0000071A 9A505200 4C05FA56 8BF8468B 4C6A6C6A jljL.F%.V*.L.RP......v..v.jmjL.F 000020
 05FA568B F8468B50 52004C05 FA568BF8 46880000 01139A50 52009805 FA568BF8 %.V*...RP......F%.V*.L.RP.F%.V*. 000040
 6A004468 1E1076FF 1276FF01 6A006A00 1EE90374 00003000 0001899A 50520098 ..RP.....=..t.ö..j.j..v..v..hD.j 000060
 FF0029E9 00000778 9A016A10 76FF1276 FF0039E9 0000044F 9A206A00 6A006A00 .j.j.j .O...ö9..v..v.j..x...ö).. 000080
 00023DFF 4AE90375 00013000 13E90016 E90019E9 000001E8 9A026A10 76FF1276 v..v.j..Š...ö..ö..ö..=..u.öJ.=.. 0000A0
 0676FF08 76FF0A76 FF0C76FF 0E76FF10 76FF1276 FF0043E9 FFE7E9FF DAE90375 u.öö.öö.öC..v..v..v..v..v..v..v. 0000C0
 03750030 3DFC50E9 03750022 3DFF0EE9 03750020 3D0023E9 002FE900 0002349A .4...ö/.ö#.= .u.ö..=".u.öP==0.u. 0000E0
 0300150E CAC95F5E 1F0000E9 0000BA00 0088FFBD E9FAA0E9 0375003B 3DFC83E9 ö.==;.u.ö.*ö§.|..¤..ö...^ èö.... 000100
 03008600 0204DA01 03007F00 0203DA01 03007E00 02076801 03015C00 0602F002 .Þ...\...h...-...ö........ö...... 000120
 03009D00 02043301 03001300 02013701 03008800 02075801 03008700 02070001 .........X.......7.......3...... 000140
 03010700 0602BF02 03000000 00027100 02001F00 02046B01 03001E00 02028A01 .........k.......g.......¢...... 000160
 03004500 02054F01 0302FF00 0A01D802 03008300 0207B101 03018B00 0603C202 .ö.......ÿ...*...Å.......O...E.. 000180
 03014300 06018902 03013500 06035102 03004D00 02013E01 03029800 08073502 .5........>...M...Q...5...¿...C.. 0001A0
 89000088 D88EFFFF 881E5657 0002D4C8 00000000 00000000 0002B100 09029502 .....ÿ..........àå..WV.|...Ã|... 0001C0
 0007E903 7500003D FDC88689 0000FFFF 9A5016FD D2868D00 6AFDCA86 89FDCC86 .ä»..ö»j...@».P.......à»=..u.ö.. 0001E0

Dump of file SATURN:[PCCOMMON.DUMP.DLL]SA-MERGE.DLL;1 on 18-APR-1990 10:51:16.75
File ID (417,12,0)   End of file block 105 / Allocated 108

Virtual block number 8 (00000008), 512 (0200) bytes

 003DFDC8 86890000 FFFF9A50 16FC468D 010C685E 6AFDD286 FF0639E9 FDC8868B ..à»ö9..Ñ@»j^h...F=.P.......à»=. 000000
 16F8468D 0676FF08 76FF060A E9FDC886 880000FF FF9AFDD2 86FF0010 E9037500 .u.ö...Ñ@».......à»ö...v..v..F%. 000020
 E487C726 FC5EC405 E7E9FDC8 86880007 E9037500 003DFDC8 86890000 FFFF9A50 P.......à»=..u.ö....à»öö.á^=&ú.ö 000040
 C8868B00 07E90375 00003DFD C8868900 00FFFF9A FC76FFFE 76FFF876 FF000100 ....v%.v±.v=.......à»=..u.ö....à 000060
 3DF64689 0EC483FF FF00009A 0676FF08 76FF016A 006A006A 006A006A 05BCE9FD »ö¥.j.j.j.j.j..v..v.......á..F-= 000080
 FD2C868D 0584E900 008806C4 83000001 189A016A 006AF676 FF0015E9 03750000 ..u.ö...v-j.j.......á.|..ö....,» 0000A0
 E9037500 003DFDC8 86890CC4 83FFFF1C CE9A0676 FF0876FF 5016FDD4 86805016 .P..å».P.v..v..ö....á...à»=..u.ö 0000C0
 FF0676FF 0876FF05 47E9FDC8 868806C4 83000001 569A016A 006AFDC8 86FF0017 ...Ñà»j.j..V....á...à»öG..v..v.. 0000E0
 C886FF00 17E90375 00003DFD C8868900 00FFFF9A 5016F446 8DFD0486 FFFD0686 Ñ@».Ñå».F¶.P.......à»=..u.ö...Ñà 000100
 FF9A005E 681E0676 FF0876FF 050CE9FD C8868806 C4830000 01889A01 6A006AFD »j.j.......á...à»ö...v..v..h^... 000120
 8806C483 0000FFFF 9A016A00 6AFDC886 FF0017E9 03750000 3DFDC886 890000FF .....à»=..u.ö...Ñà»j.j.......á.. 000140
 868D486A 01046802 0436FF26 1974068E 006A006A 0305E9F4 4688040A E9FDC886 .à»öö..F¶ö..j.j...t.&.6..h..jK.. 000160
 16FD3086 8D486A01 04680204 36FF2619 74068E00 6A006A00 0001D29A 5016FDD8 Ä».P.@...j.j...t.&.6..h..jK..O». 000180
 0002189A 5016FE24 8680016A FD0486FF FD0686FF 0676FF08 76FF0000 02749A50 P.t....v..v..Ñ@».Ñå»j....$±.P.... 0001A0
 86FFFD2E 86FF0676 FF0876FF 046CE9FD C8868800 07E90375 00003DFD C8868900 ...à»=..u.ö....à»öl..v..v..Ñ.».Ñ 0001C0
 E9FDC886 880007E9 03750000 3DFDC886 89000002 AC9A5016 FD7C868D 016AFD2C ,»j...|».P.¯.....à»=..u.ö....à»ö 0001E0
```

```
Dump of file SATURN:[PCCOMMON.DUMP.DLL]SA-MERGE.DLL;1 on 18-APR-1990 10:51:16.75
File ID (417,12,0)   End of file block 105 / Allocated 108

Virtual block number 9 (00000009), 512 (0200) bytes

 0E06779A 0676FF08 76FFFD04 B6FFFD06 B6FFFD2C B6FFFD2E B6FF016A 016A043E >.j.j..Ñ.».Ñ,».Ñø».Ñå».v..v..w.. 000000
 D8868D4B 6A010068 020436FF 26197406 8E006A00 6A0269E9 FDC88689 10C48303 ..á...à»Õi.j.j...t.&.6..h..jK..Ä 000020
 5016FD30 868D4B6A 01006802 0436FF26 1974068E 006A006A 00000291 9A5016FD ».P.....j.j...t.&.6..h..jK..O».P 000040
 000002DA 9A5016FE 24868D01 6AFD04B6 FFFD06B6 FF0676FF 0876FF00 0003339A .3....v..v..Ñø».Ñå»j...$±.P.Õ... 000060
 2CB6FFFD 2EB6FF06 76FF0876 FF03ADE9 FDC88688 0007E903 7500003D FDC88689 ..à»=..u.Õ....à»ÕÜ..v..v..Ñ.».Ñ, 000080
 7FE9FDC8 86880007 E9037500 003DFDC8 86890000 03689A50 16FD7C86 8D016AFD »j...|».P.k.....à»=..u.Õ....à»Õ. 0000A0
 03CD08B7 9A0676FF 0876FFFD D4B6FFFD D6B6FFFD 2CB6FFFD 2EB6FF01 6A016A03 .j.j..Ñ.».Ñ,».Ñø».Ñå».v..v..ñ.ë. 0000C0
 FD08868D 4B6A0103 68020436 FF261974 068E006A 006A01AA E9FDC886 8910C483 .á...à»Õ¨.j.j...t.&.6..h..jK..Ä» 0000E0
 9A5016FD 30868D4B 6A010368 020436FF 26197406 8E006A00 6A000003 509A5016 .P.P...j.j...t.&.6..h..jK..O».P. 000100
 89000003 999A5016 FE24868D 016AFD04 B6FFFD06 B6FF0676 FF0876FF 000003F2 ·....v..v..Ñø».Ñå»j...$±.P...... 000120
 FD2CB6FF FD2EB6FF 0676FF08 76FF02EE E9FDC886 880007E9 03750000 3DFDC886 .à»=..u.Õ....à»ÕŸ..v..v..Ñ.».Ñ,» 000140
 02C0E9FD C8868800 07E90375 00003DFD C8868900 00FFFF9A 5016FD7C 8680016A j...|».P.......à»=..u.Õ....à»Õà. 000160
 83FFFF00 DB9A0676 FF0876FF FD04B6FF FD06B6FF FD2CB6FF FD2EB6FF 016A016A j.j..Ñ.».Ñ,».Ñø».Ñå».v..v..Û.... 000180
 16FDD886 8D4B6A01 02680204 36FF2619 74068E00 6A006A00 EBE9FDC8 868910C4 á...à»ÕŠ.j.j...t.&.6..h..jK..Ä». 0001A0
 FF9A5016 FD30868D 4B6A0102 68020436 FF261974 068E006A 006A0000 040F9A50 P.....j.j...t.&.6..h..jK..O».P.. 0001C0
 86890000 04589A50 16FE2486 8D016AFD D4B6FFFD D6B6FF06 76FF0876 FF0000FF ....v..v..Ñø».Ñå»j...$±.P.X..... 0001E0

Dump of file SATURN:[PCCOMMON.DUMP.DLL]SA-MERGE.DLL;1 on 18-APR-1990 10:51:16.75
File ID (417,12,0)   End of file block 105 / Allocated 108

Virtual block number 10 (0000000A), 512 (0200) bytes

 6AFD2C86 FFFD2EB6 FF0676FF 0876FF02 2FE9FDC8 86880007 E9037500 003DFDC8 à»=..u.Õ....à»Õ/..v..v..Ñ.».Ñ,»j 000000
 6A0201E9 FDC88688 0007E903 7500003D FDC88689 000001ED 9A5016FD 7C868D01 ...|».P.Ú.....à»=..u.Õ....à»Õ..j 000020
 C483024F 111C9A06 76FF0876 FFFD04B6 FFFD06B6 FFFD2CB6 FFFD2EB6 FF016A01 .j..Ñ.».Ñ,».Ñø».Ñå».v..v....O..á 000040
 28E90375 001F3DFC F3E90375 001E3000 23E90001 FDC886C7 002CE9FD C8868910 ...à»Õ,.ú.à»..Õ#.=..u.Õµ=*..u.Õ( 000060
 FF0027E9 03749824 FDC88E81 FFD4E9FD 9AE90375 00223DFE 61E90375 00213DFF .=|.u.Õa±=".u.Õ.»Õå../à»$.t.Õ'.. 000080
 C886C701 83E9FDC8 86880007 E9037500 003DFDC8 86890000 052E9A06 76FF0876 v..v.........à»=..u.Õ....à»Õ..ú.à 0000A0
 76FF0876 FFF476FF FD2CB6FF FD2EB6FF 014DE903 7400FDC8 BE830157 E90000FD »..ÕW../à».t.ÕM..Ñ.».Ñ,».v¶.v..v 0000C0
 FFFF9A06 76FF0876 FF0027E9 037402FD C8BE83FD C886890A C4830101 1D449A06 ..D....á...à»./à».t.Õ'..v..v.... 0000E0
 BE8300FF E90000FD C886C701 2BE9FDC8 86880007 E9037500 003DFDC8 86890000 ....à»=..u.Õ....à»Õ+.ú.à»..Õ.../ 000100
 880007E9 03750000 3DFDC886 890000FF FF9A0676 FF0876FF 00EEE903 7401FDC8 à».t.ÕŸ..v..v.........à»=..u.Õ... 000120
 8680506A 02006802 0436FF26 1974068E 006A006A 0000FDC8 86C700FA E9FDC886 .à»Õ".ú.à»..j.j...t.&.6..h..jP.. 000140
 16FDD886 8D5016FE 24868D50 16FD3086 8D5016FD 7C868000 0001859A 5016FE70 p±.P.ç.....|».P..O=.P..$±.P..Ä». 000160
 5016F846 8D0676FF 0876FF18 C483FFFF 00709A50 16FEC286 8D5016FE 70868D50 P..p±.P..ô±.P.p....á..v..v..F½.P 000180
 5016FA46 8DF876FF 0088E9FD C8868800 07E90375 00003DFD C8868900 0000729A .r.....à»=..u.Õ....à»Õ...v½.F".P 0001A0
 16FDCE86 8DFA76FF 0068E9FD C8868800 07E90375 00003DFD C8868900 00FFFF9A .......à»=..u.Õ....à»Õh..vª..õ». 0001C0
 CEB6FFFD D0B6FF00 47E9FDC8 86880007 E9037500 003DFDC8 86890000 FFFF9A50 P.......à»=..u.Õ....à»ÕG..ÑÅ».Ñö 0001E0

Dump of file SATURN:[PCCOMMON.DUMP.DLL]SA-MERGE.DLL;1 on 18-APR-1990 10:51:16.75
File ID (417,12,0)   End of file block 105 / Allocated 108

Virtual block number 11 (0000000B), 512 (0200) bytes

 D2B6FF00 23E9FDC8 86880007 E90000FF FF9A006A 006A5016 FEC2868D 1DB168FD »hŸ...ô±.Pj.j......Õ....à»Õ#..Ñ# 000000
 0000E9FD C8868800 07E9FDC8 86880007 E9037500 003DFDC8 86890000 005B9AFD ».[.....à»=..u.Õ....à»Õ.. 000020
 D19A5016 FA468D06 76FF0876 FFD88E00 08881E56 570000A2 C80004CA C95F5E1F .^_èò..àÅ..WV.¡....Ê.v..v..F".P.1 000040
 00FFFF9A 5016FC46 8DFA76FF 020EE9AA 46880006 E9037500 003DAA46 89000005 ....F^=..u.Õ...F^Õ...vª.F=.P..... 000060
 76FF1076 FF009AE9 03750014 7E8301F0 E9AA4688 0006E903 75000030 AA468900 ..F^=..u.Õ...F^Õb..-..u.Õ...v..v 000080
 E9037500 0030F846 890EC483 00C70000 9A0676FF 0876FF02 6A0A76FF 0C76FF0E ..v..v.j..v..v.....ú..á..F½=..u.Õ 0000A0
 00003DAA 46890000 07309A50 16AC468D 016A0A76 FF0C76FF 0676FF08 76FF0073 ª..v..v..v..v.j..F^.P.O....F^=.. 0000C0
 9A5016FF 5E868D01 6A0E76FF 1076FF06 76FF0876 FF0197E9 AA468800 06E90375 u.Õ...F^Õ...v..v..v..v.j...^..P. 0000E0
 5016AC46 8D5016FF 5E868D01 6DE9AA46 880006E9 03750000 30AA4689 0000042A *....F^=..u.Õ...F^Õm...^..P.F^.P 000100
 03740100 E4BF8326 FC5EC401 4DE99824 880EC483 0000000F 9A016A00 6AF876FF .v½j..Õ....á.¡$.ÕM.á^=&.¢Õ..t. 000120
 890EC483 05140000 9A0676FF 0876FF0A 76FF0C76 FF046A0E 76FF1076 FF005AE9 ÕZ..v..v.j..v..v..v..v.......á.. 000140
 76FF0A76 FF0C76FF 056A0E76 FF1076FF 0112E9AA 46880006 E9037500 003DAA46 F^=..u.Õ...F^Õ...v..v.j..v..v..v 000160
 1076FF00 E5E9AA46 880006E9 03750000 3DAA4689 0EC48307 E400009A 0676FF08 ..v..Õ..á..F^=..u.Õ...F^Õ¦..v. 000180
 75000030 AA46890E C4830811 00009A06 76FF0876 FF0A76FF 0C76FF06 6A0E76FF .v.j..v..v..v.......á..F^=..u 0001A0
 009A0676 FF0876FF 0A76FF0C 76FF076A 0E76FF10 76FF0088 E9AA4688 0006E903 .Õ...F^Õ¦..v..v.j..v..v..v..v.... 0001C0
 FF096A0E 76FF1076 FF0088E9 AA468800 06E90375 00003DAA 46890EC4 83083E00 .>..á..F^=..u.Õ...F^Õ...v..v.j.. 0001E0
```

```
Dump of file SATURN:[PCCOMMON.DUMP.DLL]SA-MERGE.DLL;1 on 18-APR-1990 10:51:16.75
File ID (417,12,0)   End of file block 105 / Allocated 108

Virtual block number 12 (0000000C), 512 (0200) bytes

 46880006 E9037500 003DAA46 890EC483 08680000 9A0676FF 0876FF0A 76FF0C76 v..v..v..v....k..á..F`=..u.Õ...F 000000
 0EC48307 8A00009A 0676FF08 76FF0A76 FF0C76FF 006A0E76 FF1076FF 005EE9AA `Õ^..v..v.j..v..v..v..v.......á. 000020
 0676FF08 76FF0022 E9037500 127E8300 31E9AA46 880006E9 03750000 3DAA4689 .F`=..u.Õ...F`Õ1..~..u.Õ"..v..v. 000040
 E9AA4688 0006E9AA 46880006 E9037500 003DAA46 890000FF FF9A0A76 FF0C76FF .v..v.......F`=..u.Õ...F`Õ...F`Õ 000060
 8F9A5016 FA468006 76FF0876 FF088E06 7FB81E56 570000B4 C8C8C95F 5E1F0000 ...^_èùàÇ..WV.¡...Ä.v..v..F¹.P.. 000080
 0006AD9A 5016FC46 80FA76FF 04F2E998 46880006 E9037500 003D9846 89000006 ....F̄.=..u.Õ...F.Õ·..vª.F=.P.Ü.. 0000A0
 76FF1076 FF009AE9 03750014 7E8304D4 E998468B 0006E903 7500003D 98468900 ..F.=..u.Õ...F.Õå..~..u.Õ...v..v 0000C0
 E9037500 003DF446 890EC483 06E20000 9A0676FF 0876FF03 6A0A76FF 0C76FF0E ..v..v.j..v..v....ã..á..F¶=..u.Õ 0000E0
 00003D98 46890000 09709A50 16A2468D 016A0A76 FF0C76FF 0676FF08 76FF0073 s..v..v..v..v.j..FÅ.P.p....F.=.. 000100
 9A5016FF 4C868001 6A0E76FF 1076FF06 76FF0876 FF047BE9 98468800 06E90375 u.Õ...F.Õ(..v..v..v..v.j...L..P. 000120
 5016A246 805016FF 4C868004 51E99846 880006E9 03750000 3D984689 00000706 .....F.=..u.Õ...F.ÕQ...L..P.FÅ.P 000140
 03740100 E4BF8326 FC5EC404 31E99824 880EC483 00000758 9A016A00 6AF476FF .v¶j.j..X....á.¡$.Õ1.á^=&.¢õ..t. 000160
 890EC483 09F70000 9A0676FF 0876FF0A 76FF0C76 FF126A0E 76FF1076 FF0087E9 Õ...v..v.j..v..v..v..v....%..á.. 000180
 76FF0A76 FF0C76FF 136A0E76 FF1076FF 03F6E998 46880006 E9037500 003D9846 F.=..u.Õ...F.Õ—..v..v.j..v..v..v 0001A0
 1076FF03 C9E99846 880006E9 03750000 3D984689 0EC4830A 2400009A 0676FF08 ..v....$..á..F.=..u.Õ...F.Õè..v. 0001C0
 7500003D 9846890E C4830A51 00009A06 76FF0876 FF0A76FF 0C76FF05 6A0E76FF .v.j..v..v..v....Q..á..F.=..u 0001E0

Dump of file SATURN:[PCCOMMON.DUMP.DLL]SA-MERGE.DLL;1 on 18-APR-1990 10:51:16.75
File ID (417,12,0)   End of file block 105 / Allocated 108

Virtual block number 13 (0000000D), 512 (0200) bytes

 009A0676 FF0876FF 0A76FF0C 76FF076A 0E76FF10 76FF039C E998468B 0006E903 .Õ...F.Õ...v..v.j..v..v..v..v... 000000
 FF086A0E 76FF1076 FF036FE9 98468800 06E90375 00003D98 46890EC4 830A7E00 .~..á..F.=..u.Õ...F.Õo..v..v.j.. 000020
 46880006 E9037500 003D9846 890EC483 0AA80000 9A0676FF 0876FF0A 76FF0C76 v..v..v..v....¨..á..F.=..u.Õ...F 000040
 0EC4830A D800009A 0676FF08 76FF0A76 FF0C76FF 086A0E76 FF1076FF 0342E998 .ÕB..v..v.j..v..v..v..v....Ä..á. 000060
 FF0A76FF 0C76FF14 6A0E76FF 1076FF03 15E99846 880006E9 03750000 3D984689 .F.=..u.Õ...F.Õ...v..v.j..v..v.. 000080
 76FF02E8 E998468B 0006E903 7500003D 9846890E C4830805 00009A06 76FF0876 v..v.......á..F.=..u.Õ...F.ÕÕ..v 0000A0
 00003D98 46890EC4 83083200 009A0676 FF0876FF 0A76FF0C 76FF166A 0E76FF10 ..v.j..v..v..v..v....2..á..F.=.. 0000C0
 9A0676FF 0876FF0A 76FF0C76 FF176A0E 76FF1076 FF02BBE9 98468800 06E90375 u.Õ...F.Õ£..v..v.j..v..v..v..v.. 0000E0
 186A0E76 FF1076FF 028EE998 46880006 E9037500 003D9846 890EC483 085F0000 .._..á..F.=..u.Õ...F.Õ...v..v.j. 000100
 880006E9 03750000 3D984689 0EC4830B 8C00009A 0676FF08 76FF0A76 FF0C76FF .v..v..v..v.......á..F.=..u.Õ... 000120
 C48307B7 01C39A06 76FF0876 FF0A76FF 0C76FF0A 6A0E76FF 1076FF02 61E99846 F.Õa..v..v.j..v..v..v..v..û.ñ..á 000140
 0A76FF0C 76FF0C6A 0E76FF10 76FF0234 E998468B 0006E903 7500003D 9846890E ..F.=..u.Õ...F.Õ4..v..v.j..v..v. 000160
 FF0207E9 98468800 06E90375 00003D98 46890EC4 830BE601 C39A0676 FF0876FF .v..v..û.Ì..á..F.=..u.Õ...F.Õ... 000180
 003D9846 890EC483 09CA01C3 9A0676FF 0876FF0A 76FF0C76 FF006A0E 76FF1076 v..v.j..v..v..v..v..û.ò..á..F.=. 0001A0
 9A5016EE 468D066A 0A76FF0C 76FF0676 FF0876FF 01DAE998 46880006 E9037500 .u.Õ...F.ÕÕ..v..v..v..v.j..FŸ.P. 0001C0
 76FF1076 FF0676FF 0876FF01 B1E99846 880006E9 03750000 3D984689 00000C39 9....F.=..u.Õ...F.ÕŸ..v..v..v..v 0001E0

Dump of file SATURN:[PCCOMMON.DUMP.DLL]SA-MERGE.DLL;1 on 18-APR-1990 10:51:16.75
File ID (417,12,0)   End of file block 105 / Allocated 108

Virtual block number 14 (0000000E), 512 (0200) bytes

 7E830188 E998468B 0006E903 75000030 98468900 0009469A 50169E46 8D066A0E .j..F..P.F....F.=..u.Õ...F.Õ...~ 000000
 FF0876FF 0A76FF0C 76FF0E76 FF1076FF 002BE903 75009E7E 830034E9 037500EE Ÿ.u.Õ4..~..u.Õ+..v..v..v..v..v.. 000020
 76FF0876 FF0148E9 98468800 06E90375 00003D98 46890CC4 83048C15 589A0676 v..[....á..F.=..u.Õ...F.ÕK..v..v 000040
 46880006 E9037500 003D9846 8900000D 259A5016 9A468D12 6A0E76FF 1076FF06 ..v..v.j..F..P.%....F.=..u.Õ...F 000060
 7502400B 2600B826 9A76C402 E3C1A05E 88A046FF 0003E900 00A046C7 0122E998 .Õ".úF...Õ...F..^.èÐ.áv.&..&.ã.u 000080
 16F64680 036A30FF 260270FF 269A76C4 02E3C1A0 5E880676 FF0876FF 00C0E903 .Õâ..v..v..^.èÐ.áv.&.p.&.0j..F-. 0000A0
 A05E8806 76FF0876 FF00CFE9 98468800 06E90375 00003D98 46890000 FFFF9A50 P......F.=..u.Õ...F.ÕÜ..v..v..^. 0000C0
 7500003D 98468900 00FFFF9A 5016F046 8D046A30 FF260270 FF269A76 C402E3C1 èÐ.áv.&.p.&.0j..Fþ.P......F.=..u 0000E0
 74025739 260035E9 03740739 26F8568B F6468BF0 5EC4009C E998468B 0006E903 .Õ...F.Õ..á^þ.F~.V½&9.t.Õ5.&9W.t 000100
 890000FF FF9A30FF 260270FF 269A76C4 02E3C1A0 5E880676 FF0876FF 002CE903 .Õ,..v..v..^.èÐ.áv.&.p.&.0...... 000120
 000DA19A F076FFF2 76FF0676 FF0876FF 0056E998 46880006 E9037500 003D9846 F.=..u.Õ...F.ÕV..v..v..v·.vþ.À.. 000140
 76FF0022 E9037500 127E8300 00FFFF9A 9A76FF9C 76FF0676 FF0876FF FF28E900 .Õ(..v..v..v..v.......~..u.Õ"..v 000160
 0006E998 46880006 E9037500 003D9846 890000FF FF9A0A76 FF0C76FF 0676FF08 ..v..v..v.......F.=..u.Õ...F.Õ.. 000180
 FA468006 76FF0876 FF088E08 8FB81E56 570000AA C8C8C95F 5E1F0000 E998468B .F.Õ...^_èùà`..WV.¡¢..Ä.v..v..F¹ 0001A0
 5016FC46 80FA76FF 030FE9A6 46880006 E9037500 003DA646 89000008 CF9A5016 .P.Ü....F̄Ì=..u.Õ...FÌÕ...vª.F=.P 0001C0
 FF009AE9 03750014 7E8302F1 E9A6468B 0006E903 75000030 A6468900 0008ED9A .Ü....F̄Ì=..u.Õ...FÌÕþ..~..u.Õ... 0001E0
```

```
Dump of file SATURN:[PCCOMMON.DUMP.DLL]SA-MERGE.DLL;1 on 18-APR-1990 10:51:16.75
File ID (417,12,0)   End of file block 105 / Allocated 108

Virtual block number 15 (0000000F), 512 (0200) bytes

 0030F846 890EC483 09220000 9A0676FF 0876FF05 6A0A76FF 0C76FF0E 76FF1076 v..v..v..v.j..v..v...."..á..F%=. 000000
 46890000 0E949A50 16A8468D 016A0A76 FF0C76FF 0676FF08 76FF0073 E9037500 .u.Õs..v..v..v..v.j..F´.P......F 000020
 56868D01 6A0E76FF 1076FF06 76FF0876 FF0298E9 A6468800 06E90375 00003DA6 Î=..u.Õ...FÎÕ...v..v..v..v.j...V 000040
 8D5016FF 56868D02 6EE9A646 880006E9 03750000 3DA64689 00000C10 9A5016FF ..P......FÎ=..u.Õ...FÎÕn...V..P. 000060
 E4BF8326 FC5EC402 4EE99824 B80EC483 00000998 9A016A00 6AFB76FF 5016A846 F´.P.v%j.j.......á.¡$.ÕN.á^=&.¢ð 000080
 0F180000 9A0676FF 0876FF0A 76FF0C76 FF046A0E 76FF1076 FF005AE9 03740100 ..t.Õz..v..v.j..v..v..v..v...... 0000A0
 FF0C76FF 056A0E76 FF1076FF 0213E9A6 46880006 E9037500 003DA646 890EC483 .á..FÎ=..u.Õ...FÎÕ...v..v.j..v.. 0000C0
 E6E9A646 880006E9 03750000 3DA64689 0EC4830F 4800009A 0676FF08 76FF0A76 v..v..v....H..á..FÎ=..u.Õ...FÎÕÎ 0000E0
 A646890E C4830F75 00009A06 76FF0876 FF0A76FF 0C76FF07 6A0E76FF 1076FF01 ..v..v.j..v..v..v..v....u..á..FÎ 000100
 FF0876FF 0A76FF0C 76FF086A 0E76FF10 76FF01B9 E9A64688 0006E903 7500003D =..u.Õ...FÎÕ¿..v..v.j..v..v..v.. 000120
 76FF1076 FF018CE9 A6468800 06E90375 00003DA6 46890EC4 830BB900 009A0676 v....¿..á..FÎ=..u.Õ...FÎÕ...v..v 000140
 E9037500 003DA646 890EC483 0FCF0000 9A0676FF 0876FF0A 76FF0C76 FF0F6A0E .j..v..v..v..v....ü..á..FÎ=..u.Õ 000160
 FC01C39A 0676FF08 76FF0A76 FF0C76FF 0A6A0E76 FF1076FF 015FE9A6 46880006 ...FÎÕ ..v..v.j..v..v..v..v..û.= 000180
 0C76FF08 6A0E76FF 1076FF01 32E9A646 880006E9 03750000 3DA64689 0EC4830F ..á..FÎ=..u.Õ...FÎÕ2..v..v.j..v. 0001A0
 E9A64688 0006E903 7500003D A646890E C4831029 01C39A06 76FF0876 FF0A76FF .v..v..v..û.)..á..FÎ=..u.Õ...FÎÕ 0001C0
 46890EC4 830EEE01 C39A0676 FF0876FF 0A76FF0C 76FF066A 0E76FF10 76FF0105 ...v..v.j..v..v..v..v..û.Ÿ..á..F 0001E0

Dump of file SATURN:[PCCOMMON.DUMP.DLL]SA-MERGE.DLL;1 on 18-APR-1990 10:51:16.75
File ID (417,12,0)   End of file block 105 / Allocated 108

Virtual block number 16 (00000010), 512 (0200) bytes

 A2468D12 6A0A76FF 0C76FF06 76FF0876 FF008E9 A6468800 06E90375 00003DA6 Î=..u.Õ...FÎÕÄ..v..v..v..v.j..FÅ 000000
 76FF0676 FF0876FF 00AFE9A6 46880006 E9037500 003DA646 89000010 7C9A5016 .P.|....FÎ=..u.Õ...FÎÕ€..v..v..v 000020
 86E9A646 880006E9 03750000 3DA64689 00000C9F 9A5016F4 468D126A 0E76FF10 ..v.j..F¶.P......FÎ=..u.Õ...FÎÕ. 000040
 FFFF0000 9A0676FF 0876FF37 FF260277 FF26A25E C437FF26 0277FF26 F45EC400 .á^¶&.w.&.7á^Å&.w.&.7.v..v...... 000060
 A276FFA4 76FF0676 FF0876FF 0053E9A6 46880006 E9037500 003DA646 890CC483 .á..FÎ=..u.Õ...FÎÕS..v..v..vÊ.vÅ 000080
 FF0022E9 03750012 7E830000 00809AF4 76FFF676 FF0676FF 0876FF00 0010E29A .ã....v..v..v~.v¶......~..u.Õ".. 0000A0
 06E9A646 880006E9 03750000 3DA64689 0000FFFF 9A0A76FF 0C76FF06 76FF0876 v..v..v..v.......FÎ=..u.Õ...FÎÕ. 0000C0
 46800676 FF0876FF D88E0DE3 881E5657 000080C8 CBC95F5E 1F0000E9 A6468800 ..FÎÕ...^ èüà¯..VV.¡D..Ä.v..v..F 0000E0
 16FC4680 FA76FF04 0DE99E46 880006E9 03750000 3D9E4689 000000F3 9A5016FA ª.P.µ....F̄.=..u.Õ...F.Õ...vª.F=. 000100
 009AE903 7500147E 8303EFE9 9E468800 06E90375 0000309E 46890000 0E119A50 P......F.=..u.Õ...F.Õÿ..~..u.Õ.. 000120
 3DF44689 0EC4830E 4600009A 0676FF08 76FF046A 0A76FF0C 76FF0E76 FF1076FF .v..v..v..v.j..v..v....F..á..F¶= 000140
 89000011 D59A5016 A8468D01 6A0A76FF 0C76FF06 76FF0876 FF0073E9 03750000 ..u.Õs..v..v..v..v.j..F´.P.Ì.... 000160
 868D016A 0E76FF10 76FF0676 FF0876FF 0396E99E 46880006 E9037500 003D9E46 F.=..u.Õ...F.Õ...v..v..v..v.j... 000180
 5016FF52 868D036C E99E4688 0006E903 7500003D 9E468900 000E6A9A 5016FF52 R..P.j....F.=..u.Õ...F.ÕL...R..P 0001A0
 0E76FF10 76FF034C E99824B8 0EC48300 000EBC9A 016A006A F476FF50 16A8468D .F´.P.v¶j.j..¥....á.¡$.ÕL..v..v. 0001C0
 06E90375 0000309E 46890EC4 83124E00 009A0676 FF0876FF 0A76FF0C 76FF066A j..v..v..v..v....N..á..F.=..u.Õ. 0001E0

Dump of file SATURN:[PCCOMMON.DUMP.DLL]SA-MERGE.DLL;1 on 18-APR-1990 10:51:16.75
File ID (417,12,0)   End of file block 105 / Allocated 108

Virtual block number 17 (00000011), 512 (0200) bytes

 127B0000 9A0676FF 0876FF0A 76FF0C76 FF076A0E 76FF1076 FF031FE9 9E468800 ..F.Õ...v..v.j..v..v..v..v....(. 000000
 FF0C76FF 006A0E76 FF1076FF 02F2E99E 46880006 E9037500 003D9E46 890EC483 .á..F.=..u.Õ...F.Õ·..v..v.j..v.. 000020
 C5E99E46 880006E9 03750000 3D9E4689 0EC48312 A800009A 0676FF08 76FF0A76 v..v..v....´..á..F.=..u.Õ...F.Õé 000040
 9E46890E C48312D5 01C39A06 76FF0876 FF0A76FF 0C76FF08 6A0E76FF 1076FF02 ..v..v.j..v..v..v..v..û.Ì..á..F. 000060
 FF0876FF 0A76FF0C 76FF096A 0E76FF10 76FF0298 E99E4688 0006E903 7500003D =..u.Õ...F.Õ...v..v.j..v..v..v.. 000080
 76FF1076 FF0268E9 9E468800 06E90375 0000309E 46890EC4 83130201 C39A0676 v..û....á..F.=..u.Õ...F.Õk..v..v 0000A0
 E9037500 003D9E46 890EC483 0FA201C3 9A0676FF 0876FF0A 76FF0C76 FF0E6A0E .j..v..v..v..v..û.Å..á..F.=..u.Õ 0000C0
 00001355 9A5016F6 468D0F6A 0A76FF0C 76FF0676 FF0876FF 023EE99E 46880006 ...F.Õ>..v..v..v..v.j..F-.P.U... 0000E0
 8D0F6A0E 76FF1076 FF0676FF 0876FF02 15E99E46 880006E9 03750000 3D9E4689 .F.=..u.Õ...F.Õ...v..v..v..v.j.. 000100
 E90000A2 46C701EC E99E4688 0006E903 7500003D 9E468900 0010539A 5016A446 FÊ.P.S....F.=..u.Õ...F.Õ§.úFÅ..Õ 000120
 0000FF50 86C70138 E9037502 40082600 8826F676 C402E3C1 A25E88A2 46FF0003 ...FÅ.^ÅèD.áv-&..&.@.u.Õ8.ú.P... 000140
 0057E903 7502400B 26008826 A476C402 E3C1A05E 8BA046FF 0003E900 00A046C7 úF...Õ...F..^.èD.ávÊ&..&.@ ú.ÕW. 000160
 26F676C4 02E3C1A2 5E8830FF 260270FF 26A476C4 02E3C1A0 5E885016 FF508680 ..P..P.^.èD.ávÊ&.p.&.0.^ÅèD 4v-& 000180
 06E90375 0000309E 468912C4 83150F02 819A0676 FF0876FF 016A30FF 260270FF .p.&.0j..v..v..Ÿ....á..F.=..u.Õ. 0001A0
 42E90375 00FF508E 83FF91E9 0003E900 03E90375 00FF508E 83015FE9 9E468800 ..F.Õ ../P..u.Õ..Õ..Õ.../P..u.Õ8 0001C0
 FF260270 FF26F676 C402E3C1 A25E8830 FF260270 FF26A476 C402E3C1 A05E8800 ..^.èD.ávÊ&.p.&.0.^ÅèD.áv-&.p.&. 0001E0
```

Dump of file SATURN:[PCCOMMON.DUMP.DLL]SA-MERGE.DLL;1 on 18-APR-1990 10:51:16.75
File ID (417,12,0)   End of file block 105 / Allocated 108

Virtual block number 18 (00000012), 512 (0200) bytes

```
 0106E99E 46880006 E9037500 0030E946 890CC483 10AE05F7 9A0676FF 0876FF30 0.v..v..%.Û..á..F.=..u.Õ...F.Õ.. 000000
 76FF0C76 FF026A30 FF260270 FF26F676 C402E3C1 A25E8806 76FF0876 FF006CE9 Õl..v..v..^ÀèD.áv-&.p.&.0j..v..v 000020
 880676FF 0876FF00 CDE99E46 880006E9 03750000 309E4689 0000FFFF 9A0F6A0A .j.......F.=..u.Õ...F.Õë..v..v.. 000040
 46890000 FFFF9A0F 6A0E76FF 1076FF02 6A30FF26 0270FF26 F676C402 E3C1A25E ^ÀèD.áv-&.p.&.0j..v..v.j.......F 000060
 E09AF676 FFF876FF 0676FF08 76FFFE80 E90097E9 9E468800 06E90375 00003D9E .=..u.Õ...F.Õ..Õ¯±.v..v..v½.v-.Å 000080
 E9037509 00E48F83 26FC5EC4 000010D1 9AA476FF A676FF06 76FF0876 FF000014 ....v..v..vÌ.vÊ.Ì...á^•&.¢Õ..u.Õ 0000A0
 211FC49A 0676FF08 76FF0E76 FF1076FF 0025E903 740A00E4 8F8326FC 5EC4000E ..á^•&.¢Õ..t.Õ%..v..v..v..v..á.I 0000C0
 76FF0022 E9037500 127E8300 31E99E46 880006E9 03750000 309E4689 08C48312 ..á..F.=..u.Õ...F.Õ1..~..u.Õ"..v 0000E0
 0006E99E 46880006 E9037500 0030E946 8900000D 689A0A76 FF0C76FF 0676FF08 ..v..v..v..k....F.=..u.Õ...F.Õ.. 000100
 0C76FF06 76FF0876 FFD88E11 24881E56 5700001E C8C8C95F 5E1F0000 E99E4688 .F.Õ...^_èùà...WV.¡$..Ä.v..v..v. 000120
 02EFE9EE 46880006 E9037500 0030EE46 89000015 A49A5016 F44680OF 6A0A76FF .v.j..F¶¯P.Ê....FŸ=..u.Õ...FŸÕÿ. 000140
 03750000 3DEE4689 00001627 9A5016E2 46800F6A 0E76FF10 76FF0676 FF0876FF .v..v..v..v.j..Fã.P.'....FŸ=..u. 000160
 00009A06 76FF0876 FFF476FF F676FF04 6AE276FF E476FF02 C6E9EE46 880006E9 Õ...FŸÕó..vÕ.vãj..v-.v¶.v..v.... 000180
 76FF156A E276FFE4 76FF0299 E9EE4688 0006E903 7500003D EE46890E C48315FD »..á..FŸ=..u.Õ...FŸÕ...vÕ.vãj..v 0001A0
 EE468800 06E90375 000030EE 46890EC4 83165E00 009A0676 FF0876FF F476FFF6 -.v¶.v..v....^..á..FŸ=..u.Õ...FŸ 0001C0
 0030EE46 89000016 889A5016 F0468D10 6AE276FF E476FF06 76FF0876 FF026CE9 Õl..v..v..vÕ.vãj..Fþ.P......FŸ=. 0001E0
```

Dump of file SATURN:[PCCOMMON.DUMP.DLL]SA-MERGE.DLL;1 on 18-APR-1990 10:51:16.75
File ID (417,12,0)   End of file block 105 / Allocated 108

Virtual block number 19 (00000013), 512 (0200) bytes

```
 FF106AE2 76FFE476 FF0030E9 0374F246 08F0468B 0243E9EE 46880006 E9037500 .u.Õ...FŸÕC..Fþ.F·t.ÕO..vÕ.vãj.. 000000
 46880006 E9037500 0030EE46 890EC483 13E101C3 9A0676FF 0876FFF4 76FFF676 v-.v¶.v..v..û.Ä..á..FŸ=..u.Õ...F 000020
 89000017 029A5016 FC468D10 6AF476FF F676FF06 76FF0876 FF00CFE9 020BE9EE ŸÕ..Õü..v..v..v-.v¶j..F=.?...... 000040
 76FF0876 FF009BE9 0375FE46 0BFC468B 010FE9EE 46880006 E9037500 003DEE46 FŸ=..u.Õ...FŸÕÕ..F=.F±u.Õ. .v..v 000060
 06E90375 00003DEE 46890000 14749A08 6AFC76FF FE76FF10 6AF476FF F676FF06 ..v-.v¶j..v±.v=j..t....FŸ=.. ·.Õ. 000080
 76FFEC56 89EA4689 F25688F0 46880038 E90375F2 460BF046 8801A8E9 EE468800 ..FŸÕ´..Fþ.F·u.Õ8..Fþ.V·.FÕ.Vš.v 0000A0
 06E90375 00003DEE 46890000 175A9A50 16F0468D 066AF076 FFF276FF 0676FF08 ..v..v·.vþj..Fþ.P.Z....FŸ=..u.Õ. 0000C0
 066AEA76 FFEC76FF 056AFC76 FFFE76FF 0676FF08 76FFFFBD E9016BE9 EE468800 ..FŸÕh.Õ§..v..v..v±.v=j..vš.vÕj. 0000E0
 FFE476FF 0676FF08 76FF0139 E9EE4688 0006E903 75000030 EE468900 0014AA9A .¯....FŸ=..u.Õ...FŸÕ9..v..v..vÕ. 000100
 880110E9 EE468800 06E90375 000030EE 46890000 0CF29A50 16E6468D 116AE276 vãj..FÌ.P.·....FŸ=..u.Õ...FŸÕ... 000120
 C39A0676 FF0876FF F476FFF6 76FF116A E276FFE4 76FF0030 E90374E8 460BE646 FÌ.FÕt.ÕO..vÕ.vãj..v-.v¶.v..v..û 000140
 0676FF08 76FF00CF E9000BE9 EE468800 06E90375 000030EE 46890EC4 83150001 .Å..á..FŸ=..u.Õ...FŸÕÅ.Õü..v..v. 000160
 EE468800 06E90375 000030EE 46890000 18359A50 16F8468D 116AF476 FFF676FF .v-.v¶j..F½.P.5....FŸ=..u.Õ...FŸ 000180
 FFFA76FF 116AF476 FFF676FF 0676FF08 76FF009B E90375FA 460BF846 8B00ACE9 Õ¯..F½.Fªu.Õ...v..v..v-.v¶j..vª. 0001A0
 E8460BE6 46880075 E9EE4688 0006E903 7500003D EE468900 0016C29A 086AF876 v½j..ò....FŸ=..u.Õ...FŸÕu..FÌ.FÒ 0001C0
 8D066AE6 76FFE876 FF0676FF 0876FFEC 5689EA46 89E8568B E6468800 38E90375 u.Õ8..FÌ.VÒ.FÕ.Vš.v..v..vÒ.vlj.. 0001E0
```

Dump of file SATURN:[PCCOMMON.DUMP.DLL]SA-MERGE.DLL;1 on 18-APR-1990 10:51:16.75
File ID (417,12,0)   End of file block 105 / Allocated 108

Virtual block number 20 (00000014), 512 (0200) bytes

```
 0876FFFF 8DE90035 E9EE4688 0006E903 7500003D EE468900 00157B9A 5016E646 FÌ.P.(....FŸ=..u.Õ...FŸÕ5.Õ§..v. 000000
 03750000 30EE4689 00001731 9A066AEA 76FFEC76 FF056AF8 76FFFA76 FF0676FF .v..vª.v½j..vš.vÕj..1....FŸ=..u. 000020
 D88E1563 881E5657 0000A2C8 C8C95F5E 1F0000E9 EE468800 06E9EE46 880006E9 Õ...FŸÕ...FŸÕ...^_èùàÅ..WV.¡c..Ä 000040
 79E9AA46 880006E9 03750000 30AA4689 00001134 9A5016FA 46800676 FF0876FF .v..v..Fª.P.4....F¯=..u.Õ...F´Õy 000060
 83015BE9 AA468800 06E90375 00003DAA 46890000 11529A50 16FC468D FA76FF01 ..vª.F•.P.R....F¯=..u.Õ...F´Õ[.. 000080
 8700009A 0676FF08 76FF066A 0A76FF0C 76FF0E76 FF1076FF 009AE903 7500147E -..u.Õ...v..v..v..v.j..v..v..... 0000A0
 AC468D01 6A0A76FF 0C76FF06 76FF0876 FF0073E9 03750000 30F84689 0EC48311 ..á..F½=..u.Õs..v..v..v..v.j..F¯ 0000C0
 76FF0676 FF0876FF 0102E9AA 46880006 E9037500 003DAA46 89000019 309A5016 .P.=....F´=..u.Õ...F´Õ...v..v..v 0000E0
 E9AA4688 0006E903 75000030 AA468900 0011AB9A 5016FF5E 8680016A 0E76FF10 ..v.j...^..P.¨....F´=..u.Õ...F´Õ 000100
 E99824B8 0EC48300 0011F09A 016A006A F876FF50 16AC468D 5016FF5E 86800008 Ä...^..P.F¯.P.v½j.j..»....á.¡$.Õ 000120
 46890EC4 83198600 009A0676 FF0876FF 0A76FF0C 76FF046A 0E76FF10 76FF0088 ¡..v..v.j..v..v..v..v....Ñ..á..F 000140
 0876FF0A 76FF0C76 FF056A0E 76FF1076 FF0088E9 AA468800 06E90375 000030AA ´=..u.Õ...F´Õ...v..v.j..v..v..v. 000160
 FF1076FF 005EE9AA 46880006 E9037500 003DAA46 890EC483 19E30000 9A0676FF .v....D..á..F´=..u.Õ...F´Õ^..v.. 000180
 03750000 3DAA4689 0EC48317 9100009A 0676FF08 76FF0A76 FF0C76FF 096A0E76 v.j..v..v..v..v.......á..F´=..u. 0001A0
 FF9A0A76 FF0C76FF 0676FF08 76FF0022 E9037500 127E8300 31E9AA46 880006E9 Õ...F´Õ1..-..u.Õ"..v..v..v..v... 0001C0
 C8C8C95F 5E1F0000 E9AA4688 0006E9AA 46880006 E9037500 003DAA46 890000FF ....F´=..u.Õ...F´Õ...F´Õ...^_èùà 0001E0
```

```
Dump of file SATURN:[PCCOMMON.DUMP.DLL]SA-MERGE.DLL;1 on 18-APR-1990 10:51:16.75
File ID (417,12,0)    End of file block 105 / Allocated 108

Virtual block number 21 (00000015), 512 (0200) bytes

 0030AA46 89000018 9C9A5016 FA468D06 76FF0876 FFD88E18 8CB81E56 570000A2 Å..WV.¡...Ä.v..v..F¹.P......F˜=. 000000
 7500003D AA468900 0018BA9A 5016FC46 8DFA76FF 01A6E9AA 46880006 E9037500 .u.Õ...F˜ÕÎ..v¹.F•.P.¤....F˜=..u 000020
 6A0A76FF 0C76FF0E 76FF1076 FF009AE9 03750014 7E830188 E9AA4688 0006E903 .Õ...F˜Õ...~..u.Õ...v..v..v..v.j 000040
 0676FF08 76FF0073 E9037500 003DF846 890EC483 18EF0000 9A0676FF 0876FF07 ..v..v....ÿ..á..F½=..u.Õs..v..v. 000060
 AA468800 06E90375 00003DAA 46890000 1AE89A50 16AC468D 016A0A76 FF0C76FF .v..v.j..F˜.P.Õ....F˜=..u.Õ...F˜ 000080
 3DAA4689 00001913 9A5016FF 5E868D01 6A0E76FF 1076FF06 76FF0876 FF012FE9 Õ/..v..v..v..v.j...^..P......F˜= 0000A0
 9A016A00 6AF876FF 5016AC46 8D5016FF 5E868D01 05E9AA46 880006E9 03750000 ..u.Õ...F˜Õ....^..P.F˜.P.v½j.j.. 0000C0
 76FF0876 FF0A76FF 0C76FF04 6A0E76FF 1076FF00 E5E99824 880EC483 00001965 e....á.¡$.ÕÎ..v..v.j..v..v..v..v 0000E0
 0E76FF10 76FF0088 E9AA4688 0006E903 7500003D AA46890E C4831861 00009A06 ....ª..á..F˜=..u.Õ...F˜Õ¦..v..v. 000100
 06E90375 00003DAA 46890EC4 83188E00 009A0676 FF0876FF 0A76FF0C 76FF056A j..v..v..v..v.......á..F˜=..u.Õ. 000120
 18880000 9A0676FF 0876FF0A 76FF0C76 FF066A0E 76FF1076 FF0088E9 AA468800 ..F˜Õ...v..v.j..v..v..v..v....£. 000140
 FF0C76FF 0A6A0E76 FF1076FF 005EE9AA 46880006 E9037500 003DAA46 890EC483 .á..F˜=..u.Õ...F˜Õ^..v..v.j..v.. 000160
 31E9AA46 880006E9 03750000 3DAA4689 0EC48319 8900009A 0676FF08 76FF0A76 v..v..v.......á..F˜=..u.’ ..F˜Õ1 000180
 003DAA46 8900001A 0F9A0A76 FF0C76FF 0676FF08 76FF0022 E9037500 127E8300 ..~..u.Õ"..v..v..v..v....  .F˜=. 0001A0
 37881E56 570000A2 C8CBC95F 5E1F0000 E9AA4688 0006E9AA 46880006 E9037500 .u.Õ...F˜Õ...F˜Õ...^_èùäÅ..w√.¡7 0001C0
 46880006 E9037500 0030AA46 8900001A 479A5016 FA468D06 76FF0876 FFD88E1A ..Ä.v..v..F¹.P.G....F˜=..u.Õ...F 0001E0

Dump of file SATURN:[PCCOMMON.DUMP.DLL]SA-MERGE.DLL;1 on 18-APR-1990 10:51:16.75
File ID (417,12,0)    End of file block 105 / Allocated 108

Virtual block number 22 (00000016), 512 (0200) bytes

 E9AA4688 0006E903 7500003D AA468900 001A659A 5016FC46 8DFA76FF 0179E9AA ˜Õy..v¹.F•.P.e....F˜=..u.Õ...F˜Õ 000000
 9A0676FF 0876FF08 6A0A76FF 0C76FF0E 76FF1076 FF009AE9 03750014 7E83015B [..~..u.Õ...v..v..v..v.j..v..v.. 000020
 016A0A76 FF0C76FF 0676FF08 76FF0073 E9037500 003DF846 890EC483 1A9A0000 .....á..F½=..u.Õs..v..v..v..v.j. 000040
 76FF0876 FF0102E9 AA468800 06E90375 00003DAA 46890000 1CC09A50 16AC468D .F˜.P.â....F˜=..u.Õ...F˜Õ...v..v 000060
 880006E9 03750000 3DAA4689 00001ABE 9A5016FF 5E868D01 6A0E76FF 1076FF06 ..v..v.j...^..P./....F˜=..u.Õ... 000080
 880EC483 00001810 9A016A00 6AF876FF 5016AC46 8D5016FF 5E868D00 D8E9AA46 F˜ÕÄ...^..P.F˜.P.v½j.j.......á.¡ 0000A0
 C4831D39 00009A06 76FF0876 FF0A76FF 0C76FF04 6A0E76FF 1076FF00 88E99824 $.Õ¦..v..v.j..v..v..v..v....9..á 0000C0
 0A76FF0C 76FF056A 0E76FF10 76FF0088 E9AA4688 0006E903 7500003D AA46890E ..F˜=..u.Õ...F˜Õ...v..v.j..v..v. 0000E0
 FF005EE9 AA468800 06E90375 00003DAA 46890EC4 831D6600 009A0676 FF0876FF .v..v....f..á..F˜=..u.Õ...F˜Õ^.. 000100
 003DAA46 890EC483 18340000 9A0676FF 0876FF0A 76FF0C76 FF096A0E 76FF1076 v..v.j..v..v..v..v....4..á..F˜=. 000120
 76FF0C76 FF0676FF 0876FF00 22E90375 00127E83 0031E9AA 46880006 E9037500 .u.Õ...F˜Õ1..~..u.Õ"..v..v..v..v 000140
 5F5E1F00 00E9AA46 880006E9 AA468800 06E90375 00003DAA 46890000 1BE79A0A ..Ó....F˜=..u.Õ...F˜Õ...F˜Õ...^_ 000160
 1D0C0002 00000003 143A0002 015C0006 132C0203 00000002 0C750002 0020CBC9 èù ...u.......,...\...:......... 000180
 055F0203 01680006 17BE0203 02C5000A 08970203 00E30006 016F0203 00000004 ......o...D.......é.../...h..._. 0001A0
 05C00002 01750006 18640203 00000009 1C720002 02D1000A 00B80203 00EF0006 ..ÿ...£...1...r.......d...u...ǎ. 0001C0
 15380203 017F0006 17F50203 00870005 06120203 00900002 05950103 00000008 ......................‰.......;. 0001E0

Dump of file SATURN:[PCCOMMON.DUMP.DLL]SA-MERGE.DLL;1 on 18-APR-1990 10:51:16.75
File ID (417,12,0)    End of file block 105 / Allocated 108

Virtual block number 23 (00000017), 512 (0200) bytes

 1C3D0203 02F0000A 10FC0203 01880006 14CF0203 00000000 1C0F0002 02E2000A ..ǎ...........Ü.......•...Þ...=. 000000
 1CE80203 0030000 2 063F0103 01180006 1C1F0203 01970006 013D0203 009A0005 ......=...............7...=...Ò. 000020
 04060203 01A50006 10920203 00AD0005 00900203 00320004 00200203 02FF000A ...... ...2.......Ù.......Ê...ø. 000040
 00460203 00BE0005 05F10203 01350006 1C960203 00400004 06520203 01AF0006 ..£...R...ª.......5...Þ.../...F. 000060
 FF0876FF DB8EFFFF B81E5657 000018C8 00000000 00000000 00000000 004F0004 ..O.............à...WV.¡...Ä.v.. 000080
 880006E9 03750000 3DF24689 00000049 9A5016F8 4680046A 0A76FF0C 76FF0676 v..v..v.j..F½.P.I....F·=..u.Õ... 0000A0
 F2468900 0001AC9A 5016EE46 80046A0E 76FF1076 FF0676FF 0876FF03 31E9F246 F·Õ1..v..v..v..v.j..FŸ.P.˜....F· 0000C0
 C402E3C1 F65E88F6 46FF0003 E90000F6 46C70308 E9F24688 0006E903 7500003D =..u.Õ...F·Õ..úF-..Õ...F-.^-èÐ.á 0000E0
 5E88F446 FF0003E9 0000F446 C70000E8 46C700F8 E9037502 40082600 8826F876 v½&..&.ª.u.Õ%.úFÒ..úF¶..Õ...F¶.^ 000100
 76C402E3 C1F45E88 5016E846 8D0055E9 03750240 08260088 26EE76C4 02E3C1F4 ¶èÐ.áv Ÿ&..&.ª.u.ÕU..FÒ.P.^¶èÐ.áv 000120
 0676FF08 76FF016A 30FF2602 70FF26F8 76C402E3 C1F65E88 30FF2602 70FF26EE Ÿ&.p.&.0.^-èÐ.áv½&.p.&.0j..v..v. 000140
 E9037500 E87E8302 7DE9F246 880006E9 03750000 3DF24689 12C48302 5F02819A .Ÿ._..á..F·=..u.Õ...F·Õ)..-Õ.u.Õ 000160
 F65E8806 76FF0876 FF006CE9 FF62E900 06E90375 00E87E83 FF93E900 03E90003 ..Õ˜.Õ...-Ò.u.Õ..Õb.ÕÌ..v..v..^- 000180
 3DF24689 000002F0 9A046A0A 76FF0C76 FF046A30 FF260270 FF26F876 C402E3C1 èÐ.áv½&.p.&.0j..v..v.j..Þ....F·= 0001A0
 0270FF26 F876C402 E3C1F65E 880676FF 0876FF02 29E9F246 880006E9 03750000 ..u.Õ...F·Õ)..v..v..^-èÐ.áv½&.p. 0001C0
 F2468800 06E90375 00003DF2 46890000 03269A04 6A0E76FF 1076FF04 6A30FF26 &.0j..v..v.j..&....F·=..u.Õ...F· 0001E0
```

```
Dump of file SATURN:[PCCOMMON.DUMP.DLL]SA-MERGE.DLL;1 on 18-APR-1990 10:51:16.75
File ID (417,12,0)   End of file block 105 / Allocated 108

Virtual block number 24 (00000018), 512 (0200) bytes

 F076FF06 76FF0876 FF000001 949AF876 FFFA76FF 0676FF08 76FFFEF0 E901F3E9 Õµ.ÕÞ±.v..v..v'.v½......v..v..vÞ 000000
 000001D5 9A5016EA 4680036A 0A76FF0C 76FF0676 FF0876FF 00000348 9AEE76FF .vŸ.K....v..v..v..v.j..Fõ.P.ſ... 000020
 8D036A0E 76FF1076 FF0676FF 0876FF01 A5E9F246 880006E9 03750000 3DF24689 .F·=..u.Õ...F·ÕE..v..v..v..v.j.. 000040
 E90000F6 46C7017C E9F24688 0006E903 75000030 F2468900 00FFFF9A 5016FC46 F=.P......F·=..u.Õ...F·Õ].úF-..Õ 000060
 C70000E8 46C70134 E9037502 400B2600 8B26EA76 C402E3C1 F65E88F6 46FF0003 ...F-.^-èD.ávõ&..&.ə.u.Õ4.úFÕ..ú 000080
 8D0055E9 03750240 0B26008B 26FC76C4 02E3C1F4 5E8BF446 FF0003E9 0000F446 F¶..Õ...F¶.^¶èD.áv=&..&.ə.u.ÕU.. 0000A0
 70FF26EA 76C402E3 C1F65E88 30FF2602 70FF26FC 76C402E3 C1F45E88 5016E846 FÒ.P.^¶èD.áv=&.p.&.0.^-èD.ávõ&.p 0000C0
 880006E9 03750000 3DF24689 12C483FF FF02B19A 0676FF08 76FF016A 30FF2602 .&.0j..v..v..Ÿ....á..F·=..u.Õ... 0000E0
 F45E8800 42E90375 00E87E83 FF93E900 03E90003 E9037500 E87E8300 F1E9F246 F·Õþ..-Õ.u.Õ..Õ..Õ...-Õ.u.Õ8..^¶ 000100
 0876FF30 FF260270 FF26EA76 C402E3C1 F65E8830 FF260270 FF26FC76 C402E3C1 èD.áv=&.p.&.0.^-èD.ávõ&.p.&.0.v. 000120
 FF006CE9 009AE9F2 46880006 E9037500 003DF246 890CC483 FFFF036B 9A0676FF .v..k....á..F·=..u.Õ...F·Õ..Õl.. 000140
 9A036A0A 76FF0C76 FF026A30 FF260270 FF26EA76 C402E3C1 F65E8806 76FF0876 v..v..^-èD.ávõ&.p.&.0j..v..v.j.. 000160
 E3C1F65E 880676FF 0876FF00 61E9F246 880006E9 03750000 3DF24689 0000FFFF .....F·=..u.Õ...F·Õa..v..v..^-èD 000180
 00003DF2 46890000 FFFF9A03 6A0E76FF 1076FF02 6A30FF26 0270FF26 EA76C402 .ávõ&.p.&.0j..v..v.j.......F·=.. 0001A0
 FF000003 5C9AEA76 FFEC76FF 0676FF08 76FFFEB4 E9002BE9 F2468800 06E90375 u.Õ...F·Õ+.ÕÇ±.v..v..v§.võ.\.... 0001C0
 57000018 C8CBC95F 5E1F0000 E9F24688 0000FFFF 9AFC76FF FE76FF06 76FF0876 v..v..v±.v=......F·Õ...^_èùà...W 0001E0

Dump of file SATURN:[PCCOMMON.DUMP.DLL]SA-MERGE.DLL;1 on 18-APR-1990 10:51:16.75
File ID (417,12,0)   End of file block 105 / Allocated 108

Virtual block number 25 (00000019), 512 (0200) bytes

 89000003 849A5016 F8468D03 6A0A76FF 0C76FF06 76FF0876 FFD88E00 08881E56 V.j...Å.v..v..v..v.j..F½.P.Ç.... 000000
 4680036A 0E76FF10 76FF0676 FF0876FF 0252E9F2 46880006 E9037500 0030F246 F·=..u.Õ...F·ÕR..v..v..v..v.j..F 000020
 FF0676FF 0876FF02 29E9F246 880006E9 03750000 3DF24689 00000020 9A5016EE Ÿ.P. ....F·=..u.Õ...F·Õ)..v..v.. 000040
 E9F24688 0006E903 75000030 F2468900 00038B9A 5016E846 8D046AFC 76FFFE76 v±.v=j..FÒ.P......F·=..u.Õ...F·Õ 000060
 E9037502 400B2600 8B26F876 C402E3C1 F65E88F6 46FF0003 E90000F6 46C70200 ..úF-..Õ...F-.^-èD.áv½&..&.ə.u.Õ 000080
 000030F2 46890000 FFFF9A50 16FC468D 026A0E76 FF1076FF 0676FF08 76FF01A7 Ĭ..v..v..v..v.j..F=.P......F·=.. 0000A0
 E3C1F45E 88F446FF 0003E900 00F446C7 0000EC46 C70187E9 F2468800 06E90375 u.Õ...F·Õñ.úF§..úF¶..Õ...F¶.^¶èD 0000C0
 FF26E876 C402E3C1 F45E8850 16EC468D 0055E903 7502400B 26008B26 E876C402 .ávÒ&..&.ə.u.ÕU..F§.P.^¶èD.ávÒ&. 0000E0
 02B19A06 76FF0876 FF016A30 FF260270 FF26F876 C402E3C1 F65E8830 FF260270 p.&.0.^-èD.áv½&.p.&.0j..v..v..Ÿ. 000100
 E90003E9 037500EC 7E83014C E9F24688 0006E903 75000030 F2468912 C4830516 ...á..F·=..u.Õ...F·ÕL..~§.u.Õ..Õ 000120
 46FF0003 E90000F4 46C70000 EC46C7FF 39E90003 E9037500 EC7E83FF 93E90003 ..Õ...-§.u.Õ..Õ9.úF§..úF¶..Õ...F 000140
 E3C1F45E 885016EC 46800055 E9037502 400B2600 8B26EE76 C402E3C1 F45E88F4 ¶.^¶èD.ávŸ&..&.ə.u.ÕU..F§.P.^¶èD 000160
 0876FF01 6A30FF26 0270FF26 F876C402 E3C1F65E 8830FF26 0270FF26 EE76C402 .ávŸ&.p.&.0.^-èD.áv½&.p.&.0j..v. 000180
 00EC7E83 00C6E9F2 46880006 E9037500 0030F246 8912C483 000302B1 9A0676FF .v..Ÿ.&..á..F·=..u.Õ...F·Õó..-§. 0001A0
 0676FF08 76FF006C E9FE83E9 0006E903 7500EC7E 83FF93E9 0003E900 03E90375 u.Õ..Õ..Õ...-§.u.Õ..Õ°±Õl..v..v. 0001C0
 89000001 289A036A 0A76FF0C 76FF046A 30FF2602 70FF26F8 76C402E3 C1F65E88 .^-èD.áv½&.p.&.0j..v..v.j..(.... 0001E0

Dump of file SATURN:[PCCOMMON.DUMP.DLL]SA-MERGE.DLL;1 on 18-APR-1990 10:51:16.75
File ID (417,12,0)   End of file block 105 / Allocated 108

Virtual block number 26 (0000001A), 512 (0200) bytes

 26F876C4 02E3C1F6 5E880676 FF0876FF 0072E9F2 46880006 E9037500 0030F246 F·=..u.Õ...F·Õr..v..v..^-èD.áv½& 000000
 0006E903 75000030 F2468900 00015E9A 036A0E76 FF1076FF 046A30FF 260270FF .p.&.0j..v..v.j..^....F·=..u.Õ.. 000020
 0676FF08 76FF0000 05D79AF8 76FFFA76 FF0676FF 0876FFFE 41E9003C E9F24688 .F·Õ<.ÕA±.v..v..v'.v½.■....v..v. 000040
 E9F24688 00000183 9AE876FF EA76FF06 76FF0876 FF000005 E89AEE76 FFF076FF .vÞ.vŸ.Õ....v..v..võ.vÕ......F·Õ 000060
 6A0A76FF 0C76FF06 76FF0876 FFD88E03 73881E56 57000018 C8CBC95F 5E1F0000 ...^_èùà...WV.¡s..Å.v..v..v..v.j 000080
 FF0876FF 0331E9F2 46880006 E9037500 0030F246 89000006 409A5016 F8468D04 ..F½.P.ə....F·=..u.Õ...F·Õ1..v.. 0000A0
 880006E9 03750000 3DF24689 0000030D 9A5016EE 4680046A 0E76FF10 76FF0676 v..v..v.j..FŸ.P.Ĭ....F·=..u.Õ... 0000C0
 02400B26 008B26F8 76C402E3 C1F65E88 F646FF00 03E90000 F646C703 08E9F246 F·Õ..úF-..Õ...F-.^-èD.áv½&..&.ə. 0000E0
 8B26EE76 C402E3C1 F45E88F4 46FF0003 E90000F4 46C70000 E846C700 F8E90375 u.Õ½.úFÕ..úF¶..Õ...F¶.^¶èD.ávŸ&. 000100
 8830FF26 0270FF26 EE76C402 E3C1F45E 885016E8 46800055 E9037502 400B2600 .&.ə.u.ÕU..FÒ.P.^¶èD.ávŸ&.p.&.0. 000120
 8912C483 049002B1 9A0676FF 0876FF01 6A30FF26 0270FF26 F876C402 E3C1F65E ^-èD.áv½&.p.&.0j..v..v..Ÿ....á.. 000140
 83FF93E9 0003E900 03E90375 00E87E83 027DE9F2 46880006 E9037500 0030F246 F·=..u.Õ...F·Õ)..-Õ.u.Õ..Õ..Õ... 000160
 70FF26F8 76C402E3 C1F65E88 0676FF08 76FF006C E9FF62E9 0006E903 7500E87E -Õ.u.Õ..Õb.Õl..v..v..^-èD.áv½&.p 000180
 46880006 E9037500 0030F246 89000005 689A046A 0A76FF0C 76FF046A 30FF2602 .&.0j..v..v.j..k....F·=..u.Õ...F 0001A0
 FF1076FF 046A30FF 260270FF 26F876C4 02E3C1F6 5E880676 FF0876FF 0229E9F2 ·Õ)..v..v..^-èD.áv½&.p.&.0j..v.. 0001C0
 0876FFFE F0E901F3 E9F24688 0006E903 75000030 F2468900 0005A19A 046A0E76 v.j..À....F·=..u.Õ...F·Õµ.Õþ±.v. 0001E0
```

Dump of file SATURN:[PCCOMMON.DUMP.DLL]SA-MERGE.DLL;1 on 18-APR-1990 10:51:16.75
File ID (417,12,0)   End of file block 105 / Allocated 108

Virtual block number 27 (0000001B), 512 (0200) bytes

```
FF000009 429AEE76 FFF076FF 0676FF08 76FF0000 07889AF8 76FFFA76 FF0676FF .v..v*.v%......v..v..vP.vŸ.B.... 000000
E9037500 0030F246 89000007 CC9A5016 EA468D03 6A0A76FF 0C76FF06 76FF0876 v..v..v..v.j..Fõ.P.à....F·=..u.Õ 000020
00000617 9A5016FC 468D036A 0E76FF10 76FF0676 FF0876FF 01A5E9F2 468B0006 ...F·ÕÊ..v..v..v..v.j..F=.P..... 000040
C1F65E8B F646FF00 03E90000 F646C701 7CE9F246 8B0006E9 03750000 30F24689 .F·=..u.Õ...F·Õ|.úF-..Õ...F-.^-è 000060
46FF0003 E90000F4 46C70000 E846C701 34E90375 02400B26 008B26EA 76C402E3 D.ávõ&..&.ə.u.Õ4.úFÒ..úF¶..Õ...F 000080
E3C1F45E 8B5016E8 468D0055 E9037502 40082600 8B26FC76 C402E3C1 F45E8BF4 ¶.^¶èD.áv=&..&.ə.u.ÕU..FÒ.P.^¶èD 0000A0
0876FF01 6A30FF26 0270FF26 EA76C402 E3C1F65E 8B30FF26 0270FF26 FC76C402 .áv=&.p.&.0.^-èD.ávõ&.p.&.0j..v. 0000C0
00E87E83 00F1E9F2 468B0006 E9037500 0030F246 8912C483 06CA02B1 9A0676FF .v..Ÿ.ò..á..F·=..u.Õ...F·Õp..-Õ. 0000E0
70FF26FC 76C402E3 C1F45E8B 0042E903 7500E87E 83FF93E9 0003E900 03E90375 u.Õ..Õ..Õ...~Õ.u.ÕB..^¶èD.áv=&.p 000100
83028609 629A0676 FF0876FF 30FF2602 70FF26EA 76C402E3 C1F65E8B 30FF2602 .&.0.^-èD.ávõ&.p.&.0.v..v..b.Å.. 000120
C1F65E8B 0676FF08 76FF006C E9009AE9 F2468B00 06E90375 000030F2 46890CC4 á..F·=..u.Õ...F·Õ..Õl..v..v..^-è 000140
0030F246 89000007 1F9A036A 0A76FF0C 76FF026A 30FF2602 70FF26EA 76C402E3 D.ávõ&.p.&.0j..v..v.j.......F·=. 000160
260270FF 26EA76C4 02E3C1F4 5E8B0676 FF0876FF 0061E9F2 468B0006 E9037500 .u.Õ...F·Õa..v..v..^¶èD.ávõ&.p.& 000180
E9F2468B 0006E903 75000030 F2468900 0007559A 036A0E76 FF1076FF 026A30FF .0j..v..v.j..U....F·=..u.Õ...F·Õ 0001A0
FFFE76FF 0676FF08 76FF0000 09539AEA 76FFEC76 FF0676FF 0876FFFE B4E9002B +.ÕÇ±.v..v..v$.võ.S....v..v..v±. 0001C0
76FFD88E 05FFB81E 56570000 18C8CBC9 5F5E1F00 00E9F246 8B000005 C69AFC76 v=.ó....F·Õ...^_èùà...WV.¡...Ä.v 0001E0
```

Dump of file SATURN:[PCCOMMON.DUMP.DLL]SA-MERGE.DLL;1 on 18-APR-1990 10:51:16.75
File ID (417,12,0)   End of file block 105 / Allocated 108

Virtual block number 28 (0000001C), 512 (0200) bytes

```
06E90375 000030F2 46890000 09AB9A50 16F8468D 036A0A76 FF0C76FF 0676FF08 ..v..v..v.j..F%.P.¨....F·=..u.Õ. 000000
89000009 D49A5016 EE468D03 6A0E76FF 1076FF06 76FF0876 FF0252E9 F2468B00 ..F·ÕR..v..v..v..v.j..FŸ.P.å.... 000020
468D046A FC76FFFE 76FF0676 FF0876FF 0229E9F2 468B0006 E9037500 0030F246 F·=..u.Õ...F·Õ)..v..v..v±.v=j..F 000040
03E90000 F646C702 00E9F246 8B0006E9 03750000 30F24689 000007A3 9A5016E8 Ò.P.Ê....F·=..u.Õ...F·Õ..úF-..Õ. 000060
FF0676FF 0876FF01 A7E90375 02400B26 008B26F8 76C402E3 C1F65E8B F646FF00 ..F-.^-èD.áv%&..&.ə.u.Õl..v..v.. 000080
E9F2468B 0006E903 7500003D F2468900 0004269A 5016FC46 8D026A0E 76FF1076 v..v.j..F=.P.&....F·=..u.Õ...F·Õ 0000A0
0B26008B 26E876C4 02E3C1F4 5E8BF446 FF0003E9 0000F446 C70000EC 46C701B7 ñ.úF$..úF¶..Õ...F¶.^¶èD.ávÕ&..&. 0000C0
C1F65E8B 30FF2602 70FF26E8 76C402E3 C1F45E8B 5016EC46 8D0055E9 03750240 ə.u.ÕU..F$.P.^¶èD.ávÕ&.p.&.0.^-è 0000E0
30F24689 12C4830B 0002B19A 0676FF08 76FF016A 30FF2602 70FF26F8 76C402E3 D.áv%&.p.&.0j..v..v..Ÿ....ó..F·= 000100
00EC7E83 FF93E900 03E90003 E9037500 EC7E8301 4CE9F246 8B0006E9 03750000 ..u.Õ...F·ÕL..-$.u.Õ..Õ..Õ...-$. 000120
76C402E3 C1F45E8B F446FF00 03E90000 F446C700 00EC46C7 FF39E900 03E90375 u.Õ..Õ9.úF$..úF¶..Õ...F¶.^¶èD.áv 000140
260270FF 26EE76C4 02E3C1F4 5E8B5016 EC468000 55E90375 02400B26 008B26EE Ÿ&..&.ə.u.ÕU..F$.P.^¶èD.ávŸ&.p.& 000160
83085602 819A0676 FF0876FF 016A30FF 260270FF 26F876C4 02E3C1F6 5E8B30FF .0.^-èD.áv%&.p.&.0j..v..v..Ÿ.V.. 000180
E90003E9 0003E903 7500EC7E 8300C6E9 F2468B00 06E90375 000030F2 468912C4 á..F·=..u.Õ...F·Õ6..-$.u.Õ..Õ..Õ 0001A0
F876C402 E3C1F65E 8B0676FF 0876FF00 6CE9FEB3 E90006E9 037500EC 7E83FF93 ...-$.u.Õ..Õ°±Õl..v..v..^-èD.áv% 0001C0
06E90375 000030F2 46890000 08E79A03 6A0A76FF 0C76FF04 6A30FF26 0270FF26 &.p.&.0j..v..v.j..Õ....F·=..u.Õ. 0001E0
```

Dump of file SATURN:[PCCOMMON.DUMP.DLL]SA-MERGE.DLL;1 on 18-APR-1990 10:51:16.75
File ID (417,12,0)   End of file block 105 / Allocated 108

Virtual block number 29 (0000001D), 512 (0200) bytes

```
FF046A30 FF260270 FF26F876 C402E3C1 F65E8B06 76FF0876 FF0072E9 F2468B00 ..F·Õr..v..v..^-èD.áv%&.p.&.0j.. 000000
FE41E900 3CE9F246 8B0006E9 03750000 30F24689 0000091D 9A036A0E 76FF1076 v..v.j.......F·=..u.Õ...F·Õ<.ÕA± 000020
0BDF9AEE 76FFF076 FF0676FF 0876FF00 0008CE9A F876FFFA 76FF0676 FF0876FF .v..v..v*.v%.ö....v..v..vP.vŸ.Õ. 000040
0008CBC9 5F5E1F00 00E9F246 8B000007 7A9AE876 FFEA76FF 0676FF08 76FF0000 ...v..v..võ.vÕ.z....F·Õ...^_èù.. 000060
01680006 0A1D0203 00000004 0A870002 015C0006 09820203 00000003 08AD0002 ..Ù...........\................h. 000080
01880006 08800203 00000000 096A0002 017F0006 08620203 01750006 08980203 ......u...b.......j.......§..... 0000A0
5016FA46 8D0E76FF 0A76FF0C 76FF0676 FF0876FF D88EFFFF B81E5657 00000CC8 à...WV.¡...Ä.v..v..v..v..v..F*.P 0000C0
02470B26 078B26FA 5EC4018B E9F6468B 0006E903 7500003D F6468900 00FFFF9A ......F-=..u.Õ...F-Õ..á^*&..&.G. 0000E0
0000889A 5016FE46 8D0A76FF 0C76FF06 76FF0876 FF0173E9 00008800 06E90374 t.Õ..¡..Õs..v..v..v..v..F±.P.... 000100
260277FF 26FA5EC4 0676FF08 76FF014C E9F6468B 0006E903 75000030 F6468900 ..F-=..u.Õ...F-ÕL..v..v.á^*&.w.& 000120
FA5EC401 21E9F646 8B0006E9 03750000 30F64689 000000C2 9A5016F4 468D37FF .7.F¶.P.ò....F-=..u.Õ...F-Õl.á^* 000140
16F4468D 37FF2602 77FF26FA 5EC40676 FF0876FF 002BE903 75024708 26078B26 &..&.G.u.Õ+..v..v.á^*&.w.&.7.F¶. 000160
FF0003E9 0000F846 C700E7E9 F6468B00 06E90375 000030F6 46890000 FFFF9A50 P......F-=..u.Õ...F-ÕÕ.úF%..Õ... 000180
0C76FF06 76FF0876 FF0080E9 03750240 0826008B 26FA76C4 02E3C1F8 5E8BF846 F%.^%èD.áv*&..&.ə.u.Õ¯..v..v..v. 0001A0
7E81F646 890000FF FF9A30FF 260270FF 26FA76C4 02E3C1F8 5E8B0E76 FF0A76FF .v..v..^%èD.áv*&.p.&.0......F-.- 0001C0
1276FF06 76FF0876 FF0087E9 F6468B00 06E90375 00F67E83 000FE903 7584A3F6 -Ê.u.Õ...—.u.Õ...F-Õ...v..v..v. 0001E0
```

```
Dump of file SATURN:[PCCOMMON.DUMP.DLL]SA-MERGE.DLL;1 on 18-APR-1990 10:51:16.75
File ID (417,12,0)   End of file block 105 / Allocated 108

Virtual block number 30 (0000001E), 512 (0200) bytes

 003DF646 890000FF FF9A30FF 260270FF 26FA76C4 02E3C1F8 5E880E76 FF1076FF .v..v..^%êD.áv'&.p.&.0......F-=. 000000
 FF26FA76 C402E3C1 F85E8800 2FE90374 1FF47E83 0052E9F6 46880006 E9037500 .u.Õ...F-ÕR..~¶.t.Õ/..^%êD.áv'&. 000020
 46880006 E9037500 003DF646 8908C483 FFFF1FC4 9A0676FF 0876FF30 FF260270 p.&.0.v..v..á....á..F-=..u.Õ...F 000040
 5E1F0000 E9F6468B 0000FFFF 9AFA76FF FC76FF06 76FF0876 FFFF38E9 001AE9F6 -Õ..Õ8..v..v..v=.v'......F-Õ...^ 000060
 46800E76 FF1076FF 1276FF06 76FF0876 FFD88E00 08881E56 57000006 C8C8C95F _èùà...WV.|...Ä.v..v..v..v..v..F 000080
 75FE460B FC468800 83E9FA46 8B0006E9 03750000 3DFA4689 0000021F 9A5016FC =.P......F'=..u.Õ...F'Õ"..F=.F±u 0000A0
 FF9A5016 FC46800E 76FF0A76 FF0C76FF 0676FF08 76FF00A2 E9000088 0006E903 .Õ..|..ÕÅ..v..v..v..v..v..F=.P.. 0000C0
 880006E9 0374FE46 08FC468B 0078E9FA 46880006 E9037500 003DFA46 890000FF ....F'=..u.Õ...F'Õx..F=.F±t.Õ..| 0000E0
 89000001 179AFC76 FFFE76FF 0E76FF0A 76FF0C76 FF0676FF 0876FF00 67E90000 ..Õg..v..v..v..v..v..v±.v=...... 000100
 76FF0876 FF0031E9 FA468800 06E90375 00FA7E83 000FE903 7584A3FA 7E81FA46 F'.~'Ê.u.Õ...~'.u.Õ...F'Õ1..v..v 000120
 0006E903 75000030 FA468900 0001579A FC76FFFE 76FF0E76 FF1076FF 1276FF06 ..v..v..v..v±.v=.W....F'=..u.Õ.. 000140
 0876FFD8 8E01C888 1E565700 009AC8C8 C95F5E1F 0000E9FA 46880006 E9FA468B .F'Õ...F'Õ...^_èùà...WV.|ù..Ä.v. 000160
 06E90375 0000308B 46890000 02FD9A50 16B8468D 0A76FF0C 76FF0E76 FF0676FF .v..v..v..v..FÇ.P.»....Fý=..u.Õ. 000180
 00FFFF9A 5016FF66 868D0A76 FF1076FF 1276FF06 76FF0876 FF005CE9 82468800 ..FýÕ\..v..v..v..v..v...f..P.... 0001A0
 FFFF9A50 16FF6686 8D501684 468D0031 E9824688 0006E903 75000030 82468900 ..Fý=..u.Õ...FýÕ1..FÇ.P..f..P... 0001C0
 82468800 0007C726 145EC400 08E90001 07C72614 5EC40008 E9037400 00300000 ..=..t.Õ..á^.&ú...Õ..á^.&ú....Fý 0001E0

Dump of file SATURN:[PCCOMMON.DUMP.DLL]SA-MERGE.DLL;1 on 18-APR-1990 10:51:16.75
File ID (417,12,0)   End of file block 105 / Allocated 108

Virtual block number 31 (0000001F), 512 (0200) bytes

 89260247 89260000 88145EC4 D88E0289 881E5657 00000CC8 C8C95F5E 1F0000E9 Õ...^_èùà...WV.|¿..Äá^.|..&.G.&. 000000
 03F846C7 0068E900 01FE46C7 0006F846 C7004AE9 0A468800 0007C726 185EC407 .á^.&Ũ....F.ÕJ.úF½..úF±..Õh.úF½. 000020
 0001FE46 C70004F8 46C7004E E90001FE 46C70005 F846C700 58E90001 FE46C700 .úF±..Õ[.úF½..úF±..ÕN.úF½..úF±.. 000040
 AEE90375 001E3D00 28E900F9 E90001B8 0034E900 01FE46C7 0013F846 C70041E9 ÕA.úF½..úF±..Õ4.|..Õ'.Õ+.=..u.ÕÛ 000060
 C2E90375 00233DFF A3E90375 00223DFF C5E90375 00213DFF C0E90375 001F3DFF .=..u.Õå.=!.u.Õé.=".u.ÕÈ.=#.u.Õò 000080
 F4468900 0000219A 5016FA46 8DF876FF 1076FF12 76FF0676 FF0876FF FFCCE9FF .Õä..v..v..v..v..v½.F'.P.!....F¶ 0000A0
 C402E3C1 F65E88F6 46FF0003 E90000F6 46C700A1 E9F4468B 0006E903 75000030 =..u.Õ...F¶ÕÀ.úF-..Õ...F-.^-êD.á 0000C0
 70FF26FA 76C402E3 C1F65E8B 1876FF1A 76FF006A E9037502 40082600 8B26FA76 v'&..&.ə.u.Õj..v..v..^-êD.áv'&.p 0000E0
 003DF446 8912C483 018E0281 9A0676FF 0876FFFE 76FF0C76 FF0E76FF 30FF2602 .&.0.v..v..v±.v..v..Ÿ....á..F¶=. 000100
 76C402E3 C1F65E88 0010E903 75003F83 26185EC4 0043E9F4 46880006 E9037500 .u.Õ...F¶ÕC.á^.&.7.u.Õ...^-êD.áv 000120
 76FF0676 FF0876FF FF7EE900 03E90257 89260789 26145EC4 02508826 008826FA '&..&.P.á^.&..&.W.Õ..Õ~..v..v..v 000140
 D88E0350 881E5657 000002C8 C8C95F5E 1F0000E9 F4468800 0001B49A FA76FFFC =.v'.Ç....F¶Õ...^_èùà...WV.|P..Ä 000160
 0876FF0A 76FF0C76 FF0E76FF 1076FF12 76FF1476 FF1676FF 1876FF00 00FE46C7 úF±...v..v..v..v..v..v..v..v..v. 000180
 FF2076FF 0045E9FE 46880006 E9037500 003DFE46 8914C483 05250546 9A0676FF .v..F.%..á..F±=..u.Õ...F±ÕE..v . 0001A0
 FF0876FF 37FF2602 77FF2612 5EC437FF 260277FF 26165EC4 1A76FF1C 76FF1E76 v..v..v.á^.&.w.&.7á^.&.w.&.7.v.. 0001C0
 00E9FE46 8B0006E9 FE468800 06E90375 00003DFE 468914C4 83045608 EE9A0676 v..Ÿ.V..á..F±=..u.Õ...F±Õ...F±Õ. 0001E0

Dump of file SATURN:[PCCOMMON.DUMP.DLL]SA-MERGE.DLL;1 on 18-APR-1990 10:51:16.75
File ID (417,12,0)   End of file block 105 / Allocated 108

Virtual block number 32 (00000020), 512 (0200) bytes

 6286C700 008046C7 0000FF0C 86C7D88E 048C881E 56570000 F4C8C8C9 5F5E1F00 ..^_èùà¶..WV.|¥..Äú.....úF¯..ú.b 000000
 0876FF07 89260247 89260000 88165EC4 07892602 47892600 0088125E C40000FF ...ã^.|..&.G.&..á^.|..&.G.&...v. 000020
 E9037500 003DFF0E 86890000 02D29A50 16FF1486 8D026A0E 76FF1076 FF0676FF .v..v..v.j......P.@.......=..u.Õ 000040
 0A76FF0C 76FF0676 FF0876FF 0335E9FF 0E868800 0005E09A 0676FF08 76FF0012 ...v..v..Å.......Õ5..v..v..v..v. 000060
 9A0676FF 0876FF00 12E90375 00003DFF 0E868900 0003F99A 5016FF10 868D066A j......P.'.......=..u.Õ...v..v.. 000080
 C402E3C1 FF609E88 FF6086FF 0004E900 00FF6086 C702FEE9 FF0E8688 0000FFFF ........Õ±.ú.'...Õ....'...'.êD.á 0000A0
 FF1086C4 02E3C1FF 609E8806 76FF0876 FF00F4E9 03750240 08260088 26FF1086 Ñ..&..&.ə.u.Õ¶..v..v...'.êD.áÑ.. 0000C0
 0012E903 7500003D FF0E8689 00000672 9A5016FF 64868001 6A30FF26 0270FF26 &.p.&.0j...d..P.r.......=..u.Õ.. 0000E0
 C402E3C1 FF609E88 0676FF08 76FF0297 E9FF0E86 88000006 899A0676 FF0876FF .v..v..........Õ...v..v...'.êD.á 000100
 E9037500 003DFF0E 86890000 07389A50 16FE468D 086A30FF 260270FF 26FF1086 Ñ..&.p.&.0j..F±.P.;.......=..u.Õ 000120
 5016FF64 86805016 FF14868D 0255E9FF 0E868800 0007529A 0676FF08 76FF0012 ...v..v..R.......ÕU......P..d..P 000140
 FF609E88 0000FF62 86C70025 E9037401 FE7E8300 53E90374 00003D00 0008499A .I...=..t.ÕS..~±.t.Õ%.ú.b.....'. 000160
 2CFF6286 C70022E9 02578926 07892612 5EC40250 88260088 26FF1086 C402E3C1 êD.áÑ..&..&.P.á^.&..&.W.Õ".ú.b., 000180
 0003E902 57892607 8926125E C4025088 26008826 FF1086C4 02E3C1FF 609E8898 ...'.êD.áÑ..&..&.P.á^.&..&.W.Õ.. 0001A0
 0007E903 7500FF62 8E830000 088A9AFF 1086FFFF 1286FF06 76FF0876 FFFEF1E9 Õp±.v..v..Ñ...Ñ...ɑ..../b..u.Õ.. 0001C0
 89000007 D99A5016 82468D02 6A0A76FF 0C76FF06 76FF0876 FF01C2E9 FF628688 ..b.Õó..v..v..v..v.j..Fý.P.1.... 0001E0
```

```
Dump of file SATURN:[PCCOMMON.DUMP.DLL]SA-MERGE.DLL;1 on 18-APR-1990 10:51:16.75
File ID (417,12,0)   End of file block 105 / Allocated 108

Virtual block number 33 (00000021), 512 (0200) bytes

 0876FF01 8CE9FF0E 86880000 07899A06 76FF0876 FF0012E9 03750000 3DFF0E86 ...=..u.Õ...v..v..........Õ...v. 000000
 E9037500 003DFF0E 86890000 05C99A50 16FF1086 8D066A0E 76FF1076 FF0676FF .v..v..v.j......P.è.......=..u.Õ 000020
 6086FF00 04E90000 FF6086C7 0155E9FF 0E868800 0007F09A 0676FF08 76FF0012 ...v..v..Þ.......ÕU.ú.'...Õ....' 000040
 9E880676 FF0876FF 00F3E903 75024008 26008826 FF1086C4 02E3C1FF 609E88FF ...'.èÐ.áÑ..&..&.ã.u.Õ¤..v..v... 000060
 0E868900 0008189A 5016FF64 868D016A 30FF2602 70FF26FF 1086C402 E3C1FF60 '.èÐ.áÑ..&.p.&.0j...d..P........ 000080
 76FF0876 FF00EEE9 FF0E8688 00000832 9A0676FF 0876FF00 12E90375 000030FF .=..u.Õ...v..v..2.......ÕŸ..v..v 0000A0
 89000005 929A5016 FE468D08 6A30FF26 0270FF26 FF1086C4 02E3C1FF 609E8806 ...'.èÐ.áÑ..&.p.&.0j..F±.P...... 0000C0
 B2468D00 ACE9FF0E 86880000 05A99A06 76FF0876 FF0012E9 03750000 3DFF0E86 ...=..u.Õ...v..v..`.......Õ¯..Fý 0000E0
 86C70025 E9037401 FE7E8300 53E90374 00003D00 00031E9A 5016FF64 868D5016 .P..d..P.....=..t.ÕS..~±.t.Õ%.ú. 000100
 02578926 07892616 5EC40250 88260088 26FF1086 C402E3C1 FF609E88 0000FF62 b.....'.èÐ.áÑ..&..&.P.á^.&..&.W. 000120
 8926165E C4025088 26008826 FF1086C4 02E3C1FF 609E8898 20FF6286 C70022E9 Õ".ú.b.-...'.èÐ.áÑ..&..&.P.á^.&. 000140
 5EC40000 04A59AFF 1086FFFF 1286FF06 76FF0876 FFFEF2E9 0003E902 57892607 .&.W.Õ..Õ·±.v..v..Ñ...Ñ...Ë...á^ 000160
 FF6286C7 0006E903 74024708 26078826 165EC400 0FE90375 02470826 07882612 .&..&.G.u.Õ..á^.&..&.G.t.Õ..ú.b. 000180
 0000FF54 86C7D88E 054E881E 56570000 ACC8C8C9 5F5E1F00 00E9FF62 8688982A *...b.Õ...^_èùà¯..WV.¦N..Äú.T... 0001A0
 0676FF08 76FF0789 26024789 26000088 165EC407 89260247 89260000 88125EC4 á^.|..&.G.&¯.á^.|..&.G.&...v..v. 0001C0
 EE468800 06E90375 00003DEE 46890000 FFFF9A50 16F4468D 046A0A76 FF0C76FF .v..v.j..F¶.P......FŸ=..u.Õ...FŸ 0001E0

Dump of file SATURN:[PCCOMMON.DUMP.DLL]SA-MERGE.DLL;1 on 18-APR-1990 10:51:16.75
File ID (417,12,0)   End of file block 105 / Allocated 108

Virtual block number 34 (00000022), 512 (0200) bytes

 0014E903 7D00F67E 83001DE9 02A2E998 2E880009 E90374F6 4608F446 8802B3E9 Õ°..F¶.F-t.Õ..¡..ÕÅ.Õ...—.).Õ.. 000000
 0A76FF0C 76FF0676 FF0876FF 0282E998 44880006 E9037701 F47E8300 09E9037E -.Õ...-¶.w.Õ..¡D.Õ...v..v..v..v. 000020
 F67E8302 59E9EE46 880006E9 03750000 30EE4689 000009CE 9A5016F4 468D056A j..F¶.P.ö....FŸ=..u.Õ...FŸÕY..—— 000040
 0676FF08 76FF023C E99845B8 0006E903 7700F47E 830009E9 037E0014 E9037D00 .).Õ..-.Õ...-¶.w.Õ..¡E.Õ<..v..v. 000060
 EE468800 06E90375 000030EE 46890000 0A289A50 16F4468D 056A0E76 FF1076FF .v..v.j..F¶.P.(....FŸ=..u.Õ...FŸ 000080
 0014E903 7D00F67E 83001DE9 0202E998 30880009 E90374F6 4608F446 880213E9 Õ...F¶.F-t.Õ..¡0.Õ..Õ...—.).Õ.. 0000A0
 0E76FF10 76FF0676 FF0876FF 01E2E998 31880006 E9037701 F47E8300 09E9037E -.Õ...-¶.w.Õ..¡1.Õä..v..v..v..v. 0000C0
 F67E8301 B9E9EE46 880006E9 03750000 30EE4689 0000092E 9A5016F4 468D046A j..F¶.P......FŸ=..u.Õ...F'Õ¿..—— 0000E0
 0676FF08 76FF019C E9984688 0006E903 7700F47E 830009E9 037E0014 E9037D00 .).Õ..-.Õ...-¶.w.Õ..¡F.Õ...v..v. 000100
 EE468800 06E90375 000030EE 46890000 0A979A50 16FC468D 046A0A76 FF0C76FF .v..v.j..F=.P......FŸ=..u.Õ...FŸ 000120
 0030EE46 89000007 729A5016 F8468D05 6A0E76FF 1076FF06 76FF0876 FF0173E9 Õs..v..v..v..v.j..F½.P.r....FŸ=. 000140
 FC76C402 E3C1F25E 88F246FF 0003E900 00F246C7 014AE9EE 46880006 E9037500 .u.Õ...FŸÕJ.úF·..Õ...F·.^·èÐ.áv= 000160
 260270FF 26FC76C4 02E3C1F2 5E880676 FF0876FF 00EFE903 75024008 26008826 &..&.ã.u.Õÿ..v..v..^·èÐ.áv=&.p.& 000180
 C700F7E9 EE468800 06E90375 000030EE 46890000 083E9A50 16A2468D 016A30FF .0j..FÅ.P.>....FŸ=..u.Õ...FŸÕ¼.ú 0001A0
 FF008CE9 03750240 0826008B 26F876C4 02E3C1F0 5E88F046 FF0003E9 0000F046 FÞ..Õ...FÞ.^ÞèÐ.áv½&..&.ã.u.Õ... 0001C0
 06309A50 16FF5686 80016A30 FF260270 FF26F876 C402E3C1 F05E8806 76FF0876 v..v..^ÞèÐ.áv½&.p.&.0j...V..P.0. 0001E0

Dump of file SATURN:[PCCOMMON.DUMP.DLL]SA-MERGE.DLL;1 on 18-APR-1990 10:51:16.75
File ID (417,12,0)   End of file block 105 / Allocated 108

Virtual block number 35 (00000023), 512 (0200) bytes

 A19A5016 FF568680 5016A246 8D00A3E9 EE468800 06E90375 000030EE 46890000 ...FŸ=..u.Õ...FŸÕÈ..FÅ.P..V..P.À 000000
 50882600 8826FC76 C402E3C1 F25E8800 01FF5486 C7003DE9 03740000 30000006 ...=..t.Õ=.ú.T....^·èÐ.áv=&..&.P 000020
 8926165E C4025088 26008826 F876C402 E3C1F05E 88025789 26078926 125EC402 .á^.&..&.W..^ÞèÐ.áv½&..&.P.á^.&. 000040
 76FF0876 FFFEF9E9 0003E900 03E90375 00FF548E 83FF5CE9 0003E902 57892607 .&.W.Õ..Õ\../T..u.Õ..Õ..Õ'±.v..v 000060
 54BE8300 0007129A F876FFFA 76FF0676 FF0876FF 000008D9 9AFC76FF FE76FF06 ..v±.v=.)....v..v..v'.v½......ƒT 000080
 570000A8 C8C8C95F 5E1F0000 E9000088 0006E900 09E9982B 880009E9 037400FF ..t.Õ..|+.Õ..Õ..¡..Õ...^_èùà´..W 0000A0
 A6468900 00005D9A 5016AC46 8D0A76FF 0C76FF06 76FF0876 FF088E08 F6881E56 V.¦-..Ã.v..v..v..v..F¯.P¯)....FÌ 0000C0
 53E90006 AE46C700 01FC46C7 0030E9AC 4688018A E9A6468B 0006E903 75000030 =..u.Õ...FÌÕ...F¯Õ=.úF=..úFÛ..ÕS 0000E0
 0001FC46 C70039E9 0005AE46 C70001FC 46C70046 E90003AE 46C70001 FC46C700 .úF=..úFÛ..ÕF.úF=..úFÛ..Õ9.úF=.. 000100
 CDE90375 001F30FF B8E90375 001E3D00 23E9014A E90001B8 002CE900 04AE46C7 úFÛ..Õ..¡..ÕJ.Õ#.=..u.ÕE.=..u.Õë 000120
 0A76FF0C 76FF0676 FF0876FF FFD4E9FF B0E90375 00223DFF D2E90375 00213DFF .=!.u.Õ@.=".u.Õ¯.Õå..v..v..v..v. 000140
 8D00F9E9 A6468800 06E90375 000030A6 46890000 0AEA9A50 16FF5A86 8DFC76FF .v=..Z..P.õ....FÌ=..u.Õ...FÌÕ'.. 000160
 A8468D50 16FF5886 800001FE 46C708C4 8300AD00 109A5016 B0468D50 16FF5A86 .Z..P.F¯.P...Ù..á.úF±....X..P.F´ 000180
 8916C483 04E60348 9A0676FF 0876FFAC 76FF0A76 FF0C76FF 0E76FF10 76FF5016 .P.v..v..v..v..v¯.v..v..H.Ì..á.. 0001A0
 5016FF5A 868D0054 E9037500 FF588E83 00A8E9A6 46880006 E9037500 0030A646 FÌ=..u.Õ...FÌÕ´../X..u.ÕT...Z..P 0001C0
 76FF007A E9A6468B 0006E903 75000030 A6468900 00FFFF9A FE76FF50 1680468D .F¯.P.v±......FÌ=..u.Õ...FÌÕz..v 0001E0
```

```
Dump of file SATURN:[PCCOMMON.DUMP.DLL]SA-MERGE.DLL;1 on 18-APR-1990 10:51:16.75
File ID (417,12,0)   End of file block 105 / Allocated 108

Virtual block number 36 (00000024), 512 (0200) bytes

E9037500 003DA646 89000000 8A9A5016 B0468DFC 76FF0A76 FF0C76FF 0676FF08 ..v..v..v..v•.F¯.P......Fl  .u.Õ 000000
0A76FF0C 76FF0676 FF0876FF FF63E900 03E90003 E9FE46FF 0050E9A6 46880006 ...FlÕP..F±Õ..Õ..Õc..v..v..   .v. 000020
800019E9 A6468B00 06E90375 000030A6 46890000 FFFF9A50 16FF5A86 8DFC76FF .v•;.Z..P......Fl=..u.Õ...FlÕ... 000040
0022C8CB C95F5E1F 0000E9A6 468808C4 83FFFF00 109A1276 FF1476FF 50168046 F¯.P.v..v.......á..FlÕ...^_èùà". 000060
46890000 FFFF9A50 16FA468D 0676FF08 76FF0000 F046C708 8E0C03B8 1E565700 .WV.¡...ÄúFÞ...v..v..F*.P.¯.....F 000080
3DE04689 0000FFFF 9A5016FC 468DFA76 FF03C7E9 E0468B00 06E90375 00003DE0 Å=..u.Õ...FÅÕú..v*.F•.P......FÅ= 0000A0
199A5016 E646800A 76FF0C76 FF0676FF 0876FF03 A9E9E046 8B0006E9 03750000 ..u.Õ...FÅÕ`..v..v..v..v..Fl.P.. 0000C0
76FF006A 006A0304 E9E6468B 0382E9E0 46880006 E9037500 003DE046 8900000C ....FÅ=..u.Õ...FÅÕ...FlÕ..j.j..v 0000E0
C4830000 0EF29A00 6A566A50 16E2468D 0676FF08 76FF0E76 FF1076FF 1276FF14 ..v..v..v..v..v..Fã.PjVj..·....á 000100
76FF0A76 FF0C76FF E276FFE4 76FF0344 E9E0468B 0006E903 7500003D E0468918 ..FÅ=..u.Õ...FÅÕD..vÕ.vã.v..v..v 000120
0316E9E0 46880006 E9037500 003DE046 890EC483 0F220000 9A0676FF 0876FFE6 l.v..v...."..á..FÅ=..u.Õ...FÅÕ.. 000140
00000F54 9A016A03 6AE276FF E476FF50 5200EE05 FE568BFC 46880676 FF0876FF .v..v..F•.V±.Ÿ.RP.vÕ.vãj.j..T... 000160
FF1076FF 1276FF14 76FF016A 028DE902 E5E9E046 8B0006E9 03750000 3DE04689 .FÅ=..u.Õ...FÅÕl.Õ..j..v..v..v.. 000180
75000030 E0468916 C4830000 FFFF9A00 6A576A50 16E2468D 0676FF08 76FF0E76 v..v..v..Fã.PjWj.......á..FÅ=..u 0001A0
9A0676FF 0876FFE6 76FF0A76 FF0C76FF E276FFE4 76FF02AC E9E0468B 0006E903 .Õ...FÅÕ¯..vÕ.vã.v..v..vl.v..v.. 0001C0
46880676 FF0876FF 027EE9E0 46880006 E9037500 003DE046 890EC483 FFFF0000 .....á..FÅ=..u.Õ...FÅÕ~..v..v..F 0001E0

Dump of file SATURN:[PCCOMMON.DUMP.DLL]SA-MERGE.DLL;1 on 18-APR-1990 10:51:16.75
File ID (417,12,0)   End of file block 105 / Allocated 108

Virtual block number 37 (00000025), 512 (0200) bytes

03750000 3DE04689 0000FFFF 9A016A03 6AE276FF E476FF50 5200EE05 FE5688FC •.V±.Ÿ.RP.vÕ.vãj.j.......FÅ=..u. 000000
9A5016F2 4680036A 0A76FF0C 76FF0676 FF0876FF 01F5E902 4DE9E046 8B0006E9 Õ...FÅÕM.Õ%..v..v..v..v.j..F·.P. 000020
76FF0C76 FF0676FF 0876FF02 21E9E046 8B0006E9 03750000 3DE04689 000001E4 Õ....FÅ=..u.Õ...FÅÕl..v..v..v..v 000040
468001F8 E9E0468B 0006E903 7500003D E0468900 000A6E9A 5016F646 80046A0A .j..F~.P.n....FÅ=..u.Õ...FÅÕ%..F 000060
3DE04689 10C48310 0A030A9A 0676FF08 76FFF276 FFF476FF 5016E846 805016F0 Þ.P.FÒ.P.v¶.v·.v..v.......á..FÅ= 000080
FF260277 FF26F65E C45016EC 46805016 F0468001 C9E9E046 8B0006E9 03750000 ..u.Õ...FÅÕè..FÞ.P.F§.Pá^-&.w.&. 0000A0
0196E9E0 46880006 E9037500 003DE046 8910C483 1178030A 9A0676FF 0876FF37 7.v..v....x..á..FÅ=..u.Õ...FÅÕ.. 0000C0
EA76FFEC 76FFEE76 FF1276FF 1476FF00 000BC89A F676FFF8 76FF0676 FF0876FF .v..v..v½.v~.à....v..v..vŸ.vš.vÕ 0000E0
1CC48300 0010BB9A 006A596A 5016E246 800676FF 0876FF0E 76FF1076 FFE876FF .vÒ.v..v..v..v..Fã.PjYj..£....á. 000100
0876FF0A 76FF0C76 FFE276FF E476FF01 45E9E046 8B0006E9 03750000 3DE04689 .FÅ=..u.Õ...FÅÕE..vÕ.vã.v..v..v. 000120
FF00C2E9 011AE9E0 46880006 E9037500 003DE046 890CC483 10EB00C8 9A0676FF .v..à.Š..á..FÅ=..u.Õ...FÅÕ..Õó.. 000140
8300000E 5A9A006A 586A5016 E2468006 76FF0876 FF0E76FF 1076FF12 76FF1476 v..v..v..v..v..v..Fã.PjXj..Z.... 000160
FF0A76FF 0C76FFE2 76FFE476 FF00E3E9 E0468B00 06E90375 00003DE0 468914C4 á..FÅ=..u.Õ...FÅÕD..vÕ.vã.v..v.. 000180
B5E9E046 8B0006E9 03750000 3DE04689 0EC4830E 8A00009A 0676FF08 76FFE676 vl.v..v.......á..FÅ=..u.Õ...FÅÕç 0001A0
000EBC9A 016A036A E276FFE4 76FF5052 00EE05FE 5688FC46 8B0676FF 0876FF00 ..v..v..F•.V±.Ÿ.RP.vÕ.vãj.j..¥.. 0001C0
1E300023 E90078E9 00018800 2CE90084 E9E0468B 0006E903 7500003D E0468900 ..FÅ=..u.Õ...FÅÕ..Õ,.¡..Õ(.Õ#.=. 0001E0

Dump of file SATURN:[PCCOMMON.DUMP.DLL]SA-MERGE.DLL;1 on 18-APR-1990 10:51:16.75
File ID (417,12,0)   End of file block 105 / Allocated 108

Virtual block number 38 (00000026), 512 (0200) bytes

D4E9F076 E9037500 2230FF49 E9037500 2130FE1E E9037500 1F3DFCF4 E9037500 .u.Õ¶==..u.Õ.±=l.u.Õl.=".u.Õv»Õå 000000
E046890E C483FFFF 01949A06 76FF0876 FF0A76FF 0C76FFE2 76FFE476 FF006AFF .j..vÕ.vã.v..v..v..v.......á..FÅ 000020
0C76FF06 76FF0876 FF0019E9 03750016 7E830028 E9E0468B 0006E903 7500003D =..u.Õ...FÅÕ(..~..u.Õ...v..v..v. 000040
57000004 C8CBC95F 5E1F0000 E9E0468B E0468900 00FFFF9A 50160E46 8D0A76FF .v..F8.P......FÅ.FÅÕ...^_èùà...W 000060
76FF0C76 FF0676FF 0876FF00 27E90375 00FE7E83 0001FE46 C7D88E0D C5B81E56 V.¡é..ÄúF±...-±.u.Õ'..v.¯v..v..v 000080
D704409A 001FE9FC 46880006 E9037500 0030FC46 890AC483 0000FFFF 9A006A0A .j.......á..F•=..u.Õ...F•Õ...ã.■ 0000A0
CBC95F5E 1F0000E9 FC468900 00B80009 E9FC4688 0006E903 75000030 FC46890F ..F•=..u.Õ...F•Õ..¡...F•Õ...^_èù 0000C0
76FF0C76 FF50169E 46805016 AA468D00 00AA46C7 D88E11C3 B81E5657 000068C8 àh..WV.¡û..ÄúF˙...F˙.P.F..P.v..v 0000E0
030FE998 46880006 E9037500 00309846 8910C483 1279030A 9A0676FF 0876FF0A ..v..v....y..á..F.=..u.Õ...F.Õ.. 000100
468910C4 8311FF03 0A9A0676 FF0876FF 1276FF14 76FF5016 9A468050 16AA468D .F˙.P.F..P.v..v..v..v.......á..F 000120
AC468001 6A1276FF 1476FF06 76FF0876 FF02E0E9 98468B00 06E90375 00003098 .=..u.Õ...F.ÕÀ..v..v..v..v.j..F¯ 000140
76FF0676 FF0876FF 02B7E998 46880006 E9037500 00309846 8900000C AA9A5016 .P.˙....F.=..u.Õ...F.Õñ..v..v..v 000160
8EE99846 8B0006E9 03750000 30984689 0000131E 9A5016F8 4680036A 9A76FF9C ..v.j..F½.P......F.=..u.Õ...F.Õ. 000180
75000030 98468900 0013479A 5016FC46 80046A9A 76FF9C76 FF0676FF 0876FF02 ..v..v..v..v.j..F•.P.G....F.=..u 0001A0
0F809A50 16A2468D 036A1676 FF1876FF 0676FF08 76FF0265 E998468B 0006E903 .Õ...F.Õe..v..v..v..v.j..FÅ.P... 0001C0
6A1676FF 1876FF06 76FF0876 FF023CE9 98468B00 06E90375 00003098 46890000 ...F.=..u.Õ...F.Õ<..v..v..v..v.j 0001E0
```

Dump of file SATURN:[PCCOMMON.DUMP.DLL]SA-MERGE.DLL;1 on 18-APR-1990 10:51:16.75
File ID (417,12,0)   End of file block 105 / Allocated 108

Virtual block number 39 (00000027), 512 (0200) bytes

```
FF0876FF 0213E998 46880006 E9037500 00309846 8900000F A99A5016 A6468004 ..Fl.P.`....F.=..u.Ō...F.Ō...v.. 000000
75000030 98468900 0013EF9A 37FF2602 77FF26FC 5EC4046A 9A76FF9C 76FF0676 v..v..v.j.á^=&.w.&.7.ÿ....F.=..u 000020
260277FF 26A65EC4 046A9A76 FF9C76FF 0676FF08 76FF01E5 E9984688 0006E903 .Ō...F.Ōl..v..v..v..v.j.á^l&.w.& 000040
76FF0676 FF0876FF 01B7E998 46880006 E9037500 00309846 89000014 199A37FF .7.......F.=..u.Ō...F.Ōñ..v..v..v 000060
0676FF08 76FF0000 15219AA6 76FFA876 FF0676FF 0876FF00 0013069A FC76FFFE ±.v=.ø.....v..v..v´.vl.l....v..v. 000080
46880006 E9037500 00309846 89000002 5B9AA276 FFA476FF 036A1676 FF1876FF .v..v.j...vÉ.vÅ.[....F.=..u.Ō...F 0000A0
98468900 0002919A F876FFFA 76FF036A 1676FF18 76FF0676 FF0876FF 016BE998 .Ōk..v..v..v..v..v.j..v².v½......F. 0000C0
76FF9A76 FF9C76FF 1676FF18 76FF016A 006A0141 E9984688 0006E903 75000030 =..u.Ō...F.ŌA.j.j..v..v..v..v..v 0000E0
0876FF01 12E99846 880006E9 03750000 30984689 10C483FF FF111C9A 0676FF08 ..v........á..F.=..u.Ō...F.Ō...v. 000100
0006E903 75000030 98468900 00FFFF9A 5016AC46 8D016A16 76FF1876 FF0676FF .v..v..v.j..F¯.P......F.=..u.Ō.. 000120
46890000 12CC9A50 16A2468D 036A1676 FF1876FF 0676FF08 76FF00E9 E9984688 .F.ŌŌ..v..v..v..v.j..FÅ.P.ä....F 000140
A6468D04 6A1676FF 1876FF06 76FF0876 FF00C0E9 98468800 06E90375 00003098 .=..u.Ō...F.Ōã..v..v..v..v.j..Fl 000160
5688A246 88A65EC4 0097E998 46880006 E9037500 00309846 89000012 F59A5016 .P.%....F.=..u.Ō...F.Ō..á^l.FÅ.V 000180
FF9A1676 FF1876FF 0676FF08 76FF0022 E9037402 57392600 28E90374 073926A4 £&9.t.Ō+.&9W.t.Ō"..v..v..v..v... 0001A0
A676FFA8 76FF0676 FF0876FF 005BE998 46880006 E9037500 00309846 890000FF ....F.=..u.Ō...F.Ō[..v..v..v´.vl 0001C0
06E90375 00003098 46890000 15549A9E 76FFA076 FF0676FF 0876FF00 0010209A .-.....v..v..v..v..T....F.=..u.Ō. 0001E0
```

Dump of file SATURN:[PCCOMMON.DUMP.DLL]SA-MERGE.DLL;1 on 18-APR-1990 10:51:16.75
File ID (417,12,0)   End of file block 105 / Allocated 108

Virtual block number 40 (00000028), 512 (0200) bytes

```
03750000 30984689 0000FFFF 9A0E76FF 1076FF06 76FF0876 FF0028E9 98468800 ..F.Ō(..v..v..v..v.......F.=..u. 000000
D88E1228 B81E5657 00006EC8 C8C95F5E 1F0000E9 98468800 06E99846 880006E9 Ō...F.Ō...F.Ō...^ èùàn..WV.¡(..Ä 000020
0006E903 75000030 DE468900 0000DA9A 5016FA46 8D0676FF 0876FF00 00F046C7 ùFÞ...v..v..F².P.Ō.....F8=..u.Ō.. 000040
46880006 E9037500 0030DE46 89000000 F89A5016 FC468DFA 76FF02F7 E9DE4688 .F8Ō%..v².F=.P.½.....F8=..u.Ō...F 000060
300E4689 00001633 9A5016F2 468D036A 0A76FF0C 76FF0676 FF0876FF 02D9E9DE 8Ōl..v..v..v..v..v.j..F·.P.3....F8= 000080
5016F646 8D046A0A 76FF0C76 FF0676FF 0876FF02 B0E9DE46 880006E9 03750000 ..u.Ō...F8Ō¯..v..v..v..v..v.j..F-.P 0000A0
FF0205E9 03750016 7E830287 E9DE4688 0006E903 75000030 DE468900 00165C9A .\.....F8=..u.Ō...F8Ō...-..u.Ō... 0000C0
E9037500 0030DE46 89000014 9A9A5016 E0468D03 6A0E76FF 1076FF06 76FF0876 v..v..v..v.j..FÅ.P......F8=..u.Ō 0000E0
000014C3 9A5016EC 468D046A 0E76FF10 76FF0676 FF0876FF 0255E9DE 46880006 ...F8ŌU..v..v..v..v..v.j..F8.P.Ū... 000100
76FFF476 FF5016E4 468D5016 F0468D02 2CE9DE46 880006E9 03750000 30DE4689 .F8=..u.Ō...F8Ō,..FÞ.P.FŌ.P.v¶.v 000120
01FDE9DE 46880006 E9037500 0030DE46 8910C483 168D030A 9A0676FF 0876FFF2 ·.v..v.....§..á..F8=..u.Ō...F8Ō». 000140
83173603 0A9A0676 FF0876FF 37FF2602 77FF26F6 5EC45016 E8468D50 16F0468D .FÞ.P.FŌ.Pá^-&.w.&.7.v..v....6.. 000160
9DE90374 E04639E6 5688E446 8801CAE9 DE468800 06E90375 00003DDE 468910C4 á..F8=..u.Ō...F8Ōò..FŌ.Vl9FÅt.Ō. 000180
03740257 39260084 E9037407 3926EA56 88E84688 EC5EC400 95E90374 E2563900 .9Vät.Ō..á^&.FŌ.VŌ&9.t.Ō..&9W.t. 0001A0
6A005FE9 03740900 E48F8326 FC5EC400 6DE90374 0100EA8F 8326FC5E C40078E9 Ō(.á^=&.éŌ..t.Ōm.á^=&.éŌ..t.Ō_.j 0001C0
0030DE46 890EC483 124A0194 9A0676FF 0876FF0A 76FF0C76 FF0E76FF 1076FF01 ..v..v..v..v..v..v..v....J..á..F8=. 0001E0
```

Dump of file SATURN:[PCCOMMON.DUMP.DLL]SA-MERGE.DLL;1 on 18-APR-1990 10:51:16.75
File ID (417,12,0)   End of file block 105 / Allocated 108

Virtual block number 41 (00000029), 512 (0200) bytes

```
FF0876FF 0A76FF0C 76FF0E76 FF1076FF 006A006A 0151E9DE 46880006 E9037500 .u.Ō...F8Ōq.j.j..v..v..v..v..v.. 000000
46880092 E90122E9 DE468800 06E90375 00003DDE 468910C4 83144711 1C9A0676 v....G..á..F8=..u.Ō...F8Ō".Ō...F 000020
073926EA 5688E846 88EC5EC4 001AE903 74E25639 0022E903 74E04639 E6568BE4 ŏ.Vl9FÅt.Ō".9Vät.Ō..á^&.FŌ.VŌ&9. 000040
FF0A76FF 0C76FF12 76FF1476 FF501692 46800062 E9037502 57392600 09E90374 t.Ō..&9W.u.Ōb..F..P.v..v..v..v.. 000060
006A008F E9DE4688 0006E903 75000030 DE468910 C48317FA 08FB9A06 76FF0876 v..v..«.ª..á..F8=..u.Ō...F8Ō¢.j. 000080
8912C483 183E00BD 9A0676FF 0876FF0A 76FF0C76 FF1276FF 1476FF50 1692468D .F..P.v..v..v..v..v..§.>..á.. 0000A0
0018939A EC76FFEE 76FF0676 FF0876FF 008DE9DE 46880006 E9037500 0030DE46 F8=..u.Ō...F8Ō...v..v..vŸ.v§.... 0000C0
187008FB 9A0676FF 0876FF0A 76FF0C76 FF1276FF 1476FF50 1692468D 0062E900 .Ōb..F..P.v..v..v..v..v..«.p. 0000E0
76FF1476 FF501692 468D006A 0049E9DE 46880006 E9037500 003DDE46 8910C483 .á..F8=..u.Ō...F8Ōl.j..F..P.v..v 000100
0006E903 75000030 DE468912 C4830CFA 0DB09A06 76FF0876 FF0A76FF 0C76FF12 ..v..v..v..v..§.ª..á..F8=..u.Ō.. 000120
5F5E1F00 00E9DE46 88000013 C59AF676 FFF876FF 0676FF08 76FF0017 E9DE4688 .F8Ō...v..v½.v-.é....F8Ō...^ 000140
46890000 15919A50 16FA468D 0676FF08 76FFD88E 157C8B1E 56570000 54C8C8C9 èùàT..WV.¡|..Ä.v..v..F².P......F 000160
30F84689 000015AF 9A5016FC 468DFA76 FF0132E9 F8468800 06E90375 000030F8 ½=..u.Ō...F½Ō2..v².F=.P.£....F½= 000180
76FF0876 FF036A0A 76FF0C76 FF0E76FF 1076FF01 14E9F846 880006E9 03750000 ..u.Ō...F½Ō...v..v..v..v..v.j..v..v 0001A0
03740100 EA8F8326 FC5EC400 84E90374 00F87E83 F846890E C483FFFF 00009A06 .......á..F½.-½.t.Ō..á^=&.éŌ..t. 0001C0
FF1076FF 016A005F E9037409 00E48F83 26FC5EC4 006DE903 7500167E 830076E9 Ōv..-..u.Ōm.á^=&.éŌ..t.Ō_.j..v.. 0001E0
```

Dump of file SATURN:[PCCOMMON.DUMP.DLL]SA-MERGE.DLL;1 on 18-APR-1990 10:51:16.75
File ID (417,12,0)   End of file block 105 / Allocated 108

Virtual block number 42 (0000002A), 512 (0200) bytes

```
06E90375 00003DF8 46890EC4 83168A01 949A0676 FF0876FF 0A76FF0C 76FF0E76 v..v..v..v..v.......á..F½=..u.Õ. 000000
08B79A06 76FF0876 FF0A76FF 0C76FF0E 76FF1076 FF006A00 6A009AE9 F8468B00 ..F½Õ..j.j..v..v..v..v..v..v..ñ. 000020
76FF5016 AC468D00 62E9006B E9F8468B 0006E903 7500003D F8468910 C4831765 e..á..F½=..u.Õ...F½Õk.Õb..F¯.P.v 000040
03750000 3DF84689 10C48319 E508FB9A 0676FF08 76FF0A76 FF0C76FF 1276FF14 ..v..v..v..v..v..«.I..á..F½=..u. 000060
FF0876FF 0A76FF0C 76FF1276 FF1476FF 5016AC46 8D006A00 38E9F846 8B0006E9 Õ...F½Õ8.j..F¯.P.v..v..v..v..v.. 000080
00E9F846 8B0006E9 F8468B00 06E90375 00003DF8 468912C4 8317C800 8D9A0676 v..§.à..á..F½=..u.Õ...F½Õ...F½Õ. 0000A0
188A9A50 16FA468D 0676FF08 76FFD88E 18AAB81E 56570000 54C8CBC9 5F5E1F00 ..^_èùàT..WV.¡¯..Ä.v..v..F*.P.¤. 0000C0
000018D8 9A5016FC 468DFA76 FF0132E9 F8468B00 06E90375 00003DF8 46890000 ...F½=..u.Õ...F½Õ2..v*.F=.P.Ä... 0000E0
FF056A0A 76FF0C76 FF0E76FF 1076FF01 14E9F846 8B0006E9 03750000 3DF84689 .F½=..u.Õ...F½Õ...v..v..v..v.j.. 000100
EA8F8326 FC5EC400 84E90374 00F87E83 F846890E C4831904 00009A06 76FF0876 v..v.......á..F½.-½.t.Õ..á^=&.¢õ 000120
016A005F E9037409 00E48F83 26FC5EC4 006DE903 7500167E 830076E9 03740100 ..t.Õv..-..u.Õm.á^=&.¢õ..t.Õ .j. 000140
00003DF8 46890EC4 83195101 949A0676 FF0876FF 0A76FF0C 76FF0E76 FF1076FF .v..v..v..v..v..v....Q..á..F½=.. 000160
76FF0876 FF0A76FF 0C76FF0E 76FF1076 FF006A00 6A009AE9 F8468B00 06E90375 u.Õ...F½Õ..j.j..v..v..v..v..v..v 000180
AC468D00 62E9006B E9F8468B 0006E903 7500003D F8468910 C4831980 00DB9A06 ..Ü....á..F½=..u.Õ...F½Õk.Õb..F¯ 0001A0
3DF84689 10C4831B 490BFB9A 0676FF08 76FF0A76 FF0C76FF 1276FF14 76FF5016 .P.v..v..v..v..v..v..«.I..á..F½= 0001C0
0A76FF0C 76FF1276 FF1476FF 5016AC46 8D006A00 38E9F846 8B0006E9 03750000 ..u.Õ...F½Õ8.j..F¯.P.v..v..v..v. 0001E0
```

Dump of file SATURN:[PCCOMMON.DUMP.DLL]SA-MERGE.DLL;1 on 18-APR-1990 10:51:16.75
File ID (417,12,0)   End of file block 105 / Allocated 108

Virtual block number 43 (0000002B), 512 (0200) bytes

```
8B0006E9 F8468B00 06E90375 00003DF8 468912C4 8319B300 8D9A0676 FF0876FF .v..v..§.*..á..F½=..u.Õ...F½Õ... 000000
16FA468D 0676FF08 76FFD88E 1A0EB81E 56570000 54C8CBC9 5F5E1F00 00E9F846 F½Õ...^_èùàT..WV.¡...Ä.v..v..F*. 000020
9A5016FC 468DFA76 FF0132E9 F8468B00 06E90375 00003DF8 46890000 1A1E9A50 P......F½=..u.Õ...F½Õ2..v*.F=.P. 000040
76FF0C76 FF0E76FF 1076FF01 14E9F846 8B0006E9 03750000 3DF84689 00001A3C <....F½=..u.Õ...F½Õ...v..v..v..v 000060
FC5EC400 84E90375 00167E83 F846890E C4831A68 00009A06 76FF0876 FF026A0A .j..v..v....h..á..F½.-..u.Õ..á^= 000080
E9037409 00E4BF83 26FC5EC4 006DE903 7400F87E 830076E9 03740100 EA8F8326 &.¢õ..t.Õv..-½.t.Õm.á^=&.¢õ..t.Õ 0000A0
46890EC4 831AB501 949A0676 FF0876FF 0A76FF0C 76FF0E76 FF1076FF 016A005F ..j..v..v..v..v..v..v....ç..á..F 0000C0
FF0A76FF 0C76FF0E 76FF1076 FF006A00 6A009AE9 F8468B00 06E90375 00003DF8 ½=..u.Õ...F½Õ..j.j..v..v..v..v.. 0000E0
62E9006B E9F8468B 0006E903 7500003D F8468910 C4831AE4 06779A06 76FF0876 v..v..w.Õ..á..F½=..u.Õ...F½Õk.Õb 000100
10C4831C AD0BFB9A 0676FF08 76FF0A76 FF0C76FF 1276FF14 76FF5016 AC468D00 ..F¯.P.v..v..v..v..v..v..«.Ü..á. 000120
76FF1276 FF1476FF 5016AC46 8D006A00 38E9F846 8B0006E9 03750000 3DF84689 .F½=..u.Õ...F½Õ8.j..F¯.P.v..v..v 000140
F8468B00 06E90375 00003DF8 468912C4 83181700 8D9A0676 FF0876FF 0A76FF0C ..v..v..v..§....á..F½=..u.Õ...F½ 000160
0676FF08 76FFD88E 1872881E 56570000 06C8CBC9 5F5E1F00 00E9F846 8B0006E9 Õ...F½Õ...^_èùà...WV.¡r..Ä.v..v. 000180
C40040E9 FA468B00 06E90375 00003DFA 46890000 FFFF9A50 16FC468D 026A006A j.j..F=.P......F*=..u.Õ...F*Õ@.á 0001A0
5EC40657 8B260447 8B26FC5E C4025789 26078926 0E5EC402 578B2607 8B26FC5E ^=&..&.W.á^.&..&.W.á^=&.G.&.W.á^ 0001C0
1F0000E9 0000B800 00181D9A FC76FFFE 76FF0676 FF0876FF 02578926 0789260A .&..&.W..v..v..v±.v=.....¡..Õ... 0001E0
```

Dump of file SATURN:[PCCOMMON.DUMP.DLL]SA-MERGE.DLL;1 on 18-APR-1990 10:51:16.75
File ID (417,12,0)   End of file block 105 / Allocated 108

Virtual block number 44 (0000002C), 512 (0200) bytes

```
8B0C468B EF5689ED 46890856 8B06468B D88E1CD6 8B1E5657 000068C8 CBC95F5E ^_èùàh..WV.¡ø..Ä.F..V..FÚ.Vÿ.F.. 000000
9C468D00 70681E00 01F546C7 006DE90A 468BF746 890A468B F35689F1 46890E56 V..Fþ.Vø.F..F%.F.Õm.úF%...hp..F. 000020
1DB70010 9A50169C 468D0083 681E0001 F546C700 77E908C4 831D9E00 109A5016 .P......á.Õw.úF%...h...F..P...ñ. 000040
C70045E9 08C4831D D000109A 50169C46 8D008B68 1E0001F5 46C7005E E908C483 .á.Õ^.úF%...h...F..P...Ä..á.ÕE.ú 000060
23E9008B E90001B8 002CE908 C4830CCD 00109A50 169C468D 0096681E 0001F546 F%...h...F..P...ë..á.Õ..¡..Õý.Õ# 000080
8CE90375 00223DFF ADE90375 002130FF CEE90375 001F30FF 8BE90375 001E3000 .=..u.Õ..=..u.Õö.=l.u.ÕÜ.=".u.Õ. 0000A0
8B0006E9 03750000 30984689 00001B82 9A50169A 468D0676 FF0876FF FFD4E9FF .Õå..v..v..F..P......F.=..u.Õ... 0000C0
98468B00 06E90375 00003D98 46890000 FFFF9A50 16FE468D 9A76FF00 6BE99846 F.Õk..v..F±.P......F.=..u.Õ...F. 0000E0
2FE99846 8B0006E9 03750000 3D984689 0000FFFF 9A5016FA 468DFE76 FF004DE9 ÕM..v±.F*.P......F.=..u.Õ...F.Õ/ 000100
9C468D00 C8680204 36FF2619 76068EFF FF68FFFF 68FA76FF FC76FF01 6A006A00 .j.j..v=.v*h..h....v.&.6..hà..F. 000120
8E1D4CB8 1E565700 0032C8CB C95F5E1F 0000E998 468B9846 890000FF FF9A5016 .P......F..F.Õ...^_èùà2..WV.¡L.. 000140
E9983388 0006E903 7500003D CE468900 001E109A 5016FA46 8D0676FF 0876FFD8 Ä.v..v..F*.P......Fö=..u.Õ..¡3.Õ 000160
00DFE998 33B80006 E9037500 003DCE46 8900001B A09A5016 FC468DFA 76FF00FD »..v*.F=.P......Fö=..u.Õ..¡3.ÕÕ. 000180
00BFE998 33B80006 E9037500 003DCE46 890000FF FF9A5016 D046800B 6AFA76FF .v*j..FÅ.P......Fö=..u.Õ. ¡3.Õ¢. 0001A0
8B0006E9 03750000 3DCE4689 0000FFFF 9A5016F2 468D5016 D0468DFA 76FF0B6A j..v*.FÅ.P.F·.P......Fö=..u.Õ..¡ 0001C0
0006E903 7500003D CE468900 00FFFF9A 5016F646 8DF276FF F476FF00 9AE99833 3.Õ...v¶.v·.F-.P......Fö=..u.Õ.. 0001E0
```

```
Dump of file SATURN:[PCCOMMON.DUMP.DLL]SA-MERGE.DLL;1 on 18-APR-1990 10:51:16.75
File ID (417,12,0)   End of file block 105 / Allocated 108

Virtual block number 45 (0000002D), 512 (0200) bytes

 9A505200 EA05FE56 88FC4688 036AF676 FFF876FF F276FFF4 76FF0079 E9983388 ¡3.Õy..v¶.v·.v½.v-j..F•.V±.õ.RP. 000000
 03750100 EABF8326 FC5EC400 4AE99833 880006E9 03750000 3DCE4689 000012A3 £....Fö=..u.Õ..¡3.ÕJ.á^•&.«õ..u. 000020
 C726FC5E C4000200 EA87C726 FC5EC400 0AE90375 0200EABF 8326FC5E C40018E9 Õ..á^•&.«õ..u.Õ..á^•&ú.õ...á^•&ú 000040
 1F0000E9 00008800 0000EC87 C726FC5E C4000000 E887C726 FC5EC400 0000E687 .Ì...á^•&ú.Ò...á^•&ú.ä...¡..Õ... 000060
 4680056A 0A76FF0C 76FF0676 FF0876FF D88E1E9D B81E5657 000008C8 CBC95F5E ^_èùà...WV.¡...Ä.v..v..v..v.j..F 000080
 03E90000 FE46C700 9FE9F846 880006E9 03750000 3DF84689 00001601 9A5016FA •¯P......F½=..u.Õ...F½Õ..úF±..Õ. 0000A0
 FF0676FF 0876FF00 65E90375 02400B26 008B26FA 76C402E3 C1FE5E88 FE46FF00 ..F±.^±èD.áv•&..&.ã.u.Õe..v..v.. 0000C0
 46890000 FFFF9A04 6A30FF26 0270FF26 FA76C402 E3C1FE5E 88056A0A 76FF0C76 v..v.j..^±èD.áv•&.p.&.0j.......F 0000E0
 FF26FA76 C402E3C1 FE5E8806 76FF0876 FF0049E9 F8468800 06E90375 00003DF8 ½=..u.Õ...F½ÕI..v..v..^±èD.áv•&. 000100
 76FFFF83 E9001DE9 F8468800 06E90375 00003DF8 46890000 FFFF9A30 FF260270 p.&.0......F½=..u.Õ...F½Õ..Õ...v 000120
 002790C8 C95F5E1F 0000E9F8 4688F846 89000010 359AFA76 FFFC76FF 0676FF08 ..v..v•.v•.5....F½.F½Õ...^_èù.'. 000140
 015C0006 1FE40203 00000002 1C480002 00D50006 1F100203 00000001 1E6C0002 ..l...........(...H.......Õ...\. 000160
 02C5000A 15320203 00000005 10860002 00000004 1C7B0002 007D0002 1E830103 ......)...(...............2...é. 000180
 00EF0006 06470203 00000007 1C190002 02580008 111D0203 01680006 15D80203 ..Ä...h.......[...........G...ÿ. 0001A0
 00000008 1D850002 00000009 1BCC0002 01F20006 13A30203 00000001 1E6F0005 ..o.......È.......ä............. 0001C0
 0000000D 1FCC0002 02E2000A 14FF0203 017F0006 203A0203 00870005 1E4C0203 ..L.......: ...........ã...ä..... 0001E0

Dump of file SATURN:[PCCOMMON.DUMP.DLL]SA-MERGE.DLL;1 on 18-APR-1990 10:51:16.75
File ID (417,12,0)   End of file block 105 / Allocated 108

Virtual block number 46 (0000002E), 512 (0200) bytes

 009A0005 1ECB0203 01880006 20880203 01070006 1F310203 02060006 13750203 ..u.......1........ ......Ù..... 000000
 0001000A 11A90103 011B0006 1EAD0203 02870008 00290203 01970006 0E1F0203 ..........).......Ù.......`..... 000020
 01350006 1F600203 02980008 085F0203 01270006 09880203 01A50006 20660203 ..f ..È.......'...........'...5. 000040
 01C20006 1CEA0203 03190008 1EEB0203 02300007 10590203 00BE0005 1E2E0203 ......ƒ...Y...0...Š.......õ...ô. 000060
 00000000 00000000 014F0006 00530203 02410007 11E40203 01430006 14710203 ..q...C...õ...A...S...O......... 000080
 76FF0C76 FF0E76FF 1076FF12 76FF0088 E90A4688 D88EFFFF 881E5657 000002C8 à...WV.¡...Ä.F.Õ...v..v..v..v..v 0000A0
 76FF0C76 FF0E76FF 1076FF12 76FF0088 E9FE4689 0CC48300 470EB99A 0676FF08 ..v..¿.G..á..F±Õ...v..v..v..v..v 0000C0
 76FF0C76 FF0E76FF 1076FF12 76FF0068 E9FE4689 0CC48300 6709B99A 0676FF08 ..v..¿.g..á..F±Õk..v..v..v..v..v 0000E0
 76FF0C76 FF0E76FF 1076FF12 76FF0048 E9FE4689 0CC48300 8704D89A 0676FF08 ..v..Ä....á..F±ÕK..v..v..v..v..v 000100
 E9037500 1E300023 E90001FE 46C7002B E9FE4689 0CC483FF FF00C89A 0676FF08 ..v..à....á..F±Õ+.ÚF±..Õ#.=..u.Õ 000120
 FE4688FF D5E9FF7B E9037500 2230FFA0 E9037500 2130FFC8 E9037500 1F30FF70 p.=..u.Õà.=!.u.Õ..=".u.Õx.Õ!..F± 000140
 0A76FF0C 76FF0676 FF0876FF D88ED008 B81E5657 000018C8 CBC95F5E 1F0000E9 Õ...^_èùà...WV.¡...Ä.v..v..v..v. 000160
 0876FF03 D6E9EE46 880006E9 03750000 3DEE4689 0000013A 9A5016E8 4680026A j..FÕ¯P.:....FŸ=..u.Õ...FŸÕ•..v. 000180
 0006E903 75000030 EE468900 0001639A 5016E846 8D026A0E 76FF1076 FF0676FF .v..v..v.j..FÕ.P.c....FŸ=..u.Õ.. 0001A0
 46890000 018C9A50 16F0468D 0C6A0A76 FF0C76FF 0676FF08 76FF03AD E9EE4688 .FŸÕÜ..v..v..v..v.j..Fþ.P......F 0001C0
 F04680DC 6A0E76FF 1076FF06 76FF0876 FF0384E9 EE468800 06E90375 00003DEE Ÿ=..u.Õ...FŸÕ...v..v..v..v.j..Fþ 0001E0

Dump of file SATURN:[PCCOMMON.DUMP.DLL]SA-MERGE.DLL;1 on 18-APR-1990 10:51:16.75
File ID (417,12,0)   End of file block 105 / Allocated 108

Virtual block number 47 (0000002F), 512 (0200) bytes

 76FF0676 FF0876FF 035BE9EE 46880006 E9037500 003DEE46 89000001 B59A5016 .P.ç....FŸ=..u.Õ...FŸÕ[..v..v..v 000000
 32E9EE46 880006E9 03750000 3DEE4689 0000FFFF 9A5016FA 468D106A 0A76FF0C ..v.j..F•.P......FŸ=..u.Õ...FŸÕ2 000020
 75000030 EE468900 00FFFF9A 5016FA46 8D106A0E 76FF1076 FF0676FF 0876FF03 ..v..v..v..v.j..F•.P......FŸ=..u 000040
 009A0676 FF0876FF 0A76FF0C 76FF066A 0E76FF10 76FF0309 E9EE4688 0006E903 .Õ...FŸÕ...v..v.j..v..v..v..v... 000060
 FF076A0E 76FF1076 FF02DCE9 EE468800 06E90375 00003DEE 46890EC4 83020E00 ....á..FŸ=..u.Õ...FŸÕÉ..v..v.j.. 000080
 46880006 E9037500 003DEE46 890EC483 02380000 9A0676FF 0876FF0A 76FF0C76 v..v..v..v....;..á..FŸ=..u.Õ...F 0000A0
 0EC48302 6800009A 0676FF08 76FF0A76 FF0C76FF 006A0E76 FF1076FF 02AFE9EE ŸÕÉ..v..v.j..v..v..v..v....h..á. 0000C0
 FF0A76FF 0C76FF0F 6A0E76FF 1076FF02 82E9EE46 880006E9 03750000 3DEE4689 .FŸ=..u.Õ...FŸÕ...v..v.j..v..v.. 0000E0
 76FF0255 E9EE4688 0006E903 75000030 EE46890E C4830295 00009A06 76FF0876 v..v........á..FŸ=..u.Õ...FŸÕU..v 000100
 00003DEE 46890EC4 8302C201 C39A0676 FF0876FF 0A76FF0C 76FF086A 0E76FF10 ..v.j..v..v..v..v..û.ô..á..FŸ=.. 000120
 9A0676FF 0876FF0A 76FF0C76 FF086A0E 76FF1076 FF0228E9 EE468800 06E90375 u.Õ...FŸÕ(..v..v.j..v..v..v..v.. 000140
 096A0E76 FF1076FF 01FBE9EE 46880006 E9037500 003DEE46 890EC483 02EF01C3 û.ÿ..á..FŸ=..u.Õ...FŸÕ«..v..v.j. 000160
 880006E9 03750000 3DEE4689 0EC48303 CC01C39A 0676FF08 76FF0A76 FF0C76FF .v..v..v..v..û.ä..á..FŸ=..u.Õ... 000180
 EE468900 0003429A 5016FC46 8D0F6A0A 76FF0C76 FF0676FF 0876FF01 CEE9EE46 FŸÕö..v..v..v..v.j..F=.P.B....FŸ 0001A0
 16F6468D 0F6A0E76 FF1076FF 0676FF08 76FF01A5 E9EE4688 0006E903 75000030 •..u.Õ...FŸÕE..v..v..v..v.j..F-. 0001C0
 FF0003E9 0000F446 C7017CE9 EE468800 06E90375 00003DEE 46890000 FFFF9A50 P......FŸ=..u.Õ...FŸÕ|.úF¶..Õ... 0001E0
```

```
Dump of file SATURN:[PCCOMMON.DUMP.DLL]SA-MERGE.DLL;1 on 18-APR-1990 10:51:16.75
File ID (417,12,0)   End of file block 105 / Allocated 108

Virtual block number 48 (00000030), 512 (0200) bytes

 00F246C7 0000EC46 C70134E9 03750240 08260088 26FC76C4 02E3C1F4 5E8BF446 F¶.^¶èD.áv=&..&.a.u.Õ4.úF$..úF·. 000000
 16EC468D 0055E903 7502400B 26008826 F676C402 E3C1F25E 8BF246FF 0003E900 .Õ...F·.^·èD.áv-&..&.a.u.ÕU..F$. 000020
 FF260270 FF26FC76 C402E3C1 F45E8B30 FF260270 FF26F676 C402E3C1 F25E8850 P.^·èD.áv-&.p.&.0.^¶èD.áv=&.p.&. 000040
 E9EE4688 0006E903 7500003D EE468912 C483FFFF 02B19A06 76FF0876 FF016A30 0j..v..v..Ÿ....á..FŸ=..u.Õ...FŸÕ 000060
 02E3C1F2 5E880042 E9037500 EC7E83FF 93E90003 E90003E9 037500EC 7E8300F1 þ..-$.u.Õ..Õ..Õ...-$.u.ÕB..^·èD. 000080
 0676FF08 76FF30FF 260270FF 26FC76C4 02E3C1F4 5E8830FF 260270FF 26F676C4 áv-&.p.&.0.^¶èD.áv=&.p.&.0.v..v. 0000A0
 FF0876FF 006CE900 9AE9EE46 880006E9 03750000 3DEE4689 0CC483FF FF05F79A .¼....á..FŸ=..u.Õ...FŸÕ..Õl..v.. 0000C0
 00FFFF9A 0F6A0A76 FF0C76FF 026A30FF 260270FF 26FC76C4 02E3C1F4 5E880676 v..^¶èD.áv=&.p.&.0j..v..v.j..... 0000E0
 76C402E3 C1F45E88 0676FF08 76FF0061 E9EE4688 0006E903 7500003D EE468900 ..FŸ=..u.Õ...FŸÕa..v..v..^¶èD.áv 000100
 E9037500 003DEE46 890000FF FF9A0F6A 0E76FF10 76FF026A 30FF2602 70FF26FC =&.p.&.0j..v..v.j.......FŸ=..u.Õ 000120
 FF0876FF 000004C9 9AFC76FF FE76FF06 76FF0876 FFFEB4E9 002BE9EE 46880006 ...FŸÕ+.ÕÇ±.v..v..v±.v=.è....v.. 000140
 B81E5657 000028C8 CBC95F5E 1F0000E9 EE468800 00FFFF9A F676FFF8 76FF0676 v..v½.v-......FŸÕ...^_èùà(..WV.¡ 000160
 3DEE4689 0000054A 9A5016D8 468D026A 0A76FF0C 76FF0676 FF0876FF D88E0000 Å..Ã.v..v..v..v.j..FÃ.P.J....FŸ= 000180
 5016D846 80026A0E 76FF1076 FF0676FF 0876FF04 A7E9EE46 880006E9 03750000 ..u.Õ...FŸÕI..v..v..v..v.j..FÃ.P 0001A0
 FF0C76FF 0676FF08 76FF047E E9EE4688 0006E903 7500003D EE468900 0005739A .s....FŸ=..u.Õ...FŸÕ-..v..v..v.. 0001C0
 FF0455E9 EE468800 06E90375 00003DEE 46890000 059C9A50 16DE468D 036A0A76 v.j..F8.P......FŸ=..u.Õ...FŸÕU.. 0001E0

Dump of file SATURN:[PCCOMMON.DUMP.DLL]SA-MERGE.DLL;1 on 18-APR-1990 10:51:16.75
File ID (417,12,0)   End of file block 105 / Allocated 108

Virtual block number 49 (00000031), 512 (0200) bytes

 E9037500 003DEE46 89000005 C59A5016 DE468D03 6A0E76FF 1076FF06 76FF0876 v..v..v..v.j..F8.P.é....FŸ=..u.Õ 000000
 000005EE 9A5016F0 468D0E6A 0A76FF0C 76FF0676 FF0876FF 042CE9EE 46880006 ...FŸÕ,..v..v..v..v.j..Fþ.P.Ÿ... 000020
 8D0E6A0E 76FF1076 FF0676FF 0876FF04 03E9EE46 880006E9 03750000 3DEE4689 .FŸ=..u.Õ...FŸÕ...v..v..v..v.j.. 000040
 0676FF08 76FF03DA E9EE4688 0006E903 7500003D EE468900 0006179A 5016F046 Fþ.P......FŸ=..u.Õ...FŸÕÕ..v..v. 000060
 EE468800 06E90375 00003DEE 46890000 06409A50 16FA468D 096A0A76 FF0C76FF .v..v.j..F°.P.a....FŸ=..u.Õ...FŸ 000080
 003DEE46 89000006 699A5016 FA468D09 6A0E76FF 1076FF06 76FF0876 FF03B1E9 ÕŸ..v..v..v..v.j..F°.P.i....FŸ=. 0000A0
 9A5016D8 468D116A 0A76FF0C 76FF0676 FF0876FF 03B8E9EE 46880006 E9037500 .u.Õ...FŸÕ...v..v..v..v.j..FÃ.P. 0000C0
 76FF1076 FF0676FF 0876FF03 5FE9EE46 880006E9 03750000 3DEE4689 000000E8 Õ....FŸ=..u.Õ...FŸÕ_..v..v..v..v 0000E0
 76FF0336 E9EE4688 0006E903 7500003D EE468900 0001119A 5016D846 80116A0E .j..FÃ.P......FŸ=..ū.Õ...FŸÕ6..v 000100
 00003DEE 46890EC4 8306C200 009A0676 FF0876FF 0A76FF0C 76FF076A 0E76FF10 ..v.j..v..v..v..v....ô..á..FŸ=.. 000120
 9A0676FF 0876FF0A 76FF0C76 FF086A0E 76FF1076 FF0309E9 EE468800 06E90375 u.Õ...FŸÕ...v..v.j..v..v..v..v.. 000140
 0F6A0E76 FF1076FF 02DCE9EE 46880006 E9037500 003DEE46 890EC483 06EF0000 ..ÿ..á..FŸ=..u.Õ...FŸÕÉ..v..v.j. 000160
 880006E9 03750000 3DEE4689 0EC48307 1C00009A 0676FF08 76FF0A76 FF0C76FF .v..v..v..v.......á..FŸ=..u.Õ... 000180
 C4830749 00009A06 76FF0876 FF0A76FF 0C76FF12 6A0E76FF 1076FF02 AFE9EE46 FŸÕÉ..v..v.j..v..v..v..v....I..á 0001A0
 0A76FF0C 76FF0A6A 0E76FF10 76FF0282 E9EE4688 0006E903 7500003D EE46890E ..FŸ=..u.Õ...FŸÕ...v..v.j..v..v. 0001C0
 FF0255E9 EE468800 06E90375 00003DEE 46890EC4 83077601 C39A0676 FF0876FF .v..v..û.v..á..FŸ=..u.Õ...FŸÕU.. 0001E0

Dump of file SATURN:[PCCOMMON.DUMP.DLL]SA-MERGE.DLL;1 on 18-APR-1990 10:51:16.75
File ID (417,12,0)   End of file block 105 / Allocated 108

Virtual block number 50 (00000032), 512 (0200) bytes

 003DEE46 890EC483 07A301C3 9A0676FF 0876FF0A 76FF0C76 FF086A0E 76FF1076 v..v.j..v..v..v..v..û.È..á..FŸ=. 000000
 0676FF08 76FF0A76 FF0C76FF 066A0E76 FF1076FF 0228E9EE 46880006 E9037500 .u.Õ...FŸÕ(..v..v.j..v..v..v..v. 000020
 6A0E76FF 1076FF01 FBE9EE46 880006E9 03750000 3DEE4689 0EC48307 0001C39A .û.Ã..á..FŸ=..u.Õ...FŸÕ«..v..v.j 000040
 0006E903 7500003D EE46890E C48301E1 01C39A06 76FF0876 FF0A76FF 0C76FF00 ..v..v..v..v..û.Ã..á..FŸ=..u.Õ.. 000060
 46890000 03199A50 16FC4680 126A0A76 FF0C76FF 0676FF08 76FF01CE E9EE4688 .FŸÕö..v..v..v..v.j..F=.P......F 000080
 F6468D12 6A0E76FF 1076FF06 76FF0876 FF01A5E9 EE468800 06E90375 00003DEE Ÿ=..u.Õ...FŸÕÉ..v..v..v..v.j..F- 0000A0
 0003E900 00F446C7 017CE9EE 46880006 E9037500 003DEE46 89000007 FA9A5016 .P.°....FŸ=..u.Õ...FŸÕj.úF¶..Õ.. 0000C0
 F246C700 000C46C7 0134E903 75024008 26008826 FC76C402 E3C1F45E 88F446FF .F¶.^¶èD.áv=&..&.a.u.Õ4.úFÉ..úF· 0000E0
 DC468D00 55E90375 02400826 008826F6 76C402E3 C1F25E8B F246FF00 03E90000 ..Õ...F·.^·èD.áv-&..&.a.u.ÕU..FÉ 000100
 260270FF 26FC76C4 02E3C1F4 5E8830FF 260270FF 26F676C4 02E3C1F2 5E885016 .P.^·èD.áv-&.p.&.0.^¶èD.áv=&.p.& 000120
 EE468800 06E90375 00003DEE 468912C4 83069502 B19A0676 FF0876FF 016A30FF .0j..v..v..Ÿ....á..FŸ=..u.Õ...FŸ 000140
 E3C1F25E 880042E9 0375000C 7E83FF93 E90003E9 0003E903 75000C7E 8300F1E9 Õþ..-É.u.Õ..Õ..Õ...-É.u.ÕB..^·èD 000160
 76FF0876 FF30FF26 0270FF26 FC76C402 E3C1F45E 8830FF26 0270FF26 F676C402 .áv-&.p.&.0.^¶èD.áv=&.p.&.0.v..v 000180
 0876FF00 6CE9009A E9EE4688 0006E903 7500003D EE46890C C4830423 00009A06 ....#..á..FŸ=..u.Õ...FŸÕ..Õl..v. 0001A0
 04509A12 6A0A76FF 0C76FF02 6A30FF26 0270FF26 FC76C402 E3C1F45E 880676FF .v..^¶èD.áv=&.p.&.0j..v..v.j..]. 0001C0
 C402E3C1 F45E8806 76FF0876 FF0061E9 EE468800 06E90375 00003DEE 46890000 ...FŸ=..u.Õ...FŸÕa..v..v..^¶èD.á 0001E0
```

Dump of file SATURN:[PCCOMMON.DUMP.DLL]SA-MERGE.DLL;1 on 18-APR-1990 10:51:16.75
File ID (417,12,0)   End of file block 105 / Allocated 108

Virtual block number 51 (00000033), 512 (0200) bytes

```
03750000 30EE4689 00000493 9A126A0E 76FF1076 FF026A30 FF260270 FF26FC76 v=&.p.&.0j..v..v.j.......FŸ=..u. 000000
0876FF00 0009AA9A FC76FFFE 76FF0676 FF0876FF FEB4E900 2BE9EE46 880006E9 Õ...FŸÕ+.ÕÇ±.v..v..v±.ve.¯....v. 000020
1E565700 001EC8CB C95F5E1F 0000E9EE 46880000 04B89AF6 76FFF876 FF0676FF .v..v½.v¬.i....FŸÕ...^_èÌà...WV. 000040
F6468900 000A2B9A 5016E246 80026A0A 76FF0C76 FF0676FF 0876FFD8 8E04E0B8 ¡Å..Ã.v..v..v..v.j..Fã.P.¨....F- 000060
16E2468D 026A0E76 FF1076FF 0676FF08 76FF04C6 E9F6468B 0006E903 75000030 =..u.Õ...F-Õó..v..v..v..v.. .Fã. 000080
0C76FF06 76FF0876 FF049DE9 F6468800 06E90375 00003DF6 46890000 0A549A50 P.T....F-=..u.Õ...F-Õ...v..v..v. 0000A0
0474E9F6 46880006 E9037500 003DF646 8900000A 7D9A5016 E6468D03 6A0A76FF .v.j..Fl.P.)....F-=..u.Õ...F-Õt. 0000C0
03750000 3DF64689 00000AA6 9A5016E6 468D036A 0E76FF10 76FF0676 FF0876FF .v..v..v..v.j..Fl.P.l....F-=..u. 0000E0
000ACF9A 5016F846 8D156A0A 76FF0C76 FF0676FF 0876FF04 4BE9F646 880006E9 Õ...F-ÕK..v..v..v..v.j..F½.P.ü.. 000100
156A0E76 FF1076FF 0676FF08 76FF0422 E9F6468B 0006E903 75000030 F6468900 ..F-=..u.Õ...F-Õ"..v..v..v..v.j. 000120
76FF0876 FF03F9E9 F6468800 06E90375 00003DF6 46890000 0AF89A50 16F8468D .F½.P.½....F-=..u.Õ...F-Õ'..v..v 000140
46880006 E9037500 003DF646 89000008 219A5016 FC468D06 6A0A76FF 0C76FF06 ..v..v.j..F=.P.l....F-=..u.Õ...F 000160
3DF64689 0000084A 9A5016FC 468D066A 0E76FF10 76FF0676 FF0876FF 03D0E9F6 -ÕÅ..v..v..v..v.j..F=.P.J....F-= 000180
5016E246 8D096A0A 76FF0C76 FF0676FF 0876FF03 A7E9F646 880006E9 03750000 ..u.Õ...F-ÕI..v..v..v..v.j..Fã.P 0001A0
FF1076FF 0676FF08 76FF037E E9F6468B 0006E903 75000030 F6468900 000B739A .s....F-=..u.Õ...F-Õ~..v..v..v.. 0001C0
FF0355E9 F6468800 06E90375 00003DF6 46890000 089C9A50 16E2468D 096A0E76 v.j..Fã.P......F-=..u.Õ...F-ÕU.. 0001E0
```

Dump of file SATURN:[PCCOMMON.DUMP.DLL]SA-MERGE.DLL;1 on 18-APR-1990 10:51:16.75
File ID (417,12,0)   End of file block 105 / Allocated 108

Virtual block number 52 (00000034), 512 (0200) bytes

```
E9037500 003DF646 89000008 C59A5016 F8468D1A 6A0A76FF 0C76FF06 76FF0876 v..v..v..v.j..F½.P.é....F-=..u.Õ 000000
00000BEE 9A5016F8 468D1A6A 0E76FF10 76FF0676 FF0876FF 032CE9F6 46880006 ...F-Õ,..v..v..v..v.j..F½.P.Ÿ... 000020
8D1B6A0A 76FF0C76 FF0676FF 0876FF03 03E9F646 880006E9 03750000 3DF64689 .F-=..u.Õ...F-Õ...v..v..v..v.j.. 000040
0676FF08 76FF020A E9F6468B 0006E903 75000030 F6468900 0004F89A 5016F846 F½.P.½....F-=..u.Õ...F-ÕÕ..v..v. 000060
F6468800 06E90375 00003DF6 46890000 05219A50 16F8468D 1B6A0E76 FF1076FF .v..v.j..F½.P.l....F-=..u.Õ...F- 000080
890EC483 0C470000 9A0676FF 0876FF0A 76FF0C76 FF0B6A0E 76FF1076 FF0281E9 ÕŸ..v..v.j..v..v..v..v....G..á.. 0000A0
76FF0A76 FF0C76FF 146A0E76 FF1076FF 0284E9F6 46880006 E9037500 003DF646 F-=..u.Õ...F-Õ...v..v.j..v..v..v 0000C0
1076FF02 57E9F646 880006E9 03750000 3DF64689 0EC4830C 7400009A 0676FF08 ..v....t..á..F-=..u.Õ...F-ÕW..v. 0000E0
75000030 F646890E C4830CA1 00009A06 76FF0876 FF0A76FF 0C76FF07 6A0E76FF .v.j..v..v..v..v....Å..á..F-=..u 000100
009A0676 FF0876FF 0A76FF0C 76FF086A 0E76FF10 76FF022A E9F6468B 0006E903 .Õ...F-Õ*..v..v.j..v..v..v..v... 000120
FF166A0E 76FF1076 FF01FDE9 F6468800 06E90375 00003DF6 46890EC4 830CCE00 .õ..á..F-=..u.Õ...F-Õ»..v..v.j.. 000140
46880006 E9037500 003DF646 890EC483 0CFB0000 9A0676FF 0876FF0A 76FF0C76 v..v..v..v....«..á..F-=..u.Õ...F 000160
0EC4830D 2800009A 0676FF08 76FF0A76 FF0C76FF 176A0E76 FF1076FF 01D0E9F6 -ÕÅ..v..v.j..v..v..v..v....(..á. 000180
FF0A76FF 0C76FF18 6A0E76FF 1076FF01 A3E9F646 880006E9 03750000 3DF64689 .F-=..u.Õ...F-ÕÈ..v..v.j..v..v.. 0001A0
76FF0176 E9F6468B 0006E903 75000030 F646890E C4830055 00009A06 76FF0876 v..v....U..á..F-=..u.Õ...F-Õv..v 0001C0
000030F6 46890EC4 83008201 C39A0676 FF0876FF 0A76FF0C 76FF0A6A 0E76FF10 ..v.j..v..v..v..v..û....á..F-=.. 0001E0
```

Dump of file SATURN:[PCCOMMON.DUMP.DLL]SA-MERGE.DLL;1 on 18-APR-1990 10:51:16.75
File ID (417,12,0)   End of file block 105 / Allocated 108

Virtual block number 53 (00000035), 512 (0200) bytes

```
9A0676FF 0876FF0A 76FF0C76 FF0C6A0E 76FF1076 FF0149E9 F6468800 06E90375 u.Õ...F-ÕI..v..v.j..v..v..v..v.. 000000
006A0E76 FF1076FF 011CE9F6 46880006 E9037500 003DF646 890EC483 00AF01C3 û.£..á..F-=..u.Õ...F-Õ...v..v.j. 000020
880006E9 03750000 3DF64689 0EC48300 DC01C39A 0676FF08 76FF0A76 FF0C76FF .v..v..v..v..û.È..á..F-=..u.Õ... 000040
C4830E09 01C39A06 76FF0876 FF0A76FF 0C76FF0E 6A0E76FF 1076FF00 EFE9F646 F-Õÿ..v..v.j..v..v..v..v..û....á 000060
0A76FF0C 76FF116A 0E76FF10 76FF00C2 E9F6468B 0006E903 75000030 F646890E ..F-=..u.Õ...F-Õö..v..v.j..v..v. 000080
FF0095E9 F6468800 06E90375 00003DF6 46890EC4 8308A001 C39A0676 FF0876FF .v..v..û.Ü..á..F-=..u.Õ...F-Õ... 0000A0
E9037500 0030F646 8900000E 5C9A5016 FE468D06 6A0A76FF 0C76FF06 76FF0876 v..v..v..v.j..F±.P.\....F-=..u.Õ 0000C0
00000909 9A5016FA 468D066A 0E76FF10 76FF0676 FF0876FF 006CE9F6 46880006 ...F-Õl..v..v..v..v.j..F'.P.)... 0000E0
037500FA 7E830034 E9037500 FE7E8300 43E9F646 880006E9 03750000 3DF64689 .F-=..u.Õ...F-ÕC..-±.u.Õ4..-'.u. 000100
F646890C C483FFFF 15589A06 76FF0876 FF0A76FF 0C76FF0E 76FF1076 FF002BE9 Õ+..v..v..v..v..v..v..[....á..F- 000120
1E565700 0018C8CB C95F5E1F 0000E9F6 46880006 E9F6468B 0006E903 75000030 =..u.Õ...F-Õ...F-Õ...^_èÙà...WV. 000140
FC468900 000F2B9A 5016E846 8D026A0A 76FF0C76 FF0676FF 0876FFD8 8E09C1B8 ¡è..Ã.v..v..v..v.j..FÕ.P.+....F= 000160
16E8468D 026A0E76 FF1076FF 0676FF08 76FF0206 E9FC468B 0006E903 7500003D =..u.Õ...F=Õ...v..v..v..v.j..FÕ. 000180
0C76FF06 76FF0876 FF01D0E9 FC468800 06E90375 000030FC 46890000 0F549A50 P.T....F==..u.Õ...F=ÕÏ..v..v..v. 0001A0
01B4E9FC 46880006 E9037500 003DFC46 8900000F 7D9A5016 EC468D03 6A0A76FF .v.j..F&.P.)....F==..u.Õ...F=ÕÇ. 0001C0
03750000 3DFC4689 00000FA6 9A5016EC 468D036A 0E76FF10 76FF0676 FF0876FF .v..v..v..v.j..F&.P.l....F==..u. 0001E0
```

```
Dump of file SATURN:[PCCOMMON.DUMP.DLL]SA-MERGE.DLL;1 on 18-APR-1990 10:51:16.75
File ID (417,12,0)   End of file block 105 / Allocated 108

Virtual block number 54 (00000036), 512 (0200) bytes

 000FCF9A 5016FE46 8D0C6A0A 76FF0C76 FF0676FF 0876FF01 8BE9FC46 8B0006E9 Õ...F▪Õ...v..v..v..v.j..F±.P.ü.. 000000
 0C6A0E76 FF1076FF 0676FF08 76FF0162 E9FC468B 0006E903 7500003D FC468900 ..F▪=..u.Õ...F▪Õb..v..v..v..v.j. 000020
 76FF0876 FF0139E9 FC468B00 06E90375 00003DFC 46890000 0FF89A50 16FE468D .F±.P.½....F▪=..u.Õ...F▪Õ9..v..v 000040
 468B0006 E9037500 003DFC46 8900000E 339A5016 FE468D08 6A0A76FF 0C76FF06 ..v..v.j..F±.P.3....F▪=..u.Õ...F 000060
 3DFC4689 00000A02 9A5016FE 468D086A 0E76FF10 76FF0676 FF0876FF 0110E9FC ▪Õ...v..v..v..v.j..F±.P......F▪= 000080
 76FF0876 FF0A76FF 0C76FF06 6A0E76FF 1076FF00 E7E9FC46 8B0006E9 03750000 ..u.Õ...F▪ÕÕ..v..v.j..v..v..v..v 0000A0
 0E76FF10 76FF008A E9FC468B 0006E903 7500003D FC46890E C4830C1A 000Q9A06 .......á..F▪=..u.Õ...F▪Õα..v..v. 0000C0
 06E90375 00003DFC 46890EC4 83107E00 009A0676 FF0876FF 0A76FF0C 76FF076A j..v..v..v..v....~..á..F▪=..u.Õ. 0000E0
 10AB0000 9A0676FF 0876FF0A 76FF0C76 FF0D6A0E 76FF1076 FF008DE9 FC468B00 ..F▪Õ...v..v.j..v..v..v..v....". 000100
 FF0C76FF 096A0E76 FF1076FF 0060E9FC 468B0006 E9037500 003DFC46 890EC483 .á..F▪=..u.Õ...F▪Õ'..v..v.j..v.. 000120
 33E9FC46 8B0006E9 03750000 3DFC4689 0EC48310 D800009A 0676FF08 76FF0A76 v..v..v....Ä..á..F▪=..u.Õ...F▪Õ3 000140
 FC46890E C4831024 01C39A06 76FF0876 FF0A76FF 0C76FF08 6A0E76FF 1076FF00 ..v..v.j..v..v..v..v..û.$..á..F▪ 000160
 0E980002 000B90CB C95F5E1F 0000E9FC 468B0006 E9FC468B 0006E903 7500003D =..u.Õ...F▪Õ...F▪Õ...^_èù....... 000180
 00270002 00000004 10510002 00000003 09040002 015C0006 08230203 00000002 ......#...\...........Ō.......'. 0001A0
 09990203 0000000D 0EC10002 017F0006 093E0203 01750006 09740203 00000005 ......t...u...>.......è......... 0001C0
 00000000 00000000 00000000 014F0006 0F020203 01350006 0ED90203 01B80006 ......\...5.......O............. 0001E0

Dump of file SATURN:[PCCOMMON.DUMP.DLL]SA-MERGE.DLL;1 on 18-APR-1990 10:51:16.75
File ID (417,12,0)   End of file block 105 / Allocated 108

Virtual block number 55 (00000037), 512 (0200) bytes

 FE1C8689 0000FFFF 9A5016FE 468D0E76 FF1076FF D88EFFFF 881E5657 0001E4C8 àõ..WV.¡...Ä.v..v..F±.P........± 000000
 FE1C8689 0000FFFF 9A5016FA 468DFE76 FF023CE9 FE1C868B 0007E903 7500003D =..u.Õ.....±Õ<..v±.F'.P........± 000020
 6A020468 020436FF 26197806 8E006A00 6A021CE9 FE1C868B 0007E903 7500003D =..u.Õ.....±Õ..j.j...x.&.6..h..j 000040
 16FE1E86 8D00A068 1E505200 4C05FC56 8BFA468B 0000017D 9A5016FE 6C868D50 P..(±.P.)....F'.V▪.L.RP.h.....±. 000060
 00709A50 16AC468D 00A5681E 50520098 05FC568B FA468B0C C48300A0 00709A50 P.p....á..F'.V▪...RP.hE..F¯.P.p. 000080
 A600709A 5016FEBE 868D5016 FE6C868D 5016FE1E 868D5016 AC468D0C C48300BF €..á..F¯.P...±.P..(±.P../±.P.p.Ì 0000A0
 C69A006A 006A5016 FEBE868D 10B16801 00B7FF26 010287FF 26FA5EC4 10C48301 ..á.á^'&.ñ..&.ñ..hŸ.../±.Pj.j..6 0000C0
 B6FF0017 E9037500 003DFE1C 86890000 FFFF9A00 AA681E0E 76FF1076 FF000001 ....v..v..h¯........±=..u.Õ...Ñ 0000E0
 76FF0C76 FF0676FF 0876FF01 56E9FE1C 868B06C4 83000001 5D9A016A 006AFE1C .±j.j..]....á....±ÕV..v..v..v..v 000100
 1076FF00 90E90374 00FE1C8E 83FE1C86 890CC483 FFFF04E4 9A0E76FF 1076FF0A ..v..v..Õ....á....±./.±.t.Õ...v. 000120
 0001F79A 016A006A FE1C86FF 0010E903 7500003D FE1C8689 0000FFFF 9A0E76FF .v.........±=..u.Õ...Ñ.±j.j..¥.. 000140
 0002179A 5016FE6C 868D506A 02056802 0436FF26 1978068E 006A006A 06C48300 ..á.j.j...x.&.6..h..jP..(±.P.... 000160
 BE868D50 16FE6C86 8D505200 4C05FC56 8BFA468B 50520098 05FC568B FA468800 ..F'.V▪...RP.F'.V▪.L.RP..(±.P../ 000180
 16FEBE86 8D1DB168 0100B7FF 260102B7 FF26FA5E C410C483 02400070 9A5016FE ±.P.p.ə..á.á^'&.ñ..&.ñ..hŸ.../±. 0001A0
 FFFF9A0E 76FF1076 FF008DE9 037402FE 1CBE8300 97E90000 02609A00 6A006A50 Pj.j..'...Õ.../.±.t.Õ...v..v.... 0001C0
 006A06C4 830000FF FF9A016A 006AFE1C B6FF0010 E9037500 003DFE1C 86890000 .....±=..u.Õ...Ñ.±j.j.......á.j. 0001E0

Dump of file SATURN:[PCCOMMON.DUMP.DLL]SA-MERGE.DLL;1 on 18-APR-1990 10:51:16.75
File ID (417,12,0)   End of file block 105 / Allocated 108

Virtual block number 56 (00000038), 512 (0200) bytes

 568BFA46 8B0000FF FF9A5016 FE6C868D 506A0206 68020436 FF261978 068E006A j...x.&.6..h..jP..(±.P......F'.V 000000
 00709A50 16FEBE86 8D5016FE 6C868D50 52004C05 FC568BFA 468B5052 009805FC ▪...RP.F'.V▪.L.RP..(±.P../±.P.p. 000020
 9A006A00 6A5016FE BE868D1D B1680100 B7FF2601 02B7FF26 FA5EC410 C483FFFF ...á.á^'&.ñ..&.ñ..hŸ.../±.Pj.j.. 000040
 76FF088E 0008B81E 56570001 E4C8000C CAC95F5E 1F0000E9 FE1C868B 0000FFFF .......±Õ...^_èò..àõ..WV.¡...Ä.v 000060
 3CE9FE1C 868B0007 E9037500 003DFE1C 86890000 00189A50 16FE468D 0E76FF10 ..v..F±.P.........±=..u.Õ.....±Õ< 000080
 1CE9FE1C 868B0007 E9037500 003DFE1C 86890000 00389A50 16FA468D FE76FF02 ..v±.F'.P.8......±=..u.Õ.....±Õ. 0000A0
 468B0000 03EF9A50 16FE6C86 8D506A02 01680204 36FF2619 78068E00 6A006A02 .j.j...x.&.6..h..jP..(±.P.ÿ....F 0000C0
 568BFA46 8B0CC483 03120070 9A5016FE 1E868D00 BA681E50 52004C05 FC568BFA '.V▪.L.RP.hα....±.P.p....á..F'.V 0000E0
 FE1E868D 5016AC46 8D0CC483 03310070 9A5016AC 468D00BF 681E5052 009805FC ▪...RP.h€..F¯.P.p.1..á..F¯.P...± 000100
 FF260102 B7FF26FA 5EC410C4 83041800 709A5016 FEBE868D 5016FE6C 868D5016 .P..(±.P../±.P.p....á.á^'&.ñ..&. 000120
 9A00C468 1E0E76FF 1076FF00 0004389A 006A006A 5016FEBE 86801DB1 68010087 ñ..hŸ.../±.Pj.j..8....v..v..há.. 000140
 06C48300 0003CF9A 016A006A FE1C86FF 0017E903 7500003D FE1C8689 000000EE Ÿ......±=..u.Õ...Ñ.±j.j..ü....á. 000160
 C483012A 04E49A0E 76FF1076 FF0A76FF 0C76FF06 76FF0876 FF0156E9 FE1C868B ...±ÕV..v..v..v..v..v..v..õ.*..á 000180
 003DFE1C 86890000 01449A0E 76FF1076 FF0090E9 037400FE 1C8E83FE 1C86890C ....±./.±.t.Õ...v..v..D......±=. 0001A0
 FF261978 068E006A 006A06C4 83000004 699A016A 006AFE1C B6FF0010 E9037500 .u.Õ...Ñ.±j.j..ì....á.j.j...x.&. 0001C0
 468B5052 009805FC 568BFA46 8B000000 689A5016 FE6C868D 506A0202 68020436 6..h..jP..(±.P.h....F'.V▪...RP.F 0001E0
```

```
Dump of file SATURN:[PCCOMMON.DUMP.DLL]SA-MERGE.DLL;1 on 18-APR-1990 10:51:16.75
File ID (417,12,0)   End of file block 105 / Allocated 108

Virtual block number 57 (00000039), 512 (0200) bytes

 FA5EC410 C4830084 00709A50 16FEBE86 8D5016FE 6C868D50 52004C05 FC568BFA *.V*.L.RP..l±.P../±.P.p....6.6^* 000000
 830097E9 0000000F 9A006A00 6A5016FE BE868D1D B1680100 B7FF2601 02B7FF26 &.ñ..&.ñ..hÝ.../±.Pj.j..Ö...Ö... 000020
 0010E903 7500003D FE1C8689 000001DE 9A0E76FF 1076FF00 8DE90374 02FE1CBE /.±.t.Ö...v..v..8......±=..u.Ö.. 000040
 02036802 0436FF26 1978068E 006A006A 06C48300 0001079A 016A006A FE1CB6FF .Ñ.±j.j.......6.j.j...x.&.6..h.. 000060
 4C05FC56 88FA4688 50520098 05FC5688 FA468800 0002DA9A 5016FE6C 8680506A jP..l±.P.Ö....F*.V*...RP.F*.V*.L 000080
 260102B7 FF26FA5E C410C483 02F60070 9A5016FE BE868D50 16FE6C86 8D505200 .RP..l±.P../±.P.p.-..6.6^*&.ñ..& 0000A0
 5F5E1F00 00E9FE1C 86880000 03519A00 6A006A50 16FEBE86 8D1DB168 010087FF .ñ..hÝ.../±.Pj.j..Q......±Ö...^_ 0000C0
 5016FA46 8D0676FF 0876FF00 009E46C7 D88E027A B81E5657 0000B4C8 000CCAC9 èò..àÇ..WV.¡z..ÀúF....v..v..F*.P̄ 0000E0
 AA9A5016 FC468DFA 76FF056A E99C4688 0006E903 7500003D 9C468900 0002BA9A ......F.*..u.Ö...F.Öj..v*.F*.P.` 000100
 468D5016 F6468D50 16A04680 054CE99C 46880006 E9037500 003D9C46 89000002 ....F.*..u.Ö...F.ÖL..F..P.F-.P.F 000120
 FFFF0484 9A0676FF 0876FF0A 76FF0C76 FF0E76FF 1076FF50 16FF4C86 805016A6 Ï.P..L..P.v..v..v..v..v..v..Ç... 000140
 0A76FF0C 76FF0676 FF0876FF 0360E900 019E46C7 02F3E9A4 4688A446 891CC483 .6..FÊ.FÊÖµ.úF...Ö'..v..v..v..v. 000160
 E39A016A 006A9C76 FF0020E9 03750000 3D9C4689 000005CC 9A5016AA 468D026A j..F`.P.ë....F.*..u.Ö ..v.j.j..D 000180
 1076FF06 76FF0876 FF04C9E9 9C468800 0005F19A 0676FF08 76FF06C4 83000005 ....6..v..v..þ....F.Öè..v..v..v. 0001A0
 006A9C76 FF0020E9 03750000 3D9C4689 00000631 9A5016FF 50868D02 6A0E76FF .v.j...P..P.1....F.*..u.Ö ..v.j. 0001C0
 16FF5086 8D0485E9 9C468800 0006569A 0676FF08 76FF06C4 83000006 0E9A016A j.......6..v..v..V....F.Ö....P.. 0001E0

Dump of file SATURN:[PCCOMMON.DUMP.DLL]SA-MERGE.DLL;1 on 18-APR-1990 10:51:16.75
File ID (417,12,0)   End of file block 105 / Allocated 108

Virtual block number 58 (0000003A), 512 (0200) bytes

 76FF0876 FF02B9E9 9C46890E C4830000 06489A01 6A006AA4 76FF5016 AA468D50 P.F`.P.vÊj.j..H....6..F.Ö¿..v..v 000000
 0020E903 7500003D 9C468900 0006759A 5016AA46 8D016AFF 4CB6FFFF 4EB6FF06 ..ÑN..ÑL.j..F`.P.u....F.*..u.Ö . 000020
 0420E99C 46880000 069A9A06 76FF0876 FF06C483 0000068C 9A016A00 6A9C76FF .v.j.j.......6..v..v.......F.Ö . 000040
 7500003D 9C468900 0006DA9A 5016FF50 8680016A A676FFA8 76FF0676 FF0876FF .v..v..v´.vÌj...P..P.Ö....F.*..u 000060
 46880000 06FF9A06 76FF0876 FF06C483 00000687 9A016A00 6A9C76FF 0020E903 .Ö ..v.j.j..ñ....6..v..v.......F 000080
 46890EC4 83000006 F19A016A 006AA476 FF5016AA 468D5016 FF50868D 03DCE99C .ÖÊ...P..P.F`.P.vÊj.j..þ....6..F 0000A0
 46890000 073A9A50 16AA468D 016AFF4C B6FFFF4E B6FF0676 FF0876FF 0210E99C .Ö...v..v..ÑN..ÑL.j..F`.P.:....F 0000C0
 5F9A0676 FF0876FF 06C48300 0007169A 016A006A 9C76FF00 20E90375 00003D9C .*..u.Ö ..v.j.j.......6..v..v.._ 0000E0
 9C46890A C4830000 07519A01 6A006AA4 76FF5016 AA468D03 77E99C46 88000007 ....F.Öw..F`.P.vÊj.j..Q....6..F. 000100
 46890000 079A9A50 16FF5086 8D016AFF 4CB6FFFF 4EB6FF06 76FF0876 FF01B1E9 ÖÝ..v..v..ÑN..ÑL.j...P..P......F 000120
 BF9A0676 FF0876FF 06C48300 0007779A 016A006A 9C76FF00 20E90375 00003D9C .*..u.Ö ..v.j.j..w....6..v..v..¢ 000140
 46890AC4 83000007 B19A016A 006AA476 FF5016FF 50868D03 17E99C46 88000007 ....F.Ö....P..P.vÊj.j..Ý....6..F 000160
 46890000 FFFF9A50 16AA468D 016AFF4C B6FFFF4E B6FF0676 FF0876FF 0150E99C .ÖP..v..v..ÑN..ÑL.j..F`.P......F 000180
 B69A0676 FF0876FF 06C48300 0003799A 016A006A 9C76FF00 20E90375 0000309C .*..u.Ö ..v.j.j..y....6..v..v..Ñ 0001A0
 9C46890A C4830000 080F9A01 6A006AA4 76FF5016 AA468D02 B7E99C46 88000003 ....F.Öñ..F`.P.vÊj.j.......6..F. 0001C0
 3D9C4689 00000588 9A5016FF 50868D01 6AA676FF A876FF06 76FF0876 FF00F1E9 Öþ..v..v..v´.vÌj...P..P......F.* 0001E0

Dump of file SATURN:[PCCOMMON.DUMP.DLL]SA-MERGE.DLL;1 on 18-APR-1990 10:51:16.75
File ID (417,12,0)   End of file block 105 / Allocated 108

Virtual block number 59 (0000003B), 512 (0200) bytes

 0005AD9A 0676FF08 76FF06C4 83000008 359A016A 006A9C76 FF0020E9 03750000 ..u.Ö ..v.j.j..5....6..v..v..Ù.. 000000
 E99C4689 0AC48300 00084F9A 016A006A A476FF50 16FF5086 8D0259E9 9C468800 ..F.ÖY...P..P.vÊj.j..O....6..F.Ö 000020
 3D0075E9 0078E99C 46890AC4 83000009 089A016A 006AA476 FF5016AA 468D0092 ...F`.P.vÊj.j.......6..F.Öx.Öu.* 000040
 75982C3D F09FE903 75982B3D FD00E903 75982A3D 001BE903 7EFEBCE9 0375982D -.u.Ö¥±-.Ö..**.u.Ö.»=+.u.Ö.»=,.u 000060
 3DFFA3E9 037D982E 3DFF4CE9 037C9830 3D001BE9 037E9831 3DFFBBE9 FE40E903 .Ö@±ÖÉ.=1.-.Ö..=0.|.ÖL.=..).ÖÉ.= 000080
 E9037D98 4630FECA E9037F98 453DFF90 E9037098 443DFF98 E9FEDDE9 037F982F /...ÖÌ±Ö..=D.).Ö..=E...Öò±=F.).Ö 0000A0
 9C46C700 08E90374 019C7E83 FF6EE9FC 98E90375 C00BFF19 E9037F98 4730FF80 ..=G...Ö...6u.Ö.=Ön..-..t.Ö..úF. 0000C0
 0015E903 75009C7E 83001EE9 018CE99C 46880009 E9037402 9C7E8300 30E90000 ..Ö0..-..t.Ö...F.Ö..Ö...-..u.Ö.. 0000E0
 76FF1076 FF0676FF 0876FF01 68E99C46 8806C483 0000059F 9A016A00 6A9C76FF .v.j.j.......6..F.Ök..v..v..v..v 000100
 E99C4688 0006E903 7500003D 9C468900 00FFFF9A 505200EE 05FE5688 FC46880E ..F*.V±.Ÿ.RP......F.*..u.Ö...F.Ö 000120
 06E90375 00003D9C 468908C4 83FFFF00 009A0676 FF0876FF 0A76FF0C 76FF013E >..v..v..v..v.......6..F.*..u.Ö. 000140
 C48309A7 00949A06 76FF0876 FF0A76FF 0C76FF0E 76FF1076 FF0119E9 9C468800 ..F.Ö...v..v..v..v..v..v....Ì..6 000160
 76FF0A76 FF0C76FF 0E76FF10 76FF00EE E99C4688 0006E903 7500003D 9C46890C ..F.*..u.Ö...F.ÖŸ..v..v..v..v..v 000180
 1076FF00 C3E99C46 880006E9 03750000 3D9C4689 0CC48309 D216249A 0676FF08 ..v..$.@..6..F.*..u.Ö...F.Öú..v. 0001A0
 E9037500 003D9C46 890CC483 09FD174A 9A0676FF 0876FF0A 76FF0C76 FF0E76FF .v..v..v..v..v..J.».6..F.*..u.Ö 0001C0
 83039C14 FE9A0676 FF0876FF 0A76FF0C 76FF0E76 FF1076FF 0098E99C 46880006 ...F.Ö...v..v..v..v..v..v..±.... 0001E0
```

Dump of file SATURN:[PCCOMMON.DUMP.DLL]SA-MERGE.DLL;1 on 18-APR-1990 10:51:16.75
File ID (417,12,0)   End of file block 105 / Allocated 108

Virtual block number 60 (0000003C), 512 (0200) bytes

```
FFA276FF 0039E903 75009E7E 83006DE9 9C468800 06E90375 00003D9C 46890CC4 á..F.=..u.Õ...F.Õm..~..u.Õ9..vÅ. 000000
6A12209A 0676FF08 76FFFF4C B6FFFF4E B6FFA676 FFA876FF F676FFF8 76FFA076 v..v½.v−.v´.v¦.ÑN..ÑL..v..v.. .j 000020
76FF0C76 FF0E76FF 1076FF00 28E99C46 880006E9 03750000 309C4689 14C4830A ..á..F.=..u.Õ...F.Õ+..v..v..v..v 000040
0000E99C 46880006 E9037500 003D9C46 890CC483 055E1188 9A0676FF 0876FF0A ..v..v..£.^..é..F.=..u.Õ...F.Õ.. 000060
8D266A0A 76FF0C76 FF1276FF 1476FFD8 8E04ECB8 1E565700 00FEC8CB C95F5E1F .^_èùà±..WV.¡š..Ä.v..v..v..v.j&. 000080
FF1076FF 02D1E9FF 56868800 07E90375 00003DFF 56868900 000AD19A 5016AA46 F¯.P.¦.....V.=..u.Õ....V.Õ¦..v.. 0000A0
07E90375 00003DFF 56868900 00FFFF9A 5016FF02 868D266A 0676FF08 76FF0E76 v..v..v.j&.....P.......V.=..u.Õ. 0000C0
26008826 AA76C402 E3C1A85E 88A846FF 0003E900 00A846C7 02A5E9FF 56868800 ...V.ÕE.úF´..Õ...F´.^´èD.áv˜&..& 0000E0
026A30FF 260270FF 26AA76C4 02E3C1A8 5E881276 FF1476FF 025AE903 7502400B .ə.u.ÕZ..v..v..^´èD.áv˜&.p.&.0j. 000100
46C7024F E9FF5686 880007E9 03750000 3DFF5686 8900000B 909A5016 FF06868D .....P.......V.=..u.Õ....V.ÕO.úF 000120
8689FF04 9688FF02 868808C4 83048200 109A5016 82468050 16FF0686 8D0001FE ±.......P.Fý.P...ý..é........... 000140
FF589EC4 0E76FF10 76FF007B E9037502 470B2607 8826FF58 9EC4FF5A 9689FF58 X...Z.á.X.&..&.G.u.Õ(..v..v.é.X. 000160
0007E903 7500003D FF568689 000007F8 9A5016FF 5C868002 6A37FF26 0277FF26 &.w.&.7j...\..P.½.....V.=..u.Õ.. 000180
8D002AE9 03740000 3D0000FF FF9A5016 FF5C868D 50168246 8D01E6E9 FF568688 ..V.Õ¦..fý.P..\..P.....=..t.Õ*.. 0001A0
8689FF04 9688FF02 86880000 FFFF9A50 FE46FFFE 46885016 82468050 16FF0686 ....P.Fý.P.F±.F±P............... 0001C0
AA76C402 E3C1A85E 881276FF 1476FFFF 75E904FF 58868300 05E9FF5A 9689FF58 X...Z.Õ....X..Õu..v..v..^´èD.áv˜ 0001E0
```

Dump of file SATURN:[PCCOMMON.DUMP.DLL]SA-MERGE.DLL;1 on 18-APR-1990 10:51:16.75
File ID (417,12,0)   End of file block 105 / Allocated 108

Virtual block number 61 (0000003D), 512 (0200) bytes

```
E9037500 003DFF56 86890000 0CD99A26 6A0A76FF 0C76FF07 6A30FF26 0270FF26 &.p.&.0j..v..v.j&.).....V.=..u.Õ 000000
6A30FF26 0270FF26 AA76C402 E3C1A85E 880E76FF 1076FF01 64E9FF56 868B0007 ....V.Õd..v..v..^´èD.áv˜&.p.&.0j 000020
2CE9FF56 86880007 E9037500 003DFF56 86890000 00139A26 6A0676FF 0876FF07 ..v..v.j&.......V.=..u.Õ....V.Õ, 000040
00003DFF 56868900 000CA19A 5016AE46 8D2D6A0A 76FF0C76 FF1276FF 1476FF01 ..v..v..v..v.j-.FÛ.P.À.....V.=.. 000060
5016FF52 868D2D6A 0676FF08 76FF0E76 FF1076FF 0101E9FF 56868800 07E90375 u.Õ....V.Õ...v..v..v..v.j-..R..P 000080
5E881276 FF1476FF 0005E9FF 56868800 07E90375 00003DFF 56868900 00FFFF9A .......V.=..u.Õ....V.Õ¦..v..v..^ 0000A0
56868900 00FFFF9A 046AAE76 FFB076FF 156A30FF 260270FF 26AA76C4 02E3C1A8 ´èD.áv˜&.p.&.0j..v¯.vÛj........V 0000C0
26AA76C4 02E3C1A8 5E880E76 FF1076FF 009DE9FF 56868800 07E90375 00003DFF .=..u.Õ....V.Õ...v..v..^´èD.áv˜& 0000E0
03750000 3DFF5686 890000FF FF9A046A FF5286FF FF5486FF 156A30FF 260270FF .p.&.0j..ÑT..ÑR.j........V.=..u. 000100
30FF2602 70FF26AA 76C402E3 C1A85E88 0E76FF10 76FF0063 E9FF5686 880007E9 Õ....V.Õc..v..v..^´èD.áv˜&.p.&.0 000120
E9002EE9 FF568688 0007E903 7500003D FF568689 0000FFFF 9A5016B2 468D026A j..Fý.P.......V.=..u.Õ....V.Õ..Õ 000140
02B6FFFF 04B6FF0E 76FF1076 FF00000D 829AAA76 FFAC76FF 1276FF14 76FFFD8E .».v..v..v¯.v´......v..v..Ñ...Ñ. 000160
D88E0A8D 881E5657 000060C8 0010CAC9 5F5E1F00 00E9FF56 86880000 FFFF9AFF ........V.Õ...^_èb..à'..WV.¡...Ä 000180
0006E903 7500003D EE468900 0005019A 5016FA46 8D0676FF 0876FF00 00A046C7 úF....v..v..F¹.P̄......FŸ=..u.Õ.. 0001A0
46880006 E9037500 003DEE46 89000005 1F9A5016 FC468DFA 76FF0133 E9EE4688 .FŸÕ3..v¹.F=.P......FŸ=..u.Õ...F 0001C0
3DEE4689 00000AA5 9A5016F6 468D066A 0A76FF0C 76FF0676 FF0876FF 0115E9EE ŸÕ...v..v..v..v.j..F-.P.Ē....FŸ= 0001E0
```

Dump of file SATURN:[PCCOMMON.DUMP.DLL]SA-MERGE.DLL;1 on 18-APR-1990 10:51:16.75
File ID (417,12,0)   End of file block 105 / Allocated 108

Virtual block number 62 (0000003E), 512 (0200) bytes

```
76C402E3 C1F05E88 F046FF00 03E90000 F046C700 ECE9EE46 880006E9 03750000 ..u.Õ...FŸÕš.úFÞ..Õ...FÞ.^ÞèD.áv 000000
0270FF26 F676C402 E3C1F05E 880676FF 0876FF00 85E90375 02400826 008826F6 -&..&.ə.u.Õç..v..v..^ÞèD.áv-&.p. 000020
0099E9EE 46880006 E9037500 003DEE46 8900000B 279A5016 A2468D01 6A30FF26 &.0j..FÅ.P.'....FŸ=..u.Õ...FŸÕ.. 000040
30FF2602 70FF26F6 76C402E3 C1F05E88 0E76FF10 76FF5016 F2468D50 16A0468D .F..P.F·.P.v..v..^ÞèD.áv-&.p.&.0 000060
58E9EE46 880006E9 03750000 3DEE4689 16C4830E C903489A 0676FF08 76FF1E6A j..v..v..H.è..é..FŸ=..u.Õ...FŸÕX 000080
30FF2602 70FF26F6 76C402E3 C1F05E88 F276FFF4 76FF0E76 FF1076FF A076FF00 ..v..v..v..v¶.v·.^ÞèD.áv-&.p.&.0 0000A0
E9001AE9 EE468800 06E90375 000030EE 468912C4 830A3F1B 6A9A0676 FF0876FF .v..v..j.7..é..FŸ=..u.Õ...FŸÕ..Õ 0000C0
60C8CBC9 5F5E1F00 00E9EE46 8800000D 6F9AF676 FFF876FF 0676FF08 76FFFF33 3..v..v..v½.v−.o....FŸÕ...^_èùà' 0000E0
00003DF2 46890000 00B19A50 16FA468D 0676FF08 76FFD88E 009CB81E 56570000 ..WV.¡...Ä.v..v..F¹.P.Ÿ....F̄·=.. 000100
03750000 3DF24689 000000CF 9A5016FC 468DFA76 FF01CCE9 F2468800 06E90375 u.Õ...F·Õä..v¹.F=.P.Û....F·=..u. 000120
0000F89A 5016EE46 8D136A0A 76FF0C76 FF0676FF 0876FF01 AEE9F246 880006E9 Õ...F·ÕO..v..v..v..v.j..FŸ.P.½.. 000140
F45E88F4 46FF0003 E90000F4 46C70185 E9F24688 0006E903 7500003D F2468900 ..F·=..u.Õ...F·Õ..úF¶..Õ...F¶.^¶ 000160
76C402E3 C1F45E88 0676FF08 76FF014E E9037502 400B2600 8826EE76 C402E3C1 èD.ávŸ&..&.ə.u.ÕN..v..v..^¶èD.áv 000180
880006E9 03750000 3DF24689 00000E4B 9A5016A2 468D016A 30FF2602 70FF26EE Ÿ&.p.&.0j..FÅ.P.K....F·=..u.Õ... 0001A0
FF26EE76 C402E3C1 F45E880E 76FF1076 FF5016F6 468D5016 A0468D01 32E9F246 F·Õ2..F..P.F−.P.v..v..^¶èD.ávŸ&. 0001C0
0006E903 7500003D F2468916 C483108B 03489A06 76FF0876 FF236A30 FF260270 p.&.0j#.v..v..H....é..F·=..u.Õ.. 0001E0
```

Dump of file SATURN:[PCCOMMON.DUMP.DLL]SA-MERGE.DLL;1 on 18-APR-1990 10:51:16.75
File ID (417,12,0)   End of file block 105 / Allocated 108

Virtual block number 63 (0000003F), 512 (0200) bytes

```
6A016A00 3CE90374 0900E4BF 8326FC5E C4004AE9 037500A0 7E8300F1 E9F2468B .F·Ðþ..-..u.ÕJ.á^=&.¢ð..t.Õ<.j.j 000000
18849A06 76FF0876 FF30FF26 0270FF26 EE76C402 E3C1F45E 8BF676FF F876FF00 ..v½.v-.^¶èÐ.év¥&.p.&.0.v..v.... 000020
E4BF8326 FC5EC400 84E900A1 E9F2468B 0006E903 75000030 F2468910 C483FFFF ...á..F·=..u.Õ...F·ÕÀ.Õ..á^=&.¢ð 000040
260270FF 26EE76C4 02E3C1F4 5E880E76 FF1076FF 5016A246 8D003AE9 03740A00 ..t.Õ:..FÀ.P.v..v..^¶èÐ.év¥&.p.& 000060
56E9F246 880006E9 03750000 3DF24689 10C48310 C70BFB9A 0676FF08 76FF30FF .0.v..v..«.ú..á..F·=..u.Õ...F·ÕV 000080
76FF30FF 260270FF 26EE76C4 02E3C1F4 5E880E76 FF1076FF 5016A246 8D006A00 .j..FÀ.P.v..v..^¶èÐ.év¥&.p.&.0.v 0000A0
FE9AE900 1AE9F246 880006E9 03750000 3DF24689 12C4830E 8800BD9A 0676FF08 ..v..§....á..F·=..u.Õ...F·Õ..Õ.± 0000C0
000060C8 C8C95F5E 1F0000E9 F2468800 000EEF9A EE76FFF0 76FF0676 FF0876FF .v..v..vÞ.v¥.ÿ....F·Õ...^_èùà'.. 0000E0
03750000 3DEE4689 00000F16 9A5016FA 468D0676 FF0876FF D88E0F06 881E5657 WV.¦...Ä.v..v..F¹.P......F¥=..u. 000100
06E90375 00003DEE 46890000 0F349A50 16FC468D FA76FF01 CFE9EE46 880006E9 Õ...F¥ÕÜ..v¹.F=.P.4....F¥=..u.Õ. 000120
8900000F 5D9A5016 F6468D13 6A0A76FF 0C76FF06 76FF0876 FF01B1E9 EE468800 ..F¥Õ¥..v..v..v..v.j..F-.P.].... 000140
E3C1F05E 8BF046FF 0003E900 00F046C7 0188E9EE 46880006 E9037500 003DEE46 F¥=..u.Õ...F¥Õ..úFÞ..Õ...FÞ.^ÞèÐ 000160
26F676C4 02E3C1F0 5E880676 FF0876FF 014EE903 75024008 26008826 F676C402 .év-&..&.ã.u.ÕN..v..v..^ÞèÐ.év-& 000180
EE468800 06E90375 00003DEE 46890000 0FB09A50 16A2468D 016A30FF 260270FF .p.&.0j..FÀ.P.¯....F¥=..u.Õ...F¥ 0001A0
0270FF26 F676C402 E3C1F05E 880E76FF 1076FF50 16F2468D 5016A046 8D0135E9 Õ5..F..P.F·.P.v..v..^ÞèÐ.év-&.p. 0001C0
46880006 E9037500 003DEE46 8916C483 12890348 9A0676FF 0876FF25 6A30FF26 &.0j%.v..v..H....á..F¥=..u.Õ...F 0001E0
```

Dump of file SATURN:[PCCOMMON.DUMP.DLL]SA-MERGE.DLL;1 on 18-APR-1990 10:51:16.75
File ID (417,12,0)   End of file block 105 / Allocated 108

Virtual block number 64 (00000040), 512 (0200) bytes

```
FF006A01 6A003CE9 03740900 E4BF8326 FC5EC400 4AE90375 00A07E83 00F4E9EE ¥Õ¶..-..u.ÕJ.á^=&.¢ð..t.Õ<.j.j.. 000000
10401C07 9A0676FF 0876FF30 FF260270 FF26F676 C402E3C1 F05E8BF2 76FFF476 v¶.v·.^ÞèÐ.év-&.p.&.0.v..v....ã. 000020
0A00E4BF 8326FC5E C40084E9 00A4E9EE 46880006 E9037500 003DEE46 8910C483 .á..F¥=..u.Õ...F¥ÕÉ.Õ..á^=&.¢ð.. 000040
30FF2602 70FF26F6 76C402E3 C1F05E88 0E76FF10 76FF5016 A2468D00 3AE90374 t.Õ:..FÀ.P.v..v..^ÞèÐ.év-&.p.&.0 000060
6A0059E9 EE468800 06E90375 00003DEE 468910C4 8312C508 FB9A0676 FF0876FF .v..v..«.é..á..F¥=..u.Õ...F¥Õ¥.j 000080
FF0876FF 30FF2602 70FF26F6 76C402E3 C1F05E88 0E76FF10 76FF5016 A2468D00 ..FÀ.P.v..v..^ÞèÐ.év-&.p.&.0.v.. 0000A0
76FFFE9A E90010E9 EE468800 06E90375 00003DEE 468912C4 830FF000 8D9A0676 v..§.Þ..á..F¥=..u.Õ...F¥Õ..Õ.±.v 0000C0
0060C8C8 C95F5E1F 0000E9EE 46890000 B8000010 ED9AF676 FFF876FF 0676FF08 ..v..v½.v-.Ú...¦...F¥Õ...^_èùà'. 0000E0
75000030 EE468900 0011149A 5016FA46 8D0676FF 0876FFD8 8E1104B8 1E565700 .WV.¦...Ä.v..v..F¹.P......F¥=..u 000100
E9037500 003DEE46 89000011 329A5016 FC468DFA 76FF01CF E9EE4688 0006E903 .Õ...F¥ÕÜ..v¹.F=.P.2....F¥=..u.Õ 000120
00001158 9A5016F6 468D136A 0A76FF0C 76FF0676 FF0876FF 01B1E9EE 46880006 ...F¥Õ¥..v..v..v..v.j..F-.P.[... 000140
C1F05E88 F046FF00 03E90000 F046C701 88E9EE46 880006E9 03750000 3DEE4689 .F¥=..u.Õ...F¥Õ..úFÞ..Õ...FÞ.^Þé 000160
F676C402 E3C1F05E 880676FF 0876FF01 4EE90375 02400826 008B26F6 76C402E3 Ð.év-&..&.ã.u.ÕN..v..v..^ÞèÐ.év- 000180
46880006 E9037500 003DEE46 89000011 AE9A5016 A2468D01 6A30FF26 0270FF26 &.p.&.0j..FÀ.P.Û....F¥=..u.Õ...F 0001A0
70FF26F6 76C402E3 C1F05E88 0E76FF10 76FF5016 F2468D50 16A0468D 0135E9EE ¥Õ5..F..P.F·.P.v..v..^ÞèÐ.év-&.p 0001C0
880006E9 03750000 3DEE4689 16C48311 EE03489A 0676FF08 76FF246A 30FF2602 .&.0j$.v..v..H.Y..á..F¥=..u.Õ... 0001E0
```

Dump of file SATURN:[PCCOMMON.DUMP.DLL]SA-MERGE.DLL;1 on 18-APR-1990 10:51:16.75
File ID (417,12,0)   End of file block 105 / Allocated 108

Virtual block number 65 (00000041), 512 (0200) bytes

```
006A016A 003CE903 740900E4 BF8326FC 5EC4004A E9037500 A07E8300 F4E9EE46 F¥Õ¶..-..u.ÕJ.á^=&.¢ð..t.Õ<.j.j. 000000
3E1A2F9A 0676FF08 76FF30FF 260270FF 26F676C4 02E3C1F0 5E8BF276 FFF476FF .v¶.v·.^ÞèÐ.év-&.p.&.0.v..v../.> 000020
00E4BF83 26FC5EC4 0084E900 A4E9EE46 880006E9 03750000 3DEE4689 10C48312 ..á..F¥=..u.Õ...F¥ÕÉ.Õ..á^=&.¢ð. 000040
FF260270 FF26F676 C402E3C1 F05E880E 76FF1076 FF5016A2 468D003A E903740A .t.Õ:..FÀ.P.v..v..^ÞèÐ.év-&.p.&. 000060
0059E9EE 46880006 E9037500 003DEE46 8910C483 14C608FB 9A0676FF 0876FF30 0.v..v..«.ó..á..F¥=..u.Õ...F¥ÕY. 000080
0876FF30 FF260270 FF26F676 C402E3C1 F05E880E 76FF1076 FF5016A2 468D006A j..FÀ.P.v..v..^ÞèÐ.év-&.p.&.0.v. 0000A0
FFFE9AE9 001DE9EE 46880006 E9037500 003DEE46 8912C483 13EF008D 9A0676FF .v..§.ÿ..á..F¥=..u.Õ...F¥Õ..Õ.±. 0000C0
5AC8C8C9 5F5E1F00 00E9EE46 89000088 000012E8 9AF676FF F876FF06 76FF0876 v..v..v½.v-.Š...¦...F¥Õ...^_èùàZ 0000E0
135C9A50 16FC468D 056A0A76 FF0C76FF 0676FF08 76FFD88E 1305B81E 56570000 ..WV.¦...Ä.v..v..v..v.j..F=.P.\. 000100
5E8BF646 FF0003E9 0000F646 C700ECE9 F4468800 06E90375 00003DF4 46890000 ...F¶=..u.Õ...F¶Õ£.úF-..Õ...F-.^ 000120
C402E3C1 F65E8806 76FF0876 FF0085E9 03750240 08260088 26FC76C4 02E3C1F6 -èÐ.év=&..&.ã.u.Õç..v..v..^-èÐ.é 000140
0006E903 75000030 F4468900 0013AF9A 5016A846 8D016A30 FF260270 FF26FC76 v=&.p.&.0j..F¯.P.£....F¶=..u.Õ.. 000160
26FC76C4 02E3C1F6 5E880E76 FF1076FF 5016F846 8D5016A6 46800099 E9F4468B .F¶Õ...F¦.P.F½.P.v..v..^-èÐ.év=& 000180
06E90375 000030F4 468916C4 8315EF03 489A0676 FF0876FF 1F6A30FF 260270FF .p.&.0j..v..v..H.ÿ..á..F¶=..u.Õ. 0001A0
26FC76C4 02E3C1F6 5E88F876 FFFA76FF 0E76FF10 76FFA676 FF0058E9 F4468800 ..F¶ÕX..v¦.v..v..v¹.v½.^-èÐ.év=& 0001C0
880006E9 03750000 3DF44689 12C48314 8A15749A 0676FF08 76FF30FF 260270FF .p.&.0.v..v..t....á..F¶=..u.Õ... 0001E0
```

Dump of file SATURN:[PCCOMMON.DUMP.DLL]SA-MERGE.DLL;1 on 18-APR-1990 10:51:16.75
File ID (417,12,0)   End of file block 105 / Allocated 108

Virtual block number 66 (00000042), 512 (0200) bytes

```
1F0000E9 F4468800 0014EC9A FC76FFFE 76FF0676 FF0876FF FF33E900 1AE9F446 F¶Õ..Õ3..v..v..v±.v=.§....F¶Õ... 000000
4680046A 0A76FF0C 76FF0676 FF0876FF D88E1506 B81E5657 00005AC8 CBC95F5E ^_èùàZ..WV.¡...Ä.v..v..v..v.j..F 000020
03E90000 FA46C700 ECE9F446 880006E9 03750000 3DF44689 0000151E 9A5016FC •.P......F¶=..u.Õ...F¶Õ§.úF•..Õ. 000040
880676FF 0876FF00 B5E90375 02400B26 008B26FC 76C402E3 C1FA5E88 FA46FF00 ..F•.^•èD.áv=&..&.ä.u.Õç..v..v.. 000060
003DF446 89000015 719A5016 AB468001 6A30FF26 0270FF26 FC76C402 E3C1FA5E ^•èD.áv=&.p.&.0j..F´.P.q....F¶=. 000080
C1FA5E88 0E76FF10 76FF5016 F6468050 16A6468D 0099E9F4 46880006 E9037500 .u.Õ...F¶Õ...FÌ.P.F-.P.v..v..^•è 0000A0
3DF44689 16C48317 1503489A 0676FF08 76FF216A 30FF2602 70FF26FC 76C402E3 D.áv=&.p.&.0jl.v..v..H....á..F¶= 0000C0
C1FA5E88 F676FFF8 76FF0E76 FF1076FF A676FF00 58E9F446 880006E9 03750000 ..u.Õ...F¶ÕX..vÌ.v..v..v½.v-.^•è 0000E0
00003DF4 468912C4 8315811A 069A0676 FF0876FF 30FF2602 70FF26FC 76C402E3 D.áv=&.p.&.0.v..v....Ý..á..F¶=.. 000100
88000016 159AFC76 FFFE76FF 0676FF08 76FFFF33 E9001AE9 F4468800 06E90375 u.Õ...F¶Õ..Õ3..v..v..v±.v=...... 000120
FF0C76FF 0676FF08 76FFD88E 162CB81E 56570000 0CC8CBC9 5F5E1F00 00E9F446 F¶Õ...^_èùà...WV.¡...Ä.v..v..v.. 000140
C700DFE9 F8468800 06E90375 00003DF8 46890000 16449A50 16F4468D 036A0A76 v.j..F¶.P.D....F½=..u.Õ...F½ÕÕ.ú 000160
FF00A8E9 03750240 0B260088 26F476C4 02E3C1FE 5E88FE46 FF0003E9 0000FE46 F±..Õ...F±.^±èD.áv¶&..&.ä.u.Õ´.. 000180
000C759A 5016FA46 8D046A30 FF260270 FF26F476 C402E3C1 FE5E8806 76FF0876 v..v..^±èD.áv¶&.p.&.0j..F•.P.u.. 0001A0
FFA7E900 03E90375 FC460BFA 4688008C E9F84688 0006E903 7500003D F8468900 ..F½=..u.Õ...F½Õ...F•.F=u.Õ..ÕI. 0001C0
2E18639A 0676FF08 76FF30FF 260270FF 26F476C4 02E3C1FE 5E880E76 FF1076FF .v..v..^±èD.áv¶&.p.&.0.v..v..c.. 0001E0
```

Dump of file SATURN:[PCCOMMON.DUMP.DLL]SA-MERGE.DLL;1 on 18-APR-1990 10:51:16.75
File ID (417,12,0)   End of file block 105 / Allocated 108

Virtual block number 67 (00000043), 512 (0200) bytes

```
FF26F476 C402E3C1 FE5E8800 49E9F846 880006E9 03750000 30F84689 0CC48318 ..á..F½=..u.Õ...F½ÕI..^±èD.áv¶&. 000000
46880006 E9037500 003DF846 8908C483 097C19A0 9A0676FF 0876FF30 FF260270 p.&.0.v..v....|..á..F½=..u.Õ...F 000020
5E1F0000 E9F84688 0000173B 9AF476FF F676FF06 76FF0876 FFFF40E9 001AE9F8 ½Õ..Õä..v..v..v-.v¶.;....F½Õ...^ 000040
A8468001 6A0A76FF 0C76FF06 76FF0876 FFD88E17 52B81E56 5700005A C8CBC95F _èùàZ..WV.¡R..Ä.v..v..v..v.j..F´ 000060
FC468050 16A6468D 0103E9F4 46880006 E9037500 003DF446 89000016 979A5016 ¯P......F¶=..u.Õ...F¶Õ...FÌ.P.F= 000080
468916C4 8318ED03 489A0676 FF0876FF 226A0A76 FF0C76FF 0E76FF10 76FF5016 .P.v..v..v..v.j".v..v..H.Ú..á..F 0000A0
76FFFC76 FFFE76FF 0E76FF10 76FFA676 FF00CCE9 F4468800 06E90375 00003DF4 ¶=..u.Õ...F¶Õä..vÌ.v..v..v±.v=.v 0000C0
F4468800 06E90375 00003DF4 468912C4 83160718 A29A0676 FF0876FF 0A76FF0C ..v..v..v..Ä.■..á..F¶=..u.Õ...F¶ 0000E0
003DF446 89000017 6A9A5016 F8468D05 6A0A76FF 0C76FF06 76FF0876 FF0098E9 Õ...v..v..v..v.j..F½.P.j....F¶=. 000100
F876C402 E3C1F65E 88F646FF 0003E900 00F646C7 006FE9F4 46880006 E9037500 .u.Õ...F¶Õo.úF-..Õ...F-.^-èD.áv½ 000120
260270FF 26F876C4 02E3C1F6 5E880E76 FF1076FF 0038E903 75024008 26008826 &..&.ä.u.Õ8..v..v..^-èD.áv½&.p.& 000140
1AE9F446 880006E9 03750000 30F44689 0CC48317 FF18639A 0676FF08 76FF30FF .0.v..v..c....á..F¶=..u.Õ...F¶Õ. 000160
CBC95F5E 1F0000E9 F4468800 0018549A F876FFFA 76FF0676 FF0876FF FFB0E900 .Õ¯..v..v..v•.v½.T....F¶Õ...^_èù 000180
00009A46 C70000F6 46C70000 EA46C700 00E846C7 D88E186B 881E5657 000066C8 àf..WV.¡k..ÄúFÒ..úFõ..úF-..úF¯... 0001A0
0018839A 50169C46 8D016A0A 76FF0C76 FF0676FF 0876FFEE 4689F046 89000088 ¡...FÞ.FŸ.v..v..v..v.j..F..P.... 0001C0
046A0A76 FF0C76FF 0676FF08 76FF01D6 E9E84688 0006E903 7500003D E8468900 ..FÒ=..u.Õ...FÒÕ■..v..v..v..v.j. 0001E0
```

Dump of file SATURN:[PCCOMMON.DUMP.DLL]SA-MERGE.DLL;1 on 18-APR-1990 10:51:16.75
File ID (417,12,0)   End of file block 105 / Allocated 108

Virtual block number 68 (00000044), 512 (0200) bytes

```
5016F646 8001ADE9 E8468800 06E90375 00003DE8 46890000 17B09A50 16FC468D .F=.P.§....FÒ=..u.Õ...FÒÕÚ..F-.P 000000
7500003D E8468910 C4831A77 030A9A06 76FF0876 FF0A76FF 0C76FF50 16F8468D .F½.P.v..v..v..v....w..á..FÒ=..u 000020
46800098 E90375FE 460BFC46 88F24689 F4468900 0088017E E9E8468B 0006E903 .Õ...FÒÕ~.¡...F¶.F·.F=.F±u.Õ...F 000040
3DE84689 10C48309 51030A9A 0676FF08 76FFFC76 FFFE76FF 5016F246 8D50169A ..P.F·.P.v±.v=.v..v....Q..á..FÒ= 000060
FFFA76FF 0676FF08 76FF0060 E9037400 F67E8301 38E9E846 880006E9 03750000 ..u.Õ...FÒÕ;..—.t.Õ'..v..v..v•. 000080
E9E8468B 0006E903 7500003D E8468900 000C4A9A 056AF276 FFF476FF 046AF876 v½j..v¶.v·j..J....FÒ=..u.Õ...FÒÕ 0000A0
1B1E9A00 6AF876FF FA76FF45 8D680676 FF0876FF F276FFF4 76FF006A 006A0106 ..j.j..v¶.v·.v..v.h.E.v•.v½j.... 0000C0
E9037400 F67E8300 3DE9000D2 E9E8468B 0006E903 7500003D E8468914 C4830000 ...á..FÒ=..u.Õ...FÒÕ■.Õ=..—.t.Õ 0000E0
FFFF9A00 6AF876FF FA76FF45 8D680676 FF0876FF F276FFF4 76FF006A 006A0034 4.j.j..v¶.v·.v..v.h.E.v•.v½j.... 000100
FF0C76FF 0676FF08 76FF0092 E9E8468B 0006E903 7500003D E8468914 C4830000 ...á..FÒ=..u.Õ...FÒÕ...v..v..v.. 000120
C70069E9 E8468800 06E90375 00003DE8 46890000 19179A50 16EE468D 056A0A76 v.j..FŸ.P......FÒ=..u.Õ...FÒÕi.ú 000140
880032E9 03750240 0B26008B 26EE76C4 02E3C1EC 5E88EC46 FF0003E9 0000EC46 F§..Õ...F§.^§èD.áv Ÿ&..&.ä.u.Õ2.. 000160
E8468908 C4831968 19A09A06 76FF0876 FF30FF26 0270FF26 EE76C402 E3C1EC5E ^§èD.áv Ÿ&.p.&.0.v..v....k..á..FÒ 000180
19919AEE 76FFF076 FF0676FF 0876FFFF B6E9001A E9E8468B 0006E903 7500003D •..u.Õ...FÒÕ..ÕR..v..v..vÞ.vŸ... 0001A0
015C0006 1B4A0203 00000002 143F0002 001990C8 C95F5E1F 0000E9E8 46880000 ...FÒÕ...^_èù.....?.......J...\. 0001C0
01680006 1A060203 00000006 1B980002 00E30006 03600203 00000004 18B90002 ..¿.......ᵀ...D...............h. 0001E0
```

Dump of file SATURN:[PCCOMMON.DUMP.DLL]SA-MERGE.DLL;1 on 18-APR-1990 10:51:16.75
File ID (417,12,0)   End of file block 105 / Allocated 108

Virtual block number 69 (00000045), 512 (0200) bytes

```
0000000B 08510002 01750006 1AAD0203 00EF0006 081D0203 00000007 1A340002 ..4...........ÿ...Ù...u...Q..... 000000
00000000 19A80002 02730008 092D0203 017F0006 0C120203 00900002 04890103 .................-...s...´..... 000020
011B0006 13150203 02870008 08D20203 009A0005 13330203 01880006 18BE0203 ../.......3.......Ø............. 000040
02230007 1ADE0203 02980008 08830203 02FF000A 07D60203 00300002 04020103 ..Ø...=...ø.......°.......Ø...#. 000060
00000000 00000000 01430006 00480203 01350006 19000203 01AF0006 04500203 ..P...£...Ì...5...H...C......... 000080
F6468900 00B8FA46 89FC4689 0000B800 04FE46C7 D88EFFFF B81E5657 00000EC8 à...WV.¡...ÄúF±..¡...F•.F*¡...F- 0000A0
FF0676FF 0876FF00 47E90372 F84639FE 4688F846 FF0003E9 0000F846 C7F44689 .F¶úF½..Õ...F½.F±9F½r.ÕG..v..v.. 0000C0
03750000 3DF24689 0000FFFF 9A5016FA 468D0000 B7FFE3D1 F85E8B0A 76FF0C76 v..v..^½ÌD.ñÅ..F*.P......F·=..u. 0000E0
FFABE900 02161126 00000601 26FC56B8 FA468B19 7A068E01 26E9F246 8B0006E9 Õ...F·Õ&...z..F*.V•&....&....Õ¨. 000100
06C72600 01000006 C726197A 068E0012 E9037400 02060B26 0000A126 197A068E ..z.&À..&....t.Õ....z.&ú.....&ú. 000120
468B0006 E9037500 003DF246 890000FF FF9A5052 FFFFBA02 0AB8026A 00000002 ....j.|..¤..RP......F·=..u.Õ...F 000140
D1C103E0 D1E001C8 8B0000A1 26197A06 8E586A02 0A36FF26 197C068E 00CBE9F2 ·Õù...|.&.6..j[..z.&À...àÌÀÌÀ.è1 000160
FF26197C 068E0014 E9037500 003DF246 890000FF FF9A5052 00AABA02 068B50E0 ÀP¡..¤ .RP......F·=..u.Õ....|.&. 000180
568301FA 46830008 E9FA4689 FC468900 00B80081 E9F2468B 0000FFFF 9A020A36 6........F·Õ..¡...F•.F*Õ...F*..V 0001A0
72FA4639 0008E903 7D0052E9 037EFC56 39000216 8B260000 A126197A 068E00FC •...z.&À..&....9V•-.ÕR.).Õ..9F*r 0001C0
8E0AFA76 68008926 02408926 0000B802 0636C426 197E068E 0AFA5E68 0045E903 .ÕE.k^*...~.&66..¡..&.ə.&..kv*.. 0001E0
```

Dump of file SATURN:[PCCOMMON.DUMP.DLL]SA-MERGE.DLL;1 on 18-APR-1990 10:51:16.75
File ID (417,12,0)   End of file block 105 / Allocated 108

Virtual block number 70 (00000046), 512 (0200) bytes

```
02061EC4 26197E06 8E0AFA76 68044089 26064089 260000B8 02061EC4 26197E06 .~.&6...¡..&.ə.&.ə.kv*...~.&6... 000000
D88E0008 B81E5657 00000EC8 CBC95F5E 1F0000E9 F2468BFF 91E90000 0840C726 &úə...Õ...F·Õ...^_èùà...WV.¡...Ä 000020
9A5016F6 468D0A76 FF0C76FF 0676FF08 76FF0000 F246C7FA 4689FC46 890000B8 ¡...F•.F*úF·...v..v..v..v..F-.P. 000040
E90000F8 46C70004 FE46C701 30E9F446 8B0006E9 03750000 30F44689 0000FFFF .....F¶=..u.Õ...F¶ÕO.úF±..úF½..Õ 000060
08E90374 00D88739 F6468BE3 D1F85E8B 001CE903 72F84639 FE468BF8 46FF0003 ...F½.F±9F½r.Õ...^½ÌD.F-9.Ä.t.Õ. 000080
0000F246 C700EAE9 0001B800 06E90374 00F27E83 FFD6E900 03E90001 F246C700 .úF·..Õ..Õø..~·.t.Õ..¡..Õõ.úF·.. 0000A0
02168B26 0000A126 197A068E 00FC5683 01FA4683 0008E9FA 4689FC46 890000B8 ¡...F•.F*Õ...F*..V•...z.&À..&... 0000C0
C426197E 068E0AFA 5E680097 E90372FA 46390008 E9037D00 A4E9037E FC563900 .9V•-.ÕÊ.).Õ..9F*r.Õ..k^*...~.&ó 0000E0
006AE900 70E90006 E9037402 50392600 0FE90374 0039260C 568B0A46 8B020636 6...F..V.&9.t.Õ..&9P.t.Õ..Õp.Õj. 000100
7E068E0A FA5E6800 51E90374 02400B26 00882602 0636C426 197E068E 0AFA5E68 k^*...~.&66..&..&.ə.t.ÕQ.k^*...~ 000120
02061EC4 26197E06 8E0AFA76 6B025089 26008926 0C568B0A 468B0206 36C42619 .&66...F..V.&..&.P.kv*...~.&6... 000140
89261246 8B02061E C426197E 068E0AFA 76680650 89260440 89261056 8B0E468B .F..V.&.ə.&.P.kv*...~.&6....F.&. 000160
B80006E9 0009E900 00B80009 E9037500 F27E83FF 3FE90003 E90001F2 46C70840 ə.úF·..Õ..Õ?..~·.u.Õ..¡..Õ..Õ..¡ 000180
FF0C76FF 0676FF08 76FFD88E 019CB81E 56570000 0EC8CBC9 5F5E1F00 00E90001 ..Õ...^_èùà...WV.¡...Ä.v..v..v.. 0001A0
FE46C700 FEE9F446 8B0006E9 03750000 30F44689 000001C0 9A5016F6 468D0A76 v..F-.P.à....F¶=..u.Õ...F¶Õ±.úF± 0001C0
F6468BE3 D1F85E8B 001CE903 72F84639 FE468BF8 46FF0003 E90000F8 46C70004 ..úF½..Õ...F½.F±9F½r.Õ...^½ÌD.F- 0001E0
```

Dump of file SATURN:[PCCOMMON.DUMP.DLL]SA-MERGE.DLL;1 on 18-APR-1990 10:51:16.75
File ID (417,12,0)   End of file block 105 / Allocated 108

Virtual block number 71 (00000047), 512 (0200) bytes

```
0001B800 06E90374 00F27E83 FFD6E900 03E90001 F246C700 08E90374 00088739 9.Ä.t.Õ..úF·..Õ..Õø..~·.t.Õ..¡.. 000000
197A068E 00FC5683 01FA4683 0008E9FA 4689FC46 890000B8 0000F246 C7008BE9 Õ¡.úF·..¡...F•.F*Õ...F*..V•...z. 000020
5E680065 E90372FA 46390008 E9037D00 72E9037E FC563900 02168B26 0000A126 &À..&....9V•-.Õr.).Õ..9F*r.Õe.k^ 000040
E9037402 50392600 47E90374 0039260C 568B0A46 8B020636 C426197E 068E0AFA *...~.&66...F..V.&9.t.ÕG.&9P.t.Õ 000060
57892607 89260E5E C406508B 2604408B 2602061E C426197E 068E0AFA 7668003E >.kv*...~.&6...&.ə.&.P.á^.&..&.W 000080
0003E900 01F246C7 07892612 5EC40840 8B260206 1EC42619 7E068E0A FA766B02 .kv*...~.&6...&.ə.á^.&..úF·..Õ.. 0000A0
CBC95F5E 1F0000E9 0001B800 06E90009 E90000B8 0009E903 7500F27E 83FF71E9 Õq..~·.u.Õ..¡..Õ..Õ..¡..Õ...^_èù 0000C0
5F5E1F00 00E90000 01049A02 0A36FF26 197C068E D88E0312 B81E5657 000000C8 à...WV.¡...Ä..|.&.6.......Õ...^_ 0000E0
00AF0203 01970006 03280203 0000000D 04480002 0000000C 00E60002 0007CBC9 èù....]........H.......(.......£. 000100
00000000 004F0004 00E80203 00400004 04560203 01270006 00540203 00320004 ..2...T...'...V...ə...Š...O..... 000120
00FFFF9A 5016F846 8D006AF4 4689F646 890000B8 D88EFFFF B81E5657 00000EC8 à...WV.¡...Ä¡...F-.F¶j..F½.P.... 000140
9A5016FA 4680010C 68586AF8 76FF013B E9F2468B 0006E903 75000030 F2468900 ..F·=..u.Õ...F·Õ;..v½j[h...F*.P. 000160
83216A01 10E9F246 8B0000FF FF9AF876 FF000EE9 03750000 3DF24689 0000FFFF .....F·=..u.Õ...v½......F·Õ..j!. 000180
76FF016A 0AC483FF FF00469A FA76FFFC 76FFFC77 FF26FE77 FF26065E C4040646 F..á^.&.w±&.w•.v•.v*.F....á.j..v 0001A0
E9037500 003DF246 890000FF FF9A5052 010805FC 568BFA46 8BFA76FF FC76FF0A ..v•.v*.F*.V•...RP......F·=..u.Õ 0001C0
FA5EC400 0000E487 C726FA5E C400FE87 8926F846 8BFA5EC4 00C5E9F2 468B0006 ...F·Õé.á^*.F½&..±.á^*&ú.Õ...á^* 0001E0
```

```
Dump of file SATURN:[PCCOMMON.DUMP.DLL]SA-MERGE.DLL;1 on 18-APR-1990 10:51:16.75
File ID (417,12,0)   End of file block 105 / Allocated 108

Virtual block number 72 (00000048), 512 (0200) bytes

003DF246 890000FF FF9A5016 FE468D0A 76FF0000 9887C626 FA5EC400 4C47C626 &6GL.á^*&6.....v..F±.P......F·=. 000000
890000FF FF9A5052 010005FC 5688FA46 88FE76FF 0081E9F2 46880006 E9037500 .u.Õ...F·Õ...v±.F*.V•...RP...... 000020
46890000 FFFF9AFA 76FFFC76 FF0A76FF 005DE9F2 46880006 E9037500 003DF246 F·=..u.Õ...F·Õ]..v..v•.v*......F 000040
FF1E959A 0108B7FF 26010AB7 FF26FA5E C4003EE9 F2468800 06E90375 00003DF2 ·=..u.Õ...F·Õ>.á^*&.ñ..&.ñ...... 000060
9A010087 FF260102 B7FF26FA 5EC4F276 FF0018E9 03750000 3DF24689 04C483FF ..á..F·=..u.Õ...v·á^*&.ñ..&.ñ... 000080
D88E0008 881E5657 000008C8 0006CAC9 5F5E1F00 00E9F246 8806C483 0000FFFF .....á..F·Õ...^_èò..à...WV.|...Ä 0000A0
0AE90375 9833F87E 81F84689 02620000 9A0A76FF 0C76FF10 76FF01F8 E90E4688 .F.Õ%..v..v..v.¯..b..F%.-½3.u.Õ. 0000C0
F8468800 07E90200 E900008A 00008800 E0A3F846 880012E9 03749832 F87E8100 ..~½2.t.Õ...F½ÈÅ.|..¤..Õ..Õ...F½ 0000E0
0002909A 006A1076 FF001AE9 03750000 E03E8301 EDE90000 8A0001B8 01F6E999 .Õ-.|..¤..ÕÚ..>Å..u.Õ...v.j..... 000100
46890000 02C79A50 16FA468D 1076FF01 C9E999F8 46880000 00E006C7 F8468900 ..F½ú.Å....F½.Õè..v..F*.P.ú....F 000120
F8468900 0000D79A 5016FE46 8D1076FF 01AAE999 F8468800 07E90375 00003DF8 ½=..u.Õ...F½.Õ`..v..F±.P.■....F½ 000140
9A016A00 6A505299 1046881D AE68FE76 FF018BE9 99F84688 0007E903 7500003D =..u.Õ...F½.Õ...v±hÛ..F..RPj.j.. 000160
9A1076FF FA76FFFC 76FF0164 E999F846 880007E9 03750000 3DF84689 0000FFFF .....F½=..u.Õ...F½.Õd..v•.v*.v.. 000180
B7FF2601 02B7FF26 FA5EC4F8 76FF0018 E9037500 003DF846 8906C483 FFFF03C1 è....á..F½=..u.Õ...v½á^*&.ñ..&.ñ 0001A0
880007E9 03750000 3DF84689 0000FFFF 9A006A10 76FF06C4 83000001 609A0100 ...`....á..v.j.......F½=..u.Õ... 0001C0
76FF00FC E90000BA 00008800 0107C726 0A5EC401 00E999F8 46880114 E999F846 F½.Õ...F½.Õ..á^.&ú...|..¤..Õ=..v 0001E0

Dump of file SATURN:[PCCOMMON.DUMP.DLL]SA-MERGE.DLL;1 on 18-APR-1990 10:51:16.75
File ID (417,12,0)   End of file block 105 / Allocated 108

Virtual block number 73 (00000049), 512 (0200) bytes

0100878B 26FA5EC4 07892602 47892600 00B80A5E C40000FF FF9A5016 FA468D10 ..F*.P.....á^.|..&.G.&..á^*&.... 000000
5016FA46 8D1076FF 00C2E900 008A0000 88025789 26078926 065EC401 02978B26 &....á^.&..&.W.|..¤..Õó..v..F*.P 000020
26010887 8826FA5E C400A3E9 99F8468B 0007E903 7500003D F8468900 0001FA9A .*....F½=..u.Õ...F½.ÕÈ.á^*&....& 000040
00B8FA5E C40000FF FF9A0108 B7FF2601 0AB7FF26 FA5EC400 12E90375 010A870B ....u.Õ..á^*&.ñ..&.ñ.......á^*|. 000060
59E90000 8A0000B8 00000053 9A00FEB7 FF26FA5E C4010887 8926010A 87892600 .&....&....á^*&.ñ±..S...|..¤..ÕY 000080
0130033 E9003FE9 0000FFFF 9A0676FF 0876FF0A 76FF0C76 FF0E76FF 1076FF00 ..v..v..v..v..v..v......Õ?.Õ3.=. 0000A0
B03DFE2F E903751D AD3DFF62 E9037510 043DFDF8 E9037510 033DFE3E E9037510 .u.Õ>±=..u.Õ½»=..u.Õb.=Ù.u.Õ/±=¯ 0000C0
0CCAC95F 5E1F0000 E90000BA 0000B8FF B0E9FF10 E903751D B43DFF07 E903751D .u.Õ..=Ç.u.Õ..Õ¯.|..¤..Õ...^_èò. 0000E0
B7FF2608 5EC4016A 006AEC46 89EE4689 0000B8D8 8E017CB8 1E565700 003CC800 .à<..WV.||..Ä|...FŸ.F&j.j.á^¯&.ñ 000100
FF9A0876 FF0A76FF 646A0204 36FF2619 80068EFF FF68FFFF 680100B7 FF260102 ..&.ñ..h..h......&.6..jd.v..v... 000120
00000612 9A006A03 6A016A00 6A016A00 6A0211E9 037401E6 7E83E646 890000FF ....F|.-|.t.Õ..j.j.j.j.j.j...... 000140
00FFFF9A 5016F846 8D010887 FF26010A B7FF2608 5EC4F046 89000006 199A5052 RP......Fþá^.&.ñ..&.ñ...F½.P.... 000160
FF010887 FF26010A B7FF2608 5EC40104 E9E6468B 0006E903 7500003D E6468900 ..F|=..u.Õ...F|Õå.á^.&.ñ..&.ñ... 000180
E9E6468B 0006E903 7500003D E6468900 00FFFF9A 5016FC46 8D266AF8 76FFFA76 v*.v½j&.F•.P......F|=..u.Õ...F|Õ 0001A0
E9037502 400B2600 8826FC76 C402E3C1 F25E8BF2 46FF0003 E90000F2 46C701A4 Ê.úF·..Õ...F·.^·èD.áv=&..&.ə.u.Õ 0001C0
6A30FF26 0270FF26 FC76C402 E3C1F25E 8B01088B FF26010A B7FF2608 5EC400A6 Î.á^.&.ñ..&.ñ...^·èD.áv=&.p.&.0j 0001E0

Dump of file SATURN:[PCCOMMON.DUMP.DLL]SA-MERGE.DLL;1 on 18-APR-1990 10:51:16.75
File ID (417,12,0)   End of file block 105 / Allocated 108

Virtual block number 74 (0000004A), 512 (0200) bytes

16C4468D 014AE9E6 46880006 E9037500 003DE646 890000FF FF9A5016 C4468D02 ..Fá.P......F|=..u.Õ...F|ÕJ..Fá. 000000
C402E3C1 F25E8B00 19E90374 00003000 0005239A 5052004C 050A5688 08468850 P.F..V..L.RP.#...=..t.Õ...^·èD.á 000020
0098050A 56880846 885016C4 468D0033 E9F65689 F4468902 508B2600 8826FC76 v=&..&.P..F¶.V-Õ3..Fá.P.F..V.... 000040
8902508B 26008826 FC76C402 E3C1F25E 880016E9 03740000 300000FF FF9A5052 RP.....=..t.Õ...^·èD.áv=&..&.P.. 000060
0000FFFF 9AFC76FF FE76FF01 08B7FF26 010AB7FF 26085EC4 FF42E9EA 5689E846 FÒ.VÕÕB.á^.&.ñ..&.ñ...v±.v•..... 000080
76FFF676 FF0108B7 FF26010A B7FF2608 5EC40032 E9037409 00E4BF83 26085EC4 á^.&.eÕ..t.Õ2.á^.&.ñ..&.ñ...v-.v 0000A0
0046E900 89E9E646 880006E9 03750000 3DE64689 05CA0272 9AE876FF EA76FFF4 ¶.vÕ.vÒ.r.ò..F|=..u.Õ...F|Õ. ÕF. 0000C0
76FFF676 FF0108B7 FF26010A B7FF2608 5EC40032 E903740A 00E4BF83 26085EC4 á^.&.eÕ..t.Õ2.á^.&.ñ..&.ñ...v-.v 0000E0
0006E900 49E9E646 880006E9 03750000 3DE64689 FFFF0000 9AE876FF EA76FFF4 ¶.vÕ.vÒ......F|=..u.Õ...F|ÕI.Õ.. 000100
880006E9 03750000 3DE64689 0000011A 9A0876FF 0A76FF06 76FF0040 E90001B8 |..Õə..v..v..v.......F|=..u.Õ... 000120
F0468900 00FFFF9A 50520000 FFFF9A00 6A016A01 6A006A01 6A006A00 21E9E646 F|Õ|.j.j.j.j.j.j.......RP......Fþ 000140
02030005 00060093 02030000 000103EB 0002001C 90CBC95F 5E1F0000 E90000B8 |..Õ...^ èù.....Ò............f... 000160
0002007D 000203FF 0103015C 0006046D 02030269 000103EB 00050061 000501DD Ï...a...Š...i...m...\.......)... 000180
02030000 00080192 00020000 0006058A 0002006D 00050374 02030000 0004013F ?.......t...m................... 0001A0
00020087 000500FB 02030000 00080077 000200FA 00060337 0203007C 00050240 ə...|...7...*...w........«....... 0001C0
0203009A 00050301 020301BB 0006055C 02030107 0006043D 02030000 000D03C9 è.......=........\............... 0001E0
```

Dump of file SATURN:[PCCOMMON.DUMP.DLL]SA-MERGE.DLL;1 on 18-APR-1990 10:51:16.75
File ID (417,12,0)   End of file block 105 / Allocated 108

Virtual block number 75 (0000004B), 512 (0200) bytes

```
0203029B 000804ED 020300AD 000505F0 02030032 0004001D 020302FF 000A0283 ............2...Þ...Ù...Ù....... 000000
0103005B 0002041C 010300BE 00050219 02030135 000604C7 02030040 00040354 T...ã...ú...5......./.......[... 000020
E90A468B D88EFFFF B81E5657 000000C8 0000004F 00040040 0203005C 00020423 #...\...ã...O...à...WV.|...Ä.F.Õ 000040
53E9015C E99B26B8 0006E903 74000030 04C48300 46018F9A 0676FF08 76FF014F O..v..v....F..é.=..t.Õ..|&.Õ\.ÕS 000060
03740000 3D0CC483 006E021F 9A0676FF 0876FF0C 76FF0E76 FF1076FF 1276FF01 ..v..v..v..v..v..v....n..é.=..t. 000080
00990298 9A0676FF 0876FF0C 76FF0E76 FF1076FF 1276FF01 31E99825 B80006E9 Õ..|%.Õ1..v..v..v..v..v..v...... 0000A0
0C76FF0E 76FF1076 FF1276FF 0100E901 09E99828 B80006E9 03740000 3D0CC483 .é.=..t.Õ..|(.Õ..Õ...v..v..v..v. 0000C0
FF1276FF 000EE998 25B80006 E9037400 003D0CC4 8300C102 1F9A0676 FF0876FF .v..v....è..é.=..t.Õ..|%.ÕB..v.. 0000E0
29B80006 E9037400 003D0CC4 8300EC04 479A0676 FF0876FF 0C76FF0E 76FF1076 v..v..v..v..v..G.$..é.=..t.Õ..|) 000100
C4830117 021F9A06 76FF0876 FF0C76FF 0E76FF10 76FF1276 FF00ADE9 00B6E998 .ÕÑ.ÕÜ..v..v..v..v..v..v.......é 000120
76FF0C76 FF0E76FF 1076FF12 76FF0082 E90088E9 9825B800 06E90374 00003D0C .=..t.Õ..|%.Õ..Õ...v..v..v..v..v 000140
1076FF12 76FF0060 E99825B8 0006E903 74000030 0CC48301 3F021F9A 0676FF08 ..v....?..é.=..t.Õ..|%.Õ'..v..v. 000160
E99827B8 0006E903 74000030 0CC483FF FF03159A 0676FF08 76FF0C76 FF0E76FF .v..v..v..v.......é.=..t.Õ..|'.Õ 000180
2E93C003 FFECE903 76000730 00012000 23E9002C E90001B8 002CE900 2FE90038 8.Õ/.Õ,.|..Õ,.Õ#.-..=..v.Õ$..é.. 0001A0
C8CBC95F 5E1F0000 E9000088 01550155 015500D7 01020084 00310012 0174A7FF .It...1.....■.U.U.U.|..Õ...^_èùà 0001C0
003DF646 890000FF FF9A5016 FC468D06 76FF0876 FFD88E00 08B81E56 5700000A ...WV.|...Ä.v..v..F=.P......F-=. 0001E0
```

Dump of file SATURN:[PCCOMMON.DUMP.DLL]SA-MERGE.DLL;1 on 18-APR-1990 10:51:16.75
File ID (417,12,0)   End of file block 105 / Allocated 108

Virtual block number 76 (0000004C), 512 (0200) bytes

```
00FA5683 01F84683 0008E9F8 4689FA46 89000088 005EE9F6 46880006 E9037500 .u.Õ...F-Õ^.|...F'.F%Õ...F%..V'. 000000
76FF0676 FF0876FF FFE0E900 03E90375 02400B26 008B26FC 76C402E3 C1F85E8B .^%èÐ.év=&..&.ã.u.Õ..ÕÄ..v..v..v 000020
09E90001 B80009E9 037400FA 7E830012 E9037402 F87E8300 00FFFF9A FC76FFFE ±.v=......-½.t.Õ...-'.t.Õ..|..Õ. 000040
76FF0876 FFD88E01 97B81E56 57000006 C8CBC95F 5E1F0000 E9000088 0006E900 .Õ..|..Õ...^_èùà...WV.|...Ä.v..v 000060
E9FA468B 0006E903 7500003D FA468900 0002649A 5016FE46 8D0A76FF 0C76FF06 ..v..v..F±.P.d....F'=..u.Õ...F'Õ 000080
03750000 3DFA4689 0000FFFF 9A5016FC 468D0E76 FF1076FF 0676FF08 76FF0041 A..v..v..v..v..F=.P......F'=..u. 0000A0
0000B800 06E90009 E90001B8 0009E903 74FC4639 FE468800 1AE9FA46 880006E9 Õ...F'Õ...F±9F=t.Õ..|..Õ..Õ..|.. 0000C0
0A76FF0C 76FF0676 FF0876FF D88E0227 B81E5657 000006C8 CBC95F5E 1F0000E9 Õ...^_èùà...WV.|'..Ä.v..v..v..v. 0000E0
0876FF00 43E9FA46 880006E9 03750000 3DFA4689 000002E1 9A5016FE 468D086A j..F±.P.Ä....F'=..u.Õ...F'ÕC..v. 000100
0006E903 7500003D FA468900 00FFFF9A 5016FC46 8D086A0E 76FF1076 FF0676FF .v..v..v.j..F=.P......F'=..u.Õ.. 000120
0000E900 00B80006 E90009E9 0001B800 09E90374 FE4639FC 468B001A E9FA468B .F'Õ...F=9F±t.Õ..|..Õ..Õ..|..Õ.. 000140
8D036A0A 76FF0C76 FF0676FF 0876FFD8 8E02A0B8 1E565700 001AC8CB C95F5E1F .^_èùà...WV.|...Ä.v..v..v..v.j.. 000160
0676FF08 76FF00F8 E9E6468B 0006E903 75000030 E6468900 0003879A 5016EC46 F$.P......F|=..u.Õ...F|Õ%..v..v. 000180
E6468800 06E90375 000030E6 46890000 03B09A50 16FC468D 046A0A76 FF0C76FF .v..v.j..F=.P.¯....F|=..u.Õ...F| 0001A0
0030E646 890000FF FF9A5016 E8468003 6A0E76FF 1076FF06 76FF0876 FF00CFE9 ÕÜ..v..v..v..v.j..FÒ.P......F|=. 0001C0
9A5016F4 468D046A 0E76FF10 76FF0676 FF0876FF 00A6E9E6 46880006 E9037500 .u.Õ...F|ÕI..v..v..v..v.j...;.P. 0001E0
```

Dump of file SATURN:[PCCOMMON.DUMP.DLL]SA-MERGE.DLL;1 on 18-APR-1990 10:51:16.75
File ID (417,12,0)   End of file block 105 / Allocated 108

Virtual block number 77 (0000004D), 512 (0200) bytes

```
8902578B 26078B26 FC5EC400 7DE9E646 880006E9 03750000 3DE64689 0000FFFF .....F|=..u.Õ...F|Õ).é^=&..&.W.. 000000
76FFFE76 FF0676FF 0876FFF2 5689F046 8902578B 26078B26 F45EC4FA 5689F846 F%.V'é^¶&..&.W..FÞ.V·.v..v..v±.v 000020
EC4639EA 5688E846 88000001 F59AF476 FFF676FF 0676FF08 76FF0000 04039AFC =......v..v..v~.v¶.%....FÒ.Võ9F$ 000040
0374FA56 390011E9 0374F846 39F2568B F0468800 1FE90374 EE563900 27E90374 t.Õ'.9VÝt.Õ...FÞ.V·9F½t.Õ..9V't. 000060
1DB81E56 57000006 C8CBC95F 5E1F0000 E9000088 0006E900 09E90001 B80009E9 Õ..|..Õ..Õ..|..Õ...^_èùà...WV.|. 000080
003DFA46 89000004 909A5016 FE468006 6A0A76FF 0C76FF06 76FF0876 FFD88E03 ..Ä.v..v..v..v.j..F±.P......F'=. 0000A0
9A5016FC 468D066A 0E76FF10 76FF0676 FF0876FF 0065E9FA 46880006 E9037500 .u.Õ...F'Õe..v..v..v..v.j..F=.P. 0000C0
7E830012 E9037500 FE7E8300 3CE9FA46 880006E9 03750000 3DFA4689 0000028B |....F'=..u.Õ...F'Õ<..-±.u.Õ...- 0000E0
E9037400 FC7E8300 12E90374 00FE7E83 0021E900 24E90001 B80009E9 037500FC =.u.Õ..|..Õ$.Õ|..-±.t.Õ...-=.t.Õ 000100
010C0006 01A70203 0008C8C9 5F5E1F00 00E90000 B80006E9 0009E900 01B80009 ..|..Õ..Õ..|..Õ...^_èù....I...É. 000120
00000000 044F0002 00000009 00180002 01680006 03350203 015C0006 035E0203 ..^...\...5...h...........O..... 000140
00000000 00000000 01350006 04670203 01970006 02300203 01880006 03F20203 ..·.......=.......g...5......... 000160
00000000 00000000 00000C00 02000200 01CB0001 B81F0204 3E89D88E FFFFB81E .|...Ä.>...|..Ù................. 000180
8ED88CFE 880A76C5 1EDE88D7 88EC8855 00000000 00000000 00000000 00000000 ................U.$.■.8.év..±.Ä. 0001A0
8BF388A4 F3C913A5 F3E90149 A4027401 A8C78806 7EC4D1F7 AEF2FFFF B9C033C0 å3ö¿..·Ù%1é~..ú´.t.É|1Õµ€.èµ€.µ. 0001C0
E2AA0374 C00AAC0C E30E4E88 DF880A76 C5067EC4 1E5657EC 8855C85D C28C1FFA '..õ]ÙU.$WV.é-.év..Ô.N.D.¯.åt.¯å 0001E0
```

```
Dump of file SATURN:[PCCOMMON.DUMP.DLL]SA-MERGE.DLL;1 on 18-APR-1990 10:51:16.75
File ID (417,12,0)   End of file block 105 / Allocated 108

Virtual block number 78 (0000004E), 512 (0200) bytes

 8DFA568C F84689EC 468D5657 000016C8 CB50E58B 5F5E1FC2 8CC388AA F3C032F8 ½2âµ^.û.ô.^ .Í]ùà...WV.F§.F½.V". 000000
 89260857 89260647 89260856 8B06468B 420A47C6 26F85EC4 FE568CFC 46890E46 F..F=.V±á^½Ï6G.B.F..V.&.G.&.W.&. 000020
 8B0CC483 00E50266 9A53060A 76FF0C76 FFFC76FF 167FFF04 47C72602 57892607 .&.W.&úG.....v=.v..v..S.f.|..á.. 000040
 53FA76FF 900FEB05 88260247 8E2607FF 263F8826 C02A1278 044FFF26 F85EC4F0 Þá^½&.O.x.*â&.?&..&.G.&..Š...v"S 000060
 89E42A0B 478A2608 5EC45657 000008C8 CBC95F5E C68B06C4 83FFFF00 F09A006A j..Þ....á..6^_èùà...WVá^.&.G.*ð. 000080
 830A47F6 26F84689 112805E0 D1C103E0 D1C88BF9 F7000CB9 9905342D C38BFA46 F".û-4..¿..¼"¯àÌÁ.èÌÁ.(..F½&-G.. 0000A0
 010A47F6 26085EC4 90012BE9 FFFFB820 0A4F8026 085EC40F 74400A47 F6260774 t.&-G.ət.á^.&.O. |..Õ+..á^ ¼-G.. 0000C0
 04478926 C02BEF0A 67802602 0A4F8026 90E2E800 000447C7 26200A4F 80260E74 t.&.O. &úG...Šã.&.O..&.g.ÿ+ ¼.G. 0000E0
 75011128 87F606D8 6BF9F700 0CB99905 342DC38B 4C750C0A 47F626FC 7689F08B .Þ.v=&-G..uL.û-4..¿..¼"kÄ.-.\...u 000100
 FA76FF0F 75FFFF0A 7E811675 054C087E 810E7401 990A7E81 07750540 087E8137 7.~.ə.u..~...t..~.L.u..~...u..v" 000120
 080A47F6 26085EC4 04C4830C 51E80876 FF0A76FF 0C75C00B 02C48302 0C107E9A .~....á..âu..v..v.ÒQ..6.á^.&-G.. 000140
 772B2637 8B26085E 88677401 112887F6 06086BF9 F7000CB9 9905342D C38B1575 u..û-4..¿..¼"kÄ.-.(..tg.^.&.7&+w 000160
 167EF60B 04478926 48024588 F87E8802 57892607 89264008 578B2606 478B2606 .&.G.&.W.ə&..&.W..-½.E.H&.G..--. 000180
 0F742017 3987F6FA 5E8819EB FC468908 C483022A 0ECE9AFA 76FF0677 FF265256 VR&.w..v".ö.*..á..F=Š..^"-.9. t. 0001A0
 01BE17EB 07882606 468A065F C426085E C408C483 024D0E90 9A53006A 006A026A j.j.j.S...M..á.á^.&á ..F.&..Š./. 0001C0
 06468AFE CCE90374 FC7639FC 468908C4 8300BA0E CE9AFA76 FF501606 46805600 .V.F..P.v".ö.¤..á..F=9v=t.Õä±.F. 0001E0

Dump of file SATURN:[PCCOMMON.DUMP.DLL]SA-MERGE.DLL;1 on 18-APR-1990 10:51:16.75
File ID (417,12,0)   End of file block 105 / Allocated 108

Virtual block number 79 (0000004F), 512 (0200) bytes

 56880E46 881A921E 8C1A90A3 1A968801 A310A29A 000A88EC 8855C8C9 5F5EE42A *ð^_èùU.š¡...Å.È.¡..È.......F..V 000000
 001A8A06 C700001A 8C06C71A 6816891A 66A30856 8B06468B 1A821689 1A80A310 .È.......F..V.Èf...h.ú.....ú.... 000020
 6EA31A88 A31A6CA3 1A70A3C0 2800011A 8E06C703 0BE90374 25F67E80 038DE900 .Ö...--%t.Õ..ú.....+âÈp.Èl.È..Èn 000040
 49753001 7F80260A 5EC40020 1BF606C7 1A7EA31A 64A31A6A A31A84A3 1A86A31A .È..È..Èj.Èd.È-.ú.-. .á^.&...0uI 000060
 EB00001A 8406C71A 7006FF00 75283F80 260A5E88 903EE800 301BF606 C70A46FF .F.ú.-.0.Š>..^.&.?+u...p.ú.....Š 000080
 260A5EC4 00EB1A64 06FF9014 EB1A8406 FF1A7500 1A703E83 0E75203F 80269028 (.&.? u..>p..u.....Š....d.Š.á^.& 0000A0
 FF0D75C0 0B02C483 0978E80E 5098078A 260A5E88 0A46FF1A 7E06FFC7 75203F80 .?-uú..~..F..^.&...P.Òx..á..âuT. 0000C0
 7E06FF0C 7D001A94 3E830C56 890A4689 08C48308 C7E80E1A 94681E0A 76FF0C76 v..v..h...Òú..á..F..V..>...)...- 0000E0
 0A5EC400 201BF606 C7067530 1BF63E83 0D74001A 7E3E831A 94A308F7 1A94A11A .À..¾ÄÈ...>~..t..>-.0u.ú.-. .á^. 000100
 890A4689 08C48308 7BE80E1A 8E681E0A 76FF060A 46FF1A86 06FF2D75 2E3F8026 &.?.u-.....F...v..h...Ò(..á..F.. 000120
 30307400 463D9807 8A260A5E C41A860E FF00011A 8E06C70A 7D001A8E 3E830C56 V..>...).ú.........á^.&...=F.t== 000140
 80260A5E C4097500 1A6E3E83 00021A6E 06C70675 006C3D28 7400683D 4074004E N.tə=h.t+=l.u.ú.n....>n..u.á^.&. 000160
 1A6E06C7 D8E80001 1A6E06C7 90024EE9 1C75003F 80260A5E C40A46FF 03754C3F ?Lu..F.á^.&.?.u.ÕN..ú.n...ŠÄú.n. 000180
 00583D05 7400473D 0A740045 3DF84689 98078A26 C8E80008 1A6E06C7 D0EB0010 ..ŠÄú.n...Šà&....F½=E.t.=G.t.=X. 0001A0
 7E013FE9 03750063 300191E9 037E7874 00693DF8 468B20F8 46831A6C 06FF0875 u...l..F½ .F½=i.tx-.Õ..=c.u.Õ?.- 0001C0
 8AA11FC4 261A801E C4157502 1A6E3E83 900159E9 0140E903 75002530 0152E903 .ÕR.=%.u.Õə.ÕY...>n..u.á...&á.À. 0001E0

Dump of file SATURN:[PCCOMMON.DUMP.DLL]SA-MERGE.DLL;1 on 18-APR-1990 10:51:16.75
File ID (417,12,0)   End of file block 105 / Allocated 108

Virtual block number 80 (00000050), 512 (0200) bytes

 3E83041A 80068307 89261A8A A11FC426 1A801EC4 00EB0000 0247C726 0789261A .&..&úG...Š.á...&á.À..&........> 000000
 01AFE903 75200A47 F6261A66 1EC4018D E9037400 1A8A3E83 0170E903 75001A8C ...u.Õp..>...t.Õ§.á.f.&-G. u.Õ€. 000020
 F2EB086A 90C3EB02 C483019E E80E0A6A 00001A64 06C71A88 06FF01AC E9FFFF88 ¡..Õ¨.....ú.d...j..Ò...á.Šú.j.Š· 000040
 1A6E3E83 0081E903 75081A6E 3E830004 1A8E06C7 1A8606FF 1A6C06FF 1A6A06FF ..j...l.....ú......>n..u.Õ...>n. 000060
 06C70A74 001A7E3E 83FA4689 1A94A128 741A9406 39FA4689 1A6EA3C0 2B7A7401 .tz+âÈn..F"9...t(À...F".>~..t.ú. 000080
 106A021A 8006831A 94A3C02B 027DC00B 1A94A105 1A942E83 909013EB 00001A94 ....Š........À...â).+âÈ.......j. 0000A0
 FA468815 74001A7E 3E832274 00FA7E83 02C48304 8DE80E3A 6A02C483 0130E80E .Ò0..á.j:.Ò...á..~".t".>~..t..F" 0000C0
 0E106A04 1A802E83 00001A94 06C79007 EB1A94A3 C02B027D C00B1A94 A300052D -..È...â).+âÈ..Š..ú..........j.. 0000E0
 016A90FF 39E9026E E80E006A 90FF3FE9 106AFF10 E9021A80 068302C4 8300F1EB Òþ..á......Õ..j.Õ?..j..Òn.Õ9..j. 000100
 6530FF0C E9037500 643090FF 21E90428 E80E256A FF2AE903 49E80EF8 76FFF4EB Š¶.v½.ÒI.Õ*.j%.Ò(.ÕI..=d.u.Õ..=e 000120
 89400C56 880A468B 0A4EFF0C 56880A46 8B097400 1A6E3E83 DA7E0067 30057C00 .|.=g.~Õ.>n..t..F..V..N..F..V.ə. 000140
 FEE0E903 7500703D FEE4E903 75006F3D FE80E903 75006E3D 903AE8FE 5689FC46 F=.V±Š:.=n.u.Õ.±=o.u.ÕÕ±=p.u.ÕÄ± 000160
 46FF9034 EB0A46FF 90B1EBFF 79E90375 00783DFE 89E90375 0075308F 7400733D =s.t.=u.u.Õ¿±=x.u.Õy.ŠŸ..F.Š4..F 000180
 E80E0A76 FF0C76FF 500A462B C38BEC75 253C0474 C00AF646 88078A26 FC5EC4FC =á^=&...F~.ât.<%uš.Û+F.P.v..v..Ò 0001A0
 63E90374 C00AF646 88078A26 0A5EC40C 56890A46 89FE568B FC468B06 C483044C L..á..F=.V±.F..V.á^.&...F~.ât.Õc 0001C0
 74001A86 3E835657 000012C8 CBC91A8A A1FE51E9 0374200A 47F6261A 661EC4FC =á.f.&-G. t.ÕQ±À..èùà...WV.>...t 0001E0
```

```
Dump of file SATURN:[PCCOMMON.DUMP.DLL]SA-MERGE.DLL;1 on 18-APR-1990 10:51:16.75
File ID (417,12,0)   End of file block 105 / Allocated 108

Virtual block number 81 (00000051), 512 (0200) bytes

 C4197510 1A6E3E83 0774021A 6E3E831A 8806FF04 740A067E 8300201B F606C706 .ú.-. ..-..t......>n..t..>n..u.é 000000
 C4117400 1A883E83 902CEB04 1A800683 FE5689FC 46890257 88260788 261A801E ...&..&.W..F=.V±.....Š,..>...t.é 000020
 0683FE56 89FC4689 99078B26 1A801EC4 0EEB0000 FE46C7FC 46890788 261A801E ...&...F=úF±..Š.é...&....F=.V±.. 000040
 1A90A11B F4A3C02B 9003EB06 46880674 FE460BFC 46880E74 001A643E 83021A80 ....>d..t..F=.F±t..F.Š..+àÈ¶.À.. 000060
 F25EC41D 750A067E 83287D00 FE7E8331 75001A88 3E83F456 89F24689 1A92168B .....F·.V¶.>...ul.-±.)+.-..u.é^· 000080
 EB0001F6 46C7FE56 89FC4689 DAF70002 8308F7FE 5688FC46 882D07C6 26F246FF .F·&6.-.F=.V±¼Ä.Ø.¼Ö.F=.V±úF-..Š 0000A0
 07531074 9AFC76FF FE76FF50 1E0676FF FA5E8CF8 46891A72 880000F6 46C79006 ..úF-..¡r..F½.^ª.v..P.v±.v=.t.S. 0000C0
 4E89C82B 1A8E0E88 04C48302 6F105C9A F876FFFA 76FF4574 001A863E 830AC483 .é..>...tE.vª.v½.\.o..é.....+à.N 0000E0
 88473005 C62605EB F27EC4F0 4E880000 18F406C7 0675081B F43E8300 7EC908F0 Þ.è-..>¶..u.ú.¶....NÞé~·Š.&6.0G. 000100
 88078A26 F85EC4F2 76C5EE5E 8C1A6C0E 88F04E89 F4468CF2 7E89F47F C00B49C1 ël.à.¶.-·.F¶.NÞ..l..^Ÿév·á^½£... 000120
 83EE5E8E F45E8CF2 7689E375 003F8026 F846FF46 202C8003 7C613C07 74C90804 ..èt.<a|.., F.F½£.?.uD.v·.^¶.^Ÿ. 000140
 FFE80E50 C02802EB 0001B805 7500F67E 8308741A 84060B1A 70A11475 001A883E >...u.Àp.....t..--.u.|..Š.+àP.Ò. 000160
 46891A82 16881A80 A100018E 18740006 7E835657 000010C8 CBC95F5E 02C48302 ..é.^_èùà...WV.-..t./..À.......F 000180
 46890257 88260788 261A801E C4137408 1A6E3E83 008FE902 1A800683 FA5689F8 ½.Vª.....Ò...>n..t.é...&..&.W..F 0001A0
 081A6E3E 83041A80 0683FA5E 8CF84689 FC468907 88261A80 1EC410EB FA5689F8 ½.VªŠ.é...&...F=.F½.^ª......>n.. 0001C0
 88FA5E8C F8468900 E9880975 00FC7E83 900AE800 E2881575 FA460BF8 46880E74 t..F½.Fªu.¡ã.Š...-=.u.¡Õ..F½.^ª. 0001E0
```

```
Dump of file SATURN:[PCCOMMON.DUMP.DLL]SA-MERGE.DLL;1 on 18-APR-1990 10:51:16.75
File ID (417,12,0)   End of file block 105 / Allocated 108

Virtual block number 82 (00000052), 512 (0200) bytes

 F246FFF2 5EC4900E EB1A8E0E 8B1C741A 863639F6 2BF45689 F24689FA 568BF846 F½.Vª.F·.V¶+-96..t.....Š..é^·.F· 000000
 2B1A943E 88F37500 3F8026F2 46FFF25E C44690ED EB107ECE 3B461574 003F8026 &.7.t.F;ö-.ŠÚ.Fé^·.F·&.?.u¤.>..+ 000020
 3E8306C4 830183E8 0EF876FF FA76FF56 02C48301 59E80E57 0875001A 7E3E83FE ±.>-..u.W.ÒY..é.V.vª.v½.Òº..é..> 000040
 FC46891A 8216881A 80A10000 06C890CB C95F5E02 C483013C E80E5708 74001A7E -..t.W.Ò<..é.^_èù.à...À.......F= 000060
 0675001A 863E83FA 4688C02A 9003EB01 B0057547 067E8306 7467067E 83FE5689 .V±.-.gt..-.Gu¯¯.Š..*à.Fª.>...u. 000080
 8E36FF1A 6C36FF00 011A8E06 C7067500 1A8E3E83 0D7400FA 7E800006 1A8E06C7 ú......-ª.t..>...u.ú......6l..6. 0000A0
 7E800EC4 8305141E FF261982 068EFC76 FFFE76FF 1A9036FF 1A9236FF 0676FF1A ..v..6...6...v±.v=....&.....é..- 0000C0
 8304C483 05181EFF 26198206 8E1A9036 FF1A9236 FF147500 1A643E83 187400FA ª.t..>d..u..6...6......&.....é.. 0000E0
 C4830520 1EFF2619 82068E1A 9036FF1A 9236FF14 75001A8E 3E831874 001A643E >d..t..>...u..6...6......&.. ..é 000100
 26198206 8EFC76FF FE76FF1B 741A8406 081A70A1 00001BF4 06C7081A 80068304 ......ú.¶...Àp.....t..v±.v=....& 000120
 83560000 00C890CB C90129E8 0E50C02B 02E80001 880574C0 0B04C483 05241EFF ..$..é..àt.|..Š.+éP.Ò).èù.à...V. 000140
 04882602 478E2607 FF263788 2606468A 1478044F FF261A66 1EC43C75 001A8C3E >...u<é.f.&.0.x..F.&.7&..&.G.&.. 000160
 06FF9005 EB1A8C06 FF077540 06C4830A 2800F09A 0676FF53 1A6836FF 10E8E42A *ðŠ..6h.S.v..Þ.+..é.ªu.....Š.... 000180
 1A6836FF 18E8507E F6080676 88577500 1A8C3E83 56570000 02C890CB C95E1A8A ..^èù.à...WV.>...uW.v..--PŠ..6h. 0001A0
 1EC41E7E C0084EC6 881A8C06 FF047540 06C4830A 9300F09A 18F636FF 1A6636FF .6f..6-..Þ....é.ªu......6N.â-.é. 0001C0
 1A8C3E83 D4E8E42A 05882602 478E2607 FF263F88 261BF6A0 D478044F FF261A66 f.&.0.xå.-.&.7&..&.G.&..*ðŠå.>.. 0001E0
```

```
Dump of file SATURN:[PCCOMMON.DUMP.DLL]SA-MERGE.DLL;1 on 18-APR-1990 10:51:16.75
File ID (417,12,0)   End of file block 105 / Allocated 108

Virtual block number 83 (00000053), 512 (0200) bytes

 22EB5E75 001A8C3E 830A7688 56570000 02C8CBC9 5F5E1A8A 06010646 88077500 .u..F.....^_èùà...WV.v..>...u^Š" 000000
 FF1A8C06 FF047540 06C4830B 0500F09A 5098078A 26065EC4 1A6636FF 1A6836FF .6h..6f.á^.Ï...P.Þ....é.ªu...... 000020
 3F88261A 661EC407 8A26065E C4CD7804 4FFF261A 661EC425 74C0084E C6880646 F..6N.ãtX4.f.&.0.xëé^.&...é.f.&.? 000040
 CBC95F5E 1A8A0601 0A468807 75001A8C 3E83CAE8 E42A0588 2602478E 2607FF26 &..&.G.&..*ðŠò.>...u..F.....^_èù 000060
 FF521A94 368BFA46 89FC4689 C02BF656 89F44689 1A92168B 1A90A156 00000CC8 à...VÀ.......F¶.V-+à.F=.Fª.6.¯R. 000080
 3E8308EB 02EE8305 75101BF4 3E830676 2BF02BF8 468904C4 83073E10 5C9AF476 v¶.\.>..é..F½+Þ+v..>¶..u..Ÿ.Š..> 0000A0
 F446FF12 75301BF6 3E831975 2D3F8026 F45EC422 75001A7E 3E834E01 75081BF4 ¶..u.N.>-..u"é^¶&.7-u..>-.0u..F¶ 0000C0
 74001A7E 3E83077E F6080874 301BF63E 83F84EFF 02C483FE 71E80E50 98078A26 &...P.Òq±.é..N½.>-.0t..--..>-..t 0000E0
 1A7E3E83 0070E80E FC46FF07 74001BF4 3E830066 E80EFA46 FF077400 067E831B ..-..t..Fª.Òf..>¶..t..F=.Òp..>-. 000100
 001BF43E 830039E8 0E047500 FA7E830A 7400067E 8302C483 FE7EE80E 56297500 .u)V.Ò-±.é..-..t..-ª.u..Ò9..>¶.. 000120
 1A7E3E83 06C483FE 85E80EF4 76FFF676 FFF876FF 0040E80E 047500FC 7E830A74 t..-=.u..Òa..v½.v-.v¶.Òç±.é..>-. 000140
 03E8002B B8057400 1A703E83 CBC95E02 C483FE38 E80E5600 201BF606 C70E7400 .t.ú.-. .V.Ò8±.é.^èù.>p..t.|+.Š. 000160
 1A6C3E83 1775101B F43E8302 C483FDC8 E80E306A CB02C483 FDD2E80E 50002088 | .P.Ò0».é.ùj0.Òà».é..>¶..u..>l. 000180
 C40001FE 46C75657 000006C8 CB02C483 FDAAE80E 50007888 03E80058 88057400 .t.|X.Š.|x.P.Ò¯».é.ùà...WVúF±..é 0001A0
 3F80260A 5EC49060 EB0A46FF 021A8006 83378826 1A801EC4 12752A3F 80260A5E ^.&.?*u.é...&.7......F.Š'.é^.&.? 0001C0
 3639387F 393C3F7C 303CFA46 88078A26 0A5E8BF6 2B0A46FF FFFFFE46 C708752D -u.úF±...F.+-.^.&...Fª<0|?<9.;96 0001E0
```

```
Dump of file SATURN:[PCCOMMON.DUMP.DLL]SA-MERGE.DLL;1 on 18-APR-1990 10:51:16.75
File ID (417,12,0)   End of file block 105 / Allocated 108

Virtual block number 84 (00000054), 512 (0200) bytes

 E1C1CE8B 98058A26 1B7F3930 802606EB F8880030 1BF606C7 0675303C 0A751A86 ..u.<0u.ú.-.0..«Š.&.=9..&....öèÃ 000000
 F08BEEF7 FE4688OC 468C0A7E 89DF7D30 3D802647 F18B30E9 83C803E1 D1CE0302 ..öìÃ.à.Õ0.þG&.=0)Ô.-..F..F±%Ÿ.Þ 000020
 4E8AFE5E 8CFC4689 00F08857 000004C8 CBC95F5E 0C568B0A 46883789 26065EC4 á^.&.7.F..V.^ èùà...W¦Þ..F=.^±.N 000040
 7E899009 E8FE468C FC7E8900 0188F475 00382611 74003D80 264701EB FC7EC406 .á-•Š.G&.=.t.Ī8.u¶¦...-=.F±Š...~ 000060
 F8681E17 32A3E086 580000FF FF9A5016 C48850EC 885590C8 C95FC02B FE468CFC •.F±+à_èù.U.šP.á.P.....X.ÀÈ2..h% 000080
 007C9A50 CB5DE588 00018809 EF11869A 0386E800 21E80000 FFFF9A00 F6681E00 ..h-......Ò!.ÒÑ..Ñ.ÿ.¦...!]ùP.|. 0000A0
 75003D80 267FFFB9 00F8068E FF330000 8B1E00FE 16FF00FF 68002000 D09A0D13 ...Å. .h....±..£..3...%.¿..&.=.u 0000C0
 071E061C E8E774AE F2C03308 74CA88A6 F3CB88D1 8805028E 3174003D 80264701 .G&.=.t1ƒ...Ì.ùµÌ.õt.3à·ÚtÓŠ.... 0000E0
 88EC8855 00C31FED E8AAC20A 0572412C AC9204E0 C00E7241 2CAC1739 BF1FF788 .¼.¢9.¯,Ar.áÅ..¯,Ar..õ¯ŠÚ.û.U.š¦ 000100
 CB5DE588 00860000 9A5000FF 8805101E FF047400 05123E83 002500D0 9A5000FC •.P.Å.X..>...t.....¦..P.Å....[]ù 000120
 FFB9C033 970C7496 401074C2 38AD198C BE06568B C08ED88E 018B8857 56EC8855 U.šVW¦...Ã.à.V./..Ù;öt.ə.t..3á¿. 000140
 1F74C008 009A00A0 9A0676FF 57EC8855 0002CA5D E5885E5F 96E8E8F7 8BAEF2FF .·Û.%ŠŠ._^.[]ò..U.šW.v.......åt. 000160
 5F5B0000 FFFF9A50 1651521E 53000288 C4885049 D1F7AEF2 FFFFB9C0 33FA8B92 ..•3ä¿..¯Ù%I!P.á£..S.RQ.P.....[  000180
 C103E001 C888F9F7 000CB999 05342004 4688194A 06FF0000 04C80002 CA5DE588 .[]ò..·à.....J..F.-4..¿..%•.àïÅ.ē 0001A0
 57892606 47892604 5EC402C4 8300DA13 719A0200 68FE5E8C FC468911 2805E0D1 ïÁ.(..F=.^±h...q.Ö..á.á^.&.G.&.W 0001C0
 4688040A 4F802604 5EC49021 E8020002 47C726FC 5EC4080A 4F802611 74000808 ..Åt.&.O..á^•&ÚG...Š!.á^.&.O...F 0001E0
```

```
Dump of file SATURN:[PCCOMMON.DUMP.DLL]SA-MERGE.DLL;1 on 18-APR-1990 10:51:16.75
File ID (417,12,0)   End of file block 105 / Allocated 108

Virtual block number 85 (00000055), 512 (0200) bytes

 57882606 47882604 5EC40001 0247C726 FC5EC408 57892606 47892640 FE568BFC •.V±ə&.G.&.W.á^•&ÚG...á^.&.G.&.W 000000
 3300098A 08721737 1E38065E 8BEC8855 C3C90000 0447C726 02578926 07892608 .&..&.W.&ÚG...èÚU.š.^.;.7.r.¤.:3 000020
 855A5900 00FFFF9A 51160C76 FF0876FF 0A76FF53 CC8804EC 830478E9 046CE9C0 áÕl.Õx..š..äS.v..v..v..Q.....YZ. 000040
 00098A08 7217371E 38065E88 0CEC83EC 885500CB 5DE58BFD 1739A780 91E175C0 âuÃ..I9.».[]ù.U.š.š..^.;.7.r.¤.. 000060
 87F60000 0E899A50 16F4468D 51414151 51C93353 12742017 3987F604 28E9C033 3áÕ+.-.9. t.S3èQQAAQ.F¶.P.¿...-. 000080
 F86689F2 88FA8856 57FCFC46 89FE4689 C0330856 C50A468E FA5E8C66 74801739 9..tf.^•.F.éV.3á.F±.F••WV.•.·.f% 0000A0
 3CAC0C4E 880716FA 88D488E2 2B0080BA DC8802EC 833875AE F20A8049 E30C4E88 .N.DI¯.·Ûu;.š..É¤..+ã.å.•...N.¯< 0000C0
 E8FC46FF 0A80AA00 1FE80375 FB3800B0 009AE900 28E8F4E2 AA1A74F8 3800740A .t.;«t.¯ã¶Ó+.Õ..¯.;«u.Ò..¯¯..F=Š 0000E0
 CF881F06 1E515350 0E3110A2 9AFFFCB8 7AE80093 E9FA5E8E 5F5EE1EB 0014E8E2 ãÒ..ŠÃ^_.^•Õ..Šz¦•..Å.1.PSQ....ü 000100
 08FE5E01 F45E8811 75C00800 000DFA9A 5016F446 8051521E 53065E88 1FE3CA2B +ðD..^.Š.RQ.F¶.P.•....âu..^¶.^±. 000120
 BA087500 098A0001 3D007400 603D1874 C00808C4 831FC3FA 88585859 1F07740B Üt..Y[X.•û..á..ât.=m.t.=..¤..u.¤ 000140
 F803751A 3F80085E 880A5E8E 0E744017 3987F6FE 5E8E26EB F90020BA 03E8001C ..Š.¤ .•Š&.^±-.9.ət..^..^..?.u.% 000160
 0FE9CB5D E5880472 FA5E8E5F 5EFB6688 FC4628FE 468806EB F9C03300 1CBA0EEB Š.¤..3á•Š..F±+F=.f%^_.^•r..[]ùÕ. 000180
 071E0000 0F919A50 16F4468D 51521E53 0856C51E EEEBC188 0475C908 0C4E8803 ..N..èu..êŠŸ.éV.S.RQ.F¶.P....... 0001A0
 08F4468B C2E80020 BAC7E800 1C8ACC75 00098A00 013D0074 00603017 74C0081F ..ât.=m.t.=..¤..uëα..Šúα .Šô.F¶. 0001C0
 88EC8855 00A3E8C0 33001CBA A6E80275 1A3F8026 DA880A74 40173987 F68775C0 âuñ-.9.ət..Ö&.?.u.Š!α..3âŠÈ.U.š. 0001E0
```

```
Dump of file SATURN:[PCCOMMON.DUMP.DLL]SA-MERGE.DLL;1 on 18-APR-1990 10:51:16.75
File ID (417,12,0)   End of file block 105 / Allocated 108

Virtual block number 86 (00000056), 512 (0200) bytes

 88550442 E9008357 56EC8855 00CB5DFA 88914901 F7AEF2FF FF89C033 067EC4D7 •á-.3á¿..·Û%I!..•]ù.U.šVW•.ÕB.U. 000000
 5DE588C0 3302E800 01B80574 40173987 F60C7C00 F883117D 17371E38 065E88EC š.^.;.7.)..«.|.-.9.ət.¦..Š.3á.[] 000020
 FC5CE9C0 33057540 052EA1CB 5152E388 05720532 1E380872 D828DC88 5A5900C8 ù.YZ.É+Är.;.2.r..DRQùÅ..əu.3áÕ\• 000040
 C0080000 FFFF9A52 16501653 C4885087 1739A780 D4885200 0288052E 2EFF5152 RQ....£..R.å.Ī9.ñP.áS.P.R......á 000060
 C41EE319 640E885A D4794817 398F0808 81067500 02300774 00013D40 81127558 Xu.Ÿə=..t.=..u.Ÿ...9.KyåZ..d.D.á 000080
 196E8E19 621EFF00 038BC28C 196A06C4 01AEE903 7319621E FFD833C2 8C196606 .f..ò3Ù..b.s.Õ0.á.j..ò£....b./n. 0000A0
 FFFF9A11 43680E01 6A087419 7230196E 880073E8 196EBF19 6E8E007C E8196EBF •n.Ò|./n.•n.Òs.¦n.=r.t.j..hC.... 0000C0
 8EEC8855 0000113E 9A006A00 6A036A00 51E81972 BF196EBE D88E00A6 88C30000 ..û¦|..Ã/n.•r.ÒQ.j.j.j..>...U.š/ 0000E0
 BE0023E8 19728F19 728EEC88 5503E800 31E81972 BF196EBE 003AE81B F88F18F8 %.•%.Ò:./n.•r.Ò1.Š.U.š/r.•r.Ò#./ 000100
 621EFF00 028807E3 19640E88 0000FFFF 9A500646 8A50C033 001AE819 728F1972 r.•r.Ò..3áP.F.P.......d.D.£....b 000120
 FF2BF628 56570000 14C800C3 EEEB1DFF F2740245 08058804 EF830E73 F738C319 .û;%s..ÿ....E.t·..ŠŸû.à...WV+-+. 000140
 F876FF0C 6AF85689 F64689F2 5689F046 89C02800 F8168800 F0E90375 00F83639 96%.u.Õþ...%.+á.FÞ.V·.F-.V%j..v% 000160
 F65EC400 8CE90376 7FFFFE81 461974C0 080AC483 122A1484 9A050268 1EF676FF .v-.h.....•..á..åt.F.±..v.Õ¥.á^- 000180
 75003F80 26F65E88 F475003F 8026F646 FFF65EC4 0CE847EA 75003F80 26F646FF .F-&.?.uõGŠ.á^-.F-&.?.u¶.^-&.?.u 0001A0
 468902C4 83126F13 719A56EE 5689EC46 8904C483 1239142C 9A046A50 01458D8A ¤.E.Pj...,.9..á..Fš.VŸV.q.o..á..F 0001C0
 19411689 193FA3EE 568BEC46 886674C2 0BFC468B 6D74EE46 0BEC468B FE5689FC •.V±.Fš.FŸtm.F=.õtf.Fš.VŸÈ?...A. 0001E0
```

```
Dump of file SATURN:[PCCOMMON.DUMP.DLL]SA-MERGE.DLL;1 on 18-APR-1990 10:51:16.75
File ID (417,12,0)   End of file block 105 / Allocated 108

Virtual block number 87 (00000057), 512 (0200) bytes

 5688FC46 88EC5EC4 2C74C008 0AC4830F 7614849A 0502681E F076FFF2 76FF0C6A j..v·.vÞ.h.....v..é..ât,é^š.F■.V 000000
 C00A0788 26FC46FF FC5EC407 8A26F046 FFF05EC4 04EC4683 02578926 078926FE ±&..&.W..F$.é^Þ.FÞ&..é^■.F■&...â 000020
 028890CB C95F5EA7 75003F80 26F05EC4 F475003F 8026F046 FFF05EC4 E8E80E74 t.Šôé^Þ.FÞ&.?.u¶é^Þ&.?.uÏ^_èù.¡. 000040
 120F1600 160C080B 070A0C09 0C080C07 09060005 18040203 02021601 FA58E900 .ÕX*............................ 000060
 0A801606 09721C70 2060006C 08590057 00530052 02430041 02350212 12110010 ......5.A.C.R.S.W.Y.l.m p.r..... 000080
 E8CB5DE5 8B99FFFF B8172E16 891735A3 16080000 080702CE 0BA40084 09820A81 ......È.ö.■.....È5.....¡....Ï]ùÒ 0000A0
 F7E24343 1674073A 2E1B75E4 0A0024B9 12C4BB17 35A3CB5D E58B99FF FFB80008 ..¡....Ï]ùÈ5.Èé.¿$..ðu..:.t.CCã¼ 0000C0
 C4EC8B55 00C3172E A3980147 8A2E4301 76CA3C04 728C3C43 0A76243C 0472133C <.r.<$v.C<¥r.<òv.C..G..È..ü.U.‡é 0000E0
 73FFF130 06468857 5602EC83 EC8855CB 5DE58801 FE4F8026 0574C308 C08C065E ^..â.ût.&.O±..Ï]ùW.‡.‡.VW.F.=þ.s 000100
 FF087500 78E80574 0018E815 750082E8 1956A312 740025E8 08750019 563E831E ..>V..u.ÕX.t.ÈV.Ò..u.Ò..t.Òx.u.. 000120
 89FEE383 43065E88 0776065E 3900F088 CB5DE588 5E5F02C4 8311EA15 769A0676 v..v.õ..é._^.Ï]ùÈÞ.9^.v..^.C.D±. 000140
 581687C2 8B3874FF FA8308C4 8313A517 229A5002 80510E4F 8D50501E C033FE5E ^±3â.PP.O.Q¯.P.".È..é..*.t8.ö..X 000160
 A3000AB8 0C478948 480008A3 C033088E FE5E8800 08A3DA8E 0574020B 195AA319 .ÈZ..●t..ÖÈ...^±.Ä3âÈ..HH.G.¡..È 000180
 1E8ED833 064E88C0 8ED88CC3 1FD88C00 06A30000 05000AA3 01478D00 02A30000 ..È...G.È.....È...Ä.û.Ä.â.N.3Ü.. 0001A0
 14591820 9A0676FF 006A0876 FF006A56 00000AC8 C3098EC1 8CD20801 9AE8195A Z.Ò...●.ê.Ìùâ...Vj..v.j..v.. .Y. 0001C0
 468902C4 83147213 719A56F8 7688902F E899C028 0674FFFF C2F7FA56 89F84689 .F½.V*¾ó..t.+â.Š/..v½V.q.r..é..F 0001E0

Dump of file SATURN:[PCCOMMON.DUMP.DLL]SA-MERGE.DLL;1 on 18-APR-1990 10:51:16.75
File ID (417,12,0)   End of file block 105 / Allocated 108

Virtual block number 88 (00000058), 512 (0200) bytes

 FE5688FC 46889007 EB08C483 130117D8 9A50FE76 FF006A56 1274D008 FE5689FC ■.V±.Ät.Vj..v±P.Ä.Ì..é.Š...F■.V± 000000
 FE88C803 D9F7AEF2 C033F788 067EC4D9 8827E30E 4E881E56 57EC8855 90C8C95E ^èù.U.$WV..N.D'.Ìé~..¾3â·Ù¼Ì.ù.± 000020
 00CB5DE5 885F5E1F C18801F7 49490474 0477FF45 3A26C933 FF448AA6 F30A76C5 év.µÏ.D.3è&:E.w.t.ÏÏ¼Ì.ê.^_.Ï]ù. 000040
 800A7902 080E750A F9831374 C00A93FC 071E570A 7EC51E08 56880646 880E4E88 .N..F..V..ê~.W..■..ât..*.u..●y.¯ 000060
 0276393C 30040387 92F1F793 F1F70274 C0080233 92F788DA F7000283 D8F7AA2D -^¾Ü.●.¾Ö.¾.3●.ât.¾þ.¾þ..Æ.0<9v. 000080
 885E5F1F 580A8CF2 72C73801 4480FF44 880586AC 4F0588E2 75C308C2 88AA2704 .'^.ó.ûuã..O¯...D..D.;úr·.ÖX._^. 0000A0
 0E74830A 47F626FA 5EC41CE8 F628FC5E 8CFA4689 05348856 000006C8 00CB5DE5 Ï]ù.à...V¡4..F*.^■+-Š.é^*&-G..t. 0000C0
 C6880876 FA463917 24168817 22A10CFA 46834601 744004C4 83143E18 549A5306 .S.T.>..é.ât.F.F*.Ä"...$.9F*vÄ.ó 0000E0
 3F83194C 885756EC 8855C85D E58801FE 4F800474 0808065E 88EC8855 90C8C95E ^èù.U.‡.^..Üt..O±..Ï]ùW.$VWEL..? 000100
 000104C7 96194EA3 194CA3FE 244024E8 99C03305 750176E8 00058807 1E297500 .u)..¡..Òv.u.3â.Š$ã$±ÈL.ÈN..ú... 000120
 410000E9 CB5DE588 5E5F0009 E8C08ED8 8C064E88 19523689 FFFEFE44 C704C683 .ó.úD±±..óR..N..Ä.âÒ.._^.Ï]ùÖÄ.A 000140
 A8ADF003 D0881573 C1384843 7401A8FE 88ADFC02 7788F273 EEF983FE E180FA74 t*.Ä±.*Ÿs·.w.■Ù.±´.tCH;ès..Ä.ÞÙ´ 000160
 0305EB05 8948C12B FE4C89F9 030C74FE 88E6EBFE 4489F788 000205C2 03357401 .t5.ó....¾.D±ŠÏ.±t..*.L±+èH..Š.. 000180
 FE300219 5E06C626 C3027F89 195A1E8C 260574D1 381144B9 DA8CC688 FE4CFEF9 *±L±.ó.Ö¿D.;Ït.&..Z....û&ó.^..=± 0001A0
 0205C203 E27401A8 ADF00300 888C73C1 3848FE88 F27401A8 ADF003FE 882574FF .t%.±.ÞÙ´.t·.±H;ès¥.Ä.ÞÙ´.tã.ô.. 0001C0
 3B16098F D88C1274 195E0EFE 2615EB08 8E0474C0 08084788 E6EBFE44 89F78800 ..¾.D±ŠÏ.G..ât..ÄŠ.&±.^.t..Ä¢..; 0001E0

Dump of file SATURN:[PCCOMMON.DUMP.DLL]SA-MERGE.DLL;1 on 18-APR-1990 10:51:16.75
File ID (417,12,0)   End of file block 105 / Allocated 108

Virtual block number 89 (00000059), 512 (0200) bytes

 005FE898 40400124 0074C638 0068E8C0 33067788 88EB3788 19561E8E 260574C7 út.&..V..7ŠÈ.w.3âÒk.;ót.$.ãã.Ò_. 000000
 47890788 195AA326 0474C138 16508908 8C98E84E 4E960574 0010E8FE 4DFE0074 t.±M±Ò..t..NNŠ..Ä¿].;êt.&ÈZ....G 000020
 F575EAD1 0476195C 1638267F FFBA4141 49C82803 7401A8FE 458851C3 99C03302 .3â.ûQ.E±´.t.+âIAAn..&;.\.v.Ìõu¾ 000040
 52C359C0 33E575EA D1D2F708 75000CE8 C628C223 02F70072 C2031572 C603C188 .ê.ór..ôr.¾●#ô+óÒ..u.¾●ÌõuÌ3âYùR 000060
 5A5958FE 55894AD7 28D68806 7789FFFE FE44C7F2 03F088FE 88571874 0010E851 ÒÒ..t.W.±.Þ.·ùD±±..w..●+■J.U±XYZ 000080
 0802745B 5A1FFFFA 8308C483 15451722 9A1F0650 00018850 52521ED2 335053C3 ûSP3●.RRP¡..P...".E..é..*..Z[t.. 0000A0
 E8277200 57E80775 48064688 08568801 008F3875 000A7E83 065756EC 8855C3D2 ●ùU.$VW..~..uB¢...V..F.Hu.ÒW.r'Š 0000C0
 0500FE81 04C68334 735E003E E8560E46 89024488 0074F738 11744805 003688AC L.ó..Ht.;¾t..D..F.VÒ>.^s4.ó..±.. 0000E0
 E675C085 F95B0000 FFFF9A50 C0335016 52C48850 21EB99FF FF880675 D2080473 s..●u.¡...ŠIP.óR.P3âP.... [*.âu! 000100
 C6830C74 024C39F7 880E4E88 CB5DE588 5E5F07C0 33038805 00368902 5C891489 ...\..ó...Æ3â._^.Ï]ù.N..¾9..t..ó 000120
 51531373 00FA1E39 0675F738 C18ED388 26721C03 DA882CE8 F9F27505 00FE8104 ..±..u·*Š,.Ö..r&.Æ.ê;¾u.9.*.s.SQ 000140
 38E30C4E 88EC8855 00C3D188 04879200 FA168904 75F7380E 75C08500 00FFFF9A ......âuB;¾u...*.....Ìû.U.‡.N.D8 000160
 13A8F3E9 D1E08A0A 4688D128 D187D103 D323D818 D12B0C74 DAF7D788 067EC457 Wé-..■¾Öt.+Ì.ÙWÆ.Ì.Ì+Ì.F..ÄÌÖµ¨. 000180
 CB5D0856 88064688 5FAAF3C9 13A8F3E9 D1C38EFF FFC381C3 8C10E3D1 87AAF3C9 èµ^.ÌD..û.û...ûÌÖµ¨.èµ^ .F..V.]ù 0001A0
 88C888E3 F70008CA 5DE588E3 F7064688 08750A5E 88D8080C 5E880846 88EC8855 U.‡.F..^..Ä.^.u..F.¾D.ÏJò..¾D.à. 0001C0
 8A26065E C4F62856 000004C8 0008CA5D E5880103 E3F70646 88C8030C 66F70646 F.¾f..à.F.¾D.Ì.Ï]ò..à...V+-é^.&. 0001E0
```

```
Dump of file SATURN:[PCCOMMON.DUMP.DLL]SA-MERGE.DLL;1 on 18-APR-1990 10:51:16.75
File ID (417,12,0)   End of file block 105 / Allocated 108

Virtual block number 90 (0000005A), 512 (0200) bytes

 2887F606 D868F9F7 000CB999 05342DC3 88157508 0A47F626 5575023C 03240A47 G.$.<.uU&-G..u..û-4..¿..¥*kÄ.-.( 000000
 8A260677 FF260877 FF265028 7EC008FC 46890647 28260788 26065E8B 39740111 ..t9.^.&..&+G..F=.á-(P&.w.&.w.&. 000020
 065EC4FF FFBE200A 4F802606 5EC40874 FC463808 C4831712 0ECE9A50 E42A0847 G.*ôP.ö....á.;F•t.á^.&.O. ƒ..á^. 000040
 101A0203 000CCBC9 5EC68800 000447C7 26025789 26078926 08578826 06478826 &.G.&.W.&..&.W.&úG....ó^èù...... 000060
 16920002 00000008 18A80002 00070003 11580103 00050003 11900103 032C000C ..,...........X.......´......... 000080
 100A0103 003A0003 0EFA0103 00260003 17C10103 00220003 17760103 00000000 ......v..."...ê...&...*...:...Ö. 0000A0
 00000000 005C0003 0CF30103 005B0003 00060103 00880003 18080105 004D0003 ..M...............[...µ...\..... 0000C0
 6F43202D 20797261 7262694C 20656069 54206E75 5220534D 00000000 00000000 ........MS Run-Time Library - Co 0000E0
 70726F43 2074666F 736F7263 6940202C 38383931 20296328 20746867 69727970 pyright (c) 1988, Microsoft Corp 000100
 654D0000 734D5020 656D6173 20656874 20656772 656D2074 276E6143 00000011 ....Can't merge the same PMs..Me 000120
 6974616E 69747365 442F6563 72756F53 00737463 656A626F 206F7774 20656772 rge two objects.Source/Destinati 000140
 00776F6C 46206F66 6E490065 726F7453 206F666E 49007373 65636F72 50006E6F on.Process.Info Store.Info Flow. 000160
 22002273 25220065 6772654D 20656361 66726574 6E490022 73252200 22732522 "%s"."%s".Interface Merge."%s"." 000180
 001E001F 00210022 00060005 00040003 00006567 72654D20 6C6C7546 00227325 %s".Full Merge..........".l..... 0001A0
 11731C00 1C000000 00000000 23202D28 00296C6C 756E2800 296C6C75 6E280000 ..(null).(null).+- #..........s. 0001C0
 00000000 00000000 00000000 00000000 00000000 00000000 00000000 19821C00 ................................ 0001E0

Dump of file SATURN:[PCCOMMON.DUMP.DLL]SA-MERGE.DLL;1 on 18-APR-1990 10:51:16.75
File ID (417,12,0)   End of file block 105 / Allocated 108

Virtual block number 91 (0000005B), 512 (0200) bytes

 00000000 00000000 00000000 00000000 00000000 00000000 00000000 00000000 ................................ 000000
 00000000 00000000 00000000 00000000 00000000 00000000 00000000 00000000 ................................ 000020
 00000000 00000000 00000000 00000000 00000000 00000000 00000000 00000000 ................................ 000040
 00000000 00000000 00000000 00000000 00000000 00000000 00000000 00000000 ................................ 000060
 00000000 00000000 00000000 00000000 00000000 00000000 00000000 00000000 ................................ 000080
 00000000 00000000 00000000 00000000 00000000 00000000 00000000 00000000 ................................ 0000A0
 00000000 00000000 00000000 00000000 00000000 00000000 00000000 00000000 ................................ 0000C0
 00000000 00000000 00000000 00000000 00000000 00000000 00000000 00000000 ................................ 0000E0
 00000000 00000000 00000000 00000000 00000000 00000000 00000000 00000000 ................................ 000100
 00000000 00000000 00000000 00000000 00000000 00000000 00000000 00000000 ................................ 000120
 00000000 00000000 00000000 00000000 00000000 00000000 00000000 00000000 ................................ 000140
 00000000 00000000 00000000 00000000 00000000 00000000 00000000 00000000 ................................ 000160
 00000000 00000000 00000000 00000000 00000000 00000000 00000000 00000000 ................................ 000180
 00000000 00000000 00000000 00000000 00000000 00000000 00000000 00000000 ................................ 0001A0
 00000000 00000000 00000000 00000000 00000000 00000000 00000000 00000000 ................................ 0001C0
 00000000 00000000 00000000 00000000 00000000 00000000 00000000 00000000 ................................ 0001E0

Dump of file SATURN:[PCCOMMON.DUMP.DLL]SA-MERGE.DLL;1 on 18-APR-1990 10:51:16.75
File ID (417,12,0)   End of file block 105 / Allocated 108

Virtual block number 92 (0000005C), 512 (0200) bytes

 00000000 00000000 00000000 00000000 00000000 00000000 00000000 00000000 ................................ 000000
 00000000 00000000 00000000 00000000 00000000 00000000 00000000 00000000 ................................ 000020
 00000000 00000000 00000000 00000000 00000000 00000000 00000000 00000000 ................................ 000040
 00000000 00000000 00000000 00000000 00000000 00000000 00000000 00000000 ................................ 000060
 00000000 00000000 00000000 00000000 00000000 00000000 00000000 00000000 ................................ 000080
 00000000 00000000 00000000 00000000 00000000 00000000 00000000 00000000 ................................ 0000A0
 00000000 00000000 00000000 00000000 00000000 00000000 00000000 00000000 ................................ 0000C0
 00000000 00000000 00000000 00000000 00000000 00000000 00000000 00000000 ................................ 0000E0
 00000000 00000000 00000000 00000000 00000000 00000000 00000000 00000000 ................................ 000100
 00000000 00000000 00000000 00000000 00000000 00000000 00000000 00000000 ................................ 000120
 00000000 00000000 00000000 00000000 00000000 00000000 00000000 00000000 ................................ 000140
 00000000 00000000 00000000 00000000 00000000 00000000 00000000 00000000 ................................ 000160
 00000000 00000000 00000000 00000000 00000000 00000000 00000000 00000000 ................................ 000180
 00000000 00000000 00000000 00000000 00000000 00000000 00000000 00000000 ................................ 0001A0
 00000000 00000000 00000000 00000000 00000000 00000000 00000000 00000000 ................................ 0001C0
 051A12BE 051612BE FFFF12BE 00000000 003D4F46 4E495F45 4C49465F 435F0100 .._C_FILE_INFO=.....ƒ...ƒ...ƒ... 0001E0
```

```
Dump of file SATURN:[PCCOMMON.DUMP.DLL]SA-MERGE.DLL;1 on 18-APR-1990 10:51:16.75
File ID (417,12,0)    End of file block 105 / Allocated 108

Virtual block number 93 (0000005D), 512 (0200) bytes

 00011980 00040000 053C0004 0200FFFF FFFF0101 00000000 052212BE 051E12BE f...f."...............<......... 000000
 00000000 00000000 02020000 00000000 00000000 01020000 00000000 00000000 ................................ 000020
 00000000 00000000 00000000 00000000 00000000 00000000 00000000 00000000 ................................ 000040
 00000000 00000000 00000000 00000000 00000000 00000000 00000000 00000000 ................................ 000060
 00000000 00000000 00000000 00000000 00000000 00000000 00000000 00000000 ................................ 000080
 00000000 00000000 00000000 00000000 00000000 00000000 00000000 00000000 ................................ 0000A0
 00000000 00000000 00000000 00000000 00000000 00000000 00000000 00000000 ................................ 0000C0
 00000000 00000000 00000000 00000000 00000000 00000000 00000000 00000000 ................................ 0000E0
 00000000 00000000 00000000 00000000 00000000 00000000 00000000 00000000 ................................ 000100
 00000000 00000000 00000000 00000000 00000000 00000000 00000000 00000000 ................................ 000120
 00000000 00000000 00000000 00000000 00000000 00000000 00000000 00000000 ................................ 000140
 00000000 00000000 00000000 00000000 00000000 00000000 00000000 00000000 ................................ 000160
 00000000 00000000 00000000 00000000 00000000 00000000 00000000 00000000 ................................ 000180
 00000000 00000000 00000000 00000000 00000000 00000000 00000000 00000000 ................................ 0001A0
 00000000 00000000 00000000 00000000 00000000 00000000 00000000 00000000 ................................ 0001C0
 00000000 00000000 00000000 00000000 00000000 00000000 00000000 00000000 ................................ 0001E0

Dump of file SATURN:[PCCOMMON.DUMP.DLL]SA-MERGE.DLL;1 on 18-APR-1990 10:51:16.75
File ID (417,12,0)    End of file block 105 / Allocated 108

Virtual block number 94 (0000005E), 512 (0200) bytes

 00000000 00000000 00000000 00000000 00000000 00000000 00000000 00000000 ................................ 000000
 00000000 00000000 00000000 00000000 00000000 00000000 00000000 00000000 ................................ 000020
 00000000 00000000 00000000 00000000 00000000 00000000 00000000 00000000 ................................ 000040
 00000000 00000000 00000000 00000000 00000000 00000000 00000000 00000000 ................................ 000060
 00000000 00000000 00000000 00000000 00000000 00000000 00000000 00000000 ................................ 000080
 00000000 00000000 00000000 00000000 00000000 00000000 00000000 00000000 ................................ 0000A0
 00000000 00000000 00000000 00000000 00000000 00000000 00000000 00000000 ................................ 0000C0
 00000000 00000000 00000000 00000000 00000000 00000000 00000000 00000000 ................................ 0000E0
 00000000 00000000 00000000 00000000 00000000 00000000 00000000 00000000 ................................ 000100
 00000000 00000000 00000000 00000000 00000000 00000000 00000000 00000000 ................................ 000120
 00000000 00000000 00000000 00000000 00000000 00000000 00000000 00000000 ................................ 000140
 00000000 00000000 00000000 00000000 00000000 00000000 00000000 00000000 ................................ 000160
 00000000 00000000 00000000 00000000 00000000 00000000 00000000 00000000 ................................ 000180
 00000000 00000000 00000000 00000000 00000000 00000000 00000000 00000000 ................................ 0001A0
 00000000 00000000 00000000 00000000 00000000 00000000 00000000 00000000 ................................ 0001C0
 00000000 00000000 00000000 00000000 00000000 00000000 00000000 00000000 ................................ 0001E0

Dump of file SATURN:[PCCOMMON.DUMP.DLL]SA-MERGE.DLL;1 on 18-APR-1990 10:51:16.75
File ID (417,12,0)    End of file block 105 / Allocated 108

Virtual block number 95 (0000005F), 512 (0200) bytes

 00000000 00000000 00000000 00000000 00000000 00000000 00000000 00000000 ................................ 000000
 00000000 00000000 00000000 00000000 00000000 00000000 00000000 00000000 ................................ 000020
 00000000 00000000 00000000 00000000 00000000 00000000 00000000 00000000 ................................ 000040
 00000000 00000000 00000000 00000000 00000000 00000000 00000000 00000000 ................................ 000060
 00000000 00000000 00000000 00000000 00000000 00000000 00000000 00000000 ................................ 000080
 00000000 00000000 00000000 00000000 00000000 00000000 00000000 00000000 ................................ 0000A0
 00000000 00000000 00000000 00000000 00000000 00000000 00000000 00000000 ................................ 0000C0
 00000000 00000000 00000000 00000000 00000000 00000000 00000000 00000000 ................................ 0000E0
 00000000 00000000 00000000 00000000 00000000 00000000 00000000 00000000 ................................ 000100
 00000000 00000000 00000000 00000000 00000000 00000000 00000000 00000000 ................................ 000120
 00000000 00000000 00000000 00000000 00000000 00000000 00000000 00000000 ................................ 000140
 00000000 00000000 00000000 00000000 00000000 00000000 00000000 00000000 ................................ 000160
 00000000 00000000 00000000 00000000 00000000 00000000 00000000 00000000 ................................ 000180
 00000000 00000000 00000000 00000000 00000000 00000000 00000000 00000000 ................................ 0001A0
 00000000 00000000 00000000 00000000 00000000 00000000 00000000 00000000 ................................ 0001C0
 00000000 00000000 00000000 00000000 00000000 00000000 00000000 00000000 ................................ 0001E0
```

```
Dump of file SATURN:[PCCOMMON.DUMP.DLL]SA-MERGE.DLL;1 on 18-APR-1990 10:51:16.75
File ID (417,12,0)   End of file block 105 / Allocated 108

Virtual block number 96 (00000060), 512 (0200) bytes

00000000 00000000 00000000 00000000 00000000 00000000 00000000 00000000 ................................ 000000
00000000 00000000 00000000 00000000 00000000 00000000 00000000 00000000 ................................ 000020
00000000 00000000 00000000 00000000 00000000 00000000 00000000 00000000 ................................ 000040
00000000 00000000 00000000 00000000 00000000 00000000 00000000 00000000 ................................ 000060
00000000 00000000 00000000 00000000 00000000 00000000 00000000 00000000 ................................ 000080
00000000 00000000 00000000 00000000 00000000 00000000 00000000 00000000 ................................ 0000A0
00000000 00000000 00000000 00000000 00000000 00000000 00000000 00000000 ................................ 0000C0
00000000 00000000 00000000 00000000 00000000 00000000 00000000 00000000 ................................ 0000E0
00000000 00000000 00000000 00000000 00000000 00000000 00000000 00000000 ................................ 000100
00000000 00000000 00000000 00000000 00000000 00000000 00000000 00000000 ................................ 000120
00000000 00000000 00000000 00000000 00000000 00000000 00000000 00000000 ................................ 000140
00000000 00000000 00000000 00000000 00000000 00000000 00000000 00000000 ................................ 000160
00000000 00000000 00000000 00000000 00000000 00000000 00000000 00000000 ................................ 000180
00000000 00000000 00000000 00000000 00000000 00000000 00000000 00000000 ................................ 0001A0
00000000 00000000 00000000 00000000 00000000 00000000 00000000 00000000 ................................ 0001C0
00000000 00000000 00000000 00000000 00000000 00000000 00000000 00000000 ................................ 0001E0
```

```
Dump of file SATURN:[PCCOMMON.DUMP.DLL]SA-MERGE.DLL;1 on 18-APR-1990 10:51:16.75
File ID (417,12,0)   End of file block 105 / Allocated 108

Virtual block number 97 (00000061), 512 (0200) bytes

00000000 00000000 00000000 00000000 00000000 00000000 00000000 00000000 ................................ 000000
00000000 00000000 00000000 00000000 00000000 00000000 00000000 00000000 ................................ 000020
00000000 00000000 00000000 00000000 00000000 00000000 00000000 00000000 ................................ 000040
00000000 00000000 00000000 00000000 00000000 00000000 00000000 00000000 ................................ 000060
00000000 00000000 00000000 00000000 00000000 00000000 00000000 00000000 ................................ 000080
00000000 00000000 00000000 00000000 00000000 00000000 00000000 00000000 ................................ 0000A0
00000000 00000000 00000000 00000000 00000000 00000000 00000000 00000000 ................................ 0000C0
00000000 00000000 00000000 00000000 00000000 00000000 00000000 00000000 ................................ 0000E0
00000000 00000000 00000000 00000000 00000000 00000000 00000000 00000000 ................................ 000100
00000000 00000000 00000000 00000000 00000000 00000000 00000000 00000000 ................................ 000120
00000000 00000000 00000000 00000000 00000000 00000000 00000000 00000000 ................................ 000140
00000000 00000000 00000000 00000000 00000000 00000000 00000000 00000000 ................................ 000160
00000000 00000000 00000000 00000000 00000000 00000000 00000000 00000000 ................................ 000180
00000000 00000000 00000000 00000000 00000000 00000000 00000000 00000000 ................................ 0001A0
00000000 00000000 00000000 00000000 00000000 00000000 00000000 00000000 ................................ 0001C0
00000000 00000000 00000000 00000000 00000000 00000000 00000000 00000000 ................................ 0001E0
```

```
Dump of file SATURN:[PCCOMMON.DUMP.DLL]SA-MERGE.DLL;1 on 18-APR-1990 10:51:16.75
File ID (417,12,0)   End of file block 105 / Allocated 108

Virtual block number 98 (00000062), 512 (0200) bytes

00000000 00000000 00000000 00000000 00000000 00000000 00000000 00000000 ................................ 000000
00000000 00000000 00000000 00000000 00000000 00000000 00000000 00000000 ................................ 000020
00000000 00000000 00000000 00000000 00000000 00000000 00000000 00000000 ................................ 000040
00000000 00000000 00000000 00000000 00000000 00000000 00000000 00000000 ................................ 000060
00000000 00000000 00000000 00000000 00000000 00000000 00000000 00000000 ................................ 000080
00000000 00000000 00000000 00000000 00000000 00000000 00000000 00000000 ................................ 0000A0
00000000 00000000 00000000 00000000 00000000 00000000 00000000 00000000 ................................ 0000C0
00000000 00000000 00000000 00000000 00000000 00000000 00000000 00000000 ................................ 0000E0
00000000 00000000 00000000 00000000 00000000 00000000 00000000 00000000 ................................ 000100
00000000 00000000 00000000 00000000 00000000 00000000 00000000 00000000 ................................ 000120
00000000 00000000 00000000 00000000 00000000 00000000 00000000 00000000 ................................ 000140
00000000 00000000 00000000 00000000 00000000 00000000 00000000 00000000 ................................ 000160
00000000 00000000 00000000 00000000 00000000 00000000 00000000 00000000 ................................ 000180
00000000 00000000 00000000 00000000 00000000 00000000 00000000 00000000 ................................ 0001A0
00000000 00000000 00000000 00000000 00000000 00000000 00000000 00000000 ................................ 0001C0
00000000 00000000 00000000 00000000 00000000 00000000 00000000 00000000 ................................ 0001E0
```

```
Dump of file SATURN:[PCCOMMON.DUMP.DLL]SA-MERGE.DLL;1 on 18-APR-1990 10:51:16.75
File ID (417,12,0)   End of file block 105 / Allocated 108

Virtual block number 99 (00000063), 512 (0200) bytes

00000000 00000000 00000000 00000000 00000000 02000001 00000000 00000000 ................................ 000000
00000000 00000000 00000000 00000000 00000000 00000000 00000000 00000000 ................................ 000020
00000000 00000000 00000000 00000000 00000000 00000000 00000000 00000000 ................................ 000040
00000000 00000000 00000000 00000000 00000000 00000000 00000000 00000000 ................................ 000060
00000000 00000000 00000000 00000000 00000000 00000000 00000000 00000000 ................................ 000080
00000000 00000000 00000000 00000000 00000000 00000000 00000000 00000000 ................................ 0000A0
00000000 00000000 00000000 00000000 00000000 00000000 00000000 00000000 ................................ 0000C0
00000000 00000000 00000000 00000000 00000000 00000000 00000000 00000000 ................................ 0000E0
00000000 00000000 00000000 00000000 00000000 00000000 00000000 00000000 ................................ 000100
00000000 00000000 00000000 00000000 00000000 00000000 00000000 00000000 ................................ 000120
00000000 00000000 00000000 00000000 00000000 00000000 00000000 00000000 ................................ 000140
00000000 00000000 00000000 00000000 00000000 00000000 00000000 00000000 ................................ 000160
00000000 00000000 00000000 00000000 00000000 00000000 00000000 00000000 ................................ 000180
00000000 00000000 00000000 00000000 00000000 00000000 00000000 00000000 ................................ 0001A0
00000000 00000000 00000000 00000000 00000000 00000000 00000000 00000000 ................................ 0001C0
00000000 00000000 00000000 00000000 00000000 00000000 00000000 00000000 ................................ 0001E0

Dump of file SATURN:[PCCOMMON.DUMP.DLL]SA-MERGE.DLL;1 on 18-APR-1990 10:51:16.75
File ID (417,12,0)   End of file block 105 / Allocated 108

Virtual block number 100 (00000064), 512 (0200) bytes

00000000 00000000 00000000 00000000 00000000 00000000 00000000 00000000 ................................ 000000
00000000 00000000 00000000 00000000 00000000 00000000 00000000 00000000 ................................ 000020
00000000 00000000 00000000 00000000 00000000 00000000 00000000 00000000 ................................ 000040
00000000 00000000 00000000 00000000 00000000 00000000 00000000 00000000 ................................ 000060
00000000 00000000 00000000 00000000 00000000 00000000 00000000 00000000 ................................ 000080
00000000 00000000 00000000 00000000 00000000 00000000 00000000 00000000 ................................ 0000A0
00000000 00000000 00000000 00000000 00000000 00000000 00000000 00000000 ................................ 0000C0
00000000 00000000 00000000 00000000 00000000 00000000 00000000 00000000 ................................ 0000E0
00000000 00000000 00000000 00000000 00000000 00000000 00000000 00000000 ................................ 000100
00000000 00000000 00000000 00000000 00000000 00000000 00000000 00000000 ................................ 000120
00000000 00000000 00000000 00000000 00000000 00000000 00000000 00000000 ................................ 000140
00000000 00000000 00000000 00000000 00000000 00000000 00000000 00000000 ................................ 000160
00000000 00000000 00000000 00000000 00000000 00000000 00000000 00000000 ................................ 000180
00000000 00000000 00000000 00000000 00000000 00000000 00000000 00000000 ................................ 0001A0
00000000 00000000 00000000 00000000 00000000 00000000 00000000 00000000 ................................ 0001C0
00000000 00000000 00000000 00000000 00000000 00000000 00000000 00000000 ................................ 0001E0

Dump of file SATURN:[PCCOMMON.DUMP.DLL]SA-MERGE.DLL;1 on 18-APR-1990 10:51:16.75
File ID (417,12,0)   End of file block 105 / Allocated 108

Virtual block number 101 (00000065), 512 (0200) bytes

00000000 00000000 00000000 00000000 00000000 00000000 00000000 00000000 ................................ 000000
00000000 00000000 00000000 00000000 00000000 00000000 00000000 00000000 ................................ 000020
00000000 00000000 00000000 00000000 00000000 00000000 00000000 00000000 ................................ 000040
00000000 00000000 00000000 00000000 00000000 00000000 00000000 00000000 ................................ 000060
00000000 00000000 00000000 00000000 00000000 00000000 00000000 00000000 ................................ 000080
00000000 00000000 00000000 00000000 00000000 00000000 00000000 00000000 ................................ 0000A0
00000000 00000000 00000000 00000000 00000000 00000000 00000000 00000000 ................................ 0000C0
00000000 00000000 00000000 00000000 00000000 00000000 00000000 00000000 ................................ 0000E0
00000000 00000000 00000000 00000000 00000000 00000000 00000000 00000000 ................................ 000100
00000000 00000000 00000000 00000000 00000000 00000000 00000000 00000000 ................................ 000120
00000000 00000000 00000000 00000000 00000000 00000000 00000000 00000000 ................................ 000140
00000000 00000000 00000000 00000000 00000000 00000000 00000000 00000000 ................................ 000160
00000000 00000000 00000000 00000000 00000000 00000000 00000000 00000000 ................................ 000180
00000000 00000000 00000000 00000000 00000000 00000000 00000000 00000000 ................................ 0001A0
00000000 00000000 00000000 00000000 00000000 00000000 00000000 00000000 ................................ 0001C0
00000000 00000000 00000000 00000000 00000000 00000000 00000000 00000000 ................................ 0001E0
```

```
Dump of file SATURN:[PCCOMMON.DUMP.DLL]SA-MERGE.DLL;1 on 18-APR-1990 10:51:16.75
File ID (417,12,0)   End of file block 105 / Allocated 108

Virtual block number 102 (00000066), 512 (0200) bytes

 00000000 81818101 00000001 00000000 00000000 00000000 00000102 111C0000 ................................ 000000
 00000000 00000000 00000000 00000000 00000000 00000000 00000000 00000000 ................................ 000020
 00000000 00000000 00000000 00000000 00000000 00000000 00000000 00000000 ................................ 000040
 00000000 00000000 00000000 00000000 00000000 00000000 00000000 00000000 ................................ 000060
 00000000 00000000 00000000 00000000 00000000 00000000 00000000 00000000 ................................ 000080
 00000000 00000000 00000000 00000000 00000000 00000000 00000000 00000000 ................................ 0000A0
 00000000 00000000 00000000 00000000 00000000 00000000 00000000 00000000 ................................ 0000C0
 00000000 00000000 00000000 00000000 00000000 00000000 00000000 00000000 ................................ 0000E0
 0A0A0A0A 0A0A0A00 00000000 00000000 00000000 00000000 00000000 00000000 ................................ 000100
 0A0A0A0A 0A0A0A0A 0A0A0A0A 0A0A0A0A 0A0A0A0A 0A0A0A0A 0A0A0A0A 0A0A0A0A ................................ 000120
 0A0A0A0A 0A0A0A0A 0A0A0A0A 0A0A0A0A 0A0A0A0A 0A0A0A0A 0A0A0A0A 0A0A0A0A ................................ 000140
 0A0A0A0A 0A0A0A0A 0A0A0A0A 0A0A0A0A 0A0A0A0A 0A0A0A0A 0A0A0A0A 0A0A0A0A ................................ 000160
 0A0A0A0A 0A0A0A0A 0A0A0A0A 0A0A0A0A 0A0A0A0A 0A0A0A0A 0A0A0A0A 0A0A0A0A ................................ 000180
 0A0A0A0A 0A0A0A0A 0A0A0A0A 0A0A0A0A 0A0A0A0A 0A0A0A0A 0A0A0A0A 0A0A0A0A ................................ 0001A0
 0A0A0A0A 0A0A0A0A 0A0A0A0A 0A0A0A0A 0A0A0A0A 0A0A0A0A 0A0A0A0A 0A0A0A0A ................................ 0001C0
 0A0A0A0A 0A0A0A0A 0A0A0A0A 0A0A0A0A 0A0A0A0A 0A0A0A0A 0A0A0A0A 0A0A0A0A ................................ 0001E0

Dump of file SATURN:[PCCOMMON.DUMP.DLL]SA-MERGE.DLL;1 on 18-APR-1990 10:51:16.75
File ID (417,12,0)   End of file block 105 / Allocated 108

Virtual block number 103 (00000067), 512 (0200) bytes

 00000000 0000000A 0A0A0A0A 0A0A0A0A 0A0A0A0A 0A0A0A0A 0A0A0A0A 0A0A0A0A ................................ 000000
 00002000 00000000 00000000 00000000 00000000 00000000 00000000 00000000 .............................. .. 000020
 197C197A 19781976 19741972 FFFF0526 15240000 00000000 00000000 00000000 ..............$.&...r.t.v.x.z.|. 000040
 65766F20 68636174 73202D0A 0D303030 36520000 3E3E4753 4D4E3C3C FFFF197E -...<<NMSG>>..R6000..- stack ove 000060
 64697669 64207265 6765746E 69202D0A 0D333030 36520003 000A0077 6F6C6672 rflow.....R6003..- integer divid 000080
 73206867 756F6E65 20746F6E 202D0A0D 38303036 52000800 0A0D3020 79622065 e by 0.....R6008..- not enough s 0000A0
 202D0A0D 39303036 52000900 0A0D7374 6E656075 67726120 726F6620 65636170 pace for arguments.....R6009..-  0000C0
 746E656D 6E6F7269 766E6520 726F6620 65636170 73206867 756F6E65 20746F6E not enough space for environment 0000E0
 30303652 00020020 726F7272 6520656D 6974206E 757200FF 000A0000 FC000A0D ...*......run-time error ...R600 000100
 0A0D6465 64616F6C 20746F6E 20746E69 6F702067 6E697461 6F6C6620 2D0A0D32 2..- floating point not loaded.. 000120
 00000000 00001724 00020000 000C0536 00020000 00081970 00020003 FFFFFF00 ........p.......6.......$....... 000140
 0100442F 53040065 726F7453 0600776F 6C460500 01007373 65636F72 50080352 R..Process....Flow..Store..S/D.. 000160
 00000000 00000000 00000000 01000100 01000100 01000100 01000100 01000100 ................................ 000180
 66726550 32007325 20732520 6F746E69 20732520 73252064 65677265 4D180352 R..Merged %s %s into %s %s.2Perf 0001A0
 646F6D20 73736563 6F727020 6E6F2065 6772656D 206C6C75 6620676E 696D726F orming full merge on process mod 0001C0
 656C706D 6F632065 6772656D 206C6C75 46150073 2520646E 61207325 20736C65 els %s and %s..Full merge comple 0001E0

Dump of file SATURN:[PCCOMMON.DUMP.DLL]SA-MERGE.DLL;1 on 18-APR-1990 10:51:16.75
File ID (417,12,0)   End of file block 105 / Allocated 108

Virtual block number 104 (00000068), 512 (0200) bytes

 66726550 37006465 74616E69 6D726574 20656772 656D206C 6C754616 00646574 ted..Full merge terminated.7Perf 000000
 7365636F 7270206E 6F206567 72656D20 65636166 7265746E 6920676E 696D726F orming interface merge on proces 000020
 656D2065 63616672 65746E49 1A007325 20646E61 20732520 736C6564 6F6D2073 s models %s and %s..Interface me 000040
 74206567 72656D20 65636166 7265746E 491B0064 6574656C 706D6F63 20656772 rge completed..Interface merge t 000060
 00000000 00010001 00010001 00010001 00010001 00010064 6574616E 696D7265 erminated....................... 000080
 005F1400 009001D0 00180001 0000000E 00000000 FFFF0001 000E0352 00000255 U...R..................Å......_. 0000A0
 00820005 80000002 01ED000B 00050000 00000000 01E9FFFF 0064009B 00AF000E ..£...d...Õ...........Ù........ 0000C0
 003D0084 000A8002 000401F9 00080003 00000000 0000FFFF FFFF0065 001400A5 É...e...............'.........=. 0000E0
 000A0050 00840050 80020004 02050010 00030000 00000000 FFFFFFFF 0066000A ..f.......................P...P... 000100
 00680008 00360076 00058001 00010216 000A0005 00000000 0000FFFF FFFF0067 g......................v.6...h. 000120
 FFFF0069 00080036 0076005A 80010001 0221000A 00050000 00000000 FFFFFFFF ..............!.....Z.v.6...i... 000140
 FFFFFFFF 006C0008 0050006C 00058001 0001022C 00000005 00000000 0000FFFF ...........,.......l.P...l..... 000160
 0000FFFF FFFF006D 00080050 006C005A 80010001 022D0000 00050000 00000000 ..........-.....Z.l.P...m....... 000180
 00000000 FFFFFFFF 006A0008 00360062 00058001 0001022E 000A0005 00000000 ................b.6...j......... 0001A0
 00000000 0000FFFF FFFF0068 00080036 0062005A 80010001 0239000A 00050000 ......9.....Z.b.6...k........... 0001C0
 00070000 00000000 FFFFFFFF 006E0040 00500020 00058002 00000244 00000007 ....D....... .P.@.n............. 0001E0
```

```
Dump of file SATURN:[PCCOMMON.DUMP.DLL]SA-MERGE.DLL;1 on 18-APR-1990 10:51:16.75
File ID (417,12,0)   End of file block 105 / Allocated 108

Virtual block number 105 (00000069), 512 (0200) bytes

00020003 00000000 0000FFFF FFFF006F 00400050 0020005A 80020000 02450000 ..E.....Z. .P.@.o............... 000000
02490006 00030000 00000000 FFFFFFFF 0001000C 0023000A 00118002 04000246 F.........#...................I. 000020
01000250 00040003 00000000 0000FFFF FFFF0002 000C0023 000A0047 80020000 ....G...#...................P... 000040
7365636F 7270206F 77742065 6772654D FFFFFFFF 0070000C 0023000A 00768002 ..v...#...p.....Merge two proces 000060
6D206C6C 75467E00 73657079 74206567 72654D00 00000300 736C6564 6F6D2073 s models.....Merge types.~Full m 000080
3A4D5020 65637275 6F530065 6772656D 20656361 66726574 6E497E00 65677265 erge.~Interface merge.Source PM: 0000A0
20746567 72615400 734D5020 65637275 6F530000 003A4D50 20746567 72615400 .Target PM:...Source PMs.Target  0000C0
00000000 00000000 00000000 706C6548 006C6563 6E614300 4B4F0000 00734D50 PMs...OK.Cancel.Help............ 0000E0
00671400 009000C2 000F0001 00000005 00000000 FFFF0001 000E0352 000000FB «...R...................ô.....g. 000100
00200005 80000001 00D60013 00050000 00000000 0002FFFF 00C8002D 00840038 8.Ç.-.à...#...........#........ . 000120
00AA0016 00058002 000C00EA 00000006 00000000 0000FFFF FFFF00C9 00080064 d...è...............õ.........`. 000140
000C0023 0005001C 80020400 00EB0003 00030000 00000000 FFFFFFFF 00CA0008 ..ò...............Š.........#... 000160
0002000C 00230005 00498002 000000EF 00060003 00000000 0000FFFF FFFF0001 ................ÿ.....I...#..... 000180
FFFF00CB 000C0023 00050075 80020100 00F60004 00030000 00000000 FFFFFFFF .............-.....u...#...Ù... 0001A0
6A626F20 64656772 654D0000 00030065 6D616E20 74656772 61742077 654EFFFF ..New target name.....Merged obj 0001C0
00000000 0A00706C 6548006C 65636E61 43004B4F 7E00003A 656D616E 20746365 ect name:..~OK.Cancel.Help...... 0001E0

Dump of file SATURN:[PCCOMMON.DUMP.DLL]SA-PDLED.DLL;1 on 18-APR-1990 10:51:30.28
File ID (436,15,0)   End of file block 133 / Allocated 136

Virtual block number 1 (00000001), 512 (0200) bytes

00000000 00000040 00000000 00000088 0000FFFF 00000004 0000006F 00B45A4D MZÇ.o...........|.......@....... 000000
00000080 00000000 00000000 00000000 00000000 00000000 00000000 00000000 ................................ 000020
6F6E6E61 63206D61 72676F72 70207369 685421CD 4C01B821 CD09B400 0EBA1F0E ..¤..Ç.ë|¦.LÈ!This program canno 000040
00000000 00000024 0A0D0D2E 65646F6D 20534F44 206E6920 6E757220 65622074 t be run in DOS mode....$....... 000060
0015000F 00000000 00060000 00000000 00098009 FA90C110 000A07EC 0505454E NE..š....ê.º....................  000080
00000000 00000000 00010006 00040000 00000876 011600EC 00000088 00400037 7.@.|.Å.š...v................... 0000A0
138C0F00 138C052C 07F00F00 07F004A1 14DA0F00 14DA0339 27AE0F00 27AE0088 ..Û'..Û'9.Ö...Ö.Å.Þ...Þ.,....... 0000C0
02020E21 00000000 42710F00 42710608 000F0F00 000F0606 054C0F00 054C0677 w.L...L.ø........Ä.qB..qB....!... 0000E0
006E1EF1 006E1049 00441EF1 00441044 27381EF1 273800D0 2DF00F21 2C4A0B09 ..J,!.Þ-Å.8'þ.8'D.D.þ.D.I.n.þ.n. 000100
00010005 029A0001 01CE1EB1 01CE1076 01CC1EB1 01CC1059 008A1EF1 008A1050 P...þ...Y.ä.Ÿ.ä.v.ö.Ÿ.ö......... 000120
45494C43 0D000044 454C4450 2D415308 012C0004 01010004 00460005 00450005 ..E...F.......,..SA-PDLED...CLIE 000140
00980092 0089007A 00670052 003F0029 00180001 00000243 4F525044 4E57544E NTWNDPROC.......).?.R.g.z....... 000160
626F6C67 6874656D 0800069C 065405A7 04B5046C 03C4035F 028E0269 023A016F o.:.i...._.é.l.ç.Ï.T.....methglob 000180
0854494E 494D4744 41535F0A 6D676461 73055449 4E49424F 4C474854 454D5F0D ._METHGLOBINIT.sadgm._SADGMINIT. 0001A0
44505F0B 6D67646C 64700654 494E4953 4B4F4F4C 4C44500C 736B6F6F 6C6C6470 pdllooks.PDLLOOKSINIT.pdldgm._PD 0001C0
66690654 494E4942 4F4C474C 4D445F0C 626F6C67 6C6D6407 54494E49 4D47444C LDGMINIT.dmlglob._DMLGLOBINIT.if 0001E0

Dump of file SATURN:[PCCOMMON.DUMP.DLL]SA-PDLED.DLL;1 on 18-APR-1990 10:51:30.28
File ID (436,15,0)   End of file block 133 / Allocated 136

Virtual block number 2 (00000002), 512 (0200) bytes

08524944 52554351 534F440A 4F495303 54494E49 4C4D444D 46495F08 6C6D6460 mdml._IFMDMLINIT.SIO.DOSQCURDIR. 000000
4F4F5445 54414552 43495447 5F0E4954 47034E49 57405005 534C4C41 43534F44 DOSCALLS.PMWIN.GTI._GTICREATETOO 000020
4954470A 434F5250 4C4F4F54 46454449 54470E4C 4F4F544C 4C494B49 5447084C L.GTIKILLTOOL.GTIDEFTOOLPROC.GTI 000040
574C4F4F 54595245 55514954 47124753 4D444E45 53495447 0A47534D 54534F50 POSTMSG.GTISENDMSG.GTIQUERYTOOLW 000060
57595245 55514954 4712574F 444E4957 4C4F4F54 54455349 54471057 4F444E49 INDOW.GTISETTOOLWINDOW.GTIQUERYW 000080
49544710 52545041 5441445B 55415952 45555149 5447124C 4F4F5457 4F444E49 INDOWTOOL.GTIQUERYAUXDATAPTR.GTI 0000A0
494C4942 49534956 4C4F4F54 54455349 54471452 54504154 41445855 41544553 SETAUXDATAPTR.GTISETTOOLVISIBILI 0000C0
504C4F4F 54595245 55514954 47125355 434F464C 4F4F5454 45534954 470F5954 TY.GTISETTOOLFOCUS.GTIQUERYTOOLP 0000E0
54524154 534C4D44 0B4D5448 45524955 5143414C 4D44006C 6D640354 4E455241 ARENT.dml.DMLACQUIREHTM.DMLSTART 000100
514C4D44 134C4544 4F4D4545 52464C4D 440C4E58 54504F54 534C4D44 0A4E5854 TXN.DMLSTOPTXN.DMLFREEMODEL.DMLQ 000120
4D414E4C 45444F4D 59524555 514C4D44 11454C44 4E41484C 45444F4D 59524555 UERYMODELHANDLE.DMLQUERYMODELNAM 000140
4D440B44 4C454946 59524555 514C4D44 0D544E55 4F435952 4555514C 4D440045 E.DMLQUERYCOUNT.DMLQUERYFIELD.DM 000160
494C4545 52464C4D 440B314E 4C525952 4555514C 4D440C4E 4C525952 4555514C LQUERYRLN.DMLQUERYRLN1.DMLFREELI 000180
4D441246 464F5245 544C4946 4C4D440C 44494C4D 44595245 55514C4D 44005453 ST.DMLQUERYDMLID.DMLFILTEROFF.DM 0001A0
454B4554 41455243 4D45400D 4D454D03 4B434142 4C4C4F52 4E585450 4F54534C LSTOPTXNROLLBACK.MEM.MEMCREATEHE 0001C0
044B434F 4C42434F 4C4C414D 454D0050 41454859 4F525453 45444D45 4D0E5041 AP.MEMDESTROYHEAP.MEMALLOCBLOCK. 0001E0
```

Dump of file SATURN:[PCCOMMON.DUMP.DLL]SA-PDLED.DLL;1 on 18-APR-1990 10:51:30.28
File ID (436,15,0)   End of file block 133 / Allocated 136

Virtual block number 3 (00000003), 512 (0200) bytes

```
49545541 53095455 50525453 54554153 0A525453 54454754 5541530A 54554153 SAUT.SAUTGETSTR.SAUTSTRPUT.SAUTI 000000
4D415246 54454757 49550854 4E45494C 43544547 5749550C 57495503 54555044 DPUT.UIW.UIWGETCLIENT.UIWGETFRAM 000020
50574F44 4E495754 45475749 5510434F 5250574F 444E4957 54455357 49551045 E.UIWSETWINDOWPROC.UIWGETWINDOWP 000040
4E575455 504E4945 54414552 43574955 114C4F4F 54485445 47574955 08434F52 ROC.UIWGETHTOOL.UIWCREATEINPUTWN 000060
45534E4F 4954504F 57495514 444E574E 4F495450 4F455441 45524357 49551244 D.UIWCREATEOPTIONWND.UIWOPTIONSE 000080
534E4645 4C424953 49565445 534E4F49 54504F57 49551653 4E464C45 42414C54 TLABELFNS.UIWOPTIONSETVISIBLEFNS 0000A0
15534E46 454C4249 5349564E 4552444C 49484354 45534E4F 4954504F 5749551E .UIWOPTIONSETCHILDRENVISIBLEFNS. 0000C0
4741424C 54551054 55440353 4E464556 49544341 5445534E 4F495450 4F574955 UIWOPTIONSETACTIVEFNS.DUT.UTLBAG 0000E0
550A524F 53525543 45544152 45544947 41424C54 5513524F 53525543 54494E49 INITCURSOR.UTLBAGITERATECURSOR.U 000100
45544951 45534C54 550A454B 414D4E55 5145534C 54550C45 4B414D51 45534C54 TLSEQMAKE.UTLSEQUNMAKE.UTLSEQITE 000120
59534C44 50065452 4F535145 534C5455 0A4D4554 49444441 5145534C 5455004D M.UTLSEQADDITEM.UTLSEQSORT.PDLSY 000140
44501241 54414458 55415445 534E5953 4C445010 54494E49 4E59534C 44500A4E N.PDLSYNINIT.PDLSYNSETAUXDATA.PD 000160
50154553 4F505349 444E5953 4C445000 41544144 58554159 52455551 4E59534C LSYNQUERYAUXDATA.PDLSYNDISPOSE.P 000180
44444E49 464E5953 4C445011 534E4F49 54504F54 58455444 4E49464E 59534C44 DLSYNFINDTEXTOPTIONS.PDLSYNFINDD 0001A0
4552544E 59534C44 500E4545 5254444C 4955424E 59534C44 500F544C 55414645 EFAULT.PDLSYNBUILDTREE.PDLSYNTRE 0001C0
49544F4E 4E59534C 44500C54 58455452 4F525245 4E59534C 44500F54 58455445 ETEXT.PDLSYNERRORTEXT.PDLSYNNOTI 0001E0
```

Dump of file SATURN:[PCCOMMON.DUMP.DLL]SA-PDLED.DLL;1 on 18-APR-1990 10:51:30.28
File ID (436,15,0)   End of file block 133 / Allocated 136

Virtual block number 4 (00000004), 512 (0200) bytes

```
54534E49 4854454D 5F104753 4D444E45 53485445 4D5F0C44 4F485445 4D065946 FY.METHOD._METHSENDMSG._METHINST 000000
4854454D 5F104554 4149544E 4154534E 4945444B 54454D5F 12455441 49544E41 ANTIATE._METHDEINSTANTIATE._METH 000020
4C54550E 45455254 454B414D 4C54550B 45455254 04535341 4C434556 49524544 DERIVECLASS.TREE.UTLMAKETREE.UTL 000040
414D4C54 550F544F 4F524545 52545445 534C5455 0E544F4F 52454552 54544547 GETTREEROOT.UTLSETTREEROOT.UTLMA 000060
4C545516 45444F4E 45455254 454B414D 4E554C54 55114544 4F4E4545 5254454B KETREENODE.UTLUNMAKETREENODE.UTL 000080
4F4E4545 52545445 474C5455 164E4552 444C4948 4345444F 4E454552 54544553 SETTREENODECHILDREN.UTLGETTREENO 0000A0
14544E45 52415045 444F4E45 45525454 45534C54 55144E45 52444C49 48434544 DECHILDREN.UTLSETTREENODEPARENT. 0000C0
4E454552 54544553 4C545517 544E4552 41504544 4F4E4545 52545445 474C5455 UTLGETTREENODEPARENT.UTLSETTREEN 0000E0
534E574F 4445444F 4E454552 54544553 4C545519 474E494C 42495350 5545444F ODEUPSIBLING.UTLSETTREENODEDOWNS 000100
4D440541 54414452 45535545 444F4E45 45525454 45474C54 5516474E 494C4249 IBLING.UTLGETTREENODEUSERDATA.DM 000120
54554C4D 44135245 4C444E41 48594649 544F4E45 4B414D54 554C4D44 1654554C LUT.DMLUTMAKENOTIFYHANDLER.DMLUT 000140
12544553 52455453 49474552 54554C4D 44104554 454C4544 52455453 49474552 REGISTERDELETE.DMLUTREGISTERSET. 000160
4E594F52 54534544 54554C4D 44195946 49544F4E 53534543 4F525054 554C4D44 DMLUTPROCESSNOTIFY.DMLUTDESTROYN 000180
4554414C 45525245 54534947 45525455 4C4D441B 52454C44 4E414859 4649544F OTIFYHANDLER.DMLUTREGISTERRELATE 0001A0
55515455 4C4D4411 41544144 58554154 45535455 4C4D440F 4554414C 45524E55 UNRELATE.DMLUTSETAUXDATA.DMLUTQU 0001C0
550F574F 444E4957 5245544E 45434C54 550F4C54 55034154 41445855 41595245 ERYAUXDATA.UTL.UTLCENTERWINDOW.U 0001E0
```

Dump of file SATURN:[PCCOMMON.DUMP.DLL]SA-PDLED.DLL;1 on 18-APR-1990 10:51:30.28
File ID (436,15,0)   End of file block 133 / Allocated 136

Virtual block number 5 (00000005), 512 (0200) bytes

```
55134854 41504C4C 5546454B 414D4C54 550F4854 41504553 4E45444E 4F434C54 TLCONDENSEPATH.UTLMAKEFULLPATH.U 000000
4B534544 0E4B5345 44414441 5308544F 4F524E41 4D484341 42595245 55514C54 TLQUERYBACHMANROOT.SADADESK.DESK 000020
57534F44 0845534F 4C43534F 44084E45 504F534F 4407454C 49464F52 50544547 GETPROFILE.DOSOPEN.DOSCLOSE.DOSW 000040
53204D50 20322F53 4F1D0000 102B0315 4E030102 44414552 534F4407 45544952 RITE.DOSREAD...N..+....OS/2 PM S 000060
54494445 4C445041 53130000 726F7469 6445206D 61726761 6944204C 44502041 A PDL Diagram Editor...SAPDLEDIT 000080
FF0E76FF D88EFFFF B81E5657 000052C8 00000000 0001434F 52504C4F 4F54524F ORTOOLPROC......àR..WV.¡...Ä.v.. 0000A0
83003F05 B89A5016 B0468000 42681E06 76FF50E4 2A08468A 50E42A0A 468A0C76 v..F.*ðP.F.*ðP.v..hB..F¯.P.¡.?.. 0000C0
0029E903 7D00AE7E 83AE4689 08C48300 5801489A 0057681E 01096801 806812C4 á.h..h...hW..H.X..á..FÒ.~Û.}.Õ). 0000E0
76FF08C4 83007403 069AAE76 FF501680 46805004 C4830069 053A9A50 16804680 .F¯.P.:.i..á.P.F¯.P.vÛ...t..á..v 000100
0676FF08 76FFD88E 0008881E 56570000 04C8CBC9 5F5E1F02 C483FFFF 011E9AAE Ö......á..^_èùà...WV.¡...Ä.v..v. 000120
74025739 260041E9 03740739 2610568B 0E468BFC 5EC40000 FFFF9A50 16FC468D .F=.P.....á^x=.F..V.&9.t.ÕA.&9W.t 000140
C4078926 02478926 00008BFC 5EC40847 89260A47 89260000 8BFC5EC4 0038E903 .Õ8.á^=¡..&.G.&.G.á^=¡..&.G.&..á 000160
E90000B8 0000FFFF 9A006A02 7BB7FF26 FC5EC404 47892606 47892600 008BFC5E ^=¡..&.G.&.G.á^=&.ñ(.]......¡..Õ 000180
969A5016 FC468D06 76FF0876 FFD88E00 86B81E56 57000004 C8CBC95F 5E1F0000 ...^_èùà...WV.¡...Ä.v..v..F=.P.. 0001A0
5EC40038 E903740A 57392600 41E90374 08473926 1056880E 468BFC5E C4000000 ...á^x=.F..V.&9G.t.ÕA.&9W.t.Õ8.á^ 0001C0
260000B8 FC5EC407 89260247 89260000 8BFC5EC4 08478926 0A478926 00008BFC =¡..&.G.&.G.á^=¡..&.G.&..á^=¡..& 0001E0
```

```
Dump of file SATURN:[PCCOMMON.DUMP.DLL]SA-PDLED.DLL;1 on 18-APR-1990 10:51:30.28
File ID (436,15,0)   End of file block 133 / Allocated 136

Virtual block number 6 (00000006), 512 (0200) bytes

C95F5E1F 0000E900 00B80000 00E89A00 6A027BB7 FF26FC5E C4044789 26064789 .G.&.G.é^•&.ñ(.j..ò...|..õ...^_è 000000
EE5689EC 46890000 FFFF9A00 6A1076FF 1276FFD8 8E00FFB8 1E565700 0020C8CB ùà ..WV.j...Ã.v..v.j.......F$.ŸŸ 000020
16E2468D EC76FFEE 76FF021B E90E468B 0000FFFF 9A5016E8 468DEC76 FFEE76FF .vŸ.v$.FÒ.P......F.Õ...vŸ.v$.Fã. 000040
028FB7FF 26029187 FF26FA5E C4000002 789A5016 FA4680E2 76FF0000 02689A50 P.k....vã.F'.P.x...é^'&.ñ..&.ñ.. 000060
0018E903 74125639 0023E903 74104639 F65688F4 46880000 028F9A50 16F4468D .F¶.P......F¶.V-9F.t.Õ#.9V.t.Õ.. 000080
FF016A00 6A000FE9 01E7E9E8 5EFF180F 68006A01 5468006A 7A6A1076 FF1276FF .v..v.jzj.hT.j.h...^òÕÓ.Õ..j.j.. 0000A0
88F84688 0C468AE0 46890A46 8801CCE9 0000BA00 00B80000 02C59AE4 76FFE676 vÌ.vÕ.é...|..¤..Õä..F..FÅ.F..F½. 0000C0
FFEFE900 03E90375 00F980C9 FED801EA D10011E9 037500F9 8018810C 56880A46 F..V.Ý..'.u.Õ..ÌõÌÄ±è.'.u.Õ..Õÿ. 0000E0
FF0000FF FF9A5016 E2468DEC 76FFEE76 FFF04689 08468BF2 46890646 88FE4688 .F±.F..F·.F..Fþ.vŸ.v$.Fã.P...... 000100
A69A5016 F4468D02 8FB7FF26 029187FF 26FA5EC4 0000FFFF 9A5016FA 4680E276 vã.F'.P.....é^'&.ñ..&.ñ...F¶.P.Ì 000120
740154E0 7E810000 FFFF9A50 16E4468D 0287B7FF 26028987 FF26FA5E C4000002 ...é^'&.ñ..&.ñ...FÕ.P......~ÅT.t 000140
E90000BA 0000B800 00FFFF9A F476FFF6 76FF016A 006A00A1 E9F2468B 00C2E903 .Õò..F·ÕÀ.j.j..v-.v¶.....|..¤..Õ 000160
76FF1076 FF1276FF 001EE903 74125639 0026E903 74104639 F65688F4 4688011D ...F¶.V-9F.t.Õ&.9V.t.Õ...v..v..v 000180
E476FFE6 76FF016A 006A000F E900ECE9 E85EFF06 76FF0876 FF0A76FF 0C76FF0E ..v..v..v..v..^òÕ$.Õ..j.j..vÌ.vÕ 0001A0
9A0AEFB7 FF260AF1 B7FF26FA 5EC4016A 006A0001 E90000BA 0000B800 0003309A .0...|..¤..ÕÌ.j.j.é^'&.ñþ.&.ñÿ.. 0001C0
FF0876FF 0A76FF0C 76FF0E76 FF1076FF 1276FF00 82E90000 BA000088 00000216 ....|..¤..Õý..v..v..v..v..v..v.. 0001E0

Dump of file SATURN:[PCCOMMON.DUMP.DLL]SA-PDLED.DLL;1 on 18-APR-1990 10:51:30.28
File ID (436,15,0)   End of file block 133 / Allocated 136

Virtual block number 7 (00000007), 512 (0200) bytes

03752E03 3DFFB3E9 03752004 3DFF6FE9 0375180F 30001BE9 0097E9E8 5EFF0676 v..^ÒÕ..Õ..=..u.Õo.=. u.Õ°.=..u. 000000
12563900 08E90374 104639F6 5688F446 88003CE9 037501E0 46F6FFC7 E9FF47E9 ÕG.Õú.-FÅ.u.Õ<..F¶.V-9F.t.Õ..9V. 000020
FFFF9A06 76FF0876 FF0A76FF 0C76FF1B 6468F476 FFF676FF 003CE900 03E90374 t.Õ..Õ<..v-.v¶hd..v..v..v..v.... 000040
52E90375 007A30FD DDE90375 00223000 13E90016 E90034E9 0000BA00 00B80000 ..|..¤..Õ4.Õ..Õ..="'.u.Õì»=z.u.ÕR 000060
1F0000E9 E85EFF06 76FF0876 FF0A76FF 0C76FF0E 76FF1076 FF1276FF 0000E9FE ±Õ...v..v..v..v..v..v..v..^ÒÕ... 000080
FFFF9A50 16F6468D 1076FF12 76FFD88E 0179881E 56570000 1AC8000E CAC95F5E ^_èò..à...WV.|y..Ã.v..v..F-.P... 0000A0
26FC5EC4 000001BF 9A5016FC 468DE876 FF0000FF FF9A5016 E84680F6 76FF0000 ...v-.FÒ.P......vÒ.F•.P.¢...é^•& 0000C0
46890646 88E64689 0A468801 07E90E46 8BF05689 EE46890A ED978B26 0AE8878B ..$.&..Ú..FŸ.Vþ.F.Õ...F..FÌ.F..F 0000E0
5EC40000 04819A50 16F8468D 028FB7FF 260291B7 FF26FC5E C4F24689 08468BF4 ¶.F..F·á^•&.ñ..&.ñ...F½.P.....é^ 000100
88008EE9 03740154 E67E8100 0001D69A 5016EA46 8D0287B7 FF260289 B7FF26FC •&.ñ..&.ñ...FÕ.P.#....-ÌT.t.Õ... 000120
6A006A00 C5E90000 BA0000B8 000004B8 9AF876FF FA76FF01 6A006A00 60E9F446 F¶Õm.j.j..v'.v½.|...|..¤..Õé.j.j 000140
F1B7FF26 FC5EC401 6A006A00 ADE90000 BA0000B8 000004D7 9AEA76FF EC76FF01 ..v$.vÕ.•...|..¤..ÕÚ.j.j.é^•&.ñþ 000160
0C76FF0E 76FF1076 FF1276FF 008EE900 008A0000 B8000003 119A0AEF B7FF260A .&.ñÿ.....|..¤..Õ...v..v..v..v. 000180
E9037520 0430FFA3 E903751B 0F30001B E90073E9 EE5EFF06 76FF0876 FF0A76FF .v..v..v..^ŸÕs.Õ..=..u.ÕÈ.=. u.Õ 0001A0
FF1B6468 F876FFFA 76FF0023 E9037501 E646F6FF C7E9FF7B E903752E 0330FFB3 °.=..u.Õ(.Õú.-FÌ.u.Õ#..v'.v½hd.. 0001C0
75007A30 0008E900 29E90000 BA0000B8 000003AE 9A0676FF 0876FF0A 76FF0C76 v..v..v..v..Ù...|..¤..Õ).Õ..=z.u 0001E0

Dump of file SATURN:[PCCOMMON.DUMP.DLL]SA-PDLED.DLL;1 on 18-APR-1990 10:51:30.28
File ID (436,15,0)   End of file block 133 / Allocated 136

Virtual block number 8 (00000008), 512 (0200) bytes

E9EE5EFF 0676FF08 76FF0A76 FF0C76FF 0E76FF10 76FF1276 FF0000E9 FEF1E903 .Õþ±Õ...v..v..v..v..v..v..v..^ŸÕ 000000
97B82602 7F878826 085EC408 8E03FEB8 1E565700 0016C800 0ECAC95F 5E1F0000 ...^_èò..à...WV.|±..Ãé^.&....&.. 000020
8826085E C4FE5689 FC468902 85978826 02838788 26085EC4 EC5689EA 46890281 ...FÕ.V$é^.&....&.....F•.V±é^.&. 000040
26028087 89260000 B8085EC4 04C483FF FF04799A 0876FF0A 76FFF646 89027D87 .)..F-.v..v..y....é.é^.|..&....& 000060
0846882C 4A681EFC 76FFFE76 FF0676FF 00002C4C 06C71009 2C4A06C7 02888789 ....ú.J,..ú.L,...v..v±.v•.hJ,.F. 000080
FFFE76FF 0676FF00 002C4C06 C710492C 4A06C700 00FFFF9A 5052028F 050A5688 .V....RP.....ú.J,Ì.ú.L,...v..v±. 0000A0
08260287 87882608 5EC40000 FFFF9A50 52028705 0A568808 46882C4A 681EFC76 v•.hJ,.F..V....RP.....é^.&....&. 0000C0
9A006A00 6AFFFF68 06626802 87B7FF26 02898 7FF 26085EC4 015EE903 75028987 ...u.Õ^.é^.&.ñ..&.ñ..hb.h..j.j.. 0000E0
FFFF9AFF FF680680 68FFFF68 06686802 87B7FF26 028987FF 26085EC4 0000FFFF ....é^.&.ñ..&.ñ..hh.h..h..h..... 000100
0000FFFF 9AFFFF68 069E68FF FF680686 680287B7 FF260289 B7FF2608 5EC40000 ..é^.&.ñ..&.ñ..h..h..h..h....... 000120
5EC40000 FFFF9AFF FF68076C 68FFFF68 06A46802 87B7FF26 028987FF 26085EC4 é^.&.ñ..&.ñ..hÈ.h..hl.h.......é^ 000140
B7FF2602 9187FF26 085EC400 0006D89A 5016F246 8D0287B7 FF260289 B7FF2608 .&.ñ..&.ñ...F·.P.Ã...é^.&.ñ..&.ñ 000160
EE468900 00072F9A 072C6807 2968F876 FFFA76FF 0000071E 9A5016F8 4680028F ...F½.P......v'.v½h).h,../....FŸ 000180
FF26085E C4000007 4D9AEE76 FFF076FF 028FB7FF 260291B7 FF26085E C4F05689 .Vþé^.&.ñ..&.ñ...vþ.vŸ.M...é^.&. 0001A0
FF9AFFFF 68FFFF68 F876FFFA 76FF0000 046A9A50 16F8468D 0287B7FF 26028987 ñ..&.ñ...F½.P.j....v'.v½h..h.... 0001C0
00FFFF9A EE76FFF0 76FF0287 B7FF2602 89B7FF26 085EC4F0 5689EE46 890000FF ....FŸ.Vþé^.&.ñ..&.ñ...vþ.vŸ.... 0001E0
```

Dump of file SATURN:[PCCOMMON.DUMP.DLL]SA-PDLED.DLL;1 on 18-APR-1990 10:51:30.28
File ID (436,15,0)   End of file block 133 / Allocated 136

Virtual block number 9 (00000009), 512 (0200) bytes

C48305BF 05D89A02 93B7FF26 0295B7FF 26085EC4 50520AF5 050A568B 08468B00 ..F..V..%.RPá^.&.ñ..&.ñ...Ä.¢..á 000000
0000FFFF 9A006A00 6A0293B7 FF260295 B7FF2608 5EC41B5C 68F276FF F476FF08 ..v¶.v·h\.á^.&.ñ..&.ñ..j.j...... 000020
005FB8D8 8E058188 1E565700 0028C8CB C95F5E1F 0000E900 01B80006 E9000088 ¡..Ö..¡..Ö...^_èùà(..WV.¡...Ä¡_. 000040
5016EE46 8D026A00 00E646C7 503BE446 C7E04689 E2468900 008BF65E 8CF44689 .F¶.^-¡...Fã.FÃúFõ;PúF|..j..FŸ.P 000060
8789260A 468BFC5E C40000FF FF9A5016 FC468D10 F268686A EE76FF00 00FFFF9A ......vŸjhh·..F=.P.....á^=.F.&.. 000080
027D8789 26EE468B FC5EC400 00041B9A 50520016 05FE568B FC468B0A 76FF027B (..v..F=.V±...RP.....á^=.FŸ&..). 0000A0
87C626FC 5EC4FFFF 029787C7 26FC5EC4 02878789 26028987 89260000 8BFC5EC4 á^=¡..&....&....á^=&ú.....á^=&6. 0000C0
00000AE5 87C726FC 5EC40000 0AE387C7 26FC5EC4 0006E387 C626FC5E C40002E3 D..á^=&6.D..á^=&ú.D...á^=&ú.|... 0000E0
83099504 0A9A5052 001805FE 568BFC46 8BFC77FF 26FE77FF 26065EC4 04064683 .F..á^.&.w±&.w=.F=.V±...RP.Ö.... 000100
C4040646 83025789 26078926 FC5EC4FE 578B26FC 478B2606 5EC40406 468308C4 á..F..á^.&.G=&.W±á^=&..&.W..F..á 000120
76880019 E9037200 BDF07E81 F046FF00 03E90000 F046C700 00029987 C726FC5E ^=&ú.....úFÞ..Ö...FÞ.~Þ§.r.Ö...v 000140
F676FFE0 76FFE276 FFFFDAE9 0AF58089 260AF780 89260000 8BFC5EC4 02E6C1F0 Þê|.á^=¡..&..¥.&..¥.ÖÖ..vã.vÅ.v- 000160
05FE568B FC468B0A 76FF016A 0000FFFF 9A006A04 6A006AFF FF6806E3 68F476FF .v¶hD.h..j.j.j......j..v..F=.V±. 000180
8B0006E9 03750000 300E4689 0000FFFF 9A505200 0E05FE56 8BFC468B 50520018 ..RP.F=.V±...RP......FB=..u.Ö... 0001A0
00FFFF9A E876FFEA 76FFEA56 89E84689 10578B26 0E478B26 FC5EC403 D8E90E46 FBÕÄ.á^=&.G.&.W..FÒ.Võ.võ.vÒ.... 0001C0
6A37FF26 0277FF26 FC5EC427 1C68E876 FFEA76FF 5052007B 05FE568B FC468B00 ..F=.V±.(.RP.võ.vÒh.'á^=&.w.&.7j 0001E0

Dump of file SATURN:[PCCOMMON.DUMP.DLL]SA-PDLED.DLL;1 on 18-APR-1990 10:51:30.28
File ID (436,15,0)   End of file block 133 / Allocated 136

Virtual block number 10 (0000000A), 512 (0200) bytes

FC468B00 7B47C626 FC5EC400 08E90375 000E7E83 DE468910 C4830000 FFFF9A00 .......á..FB.~B.u.Ö..á^=&6G(..F= 000000
017805FE 568BFC46 88006A68 1E505200 1805FE56 8BFC468B 5052007B 05FE568B .V±.(.RP.F=.V±...RP.hj..F=.V±.(. 000020
468BF476 FFF676FF 5016E446 80080068 006A016A 006A10C4 83002D05 B89A5052 RP.¡.-..á.j.j.j.h...FÖ.P.v-.v¶.F 000040
FF9A5016 F8468D02 9A680200 36FF262A CE068E00 6A006A50 52017805 FE568BFC =.V±.(.RPj.j...ö*&.6..h...F½.P.. 000060
8BFC5EC4 02819789 26027F87 89260C56 8BDA468B FC5EC4DC 56890A46 890000FF ....FÖ.VEá^=.FÖ.VE&....&....á^=. 000080
0A76FF00 00FFFF9A DA76FFDC 76FF0A76 FF028597 89260283 878926FA 568BF846 F½.V*&....&.....v..vÉ.vÖ......v. 0000A0
0E478B26 FC5EC400 00FFFF9A FC76FFFE 76FF0A76 FF00000A 259AFC76 FFFE76FF .v±.v=.X,...v..v±.v=.....á^=&.G. 0000C0
77FF26FC 5EC45016 F2468DE8 76FFEA76 FF145789 26124789 26FC5EC4 10578B26 &.W.á^=&.G.&.W..võ.vÒ.F·.Pá^=&.w 0000E0
027DE9DE 468B0006 E9037500 DE7E83DE 46890EC4 830000FF FF9A006A 37FF2602 .&.7j.......á..FB.~B.u.Ö...FBÕ). 000100
FC5EC427 1E68E876 FFEA76FF 50520004 05FE568B FC468B00 28E90374 57F27E83 .~·Wt.Ö+..F=.V±...RP.võ.vÒh.'á^= 000120
89260647 89260000 8BFC5EC4 000EE910 C4830000 0AD39A00 6A37FF26 0277FF26 &.w.&.7j..Æ....á.Ö..á^=¡..&.G.&. 000140
37FF2602 77FF26FC 5EC44400 68E876FF EA76FF50 52000805 FE568BFC 46880447 G..F=.V±...RP.võ.vÒh.Dá^=&.w.&.7 000160
F27E810A E7878926 0AE98789 260000B8 FC5EC4DE 468910C4 83000009 529A006A j..R....á..FBá^=¡..&..Õ.&..Ó..-· 000180
76681EE8 76FFEA76 FF0086E9 03740A47 0B260847 8B26FC5E C40096E9 03740080 ..t.Õ..á^=&.G.&.G.t.Õ...võ.vÒ.hv 0001A0
260277FF 26FC5EC4 01C5E90E 46880006 E9037500 DE7E83DE 46890000 FFFF9A00 .......FB.-B.u.Ö...FBÕé.á^=&.w.& 0001C0
6A008168 50520008 05FE568B FC46880E 77FF2610 77FF26FC 5EC4006A 006A37FF .7j.j.á^=&.w.&.w..F=.V±...RPh..j 0001E0

Dump of file SATURN:[PCCOMMON.DUMP.DLL]SA-PDLED.DLL;1 on 18-APR-1990 10:51:30.28
File ID (436,15,0)   End of file block 133 / Allocated 136

Virtual block number 11 (0000000B), 512 (0200) bytes

0000FFFF 9AE876FF EA76FF00 0EE90375 000E7E83 DE468914 C4830000 FFFF9A00 .......á..FB.~B.u.Ö...võ.vÒ..... 000000
FC5EC401 60E90E46 880006E9 0375000E 7E830000 FFFF9AE8 76FFEA76 FF0008E9 Õ...võ.vÒ......-B.u.Ö...FBÕ'.á^= 000020
FF26FC5E C4027D87 FF26FC5E C4014AE9 84968800 06E90374 0A470B26 08478826 &.G.&.G.t.Ö..¡..ÖJ.á^=&.ñ).á^=&. 000040
E9037500 DE7E830E 46890000 FFFF9A50 520DE905 FE568BFC 46880E77 FF261077 w.&.w..F=.V±.Ö.RP......FB.~B.u.Ö 000060
0000FFFF 9AFC76FF FE76FF00 E987FF26 00E887FF 26FC5EC4 0115E90E 46880006 ...FBÕ..á^=&.ñS.&.ñÖ..v±.v=..... 000080
FC5EC404 77FF2606 77FF26FC 5EC400EB E90E468B 0006E903 75000E7E 830E4689 .FB.~B.u.Ö...FBÕS.á^=&.w.&.w.á^= 0000A0
46880006 E9037500 DE7E830E 468908C4 83064612 339A00E9 87FF2600 E887FF26 &.ñS.&.ñÖ..3.F..á..FB.~B.u.Ö...F 0000C0
46890000 0CA49A50 16EC4680 37FF2602 77FF26FC 5EC4E876 FFEA76FF 0089E90E BÕ¿..võ.vÒá^=&.w.&.7.F§.P.Ê....F 0000E0
EC76FF00 E987FF26 00E887FF 26FC5EC4 008DE90E 46880006 E9037500 DE7E830E B.~B.u.Ö...FBÕ..á^=&.ñS.&.ñÖ..v§ 000100
EA76FF00 60E90E46 880006E9 0375000E 7E830E46 8900000C D19AFFFF 680CCB68 hù.h...1....FB.~B.u.Ö...FBÕ'..võ 000120
75000E7E 830E4689 0000FFFF 9A5016D8 46800877 FF260A77 FF26FC5E C4E876FF .vÒá^=&.w.&.w..FÄ.P......FB.~B.u 000140
FFFF6808 D4680876 FF00E987 FF2600E8 87FF26FC 5EC40033 E90E468B 0006E903 .Ö...FBÕ3.á^=&.ñS.&.ñÖ..v/½á.h.. 000160
5F5E1F00 00E90000 880006E9 DE468800 06E90375 000E7E83 DE468900 00FFFF9A ......FB.~B.u.Ö...FBÕ..¡..  ...^_ 000180
0000FFFF 9A5016F0 46800676 FF0876FF D88E07A9 881E5657 000014C8 0006CAC9 èò..à...WV.¡`..Ä.v..v..FÞ.P   ..¯ 0001A0
9F878926 FE568BFC 46880A5E C4029D97 89260298 878926FA 568BF846 880A5EC4 á^..F½.V*&....&....á^..F=.V±&... 0001C0
26028587 89260000 880A5EC4 00E7E903 74000299 8F83260A 5EC402A1 97892602 .&..À.á^.&.¢...t.ÕÕ.á^.¡..&..ç.& 0001E0

```
Dump of file SATURN:[PCCOMMON.DUMP.DLL]SA-PDLED.DLL;1 on 18-APR-1990 10:51:30.28
File ID (436,15,0)   End of file block 133 / Allocated 136

Virtual block number 12 (0000000C), 512 (0200) bytes

 90978826 02988788 260A5EC4 02878789 26028987 89260000 880A5EC4 02838789 ..".6^.j..&..¿.&..ñ.6^.&....&... 000000
 9F8D0A5E C4028097 892602B8 8789260A 5EC402B5 97132602 83870326 0A5EC402 .6^.&..".&..ç.6^.&..£.&..§.6^... 000020
 97132602 87870326 0A5EC40E 7309399A 0DA30AE4 9A2AD01E 80086007 569A029F ...V.m...Å*.ð.È..9.s.6^.&..ñ.&.. 000040
 5AE90375 02918708 26028F87 88260A5E C402C197 892602BF 8789260A 5EC40289 ¿.6^.&..¢.&..è.6^.&....&....u.ÕZ 000060
 006AEC76 FFEE76FF 0000FFFF 9A5016EC 468D028F B7FF2602 9187FF26 0A5EC400 .6^.&.ñ..&.ñ...F$.P......vŸ.všj. 000080
 8728260A 5EC402B8 8788260A 5EC40287 B7FF260A 5EC402B3 87FF260A 5EC4006A j.6^.&.ñ*.6^.&.ññ.6^.&..£.6^.&+. 0000A0
 83260A5E C40000FF FF9A036A 50028787 28260A5E C402BF87 88260A5E C45002B3 *.P6^.&..¢.6^.&+.ñ.Pj......6^.&. 0000C0
 BF878826 0A5EC402 D3878926 02D58789 26000088 0A5EC400 EAE90374 000299BF ¢...t.Õõ.6^.j..&..í.&..£.6^.&..¢ 0000E0
 0298F8D 0A5EC402 D9978926 02D78789 260A5EC4 000A8300 012D02C1 97882602 .&..è.-...Ö.6^.&..■.&..\.6^..... 000100
 02D59713 26020387 03260A5E C4009E09 399A0E81 0AE49A2A D81E8D00 9507569A .V.....Ä*.ð....9...6^.&..£.&..í. 000120
 8789260A 5EC402A1 97882602 9F878826 0A5EC402 DD978926 02D88789 260A5EC4 6^.&..Ü.&..í.6^.&....&..À.6^.&.. 000140
 8987FF26 0A5EC400 5AE90375 02898708 26028787 88260A5E C402E197 8926020F Ô.&..Ã.6^.&....&....u.ÕZ.6^.&.ñ. 000160
 87FF260A 5EC4006A 006AEC76 FFEE76FF 00000DE4 9A5016EC 468D0287 B7FF2602 .&.ñ...F$.P.ð....vŸ.všj.j.6^.&.ñ 000180
 88260A5E C45002D3 8728260A 5EC402DB 8788260A 5EC402D7 B7FF260A 5EC402D3 £.6^.&.ñ■.6^.&..Ü.6^.&+.£.P6^.&. 0001A0
 DDE90374 000299BF 83260A5E C4000010 0A9A036A 5002D787 28260A5E C4020F87 .Ö.6^.&+.■.Pj......6^.&.¢...t.Õï 0001C0
 A5978926 02A38789 260A5EC4 00028300 01050200 97882602 D8878826 0A5EC400 .6^.&..Ü.&..ï.....■.6^.&..È.&..Ë 0001E0

Dump of file SATURN:[PCCOMMON.DUMP.DLL]SA-PDLED.DLL;1 on 18-APR-1990 10:51:30.28
File ID (436,15,0)   End of file block 133 / Allocated 136

Virtual block number 13 (0000000D), 512 (0200) bytes

 A9978926 02A78789 260A5EC4 000A8300 012D02C1 97882602 BF878826 0A5EC402 .6^.&..¢.&..è.-...Ö.6^.&..Ï.&..` 000000
 88260A5E C402AD97 892602A8 8789260A 5EC40290 97882602 98878826 0A5EC402 .6^.&....&....6^.&..¨.&..Ù.6^.&. 000020
 83260A5E C4028197 892602AF 8789260A 5EC40002 83000105 02A19788 26029F87 ...&..À.....■.6^.&..£.&..Ý.6^.&. 000040
 76FFEE76 FF0000FF FF9A5016 EC468D02 97B7FF26 0A5EC400 55E90375 FF0297BF ¢...u.ÕU.6^.&.ñ...F$.P......vŸ.v 000060
 0A5EC402 AB878826 0A5EC402 A7B7FF26 0A5EC402 A3B7FF26 0A5EC400 6A006AEC &j.j.6^.&.ñÈ.6^.&.ñÏ.6^.&..¨.6^. 000080
 5EC40000 0E279A03 6A5002A7 8728260A 5EC402AF 8788260A 5EC45002 A3872826 &+.È.P6^.&..£.6^.&+.Ï.Pj..'...6^ 0000A0
 57000022 C8CBC95F 5E1F0001 029987C7 260A5EC4 000AE903 74000299 8F83260A .&.¢....t.Õ..6^.&ú......^_èùà"..W 0000C0
 000010A8 9A5016DE 468D1076 FF1276FF 0229E901 E9E90E46 8BD88E0C FC881E56 V.¡=..Ä.F.ÕÕ.Õ)..v..v..Fñ.P.¨... 0000E0
 EC468D00 6A006A10 76FF1276 FF0223E9 00008A00 00880000 01629A00 6ADE76FF .v8j..b...|..¤..Õ#..v..v.j.j..F& 000100
 00FFFF9A EC6AFF6A 5016EC46 8DE476FF E676FFE6 5689E446 890000FF FF9A5016 .P......Fõ.V|.v|.võ.F&.Pj.j&.... 000120
 FF000011 3A9A5016 DE468D10 76FF1276 FF01CAE9 0000FFFF 9AE476FF E676FF00 ..v|.võ.....Õò..v..v..Fñ.P.:.... 000140
 26028987 FF26FC5E C40064E9 03750C46 080A468B 00001147 9A5016FC 468DDE76 v8.F=.P.G....F..F.u.Õd.6^=&.ñ..& 000160
 FF26FC5E C4000011 089A016A E076FFE2 76FF0000 10FE9A50 16E0468D 0287B7FF .ñ...FÁ.P.±....vã.vÀj......6^=&. 000180
 C40000FF FF9A016A E076FFE2 76FF0000 0EDC9A50 16E0468D 028F87FF 260291B7 ñ..&.ñ...FÁ.P.É....vã.vÀj......6 0001A0
 76FF0138 E90000FF FF9A0297 B7FF26FC 5EC40000 FFFF9A01 6A0297B7 FF26FC5E ^=&.ñ..j......6^=&.ñ.......Õ;..v 0001C0
 FF26FC5E C4000011 829A5016 FC468D0E 76FF0000 11759A50 16DE468D 1076FF12 ..v..FB.P.u....vB.F=.P.....6^=&. 0001E0

Dump of file SATURN:[PCCOMMON.DUMP.DLL]SA-PDLED.DLL;1 on 18-APR-1990 10:51:30.28
File ID (436,15,0)   End of file block 133 / Allocated 136

Virtual block number 14 (0000000E), 512 (0200) bytes

 8D1076FF 1276FF01 00E90000 FFFF9A0A 76FF0C76 FF505299 DE46881D AE681677 w.hÒ..FB.RP.v..v......Õ....  v.. 000000
 89E84689 0C56880A 46880000 04289A50 16FC468D DE76FF00 00040E9A 50160E46 FB.P......vB.F=.P.(....F..V..FÒ. 000020
 88FC468B 027F87FF 26028187 FF26FC5E C40020E9 03750400 07F726E8 5EC4EA56 Võà^Õ&%...u.Õ .6^=&.ñ..&.ñ...F=. 000040
 26FC5EC4 001DE903 75100007 F726E85E C4002AE9 000011E5 9A505200 7B05FE56 V±.(.RP.Ï...Õ*.6^Õ&%...u.Õ..6^=& 000060
 FF1276FF 007DE900 00FFFF9A 5052017B 05FE568B FC468802 7FB7FF26 0281B7FF .ñ..&.ñ...F=.V±.(.RP.....Õ)..v.. 000080
 FFFC76FF FE76FF00 0010889A 5016FC46 800E76FF 0000104C 9A50160E 468D1076 v..FB.P.L....vB.F=.P.|....v±.v=. 0000A0
 0376FFBE E9037500 073D0043 E90046E9 0049E908 C4830C71 0CF49A10 76FF1276 v..v..¶.g..6.ÕI.ÕF.ÕC.=..u.Õf.v. 0000C0
 233DFEE0 E9037500 003DFFDA E9FE5CE9 03750005 3DFE02E9 03750001 300013E9 Õ..=..u.Õ.±=..u.Õ\±ÕÕ.=..u.ÕÀ±=# 0000E0
 FF1076FF 1276FFFF B7E9FF03 E9037500 463DFDE2 E9037500 293DFE00 E9037500 .u.Õ.±=).u.Õã»=F.u.Õ..Õñ..v..v.. 000100
 0004C800 0ECAC95F 5E1F0000 E90000FF FF9A0676 FF0876FF 0A76FF0C 76FF0E76 v..v..v..v..v......Õ...^_èò..à.. 000120
 1D816816 77FF26FC 5EC40000 12059A50 16FC468D 0676FFD8 8E1033B8 1E565700 .WV.¡3..Ã.v..F=.P.....6^=&.w.hŸ. 000140
 D88E1295 881E5657 000002C8 CBC95F5E 1F000011 629A006A 006A0876 FF0A76FF .v..v.j.j..b....^_èùà...WV.|...Ä 000160
 5EC40040 E90440B8 06C48312 1812809A 0676FF00 97681E00 15E90374 000C7E83 .-..t.Õ...h...v.......6.¡ãÀÕã.6^ 000180
 050A568B 08468850 5202E305 0A568808 46880C76 FF0AE787 FF260AE9 87FF2608 .&.ñÕ.&.ñÕ..v..F..V..D.RP.F..V.. 0001A0
 5E1F0000 E9FE468B FE468900 00FFFF9A 0E76FF10 76FFFFFF 680C1D68 50520AE3 D.RPh..h...v..v........F±.F±Õ...^ 0001C0
 0876FF00 6A1076FF 1276FF01 8AE90E46 88D88E12 CCB81E56 5700002C C8C8C95F _èùà,..WV.¡ä..Ä.F.Õ...v..v.j..v. 0001E0
```

```
Dump of file SATURN:[PCCOMMON.DUMP.DLL]SA-PDLED.DLL;1 on 18-APR-1990 10:51:30.28
File ID (436,15,0)   End of file block 133 / Allocated 136

Virtual block number 15 (0000000F), 512 (0200) bytes

 16E4468D 1076FF12 76FF0000 13729A50 16D4468D 016A006A 0000FFFF 9A0676FF .v......j.j..Få.P.r....v..v..FÕ. 000000
 E8D1FA46 2BDC468B F64689E8 462BF046 8BFA4689 E4462BEC 46880000 000C9A50 P......F§+FÕ.F¹.FÞ+FÕ.F-.FÉ+F¹ìÒ 000020
 006AF476 FFF876FF 036A006A 1076FF12 76FFF446 89E8D1F6 462BE046 8BF84689 .F½.FÀ+F-ìÒ.F¶.v..v.j.j..v½.v¶j. 000040
 00BA0000 B800AEE9 0A468B01 25E90131 E900008A 0000B800 000F1F9A 026A006A j.j......¡..¤..Õ1.Õ%..F.ÕÜ.¡..¤. 000060
 46890000 14109A00 6A1076FF 1276FF00 0014109A 006A1076 FF1276FF 011FE900 .Õ...v..v.j.......v..v.j.......F 000080
 9A006A10 76FF1276 FF00ECE9 0000BA00 00B80000 0AF387C7 26FC5EC4 FE5689FC ¤.V±á^¤&ú.µ...¡..¤..Õš..v..v.j.. 0000A0
 010AF387 C726FC5E C4FE5689 FC468900 0001869A 006A1076 FF1276FF 0000FFFF .....v..v.j.......F¤.V±á^¤&ú.µ.. 0000C0
 FF1276FF 00001463 9A505200 3905FE56 8BFC468B 216A0106 681076FF 1276FF00 ..v..v.h..j!.F¤.V±.9.RP.c....v.. 0000E0
 0083E900 008A0000 B80000FF FF9A5052 005A05FE 568BFC46 8B216A01 04681076 v.h..j!.F¤.V±.Z.RP.....¡..¤..Õ.. 000100
 E2E9FF79 E9037500 013D000B E90376FF 53E90375 00023D00 33E90036 E90039E9 Õ9.Õ6.Õ3.=..u.ÕS.v.Õ..=..u.Õy.Õâ 000120
 FF003BE9 FFC7E9FF 22E90377 01073DFF D2E90373 01063DFF 32E90375 01043DFF .=..u.Õ2.=..s.ÕØ.=..w.Õ".Õú.Õ;.. 000140
 3D001BE9 0027E900 00FFFF9A 0676FF08 76FF0A76 FF0C76FF 0E76FF10 76FF1276 v..v..v..v..v..v..v......Õ'.Õ..= 000160
 0000BA00 00B8FFC5 E9FE5EE9 0375003B 3DFEE3E9 03750022 3DFEEEE9 03750020  .u.ÕŸ±=".u.ÕÐ±=;.u.Õ^±Õé.¡..¤.. 000180
 0006E903 750000BC 3E83D88E 133BB81E 56570000 00C8000E CAC95F5E 1F0000E9 Õ...^_èÒ..à...WV.¡;..Ä.>¥..u.Õ.. 0001A0
 00FFFF9A 0E76FF10 76FF0A76 FF0C76FF 0876FF06 76FF00BC 06FF001E E90000B8 ¡..Õ....¥..v..v..v..v..v.. ..... 0001C0
 6CC8CBC9 5F5E1F00 BC0EFFD8 8E1502B8 1E565700 0000C8CB C95F5E1F 0000E900 .Õ...^_èùà...WV.¡...Ä..¥..·_:ùàl 0001E0

Dump of file SATURN:[PCCOMMON.DUMP.DLL]SA-PDLED.DLL;1 on 18-APR-1990 10:51:30.28
File ID (436,15,0)   End of file block 133 / Allocated 136

Virtual block number 16 (00000010), 512 (0200) bytes

 0000B811 2DE90E46 8B000017 259A5016 F0468D10 76FFD88E 1541B81E 56570002 ..WV.¡A..Ä.v..FÞ.P.%....F.Õ-.¡.. 000000
 15DB9A06 76FF0876 FF0A76FF 0C76FF1D B0680297 B7FF26F0 5EC41230 E900008A ¤..ÕO.á^Þ&.ñ..h¯..v..v..v..v..Ü. 000020
 03740297 8739260A 4688F05E C41203E9 0000BA00 00B80001 07C7260A 5EC40000 ..á^.&ú...¡..¤..Õ..á^Þ.F.&9...t. 000040
 1DAE6816 77FF26F0 5EC40000 0AE587C7 26F05EC4 000AE903 7500067E 830013E9 Õ...~..u.Õ..á^Þ&ú.Î...á^Þ&.w.hÛ. 000060
 86890C56 8B0A468B 118EE900 008A0000 B8000017 159A006A 006A5052 99104688 .F..RPj.j......¡..¤..Õƒ..F..V... 000080
 5EC40048 E9078B26 FD049EC4 FD029689 FD008689 08568B06 468BFDD6 9689FDD4 å»..ø».F..V...Å»..Ø»á.å»&..ÕH.á^ 0000A0
 89260247 89260000 8BFDD09E C4025789 26078926 FD049EC4 02578B26 078B26F0 Þ&..&.W.á.å»&..&.W.á.Å»¡..&.G.&. 0000C0
 07892602 47892600 00B8FD00 9EC40789 26024789 26000088 FD049EC4 002DE907 .Õ-.á.å»¡..&.G.&..á.Å»¡..&.G.&.. 0000E0
 03750006 7E83113C E90000BA 000088FF D3E9FFB0 E9037500 6830000B E9000EE9 Õ..Õ..=h.u.Õ¯.Õ£.¡..¤..Õ<..~..u. 000100
 26F05EC4 4400680E 77FF2610 77FF26F0 5EC45016 E6468D02 E6E90A46 8B02FFE9 Õ...F.Õl..Fl.Pá^Þ&.w.&.w.h.Dá^Þ& 000120
 468B0068 E9037400 FD9EBE83 FD9E8689 10C48300 000A9A9A 006A37FF 260277FF .w.&.7j.......á....».ƒ.».t.Õk..F 000140
 A0868D0E 77FF2610 77FF26F0 5EC4E676 FFE876FF 1076FF00 60E90375 E84608E6 Ì.FÒu.Õ'..v..vÒ.vlá^Þ&.w.&.w.... 000160
 A2B6FF00 15E90374 00FD9EBE 83FD9E86 8912C483 00000B52 9A006A7E 6A5016FD ».Pj-j..R....á....».ƒ.».t.Õ...ÑÄ 000180
 00BE681E 1DB16816 77FF26F0 5EC40017 E906C483 0000FFFF 9A006AFD A0B6FFFD ».Ñ.»j.......á.Õ..á^Þ&.w.hŸ..hƒ. 0001A0
 FFF076FF F276FF00 0012A29A 5016F046 8D1076FF 0256E900 001789A 006A006A j.j..(...ÕV..v..FÞ.P.Å....v·.vÞ. 0001C0
 2ACE068E 006A006A 003FE903 7500FD9E 8E83FD9E 868906C4 83FFFF10 E39A1076 v..D....á....».ƒ.».u.Õ7.j.j...ö* 0001E0

Dump of file SATURN:[PCCOMMON.DUMP.DLL]SA-PDLED.DLL;1 on 18-APR-1990 10:51:30.28
File ID (436,15,0)   End of file block 133 / Allocated 136

Virtual block number 17 (00000011), 512 (0200) bytes

 1DB16816 77FF26F0 5EC40000 FFFF9A50 16FEE686 8D00FF68 04526802 0036FF26 &.6..hR.h....l±.P.....á^Þ&.w.hŸ. 000000
 6A016A00 6A016A00 6A101FE9 99FD9E86 8B000012 8B9A006A 006A5016 FEE6868D ..l±.Pj.j..£......».Õ..j.j.j.j.j 000020
 68045468 020036FF 262ACE06 8E006A00 6A0000FF FF9A5052 0000FFFF 9A006A03 .j......RP.....j.j...ö*&.6..hT.h 000040
 6A006A50 16FEE686 8D1DB168 1677FF26 F05EC400 00181C9A 5016FEE6 868D00FF ....l±.P.....á^Þ&.w.hŸ...l±.Pj.j 000060
 DA868908 C48318C4 00EA9A50 520EEE05 F2568BF0 468B0002 681E0000 19159A00 .......hØ..FÞ.V·.Ÿ.RP.Õ.á..á...Õ 000080
 68020036 FF262ACE 068E006A 006A0042 E90374FD DC8608FD DA868BFD DC9689FD »..É»..Ö»..É»t.ÕB.j.j...ö*&.6..h 0000A0
 006A5016 FEE6868D 016A006A 016A006A 000018E3 9A5016FE E6868D00 FF68044E N.h....l±.P.D...j.j.j.j...l±.Pj. 0000C0
 1077FF26 F05EC450 16E6468D 0F62E900 00BA0001 B80000FF FF9A206A 006A006A j.j.j .....¡..¤..Õb..Fl.Pá^Þ&.w. 0000E0
 83FD9E86 8910C483 000018AE 9A006A37 FF260277 FF26F05E C4440068 0E77FF26 &.w.h.Dá^Þ&.w.&.7j..O....á....». 000100
 0068006A FDDAB6FF FDDCB6FF 0035E903 75E8460B E6468B00 40E90374 00FD9EBE ƒ.».t.Õa..Fl.FÒu.Õ5..ÑÉ».ÑÖ»j.h. 000120
 16999A00 6AE676FF E876FF27 E6680E77 FF261077 FF26F05E C45016FE E6868001 ...l±.Pá^Þ&.w.&.w.hl'.vÒ.vlj.... 000140
 CE068E00 6A006A04 C48318FB 00109AFD DAB6FFFD DCB6FFFD 9E868918 C4830000 ...á....».ÑÉ».ÑÖ»...«..á.j.j...ö 000160
 0EEE05F2 568BF046 8B000017 629A5016 FEE6868D 00FF6804 50680200 36FF262A *&.6..hP.h....l±.P.b....FÞ.V·.Ÿ. 000180
 5016FEE6 868D1DB1 681677FF 26F05EC4 08C4830E 7C04949A 5016FEE6 868D5052 RP..l±.P...|..á.á^Þ&.w.hŸ...l±.P 0001A0
 0017989A 50520000 17949A00 6A016A01 6A006A01 6A006A00 00194F9A 006A006A j.j..O...j.j.j.j.j.j......RP.... 0001C0
 8E9A006A 006A0A76 FF0C76FF 0E76FF02 97B7FF26 F05EC40E 60E999FD 9E868800 ....».Õm.á^Þ&.ñ...v..v..v.j.j... 0001E0
```

```
Dump of file SATURN:[PCCOMMON.DUMP.DLL]SA-PDLED.DLL;1 on 18-APR-1990 10:51:30.28
File ID (436,15,0)   End of file block 133 / Allocated 136

Virtual block number 18 (00000012), 512 (0200) bytes

 E9FD0AE9 03750222 3DFDB5E9 03750221 300013E9 0E4AE900 00BA0000 B8000015 ...¡..¤..ÕJ.Õ..«I.u.Õç»=".u.Õ.»Õ 000000
 C4028197 8826027F 878826F0 5EC40789 26024789 260000B8 0A5EC40E 28E9FFC7 Ú.Õ(.á^.¡..&.G.&..á^Þ&....&....á 000020
 F05EC40D F0E90789 260A5EC4 027D878B 26F05EC4 0E01E902 57892607 8926065E ^.&..&.W.Õ..á^Þ&..).á^.&. `Þ.á^Þ 000040
 00D6E900 00BA0000 B8000002 9787C726 F05EC400 0AE90374 02978739 260A468B .F.&9...t.Õ..á^Þ&ú.....¡..  Õ«. 000060
 E9870826 0AE7878B 26F05EC4 0012E903 75F2460B F0468800 CDE90000 BA0000B8 ¡..¤..Õë..FÞ.F·u.Õ..á^Þ&..Õ.&..Õ 000080
 FF0C76FF 0AE7B7FF 260AE9B7 FF26F05E C400A7E9 0000BA00 00B80009 E903740A .t.Õ..¡..¤..ÕI.á^Þ&.ñÕ.&.ñÕ..v.. 0000A0
 0876FF0A 76FF0C76 FF0DE9B7 FF2600EB B7FF26F0 5EC40000 FFFF9A06 76FF0A76 v..v......á^Þ&.ñS.&.ñÕ..v..v..v. 0000C0
 569A006A 029787FF 26F05EC4 0059E90D 65E90000 BA0000B8 0000FFFF 9A0676FF .v......¡..¤..Õe.ÕY.á^Þ&.ñ..j..V 0000E0
 B7FF260D EBB7FF26 F05EC400 00FFFF9A 0AE7B7FF 260AE9B7 FF26F05E C4000010 ...á^Þ&.ñÕ.&.ñÕ......á^Þ&.ñS.&.ñ 000100
 9A027DB7 FF26F05E C40000FF FF9A0E77 FF261077 FF26F05E C40000FF FF9A0DE9 Õ......á^Þ&.w.&.w......á^Þ&.ñ).. 000120
 83FD9E86 8912E307 A19A0A76 FF0C76FF 1076FF00 09E90000 BA0000B8 0000FFFF ....¡..¤..Õ...v..v..v..À.D....». 000140
 46880000 15639A50 16F04680 1076FF0C E5E999FD 9E868800 08E90375 00FD9EBE ƒ.».u.Õ.....».ÕI..v..FÞ.P.c....F 000160
 FF9A1076 FF5A6A50 16FEDE86 8D37FF26 0277FF26 F05EC450 52001805 F25688F0 Þ.V·...RPá^Þ&.w.&.7..B±.PjZ.v... 000180
 88F05EC4 0C9AE999 FD9E8688 0008E903 7500FD9E BE83FD9E 868910C4 830000FF ....á....».ƒ.».u.Õ.....».Õ..á^Þ. 0001A0
 68FDA486 FFFDA686 FF00000F C79A5016 FDA4868D FEDEB6FF 02978789 26FEDE86 .B±&.....ÑR±..Ê».P.ú....ÑI».ÑÊ»h 0001C0
 260AEF87 8926FD96 9688F094 8688F05E C4FD9696 89FD9486 890000FF FF9A8008 .........»...»á^Þ...»...»&..ÿ.& 0001E0

Dump of file SATURN:[PCCOMMON.DUMP.DLL]SA-PDLED.DLL;1 on 18-APR-1990 10:51:30.28
File ID (436,15,0)   End of file block 133 / Allocated 136

Virtual block number 19 (00000013), 512 (0200) bytes

 260AEB87 8926F05E C4000006 E99AFFFF 681C1168 FD9486FF FD9686FF 0AF19789 ..Þ..Ñ.».Ñ.»h..h...Õ...á^Þ&..§.& 000000
 6A036A01 6A006A01 6A006A00 000A099A FDA486FF FDA686FF FEDEB6FF 0AED9789 ..Ú..ÑR±.ÑI».ÑÊ».....j.j.j.j.j.j 000020
 261077FF 26F05EC4 027DB7FF 26F05EC4 1076FF00 00192D9A 50520000 19269A01 ..&...RP.-....v.á^Þ&.ñ).á^Þ&.w.& 000040
 E705F256 88F04688 37FF2602 77FF26F0 5EC41277 FF261477 FF26F05E C40E77FF .w.á^Þ&.w.&.w.á^Þ&.w.&.7.FÞ.V·.Õ 000060
 FF260AE9 B7FF26F0 5EC40030 E9037500 FD9EBE83 FD9E8689 0000FFFF 9A50520A .RP........».ƒ.».u.ÕO.á^Þ&.ñÕ.&. 000080
 8D9A1076 FF5016FE E6868000 00FFFF9A 01006850 16FEE686 8DFD9E86 FF0AE7B7 ñÕ..Ñ.»..I±.Ph.........I±.P.v... 0000A0
 0AE9B7FF 26F05EC4 087EE999 FD9E8688 0008E903 7500FD9E BE8306C4 831C4C12 .L..á..ƒ.».u.Õ.....».Õ-.á^Þ&.ñÕ. 0000C0
 C4831D9E 05799A10 76FFF076 FFF276FF 0000FFFF 9AF076FF F276FF0A E7B7FF26 &.ñÕ..v·.vÞ......v·.vÞ.v..y....á 0000E0
 1CBD9A50 16FDC286 8D0287B7 FF260289 B7FF26F0 5EC4084C E900008A 00008806 .¡..¤..ÕL.á^Þ&.ñ..&.ñ....ó».P.§. 000100
 DE9A006A 006A0293 B7FF2602 95B7FF26 F05EC41B 5C68FDC2 B6FFFDC4 B6FF0000 ...Ñá».Ñó»h\.á^Þ&.ñ..&.ñ..j.j..B 000120
 89B7FF26 F05EC404 C4831CF3 05919A50 520AF505 F25688F0 46880807 E900001C ...Õ...FÞ.V·.%.RP...µ..á.á^Þ&.ñ. 000140
 26F05EC4 1B5C68FD C2B6FFFD C4B6FF00 001D0C9A 5016FDC2 868D0287 87FF2602 .&.ñ....ó».P......Ñá».Ñó»h\.á^Þ& 000160
 50520AF5 05F25688 F046880A B8E90000 1D2D9A00 6A006A02 93B7FF26 0295B7FF .ñ..&.ñ..j.j..·...ÕI..FÞ.V·.%.RP 000180
 00001D75 9A5016FD C2868D02 87B7FF26 0289B7FF 26F05EC4 04C48310 B8050B9A ...£..á.á^Þ&.ñ..&.ñ....ó».P.u... 0001A0
 001D889A 006A006A 029387FF 260295B7 FF26F05E C41B5C68 FDC2B6FF FDC4B6FF .Ñá».Ñó»h\.á^Þ&.ñ..&.ñ..j.j..... 0001C0
 75000030 0000FFFF 9A5016FD B0868D02 7FB7FF26 0281B7FF 26F05EC4 0A69E900 .ÕI.á^Þ&.ñ..&.ñ....¯».P.....=..u 0001E0

Dump of file SATURN:[PCCOMMON.DUMP.DLL]SA-PDLED.DLL;1 on 18-APR-1990 10:51:30.28
File ID (436,15,0)   End of file block 133 / Allocated 136

Virtual block number 20 (00000014), 512 (0200) bytes

 8D028FB7 FF260291 B7FF26F0 5EC40A3B E90003E9 03750400 FDB086F7 000EE903 .Õ..%.¯»..u.Õ..Õ;.á^Þ&.ñ..&.ñ... 000000
 E9000007 8C9A006A 006A006A 006A1B56 68F476FF F676FF00 0006C19A 5016F446 F¶.P.è....v¬.v¶hV.j.j.j.j......Õ 000020
 FF0C76FF 09FAE900 00BA0000 B806C483 1AA91280 9A1076FF 0A76FF0C 76FF0A08 ...v..v..v....`..á.¡..¤..Õ°..v.. 000040
 006A1DAF 681677FF 26F05EC4 00C0E9FD C68688 1E FC00009A 5016FDC6 86800A76 v...ó».P...=...ó»Õå.á^Þ&.w.hÊ.j. 000060
 C4440068 0E77FF26 1077FF26 F05EC450 16E6468D 00001E79 9A006A00 6A01F168 hÞ.j.j..y....FI.Pá^Þ&.w.&.w.h.Dá 000080
 4EE90374 00FD9EBE 83FD9E86 8910C483 00001864 9A006A37 FF260277 FF26F05E ^Þ&.w.&.7j..d....á....».ƒ.».t.ÕN 0000A0
 A0868D0E 77FF2610 77FF26F0 5EC4E676 FFE876FF 0043E903 75E8460B E6468800 ..FI.FÒu.ÕC..vÒ.vIá^Þ&.w.&.w.... 0000C0
 A286FF00 12E90374 00FD9EBE 83FD9E86 8910C483 00001608 9A006A7E 6A5016FD ».Pj-j..Ä....á....».ƒ.».t.Õ...ÑÄ 0000E0
 C686881B 62680297 B7FF26F0 5EC40045 E906C483 000016F8 9A006AFD A0B6FFFD ».Ñ.»j..%....á.ÕE.á^Þ&.ñ..hb...ó 000100
 75000930 FF38E903 75000530 0023E909 25E99900 00152D9A 006A006A 505299FD ».RPj.j..-....Õ%.Õ#.=..u.Õ8.=..u 000120
 FC46800A 76FF0C76 FF0000E9 FFBEE903 7F001130 000BE903 7D00103D FF48E903 .ÕH.=..).Õ..=....Õƒ.Õ...v..v..F= 000140
 AC868DEC 76FFEE76 FF0000FF FF9A5016 EC46800A 76FF0C76 FF00001E D49A5016 .P.å....v..v..F&.P......vŸ.v&..¯ 000160
 FE76FFFD AC86FFFD AEB6FFFD C686FF50 16FEE686 8D010068 0000FFFF 9A5016FD ».P.....h....I±.P.Ñó».ÑÜ».Ñ¯».v± 000180
 568BF046 885016FE E68680FD 9E868914 C4831315 0A5B9AF0 76FFF276 FFFC76FF .v=.v·.vÞ.[....á....»..I±.P.FÞ.V 0001A0
 5016F446 8D028FB7 FF260291 B7FF26F0 5EC408C4 831F6104 DA9A5052 02E305F2 ·.D.RP.Õ.a..á.á^Þ&.ñ..&.ñ...F¶.P 0001C0
 E305F256 88F0468B 1B5868F4 76FFF676 FF00000A E587C726 F05EC400 001C6E9A .n...á^Þ&ú.I....v¬.v¶hX..FÞ.V·.D 0001E0
```

```
Dump of file SATURN:[PCCOMMON.DUMP.DLL]SA-PDLED.DLL;1 on 18-APR-1990 10:51:30.28
File ID (436,15,0)   End of file block 133 / Allocated 136

Virtual block number 21 (00000015), 512 (0200) bytes

 00B80000 1C8F9A50 006A04C4 8317E805 3A9A5052 02E305F2 568BF046 8B505202 .RP.FÞ.V·.D.RP.:.Ò..á.j.P.....¡. 000000
 214F9A50 52000021 489A016A 036A016A 006A016A 006A0823 E9082FE9 0000BA00 .¤..Õ/.Õ#.j.j.j.j.j.j..H!..RP.O! 000020
 468BF05E C408C483 204404DA 9A505202 E305F256 8BF0468B 0A76FF0C 76FF0000 ...v..v..FÞ.V·.D.RP.Õ.D .á.á^Þ.F 000040
 5EC43334 68505299 1046881B 5568006A 00010AE5 87C726F0 5EC40AE3 87892606 .&..D.á^Þ&ú.[...j.hU..F..RPh43á^ 000060
 0002E387 C626F05E C407BFE9 0000BA00 00B80CC4 83201314 FA9A0297 87FF26F0 Þ&.ñ...°.. .á.¡..¤..Õ¢.á^Þ&6.D.. 000080
 029787FF 26F05EC4 33346850 52991046 8B1B5668 006A0000 0AE387C7 26F05EC4 á^Þ&ú.D...j.hV..F..RPh43á^Þ&.ñ.. 0000A0
 06C48320 8F128D9A 1076FF00 D4681E07 85E90000 BA0000B8 0CC48320 2B14FA9A .°.+ .á.¡..¤..Õ...hå..v..... .á. 0000C0
 26064688 F05EC408 C48320B1 04DA9A50 5202E305 F2568BF0 46880A76 FF0C76FF .v..v..FÞ.V·.D.RP.Õ.Ý .á.á^Þ.F.& 0000E0
 26F05EC4 000020D5 9A5016FD C2868D02 87B7FF26 028987FF 26F05EC4 0AE38789 ..D.á^Þ&.ñ..&.ñ....ô».P.[ ..á^Þ& 000100
 FC14FA9A 029787FF 26F05EC4 33346850 52991046 8B1B5768 006A0001 0AE587C7 ú.[...j.hW..F..RPh43á^Þ&.ñ...°.• 000120
 DA9A5052 02E305F2 568BF046 880A76FF 0C76FF07 09E90000 BA0000B8 0CC48320  .á.¡..¤..Õ...v..v..FÞ.V·.D.RP.Õ 000140
 868D0287 B7FF2602 89B7FF26 F05EC40A E3878926 064688F0 5EC408C4 831F1904 ....á.á^Þ.F.&..D.á^Þ&.ñ..&.ñ.... 000160
 34685052 9910468B 185A6800 6A00010A E587C726 F05EC400 001F319A 5016FDC2 ô».P.1...á^Þ&ú.[...j.hZ..F..RPh4 000180
 5EC4016A 006A069C E90000BA 0000B80C C483211C 14FA9A02 97B7FF26 F05EC433 3á^Þ&.ñ...°..!.á.¡..¤..Õ..j.j.á^ 0001A0
 F276FF01 01680200 36FF262A CE068EFF FF682200 68028387 FF260285 B7FF26F0 Þ&.ñ..&.ñ..h."h....ö°&.6..h...v· 0001C0
 999A5052 00001B92 9A016A03 6A016A00 6A016A00 6AEA4689 0000FFFF 9AF076FF .vÞ......Fõj.j.j.j.j.j......RP.. 0001E0

Dump of file SATURN:[PCCOMMON.DUMP.DLL]SA-PDLED.DLL;1 on 18-APR-1990 10:51:30.28
File ID (436,15,0)   End of file block 133 / Allocated 136

Virtual block number 22 (00000016), 512 (0200) bytes

 078926FD A89EC40A F3878826 F05EC4FD AA9689FD A886890C 56880A46 8800001B ....F..V...´»..^»á^Þ&..µ.á.´»&.. 000000
 26FD9A9E C4FD9C96 89FD9A86 8908568B 06468B00 84E90375 003F8326 FDA89EC4 á.´»&.?.u.Õ...F..V....»...»á..»& 000020
 FF000021 DF9A5016 FD98868D FD9AB6FF FD9CB6FF 028F6801 00FD9886 C70007C6 ó..ú..»..h...Ñ.».Ñ.»...».P.Ô!... 000040
 02046800 0021FD9A 5016FD98 868D5052 003905F2 568BF046 8BFD9AB6 FFFD9C86 Ñ.».Ñ.».FÞ.V·.9.RP...».P.»!..h.. 000060
 568BF046 8BFD9AB6 FFFD9CB6 FF0000FF FF9A5016 FD98868D FD9AB6FF FD9CB6FF .Ñ.».Ñ.»...».P......Ñ.».Ñ.».FÞ.V 000080
 8822E315 399A059C E90000BA 00008800 00FFFF9A 5016FD98 86805052 005A05F2 ·.Z.RP...».P.....¡..¤..Õ...9.D". 0000A0
 6A0A76FF 0C76FF26 48685016 FDD8868D 5016FEE0 868D0038 E903750C 460B0A46 F..F.u.Õ8...Å±.P..Ä».PhK&.v..v.j 0000C0
 E90557E9 99FD9E86 880008E9 037500FD 9EBE83FD 9E868910 C4830000 1DFC9A00 ..•....á....»./.».u.Õ.....».ÕW.Õ 0000E0
 E7B7FF26 0AE9B7FF 26F05EC4 0364E908 468B0000 FEE086C7 0000FD08 86C7000C ..ú.Ä»..ú.Å±...F.Õd.á^Þ&.ñÕ.&.ñÕ 000100
 16FEE686 8D50520A E305F256 8BF0468B 505202E3 05F2568B F0468BFD D8B6FF0A ..ÑÄ».FÞ.V·.D.RP.FÞ.V·.D.RP..[±. 000120
 00C86800 55E90375 00FD9EBE 83FD9E86 890000FF FF9A1318 681CA468 01006850 Ph..hÊ.h..........»./.».u.ÕU.hà. 000140
 685016FE E68680FD 9EB6FF0A E7B7FF26 0AE9B7FF 26F05EC4 0000FFFF 9A00C868 hà......á^Þ&.ñÕ.&.ñÕ..Ñ.»..[±.Ph 000160
 FDC486FF 016A006A 06C4831B 5D128D9A 1076FF50 16FEE686 8D00001C 019A0100 .........[±.P.v....]..á.j.j..Ñá» 000180
 80028F87 FF260291 B7FF26F0 5EC404A4 E90000BA 0000B800 0004A09A FDC2B6FF .Ñö».....¡..¤..ÕÊ.á^Þ&.ñ..&.ñ... 0001A0
 83235404 DA9A5052 02E305F2 568BF046 8B5016FE E6868D00 0023F49A 5016F446 F¶.P.¶#....[±.P.FÞ.V·.D.RP.Õ.T#. 0001C0
 5202E305 F2568BF0 468B5052 02E305F2 568BF046 8B1B5868 F476FFF6 76FF08C4 á..v-.v¶hX..FÞ.V·.D.RP.FÞ.V·.D.R 0001E0

Dump of file SATURN:[PCCOMMON.DUMP.DLL]SA-PDLED.DLL;1 on 18-APR-1990 10:51:30.28
File ID (436,15,0)   End of file block 133 / Allocated 136

Virtual block number 23 (00000017), 512 (0200) bytes

 251E9AFD C2B6FFFD C4B6FF01 6A006A00 00242D9A 50006A04 C48323DC 053A9A50 P.:.É#.á.j.P.-$..j.j..Ñá».Ñô»..% 000000
 FF260AE9 B7FF26F0 5EC40031 E903750C 460B0A46 8B0428E9 0000BA00 00B80000 ..¡..¤..Õ+..F..F.u.Õ1.á^Þ&.ñÕ.&. 000020
 0000FFFF 9A040068 505202E3 05F2568B F0468BFE E086FF0A 76FF0C76 FF0AE7B7 ñÕ..v..v..ÑÅ±.FÞ.V·.D.RPh....... 000040
 468B5052 02E305F2 568BF046 88040068 0002E387 C626F05E C40009E9 FD9E8689 ...»Õ..á^Þ&6.D..h...FÞ.V·.D.RP.F 000060
 468D028F B7FF2602 91B7FF26 F05EC40A C4832424 058E9A50 5206E305 F2568BF0 Þ.V·.D.RP...$$.á.á^Þ&.ñ..&.ñ...F 000080
 568BF046 8B1B5868 F476FFF6 76FF0000 0AE587C7 26F05EC4 0000247B 9A5016F4 ¶.P.($..á^Þ&ú.[....v-.v¶hX..FÞ.V 0000A0
 001F6A9A 50006A04 C483266E 053A9A50 5202E305 F2568BF0 468B5052 02E305F2 ·.D.RP.FÞ.V·.D.RP.:.n&.á.j.P.j.. 0000C0
 1E000024 DD9A00C8 6800C868 0023E903 740C4608 0A468B03 6DE999FD 9E868800 ....».Õm..F..F.t.Õ#.hà.hà..¶$... 0000E0
 26028987 FF26F05E C4033FE9 0000BA00 00B806C4 8324C312 8D9A1076 FF010668 h...v....Ú$.á.¡..¤..Õ7.á^Þ&.ñ..& 000100
 16F44680 028FB7FF 260291B7 FF26F05E C4000024 929A5016 FDC2868D 028787FF .Ñ....ô».P..$..á^Þ&.Ñ..&.ñ...F¶. 000120
 46800000 25739A50 52000025 6C9A016A 036A016A 006A016A 006A0000 262D9A50 P.-&..j.j.j.j.j.j..l%..RP.s%...F 000140
 FD9EBE83 FD9E8689 0CC48325 0C12C49A 1076FFF0 76FFF276 FFF00886 FF5016F8 ½.P.ÑÄ».v·.vÞ.v..á..%.á....»./.» 000160
 B6FF0AE7 B7FF260A E9B7FF26 F05EC400 0022B49A 00C86800 C8680055 E9037500 .u.ÕU.hà.hà..Ç"..á^Þ&.ñÕ.&.ñÕ..Ñ 000180
 C4832535 128D9A10 76FF5016 FEE6868D 000022D3 9A010068 5016FEE6 868DFD9E .»..[±.Ph...£"....[±.P.v....5%.á 0001A0
 FF011B68 1E027BE9 0000BA00 00B80000 25B89AFD C2B6FFFD C4B6FF01 6A006A06 .j.j..Ñá».Ñô».¡%..¡..¤..Õ(..h... 0001C0
 33376802 97B7FF26 F05EC400 1AE90375 FA460BF8 468B06C4 8325FE12 8D9A1076 v....±%.á..F½.F°u.Õ..á^Þ&.ñ..h73 0001E0
```

Dump of file SATURN:[PCCOMMON.DUMP.DLL]SA-PDLED.DLL;1 on 18-APR-1990 10:51:30.28
File ID (436,15,0)   End of file block 133 / Allocated 136

Virtual block number 24 (00000018), 512 (0200) bytes

```
00001F87 9A016A01 6A016A00 6A016A00 6A000017 D29A006A 006AF876 FFFA76FF .v*.vÑj.j..Ò...j.j.j.j.j.j...... 000000
5688F046 8850520A E305F256 88F04688 0226E900 008A0000 8800001F 8E9A5052 RP.....|..¤..Õ&..FÞ.V·.D.RP.FÞ.V 000020
FF016A00 6A10C483 22950913 9A1076FF F076FFF2 76FFFDD8 B6FF5052 02E305F2 ·.D.RP.ÑÄ».v·.vÞ.v.....".á.j.j.. 000040
FE69E903 751B553D 0023E901 E1E90000 8A000088 000022F5 9AFDC286 FFFDC4B6 Ñá».Ñò».%"..|..¤..ÕÂ.Õ#.=U.u.Õi± 000060
008A0000 B80000E9 FC7CE903 751B5A3D FFA0E903 751B573D FDA3E903 751B563D =V.u.ÕÈ»=W.u.Õ..=Z.u.Õ|=Õ..|..¤. 000080
880A4688 019AE900 008A0000 B806C483 1FD9128D 9A1076FF 0137681E 01B2E900 .Õý..h7..v....\..á.|..¤..Õ...F.. 0000A0
0020689A 5016F446 8D028FB7 FF260291 B7FF26F0 5EC4FDAA 9689FDA8 86890C56 V...´»..¯»á^Þ£.ñ..&.ñ...F¶.P.h . 0000C0
50520AE3 05F25688 F0468850 5202E305 F25688F0 46881B65 68F476FF F676FF00 ..v-.v¶he..FÞ.V·.D.RP.FÞ.V·.D.RP 0000E0
1FA60510 9A505202 E305F256 88F04688 505206E3 05F25688 F0468800 00053C9A .<....FÞ.V·.D.RP.FÞ.V·.D.RP...Ì. 000100
9A0676FF 0876FF0A 76FF0C76 FF0E76FF 1076FF01 20E90789 26FDA89E C408C483 .á.á.¨»£..Õ ..v..v..v..v..v..v.. 000120
76F8CBE9 03751B55 3D007BE9 0376F6F0 E903751B 633D0103 E9010FE9 0000FFFF ....Õ..Õ..=c.u.ÕÞ−v.Õ(.=U.u.Õü½v 000140
75100430 FFB1E9F3 07E90375 10013D00 0BE90376 F3E1E903 7510033D 003BE903 .Õ;.=..u.ÕÄµv.Õ..=..u.Õ.µÕÝ.=..u 000160
3DFF8EE9 F2EDE903 7710CD3D FF99E903 7310CC3D F201E903 7510053D F370E903 .Õp¤=..u.Õ1·=ä.s.Õ..=ë.w.ÕÜ·Õ..= 000180
3DF98EE9 03751B5A 3DFEEDE9 03751B59 3DF922E9 03751B57 3DF8F0E9 03751B56 V.u.ÕÞ½=W.u.Õ"'=Y.u.ÕÜ±=Z.u.Õ.'= 0001A0
3D002BE9 0376F240 E903751D B430FF5B E9F6BDE9 03751B62 3DF543E9 03751B5C \.u.ÕC%=b.u.Õ.−Õ[.=Ç.u.ÕK·v.Õ+.= 0001C0
3DEE27E9 03751DB0 3DEF23E9 03751DAF 3DEE64E9 03751DAE 3DEE36E9 03751DAD Ù.u.Õ6Ý=Ù.u.ÕdÝ=£.u.Õ#ÿ=¯.u.Õ'Ý= 0001E0
```

Dump of file SATURN:[PCCOMMON.DUMP.DLL]SA-PDLED.DLL;1 on 18-APR-1990 10:51:30.28
File ID (436,15,0)   End of file block 133 / Allocated 136

Virtual block number 25 (00000019), 512 (0200) bytes

```
3DF22DE9 03751DB5 3D0013E9 0376F534 E9037538 A130FF23 E9EE91E9 03751DB2 ý.u.Õ.ÝÕ#.=Á8u.Õ4%v.Õ..=ç.u.Õ-··= 000000
E9037538 A530F5AA E9037538 A330F563 E9037538 A230FF03 E9FA93E9 03753335 53u.Õ.'Õ..=Á8u.Õc%=£8u.Õ`%=£8u.Õ 000020
00669000 0CCAC95F 5E1F0000 E900008A 0000B8FE E0E9FE72 E9037538 A73DF978 x'=Ì8u.Õr±ÕÁ±|..¤..Õ...^_èò...f. 000040
00000001 24590002 0313000E 066E0203 0292000E 23150203 05E90013 1A340203 ..4...Õ....#......n........Y$.... 000060
00000002 25A60002 00B7000A 26900203 0137000A 111A0203 003D0009 26510103 ..Q&..=.......7....&..ñ...I%.... 000080
00000004 17350002 029F000E 10DA0203 00450009 235D0103 04800011 1E380203 ..8.......]#..E...Õ.......5..... 0000A0
00C6000A 1D080203 00400009 236E0103 05FC0013 1A730203 01710001 06E60005 ..Ì...q...s...=...n#..M...Ä...ó. 0000C0
032A000E 068C0203 04910011 1E580203 00F70001 0CCE0005 03F60001 1B600005 ..`...−...ö...%...X...........*. 0000E0
023E000C 07D10203 014C000A 11270203 00000007 232D0002 02AB000E 07070203 ......¨...-#......'...L...Ì...>. 000100
05900012 1EB30203 000F0002 06A10005 041E0010 22980203 007E0001 0C740005 ..t...~....".....À...Õ...°...... 000120
005C0009 24AA0103 00000009 15560002 005B0009 24A30103 0001000A 255B0203 ..[%..Ì...È$..[...V.......`$..\. 000140
000C000A 1B230203 04A40011 0A570203 015C000A 08010203 02BC000E 019C0203 ......#.......\...W...Ê...#...É. 000160
00730002 06650005 01F20002 06890005 04300010 13210203 024C000C 1A900203 ......L...!...0.......`...e...s. 000180
02CD000E 01B20203 025B000C 07E30203 0349000E 06AA0203 07F40002 22980005 ..."..¶...`...I...D...[...ý...ë. 0001A0
007D0009 21340103 05A00013 08C20203 04400010 23AC0203 00EF000A 1B810203 ......ÿ...¯#..ä...ô...Ü...4!..). 0001C0
0173000B 09000203 06320013 0BEC0203 02D9000E 05F90203 007E0009 13000103 ..Ì...~...'...\...š...2.......s. 0001E0
```

Dump of file SATURN:[PCCOMMON.DUMP.DLL]SA-PDLED.DLL;1 on 18-APR-1990 10:51:30.28
File ID (436,15,0)   End of file block 133 / Allocated 136

Virtual block number 26 (0000001A), 512 (0200) bytes

```
00870009 14480103 03CB0010 1BD40203 102B0001 08070005 00030009 08E00103 ..Å.......¤...+...å...Ù...H..... 000000
000A0009 10480103 00080009 13B50103 0100000A 11F80203 044F0010 24FC0203 ..•$..O...½.......ç........H..... 000020
000D0009 10E70103 008C0009 09CF0103 13330001 211F0005 00880009 18370103 ..7.........I..3...Ü.......Ó..... 000040
05490012 1EC30203 0181000B 0B120203 00100009 11B80103 03D60010 1C3C0203 ..<...¤...|...............Ü...I. 000060
05C40013 0C770203 00130009 1B330103 02EB000E 06220203 06420013 010F0203 ......B..."...Š...3.......W...á. 000080
0113000A 1ACA0203 001A0009 13620103 02790000 21C90203 045F0010 1A160203 ......_...è!..y...b.......ò..... 0000A0
009D0009 17B90103 018D000B 0B7A0203 02250002 06A70005 020C000B 0C4A0203 ..J.......Ì...%...z.......¿..... 0000C0
009C000A 1AEF0203 00A90002 06830005 001F0009 13EA0103 001E0009 13540103 ..T.......Õ...........`...ÿ..... 0000E0
0198000B 1A830203 02FE000E 06500203 00250009 1B630103 02840000 21AB0203 ..¨I......c...%...P...±......... 000100
00AD0009 10BD0103 00350002 06490005 00320008 244B0103 021A000B 09200203 ..-.......K$..2...I...5.......Ù. 000120
00B20009 127F0103 002E0009 10980103 0126000A 0A170203 002D0009 10730103 ..¤...-.......&...............ÿ. 000140
00B30009 14C50103 04730011 22320203 00AB000A 1A4F0203 03FA0010 1A610203 ..¤...'...0...¨...2"..¤...é...°. 000160
FF0C76FF D88EFFFF B81E5657 000004C8 0227000B 086C0203 01BF0002 06680005 ..k...¢...l...'.à...WV.|...Ä.v.. 000180
5E1F0000 E900008B 07892606 5EC4078B 26FC5EC4 0000FFFF 9A5016FC 46800A76 v..F=.P.....á^=&..á^.&..|..Õ...^ 0001A0
0000189A 5016FC46 8D0A76FF 0C76FF08 8E00088B 1E565700 0004C800 08CAC95F _èò..à...WV.|...Ä.v..v..F=.P.... 0001C0
C95F5E1F 0000E900 00B80257 89260789 26065EC4 04578826 02478826 FC5EC400 ¯á^=&.G.&.W.á^.&..&.W.|..Ö...^_è 0001E0
```

Dump of file SATURN:[PCCOMMON.DUMP.DLL]SA-PDLED.DLL;1 on 18-APR-1990 10:51:30.28
File ID (436,15,0)   End of file block 133 / Allocated 136

Virtual block number 27 (0000001B), 512 (0200) bytes

```
C4000000 4D9A5016 FC4680DA 76FF0C76 FFD88E00 3DB81E56 57000004 C80008CA ò..à...WV.¡=..Ä.v..v..F=.P.M...é 000000
1E565700 0004C800 08CAC95F 5E1F0000 E9000088 07892606 5EC40647 8B26FC5E ^=&.G.é^.&..¡..Õ...^_èò..à...WV. 000020
26065EC4 08478B26 FC5EC400 00008B9A 5016FC46 8D0A76FF 0C76FFD8 8E007BB8 ¡(..Ä.v..v..F=.P....¯é^=&.G.é^.& 000040
76FF0C76 FFD88E00 81B81E56 57000004 C80008CA C95F5E1F 0000E900 00880789 ..¡..Õ...^_èò..à...WV.¡Ÿ..Ä.v..v 000060
5E1F0000 E9000088 07892606 5EC40A47 8B26FC5E C4000000 C19A5016 FC46800A ..F=.P.è...¯é^=&.G.é^.&..¡..Õ...^ 000080
5E8BFE46 FF0003E9 FE468940 06468BD8 8E00E7B8 1E565700 0002C800 08CAC95F _èò..à...WV.¡Ó..Ä.F.ä.F±Õ...F±.^ 0000A0
5E1F0000 E9FE468B FFE3E900 03E90375 014E8739 014E8488 E6010676 8BE3D1FE ±ÌD.v.ìÌ..N.9.N.u.Õ..ÕD..F±Õ...^ 0000C0
C4000000 F79A5016 FC468008 76FF0A76 FFD88E01 1DB81E56 57000004 C8CBC95F _èùà...WV.¡...Ä.v..v..F=.P.K...é 0000E0
8E015BB8 1E565700 0004C800 06CAC95F 5E1F0000 E9000088 07892606 468BFC5E ¯=.F.&..¡..Õ...^_èò..à...WV.¡[.. 000100
89260247 89260856 8B06468B FC5EC400 00016B9A 5016FC46 8D0A76FF 0C76FFD8 Ä.v..v..F=.P.k..¯é^=.F..V.&.G.&. 000120
76FF0A76 FFD88E01 8DB81E56 57000004 C80008CA C95F5E1F 0000E900 00880457 W.¡..Õ...^_èò..à...WV.¡...Ä.v..v 000140
CAC95F5E 1F0000E9 0000B806 47892606 468BFC5E C4000001 9D9A5016 FC468008 ..F=.P.....¯é^=.F.&.G.¡..Õ...^_èò 000160
5EC40000 01D79A50 16FC468D 0876FF0A 76FFD88E 01C7B81E 56570000 04C80006 ..à...WV.¡û..Ä.v..v..F=.P.=..¯é^ 000180
8E01FAB8 1E565700 0004C800 06CAC95F 5E1F0000 E9000088 08478926 06468BFC =.F.&.G.¡..Õ...^_èò..à...WV.¡ª.. 0001A0
00E90000 B80A4789 2606468B FC5EC400 00020A9A 5016FC46 8D0876FF 0A76FFD8 Ä.v..v..F=.P....¯é^=.F.&.G.¡..Õ. 0001C0
0001B800 06E90374 FF067E83 D88E022D 881E5657 000000C8 0006CAC9 5F5E1F00 ..^_èò..à...WV.¡-..Ä.~...t.Õ..¡.. 0001E0
```

Dump of file SATURN:[PCCOMMON.DUMP.DLL]SA-PDLED.DLL;1 on 18-APR-1990 10:51:30.28
File ID (436,15,0)   End of file block 133 / Allocated 136

Virtual block number 28 (0000001C), 512 (0200) bytes

```
0374FE06 7E83D88E 0260881E 56570000 00C8CBC9 5F5E1F00 00E90000 B80003E9 Õ..¡..Õ...^_èùà...WV.¡'..Ä.~.±t. 000000
D88E0286 881E5657 000014C8 CBC95F5E 1F0000E9 00008800 03E90001 B80006E9 Õ..¡..Õ..¡.¯Õ...^_èùà...WV.¡...Ä 000020
5EC4F846 89FA4689 000088FC 4689FE46 890000B8 F0468901 4E8788E3 D10E5E8B .^.ÌD..N..FÞ¡...F±.F=¡...Fª.F½é^ 000040
F05E8807 8926F046 88F45EC4 0000FFFF 9A5016F4 468D0C6A 5A6A027D 87FF2606 .&.ñ).jZj..F¶.P.....é^¶.FÞ&...^Þ 000060
26F45EC4 04578926 02478926 F45EC40A 66978826 0A648788 262AE006 8E02E3C1 èÐ...Å*&..d.&..f.é^¶&.G.&.W.é^¶& 000080
F676FF0A 76FF0C76 FF00010A 47C726F4 5EC40000 0847C726 F45EC400 010647C7 úG...é^¶&úG...é^¶&úG....v..v..v— 0000A0
5EC402E6 C1F0768B 02578826 07882614 5EC40000 FFFF9A14 76FF1676 FFF476FF .v¶.v..v......é^.&..&.W..vÞèl.é^ 0000C0
7500003D 02C48303 A102589A 015087FF E3D10E5E 8B0AF790 89260AF5 80892606 .&..%.&..%..^.ÌD.ñP..X.À..é.=..u 0000E0
E9F24689 0002050E 468B0000 FFFF9A50 16EC468D 027D87FF 26065EC4 00F1E903 .Õþ.é^.&.ñ)..Fš.P......F.....F·Õ 000100
468D0093 E9037400 003D02C4 8303CB02 7E9A014E B7FFE3D1 F25E8BF2 46FF0003 ...F·.^·ÌD.ñN..~.ù..é.=..t.Õ...F 000120
12C483FF FF02A49A 0676FF08 76FF0A76 FF0C76FF F276FF10 76FF1276 FF5016FC =.P.v..v..v·.v..v..v..v..Ê....é. 000140
145EC4FC 76FFFE76 FF0000FF FF9AFC76 FFFE76FF 006A006A 006AEC76 FFEE76FF .vŸ.vš j.j.j..v±.v=......v±.v=é^. 000160
F8468B00 00FFFF9A F876FFFA 76FFFC76 FFFE76FF 0000FFFF 9A37FF26 0277FF26 &.w.&.7......v±.v=.vª.v½......F½ 000180
89FE568B FC468B00 00FFFF9A FC76FFFE 76FFF876 FFFA76FF 0011E903 75FA4608 .Fªu.Õ...vª.v½.v±.v=......F=.V±. 0001A0
77FF2614 5EC40789 26F2468B 105EC4FF 51E9F246 89078B26 105EC4FA 5689F846 F½.Vªé^.&...F·ÕQ.é^..F·&..é^.&.w 0001C0
00880789 260E468B 105EC400 0FE90000 B80000FF FF9AEC76 FFEE76FF 37FF2602 .&.7.vŸ.vš.....¡..Õ..é^..F.&..¡. 0001E0
```

Dump of file SATURN:[PCCOMMON.DUMP.DLL]SA-PDLED.DLL;1 on 18-APR-1990 10:51:30.28
File ID (436,15,0)   End of file block 133 / Allocated 136

Virtual block number 29 (0000001D), 512 (0200) bytes

```
06468802 7DB7FF26 065EC408 8E02AC88 1E565700 0006C8CB C95F5E1F 0000E900 .Õ...^_èùà...WV.¡¯..Äé^.&.ñ)..F. 000000
95B7FF26 065EC400 6A5016FE 468D5016 FA468D00 00FFFF9A 50520293 05085688 .V....ŘP......Fª.P.F±.Pj.é^.&.ñ. 000020
6701F29A 016AFA76 FFFC76FF 12C48304 CF02A49A 0676FF08 76FF0293 B7FF2602 .&.ñ...v..v..Ê.ü..é..v=.vªj..·.g 000040
1F0000E9 00008800 00FFFF9A FA76FFFC 76FF0293 B7FF2602 95B7FF26 065EC403 .é^.&.ñ..&.ñ...v=.vª.....¡..Õ... 000060
5700000A C8C8C95F 5E1F0000 E9000088 D88E0481 881E5657 000000C8 CBC95F5E ^_èùà...WV.¡...Ä¡..Õ...^_èùà...W 000080
037500F6 7E83F646 890000FF FF9A5016 F8468D06 76FF0876 FFD88E04 FC881E56 V¯¡=..Ä.v..v..F½.P......F¯-.~-.u. 0000A0
E90375FA 4608F846 8804C483 048F07A5 9A0676FF 0876FF00 53E9F646 880006E9 Õ...F-ÕS..v..v..Ê.¢..é..F½.Fªu.Õ 0000C0
00003D00 00FFFF9A 5016FC46 8DF876FF FA76FF00 00FFFF9A F876FFFA 76FF0034 4..vª.v½......vª.v½.F=.P.....=.. 0000E0
C95F5E1F 0000E900 0088FFD7 E904C483 0542050B 9AFC76FF FE76FF00 11E90374 t.Õ...v±.v=...B..é.Õ=.¡..Õ...^_è 000100
E9037500 8DFE7E81 FE46FF00 03E90000 FE46C7D8 8E0513B8 1E565700 0002C8CB ùà...WV.¡...ÄúF±..Õ...F±.~±§.u.Õ 000120
000088FF D8E904C4 83057E06 849A30FF 260270FF 260676C4 02E3C1FE 5E88001B ...^±èÐ.áv.&.p.&.0...~..é.ÕÀ.¡.. 000140
9A5016FA 468D0676 FF0876FF D88E0599 881E5657 000006C8 CBC95F5E 1F0000E9 Õ...^_èùà...WV.¡...Ä.v..v..Fª.P. 000160
2805089A FA76FFFC 76FF0079 E9FE468B 0006E903 7500FE7E 83FE4689 0000FFFF .....F±.~±.u.Õ...F±Õy..v=.vª...( 000180
0A5EC404 C483063B 06849A1C 77FF261E 77FF260A 5EC40065 E9000088 04C48306 ..é.¡..Õe.é^.&.w.&.w....;..é.é^. 0001A0
06610684 9A2477FF 262677FF 260A5EC4 04C48306 4E06849A 2077FF26 2277FF26 &.w"&.w ...N..é.é^.&.w&&.w$...a. 0001C0
77FF2616 77FF260A 5EC404C4 83067406 849A0477 FF260677 FF260A5E C404C483 .é.é^.&.w.&.w....t..é.é^.&.w.&.w 0001E0
```

```
Dump of file SATURN:[PCCOMMON.DUMP.DLL]SA-PDLED.DLL;1 on 18-APR-1990 10:51:30.28
File ID (436,15,0)   End of file block 133 / Allocated 136

Virtual block number 30 (0000001E), 512 (0200) bytes

D88E05E0 B81E5657 000006C8 CBC95F5E 1F0000E9 00008804 C48305C5 06849A14 ....é..á.|..Õ...^_èùà...WV.¡Å..Ä 000000
9A5016FA 46800676 FF0876FF 007FE903 7508460B 064688FC 4689FE46 89000088 |...F±.F=.F..F.u.Õ...v..v..F*.P. 000020
0676FF08 76FF0605 02259A01 6A0676FF 0876FF00 60E90374 00FA7E83 06CB000F Õ.à..-*.t.Õ'..v..v.j..X.ï..v..v. 000040
E90375FE 4608FC46 880000FF FF9A5016 FC468006 76FF0876 FF06FD01 BF9A016A j..¢.».v..v..F=.P......F=.F±u.Õ 000060
000DE904 C483071B 06849AFC 76FFFE76 FF070801 F29A006A 0676FF08 76FF001E ...v..v.j..·....v±.v=......á.Õ.. 000080
08C8CBC9 5F5E1F00 00E90001 B80006E9 00008806 0F01F29A 016A0676 FF0876FF .v..v.j..·...|..Õ..|..Õ...^_èùà. 0000A0
5016F846 800676FF 0876FF00 0005599A 0676FF08 76FFD88E 068CB81E 56570000 ..WV.¡...Å.v..v..Y....v..v.¯F½.P 0000C0
FC468800 0005239A 5016FC46 8DF876FF FA76FF00 30E90374 00003000 0005699A .ï...=..t.Õ=..v*.v½.F=.P.#....F= 0000E0
9AF876FF FA76FF00 0EE904C4 83079207 2E9AFC76 FFFE76FF 0011E903 75FE460B .F±u.Õ...v±.v=......á.Õ...v*.v½. 000100
8E0736B8 1E565700 0000C8C8 C95F5E1F 0000E900 0088FFA8 E904C483 06820684 ..ý..á.Õ¨.|..Õ...^_èùà...WV.|6.. 000120
6A0676FF 0876FF07 D402259A 006A0676 FF0876FF 0020E903 7508460B 06468808 Ã.F..F.u.Õ-..v..v.Ĵ..X.à..v..v.j 000140
1F0000E9 00018800 06E90000 B8078101 F29A006A 0676FF08 76FF07E1 01BF9A00 ..¢.Ã..v..v.j..·...|..Õ..|..Õ... 000160
0000FFFF 9A5016FC 46800676 FF0876FF D88E07AD B81E5657 000006C8 CBC95F5E ^_èùà...WV.¡Ù..Ã.v..v..F=.P..... 000180
077B9AFC 76FFFE76 FF00ACE9 04C48308 3007A29A FC76FFFE 76FF007A E90A4688 .F̄.Õz..v±.v=.Ã.0..á.Õ¯..v±.v=.(. 0001A0
9AFC76FF FE76FF00 8AE904C4 83FFFF07 C99AFC76 FFFE76FF 0098E904 C4830841 A..á.Õ...v±.v=.è....á.Õ...v±.v=. 0001C0
76FFFE76 FF0068E9 04C48308 74040D9A FC76FFFE 76FF0079 E904C483 086304B8 |.c..á.Õy..v±.v=.ï.t..á.Õh..v±.v 0001E0
```

```
Dump of file SATURN:[PCCOMMON.DUMP.DLL]SA-PDLED.DLL;1 on 18-APR-1990 10:51:30.28
File ID (436,15,0)   End of file block 133 / Allocated 136

Virtual block number 31 (0000001F), 512 (0200) bytes

0043E900 46E904C4 83FFFF05 279AFC76 FFFE76FF 0057E904 C4830885 05029AFC =......á.ÕW..v±.v=.'....á.ÕF.ÕC. 000000
0023E9FF 69E90375 00323DFF 82E90375 00043000 13E9037E FFC2E903 75003A3D =:.u.Õö.-.Õ..=..u.Õ..=2.u.Õi.Õ#. 000020
FF68E903 75008630 FFB4E903 7500A43D FF89E903 7500763D FFB3E903 7500483D =H.u.Õ°.=v.u.Õ..=Ê.u.ÕÇ.=Ñ.u.Õh. 000040
FA768800 1BE90375 00FA7E83 FA468902 F0878826 2AE2068E E3D10A5E 880000E9 Õ...^.1D..ã*&..Þ..F*.-*.u.Õ...v* 000060
5E1F0000 E90000B8 04C48307 C706849A 0AF580FF 260AF7B0 FF26FC5E C402E6C1 ê|.á^=&.¯¼.&.¯¼....ú..á.|..Õ...^ 000080
B7FF2608 5EC45052 0AF5050A 56880846 88D88E07 FCB81E56 57000106 C8C8C95F _èùà...WV.¡=..Ã.F..V..¼.RPá^.&.ñ 0000A0
0AE9B7FF 26085EC4 007BE903 75000C7E 8308C483 09650508 9A0293B7 FF260295 ¯..&.ñ...Ã.e..á..-..u.Õ(.á^.&.ñÕ. 0000C0
890000FF FF9AFFFF 68090368 1276FF14 76FF0E76 FF1076FF 0C76FF0A E7B7FF26 &.ñÕ..v..v..v..v..v.h..h........ 0000E0
FF9A00C8 6800C868 003BE903 7599ABFE FABE8100 46E90375 00FEFABE 83FEFA86 .*±.ƒ*±.u.ÕF..ƒ*±¨.u.Õ;.hà.hà... 000100
FFFF9A01 00685016 FEFC868D FEFAB6FF 0AE7B7FF 260AE9B7 FF26085E C40000FF ...á^.&.ñÕ.&.ñÕ..Ñ*±..=±.Ph..... 000120
02B7B7FF 26028987 FF26085E C406C483 FFFF128D 9A0676FF 5016FEFC 86800000 ....=±.P.v.......á.á^.&.ñ..&.ñ.. 000140
0293B7FF 260295B7 FF26085E C41B5C68 FC76FFFE 76FF0000 FFFF9A50 16FC4680 .F=.P......v±.v=h\.á^.&.ñ..&.ñ.. 000160
D88E091B B81E5657 000002C8 CBC95F5E 1F0000E9 00008800 00FFFF9A 006A006A j.j......|..Õ...^_èùà...WV.|...Ã 000180
E2068EE3 D1FE5E88 06468800 28E9037C 0088FE7E 81FE46FF 0003E900 00FE46C7 úF±..Õ...F±.-±|.|¯Õ+..F..^±ÌD..ã 0001A0
FFC8E900 09E90000 B8078926 01F405FE 4688085E C40012E9 037402F0 8739262A *&9.Þ.t.Õ..á^..F±.¶.&..|..Õ..Õà. 0001C0
0006E903 7C02187E 83D88E0A 0CB81E56 5700010E C8C8C95F 5E1F0000 E9000088 |..Õ...^_èùà...WV.|...Ã.~..|.Õ.. 0001E0
```

```
Dump of file SATURN:[PCCOMMON.DUMP.DLL]SA-PDLED.DLL;1 on 18-APR-1990 10:51:30.28
File ID (436,15,0)   End of file block 133 / Allocated 136

Virtual block number 32 (00000020), 512 (0200) bytes

7500FE7E 8300FEF6 86C606C4 83093A0A 049A1276 FF5016FE 46800 1FB E9000088 |..Õ«..F±.P.v....:..á.6.-±..-±.u 000000
FFFEF496 89FEF286 89000397 88260001 87882606 5EC4010A E9FE4688 0153E903 .ÕS..F±Õ..á^.&..1.&..&....·±..¶±. 000020
681E005E E9037500 0A7F8326 F65EC400 0002309A 5016F646 80FEF286 FFFEF486 Ñ¶±.Ñ·±.F-.P.=...á^-&....u.Õ^..h 000040
5689FA46 89045788 26024788 260E5EC4 08C4830B 1504DA9A 5016FEF6 868002E0 Å...-±.P.Õ....á.á^.&.G.&.W..F*.V 000060
FEF68680 FA76FFFC 76FFFFEE E90003E9 0374203F 8026FA5E C4FA46FF 0003E9FC =Õ...F*á^*&.? t.Õ..ÕŸ..v=.v*..-± 000080
02E7681E 08C4830B 3904949A 5016FEF6 868002E2 681E08C4 830B2704 949A5016 .P...'..á..hã...-±.P...9..á..hÕ. 0000A0
E9FC5689 FA468904 578B2602 478B260A 5EC408C4 830B7304 949A5016 FEF68680 ..-±.P...s..á.á^.&.G.&.W..F*.V=Õ 0000C0
5016FEF6 868DFA76 FFFC76FF FFEEE900 03E90374 203F8026 FA5EC4FA 46FF0003 ...F*á^*&.? t.Õ..ÕŸ..v=.v*..-±.P 0000E0
FE76FF00 5AE908C4 8308FA04 949A5016 FEF68680 02E9681E 08C4830B 8504949A ......á..hÕ...-±.P...*..á.ÕZ..v±. 000100
13E9037E FF80E903 75022E3D 0043E900 46E90000 FFFF9A01 00685016 FEF68680 ..-±.Ph.......ÕF.ÕC.=..u.Õ..-.Õ. 000120
75026A3D FF60E903 75023C3D FFC9E9FF 68E90375 022630FE E1E90375 01F83000 .=½.u.ÕÂ±=&.u.Õk.Õè.=<.u.Õ'.*j.u 000140
E8681E18 76FF184E FFFFA6E9 FEB6E903 7502AA3D FF50E903 7502983D FF58E903 .ÕX.=..u.ÕP.=^.u.ÕÑ±ÕI..N..v..hŠ 000160
18462904 C4830C31 053A9A14 76FF1676 FF0AC483 0C08058E 9A1476FF 1676FF02 ..v..v.......á..v..v..:.1..á.)F. 000180
529A1476 FF1676FF 5016FEF6 86801876 FF0052E9 00008800 06E9037E 00187E83 .~..-.Õ..|..ÕR..v...-±.P.v..v..R 0001A0
0006E903 7E00187E 83184629 04C4830C 66053A9A 5016FEF6 86800AC4 830C3F05 .?..á...-±.P.:.f..á.)F..-..-.Õ.. 0001C0
00E90000 B80AC483 FFFF0552 9A1476FF 1676FF02 E0681E18 76FF001B E9000088 |..Õ...v..hÚ..v..v..R....á.|..Õ. 0001E0
```

```
Dump of file SATURN:[PCCOMMON.DUMP.DLL]SA-PDLED.DLL;1 on 18-APR-1990 10:51:30.28
File ID (436,15,0)   End of file block 133 / Allocated 136

Virtual block number 33 (00000021), 512 (0200) bytes

 89029597 8B260293 87882606 5EC4D88E 0A63B81E 56570000 10C8CBC9 5F5E1F00 ..^_èùà...WV.¡c..Äá^.&....&..... 000000
 76FFFE56 89FC4689 0AF7908B 260AF580 8B26065E C402E6C1 0A768BF6 5689F446 F¶.V-.v.êl.á^.&..¼.&..¼..F•.V±.v 000020
 FF0057E9 00008800 06E90374 FA460BF8 46880000 07699A50 16F8468D FC76FFFE ±.v•.F½.P.i....F½.F•t.Õ..¡..ÕW.. 000040
 E9037400 003D0000 07519A50 16F0468D F876FFFA 76FF0000 07419AF8 76FFFA76 v•.v½.A....v•.v½.FÞ.P.Q...=..t.Õ 000060
 00FFFF9A F876FFFA 76FFFFD4 E90000FF FF9AF076 FFF276FF F476FFF6 76FF0014 ...v-.v¶.v·.vÞ.....Õå..v•.v½.... 000080
 57000006 C8CBC95F 5E1F0000 E9000088 0000045B 9A006A00 6AFC76FF FE76FF00 ..v±.v•j.j..[...¡..Õ...^_èùà...W 0000A0
 037400FA 7E83FA46 890000FF FF9A5016 FC468D06 76FF0876 FFD88E0C 7EB81E56 V.¡~..Ä.v..v..F•.P......F•.~•.t. 0000C0
 47392614 56881246 8BFC5EC4 003BE9FA 46880006 E90374FE 460BFC46 8B0008E9 Õ...F•.F±t.Õ...F•Õ;.á^•.F..V.&9G 0000E0
 769AFC76 FFFE76FF 00AF6800 1AE90000 8B0006E9 03750657 39260009 E9037404 .t.Õ..&9W.u.Õ..¡..Õ..h£..v±.v•.v 000100
 088E0D33 B81E5657 000006C8 CBC95F5E 1F0000E9 0000B8FA 468906C4 830A810C ....á..F•¡..Õ...^_èùà...WV.¡3..Ä 000120
 08FC468B 0008E903 7400FA7E 83FA4689 00000043 9A5016FC 46800676 FF0876FF .v..v..F•.P.C....F•.-•.t.Õ...F•. 000140
 260009E9 03740447 39261456 8B12468B FC5EC400 3BE9FA46 8B0006E9 0374FE46 F±t.Õ...F•Õ;.á^•.F..V.&9G.t.Õ..& 000160
 8906C483 00910C76 9AFC76FF FE76FF00 B568001A E9000088 0006E903 75065739 9W.u.Õ..¡..Õ..hç..v±.v•.v....á.. 000180
 8D0676FF 0876FFD8 8E0DACB8 1E565700 0006C8CB C95F5E1F 0000E900 008BFA46 F•¡..Õ...^_èùà...WV.¡~..Ä.v..v.. 0001A0
 0006E903 74FE460B FC468B00 0BE90374 00FA7E83 FA468900 0000BC9A 5016FC46 F•.P.¥....F•.-•.t.Õ...F•.F±t.Õ.. 0001C0
 06E90375 06573926 0009E903 74044739 2614568B 12468BFC 5EC4003B E9FA468B .F•Õ;.á^•.F..V.&9G.t.Õ..&9W.u.Õ. 0001E0

Dump of file SATURN:[PCCOMMON.DUMP.DLL]SA-PDLED.DLL;1 on 18-APR-1990 10:51:30.28
File ID (436,15,0)   End of file block 133 / Allocated 136

Virtual block number 34 (00000022), 512 (0200) bytes

 00E90000 B8FA4689 06C4830E 0A0C769A FC76FFFE 76FF0084 68001AE9 00008800 .¡..Õ..hÇ..v±.v•.v....á..F•¡..Õ. 000000
 0E359A50 16FC468D 0676FF08 76FFD88E 0E25B81E 56570000 06C8CBC9 5F5E1F00 ..^_èùà...WV.¡%..Ä.v..v..F•.P.5. 000020
 C4003BE9 FA468B00 06E90374 FE460BFC 4688000B E9037400 FA7E83FA 46890000 ...F•.-•.t.Õ...F•.F±t.Õ...F•Õ;.á 000040
 001AE900 00B80006 E9037506 57392600 09E90374 04473926 1456B812 468BFC5E ^•.F..V.&9G.t.Õ..&9W.u.Õ..¡..Õ.. 000060
 C8CBC95F 5E1F0000 E90000B8 FA468906 C4830E83 0C769AFC 76FFFE76 FF00B968 h¿..v±.v•.v....á..F•¡..Õ...^_èùà 000080
 7E83FA46 8900000E AE9A5016 FC468D06 76FF0876 FFD88E0E 9EB81E56 57000006 ...WV.¡...Ä.v..v..F•.P.Û....F•.~ 0000A0
 76FFFE76 FF00B768 001AE9FA 46880006 E90374FE 460BFC46 8B0008E9 037400FA •.t.Õ...F•.F±t.Õ...F•Õ..hñ..v±.v 0000C0
 17B81E56 57000006 C8CBC95F 5E1F0000 E9000088 FA468906 C4830EFC 0C769AFC •.v.•..á..F•¡..Õ...^_èùà...WV.¡. 0000E0
 8B0008E9 037400FA 7E83FA46 8900000F 279A5016 FC468D06 76FF0876 FFD88E0F ..Ä.v..v..F•.P.'....F•.-•.t.Õ... 000100
 C4830F54 0C769AFC 76FFFE76 FF00B668 001AE9FA 46880006 E90374FE 460BFC46 F•.F±t.Õ...F•Õ..hR..v±.v•.v.T..á 000120
 76FF0876 FFD88E0F 6FB81E56 57000006 C8CBC95F 5E1F0000 E9000088 FA468906 ..F•¡..Õ...^_èùà...WV.¡o..Ä.v..v 000140
 E90374FE 460BFC46 8B0008E9 037400FA 7E83FA46 8900000F 7F9A5016 FC468D06 ..F•.P......F•.-•.t.Õ...F•.F±t.Õ 000160
 E9000088 FA468906 C4830FAC 0C769AFC 76FFFE76 FF00BC68 001AE9FA 46880006 ...F•Õ..h¥..v±.v•.v.¯..á..F•¡..Õ 000180
 6A0E76FF 1076FF0A 76FF0C76 FFD88E0F C7B81E56 57000006 C8CBC95F 5E1F0000 ...^_èùà...WV.¡ú..Ä.v..v..v..v.j 0001A0
 FF106A00 25E9FA46 8B0006E9 037500FA 7E83FA46 890000FF FF9A5016 FC468D10 ..F•_P......F•.-•.u.Õ...F•Õ%.j.. 0001C0
 E912C483 1004002B 9A0676FF 0876FF0A 76FF0C76 FF0E76FF 1076FFFC 76FFFE76 v±.v•.v..v..v..v..v..v..+....á.Õ 0001E0

Dump of file SATURN:[PCCOMMON.DUMP.DLL]SA-PDLED.DLL;1 on 18-APR-1990 10:51:30.28
File ID (436,15,0)   End of file block 133 / Allocated 136

Virtual block number 35 (00000023), 512 (0200) bytes

 6A0E76FF 1076FF0A 76FF0C76 FFD88E10 1FB81E56 57000006 C8CBC95F 5E1F0000 ...^_èùà...WV.¡...Ä.v..v..v..v.j 000000
 FF0C6A00 25E9FA46 8B0006E9 037500FA 7E83FA46 89000010 379A5016 FC468D0C ..F•_P.7....F•.-•.u.Õ...F•Õ%.j.. 000020
 E912C483 106A0DA4 9A0676FF 0876FF0A 76FF0C76 FF0E76FF 1076FFFC 76FFFE76 v±.v•.v..v..v..v..v..v..Ê.j..á.Õ 000040
 6A0E76FF 1076FF0A 76FF0C76 FFD88E10 7FB81E56 57000006 C8CBC95F 5E1F0000 ...^_èùà...WV.¡...Ä.v..v..v..v.j 000060
 FF0A6A00 25E9FA46 8B0006E9 037500FA 7E83FA46 89000010 979A5016 FC468D0A ..F•_P......F•.-•.u.Õ...F•Õ%.j.. 000080
 E912C483 10CA0E1D 9A0676FF 0876FF0A 76FF0C76 FF0E76FF 1076FFFC 76FFFE76 v±.v•.v..v..v..v..v..v....ò..á.Õ 0000A0
 6A0E76FF 1076FF0A 76FF0C76 FFD88E10 DFB81E56 57000006 C8CBC95F 5E1F0000 ...^_èùà...WV.¡Ô..Ä.v..v..v..v.j 0000C0
 FF0A6A00 25E9FA46 8B0006E9 037500FA 7E83FA46 89000010 F79A5016 FC468D0A ..F•_P.¥....F•.-•.u.Õ...F•Õ%.j.. 0000E0
 E912C483 112A0E96 9A0676FF 0876FF0A 76FF0C76 FF0E76FF 1076FFFC 76FFFE76 v±.v•.v..v..v..v..v..v....*..á.Õ 000100
 FF0E76FF 1076FF00 6A006A00 6AD88E11 3FB81E56 57000000 C8CBC95F 5E1F0000 ...^_èùà...WV.¡?..Äj.j.j..v..v.. 000120
 57000000 C8CBC95F 5E1F0000 E912C483 118A0F0F 9A0676FF 0876FF0A 76FF0C76 v..v_.v..v.......á.Õ...^_èùà...W 000140
 9A0676FF 0876FF0A 76FF0C76 FF0E76FF 1076FF00 6A006A00 6AD88E11 9FB81E56 V.¡...Äj.j.j..v..v..v..v_.v..v.. 000160
 6A006A00 6AD88E11 03B81E56 57000000 C8CBC95F 5E1F0000 E912C483 118E0F67 g.ƒ..á.Õ...^_èùà...WV.¡Æ..Äj.j.j 000180
 5E1F0000 E912C483 11F20FBF 9A0676FF 0876FF0A 76FF0C76 FF0E76FF 1076FF00 ..v..v..v..v_.v..v..¢.·..á.Õ...^ 0001A0
 0676FF08 76FF006C E903750C 46080A46 8BD88E12 07B81E56 57000000 C8CBC95F _èùà...WV.¡...Ä.F..F.u.Õl..v..v. 0001C0
 680C6A21 6A0676FF 0876FF00 00127C9A FFFF6812 7068125E 68125B68 106A226A J"j.h[.h^.hp.h...|....v..v.j!j.h 0001E0
```

```
Dump of file SATURN:[PCCOMMON.DUMP.DLL]SA-PDLED.DLL;1 on 18-APR-1990 10:51:30.28
File ID (436,15,0)   End of file block 133 / Allocated 136

Virtual block number 36 (00000024), 512 (0200) bytes

 12946812 91680A6A 1F6A0676 FF0876FF 00001297 9AFFFF68 12886812 79681276 v.hy.h..h........v..v.j.j.h..h.. 000000
 FF6812C1 6812AF68 12AC680A 6A1E6A06 76FF0876 FF000012 829AFFFF 6812A668 hl.h...ý....v..v.j.j.h¯.h£.hè.h. 000020
 0012E89A FFFF6812 DC6812CA 6812C768 106A026A 0676FF08 76FF0000 12CD9AFF ..ë....v..v.j.j.hú.hò.hÉ.h...Ò.. 000040
 FF0876FF 00001303 9AFFFF68 12F76812 E56812E2 68136A05 6A0676FF 0876FF00 ..v..v.j.j.hã.hl.h%.h........v.. 000060
 E903750C 46080A46 880000FF FF9AFFFF 68131D68 13006812 FD68036A 166A0676 v.j.j.h».h..h..h........F..F.u.Õ 000080
 6A216A06 76FF0876 FF000013 389AFFFF 68133268 016A226A 0676FF08 76FF0054 T..v..v.j"j.h2.h...8....v..v.j!j 0000A0
 0013629A FFFF6813 5C68016A 1F6A0676 FF0876FF 0000134D 9AFFFF68 13476801 .hG.h...M....v..v.j.j.h\.h...b.. 0000C0
 026A026A 0676FF08 76FF0000 13779AFF FF681371 68016A1E 6A0676FF 0876FF00 ..v..v.j.j.hq.h...w....v..v.j.j. 0000E0
 000013A1 9AFFFF68 13986802 6A056A06 76FF0876 FF000013 8C9AFFFF 68138668 h..h........v..v.j.j.h..h...Å... 000100
 CBC95F5E 1F0000E9 0000B800 00FFFF9A FFFF6812 2668026A 166A0676 FF0876FF .v..v.j.j.h&.h.......|..Õ...^_èù 000120
 13E20035 9A5016FC 468D37FF 260277FF 26065EC4 D88E123B B81E5657 000008C8 à...WV.|;..Äó^.&.w.&.7.F=.P.S¯ã. 000140
 FC76FFFE 76FFF876 FFFA76FF 12550035 9A5016F8 468D37FF 260277FF 260A5EC4 ó^.&.w.&.7.F%.P.S.U..v°.v½.v±.v= 000160
 FF0876FF D88E1388 B81E5657 00000CC8 CBC95F5E 1F0000E9 08C4830A DB05109A ...Û..ó.Õ...^_èùà...WV.||..Ä.v.. 000180
 FE76FF00 A7E90000 B80006E9 0374FE46 0BFC4688 00000CBA 9A5016FC 46800676 v..F=.P.¤....F•.F±t.Õ..|..ÕI..v± 0001A0
 0CD69AFC 76FFFE76 FFF84689 FA468900 00B80000 FFFF9AFF FF6814AC 68FC76FF .v=h¯.h.......|...F°.F%.v±.v•.■. 0001C0
 F476FFF6 76FF004A E9037400 00300000 0CE69A50 16F4468D FC76FFFE 76FF0000 ...v±.v=.F¶.P.|...=..t.ÕJ..v-.v¶ 0001E0

Dump of file SATURN:[PCCOMMON.DUMP.DLL]SA-PDLED.DLL;1 on 18-APR-1990 10:51:30.28
File ID (436,15,0)   End of file block 133 / Allocated 136

Virtual block number 37 (00000025), 512 (0200) bytes

 FFF676FF F876FFFA 76FF0011 E90375FA 460BF846 8B000004 099AF876 FFFA76FF .v°.v½......F½.F°u.Õ...v°.v½.v-. 000000
 C48313CE 14009AF4 76FFF676 FFFA5689 F84689F6 568BF446 8B000014 CA9AF476 v¶.ò....F¶.V-.F½.V°.v-.v¶...ö..ó 000020
 00B80000 04259A00 6A006AF8 76FFFA76 FF000FE9 0375FA46 0BF8468B FF9EE904 .Õ...F½.F°u.Õ...v°.v½j.j..X...|. 000040
 09BE0002 0292000E 09060203 0388000F 03820203 003490C8 C95F5E1F 0000E900 .Õ...^_èù.4...........■......./. 000060
 09680203 00000002 14340002 05760012 14930203 04F40012 0CFF0203 00000001 ..........¶.......v...4........k. 000080
 09F50103 00000003 081F0002 11CB0002 13890005 0393000F 00D00203 04080010 ......................ù..........%. 0000A0
 13F30002 10070002 134A0005 05060012 001C0203 00000005 08520002 00450009 ..E...R..............J....■....µ. 0000C0
 12DF0005 00000009 14080002 03AB000F 03E30203 05900012 0AB00203 00000007 ......§.......D..¨...........Ô. 0000E0
 09680005 03B9000F 143A0203 06160013 12610203 051D0012 14180203 0F670002 ..g..........•........:...¿...h. 000100
 03F80203 11FF0002 139E0005 025B000C 02E00203 10770002 13350005 07F40002 ..¶...5...w...Å...[...........%. 000120
 12C40005 044F0010 09AE0203 01F3000B 11570203 048A0012 04990203 05340012 ..4.......¤...W...µ...Ù...O...4. 000140
 13740005 0E960002 12A90005 026E0000 0B9A0203 04C60012 05F00203 0F0F0002 ......Þ...6........n...`.......t. 000160
 144E0203 06420013 0FD70203 05490012 06E30203 10170002 13200005 11970002 ...... .......D...I...■...B...N. 000180
 080C0203 04050012 04E50203 00A40002 12730005 0E1D0002 128E0005 0363000F ..c...........s...É...I...f..... 0001A0
 13230203 055E0012 14770203 0374000F 145E0203 00280002 12580005 03E70010 ..Ô...X...+...^...t...w...^...#. 0001C0
 135F0005 04E40012 033A0203 00320008 098F0103 13B00002 14370005 05D80013 ..Ä...7...¯.......2...:...ö..._. 0001E0

Dump of file SATURN:[PCCOMMON.DUMP.DLL]SA-PDLED.DLL;1 on 18-APR-1990 10:51:30.28
File ID (436,15,0)   End of file block 133 / Allocated 136

Virtual block number 38 (00000026), 512 (0200) bytes

 FEE486C7 D88EFFFF B81E5657 00011CC8 00000000 0FBF0002 12FA0005 11370002 ..7...°...¢.....à...WV.|...Äú.ö± 000000
 16FC468D 1A76FF0E 76FF1076 FF0A76FF 0C76FFFE EA8689FE EC868900 00B80000 ..|....§±..ö±.v..v..v..v..v..F=. 000020
 FF0A76FF 0C76FF01 B3E9FEE4 868B0007 E9037500 0030FEE4 86890000 FFFF9A50 P.......ö±=..u.Õ....ö±Õ°..v..v.. 000040
 018CE9FF FFB80006 E9037500 003D0000 FFFF9A50 16F84680 1A76FF0E 76FF1076 v..v..v..F%.P.....=..u.Õ..|..Õ.. 000060
 E9F65689 F44689FA 5688F846 8B0000FF FF9A1E76 FF2076FF 027D87FF 26065EC4 ó^.&.ñ)..v .v.......F%.V°.F¶.V-Õ 000080
 FF26F45E C40A76FF 0C76FF01 40E90375 02470826 07B826F4 5EC404F4 46830004 ...F¶.ó^¶&..&.G.u.Õ@..v..v.ó^¶&. 0000A0
 5EC40117 E90003E9 03750000 300000FF FF9A5016 FEF2868D 1C76FF37 FF260277 w.&.7.v...·±.P.....=..u.Õ..Õ..ó^ 0000C0
 8D5A6A02 7D87FF26 065EC400 0001009A 5016FEE6 86800C6A 5A6A027D B7FF2606 .&.ñ).jZj...|±.P.....ó^.&.ñ).jZ. 0000E0
 00FFFF9A 50520002 05FEE896 88FEE686 88504004 C4830126 053A9A50 16FEF286 .·±.P.:.&..ó.@P..|±..Ò±...RP.... 000100
 26FEE69E C408C483 FFFF04DA 9A0277FF 260477FF 26FEE69E C45016FE F2868D00 ...·±.Pó.|±&.w.&.w..Ö....ó.ó.|±& 000120
 0A47C726 FEE69EC4 00010847 C726FEE6 9EC40001 0647C726 FEE69EC4 008607C7 ú.Ñ.ó.|±&úG...ó.|±&úG...ó.|±&úG. 000140
 FF261E5E C40000FF FF9A5016 FEEE8680 FEE686FF FEE8B6FF 1276FF14 76FF0001 ...v..v..ÑÒ±.Ñl±..Y±.P.....ó^.&. 000160
 FEEEB6FF FEF0B6FF 0000FFFF 9AFEEEB6 FFFEF0B6 FF006A00 6A006A37 FF260277 w.&.7j.j.j..Ñþ±.ÑY±......Ñþ±.ÑY± 000180
 FEEAB6FF FEECB6FF 002AE903 75FEEC86 0BFEEA86 880000FF FF9A1676 FF1876FF .v..v.........ö±..§±u.Õ*..Ñš±.Ñö± 0001A0
 FFFF9AFE EA86FFFE EC86FFFE EE86FFFE F086FF00 00FFFF9A FEEEB6FF FEF0B6FF .Ñþ±.ÑY±......Ñþ±.ÑY±.Ñš±.Ñö±... 0001C0
 76FFFA76 FF0A76FF 0C76FFFE ADE9FEEC 9689FEEA 8689FEF0 968BFEEE 86880000 ....Y±..þ±..ö±..§±ÕU±.v..v..v°.v 0001E0
```

Dump of file SATURN:[PCCOMMON.DUMP.DLL]SA-PDLED.DLL;1 on 18-APR-1990 10:51:30.28
File ID (436,15,0)   End of file block 133 / Allocated 136

Virtual block number 39 (00000027), 512 (0200) bytes

```
0000B8D8 8E000888 1E565700 033AC8C8 C95F5E1F 0000E900 00880000 FFFF9AF8 ½.....¡..Õ...^_èùà:..WV.¡...Ä¡.. 000000
FFFDECB6 FFFDEC96 89FDEA86 8910578B 260E478B 26065EC4 FCDC8689 FCDE8689 ..ß•..É•á^.&.G.&.W...õ»..š».Ñš». 000020
0007E903 75000030 FCDA8689 0000FFFF 9A5016FE F6868D50 16FDF286 8DFDEA86 Ñõ»..·».P..-±.P.......Ö•=..u.Õ.. 000040
0E76FF10 76FF0000 007F9A50 16FDEE86 8D027DB7 FF26065E C4040AE9 FCDA868B ..Ö•Õ..á^.&.ñ)...Ÿ».P......v..v. 000060
468B0000 FFFF9A50 16FDE686 8D0E76FF 1076FF00 00FFFF9A FDEEB6FF FDF0B6FF .ÑÞ».ÑŸ»......v..v...Ì».P......F 000080
0B001AE9 001DE900 03FE46C7 0025E900 02FE46C7 002DE900 01FE46C7 001BE912 .Õ..úF±..Õ-.úF±..Õ%.úF±..Õ..Õ... 0000A0
E4068E00 6A006AFF C8E9FFDE E9037500 0230FFDE E9037500 0130FFDE E90375C0 äu.ÕB.=..u.ÕB.=..u.ÕB.Õù.j.j...Õ 0000C0
6A027DB7 FF26065E C40000FF FF9A5016 FEFA868D 010068FE 76FF0200 36FF262A *&.6...v±h....ª±.P.....á^.&.ñ).j 0000E0
0304C483 032F053A 9AF08B51 16FDF28E 8D04C483 030A053A 9A5016FE FA868D5A Z..ª±.P.:.....á...·».Q.Þ.:./..á.. 000100
45040A9A FCD2B6FF FCD4B6FF 5016FDF2 868D0000 00E19A50 16FCD286 8D5040C6 6ãP..Ø•.P.Ã......·».P.Ñå•.ÑØ•.Õ.E 000120
868BFDE6 9EC408C4 8300F804 949AFCD2 B6FFFCD4 B6FF5016 FEFA868D 08C48303 ..á...ª±.P.Ñå•.ÑØ•...½..á.á.Ì».. 000140
0A47C726 FDE69EC4 00010847 C726FDE6 9EC40457 89260247 8926FCD4 968BFCD2 Ø•..å•&.G.&.W.á.Ì»&úG...á.Ì»&úG. 000160
FFFDEC96 89FDEA86 8914578B 2612478B 26065EC4 00010647 C726FDE6 9EC40000 ..á.Ì»&úG...á^.&.G.&.W...õ»..š». 000180
0281E9FF FFB80006 E9037500 00300000 FFFF9A50 16FCCA86 8DFDEAB6 FFFDECB6 Ñš».Ñõ»..ò•.P.....=..u.Õ..¡..ÕŸ. 0001A0
75000030 00000032 9A5016FA 468D186A FCCAB6FF FCCCB6FF FDEAB6FF FDECB6FF .Ñš».Ñõ».Ñä•.Ñò•j..Fª.P.2...=..u 0001C0
FCCE868D 186AFCCA B6FFFCCC B6FFFDEA B6FFFDEC B6FF0287 E9FFFFB8 0006E903 .Õ..¡..Õ...Ñš».Ñõ».Ñä•.Ñò•j...ö• 0001E0
```

Dump of file SATURN:[PCCOMMON.DUMP.DLL]SA-PDLED.DLL;1 on 18-APR-1990 10:51:30.28
File ID (436,15,0)   End of file block 133 / Allocated 136

Virtual block number 40 (00000028), 512 (0200) bytes

```
C68689FC D0968BFC CE868B02 5CE9FFFF 880006E9 03750000 3D000000 5E9A5016 .P.^...=..u.Õ..¡..Õ\...ö•..Å•..6 000000
ECB6FF02 19E90375 02470B26 078B26FC C69EC404 FCC68683 0005E9FC C89689FC •..à•Õ....ó•.á.ó•&..&.G.u.Õ...Ñš 000020
00003D00 00008F9A 5016FCE0 868D026A 37FF2602 77FF26FC C69EC4FD EAB6FFFD ».Ñõ»á.ó•&.w.&.7j...Å•.P.¢...=.. 000040
C4000004 999A5016 FCD6868D 0C6A5A6A 027DB7FF 26065EC4 01EEE900 03E90375 u.Õ..ÕŸ.á^.&.ñ).jZj...ø•.P.....á 000060
8BFCD686 8B500002 0504C483 04C1053A 9A5016FC E0868D5A 6A027DB7 FF26065E ^.&.ñ).jZ..Å•.P.:.ê..á....P..ø•. 000080
C45016FC E0868D20 07C62602 5FC426FC D69EC400 00031A9A 50520002 05FCD896 .Å•...RP.....á.ø•&á_.&á. ..Å•.Pá 0000A0
C4008707 C726FCD6 9EC408C4 8302FA04 DA9A5052 4004578B 2602478B 26FCD69E .ø•&.G.&.W.ãRP.Õ.ª..á.á.ø•&ú.ñ.á 0000C0
0C76FF00 010A47C7 26FCD69E C4000008 47C726FC D69EC400 010647C7 26FCD69E .ø•&úG...á.ø•&úG...á.ø•&úG....v. 0000E0
006AFDEE B6FFFDF0 B6FF0000 01679A50 16FDE286 8DFCD686 FFFCD886 FF0A76FF .v..ÑÄ•.Ñø•..ã».P.g....ÑÞ».ÑŸ»j. 000100
9A0E76FF 1076FFFD E2B6FFFD E4B6FF00 0001849A FDE2B6FF FDE4B6FF 006A006A j.j..Ñõ».Ñã»......Ñõ».Ñã».v..v.. 000120
E2B6FFFD E4B6FFFC DCB6FFFC DEB6FF00 2AE90375 FCDE860B FCDC868B 00000197 ......É•..B•u.Õ*..ÑB•.ÑÉ•.Ñõ».Ñã 000140
A8E91246 8B000001 CE9AFCDC B6FFFCDE B6FFFDE2 B6FFFDE4 B6FF0000 01B99AFD ».¿....Ñõ».Ñã».ÑB•.ÑÉ•.ö....F.Õ¨ 000160
FCC69EC4 0A76FF0C 76FFFDE2 B6FFFDE4 B6FF156A 026A5016 FEF2868D 00BFE900 .Õ¢...·±.Pj.j..Ñõ».Ñã».v..v.á.ó• 000180
E4B6FF1C C48305F9 00009A06 76FF0876 FFFDEAB6 FFFDECB6 FF37FF26 0277FF26 &.w.&.7.Ñš».Ñõ».v..v....ª..á..Ñõ 0001A0
FF196A02 6A5016FE F2868D00 6EE90000 060F9AFE F2B6FFFE F4B6FFFD E2B6FFFD ».Ñã».Ñ¶±.Ñ·±.....Õn...·±.Pj.j.. 0001C0
FDEAB6FF FDECB6FF 37FF2602 77FF26FC C69EC40A 76FF0C76 FFFDE2B6 FFFDE4B6 Ñõ».Ñã».v..v.á.ó•&.w.&.7.Ñš».Ñõ» 0001E0
```

Dump of file SATURN:[PCCOMMON.DUMP.DLL]SA-PDLED.DLL;1 on 18-APR-1990 10:51:30.28
File ID (436,15,0)   End of file block 133 / Allocated 136

Virtual block number 41 (00000029), 512 (0200) bytes

```
799AFEF2 B6FFFEF4 B6FFFDE2 B6FFFDE4 B6FF1CC4 83FFFF00 009A0676 FF0876FF .v..v.......á..Ñõ».Ñã».Ñ¶±.Ñ·±.y 000000
FF95E903 75000230 FF4CE903 7500013D FF51E903 75C00B00 1AE9001D E9000002 ...Õ..Õ...áu.ÕQ.=..u.ÕL.=..u.Õ.. 000020
B6FFFDEA B6FFFDEC B6FFFDD2 E9FCDE96 89FCDC86 89FDE496 8BFDE286 8BFF3EE9 Õ>...ã»..õ»..É•..B•ÕØ».Ñš».Ñõ».Ñ 000040
0209B81E 56570000 0CC8C8C9 5F5E1F00 00E90000 88000001 F29AFCCE B6FFFCD0 Å•.Ñö•.·...¡..Õ...^_èùà...WV.¡.. 000060
8DF476FF F676FF00 00FFFF9A 5016F446 8D0293B7 FF260295 B7FF260A 5EC4D88E .Äá^.&.ñ..&.ñ...F¶.P̄......v-.v¶. 000080
880000FF FF9A5016 F4468D01 6A006A00 6AF876FF FA76FF00 00070F9A 5016F846 F½.P......vª.v½j.j.j..F¶.P...... 0000A0
0375F646 0BF4468B F65689F4 46890AF7 908B260A F5808B26 0A5EC402 E6C10676 v.èÌ.á^.&..%.&..%..F¶.V-.F¶.F-u. 0000C0
7FE90374 07392606 468BFC5E C4000002 8A9A5016 FC4680F4 76FFF676 FF0090E9 Õ...v-.v¶.F•.P.....á^•.F.&9.t.Õ. 0000E0
FF9A5016 F8468DF4 76FFF676 FF000106 47C726FC 5EC40000 0A47C726 FC5EC400 .á^•&úG...á^•&úG....v-.v¶.F½.P.. 000100
C40047E9 04C483FF FF072E9A F876FFFA 76FF0011 E90375FA 460BF846 880000FF ....F½.Fªu.Õ...vª.v½......á.ÕG.á 000120
76FF0293 B7FF2602 95B7FF26 0A5EC4F4 76FFF676 FF0876FF 00010847 C726FC5E ^•&úG....v..v-.v¶á^.&.ñ..&.ñ...v 000140
0006E900 008804C4 83072714 009AF476 FFF676FF 0EC48305 A802019A 0A76FF0C ..v....´..á..v-.v¶...'..á.¡..Õ.. 000160
68016A06 76FF0876 FFD88E06 6EB81E56 57000000 C8C8C95F 5E1F0000 E90000B8 ¡..Õ...^_èùà...WV.¡n..Ã.v..v.j.h 000180
76FFD88E 0783B81E 56570000 00C8C8C9 5F5E1F00 00E908C4 83075706 669A00B6 Ñ..f.W..ã.Õ...^_èùà...WV.¡...Á.v 0001A0
1E565700 0000C8C8 C95F5E1F 0000E908 C4830795 06669A00 B768006A 0676FF08 ..v.j.hñ..f....ã.Õ...^_èùà...WV. 0001C0
CBC95F5E 1F0000E9 08C48307 BC06669A 008C6802 6A0676FF 0876FFD8 8E07AAB8 ¡¯..Á.v..v.j.h¥..f.¥..ã.Õ...^_èù 0001E0
```

```
Dump of file SATURN:[PCCOMMON.DUMP.DLL]SA-PDLED.DLL;1 on 18-APR-1990 10:51:30.28
File ID (436,15,0)   End of file block 133 / Allocated 136

Virtual block number 42 (0000002A), 512 (0200) bytes

000307E3 00020000 00020765 00020576 00120552 02030388 000F0266 02030017 ....f.......R...v...e.......D... 000000
00070482 000203A0 000F06A8 02030506 001205BE 020301B9 000B0240 02030000 ....a...¿.../..................... 000020
000907D1 000201CB 000B03C8 020303A8 000F051D 02030590 0012060F 02030000 ....Ö..............à...ù...ì... 000040
000B03F3 0203025B 000C046B 020301D9 000B0449 0203051D 00120695 02030000 ............I...)...k...[...µ... 000060
000902E3 01030200 00080657 020304C6 00120685 02030534 00120530 020301E7 Ó...0...4.......6...W.......D... 000080
00000000 000001A5 0008039E 020304E4 00120502 0203055E 00120567 0203009D ....g...^.......ô.......E....... 0000A0
1076FF06 76FF0876 FF0014E9 03750846 0B06468B D88EFFFF B81E5657 000000C8 à...WV.|...Á.F..F.u.Õ...v..v..v. 0000C0
60053A9A 0E76FF10 76FF001D E903750C 46080A46 8B08C483 003F04DA 9A0E76FF .v..Ö.?..á..F..F.u.Õ...v..v..:.m 0000E0
0012E903 7400027F 80260E5E C40000E9 03745CFF 7880260E 5EC4F08B 04C48300 ..á..Þá^.&.x.\t.Õ..á^.&....t.Õ.. 000100
0C76FF00 14E90375 0C46080A 468B08C4 83008C04 949A0E76 FF1076FF 0060681E .h'..v..v.......á..F..F.u.Õ...v. 000120
0008B81E 56570001 1EC8CBC9 5F5E1F08 C483FFFF 04949A0E 76FF1076 FF0A76FF .v..v..v.......á..^_èùà...WV.|.. 000140
685016FE E2868D31 6A5016FE 46800676 FF0876FF FFFFFE46 C70001FA 46C7D88E .ÄúF*..úF±...v..v..F±.Pj1..ã±.Ph 000160
FC46C700 05E90374 899CFC7E 81FC4689 0000FFFF 9A006A00 6A5016FA 46800117 ...F*.Pj.j.......F=.~=..t.Õ..úF= 000180
03E90000 FE46C7D8 8E009E88 1E565700 0002C8CB C95F5E1F 0000E9FC 46880003 ...F=Õ...^_èùà...WV.|...ÄúF±..Õ. 0001A0
87F6FF2A 188A2606 76C4FE5E 880038E9 03750038 80260676 C4FE5E88 FE46FF00 ..F±.^±áv.Ï.8.u.Õ8..^±áv.&..*.-. 0001C0
88008A26 0676C4FE 5E880009 E9202C00 8A260676 C4FE5E88 000EE903 75020E49 I..u.Õ...^±áv.&.., Õ...^±áv.&... 0001E0

Dump of file SATURN:[PCCOMMON.DUMP.DLL]SA-PDLED.DLL;1 on 18-APR-1990 10:51:30.28
File ID (436,15,0)   End of file block 133 / Allocated 136

Virtual block number 43 (0000002B), 512 (0200) bytes

56570003 3EC8CBC9 5F5E1F00 00C6260A 76C4FE5E 88FFB6E9 0088260A 76C4FE5E ^±áv.&..ÕÑ..^±áv.&6...^_èùà>..WV 000000
FF9A5016 FEDE868D 146A0E76 FF1076FF 0000FE46 C70001FA 46C7D88E 00F5881E .|%..ÄúF*..úF±...v..v.j...ß±.P.. 000020
00ED9A50 16FEDE86 8D5016FD DA868001 C3E986ED B80006E9 03750000 300000FF ...=..u.Õ..|Ú.Õù...Ö».P..ß±.P.Ú. 000040
FF0676FF 0876FF00 00FFFF9A 5016FDDA 86800A76 FF0676FF 0876FF08 C48301F5 %..á..v..v..v...Ö».P......v..v.. 000060
FFFF9A50 16FEF286 8D5016FC 46800000 02A79A00 6A006A00 6A006A01 6E680C76 v.hn.j.j.j.j..Ï....F=.P...±.P... 000080
8DFFFFF8 46C70CC4 83FFFF00 009A0E76 FF1076FF 0062681E 5016FEF8 86800000 ....¥±.P.hb..v..v.......á.úF%... 0000A0
CC9A006A 006A5016 FA468D01 17685016 FCC2868D 106A5016 F8468D50 16FEF886 .¥±.P.F%.Pj...ô=.Ph...F*.Pj.j..ä 0000C0
E9037510 FCD686F6 FEDC968C FEDA8689 FCD9868D 0098E903 7500FA7E 83000000 ....~*.u.Õ....ì=..Ö±..É±-.ø=.u.Õ 0000E0
681E004D E9037500 003D08C4 83026D05 109AFEDA B6FFFEDC B6FF0066 681E0069 i..hf..ÑÉ±.ÑÖ±...m..á.=..u.ÕM..h 000100
B6FFFEDC B6FF0031 E9037500 003D08C4 83028805 109AFEDA B6FFFEDC B6FF0069 i..ÑÉ±.ÑÖ±......á.=..u.Õ1..ÑÉ±.Ñ 000120
FE6A006A 0161680C 76FF0676 FF0876FF 08C48303 3104DA9A 5016FDDA 8680FEDA Ö±..Ö».P.Ö.1..á..v..v..v.ha.j.j± 000140
00FFFF9A 5016FA46 80011768 5016FCC2 8680F876 FF000002 EE9A5016 FDDA868D ..Ö».P.Ÿ....v¼..ô=.Ph...F*.P.... 000160
FF0676FF 0876FF00 19E90375 00037F80 260E5EC4 0000FFFF 9AF876FF FF5FE900 .Õ_..v¼.....á^.&....u.Õ...'..v.. 000180
AED1FEF6 86FE000C E941FEF6 86C60000 034D9A00 68681E00 6A006A01 61680C76 v.ña.j.j..hk..M...ó.-±AÕ...  -±ìÛ 0001A0
F6868A00 34E90374 013C0124 FEF2868A 0044E903 765AFEF6 BE80FEF2 9ED1FEF4 ¶±ì.·±./-±Zv.ÕD...·±$.<.t.Õ4...- 0001C0
680C76FF 0676FF08 76FF0AC4 83002605 B89A5016 FDDA868D 006E681E 50E42AFE ±*ÕP.hn...Ö».P.|.&..á..v..v..v.h 0001E0

Dump of file SATURN:[PCCOMMON.DUMP.DLL]SA-PDLED.DLL;1 on 18-APR-1990 10:51:30.28
File ID (436,15,0)   End of file block 133 / Allocated 136

Virtual block number 44 (0000002C), 512 (0200) bytes

1E565700 0320C8CB C95F5E1F FFA6E900 00FFFF9A 5016FD0A 868DFF6A 006A0161 a.j.j...Ö».P.....Õì..^_èùà ..WV. 000000
00FFFF9A 5016FCE0 86800100 680A76FF 0676FF08 76FF0001 FC46C7D8 8E0162B8 |b..ÄúF=...v..v..v.h....Á=.P.... 000020
7400FCE0 8E800000 04509A00 6A006A00 6A006A01 6E680C76 FF0676FF 0876FF00 ..v..v..v.hn.j.j.j.j..]..../Á=.t 000040
76FF0676 FF0876FF 08C48302 5104DA9A 5016FCE0 868D1276 FF1476FF 002BE903 .Õ(..v..v...Á=.P.Õ.Q..á..v..v..v 000060
009A0E76 FF1076FF 5016FCE0 868D5016 FDE0868D 000001B5 9A5016FC E086800A ...Á=.P.ç.....Á».P..Á=.P.v..v... 000080
17685016 FEE0868D 176A5016 FE468D50 16FDE086 8DFFFFFE 46C70CC4 8301A000 ....á.úF±....Á».P.F±.Pj...Á±.Ph. 0000A0
8CF84689 FEF7868D 0062E903 7500FC7E 83000002 1F9A006A 006A5016 FC468D01 ..F=.Pj.j.......~=.u.Õb...¥±.F%. 0000C0
017F8026 F85EC400 0DE90374 2E3F8026 F85EC400 34E90374 1111FEF4 86F7FA56 V*%.¶±..t.Õ4.á^½&.?.t.Õ..á^½&... 0000E0
0001CE9A F876FFFA 76FFFE6A 006A0161 680C76FF 0676FF08 76FF0018 E9037500 .u.Õ...v..v..v.ha.j.j±.v*.v¼.ö.. 000100
02C89AFE 76FFFF95 E9000002 BD9A5016 FC468001 17685016 FEE0868D FE76FF00 ..v±..Á±.Ph...F=.P.§...Õ...v±.à. 000120
04B50638 9A0C76FF 0E76FF2A 6AD88E03 61881E56 57000164 C8CBC95F 5E1F0000 ...^_èùàd..WV.|a..Äj*.v..v..8.ç. 000140
11E90375 D00B06C4 8304F906 389A0C76 FF0E76FF 3F6A0017 E9037400 0806C483 .á..Ït.Õ..j?.v..v..8.*..á..Áu.Õ. 000160
ED9A0C76 FF0E76FF 5016FE9C 86800A46 8904C483 04E10096 9A0C76FF 0E76FF00 ..v..v....Á..á..F....±.P.v..v..Ú 000180
006A08C4 83053004 949A5016 FE9C868D 0074681E 0081E90A 468808C4 8303E100 .Ä..á..F.ÕŸ..ht....±.P...0..á.j. 0001A0
0015B800 0005509A 206A006A 1076FF12 76FF5016 FE9C868D 0676FF08 76FF016A j..v..v....±.P.v..v.j.j .P...|.. 0001C0
8D0676FF 0876FF01 6A006A08 C4830565 04949A50 16FE9C86 8D008968 1E008DE9 Õ§..h.....±.P...e..á.j.j..v..v.. 0001E0
```

```
Dump of file SATURN:[PCCOMMON.DUMP.DLL]SA-PDLED.DLL;1 on 18-APR-1990 10:51:30.28
File ID (436,15,0)   End of file block 133 / Allocated 136

Virtual block number 45 (0000002D), 512 (0200) bytes

 FF0E76FF 2A6A0086 E90015B8 0000FFFF 9A206A00 6A1076FF 1276FF50 16FE9C86 ..±.P.v..v.j.j .....|..Õ..j*.v.. 000000
 C48303B3 06389A0C 76FF0E76 FF3F6A00 17E90374 D00B06C4 83057C06 389A0C76 v..8.|..á..Àt.Õ..j?.v..v..8.°..á 000020
 00123D00 43E90046 E90A4688 004CE900 01B80052 E9000088 0006E903 75D00B06 ..Àu.Õ..|..ÕR.|..ÕL..F.ÕF.ÕC.=.. 000040
 00153DFF D7E9FF32 E9037500 033DFFA8 E9037500 023D0013 E90376FF 85E90375 u.Õç.v.Õ..=..u.Õ´.=..u.Õ2.Õ■.=.. 000060
 FFB4E9FF 46E90375 00D03DFF 4EE90375 00CE3DFF 1FE90375 006B3DFF 27E90375 u.Õ'.=k.u.Õ..=ö.u.ÕN.=Å.u..F.ÕÇ. 000080
 E90E4688 FC9C8689 FC9E8689 000088D8 8E048FB8 1E565700 036AC8C8 C95F5E1F .^_èüàj..WV.|...Å|.....■....F.Õ 0000A0
 52000006 CD9A006A 036A016A 006A016A 006AFC56 89FA4689 08568806 46880AA6 Ì..F..V..F*.V■j.j.j.j.j.j..ë...R 0000C0
 9A0676FF 0876FF00 6A1076FF 1276FF00 00FFFF9A 1076FF12 76FF0000 06D49A50 P.å....v..v.......v..v.j..v..v.. 0000E0
 FA468800 0003C89A 50520EEE 05FC5688 FA468801 2E681076 FF1276FF 0000FFFF .....v..v.h...F*.V■.Ÿ.RP.à....F* 000100
 8BFA4688 0CC48306 A1015A9A 1076FF12 76FF0130 68013468 505200ED 05FC5688 .V■.Ú.RPh4.h0..v..v..Z.À..á..F*. 000120
 599A1076 FF1276FF 012E6801 32685052 0DED05FC 568BFA46 8B50520E EE05FC56 V■.Ÿ.RP.F*.V■.Ú.RPh2.h...v..v..Y 000140
 00000396 9A006A00 6A010068 006A0143 68012E68 1076FF12 76FF10C4 8304CA03 .ò..á..v..v.h..hC.j.h..j.j...... 000160
 8E006A00 6A09F8E9 0000FFFF 9A505200 00FFFF9A 006A016A 016A006A 016A006A j.j.j.j.j.j......RP.....Õ½.j.j.. 000180
 76FF1276 FF016A00 6A0000FF FF9A5016 A6468D50 6A044F68 020036FF 262AE606 .Ì*&.6..hO.jP.FÌ.P.....j.j..v..v 0001A0
 006A206A 1076FF12 76FF09BD E9000005 199A206A 006A006A 006A5016 A6468D10 ..FÌ.Pj.j.j.j .....Õ§..v..v.j j. 0001C0
 7E81000A E9037501 34A47E81 A446890A 468809A5 E90000FF FF9A016A 006A026A j.j.j......ÕE..F..FE.~Ê4.u.Õ...~ 0001E0

Dump of file SATURN:[PCCOMMON.DUMP.DLL]SA-PDLED.DLL;1 on 18-APR-1990 10:51:30.28
File ID (436,15,0)   End of file block 133 / Allocated 136

Virtual block number 46 (0000002E), 512 (0200) bytes

 76FF1276 FFFC5689 FA468900 00FFFF9A 006A1076 FF1276FF 0054E903 740132A4 Ê2.t.ÕT..v..v.j.......F*.V■.v..v 000000
 A476FF10 76FF1276 FFFE4689 00000798 9A006A00 6A006A00 6A016568 A476FF10 ..vÊhe.j.j.j.j.......F±.v..v..vÊ 000020
 E9A44688 000009F4 9A5016FE A2868D50 520100CA 81000000 D22BFE46 8B016868 hh..F±+Ø....ò..RP..Å±.P.¶....FÊÕ 000040
 868A0015 E903745B FEA28E80 02DEE900 03E90375 05A27E83 A246890C 468B02DD Ì..F..FÅ.~Å.u.Õ..ÕB../Å±[t.Õ.... 000060
 868D5052 0DED05FC 568BFA46 8B00FEA4 86C6FEA3 868BFEA4 868AFEA2 868BFEA3 È±..Å±..Ê±..Ê±6.Ê±..F*.V■.Ú.RP.. 000080
 868D5016 FEA2868D F8468900 0008DB9A 5016FCA0 868D5016 FDA2868D 5016FEA2 Å±.P..Å».P...■.P.Ü....F½..Å±.P.. 0000A0
 FFF876FF 5016FEA2 868D00A2 681E0CC4 83082800 009A5016 FDA2868D 5016FCA0 .■.P..Å».P...(..á..hÅ...Å±.P.v½. 0000C0
 1276FF01 6A006A00 1CE90375 00F87E83 F846890E C48308A1 04879A10 76FF1276 v..v....Å..á..F½.~½.u.Õ..j.j..v. 0000E0
 568BFA46 8B5016FD A2868002 3DE90000 0A0D9A50 5200000A 069A012E 681076FF .v.h.......RP.....Õ=....Å».P.F*.V 000100
 0DED05FC 568BFA46 8B013068 1076FF12 76FF08C4 83094004 DA9A5052 0DED05FC ■.Ú.RP.Õ.@..á..v..v.h0..F*.V■.Ú. 000120
 5A9A1076 FF1276FF 01306801 34685052 0DED05FC 568BFA46 8B000009 7B9A5052 RP.(....F*.V■.Ú.RPh4.h0..v..v..Z 000140
 FA468800 00037D9A 5016FEA2 868D0100 68012E68 1076FF12 76FF0CC4 8308F701 .%..á..v..v.h..h....Å±.P.)....F* 000160
 890000FF FF9A5016 FCA0868D 5016FDA2 868D5016 FEA2868D 505200ED 05FC568B .V■.Ú.RP..Å±.P..Å».P...■.P...... 000180
 0DAD681E 0CC48309 1200009A 5016FDA2 868D5016 FCA0868D 5016FEA2 868DF846 F½..Å±.P...■.P..Å».P......á..hÙ. 0001A0
 037500F8 7E83F846 890EC483 09990487 9A1076FF 1276FFF8 76FF5016 FEA2868D ..Å±.P.v½.v..v........á..F½.~½.u. 0001C0
 05109A50 520DED05 FC568BFA 46885016 FDA2868D 00B3E903 7401F87E 830009E9 Õ...~½.t.Õ°...Å».P.F*.V■.Ú.RP... 0001E0

Dump of file SATURN:[PCCOMMON.DUMP.DLL]SA-PDLED.DLL;1 on 18-APR-1990 10:51:30.28
File ID (436,15,0)   End of file block 133 / Allocated 136

Virtual block number 47 (0000002F), 512 (0200) bytes

 DA9A5052 0DED05FC 568BFA46 8B5016FD A2868D00 51E90375 00003D08 C4830961 a..á.=..u.ÕQ...Å».P.F*.V■.Ú.RP.Õ 000000
 8B000009 AE9A5052 0DED05FC 568BFA46 8B013068 1076FF12 76FF08C4 83049E04 ....á..v..v.h0..F*.V■.Ú.RP.Ú.... 000020
 76FF0CC4 83090701 5A9A1076 FF1276FF 01306801 34685052 0DED05FC 568BFA46 F*.V■.Ú.RPh4.h0..v..v..Z.■..á..v 000040
 FA468850 520EEE05 FC568BFA 468B0000 0A2D9A50 16FCA086 8D012E68 1076FF12 ..v.h.....■.P.-....F*.V■.Ÿ.RP.F* 000060
 FF0035E9 10C48306 7703599A 1076FF12 76FF012E 68013268 505200ED 05FC568B .V■.Ú.RPh2.h...v..v..Y.w..á.Õ5.. 000080
 FF1276FF 016A006A 0000068C 9A006A00 6A006A00 6A016E68 01326810 76FF1276 v..v.h2.hn.j.j.j.j..¥...j.j..v.. 0000A0
 1276FF00 49E90C46 8B007BE9 007EE900 00FFFF9A 50520000 FFFF9A01 2E681076 v.h.......RP.....Õ~.Õ(..F.ÕI..v. 0000C0
 A2868001 2E681076 FF1276FF 0045E900 000A449A 5016FEA2 868D012E 681076FF .v.h....Å±.P.D...ÕE..v..v.h....Å 0000E0
 0019E900 0007279A 016A006A 016A006A 206A1076 FF1276FF 00000659 9A5016FE ±.P.Y....v..v.j j.j.j.j..'...Õ.. 000100
 300013E9 0016E9FF E7E9FFBE E9037500 0530FFAF E9037500 013D0013 E90016E9 Õ..Õ..=..u.Õ€.=..u.Õ/.ÕÕ.Õ..Õ..= 000120
 8E006A00 6A05CCE9 0A468806 3EE90000 E9FD13E9 03750134 30FF90E9 03750132 2.u.Õ..=4.u.Õ.»Õ..Õ>..F.Õë.j.j.. 000140
 76FF1276 FF016A00 6A000006 F39A5016 A6468D50 6A044F68 020036FF 262AE606 .Ì*&.6..hO.jP.FÌ.P.æ...j.j..v..v 000160
 519A006A 1076FF12 76FF05AC E9000007 0F9A206A 006A006A 006A5016 A6468D10 ..FÌ.Pj.j.j.j .....Õ¯..v..v.j..Q 000180
 000008B9 9A5016FE A2868D01 0068012E 681076FF 1276FFFC 5689FA46 89000007 ....F*.V■.v..v.h..h....Å±.P.¿... 0001A0
 07F19A50 16FCA086 8D5016FD A2868D50 16FEA286 80505200 ED05FC56 8BFA4688 .F*.V■.Ú.RP..Å±.P..Å».P...■.P.þ. 0001C0
 1E0CC483 08550000 9A5016FD A2868D50 16FCA086 8D5016FE A28680F8 46890000 ...F½..Å±.P...■.P..Å».P...U..á.. 0001E0
```

```
Dump of file SATURN:[PCCOMMON.DUMP.DLL]SA-PDLED.DLL;1 on 18-APR-1990 10:51:30.28
File ID (436,15,0)   End of file block 133 / Allocated 136

Virtual block number 48 (00000030), 512 (0200) bytes

 F8468BF8 46890EC4 83089004 879A1076 FF1276FF F876FF50 16FEA286 8000B868 h¡...Å±.P.v½.v..v.......á..F½.F½ 000000
 C40491E9 00000C37 9A505200 000C309A 012E6810 76FF1276 FF016A00 6A0493E9 Õ..j.j..v..v.h...0...RP.7...Õ..á 000020
 83006000 ED9A5016 FEA2868D 50520FEF 05FC568B FA468800 0110F087 C726FA5E ^*&ú.Þ....F*.V•.ÿ.RP..Å±.P.Ú.'.. 000040
 6A00000C 019A5016 FC96868D 056A0451 68020036 FF262AE6 068E006A 006A08C4 á.j.j...Ì*&.6..hQ.j....•.P.....j 000060
 FC9C868B FC9E9689 FC9C8689 06C4830C 4F06389A 50520FEF 05FC568B FA4682E ..F*.V•.ÿ.RP.8.O..á....•...•...• 000080
 5016A646 80506A04 53680200 36FF262A E6068E00 6A006A00 55E90374 FC9E8608 ...•t.ÕU.j.j...Ì*&.6..hS.jP.FÌ.P 0000A0
 8900000C 8E9A206A 006A006A 006A5016 A6468001 6A006A01 6A006A00 000C749A .t...j.j.j.j..FÌ.Pj.j.j.j ...... 0000C0
 B6FF03D2 E900000C AA9A5052 00000CA3 9A012E68 1076FF12 76FF016A 006AA246 FÅj.j..v..v.h...È...RP.¯...Õ@..Ñ 0000E0
 006A006A 0055E903 7500003D 08C4830C EE05109A 5016FC96 8680FC9C B6FFFC9E .•.Ñ.•...•.P...Ÿ..á.=..u.ÕU.j.j. 000100
 016A006A 016A006A 00000AB3 9A5016A6 4680506A 04536802 0036FF26 2AE6068E ..Ì*&.6..hS.jP.FÌ.P.°...j.j.j.j. 000120
 681076FF 1276FF01 6A006AA2 46890000 0E659A20 6A006A00 6A006A50 16A6468D .FÌ.Pj.j.j.j .e....FÅj.j..v..v.h 000140
 061B9A00 6A016A01 6A006A01 6A006A03 5FE90000 0E229A50 5200000E 1B9A012E .......RP."...Õ_.j.j.j.j.j.j.... 000160
 037500FC A0BE8003 37E90000 FFFF9A01 6A1076FF 1276FF00 0006229A 50520000 ..RP."....v..v.j......Õ7..ƒ.•.u. 000180
 FCA0868D 2A6A0017 E90374D0 0806C483 00050638 9A5016FC A086803F 6A002EE9 Õ..j?...•.P.8....á..Åt.Õ..j*...• 0001A0
 FA468850 16FDA286 800000FD A086C701 18E90375 D00806C4 83002806 389A5016 .P.8.+..á..Åu.Õ..ú..»....Å».P.F* 0001C0
 46885016 FDA2868D 0060E903 7500003D 08C48300 4C05109A 505200ED 05FC568B .V•.Ú.RP...L..á.=..u.Õ'...Å».P.F 0001E0
```

```
Dump of file SATURN:[PCCOMMON.DUMP.DLL]SA-PDLED.DLL;1 on 18-APR-1990 10:51:30.28
File ID (436,15,0)   End of file block 133 / Allocated 136

Virtual block number 49 (00000031), 512 (0200) bytes

 00ED9A50 16FDA286 805016FE A2868D08 C4830086 04DA9A50 5200ED05 FC568BFA *.V•.Ú.RP.Õ.Ñ..á...Å±.P..Å».P.Ú. 000000
 05FC568B FA468800 0000F9A 5016FEA2 86800130 681076FF 1276FF08 C4830093 ...á..v..v.hO...Å±.P.Õ....F*.V•. 000020
 E9037400 FCA0BE80 0CC48300 CA015A9A 1076FF12 76FF0130 68013468 505200ED Ú.RPh4.hO..v..v..Z.ò..á../.•.t.Õ 000040
 16FEA286 8D08C483 0E4804DA 9A5016FC A0868D50 520EEE05 FC568BFA 46880019 ...F*.V•.Ÿ.RP...•.P.Õ.H..á...Å±. 000060
 839A5016 FEA2868D 012E6810 76FF1276 FF08C483 0E0800ED 9A5016FC A0868D50 P...•.P.Ú....á..v..v.h....Å±.P.. 000080
 FF012E68 01326850 5200ED05 FC568BFA 46885052 0EEE05FC 568BFA46 88000008 ....F*.V•.Ÿ.RP.F*.V•.Ú.RPh2.h... 0000A0
 52000008 479A012E 681076FF 1276FF01 6A006A10 C4830E37 03599A10 76FF1276 v..v..Y.7..á.j.j..v..v.h...G...R 0000C0
 0DC3681E 08C48308 0000ED9A 5016FEA2 868D5016 A6468001 E7E90000 084E9A50 P.N...ÕÖ..FÌ.P..Å±.P.Ú....á..hÚ. 0000E0
 0DE8681E 5016A646 8D1076FF 1276FF01 6A006A08 C4830869 04949A50 16A6468D .FÌ.P...i..á.j.j..v..v..FÌ.P.hÒ. 000100
 568BFA46 88000210 F087C726 FA5EC401 5AE90374 00013000 000ACF9A 116A006A j.j..ü...=..t.ÕZ.á^*&ú.Þ....F*.V 000120
 0036FF26 2AE6068E 006A006A 08C48308 3A00ED9A 5016FEA2 868D5052 0FEF05FC •.ÿ.RP..Å±.P.Ú.:..á.j.j...Ì*&.6. 000140
 389A5052 0FEF05FC 568BFA46 882E6A00 000EF39A 5016FC96 8680056A 04516802 .hQ.j....•.P.µ...j..F*.V•.ÿ.RP.8 000160
 8E006A00 6A0055E9 0374FC9E 8608FC9C 868BFC9E 9689FC9C 868906C4 8308CF06 .ü..á....•...•...•...•t.ÕU.j.j.. 000180
 80016A00 6A016A00 6A000008 8B9A5016 A6468050 6A045368 020036FF 262AE606 .Ì*&.6..hS.jP.FÌ.P.£...j.j.j.j.. 0001A0
 2E681076 FF1276FF 016A006A A2468900 000C1B9A 206A006A 006A006A 5016A646 FÌ.Pj.j.j.j ......FÅj.j..v..v.h. 0001C0
 109A5016 FC96868D FC9CB6FF FC9EB6FF 00E0E900 0008789A 50520000 0B719A01 ..q...RP.x...ÕÄ..Ñ.•.Ñ.•....•.P.. 0001E0
```

```
Dump of file SATURN:[PCCOMMON.DUMP.DLL]SA-PDLED.DLL;1 on 18-APR-1990 10:51:30.28
File ID (436,15,0)   End of file block 133 / Allocated 136

Virtual block number 50 (00000032), 512 (0200) bytes

 506A0453 68020036 FF262AE6 068E006A 006A0055 E9037500 003D08C4 830EC105 .ê..á.=..u.ÕU.j.j...Ì*&.6..hS.jP 000000
 9A206A00 6A006A00 6A5016A6 4680016A 006A016A 006A0000 0EAD9A50 16A6468D .FÌ.P.Ù...j.j.j.j..FÌ.Pj.j.j.j . 000020
 00000FE0 9A505200 000FD99A 012E6810 76FF1276 FF016A00 6AA24689 00000F00 .....FÅj.j..v..v.h...Ì...RP.Å... 000040
 76FF1276 FF000010 4D9A5052 00001046 9A006A01 6A016A00 6A016A00 6A006DE9 Õm.j.j.j.j.j.j..F...RP.M....v..v 000060
 9A505200 000F229A 012E6810 76FF1276 FF016A00 6A0019E9 0000105A 9A016A10 .j..Z...Õ..j.j..v..v.h..."...RP. 000080
 00013DFC DCE90375 C008001A E9001DE9 00ECE9FF FF8A86E8 B80029E9 00000F29 )...Õ).¡Š.¤..Õ£.Õ..Õ...áu.ÕÉ==.. 0000A0
 00000ADF 9A006A10 76FF1276 FF006FE9 FFD7E9FB 56E90375 00153DFB 7AE90375 u.Õz«=..u.ÕV«Õm.Õo..v..v.j..Õ... 0000C0
 6A006A01 6A006A00 0310F087 C726FA5E C4000FEF 87C626FA 5EC4FC56 89FA4689 .F*.V•á^*&ó.ÿ..á^*&ú.Þ...j.j.j.j 0000E0
 21E90000 0CD29A02 6A1076FF 1276FF00 000CC59A 50520000 0CBE9A00 6A016A01 .j.j..ƒ...RP.é....v..v.j..@...Õ¦ 000100
 E9FA1CE9 03750135 30FF9CE9 03750002 30FA67E9 03750001 30001BE9 001EE900 .Õ..Õ..=..u.Õg*=..u.Õ..=5.u.Õ.*Õ 000120
 E90000FF FF9A0676 FF0876FF 0A76FF0C 76FF0E76 FF1076FF 1276FF00 4EE9FFDF Õ.ÕN..v..v..v..v..v..v..v......Õ 000140
 F656E903 7500293D F623E903 7500223D F9E5E903 7500203D 002BE900 2EE9003A :.Õ..Õ+.= .u.Õ¦*=".u.Õ#-=).u.ÕV- 000160
 C95F5E1F 0000E900 008A0000 88FFB2E9 F532E903 75003B3D F666E903 7500303D =0.u.Õf-=;.u.Õ2%Õý.¡..¤..Õ...^_è 000180
 6A0676FF 0000FFFF 9A5016F8 46800676 FFD88E05 ED881E56 57000144 C8000ECA ò..àD..WV.¡Ú..Ä.v..F½.P......v.j 0001A0
 00FFFF9A 5016E246 805016FE 8E868006 76FF096A 0000FFFF 9A5016FE 8E868009 .../±.P.....j..v.../±.P.Fã.P.... 0001C0
 16FC468D E276FFE4 76FF0251 E9FEBC86 880007E9 037500FE BCBE83FE BC868900 ...¥±./¥±.u.Õ....¥±ÕQ..vÕ.vã.F•. 0001E0
```

```
Dump of file SATURN:[PCCOMMON.DUMP.DLL]SA-PDLED.DLL;1 on 18-APR-1990 10:51:30.28
File ID (436,15,0)   End of file block 133 / Allocated 136

Virtual block number 51 (00000033), 512 (0200) bytes

 C626085E C4022CE9 FEBC868B 0007E903 7500FEBC BE83FEBC 86890000 FFFF9A50 P.......¥±./¥±.u.Õ....¥±Õ,.á^.&6 000000
 EE468900 0012319A 006A006A 5016F046 8D505200 ED050A56 8B08468B 0000ED87 .Ú...F..V..Ú.RP.FÞ.Pj.j..1....FŸ 000020
 FEBC8689 0000FFFF 9A010168 50520DED 050A568B 08468B01 19E90374 10F046F6 -FÞ.t.Õ...F..V..Ú.RPh.........¥± 000040
 04F4468A 085EC400 0012559A 5016E646 8D5016F4 468D005B E9037500 FEBC8E83 ./¥±.u.Õ[..F¶.P.Fİ.P.U...á^..F¶. 000060
 8B006A01 00F646C7 5C0DEF87 C626085E C43A0DEE 87C62608 5EC400ED 87882640 ə&..Ú.á^.&6.Ÿ.:á^.&6.ÿ.\úF-..j.. 000080
 E986EBB8 0006E903 7500003D 0000FFFF 9A5016F6 46805052 0DF0050A 56880846 F..V..Þ.RP.F-.P.....=..u.Õ..¡Š.Õ 0000A0
 8B08468B 08C4830F 4104949A 50520DED 050A568B 08468B0D F3681E00 9DE90185 ..Õ...h«..F..V..Ú.RP...A..á..F.. 0000C0
 09E90374 00EE7E83 EE468900 00FFFF9A 006A006A 5016F046 8D50520D ED050A56 V..Ú.RP.FÞ.Pj.j.......FŸ.-Ÿ.t.Õ. 0000E0
 04F4468A 085EC400 0001DE9A 5016E646 8D5016F4 468D0058 E9037410 F046F600 .-FÞ.t.ÕX..F¶.P.Fİ.P.B...á^..F¶. 000100
 8B006A01 00F646C7 5C0DEF87 C626085E C43A0DEE 87C62608 5EC400ED 87882640 ə&..Ú.á^.&6.Ÿ.:á^.&6.ÿ.\úF-..j.. 000120
 E986EBB8 0006E903 7500003D 000011F0 9A5016F6 46805052 0DF0050A 56880846 F..V..Þ.RP.F-.P.Þ...=..u.Õ..¡Š.Õ 000140
 9AE276FF E476FF08 C483131F 04DA9A50 520EEE05 0A568B08 468B0DFB 681E00E5 İ..h«..F..V..Ÿ.RP.Ö....á..vö.vã. 000160
 0E8F68F8 76FFFA76 FF016A00 6A0000F2 46C70003 10F087C7 26085EC4 0000FFFF ....á^.&ú.Þ...úF·..j.j..v'.v½h.. 000180
 EC5689EA 46890000 FFFF9A08 76FF0A76 FF012C68 020036FF 262AE606 8EFFFF68 h....]*&:6..h,..v..v.......Fõ.Vš 0001A0
 4C040A9A 5016FEED 86805052 0FEF050A 56880846 880000FF FF9AEA76 FFEC76FF .vš.võ......F..V..ÿ.RP..Å±.P.Ö.L 0001C0
 468B5016 FEE0868D 0040E900 52E90452 B8002EE9 10F0878B 26085EC4 08C48313 ..á.á^.&..Þ.Õ..¡R.ÕR.Õə...Å±.P.F 0001E0

Dump of file SATURN:[PCCOMMON.DUMP.DLL]SA-PDLED.DLL;1 on 18-APR-1990 10:51:30.28
File ID (436,15,0)   End of file block 133 / Allocated 136

Virtual block number 52 (00000034), 512 (0200) bytes

 00013000 18E9002D E9FFFF88 0024E908 C4831217 040A9A50 520EEE05 0A568808 ..V..Ÿ.RP.Ö....á.Õ$.¡..Õ-.Õ..=.. 000000
 4DE90375 01F27E83 FFDCE9FF 8AE90375 00033DFF CBE90377 00023DFF EFE90373 s.Õÿ.=..w.Õú.=..u.Õα.ÕÉ..-·.u.ÕM 000020
 01030041 00080473 01030040 0008040B 01030023 CBC95F5E 1F0000E9 0000B8FF .|..Õ...^_èú#........ə...s...A... 000040
 00020045 00090A59 0103004B 00081179 01030668 0014017F 02030048 000811B5 ç...H.......h...y...K...Y...E... 000060
 01030000 000712B4 00020678 0014081E 0203004D 00090F9C 01030000 000412DE ß...........M........x...Ç....... 000080
 02030688 00141198 0203005C 00090FB7 01030000 000910EB 0002005B 00090F80 ¯...[...Š.......ñ...\........... 0000A0
 0103007C 00091307 0103007A 000912F6 0103007E 00071290 020300DC 000A10F8 ½...É.......-...-...z.......|... 0000C0
 010306A5 00151108 02030173 0008111D 0203007F 00090770 0103007E 00090FC4 á...-...p..........s.......É... 0000E0
 01030013 00090F95 0103008B 00090F80 01030087 00090AFC 01030086 00090075 u.......•......................... 000100
 0203001F 0009101C 0103001E 00090640 010305E5 000412E1 00050090 00090F66 f........Ā...İ...ə................. 000120
 010301A5 00081142 02030083 0009109B 01030658 0014062D 02030198 000812C0 å.......-...X.......•...B...Ë... 000140
 89000088 D88EFFFF 881E5657 00012CC8 00000000 00000000 0000003F 0008047E -...?...........à...WV.¡...Á¡... 000160
 0000FFFF 9A5016F4 468D027D B7FF2606 5EC4EA46 89EC4689 000088E2 4689E446 Fõ.Fã¡...Fš.Fõá^.&.ñ)..F¶.P..... 000180
 89EE4689 10578826 0E478826 065EC400 00FFFF9A F476FFF6 76FF0E76 FF1076FF .v..v..v-.v¶.....á^.&.G.&.W..FŸ. 0001A0
 00FFFF9A 006A37FF 260277FF 26065EC4 271E68EE 76FFF076 FF50160C 468DF056 VÞ.FÉ.P.vÞ.vŸh.'á^.&.w.&.7j..... 0001C0
 05085688 06468801 00680318 E9E0468B 0006E903 7500E07E 83E04689 10C48300 ..á..FÁ.-Á.u.Õ...FÁÕ..h...F..V.. 0001E0

Dump of file SATURN:[PCCOMMON.DUMP.DLL]SA-PDLED.DLL;1 on 18-APR-1990 10:51:30.28
File ID (436,15,0)   End of file block 133 / Allocated 136

Virtual block number 53 (00000035), 512 (0200) bytes

 76FFEE76 FFF076FF 0109E912 46880AC4 8300E005 8E9A5016 FED4868D 50520018 ..RP..å±.P...Å..á..F.Õ...vÞ.vŸ.v 000000
 46C702D0 E9FFFF88 0006E903 7500003D 000000FC 9A5016D8 468D036A DC76FFDE ß.vÉj..FÅ.P.•...=..u.Õ..|..ÕÅ.úF 000020
 76FFEE76 FFF076FF 00ECE908 C4830120 04949A50 16FED486 8D0E0268 1E0001F2 ·...h....å±.P... ..á.Õš..vÞ.vŸ.v 000040
 46C70290 E9FFFF88 0006E903 7500003D 0000013C 9A5016D8 468D056A DC76FFDE ß.vÉj..FÅ.P.<...=..u.Õ..|..Õ..úF 000060
 76FFEE76 FFF076FF 00ACE908 C4830160 04949A50 16FED486 8D0E0F68 1E0001F2 ·...h....å±.P...'..á.Õ˜..vÞ.vŸ.v 000080
 46C70250 E9FFFF88 0006E903 7500003D 0000017C 9A5016D8 468D046A DC76FFDE ß.vÉj..FÅ.P.|...=..u.Õ..|..ÕP.úF 0000A0
 76FFEE76 FFF076FF 006CE908 C48301A0 04949A50 16FED486 8D0E1D68 1E0001F2 ·...h....å±.P......á.Õl..vÞ.vŸ.v 0000C0
 46C70210 E9FFFF88 0006E903 7500003D 0000FFFF 9A5016D8 468D066A DC76FFDE ß.vÉj..FÅ.P......=..u.Õ..|..Õ..úF 0000E0
 23E901F0 E9FFFF88 002CE908 C48301F7 04949A50 16FED486 8D0E2C68 1E0001F2 ·...h,...å±.P...¥..á.Õ,.|..ÕÞ.Õ# 000100
 97E90375 00B93DFF 5FE90375 00B53DFF 27E90375 00B43DFE EFE90375 00AF3D00 .=£.u.Õÿ±=Ç.u.Õ'.=ç.u.Õ .=¿.u.Õ. 000120
 868D5A6A 027D87FF 26065EC4 0000FFFF 9A5016E6 46800E76 FF1076FF FFD4E9FF .Õå..v..v..Fİ.P.....á^.Ⅹ.ñ).jZ.. 000140
 5016FED4 868D0000 02A49A50 1604468D 50000205 04C48302 19053A9A 5016FED4 å±.P.:....á....P.Få.P.Ê.....å±.P 000160
 C4045789 26024789 26D6568B D44688E6 5EC408C4 83028B04 DA9AD476 FFD676FF .vø.vå.Õ.Ê..á.á^İ.Få.Vø&.G.&.W.á 000180
 DA5688D8 46880001 0647C726 E65EC400 000A47C7 26E65EC4 00000847 C726E65E ^İ&úG...á^İ&úG...á^İ&úG....FÅ.VÕ 0001A0
 FFF076FF 012CE903 7502470B 26078826 F85EC404 F8468300 04E9FA56 89F84689 .F½.V'Õ...F½.á^½&..&.G.u.Õ,..vÞ. 0001C0
 E9037400 003D0000 FFFF9A50 16FED486 8DF276FF 37FF2602 77FF26F8 5EC4EE76 vŸá^½&.w.&.7.v·..å±.P.....=..t.Õ 0001E0
```

Dump of file SATURN:[PCCOMMON.DUMP.DLL]SA-PDLED.DLL;1 on 18-APR-1990 10:51:30.28
File ID (436,15,0)   End of file block 133 / Allocated 136

Virtual block number 54 (00000036), 512 (0200) bytes

```
027DB7FF 26065EC4 000002D0 9A5016FC 468D0C6A 5A6A027D B7FF2606 5EC40103 ..6^.&.ñ).jZj..F*.P.Å...6^.&.ñ). 000000
9A505200 0205FE56 8BFC4688 50000205 04C48302 F6053A9A 5016FED4 86805A6A jZ..å±.P.:.-..6....P.F*.V±...RP. 000020
04578B26 02478B26 FC5EC450 16FED486 8D2007C6 26025FC4 26FC5EC4 0000FFFF ....6^*&6 .&6. ..å±.P6^*&.G.&.W. 000040
26FC5EC4 00010647 C726FC5E C4008707 C726FC5E C408C483 FFFF040A 9A505240 ∂RP.Ö....Ö.6^*&ú.ñ.6^*&úG...6^*& 000060
9A5016EA 468DFC76 FFFE76FF 0A76FF0C 76FF0001 0A47C726 FC5EC400 000847C7 úG...6^*&úG....v..v..v±.v*.Fö.P. 000080
76FFEC76 FF0000FF FF9AEA76 FFEC76FF 006A006A 006AF476 FFF676FF 0000FFFF .....v-.v¶j.j.j..vš.vö......vš.v 0000A0
EC76FFE2 76FFE476 FF0022E9 0375E446 08E24688 0000FFFF 9A0E76FF 1076FFEA ö.v..v.......Fä.Föu.Ö"..vö.vä.vš 0000C0
89EC5688 EA468B00 00FFFF9A E276FFE4 76FFEA76 FFEC76FF 0000FFFF 9AEA76FF .vö......vš.vö.vö.vä......Fö.Vš. 0000E0
C4D88E00 08B81E56 5700000C C8C8C95F 5E1F0000 E9000088 FEC1E9E4 5689E246 Fä.VöÖè±|..Ö...^_èùà...WV.|...Ä6 000100
16F8468D F476FFF6 76FF0000 FFFF9A50 16F4468D 0293B7FF 260295B7 FF26085E ^.&.ñ..&.ñ...F¶.P......v-.v¶.F½. 000120
C106768B 0000FFFF 9A5016F4 468D016A 006A006A F876FFFA 76FF0000 044C9A50 P.L....v*.v½j.j.j..F¶.P......v.ê 000140
0090E903 75F6460B F44688F6 5689F446 890AF790 88260AF5 80882608 5EC402E6 Ì.6^.&..¥.&..¥..F¶.V-.F¶.F-u.Ö.. 000160
5EC4007F E9037407 39260646 88FC5EC4 000001E0 9A5016FC 468DF476 FFF676FF .v-.v¶.F*.P.Å...6^*.F.&9.t.Ö..6^ 000180
0000FFFF 9A5016F8 468DF476 FFF676FF 00010647 C726FC5E C400000A 47C726FC *&úG...6^*&úG....v-.v¶.F½.P..... 0001A0
26FC5EC4 0047E904 C48304A2 072E9AF8 76FFFA76 FF0011E9 0375FA46 08F84688 .F½.F*u.Ö...v*.v½...Å..6.ÖG.6^*& 0001C0
76FF0A76 FF0293B7 FF260295 B7FF2608 5EC4F476 FFF676FF 0676FF00 000847C7 úG....v..v-.v¶6^.&.ñ..&.ñ...v..v 0001E0
```

Dump of file SATURN:[PCCOMMON.DUMP.DLL]SA-PDLED.DLL;1 on 18-APR-1990 10:51:30.28
File ID (436,15,0)   End of file block 133 / Allocated 136

Virtual block number 55 (00000037), 512 (0200) bytes

```
00008800 06E90000 B804C483 FFFF1400 9AF476FF F676FF0E C483FFFF 00009A08 .......6..v-.v¶......6.|..Ö..|.. 000000
03A39A00 AF680676 FF0876FF D88E03AB B81E5657 000000C8 CBC95F5E 1F0000E9 Ö...^_èùà...WV.|¨..Ä.v...v.h£..È. 000020
680676FF 0876FFD8 8E04C088 1E565700 0000C8CB C95F5E1F 0000E906 C4830494 ...6.Ö...^_èùà...WV.|å..Ä.v...v.h 000040
76FFD88E 04E5B81E 56570000 00C8CBC9 5F5E1F00 00E906C4 83040003 A39A0084 Ç..Ê.Å...6.Ö...^_èùà...WV.||..Ä.v 000060
0AB81E56 57000000 C8CBC95F 5E1F0000 E906C483 04F503A3 9A008568 0676FF08 ..v.hç..Ê.¥..6.Ö...^_èùà...WV.|. 000080
02030013 CBC95F5E 1F0000E9 06C48305 1A03A39A 00B96806 76FF0876 FFD88E05 ..Ä.v..v.h¿..Ê....6.Ö...^_èù.... 0000A0
02030000 0005053F 00020000 00020464 00020576 00120374 02030388 000F002C ,.......t...v...d.......?....... 0000C0
02030590 0012041C 02030000 0007009D 000203A0 000F03E8 02030506 0012003D *.......Ò....................... 0000E0
020301D9 00080286 02030510 001203D2 02030000 0009052F 000203A8 000F0347 G...¨.../........@...........)... 000100
020304C6 001203C2 02030534 00120358 020301E7 0008008C 0203025B 000C0206 ....[...¥...Ô...X...4...ô...6... 000120
00000000 00000000 00000473 00110060 020304E4 00120330 0203055E 00120385 ....^...0...ö...m...s........... 000140
00000000 00000000 00000800 02000200 01CB0001 881F0200 3E89088E FFFFB81E .|...Ä.>...|..ù................. 000160
830A47F6 26065EC4 FFFFBE56 000012C8 00000000 00000000 00000000 00000000 ...............à...V/..6^.&-G.. 000180
9A2D0646 8BF08804 C483005A 0FAE9A53 0600ADE9 0374400A 47F62600 B7E90375 u.Öñ.&-G.∂t.ÖÜ..S.Û.Z..6..Þ.F.-. 0001A0
C404C483 006C0E56 9A0676FF 0876FFFA 46892192 87880608 68F9F700 0CB99915 ..¿..¥'kÄ....!.F*.v..v..V.l..6.6 0001C0
8D0E4468 1E617400 FA7E8364 7CC00B02 C4830087 011E9A50 E42A0847 8A26065E ^.&.G.*6P......6..å|d.~'.ta.hD.. 0001E0
```

Dump of file SATURN:[PCCOMMON.DUMP.DLL]SA-PDLED.DLL;1 on 18-APR-1990 10:51:30.28
File ID (436,15,0)   End of file block 133 / Allocated 136

Virtual block number 56 (00000038), 512 (0200) bytes

```
1E13745C FE7F8026 FC5EC4FE 568CFC46 89F2468D 08C48300 AB040A9A 5016F046 FÞ.P.Ö.¨..6..F·.F*.V±6^*&..±\t.. 000000
FA76FFFC 76FFFE76 FF0A6AFC 4EFF03EB 08C48300 C304949A 5016F046 8D0E4668 hF..FÞ.P...û..6.Š..N*j..v±.v*.v* 000020
26065EC4 FFFFBE03 74C00B04 C483FFFF 1B2A9A50 16F0468D 08C48300 D01B0E9A ...Å..6..FÞ.P.*....6..åt./..6^.& 000040
FE76FF1B 74D00BFE 5689FC46 8901101A B89A0000 04C890CB C95EC68B 000A47C6 6G...6^èù.à....|....F*.V±.Åt..v± 000060
885590CB C999C02B 9004EB0C C4830034 0E9C9A06 76FF0876 FF0A76FF 0C76FF50 P.v..v..v..v....4..6.Š..+à.èù.U. 000080
C6F375C0 850000FF FF9A5308 6EE90B62 E9C03300 09BA0B72 27901E3B 065E8BEC ß.^.;..'r.¤..3åÖb.Ön.S......åuµ6 0000A0
52F8568D 1652FE56 8D160676 FF0876FF 40B70EEC 83EC8855 CB5DE58B 00279F87 ..'..Ì]ùU.š.š.ñ∂.v..v...V·R..V¥R 0000C0
80227402 00A92A75 0400A910 CA800874 0100A90A 468B018A E80C4E8B 52520233 3ØRR.N.Ò...F.`..t..ò.`..u" ..t". 0000E0
EBFE4E8B 087558C0 850000FF FF9A5050 C0335016 0676FF08 76FFFE46 8D5002CA ò.P.F±.v..v..P3åPP......åXu..N±Š 000100
C2F60E75 006E3D16 74C00B00 00FFFF9A 5050C033 50C70A00 03255251 01CA8003 ..ò.ØR%...úP3åPP......åt.=n.u.-6 000120
18BA0000 01379A50 0072279D 063BFE46 8B008DE9 0ACBE900 11BA0374 0002BAF0 Þ¤..t.¤..Öà.Ö...F±;..'r.P.7...¤. 000140
C9330A46 886175C0 0B0000FF FF9A50F8 468D1653 F45E8D16 50008BE4 EBC03300 .3åŠö.ÅP..^¶S..F¥P......åuø.F.3è 000160
F446C607 75013CF4 468AF24E 8880B102 75800F91 06F60775 4000A90E 758000A9 `..u.`.∂u.-....u.Ÿ..N·.F¶<.u.6F¶ 000180
52737400 020A46F7 7A74C90A F44688C0 320083E9 08F446C6 0775023C 008EE940 ∂Ö..<.u.6F¶.Ö..2å.F¶.èt±¼F...tsR 0001A0
330A44E9 03740083 300C74C0 0B0000FF FF9A50FA 46801651 00028951 51FFFFB9 ¿..ØQ¿..Q..F*P......åt.*..t.ÖD.3 0001C0
3274F846 392375C0 0B0000FF FF9A50F8 468D1650 0001B850 F6468D16 524FEBC0 åŠOR..F-P¡..P..F¥P......åu#9F½t2 0001E0
```

```
Dump of file SATURN:[PCCOMMON.DUMP.DLL]SA-PDLED.DLL;1 on 18-APR-1990 10:51:30.28
File ID (436,15,0)   End of file block 133 / Allocated 136

Virtual block number 57 (00000039), 512 (0200) bytes

 3352BE75 C0080000 FFFF9AFA 76FFFC76 FF00FC5E 8301FA6E 83521875 1AF67E83 .~-.u.R.n*..^=..v=.v*......âu/R3 000000
 0676FF08 76FF2875 48C1F6F4 4E8AAA75 C0080000 024F9A50 FA468D16 505050C0 âPPP..F*P.O....âu`.N¶-êHu(.v..v. 000020
 80037400 080A46F7 10C98003 740001F8 46F70000 01939A50 50C03350 F8468D16 ..F%P3âPP.....%F½..t..è.%F...t.. 000040
 7580A8C9 33C12300 F72796A1 CB5DE588 279F8F88 D888C288 01C980F2 4E0A20C9 è .N·.è..ô.Ä...'.[]ùÀ.'%Â#è3è´.u 000060
 9F87F609 77E9C033 0009BA08 72279D1E 3B065E8B 0CEC83EC 885500C3 01C98003 ..è.û.U.š.š..^.;..'r.¤..3äÖw.-.. 000080
 FA5E8C66 7480279F 87F60000 02AA9A50 16F4468D 51414151 51C93353 12742027 ' t.S3èQQAAQ.F¶.P.`...-..'.tf.^* 0000A0
 F20AB049 E30C4E8B F86689F2 8BFA8856 57FCFC46 89FE4689 C0330856 C50A468E .F.éV.3â.F±.F==WV.*.·.f½.N.DI¯.· 0000C0
 AA1A74FB 3B0D740A 3CAC0C4E 8B0716FA 8BD488E2 2B0080BA DC8B02EC 833B75AE Ûu;.š..Ê¤..+ã.â.*...N.¯<.t.;«t.` 0000E0
 5F5EE1EB 0014E8E2 EBFC46FF 0AB0AA00 1FE80375 FB3B00B0 009AE900 2BE8F4E2 ã¶Ô+.Õ..¯.;«u.Ò..`¯..F=Šäô..ŠÄ^  000100
 53065E8B 1FE3CA2B CF8B1F06 1E515350 00F1308C 9AFFFC8B 7AEB0093 E9FA5E8E .^*Õ..Šz¡=..¥0þ.PSQ....ü+ðD..^.Š̄ 000120
 8B585B59 1F0774DB 0BFE5E01 F45E8B11 75C00800 00FFFF9A 5016F446 8D51521E .RQ.F¶.P......âu..^¶.^±.Ût..Y[X. 000140
 F900208A 03EB001C BA087500 098A0001 3D007400 603D1874 C00808C4 831FC3FA *û..á..ât.=m.t.=..¤..u.¤..Š.¤ .* 000160
 F9C03300 1CBA0EEB F803751A 3F80085E 8B0A5E8E 0E744027 9F87F6FE 5E8E26E8 Š&.^±-..'@t..^..^..?.u.½Š.¤..3â* 000180
 0475C908 0C4E8808 5BE9CB50 E5880472 FA5E8E5F 5EF8668B FC462BFE 468B06EB Š..F±+F=.f½^_.^*r..[]ùÕ[..N..èu. 0001A0
 006D3D17 74C0081F 071E0000 03C99A50 16F4468D 51521E53 0856C51E EEEBC18B .èŠŸ.éV.S.RQ¯F¶.P.è.......ât.=m. 0001C0
 40279F87 F68775C0 0BF4468B C2EB0020 BAC7EB00 1CBACC75 0009BA00 013D0074 t.=..¤..uä¤..Šú¤ .Šô.F¶.âuñ-..'@ 0001E0

Dump of file SATURN:[PCCOMMON.DUMP.DLL]SA-PDLED.DLL;1 on 18-APR-1990 10:51:30.28
File ID (436,15,0)   End of file block 133 / Allocated 136

Virtual block number 58 (0000003A), 512 (0200) bytes

 33067EC4 1EDE8BD7 8BEC8B55 00A3EBC0 33001C8A A6EB0275 1A3F8026 DA8B0A74 t..Ô&.?.u.Šl¤..3äŠÈ.U.š.=.ß.4~.3 000000
 468BFE87 08468ED8 8EC08CF9 2BD1F7AE F2FFFFB9 0A7EC4FF 7580AEF2 FFFFB9C0 â¿..·Û.u.é-.¿..·Û%1+*.â.Ä.F..±.F 000020
 8BD78BEC 8B55C85D C28C1FFA 8BF388A4 F3C913A5 F3E9D149 A4027400 01C6F706 .%ó..t.Ê||ÕµÊ.èµÊ.µ.*..ô]ùU.š.=. 000040
 D149A402 7401A8C7 8B067EC4 D1F7AEF2 FFFFB9C0 33C08ED8 8CFE8B0A 76C51EDE B.év..±.Ä.ä3ä¿..·Û%1é-..ú´.t.Ê|| 000060
 C0330A7E C40676C5 1EDE8BD7 8BEC8B55 CB5DC28C 1FFA8BF3 8BA4F3C9 13A5F3E9 ÕµÊ.èµÊ.µ.*..ô]ùU.š.=.B.év.é-.3ä 000080
 C4D78BEC 8B5500CB 5DFA8BF3 8B1FFFFF 1DC01B05 74A6F3F9 2BD1F7AE F2FFFFB9 ¿..·Û%1+*µ|t..â.....µ.*]ù.U.š.=é 0000A0
 89C033D7 8B067EC4 1E5657EC 8B5500CB 5DFA8891 49D1F7AE F2FFFFB9 C033067E -.3ä¿..·Û%||..*]ù.U.šWV.é-..=3ä¿ 0000C0
 1F06F38B FE8BD9F7 0E4E2B41 0175AEF2 0E4E8B0F 8B0A7EC4 06F7884F AEF2FFFF ..·ÛO.%.é~..Ô.N.·Ôu.A+N.%).±.µ.. 0000E0
 E30E4E8B DF8B0A76 C5067EC4 1E5657EC 8B5500CB 505F5E1F C28CC28B AAA4F307 .µÊ¯.ô.ô.^_]ù.U.šWV.é-.év..Ô.N.D 000100
 46805657 000016C8 CB5DE588 5F5E1FC2 8CC388AA F3C032F8 E2AA0374 C00AAC0C .¯.ât.`ä%2äµ`.û.ô.^_.[]ùà...WV.F 000120
 89260856 8B06468B 420A47C6 26F85EC4 FE568CFC 46890E46 8DFA568C F84689EC š.F½.V*.F..F=.V±ä^%Ī6G.B.F..V.&. 000140
 9A53060A 76FF0C76 FFFC76FF 167FFF04 47C72602 57892607 89260857 89260647 G.&.W.&..&.W.&ùG.....v=.v..v..S. 000160
 88260247 8E2607FF 263F8826 C02A1278 044FFF26 F85EC4F0 8B0CC483 062D1034 4.-..á..Þá^%&.O.x.*ä&.?&..&.G.&. 000180
 8B067EC4 57EC8B55 CBC95F5E C68B06C4 8303AE0C E09A006A 53FA76FF 900FEB05 .Š...v*Sj..Â.Û..á..ó^_èùU.šWá-.. 0001A0
 C28CC788 C78EFF33 04740538 264FAEF2 FB8B0A46 8AD9F741 AEF2FFFF B9C033DF Ó3ä¿..·ÛA%).F..«·ÕO&8¯.t.3..ú.ú.ô 0001C0
 8B5756C0 8ED08CCB 5E5FA5F3 000AB90F 92BF0F4A BEC08ED8 8C5756CB 50E58B5F _.[]ùVW.Ä.â/J.¢..¿..µÊ_^ù.Â.âVW. 0001E0

Dump of file SATURN:[PCCOMMON.DUMP.DLL]SA-PDLED.DLL;1 on 18-APR-1990 10:51:30.28
File ID (436,15,0)   End of file block 133 / Allocated 136

Virtual block number 59 (0000003B), 512 (0200) bytes

 8BF38B57 5616E8F3 8BD98EA5 A5FCD88E C18ED98C C08CFB8B 0CC38311 781E8BF3 µ..x..Û..«.â.).ê.Ä=ÊÊ.).µŠ.VW.µ. 000000
 47C6FC77 8911781E 894E7411 64FB81F3 8BA5A5FC C18ED98C FB8B0CC3 8311781E .x..Û..«.).ê=ÊÊ.µ.«d.tN..x..w=6G 000020
 A5FCD88E C18ED98C C08CFB8B 0CC38311 781E8BF3 8B5756C0 8ED08CCB 5E5F03FE ±._^ù.Â.âVW.µ..x..Û..«.â.).ê.Ä=Ê 000040
 8BA5A5A5 A5FCC18E D98CFB8B 0CC38311 781E8BF3 8B575618 EBF38BD9 8EA5A5A5 ÊÊÊ.).µŠ.VW.µ..x..Û..«.).ê=ÊÊÊÊ. 000060
 575604EB D08C5756 144DE9CB 5E5FFC77 8907FE47 C611781E 890E7411 64FB81F3 µ.«d.t...x.6G±..w=_^ùÕM.VW.ÂŠ.VW 000080
 A5A50274 033CA5A5 FE4588AD FB880CC3 8311781E 8BF388FC D88EC18E D98CD88C .Ä.).ê.Ä=.µ..x..û.¯«Ü.E±ÊÊ<.t.ÊÊ 0000A0
 8C14EB02 578B2607 8B26C08E D08CCB5E 5FD98EFC 5F891178 1E89CF74 1164FB81 .«d.tü..x.._=.)_^ù.Â.ä&..&.W.Š.. 0000C0
 F7077980 24C78AD0 8BDA8B57 56990788 03EB0257 8807880A EB990788 26C08ED0 Â.ä&...Š...¯W.Š¯...VW.Ö.Â.ú$.y.% 0000E0
 FF80C18E D98CFC7D 8911783E 891C7411 64FF810C C7831178 3E88000B 83DAF7DB ÙÄÖ.Û..>x..ú...d.t..>x..)=.).ê.. 000100
 FB88DB33 C88B8760 8D5507FE 45C6FF63 E9CB5E5F 196EE89E B403FE45 C60F7500 .u.6E±.Ç.Òn._^ùÕc.6E±.U§'..ù3Û.« 000120
 B1741164 FF810CC7 83FE458A FC758B11 783E88C0 8ED88C57 56CB5E5F 5D1CCDE8 Òë.]_^ùVW.Ä.ã.>x..u=.E±.ú...d.tÝ 000140
 810CC783 11783E88 5756CB5E 5FA5A502 74033CA5 A5FCFE45 88FC7D89 11783E89 .>x..)=.E±=ÊÊ<.t.ÊÊ_^ùVW.>x..ú.. 000160
 02EBD08C CB5E5FAB ABFCC033 C08ED88C 03FE45C6 FC7D8911 783E898C 741164FF .d.t..>x..)=6E±..Ä.ã3ä=¨¨_^ù.ÂŠ. 000180
 FB885756 C08ED88C 02EBD08C 11EB0C11 78068311 781E88FC FB885756 C08ED88C .Ä.âVW.«=..x...x..Š..ÂŠ..Ä.âVW.« 0001A0
 FC77880F 84268955 CB5E5F0C 11782E83 A5A5FC77 88D07503 FE7F8011 781E88FC =..x...±.u..w=ÊÊ..x.._^ùU.&Ç..w= 0001C0
 0C117806 8311781E 88FCFB88 5756C08E D88C02EB D08CE4EB 5DDE885F 1390E857 WÒ.._.8]Šõ.ÂŠ..Ä.âVW.«=..x...x.. 0001E0
```

```
Dump of file SATURN:[PCCOMMON.DUMP.DLL]SA-PDLED.DLL;1 on 18-APR-1990 10:51:30.28
File ID (436,15,0)   End of file block 133 / Allocated 136

Virtual block number 60 (0000003C), 512 (0200) bytes

A5A5A5A5 FC77880F 7507FE7F 8011781E 88FCF888 5756C08E D88C02EB D08C11EB Š..ÅŠ..Ä.åVW.«».X...±.U..w=EEEE 000000
88FB8857 56C08E08 8C02EBD0 8CE9EBDF 87F78827 2FEBDF87 CB5E5F0C 11782E83 ..x.._^ù.Óò/'.¥.ÓŠÓ.ÅŠ..Ä.åVW.«. 000020
83FE478A F3881178 1E88F888 5756C08E D88C02EB D08C10EB 0C117806 8311781E .x...x..Š..ÅŠ..Ä.åVW.«..x..µ.G±. 000040
EB1D13BA 1D0EB850 EB1CEABA 1CE088CB 5E5FA5A5 0274033C A5A5A8FC 0C11782E .x..■¨EE<.t.EE_^ù|Å.¤ö.ŠP|..¤..Š 000060
E8900AEB 1426E890 10EB1427 E836EB09 198A0913 880F7A26 889F0602 09729A48 H.r.....&z.|..¤..Š6ò'.Š..ò&.Š..ò 000080
889F0904 09729AC3 DAF70002 830BF707 73589E0F 7A268A50 1439E890 04EB1474 t.Š..ò9.P.&z..Xs.¥Ä.@.¥öü.r..... 0000A0
0A7C8011 7836890C EE831178 36885153 0FB42689 55575609 25BA091F 880F7A26 &z.|..¤X.VWU.&Ç.SQ.6x..Ÿ..6x..|. 0000C0
757F01F6 FF32FE50 8A11783E 8857CB5E 5F505859 D2FF02EB D0FF0475 08748803 ..t.u..ÅŠ..@Y[]_^ùW.>x..:±2.-..u 0000E0
57CBF9CB E4080375 5F8001F6 F87480FF 41F6CB5F 0875F0FF 41F60874 03F88013 ..«.t.-A.Þu._ù-Ã..t½-.._u  ôù¹ùW 000100
FF320875 F738FC75 88FE5D8A 11783E88 5756CB5F 7F2180FF 32FE508A 11783E88 .>x..]±2..!._ùVW.>x..]±.u»,"!.2. 000120
80ADA5A5 CB5E5FAB 80F480AD 087503FB 80A5FCC1 8ED98CFC 7D89CB5E 5F803180 .1._^ù.)».\.ë=E.«.u.Û.¶._^ùEEÜ. 000140
575676EB 000888F3 88575604 EB258BE8 575602EB C08ED08C 5756CB5E 5FAB80F4 ¶.¨^ùVW.Å.åŠ.VWÒEXŠ.VW.µ|..ŠvVW 000160
575602EB C08ED08C 57565EEB 000488F3 88575604 EB25A3E8 575602EB C08ED08C .Å.åŠ.VWÒEXŠ.VW.µ|..Š^VW.Å.åŠ.VW 000180
88575604 EB2573E8 575602EB C08ED08C 575646EB 000CB8F3 88575604 EB2588E8 Ò.XŠ.VW.µ|..ŠFVW.Å.åŠ.VWÒsXŠ.VW. 0001A0
575616EB 001088F3 88575604 EB255BE8 575602EB C08ED08C 57562EEB 00148BF3 µ|..Š.VW.Å.åŠ.VWÒ[XŠ.VW.µ|..Š.VW 0001C0
7D80C18E D98C1178 3E88D888 000088F3 88575604 EB2543E8 575602EB C08ED08C .Å.åŠ.VWÒCXŠ.VW.µ|...Ä.>x..\.é.) 0001E0

Dump of file SATURN:[PCCOMMON.DUMP.DLL]SA-PDLED.DLL;1 on 18-APR-1990 10:51:30.28
File ID (436,15,0)   End of file block 133 / Allocated 136

Virtual block number 61 (0000003D), 512 (0200) bytes

8BF78B25 4EE80FFA BF02C383 CB5E5F5D 0F5E97FF 0FB42689 55FC7D87 107407FE ±.t..)»U.&Ç...^.]_^ù.Û.¢ª.ÒN%.%. 000000
8C575676 EB000AB8 F3885756 04EB2512 E8575602 EBC08ED0 8C57560F EB11783E >x.ŠÒVW.Å.åŠ.VWÒ.%Š.VW.µ|..ŠvVW. 000020
E8575602 EBC08ED0 8C57565E EB0006B8 F3885756 04EB24FA E8575602 EBC08ED0 Å.åŠ.VWÒ*$Š.VW.µ|..Š^VW.Å.åŠ.VWÒ 000040
F3885756 04EB24CA E8575602 EBC08ED0 8C575646 EB000EB8 F3885756 04EB24E2 ã$Š.VW.µ|..ŠFVW.Å.åŠ.VWÒò$Š.VW.µ 000060
8C575616 EB0012B8 F3885756 04EB24B2 E8575602 EBC08ED0 8C57562E EB0016B8 |..Š.VW.Å.åŠ.VWÒý$Š.VW.µ|..Š.VW. 000080
FE7D80C1 8ED98C11 783E88D8 88000288 F3885756 04EB249A E8575602 EBC08ED0 Å.åŠ.VWÒ.$Š.VW.µ|...Ä.>x..\.é.)± 0000A0
8B12EB00 108817EB 000CBB1C EB00088B 21EB0004 8BFF39E9 5E2495E8 56057407 .t.VÒ.$^Ö9.£..ŠIE..Š.£..Š.£..Š.£ 0000C0
F27D8039 7407FE7D 8011783E 88575600 188803E8 001C8808 EB00088B 0DEB0014 ..Š.£..Š.£..Š.£..VW.>x..)±.t9.)· 0000E0
7318FB83 2F731CFB 83087D88 FC7D89FC 7588C08E D88C1178 3E890CEF 832B7407 .t+.ÿ..>x..Ä.å.u».)».)..«.s/.«.s 000100
83C47407 F27D8002 C383CDEB 2428E802 C383CB5E 5F5D0F5E 97FF0FB4 2689553E >U.&Ç...^.]_^ù.û.Ò($Šë.ù..)·.tá. 000120
83CB5E5F 5D0F5A97 FF0FB426 89550C11 782E83F7 87BFE824 13E81178 3E890CEF ÿ..>x.Ò.$Š¢¯¥..x..U.&Ç...Z.]_^ù. 000140
E3D0E300 CB9E5E5F E00AE4D0 E8D14100 259F5D0F 5E97FF0F 84268955 0C11782E .x..U.&Ç...^.].X.A1ÒÅÒ.Å_^.ùÃDÅD 000160
0589FB2B FE884E4E 1178368B FCC08ED8 8C575600 0CB803E8 FF32DF02 E7D0F88A .«ÅÒ.Ò2.Š.£..VW.Ä.å».6x.ÑN.±+«¿. 000180
E8037407 FE7D8011 783E8857 56EC8855 CB5E5FF4 E247471D 88FE4489 0587AD00 .Ü...D±..GGã¶_^ùW.£VW.>x..)±.t.Ò 0001A0
160C0808 070A0C09 0C080C07 09060005 18040203 02021601 CB5DE58B 5E5F239A .#_^.!]ù.......................... 0001C0
09721C70 2060006C 08590057 00530052 02430041 02350212 12110010 120F1600 ..........S.A.C.R.S.W.Y.l.m p.r. 0001E0

Dump of file SATURN:[PCCOMMON.DUMP.DLL]SA-POLED.DLL;1 on 18-APR-1990 10:51:30.28
File ID (436,15,0)   End of file block 133 / Allocated 136

Virtual block number 62 (0000003E), 512 (0200) bytes

8B99FFFF B8279416 89279BA3 16080D00 0BD702CE 0BA40D84 09820A81 0A801606 ..........Ê.ö.■.....È.'...'|.... 000000
1674073A 2E1B75E4 0A0024B9 0C48BB27 9BA3CB5D E5BB99FF FFB80008 E8CB5DE5 Í]ùÒ..|....Í]ùÉ.'ÉH.¿$..ðu..:.t. 000020
00C32794 A3980147 8A2E4301 76CA3C04 72BC3C43 0A76243C 0472133C F7E24343 CCã%<.r.<$v.C<¥r.<òv.C..G..È.'û. 000040
D1C888F9 F7000CB9 99159A2D C388FA46 89E42A08 47BA2608 5EC45657 000008C8 à...WV6^.&.G.*ð.F*.û-....¿..¥*.àÌ 000060
0A4F8026 085EC40F 74400A47 F6260774 830A47F6 26F84689 218E05E0 D1C103E0 Å.èÌÅ..Ì.F½&-G..t.&-G.ðt.6^.&.0. 000080
90E2EB00 000447C7 26200A4F 80260E74 010A47F6 26085EC4 90012BE9 FFFFB820  |..Ò+..6^.&-G..t.&.O. &ÚG...Šã. 0000A0
9A2DC388 4C750C0A 47F626FC 7689F088 04478926 C02BEF0A 67802602 0A4F8026 &.O..&.g.ÿ+ô&.G..Þ.v=&-G..uL.û-. 0000C0
810E7400 890A7E81 077515A6 087E8137 7501218E 87F60608 68F9F700 0CB99915 ..¿..¥*kÄ.-..!.u7.-.Ì.u..-...t.. 0000E0
FF0A76FF 0C75C008 02C48300 FC351C9A FA76FF0F 75FFFF0A 7E811675 15B2087E -.ÿ.u..-...u..v*..5»..6..åu..v.. 000100
06D868F9 F7000CB9 99159A2D C3881575 080A47F6 26085EC4 04C48324 8BE80876 v.ÒE$.6.6^.&-G..u..û-...¿..¥*kÄ. 000120
57892607 89264008 57882606 47882606 77282637 8B26085E 8B677401 218E87F6 -..!.tg.^.&.7&+w.&.G.&.W.ð&..&.W 000140
C4830E1A 03069AFA 76FF0677 FF265256 167EF608 04478926 4802458B F87E8802 ..-½.E.H&.G..--.VR&.w..v*......6 000160
C408C483 0E3032EA 9A53006A 006A026A 0F742027 9F87F6FA 5E8B19EB FC468908 ..F=Š..^*-..' t.j.j.j.S.ð2=..6.6 000180
83093C03 069AFA76 FF501606 46805600 01BE17EB 07882606 468A065F C426085E ^.&6_..F.&..Š./..V.F..P.v*...<.. 0001A0
47F62606 5EC40000 00C8CBC9 5F5EE42A 06468AFE CCE90374 FC7639FC 468908C4 6..F=9v=t.Òä±.F.*ð^_èùà...6^.&-G 0001C0
8026065E C404C483 00933328 9A0677FF 260877FF 262E7408 0A47F626 3574830A ..t5&-G..t.&.w.&.w..(3...6.6^.&. 0001E0
```

```
Dump of file SATURN:[PCCOMMON.DUMP.DLL]SA-PDLED.DLL;1 on 18-APR-1990 10:51:30.28
File ID (436,15,0)   End of file block 133 / Allocated 136

Virtual block number 63 (0000003F), 512 (0200) bytes

00000AC8 90CBC904 47892608 57892606 47892602 57892607 892699C0 2BF70A67 g.%+â.&..&.W.&.G.&.W.&.G.èù.à... 000000
F62B9000 EEE999C0 2B137400 77300C74 00723027 74006130 98078A26 0A5EC456 Vé^.&...=a.t'=r.t.=w.t.+â.ÕŸ..+- 000020
43750002 C6F790F4 EB01098E 90F1EB02 FC46C603 01BE9022 EB000189 01FC46C6 óF=.¿..Š".ƒ..óF=.Šþ.ƒ..S¶.%6..uC 000040
3D98078A 263374C9 08377400 3F80260A 5EC40A46 FF80FC46 C6FEE683 0002CE81 .ö...ì±óF•..F.é^.&.?.t7.èt3&...= 000060
00A9C688 900DEB40 00CE810E 75C000A9 C6881575 00743013 7400623D 06740028 +.t@=b.t.=t.u..ó`.âu..ö.əŠÅ..ó`. 000080
0E760148 9A0676FF 0876FF56 01A468FE 4E89BDEB 8000CE81 90C4EBC9 280574C0 ât.+èŠé..ö..Š§.N±hÊ.V.v..v..H.v. 0000A0
159A2DC3 8B29B406 FF0A4788 26FC468A 0E5EC4FF 6AE9037D C00BFA46 8908C483 .é..F'.à).Õj.é^..F=&.G...Ç).û-.. 0000C0
260E5E8B 980788F8 5E8BC02A F8468921 8E05E001 C103E0D1 C888F9F7 000CB999 .¿..%'.àiÅ.èiÅ..|.F½*ä.^½....^.& 0000E0
08578926 06478926 02578926 07892699 C02B0E5E 8B000004 47C7F85E 8B044789 .G..^½úG....^.+â.&..&.W.&.G.&.W. 000100
023C0324 0A478A26 065EC4F6 2B560000 04C8C8C9 5EC28CC3 8B0B4788 26FA468A .F'&.G..û.ó^èùà...V+-é^.&.G.$.<. 000120
5E8B3974 01218E87 F6060868 F9F7000C 8999159A 20C38815 75080A47 F6265575 uU&-G..u..ū-...¿..%'kĂ.-..|.t9.^ 000140
9A50E42A 08478A26 0677FF26 0877FF26 50287EC0 08FC4689 06472826 07882606 .&..&+G..F=.â-(P&.w.&.w.&.G.*óP. 000160
8B260647 8B26065E C4FFFF8E 200A4F80 26065EC4 0874FC46 3B08C483 0F3E0306 ..>..é.;F•t.ó^.&.O. ƒ..â^.&.G.&. 000180
8B100230 8C9A000A 8BEC8855 CBC95EC6 8B000004 47C72602 57892607 89260857 W.&..&.W.&úG....ó^èùU.š¡...¥O..¡ 0001A0
892C50A3 08568806 468B2C6C 16892C6A A3105688 0E468B2C 7C1E8C2C 7AA32C80 .,Èz,..|,.F..V.Èj,..l,.F..V.ÈP,. 0001C0
012C7806 C70308E9 037425F6 7E80038D E900002C 7406C700 002C7606 C72C5216 .R,ú.v,..ú.t,..Õ...~~%t.Õ..ú.x,. 0001E0

Dump of file SATURN:[PCCOMMON.DUMP.DLL]SA-PDLED.DLL;1 on 18-APR-1990 10:51:30.28
File ID (436,15,0)   End of file block 133 / Allocated 136

Virtual block number 64 (00000040), 512 (0200) bytes

06C72C68 A32C4EA3 2C54A32C 6EA32C70 A32C58A3 2C72A32C 56A32C5A A3C02B00 .+âÈZ,ÈV,Èr,ÈX,Èp,Èn,ÈT,ÈN,Èh,ú. 000000
3F80260A 5E88903E EB003020 E006C70A 46FF4975 30017F80 260A5EC4 00202DE0 Å- .é^.&...0u].F.ú.Å-0.Š>..^.&.? 000020
6E06FF1A 75002C5A 3E830E75 203F8026 9028EB00 002C6E06 C72C5A06 FF0D752B +u...Z,ú.n,..Š(.&.? u..>Z,.u...n 000040
078A260A 5E880A46 FF2C6806 FFC77520 3F80260A 5EC400EB 2C4E06FF 9014EB2C ,Š....N,Š.é^.&.?-uú..h,.F..^.&.. 000060
468908C4 8308C7E8 0E2C7E68 1E0A76FF 0C76FFD0 75C00802 C4830978 E80E5098 .P.Òx..é..âuî.v..v..h~,.Òú..é..F 000080
3E830D74 002C683E 832C7EA3 D8F72C7E A12C6806 FF0C7D00 2C7E3E83 0C56890A ..V..>~,.)...h,À~,%ÄÈ~,.>h,.t..> 0000A0
1E0A76FF 060A46FF 2C7006FF 2D752E3F 80260A5E C400202D E006C706 75302DE0 À-0u.ú.À- .é^.&.?.u-..p,.F...v.. 0000C0
700EFF00 012C7806 C70A7D00 2C783E83 0C56890A 468908C4 83087BE8 0E2C7868 hx,.Ò(..é..F..V..>x,.).ú.x,....p 0000E0
2C5806C7 0675006C 302B7400 683D4074 004E3D3D 7400463D 98078A26 0A5EC42C ,é^.&...=F.t==N.t@=h.t+=l.u.ú.X, 000100
4EE91C75 003F8026 0A5EC40A 46FF0375 4C3F8026 0A5EC409 75002C58 3E830002 ...>X,.u.é^.&.?Lu..F.é^.&.?.u.ÕN 000120
46899807 8A26C8EB 00082C58 06C7D0EB 00102C58 06C7D8EB 00012C58 06C79002 ..ú.X,..ŠÄú.X,..ŠÄú.X,..Šà&....F 000140
78740069 30F8468B 20F84683 2C5606FF 08750058 30057400 47300A74 00453DF8 ½=E.t.=G.t.=X.u...V,.F½ .F½=i.tx 000160
3E839001 59E90140 E9037500 25300152 E9037E01 3FE90375 00633D01 91E9037E ~.Õ..=c.u.Õ?.~.ÕR.=%.u.Õə.ÕY...> 000180
C4262C6A 1EC400EB 00000247 C7260789 262C74A1 1FC4262C 6A1EC415 75022C58 X,.u.é.j,&é.Àt,&..&úG...Š.é.j,&é 0001A0
01BDE903 74002C74 3E830170 E9037500 2C763E83 042C6A06 83078926 2C74A11F .Àt,&....j,..>v,.u.Õp..>t,.t.Õ§. 0001C0
0A6A0000 2C4E06C7 2C7206FF 01ACE9FF FFB801AF E9037520 0A47F626 2C501EC4 é.P,&-G. u.ÕÈ.¡..Õ¯...r,ú.N,..j. 0001E0

Dump of file SATURN:[PCCOMMON.DUMP.DLL]SA-PDLED.DLL;1 on 18-APR-1990 10:51:30.28
File ID (436,15,0)   End of file block 133 / Allocated 136

Virtual block number 65 (00000041), 512 (0200) bytes

00042C78 06C72C70 06FF2C56 06FF2C54 06FFF2EB 086A90C3 EB02C483 019EE80E .Ò...é.Šû.j.Š·..T,..V,..p,ú.x,.. 000000
A128742C 7E0639FA 46892C58 A3C02B7A 74012C58 3E830081 E9037508 2C583E83 .>X,.u.Õ...>X,.tz+âÈX,.F'9.~,t(Å 000020
C00B2C7E A1052C7E 2E839090 13EB0000 2C7E06C7 0A74002C 683E83FA 46892C7E ~,.F'.>h,.t.ú.~,..Š.....~,.À~,.á 000040
7E8302C4 83048DE8 0E3A6A02 C4830130 E80E106A 022C6A06 832C7EA3 C02B027D ).+âÈ~,..j,.j..ÒÒ..é.j:.Ò...é..~ 000060
9007EB2C 7EA3C02B 027DC00B 2C7EA300 052DFA46 8B157400 2C683E83 227400FA ".t".>h,.t..F'-..È~,.ä).+âÈ~,Š.. 000080
3FE9106A FF10E902 2C6A0683 02C48300 F1E80E10 6A042C6A 2E830000 2C7E06C7 ú.~,....j,.j..Òþ..é...j,.Õ..j.Õ? 0000A0
0428E80E 256AFF2A E90349E8 0EF876FF F4E8016A 90FF39E9 026EE80E 006A90FF ..j..Òn.Õ9..j.Š¶.v½.Òl.Õ*.j%.Ò(. 0000C0
0A468809 74002C58 3E830A7E 00673005 7C00653D FF0CE903 7500643D 90FF21E9 Õ!..=d.u.Õ..=e.|.=g.~Õ.>X,.t..F. 0000E0
6F30FE80 E9037500 6E30903A EBFE5689 FC468940 0C5688 0A 46880A4E FF0C568B .V..N..F..V.ə.F•.V±Š:.=n.u.Õ.±=o 000100
03750078 30FEB9E9 03750075 308F7400 7330FEE0 E9037500 7030FEE4 E9037500 .u.ÕÕ±=p.u.ÕÅ±=s.t.=u.u.Õ¿±=x.u. 000120
EC75253C 0474C00A F6468807 8A26FC5E C4FC46FF 9034EB0A 46FF90B1 EBFF79E9 Õy.ŠŸ..F.Š4..F•é^•&...F-.ât.<%uš 000140
C40C5689 0A4689FE 568BFC46 8806C483 044CE80E 0A76FF0C 76FF500A 462BC38B .û+F.P.v..v..ÒL..é..F•.V±.F..V.é 000160
2C74A1FE 51E90374 200A47F6 262C501E C4FC63E9 0374C00A F6468807 8A260A5E ^.&...F-.ât.Õc=é.P,&-G. t.ÕQ±Àt, 000180
832C7206 FF04740A 067E8300 202DE006 C7067400 2C703E83 56570000 12C8CBC9 èùà...WV.>p,.t.ú.Å- ..~..t...r,. 0001A0
0683FE56 89FC4689 02578826 078B262C 6A1EC419 75102C58 3E830774 022C583E >X,.t..>X,.u.é.j,&..&.W..F•.V±.. 0001C0
1EC40EEB 0000FE46 C7FC4689 078B262C 6A1EC411 74002C72 3E83902C EB042C6A j,.Š,..>r,.t.é.j,&...F•úF±..Š.é. 0001E0
```

Dump of file SATURN:[PCCOMMON.DUMP.DLL]SA-PDLED.DLL;1 on 18-APR-1990 10:51:30.28
File ID (436,15,0)   End of file block 133 / Allocated 136

Virtual block number 66 (00000042), 512 (0200) bytes

```
0674FE46 0BFC4688 0E74002C 4E3E8302 2C6A0683 FE5689FC 46899907 8B262C6A j,&....F=.V±..j,..>N,.t..F=.F±t. 000000
83317500 2C723E83 F45689F2 46892C7C 16882C7A A12DDEA3 C0289003 EB064688 .F.Š..+âÈ8-Àz,..|,.F·.V¶.>r,.u1. 000020
0002830B F7FE5688 FC46882D 07C626F2 46FFF25E C41D750A 067E832B 7D00FE7E ~±.)+.~..u.6^·.F·&6.-.F=.V±%Ä.@. 000040
76FFFA5E 8CF84689 2C5C8800 00F646C7 9006E800 01F646C7 FE5689FC 46890AF7 %Ö.F=.V±ÚF-..Š..úF-..|\,.F%.^•.v 000060
3A9AF876 FFFA76FF 4574002C 703E830A C4831521 35129AFC 76FFFE76 FF501E06 ..P.v±.v=..51..6..>p,.tE.v•.v%.: 000080
00002DDE 06C70675 082DDE3E 83007EC9 0BF04E89 C82B2C78 0E8B04C4 83103D05 .=..6...x,+à.Nb.è-..>8-.u.ú.8-.. 0000A0
560E8BF0 4E89F446 8CF27E89 F47FC00B 49C18847 3005C626 05EBF27E C4F04E8B .Nb6-·Š.&6.0G.èI.6.¶.-·.F¶.Nb..V 0000C0
8026F846 FF46202C 80037C61 3C0774C9 08048807 8A26F85E C4F276C5 EE5E8C2C ,.^Ÿév·6^%&.....èt.<a|.., F.F%&. 0000E0
F67E830B 742C6E06 082C5AA1 1475002C 723E83EE 5E8EF45E 8CF27689 E375003F ?.uD.v·.^¶.^Ÿ.>r,.u.Àz,..n,t..— 000100
00067E83 56570000 10C8CBC9 5F5E02C4 8302FFE8 0E50C02B 02E80001 B8057500 .u.|..Š.+àP.Ò...6.^_èùà...WV.~.. 000120
74082C58 3E83008F E9022C6A 0683FA56 89F84689 2C6C1688 2C6AA100 01BE1874 t./..Àj,..l,.F%.V•.-j,.Ö...>X,.t 000140
4689FC46 89078B26 2C6A1EC4 10EBFA56 89F84689 02578B26 078B262C 6A1EC413 .6.j,&..&.W..F%.V•Š.6.j,&...F=.F 000160
7E83900A E80F7CB8 1575FA46 0BF84688 0E74082C 583E8304 2C6A0683 FA5E8CF8 %.^•..j,..>X,.t..F%.F•u.||.Š...~ 000180
742C7036 39F62BF4 5689F246 89FA5688 F84688FA 5E8CF846 890F83B8 097500FC =.u.|...F%.^•.F%.V•.F·.V¶+-96p,t 0001A0
F25EC446 90EDE810 7ECE3B46 1574003F 8026F246 FFF25EC4 900EEB2C 780E8B1C ...x,Š..6^·.F·&.7.t.F;ö~.ŠÚ.F6^· 0001C0
FF5602C4 830159E8 0E570875 002C683E 83FE2B2C 7E3E88F3 75003F80 26F246FF .F·&.7.uµ.>~,+±.>h,.u.W.ÒY..6.V. 0001E0
```

Dump of file SATURN:[PCCOMMON.DUMP.DLL]SA-PDLED.DLL;1 on 18-APR-1990 10:51:30.28
File ID (436,15,0)   End of file block 133 / Allocated 136

Virtual block number 67 (00000043), 512 (0200) bytes

```
90CBC95F 5E02C483 013CE80E 57087400 2C683E83 06C48301 B3E80EF8 76FFFA76 v•.v%.Ò*..6..>h,.t.W.Ò<..6.^_èù. 000000
EB01B005 7547067E 83067467 067E83FE 5689FC46 892C6C16 B82C6AA1 000006C8 à...Àj,..l,.F=.V±.-.gt..-.Gu.¯.Š 000020
75002C78 3E830074 00FA7E80 00062C78 06C70675 002C703E 83FA4688 C02A9003 ..*à.F•.>p,.u.ú.x,...-•.t..>x,.u 000040
FC76FFFE 76FF2C7A 36FF2C7C 36FF0676 FF2C7836 FF2C5636 FF00012C 7806C706 .ú.x,...6V,.6x,.v..6|,.6z,.v±.v= 000060
7A36FF2C 7C36FF14 75002C4E 3E831B74 00FA7E80 0EC4830F 921EFF26 2AE8068E ..Ò*&.....6..-•.t..>N,.u..6|,.6z 000080
FF2C7C36 FF147500 2C783E83 1B74002C 4E3E8304 C4830F96 1EFF262A E8068E2C ,..Ò*&.....6..>N,.t..>x,.u..6|,. 0000A0
6E06082C 5AA10000 20DE06C7 082C6A06 8304C483 0F9E1EFF 262AE806 8E2C7A36 6z,..Ò*&.....6...j,.ú.8-..Àz,..n 0000C0
C02B02EB 0001B805 74C00804 C4830FA2 1EFF262A E8068EFC 76FFFE76 FF1B742C ,t..v±.v=..Ò*&..À..6..ât.|..Š.+à 0000E0
468A1478 044FFF26 2C501EC4 3C75002C 763E8356 000000C8 90CBC901 29E80E50 P.Ò).èù.à...V.>v,.u<6.P,&.O.x..F 000100
8317F90C E09A0676 FF532C52 36FF10EB E42A0488 2602478E 2607FF26 37882606 .&.7&..&.G.&..*ÒŠ..6R,S.v..Å.•.. 000120
75002C76 3E835657 000002C8 90CBC95E 2C7406FF 9005EB2C 7606FF07 754006C4 6.@u...v,Š....t,^èù.à...WV.>v,.u 000140
754006C4 8318610C E09A2DE0 36FF2C50 36FF2C52 36FF1BEB 507EF60B 06768B57 W.v..--PŠ..6R,.6P,.6À-.Å.a..6.@u 000160
2607FF26 3F8B262D E0A0D478 044FFF26 2C501EC4 1E7EC00B 4EC6882C 7606FF04 ...v,.6N.à-.6.P,&.O.x6.À-&.7&..& 000180
000002C8 CBC95F5E 2C740601 06468807 75002C76 3E8304E8 E42A0588 2602478E .G.&..*ÒŠà.>v,.u..F...t,^_èùà... 0001A0
E09A5098 078A2606 5EC42C50 36FF2C52 36FF22EB 5E75002C 763E830A 76885657 WV.v..>v,.u^Š".6R,.6P,6^.Ē...P.À 0001C0
78044FFF 262C501E C42574C0 0B4EC688 0646FF2C 7606FF04 754006C4 8318030C .Æ..6.@u...v,.F..6N.ātX6.P,&.O.x 0001E0
```

Dump of file SATURN:[PCCOMMON.DUMP.DLL]SA-PDLED.DLL;1 on 18-APR-1990 10:51:30.28
File ID (436,15,0)   End of file block 133 / Allocated 136

Virtual block number 68 (00000044), 512 (0200) bytes

```
2C763E83 CAEBE42A 05882602 478E2607 FF263F88 262C501E C4078A26 065EC4CD ëé^.&..6.P,&.?&..&.G.&..*ÒŠò.>v, 000000
F65689F4 46892C7C 16882C7A A1560000 0CC8CBC9 5F5E2C74 06010A46 88077500 .u..F...t,^_èùà...VÀz,..|,.F¶.V- 000020
06762BF0 2BF84689 04C48315 0C053A9A F476FF52 2C7E3688 FA4689FC 4689C028 +6.F=.F•.6-,R.v¶.:....6..F%+b+v. 000040
8026F45E C4227500 2C683E83 4E017508 2DDE3E83 08EB02EE 83057510 2DDE3E83 .>8-.u..Ÿ.Š..>8-.u.N.>h,.u"6^¶&. 000060
E03E83F8 4EFF02C4 83FE71E8 0E509807 8A26F446 FF127530 2DE03E83 1975203F 7-u..>À-0u..F¶&...P.Òq±.6..N%.>À 000080
2DDE3E83 0066E80E FA46FF07 7400067E 831B7400 2C683E83 077EF60B 0874302D -0t..--..>h,.t..-..t..F•.Òf..>8- 0000A0
830A7400 067E8302 C483FE7E E80E5629 75002C68 3E830070 E80EFC46 FF077400 .t..F=.Òp..>h,.u)V.Ò-±.6..-..t.. 0000C0
F676FFF8 76FF0040 E80E0475 00FC7E83 0A74002D DE3E8300 39E80E04 7500FA7E -•.u..Ò9..>8-.t..-=.u..Ò@..v%.v- 0000E0
5E02C483 FE38E80E 5600202D E006C70E 74002C68 3E8306C4 83FE85E8 0EF476FF .v¶.Òç±.6..>h,.t.ú.À- .V.Ò8±.6.^ 000100
FDC8E80E 306AC802 C483FD02 E80E5000 20B803EB 002B8805 74002C5A 3E83C8C9 èù.>Z,.t.|+.Š.| .P.Ò@».6.ùj0.Òà» 000120
C483FDAA E80E5000 788803EB 00588805 74002C56 3E831775 102DDE3E 8302C483 .6..>8-.u..>V,.t.|X.Š.|X.P.Ò¯».6 000140
6A068337 8B262C6A 1EC41275 2A3F8026 0A5EC400 01FE46C7 56570000 06C8CB02 .ùà...WVúF±..6^.&.7*u.6.j,&.7..j 000160
8A260A5E 8BF62B0A 46FFFFFF FE46C708 752D3F80 260A5EC4 9060E80A 46FF022C ,..F.Š'.6^.&.7-u.úF±...F.+-.^.&. 000180
06E8F888 00302DE0 06C70675 303C0A75 2C703639 3B7F393C 3F7C303C FA468807 ..F•<0|?<9.;96p,u.<0u.ú.À-0..«Š. 0001A0
7D303D80 2647F188 30E983C8 03E101CE 0302E1C1 CE8B9805 8A26187F 393D8026 &.=9..&....ôèÀ..ö1À.à.Ò0.þG&.=0) 0001C0
04C8CBC9 5F5E0C56 880A4688 37892606 5EC4F08B EEF7FE46 880C468C 0A7E89DF Ô.-..F..F±¥Ÿ.þ6^.&.7.F..V.^_èùà. 0001E0
```

```
Dump of file SATURN:[PCCOMMON.DUMP.DLL]SA-PDLED.DLL;1 on 18-APR-1990 10:51:30.28
File ID (436,15,0)   End of file block 133 / Allocated 136

Virtual block number 69 (00000045), 512 (0200) bytes

 F4750038 26117400 30802647 01E8FC7E C4064E8A FE5E8CFC 46890F8A B8570000 ..W¡...F=.^±.N.ó~=Š.G&.=.t.&8.u¶ 000000
 89159AB8 000004C8 90C8C95F C02BFE46 8CFC7E89 9009E8FE 468CFC7E 890001B8 ¡...-=.F±Š...~=.F±+â_èü.à...¡... 000020
 89260647 8926990A 47882604 478926C0 28257583 0A47F626 FC5EC4FE 5E8CFC46 F=.^±ó^=&-G..uX+ö&.G.&.G..&.G.&. 000040
 27880638 0CFC4683 C28CC388 17E8C28C C388FF08 47C62602 57892607 89260857 W.&..&.W.&óG...û.óŠ..û.ô.F=.;..' 000060
 0AF983D2 33064688 0C4E8801 B35756EC 885590CB C999C02B 8075278A 163BC375 uû;..'u§+â.èü.U.ŠVW°..N..F.30.*. 000080
 0374C085 0000FFFF 9A5050C0 330676FF 0876FFEC 88551B35 E9087EC5 1E990175 u...é-.Õ5.U.š.v..v.3âPP......ât. 0000A0
 300FB006 C712E883 8033300F B006C71C EB848034 300FB006 C7C85DE5 8BF160E9 Õ'þ.Í]ùú.¯.04¯.Š.ú.¯.03¯.Š.ú.¯.0 0000C0
 0FB006C7 06758C3C 0FF61EFF 0474000F F83E838A B030310F B006C708 E8818031 1¯.Š.ú.¯.10¯..>½..t...-.<.u.ú.¯. 0000E0
 0F82A11B 92322A9A 5000FD88 1B8A3686 9A0FAC8B 17BD3100 9A0FB2A3 E42A3231 12*õÈÿ..Å1§.£¯..Ñ6..¡».P.*2..Àý. 000100
 F7C03302 548B0C8B FC11783E 8BC31BA7 31769A0F B236FF1B 9B322A9A 50FFE405 .ð.P.*2...óý..v1Ï.û.>x.=...T.3ä¼ 000120
 05C73800 C2818FE6 80D8D1D9 D1FAD1D8 D1D9D1FA D1D8D1D9 D1FAD129 747F80C2 ò..t)Ï*ÏÏÏÄÏ*ÏÏÏÄÏ*ÏÏÏÄ.Ï..ô.8ú. 000140
 8AC80AAD C888ADFC 11783E88 EAE8D08A C88BC3F7 88065589 044D8902 45890000 ...E..M..U..¼û.à.ÂŠõ.>x.=Ù.àÙ.à. 000160
 F90A80B1 01CA8003 74CD0AD3 D1E2D1D3 D1E2D1D3 D1E2D1F8 8AADDC8A F08AADD4 âÙ.þ.ÉÙ.½ïãïÆïãïÆïãïÆ.ët..ò.Ý..* 000180
 01C6F615 720777D1 3AE0D1E0 D1E0D138 7238002D 3D7747E0 307FF025 E922EC8A .š"Õ%þ.=ÁGw=-.8r;ÏÁÏÁÏÁ;Ïw.r.-ó. 0001A0
 024589E5 0AC70A7F E7801674 C0081774 7F803000 80050873 00038301 C6801074 t..ó..Æ.s....*..t..ât..Ó..ú.Ï.E. 0001C0
 1DEBC388 D088DA88 D233C3F7 88024589 0589C033 FEDBE9C3 F7880589 C68AE38A .D.ó...¼ûÕÛ±3â...E..¼û30.Õ.Å.ûŠ. 0001E0

Dump of file SATURN:[PCCOMMON.DUMP.DLL]SA-PDLED.DLL;1 on 18-APR-1990 10:51:30.28
File ID (436,15,0)   End of file block 133 / Allocated 136

Virtual block number 70 (00000046), 512 (0200) bytes

 24C48A00 DB83DAF7 DBF70779 C008C38B D088DA8B 11EBDAF7 1579020B DB33D08B .Å3Ù.0y.¼ÕŠ..Õ.Å.û.ây.¼Ù¼Õ.Ù..ó$ 000000
 C88BDA8B 11EBD9F7 1579C90B DB33C88B 1DE8C38B C88BDA8B D2330474 E99E8480 .Ç.Õt.30.Õ.à.ûŠ..à3Ù.èy.¼1Š..Õ.à 000020
 00EB003A E80785E9 85608DD2 33FF3380 24C48A00 DB83D9F7 DBF70779 C008C38B .û.ây.¼Ù¼).Ù..ó$.3.30§'.Õç.Õ:.Š. 000040
 EB003EE8 0DEB009C E8C3C8D1 67750002 83C00100 26E803E8 0035E808 EB002BE8 Õ+.Š.Õ5.Š.Õ&.ïâ.0.ugïàûÕ..Š.Õ>.Š 000060
 0041E803 EB007BE8 08EB002C E80DEB00 2CE8C34E 75D20800 39E803E8 0050E808 .Õ].Š.Õ9..0uÑûÕ,.Š.Õ,.Š.Õ(.Š.ÕA. 000080
 0056E8C3 CAD12175 000183C2 D1000183 000283F5 DBF7D2F7 D1F70079 FF0BC933 3è..y.¼1¼0¼Ä¼.0..ï.ïô.ï.ulïòûÕV. 0000A0
 A4E9FDE9 E9C30172 000283C3 13DB13F5 81F980CD 0AE82201 85DB3300 1CE803EB Š.Õ..3Ùç."Õ.ë.*.¼.Ù.û.0.r.ûÕÕ»ÕÊ 0000C0
 E9D1E9D1 E9D17FE5 8010CE80 F1220F86 F98808EE 8391AD91 AD93ADD6 0A92AD00 .Ù..0Ù.Ù.Ù..Ÿ..*Ñ."þ.ö..Ï.ÏÕÏÕÏÕ 0000E0
 C88AADF8 8AACDA8A D2332FEB 25E983CA 7F20F983 787203FE E981D874 C908E901 ÏÕ.ètÄ.Õ±.rx.* .Õ.Õ¼Š/30.Õ¯.¼Ù.à 000100
 20F98347 727EE980 4D74C90B DCD0F9D1 D0E4D07F E183F98B E98A04EE 83C186AC ¯.è.Ÿ..Õ.*.Ä.ÀÕÄÏ*ÄÉ.ètM.Õ-rG.* 000120
 32E68AC4 8AF88ADF 8AD30A01 E280D200 F501FA80 1A7C08F9 80D9F720 E983997F ...Õ ¼1.*.|..*.¼À0.ã..Æ.Õ.½.ó.12 000140
 8BCA8AF3 E2000280 DAD00BD1 D8D1EED0 000A8001 B201FA80 15E3E1EB 08E980F6 -.Õ.ŠÃD..*.ý..Õ.ÀÝïÀïÙÀÕ.0.ãµ.ò. 000160
 7C031178 36880131 E807B000 68E8FD35 E9C30088 C033000D1 800081F9 C3C38800 Å.ûû*Ÿ..Ï.3â.ÀûÕ5»Õh.¯.Õ1..6x..| 000180
 010BE803 B00087E8 FD0FE9C3 FE88067C 89E0737F F0FA817F E680D78B 10EF8306 ..ÿ..=.Ï..*þ.sÂ.|..±ûÕ.»Õ..¯.Õ.. 0001A0
 8B001EE8 C3FE8802 7C89DF73 7F80FA81 7FE680D7 880080EF 81027C03 11783688 .6x..|..ÿ...=.Ï..*..sÕ.|..tûÕ... 0001C0
 3E88FCC3 FE88027C 010080EF 81117836 880053E8 C3FE8806 7C0110EF 83117836 6x..ÿ..|..±ûÕS..6x..ÿ...|..+û=.> 0001E0

Dump of file SATURN:[PCCOMMON.DUMP.DLL]SA-PDLED.DLL;1 on 18-APR-1990 10:51:30.28
File ID (436,15,0)   End of file block 133 / Allocated 136

Virtual block number 71 (00000047), 512 (0200) bytes

 89CA0A0F E183F988 064C8800 108A1178 3688C08E A5A5A5A5 C18ED98C C08C1178 x..å.).èÊÊÊÊ.å.6x.¤...L..*.Ã..ò. 000000
 E93FEB09 F7047D04 33E981E9 D1E9D1E9 D1E9D100 35887FE5 80CF8BF0 E783064C L..Õþ.ü.Ï.¡5.1Õ1Õ1Õ1Õ.Õ3.).¼1Š?Õ 000020
 7FE183F9 88024C88 00808A11 783688C0 8EA5A5C1 8ED98CC0 8C11783E 88FC0082 ..=.>x..å.).èÊÊ.å.6x.¤...L..*.Ã. 000040
 C83BD9F7 487D0096 E981ED32 CD8AE101 0018887F E580CF88 80E78302 4C89CA0A .ò.L..Ó..ü.Ï.¡..1Ã.ë2Ù.Õ..)H¼);à 000060
 80147C08 F980D233 EA288000 E581EF88 C8880A74 C838FA08 8000E781 147CEF88 .ÿ|..Ó...*;ât..à.ÿ.Ï..+õ30.*.|.. 000080
 22EE8AD7 C18A0FB6 880CE334 8AE7EB46 08E98000 04C6140A 00028000 82F501FA *.Åý..0...ó...Õ.FŠÕ.4D.£Ñ..è=.Ÿ" 0000A0
 D30ADE22 D70AFAE2 D7D0EAD1 06E3E18A EF8A0001 8BC3348A D18BC933 C32C88E8 Ò.,û3è.1.4ûÉ...ÿ.ÃD.1õÅ=ã*.="8.Æ 0000C0
 4606E334 88F202CE 28C80398 11780E88 E2D3CC8A FD8B0274 000A8001 8281FA80 .*.ÿ..Õ.t..».âÆã..x...à+ö.·.4D.F 0000E0
 025D8826 02448BC3 E4D07FCC 80F8C8E9 C3F50301 4C747F80 C3F7C3FA E2001480 ...ã*ÙÃû..tLïÆ¼ûÕà«.ë.ÀÕÙ.D.&.). 000100
 E301D578 EF32EC8A D87403F7 7F80C3F7 D3F7E274 D0F77F80 A9D0F7E1 747F80A9 `..tÃ¼Å`..¼ÀtãÃÆ¼û..¼ÆtÃ.š2ÿx(1D 000120
 D15E747F F0C3F7C3 05382604 880575C3 3BDA8EC1 8ED98CC2 8CF78793 0B73E001 1Âs...¼.ó.).ê.Õ;Ùu...&;.ûÆûþ.t^1 000140
 7400F77F F0A9D0F7 E1747FF0 A9065D88 26064488 C3E4D07F CC80F875 E9C3F5D3 Æ¼ûÕu«.ë.ÀÕÙ.D.&.).`þ.tÃ¼Å`þ.¼Àt 000160
 C18ED98C C28CF787 930B73E0 D1E3D1D5 78EF32EC 8AD874D3 F77FF0C3 F7D3F7E2 ã¼Æ¼ûþ.¼ÆtÃ.š2ÿx(1D1Ás...¼.ó.).è 000180
 F787C305 38260488 05750245 38260244 880E7504 45382604 44881775 C33BDA8E .Õ;Ùu..D.&;E.u..D.&;E.u...&;.û.¼ 0001A0
 E7810174 88FF7C88 024C8880 CF8000B2 358A015D 88024588 03E880F4 80024588 .E..¶.Š..E..)..5ý..ü..L..|..t..Ó 0001C0
 800CF6E5 2A91FA87 F3870573 EC3A5B74 E40A6574 ED0AC0D1 C1D18000 CE81FF00 ...ö..ïêïâ.Úte.õt[:šs..µ.*.*Ï-É. 0001E0
```

```
Dump of file SATURN:[PCCOMMON.DUMP.DLL]SA-PDLED.DLL;1 on 18-APR-1990 10:51:30.28
File ID (436,15,0)   End of file block 133 / Allocated 136

Virtual block number 72 (00000048), 512 (0200) bytes

 33038801 CB800374 D208127C 0EF98055 E30085CD 8A91D9D0 E8D0C9D0 497718FC •.wIÂèÀÒÀ}..ëç.DU.'.|..Øt..ù..Æ3 000000
 7708E980 FD8ADF8A F38AD68A 01CE8003 74D20A28 7E05F980 3E741D72 10E9800B Ù.Õ.r.t>.'.-+.Øt..ö..•.µ.Ô.».Õ.w 000020
 20CA8003 743FC2F6 0097E9E8 D0C18BD7 8BDE8B19 EBF875C1 FED3D1E2 D1237417 .t#ìëìÆ±èu%Š..ß.•.ëÀÒÕ..-ô?t..ò  000040
 FC80C4FE DAD1D8D1 50730E13 D7031470 E00020CA 8003743F C2F6FAE2 DAD1EBD1 ÎŠÌÒã'-ó?t..ò ÀÀp..•.ßsPÌÛÌÖ±á.• 000060
 EC800875 D80BD0F6 000383F5 DAF7D3F7 0A73DE88 D788F31B FA2BFA41 E94575FF .uEÕA'+'.µ.•.ßs.¥Æ¥Ö%.Æ.-Å.Ûu..š 000080
 CCFE0A78 FF0AD232 F28ADE8A F88A5876 08EC800F 75FF0A64 74DB080A 876A7610 .vj.Õ.Ùtd..u..š.v[.«.ß.·2Ø..x.±ä 0000A0
 C6800F74 01C6F614 72077780 FA80017C E9037400 0FBE3E80 F671D3D1 E2D14B74 tKÌãÌÆq-.>ƒ..t.Õ|..'.w.r.-ó.t..ó 0000C0
 783E88C7 0A7FE780 80241774 7F80A908 D1E0003A 74FFFC80 C4FE0773 00D38301 ..Æ.s.±á.•.t:ÀÅÌÅ`..t.$..Ô..ú.>x 0000E0
 02458911 783E88C0 33017EE9 0374000F BE3E80C3 F7880589 C68AE38A 02458911 ..E..D.ó...¥ú.>ƒ..t.Õ-.3á.>x..E. 000100
 ED0AD900 E1D10240 88D674E4 0AD8D0E0 D1963488 ADFCF990 E9E679C3 F7880589 ...¥úÿ]Õ.'•Ù.4.ÌÀÅÄ.Õt•.M.ÌÃÅ].Ú 000120
 80EF8AFF 3250CD74 FFFC8080 C480D370 E5027FED 8080EC80 C132D888 3D88CB74 tù.¤.Â2è.š..Ù..]pÆ.á..•.tëP2..ÿ. 000140
 E6F7C188 FA8B00D2 830803E7 F7C58850 9FC0080A 88E7F7C6 88E88880 C98080CB ù..è..Š.ó%Ó.Ö.â.P.é%Ó.Ä.Ø..'.ë%Ì 000160
 75E40AD3 D1E2D108 78FF0A58 930388C7 03E1F6C5 8801C880 03749E58 FA130803 .Ä.'X.t..ù..é-Ä.ú.Æ.X..x.ÌãÌÆ.ßu 000180
 ED0AD800 E0D10244 88D900E1 D1024D88 F787FF1A E9AD74FF FC80C4FE FF69E90A .Õì.±á.•.tÙÕ...¥.M.ÌÃÅ].D.ÌÀÅÄ.Ú 0001A0
 FF78E903 75FFFC80 80C480FF 78E90371 E52A7FED 8081EC80 C132D874 E40A5C74 t\.õtÜ2è.š..Ù.'lq.Õ(..á..•.u.Õx. 0001C0
 32248A01 5488500F BE3E02D9 D1EBD108 74000FBE 3E8080CF 80C9322D 8A015D88 .]..-2è.ü..>ƒ..t.ÌŠÌ].>ƒ.P.T..$2 0001E0

Dump of file SATURN:[PCCOMMON.DUMP.DLL]SA-PDLED.DLL;1 on 18-APR-1990 10:51:30.28
File ID (436,15,0)   End of file block 133 / Allocated 136

Virtual block number 73 (00000049), 512 (0200) bytes

 80E9FF76 E9DD8801 CA800374 D688C208 0011E8EE 88001AE8 D8D1EAD1 80CE80C0 â.õ.ÌõÌÀÒ...ŸÒ...ô.øt..ò..ÌÕv.Õ¯ 000000
 73D313C1 034E0773 D788FA1B D8F7E1F7 C688FA88 15E3C033 96F3F71D 73D33BF8 ½;Æs.¼µ.3äD..'.ó%Ä¥Ä.'.øs.N.é.Æs 000020
 EC3A0EED 800774ED 0A0FC02E 8A000FBE 06C6C3ED 73C18800 03C12BFF FFBEC3F9 'ùƒ..+é.Â.ésÚúó.ƒ....â..Üt..Û.:š 000040
 7806C758 5B5AFE4E E8D832D2 33525350 0FC11178 06C71178 36FF3874 E40A3C77 w<.õt8.6x.ú.x.ê.PSR3Ø2ÜÒN ?(Xú.x 000060
 36FF0FBE A2D2330B 33C033FE 33E91178 068F585B 5AFE0FE8 FF325253 500FC511 .é.PSR2.Ò.±Z[X..x.Õ3±3ã3Ü3?'′..6 000080
 00F58106 6D8BF787 D3E80FC3 A30FC1A3 C033FE1A E8525350 0FC51178 06C71178 x.ú.x.é.PSRÒ.±3ãÈè.Èü.ŠÆ.¥.m..%. 0000A0
 066D88C3 FE881178 3688ABE6 0A80E680 7FE480AD A5A5A511 783E88F7 881DE880 .Š..%.>x.ÈÈÈÙ.ô..Ì..Ì¨.6x..±ü.m. 0000C0
 74C00BD6 8695F787 0977E838 E0E583D2 74FFE025 DAD0E001 DED0E5D1 06448BFC •.D.ÌÌÀßÌÀÀÖ%À.tØ.ÌÀ;Ôw..¥..•.ât 0000E0
 E08AACF8 88E086C0 D1C0D1C0 D157DD01 E2D000D1 E600B977 06A03008 F7C528C2 ó+é¥Ä=..w¿ÀÌÌÌÀãÌÌWÌâÌâÌâ.Á.½¯.Á 000100
 D18801C9 800374D2 0B187C0E FF836374 FF0B10CC 800FE480 AD93AD91 AD92C032 2â.Ù.Ù.Ù.õ..ä...tc...|..Øt..è..Ì 000120
 8AF18AD6 8A01CE80 0374D20A 287C06FF 83237248 74E77710 EF83C033 D888C888 .ù.Ä3â.ÿ.wÒtHr#...|+.Øt..ö..•.þ. 000140
 8716E8F5 7547D001 D3D1D1D1 E2D12374 0F7708EF 83E432C4 8AF88ADF 8AE88ACD ë.Š.Ô.½.á2õ.ÿ.w.t#ÌãÌÌÌÆÌÂGu%Š.. 000160
 D120CA80 03743FC2 F6975ECF 87F6E20A D1DFD1D8 D1E8D120 CA800374 3FC2F6CF ü-õ?t..ò ÌÒÌÛÌÖÌÖã-.ü^.-ô?t..ò Ì 000180
 589E5810 00CE810F FFE68105 7488509F 50035C13 014C1334 02D8D0E5 D13B70E5 Ìp;ÌÌÀÄ.4.L..\.P.P.t..Ì...ö..X.X 0001A0
 E5D10088 E9F6ECE9 0375E0FD 8320C583 DAD10901 D8D1DFD1 13742000 C7F7FE13 .±¥ú. t.ÌÒÌÛÌ]ÌÖ.é .»Äu.Õš-Õ..ÌÌ 0001C0
 F6F63313 73FE189E 1000CE81 0FFFE681 9F05748B 035C1801 4C18342A D0F6D8D0 ÄÄ-Ä*4.L..\..t...Ì...ö....±s.3-- 0001E0

Dump of file SATURN:[PCCOMMON.DUMP.DLL]SA-PDLED.DLL;1 on 18-APR-1990 10:51:30.28
File ID (436,15,0)   End of file block 133 / Allocated 136

Virtual block number 74 (0000004A), 512 (0200) bytes

 00ED8113 75E0C7F6 1875FF08 0004BEFC FE130E13 CE13F50A F7D1F7D3 F7D7F7D0 Ä%•%Æ%Ì%Ö%.ö.ß.±•ƒ....u.-úÄu..Û. 000000
 8AE08A97 27760100 E0811875 1FE0C7F7 E4EB0233 CA880988 FB883D74 4E407602 .vØNt=.«.].ò3ØŠÒ%úÁ.u..Û..v'..Å. 000020
 D1D3D1D1 D1E2D171 7420ED83 12751000 C7F79700 82F28ACE 8AE98ADD 8AFB8AC7 ú.«.Ì.Õ.ö.·ý..¥ú..u..Û tqÌãÌÌÌÆÌ 000040
 01C6801A 7401C6F6 1F720777 80FA8003 85E90374 000FD63E 80FC9065 E8E8E807 •$Š$e.•.>ø..t.Õ...'.w.r.-ó.t..ó. 000060
 24DE8711 783E88F7 883074E0 FD8320C5 83087420 00C7F700 D7830003 83000183 .Ì..Æ..•.¥ú. t..é .»Át0.¥.>x..ß$ 000080
 83A8C688 A8C188AA C68A055D 88064589 C70AC50B C032E086 2274EDD1 0FE78080 ..Ô.ÌÚt".Á2â.é.ú.E..]..ó¨.è¨.ó¨. 0000A0
 A8A8A8F7 8811783E 88C03303 77E90374 000FD63E 80FCF5FD E90379C3 F78805EF ÿ..¥úy.Õ»¥•.>ø..t.Õw.3â.>x..¥¨¨¨ 0000C0
 002DE1D1 E001D074 7FF0E181 D130640D 8808747F F025D088 06448BFC C3FE8BAB ¨.±Û•.D..Ä%Þ.tÜ.M.3].Äþ.tÄÌÄÌÄ-. 0000E0
 D15D01CA 80037401 81E8500B D1E6D0B6 74FFE030 8000058C 70C1037F E0E98180 ..ÕÁ..êp¥...=Á.tÑÁÌÌÁPÒ..t..ò.]Ì 000100
 E98874E0 FD8320C5 8393EB0A 75ED08D7 D1D3D1D1 D1E2D10E 751000C7 F7D800E5 ÌÄÄ¥ú..u.ÌãÌÌÌÆÌ•.Ûu.Š..é .»Át.Õ 000120
 D1E0019B 747FF025 D0330644 88EF747F F0E181D1 88064D88 FCF787F5 8CE9FF24 $.Õ.¥.¥•.M..1.Äþ.tÿ.D.3Ä¥Þ.t.ÌÁÌ 000140
 93ADC932 E88AAC50 08D1E6D0 9874FFE0 30800005 9870C128 7FE0E981 80202DE1 Ä- ..ÕÁ.+êp....=Á.t.ÁÌÌÁP¯.Ò2èÙ. 000160
 4746A5A5 AB10CC80 0FE480AD FD0FD48F 05C683F7 88509210 CC800FE4 80AD92AD Ù.Ù.Õ..ä..P.¥.ó.¢â.»Ù.Õ..ä.¨ÈËFG 000180
 D1ADED01 A80FD626 02E8D1E8 8BADF788 0FD48FFD 1F74000F D63E8000 05C6FCA4 Ê•ó...>ø..t.»¢â..¥Ù.ÒÌÒ.&ø.¨ÌÙÚÌ 0001A0
 570037E8 57003BE8 57003FE8 D9D1D8D1 D8D1EAD1 58FCAB08 D1ADAB08 D1ADAB08 Ä¨ÙÌÄ¨ÙÌÄ¨•XÌõÌÂÌÙÌÌÒ?.WÒ;.WÒ7.W 0001C0
 D1D8D1EF D108CA80 037407C2 F601CA80 03745F58 590788C2 08C108C3 080033E8 Ò3..ù.ê.ô.•Y[_t..ò.-ô.t..ò.ÌÿÌÛÌ 0001E0
```

```
Dump of file SATURN:[PCCOMMON.DUMP.DLL]SA-PDLED.DLL;1 on 18-APR-1990 10:51:30.28
File ID (436,15,0)   End of file block 133 / Allocated 136

Virtual block number 75 (0000004B), 512 (0200) bytes

 5C73D63B FF330FD4 368BFF08 E9DAD1D9 D1DBD1EF D1DAD1D9 D1DBD1EF D1DAD1D9 ІІÖіÿІÜІІІÖіÿІÜІІІÖÕ...6å.3.;øs\ 000000
 080FD0A1 50F28BE7 F70474C0 080FCEA1 F588ED33 9752F6F7 3B77F03B 0475D20B .Øu.;Þw;%-R.3Ú.%Äö..åt.%Ó.·PÅÅ.. 000020
 5DD01BCE 1BDAF75A 9200D283 E803E7F7 0874C00B 0FD2A1EA 13F003E7 F70674C0 åt.%Ó.Þ.õÀØ..åt.%Ó.Ò.Ø..Z%Ö.ö.ï] 000040
 CE0E2B4F C3ED730F D416130F D206130F D01E130F CE0E034F 13739391 9295E81B .Ò....s.O..ö...Å...Ø...å.sÚÜO+.ö 000060
 24E43206 448AC9EB F50FCE16 8BC2130F D21E130F D00E030F D2061B0F D01E1B0F ...Å...Ø...Å...Ø..ô..ö.%Šè.D.2Õ$ 000080
 8BE1F708 E30D8891 1AE30C8B EB8B0833 0FCCA310 0C0F2406 458A0FCA A3100C0F ...Èò..E.$...Èä.3Ü.Š..D....D.%Ä. 0000A0
 D2081588 0E74C00B 02448BED 3355DA13 C803E2F7 0674D20B 02558B04 8BCA8BE8 Ò.ò...U..Øt.%ã.à.ÕU3Ú.D..ât....Ø 0000C0
 D803E2F7 0674D20B 02558B00 74C00B02 448B50C1 0B58D5D1 DA13C803 E2F70874 t.%ã.à.ÕïíX.ëP.D..ât..U..Øt.%ã.Ä 0000E0
 0F74C00B 04448BD1 D1EA13D8 03E2F708 74020B04 558B0F74 C00B048B C933EA13 .õ3è...ât..U..Øt.%ã.Ä.õïî.D..ât. 000100
 13E8030F CC26F708 74C00B04 8B50C30B 5800D183 EA13D803 E2F70974 D20B158B ...Øt.%ã.Ä.õ.î.X.ÚP...ât.%&ä..Ò. 000120
 F70874D2 0B04558B 0F74C00B 02448B0B 33CA13E8 030FCA26 F70874C0 0B0588CA ò...ât.%&ò..Ò.ò3Ü.D..ât..U..Øt.% 000140
 33550003 83CA13E8 03E2F709 74020B02 558B1074 C00B0444 8BD3D1CA 13E803E2 ã.Ò.òì€.D..ât..U..Øt.%ã.Ò.ò.€.U3 000160
 8BDA13C8 030FCC26 F70874C0 0B02448B DA13C803 0FCA26F7 0874C00B 02458BED Ú.E..ât.%&ò..à.Ö.D..ât.%&ä..à.Ö. 000180
 EA13D803 0FCC26F7 04448B05 D1DA13C8 03E2F70B 74020B04 558B1A74 C00B0444 D..ât..U..Øt.%ã.à.Öïí.D.%&ä..Ä.õ 0001A0
 D3D1D1D1 E2D15A97 C5030FCC 26F60FCA A0EA13D8 030FCA26 F70874C0 0B04458B .E..ât.%&ò..Ä.õ.ò.-&ä..é.Zïãîïí€ 0001C0
 0B0FD736 8B000FD6 06C6C3F6 0B5ED7D1 D3D1D1D1 E2D1D7D1 D3D1D1D1 E2D1D7D1 ïiïãïïï€ïiïãïïï€ïø^.-ûó.ø...6ø.. 0001E0

Dump of file SATURN:[PCCOMMON.DUMP.DLL]SA-PDLED.DLL;1 on 18-APR-1990 10:51:30.28
File ID (436,15,0)   End of file block 133 / Allocated 136

Virtual block number 76 (0000004C), 512 (0200) bytes

 33575553 5251500F D9117806 C7117836 FF4C74ED 0B5077F5 3B04C0EE 810874F6 -t..Ÿâ.;%wP.ÚtL.6x.ú.x.).PQRSUW3 000000
 5FFBD1E8 FF335755 53525150 0FE11178 06C75859 5A58505F FC3EE802 33C9330B Û3è3ØÒ>■_][ZYXú.x.Ä.PQRSUW3.Òi« 000020
 C7117836 FF0FD6A2 FF33ED33 D8330233 C933C033 FC1AE911 78068F58 595A585D ][ZYX..x.Ō.▪3à3è3Ø3Ü3Ú3.Åø..6x.ũ 000040
 04EC83EC 8B5500C6 EBABABAB ABC0330F D98FF8F8 E8575553 5251500F E1117806 .x.Å.PQRSUWÒ½««€).3ä¨¨¨¨¨Š6.U.š.š. 000060
 5E8807EB 00200598 078A2606 5E880C74 010E4987 F6D88898 078A2606 5EC45657 WVå^.&....Ä-.I..t..^.&.... .Š..^ 000080
 08468C06 7E89F275 040E4987 F6D88898 058A2647 FB8B1674 00653D98 078A2606 .&...=e.t..«G&....Ä-.I..u·.-..F. 0000A0
 F78B0788 26C68BF8 8B98078A 26065E8B 2E07C626 0646FFF0 8B98078A 26065EC4 å^.&....Þ.F.&ó...^.&....½.ó&...½ 0000C0
 80269008 E8067EC4 565706EC 83EC8B55 CB5DE58B 5F5EFC7E 89E975C0 0A0646FF .F..âuÕ.-■^_.[]ùU.$.š.WVó-.Š..&. 0000E0
 E8067E8B 6774003F 80260646 FFDF8B08 468C067E 89F37500 3D802647 07742E3D =.t.G&.=.uµ̄.-..F..Ô.F.&.?.tg.-.Š 000100
 FFC28CC7 8B08468C 067E89ED 75003D80 26470774 453D8026 0D74653D 8026900E ..&.=et.&.=Et.G&.=.uÚ.-..F..ú.ô. 000120
 3F80260F 8B08468C 067E89F9 74303D80 264F9002 E8067E8B FE5689FC 4689064E N..F■.V±.-.Š..O&.=0t'.-..F..Ô&.? 000140
 FE5E8CFC 7689F275 C00A0788 26AC065E C40646FF FC76C5FA 5E8C064E FF03752E .u..N..^'év■.F.ó^.¯&...âu·.v■.^± 000160
 699A2A21 06C99A06 5EC42A1C 06E99A2A EA1E8DEC 8B5590CB 5DE58B5F 5EFA5E8E .^'^_.[]ù.U.š..õ*.Ö..*ó^..è.!*.i 000180
 FF0E76FF 24740006 7E835657 08EC83EC 8B55C85D C02BCB5D 0001B805 722A450B .E*r̄.¡..]Ù+â]ÙU.š.š.WV.-..t$.v.. 0001A0
 90CB5DE5 8B5F5E1F A5A5A5A5 DA8E1EF0 8BF8B808 5EC404C4 832A6933 F89A0C76 v..½3i*.ó.ó^..«.Þ..ÖEEEE.^_.[]ù. 0001C0
 F85E8D1F A5A5A5A5 DA8E1E07 16F08BF8 7E8D04C4 832A8333 F89A0C76 FF0E76FF .v..v..½3.*.ó..-½.Þ....ÖEEĒE..^½ 0001E0

Dump of file SATURN:[PCCOMMON.DUMP.DLL]SA-PDLED.DLL;1 on 18-APR-1990 10:51:30.28
File ID (436,15,0)   End of file block 133 / Allocated 136

Virtual block number 77 (0000004D), 512 (0200) bytes

 0FF03E80 56570AEC 83EC8B55 90CB5DE5 8B5F5E2A FF083C9A 085EC42A 8B06E99A .Õ..*ó^..<..*^_.[]ù.U.š.š.WV.>Þ. 000000
 C02B02EB 0001B805 752D3F83 26F85EC4 FA5689F8 46892DE4 168B2DE2 A1477400 .tGÀã-..õ-.F½.V̄*ó^½&.?-u.¡..Š.+â 000020
 76FFFE76 FF50C02B 9003EB00 01B8067E 000E7E83 FE5689FC 46890C56 8B0A4603 .F..V..F■.V±.-..-.¡..Š..+âP.v±.v 000040
 3D36D09A 37FF2602 77FF2604 77FF2606 77FF2606 5EC458EB 06C48304 5DE80EFC ■.Õ)..ó.ŠXó^.&.w.&.w.&.w.&.7.Äó= 000060
 5EC4C02B 02E80001 B8057E00 0E7E8350 400E4688 5052FA56 89F84689 08C4832B +.ó..F½.V*RP.F.ØP.-..-.¡..Š.+âó^ 000080
 83289734 4E9A5052 0C568B0A 4603C703 C02B02EB 00018805 752D3F83 26F88BF8 ½.½&.?-u.¡..Š.+â.ú.F..V.RP.N4.+. 0000A0
 07C626FC 46FFFC5E C40A752D 3F8326F8 5EC4FE56 89FC4689 0C568B0A 46880AC4 ó..F..V..F■.V±ó^½&.?-u.ó^■.F■&ó. 0000C0
 501E0FEA 8B2E07C6 26FC5E8B FC46FF07 88260147 8A26FC5E C4147E00 0E7E832D ·.-..-.ó^■&.G.&...F■.^■&ó..¡õ..P 0000E0
 89FC4689 08C4832C D104DA9A 5052FE56 8BFC4603 0E4603D8 F7C01B01 0FF03E80 .>Þ...óÄ.F..F■.V±RP.Õ.¡,.ó..F■. 000100
 C45E7430 3F802606 5FC426F8 5EC4FC46 FF4507C6 26FC5EC4 07740010 7E83FE56 V±.-..t.ó^■&ó.E.F■ó^½&ó_.&.?0t^ó 000120
 157C64FE 83FC46FF 2D07C626 FC5EC4F0 8BD8F70B 7DF60BF0 8B480247 8B26F85E ^½&.G.H.Þ.-).%Ä.Þó^■&ó.¯.F■.±d|. 000140
 99C68B15 7C0AFE83 FC46FFF2 8BF9F799 C6880700 26FC5EC4 F9F70064 B999C68B .ó.¿d.%*ó^■&...ó.%*.·.F■.±.|..ô. 000160
 0A468B07 0026C68B FC5EC4FC 46FF288B F9F799C6 88070026 FC5EC4F9 F7000AB9 ¿..%*ó^■&...ó.%*.·.F■ó^■.ó&...F. 000180
 76FF0C76 FF0E76FF 1076FF01 0FF006C6 04EC83EC 8B5590CB 5DE58B5F 5E0C568B .V.^_.[]ù.U.š.š.ó.Þ...v..v..v..v 0001A0
 12EC83EC 8B55CB5D E58B000F F006C6FE 5689FC46 89FE49E8 0E0676FF 0876FF0A ..v..v..Öì±.F■.V±ó.Þ...[]ùU.š.š. 0001C0
 752D3F83 26F45EC4 F65689F4 46892DE4 16882DE2 A1517400 0FF03E80 00F246C6 óF·..>Þ..tQÀã-..õ-.F¶.V-ó^¶&.?-u 0001E0
```

```
Dump of file SATURN:[PCCOMMON.DUMP.DLL]SA-PDLED.DLL;1 on 18-APR-1990 10:51:30.28
File ID (436,15,0)   End of file block 133 / Allocated 136

Virtual block number 78 (0000004E), 512 (0200) bytes

 03FC4688 6A750E46 390FF2A1 FE5689FC 46890C56 880A4603 C02B02EB 0001B805 .|..Š.+å.F..V..F=.V±À·.9F.uj.F=. 000000
 26065EC4 4AEB0007 C626EE5E 8B3007C6 26EE46FF EE5EC4F0 5689EE46 890FF206 .·..FŸ.Vÿá^Ÿ.FŸ&6.0.^Ÿ&6..ŠJá^.& 000020
 5EC45052 F65689F4 468908C4 832D0136 D09A37FF 260277FF 260477FF 260677FF .w.&.w.&.w.&.7.À6.-.á..F¶.V-RPá^ 000040
 4E9A5052 0C56880A 4603C02B 02EB0001 B805752D 3F832650 0E460302 478B26F4 ¶&.G..F.P&.?-u.|..Š.+å.F..V.RP.N 000060
 46FFFC5E C40A752D 3F8326F4 5EC4FE56 89FC4689 0C56880A 46880AC4 831B8034 4¯..á..F..V..F=.V±á^¶&.7-u.á^=.F 000080
 06C48302 05E80EFC 76FFFE76 FF500001 B81D7F00 027F8326 F45EC42D 07C626FC =&6.-á^¶&......|..P.v±.v=.Ò...á. 0000A0
 500001B8 687E000E 7E83FC46 0102478B 26F45EC4 0AEB3007 C626FC46 FFFC5EC4 á^=.F=&6.0Š.á^¶&.G..F=.~..~h|..P 0000C0
 7D00027F 8326F45E C42E07C6 26FC46FF FC5EC406 C48301D8 E80EFC76 FFFE76FF .v±.v=.ÒÄ..á.á^=.F=&6..á^¶&....) 0000E0
 46890E46 8B037E0E 463BD8F7 02478B26 0EEBD8F7 02478B26 0874000F F03E8043 C.>Þ..t.&.G.¼ÄŠ.&.G.¼Ä;F.~..F..F 000100
 18360A9A FC76FFFE 76FF5000 30B80E76 FF06C483 0196E80E FC76FFFE 76FF500E .P.v±.v=.Ò...á..v.¡0.P.v±.v=..6. 000120
 FF0C76FF 0E76FF01 0FF006C6 04EC83EC 8855CB5D E5880C56 880A4688 08C4832E ..á..F..V..[]ûU.š.Š.6.Þ...v..v.. 000140
 83EC8855 90CB5DE5 88000FF0 06C6FE56 89FC4689 FE6EE80E 0676FF08 76FF0A76 v..v..v..Òn±.F=.V±ó.Þ...[]ù.U.š. 000160
 2DE2A308 C4832E54 36D09A37 FF260277 FF260477 FF260677 FF26065E C45606EC š.Vá^.&.w.&.w.&.w.&.7.À6T..á.Èã- 000180
 4603C02B 9003E800 01B80675 2D3F8326 0FF2A348 02478B26 2DE21EC4 2DE41689 ..ô-á.ã-&.G.HÈ·.&.?-u.|..Š..+ó.F 0001A0
 77882620 E21EC40A C4832F54 344E9A50 520E76FF 5306FE56 89FC4689 0C56880A ..V..F=.V±.S.v.RP.N4T/.á.á.ã-&.w 0001C0
 7F0E4639 C688077C FCFE830F F236890F F4A2C02A 02EB01B0 04700FF2 36394E02 .N96·.).¯.Š.*åÄ¶..6·..±=|..69F.. 0001E0

Dump of file SATURN:[PCCOMMON.DUMP.DLL]SA-PDLED.DLL;1 on 18-APR-1990 10:51:30.28
File ID (436,15,0)   End of file block 133 / Allocated 136

Virtual block number 79 (0000004F), 512 (0200) bytes

 90CB5DE5 8B5E0CC4 83F093E8 0E0676FF 0876FF0A 76FF0C76 FF0E76FF 1076FF1F ..v..v..v..v..v..v..Ò.».á.^.[]ù. 000000
 FC5EC4FA 5E8EFE5E 8CFC7689 F97500FF 7C8046FC 76C5FA5E 8C1E7400 0FF43E80 .>¶..t..^*évF.|..u*.v=.^±.^*á^= 000020
 CB5DE58B 5E0AC483 FEF6E80E 0676FF08 76FF0A76 FF0C76FF 0E76FF00 FE47C626 &6G±..v..v..v..v..v..Ò-±.á.^.[]ù 000040
 76FF0876 FF0A76FF 0C76FF10 76FF1276 FF197545 0E7E8306 74650E7E 83EC8855 U.š.~.et..~.Eu..v..v..v..v..v..v 000060
 39E80E06 76FF0876 FF0A76FF 0C76FF10 76FF1875 660E7E83 9035E8F8 8FE80E06 ..Ò.«$5..~.fu..v..v..v..v..v..Ò9 000080
 500CC483 FEC0E80E 0676FF08 76FF0A76 FF0C76FF 1076FF12 76FFCB5D 0AC483FD ».á.]ù.v..v..v..v..v..v..Òå±.á.] 0000A0
 76FF0876 FF504004 C4832F6F 053A9A06 76FF0876 FF297400 0A7E83EC 885590CB ù.U.š.~..t).v..v..:.o/.á.@P.v..v 0000C0
 1EEC8855 4590088C C88BCB5D 0AC4832A 1435409A 50520856 88064603 0A468806 ..F..F..V.RP.@5.*.á.]ù.à.Ä.EU.š. 0000E0
 1FE58802 ED83F80F F816890F F60E8908 EB100811 7806C708 74127703 FB83088E .Ä.«.w.t.ú.x...Š...~...½.½.Ù..[. 000100
 098EA5A5 FCD88EC1 8ED98CC0 8C0FFABF F388CBF3 F60CB310 082D1178 A1CB405D ]MùÀx.-..*.-µù.µ¢*..á.\.è.Ä=EE.\ 000120
 89FC758B C30FFABE D98EA5A5 A5A5FCD8 8EC18ED9 8CC08C0F FABFF388 C30FFABE ƒ*.û.µ¢*..å.\.è.Ä=EEEE.\ƒ*.û.u=. 000140
 D1D901FA D1058925 747F80C2 F7025488 0C88C033 FCFC758B 03EB07FE 45C6FC7D )=6E±.Š..u==3å...T.%ô..tX..Ì*ìÌÌ 000160
 0589C306 55893800 C2818FE6 80044D89 02458908 D1D901FA D1D8D1D9 D1FAD1D8 Äì*ÌÌìÄì*ÌÌìÄ.E..M..Ì..ô.8.U.û.. 000180
 7C681E27 98A3E086 580000FF FF9A5016 C48850EC 8855C306 45890445 89024589 .E..E..E.ûU.šP.ó.P.....X.ÀE.'.h| 0001A0
 31D09A50 CB5DE58B 0001B82D BF371C9A 0090E800 21E80000 FFFF9A11 7A681E11 ..hz......Ò!.Ò....7¢-|...[]ùP.À! 0001C0
 75003D80 267FFFB9 117C068E FF330000 BB1E1182 16FF00FF 68306032 2A9A3053 S0.*2'0h.......£..3...|.¿..&.=.u 0001E0

Dump of file SATURN:[PCCOMMON.DUMP.DLL]SA-PDLED.DLL;1 on 18-APR-1990 10:51:30.28
File ID (436,15,0)   End of file block 133 / Allocated 136

Virtual block number 80 (00000050), 512 (0200) bytes

 071E061C EBE774AE F2C03308 74CA88A6 F3CB8801 8815868E 31740030 80264701 .G&.=.t1ƒ...ǃ.ùµǃ.òt.3å·ÙtóŠ.... 000000
 DC885A59 00C31FED EBAAC20A 0572412C AC9204E0 C00E7241 2CAC279F BF1FF78B .¼.¢.'"..Ar.åÀ..¯,Ar..ó˜ŠÙ.û.YZ.É 000020
 15942EFF 5152FF82 E9C03305 75401594 A1CB5152 E3880572 15981E38 0872D82B +Àr.;...r..DRQùÀ..ðu.3éÒ..RQ.... 000040
 3040B112 7558C00B 000001F3 9A521650 1653C488 50B7279F A7800488 520002B8 £..R.å.Ì.'ñP.éS.P.R.µ.....åXu.Ÿð= 000060
 33C28C2A C206C41E E32AC00E 885AD479 48279F8F 08088106 75000230 07740001 ..t.=..u.Ÿ....'KyåZ..å*D.á.ó*.ó3 000080
 007CE82A CABF2ACA BE2ABE1E FF0003BB C28C2AC6 06C400CA E903732A BE1EFFDB Û..ƒ*s.Òò.á.ó*.óE....ƒ*ƒò*¢ò*ò|. 0000A0
 007BB8C3 0000FFFF 9A315D68 0E016A08 742ACE30 2ACAB800 73E82ABC BF2AB8BE ƒ|*¢¥*òs.|ò*=ö*t.j..h]1.....ù|ç. 0000C0
 E82DEEBF 2DEEBEEC 8B550000 31589A00 6A006A03 6A0051E8 2ACEBF2A CABED8BE .Äƒò*¢ö*òq.j.j.j..X1..U.šƒŸ-¢Ÿ-ò 0000E0
 E82ACEBF 2ACEBE00 23E82ACE BF2ACEBE EC885503 EB0031E8 2ACEBF2A CABE003A :.ƒò*¢ö*ò1.Š.U.šƒö*¢ö*òÆ.ƒö*¢ö*ò 000100
 0E73F73B C32ABE1E FF0002BB 07E32AC0 0E880000 FFFF9A50 06468A50 C033001A ..3åP.F.P........å*D.£....ƒ*ù;¼s. 000120
 29823E83 3065322A 9A5000FC B8EC8855 00C3EEEB 1DFFF274 02450B05 8804EF83 .ÿ...E.t·..ŠŸù.U.š|=.P.*2e0.>ÿ) 000140
 B85756EC 8855FE62 E90002B8 CB5DE58B 31DA322A 9A5000FF B829B01E FF047400 .t...¯)|..P.*2ô1.[]ù|..Òb±U.šVW| 000160
 EBF788AE F2FFFFB9 C033970C 74964010 74C23BAD 2AFABE06 568BC08E D88E315E ^1.Ä.å.V.ƒ*ªÙ;òt.@.t..3å¿..Ù.%Š 000180
 B9C033FA 88921F74 C00B31EE 31FA9A06 76FF57EC 88550002 CA5DE58B 5E5F96EB Š._^.[]ò..U.šW.v..*1Ÿ1.åt...*3å¿ 0001A0
 0002CA5D E5885F5B 00000452 9A501651 521E5300 028BC48B 504901F7 AEF2FFFF ..¯Ù%11P.éE..S.RQ.P.R...[_.[]ò.. 0001C0
 89218E05 E001C103 E001C888 F9F7000C B999159A 20044688 298406FF 000004C8 à.....Ç).F.·...¿..¼*.àìÀ.ëìÀ..!. 0001E0
```

```
Dump of file SATURN:[PCCOMMON.DUMP.DLL]SA-PDLED.DLL;1 on 18-APR-1990 10:51:30.28
File ID (436,15,0)   End of file block 133 / Allocated 136

Virtual block number 81 (00000051), 512 (0200) bytes

 261174D0 08085789 26064789 26045EC4 02C48332 3433309A 020068FE 5E8CFC46 F•.^±h...=342.6.6^.&.G.&.W..At.& 000000
 2640FE56 88FC4688 040A4F80 26045EC4 9021EB02 000247C7 26FC5EC4 080A4F80 .O..6^•&úG...Š1.6^.&.O...F•.V±@& 000020
 89260789 26085788 26064788 26045EC4 00010247 C726FC5E C4085789 26064789 .G.&.W.6^•&úG...6^.&.G.&.W.&..&. 000040
 A2E9D996 E9C03300 09BA0872 279D1E3B 065E88EC 8B55C3C9 00000447 C7260257 W.&úG...èúU.š.^.;..'r.□..3àÕ.1ÕÀ 000060
 A78091E1 75C0855A 59000003 329A5116 0C76FF08 76FF0A76 FF53CC8B 04EC8309 ).š..äS.v..v..v..Q.2...YZ.âuÃ..Ï 000080
 EC8B55CB 5DE58B01 FE4F8026 0574C30B C08C065E C4EC8B55 00CB5DE5 8BFD279F .'».Í]ù.U.š6^..â.ût.&.O±..Í]úU.š 0000A0
 750082E8 29E6A312 740025E8 08750029 E63E831E 73FFF13D 06468B57 5602EC83 .š.VW.F.=þ.s..>Ì).u.Õ%.t.ÈÌ)Õ..u 0000C0
 3900F08B CB5DE58B 5E5F02C4 83328B38 769A0676 FF0B7500 78E80574 0018E815 .Õ..t.Õx.u..v..v8.2.6._^.Í]ùÈÞ.9 0000E0
 8333713A 7A9A5002 B0510E4F 8050501E C033FE5E 89FEE383 43065E8B 0776065E ^.v..^.C.D±.^±3â.PP.O.Q¯.P.z:q3. 000100
 C033D88E FE5E8B00 08A3DA8E 0574D20B 29EAA329 E81687C2 8B3874FF FA8308C4 6..'.t8.ô..Õ)Èõ).Øt..ÕÈ...^±.Ã3â 000120
 1FD88C00 06A30000 05000AA3 01478D00 02A30000 A3000A88 0C478948 480008A3 È..HH.G.¡..È..È...G.È.....È...Ä. 000140
 7EC45657 000000C8 C3D98EC1 8CD20B04 CEE829EA 1E8EDB33 064E8BC0 8ED88CC3 Û.Ä.à.N.3Ù..õ)Õö..Ø.ê.1ùà...WVá~ 000160
 3A9A5706 006A006A 08468C06 7E89F275 080E4987 F6D88B98 058A2647 9002EB06 .Š..G&....Ä-.Ì..u·.-..F.j.j..W.: 000180
 DA8E1E07 1EF08B2D E6BF0008 050AC483 339D3BB1 9A570876 FF5004C4 83342E05 ..4.6.P.v.W.Ý;.3.6....¢Ì-.Þ....Ö 0001A0
 FA5689F8 46890856 88064688 56570000 0AC8CBC9 5F5EDA8C 2DE6B81F A5A5A5A5 ÈÈÈÈ.¡Ì-.Õ^_èùà...WV.F..V..F½.V' 0001C0
 7E000A7E 833007C6 26F846FF F85EC4FE 5689FC46 89085788 26064788 260C5EC4 6^.&.G.&.W._F•.V±6^½.F½&6.0.-..- 0001E0
```

```
Dump of file SATURN:[PCCOMMON.DUMP.DLL]SA-PDLED.DLL;1 on 18-APR-1990 10:51:30.28
File ID (436,15,0)   End of file block 133 / Allocated 136

Virtual block number 82 (00000052), 512 (0200) bytes

 04883080 9003EB07 8A26FC46 FF097400 3F8026FC 5EC4F876 C5F65E8C 0A4E882E ..N..^-év½á^•&.?.t..F=&..Š..¯O.. 000000
 26FC5EC4 287C000A 7E830007 C626F85E C40A4E89 F65E8EFA 5E8CF876 89E7E246 Fãõ.v½.^'.^-.N.6^½&6...-..|(6^•& 000020
 88FA468C F87E89F5 74393080 264F3005 C6269006 EBF87EC4 FB4EFF1F 7C353F80 .?5|..N½6~½Š..&6.O0&.=9t%.-½.F'. 000040
 52505240 08568806 46881 5E8 0247FF26 0C5EC409 75313F80 26065EC4 07FE26DF Õ&±.6^.&.?1u.6^.&.G.Š..F..V.@RPR 000060
 88EC8B55 0136E900 835756EC 88550000 90CBC95F 5E08C483 342104DA 9A0676FF .v..Ö.14.6.^_èù...U.šVW°.Õ6.U.š. 000080
 00CB5DE5 8BC03302 EB0001B8 05744027 9F87F60C 7C00FB83 117D279D 1E3B065E ^.;..')..«.|¯-..'@t.¡..Š.3â.Í]ù. 0000A0
 8B35063B 6C9A5706 561E067E C40A76C5 56571E00 85E90375 C90B0E4E 8BEC8B55 U.š.N..èu.Õç..WVév.6~..V.W.l;.5. 0000C0
 05C08C07 73F90308 8EFFFF05 D88C0773 F1034950 73000A83 C1285778 D20B0E4E N..ØxW+ê.Õ.sPÌ.þs..Ä....Ä.'s..6. 0000E0
 FCA4F3FD C1289140 C603C323 DB1BC62B C703C323 DB1BC72B 48C18841 C08E3575 u5.âA.èH+ú.Ù#ù.ú+6.Ù#ù.6@.+è»µÈ• 000100
 48C188C8 EBC08E35 AB2DC08C D175FFFF 83088E35 8020D88C 0775FFFE 835CE391 .D\.±.u..Ä-.5.Ä...uÌ.â-¨5.âŠâ.èH 000120
 A5F3E9D1 C1289140 C203C323 DB1BC22B D2F7D68B C203C323 DB1BC22B D2F7D78B .•¼Ø+ô.Ù#ù.ô.•¼Ø+ô.Ù#ù.6@.+èÌÕµÈ 000140
 5E8EEBC0 8E35EE05 C08CC775 FF08D88E 35B705D8 8C0775F6 0B18E391 A4F3C913 .èµÈ.D..-u..Ä.ñ5.Ä..uú.6.Ý5.âŠ/^ 000160
 DB1BD12B 0C74DAF7 D78B067E C45738E3 0C4E8BEC 8B55CB5D 08568B06 46881F5F ..F..V.]ùU.Š.N.D8W6-..•¼Õt.+Ì.Û 000180
 8E35F9C3 81C38C10 E3D187AA F3C913AB F3E9D1E0 8A0A468B D12BD187 D103D323 ¥Æ.Ì.Ì+Ì.F..ÄÌÕµ¨.èµ^.ÌD..û.ù'5. 0001A0
 570A7EC5 1E08568B 0646880E 4E8BCB5D 08568806 46885FAA F3C913AB F3E9D1C3 ûÌÕµ¨.èµ^_.F..V.]ù.N..F..V..é-.W 0001C0
 D23392F7 88DAF700 D283D8F7 AA2DB00A 79D2080E 750AF983 1374C00A 93FC071E ..•..ât..¯.u..Øy.¯-¨¼Ù.Ø.¼Õ.¼.3Ø 0001E0
```

```
Dump of file SATURN:[PCCOMMON.DUMP.DLL]SA-PDLED.DLL;1 on 18-APR-1990 10:51:30.28
File ID (436,15,0)   End of file block 133 / Allocated 136

Virtual block number 83 (00000053), 512 (0200) bytes

 86AC4F05 88E275C3 08C288AA 27040276 393C3004 D38792F1 F793F1F7 0274C008 .ât.¼þ.¼þ..Æ.0<9v..'^.ô.ûuã..O¯. 000000
 DC885301 578DE42A 078A00C8 5DE58B5E 5F1F58DA 8CF272C7 3B01448D FF448805 ..D..D.;úr·.ÕX._^.Í]ù...*ô.W.S.È 000020
 29C08F06 768DC08E D88CFC57 56EC8855 C85B0000 32549A53 1650521E 510002B9 ¿..Q.RP.S.T2..[ùU.šVW=.Ä.6.v.¢â) 000040
 322986BF AA91A4F3 9198ACC8 8829C88F 5D05A7E8 5529C08E A536A536 A536A536 6E6E6E6E/â)UÕÏ.]¢â).à¯..µÈ.`¢Ñ)2 000060
 000014C8 00CB5DE5 885E5FC7 88DA8C08 5D8C29C8 0645C704 4D890255 891D89FF ....U..M.úE.à).]..Õ.ú_^.Í]ù.à... 000080
 5689F646 89F25689 F04689C0 28117C16 8B00F0E9 0375117C 3639FF28 F6285657 WV+-+.96|.u.Õþ...|.+â¯Fþ.V·.F-.V 0000A0
 03767FFF FE814619 74C00B0A C4833790 3B309A15 86681EF6 76FFF876 FF0C6AF8 ½j..v½.v-.h...0;.7.6..ât.F.±..v. 0000C0
 5E8BF475 003F8026 F646FFF6 5EC40CEB 47EA7500 3F8026F6 46FFF65E C400BCE9 Õ¥.6^-.F-&.?.uõGŠ.6^-.F-&.?.u¶.^ 0000E0
 D533309A 56EE5689 EC468904 C483379F 3A229A04 6A500145 8D8A7500 3F8026F6 -&.?.u□.E.Pj..":.7.6..F$.VÝV.=3Ì 000100
 A3EE5688 EC468866 74C20BFC 46886074 EE4608EC 4688FE56 89FC4689 02C48337 7.6..F•.V±.F$.FÝtm.F•.ôtf.ᶠ$.VÝÈ 000120
 5EC42C74 C0080AC4 83355D38 309A1586 681EF076 FFF276FF 0C6A29A7 168929A5 È)..Ì)j..v·.vÞ.h...0;]5.6. Ìt,6^ 000140
 46FFFC5E C4078A26 F046FFF0 5EC404EC 46830257 89260789 26FE568B FC4688EC š.F=.V±&..&.W..F$.6^Þ.FÞ&..ь •.F 000160
 5EA77500 3F8026F0 5EC4F475 003F8026 F046FFF0 5EC4E8EB 0E74C00A 078826FC •&...ât.ŠÕá^Þ.FÞ&.?.u¶á^Þ&.?.uÏ^ 000180
 0E74830A 47F626FA 5EC41CEB F62BFC5E 8CFA4689 159A8856 000006C8 90CBC95F _èù.à...V¡...F'.^•+-Š.6^'&-G..t. 0001A0
 C688D876 FA463927 8A168827 88A10CFA 46834601 744004C4 8337500F AE9A5306 ¯S.Û.P7.6.@t.F.F'.À.'...'9F'vÃ.6 0001C0
 3F8329DC 885756EC 8855CB5D E58B01FE 4F800474 DB0B065E 8BEC8B55 90CBC95E ^èù.U.š.^..Ùt..O±..Í]ùU.šVWÈÈ).7 0001E0
```

```
Dump of file SATURN:[PCCOMMON.DUMP.DLL]SA-PDLED.DLL;1 on 18-APR-1990 10:51:30.28
File ID (436,15,0)   End of file block 133 / Allocated 136

Virtual block number 84 (00000054), 512 (0200) bytes

000104C7 9629DEA3 29DCA3FE 244024EB 99C03305 750176E8 0005B807 1E297500 .u)..¡..Òv.u.3à.$$ã$±ÈÈ)ÈÅ).ú... 000000
410000E9 CB5DE58B 5E5F0009 EBC08ED8 8C064E8B 29E23689 FFFEFE44 C704C683 .6.úD±±..6ã).N..Ä.ãÒ.._^.[]ùÒÅ.A 000020
A8ADF003 D0881573 C13B4843 7401A8FE 8BADFC02 778BF273 EEF983FE E180FA74 t*.Ã±.*Ys·.w.•Ù.±´.tCH;ès..Å.ÞÙ´ 000040
0305EB05 8948C12B FE4C89F9 030C74FE 8BE6EBFE 4489F78B 000205C2 03357401 .t5.ô....¾.D±$Ì.±t..*.L±+èH..Š.. 000060
FE300229 EE06C626 C3027F89 29EA1E8C 260574D1 3B3200B9 DA8CC68B FE4CFEF9 *±L±.6.Ö¿.2;Ìt.&..õ)...Ù&ó.Ÿ).=± 000080
0205C203 E27401AB ADF003D0 8B8C73C1 3B48FE8B F27401AB ADF003FE 8B2574FF .tX.±.ÞÙ´.t·.±H;ès¥.Å.ÞÙ´.tã.ò.. 0000A0
3B39098F D88C1274 29EE0EFE 2615EBD8 8E0474C0 08084788 E6EBFE44 89F78800 ..¾.D±$Ì.G..ât..ÄŠ.&±.Ÿ)t..Ä¢.9; 0000C0
005FE898 40400124 0074C63B 0068E8C0 33067788 8BEB3788 29E61E8E 260574C7 ût.&..Ì).7$È.w.3àÒk.;ót.$.ãã.Ò_. 0000E0
4789078B 29EAA326 0474C13B 395DB9D8 8C98EB4E 4E960574 001DEBFE 4DFE0074 t.±M±Ò..t..NN$..Ä¿]9;èt.&Èõ)..._G 000100
F575EAD1 047629EC 163B267F FFBA4141 49C82B03 7401A8FE 458B51C3 99C03302 .3à.ÙQ.E±´.t.+àÌAA¤..&;.š)v.ÌõuŽ 000120
52C359C0 33E575EA D1D2F708 75000CE8 C62BC223 D2F70D72 C2031572 C603C188 .ė.ór..õr.¾0#õ+óÒ..u.¾0ÌõuÌ3âYùR 000140
5A5958FE 55894AD7 2BD68806 7789FFFE FE44C7F2 03F08BFE 8B571874 001DE851 QÒ..t.W.±.Þ.·úD±±..w..ø+■J.U±XYZ 000160
0B02745B 5A1FFFFA 8308C483 38453A7A 9A1F0650 0001B850 52521E02 335053C3 ùSP30.RRP¡..P...±:E8.á..*..Z[t.. 000180
FFFFC2F7 FA5689F8 46893A4F 30969A06 76FF006A 0876FF00 6A560000 0AC8C3D2 ØÙà...Vj..v.j..v...=O:.F½.V*¾ô.. 0001A0
6A561274 D008FE56 89FC4689 02C4833A 6833309A 56F8768B 902FEB99 C0280674 t.+ȧ.$/..v½V.=3h:.á..F•.V±.Åt.Vj 0001C0
065756EC 8B5590CB C95EFE56 8BFC468B 9007EB08 C4833A12 360A9A50 FE76FF00 ..v±P..6.:.á.$...F•.V±^èù.U.šVW. 0001E0

Dump of file SATURN:[PCCOMMON.DUMP.DLL]SA-PDLED.DLL;1 on 18-APR-1990 10:51:30.28
File ID (436,15,0)   End of file block 133 / Allocated 136

Virtual block number 85 (00000055), 512 (0200) bytes

11744815 843688 4C E8277200 57E80775 48064688 08568811 84BF3875 000A7E83 .~..u8¢...V..F.Hu.ÒW.r'ŠL.6..Ht. 000000
FFB80675 D20B0473 1584FE81 04C68334 735E003E E8560E46 89024488 0074F73B ;¾t..D..F.VÒ>.^s4.ó..±..ß..Øu.j. 000020
84368902 5C891489 E675C085 F9580000 FFFF9A50 C0335016 52C48850 21EB99FF ..$ÌP.áR.P3âP.....[*.âul...\..6. 000040
F9F27515 84FE8104 C6830C74 024C39F7 8B0E4E8B CB5DE58B 5E5F07C0 33D38B15 ..Æ3á._^.Ì]ù.N..¾9L.t..ó..±..u·* 000060
75C08500 00FFFF9A 51531373 117E1E39 0675F73B C18ED38B 26721C03 DA882CE8 Š,.Ö..r&.Æ.è;¾u.9.-.s.SQ......âu 000080
067EC4D9 8827E30E 4E881E56 57EC8855 00C3D18B 04879211 7E168904 75F73B0E 8;¾u...-.....ÌÙ.U.šWV..N.D'.\á~. 0000A0
49490474 0477FF45 3A26C933 FF448AA6 F30A76C5 FE8BCB03 09F7AEF2 C033F78B .¾3á·Ù¾).ù.±év.µÌ.D.3è&:E.w.t.ÌÌ 0000C0
2BEBD3EA D3FFFFB9 0C5E8808 56880646 88EC8855 00CB5DE5 885F5E1F C18BD1F7 ¾Ì.é.^_.Ì]ù.U.š.F..V..^.¿..ÆõÆŠ+ 0000E0
2A8506C6 0028E801 2A8506C6 0E5688D8 335756EC 88550008 CA5DE588 D31B0A46 F..Æ.ÌÌò..U.šVW3U.V.6..*.Ò(.ó..* 000100
5E5F0006 E80E5E8B D2335756 EC8855C8 50E58B5E 5F008940 C9800573 0A763800 .;v.s..èã.._^.Ì]ùU.šVW30.^.Ò.._^ 000120
8EA4F32A 028F0676 C527E8F6 33408106 7664F983 0A4E88C0 8ED88CFC CB5DE588 .Ì]ù•.Ä.ã.N¯..*dv.Ýã3-Š'év.¢.*µÈ. 000140
F08F0A76 0306762B 5D021FE8 5529F88F 064E010C 46880676 892A028E 0A4E88D8 Ä.N./.*.v..F..N.¢½)UÒ..]+v..v.¢Þ 000160
75C43A80 80250947 8A2E0964 8A5653C3 DA8CC788 065D8904 45890275 89008929 )...u..E..]..ú.ÖùSV.d...G.%..:óu 000180
AD92AD95 AD56C35B 5EF3E107 3B2E048B 02EB8302 EE830005 890AC383 0AC68316 ..ó..û.¿...Ÿ..Š....;.Ãµ^[ùVÙ.Ù.Ù 0001A0
03FE2DD8 D1F50001 3D0001E3 D1F4E2DF D1DDD1DA D1DBD1E8 D10005B9 FF33AD93 .Ù3.¿..ÌÒÌÙÌÖÌÌÌÒã¶ÌÐÌÅ=..¾ÌÙ-±. 0001C0
CCCCCCCC CCCD0000 FFFFFFFF FFFFFC66 C3084489 065C8904 5489026C 893C895E ^.<.l..T..\..D.ûf•........ëäääää 0001E0

Dump of file SATURN:[PCCOMMON.DUMP.DLL]SA-PDLED.DLL;1 on 18-APR-1990 10:51:30.28
File ID (436,15,0)   End of file block 133 / Allocated 136

Virtual block number 86 (00000056), 512 (0200) bytes

572A668F FCC08ED8 8C06C307 5B40D08B C0333001 44C60104 C62A728E FFFDCCCC ãã».ƒr*6..6D.03ã.Àã[.û..Ã.â•¢f*W 000000
33FF7BE8 5320B302 79C90B06 747FF0C1 F720837F 07648006 4C885EA5 F30004B9 ¿..µÈ^.L..d..* ¾èÞ.t..èY.*-SÒ(.3 000020
800713C8 03E4F64D 8091E2F7 4D108AC8 8B3FFE05 ADF88A8B 7480A8AC 2A60BEFF .ƒm*^.tÈ.¾Ù.±7.àœ.M¾ã. M-ö.à.■ 000040
725FFF13 E83C708B 0555E82A 668EDFF7 5713430F 8112F4E9 81FA13C8 03E7F69A .-ö.à.*.õ¶..õC.W¾Ó/f*ÒU.Ep<ò.. r 000060
D1EBD10C E3C033F7 88D9F791 AD93AD92 AD95AD97 AD575F03 DEE83C7A 8B574709 .GWÈz<ÒB. WÙ.Ù.Ù.Ù.Ù.¾).¾3ãD.ÌŠÌ 000080
5351C032 0010B92A 73BFD913 D113E913 039AD681 56C480F4 E2DCD00E D1DDD1DA ÒÌÌÌBÄÈã¶.ëV.ø...õ.1.les*¿..2èQS 0000A0
59E50259 D0D0D3D1 D2D1D5D1 D6D1E4D0 D0D0D3D1 D2D1D5D1 D6D1E4D0 50565552 RUVPÀÕÌ•ÌÌÌÌ•ÌÈÀÃÕÌ•ÌÌÌ•ÌÈÀÀY.ÌY 0000C0
4FBDE259 AA3004D0 D0D3D1D2 D1D5D1D6 D1E4D000 14D91359 D11359E9 1359F113 .þY.ÕY.ÌY.Ì..ÀÕÌ•ÌÌÌ•ÌÈÀÃ.O´YâšO 0000E0
0B0C5E8B 08468BEC 8855C307 5B5A0001 B80C882A 728E12C1 83FCAEF3 FD30B049 Ì´O»µÜ•.è.ƒr*..Ì..Z[.ÙU.š.F..^.. 000100
064688C8 030C66F7 064688C8 8BE3F700 08CA5DE5 8BE3F706 46880875 0A5E8BD8 Ã.^.u..F.¾D.Ì]ò..¾D.à.F.¾f..à.F. 000120
8900ACE9 DB330185 E8EF88FF 33D78840 C98030C9 80580008 CA5DE588 D103E3F7 ¾D.Ì.Ì]ò..X.èD.ã3.ÿÒ..3UÒ¯.. 000140
2EF7C38B EA8BF888 2A9226F7 C78B50E0 720205E8 F888E172 020CE8D8 332A921E ..*3ÙÒ..rÃ.¾Ò..rÀP.ù¾&.*.¾.õ.ù¾. 000160
8A0E89CE 032A883E 89FCB5EB D8730003 83F8035B BE72D88B C503C475 D20B2A92 .*.Øuá.é.Ãr/X.¾.Æ.sÃŠç•.>.*.ö... 000180
9F750B0B 80CD8003 7501ADE8 912A90A3 2A8CA32A 8EA3C033 2A961689 2A94A32A *È.*...*3ãÈ.*È.*È.*.ÒU.u..ë..Ùu. 0001A0
2D3C0674 2B3C3174 002A853E 80127445 3C1C7444 3C4E4174 01FDE8D8 3300E7E8 ÒÒ.3ÙÒ».tAN<Dt.<Et..>.*.t1<+t.<- 0001C0
02C5F600 8BE8509F 016CE846 00002A94 06C70EC9 8003E804 02C9814E 27750274 t.u'N.è..Š..è.ú..*..FÒl..PÒ..-é. 0001E0
```

Dump of file SATURN:[PCCOMMON.DUMP.DLL]SA-PDLED.DLL;1 on 18-APR-1990 10:51:30.28
File ID (436,15,0)   End of file block 133 / Allocated 136

Virtual block number 87 (00000057), 512 (0200) bytes

```
3E03FB03 30C98003 741872C1 F70675FF 0B2A943E 8BDBF702 759E5840 C9800375 u..è@X.u.%Ù.>.*..u.%êr.t..è0.«.> 000000
A606C62A 883E8B03 94E82A9C BE515650 7F0190FF 812A963E 2B047510 C5F62A90 .*-é.u.+>.*.....PVQf.*Ò...>.*6.Ì 000020
0645F700 D383F5D8 F7D3F713 7480C5F6 2A9A1E8B 2A98A138 755E5901 ACE8002A *.Ò¯.Y^uBÀ.*...*-é.t.%Æ%Å%.Æ.%E. 000040
02CD8003 75002A8E 3E832AA6 2E8A08C9 80037607 2A8E3E83 80074D80 04747FF0 Þ.t..M...>.*.v..è...Ì*.>.*.u..ë. 000060
D1C303E3 D102CD80 ED770CCC F8811772 00E4E80A 2A9206C6 3FFFB8C3 01C980C3 ú.è.ùE.?ó..*.Ðð.r..«ä.wÚ.ë.ÌD.ûÌ 000080
D383D003 58008AE8 50287200 D6E8D788 DF88EF88 FF33C3DF EBDE78D8 03E3D1E3 DÌD.ÀxßŠÖû3..ÿ.Ö.■Ò■.r(PÒ..X.À.Æ 0000A0
88EEEB2A 9006FF01 CA800374 C00A0D72 00BBE8E5 721999FF 81000783 00058300 ..f..■.....rÌÖE.r..ât..ò....*SŸ. 0000C0
8006EB05 75D20B09 758000FB 810F7480 C5F61774 80C7F616 752A9006 0BC50BC7 ú.é...*u.-ú.t.-é.t..«..u..®u.Š.. 0000E0
0025E809 731999FF 811C74C2 0BC30BC5 0BC78B2A 9A1E892A 98168920 C98010C9 è..è ...*...*.ú.é.û.ôt.....s.Ò%. 000100
96A895AB 93A8922A 9CBFF78B 56F6EB00 2AE84806 78FF0B00 40B8F1EB 2A900EFF ...*Šþ¦ə...x.HÒ*.Š-V.%¢.*.¨.¨.¨. 000120
D1D3D1E2 D1F81358 E81358D8 13580003 000BE800 0EE8C28B 535557C3 5EA892AB ¨.¨^ÜWUS.óÒ..Ò...ÀX.ÀX.ÒX.%iäiÆi 000140
7E093C45 72302C4A 74004EE8 C34E4601 752B3C06 742D3C08 74005EE8 C307D1D5 fi■ÜÒ^.t.<-t.<+u.FNÜÒN.tJ,0rE<.- 000160
7410C5F6 2677093C 2A72302C 20742E3C 33740037 E81DEB39 7D2A9206 3A072C02 .,.:..*)9$.Ò7.t3<.t ,0r*<.ı%-é.t 000180
10CD802A 8C06FF09 7510C5F6 F4EB20CD 80C3E432 2ABE06FF 08CD802A 900EFF0E ....*.ë....*2ôù.ë Š¶-é.u....*.ë. 0001A0
3CE6740A 3CEA7409 3CEE7420 3C107400 2A843E80 AC23732A 8A363BC3 F94EC9EB ŠèN*ù;6.*s#¯.>.*.t.< tŸ<.tõ<.t|< 0001C0
0BC10BC5 0BF88BAD 95AD91AD 92AD57C3 C032C35F 2402777A 3C067261 3CE2740D .tā<ar.<zw.$_Û2âÛWÛ.Û.Û.Û.%.é.ê. 0001E0
```

Dump of file SATURN:[PCCOMMON.DUMP.DLL]SA-PDLED.DLL;1 on 18-APR-1990 10:51:30.28
File ID (436,15,0)   End of file block 133 / Allocated 136

Virtual block number 88 (00000058), 512 (0200) bytes

```
CBFED7D0 D001D7D1 D501D1D1 E2D10005 8BDFD1E8 D1E7D13E 7803FE05 AD4974C2 ôtlÙ.±.x>ÌÒÌÒÌÒE..Ìãlllflì■ÀÀ■±ù 000000
F030DE74 FFF0A900 D780C613 FE13EE13 CE13F580 01FA81F6 33D30AD9 2243F075 ubC").Æ3-.*..¥.ö.Ÿ.±.ó.■.`Þ.t.=Þ 000020
7589026D 8900895F F788F888 E888C88B D888C033 012AA60E 800FEB00 D780F57F .¥.■.Š...Ì*.3â.Ä.à.Ò.½.¼_...m..u 000040
0004B800 07BF0844 0108478B 2EABF3C0 33FD8800 08B92AA8 BDC3FF0A 06458904 ..E...ù§`*¿...»3âµ¨..G..Õ.¢..|.. 000060
8806C683 F72BF103 08C3830F 2BD92B56 53C88B98 0404D8F6 C42AC42A E022C72B +ú"Â*á*á-Ä....àSV+)+Ö.û..þ+¼.ó.. 000080
754F02C5 835B5EE6 E202C383 02EE8300 0456833E 0256113E 0046013E 27F72E04 ..¼'>.F.>.V.>.V...Ÿ..û.ã]^[.é.Ou 0000A0
78C00BF5 8BAD93AD 91AD97AD D10A92AD CD0AC80B ADC80BAD 91ADF587 0EED83BC ¥.Ù..¥Ù.Ù.àÙ.à.ëÙ..ÌÙ.Ù.Ù.Ù.¥.âx 0000C0
CD13FD13 F58001FA 81ED33D5 0BEF2300 01B0D0D1 D3D1D1D1 D7D1E2D1 084CFF00 ..L.ìãì■lliÆiÀ§..#ÿ.(3Ù.*..¥.».ë 0000E0
00000000 000000C3 06448904 5C89024C 893C89C5 0BCD0108 6C01D5D1 C513DD13 .Ì.éÌf.l.l.lë.é.<.L..\..D.û....... 000100
1BBEBC20 00000000 00000E9C 40000000 00000000 07C80000 00000000 000004A0 ..........à........ə........ ¥f. 000120
E0000DC2 781F49FF CFA6D500 689DC5AD A82870B5 9E00368E 18C9BF04 00000000 .....¢è..6..çp+`Ùé.k.flü.l.xöl.À 000140
A3D70AFF FDCCCCCC CCCCCCCC CD0353AA 7EEBFB9D F9DE8E01 AA938A47 C980E98C .Õ.èGɑ.`..ß*.«Š~`S.ëääääääà»..■Ê 000160
8EC44DE1 58FFE6AB CC771184 61CEFDFF F3D1B717 58E21965 2CFFFAA3 D70A3D70 p=.■E*.,e.āX.ñiµ.»öa..wä¨|.[ÀMé/ 000180
D0467C64 BCE4A1FF 2CA87FEA 27A539E9 A5FF96CF B11EAD45 3994BAFF CBE69594 ..lù.¤.9EÙ.Ÿü..EÒ9E'ö.¨,.ÀÒ¥d|FÀ 0001A0
0B0AC383 0AEB830F F741F3BB 0579FF0B 4199BBFC AEC03143 25637A19 3AFE57DD ÌW±:.zc%C1âÛ■£.A..y.£µÀ¼Ò.Š..û.. 0001C0
07027302 03004400 08029601 030013C3 ECEB5B5F FE7BE857 53F573EF D10D74FF .t.lÿs%SWÒ(±_{Ššü........D...s.. 0001E0
```

Dump of file SATURN:[PCCOMMON.DUMP.DLL]SA-PDLED.DLL;1 on 18-APR-1990 10:51:30.28
File ID (436,15,0)   End of file block 133 / Allocated 136

Virtual block number 89 (00000059), 512 (0200) bytes

```
0830F401 03004B00 0802CA01 03008800 08363001 05008700 083B7901 0506CE00 .ö...y;......=6......ð...K...¶0. 000000
09399200 02005C00 08303301 03000000 073A3400 02005B00 08304601 03004D00 .M...F0..[...4:......30..\....9. 000020
083B1901 03002200 083ACE01 03000700 08317201 03000500 0831AA01 03000000 .....`1......r1......ö:.."....;. 000040
081B3801 03003A00 08331301 0306BC00 0701DA02 03068400 0701B102 03002600 .&...Ÿ...Ç...Ö...¥....3..:...8.. 000060
542D6E75 5220534D 00000000 00000000 00000000 0006C500 0736CA02 03003C00 .<...ð6..é..............MS Run-T 000080
38383931 20296328 20746867 69727970 6F43202D 20797261 7262694C 20656D69 ime Library - Copyright (c) 1988 0000A0
35252064 33252064 33252064 35250011 70726F43 2074666F 736F7263 694D202C , Microsoft Corp..%5d %3d %3d %5 0000C0
2528204C 44500072 6F746964 45204C44 5000474F 4C2E5945 4B000A64 35252064 d %5d..KEY.LOG.PDL Editor.PDL (% 0000E0
69726564 20657475 62697274 7461206E 6120676E 69746165 72430073 25202973 s) %s.Creating an attribute deri 000100
6E696072 65746564 206F7420 656C6261 6E55203A 64656C64 50006E6F 69746176 vation.Pdled: Unable to determin 000120
726F7065 52204D41 4C206E69 20726F72 72450000 00657079 7420746F 6C732065 e slot type...Error in LAM Repor 000140
69206465 7473696C 20657261 20736575 6C617620 656C6269 73736F50 00770074 t.w.Possible values are listed i 000160
73692067 6E696874 6F4E002E 776F646E 69772073 6E6F6974 704F2065 6874206E n the Options window..Nothing is 000180
6964206F 74206465 64646120 746E6560 65746174 53002E64 65746365 6C657320  selected..Statement added to di 0001A0
0000002E 656C6261 6C696176 6120746F 6E207369 20706C65 48002E6D 61726761 agram..Help is not available.... 0001C0
00170014 FFFF0013 00BC00B3 00B20081 00B000B9 00B50084 00AF0086 00B7FFFF ..ñ.Ñ.€.Ç.ç.¿.¯.Ÿ.ý.*.¥......... 0001E0
```

```
Dump of file SATURN:[PCCOMMON.DUMP.DLL]SA-PDLED.DLL;1 on 18-APR-1990 10:51:30.28
File ID (436,15,0)   End of file block 133 / Allocated 136

Virtual block number 90 (0000005A), 512 (0200) bytes

00220023 00260028 00240029 FFFF001D FFFE001B 001A0042 00180019 00160015 ........B.....±.....).$.(.&.#.". 000000
0030003C 0040FFFF 002EFFFE 0021002C 0020002A 00270025 001F0020 001E0028 +... ...X.'.*.-.,.!.±.....a.<.=. 000020
008A0032 00440036 00390038 0033003A 0041003F 00BB003E 00300038 00370043 C.7.;.0.>.£.7.A.:.3.8.9.6.D.2.¤. 000040
FFFE004C 004D004B 004A0049 0048FFFF 00470046 FFFE0035 00310034 002F0045 E./.4.1.5.±.F.G...H.I.J.K.M.L.±. 000060
005D0059 006D006A 0067FFFF 00550054 FFFE0053 00520051 0050004F FFFF004E N...O.P.Q.R.S.±.T.U...g.j.m.Y.]. 000080
005E005A 00690065 005C005B 0057006C 00630056 00660068 00580068 00610060 '.e.h.X.k.f.V.c.l.W.[.\.e.i.Z.^. 0000A0
00750074 0073FFFF 0072FFFE 00710070 FFFF006F FFFF006E FFFE0064 005F0062 b._.d.±.n...o...p.q.±.r...s.t.u. 0000C0
0080007F 007E0086 00820081 007D0083 0087007C 007B007A 00790078 00770076 v.w.x.y.z.{.|.....}.......~..... 0000E0
0090FFFE 008F008E 008DFFFF 008CFFFE 0088008A 0089FFFF 0088FFFE 00850084 ....±...........±...........±... 000100
009EFFFE 009C0098 0097009A 0098009 00920090 00910094 00950096 0093FFFF ........................±... 000120
00AE00AD 00A400AC 00AB00AA 00A900A8 00A5FFFF 00A2FFFE 009F00A0 00A1FFFF ..À.....±.Ä...É.'.'.".".É.Ü.Ö. 000140
00002000 20002700 2700202E 20270027 FF9DFFFE 001CFFFE FFFE00A3 00A700A6 Ì.Î.É.±.±...±...'.' . .'.'. . .. 000160
00930053 00240059 003C008A 00880060 006A0040 00830086 0067008D 00870029 ).....g.Ñ...à.j.m.....<.Y.$.S... 000180
0043007C 001B003D 001700A8 00A900AA 00A50060 005D0096 001A00A1 00280050 P.(.À.....].'.É.'.'.'...=...|.C. 0001A0
004F0022 00230061 00000000 00000000 00000000 00000000 00000000 00520026 &.R.....................a.#.".O. 0001C0
000000B8 00770037 001E00B4 00680094 0095002B 004A0000 007300B7 00580068 h.X.ñ.s...J.+.....k.Ç...7.w.¡... 0001E0

Dump of file SATURN:[PCCOMMON.DUMP.DLL]SA-PDLED.DLL;1 on 18-APR-1990 10:51:30.28
File ID (436,15,0)   End of file block 133 / Allocated 136

Virtual block number 91 (0000005B), 512 (0200) bytes

006300B0 00560049 001400B1 004B00B5 003E0066 0020007D 00A80030 00750038 ;.u.O.".). .f.>.ç.K.Ý...I.V.¯.c. 000000
006500A4 0083004D 005C00AC 007A005B 005700A0 0074001F 00910076 0070006C l.p.v.....t...W.[.z.¯.\.M.°.É.e. 000020
005A0025 0082004C 003A008E 00690041 003F0000 0000001C 008F0078 0086007B {...x.........?.A.i...:.L.ý.X.Z. 000040
00AD0080 00710027 0015002A 0092007F 001900AF 00480062 007E0079 005E009D ..^.y.~.b.H.É........*...'.q...Ù. 000060
00210098 009A009F 00970000 009B0084 00850099 002C0020 00420051 001800AE Û...Q.B.-.,.................!. 000080
00340054 00A600A7 0045009C 00640089 00160032 005F0044 00360039 00330038 8.3.9.6.D._.2.......d...E.Ì.Î.T.4. 0000A0
00000000 00000000 00000000 00000000 00000000 000000B9 00A30035 0031002F /.1.5.£.¿......................... 0000C0
65440065 7474656C 6150206C 64500000 000000BC 000000BB 00BA0000 00000000 ......¤.È...¥.....Pdl Palette.De 0000E0
4F207473 65540067 616C4620 67756265 4420656C 67676F54 00676E69 67677562 bugging.Toggle Debug Flag.Test O 000100
74756269 72747441 20646576 69726544 00786174 6E795320 74736554 006E6570 pen.Test Syntax.Derived Attribut 000120
52204C44 50007374 726F7065 52007364 6E616D6D 6F432072 6F746964 45007365 es.Editor Commands.Reports.PDL R 000140
50006469 7247006F 4700746E 69725000 74726F70 6552204D 414C0074 726F7065 eport.LAM Report.Print.Go.Grid.P 000160
002E2E2E 7265746E 69725020 65676E61 6843002E 2E2E7475 6F79614C 20656761 age Layout....Change Printer.... 000180
646F4E20 4C4D4900 7372656C 646E6148 20726F72 72450065 6469482F 776F6853 Show/Hide.Error Handlers.IML Nod 0001A0
55004556 45495254 45520045 54414552 43007362 72655600 7365746F 4E007365 es.Notes.Verbs.CREATE.RETRIEVE.U 0001C0
43454E4E 4F430045 56494543 45520044 4E455300 4554454C 45440045 54414450 PDATE.DELETE.SEND.RECEIVE.CONNEC 0001E0

Dump of file SATURN:[PCCOMMON.DUMP.DLL]SA-PDLED.DLL;1 on 18-APR-1990 10:51:30.28
File ID (436,15,0)   End of file block 133 / Allocated 136

Virtual block number 92 (0000005C), 512 (0200) bytes

4600776F 6C46206C 6F72746E 6F430045 544F4E00 5443454E 4E4F4353 49440054 T.DISCONNECT.NOTE.Control Flow.F 000000
0045534C 45004649 45534C45 004E4548 54004649 00504F4F 4C004843 4145524F OREACH.LOOP.IF.THEN.ELSEIF.ELSE. 000020
0054494D 404F4300 4E525554 4552004F 44004553 49575245 48544F00 45534143 CASE.OTHERWISE.DO.RETURN.COMMIT. 000040
7551004C 414E4749 53005049 4B530054 49584500 454D5553 45520054 524F4241 ABORT.RESUME.EXIT.SKIP.SIGNAL.Qu 000060
49544E55 00454C49 48570047 4E495641 48004552 45485700 73726569 66696C61 alifiers.WHERE.HAVING.WHILE.UNTI 000080
44455245 47474952 54004854 49570045 5059545F 4E454857 0053454D 4954004C L.TIMES.WHEN_TYPE.WITH.TRIGGERED 0000A0
00594200 50554F52 47005245 44524F00 4F540048 47554F52 4854004D 4F524600 .FROM.THROUGH.TO.ORDER.GROUP.BY. 0000C0
00544553 004E4F00 44455341 4200464F 0045524F 54535F4F 464E4900 43534544 DESC.INFO_STORE.OF.BASED.ON.SET. 0000E0
6544004E 47495353 4100454D 554C4F56 00535345 4C4E5500 54434E49 54534944 DISTINCT.UNLESS.VOLUME.ASSIGN.De 000100
434F5250 5F4C414E 5245544E 49005353 45434F52 5000736E 6F697461 72616C63 clarations.PROCESS.INTERNAL_PROC 000120
4F005455 504E4900 45525544 45434F52 505F4C41 4E524554 58450045 52554445 EDURE.EXTERNAL_PROCEDURE.INPUT.O 000140
2C00444E 45006E6F 69746175 74636E75 50005345 49464944 4F4D0054 55505455 UTPUT.MODIFIES.Punctuation.END., 000160
4F495245 503C202E 003E4E4F 4C4F432D 49404553 3C203B00 3E414D4D 4F433C20 <COMMA>.; <SEMI-COLON>.. <PERIO 000180
564E4900 736E6F69 7469646E 6F43004E 45485700 3E4E4F4C 4F433C20 3A003E44 D>.: <COLON>.WHEN.Conditions.INV 0001A0
00595449 4C414E49 44524143 00595449 544E4500 4D554049 58414D00 44494C41 ALID.MAXIMUM.ENTITY.CARDINALITY. 0001C0
41500054 4E455252 55430047 4E495353 494D004D 554D494E 494D0054 45535F50 P_SET.MINIMUM.MISSING.CURRENT.PA 0001E0
```

```
Dump of file SATURN:[PCCOMMON.DUMP.DLL]SA-PDLED.DLL;1 on 18-APR-1990 10:51:30.28
File ID (436,15,0)   End of file block 133 / Allocated 136

Virtual block number 93 (0000005D), 512 (0200) bytes

49525000 45544143 494C5055 4400454C 43594300 45555149 4E550052 454E5452 RTNER.UNIQUE.CYCLE.DUPLICATE.PRI 000000
464E4900 454E4F5F 4E414854 5F45524F 4D004555 4C415600 59454B00 5952414D MARY.KEY.VALUE.MORE_THAN_ONE.INF 000020
4E494745 4200454E 4F005954 504D4500 45545542 49525454 4100574F 4C465F4F O_FLOW.ATTRIBUTE.EMPTY.ONL.BEGIN 000040
50006E6F 69737365 72707845 004E4545 57544542 00545341 4C005453 52494600 .FIRST.LAST.BETWEEN.Expression.P 000060
303E003D 3C003E00 3C003D00 63697465 6D687469 72410029 00280073 6E657261 arens.(.).Arithmetic.=.<.>.<=.>= 000080
5245444E 49414D45 52005245 574F5000 56494449 002F002A 002D002B 003E3C00 .<>.+.-.*./.IDIV.POWER.REMAINDER 0000A0
00525153 00545251 53004547 41524556 41004E49 4D005841 4D00444E 554F5200 .ROUND.MAX.MIN.AVERAGE.SQRT.SQR. 0000C0
53455551 45525F52 45535500 73746E61 74736E6F 43005342 41004554 4147454E NEGATE.ABS.Constants.USER_REQUES 0000E0
6E450054 4F4E0052 4F00444E 41006369 676F4C00 45534C41 46004555 52540054 T.TRUE.FALSE.Logic.AND.OR.NOT.En 000100
45544143 494C5055 445F4556 4F4D4552 00485447 4E454C00 74655320 79746974 tity Set.LENGTH.REMOVE_DUPLICATE 000120
435F444E 49460045 434E4552 45464649 445F444E 49460045 4E49424D 4F430053 S.COMBINE.FIND_DIFFERENCE.FIND_C 000140
45535245 50555300 464F5F54 45534255 5300534E 4941544E 4F43004E 4F4D4D4F OMMON.CONTAINS.SUBSET_OF.SUPERSE 000160
5F500045 434E4149 52415600 56454444 5453004D 55530054 524F5300 464F5F54 T_OF.SORT.SUM.STDDEV.VARIANCE.P_ 000180
4F430053 45484354 414D0047 4E495254 53425553 00676E69 72745300 50494853 SHIP.String.SUBSTRING.MATCHES.CO 0001A0
45570059 41440048 544E4F4D 00524145 59006560 69542F65 74614400 5441434E NCAT.Date/Time.YEAR.MONTH.DAY.WE 0001C0
48544E4F 4D5F4548 545F464F 5F4B4545 57005241 45595F45 48545F46 4F5F4B45 EK_OF_THE_YEAR.WEEK_OF_THE_MONTH 0001E0

Dump of file SATURN:[PCCOMMON.DUMP.DLL]SA-PDLED.DLL;1 on 18-APR-1990 10:51:30.28
File ID (436,15,0)   End of file block 133 / Allocated 136

Virtual block number 94 (0000005E), 512 (0200) bytes

544E4F4D 5F454854 5F464F5F 59414400 52414559 5F454854 5F464F5F 59414400 .DAY_OF_THE_YEAR.DAY_OF_THE_MONT 000000
53005345 54554E49 4D005255 4F48004B 4545575F 4548545F 464F5F59 41440048 H.DAY_OF_THE_WEEK.HOUR.MINUTES.S 000020
45434F52 50005448 47494E44 494D5F45 434E4953 5F534345 53005344 4E4F4345 ECONDS.SECS_SINCE_MIDNIGHT.PROCE 000040
495F5455 5054554F 0044495F 5455504E 49004449 5F434F52 50490044 495F5353 SS_ID.IPROC_ID.INPUT_ID.OUTPUT_I 000060
45524F54 535F4F46 4E490044 495F574F 4C460044 495F5345 49464944 4F4D0044 D.MODIFIES_ID.FLOW_ID.INFO_STORE 000080
52454E45 47004449 5F595449 544E4500 44495F45 54554249 52545441 0044495F _ID.ATTRIBUTE_ID.ENTITY_ID.GENER 0000A0
4920444F 4854454D 004F544E 49005345 554C4156 0044495F 44530044 495F4349 IC_ID.SD_ID.VALUES.INTO.METHOD I 0000C0
0A720478 0A6E046E 0A6A0462 00534E4F 4954504F 5F464F5F 5245424D 554E0044 D.NUMBER_OF_OPTIONS.b.j.n.n.x.r. 0000E0
0A9204E1 0A8E04D6 0A8A04C8 0A8604C3 0A8204B3 0A7E04A0 0A7A0494 0A76048A ..v...z...~.*...ü...ü...#...Ä... 000100
0AB20533 0AAE0529 0AAA051A 0AA60510 0AA204FE 0A9E04EF 0A9A04EA 0A9604E7 ó...õ...ÿ...±.Å...Î...^.).Û.3.ý. 000120
0AD2056A 0ACE0562 0ACA055D 0AC60556 0AC2054F 0ABE0546 0ABA053F 0AB60539 9.Ñ.?.¤.F.ƒ.O.ô.V.ó.].ò.b.ö.j.Ø. 000140
0AF205A4 0AEE059F 0AEA059C 0AE60597 0AE2058F 0ADE0582 0ADA057D 0AD60572 r.#.}.Ö...B...ã...Î...õ...Ý.Ê.·. 000160
0B120506 0B0E05D0 0B0A05C9 0B0605C2 0B02058F 0AFE0585 0AFA05B0 0AF605AB ¨.~.¨.ª.ç.±.¢...ô...è...Å...#... 000180
0B32060C 0B2E0606 0B2A05FF 0B2605F9 0B2205EE 0B1E05E7 0B1A05E2 0B16050D Ý...ã...Õ...Ý.".ª.&...*.......2. 0001A0
0B520641 0B4E063E 0B4A0636 0B460631 0B420627 0B3E0622 0B3A0618 0B360612 ..6...:.".>.'.B.1.F.6.J.>.N.A.R. 0001C0
0B72066C 0B6E0669 0B6A0663 0B660660 0B620655 0B5E0650 0B5A064D 0B560647 G.V.M.Z.P.^.U.b.'.f.c.j.i.n.l.r. 0001E0

Dump of file SATURN:[PCCOMMON.DUMP.DLL]SA-PDLED.DLL;1 on 18-APR-1990 10:51:30.28
File ID (436,15,0)   End of file block 133 / Allocated 136

Virtual block number 95 (0000005F), 512 (0200) bytes

0B9206B6 0B8E06A3 0B8A069B 0B86068E 0B820687 0B7E0680 0B7A0679 0B760670 p.v.y.z...~.............È...Ñ... 000000
0BB20708 0BAE06F9 0BAA06EF 0BA606EB 0BA206DF 0B9E06D6 0B9A06CF 0B9606C9 è...ü...#...Ö.Å.Š.Î.ÿ.`.*.Û...ý. 000020
0BD20750 0BCE0744 0BCA073D 2AE20735 0BC2072D 0BBE0722 0BBA071D 0BB60713 ..Ñ...¤.".ƒ.·.ö.5.ã*=.ò.D.ö.P.Ø. 000040
0BF2078D 0BEE0783 0BEA077D 0BE60776 0BE2076E 0BDE0766 0BDA075E 0BD60756 V.#.^.ö.f.B.n.ã.v.Ì.}.õ...Ý...·. 000060
0C1207CB 0C0E07C7 0C0A07C1 0C0607B7 0C0207AD 0BFE079F 0BFA0799 0BF60795 ..~...ª...±.Ù...ñ...è...ú...ù... 000080
0C3207FA 0C2E07F8 0C2A07F6 0C2607EF 0C2207E4 0C1E07DC 0C1A07D7 0C1607D1 Ì...#...É...õ.".ý.&.~.*.%...ª.2. 0000A0
0C520816 0C4E0814 0C4A0811 0C46080E 0C420808 0C3E0809 0C3A0807 0C360805 ..6...:...>...B...F...J...N...R. 0000C0
0C72083B 0C6E0837 0C6A0831 0C660827 0C620821 0C5E081C 0C5A081A 0C560818 ..V...Z...^.l.b.'.f.1.j.7.n.;.r. 0000E0
0C920872 0C8E0865 0C8A085B 0C860857 0C820850 0C7E084C 0C7A0847 0C76083F ?.v.G.z.L.~.P...W...[...e...r... 000100
0CB208A0 0CAE0899 0CAA088E 0CA6088A 0CA20887 0C9E0883 0C9A087D 0C960877 w...}.........Å...Ì...`...Ö...ý. 000120
0CD208FA 0CCE08F5 0CCA08E9 0CC608DF 0CC20806 0CBE08CA 0CBA088A 0CB60882 ý.Ñ.¤.¤.ö.ƒ.#.ô.ô.ó.ô.ò.%.ö.ª.Ø. 000140
0CF20935 0CEE092E 0CEA0926 0CE6091C 0CE20915 0CDE090E 0CDA0905 0CD608FE ±.#...Ö...B...ã...Ì.&.õ...Ý.5.·. 000160
0D120992 0D0E0981 0D0A0971 0D06095F 0D02094E 0CFE094A 0CFA0944 0CF6093F ?.~.D.ª.J.±.N.......q........... 000180
0D3209E8 0D2E09DF 0D2A09D6 0D2609CB 0D2209B7 0D1E09AF 0D1A09A7 0D1609A2 Å...Ì...É...ñ.".Ù.&.#.*.Ö...ô.2. 0001A0
0A660A3C 0D4E0A36 0D4A0A2B 0D460A21 0D420A14 0D3E0A06 0D3A09FE 0D3609F2 ·.6.±.:...>...B.Ì.F.+.J.6.N.<.f. 0001C0
255B002E 2E002E00 2E2E002A 2E2A005C 00000000 0BC60A52 0D5A0A48 0D560A43 C.V.H.Z.R.6.....\.*.*.........[% 0001E0
```

```
Dump of file SATURN:[PCCOMMON.DUMP.DLL]SA-PDLED.DLL;1 on 18-APR-1990 10:51:30.28
File ID (436,15,0)    End of file block 133 / Allocated 136

Virtual block number 96 (00000060), 512 (0200) bytes

656C6966 202D2000 2E687461 70206469 6C617620 6120746F 6E202D20 005D3A63 c:]. - not a valid path.. - file 000000
4C445000 74726F70 6552204C 4450002E 676E6F6C 206F6F74 20736920 656D616E name is too long..PDL Report.PDL 000020
6E6F4320 2D207374 73697865 20007472 6F706552 204C4450 0074726F 70655220  Report.PDL Report. exists - Con 000040
6F706552 204C4450 00216465 63616C70 65722065 62206C6C 69772073 746E6574 tents will be replaced!.PDL Repo 000060
20002973 65737365 636F7250 28200000 5450522E 2A00534E 47495345 44007472 rt.DESIGNS.*.RPT.. (Processes).  000080
6F532820 00297365 726F7453 206F666E 49282000 2973776F 6C46206F 666E4928 (Info Flows). (Info Stores). (So 0000A0
20202020 20202000 005C005C 00002973 6E6F6974 616E6974 7365442F 65637275 urce/Destinations)..\.\..        0000C0
10101010 10104820 20202020 20202020 20202020 20202020 20282828 28282020   (((((               H...... 0000E0
81818181 81811010 10101010 10848484 84848484 84848410 10101010 10101010 ................................ 000100
82828282 82821010 10101010 01010101 01010101 01010101 01010101 01010101 ................................ 000120
00000000 00000020 10101010 02020202 02020202 02020202 02020202 02020202 ................................ 000140
00000000 00000000 00000000 00000000 00000000 00000000 00000000 00000000 ................................ 000160
00000000 00000000 00000000 00000000 00000000 00000000 00000000 00000000 ................................ 000180
00000000 00000000 00000000 00000000 00000000 00000000 00000000 00000000 ................................ 0001A0
2970FFFF 2EE00000 00000000 00000000 00000000 00000000 00000000 00000000 .........................Â...p) 0001C0
22302564 21AA2338 203E233A 2040235D 20480F58 2A0A0F54 28FA0F50 2A2E0F4C L..*P.*(T..*X.H ]#@ :#> 8#ˆ!d%0" 0001E0

Dump of file SATURN:[PCCOMMON.DUMP.DLL]SA-PDLED.DLL;1 on 18-APR-1990 10:51:30.28
File ID (436,15,0)    End of file block 133 / Allocated 136

Virtual block number 97 (00000061), 512 (0200) bytes

00002320 2D2B0029 6C6C756E 2800296C 6C756E28 00001FEC 1F9925C5 222E25C7 Ú%."é%..š...(null).(null).+- #.. 000000
31364D05 01010000 00000FA0 31F40F9C 31F40F98 31F40F94 31F42ABA 31F40000 ..¶1ô*¶1..¶1..¶1..¶1.........M61 000020
00000000 00000000 00000000 00000000 000080C0 E0F0F8FC FEFF0000 0000787B xx.....±•½ÞÀà.................. 000040
00303030 28650000 00000000 00000000 00000000 00000000 00000000 00000000 .........................e+000. 000060
00000000 00000000 00000000 00000000 00000000 00000000 00000000 00000000 ................................ 000080
00000000 00000000 00000000 00000000 00000000 00000000 00000000 00000000 ................................ 0000A0
00000000 00000000 00000000 00000000 00000000 00000000 00000000 00000000 ................................ 0000C0
00000000 00000000 00000000 00000000 00000000 00000000 00000000 00000000 ................................ 0000E0
00000000 00000000 00000000 00000000 00000000 00000000 00000000 00000000 ................................ 000100
00000000 00000000 00000000 00000000 00000000 00000000 00000000 00000000 ................................ 000120
00000000 00000000 00000000 00000000 00000000 00000000 00000000 00000000 ................................ 000140
00000000 00000000 00000000 00000000 00000000 00000000 00000000 00000000 ................................ 000160
00000000 00000000 00000000 00000000 00000000 00000000 00000000 00000000 ................................ 000180
00000000 00000000 00000000 00000000 00000000 00000000 00000000 00000000 ................................ 0001A0
00000000 00000000 00000000 00000000 00000000 00000000 00000000 00000000 ................................ 0001C0
00000000 00000000 00000000 00000000 00000000 00000000 00000000 00000000 ................................ 0001E0

Dump of file SATURN:[PCCOMMON.DUMP.DLL]SA-PDLED.DLL;1 on 18-APR-1990 10:51:30.28
File ID (436,15,0)    End of file block 133 / Allocated 136

Virtual block number 98 (00000062), 512 (0200) bytes

00000000 00000000 2AE82DF0 318D2DF0 2DF00000 00001008 00000000 00000000 ..............Þ-Þ-.1Þ-Ô*........ 000000
00000000 00000000 00000000 00000000 00000000 00000000 00000000 00000000 ................................ 000020
00000000 00000000 00000000 00000000 00000000 00000000 00000000 00000000 ................................ 000040
00000000 00000000 00000000 00000000 00000000 00000000 00000000 00000000 ................................ 000060
00000000 00000000 00000000 00000000 00000000 00000000 00000000 00000000 ................................ 000080
00000000 00000000 00000000 00000000 00000000 00000000 00000000 00000000 ................................ 0000A0
00000000 00000000 00000000 00000000 00000000 00000000 00000000 00000000 ................................ 0000C0
00000000 00000000 00000000 00000000 00000000 00000000 00000000 00000000 ................................ 0000E0
00000000 00000000 00000000 00000000 00000000 00000000 00000000 00000000 ................................ 000100
00000000 00000000 00000000 00000000 00000000 00000000 00000000 00000000 ................................ 000120
00000000 00000000 00000000 00000000 00000000 00000000 00000000 00000000 ................................ 000140
00000000 00000000 00000000 00000000 00000000 00000000 00000000 00000000 ................................ 000160
00000000 00000000 00000000 00000000 00000000 00000000 00000000 00000000 ................................ 000180
00000000 00000000 00000000 00000000 00000000 00000000 00000000 00000000 ................................ 0001A0
00000000 00000000 00000000 00000000 00000000 00000000 00000000 00000000 ................................ 0001C0
00000000 00000000 00000000 00000000 00000000 00000000 00000000 00000000 ................................ 0001E0
```

```
Dump of file SATURN:[PCCOMMON.DUMP.DLL]SA-PDLED.DLL;1 on 18-APR-1990 10:51:30.28
File ID (436,15,0)   End of file block 133 / Allocated 136

Virtual block number 99 (00000063), 512 (0200) bytes

00000000 00000000 00000000 00000000 00000000 00000000 00000000 00000000 ................................ 000000
00000000 00000000 00000000 00000000 00000000 00000000 00000000 00000000 ................................ 000020
00000000 00000000 00000000 00000000 00000000 00000000 00000000 00000000 ................................ 000040
00000000 00000000 00000000 00000000 00000000 00000000 00000000 00000000 ................................ 000060
00000000 00000000 00000000 00000000 00000000 00000000 00000000 00000000 ................................ 000080
00000000 00000000 00000000 00000000 00000000 00000000 00000000 00000000 ................................ 0000A0
00000000 00000000 00000000 00000000 00000000 00000000 00000000 00000000 ................................ 0000C0
00000000 00000000 00000000 00000000 00000000 00000000 00000000 00000000 ................................ 0000E0
00000000 00000000 00000000 00000000 00000000 00000000 00000000 00000000 ................................ 000100
00000000 00000000 00000000 00000000 00000000 00000000 00000000 00000000 ................................ 000120
00000000 00000000 00000000 00000000 00000000 00000000 00000000 00000000 ................................ 000140
00000000 00000000 00000000 00000000 00000000 00000000 00000000 00000000 ................................ 000160
00000000 00000000 00000000 00000000 00000000 00000000 00000000 00000000 ................................ 000180
00000000 00000000 00000000 00000000 00000000 00000000 00000000 00000000 ................................ 0001A0
00000000 00000000 00000000 00000000 00000000 00000000 00000000 00000000 ................................ 0001C0
00000000 00000000 00000000 00000000 00000000 00000000 00000000 00000000 ................................ 0001E0

Dump of file SATURN:[PCCOMMON.DUMP.DLL]SA-PDLED.DLL;1 on 18-APR-1990 10:51:30.28
File ID (436,15,0)   End of file block 133 / Allocated 136

Virtual block number 100 (00000064), 512 (0200) bytes

4E495F45 4C49465F 435F1184 00000000 00000000 00000000 00000000 00000000 ......................._C_FILE_IN 000000
00000000 00000000 00000001 2AE60000 000015A2 00000200 FFFFFFFF 00304F46 FO=.........A.....]*............ 000020
00000000 00000000 00000000 00000000 00000202 00000000 00000000 00000102 ................................ 000040
00000000 00000000 00000000 00000000 00000000 00000000 00000000 00000000 ................................ 000060
00000000 00000000 00000000 00000000 00000000 00000000 00000000 00000000 ................................ 000080
00000000 00000000 00000000 00000000 00000000 00000000 00000000 00000000 ................................ 0000A0
00000000 00000000 00000000 00000000 00000000 00000000 00000000 00000000 ................................ 0000C0
00000000 00000000 00000000 00000000 00000000 00000000 00000000 00000000 ................................ 0000E0
00000000 00000000 00000000 00000000 00000000 00000000 00000000 00000000 ................................ 000100
00000000 00000000 00000000 00000000 00000000 00000000 00000000 00000000 ................................ 000120
00000000 00000000 00000000 00000000 00000000 00000000 00000000 00000000 ................................ 000140
00000000 00000000 00000000 00000000 00000000 00000000 00000000 00000000 ................................ 000160
00000000 00000000 00000000 00000000 00000000 00000000 00000000 00000000 ................................ 000180
00000000 00000000 00000000 00000000 00000000 00000000 00000000 00000000 ................................ 0001A0
00000000 00000000 00000000 00000000 00000000 00000000 00000000 00000000 ................................ 0001C0
00000000 00000000 00000000 00000000 00000000 00000000 00000000 00000000 ................................ 0001E0

Dump of file SATURN:[PCCOMMON.DUMP.DLL]SA-PDLED.DLL;1 on 18-APR-1990 10:51:30.28
File ID (436,15,0)   End of file block 133 / Allocated 136

Virtual block number 101 (00000065), 512 (0200) bytes

00000000 00000000 00000000 00000000 00000000 00000000 00000000 00000000 ................................ 000000
00000000 00000000 00000000 00000000 00000000 00000000 00000000 00000000 ................................ 000020
00000000 00000000 00000000 00000000 00000000 00000000 00000000 00000000 ................................ 000040
00000000 00000000 00000000 00000000 00000000 00000000 00000000 00000000 ................................ 000060
00000000 00000000 00000000 00000000 00000000 00000000 00000000 00000000 ................................ 000080
00000000 00000000 00000000 00000000 00000000 00000000 00000000 00000000 ................................ 0000A0
00000000 00000000 00000000 00000000 00000000 00000000 00000000 00000000 ................................ 0000C0
00000000 00000000 00000000 00000000 00000000 00000000 00000000 00000000 ................................ 0000E0
00000000 00000000 00000000 00000000 00000000 00000000 00000000 00000000 ................................ 000100
00000000 00000000 00000000 00000000 00000000 00000000 00000000 00000000 ................................ 000120
00000000 00000000 00000000 00000000 00000000 00000000 00000000 00000000 ................................ 000140
00000000 00000000 00000000 00000000 00000000 00000000 00000000 00000000 ................................ 000160
00000000 00000000 00000000 00000000 00000000 00000000 00000000 00000000 ................................ 000180
00000000 00000000 00000000 00000000 00000000 00000000 00000000 00000000 ................................ 0001A0
00000000 00000000 00000000 00000000 00000000 00000000 00000000 00000000 ................................ 0001C0
00000000 00000000 00000000 00000000 00000000 00000000 00000000 00000000 ................................ 0001E0
```

```
Dump of file SATURN:[PCCOMMON.DUMP.DLL]SA-PDLED.DLL;1 on 18-APR-1990 10:51:30.28
File ID (436,15,0)   End of file block 133 / Allocated 136

Virtual block number 102 (00000066), 512 (0200) bytes

00000000 00000000 00000000 00000000 00000000 00000000 00000000 00000000 ................................ 000000
00000000 00000000 00000000 00000000 00000000 00000000 00000000 00000000 ................................ 000020
00000000 00000000 00000000 00000000 00000000 00000000 00000000 00000000 ................................ 000040
00000000 00000000 00000000 00000000 00000000 00000000 00000000 00000000 ................................ 000060
00000000 00000000 00000000 00000000 00000000 00000000 00000000 00000000 ................................ 000080
00000000 00000000 00000000 00000000 00000000 00000000 00000000 00000000 ................................ 0000A0
00000000 00000000 00000000 00000000 00000000 00000000 00000000 00000000 ................................ 0000C0
00000000 00000000 00000000 00000000 00000000 00000000 00000000 00000000 ................................ 0000E0
00000000 00000000 00000000 00000000 00000000 00000000 00000000 00000000 ................................ 000100
00000000 00000000 00000000 00000000 00000000 00000000 00000000 00000000 ................................ 000120
00000000 00000000 00000000 00000000 00000000 00000000 00000000 00000000 ................................ 000140
00000000 00000000 00000000 00000000 00000000 00000000 00000000 00000000 ................................ 000160
00000000 00000000 00000000 00000000 00000000 00000000 00000000 00000000 ................................ 000180
00000000 00000000 00000000 00000000 00000000 00000000 00000000 00000000 ................................ 0001A0
00000000 00000000 00000000 00000000 00000000 00000000 00000000 00000000 ................................ 0001C0
00000000 00000000 00000000 00000000 00000000 00000000 00000000 00000000 ................................ 0001E0

Dump of file SATURN:[PCCOMMON.DUMP.DLL]SA-PDLED.DLL;1 on 18-APR-1990 10:51:30.28
File ID (436,15,0)   End of file block 133 / Allocated 136

Virtual block number 103 (00000067), 512 (0200) bytes

00000000 00000000 00000000 00000000 00000000 00000000 00000000 00000000 ................................ 000000
00000000 00000000 00000000 00000000 00000000 00000000 00000000 00000000 ................................ 000020
00000000 00000000 00000000 00000000 00000000 00000000 00000000 00000000 ................................ 000040
00000000 00000000 00000000 00000000 00000000 00000000 00000000 00000000 ................................ 000060
00000000 00000000 00000000 00000000 00000000 00000000 00000000 00000000 ................................ 000080
00000000 00000000 00000000 00000000 00000000 00000000 00000000 00000000 ................................ 0000A0
00000000 00000000 00000000 00000000 00000000 00000000 00000000 00000000 ................................ 0000C0
00000000 00000000 00000000 00000000 00000000 00000000 00000000 00000000 ................................ 0000E0
00000000 00000000 00000000 00000000 00000000 00000000 00000000 00000000 ................................ 000100
00000000 00000000 00000000 00000000 00000000 00000000 00000000 00000000 ................................ 000120
00000000 00000000 00000000 00000000 00000000 00000000 00000000 00000000 ................................ 000140
00000000 00000000 00000000 00000000 00000000 00000000 00000000 00000000 ................................ 000160
00000000 00000000 00000000 00000000 00000000 00000000 00000000 00000000 ................................ 000180
00000000 00000000 00000000 00000000 00000000 00000000 00000000 00000000 ................................ 0001A0
00000000 00000000 00000000 00000000 00000000 00000000 00000000 00000000 ................................ 0001C0
00000000 00000000 00000000 00000000 00000000 00000000 00000000 00000000 ................................ 0001E0

Dump of file SATURN:[PCCOMMON.DUMP.DLL]SA-PDLED.DLL;1 on 18-APR-1990 10:51:30.28
File ID (436,15,0)   End of file block 133 / Allocated 136

Virtual block number 104 (00000068), 512 (0200) bytes

00000000 00000000 00000000 00000000 00000000 00000000 00000000 00000000 ................................ 000000
00000000 00000000 00000000 00000000 00000000 00000000 00000000 00000000 ................................ 000020
00000000 00000000 00000000 00000000 00000000 00000000 00000000 00000000 ................................ 000040
00000000 00000000 00000000 00000000 00000000 00000000 00000000 00000000 ................................ 000060
00000000 00000000 00000000 00000000 00000000 00000000 00000000 00000000 ................................ 000080
00000000 00000000 00000000 00000000 00000000 00000000 00000000 00000000 ................................ 0000A0
00000000 00000000 00000000 00000000 00000000 00000000 00000000 00000000 ................................ 0000C0
00000000 00000000 00000000 00000000 00000000 00000000 00000000 00000000 ................................ 0000E0
00000000 00000000 00000000 00000000 00000000 00000000 00000000 00000000 ................................ 000100
00000000 00000000 00000000 00000000 00000000 00000000 00000000 00000000 ................................ 000120
00000000 00000000 00000000 00000000 00000000 00000000 00000000 00000000 ................................ 000140
00000000 00000000 00000000 00000000 00000000 00000000 00000000 00000000 ................................ 000160
00000000 00000000 00000000 00000000 00000000 00000000 00000000 00000000 ................................ 000180
00000000 00000000 00000000 00000000 00000000 00000000 00000000 00000000 ................................ 0001A0
00000000 00000000 00000000 00000000 00000000 00000000 00000000 00000000 ................................ 0001C0
00000000 00000000 00000000 00000000 00000000 00000000 00000000 00000000 ................................ 0001E0
```

```
Dump of file SATURN:[PCCOMMON.DUMP.DLL]SA-PDLED.DLL;1 on 18-APR-1990 10:51:30.28
File ID (436,15,0)    End of file block 133 / Allocated 136

Virtual block number 105 (00000069), 512 (0200) bytes

00000000 00000000 00000000 00000000 00000000 00000000 00000000 00000000 ................................ 000000
00000000 00000000 00000000 00000000 00000000 00000000 00000000 00000000 ................................ 000020
00000000 00000000 00000000 00000000 00000000 00000000 00000000 00000000 ................................ 000040
00000000 00000000 00000000 00000000 00000000 00000000 00000000 00000000 ................................ 000060
00000000 00000000 00000000 00000000 00000000 00000000 00000000 00000000 ................................ 000080
00000000 00000000 00000000 00000000 00000000 00000000 00000000 00000000 ................................ 0000A0
00000000 00000000 00000000 00000000 00000000 00000000 00000000 00000000 ................................ 0000C0
00000000 00000000 00000000 00000000 00000000 00000000 00000000 00000000 ................................ 0000E0
00000000 00000000 00000000 00000000 00000000 00000000 00000000 00000000 ................................ 000100
00000000 00000000 00000000 00000000 00000000 00000000 00000000 00000000 ................................ 000120
00000000 00000000 00000000 00000000 00000000 00000000 00000000 00000000 ................................ 000140
00000000 00000000 00000000 00000000 00000000 00000000 00000000 00000000 ................................ 000160
00000000 00000000 00000000 00000000 00000000 00000000 00000000 00000000 ................................ 000180
00000000 00000000 00000000 00000000 00000000 00000000 00000000 00000000 ................................ 0001A0
00000000 00000000 00000000 00000000 00000000 00000000 00000000 00000000 ................................ 0001C0
00000000 00000000 00000000 00000000 00000000 00000000 00000000 00000000 ................................ 0001E0

Dump of file SATURN:[PCCOMMON.DUMP.DLL]SA-PDLED.DLL;1 on 18-APR-1990 10:51:30.28
File ID (436,15,0)    End of file block 133 / Allocated 136

Virtual block number 106 (0000006A), 512 (0200) bytes

00010000 00000000 00000000 00000000 00000000 00000000 00000000 00000000 ................................ 000000
00000000 00000000 00000000 00000000 00000000 00000000 00000000 00000200 ................................ 000020
00000000 00000000 00000000 00000000 00000000 00000000 00000000 00000000 ................................ 000040
00000000 00000000 00000000 00000000 00000000 00000000 00000000 00000000 ................................ 000060
00000000 00000000 00000000 00000000 00000000 00000000 00000000 00000000 ................................ 000080
00000000 00000000 00000000 00000000 00000000 00000000 00000000 00000000 ................................ 0000A0
00000000 00000000 00000000 00000000 00000000 00000000 00000000 00000000 ................................ 0000C0
00000000 00000000 00000000 00000000 00000000 00000000 00000000 00000000 ................................ 0000E0
00000000 00000000 00000000 00000000 00000000 00000000 00000000 00000000 ................................ 000100
00000000 00000000 00000000 00000000 00000000 00000000 00000000 00000000 ................................ 000120
00000000 00000000 00000000 00000000 00000000 00000000 00000000 00000000 ................................ 000140
00000000 00000000 00000000 00000000 00000000 00000000 00000000 00000000 ................................ 000160
00000000 00000000 00000000 00000000 00000000 00000000 00000000 00000000 ................................ 000180
00000000 00000000 00000000 00000000 00000000 00000000 00000000 00000000 ................................ 0001A0
00000000 00000000 00000000 00000000 00000000 00000000 00000000 00000000 ................................ 0001C0
00000000 00000000 00000000 00000000 00000000 00000000 00000000 00000000 ................................ 0001E0

Dump of file SATURN:[PCCOMMON.DUMP.DLL]SA-PDLED.DLL;1 on 18-APR-1990 10:51:30.28
File ID (436,15,0)    End of file block 133 / Allocated 136

Virtual block number 107 (0000006B), 512 (0200) bytes

00000000 00000000 00000000 00000000 00000000 00000000 00000000 00000000 ................................ 000000
00000000 00000000 00000000 00000000 00000000 00000000 00000000 00000000 ................................ 000020
00000000 00000000 00000000 00000000 00000000 00000000 00000000 00000000 ................................ 000040
00000000 00000000 00000000 00000000 00000000 00000000 00000000 00000000 ................................ 000060
00000000 00000000 00000000 00000000 00000000 00000000 00000000 00000000 ................................ 000080
00000000 00000000 00000000 00000000 00000000 00000000 00000000 00000000 ................................ 0000A0
00000000 00000000 00000000 00000000 00000000 00000000 00000000 00000000 ................................ 0000C0
00000000 00000000 00000000 00000000 00000000 00000000 00000000 00000000 ................................ 0000E0
00000000 00000000 00000000 00000000 00000000 00000000 00000000 00000000 ................................ 000100
00000000 00000000 00000000 00000000 00000000 00000000 00000000 00000000 ................................ 000120
00000000 00000000 00000000 00000000 00000000 00000000 00000000 00000000 ................................ 000140
00000000 00000000 00000000 00000000 00000000 00000000 00000000 00000000 ................................ 000160
00000000 00000000 00000000 00000000 00000000 00000000 00000000 00000000 ................................ 000180
00000000 00000000 00000000 00000000 00000000 00000000 00000000 00000000 ................................ 0001A0
00000000 00000000 00000000 00000000 00000000 00000000 00000000 00000000 ................................ 0001C0
00000000 00000000 00000000 00000000 00000000 00000000 00000000 00000000 ................................ 0001E0
```

```
Dump of file SATURN:[PCCOMMON.DUMP.DLL]SA-PDLED.DLL;1 on 18-APR-1990 10:51:30.28
File ID (436,15,0)   End of file block 133 / Allocated 136

Virtual block number 108 (0000006C), 512 (0200) bytes

00000000 00000000 00000000 00000000 00000000 00000000 00000000 00000000 ................................ 000000
00000000 00000000 00000000 00000000 00000000 00000000 00000000 00000000 ................................ 000020
00000000 00000000 00000000 00000000 00000000 00000000 00000000 00000000 ................................ 000040
00000000 00000000 00000000 00000000 00000000 00000000 00000000 00000000 ................................ 000060
00000000 00000000 00000000 00000000 00000000 00000000 00000000 00000000 ................................ 000080
00000000 00000000 00000000 00000000 00000000 00000000 00000000 00000000 ................................ 0000A0
00000000 00000000 00000000 00000000 00000000 00000000 00000000 00000000 ................................ 0000C0
00000000 00000000 00000000 00000000 00000000 00000000 00000000 00000000 ................................ 0000E0
00000000 00000000 00000000 00000000 00000000 00000000 00000000 00000000 ................................ 000100
00000000 00000000 00000000 00000000 00000000 00000000 00000000 00000000 ................................ 000120
00000000 00000000 00000000 00000000 00000000 00000000 00000000 00000000 ................................ 000140
00000000 00000000 00000000 00000000 00000000 00000000 00000000 00000000 ................................ 000160
00000000 00000000 00000000 00000000 00000000 00000000 00000000 00000000 ................................ 000180
00000000 00000000 00000000 00000000 00000000 00000000 00000000 00000000 ................................ 0001A0
00000000 00000000 00000000 00000000 00000000 00000000 00000000 00000000 ................................ 0001C0
00000000 00000000 00000000 00000000 00000000 00000000 00000000 00000000 ................................ 0001E0

Dump of file SATURN:[PCCOMMON.DUMP.DLL]SA-PDLED.DLL;1 on 18-APR-1990 10:51:30.28
File ID (436,15,0)   End of file block 133 / Allocated 136

Virtual block number 109 (0000006D), 512 (0200) bytes

00000000 11862182 00000000 00000000 00000000 00000000 00000000 00000000 ..........................!..... 000000
00000000 00000000 00000000 00008181 81010000 00010000 00000000 00000000 ................................ 000020
00000000 00000000 00000000 00000000 00000000 00000000 00000000 00000000 ................................ 000040
00000000 00000000 00000000 00000000 00000000 00000000 00000000 00000000 ................................ 000060
00000000 00000000 00000000 00000000 00000000 00000000 00000000 00000000 ................................ 000080
00000000 00000000 00000000 00000000 00000000 00000000 00000000 00000000 ................................ 0000A0
00000000 00000000 00000000 00000000 00000000 00000000 00000000 00000000 ................................ 0000C0
00000000 00000000 00000000 00000000 00000000 00000000 00000000 00000000 ................................ 0000E0
00000000 00000000 00000000 00000000 00000000 00000000 00000000 00000000 ................................ 000100
0A0A0A0A 0A0A0A0A 0A0A0A0A 0A0A0A0A 0A000000 00000000 00000000 00000000 ................................ 000120
0A0A0A0A 0A0A0A0A 0A0A0A0A 0A0A0A0A 0A0A0A0A 0A0A0A0A 0A0A0A0A 0A0A0A0A ................................ 000140
0A0A0A0A 0A0A0A0A 0A0A0A0A 0A0A0A0A 0A0A0A0A 0A0A0A0A 0A0A0A0A 0A0A0A0A ................................ 000160
0A0A0A0A 0A0A0A0A 0A0A0A0A 0A0A0A0A 0A0A0A0A 0A0A0A0A 0A0A0A0A 0A0A0A0A ................................ 000180
0A0A0A0A 0A0A0A0A 0A0A0A0A 0A0A0A0A 0A0A0A0A 0A0A0A0A 0A0A0A0A 0A0A0A0A ................................ 0001A0
0A0A0A0A 0A0A0A0A 0A0A0A0A 0A0A0A0A 0A0A0A0A 0A0A0A0A 0A0A0A0A 0A0A0A0A ................................ 0001C0
0A0A0A0A 0A0A0A0A 0A0A0A0A 0A0A0A0A 0A0A0A0A 0A0A0A0A 0A0A0A0A 0A0A0A0A ................................ 0001E0

Dump of file SATURN:[PCCOMMON.DUMP.DLL]SA-PDLED.DLL;1 on 18-APR-1990 10:51:30.28
File ID (436,15,0)   End of file block 133 / Allocated 136

Virtual block number 110 (0000006E), 512 (0200) bytes

0A0A0A0A 0A0A0A0A 0A0A0A0A 0A0A0A0A 0A0A0A0A 0A0A0A0A 0A0A0A0A 0A0A0A0A ................................ 000000
00000000 00000000 00000000 00000000 000A0A0A 0A0A0A0A 0A0A0A0A 0A0A0A0A ................................ 000020
00000000 00000000 00000000 00000000 00000000 00000000 00000000 00000000 ................................ 000040
00002000 00000000 00000000 00000000 00000000 00000000 00000000 00000000 ................................ 000060
00000000 00000000 00000000 00000000 00000000 00000000 00000000 00000000 ................................ 000080
00000000 00000000 00000000 00000000 00000000 00000000 00000000 00000000 ................................ 0000A0
00000000 00000000 00000000 00000000 00000000 00000000 00000000 00000000 ................................ 0000C0
00000000 00000000 00000000 00000000 00000000 00000000 00000000 00000000 ................................ 0000E0
00000000 00000000 00000000 00000000 00000000 00000000 00000000 00000000 ................................ 000100
00000000 00000000 00000000 00000000 00000000 00000000 00000000 00000000 ................................ 000120
FFFF2AC8 38242AC0 18780000 00000FA4 2F760000 0F5C0665 00000000 00000000 ........e.\...v/É.....x.â*$8â*.. 000140
00000000 00000D52 2AE42ACE 2AE0FFFF 3FD33333 33333333 3FC33333 33333333 333333ù?333333Ã?..Å*ö*ô*R....... 000160
702D676E 6974616F 6C662020 0A0D4854 414D203A 00FD3E3E 4753D4E 3C3C0000 ..<<NMSG>>».: MATH..- floating-p 000180
64697669 64006700 0A0D6469 6C61766E 69006500 203A726F 72726520 746E696F oint error: .e.invalid...g.divid 0001A0
766F2068 63617473 006E000A 00776F6C 66726576 6F006800 0A0D3020 79622065 e by 0...h.overflow...n.stack ov 0001C0
00646574 6172656E 65672079 6C746963 696C7078 65007000 0A00776F 6C667265 erflow...p.explicitly generated. 0001E0
```

```
Dump of file SATURN:[PCCOMMON.DUMP.DLL]SA-PDLED.DLL;1 on 18-APR-1990 10:51:30.28
File ID (436,15,0)   End of file block 133 / Allocated 136

Virtual block number 111 (0000006F), 512 (0200) bytes

 0003000A 00776F6C 66726576 6F206863 61747320 2D0A0D30 30303652 0000000A ....R6000..- stack overflow..... 000000
 08000A0D 30207962 20656469 76696420 72656765 746E6920 2D0A0D33 30303652 R6003..- integer divide by 0.... 000020
 6120726F 66206563 61707320 6867756F 6E652074 6F6E202D 0A0D3830 30365200 .R6008..- not enough space for a 000040
 6867756F 6E652074 6F6E202D 0A0D3930 30365200 09000A0D 73746E65 6D756772 rguments.....R6009..- not enough 000060
 00FF000A 0000FC00 0A0D746E 656D6E6F 7269766E 6520726F 66206563 61707320  space for environment...•...... 000080
 74616F6C 66202D0A 00323030 36520002 0020726F 72726520 656D6974 206E7572 run-time error ...R6002..- float 0000A0
 2ACC0002 0003FFFF FF000A0D 64656461 6F6C2074 6F6E2074 6E696F70 20676E69 ing point not loaded..........ä* 0000C0
 00000000 00000000 00000000 00000009 278A0002 00000008 159C0002 00000007 ...............'................ 0000E0
 0000000C 00000438 00200020 0000001A 49430000 00000000 00780000 00284142 BA(...x.......CI.... . .8....... 000100
 0000000C 00000838 00200020 0000001A 4943FFFF FF000000 00010001 00800040 @.............CI.... . .8....... 000120
 FFFF0000 FFFF00FF 00FF00FF FF000000 00FFFFFF FF000000 00040001 00400040 @.@............................. 000140
 00F00000 00284142 C0C0C078 34000080 80008000 80008080 00000000 80404040 @@@...............4xàààBA(...Þ. 000160
 00010001 00400020 0000000C 00001038 00100010 0000001A 494301E0 02800000 ....À.CI........8....... .@..... 000180
 00040001 00200020 0000000C 00001138 00100010 0000001A 4943FFFF FF000000 ......CI........8....... . ..... 0001A0
 00000000 80404040 FFFF0000 FFFF00FF 00FF00FF FF000000 00FFFFFF FF000000 ........................@@@..... 0001C0
 49430300 04000000 00000000 00284142 C0C0C078 34000080 80008000 80008080 ...........4xàààBA(...........CI 0001E0

Dump of file SATURN:[PCCOMMON.DUMP.DLL]SA-PDLED.DLL;1 on 18-APR-1990 10:51:30.28
File ID (436,15,0)   End of file block 133 / Allocated 136

Virtual block number 112 (00000070), 512 (0200) bytes

 4943FFFF FF000000 00010001 00800040 0000000C 00001338 00200020 0000001A .... . .8.......@.............CI 000000
 66663131 31000000 00080001 00400040 0000000C 00001738 00200020 0000001A .... . .8.......@.@........111ff 000020
 F3E5E4FF FFD688AF D4CFBCE8 BBFFFFBF FF000000 4080FFFF FFCECECE 99999966 f...ööö....@....€..ÈÒ¥üå£|ø..ðÎµ 000040
 FFFFFFFF FFFFFFFF FFFFFFFF FFFFFFFF FFFFFFFF FFFFFFFF 0000FFFF FF00FFBD §............................... 000060
 FFFFFFFF FFFFFFFF FFFFFFFF FFFFFFFF FFFFFFFF FFFFFFFF FFFFFFFF FFFFFFFF ................................ 000080
 FFFFFFFF FFFFFFFF FFFFFFFF FFFFFFFF FFFFFFFF FFFFFFFF FFFFFFFF FFFFFFFF ................................ 0000A0
 FFFFFFFF FFFFFFFF FFFFFFFF FFFFFFFF FFFFFFFF FFFFFFFF FFFFFFFF FFFFFFFF ................................ 0000C0
 FFFFFFFF FFFFFFFF FFFFFFFF FFFFFFFF FFFFFFFF FFFFFFFF FFFFFFFF FFFFFFFF ................................ 0000E0
 FFFFFFFF FFFFFFFF FFFFFFFF FFFFFFFF FFFFFFFF FFFFFFFF FFFFFFFF FFFFFFFF ................................ 000100
 FFFFFFFF FFFFFFFF FFFFFFFF FFFFFFFF FFFFFFFF FFFFFFFF FFFFFFFF FFFFFFFF ................................ 000120
 FFFFFFFF FFFFFFFF FFFFFFFF FFFFFFFF FFFFFFFF FFFFFFFF FFFFFFFF FFFFFFFF ................................ 000140
 FFFFFFFF FFFFFFFF FFFFFFFF FFFFFFFF FFFFFFFF FFFFFFFF FFFFFFFF FFFFFFFF ................................ 000160
 FFFFFFFF FFFFFFFF FFFFFFFF FFFFFFFF FFFFFFFF FFFFFFFF FFFFFFFF FFFFFFFF ................................ 000180
 FFFFFFFF FFFFFFFF FFFFFFFF FFFFFFFF FFFFFFFF FFFFFFFF FFFFFFFF FFFFFFFF ................................ 0001A0
 FFFFFFFF FFFFFFFF FFFFFFFF FFFFFFFF FFFFFFFF FFFFFFFF FFFFFFFF FFFFFFFF ................................ 0001C0
 FFFFFFFF FFFFFFFF FFFFFFFF FFFFFFFF FFFFFFFF FFFFFFFF FFFFFFFF FFFFFFFF ................................ 0001E0

Dump of file SATURN:[PCCOMMON.DUMP.DLL]SA-PDLED.DLL;1 on 18-APR-1990 10:51:30.28
File ID (436,15,0)   End of file block 133 / Allocated 136

Virtual block number 113 (00000071), 512 (0200) bytes

 FFFFFFFF FFFFFFFF FFFFFFFF FFFFFFFF FFFFFFFF FFFFFFFF FFFFFFFF FFFFFFFF ................................ 000000
 FFFFFFFF FFFFFFFF FFFFFFFF FFFFFFFF FFFFFFFF FFFFFFFF FFFFFFFF FFFFFFFF ................................ 000020
 FFFFFFFF FFFFFFFF FFFFFFFF FFFFFFFF FFFFFFFF FFFFFFFF FFFFFFFF FFFFFFFF ................................ 000040
 FFFFFFFF FFFFFFFF FFFFFFFF FFFFFFFF FFFFFFFF FFFFFFFF FFFFFFFF FFFFFFFF ................................ 000060
 FFFFFFFF FFFFFFFF FFFFFFFF FFFFFFFF FFFFFFFF FFFFFFFF FFFFFFFF FFFFFFFF ................................ 000080
 FFFFFFFF FFFFFFFF FFFFFFFF FFFFFFFF FFFFFFFF FFFFFFFF FFFFFFFF FFFFFFFF ................................ 0000A0
 FFFFFFFF FFFFFFFF FFFFFFFF FFFFFFFF FFFFFFFF FFFFFFFF FFFFFFFF FFFFFFFF ................................ 0000C0
 FFFFFFFF FFFFFFFF FFFFFFFF FFFFFFFF FFFFFFFF FFFFFFFF FFFFFFFF FFFFFFFF ................................ 0000E0
 FFFFFFFF FFFFFFFF FFFFFFFF FFFFFFFF FFFFFFFF FFFFFFFF FFFFFFFF FFFFFFFF ................................ 000100
 00000000 00000000 FFFFFFFF FFFFFFFF FFFFFFFF FFFFFFFF FFFFFFFF FFFFFFFF ................................ 000120
 00000000 00000000 00000000 00000000 00000000 00000000 00000000 00000000 ................................ 000140
 00000000 00000000 00000000 00000000 00000000 00000000 00000000 00000000 ................................ 000160
 00000000 00000000 00000000 00000000 00000000 00000000 00000000 00000000 ................................ 000180
 00000000 00000000 00000000 00000000 00000000 00000000 00000000 00000000 ................................ 0001A0
 00000000 00000000 00000000 00000000 00000000 00000000 00000000 00000000 ................................ 0001C0
 00000000 00000000 00000000 00000000 00000000 00000000 00000000 00000000 ................................ 0001E0
```

```
Dump of file SATURN:[PCCOMMON.DUMP.DLL]SA-PDLED.DLL;1 on 18-APR-1990 10:51:30.28
File ID (436,15,0)   End of file block 133 / Allocated 136

Virtual block number 114 (00000072), 512 (0200) bytes

 00000000 00000000 00000000 00000000 00000000 00000000 00000000 00000000 ................................ 000000
 00000000 00000000 00000000 00000000 00000000 00000000 00000000 00000000 ................................ 000020
 00000000 00000000 00000000 00000000 00000000 00000000 00000000 00000000 ................................ 000040
 00000000 00000000 00000000 00000000 00000000 00000000 00000000 00000000 ................................ 000060
 00000000 00000000 00000000 00000000 00000000 00000000 00000000 00000000 ................................ 000080
 00000000 00000000 00000000 00000000 00000000 00000000 00000000 00000000 ................................ 0000A0
 00000000 00000000 00000000 00000000 00000000 00000000 00000000 00000000 ................................ 0000C0
 00000000 00000000 00000000 00000000 00000000 00000000 00000000 00000000 ................................ 0000E0
 00000000 00000000 00000000 00000000 00000000 00000000 00000000 00000000 ................................ 000100
 00000000 00000000 00000000 00000000 00000000 00000000 00000000 00000000 ................................ 000120
 FF070000 000080FF 00000000 00000000 00000000 00000000 00000000 00000000 ................................ 000140
 7F000000 000000F8 7F000000 000000F8 FF000000 000000FC FF010000 000000FE ±.......■.......½.......½....... 000160
 3F000000 000000F0 3F000000 000000F0 3F000000 000000F0 3F000000 000000F0 Þ......?Þ......?Þ......?Þ......? 000180
 3F000000 000000F0 3F000000 000000F0 3F000000 000000F0 3F000000 000000F0 Þ......?Þ......?Þ......?Þ......? 0001A0
 3F000000 000000F0 3F000000 000000F0 3F000000 000000F0 3F000000 000000F0 Þ......?Þ......?Þ......?Þ......? 0001C0
 3F000000 000000F0 3F000000 000000F0 3F000000 000000F0 3F000000 000000F0 Þ......?Þ......?Þ......?Þ......? 0001E0

Dump of file SATURN:[PCCOMMON.DUMP.DLL]SA-PDLED.DLL;1 on 18-APR-1990 10:51:30.28
File ID (436,15,0)   End of file block 133 / Allocated 136

Virtual block number 115 (00000073), 512 (0200) bytes

 3F000000 000000F0 3F000000 000000F0 3F000000 000000F0 3F000000 000000F0 Þ......?Þ......?Þ......?Þ......? 000000
 3F000000 000000F0 3F000000 000000F0 3F000000 000000F0 3F000000 000000F0 Þ......?Þ......?Þ......?Þ......? 000020
 3F000000 000000F0 3F000000 000000F0 3F000000 000000F0 3F000000 000000F0 Þ......?Þ......?Þ......?Þ......? 000040
 3F000000 000000F0 3F000000 000000F0 3F000000 000000F0 3F000000 000000F0 Þ......?Þ......?Þ......?Þ......? 000060
 3F000000 000000F0 3F000000 000000F0 3F000000 000000F0 3F000000 000000F0 Þ......?Þ......?Þ......?Þ......? 000080
 3F000000 000000F0 3F000000 000000F0 3F000000 000000F0 3F000000 000000F0 Þ......?Þ......?Þ......?Þ......? 0000A0
 7F000000 000000F8 7F000000 000000F8 3F000000 000000F0 3F000000 000000F0 Þ......?Þ......?½.......½....... 0000C0
 FFFFFFFF FFFFFFFF FF070000 000080FF FF010000 000000FE FF000000 000000FC ■.......±....................... 0000E0
 FFFFFFFF FFFFFFFF FFFFFFFF FFFFFFFF FFFFFFFF FFFFFFFF FFFFFFFF FFFFFFFF ................................ 000100
 11111102 00000000 FFFFFFFF FFFFFFFF FFFFFFFF FFFFFFFF FFFFFFFF FFFFFFFF ................................ 000120
 11111111 02000000 00000000 00201111 11111111 11111111 11111111 11111111 ...................  ............ 000140
 55553511 11000000 00000000 20111111 11111111 11111111 11111111 11111111 ...................  .........5UU 000160
 55555535 11020000 00000000 11115355 55555555 55555555 55555555 55555555 UUUUUUUUUUUUUUUUS..........5UUU 000180
 55555555 13010000 00000020 11535555 55555555 55555555 55555555 55555555 UUUUUUUUUUUUUUUUUS. .......UUUU 0001A0
 55555555 15210000 00000010 31555555 55555555 55555555 55555555 55555555 UUUUUUUUUUUUUUUUUU1......!.UUUU 0001C0
 55555555 35110000 00000012 51555555 55555555 55555555 55555555 55555555 UUUUUUUUUUUUUUUUUUQ.......5UUUU 0001E0

Dump of file SATURN:[PCCOMMON.DUMP.DLL]SA-PDLED.DLL;1 on 18-APR-1990 10:51:30.28
File ID (436,15,0)   End of file block 133 / Allocated 136

Virtual block number 116 (00000074), 512 (0200) bytes

 55555555 55110000 00000011 53555555 55555555 55555555 55555555 55555555 UUUUUUUUUUUUUUUUUUUS.......UUUU 000000
 55555555 55110000 00000011 55555555 55555555 55555555 55555555 55555555 UUUUUUUUUUUUUUUUUUUU.......UUUU 000020
 55555555 55110000 00000011 55555555 55555555 55555555 55555555 55555555 UUUUUUUUUUUUUUUUUUUU.......UUUU 000040
 55555555 55110000 00000011 55555555 55555555 55555555 55555555 55555555 UUUUUUUUUUUUUUUUUUUU.......UUUU 000060
 55555555 55110000 00000011 55555555 55555555 55555555 55555555 55555555 UUUUUUUUUUUUUUUUUUUU.......UUUU 000080
 55555555 55110000 00000011 55555555 55555555 55555555 55555555 55555555 UUUUUUUUUUUUUUUUUUUU.......UUUU 0000A0
 55555555 55110000 00000011 55555555 55555555 55555555 55555555 55555555 UUUUUUUUUUUUUUUUUUUU.......UUUU 0000C0
 55555555 55110000 00000011 55555555 55555555 55555555 55555555 55555555 UUUUUUUUUUUUUUUUUUUU.......UUUU 0000E0
 55555555 55110000 00000011 55555555 55555555 55555555 55555555 55555555 UUUUUUUUUUUUUUUUUUUU.......UUUU 000100
 55555555 55110000 00000011 55555555 55555555 55555555 55555555 55555555 UUUUUUUUUUUUUUUUUUUU.......UUUU 000120
 55555555 55110000 00000011 55555555 55555555 55555555 55555555 55555555 UUUUUUUUUUUUUUUUUUUU.......UUUU 000140
 55555555 55110000 00000011 55555555 55555555 55555555 55555555 55555555 UUUUUUUUUUUUUUUUUUUU.......UUUU 000160
 55555555 55110000 00000011 55555555 55555555 55555555 55555555 55555555 UUUUUUUUUUUUUUUUUUUU.......UUUU 000180
 55555555 55110000 00000011 55555555 55555555 55555555 55555555 55555555 UUUUUUUUUUUUUUUUUUUU.......UUUU 0001A0
 55555555 55110000 00000011 55555555 55555555 55555555 55555555 55555555 UUUUUUUUUUUUUUUUUUUU.......UUUU 0001C0
 55555555 55110000 00000011 55555555 55555555 55555555 55555555 55555555 UUUUUUUUUUUUUUUUUUUU.......UUUU 0001E0
```

```
Dump of file SATURN:[PCCOMMON.DUMP.DLL]SA-PDLED.DLL;1 on 18-APR-1990 10:51:30.28
File ID (436,15,0)   End of file block 133 / Allocated 136

Virtual block number 117 (00000075), 512 (0200) bytes

55555555 55110000 00000011 55555555 55555555 55555555 55555555 55555555 UUUUUUUUUUUUUUUUUUUU.......UUUUU 000000
55555555 55110000 00000011 55555555 55555555 55555555 55555555 55555555 UUUUUUUUUUUUUUUUUUUU.......UUUUU 000020
55555555 55110000 00000011 55555555 55255055 55025555 55555555 55555555 UUUUUUUUUU.UUP%UUUUU.......UUUUU 000040
52555555 55110000 00000011 55555555 55025555 25505555 55552500 52550220  .UR.%UUUUP%UU.UUUUU.......UUUUR 000060
50555555 55110000 00000011 55555555 55005555 05505555 55550200 20250000 ..% ..UUUUP.UU.UUUUU.......UUUUP 000080
50555555 55110000 00000011 55555555 25205555 02525555 55550000 00050000 ......UUUUR.UU %UUUU.......UUUUP 0000A0
51555555 55110000 00000011 55555555 05205555 00525555 55550000 00050000 ......UUUUR.UU .UUUU.......UUUUQ 0000C0
52555555 55110000 00000011 55555555 02105225 00215555 55550200 10250000 ..%...UUUU!.%R..UUUU.......UUUUR 0000E0
55555555 55110000 00000011 55555555 01002015 00005255 55552501 20550200 ..U .%UUUR... ..UUUU.......UUUUU 000100
55555555 55110000 00000011 55555555 00000005 00005055 55555502 50552500 .%UP.UUUUP......UUUU.......UUUUU 000120
55555555 55110000 00000011 55555555 00000005 00005055 55555502 52552520  %UR.UUUUP......UUUU.......UUUUU 000140
55555555 55110000 00000011 55555555 02002025 00005255 55555500 55550550 P.UU.UUUUR..% ..UUUU.......UUUUU 000160
55555555 55110000 00000011 55555555 25005255 02205555 55555520 55550552 R.UU UUUUU .UR.%UUUU.......UUUUU 000180
55555555 55110000 00000011 55555555 55555555 55555555 55550552 55552055 U UUR.UUUUUUUUUUUUUU.......UUUUU 0001A0
55555555 55110000 00000011 55555555 55555555 55555555 55555555 55555555 UUUUUUUUUUUUUUUUUUUU.......UUUUU 0001C0
55555555 55110000 00000011 55555555 55555555 55555555 55555555 55555555 UUUUUUUUUUUUUUUUUUUU.......UUUUU 0001E0

Dump of file SATURN:[PCCOMMON.DUMP.DLL]SA-PDLED.DLL;1 on 18-APR-1990 10:51:30.28
File ID (436,15,0)   End of file block 133 / Allocated 136

Virtual block number 118 (00000076), 512 (0200) bytes

55555555 55110000 00000011 55555555 55555555 55555555 55555555 55555555 UUUUUUUUUUUUUUUUUUUU.......UUUUU 000000
55555555 55110000 00000011 55555555 55555555 55555555 55555555 55555555 UUUUUUUUUUUUUUUUUUUU.......UUUUU 000020
55555555 55110000 00000011 55555555 55555555 55555555 55555555 55555555 UUUUUUUUUUUUUUUUUUUU.......UUUUU 000040
33333333 33110000 00000011 55555555 55555555 55555555 55555555 55555555 UUUUUUUUUUUUUUUUUUUU.......33333 000060
55555555 55110000 00000011 33333333 33333333 33333333 33333333 33333333 33333333333333333333.......UUUUU 000080
55555555 55110000 00000011 55555555 55555555 55555555 55555555 55555555 UUUUUUUUUUUUUUUUUUUU.......UUUUU 0000A0
55555555 55110000 00000011 55555555 55555555 55555555 55555555 55555555 UUUUUUUUUUUUUUUUUUUU.......UUUUU 0000C0
55555555 55110000 00000011 55555555 55555555 55555555 55555555 55555555 UUUUUUUUUUUUUUUUUUUU.......UUUUU 0000E0
55555555 55110000 00000011 55555555 55555555 55555555 55555555 55555555 UUUUUUUUUUUUUUUUUUUU.......UUUUU 000100
55555555 55110000 00000011 55555555 55555555 55555555 55555555 55555555 UUUUUUUUUUUUUUUUUUUU.......UUUUU 000120
55555555 35110000 00000011 55555555 55555555 55555555 55555555 55555555 UUUUUUUUUUUUUUUUUUUU.......5UUUU 000140
55555555 15210000 00000011 53555555 55555555 55555555 55555555 55555555 UUUUUUUUUUUUUUUUUUUS......!.UUUU 000160
55555555 13010000 00000012 51555555 55555555 55555555 55555555 55555555 UUUUUUUUUUUUUUUUUUUQ........UUUU 000180
55555535 11020000 00000010 31555555 55555555 55555555 55555555 55555555 UUUUUUUUUUUUUUUUUUU1........5"UU 0001A0
55553511 11000000 00000020 11535555 55555555 55555555 55555555 55555555 UUUUUUUUUUUUUUUUUUS. ........5UU 0001C0
11111111 02000000 00000000 11115355 55555555 55555555 55555555 55555555 UUUUUUUUUUUUUUUUUUS.............. 0001E0

Dump of file SATURN:[PCCOMMON.DUMP.DLL]SA-PDLED.DLL;1 on 18-APR-1990 10:51:30.28
File ID (436,15,0)   End of file block 133 / Allocated 136

Virtual block number 119 (00000077), 512 (0200) bytes

11111102 00000000 00000000 20111111 11111111 11111111 11111111 11111111 ................... ............ 000000
00000000 00000000 00000000 00201111 11111111 11111111 11111111 11111111 ................... ............ 000020
00000000 00000000 00000000 00000000 00000000 00000000 00000000 00000000 ................................ 000040
00000000 00000000 00000000 00000000 00000000 00000000 00000000 00000000 ................................ 000060
00000000 00000000 00000000 00000000 00000000 00000000 00000000 00000000 ................................ 000080
00000000 00000000 00000000 00000000 00000000 00000000 00000000 00000000 ................................ 0000A0
00000000 00000000 00000000 00000000 00000000 00000000 00000000 00000000 ................................ 0000C0
00000000 00000000 00000000 00000000 00000000 00000000 00000000 00000000 ................................ 0000E0
00000000 00000000 00000000 00000000 00000000 00000000 00000000 00000000 ................................ 000100
00000000 00000000 00000000 00000000 00000000 00000000 00000000 00000000 ................................ 000120
00000000 00000000 00000000 00000000 00000000 00000000 00000000 00000000 ................................ 000140
00000000 00000000 00000000 00000000 00000000 00000000 00000000 00000000 ................................ 000160
00000000 00000000 00000000 00000000 00000000 00000000 00000000 00000000 ................................ 000180
0F0000E0 3F0000F8 00000000 00000000 00000000 00000000 00000000 00000000 .......................½..?À... 0001A0
070000C0 070000C0 070000C0 070000C0 070000C0 070000C0 070000C0 0F0000E0 à...à...à...à...à...à...à...à... 0001C0
070000C0 070000C0 070000C0 070000C0 070000C0 070000C0 070000C0 070000C0 à...à...à...à...à...à...à...à... 0001E0
```

```
Dump of file SATURN:[PCCOMMON.DUMP.DLL]SA-PDLED.DLL;1 on 18-APR-1990 10:51:30.28
File ID (436,15,0)   End of file block 133 / Allocated 136

Virtual block number 120 (00000078), 512 (0200) bytes

0F0000E0 070000C0 070000C0 070000C0 070000C0 070000C0 070000C0 070000C0 à...à...à...à...à...à...à...À... 000000
88888888 88080000 FFFFFFFF FFFFFFFF FFFFFFFF FFFFFFFF 3F0000F8 0F0000E0 À...½..?........................ 000020
11111111 11110800 00008811 11111111 11111111 11810800 00000088 88888888 ................................ 000040
11111111 11118100 00801111 11111111 11111111 11118100 00001811 11111111 ................................ 000060
11111111 11118100 00801111 11111111 11111111 11118100 00801111 11111111 ................................ 000080
11111111 11118100 00801111 11111111 11111111 11118100 00801111 11111111 ................................ 0000A0
11111111 11118100 00801111 11111111 11111111 11118100 00801111 11111111 ................................ 0000C0
11888881 88188100 00801181 11111811 11811811 88118100 00801111 18118111 ................................ 0000E0
11818811 88188100 00801188 18818811 11888881 88188100 00801188 11811811 ................................ 000100
11111811 81118100 00801188 88818818 11118811 81188100 00801188 88818818 ................................ 000120
11111111 11118100 00801111 11111111 11811111 18118100 00801181 18118811 ................................ 000140
11111111 11118100 00801111 11111111 11111111 11118100 00801111 11111111 ................................ 000160
11111111 11118100 00808181 81818181 81818181 81818100 00801111 11111111 ................................ 000180
11111111 11118100 00801111 11111111 11111111 11118100 00801111 11111111 ................................ 0001A0
11111111 11810800 00001811 11111111 11111111 11110800 00801111 11111111 ................................ 0001C0
00000000 00000000 00000088 88888888 88888888 88080000 00008811 11111111 ................................ 0001E0

Dump of file SATURN:[PCCOMMON.DUMP.DLL]SA-PDLED.DLL;1 on 18-APR-1990 10:51:30.28
File ID (436,15,0)   End of file block 133 / Allocated 136

Virtual block number 121 (00000079), 512 (0200) bytes

00000000 00000000 00000000 00000000 00000000 00000000 00000000 00000000 ................................ 000000
00000000 00000000 00000000 00000000 00000000 00000000 00000000 00000000 ................................ 000020
00000000 00000000 00000000 00000000 00000000 00000000 00000000 00000000 ................................ 000040
00000000 00000000 00000000 00000000 00000000 00000000 00000000 00000000 ................................ 000060
00000000 00000000 00000000 00000000 00000000 00000000 00000000 00000000 ................................ 000080
00000000 00000000 00000000 00000000 00000000 00000000 00000000 00000000 ................................ 0000A0
00000000 00000000 00000000 00000000 00000000 00000000 00000000 00000000 ................................ 0000C0
00000000 00000000 00000000 00000000 00000000 00000000 00000000 00000000 ................................ 0000E0
00000000 00000000 00000000 00000000 00000000 00000000 00000000 00000000 ................................ 000100
00000000 00000000 00000000 00000000 00000000 00000000 00000000 00000000 ................................ 000120
00000000 00000000 00000000 00000000 00000000 00000000 00000000 00000000 ................................ 000140
00000000 00000000 00000000 00000000 00000000 00000000 00000000 00000000 ................................ 000160
00000000 00000000 00000000 00000000 00000000 00000000 00000000 00000000 ................................ 000180
00000000 00000000 00000000 00000000 00000000 00000000 00000000 00000000 ................................ 0001A0
00000000 00000000 00000000 00000000 00000000 00000000 00000000 00000000 ................................ 0001C0
00000000 00000000 00000000 00000000 00000000 00000000 00000000 00000000 ................................ 0001E0

Dump of file SATURN:[PCCOMMON.DUMP.DLL]SA-PDLED.DLL;1 on 18-APR-1990 10:51:30.28
File ID (436,15,0)   End of file block 133 / Allocated 136

Virtual block number 122 (0000007A), 512 (0200) bytes

00000000 00000000 00000000 00000000 00000000 00000000 00000000 00000000 ................................ 000000
FF070000 000080FF 00000000 00000000 00000000 00000000 00000000 00000000 ................................ 000020
7F000000 000000F8 7F000000 000000F8 FF000000 000000FC FF010000 000000FE ±.......ø.......½.......½....... 000040
3F000000 000000F0 3F000000 000000F0 3F000000 000000F0 3F000000 000000F0 Þ......?Þ......?Þ......?Þ......? 000060
3F000000 000000F0 3F000000 000000F0 3F000000 000000F0 3F000000 000000F0 Þ......?Þ......?Þ......?Þ......? 000080
3F000000 000000F0 3F000000 000000F0 3F000000 000000F0 3F000000 000000F0 Þ......?Þ......?Þ......?Þ......? 0000A0
3F000000 000000F0 3F000000 000000F0 3F000000 000000F0 3F000000 000000F0 Þ......?Þ......?Þ......?Þ......? 0000C0
3F000000 000000F0 3F000000 000000F0 3F000000 000000F0 3F000000 000000F0 Þ......?Þ......?Þ......?Þ......? 0000E0
3F000000 000000F0 3F000000 000000F0 3F000000 000000F0 3F000000 000000F0 Þ......?Þ......?Þ......?Þ......? 000100
3F000000 000000F0 3F000000 000000F0 3F000000 000000F0 3F000000 000000F0 Þ......?Þ......?Þ......?Þ......? 000120
3F000000 000000F0 3F000000 000000F0 3F000000 000000F0 3F000000 000000F0 Þ......?Þ......?Þ......?Þ......? 000140
3F000000 000000F0 3F000000 000000F0 3F000000 000000F0 3F000000 000000F0 Þ......?Þ......?Þ......?Þ......? 000160
3F000000 000000F0 3F000000 000000F0 3F000000 000000F0 3F000000 000000F0 Þ......?Þ......?Þ......?Þ......? 000180
3F000000 000000F0 3F000000 000000F0 3F000000 000000F0 3F000000 000000F0 Þ......?Þ......?Þ......?Þ......? 0001A0
7F000000 000000F8 7F000000 000000F8 3F000000 000000F0 3F000000 000000F0 Þ......?Þ......?½.......½....... 0001C0
FFFFFFFF FFFFFFFF FF070000 000080FF FF010000 000000FE FF000000 000000FC ø.......±....................... 0001E0
```

```
Dump of file SATURN:[PCCOMMON.DUMP.DLL]SA-PDLED.DLL;1 on 18-APR-1990 10:51:30.28
File ID (436,15,0)   End of file block 133 / Allocated 136

Virtual block number 123 (0000007B), 512 (0200) bytes

 FFFFFFFF FFFFFFFF FFFFFFFF FFFFFFFF FFFFFFFF FFFFFFFF FFFFFFFF FFFFFFFF ................................ 000000
 00000000 00000000 FFFFFFFF FFFFFFFF FFFFFFFF FFFFFFFF FFFFFFFF FFFFFFFF ................................ 000020
 01010101 01010101 01010101 01010101 01010101 01010101 01010101 01010200 ................................ 000040
 02000000 00000000 00000000 00000000 00000002 01010101 01010101 01010101 ................................ 000060
 01010101 01010101 01010101 01010101 01010101 01010101 01010101 01010101 ................................ 000080
 01010000 00000000 00000000 00000000 00020101 01010101 01010101 01010101 ................................ 0000A0
 05050505 05050505 05050505 05050505 05050505 05050505 05050505 05030101 ................................ 0000C0
 01010200 00000000 00000000 00000000 01010101 03050505 05050505 05050505 ................................ 0000E0
 05050505 05050505 05050505 05050505 05050505 05050505 05050505 05050503 ................................ 000100
 03010100 00000000 00000000 00000002 01010305 05050505 05050505 05050505 ................................ 000120
 05050505 05050505 05050505 05050505 05050505 05050505 05050505 05050505 ................................ 000140
 05010102 00000000 00000000 00000001 01030505 05050505 05050505 05050505 ................................ 000160
 05050505 05050505 05050505 05050505 05050505 05050505 05050505 05050505 ................................ 000180
 05030101 00000000 00000000 00000201 01050505 05050505 05050505 05050505 ................................ 0001A0
 05050505 05050505 05050505 05050505 05050505 05050505 05050505 05050505 ................................ 0001C0
 05050101 00000000 00000000 00000101 03050505 05050505 05050505 05050505 ................................ 0001E0

Dump of file SATURN:[PCCOMMON.DUMP.DLL]SA-PDLED.DLL;1 on 18-APR-1990 10:51:30.28
File ID (436,15,0)   End of file block 133 / Allocated 136

Virtual block number 124 (0000007C), 512 (0200) bytes

 05050505 05050505 05050505 05050505 05050505 05050505 05050505 05050505 ................................ 000000
 05050101 00000000 00000000 00000101 05050505 05050505 05050505 05050505 ................................ 000020
 05050505 05050505 05050505 05050505 05050505 05050505 05050505 05050505 ................................ 000040
 05050101 00000000 00000000 00000101 05050505 05050505 05050505 05050505 ................................ 000060
 05050505 05050505 05050505 05050505 05050505 05050505 05050505 05050505 ................................ 000080
 05050101 00000000 00000000 00000101 05050505 05050505 05050505 05050505 ................................ 0000A0
 05050505 05050505 05050505 05050505 05050505 05050505 05050505 05050505 ................................ 0000C0
 05050101 00000000 00000000 00000101 05050505 05050505 05050505 05050505 ................................ 0000E0
 05050505 05050505 05050505 05050505 05050505 05050505 05050505 05050505 ................................ 000100
 05050101 00000000 00000000 00000101 05050505 05050505 05050505 05050505 ................................ 000120
 05050505 05050505 05050505 05050505 05050505 05050505 05050505 05050505 ................................ 000140
 05050101 00000000 00000000 00000101 05050505 05050505 05050505 05050505 ................................ 000160
 05050505 05050505 05050505 05050505 05050505 05050505 05050505 05050505 ................................ 000180
 05050101 00000000 00000000 00000101 05050505 05050505 05050505 05050505 ................................ 0001A0
 05050505 05050505 05050505 05050505 05050505 05050505 05050505 05050505 ................................ 0001C0
 05050101 00000000 00000000 00000101 05050505 05050505 05050505 05050505 ................................ 0001E0

Dump of file SATURN:[PCCOMMON.DUMP.DLL]SA-PDLED.DLL;1 on 18-APR-1990 10:51:30.28
File ID (436,15,0)   End of file block 133 / Allocated 136

Virtual block number 125 (0000007D), 512 (0200) bytes

 05050505 05050505 05050505 05050505 05050505 05050505 05050505 05050505 ................................ 000000
 05050101 00000000 00000000 00000101 05050505 05050505 05050505 05050505 ................................ 000020
 05050505 05050505 05050505 05050505 05050505 05050505 05050505 05050505 ................................ 000040
 05050101 00000000 00000000 00000101 05050505 05050505 05050505 05050505 ................................ 000060
 05050505 05050505 05050505 05050505 05050505 05050505 05050505 05050505 ................................ 000080
 05050101 00000000 00000000 00000101 05050505 05050505 05050505 05050505 ................................ 0000A0
 05050505 05050505 05050505 05050505 05050505 05050505 05050505 05050505 ................................ 0000C0
 05050101 00000000 00000000 00000101 05050505 05050505 05050505 05050505 ................................ 0000E0
 05050505 05050505 05050505 05050505 05050505 05050505 05050505 05050505 ................................ 000100
 05050101 00000000 00000000 00000101 05050505 05050505 05050505 05050505 ................................ 000120
 05050505 05050505 05050505 05050505 05050505 05050505 05050505 05050505 ................................ 000140
 05050101 00000000 00000000 00000101 05050505 05050505 05050505 05050505 ................................ 000160
 05050505 05050505 05050505 05050505 05050505 05050505 05050505 05050505 ................................ 000180
 05050101 00000000 00000000 00000101 05050505 05050505 05050505 05050505 ................................ 0001A0
 05050505 05050505 05050505 05050505 05050505 05050505 05050505 05050505 ................................ 0001C0
 05050101 00000000 00000000 00000101 05050505 05050505 05050505 05050505 ................................ 0001E0
```

```
Dump of file SATURN:[PCCOMMON.DUMP.DLL]SA-PDLED.DLL;1 on 18-APR-1990 10:51:30.28
File ID (436,15,0)   End of file block 133 / Allocated 136

Virtual block number 126 (0000007E), 512 (0200) bytes

05050505 05050505 05050505 05050505 05050505 05050505 05050505 05050505 ................................ 000000
05050101 00000000 00000000 00000101 05050505 05050505 05050505 05050505 ................................ 000020
05050200 05050505 05050505 05050505 05050505 05050505 05050505 05050505 ................................ 000040
05050101 00000000 00000000 00000101 05050505 05050505 05050502 00050505 ................................ 000060
05020005 05050505 05050505 05020000 02050505 02000002 05050505 05050505 ................................ 000080
05050101 00000000 00000000 00000101 05050505 05050505 05050200 05050505 ................................ 0000A0
05000005 05050505 05050505 02000000 00020502 00000000 02050505 05050505 ................................ 0000C0
05050101 00000000 00000000 00000101 05050505 05050505 05050000 05050505 ................................ 0000E0
02000205 05050505 05050505 00000000 00000500 00000000 00050505 05050505 ................................ 000100
05050101 00000000 00000000 00000101 05050505 05050505 05020002 05050505 ................................ 000120
00000205 05050505 05050505 00000000 00000500 00000000 00050505 05050505 ................................ 000140
05050101 00000000 00000000 00000101 05050505 05050505 05000002 05050505 ................................ 000160
00000102 05050505 05050505 02000000 00010502 00000000 01050505 05050505 ................................ 000180
05050101 00000000 00000000 00000101 05050505 05050505 02000001 02050502 ................................ 0001A0
00000000 02050505 05050505 05020100 00020505 02000000 02050505 05050505 ................................ 0001C0
05050101 00000000 00000000 00000101 05050505 05050505 01000000 00020501 ................................ 0001E0

Dump of file SATURN:[PCCOMMON.DUMP.DLL]SA-PDLED.DLL;1 on 18-APR-1990 10:51:30.28
File ID (436,15,0)   End of file block 133 / Allocated 136

Virtual block number 127 (0000007F), 512 (0200) bytes

00000000 00050505 05050505 05050200 00050505 05020000 05050505 05050505 ................................ 000000
05050101 00000000 00000000 00000101 05050505 05050505 00000000 00000500 ................................ 000020
00000000 00050505 05050505 05050200 02050505 05020002 05050505 05050505 ................................ 000040
05050101 00000000 00000000 00000101 05050505 05050505 00000000 00000500 ................................ 000060
00000000 02050505 05050505 05050000 05050505 05000005 05050505 05050505 ................................ 000080
05050101 00000000 00000000 00000101 05050505 05050505 02000000 00020502 ................................ 0000A0
02000002 05050505 05050505 05050002 05050505 05000205 05050505 05050505 ................................ 0000C0
05050101 00000000 00000000 00000101 05050505 05050505 05020000 02050505 ................................ 0000E0
05050505 05050505 05050505 05000205 05050505 00020505 05050505 05050505 ................................ 000100
05050101 00000000 00000000 00000101 05050505 05050505 05050505 05050505 ................................ 000120
05050505 05050505 05050505 05050505 05050505 05050505 05050505 05050505 ................................ 000140
05050101 00000000 00000000 00000101 05050505 05050505 05050505 05050505 ................................ 000160
05050505 05050505 05050505 05050505 05050505 05050505 05050505 05050505 ................................ 000180
05050101 00000000 00000000 00000101 05050505 05050505 05050505 05050505 ................................ 0001A0
05050505 05050505 05050505 05050505 05050505 05050505 05050505 05050505 ................................ 0001C0
05050101 00000000 00000000 00000101 05050505 05050505 05050505 05050505 ................................ 0001E0

Dump of file SATURN:[PCCOMMON.DUMP.DLL]SA-PDLED.DLL;1 on 18-APR-1990 10:51:30.28
File ID (436,15,0)   End of file block 133 / Allocated 136

Virtual block number 128 (00000080), 512 (0200) bytes

05050505 05050505 05050505 05050505 05050505 05050505 05050505 05050505 ................................ 000000
05050101 00000000 00000000 00000101 05050505 05050505 05050505 05050505 ................................ 000020
05050505 05050505 05050505 05050505 05050505 05050505 05050505 05050505 ................................ 000040
05050101 00000000 00000000 00000101 05050505 05050505 05050505 05050505 ................................ 000060
05050505 05050505 05050505 05050505 05050505 05050505 05050505 05050505 ................................ 000080
03030101 00000000 00000000 00000101 05050505 05050505 05050505 05050505 ................................ 0000A0
03030303 03030303 03030303 03030303 03030303 03030303 03030303 03030303 ................................ 0000C0
05050101 00000000 00000000 00000101 03030303 03030303 03030303 03030303 ................................ 0000E0
05050505 05050505 05050505 05050505 05050505 05050505 05050505 05050505 ................................ 000100
05050101 00000000 00000000 00000101 05050505 05050505 05050505 05050505 ................................ 000120
05050505 05050505 05050505 05050505 05050505 05050505 05050505 05050505 ................................ 000140
05050101 00000000 00000000 00000101 05050505 05050505 05050505 05050505 ................................ 000160
05050505 05050505 05050505 05050505 05050505 05050505 05050505 05050505 ................................ 000180
05050101 00000000 00000000 00000101 05050505 05050505 05050505 05050505 ................................ 0001A0
05050505 05050505 05050505 05050505 05050505 05050505 05050505 05050505 ................................ 0001C0
05050101 00000000 00000000 00000101 05050505 05050505 05050505 05050505 ................................ 0001E0
```

```
Dump of file SATURN:[PCCOMMON.DUMP.DLL]SA-PDLED.DLL;1 on 18-APR-1990 10:51:30.28
File ID (436,15,0)   End of file block 133 / Allocated 136

Virtual block number 129 (00000081), 512 (0200) bytes

05050505 05050505 05050505 05050505 05050505 05050505 05050505 05050505 ................................ 000000
05050101 00000000 00000000 00000101 05050505 05050505 05050505 05050505 ................................ 000020
05050505 05050505 05050505 05050505 05050505 05050505 05050505 05050505 ................................ 000040
05030101 00000000 00000000 00000101 05050505 05050505 05050505 05050505 ................................ 000060
05050505 05050505 05050505 05050505 05050505 05050505 05050505 05050505 ................................ 000080
05010102 00000000 00000000 00000101 03050505 05050505 05050505 05050505 ................................ 0000A0
05050505 05050505 05050505 05050505 05050505 05050505 05050505 05050505 ................................ 0000C0
03010100 00000000 00000000 00000201 01050505 05050505 05050505 05050505 ................................ 0000E0
05050505 05050505 05050505 05050505 05050505 05050505 05050505 05050505 ................................ 000100
01010200 00000000 00000000 00000001 01030505 05050505 05050505 05050505 ................................ 000120
05050505 05050505 05050505 05050505 05050505 05050505 05050505 05050503 ................................ 000140
01010000 00000000 00000000 00000002 01010305 05050505 05050505 05050505 ................................ 000160
05050505 05050505 05050505 05050505 05050505 05050505 05050505 05030101 ................................ 000180
02000000 00000000 00000000 00000000 01010101 03050505 05050505 05050505 ................................ 0001A0
01010101 01010101 01010101 01010101 01010101 01010101 01010101 01010101 ................................ 0001C0
00000000 00000000 00000000 00000000 00020101 01010101 01010101 01010101 ................................ 0001E0

Dump of file SATURN:[PCCOMMON.DUMP.DLL]SA-PDLED.DLL;1 on 18-APR-1990 10:51:30.28
File ID (436,15,0)   End of file block 133 / Allocated 136

Virtual block number 130 (00000082), 512 (0200) bytes

01010101 01010101 01010101 01010101 01010101 01010101 01010101 01010200 ................................ 000000
00000000 00000000 00000000 00000000 00000002 01010101 01010101 01010101 ................................ 000020
00000000 00000000 00000000 00000000 00000000 00000000 00000000 00000000 ................................ 000040
00000000 00000000 00000000 00000000 00000000 00000000 00000000 00000000 ................................ 000060
00000000 00000000 00000000 00000000 00000000 00000000 00000000 00000000 ................................ 000080
00000000 00000000 00000000 00000000 00000000 00000000 00000000 00000000 ................................ 0000A0
00000000 00000000 00000000 00000000 00000000 00000000 00000000 00000000 ................................ 0000C0
00000000 00000000 00000000 00000000 00000000 00000000 00000000 00000000 ................................ 0000E0
00000000 00000000 00000000 00000000 00000000 00000000 00000000 00000000 ................................ 000100
00000000 00000000 00000000 00000000 00000000 00000000 00000000 00000000 ................................ 000120
00000000 00000000 00000000 00000000 00000000 00000000 00000000 00000000 ................................ 000140
00000000 00000000 00000000 00000000 00000000 00000000 00000000 00000000 ................................ 000160
00000000 00000000 00000000 00000000 00000000 00000000 00000000 00000000 ................................ 000180
00000000 00000000 00000000 00000000 00000000 00000000 00000000 00000000 ................................ 0001A0
00000000 00000000 00000000 00000000 00000000 00000000 00000000 00000000 ................................ 0001C0
00000000 00000000 00000000 00000000 00000000 00000000 00000000 00000000 ................................ 0001E0

Dump of file SATURN:[PCCOMMON.DUMP.DLL]SA-PDLED.DLL;1 on 18-APR-1990 10:51:30.28
File ID (436,15,0)   End of file block 133 / Allocated 136

Virtual block number 131 (00000083), 512 (0200) bytes

00000000 00000000 00000000 00000000 00000000 00000000 00000000 00000000 ................................ 000000
00000000 00000000 00000000 00000000 00000000 00000000 00000000 00000000 ................................ 000020
00297365 74756269 72747441 28200E00 29736569 7469746E 4528200C 00010352 R.... (Entities).. (Attributes). 000040
00010001 00010001 00010001 00010001 00010001 00297364 6F687465 4D28200B . (Methods)..................... 000060
00010001 00010001 00010001 00010352 00000000 00000000 00000000 00010001 ................R............... 000080
70732065 62207473 75602065 6D616E65 6C69461B 00010001 00010001 00010001 .............Filename must be sp 0000A0
63657073 20656C69 6620676E 696E6570 6F20726F 7272451D 00646569 66696365 ecified..Error opening file spec 0000C0
00000065 6C62616C 69617661 20746579 20746F6E 20706C65 48170064 65696669 ified..Help not yet availcble... 0000E0
3A656C69 66206F74 20646574 656C706D 6F632074 726F7065 52204C44 501F0352 R..PDL Report completed to file: 000100
461E0064 656C6C65 636E6163 2074726F 70657220 4C445015 00545052 2E050020  ...RPT..PDL report cancell.' .F 000120
6F461600 6E6F6973 6E657478 65205450 522E2065 76616820 7473756D 20656C69 ile must have .RPT extension..Fo 000140
00010001 00010001 00010001 0074726F 70657220 4C445020 676E6974 74616072 rmatting PDL report............. 000160
00000000 FFFF0001 000E0352 000001CC 00000000 00000001 00010001 00010001 ................ä...R........... 000180
00000000 0120FFFF 01010050 015A009E 00461400 0290011C 00030001 00000008 ..............F...Z.P..... ..... 0001A0
00000000 0000FFFF FFFF0102 00080089 00440078 80010001 01240015 00050000 ......$.....x.D................. 0001C0
00060000 00000000 FFFFFFFF 01050008 01220033 00058001 0001013A 003F0005 ..?.:.......3.".................. 0001E0
```

```
Dump of file SATURN:[PCCOMMON.DUMP.DLL]SA-PDLED.DLL;1 on 18-APR-1990 10:51:30.28
File ID (436,15,0)   End of file block 133 / Allocated 136

Virtual block number 132 (00000084), 512 (0200) bytes

 003E0005 00000000 0000FFFF FFFF0106 00080025 0033012E 8002000C 017A0001 ..z.......3.X..................>. 000000
 01BB0001 00060000 00000000 FFFFFFFF 01030008 01220020 00058001 0001017C |....... ."...................E. 000020
 040001BD 00020003 00000000 0000FFFF FFFF0104 00080025 0020012E 8002000C ...... .X...................§... 000040
 80020000 01C00006 00030000 00000000 FFFFFFFF 0001000C 001C0008 00628002 ..b......................å..... 000060
 000A8002 010001C7 00040003 00000000 0000FFFF FFFF0002 000C0030 00080094 ....0..................ú.....Ö. 000080
 6E656D65 74617453 204D414C 00000003 0040414C FFFFFFFF 0107000C 00260008 ..&.........LAM.....LAM Statemen 0000A0
 20726562 6D756E20 64657463 65707865 20726574 6E450064 65726574 6E452074 t Entered.Enter expected number  0000C0
 72206562 206F7420 79746974 6E652066 6F207365 636E6572 72756363 6F20666F of occurrences of entity to be r 0000E0
 65626D75 6E206465 74636570 78652072 65746E45 0031003A 64657665 69727465 etrieved:.1.Enter expected numbe 000100
 6562206F 74207974 69746E65 20666F20 7365636E 65727275 63636F20 666F2072 r of occurrences of entity to be 000120
 00000000 00706C65 48006C65 636E6143 004B4F00 31003A64 656E6961 74657220  retained:.1.OK.Cancel.Help..... 000140
 004E9400 00900176 000A0001 00000008 00000000 FFFF0001 000E0352 000001CE ö...R...................v.....N. 000160
 00700008 80010001 0185000A 00050000 00000000 0181FFFF 012C007F 00080010 ..Ä..,........................p. 000180
 00400070 00488002 000C0190 00050006 00000000 0000FFFF FFFF012D 00080036 6...-.....................H.p.ä. 0001A0
 00080050 00640008 80010001 01960013 00050000 00000000 FFFFFFFF 012E0008 ..........................d.P... 0001C0
 01300008 00840064 00548001 000101AA 00000005 00000000 0000FFFF FFFF012F /................¯.....T.d.....0. 0001E0

Dump of file SATURN:[PCCOMMON.DUMP.DLL]SA-PDLED.DLL;1 on 18-APR-1990 10:51:30.28
File ID (436,15,0)   End of file block 133 / Allocated 136

Virtual block number 133 (00000085), 512 (0200) bytes

 FFFF0131 00080020 0058000C 80010001 01AB0005 00050000 00000000 FFFFFFFF ..............¨.......X. ...1... 000000
 FFFFFFFF 01320038 0058001C 000C8000 000001B1 00000007 00000000 0000FFFF ............Ÿ.........X.8.2..... 000020
 0000FFFF FFFF0133 00080040 00580074 80010001 01B2000B 00050000 00000000 ..........ý.....t.X.ª...3....... 000040
 00000000 FFFFFFFF 01340038 0058001C 00748000 000001BE 00000007 00000000 ........ƒ.....t...X.8.4......... 000060
 00000000 0000FFFF FFFF0001 000C0026 000C0028 80030400 01BF0002 00030000 ......¢.....(...&............... 000080
 00030000 00000000 FFFFFFFF 0002000C 0026000C 00588002 000001C2 00060003 ....ò.....X...&................. 0000A0
 74726F70 6552204C 4450FFFF FFFF0135 000C0026 000C0088 80020100 01C90004 ..è.........&...5.....PDL Report 0000C0
 69642074 6E657272 75430054 50522E2A 003A6560 616E2065 6C694600 00000300 .....File name:.*.RPT.Current di 0000E0
 4F000073 6569726F 74636572 69440000 73656C69 46000020 3A79726F 74636572 rectory: ..Files..Directories..O 000100
 00000000 00000000 00000000 00000000 00000070 6C654800 6C65636E 6143004B K.Cancel.Help................... 000120
 00000000 00000000 00000000 00000000 00000000 00000000 00000000 00000000 ................................ 000140
 00000000 00000000 00000000 00000000 00000000 00000000 00000000 00000000 ................................ 000160
 00000000 00000000 00000000 00000000 00000000 00000000 00000000 00000000 ................................ 000180
 00000000 00000000 00000000 00000000 00000000 00000000 00000000 00000000 ................................ 0001A0
 00000000 00000000 00000000 00000000 00000000 00000000 00000000 00000000 ................................ 0001C0
 00000000 00000000 00000000 00000000 00000000 00000000 00000000 00000000 ................................ 0001E0
```

Dump of file SATURN:[PCCOMMON.DUMP.DLL]TBE.TMP;1 on 18-APR-1990 10:53:12.46
File ID (929,12,0)   End of file block 62 / Allocated 64

Virtual block number 1 (00000001), 512 (0200) bytes

```
00000000 00000040 00000000 00000088 0000FFFF 00000004 0000003E 01305A4D MZ0.>............|.......a....... 000000
00000080 00000000 00000000 00000000 00000000 00000000 00000000 00000000 ................................ 000020
6F6E6E61 63206061 72676F72 70207369 685421CD 4C01B821 CD09B400 0EBA1F0E ..¤..Ç.ël¡.LëIThis program canno 000040
00000000 00000024 0A0D0D2E 65646F60 20534F44 206E6920 6E757220 65622074 t be run in DOS mode....$....... 000060
00060010 00000000 000C0000 00000000 000F8000 0352A4FB 002D0108 0505454E NE..Ä.-.«ÊR..................... 000080
00000000 00000000 00010001 00040000 00000285 01600161 00C400C0 00400015 ..a.á.á.a.m..................... 0000A0
04B20F00 04B201DE 039C0F00 039C01A2 031A0F00 03190169 12EA0F00 12EA002A *.õ...õ.í.......Å.......ß.ÿ...ÿ. 0000C0
017C0F00 017C02EF 0A500F00 0A500241 00620F00 00610239 00720F00 00720231 1.r...r.9.a...b.A.P...P.ÿ.|...|. 0000E0
00180F00 00180326 000C0F00 000C0315 00700F00 0070030C 00200F00 00200309 .. ... ...p...p...É...É.&....... 000100
005B1EB1 005B07B4 1CF00F21 1B160601 005C0E21 00000000 2D060F00 2D060329 )..-...-....!.\.....!.Þ.Ç.. Ÿ.[. 000120
51454254 11000152 54544154 49444554 45534542 540E0000 45425403 00070005 .....TBE...TBESETEDITATTR...ºEQ 000140
47454245 42540C00 03574152 44454254 0700024E 4F495449 444E4552 59524555 UERYRENDITION...TBEDRAW...TBEBEG 000160
52414854 45534542 54120005 52455453 49474552 4542540B 00045449 44454E49 INEDIT...TBEREGISTER...TBESETHAR 000180
52455551 45425415 00075449 4445444E 45454254 0A000645 444F4D59 504F4344 DCOPYMODE...TBEENDEDIT...TBEQUER 0001A0
00095245 54534947 45524E55 45425400 00085345 5459424E 49485447 4E454C59 YLENGTHINBYTES...TBEUNREGISTER.. 0001C0
44084950 474D5005 4E49574D 5005534C 4E030000 56001A00 11000B00 05000100 ...........V...NLS.PMWIN.PMGPI.D 0001E0
```

Dump of file SATURN:[PCCOMMON.DUMP.DLL]TBE.TMP;1 on 18-APR-1990 10:53:12.46
File ID (929,12,0)   End of file block 62 / Allocated 64

Virtual block number 2 (00000002), 512 (0200) bytes

```
5345444D 454D0E50 41454845 54414552 434D454D 004D454D 03534C4C 4143534F OSCALLS.MEM.MEMCREATEHEAP.MEMDES 000000
4C424545 52464D45 4D0C4B43 4F4C4243 4F4C4C41 4D454D00 50414548 594F5254 TROYHEAP.MEMALLOCBLOCK.MEMFREEBL 000020
03010200 00030801 44414552 534F4407 45544952 57534F44 084F4953 0348434F OCK.SIO.DOSWRITE.DOSREAD........ 000040
07010000 03060102 1F030201 00000309 01000003 07010000 03020100 00031141 A............................... 000060
00000000 00000000 00726F74 69644520 6B636F6C 42207478 65541100 00031003 ......Text Block Editor......... 000080
578B2607 8B26185E C4003FE9 03751A46 0818468B D88EFFFF 881E5657 00001AC8 à...WV.¡...Ä.F..F.u.Õ?.6^.&..&.W 0000A0
578B260C 478B2618 5EC40073 E903740A 57392600 7CE90374 08473926 185EC402 .6^.&9G.t.Õ|.&9W.t.Õs.6^.&.G.&.W 0000C0
880006E9 03740022 7E830053 E9037406 57392600 5CE90374 04473926 185EC40E .6^.&9G.t.Õ\.&9W.t.ÕS..~".t.Õ..¡ 0000E0
F04689F6 5689F446 8900008A 000088E8 5689E646 8926568B 24468801 07E987BF ¢.Õ...F$.V&.F|.VÕ|..¤...F¶.V-.Fþ 000100
00FE46C7 FC468924 478B26E6 5EC40000 FA46C7F8 46892247 8B26E65E C4F25689 .V·6^Ì&.G".F½úF*..6^Ì&.G$.F=úF±. 000120
F0468D00 00FFFF9A 1876FF1A 76FF5016 F0468D00 6A006A00 14E90005 1246C700 .úF...Õ..j.j..Fþ.P.v..v.......Fþ 000140
76FF1676 FF1276FF 1076FF0E 76FF0C76 FF0A76FF 0676FF08 76FFEE56 8CEC4689 .Fš.VŸ.v..v..v..v..v..v..v..v..v 000160
C483FFFF 01739A24 76FF2676 FF2276FF 1E76FF20 76FF1C76 FFEC76FF EE76FF14 ..vŸ.vš.v..v .v..v".v&.v$.s....6 000180
E903751A 46081846 88004FE9 037487B9 EA7E8100 0AE90375 00EA7E83 EA468922 ".Fõ.-õ.u.Õ...~õ¿.t.ÕO..F..F.u.Õ 0001A0
25E90374 0A573926 002EE903 74084739 26185EC4 02578826 07882618 5EC4003F ?.6^.&..&.W.6^.&9G.t.Õ..&9W.t.Õ% 0001C0
05E90374 06573926 000EE903 74044739 26185EC4 0E578826 0C478826 185EC400 .6^.&.G.&.W.6^.&9G.t.Õ..&9W.t.Õ. 0001E0
```

Dump of file SATURN:[PCCOMMON.DUMP.DLL]TBE.TMP;1 on 18-APR-1990 10:53:12.46
File ID (929,12,0)   End of file block 62 / Allocated 64

Virtual block number 3 (00000003), 512 (0200) bytes

```
C7D88E00 08881E56 57000170 C80022CA C95F5E1F 0000E9EA 46880000 EA46C700 .úFõ...FõÕ..._èò".àp..WV.¡...Äú 000000
88FEE286 892C4788 26FEB29E C4FEB496 89FEB286 8908568B 06468800 00FEBA86 .¤±...F..V...ý±..Ç±6.ý±&.G,..ã±¡ 000020
FEF28689 FFFFBAFF FFB8010A E90003E9 03740010 7E83FEA4 8689FEA6 86890000 ....Ì±..Ê±.~..t.Õ._ÕÕ.¡..¤....·± 000040
C7FEC286 89FEC486 89000088 FEB09689 FEAE8689 FEE69689 FEE48689 FEF49689 ..¶±..Õ±..Ì±..Ü±..¯±|....6±..ô±ú 000060
89164689 0E578826 0C478826 FE829EC4 0012E903 74184608 16468800 01FEA886 .´±...F..F.t.Õ..6.ý±&.G.&.W..F.. 000080
D110468B 10468904 C483025C 00469A0C 76FF0E76 FF0011E9 0374FF10 7E831856 V..~..t.Õ...v..v..F.\..6..F..F.Ì 0000A0
E9037500 003D0000 FFFF9A50 16FEA486 8DFEECB6 FF066AFE E2B6FFFE EC8689E0 Å..š±.Ñã±j..Ñš±..Ê±.P.....=..u.Õ 0000C0
C483027B 01AC9AFE A4B6FFFE A6B6FF0C 76FF0E76 FF1076FF 0A96E987 80B80006 ..|¯.Õ...v..v..v..ÑÌ±.ÑÊ±.¯.(..6 0000E0
08C483FF FF020A9A 5052FEA6 968BFEA4 86031046 88006A50 10462BFE EC86880A ...š±+F.Pj..F...Ê±..Ì±RP......6. 000100
0074E903 74684739 261E468B FE829EC4 0084E903 74664739 261C468B FE829EC4 6.ý±.F.&9Gft.Õ..6.ý±.F.&9Ght.Õt. 000120
0054E903 746C4739 2620468B FE829EC4 0064E903 746A4739 261A468B FE829EC4 6.ý±.F.&9Gjt.Õd.6.ý±.F &9Glt.ÕT. 000140
806837FF 260277FF 26FEB29E C404C483 FFFF0000 9A37FF26 0277FF26 FE829EC4 6.ý±&.w.&.7......6.6.ý±&.w.&.7h¯ 000160
B6FF01C2 6837FF26 0277FF26 FE829EC4 00000300 9A006A00 6AFEECB6 FF006A01 .j..Ñš±j.j......6.ý±&.w.&.7hõ..Ñ 000180
52002E05 FEB4968B FEB2868B 0060E900 00FFFF9A FEECB6FF 006AFEA4 B6FFFEA6 Ì±.ÑÊ±j..Ñš±.....Õ`...ý±..Ç±...R 0001A0
B6FFFEA6 B6FF1076 FFFEECB6 FF1276FF 1476FF1C 76FF1E76 FF2076FF 2276FF50 P.v".v .v..v..v..v..Ñš±.v..ÑÌ±.Ñ 0001C0
FEE2B6FF 0018E903 7500003D FEBA8689 1CC483FF FF00A89A 0676FF08 76FFFEA4 Ê±.v..v..´....6...¤±=..u.Õ...Ñã± 0001E0
```

```
Dump of file SATURN:[PCCOMMON.DUMP.DLL]TBE.TMP;1 on 18-APR-1990 10:53:12.46
File ID (929,12,0)   End of file block 62 / Allocated 64

Virtual block number 4 (00000004), 512 (0200) bytes

 5C470B26 5A478B26 FEB29EC4 096AE9FE BA868800 00FFFF9A FEA4B6FF FEA6B6FF .Ñ!±.ÑÉ±.......¤±Õj.6.ý±&.GZ&.G\ 000000
 245EC407 89260247 89260000 B8245EC4 0037E903 7526460B 24468800 66E90374 t.Õf..F$.F&u.Õ7.6^$¡..&.G.&..6^$ 000020
 26000088 245EC404 47892606 47892600 00B8245E C4084789 260A4789 26000088 ¡..&.G.&.G.6^$¡..&.G.&.G.6^$¡..& 000040
 FEA4B6FF FEA6B6FF FEE2B6FF 0011E903 75FEA686 0BFEA486 880C4789 260E4789 .G,&.G...Ê±..Ì±u.Õ...Ñã±.Ñ!±.ÑÉ± 000060
 76FF1E76 FF2076FF 5052002E 05FEB496 88FEB286 8B08F3E9 00008800 0003699A .i...¡..Õ¤...ý±..Ç±...RP.v .v..v 000080
 88FEB29E C40037E9 0001FEA8 86C7002E E90EC483 FFFF01F7 9A0676FF 0876FF1C ..v..v..¼....6.Õ..ú.´±..Õ7.6.ý±. 0000A0
 0012E900 15E90001 FEA886C7 0006E900 00FEA886 C70009E9 03771A47 39262046 F &9G.w.Õ..ú.´±..Õ..ú.´±..Õ..Õ.. 0000C0
 000A7E83 019AE903 7400FEA8 BE83FFC9 E9FFC3E9 0375C00B FFCAE903 7587B330 ±°.u.Õò..áu.Õú.Õè../´±.t.Õ...~.. 0000E0
 478B26FE B29EC400 0000B99A 1276FF14 76FF5016 F0468D00 6A006A01 91E90374 t.Õ..j.j..FÞ.P.v..v..¿...6.ý±&.G 000100
 A0868BFE A08689F0 462BF846 8B0039E9 0375FA56 3B0008E9 0374F846 3BD22B22 "+Ø;F½t.Õ..;V°u.Õ9..F½+FÞ...±... 000120
 F04603D2 2BF1F700 03B9D22B FEA0868B F25611F0 4601D22B F1F70003 B9D22BFE ±+Ø¿..¼b+Ø.FÞ.V·...±+Ø¿..¼b+Ø.FÞ 000140
 89F25613 F0460302 2BC103E0 D1E0D1C8 88204688 0019E9FA 5689F846 89F25613 .V·.F½.V°Õ...F .àiÁiÁ.ê+Ø.FÞ.V·. 000160
 880015E9 0375FE56 3B0008E9 0374FC46 3BD22B24 478B26FE B29EC4FA 5689F846 F½.V°6.ý±&.G$+Ø;F=t.Õ..;V±u.Õ... 000180
 00D28320 4603F656 8BF4468B 0012E9F6 5689F446 8900DA83 20462BFE 568BFC46 F=.V±+F .Õ..F¶.V-Õ...F¶.V-.F .Ø. 0001A0
 9689FEF2 86890000 FFFF9A16 76FF1876 FF0093E9 0374000A 7E83FE56 89FC4689 .F=.V±.-..t.Õ...v..v........´±.. 0001C0
 8BFE9A96 89FE9886 89F2568B F0468B00 0005BE9A 066A006A 1676FF18 76FFFEF4 ¶±.v..v.j.j../....FÞ.V·...±...±. 0001E0

Dump of file SATURN:[PCCOMMON.DUMP.DLL]TBE.TMP;1 on 18-APR-1990 10:53:12.46
File ID (929,12,0)   End of file block 62 / Allocated 64

Virtual block number 5 (00000005), 512 (0200) bytes

 94868900 DA83C128 E9D1204E 8BFE568B FC468BFE 929689FE 908689FA 568BF846 F½.V°...±...±.F=.V±.N ÌÕ+è.Õ.... 000000
 76FF0000 FFFF9A50 16FE9886 8D1676FF 1876FFFE 9E9689FE 9C8689FE 969689FE ±...±...±...±.v..v....±.P......v 000020
 FFFF9AFE F2B6FFFE F4B6FF16 76FF1876 FF0000FF FF9A5016 FE90868D 1676FF18 ..v....±.P......v..v..Ñ¶±.Ñ·±... 000040
 6AFE5689 FC468900 D2832046 03F6568B F4468B00 26E90375 26460824 46880000 ...F$.F&u.Õ&..F¶.V-.F .Ø..F=.V±j 000060
 7404647F 8326FEB2 9EC405D2 E9000004 759A5016 F0468D24 76FF2676 FF006A00 .j..v&.v$.FÞ.P.u...ÕØ.6.ý±&..d.t 000080
 6A006A16 76FF1876 FFFEB096 89FEAE86 890000FF FF9A1676 FF1876FF 0068E903 .Õh..v..v.........Û±..¯±.v..v.j.j 0000A0
 5A578B26 FEB29EC4 FEF89689 FEF68689 C02B5E57 8B26FEB2 9EC40000 FFFF9A03 ......6.ý±&.W^+á..-±..½±6.ý±&.WZ 0000C0
 76FF1876 FF0000FF FF9A5016 FEFE868D 1676FF18 76FFFEFC 9689FEFA 8689C02B +á..°±..•±.v..v...±±.P......v..v 0000E0
 109A5016 E8468D50 52003605 FEB4968B FEB2868B 0000FFFF 9A5016FE F6868D16 ...-±.P.......ý±..Ç±.6.RP.FÒ.P.. 000100
 03747FFE E4BE83FE E69689FE E4868900 00FFFF9A 1676FF18 76FF08C4 83021400 ....6..v..v........Õ±..Ì±./Õ±.t. 000120
 FEB2868B 7F6A006A 5016E846 8D1676FF 1876FF00 49E90375 00FEE6BE 83000AE9 Õ.../Ì±.u.ÕI..v..v..FÒ.Pj.j...ý± 000140
 86C70009 E9037500 FA830008 E9037400 02300000 FFFF9A50 52002E05 FEB4968B ..Ç±...RP.....=..t.Õ...°.u.Õ..ú. 000160
 D068006A 1676FF18 76FF0000 FFFF9A7F 6A006A16 76FF1876 FF04E1E9 87B7FEBA ¤±ñ.ÕÅ..v..v.j.j.......v..v.j.hÅ 000180
 02571326 07032612 5EC4D22B 1E478B26 FEB29EC4 0000FFFF 9A5016FF 08868D00 ......P.....6.ý±&.G.+Ø6^.&..&.W. 0001A0
 89F84689 000A831E 472B26FE B29EC40A 578B2608 478B2612 5EC4F256 89F04689 .FÞ.V·6^.&.G.&.W.6.ý±&+G..Õ..F½. 0001C0
 5EC4F656 89F44689 00D28320 470326FE B29EC406 578B2604 478B2612 5EC4FA56 V°6^.&.G.&.W.6.ý±&.G .Ø..F¶.V-6^ 0001E0

Dump of file SATURN:[PCCOMMON.DUMP.DLL]TBE.TMP;1 on 18-APR-1990 10:53:12.46
File ID (929,12,0)   End of file block 62 / Allocated 64

Virtual block number 6 (00000006), 512 (0200) bytes

 F2568BF0 468BFE56 89FC4689 00DA8320 472B26FE B29EC40E 578B260C 478B2612 .&.G.&.W.6.ý±&+G .Õ..F=.V±.FÞ.V· 000000
 037EFE56 39F6568B F4468B00 1BE90377 F8463900 08E9037E 0028E903 7DFA5639 9V°).Õ(.-.Õ..9F½w.Õ...F¶.V-9V±~. 000020
 D8468D00 6A006A04 0FE987BB FEBA86C7 0009E903 76FC4639 0008E903 7D0016E9 Õ..).Õ..9F=v.Õ..ú.¤±£.Õ..j.j..FÅ 000040
 006A00C8 E90066E9 03750000 7E3E8326 1A18068E 000005EF 9A5016F0 468D5016 .P.FÞ.P.ÿ.......&.>~..u.Õf.Õà.j. 000060
 50160846 8D1677FF 26006AFE B29EC400 0007C89A 5016F046 8D501608 468D006A j..FÅ.P.FÞ.P.à...6.ý±j.&.w..FÅ.P 000080
 26006AFE B29EC408 2B05829A 5016E046 8D1677FF 26006AFE B29EC408 1705829A .....6.ý±j.&.w..FÁ.P...+.6.ý±j.& 0000A0
 8105829A 5016E446 8D1877FF 26006AFE B29EC408 3F05829A 50160C46 8D1877FF .w..FÉ.P...?.6.ý±j.&.w..FÕ.P.... 0000C0
 468D016A 006A1676 FF1876FF FEBE9689 FEBC8689 0000FFFF 9A1676FF 1876FF06 ..v..v........¥±../±.v..v.j.j..F 0000E0
 1876FF00 20E90375 FEC4860B FEC2868B FEC49689 FEC28689 0000FFFF 9A501608 Å.P.......ô±..ó±..ô±..ó±u.Õ ..v. 000100
 BA86C700 09E90374 D00B0000 FFFF9A50 16FEBC86 8DFEC2B6 FFFEC4B6 FF1676FF .v..Ñá±.Ñô±..¥±.P......Åt.Õ..ú.¤ 000120
 2BFA568B F8468BFE B89689FE B6868902 578B2607 8B26FEB2 9EC40322 E9878BFE ±£.Õ".6.ý±&..&.W...Ñ±..¡±.F½.V°+ 000140
 2DF6561B F4462BFE 568BFC46 8BFED896 89FED686 8900DA83 00012DF2 561BF046 FÞ.V·-...Õ...ø±..Ä±.F=.V±+F¶.V-- 000160
 006A5016 FED6868D 01B268FE B6B6FFFE B8B6FFFE DC9689FE DA868900 DA830001 ...Õ...Õ±..É±.Ñ¡±.ÑÑ±hý...ø±.Pj. 000180
 EE868D01 C368FE86 B6FFFE88 B6FFFEEE 8689FEF0 86890000 88000009 299A006A j..)...¡....Þ±..Ý±.Ñ¡±.ÑÑ±hù...Ý 0001A0
 006A006A 006A006A 01BC68FE B686FFFE B8B6FF00 0009419A 1076FF00 6A5016FE ±.Pj..v..A....Ñ¡±.ÑÑ±h¥.j.j.j.j. 0001C0
 000009E2 9A5016FE E8868D50 1BFF0686 6B066AFE E2B6FFFF 06868900 000A769A .v........Ñã±j.k....P..Õ±.P.ã... 0001E0
```

```
Dump of file SATURN:[PCCOMMON.DUMP.DLL]TBE.TMP;1 on 18-APR-1990 10:53:12.46
File ID (929,12,0)   End of file block 62 / Allocated 64

Virtual block number 7 (00000007), 512 (0200) bytes

 8D1A76FF 5016FEC6 86805016 10468002 57E98780 FEBA86C7 0009E903 7500003D =..u.Õ..ú.¤±¯.ÕW..F..P..ó±.P.v.. 000000
 5016FF08 8680FEE8 B6FFFEEA 86FFFEA4 B6FFFEA6 B6FF5016 FF068680 5016F046 Fþ.P.....P.Ñ|±.ÑÉ±.Ñö±.ÑÒ±.....P 000020
 86FF003C E9037500 003D26C4 830A970C E39A1676 FF1876FF FEB686FF FE8886FF .Ñ¡±.ÑÑ±.v..v..D....ó&=..u.Õ<..Ñ 000040
 16FEE886 8D5018FF 06866806 6AFEE2B6 FF000003 E19AFEE8 B6FFFEEA B6FFFEE2 ã±.Ñö±.ÑÒ±.Ã....Ñã±j.k....P..Ò±. 000060
 0374000A 7E83FF77 E901D1E9 87B0FE8A 86C70009 E9037500 003D0000 02369A50 P.6...=..u.Õ..ú.¤±¯.Õ¡.Õw..~..t. 000080
 C09E6800 D0E90372 FEC08639 FF06868B FEC086FF 0004E900 00FEC086 C700EAE9 ÕŠ.ú.â±..Õ....â±....9.â±r.ÕÅ.k.ä 0000A0
 8B26FEE8 9EC418FE C0B66BFE F09689FE EE868902 508B2600 8B26FEE8 B6C418FE ±.óÑÒ±&..&.P...Ÿ±..Þ±kÑã±.á.Ò±&. 0000C0
 B6FF008F E90003E9 0374FEE0 860BFEDE 8688FEE0 9689FEDE 86890650 8B260440 ə.&.P...ß±..Å±..ß±..Å±t.Õ..Õ...Ñ 0000E0
 86C7FEAA 86890000 02EC9A50 16FEDE86 8D5016FE EE868001 C468FEB6 B6FFFEB8 |±.ÑÑ±há...Ÿ±.P..ß±.P.š.....`±ú. 000100
 FEAA8689 08C48300 FC11F79A FEA4B6FF FEA6B6FF FEAAB6FF FEACB6FF 0000FEAC ¯±...Ñ¯±.Ñ`±.Ñ|±.ÑÉ±.¾.•..ó...`± 000120
 1876FF00 2DE90377 00FEAABE 83000AE9 0376003C E9037300 FEACBE83 FEAC9689 ..¯±.ƒ¯±.s.Õ<.v.Õ...ƒ¯±.w.Õ-..v. 000140
 A686FFFE AAB6FFFE ACB6FF50 52000805 FEEA968B FEE88603 18FEC086 6B1676FF .v.k.â±...Ò±..õ±...RP.Ñ¯±.Ñ`±.Ñ| 000160
 16F0468D 5016FEC6 86805016 08468000 6A006AFF 1FE90000 FFFF9AFE A4B6FFFE ±.ÑÉ±.....Õ..j.j..FÄ.P..ó±.P.Fþ. 000180
 E9037400 003D0000 FFFF9A50 16FEC686 8D501608 468D006A 006A0000 FFFF9A50 P.....j.j..FÄ.P..ó±.P.....=..t.Õ 0001A0
 0B24468B 0000FEBA 86C70000 08C49A50 16084680 5016FEC6 8680006A 006A001A ..j.j...ó±.P.FÄ.P.ó...ú.¤±...F$. 0001C0
 8B26FEB2 9EC4FEC8 9619FEC6 86290228 401E4788 26FEB29E C40081E9 03752646 F&u.Õ..á.ý±&.G.ə+Ø).ó±..à±á.ý±&. 0001E0

Dump of file SATURN:[PCCOMMON.DUMP.DLL]TBE.TMP;1 on 18-APR-1990 10:53:12.46
File ID (929,12,0)   End of file block 62 / Allocated 64

Virtual block number 8 (00000008), 512 (0200) bytes

 05FED096 13FECE86 03D22B1E 478B26FE B29EC4FE CC9619FE CA862902 2B402047 G ə+Ø).ò±..ä±á.ý±&.G.+Ø..ö±..Å±. 000000
 C4FED496 11FED286 01D22B20 478B26FE B29EC4FE D09689FE CE868900 D2830004 ...Ø...ö±..Å±á.ý±&.G +Ø..Ø±..å±á 000020
 C6868D24 76FF2676 FF006A00 6AFED096 11FECE86 01605788 265E4788 26FEB29E .ý±&.G^&.W`..ö±..Å±j.j..v&.v$..ó 000040
 FEE4BE83 0036E903 75FFFEE6 BE83000A E90374FF FEE4BE83 000007ED 9A5016FE ±.P.Ù....ƒó±.t.Õ...ƒ|±.u.Õ6..ƒó± 000060
 F29AFEE4 B6FFFEE6 B6FF1676 FF1876FF 0022E903 7500FEE6 BE83000A E903747F .t.Õ...ƒ|±.u.Õ"..v..v..Ñ|±.Ñö±.· 000080
 FEB0BE83 000AE903 74FFFEAE BE830000 FFFF9A7F 6A006A16 76FF1876 FF000006 ....v..v.j.j......./Ù±.t.Õ...ƒ¯± 0000A0
 80B6FF16 76FF1876 FF000006 689A5016 FEFE868D 1676FF18 76FF0024 E90375FF .u.Õ$..v..v...±±.P.h....v..v..Ñ¯ 0000C0
 BEB6FF16 76FF1876 FF002CE9 0375FEC4 8608FEC2 86880000 06229AFE AEB6FFFE ±.ÑÜ±."......ó±..á±u.Õ,..v..v..Ñƒ 0000E0
 FF9AFEC2 B6FFFEC4 B6FF1676 FF1876FF 00000892 9A5016FE C2868DFE BCB6FFFE ±.Ñ¥±..ó±.P......v..v..Ñó±.Ñö±.. 000100
 0009CB9A FEA4B6FF FEA6B6FF FEE2B6FF 0011E903 75FEA686 0BFEA486 880000FF .....Ê±..Ì±u.Õ...Ñã±.Ñ|±.ÑÉ±.ù.. 000120
 4789261E 468BFEB2 9EC46647 89261C46 8BFEB29E C4002CE9 037400FE BABE8300 ..ƒ¤±.t.Õ,.á.ý±.F.&.Gfá.ý±.F.&.G 000140
 5E1F0000 E9FEBA86 886C4789 2620468B FEB29EC4 6A478926 1A468BFE B29EC468 há.ý±.F.&.Gjá.ý±.F &.Gl..¤±Õ...^ 000160
 C40847B8 261E5EC4 CC468907 88261A5E C4D88E01 7B881E56 5700004C C8C8C95F èùàL..WV.¡(..Áá^.&...Fää^.&.G.á 000180
 46896257 13266047 03260E5E C472578B 2670478B 260E5EC4 D0468907 2B261E5E ×.&+..FÁá^.&.Gp&.Wrá^.&.G`&.Wb.F 0001A0
 03740322 46F6FE56 89FC4689 00680646 9ACC76FF 006ABC76 FFBE76FF BE5689BC ¥.Vƒ.vƒ.v¥j..vä.F.h..F=.V±-F".t. 0001C0
 FC462806 571B2604 472B261E 5EC40E57 8B260C47 8B261E5E C4026A00 6A003FE9 Õ?.j.j.á^.&.G.&.W.á^.&+G.&.W.+F= 0001E0

Dump of file SATURN:[PCCOMMON.DUMP.DLL]TBE.TMP;1 on 18-APR-1990 10:53:12.46
File ID (929,12,0)   End of file block 62 / Allocated 64

Virtual block number 9 (00000009), 512 (0200) bytes

 E9CA7689 C84E89F2 18C82B0E 778B260C 4F8B261E 5EC40803 05AA9A50 52FE561B .V±RP.¯...á^.&.O.&.w.+à.·.Nà.vòÕ 000000
 89FE5613 FC460306 578B2604 478B261E 5EC4001A E9037401 3C032422 468A0037 7..F"$.<.t.Õ..á^.&.G.&.W..F=.V±. 000020
 C4CE4689 C8468BCA 5689C846 890E5788 260C4788 261E5EC4 0011E9CA 5689C846 Fà.VòÕ..á^.&.G.&.W..Fà.Vò.Fà.Föá 000040
 0A76FF0C 76FF7FFF 8446C780 01FA46C7 CA5619C8 46294E57 8B264C47 8B260E5E ^.&.GL&.WN)Fà.VòúF'..úFÇ...v..v. 000060
 46890000 0E509A00 6A006A00 6A006A01 BC680A76 FF0C76FF 04C4830E DD125D9A .].Ï..á..v..v.h¥.j.j.j.j..P....F 000080
 5EC4031E E90001B8 078926CC 46881A5E C4000FE9 03720739 26CC4688 1A5EC4CC ää^..Fä&9.r.Õ..á^..Fä&..¡..Õ..á^ 0000A0
 0C76FF02 49E90372 B64639CC 468B8646 FF0003E9 0000B646 C7078926 CC46881A ..Fä&..úFÑ..Õ...FÑ.Fä9FÑr.Õ¡..v. 0000C0
 0A76FF0C 76FFC656 89C44689 00000E6E 9A006A00 6AB676FF 006A018D 680A76FF .v.h§.j..vÑj.j..n....Fá.Vó.v..v. 0000E0
 8B1276C4 18865E68 C25689C0 46890000 0EC29A00 6A006AC4 76FFC676 FF01BF68 he..vó.váj.j..ô....Fâ.Vök^Ñ.áv.. 000100
 00000640 C7260440 8926C046 88125EC4 1886766B 02508926 008926C6 5688C446 Fá.Vó&..&.P.kvÑ.á^..Fâ&.ə.&úə... 000120
 16C0468D 5016C446 8D01C468 0A76FF0C 76FF01D8 E90003E9 0374C246 08C0468B .Fá.Föt.Õ..ÕÄ..v..v.há..Fá.P.Fá. 000140
 83098111 F79A1676 FF1876FF B876FFBA 76FF0000 BA46C788 46890000 09039A50 P......F|úF¤...v¤.v|.v..v..%.Ý.. 000160
 E9037600 33E90373 008A7E83 003CE903 74083C0C 2422468A BA56898B 468908C4 á..F|.V¤.F"$.<.t.Õ<..~¤.s.Õ3.v.Õ 000180
 8301B86E 830015E9 037420FF 78802616 5EC4B876 880025E9 03730088 7E830009 ...~|.s.Õ%..v|á^.&.x. t.Õ...n|.. 0001A0
 FF1876FF B876FFBA 76FF0676 FF0876FF FFC4E900 00C62616 76C4B85E 8B008A5E ^¤..^|áv.&ó..Õá..v..v..v¤.v|.v.. 0001C0
 E90373D3 3BDB2BD0 4E8BEC56 8BEA468B 0000FFFF 9A5016D2 4680056A 006A1676 v.j.j..FØ.P......Fõ.VŠ.NÅ+Ù;Æs.Õ 0001E0
```

```
Dump of file SATURN:[PCCOMMON.DUMP.DLL]TBE.TMP;1 on 18-APR-1990 10:53:12.46
File ID (929,12,0)   End of file block 62 / Allocated 64

Virtual block number 10 (0000000A), 512 (0200) bytes

 28E90374 0C2246F6 EC5689EA 4689C188 03880004 E90377C1 380007E9 03760010 ..v.Õ..;êw.Õ...Æ.è.Fõ.Vš-F".t.Õ+ 000000
 5EC41886 76680257 13260703 261E5EC4 D8D1EAD1 EC561BEA 46280228 D0468800 ..FÅ+@+Fõ.VšiõîÄá^.&..&.W.kvÑ.á^ 000020
 2608478B 261E5EC4 0023E903 74083C0C 2422468A 004EE90A 50892608 40892612 .&.ə.&.P.ÕN..F"$.<.t.Õ#.á^.&.G.& 000040
 88261E5E C4001FE9 0A508926 08408926 125EC418 86766BEC 561BEA46 280A5788 .W.+Fõ.VškvÑ.á^.&.ə.&.P.Õ..á^.&. 000060
 5EC41886 76680A50 89260840 8926125E C4188676 68000283 00010502 57882607 .&.W.....@.kvÑ.á^.&.ə.&.P.kvÑ.á^ 000080
 76680E50 89260C40 8926125E C4188676 6B165089 26144089 26CA5688 C8468812 ..Fà.Vò&.ə.&.P.kvÑ.á^.&.ə.&.P.kv 0000A0
 89261040 8926125E C4188676 6BEC5613 EA46030A 50882608 40882612 5EC41886 Ñ.á^.&.ə.&.P..Fõ.VškvÑ.á^.&.ə.&. 0000C0
 7CFA463B F2460308 40882612 5EC41886 7668CA56 19C84629 BE56888C 46881250 P..F¥.Vƒ)Fà.VòkvÑ.á^.&.ə..F·;F•| 0000E0
 84468800 03E9037F 84463808 40882612 5EC41886 7668FA46 89FA4688 0003E903 .Õ...F•.F•kvÑ.á^.&.ə.;FÇ..Õ...FÇ 000100
 8001FA7E 81004DE9 03747FFF B47E8100 A5E90375 26460824 4688FDA9 E9844689 .FÇÕ`».F$.F&u.ÕE..−Ç..t.ÕM..−•.. 000120
 07892624 5EC40A57 89260847 8926245E C4025788 26078826 1E5EC400 43E90374 t.ÕC.á^.&..&.W.á^$&.G.&.W.á^$&.. 000140
 47892624 5EC40E57 89260C47 8926245E C40E5788 260C4788 261E5EC4 02578926 &.W.á^.&.G.&.W.á^$&.G.&.W.á^$&.G 000160
 47892624 5EC499FA 46880257 89260789 26245EC4 99844688 004EE906 57892604 .&.W.ÕN..FÇ.á^$&..&.W..F•.á^$&.G 000180
 4728260E 5EC4CA56 88C8468B 0E578926 0C478926 245EC499 CE468B0A 57892608 .&.W..Fõ.á^$&.G.&.W..Fà.Vòá^.&+G 0001A0
 C95F5E1F 0000E900 00880657 89260447 8926245E C48E5613 8C460352 57182650 P&.WR.F¥.Vƒá^$&.G.&.W.|..Õ...^_è 0001C0
 E9037400 0A7E83C6 5689C446 890E5688 0C4688D8 8E0CEB88 1E565700 003CC8CB ùà<..WV.|Š..Ä.F..V..Fá.Vó.~..t.Õ 0001E0
```

```
Dump of file SATURN:[PCCOMMON.DUMP.DLL]TBE.TMP;1 on 18-APR-1990 10:53:12.46
File ID (929,12,0)   End of file block 62 / Allocated 64

Virtual block number 11 (0000000B), 512 (0200) bytes

 C4830D32 00109A50 16D0468D 0042681E 0080E900 00880002 07C72606 5EC4000E ..á^.&ú...|..Õ...h8..FÅ.P...2..á 000000
 5016C846 8D004FE9 000007C7 26065EC4 000BE903 7500007E 3E83261A 18068E08 .....&.>~..u.Õ..á^.&ú...ÕO..Fà.P 000020
 C45EC400 25E90374 87823D0E C483040A 01F79A0C 76FF0E76 FF006A00 6A0A76FF .v.j.j..v..v..%....á.=ý.t.Õ%.á^á 000040
 E9000007 C726065E C40008E9 000107C7 26065EC4 000BE903 771A4739 260A4688 .F.&9G.w.Õ..á^.&ú...Õ..á^.&ú...Õ 000060
 49881E56 57000000 C8000ACA C95F5E1F 0000E900 00880000 07C72606 5EC40008 ..á^.&ú...|..Õ...^_èò..à...WV.|I 000080
 065EC40A 76880035 E9037700 0A7E8300 09E90376 0043E903 73000C7E 83088E11 ..Ä.~..s.ÕC.v.Õ...~..w.Õ5..v.á^. 0000A0
 5E83010A 6E830015 E903740A FF788026 065EC40A 76880010 E9037500 FF788026 &.x..u.Õ...v.á^.&.x..t.Õ...n...^ 0000C0
 0010C8CB C95F5E1F 0000E90C 56880A46 88FF84E9 0000C626 0676C40A 5E88000C ...^.áv.&á..ÕÇ..F..V.Õ...^_èùà.. 0000E0
 76FFFE76 FF018F68 0676FF08 76FFFC46 89FE4689 00008808 8E11FF88 1E565700 .WV.|...Ä|...F±.F=.v..v.h¢..v±.v 000100
 8D5016F0 468D0183 680676FF 0876FF00 54E90374 D0080000 12A59A00 6A006AFC =j.j..E....Åt.ÕT..v..v.h*..Fþ.P. 000120
 0003E903 7364F07E 830009E9 037E0011 E9037D00 F27E8300 0012DE9A 5016F846 F½.P.B....~·.}.Õ..~.Õ...~þds.Õ.. 000140
 0DFA9A00 6A006A50 16F0468D 01826806 76FF0876 FF00F256 8305F046 830022E9 Õ"..Fþ..V·..v..v.hý..Fþ.Pj.j..*. 000160
 054D0103 00000003 11800002 00000001 0DE30002 001FCBC9 5F5E1FFF 80E90000 ..Õ...^_èù....Ð.......¯.......M. 000180
 05A80103 00800003 059A0103 00000004 03480002 00750003 05360103 00740003 ..t...6...u...K...............¨. 0001A0
 08160103 009A0003 06CA0103 00A10002 08320103 0000000A 02CE0002 00810003 ......ö.......2...À...ò......... 0001C0
 08020103 009F0003 07080103 00000000 117C0002 00980003 0C0E0103 00A30002 ..È...........|................. 0001E0
```

```
Dump of file SATURN:[PCCOMMON.DUMP.DLL]TBE.TMP;1 on 18-APR-1990 10:53:12.46
File ID (929,12,0)   End of file block 62 / Allocated 64

Virtual block number 12 (0000000C), 512 (0200) bytes

 068D0103 00A80003 08FF0103 00A40003 0F4C0103 0000000F 12650002 00A70002 ..I...e.......L...E.......´..... 000000
 060B0103 00820003 0C460103 00AB0003 06570103 00AA0003 0C330103 00A90003 ..`...3...¯...W...¨...F...ý..... 000020
 08640103 00380005 095C0203 00850003 0AE60103 00300002 12860103 00830003 ..°.......=...Ì...ç...\...;...d. 000040
 08480103 000A0003 0C6C0103 00490005 0C900203 00D20003 0C7F0103 00000003 ..Å.......@.......I...l...Õ...H. 000060
 88264688 D88EFFFF 881E5657 00004AC8 00000000 00000000 00000000 00080003 ..Ü.............àJ..WV.|...Ä.F&. 000080
 FF268A5E C401EDE9 878C8800 06E90375 001C7F83 268A5EC4 BC56898A 46892856 V(.F¤.V¥á^¤&....u.Õ..|¥.ÕÜ.á^¤&. 0000A0
 08478926 0C5680A 4688C45E C4C65689 C4468900 00FFFF9A 006A0477 FF260677 w.&.w.j.......Fá.Vóá^á.F..V.&.G. 0000C0
 006A0182 688676FF 8876FF88 56898646 8906578B 2604478B 268A5EC4 0A578926 &.W.á^¤&.G.&.W..FÑ.V|.v|.vÑhý.j. 0000E0
 FF26185E C437FF26 185EC400 6A006A86 76FF8876 FF000001 2C9A046A 006A006A j.j.j.,.....v|.vÑj.j.á^.&.7á^.&. 000100
 88261 85E C4006A00 6A006A00 6A8676FF 8876FF00 0000CD9A 026A006A 006A0477 w.j.j.j..ë....v|.vÑj.j.j.j.á^.&. 000120
 00FFFF9A 016A5040 04472826 185EC40C 47882618 5EC45040 07282618 5EC40847 G.á^.&+.əPá^.&.G.á^.&+G.əPj..... 000140
 0E76FF50 16C8468D 04C483FF FF00009A 8676FF88 76FF8E46 89C04689 00008800 .|...Fá.Fƒ.v|.vÑ......á..'Å.P.v. 000160
 037500C2 7E83C246 8910C483 FFFF0000 9A2676FF 2876FF14 76FF1276 FF1076FF .v..v..v..v(.v&......á..Fõ ·õ.u. 000180
 00000145 9A006A00 6A5016C8 468D01D1 688676FF 8876FF00 FFE9C246 880006E9 Õ...FõÕ...v|.vÑh1..Fà.Pj.j..ε.... 0001A0
 688676FF 8876FF00 00015C9A 1C76FF00 6A1E76FF 2076FF01 C2688676 FF8876FF _v|.vÑhõ..v .v.j..v..\....v|.vÑh 0001C0
 6A006A00 6A006A01 CF688676 FF8876FF 00000172 9A006A00 6A1C76FF 006A0180 ¯.j..v.j.j..r....v|.vÑhü.j.j.j.j 0001E0
```

Dump of file SATURN:[PCCOMMON.DUMP.DLL]TBE.TMP;1 on 18-APR-1990 10:53:12.46
File ID (929,12,0)   End of file block 62 / Allocated 64

Virtual block number 13 (0000000D), 512 (0200) bytes

8E468D01 C3688676 FF8876FF 04C483FF FF125D9A B676FF88 76FF0000 01A49A00 ..Ê....v¡.vÑ.}....á..v¡.vÑhû..Ff 000000
03750846 0B06468B 0000FFFF 9A50006A 04C483FF FF00469A 1E76FF20 76FF5016 .P.v .v..F....á.j.P......F..F.u. 000020
FF2476FF B676FFB8 76FF0000 FFFF9A00 6A2276FF 2476FFB6 76FFB876 FF0000E9 Õ...v¡.vÑ.v$.v"j.......v¡.vÑ.v$. 000040
C40000FF FF9A006A 016A006A 0000FFFF 9A016AB6 76FFB876 FF0000FF FF9A2276 v"......v¡.vÑj......j.j.j......á 000060
1C47C726 BA5EC400 00FFFF9A B676FFB8 76FF016A 006A0A57 89260847 89268A5E ^¤&.G.&.W.j.j..v¡.vÑ.....á^¤&úG. 000080
568B0E46 8BD88E00 08881E56 5700000A C80024CA C95F5E1F 0000E900 00B80001 ..¡..Õ...^_èõ$.à...WV.¡...Ä.F..V 0000A0
0C4608OA 468800C9 E987BD88 0006E903 74001C7F 8326F85E C4FA5689 F8468910 ..F½.V*á^½Ξ....t.Õ..¡§.Õè..F..F. 0000C0
FF01A89A 0477FF26 0677FF26 F85EC40A 76FF0C76 FF37FF26 065EC400 89E90375 u.Õ..á^.&.7.v..v.á^½&.w.&.w..´.. 0000E0
E90372FC 4639F646 88FC46FF 0003E900 00FE46C7 0000FC46 C7F64689 0AC483FF ..á..F-úF=..úF±..Õ...F=.F-9F=r.Õ 000100
0003E903 740A3880 260A76C4 FC5E8800 0FE90375 00388026 0A76C4FC 5E880039 9..^=áv.&.8.u.Õ...^=áv.&.8.t.Õ.. 000120
76C4FE5E 8BFFB9E9 0088260A 76C4FE46 FFFE5E88 008A260A 76C4FC5E 8BFFD1E9 Õ¹..^=áv.&...^±.F±áv.&..Õ¿..^±áv 000140
02059A08 77FF260A 77FF26F8 5EC4016A 006A0789 26FE468B 065EC400 00C6260A .&õ..á^..F±&..j.j.á^½&.w.&.w.... 000160
00008800 001C47C7 26F85EC4 000001E0 9A006A04 77FF2606 77FF26F8 5EC40000 ..á^½&.w.&.w.j..À...á^½&úG...¡.. 000180
04026F00 02000000 03010200 02000000 01017F00 02000E0C CAC95F5E 1F0000E9 Õ...^_èõ......................o.. 0001A0
0201D301 03001700 0201C201 03000000 02030001 03000800 02009901 03000000 ........................ò.......Ε.. 0001C0
0F022700 02000000 00019800 02001F00 02003901 03000000 0A00E300 02001800 .....D.......9................'.. 0001E0

Dump of file SATURN:[PCCOMMON.DUMP.DLL]TBE.TMP;1 on 18-APR-1990 10:53:12.46
File ID (929,12,0)   End of file block 62 / Allocated 64

Virtual block number 14 (0000000E), 512 (0200) bytes 00000000 00004E00 0201EB01 03004D00 0202EE01 03003D00 02007701 03000000 .....N...=...Y...M...Š...N...... 000000
5EC408C4 83003E02 0A9A1276 FF1476FF 006A386A D88EFFFF 881E5657 000006C8 à...WV.¡...Äj8j..v..v....>..á.á^ 000020
00580010 9A505200 08051456 8812468B 0048681E 005AE90A 468B0038 07C72612 .&ú.8..F.ÕZ..hH..F..V....^P...X. 000040
0040E908 C4830072 00109A50 52000805 14568812 46880050 681E005A E908C483 .á.ÕZ..hP..F..V....RP...r..á.Õ∂. 000060
0172E987 86880026 E908C483 FFFF0010 9A505200 08051456 8812468B 0058681E .hX..F..V....RP......á.Õ&.¡ ´Õr. 000080
FFDAE9FF 8FE90375 00023DFF 81E90375 00013DFF D3E90375 C00B001A E9001DE9 Õ..Õ...áu.Õ€.=..u.ÕŸ.=..u.Õ..ÕÕ. 0000A0
4F832612 5EC40008 E9037502 0C46F620 024F8326 125EC400 08E90375 010C46F6 ~F..u.Õ..á^.&.O. ~F..u.Õ..á^.&.O 0000C0
26125EC4 0008E903 75080C46 F610024F 8326125E C40008E9 0375040C 46F60102 ..~F..u.Õ..á^.&.O..~F..u.Õ..á^.& 0000E0
E9037400 007E3E83 261A1C06 8E2A4789 26125EC4 0004A126 1A1A068E 02024F83 .O......&À..á^.&.G*....&.>~..t.Õ 000100
890EC483 017701F7 9A0676FF 0876FF0A 76FF0C76 FF0E76FF 1276FF14 76FF0043 C..v..v..v..v..v..v..v..%.w..á.. 000120
8B0006E9 037587B3 FA7E8100 10E90375 87B2FA7E 810014E9 037500FA 7E83FA46 F*.~*.u.Õ...~*ý.u.Õ...~**.u.Õ... 000140
468D0000 2E47C726 2C478926 0E468812 5EC40004 3647C726 125EC400 ADE9FA46 F*ÕÙ.á^.&úG6..á^..F.&.G,&úG....F 000160
7400013D 0CC483FF FF03219A 0676FF08 76FF5052 00080514 568B1246 885016FC =.P.F..V....RP.v..v..¦....á.=..t 000180
D1E001DA 8BC88B2E 578B262C 478B2612 5EC4066A 006A0068 E987B6B8 0006E903 .Õ..¡Ñ.Õh.j.j.á^.&.G,&.W..à.ÕiÀî 0001A0
8B26125E C4325789 26304789 26125EC4 001905AA 9A5052D3 13C103D2 D1E001D2 ●ïÀï●.ê.ÆRP.¯...á^.&.GO&.W2á^.&. 0001C0
03B80000 BA0006E9 03720003 3D0008E9 037D0013 E9037E00 FA833257 8B263047 GO&.W2.*.-.Õ..).Õ..=..r.Õ..¤..¡. 0001E0

Dump of file SATURN:[PCCOMMON.DUMP.DLL]TBE.TMP;1 on 18-APR-1990 10:53:12.46
File ID (929,12,0)   End of file block 62 / Allocated 64

Virtual block number 15 (0000000F), 512 (0200) bytes

08881E56 5700000C C8C8C95F 5E1F0000 E9000088 32578926 30478926 125EC400 .á^.&.GO&.W2¡..Õ...^_èùà...WV.¡. 000000
FF505200 08051256 8810468B 5016FA46 8DF65689 F4468908 56880646 8BD88E00 ..Ä.F..V..F¶.V~.F*.P.F..V....RP. 000020
8B26FA5E C400E1E9 87B6B800 06E90374 0001300C C483011A 03219AF4 76FFF676 v~.v¶.!....á.=..t.Õ..¡Ñ.ÕÄ.á^*&. 000040
39260E46 88F45EC4 001DE903 77064739 260E468B 225FC426 FA5EC4F8 46892047 G .F½á^*&á_".F.&9G.W.Õ..á^¶.F.&9 000060
FF0003E9 FE468948 F8468800 A7E987B2 880045E9 0000FE46 C70008E9 03761A47 G.v.Õ..úF±¯.ÕE.¡ý.ÕI..F½H.F±Õ... 000080
E9037606 4039260E 46882274 C426FA76 C40EFE5E 68008BE9 037300FE 7E83FE4E N±.~±.s.Õ..k^±.áv*&át".F.&9∂.v.Õ 0000A0
26225FC4 26FA5EC4 0EFE7668 0068E987 83880006 E90374FE 463848F8 46880071 q..F½H;F±t.Õ..¡*.Õh.kv±.á^*&á_"& 0000C0
0A408826 2274C426 FA76C40E FE5E6806 57892604 47892610 5EC40250 88260088 ..&.P.á^.&.G.&.W.k^±.áv*&át"&¯∂. 0000E0
88260640 88262274 C426FA76 C40EFE5E 68325789 26304789 26105EC4 0C508826 &.P.á^.&.GO&.W2k^±.áv*&át"&.∂.&. 000100
C95F5E1F 0000E900 008BFF69 E90009E9 0000882E 5789262C 47892610 5EC40850 P.á^.&.G,&.W.¡..Õ..Õi.¡..Õ...^_è 000120
5EC4FC56 89FA4689 2A578826 28478826 065EC4D8 8E01FF88 1E565700 0006C8C8 ùà...WV.¡...Äá^.&.G(&.W*.F*.V=ã^ 000140
76FF0C76 FF0035E9 037700FE 7E8326FA 4683FE4E FF0007E9 FE468926 478B2606 .&.G&.F±Õ...N±.F*&.~±.W.Õ5..v..v 000160
FC5688FA 46880E5E C40016E9 03740000 3D08C483 01AE0166 9AFA76FF FC76FF0A ..v=.v*.f.Û..á.=..t.Õ..á^..F*.V= 000180
00020003 90CBC95F 5E1F0000 E90001B8 FFBBE900 09E90000 88025789 26078926 &..&.W.¡..Õ..ÕE.¡..Õ...^_èù..... 0001A0
00000000 00000000 00000000 000F0329 00020000 0000036A 00020000 00030228 (........j........)............... 0001C0
6A006A0A 6AFF6A02 6A006AFC 4689FE46 89000088 D88EFFFF 881E5657 000004C8 à...WV.¡...Ä¡...F±.F=j.j.j.j.j.j 0001E0

```
Dump of file SATURN:[PCCOMMON.DUMP.DLL]TBE.TMP;1 on 18-APR-1990 10:53:12.46
File ID (929,12,0)   End of file block 62 / Allocated 64

Virtual block number 16 (00000010), 512 (0200) bytes

 006A006A 006A006A 029A6803 6A006A01 6A006A00 6A006A00 6A006A11 6A006A00 .j.j.j.j.j.j.j.j.j.j.h..j.j.j.j. 000000
 FFFE76FF 0047E987 88880006 E90374FE 460BFC46 88FE5689 FC468900 00FFFF9A ......F•.V±.F•.F±t.Õ..||.ÕG..v±. 000020
 006A006A 006A006A FC76FFFE 76FF0000 FFFF9A00 6A006A01 6A006A01 C168FC76 v•hè.j.j.j.j.......v±.v•j.j.j.j. 000040
 0000B802 57892607 8926FE56 8BFC468B 0E5EC400 00FFFF9A 016A0A76 FF0676FF .v..v.j......á^..F•.V±&..&.W.|.. 000060
 06468BF2 4689F446 89000088 D88E0008 B81E5657 000016C8 CBC95F5E 1F0000E9 Õ...^_èùà...WV.|...Ä|...F¶.F·.F. 000080
 9AEA76FF EC76FFEC 5689EA46 89025788 26078826 EE5EC4F0 5689EE46 89085688 .V..FŸ.VÞá^Ÿ&..&.W..Fõ.VŠ.vš.võ. 0000A0
 9A0676FF 0876FF16 76FF1876 FF1A76FF 1C76FF1E 76FF2076 FF04C483 FFFF0000 .....á..v .v..v..v..v..v..v..v.. 0000C0
 26084788 26125EC4 0088E9F6 46880006 E9037500 0030F646 8910C483 FFFF0000 .....á..F-=..u.Õ...F-Õ..á^.&.G.& 0000E0
 0C478826 125EC4FA 5689F846 8900D283 00010502 57182607 2B26125E C40A5788 .W.á^.&+.&.W.....•..F½.V•á^.&.G. 000100
 006A01B0 68EA76FF EC76FFFE 5689FC46 89065718 2604472B 26125EC4 0E578826 &.W.á^.&+G.&.W..F•.V±.vš.võh¯.j. 000120
 1076FF00 6A0A76FF 0C76FF01 C268EA76 FFEC76FF 00000181 9A006A00 6A1076FF .v.j.j.......vš.võhõ..v..v.j..v. 000140
 0000B800 00006E9A 006A006A 1E76FF20 76FF0101 68EA76FF EC76FF00 0001999A ......vš.võh|..v_.v.j.j..n...|.. 000160
 B80000FE 46C7FC46 890E4688 D88E0080 B81E5657 00000AC8 CBC95F5E 1F0000E9 Õ...^_èùà...WV.|¯..Ä.F..F·úF±..| 000180
 0001F59A 0E76FF00 6A0A76FF 0C76FF01 C2680676 FF0876FF F64689F8 46890000 ...F½.F-.v..v.hõ..v..v.j.....%.. 0001A0
 E9FA4688 FA468900 0001689A 5016FC46 805016F6 468D01C4 680676FF 0876FF00 ..v..v.há..F-.P.F•.P.h....F·.F•Õ 0001C0
 0000FFFF 9A006A10 76FF1276 FFD88E01 B0881E56 57000004 C8CBC95F 5E1F0000 ...^_èùà...WV.|¯..Ä.v..v.j...... 0001E0

Dump of file SATURN:[PCCOMMON.DUMP.DLL]TBE.TMP;1 on 18-APR-1990 10:53:12.46
File ID (929,12,0)   End of file block 62 / Allocated 64

Virtual block number 17 (00000011), 512 (0200) bytes

 74400A46 F6002BE9 0375200A 46F600A0 E9084688 0108E90E 4688FE56 89FC4689 .F•.V±.F.Õ...F.Õ..-F. u.Õ+.-F.ət 000000
 0000BA00 01B80000 01DD9A00 6A006A00 6A006A01 CE681076 FF1276FF 0016E903 .Õ...v...v.hö.j.j.j.j..Ī...|..¤.. 000020
 FF26FC5E C40676FF 0876FF0A 76FF0C76 FF0E76FF 1076FF12 76FF001E E900E7E9 ÕÕ.Õ...v..v..v..v..v..v..v.á^•&. 000040
 03039A00 6A006A00 6A006A12 59680877 FF260A77 FF26FC5E C4005EE9 00C6E91F .Õ6.Õ^.á^•&.w.&.w.hY.j.j.j.j.... 000060
 0876FF0A 76FF0C76 FF0E76FF 1076FF12 76FF0037 E9009FE9 00008A00 01B80000 ..|..¤..Õ..Õ7..v..v..v..v..v..v. 000080
 E9037500 0F30FF58 E9037500 05300013 E90016E9 007EE91F FF26FC5E C40676FF .v.á^•&..Õ~.Õ..Õ..=..u.ÕX.=..u.Õ 0000A0
 FF0876FF 0A76FF0C 76FF0E76 FF0877FF 260A77FF 26FC5EC4 0062E9FF C9E9FFA5 Ē.Õè.Õb.á^•&.w.&.w..v..v..v..v.. 0000C0
 FF0C76FF 0E76FF10 76FF1276 FF0037E9 003AE900 008A0001 B80000FF FF9A0676 v......|..¤..Õ:.Õ7..v..v..v..v.. 0000E0
 30FFA9E9 03750075 300013E9 0016E900 19E91FFF 26FC5EC4 0676FF08 76FF0A76 v..v..v.á^•&..Õ..Õ..Õ..=u.u.Õ`.= 000100
 0676FFD8 8E020FB8 1E565700 0008C800 0ECAC95F 5E1FFFC9 E9FEE5E9 0375007A z.u.Õl±Õè..^_èò..à...WV.|...Ä.v. 000120
 026A006A 000D7E987 B8880006 E9037500 00300000 FFFF9A50 16FC4680 0C6A066A j.j..F•.P.....=..u.Õ..||.Õ•.j.j. 000140
 029A6803 6A006A00 6A006A00 6A006A00 6A006A21 6A300068 006A006A 0A6AFF6A j.j.j.j.h.0j|j.j.j.j.j.j.j.j.h.. 000160
 76FF0014 E90374FA 4608F846 88FA5689 F8468900 0000419A 006A006A 006A006A j.j.j.j..A....F½.V•.F½.F•t.Õ...v 000180
 6A006A00 6A01B268 F876FFFA 76FF0081 E987B8B8 0000FFFF 9AFC76FF FE76FF06 ..v±.v•.....||.Õ...v•.v½hý.j.j.j 0001A0
 76FF0000 02569A00 6A006A01 6A006A01 C168F876 FFFA76FF 000003FA 9A006A00 .j..•....v•.v½hè.j.j.j.j..V....v 0001C0
 8BF8468B FC5EC402 57892607 8926FC5E C40000FF FF9AFFFF 68FFFF68 F876FFFA •.v½h..h.......á^•&..&.W.á^•.F½. 0001E0

Dump of file SATURN:[PCCOMMON.DUMP.DLL]TBE.TMP;1 on 18-APR-1990 10:53:12.46
File ID (929,12,0)   End of file block 62 / Allocated 64

Virtual block number 18 (00000012), 512 (0200) bytes

 085EC400 00FFFF9A FC76FFFE 76FF006A F876FFFA 76FF0657 89260447 8926FA56 V•&.G.&.W..v•.v½j..v±.v•.....á^. 000000
 B81E5657 000004C8 CBC95F5E 1F0000E9 0000B802 57892607 8926FA56 8BF8468B .F½.V•&..&.W.|..Õ...^_èùà...WV.| 000020
 FC76FFFE 76FF0676 FFFE5689 FC468900 00021C9A 006A0876 FF0A76FF D88E0359 Y..Ä.v..v.j.......F•.V̄±.v..v±.v• 000040
 8E04608B 1E565700 0000C8CB C95F5E1F 0000FFFF 9A0876FF 0A76FF00 0003C89A .à....v..v.......^_èùà...WV.|`.. 000060
 01020002 02070004 04080005 000F90CB C95F5E1F 0000048C 9A0876FF 0A76FFD8 Ä.v..v.......^_èù................ 000080
 00890103 00070002 04A80103 00060002 03A90103 00000004 04050002 00000003 ................................ 0000A0
 040B0103 001F0002 04600103 001E0002 04390103 0000000A 00E20002 00080002 ......ã.......9.......m......... 0000C0
 036A0203 00450002 029E0103 00300002 03E40103 0000000F 04900002 00250002 ..%..........Õ...=.......E...j. 0000E0
 1A1E068E D88EFFFF B81E5657 000002C8 00000000 00490005 04810203 003B0005 ..;.......|.....à...WV.|...Ä.... 000100
 FE7E8302 FE468300 04E90000 FE46C700 4CE90000 B80006E9 03740000 023E8326 &.>...t.Õ..|..ÕL.úF±..Õ...F±..-± 000120
 FE5E8806 468A001A E9037E00 48873826 1A20068E FE5E8806 468A0031 E9037214 .r.Õ1..F..^±.. .&8.H.-.Õ...F..^± 000140
 5F5E1F00 00E90000 B8FFC2E9 0009E900 01B80006 E9037D00 49873826 1A20068E .. .&8.I.).Õ..|..Õ..Õò.|..Õ...^_ 000160
 880A468B D88EFFFF B81E5657 00000AC8 00000000 0000000F 00080002 0001C8C9 èù..............à...WV.|...Ä.F.. 000180
 FF26F65E C40030E9 878DB800 06E90374 001C7F83 26F65EC4 F85689F6 46890C56 V..F-.V½á^-&.....t.Õ..|§.Õ0.á^-&. 0001A0
 88065EC4 FE5689FC 46890000 FFFF9A00 6A006A00 6A006A01 C0680477 FF260677 w.&.w.há.j.j.j.j.......F•.V±á^.. 0001C0
 02004201 03000000 0F000800 02000208 CAC95F5E 1F0000E9 0000B807 8926FC46 F•&..|..Õ...^_èò.............B.. 0001E0
```

Dump of file SATURN:[PCCOMMON.DUMP.DLL]TBE.TMP;1 on 18-APR-1990 10:53:12.46
File ID (929,12,0) End of file block 62 / Allocated 64

Virtual block number 19 (00000013), 512 (0200) bytes

```
468D006A D88EFFFF B81E5657 0000FCC8 00000000 00000000 00000000 00003D00 .=..............à•..WV.|...Äj..F 000000
6AEE76FF 02DDE987 B0B80006 E9037500 FF10BE83 FF108689 0000FFFF 9A5016EE Ÿ.P..........ƒ...u.Õ..¡_.Õï..vŸj 000020
FF089EC4 02BDE987 B0B80006 E9037500 003D0000 FFFF9A50 16FF0886 8D6E6A06 .jn.....P.....=..u.Õ..¡¯.Õ§.ó... 000040
03750000 3DFF1086 8906C483 01660351 9AEE76FF 5016F446 8D2C4789 26EE468B .FŸ&.G,.F¶.P.vŸ.Q.f..ó.....=..u. 000060
468BFF08 9EC4027F E9FF1086 8B0000FF FF9AFF08 B6FFFF0A B6FFEE76 FF0017E9 Õ...vŸ.Ñ...Ñ...........Õ..ó....F 000080
76FF0E57 89260C47 89260C56 8B0A468B FF089EC4 06578926 04478926 F6568BF4 ¶.V-&.G.&.W.ó....F..V.&.G.&.W..v 0000A0
478926E8 D182468B FF089EC4 0000FFFF 9A5016FF 1E868D00 D068006A 0A76FF0C ..v.j.hÅ......P.....ó....F.ìÒ&.G 0000C0
9689FF04 86890000 FFFF9A0A 76FF0C76 FF204789 2602E8C1 8E468BFF 089EC41E .ó....F.èÒ.&.G .v..v............ 0000E0
8D016A00 6A046A00 6AFF04B6 FFFF06B6 FF020AE9 878E8800 06E90374 D00BFF06 ...Åt.Õ..¡ƒ.Õ...Ñ...Ñ..j.j.j.j.. 000100
5016FF12 868D016A 006A056A 006AFF04 B6FFFF06 B6FF0000 01319A50 16FF1686 ....P.1....Ñ...Ñ..j.j.j.j......P 000120
0C868D24 478926FF 12868BFF 089EC422 478926FF 16868BFF 089EC400 0001B89A .|...ó.......&.G"ó.......&.G$... 000140
3DFF1086 890CC483 01830000 9AFF1686 FFFF18B6 FFFF12B6 FFFF14B6 FF5016FF ..P.Ñ...Ñ...Ñ...Ñ.........ó.....= 000160
C4017AE9 FF10868B 06C483FF FF04589A EE76FFF4 76FFF676 FF0018E9 03750000 ..u.Õ...v-.v¶.vŸ.X....ó.....Õz.ó 000180
006A096A 006AFF04 B6FFFF06 B6FF0257 89260789 26FF0E96 8BFF0C86 8BFF089E ...........&..&.W..Ñ...Ñ..j.j.j. 0001A0
16FC468D 016A006A 086A006A FF04B6FF FF06B6FF 000001D2 9A5016F8 468D016A j..F½.P.@....Ñ...Ñ..j.j.j.j..F•. 0001C0
D2831388 0501F606 469AF876 FFFA76FF 00FE6800 6A271068 006A0000 027B9A50 P.(...j.h.'j.h±..v'.v½.F.-.....@ 0001E0
```

Dump of file SATURN:[PCCOMMON.DUMP.DLL]TBE.TMP;1 on 18-APR-1990 10:53:12.46
File ID (929,12,0) End of file block 62 / Allocated 64

Virtual block number 20 (00000014), 512 (0200) bytes

```
C103E0D1 E0D1C88B 14478B26 FF089EC4 14478926 FF089EC4 023A067A 9A505200 .RP.z.:.ó...&.G.ó...&.G..àîÀîÀ.è 000000
05FE568B FC468B03 E868006A 1A478926 FF089EC4 F1F70064 B9D22B00 3205E0D1 îÀ.2.+@¿d.¥þó...&.G.j.hÒ..F•.V±. 000020
05FA568B F8468B03 E868006A 16478926 FF089EC4 025A067A 9A505200 D28301F4 ¶..@.RP.z.Z.ó...&.G.j.hÒ..F½.V'. 000040
256A006A FF04B6FF FF06B6FF 18478926 FF089EC4 FFFF067A 9A505200 D28301F4 ¶..@.RP.z...ó...&.G..Ñ...Ñ..j.j% 000060
8D016A00 6A266A00 6AFF04B6 FFFF06B6 FF000002 959A5016 FF1A868D 016A006A j.j......P......Ñ...Ñ..j.j&j.j.. 000080
0AB6FF0A 76FF0C76 FFFF1AB6 FFFF1CB6 FFF076FF F276FF00 00FFFF9A 5016F046 Fb.P.......v·.vb.Ñ...Ñ...v..v..Ñ. 0000A0
FF089EC4 0000E903 7500007E 3E83261A 22068E10 C483FFFF 041C9AFF 08B6FFFF ..Ñ........ó...".&.>-..u.Õ..ó... 0000C0
478926FF 089EC468 478926FF 089EC46A 478926FF FFB8FF08 9EC40000 1C47C726 &úG...ó...¡..&.Gjó...&.Ghó...&.G 0000E0
0008CAC9 5F5E1F00 00E90000 B8025789 26078926 FF0A968B FF08868B 065EC466 fó^..........&..&.W.¡..Õ...^ èò.. 000100
892C478B 26F85EC4 FA5689F8 46890856 8B06468B D88E0008 B81E5657 000008C8 à...WV.¡...Ä.F..V..F½.V'ó^½Ï.G,. 000120
F85EC4FE 46FF0003 E90000FE 46C7004B E903752A 470B2628 478B26F8 5EC4FC46 F•ó^½&.G(&.G*u.ÕK.úF±..Õ...F±ó^½ 000140
FF262470 FF262874 C426F876 C426FE5E 68FC76FF 001EE903 77264739 26FE468B .F±&9G&w.Õ...v•k^±&óv½&át(&.p$&. 000160
F85EC400 00007F9A 2877FF26 2A77FF26 F85EC4FC 76FFFFD0 E9000003 899A2270 p"......ÕÅ..v•ó^½&.w*&.w(.....ó^½ 000180
C4830302 04959AFC 76FF37FF 260277FF 26F85EC4 0015E903 7502470B 26078826 &..&.G.u.Õ..ó^½&.w.&.7.v•...@..ó 0001A0
9AFC76FF 0477FF26 0677FF26 F85EC400 16E90375 06470B26 04478826 F85EC406 .ó^½&.G.&.G.u.Õ..ó^½&.w.&.w..v•. 0001C0
00008800 00FFFF9A FC76FF00 0003739A F876FFFA 76FFFC76 FF06C483 00620458 X.b..ó..v•.v'.v½.s....v•.....¡.. 0001E0
```

Dump of file SATURN:[PCCOMMON.DUMP.DLL]TBE.TMP;1 on 18-APR-1990 10:53:12.46
File ID (929,12,0) End of file block 62 / Allocated 64

Virtual block number 21 (00000015), 512 (0200) bytes

```
0A5EC406 47882606 5EC4D88E 0318B81E 56570000 02C80004 CAC95F5E 1F0000E9 Õ...^_èò..à...WV.¡...Äó^.&.G.ó^. 000000
86C70001 FEE886C7 D88E0402 B81E5657 000298C8 C8C95F5E 1F0000E9 06472826 &+G.Õ¯...^_èùà...WV.¡...Äú.Õ±..ú. 000020
065EC400 FEEA8E83 02FEE88E 83000AE9 03740000 7E3E8326 1A22068E 0000FEEA õ±....".&¯>-..t.Õ....Õ±...õ±.á^. 000040
261A2606 8E006A00 6A00E0E9 03740000 5E3E8326 1A24068E FEEC8689 2C478826 &.G,..š±..$.&.>^..t.ÕÅ.j.j...&.& 000060
B9E90001 B80006E9 03740000 3D0000FF FF9A5016 FE94868D 506A646A 020636FF .6..jdjP...±.P.....=..t.Õ..¡..Õ¿ 000080
5016FD88 8680009D E90375FE FC860BFE FA8688FE FC968CFE FA8689FE 94868005 ....±..'±..•±..'±..•±u.Õ.....».P 0000A0
E9037400 023010C4 8304EF00 DE9AFEFA B6FFFEFC B6FF0060 681E5016 FD688680 ..h».P.h'..Ñ•±.Ñ'±.8.ÿ..ó.=..t.Õ 0000C0
1100109A 5052050A BA020887 8D012000 5E1E6926 1A24068E 5016FD68 86800075 u...h».P..$.&i.^. .....¤..RP.... 0000E0
109A5052 FFFFBA02 28878D01 20005E1E 69261A24 068E5016 FD88868D 08C48305 ..ó....».P..$.&i.^. ...(.¤..RP.. 000100
C48301E9 01389AFE FAB6FFFE FCB6FF38 6A005E06 FF261A24 068E08C4 83052C00 .,..ó...$.&..^.j;.Ñ•±.Ñ'±.8.Õ..ó 000120
24068E06 6AFEEC86 FFFF56E9 FEFA86FF 0004E903 75D008FE FC9689FE FA868906 ...'±..•±.Åu.Õ....'±ÕV..Ñš±j...$ 000140
D9E987B0 880006E9 03750000 30000006 E49A5016 FEEE8680 5026005E 0668261A .&k.^.&P..Ÿ±.P.Õ...=..u.Õ..¡¯.Õ1 000160
86C708C4 83062C02 0A9AFEEE B6FFFEF0 B6FF006A 5026005E 0668261A 24068E04 ...$.&k.^.&Pj..Ñb±.ÑŸ±...,..ó.ú. 000180
E90372FE F8863900 5EA1261A 24068EFE F886FF00 04E90000 FEE486C7 0000FEF8 ½±..ú.Õ±..Õ....½±..$.&Å^.9.½±r.Õ 0001A0
08878D01 20FEF89E 69016A00 6A0A76FF 0C76FFFE 888689FE 8A868900 00B80474 t.¡.....±...±.v..v.j.j.ì.½± .... 0001C0
5AE9037E 00FA8300 0006829A 006A006A 006A006A 5016FE88 86805052 061B8A02 .¤..RP...±.Pj.j.j.j.......'.~.ÕZ 0001E0
```

```
Dump of file SATURN:[PCCOMMON.DUMP.DLL]TBE.TMP;1 on 18-APR-1990 10:53:12.46
File ID (929,12,0)   End of file block 62 / Allocated 64

Virtual block number 22 (00000016), 512 (0200) bytes

FF8DE900 03E90375 00007E3E 83261A22 068E004D E9037600 01300008 E9037D00 .).Õ..=..v.ÕM...".&.>~..u.Õ..Õ.. 000000
C48306AE 005E9A50 16FEFE86 8D006C68 1E505206 6FBA0228 87BD0120 FEF89E69 i.½± ...(.¤o.RP.hl...±±.P.^.Û..ó 000020
86890000 B8FF52E9 0003E903 7400003D 0000FFFF 9A5016FE FE868D00 6A006A0C .j.j...±±.P.....=..t.Õ..ÕR.j.... 000040
0FBA0208 87BD0120 FEF89E69 FEE8B6FF FEEAB6FF 0A76FF0C 76FFFE88 8689FE8A .±...±.v..v..Ñõ±.ÑÒ±i.½± .....¤. 000060
868BFE8E 9689FE8C 86890000 07279A00 6A006A00 6A006A50 16FE8886 8D505207 .RP...±.Pj.j.j.j..'......±...±.. 000080
07A40646 9AFE8CB6 FFFE8EB6 FF000068 006AFEFF E90003E9 0374FE8E 8608FE8C .±...±t.Õ..Õ.±j.hÅ..Ñ.±.Ñ.±.F.Ê. 0000A0
87B4B800 06E90373 00003000 08E9037E 0013E903 7D01FA83 FE929689 FE908689 ...±...±.°.).Õ..~.Õ..=..s.Õ..¡Ç. 0000C0
0006E903 7500003D 0000003A 9A5016FE F2868DFE 9086FF06 6AFEECB6 FF0377E9 Õw..Ñš±j..Ñ.±...±.P.:...=..u.Õ.. 0000E0
E8BA0208 87BD0120 FEF89E69 FEE8B6FF FEEAB6FF 0A76FF0C 76FF0354 E987B088 |¯.ÕT..v..v..Ñõ±.ÑÒ±i.½± .....¤Ò 000100
00FEE686 C70000FF FF9AFEF2 B6FFFEF4 B6FF0000 68006A50 16FE8C86 8D505204 .RP...±.Pj.hÅ..Ñ¶±.Ñ·±.....ú.l±. 000120
D0FEF686 690128E9 037FFE8C 8639FEF6 8688FEF6 86FF0004 E90000FE F686C700 .ú.-±..Õ....-±..-±9..±..Õ+.iÑ-±Å 000140
744B0080 B88326FE F29EC400 D0FEF686 6900A4E9 03744B7E 788326FE F29EC400 .ó.·±&.x-Kt.ÕÊ.iÑ-±Å.ó.·±&.j..Kt 000160
7070FF26 7270FF26 FEF29EC4 0000FEF6 B6690E76 FF1076FF 0A6A006A 008FE903 .Õ..j.j..v..v.iÑ-±Å.ó.·±&.pr&.pp 000180
E0D102D1 E0D1DA88 C88807BF 06469A50 52997E40 8826FEF2 9EC40000 FEF68669 iÑ-±Å.ó.·±&.ə-.RP.F.¢..à.ÖiÂi@iÅ 0001A0
86690820 05AA9A50 52000283 00050507 CC05AA9A 50520201 E0D10313 C1030201 l@.è.ÆiÂl@RP.¯.ä.....@.RP.^.-.iÑ 0001C0
4089260E 4688FEF2 9EC40000 FEF68669 72508926 70408926 FEF29EC4 0000FEF6 ~±Å.ó.·±&.əp&.PriÑ-±Å.ó.·±.F.&.ə 0001E0

Dump of file SATURN:[PCCOMMON.DUMP.DLL]TBE.TMP;1 on 18-APR-1990 10:53:12.46
File ID (929,12,0)   End of file block 62 / Allocated 64

Virtual block number 23 (00000017), 512 (0200) bytes

80F626FE F29EC400 D0FEF686 69008080 89261246 88FEF29E C40000FE F686697E ~iÑ-±Å.ó.·±.F.&....iÑ-±Å.ó.·±&-. 000000
83085002 529A500E 46287E40 8826FEF2 9EC40000 FEF68669 004CE903 74010092 ...t.ÕL.iÑ-±Å.ó.·±&.ə-+F.P.R.P.. 000020
02529A50 12462800 80808826 FEF29EC4 0000FEF6 8669002A E9037E00 053D02C4 ó.=..-.Õ*.iÑ-±Å.ó.·±&....+F.P.R. 000040
C626FEF2 9EC40000 FEF68669 000FE9FE E686FF00 07E9037E 00053D02 C48304C5 é..ó.=..-.Õ....l±Õ..iÑ-±Å.ó.·±&ó 000060
E4866850 E001C103 E0D1C103 E0D1C888 FEE68688 066AFEEC B6FFFEC4 E9002040 ə .Õá±.Ñš±j...l±.àiÅ.èiÅ.èiÅPk.ð 000080
FEECB6FF 0017E903 7500003D 0000055F 9A505200 2205FEF0 9688FEEE 860326FE ±&..Ÿ±..Þ±.".RP. ...=..u.Õ...Ñš± 0000A0
04E90000 FE46C700 00FEF686 C70187E9 87B7B800 000A1F9A FEEEB6FF FEF086FF .Ñb±.ÑŸ±.....¡ñ.Õ..ú.-±..úF±..Õ. 0000C0
20788026 FEF29EC4 0000FEF6 B6690002 E9037FFE 8C8639FE F6868BFE F686FF00 ...-±..-±9..±..Õ@.iÑ-±Å.ó.·±&.x 0000E0
BE680EFE 766800CE 90882600 CC808826 FEF29EC4 0000FEF6 B6690088 E9037500 .u.ÕÊ.iÑ-±Å.ó.·±&..ë.&..ö.kv±.k/ 000100
8A808826 FEF29EC4 0000FEF6 B6690250 89260089 262259C4 26FEEE9E C426FEE4 ð±&ó.Ÿ±&óY"&..&.P.iÑ-±Å.ó.·±&... 000120
04408926 D9882270 C426FEEE 9EC4CB88 26FEE486 680EFE5E 68F9F700 0AB99900 ..¿..%'k^±.kÑõ±&.ùó.Ÿ±&óp".l&.ə. 000140
EE9EC4CB 8826FEE4 B6680EFE 5E687250 88267040 8826FEF2 9EC40000 FEF68669 iÑ-±Å.ó.·±&.əp&.Prk^±.kÑõ±&.ùó.Ÿ 000160
50882664 40882 6FE F29EC400 D0FEF686 69085089 26064089 26098822 70C426FE ±&óp".l&.ə.&.P.iÑ-±Å.ó.·±&.əd&.P 000180
46FF0C50 89260A40 89260988 2270C426 FEEE9EC4 C88826FE E48668OE FE5E6866 fk^±.kÑõ±&.ùó.Ÿ±&óp".l&.ə.&.P..F 0001A0
2270FF26 2470FF26 FEEE9EC4 26FEE486 68FE76FF 0E6AFFFF 68028868 FF1DE9FE ±Õ..h¡.h..j..v±kÑõ±&ó.Ÿ±&.p$&.p" 0001C0
FEEE8603 26FEE486 68505205 D28A0208 87800120 FEF89E69 0CC48309 F9026A9A .j.'..ó.i.½± .....¤@.RPk.ð±&..Ÿ± 0001E0

Dump of file SATURN:[PCCOMMON.DUMP.DLL]TBE.TMP;1 on 18-APR-1990 10:53:12.46
File ID (929,12,0)   End of file block 62 / Allocated 64

Virtual block number 24 (00000018), 512 (0200) bytes

86FF2040 8926FE46 88FEEE9E C426FEE4 866808C4 83058900 109A5052 FEF0968B ..Þ±RP......ó.kÑõ±&ó.Ÿ±.F±&.ə .. 000000
F0968BFE EE868806 5EC4F877 E9000003 E19AFEF2 86FFFEF4 B6FFFEEC 86FFFEE4 ð±.Ñš±.Ñ¶±.Ñ·±.Ã...Õw«ó^...Ÿ±..Þ 000020
90CBC95F 5E1F0000 E9000088 26478926 FEE4868B 065EC42A 57892628 478926FE ±&.G(&.W*ó^...ð±&.G&¡..Õ...^_èù. 000040
00030116 01030000 000709B5 00020000 000403AC 000200F0 000300E6 01030010 ....l...Þ...¯.......ç........... 000060
000305E5 01030000 000D09D3 00020098 0003063C 0103009D 0002047F 01030006 ............<.......Æ.......l... 000080
00050014 02030000 000F0424 00020000 000E09E3 0002009F 000300C0 0103009E ....ó.......Ð.......$........... 0000A0
000508B9 0203003B 000508A0 020303FA 00070988 0005002C 000503E9 0203001E ....Õ...,...¡...°.......;...¿... 0000C0
88144688 D88EFFFF 881E5657 00004AC8 00000000 00000000 00000000 00000049 l...............àJ..WV.¡...Ä.F.. 0000E0
88268A5E C40149E9 87B08800 06E90374 001C7F83 268A5EC4 BC56898A 46891656 V..F¤.V¥ó^¤&....t.Õ..|§.Õl.ó^¤&. 000100
00649A00 6A006A00 6A006A01 D0688676 FFB876FF B85689B6 46890657 88260447 G.&.W..FÑ.V¡.v¡.vÑhÎ.j.j.j.j..d. 000120
76FFC656 89C44689 00000080 9A006A00 6A036A00 6A01CB68 B676FFB8 76FF0000 ...v¡.vÑhù.j.j.j.j.......Fó.Vó.v 000140
B676FFB8 76FFC256 89C04689 000000F2 9A006A00 6A046A00 6A01CB68 B676FFB8 ¡.vÑhù.j.j.j.j..·....Fà.Vô.v¡.vÑ 000160
FFB876FF 0000000C 9A026A00 6A006A04 77FF2610 5EC437FF 26105EC4 006A006A j.j.ó^.&.7ó^.&.w.j.j.j..É....v¡. 000180
0C478B26 105EC450 40072B26 105EC408 47882610 5EC4006A 006A006A 006A8676 vÑj.j.j.j.ó^.&.G.ó^.&+.əPó^.&.G. 0001A0
6A006A00 6A006A01 B268B676 FFB876FF 0000FFFF 9A016A50 4004472B 26105EC4 ó^.&+G.əPj.......v¡.vÑhý.j.j.j.j 0001C0
00009A14 76FF1676 FF0C76FF 0A76FF08 76FF0676 FF5016C8 468D0000 013A9A00 ..:....Fà.P.v..v..v..v..v..v.... 0001E0
```

Dump of file SATURN:[PCCOMMON.DUMP.DLL]TBE.TMP;1 on 18-APR-1990 10:53:12.46
File ID (929,12,0)   End of file block 62 / Allocated 64

Virtual block number 25 (00000019), 512 (0200) bytes

```
01D168B6 76FFB876 FF004DE9 BE468800 06E90375 00BE7E83 BE468910 C483FFFF ...á..Ff.-f.u.Õ...FfÕM..v¡.vÑhÌ. 000000
C276FFC4 76FFC676 FF01CA68 B676FFB8 76FF0000 01549A00 6A006A50 16C84680 .Fà.Pj.j..T....v¡.vÑhò..vó.vá.vô 000020
00B80000 FFFF9A00 6A006A00 6A006A01 DC68B676 FFB876FF 0000016A 9AC076FF .vä.j....v¡.vÑhÉ.j.j.j.j......¡. 000040
00020008 000200A8 01030000 00030110 00020004 900012CA C95F5E1F 0000E900 .Õ...^_èò........................ 000060
A3064688 D88EFFFF B81E5657 000000C8 0000003D 0002004E 01030000 000F0008 ........N...=...à...WV.¡...Ä.F.È 000080
00000000 00000000 000F0008 00020001 900002CA C95F5E1F 0000E900 00B8007E ~.¡..Õ...^_èò..................... 0000A0
004A9A00 6A006A00 6A006A01 C0680676 FF0876FF D88EFFFF B81E5657 000004C8 à...WV.¡..¯Ä.v..v.hà.j.j.j.j..J. 0000C0
6A01C668 0676FF08 76FF0018 E90003E9 0374FE46 0BFC468B FE5689FC 46890000 ...F=.V±.F•.F±t.Õ..Õ...v..v.hó.j 0000E0
6AD88E00 08881E56 57000000 C8C8C95F 5E1F0000 FFFF9AFC 76FFFE76 FF006A00 .j..v±.v•......^_èùà...WV.¡...Äj 000100
000F005B 000200F3 00020064 01030003 CBC95F5E 1F0000E9 0000FFFF 9A006A00 .j......Õ...^_èù¯...d...µ...(... 000120
1A28068E D88EFFFF 881E5657 000000C8 00000000 0000003D 0002001E 01030000 ........=........à...WV.¡...Ä..(. 000140
0006E903 74000030 02C483FF FF00439A 020636FF 261A2806 8E0206A3 26064688 .F.&È....(.&.6...C....á.=..t.Õ.. 000160
C7D88E00 08881E56 5700002C C80002CA C95F5E1F 0000E900 01880006 E9000088 ¡..Õ..¡..Õ...^_èò..à,..WV.¡...Äú 000180
8E0000FF FF9A5016 D4468D50 16064680 5016FC46 80266A00 00FC46C7 0000FE46 F±..úF•..j&.F=¯P.Fø.P.Få.P...... 0001A0
BA0048B8 5016FC46 80146A00 00A32606 46881A2C 068E0004 A3260846 881A2A06 .*..FÄ&È....,..Fø&È..j..F=.P¡H.α 0001C0
493E8026 1A2E068E 001DE903 74000048 3E80261A 2E068E00 00FFFF9A 5052FFFF ..RP.........&.>H..t.Õ......&.>Ì 0001E0
```

Dump of file SATURN:[PCCOMMON.DUMP.DLL]TBE.TMP;1 on 18-APR-1990 10:53:12.46
File ID (929,12,0)   End of file block 62 / Allocated 64

Virtual block number 26 (0000001A), 512 (0200) bytes

```
00010002 06C7261A 30068E00 0BE90000 000206C7 261A3006 8E000EE9 03740000 ..t.Õ....0.&ú.....Õ....0.&ú..... 000000
00020004 00010095 01030003 00010068 01030005 90C8C95F 5E1F0000 E90001B8 ¡..Õ...^_èù.....k............... 000020
00000000 00000000 00000000 000F004B 00020000 000E0090 00020000 00080023 #...............K............... 000040
00080013 00020002 CBC91FFF FF00009A FE76FFFE 7E89D88E FFFFB81E 000002C8 à....¡...Ä.-±.v±......èù........ 000060
00000000 00000000 00000000 00000000 00000000 00000000 000E0006 00020000 ................................ 000080
A8C78806 7EC4D1F7 AEF2FFFF 89C033C0 8ED88CFE 880A76C5 1EDE88D7 88EC8855 U.Š.■.B.év..±.Ä.â3â¿...·Ü¼1ó-..ú˙ 0000A0
C033067E C4D788EC 8855C85D C28C1FFA 88F388A4 F3C913A5 F3E9D149 A4027401 .t.Ê¦1ÕµÊ.èµÊ.µ.*..ò]ùU.Š.■á-.3à 0000C0
0E468DFA 568CF846 89EC468D 56570000 16C800C8 5DFA8891 49D1F7AE F2FFFFB9 ¿..·Ü¼1¦..*]ù.à...WV.FŠ.FѢ.V*.F. 0000E0
26078926 08578926 06478926 08568806 4688420A 47C626F8 5EC4FE56 8CFC4689 .F=.V±á^Ѣ&6G.B.F..V.&.G.&.W.&..& 000100
C4F088DC C4830003 15249A53 060A76FF 0C76FFFC 76FF167F FF0447C7 26025789 .W.&úG.....v•.v..v..S.$.£..á..þá 000120
006A53FA 76FF900F E8058826 02478E26 07FF263F 8826C02A 1278044F FF26F85E ^Ѣ&.O.x.*â&.?&..&.G.&..Š...v*Sj. 000140
46890E46 80FA568C F84689EC 46800000 14C8CBC9 5F5EC68B 06C483FF FF07F89A .Ѣ....á..ó^_èùà....FŠ.FѢ.V*.F..F 000160
57892607 89260857 89260647 89260856 88064688 490A47C6 26F85EC4 FE568CFC =.V±á^Ѣ&6G.T.F..V.&.G.&.W.&..&.W 000180
53060A76 FF0C76FF FC76FFFE 76FF0447 8926F85E C404C483 01330046 9A505202 .RP.F.3..á.á^Ѣ&.G..v±.v=.v..v..S 0001A0
F8880A46 8AD9F741 AEF2FFFF B9C033DF 88067EC4 57EC8855 90C8C900 A8096E9A .n.´.èù.U.ŠWá-..Õ3â¿...·ÜA¼).F..« 0001C0
C40A76C5 1ED688EC 885500CB 5DE588 5F C28CC788 C78EFF33 04740538 264FAEF2 ·ÜO£8.t.3..ú.ú.ò_.[]ù.U.Š.ø.év.á 0001E0
```

Dump of file SATURN:[PCCOMMON.DUMP.DLL]TBE.TMP;1 on 18-APR-1990 10:53:12.46
File ID (929,12,0)   End of file block 62 / Allocated 64

Virtual block number 27 (0000001B), 512 (0200) bytes

```
E0864104 C10220E1 80C91A1A 3C412CF3 74E03A43 278A26AC 2D74C00A FFB0065E ^.¯..ât-¯&.'C:Átµ,A<..è.Ä .: ¶.Á 000000
8BEC8B55 00C85DF2 8B1F98FF 1CC01AD3 74C43A41 04C10220 E180C91A 1A3C412C ,A<..è.Ä .è.A:átÆ.à.....·]ù.U.Š. 000020
D2F7D68B C203C323 D81BC22B D2F7D78B 48C18806 7EC40A76 C556571E 4EE30E4E N.DN.WVév.á~..êH.■¼Ø+ô.ÜWû.ô.ø¼Ø 000040
FFFF05D8 8C0775F6 0818E391 A4F3C913 A5F3E9D1 C1289140 C203C323 D81BC22B +ô.ÜWû.ôã.+èÌÕµÊ.èµÊ.D..-u..Ä... 000060
0C4E88EC 8B55CB5D 08568B06 46881F5F 5EBEEBC0 8E01EE05 C08CC775 FF0BD88E .Ä..uú.à.Ÿ..âŠf^ ..F..V.]ùU.Š.N. 000080
F3E9D1E0 8A0A468B D128D187 D103D323 D81BD12B 0C74DAF7 D78B067E C45738E3 DØWá-..■¼Öt.+1.Ü₮Æ.1.1+1.F..ÄÌÕµ 0000A0
08568B06 46885FAA F3C913AB F3E9D1C3 8E01F9C3 81C38C10 E3D187AA F3C913AB ¯.èµ¯.ÌD..û.û*..ûÌÕµ¯.èµ¯.F..V. 0000C0
0010B8EC 8B5590C8 C9D8F706 46889006 E8064688 067C0006 7E830000 00C8CB5D ]ùà....~..|..F.Š...F.¼ÄèùU.Š¡.. 0000E0
02FCB9D2 13064603 D22B0C46 8BFA5689 F8468908 568B0646 8B565703 3B1FC69A .ó.;.WV.F..V..FѢ.V*.F.+Ø.F..Ø¿•. 000100
F44EFF5F 74000A7E 830000F6 46C7F446 89480A46 8BFE5689 FC468908 5603E2D3 Æã.V..F=.V±.F.H.F¶úF-...~..t_.N¶ 000120
76FFFA76 FFFC76FF FE76FFF6 768BF47E 880000F2 46C7F046 890C468B 5874C008 .âtX.F..FÞúF·...~¶.v-.v±.v=.v*.v 000140
FA5689F8 4689FE56 8BFC4688 28EBF676 89F47E89 46097EC0 0B08C483 0E5EFFF8 Ѣ.^..á..ä-.F.~¶.v-Š(.F=.V±.FѢ.V* 000160
00F67E83 B9EBD274 C0084FC7 8BFE4601 E0D30344 B9F24613 FC4E01F0 4E88C028 +à.NÞ.N=.F·¿D.ÆÄ.F±.úO.âtØŠ¿.—-. 000180
8036FF00 6A0676FF 0876FF00 84168900 82A31056 880E4688 0080A30C 46883E74 t>.F.Ê...F..V.Ê.......v..v.j..6. 0001A0
0004E850 52085603 E2D3036B 89000283 06460303 5D06469A 50006A48 0A468800 ..F.Hj.P.F.]..F..Ø.¿k.Æã.V.RPÒ.. 0001C0
03E2D303 B4B90213 044603D2 280080A1 5604C91F C69A0008 8BEC8B55 C8C95F5E ^_èùU.Š¡...ó.è.VÀ..+Ø.F..Ø¿Ç.Æã. 0001E0
```

```
Dump of file SATURN:[PCCOMMON.DUMP.DLL]TBE.TMP;1 on 18-APR-1990 10:53:12.46
File ID (929,12,0)   End of file block 62 / Allocated 64

Virtual block number 28 (0000001C), 512 (0200) bytes

FFFA76FF FC76FFFE 76FF6DE8 FE5689FC 46890A56 8B08468B FA5689F8 46890656 V..F½.V².F..V..F=.V±Šm.v±.v=.v². 000000
F846030A F7D213D8 F7D22B00 80A10876 FF0A76FF 9070EB01 91E80080 36FFF876 v½.6..Ò..Šp..v..v.À..+Ø¼Á.Ø¼Ö.F½ 000020
03E2D304 1AB9D213 F84603D2 2B0080A1 FF94E850 52FA5603 E2D303CB B9000283 .Ø.¿ù.Æã.V²RPÒ..À..+Ø.F½.Ø¿..Æã. 000040
F8468906 5603E2D3 D2130446 03022B00 80A1FE56 89FC4689 0A568908 4689FA56 V².F..V..F=.V±À..+Ø.F..ØÆã.V..F½ 000060
D22B0080 A10119E9 03720846 39087201 23E90376 0A563906 568B0446 8BFA5689 .V².F..V.9V.v.Ö#.r.9F.r.Ö..À..+Ø 000080
46390572 1E77FE56 39065688 04468BFE 5E01E3D3 045FB90A 13FC4E01 C88BD82B +Ü.à.N=.Ö¿_.ÆD.^±.F..V.9V±w.r.9F 0000A0
F7D22B00 80A1C17E C00B08C4 8300821E FFFC76FF FE76FF08 76FF0A76 FF1773FC =s..v..v..v±.v=.....á..â-èÀ..+Ø¼ 0000C0
72FA5639 0A568B08 468BFA5E 01E3D304 F0B9DA13 F84E01C8 8BD82BDA F7D213D8 Ä.Ø¼Ö+Ü.à.N½.Ö¿Þ.ÆD.^².F..V.9V²r 0000E0
8BBB7DC0 0B08C483 00821EFF F876FFFA 76FF0876 FF0A76FF 1776F846 3905771E .w.9F½v..v..v..v².v½.....á..â)£. 000100
FA76FF08 76FF0A76 FFFEDFE9 0376F846 390872FE E9E90376 FA5639FE 568BFC46 F=.V±9V²v.ÖÖ±r.9F½v.ÖÖ±.v..v..v² 000120
76FF0A76 FF04DC1F A89A0476 FF0676FF F876FFFA 76FF0070 E8008036 FFF876FF .v½.6..Òp..v².v½.v..v..´.Ê..v..v 000140
B9D213F8 4603D22B 0080A1FE B7E9037D C63B0533 1FA89AF0 8BF876FF FA76FF08 ..v².v½.Þ.´.3.;6).Ôñ±À..+Ø.F½.Ø¿ 000160
F84603DA F7D213D8 F7D22B00 80A1FE52 E80476FF 0676FF50 52FA5603 E2D30514 ..Æã.V²RP.v..v.ÒR±À..+Ø¼Ä.Ø¼Ö.F½ 000180
0002B8EC 8B559000 08C2C95E FE54E906 56890446 89FA5603 E2D3FFFF B9000283 .Ø.¿..Æã.V².F..V.ÕÏ±^èô...U.š¡.. 0001A0
88260A5E C4078A26 065EC4FE 4688078A 260A5EC4 9037EB04 768B5601 161FC69A .6...V.v.Š7.á^.&...F±á^.&..á^.&. 0001C0
01023D25 C01B0106 46830788 26FE468A 065EC40C 4601056D 25C01B01 0A468307 ..F...à%m..F.á^..F±&...F...à%=.. 0001E0

Dump of file SATURN:[PCCOMMON.DUMP.DLL]TBE.TMP;1 on 18-APR-1990 10:53:12.46
File ID (929,12,0)   End of file block 62 / Allocated 64

Virtual block number 29 (0000001D), 512 (0200) bytes

FF260A76 FF0C76FF 065EC4EC 8B559000 0AC2C95E 047689C3 75C00B4E C68B0846 F..óN.åuû.v.^èõ...U.šá^..v..v.&. 000000
535657EC 8B550008 CA5DE58B 07892602 57892606 5EC40273 05AA9A37 FF260277 w.&.7.´.s.á^.&.W.&...[]ò..U.šWVS 000020
7DC00B0C 468B0656 89084689 00001DDA F7D8F706 568B4711 7DC00B08 468BFF33 3..F..â).G.V.ÄÄ¼Ö....F..V..F..â) 000040
F1F7D233 08468B0A 4E8B1575 C00B0A56 890C4689 00001DDA F7D8F70A 568B4711 .G.V.¼Ä¼Ö....F..V..âu..N..F.3Ø¼Þ 000060
DB0BD8D1 EAD1D9D1 EBD10646 8B08568B 0A4E8BD8 8B38EBD3 8BF1F706 468BD88B .Ä.F.¼Þ.Æ$8.Ä.N..V..F.1$111õ1Ä.Û 000080
4E017606 463B0672 07770856 3B0C72D1 03E6F70A 468B910C 66F7F08B F1F7F475 u¶¼Þ.Þ¼f...F.¼].ir.;V.w.r.;F.v.N 0000A0
0B0C5E8B 08468BEC 8B550008 CA5DE58B 5F5E5B00 DA83D8F7 DAF70775 4F96D233 3Ø.Ou.¼Ö¼Ä.Ö.[^_.[]ò..U.š F..^.. 0000C0
06468BC8 030C66F7 06468BC8 8BE3F700 0BCA5DE5 8BE3F706 468B0B75 0A5E8BD8 Ä.^.u..F.¼D.[]ò..¼D.à.F.¼. .à.F. 0000E0
F1F7D233 08468B0A 4E8B1575 C00B0C46 8B5653EC 8B550008 CA5DE58B D103E3F7 ¼D.1.[]ò..U.šSV.F..âu..N..¡ ²Ø¼Þ 000100
C90BD8D1 EAD1DBD1 E9D10646 8B08568B 0A5E8BC8 8B38EBD3 8BF1F706 468BD88B .Ä.F.¼Þ.Æ$8.à.^..V..F.1Õ1Ûiõ1Ä.è 000120
4E017606 463B0672 07770856 3B0C72D1 03E6F70A 468B910C 66F7F08B F3F7F475 u¶¼µ.Þ¼f...F.¼].ir.;V.w.r.;F.v.N 000140
1E04CAA3 E0B65800 00FFFF9A 5016C48B 50EC8B55 000008CA 5DE58B5B 5E96D233 3Ø.^[.[]ò...U.šP.á.P.....X.ÁÈò.. 000160
9A50CB5D E5880001 B8059820 DA9A18E8 E80021E8 0000FFFF 9A008668 1E008868 h...h.......Ò1.ÒÒ..Ö ..¡...[]ûP. 000180
3D80267F FFB90088 068EFF33 0000BB1E 008E16FF 00FF6807 1207C29A 0705076E n....ô...h.......£..3.....¿..&.= 0001A0
061CE8E7 74AEF2C0 330874CA 8BA6F3CB 8BD18B04 928E3174 003D8026 47017500 .u.G&.=.t1ƒ...1.ùµ1.òt.3â·ÚtÓŠ.. 0001C0
8B5500C3 1FEDEBAA C20A0572 412CAC92 04E0C00E 72412CAC 04D1BF1F F7B8071E ...¼.«1.¯,Ar.âÀ..¯,Ar..ô`ŠÚ.û.U. 0001E0

Dump of file SATURN:[PCCOMMON.DUMP.DLL]TBE.TMP;1 on 18-APR-1990 10:53:12.46
File ID (929,12,0)   End of file block 62 / Allocated 64

Virtual block number 30 (0000001E), 512 (0200) bytes

E5880778 07C29A50 00FF8804 A01EFF04 740004A2 3E830717 07C29A50 00FCB8EC å|=.P.ô....>À..t.....|..P.ô.x..[ 000000
C033970C 74964010 74C23BAD 1A3EBE06 568BC08E D88EFFFF 885756EC 8855C850 ]ùU.$VW|...Ä.â.V./>.Û;ôt.ä.t..3â 000020
C008078C 07929A06 76FF57EC 88550002 CA5DE58B 5E5F96EB EBF78BAE F2FFFFB9 ¿..·Û.¼ŠŠ._^.[]ò..U.šW.v.......â 000040
0000FFFF 9A501651 521E5300 02BBC48B 5049D1F7 AEF2FFFF B9C033FA 88921F74 t...²3â¿..¯Ü¼11P.á£..S.RQ.P..... 000060
9907FE2D C38BFA46 89E42A0B 478A2608 5EC45657 000008C8 0002CA5D E58B5F5B [_.[]ò..à...WVá^.&.G.*ô.F².û-±.. 000080
74400A47 F6260774 830A47F6 26F84689 13F205E0 D1C103E0 D1C8BBF9 F7000CB9 ¿..¼².à1Á.è1Á.·..F½&-G..t.&-G.ät 0000A0
26200A4F 80260E74 010A47F6 26085EC4 90012BE9 FFFFB820 0A4F8026 085EC40F .á^.&.O. ¡..Ö+..á^.&-G..t.&.O. & 0000C0
47F626FC 7689F08B 04478926 C02BEF0A 67802602 0A4F8026 90E2EB00 000447C7 úG...Šä.&.O..&.g.ÿ+â&.G..Þ.v=&-G 0000E0
0775080A 087E8137 750113F2 87F606D8 6BF9F700 0CB99907 FE2DC38B 4C750C0A ..uL.û-±..¿..¼²kÄ.-.·..u7.-...u. 000100
02C48309 14273A9A FA76FF0F 7507980A 7E811675 0816087E 810E7408 A10A7E81 .-.À.t..-...u..-...u..v².:'...á. 000120
9907FE2D C3881575 080A47F6 26085EC4 04C4831A 1DE80876 FF0A76FF 0C75C008 .âu..v..v.Ò...á.á^.&-G..u..û-±.. 000140
57882606 47882606 77282637 8826085E 88677401 13F287F6 060868F9 F7000CB9 ¿..¼²kÄ.-.·..tg.^.&.7&+w.&.G.&.W 000160
76FF0677 FF265256 167EF608 04478926 4802458B F87E8802 57892607 89264008 .ä&..&.W..-½.E.H&.G..--.VR&.w..v 000180
9A53006A 006A026A 0F742004 D187F6FA 5E8819EB FC468908 C4830932 243E9AFA ².>$2..á..F=Š..^²-.1. t.j.j.j.S. 0001A0
FF501606 46805600 01BE17EB 07882606 468A065F C426085E C408C483 09552400 .$U..á.á^.&á_..F.&..Š.ƒ..V.F..P. 0001C0
8B55CBC9 5F5EE42A 06468AFE CCE90374 FC7639FC 468908C4 8307CC24 3E9AFA76 v².>$ä..á..F=9v=t.Öâ±.F.*ô^_èùU. 0001E0
```

Dump of file SATURN:[PCCOMMON.DUMP.DLL]TBE.TMP;1 on 18-APR-1990 10:53:12.46
File ID (929,12,0)   End of file block 62 / Allocated 64

Virtual block number 31 (0000001F), 512 (0200) bytes

```
868D1B1A 16891B18 A3085688 06468800 001B2A06 C7565708 6C1FC69A 010AB8EC §¡...6.l.WVú.*....F..V.È.  ..... 000000
1B2CA310 56880E46 881B44A3 1B1EA31B 3EA31B38 A3C02B1B 34168C1B 32A3FEF8 ½±È2...4.+âÈ8.È>.È..ÈD..F.. '.È,. 000020
0E177408 06FD87F6 D8889805 25E90375 C00AFEF6 8688078A 260A5EC4 1B2E1689 ....ő^.&....-±.åu.ÕX...Ä-.»..:.. 000040
E9037425 3F80260A 5E88ED75 0806FD87 F6D88898 078A260A 5EC40A46 FF0AFDE8 Ò»..F.ő^.&....Ä-.»..uÚ.^.&.?%t.Ő 000060
46881B30 A31B3AA3 1B16A31B 20A31B4E A31B4816 891B46A3 991B26A3 C02B04C4 ő.+âÈ&..ÈF...H.ÈN.È .È..È:.È0..F 000080
0A5E880A 46FF0010 1B2406C7 00011B22 06C71B1C A31B28A3 1B36A31B 3CA398F8 ½.È<.È6.È(.È..ú."...ú.$....F..^. 0000A0
0A7E8B3F 740406FD 87F6D888 98078A26 0A5E880A 46FF1B3C 06FF0775 2A3F8026 &.?*u...<..F..^.&....Ä-.»..t?.-. 0000C0
8B98058A 264718 3A 0E8930E9 83C803E1 D11B3A0E 0302E1C1 1B3A0E8B 98058A26 &.....:.èÄ...:.ÌÄ.à.Õ0..:.G&.... 0000E0
260A5E8B 1B2006FF 04EB1B36 06FF0674 C90B0C46 8C0A7E89 D8750406 FD87F6D8 Ä-.»..uÄ.~..F..èt...6.Š... ..^.& 000100
98078A26 0A5E880A 46FF0010 1B2406C7 900AEB09 74004E3D 08740046 3D98078A ...=F.t.=N.t.Š..ú.$....F..^.&... 000120
1B2206C7 900AEB55 7400703D 6874006C 3D007400 68306474 00503D3D 74004C3D =L.t==P.td=h.t.=l.th=p.tUŠ..ú.". 000140
E8002005 98078A26 0A5E884D 740106FD 87F6D888 98078A26 0A5EC40A 46FF0001 ...F.ő^.&....Ä-.»..tM.^.&.... .Š 000160
9003E820 44800674 0106FD84 F61B7466 FE83F08B 98078A26 0A5E880A 46FF9048 H..F..^.&....Þ.±ft.-.»..t..D Š.. 000180
E80A46FF 90AAE80A 4EFFAFE8 00021B22 06C70875 67FE8305 7465FE83 F08BC688 .ő.Þ.±et..±gu.ú."...ŠE.N.Š¯..F.Š 0001A0
3F80260A 5E880A46 FF1B2806 FF0085E9 03745BFE 83F08B98 078A260A 5EC490ED Ú.ő^.&....Þ.±(t.Ő....(..F..^.&.? 0001C0
C4830C0E 020A9A1B 3236FF1B 3436FF50 98F8468A 0100680A 46FFF846 FE06755E ^u.±F½.F.h...F½.P.64..62.......ő 0001E0
```

Dump of file SATURN:[PCCOMMON.DUMP.DLL]TBE.TMP;1 on 18-APR-1990 10:53:12.46
File ID (929,12,0)   End of file block 62 / Allocated 64

Virtual block number 32 (00000020), 512 (0200) bytes

```
8826F846 8A1B323E C4D88898 078A260A 46FF3275 503F8026 0A5EC401 F8768008 ..v½.ő^.&.?]u2.F.&....Äő>2..F½&. 000000
0A46FF01 8826F846 8A1B323E C4D88898 078A261C 745D3F80 260A5EC4 901DEB01 .Š..ő^.&.?]t.&....Äő>2..F½&...F. 000020
009EE903 7469FE83 F08BC02B 02EB0073 B8057400 3F80260B 75003F80 260A5EC4 ő^.&.7.uÜ&.7.t.¦s.Š.+â.Þ.±it.Ő.. 000040
FF04752D FE831475 2BFE8305 742DFE83 F08808C2 E80E08F6 E80E0001 1B3006C7 ú.0....Ò-..Òô..Þ.±-t..±+u..±-u.. 000060
0C482364 9A561B18 36FF1B1A 36FF1B44 0EFF9016 EB1B4E06 FF1B3A0E FF1B2606 .&...:...N.Š....D..6...6..V.d#H. 000080
58FE8305 7478FE83 F08B087A E80E1B4E 06FF3875 30FE83F0 8B0889E8 0E06C483 .ő..Ò...Þ.±0u8..N..Òz..Þ.±xt..±X 0000A0
1C06FF06 C4830C66 23649A56 1B1836FF 1B1A36FF 1B440EFF 9037EB00 78BE0675 u./x.Š7...D..6...6..V.d#f..ő.... 0000C0
F60B0064 BE06C483 08AB2364 9A561B18 36FF1B1A 36FF1B44 0EFF1BEB 006FBE1B ./o.Š...D..6...6..V.d#¨..ő./d..- 0000E0
75001B36 3E830E7C A7FF2E93 C003023D E9037600 153D0063 20C68B02 75E90375 u.Õu..6-c.=..v.Ő=..â...Ï|..>6..u 000100
0A6A1B16 06FFF2EB 016A0202 E902C483 027EE80E 006A1836 A31B3AA3 0001B809 .j..È:.È6.j..Ò-..ő.Ő..j.Š·....j. 000120
1E8C1B4A A31B5088 18421689 1B40A31B 2E16881B 2CA1F6E8 086AEAEB 03ACE80E .Ò¯.Šõj.Š-Å,.....Èə...B.¦P.ÈJ... 000140
46890257 8B26078B 261B401E C4137510 1B243E83 1B2E1E8C 1B2CA31B 4AB81B4C L.¡J.È,......>$..u.ő.ə.&..&.W..F 000160
1B223E83 02C48303 57E80E10 6AFE5E8C FC468907 8B261B40 1EC400EB FE5689FC •.V±Š.ő.ə.&...F•.^±j..ÒW..ő..>". 000180
2CA31B4A 881B4C1E 8C1B4AA3 1B548B1B 3E0EFF04 75001B3C 3E830084 E9037402 .t.Ő...><..u...>.¦T.ÈJ...L.¡J.È, 0001A0
C4830312 E80E106A 1B46A31B 48A3C02B 2A753AFE 83F08B07 67E80E1B 2E1E8C1B ......Òg..Þ.±:u*+âÈH.ÈF.j..Ò...ő 0001C0
36FF1B44 0EFF9090 3BEB0257 89260789 261B5616 0B1B54A1 1B50168B FC5EC402 .ő^=..P.ÀT...V.&..&.W.Š;....D..6 0001E0
```

Dump of file SATURN:[PCCOMMON.DUMP.DLL]TBE.TMP;1 on 18-APR-1990 10:53:12.46
File ID (929,12,0)   End of file block 62 / Allocated 64

Virtual block number 33 (00000021), 512 (0200) bytes

```
0374001B 383E8301 61E90374 001B3E3E 8306C483 0E322364 9A561B18 36FF1B1A ...6..V.d#2..ő..>>..t.Õa..>8..t. 000000
A1021B40 06832675 001B3C3E 83078926 1B50A1FC 5EC49001 81E9FFFF B80157E9 ÕW.¡..Õ...ő^•ÀP.&...><..u&..ə..À 000020
900009E9 021B2C06 8300E1E9 0374101B 243E831B 2E16891B 2CA31B42 16881B40 ə...B.È,......>$..t.ÕÃ...,..Õ).. 000040
1B1C3E83 0085E903 74001B4E 3E839000 C7E91B2E 16891B2C A31B4216 881B40A1 Àə...B.È,.....Õú...>N..t.Ő...>.. 000060
2DFE8315 752BFE83 05742DFE 83F08B06 9FE80E06 D3E80E00 011B3006 C77E7500 .u-ú.0....ÒÆ..Ò...Þ.±-t..±+u..±- 000080
9A561B18 36FF1B1A 36FF1B44 0EFF9090 17EB1B4E 06FF1B3A 0EFF1B26 06FF0475 u...&...:...N.Š.....D..6...6..V. 0000A0
58FE8305 7478FE83 F08B065A E80E1A75 30FE83F0 8B0665E8 0E06C483 0E6C2364 d#l..ő..Òe..Þ.±0u..ÒZ..Þ.±xt..±X 0000C0
C4830977 23649A56 1B1836FF 1B1A36FF 1B440EFF 1B1C06FF 19EB1B4E 06FF0675 u...N.Š.......D..6...6..V.d#w..ő 0000E0
0EBF0EBF 0EBF0EBF 0EBF0E76 0E760E76 0CAE0C8A 2CEB03CA E80EFE3A E9106A06 .j.Õ:±.Òò.Š,..Û.v.v.v.¢.¢.¢.¢.¢. 000100
FF2A7500 1B2A3E83 0DE20EBF 0EBF0CAE 0EBF0CA6 0EBF0EBF 0C8A0C86 0CAA0EBF ¢.^.Ñ.ɒ.¢.¢.Ì.¢.Û.¢.¢.ā..>*..u*. 000120
F08802C4 83059BE8 0E509807 8A260A5E C42B7400 3F80260A 5EC49041 EB1B3806 .8.ŠA.ő^.&.7.t+ő^.&...P.Ò...ő..Þ 000140
902BEB1B 3EA1FEA9 E9037500 1B383E83 0A75001B 3E3E8311 7401FE83 1C74F60B .-t..±.t..>>..u..>8..u.Õ`±Å>.Š+. 000160
0A74001B 3C3E83D0 75001B2A 3E830E75 1B3E0639 1B1EA10A 46FFFFFF 1B1E06C7 ú......F.À..9.>.u..>*..uÅ.><..tÕ 000180
261B2C1E C4137510 1B243E83 56570000 0AC8CBC9 5F5E90FA 9BE91B1E A31B3EA1 À>.È..Õ.•.^ èùà...WV.>$..u.ő.,.& 0001A0
5688FC46 88FE5E8C FC468907 88261B2C 1EC400EB FE5689FC 46890257 8B26078B ..&.W..F•.V±Š.ő.,.&...F•.^±.F•.V 0001C0
83021B2C 06830575 101B243E 83021B2C 06831175 001B3C3E 83F85689 F64689FE ±.F-.V½.><..u...,...>$..u...,... 0001E0
```

```
Dump of file SATURN:[PCCOMMON.DUMP.DLL]TBE.TMP;1 on 18-APR-1990 10:53:12.46
File ID (929,12,0)   End of file block 62 / Allocated 64

Virtual block number 34 (00000022), 512 (0200) bytes

 9026EB06 7E8B0002 E9037400 18203E83 0550E80E 0475001B 283EB30B 7400067E -..t..>(..u..ÒP..> ..t.Õ#..-.$&. 000000
 26C68BFC 5EC40B75 001B3C3E 833974C0 0BD8F7C0 1B01F980 C88B0824 06FD848A ..».$..à.'..ä¼Ä.ât9.><..u.á^•.6& 000020
 74001B28 3E830974 FF0B1674 40F08B04 DFE80E1F 74C00B05 4DE80EFC 46FF0788 ...F•.ÒM..ât..ÒÒ..Þ@t...t).>(..t 000040
 3E834674 00067E83 904DEB1B 2A06FF07 75FFFE83 90C4EB98 008A261B 321EC4BF ¢á.2.&...Šá..±.u...*.ŠM..-..tF.> 000060
 EBD8F7C0 18013B80 261B321E C40F7400 18283E83 2375001B 3A3E832A 74001836 ó..t*.>:..u#.>(..t.á.2.&.8..ä¼ÄŠ 000080
 E423649A 561B1836 FF1B1A36 FF1B440E FF1574C0 08000825 E42A06FD 848A900A ....».*ðX...ât...D..6...6..V.d#ð 0000A0
 831B3E06 FF1174F8 56390575 F64639FE 5688FC46 8B217500 1B3C3E83 06C48310 ..á..><..ul.F•.V±9F-u.9V½t...>.. 0000C0
 0374001B 163E8306 76885657 000006C8 CBC95F5E 0007C626 FC5EC407 7400067E -..t.á^•&6..^_èùà...WV.v..>...t. 0000E0
 E901B0E9 0374001B 3C3E830D 74001B20 3E830452 E80E0475 001B303E 83013DE9 Õ=..>0..u..ÒR..> ..t..><..t.Õ¯.Õ 000100
 742DFF83 F88B03F6 E80E00BB E9037400 1B1C3E83 00C5E903 7400184E 3E83019C ...>N..t.Õ¢..>...t.ÕE..Ò-..½..-t 000120
 E9F82B00 30889000 98E91B3A 0EFF1B26 06FF0475 2DFF8300 AEE90374 2BFF8308 ...+t.ÕÙ...-u...&...:.Õ...¡0.+½Õ 000140
 440EFF15 74FFFF83 67EB10FD 275E9A1B 4668036A 0C7D38FF 834D7508 FE830080 ...±.uM..8).j.hF..^'».Šg...t...D 000160
 8B1B46A1 00B0E903 75001826 3E8306C4 83119423 649A571B 1836FF1B 1A36FF18 ..6...6..W.d#...á..>&..u.Õ¯.ÀF.. 000180
 16881846 A1B07404 06FD85F6 009BE91B 4816891B 46A30AF7 00028308 F71B4816 .H.¼Ä.#.¼ÖÈF...H.Õ..-.»..t§ÀF... 0001A0
 831B4816 891B46A3 02D1E001 18481613 18460603 F875C9FE D2D1E001 02B11848 H.Ý.1Äì@±èu½..F...H.1Äì@ÈF...H.. 0001C0
 E90375C0 08039BE8 0EF88B03 3BE80E1B 1C06FF1B 4816111B 46060199 C78830EF ÿ0.ú...F...H......Ò;..½.Ò...âu.Õ 0001E0

Dump of file SATURN:[PCCOMMON.DUMP.DLL]TBE.TMP;1 on 18-APR-1990 10:53:12.46
File ID (929,12,0)   End of file block 62 / Allocated 64

Virtual block number 35 (00000023), 512 (0200) bytes

 4668046A FF46E903 7410FE83 FF64E903 758006FD 85F6FF6E E90375FF FF83FF76 v....u.Õn.-.»..u.Õd..±.t.ÕF.j.hF 000000
 FF1DE900 57B8FF20 E9037502 06FD85F6 20C78303 740106FD 85F6007A 275E9A1B ..^'z.-.»..t..ú -.»..u.Õ .¡W.Õ.. 000020
 74001B16 3E830775 00181C3E 837C7500 1B3C3E83 00001848 06C71B46 A31B44A1 ÀD.ÈF.ú.H....><..u|.>...u..>...t 000040
 1B2C1EC4 900EEBFE 5689FC46 8902578B 26078B26 1B2C1EC4 1475101B 243E835D ].>$..u.á.,.&..&.W..F=.V±Š..á.,. 000060
 57892607 89261B48 16881846 A1FC5EC4 1475021B 223E83FE 5E8CFC46 89078B26 &...F•.^±.>"..u.á^•ÀF...H.&..&.W 000080
 06831B3C 06FF04EB 1B3E06FF 0675001B 163E8307 89261846 A1FC5EC4 900AE802 .Š..á^•ÀF.&...>...u...>.Š...<... 0000A0
 0E0000F6 46C75657 000052C8 90C8C95F 5E021B2C 06830575 101B243E 83021B2C ,...>$..u...,..^_èù.àR..WVúF-... 0000C0
 568CF846 B9B4468D 9001C4E9 010BE903 74001B3C 3E830E74 001B203E 83027DE8 Ò)..> ..t..><..t¯ÕÄ.Õ6...FÇ.F½.V 0000E0
 752DFE83 1A752DFE 8305742B FE83F08B 0220E80E B05689AE 46890040 05D28CFA ª.#.@..FÛ.V¯.Ò ..Þ.±+t..±-u..±-u 000100
 8BAE468B 901EEBF6 7E8BF08B 01FCE80E 1B3A0EFF 078826C6 8BF846FF F85EC40B .á^½.F½.6&....:..Ò•..Þ.—Š...FÛ. 000120
 C4830172 E80E56F0 8B01D9E8 0EF846FF 078826C6 8BF85EC4 471E73F8 46398056 V¯9F½s.Gá^½.6&...F½.Ò1..ÞV.Òr..á 000140
 3A73F846 39805688 AE468845 74C00802 25E80E4D 752EFE83 F67E89D7 75C00802 ..âu•.—.±.uM.ÒX..âtE.FÛ.V¯9F½s: 000160
 26C688F8 5EC4471E 73F84639 B05688AE 46889018 EB078826 C688F846 FFF85EC4 á^½.F½.6&..Š...FÛ.V¯9F½s.Gá^½.6& 000180
 037500F6 7E83F67E 890775C0 0B02C483 0120E80E 56F08B01 87E80EF8 46FF0788 ...F½.Ò...ÞV.Ò ..á..âu•.—.—.u. 0001A0
 6873F846 3980568B AE46B873 74C00801 C5E80E7B 7545FE83 057465FE 830085E9 Õ...±et..±Eu(.Òé..âts.FÛ.V¯9F½sh 0001C0
 080197E8 0E41752B FE830574 2DFE83F0 8B0141E8 0E078826 C688F846 FFF85EC4 á^½.F½.6&...ÒA..Þ.±-t..±+uA.Ò... 0001E0

Dump of file SATURN:[PCCOMMON.DUMP.DLL]TBE.TMP;1 on 18-APR-1990 10:53:12.46
File ID (929,12,0)   End of file block 62 / Allocated 64

Virtual block number 36 (00000024), 512 (0200) bytes

 16EB0788 26C688F8 46FFF85E C42373F8 46398056 8BAE468B 2E752DFE 833974C0 ât9.±-u..FÛ.V¯9F½s#á^½.F½.6&..Š. 000000
 8FE80E56 F08B00F6 E80EF846 FF078826 C688F85E C41D73F8 46398056 8BAE468B .FÛ.V¯9F½s.á^½.6&...F½.Ò-..ÞV.Ò. 000020
 3C3E8306 C4831494 23649A56 1B1836FF 1B1A36FF 18440EFF D875C00B 02C48300 ..á..âuÄ..D..6...6..V.d#...á..>< 000040
 26078826 1B2C1EC4 1475101B 243E8300 07C626F8 5EC45174 00F67E83 6875001B ..uh.—.tQá^½&6...>$..u.á.,.&..& 000060
 76FF5016 B4468DFE 5E8CFC46 89078826 1B2C1EC4 900EEBFE 5689FC46 8902578B .W..F=.V±Š..á.,.&...F•.^±.FÇ.P.v 000080
 021B2C06 831B3E06 FF0AC483 06EA1EFF 261A3206 8E500002 251822A1 FC76FFFE ±.v•À".X..P..2.&..ð..á...>....,.. 0000A0
 FD87F606 5E8B1874 FF067E83 000000C8 CBC95F5E 021B2C06 83057510 18243E83 .>$..u...,..^_èùà....-..t..^.-.» 0000C0
 8B0031E8 0E560000 02C8CBC9 C02B9003 EB0001B8 0674C00B 00AEE80E 0E740406 ..t..ÒÙ..ât.¡¯.Š..+âèùà...V.Ò1.. 0000E0
 1B1836FF 1B1A36FF 18440EFF 18EBFFFF B80575FF FE8322EB C02B0475 06763BF0 Þ;v.u.+âŠ".±.u.¡..Š...D..6...6.. 000100
 26117804 4FFF261B 181EC41B 4406FF56 90CBC95E 0001B806 C48314C8 23649A56 V.d#à..á.¡..^èù.V..D.á...&.0.x.& 000120
 90CB5E04 C48314FE 21E89A53 1B1A36FF 0DEBE42A 048A2602 478E2607 FF26378B .7&..&.G.&..*ðŠ..6..S.Ò1±..á.^ù. 000140
 0EFF9016 EB1B2A06 FF0775FF FE83F375 0806FD84 F6F08BFF C7E80E56 000002C8 à...V.Òú..Þ-.»..u#.±.u...*.Š.... 000160
 0001B805 75001836 3E83CBC9 5E06C483 102F2364 9A561B18 36FF1B1A 36FF1844 D..6...6..V.d#/..á.^èù.>6..u.¡.. 000180
 B813C81F C69A000A B8EC8B55 90CBC02B 90EEEB1B 3A0EFF07 7E001B3A 3E8310EB Š..>:..-...:.ŠY.+âù.U.&¡...6.à.¡ 0001A0
 891B5AA3 08568806 46881B76 16891B74 A3105688 0E46881B 861E8C1B 84A31B8A ..È.......F..V.Èt...v..F..V.ÈZ.. 0001C0
 011B8206 C70308E9 037425F6 7E80038D E900001B 7E06C700 001B8006 C71B5C16 .\.ú.....ú.-...Õ...—Xt.Õ..ú.... 0001E0
```

```
Dump of file SATURN:[PCCOMMON.DUMP.DLL]TBE.TMP;1 on 18-APR-1990 10:53:12.46
File ID (929,12,0)   End of file block 62 / Allocated 64

Virtual block number 37 (00000025), 512 (0200) bytes

06C71B72 A31B58A3 1B5EA31B 7BA31B7A A31B62A3 1B7CA31B 60A31B64 A3C02B00 .+âÈd.È'.È|.Èb.Èz.Èx.È^.ÈX.Èr.ú. 000000
3F80260A 5E8B903E EB00301C EA06C70A 46FF4975 30017F80 260A5EC4 00201CEA õ. .á^.&...0uI.F.ú.ö.0.$>..^.&.? 000020
7806FF1A 75001B64 3E830E75 203F8026 9028EB00 001B7806 C71B6406 FF0D752B +u...d.ú.x...$(.&.? u..>d..u...x 000040
078A260A 5E8B0A46 FF1B7206 FFC7752D 3F80260A 5EC40DEB 1B5806FF 9014EB1B .Š....X.Š.á^.&.?-uú..r..F..^.&.. 000060
468908C4 8308C7E8 0E1B8868 1E0A76FF 0C76FF00 75C00802 C4830978 E80E5098 .P.Òx..á..âuì.v..v..h...Òú..á..F 000080
3E830D74 001B723E 831B88A3 D8F71B88 A11B7206 FF0C7D00 1B883E83 0C56890A ..V..>...)...r.À..¥ÄÈ...>r..t..> 0000A0
1E0A76FF 060A46FF 1B7A06FF 2D752E3F 80260A5E C400201C EA06C706 75301CEA õ.0u.ú.õ. .á^.&.?.u-..z..F...v.. 0000C0
7A0EFF00 011B8206 C70A7D00 1B823E83 0C56890A 468908C4 83087BE8 0E1B8268 h...Ò(..á..F..V..>...).ú.......z 0000E0
1B6206C7 0675006C 3D287400 683D4074 004E3D3D 7400463D 98078A26 0A5EC41B .á^.&...=F.t==N.tə=h.t+=l.u.ú.b. 000100
4EE91C75 003F8026 0A5EC40A 46FF0375 4C3F8026 0A5EC409 75001B62 3E830002 ...>b..u.á^.&.?Lu..F.á^.&.?.u.ÕN 000120
46899807 8A26C8EB 00081B62 06C7D0EB 00101B62 06C7D8EB 00011B62 06C79002 ..ú.b...ŠÁú.b...ŠÁú.b...Šà&....F 000140
78740069 3DF8468B 20F84683 1B6006FF 08750058 3D057400 47300A74 00453DF8 ½=E.t.=G.t.=X.u...'..F½ .F½=i.tx 000160
3E839001 59E90140 E9037500 253D0152 E9037E01 3FE90375 00633D01 91E9037E ~.Õ..=c.u.Õ?.-.ÕR.=%.u.Õə.ÕY...> 000180
C4261874 1EC40DE8 00000247 C7260789 261B7EA1 1FC4261B 741EC415 75021B62 b..u.á.t.&á.À-.&..&úG...Š.á.t.&á 0001A0
01B0E903 7400187E 3E830170 E9037500 1B803E83 041B7406 83078926 1B7EA11F .À-.&....t...>...u.Õp..>-..t.Õ§. 0001C0
0A6A0000 1B5806C7 1B7C06FF 01ACE9FF FFB801AF E9037520 0A47F626 1B5A1EC4 á.Z.&-G. u.Õ£.¡..Õ¯...|.ú.X...j. 0001E0

Dump of file SATURN:[PCCOMMON.DUMP.DLL]TBE.TMP;1 on 18-APR-1990 10:53:12.46
File ID (929,12,0)   End of file block 62 / Allocated 64

Virtual block number 38 (00000026), 512 (0200) bytes

00041B82 06C71B7A 06FF1B60 06FF1B5E 06FFF2EB 086A90C3 EB02C483 019EEB0E .Ò...á.Šú.j.Š·..^...'...z.ú..... 000000
A128741B 880639FA 46891B62 A3C02B7A 74011B62 3E830081 E9037508 1B623E83 .>b..u.Õ...>b..tz+âÈb..F'9...t(À 000020
C00B1B88 A1051B88 2E839090 13EB0000 1B8806C7 0A74001B 723E83FA 46891B88 ...F'.>r..t.ú.....Š........À...â 000040
7E8302C4 83048DE8 0E3A6A02 C4830130 E80E106A 021B7406 831B88A3 C02B027D ).+âÈ....t..j..ÒO..á.j:.Ò...á..~ 000060
9007EB1B 88A3C02B 027DC00B 1B88A300 052DFA46 8B157400 1B723E83 227400FA '.t".>r..t..F'-..È...â).+âÈ..Š.. 000080
3FE9106A FF10E902 1B740683 02C48300 F1EB0E10 6A041B74 2E830000 1B8806C7 ú.......t..j..Òþ..á...t..Õ..j.Õ? 0000A0
0428EB0E 256AFF2A E90349E8 0EF876FF F4EB016A 90FF39E9 026EEB0E 006A90FF ..j..Òn.Õ9..j.Š¶.v½.ÒI.Õ*.j%.Ò(. 0000C0
0A468B09 74001B62 3E830A7E 00673D05 7C00653D FF0CE903 7500643D 90FF21E9 ÕI..=d.u.Õ..=e.|.=g.-Õ.>b..t..F. 0000E0
6F3DFE80 E9037500 6E3D903A EBFE5689 FC468940 0C568B0A 46880A4E FF0C568B .V..N..F..V.ə.F=.V±Š:.=n.u.Õ.±=o 000100
03750078 3DFEB9E9 03750075 3D8F7400 733DFEE0 E9037500 703DFEE4 E9037500 .u.Õö±=p.u.ÕÀ±=s.t.=u.u.Õ¿±=x.u. 000120
EC75253C 0474C00A F6468807 8A26FC5E C4FC46FF 9034EB0A 46FF9081 EBFF79E9 Õy.ŠŸ..F.Š4..F=á^=&...F-.ât.<%uš 000140
C40C5689 0A4689FE 5688FC46 8806C483 044CEB0E 0A76FF0C 76FF500A 462BC38B .ü+F.P.v..v..ÒL..á..F=.V±.F..V.á 000160
1B7EA1FE 51E90374 200A47F6 261B5A1E C4FC63E9 0374C00A F6468807 8A260A5E ^.&...F-.ât.Õc=á.Z.&-G. t.ÕQ±À~. 000180
831B7C06 FF04740A 067E8300 201CEA06 C7067400 1B7A3E83 56570000 12C8C8C9 èùà...WV.>z..t.ú.õ. ..~..t...|.. 0001A0
0683FE56 89FC4689 02578B26 078B261B 741EC419 75101B62 3E830774 021B623E >b..t..>b..u.á.t.&..&.W..F=.V±.. 0001C0
1EC40EEB 0000FE46 C7FC4689 078B261B 741EC411 7400187C 3E83902C EB041B74 t..Š,..>|..t.á.t.&...F=úF±..Š.á. 0001E0

Dump of file SATURN:[PCCOMMON.DUMP.DLL]TBE.TMP;1 on 18-APR-1990 10:53:12.46
File ID (929,12,0)   End of file block 62 / Allocated 64

Virtual block number 39 (00000027), 512 (0200) bytes

0674FE46 0BFC468B 0E74001B 583E8302 1B740683 FE5689FC 46899907 8B261B74 t.&....F=.V±..t...>X..t..F=.F±t. 000000
83317500 1B7C3E83 F45689F2 46891B86 16881B84 A11CE8A3 C0289003 EB06468B .F.Š..+âÈÒ.À.......F·.V¶.>|..u1. 000020
00D283D8 F7FE568B FC46882D 07C626F2 46FFF25E C410750A 067E832B 7D00FE7E ~±.)+.~..u.á^·.F·&ó.-.F=.V±¼Ä.ø. 000040
76FFFA5E 8CF84689 1B668800 00F646C7 9006EB00 01F646C7 FE5689FC 4689DAF7 ¼Ö.F=.V±úF-..Š..úF-..¡f..F½.^'.v 000060
469AF876 FFFA76FF 4574001B 7A3E830A C4831A11 27309AFC 76FFFE76 FF501E06 ..P.v±.v=.0'...á..>z..tE.v'.v½.F 000080
00001CE8 06C70675 081CE83E 83007EC9 08F04E89 C82B1882 0E8804C4 83152D00 .-..á.....+à.Nþ.è-..>Ò..u.ú.Ò... 0000A0
600E88F0 4E89F446 8CF27E89 F47FC008 49C18847 3005C626 05E8F27E C4F04E88 .Nþá-·Š.&ó.0G.èI.á.¶.-·.F¶.Nþ..' 0000C0
8026F846 FF46202C 80037C61 3C0774C9 08048807 8A26F85E C4F276C5 EE5E8C1B ..^Ÿév·á^½&.....èt.<a|.., F.F½&. 0000E0
F67E8308 741B7806 0B1B64A1 1475001B 7C3E83EE 5E8EF45E 8CF27689 E375003F ?.uÐ.v·.^¶.^Ÿ.>|..u.Àd...x.t..— 000100
00067E83 56570000 10C8C8C9 5F5E02C4 8302FFE8 0E50C02B 02E80001 B8057500 .u.|..Š.+âP.Ò...á.^_èùà...WV.~.. 000120
74081B62 3E83008F E9021B74 0683FA56 89F84689 1B76168B 1B74A100 01BE1B74 t./..Àt...v..F½.V'.¯t..Õ...>b..t 000140
4689FC46 89078B26 1B741EC4 10EBFA56 89F84689 02578B26 078B261B 741EC413 .á.t.&..&.W..F½.V'Š.á.t.&...F=.F 000160
7E83900A EB04A4B8 1575FA46 0BF8468B 0E74081B 623E8304 1B740683 FA5E8CF8 ½.^'..t...>b..t..F½.F'u.¡È.Š...~ 000180
741B7A36 39F62BF4 5689F246 89FA568B F8468BFA 5E8CF846 8904ABB8 097500FC =.u.¡¨..F½.^'.F½.V'.F·.V¶+-96z.t 0001A0
F25EC446 90EDEB10 7ECE3B46 1574003F 8026F246 FFF25EC4 900EEB1B 820E8B1C .....Š..á^·.F·&.?.t.F;ö-.Š·¹.Fá^· 0001C0
FF5602C4 830159E8 0E570875 001B723E 83FE2B1B 883E8BF3 75003F80 26F246FF .F·&.?.uµ.>..+±.>r..u.W.ÒY..á.V. 0001E0
```

Dump of file SATURN:[PCCOMMON.DUMP.DLL]TBE.TMP;1 on 18-APR-1990 10:53:12.46
File ID (929,12,0)   End of file block 62 / Allocated 64

Virtual block number 40 (00000028), 512 (0200) bytes

```
90CBC95F 5E02C483 013CE80E 57087400 18723E83 06C48301 83E80EF8 76FFFA76 v*.v½.Ò°..á..>r..t.W.Ò<..á.^_èù. 000000
EB01B005 7547067E 83067467 067E83FE 5689FC46 891B7616 8B1B74A1 000006C8 à...Àt...v..F•.V±.~.gt..~.Gu.¯.Š 000020
75001B82 3E830074 00FA7E80 00061B82 06C70675 001B7A3E 83FA4688 C02A9003 ..*á.F*.>z..u.ú......~*.t..>...u 000040
FC76FFFE 76FF1B84 36FF1B86 36FF0676 FF1B8236 FF1B6036 FF00011B 8206C706 .ú......6'..6...v..6...6...v±.v• 000060
8436FF1B 8636FF14 75001B58 3E831B74 00FA7E80 0EC48306 E21EFF26 1A34068E ..4.&..ã..á..~*.t..>X..u..6...6. 000080
FF1B8636 FF147500 18823E83 1B74001B 583E8304 C48306E6 1EFF261A 34068E1B ...4.&..|..á..>X..t..>...u..6... 0000A0
78060B1B 64A10000 1CE806C7 081B7406 8304C483 06EE1EFF 261A3406 8E1B8436 6....4.&..Ÿ..á...t..ú.Ò...Àd...x 0000C0
C02B02EB 0001B805 74C00804 C48306F2 1EFF261A 34068EFC 76FFFE76 FF1B741B .t..v±.v•..4.&..·..á..ât.¡..Š.+â 0000E0
468A1478 044FFF26 1B5A1EC4 3C75001B 803E8356 000000C8 90CBC901 29E80E50 P.Ò).èù.à...V.>...u<á.Z.&.O.x..F 000100
831CE907 F89A0676 FF531B5C 36FF10EB E42A0488 2602478E 2607FF26 37B82606 .&.7&..&.G.&..*ôŠ..6\.S.v..½.Ò.. 000120
75001B80 3E835657 000002C8 90CBC95E 1B7E06FF 9005EB1B 8006FF07 754006C4 á.âu.....Š....~.^èù.à...WV.>...u 000140
754006C4 831D5107 F89A1CEA 36FF1B5A 36FF1B5C 36FF1BEB 507EF60B 06768B57 W.v..~~PŠ..6\..6Z..6õ..½.Q..á.âu 000160
2607FF26 3F8B261C EAA0047B 044FFF26 1B5A1EC4 1E7EC00B 4EC68B1B 8006FF04 ......óN.â~.á.Z.&.O.xå.õ.&.7&..& 000180
000002C8 CBC95F5E 1B7E0601 06468B07 75001B80 3E8304EB E42A0588 2602478E .G.&..*ôŠå.>...u..F...~.^_èùà... 0001A0
F89A5098 078A2606 5EC41B5A 36FF1B5C 36FF22EB 5E75001B 803E830A 768B5657 WV.v..>`...u^Š".6\..6Z.á^.&...P.½ 0001C0
78044FFF 261B5A1E C42574C0 084EC688 0646FF1B 8006FF04 754006C4 831DC307 .ù..á.âu......F..óN.ât%á.Z.&.O.x 0001E0
```

Dump of file SATURN:[PCCOMMON.DUMP.DLL]TBE.TMP;1 on 18-APR-1990 10:53:12.46
File ID (929,12,0)   End of file block 62 / Allocated 64

Virtual block number 41 (00000029), 512 (0200) bytes

```
1B803E83 CAEBE42A 05882602 478E2607 FF263F8B 261B5A1E C4078A26 065EC4CD ëá^.&..á.Z.&.?&..&.G.&..*ôŠò.>.. 000000
F65689F4 46891B86 16881B84 A1560000 0CC8CBC9 5F5E1B7E 06010A46 88077500 .u..F...~.^_èùà...VÀ.......F¶.V- 000020
06762BF0 2BF84689 04C48319 FC00469A F476FF52 1B88368B FA4689FC 4689C028 +á.F•.F*.6.¯R.v¶.F.=..á..F½+Þ+v. 000040
8026F45E C4227500 1B723E83 4E017508 1CE83E83 08E802EE 83057510 1CE83E83 .>Ò..u..Ÿ.Š..>Ò..u.N.>r..u"á^¶&. 000060
EA3E83F8 4EFF02C4 83FE71E8 0E509807 8A26F446 FF127530 1CEA3E83 1975203F ?-u..>õ.0u..F¶&...P.Òq±.á..N½.>õ 000080
1CE83E83 0066E80E FA46FF07 7400067E 83187400 18723E83 077EF608 0B74301C .0t..~~..>r..t..~..t..F*.Òf..>Ò. 0000A0
830A7400 067E8302 C483FE7E E80E5629 75001872 3E830070 E80EFC46 FF077400 .t..F•.Òp..>r..u)V.Ò~±.á..~..t.. 0000C0
F676FFF8 76FF0040 E80E0475 00FC7E83 0A74001C E83E8300 39E80E04 7500FA7E ~*.u..Ò9..>Ò..t..~•.u..Òâ..v½.v- 0000E0
5E02C483 FE38E80E 5600201C EA06C70E 74001872 3E8306C4 83FE85E8 0EF476FF .v¶.Òç±.á..>r..t.ú.õ. .V.Ò8±.á.^ 000100
FDC8E80E 306ACB02 C483FD02 E80E5000 20B803EB 002B8805 74001B64 3E83CBC9 èù.>d..t.|+.Š.¡ .P.Ò0».á.ùj0.Òà» 000120
C483FDAA E80E5000 78B803EB 0058B805 74001B60 3E831775 101CE83E 8302C483 .á..>Ò..u..>'..t.|X.Š.|x.P.Ò`».á 000140
74068337 88261B74 1EC41275 2A3F8026 0A5EC400 01FE46C7 56570000 06C8CB02 .ùà...WVúF±..á^.&.?*u.á.t.&.7..t 000160
8A260A5E 8BF62B0A 46FFFFFF FE46C708 752D3F80 260A5EC4 9060EB0A 46FF021B ...F.Š'.á^.&.?-u.úF±...F.+-.^.&. 000180
06EBFB8B 00301CEA 06C70675 303C0A75 1B7A3639 3B7F393C 3F7C303C FA468807 ..F*<0|?<9.;96z.u.<0u.ú.õ.0..«Š. 0001A0
7D303D80 2647F18B 30E983C8 03E1D1CE 0302E1C1 CE8B9805 8A261B7F 393D8026 &.=9..&....öèÃ..öìÃ.à.Ò0.þG&.=0} 0001C0
04C8CBC9 5F5E0C56 880A468B 37892606 5EC4F08B EEF7FE46 880C468C 0A7E890F Ò.~..F..F±¼Ÿ.Þá^.&.7.F..V.^_èùà. 0001E0
```

Dump of file SATURN:[PCCOMMON.DUMP.DLL]TBE.TMP;1 on 18-APR-1990 10:53:12.46
File ID (929,12,0)   End of file block 62 / Allocated 64

Virtual block number 42 (0000002A), 512 (0200) bytes

```
F4750038 26117400 30802647 01E8FC7E C4064E8A FE5E8CFC 468904B2 88570000 ..W¡ý..F•.^±.N.á~•Š.G&.=.t.&8.u¶ 000000
56880646 88EC8855 90C8C95F C028FE46 8CFC7E89 9009EBFE 468CFC7E 890001B8 ¡...~•.F±Š...~•.F±+á_èù.U.š.F..V 000020
1E380B72 D82BDC88 5A590008 CA5DE58B D31B0A46 2BE8D3EA D3028EB9 0C5E8B08 ..^.¿..ÆõÆŠ+F..Æ.Í]ò¯.YZ.É+Ãr.;. 000040
D4885200 028B04B8 2EFF5152 E72AE9C0 33057540 04B8A1CB 5152E38B 057204BC ¥.r..DRQùÀ|.âu.3âÒ*ÒRQ..¡.´..R.â 000060
02300774 00013D40 B1127558 C00B0000 FFFF9A52 16501653 C4885087 0401A780 .Í1.ñP.áS.P.R......âXu.Ÿâ=..t.=. 000080
731A081E FFD833C2 8C1A0C06 C41EE31A 0A0E885A D4794B04 D18F0808 B1067500 .u.Ÿ...1.Kyâ2....D.á....ó3Ü....s 0000A0
1A14BF1A 14BE007C E81A14BF 1A14BE1A 081EFF00 038BC28C 1A1006C4 01AEE903 .õÜ.á....óÉ....../..¢..Ò|./..¢.. 0000C0
BF1A14BE D88E0893 B8C30000 FFFF9A20 67680E01 6A0B741A 183D1A14 B80073E8 Òs.¡..=..t.j..hg .....û¡...Ã/..¢ 0000E0
BF1A14BE 003AE81C ECBF1CEC BEEC8855 00002062 9A006A00 6A036A00 51E81A18 ..Òq.j.j.j..b ..U.š/š.¢š.Ò:./..¢ 000100
8A50C033 001AE81A 18BF1A18 BE0023E8 1A18BF1A 188EEC8B 5503E800 31E81A18 ..Ò1.Š.U.š/..¢..Ò#./..¢..Ò..3âP. 000120
08058804 EF830E73 F73BC31A 081EFF00 028807E3 1A0A0E8B 0000FFFF 9A500646 F.P.........D.£......ü;¼s..ÿ.... 000140
88168800 F0E90375 00883639 FF2BF62B 56570000 14C800C3 EEEB1DFF F2740245 E.t·..ŠŸû.à...WV+-+.96..u.Òþ.... 000160
214E26F4 9A049268 1EF676FF F876FF0C 6AF85689 F64689F2 5689F046 89C02B00 .+á.FÞ.V·.F-.V½j..v½.v-.h...¶&N! 000180
0CE847EA 75003F80 26F646FF F65EC400 8CE90376 7FFFFE81 461974C0 080AC483 .á..ât.F.±..v.ÒŸ.á^-.F-&.?.uõGŠ. 0001A0
2150269C 9A046A50 01458DBA 75003F80 26F65E88 F475003F 8026F646 FFF65EC4 á^~.F-&.?.u¶.^-&.?.u¤.E.Pj...&]! 0001C0
6074EE46 08EC4688 FE5689FC 468902C4 83219325 E19A56EE 5689EC46 8904C483 .á..Fš.VŸV.ÃX.!.á..F•.V±.Fš.FŸtm 0001E0
```

Dump of file SATURN:[PCCOMMON.DUMP.DLL]TBE.TMP;1 on 18-APR-1990 10:53:12.46
File ID (929,12,0)   End of file block 62 / Allocated 64

Virtual block number 43 (0000002B), 512 (0200) bytes

```
0492681E F076FFF2 76FF0C6A 06091689 06D7A3EE 568BEC46 8B6674C2 08FC468B .F•.ôtf.F$.VŸè■...\.j..v·.vÞ.h.. 000000
04EC4683 02578926 078926FE 568BFC46 8BEC5EC4 2C74C00B 0AC4831C AD26F49A .¶&Ü..á..ãt,á^š.F•.V±&..&.W..F$. 000020
8026F046 FFF05EC4 E8E80E74 C00A0788 26FC46FF FC5EC407 8A26F046 FFF05EC4 á^Þ.FÞ&..á^•.F•&...ât.ŠÒá^Þ.FÞ&. 000040
06468B56 000002C8 E526E900 02B890CB C95F5EA7 75003F80 26F05EC4 F475003F ?.u¶á^Þ&.?.uÏ^_èù.¡..Õ&Ià...V.F. 000060
74830A47 F626065E C4FE4689 13F205E0 D1C103E0 D1C88BF9 F7000CB9 9907FE2D -±..¿..‰ª.àîÁ.ĕîÁ.·..F±á^.&-G..t 000080
90E9E820 0A4F8026 0874020A 47F62606 5EC400B9 E9FFFFB8 0674400A 47F62607 .&-G.@t.¡..Õ¿.á^.&-G..t.&.O. ŠÕ. 0000A0
F9F7000C 899907FE 20C38B21 750C0A47 F626065E 8BFB2780 FE5E8B01 0A4F8026 &.O...^±.'«.^.&-G..u!.Û-±..¿..‰ª 0000C0
578B2606 478B2606 5EC412EB 04C48300 79E80676 FF060C75 0113F287 F606086B kÁ.-.·..u...v.Òy..á.Š.á^.&.G.&.W 0000E0
50E42A0B 478A2606 77FF2608 77FF2606 5EC40277 FFFE5E8B 02578926 07892608 .&..&.W..^±.w.á^.&.w.&.w.&.G.*ÕP 000100
80057400 047F8326 1C75FFFF 300574C0 08044789 26065EC4 08C48321 0E28189A ..(.!.á.á^.&.G..ãt.=..u.&....t.¯ 000120
8E2607FF 26378B26 044FFF26 90FF55E9 00000447 C7260A47 082610B0 9003EB20 Š..¯.&.G.&úG...ÕU..&.O.&.7&..&. 000140
C88BF9F7 000C8999 07FE2D04 468B19F0 06FF0000 04C8CBC9 5EE42A04 8A260247 G.&..*õ^èùà.....Þ..F.-±..¿..‰ª.à 000160
47892604 5EC402C4 83229325 E19A0200 68FE5E8C FC468913 F205E0D1 C103E0D1 ÎÁ.èîÁ.·..F•.^±h...Ã%."..á.á^.&.G 000180
4F802604 5EC49021 E8020002 47C726FC 5EC4080A 4F802611 74D00B08 57892606 .&.W..Åt.&.O..á^=&úG...Š|.á^.&.O 0001A0
478B2604 5EC40001 0247C726 FC5EC408 57892606 47892640 FE568BFC 468B040A ...F•.V±@&.G.&.W.á^=&úG...á^.&.G 0001C0
74FFFE83 06768B56 000000C8 C3C90000 0447C726 02578926 07892608 578B2606 .&.W.&..&.W.&úG...èùà...V.v..±.t 0001E0
```

Dump of file SATURN:[PCCOMMON.DUMP.DLL]TBE.TMP;1 on 18-APR-1990 10:53:12.46
File ID (929,12,0)   End of file block 62 / Allocated 64

Virtual block number 44 (0000002C), 512 (0200) bytes

```
5EC46FEB FFFF8805 74020A47 F6260774 800A47F6 26137501 0A47F626 085EC418 .á^.&-G..u.&-G..t.&-G..t.¡..Šoá^ 000000
47392602 578B2607 8B26085E C404C483 FF3AE853 06087508 47082606 478B2608 .&.G.&.G.u..SÒ:..á.á^.&..&.W.&9G 000020
26C6881F C4260FFF 260447FF 2607FF26 C9750004 7F83260A 75085739 26107506 .u.&9W.u.&....uè&..&.G.&..&á..6& 000040
F7000CB9 9907FE2D C38B1375 400A47F6 26010A4F 8026EF0A 67802608 5EC40788 ..á^.&.g.ÿ&.O..&-G.@u..û-±..¿..‰ 000060
3300098A 0B7204CF 1E38065E 8BEC8B55 C8C95EE4 2AC68B04 13F28F80 060868F9 ªkÄ...·...ó*õ^èùU.š.^.;.ü.r.¤..3 000080
855A5900 00FFFF9A 51160C76 FF0876FF 0A76FF53 CC8B04EC 8303C4E9 03B8E9C0 âÕ¡.Õá..š..äS.v..v..v..Q.....YZ. 0000A0
00098A08 7204CF1E 38065E8B 0CEC83EC 8B5500CB 5DE58BFD 04D1A780 91E175C0 àuÄ..Iî.».[]ù.U.š.š..^.;.ü.r.¤.. 0000C0
87F60000 24299A50 16F4468D 51414151 51C93353 12742004 D187F603 77E9C033 3àÕw.-.I. t.S3èQQAAQ.F¶.P.)$..-. 0000E0
F86689F2 88FA8856 57FCFC46 89FE4689 C0330856 C50A468E FA5E8C66 748004D1 î..tf.^ª.F.éV.3à.F±.F•=WV.ª.·.f½ 000100
3CAC0C4E 8B0716FA 8BD48BE2 2B00808A DC8B02EC 833B75AE F20AB049 E30C4E8B .N.DI¯.·Ûu;.š..Ê¤..+ã.å.ª...N.¯< 000120
EBFC46FF 0AB0AA00 1FE80375 FB3B00B0 009AE900 2BE8F4E2 AA1A74FB 3B00740A .t.;«t.¯ã¶Õ+.Õ..¯.;«u.Õ..·¯..F•Š 000140
CF8B1F06 1E515350 23051FC6 9AFFFCB8 7AEB0093 E9FA5E8E 5F5EE1EB 0014E8E2 ãÒ..ŠÃ^_.^ªÕ..Šz¡•..ó..#PSQ....ü 000160
0BFE5E01 F45E8811 75C00B00 0007EC9A 5016F446 8D51521E 53065E8B 1FE3CA2B +õD..^.Š.RQ.F¶.P.š....âU..^¶.^±. 000180
8A087500 09BA0001 30D07400 6D301874 C00808C4 831FC3FA 8B585B59 1F07740B Üt..Y[X.ªû..á..åt.=m.t.=..¤..u.¤ 0001A0
F803751A 3F80085E 8B0A5E8E 0E744004 0187F6FE 5E8E26EB F90020BA 03EB001C ..Š.¤ .ªŠ&.^±-.î.@t..^..^..?.u.½ 0001C0
5BE9CB5D E5880472 FA5E8E5F 5EF8668B FC462BFE 468806EB F9C03300 1CBA0EEB Š.¤..3ãªŠ..F±+F•.f½^_.^ªr..[]ùÕ[ 0001E0
```

Dump of file SATURN:[PCCOMMON.DUMP.DLL]TBE.TMP;1 on 18-APR-1990 10:53:12.46
File ID (929,12,0)   End of file block 62 / Allocated 64

Virtual block number 45 (0000002D), 512 (0200) bytes

```
071E0000 25019A50 16F4468D 51521E53 0856C51E EEE8C188 0475C908 0C4E8B02 ..N..èu..êŠŸ.éV.S.RQ.F¶.P..%.... 000000
08F44688 C2E80020 8AC7E800 1C8ACC75 00098A00 01300074 00603017 74C0081F ..åt.=m.t.=..¤..uä¤..Šù¤ .Šô.F¶. 000020
C4EC8855 00A3E8C0 33001C8A A6E80275 1A3F8026 DA8B0A74 40040187 F68775C0 àuñ-.].@t..Õ&.?.u.Š[¤..3ãŠÈ.U.šá 000040
73FFF130 06468B57 5602EC83 EC8B55CB 5DE58B01 FE4F8026 0574C308 C08C065E ^..å.ût.&.O±..[]ùU.š.š.VW.F.=þ.s 000060
FF087500 78E80574 0018E815 750082E8 19FCA312 740025E8 08750019 FC3E831E ..>•..u.Õ%.t.È•.Õ..u.Õ..t.Õx.u.. 000080
89FEE383 43065E88 0776065E 3900F088 CB50E588 5E5F02C4 8324E629 6E9A0676 v..n)]$.á._^.[]ùÈÞ.9^.v..^.C.D±. 0000A0
FE1687C2 883874FF FA8308C4 8326152B 1A9A5002 80510E4F 8D50501E C033FE5E ^±3ã.PP.O.Q¯.P..+.&.á..ª.tB.ô..± 0000C0
A3000A88 0C478948 480008A3 C033D88E FE5E8800 08A30A8E 0574020B 1A00A319 .È...@t..ÕÈ...^±.Ã3ãÈ..HH.G.¡..È 0000E0
1E8ED833 064E88C0 8ED88CC3 1FD88C00 06A30000 05000AA3 01478D00 02A30000 ..È...G.È.....È...Ä.û.Ä.â.N.3Û.. 000100
26C90646 9A0676FF 006A0876 FF006A56 00000AC8 C3D98EC1 8CD20B03 22E81A00 ..Õ"..@.è.\ùà...Vj..v.j..v..F.è& 000120
468902C4 8326E225 E19A56F8 7688902F EB99C028 0674FFFF C2F7FA56 89F84689 .F½.VªŠó..t.+á.Š/..v½V.Ã%ã&.á..F 000140
FE568BFC 468B9007 EB08C483 2641020A 9A50FE76 FF006A56 1274D008 FE5689FC •.V±.Åt.Vj..v±P...A&.á.$...F•.V± 000160
FE8BC803 D9F7AEF2 C033F788 067EC4D9 8827E30E 4E881E56 57EC8855 90C8C95E ^èù.U.šWV..N.D'.\á-..%3à·Ù%\.ù.± 000180
00CB5DE5 8B5F5E1F C188D1F7 49490474 0477FF45 3A26C933 FF448AA6 F30A76C5 év.µÎ.D.3è&:E.w.t.II%Î.è.^_.[]ù. 0001A0
4004D187 F60C7C00 FB83117D 04CF1E3B 065E88EC 8B550496 E900B357 56EC8855 U.šVW".Õ..U.š.^.;.ü.)..«.|¯-.î.@ 0001C0
AE2C349A 084E8B02 57B80788 065E88EC 8B5500CB 5DE58BC0 3302EB00 01B80574 t.¡..Š.3à.[]ù.U.š.^....W..N..4,Û 0001E0
```

Dump of file SATURN:[PCCOMMON.DUMP.DLL]TBE.TMP;1 on 18-APR-1990 10:53:12.46
File ID (929,12,0) End of file block 62 / Allocated 64

Virtual block number 46 (0000002E), 512 (0200) bytes

```
0C080C07 09060D05 18040203 02021601 000004CA 5DE58802 57890789 065E8826 &.^....W..[)ò.................... 000000
08590057 0D530052 02430041 02350212 1211001D 120F1600 160C0808 070A0C09 ..................S.A.C.R.S.W.Y. 000020
8904CDA3 16080000 0BD702CE 08A40084 09820A81 0A801606 09721C70 2060006C l.m p.r...........Ë.ö.ª.....Ëë.. 000040
0A0024B9 2780BB04 CDA3CB5D E58899FF FFB80008 E8CB5DE5 8899FFFF 8804C616 .6.¡....[]ùÒ..¡....[]ùËë.€.'¿$.. 000060
8A2E4301 76CA3C04 72BC3C43 0A76243C 0472133C F7E24343 1674073A 2E1875E4 ðu..:.t.CCã¼<.r.<$v.C<¥r.·>v.C.. 000080
87F64CE3 0C4E883F 7304CF1E 38065E88 C03308EC 83EC8855 00C304C6 A39B0147 G..Ëó.û.U.š.š.3ã.^.;.ü.s?.κ )L-. 0000A0
4942AA08 740A3C05 D1878A10 740804D1 87F6087E C40C4E8B D2335745 750204D1 Ï..uEW3Ø.N.á~.-.Ï..t...Ï.<.t.¯BI 0000C0
468BFF5E E90009BA 0674C008 5F0000FF FF9A5016 FA468D51 5706530A 05D187C6 6.Ï..S.WQ.F•.P......_.ât.¤..Õ^..F 0000E0
28E3C88B FE880876 C5071E57 56FB0401 A780CB5D E5880475 8004D187 F6C203FA •.ó-.Ï..u..[]ù.ÏÏ.«VW..év..±.àD( 000100
058805EB 0204D18F 80260875 1A3C1E74 C43AAC04 04D18F80 2606750A 3C800084 Ç..<.u.&..Ï..¯:át.<.u.&..Ï..Š... 000120
D187F626 E2EBE774 0A3C8007 7401F983 CB5DE58B 5E5F1F06 08462BC7 8BEAE247 Gãõ.ú+F..._^.[]ù.•.t..<.tÒŠã&-.Ï 000140
5F1F0607 74C00B00 00285F9A 5016FA46 80515016 F9468D53 1C75D808 24744004 .ât$.Úu.S.F•.PQ.F•.P._(...ât..._ 000160
75C00B00 0028E59A 5016FA46 8D515016 F9468D53 00F946C6 B6E80AB0 FEE7E95E ^ÕÒ±¯.ŠÑÓF•.S.F•.PQ.F•.P.Ï(...âu 000180
8050D8F7 5050FFFF B8531C75 0804D187 F6263574 010C7E83 3674FFFF FA46F7DC É%F•..t6.-..t5&-.Ï..u.S¡..PP%ÄP. 0001A0
00B00274 0A3C05D1 87BB26F9 468AFF6F E90F750A F97E8000 00246A9A 5016FC46 F•.P.j$...-•.u.Õo..F•&..Ï.<.t.¯. 0001C0
8B55CB5D E58801FE 4F800474 DB0B065E 8BEC8855 0099EBC5 750AF97E 80FF5BE9 Õ[..-•.uéŠ..U.š.^..Üt..O±..[]ùU. 0001E0
```

Dump of file SATURN:[PCCOMMON.DUMP.DLL]TBE.TMP;1 on 18-APR-1990 10:53:12.46
File ID (929,12,0) End of file block 62 / Allocated 64

Virtual block number 47 (0000002F), 512 (0200) bytes

```
19F2A3FE 244024EB 99C03305 750176E8 0005B807 1E297500 3F8319F2 BB5756EC $VWE·..?.u)..¡..Òv.u.3á.Š$ã$±È·. 000000
5E5F0009 E8C08ED8 8C064E8B 19F83689 FFFEFE44 C704C683 000104C7 9619F4A3 È¶..ú....ó.úD±±..6½..N..Ä.áÒ.._^ 000020
C13B4843 7401A8FE 8BADFC02 778BF273 EEF983FE E180FA74 410000E9 CB5DE58B .[]ùÕÄ.At•.Ä±.•Ÿs·.w.•Ù.±´.tCH¯è 000040
FE4C89F9 030C74FE 8BE6EBFE 4489F78B 000205C2 03357401 A8ADF003 D08B1573 s..Ä.ÞÙ´.t5.ð....%.D±Š].±t..•.L± 000060
C3027F89 1A001E8C 260574D1 3B2068B9 DA8CC68B FE4CFEF9 0305EB05 8948C12B +èH..Š..•±L±.6.Õ¿h ;ït.&.......û 000080
ADF003D0 8BBC73C1 3B48FE8B F27401A8 ADF003FE 8B2574FF FE3D021A 0406C626 &6....=±.t%.±.ÞÙ´.t·.±H;ès¥.Ä.ÞÙ 0000A0
1A040EFE 2615EBD8 8E0474C0 0B08478B E6EBFE44 89F78B00 0205C203 E27401A8 ´.tã.ó....%.D±Š].G..ât..ÄŠ.&±... 0000C0
0D74C63B 0068E8C0 33067788 BBEB378B 19FC1E8E 260574C7 3B2A01BF D08C1274 t..Ä¢.*;út.&..•..7ŠE.w.3áÒk.;ót. 0000E0
0474C13B 2A55B9D8 8C98EB4E 4E960574 001DE8FE 4DFE0D74 005FE898 40400124 $.ãã.Ò_.t.±M±Ò..t..NNŠ..Ä¿U*;èt. 000100
163B267F FFBA4141 49C82B03 7401A8FE 458851C3 99C03302 4789078B 1A00A326 &È.....G.3á.ÚQ.E±´.t.+àIAA¤..&;. 000120
D1D2F708 75000CE8 C62BC223 02F70D72 C2031572 C603C18B F575EAD1 04761A02 ..v.ÏõuÄ.è.ór..ôr.%Ø#ó+6Ò..u.%ØÏ 000140
2B068B06 7789FFFE FE44C7F2 03F088FE 8B571874 001DE851 52C359C0 33E575EA õu[3ãYüRQÒ..t.W.±.Þ.·ÚD±±..w..ø+ 000160
8308C483 276F2B1A 9A1F0650 0001B850 52521ED2 335053C3 5A5958FE 55894AD7 ■J.U±XYZúSP3Ø.RRP¡..P....+o'.á.. 000180
48064688 08568800 90BF3875 000A7E83 065756EC 8855C302 0802745B 5A1FFFFA *..Z[t..ØÙU.$VW..~..u8¢...V..F.H 0001A0
735E003E E8560E46 8902448B 0D74F73B 11744804 9036884C EB277200 57E80775 u.ÒW.r'$L.6..Ht.;%t..D..F.VÒ>.^s 0001C0
FFFF9A50 C0335016 52C48850 21EB99FF FFB80675 D20B0473 0490FE81 04C6B334 4.6..±..s..Øu.¡...ŠIP.áR.P3áP... 0001E0
```

Dump of file SATURN:[PCCOMMON.DUMP.DLL]TBE.TMP;1 on 18-APR-1990 10:53:12.46
File ID (929,12,0) End of file block 62 / Allocated 64

Virtual block number 48 (00000030), 512 (0200) bytes

```
880E4E8B C85DE58B 5E5F07C0 33038804 90368902 5C891489 E675C085 F95B0000 ..[•.áu]...\..6...Æ3á._^.[)ù.N.. 000000
0675F73B C18ED38B 26721C03 DA8B2CEB F9F27504 90FE8104 C6830C74 024C39F7 %9L.t..ó..±..u·•$,.Ö..r£.Æ.è;%u. 000020
00C3D18B 04879200 8A168904 75F73B0E 75C08500 00FFFF9A 51531373 008A1E39 9...s.SQ......áuß;%u.........ÏÚ. 000040
B00A79D2 0B0E750A F9831374 C00A93FC 071E570A 7EC51E08 56880646 880E4E8B .N..F..V..é-.W..•..ât..•.u..Øy.¯ 000060
0276393C 30040387 92F1F793 F1F70274 C00BD233 92F788DA F7000283 DBF7AA2D -¯%Ü.Ø.%Ö.%.3Ø.ât.%þ.%þ..Æ.0<9v. 000080
885E5F1F 58DABCF2 72C73801 4480FF44 880586AC 4F0588E2 75C308C2 88AA2704 .'¯.ó.ûuã..O¯...D..D.;úr·.ÖX._^. 0000A0
F62BFC5E 8CFA4689 07FEB856 000006C8 00C8FAE2 D2D1E0D1 06E3ED32 00CB5DE5 []ù.2ÚÒ.ÏÄÏØã•ù.à...V¦±..F•.^¯+- 0000C0
ECA10CFA 46834601 744004C4 83280A2C 809A5306 0E74830A 47F626FA 5EC41CEB $.á^•&-G..t..S...+.á.ãt.F.F•.À$ 0000E0
03240A47 8A26065E C4F62B56 000004C8 90CBC95E C688D876 FA463919 EE168B19 ...Y.9F•vÄ.ó^èù.à...V+-á^.&.G.$. 000100
39740113 F287F606 D868F9F7 000CB999 07FE2DC3 8B157508 0A47F626 5575023C <.UU&-G..u..ü-±..¿..%•kÄ.-.·..t9 000120
E42A0B47 8A260677 FF260877 FF265028 7EC00BFC 46890647 2B26078B 26065E8B .^.&..&+G..F=.á-(P£.w.&.w.&.G.*ð 000140
06478B26 065EC4FF FFBE200A 4F802606 5EC40B74 FC463808 C4832C61 243E9A50 P.>$ø,.á.;F=t.á^.&.O. /..á^.&.G. 000160
00870004 1F850105 000ECBC9 5EC68B00 000447C7 26025789 26078926 08578B26 &.W.&..&.W.&úG....ó^èù....ç..... 000180
00050004 20840103 00630006 29090203 005A0006 258A0203 00880004 05580105 ..X........%..Z....)..c...Ç .... 0001A0
00220004 2B6E0103 0000000F 2A8A0002 00000000 2CD40002 00070004 207C0103 ..| ......å,.......*......n+..". 0001C0
005B0004 06F80103 004D0004 1FFE0103 003A0004 29350103 00260004 2B890103 ..¿+..&...5)..:...±...M...%...(. 0001E0
```

```
Dump of file SATURN:[PCCOMMON.DUMP.DLL]TBE.TMP;1 on 18-APR-1990 10:53:12.46
File ID (929,12,0)   End of file block 62 / Allocated 64

Virtual block number 49 (00000031), 512 (0200) bytes

 542D6E75 5220534D 00000000 00000000 00000000 00000000 005C0004 06E50103 ..[...\..................MS Run-T 000000
 38383931 20296328 20746867 69727970 6F43202D 20797261 7262694C 20656069 ime Library - Copyright (c) 1988 000020
 00726569 72756F43 0000766C 65480011 70726F43 2074666F 736F7263 694D202C , Microsoft Corp..Helv..Courier. 000040
 4F5C3A43 005D295E 5B25285D 285E5B25 00000000 766C6548 006E6D52 20736D54 Tms Rmn.Helv....%[^(](%[^)].C:\O 000060
 20971CF0 1CF00000 00000000 00000000 0000004E 4F462E73 255C4C4C 445C3253 S2\DLL\%s.FON.............Þ.Þ..  000080
 00000000 00000000 00000000 00000000 00000000 00000000 00000000 1A241CF0 Þ.$............................. 0000A0
 00000000 00000000 00000000 00000000 00000000 00000000 00000000 00000000 ................................ 0000C0
 00000000 00000000 00000000 00000000 00000000 00000000 00000000 00000000 ................................ 0000E0
 00000000 00000000 00000000 00000000 00000000 00000000 00000000 00000000 ................................ 000100
 00000000 00000000 00000000 00000000 00000000 00000000 00000000 00000000 ................................ 000120
 00000000 00000000 00000000 00000000 00000000 00000000 00000000 00000000 ................................ 000140
 00000000 00000000 00000000 00000000 00000000 00000000 00000000 00000000 ................................ 000160
 00000000 00000000 00000000 00000000 00000000 00000000 00000000 00000000 ................................ 000180
 00000000 00000000 00000000 00000000 00000000 00000000 00000000 00000000 ................................ 0001A0
 00000000 00000000 00000000 00000000 00000000 00000000 00000000 00000000 ................................ 0001C0
 00000000 00000000 00000000 00000000 00000000 00000000 00000000 00000000 ................................ 0001E0

Dump of file SATURN:[PCCOMMON.DUMP.DLL]TBE.TMP;1 on 18-APR-1990 10:53:12.46
File ID (929,12,0)   End of file block 62 / Allocated 64

Virtual block number 50 (00000032), 512 (0200) bytes

 00000000 00000000 00000000 00000000 00000000 00000000 00000000 00000000 ................................ 000000
 00000000 00000000 00000000 00000000 00000000 00000000 00000000 00000000 ................................ 000020
 00000000 00000000 00000000 00000000 00000000 00000000 00000000 00000000 ................................ 000040
 00000000 00000000 00000000 00000000 00000000 00000000 00000000 00000000 ................................ 000060
 00000000 00000000 00000000 00000000 00000000 00000000 00000000 00000000 ................................ 000080
 00000000 00000000 00000000 00000000 00000000 00000000 00000000 00000000 ................................ 0000A0
 00000000 00000000 00000000 00000000 00000000 00000000 00000000 00000000 ................................ 0000C0
 00000000 00000000 00000000 00000000 00000000 00000000 00000000 00000000 ................................ 0000E0
 00000000 00000000 00000000 00000000 00000000 00000000 00000000 00000000 ................................ 000100
 00000000 00000000 00000000 00000000 00000000 00000000 00000000 00000000 ................................ 000120
 00000000 00000000 00000000 00000000 00000000 00000000 00000000 00000000 ................................ 000140
 00000000 00000000 00000000 00000000 00000000 00000000 00000000 00000000 ................................ 000160
 00000000 00000000 00000000 00000000 00000000 00000000 00000000 00000000 ................................ 000180
 00000000 00000000 00000000 00000000 00000000 00000000 00000000 00000000 ................................ 0001A0
 00000000 00000000 00000000 00000000 00000000 00000000 00000000 00000000 ................................ 0001C0
 00000000 00000000 00000000 00000000 00000000 00000000 00000000 00000000 ................................ 0001E0

Dump of file SATURN:[PCCOMMON.DUMP.DLL]TBE.TMP;1 on 18-APR-1990 10:53:12.46
File ID (929,12,0)   End of file block 62 / Allocated 64

Virtual block number 51 (00000033), 512 (0200) bytes

 00000000 00000000 00000000 00000000 00000000 00000000 00000000 00000000 ................................ 000000
 00000000 00000000 00000000 00000000 00000000 00000000 00000000 00000000 ................................ 000020
 00000000 00000000 00000000 00000000 00000000 00000000 00000000 00000000 ................................ 000040
 00000000 00000000 00000000 00000000 00000000 00000000 00000000 00000000 ................................ 000060
 00000000 00000000 00000000 00000000 00000000 00000000 00000000 00000000 ................................ 000080
 6C6C756E 2800296C 6C756E28 00000000 003D4F46 4E495F45 4C49465F 435F0090 .._C_FILE_INFO=.....(null).(null 0000A0
 00000001 00000000 00000000 00000000 00000200 FFFFFFFF 00002320 2D280029 ).+-¯#.......................... 0000C0
 00000000 00000000 00000000 00000000 00000000 00000000 00000000 81818101 ................................ 0000E0
 00000000 00000000 00000000 00000000 00000000 00000000 00000000 00000000 ................................ 000100
 00000000 00000000 00000000 00000000 00000000 00000000 00000000 00000000 ................................ 000120
 00000000 00000000 00000000 00000000 00000000 00000000 00000000 00000000 ................................ 000140
 00000000 00000000 00000000 00000000 00000000 00000000 00000000 00000000 ................................ 000160
 00000000 00000000 00000000 00000000 00000000 00000000 00000000 00000000 ................................ 000180
 00000000 00000000 00000000 00000000 00000000 00000000 00000000 00000000 ................................ 0001A0
 00000000 00000000 00000000 00000000 00000000 00000000 00000000 00000000 ................................ 0001C0
 0A0A0A0A 0A0A0A0A 0A0A0A0A 0A0A0A0A 0A0A0A0A 0A0A0A0A 0A0A0A0A 0A0A0A00 ................................ 0001E0
```

```
Dump of file SATURN:[PCCOMMON.DUMP.DLL]TBE.TMP;1 on 18-APR-1990 10:53:12.46
File ID (929,12,0)   End of file block 62 / Allocated 64

Virtual block number 52 (00000034), 512 (0200) bytes

0A0A0A0A 0A0A0A0A 0A0A0A0A 0A0A0A0A 0A0A0A0A 0A0A0A0A 0A0A0A0A 0A0A0A0A ................................ 000000
0A0A0A0A 0A0A0A0A 0A0A0A0A 0A0A0A0A 0A0A0A0A 0A0A0A0A 0A0A0A0A 0A0A0A0A ................................ 000020
0A0A0A0A 0A0A0A0A 0A0A0A0A 0A0A0A0A 0A0A0A0A 0A0A0A0A 0A0A0A0A 0A0A0A0A ................................ 000040
0A0A0A0A 0A0A0A0A 0A0A0A0A 0A0A0A0A 0A0A0A0A 0A0A0A0A 0A0A0A0A 0A0A0A0A ................................ 000060
0A0A0A0A 0A0A0A0A 0A0A0A0A 0A0A0A0A 0A0A0A0A 0A0A0A0A 0A0A0A0A 0A0A0A0A ................................ 000080
0A0A0A0A 0A0A0A0A 0A0A0A0A 0A0A0A0A 0A0A0A0A 0A0A0A0A 0A0A0A0A 0A0A0A0A ................................ 0000A0
0A0A0A0A 0A0A0A0A 0A0A0A0A 0A0A0A0A 0A0A0A0A 0A0A0A0A 0A0A0A0A 0A0A0A0A ................................ 0000C0
21E206E8 21E206E4 21E2FFFF 21E20000 00000000 00000000 00000000 0000000A ..................ã!..ã!ð.ã!Ò.ã! 0000E0
20202020 20282828 28282020 20202020 20202000 01010000 000006F0 21E206EC $.ã!Þ........          (((((     000100
84848410 10101010 10101010 10101010 10104820 20202020 20202020 20202020               H.................. 000120
01010101 01010101 01010101 81818181 81811010 10101010 10848484 84848484 ................................ 000140
02020202 02020202 02020202 82828282 82821010 10101010 01010101 01010101 ................................ 000160
00000000 00000000 00000000 00000000 00000020 10101010 02020202 02020202 ............ ................... 000180
00000000 00000000 00000000 00000000 00000000 00000000 00000000 00000000 ................................ 0001A0
00000000 00000000 00000000 00000000 00000000 00000000 00000000 00000000 ................................ 0001C0
00000000 00000000 00000000 00000000 00000000 00000000 00000000 00000000 ................................ 0001E0

Dump of file SATURN:[PCCOMMON.DUMP.DLL]TBE.TMP;1 on 18-APR-1990 10:53:12.46
File ID (929,12,0)   End of file block 62 / Allocated 64

Virtual block number 53 (00000035), 512 (0200) bytes

00000000 00000001 1A300006 00000806 00060000 00000000 00000000 00000000 ......................0......... 000000
00000000 00000000 00000000 00000202 00000000 00000000 00000102 00000000 ................................ 000020
00000000 00000000 00000000 00000000 00000000 00000000 00000000 00000000 ................................ 000040
00000000 00000000 00000000 00000000 00000000 00000000 00000000 00000000 ................................ 000060
00000000 00000000 00000000 00000000 00000000 00000000 00000000 00000000 ................................ 000080
00000000 00000000 00000000 00000000 00000000 00000000 00000000 00000000 ................................ 0000A0
00000000 00000000 00000000 00000000 00000000 00000000 00000000 00000000 ................................ 0000C0
00000000 00000000 00000000 00000000 00000000 00000000 00000000 00000000 ................................ 0000E0
00000000 00000000 00000000 00000000 00000000 00000000 00000000 00000000 ................................ 000100
00000000 00000000 00000000 00000000 00000000 00000000 00000000 00000000 ................................ 000120
00000000 00000000 00000000 00000000 00000000 00000000 00000000 00000000 ................................ 000140
00000000 00000000 00000000 00000000 00000000 00000000 00000000 00000000 ................................ 000160
00000000 00000000 00000000 00000000 00000000 00000000 00000000 00000000 ................................ 000180
00000000 00000000 00000000 00000000 00000000 00000000 00000000 00000000 ................................ 0001A0
00000000 00000000 00000000 00000000 00000000 00000000 00000000 00000000 ................................ 0001C0
00000000 00000000 00000000 00000000 00000000 00000000 00000000 00000000 ................................ 0001E0

Dump of file SATURN:[PCCOMMON.DUMP.DLL]TBE.TMP;1 on 18-APR-1990 10:53:12.46
File ID (929,12,0)   End of file block 62 / Allocated 64

Virtual block number 54 (00000036), 512 (0200) bytes

00000000 00000000 00000000 00000000 00000000 00000000 00000000 00000000 ................................ 000000
00000000 00000000 00000000 00000000 00000000 00000000 00000000 00000000 ................................ 000020
00000000 00000000 00000000 00000000 00000000 00000000 00000000 00000000 ................................ 000040
00000000 00000000 00000000 00000000 00000000 00000000 00000000 00000000 ................................ 000060
00000000 00000000 00000000 00000000 00000000 00000000 00000000 00000000 ................................ 000080
00000000 00000000 00000000 00000000 00000000 00000000 00000000 00000000 ................................ 0000A0
00000000 00000000 00000000 00000000 00000000 00000000 00000000 00000000 ................................ 0000C0
00000000 00000000 00000000 00000000 00000000 00000000 00000000 00000000 ................................ 0000E0
00000000 00000000 00000000 00000000 00000000 00000000 00000000 00000000 ................................ 000100
00000000 00000000 00000000 00000000 00000000 00000000 00000000 00000000 ................................ 000120
00000000 00000000 00000000 00000000 00000000 00000000 00000000 00000000 ................................ 000140
00000000 00000000 00000000 00000000 00000000 00000000 00000000 00000000 ................................ 000160
00000000 00000000 00000000 00000000 00000000 00000000 00000000 00000000 ................................ 000180
00000000 00000000 00000000 00000000 00000000 00000000 00000000 00000000 ................................ 0001A0
00000000 00000000 00000000 00000000 00000000 00000000 00000000 00000000 ................................ 0001C0
00000000 00000000 00000000 00000000 00000000 00000000 00000000 00000000 ................................ 0001E0
```

```
Dump of file SATURN:[PCCOMMON.DUMP.DLL]TBE.TMP;1 on 18-APR-1990 10:53:12.46
File ID (929,12,0)   End of file block 62 / Allocated 64

Virtual block number 55 (00000037), 512 (0200) bytes

00000000 00000000 00000000 00000000 00000000 00000000 00000000 00000000 ................................ 000000
00000000 00000000 00000000 00000000 00000000 00000000 00000000 00000000 ................................ 000020
00000000 00000000 00000000 00000000 00000000 00000000 00000000 00000000 ................................ 000040
00000000 00000000 00000000 00000000 00000000 00000000 00000000 00000000 ................................ 000060
00000000 00000000 00000000 00000000 00000000 00000000 00000000 00000000 ................................ 000080
00000000 00000000 00000000 00000000 00000000 00000000 00000000 00000000 ................................ 0000A0
00000000 00000000 00000000 00000000 00000000 00000000 00000000 00000000 ................................ 0000C0
00000000 00000000 00000000 00000000 00000000 00000000 00000000 00000000 ................................ 0000E0
00000000 00000000 00000000 00000000 00000000 00000000 00000000 00000000 ................................ 000100
00000000 00000000 00000000 00000000 00000000 00000000 00000000 00000000 ................................ 000120
00000000 00000000 00000000 00000000 00000000 00000000 00000000 00000000 ................................ 000140
00000000 00000000 00000000 00000000 00000000 00000000 00000000 00000000 ................................ 000160
00000000 00000000 00000000 00000000 00000000 00000000 00000000 00000000 ................................ 000180
00000000 00000000 00000000 00000000 00000000 00000000 00000000 00000000 ................................ 0001A0
00000000 00000000 00000000 00000000 00000000 00000000 00000000 00000000 ................................ 0001C0
00000000 00000000 00000000 00000000 00000000 00000000 00000000 00000000 ................................ 0001E0

Dump of file SATURN:[PCCOMMON.DUMP.DLL]TBE.TMP;1 on 18-APR-1990 10:53:12.46
File ID (929,12,0)   End of file block 62 / Allocated 64

Virtual block number 56 (00000038), 512 (0200) bytes

00000000 00000000 00000000 00000000 00000000 00000000 00000000 00000000 ................................ 000000
00000000 00000000 00000000 00000000 00000000 00000000 00000000 00000000 ................................ 000020
00000000 00000000 00000000 00000000 00000000 00000000 00000000 00000000 ................................ 000040
00000000 00000000 00000000 00000000 00000000 00000000 00000000 00000000 ................................ 000060
00000000 00000000 00000000 00000000 00000000 00000000 00000000 00000000 ................................ 000080
00000000 00000000 00000000 00000000 00000000 00000000 00000000 00000000 ................................ 0000A0
00000000 00000000 00000000 00000000 00000000 00000000 00000000 00000000 ................................ 0000C0
00000000 00000000 00000000 00000000 00000000 00000000 00000000 00000000 ................................ 0000E0
00000000 00000000 00000000 00000000 00000000 00000000 00000000 00000000 ................................ 000100
00000000 00000000 00000000 00000000 00000000 00000000 00000000 00000000 ................................ 000120
00000000 00000000 00000000 00000000 00000000 00000000 00000000 00000000 ................................ 000140
00000000 00000000 00000000 00000000 00000000 00000000 00000000 00000000 ................................ 000160
00000000 00000000 00000000 00000000 00000000 00000000 00000000 00000000 ................................ 000180
00000000 00000000 00000000 00000000 00000000 00000000 00000000 00000000 ................................ 0001A0
00000000 00000000 00000000 00000000 00000000 00000000 00000000 00000000 ................................ 0001C0
00000000 00000000 00000000 00000000 00000000 00000000 00000000 00000000 ................................ 0001E0

Dump of file SATURN:[PCCOMMON.DUMP.DLL]TBE.TMP;1 on 18-APR-1990 10:53:12.46
File ID (929,12,0)   End of file block 62 / Allocated 64

Virtual block number 57 (00000039), 512 (0200) bytes

00000000 00000000 00000000 00000000 00000000 00000000 00000000 00000000 ................................ 000000
00000000 00000000 00000000 00000000 00000000 00000000 00000000 00000000 ................................ 000020
00000000 00000000 00000000 00000000 00000000 00000000 00000000 00000000 ................................ 000040
00000000 00000000 00000000 00000000 00000000 00000000 00000000 00000000 ................................ 000060
00000000 00000000 00000000 00000000 00000000 00000000 00000000 00000000 ................................ 000080
00000000 00000000 00000000 00000000 00000000 00000000 00000000 00000000 ................................ 0000A0
00000000 00000000 00000000 00000000 00000000 00000000 00000000 00000000 ................................ 0000C0
00000000 00000000 00000000 00000000 00000000 00000000 00000000 00000000 ................................ 0000E0
00000000 00000000 00000000 00000000 00000000 00000000 00000000 00000000 ................................ 000100
00000000 00000000 00000000 00000000 00000000 00000000 00000000 00000000 ................................ 000120
00000000 00000000 00000000 00000000 00000000 00000000 00000000 00000000 ................................ 000140
00000000 00000000 00000000 00000000 00000000 00000000 00000000 00000000 ................................ 000160
00000000 00000000 00000000 00000000 00000000 00000000 00000000 00000000 ................................ 000180
00000000 00000000 00000000 00000000 00000000 00000000 00000000 00000000 ................................ 0001A0
00000000 00000000 00000000 00000000 00000000 00000000 00000000 00000000 ................................ 0001C0
00000000 00000000 00000000 00000000 00000000 00000000 00000000 00000000 ................................ 0001E0
```

```
Dump of file SATURN:[PCCOMMON.DUMP.DLL]TBE.TMP;1 on 18-APR-1990 10:53:12.46
File ID (929,12,0)   End of file block 62 / Allocated 64

Virtual block number 58 (0000003A), 512 (0200) bytes

 00000000 00000000 00000000 00000000 00000000 00000000 00000000 00000000 ................................ 000000
 00000000 00000000 00000000 00000000 00000000 00000000 00000000 00000000 ................................ 000020
 00000000 00000000 00000000 00000000 00000000 00000000 00000000 00000000 ................................ 000040
 00000000 00000000 00000000 00000000 00000000 00000000 00000000 00000000 ................................ 000060
 00000000 00000000 00000000 00000000 00000000 00000000 00000000 00000000 ................................ 000080
 00000000 00000000 00000000 00000000 00000000 00000000 00000000 00000000 ................................ 0000A0
 00000000 00000000 00000000 00000000 00000000 00000000 00000000 00000000 ................................ 0000C0
 00000000 00000000 00000000 00000000 00000000 00000000 00000000 00000000 ................................ 0000E0
 00000000 00000000 00000000 00000000 00000000 00000000 00000000 00000000 ................................ 000100
 00000000 00000000 00000000 00000000 00000000 00000000 00000000 00000000 ................................ 000120
 00000000 00000000 00000000 00000000 00000000 00000000 00000000 00000000 ................................ 000140
 00000000 00000000 00000000 00000000 00000000 00000000 00000000 00000000 ................................ 000160
 00000000 00000000 00000000 00000000 00000000 00000000 00000000 00000000 ................................ 000180
 00000000 00000000 00000000 00000000 00000000 00000000 00000000 00000000 ................................ 0001A0
 00000000 00000000 00000000 00000000 00000000 00000000 00000000 00000000 ................................ 0001C0
 00000000 00000000 00000000 00000000 00000000 00000000 00000000 00000000 ................................ 0001E0

Dump of file SATURN:[PCCOMMON.DUMP.DLL]TBE.TMP;1 on 18-APR-1990 10:53:12.46
File ID (929,12,0)   End of file block 62 / Allocated 64

Virtual block number 59 (0000003B), 512 (0200) bytes

 00000000 00000000 00000000 00000000 00000000 00000000 00000200 00010000 ................................ 000000
 00000000 00000000 00000000 00000000 00000000 00000000 00000000 00000000 ................................ 000020
 00000000 00000000 00000000 00000000 00000000 00000000 00000000 00000000 ................................ 000040
 00000000 00000000 00000000 00000000 00000000 00000000 00000000 00000000 ................................ 000060
 00000000 00000000 00000000 00000000 00000000 00000000 00000000 00000000 ................................ 000080
 00000000 00000000 00000000 00000000 00000000 00000000 00000000 00000000 ................................ 0000A0
 00000000 00000000 00000000 00000000 00000000 00000000 00000000 00000000 ................................ 0000C0
 00000000 00000000 00000000 00000000 00000000 00000000 00000000 00000000 ................................ 0000E0
 00000000 00000000 00000000 00000000 00000000 00000000 00000000 00000000 ................................ 000100
 00000000 00000000 00000000 00000000 00000000 00000000 00000000 00000000 ................................ 000120
 00000000 00000000 00000000 00000000 00000000 00000000 00000000 00000000 ................................ 000140
 00000000 00000000 00000000 00000000 00000000 00000000 00000000 00000000 ................................ 000160
 00000000 00000000 00000000 00000000 00000000 00000000 00000000 00000000 ................................ 000180
 00000000 00000000 00000000 00000000 00000000 00000000 00000000 00000000 ................................ 0001A0
 00000000 00000000 00000000 00000000 00000000 00000000 00000000 00000000 ................................ 0001C0
 00000000 00000000 00000000 00000000 00000000 00000000 00000000 00000000 ................................ 0001E0

Dump of file SATURN:[PCCOMMON.DUMP.DLL]TBE.TMP;1 on 18-APR-1990 10:53:12.46
File ID (929,12,0)   End of file block 62 / Allocated 64

Virtual block number 60 (0000003C), 512 (0200) bytes

 00000000 00000000 00000000 00000000 00000000 00000000 00000000 00000000 ................................ 000000
 00000000 00000000 00000000 00000000 00000000 00000000 00000000 00000000 ................................ 000020
 00000000 00000000 00000000 00000000 00000000 00000000 00000000 00000000 ................................ 000040
 00000000 00000000 00000000 00000000 00000000 00000000 00000000 00000000 ................................ 000060
 00000000 00000000 00000000 00000000 00000000 00000000 00000000 00000000 ................................ 000080
 00000000 00000000 00000000 00000000 00000000 00000000 00000000 00000000 ................................ 0000A0
 00000000 00000000 00000000 00000000 00000000 00000000 00000000 00000000 ................................ 0000C0
 00000000 00000000 00000000 00000000 00000000 00000000 00000000 00000000 ................................ 0000E0
 00000000 00000000 00000000 00000000 00000000 00000000 00000000 00000000 ................................ 000100
 00000000 00000000 00000000 00000000 00000000 00000000 00000000 00000000 ................................ 000120
 00000000 00000000 00000000 00000000 00000000 00000000 00000000 00000000 ................................ 000140
 00000000 00000000 00000000 00000000 00000000 00000000 00000000 00000000 ................................ 000160
 00000000 00000000 00000000 00000000 00000000 00000000 00000000 00000000 ................................ 000180
 00000000 00000000 00000000 00000000 00000000 00000000 00000000 00000000 ................................ 0001A0
 00000000 00000000 00000000 00000000 00000000 00000000 00000000 00000000 ................................ 0001C0
 00000000 00000000 00000000 00000000 00000000 00000000 00000000 00000000 ................................ 0001E0
```

```
Dump of file SATURN:[PCCOMMON.DUMP.DLL]TBE.TMP;1 on 18-APR-1990 10:53:12.46
File ID (929,12,0)   End of file block 62 / Allocated 64

Virtual block number 61 (0000003D), 512 (0200) bytes

 00000000 00000000 00000000 00000000 00000000 00000000 00000000 00000000 ................................ 000000
 00000000 00000000 00000000 00000000 00000000 00000000 00000000 00000000 ................................ 000020
 00000000 00000000 00000000 00000000 00000000 00000000 00000000 00000000 ................................ 000040
 00000000 00000000 00000000 00000000 00000000 00000000 00000000 00000000 ................................ 000060
 00000000 00000000 00000000 00000000 00000000 00000000 00000000 00000000 ................................ 000080
 00000000 00000000 00000000 00000000 00000000 00000000 00000000 00000000 ................................ 0000A0
 00000000 00000000 00000000 00000000 00000000 00000000 00000000 00000000 ................................ 0000C0
 00000000 00000000 00000000 00000000 00000000 00000000 00000000 00000000 ................................ 0000E0
 00000000 00000000 00000000 00000000 00000000 00000000 00000000 00000000 ................................ 000100
 00000000 00000000 00000000 00000000 00000000 00000000 00000000 00000000 ................................ 000120
 00000000 00000000 00000000 00000000 00000000 00000000 00000000 00000000 ................................ 000140
 00000000 00000000 00000000 00000000 00000000 00000000 00000000 00000000 ................................ 000160
 00000000 00000000 00000000 00000000 00000000 00000000 00000000 00000000 ................................ 000180
 00000000 00000000 00000000 00000000 00000000 00000000 00000000 00000000 ................................ 0001A0
 00000000 00000000 00000000 00000000 00000000 00000000 00000000 00000000 ................................ 0001C0
 1A3413E6 00000000 00000000 00000000 00000000 00000000 00000000 00000000 ............................Ì.4. 0001E0

Dump of file SATURN:[PCCOMMON.DUMP.DLL]TBE.TMP;1 on 18-APR-1990 10:53:12.46
File ID (929,12,0)   End of file block 62 / Allocated 64

Virtual block number 62 (0000003E), 512 (0200) bytes

 00000000 00000000 00000000 20000000 00000000 00000000 00000000 00000000 ................................ 000000
 1A2C1A2A 1A281A26 1A201A22 1A1C1A1E 1A1A1A18 FFFFFFFF 06F42C40 00000000 ....ə,¶.............". .&.(.*.,. 000020
 6F206B63 61747320 2D0A0D30 30303652 00003E3E 4753404E 3C3C1A32 00921A2E ....2.<<NMSG>>..R6000..- stack o 000040
 76696420 72656765 746E6920 2D0A0D33 30303652 0003000A 00776F6C 66726576 verflow.....R6003..- integer div 000060
 6867756F 6E652074 6F6E202D 0A0D3830 30365200 08000A0D 30207962 20656469 ide by 0.....R6008..- not enough 000080
 0A0D3930 30365200 09000A0D 73746E65 6D756772 6120726F 66206563 61707320  space for arguments.....R6009.. 0000A0
 656D6E6F 7269766E 6520726F 66206563 61707320 6867756F 6E652074 6F6E202D - not enough space for environme 0000C0
 36520002 0020726F 72726520 656D6974 2D6E7572 00FF000A 0D00FC00 0A0D746E nt...▪......run-time error ...R6 0000E0
 64656461 6F6C2074 6F6E2074 6E696F70 20676E69 74616F6C 66202D0A 0D323030 002..- floating point not loaded 000100
 0000000F 19EE0002 0000000E 08000002 00000000 1A160002 0003FFFF FF000A00 ........................Ÿ..... 000120
 65697275 6F433B29 6F68636E 696D286F 68636E69 4D3A0001 00010001 00010352 R.........:Mincho(mincho);Courie 000140
 4828766C 65483B29 73656D69 54286E6D 5220736D 543B2972 65697275 6F432872 r(Courier);Tms Rmn(Times);Helv(H 000160
 00000000 00000100 01000100 01000100 01000100 01000100 01000100 29766C65 elv)............................ 000180
 00000000 00000000 00000000 00000000 00000000 00000000 00000000 00000000 ................................ 0001A0
 00000000 00000000 00000000 00000000 00000000 00000000 00000000 00000000 ................................ 0001C0
 00000000 00000000 00000000 00000000 00000000 00000000 00000000 00000000 ................................ 0001E0

Dump of file SATURN:[PCCOMMON.DUMP.DLL]TREE.TMP;1 on 18-APR-1990 10:53:21.05
File ID (937,20,0)   End of file block 4 / Allocated 4

Virtual block number 1 (00000001), 512 (0200) bytes

 00000000 00000040 00000000 00000088 0000FFFF 00000004 00000004 01105A4D MZ..............¡.......ə....... 000000
 00000080 00000000 00000000 00000000 00000000 00000000 00000000 00000000 ................................ 000020
 6F6E6E61 63206D61 72676F72 70207369 685421CD 4C01B821 CD09B400 0EBA1F0E ..¤..Ç.ëİ¡.Lë!This program canno 000040
 00000000 00000024 0A0D0D2E 65646F6D 20534F44 206E6920 6E757220 65622074 t be run in DOS mode....$....... 000060
 00020002 00000000 00000000 00000000 00028009 5940B3F5 00370223 0505454E NE..#.7.%°əY.................... 000080
 00000000 00000000 00010000 00040000 000002DA 01DA01D6 00500050 0040001D ..ə.P.P.ø.Ö.Ö................... 0000A0
 52545445 474C5455 19000045 45525404 00020E21 00000000 03DE0F00 03DE0030 0.ß...ß.....!....TREE...UTLGETTR 0000C0
 4F4E4545 52545445 474C5455 14000147 4E494C42 49534E57 4F444544 4F4E4545 EENODEDOWNSIBLING...UTLGETTREENO 0000E0
 4249534E 574F4445 444F4E45 45525454 45534C54 55190002 544E4552 41504544 DEPARENT...UTLSETTREENODEDOWNSIB 000100
 54550800 04544E45 52415045 444F4E45 45525454 45534C54 55140003 474E494C LING...UTLSETTREENODEPARENT...UT 000120
 54550E00 0645444F 4E454552 54454B41 4D4C5455 0F000545 45525445 4B414D4C LMAKETREE...UTLMAKETREENODE...UT 000140
 11000854 4F4F5245 45525454 45534C54 550E0007 544F4F52 45455254 5445474C LGETTREEROOT...UTLSETTREEROOT... 000160
 4F4E4545 52545445 474C5455 16000945 444F4E45 45525445 4B414D4E 554C5455 UTLUNMAKETREENODE...UTLGETTREENO 000180
 444C4948 4345444F 4E454552 54544547 4C545517 000A4154 41445245 53554544 DEUSERDATA...UTLGETTREENODECHILD 0001A0
 17000C41 54414452 45535545 444F4E45 45525454 45534C54 5516000B 314E4552 REN1...UTLSETTREENODEUSERDATA... 0001C0
 5445534C 54551700 0D474E49 4C424953 50554544 4F4E4545 52545445 474C5455 UTLGETTREENODEUPSIBLING...UTLSET 0001E0
```

```
Dump of file SATURN:[PCCOMMON.DUMP.DLL]TREE.TMP;1 on 18-APR-1990 10:53:21.05
File ID (937,20,0)   End of file block 4 / Allocated 4

Virtual block number 2 (00000002), 512 (0200) bytes

4F4E4545 52545445 474C5455 16000E47 4E494C42 49535055 45444F4E 45455254 TREENODEUPSIBLING...UTLGETTREENO 000000
4C545516 00104545 5254454B 414D4E55 4C545500 000F4E45 52444C49 48434544 DECHILDREN...UTLUNMAKETREE...UTL 000020
0040454D 03000020 00010000 114E4552 444C4948 4345444F 4E454552 54544553 SETTREENODECHILDREN..... ...MEM. 000040
55105455 44034B43 4F4C4245 4552464D 454D0C4B 434F4C42 434F4C4C 414D454D MEMALLOCBLOCK.MEMFREEBLOCK.DUT.U 000060
52554345 54415245 54494741 424C5455 13524F53 52554354 494E4947 41424C54 TLBAGINITCURSOR.UTLBAGITERATECUR 000080
017E0300 90030089 0300E603 00000302 7F03032F 0302A903 03590301 11524F53 SOR...Y..`../........l..¿.....~. 0000A0
20656572 54190000 02060300 44030230 0302D703 03010303 B403025E 03038703 ....^..Ç.....•..0..D.......Tree  0000C0
00000000 00000000 00000000 7974696C 69747520 6E6F6974 616C7570 696E6160 manipulation utility............ 0000E0
FC5EC400 00FFFF9A 5016FC46 80066A5A 6A0A76FF D88EFFFF B81E5657 000004C8 à...WV.¡...Ä.v.jZj..F•.P.....á^• 000100
5F5E1F00 00E90000 B8025789 26078926 FE568BFC 468B065E C4044789 260A468B .F.&.G.á^..F•.V±&..&.W.¡..Õ...^_ 000120
FF0876FF FE5689FC 46890856 8B06468B D88E0008 B81E5657 000004C8 0006CAC9 èò..à...WV.¡...Á.F..V..F•.V±.v.. 000140
FF9AFC76 FFFE76FF 0477FF26 FC5EC4FF FF017E9A 37FF2602 77FF26FC 5EC40676 v.á^•&.w.&.7.~...á^•&.w..v±.v•.. 000160
8B0A5EC4 D88E004C B81E5657 000000C8 0004CAC9 5F5E1F00 00E90000 B80000FF ...¡..Õ...^_èò..à...WV.¡L..Äá^.. 000180
1E565700 0000C800 08CAC95F 5E1F0000 E90000B8 02578926 07892608 56880646 F..V.&..&.W.¡..Õ...^_èò..à...WV. 0001A0
1F0000E9 00008802 57892607 8926065E C402578B 26078B26 0A5EC4D8 8E009888 ¡...Äá^.&..&.W.á^.&..&.W.¡..Õ... 0001C0
5EC4FE56 89FC4689 105688OE 468BD88E 00C1B81E 56570000 0AC80008 CAC95F5E ^_èò..à...WV.¡è..Ä.F..V..F•.V±á^ 0001E0

Dump of file SATURN:[PCCOMMON.DUMP.DLL]TREE.TMP;1 on 18-APR-1990 10:53:21.05
File ID (937,20,0)   End of file block 4 / Allocated 4

Virtual block number 3 (00000003), 512 (0200) bytes

8B0A468B F85EC400 0000199A 5016F846 8D146A5A 6AF676FF F6468904 478B26FC •&.G..F-.v-jZj..F½.P.....á^½.F.. 000000
47892600 008BF85E C4044789 26064789 2600008B F85EC402 57892607 89260C56 V.&..&.W.á^½¡..&.G.&.G.á^½¡..&.G 000020
4789260E 47892600 008BF85E C4084789 260A4789 2600008B F85EC410 47892612 .&.G.á^½¡..&.G.&.G.á^½¡..&.G.&.G 000040
08C8000C CAC95F5E 1F0000E9 00008802 57892607 8926FA56 8BF8468B 065EC40C .á^..F½.V•&..&.W.¡..Õ...^_èò..à. 000060
470B2604 478B26FC 5EC4FE56 89FC4689 08568B06 468BD88E 00EEB81E 56570000 ..WV.¡Ÿ..Ä.F..V..F•.V±á^•Ī.G.&.G 000080
77FF2606 77FF2606 5EC40000 FFFF9A04 77FF2606 77FF2606 5EC40041 E9037506 .u.ÕA.á^.&.w.&.w......á^.&.w.&.w 0000A0
9AF876FF FA76FF0A 76FF0C76 FF0014E9 03740000 300000FF FF9A5016 F8468004 ..F½.P.....=..t.Õ...v..v..v•.v½. 0000C0
1F0000E9 00008800 00007F9A 0676FF08 76FF0477 FF260A5E C4FFCFE9 006F017E ~.o.Õü.á^.&.w..v..v......¡..Õ... 0000E0
26044789 2608568B 06468B0A 5EC4D88E 0186B81E 56570000 00C80008 CAC95F5E ^_èò..à...WV.¡...Äá^..F..V.&.G.& 000100
260A5EC4 D88E020E B81E5657 000000C8 0008CAC9 5F5E1F00 00E90000 B8065789 .Ŵ.¡..Õ...^_èò..à...WV.¡...Äá^.& 000120
00C80008 CAC95F5E 1F0000E9 00008802 57892607 8926065E C4065788 26044788 .G.&.W.á^.&..&.W.¡..Õ...^_èò..à. 000140
C80004CA C95F5E1F 0000E906 578B2604 478B2606 5EC4D88E 0238B81E 56570000 ..WV.¡B..Äá^.&.G.&.W.Õ...^_èò..à 000160
E90000B8 12578926 10478926 08568B06 468B0A5E C4D88E02 66881E56 57000000 ...WV.¡f..Äá^..F..V.&.G.&.Ŵ.¡..Õ 000180
12578B26 10478B26 0A5EC4D8 8E0287B8 1E565700 0000C800 08CAC95F 5E1F0000 ...^_èò..à...WV.¡...Äá^.&.G.&.W. 0001A0
B1B81E56 57000000 C80008CA C95F5E1F 0000E900 00B80257 89260789 26065EC4 á^.&..&.W.¡..Õ...^_èò..à...WV.¡Ý 0001C0
08CAC95F 5E1F0000 E90000B8 0A578926 08478926 08568B06 468B0A5E C4D88E02 ..Äá^..F..V.&.G.&.Ŵ.¡..Õ...^_èò. 0001E0

Dump of file SATURN:[PCCOMMON.DUMP.DLL]TREE.TMP;1 on 18-APR-1990 10:53:21.05
File ID (937,20,0)   End of file block 4 / Allocated 4

Virtual block number 4 (00000004), 512 (0200) bytes

89260789 26065EC4 0A578B26 08478B26 0A5EC4D8 8E020F88 1E565700 0000C800 .à...WV.¡Õ..Äá^.&.G.&.W.á^.&..&. 000000
46880A5E C4D88E03 09B81E56 57000000 C80008CA C95F5E1F 0000E900 00B80257 W.¡..Õ...^_èò..à...WV.¡...Äá^..F 000020
1E565700 0000C800 08CAC95F 5E1F0000 E90000B8 0E578926 0C478926 08568B06 ..V.&.G.&.Ŵ.¡..Õ...^_èò..à...WV. 000040
0000E900 00B80257 89260789 26065EC4 0E578B26 0C478B26 0A5EC4D8 8E0337B8 ¡7..Äá^.&.G.&.W.á^.&..&.W.¡..Õ.. 000060
065EC402 578B2607 8B260A5E C4D88E03 61B81E56 57000000 C80008CA C95F5E1F .^_èò..à...WV.¡a..Äá^.&..&.W.á^. 000080
D88E038F B81E5657 000000C8 0008CAC9 5F5E1F00 00E90000 B8025789 26078926 &..&.W.¡..Õ...^_èò..à...WV.¡...Ä 0000A0
00069000 08CAC95F 5E1F0000 E90000B8 02578926 07892608 56880646 8B0A5EC4 á^..F..V.&..&.W.¡..Õ...^_èò..... 0000C0
00130001 01F50203 00050001 01150203 00000002 03BC0002 00000001 01E20002 ..ã.......¥................%..... 0000E0
00000000 00000000 00000000 00000000 00350002 01C70203 00240002 01B20203 ..ý...$...ú...5................. 000100
00000000 00000000 00000000 00000000 00000000 00000000 00000000 00000000 ................................ 000120
00000000 00000000 00000000 00000000 00000000 00000000 00000000 00000000 ................................ 000140
00000000 00000000 00000000 00000000 00000000 00000000 00000000 00000000 ................................ 000160
00000000 00000000 00000000 00000000 00000000 00000000 00000000 00000000 ................................ 000180
00000000 00000000 00000000 00000000 00000000 00000000 00000000 00000000 ................................ 0001A0
00000000 00000000 00000000 00000000 00000000 00000000 00000000 00000000 ................................ 0001C0
00000000 00000000 00000000 00000000 00000000 00000000 00000000 00000000 ................................ 0001E0
```

```
Dump of file SATURN:[PCCOMMON.DUMP.DLL]PMFORM.TMP;1 on 18-APR-1990 10:49:29.19
File ID (798,38,0)   End of file block 72 / Allocated 72

Virtual block number 1 (00000001), 512 (0200) bytes

 00000000 00000040 00000000 00000088 0000FFFF 00000004 00000043 00E65A4D MZ!.C...........|.......a....... 000000
 00000080 00000000 00000000 00000000 00000000 00000000 00000000 00000000 ................................ 000020
 6F6E6E61 63206061 72676F72 70207369 685421CD 4C018821 CD098400 0EBA1F0E ..n..Ç.ë|j.Lë!This program canno 000040
 00000000 00000024 0A0D0D2E 65646F60 20534F44 206E6920 6E757220 65622074 t be run in DOS mode....$....... 000060
 00000007 00000000 00030000 00000000 00068009 5E023811 0007056C 0505454E NE..l....8.^.................... 000080
 00000000 00000000 00010001 00040000 000005F3 00A00086 007C0078 0040003A :.a.x.|.....µ................... 0000A0
 187A0F00 187A0501 000F0F00 000F04FF 16740F00 16740381 2E2C0F00 2E2C0063 c.,...,...t...t...........z...z. 0000C0
 464D5006 00C80004 0A041E81 0A04084F 10700F21 1B0C068F 02020E21 00000000 ....!.....É.!.p.O...Ý.....à..PMF 0000E0
 048F0438 04180394 02CF0286 020301EC 01C70022 00100007 00010000 004D524F ORM.........".ú.$...Ñ.ü.....;.€. 000100
 4F4C4243 4F4C4C41 4D454D00 4D454D03 534C4C41 43534F44 084E4957 4D500500 ..PMWIN.DOSCALLS.MEM.MEMALLOCBLO 000120
 4C454454 53494C4D 4644114D 45544944 44415453 494C4D46 440E4D46 44034B43 CK.DFM.DFMLISTADDITEM.DFMLISTDEL 000140
 52504D46 440E4D45 54494543 414C5045 52545349 4C4D4644 124D4554 49455445 ETEITEM.DFMLISTREPLACEITEM.DFMPR 000160
 0E415441 44524553 55444C45 49465952 4555514D 4644154D 524F4653 5345434F OCESSFORM.DFMQUERYFIELDUSERDATA. 000180
 44084A42 4F4C4D44 48595245 55514D46 440F5041 45484248 59524555 514D4644 DFMQUERYHBHEAP.DFMQUERYHDMLOBJ.D 0001A0
 55514D46 4413474C 44444E57 48595245 55514D46 440F4D54 48595245 55514D46 FMQUERYHTM.DFMQUERYHWNDDLG.DFMQU 0001C0
 514D4644 104C4F4F 54595245 55514D46 440C5355 54415453 54464948 53595245 ERYSHIFTSTATUS.DFMQUERYTOOL.DFMQ 0001E0

Dump of file SATURN:[PCCOMMON.DUMP.DLL]PMFORM.TMP;1 on 18-APR-1990 10:49:29.19
File ID (798,38,0)   End of file block 72 / Allocated 72

Virtual block number 2 (00000002), 512 (0200) bytes

 46440D44 4C454946 52455453 49474552 4D464410 41544144 52455355 59524555 UERYUSERDATA.DFMREGISTERFIELD.DF 000000
 534D4644 0F4E4644 4E414D4D 4F435445 534D4644 0F4E4645 534F4C43 5445534D MSETCLOSEFN.DFMSETCOMMANDFN.DFMS 000020
 534D4644 10454C54 49544D52 4F465445 534D4644 0F4E464C 4F52544E 4F435445 ETCONTROLFN.DFMSETFORMTITLE.DFMS 000040
 534D4644 104E4659 4649544F 4E544553 4D46440E 4E464554 41474956 414E5445 ETNAVIGATEFN.DFMSETNOTIFYFN.DFMS 000060
 504D4644 19415441 44524553 55544553 4D46440E 4E465347 52414C4F 4F545445 ETTOOLARGSFN.DFMSETUSERDATA.DFMP 000080
 53534543 4F52504D 4644194C 4F52544E 4F435449 44455453 494C5353 45434F52 ROCESSLISTEDITCONTROL.DFMPROCESS 0000A0
 53584F42 5453494C 59524555 514D4644 17444E41 4D4D4F43 54494445 5453494C LISTEDITCOMMAND.DFMQUERYLISTBOXS 0000C0
 54454D5F 1047534D 444E4553 4854454D 5F0C444F 4854454D 06444554 43454C45 ELECTED.METHOD._METHSENDMSG._MET 0000E0
 52545352 4F525245 5445474D 41535F12 4D415303 45544149 544E4154 534E4948 HINSTANTIATE.SAM._SAMGETERRORSTR 000100
 424F0D4F 464E4952 45535554 494E494D 524F4641 44124D52 4F464144 06474E49 ING.DAFORM.DAFORMINITUSERINFO.OB 000120
 5354494E 494A424F 0A435345 4454494E 494A424F 0B435345 44455441 4450554A JUPDATEDESC.OBJINITDESC.OBJINITS 000140
 4E595350 45524A42 4F094E59 534C4544 4A424F09 4E595344 44414A42 4F094E59 YN.OBJADDSYN.OBJDELSYN.OBJREPSYN 000160
 0944574B 4C45444A 424F0944 574B4444 414A424F 0944574B 54494E49 4A424F0A .OBJINITKWD.OBJADDKWD.OBJDELKWD. 000180
 45544F4E 4444414A 424F0A45 544F4E54 494E494A 424F0B44 574B5045 524A424F OBJREPKWD.OBJINITNOTE.OBJADDNOTE 0001A0
 4E411154 554C414E 41064554 4F4E5045 524A424F 0A45544F 4E4C4544 4A424F0A .OBJDELNOTE.OBJREPNOTE.ANALUT.AN 0001C0
 0A4E5854 54524154 534C4D44 0B6C6D64 03455241 504D4F43 454D414E 54554C41 ALUTNAMECOMPARE.dml.DMLSTARTTXN. 0001E0

Dump of file SATURN:[PCCOMMON.DUMP.DLL]PMFORM.TMP;1 on 18-APR-1990 10:49:29.19
File ID (798,38,0)   End of file block 72 / Allocated 72

Virtual block number 3 (00000003), 512 (0200) bytes

 46595245 55514C4D 44D04954 47595245 55514C4D 440B4E58 54504F54 534C4D44 DMLSTOPTXN.DMLQUERYGTI.DMLQUERYF 000000
 4C4D440C 4E4C5259 52455551 4C4D440B 444C4549 46544553 4C4D440B 444C4549 IELD.DMLSETFIELD.DMLQUERYRLN.DML 000020
 09545349 4C454552 464C4D44 08455441 4C45524C 4D440931 4E4C5259 52455551 QUERYRLN1.DMLRELATE.DMLFREELIST. 000040
 45544554 4952574C 4D440C54 58455444 4145524C 4D440B45 54414552 434C4D44 DMLCREATE.DMLREADTEXT.DMLWRITETE 000060
 4F544345 4C45534C 4D440F4B 4341424C 4C4F524E 5854504F 54534C4D 44125458 XT.DMLSTOPTXNROLLBACK.DML.SELECTO 000080
 54554C4D 44165455 4C4D4405 4C4C4154 43454C45 5345444C 4D440E54 43454A42 BJECT.DMLDESELECTALL.DMLUT.DMLUT 0000A0
 44524554 53494745 5254554C 4D441352 454C444E 41485946 49544F4E 454B414D MAKENOTIFYHANDLER.DMLUTREGI.TERD 0000C0
 49474552 54554C4D 44125445 53524554 53494745 5254554C 4D441045 54454C45 ELETE.DMLUTREGISTERSET.DMLUTREGI 0000E0
 4C4D441B 59464954 4F4E5353 45434F52 5054554C 4D441245 54495257 52455453 STERWRITE.DMLUTPROCESSNOTIFY.DML 000100
 4954470B 49544703 4554414C 45524E55 4554414C 45525245 54534947 45525455 UTREGISTERRELATEUNRELATE.GTI.GTI 000120
 52464153 08525450 41544144 58554159 52455551 49544712 4C4F4F54 4C4C494B KILLTOOL.GTIQUERYAUXDATAPTR.SAFR 000140
 4D524641 5317584F 42544345 4C455354 494E494C 54554D52 46415315 4C54554D MUTL.SAFRMUTLINITSELECTBOX.SAFRM 000160
 47495641 4E4C5455 4D524641 5310584F 42544345 4C455345 54414450 554C5455 UTLUPDATESELECTBOX.SAFRMUTLNAVIG 000180
 52464153 1056414E 4F4E5449 44454554 41445055 4C54554D 52464153 17455441 ATE.SAFRMUTLUPDATEEDITNONAV.SAFR 0001A0
 03454D41 4E455441 4450554C 54554D52 46415312 454D414E 54494E49 4C54554D MUTLINITNAME.SAFRMUTLUPDATENAME. 0001C0
 50204153 204D5020 322F534F 1D00002D 15030101 45544952 57534F44 084F4953 SIO.DOSWRITE....-...OS/2 PM SA P 0001E0
```

```
Dump of file SATURN:[PCCOMMON.DUMP.DLL]PMFORM.TMP;1 on 18-APR-1990 10:49:29.19
File ID (798,38,0)   End of file block 72 / Allocated 72

Virtual block number 4 (00000004), 512 (0200) bytes

524F464C 45444F4D 434F5250 1600006D 726F4620 6C65646F 4D207373 65636F72 rocess Model Form...PROCMODELFOR 000000
890A468B D88EFFFF B81E5657 00000CC8 00000000 00015041 52545354 4F4F424D MBOOTSTRAP......à...WV.¡...Ä.F.. 000020
76FF1076 FF0000FF FF9A5016 FC468DF4 76FF0E76 FF1076FF 005FE9F4 468BF446 F¶.F¶Ō_..v..v..v¶.F•.P......v..v 000040
76FFFA76 FF0000FF FF9A5016 F8468D0E 76FF1076 FF0000FF FF9A5016 F646800E ..F-.P......v..v..F½.P......v'.v 000060
00880074 E90000FF FF9AF676 FFFC76FF FE76FF06 76FF0876 FF0A76FF 0C76FFF8 ½.v..v..v..v..v±.v=.v-.....Ōt.¡. 000080
7500CE3D FF8CE903 7500CC3D 002BE903 76FF99E9 037500D8 3D0068E9 006EE900 .Ōn.Ōk.=Û.u.Ō..v.Ō+.=ä.u.Ō..=ö.u 0000A0
3DFFBFE9 FF6CE903 7500093D FF74E903 7500063D FF7CE903 7500043D FF84E903 .Ō..=å.u.Ō|.=ø.u.Ōt.=].u.Ōl.Ō¢.= 0000C0
3DFF49E9 037500F6 3DFF51E9 037500F4 3DFF59E9 037500EE 3DFF61E9 037500EC š.u.Ōa.=Ÿ.u.ŌY.=¶.u.ŌQ.=-.u.ŌI.= 0000E0
1E565700 000CC800 0CCAC95F 5E1FFF8C E9FF39E9 037500FE 3DFF41E9 037500FC •.u.ŌA.=±.u.Ō9.Ō...^_èò..à...WV. 000100
9A5016FC 4680F476 FF0E76FF 1076FF00 5FE9F446 88F44689 0A468808 8E0008B8 ¡...Ä.F..F¶.F¶Ō_..v..v..v¶.F•.P. 000120
9A5016F8 46800E76 FF1076FF 00000037 9A5016F6 46800E76 FF1076FF 00000027 '....v..v..F-.P.7....v..v..F½.P. 000140
9AF676FF FC76FFFE 76FF0676 FF0876FF 0A76FF0C 76FFF876 FFFA76FF 00000047 G....v'.v½.v..v..v..v..v±.v=.v-. 000160
FF2E93C0 03FFECE9 03760032 3D00C92D 0079E900 7CE90000 B80082E9 0000FFFF ....Ō..¡..Ō|.Ōy.-è.=2.v.Ōš..å... 000180
57015701 57015701 01010101 01015701 57015701 57015701 01010101 010173A7 Ïs.......W.W.W.W.W.......W.W.W.W 0001A0
57015701 57015701 57015701 57010101 01010101 57015701 57015701 57015701 .W.W.W.W.W.W.......W.W.W.W.W.W.W 0001C0
57015701 57015701 01010101 01015701 57015701 57015701 01010101 01015701 .W.......W.W.W.W.W.......W.W.W.W 0001E0

Dump of file SATURN:[PCCOMMON.DUMP.DLL]PMFORM.TMP;1 on 18-APR-1990 10:49:29.19
File ID (798,38,0)   End of file block 72 / Allocated 72

Virtual block number 5 (00000005), 512 (0200) bytes

FF0A76FF D88E00F1 B81E5657 000002C8 000CCAC9 5F5E1F01 01010101 01015701 .W........^_èò..à...WV.¡þ..Ă.v.. 000000
00E90000 B80006E9 03750000 3DFE4689 0000FFFF 9A00C668 1E026A06 76FF0876 v..v.j..hó.......F±=..u.Ō..¡..Ō. 000020
9A5016F8 46800876 FF0A76FF D88E01E8 B81E5657 00005EC8 0006CAC9 5F5E1F00 ..^_èò..à^..WV.¡Ō..Ă.v..v..F½.P. 000040
9A5016EE 46800876 FF0A76FF 0000FFFF 9A5016F4 46800876 FF0A76FF 00000130 0....v..v..F¶.P......v..v..FŸ.P. 000060
F676FF00 0002D49A 006A006A 4B6A006A 01436806 76FFF876 FFFA76FF 0000FFFF .....v'.v½.v.hC.j.jKj.j..å....v- 000080
0006E903 7500003D F2468900 00FFFF9A 5016FC46 80076AEE 76FFF076 FFF476FF .v¶.vþ.vŸj..F=.P......F·=..u.Ō.. 0000A0
46890000 FFFF9A50 16A2468D 2F6AFC76 FFFE76FF F476FFF6 76FF007D E9F24688 .F·Ō)..v-.v¶.v±.v=j/.FÅ.P......F 0000C0
6A006A00 6A016E68 0676FFF8 76FFFA76 FF0054E9 F2468800 06E90375 00003DF2 ·=..u.Ō...F·ŌT..v'.v½.v.hn.j.j.j 0000E0
03099A50 16A2468D FF6A006A 01616806 76FFF876 FFFA76FF 000002EE 9A006A00 .j..Ÿ....v'.v½.v.ha.j.j..FÅ.P... 000100
0000B800 00FFFF9A FC76FFFE 76FF006A 006A0169 680676FF F876FFFA 76FF0000 ...v'.v½.v.hi.j.j..v±.v=.....¡.. 000120
16FC468D 0876FF0A 76FFD88E 0220B81E 56570000 5EC80006 CAC95F5E 1F0000E9 Ō...^_èò..à^..WV.¡ ..Ă.v..v..F=. 000140
16F2468D 0876FF0A 76FF0000 02409A50 16F8468D 0876FF0A 76FF0000 02309A50 P.0....v..v..F½.P.ə....v..v..F·. 000160
FF000003 D69A006A 006A4B6A 006A0143 680676FF FC76FFFE 76FF0000 02509A50 P.P....v±.v=.v.hC.j.jKj.j..•.... 000180
E9037500 003DF646 89000002 819A5016 A2468D15 6AF276FF F476FFF8 76FFFA76 v'.v½.v¶.v·j..FÅ.P......F-=..u.Ō 0001A0
000002AA 9A5016A6 4680026A A276FFA4 76FFF876 FFFA76FF 007DE9F6 46880006 ...F-Ō)..v'.v½.vÊ.vÅj..F`.P.`... 0001C0
6A006A01 6E680676 FFFC76FF FE76FF00 54E9F646 880006E9 03750000 3DF64689 .F-=..u.Ō...F-ŌT..v±.v=.v hn.j.j 0001E0

Dump of file SATURN:[PCCOMMON.DUMP.DLL]PMFORM.TMP;1 on 18-APR-1990 10:49:29.19
File ID (798,38,0)   End of file block 72 / Allocated 72

Virtual block number 6 (00000006), 512 (0200) bytes

9A5016A6 4680FF6A 006A0161 680676FF FC76FFFE 76FF0000 03F09A00 6A006A00 .j.j..þ....v±.v=.v.ha.j.j..FÍ.P. 000000
B8000002 699AA276 FFA476FF 006A006A 01696806 76FFFC76 FFFE76FF 00000408 .....v±.v=.v.hi.j.j..vÊ.vÅ.i...¡ 000020
76FF1476 FF1676FF D88E0322 B81E5657 000058C8 0006CAC9 5F5E1F00 00E90000 ..Ō...^_èò..àX..WV.¡"..Ă.v..v..v 000040
00003DFA 46890000 FFFF9A06 76FF0876 FF0A76FF 0C76FF0E 76FF1076 FF026A12 .j..v..v̄..v..v..v..v.......F'=.. 000060
5EC40CC4 83000004 0E9AFA76 FF019668 0A76FF0C 76FF5016 AA468000 27E90375 u.Ō'..F`.P.v..v.h...v'.ß....á.á^ 000080
76FF0135 E9000088 0006E903 74023F83 260E5EC4 0147E9FA 46880002 07C7260E .&ú....F'ŌG.á^.&.?.t.Ō..¡..Ō5..v 0000A0
76FF0000 03429A50 16FC4680 1476FF16 76FF0000 03529A50 16F6468D 1476FF16 ..v..F-.P.R....v..v..F•.P.B....v 0000C0
22E90375 00003DFA 46890000 03AC9A50 16AA468D 026AF676 FFF876FF FC76FFFE ±.v•.v½.v-j..F`.P.¯....F'=..u.Ō" 0000E0
FA468800 0207C726 0E5EC408 C4830000 051F9AFA 76FF0196 680A76FF 0C76FF00 ..v..v.h...v'......á.á^.&ú....F' 000100
E9037500 003DFA46 890000FF FF9A5016 AA468D00 D4681E14 76FF1676 FF000DE9 ŌÅ..v..v..hå..F`.P......F'=..u.Ō 000120
46880002 07C7260E 5EC408C4 830000FF FF9AFA76 FF019668 0A76FF0C 76FF0022 "..v..v.h...v'......á.á^.&ú....F 000140
FE76FF00 0BE90374 00AB7E83 0000FFFF 9A5016A8 468D1476 FF1676FF 008FE9FA 'Ō...v..v..F´.P......~`.t.Ō...v± 000160
76FF1676 FF0000FF FF9A016A F676FFF8 76FFFC76 FFFE76FF 0000FFFF 9AFC76FF .v•......v±.v=.v½.v-j.......v..v 000180
76FF1676 FF0000FF FF9A0676 FF0876FF 0A76FF0C 76FF0E76 FF1076FF 01086814 .h...v..v..v..v..v..v.......v..v 0001A0
00A16814 76FF1676 FF000005 B19A00A0 681476FF 1676FF00 0005A39A 009F6814 .h...È....v..v.h...Ý....v..v.hÀ. 0001C0
56570003 98C80012 CAC95F5E 1F0000E9 0000B800 0307C726 0E5EC400 00FFFF9A .....á^.&ú...¡..Ō...^_èò..à...WV 0001E0
```

```
Dump of file SATURN:[PCCOMMON.DUMP.DLL]PMFORM.TMP;1 on 18-APR-1990 10:49:29.19
File ID (798,38,0)   End of file block 72 / Allocated 72

Virtual block number 7 (00000007), 512 (0200) bytes

16F8468D 0876FF0A 76FF0000 03329A50 16FC468D 0876FF0A 76FFD88E 0424B81E .i$..Ä.v..v..F=.P.Z....v..v..F½. 000000
680676FF FC76FFFE 76FF0000 049A9A50 16EE468D 0876FF0A 76FF0000 04AA9A50 P.^....v..v..FŸ.P......v±.v=.v.h 000020
468D086A EE76FFF0 76FFF876 FFFA76FF 0000036B 9A006A00 6A038468 006A0143 C.j.h..j.j..k....v'.v½.vÞ.vŸj..F 000040
74F6460B F4468800 85E9F246 880006E9 03750000 3DF24689 00000383 9A5016F4 ¶.P......F·=..u.Õ...F·Õ...F¶.F-t 000060
9A5016FC 68868D03 8468F476 FFF676FF F876FFFA 76FF0074 E90000B8 0006E903 .Õ..¡..Õt..v'.v½.v-.v¶h....h=.P. 000080
681E0676 FFFC76FF FE76FF00 49E9F246 880006E9 03750000 3DF24689 0000FFFF .....F·=..u.Õ...F·Õl..v±.v·.v..h 0000A0
76FFFE76 FF0000FF FF9A5016 FC68868D 0676FFFC 76FFFE76 FF000006 A79A00E2 ã..Ï....v±.v=.v...h=.P..... v±.v 0000C0
5E1F0000 E90000B8 0000FFFF 9AF476FF F676FF00 6A505200 00FFFF9A 0676FFFC =.v.......RPj..v-.v¶.....¡... ..^ 0000E0
0005E29A 5016FC46 8D1476FF 1676FFD8 8E05D2B8 1E565700 039AC800 06CAC95F _èò..à...WV.¡Ø..Ä.v..v..F=.P.ä.. 000100
0006029A 5016EE46 8D1476FF 1676FF00 0005F29A 5016F846 8D1476FF 1676FF00 ..v..v..F½.P.·....v..v..FŸ.P.... 000120
76FFF876 FFFA76FF 0000FFFF 9A5016FC 68868D03 84681276 FFFC76FF FE76FF00 ..v±.v=.v.h....h=.P......v'.v½.v 000140
76FF0C76 FF0022E9 03750000 3DF24689 00000634 9A5016F4 468D086A EE76FFF0 Þ.vŸj..F¶.P.4....F·=..u.Õ"..v..v 000160
FA76FF01 C7E9F246 88000207 C7260E5E C408C483 00000467 9AF276FF 0196680A .h...v·.g....á.á^.&ú....F·Õú..v' 000180
0196680A 76FF0C76 FF0022E9 03750000 3DF24689 0000FFFF 9A00E468 1EF876FF .v½.hÕ.......F·=..u.Õ"..v..v.h.. 0001A0
74F6460B F4468801 8BE9F246 88000207 C7260E5E C408C483 000007DE 9AF276FF .v·.ß....á.á^.&ú....F·Õ...F¶.F-t 0001C0
2DE90375 00003DF2 46890000 FFFF9A50 16F4468D 126AF876 FFFA76FF 009DE903 .Õ...v'.v½j..F¶.P......F·=..u.Õ- 0001E0

Dump of file SATURN:[PCCOMMON.DUMP.DLL]PMFORM.TMP;1 on 18-APR-1990 10:49:29.19
File ID (798,38,0)   End of file block 72 / Allocated 72

Virtual block number 8 (00000008), 512 (0200) bytes

FA76FF00 0207C726 0E5EC408 C4830000 08319AF2 76FF0196 680A76FF 0C76FF00 ..v..v.h...v·.1....á.á^.&ú....v' 000000
FFF676FF 086AEE76 FFF076FF F876FFFA 76FF0136 E9F2468B 00000847 9AF876FF .v½.G....F·Õ6..v'.v½.vÞ.vŸj..v-. 000020
F276FF01 96680A76 FF0C76FF 002DE903 7500003D F2468900 00FFFF9A 036AF476 v¶j.......F·=..u.Õ-..v..v.h...v· 000040
E3E9F246 8B000008 9F9AF876 FFFA76FF 000207C7 260E5EC4 08C48300 0008839A ......á.á^.&ú....v'.v½......F·ÕD 000060
003DF246 890000FF FF9A5016 FC68868D 038468F4 76FFF676 FFF876FF FA76FF00 ..v'.v½.v-.v¶h....h=.P......F·=. 000080
07C7260E 5EC408C4 83000007 589AF276 FF019668 0A76FF0C 76FF0022 E9037500 .u.Õ"..v..v.h...v·.X....á.á^.&ú. 0000A0
9A5016FC 66868D14 76FF1676 FF0000FF FF9AF876 FFFA76FF 009CE9F2 46880002 ...F·Õ...v'.v½......v..v...f=.P. 0000C0
FFF876FF FA76FF00 0005549A F876FFFA 76FF0008 E9037400 FC668E83 00000540 ä..../f=.t.Õ...v'.v½.T....v'.v½. 0000E0
76FF0C76 FF0E76FF 1076FF01 0B681476 FF1676FF 00000567 9A016AEE 76FFF076 vÞ.vŸj..g....v..v.h...v..v..v..v 000100
1476FF16 76FF0000 09149A00 9F681476 FF1676FF 00000587 9A0676FF 0876FF0A ..v..v.......v..v.h........v..v. 000120
00880001 07C7260E 5EC40000 05959A00 A1681476 FF1676FF 00000922 9A00A068 h...".....v..v.hÅ......á^.&ú...¡. 000140
FC468D08 76FF0A76 FFD88E06 D0B81E56 57000398 C80012CA C95F5E1F 0000E900 .Õ...^_èò..à...WV.¡Ï..Ä.v..v..F= 000160
EE468D08 76FF0A76 FF000006 FD9A5016 F8468D08 76FF0A76 FF000006 ED9A5016 .P.Ú....v..v..F½.P.»....v..v..FŸ 000180
00061C9A 006A006A 03846800 6A014368 0676FFFC 76FFFE76 FF000007 009A5016 .P......v±.v=.v.hC.j.h..j.j..... 0001A0
7500003D F2468900 00073C9A 5016F446 8D0A6AEE 76FFF076 FFF876FF FA76FF00 ..v'.v½.vÞ.vŸj..F¶.P.<....F·=..u 0001C0
76FFFA76 FF0074E9 00008800 06E90374 F6460BF4 46880085 E9F2468B 0006E903 .Õ...F·Õ...F¶.F-t.Õ..¡..Õt..v'.v 0001E0

Dump of file SATURN:[PCCOMMON.DUMP.DLL]PMFORM.TMP;1 on 18-APR-1990 10:49:29.19
File ID (798,38,0)   End of file block 72 / Allocated 72

Virtual block number 9 (00000009), 512 (0200) bytes

0006E903 7500003D F2468900 0006709A 5016FC68 868D0384 68F476FF F676FFF8 ½.v-.v¶h....h=.P.p....F·=..u.Õ.. 000000
76FFFC76 FFFE76FF 00000A18 9A00FC68 1E0676FF FC76FFFE 76FF0049 E9F2468B .F·Õl..v±.v=.v..h=.......v±.v=.v 000020
76FF006A 50520000 06B59A06 76FFFC76 FFFE76FF 00000693 9A5016FC 68868D06 ...h=.P......v±.v=.v..ç...RPj..v 000040
0943B81E 56570003 9AC80006 CAC95F5E 1F0000E9 0000B800 0006C49A F476FFF6 -.v¶.á...¡..Õ...^_èò..à...WV.¡C. 000060
09639A50 16F8468D 1476FF16 76FF0000 09539A50 16FC468D 1476FF16 76FFD88E .Ä.v..v..F=.P.S....v..v..F½.P.c. 000080
868D0384 681276FF FC76FFFE 76FF0000 09739A50 16EE468D 1476FF16 76FF0000 ...v..v..FŸ.P.s....v±.v=.v.h.... 0000A0
0009A59A 5016F446 800A6AEE 76FFF076 FFF876FF FA76FF00 0007249A 5016FC68 h=.P.$....v'.v½.vÞ.vŸj..F¶.P.E.. 0000C0
08C48300 0007949A F276FF01 96680A76 FF0C76FF 0022E903 7500003D F2468900 ..F·=..u.Õ"..v..v.h...v·......á. 0000E0
F2468900 0007789A 00FE681E F876FFFA 76FF01C7 E9F2468B 000207C7 260E5EC4 á^.&ú....F·Õú..v'.v½.h±..x....F· 000100
260E5EC4 08C48300 00084F9A F276FF01 96680A76 FF0C76FF 0022E903 7500003D =..u.Õ"..v..v.h...v·.O....á.á^.& 000120
F4468D12 6AF876FF FA76FF00 9DE90374 F6460BF4 4688018B E9F2468B 000207C7 ú....F·Õ...F¶.F-t.Õ...v'.v½j..F¶ 000140
A29AF276 FF019668 0A76FF0C 76FF002D E9037500 003DF246 89000007 C29A5016 .P.ô....F·=..u.Õ-..v..v.h...v·.Å 000160
FF0136E9 F2468800 0008B89A F876FFFA 76FF0002 07C7260E 5EC408C4 8300000B ....á.á^.&ú....v'.v½.¡....F·Õ6.. 000180
00003DF2 46890000 08159A03 6AF476FF F676FF0A 6AEE76FF F076FFF8 76FFFA76 v'.v½.vÞ.vŸj..v-.v¶j.......F·=.. 0001A0
0207C726 0E5EC408 C4830000 08F49AF2 76FF0196 680A76FF 0C76FF00 2DE90375 u.Õ-..v..v.h...v·.¶....á.á^.&ú.. 0001C0
8468F476 FFF676FF F876FFFA 76FF00E3 E9F2468B 00000C10 9AF876FF FA76FF00 ..v'.v½......F·ÕD..v'.v½.v-.v¶h. 0001E0
```

```
Dump of file SATURN:[PCCOMMON.DUMP.DLL]PMFORM.TMP;1 on 18-APR-1990 10:49:29.19
File ID (798,38,0)   End of file block 72 / Allocated 72

Virtual block number 10 (0000000A), 512 (0200) bytes

 0196680A 76FF0C76 FF0022E9 03750000 3DF24689 00000867 9A5016FC 68868003 ...h=.P.g....F·=..u.Õ"..v..v.h.. 000000
 9AF876FF FA76FF00 9CE9F246 88000207 C7260E5E C408C483 00000AC9 9AF276FF .v·.è....á.á^.&ú.-..F·Õ...v'.v½. 000020
 FF0008E9 037400FC 668E8300 0008809A 5016FC66 86801476 FF1676FF 000007F4 ¶....v..v...f=.P.¯..../f=.t.Õ... 000040
 1676FF00 0008D89A 016AEE76 FFF076FF F876FFFA 76FF0000 08C59AF8 76FFFA76 v'.v½.é....v'.v½.vÞ.vŸj..Ä....v. 000060
 1676FF00 0008F89A 0676FF08 76FF0A76 FF0C76FF 0E76FF10 76FF010B 681476FF .v.h...v..v..v..v..v..v..½....v. 000080
 681476FF 1676FF00 000C939A 00A06814 76FF1676 FF00000C 859A009F 681476FF .v.h........v..v.h.........v..v.h 0000A0
 000064C8 0012CAC9 5F5E1F00 00E90000 B8000107 C7260E5E C4000009 069A0DA1 Å......á^.&ú...|..Õ...^_èò..àd.. 0000C0
 46800876 FF0A76FF 00000A5E 9A5016F8 46800876 FF0A76FF D88E0A4E B81E5657 WV.¡N..Ä.v..v..F½.P.^....v..v..F 0000E0
 76FF0876 FF0A76FF 00000A7E 9A5016E8 46800876 FF0A76FF 00000A6E 9A5016F4 ¶.P.n....v..v..FÒ.P.~....v..v..v 000100
 6A006A00 6A016E68 0477FF26 FC5EC4FB 76FFFA76 FF000001 109A5016 FC468006 ..F=.P......v'.v½á^=&.w.hn.j.j.j 000120
 0000FFFF 9A5016EE 4680066A E876FFEA 76FFF476 FFF676FF 0000098D 9A006A00 .j.......v~.v¶.võ.vÒj..FŸ.P..... 000140
 C1F25E88 F246FF00 03E90000 F246C700 A4E9EC46 880006E9 03750000 30EC4689 .Fš=..u.Õ...FšÕÉ.úF·..Õ...F·.^·ê 000160
 EE76C402 E3C1F25E 88F476FF F676FF00 60E90375 02400826 008826EE 76C402E3 D.ávŸ&..&.ə.u.Õm..v~.v¶.^·èD.ávŸ 000180
 46880006 E9037500 003DEC46 89000004 C29A5016 9C468001 6A30FF26 0270FF26 &.p.&.0j..F..P.ò....Fš=..u.Õ...F 0001A0
 FF26EE76 C402E3C1 F25E8850 169C4680 FC76FFFE 76FFF876 FFFA76FF 0051E9EC šÕ0..v'.v½.v±.v=.F..P.^·èD.ávŸ&. 0001C0
 76FFFF7B E9001AE9 EC468800 06E90375 00003DEC 46890000 FFFF9A30 FF260270 p.&.0......Fš=..u.Õ...FšÕ..Õ(..v 0001E0

Dump of file SATURN:[PCCOMMON.DUMP.DLL]PMFORM.TMP;1 on 18-APR-1990 10:49:29.19
File ID (798,38,0)   End of file block 72 / Allocated 72

Virtual block number 11 (0000000B), 512 (0200) bytes

 000064C8 0006CAC9 5F5E1F00 00E90000 B80000FF FF9AEE76 FFF076FF F476FFF6 -.v¶.vÞ.vŸ.....|..Õ...^_èò..àd.. 000000
 76FF1476 FF1676FF 00000CC4 9A5016A8 46801476 FF1676FF D88E0CB4 B81E5657 WV.¡Ç..Ä.v..v..F´.P.á....v..v..v 000020
 76FF1676 FF00000C D49A5016 A4468014 76FF1676 FF00000C F79A5016 B0468D12 ..F¯.P.¼....v..v..FÊ.P.à....v..v 000040
 9A501684 468D4B6A 0277FF26 805EC4A8 76FFAA76 FF00000C E49A5016 9E468D14 ..F..P.õ....v´.v´á^¯&.w.jK.FÇ.P. 000060
 00FFFF9A 50520000 0A269A02 77FF2680 5EC4A876 FFAA76FF 016A006A 00000A95 ....j.j..v´.v´á^¯&.w..&...RP.... 000080
 76FF0C76 FF0022E9 03750000 30A24689 00000AE9 9A011668 1EA476FF A676FF00 ..vÎ.vÊ.h...Õ....FÅ=..u.Õ"..v..v 0000A0
 6A006A01 26E9A246 88000207 C7260E5E C408C483 00000EF0 9AA276FF 0196680A .h...vÅ.Þ....á.á^.&ú....FÅÕ&.j.j 0000C0
 0000FFFF 9A006A56 6A5016AC 4680A476 FFA676FF 9E76FFA0 76FF5016 84468D00 ..FÇ.P.v..v..vÎ.vÊ.F¯.PjVj...... 0000E0
 9AA276FF 0196680A 76FF0C76 FF5016B4 4680003F E9037500 003DA246 8918C483 .á..FÅ=..u.Õ?..FÇ.P.v..v.h...vÅ. 000100
 FFA676FF 07892606 5EC40247 8826805E C4000407 C7260E5E C40CC483 00000805 .....á.á^.&ú...á^¯&.G.á^.&...vÎ. 000120
 76FF5016 B44680B0 76FFB276 FFA876FF AA76FF00 B6E90000 B80000FF FF9AA476 vÊ.....ı..ÕÑ..v¯.v´.vý.v¯.FÇ.P.v 000140
 9A50169C 468D1476 FF1676FF 00000B65 9AA476FF A676FF00 0000B69A AC76FFAE Û.v¯.Ñ....vÎ.vÊ.e....v..v..F..P. 000160
 76FFA476 FFA676FF 00000C36 9AA476FF A676FF00 0BE90374 009C7E83 00000C21 !....~..t.Õ...vÎ.vÊ.6....vÎ.vÊ.v 000180
 0A76FF0C 76FF0E76 FF1076FF 01086814 76FF1676 FF00000C 499A016A 9E76FFA0 ..v.j..!....v..v.h...v..v..v..v. 0001A0
 681476FF 1676FF00 000FB39A 009F6814 76FF1676 FF00000C 699A0676 FF0876FF .v..v..i....v..v.h...•....v..v.h 0001C0
 0000B800 0307C726 0E5EC400 000C779A 00A16814 76FF1676 FF00000F C19A00A0 ...ê....v..v.hÅ..w...á^.&ú...¡.. 0001E0

Dump of file SATURN:[PCCOMMON.DUMP.DLL]PMFORM.TMP;1 on 18-APR-1990 10:49:29.19
File ID (798,38,0)   End of file block 72 / Allocated 72

Virtual block number 12 (0000000C), 512 (0200) bytes

 16AC468D 1476FF16 76FFD88E 00F4B81E 56570000 FEC80012 CAC95F5E 1F0000E9 Õ...^_èò..à±..WV.¡¶..Ä.v..v..F¯. 000000
 8D1476FF 1676FF00 000E179A 5016B046 8D1276FF 1476FF16 76FF0000 0E049A50 P......v..v..v..F´.P......v..v.. 000020
 C4AC76FF AE76FF00 000E279A 5016A846 8D1476FF 1676FF00 000E379A 50169C46 F..P.7....v..v..F´.P.'....vÛ.v¯á 000040
 8D0477FF 26805EC4 AC76FFAE 76FF0000 0E509A50 16844680 4B6A0277 FF26805E ^¯&.w.jK.FÇ.P.P....vÛ.v¯á^¯&.w.. 000060
 0E669A02 77FF2680 5EC4AC76 FFAE76FF 016A006A 0000FFFF 9A4B6A50 16FF0486 ....PjK.....j.j..vÛ.v¯á^¯&.w..f. 000080
 03750000 3DA04689 00000E7C 9A012368 1EA876FF AA76FF00 000E609A 50520000 ..RP.m....v´.v´.h#..|....F.=..u. 0000A0
 88000207 C7260E5E C408C483 000010E5 9AA076FF 0196680A 76FF0C76 FF0022E9 Õ"..v..v.h...v..Î....á.á^.&ú.... 0000C0
 A0468900 00002C9A 5016A246 8D066A9C 76FF9E76 FFA876FF AA76FF02 2FE9A046 F.Õ/..v¯.v´.v..v.j..FÅ.P.,....F. 0000E0
 260E5EC4 08C48300 0011559A A076FF01 96680A76 FF0C76FF 0022E903 7500003D =..u.Õ"..v..v.h...v..U....á.á^.& 000100
 8826A276 C402E3C1 A65E88A6 46FF0003 E90000A6 46C701EA E9A0468B 000207C7 ú....F.Õõ.úF!..Õ...F!.^Ièð.ávÅ&. 000120
 30FF2602 70FF26A2 76C402E3 C1A65E88 A876FFAA 76FF00E6 E9037502 40082600 .&.ə.u.Õ!..v¯.v´.^Ièð.ávÅ&.p.&.0 000140
 96680A76 FF0C76FF 002DE903 7500003D A0468900 00007F9A 5016FF50 8680016A j...P..P......F.=..u.Õ-..v..v.h. 000160
 8800000F 409AA876 FFAA76FF 000207C7 260E5EC4 08C48300 0011CD9A A076FF01 ..v..ë....á.á^.&ú....v¯.v´.ə.... 000180
 76FF006F E9037400 00300000 FFFF9A50 16FF5086 805016FF 04868D01 6FE9A046 F.Õo......P..P..P.....=..t.Õo..v 0001A0
 0000FFFF 9A5016B4 4680016A 30FF2602 70FF26A2 76C402E3 C1A65E88 A876FFAA ¯.v´.^Ièð.ávÅ&.p.&.0j..FÇ.P..... 0001C0
 000E989A A076FF01 96680A76 FF0C76FF 50168446 8D003FE9 03750000 3DA04689 .F.=..u.Õ?..FÇ.P.v..v.h...v..... 0001E0
```

Dump of file SATURN:[PCCOMMON.DUMP.DLL]PMFORM.TMP;1 on 18-APR-1990 10:49:29.19
File ID (798,38,0)   End of file block 72 / Allocated 72

Virtual block number 13 (0000000D), 512 (0200) bytes

```
9AA876FF AA76FF07 8926065E C40247B8 26B05EC4 000407C7 260E5EC4 0CC48300 ..á.á^.&ú...á^¯&.G.á^.&...v´.v´. 000000
0000D89A A276FFA4 76FFA876 FFAA76FF FF02E900 03E900EA E9000088 00000F13 ....|..Ôõ.Õ..Õ...v´.v´.vÉ.vÅ.Ü.. 000020
FF016A00 6A0000FF FF9A006A 006A5016 B4468DB0 76FFB276 FFAC76FF AE76FF00 ..vÛ.v¯.vý.v¯.fÇ.Pj.j......j.j.. 000040
6B9AA876 FFAA76FF 00001075 9A505200 00106E9A 0277FF26 B05EC4AC 76FFAE76 vÛ.v¯á^¯&.w..n...RP.u....v´.v´.k 000060
76FF000B E9037400 FF02BE83 00000F50 9A5016FF 02868D14 76FF1676 FF000011 ....v..v......P.P..../...t.Õ...v 000080
FF1676FF 00000F77 9A016A9C 76FF9E76 FFA876FF AA76FF00 000F649A A876FFAA ¯.v´.d....v´.v´.v..v.j..w....v.. 0000A0
FF1676FF 00000F97 9A0676FF 0876FF0A 76FF0C76 FF0E76FF 1076FF01 08681476 v.h...v..v..v..v..v..v.......v.. 0000C0
A1681476 FF1676FF 000012D2 9A00A068 1476FF16 76FF0000 12C49A00 9F681476 v.h...á....v..v.h...●....v..v.hÅ 0000E0
57000084 C80012CA C95F5E1F 0000E900 00B80003 07C7260E 5EC40000 0FA59A00 ..È...á^.&ú...|..Õ...^_èò..àÇ..W 000100
1276FF14 76FF1676 FF00000F F29A5016 AC468014 76FF1676 FFD88E0F E2B81E56 V.|ã..Ä.v..v..F¯.P.·....v..v..v. 000120
1476FF16 76FF0000 10259A50 16A8468D 1476FF16 76FF0000 10059A50 16B0468D .F¯.P......v..v..F´.P.%....v..v. 000140
3E9A5016 B446804B 6A0277FF 26B05EC4 AC76FFAE 76FF0000 10159A50 169C468D .F..P......vÛ.v¯á^¯&.w.jK.fÇ.P.> 000160
5EC4AC76 FFAE76FF 016A006A 0000FFFF 9AB076FF B276FFAC 76FFAE76 FF000010 ....vÛ.v¯.vý.v¯.....j.j..vÛ.v¯á^ 000180
00001084 9A014168 1EA876FF AA76FF00 0012449A 50520000 123D9A02 77FF2680 ¯&.w..=...RP.D....v´.v´.hA...... 0001A0
C408C483 000013ED 9AA076FF 0196680A 76FF0C76 FF0022E9 03750000 30A04689 .F.=..u.Õ"..v..v.h...v..Ü....á.á 0001C0
5016A246 8D066A9C 76FF9E76 FFA876FF AA76FF01 D8E9A046 8B000207 C7260E5E ^.&ú....F.ÕÄ..v´.v´.v..v.j..FÅ.P 0001E0
```

Dump of file SATURN:[PCCOMMON.DUMP.DLL]PMFORM.TMP;1 on 18-APR-1990 10:49:29.19
File ID (798,38,0)   End of file block 72 / Allocated 72

Virtual block number 14 (0000000E), 512 (0200) bytes

```
0014689A A076FF01 96680A76 FF0C76FF 002DE903 7500003D A0468900 0010C99A .è....F.=..u.Õ-..v..v.h...v..h.. 000000
A646C701 88E9A046 8B000015 009AA876 FFAA76FF 000207C7 260E5EC4 08C48300 ..á.á^.&ú....v´.v´......F.Õ..úF| 000020
AA76FF00 8BE90375 02400826 008B26A2 76C402E3 C1A65E88 A646FF00 03E90000 ..Õ...FÍ.^ÌèD.ávÅ&..&.ə.u.ÕE..v¯ 000040
00001139 9A5016FF 4E868D01 6A30FF26 0270FF26 A276C402 E3C1A65E 88A876FF .v¯.^ÌèD.ávÅ&.p.&.0j...N..P.9... 000060
C408C483 000014CD 9AA076FF 0196680A 76FF0C76 FF0022E9 03750000 30A04689 .F.=..u.Õ"..v..v.h...v..ë....á.á 000080
00003D00 0011829A 5016B446 8D5016FF 4E868D01 18E9A046 8B000207 C7260E5E ^.&ú....F.Õ....N..P.FÇ.P.....=.. 0000A0
50169A46 8D30FF26 0270FF26 A276C402 E3C1A65E 8BA876FF AA76FF00 50E90374 t.ÕP..v´.v´.^ÌèD.ávÅ&.p.&.0.F..P 0000C0
0010A09A A076FF01 96680A76 FF0C76FF 0022E903 7500003D A0468900 00FFFF9A ......F.=..u.Õ"..v..v.h...v..... 0000E0
76FFA876 FFAA76FF FF2DE900 03E900B3 E9A0468B 000207C7 260E5EC4 08C48300 ..á.á^.&ú....F.Õ°.Õ..Õ-..v´.v´.v 000100
5016FF4C 868D1476 FF1676FF 0000124F 9AA876FF AA76FF00 0012009A A276FFA4 Ê.vÅ......v´.v´.O....v..v...L..P 000120
A876FFAA 76FF0000 12759AA8 76FFAA76 FF0008E9 037400FF 4CBE8300 0012609A .'..../L..t.Õ...v´.v´.u....v´.v´ 000140
FF0C76FF 0E76FF10 76FF0108 681476FF 1676FF00 0012889A 016A9C76 FF9E76FF .v..v.j.......v..v.h...v..v..v.. 000160
76FF1676 FF000015 759A009F 681476FF 1676FF00 0012A89A 0676FF08 76FF0A76 v..v..v..´....v..v.h...u....v..v 000180
8B000307 C7260E5E C4000012 B69A00A1 681476FF 1676FF00 0015839A 00A06814 .h........v..v.hÅ..Ñ...á^.&ú...| 0001A0
46800876 FF0A76FF D88E12F3 B81E5657 000068C8 0012CAC9 5F5E1F00 00E90000 ..Õ...^_èò..àh..WV.|æ..Ä.v..v..F 0001C0
46800876 FF0A76FF 00001326 9A5016F0 46800876 FF0A76FF 00001303 9A5016F4 ¶.P.....¯.v..v..Fb.P.&....v..v..F 0001E0
```

Dump of file SATURN:[PCCOMMON.DUMP.DLL]PMFORM.TMP;1 on 18-APR-1990 10:49:29.19
File ID (798,38,0)   End of file block 72 / Allocated 72

Virtual block number 15 (0000000F), 512 (0200) bytes

```
76FFF676 FF000013 169A5016 F8468006 76FF0876 FF0A76FF 00001336 9A5016E4 ð.P.6....v..v..v..F%.P......v-.v 000000
76FFF076 FFF276FF 00000014 9A006A00 6A006A00 6A016E68 0477FF26 F85EC4F4 ¶á^%&.w.hn.j.j.j.j.......v·.vÞ.v 000020
E5E9E846 880006E9 03750000 3DE84689 000013D1 9A5016FC 468D036A E476FFE6 Ì.vôj..F=.P.Ì....Fò=..u.Õ...FòÕÌ 000040
AEE90375 02400826 008826FC 76C402E3 C1EE5E88 EE46FF00 03E90000 EE46C700 .úFŸ..Õ...FŸ.^ŸèD.áv=&..&.ə.u.ÕÜ 000060
AD9A5016 EA468D04 6A30FF26 0270FF26 FC76C402 E3C1EE5E 8BF076FF F276FF00 ..v·.vÞ.^ŸèD.áv=&.p.&.0j..Fõ.P.Ù 000080
E90003E9 0375EC46 08EA4688 0092E9E8 46880006 E9037500 003DE846 8900000A ....Fò=..u.Õ...FòÕ...Fõ.Fšu.Õ..Õ 0000A0
9A501698 468D016A 30FF2602 70FF26FC 76C402E3 C1EE5E88 F076FFF2 76FFFFA7 Ì..v·.vÞ.^ŸèD.áv=&.p.&.0j..F..P. 0000C0
76FFFA76 FFF476FF F676FF00 51E9E846 880006E9 03750000 30E84689 0000144C L....Fò=..u.Õ...FòÕQ..v-.v¶.v'.v 0000E0
003DE846 8900000F 359A30FF 260270FF 26FC76C4 02E3C1EE 5E885016 98468DF8 %.F..P.^ŸèD.áv=&.p.&.0.5....Fò=. 000100
000014F5 9AFC76FF FE76FFF0 76FFF276 FFFF3AE9 001AE9E8 46880006 E9037500 .u.Õ...FòÕ..Õ:..v·.vÞ.v±.v=.%... 000120
8D1476FF 1676FFD8 8E15A4B8 1E565700 0064C800 06CAC95F 5E1F0000 E9000088 |..Õ...^_èò..àd..WV.|Ê..Ä.v..v.. 000140
FF1676FF 000015E7 9A5016AC 46801276 FF1476FF 1676FF00 0015B49A 5016A846 F´.P.Ç....v..v..v..F¯.P.Ó....v.. 000160
FFAA76FF 000015D4 9A50169E 46801476 FF1676FF 000015C4 9A5016A4 46801476 v..FÊ.P.á....v..v..F..P.å....v´. 000180
C4A876FF AA76FF01 6A006A00 00134F9A 5016B046 8D4B6A02 77FF26AC 5EC4A876 v´á^¯&.w.jK.F¯.P.O...j.j..v´.v´á 0001A0
00138C9A 0150681E A476FFA6 76FF0000 137D9A50 52000013 769A0277 FF26AC5E ^¯&.w..v...RP.)....vÌ.vÉ.hP..... 0001C0
08C48300 00182A9A A276FF01 96680A76 FF0C76FF 002DE903 7500003D A2468900 ..FÅ=..u.Õ-..v..v.h...vÅ.*....á. 0001E0
```

```
Dump of file SATURN:[PCCOMMON.DUMP.DLL]PMFORM.TMP;1 on 18-APR-1990 10:49:29.19
File ID (798,38,0)   End of file block 72 / Allocated 72

Virtual block number 16 (00000010), 512 (0200) bytes

 50168046 80016A01 24E9A246 88000018 5E9AA476 FFA676FF 000207C7 260E5EC4 á^.&ú....vÎ.vÊ.^....FÀÕ$.j..F¯.P 000000
 A2468916 C4830000 0ECC9A00 6A576A50 16FC468D A476FFA6 76FF9E76 FFA076FF .v..v..vÎ.vÊ.F=.PjWj..ä....á..FÀ 000020
 C4830000 13A89AA2 76FF0196 680A76FF 0C76FF50 16804680 003FE903 7500003D =..u.Õ7..F¯.P.v..v.h...vÀ.´....á 000040
 0011F09A A476FFA6 76FF0789 26065EC4 02478826 AC5EC400 0407C726 0E5EC40C .á^.&ú...á^¯&.G.á^.&...vÎ.vÊ.Þ.. 000060
 4680AC76 FFAE76FF A876FFAA 76FF0000 14039AA4 76FFA676 FF00B6E9 00008800 _¡..ÕÑ..vÎ.vÊ......v´.v´.vÜ.v¯.F 000080
 7E830000 15119A50 169C4680 1476FF16 76FF0000 16E79AFC 76FFFE76 FF501680 ¯.P.v±.v=.Ô....v..v..F..P......- 0000A0
 016A9E76 FFA076FF A476FFA6 76FF0000 15269AA4 76FFA676 FF000BE9 0374009C ..t.Õ...vÎ.vÊ.&....vÎ.vÊ.v..v.j. 0000C0
 0676FF08 76FF0A76 FF0C76FF 0E76FF10 76FF0108 681476FF 1676FF00 0015399A .9....v..v.h...v..v..v..v..v..v. 0000E0
 0018FB9A 00A06814 76FF1676 FF000018 ED9A009F 681476FF 1676FF00 0015599A .Y....v..v.h...Ù....v..v.h...«.. 000100
 5F5E1F00 00E90000 B8000307 C7260E5E C4000015 679A00A1 681476FF 1676FF00 ..v..v.hÀ..g...á^.&ú...¡..Õ...^_ 000120
 00001735 9A5016A8 468D1476 FF1676FF D88E1725 B81E5657 0000FEC8 0012CAC9 èò..à±..WV.¡%..Á.v..v..F´.P.5... 000140
 689A5016 9C468D14 76FF1676 FF000017 489A5016 AC468D12 76FF1476 FF1676FF .v..v..v..F¯.P.H....v..v..F..P.h 000160
 0277FF26 AC5EC4A8 76FFAA76 FF000017 589A5016 A4468D14 76FF1676 FF000017 ....v..v..FÊ.P.X....v´.v´á^¯&.w. 000180
 6A5016FF 04868004 77FF26AC 5EC4A876 FFAA76FF 00001781 9A5016B4 468D4B6A jK.FÇ.P......v`.v´á^¯&.w......Pj 0001A0
 7E9A5052 00001B77 9A0277FF 26AC5EC4 A876FFAA 76FF016A 006A0000 10589A48 K.X...j.j..v`.v´á^¯&.w..w...RP.- 0001C0
 0C76FF00 22E90375 000030A0 46890000 17AD9A01 5D681EA4 76FFA676 FF000018 ....vÎ.vÊ.h)..Ù....F.=..u.Õ"..v. 0001E0

Dump of file SATURN:[PCCOMMON.DUMP.DLL]PMFORM.TMP;1 on 18-APR-1990 10:49:29.19
File ID (798,38,0)   End of file block 72 / Allocated 72

Virtual block number 17 (00000011), 512 (0200) bytes

 FF022FE9 A0468800 0207C726 0E5EC408 C4830000 1A1F9AA0 76FF0196 680A76FF .v.h...v.......á.á^.&ú....F.Õ/.. 000000
 E9037500 0030A046 89000016 1C9A5016 B0468D03 6A9C76FF 9E76FFA4 76FFA676 vÎ.vÊ.v..v.j..F¯.P......F.=..u.Õ 000020
 46880002 07C7260E 5EC408C4 8300001A 8F9AA076 FF019668 0A76FF0C 76FF0022 "..v..v.h...v.......á.á^.&ú....F 000040
 7502400B 26008826 B076C402 E3C1A25E 8BA246FF 0003E900 00A246C7 01EAE9A0 .Õõ.úFÀ..Õ...FÀ.^ÀëD.áv¯&..&.ə.u 000060
 FF50868D 016A30FF 260270FF 268076C4 02E3C1A2 5E88A476 FFA676FF 00E6E903 .ÕÎ..vÎ.vÊ.^ÀëD.áv¯&.p.&.0j...P. 000080
 079AA076 FF019668 0A76FF0C 76FF002D E9037500 0030A046 89000016 B09A5016 .P.¯....F.=..u.Õ-..v..v.h...v... 0000A0
 8D016FE9 A0468800 001B899A A476FFA6 76FF0002 07C7260E 5EC408C4 83000018 ....á.á^.&ú....vÎ.vÊ......F.Õo.. 0000C0
 5E88A476 FFA676FF 006FE903 7400003D 00001489 9A5016FF 50868D50 16FF0486 ....P..P..P.....=..t.Õo..vÎ.vÊ.^ 0000E0
 00003DA0 46890000 11AC9A50 16844680 016A30FF 260270FF 268076C4 02E3C1A2 ÀëD.áv¯&.p.&.0j..FÇ.P.¯....F.=.. 000100
 5EC40CC4 83000017 C99AA076 FF019668 0A76FF0C 76FF5016 B4468D00 3FE90375 u.Õ7..FÇ.P.v..v.h...v..è....á.á^ 000120
 00B80000 184D9AA4 76FFA676 FF078926 065EC402 478826AC 5EC40004 07C7260E .&ú...á^¯&.G.á^.&...vÎ.vÊ.M...¡. 000140
 76FFAA76 FF000017 0C9AB076 FFB276FF A476FFA6 76FFFF02 E90003E9 00EAE900 .Õõ.Õ..Õ...vÎ.vÊ.vý.v¯......v`.v 000160
 C4A876FF AA76FF01 6A006A00 0012279A 006A006A 5016B446 8DAC76FF AE76FFA8 `.vÜ.v¯.FÇ.Pj.j..'...j.j..v`.v´á 000180
 1676FF00 0017DF9A A476FFA6 76FF0000 179E9A50 52000017 979A0277 FF26AC5E ^¯&.w......RP......vÎ.vÊ.Ô....v. 0001A0
 9E9AA476 FFA676FF 000BE903 7400FF02 BE830000 188A9A50 16FF0286 8D1476FF .v......P......ƒ...t.Õ...vÎ.vÊ.. 0001C0
 FF010868 1476FF16 76FF0000 18819A01 6A9C76FF 9E76FFA4 76FFA676 FF000018 ....vÎ.vÊ.v..v.j..Ÿ....v..v.h... 0001E0

Dump of file SATURN:[PCCOMMON.DUMP.DLL]PMFORM.TMP;1 on 18-APR-1990 10:49:29.19
File ID (798,38,0)   End of file block 72 / Allocated 72

Virtual block number 18 (00000012), 512 (0200) bytes

 9A009F68 1476FF16 76FF0000 18D19A06 76FF0876 FF0A76FF 0C76FF0E 76FF1076 v..v..v..v..v..v..Ì....v..v.h... 000000
 000018DF 9A00A168 1476FF16 76FF0000 1C0C9A00 A0681476 FF1676FF 00001BFE ±....v..v.h........v..v.hÀ..Ô... 000020
 8E191CB8 1E565700 00B4C800 12CAC95F 5E1F0000 E90000B8 000307C7 260E5EC4 á^.&ú...¡..Õ...^_èò..àÇ..WV.¡... 000040
 9A5016AC 468D1276 FF1476FF 1676FF00 00192C9A 5016A846 8D1476FF 1676FFD8 Ä.v..v..F´.P.,....v..v..v..F¯.P. 000060
 9A50169C 468D1476 FF1676FF 0000195F 9A5016A4 468D1476 FF1676FF 0000193F ?....v..v..FÊ.P._....v..v..F..P. 000080
 AA76FF00 0019789A 50168446 8D4B6A02 77FF26AC 5EC4A876 FFAA76FF 000019?F O....v¯.v´á^¯&.w.jK.FÇ.P.x....v´ 0000A0
 9A0277FF 26AC5EC4 A876FFAA 76FF016A 006A0000 13609AAC 76FFAE76 FFA876FF .v´.vÜ.v¯.'...j.j..v`.v´á^¯&.w.. 0000C0
 000030A0 46890000 19BE9A01 7B681EA4 76FFA676 FF000019 AF9A5052 000019A8 ´...RP.£....vÎ.vÊ.h(..ƒ....F.=.. 0000E0
 0207C726 0E5EC408 C4830000 19DA9AA0 76FF0196 680A76FF 0C76FF00 22E90375 u.Õ"..v..v.h...v..Õ....á.á^.&ú.. 000100
 8900001A 039A5016 B0468D03 6A9C76FF 9E76FFA4 76FFA676 FF01CAE9 A0468800 ..F.Õò..vÎ.vÊ.v..v.j..F¯.P...... 000120
 5EC408C4 8300001C E29AA076 FF019668 0A76FF0C 76FF002D E9037500 0030A046 F.=..u.Õ-..v..v.h...v..è ...á.á^ 000140
 FF0003E9 0000A246 C7017AE9 A0468800 001E2C9A A476FFA6 76FF0002 07C7260E .&ú....vÎ.vÊ.,....F.Õz.úı ´..Õ... 000160
 A25E88A4 76FFA676 FF00ADE9 03750240 08260088 268076C4 02E3C1A2 5E88A246 FÀ.^ÀëD.áv¯&..&.ə.u.ÕÙ..vı. Ê.^À 000180
 00003DA0 46890000 1A739A50 16FF4E86 8D016A30 FF260270 FF268076 C402E3C1 ëD.áv¯&.p.&.0j...N..P.s....F.=.. 0001A0
 0111E9A0 46880AC4 831E0300 109A5016 FF4E868D 018A681E A076FF00 18E90375 u.Õ...v..h....N..P......á..F.Õ.. 0001C0
 5E88A476 FFA676FF 0049E903 7400003D 00001A8C 9A501684 46805016 FF4E868D ..N..P.FÇ.P.¥...=..t.ÕÎ..vÎ.vÊ.^ 0001E0
```

Dump of file SATURN:[PCCOMMON.DUMP.DLL]PMFORM.TMP;1 on 18-APR-1990 10:49:29.19
File ID (798,38,0)   End of file block 72 / Allocated 72

Virtual block number 19 (00000013), 512 (0200) bytes

```
03750000 3DA04689 000014B1 9A50169A 468D30FF 260270FF 268076C4 02E3C1A2 ÅèÐ.óv¯&.p.&.0.F..P.Ý....F.=..u. 000000
03E900B3 E9A0468B 0AC483FF FF00109A 5016FF4E 868D01A8 681EA076 FF001BE9 Õ...v..h´...N..P......ó..F.Õ°.Õ. 000020
00001AA5 9AA476FF A676FF00 001B479A 8076FFB2 76FFA476 FFA676FF FF3BE900 .Õ;..vÎ.vÊ.vý.v¯.G....vÎ.vÊ.Ê... 000040
76FFA676 FF000BE9 037400FF 4CBE8300 001B9A9A 5016FF4C 868D1476 FF1676FF .v..v...L..P....../L..t.Õ...vÎ.v 000060
681476FF 1676FF00 001BC29A 016A9C76 FF9E76FF A476FFA6 76FF0000 1BAF9AA4 Ê.Ê....vÎ.vÊ.v..v.j..ô....v..v.h 000080
681476FF 1676FF00 001BE29A 0676FF08 76FF0A76 FF0C76FF 0E76FF10 76FF010B ...v..v..v..v..v..v..ā....v..v.h 0000A0
F09A00A1 681476FF 1676FF00 001EAF9A 00A06814 76FF1676 FF00001E A19A009F ...Å....v..v.h...Ê....v..v.hÅ..Þ 0000C0
B81E5657 000064C8 0012CAC9 5F5E1F00 00E90000 B8000307 C7260E5E C400001B ...á^.&ú...¡..Õ...^_èò..àd..WV.¡ 0000E0
9A5016F4 468D0876 FF0A76FF 00001C30 9A5016F8 468D0876 FF0A76FF D88E1C2D -..Å.v..v..F½.P.=...¯v..v..F¶.P. 000100
FC468D06 76FF0876 FF0A76FF 00001C70 9A5016EC 468D0876 FF0A76FF 00001C60 '....v..v..Fš.P.p....v..v..v..F• 000120
9A006A00 6A006A00 6A016E68 0477FF26 FC5EC4F8 76FFFA76 FF00001C 509A5016 .P.P....v¹.v½á^•&.w.hn.j.j.j.j.. 000140
3DF04689 0000100B 9A50169C 4680046A EC76FFEE 76FFF476 FFF676FF 00001604 .....v~.v¶.vŸ.všj..F..P......Fÿ= 000160
B8E9F046 8B0AC483 1FCD0010 9A5016A0 468D018E 681EF076 FF001AE9 03750000 ..u.Õ...vÞ.h/..F..P...ë..ó..FÞÕ¡ 000180
81E90375 02400B26 00B8269C 76C402E3 C1F25EB8 F246FF00 03E90000 F246C700 .úF·..Õ...F·.^·èÐ.óv.&..&.ä.u.Õ. 0001A0
869A5016 A0468D01 6A30FF26 0270FF26 9C76C402 E3C1F25E 8BF476FF F676FF00 ..v~.v¶.^·èÐ.óv.&.p.&.0j..F..P.. 0001C0
831DA500 109A5016 A0468D01 DA681EF0 76FF001A E9037500 003DF046 8900001D ....Fÿ=..u.Õ...vÞ.hÖ..F..P...Ê.. 0001E0
```

Dump of file SATURN:[PCCOMMON.DUMP.DLL]PMFORM.TMP;1 on 18-APR-1990 10:49:29.19
File ID (798,38,0)   End of file block 72 / Allocated 72

Virtual block number 20 (00000014), 512 (0200) bytes

```
C402E3C1 F25E8850 16A0468D FC76FFFE 76FFF876 FFFA76FF 0051E9F0 46880AC4 á..FÞÕQ..v¹.v½.vz.v•.F..P.^·èÐ.á 000000
E9001AE9 F0468800 06E90375 00003DF0 46890000 187A9A30 FF260270 FF269C76 v.&.p.&.0.z....Fÿ=..u.Õ.. ᶠÞÕ..Õ 000020
0006CAC9 5F5E1F00 00E90000 B800001E 219A9C76 FF9E76FF F476FFF6 76FFFF67 g..v~.v¶.v..v..!...¡..Õ...  èò.. 000040
FF1676FF 00001EE0 9A5016AC 468D1476 FF1676FF D88E1ED0 B81E5657 000064C8 àd..WV.¡Å..Å.v..v..F¯.P.Å...../.. 000060
FF00001E F09A5016 A8468D14 76FF1676 FF00001F 139A5016 B0468D12 76FF1476 v..v..F¯.P......v..v..F¯.P.Þ.... 000080
468D4B6A 0277FF26 B05EC4AC 76FFAE76 FF00001F 009A5016 9E468D14 76FF1676 v..v..F..P......vÛ.v¯á^¯&.w.jK.F 0000A0
50520000 1CB09A02 77FF26B0 5EC4AC76 FFAE76FF 016A006A 00001C89 9A5016B4 Ç.P.....j.j..vÛ.v¯á^¯&.w..¯...RP 0000C0
FF0022E9 03750000 3DA24689 00001CC6 9A01F868 1EA876FF AA76FF00 001CB79A .ñ....v˙.v˙.h½..ó....FÅ=..u.Õ".. 0000E0
22E9A246 B8000207 C7260E5E C408C483 00002130 9AA276FF 0196680A 76FF0C76 v..v.h...vÅ.0!...á.á^.&ú....FÅÕ" 000100
00001806 9A006A58 6A5016A4 468DA876 FFAA76FF 9E76FFA0 76FF5016 B4468D01 ..FÇ.P.v..v..v˙.v´.FÊ.PjXj...... 000120
9AA276FF 0196680A 76FF0C76 FF5016B4 468D003F E9037500 003DA246 8914C483 .á..FÅ=..u.Õ?..FÇ.P.v..v.h...vÅ. 000140
FFAA76FF 07892606 5EC40247 8B26805E C4000407 C7260E5E C40CC483 00001D27 '....á.á^.&ú...á^¯&.G.á^.&...v˙. 000160
76FFAC76 FFAE76FF 00001D3D 9AA876FF AA76FF00 B6E90000 B800001B 2A9AA876 v˙.*...¡..ÕÑ..v˙.v´.=....vÛ.v¯.v 000180
9A50169C 468D1476 FF1676FF 00001FFA 9AA476FF A676FF50 16B4468D B076FFB2 ý.v¯.FÇ.P.vÎ.vÊ.'....v..v..F..P. 0001A0
76FFA876 FFAA76FF 00001E52 9AA876FF AA76FF00 0BE90374 009C7E83 00001E3D =....~..t.Õ...v˙.v´.R....v˙.v´.v 0001C0
0A76FF0C 76FF0E76 FF1076FF 01086814 76FF1676 FF00001E 659A016A 9E76FFA0 ..v.j..e....v..v.h...v..v..v..v. 0001E0
```

Dump of file SATURN:[PCCOMMON.DUMP.DLL]PMFORM.TMP;1 on 18-APR-1990 10:49:29.19
File ID (798,38,0)   End of file block 72 / Allocated 72

Virtual block number 21 (00000015), 512 (0200) bytes

```
681476FF 1676FF00 0021F39A 009F6814 76FF1676 FF00001E 859A0676 FF0876FF .v..v.......v..v.h...øÌ...v..v.h 000000
0000B800 0307C726 0E5EC400 001E939A 00A16814 76FF1676 FF000022 019A00A0 ....".....v..v.hÅ......á^.&ú...¡.. 000020
16AC4680 1476FF16 76FFD88E 2038B81E 56570000 FCC80012 CAC95F5E 1F0000E9 Õ...^_èò..à•..WV.¡8 .Å.v..v..F¯. 000040
8D1476FF 1676FF00 00205B9A 50168046 8D1276FF 1476FF16 76FF0000 20489A50 P.H ¯..v..v..v..F¯.P.[ ...v..v.. 000060
C4AC76FF AE76FF00 0020689A 5016A846 8D1476FF 1676FF00 002078 9A 5016A046 F..P.( ...v..v..F˙.P.k ...vÛ.v¯á 000080
8D0477FF 26805EC4 AC76FFAE 76FF0000 20949A50 16844680 4B6A0277 FF26805E ^¯&.w.jK.FÇ.P.. ...vÛ.v¯á^¯&.w.. 0000A0
20AA9A02 77FF2680 5EC4AC76 FFAE76FF 016A006A 00001992 9A486A50 16FF0886 ....PjK.....j.j..vÛ.v¯á^¯&.w..˙ 0000C0
03750000 3DA44689 000020C0 9A020568 1EA876FF AA76FF00 0020819A 50520000 ..RP.Ý ...v˙.v´.h...á ...FÊ=..u. 0000E0
88000207 C7260E5E C408C483 00002326 9AA476FF 0196680A 76FF0C76 FF0022E9 Õ"..v..v.h...vÊ.&#...á.á^.&ú.... 000100
46890000 1F489A50 16FF0486 8D046AA0 76FFA276 FFA876FF AA76FF01 B2E9A446 FÊÕý..v˙.v´.vÅ.v.j......P.H....F 000120
0E5EC408 C4830000 23989AA4 76FF0196 680A76FF 0C76FF00 22E90375 00003DA4 Ê=..u.Õ"..v..v.h...vÊ..#...á.á^. 000140
FF04B6C4 02E3C1A6 5E8BA646 FF0003E9 0000A646 C7016CE9 A44688O0 0207C726 &ú....FÊÕl.úFÎ..Õ...FÎ.^Îèо.óÑ.. 000160
0270FF26 FF04B6C4 02E3C1A6 5E8BA876 FFAA76FF 00E8E903 7502400B 26008B26 &..&.ä.u.ÕÒ..v˙.v´.^Îèо.óÑ..&.p. 000180
76FF0C76 FF002DE9 03750000 3DA44689 00001FAF 9A5016FF 54868D01 6A30FF26 &.0j...T..P.Ê....FÊ=..u.Õ-..v..v 0001A0
21649AA8 76FFAA76 FF000207 C7260E5E C408C483 00002411 9AA476FF 0196680A .h...vÊ..$...á.á^.&ú....v˙.v´.d! 0001C0
70E90374 00003D00 001DBC9A 5016FF54 86805016 FF088680 00EFE9A4 46880000 ...FÊÕý......P..T..P.¥...=..t.Õp 0001E0
```

```
Dump of file SATURN:[PCCOMMON.DUMP.DLL]PMFORM.TMP;1 on 18-APR-1990 10:49:29.19
File ID (798,38,0)   End of file block 72 / Allocated 72

Virtual block number 22 (00000016), 512 (0200) bytes

9A5016B4 4680016A 30FF2602 70FF26FF 04B6C402 E3C1A65E 88A876FF AA76FF00 ..v`.v´.^ÌèD.áÑ..&.p.&.0j..FÇ.P. 000000
A476FF01 96680A76 FF0C76FF 5016B446 8D003FE9 03750000 3DA44689 00001AE6 Ì....FÊ=..u.Õ?..FÇ.P.v..v.h...vÊ 000020
AA76FF07 8926065E C402478B 26805EC4 000407C7 260E5EC4 0CC48300 00200C9A .É ...á.á^.&ú...á^¯&.G.á^.&...v` 000040
B6FFFF06 B6FFA876 FFAA76FF FEFFE900 03E90069 E9000088 00002153 9AA876FF .v`.SI..¡..Õi.Õ..Õ.±.v`.v`.Ñ...Ñ 000060
0018619A 006A006A 5016B446 8D8076FF B276FFAC 76FFAE76 FF000020 1F9AFF04 .... ...vÙ.v¯.vý.v¯.FÇ.Pj.j..a.. 000080
76FF0000 22B59A50 52000022 AE9A0277 FF26805E C4AC76FF AE76FF01 6A006A00 .j.j..vÙ.v¯á^¯&.w..Ù"..RP.ç"...v 0000A0
B4C80012 CAC95F5E 1F0000E9 0000B800 0307C726 0E5EC400 0023AE9A A876FFAA `.v`.Ù#..á^.&ú...¡..Õ...^_èò..àÇ 0000C0
1476FF16 76FF0000 22329A50 16AC468D 1476FF16 76FFD88E 2222B81E 56570000 ..WV.¡"".Ä.v..v..F¯.P.2"...v..v. 0000E0
1676FF00 0022659A 5016A846 8D1476FF 1676FF00 0022459A 5016B046 8D1276FF .v..F¯.P.E"...v..v..F´.P.e"...v. 000100
16B4468D 4B6A0277 FF26805E C4AC76FF AE76FF00 0022559A 5016A046 8D1476FF .v..F..P.U"...vÙ.v¯á^¯&.w.jK.FÇ. 000120
76FFAE76 FF016A00 6A00001C 9A9AB076 FFB276FF AC76FFAE 76FF0000 227E9A50 P.-"...vÙ.v¯.vý.v¯.....j.j..vÙ.v 000140
C49A0223 681EA876 FFAA76FF 0000248A 9A505200 0024839A 0277FF26 805EC4AC ¯á^¯&.w...$..RP..$...v`.´´.h#..á 000160
83000025 B19AA476 FF019668 0A76FF0C 76FF0022 E9037500 003DA446 89000022 "...FÊ=..u.Õ"..v..v.h...\ .Ý%... 000180
868D046A A076FFA2 76FFA876 FFAA76FF 01D9E9A4 46880002 07C7260E 5EC408C4 á.á^.&ú....FÊÕ)..v`.v`.vÅ...j... 0001A0
A476FF01 96680A76 FF0C76FF 002DE903 7500003D A4468900 00230A9A 5016FF4E N..P..#...FÊ=..u.Õ-..v..v.h...vÊ 0001C0
88E9A446 88000026 C49AA876 FFAA76FF 000207C7 260E5EC4 08C48300 0022E09A .Ä"...á.á^.&ú....v`.v`.á&...FÊÕ. 0001E0

Dump of file SATURN:[PCCOMMON.DUMP.DLL]PMFORM.TMP;1 on 18-APR-1990 10:49:29.19
File ID (798,38,0)   End of file block 72 / Allocated 72

Virtual block number 23 (00000017), 512 (0200) bytes

E9037502 400B2600 8826FF4E B6C402E3 C1A65E88 A646FF00 03E90000 A646C701 .úFI..Õ...FI.^ÌèD.áÑN.&..&.a.u.Õ 000000
16FF5286 8D016A30 FF260270 FF26FF4E B6C402E3 C1A65E8B A876FFAA 76FF00AF €..v`.v´.^ÌèD.áÑN.&.p.&.0j...R.. 000020
109A5016 FF52868D 0232681E A476FF00 18E90375 00003DA4 46890000 237C9A50 P.#...FÊ=..u.Õ...vÊ.h2...R..P.. 000040
7400003D 000023C5 9A5016B4 46805016 FF52868D 011DE9A4 468B0AC4 83269000 ..&.á..FÊÕ....R..P.FÇ.P.é#..=..t 000060
50169E46 8D30FF26 0270FF26 FF4EB6C4 02E3C1A6 5E88A876 FFAA76FF 004AE903 .ÕJ..v`.v´.^ÌèD.áÑN.&.p.&.0.F..P 000080
00109A50 16FF5286 80025068 1EA476FF 001BE903 7500003D A4468900 001DE49A .Õ....FÊ=..u.Õ...vÊ.hP...R..P... 0000A0
4EB6C402 E3C1A65E 88A876FF AA76FFFF 38E90003 E900BEE9 A446880A C4B31F66 f..á..FÊÕ/.Õ..Õ8..v`.v´.^ÌèD.áÑN 0000C0
868D1476 FF1676FF 00002495 9AA876FF AA76FF00 0024539A 30FF2602 70FF26FF .&.p.&.0.S$...v`.v´..$...v..v... 0000E0
76FF0000 21A49AA8 76FFAA76 FF000BE9 037400FF 4CBE8300 0021909A 5016FF4C L..P..!.../L..t.Õ...v`.v´.ÊI...v 000100
0E76FF10 76FF010B 681476FF 1676FF00 0021879A 016AA076 FFA276FF A876FFAA ¯.v´.vÅ.v.j..ñ!...v..v.h...v..v. 000120
FF000027 399A009F 681476FF 1676FF00 0021D79A 0676FF08 76FF0A76 FF0C76FF .v..v..v..v..■!...v..v.h...9´... 000140
C7260E5E C4000021 E59A00A1 681476FF 1676FF00 0027479A 00A06814 76FF1676 v..v.h...G´...v..v.hÀ..Ì!..á^.&ú 000160
FF1076FF D88E24B6 B81E5657 00000AC8 0012CAC9 5F5E1F00 00E90000 B8000307 ...¡..Õ...^_èò..à...WV.¡Ñ$.Ä.v.. 000180
1076FF00 44E9FA46 880006E9 03750000 3DFA4689 000024F9 9A5016F6 46800E76 v..F-.P.'$...F'=..u.Õ...F'ÕO..v. 0001A0
5EC40023 E9FA468B 0006E903 7500003D FA468900 0024E99A 5016FC46 8D0E76FF .v..F=.P.Õ$...F'=..u.Õ...F'Õ#.á^ 0001C0
00E90000 88078926 02478926 00008806 5EC40257 89260789 26F8568B F646880A ..F-.V½&..&.W.á^.¡..&.G.&..¡..Õ. 0001E0

Dump of file SATURN:[PCCOMMON.DUMP.DLL]PMFORM.TMP;1 on 18-APR-1990 10:49:29.19
File ID (798,38,0)   End of file block 72 / Allocated 72

Virtual block number 24 (00000018), 512 (0200) bytes

9A5016FA 468D0676 FF0876FF D88E2768 B81E5657 000006C8 000CCAC9 5F5E1F00 ..^_èò..à...WV.¡h´.Ã.v..v..F'.P. 000000
FFFF6801 08680676 FF0876FF 00000120 9A5016FE 46800676 FF0876FF 000024C6 ó$...v..v..F±.P. ....v..v.h..h.. 000020
28346801 03680676 FF0876FF 00002840 9A006A00 6A006AFF FF68FFFF 68FFFF68 h..h..h..j.j.j..a(...v..v.h..h4( 000040
286E6800 E5680676 FF0876FF 00002860 9A006A00 6A006AFF FF68284E 68FFFF68 h..hN(h..j.j.j..`(...v..v.hÍ.hn( 000060
28AE6800 E8680676 FF0876FF 00002880 9A006A00 6A016A28 77682874 68FFFF68 h..ht(hw(j.j.j...(...v..v.hÒ.hÛ( 000080
FFFF6801 01680676 FF0876FF 000028A0 9A006A00 6A016AFF FF68FFFF 68FFFF68 h..h..h..j.j.j...(...v..v.h..h.. 0000A0
28B46800 E3680676 FF0876FF 000028C0 9A006A00 6A006AFF FF68FFFF 68FFFF68 h..h..h..j.j.j..ã(...v..v.hD.hÇ( 0000C0
28D46800 E1680676 FF0876FF 000028E0 9A006A00 6A006AFF FF6828CE 68FFFF68 h..hö(h..j.j.j..Á(...v..v.hÄ.hà( 0000E0
6A006A00 FE680676 FF0876FF 000028FC 9A006A00 6A006AFF FF682A32 68FFFF68 h..h2*h..j.j.j..•(...v..v.h±.j.j 000100
6AFFFF68 FFFF6800 FC680676 FF0876FF 0000291A 9A004268 1E016A00 6A006A00 .j.j.j..hB...)...v..v.h•.h..h..j 000120
FF68FFFF 68006A00 6A00F968 0676FF08 76FF0000 29389A00 42681E01 6A006A00 .j.j..hB..8)...v..v.h'.j.j.h..h. 000140
6AFFFF68 FFFF6800 6A006A00 FA680676 FF0876FF 00002956 9A004268 1E006AFF .j..hB..V)...v..v.h'.j.j.h..h..j 000160
1E006AFF FF68FFFF 68006A00 6A00FB68 0676FF08 76FF0000 29749A00 42681E00 ..hB..t)...v..v.h«.j.j.h..h..j.. 000180
9A005868 1E016A00 6A006A00 6A006A00 F6680676 FF0876FF 00002990 9A004268 hB...)...v..v.h-.j.j.j.j.j..hX.. 0001A0
29CC9A00 58681E01 6A006A00 6AFFFF68 FFFF6800 F4680676 FF0876FF 000029AE Ù)...v..v.h¶.h..h..j.j.j..hX..ä) 0001C0
000029EA 9A005868 1E006AFF FF68FFFF 68006A00 6A00F168 0676FF08 76FF0000 ...v..v.hþ.j.j.h..h..j..hX..õ).. 0001E0
```

```
Dump of file SATURN:[PCCOMMON.DUMP.DLL]PMFORM.TMP;1 on 18-APR-1990 10:49:29.19
File ID (798,38,0)   End of file block 72 / Allocated 72

Virtual block number 25 (00000019), 512 (0200) bytes

 76FF0000 2A089A00 58681E00 6AFFFF68 FFFF6800 6A006A00 F2680676 FF0876FF .v..v.h·.j.j.h..h..j..hX...*...v 000000
 FF0876FF 00002A24 9A005868 1E006AFF FF68FFFF 68006A00 6A00F368 0676FF08 ..v.hx.j.j.h..h..j..hX..$*...v.. 000020
 D4680676 FF0876FF 00002A42 9A006E68 1E016A00 6A006A00 6A006A00 D6680676 v.hø.j.j.j.j.j..hn..B*...v..v.hå 000040
 6A000368 0676FF08 76FF0000 2A609A00 6E681E01 6A006A00 6AFFFF68 2A546800 .hT*h..j.j.j..hn..'*...v..v.hÆ.j 000060
 6A006A00 D2680676 FF0876FF 00002A7E 9A006E68 1E006AFF FF682A72 68006A00 .j.hr*h..j..hn..~*...v..v.hØ.j.j 000080
 68006A00 6A000168 0676FF08 76FF0000 2A9C9A00 6E681E00 6AFFFF68 2A906800 .h.*h..j..hn...*...v..v.hî.j.j.h 0000A0
 6A006A00 6A006A00 EE680676 FF0876FF 00002AB8 9A006E68 1E006AFF FF682AC6 ó*h..j..hn..¡*...v..v.hŸ.j.j.j.j 0000C0
 6A006A00 6AFFFF68 2AE86800 EC680676 FF0876FF 00002AD6 9A008468 1E016A00 .j..h...ø*...v..v.hš.hÒ*h..j.j.j 0000E0
 1E006AFF FF68FFFF 68006A00 6A00EB68 0676FF08 76FF0000 FFFF9A00 84681E01 ..h........v..v.hŠ.j.j.h..h..j.. 000100
 84681E00 6AFFFF68 2B246800 6A006A00 EA680676 FF0876FF 00002B12 9A008468 h....+...v..v.hō.j.j.h$+h..j..h. 000120
 9A008468 1E006AFF FF682B5A 68006A00 6A00E968 0676FF08 76FF0000 2B309A00 ..0+...v..v.hÕ.j.j.hZ+h..j..h... 000140
 00002B6A 9A009A68 1E016A00 6A006A00 6A006A00 DB680676 FF0876FF 00002B4C L+...v..v.hÛ.j.j.j.j.j..h...j+.. 000160
 76FF0000 2B889A00 9A681E01 6A006A00 6AFFFF68 2B7C6800 D9680676 FF0876FF .v..v.h).h|+h..j.j.j..h....+...v 000180
 FF0876FF 00002BA6 9A009A68 1E006AFF FF682B9A 68006A00 6A00E068 0676FF08 ..v.hÁ.j.j.h.+h..j..h...Î+...v.. 0001A0
 0676FF08 76FF0000 2BC49A00 9A681E00 6AFFFF68 2BB86800 6A006A00 DF680676 v.hÔ.j.j.h¡+h..j..h...ó+...v..v. 0001C0
 CE680676 FF0876FF 00002BE0 9A009A68 1E006AFF FF68282E 68006A00 6A000E68 hB.j.j.h.(h..j..h...Å+...v..v.hö 0001E0

Dump of file SATURN:[PCCOMMON.DUMP.DLL]PMFORM.TMP;1 on 18-APR-1990 10:49:29.19
File ID (798,38,0)   End of file block 72 / Allocated 72

Virtual block number 26 (0000001A), 512 (0200) bytes

 FFFF6800 CC680676 FF0876FF 00002BFE 9A00B068 1E006A00 6A006A00 6A006A00 .j.j.j.j.j..h¯..±+...v..v.hä.h.. 000000
 68006A00 6A00CB68 0676FF08 76FF0000 2C1C9A00 80681E00 6A006A00 6AFFFF68 h..j.j.j..h¯...,...v..v.hù.j.j.h 000020
 FFFF6800 6A006A00 CA680676 FF0876FF 00002C3A 9A00B068 1E006AFF FF68FFFF ..h..j..h¯..:,...v..v.hò.j.j.h.. 000040
 FF68FFFF 68006A00 6A00C968 0676FF08 76FF0000 2C589A00 B0681E00 6AFFFF68 h..j..h¯..X,...v..v.hè.j.j.h..h. 000060
 6A006A00 6A2C8768 2C846800 9C680676 FF0876FF 00002C76 9A00B068 1E006AFF .j..h¯..v,...v..v.h..h.,h.,j.j.j 000080
 6A006A00 6A006A2C A5682CA2 68009068 0676FF08 76FF0000 2C949A00 6A006A00 .j.j...,...v..v.h..hÅ,hÉ,j.j.j.j 0000A0
 6A006A00 6A006A00 6A2CC368 2CC06800 9E680676 FF0876FF 00002CB2 9A006A00 .j..ý,...v..v.h..hä,hù,j.j.j.j.j 0000C0
 9A006A00 6A006A00 6A006A2C E1682CDE 68009F68 0676FF08 76FF0000 2CD09A00 ..Å,...v..v.h..hß,hÅ,j.j.j.j.j.. 0000E0
 2D0C9A00 6A006A00 6A006A00 6A2CFF68 2CFC6800 A0680676 FF0876FF 00002CEE Ÿ,...v..v.h..h=,h.,j.j.j.j.j...- 000100
 00002820 9A006A00 6A006A00 6A006AFF FF68FFFF 6800A168 0676FF08 76FF0000 ...v..v.hÀ.h..h..j.j.j.j.j.. (.. 000120
 0028009A 5016FA46 800676FF 0876FFD8 8E27E0B8 1E565700 0008C8C8 C95F5E1F .^_èùà...WV.¡À'.À.v..v..F*.P..(. 000140
 FF9A5016 FC46800A 6A5C6AFA 76FF00E2 E9F84688 0006E903 7500003D F8468900 ..F½=..u.Õ...F½Õã..v*j\j..F=.P.. 000160
 832D8C27 D89A0676 FF0876FF 00C0E9F8 46880006 E9037500 003DF846 890000FF ....F½=..u.Õ...F½Õã..v..v..Ä'¥·. 000180
 FFFE76FF 0676FF08 76FF08C4 832E0012 A99A0676 FF0876FF FC76FFFE 76FF04C4 á..v±.v=.v..v..`....á..v..v..v±. 0001A0
 006A006A 0676FF08 76FF0000 2E069A00 6A006A06 76FF0876 FF0000FF FF9AFC76 v=......v..v.j.j.......v..v.j.j. 0001C0
 682DEF68 0676FF08 76FF0000 FFFF9AFF FF682DCD 680676FF 0876FF00 00FFFF9A ......v..v.hë-h........v..v.hÿ-h 0001E0

Dump of file SATURN:[PCCOMMON.DUMP.DLL]PMFORM.TMP;1 on 18-APR-1990 10:49:29.19
File ID (798,38,0)   End of file block 72 / Allocated 72

Virtual block number 27 (0000001B), 512 (0200) bytes

 06680676 FF0876FF 0000FFFF 9AFFFF68 FFFF6806 76FF0876 FF0000FF FF9AFFFF ........v..v.h..h........v..v.h. 000000
 0676FF08 76FF0000 FFFF9AFF FF68FFFF 680676FF 0876FF00 00FFFF9A FFFF6828 +h........v..v.h..h........v..v. 000020
 02050075 900004CA C95F5E1F 0000E900 00FFFF9A 020036FF 261AF806 8E00C868 hà...¥.&.6.......Õ...^_èò...u... 000040
 02032760 00012DF2 00051240 00022E03 000501E0 00012831 000502A0 000729FF .).......1(..Å.......ə.¯..·-..''.. 000060
 0203007F 00011F30 01030000 0001206D 00020483 000C2857 0205010B 0005210C .I..Ü...W(......m·......0....... 000080
 00050069 000424D9 02030000 00022081 00020268 00072C10 0202033F 00090833 3...?....,..k....·.......)$..i... 0000A0
 020502AB 000729E1 020512E8 00012A93 0005045A 000C2814 020200E9 00012DD0 Å·..Õ....(..Z....*..Š...Ã)..¨... 0000C0
 020300EC 00012A57 000500EC 00042AF4 020304AC 000C0446 0203022B 00072891 .(..+...F...¯...¶*..š...W*..š... 0000E0
 02030000 00042631 00020087 00012512 01030086 00010A04 0103016C 00042093 .-..l............%......1&...... 000100
 02030000 00062D1D 00020237 0007290D 02050275 00072C4C 02020349 000909E1 Ã...I...L,..u....)..7....·...... 000120
 0203027F 00072C2E 020202D3 0009254F 02030013 00012539 0103017B 00040067 g...(...9%......0%..Æ...,...... 000140
 000501F0 00062568 0203007F 00042D20 020300FD 000420B1 02030355 000908D8 Ã...U...ÿ-..»...--......k%..Þ... 000160
 01030289 0007299E 02020472 000C2D0E 02020242 0007292F 02050000 00012D8F ¢-....../)..B...B-..r....)...... 000180
 02030362 00092434 0203020F 000925C7 0203020A 00072C66 0202001E 00010A35 5.......f,......Ú%..Õ...4$..b... 0001A0
 0103008E 00042778 02030014 000320AF 0203024C 0007296B 0205010B 000420D3 Æ-......k)..L...O-......x'...... 0001C0
 02031914 00012B09 00050483 000C2854 02020295 000729C0 02020001 00062671 q&......à)......T(.......+...... 0001E0
```

Dump of file SATURN:[PCCOMMON.DUMP.DLL]PMFORM.TMP;1 on 18-APR-1990 10:49:29.19
File ID (798,38,0)   End of file block 72 / Allocated 72

Virtual block number 28 (0000001C), 512 (0200) bytes 0203021D 00072894 02020218 00012871 00050256 0007294D 02050195 00040150 P.......M)..V...q(.......(...... 000000
00050118 00042DC2 0203221A 00012B9D 0005031A 00012851 0005045A 000C271D .'..Z...Q(.......+...".ó-...... 000020
00050375 000926FD 0203041C 00012837 000502A0 000729FC 0202159C 00012AC9 è*......•).....7(......»&..u... 000040
02030260 00072BF1 0205009E 00042799 020302F6 00092612 0203171D 00012AEB Ŝ*.......&..-....'......þ*..'... 000060
02020026 00042180 02031C25 00012B27 00050444 000C2811 0205020A 0007272B +'.......(..D...'+..%....!..&... 000080
0205012B 00040503 020300AA 000427F0 0203022B 0007288E 020202A8 0007290E 8)..¨....(..+...Þ'..ˆ.......+... 0000A0
00050385 000926EA 02030CAC 00012A35 00050304 000923F0 02030268 00072C13 .,..k...Þ#......5*..¯...õ&...... 0000C0
01030237 0007290A 02022030 0001287F 000501AF 00042298 020324AE 00012BBB £+..Ü$..."..£....+..0 ...)..7... 0000E0
02030310 00092595 02030275 00072C4F 02050035 00042523 0203004D 00012540 ã%..M...#%..5...O,..u....%...... 000100
0202013B 00042DE4 0203093B 000128D1 0005045A 000C2817 020500BA 000426D5 ī&..¤....(..Z...ì(..;...õ-..;... 000120
02030A46 000128D7 0005031C 0009166F 0203027F 00072C31 02050242 0007292C ,)..8...1,......o........•(..F... 000140
00050289 000729A1 02051EC8 00012B5D 0005024C 00072968 02020047 0004246D m$..G...h)..L...]+..à...À)...... 000160
02020329 00090886 0203014C 00042DA2 0203020A 00072C69 020505CA 00012881 Ý(..ò...i,......Ã-..L.......)... 000180
00050295 000729C3 02050444 000C280E 02020472 000C2DE1 02050256 0007294A J)..V...Ã-..r....(..D...ü)...... 0001A0
0203049B 000C01FC 0203005A 00042E1D 02030FDA 00012A75 00050605 000128B7 ñ(..!...u*..Ö.......Z...•...... 0001C0
020502BD 00082648 02030260 00072BEE 0202015B 00042DF5 02030333 00092689 ¿&..3...%-..[...Ÿ+..'...H&..§... 0001E0

Dump of file SATURN:[PCCOMMON.DUMP.DLL]PMFORM.TMP;1 on 18-APR-1990 10:49:29.19
File ID (798,38,0)   End of file block 72 / Allocated 72

Virtual block number 29 (0000001D), 512 (0200) bytes

FF0C76FF D88EFFFF B81E5657 000010C8 00000000 00000000 0000021D 00072897 .(..............à...WV.¡...Ã.v.. 000000
8DF476FF F676FF00 00FFFF9A 5016F446 8DFC76FF 0000FFFF 9A5016FC 46800A76 v..F•.P......v•.F¶.P......v-.v¶. 000020
8DF476FF F676FF00 00FFFF9A 5016F846 8DF476FF F676FF00 00FFFF9A 5016F046 FÞ.P......v-.v¶.F½.P......v-.v¶. 000040
B80006E9 03751056 390008E9 03740E46 39F2568B F0468800 00FFFF9A 5016FE46 F±.P......FÞ.V·9F.t.Õ..9V.u.Õ..¡ 000060
56570000 10C8C8C9 5F5E1F00 00E90000 B80000FF FF9A006A FE76FF00 10E90000 ..Õ...v±j......¡..Õ...^_èüà...WV 000080
06E90375 000030F8 46890000 00189A50 16FE468D 0A76FF0C 76FFD88E 0008B81E .¡...Ã.v..v..F±.P......F½=..u.Õ. 0000A0
880006E9 03750000 30F84689 00000025 9A5016F4 468DFE76 FF008DE9 F8468800 ..F½Õ...v±.F¶.P.%....F½=..u.Õ... 0000C0
0006E903 7500003D F8468900 0000359A 5016F046 8DF476FF F676FF00 6FE9F846 F½Õo..v-.v¶.FÞ.P.5....F½=..u.Õ.. 0000E0
06E90375 000030F8 46890000 00459A50 16FA468D F476FFF6 76FF004E E9F8468B .F½ÕN..v-.v¶.F*.P.E....F½=..u.Õ. 000100
0000B800 06E90375 F2563900 08E90374 F0463910 56880E46 88002DE9 F8468800 ..F½Õ-..F..V.9FÞt.Õ..9V·u.Õ..¡.. 000120
1E565700 0014C8CB C95F5E1F 0000E9FF FF01E09A 010368F4 76FFF676 FF0011E9 Õ...v-.v¶h...Ã...Õ...^_èüà...WV. 000140
0006E903 7500003D F8468900 0000A29A 5016FE46 8D0A76FF 0C76FFD8 8E0092B8 ¡...Ã.v..v..F±.P.Ã....F½=..u.Õ.. 000160
46880006 E9037500 003DF846 89000000 C09A5016 F4468DFE 76FF00BE E9F8468B .F½Õ/..v±.F¶.P.â....F½=..u.Õ...F 000180
880006E9 03750000 30F84689 000000E1 9A5016F0 468DF476 FFF676FF 00A0E9F8 ½Õ...v-.v¶.FÞ.P.Ã....F½=..u.Õ... 0001A0
0006E903 7500003D F8468900 0001029A 5016FA46 8DF476FF F676FF00 7FE9F846 F½Õ...v-.v¶.F*.P......F½=..u.Õ.. 0001C0
FF9A006A F076FFF2 76FF2714 680A76FF 0C76FF15 6A5016EC 4680005E E9F8468B .F½Õ^..Fš.Pj..v..v.h.'.v·.vÞj... 0001E0

Dump of file SATURN:[PCCOMMON.DUMP.DLL]PMFORM.TMP;1 on 18-APR-1990 10:49:29.19
File ID (798,38,0)   End of file block 72 / Allocated 72

Virtual block number 30 (0000001E), 512 (0200) bytes

0E4639EE 568BEC46 88002DE9 F8468800 06E90375 00003DF8 468912C4 830000FF ....á..F½=..u.Õ...F½Õ-..Fš.VŸ9F. 000000
3F031A9A 00E568F4 76FFF676 FF0011E9 0000B800 06E90375 10563900 08E90374 t.Õ..9V.u.Õ..¡..Õ...v-.v¶hÍ....7 000020
5016FA46 8D0A76FF 0C76FFD8 8E0151B8 1E565700 0014C8CB C95F5E1F 0000E901 .Õ...^_èüà...WV.¡Q..Ã.v..v..F*.P 000040
7F9A5016 F0468DFA 76FF00BE E9F4468B 0006E903 7500003D F4468900 0001619A .a....F̄¶=..u.Õ...F¶Õ/..v*.FÞ.P.. 000060
9A5016EC 4680F076 FFF276FF 00A0E9F4 46880006 E9037500 003DF446 89000001 ....F¶=..u.Õ...F¶Õ...v·.vÞ.Fš.P. 000080
5016F646 8DF076FF F276FF00 7FE9F446 880006E9 03750000 3DF44689 000001A0 .....F¶=..u.Õ...F¶Õ...v·.vÞ.F-.P 0000A0
0C76FF07 6A5016FC 4680005E E9F4468B 0006E903 7500003D F4468900 0001C19A .ê....F¶=..u.Õ...F¶Õ^..F•.Pj..v. 0000C0
06E90375 000030F4 468912C4 83000001 EF9A006A EC76FFEE 76FF2714 680A76FF .v.h.'.vŸ.všj..ÿ....á..F¶=..u.Õ. 0000E0
0000B800 06E90375 10563900 08E90374 0E4639FE 568BFC46 88002DE9 F4468800 ..F¶Õ-..F•.V±9F.t.Õ..9V.u.Õ..¡.. 000100
1E565700 0014C8CB C95F5E1F 0000E902 2F02189A 00E868F0 76FFF276 FF0011E9 Õ...v·.vÞhò..../.Õ...^_èüà...WV. 000120
0006E903 7500003D F4468900 0002519A 5016FE46 8D0A76FF 0C76FFD8 8E0241B8 ¡A..Ã.v..v..F±.P.Q....F̄¶=..u.Õ.. 000140
46880006 E9037500 003DF446 89000002 6F9A5016 F0468DFE 76FF00BA E9F4468B .F¶Õ¤..v±.FÞ.P.o....F¶=..u.Õ...F 000160
880006E9 03750000 30F44689 00000290 9A5016EC 4680F076 FFF276FF 009CE9F4 ¶Õ...v·.vÞ.Fš.P......F¶=..u.Õ... 000180
0006E903 7500003D F4468900 0002819A 5016FA46 8DF076FF F276FF00 7BE9F446 F¶Õ(..v·.vÞ.F*.P.Ÿ....F¶=..u.Õ.. 0001A0
46890000 FFFF9A50 16F6468D 0C6AEC76 FFEE76FF 0A76FF0C 76FF005A E9F4468B .F¶ÕZ..v..v..vŸ.všj..F-.P......F 0001C0
FC76FF00 23E90000 B80006E9 03751056 390008E9 03740E46 39F8568B F6468BF4 ¶.F-.V½9F.t.Õ..9V.u.Õ..¡..Õ#..v• 0001E0

```
Dump of file SATURN:[PCCOMMON.DUMP.DLL]PMFORM.TMP;1 on 18-APR-1990 10:49:29.19
File ID (798,38,0)   End of file block 72 / Allocated 72

Virtual block number 31 (0000001F), 512 (0200) bytes

 0000E900 00FFFF9A 010168F0 76FFF276 FF0000FF FF9A0266 681E0101 68FA76FF .v*h...hf.......v·.vÞh.......Õ.. 000000
 0003419A 5016FE46 800A76FF 0C76FFD8 8E0331B8 1E565700 0014C8CB C95F5E1F .^_èùà...WV.¡1..Ä.v..v..F±.P.A.. 000020
 89000003 5F9A5016 F0468DFE 76FF008E E9F44688 0006E903 7500030D F4468900 ..F¶=..u.Õ...F¶Õ/..v±.FÞ.P._.... 000040
 00000380 9A5016EC 468DF076 FFF276FF 00A0E9F4 46880006 E9037500 003DF446 F¶=..u.Õ...F¶Õ...v·.vÞ.F§.P¯.... 000060
 0003A19A 5016FA46 8DF076FF F276FF00 7FE9F446 880006E9 03750000 3DF44689 .F¶=..u.Õ...F¶Õ...v·.vÞ.F*.P.À.. 000080
 680A76FF 0C76FF0B 6A5016F6 468D005E E9F4468B 0006E903 7500030D F4468900 ..F¶=..u.Õ...F¶Õ^..F-.Pj..v..v.h 0000A0
 F4468800 06E90375 00003DF4 468912C4 83000002 DF9A006A EC76FFEE 76FF2714 .'.vŸ.vš j..Õ....á..F¶=..u.Õ...F¶ 0000C0
 FF0011E9 00008800 06E90375 10563900 08E90374 0E4639F8 568BF646 8B002DE9 Õ-..F-.V½9F.t.Õ..9V.u.Õ..¡..Õ... 0000E0
 8E041DB8 1E565700 0014C8CB C95F5E1F 0000E903 1F05CA9A 00E368F0 76FFF276 v·.vÞhD..ò..Õ...^_èùà...WV.¡... 000100
 E9F4468B 0006E903 7500030D F4468900 00042D9A 5016FE46 8D0A76FF 0C76FFD8 Ä.v..v..F±.P.-....F¶=..u.Õ...F¶Õ 000120
 00A0E9F4 46880006 E9037500 003DF446 89000004 4B9A5016 F0468DFE 76FF008E ƒ..v±.FÞ.P.K....F¶=..u.Õ...F¶Õ.. 000140
 7FE9F446 880006E9 03750000 3DF44689 0000046C 9A5016EC 468DF076 FFF276FF .v·.vÞ.F§.P.l....F¶=..u.Õ...F¶Õ. 000160
 E9F4468B 0006E903 7500030D F4468900 00048D9A 5016FA46 8DF076FF F276FF00 ..v·.vÞ.F*.P......F¶=..u.Õ...F¶Õ 000180
 83000004 B89A006A EC76FFEE 76FF2714 680A76FF 0C76FF0A 6A5016F6 4680005E ^..F-.Pj..v..v.h.'.vŸ.vš j..£.... 0001A0
 08E90374 0E4639F8 568BF646 8B002DE9 F4468800 06E90375 00003DF4 468912C4 á..F¶=..u.Õ...F¶Õ-..F-.V½9F.t.Õ. 0001C0
 0000E904 FB093B9A 00E168F0 76FFF276 FF0011E9 00008800 06E90375 10563900 .9V.u.Õ..¡..Õ...v·.vÞhÄ..;.«.Õ.. 0001E0

Dump of file SATURN:[PCCOMMON.DUMP.DLL]PMFORM.TMP;1 on 18-APR-1990 10:49:29.19
File ID (798,38,0)   End of file block 72 / Allocated 72

Virtual block number 32 (00000020), 512 (0200) bytes

 0005109A 5016FE46 800A76FF 0C76FFD8 8E0500B8 1E565700 000AC8CB C95F5E1F .^_èùà...WV.¡...Ä.v..v..F±.P.... 000000
 46880000 055C9A50 16F6468D FA76FFFC 76FF0000 05389A50 16FA468D FE76FF00 ..v±.F*.P.;....v•.v*.F-.P.\....F 000020
 E9037412 4639F856 8BF6468B 001CE903 75105639 0008E903 740E4639 F8568BF6 -.V½9F.t.Õ..9V.u.Õ...F-.V½9F.t.Õ 000040
 00E90000 FFFF9A00 FC68FA76 FFFC76FF 0011E900 00880006 E9037514 56390008 ..9V.u.Õ..¡..Õ...v•.v*h•......Õ. 000060
 06009A50 16F6468D 0A76FF0C 76FFD88E 05FD881E 56570000 1AC8CBC9 5F5E1F00 ..^_èùà...WV.¡»..Ä.v..v..F-.P... 000080
 0000061A 9A5016EA 468DF676 FF012FE9 EE468800 06E90375 00003DEE 46890000 ...FŸ=..u.Õ...FŸÕ/..v-.Fõ.P..... 0000A0
 00062A9A 5016E646 8DEA76FF EC76FF01 11E9EE46 880006E9 03750000 3DEE4689 .FŸ=..u.Õ...FŸÕ...vš.võ.F¦.P.*.. 0000C0
 05709A50 16F2468D EA76FFEC 76FF00F0 E9EE4688 0006E903 7500030D EE468900 ..FŸ=..u.Õ...FŸÕÞ..vš.võ.F·.P.). 0000E0
 6AE676FF E876FF0A 76FF0C76 FF00CFE9 EE468800 06E90375 00003DEE 46890000 ...FŸ=..u.Õ...FŸÕü..v..v..vÒ.v¦j 000100
 89000088 00A6E9EE 46880006 E9037500 003DEE46 890000FF FF9A5016 FC468008 ..F•.P......FŸ=..u.Õ...FŸÕ¦.¡... 000120
 02400B26 008826FC 76C402E3 C1F05E8B F046FF00 03E90000 F046C7F8 4689FA46 F*.F½úFÞ..Õ...FÞ.^ÞèD.áv•&..&.ə. 000140
 02503926 0022E903 74003926 105688OE 468BFC76 C402E3C1 F05E8800 3CE90375 u.Õ<..^ÞèD.áv•.F..V.&9.t.Õ".&9P. 000160
 ACE90003 E9FA5689 F8468902 50882600 8826FC76 C402E3C1 F05E8800 19E90374 t.Õ...^ÞèD.áv•&..&.P..F½.V*Õ..Õ¯ 000180
 10C48300 0005A89A 006A0E76 FF1076FF 2715680A 76FF0C76 FFFC76FF FE76FFFF ..v±.v•.v..v.h.'.v..v.j..¨....á. 0001A0
 E9000006 6A9A00FC 68EA76FF EC76FF00 11E90000 880006E9 0374FA46 08F8468B .F½.F*t.Õ..¡..Õ...vš.võh•..j...Õ 0001C0
 8E9A5016 FE468D0A 76FF0C76 FFD88E06 7E881E56 5700000C C8C8C95F 5E1F0000 ...^_èùà...WV.¡-..Ä.v..v..F±.P.. 0001E0

Dump of file SATURN:[PCCOMMON.DUMP.DLL]PMFORM.TMP;1 on 18-APR-1990 10:49:29.19
File ID (798,38,0)   End of file block 72 / Allocated 72

Virtual block number 33 (00000021), 512 (0200) bytes

 0006AC9A 5016FA46 8DFE76FF 0082E9F8 46880006 E9037500 003DF846 89000006 ....F½=..u.Õ...F½Õ...v±.F*.P.¯.. 000000
 06CD9A50 16F4468D FA76FFFC 76FF0064 E9F8468B 0006E903 7500030D F8468900 ..F½=..u.Õ...F½Õd..v•.v*.F¶.P.ë. 000020
 08E90374 0E4639F6 568BF446 880043E9 F8468800 06E90375 00003DF8 46890000 ...F½=..u.Õ...F½ÕC..F¶.V-9F.t.Õ. 000040
 880006E9 03751456 390008E9 03741246 39F6568B F4468800 1CE90375 10563900 .9V.u.Õ...F¶.V-9F.t.Õ..9V.u.Õ..¡ 000060
 5700001A C8C8C95F 5E1F0000 E90000FF FF9A00CC 68FA76FF FC76FF00 11E90000 ..Õ...v•.v*hä......Õ...^_èùà...W 000080
 E9037500 003DEE46 89000007 EF9A5016 FA46800A 76FF0C76 FFD88E07 DF881E56 V.¡Ô..Ä.v..v..F*.P.ÿ....FŸ=..u.Õ 0000A0
 0006E903 7500030D EE468900 00080D9A 5016EA46 8DFA76FF 012FE9EE 46880006 ...FŸÕ/..v*.Fõ.P......FŸ=..u.Õ.. 0000C0
 06E90375 00003DEE 46890000 082E9A50 16E6468D EA76FFEC 76FF0111 E9EE468B .FŸÕ...vš.võ.F¦.P......FŸ=..u.Õ. 0000E0
 E9037500 003DEE46 89000006 EE9A5016 F64680EA 76FFEC76 FF00F0E9 EE468800 ..FŸÕÞ..vš.võ.F-.P.Ÿ....FŸ=..u.Õ 000100
 00000717 9A5016F0 4680126A E676FFE8 76FF0A76 FF0C76FF 00CFE9EE 46880006 ...FŸÕü..v..v..vÒ.v¦j..FÞ.P..... 000120
 E90000F4 46C7FC46 89FE4689 00008800 A6E9EE46 880006E9 03750000 3DEE4689 .FŸ=..u.Õ...FŸÕ¦.¡...F±.F•úF¶..Õ 000140
 02E3C1F4 5E88003C E9037502 40082600 8826F076 C402E3C1 F45E88F4 46FF0003 ...F¶.^¶èD.ávÞ&..&.ə.u.Õ<..^¶èD. 000160
 02E3C1F4 5E880019 E9037402 50392600 22E90374 00392610 56880E46 8BF076C4 ávÞ.F..V.&9.t.Õ".&9P.t.Õ...^¶èD. 000180
 FF0C76FF F076FFF2 76FFFFAC E90003E9 FE5689FC 46890250 88260088 26F076C4 ávÞ&..&.P..F•.V±Õ..Õ¯..v·.vÞ.v.. 0001A0
 0006E903 74FE460B FC468810 C4830000 07A99A00 6A0E76FF 1076FF27 15680A76 v.h.'.v..v.j..`....á..F•.F±t.Õ.. 0001C0
 00000CC8 C8C95F5E 1F0000E9 0000087F 9A00CC68 EA76FFEC 76FF0011 E9000088 ¦..Õ...vš.võhä......Õ...^_èùà... 0001E0
```

Dump of file SATURN:[PCCOMMON.DUMP.DLL]PMFORM.TMP;1 on 18-APR-1990 10:49:29.19
File ID (798,38,0) End of file block 72 / Allocated 72

Virtual block number 34 (00000022), 512 (0200) bytes

```
03750000 3DF84689 000008A3 9A5016FE 4680DA76 FF0C76FF D88E0893 B81E5657 WV.¡...Ä.v..v..F±.P.È....F½=..u. 000000
06E90375 00003DF8 46890000 08C19A50 16FA468D FE76FF00 82E9F846 8B0006E9 Õ...F½Õ...v±.F'.P.è....F½=..u.Õ. 000020
E9037500 003DF846 89000008 E29A5016 F4468DFA 76FFFC76 FF0064E9 F8468800 ..F½Õd..v•.v'.F¶.P.ã....F½=..u.Õ 000040
4688001C E9037510 56390008 E903740E 4639F656 8BF4468B 0043E9F8 46880006 ...F½ÕC..F¶.V-9F.t.Õ..9V.u.Õ...F 000060
FA76FFFC 76FF0011 E90000B8 0006E903 75145639 0008E903 74124639 F6568BF4 ¶.V-9F.t.Õ..9V.u.Õ..¡..Õ...v•.v' 000080
FF0C76FF D88E09F4 B81E5657 00001AC8 CBC95F5E 1F0000E9 05EB159C 9A00EC68 hš....Š.Õ...^_èùà...WV.¡¶..Ä.v.. 0000A0
FA76FF01 2FE9F246 8B0006E9 03750000 3DF24689 00000A04 9A5016FA 4680DA76 v..F'.P......F·=..u.Õ...F·Õ/..v' 0000C0
76FFF076 FF0111E9 F2468800 06E90375 00003DF2 46890000 0A229A50 16EE468D .FŸ.P."....F·=..u.Õ...F·Õ...vÞ.v 0000E0
FFF076FF 00F0E9F2 46880006 E9037500 003DF246 8900000A 439A5016 EA468DEE Ÿ.Fõ.P.C....F·=..u.Õ...F·Õb..vÞ. 000100
0C76FF00 CFE9F246 8B0006E9 03750000 3DF24689 00000903 9A5016F6 468DEE76 vŸ.F-.P......F·=..u.Õ...F·Õü..v. 000120
0006E903 7500003D F2468900 00092C9A 5016FC46 8D036AEA 76FFEC76 FF0A76FF .v..vš.võj..F•.P.,....F·=..u.Õ.. 000140
02E3C1F4 5E8BF446 FF0003E9 0000F446 C7E64689 E8468900 008800A6 E9F2468B .F·Õl.¡...FÒ.FlúF¶..Õ...F¶.^¶èD. 000160
39261056 8B0E468B FC76C402 E3C1F45E 88003CE9 03750240 08260088 26FC76C4 év•&..&.ə.u.Õ<..^¶èD.év•.F..V.&9 000180
8902508B 26008826 FC76C402 E3C1F45E 880019E9 03740250 39260022 E9037400 .t.Õ",&9P.t.Õ...^¶èD.év•&..&.P.. 0001A0
0E76FF10 76FF2715 680A76FF 0C76FFFC 76FFFE76 FFFFACE9 0003E9E8 5689E646 Fl.VÒÕ..Õ¯..v±.v•.v..v.h.'.v..v. 0001C0
76FFF076 FF0011E9 0000B800 06E90374 E84608E6 468B10C4 83000009 BE9A006A j..ƒ....á..Fl.FÒt.Õ..¡..Õ...vÞ.v 0001E0
```

Dump of file SATURN:[PCCOMMON.DUMP.DLL]PMFORM.TMP;1 on 18-APR-1990 10:49:29.19
File ID (798,38,0) End of file block 72 / Allocated 72

Virtual block number 35 (00000023), 512 (0200) bytes

```
0C76FFD8 8E0AA888 1E565700 000CC8CB C95F5E1F 0000E90A 96159C9A 00EC68EE Ÿhš......Õ...^_èùà...WV.¡´..Ä.v. 000000
76FF0082 E9F8468B 0006E903 7500003D F8468900 000AB89A 5016FE46 8D0A76FF .v..F±.P.¡....F½=..u.Õ...F½Õ...v 000020
FFFC76FF 0064E9F8 46880006 E9037500 003DF846 8900000A D69A5016 FA468DFE ±.F'.P.ø....F½=..u.Õ...F½Õd..v•. 000040
F4468800 43E9F846 8B0006E9 03750000 3DF84689 00000AF7 9A5016F4 468DFA76 v'.F¶.P.¼....F½=..u.Õ...F½ÕC..F¶ 000060
08E90374 124639F6 568BF446 88001CE9 03751056 390008E9 03740E46 39F6568B .V-9F.t.Õ..9V.u.Õ...F¶.V-9F.t.Õ. 000080
0000E908 F71EC89A 000968FA 76FFFC76 FF0011E9 0000B800 06E90375 14563900 .9V.u.Õ..¡..Õ...v•.v'hl. ¾.¼.Õ.. 0000A0
000C199A 5016FE46 8D0A76FF 0C76FFD8 8E0C09B8 1E565700 001AC8CB C95F5E1F .^_èùà...WV.¡...Ä.v..v..F·.º.... 0000C0
8900000C 379A5016 EE468DFE 76FF012F E9F2468B 0006E903 75000030 F2468900 ..F·=..u.Õ...F·Õ/..v±.FŸ.P./.... 0000E0
00000C58 9A5016EA 468DEE76 FFF076FF 0111E9F2 46880006 E9037500 003DF246 F·=..u.Õ...F·Õ...vÞ.vŸ.Fõ.P.X... 000100
000B189A 5016FA46 8DEE76FF F076FF00 F0E9F246 8B0006E9 03750000 3DF24689 .F·=..u.Õ...F·ÕÞ..vÞ.vŸ.F'.P.... 000120
046AEA76 FFEC76FF 0A76FF0C 76FF00CF E9F2468B 0006E903 75000030 F2468900 ..F·=..u.Õ...F·Õü..v..v..vš.võj. 000140
46890000 8800A6E9 F2468800 06E90375 000030F2 46890000 08419A50 16E6468D .Fl.P.A....F·=..u.Õ...F·Õl.¡...F 000160
7502400B 26008826 E676C402 E3C1F45E 8BF446FF 0003E900 00F446C7 F64689F8 %.F-úF¶..Õ...F¶.^¶èD.év|&..&.ə.u 000180
74025039 260022E9 03740039 2610568B 0E4688E6 76C402E3 C1F45E88 003CE903 .Õ<..^¶èD.év|.F..V.&9.t.Õ".&9P.t 0001A0
FFACE900 03E9F856 89F64689 02508826 008826E6 76C402E3 C1F45E88 0019E903 .Õ...^¶èD.év|&..&.P..F-.V½Õ..Õ¯. 0001C0
8B10C483 00000BD3 9A006A0E 76FF1076 FF271568 0A76FF0C 76FFE676 FFE876FF .vÒ.vl.v..v.h.'.v..v.j..Æ....á.. 0001E0
```

Dump of file SATURN:[PCCOMMON.DUMP.DLL]PMFORM.TMP;1 on 18-APR-1990 10:49:29.19
File ID (798,38,0) End of file block 72 / Allocated 72

Virtual block number 36 (00000024), 512 (0200) bytes

```
00E90CAB 1EC89A00 D968EE76 FFF076FF 0011E900 00880006 E90374F8 460BF646 F-.F½t.Õ..¡..Õ...vÞ.vŸhl..à.¨.Õ. 000000
0CCD9A50 16FE468D 0A76FF0C 76FFD88E 0CBDB81E 56570000 0CC8CBC9 5F5E1F00 ..^_èùà...WV.¡§..Ä.v..v..F±.P.ë. 000020
00000CEB 9A5016FA 468DFE76 FF0082E9 F8468800 06E90375 00003DF8 46890000 ...F½=..u.Õ...F½Õ...v±.F'.P.Š... 000040
0000DC9A 5016F446 8DFA76FF FC76FF00 64E9F846 8B0006E9 03750000 3DF84689 .F½=..u.Õ...F½Õd..v•.v'.F¶.P.... 000060
0008E903 740E4639 F6568BF4 46880043 E9F8468B 0006E903 7500003D F8468900 ..F½=..u.Õ...F½ÕC..F¶.V-9F.t.Õ.. 000080
00B80006 E9037514 56390008 E9037412 4639F656 8BF4468B 001CE903 75105639 9V.u.Õ...F¶.V-9F.t.Õ..9V.u.Õ..¡. 0000A0
56570000 1AC8CBC9 5F5E1F00 00E90E0C 0CAC9A00 D468FA76 FFFC76FF 0011E900 .Õ...v•.v'hå..¨...Õ...^_èùà...WV 0000C0
06E90375 000030EE 46890000 0E2E9A50 16FA468D 0A76FF0C 76FFD88E 0E1EB81E .¡...Ä.v..v..F'.P......FŸ=..u.Õ. 0000E0
8B0006E9 03750000 3DEE4689 00000E4C 9A5016EA 468DFA76 FF012FE9 EE468800 ..FŸÕ/..v'.Fõ.P.L....FŸ=..u.Õ... 000100
0006E903 75000030 EE468900 000E6D9A 5016E646 8DEA76FF EC76FF01 11E9EE46 FŸÕ...vš.võ.Fl.P.m....FŸ=..u.Õ.. 000120
06E90375 000030EE 46890000 00209A50 16F6468D EA76FFEC 76FF00F0 E9EE468B .FŸÕÞ..vš.võ.F-.P.-....FŸ=..u.Õ. 000140
89000000 569A5016 F0468006 6AE676FF E876FF0A 76FF0C76 FF00CFE9 EE468800 ..FŸÕü..v..v..vÒ.vlj..FÞ.P.V.... 000160
03E90000 F446C7FC 4689FE46 890000B8 00A6E9EE 46880006 E9037500 003DEE46 FŸ=..u.Õ...FŸÕl.¡...F±.F•úF¶..Õ. 000180
C402E3C1 F45E8800 3CE90375 02400B26 008826F0 76C402E3 C1F45E88 F446FF00 ..F¶.^¶èD.évÞ&..&.ə.u.Õ<..^¶èD.á 0001A0
C402E3C1 F45E8800 19E90374 02503926 0022E903 74003926 1056880E 4688F076 vÞ.F..V.&9.t.Õ".&9P.t.Õ...^¶èD.á 0001C0
76FF0C76 FFF076FF F276FFFF ACE90003 E9FE5689 FC468902 50882600 8826F076 vÞ&..&.P..F•.V±Õ..Õ¯..v·.vÞ.v..v 0001E0
```

Dump of file SATURN:[PCCOMMON.DUMP.DLL]PMFORM.TMP;1 on 18-APR-1990 10:49:29.19
File ID (798,38,0)   End of file block 72 / Allocated 72

Virtual block number 37 (00000025), 512 (0200) bytes

```
B80006E9 0374FE46 0BFC4688 10C48300 000DE89A 006A0E76 FF1076FF 2715680A .h.'.v..v.j..ò....á..F•.F±t.Õ..¡ 000000
5700000C C8CBC95F 5E1F0000 E90EC00C AC9A0004 68EA76FF EC76FF00 11E90000 ..Õ...vš.võhå..˜.á.Õ...^_èùà...W 000020
E9037500 003DF846 8900000E E29A5016 FE468D0A 76FF0C76 FFD88E0E D2B81E56 V.¡@..Ä.v..v..F±.P.ã....F½=..u.Õ 000040
0006E903 75000030 F8468900 000F009A 5016FA46 8DFE76FF 0082E9F8 46880006 ...F½Õ...v±.F'.P......F½=..u.Õ.. 000060
06E90375 00003DF8 46890000 0F219A50 16F4468D FA76FFFC 76FF0064 E9F84688 .F½Õd..v•.v'.F¶.P.!....F½=..u.Õ. 000080
F4468800 1CE90375 10563900 08E90374 0E4639F6 5688F446 880043E9 F8468800 ..F½ÕC..F¶.V-9F.t.Õ..9V.u.Õ...F¶ 0000A0
68FA76FF FC76FF00 11E90000 880006E9 03751456 390008E9 03741246 39F6568B .V-9F.t.Õ..9V.u.Õ..¡..Õ...v•.v'h 0000C0
76FF0C76 FFD88E10 33B81E56 5700001A C8CBC95F 5E1F0000 E90000FF FF9A00F4 ¶......Õ...^_èùà...WV.¡3..Ä.v..v 0000E0
8DFA76FF 012FE9EE 46880006 E9037500 003DEE46 89000010 439A5016 FA46800A ..F'.P.C....FŸ=..u.Õ...FŸÕ/..v'. 000100
EA76FFEC 76FF0111 E9EE4688 0006E903 7500003D EE468900 0010619A 5016EA46 Fõ.P.a....FŸ=..u.Õ...FŸÕ...vš.võ 000120
76FFEC76 FF00F0E9 EE468800 06E90375 00003DEE 46890000 10829A50 16E6468D .F|.P......FŸ=..u.Õ...FŸÕþ..vš.v 000140
FF0C76FF 00CFE9EE 46880006 E9037500 003DEE46 8900000F 429A5016 F6468DEA õ.F-.P.B....FŸ=..u.Õ...FŸÕü..v.. 000160
880006E9 03750000 3DEE4689 00000F6B 9A5016F0 4680096A E676FFE8 76FF0A76 v..vÒ.v|j..Fþ.P.k....FŸ=..u.Õ... 000180
C402E3C1 F45E88F4 46FF0003 E90000F4 46C7FC46 89FE4689 00008800 A6E9EE46 FŸÕ!.¡...F±.F•úF¶..Õ...F¶ ^¶èÐ.á 0001A0
00392610 56880E46 88F076C4 02E3C1F4 5E88003C E9037502 40082600 8826F076 vþ&..&.@.u.Õ<..^¶èÐ.ávþ.F.  '.&9. 0001C0
46890250 88260088 26F076C4 02E3C1F4 5E880019 E9037402 50392600 22E90374 t.Õ".&9P.t.Õ...^¶èÐ.ávþ&..&.r...F 0001E0
```

Dump of file SATURN:[PCCOMMON.DUMP.DLL]PMFORM.TMP;1 on 18-APR-1990 10:49:29.19
File ID (798,38,0)   End of file block 72 / Allocated 72

Virtual block number 38 (00000026), 512 (0200) bytes

```
6A0E76FF 1076FF27 15680A76 FF0C76FF F076FFF2 76FFFFAC E90003E9 FE5689FC •.V±Õ..Õ¯..v·.vþ.v..v.h.'.v..v.j 000000
EA76FFEC 76FF0011 E9000088 0006E903 74FE4608 FC468810 C4830000 0FFD9A00 ..»....á..F•.F±t.Õ..¡..Õ...vš.võ 000020
FF1076FF D88E10E7 881E5657 000006C8 CBC95F5E 1F0000E9 00001003 9A00F468 h¶..Æ...Õ...^_èùà...WV.¡Ó..Ä.v.. 000040
FC5EC400 35E9FA46 880006E9 03750000 3DFA4689 0000FFFF 9A5016FC 46800E76 v..F•.P......F'=..u.Õ...F'Õ5.á^• 000060
00FFFF9A 0676FF08 76FF0A76 FF0C76FF 0277FF26 0477FF26 FC5EC400 0107C726 &ú...á^•&.w.&.w..v..v..v..v..... 000080
1E565700 0008C800 0CCAC95F 5E1F0000 E9FA4688 000007C7 26FC5EC4 FA468900 ..F'á^•&ú....F'Õ...^_èò..à...WV. 0000A0
0006E903 7500003D F8468900 00FFFF9A 5016FE46 800676FF 0876FF08 8E124888 |H..Ä.v..v..F±.P......F½=..u.Õ.. 0000C0
06E90375 00003DF8 46890000 FFFF9A50 16FA468D 0676FF08 76FF0398 E9F84688 .F½Õ...v..v..F'.P......F½=..u.Õ. 0000E0
0000FFFF 9A505200 02050C56 880A4688 FA76FFFC 76FFFE76 FF0377E9 F8468800 ..F½Õw..v±.v=.v'.F..V....RP..... 000100
026A2F6A 0277FF26 0477FF26 0A5EC403 4DE9F846 880006E9 03750000 3DF84689 .F½=..u.Õ...F½ÕM.á^.&.w.&.w.j/j. 000120
260A5EC4 0322E9F8 46880006 E9037500 003DF846 890000FF FF9AFFFF 68FFFF68 h..h........F½=..u.Õ...F½Õ".á^.& 000140
06E90375 00003DF8 46890000 138D9AFF FF681387 682F6A01 6A0277FF 260477FF .w.&.w.j.j/h..h........F½=..u.Õ. 000160
00145E9A FFFF6813 AE68026A 1D6A0277 FF260477 FF260A5E C402F7E9 F8468800 ..F½Õ¼.á^.&.w.&.w.j.j.hÙ.h...^.. 000180
13D56802 77FF2604 77FF260A 5EC402CC E9F84688 0006E903 7500003D F8468900 ..F½=..u.Õ...F½Õë.á^.&.w.&.w.hÍ. 0001A0
0477FF26 0A5EC402 A5E9F846 880006E9 03750000 3DF84689 000013D8 9AFFFF68 h...Ù....F½=..u.Õ...F½ÕÈ.á^.&.w. 0001C0
027EE9F8 46880006 E9037500 003DF846 89000014 029AFFFF 6813FC68 0277FF26 &.w.h•.h........F½=..u.Õ...F½Õ~. 0001E0
```

Dump of file SATURN:[PCCOMMON.DUMP.DLL]PMFORM.TMP;1 on 18-APR-1990 10:49:29.19
File ID (798,38,0)   End of file block 72 / Allocated 72

Virtual block number 39 (00000027), 512 (0200) bytes

```
06E90375 00003DF8 46890000 FFFF9AFF FF681427 680277FF 260477FF 260A5EC4 á^.&.w.&.w.h'.h........F½=..u.Õ. 000000
68145868 14306814 2068086A 1D6A0277 FF260477 FF260A5E C40257E9 F8468800 ..F½ÕW.á^.&.w.&.w.j.j.h-.hÒ.hX.h 000020
260477FF 260A5EC4 0226E9F8 46880006 E9037500 003DF846 89000014 8F9AFFFF ........F½=..u.Õ...F½Õ&.á^.&.w.& 000040
F8468800 06E90375 00003DF8 46890000 14BA9AFF FF681483 68026A0A 6A0277FF .w.j.j.h..h...¤....F½=..u.Õ...F½ 000060
EB9AFFFF 6814B468 148C6814 8968126A 1D6A0277 FF260477 FF260A5E C401FBE9 Õ«.á^.&.w.&.w.j.j.h..h..hÇ.h...§ 000080
6A0277FF 260477FF 260A5EC4 01CAE9F8 46880006 E9037500 003DF846 89000014 ....F½=..u.Õ...F½Õò.á^.&.w.&.w.j 0000A0
C4019FE9 F8468800 06E90375 00003DF8 46890000 15169AFF FF6814DF 68026A00 .j.hÕ.h........F½=..u.Õ...F½Õ..á 0000C0
89000015 479AFFFF 68151068 14E86814 E568096A 1D6A0277 FF260477 FF260A5E ^.&.w.&.w.j.j.hÍ.hò.h..h...G.... 0000E0
68026A15 6A0277FF 260477FF 260A5EC4 016EE9F8 46880006 E9037500 003DF846 F½=..u.Õ...F½Õn.á^.&.w.&.w.j.j.h 000100
FF260A5E C40143E9 F8468800 06E90375 00003DF8 46890000 15729AFF FF68153B ;.h...r....F½=..u.Õ...F½ÕC.á^.&. 000120
003DF846 89000015 A39AFFFF 68156C68 15446815 4168036A 1D6A0277 FF260477 w.&.w.j.j.hA.hD.hl.h...È....F½=. 000140
FF681597 68016A22 6A0277FF 260477FF 260A5EC4 0112E9F8 46880006 E9037500 .u.Õ...F½Õ..á^.&.w.&.w.j"j.h..h. 000160
FF260477 FF260A5E C400E7E9 F8468800 06E90375 00003DF8 46890000 15CE9AFF ..ö....F½=..u.Õ...F½ÕÓ.á^.&.w.&. 000180
E9037500 003DF846 89000015 FF9AFFFF 6815C868 15A06815 9D68066A 1D6A0277 w.j.j.h..h..hà.h........F½=..u.Õ 0001A0
162A9AFF FF6815F3 68016A1E 6A0277FF 260477FF 260A5EC4 0086E9F8 46880006 ...F½ÕÑ.á^.&.w.&.w.j.j.hµ.h...*. 0001C0
1D6A0277 FF260477 FF260A5E C4008BE9 F8468800 06E90375 00003DF8 46890000 ...F½=..u.Õ...F½Õ..á^.&.w.&.w.j. 0001E0
```

```
Dump of file SATURN:[PCCOMMON.DUMP.DLL]PMFORM.TMP;1 on 18-APR-1990 10:49:29.19
File ID (798,38,0)   End of file block 72 / Allocated 72

Virtual block number 40 (00000028), 512 (0200) bytes

46880006 E9037500 003DF846 890000FF FF9AFFFF 68162468 15FC6815 F968046A j.h'.h=.h$.h........F½=..u.Õ...F 000000
46890000 13379AFF FF68164D 68016A21 6A0277FF 260477FF 260A5EC4 005AE9F8 ½Õ2.á^.&.w.&.w.j!j.hM.h ..7....F 000020
68133168 1D6A0277 FF260477 FF260A5E C4002FE9 F8468B00 06E90375 00003DF8 ½=..u.Õ...F½Õ/.á^.&.w.&. .j.h1.h 000040
5E1F0000 E90000B8 0006E9F8 46880006 E9037500 003DF846 890000FF FF9AFFFF ........F½=..u.Õ...F½Õ..¡ Õ...^ 000060
00020000 00011021 000203B1 000A1653 02030428 000B1115 0203002D 90CBC95F _èù.-.......(...S...Ÿ...!........ 000080
02030086 000103FB 01030ECA 000215CB 00050149 00021334 00050000 0002135C \.......4...I...ù...ò...«........ 0000A0
02030260 000709E0 02030000 000612B1 000207D7 00021486 000503C5 000A1362 b...é.......■...Ÿ.......Å...'... 0000C0
020309EC 0002153E 00050306 000A13B4 0203100F 00021513 0005007F 000412C1 è...........Õ...Ç...ø...>...š... 0000E0
02030676 0002145B 000505F5 0002142A 000502EA 000910F7 0203008E 00041136 6.......¥...õ...*...¥...[...v... 000100
00050289 00071234 02030000 00021650 0005009E 000412E2 020303E9 000A128D ....Õ...ã.......P.......4....... 000120
0005008A 0002138A 000500AA 00041157 02030505 000213FF 00050C01 000215F6 ...............W................ 000140
02030E16 0002159A 00050415 000213D8 000503FC 000A1433 0203088B 000214B7 -..............3...■...Ä........ 000160
0005031C 000903CA 0203022B 00070409 02030AA0 0002156F 00050310 00091180 ñ.......o...........+...ò....... 000180
020300CE 00040055 0203102B 000214E2 0005039A 000A130C 02030329 000213B1 ........)...........ã...+...U...ö... 0001A0
000501CE 00051212 02030CB5 00021627 0005041C 0008007B 02030237 000707CB Ÿ...)...........'...ç.......ö... 0001C0
01CB0001 881F0200 3E89D88E FFFFB81E 000000DB 00041258 02030239 0002135F ù...7...(.......'...ç.......ö... 0001E0
                                                                          _...9...X...Ü....¡...Ä.>...¡..ù.

Dump of file SATURN:[PCCOMMON.DUMP.DLL]PMFORM.TMP;1 on 18-APR-1990 10:49:29.19
File ID (798,38,0)   End of file block 72 / Allocated 72

Virtual block number 41 (00000029), 512 (0200) bytes

                                                                          ................................ 000000
00000000 00000000 00000000 00000000 00000000 00000000 00000500 02000200 à...WV.F$.F½.V'.F..F=.V±á^½&6G.B 000020
420A47C6 26F85EC4 FE568CFC 46890E46 8DFA568C F84689EC 46805657 000016C8 .F..V.&.G.&.W.&..&.W.&úG.....v=. 000040
FFFC76FF 167FFF04 47C72602 57892607 89260857 89260647 89260856 8B06468B .F..V.&.G.&.W.&..&.W.&úG.....v=. 000060
263F8B26 C02A1278 044FFF26 F85EC4F0 8B0CC483 00850206 9A53060A 76FF0C76 v..v..S.......á..Þá^½&.O.x.*ä&.?& 000080
CBC95F5E C68B06C4 83FFFF00 909A006A 53FA76FF 900FEB05 88260247 8E2607FF ..&.G.&..Š...v'Sj.......á..ó^_èù 0000A0
D1C88BF9 F7000CB9 99068A2D C38BFA46 89E42A0B 478A2608 5EC45657 000008C8 à...WVá^.&.G.*Õ.F'.Û-¤..¿..¥'.ài 0000C0
0A4F8026 085EC40F 74400A47 F6260774 830A47F6 26F84689 12AE05E0 D1C103E0 Å.èIÅ.Û..F½&-G..t.&-G.ät.á^.&.O. 0000E0
90E2EB00 000447C7 26200A4F 80260E74 010A47F6 26085EC4 90012BE9 FFFFB820  ¦..Õ+..á^.&-G..t.&.O. &úG...Šã. 000100
8A2DC38B 4C750C0A 47F626FC 7689F08B 04478926 C02BEF0A 67802602 0A4F8026 &.O..&.g.ÿ+ä&.G..Þ.v=&-G..uL.û-¤ 000120
810E7401 390A7E81 077506C6 087E8137 750112AE 87F6060B 68F9F700 0CB99906 ..¿..¥'kÄ.-.Û..u7.-.6.u..-.9.t.. 000140
FF0A76FF 0C75C00B 02C48301 AC101E9A FA76FF0F 75FFFF0A 7E811675 06D2087E -.■.u..-...u..v'...¯..á..ãu..v.. 000160
060868F9 F7000CB9 99068A2D C38B1575 080A47F6 26085EC4 04C4830C 51E80876 v.ÒQ..á.á^.&-G..u..û-¤..¿..¥'kÄ. 000180
57892607 89264008 578B2606 478B2606 772B2637 8826085E 88677401 12AE87F6 -.Û..tg.^.&.7&+w.&.G.&.W.ä&..&.W 0001A0
C48301CA 0E6E9AFA 76FF0677 FF265256 167EF60B 04478926 48024588 F87E8B02 ..-½.E.H&.G..--.VR&.w..v'.n.ò..á 0001C0
C408C483 01ED0E30 9A53006A 006A026A 0F742018 BF87F6FA 5E8B19E8 FC468908 ..F=Š..^'-.€. t.j.j.j.S.0.Û..á.á 0001E0
83005A0E 6E9AFA76 FF501606 46805600 01BE17E8 07882606 468A065F C426085E ^.&á_..F.&..Š.ƒ..V.F..P.v'.n.Z..

Dump of file SATURN:[PCCOMMON.DUMP.DLL]PMFORM.TMP;1 on 18-APR-1990 10:49:29.19
File ID (798,38,0)   End of file block 72 / Allocated 72

Virtual block number 42 (0000002A), 512 (0200) bytes

4310429A 000AB8EC 8B55CBC9 5F5EE42A 06468AFE CCE90374 FC7639FC 468908C4 á..F=9v=t.Õä±.F.*õ^_èùU.š¡...B.C 000000
DEA30856 8B06468B 1BFA1689 1BF8A310 56880E46 8B1C0A1E 8C1C08A3 1C0EB801 .¦..È.......F..V.È½...'..F..V.È8 000020
0606C703 0BE90374 25F67E80 038DE900 001C0206 C700001C 0406C71B E016891B ...Å.ú.....ú.....Õ...~-¥t.Õ..ú.. 000040
1BF6A31B DCA31BE2 A31BFCA3 1BFEA31B E6A31C00 A31BE4A3 1BE8A3C0 2800011C ...+âÈÕ.Èõ.È..Èl.È±.È=.Èã.ÈÉ.È-. 000060
260A5E8B 903EEB00 301D6E06 C70A46FF 49753001 7F80260A 5EC40020 1D6E06C7 ú.n. .á^.&...0ul.F.ú.n.0.Š>..^.& 000080
FF1A7500 1BE83E83 0E75203F 80269028 EB00001B FC06C71B E806FF0D 752B3F80 .?+u...Õ.ú.=...Š(.&.? u..>Õ..u.. 0000A0
260A5E8B 0A46FF1B F606FFC7 752D3F80 260A5EC4 0DEB180C 06FF9014 EB1BFC06 .=.Š....É.Š.á^.&.?-uú..-..F..^.& 0000C0
08C48308 C7E80E1C 0C681E0A 76FF0C76 FFD075C0 0B02C483 0978E80E 5098078A ...P.Õx..á..âuI.v..v..h...Õú..á. 0000E0
0074001B F63E831C 0CA308F7 1C0CA11B F606FF0C 7D001C0C 3E830C56 890A4689 .F..V..>...)...-.Å..¥ÄÉ...>-..t. 000100
76FF060A 46FF1BFE 06FF2D75 2E3F8026 0A5EC400 201D6E06 C7067530 1D6E3E83 .>n.0u.ú.n. .á^.&.?.u-..±..F...v 000120
FF00011C 0606C70A 7D001C06 3E830C56 890A4689 08C48308 7BE80E1C 06681E0A ..h...Õ(..á..F..V..>...).ú...... 000140
06C70675 006C3D2B 74006830 4074004E 303D7400 46309807 8A260A5E C41BFE0E .±.á^.&...=F.t==N.tä=h.t+=l.u.û. 000160
1C75003F 80260A5E C40A46FF 03754C3F 80260A5E C4097500 1BE63E83 00021BE6 l....>l..u.á^.&.7Lu..F.á^.&.?.u. 000180
98078A26 C8EB0008 1BE606C7 D0EB0010 1BE606C7 D8EB0001 1BE606C7 90024EE9 ÕN..ú.l...ŠÄú.l...ŠÄú.l...Šà&... 0001A0
00693DF8 468B20F8 46831BE4 06FF0875 00583005 74004730 0A740045 30F84689 .F½=E.t.=G.t.=X.u...Õ..F½ .F½=i. 0001C0
900159E9 0140E903 75002530 0152E903 7E013FE9 03750063 300191E9 037E7874 tx-.Õ..=c.u.Õ?.-.ÕR.=X.u.Õä.ÕY.. 0001E0
```

Dump of file SATURN:[PCCOMMON.DUMP.DLL]PMFORM.TMP;1 on 18-APR-1990 10:49:29.19
File ID (798,38,0)   End of file block 72 / Allocated 72

Virtual block number 43 (0000002B), 512 (0200) bytes

```
1BF81EC4 0DEB0000 0247C726 0789261C 02A11FC4 261BF81E C4157502 1BE63E83 .>l..u.á.½.&á.À..&..&úG...Š.á.½. 000000
E9037400 1C023E83 0170E903 75001C04 3E83041B F8068307 89261C02 A11FC426 &á.À..&....½...>...u.Õp..>...t.Õ 000020
00001BDC 06C71C00 06FF01AC E9FFFFB8 01AFE903 75200A47 F62618DE 1EC4018D §.á.B.&-G. u.ÕE.¡..Õ¯.....ú.É... 000040
1C0606C7 1BFE06FF 1BE406FF 1BE206FF F2EB086A 90C3EB02 C483019E E80E0A6A j..Ò...á.Šü.j.Š·..ã...ð...±.ú... 000060
741C0C06 39FA4689 1BE6A3C0 2B7A7401 1BE63E83 0081E903 75081BE6 3E830004 ...>l..u.Õ...>l..tz+âÈl..F¹9...t 000080
1C0CA105 1C0C2E83 909013EB 00001C0C 06C70A74 001BF63E 83FA4689 1C0CA128 (À...F¹.>-..t.ú.....Š........À.. 0000A0
02C48304 8DE80E3A 6A02C483 0130E80E 106A021B F806831C 0CA3C02B 027DC00B .â).+âÈ....½..j..ÒO..á.j:.Ò...á. 0000C0
EB1C0CA3 C02B027D C00B1C0C A300052D FA46B815 74001BF6 3E832274 00FA7E83 .~¹.t".>-..t..F¹-..È...â).+âÈ..Š 0000E0
106AFF10 E9021BF8 068302C4 8300F1E8 0E106A04 1BF82E83 00001C0C 06C79007 ..ú.......½..j..Òþ..á...½..Õ..j. 000100
E80E256A FF2AE903 49E80EF8 76FFF4EB 016A90FF 39E9026E E80E006A 90FF3FE9 Õ?..j..Òn.Õ9..j.Š¶.v½.Òl.Õ*.j%.Õ 000120
88097400 1BE63E83 DA7E0067 30057C00 6530FF0C E9037500 643D90FF 21E90428 (.Õl..=d.u.Õ..=e.|.=g.-Õ.>l..t.. 000140
FE80E903 75006E3D 903AEBFE 5689FC46 89400C56 880A4688 0A4EFF0C 5688OA46 F..V..N..F..V.ə.F•.V±Š:.=n.u.Õ.± 000160
007830FE B9E90375 0075308F 7400733D FEE0E903 7500703D FEE4E903 75006F30 =o.u.Õõ±=p.u.ÕÅ±=s.t.=u.u.Õ¿±=x. 000180
253C0474 C00AF646 88078A26 FC5EC4FC 46FF9034 EB0A46FF 9081EBFF 79E90375 u.Õy.ŠŸ..F.Š4..F=á^=&...F-.ât.<% 0001A0
56890A46 89FE568B FC468B06 C483044C E80E0A76 FF0C76FF 500A462B C38BEC75 uš.ú+F.P.v..v..ÒL..á..F=.V±.F..V 0001C0
A1FE51E9 0374200A 47F6261B DE1EC4FC 63E90374 C00AF646 88078A26 0A5EC40C .á^.&...F-.ât.Õc=á.B.&-G. t.ÕQ±À 0001E0
```

Dump of file SATURN:[PCCOMMON.DUMP.DLL]PMFORM.TMP;1 on 18-APR-1990 10:49:29.19
File ID (798,38,0)   End of file block 72 / Allocated 72

Virtual block number 44 (0000002C), 512 (0200) bytes

```
0006FF04 740A067E 8300201D 6E06C706 74001BFE 3E835657 000012C8 CBC91C02 ..èùà...WV.>±..t.ú.n. ..~..t.... 000000
FE5689FC 46890257 88260788 261BF81E C4197510 1BE63E83 0774021B E63E831C ..>l..t..>l..u.á.½.&..&.W..F=.V± 000020
0EEB0000 FE46C7FC 46890788 261BF81E C4117400 1C003E83 902CEB04 1BF80683 ..½..Š,..>...t.á.½.&...F=úF±..Š. 000040
FE460BFC 46880E74 001BDC3E 83021BF8 0683FE56 89FC4689 99078B26 1BF81EC4 á.½.&....F•.V±..½...>É..t..F=.F± 000060
75001C00 3E83F456 89F24689 1C0A1688 1C08A11D 6CA3C02B 9003EB06 46880674 t..F.Š..+ãÈl.À.......F·.V¶.>...u 000080
83D8F7FE 568BFC46 882D07C6 26F246FF F25EC41D 750A067E 83287D00 FE7E8331 1.~±.)+.~..u.á^·.F·&ó.-.F=.V±%Ä. 0000A0
FA5E8CF8 46891BEA 880000F6 46C79006 EB0001F6 46C7FE56 89FC4689 DAF70002 ø.%Ö.F•.V±úF-..Š..úF-..¡ð..F½.^¹ 0000C0
F876FFFA 76FF4574 001BFE3E 830AC483 06F31014 9AFC76FF FE76FF50 1E0676FF .v..P.v±.v=...µ..á..>±..tE.v¹.v½ 0000E0
1D6C06C7 0675081D 6C3E8300 7EC908F0 4E89C82B 1C060E8B 04C48302 0F0FFC9A .=....á.....+à.Nþ.è~..>l..u.ú.l. 000100
88F04E89 F4468CF2 7E89F47F C00849C1 88473005 C62605EB F27EC4F0 4E880000 ...Nþá-·Š.&ó.OG.èl.á.¶.-·.F¶.Nþ. 000120
F846FF46 202C8003 7C613C07 74C90804 88078A26 F85EC4F2 76C5EE5E 8C1BE40E .ð..^Ÿév·á^½&.....èt.<a|.., F.F½ 000140
83087418 FC06081B E8A11475 001C003E 83EE5E8E F45E8CF2 7689E375 003F8026 &.?.uD.v·.^¶.^Ÿ.>...u.ÀÒ...=.t.. 000160
7E835657 000010C8 CBC95F5E 02C48302 FFE80E50 C02802EB 0001B805 7500F67E —.u.¡..Š.+âP.Ò...á.^_èùà...WV.- 000180
1BE63E83 008FE902 1BF80683 FA5689F8 46891BFA 16881BF8 A10001BE 18740006 ..t./..À½...¹..F½.V¹.¯½..Õ...>l. 0001A0
FC468907 88261BF8 1EC410EB FA5689F8 46890257 88260788 261BF81E C4137408 .t.á.½.&..&.W..F½.V¹Š.á.½.&...F= 0001C0
900AEB02 68881575 FA460BF8 46880E74 081BE63E 83041BF8 0683FA5E 8CF84689 .F½.^¹..½...>l..t..F½.F¹u.¡h.Š.. 0001E0
```

Dump of file SATURN:[PCCOMMON.DUMP.DLL]PMFORM.TMP;1 on 18-APR-1990 10:49:29.19
File ID (798,38,0)   End of file block 72 / Allocated 72

Virtual block number 45 (0000002D), 512 (0200) bytes

```
FE3639F6 2BF45689 F24689FA 5688F846 88FA5E8C F8468902 6F880975 00FC7E83 .~=.u.¡o..F½.^¹.F½.V¹.F·.V¶+-96± 000000
C44690ED E8107ECE 3B461574 003F8026 F246FFF2 5EC4900E EB1C060E 8B1C741B .t.....Š..á^·.F·&.?.t.F;õ-.ŠÚ.Fá 000020
02C48301 59E80E57 0875001B F63E83FE 2B1C0C3E 88F37500 3F8026F2 46FFF25E ^·.F·&.?.uµ.>..+±.>-..u.W.ÒY..á. 000040
C95F5E02 C483013C E80E5708 74001BF6 3E8306C4 830183E8 0EF876FF FA76FF56 V.v¹.v½.Ò°..á..>-..t.W.Ò<..á.^_è 000060
B0057547 067E8306 7467067E 83FE5689 FC46891B FA16881B F8A10000 06C890CB ù.à...À½...¹..F•.V±.~.gt..-.Gu. 000080
1C063E83 007400FA 7E800006 1C0606C7 0675001B FE3E83FA 4688C02A 9003E801 .Š..*â.F¹.>±..u.ú......~¹.t..>.. 0000A0
FFFE76FF 1C0836FF 1C0A36FF 0676FF1C 0636FF1B E436FF00 011C0606 C7067500 .u.ú......6õ..6...v..6...6...v±. 0000C0
FF1C0A36 FF147500 1BDC3E83 1B7400FA 7E800EC4 83069A1E FF261AFA 068EFC76 v=..¹.&.....á..~¹.t..>É..u..6... 0000E0
0A36FF14 75001C06 3E831B74 001BDC3E 8304C483 069E1EFF 261AFA06 8E1C0836 6....¹.&.....á..>É..t..>...u..6. 000100
0B1BE8A1 0000106C 06C7081B F8068304 C48306A6 1EFF261A FA068E1C 0836FF1C ..6....¹.&..l..á...½..ú.(...ÀÒ.. 000120
02E80001 880574C0 0804C483 06AA1EFF 261AFA06 8EFC76FF FE76FF1B 741BFC06 .=.t..v±.v=..¹.&..¨..á..ât.¡..Š. 000140
1478044F FF261BDE 1EC43C75 001C043E 83560000 00C890CB C90129E8 0E50C02B +âP.Ò).èù.à...V.>...u<á.B.&.O.x. 000160
CB00909A 0676FF53 1BE036FF 10E8E42A 04882602 478E2607 FF26378B 2606468A .F.&.7&..&.G.&..*õŠ..6Á.S.v....ù 000180
1C043E83 56570000 02C890CB C95E1C02 06FF9005 EB1C0406 FF077540 06C48309 ..á.ðu.....Š......^èù.à...WV.>.. 0001A0
06C4830A 3300909A 1D6E36FF 1BDE36FF 1BE036FF 1BEB507E F60B0676 8B577500 .uW.v..--PŠ..6Á..6B..6n....3..á. 0001C0
FF263F8B 261D6EA0 D478044F FF261BDE 1EC41E7E C0084EC6 8B1C0406 FF047540 ðu......6N.â-.á.B.&.O.xå.n.&.?&. 0001E0
```

Dump of file SATURN:[PCCOMMON.DUMP.DLL]PMFORM.TMP;1 on 18-APR-1990 10:49:29.19
File ID (798,38,0) End of file block 72 / Allocated 72

Virtual block number 46 (0000002E), 512 (0200) bytes

```
02C8CBC9 5F5E1C02 06010646 88077500 1C043E83 D4EBE42A 05882602 478E2607 .&.G.&..*ōŠå.>...u..F.....^_èùà. 000000
5098078A 26065EC4 18DE36FF 18E036FF 22E85E75 001C043E 830A7688 56570000 ..WV.v..>...u^Š".6Å..6B.6^.Ī...P 000020
4FFF261B DE1EC425 74C0084E C6880646 FF1C0406 FF047540 06C4830A A500909A ...Ē..6.∂u......F..6N.åt%6.B.&.O 000040
3E83CAEB E42A0588 2602478E 2607FF26 3F88261B DE1EC407 8A26065E C4CD7804 .xëá^.&..6.B.&.?&..&.G.&..*ōŠò.> 000060
89F44689 1C0A1688 1C08A156 00000CC8 CBC95F5E 1C020601 0A468807 75001C04 .,.u..F.....^_èùà...VÅ.......F¶. 000080
2BF02BF8 468904C4 83060E0F FC9AF476 FF521C0C 3688FA46 89FC4689 C02BF656 V-+å.F•.F'.6..R.v¶.•.B..6..F½+Þ+ 0000A0
F45EC422 75001BF6 3E834E01 75081D6C 3E8308EB 02EE8305 7510106C 3E830676 v..>l..u..Ÿ.Š..>l..u.N.>-..u"6^¶ 0000C0
83F84EFF 02C483FE 71E80E50 98078A26 F446FF12 75301D6E 3E831975 2D3F8026 &.?-u..>n.0u..F¶&...P.Òq±.6..N%. 0000E0
3E830066 E80EFA46 FF077400 067E831B 740018F6 3E83077E F60B0874 301D6E3E >n.0t..-~..>-..t..-..t..F'.Òf..> 000100
7400067E 8302C483 FE7EE80E 56297500 18F63E83 0070E80E FC46FF07 74001D6C l..t..F•.Òp..>-..u)V.Ò-±.6..-..t 000120
FFF876FF 0040E80E 047500FC 7E830A74 001D6C3E 830039E8 0E047500 FA7E830A ..-'.u..Ò9..>l..t..-•.u..Ò∂..v%. 000140
C483FE38 E80E5600 201D6E06 C70E7400 18F63E83 06C483FE B5E80EF4 76FFF676 v-.v¶.Òç±.6..>-..t.ú.n. .V.Ò8±.6 000160
E80E306A CB02C483 FD02E80E 50002088 03E80028 88057400 1BEB3E83 CBC95E02 .^èù.>Ò..t.¡+.Š.¡ .P.Ò0».6.ùj0.Ò 000180
FDAAE80E 500078B8 03E80058 88057400 18E43E83 1775101D 6C3E8302 C483FDC8 à».6..>l..u..>ô..t.¡X.Š.¡x.P.Ò`» 0001A0
83378826 1BF81EC4 12752A3F 80260A5E C40001FE 46C75657 000006C8 CB02C483 .6.ùà...WVúF±..6^.&.?*u.6.%.&.7. 0001C0
0A5E8BF6 2B0A46FF FFFFFE46 C708752D 3F80260A 5EC49060 EB0A46FF 021BF806 .%...F.Š'.6^.&.?-u.úF±...F.+-.^. 0001E0
```

Dump of file SATURN:[PCCOMMON.DUMP.DLL]PMFORM.TMP;1 on 18-APR-1990 10:49:29.19
File ID (798,38,0) End of file block 72 / Allocated 72

Virtual block number 47 (0000002F), 512 (0200) bytes

```
FB880030 1D6E06C7 0675303C 0A751BFE 3639387F 393C3F7C 303CFA46 88078A26 &...F'<0|?<9.;96±.u.<0u.ú.n.0..« 000000
3D802647 F18B30E9 83C803E1 D1CE0302 E1C1CE88 98058A26 1B7F393D 802606EB Š.&.=9..&....ōéÅ..ōîÅ.à.Ō0.þG&.= 000020
CBC95F5E 0C56880A 46883789 26065EC4 F088EEF7 FE46880C 468C0A7E 890F7D30 0)Ō.~..F..F±%Ÿ.Þá^.&.7.F..V.^_èù 000040
00382611 74003080 264701EB FC7EC406 4E8AFE5E 8CFC4689 02768857 000004C8 à...W¡v..F•.^±.N.6-•Š.G&.=.t.Ī8. 000060
C48850EC 885590CB C95FC02B FE468CFC 7E899009 EBFE468C FC7E8900 0188F475 u¶¡...-•.F±Š...-•.F±+å_èù.U.ŝP.6 000080
0386E800 21E80000 FFFF9A02 7C681E02 7E681E18 88A3E086 580000FF FF9A5016 .P.....X.ÅÈ¡..h~..h|.......ÒI.ÒÑ. 0000A0
BB1E0284 16FF00FF 680CC000 709A0CB3 0D1C9A50 CB50E588 00018809 8F11569A .V...¡...[]ùP...'..p.å.h.......Ē 0000C0
F3C888D1 880688BE 3174003D 80264701 75003080 267FFFB9 027E068E FF330000 ..3...-.¿..&.=.u.G&.=.t1ƒ...ì.ùµ 0000E0
AC9204E0 C00E7241 2CAC18BF 8F1FF788 071E061C E8E774AE F2C03308 74CA88A6 |.òt.3à·ÙtÓŠ.....¥.¢¢.¯,Ar.åÅ..¯ 000100
FF047400 06983E83 0CC50070 9A5000FC B8EC8855 00C31FED EBAAC20A 0572412C ,Ar..ô`ŠÚ.û.U.&¡•.P.p.é..>...t.. 000120
BE065688 C08ED88E 012B8857 56EC8855 CB50E588 00260070 9A5000FF B806961E ...¡..P.p.&..[]ùW.ŝVW¡+..Ã.6.V.ƒ 000140
0002CA5D E5885E5F 96EBEBF7 88AEF2FF FFB9C033 970C7496 401074C2 3BAD1B04 ..Ù;ôt.∂.t..3à¿..·Û.%ŜŜ._^.[]ò.. 000160
C4885049 D1F7AEF2 FFFFB9C0 33FA8892 1F74C008 003A0040 9A0676FF 57EC8855 U.ŝW.v..∂.:..åt...'3à¿..¯Û%†IP.6 000180
46881AD0 06FF0000 04C80002 CA5DE588 5F580000 FFFF9A50 1651521E 530002B8 Ē..S.RQ.P.....[_.[]ò..à.....Å..F 0001A0
119A0200 68FE5E8C FC468912 AE05E001 C103E0D1 C888F9F7 000CB999 068A2004 .·¤..¿..¥'.àIÅ.ĒIÅ.Û..F•.^±h.... 0001C0
47C726FC 5EC4080A 4F802611 74D00808 57892606 47892604 5EC402C4 83007A13 .z..6.6^.&.G.&.W..Åt.&.O..6^•&úG 0001E0
```

Dump of file SATURN:[PCCOMMON.DUMP.DLL]PMFORM.TMP;1 on 18-APR-1990 10:49:29.19
File ID (798,38,0) End of file block 72 / Allocated 72

Virtual block number 48 (00000030), 512 (0200) bytes

```
FC5EC408 57892606 47892640 FE5688FC 4688040A 4F802604 5EC49021 EB020002 ...ŜI.6^.&.O...F•.V±∂&.G.&.W.6^• 000000
C3C90000 0447C726 02578926 07892608 57882606 47882604 5EC40001 0247C726 &úG...6^.&.G.&.W.&..&.W.&úG...èÙ 000020
0A76FF53 CC8B04EC 830478E9 046CE9C0 3300098A 0872188D 1E3B065E 88EC8855 U.&.^.;.§.r.¤..3àÒl.Òx..&..&S.v. 000040
885500C8 5DE588FD 188FA780 91E175C0 855A5900 00FFFF9A 51160C76 FF0876FF .v..v..Q.....YZ.åuÅ..Ī¢.».[]ù.U. 000060
51C93353 12742018 BF87F604 2BE9C033 00098A08 72188D1E 3B065E88 0CEC83EC &.&..^.;.§.r.¤..3àÒ+.-.¢. t.S3èQ 000080
C0330856 C50A468E FA5E8C66 7480188F 87F60000 0E599A50 16F44680 51414151 QAAQ.F¶.P.Y...-.¢..tf.^'.F.éV.3à 0000A0
DC8802EC 833875AE F20A8049 E30C4E88 F86689F2 88FA8856 57FCFC46 89FE4689 .F±.F••WV.'.·.f%.N.DI¯.·Ùu;.&..Ē 0000C0
009AE900 2BE8F4E2 AA1A74FB 3B0D740A 3CAC0C4E 880716FA 880488E2 2B00808A ¤..+ã.å.'...W.¯<.t.;«t.¯à¶Ò+.Ò.. 0000E0
7AE80093 E9FA5E8E 5F5EE1E8 0014E8E2 EBFC46FF 0A80AA00 1FE80375 FB380D80 ¯.;«u.Ò..^¯..F•ŜàÒ..ŜÃ^_.^'Ò..Ŝz 000100
5016F446 8051521E 53065E88 1FE3CA28 CF881F06 1E515350 0D011042 9AFFFCB8 ¡•..B.1.PSQ....Û+òÒ..^.Š.RQ.F¶.P 000120
C00808C4 831FC3FA 88585859 1F07740B 08FE5E01 F45E8811 75C00800 00009A9A ......åu..^¶.^±.Ût..Y[X.'Ù..6..à 000140
BF87F6FE 5E8E26EB F900208A 03E8001C 8A087500 098A8001 30007400 60301874 t.=m.t.=..¤..u.¤..Š.¤ .'Ŝ&.^±-.¢ 000160
FC462BFE 468806EB F9C03300 1C8A0EEB F803751A 3F80085E 880A5E8E 0E744018 .∂t..^..^..?.u.%Š.¤..3à'Š..F±+F• 000180
0856C51E EEEBC188 0475C908 0C4E8803 0FE9C850 E5880472 FA5E8E5F 5EF8668B .f%^_.^'r..[]ùÒ...N..èu..èŜŸ.éV. 0001A0
00098A00 01300074 00603017 74C0081F 071E0000 0F319A50 16F44680 51521E53 S.RQ¯F¶.P.1.......åt.=m.t.*..¤.. 0001C0
1A3F8026 DA880A74 40188F87 F68775C0 08F44688 C2E80020 BAC7EB00 1CBACC75 uàœ..Ŝúœ .Ŝò.F¶.åuñ-.¢.∂t..Ò&.7. 0001E0
```

Dump of file SATURN:[PCCOMMON.DUMP.DLL]PMFORM.TMP;1 on 18-APR-1990 10:49:29.19
File ID (798,38,0)   End of file block 72 / Allocated 72

Virtual block number 49 (00000031), 512 (0200) bytes

```
8B914901 F7AEF2FF FFB9C033 067EC4D7 8BEC8855 00A3E8C0 33001C8A A6E80275 u.$|¤..3à$È.U.å.■á~.3â¿..·Ù%1|.. 000000
F60C7C00 F883117D 18B01E3B 065E88EC 88550442 E9008357 56EC8855 00CB50FA *]ù.U.$VW*.ÕB.U.å.^.;.§.}..«.|.- 000020
05720688 1E380872 0828DC8B 5A5900CB 5DE588C0 3302E800 01B80574 4018BF87 .¢,ât.¡..Š.3â.|]ù.YZ.É+Är.;.¡.r. 000040
188FA780 D4885200 02BB0684 2EFF5152 FC5CE9C0 33057540 0684A1CB 5152E388 .DRQùÀÇ.âu.3àÕ\■RQ..Ç.E..R.å.Ïe. 000060
B1067500 02300774 00013D40 81127558 C00B0000 FFFF9A52 16501653 C4885087 ñP.åS.P.R.......àXu.Ÿâ=..t.=..u.Ý 000080
01AEE903 731AE81E FFD833C2 8C1AEC06 C41EE31A EA0E8B5A D4794818 BF8F0808 ...¢.Kyâ Z..õ.D.ó.š..ô3Ù..Ò.s.ÕÙ. 0000A0
B80073E8 1AF4BF1A F4BE007C E81AF48F 1AF4BE1A E81EFF00 03B8C28C 1AF006C4 ó.Þ..óE....Ò./¶.¢¶.Ò|./¶.¢¶.Òs.¡ 0000C0
51E81AF8 BF1AF4BE D88E0046 B8C30000 FFFF9A10 E3680E01 6A0B741A F83D1AF4 ¶.=½.t.j..hO.......û¡f..Ä/¶.¢½.ÒQ 0000E0
31E81AF8 BF1AF4BE 003AE81D 708F1D70 8EEC8855 0000100E 9A006A00 6A036A00 .j.j.j..B...U.å/p.¢p.Ò:./¶.¢½.Ò1 000100
9A500646 8A50C033 001AE81A F88F1AF8 8E0023E8 1AF88F1A F8BEEC8B 5503E800 .Š.U.åf½.¢½.Ò#.f½.¢½.Ò..3àP.F.P. 000120
F2740245 08058804 EF830E73 F738C31A E81EFF00 028807E3 1AEA0E8B 0000FFFF ......õ.D.£....Õ.ü;%s..ÿ....E.t· 000140
89C02802 7E168800 F0E90375 027E3639 FF2BF62B 56570000 14C800C3 EEE81DFF ..ŠŸû.à...WV+-+.96~.u.Õb...~.+â. 000160
0B0AC483 11CA1424 9A068868 1EF676FF F876FF0C 6AF85689 F64689F2 5689F046 FÞ.V·.F-.V½j..v½.v~.h...$.ò..ó.. 000180
FFF65EC4 0CEB47EA 75003F80 26F646FF F65EC400 8CE90376 7FFFFE81 461974C0 ât.F.±..v.Õ¥.ó^~.F-&.?.uõGŠ.ó^~. 0001A0
8904C483 11D913CC 9A046A50 01458DBA 75003F80 26F65E88 F475003F 8026F646 F-&.?.u¶.^-&.?.uo.E.Pj..ä.1..ó.. 0001C0
08FC4688 6D74EE46 08EC4688 FE5689FC 468902C4 83120F13 119A56EE 5689EC46 F$.VŸV......ó..F=.V±.F$.FŸtm.F=. 0001E0
```

Dump of file SATURN:[PCCOMMON.DUMP.DLL]PMFORM.TMP;1 on 18-APR-1990 10:49:29.19
File ID (798,38,0)   End of file block 72 / Allocated 72

Virtual block number 50 (00000032), 512 (0200) bytes

```
1614249A 0688681E FD76FFF2 76FF0C6A 1AC71689 1AC5A3EE 5688EC46 886674C2 òtf.F$.VŸÈé...ú.j..v·.vÞ.h...$.. 000000
FFF05EC4 04EC4683 02578926 078926FE 5688FC46 88EC5EC4 2C74C008 0AC4830F ..ó..ât,ó^š.F=.V±&..&.W..F$.ó^Þ. 000020
F475003F 8026F046 FFF05EC4 E8EB0E74 C00A0788 26FC46FF FC5EC407 8A26F046 FÞ&..ó^=.F=&...ât.ŠÒó^Þ.FÞ&.?.u¶ 000040
09060D05 18040203 02021601 FA58E900 028890C8 C95F5EA7 75003F80 26F05EC4 ó^Þ&.?.uÏ^_èù.¡..ÕX*............ 000060
0D530D52 02430041 02350212 12110D10 120F1600 160C0808 070A0C09 0C080C07 ........................S.A.C.R.S. 000080
16080000 0BD702CE 08A40084 09820A81 0A801606 09721C70 2060006C 08590057 W.Y.l.m p.r...........Ê.ö.■..... 0000A0
1264BB18 BBA3CB5D E58B99FF FF880008 E8CB5DE5 8B99FFFF B8188416 89188BA3 ÈE...Ç.¡.....|]ùÒ..¡.....|]ùÈE.Èd. 0000C0
76CA3C04 72BC3C43 0A76243C 0472133C F7E24343 1674073A 2E1875E4 0A002489 ¿$..ðu..:.t.CCã¼<.r.<$v.C<¥r.<òv 0000E0
5DE58B01 FE4F8026 0574C308 C08C065E C4EC8855 00C31884 A3980147 8A2E4301 .C..G..ÈÇ.û.U.$ó^..å.ût.& O±..|] 000100
1ADCA312 740025E8 0875001A DC3E831E 73FFF13D 06468857 5602EC83 EC8855C8 ùW.$.$.VW.F.=þ.s..>É..u.Ò, t.ÈÈ. 000120
C85DE588 5E5F02C4 83118A15 169A0676 FF0B7500 78E80574 0018E815 750082E8 Ò..u.Ò..t.Òx.u..v.......á._ |]ù 000140
C29A5002 80510E4F 8D50501E C033FE5E 89FEE383 43065E88 0776065E 3900F08B £Þ.9^.v..^.C.D±.^±3â.PP.O.Q¯.P.õ 000160
FE5E8800 08A30A8E 0574D20B 1AE0A31A DE1687C2 883874FF FA8308C4 83134516 .E..ó..*.t8.õ..8.ÈÅ..Øt..ÖÈ...^± 000180
06A30000 05000AA3 01478000 02A30000 A3000A88 0C478948 480008A3 C033D88E .Ä3âÈ..HH.G.¡..È..È...G.È.....È. 0001A0
00000AC8 C3D98EC1 8CD20801 9AE81AE0 1E8ED833 064E88C0 8ED88CC3 1FD88C00 ..Ä.ü.Ä.ó.N.3Ù..Á.Ò...Ø.è.lùà... 0001C0
E899C02B 0674FFFF C2F7FA56 89F84689 13F917C0 9A0676FF 006A0876 FF006A56 Vj..v.j..v..ó.*..F½.V*¼ò..t.+â.Š 0001E0
```

Dump of file SATURN:[PCCOMMON.DUMP.DLL]PMFORM.TMP;1 on 18-APR-1990 10:49:29.19
File ID (798,38,0)   End of file block 72 / Allocated 72

Virtual block number 51 (00000033), 512 (0200) bytes

```
9A50FE76 FF006A56 1274D008 FE5689FC 468902C4 83141213 119A56F8 7688902F /..v½V......ó..F=.V±.Àt.Vj..v±P. 000000
8B27E30E 4E8B1E56 57EC8855 90CBC95E FE5688FC 46889007 E808C483 13711778 x.q..ó.Š...F=.V±^èù.U.$WV..N.D'. 000020
0477FF45 3A26C933 FF448AA6 F30A76C5 FE8BC803 D9F7AEF2 C033F788 067EC409 1ó~..¼3â·Ù%1.ù.±év.µ|.D.3è&:E.w. 000040
071E570A 7EC51E08 56880646 880E4E88 00CB5DE5 885F5E1F C188D1F7 49490474 t.1I%1.è.^_.|]ù..N..F..V..é-.W.. 000060
C00BD233 92F788DA F7000283 D8F7AA2D B00A7902 080E750A F9831374 C00A93FC •..ât..*.u¯.Øy.¯-¨¼Ù.Ø.¼Ö.¼.3Ø.â 000080
880586AC 4F0588E2 75C308C2 88AA2704 0276393C 30040387 92F1F793 F1F70274 t.¼þ.¼þ..Æ.0<9v..'^.ô.Ûuã..0¯... 0000A0
8CFA4689 068A8856 000006C8 00C850E5 885E5F1F 580A8CF2 72C73801 448DFF44 D..D.;úr·.ÕX._^.|]ù.à...V|¤..F*. 0000C0
46834601 744004C4 83130E17 F49A5306 0E74830A 47F626FA 5EC41CEB F628FC5E ^■+-Š.ó^*&-G.¯t..S.¶.B..ó.ât.F.F 0000E0
4F800474 D80B065E 88EC8855 90CBC95E C688D876 FA463918 AA168818 A8A10CFA *.À´...^.9F*vÄ.ó^èù.U.å.^..Ùt..O 000100
99C03305 750176E8 00058807 1E297500 3F831AD2 885756EC 8855CB50 E58801FE ±..|]ùW.$VWE0..?.u)..¡..Òv.u.3â. 000120
8C064E88 1AD83689 FFFEFE44 C704C683 000104C7 961AD4A3 1AD2A3FE 244024E8 Š$âS±È0.Èå..ú....ó.úD±±..óÄ..N.. 000140
88ADFC02 778BF273 EEF983FE E180FA74 410000E9 CB50E588 5E5F0009 E8C08ED8 Ä.âÒ.._^.|]ùÒÄ.At*.Ä±.*Ÿs·.w.■Ù. 000160
88E6E8FE 4489F788 000205C2 03357401 A8ADF003 D0881573 C1384843 7401A8FE ±´.tCH;ès..Å.ÞÙ´.t5.ô....¼.D±Š|. 000180
26057401 3B10E489 DA8CC688 FE4CFEF9 0305E805 8948C128 FE4C89F9 030C74FE ±t..*.L±+èH..Š..*±L±.ó.Ö¿ô.;|t.& 0001A0
3848FE88 F27401A8 ADF003FE 882574FF FE3D021A E406C626 C3027F89 1AE01E8C ..Å....ú&ó.ô..=±.t¼.±.ÞÙ´.t·.±H; 0001C0
8E0474C0 08084788 E6EBFE44 89F78800 0205C203 E27401A8 ADF003D0 888C73C1 ês¥.Å.ÞÙ¯.tã.ô....¼.D±Š|.G..ât.. 0001E0
```

```
Dump of file SATURN:[PCCOMMON.DUMP.DLL]PMFORM.TMP;1 on 18-APR-1990 10:49:29.19
File ID (798,38,0)   End of file block 72 / Allocated 72

Virtual block number 52 (00000034), 512 (0200) bytes

 33067788 BBEB3788 1ADC1E8E 260574C7 3B15A98F D88C1274 1AE40EFE 2615E808 ÄŠ.&±.ð.t..Ä¢`.;út.&..É..7ŠE.w.3 000000
 8C98EB4E 4E960574 001DEBFE 4DFE0074 005FE898 40400124 0074C638 006BE8C0 àÒk.;ót.$.@@.ò_.t.±M±Ò..t..NNŠ.. 000020
 49C82B03 7401A8FE 45B851C3 99C03302 47890788 1AE0A326 0474C138 15FDB908 Ä¿».;ët.&ÈÀ....G.3à.ÙQ.E±´.t.+àI 000040
 C62BC223 D2F70072 C2031572 C603C188 F575EAD1 04761AE2 1638267F FFBA4141 AAn..&;.ã.v.ïõu%.ê.ór..ôr.%@#ö+6 000060
 FE44C7F2 03F088FE 88571874 001DE851 52C359C0 33E575EA D1D2F708 75000CE8 Ò..u.%@ïõuI3àYÙRQÒ..t.W.±.Þ.·ÚD± 000080
 9A1F0650 0001B850 52521ED2 335053C3 5A5958FE 55894AD7 28D68806 7789FFFE ±..w..ø+øJ.U±XYZùSP3@.RRP¦..P... 0000A0
 86BF3875 000A7E83 065756EC 8B55C3D2 08027458 5A1FFFFA 8308C483 14E516C2 ô.Ï..á..ª..Z[t..@ÛU.ŠVW..–..u8¢. 0000C0
 89024488 0074F738 11744806 86368B4C EB277200 57E80775 4806468B 08568B02 ..V..F.Hu.ÒW.r'ŠL.6..Ht.;%t..D.. 0000E0
 52C48B50 21EB99FF FFB80675 D2080473 0686FE81 04C68334 735E003E E8560E46 F.VÒ>.^s4.6..±..s..@u.¦...ŠIP.áR 000100
 5E5F07C0 33038806 86368902 5C891489 E675C085 F9580000 FFFF9A50 C0335016 .P3àP.....(ª.äul...\..6...Æ3à._^ 000120
 26721C03 DA8B2CEB F9F27506 86FE8104 C6830C74 024C39F7 880E4E88 CB5DE588 .Ï]ù.N..%9L.t..6..±..u·ªŠ,.Ö..r& 000140
 80168904 75F73BDE 75C08500 00FFFF9A 51531373 02801E39 0675F738 C18ED38B .Æ.è;%u.9...s.SQ......åuß;%u.... 000160
 D3230B18 D12B0C74 DAF7D788 D67EC457 38E30C4E 8BEC8B55 00C3D188 04879202 .....ïù.U.ŝ.N.D8Wá~..a%Öt.+Ì.Ù#Æ 000180
 D1C38EFF FFC381C3 8C10E301 87AAF3C9 13A8F3E9 D1E08A0A 4688D12B D1870103 .Ì.Ì+Ì.F..ÀïÕµ¨.èµ´.ÏD..û.û...ùi 0001A0
 08750A5E 88D080BC 5E880846 8BEC8B55 CB5D0856 88064688 5FAAF3C9 13ABF3E9 Õµ¨.èµ´_.F..V.]ÙU.ŝ.F..^..Ä.^.u. 0001C0
 E58BD103 E3F70646 8BC8030C 66F70646 8BC888E3 F70008CA 5DE58BE3 F7064688 .F.%D.Ï]ò..%D.à.F.%f..à.F.%D.Ì.Ï 0001E0

Dump of file SATURN:[PCCOMMON.DUMP.DLL]PMFORM.TMP;1 on 18-APR-1990 10:49:29.19
File ID (798,38,0)   End of file block 72 / Allocated 72

Virtual block number 53 (00000035), 512 (0200) bytes

 8B157508 0A47F626 5575023C 03240A47 8A26065E C4F62B56 000004C8 0008CA5D ]ò..à...V+-ó^.&.G.$.<.ωU&-G..u.. 000000
 46890647 2B260788 26065E88 39740112 AE87F606 D868F9F7 000CB999 068A2DC3 ù-¤..¿..%ªkÄ.-.Ù..t9.^.&..&+G..F 000020
 FC463B08 C48316B2 0E6E9A50 E42A0847 8A260677 FF260877 FF265028 7EC008FC •.à-(P&.w.&.w.&.G.*ðP.n.ý..ó.;F• 000040
 26025789 26078926 08578B26 06478B26 065EC4FF FFBE200A 4F802606 5EC40B74 t.ó^.&.O. ƒ..ó^.&.G.&.W.&..&.W.& 000060
 10F80103 00050002 11300103 00000004 184B0002 000CCBC9 5EC68B00 000447C7 úG....ó^èù....H.......0.......%. 000080
 17610103 00220002 17160103 04C30000 0F8A0203 00000006 16320002 00070002 ......2.......¤...ù.......".... a. 0000A0
 0CA60103 00400002 107A0103 003A0002 0E9A0103 00880002 17AB0105 00260002 ..&...¨..............:...z...M...Ì. 0000C0
 54206E75 5220534D 00000000 00000000 00000000 005C0002 0C930103 005B0002 ..[.......\............MS Run-T 0000E0
 38383931 20296328 20746867 69727970 6F43202D 20797261 7262694C 20656069 ime Library - Copyright (c) 1988 000100
 000000FB 00FA00F9 00FC00FE 00800011 70726F43 2074666F 736F7263 694D202C , Microsoft Corp....±.•.ª.ª.«... 000120
 00800000 00000000 00000000 00F300F2 00F100F4 00F60080 00000000 00000000 ..........–.¶.þ.·.µ............. 000140
 00E900EA 00EB00EC 00EE0080 00000000 00000000 00000001 00020003 00040006 ø.Â.Æ.@.Ì.............Ÿ.ŝ.Š.ô.Ô. 000160
 00000000 00000000 0000000E 000F00E0 000900DB 00800000 00000000 00000000 ............Ü.Ì.Å.Ô.8........... 000180
 6F4D2073 7365636F 72500000 00000000 00000000 00C900CA 00CB00CC 00CE0080 ..ö.ä.ù.þ.è...........Process Mo 0001A0
 73756220 676E6974 61647055 0000006C 65646F4D 20737365 636F7250 006C6564 del.Process Model...Updating bus 0001C0
 66206A62 6F207379 7320676E 69746164 70550000 004D5020 726F6620 6A626F20  obj for PM...Updating sys obj f 0001E0

Dump of file SATURN:[PCCOMMON.DUMP.DLL]PMFORM.TMP;1 on 18-APR-1990 10:49:29.19
File ID (798,38,0)   End of file block 72 / Allocated 72

Virtual block number 54 (00000036), 512 (0200) bytes

 726F6620 6E787420 74726174 53004453 206E6120 676E6964 6441004D 5020726F or PM.Adding an SD.Start txn for 000000
 00445320 6E612067 6E697465 6C654400 656D616E 20445320 6563616C 70657220  replace SD name.Deleting an SD. 000020
 616C7065 7220726F 66206E78 74207472 61745300 5250206E 6120676E 69646441 Adding an PR.Start txn for reple 000040
 734D5020 52500052 50206E61 20676E69 74656C65 44006560 616E2052 50206563 ce PR name.Deleting an PR.PR PMs 000060
 66207825 203A5250 00646C65 69467972 6575516C 6D442060 6F726620 7825203A : %x from DmlQueryField.PR: %x f 000080
 6D44206D 6F726620 7825203A 73534920 4D500065 74656C65 446C6044 20606F72 rom DmlDelete.PM ISs: %x from Dm 0000A0
 6575516C 6D44206D 6F726620 7825203A 73534920 4D50006E 6C527972 6575516C lQueryRln.PM ISs: %x from DmlQue 0000C0
 66206E78 74207472 61745300 5349206E 6120676E 69646441 00646C65 69467972 ryField.Adding an IS.Start txn f 0000E0
 49206E61 20676E69 74656C65 4400656D 616E2053 49206563 616C7065 7220726F or replace IS name.Deleting an I 000100
 00646C65 69467972 6575516C 6D44206D 6F726620 7825203A 734D5020 53490053 S.IS PMs: %x from DmlQueryField. 000120
 2800296C 6C756E28 00000065 74656C65 446C6044 20606F72 66207825 203A5349 IS: %x from DmlDelete...(null).( 000140
 00000000 00001AFA 1D701113 1D701D70 00000000 00002320 202B0029 6C6C756E null).+- #......p.p...p.ª....... 000160
 00000000 00000000 00000000 00000000 00000000 00000000 00000000 00000000 ................................ 000180
 00000000 00000000 00000000 00000000 00000000 00000000 00000000 00000000 ................................ 0001A0
 00000000 00000000 00000000 00000000 00000000 00000000 00000000 00000000 ................................ 0001C0
 00000000 00000000 00000000 00000000 00000000 00000000 00000000 00000000 ................................ 0001E0
```

```
Dump of file SATURN:[PCCOMMON.DUMP.DLL]PMFORM.TMP;1 on 18-APR-1990 10:49:29.19
File ID (798,38,0)    End of file block 72 / Allocated 72

Virtual block number 55 (00000037), 512 (0200) bytes

00000000 00000000 00000000 00000000 00000000 00000000 00000000 00000000 ................................ 000000
00000000 00000000 00000000 00000000 00000000 00000000 00000000 00000000 ................................ 000020
00000000 00000000 00000000 00000000 00000000 00000000 00000000 00000000 ................................ 000040
00000000 00000000 00000000 00000000 00000000 00000000 00000000 00000000 ................................ 000060
00000000 00000000 00000000 00000000 00000000 00000000 00000000 00000000 ................................ 000080
00000000 00000000 00000000 00000000 00000000 00000000 00000000 00000000 ................................ 0000A0
00000000 00000000 00000000 00000000 00000000 00000000 00000000 00000000 ................................ 0000C0
00000000 00000000 00000000 00000000 00000000 00000000 00000000 00000000 ................................ 0000E0
00000000 00000000 00000000 00000000 00000000 00000000 00000000 00000000 ................................ 000100
00000000 00000000 00000000 00000000 00000000 00000000 00000000 00000000 ................................ 000120
00000000 00000000 00000000 00000000 00000000 00000000 00000000 00000000 ................................ 000140
00000000 00000000 00000000 00000000 00000000 00000000 00000000 00000000 ................................ 000160
00000000 00000000 00000000 00000000 00000000 00000000 00000000 00000000 ................................ 000180
00000000 00000000 00000000 00000000 00000000 00000000 00000000 00000000 ................................ 0001A0
00000000 00000000 00000000 00000000 00000000 00000000 00000000 00000000 ................................ 0001C0
00000000 00000000 00000000 00000000 00000000 00000000 00000000 00000000 ................................ 0001E0

Dump of file SATURN:[PCCOMMON.DUMP.DLL]PMFORM.TMP;1 on 18-APR-1990 10:49:29.19
File ID (798,38,0)    End of file block 72 / Allocated 72

Virtual block number 56 (00000038), 512 (0200) bytes

00000000 00000000 00000000 00000000 00000000 00000000 00000000 00000000 ................................ 000000
00000000 00000000 00000000 00000000 00000000 00000000 00000000 00000000 ................................ 000020
00000000 00000000 00000000 00000000 00000000 00000000 00000000 00000000 ................................ 000040
00000000 00000000 00000000 00000000 00000000 00000000 00000000 00000000 ................................ 000060
00000000 00000000 00000000 00000000 00000000 00000000 00000000 00000000 ................................ 000080
00000000 00000000 00000000 00000000 00000000 00000000 00000000 00000000 ................................ 0000A0
00000000 00000000 00000000 00000000 00000000 00000000 00000000 00000000 ................................ 0000C0
00000000 00000000 00000000 00000000 00000000 00000000 00000000 00000000 ................................ 0000E0
00000000 00000000 00000000 00000000 00000000 00000000 00000000 00000000 ................................ 000100
00000000 00000000 00000000 00000000 00000000 00000000 00000000 00000000 ................................ 000120
00000000 00000000 00000000 00000000 00000000 00000000 00000000 00000000 ................................ 000140
5F454C49 465F435F 02860000 00000000 00000000 00000000 00000000 00000000 .........................C_FILE_ 000160
000006A8 125E06A4 125E06A0 125E069C 125EFFFF 125E0000 0000003D 4F464E49 INFO=.....^...^...^...^.E.x.'... 000180
00000000 00000000 00000001 1AF80000 000006C2 00000200 FFFFFFFF 01010000 ...........ô.....½.............. 0001A0
00000000 00000000 00000000 00000000 00000202 00000000 00000000 00000102 ................................ 0001C0
00000000 00000000 00000000 00000000 00000000 00000000 00000000 00000000 ................................ 0001E0

Dump of file SATURN:[PCCOMMON.DUMP.DLL]PMFORM.TMP;1 on 18-APR-1990 10:49:29.19
File ID (798,38,0)    End of file block 72 / Allocated 72

Virtual block number 57 (00000039), 512 (0200) bytes

00000000 00000000 00000000 00000000 00000000 00000000 00000000 00000000 ................................ 000000
00000000 00000000 00000000 00000000 00000000 00000000 00000000 00000000 ................................ 000020
00000000 00000000 00000000 00000000 00000000 00000000 00000000 00000000 ................................ 000040
00000000 00000000 00000000 00000000 00000000 00000000 00000000 00000000 ................................ 000060
00000000 00000000 00000000 00000000 00000000 00000000 00000000 00000000 ................................ 000080
00000000 00000000 00000000 00000000 00000000 00000000 00000000 00000000 ................................ 0000A0
00000000 00000000 00000000 00000000 00000000 00000000 00000000 00000000 ................................ 0000C0
00000000 00000000 00000000 00000000 00000000 00000000 00000000 00000000 ................................ 0000E0
00000000 00000000 00000000 00000000 00000000 00000000 00000000 00000000 ................................ 000100
00000000 00000000 00000000 00000000 00000000 00000000 00000000 00000000 ................................ 000120
00000000 00000000 00000000 00000000 00000000 00000000 00000000 00000000 ................................ 000140
00000000 00000000 00000000 00000000 00000000 00000000 00000000 00000000 ................................ 000160
00000000 00000000 00000000 00000000 00000000 00000000 00000000 00000000 ................................ 000180
00000000 00000000 00000000 00000000 00000000 00000000 00000000 00000000 ................................ 0001A0
00000000 00000000 00000000 00000000 00000000 00000000 00000000 00000000 ................................ 0001C0
00000000 00000000 00000000 00000000 00000000 00000000 00000000 00000000 ................................ 0001E0
```

```
Dump of file SATURN:[PCCOMMON.DUMP.DLL]PMFORM.TMP;1 on 18-APR-1990 10:49:29.19
File ID (798,38,0)    End of file block 72 / Allocated 72

Virtual block number 58 (0000003A), 512 (0200) bytes

00000000 00000000 00000000 00000000 00000000 00000000 00000000 00000000 ................................ 000000
00000000 00000000 00000000 00000000 00000000 00000000 00000000 00000000 ................................ 000020
00000000 00000000 00000000 00000000 00000000 00000000 00000000 00000000 ................................ 000040
00000000 00000000 00000000 00000000 00000000 00000000 00000000 00000000 ................................ 000060
00000000 00000000 00000000 00000000 00000000 00000000 00000000 00000000 ................................ 000080
00000000 00000000 00000000 00000000 00000000 00000000 00000000 00000000 ................................ 0000A0
00000000 00000000 00000000 00000000 00000000 00000000 00000000 00000000 ................................ 0000C0
00000000 00000000 00000000 00000000 00000000 00000000 00000000 00000000 ................................ 0000E0
00000000 00000000 00000000 00000000 00000000 00000000 00000000 00000000 ................................ 000100
00000000 00000000 00000000 00000000 00000000 00000000 00000000 00000000 ................................ 000120
00000000 00000000 00000000 00000000 00000000 00000000 00000000 00000000 ................................ 000140
00000000 00000000 00000000 00000000 00000000 00000000 00000000 00000000 ................................ 000160
00000000 00000000 00000000 00000000 00000000 00000000 00000000 00000000 ................................ 000180
00000000 00000000 00000000 00000000 00000000 00000000 00000000 00000000 ................................ 0001A0
00000000 00000000 00000000 00000000 00000000 00000000 00000000 00000000 ................................ 0001C0
00000000 00000000 00000000 00000000 00000000 00000000 00000000 00000000 ................................ 0001E0

Dump of file SATURN:[PCCOMMON.DUMP.DLL]PMFORM.TMP;1 on 18-APR-1990 10:49:29.19
File ID (798,38,0)    End of file block 72 / Allocated 72

Virtual block number 59 (0000003B), 512 (0200) bytes

00000000 00000000 00000000 00000000 00000000 00000000 00000000 00000000 ................................ 000000
00000000 00000000 00000000 00000000 00000000 00000000 00000000 00000000 ................................ 000020
00000000 00000000 00000000 00000000 00000000 00000000 00000000 00000000 ................................ 000040
00000000 00000000 00000000 00000000 00000000 00000000 00000000 00000000 ................................ 000060
00000000 00000000 00000000 00000000 00000000 00000000 00000000 00000000 ................................ 000080
00000000 00000000 00000000 00000000 00000000 00000000 00000000 00000000 ................................ 0000A0
00000000 00000000 00000000 00000000 00000000 00000000 00000000 00000000 ................................ 0000C0
00000000 00000000 00000000 00000000 00000000 00000000 00000000 00000000 ................................ 0000E0
00000000 00000000 00000000 00000000 00000000 00000000 00000000 00000000 ................................ 000100
00000000 00000000 00000000 00000000 00000000 00000000 00000000 00000000 ................................ 000120
00000000 00000000 00000000 00000000 00000000 00000000 00000000 00000000 ................................ 000140
00000000 00000000 00000000 00000000 00000000 00000000 00000000 00000000 ................................ 000160
00000000 00000000 00000000 00000000 00000000 00000000 00000000 00000000 ................................ 000180
00000000 00000000 00000000 00000000 00000000 00000000 00000000 00000000 ................................ 0001A0
00000000 00000000 00000000 00000000 00000000 00000000 00000000 00000000 ................................ 0001C0
00000000 00000000 00000000 00000000 00000000 00000000 00000000 00000000 ................................ 0001E0

Dump of file SATURN:[PCCOMMON.DUMP.DLL]PMFORM.TMP;1 on 18-APR-1990 10:49:29.19
File ID (798,38,0)    End of file block 72 / Allocated 72

Virtual block number 60 (0000003C), 512 (0200) bytes

00000000 00000000 00000000 00000000 00000000 00000000 00000000 00000000 ................................ 000000
00000000 00000000 00000000 00000000 00000000 00000000 00000000 00000000 ................................ 000020
00000000 00000000 00000000 00000000 00000000 00000000 00000000 00000000 ................................ 000040
00000000 00000000 00000000 00000000 00000000 00000000 00000000 00000000 ................................ 000060
00000000 00000000 00000000 00000000 00000000 00000000 00000000 00000000 ................................ 000080
00000000 00000000 00000000 00000000 00000000 00000000 00000000 00000000 ................................ 0000A0
00000000 00000000 00000000 00000000 00000000 00000000 00000000 00000000 ................................ 0000C0
00000000 00000000 00000000 00000000 00000000 00000000 00000000 00000000 ................................ 0000E0
00000000 00000000 00000000 00000000 00000000 00000000 00000000 00000000 ................................ 000100
00000000 00000000 00000000 00000000 00000000 00000000 00000000 00000000 ................................ 000120
00000000 00000000 00000000 00000000 00000000 00000000 00000000 00000000 ................................ 000140
00000000 00000000 00000000 00000000 00000000 00000000 00000000 00000000 ................................ 000160
00000000 00000000 00000000 00000000 00000000 00000000 00000000 00000000 ................................ 000180
00000000 00000000 00000000 00000000 00000000 00000000 00000000 00000000 ................................ 0001A0
00000000 00000000 00000000 00000000 00000000 00000000 00000000 00000000 ................................ 0001C0
00000000 00000000 00000000 00000000 00000000 00000000 00000000 00000000 ................................ 0001E0
```

```
Dump of file SATURN:[PCCOMMON.DUMP.DLL]PMFORM.TMP;1 on 18-APR-1990 10:49:29.19
File ID (798,38,0)   End of file block 72 / Allocated 72

Virtual block number 61 (0000003D), 512 (0200) bytes

00000000 00000000 00000000 00000000 00000000 00000000 00000000 00000000 ................................ 000000
00000000 00000000 00000000 00000000 00000000 00000000 00000000 00000000 ................................ 000020
00000000 00000000 00000000 00000000 00000000 00000000 00000000 00000000 ................................ 000040
00000000 00000000 00000000 00000000 00000000 00000000 00000000 00000000 ................................ 000060
00000000 00000000 00000000 00000000 00000000 00000000 00000000 00000000 ................................ 000080
00000000 00000000 00000000 00000000 00000000 00000000 00000000 00000000 ................................ 0000A0
00000000 00000000 00000000 00000000 00000000 00000000 00000000 00000000 ................................ 0000C0
00000000 00000000 00000000 00000000 00000000 00000000 00000000 00000000 ................................ 0000E0
00000000 00000000 00000000 00000000 00000000 00000000 00000000 00000000 ................................ 000100
00000000 00000000 00000000 00000000 00000000 00000000 00000000 00000000 ................................ 000120
00000000 00000000 00000000 00000000 00000000 00000000 00000000 00000000 ................................ 000140
00000000 00000000 00000000 00000000 00000000 00000000 00000000 00000000 ................................ 000160
00000000 00000000 00000000 00000000 00000000 00000000 00000000 00000000 ................................ 000180
00000000 00000000 00000000 00000000 00000000 00000000 00000000 00000000 ................................ 0001A0
00000000 00000000 00000000 00000000 00000000 00000000 00000000 00000000 ................................ 0001C0
00000000 00000000 00000000 00000000 00000000 00000000 00000000 00000000 ................................ 0001E0

Dump of file SATURN:[PCCOMMON.DUMP.DLL]PMFORM.TMP;1 on 18-APR-1990 10:49:29.19
File ID (798,38,0)   End of file block 72 / Allocated 72

Virtual block number 62 (0000003E), 512 (0200) bytes

00000000 00000000 00000000 00000000 00000000 00000000 00000000 00000000 ................................ 000000
00000000 00000000 00000000 00000000 00000000 00000000 00000000 00000000 ................................ 000020
00000000 00000000 00000000 00000000 00000000 00000000 00000000 00000000 ................................ 000040
00000000 00000000 00000000 00000000 00000000 00000000 00000000 00000000 ................................ 000060
00000000 00000000 00000000 00000000 00000000 00000000 00000000 00000000 ................................ 000080
00000000 00000000 00000000 00000000 00000000 00000000 00000000 00000000 ................................ 0000A0
00000000 00000000 00000000 00000000 00000000 00000000 00000000 00000000 ................................ 0000C0
00000000 00000000 00000000 00000000 00000000 00000000 00000000 00000000 ................................ 0000E0
00000000 00000000 00000000 00000000 00000000 00000000 00000000 00000000 ................................ 000100
00000000 00000000 00000000 00000000 00000000 00000000 00000000 00000000 ................................ 000120
00000000 00000000 00000000 00000000 00000000 00000000 00000000 00000000 ................................ 000140
00010000 00000000 00000000 00000000 00000000 00000000 00000000 00000000 ................................ 000160
00000000 00000000 00000000 00000000 00000000 00000000 00000000 00000200 ................................ 000180
00000000 00000000 00000000 00000000 00000000 00000000 00000000 00000000 ................................ 0001A0
00000000 00000000 00000000 00000000 00000000 00000000 00000000 00000000 ................................ 0001C0
00000000 00000000 00000000 00000000 00000000 00000000 00000000 00000000 ................................ 0001E0

Dump of file SATURN:[PCCOMMON.DUMP.DLL]PMFORM.TMP;1 on 18-APR-1990 10:49:29.19
File ID (798,38,0)   End of file block 72 / Allocated 72

Virtual block number 63 (0000003F), 512 (0200) bytes

00000000 00000000 00000000 00000000 00000000 00000000 00000000 00000000 ................................ 000000
00000000 00000000 00000000 00000000 00000000 00000000 00000000 00000000 ................................ 000020
00000000 00000000 00000000 00000000 00000000 00000000 00000000 00000000 ................................ 000040
00000000 00000000 00000000 00000000 00000000 00000000 00000000 00000000 ................................ 000060
00000000 00000000 00000000 00000000 00000000 00000000 00000000 00000000 ................................ 000080
00000000 00000000 00000000 00000000 00000000 00000000 00000000 00000000 ................................ 0000A0
00000000 00000000 00000000 00000000 00000000 00000000 00000000 00000000 ................................ 0000C0
00000000 00000000 00000000 00000000 00000000 00000000 00000000 00000000 ................................ 0000E0
00000000 00000000 00000000 00000000 00000000 00000000 00000000 00000000 ................................ 000100
00000000 00000000 00000000 00000000 00000000 00000000 00000000 00000000 ................................ 000120
00000000 00000000 00000000 00000000 00000000 00000000 00000000 00000000 ................................ 000140
00000000 00000000 00000000 00000000 00000000 00000000 00000000 00000000 ................................ 000160
00000000 00000000 00000000 00000000 00000000 00000000 00000000 00000000 ................................ 000180
00000000 00000000 00000000 00000000 00000000 00000000 00000000 00000000 ................................ 0001A0
00000000 00000000 00000000 00000000 00000000 00000000 00000000 00000000 ................................ 0001C0
00000000 00000000 00000000 00000000 00000000 00000000 00000000 00000000 ................................ 0001E0
```

```
Dump of file SATURN:[PCCOMMON.DUMP.DLL]PMFORM.TMP;1 on 18-APR-1990 10:49:29.19
File ID (798,38,0)   End of file block 72 / Allocated 72

Virtual block number 64 (00000040), 512 (0200) bytes

00000000 00000000 00000000 00000000 00000000 00000000 00000000 00000000 ................................ 000000
00000000 00000000 00000000 00000000 00000000 00000000 00000000 00000000 ................................ 000020
00000000 00000000 00000000 00000000 00000000 00000000 00000000 00000000 ................................ 000040
00000000 00000000 00000000 00000000 00000000 00000000 00000000 00000000 ................................ 000060
00000000 00000000 00000000 00000000 00000000 00000000 00000000 00000000 ................................ 000080
00000000 00000000 00000000 00000000 00000000 00000000 00000000 00000000 ................................ 0000A0
00000000 00000000 00000000 00000000 00000000 00000000 00000000 00000000 ................................ 0000C0
00000000 00000000 00000000 00000000 00000000 00000000 00000000 00000000 ................................ 0000E0
00000000 00000000 00000000 00000000 00000000 00000000 00000000 00000000 ................................ 000100
00000000 00000000 00000000 00000000 00000000 00000000 00000000 00000000 ................................ 000120
00000000 00000000 00000000 00000000 00000000 00000000 00000000 00000000 ................................ 000140
00000000 00000000 00000000 00000000 00000000 00000000 00000000 00000000 ................................ 000160
00000000 00000000 00000000 00000000 00000000 00000000 00000000 00000000 ................................ 000180
00000000 00000000 00000000 00000000 00000000 00000000 00000000 00000000 ................................ 0001A0
00000000 00000000 00000000 00000000 00000000 00000000 00000000 00000000 ................................ 0001C0
00000000 00000000 00000000 00000000 00000000 00000000 00000000 00000000 ................................ 0001E0

Dump of file SATURN:[PCCOMMON.DUMP.DLL]PMFORM.TMP;1 on 18-APR-1990 10:49:29.19
File ID (798,38,0)   End of file block 72 / Allocated 72

Virtual block number 65 (00000041), 512 (0200) bytes

00000000 00000000 00000000 00000000 00000000 00000000 00000000 00000000 ................................ 000000
00000000 00000000 00000000 00000000 00000000 00000000 00000000 00000000 ................................ 000020
00000000 00000000 00000000 00000000 00000000 00000000 00000000 00000000 ................................ 000040
00000000 00000000 00000000 00000000 00000000 00000000 00000000 00000000 ................................ 000060
00000000 00000000 00000000 00000000 00000000 00000000 00000000 00000000 ................................ 000080
00000000 00000000 00000000 00000000 00000000 00000000 00000000 00000000 ................................ 0000A0
00000000 00000000 00000000 00000000 00000000 00000000 00000000 00000000 ................................ 0000C0
00000000 00000000 00000000 00000000 00000000 00000000 00000000 00000000 ................................ 0000E0
00000000 00000000 00000000 00000000 00000000 00000000 00000000 00000000 ................................ 000100
00000000 00000000 00000000 00000000 00000000 00000000 00000000 00000000 ................................ 000120
00000000 00000000 00000000 00000000 00000000 00000000 00000000 00000000 ................................ 000140
00000000 00000000 00000000 00000000 00000000 00000000 00000000 00000000 ................................ 000160
00000000 028812A2 00000000 00000000 00000000 00000000 00000000 00000000 ........................Å....... 000180
00000000 00000000 00000000 00008181 81010000 00010000 00000000 00000000 ........................  ...... 0001A0
00000000 00000000 00000000 00000000 00000000 00000000 00000000 00000000 ............................ .... 0001C0
00000000 00000000 00000000 00000000 00000000 00000000 00000000 00000000 ................................ 0001E0

Dump of file SATURN:[PCCOMMON.DUMP.DLL]PMFORM.TMP;1 on 18-APR-1990 10:49:29.19
File ID (798,38,0)   End of file block 72 / Allocated 72

Virtual block number 66 (00000042), 512 (0200) bytes

00000000 00000000 00000000 00000000 00000000 00000000 00000000 00000000 ................................ 000000
00000000 00000000 00000000 00000000 00000000 00000000 00000000 00000000 ................................ 000020
00000000 00000000 00000000 00000000 00000000 00000000 00000000 00000000 ................................ 000040
00000000 00000000 00000000 00000000 00000000 00000000 00000000 00000000 ................................ 000060
00000000 00000000 00000000 00000000 00000000 00000000 00000000 00000000 ................................ 000080
0A0A0A0A 0A0A0A0A 0A0A0A0A 0A0A0A0A 0A000000 00000000 00000000 00000000 ................................ 0000A0
0A0A0A0A 0A0A0A0A 0A0A0A0A 0A0A0A0A 0A0A0A0A 0A0A0A0A 0A0A0A0A 0A0A0A0A ................................ 0000C0
0A0A0A0A 0A0A0A0A 0A0A0A0A 0A0A0A0A 0A0A0A0A 0A0A0A0A 0A0A0A0A 0A0A0A0A ................................ 0000E0
0A0A0A0A 0A0A0A0A 0A0A0A0A 0A0A0A0A 0A0A0A0A 0A0A0A0A 0A0A0A0A 0A0A0A0A ................................ 000100
0A0A0A0A 0A0A0A0A 0A0A0A0A 0A0A0A0A 0A0A0A0A 0A0A0A0A 0A0A0A0A 0A0A0A0A ................................ 000120
0A0A0A0A 0A0A0A0A 0A0A0A0A 0A0A0A0A 0A0A0A0A 0A0A0A0A 0A0A0A0A 0A0A0A0A ................................ 000140
0A0A0A0A 0A0A0A0A 0A0A0A0A 0A0A0A0A 0A0A0A0A 0A0A0A0A 0A0A0A0A 0A0A0A0A ................................ 000160
0A0A0A0A 0A0A0A0A 0A0A0A0A 0A0A0A0A 0A0A0A0A 0A0A0A0A 0A0A0A0A 0A0A0A0A ................................ 000180
00000000 00000000 00000000 00000000 000A0A0A 0A0A0A0A 0A0A0A0A 0A0A0A0A ................................ 0001A0
00000000 00000000 00000000 20000000 00000000 00000000 00000000 00000000 ...................  ........... 0001C0
7320200A 0D303030 36520000 3E3E4753 4D4E3C3C FFFFFFFF 06AC14C4 00000000 ....Å.¯.....<<NMSG>>..R6000..- s 0001E0
```

Dump of file SATURN:[PCCOMMON.DUMP.DLL]PMFORM.TMP;1 on 18-APR-1990 10:49:29.19
File ID (798,38,0)   End of file block 72 / Allocated 72

Virtual block number 67 (00000043), 512 (0200) bytes

```
6765746E 6920200A 00333030 36520003 000A0077 6F6C6672 65766F20 68636174 tack overflow.....R6003..- integ 000000
20746F6E 20200A00 38303036 52000800 0A003020 79622065 64697669 64207265 er divide by 0.....R6008..- not  000020
52000900 0A007374 6E656075 67726120 726F6620 65636170 73206867 756F6E65 enough space for arguments.....R 000040
766E6520 726F6620 65636170 73206867 756F6E65 20746F6E 20200A00 39303036 6009..- not enough space for env 000060
726F7272 6520656D 6974206E 757200FF 000A0D00 FC000A0D 746E656D 6E6F7269 ironment...•......run-time error 000080
20746F6E 20746E69 6F702067 6E697461 6F6C6620 200A0032 30303652 00020020  ...R6002..- floating point not  0000A0
00020000 0005068C 00020000 00041AF6 00020003 FFFFFF00 0A006465 64616F6C loaded..........−.......¥....... 0000C0
00000000 FFFF0001 000E0352 00000A04 00000000 00000000 00000000 000618AA ˆ..................R........... 0000E0
00000000 0807FFFF 00C80397 00FAFFE4 00809400 00900806 00000001 00000043 C...............ô.•...à......... 000100
00000000 0000FFFF FFFF0108 000A002F 03880005 80020002 08080006 00030000 ................/............... 000120
00060000 00000000 FFFFFFFF 01040008 0060037E 00058001 00010812 00050005 ...........−.‵.................. 000140
000F0005 00000000 0000FFFF FFFF0103 000800EC 03720007 8002000C 08180000 ..........r.š................... 000160
08290000 00070000 00000000 FFFFFFFF 00E60008 00800360 00058001 00010819 ........‵.....ĺ...............). 000180
0001082A 000C0005 00000000 0000FFFF FFFF00E5 001400EC 03480007 80020008 ......H.š...í...............*... 0001A0
80020008 08370000 00070000 00000000 FFFFFFFF 00E70008 00600336 00058001 ....6.‵...ó...............7..... 0001C0
00058000 00010838 000C0005 00000000 0000FFFF FFFF00E8 001400EC 031E0007 ....š...ò...............8....... 0001E0
```

Dump of file SATURN:[PCCOMMON.DUMP.DLL]PMFORM.TMP;1 on 18-APR-1990 10:49:29.19
File ID (798,38,0)   End of file block 72 / Allocated 72

Virtual block number 68 (00000044), 512 (0200) bytes

```
02DC0007 80020027 08450000 000A0000 00000000 FFFFFFFF 01020008 0060030C ..‵...................E.′.....É. 000000
006002CA 00058001 00010846 00080005 00000000 0000FFFF FFFF0101 002C00EC š.,..................F.......ò.‵. 000020
000800C1 028E0007 8002000C 084F0000 00060000 00000000 FFFFFFFF 00FF0008 ...................O......ƒ.è... 000040
00FD0008 00600282 00058001 00010850 00090005 00000000 0000FFFF FFFF00FE ±...............P.......ý.‵...». 000060
FFFF00FC 003000C5 02800005 80020008 085A0000 00070000 00000000 FFFFFFFF ...............Z.........é.0.•... 000080
FFFFFFFF 00F9000C 002702A4 00CF8002 04000858 00030003 00000000 0000FFFF ...........[.....ü.Ê.′...•...... 0000A0
0000FFFF FFFF00FA 000C0026 029200CF 80020000 085F0007 00030000 00000000 .........._.....ü...&...•....... 0000C0
00000000 FFFFFFFF 00F8000C 00260280 00CF8002 00000867 00060003 00000000 ........g.....ü...&...«......... 0000E0
00000000 0000FFFF FFFF00CF 000800A6 02700005 80010001 086E0008 00050000 ......n.......p.Ì...ü........... 000100
00050000 00000000 FFFFFFFF 00CE0008 00C10264 00078002 000C0877 00000006 ....w.......d.è...ö............. 000120
00000007 00000000 0000FFFF FFFF00CD 00080044 02580005 80010001 08780008 ..x.......X.D...ë............... 000140
08820003 00030000 00000000 FFFFFFFF 00CC0030 00C50226 00058002 00080881 ........&.é.0.ä................. 000160
00000886 00070003 00000000 0000FFFF FFFF00CB 000C0026 024A00CF 80020000 ....ü.J.&...ù................... 000180
80020000 088E0006 00030000 00000000 FFFFFFFF 00CA000C 00260238 00CF8002 ..ü.8.&...ò..................... 0001A0
00058000 00010895 001F0005 00000000 0000FFFF FFFF00C9 000C0026 022600CF ü.&.&...è....................... 0001C0
01E60007 80020027 08850000 000A0000 00000000 FFFFFFFF 00E40008 00F00216 ..Þ...ð...............ç.′.....Ì. 0001E0
```

Dump of file SATURN:[PCCOMMON.DUMP.DLL]PMFORM.TMP;1 on 18-APR-1990 10:49:29.19
File ID (798,38,0)   End of file block 72 / Allocated 72

Virtual block number 69 (00000045), 512 (0200) bytes

```
000E0104 00058000 00010886 001D0005 00000000 0000FFFF FFFF00E3 002C00EC š.,.D...............Ñ.......å.ß. 000000
002C00EC 01A40007 80020027 08D40000 000A0000 00000000 FFFFFFFF 00E20008 ..ä...............å.′.....Ê.š.,. 000020
00EF0008 008C0192 00058001 00010805 00000005 00000000 0000FFFF FFFF00E1 Ã...............í..............ÿ. 000040
FFFF00EE 000800C1 01860007 8002000C 08E30000 00060000 00000000 FFFFFFFF ..............D.........ê...Ÿ... 000060
FFFFFFFF 00ED0008 008C017A 00058001 000108E4 000F0005 00000000 0000FFFF .............ô.......z.....Ú..... 000080
0000FFFF FFFF00EC 003000C5 01480005 80020008 08F40000 00070000 00000000 ..........¶.......H.é.0.š....... 0000A0
00000000 FFFFFFFF 00E8000C 0026016C 00CF8002 000008F5 00030003 00000000 ........%.....Ü.l.&...Š......... 0000C0
00000000 0000FFFF FFFF00EA 000C0026 015A00CF 80020000 08F90007 00030000 ......•.....Ü.Z.&...õ........... 0000E0
00050000 00000000 FFFFFFFF 00E9000C 00260148 00CF8002 00000901 00060003 ..........Ü.H.&...Õ............. 000100
00000006 00000000 0000FFFF FFFF00DC 0008008A 01380005 80010001 09080012 ..........8.....É............... 000120
091C0013 00050000 00000000 FFFFFFFF 00080008 00C1012C 00078002 000C0918 ........,.ě...Ü................. 000140
00080930 00000007 00000000 0000FFFF FFFF000A 00080059 01200005 80010001 ...... .Y...Ö...............0... 000160
80020000 09310003 00030000 00000000 FFFFFFFF 00090030 00C500EE 00058002 ....Ÿ.é.0.)...............1..... 000180
00CF8002 00000935 00070003 00000000 0000FFFF FFFF00E0 000C0026 011200CF ü...&...Á...............5.....ü. 0001A0
00EE00CF 80020000 09300006 00030000 00000000 FFFFFFFF 00DF000C 00260100 ..&...Ô...............=.....ü.Ÿ. 0001C0
008C000E 00058001 00010944 00130005 00000000 0000FFFF FFFF000E 000C0026 &...ß...............D.......ß... 0001E0
```

```
Dump of file SATURN:[PCCOMMON.DUMP.DLL]PMFORM.TMP;1 on 18-APR-1990 10:49:29.19
File ID (798,38,0)   End of file block 72 / Allocated 72

Virtual block number 70 (00000046), 512 (0200) bytes

000800C1 00D20007 8002000C 09580000 00060000 00000000 FFFFFFFF 00070008 ..ø..............X.......ø.ê... 000000
00D50008 005E00C6 00058001 00010959 00140005 00000000 0000FFFF FFFF0006 ø...............Y.......6.^...Í. 000020
FFFF0004 003000C5 00940005 80020008 096E0000 00070000 00000000 FFFFFFFF ...............n..........é.0.å... 000040
FFFFFFFF 00D3000C 002600B8 00CF8002 0000096F 00030003 00000000 0000FFFF ............o.....ü.|.&...Æ..... 000060
0000FFFF FFFF0002 000C0026 00A600CF 80020000 09730007 00030000 00000000 ..........s.....ü.Ï.&...ø....... 000080
00000000 FFFFFFFF 0001000C 00260094 00CF8002 0000097B 00060003 00000000 ........(.....ü...&...Í......... 0000A0
00000000 0000FFFF FFFF00F7 00080060 00840005 80010001 09820005 00050000 ...............'...Ä............ 0000C0
00050000 00000000 FFFFFFFF 00F60008 00C10078 00078002 000C0988 00000006 ...........x.ê...-.............. 0000E0
00000007 00000000 0000FFFF FFFF00F5 00080060 006C0005 80010001 09890006 ..........Í.'...Ä............... 000100
09910003 00030000 00000000 FFFFFFFF 00F40030 00C5003A 00058002 00080990 ........:.é.0.¶................. 000120
00000995 00070003 00000000 0000FFFF FFFF00F1 000C0026 005E00CF 80020400 ....ü.^.&...þ................... 000140
80020000 09900006 00030000 00000000 FFFFFFFF 00F2000C 0026004C 00CF8002 ..ü.L.&...'..................... 000160
00058000 000209A4 00100005 00000000 0000FFFF FFFF00F3 000C0026 003A00CF ü.:.&...µ...............Ê....... 000180
00140038 80010001 09850007 00050000 00000000 FFFFFFFF 01050020 00F00005 ..b.-.................ç.....8... 0001A0
00370014 00788001 0001098D 00070005 00000000 0000FFFF FFFF009C 00080036 6....................§.....x...7. 0001C0
00080037 001400B8 80010001 09C50007 00050000 00000000 FFFFFFFF 00900008 ...................é.....|...7... 0001E0

Dump of file SATURN:[PCCOMMON.DUMP.DLL]PMFORM.TMP;1 on 18-APR-1990 10:49:29.19
File ID (798,38,0)   End of file block 72 / Allocated 72

Virtual block number 71 (00000047), 512 (0200) bytes

009F0008 00370009 00388001 000109CD 00070005 00000000 0000FFFF FFFF009E ................è.....8...7..... 000000
FFFF00A0 00080037 00090078 80010001 09D50007 00050000 00000000 FFFFFFFF ..............Í.....x...7....... 000020
FFFFFFFF 00A10008 00370009 00B88001 00010900 00070005 00000000 0000FFFF ..............Ï.....|...7...À... 000040
0000FFFF FFFF0108 00080032 001F0038 80010001 09E50004 00050000 00000000 ...........Í.....8...2.......... 000060
00000000 FFFFFFFF 01090008 001E001F 00788001 000109EA 00040005 00000000 ........õ.....x................. 000080
00000000 0000FFFF FFFF010A 0008001E 001F00B8 80010001 09EF0004 00050000 ......ÿ.....|................... 0000A0
00050000 00000000 FFFFFFFF 01060008 00280014 000A8001 000109F4 00070005 ....¶.........(................. 0000C0
63656C65 53000000 0000FFFF FFFF0107 00080028 0009000A 80010001 09FC0007 ..•.........(..............Selec 0000E0
20617461 442A0000 3A6C6564 6F6D2074 73796C61 6E412A00 003A6560 614E0074 t.Name:..*Analyst model:..*Data 000100
00003A60 796E6F6E 79530000 3A6E6F69 74706972 63736544 00003A6C 65646F60 model:..Description:..Synonym:.. 000120
654B0065 74656C65 44006563 616C7065 52006464 41000073 6D796E6F 6E79532A *Synonyms..Add.Replace.Delete.Ke 000140
65440065 63616C70 65520064 64410000 7364726F 77796548 00003A64 726F7779 yword:..Keywords..Add.Replace.De 000160
69746365 6A626F20 7373656E 69737562 20646574 6169636F 73734100 6574656C lete.Associated business objecti 000180
76697463 656A626F 20606574 73797320 64657461 69636F73 73410000 3A736576 ves:..Associated system objectiv 0001A0
7365636F 72702074 6F6F522A 00003A73 7365636F 72702074 6F6F5200 003A7365 es:..Root process:..*Root proces 0001C0
74616072 6F666E49 00657465 6C654400 6563616C 70655200 64644100 00736573 ses..Add.Replace.Delete.Informat 0001E0

Dump of file SATURN:[PCCOMMON.DUMP.DLL]PMFORM.TMP;1 on 18-APR-1990 10:49:29.19
File ID (798,38,0)   End of file block 72 / Allocated 72

Virtual block number 72 (00000048), 512 (0200) bytes

00736572 6F747320 6E6F6974 6160726F 666E492A 00003A65 726F7473 206E6F69 ion store:..*Information stores. 000000
69747365 642F6563 72756F53 00657465 6C654400 6563616C 70655200 64644100 .Add.Replace.Delete.Source/desti 000020
41000073 6E6F6974 616E6974 7365642F 65637275 6F532A00 003A6E6F 6974616E nation:..*Source/destinations..A 000040
00736574 6F4E2A00 003A6574 6F4E0065 74656C65 44006563 616C7065 52006464 dd.Replace.Delete.Note:..*Notes. 000060
6160726F 666E6920 72657355 00657465 6C654400 6563616C 70655200 64644100 .Add.Replace.Delete.User informa 000080
5F5F5F00 5F5F5F5F 5F5F5F00 5F5F5F5F 5F5F5F00 5F5F5F5F 5F5F5F00 6E6F6974 tion.______.______._______.___ 0000A0
55006560 69540065 74614400 5F5F5F5F 5F5F5F00 5F5F5F5F 5F5F5F00 5F5F5F5F ___.______.______.Date.Time.U 0000C0
00000000 00000000 00000000 00646574 61647055 00646574 61657243 00726573 ser.Created.Updated............. 0000E0
00000000 00000000 00000000 00000000 00000000 00000000 00000000 00000000 ................................ 000100
00000000 00000000 00000000 00000000 00000000 00000000 00000000 00000000 ................................ 000120
00000000 00000000 00000000 00000000 00000000 00000000 00000000 00000000 ................................ 000140
00000000 00000000 00000000 00000000 00000000 00000000 00000000 00000000 ................................ 000160
00000000 00000000 00000000 00000000 00000000 00000000 00000000 00000000 ................................ 000180
00000000 00000000 00000000 00000000 00000000 00000000 00000000 00000000 ................................ 0001A0
00000000 00000000 00000000 00000000 00000000 00000000 00000000 00000000 ................................ 0001C0
00000000 00000000 00000000 00000000 00000000 00000000 00000000 00000000 ................................ 0001E0
```

```
Dump of file SATURN:[PCCOMMON.DUMP.PBIN]PLOW_OFF.CMD;1 on 18-APR-1990 10:54:57.71
File ID (1025,20,0)   End of file block 1 / Allocated 4

Virtual block number 1 (00000001), 512 (0200) bytes

 70202F2F 0A0D0A0D 74726174 733A206F 746F670A 0D0A0D66 666F206F 68636540 @echo off....goto :start....// p 000000
 4C532820 79726574 74616C53 20746150 202F2F0A 0D646D63 2E66666F 5F776F6C low_off.cmd..// Pat Slattery (SL 000020
 63686361 62206C6C 61630A0D 0A0D7472 6174733A 0A0D0A0D 29505952 45545441 ATTERYP)....:start....call bachc 000040
 0D646E65 3A0A0D0A 006C6C64 2E647262 206C6C64 2E6C706F 6E647262 2079706F opy brdnopl.dll brd.dll....:end. 000060
 00000000 00000000 00000000 00000000 00000000 00000000 00000000 0000780A .x.............................. 000080
 00000000 00000000 00000000 00000000 00000000 00000000 00000000 00000000 ................................ 0000A0
 00000000 00000000 00000000 00000000 00000000 00000000 00000000 00000000 ................................ 0000C0
 00000000 00000000 00000000 00000000 00000000 00000000 00000000 00000000 ................................ 0000E0
 00000000 00000000 00000000 00000000 00000000 00000000 00000000 00000000 ................................ 000100
 00000000 00000000 00000000 00000000 00000000 00000000 00000000 00000000 ................................ 000120
 00000000 00000000 00000000 00000000 00000000 00000000 00000000 00000000 ................................ 000140
 00000000 00000000 00000000 00000000 00000000 00000000 00000000 00000000 ................................ 000160
 00000000 00000000 00000000 00000000 00000000 00000000 00000000 00000000 ................................ 000180
 00000000 00000000 00000000 00000000 00000000 00000000 00000000 00000000 ................................ 0001A0
 00000000 00000000 00000000 00000000 00000000 00000000 00000000 00000000 ................................ 0001C0
 00000000 00000000 00000000 00000000 00000000 00000000 00000000 00000000 ................................ 0001E0
   Dump of file SATURN:[PCCOMMON.DUMP.DLL]PPMMAP.TMP;1 on 18-APR-1990 10:49:38.77
File ID (804,35,0)   End of file block 2 / Allocated 4

Virtual block number 1 (00000001), 512 (0200) bytes

 00000000 00000040 00000000 000000B8 0000FFFF 00000004 00000002 00295A4D MZ).............|.......@....... 000000
 00000080 00000000 00000000 00000000 00000000 00000000 00000000 00000000 ................................ 000020
 6F6E6E61 63206061 72676F72 70207369 685421CD 4C01B821 CD09B400 0EBA1F0E ..o..Ç.ël|.LëlThis program canno 000040
 00000000 00000024 0A0D0D2E 65646F6D 20534F44 206E6920 6E757220 65622074 t be run in DOS mode....$....... 000060
 00000005 00000000 00020000 00000000 00048009 0BC4D6A6 00070072 0505454E NE..r...|øé..................... 000080
 00000000 00000000 00010000 00040000 000000F9 00720072 00680068 0040003C <.@.h.h.r.r.ù................... 0000A0
 02100E21 00090022 00360E00 0036001E 000F0F00 000F001C 006C0F00 006C0014 ..l...l..........6...6."...!.... 0000C0
 616D6863 61422700 00000003 01010000 0050414D 4D505006 00020E21 00000000 ....!....PPMMAP..........'Bachma 0000E0
 65747379 73627553 20656C69 666F7250 206C6564 6F4D2073 7365636F 7250206E n Process Model Profile Subsyste 000100
 00000000 00000000 00000000 0001434E 5546474E 49505041 4D405050 0E00006D m...PPMMAPPINGFUNC.............. 000120
 0000BF83 0102FE5E 69FE46FF 0003E900 00FE46C7 D88EFFFF B81E5657 000002C8 à...WV.|...ÄûF±..Õ...F±i^±...¢.. 000140
 FE466900 1EE90374 00008739 0A468801 02FE5E69 0038E9FF FFB80006 E9037400 .t.Õ..|..Õ8.i^±...F.9...t.Õ..iF± 000160
 FFB8FFB6 E90009E9 00008808 C483FFFF 00009A06 76FF0876 FF501E00 02050102 ......P.v..v.......á.|..Õ..ÕÑ.|. 000180
 00000000 00040008 00020000 00030050 00020002 900006CA C95F5E1F 0000E9FF .Õ...^_èò.......P............... 0001A0
 00000000 00000000 00000500 02000200 01CB0001 B81F0000 3EB9D88E FFFFB81E .|...Ä_>...|...Ù................ 0001C0
 A8C78B06 7EC4D1F7 AEF2FFFF B9C033C0 8ED88CFE 8B0A76C5 1EDE8BD7 8BEC8B55 U.š.æ.B.év..±.Ä.ä3ä¿..·Ù%1á-..ú´ 0001E0

Dump of file SATURN:[PCCOMMON.DUMP.DLL]PPMMAP.TMP;1 on 18-APR-1990 10:49:38.77
File ID (804,35,0)   End of file block 2 / Allocated 4

Virtual block number 2 (00000002), 512 (0200) bytes

 00000000 00000000 0000CB5D C28C1FFA 8BF38BA4 F3C913A5 F3E90149 A4027401 .t.ÉIIõµÉ.èµÉ.µ.¹..ó]ù.......... 000000
 00000000 00000000 00000000 00000000 00000000 00000046 4F52504D 50502455 U$PPMPROF....................... 000020
 00000000 00000000 00000000 00000000 00000000 00000000 00000000 00000000 ................................ 000040
 00000000 00000000 00000000 00000000 00000000 00000000 00000000 00000000 ................................ 000060
 00000000 00000000 00000000 00000000 00000000 00000000 00000000 00000000 ................................ 000080
 00000000 00000000 00000000 00000000 00000000 00000000 00000000 00000000 ................................ 0000A0
 00000000 00000000 00000000 00000000 00000000 00000000 00000000 00000000 ................................ 0000C0
 00000000 00000000 00000000 00000000 00000000 00000000 00000000 00000000 ................................ 0000E0
 00000000 00000000 00000000 00000000 00000000 00000000 00000000 00000000 ................................ 000100
 00000000 00000000 00000000 00000000 00000000 00000000 00000000 00000000 ................................ 000120
 00000000 00000000 00000000 00000000 00000000 00000000 00000000 00000000 ................................ 000140
 00000000 00000000 00000000 00000000 00000000 00000000 00000000 00000000 ................................ 000160
 00000000 00000000 00000000 00000000 00000000 00000000 00000000 00000000 ................................ 000180
 00000000 00000000 00000000 00000000 00000000 00000000 00000000 00000000 ................................ 0001A0
 00000000 00000000 00000000 00000000 00000000 00000000 00000000 00000000 ................................ 0001C0
 00000000 00000000 00000000 00000000 00000000 00000000 00000000 00000000 ................................ 0001E0
```

Dump of file SATURN:[PCCOMMON.DUMP.DLL]PPMPROF.TMP;1 on 18-APR-1990 10:49:40.25
File ID (822,21,0)   End of file block 31 / Allocated 32

Virtual block number 1 (00000001), 512 (0200) bytes

```
00000000 00000040 00000000 000000B8 0000FFFF 00000004 0000001E 01E65A4D MZ!.............|........a....... 000000
00000080 00000000 00000000 00000000 00000000 00000000 00000000 00000000 ................................ 000020
6F6E6E61 63206D61 72676F72 70207369 685421CD 4C01B821 CD09B400 0EBA1F0E ..¤..Ç.ë!¡.Lë!This program canno 000040
00000000 00000024 0A0D0D2E 65646F6D 20534F44 206E6920 6E757220 65622074 t be run in DOS mode....$....... 000060
00060006 00000000 00020000 00000000 00058009 64FC9786 00070165 0505454E NE..e.....▪d.................... 000080
00000000 00000000 00010001 00040000 000001EC 0088007F 00740070 0040003A :.@.p.t.....š................... 0000A0
02020E21 00000000 18800F00 1880008A 000F0F00 000F0088 05820F00 05810023 #...............................|... 0000C0
01000000 464F5250 4D505007 01000004 01D01EB1 01D003C0 28B00F21 1A1C021C ....!.¯+à.Å.Ý.Å......PPMPROF.... 0000E0
086C6D64 03534C4C 4143534F 44084E49 574D5005 0000CD00 C2004500 10000700 .....E.ô.ë...PMWIN.DOSCALLS.dml. 000100
46595245 55514C4D 44004E58 54504F54 534C4D44 0A4E5854 54524154 534C4D44 DMLSTARTTXN.DMLSTOPTXN.DMLQUERYF 000120
46535345 434F5250 4D46440E 4D464403 444C4549 46544553 4C4D440B 444C4549 IELD.DMLSETFIELD.DFM.DFMPROCESSF 000140
4F4C4D44 48595245 55514D46 440F5041 45484248 59524555 514D4644 0E4D524F ORM.DFMQUERYHBHEAP.DFMQUERYHDMLO 000160
4410474C 44444E57 48595245 55514D46 440F4D54 48595245 55514D46 440B4A42 BJ.DFMQUERYHTM.DFMQUERYHWNDDLG.D 000180
46440F4E 4645534F 4C435445 53404644 0D444C45 49465245 54534947 45524D46 FMREGISTERFIELD.DFMSETCLOSEFN.DF 0001A0
534F4408 4F495303 444E454F 5250064F 52500345 4C544954 4D524F46 5445534D MSETFORMTITLE.PRO.PROEND.SIO.DOS 0001C0
646F6D20 73736563 6F727020 6E616D68 63614227 00000520 03010145 54495257 WRITE... ...'Bachman process mod 0001E0
```

Dump of file SATURN:[PCCOMMON.DUMP.DLL]PPMPROF.TMP;1 on 18-APR-1990 10:49:40.25
File ID (822,21,0)   End of file block 31 / Allocated 32

Virtual block number 2 (00000002), 512 (0200) bytes

```
5453544F 4F424D50 500C0000 6D657473 79736275 7320656C 69666F72 70206C65 el profile subsystem...PPMBOOTST 000000
FF0A76FF D88EFFFF B81E5657 00005AC8 00000000 00000000 00000000 01504152 RAP.............àZ..WV.|...Ä.v.. 000020
FF0A76FF 0000FFFF 9A5016F2 46800876 FF0A76FF 0000FFFF 9A5016F6 46800876 v..F-.P......v..v..F·.P......v.. 000040
006A006A 486A006A 01436806 76FFF676 FFF876FF 0000FFFF 9A5016FC 46800876 v..F▪.P......v½.v-.v.hC.j.jKj.j. 000060
C483FFFF 00109A50 16A6468D 0042681E 0014E903 74FE4608 FC468800 00FFFF9A ......F▪.F±t.Õ...hB..F|.P......á 000080
FFF876FF 0000FFFF 9A5016A6 4680026A FC76FFFE 76FFF276 FFF476FF 0018E908 .Õ...v¶.v·.v±.v▪j..F|.P......v½. 0000A0
880000E9 0001FA46 C70008E9 0000FA46 C70000FF FF9A5016 A6468D06 76FFF676 v-.v..F|.P.....úF'..Õ..úF'..Õ... 0000C0
568C0646 8912468D D88E0008 B81E5657 00005CC8 0006CAC9 5F5E1F00 00E9FA46 F'Õ...^_èò..à\..WV.|...Ä.F..F..V 0000E0
0000189A 5016F446 8D1476FF 1676FF00 00FFFF9A 5016F846 8D1476FF 1676FF08 ..v..v..F½.P......v..v..F¶.P.... 000100
0000389A 5016FC46 8D1476FF 1676FF00 0000289A 5016F046 8D1476FF 1676FF00 ..v..v..FÞ.P.(....v..v..F▪.P.8.. 000120
0043681E F076FFF2 76FF0000 FFFF9A50 16A4468D 4C6A1276 FFF476FF F676FF00 ..v-.v¶.v.jL.FÈ.P......v·.vÞ.hC. 000140
4680026A FC76FFFE 76FFF076 FFF276FF 0049E900 03E90375 00003000 00FFFF9A .....=..u.Õ..Õl..v·.vÞ.v±.v▪j..F 000160
00300000 FFFF9AF0 76FFF276 FF0026E9 0003E903 7500003D 0000FFFF 9A5016A4 È.P.....=..u.Õ..Õ&..v·.vÞ.....=. 000180
0C76FF00 51681E00 22E90000 FA46C700 0107C726 0E5EC400 10E90003 E9037500 .u.Õ..Õ..á^.&ú...úF'..Õ"..hQ..v. 0001A0
00E9FA46 8B0000E9 0001FA46 C7000207 C7260E5E C408C483 006C0046 9A0A76FF .v..F.l..á.á^.&ú...úF'..Õ...F'Õ. 0001C0
9A5016F2 46800876 FF0A76FF D88E00C4 B81E5657 000014C8 0012CAC9 5F5E1F00 ..^_èò..à...WV.|á..Ä.v..v..F·.P. 0001E0
```

Dump of file SATURN:[PCCOMMON.DUMP.DLL]PPMPROF.TMP;1 on 18-APR-1990 10:49:40.25
File ID (822,21,0)   End of file block 31 / Allocated 32

Virtual block number 3 (00000003), 512 (0200) bytes

```
9A5016FA 46800876 FF0A76FF 000000FD 9A5016EE 46800876 FF0A76FF 000000ED Ú....v..v..FŸ.P.»....v..v..F'.P. 000000
E9EC4688 00000260 9A5016EC 4680016A FA76FFFC 76FFEE76 FFF076FF 00000100 .....vÞ.vŸ.v».v'j..F$.P.m....F$Õ 000020
00013000 13E90016 E9010BF8 46C7001E E9010CF8 46C70026 E9010BF8 46C7001B ..úF½..Õ&.úF½..Õ..úF½..Õ..Õ..=.. 000040
016A006A 012568F8 76FFF276 FFF476FF FFE2E9FF DDE90375 00023DFF DDE90375 u.Õi.=..u.Õi.Õã..v¶.v·.v½h%.j.j. 000060
0000889A 5016FE46 8D036AFA 76FFFC76 FFEE76FF F076FF00 0000519A 006A006A j.j..Q....vÞ.vŸ.v».v'j..F±.P.... 000080
E90016E9 0109F846 C7001EE9 0109F846 C70026E9 0108F846 C7001BE9 FE468800 ..F±Õ..úF½..Õ&.úF½..Õ..úF½..Õ..Õ 0000A0
2568F876 FFF276FF F476FFFF E2E9FFDD E9037500 023DFFDD E9037500 013D0013 ..=..u.Õi.=..u.Õi.Õã..v¶.v·.v½h% 0000C0
46880000 E90001F6 46C70008 E90000F6 46C70000 02559A00 6A006A01 6A006A01 .j.j.j.j..U...úF-..Õ..úF-..Õ...F 0000E0
F4468014 76FF1676 FFD88E01 C0881E56 5700001A C80006CA C95F5E1F 0000E9F6 -Õ..._èò..à...WV.|à..Ä.v. ‹..F¶ 000100
FA468014 76FF1676 FF000001 E09A5016 F0468014 76FF1676 FF000001 D09A5016 .P.À....v..v..FÞ.P.À.....v..  F' 000120
89E64680 0001E846 C7010BEA 46C70002 E646C700 6FE91246 88000001 F09A5016 .P.Þ....F.Õo.úF|..úFÕ..úFÕ...F|. 000140
EE568CEC 4689E646 8D0001E8 46C7010C EA46C700 01E646C7 0077E9EE 568CEC46 F$.VŸÕw.úF|..úFÕ..úFÕ....F|.F$.VŸ 000160
46C70041 E9EE568C EC4689FE 46800003 E846C701 08EA46C7 0002FE46 C7005CE9 Õ\.úF±..úFÕ..úFÕ...F±.F$.VŸÕA.úF 000180
75010830 0023E900 26E9EE56 8CEC4689 FE468D00 03E846C7 0109EA46 C70001FE ±..úFÕ..úFÕ...F±.F$.VŸÕ&.Õ#.=..u 0001A0
FF0000E9 FF71E903 75010C30 FF94E903 75010830 FFB7E903 75010930 FFDAE903 .ÕÕ.=..u.Õñ.=..u.Õ..=..u.Õq.Õ... 0001C0
76FFF476 FFF676FF 00000300 9A006A00 6A016A00 6A012568 1276FFF4 76FFF676 v-.v¶.v.h%.j.j.j.j...î.....v-.v¶.v 0001E0
```

Dump of file SATURN:[PCCOMMON.DUMP.DLL]PPMPROF.TMP;1 on 18-APR-1990 10:49:40.25
File ID (822,21,0)   End of file block 31 / Allocated 32

Virtual block number 4 (00000004), 512 (0200) bytes

```
00000131 9A006568 1EF076FF F276FF00 0002BA9A 006A006A 006A006A 012568EA ôhX.j.j.j.j..¤....v·.vþ.he..1... 000000
EC76FFEE 76FFE876 FFFA76FF FC76FFF0 76FFF276 FF004BE9 0003E903 7500003D =..u.Õ..ÕK..v·.vþ.v•.vª.vÕ.vŸ.vš 000020
03750000 3D000001 6A9AF076 FFF276FF 0026E900 03E90375 00003D00 0001549A .T...=..u.Õ..Õ&..v·.vþ.j...=..u. 000040
0A76FF0C 76FF007C 681E0022 E9000107 C7260E5E C40000F8 46C70010 E90003E9 Õ..Õ..úF%..ó^.&ú...Õ"..h|..v..v. 000060
5E1F0000 E9F84688 0000E900 01F846C7 000207C7 260E5EC4 08C48301 9600469A .F....á.ó^.&ú...úF%..Õ...F%Õ...^ 000080
FFFF6804 91680102 680676FF 0876FFD8 8E02E388 1E565700 0000C800 12CAC95F .èò..à...WV.¡D..Ä.v..v.h..h..h.. 0000A0
FFFF6804 8168010C 680676FF 0876FF00 0004BD9A 006A006A 006AFFFF 6804AB68 ĥ¨.h..j.j.j..§....v..v.h..hŸ.h.. 0000C0
ED68006A 006A0108 680676FF 0876FF00 0004DB9A 006A006A 006A04D2 6804CF68 hü.h●.j.j.j..Û....v..v.h..j.j.hÜ 0000E0
68050868 006A006A 01096806 76FF0876 FF000004 F99A006A 006A006A 04F06804 .hþ.j.j.j..ª....v..v.h..j.j.h..h 000100
FFFF68FF FF68006A 006A0108 680676FF 0876FF00 0005179A 006A006A 006A050E ..j.j.j.......v..v.h..j.j.h..h.. 000120
FF0876FF D88E047D 881E5657 000000C8 CBC95F5E 1F0000FF FF9A006A 006A006A j.j.j.......^_èùà...WV.¡)..Ä.v.. 000140
0876FF00 00FFFF9A 0092681E 00A0681E 0676FF08 76FF04C4 83048804 759A0676 v..u....ó..v..v..h...h........v. 000160
020036FF 26193806 8E010068 0676FF08 76FF0000 FFFF9AFF FF68FFFF 680676FF .v.h..h........v..v.h....8.&.6.. 000180
0103C401 03000000 01053500 02001804 CAC95F5E 1F0000E9 00008800 00FFFF9A .....¡..Õ...^_èò.....5.......ó.. 0001A0
01012201 03008600 01009801 03000000 03045300 02006700 04031302 03007F00 .........g...S................".. 0001C0
0402F302 03000000 01048E00 05007700 04030302 03000000 05052800 02008700 .....(...........w...........µ.. 0001E0
```

Dump of file SATURN:[PCCOMMON.DUMP.DLL]PPMPROF.TMP;1 on 18-APR-1990 10:49:40.25
File ID (822,21,0)   End of file block 31 / Allocated 32

Virtual block number 5 (00000005), 512 (0200) bytes

```
03020802 03002000 03042702 03009300 04049D02 03001400 0303EC02 03008300 .....š...............'......... 000000
0104AE00 05008200 04054902 03003900 03041102 0300A400 04055A02 03002800 .+...Z...Ê.......9...I...ý.  Ú.. 000020
04057102 0300C600 05055702 0500BC00 01049400 0500C600 05055402 0201B800 .|...T...ó.......¥...W...ó...q.. 000040
00000000 00000000 00000000 00020B00 01048400 05005800 04000002 03004900 .I...Ï...X...Ç...Û.............. 000060
8ED88CFE 880A76C5 1EDE88D7 88EC8855 00000000 00000000 00000000 00000000 .|...Ä.>...|..ù................. 000080
88F388A4 F3C913A5 F3E9D149 A4027401 A8C78806 7EC4D1F7 AEF2FFFF 89C033C0 ...............U.š.¤.B.¢v..±.Ä. 0000A0
5EC4FE56 8CFC4689 0E468DFA 568CF846 89EC468D 56570000 16C8CB5D C28C1FFA ã3ã¿..·Ú%ïó~..ú´.t.ÊÏÏÕµÉ.èµÉ.µ. 0000C0
FF0447C7 26025789 26078926 08578926 06478926 08568806 4688420A 47C626F8 ª..õ]ùà...WV.F$.F%.Vª.F..F•.V±ó^ 0000E0
1278044F FF26F85E C4F0880C C48300B8 023C9A53 060A76FF 0C76FFFC 76FF167F ¼&óG.B.F..V.&.G.&.W.&..&.W.&úG.. 000100
06C483FF FF00C69A 006A53FA 76FF900F E8058826 02478E26 07FF263F 8826C02A ...v•.v..v..S.<.£..ó..þó^½&.O.x. 000120
0C899904 FA2DC388 FA4689E4 2A0B478A 26085EC4 56570000 08C8CBC9 5F5EC688 *ò&.?&..&.G.&..Š...vªSj..6....ó. 000140
C40F7440 0A47F626 0774830A 47F626F8 468910EE 05E001C1 03E001C8 88F9F700 .ó^_èùà...WVó^.&.G.*Õ.Fª.û-ª..¿. 000160
47C72620 0A4F8026 0E74010A 47F62608 5EC49001 28E9FFFF B8200A4F 8026085E .¥ª.àÏÀ.èÏÀ.Ÿ..F½&-G..t.&-G.@t.ó 000180
0C0A47F6 26FC7689 F0880447 8926C02B EF0A6780 26020A4F 802690E2 E8000004 ^.&.O. |..Õ+..ó^.&-G..t.&.O. &úG 0001A0
7E810775 0506087E 81377501 10EE87F6 06D868F9 F7000CB9 9904FA2D C3884C75 ...Šã.&.O..&.g.ÿ+â&.G..þ.v•&-G.. 0001C0
                                                                        uL.û-ª..¿..¥ªkÄ.-.Ÿ..u7.-...u..- 0001E0
```

Dump of file SATURN:[PCCOMMON.DUMP.DLL]PPMPROF.TMP;1 on 18-APR-1990 10:49:40.25
File ID (822,21,0)   End of file block 31 / Allocated 32

Virtual block number 6 (00000006), 512 (0200) bytes

```
C00802C4 8301E210 549AFA76 FF0F75FF FF0A7E81 16750512 087E810E 74016F0A .o.t..~...u..~...u..vª.T.ã..ó..à 000000
0C899904 FA2DC388 1575080A 47F62608 5EC404C4 830C51E8 0876FF0A 76FF0C75 u..v..v.ÒQ..ó.ó^.&-G..u..û-ª..¿. 000020
40085788 26064788 2606772B 26378826 085E8867 740110EE 87F60608 68F9F700 .¥ªkÄ.-.Ÿ..tg.^.&.7&+w.&.G.&.W.@ 000040
9AFA76FF 0677FF26 5256167E F60B0447 89264802 4588F87E 88025789 26078926 &..&.W..~½.E.H&.G..~~.VR&.w..vª. 000060
0E669A53 006A006A 026A0F74 2016FF87 F6FA5E88 19EBFC46 8908C483 02000EA4 £....ó..F•Š..^ª~... t.j.j.j.S.f. 000080
FA76FF50 16064680 560001BE 17E80788 2606468A 065FC426 085EC408 C4830223 #..ó.ó^.&ó_..F.&..Š./..V.F..P.vª 0000A0
B8EC8855 CBC95F5E E42A0646 8AFECCE9 0374FC76 39FC4689 08C48300 900EA49A .Ê....ó..F•9v•t.Õã±.F.*ó^_èùW.š| 0000C0
46881A3A 16891A38 A3105688 0E46881A 4A1E8C1A 48A31A4E 88017910 789A000A ...x.y.¡N.ÈH...J..F..V.È8¯...:..F 0000E0
037425F6 7E80038D E900001A 4206C700 001A4406 C71A2016 891A1EA3 08568806 ..V.È.... .ú.D...ú.B...Õ...~~Xt. 000100
1A22A31A 3CA31A3E A31A26A3 1A40A31A 24A31A28 A3C02800 011A4606 C7030BE9 Õ..ú.F...+âÈ(.È$.È@.È&.È>.È<.Èª. 000120
EB00301B AE06C70A 46FF4975 30017F80 260A5EC4 00201BAE 06C71A36 A31A1CA3 È..È6.ú.Ù. .ó^.&...0uI.F.ú.Ù.0.$ 000140
3E830E75 203F8026 9028EB00 001A3C06 C71A2806 FF00752B 3F80260A 5E88903E >..^.&.?+u...(.ú.<...Š(.&.? u..> 000160
FF1A3606 FFC77520 3F80260A 5EC400EB 1A1C06FF 9014EB1A 3C06FF1A 75001A28 (..u...<.Š......Š.ó^.&.?-uú..6.. 000180
0E1A4C68 1E0A76FF 0C76FFDD 75C00802 C4830978 E80E5098 078A260A 5E880A46 F..^.&...P.Òx..ó..âuï.v..v..hL.. 0001A0
831A4CA3 D8F71A4C A11A3606 FF0C7D00 1A4C3E83 0C56890A 468908C4 8308C7E8 Òú..6..F..V..>L..}...6.ÀL.¥ÄÈL.. 0001C0
1A3E06FF 2D752E3F 80260A5E C400201B AE06C706 75301BAE 3E830D74 001A363E >6..t..>Ù.0u.ú.Ù. .ó^.&.?.u-..>. 0001E0
```

```
Dump of file SATURN:[PCCOMMON.DUMP.DLL]PPMPROF.TMP;1 on 18-APR-1990 10:49:40.25
File ID (822,21,0)   End of file block 31 / Allocated 32

Virtual block number 7 (00000007), 512 (0200) bytes

C70A7D00 1A463E83 0C56890A 468908C4 83087BE8 0E1A4668 1E0A76FF 060A46FF .F...v..hF..Ò(..ó..F..V..>F..).ú 000000
3D2B7400 683D4074 004E3D3D 7400463D 98078A26 0A5EC41A 3E0EFF00 011A4606 .F.....>.ó^.&...=F.t==N.tə=h.t+= 000020
0A5EC40A 46FF0375 4C3F8026 0A5EC409 75001A26 3E830002 1A2606C7 0675006C l.u.ú.&....>&..u.ó^.&.7Lu..F.ó^. 000040
00081A26 06C7D0EB 00101A26 06C7D8EB 00011A26 06C79002 4EE91C75 003F8026 &.7.u.ÒN..ú.&...ŠÄú.&...ŠÄú.&... 000060
20F84683 1A2406FF 08750058 3D057400 473D0A74 00453DF8 46899807 8A26C8E8 Šà&....F½=E.t.=G.t.=X.u...$..F½ 000080
E9037500 253D0152 E9037E01 3FE90375 00633D01 91E9037E 78740069 3DF84688 .F½=i.tx~.Ô..=c.u.Ô?.~.ÔR.=%.u.Ô 0000A0
00000247 C7260789 261A42A1 1FC4261A 381EC415 75021A26 3E839001 59E90140 ə.ÔY...>&..u.ó.8.&ó.ÀB.&..&úG... 0000C0
3E830170 E9037500 1A443E83 041A3806 83078926 1A42A11F C4261A38 1EC400EB Š.ó.8.&ó.ÀB.&....8...>D..u.Ôp..> 0000E0
1A4006FF 01ACE9FF FFB801AF E9037520 0A47F626 1A1E1EC4 01BDE903 74001A42 B..t.Ô§.ó...&-G. u.Ô€.|..Ô¯...ə. 000100
06FF1A24 06FF1A22 06FFF2E8 086A90C3 EB02C483 019EE80E 0A6A0000 1A1C06C7 ú.....j..Ò...ó.Šú.j.Š·..*...$... 000120
46891A26 A3C02B7A 74011A26 3E830081 E9037508 1A263E83 00041A46 06C71A3E >.ú.F....>&..u.Ô...>&..t'+ôÈ&..F 000140
2E839090 13E80000 1A4C06C7 0A74001A 363E83FA 46891A4C A128741A 4C0639FA *9.L.t(ÀL..F*.>6..t.ú.L.. Š..... 000160
0E3A6A02 C4830130 E80E106A 021A3806 831A4CA3 C02B027D C00B1A4C A1051A4C L..ÀL..â).+âÈL...8..j..ÒO. '.j:. 000180
027DC00B 1A4CA300 0520FA46 8B157400 1A363E83 227400FA 7E8302C4 83048DE8 Ò...á..-*.t".>6..t..F*-..ÈL..â). 0001A0
1A380683 02C48300 F1E80E10 6A041A38 2E830000 1A4C06C7 9007EB1A 4CA3C028 +âÈL.Š..ú.L.....8..j..Òþ..á...8. 0001C0
E90349E8 0EF876FF F4E8016A 90FF39E9 026EE80E 006A90FF 3FE9106A FF10E902 .Ô..j.Ô?..j..Òn.Ô9..j.Š¶.v½.ÒI.Ô 0001E0

Dump of file SATURN:[PCCOMMON.DUMP.DLL]PPMPROF.TMP;1 on 18-APR-1990 10:49:40.25
File ID (822,21,0)   End of file block 31 / Allocated 32

Virtual block number 8 (00000008), 512 (0200) bytes

3E83DA7E 00673005 7C00653D FF0CE903 7500643D 90FF21E9 0428E80E 256AFF2A *.j%.Ò(.Ô!..=d.u.Ô..=e.|.=g.-Ô.> 000000
6E3D903A EBFE5689 FC468940 0C56880A 46880A4E FF0C5688 0A468809 74001A26 &..t..F..V..N..F..V.ə.F•.V±Š:.=n 000020
03750075 308F7400 733DFEE0 E9037500 703DFEE4 E9037500 6F3DFE80 E9037500 .u.Ô.±=o.u.Ôô±=p.u.ÔÀ±=s.t.=u.u. 000040
F6468807 8A26FC5E C4FC46FF 9034EB0A 46FF9081 EBFF79E9 03750078 3DFEB9E9 Ô¿±=x.u.Ôy.ŠŸ..F.Š4..F•ó^•&...F- 000060
568BFC46 8806C483 044CE80E 0A76FF0C 76FF500A 462BC38B EC75253C 0474C00A .ât.<%uš.ú+F.P.v..v..ÒL..ó..F•.V 000080
200A47F6 261A1E1E C4FC63E9 0374C00A F6468807 8A260A5E C40C5689 0A4689FE ±.F..V.ó^.&...F-.ât.Òc•ó...&-G. 0000A0
067E8300 201BAE06 C7067400 1A3E3E83 56570000 12C8CBC9 1A42A1FE 51E90374 t.ÔQ±ÀB.èùà...WV.>>..t.ú.Û. ..-. 0000C0
02578B26 0788261A 381EC419 75101A26 3E830774 021A263E 831A4006 FF04740A .t...ə..>&..t..>&..u.á.8.&..&.W. 0000E0
C7FC4689 0788261A 381EC411 74001A40 3E83902C EB041A38 0683FE56 89FC4689 .F•.V±..8..Š,..>ə..t.á.8.&...F•ú 000100
0E74001A 1C3E8302 1A380683 FE5689FC 46899907 8B261A38 1EC40EEB 0000FE46 F±..Š.ó.8.&....F•.V±..8...>...t. 000120
F45689F2 46891A4A 16881A48 A118ACA3 C02B9003 EB064688 0674FE46 0BFC4688 .F•.F±t..F.Š..+âÈ¯.ÀH...J..F·.V¶ 000140
FC46882D 07C626F2 46FFF25E C410750A 067E832B 7D00FE7E 83317500 1A403E83 .>ə..u1.-±.)+.~..u.á^·.F·&6.-.F• 000160
1A2A8800 00F646C7 9006E800 01F646C7 FE5689FC 46890AF7 000283D8 F7FE5688 .V±%Ä.@.%Ö.F•.V±úF-..Š..úF-..¡*. 000180
4574001A 3E3E830A C4830729 104A9AFC 76FFFE76 FF501E06 76FFFA5E 8CF84689 .F½.^*.v..P.v±.v•.J.)..ó..>>..tE 0001A0
081BAC3E 83007EC9 08F04E89 C82B1A46 0E8804C4 83024510 329AF876 FFFA76FF .v*.v½.2.E..ó...F.+à.Nþ.è~..>¯.. 0001C0
8CF27E89 F47FC008 49C18847 3005C626 05EBF27E C4F04E88 00001BAC 06C70675 u.ú.¯....Nþó-·Š.&6.0G.èI.â.¶.~·. 0001E0

Dump of file SATURN:[PCCOMMON.DUMP.DLL]PPMPROF.TMP;1 on 18-APR-1990 10:49:40.25
File ID (822,21,0)   End of file block 31 / Allocated 32

Virtual block number 9 (00000009), 512 (0200) bytes

80037C61 3C0774C9 08048807 8A26F85E C4F276C5 EE5E8C1A 240E88F0 4E89F446 F¶.Nþ..$..^Ÿév·ó^½&.....èt.<ə|.. 000000
0B1A28A1 1475001A 403E83EE 5E8EF45E 8CF27689 E375003F 8026F846 FF46202C , F.F½&.?.uD.v·.^¶.^Ÿ.>ə..u.À(.. 000020
10C8C8C9 5F5E02C4 8302FFE8 0E50C028 02E80001 88057500 F67E8308 741A3C06 .<.t..--.u.¡..Š.+âP.Ò...ó.^_èùà. 000040
E9021A38 0683FA56 89F84689 1A3A1688 1A38A100 01BE1874 00067E83 56570000 ..WV.~..t.ƒ..À8...:..F½.V*.¯8..Ô 000060
1A381EC4 10E8FA56 89F84689 02578B26 0788261A 381EC413 74081A26 3E83008F ...>&..t.ó.8.&..&.W..F½.V*Š.ó.8. 000080
1575FA46 08F84688 0E74081A 263E8304 1A380683 FA5E8CF8 4689FC46 89078B26 &...F•.F½.^*..8...>&..t..F½.F*u. 0000A0
5689F246 89FA568B F84688FA 5E8CF846 8900AF88 097500FC 7E83900A E800A888 ¡´.Š...~•.u.|€..F½.^*.F½.V*.F·.V 0000C0
7ECE3B46 1574003F 8026F246 FFF25EC4 900EE81A 460E881C 741A3E36 39F62BF4 ¶+-96>.t...F.Š..ó^·.F·&.7.t.F;ö- 0000E0
0E570875 001A363E 83FE2B1A 4C3E88F3 75003F80 26F246FF F25EC446 90EDEB10 .ŠÚ.Fó^·.F·&.7.uµ.>L.+±.>6..u.W. 000100
013CE80E 57087400 1A363E83 06C48301 83E80EF8 76FFFA76 FF5602C4 830159E8 ÒY..ó.V.v*.v½.Ò*..ó..>6..t.W.Ò<. 000120
83067467 067E83FE 5689FC46 891A3A16 881A38A1 000006C8 90C8C95F 5E02C483 .ó.^_èù.à...À8...:..F•.V±.~.gt.. 000140
00FA7E80 00061A46 06C70675 001A3E3E 83FA4688 C02A9003 E801B005 7547067E -.Gu.¯.Š..*à.F*.>>..u.ú.F....~*. 000160
36FF1A4A 36FF0676 FF1A4636 FF1A2436 FF00011A 4606C706 75001A46 3E830074 t..>F..u.ú.F....6$..6F..v..6J..6 000180
75001A1C 3E831B74 00FA7E80 0EC48304 DA1EFF26 193A068E FC76FFFE 76FF1A48 H..v±.v•..:.&..Ö..ó..-*.t..>...u 0001A0
1A463E83 1B74001A 1C3E8304 C48304DE 1EFF2619 3A068E1A 4836FF1A 4A36FF14 ..6J..6H...:.&..8..ó..>...t..>F. 0001C0
1BAC06C7 081A3806 8304C483 04E61EFF 26193A06 8E1A4836 FF1A4A36 FF147500 .u..6J..6H...:.&..Ì..ó...8..ú.¯. 0001E0
```

```
Dump of file SATURN:[PCCOMMON.DUMP.DLL]PPMPROF.TMP;1 on 18-APR-1990 10:49:40.25
File ID (822,21,0)   End of file block 31 / Allocated 32

Virtual block number 10 (0000000A), 512 (0200) bytes

 74C00B04 C48304EA 1EFF2619 3A068EFC 76FFFE76 FF1B741A 3C0601A 28A10000 ..À(...<.t..v±.v=..:.&..õ..ó..àt 000000
 1A1E1EC4 3C75001A 443E8356 000000C8 90CBC901 29E80E50 C02B02EB 00018805 .¡..Š.+âP.Ò).èù.à...V.>D..u<ó... 000020
 FF531A20 36FF10EB E42A0488 2602478E 2607FF26 378B2606 468A147B 044FFF26 &.O.x..F.&.7&..&.G.&..*ôŠ..6 .S. 000040
 000002C8 90CBC95E 1A4206FF 9005EB1A 4406FF07 754006C4 830A0100 C69A0676 v..ó....ó.ãu...D.Š....B.^èù.à... 000060
 C69A1BAE 36FF1A1E 36FF1A20 36FF1BEB 507EF60B 06768B57 75001A44 3E835657 WV.>D..uW.v..-~PŠ..6 ..6...6Û..6 000080
 AEA0D478 044FFF26 1A1E1EC4 1E7EC00B 4EC68B1A 4406FF04 754006C4 830A6900 .i..ó.ãu...D..óN.ó-.ó...&.O.xå.Û 0000A0
 1A420601 06468B07 75001A44 3E83D4EB E42A0588 2602478E 2607FF26 3F8B261B .&.?&..&.G.&..*ôŠå.>D..u..F...B. 0000C0
 5EC41A1E 36FF1A20 36FF22EB 5E75001A 443E830A 768B5657 000002C8 CBC95F5E ^_èùà...WV.v..>D..u^Š".6 ..6..ó^ 0000E0
 C42574C0 0B4EC68B 0646FF1A 4406FF04 754006C4 830ADB00 C69A5098 078A2606 .Ī...P.ó.Û..ó.ãu...D..F..óN.àt%ó 000100
 05882602 478E2607 FF263F88 261A1E1E C4078A26 065EC4CD 78044FFF 261A1E1E ...&.O.xëó^.&..ó...&.?&..&.G.&.. 000120
 168B1A48 A1560000 0CC8CBC9 5F5E1A42 06010A46 88077500 1A443E83 CAEBE42A *ôŠò.>D..u..F...B.^_èùà...VÀH... 000140
 04C48307 1410329A F476FF52 1A4C368B FA4689FC 4689C028 F65689F4 46891A4A J..F¶.V-+â.F=.F*.6L¯R.v¶.2....ó. 000160
 1A363E83 4E017508 18AC3E83 08EB02EE 83057510 18AC3E83 06762BF0 2BF84689 .F½+Þ+v..>¯..u..Ÿ.Š..>¯..u.N.>6. 000180
 83FE71E8 0E509807 8A26F446 FF127530 1BAE3E83 19752D3F 8026F45E C4227500 .u"ó^¶&.?-u..>Û.0u..F¶&...P.Òq±. 0001A0
 FA46FF07 7400067E 831B7400 1A363E83 077EF60B 0B74301B AE3E83F8 4EFF02C4 ó..N½.>Û.0t..-~..>6..t..~..t..F* 0001C0
 C483FE7E E80E5629 75001A36 3E830070 E80EFC46 FF077400 1BAC3E83 0066E80E .Òf..>¯..t..F=.Òp..>6..u)V.Ò~±.ó 0001E0

Dump of file SATURN:[PCCOMMON.DUMP.DLL]PPMPROF.TMP;1 on 18-APR-1990 10:49:40.25
File ID (822,21,0)   End of file block 31 / Allocated 32

Virtual block number 11 (0000000B), 512 (0200) bytes

 E80E0475 00FC7E83 0A74001B AC3E8300 39E80E04 7500FA7E 830A7400 067E8302 ..~..t..-*.u..Ò9..>¯..t..~=.u..Ò 000000
 5600201B AE06C70E 74001A36 3E8306C4 83FEB5E8 0EF476FF F676FFF8 76FF0040 ã..v½.v-.v¶.Òç±.ó..>6..t.ú.Û. .V 000020
 C483FD02 E80E5000 20B803EB 002B8805 74001A28 3E83CBC9 5E02C483 FE38E80E .Ò8±.ó.^èù.>(..t.¡+.Š.¡ .P.Ò0».ó 000040
 78B803EB 0058B805 74001A24 3E831775 101BAC3E 8302C483 FDC8E80E 306ACB02 .ùj0.Òà».ó..>¯..u..>$..t.¡X.Š.¡x 000060
 1EC41275 2A3F8026 0A5EC400 01FE46C7 56570000 06C8CB02 C483FDAA E80E5000 .P.Ò`».ó.ùà...WVúF±..ó^.&.?*u.ó. 000080
 46FFFFFF FE46C708 752D3F80 260A5EC4 9060EB0A 46FF021A 38068337 8B261A38 8.&.7..8...F.Š'.ó^.&.?-u.úF±...F 0000A0
 06C70675 303C0A75 1A3E3639 3B7F393C 3F7C303C FA468807 8A260A5E 8BF6280A .+-.^.&...F*<0|?<9.;96>.u.<0u.ú. 0000C0
 30E983C8 03E1D1CE 0302E1C1 CE8B9805 8A261B7F 393D8026 06EBF88B 00301BAE Û.0..«Š.&.=9..&....öëÃ..öìÃ.à.Ò0 0000E0
 8B0A468B 37892606 5EC4F08B EEF7FE46 8B0C468C 0A7E89DF 7D303D80 2647F18B .þG&.=0)Ô.~..F..F±%Ÿ.þó^.&.7.F.. 000100
 3D802647 01EBFC7E C4064E8A FE5E8CFC 46890086 88570000 04C8CBC9 5F5E0C56 V.^_èùà...W¡Ñ..F=.^±.N.ó~=Š.G&.= 000120
 90CBC95F C02BFE46 8CFC7E89 9009EBFE 468CFC7E 89000188 F4750038 26117400 .t.Ī8.u¶¡...~=.F±Š...~=.F±+â_èù. 000140
 0000FFFF 9A008C68 1E008E68 1E16F8A3 E0865800 00FFFF9A 5016C488 50EC8B55 U.$P.ó.P.....X.ÁE½..h/..h¥...... 000160
 00FF680C F600A69A 0CE90052 9A50C85D E5880001 B809C511 8C9A03B6 E80021E8 Òl.ÒÑ....é.¡...[]ùP.R.Õ..Ī.-.h.. 000180
 C8BE3174 003D8026 47017500 3D80267F FFB9008E 068EFF33 0000B81E 00C416FF ..ó..£..3.../.¿..&.=.u.G&.=.t1/à 0001A0
 72412CAC 16FFBF1F F78B071E 061CEBE7 74AEF2C0 330874CA 88A6F3CB 88D18804 ..1.ùµ[.òt.3ã·ÙtóŠ.....¥.¢..¯,Ar 0001C0
 3E830CFB 00A69A50 00FCB8EC 885500C3 1FEDEBAA C20A0572 412CAC92 04E0C00E .âÁ..¯,Ar..ô¯ŠÚ.Û.U.Š¡=.P.Ī.«..> 0001E0

Dump of file SATURN:[PCCOMMON.DUMP.DLL]PPMPROF.TMP;1 on 18-APR-1990 10:49:40.25
File ID (822,21,0)   End of file block 31 / Allocated 32

Virtual block number 12 (0000000C), 512 (0200) bytes

 D88E0161 885756EC 8855CB5D E588005C 0DA69A50 00FF8804 D61EFF04 740004D8 Ã..t...ø.¡..P.Ī.\..[]ùU.ŠVW¡ø..Ã 000000
 5E5F96EB EBF788AE F2FFFFB9 C033970C 74964010 74C238AD 19448E06 5688C08E .å.V./D.Ù;ôt.ã.t..3â¿..·Ù.%ŠŠ._^ 000020
 AEF2FFFF 89C033FA 88921F74 C00B0070 0D769A06 76FF57EC 88550002 CA50E58B .[]ò..U.ŠW.v..v.p..ât...*3â¿..¯Ù 000040
 000004C8 0002CA5D E5885F5B 0000FFFF 9A501651 521E5300 02B8C48B 50490F7 %[]P.ÆE..S.RQ.P.....[_.[]ò..à... 000060
 5E8CFC46 8910EE05 E001C103 E001C888 F9F7000C B99904FA 2D04468B 191006FF .....F.-*..¿..%*.àìÁ.ëìÁ.Ÿ..F=.^ 000080
 080A4F80 26117400 08085789 26064789 26045EC4 02C48300 B013479A 020068FE ±h...G.¯..ó.ó^.&.G.&.W..Ât.&.O.. 0000A0
 26064789 2640FE56 88FC4688 040A4F80 26045EC4 9021E802 000247C7 26FC5EC4 ó^=&úG...Šl.ó^.&.O...F=.V±ã&.G.& 0000C0
 C7260257 89260789 26085788 26064788 26045EC4 00010247 C726FC5E C4085789 .W.ó^=&úG...ó^.&.G.&.W.&..&.W.&ú 0000E0
 04EC8304 78E9046C E9C03300 09BA0872 16FD1E38 065E8BEC 8855C3C9 00000447 G...èúJ.Š.^.;.».r.¤..3âÔl.Õx..£. 000100
 8BFD16FF A78091E1 75C0855A 590000FF FF9A5116 0C76FF08 76FF0A76 FF53CC88 .äS.v..v..v..Q.....YZ.âuÃ..Ī..». 000120
 2016FF87 F6042BE9 C0330009 BA087216 FD1E3806 5E880CEC 83EC8855 00CB5DE5 []ù.U.Š.Š..^.;.».r.¤..3âÕ+.-... 000140
 468EFA5E 8C667480 16FF87F6 00000E8F 9A5016F4 46805141 415151C9 33531274 t.S3èQQAAQ.F¶.P.....-....tf.^*.F 000160
 75AEF20A 8049E30C 4E8BF866 89F28BFA 885657FC FC4689FE 4689C033 0856C50A .éV.3â.F±.F==WV.*.·.f½.N.DI¯.·Ûu 000180
 F4E2AA1A 74FB3B0D 740A3CAC 0C4E8B07 16FA8804 8BE22800 80BADC8B 02EC833B ;.Š..Ê¤..+ã.â.*...N.¯<.t.;«t.¯ã¶ 0001A0
 5E8E5F5E E1EB0014 E8E2EBFC 46FF0AB0 AA001FE8 0375FB3B 00B0009A E90028E8 Ò+.Õ..¯.;«u.Ò..¯¯..F=Šãò..ŠÃ^_.^ 0001C0
 521E5306 5E8B1FE3 CA28CF8B 1F061E51 53500E07 10789AFF FCB87AEB 0093E9FA *Õ..Šz¡=..x...PSQ....ü+òD..^.Š.R 0001E0
```

```
Dump of file SATURN:[PCCOMMON.DUMP.DLL]PPMPROF.TMP;1 on 18-APR-1990 10:49:40.25
File ID (822,21,0)   End of file block 31 / Allocated 32

Virtual block number 13 (0000000D), 512 (0200) bytes

 C3FA8B58 5B591F07 74D80BFE 5E01F45E 881175C0 08000000 D09A5016 F4468D51 Q.F¶.P.Å....äu..^¶.^±.Üt..Y[X.ªü 000000
 26EBF900 20BA03EB 001CBA08 7500098A 00013D00 74006030 1874C008 08C4B31F ..á..ât.=m.t.=..¤..U.¤..Š.¤ .ªS& 000020
 06EBF9C0 33001CBA 0EEBF803 751A3F80 085E880A 5E8E0E74 4016FF87 F6FE5E8E .^±-...ət..^..^..?.u.½S.¤..3äªS. 000040
 C1880475 C9080C4E 88030FE9 CB5DE58B 0472FA5E 8E5F5EF8 6688FC46 28FE468B .F±+F=.f½^_.^ªr..[]ùÕ...N..èu..è 000060
 0074006D 301774C0 081F071E 00000F67 9A5016F4 46805152 1E530856 C51EEEEB ŠŸ.éV.S.RQ.F¶.P.g.......ât.=m.t. 000080
 0A744016 FF87F687 75C008F4 4688C2EB 00208AC7 EB001C8A CC750009 BA000130 =..¤..uä¤..Šú¤ .Šõ.F¶.äuñ-...ət. 0000A0
 F2FFFFB9 C033067E C4D788EC 885500A3 EBC03300 1CBAA6EB 02751A3F 8026DA88 .Õ&.?.u.$l¤..3äŠÈ.U.Š.■á-.3ä¿..· 0000C0
 117D16FD 1E3B065E 88EC8855 0442E900 B35756EC 885500CB 5DFA8B91 4901F7AE Ü%ïl..ª]ù.U.ŠVW*.ÕB.U.Š.^.;.».). 0000E0
 0B72D82B DC885A59 00CB5DE5 88C03302 EB0001B8 05744016 FF87F60C 7C00F883 .«.|.-...ət.¡..Š.3ä.[]ù.YZ.É+Ãr. 000100
 52000288 04F42EFF 5152FC5C E9C03305 754004F4 A1CB5152 E38B0572 04F81E3B ;.½.r..DRQùÀ¶.əu.3äÕ\■RQ..¶.£..R 000120
 07740001 3D40B112 7558C008 0000FFFF 9A521650 1653C48B 508716FF A780048B .å.Ï..ñP.áS.P.R......àXu.Ÿə=..t. 000140
 281EFFDB 33C28C19 2C06C41E E3192A0E 8B5AD479 4B16FF8F 08088106 7500023D =..u.Ÿ.....Kyå2..*.D.á.,..ò3Ü..( 000160
 BF1934BE 007CE819 34BF1934 BE19281E FF00038B C28C1930 06C401AE E9037319 .s.ÕÜ.á.0..ó£....(./4.«4.Õ|./4.« 000180
 348ED88E 007CB8C3 0000FFFF 9A111968 0E016A08 7419383D 1934B800 73E81934 4.Òs.¡4.=8.t.j..h.......ù¡|..Á/4 0001A0
 348E003A E818B08F 1B808EEC 88550000 11149A00 6A006A03 6A0051E8 1938BF19 .«8.Òo.j.j.j......U.š/‾.« .Ò:./4 0001C0
 C033001A E81938BF 1938BE00 23E81938 BF1938BE EC8B5503 EB0031E8 1938BF19 .«8.Ò1.Š.U.š/8.«8.Ò#./8.«8.Ò..3ä 0001E0

Dump of file SATURN:[PCCOMMON.DUMP.DLL]PPMPROF.TMP;1 on 18-APR-1990 10:49:40.25
File ID (822,21,0)   End of file block 31 / Allocated 32

Virtual block number 14 (0000000E), 512 (0200) bytes

 8B04EF83 0E73F73B C319281E FF0002BB 07E3192A 0E880000 FFFF9A50 06468A50 P.F.P.......*.D.E....(.ü;%s..ÿ.. 000000
 8B00F0E9 037500BE 3639FF2B F62B5657 000014C8 00C3EEEB 1DFFF274 02450805 ..E.t·..ŠŸü.à...WV+-+.96ƒ.u.Õþ.. 000020
 145A9A04 C8681EF6 76FFF876 FF0C6AF8 5689F646 89F25689 F04689C0 2B00BE16 .ƒ.+â.Fþ.V·.F-.V½j..v½.v-.hà..Z. 000040
 47EA7500 3F8026F6 46FFF65E C400BCE9 03767FFF FE814619 74C00B0A C4831200 ...á..ât.F.±..v.ÕŸ.á^-.F-&.?.uõG 000060
 14029A04 6A500145 80BA7500 3F8026F6 5E8BF475 003F8026 F646FFF6 5EC40CEB Š.á^-.F-&.?.u¶.^-&.?.u¤.E.Pj.... 000080
 EE460BEC 4688FE56 89FC4689 02C48312 4513479A 56EE5689 EC468904 C483120F ...á..FŠ.VŸV.G.E..á..F■.V±.FŠ.FŸ 0000A0
 681EF076 FFF276FF 0C6A1907 16891905 A3EE568B EC468B66 74C20BFC 46886074 tm.F=.õtf.FŠ.VŸÈ......j..v·.vþ.h 0000C0
 46830257 89260789 26FE5688 FC468BEC 5EC42C74 C00B0AC4 830F4C14 5A9A04C8 à..Z.L..á..ât,á^Š.F=.V±&..&.W..F 0000E0
 F046FFF0 5EC4E8EB 0E74C00A 07B826FC 46FFFC5E C4078A26 F046FFF0 5EC404EC Š.á^þ.Fþ&..á^■.F■&...ât.Šõá^þ.Fþ 000100
 02030202 1601FA58 E90002B8 90CBC95F 5EA77500 3F8026F0 5EC4F475 003F8026 &.7.u¶á^þ&.7.ul^_èü.¡..ÕXª...... 000120
 00410235 02121211 0010120F 1600160C 0808070A 0C090C08 0C070906 00051804 ...........................5.A. 000140
 02CE0BA4 00840982 0A810A80 16060972 1C70206D 006C0859 00570053 00520243 C.R.S.W.Y.l.m p.r...........È.ö. 000160
 CB5DE58B 99FFFFB8 0008E8CB 5DE58B99 FFFFB816 F4168916 FBA31608 000008D7 ■.....È«...¶.¡....[]ùÒ..¡....[]ù 000180
 3C430A76 243C0472 133CF7E2 43431674 073A2E1B 75E40A00 24B9129A BB16FBA3 È«.È..¿$..õu..:.t.CCã%<.r.<$v.C< 0001A0
 80260574 C308C08C 065EC4EC 885500C3 16F4A398 01478A2E 430176CA 3C0472BC ¥r.<õv.C..G..È¶.ü.U.šá^..â.üt.&. 0001C0
 25E80875 00191C3E 831E73FF F1300646 88575602 EC83EC88 55CB5DE5 8801FE4F Ot..[]ùW.š.š.VW.F.=þ.s..>...u.Õ% 0001E0

Dump of file SATURN:[PCCOMMON.DUMP.DLL]PPMPROF.TMP;1 on 18-APR-1990 10:49:40.25
File ID (822,21,0)   End of file block 31 / Allocated 32

Virtual block number 15 (0000000F), 512 (0200) bytes

 02C48311 C0154C9A 0676FF0B 750078E8 05740018 E8157500 82E8191C A3127400 .t.È..Õ..u.Õ..t.Õx.u..v..L.á..á. 000000
 0E4F8D50 501EC033 FE5E89FE E3834306 5E880776 065E3900 F08BCB5D E58B5E5F _^.[]ùEþ.9^.v..^.C.D±.^±3ä.PP.O. 000020
 DA8E0574 D20B1920 A3191E16 87C28838 74FFFA83 08C48313 7B16F89A 50028051 Q‾.P.½.(..á..ª.t8.õ....È ..●t..Õ 000040
 0AA30147 8D0002A3 0000A300 0AB80C47 89484800 08A3C033 D88EFE5E 880008A3 È...^±.Ä3äÈ..HH.G.¡..È..È...G.È. 000060
 8EC18CD2 08019AE8 19201E8E DB33064E 8BC08ED8 8CC31FD8 8C0006A3 00000500 ....È...Ä.ü.Ä.á.N.3Ü.. .Õ...●.è. 000080
 FFFFC2F7 FA5689F8 4689142F 17F69A06 76FF006A 0876FF00 6A560000 0AC8C3D9 ìùà...Vj..v.j..v..-./..F½.Vª%õ.. 0000A0
 6A561274 D008FE56 89FC4689 02C48314 4813479A 56F8768B 902FEB99 C0280674 t.+á.Š/..v½V.G.H..á..F■.V±.Ât.Vj 0000C0
 1E5657EC 885590CB C95EFE56 8BFC468B 9007EB08 C48313A7 17AE9A50 FE76FF00 ..v±P.Û.Ï..á.Š...F=.V±^èù.U.ŠWV. 0000E0
 C933FF44 8AA6F30A 76C5FE8B CB0309F7 AEF2C033 F788067E C4D98827 E30E4E8B .N.D'.\á-..%3ä·Ü%l.ù.±év.µÏ.D.3è 000100
 1E08568B 0646B80E 4E8800CB 5DE5885F 5E1FC188 D1F74949 04740477 FF453A26 &:E.w.t.l[%l.è.^_.[]ù..N..F..V.. 000120
 8BDAF700 D283D8F7 AA2D800A 79D2080E 750AF983 1374C00A 93FC071E 570A7EC5 é~.W..●..ât..ª.u..●y.‾-‾%Ü.●.%õ. 000140
 88E275C3 08C288AA 27040276 393C3004 D38792F1 F793F1F7 0274C00B D23392F7 %.3●.ât.%þ.%þ..Æ.0<9v..'‾.õ.ùuã. 000160
 88560000 06C800C8 5DE5885E 5F1F580A 8CF272C7 38014480 FF448805 86AC4F05 .O‾...D..D.;ùr·.ÕX._^.[]ù.à...V¡ 000180
 04C48314 14182A9A 53060E74 830A47F6 26FA5EC4 1CEBF62B FC5E8CFA 468904FA ª..Fª.^■+-Š.á^ª&-G..t..S.*....á. 0001A0
 065E88EC 885590CB C95EC68B D876FA46 3916EA16 8816E8A1 0CFA4683 46017440 ət.F.Fª.ÀÕ...õ.9FªvÄ.á^èù.U.š.^. 0001C0
 76E80005 88071E29 75003F83 19128B57 56EC8B55 CB50E58B 01FE4F80 04740B08 .Üt..O±..[]ùW.$VWE...?.u)..¡..Õv 0001E0
```

```
Dump of file SATURN:[PCCOMMON.DUMP.DLL]PPMPROF.TMP;1 on 18-APR-1990 10:49:40.25
File ID (822,21,0)   End of file block 31 / Allocated 32

Virtual block number 16 (00000010), 512 (0200) bytes

 3689FFFE FE44C704 C6830001 04C79619 14A31912 A3FE2440 24EB99C0 33057501 .u.3ä.S$a$±È..È...ú....6.úD±±..6 000000
 F273EEF9 83FEE180 FA744100 D0E9CB5D E5885E5F 0009E8C0 8ED88C06 4E881918 ...N..Ä.äÒ.._^.Í]ùÖÅ.At".Ä±.'Ÿs· 000020
 F7880002 05C20335 7401A8AD F0030088 1573C138 48437401 A8FE88AD FC027788 .w.•Ù.±´.tCH;ès..Å.ÞÙ´.t5.ô....¼ 000040
 1AB9DA8C C688FE4C FEF90305 E8058948 C128FE4C 89F9030C 74FE88E6 E8FE4489 .D±Š|.±t..'.L±+èH..Š..'±L±.6.Õ¿. 000060
 01A8ADF0 03FE8825 74FFFE3D 02192406 C626C302 7F891920 1E8C2605 74D13B11 .;|t.&.. ....Ú&6.$..=±.t%.±.ÞÙ´. 000080
 4788E6EB FE4489F7 8B000205 C203E274 01A8ADF0 03D0888C 73C13848 FE88F274 t·.±H;ès¥.Å.ÞÙ´.tã.ô....¼.D±Š|.G 0000A0
 3788191C 1E8E2605 74C73B15 DFBFD88C 12741924 0EFE2615 E8D88E04 74C00808 ..ât..ÄŠ.&±.$.t..Ä¢Ô.;út.&.....7 0000C0
 05740010 E8FE4DFE 0074005F E8984040 01240074 C6380068 E8C03306 778888EB ŠE.w.3äÒk.;6t.$.ªª.Ò_.t.±M±Ò..t. 0000E0
 A8FE4588 51C399C0 33024789 07881920 A3260474 C1381633 B9088C98 EB4E4E96 .NNŠ..Ä¿3.;èt.&È ...¯G.3ã.ÚQ.E±´ 000100
 0072C203 1572C603 C188F575 EAD10476 19221638 267FFF8A 414149C8 28037401 .t.+àIAAo..&;.".v.Íõu¼.ê.ór..ôr. 000120
 88FE8857 1874001D E85152C3 59C033E5 75EAD1D2 F7087500 0CE8C628 C223D2F7 %0#ô+6Ò..u.%0Íõu|3âYÙRQÒ..t.W.±. 000140
 B8505252 1ED23350 53C35A59 58FE5589 4AD72BD6 88067789 FFFEFE44 C7F203F0 Þ.·úD±±..w..ø+øJ.U±XYZÚSP3Ø.RRP¡ 000160
 7E830657 56EC8855 C3D20802 745B5A1F FFFA8308 C483151B 16F89A1F 06500001 ..P...½....á..'..Z[t..ØúU.šVW..~ 000180
 F7381174 4804C636 884CE827 720057E8 07754806 46880856 8800C68F 3875000A ..uB¢6..V..F.Hu.ÒW.r'ŠL.66.Ht.;¼ 0001A0
 99FFFF88 0675D208 047304C6 FE8104C6 8334735E 003EE856 0E468902 44880074 t..D..F.VÒ>.^s4.6..±6.s..Øu.|... 0001C0
 8804C636 89025C89 1489E675 C085F958 0000FFFF 9A50C033 501652C4 885021E8 ŠIP.6R.P3âP.....['.âul...\..66.. 0001E0

Dump of file SATURN:[PCCOMMON.DUMP.DLL]PPMPROF.TMP;1 on 18-APR-1990 10:49:40.25
File ID (822,21,0)   End of file block 31 / Allocated 32

Virtual block number 17 (00000011), 512 (0200) bytes

 2CE8F9F2 7504C6FE 8104C683 0C74024C 39F7880E 4E88C85D E5885E5F 07C033D3 Æ3ã._^.|]ù.N..%9L.t..6..±6.u·'$, 000000
 3BDE75C0 850000FF FF9A5153 137300C0 1E390675 F738C18E D3882672 1C03DA88 .Ö..F&.Æ.è;%u.9.â.s.SQ......âuB; 000020
 0C74DAF7 D788067E C45738E3 0C4E88EC 885500C3 D1880487 9200C016 890475F7 %u...â.....|ù.U.Š.N.DBWé~..ø¼Öt. 000040
 81C38C10 E30187AA F3C913AB F3E9D1E0 8A0A4688 D12BD187 D1030323 DB1BD128 +Í.Ù#Æ.Í.Í+Í.F..ÅÍÕµ¨.èµ^.ÍD..ù. 000060
 080C5E88 084688EC 8855C85D 08568806 46885FAA F3C913AB F3E9D1C3 8EFFFFC3 û...ûìÕµ¨.èµ^ .F..V.]ùU.Š.F..^.. 000080
 06468BC8 030C66F7 064688C8 88E3F700 08CA5DE5 88E3F706 468B0875 0A5E88D8 Ä.^.u..F.%D.|Ĵò..%D.à.F.%f..à.F. 0000A0
 F6265575 023C0324 0A478A26 065EC4F6 28560000 04C80008 CA5DE588 D103E3F7 %D.Í.|]ò..à...V+~á^.&.G.$.<.ùU&- 0000C0
 07882606 5E883974 0110EE87 F606D868 F9F7000C B99904FA 20C38815 75080A47 G..u..ù-'..¿..%'kÄ.-.Ÿ..t9.^.&.. 0000E0
 16E80EA4 9A50E42A 08478A26 0677FF26 0877FF26 50287EC0 08FC4689 06472826 &+G..F=.â-(P&.w.&.w.&.G.*ôP.Ê.Ò. 000100
 89260857 88260647 8826065E C4FFFF8E 200A4F80 26065EC4 0874FC46 3808C483 .6.;F=t.á^.&.O. ƒ..á^.&.G.&.W.&. 000120
 0003187E 000200D1 00060FF0 0203000C CBC95EC6 88000004 47C72602 57892607 .&.W.&úG....6^èù....Þ...Í...~... 000140
 0002174C 01030007 0002112E 01030005 00021166 01030000 00051668 00020000 ....h.......f...............L... 000160
 00021080 0103003A 00020ED0 01030088 000217E1 01050026 00021797 01030022 "........&...Ä.......Å...:...¯... 000180
 00000000 00000000 00000000 0000005C 00020CC9 0103005B 00020CDC 01030040 M...É...[...è...\............... 0001A0
 6F43202D 20797261 7262694C 20656069 54206E75 5220534D 00000000 00000000 ........MS Run-Time Library - Co 0001C0
 70726F43 2074666F 736F7263 6940202C 38383931 20296328 20746867 69727970 pyright (c) 1988, Microsoft Corp 0001E0

Dump of file SATURN:[PCCOMMON.DUMP.DLL]PPMPROF.TMP;1 on 18-APR-1990 10:49:40.25
File ID (822,21,0)   End of file block 31 / Allocated 32

Virtual block number 18 (00000012), 512 (0200) bytes

 20656C69 666F7270 20657461 64705500 6560614E 203A656C 69666F72 50000011 ...Profile: Name.Update profile  000000
 61647055 00676E69 74746573 20656C69 666F7270 2065676E 61684300 6560616E name.Change profile setting.Upda 000020
 006C6564 6F4D2073 7365636F 7250006E 6F747475 6220656C 69666F72 70206574 te profile button.Process Model. 000040
 00000000 00002320 2D280029 6C6C756E 2800296C 6C756E28 00656C69 666F7250 Profile.(null).(null).+- #...... 000060
 00000000 00000000 00000000 00000000 00000000 0000193A 1BB01149 1BB01B80 ¯.¯.I.¯.:....................... 000080
 00000000 00000000 00000000 00000000 00000000 00000000 00000000 00000000 ................................ 0000A0
 00000000 00000000 00000000 00000000 00000000 00000000 00000000 00000000 ................................ 0000C0
 00000000 00000000 00000000 00000000 00000000 00000000 00000000 00000000 ................................ 0000E0
 00000000 00000000 00000000 00000000 00000000 00000000 00000000 00000000 ................................ 000100
 00000000 00000000 00000000 00000000 00000000 00000000 00000000 00000000 ................................ 000120
 00000000 00000000 00000000 00000000 00000000 00000000 00000000 00000000 ................................ 000140
 00000000 00000000 00000000 00000000 00000000 00000000 00000000 00000000 ................................ 000160
 00000000 00000000 00000000 00000000 00000000 00000000 00000000 00000000 ................................ 000180
 00000000 00000000 00000000 00000000 00000000 00000000 00000000 00000000 ................................ 0001A0
 00000000 00000000 00000000 00000000 00000000 00000000 00000000 00000000 ................................ 0001C0
 00000000 00000000 00000000 00000000 00000000 00000000 00000000 00000000 ................................ 0001E0
```

```
Dump of file SATURN:[PCCOMMON.DUMP.DLL]PPMPROF.TMP;1 on 18-APR-1990 10:49:40.25
File ID (822,21,0)   End of file block 31 / Allocated 32

Virtual block number 19 (00000013), 512 (0200) bytes

00000000 00000000 00000000 00000000 00000000 00000000 00000000 00000000 ................................ 000000
00000000 00000000 00000000 00000000 00000000 00000000 00000000 00000000 ................................ 000020
00000000 00000000 00000000 00000000 00000000 00000000 00000000 00000000 ................................ 000040
00000000 00000000 00000000 00000000 00000000 00000000 00000000 00000000 ................................ 000060
00000000 00000000 00000000 00000000 00000000 00000000 00000000 00000000 ................................ 000080
00000000 00000000 00000000 00000000 00000000 00000000 00000000 00000000 ................................ 0000A0
00000000 00000000 00000000 00000000 00000000 00000000 00000000 00000000 ................................ 0000C0
00000000 00000000 00000000 00000000 00000000 00000000 00000000 00000000 ................................ 0000E0
00000000 00000000 00000000 00000000 00000000 00000000 00000000 00000000 ................................ 000100
00000000 00000000 00000000 00000000 00000000 00000000 00000000 00000000 ................................ 000120
00000000 00000000 00000000 00000000 00000000 00000000 00000000 00000000 ................................ 000140
00000000 00000000 00000000 00000000 00000000 00000000 00000000 00000000 ................................ 000160
00000000 00000000 00000000 00000000 00000000 00000000 00000000 00000000 ................................ 000180
00000000 00000000 00000000 00000000 00000000 00000000 00000000 00000000 ................................ 0001A0
00000000 00000000 00000000 00000000 00000000 00000000 00000000 00000000 ................................ 0001C0
00000000 00000000 00000000 00000000 00000000 00000000 00000000 00000000 ................................ 0001E0

Dump of file SATURN:[PCCOMMON.DUMP.DLL]PPMPROF.TMP;1 on 18-APR-1990 10:49:40.25
File ID (822,21,0)   End of file block 31 / Allocated 32

Virtual block number 20 (00000014), 512 (0200) bytes

00000000 00000000 00000000 00000000 00000000 00000000 00000000 00000000 ................................ 000000
00000000 00000000 00000000 00000000 00000000 00000000 00000000 00000000 ................................ 000020
00000000 00000000 00000000 00000000 00000000 00000000 00000000 00000000 ................................ 000040
00000000 00000000 00000000 00000000 00000000 00000000 00000000 00000000 ................................ 000060
1294FFFF 12940000 0000003D 4F464E49 5F454C49 465F435F 00C60000 00000000 ......6._C_FILE_INFO=........... 000080
00000502 00000200 FFFFFFFF 01010000 000004E8 129404E4 129404E0 129404DC É...À...ð...ð................... 0000A0
00000202 00000000 00000000 00000102 00000000 00000000 00000001 19380000 ..8............................. 0000C0
00000000 00000000 00000000 00000000 00000000 00000000 00000000 00000000 ................................ 0000E0
00000000 00000000 00000000 00000000 00000000 00000000 00000000 00000000 ................................ 000100
00000000 00000000 00000000 00000000 00000000 00000000 00000000 00000000 ................................ 000120
00000000 00000000 00000000 00000000 00000000 00000000 00000000 00000000 ................................ 000140
00000000 00000000 00000000 00000000 00000000 00000000 00000000 00000000 ................................ 000160
00000000 00000000 00000000 00000000 00000000 00000000 00000000 00000000 ................................ 000180
00000000 00000000 00000000 00000000 00000000 00000000 00000000 00000000 ................................ 0001A0
00000000 00000000 00000000 00000000 00000000 00000000 00000000 00000000 ................................ 0001C0
00000000 00000000 00000000 00000000 00000000 00000000 00000000 00000000 ................................ 0001E0

Dump of file SATURN:[PCCOMMON.DUMP.DLL]PPMPROF.TMP;1 on 18-APR-1990 10:49:40.25
File ID (822,21,0)   End of file block 31 / Allocated 32

Virtual block number 21 (00000015), 512 (0200) bytes

00000000 00000000 00000000 00000000 00000000 00000000 00000000 00000000 ................................ 000000
00000000 00000000 00000000 00000000 00000000 00000000 00000000 00000000 ................................ 000020
00000000 00000000 00000000 00000000 00000000 00000000 00000000 00000000 ................................ 000040
00000000 00000000 00000000 00000000 00000000 00000000 00000000 00000000 ................................ 000060
00000000 00000000 00000000 00000000 00000000 00000000 00000000 00000000 ................................ 000080
00000000 00000000 00000000 00000000 00000000 00000000 00000000 00000000 ................................ 0000A0
00000000 00000000 00000000 00000000 00000000 00000000 00000000 00000000 ................................ 0000C0
00000000 00000000 00000000 00000000 00000000 00000000 00000000 00000000 ................................ 0000E0
00000000 00000000 00000000 00000000 00000000 00000000 00000000 00000000 ................................ 000100
00000000 00000000 00000000 00000000 00000000 00000000 00000000 00000000 ................................ 000120
00000000 00000000 00000000 00000000 00000000 00000000 00000000 00000000 ................................ 000140
00000000 00000000 00000000 00000000 00000000 00000000 00000000 00000000 ................................ 000160
00000000 00000000 00000000 00000000 00000000 00000000 00000000 00000000 ................................ 000180
00000000 00000000 00000000 00000000 00000000 00000000 00000000 00000000 ................................ 0001A0
00000000 00000000 00000000 00000000 00000000 00000000 00000000 00000000 ................................ 0001C0
00000000 00000000 00000000 00000000 00000000 00000000 00000000 00000000 ................................ 0001E0
```

```
Dump of file SATURN:[PCCOMMON.DUMP.DLL]PPMPROF.TMP;1 on 18-APR-1990 10:49:40.25
File ID (822,21,0)   End of file block 31 / Allocated 32

Virtual block number 22 (00000016), 512 (0200) bytes

00000000 00000000 00000000 00000000 00000000 00000000 00000000 00000000 ................................ 000000
00000000 00000000 00000000 00000000 00000000 00000000 00000000 00000000 ................................ 000020
00000000 00000000 00000000 00000000 00000000 00000000 00000000 00000000 ................................ 000040
00000000 00000000 00000000 00000000 00000000 00000000 00000000 00000000 ................................ 000060
00000000 00000000 00000000 00000000 00000000 00000000 00000000 00000000 ................................ 000080
00000000 00000000 00000000 00000000 00000000 00000000 00000000 00000000 ................................ 0000A0
00000000 00000000 00000000 00000000 00000000 00000000 00000000 00000000 ................................ 0000C0
00000000 00000000 00000000 00000000 00000000 00000000 00000000 00000000 ................................ 0000E0
00000000 00000000 00000000 00000000 00000000 00000000 00000000 00000000 ................................ 000100
00000000 00000000 00000000 00000000 00000000 00000000 00000000 00000000 ................................ 000120
00000000 00000000 00000000 00000000 00000000 00000000 00000000 00000000 ................................ 000140
00000000 00000000 00000000 00000000 00000000 00000000 00000000 00000000 ................................ 000160
00000000 00000000 00000000 00000000 00000000 00000000 00000000 00000000 ................................ 000180
00000000 00000000 00000000 00000000 00000000 00000000 00000000 00000000 ................................ 0001A0
00000000 00000000 00000000 00000000 00000000 00000000 00000000 00000000 ................................ 0001C0
00000000 00000000 00000000 00000000 00000000 00000000 00000000 00000000 ................................ 0001E0

Dump of file SATURN:[PCCOMMON.DUMP.DLL]PPMPROF.TMP;1 on 18-APR-1990 10:49:40.25
File ID (822,21,0)   End of file block 31 / Allocated 32

Virtual block number 23 (00000017), 512 (0200) bytes

00000000 00000000 00000000 00000000 00000000 00000000 00000000 00000000 ................................ 000000
00000000 00000000 00000000 00000000 00000000 00000000 00000000 00000000 ................................ 000020
00000000 00000000 00000000 00000000 00000000 00000000 00000000 00000000 ................................ 000040
00000000 00000000 00000000 00000000 00000000 00000000 00000000 00000000 ................................ 000060
00000000 00000000 00000000 00000000 00000000 00000000 00000000 00000000 ................................ 000080
00000000 00000000 00000000 00000000 00000000 00000000 00000000 00000000 ................................ 0000A0
00000000 00000000 00000000 00000000 00000000 00000000 00000000 00000000 ................................ 0000C0
00000000 00000000 00000000 00000000 00000000 00000000 00000000 00000000 ................................ 0000E0
00000000 00000000 00000000 00000000 00000000 00000000 00000000 00000000 ................................ 000100
00000000 00000000 00000000 00000000 00000000 00000000 00000000 00000000 ................................ 000120
00000000 00000000 00000000 00000000 00000000 00000000 00000000 00000000 ................................ 000140
00000000 00000000 00000000 00000000 00000000 00000000 00000000 00000000 ................................ 000160
00000000 00000000 00000000 00000000 00000000 00000000 00000000 00000000 ................................ 000180
00000000 00000000 00000000 00000000 00000000 00000000 00000000 00000000 ................................ 0001A0
00000000 00000000 00000000 00000000 00000000 00000000 00000000 00000000 ................................ 0001C0
00000000 00000000 00000000 00000000 00000000 00000000 00000000 00000000 ................................ 0001E0

Dump of file SATURN:[PCCOMMON.DUMP.DLL]PPMPROF.TMP;1 on 18-APR-1990 10:49:40.25
File ID (822,21,0)   End of file block 31 / Allocated 32

Virtual block number 24 (00000018), 512 (0200) bytes

00000000 00000000 00000000 00000000 00000000 00000000 00000000 00000000 ................................ 000000
00000000 00000000 00000000 00000000 00000000 00000000 00000000 00000000 ................................ 000020
00000000 00000000 00000000 00000000 00000000 00000000 00000000 00000000 ................................ 000040
00000000 00000000 00000000 00000000 00000000 00000000 00000000 00000000 ................................ 000060
00000000 00000000 00000000 00000000 00000000 00000000 00000000 00000000 ................................ 000080
00000000 00000000 00000000 00000000 00000000 00000000 00000000 00000000 ................................ 0000A0
00000000 00000000 00000000 00000000 00000000 00000000 00000000 00000000 ................................ 0000C0
00000000 00000000 00000000 00000000 00000000 00000000 00000000 00000000 ................................ 0000E0
00000000 00000000 00000000 00000000 00000000 00000000 00000000 00000000 ................................ 000100
00000000 00000000 00000000 00000000 00000000 00000000 00000000 00000000 ................................ 000120
00000000 00000000 00000000 00000000 00000000 00000000 00000000 00000000 ................................ 000140
00000000 00000000 00000000 00000000 00000000 00000000 00000000 00000000 ................................ 000160
00000000 00000000 00000000 00000000 00000000 00000000 00000000 00000000 ................................ 000180
00000000 00000000 00000000 00000000 00000000 00000000 00000000 00000000 ................................ 0001A0
00000000 00000000 00000000 00000000 00000000 00000000 00000000 00000000 ................................ 0001C0
00000000 00000000 00000000 00000000 00000000 00000000 00000000 00000000 ................................ 0001E0
```

```
Dump of file SATURN:[PCCOMMON.DUMP.DLL]PPMPROF.TMP;1 on 18-APR-1990 10:49:40.25
File ID (822,21,0)   End of file block 31 / Allocated 32

Virtual block number 25 (00000019), 512 (0200) bytes

00000000 00000000 00000000 00000000 00000000 00000000 00000000 00000000 ................................ 000000
00000000 00000000 00000000 00000000 00000000 00000000 00000000 00000000 ................................ 000020
00000000 00000000 00000000 00000000 00000000 00000000 00000000 00000000 ................................ 000040
00000000 00000000 00000000 00000000 00000000 00000000 00000000 00000000 ................................ 000060
00000000 00000000 00000000 00000000 00000000 00000000 00000000 00000000 ................................ 000080
00000000 00000000 00000000 00000000 00000000 00000000 00000000 00000000 ................................ 0000A0
00000000 00000000 00000000 00000000 00000000 00000000 00000000 00000000 ................................ 0000C0
00000000 00000000 00000000 00000000 00000000 00000000 00000000 00000000 ................................ 0000E0
00000000 00000000 00000000 00000000 00000000 00000000 00000000 00000000 ................................ 000100
00000000 00000000 00000000 00000000 00000000 00000000 00000000 00000000 ................................ 000120
00000000 00000000 00000000 00000000 00000000 00000000 00000000 00000000 ................................ 000140
00000000 00000000 00000000 00000000 00000000 00000000 00000000 00000000 ................................ 000160
00000000 00000000 00000000 00000000 00000000 00000000 00000000 00000000 ................................ 000180
00000000 00000000 00000000 00000000 00000000 00000000 00000000 00000000 ................................ 0001A0
00000000 00000000 00000000 00000000 00000000 00000000 00000000 00000000 ................................ 0001C0
00000000 00000000 00000000 00000000 00000000 00000000 00000000 00000000 ................................ 0001E0

Dump of file SATURN:[PCCOMMON.DUMP.DLL]PPMPROF.TMP;1 on 18-APR-1990 10:49:40.25
File ID (822,21,0)   End of file block 31 / Allocated 32

Virtual block number 26 (0000001A), 512 (0200) bytes

00000000 00000000 00000000 00000000 00000000 00000000 00000000 00000000 ................................ 000000
00000000 00000000 00000000 00000000 00000000 00000000 00000000 00000000 ................................ 000020
00000000 00000000 00000000 00000000 00000000 00000000 00000000 00000000 ................................ 000040
00000000 00000000 00000000 00000000 00000000 00000000 00000000 00000000 ................................ 000060
00000000 00000000 00000000 00000000 00000000 00000000 00000000 00000000 ................................ 000080
00000000 00000000 00000000 00000200 00010000 00000000 00000000 00000000 ................................ 0000A0
00000000 00000000 00000000 00000000 00000000 00000000 00000000 00000000 ................................ 0000C0
00000000 00000000 00000000 00000000 00000000 00000000 00000000 00000000 ................................ 0000E0
00000000 00000000 00000000 00000000 00000000 00000000 00000000 00000000 ................................ 000100
00000000 00000000 00000000 00000000 00000000 00000000 00000000 00000000 ................................ 000120
00000000 00000000 00000000 00000000 00000000 00000000 00000000 00000000 ................................ 000140
00000000 00000000 00000000 00000000 00000000 00000000 00000000 00000000 ................................ 000160
00000000 00000000 00000000 00000000 00000000 00000000 00000000 00000000 ................................ 000180
00000000 00000000 00000000 00000000 00000000 00000000 00000000 00000000 ................................ 0001A0
00000000 00000000 00000000 00000000 00000000 00000000 00000000 00000000 ................................ 0001C0
00000000 00000000 00000000 00000000 00000000 00000000 00000000 00000000 ................................ 0001E0

Dump of file SATURN:[PCCOMMON.DUMP.DLL]PPMPROF.TMP;1 on 18-APR-1990 10:49:40.25
File ID (822,21,0)   End of file block 31 / Allocated 32

Virtual block number 27 (0000001B), 512 (0200) bytes

00000000 00000000 00000000 00000000 00000000 00000000 00000000 00000000 ................................ 000000
00000000 00000000 00000000 00000000 00000000 00000000 00000000 00000000 ................................ 000020
00000000 00000000 00000000 00000000 00000000 00000000 00000000 00000000 ................................ 000040
00000000 00000000 00000000 00000000 00000000 00000000 00000000 00000000 ................................ 000060
00000000 00000000 00000000 00000000 00000000 00000000 00000000 00000000 ................................ 000080
00000000 00000000 00000000 00000000 00000000 00000000 00000000 00000000 ................................ 0000A0
00000000 00000000 00000000 00000000 00000000 00000000 00000000 00000000 ................................ 0000C0
00000000 00000000 00000000 00000000 00000000 00000000 00000000 00000000 ................................ 0000E0
00000000 00000000 00000000 00000000 00000000 00000000 00000000 00000000 ................................ 000100
00000000 00000000 00000000 00000000 00000000 00000000 00000000 00000000 ................................ 000120
00000000 00000000 00000000 00000000 00000000 00000000 00000000 00000000 ................................ 000140
00000000 00000000 00000000 00000000 00000000 00000000 00000000 00000000 ................................ 000160
00000000 00000000 00000000 00000000 00000000 00000000 00000000 00000000 ................................ 000180
00000000 00000000 00000000 00000000 00000000 00000000 00000000 00000000 ................................ 0001A0
00000000 00000000 00000000 00000000 00000000 00000000 00000000 00000000 ................................ 0001C0
00000000 00000000 00000000 00000000 00000000 00000000 00000000 00000000 ................................ 0001E0
```

```
Dump of file SATURN:[PCCOMMON.DUMP.DLL]PPMPROF.TMP;1 on 18-APR-1990 10:49:40.25
File ID (822,21,0)   End of file block 31 / Allocated 32

Virtual block number 28 (0000001C), 512 (0200) bytes

00000000 00000000 00000000 00000000 00000000 00000000 00000000 00000000 ................................ 000000
00000000 00000000 00000000 00000000 00000000 00000000 00000000 00000000 ................................ 000020
00000000 00000000 00000000 00000000 00000000 00000000 00000000 00000000 ................................ 000040
00000000 00000000 00000000 00000000 00000000 00000000 00000000 00000000 ................................ 000060
00000000 00000000 00000000 00000000 00000000 00000000 00000000 00000000 ................................ 000080
00000000 00000000 00000000 00000000 00000000 00000000 00000000 00000000 ................................ 0000A0
00000000 00000000 00000000 00000000 00000000 00000000 00000000 00000000 ................................ 0000C0
00000000 00000000 00000000 00000000 00000000 00000000 00000000 00000000 ................................ 0000E0
00000000 00000000 00000000 00000000 00000000 00000000 00000000 00000000 ................................ 000100
00000000 00000000 00000000 00000000 00000000 00000000 00000000 00000000 ................................ 000120
00000000 00000000 00000000 00000000 00000000 00000000 00000000 00000000 ................................ 000140
00000000 00000000 00000000 00000000 00000000 00000000 00000000 00000000 ................................ 000160
00000000 00000000 00000000 00000000 00000000 00000000 00000000 00000000 ................................ 000180
00000000 00000000 00000000 00000000 00000000 00000000 00000000 00000000 ................................ 0001A0
00000000 00000000 00000000 00000000 00000000 00000000 00000000 00000000 ................................ 0001C0
00000000 00000000 00000000 00000000 00000000 00000000 00000000 00000000 ................................ 0001E0

Dump of file SATURN:[PCCOMMON.DUMP.DLL]PPMPROF.TMP;1 on 18-APR-1990 10:49:40.25
File ID (822,21,0)   End of file block 31 / Allocated 32

Virtual block number 29 (0000001D), 512 (0200) bytes

00000000 00000000 00000000 00000000 00000000 00000000 00000000 00000000 ................................ 000000
00000000 00000000 00000000 00000000 00000000 00000000 00000000 00000000 ................................ 000020
00000000 00000000 00000000 00000000 00000000 00000000 00000000 00000000 ................................ 000040
00000000 00000000 00000000 00000000 00000000 00000000 00000000 00000000 ................................ 000060
00000000 00000000 00000000 00000000 00000000 00000000 00000000 00000000 ................................ 000080
81010000 00010000 00000000 00000000 00000000 00C810E2 00000000 00000000 ........ã.à..................... 0000A0
00000000 00000000 00000000 00000000 00000000 00000000 00000000 00008181 ................................ 0000C0
00000000 00000000 00000000 00000000 00000000 00000000 00000000 00000000 ................................ 0000E0
00000000 00000000 00000000 00000000 00000000 00000000 00000000 00000000 ................................ 000100
00000000 00000000 00000000 00000000 00000000 00000000 00000000 00000000 ................................ 000120
00000000 00000000 00000000 00000000 00000000 00000000 00000000 00000000 ................................ 000140
00000000 00000000 00000000 00000000 00000000 00000000 00000000 00000000 ................................ 000160
0A000000 00000000 00000000 00000000 00000000 00000000 00000000 00000000 ................................ 000180
0A0A0A0A 0A0A0A0A 0A0A0A0A 0A0A0A0A 0A0A0A0A 0A0A0A0A 0A0A0A0A 0A0A0A0A ................................ 0001A0
0A0A0A0A 0A0A0A0A 0A0A0A0A 0A0A0A0A 0A0A0A0A 0A0A0A0A 0A0A0A0A 0A0A0A0A ................................ 0001C0
                                                                          ................................ 0001E0

Dump of file SATURN:[PCCOMMON.DUMP.DLL]PPMPROF.TMP;1 on 18-APR-1990 10:49:40.25
File ID (822,21,0)   End of file block 31 / Allocated 32

Virtual block number 30 (0000001E), 512 (0200) bytes

0A0A0A0A 0A0A0A0A 0A0A0A0A 0A0A0A0A 0A0A0A0A 0A0A0A0A 0A0A0A0A 0A0A0A0A ................................ 000000
0A0A0A0A 0A0A0A0A 0A0A0A0A 0A0A0A0A 0A0A0A0A 0A0A0A0A 0A0A0A0A 0A0A0A0A ................................ 000020
0A0A0A0A 0A0A0A0A 0A0A0A0A 0A0A0A0A 0A0A0A0A 0A0A0A0A 0A0A0A0A 0A0A0A0A ................................ 000040
0A0A0A0A 0A0A0A0A 0A0A0A0A 0A0A0A0A 0A0A0A0A 0A0A0A0A 0A0A0A0A 0A0A0A0A ................................ 000060
000A0A0A 0A0A0A0A 0A0A0A0A 0A0A0A0A 0A0A0A0A 0A0A0A0A 0A0A0A0A 0A0A0A0A ................................ 000080
00000000 00000000 00000000 00000000 00000000 00000000 00000000 00000000 ................................ 0000A0
404E3C3C FFFFFFFF 04EC14FA 00000000 00000000 00000000 00000000 20000000 ................................ 0000C0
000A0077 6F6C6672 65766F20 68636174 73202D0A 00303030 36520000 3E3E4753 ... ..................*.š.....<<NM 0000E0
0A003020 79622065 64697669 64207265 6765746E 69202D0A 00333030 36520003 SG>>..R6000..- stack overflow... 000100
726F6620 65636170 73206867 756F6E65 20746F6E 20200A00 38303036 52000800 ..R6003..- integer divide by 0.. 000120
756F6E65 20746F6E 20200A00 39303036 52000900 0A007374 6E656075 67726120 ...R6008..- not enough space for 000140
000A0000 FC000A00 746E656D 6E6F7269 766E6520 726F6620 65636170 73206867  arguments.....R6009..- r t enou 000160
6F6C6620 200A0032 30303652 00020020 726F7272 6520656D 69742D6E 757200FF gh space for environment.. •.... 000180
00020003 FFFFFF00 0A006465 64616F6C 20746F6E 20746E69 6F702067 6E697461 ..run-time error ...R6002..  flo 0001A0
00000000 00000000 00000000 000516EA 00020000 000404FC 00020000 00031936 ating point not loaded.......... 0001C0
                                                                        6.......▪.......õ............... 0001E0
```

```
Dump of file SATURN:[PCCOMMON.DUMP.DLL]PPMPROF.TMP;1 on 18-APR-1990 10:49:40.25
File ID (822,21,0)   End of file block 31 / Allocated 32

Virtual block number 31 (0000001F), 512 (0200) bytes

007D9400 0090011C 00000001 00000008 00000000 FFFF0001 000E0352 000001D0 Å...R.........................). 000000
00750006 80010001 01210004 00050000 00000000 011DFFFF 01000087 0100FFBA ¤....................!.......u. 000020
008E0076 00318002 00080126 00040006 00000000 0000FFFF FFFF0101 00080023 #...................&.....1.v./. 000040
000800C2 005D0015 80010001 012B0029 00050000 00000000 FFFFFFFF 01020008 ................).+.......].ó... 000060
0108000A 005C004D 001A8002 00030155 000F0003 00000000 0000FFFF FFFF0107 ................U.......M.\..... 000080
FFFF0109 000A008E 00400019 80020003 0165001B 00030000 00000000 FFFFFFFF ..............e.......@......... 0000A0
FFFFFFFF 010A0008 008E002D 00138001 00010181 00290005 00000000 0000FFFF ..........)........-./.......... 0000C0
0000FFFF FFFF0108 000A0082 001A0018 80020003 01AB0013 00030000 00000000 ................................ 0000E0
00000000 FFFFFFFF 010C000A 0061000E 00188002 0003018F 00100003 00000000 ........¢........a.............. 000100
20726F69 76616865 42206567 72654D20 6C65646F 4D007478 65540065 6D614E00 .Name.Text.Model Merge Behavior  000120
6A624F20 656E6962 6D6F4300 73746365 6A624F20 676E6968 6374614D 20726F66 for Matching Objects.Combine Obj 000140
656D614E 2077654E 20687469 77207463 656A624F 20747265 736E4900 73746365 ects.Insert Object with New Name 000160
6C462061 74614420 6E692073 7463656A 624F2066 6F20746E 65606563 616C5000 .Placement of Objects in Data Fl 000180
4D00746E 65606563 616C5020 63697461 6D6F7475 41006D61 72676169 4420776F ow Diagram.Automatic Placement.M 0001A0
00000000 00000000 00000000 00000000 00746E65 6D656361 6C50206C 61756E61 anual Placement................. 0001C0
00000000 00000000 00000000 00000000 00000000 00000000 00000000 00000000 ................................ 0001E0

Dump of file SATURN:[PCCOMMON.DUMP.DLL]PPMTAB.TMP;1 on 18-APR-1990 10:49:45.16
File ID (851,43,0)   End of file block 3 / Allocated 4

Virtual block number 1 (00000001), 512 (0200) bytes

00000000 00000040 00000000 00000088 0000FFFF 00000004 00000003 00175A40 MZ..............|.......@....... 000000
00000080 00000000 00000000 00000000 00000000 00000000 00000000 00000000 ................................ 000020
6F6E6E61 63206D61 72676F72 70207369 685421CD 4C01B821 CD09B400 0EBA1F0E ..¤..Ç.ë!|.Lë!This program canno 000040
00000000 00000024 0A0D0D2E 65646F6D 20534F44 206E6920 6E757220 65622074 t be run in DOS mode....$....... 000060
00030006 00000000 00020000 00000000 00048009 12660279 000700B1 0505454E NE..Ÿ...y.f..................... 000080
00000000 00000000 00010001 00040000 00000138 0084007E 00740070 00400036 6.@.p.t.~...8................... 0000A0
00C00F21 001D003F 00480F00 00480039 00110F00 00110036 019E0F00 01900017 ........6.......9.H...H.?...!.à. 0000C0
00010000 00424154 4D505006 00010005 00341EF1 00340042 00300E21 00000000 ....!.0.B.4.þ.4......PPMTAB..... 0000E0
54494E49 4C4D4408 6C6D6403 4E49574D 5005534C 4C414353 4F440800 0010000A ......DOSCALLS.PMWIN.dml.DMLINIT 000100
6E61606B 63614227 00000165 0301014E 4654494E 49544553 4C4D440C 544F4C53 SLOT.DMLSETINITFN...e...'Bachman 000120
6D657473 79736275 7320656C 69666F72 70206C65 646F4D20 73736563 6F725020  Process Model profile subsystem 000140
FF7C86C7 D88EFFFF B81E5657 000084C8 00000000 01424154 59524555 51080000 ...QUERYTAB.....à...WV.¡...Áú.|. 000160
6A006A04 6A4C6A02 6A001E68 1E08C483 FFFF0000 9A001E68 1E006A00 98680028 (.h..j..h........á..h..j.jLj.j.j 000180
006A006A 016A026A 016A001E 681E0000 005D9A00 00681E50 16FF7C86 8D006A00 .j...|..P.h...]....h..j.j.j.j.j. 0001A0
6A006A00 6A016A02 6A036A00 1E681E00 00007C9A 0005681E 5016FF7C 868D006A j...|..P.h...|....h..j.j.j.j.j.j 0001C0
5EC4065F 8C260447 8926001E B8065EC4 0000FFFF 9A000868 1E5016FF 7C868D00 ...|..P.h.......ó^.¡..&.G.&._.ó^ 0001E0

Dump of file SATURN:[PCCOMMON.DUMP.DLL]PPMTAB.TMP;1 on 18-APR-1990 10:49:45.16
File ID (851,43,0)   End of file block 3 / Allocated 4

Virtual block number 2 (00000002), 512 (0200) bytes

16FF7E86 8D000018 47C72606 5EC40A47 8926FF7C 868B065E C4000308 47C72606 .&úG...ó^...|.&.G.ó^.&úG.. ..~.. 000000
2E36FF26 001A068E 006A006A 0000FFFF 9A5052FF FFBA002E B8001368 1E7F6A50 Pj..h..¡..¤..RP.....j.j.....&.6. 000020
0002C8CB C95F5E1F FE468900 00FFFF9A 5052001A 05085688 06468813 6A016A00 .j.j..F..V....RP......F±.^_èùà.. 000040
00008808 C483001E 00009A50 5201118A 0000B800 6A206AD8 8E000888 1E565700 .WV.¡...Äj-j.¡..¤..RP......ó.¡.. 000060
46FF0003 E90000FE 46C70000 FFFF9AFF FF68FFFF 68245468 24556850 5201438A ¤C.RPhU$hT$h..h.......ÚF±..Õ...F 000080
26001C06 8E20FE5E 68505200 8BBA0000 878D2DFE 5E680020 E9037201 FE7E83FE ±.-±.r.Õ .k^±-....¤E.RPk^±-....& 0000A0
8E00F5B8 1E565700 0000C8CB C95F5E1F 0000E900 01B8FFD4 E904C483 00009FFF .....ó.Õå.¡..Õ...^_èùà...WV.¡%.. 0000C0
C4000207 C726065E C4245507 C7260E5E C4010102 47C72600 0007C726 125EC4D8 Äá^.&ú...&úG...ó^.Ïú.U$ó^.&ú...ó 0000E0
02000000 03010800 02000000 01011C00 02000910 CAC95F5E 1F000007 C7260A5E ^.&ú....^_èò.................... 000100
03001400 03003E02 03000000 01011F00 05000000 05017D00 02000000 04016D00 .m........}................>...... 000120
00000000 00000000 00002000 03012202 03002C00 0100C001 03009D00 0200E101 .Ã.......á....,...."... ......... 000140
04000200 02000000 01000A00 020002CB 1F02C483 FFFF00ED 9A57D88E FFFFB81E .¡...ÄW.Û....ó..ù............... 000160
DAF7D788 067EC457 38E30C4E 8BEC8855 00000000 00000000 00000000 00000000 ................U.ë.N.D8Wá~..■¼Ö 000180
8C10E301 87AAF3C9 13ABF3E9 D1E08A0A 4688D128 D187D103 D3230B18 D12B0C74 t.+1.ÜW£.1.1+1.F..ÁIÕµ¨.èµ¨.1D.. 0001A0
00010033 01050001 CB5D0856 8B064688 5FAAF3C9 13ABF3E9 D1C38EFF FFC381C3 û.û...ùIÕµ¨.èµ^_.F..V.]ù....3... 0001C0
424F4752 4D004543 414C5000 454D414E 00000000 00000000 00000000 00000088 ................NAME.PLACE.MRGOB 0001E0
```

Dump of file SATURN:[PCCOMMON.DUMP.DLL]PPMTAB.TMP;1 on 18-APR-1990 10:49:45.16
File ID (851,43,0)   End of file block 3 / Allocated 4

Virtual block number 3 (00000003), 512 (0200) bytes

```
00000000 00000000 00000000 05001C00 0200011A FFFF0042 41544D50 5000534A JS.PPMTAB....................... 000000
00010001 00010001 00454C49 464F5250 5F4C4544 4F4D5F43 4F525013 00010352 R....PROC_MODEL_PROFILE......... 000020
00000000 00000000 00000000 00010001 00010001 00010001 00010001 00010001 ................................ 000040
00000000 00000000 00000000 00000000 00000000 00000000 00000000 00000000 ................................ 000060
00000000 00000000 00000000 00000000 00000000 00000000 00000000 00000000 ................................ 000080
00000000 00000000 00000000 00000000 00000000 00000000 00000000 00000000 ................................ 0000A0
00000000 00000000 00000000 00000000 00000000 00000000 00000000 00000000 ................................ 0000C0
00000000 00000000 00000000 00000000 00000000 00000000 00000000 00000000 ................................ 0000E0
00000000 00000000 00000000 00000000 00000000 00000000 00000000 00000000 ................................ 000100
00000000 00000000 00000000 00000000 00000000 00000000 00000000 00000000 ................................ 000120
00000000 00000000 00000000 00000000 00000000 00000000 00000000 00000000 ................................ 000140
00000000 00000000 00000000 00000000 00000000 00000000 00000000 00000000 ................................ 000160
00000000 00000000 00000000 00000000 00000000 00000000 00000000 00000000 ................................ 000180
00000000 00000000 00000000 00000000 00000000 00000000 00000000 00000000 ................................ 0001A0
00000000 00000000 00000000 00000000 00000000 00000000 00000000 00000000 ................................ 0001C0
00000000 00000000 00000000 00000000 00000000 00000000 00000000 00000000 ................................ 0001E0
```

Dump of file SATURN:[PCCOMMON.DUMP.DLL]PPRMAP.TMP;1 on 18-APR-1990 10:49:46.91
File ID (855,24,0)   End of file block 2 / Allocated 4

Virtual block number 1 (00000001), 512 (0200) bytes

```
00000000 00000040 00000000 000000B8 0000FFFF 000E0004 00000002 00195A4D MZ..............|.......@....... 000000
00000080 00000000 00000000 00000000 00000000 00000000 00000000 00000000 ................................ 000020
6F6E6E61 63206061 72676F72 70207369 685421CD 4C01B821 CD09B400 0EBA1F0E ..¤..Ç.ë|.LëIThis program canno 000040
00000000 00000024 0A0D002E 65646F6D 20534F44 206E6920 6E757220 65622074 t be run in DOS mode....$....... 000060
00000005 00000000 00020000 00000000 00048009 943E6F64 00070072 0505454E NE..r...do>..................... 000080
00000000 00000000 00010000 00040000 000000F9 00720072 00680068 00400032 2.@.h.h.r.r.*................... 0000A0
02100E21 00090021 00360E00 0036001D 000F0F00 000F001B 006C0F00 006C0013 ..l...l...........6...6.!...!... 0000C0
61606863 61421D00 00000003 01010000 0050414D 52505006 00020E21 00000000 ....!....PPRMAP...........Bachma 0000E0
50414D52 50500E00 00606574 73797362 75732079 74696C69 74552053 5542206E n BUS Utility subsystem...PPRMAP 000100
00FE46C7 D88EFFFF B81E5657 000002C8 00000000 00000001 434E5546 474E4950 PINGFUNC.........à...WV.|...ÁúF±. 000120
02FE5E69 0038E9FF FFB80006 E9037400 00008F83 0102FE5E 69FE46FF 0003E900 .Õ...F±i^±...¢...t.Õ..|..Õ8.i^±. 000140
00009A06 76FF0876 FF501E00 02050102 FE466900 1EE90374 00008739 0A468801 ..F.9...t.Õ..iF±......P.v..v.... 000160
00020002 900006CA C95F5E1F 0000E9FF FFB8FFB6 E90009E9 00008808 C483FFFF ...6.|..Õ..ÕR.|..Õ...^_èò....... 000180
01CB0001 B81F0000 3E89D88E FFFFB81E 00000000 00040008 00020000 00030050 P................|...Ä.>...|..ù. 0001A0
8ED88CFE 8B0A76C5 1EDE8BD7 8BEC8B55 00000000 00000000 00000500 02000200 ................U.Š.■.ß.év..±.Ä. 0001C0
8BF38BA4 F3C913A5 F3E9D149 A4027401 A8C78B06 7EC4D1F7 AEF2FFFF B9C033C0 å3â¿..·Ù%ìó~..ú˙.t.ÊlìÕµÊ.èµÊ.µ. 0001E0
```

Dump of file SATURN:[PCCOMMON.DUMP.DLL]PPRMAP.TMP;1 on 18-APR-1990 10:49:46.91
File ID (855,24,0)   End of file block 2 / Allocated 4

Virtual block number 2 (00000002), 512 (0200) bytes

```
00000000 00000046 4F525052 50502380 00000000 00000000 0000CB5D C28C1FFA *..δ]ù...........#PPRPROF....... 000000
00000000 00000000 00000000 00000000 00000000 00000000 00000000 00000000 ................................ 000020
00000000 00000000 00000000 00000000 00000000 00000000 00000000 00000000 ................................ 000040
00000000 00000000 00000000 00000000 00000000 00000000 00000000 00000000 ................................ 000060
00000000 00000000 00000000 00000000 00000000 00000000 00000000 00000000 ................................ 000080
00000000 00000000 00000000 00000000 00000000 00000000 00000000 00000000 ................................ 0000A0
00000000 00000000 00000000 00000000 00000000 00000000 00000000 00000000 ................................ 0000C0
00000000 00000000 00000000 00000000 00000000 00000000 00000000 00000000 ................................ 0000E0
00000000 00000000 00000000 00000000 00000000 00000000 00000000 00000000 ................................ 000100
00000000 00000000 00000000 00000000 00000000 00000000 00000000 00000000 ................................ 000120
00000000 00000000 00000000 00000000 00000000 00000000 00000000 00000000 ................................ 000140
00000000 00000000 00000000 00000000 00000000 00000000 00000000 00000000 ................................ 000160
00000000 00000000 00000000 00000000 00000000 00000000 00000000 00000000 ................................ 000180
00000000 00000000 00000000 00000000 00000000 00000000 00000000 00000000 ................................ 0001A0
00000000 00000000 00000000 00000000 00000000 00000000 00000000 00000000 ................................ 0001C0
00000000 00000000 00000000 00000000 00000000 00000000 00000000 00000000 ................................ 0001E0
```

```
Dump of file SATURN:[PCCOMMON.DUMP.DLL]PPRPROF.TMP;1 on 18-APR-1990 10:49:48.41
File ID (859,20,0)   End of file block 10 / Allocated 12

Virtual block number 1 (00000001), 512 (0200) bytes

00000000 00000040 00000000 00000088 0000FFFF 00000004 00000008 003E5A40 MZ>.............|...... a....... 000000
00000080 00000000 00000000 00000000 00000000 00000000 00000000 00000000 ........................ ...... 000020
6F6E6E61 63206061 72676F72 70207369 685421CD 4C01B821 CD09B400 0EBA1F0E ..¤..Ç.ë!¦.Lë!This progra. canno 000040
00000000 00000024 0A00002E 65646F60 20534F44 206E6920 6E757220 65622074 t be run in DOS mode....$....... 000060
00040006 00000000 00020000 00000000 00048009 0769F2F6 00070147 0505454E NE..G...-·i..................... 000080
00000000 00000000 00010001 00040000 000001CE 0087007F 00740070 00400030 0,a.p.t.....ö................... 0000A0
00400F21 003400E0 00360E00 0036000C 000F0F00 000F000A 0ABA0F00 0ABA0020  .¤...¤.Ö.......É.6...6.Å.4.!.a. 0000C0
01000000 464F5250 52505007 012C0004 04921EB1 049200E4 00020E21 00000000 ....!...Ö...Ÿ.....,..PPRPROF.... 0000E0
49574E58 54545241 54534C4D 44166C6D 64034E49 574D5005 0000B500 47000700 ...G.ç...PMWIN.dml.DMLSTARTTXNWI 000100
45494659 52455551 4C4D4400 4E585450 4F54534C 4D440A4F 444E5554 554F4854 THOUTUNDO.DMLSTOPTXN.DMLQUERYFIE 000120
524F4653 5345434F 52504D46 440E4D46 4403444C 45494654 45534C4D 4408444C LD.DMLSETFIELD.DFM.DFMPROCESSFOR 000140
46440F4D 54485952 45555140 4644084A 424F4C4D 44485952 45555140 46440F4D M.DFMQUERYHDMLOBJ.DFMQUERYHTM.DF 000160
4400444C 45494652 45545349 4745524D 46441047 4C44444E 57485952 45555140 MQUERYHWNDDLG.DFMREGISTERFIELD.D 000180
4F525003 454C5449 5440524F 46544553 4046440F 4E464553 4F4C4354 45534D46 FMSETCLOSEFN.DFMSETFORMTITLE.PRO 0001A0
696C6974 55205355 42206E61 60686361 421D0000 00000301 01444E45 4F525006 .PROEND........Bachman BUS Utili 0001C0
00000000 01504152 5453544F 4F425250 500C0000 6D657473 79736275 73207974 ty subsystem...PPRBOOTSTRAP..... 0001E0

Dump of file SATURN:[PCCOMMON.DUMP.DLL]PPRPROF.TMP;1 on 18-APR-1990 10:49:48.41
File ID (859,20,0)   End of file block 10 / Allocated 12

Virtual block number 2 (00000002), 512 (0200) bytes

4D680044 68004768 001C6801 24680676 FF0876FF D8BEFFFF B81E5657 000000C8 à...WV.|...Ä.v..v.h$.h..hG.hD.hM 000000
0676FF08 76FF02C1 E90001B8 0006E903 7500003D 00000056 9A006A00 6A006A00 .j.j.j..V...=..u.Õ..|..Õé..v..v. 000020
E9037500 003D0000 00849A00 6A006A00 6AFFFF68 007268FF FF68004A 68012668 h&.hJ.h..hr.h..j.j.j......=..u.Õ 000040
6A006A00 A96800A0 6800A368 00786801 4A680676 FF0876FF 0293E900 01B80006 ..|..Õ...v..v.hJ.hx.hÉ.h..h`.j.j 000060
68015E68 0676FF08 76FF0265 E90001B8 0006E903 7500003D 000000B2 9A006A00 .j..ý...=..u.Õ..|..Õe..v..v.h^.h 000080
01B80006 E9037500 003D0000 00E09A00 6A006A00 6A000768 00CE6800 016800A6 Ì.hÌ.hö.h■.j.j.j..Å...=..u.Õ..|. 0000A0
9A006A00 6A006A01 056800FC 6800FF68 00046801 72680676 FF0876FF 0237E900 .Õ7..v..v.hr.hå.h..h•.h..j.j.j.. 0000C0
20680102 68018668 0676FF08 76FF0209 E90001B8 0006E903 7500003D 0000010E ....=..u.Õ..|..Õ...v..v.h..h..h- 0000E0
01DBE900 01B80006 E9037500 00300000 013C9A00 6A006A00 6A013368 012A6801 .h*.h3.j.j.j..<...=..u.Õ..|..ÕÙ. 000100
0000016A 9A006A00 6A006A01 61680158 68015B68 01306802 12680676 FF0876FF .v..v.h..h0.h[.hX.ha.j.j.j..j... 000120
01866801 8968015E 68022668 0676FF08 76FF01AD E90001B8 0006E903 75000030 =..u.Õ..|..ÕÙ..v..v.h&.h^.h..h.. 000140
FF0876FF 017FE900 01B80006 E9037500 00300000 01989A00 6A006A00 6A018F68 h..j.j.j......=..u.Õ..|..Õ...v.. 000160
7500003D 000001C6 9A006A00 6A006A01 BD6801B4 68018768 018C6802 3A680676 v.h:.h..hñ.hÇ.h§.j.j.j..ó...=..u 000180
6AFFFF68 01E268FF FF6801BA 68024E68 0676FF08 76FF0151 E90001B8 0006E903 .Õ..|..ÕQ..v..v.hN.ho.h..hã.h..j 0001A0
62680676 FF0876FF 0123E900 01B80006 E9037500 003D0000 01F49A00 6A006A00 .j.j..¶...=..u.Õ..|..Õ#..v..v.hb 0001C0
0006E903 75000030 00000222 9A006A00 6A006A02 19680210 68021368 01E86802 .hÒ.h..h..h..j.j.j.."...=..u.Õ.. 0001E0

Dump of file SATURN:[PCCOMMON.DUMP.DLL]PPRPROF.TMP;1 on 18-APR-1990 10:49:48.41
File ID (859,20,0)   End of file block 10 / Allocated 12

Virtual block number 3 (00000003), 512 (0200) bytes

6A006A00 6A024768 023E6802 41680216 68027668 0676FF08 76FF00F5 E90001B8 |..Õ%..v..v.hv.h..hA.h>.hG.j.j.j 000000
02446801 9A680676 FF0876FF 00C7E900 01B80006 E9037500 003D0000 02509A00 ..P...=..u.Õ..|..Õú..v..v.h..hD. 000020
E90001B8 0006E903 7500003D 0000027E 9A006A00 6A006A02 7568026C 68026F68 ho.hl.hu.j.j.j..~...=..u.Õ..|..Õ 000040
FFFF9A00 6A006A00 6AFFFF68 FFFF68FF FF680272 6801AE68 0676FF08 76FF0099 ...v..v.hÙ.hr.h..h..h..j.j.j.... 000060
FF9A0000 681E0008 681E0676 FF0876FF 006BE900 01B80006 E9037500 003D0000 ..=..u.Õ..|..Õk..v..v..h...h.... 000080
FFFF9AFF FF68FFFF 680676FF 0876FF00 4AE90001 B80006E9 03750000 3D0000FF ...=..u.Õ..|..ÕJ..v..v.h..h..... 0000A0
36FF2600 32068E01 2C680676 FF0876FF 002BE900 01B80006 E9037500 003D0000 ..*..u.Õ..|..Õ+..v..v.h,...2.&.6 0000C0
CAC95F5E 1F0000E9 00008800 06E90001 B80006E9 03750000 3D0000FF FF9A0000 .......=..u.Õ..|..Õ..|..Õ...^_èò 0000E0
003D0000 FFFF9A50 16F4468D 0876FF0A 76FFD88E 0008B81E 56570000 10C80004 ..à...WV.|...Ä.v..v..F¶.P.....=. 000100
7500003D 0000FFFF 9A5016FC 468D0876 FF0A76FF 000SE900 01B80006 E9037500 .u.Õ..|..Õí..v..v..F•.P.....=..u 000120
E9037500 00300000 FFFF9A50 16F8468D 0876FF0A 76FF0087 E90001B8 0006E903 .Õ..|..Õñ..v..v..F%.P.....=..u.Õ 000140
0000FFFF 9A5016F2 468D016A FC76FFFE 76FFF476 FFF676FF 0099E900 01B80006 ..|..Õ...v~.v¶.v±.v=j..F·.P..... 000160
E9037403 F27E8300 28E90646 880000F0 46C70073 E90001B8 0006E903 7500003D =..u.Õ..|..Õs.úFÞ...F.Õ(..~·.t.Õ 000180
13E90016 E90019E9 0001F046 C70005E9 037402F2 7E83002A E90001F0 46C70005 ..úFÞ..Õ*..~·.t.Õ..úFÞ..Õ..Õ..Õ. 0001A0
01256806 76FFF876 FFFA76FF FFE7E9FF D9E90375 01263DFF D0E90375 01243D00 .=$.u.ÕÅ.=&.u.Õ).ÕÕ..v¹.v½.v.h%. 0001C0
00E90000 B80006E9 0001B800 06E90375 D0080000 FFFF9A00 6A006AF0 76FF006A j..vÞj.j.......Åu.Õ..|..Õ..|..Õ. 0001E0
```

Dump of file SATURN:[PCCOMMON.DUMP.DLL]PPRPROF.TMP;1 on 18-APR-1990 10:49:48.41
File ID (859,20,0)   End of file block 10 / Allocated 12

Virtual block number 4 (00000004), 512 (0200) bytes

```
9A5016F4 468D0876 FF0A76FF D88E030A 881E5657 00010EC8 0006CAC9 5F5E1F00 ..^_èò..à...WV.¦...Ä.v..v..F¶.P. 000000
03389A50 16FC468D 0876FF0A 76FF00E1 E90001B8 0006E903 7500003D 0000031A ....=..u.Õ..¦..ÕÄ..v..v..F=.P.8. 000020
00000356 9A5016F8 468D0876 FF0A76FF 00C3E900 01B80006 E9037500 003D0000 ..=..u.Õ..¦..ÕÙ..v..v..F½.P.V... 000040
07F246C7 0047E900 06F246C7 002CE906 468800A5 E90001B8 0006E903 7500003D =..u.Õ..¦..ÕE..F.Õ,.úF·..ÕG.úF·. 000060
0023E900 26E90079 E90001B8 002FE900 00F246C7 0037E900 0CF246C7 003FE900 .Õ?.úF·..Õ7.úF·..Õ/.¦..Õy.Õ&.Õ#. 000080
FFCCE903 7502763D FFCCE903 7502623D FFCCE903 7501AE3D FFCCE903 75019A3D =..u.Õä.=Ü.u.Õä.=b.u.Õä.=v.u.Õä. 0000A0
00003D00 00037C9A 5016FEF2 8680F276 FFFC76FF FE76FFF4 76FFF676 FFFFD1E9 Õ1..v−.v¶.v±.v=.v·..·±.P.|...=.. 0000C0
3D0000FF FF9A5016 FEF2868D 0676FFF8 76FFFA76 FF0028E9 00018800 06E90375 u.Õ..¦..Õ(..v'.v½.v...·±.P.....= 0000E0
56570000 10C80006 CAC95F5E 1F0000E9 00008800 06E90001 B80006E9 03750000 ..u.Õ..¦..Õ..¦..Õ...^_èò..à...WV 000100
01B80006 E9037500 003D0000 04209A50 16F2468D 0876FF0A 76FFD88E 0410B81E .¦...Ä.v..v..F·.P. ...=..u.Õ..¦. 000120
E90001B8 0006E903 7500003D 0000043E 9A5016FC 468D0876 FF0A76FF 0127E900 .Õ'..v..v..F=.P.>...=..u.Õ..¦..Õ 000140
00EBE900 01B80006 E9037500 003D0000 045C9A50 16F84680 0876FF0A 76FF0109 ...v..v..F½.P.\...=..u.Õ..¦..ÕŠ. 000160
46C7007F E90004F0 46C70087 E90003F0 46C7008F E90002F0 46C7004C E906468B .F.ÕL.úFÞ..Õ..úFÞ..Õ..úFÞ..Õ..úF 000180
46C7005F E9000AF0 46C70067 E90009F0 46C7006F E90008F0 46C70077 E90005F0 Þ..Õw.úFÞ..Õo.úFÞ..Õg.úFÞ..Õ_.úF 0001A0
3D001BE9 0376FFC4 E9037501 8630004B E9004EE9 009FE900 01B80057 E9000BF0 Þ..ÕW.¦..Õ..ÕN.ÕK.=..u.Õá.v.Õ..= 0001C0
E9037502 123DFFCC E9FF9FE9 03750172 3DFF9FE9 0375015E 3DFF9FE9 0375014A J.u.Õ..=^.u.Õ..=r.u.Õ..Õä.=..u.Õ 0001E0
```

Dump of file SATURN:[PCCOMMON.DUMP.DLL]PPRPROF.TMP;1 on 18-APR-1990 10:49:48.41
File ID (859,20,0)   End of file block 10 / Allocated 12

Virtual block number 5 (00000005), 512 (0200) bytes

```
F476FFFF A9E9FFA4 E9037502 4E3DFFA4 E9037502 3A3DFFA4 E9037502 263DFFA4 Ê.=&.u.ÕÊ.=:.u.ÕÊ.=N.u.ÕÊ.Õ`..v¶ 000000
01B80006 E9037500 003D0000 04D99A50 16F6468D F076FFFC 76FFFE76 FFF276FF .v·.v±.v=.vÞ.F−.P.1...=..u.Õ..¦. 000020
B80006E9 03750000 3D0000FF FF9A006A F676FF06 76FFF876 FFFA76FF 0027E900 .Õ'..v'.v½.v..v−j......=..u.Õ..¦ 000040
76FFD88E 0522B81E 56570000 10C80006 CAC95F5E 1F0000E9 00008800 06E90001 ..Õ..¦..Õ...^_èò..à...WV.¦"..Ä.v 000060
FF1676FF 018CE900 01B80006 E9037500 003D0000 05329A50 16F24680 1476FF16 ..v..F·.P.2...=..u.Õ..¦..Õ...v.. 000080
1476FF16 76FF016E E90001B8 0006E903 7500003D 00000550 9A5016FC 468D1476 v..F=.P.P...=..u.Õ..¦..Õn..v..v. 0000A0
76FFF676 FFF876FF 0150E900 01B80006 E9037500 003D0000 056E9A50 16F6468D .F−.P.n...=..u.Õ..¦..ÕP..v½.v−.v 0000C0
7C00FA7E 83012DE9 00018800 06E90374 00003000 00FFFF9A 016A5016 FA468D12 ..F'.Pj......=..t.Õ..¦..Õ-..−'.| 0000E0
008808C4 83FFFF00 009A0A76 FF0C76FF 0010681E 000207C7 260E5EC4 0020E903 .Õ .á^.&ú....h...v..v.......á.¦. 000100
E90004F0 46C70087 E90003F0 46C7008F E90002F0 46C7004C E912468B 0104E900 .Õ...F.ÕL.úFÞ..Õ..úFÞ..Õ..úFÞ..Õ 000120
E9000AF0 46C70067 E90009F0 46C7006F E90008F0 46C70077 E90005F0 46C7007F ..úFÞ..Õw.úFÞ..Õo.úFÞ..Õg.úFÞ..Õ 000140
0376FFC4 E9037501 8630004B E9004EE9 0088E900 01B80057 E9000BF0 46C7005F _.úFÞ..ÕW.¦..Õ¦.ÕN.ÕK.=..u.Õá.v. 000160
123DFFCC E9FF9FE9 03750172 3DFF9FE9 0375015E 3DFF9FE9 0375014A 3D001BE9 Õ..=J.u.Õ..=^.u.Õ..=r.u.Õ..Õä.=. 000180
A9E9FFA4 E9037502 4E3DFFA4 E9037502 3A3DFFA4 E9037502 263DFFA4 E9037502 .u.ÕÊ.=&.u.ÕÊ.=:.u.ÕÊ.=N.u.ÕÊ.Õ` 0001A0
F276FFF4 76FF004E E90001B8 0006E903 7500003D 0000FFFF 9AF276FF F476FFFF ..v¶.v·.....=..u.Õ..¦..ÕN..v¶.v· 0001C0
27E90001 B80006E9 03750000 3D0000FF FF9A5016 FA468DF0 76FFFC76 FFFE76FF .v±.v=.vÞ.F'.P.....=..u.Õ..¦..Õ' 0001E0
```

Dump of file SATURN:[PCCOMMON.DUMP.DLL]PPRPROF.TMP;1 on 18-APR-1990 10:49:48.41
File ID (859,20,0)   End of file block 10 / Allocated 12

Virtual block number 6 (00000006), 512 (0200) bytes

```
07C7260E 5EC4000E E90001B8 0006E903 7500003D 0000FFFF 9AF276FF F476FF00 ..v¶.v·.....=..u.Õ..¦..Õ..á^.&ú. 000000
76FF1676 FFD88E06 7A881E56 5700005E C80012CA C95F5E1F 0000E900 00880001 ..¦..Õ...^_èò..à^..WV.¦z..Ä.v..v 000020
8D1476FF 1676FF01 24E90001 B80006E9 03750000 3D000006 8A9A5016 F4468014 ..F¶.P.....=..u.Õ..¦..Õ$..v..v.. 000040
F8468014 76FF1676 FF0106E9 00018800 06E90375 00003D00 0006A89A 5016FC46 F=.P.´...=..u.Õ..¦..Õ...v..v..F½ 000060
506A1276 FFF876FF FA76FF00 E8E90001 B80006E9 03750000 3D000006 C69A5016 .P.ó...=..u.Õ..¦..ÕÒ..v'.v½.v.¡P 000080
BCE90001 B80006E9 037500A2 7E80000F E9037400 003D0000 FFFF9A50 16A2468D .FÅ.P.....=..t.Õ...~Å.u.Õ..¦..Õ¥ 0000A0
C70037E9 000CF246 C7003FE9 0007F246 C70047E9 0006F246 C7002CE9 12468800 ..F.Õ,.úF·..ÕG.úF·..Õ?.úF·..Õ7.ú 0000C0
037501AE 3DFFCCE9 0375019A 300023E9 0026E900 90E90001 B8002FE9 0000F246 F·..Õ/.¦..Õ..Õ&.Õ#.=..u.Õä.=Ü.u. 0000E0
0007C89A F476FFF6 76FFFFD1 E9FFCCE9 03750276 3DFFCCE9 03750262 3DFFCCE9 Õä.=b.u.Õä.=v.u.Õä.Õ1..v−.v¶.à.. 000100
468DF276 FFFC76FF FE76FFF4 76FFF676 FF004EE9 00018800 06E90375 00003D00 .=..u.Õ..¦..ÕN..v−.v¶.v±.v=.v·.F 000120
0008089A F476FFF6 76FF0027 E90001B8 0006E903 7500003D 000007EF 9A5016A2 Å.P.ÿ...=..u.Õ..¦..Õ'..v−.v¶.... 000140
5F5E1F00 00E90000 B8000107 C7260E5E C4000EE9 00018800 06E90375 00003D00 .=..u.Õ..¦..Õ..á^.&ú...¦..Õ...^_ 000160
00000847 9A5016F2 468D1476 FF1676FF D88E0837 881E5657 000010C8 0012CAC9 èò..à...WV.¦7..Ä.v..v..F·.P.G..¯ 000180
003D0000 08659A50 16FC468D 1476FF16 76FF0104 E90001B8 0006E903 7500003D =..u.Õ..¦..Õ...v..v..F=.P.e...=. 0001A0
7500003D 00000883 9A5016FB 468D1476 FF1676FF 00E6E900 01B80006 E9037500 .u.Õ..¦..Õ¦..v..v..F½.P.....=..u 0001C0
EA9A006A 006A006A 006A0124 681276FF F876FFFA 76FF00C8 E90001B8 0006E903 .Õ..¦..Õà..v'.v½.v.h$.j.j.j.j..õ 0001E0
```

```
Dump of file SATURN:[PCCOMMON.DUMP.DLL]PPRPROF.TMP;1 on 18-APR-1990 10:49:48.41
File ID (859,20,0)   End of file block 10 / Allocated 12

Virtual block number 7 (00000007), 512 (0200) bytes

E90003F6 46C70005 E9037401 F07E8300 28E91246 8BFFFFF6 46C7F046 89000003 ....FÞúF-...F.Õ(..-Þ.t.Õ..úF-..Õ 000000
D0E90375 01243D00 13E90016 E90019E9 0002F646 C70005E9 037401F0 7E83002A *..-Þ.t.Õ..úF-..Õ..Õ..Õ..=$.u.ÕÀ 000020
B80006E9 03750000 30000009 1D9AF276 FFF476FF FFE7E9FF D9E90375 01263DFF .=&.u.Õ).ÕÕ..v¶.v·.....=..u.Õ..¡ 000040
00003D00 0009449A 5016F646 8D016AFC 76FFFE76 FFF276FF F476FF00 4DE90001 ..ÕM..v¶.v·.v±.v»j..F-.P.D...=.. 000060
01B80006 E9037500 00300000 095D9AF2 76FFF476 FF0027E9 0001B800 06E90375 u.Õ..¡..Õ'..v¶.v·.]...=..u.Õ..¡. 000080
099C0203 00189000 12CAC95F 5E1F0000 E90000B8 000107C7 260E5EC4 000EE900 .Õ..á^.&ú...¡..Õ...^_èÞ......... 0000A0
06E90103 00800001 06530103 007F0001 09FF0103 00000001 00160002 006A0003 ..j.................S.......Õ. 0000C0
08A60103 00860001 04FB0103 00760003 09D80203 00000003 07190002 00810001 .............Ä...v...«.......l. 0000E0
00280203 000B0002 0A530203 06720001 007B0005 00000004 098C0002 00870001 .............(...r...S.......(. 000100
028E0203 04080001 01E50005 09840001 001F0005 03020001 00190005 00860003 ......................l......./. 000120
029F0203 051A0001 00750005 00B90004 028B0205 00220002 0A920203 00970003 .........."...£...¿...u......... 000140
01EB0005 003B0002 0A790203 00B90004 028B0202 002D0002 06320203 00A50003 ..É...2...-...l...¿...y...;...$. 000160
00000000 00000000 00000000 005A0003 09BA0203 00480003 02E30203 082F0001 ../...D...K...¤...Z............ 000180
00000000 00000000 00000500 02000200 01CB0001 B81F0000 3E89D88E FFFFB81E .¿...Ä.>...¡..Ù................ 0001A0
A8C78B06 7EC4D1F7 AEF2FFFF B9C033C0 8ED88CFE 8B0A76C5 1EDE8807 8BEC8B55 U.$.■.B.év..±.Á.ã3â¿..·Ù¼iá-..ù· 0001C0
00000000 00000000 0000CB5D C28C1FFA 8BF388A4 F3C913A5 F3E90149 A4027401 .t.ÊlìÕµÉ.èµÊ.µ.ª..õ]ù......... 0001E0

Dump of file SATURN:[PCCOMMON.DUMP.DLL]PPRPROF.TMP;1 on 18-APR-1990 10:49:48.41
File ID (859,20,0)   End of file block 10 / Allocated 12

Virtual block number 8 (00000008), 512 (0200) bytes

2065756C 6176206E 69677261 4D202020 00656C69 666F7250 00726574 6E697250 Printer.Profile.   Margin value 000000
00000000 00050032 00020001 FFFF0000 2E65676E 61722066 6F207475 6F207369 is out of range.........2....... 000020
00379400 009003CE 00000001 0000001F 00000000 FFFF0001 000E0352 00000492 ....R...................ö.....7. 000040
01260007 80010002 03D30014 00050000 00000000 03CFFFFF 012C014D 0102FF78 (...M.,...ü...........Æ.......&. 000060
002F0128 000F8002 000403E8 00070003 00000000 0000FFFF FFFF0122 001A0097 ...."...............Ò.......+./. 000080
000A0042 01280051 80020004 03F0000C 00030000 00000000 FFFFFFFF 0124000A ..$...............Þ.....Q.+.B... 0000A0
01360080 00F40097 00078001 000203FD 00120005 00000000 0000FFFF FFFF0126 &...............».........¶...6. 0000C0
FFFF0190 00080022 00FD000F 80010001 04100007 00050000 00000000 FFFFFFFF ........................».".... 0000E0
FFFFFFFF 019A0008 008500FF 00388002 000C0418 00000006 00000000 0000FFFF ....................8...Ç........ 000100
0000FFFF FFFF01A4 0008001F 00E9000F 80010001 04190007 00050000 00000000 ....................Õ.....É...... 000120
00000000 FFFFFFFF 01AE0008 00B500EA 00388002 000C0421 00000006 00000000 ........!.....8.õ.ç...Û......... 000140
00000000 0000FFFF FFFF0140 003A0005 00A20019 80010002 04220007 00050000 ......".......Â.(.:.a........... 000160
00060000 00000000 FFFFFFFF 01450008 001400C1 00208001 0001042A 00040005 ....*..... .è.....E............ 000180
00070005 00000000 0000FFFF FFFF014A 00080026 00C20049 8002000C 042F0000 ../.....I.ó.&...J............... 0001A0
04380000 00060000 00000000 FFFFFFFF 01540008 002300AC 00218001 00010430 0.....!.¯.#...T...............8. 0001C0
00010439 00050005 00000000 0000FFFF FFFF015E 00080026 00AE0049 8002000C ....I.Ù.&...^...............9... 0001E0

Dump of file SATURN:[PCCOMMON.DUMP.DLL]PPRPROF.TMP;1 on 18-APR-1990 10:49:48.41
File ID (859,20,0)   End of file block 10 / Allocated 12

Virtual block number 9 (00000009), 512 (0200) bytes

8002000C 043F0000 00060000 00000000 FFFFFFFF 01680008 001400C1 00808001 ....ê.....h...............7..... 000000
00808001 00010440 00060005 00000000 0000FFFF FFFF0172 00080027 00C300AC ¯.Ù.'...r...............a....... 000020
00AE00AD 8002000C 04470000 00060000 00000000 FFFFFFFF 017C0008 001A00AD Ù.....|...............G.....Ù.Ù. 000040
00F40007 00088001 00020448 00110005 00000000 0000FFFF FFFF0186 00080026 &.................H.........¶. 000060
00080022 00690011 80010001 045A0007 00050000 00000000 FFFFFFFF 01FE0080 ..±...............Z.......i."... 000080
02620008 00B50068 003A8002 000C0462 00000006 00000000 0000FFFF FFFF0258 X..............b.....:.k.ç...b. 0000A0
FFFF026C 0008001F 00550011 80010001 04630007 00050000 00000000 FFFFFFFF .............c.......U.....l... 0000C0
FFFFFFFF 02760008 00B50056 003A8002 000C0468 00000006 00000000 0000FFFF ...........k.....:.V.ç...v..... 0000E0
0000FFFF FFFF0208 003A0006 00120017 80010002 046C0007 00050000 00000000 .........l.........#.:.......... 000100
00000000 FFFFFFFF 02000008 0014002C 00238001 00010474 00040005 00000000 ........t.....#,................ 000120
00000000 0000FFFF FFFF0212 00080026 002F0048 8002000C 04790000 00060000 ......y.....K./.&............... 000140
00060000 00000000 FFFFFFFF 021C0008 00230018 00238001 0001047A 00070005 ....z.....#...#................. 000160
00050005 00000000 0000FFFF FFFF0226 00080027 001A004A 8002000C 04820000 ........J...'...&............... 000180
04890006 00050000 00000000 FFFFFFFF 02300008 00140020 008F8001 00010483 ........-.....0................. 0001A0
000C0490 00000006 00000000 0000FFFF FFFF0244 00080019 001A008F 80010001 ............D.......... ....... 0001C0
8002000C 04910000 00060000 00000000 FFFFFFFF 023A0008 0026002F 00AD8002 ..Ù./.&...:............. ...... 0001E0
```

```
Dump of file SATURN:[PCCOMMON.DUMP.DLL]PPRPROF.TMP;1 on 18-APR-1990 10:49:48.41
File ID (859,20,0)   End of file block 10 / Allocated 12

Virtual block number 10 (0000000A), 512 (0200) bytes

 73616560 20666F20 7374696E 55000000 0000FFFF FFFF024E 00080027 001B00AD Ù...'...N..........Units of meas 000000
 61694400 73726574 656D6974 6E65437E 00736568 636E497E 00746E65 6D657275 urement.~Inches.~Centimeters.Dia 000020
 3A726574 6F6F4600 003A7265 64616548 00737265 74656D61 72617020 6D617267 gram parameters.Header:..Footer: 000040
 00003A74 66654C00 003A6D6F 74746F42 00003A70 6F540073 6E696772 614D0000 ..Margins.Top:..Bottom:..Left:.. 000060
 72656461 65480073 72657465 6D617261 70206E65 65726353 00003A74 68676952 Right:..Screen parameters.Header 000080
 6D6F7474 6F420000 3A706F54 00736E69 6772614D 00003A72 65746F6F 4600003A :..Footer:..Margins.Top:..Bottom 0000A0
 00000000 00000000 00000000 00000000 003A7468 67695200 3A746665 4C00003A :..Left:.Right:................. 0000C0
 00000000 00000000 00000000 00000000 00000000 00000000 00000000 00000000 ................................ 0000E0
 00000000 00000000 00000000 00000000 00000000 00000000 00000000 00000000 ................................ 000100
 00000000 00000000 00000000 00000000 00000000 00000000 00000000 00000000 ................................ 000120
 00000000 00000000 00000000 00000000 00000000 00000000 00000000 00000000 ................................ 000140
 00000000 00000000 00000000 00000000 00000000 00000000 00000000 00000000 ................................ 000160
 00000000 00000000 00000000 00000000 00000000 00000000 00000000 00000000 ................................ 000180
 00000000 00000000 00000000 00000000 00000000 00000000 00000000 00000000 ................................ 0001A0
 00000000 00000000 00000000 00000000 00000000 00000000 00000000 00000000 ................................ 0001C0
 00000000 00000000 00000000 00000000 00000000 00000000 00000000 00000000 ................................ 0001E0
```

```
Dump of file SATURN:[PCCOMMON.DUMP.DLL]OBJFND.TMP;1 on 18-APR-1990 10:48:15.76
File ID (749,26,0)   End of file block 15 / Allocated 16

Virtual block number 1 (00000001), 512 (0200) bytes

00000000 00000040 00000000 00000088 0000FFFF 00000004 0000000E 013C5A4D MZ<.............|.......a....... 000000
00000080 00000000 00000000 00000000 00000000 00000000 00000000 00000000 ................................ 000020
6F6E6E61 63206D61 72676F72 70207369 685421CD 4C01B821 CD09B400 0EBA1F0E ..o..Ç.ë|.Lë!This program canno 000040
00000000 00000024 0A0D0D2E 65646F6D 20534F44 206E6920 6E757220 65622074 t be run in DOS mode....$....... 000060
00040007 00000000 00030000 00000000 00058001 9067F682 0013021C 0505454E NE.......g...................... 000080
00000000 00000000 00010001 00040000 000002AF 00F200EA 007C0078 00400004 ..a.x.|.ò.·.£.................. 0000A0
00BD0E00 00BD01A8 000F0F00 000F01A6 0A980F00 0A9800F3 0B880F00 0B88002C ,.|...|.#........|........§...§. 0000C0
4A424F06 00640004 025B1EB1 025B01B5 00020E21 00000000 00100F21 000201B4 Ç...|.......|...ç.[.Y.[...d..OBJ 0000E0
4E464A42 4F170001 5245444E 49465443 454A424F 444E464A 424F1200 00444E46 FND...OBJFNDOBJECTFINDER...OBJFN 000100
54414552 43444E46 4A424F0C 00024B43 41485F52 45444E49 46544345 4A424F44 DOBJECTFINDER_HACK...OBJFNDCREAT 000120
454A424F 44444144 4E464A42 4F140004 4554454C 4544444E 464A424F 0C000345 E...OBJFNDDELETE...OBJFNDADDOBJE 000140
454D0D4D 454D034E 49574D50 05000052 00430007 00010000 05534550 59545443 CTTYPES.......C.R...PMWIN.MEM.ME 000160
4C414045 4D0D5041 4548594F 52545345 44404540 0E504145 48455441 4552434D MCREATEHEAP.MEMDESTROYHEAP.MEMAL 000180
4E455349 54470A49 5447034B 434F4C42 45455246 4D45400C 4B434F4C 42434F4C LOCBLOCK.MEMFREEBLOCK.GTI.GTISEN 0001A0
494C4545 52464C4D 440B444C 45494659 52455551 4C4D440D 6C6D6403 47534D44 DMSG.dml.DMLQUERYFIELD.DMLFREELI 0001C0
52504449 4C4D4459 52455551 4C4D4416 44494C4D 44595245 55514C4D 44005453 ST.DMLQUERYDMLID.DMLQUERYDMLIDPR 0001E0

Dump of file SATURN:[PCCOMMON.DUMP.DLL]OBJFND.TMP;1 on 18-APR-1990 10:48:15.76
File ID (749,26,0)   End of file block 15 / Allocated 16

Virtual block number 2 (00000002), 512 (0200) bytes

59524555 514C4D44 15544345 4A424F54 43454C45 534C4D44 0F454D41 4E544E49 INTNAME.DMLSELECTOBJECT.DMLQUERY 000000
53544345 4A424F4C 4C415952 4555514C 4D441254 53494C54 43454C45 534C4C41 ALLSELECTLIST.DMLQUERYALLOBJECTS 000020
5443454A 424F5952 4555514C 4D441945 5A495354 4F4C5359 52455551 4C4D4410 .DMLQUERYSLOTSIZE.DMLQUERYOBJECT 000040
42544345 4A424F4C 45444F4D 59524555 514C4D44 17544F4C 53454D41 4E524F46 FORNAMESLOT.DMLQUERYMODELOBJECTB 000060
1C030105 544E554F 43544345 4A424F4C 45444F4D 59524555 514C4D44 18455341 ASE.DMLQUERYMODELOBJECTCOUNT.... 000080
00000000 00000000 00000000 00000000 00000007 920301FC 03000603 0000030A .....ø..•....................... 0000A0
00FFFF9A 5016FC46 8D0676FF 0876FF00 00F446C7 D88EFFFF 881E5657 00000EC8 à...WV.|...ÄúF¶...v..v..F=.P.... 0000C0
FFFF9A50 16F2468D 0676FF08 76FF0090 E9F446B8 0006E903 75000030 F4468900 ..F¶=..u.Õ...F¶Õ...v..v..F·.P... 0000E0
D69A5016 F6468D06 76FF0876 FF007CE9 F4468800 06E90375 000030F4 46890000 ...F¶=..u.Õ...F¶Õ|..v..v..F-.P.ø 000100
76FF002C E90377FA 4638F246 03FC468B FA46FF00 03E9FA46 8940FC46 8800A500 .É..F•a.F'Õ...F'.F=.F·;F'w.Õ,..v 000120
FFF676FF F876FF00 0EE90374 00003D00 00FFFF9A 5016FE46 8DFA76FF 0676FF08 ..v..v'.F±.P.....=..t.Õ...V½.v-. 000140
76FF00C7 0A1C9AF6 76FFF876 FF0A76FF 0C76FF0E 76FFFFC3 E900BC07 929AFA76 v'...¥.Õú..v..v..v..V½.v-...ú..v 000160
0008881E 56570000 06C8000A CAC95F5E 1F0000E9 000088FF FF01FC9A F676FFF8 ½.v-.=...|..Õ...^_èò..à...WV.|.. 000180
6AFA76FF 00F9E983 01B80006 E9037500 003D0000 FFFF9A50 16FA468D 026AD88E .Äj..F'.P.....=..ū.Õ..|..Õ'..v'j 0001A0
88FC5EC4 000E983 01880006 E9037500 003D0000 FFFF9A50 16FC468D 00966800 .h...F=.P.....=..u.Õ..|..Õ).6^•¡ 0001C0
478926FA 468BFC5E C4078926 02478926 000088FC 5EC41047 89261247 89260000 ..&.G.&.G.6^•¡..&.G.&..6^•.F'&.G 0001E0

Dump of file SATURN:[PCCOMMON.DUMP.DLL]OBJFND.TMP;1 on 18-APR-1990 10:48:15.76
File ID (749,26,0)   End of file block 15 / Allocated 16

Virtual block number 3 (00000003), 512 (0200) bytes

0088FC5E C400000A 47C726FC 5EC40857 89260647 89260C56 880A468B FC5EC404 .6^•.F..V.&.G.&.W.6^=&úG...6^=|. 000000
0088FC5E C4000116 47C726FC 5EC40000 1447C726 FC5EC40C 4789260E 47892600 .&.G.&.G.6^=&úG...6^=&úG...6^•|. 000020
C726FC5E C4000020 47C726FC 5EC40000 1C47C726 FC5EC418 4789261A 47892600 .&.G.&.G.6^•&úG...6^•&úG ..6^•&ú 000040
0088FC5E C4264789 26284789 26000088 FC5EC400 002447C7 26FC5EC4 00002247 G"..6^=&úG$..6^=|..&.G(&.G&6^•|. 000060
FE568BFC 4688065E C42E4789 26304789 26000088 FC5EC42A 4789262C 47892600 .&.G,&.G*6^•|..&.G0&.G.6^..F=.V± 000080
00000EC8 0008CAC9 5F5E1F00 00E90000 88003247 C626FC5E C4025789 26078926 &..&.W.6^=&6G2.|..Õ...^_èò..à... 0000A0
B80006E9 0374FE46 08FC468B FE5689FC 46890856 8B06468B D88E000E 881E5657 WV.|8..Ä.F..V..F=.V±.F=.F±t.Õ..| 0000C0
F45689F2 46891257 8B261047 8B26FC5E C4FA4689 04478826 FC5EC400 C4E90000 ..Õ6.6^•&.G..F'6^•&.G.&.W..F·.V¶ 0000E0
FFF476FF F85689F6 46891657 8B261447 8B26F25E C40031E9 0375F446 0BF2468B .F·.F¶u.Õ1.6^·&.G.&.W..F-.V½.V¶. 000100
26FC5EC4 FFC4E9F4 5689F246 89F8568B F6468B06 C483028D 03849AFA 76FFF276 v·.v'......6..F-.V½.F·.V¶Õ6.6^•& 000120
FA76FF2A 77FF262C 77FF26FC 5EC406C4 83006106 009AFA76 FF2677FF 262877FF .w(&.w&.v'...a..6.6^•&.w,&.w*.v' 000140
5EC406C4 83026806 009AFA76 FF2E77FF 263077FF 26FC5EC4 06C48302 B906009A ...¿..6.6^•&.w0&.w..v'...h..6.6^ 000160
FF9AFA76 FF0000FF FF9AFC76 FFFE76FF FA76FF00 00FFFF9A 37FF2602 77FF26FC =&.w.&.7......v'.v±.v•......v'.. 000180
6A0676FF D88E0204 881E5657 000004C8 0004CAC9 5F5E1F00 00E90000 B80000FF ...|..Õ...^_èò..à...WV.|...Ä.v.j 0001A0
26085EC4 0063E983 01880006 E9037500 00300000 010A9A08 76FF0A76 FF186A00 .j..v..v......=..u.Õ..|..Õc.6^.& 0001C0
000088FC 5EC40E47 89261047 89260000 B8FC5EC4 FE5689FC 46890257 8B260788 ..&.W..F=.V±6^•|..&.G.&.G.6^•|.. 0001E0
```

```
Dump of file SATURN:[PCCOMMON.DUMP.DLL]OBJFND.TMP;1 on 18-APR-1990 10:48:15.76
File ID (749,26,0)   End of file block 15 / Allocated 16

Virtual block number 4 (00000004), 512 (0200) bytes

 5EC40647 89260847 89260000 B8FC5EC4 00000447 C726FC5E C4078926 02478926 &.G.&..á^•&úG...á^=¡..&.G.&.G.á^ 000000
 1F0000E9 00008800 001247C7 26FC5EC4 00000C47 C726FC5E C400000A 47C726FC •&úG...á^•&úG...á^=&úG...¡..Õ... 000020
 82E90000 B80006E9 03740A46 0B08468B D88E02F8 B81E5657 000008C8 CBC95F5E ^_èùà...WV.¡½..Ä.F..F.t.Õ..¡..Õ. 000040
 04199A37 FF260277 FF26085E C40676FF 0012E903 7502470B 26078B26 085EC400 .ã^.&..&.G.u.Õ...v.á^.&.w.&.7... 000060
 5EC40031 E90375FA 460BF846 8BFA5689 F8468910 578B260E 478B2608 5EC40000 ..á^.&.G.&.W..F½.V•.F½.F•u.Õ1.á^ 000080
 06C48302 A304A19A 0676FFF8 76FFFA76 FFFE5689 FC46890C 578B260A 478B26F8 ½&.G.&.W..F=.V±.v•.v½.v..À.È..á. 0000A0
 00008800 0002079A 0876FF0A 76FF0676 FFFFC4E9 FA5689F8 4689FE56 8BFC468B .F=.V±.F½.V•Õá..v..v..v..■...¡.. 0000C0
 76FF0A76 FF0E6A00 6A0676FF D88E038C B81E5657 000004C8 CBC95F5E 1F0000E9 Õ...^_èùà...WV.¡...Ä.v.j.j..v..v 0000E0
 46890257 8B26078B 26085EC4 004BE983 01B80006 E9037500 003D0000 030A9A08 ......=..u.Õ..¡..ÕH.á^.&..&.W..F 000100
 000088FC 5EC40000 0447C726 FC5EC407 89260247 89260000 B8FC5EC4 FE5689FC •.V±á^•¡..&.G.&..á^•&úG...á^=¡.. 000120
 C95F5E1F 0000E900 00B80A47 89260C47 89260000 B8FC5EC4 06478926 08478926 &.G.&.G.á^•¡..&.G.&.G.¡..Õ...^_è 000140
 5EC40043 E90000B8 0006E903 740A460B 08468B08 8E0430B8 1E565700 0000C8CB ùà...WV.¡O..Ä.F..F.t.Õ..¡..ÕC.ã^ 000160
 C4000004 F79A37FF 260277FF 26085EC4 0676FF00 12E90375 02470B26 078B2608 .&..&.G.u.Õ...v.á^.&.w.&.7.¼...á 000180
 00E90000 B8000003 8E9A0876 FF0A76FF 0676FF0A 4789260C 47892600 00B8085E ^.¡..&.G.&.G..v..v..v..ƒ...¡..Õ. 0001A0
 468BFA56 89F84689 0A568B08 468BD88E 04A9B81E 56570000 08C8CBC9 5F5E1F00 ..^_èùà...WV.¡`..Ä.F..V..F½.V•.F 0001C0
 F876FFFA 76FFFE56 89FC4689 0C578B26 0A478B26 FB5EC400 31E90375 FA460BF8 ½.F•u.Õ1.á^½&.G.&.W..F•.V±.v•.v½ 0001E0

Dump of file SATURN:[PCCOMMON.DUMP.DLL]OBJFND.TMP;1 on 18-APR-1990 10:48:15.76
File ID (749,26,0)   End of file block 15 / Allocated 16

Virtual block number 5 (00000005), 512 (0200) bytes

 0A468900 00B8FFC4 E9FA5689 F84689FE 568BFC46 8B06C483 03FB04A1 9A0676FF .v..À.«..á..F•.V±.F½.V•Õá.¡...F. 000000
 6A006A06 76FFD88E 050E881E 56570000 00C8CBC9 5F5E1F00 00E90000 B8084689 .F.¡..Õ...^_èùà...WV.¡...À.v.j.j 000020
 1FC42608 5EC40033 E98301B8 0006E903 7500003D 00000442 9A0876FF 0A76FF0A ..v..v..B...=..u.Õ..¡..Õ3.á^.&á. 000040
 260000B8 1FC42608 5EC40247 89260447 89260000 B81FC426 085EC400 0007C726 &ú...á^.&á.¡..&.G.&.G.á^.&á.¡..& 000060
 76FFD88E 0576B81E 56570000 00C8CBC9 5F5E1F00 00E90000 B8064789 26084789 .G.&.G.¡..Õ...^_èùà...WV.¡v..Ä.v 000080
 CBC95F5E 1F0000E9 00008808 46890A46 890000B8 000004DB 9A0876FF 0A76FF06 ..v..v..Û...¡...F..F.¡..Õ...^_èù 0000A0
 0375FA46 0BF8468B FA5689F8 46890A56 8B08468B D88E050A B81E5657 000008C8 à...WV.¡Ö..Ä.F..V..F½.V•.F½.F•u. 0000C0
 05D29A06 76FFF876 FFFA76FF FE5689FC 46890857 8B260647 8B26F85E C40031E9 Õ1.á^½&.G.&.W..F•.V±.v•.v½.v..•. 0000E0
 00008808 46890A46 890000B8 FFC4E9FA 5689F846 89FE568B FC468B06 C4830546 F..á..F•.V±.F½.V•Õá.¡...F..F.¡.. 000100
 89260A5E C404478B 26065EC4 D88E0608 B81E5657 000000C8 CBC95F5E 1F0000E9 Õ...^_èùà...WV.¡...Äá^.&.G.á^.&. 000120
 5F5E1F00 00E90000 B8045789 26024789 260A5EC4 08578B26 06478B26 065EC407 .á^.&.G.&.W.á^.&.G.&.W.¡..Õ...^_ 000140
 76FF06C4 8306CD05 6E9A0676 FF5016FC 4680D88E 0670B81E 56570000 04C8CBC9 èùà...WV.¡p..Ä.F•.P.v..n.ë..á..v 000160
 26FC5EC4 02578B26 078B260C 5EC408C4 83064006 689A0876 FF0A76FF FC76FFFE ±.v•.v..v..h.@..á.á^.&..&.W.á^•& 000180
 5F5E1F00 00E90000 B8025789 26078926 FE568BFC 46880C5E C4085789 26064789 .G.&.W.á^..F•.V±&..&.W.¡..Õ...^ 0001A0
 5EC4FE56 89FC4689 02578B26 078B2606 5EC4D88E 06AAB81E 56570000 04C8CBC9 èùà...WV.¡`..Äá^.&..&.W..F•.V±á^ 0001C0
 C95F5E1F 0000E9FE 568BFC46 8B025789 26078926 065EC408 578B2606 478B26FC •&.G.&.W.á^.&..&.W..F•.V±Õ...^_è 0001E0

Dump of file SATURN:[PCCOMMON.DUMP.DLL]OBJFND.TMP;1 on 18-APR-1990 10:48:15.76
File ID (749,26,0)   End of file block 15 / Allocated 16

Virtual block number 6 (00000006), 512 (0200) bytes

 5EC4FE56 89FC4689 12578B26 10478B26 065EC408 8E070AB8 1E565700 0004C8CB ùà...WV.¡...Äá^.&.G.&.W..F•.V±á^ 000000
 16578926 14478926 FE568BFC 46880A5E C4125789 26104789 260C568B 0A468B06 ..F..V.&.G.&.W.á^..F•.V±&.G.&.W. 000020
 468BD88E 0749B81E 56570000 22C8CBC9 5F5E1F00 00E90000 B81447FF 26065EC4 á^.&.G.¡..Õ...^_èùà"..WV.¡I..Ä.F 000040
 FF26FA5E C400FDE9 0001B800 06E90374 FC460BFA 468BFC56 89FA4689 0A568B08 ..V..F•.V•.F•.F•t.Õ..¡..Õ».á^•&. 000060
 8B0006E9 037500E4 7E83E446 89000000 809A5016 FE468006 76FF0677 FF260877 w.&.w..v..F±.P......FÕ.~Õ.u.Õ... 000080
 00E47E83 E4468906 C48308AD 02F09A04 77FF26FA 5EC45016 E0468000 D3E9E446 FÕÕÆ..FÀ.Pá^•&.w..Þ.Ù..á..FÕ.~Õ. 0000A0
 0677FF26 0877FF26 FA5EC404 47892606 468BE05E C400ADE9 E4468B00 06E90375 u.Õ...FÕÕÙ.á^À.F.&.G.á^•&.w.&.w. 0000C0
 77E9E446 880006E9 037500E4 7E83E446 890000FF FF9A136A 5016E646 800676FF .v..FÌ.Pj.......FÕ.~Õ.u.Õ...FÕÕw 0000E0
 0058E900 01880006 E9037400 DE7E83DE 468904C4 83089900 609A5016 E6468000 ..FÌ.P.`....á..Fß.~ß.t.Õ..¡..ÕX. 000100
 06E90375 00003D00 0005889A E076FFE2 76FF5040 DE468800 6A0477FF 26FA5EC4 á^•&.w.j..FßøP.vß.vÀ.....=..u.Õ. 000120
 76FF08C4 83FFFF00 009A37FF 260277FF 26E05EC4 5016E646 800031E9 8301B800 .¡..Õ1..FÌ.Pá^À&.w.&.7......á..v 000140
 C80006CA C95F5E1F 0000E900 00B808C4 83068907 419AFA76 FFFC76FF E076FFE2 ã.vÀ.v•.v•.A.¿..á.¡..Õ...^_èð..à 000160
 8B065EC4 FE5689FC 46891057 8B260E47 8B26065E C4D88E07 9AB81E56 57000004 ...WV.¡...Äá^.&.G.&.W..F•.V±á^.. 000180
 5EC40C57 89260A47 8926FE56 8BFC468B 0A5EC410 5789260E 4789260C 56880A46 F..V.&.G.&.W.á^..F•.V±&.G.&.W.á^ 0001A0
 0B06468B D88E08C7 B81E5657 000008C8 CBC95F5E 1F0000E9 00008812 47FF2606 .&.G.¡..Õ...^_èùà...WV.¡ú..Ä.F.. 0001C0
 C48307F4 04289A04 77FF2606 5EC45016 FC468000 EAE90001 B80006E9 03740846 F.t.Õ..¡..Õõ.¯F•.Pá^.&.w..(.¶..á 0001E0
```

```
Dump of file SATURN:[PCCOMMON.DUMP.DLL]OBJFND.TMP;1 on 18-APR-1990 10:48:15.76
File ID (749,26,0)   End of file block 15 / Allocated 16

Virtual block number 7 (00000007), 512 (0200) bytes

478926FC 5EC40447 8B26105E C400C4E9 F8468800 06E90375 00F87E83 F8468906 ..F½.-½.u.Õ...F½Õ6.6^.&.G.6^=&.G 000000
FC5EC406 77FF2608 77FF2606 5EC40857 89260647 89260E56 880C4688 FC5EC404 .6^=.F..V.&.G.&.W.6^.&.w.&.w.6^= 000020
F8468800 06E90375 00F87E83 F8468900 00FFFF9A 5016FA46 800A76FF 0477FF26 &.w..v..F*.P......F½.-½.u.Õ...F½ 000040
E9037500 00300000 08759AFC 76FFFE76 FFFA76FF 006A0477 FF26065E C40074E9 Õt.6^.&.w.j..v*.v±.v=.u...=..u.Õ 000060
26FC5EC4 0A76FF0C 76FF0E76 FF0677FF 260877FF 26065EC4 004FE983 01B80006 ..|..ÕO.6^.&.w.&.w..v..v..v.6^=& 000080
FE76FF00 1AE9F846 8B0006E9 037500F8 7E83F846 890000FF FF9A37FF 260277FF .w.&.7......F½.-½.u.Õ...F½Õ...v± 0000A0
000004C8 CBC95F5E 1F0000E9 00008808 C483093C 088F9A10 76FF1276 FFFC76FF .v=.v..v..¢.<..á.|..Õ...^_èùà... 0000C0
5EC40A47 89260E46 88FC5EC4 FE5689FC 46890856 88064688 D88E0918 B81E5657 WV.|...Ä.F..V..F=.V±6^=.F.&.G.6^ 0000E0
8EFFFF68 FFFF680A 76FF0C76 FF016A00 6A0E5789 260C4789 260C5688 0A4688FC =.F..V.&.G.&.W.j.j..v..v.h..h... 000100
CAC95F5E 1F0000E9 00008800 00FFFF9A FC76FFFE 76FF646A 000036FF 26000006 ...&.6..jd.v±.v=.....|..Õ...^_èò 000120
FC468D06 76FF0876 FF0019E9 0375000A 7E83088E 0A24B81E 56570000 04C8000A ..à...WV.|$..Ä.-..u.Õ...v..v..F= 000140
00FFFF9A 0C76FF0E 76FF0676 FF0876FF 0011E900 00FFFF9A 0C76FF0E 76FF5016 .P.v..v......Õ...v..v..v..v..... 000160
260877FF 26065EC4 D88E0A8A B81E5657 00000EC8 CBC95F5E 1F0000E9 00008800 .|..Õ...^_èùà...WV.|...Ä6^.&.w.& 000180
0006E903 7500F27E 83F24689 000007CF 9A5016FA 46800477 FF260A5E C40677FF .w.6^.&.w..F*.P.ü....F·.-·.u.Õ.. 0001A0
0A829A06 77FF2608 77FF2606 5EC41677 FF26065E C45016FC 468D00AC E9F24688 .F·Õ¯..F=.P6^.&.w.6^.&.w.&.w.... 0001C0
0056E903 7502470B 26078B26 FC5EC4F8 5689F646 89FE5688 FC46880A C483088A ...6..F=.V±.F-.V½6^=&..&.G.u.ÕV. 0001E0

Dump of file SATURN:[PCCOMMON.DUMP.DLL]OBJFND.TMP;1 on 18-APR-1990 10:48:15.76
File ID (749,26,0)   End of file block 15 / Allocated 16

Virtual block number 8 (00000008), 512 (0200) bytes

C40000FF FF9A5016 F4468037 FF260277 FF26FC5E C40677FF 260877FF 26065EC4 6^.&.w.&.w.6^=&.w.&.7.F¶.P.....6 000000
76FF37FF 260277FF 26FC5EC4 0A76FF0C 76FF0021 E9037404 473926F4 46880A5E ^..F¶&9G.t.Õl..v..v.6^=&.w.&.7.v 000020
77FF2608 77FF2606 5EC4FF9B E904FC46 830EC483 0A0C0910 9A0676FF 0876FFFA *.v..v.......6..F=.Õ..6^.&.w.&.w 000040
00010B20 00020015 90CBC95F 5E1F0000 E9000088 0000FFFF 9AF676FF F876FF06 ..v½.v-.....|..Õ...^_èù..... ... 000060
00040849 00020000 00020A5A 00020070 00010A71 01030064 00040BA8 02030000 ....`...d...q...)...Z.......|... 000080
000200EA 020300F9 0004001D 02030000 00050A04 00020070 0004085B 02030000 ....(...p...å..........*...õ... 0000A0
000209B6 02030111 0004003E 02030019 0002020F 0203007E 0004082B 02030008 ....+...~...Ô.......>.......Ñ... 0000C0
00040AA9 02030036 000205E8 020300A5 00040ABD 02030985 00020A5D 00050028 (...]........§...È...Ò...6...`... 0000E0
000102C9 0103000F 00040AF0 02030056 000409E7 020300CE 0004098D 020300BB £.......ö...Ö...V...Þ...Ö...è... 000100
FF0876FF D88EFFFF B81E5657 000024C8 00000000 00000000 00000000 000000F7 ¥...............à$..WV.|...Ä.v.. 000120
00003D9A 5016E046 80DC76FF DE76FF0E 56890C46 890000FF FF9A006A 056A0676 v.j.j.......FÉ.VB.vB.vÉ.FÅ.P.=.. 000140
462BE846 88036A00 6A0676FF 0876FF00 00FFFF9A 5016F046 800676FF 0876FF00 ..v..v..FÞ.P......v..v.j.j..FÒ+F 000160
9A026A00 6A006A50 F8D1C22B 99F44603 FC462BEC 468850F8 D1C22B99 F04603F8 ½.FÞ.+ôî½P.F§+F=.F¶.+ôî½Pj.j.j.. 000180
FF26065E C4D88E00 08B81E56 57000000 CBCBC95F 5E1F0000 E9000088 0000FFFF ....|..Õ...^_èùà...WV.|...Ä6^.&. 0001A0
68006A1D AF680A77 FF26065E C40000FF FF9A016A 0A76FF0C 76FF0677 FF260877 w.&.w..v..v.]......6^.&.w.h€.j.h 0001C0
0087B81E 56570000 06C8C8C9 5F5E1F00 00E90000 B80000FF FF9A016A 006A029A ..j.j......|..Õ...^_èùà...WV.|.. 0001E0

Dump of file SATURN:[PCCOMMON.DUMP.DLL]OBJFND.TMP;1 on 18-APR-1990 10:48:15.76
File ID (749,26,0)   End of file block 15 / Allocated 16

Virtual block number 9 (00000009), 512 (0200) bytes

478B260A 5EC40000 01209A00 6A006A00 6A006A01 6E68656A 0676FF08 76FFD88E .Ä.v..v.jehn.j.j.j.j.. .. 6^.&.G 000000
6168656A 0676FF08 76FF0050 E90375FC 4608FA46 88FC5689 FA468912 57882610 .&.W..F*.V=.F*.F=u.ÕP..v..·/.jeha 000020
68656A06 76FF0876 FFFE4689 0000013E 9A37FF26 0277FF26 FA5EC4FE 6A006A01 .j.j±6^*&.w.&.7.>....F±.v..  jeh 000040
FA468916 57882614 478826FA 5EC40000 016A9AFA 76FFFC76 FFFE76FF 006A0169 |.j..v±.v=.v*.j...6^*&.G.&.W..F* 000060
00880000 FFFF9A01 6A006A00 6A006A01 6468656A 0676FF08 76FFFFA5 E9FC5689 .V=ÕE..v..v.jehd.j.j.j.j......|. 000080
016E6868 6A0676FF 0876FFD8 8E00CE88 1E565700 0006C8CB C95F5E1F 0000E900 .Õ...^_èùà...WV.|ö..Ä.v..v.jhhn. 0000A0
4688FE56 89FC4689 10578826 0E478826 0E5EC400 00020C9A 006A006A 006A006A j.j.j.]......6^.&.G.&.W..F=.V±.F 0000C0
789A37FF 260277FF 26FC5EC4 50520032 050C5688 0A468800 89E90375 FE4608FC =.F±u.Õ...F..V..2.RP6^=&.w.&.7.x 0000E0
E9FE5689 FC46890C 5788260A 478826FC 5EC40014 E9037C00 003D08C4 83FFFF00 ....6.=..|.Õ..6^=&.G.&.W..F=.V±Õ 000100
0000022A 9A37FF26 0277FF26 FC5EC4FE 6A006A01 6168686A 0676FF08 76FFFF8C ¥..v..v.jhha.j.j±6^=&.w.&.7.*... 000120
5EC40000 00E69AFC 76FFFE76 FFFA76FF 006A0169 68686A06 76FF0876 FFFA4689 .F*.v..v.jhhi.j..v*.v±.v=.Ì...6^ 000140
000EC8C8 C95F5E1F 0000E900 00B8FF6C E9FE5689 FC46890C 5788260A 478826FC =&.G.&.W..F=.V±Õl.|..Õ...^_èùà.. 000160
0A5EC4FE 46892047 88260A5E C4F84689 04478826 0A5EC4D8 8E0181B8 1E565700 .WV.|...Ä6^.&.G..F½6^.&.G ¯.F±6^. 000180
6568686A 0676FF08 76FFFFFF F646C7F4 46892447 88260A5E C4F24689 22478826 &.G".F·á^.&.G$.F¶úF-...v..v.jhhe 0001A0
76FF0876 FF00C6E9 0375FFF6 7E83F646 89000002 C09A006A 006AF676 FF006A01 .j..v-j.j..å....F-.--.u.Õ6..v..v 0001C0
037500FE 7E83FC56 89FA4689 00000199 9A006A00 6AF676FF 006A016A 68686A06 .jhhj.j..v-j.j.......F*.V=.-±.u. 0001E0
```

Dump of file SATURN:[PCCOMMON.DUMP.DLL]OBJFND.TMP;1 on 18-APR-1990 10:48:15.76
File ID (749,26,0)   End of file block 15 / Allocated 16

Virtual block number 10 (0000000A), 512 (0200) bytes

830AC483 030F06A2 9AF876FF FA76FFFC 76FF5052 0026050C 56880A46 88001CE9 Ő...F..V..&.RP.v=.v°.v½.Å....ó.. 000000
3406A29A F876FFFA 76FFFC76 FF505200 2A050C56 880A4688 001CE903 7500F27E ~·.u.Ő...F..V..*.RP.v=.v°.v½.Å.4 000020
76FFFA76 FFFC76FF 5052002E 050C5688 0A468800 1CE90375 00F47E83 0AC48303 ..ó..-¶.u.Ő...F..V....RP.v=.v°.v 000040
03679A00 6A006AF6 76FF006A 01646868 6A0676FF 0876FF0A C483FFFF 06A29AF8 ½.Å....ó..v..v.jhhd.j..v-j.j..g. 000060
31E9F646 89000002 9B9A006A 006AF676 FF006A01 6568686A 0676FF08 76FF0000 ...v..v.jhhe.j..v-j.j.......F-Ő1 000080
0B2607B8 260A5EC4 D88E0255 B81E5657 000004C8 CBC95F5E 1F0000E9 000088FF .¡..Ő...^_èùà...WV.¡U..Äó^.&..&. 0000A0
FF26065E C4FE5689 FC468904 C4830308 07029A0A 76FF0C76 FF0049E9 03750247 G.u.Ől..v..v....Ä..ó..F=.V±ó^.&. 0000C0
5EC4FC76 FFFE76FF 0000009F 9A016A02 77FF2604 77FF26FC 5EC40677 FF260877 w.&.w.ó^=&.w.&.w.j.......v±.v=ó^ 0000E0
57000004 C8CBC95F 5E1F0000 E90000B8 FFABE906 C48302EA 05D29A04 77FF2606 .&.w..●.ő..ó.Ő´.¡..Ő...^_èùà...W 000100
4707029A 0A76FF0C 76FF0049 E9037502 470B2607 8B260A5E C4D88E03 84881E56 V.¡...Äó^.&..&.G.u.Ől..v..v....G 000120
0277FF26 0477FF26 FC5EC406 77FF2608 77FF2606 5EC4FE56 89FC4689 04C48304 ..ó..F=.V±ó^.&.w.&.w.ó^=&.w.&.w. 000140
B8FFA8E9 06C48303 A005D29A 0477FF26 065EC4FC 76FFFE76 FF000003 C49A006A j..ó....v±.v=ó^.&.w..●....ó.Ő´.¡ 000160
02470B26 07BB260A 5EC4D88E 03F3B81E 56570000 04C8CBC9 5F5E1F00 00E90000 ..Ő...^_èùà...WV.¡Æ..Aó^.&..&.G. 000180
0477FF26 FC5EC4FE 5689FC46 8904C483 04B20702 9A0A76FF 0C76FF00 45E90375 u.ŐE..v..v....ý..á..F=.V±ó^=&.w. 0001A0
9A0477FF 26065EC4 FC76FFFE 76FF08C4 83FFFF00 7F9A0676 FF0876FF 0277FF26 &.w..v..v.......ó..v±.v=á^.&.w.. 0001C0
8E0462B8 1E565700 0002C8CB C95F5E1F 0000E900 0088FFAC E906C483 040F05D2 ●....á.Ő¯.¡..Ő...^_èùà...WV.¡b.. 0001E0

Dump of file SATURN:[PCCOMMON.DUMP.DLL]OBJFND.TMP;1 on 18-APR-1990 10:48:15.76
File ID (749,26,0)   End of file block 15 / Allocated 16

Virtual block number 11 (0000000B), 512 (0200) bytes

0876FF12 76FF1476 FFFE4689 0000FFFF 9A1276FF 1476FF00 6A0676FF 0876FFD8 Ä.v..v.j..v..v.......F±.v..v..v. 000000
1F0000E9 0001B804 C4830490 00009A06 76FF0876 FF08C483 050400C6 9A0676FF .v..ó....ó..v..v.......ó.¡..Ő... 000020
8326125E C4024BE9 0A468800 00FE46C7 D88E04CD B81E5657 000068C8 CBC95F5E ^_èùàh..WV.¡ë..ÄúF±...F.ŐK.ó^.&. 000040
26125EC4 00F1E90C 46880251 E90001FE 46C71647 8926125E C4D8F7C0 1801167F ....ä¼Äó^.&.G.úF±..ŐQ..F.Őþ.ó^.& 000060
6A016568 656A0676 FF0876FF 00F4E900 001C47C7 26125EC4 0100E900 011C47C7 úG...Ő..ó^.&úG...Ő¶..v..v.jehe.j 000080
6A9876FF 006A016A 68656A06 76FF0876 FF984689 00000594 9A006A00 6A006A00 .j.j.j.......F..v..v.jehj.j..v.j 0000A0
0B260E47 8826185F C426125E C41A5789 26184789 26125EC4 0000034E 9A006A00 .j..N...ó^.&.G.&.W.ó^.&ó_.&.G.&. 0000C0
05D69A04 77FF2612 5EC40E77 FF261077 FF26185F C426125E C40030E9 03751047 G.u.ŐO.ó^.&ó_.&.w.&.w.ó^.&.w.... 0000E0
FF261A77 FF26125E C40E4789 26104789 260000B8 185FC426 125EC406 C483047E ~..ó.á^.&ó_.Ī..&.G.&.G.ó^.&.w.&. 000100
76FF1476 FF1877FF 261A77FF 26125EC4 08C48305 D00ACC9A 1276FF14 76FF1877 w..v..v..ä.Å..ó.ó^.&.w.&.w..v..v 000120
0000FFFF 9A676A06 76FF0876 FF016A00 6A0CC483 060F0179 9A0676FF 0876FF12 ..v..v..y.Ő..ó.j.j..v..v.jg..... 000140
00053DFF 0BE90375 00033DFF 07E90375 00023D00 18E90163 E90000FF FF9A5052 RP.....Őc.Ő..=..u.Ő..=..u.Ő..=.. 000160
646A676A 0676FF08 76FF0081 E90C468B 0137E900 01FE46C7 0000E9FF 0FE90375 u.Ő..Ő..úF±..Ő7..F.Ő...v../.jgjd 000180
00369A50 169A4680 50520032 0514568B 12468B98 46890000 FFFF9A50 169A4680 _F..P......F..F..V..2.RP.F..`.6. 0001A0
00009A50 52003205 14568812 46885016 9A468000 47E90375 00003D08 C48306B0 ¯..ó.=..u.ŐG..F..P.F..V..2.RP... 0001C0
1877FF26 1A77FF26 125EC400 1FE90375 1A470B26 18478B26 125EC408 C48301D1 Ī..ó.á^.&.G.&.G.u.Ő..ó^.&.w.&.w. 0001E0

Dump of file SATURN:[PCCOMMON.DUMP.DLL]OBJFND.TMP;1 on 18-APR-1990 10:48:15.76
File ID (749,26,0)   End of file block 15 / Allocated 16

Virtual block number 12 (0000000C), 512 (0200) bytes

E9FF77E9 03750002 3D0000BE9 0CC48304 F601799A 0676FF08 76FF1276 FF1476FF .v..v..v..v..y.-..ó.Ő..=..u.Őw.Ő 000000
3D0000BE9 000EE900 001E47C7 26125EC4 000FE90C 46880090 E90001FE 46C70000 ..úF±..Ő...F.Ő..ó^.&úG...Ő..Ő..= 000020
5EC4D8F7 C01B0120 7F832612 5EC40075 E90001FE 46C70000 E9FFE9E9 03750002 ..u.ŐŐ.Ő..úF±..Őu.ó^.&.. ..ä¼Äó^ 000040
22478926 125EC4D8 F7C01B01 227F8326 125EC400 5AE90001 FE46C720 47892612 .&.G úF±..ŐZ.ó^.&..".ä¼Äó^.&.G" 000060
0001FE46 C7244789 26125EC4 D8F7C018 01247F83 26125EC4 003FE900 01FE46C7 úF±..Ő?.ó^.&..$..ä¼Äó^.&.G$úF±.. 000080
FA066005 2B054607 89A7FF2E 93C00300 16E90376 00063000 652D0021 E90024E9 Ő$.Ől.-e.=..v.Ő...á...Ī..F.+.`.* 0000A0
46C7D88E 051CB81E 56570000 02C8CBC9 5F5E1F00 00E9FE46 8B075807 3D072206 .".=.X..F±Ő...^_èùà...WV.¡...ÄúF 0000C0
470B2618 478B2612 5EC4004F E9037500 1C7F8326 125EC401 96E90A46 8B0000FE ±...F.Ő..ó^.&...u.ŐO.ó^.&.G.&.G 0000E0
01799A06 76FF0876 FF1276FF 1476FF18 77FF261A 77FF2612 5EC4001F E903751A .u.Ő..ó^.&.w.&.w..v..v..v..v..y. 000100
FE46C700 0008A69A 50520000 089F9A68 6A0676FF 0876FF01 6A006A0C C4830824 $..ó.j.j..v..v.jh.....RP.Ī...úF± 000120
1E47C726 125EC408 C4830846 024D9A06 76FF0876 FF1276FF 1476FF01 65E90001 ..Őe..v..v..v..v..M.F..ó.ó^.&úG. 000140
56881246 8808C483 085F037C 9A1276FF 1476FF50 52002605 14568812 46880001 ...F..V..&.RP.v..v..|._..ó..F..V 000160
FF505200 2E051456 8812468B 08C48308 7803EB9A 1276FF14 76FF5052 002A0514 ..*.RP.v..v..Š.x..ó..F..V....RP. 000180
E9037500 1C7F8326 125EC400 F5E90001 FE46C708 C483061A 045A9A12 76FF1476 v..v..Z....ó.úF±..ŐX.ó^.&....u.Ő 0001A0
E90001FE 46C70000 06339A50 52000006 2C9A686A 0676FF08 76FF016A 006A0020 .j.j..v..v.jh.,...RP.3...úF±..Ő 0001C0
8800011E 47C72612 5EC408C4 8308E302 4D9A0676 FF0876FF 1276FF14 76FF00C8 à..v..v..v..v..M.D..ó.ó^.&úG.... 0001E0

```
Dump of file SATURN:[PCCOMMON.DUMP.DLL]OBJFND.TMP;1 on 18-APR-1990 10:48:15.76
File ID (749,26,0)   End of file block 15 / Allocated 16

Virtual block number 13 (00000000), 512 (0200) bytes

 2A051456 88124688 08C48308 FC037C9A 1276FF14 76FF5052 00260514 56881246 F..V..&.RP.v..v..|.•..ó..F..V..* 000000
 FF1476FF 5052002E 05145688 12468808 C4830915 03E89A12 76FF1476 FF505200 .RP.v..v..Š....ó..F..V....RP.v.. 000020
 FF004BE9 0001FE46 C7000009 389A016A 0676FF08 76FF08C4 8307F004 5A9A1276 v..Z.Þ..ó..v..v.j..8...úF±..ÕK.. 000040
 3D002BE9 002EE900 01FE46C7 0036E900 01FE46C7 0000FFFF 9A006A06 76FF0876 v..v.j......úF±..Õ6.úF±..Ñ..Õ+.= 000060
 3DFFC0E9 0375006E 3DFF1EE9 03750060 3DFE5AE9 0375006C 3DFFD8E9 03750002 ..u.ÕA.=l.u.ÕZ±=m.u.Õ..=n. .Õä.= 000080
 8E07AA88 1E565700 0006C8C8 C95F5E1F 0000E9FE 46880000 E9FFCDE9 0375006F o.u.Õë.Õ...F±Õ...^_èùà...WV :`.. 0000A0
 76FFFC76 FFFE76FF FE5689FC 46890856 88064688 00A7E90E 46880000 FA46C7D8 ÄúF•...F.ÕÏ..F..V..F•.V±.v±.v•.v 0000C0
 76FF0090 E9FA4689 10C48309 FC04C59A 1076FF12 76FF0A76 FF0C76FF 0676FF08 ..v..v..v..v..v..é.•..ó..F•Õ...v 0000E0
 0C76FF06 76FF0876 FFFC76FF FE76FFFE 5689FC46 8900000A 109A006A 1076FF12 ..v.j.......F•.V±.v±.v•.v..v..v. 000100
 9A006A10 76FF1276 FF0057E9 FA468910 C4830A35 05149A10 76FF1276 FFDA76FF .v..v..v....5..ó..F•ÕW..v..v.j.. 000120
 FF1276FF 0A76FF0C 76FF0676 FF0876FF FC76FFFE 76FFFE56 89FC4689 0000FFFF .....F•.V±.v±.v•.v..v..v..v..v.. 000140
 03750030 3DFFBCE9 03750020 3D001BE9 001EE9FA 468910C4 8308C107 A29A1076 v..Å.è..ó..F•Õ..Õ..= .u.Õ¥.=0.u. 000160
 0020E900 008A0000 88000CE9 037500FA 7E830000 E9FF41E9 03750038 3DFF7BE9 Õ(.=;.u.ÕA.Õ...-•.u.Õ..¡..¤..Õ . 000180
 0000E900 00FFFF9A 0676FF08 76FF0A76 FF0C76FF 0E76FF10 76FF1276 FF001DE9 Õ...v..v..v..v..v..v..v......Õ.. 0001A0
 00010578 0103007E 00010923 01030000 000105F8 00020011 90000ECA C95F5E1F .^_èÞ.......«........#...~...x... 0001C0
 00040690 00020008 00010070 01030087 00010676 01030000 000209C3 0002007F ....ü.......v.......p........... 0001E0

Dump of file SATURN:[PCCOMMON.DUMP.DLL]OBJFND.TMP;1 on 18-APR-1990 10:48:15.76
File ID (749,26,0)   End of file block 15 / Allocated 16

Virtual block number 14 (0000000E), 512 (0200) bytes

 00010802 0103010E 000104E0 01030100 00010907 01030000 0005098D 00020000 ............•.......Å........... 000000
 00010A89 01030095 00040433 0203001A 0001002D 01030019 00010017 01030013 ............¯.......3........... 000020
 00000000 00000000 00000000 00000047 00030087 0203004D 00010809 01030083 •.......M...ñ...G............... 000040
 00000000 00000000 00000600 02000200 01C80001 881F0000 3E89D88E FFFF881E .¡...Ã.>...¡..Ù................. 000060
 A8C78806 7EC4D1F7 AEF2FFFF B9C033C0 8ED88CFE 880A76C5 1EDE88D7 88EC8855 U.š.•.ß.év..±.Ã.ô3â¿..·Ü¼ìá–..ú´ 000080
 76C51EDE 88D788EC 8855CB5D C28C1FFA 88F388A4 F3C913A5 F3E9D149 A4027401 .t.ÈÌìÕµÉ.èµÉ.µ.•..ô]ÙU.š.•.ß.év 0000A0
 00CB5DFA 88F3881F FFFF1DC0 180574A6 F3F928D1 F7AEF2FF FF89C033 0A7EC406 .á~.3â¿..·Ü¼ì+•µlt..â.....µ.•]ù. 0000C0
 76C51ED6 88EC8855 00CB5DFA 889149D1 F7AEF2FF FF89C033 067EC407 88EC8855 U.š.•á~.3â¿..·Ü¼ìl..•]ù.U.š.•.év 0000E0
 4104C102 20E180C9 1A1A3C41 2CF374E0 3A43278A 26AC2D74 C00AFF80 065EC40A .á^.¯..ât-¯&.'C:Átµ,A<..è.Ã .è.A 000100
 000000CB 5DF2881F 98FF1CC0 1AD374C4 3A4104C1 0220E180 C91A1A3C 412CE086 .Ã,A<..è.Ã .è.A:átÆ.â.....·]ù... 000120
 00000000 FFFF0001 000E0352 0000025B 00000000 00000006 00000002 0001FFFF .................[...R........... 000140
 00000000 01DEFFFF 00640085 00EA0009 00009400 009001D0 000D0001 0000000E ........Å.........õ.ç.d...B..... 000160
 00000000 0000FFFF FFFF0066 000A0086 00A70005 80020002 01E2001C 00030000 ......ã.......Ì.....f........... 000180
 00070000 00000000 FFFFFFFF FFFF0008 0039009C 00058001 000101FF 000C0005 ..............9................. 0001A0
 000C0005 00000000 0000FFFF FFFF0065 002000E0 007A0005 80020000 020C0000 ..........z.À. .e............... 0001C0
 021A0000 00060000 00000000 FFFFFFFF FFFF0008 003A006A 00058001 00010200 ........j.:..................... 0001E0

Dump of file SATURN:[PCCOMMON.DUMP.DLL]OBJFND.TMP;1 on 18-APR-1990 10:48:15.76
File ID (749,26,0)   End of file block 15 / Allocated 16

Virtual block number 15 (0000000F), 512 (0200) bytes

 0001021B 00070005 00000000 0000FFFF FFFF0067 0008000C 005E0007 8002000C ......^.É...g................... 000000
 80020001 02230000 00070000 00000000 FFFFFFFF FFFF0008 00260052 00058001 ....R.&.................#...... 000020
 00118002 00040224 00070003 00000000 0000FFFF FFFF0068 002600E1 002A0005 ..*.Ã.&.h...............$....... 000040
 001A0051 80020004 022C0009 00030000 00000000 FFFFFFFF 00690000 0030001A ..Q...i..................,.....0... 000060
 0044001A 00908002 00040236 000E0003 00000000 0000FFFF FFFF006A 00000037 7...j..............6.........D. 000080
 00000026 0005001A 80020000 02450003 00030000 00000000 FFFFFFFF 006B0000 ..k...............E.........&... 0000A0
 006C0000 00260005 004A8002 04000249 00050003 00000000 0000FFFF FFFF006D m...............I.....J...&...l. 0000C0
 FFFF006E 00000026 0005007A 80020000 024F0006 00030000 00000000 FFFFFFFF ..............O.....z...&...n... 0000E0
 FFFFFFFF 006F0000 00260005 00AA8002 01000256 00040003 00000000 0000FFFF ............V.....¯...&...o..... 000100
 64657463 656C6573 20776F68 7E530000 00030072 65646E69 66207463 656A624F Object finder.....S~how selected 000120
 6A624F00 00736570 79742074 63656A62 4F003F79 6C6E6F20 73746365 6A626F20  objects only?.Object types..Obj 000140
 7365447E 00746365 6C65537E 00007374 63656A62 4F00003A 6560616E 20746365 ect name:..Objects..~Select.~Des 000160
 4300796C 70704100 484F7E00 7463656C 65532026 20746964 457E0074 63656C65 elect.~Edit & Select.~OK.Apply.C 000180
 00000000 00000000 00000000 00000000 00000000 4600706C 6548006C 65636E61 ancel.Help.F.................... 0001A0
 00000000 00000000 00000000 00000000 00000000 00000000 00000000 00000000 ................................ 0001C0
 00000000 00000000 00000000 00000000 00000000 00000000 00000000 00000000 ................................ 0001E0
```

```
Dump of file SATURN:[PCCOMMON.DUMP.DLL]UIW.TMP;1 on 18-APR-1990 10:53:22.77
File ID (940,4,0)   End of file block 88 / Allocated 88

Virtual block number 1 (00000001), 512 (0200) bytes

00000001 00000040 00000000 CEF80000 0000FFFF 00000020 00000058 00AC5A4D MZ¯.X... .........½ö....a....... 000000
00000400 00000000 00000000 00000000 00000000 00000000 00000000 00000000 ................................ 000020
00000000 00000000 00000000 00000000 00000000 00000000 00000000 00000000 ................................ 000040
00000000 00000000 00000000 00000000 00000000 00000000 00000000 00000000 ................................ 000060
00000000 00000000 00000000 00000000 00000000 00000000 00000000 00000000 ................................ 000080
00000000 00000000 00000000 00000000 00000000 00000000 00000000 00000000 ................................ 0000A0
00000000 00000000 00000000 00000000 00000000 00000000 00000000 00000000 ................................ 0000C0
00000000 00000000 00000000 00000000 00000000 00000000 00000000 00000000 ................................ 0000E0
00000000 00000000 00000000 00000000 00000000 00000000 00000000 00000000 ................................ 000100
00000000 00000000 00000000 00000000 00000000 00000000 00000000 00000000 ................................ 000120
00000000 00000000 00000000 00000000 00000000 00000000 00000000 00000000 ................................ 000140
00000000 00000000 00000000 00000000 00000000 00000000 00000000 00000000 ................................ 000160
00000000 00000000 00000000 00000000 00000000 00000000 00000000 00000000 ................................ 000180
00000000 00000000 00000000 00000000 00000000 00000000 00000000 00000000 ................................ 0001A0
00000000 00000000 00000000 00000000 00000000 00000000 00000000 00000000 ................................ 0001C0
00000000 00000000 00000000 00000000 00000000 00000000 00000000 00000000 ................................ 0001E0

Dump of file SATURN:[PCCOMMON.DUMP.DLL]UIW.TMP;1 on 18-APR-1990 10:53:22.77
File ID (940,4,0)   End of file block 88 / Allocated 88

Virtual block number 2 (00000002), 512 (0200) bytes

72502032 2F534F20 73657269 75716572 20606172 676F7270 20736968 540033E8 è3.This program requires OS/2 Pr 000000
4C01B821 CD09B41F 0E5A240A 0D2E7265 67616E61 4D206E6F 69746174 6E657365 esentation Manager...$Z..Ç.ë!¦.L 000020
00000000 00000000 00000000 00000000 00000000 00000000 00000000 000021CD ë!.............................. 000040
00000000 00000000 00000000 00000000 00000000 00000000 00000000 00000000 ................................ 000060
00000000 00000000 00000000 00000000 00000000 00000000 00000000 00000000 ................................ 000080
00000000 00000000 00000000 00000000 00000000 00000000 00000000 00000000 ................................ 0000A0
00000000 00000000 00000000 00000000 00000000 00000000 00000000 00000000 ................................ 0000C0
00000000 00000000 00000000 00000000 00000000 00000000 00000000 00000000 ................................ 0000E0
00000000 00000000 00000000 00000000 00000000 00000000 00000000 00000000 ................................ 000100
00000000 00000000 00000000 00000000 00000000 00000000 00000000 00000000 ................................ 000120
00000000 00000000 00000000 00000000 00000000 00000000 00000000 00000000 ................................ 000140
00000000 00000000 00000000 00000000 00000000 00000000 00000000 00000000 ................................ 000160
00000000 00000000 00000000 00000000 00000000 00000000 00000000 00000000 ................................ 000180
00000000 00000000 00000000 00000000 00000000 00000000 00000000 00000000 ................................ 0001A0
00000000 00000000 00000000 00000000 00000000 00000000 00000000 00000000 ................................ 0001C0
00000000 00000000 00000000 00000000 00000000 00000000 00000000 00000000 ................................ 0001E0

Dump of file SATURN:[PCCOMMON.DUMP.DLL]UIW.TMP;1 on 18-APR-1990 10:53:22.77
File ID (940,4,0)   End of file block 88 / Allocated 88

Virtual block number 3 (00000003), 512 (0200) bytes

00080008 00000000 00062900 00000800 00088002 B21D808A 0045030F 0505454E NE....E.a..ŷ........Å).......... 000000
00000000 00000000 00010000 00040000 00000754 01C701B7 00800080 00400013 ..a.....ñ.ú.T................... 000020
00160F00 00160427 0C220F00 0C220356 27940F00 279300C9 04CC0F00 04CC0077 w.ä...ä.è..'...'V."...".'....... 000040
40500F01 1EA208FF 02020E01 00000000 3E460F00 3E460514 000A0F00 000A0505 ..Ö...Ö...F>..F>..........Å...Pa 000060
504F4554 41455243 57495512 00014C4F 4F544854 45475749 550B0000 57495503 .UIW...UIWGETHTOOL...UIWCREATEOP 000080
4954504F 57495510 0003544E 45494C43 54454757 49550C00 02444E57 4E4F4954 TIONWND...UIWGETCLIENT...UIWOPTI 0000A0
55100005 434F5250 574F444E 49575445 47574955 10000443 4F525044 4E574E4F ONWNDPROC...UIWGETWINDOWPROC...U 0000C0
4F525044 4E575455 504E4957 49550F00 06434F52 50574F44 4E495754 45535749 IWSETWINDOWPROC...UIWINPUTWNDPRO 0000E0
5054554F 57495510 0008444E 57545550 54554F45 54414552 43574955 12000743 C...UIWCREATEOUTPUTWND...UIWOUTP 000100
54504F57 49551400 0A454D41 52465445 47574955 08000943 4F525044 4E575455 UTWNDPROC...UIWGETFRAME...UIWOPT 000120
57545550 4E494554 41455243 57495511 0008534E 464C4542 414C5445 534E4F49 IONSETLABELFNS...UIWCREATEINPUTW 000140
49551500 00534E46 454C4249 53495654 45534E4F 4954504F 57495516 000C444E ND...UIWOPTIONSETVISIBLEFNS...UI 000160
534E4F49 54504F57 49551E00 0E534E46 45564954 43415445 534E4F49 54504F57 WOPTIONSETACTIVEFNS...UIWOPTIONS 000180
52001600 10000A00 0100000F 534E4645 4C424953 49564E45 52444C49 48435445 ETCHILDRENVISIBLEFNS...........R 0001A0
454D0349 50474D50 054E4957 4D500553 4C4C4143 534F4408 00013800 B1008F00 ...Ÿ.;...DOSCALLS.PMWIN.PMGPI.ME 0001C0
4D005041 4548594F 52545345 444D454D 0E504145 48455441 45524340 454D0D4D M.MEMCREATEHEAP.MEMDESTROYHEAP.M 0001E0
```

```
Dump of file SATURN:[PCCOMMON.DUMP.DLL]UIW.TMP;1 on 18-APR-1990 10:53:22.77
File ID (940,4,0)   End of file block 88 / Allocated 88

Virtual block number 4 (00000004), 512 (0200) bytes

54551054 5544034B 434F4C42 45455246 4D454D0C 4B434F4C 42434F4C 4C414D45 EMALLOCBLOCK.MEMFREEBLOCK.DUT.UT 000000
53525543 45534145 4C455247 41424C54 5513524F 53525543 54494E49 4741424C LBAGINITCURSOR.UTLBAGRELEASECURS 000020
4F504954 470A4954 4703524F 53525543 45544152 45544947 41424C54 5513524F OR.UTLBAGITERATECURSOR.GTI.GTIPO 000040
54550E45 45525404 574F444E 49574C4F 4F545952 45555149 54471247 53405453 STMSG.GTIQUERYTOOLWINDOW.TREE.UT 000060
444C4948 4345444F 4E454552 54544547 4C545516 544F4F52 45455254 5445474C LGETTREEROOT.UTLGETTREENODECHILD 000080
54544547 4C545517 544E4552 41504544 4F4E4545 52545445 474C5455 144E4552 REN.UTLGETTREENODEPARENT.UTLGETT 0000A0
4445444F 4E454552 54544547 4C545519 474E494C 42495350 5545444F 4E454552 REENODEUPSIBLING.UTLGETTREENODED 0000C0
4552444C 49484345 444F4E45 45525454 45474C54 5517474E 494C4249 534E574F OWNSIBLING.UTLGETTREENODECHILDRE 0000E0
02010000 01050112 22010201 00840105 01455449 5257534F 44084F49 5303314E N1.SIO.DOSWRITE...Ç....″........ 000100
01020100 2E010501 0A3A0100 00010402 07230103 01008A01 005C0105 02228501 ..″...\.......#.......:......... 000120
6163696C 70704120 5749550F 00000065 0100A001 002A0102 03000001 03010000 ..........*.....e....UIW Applica 000140
08064688 D88EFFFF 881E5657 000004C8 00000000 00000000 00000000 6E6F6974 tion............à...WV.¡....Ä.F.. 000160
FC468800 00FFFF9A 5016FC46 800676FF 0876FF00 27E90000 B80006E9 03740846 F.t.Õ..¡..Õ′..v..v..F•.P......F• 000180
1E565700 0028C8CB C95F5E1F 0000E900 00B80003 E90001B8 0006E903 74FE460B .F±t.Õ..¡..Õ..¡..Õ...^_èùà(..WV. 0001A0
57882638 4788260A 5EC4F656 89F44689 32578826 30478826 0A5EC4D8 8E000888 ¡...Äá^.&.GO&.W2.F¶.V-ã^.&.G8&.W 0001C0
89FE4689 000088F8 4689FA46 890000B8 E84689EA 46890000 B8E05689 DE46893A :.F8.VÁ¡...Fõ.FÒ¡...F*.F½¡...F±. 0001E0

Dump of file SATURN:[PCCOMMON.DUMP.DLL]UIW.TMP;1 on 18-APR-1990 10:53:22.77
File ID (940,4,0)   End of file block 88 / Allocated 88

Virtual block number 5 (00000005), 512 (0200) bytes

5EFF5016 EC468006 76FF0876 FFF25689 F046892E 5788262C 4788260A 5EC4FC46 F•á^.&.G,&.W..FÞ.V·.v..v..F$.P.^ 000000
FF0876FF DE5EFF50 16D8468D 0676FF08 76FF0789 26024789 260000B8 0E5EC4F0 Þá^.¡..&.G.&...v..v..FÄ.P.^B.v.. 000020
0073E903 75E4460B E2468800 7EE90375 00087E83 0000FFFF 9A5016E2 468D0676 v..Fã.P......-Ä.u.Õ~..Fã.Fõu.Õs. 000040
80505200 00014F9A 0676FF08 76FF0000 FFFF9A50 52000001 099A0676 FF0876FF .v..v......RP......v..v..O...RP. 000060
83F45EFF 5016E646 8DE876FF EA76FF00 42E90374 00003D00 00FFFF9A 5016E846 FÒ.P.....=..t.ÕB..võ.vÒ.F|.P.^¶. 000080
FF9A0676 FF0876FF 02578926 078926EA 568BE846 8B0E5EC4 0028E903 7500E67E -|.u.Õ(.á^..FÒ.Võ&..&.W..v..v... 0000A0
879A5016 DA468D06 76FF0876 FFFF9FE9 012EE900 00B80000 FFFF9A50 520000FF ...RP.....¡..Õ..Õ...v..v..FÖ.P.ñ 0000C0
00E67E83 F45EFF50 16E6468D DA76FFDC 76FF004C E903750C 460BDA46 88000001 ....FÖ.FÉu.ÕL..vÉ.vÖ.F|.P.^¶.-|. 0000E0
76FFDC76 FF00E3E9 0000B802 57892607 89260C56 88DA4688 0E5EC400 16E90375 u.Õ..á^..FÖ.VÉ&..&.W.¡..ÕD..vÉ.v 000100
08568806 468BFFA9 E9DC5689 DA4689EA 568BE846 88000002 099A5016 E84680DA Õ.FÒ.P......FÒ.Võ.FÖ.VÉÕ`..F..V. 000120
1CE90375 FA460BF8 46880000 00299A50 16F8468D DA76FFDC 76FFDC56 890A4689 .FÖ.VÉ.vÉ.vÖ.F½.P.)....F½.F*u.Õ. 000140
FC468800 00FFFF9A 5016FC46 8DF876FF FA76FFDC 56890A46 89FA5688 F8468800 ..F½.V*.FÖ.VÉ.v*.v½.F•.P......F• 000160
C4830289 00009AF8 76FFFA76 FF0016E9 0375FA46 0BF84688 0021E903 74FE460B .F±t.Õ!..F½.F*u.Õ...v*.v½......á 000180
FF5016E6 468DFC76 FFFE76FF 004AE903 75FE4608 FC468BFF 90E90375 00003D04 .=..u.Õ...F•.F±u.ÕJ..v±.v•.F|.P. 0001A0
1DE90000 B8025789 26078926 FE568BFC 46880E5E C40019E9 037500E6 7E83F45E ^¶.-|.u.Õ..á^..F•.V±&..&.W.¡..Õ. 0001C0
5E1F0CC4 83FFFF00 499AFC76 FFFE76FF 0A76FF0C 76FF0E76 FF1076FF 001AE900 .Õ...v..v..v..v..v±.v•.|....á..^ 0001E0

Dump of file SATURN:[PCCOMMON.DUMP.DLL]UIW.TMP;1 on 18-APR-1990 10:53:22.77
File ID (940,4,0)   End of file block 88 / Allocated 88

Virtual block number 6 (00000006), 512 (0200) bytes

FE5689FC 46893257 8B263047 8B260A5E C4D88E00 51881E56 57000018 C8CBC95F  èùà...WV.¡Q..Äá^.&.GO&.W2.F•.V± 000000
76FF0789 26024789 260000B8 0E5EC4F4 5689F246 893A578B 2638478B 260A5EC4 ã^.&.G8&.W:.F·.V¶á^.¡..&.G.&...v 000020
89260856 8B06468B 0E5EC400 10E90375 00FA7E83 FC5EFF50 16FA468D 0676FF08 ..v..F*.P.^•.-*.u.Õ..á^..F..V.&. 000040
D89A5016 F6468D06 76FF0876 FFF25EFF 5016EC46 800676FF 0876FF02 57892607 .&.W..v..v..F$.P.^·.v..v..F-.P.Ä 000060
0876FF00 6EE90000 B80006E9 0374F846 0BF6468B 000BE903 7500EC7E 83000000 ....~$.u.Õ...F-.F%t.Õ..¡ .Õn..v. 000080
16EE468D 50520000 00F79A06 76FF0876 FF000000 FE9A5052 00000346 9A0676FF .v..F...RP.±....v..v..%.. ºP.FŸ. 0000A0
9AEE76FF F076FF0A 76FF0C76 FF5016E8 46800037 E9037400 00300000 01159A50 P.....=..t.Õ7..FÒ.P.v..v.... .vŸ. 0000C0
89260789 26EA568B E84688OE 5EC40010 E90375EA 460BE846 880CC483 022C0293 ......á..FÒ.Fõu.Õ..á^..FÒ.Võ&..&. 0000E0
260A5EC4 D88E029B B81E5657 00001AC8 C8C95F5E 1F0000E9 000088FF AAE90257 W.Õ`.¡..Õ...^ èùà...WV.¡...Äá^.& 000100
5EC4E856 89E64689 3A57882 6 38478826 0A5EC4FA 5689F846 89325788 26304788 .GO&.W2.F½.V*ã^.&.G8&.W:..F|.VÒá^ 000120
0E5EC4F4 5EFF5016 F0468D06 76FF0876 FFF65689 F446892E 5788262C 4788260A .&.G,&.W..F¶.V-.v..v..FÞ.P.^¶á^. 000140
EC460BEA 46880000 FFFF9A50 16EA468D 0676FF08 76FF0789 26024789 260000B8 ¡..&.G.&...v..v..Fõ.P......Fõ.F$ 000160
C40CC483 04530293 9AEA76FF EC76FF0A 76FF0C76 FF0E76FF 1076FF00 46E90375 u.ÕF..v..v..v..v..v$.võ...S..á.á 000180
EA76FFEC 76FF0A76 FF0C76FF 0E76FF10 76FF001A E9037402 47082607 8B260E5E ^.&..&.G.t.Õ...v..v..v..v..v$.võ 0001A0
460BFC46 88000001 E29A5016 FC468D06 76FF0876 FF0065E9 0CC48304 BB03A09A ...E..á.Õe..v..v..F•.P.ã....F•.F 0001C0
0E5EC400 19E90375 00EE7E83 F85EFF50 16EE468D FC76FFFE 76FF004A E90375FE ±u.ÕJ..v±.v•.FŸ.P.^½.-Ÿ.u.Õ..á^. 0001E0
```

```
Dump of file SATURN:[PCCOMMON.DUMP.DLL]UIW.TMP;1 on 18-APR-1990 10:53:22.77
File ID (940,4,0)   End of file block 88 / Allocated 88

Virtual block number 7 (00000007), 512 (0200) bytes

 FF0C76FF 0E76FF10 76FF001A E90023E9 00008802 57892607 8926FE56 8BFC4688 .F=.V±&..&.W.|..Õ#.Õ...v..v..v.. 000000
 0002000A 90C8C95F 5E1F0000 E9000088 0CC48303 7203A09A FC76FFFE 76FF0A76 v..v±.v=...r..á.|..Õ...^_èÙ..... 000020
 02030000 000803A8 0002000C 00070467 02030067 00050156 02030000 0001042A *.......V...g...g...É........... 000040
 02030123 00070334 02030109 0007016F 020300F1 00070406 0203007B 00050352 R...(.......þ...o.......4...#... 000060
 8B0E5EC4 D88EFFFF 881E5657 000000C8 00000056 0005033B 020300C5 0007030F ....é...;...V...à...WV.|...Äá^.. 000080
 08568806 46880E5E C4325789 26304789 260C5688 0A4688OE 5EC4D88E 0008881E F..V.&.G,&.W.|..Õ...^_èò..à...WV 0000A0
 8E0032B8 1E565700 0000C800 0CCAC95F 5E1F0000 E9000088 36578926 34478926 .|...Äá^..F..V.&.GO&.Ŵ2á^..F..V. 0000C0
 263C4789 2608568B 0646880E 5EC43A57 89263847 89260C56 880A4688 0E5EC4D8 &.G4&.W6|..Õ...^_èò..à...WV.|2.. 0000E0
 880E5EC4 D88E006D 881E5657 000000C8 000CCAC9 5F5E1F00 00E90000 883E5789 Äá^..F..V.&.G8&.Ŵ:á^..F..V.&.G<& 000100
 00884657 89264447 89260856 8806468B 0E5EC442 57892640 4789260C 56880A46 .W>|..Õ...^_èò..à...WV.|m..Äá^.. 000120
 26065EC4 0000FE46 C7D88E00 A8881E56 5700000E C8000CCA C95F5E1F 0000E900 F..V.&.Ga&.Ŵ8á^..F..V.&.GD&.WF|. 000140
 F2468DFC 5689FA46 89F8568B F6468800 00FFFF9A 5016F646 800277FF 260477FF .Õ...^_èò..à...WV.|´..ÄúF±..á^.& 000160
 89FA4689 F4568BF2 46880CC4 83FFFF00 499AFA76 FFFC76FF 0676FF08 76FF5016 .w.&.w..F-.P......F-.V½.F'.V=.F· 000180
 0AC8CBC9 5F5E1F00 00E9FE46 8BFE4EFF FFCDE903 74F4460B F24688FE 46FFFC56 .P.v..v..v=.v'.|....á..F·.V¶.F'. 0001A0
 46890000 8BFA5689 F8468908 56880646 880000F6 46C7088E 00E3881E 56570000 V=.F±.F·¿F¶t.Õë..N±.F±Õ...^_èùà. 0001C0
                                                                          ..WV.¡D..ÄúF-...F..V..F½.V'|...F 0001E0

Dump of file SATURN:[PCCOMMON.DUMP.DLL]UIW.TMP;1 on 18-APR-1990 10:53:22.77
File ID (940,4,0)   End of file block 88 / Allocated 88

Virtual block number 8 (00000008), 512 (0200) bytes

 499AF876 FFFA76FF 0A76FF0C 76FF5016 FC468D00 4CE9037F 000E7E83 FC4689FE ±.F=.-....ÕL..F=.P.v..v..v'.v½.| 000000
 F646FFFA 5689F846 89FE568B FC468800 0FE90375 FE460BFC 46880CC4 8301E600 .|..á..F=.F±u.Õ...F=.V±.F½.V'.F- 000020
 E9037C00 0E7E8300 52E9FFB7 E9037DF6 46390E46 880008E9 0375FE46 0BFC4688 .F=.F±u.Õ...F.9F-).Õñ.ÕR..-..|.Õ 000040
 460BFC46 880CC483 012103A0 9AF876FF FA76FF0A 76FF0C76 FF5016FC 46800049 |..F=.P.v..v..v'.v½...|..á..F=.F 000060
 0008E903 75FE460B FC4688F6 4EFFFA56 89F84689 FE5688FC 4688000F E90375FE ±u.Õ...F=.V±.F½.V'.N-.F=.F±u.Õ.. 000080
 00E9F646 88025789 26078926 FA5688F8 4688105E C4FFB7E9 037EF646 390E4688 .F.9F--.Õñ.á^..F½.V'&..&.W..F-Õ. 0000A0
 0A5EC418 77FF261A 77FF260A 5EC4D88E 0156881E 56570000 00C8CBC9 5F5E1F00 ..^_èùà...WV.¡V..Äá^.&.w.&.w.á^. 0000C0
 D68301C1 83F218C8 286A7788 26684F88 260A5EC4 02940266 9A505299 4E478826 &.GÑ.RP.f...á^.&.Oh&.wj+à.·.ê..ø 0000E0
 52994E47 8B260A5E C41877FF 261A77FF 260A5EC4 7A778926 784F8926 0A5EC400 .á^.&.Ox&.wzá^.&.w.&.w.á^.&.GN.R 000100
 2B260A5E C4000683 01C183F2 18C8286A 77882668 4F88260A 5EC4FFFF 02669A50 P.f...á^.&.Oh&.wj+à.·.è..ø.á^.&+ 000120
 006C050C 56880A46 880676FF 0876FF72 77892670 4F89260A 5EC41A77 18261B4F O.&.w.á^.&.Op&.wr.v..v..F..V..ĺ. 000140
 D88E023E 881E5657 000006C8 CBC95F5E 1F0000E9 00008800 00FFFF9A 006A5052 RPj......|..Õ...^_èùà...WV.¡>..Ä 000160
 FA468D00 AEE9037F 00127E83 01C2E900 00880006 E9037400 127E8300 00FE46C7 úF±...-..t.Õ..|..Õô..-....ÕU..F' 000180
 46890EC4 83037001 4E9A5477 FF265677 FF260E5E C40E76FF 1076FF12 76FF5016 .P.v..v..v.á^.&.wV&.wT.N.p..á..F 0001A0
 4A473926 0E5EC448 478B260E 5EC45657 89265447 8926FC56 8BFA468B 0E5EC4FE ±á^..F'.V=&.GT&.WVá^.&.GHá^.&9GJ 0001C0
 014E9A54 77FF2656 77FF260E 5EC40E76 FF1076FF 016A5016 FA468000 20E9037F ..Õ ..F'.Pj..v..v.á^.&.wV&.wT.N. 0001E0

Dump of file SATURN:[PCCOMMON.DUMP.DLL]UIW.TMP;1 on 18-APR-1990 10:53:22.77
File ID (940,4,0)   End of file block 88 / Allocated 88

Virtual block number 9 (00000009), 512 (0200) bytes

 76FF1276 FF5016FA 46805E57 89265C47 8926FC56 8BFA468B 0E5EC40E C48303A2 Ä..á.á^..F'.V=&.G\&.W^.F'.P.v..v 000000
 FC5688FA 46880E5E C40EC483 03D7014E 9A5077FF 265277FF 260E5EC4 0E76FF10 ..v.á^.&.wR&.wP.N.■..á.á^..F'.V= 000020
 5277FF26 0E5EC40E 76FF1076 FF1276FF 5016FA46 8000ABE9 52578926 50478926 &.GP&.WRÕ¨..F'.P.v..v..v.á^.&.wR 000040
 52578926 50478926 FC5688FA 46880E5E C4FE4689 0EC48304 0C014E9A 5077FF26 &.wP.N....á..F±á^..F'.V=&.GP&.WR 000060
 C4830450 014E9A54 77FF2656 77FF260E 5EC40E76 FF1076FF 1276FF50 16FA468D .F'.P.v..v..v.á^.&.wV&.wT.N.P..á 000080
 4A473926 0E5EC448 478B260E 5EC45657 89265447 8926FC56 8BFA468B 0E5EC40E .á^..F'.V=&.GT&.WVá^.&.GHá^.&9GJ 0000A0
 014E9A54 77FF2656 77FF260E 5EC40E76 FF1076FF 016A5016 FA468D00 20E9037F ..Õ ..F'.Pj..v..v.á^.&.wV&.wT.N. 0000C0
 5EC4006A 0676FF08 76FF5E57 89265C47 8926FC56 8BFA468B 0E5EC40E C483FFFF ...á.á^..F'.V=&.G\&.W^.v..v.j.á^ 0000E0
 0000FFFF 9A026A00 6A006A00 6A006A00 6A006A00 6A006A50 FE6EF718 478B260E .&.G.¥n±Pj.j.j.j.j.j.j.j.j...... 000100
 5EC401A1 680A76FF 0C76FF00 18E90375 0C46080A 46886047 0126FE46 880E5EC4 á^..F±&.G`.F..F.u.Õ...v..v.hÀ.á^ 000120
 57000008 C8CBC95F 5E1F0000 E9FE468B 0000FFFF 9A006A00 6A6077FF 26006A0E .j.&.w'j.j.......F±Õ...^_èùà...W 000140
 3926000F E9037458 47392606 5EC45E57 88265C47 8826065E C4D88E02 EC881E56 V.¡š..Äá^.&.G\&.W^á^.&9GXt.Õ..&9 000160
 5EC4FA56 89F84689 52578826 50478826 065EC400 8CE90000 880006E9 03745A57 WZt.Õ..|..Õ..á^.&.GP&.WR.F½.V'á^ 000180
 88F8468B 065EC400 5AE90375 56573926 0009E903 74544739 26FA568B F8468806 ..F½.V'&9GTt.Õ..&9WVu.ÕZ.á^..F½. 0001A0
 FF5016FC 4680003F E9000088 0006E903 745A5739 26000FE9 03745847 3926FA56 V'&9GXt.Õ..&9WZt.Õ..|..Õ7..F=.P. 0001C0
 02880006 E90374FE 460BFC46 880CC483 01910049 9AF876FF FA76FF06 76FF0876 v..v..v'.v½.|....á..F=.F±t.Õ..¡. 0001E0
```

```
Dump of file SATURN:[PCCOMMON.DUMP.DLL]UIW.TMP;1 on 18-APR-1990 10:53:22.77
File ID (940,4,0)   End of file block 88 / Allocated 88

Virtual block number 10 (0000000A), 512 (0200) bytes

06C8CBC9 5F5E1F00 00E90002 88FF8BE9 FA5689F8 4689FE56 8BFC468B 0015E900 .Õ...F•.V±.F½.V'Õ..¡..Õ...^_èùà. 000000
76FF0876 FFFE5689 FC468942 578B2640 478B260A 5EC4D88E 0403B81E 56570000 ..WV.¡Æ..Áá^.&.G@&.WB.F•.V±.v..v 000020
D88E0596 B81E5657 000002C8 CBC95F5E 1F0000E9 FA468BFC 5EFF5016 FA468D06 ..F'.P.^•.F'Õ...^_èùà...WV.¡...A 000040
03C123C9 18FE4628 60478B26 065EC4FE 468904C4 83032900 D89A0676 FF0876FF .v..v..Ü.)..á..F±ã^.&.G'+F±.è#è. 000060
6077FF26 006A065E C401A068 2877FF26 2A77FF26 065EC460 47892606 5EC4FE46 F±á^.&.G'á^.&.w*&.w(h..á^.j.&.w' 000080
9A5040C0 1801FE7E 832877FF 262A77FF 26065EC4 0000048C 9A5052C0 28FE568B .V±+âRP.¥...á^.&.w*&.w(. ±..â@P. 0000A0
76FF0A76 FFD88E05 CC881E56 5700001C C8CBC95F 5E1F0000 E9000088 0000FFFF ....¡..Õ...^_èùà...WV.¡ä. ¢.v..v 0000C0
EA5689E8 46890257 8B26078B 260C5EC4 0000FFFF 9A006A00 6A0C76FF 0E76FF08 ..v..v.j.j......á^.&..&.W. ¯Ò.Võ 0000E0
89EC4689 06578B26 04478B26 0C5EC4F6 5689F446 890A578B 2608478B 260C5EC4 á^.&.G.&.W..F¶.V-á^.&.G.&.W..Fš. 000100
08478B26 0C5EC4FA 5689F846 89000A83 0001200E 578B260C 478B260C 5EC4EE56 VŸá^.&.G.&.W.-...Ö..F½.V'á^.&.G. 000120
1D281E8D 025A0387 9AE45E8D E44689E6 56890257 1B26072B 260C5EC4 0A578B26 &.W.á^.&+.&.W..VÌ.FÕ.^Õ...Z...(. 000140
0C478B26 0C5EC4FE 5689FC46 89070805 6E9A06E1 07199A10 301E8D06 CA07619A .a.ò...0....Ä..n....F•.V±á^.&.G. 000160
281E8D07 1403879A E45E8DE4 4689E656 8906571B 2604472B 260C5EC4 0E578B26 &.W.á^.&+G.&.W..VÌ.FÕ.^Õ.......( 000180
0876FF0A 76FFF256 89F04689 0788056E 9A072207 199A1D30 1E8D071D 07619A1D ..a.....0...."..n....FÞ.V·.v..v. 0001A0
FFFC76FF FE76FF50 16F44680 026A006A 0876FF0A 76FF0000 07C29A50 16E84680 .FÒ.P.ô....v..v.j.j..F¶.P.v±.v•. 0001C0
478B260C 5EC4026A 006AEA56 11E84601 FE568BFC 46880000 FFFF9AF0 76FFF276 v·.vÞ......F•.V±.FÒ.Võj.j.á^.&.G 0001E0

Dump of file SATURN:[PCCOMMON.DUMP.DLL]UIW.TMP;1 on 18-APR-1990 10:53:22.77
File ID (940,4,0)   End of file block 88 / Allocated 88

Virtual block number 11 (0000000B), 512 (0200) bytes

0C5EC408 0301CA9A 50520002 83000105 06571B26 04472B26 0C5EC40E 578B260C .&.W.á^.&+G.&.W.....@.RP.ò...á^. 000000
EE568BEC 4688F656 19F44629 FE568BFC 4688EE56 89EC4689 06571326 04470326 &.G.&.W..Fš.VŸ.F•.V±)F¶.V-.Fš.VŸ 000020
16F44680 0876FF0A 76FF0000 085B9A50 16E84680 0876FF0A 76FFFA56 89F84689 .F½.V'.v..v..FÒ.P.[....v..v..F¶. 000040
5EC40A57 8B260847 8B260C5E C4026A00 6A0090E9 03750006 7EB30000 08689A50 P.k....~..u.Õ..j.j.á^.&.G.&.W.á^ 000060
89025713 26070326 0C5EC406 D301CA9A 5052000A 8300012D 02571B26 072B260C .&+.&.W.-...Ö.RP.ò.Æ.á^.&..&.W.. 000080
8BE8468B EE5689EC 4689F256 13F04603 06578B26 04478B26 0C5EC4EA 5689E846 FÒ.Võá^.&.G.&.W..FÞ.V·.Fš.VŸ.FÒ. 0000A0
FFFA5689 F84689F2 561BF046 2B0E578B 260C478B 260C5EC4 F65689F4 4689EA56 Võ.F¶.V-á^.&.G.&.W.+FÞ.V·.F½.V'. 0000C0
1F0000FF FF9A5016 F4468D08 76FF0A76 FF0000FF FF9A5016 E8468D08 76FF0A76 v..v..FÒ.P......v..v..F¶.P...... 0000E0
5689EA46 890A578B 2608478B 26125EC4 D88E0647 B81E5657 000016C8 CBC95F5E ^_èùà...WV.¡G..Äá^.&.G.&.W..Fõ.V 000100
DA830001 2D06571B 2604472B 26125EC4 0E578B26 0C478B26 125EC402 6A006AEC šJ.j.á^.&.G.&.W.á^.&+G.&.W.-...Ö 000120
03E90000 F646C7F4 5689F246 89065713 26044703 26125EC4 093901CA 9A505200 .RP.ò.9.á^.&.G.&.W..F·.V¶úF-..Õ. 000140
0E460302 578B2607 8B26125E C40429E9 03750038 80260A76 C4F65E8B F646FF00 ..F-.^-áv.&.8.u.Õ).á^.&..&.W..F. 000160
E9E42A00 8A260A76 C4F65E8B 0A578926 08478926 125EC400 DA830001 2D105613 .V.-...Ö.á^.&.G.&.W..^-áv.&..*ÕÕ 000180
012D0257 1B26072B 26125EC4 0A578B26 08478B26 125EC402 6A006A03 E4E90394 ..Õõ.j.j.á^.&.G.&.W.á^.&+.&.W.-. 0001A0
8B26125E C4FA5689 F8468902 57132607 0326125E C4090001 CA9A5052 000A8300 ..Ö.RP.ò.Å.á^.&..&.W..F½.V'á^.&. 0001C0
8BF8468B 000009FF 9A5016F8 46800676 FF0876FF FE5689FC 46890657 8B260447 G.&.W..F•.V±.v..v..F½.P......F½. 0001E0

Dump of file SATURN:[PCCOMMON.DUMP.DLL]UIW.TMP;1 on 18-APR-1990 10:53:22.77
File ID (940,4,0)   End of file block 88 / Allocated 88

Virtual block number 12 (0000000C), 512 (0200) bytes

2608478B 26125EC4 000009A5 9A5016EE 46800676 FF0876FF F05689EE 4689FA56 V'.FŸ.VÞ.v..v..FŸ.P.E...á^.&.G.& 000000
026A006A 034DE900 000A209A 5016EE46 800676FF 0876FFF0 5689EE46 890A578B .W..FŸ.VÞ.v..v..FŸ.P. ...ÕM.j.j. 000020
01CA9A50 52000A83 00012002 571B2607 2B26125E C40A578B 2608478B 26125EC4 á^.&.G.&.W.á^.&+.&.W.-...Ö.RP.ò. 000040
FC46890E 578B260C 478B2612 5EC4FA56 89F84689 02571326 07032612 5EC40AC9 è.á^.&..&.W..F½.V'á^.&.G.&.W..F• 000060
46890657 8B260447 8B26125E C400000A 3C9A5016 F8468D06 76FF0876 FFFE5689 .V±.v..v..F½.P.<...á^.&.G.&.W..F 000080
F05689EE 4689FA56 8BF8468B 00000A50 9A5016F8 46800676 FF0876FF FE5689FC •.V±.v..v..F½.P.]....F½.V'.FŸ.VÞ 0000A0
5689EE46 890A578B 2608478B 26125EC4 00000A80 9A5016EE 46800676 FF0876FF .v..v..FŸ.P.....á^.&.G.&.W..FŸ.V 0000C0
46890257 8B26078B 26125EC4 0295E900 000AA19A 5016EE46 800676FF 0876FFF0 Þ.v..v..FŸ.P.À...Õ..á^.&..&.W..F 0000E0
890A578B 2608478B 26125EC4 00000AE7 9A5016EE 46800676 FF0876FF F05689EE Ÿ.VÞ.v..v..FŸ.P.Ó...á^.&.G.&.W.. 000100
08478B26 125EC402 6A006A00 0007D29A 5016EE46 800676FF 0876FFF0 5689EE46 FŸ.VÞ.v..v..FŸ.P.@...j.j.á^.&.G. 000120
0326125E C4060C01 CA9A5052 000A8300 012D0257 1B26072B 26125EC4 0A578B26 &.W.á^.&+.&.W.-...Ö.RP.ò.É.á^.&. 000140
5688EE46 88000007 369A5016 EE468D06 76FF0876 FFF05689 EE468902 57132607 .&.W..FŸ.VÞ.v..v..FŸ.P.6....FŸ.V 000160
46800676 FF0876FF FE5689FC 46890657 8B260447 8B26125E C4FA5689 F84689F0 Þ.F½.V'á^.&.G.&.W..F•.V±.v..v..F 000180
072B2612 5EC40A57 8B260847 8B26125E C4026A00 6A01DEE9 0000088F 9A5016F8 ½.P.....ÕB.j.j.á^.&.G.&.W.á^.&+. 0001A0
5689F846 89025713 26070326 125EC408 FE01CA9A 5052000A 8300012D 02571826 &.W.-...Ö.RP.ò.±.á^.&..&.W..F½.V 0001C0
0B829A50 16F84680 0676FF08 76FFFE56 89FC4689 0E578B26 0C478B26 125EC4FA 'á^.&.G.&.W..F•.V±.v..v..F½.P.ý. 0001E0
```

```
Dump of file SATURN:[PCCOMMON.DUMP.DLL]UIW.TMP;1 on 18-APR-1990 10:53:22.77
File ID (940,4,0)   End of file block 88 / Allocated 88

Virtual block number 13 (00000000), 512 (0200) bytes

D39A5016 F8468D06 76FF0876 FFFE5689 FC468906 578B2604 478B2612 5EC40000 ..ó^.&.G.&.W..F•.V±.v..v..F½.P.& 000000
16EE468D 0676FF08 76FFF056 89EE4689 02578B26 078B2612 5EC40163 E900000B ...Õc.ó^.&..&.W..FŸ.VÞ.v..v..FŸ. 000020
EE468D06 76FF0876 FFF05689 EE46890A 578B2608 478B2612 5EC40000 0C2D9A50 P.-...ó^.&.G.&.W..FŸ.VÞ.v..v..FŸ 000040
26072B26 125EC40A 578B2608 478B2612 5EC4026A 006A011F E900000C 499A5016 .P.I...Õ..j.j.ó^.&.G.&.W.ó^.&+.& 000060
FA5689F8 46890257 13260703 26125EC4 0B8601CA 9A505200 DA830001 2D02571B .W.-...Õ.RP.ò.Ñ.ó^.&..&.W..F½.V• 000080
0009689A 5016F846 8D0676FF 0876FFFE 5689FC46 890E578B 260C478B 26125EC4 ó^.&.G.&.W..F•.V±.v..v..F½.P.h.. 0000A0
125EC400 000C6A9A 5016EE46 8D0676FF 0876FFF0 5689EE46 89FA568B F8468B00 ..F½.V•.FŸ.VÞ.v..v..FŸ.P.j...ó^. 0000C0
8BE90000 09849A50 16EE468D 0676FF08 76FFF056 89EE4689 0A578B26 08478B26 &.G.&.W..FŸ.VÞ.v..v..FŸ.P.....Õ. 0000E0
1276FF14 76FF006F E90AC483 0C9B063F 9A006A06 76FF0876 FF1276FF 1476FF00 ..v..v..v..v.j..?....ó.Õo..v..v. 000100
0376FCFE E9037500 42300053 E90056E9 0AC48305 D9063F9A 016A0676 FF0876FF .v..v.j..7.\..ó.ÕV.ÕS.=B.u.Õ±•v. 000120
49300028 E9FC4AE9 03750041 3DFC4FE9 03750040 3DFEDBE9 03750020 3D0018E9 Õ..=-.u.ÕU±=@.u.ÕO•=A.u.ÕJ•Õ+.=I 000140
5830FD76 E9037500 5430FF8B E9037500 4F30FEFC E9037500 4C30FE45 E9037500 .u.ÕE±=L.u.Õ•±=O.u.Õ..=T.u.Õv»=X 000160
8B125EC4 FBC5E902 57112607 01261056 8B0E468B 125EC400 00E9FF94 E9037500 .u.Õ..Õ..ó^..F..V.&..&.W.Õé«ó^.. 000180
5EC4D88E 087CB81E 56570000 1CC8CBC9 5F5E1F0A 57892608 478926EC 568BEA46 Fõ.Vš&.G.&.W..^ èùà...WV.¡|..Äó^ 0001A0
FC5689FA 46893257 8B263047 8B260A5E C4EA5689 E846893A 578B2638 478B260A .&.G8&.W:.FÒ.Võã^.&.G0&.W2.F•.V• 0001C0
00F07E83 F04EFF00 03E9F046 8912468B 00000E00 9A5016F2 46800676 FF0876FF .v..v..F·.P......F..FÞÕ...NÞ.~Þ. 0001E0

Dump of file SATURN:[PCCOMMON.DUMP.DLL]UIW.TMP;1 on 18-APR-1990 10:53:22.77
File ID (940,4,0)   End of file block 88 / Allocated 88

Virtual block number 14 (0000000E), 512 (0200) bytes

F8460BF6 46880000 FE46C700 0000C79A 5016F646 8DF276FF F476FF00 A0E90377 w.Õ...v¶.v·.F-.P.ú...úF±...F-.F½ 000000
88001FE9 0003E903 7500FE7E 83FA5EFF 5016FE46 8DF676FF F876FF00 39E90375 u.Õ9..v½.v-.F±.P.^•.-±.u.Õ..Õ... 000020
7E83FFBC E90000FF FF9A5016 F6468DE4 76FFE676 FFE65689 E44689F8 568BF646 F-.V½.FÕ.Vl.vl.vÕ.F-.P.....Õ¥..- 000040
4689F456 8BF2468B FF408826 0E5EC4F0 768B4080 0002E949 B00005E9 037500FE ±.u.Õ..¯IÕ..¯@.vÞó^.&.@..F·.V¶.F 000060
E90003E9 0374F446 0BF2468B 0000FFFF 9A5016F2 4680E476 FFE676FF E65689E4 Õ.Vl.vl.vÕ.F·.P......F·.F¶t.Õ..Õ 000080
4608EC46 880000FF FF9A5016 EC468006 76FF0876 FFF04689 12468BFF 54E90003 ..ÕT..F..FÞ.v..v..F§.P......F§.F 0000A0
F05E8B00 1DE90375 00FE7E83 E85EFF50 16FE468D 0676FF08 76FF0051 E90375EE Ÿu.ÕQ..v..v..F±.P.^Õ.~±.u.Õ...^Þ 0000C0
F046FFF0 5E8B001A E95400C6 260E76C4 F046FFF0 5E8B4F00 C6260E76 C4F046FF .FÞóv.&ó.O.^Þ.FÞóv.&ó.TÕ...^Þ.FÞ 0000E0
F6468D06 76FF0876 FF0082E9 2D00C626 0E76C4F0 46FFF05E 8B5800C6 260E76C4 óv.&ó.X.^Þ.FÞóv.&ó.-Õ...v..v..F- 000100
FE468DF6 76FFF876 FF0039E9 0375F846 08F6468B 0000FE46 C700000E D99A5016 .P.\...úF±...F-.F½u.Õ9..v½.v-.F± 000120
E676FFE6 5689E446 89F8568B F6468B00 1FE90003 E9037500 FE7E83FA 5EFF5016 .P.^•.-±.u.Õ..Õ...F-.V½.FÕ.Vl.vl 000140
4CB00002 E942B000 05E90375 00FE7E83 FFBCE900 0000819A 5016F646 8DE476FF .vÕ.F-.P.....Õ¥..~±.u.Õ..¯BÕ..¯L 000160
260E76C4 F05E8B2D 00C6260E 76C4F046 FFF05E8B 0088260E 76C4F046 FFF05E8B .^Þ.FÞóv.&...^Þ.FÞóv.&ó.-.^Þóv.& 000180
08568B06 468BD88E 0D2AB81E 56570000 08C8CBC9 5F5E1F00 00E90000 B80000C6 ó..|..Õ...^_èùà...WV.¡*..Ä.F..V. 0001A0
0000SC9A 5016FC46 8DF876FF FA76FF00 25E90375 FA460BF8 468BFA56 89F84689 .F½.V•.F½.F¯u.Õ%..v•.v½.F•.P.\.. 0001C0
E900008B 0FFF260A 5EC4FFD0 E907FF26 0A5EC4FA 5689F846 89FE568B FC468B00 ..F•.V±.F½.V•ó^.&..ÕÅ.ó^.&..¡..Õ 0001E0

Dump of file SATURN:[PCCOMMON.DUMP.DLL]UIW.TMP;1 on 18-APR-1990 10:53:22.77
File ID (940,4,0)   End of file block 88 / Allocated 88

Virtual block number 15 (0000000F), 512 (0200) bytes

86892E57 8B262C47 8B260A5E C4D88E0F 26881E56 5700009C C8CBC95F 5E1F0000 ...^_èùà...WV.¡&..Äó^.&.G,&.W... 000000
08C4830F C90F1E9A 0E76FF10 76FF5016 FF6E868D 0000FF6E 86C7FF6C 9689FF6A j...Ţ.ú.n.....n..P.v..v....è..ó. 000020
00880EC4 8310640D 229A0E76 FF1076FF 0A76FF0C 76FF5016 FF70868D FF6E86FF .Ñn...p..P.v..v..v..v..".d..ó.¡. 000040
5EC41276 FF1476FF FA5689F8 46896657 8B266447 8B260A5E C4F04689 F2468900 ..F·.FÞó^.&.Gd&.Wf.F½.V•.v..v.ó^ 000060
01C183F2 1BC82B6A 778B2668 4F8B260A 5EC41020 02669A18 77FF261A 77FF260A .&.w.&.w..f.-.ó^.&.Oh&.wj+à.·.ê. 000080
C410C302 669A1877 FF261A77 FF260A5E C41276FF 1476FFFE 7689FC4E 89000683 .ø..N•.V±.v..v.ó^.&.w.&.w..f.û.ó 0000A0
891A771B 26184F2B 260A5EC4 00068301 C183F21B C82B6A77 8B26684F 8B260A5E ^.&.Oh&.wj+à.·.ê..ø.ó^.&+O.&.w.. 0000C0
06E90375 00003D08 C4831090 058E9A0E 76FF1076 FF0A76FF 0C76FFF6 7689F44E N¶.v-.v..v..v..v.......ó.=..u.Õ. 0000E0
868D1C77 FF261E77 FF260A5E C45016F0 4680FF64 86891000 B80003E9 0000B800 .|..Õ..|....d..FÞ.Pó^.&.w.&.w... 000100
9EFF5016 FF66868D 0E76FF10 76FF10C4 830C8208 749A0676 FF0876FF 5016FF70 p..P.v..v..t....ó..v..v...f..P.. 000120
6686FFFF 6886FF50 04C4830B 3F008C9A FF6686FF FF6886FF 0676FF08 76FFFF6A j..v..v..Ñh..Ñf....?..ó.P.Ñh..Ñf 000140
5F5E1F00 00E90000 B80000FF FF9AFF64 86FF006A 006A076A 006A5016 F0468DFF ..FÞ.Pj.j.j.j..Ñd......¡..Õ...^ 000160
C4FA5689 F846890A 578B2608 478B2606 5EC4D88E 0F7F8B1E 56570000 18C8CBC9 èùà...WV.¡...Äó^.&.G.&.W..F½.V•ã 000180
4A478B26 065EC4F0 4689F246 8900008B FE5689FC 46895257 8B265047 8B26065E ^.&.GP&.WR.F•.V±¡...F·.FÞó^.&.GJ 0001A0
EE5689EC 46890000 FFFF9A00 6A006A00 6A006AF8 76FFFA76 FFF65689 F4468999 ..F¶.V-.v•.v½j.j.j.j.......Fš.VŸ 0001C0
8B00F256 8301F046 830008E9 F04689F2 46890000 B80000FF FF9AEC76 FFEE76FF .vŸ.vš.....¡...F·.FÞÕ...FÞ..V·.. 0001E0
```

```
Dump of file SATURN:[PCCOMMON.DUMP.DLL]UIW.TMP;1 on 18-APR-1990 10:53:22.77
File ID (940,4,0)    End of file block 88 / Allocated 88

Virtual block number 16 (00000010), 512 (0200) bytes

F076FFF2 76FF0056 E90376F0 46390008 E9037300 63E90376 F25639F6 568BF446 F¶.V-9V·v.Õc.s.Õ..9Fÿv.ÕV..v·.vb 000000
FF5016E8 468D10C4 8311E90F 779AEC76 FFEE76FF 0676FF08 76FFFC76 FFFE76FF .v±.v=.v..v..vŸ.vš.w.Õ..á..FÒ.P. 000020
8BFE5689 FC4689EA 568BE846 8B0CC483 055E0049 9AFC76FF FE76FF06 76FF0876 v..v..v±.v=.l.^..á..FÒ.Võ.F=.V±. 000040
023D04C4 830FAB04 CB9A0676 FF0876FF FF87E900 03E90003 E90374FE 4608FC46 F=.F±t.Õ..Õ..Õ...v..v..ù.¨..á.=. 000060
FFEE76FF 0000FFFF 9A505200 6C050856 8B06468B EC76FFEE 76FF0016 E9037500 .u.Õ...vŸ.vš.F..V..l.RP......vŸ. 000080
76FFD88E 10FAB81E 56570000 10C8CBC9 5F5E1F00 00E90000 B80000FF FF9AEC76 vš.....i..Õ...^_èùà...WV.¡ª..Ä.v 0000A0
6A0E76FF 1076FF00 00FFFF9A 046A046A 006AFFFF 6811A568 0042681E F876FFFA ª.v½.hB.hË.h..j.j.j.......v..v.j 0000C0
FF9A5016 FC468D00 6A006A00 6A006A00 4A681E00 42681E0A 76FF0C76 FF006A00 .j..v..v..hB..hJ.j.j.j.j..F=.P.. 0000E0
FC76FFFE 76FF0067 E90001B8 0006E903 74F64608 F4468BF6 5689F446 890000FF ....F¶.V-.F¶.F-t.Õ..i..Õg..v±.v= 000100
26FE568B FC468BF0 5EC40789 2612468B F05EC4F2 5689F046 890000FF FF9A006A j.......Fb.V·á^b.F.&..á^b.F=.V±& 000120
0668F476 FFF676FF 0E578926 0C478926 F6568BF4 468BF05E C40A5789 26084789 .G.&.W.á^b.F¶.V-&.G.&.W..v-.v¶h. 000140
57892607 8926F256 8BF0468B 065EC42A 57892628 478926F0 5EC40000 FFFF9A80 ......á^b&.G(&.W*á^..Fb.V·&..&.W 000160
0000FFFF 9A5016FE 468D026A D88E122A 881E5657 000006C8 000ECAC9 5F5E1F02 ..^_èò..àø..WV.¡*..Äj..F±.P..... 000180
0000FFFF 9A50160A 468D00CA 68016AFE 76FF0234 E90001B8 0006E903 75000030 =..ū.Õ..¡..Õ4..v±j.hò..F..P..... 0001A0
04478926 0000B80A 5EC40000 07C7260A 5EC40214 E90001B8 0006E903 75000030 =..u.Õ..¡..Õ..á^.&ú...á^.¡..&.G. 0001C0
C40A5789 26084789 2608568B 0646880A 5EC40647 8926FE46 880A5EC4 02478926 &.G.á^..F±&.G.á^..F..V.&.G.&.W.á 0001E0

Dump of file SATURN:[PCCOMMON.DUMP.DLL]UIW.TMP;1 on 18-APR-1990 10:53:22.77
File ID (940,4,0)    End of file block 88 / Allocated 88

Virtual block number 17 (00000011), 512 (0200) bytes

00B80A5E C42C4789 262E4789 260000B8 0A5EC410 47892612 47892600 00B80A5E ^.¡..&.G.&.G.á^.¡..&.G.&.G,á^.¡. 000000
47892600 00B80A5E C4344789 26364789 260000B8 0A5EC430 47892632 47892600 .&.G2&.G0á^.¡..&.G6&.G4á^.¡..&.G 000020
47892642 47892600 00B80A5E C43C4789 263E4789 260000B8 0A5EC438 4789263A :&.G8á^.¡..&.G>&.G<á^.¡..&.GB&.G 000040
0A5EC450 47892652 47892600 00B80A5E C4444789 26464789 260000B8 0A5EC440 @á^.¡..&.GF&.GDá^.¡..&.GR&.GPá^. 000060
260000B8 0A5EC458 4789265A 47892600 00B80A5E C4544789 26564789 260000B8 ¡..&.GV&.GTá^.¡..&.GZ&.GXá^.¡..& 000080
4847C726 0A5EC400 002647C7 260A5EC4 00002447 C7260A5E C45C4789 265E4789 .G^&.G\á^.&úG$..á^.&úG&..á^.&úGH 0000A0
0A5EC400 004E47C7 260A5EC4 00004C47 C7260A5E C400004A 47C7260A 5EC40000 ..á^.&úGJ..á^.&úGL..á^.&úGN..á^. 0000C0
0A5EC464 47892666 47892600 00B80A5E C4000062 47C7260A 5EC40000 6047C726 &úG`..á^.&úGb..á^.¡..&.Gf&.Gdá^. 0000E0
260000B8 0A5EC428 4789262A 47892600 00B80A5E C4684789 266A4789 260000B8 ¡..&.Gj&.Ghá^.¡..&.G*&.G(á^.¡..& 000100
26764789 260000B8 0A5EC470 47892672 47892600 00B80A5E C46C4789 266E4789 .Gn&.Glá^.¡..&.Gr&.Gpá^.¡..&.Gv& 000120
89FA4689 0000FFFF 9A0676FF 0876FF78 4789267A 47892600 00B80A5E C4744789 .Gtá^.¡..&.Gz&.Gx.v..v.......Fª. 000140
568B8E46 880A5EC4 0000FFFF 9A5016FF 2A868D00 D068006A FA76FFFC 76FFFC56 V=.v=.vªj.hÅ...*..P.....á^..F..V 000160
9646880A 5EC41A57 89261847 89269C56 8B9A468B 0A5EC416 57892614 47892690 .&.G.&.W.á^..F..V.&.G.&.W.á^..F. 000180
76FF2257 89262047 8926FF7C 968BFF7A 868B0A5E C41E5789 261C4789 2698568B .V.&.G.&.W.á^...z...|.&.G &.W".v 0001A0
E90000B8 0000FFFF 9A0A76FF 0C76FF00 6A0676FF 0876FF00 00FFFF9A FA76FFFC =.vª......v..v.j..v..v......¡..Õ 0001C0
46895257 8B265047 8B260A5E C4D88E13 00881E56 57000024 C8CBC95F 5E1F0000 ...^_èùà$..WV.¡...Äá^.&.GP&.WR.F 0001E0

Dump of file SATURN:[PCCOMMON.DUMP.DLL]UIW.TMP;1 on 18-APR-1990 10:53:22.77
File ID (940,4,0)    End of file block 88 / Allocated 88

Virtual block number 18 (00000012), 512 (0200) bytes

260A5EC4 9908468B 66578926 64478926 0A5EC499 06468B00 00F046C7 FC5689FA ª.V=úFb...F..á^.&.Gd&.Wf.F..á^.& 000000
66578B26 64478B26 0A5EC46C 4789266E 47892600 00B80A5E C46A5789 26684789 .Gh&.Wjá^.¡..&.Gn&.Glá^.&.Gd&.Wf 000020
D4038B9A 185F8D0A 5EC415CF 038B9A68 5F8D0A5E C4765789 26744789 260A5EC4 á^.&.Gt&.Wvá^.._h...ü.á^.._....å 000040
83160708 8D9AF276 FFF476FF F676FFF8 76FF15ED 04B79AF2 5E8D15DC 078F9A15 ....É..^·.ñ.Ù..V½.v-.v¶.v·...... 000060
5EC41624 056E9A16 0C02FA9A E45E8D1F A5A5A5A5 DA8E1E07 16F08BE4 7E8D08C4 á..-ð.þ....ÖEEEE..^ð.ª....n.$.á^ 000080
0716F08B DC7E8D08 C483163E 0870D9AF2 76FFF476 FFF676FF F876FF4A 4789260A .&.GJ.V½.v-.v¶.v·.).>..á..-É.þ.. 0000A0
260A5EC4 48478926 0A5EC40F FC056E9A 164302FA 9ADC5E8D 1FA5A5A5 A5DA8E1E ..ÖEEEE..^É.ª.C..n.=.á^.&.GHá^.& 0000C0
EC468D00 36E9037C F04639FE 468BF046 FF0003E9 0000F046 C7FE4689 4848478B .GHH.F±úFþ..Õ...Fþ.F±9Fþ|.Õ6..F§ 0000E0
03E90374 EE4608EC 46880CC4 8316DB00 499AFA76 FFFC76FF 0A76FF0C 76FF5016 .P.v..v..v=.vª.I.Ù..á..F§.FŸt.Õ. 000100
54478926 FC5688FA 46880A5E C4FFBCE9 FC5689FA 4689EE56 8BEC468B 000FE900 .Õ...F§.VŸ.Fª.V=ÕŸ.á^..Fª.V=&.GT 000120
FF0C76FF 5016EC46 800030E9 037F4A47 39260A5E C4484788 260A5EC4 56578926 &.WVá^.&.GHá^.&9GJ..Õ0..F§.P.v.. 000140
568BEC46 8B000CE9 0375EE46 0BEC468B 0CC48311 BE00499A FA76FFFC 76FF0A76 v..v=.vª.I./..á..F§.FŸu.Õ...F§.V 000160
4848478B 260A5EC4 5E578926 5C478926 FC568BFA 46880A5E C4FC5689 FA4689EE Ÿ.Fª.V=á^..Fª.V=&.G\&.W^á^.&.GHH 000180
04C48312 3905C49A 0A76FF0C 76FF4C47 89260A5E C40000B8 0003E903 7C000030 =..|.Õ..¡..á^.&.GL.v..v..á.9..á. 0001A0
26125EC4 0000F246 C7D88E15 5FB81E56 57000012 C8CBC95F 5E1F0000 E90000B8 ¡..Õ...^_èùà...WV.¡_..ÄúF·..á^.& 0001C0
DB9A1276 FF1476FF F65EFF00 6A0A76FF 0C76FFF8 5689F646 893E578B 263C478B .G<&.W>.F̄-.V½.v..v.j..^-.v..v..Ù 0001E0
```

```
Dump of file SATURN:[PCCOMMON.DUMP.DLL]UIW.TMP;1 on 18-APR-1990 10:53:22.77
File ID (940,4,0)   End of file block 88 / Allocated 88

Virtual block number 19 (00000013), 512 (0200) bytes

 5EC4FE46 89484847 8826125E C4624789 26F2468B 125EC4F2 468904C4 83185C00 .\..á..F·á^..F·&.Gbá^.&.GHH.F±á^ 000000
 F44639FE 468BF446 FF0003E9 0000F446 C7FC5689 FA468952 57882650 47882612 .&.GP&.WR.F°.V•úF¶..Õ...F¶.F±9F¶ 000020
 46880CC4 83182600 499AFA76 FFFC76FF 1276FF14 76FF5016 EE468000 39E9037C |.Õ9..FŸ.P.v..v..v•.v°.I.&..á..F 000040
 5EC4FFB9 E90003E9 0003E9FC 5689FA46 89F0568B EE468800 0FE90375 F0460BEE Ÿ.FÞu.Õ...FŸ.VÞ.F°.V•Õ..Õ..Õ¿.á^ 000040
 E9037F4A 47392612 5EC44847 8826125E C4565789 26544789 26FC568B FA468812 ..F°.V•&.GT&.WVá^.&.GHá^.&9GJ..Õ 000060
 460BEE46 880CC483 16810049 9AFA76FF FC76FF12 76FF1476 FF5016EE 468D0030 0..FŸ.P.v..v..v•.v°.I....á..FŸ.F 000080
 265C4789 26FC568B FA468B12 5EC4FC56 89FA4689 F0568BEE 468B000C E90375F0 Þu.Õ...FŸ.VÞ.F°.V•á^..F°.V•&.G\& 0000A0
 02D59A00 6A006A00 6A0676FF 0876FF04 C483172B 05C49A12 76FF1476 FF5E5789 .W^.v..v..á.+..á..v..v.j.j.j..f. 0000C0
 5EC40000 F246C7D8 8E1743B8 1E565700 0012C8CB C95F5E1F 0000E900 00B80000 ..|..Õ...^_èùà...WV.|C..ÄúF·..á^ 0000E0
 0E76FF10 76FFF65E FF016A0A 76FF0C76 FFF85689 F646893E 5788263C 4788260E .&.G<&.W>.F̄-.V½.v..v.j..^-.v..v. 000100
 FE468948 48478826 0E5EC462 478926F2 46880E5E C4F24689 04C48319 9E00D89A .Ü....á..F·á^..F·&.Gbá^.&.GHH.F± 000120
 39FE468B F446FF00 03E90000 F446C7FC 5689FA46 8952578B 2650478B 260E5EC4 á^.&.GP&.WR.F°.V•úF¶..Õ...F¶.F±9 000140
 0CC48319 6800499A FA76FFFC 76FF0E76 FF1076FF 5016EE46 8D0039E9 037CF446 F¶|.Õ9..FŸ.P.v..v..v•.v°.I.h..á. 000160
 FFB9E900 03E90003 E9FC5689 FA4689F0 568BEE46 88000FE9 0375F046 0BEE468B .FŸ.FÞu.Õ...FŸ.VÞ.F°.V•Õ..Õ..Õ¿. 000180
 7F4A4739 260E5EC4 48478826 0E5EC456 57892654 478926FC 568BFA46 880E5EC4 á^..F°.V•&.GT&.WVá^.&.GHá^.&9GJ. 0001A0
 EE468B0C C48317C9 00499AFA 76FFFC76 FF0E76FF 1076FF50 16EE468D 0030E903 .Õ0..FŸ.P.v..v..v•.v°.I.è..á..FŸ 0001C0
                                                                                                   0001E0

Dump of file SATURN:[PCCOMMON.DUMP.DLL]UIW.TMP;1 on 18-APR-1990 10:53:22.77
File ID (940,4,0)   End of file block 88 / Allocated 88

Virtual block number 20 (00000014), 512 (0200) bytes

 478926FC 568BFA46 880E5EC4 FC5689FA 4689F056 88EE468B 000CE903 75F0460B .FÞu.Õ...FŸ.VÞ.F°.V•á^..F°.V•&.G 000000
 9A006A00 6A006A06 76FF0876 FF04C483 177105C4 9A0E76FF 1076FF5E 5789265C \&.W^.v..v..á.q..á..v..v.j.j.j.. 000020
 88260A5E C4D88E18 85881E56 5700000E C8CBC95F 5E1F0000 E90000B8 00001B6E n...|..Õ...^_èùà...WV.|...Äá^.&. 000040
 0C76FFFA 5689F846 893A5788 26384788 260A5EC4 F45689F2 46895A57 88265847 GX&.WZ.F·.V¶á^.&.G8&.W:.F½.V°.v. 000060
 FF00D7E9 00008800 06E90374 00003D08 C48318B3 058E9AF2 76FFF476 FF0A76FF .v..v¶.v·...°..á.=..t.Õ..|..Õ•.. 000080
 F276FFF4 76FF0057 E90375FE 460BFC46 8800000E 279A5016 FC468DF2 76FFF476 v¶.v·.F•.P.'....F•.F±u.ÕW..v¶.v· 0000A0
 F476FFFC 76FFFE76 FF0A76FF 0C76FF00 23E90375 00F67E83 F85EFF50 16F6468D .F-.P.^½.--.u.Õ#..v..v..v±.v•.v¶ 0000C0
 F276FFF4 76FF0A76 FF0C76FF 001AE910 C4831A79 17389A06 76FF0876 FFF276FF .v·.v..v..;.y..á.Õ...v..v..v¶.v· 0000E0
 02369A06 76FF0876 FF0A76FF 0C76FF00 5FE90CC4 831A9018 7D9A0676 FF0876FF .v..v..)....á.Õ ..v..v..v..v..6. 000100
 58478926 0A5EC452 57882650 4788260A 5EC40000 4E47C726 0A5EC408 C4831AC3 û..á.á^.&ûGN..á^.&.GP&.WRá^.&.GX 000120
 626837FF 260A5EC4 08C48319 FC02369A 0676FF08 76FF0A76 FF0C76FF 5A578926 &.WZ.v..v..v..v..6.=..á.á^.&.7hb 000140
 57000006 C8CBC95F 5E1F0000 E90000B8 0000FFFF 9A006A00 6AF276FF F476FF18 ..v¶.v·j.j......|..Õ...^_èùà...W 000160
 FF1076FF FE468918 7FF7260E 5EC4990C 462B6847 88260E5E C4D88E19 C7881E56 V.|ù..Äá^.&.Gh+F..á^.&¼...F±.v.. 000180
 369A0676 FF0876FF 0E76FF10 76FF0014 E9037500 023004C4 831B3104 C89A0E76 v..ù.1..á.=..u.Õ...v..v..v..v..6 0001A0
 9A5077FF 265277FF 260E5EC4 0E76FF10 76FFFE76 FF5016FA 468008C4 83185202 .R..á..F°.P.v±.v..v.á^.&.w.?.wP. 0001C0
 FF5A5789 26584789 26FC568B FA46880E 5EC44E47 89260E5E C40EC483 1878014E N.x..á.á^.&.GNá^..F°.V•&.GX&.WZ. 0001E0

Dump of file SATURN:[PCCOMMON.DUMP.DLL]UIW.TMP;1 on 18-APR-1990 10:53:22.77
File ID (940,4,0)   End of file block 88 / Allocated 88

Virtual block number 21 (00000015), 512 (0200) bytes

 76FF0876 FF0E76FF 1076FF00 14E90375 00023D04 C4831894 04CB9A0E 76FF1076 v..v..ù....á.=..u.Õ...v..v..v..v 000000
 D88E1AF3 881E5657 000000C8 CBC95F5E 1F0000E9 0000B808 C4831A5C 02369A06 ..6.\..á.|..Õ...^_èùà...WV.|µ..Ä 000020
 0E76FF10 76FF0CC4 8318D91A E89A0676 FF0876FF 0A76FF0C 76FF0E76 FF1076FF .v..v..v..v..v..v_.Š.)..á..v..v. 000040
 1E565700 0004C8CB C95F5E1F 0000E900 00B808C4 831B1519 BF9A0676 FF0876FF .v..v..€....á.|..Õ...^_èùà...WV. 000060
 831C7B02 369A0676 FF0876FF 0C76FF0E 76FF0014 E9037502 0A7E83D8 8E1BAC88 |¯..Ä.-..u.Õ...v..v..v_.v..6.(.. 000080
 0CC48319 0B03A09A 5877FF26 5A77FF26 0C5EC40C 76FF0E76 FF5016FC 468D08C4 á..F•.P.v..v.á^.&.wZ&.wX......á. 0000A0
 B80006E9 5A578926 58478926 FE568BFC 46880C5E C40014E9 0375FE46 0BFC468B .F•.F±u.Õ..á^..F•.V±&.GX&.WZÕ..| 0000C0
 E9037502 0A7E834E 4FFF260C 5EC40007 E9037F00 4E7F8326 0C5EC400 5AE90000 ..ÕZ.á^.&..N...Õ..á^.&.ON.-..u.Õ 0000E0
 0C76FF0E 76FFFF6A 0021E903 7500003D 04C4831C A404CB9A 0C76FF0E 76FF0037 7..v..v..ù.Ê..á.=..u.Õ!.j..v..v. 000100
 1F0000E9 0000B80E C4831BC5 02E49A06 76FF0876 FF2877FF 262A77FF 260C5EC4 á^.&.w*&.w(.v..v..Õ.é..á.|..Õ... 000120
 FF0C76FF 0E76FF00 14E90375 020A7E83 D88E1BF1 881E5657 000006C8 CBC95F5E ^_èùà...WV.|þ..Ä.-..u.Õ...v..v.. 000140
 3926FE46 880C5EC4 FE46FF00 03E90000 FE46C708 C4831C0D 02369A06 76FF0876 v..v..6....á.úF±..Õ...F±á^..F±&9 000160
 03A09A58 77FF265A 77FF260C 5EC40C76 FF0E76FF 5016FA46 8D006BE9 037F4C47 GL..Õk..F°.P.v..v.á^.&.wZ&.wX... 000180
 57892658 478926FC 568BFA46 880C5EC4 0014E903 75FC460B FA46880C C4831C28 +..á..F°.F•u.Õ..á^..F°.V•&.GX&.W 0001A0
 5EC40002 2D48478B 260C5EC4 0014E903 74004E7F 83260C5E C4002BE9 0003E95A ZÕ..Õ+.á^.&..N.t.Õ..á^.&.GH-..á^ 0001C0
 76FF0E76 FF003BE9 0375020A 7E83FF83 E94E4FFF 260C5EC4 0007E94E 4789260C .&.GNÕ..á^.&.ONÕ...~..u.Õ;..v..v 0001E0
```

Dump of file SATURN:[PCCOMMON.DUMP.DLL]UIW.TMP;1 on 18-APR-1990 10:53:22.77
File ID (940,4,0)   End of file block 88 / Allocated 88

Virtual block number 22 (00000016), 512 (0200) bytes

```
0C5EC40C 76FF0E76 FF50D8F7 FE468800 25E90375 00003D04 C4831DA1 04CB9A0C ..ù.À..á.=..u.Õ%..F±¼ÄP.v..v.á^. 000000
C95F5E1F 0000E900 00880EC4 831CD802 E49A0676 FF0876FF 2877FF26 2A77FF26 &.w*&.w(.v..v..ö.Ä..á.¡..Õ...^_è 000020
FF0876FF 0C76FF0E 76FF0014 E9037502 0A7E83D8 8E1C8CB8 1E565700 0004C8CB ùà...WV.¡¥..À.~..u.Õ...v..v..v.. 000040
5877FF26 5A77FF26 0C5EC40C 76FF0E76 FF5016FC 468D08C4 831E4A02 369A0676 v..6.J..á..F•.P.v..v.á^.&.wZ&.wX 000060
58478926 FE568BFC 468B0C5E C40014E9 0375FE46 0BFC468B 0CC4831D 1000499A .I....á..F•.F±u.Õ..á^..F•.V±&.GX 000080
07E9037F 4E473B26 0C5EC448 48478B26 0C5EC400 61E90000 B80006E9 5A578926 &.WZÕ..¡..Õa.á^.&.GHHá^.&;GN..Õ. 0000A0
3D04C483 1E7304C8 9A0C76FF 0E76FF00 37E90375 020A7E83 4E47FF26 0C5EC400 .á^.&.GN.~..u.Õ7..v..v..ù.s..á.= 0000C0
0676FF08 76FF2877 FF262A77 FF260C5E C40C76FF 0E76FF01 6A0021E9 03750000 ..u.Õ!.j..v..v.á^.&.w*&.w(.v..v. 0000E0
C4D88E1D B9881E56 57000008 C8C8C95F 5E1F0000 E9000088 0EC4831D 7402E49A .Õ.t..á.¡..Õ...^_èùà...WV.¡¿..Äá 000100
9A0676FF 0876FF0C 76FF0E76 FF0014E9 0375020A 7E83FE46 89484847 8B260C5E ^.&.GHH.F±.-..u.Õ...v..v..v..v.. 000120
65E9037F 4C473926 FC468B0C 5EC4FC46 FF0003E9 0000FC46 C708C483 1F480236 6.H..á.úF•..Õ...F•á^..F•&9GL..Õe 000140
8B0CC483 1DF30049 9A5877FF 265A77FF 260C5EC4 0C76FF0E 76FF5016 F8468D00 ..F½.P.v..v.á^.&.wZ&.wX.l.µ..á.. 000160
25E90003 E95A5789 26584789 26FA568B F8468B0C 5EC40014 E90375FA 4608F846 F½.F*u.Õ..á^..F½.V*&.GX&.WZÕ..Õ% 000180
260C5EC4 0007E900 014E47C7 260C5EC4 000CE903 744E4739 26FE468B 0C5EC400 .á^..F±&9GNt.Õ..á^.&úGN..Õ..á^.& 0001A0
00003D04 C4831F72 04CB9A0C 76FF0E76 FF0038E9 0375020A 7E83FF89 E94E47FF .GNÕ...~..u.Õ8..v..v..ù.r..á.=.. 0001C0
9A0676FF 0876FF28 77FF262A 77FF260C 5EC40C76 FF0E76FF FC76FF00 22E90375 u.Õ"..v•.v..v.á^.&.w*&.w(.v..v.. 0001E0
```

Dump of file SATURN:[PCCOMMON.DUMP.DLL]UIW.TMP;1 on 18-APR-1990 10:53:22.77
File ID (940,4,0)   End of file block 88 / Allocated 88

Virtual block number 23 (00000017), 512 (0200) bytes

```
468DD88E 1E88881E 56570000 04C8CBC9 5F5E1F00 00E90000 B80EC483 1D0502E4 õ.f..á.¡..Õ...^_èùà...WV ¡...Ä.F 000000
08FC468B 0CC4831E EA03A09A 5077FF26 5277FF26 0A5EC40A 76FF0C76 FF5016FC •.P.v..v.á^.&.wR&.wP...õ. 4..F•. 000020
0676FF08 76FF2877 FF262A77 FF260A5E C40A76FF 0C76FFFF 6A002BE9 0375FE46 F±u.Õ(.j..v..v.á^.&.w*&.w(  .v. 000040
56570000 02C8CBC9 5F5E1F00 00E90000 B84E47FF 260A5EC4 0EC4831E B202E49A .Õ.ý..á.á^.&.GN¡..Õ...^ èùà...WV 000060
0017E903 7F4C4739 26FE468B 0A5EC4FE 46FF0003 E90000FE 46C7DB8E 1F8AB81E .¡...ÄúF±..Õ...F±á^..F±Ï9GL..Õ.. 000080
5F5E1F00 00E90000 B8FFD7E9 08C4831F D31F829A 0676FF08 76FF0A76 FF0C76FF .v..v..v..v....Æ..á.Õ=.¡..Õ...^_ 0000A0
5677FF26 0A5EC40A 76FF0C76 FF5016FC 468DD88E 1FF2B81E 56570000 04C8C8C9 èùà...WV.¡'..Ä.F•.P.v..v.á^.&.wV 0000C0
C40A76FF 0C76FF01 6A002BE9 0375FE46 08FC468B 0CC4831F A700499A 5477FF26 &.wT.l.Ï..á..F•.F±u.Õ(.j..v..v.á 0000E0
B84E4FFF 260A5EC4 0EC48320 1F02E49A 0676FF08 76FF2877 FF262A77 FF260A5E ^.&.w*&.w(.v..v..õ.. .á.á^.&.ON¡ 000100
46FF0003 E90000FE 46C7DB8E 203AB81E 56570000 02C8C8C9 5F5E1F00 00E90000 ..Õ...^ èùà...WV.¡: .ÄúF±..Õ...F 000120
8320329A 0676FF08 76FF0A76 FF0C76FF 0017E903 7F4C4739 26FE4688 0A5EC4FE ±á^..F±Ï9GL..Õ...v..v..v..v..2 . 000140
468BD88E 20A2B81E 56570000 02C8CBC9 5F5E1F00 00E90000 B8FFD7E9 08C48320  .á.Õ=.¡..Õ...^_èùà...WV.¡À .Ä.F 000160
6A006A0C 76FF0E76 FFFE76FF 0018E903 7500FE7E 83FE4689 60472B26 0C5EC40A .á^.&+G'.F±.~±.ū.Õ...v±.v..v.j.j 000180
56570000 1AC8CBC9 5F5E1F00 00E90000 B80EC483 20CF02E4 9A0676FF 0876FF00 ..v..v..õ.ü .á.¡..Õ...^_èùà...WV 0001A0
26024789 26FE568B FC46880A 5EC4FE56 89FC4689 105688OE 468BD88E 20EAB81E .¡õ .Ä.F..V..F•.V±á^..F=.V±&.G.& 0001C0
03755247 0B265047 8B260A5E C4000000 FD9A5016 E6468DFC 76FFFE76 FF045789 .W..v±.v•.F¦.P.»...á^.&.GP&.GRu. 0001E0
```

Dump of file SATURN:[PCCOMMON.DUMP.DLL]UIW.TMP;1 on 18-APR-1990 10:53:22.77
File ID (940,4,0)   End of file block 88 / Allocated 88

Virtual block number 24 (00000018), 512 (0200) bytes

```
C48321A8 04CB9A0A 76FF0C76 FF002AE9 03755A47 0B265847 8B260A5E C4003AE9 Õ:.á^.&.GX&.GZu.Õ*..v..v..ù.´l.á 000000
0A5EC408 C48321E1 02369A06 76FF0876 FF0A76FF 0C76FF00 14E90375 00023D04 .=..u.Õ...v..v..v..v..6.Ä!.á.á^. 000020
C45A5789 26584789 26E8568B E646880A 5EC45257 89265047 8926E856 8BE6468B .F¦.VÒ&.GP&.WRá^..F¦.VÒ&.GX&.WZá 000040
5EC46247 89260A5E C44804C4 83223000 DB9A0A76 FF0C76FF 00004E47 C7260A5E ^.&úGN...v..v..Ü.O".á.Há^.&.Gbá^ 000060
89266447 89260A5E C499EE46 880000FF FF9A5016 EA468D08 77FF260A 77FF260A .&.w.&.w..Fõ.P......FŸ.á^.&.Gd&. 000080
15579AEE 76FFEC76 FF0A76FF 0C76FF6A 57892668 4789260A 5EC499EC 468B6657 Wf.F§.á^.&.Gh&.Wj.v..v..vš.vŸ.W. 0000A0
E9000088 D88E2132 881E5657 000000C8 CBC95F5E 1F0000E9 00008808 C483211A .!.á.¡..Õ...^_èùà...WV.¡2!.Ä¦..Õ 0000C0
00C8CBC9 5F5E1F00 00E90000 B8D88E22 48881E56 57000000 C8CBC95F 5E1F0000 ...^_èùà...WV_¡H".Ä¦..Õ...^_èùà. 0000E0
8E2276B8 1E565700 000AC8CB C95F5E1F 0000E900 00B8D88E 225FB81E 56570000 ..WV_¡_".Ä¦..Õ...^_èùà...WV_¡v". 000100
F676FFF8 76FF0463 E90E468B F85689F6 46890000 12939A00 6A1076FF 1276FFD8 Ä.v..v.j.......F-.V½.F.Õc..v½.v- 000120
FF9A0677 FF26F65E C404C6E9 00008A00 00B808C4 83218C12 F89A1076 FF1276FF .v..v..½..l.á.¡..¤..Õö.á^-&.w... 000140
26F65EC4 0015E903 74524708 2650478B 26F65EC4 0481E900 008A0000 B80000FF ...¡..¤..ÕŸ.á^-&.GP&.GRt.Õ..á^-& 000160
00FFFF9A 5016FA46 8D37FF26 F65EC400 48E90000 06309A00 6A2877FF 262A77FF .w*&.w(j..O...ÕH.á^-&.7.F*.P.... 000180
0676FF08 76FFF676 FFF876FF 0025E903 75000030 0000FFFF 9AFA76FF FC76FF00 ..v=.v*.....=..u.Õ%..v½.v-.v..v. 0001A0
E90000BA 00008800 0019B09A 006A006A 006A1076 FF1276FF 08C48323 8615579A .W..#.á..v..v.j.j.j..¯...¡..¤..Õ 0001C0
2EE90375 52470826 50478B26 F65EC400 00FFFF9A 1076FF12 76FF016A 006A043B ;.j.j..v..v......á^-&.GP&.GRu.Õ. 0001E0
```

Dump of file SATURN:[PCCOMMON.DUMP.DLL]UIW.TMP;1 on 18-APR-1990 10:53:22.77
File ID (940,4,0)   End of file block 88 / Allocated 88

Virtual block number 25 (00000019), 512 (0200) bytes

```
76FFF876 FF0CC483 239A1AEB 9A1076FF 1276FF0A 76FF0C76 FFF676FF F876FF00 ..v½.v-.v..v..v..v..Š..#.á..v½.v 000000
10E90374 400A46F6 03E5E900 008A0000 8808C483 23ED198F 9A1076FF 1276FFF6 -.v..v..¢.Ú#.á.¦..¤..Õ[.-F.ªt.Õ. 000020
0A76FF0C 76FF0E76 FF1076FF 1276FF00 1DE90374 52470826 50478826 F65EC400 .á^-&.GP&.GRt.Õ...v..v..v..v..v. 000040
83240704 CB9AF676 FFF876FF 00E3E908 468803AF E9000024 BD9A0676 FF0876FF .v..v..§$..Õ€..F.ÕD..v½.v-.ù..$. 000060
FF00E3E9 0AC48324 181BE99A 1076FF12 76FFFE76 FFF676FF F876FFFE 468904C4 á..F±.v½.v-.v±.v..v..Õ..$.á.ÕD.. 000080
9A1076FF 1276FFFE 76FFF676 FFF876FF FE468904 C4832432 04CB9AF6 76FFF876 v½.v-.ù.2$.á..F±.v½.v-.v±.v..v.. 0000A0
76FFF876 FFFE4689 04C48324 5D04CB9A F676FFF8 76FF00B8 E90AC483 24431CB4 Ç.C$.á.Õ¡..v½.v-.ù.]$.á..F±.v½.v 0000C0
248804CB 9AF676FF F876FF00 8DE90AC4 83246E1D B19A1076 FF1276FF FE76FFF6 -.v±.v..v..Ý.n$.á.Õ...v½.v-.ù..$ 0000E0
0062E90A C483249F 1E839A10 76FF1276 FFFE76FF F676FFF8 76FFFE46 8904C483 .á..F±.v½.v-.v±.v..v.....$.á.Õb. 000100
0E76FF10 76FF1276 FF0048E9 08C48325 01198F9A 1076FF12 76FFF676 FFF876FF .v½.v-.v..v..¢..%.á.ÕK..v..v..v. 000120
3DFFC1E9 03750008 3D0028E9 02C9E900 00FFFF9A 0676FF08 76FF0A76 FF0C76FF .v..v..v..v.....Õè.Õ+.=..u.Õè.= 000140
E9FF48E9 03750018 3DFEFDE9 03750016 3DFF86E9 03750012 3DFF38E9 03750011 ..u.Õ8.=..u.Õ..=..u.Õ»±=..u.ÕK.Õ 000160
76FF0014 E9037500 023D04C4 83251D04 CB9AF676 FFF876FF 0030E908 468BFFB5 ç..F.ÕO..v½.v-.ù..%.á.=..u.Õ...v 000180
001BE903 7300113D 0023E900 26E908C4 83257C02 369A1076 FF1276FF F676FFF8 ½.v-.v.,v..6.|%.á.Õ&.Õ#.=...s.Õ.. 0001A0
5EC40222 E90000E9 FFB0E903 7500183D FF88E903 7500163D FFC0E903 7700123D =..w.Õâ.=..u.Õ¡.=..u.Õ¯.Õ..Õ".á^ 0001C0
F876FF00 85E90846 880226E9 00008A00 00880009 E9037452 47082650 478826F6 -&.GP&.GRt.Õ..¦..¤..Õ&..F.Õ...v½ 0001E0
```

Dump of file SATURN:[PCCOMMON.DUMP.DLL]UIW.TMP;1 on 18-APR-1990 10:53:22.77
File ID (940,4,0)   End of file block 88 / Allocated 88

Virtual block number 26 (0000001A), 512 (0200) bytes

```
1076FF12 76FFF676 FFF876FF 00A1E908 C4832593 1F829A10 76FF1276 FFF676FF .v-.v..v.....%.á.ÕÀ..v½.v-.v..v. 000000
E908C483 25C12032 9A1076FF 1276FFF6 76FFF876 FF008AE9 08C48325 AA1FEA9A .Õ.`%.á.Õ...v½.v-.v..v..2 è%.á.Õ 000020
26F65EC4 0059E900 5CE908C4 83264720 9A9A1076 FF1276FF F676FFF8 76FF0073 s..v½.v-.v..v... G&.á.Õ\.ÕY.á^-& 000040
E90036E9 00000618 9A006A00 6A6077FF 26006AF6 5EC401A1 682877FF 262A77FF .w*&.w(hÀ.á^-j.&.w'j.j......Õ6.Õ 000060
E9037500 043DFF7A E9037500 033DFF99 E9037500 023DFF73 E9037500 013D0033 3.=..u.Õs.=..u.Õ..=..u.Õz.=..u.Õ 000080
5EC4015F E90000BA 00008800 00E9FFAA E9037500 063DFFAF E9037500 053DFFA0 ..=..u.Õ€.=..u.Õ¯.Õ..¦..¤..Õ_.á^ 0000A0
BA0000B8 04C48322 B910F29A F676FFF8 76FF000E E9037504 47082602 478826F6 -&.G.&.G.u.Õ...v½.v-.·.¿".á.¦..¤ 0000C0
212A9A10 76FF1276 FFF676FF F876FF0A 76FF0C76 FF0676FF 0876FF01 38E90000 ..Õ8..v..v..v..v..v½.v-.v..v..*! 0000E0
FF00FEE9 00008A00 00880000 23459A00 6A006A00 6A1076FF 1276FF10 C48326AA ¯&.á..v..v.j.j.j..E#..¦..¤..Õ±.. 000100
B810C483 26D32240 9A1076FF 1276FFF6 76FFF876 FF0A76FF 0C76FF06 76FF0876 v..v..v..v..v½.v-.v..v..ª"&&.á.¡ 000120
1076FF12 76FFF676 FFF876FF 0A76FF0C 76FF0676 FF0876FF 0005E900 008A0000 ..¤..Õf..v..v..v..v..v½.v-.v..v. 000140
F876FF0A 76FF0C76 FF0676FF 0876FF00 ACE90000 8A0000B8 10C48326 FC22579A .W"=&.á.¦..¤..Õ¯..v..v..v..v..v½ 000160
00313000 63E90083 E90000BA 00008810 C4832333 226E9A10 76FF1276 FFF676FF .v-.v..v..n"3#.á.¦..¤..Õ..Õc.=1. 000180
E9037500 073DFB9D E9037500 023DF888 E9037500 013D0023 E90376FE 39E90375 u.Õ9±v.Õ#.=..u.Õ.«=..u.Õ.«=..u.Õ 0001A0
1B5C3DFC 58E90375 007A3DFC 0DE90375 00713000 33E9FEF4 E9037500 233DFBAA ¯«=#.u.Õ¶±Õ3.=q.u.Õ.==z.u.Õ[•=\. 0001C0
0000E9FF 74E90375 1B613DFF 53E90375 1B603DFF 32E90375 1B5F3DFF 00E90375 u.Õ..=_.u.Õ2.='.u.ÕS.=a.u.Õt.Õ.. 0001E0
```

Dump of file SATURN:[PCCOMMON.DUMP.DLL]UIW.TMP;1 on 18-APR-1990 10:53:22.77
File ID (940,4,0)   End of file block 88 / Allocated 88

Virtual block number 27 (0000001B), 512 (0200) bytes

```
5F5E1F00 00E90000 23D79A06 76FF0876 FF0A76FF 0C76FF0E 76FF1076 FF1276FF .v..v..v..v..v..v..v..##..Õ...^_ 000000
4D020300 03000212 45010300 00000226 70000200 00000120 57000200 270ECAC9 èð.'...W ......p&.......E........Ñ 000020
FF010300 8100030B 14010300 80000308 6E010300 00000615 C4000200 DC00070F ...É...á........n................ 000040
6F010301 0B000210 E3010300 83000307 56010300 0B000222 FA010300 0A000221 ¦.......#"......V.......D.......o 000060
57010300 13000212 D2010300 00000822 8D000200 0F000223 18010300 8C000212 ........#.......".......®.......W 000080
E4010300 1F000222 9A010300 1E000215 48010300 99000204 8C010300 10000311 ................H.........".....Õ 0000A0
35010300 AC000212 08010300 28000214 C8010300 1A000413 0C020300 9F000314 ................à...+.......¯...5 0000C0
82010300 2E000212 13010300 2D000211 46010300 AD000206 5C010300 2C000215 ...,...\...Ù...F...-............ 0000E0
3C000500 9300061A 0C020300 B2000227 86010301 0900070E 93020300 2F000226 &../............'..ý...É.......< 000100
2C020300 9E000623 0D020300 3D000225 E8010300 28000422 CF020322 85000212 ...."..ü"..(...Ò%..=....#......, 000120
00000000 C500071A 1B020300 B6000721 5F020300 4D000223 5D010300 37000413 ...7...]#..M..._!..Ñ.......é.... 000140
046A006A FFFF68FF FF680052 681EF876 FFFA76FF D88EFFFF 881E5657 000010C8 à...WV.¡...Ä.v¹.v½.hR.h..h..j.j. 000160
6A005A68 1E005268 1E0A76FF 0C76FF00 6A006A0E 76FF1076 FF0000FF FF9A046A j.......v..v.j.j..v..v..hR..hZ.j 000180
E90374F6 4608F446 8BF65689 F4468900 00FFFF9A 5016FC46 8D006A00 6A006A00 .j.j.j..F•.P......F¶.V-.F¶.F-t.Õ 0001A0
468BF05E C4F25689 F0468900 00FFFF9A 006AFC76 FFFE76FF 006AE900 00880006 ..¡..Õj..v±.v•j.......Fb.V·á^b.F 0001C0
8926F656 8BF4468B F05EC40A 57892608 478926FE 568BFC46 8BF05EC4 07892612 .&..á^b.F•.V±&.G.&.W.á^b.F¶.V-&. 0001E0
```

Dump of file SATURN:[PCCOMMON.DUMP.DLL]UIW.TMP;1 on 18-APR-1990 10:53:22.77
File ID (940,4,0)   End of file block 88 / Allocated 88

Virtual block number 28 (0000001C), 512 (0200) bytes

```
8B065EC4 0000FFFF 9A0090B7 FF260092 B7FF26F0 5EC4016A 006A0E57 89260C47 G.&.W.j.j.á^Þ&.ñ..&.ñ.......á^.. 000000
1E565700 0000C800 0ECAC95F 5E1F0000 E90001B8 02578926 078926F2 568BF046 FÞ.V·&..&.W.¡..Õ...^_èò..à...WV. 000020
376A026A 0E76FF00 6A006A0A 76FF0C76 FF036AFF 6A0676FF 0876FFD8 8E0008B8 ¡...A.v..v.j.j..v..v.j.j..v.j.j7 000040
26125EC4 0000FFFF 9A006A00 6A006A00 6A1076FF 036A006A 0676FF08 76FF196A j..v..v.j.j..v.j.j.j.j......á^.& 000060
C70000F8 46C7D88E 00E1B81E 56570000 08C8CBC9 5F5E1F00 00E90257 89260789 ..&.W.Õ...^_èùà...WV.¡Ã..ÄúF½..ú 000080
0C6A006A 006A006A 066AFF6A 0676FF08 76FF0000 FE46C700 00FC46C7 0400FA46 F*..úF=..úF±...v..v.j.j.j.j.j.j. 0000A0
189A006A 006A5016 FB468D80 8468036A 006A0676 FF0876FF 146A646A 026A0A6A j.j.jdj..v..v.j.j.h...F½.Pj.j... 0000C0
5700000A C8CBC95F 5E1F0000 E90000B8 00929789 26009087 89260A5E C4000001 ...á^.&....&....¡..Õ...^_èùàÖ..W 0000E0
29E90001 B80006E9 03750000 3D0000FF FF9A5016 FE468002 6AD88E01 36B81E56 V.¡6..Áj..F±.P.....=..u.Õ..¡..Õ) 000100
E90001B8 0006E903 7500003D 00000234 9A5016FF 26868000 CA68016A FE76FF01 ..v±j.hò...&..P.4...=..u.Õ..¡..Õ 000120
08568B06 468BFF26 9EC40647 8926FE46 8BFF269E C4000007 C726FF26 9EC40108 ..á.&.&ú...á.&..F±&.G.á.&..F..V. 000140
76FF08C4 83001701 2E9A0676 FF0876FF FF2686FF FF2886FF 0A578926 08478926 &.G.&.W..Ñ(..Ñ&..v..v.......á..v 000160
0006E903 7500003D 0000FFFF 9A505200 A805FF28 968BFF26 86880400 68016AFE ±j.h....&...(..^.RP.....=..u.Õ.. 000180
46890000 FFFF9A06 76FF0876 FF0007C6 2600A89F C426FF26 9EC400A4 E90001B8 ¡..ÕE.á.&.&á.^.&ó...v..v.......F 0001A0
468BFF26 9EC40000 FFFF9A50 16FF2A86 8000D068 006AFA76 FFFC76FF FC5689FA *.V=.v=.v*j.hÅ...*..P.....á.&..F 0001C0
9EC41E57 89261C47 89269856 88964688 FF269EC4 16578926 14478926 90568B8E ..V.&.G.&.W.á.&..F..V.&.G.&.W.á. 0001E0
```

Dump of file SATURN:[PCCOMMON.DUMP.DLL]UIW.TMP;1 on 18-APR-1990 10:53:22.77
File ID (940,4,0)   End of file block 88 / Allocated 88

Virtual block number 29 (0000001D), 512 (0200) bytes

```
20478926 FF7C968B FF7A868B FF269EC4 1A578926 18478926 9C568B9A 468BFF26 &..F..V.&.G.&.W.á.&...z...|.&.G 000000
9AFF26B6 FFFF28B6 FF006A06 76FF0876 FF0000FF FF9AFA76 FFFC76FF 22578926 &.W".v=.v*......v..v.j..Ñ(..Ñ&.. 000020
FF26065E C4D88E01 A3B81E56 5700000C C8C8C95F 5E1F0000 E90000B8 0000FFFF ....¡..Õ...^_èùà...WV.¡È..Äá^.&. 000040
468BFC56 89FA4689 0000FFFF 9A006A00 6A006A00 6A014168 0090B7FF 260092B7 ñ..&.ñ..hA.j.j.j.j.......F*.V=.F 000060
C02BF856 8BF84689 FE468800 33E90375 FE4639F8 468BF846 89FC468B FE4689FA *.F±.F=.F½.F½9F±u.Õ3..F±.F½.V½+â 000080
6AF476FF F676FF01 42680090 B7FF2600 92B7FF26 065EC4F6 5689F446 89FE460B .F±.F¶.V-á^.&.ñ..&.ñ..hB..v-.v¶j 0000A0
02F7B81E 56570000 00C8CBC9 5F5E1F07 8926FE46 8B0A5EC4 00000314 9A006A00 .j......á^..F±&...^_èùà...WV.¡¼. 0000C0
9A00A8B7 FF2600AA B7FF2606 5EC40400 68009087 FF260092 B7FF2606 5EC4D88E .Äá^.&.ñ..&.ñ..h..á^.&.ñ^.&.ñ^.. 0000E0
5F5E1F08 C4830219 02EF9A06 76FF0876 FF505200 AC050856 8B064688 0000FFFF .....F..V..^.RP.v..v..ÿ....á..^ 000100
26065EC4 FE5689FC 46890A46 08C02B0A 568BD88E 037EB81E 56570000 04C8CBC9 èùà...WV.¡-..Ä.V.+â.F..F=.V±á^.Ï 000120
CBC95F5E 1F000003 649A006A 006AFC76 FFFE76FF 01426800 90B7FF26 0092B7FF .ñ..&.ñ..hB..v±.v=j.j..d....^_èù 000140
37FF2606 5EC404C4 8303B803 769A0676 FF0876FF D88E03CA B81E5657 000000C8 à...WV.¡ò..Ä.v..v..v.j..á.á^.Ï.7 000160
1F0000FF FF9A00AC B7FF2600 6A065EC4 00A8B7FF 2600AAB7 FF26065E C40A76FF .v.á^.&.ñ^.&.ñ^.á^.j.&.ñ^....... 000180
008C9A00 A8B7FF26 00AAB7FF 26065EC4 D88E0408 B81E5657 00040AC8 CBC95F5E ^_èùà...WV.¡...Äá^.&.ñ^.&.ñ^.... 0001A0
AAB7FF26 065EC401 ADE9FFFF BAFFFFB8 0009E903 7304003D 0E460304 C4830489 ...á..F.=..s.Õ..¡..¤..ÕÙ.á^.&.ñ^ 0001C0
76FF0C76 FF001EE9 037400AC 87392606 5EC404C4 8304B100 8C9A00A8 B7FF2600 .&.ñ^....Ÿ..á.á^.&9.^.t.Õ...v..v 0001E0
```

Dump of file SATURN:[PCCOMMON.DUMP.DLL]UIW.TMP;1 on 18-APR-1990 10:53:22.77
File ID (940,4,0)   End of file block 88 / Allocated 88

Virtual block number 30 (0000001E), 512 (0200) bytes

```
ACB78B26 065EC400 6FE908C4 83040900 109A00A8 B7FF2600 AAB7FF26 065EC40A .á^.&.ñ^.&.ñ'....\..á.Õo.á^.&..^ 000000
5EC408C4 83050800 569A5016 FBFA868D 505200AA 97B82600 A8870326 065EC400 .á^.&..^.&..^.RP..*«.P.V....á.á^ 000020
00AAB7FF 26065EC4 0A76FF0C 76FF0000 C62600A8 B4C42606 76C400AC 9F8B2606 .&..^.áv.&áÇ'.&ó...v..v.á^.&.ñ^. 000040
00A8B7FF 2600AAB7 FF26065E C45016F8 FA868D08 C4830523 00109A00 A8B7FF26 &.ñ^....#..á...*«.Pá^.&.ñ^.&.ñ^. 000060
B7FF2600 AAB7FF26 065EC400 90B7FF26 0092B7FF 26065EC4 08C48305 8100109A ......á.á^.&.ñ..&.ñ..á^.&.ñ^.&.ñ 000080
0676FF08 76FF00AC B7FF2606 5EC400AC 8701260E 468B065E C40000FF FF9A00A8 ^......á^..F.&..^.á^.&.ñ^..v..v. 0000A0
CA9A5052 99008C87 8B26065E C41477FF 261677FF 26065EC4 06C48304 1503C29A .ô....á.á^.&.w.&.w.á^.&.....RP.ò 0000C0
1D381E8D FFFF03B7 9AFBF69E 8DFBF686 89FBF896 89022BFE 468BFE46 89059A01 ....F±.F±+0..½«..–«..–«.......8. 0000E0
6A006A01 48680090 B7FF2600 92B7FF26 065EC4FA 46890460 056E9A05 A807199A ...'..n.'..F*á^.&.ñ..&.ñ..hH.j.j 000100
002CE903 77FA4638 FC462800 ACB78B26 065EC4FC 46890000 06089A00 6A006A00 .j.j.......F=á^.&..^.+F=;F*w.Õ,. 000120
006A0149 68009087 FF260092 B7FF2606 5EC4FC46 89FA462B 00ACB78B 26065EC4 á^.&..^.+F*.F=á^.&.ñ..&.ñ..hI.j. 000140
0000B806 C4830563 04009A06 76FF0876 FF1B5768 000003F7 9A006A00 6AFC76FF .v=j.j..¼...hW..v..v....c..á.|.. 000160
1B5A6800 20E90C46 8B08BE04 4CB81E56 57000000 C8C8C95F 5E1F0000 E90000BA ¤..Õ...^_èùà...WV.¡L..Ä.F.Õ .hZ. 000180
00093D00 0BE9000E E9001AE9 0000BA00 01B806C4 83061804 009A0676 FF0876FF .v..v.......á.¡..¤..Õ..Õ..Õ..=.. 0001A0
0633B81E 56570000 00C8CBC9 5F5E1F00 00E90000 BA0000B8 FFEFE9FF D8E90375 u.ÕÄ.Õÿ.¡..¤..Õ...^_èùà...WV.¡3. 0001C0
E90000BA 0001B806 C48306AB 04009A06 76FF0876 FF1B5B68 007AE90C 468BD88E .Ä.F.Õz.h[..v..v....¨..á.¡..¤..Õ 0001E0
```

```
Dump of file SATURN:[PCCOMMON.DUMP.DLL]UIW.TMP;1 on 18-APR-1990 10:53:22.77
File ID (940,4,0)   End of file block 88 / Allocated 88

Virtual block number 31 (0000001F), 512 (0200) bytes

 008C9A00 A8B7FF26 00AAB7FF 26065EC4 04C48306 4903769A 0676FF08 76FF007C |..v..v..v.I..á.á^.&.ñ^.&.ñ^.... 000000
 2600AAB7 FF26065E C41B5568 37FF2606 5EC400AC 87892606 5EC44804 C48305A3 Ė..á.Há^.&..^.á^.&.7hU.á^.&.ñ^.& 000020
 E90016E9 0022E900 008A0001 88000004 3B9A00AC B7FF2600 6A065EC4 00A8B7FF .ñ^.á^.j.&.ñ^..;...|..¤..Ö".Ö..Ö 000040
 5E1F0000 E900008A 00008BFF E7E9FF76 E9037500 133DFF98 E9037500 083D0013 ..=..u.Ö..=..u.Öv.ÖÖ.|..¤..Ö...^ 000060
 006A1076 FF1276FF EC4689EE 46890000 B8D88E06 7EB81E56 57000022 C8CBC95F _èùà"..WV.|-..Á|...FŸ.Fš.v..v.j. 000080
 B804C483 07B7019B 9A1076FF 1276FF04 29E90E46 8BE05689 DE468900 0000719A .q....FB.VÁ.F.Ö)..v..v....ñ..á.| 0000A0
 0A468804 9DE90000 BA0000B8 0000FFFF 9A0677FF 26DE5EC4 04B2E900 00BA0000 ..¤..Öý.á^B&.w......|..¤..Ö...F. 0000C0
 00B89A00 90B7FF26 009287FF 26DE5EC4 016A006A 0022E903 7500FA7E 83FA4689 .F'.-'.u.Ö".j.j.á^B&.ñ..&.ñ...|. 0000E0
 83043EE9 04C48309 2C03769A DE76FFE0 76FF000E E9046FE9 0000BA00 00B80000 ..|..¤..Öo.Ö...vÁ.vB.v.,..á.Ö>.. 000100
 BA0000B8 0000FFFF 9A016A00 90B7FF26 009287FF 26DE5EC4 0014E903 75000A7E ~..u.Ö..á^B&.ñ..&.ñ..j......|..¤ 000120
 76FFE656 89E44689 0000FFFF 9A006A00 6A006A00 6A1076FF 1276FF04 35E90000 ..Ö5..v..v.j.j.j.j.......FÖ.VÌ.v 000140
 0C56880A 468803E3 E903E6E9 0000FFFF 9AE476FF E676FF00 00FFFF9A E476FFE6 Ì.vÖ......vÌ.vÖ.....ÖÌ.ÖÖ..F..V. 000160
 C40012E9 037637FC 7E83FC46 89F9F700 04B99904 478B26E8 5EC4EA56 89E84689 .FÖ.Vöá^Ö&.G..¿..¼'.F•.-•7v.Ö..á 000180
 064688DE 5EC403C0 E900008A 00008803 C9E90000 8A0001B8 00DC0447 C726E85E ^Ö&úG.É.|..¤..Öè.|..¤..Öà.á^B.F. 0001A0
 008C8789 26DE5EC4 000A2D24 478B26DE 5EC42647 89260846 8BDE5EC4 24478926 &.G$á^B.F.&.G&á^B&.G$-..á^B&.... 0001C0
 006A006A 009087FF 26009287 FF26DE5E C4008E87 8926DE5E C418478B 26DE5EC4 á^B&.G.á^B&....á^B&.ñ..&.ñ..j.j. 0001E0

Dump of file SATURN:[PCCOMMON.DUMP.DLL]UIW.TMP;1 on 18-APR-1990 10:53:22.77
File ID (940,4,0)   End of file block 88 / Allocated 88

Virtual block number 32 (00000020), 512 (0200) bytes

 8B26DE5E C40000FF FF9A036A 008EB7FF 26DE5EC4 008CB7FF 26DE5EC4 026A056A j.j.á^B&.ñ..á^B&.ñ..j......á^B&. 000000
 008A0000 880000FE 46C7F046 89E8D100 372DFC46 8BFC4689 F9F70004 89992447 G$.¿..¼'.F•.F•-7.1Ö.FÞúF±..|..¤. 000020
 E246890A 46880303 E90000E9 0374040A 7E830009 E9037480 840A7E81 0336E900 .Ö6..-...t.Ö...-..t.Ö..Ö...F..Fã 000040
 001AE903 74180FF8 7E810024 E9037401 54E27E81 F2468908 468BF846 8906468B .F..F½.F..F·.-ãT.t.Ö$..-½..t.Ö.. 000060
 037501E2 46F602E0 E900008A 00008806 C4830694 04009ADE 76FFE076 FF185768 hW..vÁ.vB......á.|..¤..ÖÁ.-Fã.u. 000080
 0023E9F6 5689F446 8908C483 0978062B 9ADE76FF E076FFE2 76FFF876 FF001DE9 Ö...v½.vã.vÁ.vB.+.x..á..F¶.V-Ö#. 0000A0
 F4468908 C48309DD 06769ADE 76FFE076 FFE276FF F276FF00 1AE90375 02E246F6 -Fã.u.Ö...v·.vã.vÁ.vB.v.Ì..á..F¶ 0000C0
 079E9A00 90B7FF26 009287FF 26DE5EC4 016A006A 028EE9F6 568BF446 8BF65689 .V-.F¶.V-Ö..j.j.á^B&.ñ..&.ñ..... 0000E0
 05C69A06 76FF0876 FF0A76FF 0C76FF7A 6A0090B7 FF260092 87FF26DE 5EC40000 ..á^B&.ñ..&.ñ..jz.v..v..v..v..ó. 000100
 830A0704 449ADE76 FFE076FF 0A76FF0C 76FF0676 FF024FE9 00008A00 00B80000 ..|..¤..ÖO..v..v..v..vÁ.vB.D.... 000120
 76FF01FF E90000FF FF9A006A 006A8082 68006A20 6A1076FF 1276FF02 35E90AC4 á.Ö5..v..v.j j.h..j.j......Ö...v 000140
 9A0A76FF 0C76FF00 A8B7FF26 00AAB7FF 26DE5EC4 04C4830A 5003769A DE76FFE0 Á.vB.v.P..á.á^B&.ñ^.&.ñ^..v..v.. 000160
 468801DC E900008A 00008807 8926065E C400AC87 8B26DE5E C408C483 0A7C0056 V.|..á.á^B&..^.á^.&..|..¤..ÖÉ..F 000180
 76FF018C E900008A 00008806 C4830A67 04009ADE 76FFE076 FF185768 010DE90A .Ö..hW..vÁ.vB...g..á.|..¤..Ö¥..v 0001A0
 C4830829 008C9A00 A8B7FF26 00AAB7FF 26DE5EC4 04C48307 5A03769A DE76FFE0 Á.vB.v.Z..á.á^B&.ñ^.&.ñ^....)..á 0001C0
 00A8B7FF 2600AAB7 FF26DE5E C41B5568 37FF26DE 5EC400AC 878926DE 5EC44804 .Há^B&..^.á^B&.7hU.á^B&.ñ^.&.ñ^. 0001E0

Dump of file SATURN:[PCCOMMON.DUMP.DLL]UIW.TMP;1 on 18-APR-1990 10:53:22.77
File ID (940,4,0)   End of file block 88 / Allocated 88

Virtual block number 33 (00000021), 512 (0200) bytes

 009287FF 26DE5EC4 0162E900 008A0000 8800000A F69A00AC B7FF2600 6ADE5EC4 á^Bj.&.ñ^..-...|..¤..Öb.á^B&.ñ.. 000000
 87C726DE 5EC40007 C62600A8 9FC426DE 5EC40000 05439A00 62681E00 90B7FF26 &.ñ...hb..C...á^B&á.^.&ó..á^B&ú. 000020
 0000BA00 00B80000 0B339A00 6A006A00 6A006A1B 566837FF 26DE5EC4 000000AC ^...á^B&.7hV.j.j.j.j..3...|..¤.. 000040
 AAB7FF26 DE5EC400 A8B7FF26 00AAB7FF 26DE5EC4 1B596837 FF26DE5E C40117E9 Ö..á^B&.7hY.á^B&.ñ^.&.ñ^.á^B&.ñ^ 000060
 000AE900 00BA0000 88000006 EF9A5000 6A4804C4 8306C000 8C9A00A8 B7FF2600 .&.ñ^....ã..á.Hj.P.ÿ...|..¤..ÖÖ. 000080
 FDE90375 80B13DFE EBE90375 80803D00 23E90026 E90000FF FF9A03E8 6800FA68 h'.hÖ......Ö&.Ö#.=..u.Ö$±=..u.Ö» 0000A0
 E9037500 203D0083 E90086E9 FFCCE9FF 92E90375 80833DFF 4FE90375 80823DFE ±=..u.ÖO.=..u.Ö..Öä.Ö..Ö..= .u.Ö 0000C0
 3DFC20E9 03750005 3DF8D1E9 03750002 3DF8C2E9 03750001 3D0033E9 0376FEBC ¥±v.Ö3.=..u.Öö«=..u.Öi«=..u.Ö •= 0000E0
 E9037500 7A3D0043 E9FBC6E9 03750000 3DFC68E9 03750008 3DFCB3E9 03750007 ..u.Ö°•=..u.Öh•=..u.Öó«ÖC..z.u.Ö 000100
 E903751B 563D0023 E9FD0DE9 03750030 3DFC16E9 03750023 3D0013E9 0376FD38 8»v.Ö..=#.u.Ö.•=0.u.Ö.»Ö#.=..u.Ö 000120
 1276FF00 00E9FE04 E903751B 653DFD9A E903751B 643DFDE1 E903751B 583DFE03 .±=X.u.ÖÃ»=d.u.Ö.»=e.u.Ö.±Ö...v. 000140
 0ECAC95F 5E1F0000 E90000FF FF9A0676 FF0876FF 0A76FF0C 76FF0E76 FF1076FF .v..v..v..v..v..v......Ö...^_èÖ. 000160
 017F0103 00030002 00230103 00000003 09520002 07230003 001A0005 001C9000 ...........#...R.......#......... 000180
 07D80103 008C0002 004D0103 00080002 08B70103 00000006 0A220002 00060002 ......"......ñ.......M.......Ä. 0001A0
 08050103 00110002 03A00103 00100002 0ACA0103 00000008 072B0002 000D0002 ......+.......ò................. 0001C0
 01AF0203 009F0003 02760103 001F0002 07410103 001E0002 02E00103 00100003 ......Á.......A.......v.......E. 0001E0
```

```
Dump of file SATURN:[PCCOMMON.DUMP.DLL]UIW.TMP;1 on 18-APR-1990 10:53:22.77
File ID (940,4,0)   End of file block 88 / Allocated 88

Virtual block number 34 (00000022), 512 (0200) bytes

 07F40103 002C0002 02CB0103 002B0002 025A0103 00320001 0B470103 001A0004 ......G...2...Z...+...Ù...,...¶. 000000
 07700203 00930006 0AAB0203 00B20002 0C130103 002E0002 0B100103 002D0002 ..-...............ý...........p. 000020
 099E0103 00370004 01D00203 00450002 09F70103 003D0002 09BE0103 00280004 ..(...ƒ...=...¼...E...Å...7..... 000040
 FFFA76FF D88EFFFF B81E5657 000010C8 00000000 00000000 00000000 004D0002 ..M.............à...WV.¡...Å.v*. 000060
 6A006A0E 76FF1076 FF0000FF FF9A046A 046A006A FFFF68FF FF680064 681EF876 v½.hd.h..h..j.j.j.......v..v.j.j 000080
 00FFFF9A 5016FC46 8D006A00 6A006A00 6A007668 1E006468 1E0A76FF 0C76FF00 ..v..v..hd..hv.j.j.j.j..F•.P.... 0000A0
 006AFC76 FFFE76FF 006DE900 00880006 E90374F6 460BF446 8BF65689 F4468900 ..F¶.V-.F¶.F-t.Ö..¡..Öm..v±.v•j. 0000C0
 478926FE 568BFC46 8BF05EC4 07892612 468BF05E C4F25689 F0468900 00FFFF9A ......FÞ.V·á^Þ.F.&..á^Þ.F•.V±&.G 0000E0
 9A800668 F476FFF6 76FF0E57 89260C47 8926F656 8BF4468B F05EC40A 57892608 .&.W.á^Þ.F¶.V-&.G.&.W..v-.v¶h... 000100
 B8025789 26078926 F2568BF0 468B065E C42A5789 26284789 26F05EC4 0000FFFF ....á^Þ&.G(&.W*á^..FÞ.V·&..&.W.¡ 000120
 9A5016FE 468D026A D88E0008 B81E5657 00000AC8 000ECAC9 5F5E1F00 00E90001 ..Õ...^_èò..àÖ..WV.¡...Áj..F±.P. 000140
 5016FF26 868D00CA 681D6AFE 76FF0188 E90001B8 0006E903 7500003D 0000FFFF ....=..u.Õ..¡..Õ...v±j.hò...&..P 000160
 FF269EC4 000007C7 26FF269E C40167E9 00018800 06E90375 00003D00 00015E9A .^...=..u.Õ..¡..Õg.á.&.&ú...á.&. 000180
 506A1D6A FE76FF0A 57892608 47892608 56880646 8BFF269E C4064789 26FE468B .F±&.G.á.&..F..V.&.G.&.W..v±j.jP 0001A0
 011AE900 01B80006 E9037500 003D0000 FFFF9A50 5200AE05 FF28968B FF26868B ..&...(..Û.RP.....=..u.Õ..¡..Õ.. 0001C0
 C726FF26 9EC408C4 83FFFF01 829A00AE B7FF2600 B087FF26 FF269EC4 006A506A jPj.á.&.&.ñ¯.&.ñÜ.......á.á.&.&ú 0001E0

Dump of file SATURN:[PCCOMMON.DUMP.DLL]UIW.TMP;1 on 18-APR-1990 10:53:22.77
File ID (940,4,0)   End of file block 88 / Allocated 88

Virtual block number 35 (00000023), 512 (0200) bytes

 9EC40000 00B887C7 26001400 B687C726 FF269EC4 000000B4 87C72604 0000B287 .ý...&ú.Ç...á.&.&ú.Ñ...&ú.¡...á. 000000
 8A878926 00BC8789 260000B8 FF269EC4 000000C4 87C72600 1400C287 C726FF26 &.&ú.ô...&ú.á...á.&.¡..&..¥.&..¤ 000020
 892600C0 87892600 00B8FF26 9EC400C6 87892600 C8878926 0000B8FF 269EC400 .á.&.¡..&..à.&..ó.á.&.¡..&..á.&. 000040
 8D000068 006AFA76 FFFC76FF FC5689FA 46890000 FFFF9A06 76FF0876 FF00BE87 .ƒ..v..v.......F*.V•.v•.v*j.hÅ.. 000060
 FF269EC4 16578926 14478926 905688BE 468BFF26 9EC40000 FFFF9A50 16FF2A86 .*..P.....á.&..F..V.&.G.&.W.á.&. 000080
 1A578926 18478926 9C56889A 468BFF26 9EC41E57 89261C47 89269856 8896468B .F..V.&.G.&.W.á.&..F..V.&.G.&.W. 0000A0
 FF0000FF FF9AFA76 FFFC76FF 22578926 20478926 FF7C968B FF7AB68B FF269EC4 á.&...z...|.&.G &.W".v•.v*...... 0000C0
 C8CBC95F 5E1F0000 E90000B8 0000FFFF 9AFF26B6 FFFF28B6 FF006A06 76FF0876 v..v.j..Ñ(..Ñ&......¡..Õ...^_èùà 0000E0
 76FFE656 89E44689 00C0978B 2600BE87 8B260A5E C4D88E00 E4B81E56 57000064 d..WV.¡Õ..Äá^.&..ƒ.&..à..FÕ.Vl.v 000100
 FFFF9A50 16EA468D 006A006A 0676FF08 76FF0000 FFFF9A50 16EA468D 0676FF08 ..v..Fõ.P......v..v.j.j..Fõ.P... 000120
 FFE67E83 0009E903 74FFE47E 830000FF FF9AA076 FFA276FF A25689A0 46890000 ...F..VÅ.vÅ.v.......-õ.t.Õ...-Ì. 000140
 880129E9 03750240 0B26008B 2600AE9F C4260A5E C402E6C1 E4768801 43E90375 u.ÕC..vôèl.á^.&á.Û.&..&.ə.u.Õ).. 000160
 B7FF260A 5EC4FE56 89FC4689 02508B26 008B2600 AE9FC426 0A5EC402 E6C1E476 vôèl.á^.&á.Û.&..&.P..F•.V±á^.&.ñ 000180
 036900A4 9A5016A4 468D0088 681E0677 FF260877 FF26FC5E C400C687 FF2600C8 à.&.ñó.á^•&.w.&.w..h...FÊ.P.Ê.i. 0001A0
 4E8D04C4 83037800 8C9A37FF 260277FF 26FC5EC4 1D6A0677 FF260A5E C410C483 .á.á^.&.w.j.á^•&.w.&.7...x..á..N 0001C0
 FF26FC5E C4000001 119A5016 9C468D50 40C60304 C48303A7 008C9AF0 8B5116A4 Ê.Q.Þ...Ï..á..ó@P.F..P.....á^•&. 0001E0

Dump of file SATURN:[PCCOMMON.DUMP.DLL]UIW.TMP;1 on 18-APR-1990 10:53:22.77
File ID (940,4,0)   End of file block 88 / Allocated 88

Virtual block number 36 (00000024), 512 (0200) bytes

 C7E84689 10C48301 8500A49A 9C76FF9E 76FF0096 681E5016 A4468D37 FF260277 w.&.7.FÊ.P.h...v..v..Ê....á..FÒú 000000
 03FA468B 50FA462B E8468BA0 76FFA276 FF0067E9 0372FA46 39E8468B 0000FA46 F*...FÒ9F*r.Õg..vÅ.v..FÒ+F*P.F*. 000020
 C4FA4601 0000FFFF 9A400068 006A006A 076A006A 5016EA46 8D50529E 56889C46 F..V.RP.Fõ.Pj.j.j.j.h.ə......F*á 000040
 E90003E9 03771847 39260009 E9037E00 11E9037D 1A573926 F8568BF6 468B0A5E ^..F-.V½&9W.).Õ..-.Õ..&9G.w.Õ..Õ 000060
 9E76FF06 77FF260A 5EC4FF8E E9F85619 F646291A 57882618 4788260A 5EC40014 ..á^.&.G.&.W.)F-.V½Õ..á^.&.w..v. 000080
 B81E5657 000000C8 CBC95F5E 1F0000FF FF9AA076 FFA276FF 0000FFFF 9A9C76FF .v.......vÅ.v.......^_èùà...WV.¡ 0000A0
 5EC45052 D22B00BE 878B2606 5EC401A0 682877FF 262A77FF 26065EC4 D88E0297 ...Äá^.&.w*&.w(h..á^.Ï..ƒ.+ØRPá^ 0000C0
 1E565700 0008C8CB C95F5E1F 0000FFFF 9A5052C0 2BD08BD2 2B4800BA 878B2606 .&..¤.H+Ø.Å+àRP......^_èùà...WV. 0000E0
 260010E9 037400B6 87392606 5EC400B4 978B2600 82878B26 065EC4D8 8E0450B8 ¡P..Äá^.&..ý.&..Ç.á^.&9.Ñ.t.Õ..& 000100
 89F84689 00B8978B 2600B687 8B26065E C4014BE9 00018800 06E90374 00B89739 9.¡.t.Õ..¡..ÕK.á^.&..Ñ.&..¡..F½. 000120
 8B26065E C40050E9 0375FF00 84BF8326 000BE903 74FE0082 BF832606 5EC4FA56 V*á^.&.¢ý.±t.Õ..&.¢Ç..u.ÕP.á^.&. 000140
 E9037D00 B4973B26 065EC400 C4971326 00C28703 26065EC4 00B8978B 2600B687 .Ñ.&..¡.á^.&..õ.&..á.á^.&;.Ç.).Õ 000160
 8926065E C400B287 8B2600B4 978B2600 0AE90377 00B28738 26000AE9 037E0019 ..-.Õ..&;.ý.w.Õ..&..Ç.&..ý.á^.&. 000180
 00B68701 26065EC4 00C4978B 2600C287 8B26065E C4001AE9 00B89789 2600B687 .Ñ.&..¡.Õ..á^.&..ô.&..á.á^.&..Ñ. 0001A0
 9A5016FC 468D5002 E0C100B6 878B2606 5EC41D6A 0677FF26 065EC400 B8971126 &..¡.á^.&.w.j.á^.&..Ñ.èÅ.P.F•.P. 0001C0
 B800B897 892600B6 878926FA 568BF846 8B065EC4 0019E903 7500003D 00000387 ....=..u.Õ..á^..F½.V*&..Ñ.&..¡.¡ 0001E0
```

```
Dump of file SATURN:[PCCOMMON.DUMP.DLL]UIW.TMP;1 on 18-APR-1990 10:53:22.77
File ID (940,4,0)   End of file block 88 / Allocated 88

Virtual block number 37 (00000025), 512 (0200) bytes

C48305D3 01829AFC 76FFFE76 FF006A50 02E0C100 86878B26 065EC400 75E90001 ..Õu.á^.&..Ñ.èÁ.Pj..v±.v•...Æ..á 000000
FC76FFFE 76FF00AE 87FF2600 B087FF26 065EC450 02E0C100 BA878B26 065EC408 .á^.&..¤.èÁ.Pá^.&.ñ¯.&.ñÜ..v±.v• 000020
0004349A 00AE87FF 26008087 FF26065E C40677FF 26065EC4 0AC48303 4E01249A .$.Ñ..á.á^.&.w.á^.&.ñ¯.&.ñÜ..4.. 000040
C8CBC95F 5E1F0000 E90000B8 00809789 2600AE87 8926FE56 8BFC4688 065EC400 .á^..F•.V±&..Ü.&..¯.¡..Õ...^_èùà 000060
77FF261F C42600AE 9FC42606 5EC40677 FF26065E C4D88E04 91881E56 57000000 ...WV.¡...Äá^.&.w.á^.&á.0.&á¯.&.w 000080
9A37FF26 0277FF26 00AE9FC4 26065EC4 0677FF26 065EC400 0006509A 37FF2602 .&.7.P...á^.&.w.á^.&á.Û.&.w.&.7. 0000A0
C45002E0 C1008A87 8B26065E C40000BC 9F832601 008AAF83 26065EC4 000005ED Ú...á^.&.£¤..&..¥..á^.&..¤.èÁ.Pá 0000C0
249A00AE 87FF2600 B087FF26 065EC450 52000405 00809788 2600AE87 8B26065E ^.&..0.&..¯....RPá^.&.ñ¯.&.ñÜ..$ 0000E0
02408926 00008800 AEB4C426 0676C402 E3C100BA 9F882606 5EC40AC4 8305AC01 .¯..á.á^.&..¤.èD.áv.&áÇÜ....&.ә. 000100
C4002BE9 03741046 0B0E4688 D88E0617 881E5657 000004C8 CBC95F5E 1F008926 &...^_èùà...WV.¡...Ä.F..F.·.Õ+.á 000120
00FFFF9A 006A006A 006A0676 FF0876FF FFFF00C0 87C726FF FF008E87 C7260A5E ^.&ú.7...&ú.ä....v..v.j.j.j. ... 000140
7400BA87 39260A5E C400B897 88260086 8788260A 5EC401D4 E90000BA 00008800 .j..¤..Õå.á^.&..Ñ.&..¡.á^.&9.¤.t 000160
84BF8326 0008E903 74FE00B2 8F83260A 5EC40077 E9037400 BC973926 0081E903 .Õ..&9.¥.t.Õw.á^.&.¢ý.±t.Õ..&.¢Ç 000180
36E9037E 00889739 260A5EC4 0084978B 26008287 88260A5E C40029E9 0375FF00 ..u.Õ).á^.&..ý.&..Ç.á^.&9.¡.-.Õá 0001A0
003D04C4 83077F04 899A0A76 FF0C76FF 0027E903 72008687 3926000A E9037D00 .).Õ..&9.Ñ.r.Õ'..v..v.......á.=. 0001C0
060F9A0A 76FF0C76 FF000EE9 04C48307 90060F9A 0A76FF0C 76FF000E E9037500 .u.Õ...v..v.......á.Õ...v..v.... 0001E0

Dump of file SATURN:[PCCOMMON.DUMP.DLL]UIW.TMP;1 on 18-APR-1990 10:53:22.77
File ID (940,4,0)   End of file block 88 / Allocated 88

Virtual block number 38 (00000026), 512 (0200) bytes

E9037500 00300000 07DB9A50 16FC468D 0A6A1D6A 0677FF26 0A5EC404 C4830017 ...á.á^.&.w.j.j..F•.P.Û...=..u.Õ 000000
83081500 8C9A0E76 FF1076FF 1D6A0677 FF260A5E C40113E9 0000BA00 01B80009 ..|..¤..Õ..á^.&.w.j..v..v....... 000020
76FF0677 FF260A5E C4001BE9 03750000 30000005 709AFC76 FFFE76FF 504004C4 á.әP.v±.v•.p...=..u.Õ..á^.&.w..v 000040
260277FF 26FC5EC4 0E76FF10 76FF00CC E900008A 0001B800 0006359A FC76FFFE ±.v•.5...|..¤..Õä..v..v.á^•&.w.& 000060
26FC5EC4 04C48306 91008C9A 37FF2602 77FF26FC 5EC408C4 83082700 569A37FF .7.V.'..á.á^•&.w.&.7......á.á^•& 000080
57892606 478926FC 5EC40002 83000105 008C9788 26008A87 88260A5E C4044789 .G.á^.&..¤.&..¥.....Ø.á^•&.G.&.W 0000A0
50892600 8926FE56 88FC4688 00AEB4C4 260A76C4 02E3C100 8A9F8826 0A5EC408 .á^.&..¤.èD.áv.&áÇÛ..F•.V±&..&.P 0000C0
8789260A 5EC40000 8C978326 01008A87 832600BC 97882600 8A878826 0A5EC402 .á^.&..¤.&..¥.&..¤..&..¥..á^.&.. 0000E0
6904489A 0A76FF0C 76FF0000 C8978326 0100C687 83260A5E C400C097 892600BE ƒ.&..à.á^.&..ó..&..à...v..v..H.Ì 000100
5E1F0000 E90000BA 00008800 0006E09A 006A006A 006A0676 FF0876FF 04C48307 ..á..v..v.j.j.j..Ü...|..¤..Õ...^ 000120
89F04689 00809788 2600AE87 8B26065E C4D88E06 C0881E56 57000010 C8CBC95F _èùà...WV.¡à..Äá^.&..Ü.&..¯..Fb. 000140
7500003D 000007A6 9A5016F4 46805002 E0C10A46 881D6A06 77FF2606 5EC4F256 V·á^.&.w.j..F.èÁ.P.F¶.P.Ì...=..u 000160
00FA830C 56180A46 2800BC97 8B26008A 87882606 5EC4011B E90001B8 0006E903 .Õ..|..Õ..á^.&..¤.&..¥.+F..V..•. 000180
0088FA56 89F84689 00008800 00BA0006 E9037200 00300008 E9037D00 13E9037E -.Õ..).Õ..=..r.Õ..¤..|...F½.V•|. 0001A0
2D00BC97 8B26008A 87882606 5EC400FE 568301FC 46830008 E9FC4689 FE468900 ..F±.F•Õ...F•..V±.á^.&..¤.&..¥.- 0001C0
FA5688F8 4688007F E90377FC 46380008 E9037E00 8CE9037D FE563800 DA830001 ...Õ.;V±).Õ..-.Õ..;F•w.Õ...F½.V• 0001E0

Dump of file SATURN:[PCCOMMON.DUMP.DLL]UIW.TMP;1 on 18-APR-1990 10:53:22.77
File ID (940,4,0)   End of file block 88 / Allocated 88

Virtual block number 39 (00000027), 512 (0200) bytes

C1FC5E8B 0677FF26 065EC400 3EE90372 FC463900 08E9037D 004BE903 7EFE5639 9V±~.ÕK.).Õ..9F•r.Õ>.á^.&.w..^•è 000000
E3C1FC5E 880677FF 26065EC4 0000090C 9A37FF26 0277FF26 18C426F0 76C402E3 D.ávÞ&á.&.w.&.7.É...á^.&.w..^•èD 000020
26008826 F076C402 E3C1FC5E 880023E9 00000A1E 9A30FF26 0270FF26 F076C402 .ávÞ&.p.&.0.....Õ#..^•èD.ávÞ&..& 000040
0677FF26 065EC4FF 51E90250 89260089 26F476C4 02E3C1F8 5E28FC5E 88025088 .P..^•+^½èD.áv¶&..&.P.ÕQ.á^.&.w. 000060
00AE8789 26F6568B F4468806 5EC40000 07F59A00 AEB7FF26 008087FF 26065EC4 á^.&.ñ¯.&.ñÜ..¥...á^..F¶.V-&..Ü. 000080
FFFC4689 FE468900 0088088E 08D8881E 56570000 0AC8CBC9 5F5E1F00 B0978926 &..¯..^_èùà...WV.¡Ü..Ä¡...F±.F•. 0000A0
DC9A1076 FF1276FF 025BE90E 4688F856 89F64689 00000071 9A006A10 76FF1276 v..v.j..q....F-.V½.F.Õ[..v..v..É 0000C0
00BA0000 880000FF FF9A0677 FF26F65E C4028FE9 00008A00 008804C4 8308CE00 .ö..á.|..¤..Õ..á^-&.w......|..¤. 0000E0
47892608 4688F65E C4244789 2606468B F65EC402 71E90000 BA000088 027AE900 .Õz.|..¤..Õq.á^-.F.&.G$á^-.F.&.G 000100
7D0000C0 BF8326F6 5EC400D4 E9FA4688 FA468908 46880254 E90000BA 00008826 &j..¤..ÕT..F..F•.F•Õå.á^-&.¢à..) 000120
9F832601 00BEAF83 26F65EC4 0012E903 770000BE BF832600 0BE9037E 0022E903 .Õ".~.Õ..&.¢ƒ..w.Õ..á^-&.£ƒ..&.. 000140
0000086A 9A006A00 6A006A10 76FF1276 FF020FE9 00008A00 00880009 E90000C0 à..Õ..|..¤..Õ...v..v.j.j.j..j... 000160
037D00C0 973826F6 5EC4000A 8300012D 008C9788 26008A87 8826F65E C40082E9 Õý.á^-&..¤.&..¥.-...Õ.á^-&;.à.). 000180
00C09783 2601008E 878326F6 5EC40012 E9037700 BE873826 000AE903 7E0021E9 Õ!.-.Õ..&;.ƒ.w.Õ..á^-&..ƒ..&..â. 0001A0
54E90000 0B909A00 6A006A00 6A1076FF 1276FF01 B1E90000 BA000088 0009E900 .Õ..|..¤..ÕY..v..v.j.j.j......ÕT 0001C0
9A006A00 6A006A10 76FF1276 FF000000 C087C726 00BE8789 2606468B F65EC400 .á^-.F.&../.&ú.ä....v..v.j.j.j.. 0001E0
```

```
Dump of file SATURN:[PCCOMMON.DUMP.DLL]UIW.TMP;1 on 18-APR-1990 10:53:22.77
File ID (940,4,0)   End of file block 88 / Allocated 88

Virtual block number 40 (00000028), 512 (0200) bytes

 E9037500 033DFF69 E9037500 023DFF24 E9037500 013D002B E9002EE9 000008C1 è...Õ..Õ+.=..u.Õ$.=..u.Õi.=..u.Õ 000000
 08AF0448 9AF676FF F876FF00 00E9FFAF E9037500 063DFF59 E9037500 043DFF14 ..=..u.ÕY.=..u.Õ£.Õ...v½.v-.H.£. 000020
 7D0025E9 037E00B8 9739260C 56880A46 8BF65EC4 0132E900 00BA0000 BB04C483 .á.¡..¤..Õ2.á^-.F..V.&9.¡.-.Õ%.) 000040
 B4978926 00B28789 260C5688 0A468BF6 5EC40016 E9037200 B6873926 000AE903 .Õ..&9.Ñ.r.Õ..á^-.F..V.&..ý.&..Ç 000060
 B6873926 000AE903 7E0023E9 037D00BB 9739260C 56880A46 8BF65EC4 0036E900 .Õ6.á^-.F..V.&9.¡.).Õ#.~.Õ..&9.Ñ 000080
 06468BF6 5EC408C4 830C7E08 D39AF676 FFF876FF 0A76FF0C 76FF0014 E9037700 .w.Õ...v..v..v½.v-.Æ.~..á.á^-.F. 0000A0
 FF0A76FF 0C76FF06 76FF00AB E90000BA 00008800 C4978926 00C28789 26085688 .V.&..ö.&..á.¦..¤..Õ`..v..v..v.. 0000C0
 FF1276FF F676FFF8 76FF0088 E90EC483 0C9506B8 9A1076FF 1276FFF6 76FFF876 v½.v-.v..v..¡....á.Õ...v½.v-.v.. 0000E0
 FF0C76FF 0E76FF10 76FF1276 FF006BE9 0000BA00 00B808C4 830A7102 8F9A1076 v....q..á.¡..¤..Õk..v..v..v..v.. 000100
 001BE903 76FFBBE9 03750023 3D0048E9 004EE900 00FFFF9A 0676FF08 76FF0A76 v..v..v......ÕN.ÕK.=#.u.Õ£.v.Õ.. 000120
 03750029 3DFFB8E9 FDB5E903 7500073D FD9FE903 7500023D FD90E903 7500013D =..u.Õ.»=..u.Õ.»=..u.Õç»Õ¡.=).u. 000140
 5E1FFF95 E9FED1E9 03751B66 3DFF63E9 03751B63 3DFDBFE9 03750031 3DFDA1E9 ÕÀ»=1.u.Õ¢»=c.u.Õc.=f.u.Õi±Õ...^ 000160
 00000006 07CD0002 00030002 00230103 00000004 0C450002 00189000 0ECAC95F _èò.......E.......#.......ë..... 000180
 00130002 00B00103 00000008 0A420002 008C0002 00400103 01080002 03E80103 ..Õ.......M.......B............. 0001A0
 001F0002 0A580103 001E0002 02800103 001A0002 02BA0103 00100003 02DF0103 ..Õ.......¤...............X..... 0001C0
 002B0002 01FA0103 001A0004 00F00203 0A3A0004 001A0005 009F0003 02160103 ..............:...Þ.......*...+. 0001E0

Dump of file SATURN:[PCCOMMON.DUMP.DLL]UIW.TMP;1 on 18-APR-1990 10:53:22.77
File ID (940,4,0)   End of file block 88 / Allocated 88

Virtual block number 41 (00000029), 512 (0200) bytes

 002F0002 0B0C0103 002E0002 043F0103 002D0002 02CE0103 002C0002 02680103 ..k...,...ö...-...7.........../. 000000
 00370004 09080203 003D0002 04800103 00280004 0A870203 00B20002 0CB90103 ..¿...ý.......(........=.......7. 000020
 260A5EC4 D88EFFFF B81E5657 000000C8 00000000 00000000 00450004 09C00203 ..â...E..........à...WV.¡...Äá^.& 000040
 00C80008 CAC95F5E 1F0000E9 0000B802 57892607 8926065E C40A578B 26084788 .G.&.W.á^.&..&.W.¡..Õ...^_èò..à. 000060
 B8025789 26078926 065EC40E 578B260C 478B260A 5EC4D88E 0008881E 56570000 ..WV.¡...Äá^.&.G.&.W.á^.&..&.W.¡ 000080
 26104788 260A5EC4 D88E0036 881E5657 000000C8 0008CAC9 5F5E1F00 00E90000 ..Õ...^_èò..à...WV.¡ó..Äá^.&.G.& 0000A0
 56570000 00C80008 CAC95F5E 1F0000E9 0000B802 57892607 8926065E C4125788 .W.á^.&..&.W.¡..Õ...^_èò..à...WV 0000C0
 5F5E1F00 00E90000 B8125789 26104789 2608568B 0646880A 5EC4D88E 0064881E .¡d..Äá^..F..V.&.G.&.W.¡..Õ...^ 0000E0
 E90000B8 07892606 5EC4078B 260A5EC4 D88E0092 B81E5657 000000C8 0008CAC9 èò..à...WV.¡...Äá^.&..á^.&..¡..Õ 000100
 00000000 00000000 00000000 00000008 008C0002 00019000 08CAC95F 5E1F0000 ...^_èò.......¥................. 000120
 FFFFB9C0 33067EC4 1EDE88D7 88EC8855 00000000 00000000 00000000 00000000 ................U.š.■.ß.á-.3â¿.. 000140
 01C6F706 4688FE87 08468ED8 8EC08CF9 2BD1F7AE F2FFFFB9 0A7EC4FF 758DAEF2 ·Û.u.á-.¿..·Ü¼ì+¹.â.Á.F..±.F.%6. 000160
 76C51EDE 88D788EC 8855CB50 C28C1FFA 8BF388A4 F3C913A5 F3E90149 A4027400 .t.Ê¦ÌÕµÊ.èµÊ.µ.¹..ö]ìU.š.■.ß.év 000180
 13A5F3E9 D149A402 7401A8C7 88067EC4 D1F7AEF2 FFFFB9C0 33C08ED8 8CFE880A ..±.Ä.ã3â¿..·Ü¼ìá-..ú´.t.Ê¦ÌÕµÊ. 0001A0
 8B914901 F7AEF2FF FFB9C033 067EC407 88EC8855 CB5DC28C 1FFA8BF3 88A4F3C9 èµÊ.µ.¹..ö]ìU.š.■á-.3â¿..·Ü¼ìl.. 0001C0
 26F85EC4 FE568CFC 46890E46 8DFA568C F84689EC 468D5657 000016C8 00CB5DFA ¹]ù.à...WV.Fš.F½.V¹.F..F■.V±á^½& 0001E0

Dump of file SATURN:[PCCOMMON.DUMP.DLL]UIW.TMP;1 on 18-APR-1990 10:53:22.77
File ID (940,4,0)   End of file block 88 / Allocated 88

Virtual block number 42 (0000002A), 512 (0200) bytes

 167FFF04 47C72602 57892607 89260857 89260647 89260856 8B064688 420A47C6 6G.B.F..V.&.G.&.W.&..&.W.&úG.... 000000
 C02A1278 044FFF26 F85EC4F0 8B0CC483 01190A6A 9A53060A 76FF0C76 FFFC76FF .v■.v..v..S.j....á..Þá^½&.O.x.*â 000020
 C68806C4 83FFFF08 F49A006A 53FA76FF 900FEB05 88260247 8E2607FF 263F8B26 &.?&..&.G.&..Š...v¹Sj..¶....á..6 000040
 DB18C22B D2F7D78B 48C18B06 7EC40A76 C556571E 4EE30E4E 8BEC8855 CBC95F5E ^_èùU.š.N.DN.WVév.á-..èH.■¼Ø+ö.Ù 000060
 0B18E391 A4F3C913 A5F3E9D1 C1289140 C203C323 DB18C228 D2F7D688 C203C323 #Ũ.ö.■¼Ø+ö.Ù#ū.öª.+èìÕµÊ.èµÊ.D.. 000080
 08568B06 46881F5F 5EBEEBC0 8E016605 C08CC775 FF08D88E FFFF0508 8C0775F6 -u..Ä....Ä..uú.â.f..âŠ/^ ..F..V. 0000A0
 D12BD187 D103D323 DB18D12B 0C740AF7 D788067E C45738E3 0C4E88EC 8855CB5D ]ìU.š.N.D8Wá-..■¼Õt.+1.Ù¥£.1.ì+1 0000C0
 F3C913AB F3E9D1C3 8E0171C3 81C38C10 E3D187AA F3C913AB F3E9D1E0 8A0A4688 .F..ÀìÕµ¨.èµ´.ìD..ú.úq..ùìÕµ¨.èµ 0000E0
 F7D8F706 56884711 7DC00B08 4688FF33 535657EC 8855CB5D 08568B06 46885FAA ¯_.F..V.]ìU.šWVS3..F..á).G.V.¼Ä¼ 000100
 890C4689 00001DDA F7D8F70A 56884711 7DC00B0C 46880656 89084689 0000100A Õ....F..V..F..á).G.V.¼Ä¼Õ....F.. 000120
 0A4E8808 8838E8D3 88F1F706 4688D888 F1F7D233 0846880A 4E881575 C0080A56 V..âu..N..F.3Ø¼Þ.Ä.F.¼Þ.£Š8.Ä.N. 000140
 03E6F70A 4688910C 66F7F08B F1F7F475 D808D8D1 EAD1D9D1 EBD10646 88085688 .V..F.ìŠ¦¦ìõìÄ.Ùu¶¼Þ.Þ¼f...F.¼|. 000160
 5F5E5800 DA830BF7 DAF70775 4F960233 4E017606 46380672 07770856 3B0C72D1 ìr.;V.w.r.;F.v.N3Ø.Ou.¼Õ¼Ä.Õ.[^_ 000180
 08CA5DE5 8BE3F706 46880875 0A5E88D8 080C5E88 084688EC 88550008 CA5DE58B .[]ò..U.š.F..^..Ä.^.u..F.¼D.[]ò. 0001A0
 C08ED88C 57560008 CA5DE58B D103E3F7 064688C8 030C66F7 064688C8 88E3F700 .¼D.à.F.¼f..à.F.¼D.1.[]ò..VW.Ä.â 0001C0
 8CFB880C C38302D0 1E8BF388 5756C08E D08CCB5E 5FA5F300 0AB900EA BF009CBE ƒ..¢õ.ʟ..µÊ_^ù.Å.àVW.µ..Å..û..«. 0001E0
```

Dump of file SATURN:[PCCOMMON.DUMP.DLL]UIW.TMP;1 on 18-APR-1990 10:53:22.77
File ID (940,4,0)   End of file block 88 / Allocated 88

Virtual block number 43 (0000002B), 512 (0200) bytes

```
8ED98CF8 880CC383 02D01E88 F3885756 16EBF388 D98EA5A5 FCD88EC1 8ED98CC0 å.).è.Ä=ÉÉ.).µŠ.VW.µ..Å..û..«.). 000000
5756C08E D08CCB5E 5F03FE47 C6FC7789 02D01E89 4E7402BC FB81F388 A5A5FCC1 é=ÉÉ.µ.«¥.tN..Å..w=6G±._^ù.Å.âVW 000020
575618EB F388D98E A5A5A5A5 FCD88EC1 8ED98CC0 8CFB880C C38302D0 1E88F388 .µ..Å..û..«.â.).è.Ä=ÉÉÉÉ.).µŠ.VW 000040
02D01E89 0E74028C F881F388 A5A5A5A5 FCC18ED9 8CFB880C C38302D0 1E88F388 .µ..Å..û..«.).è=ÉÉÉÉ.µ.«¥.t...Å. 000060
F388FCD8 8EC18ED9 8CD88C57 5604EBD0 8C575611 BFE9CB5E 5FFC7789 07FE47C6 6G±..w=_^ùÒ¢.VW.ÅŠ.VW.Å.).è.Å=.µ 000080
8902D01E 89CF7402 BCF881A5 A5027403 3CA5A5FE 4588ADFB 880CC383 02D01E88 ..Å..û.¯«Ù.E±ÉÉ<.t.ÉÉ.«¥.tû..Å.. 0000A0
07880AEB 99078B26 C08ED08C 14EB0257 8826078B 26C08ED0 8CCB5E5F D98EFC5F _=.)_^ù.Å.ä&..&.W.Š..Å.á&...Š... 0000C0
8302D03E 88000883 DAF7D8F7 07798024 C78AD088 DA885756 99078803 E8025788 ¯W.Š¯....VW.Ö.Å.ú$.y.%Ú%Ö.Ú..>Å.. 0000E0
E0E89E84 03FE45C6 0F7500FF 80C18ED9 8CFC7D89 02D03E89 1C74028C FF810CC7 ú...¥.t..>Å..)=.).ê...u.6E±.Ç.ÒÅ 000100
D88C5756 C85E5F50 1A3FE8F8 88D833C8 8887608D 5507FE45 C6FF63E9 C85E5F16 ._^ùÒc.6E±.U§'..ú3Ü.«Ò?.]_^ùVW.Ä 000120
FCFE4588 FC7D8902 D03E89B1 74028CFF 810CC783 FE458AFC 75880200 3E88C08E .Ã.>Å..u=.E±.ú...¥.tÝ.>Å.¯)=.E±= 000140
7D8902D0 3E898C74 028CFF81 0CC78302 D03E8857 56C85E5F A5A50274 033CA5A5 ÉÉ<.t.ÉÉ_^ùVW.>Å..ú...¥.t..>Å..) 000160
1E88FCF8 885756C0 8ED88C02 E8D08CC8 5E5FABAB FCC033C0 8ED88C03 FE45C6FC =6E±..Ä.Ã3ä=¨¨_^ù.ÅŠ..Ä.âVW.«=.. 000180
0D7503FE 7F8002D0 1E88FCFB 885756C0 8ED88C02 E8D08C11 E80C02D0 068302D0 Å...Å..Š..ÅŠ..Ã.âVW.«=..Å...±.u. 0001A0
8CE4EB5D DE885F11 02E857FC 7788010C 268955CB 5E5F0C02 D02E83A5 A5FC7788 .w=ÉÉ..Å.._^ùW.&...w=WÒ.._.ß)Šõ. 0001C0
56C08ED8 8C02EBD0 8C11EB0C 02D00683 02D01E88 FCFB8857 56C08ED8 8C02EBD0 ÅŠ..Ä.âVW.«=..Å...Å..Š..ÅŠ..Á.âV 0001E0
```

Dump of file SATURN:[PCCOMMON.DUMP.DLL]UIW.TMP;1 on 18-APR-1990 10:53:22.77
File ID (940,4,0)   End of file block 88 / Allocated 88

Virtual block number 44 (0000002C), 512 (0200) bytes

```
E8DF87C8 5E5F0C02 D02E83A5 A5A5A5FC 77880F75 07FE7F80 02D01E88 FCF88857 W.«=..Å...±.u..w=ÉÉÉÉ..Å.._^ù.ÒÒ 000000
8C10EB0C 02D00683 02D01E88 F8885756 C08ED88C 02E8D08C E9E8DF87 F78824A0 .$.%.ÒŠÒ.ÅŠ..Ä.âVW.«..Å...Ï..Š.. 000020
74033CA5 A5ABFC0C 02D02E83 FE478AF3 8802D01E 88F88857 56C08ED8 8C02EBD0 ÅŠ..Ä.âVW.«..Å..µ.G±..Å..=¨ÉÉ<.t 000040
00CC2688 9F00EE05 A79A48EB 168ABA16 858850EB 16918A16 8788CB5E 5FA5A502 .ÉÉ_^ù¡..¤..ŠP¡ç.▭.ŠH.Ï.Ÿ...&ä. 000060
268A5011 ABE89004 E811E6E8 900AEB11 98E89010 E81199E8 36E8054E BA0548B8 ¡H.ÕN.Š6Ò..Š..Ò..Š..Ò!.Š..Ò¨.P.& 000080
5756055A BA0554B8 00CC2688 9F053905 A79AC30A F7000283 D8F70773 589E00CC ä..Xs.%Å.Ø.%ÖÙ.Ï.9...&ä.¡T.¤Z.VW 0000A0
FF02E8D0 FF047508 7488030A 7C8002D0 36890CEE 83020036 88515301 0C268955 U.&..SQ.6Å..Ÿ..6Å..|...t.u..ÅŠ.. 0000C0
75F0FF41 F6087403 F8801375 7F01F6FF 32FE508A 02D03E88 57C85E5F 505859D2 ØY[]_^ùW.>Å..]±2.-..u..«.t.-A.Þu 0000E0
2180FF32 FE5D8A02 D03E8857 CBF9CBE4 0803755F 8001F6F8 7480FF41 F6CB5F08 ._ù-Ä..t½-.._u..ðù¹ùW.>Å..]±2..! 000100
D98CFC7D 89CB5E5F 803180FF 320875F7 38FC7588 FE5D8A02 D03E8857 56CB5F7F .¯ùVW.>Å..]±¯u=;%u.2..1._^ù.)=.) 000120
8ED08C57 56CB5E5F AB80F480 ADA5A5CB 5E5FAB80 F480AD08 7503F880 A5FCC18E .ẽ=É.«.u.Ù.¶.¨_^ùÉÉÙ.¶.¨¯^ùVW.Å. 000140
2314E857 5602EBC0 8ED08C57 5676EB00 0888F388 575604EB 232CE857 5602EBC0 âŠ.VWÒ,#Š.VW.µ¡..ŠvVW.Å.ãŠ.VWÒ.# 000160
0C88F388 575604EB 22FCE857 5602EBC0 8ED08C57 565EE800 0488F388 575604EB Š.VW.µ¡..Š^VW.Å.âŠ.VWÒ="Š.VW.µ¡. 000180
8ED08C57 562EEB00 1488F388 575604EB 22E4E857 5602E8C0 8ED08C57 5646EB00 .ŠFVW.Å.âŠ.VWÒõ"Š.VW.µ¡..Š.VW.Å. 0001A0
2284E857 5602E8C0 8ED08C57 5616EB00 1088F388 575604EB 22CCE857 5602EBC0 âŠ.VWÒä"Š.VW.µ¡..Š.VW.Å.âŠ.VWÒÇ" 0001C0
0C268955 FC7D8710 7407FE7D 80C18ED9 8C02D03E 88D88800 0088F388 575604EB Š.VW.µ¡...Å.>Å..).ê.)±.t..)=U.&. 0001E0
```

Dump of file SATURN:[PCCOMMON.DUMP.DLL]UIW.TMP;1 on 18-APR-1990 10:53:22.77
File ID (940,4,0)   End of file block 88 / Allocated 88

Virtual block number 45 (0000002D), 512 (0200) bytes

```
C08ED08C 57560FEB 02D03E88 F78B228F E801528F 02C383CB 5E5F5000 8097FF01 ...¯.]_^ù.û.¢R.Ò¢".%.>Å.ŠÒVW.Å.â 000000
EB2268E8 575602EB C08ED08C 575676EB 000AB8F3 88575604 EB2283E8 575602EB Š.VWÒ."Š.VW.µ¡..ŠvVW.Å.ãŠ.VWÒk"Š 000020
000EB8F3 88575604 EB2253E8 575602EB C08ED08C 57565EEB 0006B8F3 88575604 .VW.µ¡..Š^VW.Å.âŠ.VWÒS"Š.VW.µ¡.. 000040
C08ED08C 57562EEB 0016B8F3 88575604 EB223BE8 575602EB C08ED08C 575646EB ŠFVW.Å.ãŠ.VWÒ;"Š.VW.µ¡..Š.VW.Å.â 000060
EB2208E8 575602EB C08ED08C 575616EB 001288F3 88575604 EB2223E8 575602EB Š.VWÒ#"Š.VW.µ¡..Š.VW.Å.âŠ.VWÒ."Š 000080
FF39E95E 2206E856 057407FE 7D80C18E D98C02D0 3E88D888 000288F3 88575604 .VW.µ¡...Ä.>Å..).ê.)±.t.VÒ."^Õ9. 0000A0
1C8808EB 00008B00 E80014B8 12E80010 8817EB00 0C881CEB 00088821 E80004B8 £..Š!£..Š.£..Š.£..Š.£..Š.£..Š.£. 0000C0
8C02D03E 890CEF83 287407F2 7D803974 07FE7D80 02D03E88 57560018 8803EB00 .Š.£..VW.>Å..)±.t9.)·.t+.ÿ..>Å.. 0000E0
5D008097 FF010C26 89553E73 18F8832F 731CF883 087D88FC 7D89FC75 88C08ED8 Ä.â.u=.)=.)..«.s/.«.s>U.&....¯.] 000100
BFE821B4 E802D03E 890CEF83 C47407F2 7D8002C3 83CDEB21 99E802C3 83CB5E5F _^ù.û.Ò.!Šë.û..)·.tá.ÿ..>Å.Ò.!Š¢ 000120
97FF010C 2689550C 02D02E83 CB5E5F50 00AC97FF 010C2689 550C02D0 2E83F787 ¯%..Å..U.&....¯.]_^ù..Å..U.&.... 000140
8803E8FF 32DF02E7 D0F88AE3 D0E3D0C8 9E5E5FE0 0AE4D0E8 D1410025 9F5000B0 ¯.].%.AîÒÅõ.Å_^.ùÃDÅD.«ÅÓ.Õ2.Š.E 000160
47471D88 FE448905 87AD0005 89F82BFE 884E4E02 D0368BFC C08ED88C 5756000C ..VW.Ä.â=.6Å.ÑN.±+«¿..Ù...D±..GG 000180
EC8855C8 5DE5885E 5F2108E8 037407FE 7D8002D0 3E885756 EC8855CB 5E5FF4E2 ã¶_^ùU.šVW.>Å..)±.t.Ò.!_^.|]ùU.š 0001A0
E5885E5F 8006F336 80000BE8 80805756 EC8855CB 5DE5885E 5F0018E8 C0325756 VWŽâÒ.._^.|)ùU.šVW¯.Ò..¯6µ.._^.| 0001C0
ECBE02D0 36FFFF44 3036FF45 30A536A5 36A536A5 3606ECBF 06768D07 1EFCCB5D )ù=...v¯¢š.6É6É6É6É0É.600..6Ï./š 0001E0
```

```
Dump of file SATURN:[PCCOMMON.DUMP.DLL]UIW.TMP;1 on 18-APR-1990 10:53:22.77
File ID (940,4,0)   End of file block 88 / Allocated 88

Virtual block number 46 (0000002E), 512 (0200) bytes

BEC08ED8 8E581089 E81E0716 067E8D55 501B7980 0744F60F 3AE85502 D0368906 ..6Å.UÒ:.-D..y.]U.~....Ò¿.X.Ä.ã/ 000000
478A2608 5EC45657 000008C8 00C30ABC 9602D006 8F5D13F7 E800CEBF 067406EC š.t.«ö.Ò%.]..Å...Öü.à...WVá^.&.G 000020
26F84689 163605E0 D1C103E0 D1C88BF9 F7000C89 990A422D C38BFA46 89E42A0B .*ð.F*.ù-B..¿..%*.àiÁ.èiÁ.6..F½& 000040
26085EC4 900128E9 FFFFB820 0A4F8026 085EC40F 74400A47 F6260774 830A47F6 -G..t.&-G.@t.á^.&.O. ¡..Ö+..á^.& 000060
C028EF0A 67802602 0A4F8026 90E2EB00 000447C7 26200A4F 80260E74 010A47F6 -G..t.&.O. &úG...Šã.&.O..&.g.ÿ+â 000080
87F606D8 68F9F700 0C89990A 422DC388 4C750C0A 47F626FC 7689F08B 04478926 &.G..Þ.v=&-G..uL.ù-B..¿..%*kÄ.-. 0000A0
75FFFF0A 7E811675 0A5A087E 810E7409 900A7E81 07750A4E 087E8137 75011636 6..u7.~.N.u..~...t..~.Z.u..~...u 0000C0
26085EC4 04C48322 29E80876 FF0A76FF 0C75C008 02C4830A 102F5C9A FA76FF0F ..v*.\/...á..âu..v..v.Ò)".á.á^.& 0000E0
8826085E 88677401 163687F6 06D868F9 F7000C89 990A422D C38B1575 080A47F6 -G..u..û-B..¿..%*kÄ.-.6..tg.^.&. 000100
04478926 4802458B F87E8B02 57892607 89264008 57882606 47882606 77282637 7&+w.&.G.&.W.@&..&.W..-½.E.H&.G. 000120
FF87F6FA 5E8B19E8 FC468908 C4830A2E 2CAA9AFA 76FF0677 FF265256 167EF60B .--.VR&.w..v*.´,....á..F=Š..^*-.. 000140
07882606 468A065F C426085E C408C483 0A512C6C 9A53006A 006A026A 0F742006 . t.j.j.j.S.l,Q..á.á^.&á_..F.&.. 000160
CCE90374 FC7639FC 468908C4 8305712C AA9AFA76 FF501606 46805600 018E17E8 Š./..V.F..P.v*.´,g..á..F=9v=t.Õä 000180
8B1ED01E 8C1ECEA3 1ED48809 A730B09A 000A88EC 8855CBC9 5F5EE42A 06468AFE ±.F.*ð^_èÜU.š¡... ÖÏ.¡â.Èö...Å.. 0001A0
C700001E CA06C71E A616891E A4A30856 8B06468B 1EC01689 1EBEA310 56880E46 F..V.È/¯...â..F..V.ÈÈ...Ì.ú.ò...ú 0001C0
A31EAAA3 1EAEA3C0 2B00011E CC06C703 08E90374 25F67E80 038DE900 001EC806 .à...Õ...~-%t.Õ..ú.ä...+âÈÜ.È¯.È 0001E0

Dump of file SATURN:[PCCOMMON.DUMP.DLL]UIW.TMP;1 on 18-APR-1990 10:53:22.77
File ID (940,4,0)   End of file block 88 / Allocated 88

Virtual block number 47 (0000002F), 512 (0200) bytes

7F80260A 5EC40020 203406C7 1EBCA31E A2A31EA8 A31EC2A3 1EC4A31E ACA31EC6 6.È¯.Èá.Èö.È´.ÈÄ.È¥.ú.4  .á^.&.. 000000
C206C71E AE06FF0D 752B3F80 260A5E8B 903EEB00 30203406 C70A46FF 49753001 .0uI.F.ú.4 0.Š>..^.&.?+u...Û.ú.ò 000020
0DEB1EA2 06FF9014 EB1EC206 FF1A7500 1EAE3E83 0E75203F 8026902B EB00001E ...Š(.&.? u..>Ù..u...ò.Š....Å.Š. 000040
0802C483 097BE80E 5098078A 260A5E8B 0A46FF1E BC06FFC7 75203F80 260A5EC4 á^.&.?-uú..¥..F..^.&...P.Òx..á.. 000060
7D001ED2 3E830C56 890A4689 08C48308 C7E80E1E D2681E0A 76FF0C76 FFDD75C0 âuÏ.v..v..h@..Òú..á..F..V..>@..) 000080
20203406 C7067530 20343E83 0074001E BC3E831E D2A3D8F7 1ED2A11E BC06FF0C ...¥.À@.%ÄÈ@..>¥..t..>4 0u.ú.4   0000A0
08C48308 7BE80E1E CC681E0A 76FF060A 46FF1EC4 06FF2D75 2E3F8026 0A5EC400 .á^.&.?.u-..á..F...v..hä..Ò(..á. 0000C0
46309807 8A260A5E C41EC40E FF00011E CC06C70A 7D001ECC 3E830C56 890A4689 .F..V..>ä..).ú.ä.....á.á^.&...=F 0000E0
C4097500 1EAC3E83 00021EAC 06C70675 006C302B 7400683D 4074004E 303D7400 .t==N.t@=h.t+=l.u.ú.¯....>¯..u.á 000100
D8EB0001 1EAC06C7 90024EE9 1C75003F 80260A5E C40A46FF 03754C3F 80260A5E ^.&.?Lu..F.á^.&.?.u.ÕN..ú.¯...ŠÄ 000120
7400473D 0A740045 3DF84689 98078A26 C8EB0008 1EAC06C7 D0EB0010 1EAC06C7 ú.¯...ŠÀú.¯...Šà&....F½=E.t.=G.t 000140
03750063 3D0191E9 037E7874 00693DF8 468820F8 46831EAA 06FF0875 00583D05 .=X.u...´..F½ .F½=i.tx~.Õ..=c.u. 000160
261EBE1E C4157502 1EAC3E83 900159E9 0140E903 7500253D 0152E903 7E013FE9 Õ?.~.ÕR.=%.u.Õ@.ÕY...>¯..u.á./.& 000180
BE068307 89261EC8 A11FC426 1EBE1EC4 0DEB0000 0247C726 0789261E C8A11FC4 á.Àà.&..&úG...Š.á./.&á.Àà.&..../ 0001A0
75200A47 F6261EA4 1EC401B0 E9037400 1EC83E83 0170E903 75001ECA 3E83041E ...>ò..u.Õp..>à...t.Õ§.á.È.&-G. u 0001C0
90C3EB02 C483019E E80E0A6A 00001EA2 06C71EC6 06FF01AC E9FFFFB8 01AFE903 .ÕÈ.¡..Õ¯...ó.ú.Å...j..Ò...á.Šù. 0001E0

Dump of file SATURN:[PCCOMMON.DUMP.DLL]UIW.TMP;1 on 18-APR-1990 10:53:22.77
File ID (940,4,0)   End of file block 88 / Allocated 88

Virtual block number 48 (00000030), 512 (0200) bytes

0081E903 75081EAC 3E830004 1ECC06C7 1EC406FF 1EAA06FF 1EA806FF F2EB086A j.Š...´...´...á.ú.ä....>¯..u.Õ.. 000000
001EBC3E 83FA4689 1ED2A128 741ED206 39FA4689 1EACA3C0 2B7A7401 1EAC3E83 .>¯..tz+âÈ¯..F*9.@.t(À@..F*.>¥.. 000020
BE06831E D2A3C028 027DC00B 1ED2A105 1ED22E83 909013EB 00001ED2 06C70A74 t.ú.@...Š.....@..À@..à).+âÈ@.../ 000040
74001E8C 3E832274 00FA7E83 02C48304 8DE80E3A 6A02C483 0130E80E 106A021E ..j..Ò0..á.j:.Ò...á..-*.t".>¥..t 000060
1EBE2E83 00001ED2 06C79007 EB1ED2A3 C02B027D C0081ED2 A300052D FA468815 ..F*-..È@..à).+âÈ@.Š..ú.@...../. 000080
39E9026E E80E006A 90FF3FE9 106AFF10 E9021EBE 068302C4 8300F1E8 0E106A04 .j..Òp..á.../..Õ..j.Õ?..j..Òn.Õ9 0000A0
E9037500 643090FF 21E90428 E80E256A FF2AE903 49E80EF8 76FFF4E8 016A90FF ..j.Š¶.v½.Òl.Õ*.j%.Ò(.ÕI..=d.u.Õ 0000C0
880A4688 0A4EFF0C 56880A46 88097400 1EAC3E83 DA7E0067 3D057C00 6530FF0C ..=e.|.=g.~Õ.>¯..t..F..V..N..F.. 0000E0
75007030 FEE4E903 75006F30 FE80E903 75006E30 903AEBFE 5689FC46 89400C56 V.@.F=.V±Š:.=n.u.Õ.±=o.u.ÕÕ±=p.u 000100
EB0A46FF 90B1EBFF 79E90375 007830FE B9E90375 0075308F 74007330 FEE0E903 .ÕÄ±=s.t.=u.u.Õ¿±=x.u.Õy.Š¥..F.Š 000120
FF0C76FF 500A4628 C388EC75 253C0474 C00AF646 88078A26 FC5EC4FC 46FF9034 4..F=á^=&...F-.ät.<%uŠ.ù+F.P.v.. 000140
C00AF646 88078A26 0A5EC40C 56890A46 89FE568B FC468806 C483044C E80E0A76 v..ÒL..á..F=.V±.F..V.á^.&...F-.ä 000160
3E835657 000012C8 CBC91EC8 A1FE51E9 0374200A 47F6261E A41EC4FC 63E90374 t.Õc=á.È.&-G. t.ÕQ±Àà.èüà...WV.> 000180
1EAC3E83 0774021E AC3E831E C606FF04 740A067E 83002020 3406C706 74001EC4 á..t.ú.4  ..~..t...ó..>¯... .>¯. 0001A0
1EC63E83 902CEB04 1EBE0683 FE5689FC 46890257 88260788 261EBE1E C4197510 .u.á./.&..&.W..F=.V±../..Š,..-ó. 0001C0
89FC4689 99078826 1EBE1EC4 0EEB0000 FE46C7FC 46890788 261EBE1E C4117400 .t.á./.&...F=úF±..Š.á./.&....F=. 0001E0
```

```
Dump of file SATURN:[PCCOMMON.DUMP.DLL]UIW.TMP;1 on 18-APR-1990 10:53:22.77
File ID (940,4,0)   End of file block 88 / Allocated 88

Virtual block number 49 (00000031), 512 (0200) bytes

 32A3C02B 9003EB06 46880674 FE460BFC 46880E74 001EA23E 83021EBE 0683FE56 V±../...>Å..t..F•.F±t..F.Š..+åÈ2 000000
 750A067E 83287D00 FE7E8331 75001EC6 3E83F456 89F24689 1ED0168B 1ECEA120  Åö...Å..F·.V¶.>6..u1.-±.)+.-..u 000020
 46C7FE56 89FC4689 DAF700D2 83D8F7FE 5688FC46 882D07C6 26F246FF F25EC41D .6^·.F·&6.-.F•.V±¼Å.@.½Ö.F•.V±úF 000040
 9AFC76FF FE76FF50 1E0676FF FA5E8CF8 46891EB0 B80000F6 46C79006 EB0001F6 -..Š..úF-..¡¯..F½.^*.v..P.v±.v•. 000060
 1ECC0E8B 04C4830A 73008C9A F876FFFA 76FF4574 001EC43E 830AC483 0F572F52 R/W..6..>6..tE.v*.v½...s..6...ä. 000080
 C62605EB F27EC4F0 4E880000 203206C7 06750820 323E8300 7EC908F0 4E89C82B +à.NÞ.è-..>2 .u.ú.2 ...NÞ6-·Š.&6 0000A0
 F85EC4F2 76C5EE5E 8C1EAA0E 88F04EB9 F4468CF2 7E89F47F C00B49C1 88473005 .OG.ël.â.¶.-·.F¶.NÞ..¯..^Ÿév·6^½ 0000C0
 F45E8CF2 7689E375 003F8026 F846FF46 202C8003 7C613C07 74C90804 88078A26 &.....èt.<a|.., F.F½&.?.uÐ.v·.^¶ 0000E0
 C02B02EB 0001B805 7500F67E 8308741E C206081E AEA11475 001EC63E 83EE5E8E .^Ÿ.>6..u.ÀÜ...ô.t..—.u.¡..Š.+â 000100
 16881EBE A10001BE 18740006 7E835657 000010C8 CBC95F5E 02C48302 FFE80E50 P.Ò...6.^_èùà...WV.-..t./..Àf... 000120
 8B26078B 261EBE1E C4137408 1EAC3E83 008FE902 1EBE0683 FA5689F8 46891EC0 â..F½.V*.¯/..Õ...>¯..t.6./.&..&. 000140
 83041EBE 0683FA5E 8CF84689 FC468907 8B261EBE 1EC410EB FA5689F8 46890257 W..F½.V*Š.6./.&...F•.F½.^*../... 000160
 F8468900 DD880975 00FC7E83 900AEB00 D6881575 FA460BF8 46880E74 081EAC3E >¯..t..F½.F*u.¡@.Š...-•.u.¡Ï..F½ 000180
 5EC4900E EB1ECC0E 881C741E C43639F6 28F45689 F24689FA 5688F846 8BFA5E8C .^*.F½.V*.F·.V¶+-96á.t...ä.Š..6^ 0001A0
 8BF37500 3F8026F2 46FFF25E C44690ED EB107ECE 3B461574 003F8026 F246FFF2 ·.F·&.?.t.F;ö-.ŠÜ.F6^·.F·&.?.uµ. 0001C0
 830183E8 0EF876FF FA76FF56 02C48301 59E80E57 0875001E BC3E83FE 2B1ED23E >@.+±.>¥..u.W.ÒY..á.V.v*.v½.Ò°.. 0001E0

Dump of file SATURN:[PCCOMMON.DUMP.DLL]UIW.TMP;1 on 18-APR-1990 10:53:22.77
File ID (940,4,0)   End of file block 88 / Allocated 88

Virtual block number 50 (00000032), 512 (0200) bytes

 C01688 1E BEA10000 06C890CB C95F5E02 C483013C E80E5708 74001EBC 3E8306C4 6..>¥..t.W.Ò<..6.^_èù.à...Àf...â 000000
 C43E83FA 4688C02A 9003EB01 B0057547 067E8306 7467067E 83FE5689 FC46891E ..F•.V±.-.gt..-.Gu.¯.Š..*â.F*.>6 000020
 AA36FF00 011ECC06 C7067500 1ECC3E83 007400FA 7E800006 1ECC06C7 0675001E ..u.ú.ä....-*.t..>ä..u.ú.ä....6` 000040
 8300EA1E FF261D40 068EFC76 FFFE76FF 1ECE36FF 1ED036FF 0676FF1E CC36FF1E ..6ä..v..6Å..6ö..v±.v•..ə.&..ō.. 000060
 00EE1EFF 261D4006 8E1ECE36 FF1ED036 FF147500 1EA23E83 1B7400FA 7E800EC4 6..-*.t..>Å..u..6Å..6ö...ə ȶ..Ÿ. 000080
 1EFF261D 40068E1E CE36FF1E D036FF14 75001ECC 3E831874 001EA23E 8304C483 .6..>Å..t..>ä..u..6Å..6ö... .&.. 0000A0
 8EFC76FF FE76FF1B 741EC206 0B1EAEA1 00002032 06C7081E 8E068304 C48300F6 -..6.../..ú.2 ..ÀÜ...ō.t..v±.v•. 0000C0
 00C890CB C90129E8 0E50C02B 02EB0001 B80574C0 0804C483 00FA1EFF 261D4006 .ə.&..*..6..ât.|..Š.+äP.Ò).èù.à. 0000E0
 478E2607 FF26378B 2606468A 1478044F FF261EA4 1EC43C75 001ECA3E 83560000 ..V.>ò..u<6.Ê.&.O.x..F.&.7&..&.G 000100
 EB1ECA06 FF077540 06C48312 2F08F49A 0676FF53 1EA636FF 10EBE42A 04882602 .&..*6Š..6Ï.S.v..¶./..6.əu...ò.Š 000120
 1BEB507E F60B0676 8B577500 1ECA3E83 56570000 02C890CB C95E1EC8 06FF9005 ....à.^èù.à...WV.>ò..uW.v..--PŠ. 000140
 C0084EC6 8B1ECA06 FF047540 06C48312 9708F49A 203436FF 1EA436FF 1EA636FF .6Ï..6Ê..64 .¶....6.əu...ò..6N.â 000160
 D4E8E42A 05882602 478E2607 FF263F8B 262034A0 D478044F FF261EA4 1EC41E7E ~.6.Ê.&.O.xå.4 &.?&..&.G.&..*6Šå 000180
 001ECA3E 830A768B 56570000 02C8CBC9 5F5E1EC8 06010646 8B077500 1ECA3E83 .>ò..u..F...à.^ èùà...WV.v..>ò.. 0001A0
 FF047540 06C48313 0908F49A 5098078A 26065EC4 1EA436FF 1EA636FF 22EB5E75 u^Š".6Ï..6Ê.6^.Ē...P.¶....6.əu.. 0001C0
 A41EC407 8A26065E C4CD7804 4FFF261E A41EC425 74C00B4E C68B0646 FF1ECA06 .ò..F..6N.ât%á.Ê.&.O.xëá^.&..6.Ê 0001E0

Dump of file SATURN:[PCCOMMON.DUMP.DLL]UIW.TMP;1 on 18-APR-1990 10:53:22.77
File ID (940,4,0)   End of file block 88 / Allocated 88

Virtual block number 51 (00000033), 512 (0200) bytes

 1EC80601 0A468B07 75001ECA 3E83CAEB E42A0588 2602478E 2607FF26 3F8B261E .&.?&..&.G.&..*6Šò.>ò..u..F...à. 000000
 3688FA46 89FC4689 C02BF656 89F44689 1ED0168B 1ECEA156 00000CC8 CBC95F5E ^_èùà...VÀö...Å..F¶.V-+â.F•.F*.6 000020
 02EE8305 75102032 3E830676 2BF02BF8 468904C4 830F4200 8C9AF476 FF521ED2 @¯R.v¶...B..6..F½+Þ+v..>2 .u..Ÿ. 000040
 75302034 3E831975 2D3F8026 F45EC422 75001E8C 3E834E01 75082032 3E8308EB Š..>2 .u.N.>¥..u"6^¶&.?-u..>4 0u 000060
 3E83077E F60B0874 3020343E 83F84EFF 02C483FE 71E80E50 98078A26 F446FF12 ..F¶&...P.Òq±.6..N½.>4 0t..--..> 000080
 0070E80E FC46FF07 74002032 3E830066 E80EFA46 FF077400 067E8318 74001E8C ¥..t..~..t..F*.Òf..>2 .t..F•.Òp. 0000A0
 830039E8 0E047500 FA7E830A 7400067E 8302C483 FE7EE80E 56297500 1EBC3E83 .>¥..u)V.Ò-±.6..-..t..-*.u..Ò9.. 0000C0
 06C483FE B5E80EF4 76FFF676 FFF876FF 0040E80E 047500FC 7E830A74 0020323E >2 .t..-•.u..Òə..v½.v-.v¶.Òç±.6. 0000E0
 B8057400 1EAE3E83 CBC95E02 C483FE38 E80E5600 20203406 C70E7400 1EBC3E83 .>¥..t.ú.4  .V.Ò8±.6.^èù.>Û..t.¡ 000100
 17751020 323E8302 C483FDC8 E80E306A CB02C483 FDD2E80E 5000208B 03EB002B +.Š.¡ .P.Ò@».6.ùj0.Òà».6..>2 .u. 000120
 46C75657 000006C8 CB02C483 FDAAE80E 50007888 03EB0058 B8057400 1EAA3E83 .>¯..t.¡X.Š.¡x.P.Ò¯».6.ùà...WVúF 000140
 5EC49060 EB0A46FF 021EBE06 83378B26 1EBE1EC4 12752A3F 80260A5E C40001FE ±..á^.&.?*u.á./.&.7../...F.Š`.6^ 000160
 393C3F7C 303CFA46 88078A26 0A5E88F6 2B0A46FF FFFFFE46 C708752D 3F80260A .&.?·u.úF±...F.+-.^.&...F*<0|?<9 000180
 98058A26 1B7F393D 802606EB FB880030 203406C7 0675303C 0A751EC4 3639387F .;96á.u.<0u.ú.4 0..«Š.&.=9..&... 0001A0
 FE46880C 468C0A7E 89DF7D30 3D802647 F18B30E9 83C803E1 D1CE0302 E1C1CE8B .öeÃ..öiÃ.à.Õ0.þG&.=0)Ò.-..F..F± 0001C0
 8CFC4689 00E48857 000004C8 CBC95F5E 0C5688 0A 46883789 26065EC4 F08BEEF7 %Ÿ.Þá^.&.7.F..V.^_èùà...W¡ð..F•. 0001E0
```

Dump of file SATURN:[PCCOMMON.DUMP.DLL]UIW.TMP;1 on 18-APR-1990 10:53:22.77
File ID (940,4,0) End of file block 88 / Allocated 88

Virtual block number 52 (00000034), 512 (0200) bytes

```
EBFE468C FC7E8900 01B8F475 00382611 74003D80 264701EB FC7EC406 4E8AFE5E ^±.N.á~•Š.G&.=.t.&8.u¶¡...~•.F±Š 000000
83B03330 010806C7 1CEB84B0 34300108 06C790CB C95FC02B FE468CFC 7E899009 ...-•.F±+á èù.ú...04¯.Š.ú...03¯. 000020
3C014E1E FF047400 01503E83 8AB03031 010806C7 08EB81B0 31300108 06C712EB Š.ú...01¯.Š.ú...10¯..>P..t...N.< 000040
9A5000FD B8153130 4A9A0104 BB11F328 529A010A A3E42A32 31010806 C706758C .u.ú...12*ðÈ...R+µ.E...J01.¡».P. 000060
88FC0200 3E88C315 4E2AF89A 010A36FF 15422BAC 9A50FFE4 05010AA1 15392BAC ¯+9.À...ð.P.¯+B..6...½*N.ú.>Å.•. 000080
E6800801 D9D1FAD1 D8D1D9D1 FAD1D8D1 D9D1FAD1 29747F80 C2F7C033 02548BDC ..T.3à¼ö..t)î•îlÌÀî•îlÌÀî•îlÌÄ.l 0000A0
FC02D03E 8BEAE8D0 8AC888C3 F7880655 89044D89 02458900 0005C738 00C2818F ..ô.8ú....E..M..U..¼ü.à.ÅSõ.>Å.• 0000C0
0374CD0A D3D1E2D1 D3D1E2D1 D3D1E2D1 F88AADDC 8AF08AAD D48AC80A ADC88BAD Ü.àÜ.à.åÜ.Þ.ÉÜ.½îãîÆîãîÆîãîÆ.ët. 0000E0
D13AE0D1 E0D1E0D1 38723800 2D3D7747 E03D7FF0 25E922EC 8AF90A80 8101CA80 .ò.Ÿ..•.š"Ô%Þ.=ÁGw=-.8r;ÌÀîÀîÀ:î 000100
7FE78016 74C00817 747F803D 00800508 73000383 01C68010 7401C6F6 15720777 w.r.-ó.t..ó..Æ.s....=..t..åt..Ó. 000120
880233C3 F7880245 890589C0 33FED8E9 C3F78B05 89C68AE3 8A024589 E50AC70A .ú.Ì.E..D.ó...¼ûÖÜ±3ã...E..¼û3Ø. 000140
F7D8F707 79C008C3 88D088DA 8811E8DA F7157902 08D833D0 881DE8C3 88D088DA Ö.Å.ûŠ..Å3Ü.Øy.¼ÖŠ..Ö.Å.ú.ây.¼Ü¼ 000160
F71579C9 08D833C8 8810E8C3 88C888DA 88D23304 74E99EB4 8024C48A 00D883DA Ö.Ü..á$.Ç.Õt.3Ø.Ö.à.ûŠ..à3Ü.èy.¼ 000180
E98560BD D233FF33 8024C48A 00D88309 F7D8F707 79C008C3 88C888DA 8811E8D9 1Š..Ö.à.ú.ây.¼Ü¼).Ü..á$.³ 3Ø§'.Ö 0001A0
9CE8C3C8 D1677500 D283C0D1 0026E803 E80035E8 08EB0028 E80DE800 3AE807B5 ç.Ò:.Š.Ò+.Š.ÒS.Š.Ò&.îâ.Ø.ι îàûÒ. 0001C0
E808EB00 2CE800E8 002CE8C3 4E75D208 0039E803 EB005DE8 08EB003E E80DE800 .Š.Ò>.Š.Ò].Š.Ò9..ØuNûÒ,.Š.O,.Š.Ò 0001E0
```

Dump of file SATURN:[PCCOMMON.DUMP.DLL]UIW.TMP;1 on 18-APR-1990 10:53:22.77
File ID (940,4,0) End of file block 88 / Allocated 88

Virtual block number 53 (00000035), 512 (0200) bytes

```
75000183 C2010001 83000283 F5D8F7D2 F7D1F700 79FF08C9 330041E8 03E8007B {.Š.ÒA.3è..y.¼ì¼Ø¼Å¼.Ø..î.îô.î.u 000000
72000283 C3130813 F581F980 CD0AE822 01B50833 001CE803 E80056E8 C3CAD121 ¦îòûÒV.Š.Ò..3Üç."Ò.ë.•.¼.Ü.ū.Ø.r 000020
E58010CE 80F1220F B6F98808 EE8391AD 91AD93AD D60A92AD 00A4E9FD E9E9C301 .ûÕÕ»ÕÉ.Ù..øÜ.Ù.Ù..Ÿ..•Ñ."þ.ö..î 000040
8AD2332F E825E983 CA7F20F9 83787203 FEE981D8 74C908E9 D1E9D1E9 D1E9017F .îÕîÕîÕîÕ.ètÁ.Õ±.rx.• .ò.Õ%Š/3Ø. 000060
804D74C9 080CD0F9 D1D0E4D0 7FE183F9 8BE98A04 EE83C186 ACC88AAD F88AACDA Õ¯.½Ü.à¯.ê.Ÿ..Õ.•.Ã.ÅÕÅî•ÅÉ.ètM. 000080
DF8AD30A 01E28002 D0F501FA 801A7C08 F98009F7 20E98399 7F20F983 47727EE9 Õ–rG.• ...Õ ¼).•.|..•.¼ÅØ.ã..Æ.Ô 0000A0
800AD008 D1D8D1EE D000DA80 01B201FA 8015E3E1 E808E980 F632E68A C48AF88A .½.á.12–.Õ.ŠÃD..•.ý..Ö.ÅŸîÅîÜÅÖ. 0000C0
31E807B0 0068E8FD 35E9C3D0 88C03300 D18000B1 F9C3C388 D08BCA8A F3E200D2 Ø.ãµ.ò.Å.ûü•Ÿ..î.3ã.ÅûÕ5»Òh.¯.Ò1 0000E0
E8FD0FE9 C3FE8806 7C89E073 7FF0FA81 7FE68007 8810EF83 067C0302 D0368B01 ..6Å..|..ÿ..■.î..•Þ.sÅ.|..±ûÕ.»Ò 000100
027C89DF 737F80FA 817FE680 07880080 EF81027C 03020036 88010BE8 03800087 ..¯.Ò...6Å..|..ÿ...■.î..•..sÕ.|. 000120
7C010080 EF810200 36880053 E8C3FE8B 067C0110 EF8302D0 3688001E E8C3FE8B .±ûÕ...6Å..ÿ..|..±ûÕS..6Å..ÿ...| 000140
88064C88 00108A02 D03688C0 8EA5A5A5 A5C18ED9 8CC08C02 D03E88FC C3FE8802 ..±û•.>Å..ã.ì.éEEEE.ê.6Å.¤...L.. 000160
0433E981 E9D1E9D1 E9D1E9D1 0035887F E580CF88 F0E78306 4C89CA0A 0FE183F9 •.Å..ò.L..Óp.ü.î.¦5.îÕîÕîÕîÕ.Õ3. 000180
8800808A 02D03688 C08EA5A5 C18ED98C C08C0200 3E88FC00 82E93FEB D9F7047D ).¼)Š7Õ..•.>Å..â.).éEE.â.6Å.¤... 0001A0
96E981ED 32CD8AE1 D10018B8 7FE580CF 8880E783 024C89CA 0A7FE183 F988024C L..•.Å..ò.L..Ó..ü.î.|..îÅ.ë2Ü.Õ. 0001C0
33EA2880 00E581EF 88C888DA 74C838FA 088000E7 81147CEF 88C83BD9 F7487D00 .)H¼);à.ÿ|..Ó...•;ât..à.ÿ.î..+õ3 0001E0
```

Dump of file SATURN:[PCCOMMON.DUMP.DLL]UIW.TMP;1 on 18-APR-1990 10:53:22.77
File ID (940,4,0) End of file block 88 / Allocated 88

Virtual block number 54 (00000036), 512 (0200) bytes

```
0EB80CE3 348AE7EB 4608E980 0004C614 0A000280 00B2F501 FA80147C 08F98002 Ø.•.|..•.¼ý..Ø...ó...Õ.FŠÓ.4D.£. 000000
E2D7D0EA D106E3E1 8AEF8A00 01B8C334 8AD188C9 33C32C88 E822EE8A D7C18A01 ..ê■.Ÿ"Ò.,û3è.î.4ûE...ÿ.ÃD.îõÅ■ã 000020
CE28C803 9802D00E 88E2D3CC 8AFD8802 74000A80 01B281FA 80D30ADE 22D70AFA •.■"ß.Æ.•.ý..Õ.t..».ãÆâ..Å...à+ö 000040
C3E4D07F CC80F8C8 E9C3F5D3 D14C747F 80C3F7C3 FAE20014 804606E3 3488F202 .·.4D.F...ã•ü¼û..tLîÆ¼ûÕà«.ä.Åõû 000060
8AD874D3 F77F80C3 F7D3F7E2 74D0F77F 80A9D0F7 E1747F80 A9025D88 2602448B .D.&.].`..tÃ¼Å`..¼ÅtãÆ¼Æ¼û..¼ÆtÄ. 000080
C3053826 048B0575 C33BDA8E C18ED98C C28CF787 930B73E0 D1E3D1D5 78EF32EC Š2ÿx(îDîÅs...¼.ô.).ê.Ö;ûu...&;.û 0000A0
F7E1747F F0A9065D 8B260644 8BC3E4D0 7FCC80FB 75E9C3F5 D3D15E74 7FF0C3F7 ¼ûÞ.t^îÆ¼ûÕu«.ä.ÅõÜ.D.&.].`Þ.tÃ¼ 0000C0
87930B73 E0D1E3D1 D578EF32 EC8AD874 D3F77FF0 C3F7D3F7 E274D0F7 7FF0A9D0 Å`Þ.¼ÅtãÆ¼Æ¼ûÞ.¼ÆtÄ.Š2ÿx(îDîÅs... 0000E0
8B057502 453B2602 448B0E75 04453B26 04448B17 75C33BDA 8EC18ED9 8CC28CF7 ¼.ô.).ê.Ö;ûu..D.&;E.u..D.&;E.u.. 000100
8B024C8B 80CF8000 82358A01 5D8B0245 8B03EB80 F4800245 8BF787C3 05382604 .&;.û.¼.E..¶.Š..E..]..5ý..ü..L.. 000120
87F38705 73EC3A58 74E40A65 74ED0AC0 D1C1D180 00CE81FF 00E78101 748BFF7C |..t..Ó...ö..îêîâ.Üte.ðt[:šs..µ. 000140
74020812 7C0EF980 55E30085 CD8A91D9 D0E800C9 D0497718 FC800CF6 E52A91FA •.•|-É.•.w[ÅèÅÔÅ)..ëç.DU.•.|..Øt 000160
8AF38AD6 8A01CE80 0374020A 287E05F9 803E741D 7210E980 DB330388 01C88003 ..û..Æ3Ü.Õ.r.t>.•.-+.Øt..ö..■.µ. 000180
F60097E9 E800C188 07880E88 19EBF875 C1FED301 E2D12374 177708E9 80FD8ADF Ô.».Õ.w.t#îãîÆ±èu½Š..ß.■.êÅÒÕ..– 0001A0
D150730E 13070314 70E00020 CA800374 3FC2F6FA E2DAD1EB D120CA80 03743FC2 õ?t..ò îŠîÕã•–õ?t..ò ÅÅp..■.ßsPî 0001C0
F6000383 F50AF7D3 F70A730E 88D788F3 1BFA28FA 41E94575 FFFC80C4 FEDAD1DB Üîõ±á.■.uEÕA•+•.µ.■.ßs.¼Æ¼Õ¼.Æ.– 0001E0
```

Dump of file SATURN:[PCCOMMON.DUMP.DLL]UIW.TMP;1 on 18-APR-1990 10:53:22.77
File ID (940,4,0)   End of file block 88 / Allocated 88

Virtual block number 55 (00000037), 512 (0200) bytes

```
32F28ADE 8AFB8A5B 7608EC80 0F75FF0A 6474D808 DA876A76 10EC8008 75D80800 Å.Ûu..š.vj.ō.Ûtd..u..š.v[.«.ß.·2 000000
14720777 80FA8001 7CE90374 0001163E 80F671D3 D1E2D14B 74CCFE0A 78FF0AD2 ø..x.±ätKĭäïÆq¬.>...t.Ō|..ª.w.r. 000020
80802417 747F80A9 D8D1E0D0 3A74FFFC 80C4FE07 73000383 01C6800F 7401C6F6 -ó.t..ó..Æ.s.±á.=.t:ÅÅïÅ¨..t.$.. 000040
C033017E E9037400 01163E80 C3F78805 89C68AE3 8A024589 02D03E88 C70A7FE7 Ó..ú.>Å..E..D.ó...¼û.>...t.Ō-.3ã 000060
4D8BD674 E40AD800 E0D19634 88ADFCF9 9DE9E679 C3F78805 89024589 02D03E88 .>Å..E....¼ûylŌ.ª•Ü.4.ïÅÅÅ.ōt•.M 000080
74FFFC80 80C48003 70E5027F ED8080EC 80C132D8 8B3D8BCB 74ED0AD9 D0E1D102 .ïÅÅ).Ûtù.=.Á2ê.š..Ú..lpÆ.á..■.t 0000A0
D283D803 E7F7C58B 509FC008 DA8BE7F7 C68BE888 80C98080 CB80EF8A FF3250CD ëP2..ÿ.Ù..è..Ŝ.6¼Ó.Ō.â.P.é¼Ó.Å.● 0000C0
0B78FF0A 58930388 C703E1F6 C58B01CB 8003749E 58FA13D8 03E6F7C1 8BFA8800 ..ª.ê¼l.Ã.ªX.t..ù..é–Ã.ú.Æ.X..x. 0000E0
448BD900 E1D1024D 8BF787FF 1AE9AD74 FFFC80C4 FEFF69E9 0A75E40A 03D1E2D1 ïäïÆ.ōu.Ōi.±á.=.tÛŌ...¼.M.ïÅÅ).D 000100
8080C480 FF7BE903 71E52A7F ED8081EC 80C132D8 74E40A5C 74ED0AD8 D0ED0102 .ïÅÅÅ.Ût\.ōtÜ2è.š..Ú.ªlq.Ō(..á.. 000120
01163E02 D901E801 08740001 163E8080 CF80C932 2D8A015D 8BFF78E9 0375FFFC ■.u.Ōx..]..-2è.ü..>...t.ïŜïl.>.. 000140
01CA8003 74D688C2 0B0011E8 EE88001A E8D8D1EA D180CE80 C032248A 01548850 P.T..$2â.ö.ïōïÅÒ...ŸÒ...ó.øt..ò. 000160
73D78BFA 18D8F7E1 F7C68BFA 8815E3C0 3396F3F7 1D73D33B F880E9FF 76E90088 .ïŌv.Ō¬½;Æs.¼µ.3âD..ª.6¼Å¼Å.ª.ms 000180
ED0A0118 2E8A0001 1606C6C3 ED73C188 D003C128 FFFF8EC3 F973D313 C1034E07 .N.ê.Æsªú/..+ê.Å.êsÚúó.........Ú 0001A0
4EE8D832 D2335253 50011902 D006C702 D036FF38 74E40A3C 77EC3A0E ED800774 t..Ú.:św<.ōt8.6Å.ú.Å...PSR3ø2ÜÒN 0001C0
D833C033 FE33E902 D0068F58 5B5AFE0F E8FF3252 5350011D 02D006C7 58585AFE ±Z[Xú.Å...PSR2.Ò.±Z[X..Å.Ō3±3ã3Ü 0001E0
```

Dump of file SATURN:[PCCOMMON.DUMP.DLL]UIW.TMP;1 on 18-APR-1990 10:53:22.77
File ID (940,4,0)   End of file block 88 / Allocated 88

Virtual block number 56 (00000038), 512 (0200) bytes

```
87D3E801 18A30119 A3C033FE 1AE85253 50011D02 D006C702 D036FF01 16A2D233 3øÅ...6Å.ú.Å...PSRÒ.±3âÈ..È..ŜÆ. 000000
D03688AB E60A80E6 807FE480 ADA5A5A5 02D03E88 F78B1DEB 8000F581 066D8BF7 ¼.m..¼..Ŝ..¼.>Å.ÈÈÈÙ.Ō..|..|¨.6Å 000020
870977E8 3BE0E583 D274FFE0 250AD0E0 D1DED0E5 D106448B FC066D8B C3FE8802 ..±û.m.=.D.ïÏÅßÏÅÅÖ%Å.tø.ÏÅ;Òw.. 000040
C0D1C0D1 C00157DD D1E2D0DD D1E60089 7706A03D D8F7C528 C274C00B D68695F7 ¼..ø.ätó+é¼Å=..w¿ÅlïïÅãïïWïâïâïâ 000060
020B187C 0EFF8363 74FF0B10 CC800FE4 80AD93AD 91AD92C0 32E08AAC F88BE086 .Å.½¯.Á2â.Ù.Ù.Ù.Ō..ä...tc...|..● 000080
80037402 0A2B7C06 FF832372 4874E777 10EF83C0 33D888C8 88D18801 C9800374 t..è..l.ù.Ä3â.ÿ.wÔtHr#...|+.●t.. 0000A0
D1D3D1D1 D1E2D123 740F7708 EF83E432 C48AF88A DF8AEB8A CD8AF18A D68A01CE ö..ø.þ.ë.Ŝ.Ō.½.á2ð.ÿ.w.t#ïäïïïÆï 0000C0
C2F6975E CF87F6E2 DAD1DFD1 D8D1E8D1 20CA8003 743FC2F6 CF8716E8 F57547D0 ÅGu%Ŝ..ü–ó7t..ò ïÒïÜïÒïÖã–.ü^.–ô 0000E0
0FFFE681 05748850 9F50035C 13014C13 34020800 E5D13870 E5D120CA 8003743F ?t..ò ïlp;ïïÅÅ.4.L..\.P.P.t..l.. 000100
E90375E0 FD8320C5 830AD1D9 01D8D1DF D1137420 00C7F7FE 13589E58 1000CE81 .ö..X.X.±¼ú. t.ïÔïÜïïïō.é .»Åu.Ō 000120
9E1000CE 810FFFE6 819F0574 88035C1B 014C1B34 2A00F608 D0E5D100 88E9F6EC š–Ō..ïïÅÅ–Å*4.L..\..t...l...ö... 000140
F61875FF 0B0004BE FCFE13DE 13CE13F5 DAF7D1F7 D3F7D7F7 D0F6F633 1373FE1B .±s.3––Å¼æ¼Æ¼ï¼Ö¼.ö.ß.±•/....u.– 000160
00ED8118 751FE0C7 F7E4E8D2 33CA88D9 8BFB8B3D 744E4076 0200ED81 1375E0C7 úÅu..Ú..v@Nt=.«.ì.ò3øŜÒ¼úÅ.u..Ú. 000180
717420ED 83127510 00C7F797 0082F28A CE8AE98A DD8AFB8A C78AE08A 97277601 .v'..Å.ú.«.ï.Ō.ö.·ý..¼ú..u..Ú tq 0001A0
F61F7207 7780FA80 0385E903 7400012E 3E80FC90 65E8E8E8 D7D1D301 D1D1E2D1 ïäïïïÆï•ŜŜŜe.•.>...t.Ō...ª.w.r.– 0001C0
F78B3074 E0FD8320 C5830874 2000C7F7 00078300 D3830001 8301C680 1A7401C6 ó.t..ó..ï..Æ..•.¼ú. t..é .»Åt0.¼ 0001E0
```

Dump of file SATURN:[PCCOMMON.DUMP.DLL]UIW.TMP;1 on 18-APR-1990 10:53:22.77
File ID (940,4,0)   End of file block 88 / Allocated 88

Virtual block number 57 (00000039), 512 (0200) bytes

```
AAC68A05 5D880645 89C70AC5 0BC032E0 862274ED D10FE780 8024DE87 02D03E88 .>Å..ß$..Ō.ïÛt".Å2â.é.ú.E..]..ó¨ 000000
3E8BC033 0377E903 7400012E 3E80FCF5 FDE90379 C3F78805 EF83ABC6 88ABC188 .ê¨.ó¨.ÿ..¼ûy.Ō»¼•.>...t.Ōw.3â.> 000020
747FF0E1 81D13306 4D8BD874 7FF025D0 88064488 FCC3FE88 ABABABAB F78B02D0 Å..¼¨¨¨¨.±û=.D..Å%Þ.tÜ.M.3ï.Ãþ.t 000040
0181E850 D801E6D0 8674FFE0 3D800005 BC70C103 7FE0E981 80002DE1 D1E0D1D0 ÅïÅïÅ-...ŌÅ..êp¥...=Å.tÑÅlïÄPÒ.. 000060
C58393EB 0A75ED0B D7D1D301 D1D1E2D1 0E751000 C7F7D800 E5D15001 CA800374 t..ò.]ïlÅÅ¼ú..u.ïäïïïÆï•.Úu.Ŝ..é 000080
25D03306 4488EF74 7FF0E181 D18B064D 88FCF787 F58CE9FF 24E98874 E0FD8320 .»Åt.Ō$.Ō.¼.¼=.M..ï.Åþ.tÿ.D.3Å% 0000A0
50D8D1E6 D09874FF E03D8000 059870C1 287FE0E9 8180202D E1D1E001 98747FF0 þ.t.ïÅïÅ- ..ŌÅ.+êp....=Å.t.ÅlïÄP 0000C0
800FE480 ADF0012C BF05C683 F78B5092 10CC800F E480AD92 AD93ADC9 32E88AAC ¯.Ō2èÙ.Ù.Ù.Ō..ä..P.¼.6.€,.»Ù.Ō.. 0000E0
2602E8D1 E888ADF7 88012CBF FD1F7400 012E3E80 0005C6FC A44746A5 A5AB10CC ä.¨ÈÈFGÈ•ó...>...t.»€,..¼Ù.ÒïÒ.& 000100
E857003F E8D9D108 D1D8D1EA D158FCAB D8D1ADA8 D8D1ADA8 D8D1ADED D1AB012E ..¨ïÙÙïÅ¨ÙïÅ¨ÙïÅ¨•XïōïÄïÙïlÒ7.WÒ 000120
80037407 C2F601CA 8003745F 5859D788 C208C108 C30B0033 E8570037 E8570038 ;.WÒ7.WÒ3..û.ê.ô.æY[ t..ò.–ô.t.. 000140
2C368BFF 08E9DAD1 D9D1D8D1 EFD1DAD1 D9D1D8D1 EFD1DAD1 D9D1D8D1 EFD108CA ò.ïÿïÙïlïÖïÿïÙïlïÖïÿÏÙïlïÖŌ...6, 000160
E7F70474 C00B0126 A1F58BED 339752F6 F73877F0 3B0475D2 085C73D6 3BFF3301 .3.;øs\.Øu.;Þw;¼–R.3Ú.¼Å&..ât.¼Ó 000180
5A920002 83E803E7 F70874C0 0B012AA1 EA13F003 E7F70674 C00B0128 A150F288 .·PÅ(..ât.¼Ó.Þ.õÅ*..ât.¼Ó.Ò.Ø..Z 0001A0
012C1613 012A0613 01281E13 01260E03 4F137393 919295E8 185DDD18 CE18DAF7 ¼Ō.ö.ï].Ò....s.O..&...(...*..... 0001C0
EBF50126 168BC213 012A1E13 01280E03 012A0618 01281E18 01260E28 4FC3ED73 sÚÙO+.&...(...*...(...*..ô..&.¼Ŝ 0001E0
```

Dump of file SATURN:[PCCOMMON.DUMP.DLL]UIW.TMP;1 on 18-APR-1990 10:53:22.77
File ID (940,4,0)   End of file block 88 / Allocated 88

Virtual block number 58 (0000003A), 512 (0200) bytes

```
                                                                         è.D.2ö$...È"..E.$...È$.3Ü.$..D.. 000000
911AE30C 8BE8BBDB 330124A3 100C0F24 06458A01 22A3100C 0F24E432 0644BAC9 ..D.%Ä.Ò.ò...U..Øt.%ã.à.ÒU3Ü.D.. 000020
0B02448B ED3355DA 13C803E2 F70674D2 0B02558B 0488CABB E88BE1F7 08E30D8B ät....Øt.%ã.à.Òi(X.èP.D..ät..U.. 000040
0B02558B 0D74C00B 02448B50 C10B58D5 D1DA13C8 03E2F708 74D20815 8B0E74C0 Øt.%ã.Á.õ3è...ät..U..Øt.%ã.Ä.õii 000060
D1D1EA13 D803E2F7 0874D20B 04558B0F 74C00B04 8BC933EA 13D803E2 F70674D2 .D..ät....Øt.%ã.Ä.õ.i.X.ÚP...ät. 000080
0874C00B 048B50C3 0B5800D1 83EA13D8 03E2F709 74D20815 8B0F74C0 0B04448B %&$..Ò.ò...ät.%&"..Ò.ò3Ü.D..ät.. 0000A0
8B0F74C0 0B02448B DB33CA13 E8030122 26F70874 C00B058B CA13E803 012426F7 U..Øt.%ã.Ò.òi#.D..ät..U..Øt.%ã.Ò 0000C0
E803E2F7 0974D20B 02558B10 74C00B04 448BD3D1 CA13E803 E2F70874 D20B0455 .ò.#.U3Ü.E..ät.%&"..à.Ö.D..ät.%& 0000E0
26F70874 C00B0244 8BDA13C8 03012226 F70874C0 0B02458B ED335500 D383CA13 $..à.Ö.D..ät..U..Øt.%ã.à.Òi(.D.% 000100
F704448B D5D1DA13 C803E2F7 0B74D20B 04558B1A 74C00B04 448BDA13 C8030124 &$..Ä.õ.E..ät.%&"..Ä.õ.".-&$..é. 000120
97C50301 2426F601 22A0EA13 D8030122 26F70874 C00B0445 8BEA13D8 03012426 Ziãiii#i#iãiii#i#iãiii#i#^.-üó.. 000140
2E06C6C3 F60B5ED7 D1D3D101 D1E2D1D7 D1D3D1D1 D1E2D1D7 D1D3D1D1 D1E2D15A ...6/..-t..Yà.;%wP.ÜtL.6Å.ú.Å.1. 000160
01310200 06C70200 36FF4C74 ED0B5077 F53B04C0 EE810874 F60B012F 36BB0001 PORSUW3Ü3è30Ö>■_][ZYXú.Å.9.PORSU 000180
55535251 50013902 D006C758 595A5B5D 5FFC3EE8 D233C933 DB335755 53525150 W3.Öi«_][ZYX..Ä.Õ.■3ä3è303Ü3U3.Å 0001A0
A2FF33ED 33DB33D2 33C933C0 33FC1AE9 0200068F 58595A5B 5D5FFBD1 E8FF3357 ...6Å.Ü.Å.9.PORSUWÖ⅓«€1.3ã     $6 0001C0
C6EBABAB ABABC033 0131BFFB F8E85755 53525150 01390200 06C70200 36FF012E U.$.$.WVá^.&....Ä-....t..^.&.... 0001E0
0598078A 26065E8B 0C740109 1587F608 8B98078A 26065EC4 565704EC 83EC8B55
```

Dump of file SATURN:[PCCOMMON.DUMP.DLL]UIW.TMP;1 on 18-APR-1990 10:53:22.77
File ID (940,4,0)   End of file block 88 / Allocated 88

Virtual block number 59 (0000003B), 512 (0200) bytes

```
                                                                          .$..^.&...=e.t..«G&....Ä-....u· 000000
F2750409 1587F608 8B98058A 2647FB8B 16740065 3D98078A 26065E8B 07E80020 .-..F.á^.&....Þ.F.&ó...^.&....½. 000020
8BF88B98 078A2606 5E8B2E07 C6260646 FFF08B98 078A2606 5EC40846 8C067E89 6&...¼.F..àuÖ.~■^_.[]ùU.$.$.WVó~ 000040
7EC45657 06EC83EC 8B55CB5D E58B5F5E FC7E89E9 75C00A06 46FFF78B 078826C6 .$..&.=.t.G&.=.u■.-..F..Ö.F.&.?. 000060
003F8026 0646FFDF 8B08468C 067E89F3 75003D80 26470774 2E3D8026 9008EB06 tg.~.$..&.=et.&.=Et.G&.=.uÜ.-..F 000080
468C067E 89ED7500 30802647 07744530 80260074 653D8026 900EEB06 7E8B6774 ..ú.ô.N..F■.V±.~.$..O&.=Ot'.-..F 0000A0
468C067E 89F97430 3080264F 9002EB06 7E8BFE56 89FC4689 064EFFC2 8CC78B08 ..O&.?.u..N..^'év■.F.á^.¯&...àu· 0000C0
F275C00A 078826AC 065EC406 46FFFC76 C5FA5E8C 064EFF03 752E3F80 260F8B08 .v■.^±.^'^_.[]ù.U.$..B....ô#á^.. 0000E0
9A065EC4 23C2031E 9A1D421E 80EC8B55 90CB5DE5 8B5F5EFA 5E8EFE5E 8CFC7689 ±.ú#...$#r¯.|..]ù+à]ùU.$.$.WV.-.. 000100
00067E83 565708EC 83EC8B55 CB5DC02B CB5D0001 B8057223 EB079E9A 23C702FE t$.v..v..8..$.ó.á^..«.Þ..ÖEEEE.^ 000120
5E1FA5A5 A5A5DA8E 1EF08BFB 8B085EC4 04C48324 0F2E389A 0C76FF0E 76FF2474 _.[]ù..v..v..8.)$.á..-½.Þ....ÖEE 000140
A5A5DA8E 1E0716F0 8BF87E8D 04C48324 292E389A 0C76FF0E 76FF90CB 5DE58B5F ĒE..^½...1$á^..q.É$^_.[]ù.U.$.$. 000160
0AEC83EC 8B5590CB 5DE58B5F 5E24A504 719A085E C4243103 1E9AF85E 8D1FA5A5 WV.>H..tGÀ6 ..8 .F½.V'á^½&.?-u.¡ 000180
B805752D 3F8326F8 5EC4FA56 89F84689 2038168B 2036A147 74000148 3E805657 ..$.+à.F..V..F■.V±.~..-.¡..$..+à 0001A0
C02B9003 EB0001B8 067E000E 7E83FE56 89FC4689 0C568B0A 4603C02B 02EB0001 P.v±.v■.Ò]..á.$Xá^.&.w.&.w.&.w.& 0001C0
260277FF 260477FF 260677FF 26065EC4 58EB06C4 83045DE8 0EFC76FF FE76FF50 .7.dOD$.á..F½.V'RP.F.@P.~..-.¡.. 0001E0
00018805 7E000E7E 8350400E 46885052 FA5689F8 468908C4 8324E330 649A37FF
```

Dump of file SATURN:[PCCOMMON.DUMP.DLL]UIW.TMP;1 on 18-APR-1990 10:53:22.77
File ID (940,4,0)   End of file block 88 / Allocated 88

Virtual block number 60 (0000003C), 512 (0200) bytes

```
                                                                         $.+àá^½.Y&.?-u.¡..$.+à.ú.F..V.RP 000000
50520C56 8B0A4603 C703C02B 02EB0001 B805752D 3F8326F8 8BF85EC4 C02B02EB ...=%.á..F..V..F■.V±á^½&.?-u.á^■ 000020
FC5EC40A 752D3F83 26F85EC4 FE5689FC 46890C56 8B0A4688 0AC48325 3D2E8E9A .F■&ó.-.~..~.á^■&.G.&...F■.^■&ó. 000040
07C626FC 5E8BFC46 FF078826 01478A26 FC5EC414 7E000E7E 832D07C6 26FC46FF .¡B..P.>H...à¼Ä.F..F■.V±RP.V.w&. 000060
83267700 569A5052 FE5688FC 46030E46 03D8F7C0 1B010148 3E80501E 0142B82E á..F■.V±.~..t.á^■&ó.E.F■á^½&ó_.& 000080
26065FC4 26F85EC4 FC46FF45 07C626FC 5EC40774 00107E83 FE5689FC 468908C4 .?0t^á^½&.G.H.Þ.-}.¼Ä.Þá^■&ó.¯.F 0000A0
46FF2007 C626FC5E C4F08BD8 F70B7DF6 0BF08B48 02478B26 F85EC45E 74303F80 ■.±d|..ó.¿d.¼'á^■&...ó.¼'.·.F■.± 0000C0
FE83FC46 FFF28BF9 F799C68B 070026FC 5EC4F9F7 0064B999 C68B157C 64FE83FC .|..ó.¿..¼'á^■&...ó.¼'.·.F■á^■.ó 0000E0
C68BFC5E C4FC46FF F28BF9F7 99C68B07 0026FC5E C4F9F700 0AB999C6 8B157C0A &...F..V.^_.[]ù.U.$.$.ó.H...v..v 000100
76FF1076 FF010148 06C604EC 83EC8B55 90CB5DE5 8B5F5E0C 568B0A46 8B070026 ..v..v..v..v..Òl±.F■.V±ó.H...[]ù 000120
CB5DE58B 00014806 C6FE5689 FC4689FE 49E80E06 76FF0876 FF0A76FF 0C76FF0E U.$.$.óF·..>H..tÒÀ6 ..8 .F¶.V-á^ 000140
5EC4F656 89F44689 2038168B 2036A151 74000148 3E8000F2 46C612EC 83EC8B55 ¶&.?-u.¡..$.+à.F..V..F■.V±ÀJ.9F. 000160
0E463901 4AA1FE56 89FC4689 0C568B0A 4603C02B 02EB0001 B805752D 3F8326F4 uj.F■..J..FŸ.VÞá^Ÿ.FŸ&ó.0.^Ÿ&ó.. 000180
0007C626 EE5E8B30 07C626EE 46FFEE5E C4F05689 EE468901 4A0603FC 46886A75 $Já^.&.w.&.w.&.w.&.7.d0I&.á..F¶. 0001A0
89F44689 08C48326 A730649A 37FF2602 77FF2604 77FF2606 77FF2606 5EC44AEB V-RPá^¶&.G..F.P&.?-u.¡..$.+à.F.. 0001C0
8B0A4603 C02B02EB 00018805 752D3F83 26500E46 03024788 26F45EC4 5052F656 V.RP...W..á..F..V..F■.V±ó^¶&.?-u 0001E0
752D3F83 26F45EC4 FE5689FC 46890C56 8B0A4688 0AC48315 572E8E9A 50520C56
```

Dump of file SATURN:[PCCOMMON.DUMP.DLL]UIW.TMP;1 on 18-APR-1990 10:53:22.77
File ID (940,4,0)   End of file block 88 / Allocated 88

Virtual block number 61 (0000003D), 512 (0200) bytes

```
0EFC76FF FE76FF50 0001881D 7F00027F 8326F45E C42D07C6 26FC46FF FC5EC40A .á^•.F•&ó.-á^¶&......|..P.v±.v•. 000000
000E7E83 FC460102 478826F4 5EC40AEB 3007C626 FC46FFFC 5EC406C4 830205E8 Ò...á.á^•.F•&ó.OŠ.á^¶&.G..F•.~.. 000020
F45EC42E 07C626FC 46FFFC5E C406C483 01D8E80E FC76FFFE 76FF5000 0188687E ~h|..P.v±.v•.ÒÄ..á.á^•.F•&ó..á^¶ 000040
7E0E463B D8F70247 88260EE8 D8F70247 88260874 0001483E 80437D00 027F8326 &....)C.>H..t.&.G.¼ÁŠ.&.G.¼Á;F.~ 000060
FFFE76FF 50003088 0E76FF06 C4830196 E80EFC76 FFFE76FF 500E4689 0E468803 ..F..F.P.v±.v•.Ò...á..v.¡O.P.v±. 000080
FF010148 06C604EC 83EC8B55 CB5DE588 0C56880A 468808C4 8327BE01 829AFC76 v•...ƒ'.á..F..V..[]ùU.š.š.ó.H... 0000A0
5DE58B00 014806C6 FE5689FC 4689FE6E E80E0676 FF0876FF 0A76FF0C 76FF0E76 v..v..v..v..v..Òn±.F•.V±ó.H...[] 0000C0
27FA3064 9A37FF26 0277FF26 0477FF26 0677FF26 065EC456 06EC83EC 885590C8 ù.U.š.š.Vá^.&.w.&.w.&.w.&.7.d0•' 0000E0
EB000188 0675203F 8326014A A3480247 88262036 1EC42038 16892036 A308C483 .á.Ê6 ..8 á.6 &.G.HÊJ.&.7-u.|..Š 000100
C40AC483 28FA2E8E 9A50520E 76FF5306 FE5689FC 46890C56 8B0A4603 C0289003 ..+ä.F..V..F•.V±.S.v.RP...•(.á.á 000120
077CFCFE 83014A36 89014CA2 C02A02EB 01B0047D 014A3639 4E02778B 2620361E .6 &.w.N96J.).¯.Š.*âÁL..6J..±•|. 000140
0CC483FD 93E80E06 76FF0876 FF0A76FF 0C76FF0E 76FF1076 FF1F7F0E 4639C68B .69F....v..v..v..v..v..v..Ò.».á. 000160
FE5E8CFC 7689F975 00FF7C80 46FC76C5 FA5E8C1E 7400014C 3E8090CB 5DE58B5E ^.[]ù..>L..t..^•év•F.|..u'.v•.^± 000180
C483FEF6 E80E0676 FF0876FF 0A76FF0C 76FF0E76 FF00FE47 C626FC5E C4FA5E8E .^•á^•&6G±.'.v..v..v..v..v..Ò-±.á 0001A0
76FF0C76 FF1076FF 1276FF19 75450E7E 83067465 0E7E83EC 8B55CB5D E58B5E0A .^.[]ùU.š.-.et..-.Êu..v..v..v..v 0001C0
0876FF0A 76FF0C76 FF1076FF 1875660E 7E839035 EBFB8FE8 0E0676FF 0876FF0A ..v..v..Ò.«Š5..-.fu..v..v..v..v. 0001E0
```

Dump of file SATURN:[PCCOMMON.DUMP.DLL]UIW.TMP;1 on 18-APR-1990 10:53:22.77
File ID (940,4,0)   End of file block 88 / Allocated 88

Virtual block number 62 (0000003E), 512 (0200) bytes

```
E80E0676 FF0876FF 0A76FF0C 76FF1076 FF1276FF CB5D0AC4 83FD39E8 0E0676FF .v..Ò9».á.]ù.v..v..v..v..v..v..Ò 000000
4004C483 2915008C 9A0676FF 0876FF29 74000A7E 83EC8B55 90CB5D0C C483FEC0 â±.á.]ù.U.š.-..t).v..v.....).á.ä 000020
D88CC888 CB5D0AC4 83238A2F 809A5052 08568B06 46030A46 8B0676FF 0876FF50 P.v..v..F..F..V.RP../¤#.á.]ù.à.Ä 000040
F8015016 89014E0E 8908EB01 6002D006 C7087412 7703FB83 D88E1EEC 8B554590 .EU.š..Ä.«.w.t.ú.Å.'.Š...N...P.½ 000060
8EC18ED9 8CC08C01 528FF38B CBF3F60C B301602D 020DA1CB 4D5D1FE5 8B02ED83 .Ú..Ï.]MùÅÅ.-'.°.-µù.µ¢R..å.).è. 000080
528ED98E A5A5A5A5 FCD88EC1 8ED98CC0 8C01528F F38BC301 528ED98E A5A5FCD8 Ä•ÊÊ.)/R.û.µ¢R..å.).è.Ä•ÊÊÊÊ.)/R 0000A0
8925747F 80C2F702 54880C8B C033FCFC 758803E8 07FE45C6 FC7D89FC 758BC301 .û.u•.)•6E±.Š..u••3ã...T.%ô..t%. 0000C0
3800C281 8FE68004 4D890245 89D8D1D9 D1FAD1D8 D1D9D1FA D1D8D1D9 D1FAD105 .Ï•]]ÏÄï•ï]]ÏÄï•ï]]Ä.E..M..|..ó.8 0000E0
E0865800 00FFFF9A 5016C48B 50EC8855 C3064589 04458902 45890589 C3065589 .U.û...E..E..E.ùU.$P.á.P.....X.Á 000100
E5880001 88276530 D49A006C E80021E8 0000FFFF 9A02D268 1E020468 1E06F8A3 È½..hå..h@......Ò!.Òl..å0e'¡...Ï 000120
FFB902D4 068EFF33 000DB81E 020A16FF 00FF682A 062BAC9A 29F92852 9A50CB5D ]ùP.R+').¯+.*h....Ö..£..3...å.¿. 000140
74AEF2C0 330874CA 88A6F3CB 88D18806 DEBE3174 003D8026 47017500 3D80267F .&.=.u.G&.=.t1/ß..Ï.ùµÏ.òt.3á·Ùt 000160
1FEDEBAA C20A0572 412CAC92 04E0C00E 72412CAC 06FFBF1F F78B071E 061CEBE7 ÓŠ.....¼.¢..¯,Ar.áÅ..¯,Ar..ô`ŠÚ. 000180
81127558 C0080000 FFFF9A52 16501653 C48B5087 06FFA780 D48B5200 028B00C3 û.£..R.å.Ï..ñP.áS.P.R......âXu.Ý 0001A0
8C1D1C06 C41EE31D 1A0E885A D4794806 FF8F0808 B1067500 02300774 00013040 ä=..t.=..u.Ý.....Kyå2....D.á.... 0001C0
E81D248F 1D248E1D 181EFF00 038BC28C 1D2006C4 00CAE903 731D181E FFDB33C2 ô3Ù....s.Òò.á. ..òÉ....../$.¢$.Ò 0001E0
```

Dump of file SATURN:[PCCOMMON.DUMP.DLL]UIW.TMP;1 on 18-APR-1990 10:53:22.77
File ID (940,4,0)   End of file block 88 / Allocated 88

Virtual block number 63 (0000003F), 512 (0200) bytes

```
B8C30000 FFFF9A2A DF680E01 6A0B741D 283D1024 B80073E8 1D16BF1D 12BE007C |./..¢..Òs.¡$.=(.t.j..hÓ*..  .Ù¡ 000000
42BF2042 BEEC8B55 00002ADA 9A006A00 6A036A00 51E81D28 BF1D24BE D88E098F ...Ä/$.¢(.ÒQ.j.j.j..Ö*..U.š/B ¢B 000020
28BF1D28 BE0023E8 1D28BF1D 28BEEC8B 5503EB00 31E81D28 BF1D24BE 003AE820  Ò:./$.¢(.Ò1.Š.U.š/(.¢(.Ò#./(.¢( 000040
F73BC31D 181EFF00 028B07E3 1D1A0E8B 0000FFFF 9A500646 8A50C033 001AE81D .Ò..3âP.F.P.........D.£......û;% 000060
3E832A08 2BAC9A50 00FC88EC 885500C3 EEEB1DFF F2740245 08058804 EF830E73 s..ÿ....E.t·..ŠŸû.U.š¡•.P.¯+.*.> 000080
56EC8B55 FE86E900 0288CB5D E58B285C 2BAC9A50 00FF8809 101EFF04 74000912 ...t.....¡..P.¯+\+.[]ù¡..Õ.±U.$V 0000A0
8BAEF2FF FFB9C033 970C7496 401074C2 38AD1052 8E06568B C08ED88E 2AE08857 W¡Å*.Ä.â.V./R.Ù;öt.ä.t..3â¿..·Û. 0000C0
33FA8B92 1F74C00B 2B7028 7C 9A0676FF 57EC8B55 0002CA5D E58B5E5F 96E8EBF7 %ŠŠ._^.[]ò..U.šW.v..|+p+.ât...•3 0000E0
CA5DE58B 5F5B0000 FFFF9A50 1651521E 5300028B C48B5049 D1F7AEF2 FFFFB9C0 ã¿..¯Ü%ÏIP.áÉ..S.RQ.P.....[_.[]ò 000100
3605E0D1 C103E0D1 C88BF9F7 000CB999 0A422D04 46881C34 06FF0000 04C80002 ..à.....4..F.-B..¿..¥•.àÏÁ.ěÏÁ.6 000120
74000808 57892606 47892604 5EC402C4 832B8632 899A0200 68FE5E8C FC468916 ..F•.^±h....2Ñ+.á.á^.&.G.&.W..Át 000140
FE568BFC 4688040A 4F802604 5EC49021 EB020002 47C726FC 5EC4080A 4F802611 .&.O..á^•&úG...Š!.á^.&.O...F•.V± 000160
07892608 578B2606 478B2604 5EC40001 0247C726 FC5EC408 57892606 47892640 ä&.G.&.W.á^•&úG...á^.&.G.&.W.&.. 000180
05A8E9C0 3300098A 087206FD 1E3B065E 8BEC8B55 C3C90000 0447C726 02578926 &.W.&úG...èùU.š.^.;.».r.¤..3äÕ`. 0001A0
91E175C0 855A5900 00FFFF9A 51160C76 FF0876FF 0A76FF53 CC8B04EC 830584E9 ÕÇ..š..äS.v..v..v..Q.....YZ.ôuÃ. 0001C0
67E9C033 00098A08 7206FD1E 3B065E8B 0CEC83EC 8B5500CB 5DE58BFD 06FFA780 .Ï..».[]ù.U.š.š..^.;.».r.¤..3äÕg 0001E0
```

```
Dump of file SATURN:[PCCOMMON.DUMP.DLL]UIW.TMP;1 on 18-APR-1990 10:53:22.77
File ID (940,4,0)   End of file block 88 / Allocated 88

Virtual block number 64 (00000040), 512 (0200) bytes

748006FF 87F60000 2C959A50 16F4468D 51414151 51C93353 12742006 FF87F605 .-... t.S3èOOAAQ.F¶.P.....-....t 000000
E30C4E8B F86689F2 8BFA8B56 57FCFC46 89FE4689 C0330856 C50A468E FA5E8C66 f.^•.F.éV.3ã.F±.F••WV.•.·.f½.N.D 000020
3B0D740A 3CAC0C4E 8B0716FA 8BD48BE2 2B00808A DC8B02EC 833B75AE F20AB049 I¯.·Ùu;.š..Én..+ã.å.•.-.N.¯<.t.; 000040
0014E8E2 EBFC46FF 0AB0AA00 1FE80375 FB3B0DB0 009AE900 2BE8F4E2 AA1A74FB «t.¯ã¶O+.Õ..¯.;«u.O..¯¯..F•ŠãO.. 000060
1FE3CA28 CF8B1F06 1E515350 2C003080 9AFFFCB8 7AE80093 E9FA5E8E 5F5EE1EB ŠÃ^_.^•Õ..Šz¡•..¯0.,PSQ....ù•òD. 000080
1F0774D8 0BFE5E01 F45E8811 75C00B00 002BD69A 5016F446 8051521E 53065E8B .^.Š.RQ.F¶.P.ø+...âu..^¶.^±.Ût.. 0000A0
03EB001C 8A087500 09BA0001 30007400 60301874 C00B08C4 831FC3FA 8B585B59 Y[X.•ú..á..ât.=m.t.=..¤..u.¤..Š. 0000C0
1CBA0EEB F803751A 3F80085E 8B0A5E8E 0E744006 FF87F6FE 5E8E26EB F90020BA ¤ .•$&.^±-...ãt..^..^..?.u.½Š.¤. 0000E0
0C4E8804 4BE9C85D E58B0472 FA5E8E5F 5EF8668B FC4628FE 46880GEB F9C03300 .3â•$..F±+F•.f½^_.^•r..[]úÕK..N. 000100
74C00B1F 071E0000 20609A50 16F4468D 51521E53 0856C51E EEEBC188 0475C90B .èu..èŠŸ.éV.S.RQ¯F¶.P.m-......ât 000120
F68775C0 0BF4468B C2EB0020 BAC7EB00 1CBACC75 00098A00 01300074 006D3017 .=m.t.=..¤..uãa..Šú¤ .Šô.F¶.âuñ– 000140
7EC45657 000000C8 00A3E8C0 33001CBA A6EB0275 1A3F8026 DA8B0A74 4006FF87 ...ãt..Õ&.?.u.Šl¤..3âŠÉ.à...WVá~ 000160
8C9A5706 006A006A 08468C06 7E89F275 08091587 F6D88B98 058A2647 9002E806 .Š..G&....Ä-....u·.-..F.j.j..W.. 000180
DA8E1E07 1EF08B20 3ABF0008 050AC483 20523480 9A570876 FF5004C4 832E6E00 .n..á.P.v.W..4R-.á....¢: .Þ....Ö 0001A0
FA5689F8 46890856 8B06468B 56570000 0ACBCBC9 5F5EDA8C 203AB81F A5A5A5A5 ÉÉÉÉ.|: .Ö^_èùà...WV.F..V..F½.V• 0001C0
7E000A7E 833007C6 26F846FF FB5EC4FE 5689FC46 8908578B 2606478B 260C5EC4 á^.&.G.&.W.¯F•.V±á^½.F½&ó.O.~..– 0001E0

Dump of file SATURN:[PCCOMMON.DUMP.DLL]UIW.TMP;1 on 18-APR-1990 10:53:22.77
File ID (940,4,0)   End of file block 88 / Allocated 88

Virtual block number 65 (00000041), 512 (0200) bytes

04883080 9003EB07 8A26FC46 FF097400 3F8026FC 5EC4F876 C5F65E8C 0A4E8B2E ..N..^-év½á^•&.?.t..F•&..Š..¯O.. 000000
26FC5EC4 287C000A 7E830007 C626F85E C40A4E89 F65E8EFA 5E8CF876 89E7E246 FãÓ.v½.^•.^-.N.á^½&ó...-..|(á^•& 000020
8BFA468C F87E89F5 74393D80 264F3005 C6269006 EBF87EC4 F84EFF1F 7C353F80 .75|..N½á-½Š..&ó.OO&.=9t%.-½.F•. 000040
52505240 08568806 468B15E8 0247FF26 0C5EC409 75313F80 26065EC4 07FE260F Ô&±.á^.&.?1u.á^.&.G.Š..F..V.ãRPR 000060
8BEC8B55 049AE900 B35756EC 8B550000 90CBC95F 5E08C483 2E610056 9A0676FF .v..V.■..á.^_èù...U.šVW•.Õ..U.š. 000080
00CB5DE5 8BC03302 EB0001B8 05744006 FF87F60C 7C00F883 117D06FD 1E3B065E ^.;.■.)..«.|¯-...ãt.|..Š.3á.[]ù. 0000A0
8B2F4633 D89A5706 561E067E C40A76C5 56571E00 B5E90375 C90B0E4E 8BEC8B55 U.š.N..èu.Õç..WVév.á-..V.W.Ã3F/. 0000C0
05C08C07 73F903D8 8E01B505 D88C0773 F1034950 73000A83 C1285778 D20B0E4E N..ØxW+è.Ö.sPI.þs..Ä.ç..Ä.•s..â. 0000E0
FCA4F3FD C1289140 C603C323 DB1BC62B C703C323 DB1BC72B 48C18B41 C08E2FB5 ç/.âA.èH+ú.Û#ú.ú+ó.Û#ú.óú .+è»µÊ• 000100
48C18BC8 EBC08E2F EB2DC08C D175FFFF 83D88E2F C02DD88C 0775FFFE 835CE391 .D\.±.u..Ä-â/.Ä...uî.â-Š/.¿.3.èH 000120
A5F3E9D1 C1289140 C203C323 DB1BC22B D2F7D68B C203C323 DB1BC22B D2F7D78B .■%Ø+ó.Û#ú.ô.ø%Ø+ó.Û#ú.óã.+èîÕµÊ 000140
5EBEEBC0 8E302E05 C08CC775 FF08D88E 2FF705D8 8C0775F6 0B1BE391 A4F3C913 .èµÊ.D..-u..Ä.¼/.Ä..uú.â..O.âŠ/^ 000160
2DF69A53 1650521E 510002B9 DC8B5301 578DE42A 078ACB5D 08568806 46881F5F _..F..V.]ù..•õ.W.S.É¿..Q.RP.S.-- 000180
550A208E A536A536 A536A536 0A208F06 7680C08E D88CFC57 56EC8B55 CB580000 ..[ùU.šVW•.Ä.â.v.¢ .6É6É6É6É/ .U 0001A0
0645C704 4D890255 891D89FF 320A168F AA91A4F3 9198ACC8 8B0A28BF 5D04E2E8 Òã.]¢(..à¯..µÊ.¯¢..2....U..M.úE. 0001C0
E3880572 0A401E3B 0872D82B DC8B5A59 00CB5DE5 8B5E5FC7 8BDA8C08 5D8C0A28 (..]..Ö.ú_^.[]ù.YZ.É+Är.;.ã.r..D 0001E0

Dump of file SATURN:[PCCOMMON.DUMP.DLL]UIW.TMP;1 on 18-APR-1990 10:53:22.77
File ID (940,4,0)   End of file block 88 / Allocated 88

Virtual block number 66 (00000042), 512 (0200) bytes

3639FF28 F6285657 000014C8 0A3C2EFF 5152F934 E9C03305 75400A3C A1C85152 RQùÅ<.ãu.3ãÕ4•RQ..<.à...WV+-+.96 000000
76FFF876 FF0C6AF8 5689F646 89F25689 F04689C0 2B020416 8B00F0E9 037502D4 å.u.Õþ...å.+ä.Fþ.V·.F-.V½j..v½.v 000020
46FFF65E C400BCE9 03767FFF FE814619 74C00B0A C4833148 339C9A06 DE681EF6 -.h8...3H1.á..ât.F.±..v.ÕŸ.á^-.F 000040
8DBA7500 3F8026F6 5E8BF475 003F8026 F646FFF6 5EC40CEB 47EA7500 3F8026F6 -&.?.uõGŠ.á^-.F-&.?.u¶.^-&.?.u¤. 000060
89FC4689 02C48331 8032899A 56EE5689 EC468904 C4833157 33449A04 6A500145 E.Pj..D3W1.á..FŠ.VŸV..2.1.á..F•. 000080
0C6A0907 16890905 A3EE568B EC468866 74C208FC 46886D74 EE4608EC 468BFE56 V±.FŠ.FŸtm.F•.ôtf.FŠ.VŸÈ......j. 0000A0
26FE568B FC468BEC 5EC42C74 C00B0AC4 832F9D33 9C9A06DE 681EF076 FFF276FF .v·.vþ.h8...3./.á..ât,á^Š.F•.V±& 0000C0
0E74C00A 078826FC 46FFFC5E C4078A26 F046FFF0 5EC404EC 46830257 89260789 ..&.W..FŠ.á^þ.Fþ&..á^•.F•&...ât. 0000E0
02021601 90CBC95F 5EA77500 3F8026F0 5EC4F475 003F8026 F046FFF0 5EC4E8EB ŠÒá^þ.Fþ&.?.u¶á^þ&.?.uÏ^_èù..... 000100
02350212 12110D10 120F1600 160C080B 070A0C09 0C080C07 09060005 18040203 ...............................Š. 000120
08A40D84 09820A81 0A801606 09721C70 2060006C 08590057 00530052 02430041 A.C.R.S.W.Y.l.m p.r...........É. 000140
E58B99FF FFB80008 E8CB5DE5 8899FFFF B806F416 8906FBA3 16080000 0B0702CE ö.■.....È«...¶.|....[]ùÕ..¡....Í 000160
0A76243C 0472133C F7E24343 1674073A 2E1B75E4 0A0024B9 310CBB06 FBA3CB5D ]ùÈ«.ÉÉ1¿Š..Õu..:.t.CCã%<.r.<Šv. 000180
0574C30B C08C065E C4EC8B55 00C306F4 A3980147 8A2E4301 76CA3C04 72BC3C43 C<¥r.<òv.C..G..É¶.ù.U.šá^..å.ût. 0001A0
0875001C D43E831E 73FFF13D 06468B57 5602EC83 EC8B55CB 5DE58B01 FE4F8026 &.O±..[]ùU.š.š.VW.F.=þ.s..>å..u. 0001C0
83310836 B89A0676 FF0B7500 78E80574 0018E815 750082E8 1CD4A312 740025E8 Ò%.t.Èå.Ò..u.Ò..t.Òx.u..v..|6.1. 0001E0
```

Dump of file SATURN:[PCCOMMON.DUMP.DLL]UIW.TMP;1 on 18-APR-1990 10:53:22.77
File ID (940,4,0)   End of file block 88 / Allocated 88

Virtual block number 67 (00000043), 512 (0200) bytes

```
8D50501E C033FE5E 89FEE383 43065E8B 0776065E 3900F08B CB5DE58B 5E5F02C4 á._^.[]ùEÞ.9^.v..^.C.D±.^ ]á.PP. 000000
0574020B 1CD8A31C D61687C2 8B3874FF FA8308C4 8332BD38 649A5002 B0510E4F O.Q¯.P.d8§2.á..*.t8.ô..ø.È.  Øt. 000020
01478000 02A30000 A3000AB8 0C478948 480008A3 C033D88E FE5E8B00 08A3DA8E .ÒÈ...^±.Ã3âÈ..HH.G.|..È..È...G. 000040
8CD20B03 C4E81CD8 1E8ED833 064E8BC0 8ED88CC3 1FD88C00 06A30000 05000AA3 È.....È...Ã.Û.Ã.á.N.3Ü..Ã.Ôá..Ø. 000060
C2F7FA56 89F84689 33710266 9A0676FF 006A0876 FF006A56 00000AC8 C3D98EC1 è.\ùà...Vj..v.j..v..f.q3.F½.V*¼ô 000080
1274D00B FE5689FC 468902C4 83338A32 899A56F8 7688902F EB99C028 0674FFFF ..t.+â.Š/..v½V..2.3.á..F=.V±.Àt. 0000A0
57EC8B55 90CBC95E FE5688FC 46889007 EB08C483 32E90182 9A50FE76 FF006A56 Vj..v±P...Õ2.á.Š...F=.V±^èù.U.ŠW 0000C0
FF448AA6 F30A76C5 FE88CB03 D9F7AEF2 C033F78B 067EC4D9 8B27E30E 4E8B1E56 V..N.D'.\á-..¼3â·Û¼\.ù.±év.µ].D. 0000E0
568B0646 8BEC8B55 00C85DE5 8B5F5E1F C18BD1F7 49490474 0477FF45 3A26C933 3è&:E.w.t.[I¼[.è.^_.[]ù.U.š.F..V 000100
1E08568B 0646B80E 4E8B0008 CA5DE58B D31B0A46 2BEBD3EA D3FFFF89 0C5E8B08 ..^.¿..ÆõÆŠ+F..Æ.[]ò...N..F..V.. 000120
8BDAF700 D2830BF7 AA20B00A 79020B0E 750AF983 1374C00A 93FC071E 570A7EC5 é-.W..=..ât..*.u..Øy.¯-`¼Ü.Ø.¼Ö. 000140
88E275C3 0BC28BAA 27040276 393C3004 D38792F1 F793F1F7 0274C00B D23392F7 ¼.3Ø.ât.¼þ.¼þ..Æ.0<9v..'`.ô.ùuã. 000160
DB335756 EC8B55CB 5DE58B5E 5F1F58DA 8CF272C7 3B01448D FF448805 86AC4F05 .O¯...D..D.;ùr·.ÖX._^.[]ùW.šVW3Û 000180
CB5DE58B 5E5F0D89 40C98005 730A763B 001CDF06 C60028E8 011CDF06 C60E568B .V.ó.Ô..Ò(.ó.Ô..;v.š..èa.._^.[]ù 0001A0
067664F9 830A4E8B C08ED88C FCCB5DE5 8B5E5F00 06E80E5E 8BD23357 56EC8B55 U.šVW3Ø.^.Ò.._^.[]ù=.Ã.ã.N¯..*dv. 0001C0
BF064E01 0C468806 76891C48 BEDA4E8B D88EA4F3 1C488F06 76C527EB F63340B1 Ýa3-Š'év.«H.µÈ.Ã.N./H..v..F..N.« 0001E0
```

Dump of file SATURN:[PCCOMMON.DUMP.DLL]UIW.TMP;1 on 18-APR-1990 10:53:22.77
File ID (940,4,0)   End of file block 88 / Allocated 88

Virtual block number 68 (00000044), 512 (0200) bytes

```
C3DA8CC7 8B065D89 04458902 75890089 1C36BF0A 76030676 2B50049F E8551C3E >.UÒ..]+v..v.«6....u..E..]..ú.ÕÜ 000000
8B02EB83 02EE8300 05B90AC3 830AC683 1675C43A 80802509 478A2E09 648A5653 SV.d...G.%..:áu..ó..û.¿...Ÿ..Š.. 000020
DFD1DDD1 DAD1DBD1 E8D10005 B9FF33AD 93AD92AD 95AD56C3 5B5EF3E1 073B2E04 ..;.Ãµ^[ÛVÜ.Ü.Ü.Ü3.¿..ÏÒÏÜÏÕÏÏÏÕ 000040
66C30844 89065C89 04548902 6C893C89 5E03FE2D DBD1F500 013DD0D1 E3D1F4E2 ã¶ÏDÏÅ=..¼ÏÜ-±.^.<.[..T..\..D.úf 000060
8BC03330 0144C601 04C61C8B BEFFFDCC CCCCCCCC CCCCCD00 00FFFFFF FFFFFFFC ■........ëäääääää».ƒ|.ó..óÒ.03ã. 000080
C1F720B3 7F076480 064C8B5E A5F30004 B9571CAC BFFCC08E D88C06C3 075B40D0 ÃaĮ.û..Ã.â=«¯.W¿..µÈ^.L..d..° ¼ë 0000A0
C88B3FFE 05ADF88A 8B7480AB AC1CB38E FF33FF7B E8532DB3 0279C90B 06747FF0 Þ.t..èy.ª·SÒ(.3.ƒ°.¯`.tÈ.¼Ü.±7.à 0000C0
F7571343 DF8112F4 E981FA13 C803E7F6 9AB00713 C803E4F6 4DB091E2 F74D108A ¤.M¼ã.¯M-ô.à.■¯.-Ô.à.*.Ô¶..ÕC.W¼ 0000E0
92AD95AD 97AD575F 065EE835 49BB5747 09725FFF 13E8353F BB07D5E8 1CACBEDF Ôƒ¯.ÔÍ.£?5Ò.. r.GWÈ]5Ò^._WÜ.Ü.Ü. 000100
13039AD6 8156C480 F4E2DCD0 DED1DDD1 DAD1EBD1 0CE3C033 F78BD9F7 91AD93AD Ü.Ü.¼].¼3äÕ.[Š]ÕÏÏÏßÅÈã¶¯áV.ø... 000120
D0D0D0D3 D1D2D1D5 D1D6D1E4 D0505655 525351C0 32001089 1CB9BFD9 130113E9 Õ.Ï.]«¿.¿..2âQSRUVPÅõÏøÏÏÏØÏÆÀÀÀ 000140
D6D1E4D0 0014D913 59D11359 E91359F1 1359E502 59D00003 D1D2D105 D1D6D1E4 õÏøÏÏÏØÏÆÅÂY.ÏY.þY.ÕY.ÏY.)..ÅÕÏø 000160
01B80C88 1CB88E12 C183FCAE F3FD3080 494FBDE2 59AA3004 D0D003D1 D2D1D5D1 ÏÏÏØÏÆÅÅ.O`Yã§OÏ¯O»µÛ=.ê.ƒ|...|. 000180
830A47F6 26FA5EC4 1CEBF62B FC5E8CFA 46890A42 8B560000 06C800C3 075B5A00 .Z[.û.à...V|B..F*.^=+-Š.á^*&-G.. 0001A0
D876FA46 391C3216 8B1C30A1 0CFA4683 46017440 04C48333 563DC09A 53060E74 t..S.â=V3.á.at.F.F*.ÀO...2.9F*vÄ 0001C0
1CCAB857 56EC8B55 CB5DE58B 01FE4F80 0474DB08 065E8BEC 8B5590CB C95EC68B .ó^èù.U.š.^..Üt..O±..[]ùW.šVWÈò. 0001E0
```

Dump of file SATURN:[PCCOMMON.DUMP.DLL]UIW.TMP;1 on 18-APR-1990 10:53:22.77
File ID (940,4,0)   End of file block 88 / Allocated 88

Virtual block number 69 (00000045), 512 (0200) bytes

```
04C7961C CCA31CCA A3FE2440 24EB99C0 33057501 76E80005 B8071E29 75003F83 .7.u)..|..Òv.u.3â.Š$a$±Èò.Èä..ú. 000000
D0E9CB5D E58B5E5F 0009E8C0 8ED88C06 4E881CD0 3689FFFE FE44C704 C6830001 ...ó.ÚD±±..óÅ..N..Ã.ãÒ.._^.[]ùÕÅ 000020
F003D08B 1573C13B 48437401 A8FE8BAD FC02778B F273EEF9 83FEE180 FA744100 .At*.Ã±.*Ys·.W.=Ü.±´.tCH;ès..Å.Þ 000040
EB058948 C12BFE4C 89F9030C 74FE8BE6 EBFE4489 F78B0002 05C20335 7401A8AD Ü´.t5.ô....¼.D±Š].±t..*.L±+èH..Š 000060
021CDC06 C626C302 7F891CDB 1E8C2605 74D13B2B 82B90A8C C68BFE4C FEF90305 ..*±L±.ó.Õ¿.+;Ït.&..Ã....ü&ó.É.. 000080
C203E274 01A8ADF0 03D08B8C 73C13B48 FE8BF274 01A8ADF0 03FE8B25 74FFFE3D =±.t%.±.ÞÜ´.t·.±H;ês¥.Å.ÞÜ´.tã.ô 0000A0
4B8FD88C 12741CDC 0EFE2615 EBD88E04 74C00808 478BE6EB FE4489F7 8B000205 ....¼.D±Š].G..ât..ÄŠ.&±.É.t..Ä«K 0000C0
E8984040 01240D74 C638006B E8C03306 778B8BE8 378B1CD4 1E8E2605 74C73B37 7;út.&..â..7ŠÉ.w.3âÒk.;ót.$.aa.Ò 0000E0
07881CD8 A3260474 C138379F B9D88C98 EB4E4E96 0574001D E8FE4DFE 0D74005F _.t.±M±Ò..t..NNŠ..Ä¿.7;êt.&ÉÄ... 000100
EAD10476 1CDA163B 267FFFBA 414149C8 2B037401 A8FE458B 51C399C0 33024789 ¯.G.3â.úQ.E±´.t.+âIAA¤..&;.Ö.v.Ïõ 000120
59C033E5 75EAD1D2 F7087500 0CE8C628 C223D2F7 0D72C203 1572C603 C188F575 u¼.è.ór..ôr.¼Ø#ö+óÒ..u.¼ØÏõu[3ãY 000140
58FE5589 4AD72806 8B067789 FFFEFE44 C7F203F0 8BFE8B57 1874001D E85152C3 ùRQÒ..t.W.±.Þ.·ÚD±±..W..ø+■J.U±X 000160
745B5A1F FFFA8308 C4833687 38649A1F 06500001 B8505252 1ED23350 53C35A59 YZÜSP3Ø.RRP|..P...d8.6.á..*..Z[t 000180
720057E8 07754806 46880856 8802DCBF 3875000A 7E830657 56EC8B55 C3020B02 ..ØÜU.šVW..~..uB«É..V..F.Hu.ÒW.r 0001A0
FE8104C6 8334735E 003EE856 0E468902 44880074 F73B1174 48060C36 8B4CEB27 'ŠL.6É.Ht.;¼t..D..F.VÒ>.^s4.ó..± 0001C0
C085F95B 0000FFFF 9A50C033 501652C4 8B5021EB 99FFFF88 0675D20B 047306DC É.s..Øu.|...Š!P.áR.P3âP.....[*.ã 0001E0
```

```
Dump of file SATURN:[PCCOMMON.DUMP.DLL]UIW.TMP;1 on 18-APR-1990 10:53:22.77
File ID (940,4,0)   End of file block 88 / Allocated 88

Virtual block number 70 (00000046), 512 (0200) bytes

0C74024C 39F7880E 4E88C85D E5885E5F 07C033D3 8B060C36 89025C89 1489E675 ul...\..6€..Æ3ã._^.[]ù.N..%9L.t. 000000
1373020б 1E390675 F73BC18E D3882672 1C030A88 2CEBF9F2 75060CFE 8104C683 .6..±É.u·!$,.Ö..r&.Æ.ê;%u.9.ø.s. 000020
40C98030 C98058C3 D1880487 92020616 890475F7 38DE75C0 850000FF FF9A5153 SQ......àuß;%u...ø.....iùX.è0.èə 000040
E0720205 E8F888E1 72020CE8 DB331CEC 1E8900AC E9083301 85E8EF88 FF33078B .æ3..ÿÒ..3ùÒ¯...š.3ùÒ..rÃ.ÝÒ..rÁ 000060
D383F803 588E72D8 88C503C4 7502081C EC2EF7C3 88EA88F8 881CEC26 F7C78850 P.ù%&š..½.ō.ù%.š..Øuá.é.Är∫X.½.Æ 000080
A31CE6A3 1CE8A3C0 331CF016 891CEEA3 1CE40E89 CE031CE2 3E89FCB5 E8087300 .sÄŞç•.>ã..ö..ð.ÈŸ...Þ.3ãÈÒ.Èl.È 0000A0
453C1C74 443C4E41 7401FDE8 DB3300E7 E89F750B 0880CD80 037501A0 E8911CEA õ..ÒÙ.u..ë..Ùu.ÒÒ.3ÙÒ».tAN<Dt.<E 0000C0
EE06C70E C98003EB 0402C981 4E277502 742D3C06 74283C31 74001CDF 3E801274 t..>Ò..t]<+t.<-t.u'N.è..Š..è.ú.Ÿ 0000E0
FF081CEE 3E88DBF7 02759E58 40C98003 7502C5F6 0088E850 9F016CE8 4600001C ...FÒl..PÒ..-é.u..èaX.u.%Ù.>Ÿ... 000100
507F0190 FF811CF0 3E280475 10C5F61C EA3E03F8 0330C980 03741872 C1F70675 u.%èr.t..è0.«.>ō.-é.u.+>Þ......P 000120
F61CF41E 881CF2A1 38755E59 01ACE800 100006C6 1CE23E88 0394E81C F68E5156 VQƒ-.Ò...>ã.ó....Ò¯.Y^uBÀ·...¶.- 000140
C9800376 071CE83E 8380074D 8004747F F00645F7 000383F5 D8F7D3F7 137480C5 é.t.%Æ%À%.Æ.%E.Þ.t..M...>Ò..v..è 000160
7200E4E8 0A1CEC06 C63FFF88 C301C980 C302CD80 0375001C F83E831D 002E8A08 ......>Ò..u..ë.û.è.ûE.76.š..Òô.r 000180
880F88EF 88FF33C3 DFE8DE78 D803E3D1 E3D1C303 E3D102C0 80ED770C CCF88117 ..«ä.wÙ.ë.ÌD.ûìDÌD.ÄxßŠÒû3..ÿ.Ô. 0001A0
72008BE8 E5721999 FF81000D7 83000583 000383D0 0358008A E8502872 0006E8D7 ▪Òø.r(PÒ..X.Å.Æ..ſ..▪.....rÌÒE.r 0001C0
80C5F617 7480C7F6 16751CEA 0608C508 C788EEEB 1CEA06FF 01CA8003 74C00A00 ..ât..ò...õ.ŠŸ.ú.é..ō.u.-ú.t.-é. 0001E0

Dump of file SATURN:[PCCOMMON.DUMP.DLL]UIW.TMP;1 on 18-APR-1990 10:53:22.77
File ID (940,4,0)   End of file block 88 / Allocated 88

Virtual block number 71 (00000047), 512 (0200) bytes

C508C788 1CF41E89 1CF21689 20C98010 C98006EB 0575020B 09758000 F8810F74 t..«..u..Øu.Š..è..è ..·...¶..ú.é 000000
002AE848 0678FF0B 004088F1 EB1CEA0E FF0025E8 09731999 FF811C74 C208C308 .ù.öt.....s.ÒX...ō.Šþ¡ə...x.HÒ*. 000020
03000BE8 000EE8C2 88535557 C35EAB92 AB96AB95 AB93AB92 1CF68FF7 8856F6EB Š-V.%e-.. ¨ . ¨ . ¨ . ¨ ^ùWUS.òÒ..Ò... 000040
01752B3C 06742D3C 0874005E E8C3D7D1 D5D1D3D1 E2D1F813 58E81358 D81358D0 ÀX.ÀX.ÒX.½ìãìÆìſìæùÒ^.t.<-t.<+u. 000060
3C337400 37E81DEB 397D1CEC 063A072C 027E093C 4572302C 4A74004E E8C34E46 FNÚÒN.tJ,0rE<.-.,.:.š.)9Š.Ò7.t3< 000080
CD80C3E4 321CE806 FF08CD80 1CEA0EFF 0E7410C5 F6267709 3C2A7230 2C20742E .t ,0r*<.w&-é.t...ō..ë...Ò.2ōù.ë 0000A0
001CDE3E 80AC2373 1CE43638 C3F94EC9 EB10CD80 1CE606FF 097510C5 F6F4EB20 Š¶-é.u...l..ë.ŠèN*ù;6ō.s#¯.>B.. 0000C0
C3C032C3 5F240277 7A3C0672 613CE274 0D3CE674 0A3CEA74 093CEE74 203C1074 t.< tŸ<.tö<.t|<.tã<ar.<zw.$ û2àû 0000E0
05880FD1 E8D1E7D1 3E7803FE 05AD4974 C208C10B C508F888 AD95AD91 AD92AD57 WÙ.Ù.Ù.Ù.½.é.ê.ötlÙ.±.x>ìÒìÒìÒE. 000100
13CE13F5 8001FA81 F633030A D92243F0 75C8FED7 D00001D7 D1050101 D1E2D100 .lãìſìſìæìÅÅæ±ùæÞC").Æ3-.‘..X.ö. 000120
88D8E8C0 33011D00 0E800FE8 000780F5 7FF030DE 74FFF0A9 000780C6 13FE13EE Ÿ.±.ó.æ.`Þ.t.=Þ.X.æ.Š......3â.Å. 000140
C033FD8B 0008891D 02B0C3FF 0A064589 04758902 6D890089 5FF788F8 88E888C8 à.Ò.½.¼ ...m..u..E...ù§..¿...»3â 000160
5653C888 980404D8 F6C42AC4 2AE022C7 2B0004B8 0007BF08 44010847 882EABF3 µ¨..G..Ō.€..¡..+ú"Å*á*á-Ä....âSV 000180
00045683 3E025611 3E004601 3E27F72E 048806C6 83F728F1 0308C383 DF28D92B +)+Ò.ù..þ+%.ó....%'>.F.>.V.>.V.. 0001A0
ADCD0AC8 08ADC808 AD91ADF5 870EED83 8C754F02 C58358SE E6E202C3 8302EE83 .Ÿ..ù.ãl^[.é.Ou¥.Ù..%Ù.Ù.âÙ.à.ëÙ 0001C0
0001800D D1D301D1 D107D1E2 D1084CFF 0078C008 F588AD93 AD91AD97 ADD10A92 ..ìÙ.Ù.Ù.Ù.%.àx..L.ìãìæìììÆìÅ§.. 0001E0

Dump of file SATURN:[PCCOMMON.DUMP.DLL]UIW.TMP;1 on 18-APR-1990 10:53:22.77
File ID (940,4,0)   End of file block 88 / Allocated 88

Virtual block number 72 (00000048), 512 (0200) bytes

4C893C89 C508CDD1 086C0105 01C51300 13CD13FD 13F58001 FA81ED33 D508EF23 #ÿ.{3Ù.*..X.».ë.Ì.éì{.l.ìë.é.<.L 000000
00000000 0007C800 00000000 00000004 A0000000 00000000 C3064489 045C8902 ..\..D.û..................à...... 000020
ADA82870 859E0036 8E18C98F 04000000 0018BEBC 20000000 0000000E 9C400000 ..ə........ ¥/......€è..6..çp+ ¨Ù 000040
AA7EEBFB 9DF9DE8E 01AA93BA 47C980E9 8CE00005 C2781F49 FFCFA605 006B9DC5 é.k.ſÌù.I.xôſ.À.Ò.èGɑ.¯..B*.«Š-¯ 000060
FFF301B7 1758E219 652CFFFA A3070A3D 70A3070A FFFDCCCC CCCCCCCC CCCD0353 S.ëääääää»..æÈp=.æÈ*.,e.ãX.ñìµ. 000080
E9A5FF96 CFB11EAD 453994BA FFCBE695 948EC44D E158FFE6 ABCC7711 8461CEFD »öa..wë¨].[ÃM6/..lù.ɑ.9EÙ.Ýù..EÒ 0000A0
083CE888 FCAEC031 4325637A 193AFE57 DDD0467C 648CE4A1 FF2CA87F EA27A539 9È'ō.´,.ÀÒ¥d|FÂÌW±:.zc%C1âÛ=ÈÒ<. 0000C0
C3ECE858 5FFE7BE8 5753F573 EFD10D74 FF0B0AC3 830AE883 DFF73D42 880579FF .y.ÈB=%Ò.Š..ù...t.ìÿs%SWÒ(±_[Ššù 0000E0
0A422DC3 88157508 0A47F626 5575023C 03240A47 8A26065E C4F62856 000004C8 à...V+-á^.&.G.$.<.ùU&-G..u..ù-B. 000100
7EC00BFC 46890647 2826078B 26065E8B 39740116 3687F606 D86BF9F7 000C8999 .¿..X*kÄ.-.6..t9.^.&..&+G..F=.â- 000120
5EC40B74 FC463B08 C4833854 2CAA9A50 E42A0847 8A260677 FF260877 FF265028 (P&.w.&.w.&.G.*ōP.¯,T8.á.;F=t.á^ 000140
000447C7 26025789 26078926 08578826 06478826 065EC4FF FF8E200A 4F802606 .&.O. ƒ..á^.&.G.&.W.&..&.W.&ùG.. 000160
00000006 3E140002 00070001 2AF40103 00050001 282C0103 0000CBC9 5EC68800 ..ó^èù....,*......¶*.......>.... 000180
00220001 38880103 00880001 30390105 00870001 33E50105 00000008 37D40002 ..â7......Ì3.....90......|8..". 0001A0
00580001 29EC0103 004D0001 2A760103 003A0001 2CD60103 00260001 39030103 ...9..&...ø,..:...v*..M...š)..[. 0001C0
54206E75 52205340 00000000 00000000 013F0008 305E0203 005C0001 29090103 ..)).\...^0..?.........MS Run-T 0001E0
```

```
Dump of file SATURN:[PCCOMMON.DUMP.DLL]UIW.TMP;1 on 18-APR-1990 10:53:22.77
File ID (940,4,0)   End of file block 88 / Allocated 88

Virtual block number 73 (00000049), 512 (0200) bytes

38383931 20296328 20746867 69727970 6F43202D 20797261 7262694C 20656069 ime Library - Copyright (c) 1988 000000
6E6F6974 704F0073 6E6F6974 704F0011 70726F43 2074666F 736F7263 694D202C , Microsoft Corp..Options.Option 000020
6F725020 2F207470 606F7250 00000064 6E616060 6F430064 6E616060 6F430073 s.Command.Command...Prompt / Pro 000040
20666F20 646C2523 00737365 72676F72 50202F20 7470606F 72500073 73657267 gress.Prompt / Progress.#%ld of  000060
00AA23B0 00A622A0 00A22304 009E2316 FFFF2886 00007325 73250020 20646C25 %ld  .%s%s...(...#..å#Å.."[.¯#˙. 000080
00000000 19931940 1F6C1BD5 1F6E1BD7 1F0B1B51 1CDF19E5 1CE119E7 1D0419EF ÿ...Ö.Ã.[.Ö.Q...■.n.[.[.ә....... 0000A0
28761014 28760000 23202D28 00296C6C 756E2800 296C6C75 6E283FF0 00000000 ....Þ?(null).(null).+- #..v+..v+ 0000C0
FEFF0000 00007878 31364D05 01010000 000000F8 287600F4 287600F0 287600EC š.v+b.v+¶.v+½........M61xx.....± 0000E0
00000000 00000000 00000000 00000000 00000000 00000000 000080C0 E0F0F8FC •½þÅà........................... 000100
00000000 00000000 00303030 28650000 00000000 00000000 00000000 00000000 ..................e+000......... 000120
00000000 00000000 00000000 00000000 00000000 00000000 00000000 00000000 ................................ 000140
00000000 00000000 00000000 00000000 00000000 00000000 00000000 00000000 ................................ 000160
00000000 00000000 00000000 00000000 00000000 00000000 00000000 00000000 ................................ 000180
00000000 00000000 00000000 00000000 00000000 00000000 00000000 00000000 ................................ 0001A0
00000000 00000000 00000000 00000000 00000000 00000000 00000000 00000000 ................................ 0001C0
00000000 00000000 00000000 00000000 00000000 00000000 00000000 00000000 ................................ 0001E0

Dump of file SATURN:[PCCOMMON.DUMP.DLL]UIW.TMP;1 on 18-APR-1990 10:53:22.77
File ID (940,4,0)   End of file block 88 / Allocated 88

Virtual block number 74 (0000004A), 512 (0200) bytes

00000000 00000000 00000000 00000000 00000000 00000000 00000000 00000000 ................................ 000000
00000000 00000000 00000000 00000000 00000000 00000000 00000000 00000000 ................................ 000020
00000000 00000000 00000000 00000000 00000000 00000000 00000000 00000000 ................................ 000040
00000000 00000000 00000000 00000000 00000000 00000000 00000000 00000000 ................................ 000060
00000000 00000000 00000000 00000000 00000000 00000000 00000000 00000000 ................................ 000080
00000000 00000000 00000000 00000000 00000000 00000000 00000000 00000000 ................................ 0000A0
00000000 00000000 00000000 00000000 1D402050 280F2050 20500000 00000160 `.....P P .+P ə................. 0000C0
00000000 00000000 00000000 00000000 00000000 00000000 00000000 00000000 ................................ 0000E0
00000000 00000000 00000000 00000000 00000000 00000000 00000000 00000000 ................................ 000100
00000000 00000000 00000000 00000000 00000000 00000000 00000000 00000000 ................................ 000120
00000000 00000000 00000000 00000000 00000000 00000000 00000000 00000000 ................................ 000140
00000000 00000000 00000000 00000000 00000000 00000000 00000000 00000000 ................................ 000160
00000000 00000000 00000000 00000000 00000000 00000000 00000000 00000000 ................................ 000180
00000000 00000000 00000000 00000000 00000000 00000000 00000000 00000000 ................................ 0001A0
00000000 00000000 00000000 00000000 00000000 00000000 00000000 00000000 ................................ 0001C0
00000000 00000000 00000000 00000000 00000000 00000000 00000000 00000000 ................................ 0001E0

Dump of file SATURN:[PCCOMMON.DUMP.DLL]UIW.TMP;1 on 18-APR-1990 10:53:22.77
File ID (940,4,0)   End of file block 88 / Allocated 88

Virtual block number 75 (0000004B), 512 (0200) bytes

00000000 00000000 00000000 00000000 00000000 00000000 00000000 00000000 ................................ 000000
00000000 00000000 00000000 00000000 00000000 00000000 00000000 00000000 ................................ 000020
00000000 00000000 00000000 00000000 00000000 00000000 00000000 00000000 ................................ 000040
00000000 00000000 00000000 00000000 00000000 00000000 00000000 00000000 ................................ 000060
00000000 00000000 00000000 00000000 00000000 00000000 00000000 00000000 ................................ 000080
00000000 00000000 00000000 00000000 00000000 00000000 00000000 00000000 ................................ 0000A0
00000000 00000000 00000000 00000000 00000000 00000000 00000000 00000000 ................................ 0000C0
00000000 00000000 00000000 00000000 00000000 00000000 00000000 00000000 ................................ 0000E0
00000000 00000000 00000000 00000000 00000000 00000000 00000000 00000000 ................................ 000100
00000000 00000000 00000000 00000000 00000000 00000000 00000000 00000000 ................................ 000120
00000000 00000000 00000000 00000000 00000000 00000000 00000000 00000000 ................................ 000140
00000000 00000000 00000000 00000000 00000000 00000000 00000000 00000000 ................................ 000160
00000000 00000000 00000000 00000000 00000000 00000000 00000000 00000000 ................................ 000180
00000000 00000000 00000000 00000000 00000000 00000000 00000000 00000000 ................................ 0001A0
00000000 00000000 00000000 00000000 00000000 00000000 00000000 00000000 ................................ 0001C0
00000000 00000000 00000000 00000000 00000000 00000000 00000000 00000000 ................................ 0001E0
```

```
Dump of file SATURN:[PCCOMMON.DUMP.DLL]UIW.TMP;1 on 18-APR-1990 10:53:22.77
File ID (940,4,0)    End of file block 88 / Allocated 88

Virtual block number 76 (0000004C), 512 (0200) bytes

00000000 00000000 00000000 00000000 00000000 00000000 00000000 00000000 ................................ 000000
00000000 00000000 00000000 00000000 00000000 00000000 00000000 00000000 ................................ 000020
00000000 00000000 00000000 00000000 00000000 00000000 00000000 00000000 ................................ 000040
00000000 00000000 00000000 00000000 00000000 00000000 00000000 00000000 ................................ 000060
00000000 00000000 00000000 00000000 00000000 00000000 00000000 00000000 ................................ 000080
00000000 00000000 00000000 00000000 00000000 00000000 00000000 00000000 ................................ 0000A0
00000000 003D4F46 4E495F45 4C49465F 435F020C 00000000 00000000 00000000 ............É._C_FILE_INFO=..... 0000C0
00000000 00000000 00000000 00008181 81010000 00010000 00000000 00000000 ................................ 0000E0
00000000 00000000 00000000 00000000 00000000 00000000 00000000 00000000 ................................ 000100
00000000 00000000 00000000 00000000 00000000 00000000 00000000 00000000 ................................ 000120
00000000 00000000 00000000 00000000 00000000 00000000 00000000 00000000 ................................ 000140
00000000 00000000 00000000 00000000 00000000 00000000 00000000 00000000 ................................ 000160
00000000 00000000 00000000 00000000 00000000 00000000 00000000 00000000 ................................ 000180
00000000 00000000 00000000 00000000 00000000 00000000 00000000 00000000 ................................ 0001A0
00000000 00000000 00000000 00000000 00000000 00000000 00000000 00000000 ................................ 0001C0
0A0A0A0A 0A0A0A0A 0A0A0A0A 0A0A0A0A 0A000000 00000000 00000000 00000000 ................................ 0001E0

Dump of file SATURN:[PCCOMMON.DUMP.DLL]UIW.TMP;1 on 18-APR-1990 10:53:22.77
File ID (940,4,0)    End of file block 88 / Allocated 88

Virtual block number 77 (0000004D), 512 (0200) bytes

0A0A0A0A 0A0A0A0A 0A0A0A0A 0A0A0A0A 0A0A0A0A 0A0A0A0A 0A0A0A0A 0A0A0A0A ................................ 000000
0A0A0A0A 0A0A0A0A 0A0A0A0A 0A0A0A0A 0A0A0A0A 0A0A0A0A 0A0A0A0A 0A0A0A0A ................................ 000020
0A0A0A0A 0A0A0A0A 0A0A0A0A 0A0A0A0A 0A0A0A0A 0A0A0A0A 0A0A0A0A 0A0A0A0A ................................ 000040
0A0A0A0A 0A0A0A0A 0A0A0A0A 0A0A0A0A 0A0A0A0A 0A0A0A0A 0A0A0A0A 0A0A0A0A ................................ 000060
0A0A0A0A 0A0A0A0A 0A0A0A0A 0A0A0A0A 0A0A0A0A 0A0A0A0A 0A0A0A0A 0A0A0A0A ................................ 000080
0A0A0A0A 0A0A0A0A 0A0A0A0A 0A0A0A0A 0A0A0A0A 0A0A0A0A 0A0A0A0A 0A0A0A0A ................................ 0000A0
0A0A0A0A 0A0A0A0A 0A0A0A0A 0A0A0A0A 0A0A0A0A 0A0A0A0A 0A0A0A0A 0A0A0A0A ................................ 0000C0
00000000 00000000 00000000 00000000 000A0A0A 0A0A0A0A 0A0A0A0A 0A0A0A0A ................................ 0000E0
20202020 20202020 20202020 20282828 28282020 20202020 20202000 00000000 ....            (((((            000100
10848484 84848484 84848410 10101010 10101010 10101010 10104820 20202020       H......................... 000120
01010101 01010101 01010101 01010101 01010101 81818181 81811010 10101010 ................................ 000140
02020202 02020202 02020202 02020202 02020202 82828282 82821010 10101010 ................................ 000160
00000000 00000000 00000000 00000000 00000000 00000000 00000020 10101010 ....  .......................... 000180
00000000 00000000 00000000 00000000 00000000 00000000 00000000 00000000 ................................ 0001A0
00000000 00000000 00000000 00000000 00000000 00000000 00000000 00000000 ................................ 0001C0
00000000 00000000 00000000 00000000 00000000 00000000 00000000 00000000 ................................ 0001E0

Dump of file SATURN:[PCCOMMON.DUMP.DLL]UIW.TMP;1 on 18-APR-1990 10:53:22.77
File ID (940,4,0)    End of file block 88 / Allocated 88

Virtual block number 78 (0000004E), 512 (0200) bytes

00000000 00000000 00000000 00000000 00000000 00000000 00000000 00000000 ................................ 000000
00000001 FFFF0000 00000A4A 00000200 FFFFFFFF 00000000 00000000 00000000 ...................J............ 000020
00000000 00000000 00000202 00000000 00000000 00000102 00000000 00000000 ................................ 000040
00000000 00000000 00000000 00000000 00000000 00000000 00000000 00000000 .........................  ..... 000060
00000000 00000000 00000000 00000000 00000000 00000000 00000000 00000000 ...........................  ... 000080
00000000 00000000 00000000 00000000 00000000 00000000 00000000 00000000 ................................ 0000A0
00000000 00000000 00000000 00000000 00000000 00000000 00000000 00000000 ................................ 0000C0
00000000 00000000 00000000 00000000 00000000 00000000 00000000 00000000 ................................ 0000E0
00000000 00000000 00000000 00000000 00000000 00000000 00000000 00000000 ................................ 000100
00000000 00000000 00000000 00000000 00000000 00000000 00000000 00000000 ................................ 000120
00000000 00000000 00000000 00000000 00000000 00000000 00000000 00000000 ................................ 000140
00000000 00000000 00000000 00000000 00000000 00000000 00000000 00000000 ................................ 000160
00000000 00000000 00000000 00000000 00000000 00000000 00000000 00000000 ................................ 000180
00000000 00000000 00000000 00000000 00000000 00000000 00000000 00000000 ................................ 0001A0
00000000 00000000 00000000 00000000 00000000 00000000 00000000 00000000 ................................ 0001C0
00000000 00000000 00000000 00000000 00000000 00000000 00000000 00000000 ................................ 0001E0
```

```
Dump of file SATURN:[PCCOMMON.DUMP.DLL]UIW.TMP;1 on 18-APR-1990 10:53:22.77
File ID (940,4,0)   End of file block 88 / Allocated 88

Virtual block number 79 (0000004F), 512 (0200) bytes

00000000 00000000 00000000 00000000 00000000 00000000 00000000 00000000 ................................ 000000
00000000 00000000 00000000 00000000 00000000 00000000 00000000 00000000 ................................ 000020
00000000 00000000 00000000 00000000 00000000 00000000 00000000 00000000 ................................ 000040
00000000 00000000 00000000 00000000 00000000 00000000 00000000 00000000 ................................ 000060
00000000 00000000 00000000 00000000 00000000 00000000 00000000 00000000 ................................ 000080
00000000 00000000 00000000 00000000 00000000 00000000 00000000 00000000 ................................ 0000A0
00000000 00000000 00000000 00000000 00000000 00000000 00000000 00000000 ................................ 0000C0
00000000 00000000 00000000 00000000 00000000 00000000 00000000 00000000 ................................ 0000E0
00000000 00000000 00000000 00000000 00000000 00000000 00000000 00000000 ................................ 000100
00000000 00000000 00000000 00000000 00000000 00000000 00000000 00000000 ................................ 000120
00000000 00000000 00000000 00000000 00000000 00000000 00000000 00000000 ................................ 000140
00000000 00000000 00000000 00000000 00000000 00000000 00000000 00000000 ................................ 000160
00000000 00000000 00000000 00000000 00000000 00000000 00000000 00000000 ................................ 000180
00000000 00000000 00000000 00000000 00000000 00000000 00000000 00000000 ................................ 0001A0
00000000 00000000 00000000 00000000 00000000 00000000 00000000 00000000 ................................ 0001C0
00000000 00000000 00000000 00000000 00000000 00000000 00000000 00000000 ................................ 0001E0

Dump of file SATURN:[PCCOMMON.DUMP.DLL]UIW.TMP;1 on 18-APR-1990 10:53:22.77
File ID (940,4,0)   End of file block 88 / Allocated 88

Virtual block number 80 (00000050), 512 (0200) bytes

00000000 00000000 00000000 00000000 00000000 00000000 00000000 00000000 ................................ 000000
00000000 00000000 00000000 00000000 00000000 00000000 00000000 00000000 ................................ 000020
00000000 00000000 00000000 00000000 00000000 00000000 00000000 00000000 ................................ 000040
00000000 00000000 00000000 00000000 00000000 00000000 00000000 00000000 ................................ 000060
00000000 00000000 00000000 00000000 00000000 00000000 00000000 00000000 ................................ 000080
00000000 00000000 00000000 00000000 00000000 00000000 00000000 00000000 ................................ 0000A0
00000000 00000000 00000000 00000000 00000000 00000000 00000000 00000000 ................................ 0000C0
00000000 00000000 00000000 00000000 00000000 00000000 00000000 00000000 ................................ 0000E0
00000000 00000000 00000000 00000000 00000000 00000000 00000000 00000000 ................................ 000100
00000000 00000000 00000000 00000000 00000000 00000000 00000000 00000000 ................................ 000120
00000000 00000000 00000000 00000000 00000000 00000000 00000000 00000000 ................................ 000140
00000000 00000000 00000000 00000000 00000000 00000000 00000000 00000000 ................................ 000160
00000000 00000000 00000000 00000000 00000000 00000000 00000000 00000000 ................................ 000180
00000000 00000000 00000000 00000000 00000000 00000000 00000000 00000000 ................................ 0001A0
00000000 00000000 00000000 00000000 00000000 00000000 00000000 00000000 ................................ 0001C0
00000000 00000000 00000000 00000000 00000000 00000000 00000000 00000000 ................................ 0001E0

Dump of file SATURN:[PCCOMMON.DUMP.DLL]UIW.TMP;1 on 18-APR-1990 10:53:22.77
File ID (940,4,0)   End of file block 88 / Allocated 88

Virtual block number 81 (00000051), 512 (0200) bytes

00000000 00000000 00000000 00000000 00000000 00000000 00000000 00000000 ................................ 000000
00000000 00000000 00000000 00000000 00000000 00000000 00000000 00000000 ................................ 000020
00000000 00000000 00000000 00000000 00000000 00000000 00000000 00000000 ................................ 000040
00000000 00000000 00000000 00000000 00000000 00000000 00000000 00000000 ................................ 000060
00000000 00000000 00000000 00000000 00000000 00000000 00000000 00000000 ................................ 000080
00000000 00000000 00000000 00000000 00000000 00000000 00000000 00000000 ................................ 0000A0
00000000 00000000 00000000 00000000 00000000 00000000 00000000 00000000 ................................ 0000C0
00000000 00000000 00000000 00000000 00000000 00000000 00000000 00000000 ................................ 0000E0
00000000 00000000 00000000 00000000 00000000 00000000 00000000 00000000 ................................ 000100
00000000 00000000 00000000 00000000 00000000 00000000 00000000 00000000 ................................ 000120
00000000 00000000 00000000 00000000 00000000 00000000 00000000 00000000 ................................ 000140
00000000 00000000 00000000 00000000 00000000 00000000 00000000 00000000 ................................ 000160
00000000 00000000 00000000 00000000 00000000 00000000 00000000 00000000 ................................ 000180
00000000 00000000 00000000 00000000 00000000 00000000 00000000 00000000 ................................ 0001A0
00000000 00000000 00000000 00000000 00000000 00000000 00000000 00000000 ................................ 0001C0
00000000 00000000 00000000 00000000 00000000 00000000 00000000 00000000 ................................ 0001E0
```

```
Dump of file SATURN:[PCCOMMON.DUMP.DLL]UIW.TMP;1 on 18-APR-1990 10:53:22.77
File ID (940,4,0)   End of file block 88 / Allocated 88

Virtual block number 82 (00000052), 512 (0200) bytes

00000000 00000000 00000000 00000000 00000000 00000000 00000000 00000000 ................................ 000000
00000000 00000000 00000000 00000000 00000000 00000000 00000000 00000000 ................................ 000020
00000000 00000000 00000000 00000000 00000000 00000000 00000000 00000000 ................................ 000040
00000000 00000000 00000000 00000000 00000000 00000000 00000000 00000000 ................................ 000060
00000000 00000000 00000000 00000000 00000000 00000000 00000000 00000000 ................................ 000080
00000000 00000000 00000000 00000000 00000000 00000000 00000000 00000000 ................................ 0000A0
00000000 00000000 00000000 00000000 00000000 00000000 00000000 00000000 ................................ 0000C0
00000000 00000000 00000000 00000000 00000000 00000000 00000000 00000000 ................................ 0000E0
00000000 00000000 00000000 00000000 00000000 00000000 00000000 00000000 ................................ 000100
00000000 00000000 00000000 00000000 00000000 00000000 00000000 00000000 ................................ 000120
00000000 00000000 00000000 00000000 00000000 00000000 00000000 00000000 ................................ 000140
00000000 00000000 00000000 00000000 00000000 00000000 00000000 00000000 ................................ 000160
00000000 00000000 00000000 00000000 00000000 00000000 00000000 00000000 ................................ 000180
00000000 00000000 00000000 00000000 00000000 00000000 00000000 00000000 ................................ 0001A0
00000000 00000000 00000000 00000000 00000000 00000000 00000000 00000000 ................................ 0001C0
00000000 00000000 00000000 00000000 00000000 00000000 00000000 00000000 ................................ 0001E0

Dump of file SATURN:[PCCOMMON.DUMP.DLL]UIW.TMP;1 on 18-APR-1990 10:53:22.77
File ID (940,4,0)   End of file block 88 / Allocated 88

Virtual block number 83 (00000053), 512 (0200) bytes

00000000 00000000 00000000 00000000 00000000 00000000 00000000 00000000 ................................ 000000
00000000 00000000 00000000 00000000 00000000 00000000 00000000 00000000 ................................ 000020
00000000 00000000 00000000 00000000 00000000 00000000 00000000 00000000 ................................ 000040
00000000 00000000 00000000 00000000 00000000 00000000 00000000 00000000 ................................ 000060
00000000 00000000 00000000 00000000 00000000 00000000 00000000 00000000 ................................ 000080
00000000 00000000 00000000 00000000 00000000 00000000 00000000 00000000 ................................ 0000A0
00000000 00000000 00000000 00000000 00000000 00000000 00000000 00000000 ................................ 0000C0
00000000 00000000 00000000 00000000 00000000 00000000 00000000 00000000 ................................ 0000E0
00000000 00000000 00000000 00000000 00000000 00000000 00000000 00000000 ................................ 000100
00000000 00000000 00000000 00000000 00000000 00000000 00000000 00000000 ................................ 000120
00000000 00000000 00000000 00000000 00000000 00000000 00000000 00000000 ................................ 000140
00000000 00000000 00000000 00000000 00000000 00000000 00000000 00000000 ................................ 000160
00000000 00000000 00000000 00000000 00000000 00000000 00000000 00000000 ................................ 000180
00000000 00000000 00000000 00000000 00000000 00000000 00000000 00000000 ................................ 0001A0
00000000 00000000 00000000 00000000 00000000 00000000 00000000 00000000 ................................ 0001C0
00000000 00000000 00000000 00000000 00000000 00000000 00000000 00000000 ................................ 0001E0

Dump of file SATURN:[PCCOMMON.DUMP.DLL]UIW.TMP;1 on 18-APR-1990 10:53:22.77
File ID (940,4,0)   End of file block 88 / Allocated 88

Virtual block number 84 (00000054), 512 (0200) bytes

00000000 00000000 00000000 00000000 00000000 00000000 00000000 00000000 ................................ 000000
00000000 00000000 00000000 00000000 00000000 00000200 00010000 00000000 ................................ 000020
00000000 00000000 00000000 00000000 00000000 00000000 00000000 00000000 ................................ 000040
00000000 00000000 00000000 00000000 00000000 00000000 00000000 00000000 ................................ 000060
00000000 00000000 00000000 00000000 00000000 00000000 00000000 00000000 ................................ 000080
00000000 00000000 00000000 00000000 00000000 00000000 00000000 00000000 ................................ 0000A0
00000000 00000000 00000000 00000000 00000000 00000000 00000000 00000000 ................................ 0000C0
00000000 00000000 00000000 00000000 00000000 00000000 00000000 00000000 ................................ 0000E0
00000000 00000000 00000000 00000000 00000000 00000000 00000000 00000000 ................................ 000100
00000000 00000000 00000000 00000000 00000000 00000000 00000000 00000000 ................................ 000120
00000000 00000000 00000000 00000000 00000000 00000000 00000000 00000000 ................................ 000140
00000000 00000000 00000000 00000000 00000000 00000000 00000000 00000000 ................................ 000160
00000000 00000000 00000000 00000000 00000000 00000000 00000000 00000000 ................................ 000180
00000000 00000000 00000000 00000000 00000000 00000000 00000000 00000000 ................................ 0001A0
00000000 00000000 00000000 00000000 00000000 00000000 00000000 00000000 ................................ 0001C0
00000000 00000000 00000000 00000000 00000000 00000000 00000000 00000000 ................................ 0001E0
```

```
Dump of file SATURN:[PCCOMMON.DUMP.DLL]UIW.TMP;1 on 18-APR-1990 10:53:22.77
File ID (940,4,0)    End of file block 88 / Allocated 88

Virtual block number 85 (00000055), 512 (0200) bytes

00000000 00000000 00000000 00000000 00000000 00000000 00000000 00000000 ................................ 000000
00000000 00000000 00000000 00000000 00000000 00000000 00000000 00000000 ................................ 000020
00000000 00000000 00000000 00000000 00000000 00000000 00000000 00000000 ................................ 000040
00000000 00000000 00000000 00000000 00000000 00000000 00000000 00000000 ................................ 000060
00000000 00000000 00000000 00000000 00000000 00000000 00000000 00000000 ................................ 000080
00000000 00000000 00000000 00000000 00000000 00000000 00000000 00000000 ................................ 0000A0
00000000 00000000 00000000 00000000 00000000 00000000 00000000 00000000 ................................ 0000C0
00000000 00000000 00000000 00000000 00000000 00000000 00000000 00000000 ................................ 0000E0
00000000 00000000 00000000 00000000 00000000 00000000 00000000 00000000 ................................ 000100
00000000 00000000 00000000 00000000 00000000 00000000 00000000 00000000 ................................ 000120
00000000 00000000 00000000 00000000 00000000 00000000 00000000 00000000 ................................ 000140
00000000 00000000 00000000 00000000 00000000 00000000 00000000 00000000 ................................ 000160
00000000 00000000 00000000 00000000 00000000 00000000 00000000 00000000 ................................ 000180
00000000 00000000 00000000 00000000 00000000 00000000 00000000 00000000 ................................ 0001A0
00000000 00000000 00000000 00000000 00000000 00000000 00000000 00000000 ................................ 0001C0
00000000 00000000 00000000 00000000 00000000 00000000 00000000 00000000 ................................ 0001E0

Dump of file SATURN:[PCCOMMON.DUMP.DLL]UIW.TMP;1 on 18-APR-1990 10:53:22.77
File ID (940,4,0)    End of file block 88 / Allocated 88

Virtual block number 86 (00000056), 512 (0200) bytes

00000000 00000000 00000000 00000000 00000000 00000000 00000000 00000000 ................................ 000000
00000000 00000000 00000000 00000000 00000000 00000000 00000000 00000000 ................................ 000020
00000000 00000000 00000000 00000000 00000000 00000000 00000000 00000000 ................................ 000040
00000000 00000000 00000000 00000000 00000000 00000000 00000000 00000000 ................................ 000060
00000000 00000000 00000000 00000000 00000000 00000000 00000000 00000000 ................................ 000080
00000000 00000000 00000000 00000000 00000000 00000000 00000000 00000000 ................................ 0000A0
00000000 00000000 00000000 00000000 00000000 00000000 00000000 00000000 ................................ 0000C0
00000000 00000000 00000000 00000000 00000000 00000000 00000000 00000000 ................................ 0000E0
00000000 00000000 00000000 00000000 00000000 00000000 00000000 00000000 ................................ 000100
00000000 00000000 00000000 00000000 00000000 00000000 00000000 00000000 ................................ 000120
00000000 00000000 00000000 00000000 00000000 00000000 00000000 00000000 ................................ 000140
00000000 00000000 00000000 00000000 00000000 00000000 00000000 00000000 ................................ 000160
00000000 00000000 00000000 00000000 00000000 00000000 00000000 00000000 ................................ 000180
00000000 00000000 00000000 00000000 00000000 00000000 00000000 00000000 ................................ 0001A0
00000000 00000000 00000000 00000000 00000000 00000000 00000000 00000000 ................................ 0001C0
00000000 00000000 00000000 00000000 00000000 00000000 00000000 00000000 ................................ 0001E0

Dump of file SATURN:[PCCOMMON.DUMP.DLL]UIW.TMP;1 on 18-APR-1990 10:53:22.77
File ID (940,4,0)    End of file block 88 / Allocated 88

Virtual block number 87 (00000057), 512 (0200) bytes

00000000 00000000 00000000 00000000 00000000 00000000 00000000 00000000 ................................ 000000
00000000 00000000 00000000 00000000 00000000 00000000 00000000 02DE162A *.B............................. 000020
00000000 00000000 00000000 00000000 00000000 00000000 00000000 00000000 ................................ 000040
00000000 00000000 00000000 00000000 00000000 00000000 00000000 00000000 ................................ 000060
00000000 00000000 00000000 00000000 00000000 00000000 00000000 00000000 ................................ 000080
00000000 00000000 00000000 00000000 00000000 00000000 00000000 00000000 ................................ 0000A0
00000000 00000000 00000000 00000000 00000000 20000000 00000000 00000000 .......... ..................... 0000C0
00000000 00000000 00000000 00000000 00000000 00000000 00000000 00000000 ................................ 0000E0
3FF00000 00000000 1D223666 1D1A151F 00000000 00FC291C 000000AE 029A0000 ....Ô....)•.........f6"........þ? 000100
47534D4E 3C3C0000 00000000 0000FFFF 3FE33333 33333333 3FC99999 9999999A ......è?33333333Ô?..........<<NMSG 000120
72726520 746E696F 7020676E 6974616F 6C66202D 0A004854 414D203A 00FD3E3E >>».: MATH..- floating-point err 000140
0A0D3020 79622065 64697669 64006700 0A006469 6C61766E 69006500 203A726F or: .e.invalid...g.divide by 0.. 000160
0A0D776F 6C667265 766F206B 63617473 006E000A 0D776F6C 66726576 6F006800 .h.overflow...n.stack overflow.. 000180
30303652 0000000A 00646574 6172656E 65672079 6C746963 696C7078 65007000 .p.explicitly generated.....R600 0001A0
200A0D33 30303652 0003000A 0D776F6C 66726576 6F206B63 61747320 2D0A0D30 0..- stack overflow.....R6003..- 0001C0
0A0D3830 30365200 08000A00 30207962 20656469 76696420 72656765 746E6920  integer divide by 0.....R6008.. 0001E0
```

```
Dump of file SATURN:[PCCOMMON.DUMP.DLL]UIW.TMP;1 on 18-APR-1990 10:53:22.77
File ID (940,4,0)    End of file block 88 / Allocated 88

Virtual block number 88 (00000058), 512 (0200) bytes

73746E65 6D756772 6120726F 66206563 61707320 6867756F 6E652074 6F6E202D - not enough space for arguments 000000
66206563 61707320 6867756F 6E652074 6F6E202D 0A0D3930 30365200 09000A0D .....R6009..- not enough space f 000020
65606974 2D6E7572 00FF000A 0D00FC00 0A0D746E 656D6E6F 7269766E 6520726F or environment...*......run-time 000040
6E696F70 20676E69 74616F6C 6620200A 0D323030 36520002 0020726F 72726520  error ...R6002..- floating poin 000060
0A440002 00000006 1D260002 0003FFFF FF000A0D 64656461 6F6C2074 6F6E2074 t not loaded.........&.......D. 000080
00000000 00000000 00000000 00000000 00000000 00000008 1C320002 00000007 ......2......................... 0000A0
00000000 00000000 00000000 00000000 00000000 00000000 00000000 00000000 ................................ 0000C0
00000000 00000000 00000000 00000000 00000000 00000000 00000000 00000000 ................................ 0000E0
00000000 00000000 00000000 00000000 00000000 00000000 00000000 00000000 ................................ 000100
00000000 00000000 00000000 00000000 00000000 00000000 00000000 00000000 ................................ 000120
00000000 00000000 00000000 00000000 00000000 00000000 00000000 00000000 ................................ 000140
00000000 00000000 00000000 00000000 00000000 00000000 00000000 00000000 ................................ 000160
00000000 00000000 00000000 00000000 00000000 00000000 00000000 00000000 ................................ 000180
00000000 00000000 00000000 00000000 00000000 00000000 00000000 00000000 ................................ 0001A0
00000000 00000000 00000000 00000000 00000000 00000000 00000000 00000000 ................................ 0001C0
00000000 00000000 00000000 00000000 00000000 00000000 00000000 00000000 ................................ 0001E0

Dump of file SATURN:[PCCOMMON.DUMP.DLL]UTL.TMP;1 on 18-APR-1990 10:53:36.50
File ID (957,10,0)    End of file block 75 / Allocated 76

Virtual block number 1 (00000001), 512 (0200) bytes

00000000 00000040 00000000 000000B8 0000FFFF 00000004 00000049 008E5A4D MZ..I...........|.......a....... 000000
00000080 00000000 00000000 00000000 00000000 00000000 00000000 00000000 ................................ 000020
6F6E6E61 63206D61 72676F72 70207369 685421CD 4C01B821 CD09B400 0EBA1F0E ..α..Ç.ël|.LëIThis program canno 000040
00000000 00000024 0A0D0D2E 65646F6D 20534F44 206E6920 6E757220 65622074 t be run in DOS mode....$....... 000060
0004000F 00000000 00090000 00000000 00008009 C1DAFB23 003C01D8 0505454E NE..Ä.<.#«Öë.................... 000080
00000000 00000000 00010002 00040000 00000294 01AC01A4 00C000B8 00400021 !.a.|.à.È.¯..................... 0000A0
03780F00 037800C0 04160F00 04150077 03080F00 0308002F 00280E00 0027002C ,.'...(./.Ä...Ä.w.......à.x...x. 0000C0
00E80F00 00E802FA 08DE0F00 08DE025F 00EE0F00 00EE024F 14600F00 146000FA ¤.'...'.O.Ÿ...Ÿ. .8...8.ª.Ò...Ò. 0000E0
02040E21 00000000 002C0F00 002A06F9 3E620F00 3E62030C 000F0F00 000F030A .........b>..b>T.*.........I... 000100
00FA0004 01040004 018F1EB1 018F0929 01D61EB1 01D60908 22700F21 20C406FD ».á l.p"..ø.Ÿ.ø.)...Ÿ.........ª. 000120
49464B43 49504C54 550E0001 554E4540 4E4F4954 504F4C54 55000000 4C545503 .UTL...UTLOPTIONMENU...UTLPICKFI 000140
42544553 4C545511 0003474C 44454C49 46455641 534C5455 0E000247 4C44454C LEDLG...UTLSAVEFILEDLG...UTLSETB 000160
54551200 05454741 5353454D 5445474C 54555F0E 0004544F 4F524E41 4D484341 ACHMANROOT..._UTLGETMESSAGE...UT 000180
53494C52 49444C4C 49464C54 55110006 584F4254 53494C45 4C49464C 4C49464C LFILLFILELISTBOX...UTLFILLDIRLIS 0001A0
4C54550E 0008544F 4F524E41 4D484341 42595245 55514C54 55130007 584F4254 TBOX...UTLQUERYBACHMANROOT...UTL 0001C0
0F000A48 54415045 534E4544 4E4F434C 54550F00 09525450 45544144 494C4156 VALIDATEPTR...UTLCONDENSEPATH... 0001E0

Dump of file SATURN:[PCCOMMON.DUMP.DLL]UTL.TMP;1 on 18-APR-1990 10:53:36.50
File ID (957,10,0)    End of file block 75 / Allocated 76

Virtual block number 2 (00000002), 512 (0200) bytes

5441504C 4C554645 4B414D4C 54550F00 0B574F44 4E495752 45544E45 434C5455 UTLCENTERWINDOW...UTLMAKEFULLPAT 000000
534F4408 52494452 55435153 4F440A4F 49530300 001D0019 00100001 00000C48 H..............SIO.DOSQCURDIR.DOS 000020
03050100 00030201 45544952 57534F44 084E4957 4D500547 534D0353 4C4C4143 CALLS.MSG.PMWIN.DOSWRITE........ 000040
01010091 03080101 D6030097 03030200 00030401 00000308 01000003 0701032D -.......................#........ 000060
53554220 6E616D68 6361421D 00000F34 03050100 00030301 00000306 01000003 .................4....Bachman BUS 000080
00000000 00000000 00000000 00006065 74737973 62757320 7974696C 69745520  Utility subsystem.............. 0000A0
8803EB00 00880574 1000A90A 75084602 0F107206 463B1575 0846030F 000000C8 à.....F.u.;F.r...F.u.¨..t.|..Š.| 0000C0
89000088 D88EFFFF B81E5657 000044C8 00000000 00000000 0004CAC9 D2330001 ..3øèò..........àD..WV.|...Ä|... 0000E0
006A006A FFFF68FF FF680042 681E006A 006ADE46 89E04689 000088DA 46890C46 FÉ.FÖ|...FÀ.FBj.j._hB.h..h..j.j. 000100
468BE246 89104688 08C483FF FF02B09A 5016E246 8D006A1E 6A0000FF FF9A046A j......j.j..Fã.P.¯.....á..F..Fã.F 000120
C40000FF FF9A236A 016A006A F05689EE 46890257 8B260788 260A5EC4 EC46890E ..Fšá^.&..&.W..FŸ.Vÿj.j.j#.....á 000140
E65689E4 46891456 8B12468B F47689F2 4E89F213 C8030677 8B26044F 8B260A5E ^.&.O.&.w..à.¨.N¨.v¶.F..V..Fõ.V| 000160
006A006A 0053681E 026A006A 0000FC46 C70001FA 46C70000 F846C7FF FFF646C7 úF-..úF%..úF¹..úF•..j.j..hS.j.j. 000180
6A006A50 16E2468D 006A036A 006A026A 006A006A 006A006A 006ADE76 FFE076FF .vÀ.vÞj.j.j.j.j.j.j.j.j..Fã.Pj.j 0001A0
BE76FF00 66E9B6EA B80006E9 0374BE46 0BBC468B 8E5689BC 46890000 FFFF9A00 .......F¥.Vf.F¥.F/t.Ò..¡õ.Õf..v/ 0001C0
006A006A 006A006A 5016C046 8D006A00 6A0000FF FF9A5016 E2468D00 6ABC76FF .v¥j..Fã.P.....j.j..Fâ.Pj.j.j.j. 0001E0
```

```
Dump of file SATURN:[PCCOMMON.DUMP.DLL]UTL.TMP;1 on 18-APR-1990 10:53:36.50
File ID (957,10,0)   End of file block 75 / Allocated 76

Virtual block number 3 (00000003), 512 (0200) bytes

 76FFFFD1 E90000FF FF9A5016 C0468D00 6A006A00 11E90375 00003D00 00FFFF9A .....*..u.Õ..j.j..Fè.P.....Õl..v 000000
 F8468807 8926F646 88065EC4 0000FFFF 9ABC76FF BE76FF00 0001409A E876FFEA õ.vÒ.ə....vƒ.v¥.....á^..F-&...F½ 000020
 77FF2604 77FF2608 5EC4D88E 0008881E 56570000 04C80010 CAC95F5E 1F0000E9 Õ...^_èò..à...WV.|...Äó^.&.w.&.w 000040
 0006E903 74D008FE 5689FC46 890000FF FF9A37FF 26085EC4 0A77FF26 085EC402 .á^.&.w.á^.&.7......F•.V±.Àt.Õ.. 000060
 085EC4FC 76FFFE76 FF0000FF FF9A0476 FF0676FF FC76FFFE 76FF0079 E90001B8 |..Õy..v±.v•.v..v.......v±.v•á^. 000080
 0C77FF26 085EC403 6A006AFC 76FFFE76 FF0000FF FF9A006A 0277FF26 0477EF26 &.w.&.w.j.......v±.v•j.j.á^.&.w. 0000A0
 6A016A00 6A018568 FC76FFFE 76FF0000 FFFF9A0A 6A006A00 6A1077FF 26085EC4 á^.&.w.j.j.j.......v±.v•h..j.j.j 0000C0
 1F0000E9 00008808 57892606 478926FE 5688FC46 88085EC4 0000FFFF 9A006A00 .j......á^..F•.V±&.G.&.W.|..Õ... 0000E0
 89FC4689 0C56880A 46880152 E90E4688 D88E0162 881E5657 000004C8 C3C95F5E ^_èúà...WV.|b..Ä.F.ÕR..F..V..F•. 000100
 26FC5EC4 0012E903 7500003D 08C483FF 19E81076 FF1276FF FC76FFFE 76FFFE56 V±.v±.v•.v..v.Ò...á.=..u.Õ..á^•& 000120
 46890000 FFFF9A00 6A1076FF 1276FF01 4AE90156 E900008A 00018886 EA1647C7 úG.õ.|..¤..ÕV.ÕJ..v..v.j.......F 000140
 C726FC5E C41C4789 260A4688 FC5EC400 16E90375 00187F83 26FC5EC4 FE5689FC •.V±á^•&....u.Õ..á^•.F.&.G.á^•&ú 000160
 03740A46 391C4788 26FC5EC4 0048E903 74FF147F 8326FC5E C40055E9 00001847 G...ÕU.á^•&....t.ÕH.á^•&.G.9F.t. 000180
 6A006A2A 6A0677FF 260877FF 26FC5EC4 0023E903 74001A7F 8326FC5E C40039E9 Õ9.á^•&....t.Õ#.á^•&.w.&.w.j*j.j 0001A0
 88FC5EC4 00001A47 C726FC5E C400D1E9 00008A00 01880000 01F49A00 6A006A00 .j.j..¶...|..¤..Õ‡.á^•&úG...á^•. 0001C0
 88000003 2E9A006A 1076FF12 76FF00A9 E90085E9 00008A00 01881447 89260A46 F.&.G.|..¤..Õç.Õ`..v..v.j....... 0001E0

Dump of file SATURN:[PCCOMMON.DUMP.DLL]UTL.TMP;1 on 18-APR-1990 10:53:36.50
File ID (957,10,0)   End of file block 75 / Allocated 76

Virtual block number 4 (00000004), 512 (0200) bytes

 026A9A00 6A1076FF 1276FF00 86E90092 E90C5688 0A468800 011A47C7 26C28ED8 Ä.ô&úG....F..V.Õ..Õ...v..v.j..j. 000000
 02D69A00 6A006A00 6A006A2A 6A1076FF 1276FF14 4789260A 4688C28E D8880000 ...Ä.ô.F.&.G..v..v.j*j.j.j.j..ø. 000020
 E90000FF FF9A0676 FF0876FF 0A76FF0C 76FF0E76 FF1076FF 1276FF00 56E90000 ..ÕV..v..v..v..v..v..v..v......Õ 000040
 FFADE903 7500293D FF9DE903 7500203D FEA6E903 7500013D 0033E900 36E90042 8.Õ6.Õ3.=..u.Õ!±= .u.Õ..=).u.ÕÙ. 000060
 008A0000 88FFAAE9 FF5AE903 75004E3D FF9DE903 7500353D FEC9E903 7500343D =4.u.Õè±=5.u.Õ..=N.u.ÕZ.Õ`.|..¤. 000080
 0000FFFF 9A006A00 6AD88E02 1C881E56 57000000 C8000ECA C95F5E1F 0000E900 .Õ...^_èò..à...WV.|...Äj.j...... 0000A0
 00040033 010300F3 000403CC 01030000 00020027 00020013 CBC95F5E 1F0000E9 Õ...^_Ëù....'.......ä...µ...3... 0000C0
 000401DE 01030000 000A0043 00020007 00040135 01030006 00040002 01030003 ....Þ.......5.......C.......ß... 0000E0
 000003C3 0002010E 000400F8 01030100 00040308 01030088 0004017F 01030008 ....................«.......û... 000100
 0004036B 01030018 000401A3 01030017 00040188 01030095 00040068 01030000 ....k.......Ê.......Ê.......k... 000120
 0004034E 01030044 00040127 01030041 00040111 01030214 0002002A 000500B2 ÿ...*...........A...'...D...N... 000140
 FF0876FF D88EFFFF 881E5657 00002CC8 00000000 00000000 00000000 00000045 E................à,..WV.|...Ä.v.. 000160
 00003D9A 5016D446 8DFA76FF FC76FFFC 5689FA46 890000FF FF9A006A 056A0676 v.j.j.......Fª.V•.v•.vª.Fà.P.•.. 000180
 E8462BF0 4688FE46 89E4462B EC468800 00FFFF9A 5016E446 800676FF 0876FF00 ..v..v..FÖ.P......F§+FÕ.F±.FÞ+FÒ 0001A0
 FFF44689 F8D1C22B 99F6462B E0468BF8 4689F8D1 C22B99FE 462BDC46 8BF64689 .F~.FÉ+F±.+ôÌ½.F½.FÁ+F~.+ôÌ½.F¶. 0001C0
 0000E900 00B80000 FFFF9A02 6A006A00 6AF476FF F876FF03 6A006A06 76FF0876 v..v.j.j..v½.v¶j.j.j......|..Õ.. 0001E0

Dump of file SATURN:[PCCOMMON.DUMP.DLL]UTL.TMP;1 on 18-APR-1990 10:53:36.50
File ID (957,10,0)   End of file block 75 / Allocated 76

Virtual block number 5 (00000005), 512 (0200) bytes

 1076FF00 01FE46C7 0001FC46 C7D88E00 08881E56 5700012C C80004CA C95F5E1F .^_èò..à,..WV.|...ÄúF•..úF±...v. 000000
 006A016E 680A76FF 0E76FF10 76FF0000 FFFF9A50 16F0468D 086A0C76 FF0E76FF .v..v.j..FÞ.P......v..v..v.hn.j. 000020
 01176850 16FED486 8D176A50 16FC4680 5016F046 8D000001 3C9A006A 006A006A j.j.j..<....FÞ.P.F•.Pj...å±.Ph.. 000040
 2FE90374 1111FEE8 86F70058 E9037400 003D0000 FFFF9A00 6A006A50 16FE468D .F±.Pj.j......=..t.ÕX.%.Õ±..t.Õ/ 000060
 61680A76 FF0E76FF 1076FF00 18E90375 00FEECBE 80000AE9 03742EFE E88E8000 ../Š±.t.Õ.../š±.u.Õ...v..v..v.ha 000080
 16FE4680 01176850 16FED486 80FC76FF 00000173 9A5016FE E8868OFE 6A006A01 .j.j±..Š±.P.s....v•..å±.Ph...F±. 0000A0
 006A006A 006A0164 680A76FF 0E76FF10 76FFFFA8 E9037500 003D0000 FFFF9A50 P.....=..u.Õ´..v..v..v.hd.j.j.j. 0000C0
 0000FFFF 9A006A00 6A006A00 6A016068 0A76FF0E 76FF1076 FF000001 8C9A016A j.......v..v..v.h'.j.j.j.j...... 0000E0
 0000FFFF 9A0676FF 0876FF0C 76FF0E76 FF1076FF 0020E903 7400EE7E 83EE4689 .F¥.~Ÿ.t.Õ-..v..v..v..v..v...... 000100
 1F0000E9 00008800 00FFFF9A 50520000 FFFF9A0C 76FF0E76 FF1076FF 016A006A j.j..v..v..v......RP.....|..Õ... 000120
 86C70090 FF5C86C7 0001FF6A 86C7D88E 009FB81E 56570002 4EC8000C CAC95F5E ^_èò..àN..WV.|...Äú.j...ú.\...ú. 000140
 16FE468D 0000FF5E 86C708C4 83025E00 569A5016 FF668680 0064681E 0001FF6C l¯...hd...f..P.V.^..á.ú.^....F±. 000160
 C43A0147 C626065E C4078826 4004FE46 8A065EC4 0000FFFF 9A5016FF 60868050 P..`..P.....á^..F±.ə&..á^.&6G.:á 000180
 5016FECA 868D5052 00030508 568B0646 88006A00 40FECA86 C75C0247 C626065E ^.&6G.\ú.ò±ə.j..F..V....RP..ò±.P 0001A0
 01FF5E86 C70006E9 03770003 3004C483 02F30086 9A0676FF 0876FF00 0002D39A .Æ....v..v..Ñ.µ..á.=..w.Ĉ .ú.^.. 0001C0
 6E680A76 FF0E76FF 1076FF00 0001AC9A 0676FF08 76FF0C76 FF0E76FF 1076FF00 ..v..v..v..v..v..¯....v... .v.hn 0001E0
```

```
Dump of file SATURN:[PCCOMMON.DUMP.DLL]UTL.TMP;1 on 18-APR-1990 10:53:36.50
File ID (957,10,0)   End of file block 75 / Allocated 76

Virtual block number 6 (00000006), 512 (0200) bytes

                                                                         .j.j.j.j......ó.d.CÕ..±.d../d.Zv 000000
765AFF64 BE80FF64 86FE0004 E943FF64 86C60000 030F9A00 6A006A00 6A006A01 .Õb...d...f...d.*ð-à.P..n..P..\. 000020
FF5C868D 5016FF6E 868D5000 402DE42A FF64868A FF668688 FF64868A 0062E903 .P.....=..t.Õ4...f.*ðP.hg...ä±.P 000040
5016FECC 868D0067 681E50E4 2AFF6686 8A0034E9 03740000 3D0000FF FF9A5016 .½.y..á..v..v..v.ha.j.j...ä±.P.■ 000060
D79A5016 FECC868D FF6A006A 0161680A 76FF0E76 FF1076FF 0AC48303 7900F89A ...Õ...hn...j..Pj...ÿ».Ph....l.. 000080
16FF6C86 8D011768 5016FDB2 8680176A 5016FF6A 8680006E 681EFF90 E9000000 Pj.j..*...=..t.Õw.-.ó».u.ÕM../è» 0000A0
FDC9BE80 0040E903 7510FDC6 86F60077 E9037400 00300000 00FA9A00 6A006A50 .t.Õ.../ò».u.Õ9../è».u.Õ....è».P 0000C0
5016FDC9 868D0014 E903752E FDC9BE80 0039E903 7500FDCA BE80000A E903742E ..ä±.P.V....á..v..v..v.ha.j.j±.. 0000E0
868DFE6A 006A0161 680A76FF 0E76FF10 76FF08C4 83FFFF00 569A5016 FECC868D ä±.P.š....Ñj...ÿ».Ph....l..P.R.. 000100
0001529A 5016FF6C 868D0117 685016FD B28680FF 6AB6FF00 0003EC9A 5016FECC .=..u.Õ.../^..u.Õ-..hr...ä±.P.V. 000120
00569A50 16FECC86 8D007268 1E002DE9 037500FF 5EBE83FF 89E90375 00003D00 ...ó..v..v..v.ha.j.j...ä±.P..... 000140
00000405 9A5016FE CC868000 6A006A01 61680A76 FF0E76FF 1076FF08 C4830201 .v..v..v.hd.j.j.j.j.......|..Õ... 000160
1F0000E9 00008800 00029A9A 016A006A 006A006A 0164680A 76FF0E76 FF1076FF ^ èò.....Q....................... 000180
03008600 04028101 03007F00 04039501 03000500 01025102 03000E0C CAC95F5E .7...............Å......ƒ...... 0001A0
02001300 0401BE01 03000000 0A030000 02000800 04008601 03008700 04008E01 .B..............-.......ó...à.. 0001C0
03004000 02033601 03001A00 04002D01 03001900 04001701 03000000 0001DE00 .Ü...A.......H...é...M.......... 0001E0
00000000 00000000 00004D00 0401C501 03004800 02021801 03004100 0203AD01

Dump of file SATURN:[PCCOMMON.DUMP.DLL]UTL.TMP;1 on 18-APR-1990 10:53:36.50
File ID (957,10,0)   End of file block 75 / Allocated 76

Virtual block number 7 (00000007), 512 (0200) bytes

                                                                         àY..WV.¡...Ä.v..v......P.V.-..ó. 000000
08C48300 2D00569A 5016FF00 868D1076 FF1276FF D88EFFFF 881E5657 0001EEC8 .hx......P...|..ó.ú.H±..Õ....H±. 000020
83FE4886 FF0004E9 0000FE48 86C708C4 83007C00 109A5016 FF00868D 0078681E /H±.r.Õ..kÑH±...J±.ÑH±èl....±... 000040
14928CFE 12828902 E6C1FE48 B68BFE4A 828014FE 48866800 18E90372 09FE488E ±Õ■..F...ó±..8±.h)..v..v....à..ó 000060
C48300C8 02049A14 76FF1676 FF007D68 1EFE3896 8CFE3686 891A468D FFD7E9FE ...<±..>±ú.±±..Õ....±±./±±.r.Õú. 000080
01C7E903 7209FEFE BE83FEFE 86FF0004 E90000FE FE86C7FE 3E9689FE 3C868908 .F.9.±±r.Õ£...<±..>±u.ÕÚ..h...Ñ> 0000A0
3EB6FF00 7F681E01 AEE90375 FE3E8608 FE3C8688 018BE903 72FEFE86 39184688 ±.Ñ<±.Ì.&..ó...D±..F±ó.D±&...Õ.. 0000C0
012EE998 078A26FE 449EC4FE 469689FE 44868908 C4830126 01A69AFE 3CB6FFFE ..ó±.ó.ó±&.G=&.W±.Ñ±±èl....±...± 0000E0
FE149289 FE128289 02E6C1FE FEB688FE 578826FC 478826FE 369EC404 FE368683 Õl...ó±.ó.ó±&.w±.Ñ>±.Ñ<±kÑ±±...J 000100
4A828014 FEFEB668 FE3CB6FF FE3EB6FF FE77FF26 FE369EC4 02FE3686 830149E9 ±.P.½.Q..ó.Õ....ó±.ó.ó±&.w±.Ñ>±. 000120
FFFE3EB6 FFFE77FF 26FE369E C402FE36 8683011E E90AC483 015100F8 9A5016FE Ñ<±kÑ±±...J±.P.½....ó.Õµ.ó.D±&.. 000140
7F8026FE 449EC400 F3E90AC4 83019200 F89A5016 FE4A828D 14FEFEB6 6BFE3CB6 .ut.Õ3...ó±.á.ó±&.w±&.w•.Ñ>±.Ñ<± 000160
FE3CB6FF FE3EB6FF FC77FF26 FE77FF26 FE369EC4 04FE3686 830033E9 03747501 .Ñ±±èl..ý.±.ý.±.½.é..ó.ÕO...ó±.ó 000180
C404FE36 86830030 E90CC483 01C500F8 9AFE12B2 FFFE14B2 FF02E6C1 FEFEB688 .ó±&.w±&.w•.Ñ>±.Ñ<±.Ñ±±èl..ý.±.ý 0001A0
82FFFE14 82FF02E6 C1FEFEB6 88FE3C86 FFFE3EB6 FFFC77FF 26FE77FF 26FE369E .±.½....á.Õ....ó±.ó.ó±&.w±&.w•&. 0001C0
FF26FC77 FF26FE77 FF26FE36 9EC408FE 36868300 7FE90CC4 83020000 F89AFE12 w*&.w½.Ñ>±.Ñ<±.Ñ±±èl..ý.±.ý.±.½. 0001E0
00F89AFE 1282FFFE 1482FF02 E6C1FEFE B68BFE3C B6FFFE3E B6FFF877 FF26FA77

Dump of file SATURN:[PCCOMMON.DUMP.DLL]UTL.TMP;1 on 18-APR-1990 10:53:36.50
File ID (957,10,0)   End of file block 75 / Allocated 76

Virtual block number 8 (00000008), 512 (0200) bytes

                                                                         W..ó.ÕO.ÕA.Õ>.=f.-.Õ..=e.|.Õ£.=E 000000
4530FFAF E9037C00 6530001B E9037E00 6630003E E90041E9 0044E910 C4830257 .u.Õl.=d.u.Õl±Õ■.=l.u.Õ .=s.u.Õ. 000020
9FE90375 007330FF 20E90375 006C30FF D7E9FED5 E9037500 6430FFA7 E9037500 ±=u.u.Õl±Õ¥..h..j.j....'..ó...<± 000040
FE3C8689 08C48303 6002049A 006A006A 0087681E FFBCE9FE E5E90375 007530FE ..>±Õ+±...±.P.Ñ±±.v..v.ó' ¼.7.v. 000060
0676FF37 FF260C5E C40876FF 0A76FFFE FEB6FF50 16FE1286 8DFE28E9 FE3E9689 .....P..:±.P.......à±./à±.. ÕÌ.ó 000080
C400A7E9 037500FE 40BE83FE 408689FF FF00109A 5016FE3A 868D5016 FF008680 ^.&ó....à±ÕK.ú.B±þ.Õ..ú.B±þ.Ô..ú 0000A0
C70084E9 86F0FE42 86C70080 E986F1FE 4286C700 48E9FE40 86880007 C626085E .B±·.Õ(.ú.B±µ.Õr.ú.B±¶.Õi.ú.B±%. 0000C0
86F5FE42 86C70069 E986F4FE 4286C700 72E986F3 FE4286C7 007BE986 F2FE4286 Õ'.ú.B±-.ÕW.ú.B±%.ÕN.ÕK.==.u.Õà. 0000E0
FFC8E903 75013030 0048E900 4EE986F7 FE4286C7 0057E986 F6FE4286 C70060E9 v.Õ..=..u.Õ`.=ö.u.Õ..=<.u.ÕA.Õ#. 000100
0023E9FF A2E90375 013C30FF 98E90375 00CE3DFF A9E90375 00023D00 18E90376 =>.u.Õ`.=?.u.Õ¨.=à.u.Õ¨.=A.u.Õ¨. 000120
FFACE903 75014130 FFA8E903 75014030 FFAAE903 75013F30 FFA9E903 75013E3D Õ..Õ.....:±áv.&ó..ú.B±...v..v..Ñ. 000140
00B69A08 76FF0A76 FF0000FE 4286C700 00C62608 76C4FE3A 9E880011 E90000E9 ...á.á^.&....B±Õ...^_èü......... 000160
000A001B 00020003 90CBC95F 5E1F0000 E9FE4286 88078926 0C5EC404 C483FFFF ................................ 000180
00000000 00000000 00000000 00000000 00000008 00020000 0008028F 00020000 à>..WV.¡...ÄúF*..úF±...v..v.j... 0001A0
868D146A 0E76FF10 76FF0000 FE46C700 01FA46C7 D88EFFFF 881E5657 00033EC8 8±.P.....=..u.Õ..¡Ú.Õú...Õ».P..8 0001C0
DE868D50 16FDDA86 8D01C3E9 86EDB800 06E90375 00003DFF FF00009A 5016FEDE ±.P.i....ó..v..v..v...Õ».P...... 0001E0
FF0000FF FF9A5016 FD0A8680 0A76FF06 76FF0876 FF08C483 00980069 9A5016FE
```

```
Dump of file SATURN:[PCCOMMON.DUMP.DLL]UTL.TMP;1 on 18-APR-1990 10:53:36.50
File ID (957,10,0)   End of file block 75 / Allocated 76

Virtual block number 9 (00000009), 512 (0200) bytes

 F2868D50 16FC468D 0000014D 9A006A00 6A006A00 6A016E68 0C76FF06 76FF0876 v..v..v.hn.j.j.j.j..M....F•.P..· 000000
 0CC483FF FF13CA9A 0E76FF10 76FF008A 681E5016 FEF8868D 0000FFFF 9A5016FE ±.P.......½±.P.h...v..v..ò....á. 000020
 5016FA46 8D011768 5016FCC2 8680106A 5016F846 8D5016FE F8868DFF FFF846C7 úF½....½±.P.F½.Pj...ò•.Ph...F•.P 000040
 86F6FEDC 968CFEDA 8689FCD9 868D0098 E9037500 FA7E8300 00FFFF9A 006A006A j.j.......-•.u.Õ....)•..Õ±..É±-. 000060
 75000030 08C48301 13008C9A FEDAB6FF FEDCB6FF 008E681E 0069E903 7510FCD6 ø•.u.Õi..h...ÑÉ±.ÑÖ±......á.=..u 000080
 0031E903 75000030 08C48301 31008C9A FEDAB6FF FEDCB6FF 0091681E 004DE903 .ÕM..h...ÑÉ±.ÑÖ±...1..á.=..u.Õ1. 0000A0
 680C76FF 0676FF08 76FF08C4 8301D700 569A5016 FDDA868D FEDAB6FF FEDCB6FF .ÑÉ±.ÑÖ±..Õ».P.V.■..á..v..v..v.h 0000C0
 FA468001 17685016 FCC28680 F876FF00 0001949A 5016FDDA 868DFE6A 006A0161 ø.j.j±..Õ».P......v½..ò•.Ph...F• 0000E0
 FF0019E9 03750003 7F80260E 5EC40000 FFFF9AF8 76FFFF5F E90000FF FF9A5016 .P.....Õ ..v½.....á^.£....u.Õ... 000100
 000CE941 FEF686C6 000001F3 9A009368 1E006A00 6A016168 0C76FF06 76FF0876 v..v..v.ĥa.j.j..h...µ...ó.-±AÕ.. 000120
 0374013C 0124FEF2 868A0044 E903765A FEF6BE80 FEF29ED1 FEF4AED1 FEF686FE ±.-±lÛ¶±l.·±./-±Zv.ÕD...·±$.<.t. 000140
 FF0876FF 0AC483FF FF00F89A 5016FDDA 868D0096 681E50E4 2AFEF686 8A0034E9 Õ4...-±*ôP.h....Õ».P.½....á..v.. 000160
 C8CBC95F 5E1FFFA6 E90000FF FF9A5016 FDDA868D FF6A006A 0161680C 76FF0676 v..v.ha.j.j...Õ».P.....Õl..^_èùà 000180
 FCE0868D 0100680A 76FF0676 FF0876FF 0001FC46 C7D88E00 08881E56 57000320  ..WV.|..:ÁúF•...v..v..v.h....Á• 0001A0
 00000303 9A006A00 6A006A00 6A016E68 0C76FF06 76FF0876 FF0000FF FF9A5016 .P......v..v..v.hn.j.j.j.j...... 0001C0
 76FF08C4 8300F700 569A5016 FCE0868D 1276FF14 76FF0028 E9037400 FCE08E80 .ƒÁ•.t.Õ(..v..v...Á•.P.V.½..á..v 0001E0

Dump of file SATURN:[PCCOMMON.DUMP.DLL]UTL.TMP;1 on 18-APR-1990 10:53:36.50
File ID (957,10,0)   End of file block 75 / Allocated 76

Virtual block number 10 (0000000A), 512 (0200) bytes

 76FF5016 FCE0868D 5016FDE0 868D0000 00589A50 16FCE086 8D011868 0676FF08 ..v.h....Á•.P.(.....Á».P..Á•.P.v 000000
 868D176A 5016FE46 8D5016FD E0868DFF FFFE46C7 0CC48300 4613CA9A 0E76FF10 ..v..ò.F..á.úF±....Á».P.F±.Pj... 000020
 868D0062 E9037500 FC7E8300 0000C59A 006A006A 5016FC46 8D011768 5016FEE0 Á±.Ph...F•.Pj.j..é....-■.u.Õb... 000040
 C40000E9 03742E3F 8026F85E C40034E9 03741111 FEF486F7 FA568CF8 4689FEF7 ½±.F½.V•½.¶±..t.Õ4.á^½£.?.t.Õ..á 000060
 FFFA76FF FE6A006A 0161680C 76FF0676 FF0876FF 001BE903 7500017F 8026F85E ^½£....u.Õ...v..v..v.ha.j.j±.v•. 000080
 FF95E900 0001639A 5016FC46 8D011768 5016FEE0 868DFE76 FF000000 749AF876 v½.t....v±..Á±.Ph...F•.P.c...Õ.. 0000A0
 88F04689 0E468BD8 8E0207B8 1E565700 0218C8CB C95F5E1F 0000016E 9AFE76FF .v±.n....^_èùà...WV.|...Ä.F..Fþ. 0000C0
 0B14468B 0003FA46 C7F85689 F6468908 568B0646 8BF45689 F246890C 568B0A46 F..V..F·.V¶.F..V..F-.V½úF•...F.. 0000E0
 849A5016 FDE8868D 5016FC46 8D004BE9 0374003F 8026145E C4000CE9 03751646 F.u.Õ..á^.£.?.t.ÕK..F•.P..Õ».P.. 000100
 F3868000 6A0100FE 46C75CFD F286C63A FDF186C6 FDF08688 4004FC46 8A000000 ....F•.ə..Þ»ó.þ»:ó.·»\úF±..j...µ 000120
 76FF0030 E90003E9 86E8B800 06E90375 00003000 00FFFF9A 5016FE46 8D5016FD ».P.F±.P.....•..u.Õ..|Š.ÕŒ.ÕO..v 000140
 1476FF16 76FF0084 E986ED88 0006E903 73010030 04C48303 E900B69A 1476FF16 ..v..Ñ.Õ..á.=..s.Õ..|Ú.ÕÇ..v..v. 000160
 003F8026 105EC400 0CE90375 12460810 468808C4 83041200 569A5016 FDF08680 ..Þ».P.V....á..F..F.u.Õ..á^.£.?. 000180
 1076FF12 76FF0030 E908C483 04230056 9A5016FE F0868D00 9C681E00 15E90374 t.Õ...h....Þ±.P.V.#..á.ÕO..v..v. 0001A0
 FEF0868D 1076FF12 76FF0058 E986EDB8 0006E903 73010030 04C48304 4500B69A .Ñ.E..á.=..s.Õ..|Ú.ÕX..v..v...Þ± 0001C0
 1F5C068E FFFF6802 87681876 FF1A76FF 1C76FF1E 76FF08C4 83025900 569A5016 .P.V.Y..á..v..v..v..v.h..h....\. 0001E0

Dump of file SATURN:[PCCOMMON.DUMP.DLL]UTL.TMP;1 on 18-APR-1990 10:53:36.50
File ID (957,10,0)   End of file block 75 / Allocated 76

Virtual block number 11 (0000000B), 512 (0200) bytes

 FFFDEEB6 FFFDEE96 89FDEC86 890000FF FF9A5016 FDF0868D 01046802 0036FF26 £.6..h....Þ».P.......$»..Ÿ».ÑŸ». 000000
 8E0335B8 1E565700 0472C800 1ACAC95F 5E1F0000 E9FA468B 0000FFFF 9AFDEC86 Ñš»......F•Õ...^_èò..àr..WV.|5.. 000020
 FF000005 C09A5052 00000589 9A006A03 6A016A00 6A016A00 6A0887E9 0E468BD8 Ä.F.Õ..j.j.j.j.j¯j..¿...RP.á.... 000040
 06468800 00FFFF9A 0676FF08 76FF006A 1076FF12 76FFFFFF 00009A10 76FF1276 v..v.......v..v.j..v..v.......F. 000060
 1076FF12 76FF001F E9037501 020087F6 26FE929E C4FE9496 89FE9286 89085688 .V....±...±á..±£-....u.Õ...v..v. 000080
 681076FF 1276FF00 18E90000 05309A02 0687FF26 020887FF 26FE929E C4011868 h..á..±£.ñ..£.ñ...O...Õ...v..v.h 0000A0
 68016868 FE92B6FF FE94B6FF 0000026E 9A505201 0005FE94 968BFE92 86880118 .....±...±...RP.n....Ñ.±.Ñ.±hh.h 0000C0
 9486FF50 52010005 FE949688 FE928688 0CC48305 7400009A 1076FF12 76FF0136 6..v..v....t..á....±...±...RP.Ñ. 0000E0
 681076FF 1276FF10 C48306AB 01FF9A10 76FF1276 FF011868 014A68FE 9286FFFE ±.Ñ.±hJ.h...v..v....¯..á..v..v.h 000100
 B7FF26FE 929EC410 76FF1276 FF000006 299A006A 006A0100 68006A01 43680118 ..hC.j.h..j.j..)....v..v.á..±£.ñ 000120
 9A505200 00FFFF9A 006A016A 016A006A 016A006A 0000FFFF 9A0202B7 FF260204 ..£.ñ.......j.j.j.j.j.j......RP. 000140
 FFFF9A20 6A006A00 A0681E00 A5681E10 76FF1276 FF016A00 6A0792E9 0000FFFF ....Õ..j.j..v..v..hÈ..h..j.j ... 000160
 FF0056E9 0374014A FA7E8100 0AE90375 0168FA7E 81FA4689 0A468807 74E90000 ..Õt..F..F•.-•h.u.Õ...-•J.t.ÕV.. 000180
 016568FA 76FF1076 FF1276FF FE949689 FE928689 0000FFFF 9A006A10 76FF1276 v..v.j.........±...±.v..v..v•he. 0001A0
 2BFE468B 016868FA 76FF1076 FF1276FF FE468900 0006519A 006A006A 006A006A j.j.j.j..Q....F±.v..v..v•hh..F±+ 0001C0
 86890C46 8B02D7E9 FA468800 00023C9A 5016FC90 868D5052 0100CA81 00000002 Ø....ò..RP...•.P.<....F•Õ■..F... 0001E0
```

```
Dump of file SATURN:[PCCOMMON.DUMP.DLL]UTL.TMP;1 on 18-APR-1990 10:53:36.50
File ID (957,10,0)    End of file block 75 / Allocated 76

Virtual block number 12 (0000000C), 512 (0200) bytes

908688FC 91868A00 15E90374 5BFC90BE 800206E9 0003E903 7505FE90 BE83FE90 .±./.±.u.Õ..Õø../.•[t.Õ.....•... 000000
FD90868D 5016FC90 868DFE92 B6FFFE94 B6FF00FC 9286C6FC 918688FC 92868AFC •...•...•ó..•..Ñ.±.Ñ.±...•.P...» 000020
FD90868D 5016FB8E 868D5016 FC90868D FC468906 C50F349A 5016FB8E 868D5016 .P...«.P.4.é..F•...•.P...«.P...» 000040
76FF5016 FC90868D 020287FF 260204B7 FF26FE92 9EC40CC4 83045713 CA9A5016 .P.ò.W..á.á..±&.ñ..&.ñ.....•.P.v 000060
FF016A00 6A001CE9 037500FC 7E83FC46 890EC483 075A00D6 9A1076FF 1276FFFC •.v..v..ø.Z..á..F•.~•.u.' .j.j.. 000080
94B6FF50 16FD9086 8D022EE9 000008C0 9A505200 0008899A 01186810 76FF1276 v..v.h...¿...RP.â...Õ.... •.P.Ñ. 0000A0
329AFE92 B6FFFE94 B6FF0136 681076FF 1276FF08 C48307FD 00569AFE 92B6FFFE ±.Ñ.±.V.»..á..v..v.h6..Ñ.±...±.2 0000C0
FF0CC483 07930000 9A1076FF 1276FF01 36680168 68FE92B6 FFFE94B6 FF000008 ....Ñ.±.Ñ.±hh.h6..v..v.......á.. 0000E0
868DFE92 B6FFFE94 B6FF0000 09949A50 16FC9086 8D010068 01186810 76FF1276 v..v.h..h.....•.P.......Ñ.±.Ñ.±.. 000100
868D5016 FC90868D FC468907 AD0F349A 5016FB8E 868D5016 FD90868D 5016FC90 .•.P...».P...«.P.4.Ü..F•...•.P.. 000120
020287FF 260204B7 FF26FE92 9EC40CC4 83070213 CA9A5016 FD90868D 5016FB8E .«.P...».P.ò.ø..á.á..±&.ñ..&.ñ.. 000140
037500FC 7E83FC46 890EC483 084D00D6 9A1076FF 1276FFFC 76FF5016 FC90868D ...•.P.v•.v..v..ø.M..ó..F•.~•.u. 000160
83081800 8C9AFE92 B6FFFE94 B6FF5016 FD90868D 00A6E903 7401FC7E 830009E9 Õ...~•.t.ÕI....».P.Ñ.±.Ñ.±...... 000180
08C4830A 3F00569A FE92B6FF FE94B6FF 5016FD90 868D0048 E9037500 003008C4 á.=..u.ÕH....».P.Ñ.±.Ñ.±.V.?..á. 0001A0
6868FE92 B6FFFE94 B6FF0000 08629AFE 92B6FFFE 9486FF01 36681076 FF1276FF .v..v.h6..Ñ.±.Ñ.±.b....Ñ.±.Ñ.±hh 0001C0
16FB8E86 8D011868 1076FF12 76FF0CC4 83088A00 009A1076 FF1276FF 01366801 .h6..v..v.......á..v..v.h.....«. 0001E0

Dump of file SATURN:[PCCOMMON.DUMP.DLL]UTL.TMP;1 on 18-APR-1990 10:53:36.50
File ID (957,10,0)    End of file block 75 / Allocated 76

Virtual block number 13 (0000000D), 512 (0200) bytes

1868014A 68FE92B6 FFFE94B6 FF505201 0005FE94 9688FE92 86880000 08E09A50 P.Á......±...±...RP.Ñ.±.Ñ.±hJ.h. 000000
006A016E 68014A68 1076FF12 76FF0035 E910C483 09B501FF 9A1076FF 1276FF01 ..v..v....ç..á.Õ5..v..v.hJ.hn.j. 000020
9A505200 000A109A 01186810 76FF1276 FF016A00 6A000005 8F9A006A 006A006A j.j.j......j.j..v..v.h.......RP. 000040
9A5016FC 90868D01 18681076 FF1276FF 0049E90C 46880078 E9007EE9 00000A17 ....Õ-.Õ(..F.ÕI..v..v.h.....•.P. 000060
76FF1276 FF000005 129A5016 FC90868D 01186810 76FF1276 FF0045E9 000008F7 %...ÕE..v..v.h.....•.P......v..v 000080
AFE90375 00013000 13E90016 E90019E9 0000FFFF 9A016A00 6A016A00 6A206A10 .j j.j.j.j......Õ..Õ..Õ..=..u.ÕE 0000A0
E9037501 683DFF90 E9037501 4A300013 E90016E9 FFE7E9FF BEE90375 00053DFF .=..u.Õ/.ÕÕ.Õ..Õ..=J.u.Õ..=h.u.Õ 0000C0
008C681E 00C1681E 1076FF12 76FF016A 006A0387 E90A4688 0411E900 00E9FD19 .»Õ..Õ...F.Õ..j.j..v..v..hê..h¥. 0000E0
949689FE 92868900 0006089A 006A1076 FF1276FF 0384E900 000A679A 206A006A j.j .g...Õ...v..v.j.........±... 000100
FE92B6FF FE94B6FF 00000223 9A5016FC 90868D01 00680118 681076FF 1276FFFE ±.v..v.h..h.....•.P.#....Ñ.±.Ñ.± 000120
5016FC90 868DFC46 8909CF0F 349A5016 FB8E868D 5016FD90 868D5016 FC90868D ...•.P...».P...«.P.4.ü..F•...•.P 000140
B7FF2602 04B7FF26 FE929EC4 0CC48309 F413CA9A 5016FD90 868D5016 FB8E868D ...«.P...».P.ò.¶..á.á..±&.ñ..&.ñ 000160
E9FC468B FC46890E C4830A2D 00D69A10 76FF1276 FFFC76FF 5016FC90 868D0202 .....•.P.v•.v..v..ø.-..á..F•.F•Õ 000180
868D0266 E90000FF FF9A5052 0000FFFF 9A011868 1076FF12 76FF016A 006A0268 h.j.j..v..v.h........RP.....Õf... 0001A0
C700109A 5016FE96 868D0008 681E08C4 83054B00 699A5016 FC90868D 5016FE96 .±.P...•.P.i.K..á..hÄ....±.P...ú 0001C0
B7FF2602 04B7FF26 FE929EC4 5016FE96 868D1076 FF1276FF 016A006A 08C48303 ..á.j.j..v..v....±.Pá..±&.ñ..&.ñ 0001E0

Dump of file SATURN:[PCCOMMON.DUMP.DLL]UTL.TMP;1 on 18-APR-1990 10:53:36.50
File ID (957,10,0)    End of file block 75 / Allocated 76

Virtual block number 14 (0000000E), 512 (0200) bytes

9EC40001 020A87C7 26FE929E C40042E9 03740001 3D000005 DE9A116A 006A0202 ..j.j..B...=..t.ÕB.á..±&ú.....á. 000000
1076FF12 76FF08C4 8306EA00 699A5016 FC90868D 020687FF 260208B7 FF26FE92 .±&.ñ..&.ñ.....•.P.i.õ..á..v..v. 000020
681076FF 1276FF01 6A006A00 19E90000 FFFF9A10 76FF1276 FF0000FF FF9A016A j.......v..v......Õ..j.j..v..v.h 000040
8E868D3F 6A002EE9 037500F8 8E8E8001 83E90000 0C129A50 5200000C 0B9A0118 .......RP.....Õ°../.«.u.Õ..j?... 000060
83082001 789A5016 FB8E868D 2A6A0017 E90374D0 0B06C483 0AFD0178 9A5016FB «.P.x.»..á..Ât.Õ..j°...«.P.x. .. 000080
008C9AFE 92B6FFFE 9486FF50 16FD9086 8D0000FC 8E86C701 10E90375 D00806C4 á..Âu.Õ..ú..•.....».P.Ñ.±.Ñ.±... 0000A0
08A70056 9AFE92B6 FFFE94B6 FF5016FD 90868D00 5AE90375 00003D08 C48303E >..á.=..u.ÕZ....».P.Ñ.±.Ñ.±.V.Ì. 0000C0
01366810 76FF1276 FF08C483 08820069 9A5016FD 90868050 16FC9086 8D08C483 .á....•.P...».P.Ì....á..v..v.h6. 0000E0
9A1076FF 1276FF01 36680168 68FE92B6 FFFE94B6 FF000008 D09A5016 FC90868D ...•.P.Å....Ñ.±.Ñ.±hh.h6..v..v.. 000100
868D5052 010005FE 949688FE 92868800 1BE90374 00FB8EBE 800CC483 08B80000 ..£..á../.«.t.Õ.....±...±...RP.. 000120
08C48308 F800699A 5016FB8E 868D5016 FC90868D 08C4830C 3000569A 5016FB8E .«.P.V.0..á.....•.P...«.P.Ì.%..á. 000140
52010005 FE949688 FE928688 0000073F 9A5016FC 90868D01 18681076 FF1276FF .v..v.h.....•.P.?.......±...±...R 000160
6A006A10 C4830A95 01FF9A10 76FF1276 FF011868 014A68FE 92B6FFFE 94B6FF50 P.Ñ.±.Ñ.±hJ.h...v..v.......á.j.j 000180
C45016FC 90868D00 68E90000 07109A50 52000007 099A0118 681076FF 1276FF01 ..v..v.h.......RP.....Õk.....•.Pá 0001A0
0002020A 87C726FE 929EC408 C4830728 00569A02 0687FF26 020887FF 26FE929E ..±&.ñ..&.ñ...V.(..á.á..±&ú..... 0001C0
FFBA86EB B80029E9 00000CC8 9A1076FF 1276FF00 000C8D9A 016A1076 FF1276FF .v..v.j..§....v..v..à...Õ).¡Š.o. 0001E0
```

Dump of file SATURN:[PCCOMMON.DUMP.DLL]UTL.TMP;1 on 18-APR-1990 10:53:36.50
File ID (957,10,0)   End of file block 75 / Allocated 76

Virtual block number 15 (0000000F), 512 (0200) bytes

```
81E90375 001530FD A5E90375 00013DFE 60E90375 C00B001A E9001DE9 00FEE9FF .Õ±.Õ..Õ...åu.Õ'±=..u.ÕE»=..u.Õ. 000000
FE929EC4 FE949689 FE928689 00000975 9A006A10 76FF1276 FF0069E9 FFD7E9FD »Õ■.Õi..v..v.j..u......±...±6..± 000020
000AA39A 026A1076 FF1276FF 0003020A 87C726FE 929EC400 07C62602 069FC426 &6...&6..6..±&ú......v..v.j..È.. 000040
00023DFC 8FE90375 00013D00 18E9001E E90021E9 00000AAE 9A1076FF 1276FF00 ..v..v..Ü...Õ!.Õ..Õ..=..u.Õ.==.. 000060
6A026A00 6A206A10 76FF1276 FF0066E9 FFDFE9FC 61E90375 00033DFF A2E90375 u.ÕÅ.=..u.Õa■ÕÕ.Õf..v..v.j j.j.j 000080
0676FF08 76FF0A76 FF0C76FF 0E76FF10 76FF1276 FF004EE9 0000090C 9A016A00 .j......ÕN..v..v..v..v..v..v..v. 0000A0
293DF889 E9037500 223DFC12 E9037500 2030002B E9002EE9 003AE900 00FFFF9A .....Õ:.Õ..Õ+.= .u.Õ.==".u.Õ.½=) 0000C0
E900008A 000088FF B2E9F751 E9037500 383DF897 E9037500 303DFFAD E9037500 .u.ÕÜ.=0.u.Õ.½=;.u.ÕQ¼Õÿ.|..¤..Õ 0000E0
FE46FF00 03E90000 FE46C7D8 8E049D88 1E565700 0002C800 0ECAC95F 5E1F0000 ...^_èb..à...WV.|...ÄúF±..Õ...F± 000100
750202D5 87F6FF2A 188A2606 76C4FE5E 880038E9 03750038 80260676 C4FE5E88 .^±áv.&.8.u.Õ8..^±áv.&..*.-.f..u 000120
76C4FE5E 88008A26 0676C4FE 5E880009 E9202C00 8A260676 C4FE5E88 000EE903 .Õ...^±áv.&.., Õ...^±áv.&...^±áv 000140
0071B81E 56570001 64C8CBC9 5F5E1F00 00C6260A 76C4FE5E 88FF86E9 0088260A .&..ÕÑ..^±áv.&6...^_èùàd..WV.|q. 000160
76FF0E76 FF3F6A00 17E90374 D00B06C4 830E0401 789A0C76 FF0E76FF 2A6AD88E .Äj*.v..v..x....6..Ãt.Õ..j7.v..v 000180
468904C4 830E3012 309A0C76 FF0E76FF 0011E903 75D00B06 C4830AE6 01789A0C ..x.|..6..Äu.Õ...v..v..=.0..6..F 0001A0
8D00F568 1E00B1E9 0A468B08 C4830B52 00699A0C 76FF0E76 FF5016FE 9C868D0A ....±.P.v..v..i.R..6..F.ÕŸ..h%.. 0001C0
1276FF50 16FE9C86 8D0676FF 0876FF01 6A006A08 C4830E7F 00109A50 16FE9C86 ..±.P......á.j.j..v..v....±.P.v. 0001E0
```

Dump of file SATURN:[PCCOMMON.DUMP.DLL]UTL.TMP;1 on 18-APR-1990 10:53:36.50
File ID (957,10,0)   End of file block 75 / Allocated 76

Virtual block number 16 (00000010), 512 (0200) bytes

```
8400109A 5016FE9C 868D010A 681E00B0 E90015B8 00000E9F 9A206A00 6A1076FF .v.j.j .....|..Õ§..h.....±.P...Ç 000000
659A206A 006A1076 FF1276FF 5016FE9C 868D0676 FF0876FF 016A006A 08C4830E ..á.j.j..v..v....±.P.v..v.j.j .e 000020
0017E903 74D00B06 C4830ECB 01789A0C 76FF0E76 FF2A6A00 86E90015 B8000009 ...|..Õ..j*.v..v..x.ù..6..Ät.Õ.. 000040
0001B800 52E90000 B80006E9 0375D00B 06C4830D ED01789A 0C76FF0E 76FF3F6A j7.v..v..x.Ú..á..Äu.Õ..|..ÕR.|.. 000060
A8E90375 00023000 13E90376 FFB5E903 75001230 0043E900 46E90A46 88004CE9 ÕL..F.ÕF.ÕC.=..u.Õç.v.Õ..=..u.Õ' 000080
7500CE3D FF1FE903 7500683D FF27E903 7500153D FFD7E9FF 32E90375 00033DFF .=..u.Õ2.Õ■.=..u.Õ'.=k.u.Õ..=ö.u 0000A0
D88E0DDE B81E5657 000206C8 CBC95F5E 1FFF84E9 FF46E903 7500003D FF4EE903 .ÕN.=Å.u.ÕF.ÕÇ..^_èùà...WV.|B..Ä 0000C0
76FF1076 FF08C483 0F6A0056 9A5016FD FA868D12 76FF1476 FF0007C6 26065EC4 á^.&6...v..v...'».P.V.j..6..v..v 0000E0
16FDFA86 8D5016FE FC868D06 76FF0876 FF08C483 0FA90056 9A5016FE FC868D0E ...=±.P.V.`..á..v..v...=±.P..'». 000100
08C4830E 1900699A 5016FDFA 868D0A76 FF0C76FF FE46890C C4830F98 0FDC9A50 P.É....6..F±.v..v...'».P.Í....6. 000120
23681E00 12E90374 3AFF7880 260A5EC4 F08804C4 830FCA00 869A0A76 FF0C76FF .v..v..Ñ.ò..6..Þ6^.&.x.:t.Õ...h# 000140
000106C8 0010CAC9 5F5E1F00 00E9FE46 8B08C483 0E480010 9A0A76FF 0C76FF01 ..v..v....H..6..F±Õ...^_èò._à... 000160
0A5EC401 B0E9023E E90000B8 0009E903 74003F80 260A5EC4 D88E0F3C B81E5657 WV.|<..Ã6^.&.?.t.Õ..|..Õ>.Õ¯.6^. 000180
260A5EC4 0191E900 0347C626 065EC45C 0247C626 065EC400 13E90374 5C3F8026 &.7\t.Õ..6^.&6G.\6^.&6G..Õ..6^.& 0001A0
26065EC4 01478A26 0A5EC407 8826065E C4078A26 0A5EC400 25E90374 3A017F80 ...:t.Õ%.6^.&..6^.&..6^.&.G.6^.& 0001C0
7F80260A 5EC4004B E903742E 3F80260A 5EC4015F E9000247 C626065E C4014788 .G.6^.&6G..Õ_.6^.&.?.t.ÕK.6^.&.. 0001E0
```

Dump of file SATURN:[PCCOMMON.DUMP.DLL]UTL.TMP;1 on 18-APR-1990 10:53:36.50
File ID (957,10,0)   End of file block 75 / Allocated 76

Virtual block number 17 (00000011), 512 (0200) bytes

```
24E90374 5C027F80 260A5EC4 0000E903 7500027F 80260A5E C4003EE9 03742E01 ..t.Õ>.6^.&....u.Õ..6^.&...\t.Õ$ 000000
83100113 279A0676 FF0876FF 01A4E900 03880006 E9037400 037F8026 065EC400 .6^.&....t.Õ..|..ÕE..v..v..'.1.. 000020
FEFA868D 0075E903 74D00B06 C4831105 01789A0A 76FF0C76 FF5C6A01 08E904C4 á.Õ..j\.v..v..x....á..Ät.Õu...'± 000040
16FE468D 5016FEFA 868D0CC4 830F8413 CA9A0676 FF0876FF 0A76FF0C 76FF5016 .P.v..v..v..v..ò....á...'±.P.F±. 000060
FF0876FF 5016FEFA 868D001E E9037510 FE46F6FA 46890000 FFFF9A00 6A006A50 Pj.j.......F'-F±.u.Õ....'±.P.v.. 000080
0E76FF10 76FF0A76 FF0C76FF 0014E900 07C6260E 5EC408C4 83112300 569A0676 v..V.#..á.6^.&6..Õ...v..v..v..v. 0000A0
8804C483 11580086 9A0676FF 0876FF00 7CE9010A E9FA4688 08C48311 3A00569A .V.:..á..F'Õ..Õ|..v..v..Ñ.[..6.. 0000C0
08C48311 6E00109A 0676FF08 76FF0125 681E0012 E903755C FF788026 065EC4F0 Þá^.&.x.\u.Õ...h%..v..v....n..6. 0000E0
C4FA5E88 FA46FF00 03E9FC46 8904C483 0F560086 9A0676FF 0876FF00 00FA46C7 úF'...v..v..Ñ.V..á..F=Õ...F'.^'á 000100
FC46FF00 88260676 C4FC5E88 008A260A 76C4FA5E 880018E9 03755C38 80260A76 v.&.8\u.Õ...^'áv.&...^=áv.&...F= 000120
7F802606 5EC4001F E903743A 017F8026 065EC400 00C62606 76C4FC5E 88FF06E9 Õ■..^=áv.&6..á^.&...:t.Õ..á^.&.. 000140
8D0676FF 0876FF08 C4831080 00109A06 76FF0876 FF012768 1E0012E9 03740002 ..t.Õ...h'..v..v....¯..á..v..v.. 000160
7E830003 FA46C700 05E90374 02FA7E83 FA468900 0010E69A 006A006A 5016FE46 F±.Pj.j..Ì....F'.-'.t.Õ..úF'...- 000180
76FF1076 FF04C483 12301294 9A0A76FF 0C76FF00 28E9FA46 880006E9 037500FA '.u.Õ...F'Õ+..v..v....0..á..v..v 0001A0
011EC8CB C95F5E1F 0000E90C C483109D 0FDC9A06 76FF0876 FF0A76FF 0C76FF0E ..v..v..v..v..É....á.Õ...^_èùà.. 0001C0
316A5016 FE468D06 76FF0876 FFFFFFFE 46C70001 FA46C7D8 8E0FE488 1E565700 .WV.¡Õ..ÄúF'..úF±...v..v..F±.Pj1 0001E0
```

```
Dump of file SATURN:[PCCOMMON.DUMP.DLL]UTL.TMP;1 on 18-APR-1990 10:53:36.50
File ID (957,10,0)   End of file block 75 / Allocated 76

Virtual block number 18 (00000012), 512 (0200) bytes

74899CFC 7E81FC46 89000002 819A006A 006A5016 FA468D01 17685016 FEE2868D ..ãt.Ph...F*.Pj.j..Ÿ....F=.~*..t 000000
D88E1245 B81E5657 000104C8 CBC95F5E 1F0000E9 FC468800 03FC46C7 0005E903 .Õ..úF=...F=Õ...^_èùà...WV.¡E..Ä 000020
0676C4FE 5E880021 E9037500 38802606 76C4FE5E 88FE46FF 0003E900 00FE46C7 úF±..Õ...F±.^±áv.&.8.u.Õ!..^±áv. 000040
76C4FE5E 88FFCDE9 0003E903 755C3880 260676C4 FE5E8800 12E90375 3A388026 &.8:u.Õ...^±áv.&.8\u.Õ..Õë..^±áv 000060
50524008 56880646 03FE4688 002EE900 07C62606 5EC4000A E9037400 38802606 .&.8.t.Õ..á^.&ó..Õ...F±.F..V.@RP 000080
83110400 569A0676 FF0876FF 5016FEFC 868D08C4 83131D00 569A5016 FEFC868D ..=±.P.V....á...=±.P.v..v..V.å.. 0000A0
84E90003 E9037408 46080646 88D88E12 9CB81E56 57000002 C8CBC95F 5E1F08C4 á..^_èùà...WV.¡...Ä.F..F.t.Õ..Õ. 0000C0
E903743A 38802606 76C4FE5E 88FE4689 4804C483 130900B6 9A0676FF 0876FF00 ..v..v..Ñ....á.H.F±.^±áv.&.8:t.Õ 0000E0
5EC4FE76 88003BE9 03745C38 80260676 C4FE5E88 0059E900 07C62606 5EC4000A ..á^.&ó..ÕY..^±áv.&.8\t.Õ;..v±á^ 000100
5EC4FE76 88000EE9 03750001 78802606 5EC4FE76 88001EE9 03743AFF 78802606 .&.x.:t.Õ...v±á^.&.x..u.Õ...v±á^ 000120
E9037400 FE7E83FE 4EFF000F E90000C6 260676C4 FE5E8800 0AE90001 40C62606 .&ó@..Õ...^±áv.&ó..Õ...N±.~±.t.Õ 000140
14E90375 08460806 4688D88E 132F881E 56570000 00C8C8C9 5F5E1F00 00E9FF91 ..Õ...^_èùà...WV.¡/..Ä.F..F.u.Õ. 000160
001DE903 750C4608 0A468808 C4831409 00569A0E 76FF1076 FF0676FF 0876FF00 ..v..v..v..v..V....á..F..F.u.Õ.. 000180
0E5EC400 0DE90374 5CFF7880 260E5EC4 F08804C4 83143700 B69A0E76 FF1076FF .v..v..Ñ.7..á..þá^.&.x.\t.Õ..á^. 0001A0
0B0A468B 08C48314 5600109A 0E76FF10 76FF0129 681E0012 E9037400 027F8026 &....t.Õ...h)..v..v....V..á..F.. 0001C0
CBC95F5E 1F08C483 134A0010 9A0E76FF 1076FF0A 76FF0C76 FF0014E9 03750C46 F.u.Õ...v..v..v..v....J..á..^_èù 0001E0

Dump of file SATURN:[PCCOMMON.DUMP.DLL]UTL.TMP;1 on 18-APR-1990 10:53:36.50
File ID (957,10,0)   End of file block 75 / Allocated 76

Virtual block number 19 (00000013), 512 (0200) bytes

00060027 00020000 00051216 00020005 000103A9 02030000 000304C8 0002001D ....à.......`................'... 000000
000408A7 0103007E 00040C49 0103007C 00040484 0103007A 0004046F 01030000 ....o...z.......|...|...~...I... 000020
000A13F0 00020007 00040C54 01030087 00040772 01030086 00040B67 0103007F ....g.......r.......T.......b... 000040
000013D2 00020013 00040AC3 01030010 000405A8 0103008B 00040E68 01030000 ....h.......`.......Û.......@... 000060
00020324 0103001F 00040C90 0103001E 00040409 01030495 0005045A 00050000 ....Z.......\................$... 000080
0002037F 01030083 00040D21 01030041 00020319 01030040 00021273 0103003F ?...s...@.......A...!...*....... 0000A0
000404B4 0103004D 00040ACA 01030045 00040004 0103004B 000211E9 01030048 H...Õ...K.......E...ò...M...Ç... 0000C0
FF0E76FF D88EFFFF B81E5657 000004C8 00000000 0000005C 000404BB 0103005B [...E...\.......à...WV.¡...Ä.v.. 0000E0
569A0676 FF0876FF 0C76FF0E 76FF001A E903720A 463B04C4 83003100 B69A0C76 v..Ñ.1..á.;F.r.Õ...v..v..v..v..V 000100
FE468900 070504C4 83006800 B69A0C76 FF0E76FF 00AAE900 00B808C4 83004500 .E..á.¡..Õ`..v..v..Ñ.h..á.....F± 000120
74D00806 C48300A8 01789A50 520E568B 0C4603FC 468B5C6A FC46FF00 02FC46C7 úF=...F=j\.F=.F..V.RP.x.´..á..Ät 000140
3BFC462B FE4688FF CCE90374 5C388026 0C76C4FC 5E88006C E986EEB8 0006E903 .Õ..¡Ÿ.Õl..^=áv.&.8\t.Õä..F±+F=; 000160
065EC40A C48300C2 00CE9A06 76FF0876 FF0C76FF 0E76FF03 6AFFBEE9 03720A46 F.r.Õf.j..v..v..v..v..ö.ó..á.á^. 000180
0E568B0C 4603FC46 8B08C483 00D80010 9A0676FF 0876FF01 2C681E00 0347C626 &6G...h,..v..v....Ü..á..F=.F..V. 0001A0
00029000 0ACAC95F 5E1F0000 E90000B8 08C483FF FF00109A 0676FF08 76FF5052 RP.v..v.......á.¡..Õ...^_èò..... 0001C0
890E468B D88EFFFF B81E5657 000218C8 00000000 00080002 0000000A 00150002 ................à...WV.¡...Ä.F.. 0001E0

Dump of file SATURN:[PCCOMMON.DUMP.DLL]UTL.TMP;1 on 18-APR-1990 10:53:36.50
File ID (957,10,0)   End of file block 75 / Allocated 76

Virtual block number 20 (00000014), 512 (0200) bytes

8B0003FA 46C7F856 89F64689 0856B806 468BF456 89F24689 0C568B0A 468BF046 Fþ.F..V..F·.V¶.F..V..F-.VÑúF*... 000000
884004FC 468A0000 FFFF9A50 16FDE886 8D5016FC 468D004B E9037416 46081446 F..F.t.ÕK..F=.P..Õ».P......F=.@. 000020
9A5016FE 468D5016 FDF3868D 006A0100 FE46C75C FDF286C6 3AFDF186 C6FDF086 .þ»ó.þ=:ó.·»\úF±..j...µ».P.F±.P. 000040
00800086 9A1476FF 1676FF00 30E900BA E986EBB8 0006E903 75000030 0000FFFF ....=..u.Õ..¦$.Õa.Õ0..v..v..Ñ.¯. 000060
00569A50 16FDF086 8D1476FF 1676FF00 9BE986ED B80006E9 03730100 3004C483 .á.=..s.Õ..¦Ü.Õ...v..v...þ».P.V. 000080
B69A1076 FF1276FF 0030E900 FEF086C6 0008E903 7412460B 10468808 C4830001 1..á..F..F.t.Õ..ó.þ±.Õ0..v..v..Ñ 0000A0
5016FEF0 868D1076 FF1276FF 0058E986 ED880006 E9037301 003004C4 8300F300 .µ..á.=..s.Õ..¦Ü.ÕX..v..v...þ±.P 0000C0
FF261F5E 068EFFFF 68FFFF68 1876FF1A 76FF1C76 FF1E76FF 08C483FF FF00569A .V....á..v..v..v..v.h..h....^.&. 0000E0
EC86FFFD EE86FFFD EE9689FD EC868900 00FFFF9A 5016FDF0 868D00FA 68020036 6..h*...þ».P.......ß»..Ÿ».ÑŸ».Ñ± 000100
8B088E00 08881E56 57000572 C8001ACA C95F5E1F 0000E9FA 46880000 FFFF9AFD »......F*Õ...^_èò..àr..WV.¡...Ä. 000120
1276FF00 0002179A 50520000 02109A00 6A036A01 6A006A01 6A006A06 C8E90E46 F.Õà.j.j.j.j.j.j......RP......v. 000140
568B0646 8B0000FF FF9A0676 FF0876FF 006A1076 FF1276FF FFFF0000 9A1076FF .v.......v..v.j..v..v.......F..V 000160
9A505201 0005FE94 968BFE92 868B0118 681076FF 1276FFFE 949689FE 92868908 ....±...±.v..v.h.....±...±...RP. 000180
0CC48302 FC00009A 1076FF12 76FF0136 68016868 FE92B6FF FE94B6FF 0000FFFF .....Ñ.±.Ñ.±hh.hó..v..v....=..á. 0001A0
1076FF12 76FF0000 02949A00 6A006A01 0068006A 01436801 18681076 FF1276FF .v..v.h..hC.j.h..j.j.......v..v. 0001C0
9A006A01 6A016A00 6A016A00 6A0000FF FF9A0202 B7FF2602 04B7FF26 FE929EC4 á..±&.ñ..&.ñ.......j.j.j.j.j.j.. 0001E0
```

```
Dump of file SATURN:[PCCOMMON.DUMP.DLL]UTL.TMP;1 on 18-APR-1990 10:53:36.50
File ID (957,10,0)   End of file block 75 / Allocated 76

Virtual block number 21 (00000015), 512 (0200) bytes

 0130681E 0135681E 1076FF12 76FF016A 006A062A E90000FF FF9A5052 0000FFFF ....RP.....Õ*.j.j..v..v..h5..h0. 000000
 03740168 FA7E81FA 8E86890C 4688FA46 890A4688 060CE900 00FFFF9A 206A006A j.j .....Õ...F..F*.F....*.-*h.t. 000020
 1076FF12 76FF050E E90003E9 037501FA 8EBE8300 0DE90375 05FA8EBE 830014E9 Õ...ƒ.*.u.Õ...ƒ.*.u.Õ..Õ8..v..v. 000040
 6A006A00 6A016568 FA76FF10 76FF1276 FFFE9496 89FE9286 890000FF FF9A006A j.........±...±.v..v..v*he.j.j.j 000060
 81000000 D22BFE46 88016868 FA76FF10 76FF1276 FFFE4689 000002BC 9A006A00 .j..¥....F±.v..v..v*hh..F±+●.... 000080
 8688FC91 868A0015 E9037458 FC908E80 0000FFFF 9A5016FC 90868050 520100CA ò..RP...•.P......ƒ.•[t.Õ......•.. 0000A0
 90868050 16FC9086 80FE9286 FFFE9486 FF00FC92 86C6FC91 8688FC92 868AFC90 .•...•...•6..•..Ñ.±.Ñ.±...•.P... 0000C0
 FE90BE83 0014E903 7503FE90 BE83FE90 8689FFFF 0F349A50 16FB9086 805016FD ».P...«.P.4......±.ƒ.±.u.Õ...ƒ.± 0000E0
 A608589A 5016FD90 86805016 FE968680 0069E903 746BFE90 BE83000A E9037515 .u.Õ...ƒ.±kt.Õi....±.P...».P.X.Ï 000100
 1076FF12 76FF016A 006A08C4 83039A00 109A5016 FE968680 014C681E 08C48304 ..á..hL....±.P......á.j.j..v..v. 000120
 6A006A00 0004109A 206A006A 020287FF 260204B7 FF26FE92 9EC45016 FE968680 ...±.Pá..±&.ñ..&.ñ..j.j .....j.j 000140
 FF5016FD 90868004 BFE90000 051F9A50 52000005 189A0118 681076FF 1276FF01 ..v..v.h.......RP.....Õ¢....».P. 000160
 FE92B6FF FE94B6FF 01366810 76FF1276 FF08C483 04BA0056 9AFE9286 FFFE94B6 Ñ.±.Ñ.±.V.¤...á..v..v.h6..Ñ.±.Ñ.± 000180
 C483047B 00009A10 76FF1276 FF013668 016868FE 9286FFFE 9486FF00 0005E59A .Ì....Ñ.±.Ñ.±hh.h6..v..v....x..á 0001A0
 0000FFFF 9A016A00 6A016A00 6A206A10 76FF1276 FF0015E9 037405FA 8EBE830C ..ƒ.*.t.Õ...v..v.j j.j.j.j...... 0001C0
 9A206A00 6A016168 1E016668 1E1076FF 1276FF01 6A006A03 CEE90A46 8B0455E9 ÕU..F.Õö.j.j..v..v..hf..ha.j.j . 0001E0

Dump of file SATURN:[PCCOMMON.DUMP.DLL]UTL.TMP;1 on 18-APR-1990 10:53:36.50
File ID (957,10,0)   End of file block 75 / Allocated 76

Virtual block number 22 (00000016), 512 (0200) bytes

 FF000001 699A5052 00000162 9A006A03 6A016A00 6A016A00 6A03C8E9 00000506 ....Õù.j.j.j.j.j.j..b...RP.i.... 000000
 01006801 18681076 FF1276FF FE949689 FE928689 00000273 9A006A10 76FF1276 v..v.j..s.......±...±.v..v.h..h.. 000020
 805016FD 90868050 16FC9086 80FE9286 FFFE94B6 FF0000FF FF9A5016 FC90868D ...•.P......Ñ.±.Ñ.±...•.P...».P. 000040
 9A5016FD 90868D50 16FB9086 805016FC 908680FC 46890492 0F349A50 16FB9086 ..«.P.4....F•...•.P...«.P...».P. 000060
 16FE9686 8D08C483 01050858 9A5016FC 90868050 16FE9686 8D0CC483 050013CA ò.Å..á.....±.P...•.P.X....á....±. 000080
 55E90374 68FC7E83 0009E903 7503FC7E 8308C483 04DE0056 9A5016FC 90868D50 P...•.P.V.ß..á..~•.u.Õ...~•kt.ÕU 0000A0
 96868D10 76FF1276 FF016A00 6A08C483 05300010 9A5016FE 96868D01 7D681E00 ..h)....±.P...•..á.j.j..v..v.... 0000C0
 76FF016A 006A0000 05659A20 6A006A02 02B7FF26 020487FF 26FE929E C45016FE ±.Pá..±&.ñ..&.ñ..j.j .e...j.j..v 0000E0
 0055E903 7400CEFC 7E81028C E9000005 7E9A5052 00000577 9A011868 1076FF12 ..v.h...W...RP.-...Õ¥..-•ö.t.ÕU. 000100
 FE96868D 1076FF12 76FF016A 006A08C4 83059600 109A5016 FE96868D 018D681E .h.....±.P......á.j.j..v..v....± 000120
 1276FF01 6A006A00 0002359A 206A006A 020287FF 26020487 FF26FE92 9EC45016 .Pá..±&.ñ..&.ñ..j.j .5...i.j..v. 000140
 908680FE 92B6FFFE 94B6FF02 50E90000 FFFF9A50 520000FF FF9A0118 681076FF .v.h.......RP.....Õ]..Ñ.± ¶.±... 000160
 92B6FFFE 94B6FF50 16FD9086 8D0032E9 03750000 3D08C483 05B4008C 9A5016FD ».P...Ç..á.=..u.Õ2....».P.. ±.Ñ. 000180
 00009A10 76FF1276 FF013668 016868FE 92B6FFFE 94B6FF08 C4830612 00569AFE ±.V....á..Ñ.±.Ñ.±hh.h6..v..v.... 0001A0
 037400F8 90BE8000 0001B09A 5016FB90 86800118 681076FF 1276FF0C C48305FF ...á..v..v.h.....«.P.¯....ƒ.«.t. 0001C0
 9A5016FB 90868D3F 6AFC4689 04C48301 CB12309A 5016FC90 868001EC E90003E9 Õ..Õš....•.P.=.ù..á..F•j?...«.P. 0001E0

Dump of file SATURN:[PCCOMMON.DUMP.DLL]UTL.TMP;1 on 18-APR-1990 10:53:36.50
File ID (957,10,0)   End of file block 75 / Allocated 76

Virtual block number 23 (00000017), 512 (0200) bytes

 D00B06C4 83066101 789A5016 FB90868D 2A6A0017 E90374D0 0B06C483 06290178 x.)..á..Åt.Õ..j*...«.P.x.•..á..Å 000000
 5016FC90 86800042 E9037412 FC7E8300 09E90375 02FC7E83 01AAE900 03E90375 u.Õ..Õ¯..-•.u.Õ...-•.t.Õ8....•.P 000020
 01020A87 C726FE92 9EC408C4 83069900 569A0206 87FF2602 0887FF26 FE929EC4 á..±&.ñ..&.ñ...V....á.á..±&ú.... 000040
 01A2681E 0156E900 00FFFF9A 1076FF12 76FF0000 FFFF9A01 6A1076FF 1276FF00 ..v..v.j.......v..v......ÕV..hÅ. 000060
 5016FB90 868001A4 681E0003 E9037500 003D08C4 83068300 8C9A5016 FB90868D ...«.P...*..á.=..u.ÕÆ..hÊ....«.P 000080
 2F08589A 5016FC90 86805016 FA90868D 0089E903 75000030 08C48300 8E008C9A ......á.=..u.Õ¿....*.P...•.P.X./ 0000A0
 016A006A 0CC48303 4100F89A 5016FE96 868001A7 681E5016 FA90868D 08C48303 ..á....*.P.hÏ....±.P.½.A..á.j.j. 0000C0
 699A216A 006A0202 B7FF2602 0487FF26 FE929EC4 5016FE96 86801076 FF1276FF .v..v....±.Pá..±&.ñ..&.ñ..j.jI.i 0000E0
 FE929EC4 5016FA90 868D0002 020A87C7 26FE929E C40042E9 03740001 3D000003 ...•..t.Õ8.á..±&ú........*.Pá..± 000100
 FF000007 AF9A016A 1076FF12 76FF08C4 8306E700 569A0206 87FF2602 0887FF26 &.ñ..&.ñ...V.Ó..á..v..v.j..£.... 000120
 52000003 7B9A0118 681076FF 1276FF01 6A006A00 19E90000 07BA9A10 76FF1276 v..v..¤...Õ..j.j..v..v.h...(...R 000140
 9EC4FE94 9689FE92 86890000 04389A00 6A1076FF 1276FF00 69E90000 03829A50 P.....Õi..v..v.j..ß......±...±á. 000160
 7A9A026A 1076FF12 76FF0003 020A87C7 26FE929E C40007C6 2602069F C426FE92 .±&á...&6..á..±&ú......v..v.j..z 000180
 3DFC48E9 03750001 3D001BE9 001EE900 21E90000 06859A10 76FF1276 FF000006 ....v..v......Õ!.Õ..Õ..=..u.ÕH•= 0001A0
 6A006A20 6A1076FF 1276FF00 63E9FFDF E9FC1AE9 03750003 3DFFA2E9 03750002 ..u.ÕÅ.=..u.Õ.•ÕÕ.Õc..v..v.j j.j 0001C0
 FF0876FF 0A76FF0C 76FF0E76 FF1076FF 1276FF00 4BE90000 03EC9A01 6A006A01 .j.j..š...ÕK..v..v..v..v..v..v.. 0001E0
```

```
Dump of file SATURN:[PCCOMMON.DUMP.DLL]UTL.TMP;1 on 18-APR-1990 10:53:36.50
File ID (957,10,0)   End of file block 75 / Allocated 76

Virtual block number 24 (00000018), 512 (0200) bytes

 00293DF9 F1E90375 00223DFB CEE90375 00203D00 2BE90037 E90000FF FF9A0676 v......Õ7.Õ+.= .u.Õö«=".u.Õp'=). 000000
 00E90000 8A0000B8 FFB5E9F9 10E90375 003B3DF9 FFE90375 00303DFF B0E90375 u.Õ¯.=0.u.Õ.'=;.u.Õ.'Õç.¡..¤..Õ. 000020
 88000BE9 03750846 08064688 D88E014B 881E5657 000002C8 000ECAC9 5F5E1F00 ..^_èÒ..à...WV.¡K..Ä.F..F.u.Õ... 000040
 80260676 C4FE5E8B FE46FF00 03E90000 FE46C700 5CE90003 E903740C 46080A46 F..F.t.Õ..Õ\.úF±..Õ...F±.^±áv.&. 000060
 C4FE5E8B 000EE903 75020205 87F6FF2A 188A2606 76C4FE5E 8B0038E9 03750038 8.u.Õ8..^±áv.&..*.-.f..u.Õ...^±á 000080
 8BFFB6E9 0088260A 76C4FE5E 88008A26 0676C4FE 5E8B0009 E9202C00 8A260676 v.&.., Õ...^±áv.&...^±áv.&..ÕÑ.. 0000A0
 00050001 00700203 00000003 01760002 0019CBC9 5F5E1F00 00C6260A 76C4FE5E ^±áv.&6...^_èÙ....v.......p..... 0000C0
 007C0004 01320103 00000007 06CF0002 007A0004 011D0103 00000005 03CC0002 ..ä...........z...Ü.......2...|. 0000E0
 00860004 03B10103 01430007 01080005 007F0004 01E60103 007E0004 074B0103 ..K...~...Ì...........C...Ý..... 000100
 00880004 070F0103 0000000A 07300002 00870004 04570103 00070004 07560103 ..V.......W.......=............. 000120
 001E0004 01870103 00000000 08600002 00130004 076B0103 00100004 01FF0103 ..........k.......'............. 000140
 00450004 07F60103 00480002 00460103 00830004 08130103 001F0004 07820103 ..............*...F...H...~...E. 000160
 00000000 00000000 005C0004 042B0103 005B0004 04240103 004D0004 07720103 ..r...M...$...[...+...\......... 000180
 FF0876FF 006EE986 FA880006 E9037500 01D43E80 D88EFFFF 881E5657 000000C8 à...WV.¡...Ä.>å..u.Õ..¡'.Õn..v.. 0001A0
 681E0676 FF0876FF 0052E986 FB880006 E9037700 FF3D04C4 83004500 B69A0676 v..Ñ.E..á.=..w.Õ..¡«.ÕR..v..v..h 0001C0
 068E0202 A3261F60 068E04C4 83FFFF00 B69A01D4 681E08C4 83005100 569A01D4 å..V.Q..á..hå..Ñ....á...'.&È.... 0001E0

Dump of file SATURN:[PCCOMMON.DUMP.DLL]UTL.TMP;1 on 18-APR-1990 10:53:36.50
File ID (957,10,0)   End of file block 75 / Allocated 76

Virtual block number 25 (00000019), 512 (0200) bytes

 C6020206 FF260202 1E8B261F 60068E00 13E90375 5C01D4BF 8002021E 8B261F60 '.&.....«å.\u.Õ....'.&....a....ó 000000
 60068ED8 8E0008B8 1E565700 0000C800 04CAC95F 5E1F0000 E90000B8 5C01D487 .å.\¡..Õ...^_èÒ..à...WV.¡...Ä..' 000020
 E9037206 46390202 A1261F60 068E002E E986FBB8 0006E903 74000202 3E83261F .&.>...t.Õ..¡½.Õ....'.&À..9F.r.Õ 000040
 0000E900 00B808C4 83002500 569A0876 FF0A76FF 01D4681E 0018E986 F9B80006 ..¡'.Õ...hå..v..v..V.%..ó.¡..Õ.. 000060
 00000000 00000000 00000099 00020000 000A0005 00020002 900006CA C95F5E1F .^_èÒ......f.................... 000080
 00000000 00000000 00000C00 02000200 01CB0001 B81F0200 3E89D88E FFFFB81E .¡...Ä.>...¡..ù................. 0000A0
 FFFFB9C0 33067EC4 1EDE8BD7 8BEC8B55 00000000 00000000 00000000 00000000 ................U.$.■.B.á~.3â¿.. 0000C0
 01C6F706 4688FE87 08468ED8 8EC08CF9 2BD1F7AE F2FFFFB9 0A7EC4FF 758DAEF2 ·Û.u.á~.¿..·ÛÄÌ+'.å.Ä.F..±.F.%ó. 0000E0
 76C51EDE 8B078BEC 8B55C85D C28C1FFA 8BF38BA4 F3C913A5 F3E9D149 A4027400 .t.ÈÌÌÕµÈ.èµÈ.µ.'..ò]ÙU.$.■.B.év 000100
 13A5F3E9 D149A402 7401A8C7 8B067EC4 D1F7AEF2 FFFFB9C0 33C08ED8 8CFE8B0A ..±.Ä.å3â¿..·ÛÄÌó~..ú´.t.ÈÌÌÕµÈ. 000120
 F2FFFFB9 C0330A7E C40676C5 1EDE8BD7 8BEC8B55 C85DC28C 1FFA8BF3 8BA4F3C9 èµÈ.µ.'..ò]ÙU.$.■.B.év.á~.3â¿..· 000140
 C033067E C4D78BEC 8B5500CB 5DFA8BF3 8B1FFFFF 1DC01B05 74A6F3F9 2BD1F7AE ÛÄÌ+'µÌt..å.....µ.']ù.U.$.■á~.3å 000160
 E30E4E8B DF8B0A76 C5067EC4 1E5657EC 8B5500CB 5DFA8B91 49D1F7AE F2FFFFB9 ¿..·ÛÄÌÌ..']ù.U.$WV.á~.év..Õ.N.D 000180
 46805657 000016C8 CB5DE58B 5F5E1FC2 8CC38BAA F3C032F8 E2AA0374 C00AAC0C .¯.åt.¯ã½2åµ¯.û.ô.^_.Ì]ùà...WV.F 0001A0
 89260856 8B064688 420A47C6 26F85EC4 FE568CFC 46890E46 8DFA568C F84689EC $.F½.V'.F..F■.V±á^½Ì6G.B.F..V.&. 0001C0
 9A53060A 76FF0C76 FFFC76FF 167FFF04 47C72602 57892607 89260857 89260647 G.&.W.&..&.W.&úG.....v■.v..v..S. 0001E0

Dump of file SATURN:[PCCOMMON.DUMP.DLL]UTL.TMP;1 on 18-APR-1990 10:53:36.50
File ID (957,10,0)   End of file block 75 / Allocated 76

Virtual block number 26 (0000001A), 512 (0200) bytes

 88260247 8E2607FF 263F8B26 C02A1278 044FFF26 F85EC4F0 8B0CC483 01600482 ..m..á..Þá^½&.O.x.*â&.?&..&.G.&. 000000
 8B067EC4 57EC8B55 CBC95F5E C68B06C4 83FFFF03 0C9A006A 53FA76FF 900FEB05 .Š...v'Sj.......á..ó^_èÙU.$Wá-.. 000020
 C28CC78B C78EFF33 04740538 264FAEF2 FB8B0A46 8AD9F741 AEF2FFFF B9C033DF Õ3â¿..·ÛA%).F..«·ÙÕ&8¯.t.3..ú.ú.ô 000040
 ABF3E07E 8DC03300 1089C08E D08C0A76 C51E5756 20EC83EC 8B5500CB 5DE58B5F _.Ì]ù.U.$.$ VW.év..Ä.â¿..3â.-Äµ¨ 000060
 25ACD233 0676C5E7 E8E04308 EFD30381 E0D207E1 8001B0C8 8BF88B14 74C00AAC ¯.åt..½.à¯..Ä.■ÄÝ.Æÿ.CÅŠÕév.3■¯% 000080
 5E5F1FDA 8CFF448D E674E043 22EFD303 81E0D207 E18001B0 C88BF88B 197400FF ..t..½.à¯..Ä.■ÄÝ.Æÿ"CÅt|.D..Õ._^ 0000A0
 AC0A76C5 071EA8F3 E07E8DC0 33001089 07160788 DE8B20EC 83EC8B55 CB5DE588 .Ì]ÙU.$.$ .B.■..¿..3â.-Äµ¨..év.¯ 0000C0
 75C60BD8 8C0676C5 E7E8E043 08EFD303 81E0D207 E18001B0 C88BF88B 1474C00A .åt..½.à¯..Ä.■ÄÝ.Æÿ.CÅŠÕév..Ä.óu 0000E0
 80C88BF8 8B48EBD8 8E03D81E 8C260306 3689264E 0F7500FF 25AC03D6 36C52605 .&é6■.¯%..u.N&.6■.&..Ä..ÄŠH.½.à¯ 000100
 7500FF25 AC03D81E 8C2603D6 A326FF44 8D0775E0 4322EF03 0381E0D2 07E18001 ..Ä.■ÄÝ.Æÿ"CÅu■.D.&È■.&..Ä.¯%..u 000120
 872696FF 6488E174 E04322EF D3038 1E0 D207E180 01B0C888 F88B18EB FF448D05 ..D.Š..½.à¯..Ä.■ÄÝ.Æÿ"CÅtÄ.d..&. 000140
 DAF7D78B 067EC457 38E30C4E 8BEC8B55 00CB5DE5 8B1F06DA 8CFA8BF3 8B030606 .■..µ.'.Õ...Ì]ù.U.$.N.DBWá-..■%Õ 000160
 8C10E3D1 87AAF3C9 13ABF3E9 D1E08A0A 4688012B D187D103 D3230818 D12B0C74 t.+Ì.Ù#Æ.Ì.Ì+Ì.F..ÅÌÕµ¨.èµ¯.ÌD.. 000180
 DABEC08E D88C5756 CB5D0856 8B06468B 5FAAF3C9 13ABF3E9 D1C38EFF FFC381C3 Û.Û...ûÌÕµ¨.èµ¯_.F..V.)ùVW.Ä.â/Õ 0001A0
 C38BFA46 89E42A08 478A2608 5EC45657 000008C8 CB5E5FA5 F3000AB9 0402BF03 .¢..¿..µÈ_^ùà...¯WVá^.&.G.*Õ.F'.û 0001C0
 F6260774 830A47F6 26F84689 148405E0 D1C103E0 D1C88BF9 F7000CB9 9908902D -...¿..%'.àÌÅ.èÌÅ....F½&-G..t.&- 0001E0
```

Dump of file SATURN:[PCCOMMON.DUMP.DLL]UTL.TMP;1 on 18-APR-1990 10:53:36.50
File ID (957,10,0)   End of file block 75 / Allocated 76

Virtual block number 27 (0000001B), 512 (0200) bytes

80260E74 010A47F6 26085EC4 90012BE9 FFFFB820 0A4FB026 085EC40F 74400A47 G.@t.á^.&.O. ¡..Õ+..á^.&-G..t.&. 000000
7689F08B 04478926 C02BEF0A 67802602 0A4FB026 90E2EB00 000447C7 26200A4F O. &ÚG...Šä.&.O..&.g.ÿ+ä&.G..Þ.v 000020
087E8137 75011484 87F60608 68F9F700 0CB99908 9020C388 4C750C0A 47F626FC =&-G..uL.û-...¿..%ªkÄ.-....u7.-. 000040
281A1E9A FA76FF0F 75FFFF0A 7E811675 08A8087E 810E7403 850A7E81 0775089C ..u..~.ç.t..-. .u..-...u..vª...( 000060
C38B1575 080A47F6 26085EC4 04C48312 D3E80876 FF0A76FF 0C75C008 02C48304 ..á..áu..v..v.ÒŒ..á.á^.&-G..u..û 000080
47882606 772B2637 8B26085E 8B677401 148487F6 06D868F9 F7000C89 9908902D -...¿..%ªkÄ.-....tg.^.&.7&+w.&.G 0000A0
FF265256 167EF608 04478926 48024588 F87E8802 57892607 89264008 57882606 .&.W.@&..&.W..-½.E.H&.G..--.VR&. 0000C0
006A026A 0F74201A 9587F6FA 5E8819EB FC468908 C4830446 176C9AFA 76FF0677 W..vª.l.F..á..F=Š..^ª-... t.j.j. 0000E0
46805600 018E17EB 07882606 468A065F C426085E C408C483 0469172E 9A53006A j.S...ì..á.á^.&á_..F.&..Š.ƒ..V.F 000100
5F5EE42A 06468AFE CCE90374 FC7639FC 468908C4 83014217 6C9AFA76 FF501606 ..P.vª.l.B..á..F=9v=t.Õë±.F.*õ^_ 000120
20E0A310 56880E46 8820F21E 8C20F0A3 20F68803 8F21269A 000AB8EC 8855C8C9 èÚU.Š|...&|¢.|- Èÿ ..· .F..V.ÈÄ¯ 000140
038DE900 0020EA06 C7000020 EC06C720 C8168920 C6A30856 88064688 20E21689 ..ã .F..V.Èó ..à ú.š ..ú.õ ..Õ.. 000160
20E6A320 CEA320E8 A320CCA3 2000A3C0 28000120 EE06C703 08E90374 25F67E80 .--%t.Õ..ú.Ÿ ..+ãÈÄ Èä ÈÒ Èö È| 000180
C70A46FF 49753001 7F80260A 5EC40020 225606C7 20DEA320 C4A320CA A320E4A3 Èõ Èò Èó ÈB ú.V" .á^.&...0uI.F.ú 0001A0
80269028 EB000020 E406C720 D006FF0D 75283F80 260A5E88 903EE800 30225606 .V"0.Š>..^.&.?+u...Å ú.õ ..Š(.&. 0001C0
75203F80 260A5EC4 00EB20C4 06FF9014 EB20E406 FF1A7500 20003E83 0E75203F ? u..>Å .u...õ Š....á Š.á^.&.?-u 0001E0

Dump of file SATURN:[PCCOMMON.DUMP.DLL]UTL.TMP;1 on 18-APR-1990 10:53:36.50
File ID (957,10,0)   End of file block 75 / Allocated 76

Virtual block number 28 (0000001C), 512 (0200) bytes

76FF0C76 FFDD75C0 0802C483 0978E80E 5098078A 260A5E88 0A46FF20 DE06FFC7 ú..ß .F..^.&...P.Òx..á..âuï.v..v 000000
20F4A120 DE06FF0C 700020F4 3E830C56 890A4689 08C48308 C7E80E20 F4681E0A ..h¶ .Òú..á..F..V..>¶ .)...ß Å¶ 000020
2E3F8026 0A5EC400 20225606 C7067530 22563E83 0D740020 DE3E8320 F4A308F7 %ÄÈ¶ .>ß .t..>V"0u.ú.V" .á^.&.?. 000040
3E830C56 890A4689 08C48308 7BE80E20 EE681E0A 76FF060A 46FF20E6 06FF2D75 u-..| .F...v..hŸ .Ò(..á..F..V..> 000060
4074004E 3D3D7400 46309807 8A260A5E C420E60E FF000120 EE06C70A 7D0020EE Ÿ .).ú.Ÿ ....| á^.&...=F.t==N.t@ 000080
03754C3F 80260A5E C4097500 20CE3E83 000220CE 06C70675 006C302B 74006830 =h.t+=l.u.ú.ö ...>ö .u.á^.&.?Lu. 0000A0
D0E80010 20CE06C7 D8EB0001 20CE06C7 90024EE9 1C75003F 80260A5E C40A46FF .F.á^.&.?.u.ÕN..ú.ö ..ŠÄú.ö ..ŠÅ 0000C0
06FF0875 00583005 74004730 0A740045 3DF84689 98078A26 C8EB0008 20CE06C7 ú.ö ..Šà&....F½=E.t.=G.t.=X.u... 0000E0
0152E903 7E013FE9 03750063 3D0191E9 037E7874 00693DF8 468B20F8 468320CC ë .F½ .F½=i.tx-.Õ..=c.u.Õ?.~.ÕR. 000100
07892620 EAA11FC4 2620E01E C4157502 20CE3E83 900159E9 0140E903 7500253D =%.u.Õ@.ÕY...>ö .u.á.Å &á.Àõ &.. 000120
750020EC 3E830420 E0068307 892620EA A11FC426 20E01EC4 00EB0000 0247C726 &úG...Š.á.Å &á.Àõ &....Å ..>š .u 000140
E9FFFFB8 01AFE903 75200A47 F62620C6 1EC4018D E9037400 20EA3E83 0170E903 .Õp..>õ .t.Õ§.á.ó &-G. u.ÕÈ.¡..Õ 000160
20CA06FF F2EB086A 90C3EB02 C483019E E80E0A6A 000020C4 06C720E8 06FF01AC ¯...Ò ú.á ..j..Ò...á.Šû.j.Š·..ò 000180
287A7401 20CE3E83 0081E903 750820CE 3E830004 20EE06C7 20E606FF 20CC06FF ..ë ..| ú.Ÿ ...>ö .u.Õ...>ö .tz+ 0001A0
000020F4 06C70A74 0020DE3E 83FA4689 20F4A128 7420F406 39FA4689 20CEA3C0 âÈö .Fª9.¶ t(Å¶ .Fª.>ß .t.ú.¶ .. 0001C0
0130E80E 106A0220 E0068320 F4A3C028 027DC008 20F4A105 20F42E83 909013E8 Š.....¶ .Å¶ .ã).+âÈ¶ ..Å .j..Ò0. 0001E0

Dump of file SATURN:[PCCOMMON.DUMP.DLL]UTL.TMP;1 on 18-APR-1990 10:53:36.50
File ID (957,10,0)   End of file block 75 / Allocated 76

Virtual block number 29 (0000001D), 512 (0200) bytes

A300052D FA468B15 740020DE 3E832274 00FA7E83 02C48304 8DE80E3A 6A02C483 .á.j:.Ò...á..-ª.t".>ß .t..Fª-..È 000000
8300F1E8 0E106A04 20E02E83 000020F4 06C79007 EB20F4A3 C02B027D C00B20F4 ¶ .ã).+âÈ¶ Š..ú.¶ ....Å .j..Òÿ.. 000020
76FFF4EB 016A90FF 39E9026E E80E006A 90FF3FE9 106AFF10 E90220E0 068302C4 á...Å .Õ..j.Õ?..j..Òn.Õ9..j.Š¶.v 000040
3D057C00 653DFF0C E9037500 643D90FF 21E90428 E80E256A FF2AE903 49E80EF8 ½.Òl.Õ*.jX.Ò(.Òl..=d.u.Õ..=e.|.= 000060
5689FC46 89400C56 880A468B 0A4EFF0C 56880A46 88097400 20CE3E83 DA7E0067 g.-Õ.>ö .t..F..V..N..F..V.@.F=.V 000080
7400733D FEE0E903 7500703D FEE4E903 75006F3D FE80E903 75006E3D 903AEBFE ±Š:.=n.u.Õ.±=o.u.Õõ±=p.u.ÕÅ±=s.t 0000A0
FC5EC4FC 46FF9034 E80A46FF 9081EBFF 79E90375 007830FE 89E90375 0075308F .=u.u.Õ¿±=x.u.Õy.ŠŸ..F.Š4..F=á^= 0000C0
C483044C E80E0A76 FF0C76FF 500A4628 C38BEC75 253C0474 C00AF646 88078A26 &...F-.ât.<%uš.û+F.P.v..v..ÒL..á 0000E0
C61EC4FC 63E90374 C00AF646 88078A26 0A5EC40C 56890A46 89FE5688 FC468806 ..F=.V±.F..V.á^.&...F-.ât.Õc=á.ó 000100
5606C706 740020E6 3E835657 000012C8 CBC920EA A1FE51E9 0374200A 47F62620 &-G. t.ÕQ±Àõ èùà...WV.>| .t.û.V 000120
2620E01E C4197510 20CE3E83 07740220 CE3E8320 E806FF04 740A067E 83002022 " ..-..t...Ò .>ö .t..>ö .u.á.Å & 000140
2620E01E C4117400 20E83E83 902CEB04 20E00683 FE5689FC 46890257 88260788 ..&.W..F=.V±..Å .Š,..>Ò .t.á.Å & 000160
830220E0 0683FE56 89FC4689 99078B26 20E01EC4 0EE80000 FE46C7FC 46890788 ...F=úF±..Š.á.Å &....F=.V±..Å .. 000180
20F2168B 20F0A122 54A3C02B 9003E806 46880674 FE460BFC 46880E74 0020C43E >á .t..F=.F±t..F.Š..+âÈ|"Åÿ ..· 0001A0
26F246FF F25EC41D 750A067E 83287D00 FE7E8331 750020E8 3E83F456 89F24689 .F·.V¶.>Ò .u1.-±.)+.-..u.á^·.F·& 0001C0
46C79006 EB0001F6 46C7FE56 89FC4689 DAF70002 8308F7FE 5688FC46 8B2007C6 ó.-.F=.V±%Ä.Ø.%Ö.F=.V±úF-..Š..úF 0001E0

Dump of file SATURN:[PCCOMMON.DUMP.DLL]UTL.TMP;1 on 18-APR-1990 10:53:36.50
File ID (957,10,0)   End of file block 75 / Allocated 76

Virtual block number 30 (0000001E), 512 (0200) bytes

```
830AC483 096F1A14 9AFC76FF FE76FF50 1E0676FF FA5E8CF8 46892002 B80000F6 -..|@ .F½.^*.v..P.v±.v=...o..á.. 000000
7EC90BF0 4E89C82B 20EE0E8B 04C48304 8800B69A F876FFFA 76FF4574 0020E63E >Ì .tE.v*.v½.Ñ....á...Ÿ +à.Nþ.è- 000020
C00849C1 8B473005 C62605EB F27EC4F0 4E880000 225406C7 06750822 543E8300 ..>T".u.ú.T"...Nþá-·Š.&6.0G.éI.â 000040
74C90804 8B078A26 F85EC4F2 76C5EE5E 8C20CC0E 8BF04E89 F4468CF2 7E89F47F .¶.-·.F¶.Nþ..ä .^Ÿév·á^Ÿ&.....èt 000060
0020E83E 83EE5E8E F45E8CF2 7689E375 003F8026 F846FF46 202C8003 7C613C07 .<ø|.., F.FŸ&.?.uÐ.v·.^¶.^Ÿ.>Ò . 000080
02C48302 FFE80E50 C02B02EB 0001B805 7500F67E 830B7420 E4060B20 D0A11475 u.ÀÅ ..ö t..--.u.|..Š.+âP.Ö...á. 0000A0
FA5689F8 468920E2 168B20E0 A10001BE 18740006 7E835657 000010C8 CBC95F5E ^_èùà...WV.-..t./..ÀÅ ..ã .F½.V* 0000C0
FA5689F8 46890257 8B26078B 2620E01E C4137408 20CE3E83 008FE902 20E00683 ..À .Ö...>ö .t.á.À &..&.W..F½.V* 0000E0
46880E74 0820CE3E 830420E0 0683FA5E 8CF84689 FC468907 8B2620E0 1EC410EB Š.á.À &...F=.F½.^*..À ..>ö .t..F 000100
5688F846 88FA5E8C F8468903 F5880975 00FC7E83 900AEB03 EEB81575 FA4608F8 ½.F*u.|Ÿ.Š...-=.u.|¾..F½.^*.F½.V 000120
003F8026 F246FFF2 5EC4900E EB20EE0E 881C7420 E63639F6 2BF45689 F24689FA *.F·.V¶+-96Ì t...Ÿ Š..á^·.F·&.?. 000140
DE3E83FE 2B20F43E 8BF37500 3F8026F2 46FFF25E C44690ED EB107ECE 38461574 t.F;ö-.ŠÙ.Fá^·.F·&.?.uæ.>¶ +±.>ß 000160
7400200E 3E8306C4 8301B3E8 0EF876FF FA76FF56 02C48301 59E80E57 08750020 .u.W.ÒY..á.V.v*.v½.Ö°..á..>ß .t 000180
83FE5689 FC468920 E2168B20 E0A10000 06C890CB C95F5E02 C483013C E80E5708 .W.Ö<..á.^_èù.à...ÀÅ ..ã .F=.V±. 0001A0
20EE06C7 06750020 E63E83FA 4688C02A 9003EB01 B0057547 067E8306 7467067E -.gt..-.Gu.¯.Š..*â.F*.>Ì .u.ú.Ÿ 0001C0
0676FF20 EE36FF20 CC36FF00 0120EE06 C7067500 20EE3E83 007400FA 7E800006 ...-*.t..>Ÿ .u.ú.Ÿ ...6ä .6Ÿ .v. 0001E0
```

Dump of file SATURN:[PCCOMMON.DUMP.DLL]UTL.TMP;1 on 18-APR-1990 10:53:36.50
File ID (957,10,0)   End of file block 75 / Allocated 76

Virtual block number 31 (0000001F), 512 (0200) bytes

```
1B7400FA 7E800EC4 8304021E FF261F62 068EFC76 FFFE76FF 20F036FF 20F236FF .6· .6þ .v±.v=..b.&.....á..-*.t. 000000
0020C43E 8304C483 04061EFF 261F6206 8E20F036 FF20F236 FF147500 20C43E83 .>á .u..6· .6þ ..b.&.....á..>á . 000020
E0068304 C483040E 1EFF261F 62068E20 F036FF20 F236FF14 750020EE 3E831B74 t..>Ÿ .u..6· .6þ ..b.&.....á...À 000040
04121EFF 261F6206 8EFC76FF FE76FF1B 7420E406 0B2000A1 00002254 06C70820 .ú.T"..ÀÅ ..ö t..v±.v=..b.&.... 000060
0020EC3E 83560000 00C890CB C90129EB 0E50C02B 02E80001 8B0574C0 0804C483 .á..ât.|..Š.+âP.Ö).èù.à...V.>š . 000080
10E8E42A 04882602 478E2607 FF26378B 2606468A 1478044F FF2620C6 1EC43C75 u<á.6 &.O.x..F.&.7&..&.G.&..*öŠ. 0000A0
C95E20EA 06FF9005 EB20EC06 FF077540 06C4830C 47030C9A 0676FF53 20C836FF .6à S.v....G..á.âu...š Š....ö ^è 0000C0
20C636FF 20C836FF 1BE8507E F60B0676 88577500 20EC3E83 56570000 02C890CB ù.à...WV.>š .uW.v..--PŠ..6à .66 0000E0
FF2620C6 1EC41E7E C0084EC6 8B20EC06 FF047540 06C4830C AF030C9A 225636FF .6V"...£..á.âu...š .6N.â-.á.6 &. 000100
88077500 20EC3E83 D4E8E42A 05882602 478E2607 FF263F8B 262256A0 D478044F O.xå.V"&.7&..&.G.&..*öŠå.>š .u.. 000120
20C836FF 22E85E75 0020EC3E 830A768B 56570000 02C8CBC9 5F5E20EA 06010646 F...ö ^_èùà...WV.v..>š .u^Š".6à 000140
C68B0646 FF20EC06 FF047540 06C48300 21030C9A 5098078A 26065EC4 20C636FF .66 á^.Ï...P...Ì..á.âu...š .F..6 000160
2607FF26 3F8B2620 C61EC407 8A26065E C4CD7804 4FFF2620 C61EC425 74C00B4E N.átXá.6 &.O.xëá^.&..á.6 &.?&..& 000180
00000CC8 CBC95F5E 20EA0601 0A468B07 750020EC 3E83CAEB E42A0588 2602478E .G.&..*öŠò.>š .u..F...ö ^_èùà... 0001A0
B69AF476 FF5220F4 368BFA46 89FC4689 C02BF656 89F44689 20F2168B 20F0A156 VÀþ ..· .F¶.V-+â.F=.F*.6¶¯R.v¶.Ñ 0001C0
75082254 3E8308EB 02EE8305 75102254 3E830676 2BF02BF8 468904C4 83095A00 .Z..á..FŸ+þ+v..>T".u..Ÿ.Š..>T".u 0001E0
```

Dump of file SATURN:[PCCOMMON.DUMP.DLL]UTL.TMP;1 on 18-APR-1990 10:53:36.50
File ID (957,10,0)   End of file block 75 / Allocated 76

Virtual block number 32 (00000020), 512 (0200) bytes

```
98078A26 F446FF12 75302256 3E831975 203F8026 F45EC422 7500200E 3E834E01 .N.>B .u"á^¶&.?-u..>V"0u..F¶&... 000000
067E831B 7400200E 3E83077E F6080874 3022563E 83F84EFF 02C483FE 71E80E50 P.Òq±.á..N½.>V"0t..--..>B .t..-. 000020
56297500 200E3E83 0070E80E FC46FF07 74002254 3E830066 E80EFA46 FF077400 .t..F*.Öf..>T".t..F=.Öp..>B .u)V 000040
7E830A74 0022543E 830039E8 0E047500 FA7E830A 7400067E 8302C483 FE7EE80E .Ö-±.á..-..t..-*.u..Ò9..>T".t..- 000060
C70E7400 200E3E83 06C483FE B5E80EF4 76FFF676 FFF876FF 0040E80E 047500FC =.u..Ò@..v½.v-.v¶.Òç±.á..>B .t.ú 000080
50002088 03E8002B 88057400 20003E83 CBC95E02 C483FE38 E80E5600 20225606 .V" .V.Òß±.á.^èù.>À .t.|+.Š.| .P 0000A0
88057400 20CC3E83 17751022 543E8302 C483FDC8 E80E306A CB02C483 FDD2E80E .Ò@».á.ùj0.Òà=.á..>T".u..>ã .t.| 0000C0
80260A5E C40001FE 46C75657 000006C8 CB02C483 FDAAE80E 50007888 03E80058 X.Š.|x.P.Ò˘».á.ùà...WVúF±..á^.&. 0000E0
C7087520 3F80260A 5EC49060 E80A46FF 0220E006 83378826 20E01EC4 12752A3F ?*u.á.À &.7..À ..F.Š`.á^.&.?-u.ú 000100
0A7520E6 36393B7F 393C3F7C 303CFA46 88078A26 0A5E88F6 280A46FF FFFFFE46 F±...F.+-.^.&...F*<0|?<9.;96Ì u. 000120
D1CE0302 E1C1CE88 98058A26 187F393D 802606EB F8880030 225606C7 0675303C <0u.ú.V"0..«Š.&.=9..&....öèÀ..öÌ 000140
26065EC4 F088EEF7 FE4688OC 468C0A7E 890F7030 30802647 F18830E9 83C803E1 À.à.Ö0.þG&.=0)Ö.-..F..F±¥Ÿ.þá^.& 000160
FC7EC406 4E8AFE5E 8CFC4689 03FCB857 000004C8 CBC95F5E 0C56880A 46883789 .7.F..V.^_èùà...W|=..F=.^±.N.á-= 000180
FE468CFC 7E899009 EBFE468C FC7E8900 0188F475 00382611 74003080 264701EB Š.G&.=.t.Ï8.u¶|...-=.F±Š...-=.F± 0001A0
5E880C74 01020587 F6088898 078A2606 5EC45657 04EC83EC 885590C8 C95FC02B +â_èù.U.Š.Š.WVá^.&....Ã-.(..t..^ 0001C0
F6088898 058A2647 F8881674 00653098 078A2606 5E8807EB 00200598 078A2606 .&.... .Š..^.&...=e.t..«G&....Ã- 0001E0
```

```
Dump of file SATURN:[PCCOMMON.DUMP.DLL]UTL.TMP;1 on 18-APR-1990 10:53:36.50
File ID (957,10,0)   End of file block 75 / Allocated 76

Virtual block number 33 (00000021), 512 (0200) bytes

 26065E88 2E07C626 0646FFF0 8898078A 26065EC4 08468C06 7E89F275 0402D587 .f..u·.-..F.6^.&....Þ.F.&6...^.& 000000
 83EC8855 C850E588 5F5EFC7E 89E975C0 0A0646FF F7880788 26C688F8 8898078A ....½.6&...¼.F..âuÕ.-•^_.|]ùU.$. 000020
 FFDF8808 468C067E 89F37500 30802647 07742E30 80269008 E8067EC4 565706EC $.WVé-.Š..&.=.t.G&.=.u.-..F..Ô. 000040
 75003080 26470774 45308026 0074653D 8026900E E8067E88 6774003F 80260646 F.&.?.tg.-.Š..&.=et.&.=Et.G&.=.u 000060
 74303080 264F9002 E8067E88 FE5689FC 4689064E FFC28CC7 8808468C 067E89ED Ú.-..F..ú.ô.N..F•.V±.-.Š..O&.=Ot 000080
 26AC065E C40646FF FC76C5FA 5E8C064E FF03752E 3F80260F 8808468C 067E89F9 •.-..F..Ô&.?.u..N..^•év•.F.6^.¨& 0000A0
 187C9A1F 641E80EC 885590C8 5DE5885F 5EFA5E8E FE5E8CFC 7689F275 C00A0788 ...âu·.v•.^±.^•^_.|]ù.U.$..d..|. 0000C0
 08EC83EC 8855C850 C028C850 00018805 7210511F FC9A102D 185C9A06 5EC41028 (.6^..\.-..•.Q.r¯.|..]ù+â]ùU.$.$. 0000E0
 DA8E1EF0 88F88808 5EC404C4 83107518 FA9A0C76 FF0E76FF 24740006 7E835657 WV.-..t$.v..v..•.u..6.6^..«.Þ..Ö 000100
 16F088F8 7E8004C4 83108F18 FA9A0C76 FF0E76FF 90C850E5 885F5E1F A5A5A5A5 ÉÉÉÉ.^ .|)ù..v..v..•....á..-½.Þ. 000120
 90C850E5 885F5E11 081CCF9A 085EC410 97187C9A F85E8D1F A5A5A5A5 DA8E1E07 ...ÖÉÉÉÉ..^½.|...6^..Ù...^_.|]ù. 000140
 26F85EC4 FA5689F8 4689225A 16882258 A1477400 04223E80 56570AEC 83EC8855 U.$.š.WV.>"..tGÀX"..Z".F½.V•6^Y& 000160
 01880067E 000E7E83 FE5689FC 46890C56 880A4603 C02802E8 00018805 75203F83 .?-u.|..Š.+â.F..V..F•.V±.-..-.|. 000180
 77FF2606 77FF2606 5EC458E8 06C48304 50E80EFC 76FFFE76 FF50C028 9003E800 .Š..+âP.v±.v•.Ò]..6.ŠX6^.&.w.&.w 0001A0
 0E7E8350 400E4688 5052FA56 89F84689 08C48311 4920089A 37FF2602 77FF2604 .&.w.&.7.Û I..á..F½.V•RP.F.∂P.-. 0001C0
 4603C703 C02802E8 00018805 75203F83 26F888F8 5EC4C028 02E80001 88057E00 .-.|..Š.+âé^½.½&.?-u.|..Š.+â.ú.F 0001E0

Dump of file SATURN:[PCCOMMON.DUMP.DLL]UTL.TMP;1 on 18-APR-1990 10:53:36.50
File ID (957,10,0)   End of file block 75 / Allocated 76

Virtual block number 34 (00000022), 512 (0200) bytes

 3F8326F8 5EC4FE56 89FC4689 0C56880A 46880AC4 8311A319 509A5052 0C56880A ..V.RP.P.È..á..F..V..F•.V±6^½&.? 000000
 FC46FF07 88260147 8A26FC5E C4147E00 0E7E832D 07C626FC 46FFFC5E C40A752D -u.6^•.F•&6.·.-..-.6^•&.G.&...F• 000020
 5052FE56 88FC4603 0E46030B F7C01801 04223E80 501E041C 882E07C6 26FC5E88 .^•&6..|...P.>"...á¼À.F..F•.V±RP 000040
 5EC4FC46 FF4507C6 26FC5EC4 07740010 7E83FE56 89FC4689 08C48312 0000569A .V.Ì..á..F•.V±.-..t.6^•&6.E.F•6^ 000060
 FC5EC4F0 88D8F708 7DF608F0 88480247 8826F85E C45E7430 3F802606 5FC426F8 ½&6_.&.70t^6^½&.G.H.Þ.-}.¼À.Þ6^• 000080
 88F9F799 C6880700 26FC5EC4 F9F70064 8999C688 157C64FE 83FC46FF 2007C626 &6.¯.F•.±d|..6.¿d.¼•6^•&...6.¼•. 0000A0
 46FFF288 F9F799C6 88070026 FC5EC4F9 F7000A89 99C68815 7C0AFE83 FC46FFF2 ·.F•.±.|..6.¿..¼•6^•&...6.¼•.·.F 0000C0
 042206C6 04EC83EC 885590C8 50E5885F 5E0C5688 0A468807 0026C688 FC5EC4FC •6^•.6&...F..V.^_.|]ù.U.$.$.6.". 0000E0
 2206C6FE 5689FC46 89FE49E8 0E0676FF 0876FF0A 76FF0C76 FF0E76FF 1076FF01 ..v..v..v..v..v..v..Òl±.F•.V±6." 000100
 4689225A 16882258 A1517400 04223E80 00F246C6 12EC83EC 8855C850 E5880004 ...|]ùU.$.$.6F·..>"..tQÀX"..Z".F 000120
 FE5689FC 46890C56 880A4603 C02802E8 00018805 75203F83 26F45EC4 F65689F4 ¶.V-6^¶&.?-u.|..Š.+â.F..V..F•.V± 000140
 883007C6 26EE46FF EE5EC4F0 5689EE46 89042406 03FC4688 6A750E46 390424A1 À$.9F.uj.F•..$..FŸ.VÞ6^Ÿ.FŸ&6.0. 000160
 83130020 D89A37FF 260277FF 260477FF 260677FF 26065EC4 4AE80007 C626EE5E ^Ÿ&6..ŠJ6^.&.w.&.w.&.w.&.7.Û ... 000180
 02E80001 8805752D 3F832650 0E460302 47882AF4 5EC45052 F65689F4 468908C4 á..F¶.V-RPá^¶&.G..F.P&.?-u.|..Š. 0001A0
 5EC4FE56 89FC4689 0C56880A 46880AC4 830C0819 509A5052 0C56880A 4603C028 +â.F..V.RP.P....á..F..V..F•.V±6^ 0001C0
 FF500001 881D7F00 027F8326 F45EC42D 07C626FC 46FFFC5E C40A752D 3F8326F4 ¶&.?-u.6^•.F•&6.-6^¶&......|..P. 0001E0

Dump of file SATURN:[PCCOMMON.DUMP.DLL]UTL.TMP;1 on 18-APR-1990 10:53:36.50
File ID (957,10,0)   End of file block 75 / Allocated 76

Virtual block number 35 (00000023), 512 (0200) bytes

 01024788 26F45EC4 0AE83007 C626FC46 FFFC5EC4 06C48302 05E80EFC 76FFFE76 v±.v•.Ò...6.6^•.F•&6.OŠ.6^¶&.G.. 000000
 26FC46FF FC5EC406 C48301D8 E80EFC76 FFFE76FF 50000188 687E000E 7E83FC46 F•.-..-h|..P.v±.v•.ÒÄ..á.6^•.F•& 000020
 02478826 0EE808F7 02478826 08740004 223E8043 7D00027F 8326F45E C42E07C6 6..6^¶&....)C.>"..t.&.G.¼ÄŠ.&.G. 000040
 30880E76 FF06C483 0196E80E FC76FFFE 76FF500E 46890E46 88037E0E 463808F7 ¼Ä;F.-..F._F.P.v±.v•.Ò...á..v.¡0 000060
 04EC83EC 8855C850 E5880C56 880A4688 08C48314 2402809A FC76FFFE 76FF5000 .P.v±.v•.¯.$..6..F..V..|]ùU.š.š. 000080
 06C6FE56 89FC4689 FE6EE80E 0676FF08 76FF0A76 FF0C76FF 0E76FF01 042206C6 6."...v..v..v..v..v..Òn±.¨•.V±6. 0000A0
 FF260277 FF260477 FF260677 FF26065E C45606EC 83EC8855 90C850E5 88000422 "...|]ù.U.$.$.Vá^.&.w.&.w. .w.&. 0000C0
 203F8326 0424A348 02478826 22581EC4 225A1689 2258A308 C4831460 20089A37 7.Û '..6.ÈX"..Z"6.X"&.G.HÈ$ " ?- 0000E0
 19509A50 520E76FF 5306FE56 89FC4689 0C56880A 4603C028 9003E800 01880675 u.|..Š..+â.F..V..F•.V±.S.v.RP.P. 000100
 24368904 26A2C02A 02E80180 04700424 36394E02 77882622 581EC40A C4831560 '..á.6.X"&.w.N96$.).¯.Š.•âÀ&..6$ 000120
 0E0676FF 0876FF0A 76FF0C76 FF0E76FF 1076FF1F 7F0E4639 C688077C FCFE8304 ..±•|..69F....v..v..v..v..v..v.. 000140
 F97500FF 7C8046FC 76C5FA5E 8C1E7400 04263E80 90C850E5 885E0CC4 83F093E8 Ò.».â.^.|]ù..>&..t..^•év•F.|..u• 000160
 0676FF08 76FF0A76 FF0C76FF 0E76FF00 FE47C626 FC5EC4FA 5E8EFE5E 8CFC7689 .v•.^±.^•6^•&6G±..v..v..v..v..v. 000180
 76FF1276 FF197545 0E7E8306 74650E7E 83EC8855 C850E588 5E0AC483 FEF6E80E .Ò-±.á.^.|]ùU.$.-.et..-.Eu..v..v 0001A0
 0C76FF10 76FF1875 660E7E83 9035E8F8 8FE80E06 76FF0876 FF0A76FF 0C76FF10 ..v..v..v..v..Ò.«Š5..-.fu..v..v. 0001C0
 76FF0A76 FF0C76FF 1076FF12 76FFC850 0AC483FD 39E80E06 76FF0876 FF0A76FF .v..v..v..Ò9».á.]ù.v..v..v..v..v 0001E0
```

Dump of file SATURN:[PCCOMMON.DUMP.DLL]UTL.TMP;1 on 18-APR-1990 10:53:36.50
File ID (957,10,0)   End of file block 75 / Allocated 76

Virtual block number 36 (00000024), 512 (0200) bytes

```
00B69A06 76FF0876 FF297400 0A7E83EC 8B5590C8 5D0CC483 FEC0E80E 0676FF08 ..v..Òã±.á.]ù.U.š.-..t).v..v..Ñ. 000000
0AC48310 201A429A 50520856 88064603 0A468806 76FF0876 FF504004 C483157B {..á.@P.v..v..F..F..V.RP.B. ..á. 000020
FFFF9A04 28681E04 2A681E1A 8EA3E086 580000FF FF9A5016 C48850EC 8B55CB50 ]ùU.šP.á.P.....X.Àè...h*..h(.... 000040
6815B816 6E9A15AB 16149A50 CB5DE58B 0001B813 C8223A9A 0BA2E800 21E80000 ..Ò!.ÒÀ..:"ù.|...[]ùP... ..n.|.h 000060
3174003D 80264701 75003D80 267FFFB9 042A068E FF330000 BB1E0430 16FF00FF ....0..£..3...*.¿..&.=.u.G&.=.t1 000080
2CAC1A95 BF1FF78B 071E061C EBE774AE F2C03308 74CA8BA6 F3CB8B01 8B0834BE ƒ4..|.ùµ|.òt.3à·ÜtÒŠ.....¾.¢..¯, 0000A0
15BD166E 9A5000FC 8BEC8B55 00C31FED EBAAC20A 0572412C AC9204E0 C0DE7241 Ar.ãÀ..¯,Ar..ô¨ŠÙ.ù.U.š|•.P.n.§. 0000C0
8B55FF76 E90002B8 CB5DE58B 161E166E 9A5000FF B808421E FF047400 08443E83 .>D..t...B.|..P.n....[]ù|..Õv.U. 0000E0
F2FFFFB9 C033970C 74964010 74C238AD 1F74BE06 5688C08E D88E03A7 8B5756EC šVW¡Ï..Ä.ã.V./t.Ü;ôt.@.t..3à¿..· 000100
8B921F74 C00B1632 163E9A06 76FF57EC 8B550002 CA5DE58B 5E5F96EB EBF788AE Ü.%ŠŠ._^.[]ò..U.šW.v..>.2..ãt... 000120
E58B5F5B 0000FFFF 9A501651 521E5300 02BBC48B 5049D1F7 AEF2FFFF B9C033FA ª3à¿..¯Ü¾||P.áE..S.RQ.P.....[_.Ì 000140
E001C103 E001C88B F9F7000C 89990890 20044688 1CA606FF 000004C8 0002CA5D ]ò..à.....Ì..F.·...¿..¾ª.àìÀ.ëìÀ 000160
08085789 26064789 26045EC4 02C48316 7823EF9A 020068FE 5E8CFC46 89148405 ....F•.^±h...ÿ#x..á.á^.&.G.&.W.. 000180
88FC468B 040A4F80 26045EC4 9021E802 000247C7 26FC5EC4 080A4F80 261174D0 Ât.&.O..á^•&ùG...Š!.á^.&.O...F•. 0001A0
2608578B 2606478B 26045EC4 00010247 C726FC5E C4085789 26064789 2640FE56 V±@&.G.&.W.á^•&ùG...á^.&.G.&.W.& 0001C0
E9C03300 09BA0872 1A931E3B 065E8BEC 8855C3C9 00000447 C7260257 89260789 ..&.W.&ùG...èùU.š.^.;...r.¤..3àÕ 0001E0
```

Dump of file SATURN:[PCCOMMON.DUMP.DLL]UTL.TMP;1 on 18-APR-1990 10:53:36.50
File ID (957,10,0)   End of file block 75 / Allocated 76

Virtual block number 37 (00000025), 512 (0200) bytes

```
75C0855A 590000FF FF9A5116 0C76FF08 76FF0A76 FF53CC8B 04EC830C 58E90C4C L.ÕX..š..ëS.v..v..v..Q.....YZ.àu 000000
C0330009 BA08721A 931E3806 5E8B0CEC 83EC8855 00CB5DE5 8BFD1A95 A78091E1 Ã..Ï..».[]ù.U.š.š..^.;...r.¤..3à 000020
1A9587F6 00001757 9A5016F4 468D5141 415151C9 33531274 201A9587 F60C08E9 Õ..-... t.S3èQQAAQ.F¶.P.W...-... 000040
4E88F866 89F288FA 885657FC FC4689FE 4689C033 0856C50A 468EFA5E 8C667480 .tf.^ª.F.éV.3à.F±.F••WV.ª.·.f%.N 000060
740A3CAC 0C4E8807 16FA88D4 88E22800 808AD C8B 02EC8338 75AEF20A 8049E30C .DI¯.·Ùu;.š..Ê¤..+ã.å.ª...N.¯<.t 000080
E8E2E8FC 46FF0AB0 AA001FE8 0375FB3B 0D80009A E9002BE8 F4E2AA1A 74FB3B00 .;«t.¨ã¶Ò+.Õ..¯.;«u.Ò..¯¯..F•Šãò 0000A0
CA28CF88 1F061E51 535016CF 21269AFF FCB87AEB 0093E9FA 5E8E5F5E E1E80014 ..ŠÄ^_.^ªÕ..Šz|•..&|ü.PSQ....ü+ò 0000C0
740B0BFE 5E01F45E 881175C0 08000016 989A5016 F4468D51 521E5306 5E8B1FE3 Ð..^.Š.RQ.F¶.P......àu..^¶.^±.Üt 0000E0
001CBA08 7500098A 00013D0D 74006D3D 1874C00B 08C4831F C3FA8B58 5B591F07 ..Y(X.ªù..á..àt.=m.t.=..¤..u.¤.. 000100
0EEBF803 751A3F80 085E880A 5E8E0E74 401A9587 F6FE5E8E 26E8F900 208A03EB Š.¤ .ªŠ&.^±-...@t..^..^..?.u.%Š. 000120
880AEFE9 CB5DE58B 0472FA5E 8E5F5EF8 668BFC46 28FE468B 06EBF9C0 33001CBA ¤..3àªŠ..F±+F•.f%^_.^ªr..[]ùÕÿ.. 000140
081F071E 0000182F 9A5016F4 468D5152 1E530856 C51EEEEB C1880475 C90B0C4E N..èu..èŠY.éV.S.RQ¯F¶.P./....... 000160
75C00BF4 4688C2EB 0020BAC7 EB001C8A CC750009 8A00013D 0D74006D 301774C0 åt.=m.t.=..¤..uä¤..Šù¤ .Šò.F¶.àu 000180
56570000 00C800A3 EBC03300 1CBAA6EB 02751A3F 8026DA8B 0A74401A 9587F6B7 ñ-...@t..Ö&.?.u.Š|¤..3àŠÈ.à...WV 0001A0
5706006A 006A0846 8C067E89 F2750802 D587F6D8 8898058A 26479002 EB067EC4 á-.Š..G&....Ä-.{..u·.-..F.j.j..W 0001C0
1E071EF0 88225C8F 0008050A C4831814 33989A57 0876FF50 04C48319 3000B69A .Ñ.0..á.P.v.W..3...á....¢ ".Þ... 0001E0
```

Dump of file SATURN:[PCCOMMON.DUMP.DLL]UTL.TMP;1 on 18-APR-1990 10:53:36.50
File ID (957,10,0)   End of file block 75 / Allocated 76

Virtual block number 38 (00000026), 512 (0200) bytes

```
89F84689 08568806 46885657 00000AC8 C8C95F5E DA8C225C 881FA5A5 A5A5DA8E .ÖEEEÉ.|\".Ö^_èùà...WV.F..V..F%. 000000
0A7E8330 07C626F8 46FFF85E C4FE5689 FC468908 57882606 4788260C 5EC4FA56 Vªá^.&.G.&.W.¯F•.V±á^%.F%&6.0.-. 000020
30B09003 EB078A26 FC46FF09 74003F80 26FC5EC4 F876C5F6 5E8C0A4E 882E7E00 .-..N..^-év%á^•&.7.t..F•&..Š..¯0 000040
5EC4287C 000A7E83 0007C626 F85EC40A 4E89F65E 8EFA5E8C F87689E7 E2460488 ..Fãò.v%.^ª.^-.N.á^%&6...-..|(á^ 000060
468CF87E 89F57439 3080264F 3005C626 9006E8F8 7EC4F84E FF1F7C35 3F8026FC •&.?5|..N%á-%Š..&6.0O&.=9t¾.-%.F 000080
52400856 88064688 15E80247 FF260C5E C4097531 3F802606 5EC407FE 260F88FA ª.Õ&±.á^.&.71u.á^.&.G.Š..F..V.@R 0000A0
8B5508 3E E900B357 56EC8B55 000090C8 C95F5E08 C4831923 00569A06 76FF5250 PR.v..V.#..á.^_èù...U.ŠVWª.Õ>.U. 0000C0
50E588C0 3302E800 01880574 401A9587 F60C7C00 F883117D 1A931E3B 065E8BEC &.^.;...)..«.|¯-...@t.|..Š.3à.[] 0000E0
08253E9A 5706561E 067EC40A 76C55657 1E0085E9 0375C908 0E4E8BEC 885500C8 ù.U.å.N..èu.Õç..WVév.á-..V.W.>%. 000100
8C0773F9 03D88E02 E305D88C 0773F103 49507300 DA83C128 57780208 0E4E881A ..N..ØxW+è.Õ.sPI.þs..Ä.D..Ä.ªs.. 000120
F3FDC128 9140C603 C3230818 C628C703 C3230818 C72848C1 8841C08E 1A7705C0 å.w..åA.èH+ú.Ú#ù.ú+ó.Ú#ù.ó@.+è«µ 000140
88C8E8C0 8E1AA020 C08CD175 FFFF83D8 8E1A8220 D88C0775 FFFE835C E391FCA4 Ê•.D\.±.u..Ä-...Ä...u!.à-Ù..àŠà. 000160
E901C128 9140C203 C3230818 C22B02F7 D688C203 C3230818 C22B02F7 D78848C1 èH.«K@+ó.Ú#ù.ó.«K@+ó.Ú#ù.ó@.+èîÕ 000180
E8C08E1A F005C08C C775FF08 D88E1AB9 05D88C07 75F60818 E391A4F3 C913A5F3 µÉ.èµÉ.D..-u..Ä.¿..Ä..uú.à.Þ..àŠ 0001A0
8CC08CFB 880CC383 1EFC1E88 F3885756 C08ED08C C8500856 88064688 1F5F5E8E ƒ^_..F..V.]ù.Ä.àVW.µ..•..ù..«.à. 0001C0
FCC18ED9 8CF8880C C3831EFC 1E88F388 575616E8 F38809 8E A5A5FCD8 8EC18ED9 ).Ž.Ä•ÉÉ.).µŠ.VW.µ..•..û..«.).è• 0001E0
```

Dump of file SATURN:[PCCOMMON.DUMP.DLL]UTL.TMP;1 on 18-APR-1990 10:53:36.50
File ID (957,10,0)   End of file block 75 / Allocated 76

Virtual block number 39 (00000027), 512 (0200) bytes

```
F38B5756 C08ED08C CB5E5F03 FE47C6FC 77891EFC 1E894E74 1EE8F881 F388A5A5 ÉÉ.µ.«Ò.tN..▪..w▪6G±._^ù.Å.åVW.µ 000000
F38B5756 18E8F388 D98EA5A5 A5A5FCD8 8EC18ED9 8CC08CF8 880CC383 1EFC1E88 ..▪..û..«.å.).é.Ä▪ÉÉÉÉ.).µŠ.VW.µ 000020
47C61EFC 1E890E74 1EE8F881 F388A5A5 A5A5FCC1 8ED98CF8 880CC383 1EFC1E88 ..▪..û..«.).é▪ÉÉÉÉ.µ.«Ò.t...▪.6G 000040
1E88F388 FCD88EC1 8ED98CD8 8C575604 EBD08C57 560A32E9 CB5E5FFC 778907FE ±..w▪_^ùÖ2.VW.ÅŠ.VW.Ä.).é.Ä▪.µ.. 000060
FC5F891E FC1E89CF 741EE8F8 81A5A502 74033CA5 A5FE4588 ADF8880C C3831EFC ▪..û.¯«Ù.E±ÉÉ<.t.ÉÉ.«Ò.tü..▪.._▪ 000080
57880788 0AEB9907 8B26C08E D08C14EB 02578826 078826C0 8ED08CCB 5E5FD98E .)_^ù.Å.å&..&.W.Š..Å.å&...Š...¯W 0000A0
0CC7831E FC3E8800 D8830AF7 D8F70779 8024C78A D088DA88 57569907 8803E802 .Š¯....VW.Ö.Å.ú$.y.%Ú¼Ö.Ü..›▪..ú. 0000C0
5F0F53E8 9E8403FE 45C60F75 00FF80C1 8ED98CFC 7D891EFC 3E891C74 1EE8FF81 ..Ò.t..>▪..)▪.).è...u.6E±.\ ÒS._ 0000E0
C08ED88C 5756C85E 5F5D12B2 E8F888D8 33C88887 608D5507 FE45C6FF 63E9C85E ^ùÖc.6E±.U§'..ù3Ù.«Òý.]_^ùV« ¹.ã 000100
A5A5FCFE 4588FC7D 891EFC3E 8981741E E8FF810C C783FE45 8AFC7588 1EFC3E88 .>▪..u▪.E±.ú...Ò.tÝ.>▪..¯)▪.E±▪ÉÉ 000120
C6FC7D89 1EFC3E89 8C741EE8 FF810CC7 831EFC3E 885756CB 5E5FA5A5 0274033C <.t.ÉÉ_^ùVW.>▪..ú...Ò.t..>▪..)▪6 000140
1EFC1E88 FCF88857 56C08ED8 8C02E8D0 8CC85E5F A8A8FCC0 33C08ED8 8C03FE45 E±..Ä.ã3á▪¨¨_^ù.ÅŠ..Ä.åVW.«▪..▪. 000160
77880075 03FE7F80 1EFC1E88 FCF88857 56C08ED8 8C02E8D0 8C11E80C 1EFC0683 ..▪..Š..ÅŠ..Ā.åVW.«▪..▪...±.U..w 000180
E8D08CE4 E85DDE88 5F0975E8 57FC7788 1C802689 55C85E5F 0C1EFC2E 83A5A5FC ▪ÉÉ..▪.._^ùU.&¯..w▪WÒu._.ß]ŠÖ.ÅŠ 0001A0
8B5756C0 8ED88C02 E8D08C11 E80C1EFC 06831EFC 1E88FCF8 8B5756C0 8ED88C02 ..Ä.åVW.«▪..▪...▪..Š..ÅŠ..Ä.åVW. 0001C0
18A3E80F 87C85E5F 0C1EFC2E 83A5A5A5 A5FC7788 0F7507FE 7F801EFC 1E88FCF8 «▪..▪...±.U..w▪ÉÉÉÉ..▪.._^ù.ÒÒÈ. 0001E0
```

Dump of file SATURN:[PCCOMMON.DUMP.DLL]UTL.TMP;1 on 18-APR-1990 10:53:36.50
File ID (957,10,0)   End of file block 75 / Allocated 76

Virtual block number 40 (00000028), 512 (0200) bytes

```
EBD08C10 E80C1EFC 06831EFC 1E88F888 5756C08E D88C02E8 D08CE9E8 DF87F788 .%.ÖŠÖ.ÅŠ..Ä.åVW.«..▪...▪..Š..ÅŠ 000000
A5027403 3CA5A5A8 FC0C1EFC 2E83FE47 8AF3881E FC1E88F8 885756C0 8ED88C02 ..Ä.åVW.«..▪..µ.G±..▪..▪¨ÉÉ<.t.É 000020
A6880862 26889F1A 5F1E059A 48E82788 8A278688 50E82762 8A275888 C85E5FA5 É_^ù¦X'¤b'$P¦.'¤.'$H.._....&b.¡Ì 000040
0862268A 500A1EE8 9004E80A 59E8900A E80A08E8 9010E80A 0CE836E8 1DAC8A10 .¤¯.$6Ö..Š..Ö..Š..ÖY.Š.¯Ö..P.&b. 000060
89555756 1D888A1D 82880862 26889F10 971E059A C30AF700 D28308F7 0773589E .Xs.%Ä.@.%Öù.......&b.¦ý.¤¦.VWU. 000080
59D2FF02 E800FF04 75087488 030A7C80 1EFC3689 0CEE831E FC368851 531C8026 &¯.SQ.6▪..Ÿ..6▪..|...t.u..ÅŠ..@Y 0000A0
5F0875F0 FF41F608 7403F880 13757F01 F6FF32FE 5D8A1EFC 3E8857C8 5E5F5058 []_^ùW.>▪..]±2.-..u..«.t.-A.Þu._ 0000C0
5F7F2180 FF32FE5D 8A1EFC3E 8857C8F9 C8E40803 755F8001 F6F87480 FF41F6C8 ù-Ā..t½-.._u..Öù'ùW.>▪..]±2..¦._ 0000E0
C18ED98C FC7D89C8 5E5F8031 80FF3208 75F738FC 7588FE5D 8A1EFC3E 885756C8 ùVW.>▪..]±¯u▪;%u.2..¦._^ù.)▪.).ē 000100
E8C08ED0 8C5756C8 5E5FA880 F480ADA5 A5C85E5F A880F480 AD087503 F880A5FC ▪E.«.u.Ù.¶.¨_^ùÉÉÙ.¶.¨¯^ùVW.Å.åŠ 000120
04E81717 E8575602 E8C08ED0 8C575676 E80008B8 F38B5756 04E8172F E8575602 .VWÒ/.Š.VW.µ¦..ŠvVW.Å.ãŠ.VWÒ..Š. 000140
E8000C88 F38B5756 04E816FF E8575602 E8C08ED0 8C57565E E80004B8 F38B5756 VW.µ¦..Š^VW.Å.åŠ.VWÒ..Š.VW.µ¦..Š 000160
E8C08ED0 8C57562E E80014B8 F38B5756 04E816E7 E8575602 E8C08ED0 8C575646 FVW.Å.åŠ.VWÒÖ.Š.VW.µ¦..Š.VW.Å.åŠ 000180
04E81687 E8575602 E8C08ED0 8C575616 E80010B8 F38B5756 04E816CF E8575602 .VWÒü.Š.VW.µ¦..Š.VW.Å.åŠ.VWÒñ.Š. 0001A0
FF1C8026 8955FC7D 87107407 FE7D80C1 8ED98C1E FC3E88D8 88000088 F38B5756 VW.µ¦...Ä.>▪..).è.)±.t..)▪U.&¯.. 0001C0
02E8C08E D08C5756 DFE81EFC 3E88F788 16C2E81D 7E8F02C3 83C85E5F 5D084697 .F.]_^ù.ù.¢-.Òò..%.>▪.ŠÒVW.Å.åŠ. 0001E0
```

Dump of file SATURN:[PCCOMMON.DUMP.DLL]UTL.TMP;1 on 18-APR-1990 10:53:36.50
File ID (957,10,0)   End of file block 75 / Allocated 76

Virtual block number 41 (00000029), 512 (0200) bytes

```
5604E816 6EE85756 02E8C08E D08C5756 76E8000A 88F38857 5604E816 86E85756 VWÒ..Š.VW.µ¦..ŠvVW.Å.åŠ.VWÒn.Š.V 000000
46E8000E 88F38857 5604E816 56E85756 02E8C08E D08C5756 5EE80006 88F38857 W.µ¦..Š^VW.Å.åŠ.VWÒV.Š.VW.µ¦..ŠF 000020
02E8C08E D08C5756 2EE80016 88F38857 5604E816 3EE85756 02E8C08E D08C5756 VW.Å.åŠ.VWÒ>.Š.VW.µ¦..Š.VW.Å.åŠ. 000040
5604E816 0EE85756 02E8C08E D08C5756 16E80012 88F38857 5604E816 26E85756 VWÒ&.Š.VW.µ¦..Š.VW.Å.åŠ.VWÒ..Š.V 000060
0488FF39 E95E1609 E8560574 07FE7D80 C18ED98C 1EFC3E88 D8880002 88F38857 W.µ¦...Ä.>▪..).ê.)±.t.VÒ..^Ö9.£. 000080
E8001C88 08E80000 880DE800 14B812E8 00108817 E8000C88 1CE80008 8821E800 .Š¦£..Š.£..Š.£..Š.£..Š.£..Š.£..Š 0000A0
8ED88C1E FC3E890C EF832874 07F27D80 397407FE 7D801EFC 3E885756 00188803 .£..VW.>▪..)±.t9.)·.t+.Ÿ..>▪..Ä. 0000C0
5E5F5D08 4697FF1C B0268955 3E7318F8 832F731C F883087D 88FC7D89 FC7588C0 å.u▪.)▪.)..«.s/.«.s>U.&¯...F.]_^ 0000E0
F7878FE8 1587E81E FC3E890C EF83C474 07F27D80 02C383CD E8159CE8 02C383C8 ù.ù.Ò..Šë.û..)·.tå.ÿ..>▪.Ò._Š¢¯% 000100
084697FF 1C802689 550C1EFC 2E83C85E 5F5D0842 97FF1C80 2689550C 1EFC2E83 ..▪..U.&¯...B.]_^ù..▪..U.&¯...F. 000120
000C8803 E8FF32DF 02E7D0F8 8AE3D0E3 D0C89E5E 5FE00AE4 D0E8D141 00259F5D ].%.AÌÒÅÖ.Å_^.ùÃDÅO.«ÅÖ.Ö2.Š.£.. 000140
F4E24747 1D88FE44 890587AD 000589F8 28FE884E 4E1EFC36 88FCC08E D88C5756 VW.Ä.â▪.6▪.ÑN.±+«¿..Ù...D±..GGã¶ 000160
5756EC88 55C85DE5 885E5F15 0EE80374 07FE7D80 1EFC3E88 5756EC88 55C85E5F _^ùU.ŠVW.>▪..)±.t.Ò.._^.|]ùU.ŠVW 000180
C8880876 8F5D1383 E855086E 8EA536A5 36A536A5 36086E8F 06768DC0 8ED88CFC ▪.Ä.å.v.¢n.6É6É6É6É/n¯UÒ..]¢v..à 0001A0
C788DA8C 085D8C08 760645C7 044D8902 55891D89 FF320864 8FAA91A4 F39198AC ¯..µÉ.¯¢d.2....U..M.ùE.v..]..Ö.ú 0001C0
33057540 088AA1C8 5152E388 0572088E 1E380872 D828DC88 5A59C850 E5885E5F _^.|]ùYZ.É+Är.;...r..DRQùÅ..ãu.3 0001E0
```

```
Dump of file SATURN:[PCCOMMON.DUMP.DLL]UTL.TMP;1 on 18-APR-1990 10:53:36.50
File ID (957,10,0)   End of file block 75 / Allocated 76

Virtual block number 42 (0000002A), 512 (0200) bytes

FFFF9A52 16501653 C48850B7 1A95A780 D4885200 0288088A 2EFF5152 F470E9C0 ôÕp¶RQ....£..R.å.Ì..ñP.áS.P.R... 000000
4E0E885A D47948 1A 958F0808 81067500 02300774 00013040 81127558 C0080000 ...àXu.Ýà=..t.=..u.Ý.....KyåZ..N 000020
4C1EFF00 038BC28C 1F5406C4 F4A4E903 731F4C1E FF0833C2 8C1F5006 C41EE31F .D.á.P..ô3Ü..L.s.ÕÉ¶á.Ì..ö£....L 000040
C7680E01 6A08741F 5C301F58 880073E8 1F4ABF1F 468E007C E81F588F 1F588E1F ./X.«X.Ò|./F.«J.Ós.¡X.=\.t.j..hú 000060
000021C2 9A006A00 6A036A00 51E81F5C BF1F588E D88E1644 88C30000 FFFF9A21 !.....ú¡Ð..Ä/X.«\.ÐQ.j.j.j..ö!.. 000080
1F5CBF1F 5CBEEC88 5503E800 31E81F5C BF1F588E 003AE822 648F2264 8EEC8855 U.š/d"«d"Ò:./X.«\.Ò1.Š.U.š/\.«\. 0000A0
02880 7E3 1F4E0E88 0000FFFF 9A500646 8A50C033 001AE81F 5CBF1F5C 8E0023E8 Ò#./\.«\.Ò..3àP.F.P.......N.D.£. 0000C0
56570000 14C800C3 EEE81DFF F2740245 08058804 EF830E73 F738C31F 4C1EFF00 ...L.ú;%s..ÿ....E.t·..ŠÝú.à...WV 0000E0
6AF85689 F64689F2 5689F046 89C02804 2A168800 F0E90375 042A3639 FF28F62B +-+.96*.u.ÕÞ...*.+â.FÞ.V·.F-.V½j 000100
8CE90376 7FFFFE81 461974C0 080AC483 22AE2502 9A083468 1EF676FF F876FF0C ..v½.v-.h4...XÜ".á..ât.F.±..v.Õ¥ 000120
26F65E88 F475003F 8026F646 FFF65EC4 0CE847EA 75003F80 26F646FF F65EC400 .á^-.F-&.?.uöGŠ.á^-.F-&.?.u¶.^-& 000140
8322F323 EF9A56EE 5689EC46 8904C483 228D24AA 9A046A50 01458D8A 75003F80 .?.uœ.E.Pj..`$§".á..FŠ.VÝV.ý#µ". 000160
1C98A3EE 5688EC46 886674C2 08FC4688 6D74EE46 08EC4688 FE5689FC 468902C4 á..F•.V±.FŠ.FŸtm.F•.õtf.FŠ.VÝÈ.. 000180
8BEC5EC4 2C74C008 0AC4831D CF25029A 0834681E F076FFF2 76FF0C6A 1C9D1689 ....j..v·.vÞ.h4...Xü..á..ât,á^Š. 0001A0
26FC46FF FC5EC407 8A26F046 FFF05EC4 04EC4683 02578926 078926FE 5688FC46 F•.V±&..&.W..FŠ.á^Þ.FÞ&..á^•.F•& 0001C0
C95F5EA7 75003F80 26F05EC4 F475003F 8026F046 FFF05EC4 E8E80E74 C00A0788 ...ât.ŠÒá^Þ.FÞ&.?.u¶á^Þ&.?.uÌ^_è 0001E0

Dump of file SATURN:[PCCOMMON.DUMP.DLL]UTL.TMP;1 on 18-APR-1990 10:53:36.50
File ID (957,10,0)   End of file block 75 / Allocated 76

Virtual block number 43 (0000002B), 512 (0200) bytes

0D10120F 1600160C 0808070A 0C090C08 0C070906 00051804 02030202 160190C8 ù............................... 000000
0A810A80 16060972 1C702060 006C0859 00570053 00520243 00410235 02121211 ....5.A.C.R.S.W.Y.l.m p.r....... 000020
0008E8C8 5DE58899 FFFF881A 8A16891A 91A31608 000008D7 02CE08A4 00840982 ....È.ö.■.....È......|....Í]ùÒ.. 000040
133CF7E2 43431674 073A2E18 75E40A00 24892342 881A91A3 C85DE588 99FFFF88 |....Í]ùÈ..E8#¿$..Ðu..:.t.CCã%<. 000060
065EC4EC 885500C3 1A8AA398 01478A2E 430176CA 3C04728C 3C430A76 243C0472 r.<$v.C<¥r.<òv.C..G..È..û.U.$á^. 000080
831E73FF F13D0646 88575602 EC83EC88 55CB5DE5 8801FE4F 80260574 C308C08C .â.ût.&.D±..Í]ùW.$.$.VW.F.=þ.s.. 0000A0
0676FF08 75007BE8 05740018 E8157500 82E81F08 A3127400 25E80875 001F083E >...u.Ò%.t.È..Ò..u.Ò..t.Òx.u..v. 0000C0
FE5E89FE E3834306 5E880776 065E3900 F088CB5D E5885E5F 02C48322 6E36849A ..6n".á._^.Í]ùEÞ.9^.v..^.C.D±.^± 0000E0
A31F0A16 87C28838 74FFFA83 08C48324 2338309A 50028051 0E4F8D50 501EC033 3à.PP.O.Q¯.P.08#$.á..'.t8.ô....È 000100
0000A300 0A880C47 89484800 08A3C033 D88EFE5E 880008A3 DA8E0574 D2081F0C ...@t..ÖE...^±.Ä3àÈ..HH.G.¡..È.. 000120
1F0C1E8E D833064E 88C08ED8 8CC31FD8 8C0006A3 000D0500 0AA30147 8D0002A3 È...G.È.....È...Ä.û.Ä.â.N.3Ü.... 000140
46892407 39009A06 76FF006A 0876FF00 6A560000 0AC8C3D9 8EC18CD2 08122AE8 Ò*..@.ė.1ûà...Vj..v.j..v...9a$.F 000160
89FC4689 02C48324 F023EF9A 56F87688 902FE899 C0280674 FFFFC2F7 FA5689F8 ½.V'%ö..t.+â.Š/..v½V.ý#Þ$.á...F•. 000180
C95EFE56 88FC4688 9007E808 C483244F 02809A50 FE76FF00 6A561274 D008FE56 V±.Åt.Vj..v±P.¯.O$.á.Š...F•.V±^è 0001A0
76C5FE88 C80309F7 AEF2C033 F788067E C4098827 E30E4E88 1E5657EC 885590C8 ù.U.šWV..N.D'.1á-..%3à·Ü%).ù.±év 0001C0
885500C8 5DE5885F 5E1FC188 D1F74949 04740477 FF453A26 C933FF44 8AA6F30A .µÌ.D.3è&:E.w.t.II%Ì.ê.^_.Í]ù.U. 0001E0

Dump of file SATURN:[PCCOMMON.DUMP.DLL]UTL.TMP;1 on 18-APR-1990 10:53:36.50
File ID (957,10,0)   End of file block 75 / Allocated 76

Virtual block number 44 (0000002C), 512 (0200) bytes

880E4E88 0008CA50 E588D318 0A462BE8 D3EAD3FF FFB90C5E 88085688 064688EC &.F..V..^.¿..ÆõÆ$+F..Æ.Í]ò..-N.. 000000
DBF7AA2D 800A7902 080E750A F9831374 C00A93FC 071E570A 7EC51E08 56880646 F..V..é-.W..■..ât..'.u..@y.¯-·%Ü 000020
88AA2704 0276393C 3004D387 92F1F793 F1F70274 C0080233 92F788DA F7000283 .@.%Ö.%.3@.ât.%Þ.%Þ..Æ.0<9v..'`. 000040
C7C85DE5 885E5F1F 580A8CF2 72C73801 448DFF44 880586AC 4F0588E2 75C308C2 ô.ûuã..O¯...D..D.¡úr·.ÖX._^.Í]ùú 000060
AC06C708 E8818031 301CAC06 C712E883 8033301C AC06C71C E8848034 301CAC06 .¯.04¯.Š.ú.¯.03¯.Š.ú.¯.01¯.Š.ú.¯ 000080
9A1CAEA3 E42A3231 1CAC06C7 06758C3C 1D7A1EFF 0474001D 7C3E838A 8030311C .10¯..>|..t...z.<.u.ú.¯.12*ôEÛ.. 0000A0
13166E9A 50FFE405 1CAEA126 0A166E9A 5000FD88 260238E6 9A1CA888 248C1614 ..¥$E`..Ì8.&¡».P.n..&ÀÜ..ô.P.n.. 0000C0
D1FAD129 747F80C2 F7C03302 54880C88 FC1EFC3E 88C3261F 21E09A1C AE36FF26 &.6Û..Å!.&û.>•.•...T.3ã%ö..t)Ì'Ì 0000E0
04408902 45890000 05C73800 C2818FE6 80080109 01FAD108 01090 1FA 01080109 ÌÌÄÌ'ÌÌÌÄÌ'ÌÌÌÄ.Ì..ô.8ú....E..M. 000100
8AAD0C8A F08AAD04 8AC80AAD C888ADFC 1EFC3E88 EAE8D08A C888C3F7 88065589 .U..%û.à.ÅŠõ.>•.•Û.àÛ.à.àÛ.Þ.ÉÜ. 000120
3D7FF025 E922EC8A F90A8081 01CA8003 74CD0AD3 D1E2D103 D1E2D103 D1E2D1F8 %ÌàÌÆÌàÌÆÌàÌÆ,ët..ò.Ý..'.š"ÕXÞ.= 000140
00D38301 C6801074 01C6F615 720777D1 3AE0D1E0 D1E0D138 72380020 3D7747E0 ÀGw=-.8r;ÌÀÌÀÌÀ;Ìw.r.-ó.t..ó..Æ. 000160
F78B0589 C68AE38A 024589E5 0AC70A7F E7801674 C0081774 7F803D00 80050873 s....=..t..ât..Ó..ú.Ì.E..D.ó...% 000180
15790208 DB330088 1DEBC388 D0880A88 D233C3F7 88024589 0589C033 FED8E9C3 ÙÕÜ±3á...E..%û3@.Ö.Ä.ûŠ..À3Ü.@y. 0001A0
D2330474 E99E8480 24C48A00 D8830AF7 D8F70779 C008C388 D0880A88 11E8DAF7 %ÖŠ..Ö.Ä.û.ây.%Ü%Ö.Ü..áŠ.Ç.Öt.3@ 0001C0
D8F70779 C008C388 C8880A88 11E809F7 1579C908 D833C888 1DEBC388 C8880A88 .Ö.à.ûŠ..à3Ü.èy.%)Š..Ö.à.û.ây.%Ü 0001E0
```

Dump of file SATURN:[PCCOMMON.DUMP.DLL]UTL.TMP;1 on 18-APR-1990 10:53:36.50
File ID (957,10,0)   End of file block 75 / Allocated 76

Virtual block number 45 (0000002D), 512 (0200) bytes

```
0035E808 E8002BE8 00E8003A E807B5E9 8560BD02 33FF3380 24C48A00 DB8309F7 %).Ü..á$.3.3@§'.Õç.Ò:.Š.Ò+.$.Ò5. 000000
39E803EB 005DE808 E8003EE8 00E8009C E8C3C801 67750002 83C00100 26E803EB Š.Ò&.ìà.@.ugìàüÒ..Š.Ò>.$.Ò].Š.Ò9 000020
D1F70079 FF0BC933 0041E803 E80078E8 08E8002C E800E800 2CE8C34E 75D20B00 ..@uNüÒ,.Š.Ò,.Š.Ò(.Š.ÒA.3è..y.%1 000040
B5DB3300 1CE803EB 0056E8C3 CAD12175 000183C2 D1000183 000283F5 DBF7D2F7 %@%AK.@..1.1ò.1.ul1òüÒV.Š.Ò..3Üç 000060
AD93ADD6 0A92AD00 A4E9FDE9 E9C30172 000283C3 130B13F5 81F980CD 0AE82201 ."Ò.ë.'.%.Ü.ü.@.r.üÕÕ»ÕE.Ü..@Û.Ü 000080
E981D874 C90BE9D1 E9D1E9D1 E9D17FE5 8010CE80 F1220F86 F98B08EE 8391AD91 .Ù..Ÿ..'Ñ."þ.ö..Ì.1Õ1Õ1Õ1Õ.ètÄ.Õ 0000A0
E98A04EE 83C186AC C88AADF8 8AACDA8A D2332FEB 25E983CA 7F20F983 787203FE ±.rx.'  .ò.ÕXŠ/3@.Õ¯.%Ù.à¯.é.Ÿ..Õ 0000C0
8009F720 E983997F 20F98347 727EE980 4D74C908 DCD0F9D1 D0E4D07F E183F98B .'.Ã.ÀÕÀÌ'ÀÉ.ètM.Õ-rG.'  ...Õ %1. 0000E0
15E3E1EB 08E980F6 32E68AC4 8AF88ADF 8AD30A01 E2800200 F501FA80 1A7C08F9 '.|..'.%À@.ã..Æ.Õ.½.6.12-.Õ.SÄD. 000100
8000B1F9 C3C38BD0 8BCA8AF3 E200D280 DAD00BD1 D8D1EED0 000A8001 B201FA80 .'.ý..Õ.ÄŸÌÄÌÜÀÕ.@.ãµ.ò.Ä.üü'Ÿ.. 000120
E680D78B 10EF8306 7C031EFC 36880131 E807B000 68E8FD35 E9C3008B C0330001 Ì.3ã.ÀüÕ5»Òh.¯.Õ1..6•..|..ÿ..■.Ì 000140
81027C03 1EFC368B 010BE803 800087E8 FD0FE9C3 FE88067C 89E0737F F0FA817F ..'þ.sÀ.|..±üÕ.»Ò..¯.Õ...6•..|.. 000160
7C0110EF 831EFC36 88001EE8 C3FE8802 7C890F73 7F80FA81 7FE68007 880080EF ÿ...■.|..'..sÕ.|..±üÒ...6•..ÿ..| 000180
C18ED98C C08C1EFC 3E8BFCC3 FE88027C 010080EF 811EFC36 880053E8 C3FE8806 ..±üÕS..6•..ÿ...|..±Û•.>•...â.\.e 0001A0
80CF88F0 E783064C 89CA0A0F E183F98B 064C8800 108A1EFC 3688C08E A5A5A5A5 ÈÈÈÈ.å.6•.¤...L..'.Ä..ò.L..Òþ.ü. 0001C0
8C1EFC3E 8BFC0082 E93FEBD9 F7047D04 33E981E9 D1E9D1E9 D1E9D100 35B87FE5 Ì.¡5.1Õ1Õ1Õ1Õ.Õ3.).%1Š7Õ..•.>•.. 0001E0
```

Dump of file SATURN:[PCCOMMON.DUMP.DLL]UTL.TMP;1 on 18-APR-1990 10:53:36.50
File ID (957,10,0)   End of file block 75 / Allocated 76

Virtual block number 46 (0000002E), 512 (0200) bytes

```
80E78302 4C89CA0A 7FE183F9 8B024C8B 0080BA1E FC368BC0 8EA5A5C1 8ED98CC0 å.).èÈÈ.å.6•.¤...L..'.Ä..ò.L..Ó. 000000
8000E781 147CEF8B C83BD9F7 487D0096 E981ED32 CD8AE1D1 0018887F E580CF8B .Ü.Ì.¡..ÌÄ.ë2Ü.Õ..)H%);à.ÿ|..Ó.. 000020
00D28000 B2F501FA 80147C08 F9800233 EA2B8000 E581EF8B C88B0A74 C83BFA0B .';àt..à.ÿ.Ì..+õ3@.'.|..'.%ý..@. 000040
D18BC933 C32C8BE8 22EE8AD7 C18A1CB2 8B0CE334 8AE7EB46 08E98000 04C6140A ..ó...Õ.FSÓ.4D.Éý..ê•.Ÿ"Ò.,ü3è.Ì 000060
00DA8001 B281FA80 D30ADE22 D70AFAE2 D7D0EAD1 06E3E18A EF8A0001 B8C3348A .4üÉ...ÿ.ÄD.ÌõÀ■ã'.■"B.Æ.'.ý..Õ. 000080
C3F7C3FA E2001480 4606E334 88F202CE 28C80398 1EFC0E8B E2D3CC8A FD8B0274 t..•.öÆã..•...à+ö.·.4D.F...ã'ü¼û 0000A0
A9D0F7E1 747F80A9 025D8826 02448BC3 E4D07FCC 80FBC8E9 C3F5D3D1 4C747F80 ..tLÌÆ%üÕà«.ã.ÀÕÜ.D.&.].¯..tÄ¼Ä` 0000C0
8CF78793 0B73E0D1 E3D1D578 EF32EC8A D874D3F7 7F80C3F7 D3F7E274 D0F77F80 ..%ÀtãXÆ%Ü..%ÆtÄ.š2ÿxÌ1DÌÀs...%. 0000E0
CCB0F875 E9C3F5D3 D15E747F F0C3F7C3 053B2604 8B0575C3 3B0A8EC1 8ED98CC2 ô.).ê.Õ;üu...&;.ü%üþ.t^ÌÆ%üÕu«.ä 000100
F77FF0C3 F7D3F7E2 740F77F F0A9D0F7 E1747FF0 A9065D8B 2606448B C3E4D07F .ÀÕü.D.&.].`þ.tÄ¼Ä`þ.%ÀtãXÆ%üþ.% 000120
44B81775 C33BDA8E C18ED98C C28CF787 930B73E0 D1E301D5 78EF32EC 8AD87403 ÆtÄ.š2ÿxÌ1DÌÀs...%.ô.).ê.Õ;ûu..D 000140
03EB80F4 8002458B F787C305 3B26048B 05750245 3B260244 8B0E7504 453B2604 .&;E.u..D.&;E.u...&;.û.%.E..¶.Š. 000160
C1018000 CE81FF00 E7810174 8BFF7C8B 024C8B80 CF8000B2 358A015D 8B02458B .E..]..5ý..ü..L..|..t..Ó...ö..Ìê 000180
E8D0C9D0 497718FC 80DCF6E5 2A91FA87 F3870573 EC3A5B74 E40A6574 ED0ACDD1 ìå.Üte.Õt[:ès..µ.'.*|-É.■.wlÀèÀÕ 0001A0
3E741D72 10E9800B 33D38801 C8800374 D2081 27C 0EF98055 E3008 5CD 8A91D9D0 À)..ëç.DU.'.|..@t..ù..Æ3U.Õ.r.t> 0001C0
FED3D1E2 D1237417 7708E980 FD8ADF8A F38AD68A 01CE8003 74D20A2B 7E05F980 .'.-+.@t..ö..@.µ.Ò.».Õ.w.t#ìãìÆ± 0001E0
```

Dump of file SATURN:[PCCOMMON.DUMP.DLL]UTL.TMP;1 on 18-APR-1990 10:53:36.50
File ID (957,10,0)   End of file block 75 / Allocated 76

Virtual block number 47 (0000002F), 512 (0200) bytes

```
C2F6FAE2 DAD1EBD1 20CA8003 743FC2F6 0097E9E8 D0C18BD7 8BDE8B19 EBF875C1 êu%Š..B.■.êÀÒÕ..-ó?t..ò ÌŠÌÕã'-ô 000000
FA2BFA41 E94575FF FC80C4FE DAD1D8D1 50730E13 D7031470 E0D020CA 8003743F ?t..ò ÀÀp..■.BsPÌÜÌÕ±é.•.uÉÕA'+' 000020
74D808DA 876A7610 EC800B75 D80BD0F6 000383F5 DAF7D3F7 0A73DE8B D78BF31B .µ.■.Bs.%Æ%Õ%.Æ.-Ä.Üu..š.vj.Õ.Üt 000040
F671D3D1 E2D14B74 CCFE0A78 FF0AD232 F28ADE8A FB8A5B76 08EC800F 75FF0A64 d..u..š.v[.«.B.·2@..x.±ätKìãìÆq- 000060
C4FE0773 00D38301 C6800F74 01C6F614 72077780 FA80017C E9037400 1CBA3E80 .>¤..t.Õ|..'.w.r.-ó.t..ó..Æ.s.±é 000080
C68AE38A 0245891E FC3E8BC7 0A7FE780 80241774 7F80A9D8 D1E0D03A 74FFFC80 .•.t:ÀÀÌÀ`..t.$..Ó..ü.>•..E..D.6 0000A0
E9E679C3 F7880589 0245891E FC3E8BC0 33017EE9 0374001C BA3E80C3 F7880589 ...%û.>¤..t.Õ~.3â.>•..E....%ûyÌÕ 0000C0
C132D88B 3D8BC874 ED0AD900 E1D1024D 88D674E4 0AD800E0 D196348B ADFCF99D .'■Ü.4.ÌÀÀÄ.Õt@.M.ÌÄÀ).Ütù.=.Ä2ê 0000E0
8BE88880 C98080CB 80EF8AFF 3250CD74 FFFC8080 C480D370 E5027FED 8080EC80 .š..Ü..ÌpÆ.ó..•.tëP2..ÿ.ù..è..Š. 000100
03749E58 FA13D803 E6F7C18B FA8B0002 83D803E7 F7C58850 9FC008DA 8BE7F7C6 ó%Ó.Õ.â.P.é%Ó.Ä.@..'.ê%|.Ä.'X.t. 000120
FC80C4FE FF69E90A 75E40AD3 D1E2D10B 78FF0A58 93D38BC7 03E1F6C5 8801CB80 .ù..é-Ä.ú.Æ.X..x.ÌãÌÆ.Õu.Õì.±á.• 000140
C132D874 E40A5C74 ED0AD8D0 E0D10244 88D9D0E1 D1024D8B F787FF1A E9AD74FF .tÜÕ...%.M.ÌÄÀ).D.ÌÀÀÄ.Üt\.ÕtÜ2ê 000160
80C9322D 8A015D8B FF78E903 75FFFC80 80C480FF 78E90371 E52A7FED 8081EC80 .š..Ü.*Ìq.Õ(..ó..•.u.Õx..]..-2è. 000180
D8D1EAD1 80CE80C0 32248A01 548B501C 8A3E02D9 D1E8D108 74001C8A 3E8080CF ü..>¤..t.ÌŠì).>¤.P.T..$2â.ö.ÌõÌÄ 0001A0
96F3F71D 73D33BF8 B0E9FF76 E9D08801 CA800374 D688C208 0011E8EE 88001AE8 Ò...VÒ...ó.@t..ò..ÌÕv.Õ¬½;Æs.¥µ. 0001C0
03C128FF FF8EC3F9 730313C1 034E0773 D78BFA1B D8F7E1F7 C68BFA8B 15E3C033 3ãD..'.ó%Ä%Ä.'.@s.N.ê.Æs'ü/..+ê. 0001E0
```

```
Dump of file SATURN:[PCCOMMON.DUMP.DLL]UTL.TMP;1 on 18-APR-1990 10:53:36.50
File ID (957,10,0)   End of file block 75 / Allocated 76

Virtual block number 48 (00000030), 512 (0200) bytes

 36FF3874 E40A3C77 EC3A0EED 800774ED 0A1CBC2E 8A001CBA 06C6C3ED 73C188D0 Å.ésÙû6.o....¥..Ùt..Ù.:šw<.ðt8.6 000000
 FF325253 501CC11E FC06C758 585AFE4E E80B32D2 33525350 1CBD1EFC 06C71EFC •.ú.•.§.PSR3Ø2ÙÒN±Z[Xú.•.è.PSR2. 000020
 1CC11EFC 06C71EFC 36FF1CBA A2D233D8 33C033FE 33E91EFC 068F585B 5AFE0FE8 Ò.±Z[X..•.Ó3±3â3Ù3ØÀo..6•.ú.•.ë. 000040
 FC3E88F7 881DE880 00F58106 6D88F787 D3E81CBF A31CBDA3 C033FE1A E8525350 PSRÒ.±3ãÈ§.È¢.ŠÆ.¼.m..¼..Š..¼.>• 000060
 DED0E5D1 06448BFC 066D88C3 FE881EFC 3688A8E6 0A80E680 7FE480AD A5A5A51E .ÈÈÈÙ.ð..Ì..Ì¨.6•..±û.m.•.D.ÌÌÀR 000080
 06A03DD8 F7C528C2 74C008D6 8695F787 0977E838 E0E58302 74FFE025 DAD0E0D1 ÌÀÀÖ%À.t@.ÌÀ;Òw..¼..ø.âtô+é¼Ä=.. 0000A0
 AD93AD91 AD92C032 E08AACF8 88E086C0 D1C001C0 0157DD01 E2D000D1 E6008977 w¿ÀÌÌÌÀãÌÌWiâìàìä.Á.½¯.À2â.Ù.Ù.Ù 0000C0
 EF83C033 D888C888 D18801C9 80037402 0B187C0E FF836374 FF0B10CC 800FE480 .ô..ä...tc...|..@t..è..ì.ù.A3â.ÿ 0000E0
 8AF88ADF 8AE88ACD 8AF18AD6 8A01CE80 0374D20A 287C06FF 83237248 74E77710 .wÒtHr#...|+.Øt..ö..ø.þ.ë.Š.Ò.½. 000100
 CA800374 3FC2F6CF 8716E8F5 75470D01 D3D1D101 E2D12374 0F7708EF 83E432C4 62ô.ÿ.w.t#ìãìììÆìÀGu¼Š..ù–ô?t..ò 000120
 02D8D0E5 D13870E5 D120CA80 03743FC2 F6975ECF 87F6E20A D1DFD1D8 D1E8D120  ìÒìÙìÒìÖã–.ü^.–ô?t..ð ìlp;ìlÀÄ. 000140
 13742000 C7F7FE13 589E5810 00CE810F FFE68105 7488509F 50035C13 014C1334 4.L..\.P.P.t..Ì...ö..X.X.±¼ú. t. 000160
 4C18342A D0F6D8D0 E5D10088 E9F6ECE9 0375E0FD 8320C583 DAD1D9D1 D8D1DFD1 1ÒìÙìììÙ.é .»Àu.Òš–Ô..ììÀÄ–Ä*4.L 000180
 F7D1F7D3 F7D7F7D0 F6F63313 73FE189E 1000CE81 0FFFE681 9F057488 035C1801 ..\..t...Ì...ö....±s.3––Ä¼ø¼Æ¼ì¼ 0001A0
 F8883D74 4E407602 00ED8113 75E0C7F6 1875FF08 00048EFC FE13DE13 CE13F50A Ö¼.ö.B.±•ƒ....u.–úÀu..Ù..v∂Nt=.« 0001C0
 8AE98ADD 8AF88AC7 8AE08A97 27760100 ED811875 1FE0C7F7 E4EBD233 CA88098B .1.ò3ØŠò¼úÀ.u..Ù..v'..À.ú.«.Ì.Ò. 0001E0

Dump of file SATURN:[PCCOMMON.DUMP.DLL]UTL.TMP;1 on 18-APR-1990 10:53:36.50
File ID (957,10,0)   End of file block 75 / Allocated 76

Virtual block number 49 (00000031), 512 (0200) bytes

 80FC9065 EBEBE8D7 D1D3D101 D1E2D171 7420ED83 12751000 C7F79700 82F28ACE ð.·ý..¼ú..u..Ú tqìãìììÆìøŠŠŠe.•. 000000
 D7830003 83000183 01C6801A 7401C6F6 1F720777 80FA8003 85E90374 001CD23E >Ø..t.Ò...•.w.r.–ó.t..ó..ì..Æ..• 000020
 2274ED01 0FE78080 24DE871E FC3E88F7 883074E0 FD8320C5 83087420 00C7F700 .¼ú. t..é .»ÀtO.¼.>•..ØŠ..Ó.ìÙt" 000040
 E90379C3 F78805EF 83ABC688 ABC188AA C68A055D 88064589 C70AC508 C032E086 .À2ä.é.ú.E..]..ó˙.è¨.ó¨.ÿ..¼ùy.Ò 000060
 06448BFC C3FE8BAB ABABABF7 881EFC3E 88C03303 77E90374 001CD23E 80FCF5FD »¼•.>Ø..t.Òw.3â.>•..¼¨¨¨¨.±ü•.D. 000080
 70C1037F E0E98180 002DE1D1 E0D10074 7FF0E181 D133064D 88D8747F F025D088 .À¼Þ.tÙ.M.3ì.Àþ.tÀìÀìÃ–...ÒÀ..èp 0000A0
 751000C7 F7D8D0E5 D15D01CA 80037401 81E85008 D1E60086 74FFE030 800005BC ¥...=Á.tÑÀìÌÀPÒ..t..ò.]ìÌÀÀ¼ú..u 0000C0
 FCF787F5 8CE9FF24 E98874E0 FD8320C5 8393E80A 75ED08D7 D1D3D1D1 D1E2D10E .ìãìììÆìø.Ùu.Š..é .»Àt.Ò$.Ò.¼.¼• 0000E0
 7FE0E981 80202DE1 D1E0D19B 747FF025 D0330644 88EF747F F0E181D1 88064D88 .M..ì.Àþ.tÿ.D.3Á¼þ.t.ìÀìÃ- ..ÒÀ. 000100
 CC800FE4 80AD92AD 93ADC932 E88AAC50 D8D1E6D0 9874FFE0 3D800005 9870C128 +èp....=Á.t.ÀìÌÀP¯.Ò2èÙ.Ù.Ù.ð..ä 000120
 D23E8000 05C6FCA4 4746A5A5 AB10CC80 0FE480AD FD1CD08F 05C683F7 88509210 ..P.¼.ó.¢Á.»Ù.ð..ä.¨ÈÈFGÈ•ó...>Ø 000140
 D1ADAB08 D1ADAB08 D1ADED01 AB1CD226 02E8D1E8 88ADF788 1CD08FFD 1F74001C ..t.»¢Á..¼Ù.Òìò.&Ø.¨ìÙÙìÀ¨ÙìÀ¨Ùì 000160
 08C108C3 080033E8 570037E8 57003BE8 57003FE8 D9D1D8D1 D8D1EAD1 58FCA808 Ä¨•XìòìÀìÙììò?.Wò;.WÒ7.WÒ3..ú.ê. 000180
 D1D8D1EF D1DAD1D9 D1D8D1EF D108CA80 037407C2 F601CA80 03745F5B 59D788C2 ô.•Y[_t..ò.–ó.t..ò.ìÿìÙììììòìÿìÙì 0001A0
 3B77F038 0475D20B 5C73063B FF331CD0 3688FF08 E9DAD1D9 D1D8D1EF D1DAD1D9 ÌÌòìÿÌÙììììòò...6À.3.;øs\.Øu.;Þw; 0001C0
 13F003E7 F70674C0 0B1CCCA1 50F28BE7 F70474C0 0B1CCAA1 F588ED33 9752F6F7 ¼–R.3Ù.¼Àò..ât.¼Ó.·PÀä..ât.¼Ó.Þ. 0001E0

Dump of file SATURN:[PCCOMMON.DUMP.DLL]UTL.TMP;1 on 18-APR-1990 10:53:36.50
File ID (957,10,0)   End of file block 75 / Allocated 76

Virtual block number 50 (00000032), 512 (0200) bytes

 13739391 9295E81B 5DD01BCE 1BDAF75A 92000283 E803E7F7 0874C008 1CCEA1EA òÀö..ât.¼Ó.Ò.Ø..Z¼Ö.ö.Ì].Ò....s. 000000
 CE061B1C CC1E1B1C CA0E2B4F C3ED731C D016131C CE06131C CC1E131C CA0E034F O..ò...ä...ö...Å.sÙÚO+.ò...ä...ö 000020
 458A1CC6 A3100C0F 24E43206 448AC9EB F51CCA16 88C2131C CE1E131C CC0E031C ...ä...ö..ó..ò.¼Šè.D.2ò$...Èó..E 000040
 02558804 88CA88E8 88E1F708 E30D8891 1AE30C88 E8880833 1CC8A310 0C0F2406 .$...Èà.3Ù.Š..D....D.¼Ã.Ò.ò...U. 000060
 DA13C803 E2F70874 0208158B 0E74C008 024488ED 3355DA13 C803E2F7 0674D20B .Øt.¼ã.à.ÒU3Ù.D..ât....Øt.¼ã.à.Ö 000080
 C008048B C933EA13 D803E2F7 0674D20B 0255880D 74C00802 448850C1 0858D5D1 ÌÌX.èP.D..ât..U..Øt.¼ã.Ä.ò3è...â 0000A0
 E2F70974 D208158B 0F74C008 04448801 D1EA130B 03E2F708 74D20804 55880F74 t..U..Øt.¼ã.Ä.òÌÌ.D..ât....Øt.¼ã 0000C0
 F70874C0 08058BCA 13E8031C C826F708 74C00804 8850C308 58000183 EA130803 .Ä.ð.Ì.X.úP...ât.¼Æà..Ò.ò...ât.¼ 0000E0
 8BD3D1CA 13E803E2 F70874D2 0804558B 0F74C008 024488DB 33CA13E8 031CC626 &ó..Ò.ò3Ù.D..ât..U..Øt.¼ž Ò.òìÆ. 000100
 0874C008 02458BED 33550003 83CA13E8 03E2F709 74020802 55881074 C0080444 D..ât..U..Øt.¼ã.Ò.ò.Æ.U3Ù ¨..ât. 000120
 55881A74 C0080444 8BDA13C8 031CC826 F70874C0 0B024488 DA13C803 1CC626F7 ¼&ó..à.Ö.D..ât.¼&à..à.Ö.D..¨t..U 000140
 F70874C0 0B04458B EA130803 1CC826F7 044488D5 D1DA13C8 03E2F70B 74D20804 ..Øt.¼ã.à.ÖÌÌ.D.¼&à..Ä.ò.E..ât.¼ 000160
 D3D1D1D1 E2D1D7D1 D3D1D1D1 E2D15A97 C5031CC8 26F61CC6 A0EA13D8 031CC626 &ó..Ä.ð.ó.–&à..é.ZìãìììÆìøìãìììÆ 000180
 3B04C0EE 810874F6 081C0336 88001CD2 06C6C3F6 085ED7D1 D3D1D1D1 E2D1D7D1 ìøìãìììÆìø^.–ùó.Ø...óÆ..–t..Ÿâ.; 0001A0
 FC3EE8D2 33C933D8 33575553 5251501C D51EFC06 C71EFC36 FF4C74ED 085077F5 ¼wP.ÙtL.6•.ú.•.Ì.PQRSUW3Ù3è3Øò>• 0001C0
 FC068F58 595A5B5D 5FF8D1E8 FF335755 53525150 1CDD1EFC 06C75859 5A5B5D5F _](ZYXú.•.Ì.PQRSUW3.Òì«_](ZYX..• 0001E0
```

```
Dump of file SATURN:[PCCOMMON.DUMP.DLL]UTL.TMP;1 on 18-APR-1990 10:53:36.50
File ID (957,10,0)   End of file block 75 / Allocated 76

Virtual block number 51 (00000033), 512 (0200) bytes

5251501C DD1EFC06 C71EFC36 FF1CD2A2 FF33E033 DB33D233 C933C033 FC1AE91E .Ö.=3ä3è3ø3U3Ú3.Àø..6=.ú.=.ï.PQR 000000
011F1306 C60E568B DB335756 EC8B55C6 EBABABAB ABC0331C D5BFFBF8 E8575553 SUWÕ½«¢(.3à      Š6U.$VW3Û.V.6.... 000020
8B023357 56EC8B55 CB5DE58B 5E5F0089 40C98005 730A763B 001F1306 C60028E8 Ò(.6....;v.s..èª.._^.]ÙU.$VW3ø. 000040
76C527EB F63340B1 067664F9 830A4E8B C08ED88C FCCB5DE5 8B5E5F00 06E80E5E ^.Ò.._^.]]ü=.Ä.à.N..ªdv.Ÿª3-Š'év 000060
285005A2 E8551CEE BF064E01 0C468B06 76891CF8 BE0A4E8B D88EA4F3 1CF8BF06 .¢½.µÈ.Ä.N.ƒ½..v..F..N.¢Ÿ.UÒÅ.]+ 000080
478A2E09 648A5653 C30A8CC7 8B065D89 04458902 75890D89 1CE6BF0A 76030676 v..v.¢]....u..E..]..ú.ÖùSV.d...G 0000A0
5B5EF3E1 07382E04 8802E883 02EE8300 05B90AC3 830AC683 1675C43A 80802509 .%..:áu..6..Ù.¿...Ÿ..Š....;.Ãµ^[ 0000C0
01300001 E3D1F4E2 DFD1D0D1 DAD1DBD1 E8D10005 B9FF33AD 93AD92AD 95AD56C3 ÙVÙ.Ù.Ù.Ù3.¿..ÌÒÌÙÌÖÌÌÌÖã¶ÌÐÌÅ=. 0000E0
00FFFFFF FFFFFFFC 66C30844 89065C89 04548902 6C893C89 5E03FE2D DBD1F500 .%1Ù-±.^.<.[..T..\..D.ûf=....... 000100
D88C06C3 075B4000 8BC03330 0144C601 04C61D68 BEFFFDCC CCCCCCCC CCCCCD00 .ëäääääää».ƒh.6..6D.03à.Àª[.ù..Ä 000120
0279C90B 06747FF0 C1F720B3 7F076480 064C8B5E A5F30004 B9571D5C BFFCC08E .á=¢\.W¿..µÈ^.L..d..° ¼ëÞ.t..èÿ. 000140
4DB091E2 F74D10BA C8B83FFE 05ADF88A BB7480A8 AC1D63BE FF33FF7B E8532DB3 °-SÒ(.3./c.¯´.tÉ.¥Ù.±?.àα.M¼ã.¯M 000160
BB08D8E8 1D5CBEDF F7571343 DF8112F4 E981FA13 C803E7F6 9AB00713 C803E4F6 -ô.à.=¯.-Ó.à.ª.Ö¶..ÔC.W¼Ö/\.ÖÄ.E 000180
F78BD9F7 91AD93AD 92AD95AD 97AD575F 0761E834 61B85747 09725FFF 13E83457 W4Ò.._r.GWÈa4Òa._WÙ.Ù.Ù.Ù.Ù.¼).¼ 0001A0
1D69BFD9 13D113E9 13039AD6 8156C480 F4E2DCD0 DED1DD01 DAD1EBD1 0CE3C033 3àD.ÌŠÌÒÌÌÌBÅÉã¶.6V.ø...Ö.ì.1¢i. 0001C0
D1D201D5 D1D6D1E4 D0D0D0D3 D1D2D1D5 D1D6D1E4 D0505655 525351C0 32001089 ¿..2àQSRUVPÅÖìøÌÌÌøÌÆÀÀÀÖìøÌÌÌøÌ 0001E0

Dump of file SATURN:[PCCOMMON.DUMP.DLL]UTL.TMP;1 on 18-APR-1990 10:53:36.50
File ID (957,10,0)   End of file block 75 / Allocated 76

Virtual block number 52 (00000034), 512 (0200) bytes

D0D00301 D2D1D501 D6D1E4D0 00140913 59D11359 E91359F1 1359E502 59D00003 ÆÀÀY.ÌY.ÞY.ÖY.ÌY.)..ÀÖìøÌÌÌøÌÆÀÀ 000000
8CC88BC3 075B5A00 01B80C8B 1D68BE12 C183FCAE F3FD3080 494FBDE2 59AA3004 .0¨Yã§OI¯0»µÛ=.ê./h...|..?(.ù.à. 000020
1D7C1689 1D7A0E89 08EB1D8C 1EFC06C7 08741277 03F883D8 8E1EEC8B 55459008 Ä.EU.š..Ä.«.w.t.ú.=...Š...  ..|. 000040
C18ED98C C08C107E BFF38BC8 F3F60CB3 1D8C2D1E FCA1CB4D 5D1FE58B 02ED83F8 ½.Ù..[.]MùÀ=.-..°.-µù.µ¢-...  \.ê 000060
BED98EA5 A5A5A5FC D88EC18E D98CC08C 1D7EBFF3 8BC3107E BED98EA5 A5FCD88E .Ä=ÈÈ.\/-.ù.µ¢-..å.\.é.Ä=ÈÈÈÈ.\/ 000080
25747F80 C2F70254 8B0C8BC0 33FCFC75 8B03EB07 FE45C6FC 7D89FC75 8BC3107E -.Û.u=.)=6E±.Š..u==3à...T.¼ô..t% 0000A0
00C2818F E680044D 89024589 D8D1D9D1 FAD1DBD1 D9D1FAD1 D8D1D9D1 FAD10589 ..Ì°ÌÌÌÀÌ°ÌÌÌÀÌ°ÌÌÌÀ.E..M..Ì..ö. 0000C0
FC5E8CFA 46890890 B8560000 06C800C3 06458904 45890245 890589C3 06558938 8.U.ù...E..E..E.ù.à...V|...F°.^= 0000E0
0CFA4683 46017440 04C48326 2830DC9A 53060E74 830A47F6 26FA5EC4 1CEBF62B +-Š.á^°&-G..t..S.É=(&.á.ªt.F.F°. 000100
01FE4F80 0474DB08 065E8BEC 8B5590CB C95EC68B D876FA46 391A8016 8B1A7EA1 Ä-.....9F°vÄ.6^èù.U.$.^..Ût..O±. 000120
24EB99C0 33057501 76E80005 B8071E29 75003F83 1EFEBB57 56EC8B55 CB5DE58B .]ÌùU.$VWE±..?.u)..|..Òv.u.3à.Š$ 000140
8ED88C06 4E8B1F04 3689FFFE FE44C704 C6830001 04C7961F 00A31EFE A3FE2440 ª$±È±.È...ù....6.ÙD±±..6...N..Ä. 000160
A8FE8BAD FC02778B F273EEF9 83FEE180 FA744100 D0E9CB50 E58B5E5F 0009E8C0 àÒ.._^.]ÌùÒÀ.At°.Ã±.°Ÿs·.w.=Ù.±´ 000180
74FE8BE6 E8FE4489 F78B0002 05C20335 7401A8AD F003008B 1573C13B 48437401 .tCH;ès..Å.ÞÙ´.tS.ô....¼.D±Š].±t 0001A0
1E8C2605 74D13B21 C88D0A8C C68BFE4C FEF90305 EB05894B C12BFE4C 89F9030C ..°.L±+èH..Š..°±L±.6.Ö¿àl;ìt.&.. 0001C0
73C13B48 FE8BF274 01A8ADF0 03FE8B25 74FFFE3D 021F1006 C626C302 7F891F0C .....ù&6....=±.t%.±.ÞÙ´.t·.±H;ès 0001E0

Dump of file SATURN:[PCCOMMON.DUMP.DLL]UTL.TMP;1 on 18-APR-1990 10:53:36.50
File ID (957,10,0)   End of file block 75 / Allocated 76

Virtual block number 53 (00000035), 512 (0200) bytes

EBD88E04 74C00808 478BE6EB FE4489F7 8B000205 C203E274 01A8ADF0 03D08B8C ¥.Å.ÞÙ´.tã.6....¼.D±Š].G..ât..ÄŠ 000000
E8C03306 778B8BEB 37881F08 1E8E2605 74C73837 17BFD88C 12741F10 0EFE2615 .&±...t..Ä¢.7;út.&.....7ŠÉ.w.3àÒ 000020
B9D88C98 EB4E4E96 0574001D E8FE4DFE 0074005F E8984040 01240074 C638006B k.;6t.$.ªª.Ò_.t.±M±Ò..t..NNŠ..Ä¿ 000040
414149C8 28037401 A8FE458B 51C399C0 33024789 07881F0C A3260474 C13B3768 k7;èt.&È.....G.3à.ùQ.E±´.t.+àlAA 000060
0CE8C62B C223D2F7 0072C203 1572C603 C18BF575 EAD10476 1F0E163B 267FFFBA α..&;...v.ÌõuX.è.6r..ôr.%Ø#ö+6Ò. 000080
FFFEFE44 C7F203F0 8BFE8857 1874001D E85152C3 59C033E5 75EAD1D2 F7087500 .u.%øÌöuÌ3àYùRQÒ..t.W.±.Þ.·ùD±±. 0000A0
38309A1F 06500001 8B505252 1ED23350 53C35A59 58FE5589 4AD72BD6 8B067789 .w..ø+=J.U±XYZùSP3ø.RRP¡..P...08 0000C0
8B04328F 3875000A 7E830657 56EC8B55 C3D20802 745B5A1F FFFA8308 C4833653 S6.á..°..Z[t..øùU.$VW..-..uB¢2.. 0000E0
0E468902 448B0D74 F73B1174 48083236 884CEB27 720057E8 07754806 46880856 V..F.Hu.ÒW.r'ŠL.62.Ht.;%t..D..F. 000100
501652C4 8B5021EB 99FFFFB8 0675D208 04730832 FE8104C6 8334735E 003EE856 VÒ>.^s4.6..±2.s..øu.¡...ŠIP.áR.P 000120
E58B5E5F 07C033D3 8B083236 89025C89 1489E675 C085F958 0000FFFF 9A50C033 3àP.....[°.áu]...\..62..Æ3à._^.] 000140
D38B2672 1C030A8B 2CE8F9F2 750832FE 8104C683 0C74024C 39F7880E 4E88CB5D ]ù.N..%9L.t..6..±2.u·°Š,.Ö..r&.Æ 000160
92042C16 890475F7 38DE75C0 850000FF FF9A5153 1373042C 1E390675 F738C18E .è;¼u.9.,.s.SQ.....áuß;¼u...,.. 000180
CB580000 18889A53 1650521E 510002B9 DC885301 578DE42A 078A00C3 D1880487 ...Ìû...°ô.W.S.É¿..Q.RP.S.¡...[ù 0001A0
8BC88BE3 F70008CA 5DE58BE3 F7064688 0B750A5E 8B08080C 5E8B0846 8BEC8B55 U.Š.F..^..Ä.^.u..F.%D.]]ò..%D.à. 0001C0
8BFF3307 8840C980 30C98058 0008CA50 E58BD103 E3F70646 8BC8030C 66F70646 F.%f..à.F.%D.ì.]]ò..X.è0.èª.±3.. 0001E0
```

Dump of file SATURN:[PCCOMMON.DUMP.DLL]UTL.TMP;1 on 18-APR-1990 10:53:36.50
File ID (957,10,0)   End of file block 75 / Allocated 76

Virtual block number 54 (00000036), 512 (0200) bytes

```
26F7C788 50E07202 05E8F888 E172020C E8DB331F 201E8900 ACE90B33 0185E8EF ÿÒ..3ÜÕ¯... .3ÜÒ..rÅ.ŸÒ..rÂP.ü%& 000000
85EBD873 000383F8 0358BE72 D888C503 C475D208 1F202EF7 C388EA88 F8881F20  ..%.õ.ü%. ..Ðuá.é.Är/X.%.Æ.sÅŞç 000020
ADE8911F 1EA31F1A A31F1CA3 C0331F24 16891F22 A31F180E 89CE031F 163E89FC =.>...ö....Ê"...$.3àÈ..Ê..Ê...ÒU 000040
133E8012 74453C1C 74443C4E 417401FD E8D83300 E7E89F75 DB0880CD 80037501 .u..ë..Ùu.ÒÓ.3ÜÒ».tAN<Dt.<Et..>. 000060
E8460000 1F2206C7 0EC98003 E80402C9 814E2775 02742D3C 06742B3C 3174001F ..t1<+t.<-t.u'N.è..Š..è.ú."...FÒ 000080
72C1F706 75FF0B1F 223E8BDB F702759E 5840C980 037502C5 F60088E8 509F016C l..PÒ..-é.u..èaX.u.%Ü.>"...u.%ër 0000A0
1F2ABE51 56507F01 90FF811F 243E2B04 7510C5F6 1F1E3E03 FB0330C9 80037418 .t..è0.«.>..-é.u.+>$......PVQ/*. 0000C0
F7137480 C5F61F28 1E881F26 A138755E 5901ACE8 001F3406 C61F163E 880394E8 Ò...>..6.4..Ò¯.Y^u8À&...(.-é.t.% 0000E0
1F342E8A 08C98003 76071F1C 3E838007 4D800474 7FF00645 F7000383 F5D8F7D3 Æ%Å%.Æ.%E.Þ.t..M...>...v..è...4. 000100
0CCCF881 177200E4 E80A1F20 06C63FFF 8BC301C9 80C302CD 80037500 1F1C3E83 .>...u..ë.ü.è.üE.?6. ..ÒÕ.r..«ä. 000120
720006E8 D7880F88 EF88FF33 C3DFE8DE 780803E3 D1E301C3 03E30102 CD80ED77 wÚ.ë.ÎD.üÎDÎD.ÄxßŠÒü3..ÿ.Ô.æÒø.r 000140
0374C00A 0D72008B E8E57219 99FF8100 D7830005 83000383 D0035800 8AE85028 (PÒ..X.Å.Æ..Í..■.....rÌÒ› r..ât. 000160
00F8810F 7480C5F6 177480C7 F616751F 1E0608C5 08C788EE EB1F1E06 FF01CA80 .ò.....ŠY.ú.é....u.-ú.t.-‹ t..«. 000180
74C208C3 08C508C7 8B1F281E 891F2616 8920C980 10C98006 E80575D2 08097580 .u..Ðu.Š..è..è ..&...(..ü.e.ü.ôt 0001A0
F78856F6 E8002AE8 480678FF 08004088 F1EB1F1E 0EFF0025 E8097319 99FF811C .....s.ÒX.....Šþ¡ã...x.HÒ*.Š-V.% 0001C0
58D81358 D003000B E8000EE8 C2885355 57C35EAB 92AB96AB 95AB93AB 921F2ABF ¢*..¨.¨.¨.¨.^ÛWUS.ôÒ..Ò...ÀX.ÄX 0001E0
```

Dump of file SATURN:[PCCOMMON.DUMP.DLL]UTL.TMP;1 on 18-APR-1990 10:53:36.50
File ID (957,10,0)   End of file block 75 / Allocated 76

Virtual block number 55 (00000037), 512 (0200) bytes

```
4EE8C34E 4601752B 3C06742D 3C087400 5EE8C3D7 D1D5D1D3 D1E201F8 1358E813 .ÒX.%Ĭãl Æ ÍÍ ïmüÒ^.t.<-t.<+u.FNÚÒN 000000
302C2074 2E3C3374 0037E81D EB397D1F 20063A07 2C027E09 3C457230 2C4A7400 .tJ,OrE<.~.,.:. .)9Š.Ò7.t3<.t ,0 000020
C5F6F4EB 20CD80C3 E4321F1C 06FF08CD 801F1E0E FF0E7410 C5F62677 093C2A72 r*<.w&-é.t......ë.....2ðü.ë Š¶-é 000040
74203C10 74001F12 3E80AC23 731F1836 38C3F94E C9EB10CD 801F1A06 FF097510 .u......ë.ŠèN'ù;6..s#¯.>...t.< t 000060
91AD92AD 57C3C032 C35F2402 777A3C06 72613CE2 74003CE6 740A3CEA 74093CEE Ÿ<.tõ<.tl<.tã<ar.<zw.$_ü2äüWÜ.Ü. 000080
D1D1E2D1 0005BBDF D1E8D1E7 D13E7803 FE05AD49 74C20BC1 0BC50BF8 8BAD95AD Ù.Ù.½.é.ê.ôtlÜ.±.x>lÒlÕlÒE..lãll 0000A0
C613FE13 EE13CE13 F58001FA 81F633D3 0AD92243 F075C8FE D7D00001 D7D1D501 ÍÍlaÌÅÅæ±üuÞC")./Æ3-.ª..%.ö.Ÿ.±.ó 0000C0
F888E888 C888D888 C033011F 340E800F E800D780 F57FF03D 0E74FFF0 A900D780 .■.`Þ.t.=Þ.%.■.Š...4..3ã.Ä.à.Ò.½ 0000E0
47882EAB F3C033F0 88000889 1F368DC3 FF0A0645 89047589 02608900 895FF788 .%_...m..u..E...ü§6.¿...»3âµ¨..G 000100
83DF2BD9 2B5653C8 88980404 D8F6C42A C42AE022 C7280004 8800078F 08440108 ..D̄.¢..¦..+ü"Å*á*á-Á....àSV+l+Ò. 000120
C38302EE 83000456 833E0256 113E0046 013E27F7 2E048806 C683F728 F10308C3 û..þ+%.ó....%'>.F.>.V.>.V...Ÿ..û 000140
97AD010A 92ADCD0A C80BADC8 0BAD91AD F5870EED 83BC754F 02C5835B 5EE6E202 .ãl^[.é.Ou¥.Ú..%Ü.Ü.àÜ.à.ëÜ..ÌÜ. 000160
33D508EF 2300018D D0D1D3D1 D1D1D7D1 E2D1084C FF0078C0 08F588AD 93AD91AD Ù.Ù.Ù.%.åx..L.lãlællÆlÅ§..#ÿ.13 000180
89045C89 024C893C 89C508CD D1086C01 D5D1C513 0D13CD13 FD13F580 01FA81ED Ú.ª..%.».ë.Ï.éÍÍ.l.lë.é.<.L..\.. 0001A0
0E9C4000 00000000 000007C8 00000000 00000000 04A00000 00000000 00C30644 D.û.................à........ã.. 0001C0
D500689D C5ADA82B 70859E00 368E1BC9 BF040000 00001BBE BC200000 00000000 ...... ¥/......¢è..6..çp+´Üé.k.Í 0001E0
```

Dump of file SATURN:[PCCOMMON.DUMP.DLL]UTL.TMP;1 on 18-APR-1990 10:53:36.50
File ID (957,10,0)   End of file block 75 / Allocated 76

Virtual block number 56 (00000038), 512 (0200) bytes

```
CCCCCD03 53AA7EEB FB9DF9DE 8E01AA93 BA47C980 E98CE000 D5C2781F 49FFCFA6 ÌÜ.Ì.xôÍ.Å.Õ.èGo.¯..ß*.«Š-¨S.ëäã 000000
118461CE FDFFF301 B71758E2 19652CFF FAA3D70A 3D70A3D7 0AFFFDCC CCCCCCCC ääääã»..æÈp=.æÈª.,e.ãX.ñÍµ.»öæ.. 000020
7FEA27A5 39E9A5FF 96CFB11E AD453994 BAFFCBE6 9594BEC4 4DE15BFF E6ABCC77 wä¨].(ÃMá/..lù.ø.9ÉÜ.ŸÜ..ÉÒ9É'ð. 000040
5DB80579 FF083D03 BBFCAEC0 31432563 7A193AFE 57D00046 7C648CE4 A1FF2CA8 ´,.ÀÒ¥d|FÀÌW±:.zc%C1àÜ=£.=..y.£] 000060
000004C8 00C3ECEB 5B5FFE7B E85753F5 73EFD100 74FF0B0A C3830AE8 830FF73D =%Ô.Š..ù...t.ÌÿsXSWÒ(±_[Ššü.à... 000080
000CB999 089020C3 8B15750B 0A47F626 5575023C 03240A47 8A26065E C4F62856 V+-á^.&.G.$.<.uU&-G..u..ù-...¿.. 0000A0
FF265028 7EC008FC 46890647 2B260788 26065E8B 39740114 8487F606 D868F9F7 %*kÅ.-....t9.^.&..&+G..F■.á-(P&. 0000C0
4F802606 5EC40874 FC463B08 C4833820 176C9A50 E42A0B47 8A260677 FF260877 w.&.w.&.G.*ðP.l. 8.á.;F■t.á^.&.O 0000E0
5EC68800 000447C7 26025789 26078926 08578826 06478826 065EC4FF FFBE200A . /..á^.&.G.&.W.&..&.W.&úG....ó^ 000100
38FA0203 0000000A 3E300002 00070002 21DC0103 00050002 22140103 0000CBC9 èù.....".......Él.......0>.......ª8 000120
25480105 00260002 38CF0103 00000000 37A00002 00220002 38840103 00230001 ..#....8..".....7.......üB..&...K% 000140
159E0103 00400002 215E0103 003A0002 17980103 00880002 1AFB0105 00870002 ......«...........:...^!..M..... 000160
002A0000 00010047 45534753 4D484DFF 00000000 005C0002 15880103 00580002 ..[.......\......MKMSGSEG.....*. 000180
00250103 0001FF00 00FFFFEA 5D044689 08468702 46870646 87EC8855 0E50C033 3&P.U.&.F..F..F..F.]ð.........%. 0001A0
54206E75 5220534D 00000000 00000000 00000000 00000000 00000000 00020003 .........................MS Run-T 0001C0
38383931 20296328 20746867 69727970 6F432020 20797261 7262694C 20656D69 ime Library - Copyright (c) 1988 0001E0
```

```
Dump of file SATURN:[PCCOMMON.DUMP.DLL]UTL.TMP;1 on 18-APR-1990 10:53:36.50
File ID (957,10,0)   End of file block 75 / Allocated 76

Virtual block number 57 (00000039), 512 (0200) bytes

616C4375 6E654D73 6E6F6974 704F0011 70726F43 2074666F 736F7263 694D202C , Microsoft Corp..OptionsMenuCla 000000
2E2A005D 2D63252D 5B003A20 00737361 6C43756E 6540736E 6F697470 4F007373 ss.OptionsMenuClass. :.[-%c-].*. 000020
2E2E002A 2E2A0000 20006665 45756473 6C002000 4753402E 00005D2E 2E5B002A *.[..]...MSG. .lsduEef. ..*.*... 000040
65792074 6F6E2070 6C654800 706C6548 002A2E2A 00503A63 255B002E 2E002E00 ......[%c:].*.*.Help.Help not ye 000060
76612074 65792074 6F6E2070 6C654800 706C6548 00656C62 616C6961 76612074 t available.Help.Help not yet av 000080
796E6120 7463656C 6553202E 646E756F 6620746F 6E202D20 00656C62 616C6961 ailable. - not found. Select any 0000A0
6C696620 2020002E 68746170 2064696C 61762061 20746F6E 202D2000 3F796177 way?. - not a valid path.. - fil 0000C0
002E2E2E 00005C00 5C005C00 5C002E67 6E6F6C20 6F6F7420 73692065 60616E65 ename is too long..\.\.\.\...... 0000E0
6E202D20 00656C62 616C6961 76612074 65792074 6F6E2070 6C654800 706C6548 Help.Help not yet available. - n 000100
7920746F 6E20706C 65480070 6C654800 2E687461 70206469 6C617620 6120746F ot a valid path..Help.Help not y 000120
20202000 68746170 206C6167 656C6C69 20202000 656C6261 6C696176 61207465 et available. - illegal path. -  000140
65207325 20656C69 46002E2E 002E0067 6E6F6C20 6F6F7420 6560616E 656C6966 filename too long......File %s e 000160
6563616C 70657220 6562206C 6C697720 73746E65 746E6F43 20202073 74736978 xists - Contents will be replace 000180
00000000 00000000 00000000 00000000 00000000 00000000 00000000 00002164 d!.............................. 0001A0
00000000 00000000 00000000 00000000 00000000 00000000 00000000 00000000 ................................ 0001C0
00000000 00000000 00000000 00000000 00000000 00000000 00000000 00000000 ................................ 0001E0

Dump of file SATURN:[PCCOMMON.DUMP.DLL]UTL.TMP;1 on 18-APR-1990 10:53:36.50
File ID (957,10,0)   End of file block 75 / Allocated 76

Virtual block number 58 (0000003A), 512 (0200) bytes

00000000 00000000 00000000 00000000 00000000 00000000 00000000 00000000 ................................ 000000
00000000 00000000 00000000 00000000 00000000 00000000 00000000 00000000 ................................ 000020
00000000 00000000 00000000 00000000 00000000 00000000 00000000 00000000 ................................ 000040
00000000 00000000 00000000 00000000 00000000 00000000 00000000 00000000 ................................ 000060
00000000 00000000 00000000 00000000 00000000 00000000 00000000 00000000 ................................ 000080
20202020 20202020 20202020 20282828 28282020 20202020 20202000 00000000 .....           (((((            0000A0
10848484 84848484 84848410 10101010 10101010 10101010 10104820 20202020     H........................... 0000C0
01010101 01010101 01010101 01010101 01010101 81818181 81811010 10101010 ................................ 0000E0
02020202 02020202 02020202 02020202 02020202 82828282 82821010 10101010 ................................ 000100
00000000 00000000 00000000 00000000 00000000 00000000 00000020 10101010 .... ........................... 000120
00000000 00000000 00000000 00000000 00000000 00000000 00000000 00000000 ................................ 000140
00000000 00000000 00000000 00000000 00000000 00000000 00000000 00000000 ................................ 000160
00000000 00000000 00000000 00000000 00000000 00000000 00000000 00000000 ................................ 000180
6E2803E8 101603E4 0F0603E0 103A030C 0F7CFFFF 14EC0000 00000000 00000000 ..........$...|.É.:.Å...δ...Ò.(n 0001A0
16380408 16380404 16381F48 16380000 2320202B 00296C6C 756E2800 296C6C75 ull).(null).+- #..8.H.8...8...8. 0001C0
22702270 00000000 00000000 00000030 30302865 01010000 00000410 1638040C ..8.........e+000...........p"p" 0001E0

Dump of file SATURN:[PCCOMMON.DUMP.DLL]UTL.TMP;1 on 18-APR-1990 10:53:36.50
File ID (957,10,0)   End of file block 75 / Allocated 76

Virtual block number 59 (0000003B), 512 (0200) bytes

00000000 00000000 00000000 00000000 00000000 00000000 00001F62 227021F7 %!p"b........................... 000000
00000000 00000000 00000000 00000000 00000000 00000000 00000000 00000000 ................................ 000020
00000000 00000000 00000000 00000000 00000000 00000000 00000000 00000000 ................................ 000040
00000000 00000000 00000000 00000000 00000000 00000000 00000000 00000000 ................................ 000060
00000000 00000000 00000000 00000000 00000000 00000000 00000000 00000000 ................................ 000080
00000000 00000000 00000000 00000000 00000000 00000000 00000000 00000000 ................................ 0000A0
00000000 00000000 00000000 00000000 00000000 00000000 00000000 00000000 ................................ 0000C0
00000000 00000000 00000000 00000000 00000000 00000000 00000000 00000000 ................................ 0000E0
00000000 00000000 00000000 00000000 00000000 00000000 00000000 00000000 ................................ 000100
00000000 00000000 00000000 00000000 00000000 00000000 00000000 00000000 ................................ 000120
00000000 00000000 00000000 00000000 00000000 00000000 00000000 00000000 ................................ 000140
00000000 00000000 00000000 00000000 00000000 00000000 00000000 00000000 ................................ 000160
00000000 00000000 00000000 00000000 00000000 00000000 00000000 00000000 ................................ 000180
00000000 00000000 00000000 00000000 00000000 00000000 00000000 00000000 ................................ 0001A0
00000000 00000000 00000000 00000000 00000000 00000000 00000000 00000000 ................................ 0001C0
00000000 00000000 00000000 00000000 00000000 00000000 00000000 00000000 ................................ 0001E0
```

```
Dump of file SATURN:[PCCOMMON.DUMP.DLL]UTL.TMP;1 on 18-APR-1990 10:53:36.50
File ID (957,10,0)   End of file block 75 / Allocated 76

Virtual block number 60 (0000003C), 512 (0200) bytes

00000000 00000000 00000000 00000000 00000000 00000000 00000000 00000000 ................................ 000000
00000000 00000000 00000000 00000000 00000000 00000000 00000000 00000000 ................................ 000020
00000000 00000000 00000000 00000000 00000000 00000000 00000000 00000000 ................................ 000040
00000000 00000000 00000000 00000000 00000000 00000000 00000000 00000000 ................................ 000060
00000000 00000000 00000000 00000000 00000000 00000000 00000000 00000000 ................................ 000080
00000000 00000000 00000000 00000000 00000000 00000000 00000000 00000000 ................................ 0000A0
00000000 00000000 00000000 00000000 00000000 00000000 00000000 00000000 ................................ 0000C0
00000000 00000000 00000000 00000000 00000000 00000000 00000000 00000000 ................................ 0000E0
00000000 00000000 00000000 00000000 00000000 00000000 00000000 00000000 ................................ 000100
00000000 00000000 00000000 00000000 00000000 00000000 00000000 00000000 ................................ 000120
00000000 00000000 00000000 00000000 00000000 00000000 00000000 00000000 ................................ 000140
00000000 00000000 00000000 00000000 00000000 00000000 00000000 00000000 ................................ 000160
00000000 00000000 00000000 00000000 00000000 00000000 00000000 00000000 ................................ 000180
00000000 00000000 00000000 00000000 00000000 00000000 00000000 00000000 ................................ 0001A0
00000000 00000000 00000000 00000000 00000000 00000000 00000000 00000000 ................................ 0001C0
00000000 00000000 00000000 00000000 00000000 00000000 00000000 00000000 ................................ 0001E0
```

```
Dump of file SATURN:[PCCOMMON.DUMP.DLL]UTL.TMP;1 on 18-APR-1990 10:53:36.50
File ID (957,10,0)   End of file block 75 / Allocated 76

Virtual block number 61 (0000003D), 512 (0200) bytes

2AB62DB2 2AB82D05 2AC00000 0000003D 4F464E49 5F454C49 465F435F 04320000 ..2. C_FILE_INFO=.....â*Í-¡*ý-Ñ* 000000
00000000 00000000 00000000 00002A64 2A11303D 2CA6303F 2CA82FDC 2C222DB0 ¯-",Ē/¯,?0Ī,=0.*d*.............. 000020
0200FFFF FFFF0000 00000000 00000000 00000000 00000000 00000000 00000000 ................................ 000040
00000000 00000000 01020000 00000000 00000000 00011F60 00000000 08980000 ........`....................... 000060
00000000 00000000 00000000 00000000 00000000 00000000 00000000 02020000 ................................ 000080
00000000 00000000 00000000 00000000 00000000 00000000 00000000 00000000 ................................ 0000A0
00000000 00000000 00000000 00000000 00000000 00000000 00000000 00000000 ................................ 0000C0
00000000 00000000 00000000 00000000 00000000 00000000 00000000 00000000 ................................ 0000E0
00000000 00000000 00000000 00000000 00000000 00000000 00000000 00000000 ................................ 000100
00000000 00000000 00000000 00000000 00000000 00000000 00000000 00000000 ................................ 000120
00000000 00000000 00000000 00000000 00000000 00000000 00000000 00000000 ................................ 000140
00000000 00000000 00000000 00000000 00000000 00000000 00000000 00000000 ................................ 000160
00000000 00000000 00000000 00000000 00000000 00000000 00000000 00000000 ................................ 000180
00000000 00000000 00000000 00000000 00000000 00000000 00000000 00000000 ................................ 0001A0
00000000 00000000 00000000 00000000 00000000 00000000 00000000 00000000 ................................ 0001C0
00000000 00000000 00000000 00000000 00000000 00000000 00000000 00000000 ................................ 0001E0
```

```
Dump of file SATURN:[PCCOMMON.DUMP.DLL]UTL.TMP;1 on 18-APR-1990 10:53:36.50
File ID (957,10,0)   End of file block 75 / Allocated 76

Virtual block number 62 (0000003E), 512 (0200) bytes

00000000 00000000 00000000 00000000 00000000 00000000 00000000 00000000 ................................ 000000
00000000 00000000 00000000 00000000 00000000 00000000 00000000 00000000 ................................ 000020
00000000 00000000 00000000 00000000 00000000 00000000 00000000 00000000 ................................ 000040
00000000 00000000 00000000 00000000 00000000 00000000 00000000 00000000 ................................ 000060
00000000 00000000 00000000 00000000 00000000 00000000 00000000 00000000 ................................ 000080
00000000 00000000 00000000 00000000 00000000 00000000 00000000 00000000 ................................ 0000A0
00000000 00000000 00000000 00000000 00000000 00000000 00000000 00000000 ................................ 0000C0
00000000 00000000 00000000 00000000 00000000 00000000 00000000 00000000 ................................ 0000E0
00000000 00000000 00000000 00000000 00000000 00000000 00000000 00000000 ................................ 000100
00000000 00000000 00000000 00000000 00000000 00000000 00000000 00000000 ................................ 000120
00000000 00000000 00000000 00000000 00000000 00000000 00000000 00000000 ................................ 000140
00000000 00000000 00000000 00000000 00000000 00000000 00000000 00000000 ................................ 000160
00000000 00000000 00000000 00000000 00000000 00000000 00000000 00000000 ................................ 000180
00000000 00000000 00000000 00000000 00000000 00000000 00000000 00000000 ................................ 0001A0
00000000 00000000 00000000 00000000 00000000 00000000 00000000 00000000 ................................ 0001C0
00000000 00000000 00000000 00000000 00000000 00000000 00000000 00000000 ................................ 0001E0
```

```
Dump of file SATURN:[PCCOMMON.DUMP.DLL]UTL.TMP;1 on 18-APR-1990 10:53:36.50
File ID (957,10,0)    End of file block 75 / Allocated 76

Virtual block number 63 (0000003F), 512 (0200) bytes

00000000 00000000 00000000 00000000 00000000 00000000 00000000 00000000 ................................ 000000
00000000 00000000 00000000 00000000 00000000 00000000 00000000 00000000 ................................ 000020
00000000 00000000 00000000 00000000 00000000 00000000 00000000 00000000 ................................ 000040
00000000 00000000 00000000 00000000 00000000 00000000 00000000 00000000 ................................ 000060
00000000 00000000 00000000 00000000 00000000 00000000 00000000 00000000 ................................ 000080
00000000 00000000 00000000 00000000 00000000 00000000 00000000 00000000 ................................ 0000A0
00000000 00000000 00000000 00000000 00000000 00000000 00000000 00000000 ................................ 0000C0
00000000 00000000 00000000 00000000 00000000 00000000 00000000 00000000 ................................ 0000E0
00000000 00000000 00000000 00000000 00000000 00000000 00000000 00000000 ................................ 000100
00000000 00000000 00000000 00000000 00000000 00000000 00000000 00000000 ................................ 000120
00000000 00000000 00000000 00000000 00000000 00000000 00000000 00000000 ................................ 000140
00000000 00000000 00000000 00000000 00000000 00000000 00000000 00000000 ................................ 000160
00000000 00000000 00000000 00000000 00000000 00000000 00000000 00000000 ................................ 000180
00000000 00000000 00000000 00000000 00000000 00000000 00000000 00000000 ................................ 0001A0
00000000 00000000 00000000 00000000 00000000 00000000 00000000 00000000 ................................ 0001C0
00000000 00000000 00000000 00000000 00000000 00000000 00000000 00000000 ................................ 0001E0

Dump of file SATURN:[PCCOMMON.DUMP.DLL]UTL.TMP;1 on 18-APR-1990 10:53:36.50
File ID (957,10,0)    End of file block 75 / Allocated 76

Virtual block number 64 (00000040), 512 (0200) bytes

00000000 00000000 00000000 00000000 00000000 00000000 00000000 00000000 ................................ 000000
00000000 00000000 00000000 00000000 00000000 00000000 00000000 00000000 ................................ 000020
00000000 00000000 00000000 00000000 00000000 00000000 00000000 00000000 ................................ 000040
00000000 00000000 00000000 00000000 00000000 00000000 00000000 00000000 ................................ 000060
00000000 00000000 00000000 00000000 00000000 00000000 00000000 00000000 ................................ 000080
00000000 00000000 00000000 00000000 00000000 00000000 00000000 00000000 ................................ 0000A0
00000000 00000000 00000000 00000000 00000000 00000000 00000000 00000000 ................................ 0000C0
00000000 00000000 00000000 00000000 00000000 00000000 00000000 00000000 ................................ 0000E0
00000000 00000000 00000000 00000000 00000000 00000000 00000000 00000000 ................................ 000100
00000000 00000000 00000000 00000000 00000000 00000000 00000000 00000000 ................................ 000120
00000000 00000000 00000000 00000000 00000000 00000000 00000000 00000000 ................................ 000140
00000000 00000000 00000000 00000000 00000000 00000000 00000000 00000000 ................................ 000160
00000000 00000000 00000000 00000000 00000000 00000000 00000000 00000000 ................................ 000180
00000000 00000000 00000000 00000000 00000000 00000000 00000000 00000000 ................................ 0001A0
00000000 00000000 00000000 00000000 00000000 00000000 00000000 00000000 ................................ 0001C0
00000000 00000000 00000000 00000000 00000000 00000000 00000000 00000000 ................................ 0001E0

Dump of file SATURN:[PCCOMMON.DUMP.DLL]UTL.TMP;1 on 18-APR-1990 10:53:36.50
File ID (957,10,0)    End of file block 75 / Allocated 76

Virtual block number 65 (00000041), 512 (0200) bytes

00000000 00000000 00000000 00000000 00000000 00000000 00000000 00000000 ................................ 000000
00000000 00000000 00000000 00000000 00000000 00000000 00000000 00000000 ................................ 000020
00000000 00000000 00000000 00000000 00000000 00000000 00000000 00000000 ................................ 000040
00000000 00000000 00000000 00000000 00000000 00000000 00000000 00000000 ................................ 000060
00000000 00000000 00000000 00000000 00000000 00000000 00000000 00000000 ................................ 000080
00000000 00000000 00000000 00000000 00000000 00000000 00000000 00000000 ................................ 0000A0
00000000 00000000 00000000 00000000 00000000 00000000 00000000 00000000 ................................ 0000C0
00000000 00000000 00000000 00000000 00000000 00000000 00000000 00000000 ................................ 0000E0
00000000 00000000 00000000 00000000 00000000 00000000 00000000 00000000 ................................ 000100
00000000 00000000 00000000 00000000 00000000 00000000 00000000 00000000 ................................ 000120
00000000 00000000 00000000 00000000 00000000 00000000 00000000 00000000 ................................ 000140
00000000 00000000 00000000 00000000 00000000 00000000 00000000 00000000 ................................ 000160
00000000 00000000 00000000 00000000 00000000 00000000 00000000 00000000 ................................ 000180
00000000 00000000 00000000 00000000 00000000 00000000 00000000 00000000 ................................ 0001A0
00000000 00000000 00000000 00000000 00000000 00000000 00000000 00000000 ................................ 0001C0
00000000 00000000 00000000 00000000 00000000 00000000 00000000 00000000 ................................ 0001E0
```

```
Dump of file SATURN:[PCCOMMON.DUMP.DLL]UTL.TMP;1 on 18-APR-1990 10:53:36.50
File ID (957,10,0)    End of file block 75 / Allocated 76

Virtual block number 66 (00000042), 512 (0200) bytes

00000000 00000000 00000000 00000000 00000000 00000000 00000000 00000000 ................................ 000000
00000000 00000000 00000000 00000000 00000000 00000000 00000000 00000000 ................................ 000020
00000000 00000000 00000000 00000000 00000000 00000000 00000000 00000000 ................................ 000040
00000000 00000000 00000000 00000000 00000000 00000000 00000000 00000000 ................................ 000060
00000000 00000000 00000000 00000000 00000000 00000000 00000000 00000000 ................................ 000080
00000000 00000000 00000000 00000000 00000000 00000000 00000000 00000000 ................................ 0000A0
00000000 00000000 00000000 00000000 00000000 00000000 00000000 00000000 ................................ 0000C0
00000000 00000000 00000000 00000000 00000000 00000000 00000000 00000000 ................................ 0000E0
00000000 00000000 00000000 00000000 00000000 00000000 00000000 00000000 ................................ 000100
00000000 00000000 00000000 00000000 00000000 00000000 00000000 00000000 ................................ 000120
00000000 00000000 00000000 00000000 00000000 00000000 00000000 00000000 ................................ 000140
00000000 00000000 00000000 00000000 00000000 00000000 00000000 00000000 ................................ 000160
00000000 00000000 00000000 00000000 00000000 00000000 00000000 00000000 ................................ 000180
00000000 00000000 00000000 00000000 00000000 00000000 00000000 00000000 ................................ 0001A0
00000000 00000000 00000000 00000000 00000000 00000000 00000000 00000000 ................................ 0001C0
00000000 00000000 00000000 00000000 00000000 00000000 00000000 00000000 ................................ 0001E0

Dump of file SATURN:[PCCOMMON.DUMP.DLL]UTL.TMP;1 on 18-APR-1990 10:53:36.50
File ID (957,10,0)    End of file block 75 / Allocated 76

Virtual block number 67 (00000043), 512 (0200) bytes

00000000 00000000 00000000 00000000 00000000 00000000 00000000 00000000 ................................ 000000
00000000 00000000 00000000 00000000 00000000 00000000 00000000 00000000 ................................ 000020
00000000 00000000 02000001 00000000 00000000 00000000 00000000 00000000 ................................ 000040
00000000 00000000 00000000 00000000 00000000 00000000 00000000 00000000 ................................ 000060
00000000 00000000 00000000 00000000 00000000 00000000 00000000 00000000 ................................ 000080
00000000 00000000 00000000 00000000 00000000 00000000 00000000 00000000 ................................ 0000A0
00000000 00000000 00000000 00000000 00000000 00000000 00000000 00000000 ................................ 0000C0
00000000 00000000 00000000 00000000 00000000 00000000 00000000 00000000 ................................ 0000E0
00000000 00000000 00000000 00000000 00000000 00000000 00000000 00000000 ................................ 000100
00000000 00000000 00000000 00000000 00000000 00000000 00000000 00000000 ................................ 000120
00000000 00000000 00000000 00000000 00000000 00000000 00000000 00000000 ................................ 000140
00000000 00000000 00000000 00000000 00000000 00000000 00000000 00000000 ................................ 000160
00000000 00000000 00000000 00000000 00000000 00000000 00000000 00000000 ................................ 000180
00000000 00000000 00000000 00000000 00000000 00000000 00000000 00000000 ................................ 0001A0
00000000 00000000 00000000 00000000 00000000 00000000 00000000 00000000 ................................ 0001C0
00000000 00000000 00000000 00000000 00000000 00000000 00000000 00000000 ................................ 0001E0

Dump of file SATURN:[PCCOMMON.DUMP.DLL]UTL.TMP;1 on 18-APR-1990 10:53:36.50
File ID (957,10,0)    End of file block 75 / Allocated 76

Virtual block number 68 (00000044), 512 (0200) bytes

00000000 00000000 00000000 00000000 00000000 00000000 00000000 00000000 ................................ 000000
00000000 00000000 00000000 00000000 00000000 00000000 00000000 00000000 ................................ 000020
00000000 00000000 00000000 00000000 00000000 00000000 00000000 00000000 ................................ 000040
00000000 00000000 00000000 00000000 00000000 00000000 00000000 00000000 ................................ 000060
00000000 00000000 00000000 00000000 00000000 00000000 00000000 00000000 ................................ 000080
00000000 00000000 00000000 00000000 00000000 00000000 00000000 00000000 ................................ 0000A0
00000000 00000000 00000000 00000000 00000000 00000000 00000000 00000000 ................................ 0000C0
00000000 00000000 00000000 00000000 00000000 00000000 00000000 00000000 ................................ 0000E0
00000000 00000000 00000000 00000000 00000000 00000000 00000000 00000000 ................................ 000100
00000000 00000000 00000000 00000000 00000000 00000000 00000000 00000000 ................................ 000120
00000000 00000000 00000000 00000000 00000000 00000000 00000000 00000000 ................................ 000140
00000000 00000000 00000000 00000000 00000000 00000000 00000000 00000000 ................................ 000160
00000000 00000000 00000000 00000000 00000000 00000000 00000000 00000000 ................................ 000180
00000000 00000000 00000000 00000000 00000000 00000000 00000000 00000000 ................................ 0001A0
00000000 00000000 00000000 00000000 00000000 00000000 00000000 00000000 ................................ 0001C0
00000000 00000000 00000000 00000000 00000000 00000000 00000000 00000000 ................................ 0001E0
```

```
Dump of file SATURN:[PCCOMMON.DUMP.DLL]UTL.TMP;1 on 18-APR-1990 10:53:36.50
File ID (957,10,0)   End of file block 75 / Allocated 76

Virtual block number 69 (00000045), 512 (0200) bytes

00000000 00000000 00000000 00000000 00000000 00000000 00000000 00000000 ................................ 000000
00000000 00000000 00000000 00000000 00000000 00000000 00000000 00000000 ................................ 000020
00000000 00000000 00000000 00000000 00000000 00000000 00000000 00000000 ................................ 000040
00000000 00000000 00000000 00000000 00000000 00000000 00000000 00000000 ................................ 000060
00000000 00000000 00000000 00000000 00000000 00000000 00000000 00000000 ................................ 000080
00000000 00000000 00000000 00000000 00000000 00000000 00000000 00000000 ................................ 0000A0
00000000 00000000 00000000 00000000 00000000 00000000 00000000 00000000 ................................ 0000C0
00000000 00000000 00000000 00000000 00000000 00000000 00000000 00000000 ................................ 0000E0
00000000 00000000 00000000 00000000 00000000 00000000 00000000 00000000 ................................ 000100
00000000 00000000 00000000 00000000 00000000 00000000 00000000 00000000 ................................ 000120
00000000 00000000 00000000 00000000 00000000 00000000 00000000 00000000 ................................ 000140
00000000 00000000 00000000 00000000 00000000 00000000 00000000 00000000 ................................ 000160
00000000 00000000 00000000 00000000 00000000 00000000 00000000 00000000 ................................ 000180
00000000 00000000 00000000 00000000 00000000 00000000 00000000 00000000 ................................ 0001A0
00000000 00000000 00000000 00000000 00000000 00000000 00000000 00000000 ................................ 0001C0
00000000 00000000 00000000 00000000 00000000 00000000 00000000 00000000 ................................ 0001E0

Dump of file SATURN:[PCCOMMON.DUMP.DLL]UTL.TMP;1 on 18-APR-1990 10:53:36.50
File ID (957,10,0)   End of file block 75 / Allocated 76

Virtual block number 70 (00000046), 512 (0200) bytes

00000000 00000000 00000000 00000000 00000000 00000000 00000000 00000000 ................................ 000000
00000000 00000000 00000000 00000000 00000000 00000000 00000000 00000000 ................................ 000020
00000000 00000000 00000000 00000434 14780000 00000000 00000000 00000000 ..............x.4............... 000040
00000000 00000000 00000000 00000000 00000000 00000000 81818101 00000001 ................................ 000060
00000000 00000000 00000000 00000000 00000000 00000000 00000000 00000000 ................................ 000080
00000000 00000000 00000000 00000000 00000000 00000000 00000000 00000000 ................................ 0000A0
00000000 00000000 00000000 00000000 00000000 00000000 00000000 00000000 ................................ 0000C0
00000000 00000000 00000000 00000000 00000000 00000000 00000000 00000000 ................................ 0000E0
00000000 00000000 00000000 00000000 00000000 00000000 00000000 00000000 ................................ 000100
00000000 00000000 00000000 00000000 00000000 00000000 00000000 00000000 ................................ 000120
00000000 00000000 00000000 00000000 00000000 00000000 00000000 00000000 ................................ 000140
0A0A0A0A 0A0A0A0A 0A0A0A0A 0A0A0A0A 0A0A0A0A 0A0A0A0A 0A0A0A00 00000000 ................................ 000160
0A0A0A0A 0A0A0A0A 0A0A0A0A 0A0A0A0A 0A0A0A0A 0A0A0A0A 0A0A0A0A 0A0A0A0A ................................ 000180
0A0A0A0A 0A0A0A0A 0A0A0A0A 0A0A0A0A 0A0A0A0A 0A0A0A0A 0A0A0A0A 0A0A0A0A ................................ 0001A0
0A0A0A0A 0A0A0A0A 0A0A0A0A 0A0A0A0A 0A0A0A0A 0A0A0A0A 0A0A0A0A 0A0A0A0A ................................ 0001C0
0A0A0A0A 0A0A0A0A 0A0A0A0A 0A0A0A0A 0A0A0A0A 0A0A0A0A 0A0A0A0A 0A0A0A0A ................................ 0001E0

Dump of file SATURN:[PCCOMMON.DUMP.DLL]UTL.TMP;1 on 18-APR-1990 10:53:36.50
File ID (957,10,0)   End of file block 75 / Allocated 76

Virtual block number 71 (00000047), 512 (0200) bytes

0A0A0A0A 0A0A0A0A 0A0A0A0A 0A0A0A0A 0A0A0A0A 0A0A0A0A 0A0A0A0A 0A0A0A0A ................................ 000000
0A0A0A0A 0A0A0A0A 0A0A0A0A 0A0A0A0A 0A0A0A0A 0A0A0A0A 0A0A0A0A 0A0A0A0A ................................ 000020
0A0A0A0A 0A0A0A0A 0A0A0A0A 0A0A0A0A 0A0A0A0A 0A0A0A0A 0A0A0A0A 0A0A0A0A ................................ 000040
00007878 31364D05 00000000 00000000 00000000 00000000 0000000A 0A0A0A0A ..........................M61xx.. 000060
00000000 00000000 00000000 00000000 00000000 000080C0 E0F0F8FC FEFF0000 ...±•½ÞÅß....................... 000080
00000000 00000000 00000000 00000000 00000000 00000000 00000000 00000000 ................................ 0000A0
00000000 00000000 00000000 00000000 00000000 00000000 00000000 00000000 ................................ 0000C0
00000000 00000000 00000000 00000000 00000000 00000000 00000000 00000000 ................................ 0000E0
00000000 00000000 00000000 00000000 00000000 00000000 00000000 00000000 ................................ 000100
00000000 00000000 00000000 00000000 00000000 00000000 00000000 00000000 ................................ 000120
00000000 00000000 00000000 00000000 00000000 00000000 00000000 00000000 ................................ 000140
00000000 00000000 00000000 00000000 00000000 00000000 00000000 00000000 ................................ 000160
00000000 00000000 00000000 00000000 00000000 00000000 00000000 00000000 ................................ 000180
00000000 00000000 00000000 00000000 00000000 00000000 00000000 00000000 ................................ 0001A0
00000000 00000000 00000000 00000000 00000000 00000000 00000000 00000000 ................................ 0001C0
00000000 00000000 00000000 00000000 00000000 00000000 00000000 00000000 ................................ 0001E0
```

Dump of file SATURN:[PCCOMMON.DUMP.DLL]UTL.TMP;1 on 18-APR-1990 10:53:36.50
File ID (957,10,0)   End of file block 75 / Allocated 76

Virtual block number 72 (00000048), 512 (0200) bytes

```
00000000 00000000 00000000 00000000 00000000 00000000 00000000 00000000 ................................ 000000
00000000 00000000 00000000 00000000 00000000 00000000 00000000 00000000 ................................ 000020
00000000 00000000 00000000 00000000 00000000 00000000 00000000 00000000 ................................ 000040
00000000 00000000 00000000 00000000 00000000 00000000 00000000 00000000 ................................ 000060
00000000 00000000 00000000 00000000 00000000 00000000 00000000 00000000 ................................ 000080
00000000 00000000 00000000 00000000 00000000 00000000 00000000 00000000 ................................ 0000A0
20000000 00000000 00000000 00000000 00001D8C 00000000 00000000 00000000 ...............................  0000C0
00000000 00000000 00000000 00000000 00000000 00000000 00000000 00000000 ................................ 0000E0
1F5A357D 000003EC 02F80000 00000000 00000000 00000000 00000000 00000000 ......................½.§...)5Z. 000100
4D4E3C3C 00000000 00000000 FFFF1F5E 1F5CFFFF 04143632 1F4E25F0 00000000 ....Þ%N.26....\.^...........<<NM 000120
000A0077 6F6C6672 65766F20 68636174 73202D0A 00303030 36520000 3E3E4753 SG>>..R6000..- stack overflow... 000140
0A0D3020 79622065 64697669 64207265 6765746E 69202D0A 00333030 36520003 ..R6003..- integer divide by 0.. 000160
726F6620 65636170 73206867 756F6E65 20746F6E 202D0A0D 38303036 52000800 ...R6008..- not enough space for 000180
756F6E65 20746F6E 202D0A0D 39303036 52000900 0A0D7374 6E656D75 67726120  arguments.....R6009..- not enou 0001A0
000A0000 FC000A0D 746E656D 6E6F7269 766E6520 726F6620 65636170 73206867 gh space for environment...■.... 0001C0
6F6C6620 2D0A0D32 30303652 00020020 726F7272 6520656D 69742D6E 757200FF ..run-time error ...R6002..- flo 0001E0
```

Dump of file SATURN:[PCCOMMON.DUMP.DLL]UTL.TMP;1 on 18-APR-1990 10:53:36.50
File ID (957,10,0)   End of file block 75 / Allocated 76

Virtual block number 73 (00000049), 512 (0200) bytes

```
54414D20 3A00FD00 0A0D6465 64616F6C 20746F6E 20746E69 6F702067 6E697461 ating point not loaded...».: MAT 000000
6E690065 00203A72 6F727265 20746E69 6F702067 6E697461 6F6C6620 2D0A0D48 H..- floating-point error: .e.in 000020
6C667265 766F0068 000A0D30 20796220 65646976 69640067 000A0D64 696C6176 valid...g.divide by 0...h.overfl 000040
63696C70 78650070 000A0D77 6F6C6672 65766F20 68636174 73006E00 0A0D776F ow...n.stack overflow...p.explic 000060
00020000 000A1F56 00020003 FFFFFF00 0A0D6465 74617265 6E656720 796C7469 itly generated..........V....... 000080
00000000 FFFF0001 000E0352 000001D6 00000000 00001A80 00020000 000C0892 ...............■...R........... 0000A0
00000000 0194FFFF 01040084 00AE0033 00679400 00900176 001D0001 0000000B ........v.....g.3.Û............. 0000C0
00000000 0000FFFF FFFF010E 00080034 006E0005 80010001 0198000A 00050000 ..............n.4............... 0000E0
00050000 00000000 FFFFFFFF 01180008 006A006E 003E8002 000C01A3 00000006 ....£.....>.n.j................. 000100
00000005 00000000 0000FFFF FFFF012C 00080034 005E0005 80010001 01A40000 ..£.......^.4...,............... 000120
01B30005 00050000 00000000 FFFFFFFF 01360008 006E005E 003C8001 00010182 ý.....<.^.n...6...............•. 000140
00000189 00000007 00000000 0000FFFF FFFF0140 00080034 004F0005 80010001 ......O.4...@...............¿... 000160
80010001 01BA0008 00050000 00000000 FFFFFFFF 014A0030 0058001E 00058002 ......X.0.J..............¤..... 000180
00698002 000001C6 00000007 00000000 0000FFFF FFFF015E 00080032 00470069 i.G.2...^...............6.....i. 0001A0
000A0015 80020400 01C70002 00030000 00000000 FFFFFFFF 01680028 0040001E ..@.(.h..............ú......... 0001C0
0026000A 00458002 000001CA 00060003 00000000 0000FFFF FFFF0001 000C0026 &..................ò.....E...&. 0001E0
```

Dump of file SATURN:[PCCOMMON.DUMP.DLL]UTL.TMP;1 on 18-APR-1990 10:53:36.50
File ID (957,10,0)   End of file block 75 / Allocated 76

Virtual block number 74 (0000004A), 512 (0200) bytes

```
000C0026 000A0075 80020000 01D10004 00030000 00000000 FFFFFFFF 0002000C ..................Ñ.....u...&... 000000
65646F6D 20726F66 20676F6C 20726F73 69766461 20747261 7453FFFF FFFF0003 ......Start advisor log for mode 000020
73692079 726F7463 65726944 00003A65 6D616E20 656C6946 00000003 0058206C l X.....File name:..Directory is 000040
6C65636E 6143004B 4F000073 6569726F 74636572 69440000 73656C69 4600003A :..Files..Directories..OK.Cancel 000060
00000000 FFFF0001 000E0352 000001BF 00000000 00000000 00000070 6C654800 .Help...............R........... 000080
00000000 0142FFFF 00FA0084 00A90032 00649400 0090013A 00070001 00000009 ........:.....d.2.`...ª...B..... 0000A0
00000000 0000FFFF FFFF010E 00080034 006E0005 80010001 0146000A 00050000 ......F.......n.4............... 0000C0
00050000 00000000 FFFFFFFF 01180008 0064006E 003E8002 00080151 00000006 ....Q.....>.n.d................. 0000E0
00120005 00000000 0000FFFF FFFF012C 00080034 005E0005 80010001 01520000 ..R.......^.4...,............... 000100
01730008 00050000 00000000 FFFFFFFF 01360008 0068005E 003C8001 00010160 `.....<.^.h...6...............s. 000120
0000017F 00000007 00000000 0000FFFF FFFF015E 00080034 004E0005 80010001 ......N.4...^................... 000140
80020400 01800002 00030000 00000000 FFFFFFFF 01680030 004E001E 00058000 ......N.0.h..................... 000160
003F8002 00000183 00060003 00000000 0000FFFF FFFF0001 000C0026 000A000F ....&.........................?. 000180
000A006F 80020000 018A0004 00030000 00000000 FFFFFFFF 0002000C 0026000A ..&.........................o... 0001A0
3A656D61 6E20656C 69460000 00030073 41206576 6153FFFF FFFF0003 000C0026 &.........Save As.....File name: 0001C0
47495345 445C4E41 4D484341 425C3A43 003A7369 2079726F 74636572 69440000 ..Directory is:.C:\BACHMAN\DESIG 0001E0
```

```
Dump of file SATURN:[PCCOMMON.DUMP.DLL]UTL.TMP;1 on 18-APR-1990 10:53:36.50
File ID (957,10,0)   End of file block 75 / Allocated 76

Virtual block number 75 (0000004B), 512 (0200) bytes

 0A00706C 6548006C 65636E61 4300484F 00007365 69726F74 63657269 4400534E NS.Directories..OK.Cancel.Help.. 000000
 00000000 00000000 00000000 00000000 00000000 00000000 00000000 00000000 ................................ 000020
 00000000 00000000 00000000 00000000 00000000 00000000 00000000 00000000 ................................ 000040
 00000000 00000000 00000000 00000000 00000000 00000000 00000000 00000000 ................................ 000060
 00000000 00000000 00000000 00000000 00000000 00000000 00000000 00000000 ................................ 000080
 00000000 00000000 00000000 00000000 00000000 00000000 00000000 00000000 ................................ 0000A0
 00000000 00000000 00000000 00000000 00000000 00000000 00000000 00000000 ................................ 0000C0
 00000000 00000000 00000000 00000000 00000000 00000000 00000000 00000000 ................................ 0000E0
 00000000 00000000 00000000 00000000 00000000 00000000 00000000 00000000 ................................ 000100
 00000000 00000000 00000000 00000000 00000000 00000000 00000000 00000000 ................................ 000120
 00000000 00000000 00000000 00000000 00000000 00000000 00000000 00000000 ................................ 000140
 00000000 00000000 00000000 00000000 00000000 00000000 00000000 00000000 ................................ 000160
 00000000 00000000 00000000 00000000 00000000 00000000 00000000 00000000 ................................ 000180
 00000000 00000000 00000000 00000000 00000000 00000000 00000000 00000000 ................................ 0001A0
 00000000 00000000 00000000 00000000 00000000 00000000 00000000 00000000 ................................ 0001C0
 00000000 00000000 00000000 00000000 00000000 00000000 00000000 00000000 ................................ 0001E0

Dump of file SATURN:[PCCOMMON.DUMP.DLL]ULOGVIEW.TMP;1 on 18-APR-1990 10:53:34.55
File ID (952,31,0)   End of file block 5 / Allocated 8

Virtual block number 1 (00000001), 512 (0200) bytes

 00000000 00000040 00000000 00000088 0000FFFF 00000004 00000004 01945A4D MZ..............|.......ə....... 000000
 00000080 00000000 00000000 00000000 00000000 00000000 00000000 00000000 ................................ 000020
 6F6E6E61 63206D61 72676F72 70207369 685421CD 4C01B821 CD09B400 0EBA1F0E ..α..Ç.ë||.LëIThis program canno 000040
 00000000 00000024 0A000D2E 65646F6D 20534F44 206E6920 6E757220 65622074 t be run in DOS mode....$....... 000060
 00060007 00000000 00020000 00000400 00048001 99ED9B54 0007010F 0505454E NE......T.Ù..................... 000080
 00000000 00000000 00010002 00040000 00000196 00A9009D 00800078 00400013 ..ə.x........................... 0000A0
 00400F21 003A0076 00C00F00 00C00069 000F0F00 000F0067 04180F00 0418001B ........g.......i.å...å.v.:.|.ə. 0000C0
 00C80004 00010008 00E71EB1 00E7007C 000A1EB1 000A007B 00020E21 00000000 ....!...(...Ý...|.Ó.Ý.Ó.......à. 0000E0
 07000100 0001474F 4C4F444E 55574549 564C4D44 0E000077 65697667 6F6C7508 .ulogview...DMLVIEWUNDOLOG...... 000100
 45400F4D 45400353 4C4C4143 534F4408 4E49574D 50050000 4F003000 24001000 ...$.0.0...PMWIN.DOSCALLS.MEM.ME 000120
 066C6C6C 6D64054F 444E554C 4D44076C 6D640354 5245564E 4F434552 4148534D MSHARECONVERT.dml.DMLUNDO.dmlll. 000140
 49544712 49544703 45564549 52544552 4C4C0A54 58454E4C 4C064441 45484C4C LLHEAD.LLNEXT.LLRETRIEVE.GTI.GTI 000160
 20676F6C 206F646E 550F0000 00000301 01574F44 4E49574C 4F4F5459 52455551 QUERYTOOLWINDOW........Undo log  000180
 FF0876FF D88EFFFF B81E5657 000008C8 00000000 00000000 00007265 77656976 viewer..........à...WV.j...Ä.v.. 0001A0
 77FF26F8 5EC4003E E98492B8 0006E903 7500003D 0000FFFF 9A5016F8 46800676 v..F%.P.....=..u.Õ..|..Õ>.á^½&.w 0001C0
 26003806 8EFFFF68 FFFF68FC 76FFFE76 FF016A00 6A0000FF FF9A5016 FC468D14 ..F•.P.....j.j..v±.v=h..h....8.& 0001E0

Dump of file SATURN:[PCCOMMON.DUMP.DLL]ULOGVIEW.TMP;1 on 18-APR-1990 10:53:34.55
File ID (952,31,0)   End of file block 5 / Allocated 8

Virtual block number 2 (00000002), 512 (0200) bytes

 C80004CA C95F5E1F 0000E900 00880000 FFFF9A06 76FF0876 FF00C868 000036FF .6..hà..v..v......|..Õ...^_èò..à 000000
 FF04C483 00B103A3 9A1076FF 1276FF01 45E90E46 8B088E00 08B81E56 57000004 ...WV.j...Ä.F.ÕE..v..v..Ē.Ÿ..á.. 000020
 F19A1076 FF1276FF 0676FF08 76FF0000 FFFF9A06 76FF0876 FF006A10 76FF1276 v..v.j..v..v.......v..v..v..v..þ 000040
 FC468900 0001159A 006A1076 FF1276FF 00A4E90A 46880130 E99908C4 8300F501 .%..á..Õ0..F.ÕÊ..v..v.j.......F• 000060
 FF1276FF FC76FFFE 76FF0014 E9037400 00300000 01269AFC 76FFFE76 FFFE5689 .V±.v±.v•.&...=..t.Õ...v±.v•.v.. 000080
 FF1276FF 000EE9D2 28000001 589A016A 1076FF12 76FF08C4 83014101 F19A1076 v..þ.A..á..v..v.j..X...+ØÕ8..v.. 0000A0
 E9037400 003D0000 FFFF9AFC 76FFFE76 FFFE5689 FC468900 00FFFF9A 006A1076 v.j.......F•.V±.v±.v•.....=..t.Õ 0000C0
 FF0098E9 00008A00 008808C4 83004601 F19A1076 FF1276FF FC76FFFE 76FF0014 ...v±.v•.v..v..þ.F..á.|..¤..Õ... 0000E0
 75000C3D FFE3E903 7500023D 0018E900 89E9022B 0000FFFF 9A016A10 76FF1276 v..v.j......+ØÕ..Õ..=..u.ÕO.=É.u 000100
 0010681E 1076FF12 76FF016A 006A005F E90000E9 FF90E903 7500E13D FF4CE903 .ÕL.=Ä.u.Õ..Õ..Õ_.j.j..v..v..h.. 000120
 FF0E76FF 1076FF12 76FF0044 E900008A 00008800 00FFFF9A 006A006A 0000681E .h..j.j......|..¤..ÕO..v..v..v.. 000140
 223DFEEC E9037500 2030001B E90027E9 0000FFFF 9A0676FF 0876FF0A 76FF0C76 v..v..v..v......Õ'.Õ..= .u.Õš±=" 000160
 0ECAC95F 5E1F0000 E900008A 000088FF C5E9FEA3 E9037500 383DFFAC E9037500 .u.Õ¯.=;.u.ÕÈ±Õé.|..¤..Õ. .^_èò. 000180
 02589A50 16F8468D 0A76FF0C 76FF0000 8646C7D8 8E0077B8 1E565700 007AC800 .àz..WV.|W..ÄúF....v..v..r·.P̄.[. 0001A0
 5689FC46 89085788 26064788 26F85EC4 017EE984 92880006 E9037500 00300000 ..=..u.Õ..|..Õ-.á^½&.G.&.W..¯=.V 0001C0
 77FF26FC 5EC40000 03279A00 6A006A00 6A006A01 6E680002 680676FF 0876FFFE ±.v..v.hØ.hn.j.j.j.j..'...á^=&.w 0001E0
```

```
Dump of file SATURN:[PCCOMMON.DUMP.DLL]ULOGVIEW.TMP;1 on 18-APR-1990 10:53:34.55
File ID (952,31,0)   End of file block 5 / Allocated 8

Virtual block number 3 (00000003), 512 (0200) bytes

 880000FF FF9A5052 004E05FE 568BFC46 88000002 9C9A5016 88468D1E 77FF2620 &.w..F..P......F=.V±.N.RP...... 000000
 00EFE903 758E460B 8C468B8E 56898C46 890000FF FF9A5052 004E05FE 568BFC46 F=.V±.N.RP......F..V..F..F.u.Õÿ. 000020
 5EC400F0 E98492B8 0006E903 7500003D 00000018 9A5016F4 468D8C76 FF8E76FF .v..v..F¶.P.....=..u.Õ..|..Õÿ.á^ 000040
 0205F656 8BF4468B 08C48302 D600789A 50169046 80006A64 6A007DE9 078B26F4 ¶&..Õ).jdj..F..P.x.ø..á..F¶.V-.. 000060
 50520002 05F6568B F4468B64 6A001DE9 03750000 3D04C483 02F80036 9A505200 .RP.6.½..á.=..u.Õ..jd.F¶.V-...RP 000080
 C483FFFF 00009A50 1690468D 0029681E 0011E90A C483030C 004E9A50 1690468D .F..P.N....á.Õ...h)..F..P......á 0000A0
 0EE90011 E90000FF FF9A5016 90468DFF 6AFF6A01 61680002 680676FF 0876FF08 ..v..v.h@.ha.j.j..F..P.....Õ..Õ. 0000C0
 3D0000FF FF9A5052 004E05FE 568BFC46 8BFFEFE9 FF7BE903 7500013D 000BE900 .Õ..=..u.Õ(.Õÿ..F=.V±.N.RP.....= 0000E0
 000CE98E 56898C46 89000002 7B9A5052 004E05FE 568BFC46 8B0019E9 03750000 ..u.Õ...F=.V±.N.RP.(....F..V.Õ.. 000100
 6A006A00 6A016468 00D26806 76FF0876 FFFF06E9 8E56898C 46890000 8A000088 |..¤...F..V.Õ...v...v.h@.hd.j.j.j 000120
 6AD88E01 F9881E56 5700001A C8CBC95F 5E1F0000 E9000088 00000246 9A016A00 .j..F...|..Õ...^_èùà...WV.|°..Äj 000140
 76FF0876 FFE64689 0000FFFF 9A156A01 6A006AFA 46890000 03C49A14 6A016A00 .j.j..á....F°j.j.j.......F|.v..v 000160
 99EA462B E6468BFE 4689F8D1 C22B99EC 462BFA46 8B0000FF FF9A5016 E8468006 ..FÕ.P......F°+F$.+õï½.F±.F|+Fõ. 000180
 FFFF9A02 6A006A00 6AFC76FF FE76FF03 6A006A06 76FF0876 FFFC4689 F8D1C22B +õï½.F=.v..v.j.j..v±.v=j.j.j.... 0001A0
 0001005E 01030000 0001008A 00020053 00060037 02030014 90CBC95F 5E1F0000 ...^_èù.....7...S...........^... 0001C0
 00010049 00050000 000302C3 0002007F 00010394 0103007E 00010103 0103007D )......~...........û......I... 0001E0

Dump of file SATURN:[PCCOMMON.DUMP.DLL]ULOGVIEW.TMP;1 on 18-APR-1990 10:53:34.55
File ID (952,31,0)   End of file block 5 / Allocated 8

Virtual block number 4 (00000004), 512 (0200) bytes

 00010199 0103000A 000103D7 01030008 0001040E 01030000 000403AB 0002006F o...¨...............■........... 000000
 0003020E 0203001F 000100C9 0103001E 0001009E 01030095 00010386 0103008B ....Ñ...............è........... 000020
 0005034B 02030036 0005026B 02030028 000400DA 020300B3 0001018C 01030014 ....¥...°...Õ...(...k...6...K... 000040
 01CB0001 B81F0000 3E89D88E FFFFB81E 00000000 00000044 00050363 0203003D =...c...D........|...Ä.>...|..ù. 000060
 8ED88CFE 8B0A76C5 1EDE8BD7 8BEC8B55 00000000 00000000 00000500 02000200 ................U.š.■.ß.év..±.Ä. 000080
 8BF38BA4 F3C913A5 F3E9D149 A4027401 A8C78B06 7EC4D1F7 AEF2FFFF 89C033C0 å3å¿..·Ú%Ié-..ú´.t.ÊIïÕµÉ.èµÉ.µ. 0000A0
 8B5500CB 5DFA8B91 49D1F7AE F2FFFF89 C033067E C4D78BEC 8B55CB5D C28C1FFA °..õ]ùU.š.■é-.3å¿..·Ú%iI..°]ù.U. 0000C0
 8CC38BAA F3C032F8 E2AA0374 C00AAC0C E30E4E88 DF8B0A76 C5067EC4 1E5657EC $WV.é~.év..Ô.N.D.¯.åt.¨ã½2äµ´.û. 0000E0
 D3230B1B D12B0C74 DAF7D78B 067EC457 38E30C4E 8BEC8B55 CB5DE58B 5F5E1FC2 ô.^_.[]ùU.š.N.DßWé-..■%Õt.+ï.Ù#Æ 000100
 D1C38EFF FFC381C3 8C10E3D1 87AAF3C9 13ABF3E9 D1E08A0A 4688D12B D1870103 .ï.T+ï.F..ÅIÕµ¨.èµ¯.ÏD..û.û...ûI 000120
 00000000 00000088 000200AB 01050001 C8500856 88064688 5FAAF3C9 13ABF3E9 Õµ¨.èµ´_.F..V.]ù....¨.......... 000140
 70606920 74657920 746F6E20 706C6548 00726577 65697620 676F6C20 6F646E55 Undo log viewer.Help not yet imp 000160
 00380002 0001FFFF 006E6F69 74706972 63736564 206F4E00 6465746E 656D656C lemented.No description.......8. 000180
 00000000 00000048 2E474F4C 57454956 00000000 00000000 00000000 00000005 ................VIEWLOG.H....... 0001A0
 FFF59400 019000C2 00080001 00000005 00000000 FFFF0001 000E0352 000000E7 Ô...R.....................ô.....%. 0001C0
 00150007 80000000 00CF0000 00070000 00000000 00CBFFFF 00C8006A 0105FFFC ■...j.à...ù...........ü........ 0001E0

Dump of file SATURN:[PCCOMMON.DUMP.DLL]ULOGVIEW.TMP;1 on 18-APR-1990 10:53:34.55
File ID (952,31,0)   End of file block 5 / Allocated 8

Virtual block number 5 (00000005), 512 (0200) bytes

 00260003 00198003 00000000 00030003 00000000 0000FFFF FFFF0002 004900EE Ÿ.I.@...............Å.........&. 000000
 000C0026 00030053 80030000 00040006 00030000 00000000 FFFFFFFF 000C000C ..É...............Å.....S ..&... 000020
 0002000C 00260003 00878003 040000DB 00060003 00000000 0000FFFF FFFF00E1 Ä...............Ü........' .... 000040
 FFFF00F0 000C0026 0003008C 80030100 00E20004 00030000 00000000 FFFFFFFF ..............ã.....¥...&...ν... 000060
 65636E61 4300796C 7070417E 004B4F7E 00000000 0300676F 6C206F64 6E55FFFF ..Undo log......~OK.~Apply.Cance 000080
 00000000 00000000 00000000 00000000 00000000 00000000 8300706C 6548006C l.Help.......................... 0000A0
 00000000 00000000 00000000 00000000 00000000 00000000 00000000 00000000 ................................ 0000C0
 00000000 00000000 00000000 00000000 00000000 00000000 00000000 00000000 ................................ 0000E0
 00000000 00000000 00000000 00000000 00000000 00000000 00000000 00000000 ................................ 000100
 00000000 00000000 00000000 00000000 00000000 00000000 00000000 00000000 ................................ 000120
 00000000 00000000 00000000 00000000 00000000 00000000 00000000 00000000 ................................ 000140
 00000000 00000000 00000000 00000000 00000000 00000000 00000000 00000000 ................................ 000160
 00000000 00000000 00000000 00000000 00000000 00000000 00000000 00000000 ................................ 000180
 00000000 00000000 00000000 00000000 00000000 00000000 00000000 00000000 ................................ 0001A0
 00000000 00000000 00000000 00000000 00000000 00000000 00000000 00000000 ................................ 0001C0
 00000000 00000000 00000000 00000000 00000000 00000000 00000000 00000000 ................................ 0001E0
```

```
Dump of file SATURN:[PCCOMMON.DUMP.DLL]UVMAPS.TMP;1 on 18-APR-1990 10:53:46.68
File ID (961,2,0)    End of file block 37 / Allocated 40

Virtual block number 1 (00000001), 512 (0200) bytes

00000000 00000040 00000000 00000088 0000FFFF 00000004 00000025 007E5A4D MZ~.%...........|.......@....... 000000
00000080 00000000 00000000 00000000 00000000 00000000 00000000 00000000 ................................ 000020
6F6E6E61 63206D61 72676F72 70207369 685421CD 4C01B821 CD09B400 0EBA1F0E ..¤..Ç.ë|.LëIThis program canno 000040
00000000 00000024 0A0D0D2E 65646F6D 20534F44 206E6920 6E757220 65622074 t be run in DOS mode....$....... 000060
00070008 00000000 000610FC 00000800 00088009 16C7804A 000C01E0 0505454E NE..Å...J.ú.........•.......... 000080
00000000 00000000 00010000 00040000 0000026C 00AC009E 00800080 00400036 6.@.......¯.l.................. 0000A0
02D20F00 02D20071 000E0F00 000D0061 01980F00 01970043 01660F00 0165002B +.e...f.C.......a.Ì...ß.q.ß...ß. 0000C0
1D200F21 1AD402D7 02000E21 00000000 1F1D0F00 1F1D000C 03660F00 036600A3 È.f...f.É...........!...•.å.!.. 0000E0
00010000 0244524F 43455245 54495257 5350414D 56551100 00535041 4D565506 .UVMAPS...UVMAPSWRITERECORD..... 000100
52464C4D 44086C60 6403534C 4C414353 4F440800 010E0072 005A002C 001A000A ....,.Z.r.....DOSCALLS.dml.DMLFR 000120
4244134D 32424404 4B434F4C 42434F4C 4C414D45 4D0D4045 4D035453 494C4545 EELIST.MEM.MEMALLOCBLOCK.DB2M.DB 000140
44545845 50554B4F 4F4C4D32 42441459 454B5354 454D414E 5055484F 4F4C4D32 2MLOOKUPNAMETSKEY.DB2MLOOKUPEXTD 000160
4507474E 49525453 44414F4C 534C4E32 42441053 4C4E3242 44065945 4B534E47 GNSKEY.DB2NLS.DB2NLSLOADSTRING.E 000180
4E451159 454B5354 454D414E 50554B4F 4F4C5350 414D474E 45165350 414D474E NGMAPS.ENGMAPSLOOKUPNAMETSKEY.EN 0001A0
4D455453 59535445 47535041 4D474E45 16535041 4D4C4C41 54454753 50414D47 GMAPSGETALLMAPS.ENGMAPSGETSYSTEM 0001C0
4D474E45 124E4547 50414D52 45535554 45475350 414D474E 45144E45 4750414D MAPGEN.ENGMAPSGETUSERMAPGF˅.ENGM 0001E0

Dump of file SATURN:[PCCOMMON.DUMP.DLL]UVMAPS.TMP;1 on 18-APR-1990 10:53:46.68
File ID (961,2,0)    End of file block 37 / Allocated 40

Virtual block number 2 (00000002), 512 (0200) bytes

474E4744 54584554 45475350 414D474E 45134E45 4754454D 414E5445 47535041 APSGETNAMETGEN.ENGMAPSGETEXTDGNG 000000
44074F49 53035945 4B534C4C 554E524F 464B4345 4B435350 414D474E 45174E45 EN.ENGMAPSCHECKFORNULLSKEY.SIO.D 000020
44414552 534F4407 45544952 57534F44 0845534F 4C43534F 44084E45 504F534F OSOPEN.DOSCLOSE.DOSWRITE.DOSREAD 000040
72656E65 47207061 4D207765 69562072 65735519 00000000 03010100 00030201 .............User View Map Gener 000060
01574549 56524553 55455441 52454E45 47535041 4D565516 0000206E 6F697461 ation ...UVMAPSGENERATEUSERVIEW. 000080
010A7E83 D88EFFFF B81E5657 00000CC8 00000000 00000000 00000000 00000000 ................à...VV.|...Ä.~.. 0000A0
9A5016F4 4680004C 681E08C4 83003201 B49A5016 F4468000 42681E00 2FE90374 t.Ö/..hB..F¶.P.Ç.2..á..hL..F¶.P. 0000C0
D636FF00 16E90374 01087E83 011BE900 00881AD6 16891AD4 A308C483 005800EA ô.X..á.£à...ø.|..Ö...~..t.Ö...6ø 0000E0
FF1276FF 0020E903 7401067E 8300FCE9 00008804 C4830081 00109A1A D436FF1A ..6à.......á.|..Ö•..~..t.Ö ..v.. 000100
006F681E 0003E900 00880CC4 83009801 1E9A1AD4 36FF1AD6 36FF004E 681E1076 v..hN..6ø..6à.......á.|..ÖE..ho. 000120
36FF1AD6 36FF0088 681E1476 FF1676FF 08C48300 B5011E9A 1AD436FF 1AD636FF .6ø..6à....ç..á..v..v..h...6ø..6 000140
EE011E9A 1AD436FF 1AD636FF 009A681E 0C76FF0E 76FF0CC4 8300CF01 1E9A1AD4 à....ü..á..v..v..h...6ø..6à....Ÿ 000160
0100011E 9A1AD436 FF1AD636 FF008068 1E505200 4C050E56 880C468B 0CC48300 ..á..F..V..L.RP.h¯..6ø..6à...... 000180
83012C01 1E9A1AD4 36FF1AD6 36FF00C6 681E5052 0058050E 56880C46 880CC483 .á..F..V..X.RP.hó..6ø..6à......, 0001A0
C4830140 011E9A1A D436FF1A D636FF00 DC681E50 5200EF05 0E56880C 46880CC4 á..F..V..ÿ.RP.hÉ..6ø..6à....@..á 0001C0
D436FF1A D636FF01 2D681E08 C4830154 011E9A1A D436FF1A D636FF00 F2681E0C ..h·..6ø..6à....T..á..h·..6ø..6à 0001E0

Dump of file SATURN:[PCCOMMON.DUMP.DLL]UVMAPS.TMP;1 on 18-APR-1990 10:53:46.68
File ID (961,2,0)    End of file block 37 / Allocated 40

Virtual block number 3 (00000003), 512 (0200) bytes

02000000 06002100 02000212 CAC95F5E 1F0000E9 00008808 C483FFFF 011E9A1A .......á.|..Ö...^_èò.....!...... 000000
260A5EC4 D88EFFFF B81E5657 000014C8 00000000 00000000 00000000 08000800 ...............à¯..VV.|...Äá^.& 000020
E9000688 0006E903 7412460B 10468807 89260247 89260000 88065EC4 000007C7 ú...á^.|..&.G.&...F..F.t.Ö..|..Ö 000040
8D1076FF 1276FF14 76FF1676 FF014EE9 00078800 06E90374 08460806 4688015F ..F..F.t.Ö..|..ÖN..v..v..v..v.. 000060
7500F87E 83F84689 0000FFFF 9A5016FA 4680S016 FC468050 16F0468D 5016EC46 Fš.P.Fb.P.F•.P.F•.P......F½.-½.u 000080
890000FF FF9A5016 F4468050 00FDFC46 697E6A0E 76FF0117 E90003B8 0006E903 .Ö..|..Ö...v.j~iF••.P.F¶.P...... 0000A0
8D02329A FC76FFFE 76FF00FD 68006A00 F0E90000 B80006E9 037500F8 7E83F846 F½.-½.u.Ö..|..Öb.j.h»..v±.v•.2.§ 0000C0
89260789 26F6568B F4468806 5EC408C4 83FFFF01 EA9AF476 FFF676FF 006A5000 .Pj..v~.v¶.õ....á.á^..F¶.V-&..&. 0000E0
9A5016F4 468DFA76 FFF076FF F276FF14 76FF1676 FF078926 FC46880A 5EC40257 W.á^..F•&...v..v..v·.vb.v•.F¶.P. 000100
FFEE76FF 1476FF16 76FF0088 E90002B8 0006E903 7500F87E 83F84689 FFFF0000 .....F½.-½.u.Ö..|..Ö...v..v..vŸ. 000120
60E90001 B80006E9 037500F8 7E83F846 89FFFF00 009A5016 F4468DFA 76FFEC76 vš.v•.F¶.P......F½.-½.u.Ö..|..Ö' 000140
76FFF276 FF1476FF 1676FFF8 46890000 01529AEC 76FFEE76 FF1476FF 1676FF00 ..v..v..vŸ.vš.R....F½.v..v..v·.v 000160
5EC437FF 260A5EC4 0029E900 04B80006 E9037500 F87E83F8 46890000 FFFF9AF0 Þ......F½.-½.u.Ö..|..Ö).á^.&.7á^ 000180
00E9F846 88F84689 0000FFFF 9A016A00 6A4C6A01 6A00FD68 37FF2602 77FF2606 .&.W.&.7h».j.jLj.j.......F½.F½Ö. 0001A0
00000600 AF000200 00000401 1D000200 00000300 F2000200 0812CAC9 5F5E1F00 ..^_èò.....·...............€.... 0001C0
1E000300 88020300 01000501 84010300 00000800 08000200 0E000201 3E020300 ...>............................ 0001E0
```

```
Dump of file SATURN:[PCCOMMON.DUMP.DLL]UVMAPS.TMP;1 on 18-APR-1990 10:53:46.68
File ID (961,2,0)   End of file block 37 / Allocated 40

Virtual block number 4 (00000004), 512 (0200) bytes

 260C5EC4 D88EFFFF B81E5657 0000AEC8 00000000 00000000 91000600 64020300 ...d...........àÚ..WV.¡...Äá^.& 000000
 1276FFFF 589689FF 56868902 57882607 88260C5E C40086E9 03750247 08260788 ..&.G.u.ÕÑ.á^.&..&.W...V...X..v. 000020
 FE468800 06E90375 00FE7E83 FE468900 00FFFF9A 5016FF52 8680DA76 FF1076FF .v..v...R..P......F±.~±.L Õ...F± 000040
 9A37FF26 0277FF26 065EC450 16A8468D 000000FB 87C7261F C426065E C40084E9 Õ..á^.&á.&ú.«....F´.Pá^.&. .&.7. 000060
 FF01B49A 50520058 05025788 26078826 065EC450 16FF5A86 8008C483 008F0184 Ç....á...Z..Pá^.&..&.W..X.к. Ç.. 000080
 5EC4A676 FF00C002 229A5052 004C0502 57882607 8826065E C4F476FF 08C483FF ..á..v¶á^.&..&.W..L.RP.".â..vÌá^ 0000A0
 3BE900FD 07812606 5EC4040C 4683FFFF 02AE9A50 5200EF05 02578826 07882606 .&..&.W..ÿ.RP.Û....F..á^.&..».Õ; 0000C0
 02000000 06007200 02000000 0500A900 0200040E CAC95F5E 1F0000E9 FE4688FF ..F±Õ...^_èò....`.......r...... 0000E0
 260C5EC4 D88EFFFF 881E5657 0000FAC8 00008A00 06003D02 03000000 08000800 .........=...¤..à*..WV.¡...Äá^.& 000100
 1276FFFF 0E9689FF 0C868902 57882607 88260C5E C4020EE9 03750247 08260788 ..&.G.u.Õ..á^.&..&.W.........v. 000120
 880007E9 037500FF 328E83FF 32868900 00FFFF9A 5016FF08 8680DA76 FF1076FF .v..v......P.......2../2..u.Õ... 000140
 7E839446 FF0003E9 00009446 C7000100 FB87C726 1FC42606 5EC401DA E9FF3286 .2.ÕÖ.á^.&á.&ú.«...úF...Õ...F..~ 000160
 88013E87 8806945E 680014E9 03740142 87390A46 8806945E 680027E9 037C0294 ..|.Õ'.k^...F.9.B.t.Õ..k^....>.. 000180
 5016FF3C 86805016 FF18868D 1076FF12 76FFFFCD E9FF3696 89FF3486 89014097 .a...4...6.Õë..v..v......P..<..P 0001A0
 FF328689 0000FFFF 9A5016FF 3886800A 76FF1076 FF1276FF FF328689 FF349EFF ..4...2..v..v..v...8..P.......2. 0001C0
 46C70003 FF0686C7 08C48302 1501B49A 37FF2602 77FF2606 5EC45016 FF48868D ..H..Pá^.&.w.&.7.Ç....á.ú.....úF 0001E0

Dump of file SATURN:[PCCOMMON.DUMP.DLL]UVMAPS.TMP;1 on 18-APR-1990 10:53:46.68
File ID (961,2,0)   End of file block 37 / Allocated 40

Virtual block number 5 (00000005), 512 (0200) bytes

 74014A87 390A4688 02E3C194 5E880023 E9037C02 947E8394 46FF0003 E9000094 ...Õ...F..~..|.Õ#..^.èD..F.9.J.t 000000
 26078826 065EC4FF 0686FFFF D1E9FF06 8689014C 878802E3 C1945E88 000EE903 .Õ...^.èD...L.....ÕI..Ñ..á^.&..& 000020
 27E9037C 02947E83 9446FF00 03E90000 9446C701 8D02229A 5052004C 05025788 .W..L.RP.".§.úF...Õ...F..~..|.Õ' 000040
 34868901 34978801 32878806 945E6800 14E90374 01368739 0A468806 945E6800 .k^...F.9.6.t.Õ..k^....2...4...4 000060
 328689FF 349EFF50 169A468D 5016FF20 86801076 FF1276FF FFCDE9FF 369689FF ...6.Õë..v..v... ..P.F..P..4...2 000080
 8826065E C4F276FF FF328689 0000FFFF 9A501696 46800A76 FF1076FF 1276FFFF ..v..v..v..F..P.......2..v·á^.&. 0000A0
 2DE90374 00003D00 00FFFF9A 5016F446 8DFFFF02 AE9A5052 00EF0502 57882607 .&.W..ÿ.RP.Û....F¶.P.....=..t.Õ- 0000C0
 FF3486FF FF3686FF 5016F446 8D0A76FF 50520058 05025788 26078826 065EC400 .á^.&..&.W..X.RP.v..F¶.P.Ñ6..Ñ4. 0000E0
 00580502 57882607 8826065E C45016A6 468012C4 83FFFF02 379A1076 FF1276FF .v..v..7....á..FÌ.Pá^.&..&.W..X. 000100
 0000E9FF 328688FD E3E900FD 07812606 5EC4040C 468308C4 83FFFF01 6E9A5052 RP.n....á..F..á^.&..».ÕD»..2.Õ.. 000120
 003D0000 01C59A0E 76FF1076 FFD88E00 08881E56 5700006C C8000ECA C95F5E1F .^_èò..àl..WV.¡...Å.v..v..é...=. 000140
 0876FF94 46890A5E FF50169A 468D0E76 FF1076FF 0676FF08 76FF0070 E9037400 .t.Õp..v..v..v..v..F..P.^..F..v. 000160
 16F4468D 1276FF14 76FF1676 FF944689 000001A0 9A501696 46801276 FF0676FF .v..v..F..P......F..v..v..v..F¶. 000180
 1676FF50 16A6468D 94468912 C48301F9 02379A06 76FF0876 FF0A76FF 0C76FF50 P.v..v..v..v..7.'..á..F..FÌ.P.v. 0001A0
 C95F5E1F 0000E900 0088013B 033A9A14 76FF1676 FF08C483 00E3016E 9A1476FF .v..n.D..á..v..v..:.;.¡..Õ...^_è 0001C0
 02B60002 00000005 02C40002 00E20006 00C80203 00000004 02A00002 000890CB ù............à...ã...á.......Ñ. 0001E0

Dump of file SATURN:[PCCOMMON.DUMP.DLL]UVMAPS.TMP;1 on 18-APR-1990 10:53:46.68
File ID (961,2,0)   End of file block 37 / Allocated 40

Virtual block number 6 (00000006), 512 (0200) bytes

 027C0203 00A30006 003D0203 00F60006 024A0203 00000008 023F0002 00000006 ......?.......J...~...*...Ê...|. 000000
 1E014368 D88EFFFF B81E5657 000004C8 00000000 00000000 00000000 00CF0006 ..ü.............à...WV.¡...ÄhC.. 000020
 3C680000 003B9A50 16FE468D 1B72681E 01426800 00002A9A 5016FE46 8D1B7C68 h|..F±.P.*...hB..hr..F±.P.;...h< 000040
 16FE468D 1AE8681E 013A6800 001AD806 C7000000 529A5016 FE468D1A DA681E01 ..hÖ..F±.P.R...ú.Ä...h:..hÓ..F±. 000060
 03E0D1C1 03E0D1C8 88FC4688 013E6800 00FC46C7 00011AE6 06C70000 007E9A50 P.~...ú.Ì...úF=..h>..F=.àÌÁ.èÌÁ. 000080
 011AF487 C70ED868 FC46FFFC 46880000 00AE9A50 16FE468D 501E1AF6 05E0D1C1 èÌÁ.~..P.F±.P.Û....F=.F=kÄ.ú.¶.. 0000A0
 00DE9A50 16FE468D 501E1AF6 05E0D1C1 03E0D1C1 03E0D1C8 88FC4688 01406800 .ha..F=.àÌÁ.èÌÁ.èÌÁ.~..P.F±.P.B. 0000C0
 03E0D1C1 03E0D1C8 88FC4688 013F6800 031AF487 C70ED868 FC46FFFC 46880000 ...F=.F=kÄ.ú.¶...h?..F=.àÌÁ.èÌÁ. 0000E0
 021AF487 C70ED868 FC46FFFC 46880000 010E9A50 16FE468D 501E1AF6 05E0D1C1 èÌÁ.~..P.F±.P......F=.F=kÄ.ú.¶.. 000100
 013E9A50 16FE468D 501E1AF6 05E0D1C1 03E0D1C1 03E0D1C8 88FC4688 01416800 .hA..F=.àÌÁ.èÌÁ.èÌÁ.~..P.F±.P.>. 000120
 03E0D1C1 03E0D1C8 88FC4688 01476800 041AF487 C70ED868 FC46FFFC 46880000 ...F=.F=kÄ.ú.¶...hG..F=.àÌÁ.èÌÁ. 000140
 061AF487 C70ED868 FC46FFFC 46880000 016E9A50 16FE468D 501E1AF6 05E0D1C1 èÌÁ.~..P.F±.P.n....F=.F=kÄ.ú.¶.. 000160
 019E9A50 16FE468D 501E1AF6 05E0D1C1 03E0D1C1 03E0D1C8 88FC4688 01446800 .hD..F=.àÌÁ.èÌÁ.èÌÁ.~..P.F±.P... 000180
 03E0D1C1 03E0D1C8 88FC4688 01456800 051AF487 C70ED868 FC46FFFC 46880000 ...F=.F=kÄ.ú.¶...hE..F=.àÌÁ.èÌÁ. 0001A0
 071AF487 C70ED868 FC46FFFC 46880000 01CE9A50 16FE468D 501E1AF6 05E0D1C1 èÌÁ.~..P.F±.P.ö....F=.F=kÄ.ú.¶.. 0001C0
 01FE9A50 16FE468D 501E1AF6 05E0D1C1 03E0D1C1 03E0D1C8 88FC4688 01466800 .hF..F=.àÌÁ.èÌÁ.èÌÁ.~..P.F±.P.±. 0001E0
```

```
Dump of file SATURN:[PCCOMMON.DUMP.DLL]UVMAPS.TMP;1 on 18-APR-1990 10:53:46.68
File ID (961,2,0)   End of file block 37 / Allocated 40

Virtual block number 7 (00000007), 512 (0200) bytes

 03E001C1 03E001C8 8BFC468B 013D6800 081AF487 C70ED86B FC46FFFC 46880000 ...F=.F•kÄ.ú.¶...h=..F=.àlÅ.èlÅ. 000000
 001AF487 C70ED86B FC46FFFC 46880000 FFFF9A50 16FE468D 501E1AF6 05E001C1 èlÅ.-..P.F±.P......F=.F=kÄ.ú.¶.. 000020
 3E83D88E 0008881E 56570000 04C8C8C9 5F5E1F00 00E90000 88000101 5206C700 .ú.R...|..Õ...^_èùà...WV.|...Å.> 000040
 83029301 849A0676 FF0876FF 187C681E FC4689FF FF00009A 0008E903 74000152 R..t.Õ........F=.h|..v..v..Ç.... 000060
 D887390A 46880EFE 5E68003B E9037C02 FE7E83FE 46FF0003 E90000FE 46C708C4 â.úF±..Õ...F±.-±.|.Õ;.k^±..F.9.Ä 000080
 0676FF08 76FF501E 1ADA05E0 D1C103E0 D1C103E0 D1C888FE 46880028 E903741A .t.Õ(..F±.àlÅ.èlÅ.èlÅ.Õ..P.v..v. 0000A0
 04C80006 CAC95F5E 1F0000E9 000088FF B9E90009 E9000088 08C483FF FF01849A .Ç....á.|..Õ..Õ¿.|..Õ...^_èò..à. 0000C0
 187C681E FC468902 3800009A 0008E903 74000152 3E83D88E 022A881E 56570000 ..WV.¡*..Ä.>R..t.Õ.....;.¯F=.h|. 0000E0
 E9037C09 FE7E83FE 46FF0003 E90000FE 46C708C4 83031F01 849A0676 FF0876FF .v..v..Ç....á.úF±..Õ...F±.-±.|.Õ 000100
 D1C103E0 D1C103E0 D1C888FE 46880028 E903741A F487390A 46880EFE 5E68003B ;.k^±..F.9.¶.t.Õ(..F±.àlÅ.èlÅ.èl 000120
 000188FF B9E90009 E9000088 08C48302 4D01849A 0676FF08 76FF501E 1AF605E0 Å.-..P.v..v..Ç.M..á.|..Õ..Õ¿.|.. 000140
 0676FF08 76FF1B72 681E088E 0286881E 56570000 00C80006 CAC95F5E 1F0000E9 Õ...^_èò..à...WV.¡Ñ..Ä.hr..v..v. 000160
 00610005 00190203 00049000 04CAC95F 5E1F0000 E9000088 08C48302 D9016E9A .n.)..á.|..Õ...^_èò...........•. 000180
 00000000 00000000 00000008 03420002 00000006 03530002 00000005 02C70002 ..ú.......S.......B............. 0001A0
 830A47F6 26065EC4 FFFF8E56 000012C8 00000000 00000000 00000000 00000000 ................à...V/..á^.&-G.. 0001C0
 8E2D0646 88F08804 C483005A 05389A53 0600ADE9 0374400A 47F62600 87E90375 u.Õñ.&-G.ât.ÕÜ..S.8.Z..á..Þ.F.-. 0001E0

Dump of file SATURN:[PCCOMMON.DUMP.DLL]UVMAPS.TMP;1 on 18-APR-1990 10:53:46.68
File ID (961,2,0)   End of file block 37 / Allocated 40

Virtual block number 8 (00000008), 512 (0200) bytes

 C404C483 006C0266 9A0676FF 0876FFFA 46891186 87880608 6BF9F700 0C899905 ..¿..¼•kÄ......F•.v..v..f.l..á.á 000000
 8D015468 1E617400 FA7E8364 7CC00802 C4830087 10989A50 E42A0847 8A26065E ^.&.G.*ôP......á..â|d.-•.tm.hT.. 000020
 1E13745C FE7F8026 FC5EC4FE 568CFC46 89F2468D 08C48300 AB01849A 5016F046 FÞ.P.Ç.¨..á..F·.F=.V±á^•&..±\t.. 000040
 FA76FFFC 76FFFE76 FF0A6AFC 4EFF03EB 08C48300 C3016E9A 5016F046 8D015668 hV..FÞ.P.n.û..á.Š..N•j..v±.v•.v• 000060
 26065EC4 FFFF8E03 74C00804 C483FFFF 10DE9A50 16F0468D 08C48300 D010C29A .ó.Å..á..FÞ.P.B....á..ât./..á^.& 000080
 FE76FF1B 74D008FE 5689FC46 89011010 429A0000 04C890CB C95EC68B 000A47C6 6G...ó^èù.à....B....F•.V±.Åt..v± 0000A0
 08C890C8 C999C028 9004E80C C4830034 02AC9A06 76FF0876 FF0A76FF 0C76FF50 P.v..v..v..v..¨.4..á.Š..+â.èù.à. 0000C0
 FC76FFF0 8804C483 0152038E 9A0676FF 0876FFFC 568CFA46 890E468D 56570000 ..WV.F..F•.V•.v..v../.R..á..Þ.v= 0000E0
 560676FF 0876FFF8 880CC483 0163058E 9A0676FF 0876FF0A 76FF0C76 FFFA76FF .v•.v..v..v..v../.c..á..½.v..v.V 000100
 AEF2FFFF B9C03306 7EC41EDE 88D788EC 8855C8C9 5F5EC788 06C48300 F104949A ...þ..á..ú^_èùU.š.▪.8.á-.3â¿..·Û 000120
 740001C6 F706468B FE870846 8ED88EC0 8CF928D1 F7AEF2FF FF890A7E C4FF758D .u.á-.¿..·Ü®1+•.å.Ä.F..±.F.¼ó..t 000140
 880A76C5 1EDE88D7 88EC8855 C85DC28C 1FFA88F3 88A4F3C9 13A5F3E9 D149A402 .ÊllõµÊ.èµÊ.µ.•..õ]ùU.š.▪.B.év.. 000160
 F3C913A5 F3E9D149 A4027401 A8C78806 7EC4D1F7 AEF2FFFF B9C033C0 8ED88CFE ±.Ä.â3â¿..·Ü¼lá-..ù¨.t.ÊllõµÊ.èµ 000180
 DB18D12B 0C74DAF7 D788067E C45738E3 0C4E88EC 8855C85D C28C1FFA 88F38BA4 Ê.µ.•..õ]ùU.š.N.D8Wá-..▪¼Õt.+l.Û 0001A0
 8EFFFFC3 81C38C10 E3D187AA F3C913AB F3E9D1E0 8A0A468B D128D187 D103D323 #Æ.l.l+l.F..Åloµ¨.èµ¨.ìD..û.û... 0001C0
 0A5E88D8 080C5E88 08468BEC 8855CB5D 08568806 46885FAA F3C913AB F3E9D1C3 ùlõµ¨.èµ¨_.F..V.]ùU.š.F..^..Ä.^. 0001E0

Dump of file SATURN:[PCCOMMON.DUMP.DLL]UVMAPS.TMP;1 on 18-APR-1990 10:53:46.68
File ID (961,2,0)   End of file block 37 / Allocated 40

Virtual block number 9 (00000009), 512 (0200) bytes

 D103E3F7 064688C8 030C66F7 064688C8 8BE3F700 08CA5DE5 8BE3F706 46880875 u..F.¼D.{]ò..¼D.à.F.¼f..à.F.¼D.1 000000
 260877FF 262E7408 0A47F626 3574830A 47F62606 5EC40000 00C80008 CA5DE58B .{]ò..à...á^.&-G..t5&-G..t.&.w.& 000020
 47892602 57892607 892699C0 2BF70A67 8026065E C404C483 01361772 9A0677FF .w..r.6..á.á^.&.g.¼+á.&..&.W.&.G 000040
 00723D27 7400613D 98078A26 0A5EC456 00000AC8 90CBC904 47892608 57892606 .&.W.&.G.èù.à...Vá^.&...=a.t'=r. 000060
 FC46C603 018E9022 E8000189 01FC46C6 F6289000 EEE999C0 28137400 773D0C74 t.=w.t.+â.ÕŸ..+-óF•.¿..Š".f..óF• 000080
 5EC40A46 FF80FC46 C6FEE683 0002CE81 43750002 C6F790F4 E801098E 90F1E802 .Šþ./..$¶.¼ó..uC.ö...l±óF=..F.á^ 0000A0
 C6881575 00743D13 7400623D D674002B 3D98078A 263374C9 08377400 3F80260A .&.?.t7.èt3&...=+.t•=b.t.=t.u..ó 0000C0
 4E898DE8 8000CE81 90C4EBC9 280574C0 00A9C688 9000E840 00CE810E 75C000A9 `.âu..ö.ãŠÅ..ó`.ât.+èŠá..ö..$§.N 0000E0
 0E5EC4FF 6AE9037D C00BFA46 8908C483 02861426 9A0676FF 0876FF56 01A468FE ±hÊ.V.v..v..&....á..F•.â).Õj.á^. 000100
 8205E0D1 C103E0D1 C88BF9F7 000C8999 058E2DC3 88178406 FF0A4788 26FC468A .F=&.G......û-...¿..¼•.àlÅ.èlÅ.. 000120
 C02B0E5E 88000004 47C7F85E 88044789 260E5E88 980788F8 5E88C02A F8468911 ..F½*â.^½....^.&.G..^ÿúG....^.+â 000140
 04C8C8C9 5EC28CC3 88084788 26FA468A 08578926 06478926 02578926 07892699 .&..&.W.&.G.&.W..F•&.G..û.ô^èùà. 000160
 A6067E81 13E80000 FE46C707 7503E608 7E810E75 059A067E 81178406 FF560000 ..V.....~...u..-.l.u.úF±..Š..-.l 000180
 B999058E 2DC38815 750C0A47 F626065E C40001FE 46C72475 FFFF087E 81287505 .u+.-...u$úF±..á^.&-G..u..û-...¿ 0001A0
 04880158 C68102E6 C1FE7688 90907EE8 C0280674 01118287 F6060868 F9F7000C ..¼•kÄ.-....t.+âŠ-...v±èl..óX... 0001C0
 99058E2D 064688D5 74D00802 54890489 02C48304 D117879A 02006814 75024408 .D.u.h.....i..á....T..Åtl.F.-... 0001E0
```

```
Dump of file SATURN:[PCCOMMON.DUMP.DLL]UVMAPS.TMP;1 on 18-APR-1990 10:53:46.68
File ID (961,2,0)   End of file block 37 / Allocated 40

Virtual block number 10 (0000000A), 512 (0200) bytes

 01588488 02E6C1FE 7688065E C4FC4689 118205E0 D1C103E0 D1C88BF9 F7000C89 ¿..¾*.àìÁ.èìÁ....F*á^..v±ël...X. 000000
 04478926 02448902 0088FC76 88025789 26078926 08578926 06478926 015A9488 ..Z.&.G.&.W.&..&.W..v*¡...D.&.G. 000020
 B99905BE 2D08468B 000004C8 90CBC95E 00018802 0A4F8026 065E8B11 07C6DE8B .Ró...^.&.O..¡..^èù.à....F.-...¿ 000040
 F626FC5E C4517400 067E83FE 5E8CFC46 89118205 E001C103 E001C888 F9F7000C ..¾*.àìÁ.èìÁ....F*.^±.~..tÒá^*&- 000060
 0876FF0A 76FF5C74 C00B02C4 8304E318 649A50E4 2A08478A 26085EC4 72741007 ..trá^.&.G.*ðP.d.D..á..ât\.v..v. 000080
 89260789 2699C028 085EC400 000247C7 260007C6 26FC5EC4 04C48305 2205389A .B."..á.á^*&ó..&úG...á^.+â.&..&. 0000A0
 9A50E42A 08478A26 085EC421 741007F6 26FC5EC4 2AEB0857 89260647 89260257 W.&.G.&.W.Š*á^*&-..t!á^.&.G.*ðP. 0000C0
 C4F62B56 000004C8 CBC9034E 05389A08 76FF0A76 FF0B74C0 0802C483 05341864 d.4..á..ât..v..v..8.N.èùà...V+-á 0000E0
 D868F9F7 000C8999 058E2DC3 88157508 0A47F626 5575023C 03240A47 8A26065E ^.&.G.$.<.uU&-G..u..û-...¿..¾*kÄ 000100
 FF260877 FF265028 7EC008FC 46890647 28260788 26065E88 39740111 8287F606 .-....t9.^.&..&+G..F*.à~(P&.w.&. 000120
 FFBE200A 4F802606 5EC40874 FC463808 C4830428 15E49A50 E42A0847 8A260677 w.&.G.*ðP.ð.+..á.;F*t.á^.&.O. ƒ. 000140
 8855C8C9 5EC68800 000447C7 26025789 26078926 08578826 06478826 065EC4FF .á^.&.G.&.W.&..&.W.&úG....ó^èùU. 000160
 18A41689 1BA2A310 56880E46 8B1B841E 8C1882A3 18888805 8C18EC9A 000A88EC $¡...$...¡¡.Èý...Ç..F..V.ÈÀ...È. 000180
 25F67E80 038DE900 001BAC06 C700001B AE06C718 8A16891B 88A30856 88064688 .F..V.È......ú.Û...ú.¯...Õ...—% 0001A0
 A31BA6A3 1BABA31B 90A31BAA A31B8EA3 1B92A3C0 2B00011B B006C703 08E90374 t.Õ..ú.¯...+âÈ..È..È`.È..È`.ÈI.È 0001C0
 301D1806 C70A46FF 49753001 7F80260A 5EC40020 1D1806C7 1BA0A31B 86A3188C ..È..È..ú... .á^.&...0ul.F.ú...0 0001E0

Dump of file SATURN:[PCCOMMON.DUMP.DLL]UVMAPS.TMP;1 on 18-APR-1990 10:53:46.68
File ID (961,2,0)   End of file block 37 / Allocated 40

Virtual block number 11 (0000000B), 512 (0200) bytes

 0E75203F 80269028 EB00001B A606C71B 9206FF00 752B3F80 260A5E8B 903EE800 .Š>..^.&.?+u.....ú.Ì...Š(.&.? u. 000000
 A006FFC7 752D3F80 260A5EC4 00EB1B86 06FF9014 EB1BA606 FF1A7500 18923E83 .>...u...Ì.Š......Š.á^.&.?-uü... 000020
 B6681E0A 76FF0C76 FFD075C0 0B02C483 0978E80E 5098078A 260A5E8B 0A46FF1B ..F..^.&...P.Òx..á..âuÏ.v..v..hÑ 000040
 B6A3D8F7 1BB6A11B A006FF0C 7D001BB6 3E830C56 890A4689 08C48308 C7E80E1B ..Òú..á..F..V..>Ñ..).....ÀÑ.¾ÀÈÑ 000060
 06FF2D75 2E3F8026 0A5EC400 201D1806 C7067530 1D183E83 0074001B A03E831B ..>...t..>..Ou.ú... .á^.&.?.u-.. 000080
 7D001BB0 3E830C56 890A4689 08C48308 7BE80E1B 80681E0A 76FF060A 46FF1BA8 `..F...v..h¯..Ò(..á..F..V..>¯..) 0000A0
 7400683D 4074004E 3D307400 46309807 8A260A5E C41BA80E FF00011B B006C70A .ú.¯.....`.á^.&...=F.t==N.t@=h.t 0000C0
 C40A46FF 03754C3F 80260A5E C4097500 18903E83 00021B90 06C70675 006C3D2B +=l.u.ú.....>...u.á^.&.?Lu..F.á 0000E0
 1B9006C7 D0EB0010 1B9006C7 D8EB0001 1B9006C7 90024EE9 1C75003F 80260A5E ^.&.?.u.ÕN..ú.....ŠÄú.....ŠÄú... 000100
 46831B8E 06FF0875 00583D05 7400473D 0A740045 3DF84689 98078A26 C8EB0008 ..Šà&....F½=E.t.=G.t.=X.u......F 000120
 7500253D 0152E903 7E013FE9 03750063 300191E9 037E7874 006930F8 468B20F8 ½ .F½=¡.tx~.Õ..=c.u.Õ?.~.ÕR.=X.u 000140
 0247C726 0789261B ACA11FC4 261BA21E C4157502 18903E83 900159E9 0140E903 .Õ@.ÕY...>...u.á.À.&á.À¯.&..&úG. 000160
 0170E903 75001BAE 3E83041B A2068307 89261BAC A11FC426 1BA21EC4 0DEB0000 ..Š.á.À.&á.À¯.&....À...>Û..u.Õp. 000180
 06FF01AC E9FFFFB8 01AFE903 75200A47 F6261B88 1EC401BD E9037400 1BAC3E83 .>˜..t.Õ§.á...&-G. u.ÕE.¡..Õ˜... 0001A0
 188E06FF 188C06FF F2E8086A 90C3EB02 C483019E E80E0A6A 00001B86 06C71BAA `.ú.....j..Ò...á.Šù.j.Š·........ 0001C0
 1B90A3C0 2B7A7401 18903E83 0081E903 75081B90 3E830004 1BB006C7 1BA806FF ..`.ú.¯....>...u.Õ...>...tz+âÈ.. 0001E0

Dump of file SATURN:[PCCOMMON.DUMP.DLL]UVMAPS.TMP;1 on 18-APR-1990 10:53:46.68
File ID (961,2,0)   End of file block 37 / Allocated 40

Virtual block number 12 (0000000C), 512 (0200) bytes

 909013EB 00001B86 06C70A74 001BA03E 83FA4689 1BB6A128 741BB606 39FA4689 .F*9.Ñ.t(ÀÑ..F*.>...t.ú.Ñ...Š... 000000
 6A02C483 0130E80E 106A021B A206831B 86A3C02B 027DC00B 1BB6A105 1B862E83 ..Ñ..ÀÑ..à).+àÈÑ...À..j..ÒÒ..é.j 000020
 C00B1B86 A300052D FA468B15 74001BA0 3E832274 00FA7E83 02C48304 80E80E3A :.Ò...é..-".t".>...t..F*-..ÈÑ..è 000040
 068302C4 8300F1E8 0E106A04 1BA22E83 00001B86 06C79007 EB1BB6A3 C02B027D ).+àÈÑ.Š..ú.Ñ......À..j..Òþ..é... 000060
 49E80EF8 76FFF4EB 016A90FF 39E9026E E80E006A 90FF3FE9 106AFF10 E9021BA2 À..Ò..j.Ò?..j..Òn.Ò9..j.Š¶.vh.Òl 000080
 DA7E0067 30057C00 6530FF0C E9037500 643090FF 21E90428 E80E256A FF2AE903 .Ò*.j%.Ò(.Òl..=d.u.Ò..=e.|.=g.-Ò 0000A0
 903AEBFE 5689FC46 89400C56 880A4688 0A4EFF0C 56880A46 88097400 1B903E83 .>...t...F..V..N..F..V.ə.F*.V±Š:. 0000C0
 0075308F 74007330 FEE0E903 75007030 FEE4E903 75006F30 FE80E903 75006E30 =n.u.Ò.±=o.u.Òò±=p.u.ÒÀ±=s.t.=u. 0000E0
 88078A26 FC5EC4FC 46FF9034 E80A46FF 9081E8FF 79E90375 007830FE 89E90375 u.Ò¿±=x.u.Òy.ŠŸ..F.Š4..F*é^*&... 000100
 FC468B06 C483044C E80E0A76 FF0C76FF 500A462B C38BEC75 253C0474 C00AF646 F-.ât.<%uš.Ù+F.P.v..v..ÒL..é..F* 000120
 47F6261B 881EC4FC 63E90374 C00AF646 88078A26 0A5EC40C 56890A46 89FE568B .V±.F..V.é^.&...F-.ât.Òc*é...&-G 000140
 8300201D 1806C706 74001BA8 3E835657 000012C8 CBC91BAC A1FE51E9 0374200A . t.Òα±À^.èùà...WV.>`..t.ú... .. 000160
 88260788 261BA21E C4197510 1B903E83 0774021B 903E831B AA06FF04 740A067E -..t...`..>...t..>...u.é.À.&..&. 000180
 46890788 261BA21E C4117400 1BAA3E83 902CEB04 1BA20683 FE5689FC 46890257 W..F*.V±..À..Š,..>`..t.é.À.&...F 0001A0
 001B863E 83021BA2 0683FE56 89FC4689 99078B26 1BA21EC4 0EEB0000 FE46C7FC *úF±..Š.é.À.&....F*.V±..À...>... 0001C0
 89F24689 1BB41688 1BB2A11D 16A3C02B 9003EB06 46880674 FE460BFC 46880E74 t..F*.F±t..F.Š..+àÈ..Àý...Ç..F·. 0001E0
```

```
Dump of file SATURN:[PCCOMMON.DUMP.DLL]UVMAPS.TMP;1 on 18-APR-1990 10:53:46.68
File ID (961,2,0)   End of file block 37 / Allocated 40

Virtual block number 13 (0000000D), 512 (0200) bytes

 8B2007C6 26F246FF F25EC41D 750A067E 83287D00 FE7E8331 750018AA 3E83F456 V¶.>`..u1.-±.}+.-..u.6^·.F·&6.-. 000000
 B80000F6 46C79006 E80001F6 46C7FE56 89FC4689 DAF70002 83D8F7FE 568BFC46 F=.V±%Ä.@.%Ö.F=.V±úF-..Š..úF-..| 000020
 0018A83E 830AC483 0AA8185A 9AFC76FF FE76FF50 1E0676FF FA5E8CF8 46891B94 ...F%.^*.v..P.v±.v=.Z.¨..6..>`.. 000040
 163E830D 7EC90BF0 4E89C828 1BB00E88 04C48305 C718429A F876FFFA 76FF4574 tE.v*.v%.B.Ú..6...¯.+à.NÞ.è~..>. 000060
 7E89F47F C00B49C1 8B473005 C62605EB F27EC4F0 4E880000 1D1606C7 0675081D ..u.ú......NÞ6~·Š.&6.0G.èI.6.¶.~ 000080
 7C613C07 74C90B04 88078A26 F85EC4F2 76C5EE5E 8C1B8E0E 8BF04E89 F4468CF2 ·.F¶.NÞ.....^Ÿév·6^%&.....èt.<a| 0000A0
 92A11475 0018AA3E 83EE5E8E F45E8CF2 7689E375 003F8026 F846FF46 202C8003 .., F.F%&.?.uD.v·.^¶.^Ÿ.>`..u.À. 0000C0
 CBC95F5E 02C48302 FFE80E50 C02802EB 00018805 7500F67E 830B741B A606081B ...Ì.t..—.u.¡..Š.+àP.Ò...6.^_èù 0000E0
 18A20683 FA5689F8 468918A4 16881BA2 A10001BE 18740006 7E835657 000010C8 à...WV.~..t./..ÀÀ...Ê..F%.V*.¯À. 000100
 1EC410E8 FA5689F8 46890257 8826078B 261BA21E C4137408 18903E83 008FE902 .Õ...>...t.6.À.&..&.W..F%.V*Š.6. 000120
 FA4608F8 46880E74 081B903E 83041BA2 0683FA5E 8CF84689 FC468907 8B261BA2 À.&...F=.F%.^*..À...>...t..F%.F* 000140
 F24689FA 5688F846 8BFA5E8C F8468901 67B80975 00FC7E83 900AE801 60881575 u.¡'.Š...-=.u.¡g..F%.^*.F%.V*.F· 000160
 3B461574 003F8026 F246FFF2 5EC4900E EB1B800E 8B1C741B A83639F6 2BF45689 .V¶+-96`.t...¯.Š..6^·.F·&.?.t.F; 000180
 0875001B A03E83FE 281BB63E 88F37500 3F8026F2 46FFF25E C44690ED EB107ECE ö~.ŠÚ.F6^·.F·&.?.uµ.>Ñ.+±.>...u. 0001A0
 E80E5708 74001BA0 3E8306C4 830183E8 0EF876FF FA76FF56 02C48301 59E80E57 W.ÒY..6.V.v*.v%.Ò°..6..>...t.W.Ò 0001C0
 7467067E 83FE5689 FC46891B A416881B A2A10000 06C890C8 C95F5E02 C483013C <..6.^_èù.à...ÀÀ...Ê..F=.V±.-.gt 0001E0

Dump of file SATURN:[PCCOMMON.DUMP.DLL]UVMAPS.TMP;1 on 18-APR-1990 10:53:46.68
File ID (961,2,0)   End of file block 37 / Allocated 40

Virtual block number 14 (0000000E), 512 (0200) bytes

 7E800006 1B8006C7 0675001B A83E83FA 4688C02A 9003E801 B0057547 067E8306 ..-.Gu.¯.Š..*à.F*.>`..u.ú.¯....- 000000
 1BB436FF 0676FF1B B036FF1B 8E36FF00 011B8006 C7067500 18803E83 007400FA *.t..>¯..u.ú.¯....6...6¯..v..6Ç. 000020
 18863E83 1B7400FA 7E800EC4 8317861E FF2619F2 068EFC76 FFFE76FF 1B8236FF .6ý..v±.v=..·.&.....6..~*.t..>.. 000040
 3E831B74 0018863E 8304C483 178A1EFF 2619F206 8E1B8236 FF1B8436 FF147500 .u..6Ç..6ý...·.&.....6..>...t..> 000060
 06C7081B A2068304 C4831792 1EFF2619 F2068E1B 8236FF18 8436FF14 750018B0 ¯..u..6Ç..6ý...·.&.....6...À..ú. 000080
 0804C483 17961EFF 2619F206 8EFC76FF FE76FF1B 741BA606 081B92A1 00001D16 ....À....Ì.t..v±.v=..·.&.....6.. 0000A0
 1EC43C75 001BAE3E 83560000 00C890CB C90129E8 0E50C028 02E80001 B80574C0 àt.¡..Š.+àP.Ò).èù.à...V.>Û..u<6. 0000C0
 188A36FF 10EBE42A 04882602 478E2607 FF26378B 2606468A 1478044F FF261888 ..&.O.x..F.&.7&..&.G.&..*ðŠ..6.. 0000E0
 02C890CB C95E1BAC 06FF9005 EB1BAE06 FF077540 06C4830D 8312B09A 0676FF53 S.v..¯....6.au...Û.Š....¯. èù.à. 000100
 1D1836FF 1B8836FF 1B8A36FF 1BEB507E F60B0676 88577500 1BAE3E83 56570000 ..WV.>Û..uW.v..--PŠ..6...6.  6.. 000120
 0478044F FF261B88 1EC41E7E C00B4EC6 8B1BAE06 FF047540 06C48300 EB12B09A .¯.Š..6.au...Û..6N.à~.6...&.O.xà 000140
 06010646 8B077500 1BAE3E83 D4EBE42A 05882602 478E2607 FF263F8B 261D18A0 ...&.?&..&.G.&..*ðŠà.>Û..u..F... 000160
 1B8836FF 1B8A36FF 22EB5E75 001BAE3E 830A768B 56570000 02C8CBC9 5F5E1BAC ¯.^_èùà...WV.v..>Û..u^Š".6...6.. 000180
 74C00B4E C68B0646 FF1BAE06 FF047540 06C4830E 5D12B09A 5098078A 26065EC4 6^.Ì...P.¯.]..6.au...Û..F..6N.àt 0001A0
 2602478E 2607FF26 3F88261B 881EC407 8A26065E C4CD7804 4FFF261B 881EC425 %6...&.O.xëá^.&..6...&.7&..&.G.& 0001C0
 18B2A156 00000CC8 CBC95F5E 1BAC0601 0A468807 750018AE 3E83CAEB E42A0588 ..*ðŠò.>Û..u..F...¯.^_èùà...VÀý. 0001E0

Dump of file SATURN:[PCCOMMON.DUMP.DLL]UVMAPS.TMP;1 on 18-APR-1990 10:53:46.68
File ID (961,2,0)   End of file block 37 / Allocated 40

Virtual block number 15 (0000000F), 512 (0200) bytes

 830A9618 429AF476 FF521BB6 3688FA46 89FC4689 C02BF656 89F44689 18B4168B ..Ç..F¶.V-+à.F=.F*.6Ñ.R.v¶.B.... 000000
 3E834E01 75081D16 3E8308EB 02EE8305 75101016 3E830676 2BF02BF8 468904C4 6..F%+Þ+v..>...u..Ÿ.Š..>...u.N.> 000020
 71E80E50 98078A26 F446FF12 75301D18 3E831975 203F8026 F45EC422 750018A0 ...u"6^¶&.?-u..>..0u..F¶&...P.Òq 000040
 FF077400 067E831B 740018A0 3E83077E F60B0874 301D183E 83F84EFF 02C483FE ±.6..N%.>..0t..-~..>...t..-..t.. 000060
 FE7EE80E 56297500 18A03E83 0070E80E FC46FF07 74001D16 3E830066 E80EFA46 F*.Òf..>...t..F=.Òp..>...u)V.Ò~± 000080
 047500FC 7E830A74 001D163E 830039E8 0E047500 FA7E830A 7400067E 8302C483 .6..~..t..-*.u..Ò9..>...t..-=.u. 0000A0
 201D1806 C70E7400 18A03E83 06C483FE B5E80EF4 76FFF676 FFF876FF 0040E80E .Òa..v%.v-.v¶.Òç±.6..>...t.ú... 0000C0
 FDD2E80E 500020B8 03EB002B B8057400 18923E83 CBC95E02 C483FE38 E80E5600 .V.Ò8±.6.^èù.>...t.¡+.Š.¡ .P.Ò0» 0000E0
 03E80058 B8057400 188E3E83 1775101D 163E8302 C483F0C8 E80E306A CB02C483 .6.ùj0.Òà».6..>...u..>...t.¡X.Š. 000100
 12752A3F 80260A5E C40001FE 46C75657 000006C8 CB02C483 FDAAE80E 500078B8 ¡x.P.Ò`».6.ùà...WVúF±..6^.&.?*u. 000120
 FFFFFE46 C708752D 3F80260A 5EC49060 E80A46FF 021BA206 83378B26 18A21EC4 6.À.&.7..À...F.Š'.6^.&.?-u.úF±.. 000140
 0675303C 0A751BA8 3639387F 393C3F7C 303CFA46 88078A26 0A5E88F6 280A46FF .F.+-.^.&...F*<0|?<9.;96`.u.<0u. 000160
 83C803E1 D1CE0302 E1C1CE88 98058A26 1B7F393D 802606E8 F8880030 1D1806C7 ú...0..«Š.&.=9..&....öèÃ..öÌÃ.à. 000180
 46883789 26065EC4 F08BEEF7 FE46880C 468C0A7E 89DF7D30 30802647 F18830E9 Ò0.þG&.=0)Ò.~..F..F±¥Ÿ.Þá^.&.7.F 0001A0
 264701E8 FC7EC406 4E8AFE5E 8CFC4689 016E8857 000004C8 CBC95F5E 0C56880A ..V.^ èùà...W¡n..F=.^±.N.6-=Š.G& 0001C0
 C95FC02B FE468CFC 7E899009 EBFE468C FC7E8900 018BF475 00382611 74003D80 .=.t.Ì8.u¶¡...~=.F±Š...~=.F±+à_è 0001E0
```

```
Dump of file SATURN:[PCCOMMON.DUMP.DLL]UVMAPS.TMP;1 on 18-APR-1990 10:53:46.68
File ID (961,2,0)   End of file block 37 / Allocated 40

Virtual block number 16 (00000010), 512 (0200) bytes

26044789 26C02B25 75830A47 F626FC5E C4FE5E8C FC468905 8E880000 04C890CB ù.à...¡...F▪.^±ó^▪&-G..u%+ä&.G.& 000000
C38B17EB C28CC388 FF0B47C6 26025789 26078926 08578926 06478926 990A4788 .G..&.G.&.W.&..&.W.&óG...ú.óŠ..ù 000020
1E3B065E 88EC8855 90CBC999 C02B8D75 177E1638 C375177C 063B0CFC 4683C28C .ô.F▪.;.|.uù;.~.u§+ä.èù.U.š.^.;. 000040
E5880017 8987C6F3 75C08500 00FFFF9A 5301C4E9 01B8E9C0 330009BA 0B7217B7 ñ.r.¤..3äÕ¡.Ôá.S......âuµó.¿...Í 000060
8B5507B7 E9087EC5 1E990175 0AF983D2 33064688 0C4E8801 835756EC 8855C850 ]ùU.šVW°..N..F.3ø.ª.u...é-.Õñ.U. 000080
50EC8855 00C85DE5 8B017CE9 0374C085 0000FFFF 9A5050C0 330676FF 0876FFEC š.v..v.3áPP......ât.Õ|..Í]ù.U.šP 0000A0
E80021E8 0000FFFF 9A017468 1E017668 1E17B2A3 E0865800 00FFFF9A 5016C488 .á.P.....X.ÄÉý..hv..ht......Õ!.Õ 0000C0
017C16FF 00FF6811 3211E29A 1125118E 9A50C85D E5880001 8800471A 009A07EE Ÿ....G.¡...Í]ùP...%..ã.2.h....|. 0000E0
8BD18B05 80BE3174 00308026 47017500 3D80267F FFB90176 068EFF33 0000B81E .É..3...v.¿..&.=.u.G&.=.t1ƒ...Í. 000100
04E0C00E 72412CAC 17B9BF1F F78B071E 061CEBE7 74AEF2C0 330874CA 88A6F3C8 ùµÍ.òt.3á·UtóŠ.....%.¢¿.¯,Ar.âÁ. 000120
74001782 3E831137 11E29A50 00FCB8EC 8B5500C3 1FEDEBAA C20A0572 412CAC92 .¯,Ar..ô˙ŠÚ.ù.U.š¡▪.P.ã.7..>...t 000140
5688C08E D88E0301 885756EC 8855CB5D E58B1198 11E29A50 00FFB817 801EFF04 .....¡..P.ã....Í]ùU.šVW¡Í..Ä.â.V 000160
CA5DE588 5E5F96EB EBF788AE F2FFFFB9 C033970C 74964010 74C238AD 19FCBE06 .ƒ▪.Ù;ôt.ə.t..3â¿..·Ù.%Š$._^.Í]ò 000180
50490 1F7 AEF2FFFF 89C033FA 88921F74 C00811AC 11829A06 76FF57EC 88550002 ..U.šW.v..ý.¯..ât...ª3â¿..¨ÚÁ¡ÍP 0001A0
18040203 02021601 0002CA5D E58B5F5B 0000FFFF 9A501651 521E5300 02B8C488 .áE..S.RQ.P.....[_.Í]ò.......... 0001C0
02430D41 02350212 12110D10 120F1600 160C0808 070A0C09 0C080C07 09060005 ........................5.A.C. 0001E0

Dump of file SATURN:[PCCOMMON.DUMP.DLL]UVMAPS.TMP;1 on 18-APR-1990 10:53:46.68
File ID (961,2,0)   End of file block 37 / Allocated 40

Virtual block number 17 (00000011), 512 (0200) bytes

0BD702CE 0BA40D84 09820A81 0A801606 09721C70 2060006C 08590057 00530052 R.S.W.Y.l.m p.r...........Ê.ö.▪. 000000
B5A3CB5D E58B99FF FFB80008 E8CB5DE5 8B99FFFF B817AE16 8917B5A3 16080000 ....Èç...Ù.¡....Í]ùÒ..¡....Í]ùÈç 000020
72BC3C43 0A76243C 0472133C F7E24343 1674073A 2E1B75E4 0A002489 1218BB17 .É..¿$..ðu..:.t.CCã¼<.r.<$v.C<¥r 000040
89E42A0B 478A2608 5EC45657 000008C8 00C317AE A3980147 8A2E4301 76CA3C04 .<òv.C..G..ÈÜ.ü.à...WVá^.&.G.*ð. 000060
830A47F6 26F84689 118205E0 D1C103E0 D1C888F9 F7000CB9 99058E2D C388FA46 F'.û-...¿..¥'.àìÁ.êìÁ....F½&-G.. 000080
010A47F6 26085EC4 90012BE9 FFFFB820 0A4F8026 085EC40F 74400A47 F6260774 t.&-G.ət.á^.&.O. ¡..Ô+..á^.&-G.. 0000A0
04478926 C02BEF0A 67802602 0A4F8026 90E2EB00 000447C7 26200A4F 80260E74 t.&.O. &úG...Šã.&.O..&.g.ÿ+â&.G. 0000C0
75011182 87F60608 68F9F700 0CB99905 8E2DC388 4C750C0A 47F626FC 7689F088 .Þ.v▪&-G..uL.û-...¿..¥'kÄ.-....u 0000E0
FA76FF0F 7511B80A 7E811675 05A6087E 810E7413 590A7E81 0775059A 087E8137 7.~...u..~.Y.t..~.Í.u..~.¡.u..vª 000100
080A47F6 26085EC4 04C48307 D9E80876 FF0A76FF 0C75C00B 02C48313 CC18649A .d.ä..á..âu..v..v.Òl..á.á^.&-G.. 000120
772B2637 8B26085E 88677401 118287F6 06086BF9 F7000CB9 99058E2D C3881575 u..û-...¿..¥ªkÄ.-....tg.^.&.7&+w 000140
167EF608 04478926 48024588 F87E8802 57892607 89264008 57882606 47882606 .&.G.&.W.ə&..&.W..-½.E.H&.G..--. 000160
0F742017 8987F6FA 5E8819EB FC468908 C48313EA 15E49AFA 76FF0677 FF265256 VR&.w..vª.ð.õ..á..F▪Š..^ª-.¿. t. 000180
018E17EB 07882606 468A065F C426085E C408C483 14001808 9A53006A 006A026A j.j.j.S.Ä....á.á^.&á_..F.&..Š./. 0001A0
06468AFE CCE90374 FC7639FC 468908C4 8311EC15 E49AFA76 FF501606 46805600 .V.F..P.vª.ð.š..á..F▪9v▪t.Öät.F. 0001C0
D23352F8 56801652 FE568016 0676FF08 76FF4087 0EEC83EC 8855CBC9 5F5EE42A *ð^_èùU.š.š.ñə.v..v...V±R..V½R3ø 0001E0

Dump of file SATURN:[PCCOMMON.DUMP.DLL]UVMAPS.TMP;1 on 18-APR-1990 10:53:46.68
File ID (961,2,0)   End of file block 37 / Allocated 40

Virtual block number 18 (00000012), 512 (0200) bytes

02CA8022 740200A9 2A750400 A910CA80 08740100 A90A4688 018AE80C 4E885252 RR.N.Ò...F.`..t..ò.`..u*`..t".ò. 000000
8003E8FE 4E880875 58C08500 00FFFF9A 5050C033 50160676 FF0876FF FE468D50 P.F±.v..v..P3âPP......âXu..N±Š.. 000020
BAF0C2F6 0E75006E 3D1674C0 080000FF FF9A5050 C03350C7 0A000325 525101CA ò.QR%...úP3âPP......ât.=n.u.~ðb¤ 000040
3300188A 000010B1 9A500072 17870638 FE468800 8DE9FD8A E900118A 03740002 ..t.¤..Õ¤»Õ...F±;.ñ.r.P.Ÿ...¤..3 000060
00A9C933 0A468861 75C00800 00FFFF9A 50F8468D 1653F45E 8D165000 88E4E8C0 âŠð.ÂP..^¶S..F½P......âu▪.F.3è`. 000080
E940F446 C6077501 3CF4468A F24E8880 81027580 19CB06F6 07754000 A90E7580 .u.¯.əu.-.ù..u.Ÿ..N·.F¶<.u.óF¶əÕ 0000A0
FFB95273 7400020A 46F77A74 C90AF446 88C03200 83E908F4 46C60775 023C008E ..<.u.óF¶.Õ..2á.F¶.ètz%F...tsR¿. 0000C0
EBC033FD 36E90374 0083300C 74C00800 00FFFF9A 50FA4680 16510002 895151FF .QQ¿..Q..F*P......ât.▪..t.Õó»3áŠ 0000E0
7E833274 F8463923 75C00800 00FFFF9A 50F84680 16500001 8850F646 8D16524F OR..F-P|..P..F½P......âu▪9F½t2.~ 000100
50C03352 8E75C00B 0000FFFF 9AFA76FF FC76FF00 FC5E8301 FA6E8352 18751AF6 ~.u.R.nª..^▪..v▪.vª......âuƒR3âP 000120
8D160676 FF0876FF 287548C1 F6F44E8A AA75C00B 00001520 9A50FA46 8D165050 PP..FªP.-....âu¨.N¶-èHu(.v..v... 000140
20C98003 7400080A 46F710C9 80037400 01F846F7 00001471 9A5050C0 3350F846 F½P3âPP.q...%F½..t..è.%F...t..è 000160
80037580 A8C933C1 2300F717 80A1CB5D E58817B9 8F880888 C28801C9 80F24E0A .N·.è..ô.Ä..¿..Í]ùÂ¯.%Ä#è3è´.u.. 000180
20178987 F6FC69E9 C0330009 8A087217 871E3806 5E880CEC 83EC8855 00C301C9 è.û.U.š.š..^.;.ñ.r.¤..3äÕi▪-.¿. 0001A0
468EFA5E 8C667480 178987F6 00001588 9A5016F4 46805141 415151C9 33531274 t.S3èQQAAQ.F¶.P.....~.¿..tf.^ª.F 0001C0
75AEF20A 8049E30C 4E88F866 89F288FA 885657FC FC4689FE 4689C033 0856C50A .éV.3á.F±.F▪▪WV.ª.·.f½.N.DI¯.·Ôu 0001E0
```

Dump of file SATURN:[PCCOMMON.DUMP.DLL]UVMAPS.TMP;1 on 18-APR-1990 10:53:46.68
File ID (961,2,0)   End of file block 37 / Allocated 40

Virtual block number 19 (00000013), 512 (0200) bytes

F4E2AA1A 74FB3800 740A3CAC 0C4E8807 16FA88D4 8BE22800 808ADC88 02EC833B ;.š..Éα..+ã.å.ª...N.¯<.t.;«t.˙ã¶ 000000
5E8E5F5E E1E80014 E8E2EBFC 46FF0AB0 AA001FE8 0375F83B 0080009A E9002BE8 ò+.Õ..¯.;«u.Ò..¯¯..f•Šãò..ŠÃ^_.^ 000020
521E5306 5E8B1FE3 CA2BCF8B 1F061E51 53501363 18EC9AFF FCB87AEB 0093E9FA ªõ..Šz|=..š.c.PSQ....ü+ðD..^.Š.R 000040
C3FA8B58 5B591F07 740B08FE 5E01F45E 8B1175C0 0B000012 0C9A5016 F4468D51 Q.F¶.P......åu..^¶.^±.Ût..Y[X.ªú 000060
26EBF900 208A03EB 001CBA08 7500098A 00013D00 74006D3D 1874C00B 08C4831F ..ó..åt.=m.t.=..α..u.α..Š.α .ªŠ& 000080
06EBF9C0 33001CBA 0EEBF803 751A3F80 085E880A 5E8E0E74 4017B987 F6FE5E8E .^±-.¿.∂t..^..^..?.u.½Š.α..3åªŠ. 0000A0
C18B0475 C90B0C4E 8BFB4DE9 CB5DE58B 0472FA5E 8E5F5EF8 6688FC46 2BFE468B .F±+F•.f½^_.^ªr..[]üÕM«.N..èu..è 0000C0
00740060 3D1774C0 081F071E 000016A7 9A5016F4 46805152 1E530856 C51EEEEB ŠŸ.éV.S.RQ¯F¶.P.Ĭ.......ât.=m.t. 0000E0
0A744017 B987F6B7 75C00BF4 468BC2E8 00208AC7 E8001C8A CC750009 8A000130 =..α..uäα..Šúα .Šô.F¶.åuñ-.¿.∂t. 000100
80260574 C308C08C 065EC4EC 885500A3 E8C03300 1CBAA6EB 02751A3F 80260A88 .Ö&.?.u.Š[α..3åŠÈ.U.šó^..ã.ût.&. 000120
25E80875 0019063E 831E73FF F1300646 88575602 EC83EC8B 55CB5DE5 8B01FE4F O±..[]ùU.š.š.VW.F.=þ.s..>ø..u.ÒX 000140
02C48316 8C1C289A 0676FF0B 750078E8 05740018 E8157500 82E81906 A3127400 .t.Èø.Ò..u.Ò..t.Òx.u..v..(....ó. 000160
0E4F8D50 501EC033 FE5E89FE E3834306 5E880776 065E3900 F0BBC85D E5885E5F _^.[]ùEÞ.9^.v..^.C.D±.^±3â.PP.O. 000180
0A8E0574 D208190A A3190816 87C28B38 74FFFA83 08C48317 8B1E2C9A 5002B051 α¯.P.,.£,.ó..ª.t8.ô..Å.ÉÖ..Øt..Ö 0001A0
0AA30147 8D0002A3 0000A300 0AB80C47 89484800 08A3C033 D88EFE5E 880008A3 È...^±.Ã3âÈ..HH.G.¡..È..È...G.È. 0001C0
8EC18CD2 080436E8 19DA1E8E DB33064E 88C08ED8 8CC31FD8 8C0006A3 00000500 ....È...Ä.û.Ä.ó.N.3Ü..Ö.Ò6..Ø.ē. 0001E0

Dump of file SATURN:[PCCOMMON.DUMP.DLL]UVMAPS.TMP;1 on 18-APR-1990 10:53:46.68
File ID (961,2,0)   End of file block 37 / Allocated 40

Virtual block number 20 (00000014), 512 (0200) bytes

B35756EC 8B5500CB 50FA8891 4901F7AE F2FFFFB9 C033067E C40788EC 8B55C3D9 )ùU.š.•ó~.3ã¿..·Û%Ĭ[..ª]ù.U.ŠVWª 000000
EB0001B8 05744017 B987F60C 7C00FB83 117D1787 1E38065E 8BEC8B55 0024E900 .Õ$.U.š.^.;.ñ.)..«.|.-.¿.∂t.¡..Š 000020
F9831374 C00A93FC 071E570A 7EC51E08 56880646 880E4E8B 00CB5DE5 8BC03302 .3â.[]ù..N..F..V..é-.W..•..ât..ª 000040
92F1F793 F1F70274 C00BD233 92F788DA F7000283 DBF7AA2D B00A7902 080E750A .u..Øy.¯-˙%Ü.Ø.%Ö.¥.3Ø.ât.¼þ.¼þ. 000060
72C73801 4480FF44 880586AC 4F0588E2 75C308C2 88AA2704 0276393C 30040387 .Æ.0<9v..'˙.ô.ûuã..O¯...D..D.;úr 000080
A1CB5152 E3880572 17A41E38 08720828 DC885A59 00CB5DE5 885E5F1F 580A8CF2 ·.ÖX._^.[]ù.YZ.É+Är.;.Ê.r..DRQùÀ 0000A0
1653C48B 50B717B9 A7800488 520002B8 17A02EFF 5152F824 E9C03305 754017A0 ..∂u.Ŝãö$¼RQ....£..R.å.Ĭ¿.ñP.óS. 0000C0
4B17B98F 08088106 75000230 07740001 3D40B112 7558C008 000014D1 9A521650 P.R.Ĭ....ãXu.Ÿ∂=..t.±..u.Ÿ...¿.K 0000E0
C28C19EE 06C401AE E9037319 E61EFFD8 33C28C19 EA06C41E E319E80E 885AD479 yåZ..Ò.D.á.õ..ó3Ü..Ĭ.s.ÒÜ.ó.Ÿ..ô 000100
7419E430 19E08800 73E819F2 BF19F2BE 007CE819 F28F19F2 BE19E61E FF0003B8 £....Ĭ./·.¢·.Ò|./·.¢·.Òs.¡Å.=ô.t 000120
6A006A03 6A0051E8 19E4BF19 E0BED88E 134888C3 0000FFFF 9A198068 0E016A08 .j..h.......ù¡K..Ã/Å.¢õ.ÒQ.j.j.j 000140
EC885503 E80031E8 19E4BF19 E0BE003A E81D1ABF 1D1ABEEC 88550000 19889A00 ......U.š/..¢..Ò:./Å.¢õ.Ò1.Š.U.š 000160
0E880000 FFFF9A50 06468A50 C033001A E819F2BF 19F2BE00 23E819F2 BF19F28E /·.¢·.Ò#./·.¢·.Ò..3âP.F.P....... 000180
00C3EEEB 1DFFF274 02450805 8B04EF83 0E73F738 C319E61E FF00028B 07E319E8 Ò.D.£....Ĭ.û;%s..ÿ....E.t·..ŠŸû. 0001A0
89F25689 F04689C0 28017616 8800F0E9 03750176 3639FF2B F6285657 000014C8 à...WV+-+.96v.u.Òþ...v.+â.Fþ.V·. 0001C0
FE814619 74C0080A C4831A74 1EE29A05 80681EF6 76FFF876 FF0C6AF8 5689F646 F-.V½j..v½.v-.h...ã.t..ó..ât.F.± 0001E0

Dump of file SATURN:[PCCOMMON.DUMP.DLL]UVMAPS.TMP;1 on 18-APR-1990 10:53:46.68
File ID (961,2,0)   End of file block 37 / Allocated 40

Virtual block number 21 (00000015), 512 (0200) bytes

003F8026 F646FFF6 5EC40CEB 47EA7500 3F8026F6 46FFF65E C4008CE9 03767FFF ..v.Õ¥.ó^-.F-&.?.uõGŠ.ó^-.F-&.?. 000000
56EE5689 EC468904 C4831A83 1D049A04 6A500145 8D8A7500 3F8026F6 5E88F475 u¶.^-&.?.uα.E.Pj..å....ó..Fš.VŸV 000020
EC468B66 74C208FC 46886074 EE460BEC 468BFE56 89FC4689 02C4831A 8917879A ...¿..ó..F•.V±.Fš.FŸtm.F•.ôtf.Fš 000040
C00B0AC4 8317E71E E29A0580 681EF076 FFF276FF 0C6A19C1 1689198F A3EE568B .VŸÈ¢...ê.j..v·.vÞ.h...ã.Ó..ó..â 000060
C4078A26 F046FFF0 5EC404EC 46830257 89260789 26FE568B FC4688EC 5EC42C74 t,ó^š.F•.V±&..&.W..Fš.ó^Þ.FÞ&..ó 000080
3F8026F0 5EC4F475 003F8026 F046FFF0 5EC4E8EB 0E74C00A 078826FC 46FFFC5E ^•.F•&...ât.ŠÒó^Þ.FÞ&.?.u¶ó^Þ&.? 0000A0
1CEBF62B FC5E8CFA 4689058E 88560000 06C8F620 E90002B8 90CBC95F 5EA77500 .uĬ^_èù.¡..Õ -à...V|...Fª.^•+-Š. 0000C0
8B177CA1 0CFA4683 46017440 04C4831A 3405389A 53060E74 830A47F6 26FA5EC4 ó^ª&¯G..t..S.8.4..ó.∂t.F.Fª.À|.. 0000E0
000CB999 058E2D04 46881784 06FF0000 04C890CB C95EC688 0876FA46 39177E16 .~.9FªvÄ.ó^èù.à........F.~...¿.. 000100
5EC402C4 831B2F17 879A0200 68FE5E8C FC468911 8205E0D1 C103E001 C88BF9F7 ¼ª.àĭÁ.èĭÁ....F•.^±h...../..ó.ó^ 000120
5EC49021 EB020002 47C726FC 5EC4080A 4F802611 74D00808 57892606 47892604 .&.G.&.W..Åt.&.O..ó^•&úG...Šĭ.ó^ 000140
5EC40001 0247C726 FC5EC408 57892606 47892640 FE568BFC 4688040A 4F802604 .&.O...F•.V±∂&.G.&.W.ó^•&úG...ó^ 000160
1E38065E 88EC8855 C3C90000 0447C726 02578926 07892608 57882606 47882604 .&.G.&.W.&..&.W.&úG...èùU.š.^.;. 000180
51160C76 FF0876FF 0A76FF53 CC8804EC 83F684E9 F678E9C0 330009BA 087217B7 ñ.r.α..3âÕx-Õ.-.š..âS.v..v..v..Q 0001A0
0474DB08 065E88EC 885500CB 5DE588FD 17B9A780 91E175C0 855A5900 0016109A .....YZ.âuÃ..Ĭ¿.».[]ù.U.š.^..Ût. 0001C0
33057501 76E80005 88071E29 75003F83 19CC8857 56EC8855 CB5DE58B 01FE4F80 .O±..[]ùU.šVWEä..?.u)..¡..Òv.u.3 0001E0

Dump of file SATURN:[PCCOMMON.DUMP.DLL]UVMAPS.TMP;1 on 18-APR-1990 10:53:46.68
File ID (961,2,0) End of file block 37 / Allocated 40

Virtual block number 22 (00000016), 512 (0200) bytes

```
4E8B19D2 3689FFFE FE44C704 C6830001 04C79619 CEA319CC A3FE2440 24EB99C0 â.Ş$a$±Êä.Èö..ú....ó.ÚD±±..6Ø..N 000000
FC02778B F273EEF9 83FEE180 FA744100 D0E9CB5D E58B5E5F 0009E8C0 8ED08C06 ..Å.àÒ.._^.[]ùÕÅ.At'.Ã±.'Ÿs·.w.• 000020
EBFE4489 F78B0002 05C20335 7401ABAD F003D08B 1573C138 48437401 ABFE8BAD Ù.±´.tCH;ès..Å.ÞÙ´.tS.ö....%.D±$ 000040
74D13B19 8EB9DA8C C68BFE4C FEF90305 E8058948 C12BFE4C 89F9030C 74FE8BE6 |.±t..'.L±+èH..Š..'±L±.6.Ö¿..;|t 000060
FE8BF274 01A8ADF0 03FE8B25 74FFFE30 0219DE06 C626C302 7F89190A 1E8C2605 .&..Ö....ù&6.ß..=±.t%.±.ÞÙ´.t·.± 000080
74C00B08 478BE6EB FE4489F7 8B000205 C203E274 01A8ADF0 03D08B8C 73C13848 H;ès¥.Å.ÞÙ´.tã.ô....%.D±Š|.G..ät 0000A0
778B8BEB 37881906 1E8E2605 74C73B1C B8BFD88C 127419DE 0EFE2615 E8D88E04 ..ÅŠ.&±.ß.t..Ä«É.;út.&..ø..7ŠE.w 0000C0
EB4E4E96 0574001D E8FE4DFE 0D74005F E8984040 01240074 C63B006B E8C03306 .3àÒk.;6t.$.@@.Ò_.t.±M±Ò..t..NN$ 0000E0
2B037401 A8FE458B 51C399C0 33024789 078B190A A3260474 C13B100F B9D88C98 ..Ä¿..;ët.&ÈÖ....G.3â.ÚQ.E±´.t.+ 000100
C22302F7 0072C203 1572C603 C188F575 EAD10476 190C1638 267FFF8A 414149C8 à|AAn..&;.É.v.ïõu%.è.ôr..ôr.%Ø#ô 000120
C7F203F0 8BFE8B57 1874001D E85152C3 59C033E5 75EAD1D2 F7087500 0CE8C62B +6Ò..u.%Øïõu|3äYÚRQÒ..t.W.±.Þ.·ú 000140
06500001 88505252 1ED23350 53C35A59 58FE5589 4AD72BD6 88067789 FFFEFE44 D±±..w..ø+aJ.U±XYZÚSP3Ø.RRP¡..P. 000160
006A0876 FF006A56 00000AC8 C3D20B02 74585A1F FFFA8308 C4831B79 1E2C9A1F ..,.y..á..'..Z[t..ØÙà...Vj..v.j. 000180
879A56F8 768B902F EB99C028 0674FFFF C2F7FA56 89F84689 1E010232 9A0676FF .v..2....F½.V'%ô..t.+â.Š/..v½V.. 0001A0
EB08C483 10C401EA 9A50FE76 FF006A56 1274D008 FE5689FC 468902C4 831E1A17 ....á..F=.V±.Åt.Vj..v±P.õ.á..á.$ 0001C0
46880856 8B017EBF 3875000A 7E830657 56EC8B55 90C8C95E FE568BFC 46889007 ...F•.V±^èù.U.šVW..~..u8«~..V..F 0001E0
```

Dump of file SATURN:[PCCOMMON.DUMP.DLL]UVMAPS.TMP;1 on 18-APR-1990 10:53:46.68
File ID (961,2,0) End of file block 37 / Allocated 40

Virtual block number 23 (00000017), 512 (0200) bytes

```
003EE856 0E468902 448B0074 F7381174 48057E36 884CEB27 720057E8 07754806 .Hu.ÒW.r'ŠL.6~.Ht.;%t..D..F.VÒ>. 000000
9A50C033 501652C4 8B5021EB 99FFFF88 06750208 0473057E FE8104C6 8334735E ^s4.6..±~.s..Øu.|...Š|P.6R.P3âP. 000020
4E8BCB5D E58B5E5F 07C03303 8B057E36 89025C89 1489E675 C085F95B 0000FFFF ....['.âu|...\..6~..Æ3â._^.[]ù.N 000040
F73BC18E D38B2672 1C030A88 2CEBF9F2 75057EFE 8104C683 0C74024C 39F7880E ..%9L.t..6..±~.u·'Š,.Ö..r&.Æ.é;% 000060
D18B0487 92017816 890475F7 3BDE75C0 850000FF FF9A5153 13730178 1E390675 u.9.x.s.SQ......âuß;%u...x.....| 000080
76C5FE8B CB03D9F7 AEF2C033 F78B067E C4D98B27 E30E4E8B 1E5657EC 8B5500C3 û.U.$WV..N.D'.]6~..%3â·Ú%).û.±év 0000A0
030012CB 5DE58B5F 5E1FC188 D1F74949 04740477 FF453A26 C933FF44 8AA6F30A .µ[.D.3è&:E.w.t.II%Ì.è.^_.[]ù... 0000C0
05000000 081D4400 02000000 061DE600 02000700 0119A201 03000500 0119DA01 .Ö.......Å.......|.......D...... 0000E0
03003A00 011C0101 03002600 011ECB01 03002200 011E8001 03008800 01021D01 .............."...ù...&.......:.. 000100
03011A00 0714B802 03004400 01157401 03011200 07148F02 03003C00 0110EC01 .Š...<...........t...D...|...... 000120
03005800 01111801 03012300 07173002 03004D00 01192401 03004B00 0115A801 .¨...K...$...M...0...#.......[.. 000140
54206E75 52205340 00000000 00000000 00012C00 07155102 03005C00 01110501 .....\...Q...,.........MS Run-T 000160
38383931 20296328 20746867 69727970 6F432020 20797261 7262694C 20656069 ime Library · Copyright (c) 1988 000180
20200077 00676F6C 2E70616D 76750011 70726F43 2074666F 736F7263 694D202C , Microsoft Corp..uvmap.log.w.   0001A0
20000A20 0A207330 32202520 3A4E4F49 54434553 20202020 20202020 20202020           SECTION: %-20s . ..  0001C0
6560614E 20000A20 50204120 4D202020 57204520 49205620 20522045 20532055 U S E R  V I E W  M A P .. Name 0001E0
```

Dump of file SATURN:[PCCOMMON.DUMP.DLL]UVMAPS.TMP;1 on 18-APR-1990 10:53:46.68
File ID (961,2,0) End of file block 37 / Allocated 40

Virtual block number 24 (00000018), 512 (0200) bytes

```
000A2073 36342D25 203A656D 614E206E 67697365 4420000A 20733633 2D25203A : %-36s .. Design Name: %-46s .. 000000
614E2074 63656A62 4F20000A 20733031 2D25203A 65707954 206E6769 73654420  Design Type: %-10s .. Object Na 000020
20733031 2D25203A 65707954 20746365 6A624F20 000A2073 36342D25 203A6560 me: %-46s .. Object Type: %-10s  000040
5F5F5F5F 5F5F5F5F 5F5F5F5F 5F5F5F5F 5F5F5F5F 5F5F5F5F 5F5F5F5F 5F5F000A ..______________________________ 000060
200A2000 0A205F5F 5F5F5F5F 5F5F5F5F 5F5F5F5F 5F5F5F5F 5F5F5F5F 5F5F5F5F __________________________ .. . 000080
00010001 00000000 0000FFFF 00010000 FFFF0000 0000FFFF 00010000 FFFF000A ................................ 0000A0
2D2B0029 6C6C756E 2800296C 6C756E28 00000000 00000000 005C005C 00000000 ....\.\.........(null).(null).+- 0000C0
00000000 00000000 00000000 000019F2 1D201980 1D201D20 00000000 00002320 #...... . .§. .'................ 0000E0
00000000 00000000 00000000 00000000 00000000 00000000 00000000 00000000 ................................ 000100
00000000 00000000 00000000 00000000 00000000 00000000 00000000 00000000 ................................ 000120
00000000 00000000 00000000 00000000 00000000 00000000 00000000 00000000 ................................ 000140
00000000 00000000 00000000 00000000 00000000 00000000 00000000 00000000 ................................ 000160
00000000 00000000 00000000 00000000 00000000 00000000 00000000 00000000 ................................ 000180
00000000 00000000 00000000 00000000 00000000 00000000 00000000 00000000 ................................ 0001A0
00000000 00000000 00000000 00000000 00000000 00000000 00000000 00000000 ................................ 0001C0
00000000 00000000 00000000 00000000 00000000 00000000 00000000 00000000 ................................ 0001E0
```

```
Dump of file SATURN:[PCCOMMON.DUMP.DLL]UVMAPS.TMP;1 on 18-APR-1990 10:53:46.68
File ID (961,2,0)   End of file block 37 / Allocated 40

Virtual block number 25 (00000019), 512 (0200) bytes

 00000000 00000000 00000000 00000000 00000000 00000000 00000000 00000000 ................................ 000000
 00000000 00000000 00000000 00000000 00000000 00000000 00000000 00000000 ................................ 000020
 00000000 00000000 00000000 00000000 00000000 00000000 00000000 00000000 ................................ 000040
 00000000 00000000 00000000 00000000 00000000 00000000 00000000 00000000 ................................ 000060
 00000000 00000000 00000000 00000000 00000000 00000000 00000000 00000000 ................................ 000080
 00000000 00000000 00000000 00000000 00000000 00000000 00000000 00000000 ................................ 0000A0
 00000000 00000000 00000000 00000000 00000000 00000000 00000000 00000000 ................................ 0000C0
 00000000 00000000 00000000 00000000 00000000 00000000 00000000 00000000 ................................ 0000E0
 00000000 00000000 00000000 00000000 00000000 00000000 00000000 00000000 ................................ 000100
 00000000 00000000 00000000 00000000 00000000 00000000 00000000 00000000 ................................ 000120
 00000000 00000000 00000000 00000000 00000000 00000000 00000000 00000000 ................................ 000140
 00000000 00000000 00000000 00000000 00000000 00000000 00000000 00000000 ................................ 000160
 00000000 00000000 00000000 00000000 00000000 00000000 00000000 00000000 ................................ 000180
 00000000 00000000 00000000 00000000 00000000 00000000 00000000 00000000 ................................ 0001A0
 00000000 00000000 00000000 00000000 00000000 00000000 00000000 00000000 ................................ 0001C0
 00000000 00000000 00000000 00000000 00000000 00000000 00000000 00000000 ................................ 0001E0

Dump of file SATURN:[PCCOMMON.DUMP.DLL]UVMAPS.TMP;1 on 18-APR-1990 10:53:46.68
File ID (961,2,0)   End of file block 37 / Allocated 40

Virtual block number 26 (0000001A), 512 (0200) bytes

 00000000 00000000 00000000 00000000 00000000 00000000 00000000 00000000 ................................ 000000
 00000000 00000000 00000000 00000000 00000000 00000000 00000000 00000000 ................................ 000020
 00000000 00000000 00000000 00000000 00000000 00000000 00000000 00000000 ................................ 000040
 00000000 00000000 00000000 00000000 00000000 00000000 00000000 00000000 ................................ 000060
 00000000 00000000 00000000 00000000 00000000 00000000 00000000 00000000 ................................ 000080
 00000000 00000000 00000000 00000000 00000000 00000000 00000000 00000000 ................................ 0000A0
 00000000 00000000 00000000 00000000 00000000 00000000 00000000 00000000 ................................ 0000C0
 0000003D 4F464E49 5F454C49 465F435F 017E0000 00000000 00000000 00000000 ..............-._C_FILE_INFO=... 0000E0
 00000000 00000000 00000102 00000000 00000000 00000001 FFFF0000 00000596 ................................ 000100
 00000000 00000000 00000000 00000000 00000000 00000000 00000000 00000202 ................................ 000120
 00000000 00000000 00000000 00000000 00000000 00000000 00000000 00000000 ................................ 000140
 00000000 00000000 00000000 00000000 00000000 00000000 00000000 00000000 ................................ 000160
 00000000 00000000 00000000 00000000 00000000 00000000 00000000 00000000 ................................ 000180
 00000000 00000000 00000000 00000000 00000000 00000000 00000000 00000000 ................................ 0001A0
 00000000 00000000 00000000 00000000 00000000 00000000 00000000 00000000 ................................ 0001C0
 00000000 00000000 00000000 00000000 00000000 00000000 00000000 00000000 ................................ 0001E0

Dump of file SATURN:[PCCOMMON.DUMP.DLL]UVMAPS.TMP;1 on 18-APR-1990 10:53:46.68
File ID (961,2,0)   End of file block 37 / Allocated 40

Virtual block number 27 (0000001B), 512 (0200) bytes

 00000000 00000000 00000000 00000000 00000000 00000000 00000000 00000000 ................................ 000000
 00000000 00000000 00000000 00000000 00000000 00000000 00000000 00000000 ................................ 000020
 00000000 00000000 00000000 00000000 00000000 00000000 00000000 00000000 ................................ 000040
 00000000 00000000 00000000 00000000 00000000 00000000 00000000 00000000 ................................ 000060
 00000000 00000000 00000000 00000000 00000000 00000000 00000000 00000000 ................................ 000080
 00000000 00000000 00000000 00000000 00000000 00000000 00000000 00000000 ................................ 0000A0
 00000000 00000000 00000000 00000000 00000000 00000000 00000000 00000000 ................................ 0000C0
 00000000 00000000 00000000 00000000 00000000 00000000 00000000 00000000 ................................ 0000E0
 00000000 00000000 00000000 00000000 00000000 00000000 00000000 00000000 ................................ 000100
 00000000 00000000 00000000 00000000 00000000 00000000 00000000 00000000 ................................ 000120
 00000000 00000000 00000000 00000000 00000000 00000000 00000000 00000000 ................................ 000140
 00000000 00000000 00000000 00000000 00000000 00000000 00000000 00000000 ................................ 000160
 00000000 00000000 00000000 00000000 00000000 00000000 00000000 00000000 ................................ 000180
 00000000 00000000 00000000 00000000 00000000 00000000 00000000 00000000 ................................ 0001A0
 00000000 00000000 00000000 00000000 00000000 00000000 00000000 00000000 ................................ 0001C0
 00000000 00000000 00000000 00000000 00000000 00000000 00000000 00000000 ................................ 0001E0
```

```
Dump of file SATURN:[PCCOMMON.DUMP.DLL]UVMAPS.TMP;1 on 18-APR-1990 10:53:46.68
File ID (961,2,0)   End of file block 37 / Allocated 40

Virtual block number 28 (0000001C), 512 (0200) bytes

00000000 00000000 00000000 00000000 00000000 00000000 00000000 00000000 ................................ 000000
00000000 00000000 00000000 00000000 00000000 00000000 00000000 00000000 ................................ 000020
00000000 00000000 00000000 00000000 00000000 00000000 00000000 00000000 ................................ 000040
00000000 00000000 00000000 00000000 00000000 00000000 00000000 00000000 ................................ 000060
00000000 00000000 00000000 00000000 00000000 00000000 00000000 00000000 ................................ 000080
00000000 00000000 00000000 00000000 00000000 00000000 00000000 00000000 ................................ 0000A0
00000000 00000000 00000000 00000000 00000000 00000000 00000000 00000000 ................................ 0000C0
00000000 00000000 00000000 00000000 00000000 00000000 00000000 00000000 ................................ 0000E0
00000000 00000000 00000000 00000000 00000000 00000000 00000000 00000000 ................................ 000100
00000000 00000000 00000000 00000000 00000000 00000000 00000000 00000000 ................................ 000120
00000000 00000000 00000000 00000000 00000000 00000000 00000000 00000000 ................................ 000140
00000000 00000000 00000000 00000000 00000000 00000000 00000000 00000000 ................................ 000160
00000000 00000000 00000000 00000000 00000000 00000000 00000000 00000000 ................................ 000180
00000000 00000000 00000000 00000000 00000000 00000000 00000000 00000000 ................................ 0001A0
00000000 00000000 00000000 00000000 00000000 00000000 00000000 00000000 ................................ 0001C0
00000000 00000000 00000000 00000000 00000000 00000000 00000000 00000000 ................................ 0001E0

Dump of file SATURN:[PCCOMMON.DUMP.DLL]UVMAPS.TMP;1 on 18-APR-1990 10:53:46.68
File ID (961,2,0)   End of file block 37 / Allocated 40

Virtual block number 29 (0000001D), 512 (0200) bytes

00000000 00000000 00000000 00000000 00000000 00000000 00000000 00000000 ................................ 000000
00000000 00000000 00000000 00000000 00000000 00000000 00000000 00000000 ................................ 000020
00000000 00000000 00000000 00000000 00000000 00000000 00000000 00000000 ................................ 000040
00000000 00000000 00000000 00000000 00000000 00000000 00000000 00000000 ................................ 000060
00000000 00000000 00000000 00000000 00000000 00000000 00000000 00000000 ................................ 000080
00000000 00000000 00000000 00000000 00000000 00000000 00000000 00000000 ................................ 0000A0
00000000 00000000 00000000 00000000 00000000 00000000 00000000 00000000 ................................ 0000C0
00000000 00000000 00000000 00000000 00000000 00000000 00000000 00000000 ................................ 0000E0
00000000 00000000 00000000 00000000 00000000 00000000 00000000 00000000 ................................ 000100
00000000 00000000 00000000 00000000 00000000 00000000 00000000 00000000 ................................ 000120
00000000 00000000 00000000 00000000 00000000 00000000 00000000 00000000 ................................ 000140
00000000 00000000 00000000 00000000 00000000 00000000 00000000 00000000 ................................ 000160
00000000 00000000 00000000 00000000 00000000 00000000 00000000 00000000 ................................ 000180
00000000 00000000 00000000 00000000 00000000 00000000 00000000 00000000 ................................ 0001A0
00000000 00000000 00000000 00000000 00000000 00000000 00000000 00000000 ................................ 0001C0
00000000 00000000 00000000 00000000 00000000 00000000 00000000 00000000 ................................ 0001E0

Dump of file SATURN:[PCCOMMON.DUMP.DLL]UVMAPS.TMP;1 on 18-APR-1990 10:53:46.68
File ID (961,2,0)   End of file block 37 / Allocated 40

Virtual block number 30 (0000001E), 512 (0200) bytes

00000000 00000000 00000000 00000000 00000000 00000000 00000000 00000000 ................................ 000000
00000000 00000000 00000000 00000000 00000000 00000000 00000000 00000000 ................................ 000020
00000000 00000000 00000000 00000000 00000000 00000000 00000000 00000000 ................................ 000040
00000000 00000000 00000000 00000000 00000000 00000000 00000000 00000000 ................................ 000060
00000000 00000000 00000000 00000000 00000000 00000000 00000000 00000000 ................................ 000080
00000000 00000000 00000000 00000000 00000000 00000000 00000000 00000000 ................................ 0000A0
00000000 00000000 00000000 00000000 00000000 00000000 00000000 00000000 ................................ 0000C0
00000000 00000000 00000000 00000000 00000000 00000000 00000000 00000000 ................................ 0000E0
00000000 00000000 00000000 00000000 00000000 00000000 00000000 00000000 ................................ 000100
00000000 00000000 00000000 00000000 00000000 00000000 00000000 00000000 ................................ 000120
00000000 00000000 00000000 00000000 00000000 00000000 00000000 00000000 ................................ 000140
00000000 00000000 00000000 00000000 00000000 00000000 00000000 00000000 ................................ 000160
00000000 00000000 00000000 00000000 00000000 00000000 00000000 00000000 ................................ 000180
00000000 00000000 00000000 00000000 00000000 00000000 00000000 00000000 ................................ 0001A0
00000000 00000000 00000000 00000000 00000000 00000000 00000000 00000000 ................................ 0001C0
00000000 00000000 00000000 00000000 00000000 00000000 00000000 00000000 ................................ 0001E0
```

```
Dump of file SATURN:[PCCOMMON.DUMP.DLL]UVMAPS.TMP;1 on 18-APR-1990 10:53:46.68
File ID (961,2,0)   End of file block 37 / Allocated 40

Virtual block number 31 (0000001F), 512 (0200) bytes

00000000 00000000 00000000 00000000 00000000 00000000 00000000 00000000 ................................ 000000
00000000 00000000 00000000 00000000 00000000 00000000 00000000 00000000 ................................ 000020
00000000 00000000 00000000 00000000 00000000 00000000 00000000 00000000 ................................ 000040
00000000 00000000 00000000 00000000 00000000 00000000 00000000 00000000 ................................ 000060
00000000 00000000 00000000 00000000 00000000 00000000 00000000 00000000 ................................ 000080
00000000 00000000 00000000 00000000 00000000 00000000 00000000 00000000 ................................ 0000A0
00000000 00000000 00000000 00000000 00000000 00000000 00000000 00000000 ................................ 0000C0
00000000 00000000 00000000 00000000 00000000 00000000 00000000 00000000 ................................ 0000E0
00000000 00000000 00000000 00000000 00000000 00000000 00000000 00000000 ................................ 000100
00000000 00000000 00000000 00000000 00000000 00000000 00000000 00000000 ................................ 000120
00000000 00000000 00000000 00000000 00000000 00000000 00000000 00000000 ................................ 000140
00000000 00000000 00000000 00000000 00000000 00000000 00000000 00000000 ................................ 000160
00000000 00000000 00000000 00000000 00000000 00000000 00000000 00000000 ................................ 000180
00000000 00000000 00000000 00000000 00000000 00000000 00000000 00000000 ................................ 0001A0
00000000 00000000 00000000 00000000 00000000 00000000 00000000 00000000 ................................ 0001C0
00000000 00000000 00000000 00000000 00000000 00000000 00000000 00000000 ................................ 0001E0

Dump of file SATURN:[PCCOMMON.DUMP.DLL]UVMAPS.TMP;1 on 18-APR-1990 10:53:46.68
File ID (961,2,0)   End of file block 37 / Allocated 40

Virtual block number 32 (00000020), 512 (0200) bytes

00000000 00000000 00000000 00000000 00000000 00000000 00000000 00000000 ................................ 000000
00000000 00000000 00000000 00000000 00000000 00000000 00000000 00000000 ................................ 000020
00000000 00000000 00000000 00000000 00000000 00000000 00000000 00000000 ................................ 000040
00000000 00000000 00000000 00000000 00000000 00000000 00000000 00000000 ................................ 000060
00000000 00000000 00000000 00000000 00000000 00000000 00000000 00000000 ................................ 000080
00000000 00000000 00000000 00000000 00000000 00000000 00000000 00000000 ................................ 0000A0
00000000 00000000 00000200 00010000 00000000 00000000 00000000 00000000 ................................ 0000C0
00000000 00000000 00000000 00000000 00000000 00000000 00000000 00000000 ................................ 0000E0
00000000 00000000 00000000 00000000 00000000 00000000 00000000 00000000 ................................ 000100
00000000 00000000 00000000 00000000 00000000 00000000 00000000 00000000 ................................ 000120
00000000 00000000 00000000 00000000 00000000 00000000 00000000 00000000 ................................ 000140
00000000 00000000 00000000 00000000 00000000 00000000 00000000 00000000 ................................ 000160
00000000 00000000 00000000 00000000 00000000 00000000 00000000 00000000 ................................ 000180
00000000 00000000 00000000 00000000 00000000 00000000 00000000 00000000 ................................ 0001A0
00000000 00000000 00000000 00000000 00000000 00000000 00000000 00000000 ................................ 0001C0
00000000 00000000 00000000 00000000 00000000 00000000 00000000 00000000 ................................ 0001E0

Dump of file SATURN:[PCCOMMON.DUMP.DLL]UVMAPS.TMP;1 on 18-APR-1990 10:53:46.68
File ID (961,2,0)   End of file block 37 / Allocated 40

Virtual block number 33 (00000021), 512 (0200) bytes

00000000 00000000 00000000 00000000 00000000 00000000 00000000 00000000 ................................ 000000
00000000 00000000 00000000 00000000 00000000 00000000 00000000 00000000 ................................ 000020
00000000 00000000 00000000 00000000 00000000 00000000 00000000 00000000 ................................ 000040
00000000 00000000 00000000 00000000 00000000 00000000 00000000 00000000 ................................ 000060
00000000 00000000 00000000 00000000 00000000 00000000 00000000 00000000 ................................ 000080
00000000 00000000 00000000 00000000 00000000 00000000 00000000 00000000 ................................ 0000A0
00000000 00000000 00000000 00000000 00000000 00000000 00000000 00000000 ................................ 0000C0
00000000 00000000 00000000 00000000 00000000 00000000 00000000 00000000 ................................ 0000E0
00000000 00000000 00000000 00000000 00000000 00000000 00000000 00000000 ................................ 000100
00000000 00000000 00000000 00000000 00000000 00000000 00000000 00000000 ................................ 000120
00000000 00000000 00000000 00000000 00000000 00000000 00000000 00000000 ................................ 000140
00000000 00000000 00000000 00000000 00000000 00000000 00000000 00000000 ................................ 000160
00000000 00000000 00000000 00000000 00000000 00000000 00000000 00000000 ................................ 000180
00000000 00000000 00000000 00000000 00000000 00000000 00000000 00000000 ................................ 0001A0
00000000 00000000 00000000 00000000 00000000 00000000 00000000 00000000 ................................ 0001C0
00000000 00000000 00000000 00000000 00000000 00000000 00000000 00000000 ................................ 0001E0
```

```
Dump of file SATURN:[PCCOMMON.DUMP.DLL]UVMAPS.TMP;1 on 18-APR-1990 10:53:46.68
File ID (961,2,0)   End of file block 37 / Allocated 40

Virtual block number 34 (00000022), 512 (0200) bytes

00000000 00000000 00000000 00000000 00000000 00000000 00000000 00000000 ................................ 000000
00000000 00000000 00000000 00000000 00000000 00000000 00000000 00000000 ................................ 000020
00000000 00000000 00000000 00000000 00000000 00000000 00000000 00000000 ................................ 000040
00000000 00000000 00000000 00000000 00000000 00000000 00000000 00000000 ................................ 000060
00000000 00000000 00000000 00000000 00000000 00000000 00000000 00000000 ................................ 000080
00000000 00000000 00000000 00000000 00000000 00000000 00000000 00000000 ................................ 0000A0
00000000 00000000 00000000 00000000 00000000 00000000 00000000 00000000 ................................ 0000C0
00000000 00000000 00000000 00000000 00000000 00000000 00000000 00000000 ................................ 0000E0
00000000 00000000 00000000 00000000 00000000 00000000 00000000 00000000 ................................ 000100
00000000 00000000 00000000 00000000 00000000 00000000 00000000 00000000 ................................ 000120
00000000 00000000 00000000 00000000 00000000 00000000 00000000 00000000 ................................ 000140
00000000 00000000 00000000 00000000 00000000 00000000 00000000 00000000 ................................ 000160
00000000 00000000 00000000 00000000 00000000 00000000 00000000 00000000 ................................ 000180
00000000 00000000 00000000 00000000 00000000 00000000 00000000 00000000 ................................ 0001A0
00000000 00000000 00000000 00000000 00000000 00000000 00000000 00000000 ................................ 0001C0
00000000 00000000 00000000 00000000 00000000 00000000 00000000 00000000 ................................ 0001E0

Dump of file SATURN:[PCCOMMON.DUMP.DLL]UVMAPS.TMP;1 on 18-APR-1990 10:53:46.68
File ID (961,2,0)   End of file block 37 / Allocated 40

Virtual block number 35 (00000023), 512 (0200) bytes

00000000 00000000 00000000 00000000 00000000 00000000 00000000 00000000 ................................ 000000
00000000 00000000 00000000 00000000 00000000 00000000 00000000 00000000 ................................ 000020
00000000 00000000 00000000 00000000 00000000 00000000 00000000 00000000 ................................ 000040
00000000 00000000 00000000 00000000 00000000 00000000 00000000 00000000 ................................ 000060
00000000 00000000 00000000 00000000 00000000 00000000 00000000 00000000 ................................ 000080
00000000 00000000 00000000 00000000 00000000 00000000 00000000 00000000 ................................ 0000A0
00000000 00000000 00000000 00000000 00000000 00000000 00000000 00000000 ................................ 0000C0
18081788 180819E2 18080000 00000000 01801176 00000000 00000000 00000000 ............v..........ã....... 0000E0
00000000 00000000 00000200 FFFFFFFF 01010000 00001794 18081790 1808178C ................................ 000100
00000000 00000000 00000000 00000000 00000000 81818101 00000001 00000000 ................................ 000120
00000000 00000000 00000000 00000000 00000000 00000000 00000000 00000000 ................................ 000140
00000000 00000000 00000000 00000000 00000000 00000000 00000000 00000000 ................................ 000160
00000000 00000000 00000000 00000000 00000000 00000000 00000000 00000000 ................................ 000180
00000000 00000000 00000000 00000000 00000000 00000000 00000000 00000000 ................................ 0001A0
00000000 00000000 00000000 00000000 00000000 00000000 00000000 00000000 ................................ 0001C0
00000000 00000000 00000000 00000000 00000000 00000000 00000000 00000000 ................................ 0001E0

Dump of file SATURN:[PCCOMMON.DUMP.DLL]UVMAPS.TMP;1 on 18-APR-1990 10:53:46.68
File ID (961,2,0)   End of file block 37 / Allocated 40

Virtual block number 36 (00000024), 512 (0200) bytes

00000000 00000000 00000000 00000000 00000000 00000000 00000000 00000000 ................................ 000000
0A0A0A0A 0A0A0A0A 0A0A0A0A 0A0A0A0A 0A0A0A0A 0A0A0A00 00000000 00000000 ................................ 000020
0A0A0A0A 0A0A0A0A 0A0A0A0A 0A0A0A0A 0A0A0A0A 0A0A0A0A 0A0A0A0A 0A0A0A0A ................................ 000040
0A0A0A0A 0A0A0A0A 0A0A0A0A 0A0A0A0A 0A0A0A0A 0A0A0A0A 0A0A0A0A 0A0A0A0A ................................ 000060
0A0A0A0A 0A0A0A0A 0A0A0A0A 0A0A0A0A 0A0A0A0A 0A0A0A0A 0A0A0A0A 0A0A0A0A ................................ 000080
0A0A0A0A 0A0A0A0A 0A0A0A0A 0A0A0A0A 0A0A0A0A 0A0A0A0A 0A0A0A0A 0A0A0A0A ................................ 0000A0
0A0A0A0A 0A0A0A0A 0A0A0A0A 0A0A0A0A 0A0A0A0A 0A0A0A0A 0A0A0A0A 0A0A0A0A ................................ 0000C0
0A0A0A0A 0A0A0A0A 0A0A0A0A 0A0A0A0A 0A0A0A0A 0A0A0A0A 0A0A0A0A 0A0A0A0A ................................ 0000E0
0A0A0A0A 0A0A0A0A 0A0A0A0A 0A0A0A0A 0A0A0A0A 0A0A0A0A 0A0A0A0A 0A0A0A0A ................................ 000100
00000000 00000000 00000000 00000000 00000000 0000000A 0A0A0A0A 0A0A0A0A ................................ 000120
00000000 00000000 00000000 FFFF1B0E 00002000 00000000 00000000 00000000 ............ ................... 000140
65766F20 68636174 7320200A 00303030 36520000 3E3E4753 4D4E3C3C FFFF0000 ....<<NMSG>>..R6000..- stack ove 000160
64697669 64207265 6765746E 6920200A 00333030 36520003 000A0D77 6F6C6672 rflow.....R6003..- integer divid 000180
73206867 756F6E65 20746F6E 20200A00 38303036 52000800 0A0D3020 79622065 e by 0.....R6008..- not enough s 0001A0
20200A00 39303036 52000900 0A0D7374 6E656D75 67726120 726F6620 65636170 pace for arguments.....R6009..-  0001C0
746E656D 6E6F7269 766E6520 726F6620 65636170 73206867 756F6E65 20746F6E not enough space for environment 0001E0
```

```
Dump of file SATURN:[PCCOMMON.DUMP.DLL]UVMAPS.TMP;1 on 18-APR-1990 10:53:46.68
File ID (961,2,0)   End of file block 37 / Allocated 40

Virtual block number 37 (00000025), 512 (0200) bytes

30303652 00020020 726F7272 65206560 6974206E 757200FF 000A0000 FC000A00 ...*......run-time error ...R600 000000
0A006465 64616F6C 20746F6E 20746E69 6F702067 6E697461 6F6C6620 200A0032 2..- floating point not loaded.. 000020
02030000 0008177E 00020000 00070590 00020000 00061798 00020007 FFFFFF00 ......................~......... 000040
00000045 00040144 02030031 00040138 02030001 0006013E 0103007A 00060132 2...z...>.......8...1...D...E... 000060
00000000 00000000 00000000 00000000 00000000 00000000 00000000 00000000 ................................ 000080
00000000 00000000 00000000 00000000 00000000 00000000 00000000 00000000 ................................ 0000A0
00000000 00000000 00000000 00000000 00000000 00000000 00000000 00000000 ................................ 0000C0
00000000 00000000 00000000 00000000 00000000 00000000 00000000 00000000 ................................ 0000E0
00000000 00000000 00000000 00000000 00000000 00000000 00000000 00000000 ................................ 000100
00000000 00000000 00000000 00000000 00000000 00000000 00000000 00000000 ................................ 000120
00000000 00000000 00000000 00000000 00000000 00000000 00000000 00000000 ................................ 000140
00000000 00000000 00000000 00000000 00000000 00000000 00000000 00000000 ................................ 000160
00000000 00000000 00000000 00000000 00000000 00000000 00000000 00000000 ................................ 000180
00000000 00000000 00000000 00000000 00000000 00000000 00000000 00000000 ................................ 0001A0
00000000 00000000 00000000 00000000 00000000 00000000 00000000 00000000 ................................ 0001C0
00000000 00000000 00000000 00000000 00000000 00000000 00000000 00000000 ................................ 0001E0
```

Dump of file SATURN:[PCCOMMON.DUMP.DLL]RLOGVIEW.TMP;1 on 18-APR-1990 10:50:13.28
File ID (899,20,0)   End of file block 5 / Allocated 8

Virtual block number 1 (00000001), 512 (0200) bytes

```
00000000 00000040 00000000 00000088 0000FFFF 00000004 00000004 01945A4D MZ.............|.......@....... 000000
00000080 00000000 00000000 00000000 00000000 00000000 00000000 00000000 ................................ 000020
6F6E6E61 63206D61 72676F72 70207369 685421CD 4C01B821 CD09B400 0EBA1F0E ..o..Ç.ë¦¡.Lë!This program canno 000040
00000000 00000024 0A0D0D2E 65646F6D 20534F44 206E6920 6E757220 65622074 t be run in DOS mode....$....... 000060
00060007 00000000 00020000 00000400 00048001 94248C3F 0007010F 0505454E NE......?.$..................... 000080
00000000 00000000 00010002 00040000 00000196 00A90090 00800078 00400013 ..@.x.....`..................... 0000A0
00400F21 003A0076 00C00F00 00C00069 000F0F00 000F0067 04180F00 0418001B ........g.......¡.å...å.v.:.!.@. 0000C0
00C80004 0001000B 00E71E81 00E7007C 000A1E81 000A007B 00020E21 00000000 ....!...(...Ý...|.Ö.Ý.Ö.......å. 0000E0
07000100 0001474F 4C4F4445 52574549 564C4D44 0E000077 65697667 6F6C7208 .rlogview...DMLVIEWREDOLOG...... 000100
4540F4D 454D0353 4C4C4143 534F4408 4E49574D 50050000 4F003000 24001000 ...$.O.O...PMWIN.DOSCALLS.MEM.ME 000120
066C6C6C 6D64054F 4445524C 4D44076C 6D640354 5245564E 4F434552 4148534D MSHARECONVERT.dml.DMLREDO.dml(l. 000140
49544712 49544703 45564549 52544552 4C4C0A54 58454E4C 4C064441 45484C4C LLHEAD.LLNEXT.LLRETRIEVE.GTI.GTI 000160
20676F6C 206F6465 520F0000 00000301 01574F44 4E49574C 4F4F5459 52455551 QUERYTOOLWINDOW........Redo log  000180
FF0876FF D88EFFFF 881E5657 000008C8 00000000 00000000 00007265 77656976 viewer..........à...WV.¡...Ä.v.. 0001A0
77FF26F8 5EC4003E E9849288 0006E903 7500003D 0000FFFF 9A5016F8 46800676 v..F½.P.....=..u.Ö..¡..Ö>.á^½&.w 0001C0
26003806 8EFFFF68 FFFF68FC 76FFFE76 FF016A00 6A0000FF FF9A5016 FC468014 ..F=.P.....j.j..v±.v=h..h....8.& 0001E0
```

Dump of file SATURN:[PCCOMMON.DUMP.DLL]RLOGVIEW.TMP;1 on 18-APR-1990 10:50:13.28
File ID (899,20,0)   End of file block 5 / Allocated 8

Virtual block number 2 (00000002), 512 (0200) bytes

```
C80004CA C95F5E1F 0000E900 00880000 FFFF9A06 76FF0876 FF00C868 000036FF .6..hà..v..v......¦..Ö...^.èb..à 000000
FF04C483 008103A3 9A1076FF 1276FF01 45E90E46 88088E00 08881E56 57000004 ...WV.¡...Ä.F.ÖE..v..v..È.¯..á.. 000020
F19A1076 FF1276FF 0676FF08 76FF0000 FFFF9A06 76FF0876 FF006A10 76FF1276 v..v.j..v..v.......v..v..v../..þ 000040
FC468900 0001159A 006A1076 FF1276FF 00A4E90A 46880130 E99908C4 8300F501 .%..á..ÖO..F.ÖE..v..v.j.......F= 000060
FF1276FF FC76FFFE 76FF0014 E9037400 003D0000 01269AFC 76FFFE76 FFFE5689 .V±.v±.v=.&...=..t.Ö...v±.v=.v.. 000080
FF1276FF 000EE902 28000001 589A016A 1076FF12 76FF08C4 83014101 F19A1076 v..þ.A..á..v..v..j..X...+ÐÖ8..v.. 0000A0
E9037400 003D0000 FFFF9AFC 76FFFE76 FFFE5689 FC468900 00FFFF9A 006A1076 v.j.......F=.V±.v±.v=.....=..t.Ö 0000C0
FF009BE9 00008A00 00B808C4 83004601 F19A1076 FF1276FF FC76FFFE 76FF0014 ...v±.v=.v..v..þ.F..á.¦..¤..Ö... 0000E0
75000C3D FFE3E903 75000230 001BE900 89E9022B 0000FFFF 9A016A10 76FF1276 v..v.j.......+ÐÖ..Ö..=..u.ÖD.=É.u 000100
0010681E 1076FF12 76FF016A 006A005F E90000E9 FF90E903 7500E13D FF4CE903 .ÖL.=Ä.u.Ö..Ö..Ö_.j.j...v...v..h.. 000120
FF0E76FF 1076FF12 76FF0044 E900008A 00008800 00FFFF9A 006A006A 0000681E .h..j.j.......¦..¤..ÖD..v..v..v.. 000140
223DFEEC E9037500 2030001B E90027E9 0000FFFF 9A0676FF 0876FF0A 76FF0C76 v..v..v..v......Ö'.Ö..= .u.Öš±=" 000160
0ECAC95F 5E1F0000 E900008A 000088FF C5E9FEA3 E9037500 3B3DFFAC E9037500 .u.Ö¯.=;.u.Öè±Öé.¦..¤..Ö...^.èb. 000180
02589A50 16F8468D 0A76FF0C 76FF0000 B646C7D8 8E0077B8 1E565700 007AC800 .à±..WV.¦w..ÄúF....v..v..F½.P.[. 0001A0
5689FC46 8908578B 26064788 26F85EC4 017EE984 92880006 E9037500 00300000 ..=..u.Ö..¦..Ö~.á^½&.G.&.W..F=.V 0001C0
77FF26FC 5EC40000 03279A00 6A006A00 6A006A01 6E680002 680676FF 0876FFFE ±.v..v.hØ.hn.j.j.j.j..'...á^=&.w 0001E0
```

Dump of file SATURN:[PCCOMMON.DUMP.DLL]RLOGVIEW.TMP;1 on 18-APR-1990 10:50:13.28
File ID (899,20,0)   End of file block 5 / Allocated 8

Virtual block number 3 (00000003), 512 (0200) bytes

```
880000FF FF9A5052 005E05FE 5688FC46 88000002 9C9A5016 88468D1E 77FF2620 &.w..F..P......F=.V±.^.RP...... 000000
00EFE903 758E4608 8C46888E 56898C46 890000FF FF9A5052 005E05FE 5688FC46 F=.V±.^.RP......F..V..F..F.u.Öÿ. 000020
5EC400F0 E9849288 0006E903 7500003D 00000018 9A5016F4 46808C76 FF8E76FF .v..v..F¶.P.....=..u.Ö..¦..Öb.á^ 000040
0205F656 8BF4468B 08C48302 D600789A 50169046 8D006A64 6A007DE9 078826F4 ¶&..Ö).jdj..F..P.x.ø..á..F¶.V-.. 000060
50520002 05F6568B F4468864 6A001DE9 03750000 3D04C483 02F80036 9A505200 .RP.6.½..á.=..u.Ö..jd.F¶.V-...RP 000080
C483FFFF 00009A50 1690468D 0029681E 0011E90A C483030C 004E9A50 1690468D .F..P.N....á.Ö...h)..F..P......á 0000A0
0EE90011 E90000FF FF9A5016 90468DFF 6AFF6A01 61680002 680676FF 0876FF08 ..v..v.hØ.ha.j.j..F..P.....Ö..Ö. 0000C0
3D0000FF FF9A5052 005E05FE 5688FC46 8BFFEFE9 FF7BE903 7500013D 0008E900 .Ö..=..u.Ö(.Öÿ..F=.V±.^.RP.....= 0000E0
000CE98E 56898C46 89000002 789A5052 005E05FE 5688FC46 880019E9 03750000 ..u.Ö...F=.V±.^.RP.(....F..V.Ö.. 000100
6A006A00 6A016468 00026806 76FF0876 FFFF06E9 8E56898C 46890000 8A000088 ¡..¤...F..V.Ö...v...v.hØ.hd.j.j.j 000120
6AD88E01 F9881E56 5700001A C8C8C95F 5E1F0000 E9000088 00000246 9A016A00 .j..F...¦..Ö...^_èùà...WV.¦*..Äj 000140
76FF0876 FFE64689 0000FFFF 9A156A01 6A006AFA 46890000 03C49A14 6A016A00 .j.j..á....F*j.j¯j........F¦.v..v 000160
99EA462B E6468BFE 4689F8D1 C22B99EC 462BFA46 880000FF FF9A5016 E8468D06 ..FÖ.P......F+*F§.+öÌ½.F±.F¦+Fö. 000180
FFFF9A02 6A006A00 6AFC76FF FE76FF03 6A006A06 76FF0876 FFFC4689 F8D1C228 +öÌ½.F=.v..v.j.j..v±.v=j.j.j.... 0001A0
0001005E 01030000 0001008A 00020053 00060037 02030014 90C8C95F 5E1F0000 ...^_èù.....7...S............^... 0001C0
00010049 00050000 000302C3 0002007F 00010394 0103007E 00010103 0103007D }.........~..........Ö.........!... 0001E0
```

Dump of file SATURN:[PCCOMMON.DUMP.DLL]RLOGVIEW.TMP;1 on 18-APR-1990 10:50:13.28
File ID (899,20,0)   End of file block 5 / Allocated 8

Virtual block number 4 (00000004), 512 (0200) bytes

```
00010199 0103000A 00010307 01030008 0001040E 01030000 000403AB 0002006F o...¨..............▪........... 000000
0003020E 0203001F 000100C9 0103001E 0001009E 01030095 00010386 01030088 ....Ñ...............è........... 000020
00050348 02030036 00050268 02030028 0004000A 02030083 0001018C 01030014 ....¥...°...Ö...(...k...6...K... 000040
01C80001 881F0000 3E89088E FFFF881E 00000000 00000044 00050363 0203003D =...c...D.......|...Ä.>...¡..ù. 000060
8ED88CFE 880A76C5 1EDE88D7 88EC8855 00000000 00000000 00000500 02000200 ................U.š.▪.ß.év..±.Ä. 000080
88F388A4 F3C913A5 F3E90149 A4027401 A8C78806 7EC4D1F7 AEF2FFFF 89C033C0 ã3ã¿..·Ü¼1á-..ú´.t.Él iÕµÉ.èµÉ.µ. 0000A0
885500C8 5DFA8891 4901F7AE F2FFFF89 C033067E C4078BEC 8855C85D C28C1FFA ª..õ]üÜ.š.▪á~.3ã¿..·Ü¼ìI..ªJù.U. 0000C0
8CC388AA F3C032F8 E2AA0374 C00AAC0C E30E4E88 DF880A76 C5067EC4 1E5657EC šWV.á~.év..Õ.N.D.¯.ãt.¯ã½2åµ´.ù. 0000E0
D323D818 D1280C74 DAF7D788 067EC457 38E30C4E 88EC8855 C85DE588 5F5E1FC2 ô.^_.|]üÜ.š.N.D8Wá~..▪¼Öt.+ì.Ü#Æ 000100
D1C38EFF FFC381C3 8C10E301 87AAF3C9 13A8F3E9 D1E08A0A 46880128 D187D103 .ì.Ť+ì.F..ÅìÕµ¨.èµ´.ìD..û.û...ûì 000120
00000000 00000088 000200AB 01050001 C8500856 88064688 5FAAF3C9 13A8F3E9 Õµ¨.èµ´_.F..V.Jù....¨... ....... 000140
70606920 74657920 746F6E20 706C6548 00726577 65697620 676F6C20 6F646552 Redo log viewer.Help not 'et imp 000160
00380002 0001FFFF 006E6F69 74706972 63736564 206F4E00 6465746E 6560656C lemented.No description...  ..8. 000180
00000000 00000048 2E474F4C 57454956 00000000 00000000 00000000 00000005 .................VIEWLOG.H....... 0001A0
FFF59400 019000C2 00080001 00000005 00000000 FFFF0001 000E0352 000000E7 Õ...R..................ô.....¥. 0001C0
00150007 80000000 00CF0000 00070000 00000000 00C8FFFF 00C80067 0102FFFC ▪...g.à...ù...........ü......... 0001E0
```

Dump of file SATURN:[PCCOMMON.DUMP.DLL]RLOGVIEW.TMP;1 on 18-APR-1990 10:50:13.28
File ID (899,20,0)   End of file block 5 / Allocated 8

Virtual block number 5 (00000005), 512 (0200) bytes

```
00260003 00198003 00000000 00030003 00000000 0000FFFF FFFF0002 004900EE Y.I.▪................Å.........&. 000000
000C0026 00030053 80030000 00040006 00030000 00000000 FFFFFFFF 000C000C ..É...............Å.....S...&... 000020
0002000C 00260003 00878003 04000008 00060003 00000000 0000FFFF FFFF00E1 Ä..............Ü.........&..... 000040
FFFF00F0 000C0026 000300BC 80030100 00E20004 00030000 00000000 FFFFFFFF ..............ã.....¥...&...Þ... 000060
65636E61 4300796C 7070417E 00484F7E 00000000 0300676F 6C206F64 6552FFFF ..Redo log......~OK.~Apply.Cance 000080
00000000 00000000 00000000 00000000 00000000 00000000 0000706C 6548006C l.Help........................... 0000A0
00000000 00000000 00000000 00000000 00000000 00000000 00000000 00000000 ................................ 0000C0
00000000 00000000 00000000 00000000 00000000 00000000 00000000 00000000 ................................ 0000E0
00000000 00000000 00000000 00000000 00000000 00000000 00000000 00000000 ................................ 000100
00000000 00000000 00000000 00000000 00000000 00000000 00000000 00000000 ................................ 000120
00000000 00000000 00000000 00000000 00000000 00000000 00000000 00000000 ................................ 000140
00000000 00000000 00000000 00000000 00000000 00000000 00000000 00000000 ................................ 000160
00000000 00000000 00000000 00000000 00000000 00000000 00000000 00000000 ................................ 000180
00000000 00000000 00000000 00000000 00000000 00000000 00000000 00000000 ................................ 0001A0
00000000 00000000 00000000 00000000 00000000 00000000 00000000 00000000 ................................ 0001C0
00000000 00000000 00000000 00000000 00000000 00000000 00000000 00000000 ................................ 0001E0
```

```
Dump of file SATURN:[PCCOMMON.DUMP.DLL]NEWMETA.TMP;1 on 18-APR-1990 10:48:01.69
File ID (741,17,0)   End of file block 111 / Allocated 112

Virtual block number 1 (00000001), 512 (0200) bytes

 00000000 00000040 00000000 000000B8 0000FFFF 00000004 0000006F 00B65A4D MZÑ.o...........|.......a....... 000000
 00000080 00000000 00000000 00000000 00000000 00000000 00000000 00000000 ................................ 000020
 6F6E6E61 63206061 72676F72 70207369 685421CD 4C01B821 CD09B400 0EBA1F0E ..¤..Ç.ë|¡.LëIThis program canno 000040
 00000000 00000024 0A00002E 65646F6D 20534F44 206E6920 6E757220 65622074 t be run in DOS mode....$....... 000060
 00070012 00000000 00100988 00000000 00128009 DEE10CC3 0106067C 0505454E NE..|...Û.ÃB........|........... 000080
 00000000 00000000 00010000 00040000 00000802 04A60498 00D00000 0040002D -.a.Ä.Ä...I..................... 0000A0
 0D8E0F00 0D8D03FA 0C7C0F00 0C78032B 19200F00 1920018F 107E0F00 107E0083 ..-...-... ... .+.(...|.*....... 0000C0
 03940F00 0394063F 03660F00 03660604 04420F00 044205BB 0DA40F00 0DA404D8 Ä.Ê...Ê.Ë.B...B...f...f.?....... 0000E0
 03660F00 036607BD 03660F00 03660782 069C0F00 069C0717 098A0F00 098A067C |.................f...f.§.f...f. 000100
 18CA0F00 18CA0A26 1C720F00 1C720855 01DE0F00 01DE0833 03660F00 036607F8 ñ.f...f.3.B...B.U.r...r.&.ò...ò. 000120
 4D324244 580F0000 4154454D 57454E07 20D00F21 20CC0BBD 02000E21 00000000 ....!...§.ä !.Å .NEWMETA...XDB2M 000140
 4D324244 580F0003 4C4F4356 5455504D 3242440B 00025745 49565055 4B4F4F4C LOOKUPVIEW...DB2MPUTVCOL...XDB2M 000160
 44581000 05574549 564C4C41 5445474D 3242440E 00045945 4B465055 4B4F4F4C LOOKUPFKEY...DB2MGETALLVIEW...XD 000180
 59454B50 50554B4F 4F4C4D32 4244580F 00065845 444E4945 54454C45 444D3242 B2MDELETEINDEX...XDB2MLOOKUPPKEY 0001A0
 42415445 54454C45 444D3242 44581000 08574549 56544547 4D324244 580C0007 ...XDB2MGETVIEW...XDB2MDELETETAB 0001C0
 56455445 4C45444D 32424458 0F000A58 45444E49 5455504D 3242440C 0009454C LE...DB2MPUTINDEX...XDB2MDELETEV 0001E0

Dump of file SATURN:[PCCOMMON.DUMP.DLL]NEWMETA.TMP;1 on 18-APR-1990 10:48:01.69
File ID (741,17,0)   End of file block 111 / Allocated 112

Virtual block number 2 (00000002), 512 (0200) bytes

 5445474D 32424458 10000C59 454B4645 54454C45 444D3242 44580F00 08574549 IEW...XDB2MDELETEFKEY...XDB2MGET 000000
 55504D32 42440C00 0E504D4F 43565445 474D3242 440C000D 5845444E 494C4C41 ALLINDEX...DB2MGETVCOMP...DB2MPU 000020
 434D3242 440E0010 59454B50 4554454C 45444D32 4244580F 000F454C 42415454 TTABLE...XDB2MDELETEPKEY...DB2MC 000040
 440B0012 45434150 53544C4C 41544547 4D324244 10001159 454B4645 54414552 REATEFKEY...DB2MGETALLTSPACE...D 000060
 504D3242 440B0014 59454B46 5455504D 3242440B 00135745 49565455 504D3242 B2MPUTVIEW...DB2MPUTFKEY...DB2MP 000080
 32424410 00164E4D 554C4F43 50554B4F 4F4C4D32 42445811 00155945 4B505455 UTPKEY...XDB2MLOOKUPCOLUMN...DB2 0000A0
 54414447 4E4F4C32 45505954 41544144 1800174E 4D554C4F 434C4C41 5445474D MGETALLCOLUMN...DATATYPE2LONGDAT 0000C0
 44581000 19584544 4E494554 41455243 4D324244 58100018 52545345 50595441 ATYPESTR...XDB2MCREATEINDEX...XD 0000E0
 554C4F43 4554454C 45444D32 42445811 001A454C 42415445 54414552 434D3242 B2MCREATETABLE...XDB2MDELETECOLU 000100
 43565455 504D3242 440C001C 57454956 45544145 52434D32 4244580F 001B4E4D MN...XDB2MCREATEVIEW...DB2MPUTVC 000120
 53455059 54415441 4414001E 59454B50 45544145 52434D32 42440E00 1D504D4F OMP...DB2MCREATEPKEY...DATATYPES 000140
 440E0020 59454B46 4C4C4154 45474D32 42440E00 1F455059 54415441 44325254 TR2DATATYPE...DB2MGETALLFKEY ..D 000160
 0E00224E 4D554C4F 43545550 4D324244 0D00214C 4F435645 54414552 434D3242 B2MCREATEVCOLI..DB2MPUTCOLUMN".. 000180
 244C4F43 56455445 4C45444D 3242440E 00235045 44564554 454C4544 4D324244 DB2MDELETEVDEP#..DB2MDELETEVCOL$ 0001A0
 4C424545 52464D32 42440D00 254C4F43 57454956 50554B4F 4F4C4D32 42441100 ..DB2MLOOKUPVIEWCOL%..DB2MFREEBL 0001C0
 45445654 45474D32 42440B00 27454341 50535454 45474D32 42440D00 264B434F OCK&..DB2MGETTSPACE'..DB2MGETVDE 0001E0

Dump of file SATURN:[PCCOMMON.DUMP.DLL]NEWMETA.TMP;1 on 18-APR-1990 10:48:01.69
File ID (741,17,0)   End of file block 111 / Allocated 112

Virtual block number 3 (00000003), 512 (0200) bytes

 50535450 554B4F4F 4C4D3242 44581100 294C4F43 56544547 4D324244 0B002850 P(..DB2MGETVCOL)..XDB2MLOOKUPTSP 000000
 474D3242 44580E00 2B4E4D55 4C4F4345 54414552 434D3242 44581100 2A454341 ACE*..XDB2MCREATECOLUMN+..XDB2MG 000020
 45474D32 42440E00 2D454C42 41545445 474D3242 440C002C 4E4D554C 4F435445 ETCOLUMN,..DB2MGETTABLE-..DB2MGE 000040
 4D324244 5811002F 5845444E 49544547 4D324244 580D002E 59454B50 4C4C4154 TALLPKEY...XDB2MGETINDEX/..XDB2M 000060
 31584544 4E495055 4B4F4F4C 4D324244 58100030 45434150 53544554 454C4544 DELETETSPACE0..XDB2MLOOKUPINDEX1 000080
 53544554 41455243 4D324244 10003245 4C424154 4C4C4154 45474D32 42440F00 ..DB2MGETALLTABLE2..DB2MCREATETS 0000A0
 41443245 50595441 54414414 00345945 4B465445 474D3242 440B0033 45434150 PACE3..DB2MGETFKEY4..DATATYPE2DA 0000C0
 55504D32 42440D00 3659454B 50544547 4D324244 0B003552 54534550 59544154 TATYPESTR5..DB2MGETPKEY6..DB2MPU 0000E0
 002F0010 00070001 00003850 45445654 55504D32 42440B00 37454341 50535454 TTSPACE7..DB2MPUTVDEP8......../. 000100
 4C414D45 4D0D4D45 4D03534C 4C414353 4F44084E 49574D50 05000180 014700E9 Ö.G.¯...PMWIN.DOSCALLS.MEM.MEMAL 000120
 4555514C 4D44136C 6D64034B 434F4C42 45455246 4D454D0C 4B434F4C 42434F4C LOCBLOCK.MEMFREEBLOCK.dml.DMLQUE 000140
 514C4D44 0D544E55 4F435952 4555514C 4D440045 4C444E41 484C4544 4F4D5952 RYMODELHANDLE.DMLQUERYCOUNT.DMLQ 000160
 4C525952 4555514C 4D440B44 4C454946 5445534C 4D440B44 4C454946 59524555 UERYFIELD.DMLSETFIELD.DMLQUERYRL 000180
 45524E55 4C4D440B 4554414C 45524C4D 4409314E 4C525952 4555514C 4D440C4E N.DMLQUERYRLN1.DMLRELATE.DMLUNRE 0001A0
 414E4854 49574554 41455243 4C4D4411 5453494C 45455246 4C4D440B 4554414C LATE.DMLFREELIST.DMLCREATEWITHNA 0001C0
 45544441 45524C4D 440B4554 454C4544 4C4D4409 45544145 52434C4D 4409454D ME.DMLCREATE.DMLDELETE.DMLREADTE 0001E0
```

Dump of file SATURN:[PCCOMMON.DUMP.DLL]NEWMETA.TMP;1 on 18-APR-1990 10:48:01.69
File ID (741,17,0)   End of file block 111 / Allocated 112

Virtual block number 4 (00000004), 512 (0200) bytes

```
46455445 4C45444D 32424414 4D324244 04545845 54455449 52574C4D 440C5458 XT.DMLWRITETEXT.DB2M.DB2MDELETEF 000000
45444D32 42440F58 45444E49 4554454C 45444D32 42440F59 454B4E47 4945524F OREIGNKEY.DB2MDELETEINDEX.DB2MDE 000020
440E4543 41505345 4C424154 4554454C 45444D32 42441445 4C424154 4554454C LETETABLE.DB2MDELETETABLESPACE.D 000040
53524150 50414332 42441050 41432D32 42440757 45495645 54454C45 444D3242 B2MDELETEVIEW.DB2-CAP.DB2CAPPARS 000060
42441841 54414458 55415445 53524553 52415050 41433242 44165449 4E495245 ERINIT.DB2CAPPARSERSETAUXDATA.DB 000080
52415050 41433242 44134154 41445855 41595245 55515245 53524150 50414332 2CAPPARSERQUERYAUXDATA.DB2CAPPAR 0000A0
504F534F 44074F49 53034553 52415050 41433242 44084553 4F505349 44524553 SERDISPOSE.DB2CAPPARSE.SIO.DOSOP 0000C0
85030402 44414552 534F4407 45544952 57534F44 0845534F 4C43534F 44084E45 EN.DOSCLOSE.DOSWRITE.DOSREAD.... 0000E0
0303010A 7D030401 08910305 01007203 06010C17 0304010D 6F030201 00000301 .......o.........r.........).... 000100
02010850 03030101 C8030601 087D0304 3B030502 14B50302 01000003 050104F2 ·.........ç....;..)....à....]... 000120
03040110 4C031278 03053703 02030156 03060110 18030101 090C0305 01000003 ................V....7..x..L.... 000140
02010151 03010100 59030501 0000030A 0A030102 05E80309 0100E403 06010421 !....ð....Ò............Y....Q... 000160
D7030502 02E50302 01030703 010102AC 03060100 2F030901 0FB30301 010F5C03 .\....•..../....¯..........Ì....ª 000180
0101070F 03040107 860306D0 030B2F03 03030000 03090105 98030401 05960304 ................../..Å........... 0001A0
01085C03 04010816 03050103 80030301 023A0306 01000003 021C0303 02037B03 .(.............:...............\.. 0001C0
0C7F0317 5D030202 090B0303 01043D03 09010A15 03030103 E0030101 00000306 .......Å.........=.........}.... 0001E0
```

Dump of file SATURN:[PCCOMMON.DUMP.DLL]NEWMETA.TMP;1 on 18-APR-1990 10:48:01.69
File ID (741,17,0)   End of file block 111 / Allocated 112

Virtual block number 5 (00000005), 512 (0200) bytes

```
32424458 1000006D 65747379 73627553 20617465 4D2D3242 44207765 4E160000 ...New DB2-Meta Subsystem...XDB2 000000
000246C7 D88EFFFF B81E5657 000030C8 00000001 454C4241 54505548 4F4F4C4D MLOOKUPTABLE....àO..WV.¡...ÄúF∅. 000020
468D06C4 8300B204 859A026A 5016E046 8DDE4689 02C48300 2900009A 2476FF00 ..v$...)..á..FB.FÅ.Pj....ÿ..á..F 000040
003DD246 8910C483 FFFF0793 9A1A76FF 1C76FF50 16EC468D 50160446 8D5016E2 ã.P.Få.P.Fš.P.v..v.......á..F∅=. 000060
0676FF08 76FF5016 EC4680E0 76FF2876 FF2A76FF 00EEE9D2 46880006 E9037500 .u.Õ...F∅ÕŸ..v*.v(.vÅ.Fš.P.v..v. 000080
00ED017E 9A501604 468D00C4 E9D24688 0006E903 7500003D 02468900 00FFFF9A ......F∅=..u.Õ...F∅Õá..Få.P.-.Ú. 0000A0
9A03E968 5016E046 8D003EE9 037C09D0 7E830047 E9037500 003D0046 8904C483 .á..FÅ=..u.ÕG..-Å.|.Õ>..FÅ.PhÕ.. 0000C0
9A5016D4 468DE076 FF37FF26 0277FF26 065EC428 76FF2A76 FF06C483 0111053E >....á..v*.v(á^.&.w.&.7.vÅ.Få.P. 0000E0
83FFFF01 7E9A5016 E2468D00 65E9D246 880006E9 03750000 3D024689 0000012F /....F∅=..u.Õ...F∅Õe..Fã.P.-.... 000100
3E9A03EA 685016E0 4680003E E9037C09 D07E8300 47E90375 00003D00 468904C4 á..FÅ=..u.ÕG..-Å.|.Õ>..FÅ.PhÕ..> 000120
FF9A5016 D4468DE0 76FF37FF 260277FF 26065EC4 2876FF2A 76FF06C4 83FFFF05 ....á..v*.v(á^.&.w.&.7.vÅ.Få.P.. 000140
26CAC95F 5E1F0000 E9D24688 0006E9D2 46880006 E9037500 003D0246 890000FF ....F∅=..u.Õ...F∅Õ...F∅Õ...^ èò& 000160
FF078926 02478926 00008806 5EC40000 D246C7D8 8E000888 1E565700 0034C800 .à4..WV.¡...ÄúF∅..á^.¡..&.G.Ī... 000180
006A006A 06C48301 EC04859A 086A5016 E246800E 468902C4 83018700 009A2476 v$......á..FB.Fã.Pj....š..á.j.j. 0001A0
03750000 3D024689 10C48300 4607939A 1A76FF1C 76FF5016 E4468D50 16D4468D .Få.P.FÕ.P.v..v....F..á..F∅=..u. 0001C0
0000719A 5016FC46 8D5016E4 4680E276 FF2876FF 2A76FF01 47E9D246 880006E9 Õ...F∅ÕG..v*.v(.vã.FÕ.P.F=.P.q.. 0001E0
```

Dump of file SATURN:[PCCOMMON.DUMP.DLL]NEWMETA.TMP;1 on 18-APR-1990 10:48:01.69
File ID (741,17,0)   End of file block 111 / Allocated 112

Virtual block number 6 (00000006), 512 (0200) bytes

```
C483024B 04859A0F 6A5016E0 4680011E E9D24688 0006E903 7500003D 02468900 ..F∅=..u.Õ...F∅Õ...FÅ.Pj....K..á 000000
880006E9 03750000 3D024689 0000025F 9A5016CE 468DE076 FF2876FF 2A76FF06 ..v*.v(.vÅ.Fö.P._....F∅=..u.Õ... 000020
0000028B 9A066ACE 76FFD076 FF096AFC 76FFFE76 FF2876FF 2A76FF00 EBE9D246 F∅ÕŠ..v*.v(.v±.v=j..vÅ.vöj...... 000040
06C48300 1704859A 0C6A5016 E0468D00 BFE9D246 880006E9 03750000 3D024689 .F∅=..u.Õ...F∅Õ¢..FÅ.Pj.......á. 000060
46880006 E9037500 003DD246 890000FF FF9A5016 F8468DE0 76FF2876 FF2A76FF .v*.v(.vÅ.F½.P......F∅=..u.Õ...F 000080
890000FF FF9A046A F876FFFA 76FF106A FC76FFFE 76FF2876 FF2A76FF 008CE9D2 ∅Õ...v*.v(.v±.v=j..v*.v½j....... 0000A0
CC468904 C483008E 017E9A50 16D44680 0060E9D2 46880006 E9037500 003DD246 F∅=..u.Õ...F∅Õ'..Få.P.~....á..Fä 0000C0
8D006AF8 76FFFA76 FF2876FF 2A76FF00 29E9037C 09CC7E83 0032E903 7500003D =..u.Õ2..~ä.|.Õ)..v*.v(.v*.v½j.. 0000E0
FC468806 5EC40016 E9D24688 0006E903 7500003D 02468900 0000009A 50160446 Få.P.Å....F∅=..u.Õ...F∅Õ..á^..F= 000100
59B81E56 5700000C C80026CA C95F5E1F 0000E9D2 46880257 89260789 26FE568B .V±&..&.W..F∅Õ...^ èò&.à...WV.¡Y 000120
02C48303 3D00009A 2476FF07 89260247 89260000 B8065EC4 0000F446 C7D88E01 ..ÄúF¶..á^.¡..&.G.Ī...v$...=..á. 000140
76FF1C76 FFFA76FF 2876FF2A 76FF06C4 83017504 859A096A 5016FA46 8DF64689 .F-.F*.Pj....u..á..v*.v(.v*.v..v 000160
46880257 89260789 26FE568B FC468806 5EC4F446 89000001 CD9A5016 FC468D1A ..F=.P.ë....F¶á^..F=.V±&..&.W..F 000180
B8065EC4 0000FA46 C7D88E03 0FB81E56 57000006 C80026CA C95F5E1F 0000E9F4 ¶Õ...^ èò&.à...WV.¡...ÄúF*..á^.¡ 0001A0
859A036A 5016FE46 8DFC4689 02C48303 B100009A 2476FF07 89260247 89260000 ..&.G.Ī...v$...Ÿ..á..F=.F±.Pj... 0001C0
00000357 9A0676FF 0876FF1A 76FF1C76 FFFE76FF 2876FF2A 76FF06C4 83032B04 .+..á..v*.v(.v±.v..v..v..v..W... 0001E0
```

```
Dump of file SATURN:[PCCOMMON.DUMP.DLL]NEWMETA.TMP;1 on 18-APR-1990 10:48:01.69
File ID (741,17,0)   End of file block 111 / Allocated 112

Virtual block number 7 (00000007), 512 (0200) bytes

 00A446C7 D88E0383 881E5657 000076C8 0026CAC9 5F5E1F00 00E9FA46 8BFA4689 .F'.F'õ...^_èò&.àv..WV.¡...ÄúFÊ. 000000
 16884680 82468902 C4830416 00009A24 76FF0789 26024789 26000088 065EC400 .á^.¡..&.G.Ï...v$......á..Fý.F¡. 000020
 9A50168A 46801A76 FF1C76FF 8876FF28 76FF2A76 FF06C483 044F0485 9A076A50 Pj....O..á..v*.v(.v¡.v..v..Fα.P. 000040
 AE04859A 0E6A5016 84468005 8EE9A446 880006E9 03750000 3DA44689 000003CC ö....FÊ=..u.Õ...FÊÕ/..FÇ.Pj....Û 000060
 E9037500 003DA446 89000004 C29A5016 CA468084 76FF2876 FF2A76FF 06C48304 ..á..v*.v(.vÇ.Fò.P.ò....FÊ=..u.Õ 000080
 EE9A116A CA76FFCC 76FF0E6A BA76FF8C 76FF2876 FF2A76FF 0588E9A4 46880006 ...FÊÕ...v*.v(.v¥.vαj..vä.vòj..Ÿ 0000A0
 05130485 9A0F6A50 16844680 055FE9A4 46880006 E9037500 003DA446 89000004 ....FÊ=..u.Õ...FÊÕ_..FÇ.Pj...... 0000C0
 06E90375 00003DA4 46890000 02009A50 169A4680 8476FF28 76FF2A76 FF06C483 .á..v*.v(.vÇ.F..P......FÊ=..u.Õ. 0000E0
 022C9A05 6A9A76FF 9C76FF08 6A8A76FF 8C76FF28 76FF2A76 FF052CE9 A4468800 ..FÊÕ,..v*.v(.v¥.vαj..v..v.j.... 000100
 07D86850 16884680 0001FC46 C70500E9 A4468800 06E90375 00003DA4 46890000 ...FÊ=..u.Õ...FÊÕ..úF•...F¡.PhÅ. 000120
 00056C9A 5016FC46 808876FF CA76FFCC 76FF2876 FF2A76FF 06C48305 5205889A ...R..á..v*.v(.vä.vò.v¡.F•.P.l.. 000140
 9A07DA68 50168846 80000086 46C704C1 E9A44688 0006E903 75000030 A4468900 ..FÊ=..u.Õ...FÊÕè.úFÑ...F¡.PhÖ.. 000160
 000005A8 9A501686 46808876 FFCA76FF CC76FF28 76FF2A76 FF06C483 05910588 .....á..v*.v(.vä.vò.v¡.FÑ.P.¨... 000180
 889A07E0 68501688 46800005 C446C704 82E9A446 880006E9 03750000 3DA44689 .FÊ=..u.Õ...FÊÕ..úFá...F¡.PhÅ... 0001A0
 89000005 EA9A5016 C44680B8 76FFCA76 FFCC76FF 2876FF2A 76FF06C4 8305D005 .Å..á..v*.v(.vä.vò.v¡.Fá.P.õ.... 0001C0
 05889A07 D8685016 88468000 00A646C7 0443E9A4 46880006 E9037500 003DA446 FÊ=..u.Õ...FÊÕC.úFÎ...F¡.PhÜ.... 0001E0

Dump of file SATURN:[PCCOMMON.DUMP.DLL]NEWMETA.TMP;1 on 18-APR-1990 10:48:01.69
File ID (741,17,0)   End of file block 111 / Allocated 112

Virtual block number 8 (00000008), 512 (0200) bytes

 46890000 06309A50 16A64680 8876FFCA 76FFCC76 FF2876FF 2A76FF06 C4830616 ...á..v*.v(.vä.vò.v¡.FÎ.P.0....F 000000
 50168846 8DC24689 C84689FE 46890000 880404E9 A4468800 06E90375 00003DA4 Ê=..u.Õ...FÊÕ..¡...F±.Fà.Fõ.F¡.P 000020
 9A5016C2 46808876 FFCA76FF CC76FF28 76FF2A76 FF06C483 06500588 9A07DC68 hÊ....P..á..v*.v(.vä.vò.v¡.Fõ.P. 000040
 05889A07 DE685016 88468003 8EE9A446 880006E9 03750000 3DA44689 0000066A j....FÊ=..u.Õ...FÊÕƒ..F¡.Ph8.... 000060
 46890000 06A49A50 16C84680 8876FFCA 76FFCC76 FF2876FF 2A76FF06 C483068A ...á..v*.v(.vä.vò.v¡.Fà.P.Ê....F 000080
 FF06C483 039F0588 9A07DF68 50168846 800384E9 A4468800 06E90375 00003DA4 Ê=..u.Õ...FÊÕ...F¡.PhÔ.......á.. 0000A0
 03750000 3DA44689 00000205 9A5016FE 46808876 FFCA76FF CC76FF28 76FF2A76 v*.v(.vä.vò.v¡.F±.P.Í....FÊ=..u. 0000C0
 50168846 8DA05689 9E4689C0 56898E46 8900008A 00008803 4AE9A446 880006E9 Õ...FÊÕJ.¡..¤...Fƒ.Vá.F..V..F¡.P 0000E0
 9A50169E 46808876 FFCA76FF CC76FF28 76FF2A76 FF06C483 07100588 9A07DD68 hÍ.......á..v*.v(.vä.vò.v¡.F..P. 000100
 05889A07 E3685016 88468002 FEE9A446 880006E9 03750000 3DA44689 0000072A *....FÊ=..u.Õ...FÊÕ±..F¡.PhD.... 000120
 46890000 07699A50 16BE4680 8876FFCA 76FFCC76 FF2876FF 2A76FF06 C483074F O..á..v*.v(.vä.vò.v¡.Fƒ.P.i....F 000140
 9305889A 07E26850 16884680 0003C646 C702C4E9 A4468800 06E90375 00003DA4 Ê=..u.Õ...FÊÕá.úFó...F¡.Phã..... 000160
 A4468900 0007AD9A 5016C646 808876FF CA76FFCC 76FF2876 FF2A76FF 06C48307 ..á..v*.v(.vä.vò.v¡.Fó.P.Ù....FÊ 000180
 07E16850 16884680 00008C46 C700038A 46C70285 E9A44688 0006E903 7500003D =..u.Õ...FÊÕ..úF...úF....F¡.PhÅ. 0001A0
 0007F89A 50168A46 808876FF CA76FFCC 76FF2876 FF2A76FF 06C48307 DE05889A ...8..á..v*.v(.vä.vò.v¡.F..P.½.. 0001C0
 08190266 9A5016CE 4680006A 096A0241 E9A44688 0006E903 7500003D A4468900 ..FÊ=..u.Õ...FÊÕA.j.j..Fö.P.f... 0001E0

Dump of file SATURN:[PCCOMMON.DUMP.DLL]NEWMETA.TMP;1 on 18-APR-1990 10:48:01.69
File ID (741,17,0)   End of file block 111 / Allocated 112

Virtual block number 9 (00000009), 512 (0200) bytes

 FFCA76FF CC76FF28 76FF2A76 FF06C483 08290588 9A07D968 50168846 8DC9C483 .á..F¡.Ph)....)..á..v*.v(.vä.vò. 000000
 6A096A01 F6E9A446 880006E9 03750000 3DA44689 00000843 9A5016CE 46808876 v¡.Fö.P.C....FÊ=..u.Õ...FÊÕ-.j.j 000020
 76FF06C4 83087405 889A07E4 68501688 468008C4 83086402 669A5016 F0468000 ..FÞ.P.f.d..á..F¡.Phõ....t..á..v 000040
 E9037500 003DA446 89000008 8E9A5016 F04680B8 76FFCA76 FFCC76FF 2876FF2A *.v(.vä.vò.v¡.FÞ.P......FÊ=..u.Õ 000060
 E5685016 88468008 C48308ED 02669A50 16A84680 006A096A 01ABE9A4 46880006 ...FÊÕ¨.j.j..F´.P.f.Ú..á..F¡.PhÍ 000080
 08CC9A50 16A84680 8876FFCA 76FFCC76 FF2876FF 2A76FF06 C4830882 05889A07 ....ý..á..v*.v(.vä.vò.v¡.F´.P.ä. 0000A0
 9A07D568 50168846 8D418E46 C60160E9 A4468800 06E90375 00003DA4 46890000 ...FÊ=..u.Õ...FÊÕ'.óF.A.F¡.PhÍ.. 0000C0
 0000091C 9A50168E 46808876 FFBA76FF BC76FF28 76FF2A76 FF06C483 09020588 .....á..v*.v(.v¥.vα.v¡.F..P..... 0000E0
 8302A801 1E9A5016 D8468004 86681E01 22E9A446 880006E9 03750000 3DA44689 .FÊ=..u.Õ...FÊÕ"..h...FÄ.P...´.. 000100
 BC76FF28 76FF2A76 FF06C483 09410588 9A07D468 50168846 800000A2 46C708C4 á.úFÅ...F¡.Phå....A..á..v*.v(.v¥ 000120
 D2E9A446 880006E9 03750000 3DA44689 0000095B 9A5016A2 46808876 FFBA76FF .vα.v¡.FÅ.P.[....FÊ=..u.Õ...FÊÕ0 000140
 FFBC76FF 2876FF2A 76FF06C4 83098405 889A07D3 68501688 46800000 EE46C700 .úFŸ...F¡.PhÆ.......á..v*.v(.v¥. 000160
 0093E9A4 46880006 E9037500 003DA446 89000009 9E9A5016 EE4680B8 76FFBA76 vα.v¡.FŸ.P......FÊ=..u.Õ...FÊÕ.. 000180
 FF2876FF 2A76FF06 C48309BE 05889A07 D6685016 884680FA 4689EC46 89000088 ¡...FŠ.F'.F¡.Phø....ƒ..á..v*.v(. 0001A0
 A4468800 06E90375 00003DA4 46890000 09D89A50 16FA4680 8876FFBA 76FFBC76 v¥.vα.v¡.F'.P.Ä....FÊ=..u.Õ...FÊ 0001C0
 FFBA76FF BC76FF28 76FF2A76 FF06C483 04040588 9A07D768 50168846 800050E9 ÕP..F¡.Pha.......á..v*.v(.v¥.vα. 0001E0
```

Dump of file SATURN:[PCCOMMON.DUMP.DLL]NEWMETA.TMP;1 on 18-APR-1990 10:48:01.69
File ID (741,17,0)   End of file block 111 / Allocated 112

Virtual block number 10 (0000000A), 512 (0200) bytes

```
065EC400 16E9A446 880006E9 03750000 3DA44689 0000052D 9A5016EC 468DB876 v|.F$.P.-....FÊ=..u.Õ...FÊÕ..á^. 000000
56570000 76C80026 CAC95F5E 1F0000E9 A4468B02 57892607 89268C56 8B8A468B .Fα.VV&..&.W..FÊÕ...^ èò&.àv..WV 000020
0A400000 9A2476FF 07892602 47892600 00B8065E C400009C 46C7D88E 03E8881E .¡Ò..ÄúF...á^.|..&.G.Ž...v$...∂. 000040
46805016 9E468D00 6A006A06 C4830AC8 04859A04 6A50168C 468DB446 8902C483 .á..FÇ.F¥.Pj....à..á.j.j..F..P.F 000060
E99C4688 0006E903 7500003D 9C468910 C48301A3 07939A1A 76FF1C76 FF50160B Ä.P.v..v....È..á..F.=..u.Õ...F.Õ 000080
003D9C46 89000004 309A0676 FF0876FF 5016D846 8D8C76FF 2876FF2A 76FF053A :..v*.v(.v¥.FÄ.P.v..v..0....F.=. 0000A0
7500003D 8A468904 C48307CE 017E9A50 169E4680 0510E99C 46880006 E9037500 .u.Õ...F.Õ...F..P.~.ö..á..F.=..u 0000C0
2A76FF06 C4830805 05F79A05 7C685016 BC468D00 3EE9037C 098A7E83 0047E903 .ÕG..~..|.Õ>..F¥.Ph|..¼....á..v* 0000E0
00003D9C 46890000 0BEB9A50 169E468D BC76FF37 FF260277 FF26065E C42876FF .v(á^.&.w.&.7.v¥.F..P.Š....F.=.. 000100
2876FF2A 76FF06C4 83086804 859A0E6A 50168846 8D0481E9 9C468B00 06E90375 u.Õ...F.ÕŸ..F|.Pj....h..á..v*.v( 000120
76FF047E E99C468B 0006E903 7500003D 9C468900 0087C9A 5016D446 8DB876FF .v|.Få.P.|....F.=..u.Õ...F.Õ~..v 000140
9C468900 000BAC9A 106AD476 FFD676FF 116A37FF 260277FF 26065EC4 2876FF2A *.v(á^.&.w.&.7j..vø.våj..~....F. 000160
2A76FF06 C48308D1 04859A0F 6A501688 4680044E E99C4688 0006E903 7500003D =..u.Õ...F.ÕN..F|.Pj....ì..á..v* 000180
1BE99C46 880006E9 03750000 3D9C4689 00000463 9A501698 468DB876 FF2876FF .v(.v|.F..P.c....F.=..u.Õ...F.Õ. 0001A0
0000048F 9A046A98 76FF9A76 FF0E6A37 FF260277 FF26065E C42876FF 2A76FF04 ..v*.v(á^.ù.w.&.7j..v..v.j...... 0001C0
F79A0584 685016BA 468D0001 FC46C703 EBE99C46 880006E9 03750000 3D9C4689 .F.=..u.Õ...F.ÕŠ.úF=...Fα.Ph...¼ 0001E0
```

Dump of file SATURN:[PCCOMMON.DUMP.DLL]NEWMETA.TMP;1 on 18-APR-1990 10:48:01.69
File ID (741,17,0)   End of file block 111 / Allocated 112

Virtual block number 11 (0000000B), 512 (0200) bytes

```
8900000C 2A9A5016 FC468DBA 76FFD476 FFD676FF 2876FF2A 76FF06C4 830C1005 ....á..v*.v(.vø.vå.vα.F•.P.*.... 000000
05F79A05 86685016 BA468D00 008646C7 03ACE99C 46880006 E9037500 003D9C46 F.=..u.Õ...F.Õ¯.úFÑ...Fα.Ph...¼. 000020
46890000 0C699A50 1686468D BA76FFD4 76FFD676 FF2876FF 2A76FF06 C4830C4F O..á..v*.v(.vø.vå.vα.FÑ.P.i....F 000040
8E05F79A 05886850 168A468D 0000FE46 C7036DE9 9C468800 06E90375 00003D9C .=..u.Õ...F.Õm.úF±...Fα.ºh...¼.. 000060
9C468900 000CA89A 5016FE46 8DBA76FF D476FFD6 76FF2876 FF2A76FF 06C4830C ..á..v*.v(.vø.vå.vα.F±.P ¯....F. 000080
0CCD05F7 9A058C68 5016BA46 8D000AC4 46C7032E E99C4688 0006E903 7500003D =..u.Õ...F.Õ..úFá...Fα.Ph. ¼.ë. 0000A0
3D9C4689 00000CE7 9A5016C4 468DBA76 FFD476FF D676FF28 76FF2A76 FF06C483 .á..v*.v(.vø.vå.vα.Fá.P.Ó....F.= 0000C0
83000C05 F79A0587 685016BA 468D0000 A846C702 EFE99C46 880006E9 03750000 ..u.Õ...F.Õÿ.úF ´...Fα.Ph...¼.... 0000E0
003D9C46 89000000 269A5016 A8468DBA 76FFD476 FFD676FF 2876FF2A 76FF06C4 á..v*.v(.vø.vå.vα.F´.P.&....F.=. 000100
C4830050 05F79A05 8E685016 BA468D00 03C646C7 0280E99C 46880006 E9037500 .u.Õ...F.Õ¯.úFó...Fα.Ph...¼.P..á 000120
00003D9C 46890000 006A9A50 16C6468D BA76FFD4 76FFD676 FF2876FF 2A76FF06 ..v*.v(.vø.vå.vα.Fó.P.j....F.=.. 000140
05F79A05 8D685016 BA468D00 008E46C7 00038C46 C70271E9 9C468800 06E90375 u.Õ...F.Õq.úF...úF....Fα.Ph...¼. 000160
46890000 0DAD9A50 168C468D BA76FFD4 76FFD676 FF2876FF 2A76FF06 C4830093 ...á..v*.v(.vø.vå.vα.F..P.Ù....F 000180
05886850 168A468D C24689C8 46890000 B8022DE9 9C468800 06E90375 0000309C .=..u.Õ...F.Õ-.|...Fà.Fò.Fα.Ph.. 0001A0
0006F09A 5016C246 8DBA76FF D476FFD6 76FF2876 FF2A76FF 06C48306 D605F79A .¼.ø..á..v*.v(.vø.vå.vα.Fõ.P.Þ.. 0001C0
830E1905 F79A058A 685016BA 468D01EA E99C4688 0006E903 7500003D 9C468900 ..F.=..u.Õ...F.Õõ..Fα.Ph...¼.... 0001E0
```

Dump of file SATURN:[PCCOMMON.DUMP.DLL]NEWMETA.TMP;1 on 18-APR-1990 10:48:01.69
File ID (741,17,0)   End of file block 111 / Allocated 112

Virtual block number 12 (0000000C), 512 (0200) bytes

```
003D9C46 8900000E 339A5016 C8468DBA 76FFD476 FFD676FF 2876FF2A 76FF06C4 á..v*.v(.vø.vå.vα.Fà.P.3....F.=. 000000
46809456 89924689 C05689BE 46890000 BA0000B8 0180E99C 46880006 E9037500 .u.Õ...F.Õ¯.|..α...Ff.Vå.F..V..F 000020
92468DBA 76FFD476 FFD676FF 2876FF2A 76FF06C4 830E5305 F79A0589 685016BA α.Ph...¼.S..á..v*.v(.vø.vå.vα.F. 000040
058F6850 16BA468D 0164E99C 46880006 E9037500 003D9C46 8900000E 6D9A5016 .P.m....F.=..u.Õ...F.Õd..Fα.Ph.. 000060
000EB89A 5016BE46 8DBA76FF D476FFD6 76FF2876 FF2A76FF 06C4830E 9E05F79A .¼....á..v*.v(.vø.vå.vα.Ff.P.|.. 000080
0ED90266 9A5016CA 4680006A 096A012A E99C4688 0006E903 7500003D 9C468900 ..F.=..u.Õ...F.Õ*.j.j..Fò.P.f.). 0000A0
FFD476FF D676FF28 76FF2A76 FF06C483 0EE905F7 9A058568 5016BA46 8D08C483 .á..Fα.Ph...¼.Õ..á..v*.v(.vø.vå. 0000C0
6A096A00 DFE99C46 880006E9 03750000 3D9C4689 00000F03 9A5016CA 468DBA76 vα.Fò.P......F.=..u.Õ...F.ÕÒ.j.j 0000E0
76FF06C4 830F3405 F79A0590 685016BA 468D08C4 830F2402 669A5016 F0468D00 ..FÞ.P.f.$..á..Fα.Ph...¼.4..á..v 000100
E9037500 003D9C46 8900000F 4E9A5016 F0468DBA 76FFD476 FFD676FF 2876FF2A *.v(.vø.vå.vα.FÞ.P.N....F.=..u.Õ 000120
91685016 BA468D08 C4830AA4 02669A50 16AA468D 006A096A 0094E99C 46880006 ...F.Õ..j.j..F^.P.f.Ê..á..Fα.Ph. 000140
0F919A50 16AA468D BA76FFD4 76FFD676 FF2876FF 2A76FF06 C4830F73 05F79A05 ..¼.s..á..v*.v(.vø.vå.vα.F^.P... 000160
057A6850 16BA468D 0000EE46 C70049E9 9C468800 06E90375 00003D9C 46890000 ...F.=..u.Õ...F.ÕI.úFŸ...Fα.Phz. 000180
5016EE46 8DBA76FF 37FF2602 77FF2606 5EC42876 FF2A76FF 06C4830A 2E05F79A .¼....á..v*.v(á^.&.w.&.7.vα.FŸ.P 0001A0
C95F5E1F 0000E99C 46880006 E99C4688 0006E903 7500003D 9C468900 000AE69A .Ì....F.=..u.Õ...F.Õ...F.Õ...^ è 0001C0
89260247 89260000 B8065EC4 0000FA46 C7D88E0A 12B81E56 57000006 C80026CA ò&.à...WV.|...ÄúF*..á^.|..&.G.Ž. 0001E0
```

```
Dump of file SATURN:[PCCOMMON.DUMP.DLL]NEWMETA.TMP;1 on 18-APR-1990 10:48:01.69
File ID (741,17,0)   End of file block 111 / Allocated 112

Virtual block number 13 (0000000D), 512 (0200) bytes

 76FF06C4 8300CD04 859A056A 5016FE46 8DFC4689 02C4830F E900009A 2476FF07 ..v$...Õ..á..F=.F±.Pj....ë..á..v 000000
 00E9FA46 88FA4689 00000A87 9A0676FF 0876FF1A 76FF1C76 FFFE76FF 2876FF2A *.v(.v±.v..v..v..v.......F*.F*Õ. 000020
 260000B8 065EC400 00FA46C7 D88E0F8B B81E5657 000006C8 0026CAC9 5F5E1F00 ..^_èò&.à...WV.¡É..ÄúF*..á^.¡..& 000040
 0FD70485 9A066A50 16FE468D FC468902 C483104E 00009A24 76FF0789 26024789 .G.Ī...v$...N..á..F=.F±.Pj....■. 000060
 FA468900 0010049A 0676FF08 76FF1A76 FF1C76FF FE76FF28 76FF2A76 FF06C483 .á..v*.v(.v±.v..v..v..v.......F* 000080
 00000009 0A5C0002 00630004 00E70203 00089000 26CAC95F 5E1F0000 E9FA4688 .F*Õ...^_èò&......Ó...c...\..... 0000A0
 00000012 10200002 00000010 0E8E0002 00880004 08490203 0000000A 103C0002 ..<.......I.............. ..... 0000C0
 00EC46C7 D88EFFFF 881E5657 000016C8 008C0004 08190203 00AA0004 10690203 ..i...........¥.à...WV.¡...ÄúF$. 0000E0
 B8007B9A 1E76FF50 16F6468D 5016FA46 8DEE4689 02C48300 2F00009A 2876FF00 ..v(.../..á..FŸ.F*.P.F-.P.v..(.¡ 000100
 E9089BEA 46C7005E E90484EA 46C70066 E907E6EA 46C70038 E91E468B 0AC48300 ..á..F.Õ;.úFõl.Õf.úFõÇ.Õ^.úFõ..Õ 000120
 E903E8EA 46C7003E E90592EA 46C70046 E90708EA 46C7004E E90643EA 46C70056 V.úFõC.ÕN.úFõ..ÕF.úFõ..Õ>.úFõÕ.Õ 000140
 03F33DFF C5E90375 03F23DFF 8DE90375 03F13DFF 8DE90375 03F03D00 33E90036 6.Õ3.=Þ.u.Õ§.=þ.u.Õ§.=·.u.Õé.=¤. 000160
 F2468D50 16F8468D FFC2E9FF A5E90375 03F53DFF C5E90375 03F43DFF C5E90375 u.Õé.=¶.u.Õé.=¥.u.ÕE.Õò..F%.P.F· 000180
 76FFF046 8904C483 000702A0 9AF676FF 1E76FF0A C48300C6 00789AEA 76FF5016 .P.võ.(.ó..á..v..v-...■..á..FÞ.v 0001A0
 76FF2276 FF2C76FF 2E76FF01 96E91E46 8BF44689 04C48301 8C02A09A F276FFEA õ.v·......á..F¶.F.Õ...v..v,.v".v 0001C0
 FF002CE9 01CCE900 06E90375 00003DEC 46890000 01A69A50 16FC468D F476FF20  .v¶.F=.P.I....Fš=..u.Õ..Õä.Õ,.. 0001E0

Dump of file SATURN:[PCCOMMON.DUMP.DLL]NEWMETA.TMP;1 on 18-APR-1990 10:48:01.69
File ID (741,17,0)   End of file block 111 / Allocated 112

Virtual block number 14 (0000000E), 512 (0200) bytes

 83EC4689 0000FFFF 9AF076FF FC76FFFE 76FFF476 FF2076FF 2276FF2C 76FF2E76 v..v,.v".v .v¶.v±.v=.vÞ......Fš. 000000
 1A76FF1C 76FFF476 FF2076FF 2276FF2C 76FF2E76 FF0190E9 0003E903 7500EC7E ~š.u.Õ..Õ...v..v,.v".v .v¶.v..v. 000020
 1C76FFF4 76FF2076 FF2276FF 2C76FF2E 76FF017A E9EC4689 00000177 9AF076FF .vÞ.w....FšÕz..v..v,.v".v .v¶.v. 000040
 C483FFFF 053E9A1E 76FF5016 F4468D01 57E9EC46 890000FF FF9AF076 FF1A76FF .v..vÞ......FšÕW..F¶.P.v..>....á 000060
 FE460BFC 46880000 FFFF9A50 16FC468D F476FF20 76FF2276 FF2C76FF 2E76FF06 ..v..v,.v".v .v¶.F=.P......F=.F± 000080
 4004C483 FFFF017E 9A1676FF 1876FFFC 76FFFE76 FF2C76FF 2E76FF00 2AE90375 u.Õ*..v..v,.v±.v=.v..v..~....á.a 0000A0
 46800482 36FF261F 80068E2C 76FF2E76 FF005DE9 0000FFFF 9A1676FF 1876FF50 P.v..v......Õ]..v..v,..¯.&.6...F 0000C0
 F076FFFC 76FFFE76 FFF476FF 2076FF22 76FF2C76 FF2E76FF 0000FFFF 9A5016FC •.P......v..v,.v".v .v¶.v±.v=.vÞ 0000E0
 4004C483 01CA017E 9A1676FF 1876FFFC 76FFFE76 FF2C76FF 2E76FF00 0001549A .T....v..v,.v±.v=.v..v..-.ò..á.a 000100
 1E76FF50 16F4468D 0090E900 93E90096 E90099E9 000001D8 9A1676FF 1876FF50 P.v..v..Ä...Õ..Õ..Õ..Õ...F¶.P.v. 000120
 FFFF9A16 76FF1876 FFF476FF 2076FF22 76FF2C76 FF2E76FF 06C48300 17053E9A .>....á..v..v,.v".v .v¶.v..v.... 000140
 0248028E A7FF2E93 C0030052 E9037600 243D03E8 20005DE9 0060E9EC 46890000 ...FšÕ'.Õ].-Õ.=$.v.ÕR..â...Ï..H. 000160
 02480245 0242015E 015E015E 015E015E 00E5023F 02480248 01810248 02480248 H.H.H...H.H.?.Í.^.^.^.^.^.B.E.H. 000180
 02480248 02480248 02480248 02480248 02480248 02480248 02480248 02480248 H.H.H.H.H.H.H.H.H.H.H.H.H.H.H.H. 0001A0
 8E000888 1E565700 0016C800 2ACAC95F 5E1F0000 E9EC468B 02480248 02480248 H.H.H.H..FšÕ...^_èò*.à...WV.¡... 0001C0
 76FF5016 F6468D50 16FA468D EE468902 C4830314 00009A28 76FF0000 EC46C7D8 ÄúFš...v(......á¯.FŸ.F*.P.F-.P.v 0001E0

Dump of file SATURN:[PCCOMMON.DUMP.DLL]NEWMETA.TMP;1 on 18-APR-1990 10:48:01.69
File ID (741,17,0)   End of file block 111 / Allocated 112

Virtual block number 15 (0000000F), 512 (0200) bytes

 C70054E9 0644EA46 C7005CE9 03F1EA46 C70031E9 1E46880A C4830393 00789A1E ..(....á..F.Õ1.úFõþ.Õ\.úFõÕ.ÕT.ú 000000
 0033E900 36E90480 EA46C700 3EE90041 E90044E9 0593EA46 C7004CE9 070CEA46 Fõ..ÕL.úFõ..ÕD.ÕA.Õ>.úFõ¯.Õ6.Õ3. 000020
 FFBFE903 75048C3D FFBFE903 75048B3D FFE2E903 75048530 FFC7E903 7504843D =Ç.u.Õú.=ç.u.Õä.=É.u.Õ¢.=¥.u.Õ¢. 000040
 EA76FF50 16F2468D 5016F846 8DFFC2E9 FFBFE903 75048E3D FFBFE903 7504803D =§.u.Õ¢.=ƒ.u.Õ¢.Õò..F%.P.F·.P.võ 000060
 9AF276FF EA76FFF0 468904C4 83038202 A09AF676 FF1E76FF 0AC48303 A1007B9A .(.À..á..v..v-...ý..á..FÞ.võ.v·. 000080
 FFF476FF 2076FF22 76FF2C76 FF2E76FF 0110E91E 468BF446 8904C483 03F702A0 ..%..á..F¶.F.Õ...v..v,.v".v .v¶. 0000A0
 16F4468D 013EE901 41E90144 E90147E9 EC468900 00047C9A F076FF1A 76FF1C76 v..v..vÞ.|....FšÕG.ÕD.ÕA.Õ>..F¶. 0000C0
 5016FC46 8DF476FF 2076FF22 76FF2C76 FF2E76FF 06C48304 8505639A 1E76FF50 P.v..c.ç..á..v..v,.v".v .v¶.F=.P 0000E0
 FF1876FF FC76FFFE 76FF2C76 FF2E76FF 002AE903 75FE460B FC468800 0000FA9A .*....F=.F±u.Õ*..v..v,.v±.v=.v.. 000100
 2C76FF2E 76FF005D E9000004 A39A1676 FF1876FF 504004C4 83049501 7E9A1676 v.-....á.aP.v..v..È...Õ]..v..v, 000120
 FF2076FF 2276FF2C 76FF2E76 FF000001 F49A5016 FC468004 8236FF26 1F80068E ..¯.&.6...F=.P.¶....v..v,.v".v . 000140
 FF1876FF FC76FFFE 76FF2C76 FF2E76FF 00000211 9AF076FF FC76FFFE 76FFF476 v¶.v±.v=.vÞ......v..v,.v±.v=.v.. 000160
 FF5016F4 468D0080 E9000002 389A1676 FF1876FF 504004C4 83022A01 7E9A1676 v..~.*..á.aP.v..v..8...Õ...F¶.P. 000180
 9A1676FF 1876FFF4 76FF2076 FF2276FF 2C76FF2E 76FF06C4 83025305 639A1E76 v..c.S..á..v..v,.v".v .v¶.v..v.. 0001A0
 04F0A7FF 2E93C003 0042E903 76001C3D 04B02D00 4DE90050 E9EC4689 0000026E n....FšÕP.ÕM.-¯.=..v.ÕB..â...ÏÞ. 0001C0
 04AA03E6 03E303E3 03E304AA 04AA04AA 04AA04AA 03E903C0 04AA03EC 04AA04AA ˆ.ˆ.š.ˆ.â.Õ.ˆ.ˆ.ˆ.ˆ.D.D.D.Ì.ˆ. 0001E0
```

Dump of file SATURN:[PCCOMMON.DUMP.DLL]NEWMETA.TMP;1 on 18-APR-1990 10:48:01.69
File ID (741,17,0)   End of file block 111 / Allocated 112

Virtual block number 16 (00000010), 512 (0200) bytes

```
0000E9EC 468B04AA 04AA04AA 04AA04AA 04AA04AA 04AA04AA 04AA04AA 04AA04AA .˜.˜.˜.˜.˜.˜.˜.˜.˜.˜.˜.˜.˜..FšÕ.. 000000
05660000 9A2876FF 0000B646 C7D88E02 EDB81E56 5700004C C8002ACA C95F5E1F .^_èô*.àL..WV.¡Ù..ÄúFÑ...v(...f. 000020
35E91E46 8B0AC483 02FC007B 9A1E76FF 5016CC46 8D5016DE 468DB846 8902C483 .á¯.F¦.F8.P.Fä.P.v..(.=..á..F.Õ5 000040
46C70002 B446C700 40E90963 B446C700 48E907E7 B446C700 50E90FA4 B446C700 .úFÇÉ.ÕP.úFÇÕ.ÕH.úFÇc.Õ∂.úFÇ..úF 000060
9C3DFFC3 E9037508 9B3D0023 E90026E9 0898B446 C7002EE9 0000DC46 C71130C0 à0.úFÉ..Õ..úFÇ..Õ&.Õ#.=..u.Õü.=. 000080
468D5016 DC468DFF D2E9FFC3 E9037508 A13DFFC3 E9037508 A03DFFC3 E9037508 .u.Õü.=..u.Õü.=Å.u.Õü.Õ0..FÉ.P.F 0000A0
FFBA4689 04C48305 F802A09A CC76FF1E 76FF0AC4 8305E700 7B9AB476 FF5016C0 á.P.vÇ.(.Õ..á..v..vä...½..á..F¤. 0000C0
04859A0B 6A5016CE 468D0639 E91E4688 C2468904 C4830610 02A09AC0 76FFB476 vÇ.vâ......á..Fô.F.Õ9..Fö.Pj.... 0000E0
03750000 3DB64689 0000045F 9A501600 468DCE76 FF2C76FF 2E76FF06 C48306E9 Õ..á..v..v,.vö.FÅ.P._....FÑ=..u. 000100
449ABA76 FFD076FF D276FFC2 76FF2076 FF2276FF 2C76FF2E 76FF063C E90003E9 Õ..Õ<..v..v,.v".v .vÕ.v0.vÅ.v¤.D 000120
00FFFF9A 5016D846 8D2C76FF 2E76FF06 11E90003 E9037500 003DB646 89000007 ....FÑ=..u.Õ..Õ...v..v,.FÁ.P.... 000140
FF646AD8 76FFDA76 FF5016E4 468D05F6 E9B6468B 0006E903 7500003D B6468900 ..FÑ=..u.Õ...FÑÕ—..FÕ.P.vÕ.vÄjd. 000160
89E84689 E6568BE4 468B8646 8912C483 FFFF031E 9A2C76FF 2E76FF2A 76FFB876 v¦.v*.v..v,......á..FÑ.FÕ.VÌ.FÒ. 000180
261C568B 1A468BE8 5EC40097 E9037502 470B2607 8826E85E C40000CE 46C7EA56 VõúFö..á^Õ&..&.G.u.Õ..á^Õ.F..V.& 0001A0
468904C4 8306FC02 A09A0FA0 680FA568 0076E903 74025739 26007FE9 03740739 9.t.Õ..&9W.t.Õv.hÉ.h.....•..á..F 0001C0
FFD276FF 2C76FF2E 76FF0001 F046C706 C4830786 063C9A0F A3685016 F2468DCE ö.F·.PhÈ..<....á.úFÞ...v..v,.v0. 0001E0
```

Dump of file SATURN:[PCCOMMON.DUMP.DLL]NEWMETA.TMP;1 on 18-APR-1990 10:48:01.69
File ID (741,17,0)   End of file block 111 / Allocated 112

Virtual block number 17 (00000011), 512 (0200) bytes

```
2E76FF00 30E90003 E9037500 003DB646 89000007 B89A5016 F0468DF2 76FFD076 vÅ.v·.FÞ.P.¡....FÑ=..u.Õ..Õ0..v. 000000
03750000 3DB64689 000007E1 9A0A6A1A 76FF1C76 FF076AD0 76FFD276 FF2C76FF .v,.v0.vÅj..v..v.j..Ä....FÑ=..u. 000020
7400CE7E 83FFFF00 009AE476 FFE676FF 2A76FFFF 5AE904E8 46830007 E90003E9 Õ..Õ...FÒ.ÕZ..v*.vÌ.vÕ......~ö.t 000040
468DCE46 8904C483 079902A0 9A0FA068 0FA46800 76E90374 00B67E83 007FE903 .Õ...~Ñ.t.Õv.hÉ.h........á..Fö.F 000060
FFD076FF D276FF2C 76FF2E76 FF0002F0 46C706C4 83085306 3C9A0FA3 685016F2 ·.PhÈ..<.S..á.úFÞ...v..v,.v0.vÅ. 000080
2C76FF2E 76FF04A8 E90003E9 03750000 3DB64689 000004D0 9A5016F0 468DF276 v·.FÞ.P.Å....FÑ=..u.Õ..Õ´..v..v, 0000A0
0003E903 7500003D B6468900 00080F9A 0A6A1A76 FF1C76FF 076AD076 FFD276FF .v0.vÅj..v..v.j.......FÑ=..u.Õ.. 0000C0
329ABA76 FF1A76FF 1C76FFC2 76FF2076 FF2276FF 2C76FF2E 76FF047C E9047FE9 Õ..Õ|..v..v,.v".v .vÕ.v..v..v¤.2 0000E0
76FF1A76 FF1C76FF C276FF20 76FF2276 FF2C76FF 2E76FF04 59E9B646 89000008 ....FÑÕY..v..v,.v".v .vÕ.v..v..v 000100
1E76FF50 16CE468D E25689E0 46892256 88204688 0436E9B6 46890000 03D99ABA ¤.)....FÑÕ6..F .V".FÅ.Vã.Fö.P.v. 000120
00FFFF9A 5016C846 8DCE76FF E076FFE2 76FF2C76 FF2E76FF 06C48308 A804CF9A .ü.´..á..v..v,.vã.vÅ.vö.Fà.P.... 000140
5EC400A6 E9037502 470B2607 8B26C85E C403F3E9 0003E903 7500003D B6468900 ..FÑ=..u.Õ..Õµ.á^à&..&.G.u.ÕÏ.á^ 000160
2E76FF06 C483054E 061C9A03 6A5016CE 468DFC56 89FA4689 02578B26 078B26C8 à&..&.W..F*.V•.Fö.Pj....N..á..v. 000180
00003DB6 46890000 0B199A50 16EC468D CE76FF37 FF260277 FF26C85E C42C76FF .v,á^à&.w.&.7.vö.Fš.P......FÑ=.. 0001A0
830A2F01 7E9A1676 FF1876FF EC76FFEE 76FF2C76 FF2E76FF 039AE900 03E90375 u.Õ..Õ...v..v,.vŸ.vš.v..v..-./.. 0001C0
FFE076FF E276FF37 FF260277 FF26C85E C400000A 3D9A1676 FF1876FF 504004C4 á.∂P.v..v..=...á^à&.w.&.7.vã.vÅ. 0001E0
```

Dump of file SATURN:[PCCOMMON.DUMP.DLL]NEWMETA.TMP;1 on 18-APR-1990 10:48:01.69
File ID (741,17,0)   End of file block 111 / Allocated 112

Virtual block number 18 (00000012), 512 (0200) bytes

```
47E9B646 8B0006E9 03750000 3DB64689 0EC4830A E41BA59A 2C76FF2E 76FF2A76 v*.v..v,.E.Õ..á..FÑ=..u.Õ...FÑÕG 000000
16C4468D CE76FF2C 76FF2E76 FF06C483 097B0485 9A006A50 16CE468D 011EE903 .Õ...Fö.Pj....(..á..v..v,.vö.Fá. 000020
FC5689FA 4689C656 8BC4468B 030EE900 03E90375 00003DB6 46890000 09C29A50 P.Õ....FÑ=..u.Õ..Õ...Fá.Vó.F*.V= 000040
FFCE76FF E076FFE2 76FF2C76 FF2E76FF 06C48309 E104CF9A 1E76FF50 16CE468D .Fö.P.v..ü.Ä..á..v..v,.vã.vÅ.vö. 000060
2E76FF02 CBE9B646 8B0006E9 03750000 3DB64689 00000A05 9A046AC4 76FFC676 vó.vá¡.......FÑ=..u.Õ...FÑÕü..v. 000080
06E90375 00003DB6 46890000 0B679A50 16EC468D 048236FF 261FB006 8E2C76FF .v,.. ¯.&.6...Fš.P.g....FÑ=..u.Õ. 0000A0
FFC676FF 2C76FF2E 76FF06C4 830AFF06 1C9A036A 5016CE46 8D02A1E9 B6468B00 ..FÑÕÅ..Fö.Pj.......á..v..v,.vó. 0000C0
7500003D B6468900 0008849A 048436FF 261FB006 8EEC76FF EE76FFCE 76FFC476 vá.vö.vŸ.vš..¯.&.6........FÑ=..u 0000E0
5D017E9A 1676FF18 76FFEC76 FFEE76FF 2C76FF2E 76FF025E E9B6468B 0006E903 .Õ...FÑÕ^..v..v,.vŸ.vš.v..v..-.] 000100
E9B6468B 0006E903 7500003D B6468900 000B489A 1676FF18 76FF5040 04C4830A ..á.∂P.v..v..K....FÑ=..u.Õ...FÑÕ 000120
0374D646 0BD4468B D65689D4 468908C4 830A8500 EA9A0490 681E048E 681E0226 &..h...h...õ....á..Få.Vø.Få.Føt. 000140
D476FFD6 76FF08C4 830A9301 C09A1676 FF1876FF D476FFD6 76FF01FC E90003E9 Õ..Õ•..vø.vå.v..v..á....á..vø.vå 000160
6A2876FF 5016BC46 80049968 1E2C76FF 2E76FF2A 76FF006A 04C4830B 3000109A ...*..á.j..v*.v..v,.h...F¥.P.v(j 000180
76FFFE46 891E468B F446892A 468BF856 89F64689 2E568B2C 468B0000 FFFF9A00 .......F,.V..F-.V½.F*.F¶.F..F±.v 0001A0
46890000 FFFF9AFF FF6BFFFF 6850168C 468D0000 FFFF9A50 16F4468D BC76FFBE ƒ.v¥.F¶.P......F¥.Ph..h........F 0001C0
2076FF22 76FF2C76 FF2E76FF 06C4830B BD04CF9A 1E76FF50 16C2468D 017EE9B6 ÑÕ—..Fô.P.v..ü.§..á..v..v,.v".v 0001E0
```

Dump of file SATURN:[PCCOMMON.DUMP.DLL]NEWMETA.TMP;1 on 18-APR-1990 10:48:01.69
File ID (741,17,0)   End of file block 111 / Allocated 112

Virtual block number 19 (00000013), 512 (0200) bytes

76FF2C76 FF2E76FF 002AE903 75EE4608 EC468800 0008D79A 5016EC46 8DC276FF .vô.F$.P.■....F$.FŸu.Õ*..v..v,.v 000000
E9000008 AB9A1676 FF1876FF 504004C4 83089001 7E9A1676 FF1876FF EC76FFEE Ÿ.vš.v..v.‗-....á.ƏP.v..v.. ...Õ 000020
76FF2E76 FF000006 249A5016 EC468004 8236FF26 1FB0068E 2C76FF2E 76FF005D ]..v..v,..¯.&.6...F$.P.$....v..v 000040
76FF2C76 FF2E76FF 0000064F 9ABA76FF EC76FFEE 76FFC276 FF2076FF 2276FF2C ,.v".v .vô.vŸ.vš.vα.O....v..v,.v 000060
E9000004 439A1676 FF1876FF 504004C4 83043501 7E9A1676 FF1876FF EC76FFEE Ÿ.vš.v..v..-.5..á.ƏP.v..v..C...Õ 000080
76FF2076 FF2276FF 2C76FF2E 76FF06C4 8308E404 CF9A1E76 FF5016C2 468D00C0 à..Fô.P.v..ü.Õ..á..v..v,.v".v .v 0000A0
FF2E76FF BA468904 C4830C17 02A09A08 98681E76 FF000004 119A5016 EC468DC2 ô.F$.P......v.h........á..Fα.v.. 0000C0
16C2468D 0066E986 46890000 0C329A16 76FF1876 FFBA76FF EC76FFEE 76FF2C76 v,.vŸ.vš.vα.v..v..2....FÑÕf..Fô. 0000E0
76FF1876 FFC276FF 2076FF22 76FF2C76 FF2E76FF 06C48305 D904CF9A 1E76FF50 P.v..ü.)..á..v..v,.v".v .vô.v..v 000100
A7FF2E93 C0030028 E9037600 0F300898 2D0033E9 0036E986 46890000 07189A16 .......FÑÕ6.Õ3.-..=..v.Õ(..á...Ĩ 000120
0C0C0AF4 0C0C0C0C 0C72083C 07F60C0C 0C0C0C0C 08190606 0BB20C0C 0C0C0C52 R.....ý...........-.<.r.....¶... 000140
0000F046 C7D88E05 3FB81E56 57000012 C8002ACA C95F5E1F 0000E986 46880C0C ...FÑÕ...^_èò*.à...WV.|?..ÄÚFÞ.. 000160
0CD7007B 9A1E76FF 5016FA46 805016FE 4680F246 8902C483 0CAE0000 9A2876FF .v(...Û..á¯..F·.F±.P.F'.P.v..(.■. 000180
16F6468D 5016FC46 8DFFF2E9 0003E900 06E90FA0 EE46C700 0BE91E46 8B0AC483 .á..F.Õ..ÚFŸ..Õ..Õ..Õ·..F■.P.F-. 0001A0
EE76FFF4 468904C4 830CF602 A09AFA76 FF1E76FF 0AC4830C E5007B9A EE76FF50 P.vŸ.(.Í..á..v..v'...-..á..F¶.vŸ 0001C0
16F8468D 0056E9FF FFF046C7 0038E91E 4688F846 8904C483 0D1702A0 9AF676FF .v-......á..F½.F.Õ;.ÚFÞ..ÕV..F½. 0001E0

Dump of file SATURN:[PCCOMMON.DUMP.DLL]NEWMETA.TMP;1 on 18-APR-1990 10:48:01.69
File ID (741,17,0)   End of file block 111 / Allocated 112

Virtual block number 20 (00000014), 512 (0200) bytes

76FF1876 FFF876FF 2076FF22 76FF2C76 FF2E76FF 06C48309 3E063C9A 1E76FF50 P.v..<.>..á..v..v,.v".v .v½.v..v 000000
3DFF8DE9 03770FA3 30001BE9 03730FA0 3D0023E9 0026E9F0 46890000 0C029A16 .......FÞÕ&.Õ#.=..s.Õ..=Ê.w.Õ§.= 000020
C8002ACA C95F5E1F 0000E9F0 46880000 E9FFA5E9 03770FA5 3D0008E9 03730FA4 Ê.s.Õ..=Ê.w.ÕÊ.Õ...FÞÕ...^_èò*.à 000040
468DDE46 8902C483 0D9E0000 9A2876FF 0000DC46 C7D88E0C 87B81E56 57000026 &..WV.|...ÄÚFÊ...v(......á¯.F8.F 000060
0EE90960 DA46C700 0BE91E46 880AC483 0DCF007B 9A1E76FF 5016EA46 805016F2 ·.P.Fõ.P.v..(.ü..á..F.Õ..ÚFÕ'.Õ. 000080
DD007B9A DA76FF50 16E6468D 5016F046 8DFFEAE9 FFEDE903 75096230 0008E900 .Õ..=b.u.ÕÙ.Õõ..FÞ.P.FÌ.P.vÕ.(.Ĩ 0000A0
0E0F02A0 9AE676FF DA76FFE0 468904C4 830DEE02 A09AEA76 FF1E76FF 0AC48300 ..á..v..võ...Ÿ..á..FÅ.vÕ.vÌ..... 0000C0
FC04F49A 1E76FF50 16E8468D 014BE9FF FFDC46C7 0128E91E 468BE846 8904C483 .á..FÒ.F.Õ(.ÚFÉ..ÕK..FÒ.P.v..¶.• 0000E0
46890000 0F179A16 76FF1876 FFE876FF 2076FF22 76FF2C76 FF2E76FF 06C4830E ..á..v..v,.v".v .vÒ.v..v.......F 000100
E90374EE 4608EC46 8BEE5689 EC468908 C4830E62 00EA9A04 A4681E04 A2681EDC É.hÅ..hÊ..õ.b..á..F$.VŸ.F$.FŸt.Õ 000120
1876FFEC 76FFEE76 FF08C483 0E7601C0 9A04AD68 1EEC76FF EE76FF00 FAE90003 ..Õ'..vŸ.vš.hÙ..à.v..á..vŸ.vš.v. 000140
76FF2A76 FF006A04 C48308ED 00109AEC 76FFEE76 FF08C483 0E8401C0 9A1676FF .v..â....á..vŸ.vš...Ú..á.j..v*.v 000160
F646892E 568B2C46 8800000A 829A016A 2876FF50 16E2468D 04B5681E 2C76FF2E ..v,.hç..Fã.P.v(j..ý....F,.V..F- 000180
76FFE476 FFFE4689 1E4688FC 5689FA46 8922568B 204688F4 46892A46 8BF85689 .V½.F*.F¶.F .V".F'.V•.F..F±.võ.v 0001A0
5EE9DC46 8900000A EA9AFFFF 68091868 5016E246 8D00000A DA9A5016 F4468DE2 ā.F¶.P.Ö....Fã.Ph..h...õ....FÉÕ^ 0001C0
E876FF20 76FF2276 FF2C76FF 2E76FF06 C4830C96 04F49A1E 76FF5016 E8468D00 ..FÒ.P.v..¶....á..v..v,.v".v .vÒ 0001E0

Dump of file SATURN:[PCCOMMON.DUMP.DLL]NEWMETA.TMP;1 on 18-APR-1990 10:48:01.69
File ID (741,17,0)   End of file block 111 / Allocated 112

Virtual block number 21 (00000015), 512 (0200) bytes 7709613D 0023E903 7309603D 002BE900 2EE90C46 8900000D 329A1676 FF1876FF .v..v..2....FÉÕ..Õ+.='.s.Õ#.=a.w 000000
8B0000E9 FE80E903 7709643D 0008E903 7309633D FEC8E903 7509623D FFBDE903 .Õ§.=b.u.Õà±=c.s.Õ..=d.w.Õ¯±Õ... 000020
2876FF00 00F046C7 D88E0D77 B81E5657 000012C8 002ACAC9 5F5E1F00 00E90C46 FÉÕ...^_èò*.à...WV.|w..ÄÚFÞ...v( 000040
0AC4830F B4007B9A 1E76FF50 16FA468D 5016FE46 8DF24689 02C4830F 8800009A ......á¯.F·.F±.P.F'.P.v..(.Ç..á. 000060
76FF5016 F6468D50 16FC468D FFF2E900 03E90006 E91068EE 46C7000B E91E468B .F.Õ..ÚFŸh.Õ..Õ..Õ·..F■.P.F-.P.v 000080
F676FFEE 76FFF446 8904C483 0FD302A0 9AFA76FF 1E76FF0A C4830FC2 007B9AEE Ÿ.(.ô..á..v..v'...Æ..á..F¶.vŸ.v- 0000A0
76FF5016 F8468D00 56E9FFFF F046C700 3BE91E46 8BF84689 04C4830F F402A09A ...¶..á..F½.F.Õ;.ÚFÞ..ÕV..F½.P.v 0000C0
2A9A1676 FF1876FF F876FF20 76FF2276 FF2C76FF 2E76FF06 C4830D86 05199A1E .......á..v..v,.v".v .v½.v..v..* 0000E0
75106A3D FFBDE903 7710693D 001BE903 7310683D 0023E900 26E9F046 8900000E ....FÞÕ&.Õ#.=h.s.Õ..=i.w.Õ§.=j.u 000100
000020C8 002ACAC9 5F5E1F00 00E9F046 8B0000E9 FFADE903 75106B3D FFADE903 .ÕÙ.=k.u.ÕÙ.Õ...FÞÕ...^_èò*.à .. 000120
5016FE46 8DE84689 02C48310 7B00009A 2876FF00 00E246C7 D88E0F64 B81E5657 WV.|d..ÄÚFã...v(...(..á¯.ᶜÕ.F±.P 000140
4688011F E903F2E0 46C70108 E91E468B 0AC48310 B0007B9A 1E76FF50 16F4468D .F¶.P.v..(.¯..á..F.Õ..ÚFÅ Õ...F 000160
04859A10 6A5016F6 4680FA56 89F84689 1C568B1A 468BE656 89E44689 22568B20 .V".Fô.VÌ.F..V..F½.V'.F-.:' ... 000180
03750000 30E24689 00000952 9A5016EC 4680F676 FF2C76FF 2E76FF06 C48310E3 D..á..v..v,.v-.F$.P.R....Fã=..u. 0001A0
02A09A11 F868046A 06C48310 F0067C9A 046A5016 F2468001 98E9E246 880006E9 Õ...FãÕ...F·.Pj..|.Þ..á.j.h½.... 0001C0
EA76FFF8 76FFFA76 FFF276FF EC76FFEE 76FF2C76 FF2E76FF EA468904 C4831131 1..á..Fõ.v..v,.vŸ.vš.v·.v'.v½.võ 0001E0

Dump of file SATURN:[PCCOMMON.DUMP.DLL]NEWMETA.TMP;1 on 18-APR-1990 10:48:01.69
File ID (741,17,0)   End of file block 111 / Allocated 112

Virtual block number 22 (00000016), 512 (0200) bytes

```
AD9A0644 685016F2 468D014B E9E24688 0006E903 7500003D E2468900 0011609A .'....Fã=..u.Õ...FãÕK..F·.PhD..Ù 000000
EE76FF2C 76FF2E76 FFEA4689 04C48311 8D02A09A 06406806 446806C4 83113F05 .?..á.hD.ha....§..á..Fõ.v..v,.vŸ 000020
8B0006E9 03750000 3DE24689 00000998 9AF276FF E476FFE6 76FFEA76 FFEC76FF .v$.võ.v|.vô.v·......Fã=..u.Ô... 000040
432D001F E90022E9 0640E046 C7002AE9 002DE907 0DE046C7 0035E900 FCE9E246 FãÕ•.Õ5.úFÀ..Õ-.Õ*.úFÀa.Õ".Õ..-C 000060
FC468D11 80118011 80117810 8E108611 A1A7FF2E 93C003FF EAE90376 00053D06 .=..v.Õõ..â...ÏÀ.....x........F• 000080
04C48311 DC02A09A F476FF1E 76FF0AC4 8311C800 7B9AE076 FF5016F0 46805016 .P.Fþ.P.vÁ.(.ù..á..v..v¶...É..á. 0000A0
2C76FF2E 76FF005C E91E468B F2468904 C4830F73 02A09AF0 76FFE076 FFEA4689 .Fõ.vÁ.vþ...s..á..F·.F.Ô\..v..v, 0000C0
005BE900 5EE9E246 89000011 119AEA76 FF1A76FF 1C76FFF2 76FF2076 FF2276FF .v".v .v·.v..v..vô......FãÕ^.Õ(. 0000E0
FF2076FF 2276FF2C 76FF2E76 FF06C483 106305A0 9A1E76FF 5016F246 800058E9 ÕX..F·.P.v..Ù.c..á..v..v,.v".v . 000100
1AE90376 00083D06 402D0025 E90028E9 E2468900 00100F9A 1676FF18 76FFF276 v·.v..v.......FãÕ(.Õ%.-a.=..v.Õ. 000120
00E9E246 8B121012 10121011 EA120D11 EA121312 13121312 59A7FF2E 93C00300 ..â...ÏY.......õ...õ........FãÕ. 000140
A700009A 2876FF00 00E246C7 D88E1054 B81E5657 000020C8 002ACAC9 5F5E1F00 ..^_èò*.à ..WV.¡T..ÄúFã...v(...Ï 000160
E91E4688 0AC48312 E40078 9A 1E76FF50 16F04680 5016FE46 8DE44689 02C48312 ..á¯.Fõ.F±.P.Fþ.P.v..(.õ..á..F.Õ 000180
468BF656 89F44689 22568B20 4688011B E90645E0 46C70123 E903F3E0 46C70108 ..úFÀµ.Õ#.úFÀE.Õ...F .V".F¶.V-.F 0001A0
FF2C76FF 2E76FF06 C4831317 04859A10 6A5016F2 468DFA56 89F84689 1C568B1A ..V..F½.V'.F·.Pj.......á..v..v,. 0001C0
EE468D01 A1E9E246 8B0006E9 03750000 3DE24689 000010C4 9A5016E8 468DF276 v·.FÒ.P.á....Fã=..u.Õ...FãÕÀ..FŸ 0001E0
```

Dump of file SATURN:[PCCOMMON.DUMP.DLL]NEWMETA.TMP;1 on 18-APR-1990 10:48:01.69
File ID (741,17,0)   End of file block 111 / Allocated 112

Virtual block number 23 (00000017), 512 (0200) bytes

```
FF2E76FF E6468904 C4831365 02A09A11 F868046A 06C48313 24067C9A 046A5016 .Pj..|.$..á.j.h½....e..á..F|.v.. 000000
7500003D E2468900 0013949A E676FFF8 76FFFA76 FFEE76FF E876FFEA 76FF2C76 v,.võ.vÒ.vŸ.v'.v½.v|......Fã=..u 000020
07086807 0C6806C4 83137305 D29A070C 685016EE 468D0154 E9E2468B 0006E903 .Ô...FãÕT..FŸ.Ph...@.s..á.h..h.. 000040
F476FFF6 76FFE676 FFE876FF EA76FF2C 76FF2E76 FFE64689 04C48313 ED02A09A ...Ù..á..F|.v..v,.võ.vÒ.v|.v-.v¶ 000060
C7002EE9 0031E901 05E9E246 8B0006E9 03750000 3DE24689 00001433 9AEE76FF .vŸ.3....Fã=..u.Ô...FãÕ..Õ1.Õ..ú 000080
E9037507 003DFEF8 E9037507 0C3DFEF0 E9037507 0B3D0023 E90026E9 0708E046 FÀ..Õ&.Õ#.=..u.Õþ±=..u.Õ½±=..u.Õ 0000A0
8313FB00 7B9AE076 FF5016EC 468D5016 FC468DFF D2E9FFD2 E9037507 0E3DFEE8 Ò±=..u.Õ@.Õ@..F•.P.Fš.P.vÀ.(.«.. 0000C0
C483144B 02A09AEC 76FFE076 FFE64689 04C48314 0C02A09A F076FF1E 76FF0AC4 á..v..vþ......á..F|.vÁ.vš...K..á 0000E0
FF1A76FF 1C76FFEE 76FF2076 FF2276FF 2C76FF2E 76FF0059 E91E468B EE468904 ..FŸ.F.ÕY..v..v,.v".v .vŸ.v..v.. 000100
06C48312 1E05D29A 1E76FF50 16EE468D 0068E900 6BE9E246 89000012 039AE676 v|......FãÕk.Õh..FŸ.P.v..@....á. 000120
0038E9E2 46890000 12399A16 76FF1876 FFEE76FF 2076FF22 76FF2C76 FF2E76FF .v..v,.v".v .vŸ.v..v..9....FãÕ8. 000140
143D141A 14401440 14401486 A7FF2E93 C003002A E9037600 103D0708 2D0035E9 Õ5.-..=..v.Õ*..à...Ï..a.a.a,..=. 000160
5E1F0000 E9E24688 14401440 14401440 14401440 14401440 14401440 143D141A ..=.a.a.a.a.a.a.a.a.a.a..FãÕ...^ 000180
89FC4689 22568B20 468B0000 DE46C7D8 8E12808B 1E565700 0024C800 2ACAC95F _èò*.à$..WV.¡...ÄúFß...F .V".F•. 0001A0
007B9A1E 76FF5016 EC468050 16FA468D E0468902 C48314F0 00009A28 76FFFE56 V±.v(...þ..á..FÀ.F'.P.Fš.P.v..(. 0001C0
8BFE5689 FC468922 568B2046 8B0108E9 03F4DC46 C700FDE9 1E468B0A C4831525 %..á..F.Õ».úFÉ¶.Õ...F .V".F•.V±. 0001E0
```

Dump of file SATURN:[PCCOMMON.DUMP.DLL]NEWMETA.TMP;1 on 18-APR-1990 10:48:01.69
File ID (741,17,0)   End of file block 111 / Allocated 112

Virtual block number 24 (00000018), 512 (0200) bytes

```
2C76FF2E 76FF06C4 83155804 859A106A 5016EE46 8DF25689 F046891C 56881A46 F..V..Fþ.V·.FŸ.Pj....X..á..v..v, 000000
46800208 E90E4688 0006E903 7500003D 0E468900 0012F89A 5016E446 8DEE76FF .vŸ.Fõ.P.½....Fß=..u.Õ...FßÕ...F 000020
2E76FFE2 468904C4 8315A602 A09A11F8 68046A06 C4831565 067C9A04 6A5016EA õ.Pj..|.e..á.j.h½....|..á..Fã.v. 000040
00003DDE 46890000 15D59AE2 76FFF076 FFF276FF EA76FFE4 76FFE676 FF2C76FF .v,.v|.vô.võ.v·.vþ.vã.f....Fß=.. 000060
78680593 6806C483 15B405F7 9A059368 5016EA46 8D01BBE9 DE468800 06E90375 u.Ô...FßÕE..Fõ.Ph...¥.Ç..á.h..hx 000080
76FFFE76 FFE276FF E476FFE6 76FF2C76 FF2E76FF E2468904 C483161B 02A09A05 .......á..Fã.v..v,.v|.vô.vã.v±.v 0000A0
DC46C700 1EE9016C E9DE468B 0006E903 7500003D DE468900 0016619A EA76FFFC •.vô.a....Fß=..u.Ô...FßÕl.Õ..úFÉ 0000C0
5016F446 8DFFE2E9 FEFBE903 7505933D FEFBE903 7505923D 0013E900 16E90578 x.Õ..Õ..=..u.Õ«±=..u.Õ«±Õã..F¶.P 0000E0
468904C4 83163A02 A09AEC76 FF1E76FF 0AC48316 29007B9A DC76FF50 16E8468D .FÒ.P.vÉ.(.)..á..v..vš...:..á..F 000100
76FF2C76 FF2E76FF 008DE91E 4688EA46 8904C483 167902A0 9AE876FF DC76FFE2 ã.vÉ.vÒ...y..á..Fõ.F.Õ§..v..v,.v 000120
468D00E2 E900E5E9 DE468900 0013459A E276FF1A 76FF1C76 FFEA76FF FC76FFFE ±.v•.vô.v..v..vã.E....FßÕÏ.Õã..F 000140
1876FFEA 76FFFC76 FFFE76FF 2C76FF2E 76FF06C4 83160205 F79A1E76 FF5016EA õ.P.v..¥.@..á..v..v,.v±.v•.võ.v. 000160
16F6468D 116AFC76 FFFE76FF 2C76FF2E 76FF00B2 E9DE4689 000016F8 9A1676FF .v..½....FßÕÿ..v..v,.v±.v•j..F-. 000180
9A1E76FF 5016EE46 8D008FE9 DE468800 06E90375 00003DDE 46890000 08C69A50 P.á....Fß=..u.Õ...FßÕ...FŸ.P.v.. 0001A0
76FFF676 FFF876FF 2C76FF2E 76FF001D E90375F8 4608F646 8806C483 128F05F7 ¥....á..F-.F½u.Õ...v..v,.v½.v-.v 0001C0
0040E903 76001B3D 05782D00 4BE9004E E9DE4689 00001466 9A1676FF 1876FFEE Ÿ.v..v..f....FßÕN.ÕK.-x.=..v.Õa. 0001E0
```

Dump of file SATURN:[PCCOMMON.DUMP.DLL]NEWMETA.TMP;1 on 18-APR-1990 10:48:01.69
File ID (741,17,0)   End of file block 111 / Allocated 112

Virtual block number 25 (00000019), 512 (0200) bytes

```
166E166E 166E166E 166E166E 166E166E 166E166E 166E166E 1718A7FF 2E93C003 .å...I..n.n.n.n.n.n.n.n.n.n.n.n. 000000
166B1648 169E169E 169E169E 169E169E 169E169E 169E169E 169E169E 169E169E ..........................H.k. 000020
46880000 E646C7D8 8E14BDB8 1E565700 001CC800 2ACAC95F 5E1F0000 E90E4688 .FRÖ...^_èò*.å...WV.¡§..ÄúFl...F 000040
F0468050 16FE4680 E8468902 C4831798 00009A28 76FFF656 89F44689 22568B20 .V".F¶.V-.v(......ó..FÒ.F±.P.Fþ 000060
46C7001E E90021E9 03F0E446 C70016E9 1E46880A C48314D8 00789A1E 76FF5016 .P.v..(.Ä..ó..F.Ö..úFðþ.Ö!.Ö..úF 000080
16F84680 FFE2E9FF DAE90375 07E630FF EAE90375 07D23D00 13E90016 E907D0E4 ðÄ.Ö..Ö..=@.u.Öö.=|.u.ÖÜ.Öä..F½. 0000A0
8904C483 17FB02A0 9AF076FF 1E76FF0A C48317EA 00789AE4 76FF5016 EC468D50 P.F§.P.vö.(.ö..ó..v..vþ...«..ó.. 0000C0
FF2C76FF 2E76FF00 C2E91E46 8BEE4689 04C48318 3F02A09A EC76FFE4 76FFEA46 Fö.vö.vš...?..ó..FŸ.F.Öô..v..v,. 0000E0
FFE646C7 00E6E9E6 46890000 15869AEA 76FF1A76 FF1C76FF EE76FFF4 76FFF676 v-.v¶.vŸ.v..v..vö......FlÖl.úFl. 000100
F476FFF6 76FF2C76 FF2E76FF 06C48318 9805889A 1E76FF50 16EE4680 000EE9FF .ÖR..FŸ.P.v.......ó..v..v,.v-.v¶ 000120
F476FFF6 76FF2C76 FF2E76FF 00AEE9E6 46890000 18BE9A16 76FF1876 FFEE76FF .vŸ.v..v..ƒ....FlÖÜ..v..v,.v-.v¶ 000140
F2468000 8BE9E646 8B0006E9 03750000 3DE64689 000016B2 9A5016FA 46800E6A j..F'.P.ý....Fl=..u.Ö...FlÖ...F· 000160
76FF2C76 FF2E76FF 001DE903 75FC4608 FA468806 C4831780 05889A1E 76FF5016 .P.v.......ó..F'.F=u.Ö... '..v,.v 000180
193D07D0 2D0047E9 004AE9E6 46890000 16949A16 76FF1876 FFF276FF FA76FFFC =.v'.v·.v..v.......FlÖJ.Öι -Ä.=. 0001A0
18641834 18341834 18341834 182C1834 1834180E A7FF2E93 C003003C E9037600 .v.Ö<..å...IR.4.4.,.4.4.4.4...d. 0001C0
1834182C 18091864 18641864 18641864 18641864 18641864 18641864 18641864 d.d.d.d.d.d.d.d.d.d.d.d.d...,.4. 0001E0
```

Dump of file SATURN:[PCCOMMON.DUMP.DLL]NEWMETA.TMP;1 on 18-APR-1990 10:48:01.69
File ID (741,17,0)   End of file block 111 / Allocated 112

Virtual block number 26 (0000001A), 512 (0200) bytes

```
00040860 02030063 0004185A 02030013 90002ACA C95F5E1F 0000E9E6 46881834 4..FlÖ...^_èò*......Z...c...m... 000000
00090769 0002007B 0004187B 02030000 0006069E 00020160 00060ED7 0203006F o...■...'...........x...(...i... 000020
000F0EE1 00020092 00040128 02030088 00041822 02030000 000A17DC 00020000 ....É......."......(.......Ä... 000040
00060EE7 02030033 0004066D 02030000 00121765 00020000 00100E3C 00020000 ....<.......e.......m...3...Ó... 000060
000408FB 02030B08 000F0AE7 0005008C 00041539 02030677 000F0EE4 000501A4 É...ö...w...9...¥...Ö.......«... 000080
00F446C7 D88EFFFF B81E5657 00000CC8 00000000 0000014F 00060EA3 0203000C É...È...O.......à...WV.|...ÄúF¶. 0000A0
76FF03F0 680676FF 0876FF01 8DE91E46 8BF64689 02C48301 2600009A 2476FF00 ..v$...&..ó..F-.F.Ö...v..v.hb..v 0000C0
76FF01C1 E9F44689 12C48300 6C00009A 2876FF2A 76FF2676 FF2476FF 1A76FF1C ..v..v$.v&.v*.v(...l..ó..F¶Öè..v 0000E0
C4830095 00AA9A28 76FF2A76 FF2676FF 2476FF1A 76FF1C76 FF03F168 0676FF08 ..v.hþ..v..v..v$.v&.v*.v(.ˆ....ó 000100
FF2A76FF 2676FF24 76FF1A76 FF1C76FF 03F26806 76FF0876 FF0198E9 F4468912 ..F¶Ö...v..v.h·..v..v..v$.v&.v*. 000120
FF1A76FF 1C76FF03 F3680676 FF0876FF 016FE9F4 468912C4 8300BE00 009A2876 v(.../..ó..F¶Öo..v..v.hµ..v..v.. 000140
680676FF 0876FF01 46E9F446 8912C483 00E700AA 9A2876FF 2A76FF26 76FF2476 v$.v&.v*.v(.ˆ.Ó..ó..F¶ÖF..v..v.h 000160
E9F44689 12C48301 1000AA9A 2876FF2A 76FF2676 FF2476FF 1A76FF1C 76FF03F4 ¶..v..v..v$.v&.v*.v(.ˆ....ó..F¶Ö 000180
01DE9A28 76FF2A76 FF2676FF 2476FF1A 76FF1C76 FF03F568 0676FF08 76FF0110 ...v..v.h¥..v..v..v$.v&.v*.v(.ß. 0001A0
76FF2A76 FF06C483 018A053E 9A1E76FF 5016F846 8D00F4E9 F4468912 C483FFFF ...ó..F¶Ö¶..F½.P.v..>....ó..v*.v 0001C0
FF001DE9 0375FE46 0BFC4688 0000FFFF 9A5016FC 4680F876 FF1A76FF 1C76FF28 (.v..v..v½.F=.P......F=.F±u.Ö... 0001E0
```

Dump of file SATURN:[PCCOMMON.DUMP.DLL]NEWMETA.TMP;1 on 18-APR-1990 10:48:01.69
File ID (741,17,0)   End of file block 111 / Allocated 112

Virtual block number 27 (0000001B), 512 (0200) bytes

```
260A5EC4 0007E900 00FFFF9A 0A76FF0C 76FF0100 68FC76FF FE76FF28 76FF2A76 v*.v(.v±.v=h...v..v......Ö..ó^.& 000000
FF06C483 FFFF053E 9A1E76FF 5016F846 800090E9 0093E900 96E90099 E90007C6 6..Ö..Ö..Ö..Ö...F½.P.v..>....ó.. 000020
E90060E9 F4468900 00FFFF9A 0A76FF0C 76FFF876 FF1A76FF 1C76FF28 76FF2A76 v*.v(.v..v..v½.v..v.......F¶Ö'.Ö 000040
7F011801 7F017F01 7F017F01 C5A7FF2E 93C00300 52E90376 00243003 E82D0050 ].-Ö.=$.v.ÖR..å...Ié............ 000060
7F017F01 7F017F01 7F017F01 7C017900 F200C900 A0007700 4E002501 76017F01 ...v.X.N.w...è.·.y.|............ 000080
8B017F01 7F017F01 7F017F01 7F017F01 7F017F01 7F017F01 7F017F01 7F017F01 ................................ 0000A0
2476FF00 00F446C7 D88E0008 B81E5657 00000CC8 0026CAC9 5F5E1F00 00E9F446 F¶Ö...^_èò&.à...WV.j...ÄúF¶...v$ 0000C0
1A76FF1C 76FF04B4 680676FF 0876FF00 E5E91E46 8BF64689 02C48302 A600009A ...l..ó..F-.F.Öl..v..v.hÇ..v..v. 0000E0
0676FF08 76FF0109 E9F44689 12C48302 8800009A 2876FF2A 76FF2676 FF2476FF .v$.v&.v*.v(......ó..F¶Ö...v..v. 000100
F4468912 C483FFFF 00AA9A28 76FF2A76 FF2676FF 2476FF1A 76FF1C76 FF1E76FF .v..v..v..v$.v&.v*.v(.ˆ....ó..F¶ 000120
76FF2A76 FF06C483 03010563 9A1E76FF 5016F846 800008E9 FFFFF446 C700E0E9 ÖÄ.úF¶..ÖÄ..F½.P.v..c....ó..v*.v 000140
FF001DE9 0375FE46 0BFC4688 00000140 9A5016FC 4680F876 FF1A76FF 1C76FF28 (.v..v..v½.F=.P.@....F=.F±u.Ö... 000160
260A5EC4 0007E900 0001659A 0A76FF0C 76FF0100 68FC76FF FE76FF28 76FF2A76 v*.v(.v±.v=h...v..v..e...Ö..ó^.& 000180
FF1C76FF 2876FF2A 76FF06C4 83001705 639A1E76 FF5016F8 4680007D E90007C6 6..Ö)..F½.P.v..c....ó..v*.v(.v.. 0001A0
42E90376 001C3004 B020004D E9F44689 000001A5 9A0A76FF 0C76FFF8 76FF1A76 v..v½.v..v..É....F¶ÖM.-¯.=..v.ÖB 0001C0
6A02F602 F602F602 F602F602 93024102 F6029802 F602F603 39A7FF2E 93C00300 ..å...I9.-.-...-.A...-.-.-.-.-.j 0001E0
```

```
Dump of file SATURN:[PCCOMMON.DUMP.DLL]NEWMETA.TMP;1 on 18-APR-1990 10:48:01.69
File ID (741,17,0)   End of file block 111 / Allocated 112

Virtual block number 28 (0000001C), 512 (0200) bytes

 F602F602 F602F602 F602F602 F602F602 F602F602 F602F602 F6029302 6A026A02 .j.j...-.-.-.-.-.-.-.-.-.  .-.- 000000
 00F046C7 D88E0224 881E5657 000010C8 0026CAC9 5F5E1F00 00E9F446 8802F602 .-..F¶Õ...^_èò&.à...WV.¡$..ÄúFÞ. 000020
 E9E91E46 8BF24689 02C48304 0E00009A 2476FFFE 5689FC46 891C5688 1A468800 ..F..V..F=.V±.v$......á..F·.F.ÕÕ 000040
 F800009A 2876FF2A 76FF2676 FF2476FF FC76FFFE 76FF0592 680676FF 0876FF00 ..v..v.h...v±.v=.v$.v&.v*.v(...½ 000060
 FF2676FF 2476FFFC 76FFFE76 FF059368 0676FF08 76FF010B E9F04689 12C48303 ..á..FÞÕ...v..v.h...v±.v=.v$.v&. 000080
 046705F7 9A1E76FF 5016F446 8D00E2E9 F0468912 C483FFFF 01DE9A28 76FF2A76 v*.v(.ß....á..FÞÕã..F¶.P.v..¼.g. 0000A0
 F0468900 00048D9A 0A76FF0C 76FFF476 FFFC76FF FE76FF28 76FF2A76 FF06C483 .á..v*.v(.v±.v=.v¶.v..v.......FÞ 0000C0
 0030F046 89000002 C09A5016 F8468011 6AFC76FF FE76FF28 76FF2A76 FF00B2E9 Õý..v*.v(.v±.v=j..F½.P.â....FÞ=. 0000E0
 0BF84688 06C48302 3305F79A 1E76FF50 16F44680 008FE9F0 46880006 E9037500 .u.Õ...FÞÕ...F¶.P.v..¼.3..á..F½. 000100
 00031C9A 0A76FF0C 76FFF476 FFF876FF FA76FF28 76FF2A76 FF001DE9 0375FA46 F'u.Õ...v*.v(.v'.v½.v¶.v..v..... 000120
 03040304 ADA7FF2E 93C00300 40E90376 001B3005 78200048 E9004EE9 F0468900 ..FÞÕN.ÕK.-x.=..v.Õa..â...ÌÙ.... 000140
 33043304 33043304 33043304 03040304 03040304 03040304 03040304 03040304 ....................3.3.3.3.3.3 000160
 CAC95F5E 1F0000E9 F0468803 DA03B104 33043304 33043304 33043304 33043304 .3.3.3.3.3.3.3.3.Ÿ.Õ..FÞÕ...^_èò 000180
 468902C4 83057C00 009A2476 FF0000F4 46C7D88E 0388881E 56570000 10C80026 &.à...WV.¡...ÄúF¶...v$...|..á¯..F 0001A0
 76FF1A76 FF1C76FF 08986806 76FF0876 FF01A4E9 FFFFF446 C70179E9 1E468BF6 ~.F.Õy.úF¶..ÕÉ..v..v.h...v..v..v 0001C0
 A0680676 FF0876FF 0178E9F4 468912C4 83056602 A89A2876 FF2A76FF 2676FF24 $.v&.v*.v(.´.f..á..F¶Õ(..v..v.h. 0001E0

Dump of file SATURN:[PCCOMMON.DUMP.DLL]NEWMETA.TMP;1 on 18-APR-1990 10:48:01.69
File ID (741,17,0)   End of file block 111 / Allocated 112

Virtual block number 29 (0000001D), 512 (0200) bytes

 52E9F446 8912C483 05EA02A8 9A2876FF 2A76FF26 76FF2476 FF1A76FF 1C76FF08 ..v..v..v$.v&.v*.v(.´.õ..á..F¶ÕR 000000
 F876FF1A 76FF1C76 FF2876FF 2A76FF06 C4830623 04CF9A1E 76FF5016 F8468D01 ..F½.P.v..ü.#..á..v*.v(.v..v..v½ 000020
 76FFFE76 FF2876FF 2A76FF00 1DE90375 FE4608FC 46880000 04479A50 16FC4680 .F=.P.G....F=.F±u.Õ...v*.v(.v±.v 000040
 FF0C76FF 00F7E900 07C6260A 5EC40007 E9000002 E59A0A76 FF0C76FF 010068FC =h...v..v..Î...Õ..á^.&6..Õ%..v.. 000060
 8912C483 06120510 9A2876FF 2A76FF26 76FF2476 FF1A76FF 1C76FF1E 76FF0A76 v..v..v..v..v$.v&.v*.v(......á.. 000080
 9A2876FF 2A76FF26 76FF2476 FF1A76FF 1C76FF08 9A685016 F0468D00 CEE9F446 F¶Õö..FÞ.Ph...v..v..v$.v&.v*.v(. 0000A0
 76FF2A76 FFF84689 04C48306 6802A09A 08986808 9A68F446 8912C483 FFFF0000 .....á..F¶h..h.....h..á..F½.v*.v 0000C0
 FF2676FF F4468900 0006839A 0A76FF0C 76FFF876 FF37FF26 0277FF26 F05EC428 (á^Þ&.w.&.7.v½.v..v.......F¶.v&. 0000E0
 2A76FF06 C48303A3 04CF9A1E 76FF5016 F8468000 66E9FFFF 00009AF0 76FFF276 v·.vÞ.....Õf..F½.P.v..ü.É..á..v* 000100
 0033E900 36E9F446 89000004 299A0A76 FF0C76FF F876FF1A 76FF1C76 FF2876FF .v(.v..v..v½.v..v..)....F¶Õ6.Õ3. 000120
 5D065D05 17051F05 F5065D06 5D06A3A7 FF2E93C0 030028E9 0376000F 3D08982D -..=..v.Õ(..â...ÌÉ.].].%.....].] 000140
 0026CAC9 5F5E1F00 00E9F446 88065006 50057106 5D065D06 C305CC05 48065D06 .].H.ä.û.].].q.].]..F¶Õ...^_èò&. 000160
 88F64689 02C48307 3100009A 2476FF00 00F446C7 D88E04FA 881E5657 00000CC8 à...WV.¡*..ÄúF¶...v$...1..á¯.F-. 000180
 FF2476FF 1A76FF1C 76FF0FA5 680676FF 0876FF00 7CE9FFFF F446C700 61E91E46 F.Õa.úF¶..Õ|..v..v.hÉ..v..v..v$. 0001A0
 3C9A1E76 FF5016F8 46800053 E9F44689 12C48305 3D00AA9A 2876FF2A 76FF2676 v&.v*.v(.¯.=..á..F¶ÕS..F½.P.v..< 0001C0
 00000645 9A0A76FF 0C76FFF8 76FF1A76 FF1C76FF 2876FF2A 76FF06C4 83050906 ....á..v*.v(.v..v..v½.v..v..E... 0001E0

Dump of file SATURN:[PCCOMMON.DUMP.DLL]NEWMETA.TMP;1 on 18-APR-1990 10:48:01.69
File ID (741,17,0)   End of file block 111 / Allocated 112

Virtual block number 30 (0000001E), 512 (0200) bytes

 A53DFF87 E903750F A43DFFC0 E903770F A33D0018 E903730F A03D0023 E9F44689 .F¶Õ#.=..s.Õ..=É.w.Õá.=É.u.Õ..=É 000000
 06D8881E 56570000 0CC80026 CAC95F5E 1F0000E9 F4468800 00E9FF87 E903750F .u.Õ..Õ...F¶Õ...^_èò&.à...WV.¡Ä. 000020
 76FF0876 FF0082E9 1E4688F6 468902C4 83080800 009A2476 FF0000F4 46C7D88E .ÄúF¶...v$......á¯..F-.F.Õ...v..v 000040
 468912C4 8307F201 FE9A2876 FF2A76FF 2676FF24 76FF1A76 FF1C76FF 09636806 .hc..v..v..v$.v&.v*.v(.±.·..á..F 000060
 9A2876FF 2A76FF26 76FF2476 FF1A76FF 1C76FF09 64680676 FF0876FF 007CE9F4 ¶Õ|..v..v.hd..v..v..v$.v&.v*.v(. 000080
 2A76FF06 C48306E7 04F49A1E 76FF5016 F8468D00 53E9F446 8912C483 071B03DC É....á..F¶ÕS..F½.P.v..¶.Ó..á..v* 0000A0
 09603D00 23E9F446 89000007 4C9A0A76 FF0C76FF F876FF1A 76FF1C76 FF2876FF .v(.v..v..v½.v..v..L....F¶Õ#.=`. 0000C0
 0000E9FF 87E90375 09643DFF 66E90375 09633DFF C0E90377 09623D00 18E90373 s.Õ..=b.w.Õá.=c.u.Õf.=d.u.Õ..Õ.. 0000E0
 76FF0000 F646C7D8 8E078E88 1E565700 000AC800 26CAC95F 5E1F0000 E9F44688 .F¶Õ...^_èò&.à...WV.¡...ÄúF-...v 000100
 76FF1C76 FF106A68 0676FF08 76FF0059 E91E4688 F8468902 C48308B6 00009A24 $...Ñ..á¯..F½.F.ÕY..v..v.hj..v..v 000120
 5016FA46 800053E9 F6468912 C48307C9 01549A28 76FF2A76 FF2676FF 2476FF1A ..v$.v&.v*.v(.T.è..á..F-ÕS..F*.P 000140
 0A76FF0C 76FFFA76 FF1A76FF 1C76FF28 76FF2A76 FF06C483 07900519 9A1E76FF .v.......á..v*.v(.v..v..v'.v..v. 000160
 0375106A 3DFFC0E9 03771069 3D0018E9 03731068 3D0023E9 F6468900 0008239A .#....F-Õ#.=h.s.Õ..=i.w.Õâ.=j.u. 000180
 57000006 C80026CA C95F5E1F 0000E9F6 46880000 E9FFB0E9 0375106B 3DFFBFE9 Õ..=k.u.Õ¯.Õ...F-Õ...^_èò&.à...W 0001A0
 00B3E91E 468BFC46 8902C483 09BE0000 9A2476FF 0000FA46 C7D88E08 65881E56 V.¡e..ÄúF*...v$...ƒ..á¯..F=.F.Õ°. 0001C0
 09770000 9A2876FF 2A76FF26 76FF2476 FF1A76FF 1C76FF06 43680676 FF0876FF .v..v.hC..v..v..v$.v&.v*.v(...w. 0001E0
```

Dump of file SATURN:[PCCOMMON.DUMP.DLL]NEWMETA.TMP;1 on 18-APR-1990 10:48:01.69
File ID (741,17,0)   End of file block 111 / Allocated 112

Virtual block number 31 (0000001F), 512 (0200) bytes

```
76FF2676 FF2476FF 1A76FF1C 76FF0644 680676FF 0876FF00 AFE9FA46 8912C483 .6..F'Õ£..v..v.hD..v..v..v$.v&.v 000000
76FF1C76 FF064568 0676FF08 76FF0086 E9FA4689 12C48309 A001DE9A 2876FF2A *.v(.B....6..F'Õ...v..v.hE..v..v 000020
FFFFFA46 C70050E9 FA468912 C483FFFF 00AA9A28 76FF2A76 FF2676FF 2476FF1A ..v$.v&.v*.v(.ˆ....6..F'Õ].úF'.. 000040
FF1A76FF 1C76FF28 76FF2A76 FF06C483 087405AD 9A1E76FF 5016FE46 800055E9 ÕU..F±.P.v..Ü.t..6..v*.v(.v..v.. 000060
C003001A E9037600 08300640 2D0025E9 FA468900 0008D19A 0A76FF0C 76FFFE76 v±.v..v..i....F'Õ%.-@.=..v.Õ...â 000080
5E1F0000 E9FA468B 09AB09AB 09AB0982 09590930 09B309B3 09B309F6 A7FF2E93 ...Ĩ-.°.°.°.0.Y...¨.¨.¨..F'Õ...^ 0000A0
C4830AC8 00009A24 76FF0000 FA46C7D8 8E0913B8 1E565700 0006C800 26CAC95F _èò&.à...WV.¡...ÄúF'...v$...à..6 0000C0
FF2676FF 2476FF1A 76FF1C76 FF070B68 0676FF08 76FF0083 E91E468B FC468902 ¯..F=.F.Õ°..v..v.h...v..v..v$.v&. 0000E0
FF1C76FF 070C6806 76FF0876 FF00BFE9 FA468912 C4830A81 00009A28 76FF2A76 v*.v(......6..F'Õ¢..v..v.h...v.. 000100
FF0876FF 0096E9FA 468912C4 830AAA01 DE9A2876 FF2A76FF 2676FF24 76FF1A76 v..v$.v&.v*.v(.B.ˆ..6..F'Õ...v.. 000120
8912C483 FFFF0000 9A2876FF 2A76FF26 76FF2476 FF1A76FF 1C76FF07 00680676 v.h...v..v..v$.v&.v*.v(......6.. 000140
2A76FF06 C4830922 05D29A1E 76FF5016 FE468D00 65E9FFFF FA46C700 60E9FA46 F'Õm.úF'..Õe..F±.P.v..@."..â..v* 000160
07082000 35E9FA46 89000009 D99A0A76 FF0C76FF FE76FF1A 76FF1C76 FF2876FF .v(.v..v..v±.v..v..l....F'Õ5.-.. 000180
0AB00AB5 0A8C0A63 0A3A0ABD 0AB50ABD 0B00A7FF 2E93C003 002AE903 7600103D =..v.Õ*..á...Ĩ..§.ç.§.:.c...ç.§. 0001A0
C80026CA C95F5E1F 0000E9FA 46880ABD 0ABD0ABD 0ABD0ABD 0ABD0ABD 0ABD0ABD §.§.§.§.§.§.§.§.§..F'Õ...^_èò&.à 0001C0
9A2476FF FA5689F8 46891C56 881A468B 0000F246 C7D88E0A 1DB81E56 5700000E ...WV.¡...ÄúF·...F..V..F½.V'.v$. 0001E0
```

Dump of file SATURN:[PCCOMMON.DUMP.DLL]NEWMETA.TMP;1 on 18-APR-1990 10:48:01.69
File ID (741,17,0)   End of file block 111 / Allocated 112

Virtual block number 32 (00000020), 512 (0200) bytes

```
FFF876FF FA76FF07 E6680676 FF0876FF 00C8E91E 468BF446 8902C483 089C0000 .....6..F¶.F.Õà..v..v.hl..v'.v½. 000000
DEE9FFFF F246C700 E6E9F246 8912C483 FFFF00AA 9A2876FF 2A76FF26 76FF2476 v$.v&.v*.v(.ˆ....6..F·Õl.úF·..ÕR 000020
F676FFF8 76FFFA76 FF2876FF 2A76FF06 C4830BF5 05889A1E 76FF5016 F6468D00 ..F-.P.v....X..6..v*.v(.v'.v½.v- 000040
8D0E6AF8 76FFFA76 FF2876FF 2A76FF00 AEE9F246 8900000C 1B9A0A76 FF0C76FF .v..v.......F·ÕÜ..v*.v(.v'.v½j.. 000060
FF5016F6 46800088 E9F2468B 0006E903 7500003D F2468900 0005969A 5016FC46 F=.P......F·=..u.Õ...F·Õ...F-.P. 000080
76FFFE76 FF2876FF 2A76FF00 1DE90375 FE4608FC 468806C4 830A2C05 889A1E76 v.......6..F=.F±u.Õ...v*.v(.v±.v 0000A0
03760019 3D07D02D 0047E900 4AE9F246 8900000A E39A0A76 FF0C76FF F676FFFC =.v-.v..v..D....F·ÕJ.ÕG.-Å.=..v. 0000C0
C10BC10B C10B910B 910B910B 910B910B 910B910B 910C38A7 FF2E93C0 03003CE9 Õ<..â...Ĩ;................è.è.è 0000E0
880B910B 910B8908 600BC10B C10BC10B C10BC10B C10BC10B C10BC10B C10BC10B .è.è.è.è.è.è.è.è.è.è.è.'........ 000100
5F000200 00000700 43000200 7B00040B D5020300 0026CAC9 5F5E1F00 00E9F246 F·Õ...^_èò&....{...(...C......._ 000120
CF000200 00000809 4E000200 00000A0B 52000200 00000906 58000200 00000802 .......X.......R.......N.......Ũ 000140
37000200 00000F08 A0000200 00000E0B 7E000200 0000000A 58000200 00000C03 .......X.......~...............7 000160
00000000 00000000 00000000 5500040B B7020300 D0000405 BB020300 0000120B .......£...Å...ñ...U............ 000180
46C60789 26024789 26000088 065EC400 00C246C7 D88EFFFF BB1E5657 00004CC8 àL..WV.¡...ÄúFô..á^.¡..&.G.&..6F 0001A0
00003DC2 46890000 FFFF9A50 16BE468D 2876FF2A 76FF00C4 46C600B4 46C600E8 Ò.6FÇ.6Fá..v*.v(.Ff.P......Fô=.. 0001C0
2876FF2A 76FF06C4 83000704 AA9A656A 5016E646 8D0133E9 C2468800 06E90375 u.Õ...FöÕ3..Fl.Pje.ˆ.#..6..v*.v( 0001E0
```

Dump of file SATURN:[PCCOMMON.DUMP.DLL]NEWMETA.TMP;1 on 18-APR-1990 10:48:01.69
File ID (741,17,0)   End of file block 111 / Allocated 112

Virtual block number 33 (00000021), 512 (0200) bytes

```
468B0006 E9037500 003DC246 890000FF FF9A5016 CE468DE6 76FF8E76 FFC076FF .vå.v/.vl.Fö.P......Fô=..u.Õ...F 000000
10C483FF FF07939A 1A76FF1C 76FF5016 E8468D50 16B44680 006A006A 00FAE9C2 õÕ'.j.j..FÇ.P.FÒ.P.v..v.......6. 000020
FC5EC4FE 5689FC46 89005688 CE468800 CDE9C246 880006E9 03750000 3DC24689 .Fô=..u.Õ...FöÕë..Fö.VÅ.F=.V±á^= 000040
FF2A76FF 06C483FF FF04CF9A 08986850 16E64680 0098E903 7502470B 26078826 &..&.G.u.Õ...Fl.Ph...ü....6..v*. 000060
7500003D C2468900 00FFFF9A 5016D246 8DE676FF 37FF2602 77FF26FC 5EC42876 v(á^=&.w.&.7.vl.F@.P......Fô=..u 000080
5016E846 8D0063E9 C2468800 0001569A CE76FFD0 76FF2876 FF2A76FF 0017E903 .Õ...v*.v(.vÅ.vö.V....FöÕc..FÒ.P 0000A0
C4025788 26078826 FC5EC400 28E90374 00003D08 C483FFFF 01549A50 16D24680 .F@.P.T....6.=..t.Õ+.á^=&..&.W.6 0000C0
001EE900 00880000 01749ACE 76FFD076 FF2876FF 2A76FF02 57892607 8926065E ^.&..&.W..v*.v(.vÅ.vö.t...¡..Õ.. 0000E0
5E1F0000 E90000B8 0000FFFF 9ACE76FF D076FF28 76FF2A76 FFFF56E9 04FC4683 .F=.ÕV..v*.v(.vÅ.vö.....¡..Õ...^ 000100
02478926 0000B806 5EC40000 AE46C7D8 8E0008B8 1E565700 0060C800 26CAC95F _èò&.à'..WV.¡...ÄúFÛ..á^.¡..&.G. 000120
E9037418 460B1646 8800CA46 C6008046 C6008E46 C600A046 C600E846 C6078926 Ĩ..6FÒ.6F..6Ff.6F¯.6Fò..F..F.t.Õ 000140
AE468B00 06E90375 00003DAE 46890000 00369A50 16AA4680 2876FF2A 76FF0033 3..v*.v(.Fˆ.P.6....FÛ=..u.Õ...FÛ 000160
5689AA46 8918568B 16468800 1CE906C4 83020C04 AA9A646A 5016C846 8D0237E9 Õ7..Fà.Pjd.ˆ....6.Õ...F..V..Fˆ.V 000180
C876FFAA 76FFAC76 FF2876FF 2A76FF06 C483028F 05889A07 E6685016 C8468DAC ˆ.Fà.Phl.......6..v*.v(.v¯.v¯.và 0001A0
50168E46 8D01DFE9 AE468800 06E90375 000030AE 46890000 006F9A50 16BA4680 .F¤.P.o....FÛ=..u.Õ...FÛÕÕ..Ff.P 0001C0
03750000 3DAE4689 10C48300 9B07939A 1A76FF1C 76FF5016 E8468D50 16A04680 .F..P.FÒ.P.v..v.......6..FÛ=..u. 0001E0
```

```
Dump of file SATURN:[PCCOMMON.DUMP.DLL]NEWMETA.TMP;1 on 18-APR-1990 10:48:01.69
File ID (741,17,0)   End of file block 111 / Allocated 112

Virtual block number 34 (00000022), 512 (0200) bytes

 7502470B 26078B26 FC5EC4FE 5689FC46 89BC5688 8A468B01 81E9AE46 8B0006E9 õ...FÜÕŸ..F¤.V¥.F•.V±á^=&..&.G.u 000000
 77FF26FC 5EC42876 FF2A76FF 06C48300 55053E9A 03E86850 16C8468D 017FE903 .õ...Fà.Phò..>.U..á..v*.v(á^=&.w 000020
 FF2A76FF 0017E903 7500003D AE468900 0000F59A 5016D446 8DC876FF 37FF2602 .&.7.và.Få.P.¥....FÜ=..u.õ...v*. 000040
 16C8468D 004FE903 7500A07E 800147E9 AE468B00 0001119A BA76FFBC 76FF2876 v(.v¥.v¤......FÜÕG..-..u.õO..Fà. 000060
 8DC876FF 37FF2602 77FF26FC 5EC42876 FF2A76FF 06C48303 3F053E9A 03E96850 Phõ..>.7..á..v*.v(á^=&.w.&.7.và. 000080
 BA76FFBC 76FF2876 FF2A76FF 0017E903 7500003D AE468900 00035D9A 5016B046 F¯.P.]....FÜ=..u.õ...v*.v(.v¥.v¤ 0000A0
 ED053E9A 03EA6850 16C8468D 004FE903 7500BE7E 8000EFE9 AE468B00 0003799A .y....FÜÕÿ..-ƒ.u.õO..Fà.Phõ..>.Ú 0000C0
 0002AD9A 5016CA46 8DC876FF 37FF2602 77FF26FC 5EC42876 FF2A76FF 06C48301 ..á..v*.v(á^=&.w.&.7.và.Fò.P.Ù.. 0000E0
 AE468B00 0003F29A BA76FFBC 76FF2876 FF2A76FF 0017E903 7500003D AE468900 ..FÜ=..u.õ...v*.v(.v¥.v¤.·....FÛ 000100
 A0468000 5FE90374 00003D08 C48303AA 01549A50 16D4468D 5016E846 800097E9 õ...FÒ.P.Få.P.T.ˆ..á.=..t.õ ..F. 000120
 16CA468D 5016BE46 8D0045E9 03740000 3D08C483 03C40154 9A50168D 468D5016 .P.F¯.P.T.á..á.=..t.õE..Fƒ.P̄.Fò. 000140
 8926065E C4025788 26078B26 FC5EC400 2BE90374 00003D08 C4830128 01549A50 P.T.(..á.=..t.õ+.á^=&..&.W.á^.&. 000160
 04FC4683 001EE900 00B80000 04109ABA 76FFBC76 FF2876FF 2A76FF02 57892607 .&.W..v*.v(.v¥.v¤.....|..õ...F•. 000180
 26CAC95F 5E1F0000 E90000B8 000002C9 9ABA76FF BC76FF28 76FF2A76 FFFE72E9 õr±.v*.v(.v¥.v¤.è...|..õ...^ èò& 0001A0
 8B078926 02478926 0000B806 5EC40000 E046C7D8 8E018D88 1E565700 0024C800 .à$..WV.|...ÄÚFÅ..á^.|..&.G.Ẍ... 0001C0
 00003DE0 46890000 01CE9A50 16DC468D 2876FF2A 76FF0033 E9037418 46081646 F..F.t.õ3..v*.v(.FÉ.P.ö....FÅ=.. 0001E0

Dump of file SATURN:[PCCOMMON.DUMP.DLL]NEWMETA.TMP;1 on 18-APR-1990 10:48:01.69
File ID (741,17,0)   End of file block 111 / Allocated 112

Virtual block number 35 (00000023), 512 (0200) bytes

 16468800 1CE906C4 83049404 AA9A686A 5016FA46 8D0126E9 E0468B00 06E90375 u.õ...FÅÕ&..F*.Pjh.ˆ....á.õ...F. 000000
 FF2876FF 2A76FF06 C48304E9 053E9A03 F1685016 FA468DDE 56890C46 8918568B .V..FÉ.VB.F*.Phþ..>.õ..á..v*.v(. 000020
 E0468B00 06E90375 00003DE0 46890000 02269A50 16F6468D FA76FFDC 76FFDE76 vB.vÉ.v*.F-.P.&....FÅ=..u.õ...FÅ 000040
 468D009C E9037502 47082607 8B26FC5E C4FE5689 FC4689F8 568BF646 8B00CEE9 Õö..F-.V½.F•.V±á^=&..&.G.u.õ...F 000060
 76FF37FF 260277FF 26FC5EC4 2876FF2A 76FF06C4 8302E705 639A04B0 685016FA *.Ph¯..c.Ô..á..v*.v(á^=&.w.&.7.v 000080
 FFF876FF 2876FF2A 76FF0017 E9037500 003DE046 89000003 059A5016 E2468DFA *.Fã.P......FÅ=..u.õ...v*.v(.V½. 0000A0
 08C48303 9001549A 5016E246 8D1A76FF 1C76FF00 64E9E046 8B000005 699AF676 v-.í....FÅÕd..v..v..Fã.P.T....á. 0000C0
 FF2A76FF 02578926 07892606 5EC40257 8B26078B 26FC5EC4 002BE903 7400003D =..t.õ+.á^=&..&.W.á^.&..&.W..v*. 0000E0
 2876FF2A 76FFFF55 E904FC46 83001EE9 0000B800 0005879A F676FFF8 76FF2876 v(.v½.v-.....|..õ...F•.õU..v*.v( 000100
 B81E5657 000024C8 0026CAC9 5F5E1F00 00E90000 B8000003 219AF676 FFF876FF .v½.v-.|...|..õ...^ èò&.à$..WV.| 000120
 33E90374 18460816 46880789 26024789 260000B8 065EC400 00E046C7 D88E0429 )..ÄÚFÅ..á^.|..&.G.Ẍ...F..F.t.õ3 000140
 E9E0468B 0006E903 7500003D E0468900 0004569A 5016DC46 8D2876FF 2A76FF00 ..v*.v(.FÉ.P.V....FÅ=..u.õ...FÅÕ 000160
 DE56890C 46891856 8B164688 001CE906 C4830475 04AA9A66 6A5016FA 468D0126 &..F*.Pjf.ˆ.u..á.õ...F..V..FÉ.VB 000180
 8DFA76FF DC76FFDE 76FF2876 FF2A76FF 06C48306 6004CF9A 08A06850 16FA468D .F*.Ph...ü.'..á..v*.v(.vB.vÉ.v*. 0001A0
 F8568BF6 468B00CE E9E0468B 0006E903 7500003D E0468900 0004AE9A 5016F646 F-.P.Û....FÅ=..u.õ...FÅÕö..F-.V½ 0001C0
 04F49A09 60685016 FA468D00 9CE90375 02470B26 078B26FC 5EC4FE56 89FC4689 .F•.V±á^=&..&.G.u.õ...F*.Ph'..¶. 0001E0

Dump of file SATURN:[PCCOMMON.DUMP.DLL]NEWMETA.TMP;1 on 18-APR-1990 10:48:01.69
File ID (741,17,0)   End of file block 111 / Allocated 112

Virtual block number 36 (00000024), 512 (0200) bytes

 05079A50 16E2468D FA76FF37 FF260277 FF26FC5E C42876FF 2A76FF06 C48305EC $..á..v*.v(á^=&.w.&.7.v*.Fã.P... 000000
 46880000 06E09AF6 76FFF876 FF2876FF 2A76FF00 17E90375 00003DE0 46890000 ...FÅ=..u.õ...v*.v(.v½.v-.Å....F 000020
 C4002BE9 03740000 3D08C483 05380154 9A5016E2 46801A76 FF1C76FF 0064E9E0 ÅÕd..v..v..Fã.P.T.;..á.=..t.õ+.á 000040
 9AF676FF F876FF28 76FF2A76 FF025789 26078926 065EC402 57882607 8B26FC5E ^=&..&.W.á^.&..&.W..v*.v(.v½.v-. 000060
 05239AF6 76FFF876 FF2876FF 2A76FFFF 55E904FC 4683001E E90000B8 000006FE ±...|..õ...F•.õU..v*.v(.v½.v-.#. 000080
 0000EA46 C7D88E05 A0881E56 5700001A C80026CA C95F5E1F 0000E900 00B80000 ..|..õ...^ èò&.à...WV.|...ÄÚFõ.. 0000A0
 EA468900 0005CD9A 5016E646 8D2876FF 2A76FF07 89260247 89260000 B8065EC4 á^.|..&.G.Ẍ...v*.v(.F|.P.ë....Fõ 0000C0
 2A76FF06 C48307AD 04AA9A67 6A5016F0 46800107 E9EA4688 0006E903 7500003D =..u.õ...FõÕ...Fþ.Pjg.ˆ.Ù..á..v* 0000E0
 06E90375 00003DEA 46890000 06259A50 16EC468D F076FFE6 76FFE876 FF2876FF .v(.vÒ.v|.vþ.F§.P.%....Fõ=..u.õ. 000100
 E9037502 47082607 8B26FC5E C4FE5689 FC4689EE 5688EC46 8800CEE9 EA468B00 ..FõÕö..F§.VŸ.F•.V±á^=&..&.G.u.õ 000120
 260277FF 26FC5EC4 2876FF2A 76FF06C4 83060B05 889A07D0 685016F0 468D009C ...Fþ.PhÅ.......á..v*.v(á^=&.w.& 000140
 2876FF2A 76FF0017 E9037500 003DEA46 89000006 7E9A5016 F2468DF0 76FF37FF .7.vþ.F·.P.-....Fõ=..u.õ...v*.v( 000160
 8201549A 5016F246 8D1A76FF 1C76FF00 64E9EA46 8B000008 2D9AEC76 FFEE76FF .vŸ.vš.-....FõÕd..v..v..F·.P.T.ý 000180
 02578926 07892606 5EC40257 8B26078B 26FC5EC4 002BE903 7400003D 08C48306 ..á.=..t.õ+.á^=&..&.W.á^.&..&.W. 0001A0
 76FFFF55 E904FC46 83001EE9 0000B800 000848 9A EC76FFEE 76FF2876 FF2A76FF .v*.v(.vŸ.vš.K...|..õ...F•.õU..v 0001C0
 00004CC8 0026CAC9 5F5E1F00 00E90000 B8000006 9A9AEC76 FFEE76FF 2876FF2A *.v(.vŸ.vš.....|..õ...^_èoᶠ.àL.. 0001E0
```

```
Dump of file SATURN:[PCCOMMON.DUMP.DLL]NEWMETA.TMP;1 on 18-APR-1990 10:48:01.69
File ID (741,17,0)   End of file block 111 / Allocated 112

Virtual block number 37 (00000025), 512 (0200) bytes

 46C60004 46C60789 26024789 26000088 065EC400 00C246C7 D88E0717 B81E5657 WV.|...ÄúFö..á^.|..&.G.&..6Få.6F 000000
 0007399A 5016BE46 8D2876FF 2A76FF00 33E90374 18460816 468800C4 46C60084 Ç.6Fá..F..F.t.Õ3..v*.v(.F/.P.9.. 000020
 C4830758 04AA9A6B 6A5016D2 468D01C4 E9C2468B 0006E903 7500003D C2468900 ..Fö=..u.Õ...FöÕá..F@.Pjk.`.X..á 000040
 06C48309 5D053E9A 03F46850 16024680 C05689BE 46891856 8B16468B 001CE906 .Õ...F..V..F/.Vè.F@.Ph¶..>.]..á. 000060
 7500003D C2468900 0007729A 5016CE46 8D0276FF 8E76FFC0 76FF2876 FF2A76FF .v*.v(.vâ.v/.v@.Fö.P.r....Fö=..u 000080
 939A1A76 FF1C76FF 50160446 8D501684 4680006A 006A016C E9C2468B 0006E903 .Õ...FöÕl.j.j..FÇ.P.Få.P.v..v... 0000A0
 FC468900 5688CE46 8B013FE9 C2468B00 06E90375 00003DC2 468910C4 83025307 .S..á..Fö=..u.Õ...FöÕ7..Fö.VÅ.F• 0000C0
 8309B505 F79A0578 68501602 46800100 E9037502 47082607 8B26FC5E C4FE5689 .V±á^•&..&.G.u.Õ...F@.Phx..¥.ç.. 0000E0
 89000009 D39A5016 E8468DD2 76FF37FF 260277FF 26FC5EC4 2876FF2A 76FF06C4 á..v*.v(á^•&.w.&.7.v@.FÒ.P.Æ.... 000100
 D5E9C246 88000009 EF9ACE76 FFD076FF 2876FF2A 76FF0017 E9037500 003DC246 Fö=..u.Õ...v*.v(.vÅ.vö.ÿ....FöÕ( 000120
 2876FF2A 76FF06C4 83088C05 F79A057C 68501602 4680004F E9037500 B47E8000 ..-Ç.u.ÕO..F@.Ph|..¥.¥..á..v*.v( 000140
 E9037500 0030C246 89000007 CB9A5016 C4468DD2 76FF37FF 260277FF 26FC5EC4 á^•&.w.&.7.v@.Fá.P.ù....Fö=..u.Õ 000160
 46805016 D4468D00 7DE9C246 8800000A 4E9ACE76 FFD076FF 2876FF2A 76FF0017 ...v*.v(.vÅ.vö.N....FöÕ)..Få.P.F 000180
 01549A50 16C4468D 5016B446 800045E9 03740000 3D08C483 0A200154 9A5016E8 Ò.P.T. ..á.=..t.ÕE..FÇ.P.Fá.P.T. 0001A0
 57892607 8926065E C40257BB 26078826 FC5EC400 2BE90374 00003D08 C48307FF ...á.=..t.Õ+.á^•&..&.W.á^.&..&.W 0001C0
 FFFEE4E9 04FC4683 001EE900 00B80000 0A6C9ACE 76FFD076 FF2876FF 2A76FF02 ..v*.v(.vÅ.vö.l...|..Õ...F=.Õô±. 0001E0

Dump of file SATURN:[PCCOMMON.DUMP.DLL]NEWMETA.TMP;1 on 18-APR-1990 10:48:01.69
File ID (741,17,0)   End of file block 111 / Allocated 112

Virtual block number 38 (00000026), 512 (0200) bytes

 001AC800 26CAC95F 5E1F0000 E9000088 000007E7 9ACE76FF D076FF28 76FF2A76 v*.v(.vÅ.vö.Ò...|..Õ...^_èò&.à.. 000000
 460B1646 88078926 02478926 0000B806 5EC40000 EA46C7D8 8E0864B8 1E565700 .WV.|d..ÄúFö..á^.|..&.G.Ī...F..F 000020
 06E90375 00003DEA 46890000 08909A50 16E64680 2876FF2A 76FF0033 E9037418 .t.Õ3..v*.v(.Fl.P......Fö=..u.Õ. 000040
 8918568B 16468800 3FE906C4 830AF004 AA9A696A 5016F046 800149E9 EA468800 ..FöÕl..Fþ.Pji.`.þ..á.Õ7..F..V.. 000060
 76FFE876 FF2876FF 2A76FF06 C4830868 053E9A03 F2685016 F0468DE8 5689E646 Fl.VÒ.Fþ.Ph·..>.h..á..v*.v(.vÒ.v 000080
 76FF2876 FF2A76FF 00F8E9EA 4688EA46 890000FF FF9A0676 FF0876FF F076FFE6 l.vþ.v..v.......Fö.FöÕ½..v*.v(.v 0000A0
 E9EA4688 0006E903 7500003D EA468900 0008F59A 5016EC46 8DF076FF E676FFE8 Ò.vl.vþ.Fš.P.¥....Fö=..u.Õ...FöÕ 0000C0
 F0468000 9CE90375 02470826 078826FC 5EC4FE56 89FC4689 EE5688EC 468800CE ö..Fš.VŸ.F•.V±á^•&..&.G.u.Ñ...Fþ 0000E0
 F076FF37 FF260277 FF26FC5E C42876FF 2A76FF06 C48308DB 05AD9A06 40685016 .Phə..Ù.Ù..á..v*.v(á^•&.w.&.7.vþ 000100
 76FFEE76 FF2876FF 2A76FF00 17E90375 00003DEA 46890000 0978A50 16F24680 .F·.P.(....Fö=..u.Õ...v*.v(.v/.v 000120
 3D08C483 0A060154 9A5016F2 46801A76 FF1C76FF 0064E9EA 46880000 0BE89AEC $.Ò....FöÕd..v..v..F·.P.T....á.= 000140
 76FF2A76 FF025789 26078926 065EC402 57882607 8B26FC5E C4002BE9 03740000 ..t.Õ+.á^•&..&.W.á^.&..&.W..v*.v 000160
 FF2876FF 2A76FFFF 55E904FC 4683001E E9000088 00000C06 9AEC76FF EE76FF28 (.vŸ.vš.....|..Õ...F=.ÕU..v*.v(. 000180
 85881E56 5700001A C80026CA C95F5E1F 0000E900 00880000 09979AEC 76FFEE76 vŸ.vš.....|..Õ...^_èò&.à...WV.|. 0001A0
 0033E903 7418460B 16468807 89260247 89260000 B8065EC4 0000F446 C7D88E0A ..ÄúF¶..á^.|..&.G.Ī...F..F.t.Õ3. 0001C0
 26E9F446 880006E9 03750000 3DF44689 00000AB2 9A5016E6 46802876 FF2A76FF .v*.v(.Fl.P.ý....F¶=..u.Õ...F¶Õ& 0001E0

Dump of file SATURN:[PCCOMMON.DUMP.DLL]NEWMETA.TMP;1 on 18-APR-1990 10:48:01.69
File ID (741,17,0)   End of file block 111 / Allocated 112

Virtual block number 39 (00000027), 512 (0200) bytes

 8DE85689 E6468918 56881646 88001CE9 06C4830C 8A04AA9A 6A6A5016 FA468001 ..F*.Pjj.`....á.Õ...F..V..Fl.VÒ. 000000
 468DFA76 FFE676FF E876FF28 76FF2A76 FF06C483 0CDF053E 9A03F368 5016FA46 F*.Phµ..>.Õ..á..v*.v(.vÒ.vl.v*.F 000020
 89F8568B F6468800 CEE9F446 880006E9 03750000 3DF44689 0000082D 9A5016F6 -.P.-....F¶=..u.Õ...F¶Õö..F-.V½. 000040
 D105D29A 07086850 16FA468D 009CE903 75024708 26078826 FC5EC4FE 5689FC46 F•.V±á^•&..&.G.u.Õ...F*.Ph...@.l 000060
 0008869A 5016EA46 8DFA76FF 37FF2602 77FF26FC 5EC42876 FF2A76FF 06C4830A ..á..v*.v(á^•&.w.&.7.v*.Fö.P.... 000080
 F4468800 00005F9A F676FFF8 76FF2876 FF2A76FF 0017E903 7500003D F4468900 ..F¶=..u.Õ...v*.v(.v½.v-._....F¶ 0000A0
 5EC40028 E9037400 003D08C4 8308BA01 549A5016 EA468D1A 76FF1C76 FF0064E9 Õd..v..v..Fö.P.T.¤..á.=..ī.Õ+.á^ 0000C0
 7D9AF676 FFF876FF 2876FF2A 76FF0257 89260789 26065EC4 02578826 078826FC •&..&.W.á^.&..&.W..v*.v(.v½.v-.) 0000E0
 0008A29A F676FFF8 76FF2876 FF2A76FF FF55E904 FC468300 1EE90000 88000000 ...|..Õ...F•.ÕU..v*.v(.v½.v-.Å.. 000100
 02007800 04080802 03006F00 040CA402 03000926 CAC95F5E 1F0000E9 00008800 .|..Õ...^_èò&....Ê...o.......(.. 000120
 02000000 10003100 02009E00 04001902 03000000 0A0C6800 02000000 09092100 .l.......Ķ...............1...... 000140
 00000000 00000000 00005500 040CFD02 03003300 040C4C02 03000000 120C1F00 .........L...3...»...U.......... 000160
 C7FA4689 02C48300 2F00009A 2076FF00 00F846C7 D88EFFFF B81E5657 000008C8 à...WV.|...ÄúF½...v .../..á..F*ú 000180
 1676FF18 76FF2476 FF2676FF 06C483FF FF04859A FE76FF50 16FC468D 0002FE46 F±...F•.P.v±......á..v&.v$.v..v. 0001A0
 1E565700 0008C800 22CAC95F 5E1F0000 E9F84688 F8468900 00FFFF9A 006A006A j.j.......F½.F½Õ...^_èò".à...WV. 0001C0
 FC468D00 03FE46C7 FA468902 C4830088 00009A20 76FF0000 F846C7D8 8E000888 |...ÄúF½...v ......á¯..F*úF±...F• 0001E0
```

Dump of file SATURN:[PCCOMMON.DUMP.DLL]NEWMETA.TMP;1 on 18-APR-1990 10:48:01.69
File ID (741,17,0) End of file block 111 / Allocated 112

Virtual block number 40 (00000028), 512 (0200) bytes

```
C483FFFF 00B19A24 76FF2676 FF1676FF 1876FF06 C4830017 04B59AFE 76FF5016 .P.v±......á..v..v..v&.v$.Ý....á 000000
E246C7D8 8E0061B8 1E565700 002CC800 22CAC95F 5E1F0000 E9F8468B F8468908 ..F½.F½Õ...^ èò".à,..WV.¡a..ÄúFã 000020
76FF06C4 B3010005 639A04BE 685016EA 468DF656 89F44689 0C568B0A 468B0000 ...F..V..F¶.V̄-.Fõ.Ph/..c.....á..v 000040
02A09A04 B06804BE 680000FF FF9A5016 DE468DEA 76FFF476 FFF676FF 0676FF08 ..v..v-.v¶.võ.FB.P.....h/.h¯.... 000060
03750247 0B26078B 26E65EC4 E85689E6 4689E056 8BDE468B E4468904 C4830070 p..á..Fõ.FB.VÁ.F|.Vòá^|&..&.G.u. 000080
7400013D 0000FFFF 9A216A00 6A04BE68 1E04C968 1E016A00 6A016A00 6A0107E9 Õ..j.j.j.j..hè..h/.j.j!.....=..t 0000A0
FFF476FF F676FF06 76FF0876 FF0039E9 03750247 0B26078B 260E5EC4 00CFE903 .Õü.á^B&..&.G.u.Õ9..v..v..v-.v¶. 0000C0
8B0006E9 03750000 3DE24689 0000FFFF 9AE476FF 37FF2602 77FF26DE 5EC4EA76 võá^B&.w.&.7.võ......Fã=..u.Õ... 0000E0
468D076A 37FF2602 77FF26DE 5EC40676 FF0876FF FFB8E904 DE468302 B1E9E246 FãÕÝ..FB.Õ¡..v..v.á^ß&.w.&.7j..F 000100
FF0676FF 0876FF02 7DE9E246 8B0006E9 03750000 3DE24689 000001CD 9A5016D4 å.P.ë....Fã=..u.Õ...FãÕ)..v..v.. 000120
E9E2468B 0006E903 7500003D E2468900 00FFFF9A 50160B46 8D076AD4 76FFD676 vø.våj..FÁ.P......Fã=..u.Õ...FãÕ 000140
890000FF FF9A5016 DC468D07 6AD876FF DA76FF06 76FF0876 FF0000DC 46C70254 T.úFÉ...v..v..vÖ.vÁj..FÉ.P...... 000160
9AE676FF E876FF06 76FF0876 FF0017E9 0226E9E2 468B0006 E9037500 003DE246 Fã=..u.Õ...FãÕ&.Õ...v..v..vÒ.v|. 000180
12C06802 6A0000FF FF9AE676 FFE876FF 0676FF08 76FF020C E9FFFF88 00000237 7...¡..Õ...v..v..vÒ.v|.....j.há. 0001A0
9A5016F0 468DEA76 FFF476FF F676FF06 76FF0876 FFEA4689 04C48302 7F02A09A ......á..Fõ.v..v..v-.v¶.võ.Fþ.P. 0001C0
D9065C9A 026A5016 E4468D01 C1E9E246 8B0006E9 03750000 3DE24689 000000F3 ¤....Fã=..u.Õ...FãÕè..FÕ Pj..\.\ 0001E0
```

Dump of file SATURN:[PCCOMMON.DUMP.DLL]NEWMETA.TMP;1 on 18-APR-1990 10:48:01.69
File ID (741,17,0) End of file block 111 / Allocated 112

Virtual block number 41 (00000029), 512 (0200) bytes

```
6A0083E9 03750247 0B26078B 26F05EC4 FA5689F8 4689F256 8BF0468B 06C48300 ..á..Fþ.V·.F½.V¹á^þ&..&.G.u.Õ..j 000000
004BE903 7400013D 00000138 9A216A00 6A04F168 1E04FC68 1E016A00 6A016A00 .j.j.j..h•..hþ.j.j!.8...=..t.ÕK. 000020
5EC4EA76 FFF476FF F676FF06 76FF0876 FF0039E9 03750247 0B26078B 26F05EC4 á^þ&..&.G.u.Õ9..v..v..v-.v¶.võá^ 000040
35E9E246 8B0006E9 03750000 3DE24689 00000170 9AE476FF 37FF2602 77FF26F0 þ&.w.&.7.võ.p....Fã=..u.Õ...FãÕ5 000060
E9FFFFB8 0000032F 9AF876FF FA76FF06 76FF0876 FF0017E9 FFB8E904 F0468301 ..Fþ.Õ¡.Õ...v..v..v¹.v½./...¡..Õ 000080
03760563 9A04B468 5016EA46 8D000002 209AFB76 FFFA76FF 0676FF08 76FF0114 ...v..v..v¹.v½. ....Fõ.PhÇ..c.v. 0000A0
3DE24689 000003DA 9A5016FC 468DEA76 FFF476FF F676FF06 76FF0876 FF06C483 .á..v..v..v-.v¶.võ.F•.P.Õ....Fã= 0000C0
76FFE446 8904C483 038702A0 9A04B068 04B46800 C9E9E246 8B0006E9 03750000 ..u.Õ...FãÕè.hÇ.h¯....ñ..á..Fõ.v 0000E0
003DE246 89000002 EC9AE476 FFFC76FF FE76FFEA 76FFF476 FFF676FF 0676FF08 ..v..v-.v¶.võ.v±.v•.võ.š....Fã=. 000100
890000B8 06C48302 4305639A 04B26850 16EA468D 008AE9E2 468B0006 E9037500 .u.Õ...FãÕ...Fõ.Phý..c.C..á.¡... 000120
46890000 01A49A50 16EC468D EA76FFF4 76FFF676 FF0676FF 0876FFEC 4689EE46 FŸ.Fš.v..v..v-.v¶.võ.Fš.P.Ê....F 000140
0676FF08 76FF0022 E90375EE 460BEC46 8B0047E9 E2468B00 06E90375 00003DE2 ã=..u.Õ...FãÕG..Fš.FŸu.Õ"..v..v. 000160
FF0876FF 001AE9E2 468B0006 E9037500 003DE246 89000004 299AEC76 FFEE76FF .vŸ.vš.)....Fã=..u.Õ...FãÕ...v.. 000180
57000066 C8CBC95F 5E1F0000 E9E2468B E2468900 00FFFF9A F476FFF6 76FF0676 v..v-.v¶......Fã.FãÕ...^_èùàf..W 0001A0
C7CC4689 02C48304 6F00009A 2076FF00 00FE46C7 0000CA46 C7D88E00 B9B81E56 V.¡¿..ÄúFò..úF±...v ...o¯.á..Fäú 0001C0
1676FF18 76FF2476 FF2676FF 06C48303 3E04CF9A C876FF50 16CE468D 0898C846 Fà...Fö.P.và.ü.>..á..v&.v$.v..v. 0001E0
```

Dump of file SATURN:[PCCOMMON.DUMP.DLL]NEWMETA.TMP;1 on 18-APR-1990 10:48:01.69
File ID (741,17,0) End of file block 111 / Allocated 112

Virtual block number 42 (0000002A), 512 (0200) bytes

```
FF08C483 FFFF011E 9A5016D0 468D5016 9A468D00 00FFFF9A 50169A46 8DCE76FF .vö.F..P......F..P.FÅ.P......á.. 000000
FF1276FF 1476FF1F A4A5F200 16B91F16 1E0716FC 8B00768D 2EEC8324 76FF2676 v&.v$.š..vÅ.•.....¿...ÊÊ..v..v.. 000020
43B81E56 57000010 C80022CA C95F5E1F 0000E9CA 468BCA46 890000FF FF9AFE76 v±......Fò.FòÕ...^_èò".à...WV.¡C 000040
89F84689 18568B16 468BF446 8902C483 04570000 9A2076FF 0000F246 C7D88E04 ..ÄúF·...v ...W..á¯.F¶.F..V..F½. 000060
00003DF2 46890000 03589A50 16FC468D 066A1676 FF1876FF 2476FF26 76FFFA56 V¹.v&.v$.v..v.j..F•.P.X....F·*.. 000080
6AF876FF FA76FF11 6AFC76FF FE76FF24 76FF2676 FF0064E9 F2468B00 06E90375 u.Õ...F·Õd..v&.v$.v±.v•j..v¹.v½j 0000A0
FE76FF24 76FF2676 FF0038E9 F2468B00 06E90375 00003DF2 46890000 056E9A06 ..n....F·=..u.Õ...F·Õ8..v&.v$.v± 0000C0
76FFFA76 FF2476FF 2676FFF2 46890000 03979A07 6AF876FF FA76FF0A 6AFC76FF .v•j..v¹.v½j.......F·.v&.v$.v¹.v 0000E0
040FB81E 56570000 1AC80022 CAC95F5E 1F0000E9 F2468BF2 46890000 04079AF8 ½......F·.F·Õ...^_èò".à...WV.¡Ò. 000100
468902C4 8305CC00 009A2076 FFFE5689 FC468918 568B1646 8B0000EC 46C7D88E .ÄúF$...F..V..F•.V̄±.v ...ë..á..F 000120
F276FFFC 76FFFE76 FF2476FF 2676FF06 C4830604 04F49A09 63685016 F2468DEE Ÿ.F·.Phc..¶....á..v&.v$.v±.v•.v· 000140
60680963 680124E9 EC468B00 06E90375 00003DEC 46890000 05169A50 16F8468D .F½.P......Fš=..u.Õ...FšÕ$.hc.h' 000160
76FFFA76 FFF276FF FC76FFFE 76FF2476 FF2676FF F0468904 C48304EE 02A09A09 ....Ÿ..á..Fþ.v&.v$.v±.v•.v·.v¹.v 000180
2476FF26 76FF00E5 E9EC468B 0006E903 7500003D EC468900 0005429A F076FFF8 ½.vþ.B....Fš=..u.Õ...FšÕ|..v&.v$ 0001A0
F4468B00 8FE90375 00003DEC 46890000 02609A50 16F4468D 086AFC76 FFFE76FF .v±.v•j..F¶.P.'....Fš=..u.Õ...F¶ 0001C0
FF006DE9 03750247 0B26078B 26E85EC4 04E84683 0004E9EA 5689E846 89F6568B .V-.FÒ.VõÕ...FÒ.á^Õ&..&.G.u.Õm.. 0001E0
```

```
Dump of file SATURN:[PCCOMMON.DUMP.DLL]NEWMETA.TMP;1 on 18-APR-1990 10:48:01.69
File ID (741,17,0)   End of file block 111 / Allocated 112

Virtual block number 43 (0000002B), 512 (0200) bytes

 46890000 06259A07 6A37FF26 0277FF26 E85EC408 6AFC76FF FE76FF24 76FF2676 v&.v$.v±.v=j.6^Ò&.w.&.7j..X....F 000000
 9A2476FF 2676FF37 FF260277 FF26E85E C40070E9 EC468B00 06E90375 00003DEC š=..u.Õ...FšÕp.6^Ò&.w.&.7.v&.v$. 000020
 F99AF476 FFF676FF 2476FF26 76FF0017 E9037500 003DEC46 8908C483 009C0726 &....6..Fš=..u.Õ...v&.v$.v-.v¶.' 000040
 2676FF00 0003189A F476FFF6 76FF2476 FF2676FF FF80E900 36E9EC46 8B000006 ....FšÕ6.Õ...v&.v$.v-.v¶......v& 000060
 1F0000E9 EC468B00 06E90375 00003DEC 46890000 05829AFC 76FFFE76 FF2476FF .v$.v±.v=......Fš=..u.Õ...FšÕ... 000080
 066A0A76 FF0C76FF 0676FF08 76FFD88E 059E881E 56570000 08C80022 CAC95F5E ^_èò".à...WV.¡...Å.v..v..v..v.j. 0000A0
 76FF0876 FF0086E9 041FB800 06E90375 00003DF8 46890000 05E69A50 16FA468D .F'.P.|....F½=..u.Õ..¡..ÕÑ..v..v 0000C0
 2D8B0006 E9037500 003DF846 89000004 899A5016 FE468D05 6A0A76FF 0C76FF06 ..v..v.j..F±.P......F½=..u.Õ..¡- 0000E0
 76FF001E E9037401 FE7E8300 7CE9041F 8B0006E9 0374FC46 08FA468B 0080E904 .Õ...F'.F=t.Õ..¡..Õ|..~±.t.Õ...v 000100
 02FE7E83 002DE900 0007DC9A 0C6AFA76 FFFC76FF 066A0A76 FF0C76FF 0676FF08 ..v..v..v.j..v=.v'j..É...Õ-..~±. 000120
 0000069A 9A096AFA 76FFFC76 FF066A0A 76FF0C76 FF0676FF 0876FF00 1EE90374 t.Õ...v..v..v..v.j..v=.v'j...... 000140
 00003DF8 46890000 070A9A0A 76FF0C76 FF0676FF 0876FF00 28E90420 8B0006E9 Õ..¡ .Õ(..v..v..v..v.......F½=.. 000160
 072E881E 56570000 38C8C8C9 5F5E1F00 00E90000 8B0006E9 0421B800 06E90375 u.Õ..¡I.Õ..¡..Õ...^_èùà8..WV.¡.. 000180
 8D07D0FC 46C7F846 8902C483 084A0000 9A2076FF 0000FE46 C70000F6 46C7D88E .ÄúF-..úF±...v ...J..6..F½úF=Å.. 0001A0
 468DFA76 FF1676FF 1876FF24 76FF2676 FF06C483 05B90588 9AFC76FF 5016FA46 F'.P.v=...¿..6..v&.v$.v..v..v'.F 0001C0
 00FFFF9A FE76FF12 76FF1476 FF5016C8 468D2476 FF2676FF 0000076F 9A5016C8 à.P.o....v&.v$.Fà.P.v..v..v±.... 0001E0

Dump of file SATURN:[PCCOMMON.DUMP.DLL]NEWMETA.TMP;1 on 18-APR-1990 10:48:01.69
File ID (741,17,0)   End of file block 111 / Allocated 112

Virtual block number 44 (0000002C), 512 (0200) bytes

 C846C7D8 8E081E88 1E565700 0066C800 22CAC95F 5E1F0000 E9F6468B F6468900 ..F-.F-Õ...^_èò".àf..WV.¡...ÄúFà 000000
 FF5016CC 468D0578 CE46C7CA 468902C4 8308C500 009A2076 FF0000FE 46C70000 ..úF±...v ...é..6..FòúFöx..Fë.P. 000020
 649A5016 9A468DCC 76FF1676 FF1876FF 2476FF26 76FF06C4 83083205 F79ACE76 vö.¥.2..6..v&.v$.v..v..vë.F..P.d 000040
 8BC84689 0000FFFF 9AFE76FF 1276FF14 76FF5016 9A468D24 76FF2676 FF000008 ....v&.v$.F..P.v..v..v±......Fà. 000060
 2076FF00 00FA46C7 D88E0899 881E5657 000008C8 0022CAC9 5F5E1F00 00E9C846 FàÕ...^_èò".à...WV.¡...ÄúF'...v 000080
 06C48309 2304B59A F876FF50 16FE468D 0005F846 C7FC4689 02C48308 AD00009A ...Ù..6¯..F•úF½...F±.P.v½...#..6. 0000A0
 00E9FA46 8BFA4689 0CC48306 C209689A 2476FF26 76FF1676 FF1876FF 006A006A j.j..v..v..v&.v$.h.ò..6..F'.F'Õ. 0000C0
 0A76FF0C 76FF0676 FF0876FF D88E0914 881E5657 00001EC8 0022CAC9 5F5E1F00 ..^_èò".à...WV.¡...Å.v..v..v..v. 0000E0
 0A468B01 D8E9E646 8B0006E9 03750000 3DE64689 00000A04 9A5016FC 468D056A j..F•.P......F|=..u.Õ...F|ÕÜ..F. 000100
 00000A5C 9A5016F8 468D076A 0A76FF0C 76FF0676 FF0876FF 01CAE903 750C460B .F.u.Õò..v..v..v..v.j..F½.P.\... 000120
 E85EC4EA 5689E846 89FA568B F8468B01 A7E9E646 8B0006E9 03750000 3DE64689 .F|=..u.Õ...F|ÕÏ..F½.V'.FÒ.Võ6^Ò 000140
 468D056A 37FF2602 77FF26E8 5EC40676 FF0876FF 005CE903 7502470B 26078B26 &..&.G.u.Õ\..v..v.6^Ò&.w.&.7j..F 000160
 9AF876FF FA76FF06 76FF0876 FF0017E9 03750000 3DE64689 00000746 9A5016F4 ¶.P.F....F|=..u.Õ...v..v..v'.v½. 000180
 00FFFF9A 0E76FF10 76FFF476 FFF676FF 0676FF08 76FF014E E9E6468B 0000060F Õ....F|ÕÑ..v..v..v-.v¶.v..v..... 0001A0
 00000AA4 9A5016E2 468D066A 0A76FF0C 76FF0676 FF0876FF FF95E904 E8468300 ..FÒ.Õ...v..v..v..v.j..Fã.P.Ê... 0001C0
 EC5EC4EE 5689EC46 89E4568B E2468B01 07E9E646 8B0006E9 03750000 3DE64689 .F|=..u.Õ...F|Õ...Fã.VÕ.Fš.VŸ6^š 0001E0

Dump of file SATURN:[PCCOMMON.DUMP.DLL]NEWMETA.TMP;1 on 18-APR-1990 10:48:01.69
File ID (741,17,0)   End of file block 111 / Allocated 112

Virtual block number 45 (0000002D), 512 (0200) bytes

 468D046A 37FF2602 77FF26EC 5EC40676 FF0876FF 0098E903 7502470B 26078B26 &..&.G.u.Õ...v..v.6^š&.w.&.7j..F 000000
 C40676FF 0876FF00 BFE9E646 8B0006E9 03750000 3DE64689 0000064E 9A5016F0 Þ.P.N....F|=..u.Õ...F|Õ¢..v..v.6 000020
 3DE64689 00000B08 9A096A37 FF260277 FF26F05E C4046A37 FF260277 FF26EC5E ^š&.w.&.7j.6^Þ&.w.&.7j.......F|= 000040
 FF066A37 FF260277 FF26EC5E C40676FF 0876FF00 8BE9E646 8B0006E9 03750000 ..u.Õ...F|Õ...v..v.6^š&.w.&.7j.. 000060
 EC468300 5BE9E646 8B0006E9 03750000 3DE64689 00000B3B 9A096A0A 76FF0C76 v..v.j..;....F|=..u.Õ...F|Õ[..Fš 000080
 89000007 B59A056A 0A76FF0C 76FF086A FC76FFFE 76FF0676 FF0876FF FF59E904 .ÕY..v..v..v±.v=j..v..v.j..ç.... 0000A0
 0007F69A 0A76FF0C 76FF0676 FF0876FF 0028E9E6 468B0006 E9037500 003DE646 F|=..u.Õ...F|Õ(..v..v..v..v..-.. 0000C0
 0008C8CB C95F5E1F 0000E900 008B0006 E9E6468B 0006E903 7500003D E6468900 ..F|=..u.Õ...F|Õ..¡..Õ...^_èùà.. 0000E0
 06FE46C7 FA468902 C4830BAC 00009A20 76FF0000 F846C7D8 8E0970B8 1E565700 .WV.¡p..ÄúF½...v ...¯..6..F'úF±. 000100
 08D59A24 76FF2676 FF1676FF 1876FF06 C4830938 04859AFE 76FF5016 FC468D00 ..F=.P.v±...;..6..v..v..v&.v$.f. 000120
 8E0885B8 1E565700 0016C800 22CAC95F 5E1F0000 E9F8468B F8468908 C4830953 S..6..F½.F¥Õ...^_èò".à...WV.¡... 000140
 46890000 09889A50 16FC468D 056A0A76 FF0C76FF 0676FF08 76FF0000 F246C7D8 ÄúF·...v..v..v..v.j..F=.P......F 000160
 0676FF08 76FF017F E903750C 46080A46 8B0190E9 F2468B00 06E90375 00003DF2 ·=..u.Õ...F·Õ...F..F.u.Õ...v..v. 000180
 F2468B00 06E90375 00003DF2 46890000 09BC9A50 16EA468D 066A0A76 FF0C76FF .v..v.j..Fõ.P.¥....F·=..u.Õ...F· 0001A0
 76FF0098 E9037502 470B2607 8B26F45E C4F65689 F44689EC 568BEA46 8B015CE9 Õ\..Fõ.Vš.F¶.V-6^¶&..&.G.u.Õ...v 0001C0
 00003DF2 46890000 0C2E9A50 16F8468D 046A37FF 260277FF 26F45EC4 0676FF08 ..v.6^¶&.w.&.7j..F½.P......F·=.. 0001E0
```

Dump of file SATURN:[PCCOMMON.DUMP.DLL]NEWMETA.TMP;1 on 18-APR-1990 10:48:01.69
File ID (741,17,0)   End of file block 111 / Allocated 112

Virtual block number 46 (0000002E), 512 (0200) bytes

F85EC404 6A37FF26 0277FF26 F45EC406 76FF0876 FF0114E9 F2468B00 06E90375 u.Õ...F·Õ...v..v.á^¶&.w.&.7j.á^½ 000000
FF00E0E9 F2468B00 06E90375 00003DF2 46890000 0CDA9A09 6A37FF26 0277FF26 &.w.&.7j..Ö....F·=..u.Õ...F·ÕÁ.. 000020
46890000 00369A09 6A0A76FF 0C76FF06 6A37FF26 0277FF26 F45EC406 76FF0876 v..v.á^¶&.w.&.7j..v..v.j..6....F 000040
FF0C76FF 0676FF08 76FFFF59 E904F446 8300B0E9 F2468B00 06E90375 00003DF2 ·=..u.Õ...F·Õ¯..F¶.ÕY..v..v..v.. 000060
FF0080E9 F2468800 06E90375 00003DF2 46890000 0BFA9A50 16EE468D 076A0A76 v.j..FY.P.*....F·=..u.Õ...F·Õ... 000080
00003DF2 46890000 00629A07 6A0A76FF 0C76FF07 6AEE76FF F076FF06 76FF0876 v..v..vb.vŸj..v..v.j..b....F·=.. 0000A0
6A0A76FF 0C76FF0C 6AFC76FF FE76FF06 76FF0876 FF0054E9 F2468B00 06E90375 u.Õ...F·ÕT..v..v..v±.v=j..v..v.j 0000C0
0C76FF06 76FF0876 FF0028E9 F2468B00 06E90375 00003DF2 46890000 0AD89A05 ..Á....F·=..u.Õ...F·Õ(..v..v..v. 0000E0
1F0000E9 00008800 06E9F246 880006E9 03750000 3DF24689 0000085D 9A0A76FF .v..]....F·=..u.Õ...F·Õ..¡..Õ... 000100
0002008B 000102B4 0103006F 00040C76 02030063 000401FB 02030011 CBC95F5E ^_èù....«...c...v...o...Ç....... 000120
02030000 000A0B94 0002007B 0004000A 020300EE 00050A3D 02030000 00050BC0 á.......=...Y.......(........... 000140
0002009E 00040A20 02030113 00050045 02030092 00040CAA 02030103 000508F8 %.......·.......E............... 000160
02030138 000504C3 02030123 0005087D 02030000 001208D0 00020000 0010049A .........ĭ........}...#...û...8... 000180
00F846C7 D88EFFFF B81E5657 000008C8 00000055 000408DF 020300C6 00040D84 ....6...Õ...U...à...WV.¡...ÄúF½. 0001A0
890000FF FF9A5016 FC468D20 76FF2276 FFFA4689 02C483FF FF00009A 1C76FF00 ..v........á..F*.v".v .F=.P...... 0001C0
76FF646A FC76FFFE 76FF0676 FF0876FF 002BE9F8 46880006 E9037500 003DF846 F½=..u.Õ...F½Õ+..v..v..v±.v=jd.v 0001E0

Dump of file SATURN:[PCCOMMON.DUMP.DLL]NEWMETA.TMP;1 on 18-APR-1990 10:48:01.69
File ID (741,17,0)   End of file block 111 / Allocated 112

Virtual block number 47 (0000002F), 512 (0200) bytes

CAC95F5E 1F0000E9 F8468BF8 468912C4 83FFFF03 1E9A2076 FF2276FF 1E76FFFA *.v..v".v ......á..F½.F½Õ...^_èò 000000
468902C4 83001700 009A1C76 FF0000F8 46C7D88E 0008B81E 56570000 08C8001E ..à...WV.¡...ÄúF½...v.......á..F 000020
E9F8468B 0006E903 7500003D F8468900 00002B9A 5016FC46 8D2076FF 2276FFFA *.v".v .F=.P.+....F½=..u.Õ...F½Õ 000040
5D031E9A 2076FF22 76FF1E76 FFFA76FF 656AFC76 FFFE76FF 0676FF08 76FF002B +..v..v..v±.v=je.v*.v..v".v ...] 000060
D88E007A B81E5657 000008C8 001ECAC9 5F5E1F00 00E9F846 8BF84689 12C48300 ..á..F½.F½Õ...^_èò..à...WV.¡z..Á 000080
9D9A5016 FC468D20 76FF2276 FFFA4689 02C48300 8900009A 1C76FF00 00F846C7 úF½...v.......á..F*.v".v .F=.P.. 0000A0
FC76FFFE 76FF0676 FF0876FF 002BE9F8 46880006 E9037500 003DF846 89000000 ....F½=..u.Õ...F½Õ+..v..v..v±.v= 0000C0
1F0000E9 F8468BF8 468912C4 8300CF03 1E9A2076 FF2276FF 1E76FFFA 76FF686A jh.v*.v..v".v ...ü..á..F½.F½Õ... 0000E0
8300FB00 009A1C76 FF0000F8 46C7D88E 00ECB81E 56570000 08C8001E CAC95F5E ^_èò..à...WV.¡š..ÄúF½...v....«.. 000100
0006E903 7500003D F8468900 00010F9A 5016FC46 8D2076FF 2276FFFA 468902C4 á_.F*.v".v .F=.P......F½=..u.Õ.. 000120
2076FF22 76FF1E76 FFFA76FF 676AFC76 FFFE76FF 0676FF08 76FF002B E9F8468B .F½Õ+..v..v..v±.v=jg.v*.v..v".v 000140
B81E5657 000008C8 001ECAC9 5F5E1F00 00E9F846 8BF84689 12C48301 41031E9A ...A..á..F½.F½Õ...^_èò..à...WV.¡ 000160
FC468D20 76FF2276 FFFA4689 02C48301 6D00009A 1C76FF00 00F846C7 D88E015E ^..ÄúF½...v....m..á..F*.v".v .F= 000180
76FF0676 FF0876FF 002BE9F8 46880006 E9037500 003DF846 89000001 819A5016 .P......F½=..u.Õ...F½Õ+..v..v..v 0001A0
F8468BF8 468912C4 83018303 1E9A2076 FF2276FF 1E76FFFA 76FF686A FC76FFFE ±.v=jk.v*.v..v".v ...°..á..F½.F½ 0001C0
009A1C76 FF0000F8 46C7D88E 01D0B81E 56570000 08C8001E CAC95F5E 1F0000E9 Õ...^_èò..à...WV.¡Å..ÄúF½...v... 0001E0

Dump of file SATURN:[PCCOMMON.DUMP.DLL]NEWMETA.TMP;1 on 18-APR-1990 10:48:01.69
File ID (741,17,0)   End of file block 111 / Allocated 112

Virtual block number 48 (00000030), 512 (0200) bytes

7500003D F8468900 0001F39A 5016FC46 8D2076FF 2276FFFA 468902C4 8301DF00 .Õ..á..F*.v".v .F=.P.µ....F½=..u 000000
76FF1E76 FFFA76FF 696AFC76 FFFE76FF 0676FF08 76FF002B E9F8468B 0006E903 .Õ...F½Õ+..v..v..v±.v=ji.v*.v..v 000020
000008C8 001ECAC9 5F5E1F00 00E9F846 8BF84689 12C48302 25031E9A 2076FF22 ".v ...%..á..F½.F½Õ...^_èò..à... 000040
76FF2276 FFFA4689 02C48302 5100009A 1C76FF00 00F846C7 D88E0242 B81E5657 WV.¡B..ÄúF½...v....Q..á..F*.v".v 000060
FF0876FF 002BE9F8 46880006 E9037500 003DF846 89000002 659A5016 FC468D20 .F=.P.e....F½=..u.Õ...F½Õ+..v.. 000080
468912C4 83029703 1E9A2076 FF2276FF 1E76FFFA 76FF6A6A FC76FFFE 76FF0676 v..v±.v=jj.v*.v..v".v ......á..F 0000A0
C40000EC 46C7D88E 02B4B81E 56570000 14C8001E CAC95F5E 1F0000E9 F8468BF8 ½.F½Õ...^_èò..à...WV.¡Ç..ÄúFš..á 0000C0
FF0876FF 06C48302 C304AA9A 0E76FF50 16FA468D 07892602 47892600 00B8145E ^.¡..&.G.Ī...F*.P.v..`.û..á..v.. 0000E0
0006E903 7500003D EC468900 00FFFF9A 5016F646 8DFA76FF 1076FF12 76FF0676 v..v..v..v*.F-.P......Fš=..u.Õ.. 000100
890000FF FF9A5016 F2468DFA 76FF1076 FF1276FF 0676FF08 76FF00C7 E9EC468B .FšÕú..v..v..v..v..v*.F·.P...... 000120
0502E0C1 F6468B50 E42A0C46 8A0A76FF 009DE9EC 46880006 E9037500 003DEC46 Fš=..u.Õ...FšÕ...v..F.*ÕP.F-êÁ.. 000140
C4006EE9 EC468800 06E90375 00003DEC 46890000 FFFF9A14 76FF1676 FF500004 ..P.v..v.......Fš=..u.Õ...FšÕn.á 000160
8826FC5E C4FE5689 FC4689F4 568BF246 8BF05689 EE468902 57882607 8826145E ^.&..&.W..FŸ.Vb.F·.V¶.F=.V±á^=&. 000180
46830257 89260789 26EE5EC4 02578B26 078B26FC 5EC4001F E9037502 470B2607 .&.G.u.Õ..á^=&..&.W.á^Ÿ&..&.W..F 0001A0
FFF476FF 0676FF08 76FF0789 26024789 260000B8 EE5EC4FF D2E904FC 468304EE Ÿ..F=.Õ0.á^Ÿ¡..&.G.&...v..v..v¶. 0001C0
03090002 006F0004 03880203 0008CBC9 5F5E1F00 00E90000 B80000FF FF9AF276 v·.....¡..Õ...^_èù........o..... 0001E0

```
Dump of file SATURN:[PCCOMMON.DUMP.DLL]NEWMETA.TMP;1 on 18-APR-1990 10:48:01.69
File ID (741,17,0)   End of file block 111 / Allocated 112

Virtual block number 49 (00000031), 512 (0200) bytes

03260002 009E0004 04330203 00140003 03BA0203 0000000A 03470002 00000006 ......G.......¤.......3.......&. 000000
00000000 00000000 00000000 00470004 03610203 00330004 02070203 00000012 ......■...3...a...G............. 000020
FFF84689 02C48300 4E00009A 0C76FF00 00F646C7 D88EFFFF B81E5657 00000AC8 à...WV.|...ÄúF-...v....N..á..F½. 000040
F6468800 06E90375 000030F6 46890000 FFFF9A14 76FF1676 FF086AF8 76FF0A76 v..v½j..v..v.......F-=..u.Õ...F- 000060
FA468902 57882607 8826145E C406C483 FFFF053E 9A1276FF 5016FE46 800062E9 Õb..F±.P.v..>....á.á^.&..&.W..F* 000080
F6468900 00FFFF9A FA76FFFC 76FFFE76 FF0E76FF 1076FF06 76FF0876 FFFC5689 .V=.v..v..v..v..v±.v=.v*......F- 0000A0
88078926 02478926 000088FA 5EC404FA 46830017 E9F64688 0006E903 7500003D =..u.Õ...F-Õ...F*.á^*|..&.G.&..| 0000C0
5016FA46 800000EA 46C7D88E 0008881E 56570000 16C8CBC9 5F5E1F00 00E90000 ..Õ...^_èùà...WV.|...ÄúFõ...F*.P 0000E0
9A5016F6 4680FA76 FF0E76FF 1076FF06 76FF0876 FF06C483 00FB053E 9A1276FF .v..>.«..á..v..v..v..v..v*.F-.P. 000100
02C48300 1700009A 0C76FF00 E4E9EA46 880006E9 03750000 30EA4689 0000FFFF .....Fõ=..u.Õ...FõÕÕ..v.......á. 000120
46890000 002E9A14 76FF1676 FF500004 0502E0C1 F64688F0 76FF0A76 FFF04689 .Fb.v..vb.F-èÅ....P.v..v.......F 000140
4680FA76 FF0E76FF 1076FF06 76FF0876 FF00AAE9 EA468800 06E90375 00003DEA õ=..u.Õ...FõÕ¯..v..v..v..v..v*.F 000160
37FF2602 77FF2614 5EC40A76 FF0018E9 03750000 30EA4689 0000FFFF 9A5016F2 ·.P......Fõ=..u.Õ...v.á^.&.w.&.7 000180
57882607 8826145E C4FE5689 FC4689F4 5688F246 88006EE9 EA468800 00FFFF9A ......FõÕn..F·.V¶.F=.V±á^.&..&.W 0001A0
02578826 078826FC 5EC4001F E9037502 47082607 8826FC5E C4EE5689 EC468902 ..F$.VŸá^=&..&.G.u.Õ..á^=&..&.W. 0001C0
26024789 26000088 EC5EC4FF D2E904FC 468304EC 46830257 89260789 26EC5EC4 á^$&..&.W..F$..F=.Õ0.á^$|..&.G.& 0001E0

Dump of file SATURN:[PCCOMMON.DUMP.DLL]NEWMETA.TMP;1 on 18-APR-1990 10:48:01.69
File ID (741,17,0)   End of file block 111 / Allocated 112

Virtual block number 50 (00000032), 512 (0200) bytes

18C8CBC9 5F5E1F00 00E90000 B80000FF FF9AF276 FFF476FF 0676FF08 76FF0789 ...v..v..v¶.v·.....|..Õ...^_èùà. 000000
FA4680EE 468902C4 83020800 009A0C76 FF0000E8 46C7D88E 00B2881E 56570000 ..WV.|ý..ÄúFò...v.......á..F̄Ÿ.F* 000020
16F4468D FA76FF0E 76FF1076 FF0676FF 0876FF06 C48302AA 053E9A12 76FF5016 .P.v..>.˙..á..v..v..v..v..v*.F¶. 000040
F4468BEE 76FF0A76 FF012AE9 E8468800 06E90375 00003DE8 46890000 00E09A50 P.Å....Fò=..u.Õ...FòÕ*..v..vŸ.F¶ 000060
E8468800 06E90375 00003DE8 46890000 011A9A14 76FF1676 FF500004 0502E0C1 èÅ....P.v..v.......Fò=..u.Õ...Fò 000080
30E84689 00000144 9A5016F0 4680FA76 FF0E76FF 1076FF06 76FF0876 FF00FEE9 Õ±..v..v..v..v..v*.Fb.P.D....Fò= 0000A0
8D00C2E9 E8468800 0001619A 37FF2602 77FF2614 5EC40A76 FF0018E9 03750000 ..u.Õ...v.á^.&.w.&.7.a....FòÕõ.. 0000C0
88EC5689 EA468902 57882607 8826145E C406C483 00C6063C 9A0FA468 5016FA46 F*.PhÊ..<.ó..á.á^.&..&.W..Fõ.V$. 0000E0
005DE903 7F00F87E 83F84EFF 0003E9F8 4689F446 88FE5689 FC4689F2 5688F046 Fb.V·.F=.V±.F¶.FŸÕ...N½.-½...Õ]. 000100
46890000 00799AEA 76FFEC76 FFFA76FF 37FF2602 77FF26FC 5EC40676 FF0876FF .v..v.á^=&.w.&.7.v*.v$.võ.y....F 000120
145EC40A 76FF0000 03579AF0 76FFF276 FF0676FF 0876FF00 29E90375 00003DE8 Ò=..u.Õ)..v..v..v·.vb.W....v.á^. 000140
EA5EC4FF 97E904EA 468304FC 4683002F E9E84688 00000295 9A37FF26 0277FF26 &.w.&.7......FÒÕ/..F=..Fõ.Õ..á^õ 000160
00E90000 B8000001 CF9AF076 FFF276FF 0676FF08 76FF0789 26024789 26000088 |..&.G.&...v..v..v·.vb.ü...|..Õ. 000180
0000000A 01F50002 007B0004 02FA0203 006F0004 02780203 0008C8C9 5F5E1F00 ..^_èù....x...o...*...(...%..... 0001A0
00000012 01E60002 009E0004 03160203 00220003 03280203 00140003 024E0203 ..N̄.......(..."...........Ì..... 0001C0
00F646C7 D88EFFFF B81E5657 00000AC8 00000000 00000000 00470004 02220203 .."...G.........à...WV.|...ÄúF-. 0001E0

Dump of file SATURN:[PCCOMMON.DUMP.DLL]NEWMETA.TMP;1 on 18-APR-1990 10:48:01.69
File ID (741,17,0)   End of file block 111 / Allocated 112

Virtual block number 51 (00000033), 512 (0200) bytes

FFFF9A14 76FF1676 FF086AF8 76FF0A76 FFF84689 02C48300 4E00009A 0C76FF00 ..v....N..á..F½.v..v½j..v..v.... 000000
FFFF0563 9A1276FF 5016FE46 800062E9 F6468800 06E90375 00003DF6 46890000 ...F-=..u.Õ...F-Õb..F±.P.v..c... 000020
FF0E76FF 1076FF06 76FF0876 FFFC5689 FA468902 57882607 8826145E C406C483 .á.á^.&..&.W..F*.V=.v..v.. ..v.. 000040
46830017 E9F64688 0006E903 75000030 F6468900 00FFFF9A FA76FFFC 76FFFE76 v±.v=.v*......F-=..u.Õ...F-u...F 000060
56570000 1AC8CBC9 5F5E1F00 00E90000 88078926 02478926 000088FA 5EC404FA *.á^*|..&.G.&..|..Õ...^_èùà...WV 000080
009A0C76 FF06C483 00D10563 9A1276FF 5016F646 800000E6 46C7D88E 0008881E .|...ÄúF|...F-.P.v..c.Ì..á..v... 0000A0
3DE64689 0000002E 9A1476FF 1676FF08 6AEC76FF 0A76FFEC 468902C4 83014C00 .L..á..F$.v..v$j..v..v.......F|= 0000C0
16EE4680 F676FF0E 76FF1076 FF0676FF 0876FF02 92E9E646 880006E9 03750000 ..u.Õ...F|Õ...v..v..v..v..v-.FŸ. 0000E0
47082607 8826EE5E C40268E9 E6468800 06E90375 00003DE6 46890000 FFFF9A50 P......F|=..u.Õ...F|Õh.á^Ÿ&..&.G 000100
C483015E 067C9A07 6A5016F6 46800039 E9124688 0253E900 00880006 E9037402 .t.Õ..|..ÕS..F.Õ9..F-.Pj..|.^..á 000120
067C9A05 6A5016F6 46800030 E906C483 0170067C 9A066A50 16F6468D 0042E906 .ÕB..F-.Pj..|.p..á.Õ0..F-.Pj..|. 000140
037504B0 3DFFB7E9 037504BC 3DFFD1E9 037504B8 3D0018E9 001EE906 C4830017 ...á.Õ..Õ..=Ē.u.Õi.=¥.u.Õñ.=§.u. 000160
02478926 000088E8 5EC4EA56 89E84689 02578826 07882614 5EC40000 E9FFD3E9 Õ«.Õ..á^.&..&.W..FÕ.VõáˆÕ|..&.G. 000180
260277FF 26EE5EC4 0676FF08 76FF0186 E9037502 47082607 8826EE5E C4078926 &..á^Ÿ&..&.G.u.ÕÑ..v..v.á^Ÿ&.w.& 0001A0
9EE9E646 880006E9 03750000 3DE64689 00000079 9AE876FF EA76FFF6 76FF37FF .7.v-.võ.vÒ.y....F|=..u.Õ...F|Õ. 0001C0
16F8468D 0676FF08 76FF0150 E912468B 0171E903 7502470B 26078826 E85EC401 .á^Õ&..&.G.u.Õq..F.ÕP..v..v..F½. 0001E0
```

```
Dump of file SATURN:[PCCOMMON.DUMP.DLL]NEWMETA.TMP;1 on 18-APR-1990 10:48:01.69
File ID (741,17,0)   End of file block 111 / Allocated 112

Virtual block number 52 (00000034), 512 (0200) bytes

 FF0876FF 0A76FFEC 76FF6A6A F876FFFA 76FF5016 FC468DE6 46890000 02A49A50 P.Ê....F|.F=.P.v'.v½jj.vš.v..v.. 000000
 26FC5EC4 003CE903 7502470B 26078826 FC5EC4E6 468912C4 8302C703 1E9A0676 v....ú..ó..F|ó^=&..&.G.u.Õ<.ó^=& 000020
 5EC404E8 46830017 E9037402 57392600 20E90374 073926E8 5EC40257 8826078B ..&.W.ó^Ò&9.t.Õ .&9W.t.Õ...FÒ.ó^ 000040
 89260000 88E85EC4 FFB5E904 FC468301 0EE90000 88078926 02478926 000088E8 Ò¡..&.G.&..¡..Õ...F=.Õç.ó^Ò¡..&. 000060
 5016FC46 8DE64689 0000FFFF 9A5016F8 468D0676 FF0876FF 00D9E907 89260247 G.&..Õ)..v..v..F½.P......F|.F=.P 000080
 C4E64689 12C483FF FF031E9A 0676FF08 76FF0A76 FFEC76FF 696AF876 FFFA76FF .v'.v½jj.vš.v..v..v.......ó..F|ó 0000A0
 03740739 26E85EC4 02578826 078826FC 5EC4003C E9037502 470B2607 8B26FC5E ^=&..&.G.u.Õ<.ó^=&..&.W.ó^Ò&9.t. 0000C0
 00008807 89260247 89260000 88E85EC4 04E84683 0017E903 74025739 260020E9 Õ .&9W.t.Õ...FÒ.ó^Ò¡..&.G.&..¡.. 0000E0
 078826E8 5EC40047 E9078926 02478926 000088E8 5EC4FF85 E904FC46 83007CE9 Õ|..F=.Õç.ó^Ò¡..&.G.&..ÕG.ó^Ò&.. 000100
 003FE900 00880789 26024789 26000088 E85EC404 E8468300 17E90375 0247082 6 &.G.u.Õ...FÒ.ó^Ò¡..&.G.&..¡..Õ?. 000120
 00E9FFBC E9037504 8D3DFEA0 E9037504 8C30FF3A E9037504 8B3D0018 E9001EE9 Õ..Õ..=£.u.Õ:.=¥.u.Õ.±=§.u.Õ¥.Õ. 000140
 1F0000E9 00008807 89260247 89260000 88E85EC4 04E84683 FE38E904 EE468300 ..FŸ.Õ;±.FÒ.ó^Ò¡..&.G.&..¡..Õ... 000160
 0002007B 0004010C 02030000 00060235 0002006F 00040112 02030007 CBC95F5E ^_èù........o...5.......Ê...(... 000180
 00000033 00040212 02030000 001200B2 00020014 000300E8 02030000 000A00C6 ó.......Ò.......ý...........3... 0001A0
 890000FF FF9A0676 FF0876FF 0A76FF00 00FE46C7 D88EFFFF 881E5657 000002C8 à...WV.¡...ÄúF±...v..v..v....... 0001C0
 FFFFFE46 C7D88E00 08881E56 57000002 C80006CA C95F5E1F 0000E9FE 468BFE46 F±.F±Õ...^_èò..à...WV.¡...ÄúF±.. 0001E0

Dump of file SATURN:[PCCOMMON.DUMP.DLL]NEWMETA.TMP;1 on 18-APR-1990 10:48:01.69
File ID (741,17,0)   End of file block 111 / Allocated 112

Virtual block number 53 (00000035), 512 (0200) bytes

 07C72606 5EC40010 E9037400 003D08C4 83007702 209A0A76 FF0C76FF 0526681E .h&..v..v.. .w..ó.=..t.Õ..ó^.&ú. 000000
 7400003D 08C48300 A102209A 0A76FF0C 76FF052F 681E03CC E90000FE 46C70001 ..úF±..Õä..h/..v..v.. .À..ó.=..t 000020
 209A0A76 FF0C76FF 0537681E 03A2E900 00FE46C7 000207C7 26065EC4 0010E903 .Õ..ó^.&ú...úF±..ÕÅ..h7..v..v.. 000040
 681E0378 E90000FE 46C70002 07C72606 5EC40010 E9037400 003D08C4 8300CB02 .ù..ó.=..t.Õ..ó^.&ú...úF±..Õx..h 000060
 000307C7 26065EC4 0010E903 7400003D 08C48300 F502209A 0A76FF0C 76FF053B ;..v..v.. .¥..ó.=..t.Õ..ó^.&ú... 000080
 E9037400 003D08C4 83011F02 209A0A76 FF0C76FF 0541681E 034EE900 00FE46C7 úF±..ÕN..hA..v..v.. ....ó.=..t.Õ 0000A0
 4902209A 0A76FF0C 76FF0546 681E0324 E90000FE 46C70004 07C72606 5EC40010 ..ó^.&ú...úF±..Õ$..hF..v..v.. .I 0000C0
 0550681E 02FAE900 00FE46C7 000407C7 26065EC4 0010E903 7400003D 08C48301 ..ó.=..t.Õ..ó^.&ú...úF±..Õ'..hP. 0000E0
 46C70005 07C72606 5EC40010 E9037400 003D08C4 83017302 209A0A76 FF0C76FF .v..v.. .s..ó.=..t.Õ..ó^.&ú...úF 000100
 0010E903 7400003D 08C48301 9002209A 0A76FF0C 76FF0558 681E02D0 E90000FE ±..ÕÅ..hX..v..v.. ....ó.=..t.Õ.. 000120
 8301C702 209A0A76 FF0C76FF 0560681E 02A6E900 00FE46C7 000607C7 26065EC4 ó^.&ú...úF±..Õ[..h'..v..v  .ú.. 000140
 76FF0560 681E027C E90000FE 46C70006 07C72606 5EC40010 E9037400 003D08C4 ó.=..t.Õ..ó^.&ú...úF±..Õ|..¬..v 000160
 0707C726 065EC400 00FE46C7 0010E903 74000030 08C48301 F102209A 0A76FF0C ..v.. .þ..ó.=..t.Õ..úF±..ó^.&ú.. 000180
 46C70010 E9037400 003D08C4 83021B02 209A0A76 FF0C76FF 0575681E 0252E900 .ÕR..hu..v..v.. ....ó.=..t.Õ..úF 0001A0
 08C48302 4502209A 0A76FF0C 76FF057A 681E0228 E9000807 C726065E C40000FE ±..ó^.&ú...Õ(..hz..v..v.. .E..ó. 0001C0
 FF0C76FF 0585681E 01FEE900 0807C726 065EC400 00FE46C7 0010E903 74000030 =..t.Õ..úF±..ó^.&ú...Õ±..h...v.. 0001E0

Dump of file SATURN:[PCCOMMON.DUMP.DLL]NEWMETA.TMP;1 on 18-APR-1990 10:48:01.69
File ID (741,17,0)   End of file block 111 / Allocated 112

Virtual block number 54 (00000036), 512 (0200) bytes

 E90000FE 46C70009 07C72606 5EC40010 E9037400 003D08C4 83026F02 209A0A76 v.. .o..ó.=..t.Õ..ó^.&ú...úF±..Õ 000000
 26065EC4 0010E903 7400003D 08C48302 9902209A 0A76FF0C 76FF058E 681E01D4 å..h...v..v.. ....ó.=..t.Õ..ó^.& 000020
 003D08C4 83FFFF02 209A0A76 FF0C76FF 059E681E 01AAE900 00FE46C7 000907C7 ú...úF±..Õ¯..h...v..v.. ....ó.=. 000040
 0A76FF0C 76FF05A3 681E0180 E90000FE 46C7000A 07C72606 5EC40010 E9037400 .t.Õ..ó^.&ú...úF±..Õ...hÈ..v..v. 000060
 0156E900 00FE46C7 000807C7 26065EC4 0010E903 7400003D 08C48302 ED02209A . .Ú..ó.=..t.Õ..ó^.&ú...úF±..ÕV. 000080
 07C72606 5EC40010 E9037400 003D08C4 83031702 209A0A76 FF0C76FF 05A8681E .h¨..v..v.. ....ó.=..t.Õ..ó^.&ú. 0000A0
 7400003D 08C48303 4102209A 0A76FF0C 76FF05B2 681E012C E90000FE 46C7000C ..úF±..Õ,..hý..v..v.. .A..ó.=..t 0000C0
 209A0A76 FF0C76FF 05B8681E 0102E900 00FE46C7 000C07C7 26065EC4 0010E903 .Õ..ó^.&ú...úF±..Õ...hÈ..v..v.. 0000E0
 681E0008 E90000FE 46C70000 07C72606 5EC40010 E9037400 003D08C4 83036B02 .k..ó.=..t.Õ..ó^.&ú...úF±..ÕÄ..h 000100
 000E07C7 26065EC4 0010E903 74000030 08C48303 9502209A 0A76FF0C 76FF05C3 û..v..v.. ....ó.=..t.Õ..ó^.&ú... 000120
 E9037400 003D08C4 8303BF02 209A0A76 FF0C76FF 05CB681E 00AEE900 00FE46C7 úF±..ÕÛ..hù..v..v.. .¢..ó.=..t.Õ 000140
 E902209A 0A76FF0C 76FF05CF 681E0084 E90000FE 46C7000E 07C72606 5EC40010 ..ó^.&ú...úF±..Õ...hü..v..v.. .Õ 000160
 05D4681E 005AE900 00FE46C7 000F07C7 26065EC4 0010E903 7400003D 08C48303 ..ó.=..t.Õ..ó^.&ú...úF±..ÕZ..hå. 000180
 46C70010 07C72606 5EC40010 E9037400 003D08C4 83041302 209A0A76 FF0C76FF .v..v.. ....ó.=..t.Õ..ó^.&ú...úF 0001A0
 0010E903 7400003D 08C48300 4D02209A 0A76FF0C 76FF05E5 681E0030 E90000FE ±..ÕÛ..hÍ..v..v.. .M..ó.=..t.Õ.. 0001C0
 0000C800 08CAC95F 5E1F0000 E9FE468B 0006E900 00FE46C7 001107C7 26065EC4 ó^.&ú...úF±..Õ...F±Õ...^_èò..à.. 0001E0
```

```
Dump of file SATURN:[PCCOMMON.DUMP.DLL]NEWMETA.TMP;1 on 18-APR-1990 10:48:01.69
File ID (741,17,0)   End of file block 111 / Allocated 112

Virtual block number 55 (00000037), 512 (0200) bytes

 C4830471 011E9A06 76FF0876 FF05E068 1E0159E9 0A4688D8 8E0037B8 1E565700 .WV.¡7..Ä.F.ÕY..hÚ..v..v....q..á 000000
 0876FF05 FE681E01 62E908C4 83048601 1E9A0676 FF0876FF 05F6681E 0177E908 .Õw..h-..v..v.......á.Õb..h±..v. 000020
 08C48304 B0011E9A 0676FF08 76FF0604 681E014D E908C483 0498011E 9A0676FF .v.......á.ÕM..h...v..v.... ..á. 000040
 FF0876FF 0611681E 0123E908 C48304C5 011E9A06 76FF0876 FF060968 1E0138E9 Õ8..h...v..v....é..á.Õ#..ŀ ..v.. 000060
 E908C483 04EF011E 9A0676FF 0876FF06 19681E01 0EE908C4 8304DA01 1E9A0676 v....Ö..á.Õ...h...v..v....) .á.Õ 000080
 76FF0876 FF062668 1E00E4E9 08C48305 04011E9A 0676FF08 76FF0621 681E00F9 *..hl..v..v.......á.Õõ..h&..v..v 0000A0
 BAE908C4 8302C301 1E9A0676 FF0876FF 062F681E 00CFE908 C4830519 011E9A06 .......á.Õü..h/..v..v....û..á.Õ¤ 0000C0
 0676FF08 76FF0639 681E00A5 E908C483 0543011E 9A0676FF 0876FF06 34681E00 ..h4..v..v....C..á.ÕE..h9..v..v. 0000E0
 0078E908 C483056D 011E9A06 76FF0876 FF064268 1E0090E9 08C48305 58011E9A ...X..á.Õ...hB..v..v....m..á.Õ(. 000100
 9A0676FF 0876FF06 4E681E00 66E908C4 83058201 1E9A0676 FF0876FF 064A681E .hJ..v..v.......á.Õf..hN..v..v.. 000120
 B8003CE9 08C48304 5C011E9A 0676FF08 76FF0653 681E0051 E908C483 0597011E .....á.ÕQ..hS..v..v....\..á.Õ<.¡ 000140
 79046404 4F058BA7 FF2E93C0 03FFECE9 0376000F 30000120 0033E900 3CE9FFFF ..Õ<.Õ3.-..=..v.Õš..â...ÏÉ.0.d.y 000160
 00E90000 B8058A05 75056005 48053605 21050C04 F704E204 CD04B804 A3048E04 ...È.¦.ë.ā.¼...!.6.K.'.u...¦..Õ. 000180
 76FF0659 681E0159 E90A4688 D88E0445 881E5657 000000C8 0006CAC9 5F5E1F00 ..^_èò..à...WV.¡E..Ä.F.ÕY..hY..v 0001A0
 C4830631 011E9A06 76FF0876 FF066268 1E0177E9 08C48306 1C011E9A 0676FF08 ..v.......á.Õw..hb..v..v....1..á 0001C0
 0876FF06 70681E01 4DE908C4 83064601 1E9A0676 FF0876FF 066A681E 0162E908 .Õb..hj..v..v....F..á.ÕM..hp..v. 0001E0

Dump of file SATURN:[PCCOMMON.DUMP.DLL]NEWMETA.TMP;1 on 18-APR-1990 10:48:01.69
File ID (741,17,0)   End of file block 111 / Allocated 112

Virtual block number 56 (00000038), 512 (0200) bytes

 08C48306 70011E9A 0676FF08 76FF067A 681E0138 E908C483 065B011E 9A0676FF .v....[..á.Õ8..hz..v..v....p..á. 000000
 FF0876FF 068F681E 010EE908 C4830685 011E9A06 76FF0876 FF068268 1E0123E9 Õ#..h...v..v.......á.Õ...h...v.. 000020
 E908C483 06AF011E 9A0676FF 0876FF06 97681E00 F9E908C4 83069A01 1E9A0676 v.......á.Õ'..h...v..v....£..á.Õ 000040
 76FF0876 FF068268 1E00CFE9 08C48306 C4011E9A 0676FF08 76FF06A2 681E00E4 õ..hÅ..v..v....á..á.Õü..hý..v..v 000060
 A5E908C4 8306EE01 1E9A0676 FF0876FF 06B7681E 008AE908 C4830609 011E9A06 ....\..á.Õ¤..hñ..v..v....Ÿ..á.ÕE 000080
 0676FF08 76FF06C6 681E0090 E908C483 0703011E 9A0676FF 0876FF06 BC681E00 ..h¥..v..v.......á.Õ...hó..v..v. 0000A0
 0066E908 C483072D 011E9A06 76FF0876 FF06CE68 1E007BE9 08C48307 18011E9A ......á.Õ(..hö..v..v....-..á.Õf. 0000C0
 9A0676FF 0876FF06 0B681E00 51E908C4 83074201 1E9A0676 FF0876FF 06D6681E .h•..v..v....B..á.ÕQ..hÜ..v..v.. 0000E0
 C003FFEC E9037600 0F3D0001 2D0033E9 003CE9FF FFB8003C E908C483 052E011E .....á.Õ<.¦..Õ<.Õ3.-..=..v.Õš..á 000100
 06F606E1 06CC0687 06A20680 06780663 064E0639 0624060F 05FA0766 A7FF2E93 ...Ïf.'...$.9.N.c.x...Å.ñ.ä.Ã.-. 000120
 B8D88E05 F0B81E56 57000016 C80006CA C95F5E1F 0000E900 00B80735 0720070B .. .5.¡..Õ...^_èò..à...WV.¡Þ..Ä¡ 000140
 0C460B0A 468BF046 89F24689 0000B8EC 4689EE46 89000088 F64689F8 46890000 ...F½.F-¡...FŸ.F$¡...F·.FÞ.F..F. 000160
 E9037510 460B0E46 8B08C483 07EF0266 9A0A76FF 0C76FF00 6A136A00 12E90375 u.Õ..j.j..v..v..f.ÿ..á..F..F.u.Õ 000180
 6A0012E9 03751446 0B12468B 08C48308 0C02669A 0E76FF10 76FF006A 096A0012 ..j.j..v..v..f....á..F..F.u.Õ..j 0001A0
 FC4689F8 5689F646 8908568B 06468B08 C48308B0 02669A12 76FF1476 FF006A11 .j..v..v..f.¯..á..F..V..F-.V½.F• 0001C0
 3F8026FC 5EC4003B E9037500 3F8026FC 5EC4FC46 FF0003E9 0001EA46 C7FE5689 .V±úFõ..Õ...F•á^•&.7.u.Õ;.á^•&.? 0001E0

Dump of file SATURN:[PCCOMMON.DUMP.DLL]NEWMETA.TMP;1 on 18-APR-1990 10:48:01.69
File ID (741,17,0)   End of file block 111 / Allocated 112

Virtual block number 57 (00000039), 512 (0200) bytes

 F25689F0 4689FE56 8BFC468B 000FE903 75EE460B EC468BFC 46FF002C E903742E .t.Õ,..F•.F$.FŸu.Õ...F•.V±.FÞ.V· 000000
 468B0097 E9037403 EA7E83FF 86E9EA46 FFEE5689 EC4689FE 568BFC46 8B000CE9 Õ...F•.V±.F$.VŸ.FõÕÑ..~õ.t.Õ...F 000020
 76FF001A E9037514 460B1246 8B0025E9 037211FA 7E83FA4E FFFA4689 F6462BEC $+F-.F'.N'.-'.r.Õ%..F..F.u.Õ...v 000040
 468B00C6 E9FFFFB8 0006E90A C48308F0 01969A12 76FF1476 FFF676FF F876FFFA '.v½.v-.v..v....Þ..á.Õ..¡..Õ6..F 000060
 76FF001A E9037510 460B0E46 8B0025E9 037209F4 7E83F44E FFF44689 EC462BF0 Þ+F$.F¶.N¶.~¶.r.Õ%..F..F.u.Õ...v 000080
 76FF0086 E9FFFFB8 0006E90A C4830900 01969A0E 76FF1076 FFEC76FF EE76FFF4 ¶.vŸ.vš.v..v.......á.Õ..¡..Õ...v 0000A0
 468B004C E9037402 EA7E8300 69E908C4 83094501 1E9A0A76 FF0C76FF F076FFF2 ·.vÞ.v..v....E..á.Õi..~õ.t.ÕL..F 0000C0
 FF1076FF F676FFF8 76FFF476 FF001AE9 037209F4 7E83F44E FFF44689 F6462BEC $+F-.F¶.N¶.-¶.r.Õ...v¶.v½.v-.v.. 0000E0
 9A0A76FF 0C76FFEC 76FFEE76 FF0031E9 FFFFB800 06E90AC4 83096201 969A0E76 v....b..á.Õ..¡..Õ1..vŸ.vš.v..v.. 000100
 00B808C4 83060701 1E9A0A76 FF0C76FF F676FFF8 76FF0014 E908C483 0979011E ..y..á.Õ...v½.v-.v..v.......á.¡. 000120
 07980002 00000010 07D20002 00220003 00180203 000390CB C95F5E1F 0000E900 .Õ...^_èù.........".............. 000140
 E906468B D88EFFFF B81E5657 000000C8 00000000 00000000 00000000 00000012 ...............à...WV.¡...Ä.F.Õ 000160
 0040E900 43E90046 E90049E9 004CE900 4FE90052 E90055E9 0058E900 58E90030 0.Õ[.ÕX.ÕU.ÕR.ÕO.ÕL.ÕI.ÕF.ÕC.Õ@. 000180
 A7FF2E93 C0030026 E9037600 0E3D002E E90031E9 0034E900 37E9003A E9003DE9 Õ=.Õ:.Õ7.Õ4.Õ1.Õ..=..v.Õ&..à...Ï 0001A0
 003C0039 00360033 0030002D 002A0027 00240021 001E001B 00180015 00120052 R...........!.$.'.*.-.0.3.6.9.<. 0001C0
 2CE90373 03E8067E 81D88E00 08B81E56 57000000 C8CBC95F 5E1F0000 E90078B8 ¦x.Õ...^_èùà...WV.¡...Ä.-.Õ.s.Õ, 0001E0
```

```
Dump of file SATURN:[PCCOMMON.DUMP.DLL]NEWMETA.TMP;1 on 18-APR-1990 10:48:01.69
File ID (741,17,0)   End of file block 111 / Allocated 112

Virtual block number 58 (0000003A), 512 (0200) bytes

 72878826 1FB2068E E3D1065E 8803E807 C726085E C40022E9 03720480 067E8100 ..-.¯.r.Õ".á^.&ú.Ò..^.ìD..ý.&..r 000000
 22E90372 0578067E 81002CE9 037304B0 067E8101 DEE90789 260C5EC4 06462BF8 ½+F.á^.&..ÕB..-.¯.s.Õ,..~.x.r.Õ" 000020
 0789260C 5EC40646 2BF85C87 8B261FB4 068EE3D1 065E8804 B007C726 085EC400 .á^.&ú.¯..^.ìD..Ç.&..\½+F.á^.&.. 000040
 8B089807 C726085E C40022E9 03720960 067E8100 2CE90373 0898067E 8101ABE9 Õ´..~...s.Õ,..-.`.r.Õ".á^.&ú.... 000060
 03730FA0 067E8101 72E90789 260C5EC4 06462BF1 3A878826 1FB6068E E3D1065E ^.ìD..Ñ.&..:þ+F.á^.&..Õr..-...s. 000080
 AC8488E6 D1067688 0C5EC40F A007C726 085EC400 1DE90372 1068067E 810027E9 Õ'..-.h.r.Õ..á^.&ú...á^..v.ì|..¯ 0000A0
 5EC40022 E903720A 28067E81 002CE903 73096006 7E810141 E9078926 06462BE7 Ó+F.&..ÕA..-.`.s.Õ,..-.(.r.Õ".á^ 0000C0
 010BE907 89260C5E C406462B F00A8788 261FB806 8EE3D106 5E880960 07C72608 .&ú.`..^.ìD..¡.&...þ+F.á^.&..Õ.. 0000E0
 D1065E8B 106807C7 26085EC4 0022E903 72113006 7E81002C E9037310 68067E81 .-.h.s.Õ,..-.0.r.Õ".á^.&ú.h..^.ì 000100
 002CE903 73057806 7E810005 E9078926 0C5EC406 462BE218 8788261F BA068EE3 D..¤.&...ã+F.á^.&..Õí..~.x.s.Õ,. 000120
 F810878B 261FBC06 8EE3D106 5E880578 07C72608 5EC40022 E9037206 40067E81 .-.ə.r.Õ".á^.&ú.x..^.ìD..¥.&...½ 000140
 0022E903 72070806 7E81002C E9037306 40067E81 009FE907 89260C5E C406462B +F.á^.&..Õ...-.ə.s.Õ,..-...r.Õ". 000160
 E9078926 0C5EC406 462BF728 8788261F 8E068EE3 D1065E88 064007C7 26085EC4 á^.&ú.ə..^.ìD../.&..(¼+F.á^.&..Õ 000180
 5E880708 07C72608 5EC40022 E9037207 D0067E81 002CE903 73070806 7E810069 ì..-...s.Õ,..-.Å.r.Õ".á^.&ú....^ 0001A0
 E9037307 D0067E81 0033E907 89260C5E C4064628 F5CE878B 261FC006 8EE30106 .ìD..à.&..ö¼+F.á^.&..Ò3..-.Å.s.Õ 0001C0
 8788261F C2068EE3 D1065E8B 07D007C7 26085EC4 001FE903 72089806 7E810029 )..-...r.Õ..á^.&ú.Å..^.ìD..ô.&.. 0001E0

Dump of file SATURN:[PCCOMMON.DUMP.DLL]NEWMETA.TMP;1 on 18-APR-1990 10:48:01.69
File ID (741,17,0)   End of file block 111 / Allocated 112

Virtual block number 59 (0000003B), 512 (0200) bytes

 00FE46C7 D88E0083 881E5657 000002C8 CBC95F5E 1F078926 0C5EC406 462BF180 .þ+F.á^.&...^_èùà...WV.¡...ÄûF±. 000000
 E3D1085E 8801AFE9 FE4689F9 06878826 1FC4068E E3D1085E 880108E9 06468800 ..F.Õ...^.ìD..á.&...ª.F±Õ£..^.ìD 000020
 5E88018C E9FE4689 0718878B E3D1085E 88019BE9 FE4689F8 D0878826 1FC6068E ..ó.&..Ä½.F±Õ...^.ìD.....F±Õ...^ 000040
 69E9FE46 89F17A87 8B261FC8 068EE3D1 085E8801 7DE9FE46 89072A87 88E3D108 .ìD..*..F±Õ)..^.ìD..à.&..zþ.F±Õi 000060
 4689E7C4 878BE3D1 085E8801 55E9FE46 89F01E87 8B261FCA 068EE3D1 085E8801 ..^.ìD..ò.&...þ.F±ÕU..^.ìD..óÕ.F 000080
 368788E3 D1085E88 0132E9FE 4689E228 8788261F CC068EE3 D1085E88 0146E9FE ±ÕF..^.ìD..ä.&..(ã.F±Õ2..^.ìD..6 0000A0
 E3D1085E 88010FE9 FE4689F8 80878826 1FCE068E E3D1085E 880123E9 FE468907 ..F±Õ#..^.ìD..ö.&...½.F±Õ...^.ìD 0000C0
 FE4689F7 4C878826 1FD2068E E3D1085E 8800FBE9 FE4689F6 12878826 1FD0068E ..Å.&...-.F±Õ«..^.ìD..Ø.&..L¼.F± 0000E0
 00CAE900 CDE90000 E90003E9 FE4689F1 E8878826 1FD4068E E3D1085E 8800E7E9 ÕÓ..^.ìD..å.&..Õþ.F±Õ£.ÕÅ.Õë.Õò. 000100
 7506403D 0053E903 76FFE3E9 03750AF0 30008BE9 00BEE900 C1E900C4 E900C7E9 Õú.Õó.Õè.Õ/.ÕE.=Þ.u.ÕD.v.ÕS.=ə.u 000120
 66E90375 05783DFE E2E90375 04803DFE D6E90375 03E83D00 1BE90376 FFABE903 .Õ¨.v.Õ..=Õ.u.Õø±=¯.u.Õã±=x.u.Õf 000140
 7509603D FEF1E903 7508983D FF8FE903 7507D03D FF6FE903 7507083D 0086E9FF .Õ..=..u.Õo.=Å.u.Õ..=..u.Õþ±=`.u 000160
 7508B83D 0023E903 76FF92E9 03750ED8 30005BE9 FF8BE903 750A283D FEFDE903 .Õ»±=(.u.Õ..Õ[.=Ä.u.Õ..v.Õ#.=¡.u 000180
 3D002BE9 FF6AE903 750E103D FF6FE903 750D483D FF74E903 750C803D FF79E903 .Õy.=..u.Õt.=H.u.Õo.=..u.Õj.Õ+.= 0001A0
 3DFE70E9 037511F8 3DFEE1E9 03751130 3DFED5E9 03751068 3DFECEE9 03750FA0 ..u.Õö±=h.u.Õí±=0.u.ÕÅ±=½.u.Õp±= 0001C0
 8E02A888 1E565700 0000C8CB C95F5E1F 0000E9FE 46880000 E9FE77E9 037512C0 å.u.Õw±Õ...F±Õ...^_èùà...WV.¡´.. 0001E0

Dump of file SATURN:[PCCOMMON.DUMP.DLL]NEWMETA.TMP;1 on 18-APR-1990 10:48:01.69
File ID (741,17,0)   End of file block 111 / Allocated 112

Virtual block number 60 (0000003C), 512 (0200) bytes

 56570000 00C8CBC9 5F5E1F07 8926085E C4045A87 8B261FD6 068EE3D1 065E88D8 Ä.^.ìD..ø.&..Z.á^.&...^_èùà...WV 000000
 C8CBC95F 5E1F0789 26085EC4 037C8788 261FD806 8EE3D106 5E88D88E 048D881E .¡...Ä.^.ìD..Ä.&..|.á^.Ī...^_èùà 000020
 1F078926 085EC4F1 5A878826 1FDA068E E3D1065E 88D88E04 828B1E56 57000000 ...WV.¡ý..Ä.^.ìD..Ò.&..Zþá^.Ī... 000040
 5EC4F014 8788261F DC068EE3 D1065E88 D88E04D7 881E5657 000000C8 CBC95F5E ^_èùà...WV.¡■..Ä.^.ìD..£.&...þá^ 000060
 8B261FDE 068EE3D1 065E88D8 8E04FCB8 1E565700 0000C8CB C95F5E1F 07892608 .Ī...^_èùà...WV.¡■..Ä.^.ìD..8.&. 000080
 8EE3D106 5E88D88E 0521881E 56570000 00C8CBC9 5F5E1F07 8926085E C4E22087 . ãá^.Ī...^_èùà...WV.¡|..Ä.^.ìD. 0000A0
 88D88E05 46881E56 57000000 C8CBC95F 5E1F0789 26085EC4 F8BC8788 261FE006 .Å.&..¥½á^.Ī...^_èùà...WV.¡F..Ä. 0000C0
 881E5657 000000C8 CBC95F5E 1F078926 085EC4F8 96878826 1FE2068E E3D1065E ^.ìD..ã.&...½á^.Ī...^_èùà...WV.¡ 0000E0
 0000C8CB C95F5E1F 07892608 5EC4F184 8788261F E4068EE3 D1065E88 D88E0568 k..Ä.^.ìD..ö.&..Çþá^.Ī...^_èùà.. 000100
 5F5E1F07 8926085E C4F73A87 8B261FE6 068EE3D1 065E88D8 8E0590B8 1E565700 .WV.¡...Ä.^.ìD..Ī.&..:¼á^.Ī...^ 000120
 26085EC4 F5F0878B 261FE806 8EE3D106 5E88D88E 0585881E 56570000 00C8CBC9 èùà...WV.¡ç..Ä.^.ìD..Ò.&..Þ¼á^.Ī 000140
 48878826 1FEA068E E3D1065E 88D88E05 DA881E56 57000000 C8CBC95F 5E1F0789 ...^_èùà...WV.¡Ö..Ä.^.ìD..õ.&..H 000160
 E6D10676 88085EC4 D88E05FF 881E5657 000000C8 CBC95F5E 1F078926 085EC4F8 ½á^.Ī...^_èùà...WV.¡...Äá^..v.ì| 000180
 E6D10676 88085EC4 D88E0624 881E5657 000000C8 CBC95F5E 1F078926 0730848B ..0.&...^¯èùà...WV.¡$..Äá^..v.ì| 0001A0
 E6D10676 88085EC4 D88E0644 881E5657 000000C8 CBC95F5E 1F078926 E788848B ..¡Ó&...^¯èùà...WV.¡D..Äá^..v.ì| 0001C0
 E6D10676 88085EC4 D88E0664 881E5657 000000C8 CBC95F5E 1F078926 0724848B ..$.&...^_èùà...WV.¡d..Äá^..v.ì| 0001E0
```

Dump of file SATURN:[PCCOMMON.DUMP.DLL]NEWMETA.TMP;1 on 18-APR-1990 10:48:01.69
File ID (741,17,0)   End of file block 111 / Allocated 112

Virtual block number 61 (0000003D), 512 (0200) bytes

```
00000000 00000000 00000000 00120684 00020001 CBC95F5E 1F078926 070C848B ....&...^_èù.................... 000000
FFF84689 02C48300 4E00009A 0C76FF00 00F646C7 D88EFFFF 881E5657 00000AC8 à...WV.|...ÄúF-...v....N..é..F½. 000020
F6468800 06E90375 00003DF6 46890000 FFFF9A14 76FF1676 FF086AF8 76FF0A76 v..v½j..v..v.......F-=..u.Õ...F- 000040
FA468902 57882607 8826145E C406C483 FFFF05AD 9A1276FF 5016FE46 8D0062E9 Õb..F±.P.v..Ù....é.é^.&..&.W..F° 000060
F6468900 00FFFF9A FA76FFFC 76FFFE76 FF0E76FF 1076FF06 76FF0876 FFFC5689 .V=.v..v..v..v..v±.v•.v°......F- 000080
B8078926 02478926 000088FA 5EC404FA 46830017 E9F6468B 0006E903 7500003D =..u.Õ...F-Õ...F°.é^°|..&.G.&..| 0000A0
5016FA46 8D0000EA 46C7D88E 0008881E 56570000 16C8C8C9 5F5E1F00 00E90000 ..Õ...^_èùà...WV.|...ÄúFõ...F°.P 0000C0
9A5016F6 468DFA76 FF0E76FF 1076FF06 76FF0876 FF06C483 00FB05AD 9A1276FF .v..Ù.«..é..v..v..v..v..v°.F-.P. 0000E0
02C48300 1700009A 0C76FF00 E4E9EA46 8B0006E9 03750000 3DEA4689 0000FFFF .....Fõ=..u.Õ...FõÕÕ..v.......é. 000100
46890000 002E9A14 76FF1676 FF500004 0502E0C1 F64688F0 76FF0A76 FFF04689 .Fþ.v..vþ.F-èÅ....P.v..v.......F 000120
468DFA76 FF0E76FF 1076FF06 76FF0876 FF00AAE9 EA468800 06E90375 00003DEA õ=..u.Õ...FõÕ`..v..v..v..v..v°.F 000140
37FF2602 77FF2614 5EC40A76 FF0018E9 03750000 3DEA4689 0000FFFF 9A5016F2 ·.P......Fõ=..u.Õ...v.é^.&.w.&.7 000160
57882607 8826145E C4FE5689 FC4689F4 5688F246 8B006EE9 EA468800 00FFFF9A ......FõÕn..F·.V¶.F=.V±é^.&..&.W 000180
02578826 078826FC 5EC4001F E9037502 47082607 8826FC5E C4EE5689 EC468902 ..Fš.VŸá^•&..&.G.u.Õ..é^•&..&.W. 0001A0
26024789 26000088 EC5EC4FF D2E904FC 468304EC 46830257 89260789 26EC5EC4 é^š&..&.W..Fš..F•.Õø.é^š|..&.G.& 0001C0
18C8C8C9 5F5E1F00 00E90000 B80000FF FF9AF276 FFF476FF 0676FF08 76FF0789 ...v..v..v¶.v·.....|..Õ...^_èùà. 0001E0
```

Dump of file SATURN:[PCCOMMON.DUMP.DLL]NEWMETA.TMP;1 on 18-APR-1990 10:48:01.69
File ID (741,17,0)   End of file block 111 / Allocated 112

Virtual block number 62 (0000003E), 512 (0200) bytes

```
FA468DEE 468902C4 83020800 009A0C76 FF0000E8 46C7D88E 0082881E 56570000 ..WV.|ý..ÄúFò...v.......é..FŸ.F° 000000
16F4468D FA76FF0E 76FF1076 FF0676FF 0876FF06 C48302A9 05AD9A12 76FF5016 .P.v..Ù.`..é..v..v..v..v..v°.F¶. 000020
F44688EE 76FF0A76 FF0129E9 E8468800 06E90375 00003DE8 46890000 00E09A50 P.Å....Fò=..u.Õ...FòÕ)..v..vŸ.F¶ 000040
E8468800 06E90375 00003DE8 46890000 011A9A14 76FF1676 FF500004 0502E0C1 èÅ....P.v..v.......Fò=..u.Õ...Fò 000060
3DE84689 00000144 9A5016F0 468DFA76 FF0E76FF 1076FF06 76FF0876 FF00FDE9 Õ»..v..v..v..v..v°.Fþ.P.D....Fò= 000080
8D00C1E9 E8468800 0001619A 37FF2602 77FF2614 5EC40A76 FF0018E9 03750000 ..u.Õ...v.é^.&.w.&.7.e....FòÕè.. 0000A0
4688EC56 89EA4689 02578826 07882614 5EC406C4 8300C606 5C9A026A 5016FA46 F°.Pj..\.ó..é.é^.&..&.W..Fõ.Vš.F 0000C0
FF005DE9 037F00F8 7E83F84E FF0003E9 F84689F4 4688FE56 89FC4689 F2568BF0 Þ.V·.F•.V±.F¶.F½Õ...N½.-½...Õ].. 0000E0
E8468900 0000799A EA76FFEC 76FFFA76 FF37FF26 0277FF26 FC5EC406 76FF0876 v..v.é^•&.w.&.7.v°.vš.võ.y....Fò 000100
26145EC4 0A76FF00 0003569A F076FFF2 76FF0676 FF0876FF 0029E903 7500003D =..u.Õ)..v..v..v·.vþ.V....v.é^.& 000120
B8EA5EC4 FF97E904 EA468304 FC468300 2FE9E846 8B000002 959A37FF 260277FF .w.&.7......FòÕ/..F•..Fõ.Õ..é^õ| 000140
0000E900 00B80000 01CF9AF0 76FFF276 FF0676FF 0876FF07 89260247 89260000 ..&.G.&...v..v..v·.vþ.ü...|..Õ.. 000160
0000000A 01F50002 00780004 02F90203 006F0004 02780203 000890C8 C95F5E1F .^_èù.....x...o...°...(...%..... 000180
00000012 01E60002 009E0004 03150203 00220003 03270203 00140003 024E0203 ..Ñ.......'..."............]..... 0001A0
00F646C7 D88EFFFF 881E5657 00000AC8 00000000 00000000 00470004 02220203 .."...G.........à...WV.|...ÄúF-. 0001C0
FFFF9A14 76FF1676 FF086AF8 76FF0A76 FFF84689 02C48300 4E00009A 0C76FF00 ..v....N..é..F½.v..v½j..v..v.... 0001E0
```

Dump of file SATURN:[PCCOMMON.DUMP.DLL]NEWMETA.TMP;1 on 18-APR-1990 10:48:01.69
File ID (741,17,0)   End of file block 111 / Allocated 112

Virtual block number 63 (0000003F), 512 (0200) bytes

```
FFFF05F7 9A1276FF 5016FE46 8D0062E9 F6468800 06E90375 00003DF6 46890000 ...F-=..u.Õ...F-Õb..F±.P.v..¥... 000000
FF0E76FF 1076FF06 76FF0876 FFFC5689 FA468902 57882607 8826145E C406C483 .é.é^.&..&.W..F°.V=.v..v..v..v.. 000020
46830017 E9F6468B 0006E903 7500003D F6468900 00FFFF9A FA76FFFC 76FFFE76 v±.v•.v°......F-=..u.Õ...F-Õ...F 000040
56570000 16C8C8C9 5F5E1F00 00E90000 B8078926 02478926 000088FA 5EC404FA °.é^°|..&.G.&..|..Õ...^_èùà...WV 000060
76FF0876 FF06C483 00FB05AD 9A1276FF 5016FA46 8D0000EA 46C7D88E 0008881E .|...ÄúFõ...F°.P.v..Ù.«..é..v..v 000080
8B0006E9 03750000 3DEA4689 0000FFFF 9A5016F6 468DFA76 FF0E76FF 1076FF06 ..v..v..v°.F-.P......Fõ=..u.Õ... 0000A0
0502E0C1 F64688F0 76FF0A76 FFF04689 02C48300 1700009A 0C76FF00 E4E9EA46 FõÕÕ..v.......é..Fþ.v..vþ.F-èÅ.. 0000C0
FF00AAE9 EA468800 06E90375 00003DEA 46890000 002E9A14 76FF1676 FF500004 ..P.v..v.......Fõ=..u.Õ...FõÕ`.. 0000E0
03750000 3DEA4689 0000FFFF 9A5016F2 468DFA76 FF0E76FF 1076FF06 76FF0876 v..v..v..v..v°.F·.P......Fõ=..u. 000100
5688F246 8B006EE9 EA468800 00FFFF9A 37FF2602 77FF2614 5EC40A76 FF0018E9 Õ...v.é^.&.w.&.7......FõÕn..F·.V 000120
47082607 8826FC5E C4EE5689 EC468902 57882607 8826145E C4FE5689 FC4689F4 ¶.F=.V±é^.&..&.W..Fš.VŸá^•&..&.G 000140
468304EC 46830257 89260789 26EC5EC4 02578826 078826FC 5EC4001F E9037502 .u.Õ..é^•&..&.W.é^š&..&.W..Fš..F 000160
FF9AF276 FFF476FF 0676FF08 76FF0789 26024789 26000088 EC5EC4FF D2E904FC •.Õø.é^š|..&.G.&...v..v..v¶.v·.. 000180
FF0000E8 46C7D88E 0082881E 56570000 18C8C8C9 5F5E1F00 00E90000 B80000FF ...|..Õ...^_èùà...WV.|ý..ÄúFò... 0001A0
0876FF06 C48302A9 05AD9A12 76FF5016 FA468DEE 468902C4 83020800 009A0C76 v.......é..FŸ.F°.P.v..Ù.`..é..v. 0001C0
06E90375 00003DE8 46890000 00E09A50 16F4468D FA76FF0E 76FF1076 FF0676FF .v..v..v..v°.F¶.P.Å....Fò=..u.Õ. 0001E0
```

```
Dump of file SATURN:[PCCOMMON.DUMP.DLL]NEWMETA.TMP;1 on 18-APR-1990 10:48:01.69
File ID (741,17,0)   End of file block 111 / Allocated 112

Virtual block number 64 (00000040), 512 (0200) bytes

011A9A14 76FF1676 FF500004 0502E0C1 F4468BEE 76FF0A76 FF0129E9 E8468B00 ..FÒÕ)..v..vŸ.F¶èÀ....P.v..v.... 000000
FF0E76FF 1076FF06 76FF0876 FF00FDE9 E8468B00 06E90375 00003DE8 46890000 ...FÒ=..u.Õ...FÒÕ»..v..v..v..v.. 000020
77FF2614 5EC40A76 FF0018E9 03750000 3DE84689 00000144 9A5016F0 468DFA76 v¹.FÞ.P.D....FÒ=..u.Õ...v.ó^.&.w 000040
5EC406C4 8300C606 5C9A046A 5016FA46 8D00C1E9 E8468B00 0001619A 37FF2602 .&.7.a....FÒÕé..F¹.Pj..\.ó..á.ó^ 000060
F84689F4 468BFE56 89FC4689 F2568BF0 468BEC56 89EA4689 02578B26 078B2614 .&..&.W..Fõ.Vš.FÞ.V·.F•.V±.F¶.F½ 000080
FF37FF26 0277FF26 FC5EC406 76FF0876 FF005DE9 037F00F8 7E83F84E FF0003E9 Õ...N½.-½...Õ]..v..v.ó^=&.w.&.7. 0000A0
76FF0676 FF0876FF 0029E903 7500003D E8468900 0000799A EA76FFEC 76FFFA76 v¹.vš.võ.y....FÒ=..u.Õ)..v..v..v 0000C0
2FE9E846 8B000002 959A37FF 260277FF 26145EC4 0A76FF00 0003569A F076FFF2 ·.vÞ.V....v.ó^.&.w.&.7......FÒÕ/ 0000E0
FF0676FF 0876FF07 89260247 89260000 8BEA5EC4 FF97E904 EA468304 FC468300 ..F•..Fõ.Õ..ó^õ|..&.G.&...v..v.. 000100
006F0004 02780203 000890CB C95F5E1F 0000E900 00B80000 01CF9AF0 76FFF276 v·.vÞ.ü...|..Õ...^_èü.....x...o. 000120
00220003 03270203 00140003 024E0203 0000000A 01F50002 00780004 02F90203 ..¹...(...%.......Ñ.......'...". 000140
00000000 00000000 00470004 02220203 00000012 01E60002 009E0004 03150203 ..........|.......".. G......... 000160
FFF84689 02C48300 4E00009A 0C76FF00 00F646C7 D88EFFFF B81E5657 00000AC8 à...WV.|...ÀúF-...v....N..ó..F½. 000180
F6468B00 06E90375 00003DF6 46890000 FFFF9A14 76FF1676 FF086AF8 76FF0A76 v..v½j..v..v.......F-=..u.Õ...F- 0001A0
FA468902 578B2607 8B26145E C406C483 FFFF05D2 9A1276FF 5016FE46 8D0062E9 Õb..F±.P.v..Ø....ó.ó^.&..&.W..F¹ 0001C0
F6468900 00FFFF9A FA76FFFC 76FFFE76 FF0E76FF 1076FF06 76FF0876 FFFC5689 .V=.v..v..v..v..v±.v•.v¹......F- 0001E0

Dump of file SATURN:[PCCOMMON.DUMP.DLL]NEWMETA.TMP;1 on 18-APR-1990 10:48:01.69
File ID (741,17,0)   End of file block 111 / Allocated 112

Virtual block number 65 (00000041), 512 (0200) bytes

B8078926 02478926 0000B8FA 5EC404FA 46830017 E9F6468B 0006E903 7500003D =..u.Õ...F-Õ...F¹.ó^¹|..&.G.&..| 000000
5016FA46 8D0000EA 46C7D88E 0008B81E 56570000 16C8CBC9 5F5E1F00 00E90000 ..Õ...^_èùà...WV.|...ÀúFõ...F¹.P 000020
9A5016F6 468DFA76 FF0E76FF 1076FF06 76FF0876 FF06C483 00FB05D2 9A1276FF .v..Ø.«..ó..v..v..v..v..v¹.F-.P. 000040
02C48300 1700009A 0C76FF00 E4E9EA46 8B0006E9 03750000 3DEA4689 0000FFFF .....Fõ=..u.Õ...FõÕØ..v.......ó. 000060
46890000 002E9A14 76FF1676 FF500004 0502E0C1 F6468BF0 76FF0A76 FFF04689 .FÞ.v..vÞ.F-èÀ....P.v..v.......F 000080
468DFA76 FF0E76FF 1076FF06 76FF0876 FF00AAE9 EA468B00 06E90375 00003DEA õ=..u.Õ...FõÕ¯..v..v..v..v..v¹.F 0000A0
37FF2602 77FF2614 5EC40A76 FF0018E9 03750000 3DEA4689 0000FFFF 9A5016F2 ·.P......Fõ=..u.Õ...v.ó^.&.w.&.7 0000C0
578B2607 8B26145E C4FE5689 FC4689F4 568BF246 8B006EE9 EA468B00 00FFFF9A ......FõÕn..F·.V¶.F=.V±ó^.&..&.W 0000E0
02578B26 078B26FC 5EC4001F E9037502 47082607 8B26FC5E C4EE5689 EC468902 ..Fš.VŸó^=&..&.G.u.Õ..ó^=&..&.W. 000100
26024789 260000B8 EC5EC4FF D2E904FC 468304EC 46830257 89260789 26EC5EC4 ó^š&..&.W..Fš..F=.ÕØ.ó^š|..&.G.& 000120
18C8CBC9 5F5E1F00 00E90000 B80000FF FF9AF276 FFF476FF 0676FF08 76FF0789 ...v..v..v¶.v·.....|..Õ...^_èùà. 000140
FA468DEE 468902C4 83020800 009A0C76 FF0000E8 46C7D88E 0082B81E 56570000 ..WV.|Ÿ..ÀúFÒ...v.......ó..FŸ.F¹ 000160
16F4468D FA76FF0E 76FF1076 FF0676FF 0876FF06 C48302A9 05D29A12 76FF5016 .P.v..Ø.¨..ó..v..v..v..v..v¹.F¶. 000180
F4468BEE 76FF0A76 FF0129E9 E8468B00 06E90375 00003DE8 46890000 00E09A50 P.À....FÒ=..u.Õ...FÒÕ)..v..vŸ.F¶ 0001A0
E8468B00 06E90375 00003DE8 46890000 011A9A14 76FF1676 FF500004 0502E0C1 èÀ....P.v..v.......FÒ=..u.Õ...FÒ 0001C0
3DE84689 00000144 9A5016F0 468DFA76 FF0E76FF 1076FF06 76FF0876 FF00FDE9 Õ»..v..v..v..v..v¹.FÞ.P.D....FÒ= 0001E0

Dump of file SATURN:[PCCOMMON.DUMP.DLL]NEWMETA.TMP;1 on 18-APR-1990 10:48:01.69
File ID (741,17,0)   End of file block 111 / Allocated 112

Virtual block number 66 (00000042), 512 (0200) bytes

8D00C1E9 E8468B00 0001619A 37FF2602 77FF2614 5EC40A76 FF0018E9 03750000 ..u.Õ...v.ó^.&.w.&.7.a....FÒÕé.. 000000
468BEC56 89EA4689 02578B26 078B2614 5EC406C4 8300C606 5C9A036A 5016FA46 F¹.Pj..\.ó..ó.ó^.&..&.W..Fõ.Vš.F 000020
FF005DE9 037F00F8 7E83F84E FF0003E9 F84689F4 468BFE56 89FC4689 F2568BF0 Þ.V·.F•.V±.F¶.F½Õ...N½.-½...Õ].. 000040
E8468900 0000799A EA76FFEC 76FFFA76 FF37FF26 0277FF26 FC5EC406 76FF0876 v..v.ó^=&.w.&.7.v¹.vš.võ.y....FÒ 000060
26145EC4 0A76FF00 0003569A F076FFF2 76FF0676 FF0876FF 0029E903 7500003D =..u.Õ)..v..v..v·.vÞ.V....v.ó^.& 000080
B8EA5EC4 FF97E904 EA468304 FC468300 2FE9E846 8B000002 959A37FF 260277FF .w.&.7......FÒÕ/..F•..Fõ.Õ..ó^õ| 0000A0
0000E900 00B80000 01CF9AF0 76FFF276 FF0676FF 0876FF07 89260247 89260000 ..&.G.&...v..v..v·.vÞ.ü...  .Õ.. 0000C0
0000000A 01F50002 00780004 02F90203 006F0004 02780203 000890CB C95F5E1F .^_èü.....x...o...¹...(...%..... 0000E0
00000012 01E60002 009E0004 03150203 00220003 03270203 00140003 024E0203 ..Ñ.......'...".........|...... 000100
00F646C7 D88EFFFF B81E5657 00000AC8 00000000 00000000 00470004 02220203 .."...G.........à...WV.|...ÀúF-. 000120
FFFF9A14 76FF1676 FF086AF8 76FF0A76 FFF84689 02C48300 4E00009A 0C76FF00 ..v....N..ó..F½.v..v½j..v..v.... 000140
FFFF0588 9A1276FF 5016FE46 8D0062E9 F6468B00 06E90375 00003DF6 46890000 ...F-=..u.Õ...F-Õb..F±.P.v...... 000160
FF0E76FF 1076FF06 76FF0876 FFFC5689 FA468902 578B2607 8B26145E C406C483 .ó.ó^.&..&.W..F¹.V=.v..v..v..v.. 000180
46830017 E9F6468B 0006E903 7500003D F6468900 00FFFF9A FA76FFFC 76FFFE76 v±.v•.v¹......F-=..u.Õ...F-Õ...F 0001A0
56570000 16C8CBC9 5F5E1F00 00E90000 B8078926 02478926 0000B8FA 5EC404FA ¹.ó^¹|..&.G.&..|..Õ...^_èùà...WV 0001C0
76FF0876 FF06C483 00FB0588 9A1276FF 5016FA46 8D0000EA 46C7D88E 0008B81E .|...ÀúFõ...F¹.P.v....«..ó..v..v 0001E0
```

Dump of file SATURN:[PCCOMMON.DUMP.DLL]NEWMETA.TMP;1 on 18-APR-1990 10:48:01.69
File ID (741,17,0)   End of file block 111 / Allocated 112

Virtual block number 67 (00000043), 512 (0200) bytes

880006E9 03750000 3DEA4689 0000FFFF 9A5016F6 4680FA76 FF0E76FF 1076FF06 ..v..v..v*.F-.P......Fõ=..u.Õ... 000000
0502E0C1 F6468BF0 76FF0A76 FFF04689 02C48300 1700009A 0C76FF00 E4E9EA46 FõÕõ..v.......ó..FÞ.v..vÞ.F-èÁ.. 000020
FF00AAE9 EA468800 06E90375 00003DEA 46890000 002E9A14 76FF1676 FF500004 ..P.v..v.......Fõ=..u.Õ...FõÕ˙.. 000040
03750000 3DEA4689 0000FFFF 9A5016F2 4680FA76 FF0E76FF 1076FF06 76FF0876 v..v..v..v..v*.F·.P......Fõ=..u. 000060
5688F246 88006EE9 EA468800 00FFFF9A 37FF2602 77FF2614 5EC40A76 FF0018E9 Õ...v.ó^.&.w.&.7......FõÕn..F·.V 000080
47082607 8826FC5E C4EE5689 EC468902 57882607 8826145E C4FE5689 FC4689F4 ¶.F=.V±ó^.&..&.W..F§.VŸó^=&..&.G 0000A0
468304EC 46830257 89260789 26EC5EC4 02578826 078826FC 5EC4001F E9037502 .u.Õ..ó^=&..&.W.ó^§&..&.W..F§..F 0000C0
FF9AF276 FFF476FF 0676FF08 76FF0789 26024789 26000088 EC5EC4FF D2E904FC =.Õ0.ó^§¦..&.G.&...v..v..v¶.v·.. 0000E0
00780004 00790203 006F0004 01440203 0008CBC9 5F5E1F00 00E90000 880000FF ...¦..Õ...^_èù....D...o...y...(. 000100
009E0004 01CF0203 00220003 01610203 00140003 011A0203 0000000A 00C60002 ..ó...............=...".. ü..... 000120
00F646C7 D88EFFFF 881E5657 00000AC8 00470004 00E00203 00000012 00820002 ..ý.......Å...G.à...WV.¦...ÄúF-. 000140
FFFF9A14 76FF1676 FF086AF8 76FF0A76 FFF84689 02C48300 4E00009A 0C76FF00 ..v....N..ó..F½.v..v½j..v..v.... 000160
FFFF04CF 9A1276FF 5016FE46 8D0062E9 F6468800 06E90375 00003DF6 46890000 ...F-=..u.Õ...F-Õb..F±.P.v..ü... 000180
FF0E76FF 1076FF06 76FF0876 FFFC5689 FA468902 57882607 8826145E C406C483 .ó.ó^.&..&.W..F*.V=.v..v..v..v.. 0001A0
46830017 E9F64688 0006E903 7500003D F6468900 00FFFF9A FA76FFFC 76FFFE76 v±.v=.v*......F-=..u.Õ...F-Õ...F 0001C0
56570000 0AC8CBC9 5F5E1F00 00E90000 88078926 02478926 000088FA 5EC404FA *.ó^*¦..&.G.&..¦..Õ...^_èùà...WV 0001E0

Dump of file SATURN:[PCCOMMON.DUMP.DLL]NEWMETA.TMP;1 on 18-APR-1990 10:48:01.69
File ID (741,17,0)   End of file block 111 / Allocated 112

Virtual block number 68 (00000044), 512 (0200) bytes

6AF876FF 0A76FFF8 468902C4 8300F800 009A0C76 FF0000F6 46C7D88E 0008881E .¦...ÄúF-...v....½..ó..F½.v..v½j 000000
FE468000 62E9F646 880006E9 03750000 3DF64689 0000002E 9A1476FF 1676FF08 ..v..v.......F-=..u.Õ...F-Õb..F± 000020
0876FFFC 5689FA46 89025788 26078826 145EC406 C4830017 063C9A12 76FF5016 .P.v..<.....ó.ó^.&..&.W..F*.V=.v. 000040
E9037500 0030F646 89000000 799AFA76 FFFC76FF FE76FF0E 76FF1076 FF0676FF .v..v..v..v±.v=.v*.y....F-=..u.Õ 000060
1F0000E9 00008807 89260247 89260000 88FA5EC4 04FA4683 0017E9F6 46880006 ...F-Õ...F*.ó^*¦..&.G.&..¦..Õ... 000080
02C48301 A200009A 0C76FF00 00F646C7 D88E0082 881E5657 00000AC8 CBC95F5E ^_èùà...WV.¦ý..ÄúF-...v....Å..ó. 0000A0
06E90375 00003DF6 46890000 00D89A14 76FF1676 FF086AF8 76FF0A76 FFF84689 .F½.v..v½j..v..v..Ä....F-=..u.Õ. 0000C0
57882607 8826145E C406C483 00C10519 9A1276FF 5016FE46 8D0062E9 F6468800 ..F-Õb..F±.P.v....è..ó.ó^.&..&.W 0000E0
0001239A FA76FFFC 76FFFE76 FF0E76FF 1076FF06 76FF0876 FFFC5689 FA468902 ..F*.V=.v..v..v..v..v±.v=.v*.#.. 000100
02478926 000088FA 5EC404FA 46830017 E9F64688 0006E903 7500003D F6468900 ..F-=..u.Õ...F-Õ...F*.ó^*¦..&.G. 000120
FF0000F6 46C7D88E 015C881E 56570000 0AC8CBC9 5F5E1F00 00E90000 88078926 &..¦..Õ...^_èùà...WV.¦\..ÄúF-... 000140
00000182 9A1476FF 1676FF08 6AF876FF 0A76FFF8 468902C4 83024C00 009A0C76 v....L..ó..F½.v..v½j..v..v...... 000160
C4830168 04F49A12 76FF5016 FE468000 62E9F646 880006E9 03750000 3DF64689 .F-=..u.Õ...F-Õb..F±.P.v..¶.k..ó 000180
FE76FF0E 76FF1076 FF0676FF 0876FFFC 5689FA46 89025788 26078826 145EC406 .ó^.&..&.W..F*.V=.v..v..v..v..v± 0001A0
04FA4683 0017E9F6 46880006 E9037500 0030F646 89000001 CD9AFA76 FFFC76FF .v=.v*.ë....F-=..u.Õ...F-Õ...F*. 0001C0
881E5657 000016C8 CBC95F5E 1F0000E9 00008807 89260247 89260000 88FA5EC4 ó^*¦..&.G.&..¦..Õ...^_èùà...WV.¦ 0001E0

Dump of file SATURN:[PCCOMMON.DUMP.DLL]NEWMETA.TMP;1 on 18-APR-1990 10:48:01.69
File ID (741,17,0)   End of file block 111 / Allocated 112

Virtual block number 69 (00000045), 512 (0200) bytes

FF0676FF 0876FF06 C48302F9 04CF9A12 76FF5016 FA468000 00EA46C7 D88E0206 ...ÄúFõ...F*.P.v..ü.*..ó..v..v.. 000000
EA468800 06E90375 00003DEA 46890000 FFFF9A50 16F6468D FA76FF0E 76FF1076 v..v..v*.F-.P......Fõ=..u.Õ...Fõ 000020
00040502 E0C1F646 88F076FF 0A76FFF0 468902C4 83021500 009A0C76 FF00E4E9 ÕÕ..v.......ó..FÞ.v..vÞ.F-èÁ.... 000040
0876FF00 AAE9EA46 880006E9 03750000 3DEA4689 0000022C 9A1476FF 1676FF50 P.v..v..,....Fõ=..u.Õ...FõÕ˙..v. 000060
18E90375 00003DEA 46890000 FFFF9A50 16F2468D FA76FF0E 76FF1076 FF0676FF .v..v..v..v*.F·.P......Fõ=..u.Õ. 000080
89F45688 F2468800 6EE9EA46 880000FF FF9A37FF 260277FF 26145EC4 0A76FF00 ..v.ó^.&.w.&.7......FõÕn..F·.V¶. 0000A0
75024708 26078826 FC5EC4EE 5689EC46 89025788 26078826 145EC4FE 5689FC46 F=.V±ó^.&..&.W..F§.VŸó^=&..&.G.u 0000C0
04FC4683 04EC4683 02578926 078926EC 5EC40257 88260788 26FC5EC4 001FE903 .Õ..ó^=&..&.W.ó^§&..&.W..F§..F=. 0000E0
00FFFF9A F276FFF4 76FF0676 FF0876FF 07892602 47892600 0088EC5E C4FFD2E9 Õ0.ó^§¦..&.G.&...v..v..v¶.v·.... 000100
FA468000 00EA46C7 D88E0280 881E5657 000016C8 CBC95F5E 1F0000E9 00008800 .¦..Õ...^_èùà...WV.¦¯..ÄúFõ...F* 000120
16F6468D FA76FF0E 76FF1076 FF0676FF 0876FF06 C4830420 04F49A12 76FF5016 .P.v..¶.-..ó..v..v..v..v..v*.F-. 000140
8302C400 009A0C76 FF00E4E9 EA468800 06E90375 00003DEA 46890000 02DE9A50 P.8....Fõ=..u.Õ...FõÕÕ..v....ó.. 000160
00000318 9A1476FF 1676FF50 00040502 E0C1F646 88F076FF 0A76FFF0 468902C4 ó..FÞ.v..vÞ.F-èÁ....P.v..v...... 000180
FA76FF0E 76FF1076 FF0676FF 0876FF00 AAE9EA46 880006E9 03750000 3DEA4689 .Fõ=..u.Õ...FõÕ˙..v..v..v..v..v* 0001A0
260277FF 26145EC4 0A76FF00 18E90375 00003DEA 46890000 03429A50 16F2468D .F·.P.8....Fõ=..u.Õ...v.ó^.&.w.& 0001C0
26078826 145EC4FE 5689FC46 89F45688 F2468800 6EE9EA46 88000003 5F9A37FF .7._.....FõÕn..F·.V¶.F=.V±ó^.&..& 0001E0

Dump of file SATURN:[PCCOMMON.DUMP.DLL]NEWMETA.TMP;1 on 18-APR-1990 10:48:01.69
File ID (741,17,0)   End of file block 111 / Allocated 112

Virtual block number 70 (00000046), 512 (0200) bytes

```
8B26078B 26FC5EC4 001FE903 7502470B 26078B26 FC5EC4EE 5689EC46 8902578B .W..Fš.VŸá^=&..&.G.u.Õ..á^=&..&. 000000
47892600 00B8EC5E C4FFD2E9 04FC4683 04EC4683 02578926 078926EC 5EC40257 W.á^š&..&.W..Fš..F•.Õ0.á^šj..&.G 000020
CBC95F5E 1F0000E9 0000B800 0003CD9A F276FFF4 76FF0676 FF0876FF 07892602 .&...v..v..v¶.v·.ë...|..Õ...^_èù 000040
8DEC4689 02C48305 3A00009A 0C76FF00 00EA46C7 D88E03E4 B81E5657 000016C8 à...WV.|õ..ÄúFõ...v....:..á..Fš. 000060
468DF676 FF0E76FF 1076FF06 76FF0876 FF06C483 03F804CF 9A1276FF 5016F646 F-.P.v..ü.½..á..v..v..v..v..v-.F 000080
0004939A EE76FFF0 76FF0A76 FF0014E9 03750000 3DEA4689 00000476 9A5016EE Ÿ.P.v....Fõ=..u.Õ...v..vþ.vŸ.... 0000A0
02578B26 078B26EE 5EC40021 E9037502 470B2607 8B26EE5E C4009DE9 EA468B00 ..FõÕ..á^Ÿ&..&.G.u.Õ!.á^ °..&.W. 0000C0
00B80007 C626145E C40000E9 00000560 9AEE76FF F076FF0A 76FFF456 89F24689 .F·.V¶.v..vþ.vŸ.m...Õ..á^ `ó..¡. 0000E0
FFF276FF F476FF06 76FF0876 FF06C483 0527061C 9A036A50 16F6468D 0060E900 .Õ'..F-.Pj....'..á..v..v..v¡.v·. 000100
FE76FF06 76FF0876 FF0020E9 0375FE46 0BFC468B 00000277 9A5016FC 468DF676 v-.F•.P.w....F•.F±u.Õ ..v..v..v± 000120
468B0007 C626145E C40007E9 EA468900 00FFFF9A 1476FF16 76FF0097 68FC76FF .v•h...v..v.......FõÕ..á^.&ó...F 000140
0000B80C 5EC40000 FA46C7D8 8E051BB8 1E565700 000AC8CB C95F5E1F 0000E9EA õÕ...^_èùà...WV.¡...ÁúF•..á^.¡.. 000160
8DFE76FF 0676FF08 76FF06C4 8305BE04 859A0A6A 5016FE46 8D078926 02478926 &.G.&...F±.Pj..../..á..v..v..v±. 000180
E9FA468B 02578926 078926F8 568BF646 8B0C5EC4 FA468900 00FFFF9A 5016F646 F-.P......F•á^..F-.V½&..&.W..F•Õ 0001A0
260277FF 26065EC4 00000646 C7D88E06 21B81E56 57000034 C8CBC95F 5E1F0000 ...^_èùà4..WV.¡l..ÁúFø..á^.&.w.& 0001C0
E25EC4DC 5689DA46 8904578B 2602478B 26E25EC4 0000FFFF 9A5016E2 468D37FF .7.Fã.P.....á^ã&.G.&.W..FÖ.VÉá^ã 0001E0
```

Dump of file SATURN:[PCCOMMON.DUMP.DLL]NEWMETA.TMP;1 on 18-APR-1990 10:48:01.69
File ID (741,17,0)   End of file block 111 / Allocated 112

Virtual block number 71 (00000047), 512 (0200) bytes

```
DA76FFDC 76FFF056 89EE4689 0C5688OA 468B0456 89D24689 08578B26 06478B26 &.G.&.W..F0.V&.F..V..FŸ.Vþ.vÉ.vÖ 000000
0001D046 C70418E9 D6468B00 06E90375 00003D06 46890000 FFFF9A50 16EA468D .Fõ.P......Fø=..u.Õ...FøÕ..úFÅ.. 000020
8006199A DA76FFDC 76FF37FF 26E25EC4 5016CC46 8D03F0E9 0375F046 0BEE468B .FŸ.Fþu.Õþ..Fä.Pá^ã&.7.vÉ.vÖ.... 000040
04F49A09 64685016 D8468D03 DEE9D646 8B0006E9 03750000 3D064689 0AC48308 ..á..Fø=..u.Õ...FøÕß..FÄ.Phd..¶. 000060
FFCE76FF DA76FFDC 76FFDE46 8904C483 077F02A0 9A096068 09646806 C483073E >..á.hd.h'.......á..Fß.vÉ.vÖ.vö. 000080
46880006 E9037500 003DD646 890000FF FF9AD876 FFD276FF D476FFDE 76FFCC76 vä.vß.vå.v0.vÄ......Fø=..u.Õ...F 0000A0
CC76FFCE 76FFDA76 FFDC76FF 06C48307 C605199A 10696850 16DE4680 038FE9D6 øÕ...Fß.Phi....ó..á..vÉ.vÖ.vö.vä 0000C0
46FF0355 E9D6468B 0006E903 7500030D D6468900 0007E69A 50160046 8DDE76FF .vß.FÅ.P.Ì....Fø=..u.Õ...FøÕU..F 0000E0
76FFDC76 FF06C483 08060519 9A106868 5016DE46 8D02E2E9 40478B26 EE5EC4D0 Åá^Ÿ&.GàÕã..Fß.Phh.......á..vÉ.v 000100
00003D06 46890000 08269A50 52004005 F0568BEE 468BDE76 FFCC76FF CE76FFDA Õ.vö.vä.vß.FŸ.Vþ.ə.RP.&....Fø=.. 000120
76FFDC76 FF06C483 06410519 9A106868 5016DE46 8D0308E9 D6468B00 06E90375 u.Õ...FøÕ...Fß.Phk....A..á..vÉ.v 000140
00003D06 46890000 FFFF9A50 52004205 F0568BEE 468BDE76 FFCC76FF CE76FFDA Ö.vö.vä.vß.FŸ.Vþ.B.RP......Fø=.. 000160
8026EE5E C4014CE9 03750013 7F8026EE 5EC40282 E902C8E9 D6468B00 06E90375 u.Õ...FøÕà.Õ..á^Ÿ&....u.ÕL.á^Ÿ&. 000180
52001305 F0568BEE 468B5016 FA468D50 16F6468D 0001FA46 C70140E9 0375003F ?.u.Õə.úF•...F-.P.F•.P.FŸ.Vþ...R 0001A0
0006E903 7500030D D6468914 C483FFFF 10309ADA 76FFDC76 FFEA76FF EC76FF50 P.vš.võ.vÉ.vÖ.=....á..Fø=..u.Õ.. 0001C0
FFCE76FF DA76FFDC 76FF06C4 83090E05 199A1068 6850160B 4680026D E9D6468B .FøÕm..FÅ.Phh.......á..vÉ.vÖ.vö. 0001E0
```

Dump of file SATURN:[PCCOMMON.DUMP.DLL]NEWMETA.TMP;1 on 18-APR-1990 10:48:01.69
File ID (741,17,0)   End of file block 111 / Allocated 112

Virtual block number 72 (00000048), 512 (0200) bytes

```
0233E9D6 46880006 E9037500 003DD646 8900000A 7F9A5016 FA468DD8 76FFCC76 vä.vÄ.F•.P......Fø=..u.Õ...FøÕ3. 000000
83098B12 A69ADA76 FFDC76FF F676FFF8 76FFEE76 FFF076FF FA76FF50 16E6468D .FÌ.P.v•.vþ.vŸ.v½.v-.vÉ.vÖ.Ì.£.. 000020
091C0519 9A106A68 5016DE46 8D0200E9 D6468B00 06E90375 00003D06 468912C4 á..Fø=..u.Õ...FøÕ...Fß.Phj...... 000040
DC76FF00 31E90374 03FA7E83 D8468904 C48309C8 02A09A10 6868106A 6806C483 .á.hj.hh....ù..á..FÄ.-•.t.Õ1..vÉ 000060
00003D06 46890000 097F9AD8 76FFE676 FFE876FF DE76FFCC 76FFCE76 FFDA76FF .vÖ.vö.vä.vß.vÒ.vÌ.vÄ......Fø=.. 000080
CE76FFDA 76FFDC76 FF002DE9 037404FA 7E830036 E901A8E9 D6468B00 06E90375 u.Õ...FøÕ¨.Õ6..-•.t.Õ-..vÉ.vÖ.vö 0000A0
46880006 E9037500 003DD646 89000009 FD9A096A E676FFE8 76FFDE76 FFCC76FF .vä.vß.vÒ.vÌj..»....Fø=..u.Õ...F 0000C0
FFD476FF EE76FFF0 76FF5016 FC468D50 16F2468D 5016E646 8D00FDE9 016FE9D6 øÕo.Õ»..FÌ.P.F·.P.F•.P.vþ.vŸ.vå. 0000E0
06C48307 3005199A 10686850 16E0468D 18C48307 0F14F59A DA76FFDC 76FFD276 v0.vÉ.vÖ.%....á..FÅ.Phh....0..á. 000100
FFCE76FF DA76FFDC 76FF0034 E90375E8 460BE646 8B003FE9 0375FE46 0BFC468B .F•.F±u.Õ?..FÌ.FÒu.Õ4..vÉ.vÖ.vö. 000120
E9D6468B 0006E903 7500030D D6468900 000A479A 0C6AE676 FFE876FF 066ACC76 väj..vÒ.vÌj..G....Fø=..u.Õ...FøÕ 000140
0034E903 75E8460B E6468B00 3FE90375 F4460BF2 46880050 E90003FA 46C700F1 þ.úF•..ÕP..F·.F¶u.Õ?..FÌ.FÒu.Õ4. 000160
003DD646 89000007 5F9A096A E676FFE8 76FF066A CC76FFCE 76FFDA76 FFDC76FF .vÉ.vÖ.vö.väj..vÒ.vÌj.. ....Fø=. 000180
DA76FFDC 76FF0099 E9FFFFB8 0006E900 04FA46C7 00A7E906 46880006 E9037500 .u.Õ...FøÕÌ.úF•..Õ..|..Õ...vÉ.vÖ 0001A0
46880006 E9037500 003DD646 89000007 999A5016 FA468DE0 76FFCC76 FFCE76FF .vö.vä.vÄ.F•.P......Fø=..u.Õ...F 0001C0
00063DFD 91E9037F 00053DFF F2E9037D 00013D00 23E90026 E90029E9 006FE9D6 øÕo.Õ).Õ&.Õ#.=..).Õ·.=....Õ.»=.. 0001E0
```

Dump of file SATURN:[PCCOMMON.DUMP.DLL]NEWMETA.TMP;1 on 18-APR-1990 10:48:01.69
File ID (741,17,0) End of file block 111 / Allocated 112

Virtual block number 73 (00000049), 512 (0200) bytes

```
E9037401 46870B26 0144878B 26EE5EC4 FFD7E9FC FEE9037F 00093DFF E2E9037D ).Õã.=....Õ±•Õ¤.á^Ÿ&..D.&..F.t.Õ 000000
FF26065E C4FC05E9 F05689EE 46890146 97882601 44878826 EE5EC400 16E90003 ..Õ..á^Ÿ&..D.&..F..FŸ.VÞÕ.•á^.&. 000020
B81E5657 000034C8 CBC95F5E 1F0000E9 D64688D6 46890000 FFFF9A37 FF260277 w.&.7......F ø.FøÕ...^_èùä4..WV.¡ 000040
DE5EC400 0006989A 5016DE46 8D37FF26 0277FF26 065EC400 000246C7 D88E067F ...ÄúFØ..á^.&.w.&.7.FB.P.....á^B 000060
88E45689 E2468908 57882606 4788260E 5EC4D856 89064689 04578826 02478826 &.G.&.W..Fø.VÄá^B&.G.&.W..Fä.VÕ. 000080
003D0246 89000006 D69A5016 EA468DD6 76FFD876 FFF05689 EE46890C 56880A46 F..V..FŸ.VÞ.vÄ.vø.Fõ.P.ø....FØ=. 0000A0
16CC4680 0494E903 75F0460B EE468800 010046C7 048CE9D2 46880006 E9037500 .u.Õ...FØÕ¥.úFÅ...FŸ.FÞu.Õ...Fä. 0000C0
0006E903 75000030 D246890A C48308ED 06199AD6 76FFD876 FF37FF26 DE5EC450 Pá^8&.7.vÄ.vø...Ú..á..FØ=..u.Õ.. 0000E0
830C0E02 A09A1130 68046A06 C48308CD 061C9A04 6A5016DA 46D00482 E9D2468B .FØÕ...FÕ.Pj....ë..á.j.hO....... 000100
09469ADA 76FFE276 FFE476FF D476FFCC 76FFCE76 FFD676FF D876FF04 468904C4 á..Få.vÄ.vø.vö.vä.vå.vÕ.vã.vÕ.F. 000120
08A10519 9A106968 5016DA46 800435E9 D2468800 06E90375 00003D02 46890000 ...FØ=..u.Õ...FØÕ5..FÕ.Phi....À. 000140
3DD24689 00000C75 9A501600 468DDA76 FFCC76FF CE76FFD6 76FFD876 FF06C483 .á..vÄ.vø.vö.vä.vÕ.FÅ.P.u....FØ= 000160
6850160A 46800378 E940478B 26EE5EC4 D046FF03 FBE9D246 880006E9 03750000 ..u.Õ...FØÕ«..FÅá^Ÿ&.GaÕx..FÕ.Ph 000180
05F0568B EE4688DA 76FFCC76 FFCE76FF D676FFD8 76FF06C4 830C9505 199A1068 h.......á..vÄ.vø.vö.vä.vÕ.FŸ.VÞ. 0001A0
6850160A 468003AE E9D2468B 0006E903 75000030 D2468900 000CB59A 50520040 a.RP.ç....FØ=..u.Õ...FØÕÜ..FÕ.Ph 0001C0
05F0568B EE4688DA 76FFCC76 FFCE76FF D676FFD8 76FF06C4 83002405 199A106B k....$..á..vÄ.vø.vö.vä.vÕ.FŸ.VÞ. 0001E0
```

Dump of file SATURN:[PCCOMMON.DUMP.DLL]NEWMETA.TMP;1 on 18-APR-1990 10:48:01.69
File ID (741,17,0) End of file block 111 / Allocated 112

Virtual block number 74 (0000004A), 512 (0200) bytes

```
EE5EC403 28E9036E E9D2468B 0006E903 75000030 D2468900 000D3E9A 50520042 B.RP.>....FØ=..u.Õ...FØÕn.Õ(.á^Ÿ 000000
05F0568B EE468850 16FA4680 5016F646 8D0000FA 46C700C8 E9037500 137F8026 &....u.Õà.úF•...F-.P.F•.P.FŸ.VÞ. 000020
03750000 3DD24689 14C48300 E71030 9A D676FFD8 76FFEA76 FFEC76FF 50520013 ..RP.vš.võ.vÄ.vø.=.Ó..á..FØ=..u. 000040
FFD676FF D876FF06 C48300 5E 05199A10 68685016 D4468003 1FE9D246 880006E9 Õ...FØÕ...Få.Phh....^..á..vÄ.vø. 000060
D2468800 06E90375 00003D02 46890000 0E229A50 16FA4680 D476FFCC 76FFCE76 vö.vä.vå.F•.P."....FØ=..u.Õ...FØ 000080
C4830E08 02A09A10 6868106A 6806C483 006C0519 9A106A68 5016DA46 8D02E5E9 Õl..FÕ.Phj....l..á.hj.hh.......á 0000A0
000EA49A D476FFF6 76FFF876 FFDA76FF CC76FFCE 76FFD676 FFD876FF D4468904 ..Få.vÄ.vø.vö.vä.vÕ.v½.v-.vå.Ê.. 0000C0
E9037500 137F8026 EE5EC402 50E90296 E9D2468B 0006E903 75000030 D2468900 ..FØ=..u.Õ...FØÕ..ÕP.á^Ÿ&....u.Õ 0000E0
EE468850 16FA4680 5016F646 800001FA 46C700FE E9037500 3F8026EE 5EC4010A ..á^Ÿ&.?.u.Õ±.úF•...F-.P.F•.P.FŸ 000100
3DD24689 14C4830E 54103D9A D676FFD8 76FFEA76 FFEC76FF 50520013 05F0568B .VÞ...RP.vš.võ.vÄ.vø.=.T..á..FØ= 000120
D876FF06 C4830E75 05199A10 68685016 D4468002 38E9D246 880006E9 03750000 ..u.Õ...FØÕ;..Få.Phh....u..á..vÄ 000140
06E90375 00003DD2 46890000 0FA49A50 16FA4680 D476FFCC 76FFCE76 FFD676FF .vø.vö.vä.vå.F•.P.Ê....FØ=..u.Õ. 000160
76FFD876 FFF676FF F876FFEE 76FFF076 FFFA76FF 5016E646 8D0201E9 D2468800 ..FØÕ...Fl.P.v•.vÞ.vŸ.v½.v-.vÄ.v 000180
685016DA 468001CE E9D2468B 0006E903 75000030 D2468912 C4830EE0 12A69AD6 ø.Ì.Å..á..FØ=..u.Õ...FØÕö..FÕ.Ph 0001A0
76FFD876 FF044689 04C4830E F002A09A 10686810 6A6806C4 830E8305 199A106A j.......á.hj.hh....Þ..á..Få.vÄ.v 0001C0
03750000 3DD24689 00000F22 9AD476FF E676FFE8 76FFDA76 FFCC76FF CE76FFD6 ø.vö.vä.vÕ.vò.vl.vå."....FØ=..u. 0001E0
```

Dump of file SATURN:[PCCOMMON.DUMP.DLL]NEWMETA.TMP;1 on 18-APR-1990 10:48:01.69
File ID (741,17,0) End of file block 111 / Allocated 112

Virtual block number 75 (0000004B), 512 (0200) bytes

```
76FFF076 FF5016FC 46805016 F246BD50 16E6468D 00FDE901 7FE9D246 880006E9 Õ...FØÕ..Õ»..Fl.P.F·.P.F•.P.vÞ.v 000000
05199A10 68685016 DC468D18 C48308A0 184D9AD6 76FFD876 FFE276FF E476FFEE Ÿ.vÕ.vã.vÄ.vø.M....á..FÉ.Phh.... 000020
76FFD876 FF0034E9 0375E846 08E64688 003FE903 75FE460B FC468806 C48308C0 å..á..F•.F±u.Õ?..Fl.FÒu.Õ4..vÄ.v 000040
06E90375 00003DD2 46890000 0F6C9A0C 6AE676FF E876FF06 6ACC76FF CE76FFD6 ø.vö.väj..vÒ.vlj..l....FØ=..u.Õ. 000060
E8460BE6 4688003F E90375F4 460BF246 880050E9 0003FA46 C70101E9 D2468800 ..FØÕ..úF•..ÕP..F·.F¶u.Õ?..Fl.FÒ 000080
00000BEE 9A096AE6 76FFE876 FF066ACC 76FFCE76 FFD676FF D876FF00 34E90375 u.Õ4..vÄ.vø.vö.väj..vÒ.vlj..Ÿ... 0000A0
FF00A9E9 FFFF8800 06E90004 FA46C700 B7E9D246 880006E9 03750000 3DD24689 .FØ=..u.Õ...FØÕñ.úF•..Õ..¡..Õ`.. 0000C0
03750000 3DD24689 000008B8 9A5016FA 468DDC76 FFCC76FF CE76FFD6 76FFD876 vÄ.vø.vö.vä.vÉ.F•.P.É....FØ=..u. 0000E0
E9037F00 0230FFF2 E9037D00 01300033 E90036E9 0039E900 7FE9D246 880006E9 Õ...FØÕ..Õ9.Õ6.Õ3.=..).Õ·.=....Õ 000100
E9037F00 0930FFD2 E9037D00 063DFDC3 E9037F00 0530FFE2 E9037D00 0330FCFB «==..).Õã.=....Õù»=..).ÕØ.=....Õ 000120
878B26EE 5EC40016 E90003E9 03740146 87082601 44878B26 EE5EC4FF C7E9FC58 X=Õú.á^Ÿ&..D.&..F.t.Õ..Õ..á^Ÿ&.. 000140
8900000A F69A37FF 260277FF 26065EC4 FB61E9F0 5689EE46 89014697 88260144 D.&..F..FŸ.VÞÕa«á^.&.w.&.7.-.... 000160
5EC40000 CC46C7D8 8E081088 1E565700 0034C8C8 C95F5E1F 0000E902 4688D246 FØ.FØÕ...^_èùä4..WV.¡...ÄúFä..á^ 000180
0676FF08 76FF06C4 83108A04 AA9A646A 5016E646 8D078926 02478926 00008816 .¡..&.G.&...Fl.Pjd.^.¤..á..v..v. 0001A0
46880006 E9037500 003DCC46 89000011 9F9A5016 CE468DE6 76FF0A76 FF0C76FF .v..v..vl.Fö.P......Fä=..u.Õ...F 0001C0
8D00BBE9 03750247 08260788 26FC5EC4 FE5689FC 46890056 88CE468B 020DE9CC äÕ...Fö.VÄ.F=.V±á^=&..&.G.u.ÕÉ.. 0001E0
```

Dump of file SATURN:[PCCOMMON.DUMP.DLL]NEWMETA.TMP;1 on 18-APR-1990 10:48:01.69
File ID (741,17,0)   End of file block 111 / Allocated 112

Virtual block number 76 (0000004C), 512 (0200) bytes

```
FF37FF26 0277FF26 FC5EC406 76FF0876 FF06C483 1185053E 9A03E868 5016E646 F|.Phò..>....á..v..v.á^=&.w.&.7. 000000
D076FF06 76FF0876 FF0017E9 03750000 3DCC4689 000011F8 9A5016E8 4680E676 v|.FÒ.P.½....Fä=..u.Õ...v..v..vÅ 000020
C483122C 01549A50 16E8468D 0E76FF10 76FF01A3 E9CC468B 00001159 9ACE76FF .vö.Y....FäÕÈ..v..v..FÒ.P.T.,..á 000040
125EC402 57892607 8926165E C402578B 26078B26 FC5EC400 4AE90374 00003D08 .=..t.ÕJ.á^=&..&.W.á^.&..&.W.á^. 000060
FF0876FF 000107C7 26125EC4 0008E900 0307C726 125EC400 0BE90375 003F8326 &.7.u.Õ..á^.&ú...Õ..á^.&ú....v.. 000080
0676FF08 76FFFF36 E904FC46 83013EE9 0000B800 0011779A CE76FFD0 76FF0676 v..vÅ.vö.w...¡..Õ>..F=.Õ6..v..v. 0000A0
0676FF08 76FF06C4 8311DA04 AA9A656A 5016E646 8D000012 149ACE76 FFD076FF .vÅ.vö......F|.Pje.¯.Ö..á..v..v. 0000C0
46880006 E9037500 0030CC46 89000005 549A5016 CE468DE6 76FF0A76 FF0C76FF .v..v..v|.Fö.P.T....Fä=..u.Õ...F 0000E0
8D00BBE9 03750247 0B26078B 26FC5EC4 FE5689FC 46890056 8BCE468B 00EDE9CC äÕÚ..Fö.VÅ.F=.V±á^=&..&.G.u.ÕE.. 000100
FF37FF26 0277FF26 FC5EC406 76FF0876 FF06C483 0C5504CF 9A089868 5016E646 F|.Ph...ü.U..á..v..v.á^=&.w.&.7. 000120
D076FF06 76FF0876 FF0017E9 03750000 3DCC4689 0000FFFF 9A501602 4680E676 v|.FØ.P......Fä=..u.Õ...v..v..vÅ 000140
C483FFFF 01549A50 16D2468D 0E76FF10 76FF0083 E9CC468B 00001279 9ACE76FF .vö.y....FäÕ...v..v..FØ.P.T....á 000160
125EC402 57892607 8926165E C402578B 26078B26 FC5EC400 4AE90374 00003D08 .=..t.ÕJ.á^=&..&.W.á^.&..&.W.á^. 000180
FF0876FF 000207C7 26125EC4 0008E900 0407C726 125EC400 0BE90375 003F8326 &.7.u.Õ..á^.&ú...Õ..á^.&ú....v.. 0001A0
0676FF08 76FFFF36 E904FC46 83001EE9 00008800 0012979A CE76FFD0 76FF0676 v..vÅ.vö.....i..Õ...F=.Õ6..v..v. 0001C0
1045B81E 56570000 20C8CBC9 5F5E1F00 00E9FFFF 88000005 019ACE76 FFD076FF .vÅ.vö.....i..Õ...^_èùà ..WV.¡E. 0001E0
```

Dump of file SATURN:[PCCOMMON.DUMP.DLL]NEWMETA.TMP;1 on 18-APR-1990 10:48:01.69
File ID (741,17,0)   End of file block 111 / Allocated 112

Virtual block number 77 (0000004D), 512 (0200) bytes

```
685016FA 46800200 E912468B 07892602 47892600 00B8145E C40000F4 46C7D88E .ÄúF¶..á^.¡..&.G.&...F.Õ...F'.Ph 000000
F49A5016 F6468DFA 76FF0A76 FF0C76FF 0676FF08 76FF06C4 83132A05 3E9A03F1 þ..>.*..á..v..v..v..v..v'.F-.P.¶ 000020
FE5689FC 4689F856 8BF6468B 01ECE9F4 46880006 E9037500 003DF446 89000013 ....F¶=..u.Õ...F¶Õš..F-.V½.F=.V± 000040
FF06C483 13DA0563 9A04B068 5016FA46 8D009CE9 03750247 0B26078B 26FC5EC4 á^=&..&.G.u.Õ...F'.Ph¯..c.Ö..á.. 000060
3DF44689 0000144D 9A5016E0 4680FA76 FF37FF26 0277FF26 FC5EC406 76FF0876 v..v.á^=&.w.&.7.v'.FÁ.P.M....F¶= 000080
46800182 E9F4468B 000013AA 9AF676FF F876FF06 76FF0876 FF0017E9 03750000 ..u.Õ...v..v..v½.v-.ˆ....F¶Õ...F 0000A0
26078826 FC5EC400 2BE90374 00003D08 C4831481 01549A0E 76FF1076 FF5016E0 Å.P.v..v..T....á.=..t.Õ+.á^=&..& 0000C0
00B80000 13CB9AF6 76FFF876 FF0676FF 0876FF02 57892607 8926145E C402578B .W.á^.&..&.W..v..v..v½.v-.à...¡. 0000E0
8D011BE9 00001469 9AF676FF F876FF06 76FF0876 FFFF55E9 04FC4683 013CE900 .Õ<..F=.ÕU..v..v..v½.v-.i...Õ... 000100
4680FA76 FF0A76FF 0C76FF06 76FF0876 FF06C483 142F04CF 9A08A068 5016FA46 F'.Ph...Ü./..á..v..v..v..v..v'.F 000120
89F8568B F6468B00 E7E9F446 8B0006E9 03750000 3DF44689 0000107F 9A5016F6 -.P......F¶=..u.Õ...F¶ÕÕ..F-.V½. 000140
6504F49A 09606850 16FA468D 009CE903 75024708 26078B26 FC5EC4FE 5689FC46 F=.V±á^=&..&.G.u.Õ...F'.Ph'..¶.e 000160
0010089A 5016E046 8DFA76FF 37FF2602 77FF26FC 5EC40676 FF0876FF 06C48310 ..á..v..v.á^=&.w.&.7.v'.FÁ.P.Á.. 000180
F4468B00 0014AF9A F676FFF8 76FF0676 FF0876FF 0017E903 7500003D F4468900 ..F¶=..u.Õ...v..v..v½.v-.£....F¶ 0001A0
5EC4002B E9037400 003D08C4 83110C01 549A0E76 FF1076FF 5016E046 8D007DE9 Õ)..FÁ.P.v..v..T....á.=..t.Õ+.á^ 0001C0
CD9AF676 FFF876FF 0676FF08 76FF0257 89260789 26145EC4 02578B26 078B26FC =&..&.W.á^.&..&.W..v..v..v½.v-.ë 0001E0
```

Dump of file SATURN:[PCCOMMON.DUMP.DLL]NEWMETA.TMP;1 on 18-APR-1990 10:48:01.69
File ID (741,17,0)   End of file block 111 / Allocated 112

Virtual block number 78 (0000004E), 512 (0200) bytes

```
0010F49A F676FFF8 76FF0676 FF0876FF FF55E904 FC468300 37E90000 B8000014 ...¡..Õ7..F=.ÕU..v..v..v½.v-.¶.. 000000
0000E9FF FF880000 E9FEE8E9 03750004 3DFDEBE9 03750003 3D0013E9 0016E900 .Õ..Õ..=..u.Õ$»=..u.ÕÕ±Õ..¡..Õ.. 000020
00008812 5EC4F246 89F44689 00008808 8E12AEB8 1E565700 002CC8CB C95F5E1F .^_èùà,..WV.¡Ü..Ä¡...F¶.F·á^.¡.. 000040
89260247 89260000 B81A5EC4 07892602 47892600 00B8165E C4078926 02478926 &.G̃.&..á^.¡..&.G.&..á^.¡..&.G.&. 000060
00003DF0 46890000 05D89A16 76FF1876 FF076A0A 76FF0C76 FF0676FF 0876FF07 ..v..v..v..v.j..v..v..Ä....Fb=.. 000080
02D8E904 19B80006 E9037402 470B2607 8B26165E C402EDE9 0419B800 06E90375 u.Õ..¡..ÕÚ.á^.&..&.G.t.Õ..¡..ÕÄ. 0000A0
3DF04689 000012EF 9A5016D4 4680116A 37FF2602 77FF2616 5EC40676 FF0876FF .v..v.á^.&.w.&.7j..Få.P.ÿ....Fb= 0000C0
4688029A E90419B8 0006E903 74D6460B D4468802 A8E90419 B80006E9 03750000 ..u.Õ..¡..Õ¨..Få.Føt.Õ..¡..Õ...F 0000E0
0261E903 7502470B 26078826 F65EC404 F6468300 04E9F856 89F64689 D6568BD4 å.Vø.F-.V½Õ...F-.á^-&..&.G.u.Õa. 000100
3DF04689 00001546 9A5016D8 4680076A 37FF2602 77FF26F6 5EC40676 FF0876FF .v..v.á^-&.w.&.7j..FÄ.P.F....Fb= 000120
8D056A37 FF260277 FF26F65E C40676FF 0876FF02 48E90419 B80006E9 03750000 ..u.Õ..¡..ÕK..v..v.á^-&.w.&.7j.. 000140
037401FA 7E83021E E90420B8 0006E903 7500003D F0468900 0016A79A 5016FA46 F'.P.Ì....Fb=..u.Õ..¡·.Õ...-'.t. 000160
003DF046 89000017 469A5016 F2468D09 6AD876FF DA76FF06 76FF0876 FF00F6E9 Õ-..v..v..vÖ.vÄj..F·.P.F....Fb=. 000180
F2468801 DBE90419 B80006E9 0374F446 0BF2468B 01ECE904 19B80006 E9037500 .u.Õ..¡..Õš..F·.F¶t.Õ..¡..ÕÜ..F· 0001A0
FF0097E9 03750247 0B26078B 26FC5EC4 04FC4683 0004E9FE 5689FC46 89F4568B .V¶.F=.V±Õ...F=.á^=&..&.G.u.Õ... 0001C0
003DF046 89000017 A69A5016 DC468D02 6A37FF26 0277FF26 FC5EC406 76FF0876 v..v.á^=&.w.&.7j..FÉ.P.Ì....Fb=. 0001E0
```

```
Dump of file SATURN:[PCCOMMON.DUMP.DLL]NEWMETA.TMP;1 on 18-APR-1990 10:48:01.69
File ID (741,17,0)   End of file block 111 / Allocated 112

Virtual block number 79 (0000004F), 512 (0200) bytes

 1076FF01 7BE9042D 88000017 199AF276 FFF476FF 0676FF08 76FF0017 E9037500 .u.Õ...v..v..v¶.v·.....|·.Õ(..v. 000000
 5688D846 8B125EC4 003BE903 7400003D 08C48317 DA01549A 5016DC46 8D0E76FF .v..FÉ.P.T.Ö..á.=..t.Õ;.á^..FÄ.V 000020
 FF0876FF 02578926 0789261A 5EC40257 8B26078B 26FC5EC4 02578926 078926DA Õ&..&.W.á^=&..&.W.á^.&..&.W..v.. 000040
 E9037402 FA7E8301 05E9FF56 E90125E9 0000B800 0017C29A F276FFF4 76FF0676 v..v¶.v·.ô...|..Õ%.ÕV.Õ...~•.t.Õ 000060
 00003DF0 46890000 15889A50 16F2468D 0E6AD876 FFDA76FF 0676FF08 76FF00F6 -..v..v..vÖ.vÁj..F·.P......Fÿ=.. 000080
 8BF2468B 000CE904 19B80006 E90374F4 460BF246 8B00EDE9 0419B800 06E90375 u.Õ..|..ÕÜ..F·.F¶t.Õ..|..ÕÉ..F·. 0000A0
 76FF0097 E9037502 470B2607 8B26FC5E C404FC46 830004E9 FE5689FC 4689F456 V¶.F=.V±Õ...F=.á^=&..&.G.u.Õ...v 0000C0
 00003DF0 46890000 13489A50 160C468D 056A37FF 260277FF 26FC5EC4 0676FF08 ..v.á^=&.w.&.7j..FÉ.P.H....Fÿ=.. 0000E0
 FF1076FF 007CE904 2DB80000 18189AF2 76FFF476 FF0676FF 0876FF00 17E90375 u.Õ...v..v..v¶.v·.....|·.Õ|..v.. 000100
 DA5688D8 468B165E C4003BE9 03740000 3D08C483 137C0154 9A5016DC 46800E76 v..FÉ.P.T.|..á.=..t.Õ;.á^..FÄ.VÖ 000120
 76FF0876 FF025789 26078926 1A5EC402 578B2607 8B26FC5E C4025789 26078926 &..&.W.á^=&..&.W.á^.&..&.W..v..v 000140
 8CE9001A E90433B8 0006E9FF 56E90026 E90000B8 0000183E 9AF276FF F476FF06 ..v¶.v·.>...|..Õ&.ÕV.Õ..|3.Õ..Õ. 000160
 002CC8CB C95F5E1F 0000E900 00880000 13649AD4 76FFD676 FF0676FF 0876FFFD ».v..v..vø.vå.d...|..Õ...^_èùà,. 000180
 C4078926 02478926 0000B812 5EC4F246 89F44689 0000B808 8E14FDB8 1E565700 .WV.|»..Ä|...F¶.F·á^.|..&.G.&..á 0001A0
 FF0676FF 0876FF07 89260247 89260000 8B1A5EC4 07892602 47892600 00B8165E ^.|..&.G.&..á^.|..&.G.&...v..v.. 0001C0
 0419B800 06E90375 00003DF0 46890000 15E89A16 76FF1876 FF046A0A 76FF0C76 v..v.j..v..v..Ò....Fÿ=..u.Õ..|.. 0001E0

Dump of file SATURN:[PCCOMMON.DUMP.DLL]NEWMETA.TMP;1 on 18-APR-1990 10:48:01.69
File ID (741,17,0)   End of file block 111 / Allocated 112

Virtual block number 80 (00000050), 512 (0200) bytes

 5EC40676 FF0876FF 02D8E904 19B80006 E9037402 470B2607 8B26165E C402EDE9 ÕÚ.á^.&..&.G.t.Õ..|..ÕÄ..v..v.á^ 000000
 B80006E9 03750000 3DF04689 0000199F 9A5016D4 468D116A 37FF2602 77FF2616 .&.w.&.7j..Få.P......Fÿ=..u.Õ..| 000020
 89F64689 D6568BD4 468B029A E90419B8 0006E903 74D64608 D4468B02 ABE90419 ..Õ¨..Få.Føt.Õ..|..Õ...Få.Vø.F-. 000040
 5EC40676 FF0876FF 0261E903 7502470B 26078B26 F65EC404 F6468300 04E9F856 V½Õ...F-.á^-&..&.G.u.Õø..v..v.á^ 000060
 B80006E9 03750000 3DF04689 0000189E 9A5016D8 468D076A 37FF2602 77FF26F6 -&.w.&.7j..FÄ.P......Fÿ=..u.Õ..| 000080
 0019FF9A 5016FA46 8D056A37 FF260277 FF26F65E C40676FF 0876FF02 48E90419 ..ÕK..v..v.á^-&.w.&.7j..F•.P.... 0000A0
 76FF0876 FF00F6E9 037401FA 7E83021E E9042DB8 0006E903 7500003D F0468900 ..Fÿ=..u.Õ..|·.Õ...~•.t.Õ-..v..v 0000C0
 19B80006 E9037500 003DF046 8900001A 9E9A5016 F2468D09 6AD876FF DA76FF06 ..vÖ.vÁj..F·.P......Fÿ=..u.Õ..|. 0000E0
 5689FC46 89F4568B F2468B01 DBE90419 B80006E9 0374F446 0BF2468B 01ECE904 .Õš..F·.F¶t.Õ..|..ÕÜ..F·.V¶.F=.V 000100
 FC5EC406 76FF0876 FF0097E9 03750247 0B26078B 26FC5EC4 04FC4683 0004E9FE ±Õ...F=.á^=&..&.G.u.Õ...v..v.á^= 000120
 76FF0017 E9037500 003DF046 8900001A FE9A5016 DC468D02 6A37FF26 0277FF26 &.w.&.7j..FÉ.P.±....Fÿ=..u.Õ...v 000140
 5016DC46 8D0E76FF 1076FF01 7BE9042D B800001A 719AF276 FFF476FF 0676FF08 ..v..v¶.v·.q...|·.Õ(..v..v..FÉ.P 000160
 02578926 078926DA 5688D846 8B125EC4 003BE903 7400003D 08C4831B 3201549A .T.2..á.=..t.Õ;.á^..FÄ.VÖ&..&.W. 000180
 F276FFF4 76FF0676 FF0876FF 02578926 0789261A 5EC40257 8B26078B 26FC5EC4 á^=&..&.W.á^.&..&.W..v..v..v¶.v· 0001A0
 0676FF08 76FF00F6 E9037402 FA7E8301 05E9FF56 E90125E9 0000B800 001B1A9A .....|..Õ%.ÕV.Õ...~•.t.Õ-..v..v. 0001C0
 0419B800 06E90375 00003DF0 46890000 16479A50 16F2468D 0E6AD876 FFDA76FF .vÖ.vÁj..F·.P.G....Fÿ=..u.¨ .|.. 0001E0

Dump of file SATURN:[PCCOMMON.DUMP.DLL]NEWMETA.TMP;1 on 18-APR-1990 10:48:01.69
File ID (741,17,0)   End of file block 111 / Allocated 112

Virtual block number 81 (00000051), 512 (0200) bytes

 FE5689FC 4689F456 8BF2468B 000CE904 19B80006 E90374F4 460BF246 8B00EDE9 ÕÚ..F·.F¶t.Õ..|..ÕÉ..F·.V¶.F=.V± 000000
 26FC5EC4 0676FF08 76FF0097 E9037502 470B2607 8B26FC5E C404FC46 830004E9 Õ...F=.á^=&..&.G.u.Õ...v..v.á^=& 000020
 0876FF00 17E90375 00003DF0 46890000 16159A50 16DC468D 056A37FF 260277FF .w.&.7j..FÉ.P......Fÿ=..u.Õ...v. 000040
 9A5016DC 46800E76 FF1076FF 007CE904 2DB80000 18709AF2 76FFF476 FF0676FF .v..v¶.v·.p...|·.Õ|..v..v..FÉ.P. 000060
 C4025789 26078926 DA5688D8 468B165E C4003BE9 03740000 3D08C483 16DB0154 T.Ü..á.=..t.Õ;.á^..FÄ.VÖ&..&.W.á 000080
 9AF276FF F476FF06 76FF0876 FF025789 26078926 1A5EC402 578B2607 8B26FC5E ^=&..&.W.á^.&..&.W..v..v..v¶.v·. 0000A0
 FF0676FF 0876FFFD 8CE9001A E90433B8 0006E9FF 56E90026 E90000B8 00001B96 ....|..Õ&.ÕV.Õ..|3.Õ..Õ.».v..v.. 0000C0
 8E1855B8 1E565700 0016C8CB C95F5E1F 0000E900 00B80000 16C39AD4 76FFD676 vø.vå.û...|..Õ...^_èùà...WV.|U.. 0000E0
 DC061C9A 046A5016 F6468D06 C4831BCF 061C9A04 6A5016F8 46800000 EE46C7D8 ÄúfŸ...F½.Pj....ü._á..F-.Pj....É 000100
 1076FF12 76FF0676 FF0876FF F4468904 C48312D5 02A09A11 3068046A 06C4831B ..á.j.hO....f..á..F¶.v..v..v..v. 000120
 468B005F E9EE4688 0006E903 7500003D EE468900 0018E09A 5016EA46 8DF876FF .v½.Fõ.P.Á....FŸ=..u.Õ...FŸÕ_..F 000140
 C40676FF 0876FF00 2DE90375 02470B26 078B26EA 5EC4F256 89F04689 EC568BEA õ.Vš.Fÿ.V·á^õ&..&.G.u.Õ-..v..v.á 000160
 83001EE9 EE468800 06E90375 00003DEE 46890000 FFFF9A37 FF260277 FF26EA5E ^õ&.w.&.7......FŸ=..u.Õ...FŸÕ... 000180
 5F5E1F00 00E90000 B800001A 189AF076 FFF276FF 0676FF08 76FFFFC4 E904EA46 Fõ.Õá..v..v..v·.vÿ.....|..Õ...^_ 0001A0
 0B290203 00780004 19400203 006F0004 18F90203 00630004 0C280203 0013CBC9 èù....(...c...•...o...ə...(...)¯ 0001C0
 05A00203 00140003 044C0203 00880004 00800203 0000000A 18C00002 01770006 ..w...å...............L......... 0001E0
```

```
Dump of file SATURN:[PCCOMMON.DUMP.DLL]NEWMETA.TMP;1 on 18-APR-1990 10:48:01.69
File ID (741,17,0)   End of file block 111 / Allocated 112

Virtual block number 82 (00000052), 512 (0200) bytes

 1A330002 01900006 102B0203 009E0004 1C630203 0000000F 00030002 00220003 ..".............c........+.......3. 000000
 1C3A0203 008C0004 06550203 00330004 08670203 00000012 18AD0002 00000010 ......Ù........g...3...U...¥...:. 000020
 00000000 00550004 196D0203 00000004 05FD0203 00470004 04120203 00C60004 ..ó.......G...».. Å...m...U..... 000040
 830A47F6 26065EC4 FFFFBE56 000012C8 00000000 00000000 00000000 00000000 ..................à...V/..á^.&-G.. 000060
 662D0646 8BF08B04 C483005A 08329A53 0600ADE9 0374400A 47F62600 B7E90375 u.Õñ.&-G.ət.ÕÙ..S.Z.Z..á..Þ.F.-f 000080
 C404C483 006C0560 9A0676FF 0876FFFA 4689175E 87880608 68F9F700 0C89990B ..¿..¥*kÄ...^..F*.v..v..'.l..á.á 0000A0
 8D074068 1E617400 FA7E8364 7CC00B02 C4830087 090E9A50 E42A0B47 8A26065E ^.&.G.*ôP......á..ä|d.~*.ta.ha.. 0000C0
 1E13745C FE7F8026 FC5EC4FE 568CFC46 89F2468D 08C48300 AB011E9A 5016F046 FÞ.P...¨..á..F·.F*.V±á^*&..±\t.. 0000E0
 FA76FFFC 76FFFE76 FF0A6AFC 4EFF03EB 08C48300 C309389A 5016F046 8D074268 hB..FÞ.P.B.ü..á.Š..N*j..v±.v*.v* 000100
 26065EC4 FFFFBE03 74C00B04 C483FFFF 099A9A50 16F0468D 08C48300 D0097E9A .~.Å..á..FÞ.P......á..ät./..á^.& 000120
 FE76FF1B 74D00BFE 5689FC46 89011008 889A0000 04C890CB C95EC688 000A47C6 óG...ó^èù.à....|....F*.V±.Åt..v± 000140
 8B5590CB C999C02B 9004E80C C4830034 05A69A06 76FF0876 FF0A76FF 0C76FF50 P.v..v..v..v..Ĩ.4..á.Š..+à.èù.U. 000160
 7401A8C7 88067EC4 D1F7AEF2 FFFFB9C0 33C08ED8 8CFE880A 76C51EDE 88D788EC š.■.B.év..±.Ä.ä3ä¿..·Ú‰iá~..ú¨.t 000180
 C40676C5 1EDE8BD7 8BEC8B55 CB5DC28C 1FFA8BF3 8BA4F3C9 13A5F3E9 D149A402 .Êl ïÕµË.èµË.µ.*..ô]ÙU.š.■.B.év.á 0001A0
 8B5500CB 5DFA8BF3 8B1FFFFF 1DC01B05 74A6F3F9 2BD1F7AE F2FFFF89 C0330A7E ~.3â¿..·Ú‰i+*µIt..â.....µ.*]ù.U. 0001C0
 C5067EC4 1E5657EC 8B5500CB 5DFA8891 49D1F7AE F2FFFFB9 C033067E C4D788EC š.■á~.3â¿..·Ú‰i]..*]ù.U.šWV.á~.é 0001E0

Dump of file SATURN:[PCCOMMON.DUMP.DLL]NEWMETA.TMP;1 on 18-APR-1990 10:48:01.69
File ID (741,17,0)   End of file block 111 / Allocated 112

Virtual block number 83 (00000053), 512 (0200) bytes

 CB5DE588 5F5E1FC2 8CC38BAA F3C032F8 E2AA0374 C00AAC0C E30E4E8B DF8B0A76 v..Ô.N.D.¯.ât.ˆã½2äµ¨.ù.·.^_.|]ù 000000
 F806B89A 0A76FF0C 76FFF88B 04C48301 DF017E9A 0676FF08 76FF5657 000006C8 à...WV.v..v..~.Ô..á..½.v..√..¡.½ 000020
 FA46890C C483020A 02AE9A06 76FF0876 FF016A57 0A76FF0C 76FFF08B 04C48301 ..á..Þ.v..v.Wj..v..v..Ù.......F* 000040
 90C8C95F 5EFFFFB8 03EBC02B 0475FA7E 3906C483 00F1078E 9A560A76 FF0C76FF .v..v.V...þ.¯á.9~*u.+âŠ.¡..^_èù. 000060
 1A1A3C41 2CF374E0 3A43278A 26AC2074 C00AFFB0 065EC40A 76C51ED6 8BEC8B55 U.š.ø.év.á^.¯..ät-¯&.'C:Åtµ,Ā<.. 000080
 98FF1CC0 1AD374C4 3A4104C1 0220E180 C91A1A3C 412CE086 4104C102 20E180C9 è.Ā .ê.A.Á,A<..è.Ā .é.A:átÆ.à... 0000A0
 D103D323 DB1BD12B 0C74DAF7 D788067E C45738E3 0C4E8BEC 8B5500CB 5DF28B1F ..·]ù.U.š.N.D8Wá~..■%Öt.+Ì.Ù#Æ.Ì 0000C0
 F3E9D1C3 8EFFFFC3 81C38C10 E3D187AA F3C913AB F3E901E0 8A0A468B D12BD187 .Ì+Ì.F..ÄïÕµ¨.èµˆ.ÌD..û.û...ûïÕµ 0000E0
 12029A0A 76FF006A 0C76FF00 6A560000 1AC8CB5D 08568B06 468B5FAA F3C913AB ¨.èµˆ_.F..V.]ùà...Vj..v.j..v.... 000100
 90027DE9 C02B0675 000C7E83 0674000A 7E83FA56 89F84689 FE5689FC 468902F3 µ..F*.V±.F½.V*.~..t..~..u.+âÕ).. 000120
 87F60608 68F9F700 0C899903 4511229A 53060B66 681E7E75 0C0A47F6 260E5EC4 á^.&-G..u~.hf..S.".E..¿..¥*kÄ.-. 000140
 83260277 8B260F8B 260E5EC4 078A2606 5EC42678 044FFF26 0E5EC463 7501175A Z..ucá^.&.O.x&á^.&..á^.&..&.w.&. 000160
 078A2606 5EC40E76 FF1076FF 9017EB07 8826098B C68E035B 02478126 06730107 ..s.&.G.(..ó.1&..Š...v..v.á^.&.. 000180
 08460104 6425C01B 01064683 8675200A 47F6260E 5EC406C4 83037B0B 6C9A5098 .P.l.(..á.á^.&-G. u..F...â%d..F. 0001A0
 0C899903 FF11229A 53060B66 681E1E75 080A47F6 260E5EC4 00FA5E83 01F86E83 .n½..^*.á^.&-G..u..hf..S."....¿. 0001C0
 568B0E46 8B0186E9 0375FA46 0BF8468B 0122E903 7501175A 87F60608 68F9F700 .¥*kÄ.-.Z..u.Õ"..F½.F*u.Õ...F..V 0001E0

Dump of file SATURN:[PCCOMMON.DUMP.DLL]NEWMETA.TMP;1 on 18-APR-1990 10:48:01.69
File ID (741,17,0)   End of file block 111 / Allocated 112

Virtual block number 84 (00000054), 512 (0200) bytes

 26E65EC4 E85689E6 4689EC56 89EA4689 0004050E 4688F056 89EE4689 000A0510 ....FŸ.VÞ.F.....Fõ.Vš.F¦.Vòá^!& 000000
 260E5EC4 9008EBF8 46880676 F8463B05 770072FA 5638D228 078B267D 74003F83 .7.t)&..+θ;V*r.w.;F½v..F½Š..á^.& 000020
 8111409A 37FF2602 77FF260E 5EC40676 FF0876FF 500000F6 46C7F446 8904478B .G..F¶úF-..P.v..v.á^.&.w.&.7.a.. 000040
 F44E8BC0 2B024701 26E0D304 27B9F646 130F0126 F44E8BC0 2B0E5EC4 0AC48304 ..á.á^.+à.N¶&...F-¿'.ÆÁ&.G.+à.N¶ 000060
 072926E6 5EC4FA56 19F84629 F65688F4 46880846 01E0D3FF FFB9F646 13064E01 .N..F-¿..ÆÁ.F..F¶.V-)F½.V*á^!&). 000080
 06730107 83260277 8B260F8B 260E5EC4 078A2606 5EC42678 0FFF26EA 5EC464EB Šdá^ò&..x&á^.&..á^.&..&.w.&...s. 0000A0
 6C9A5098 078A2606 5EC40E76 FF1076FF 9017EB07 88260988 C68E0499 02478126 &.G.....ó.1&..Š...v..v.á^.&...P.( 0000C0
 6E830846 0104F725 C01B0106 4683008F E9037420 07F626EE 5EC406C4 83051308 ....á.á^Ÿ&-. t.Õ...F...â%‰..F..n 0000E0
 10568B0E 468B6774 FA460BF8 468B90FF 0BE97374 FA460BF8 468800FA 5E8301F8 ½..^*..F½.F*tsÕ....F½.F*tg.F..V. 000100
 065EC425 780FFF26 EA5EC4EC 5689EA46 89000405 0E468BE8 5689E646 89000A05 ....F¦.VÒ.F.....Fõ.Vš&^ò&..x%á^. 000120
 07882609 8BC68E05 43024781 26067301 07832602 778B260F 8B260E5E C4078A26 &..á^.&..&.w.&...s.&.G.C...ó.1&.. 000140
 742007F6 26E65EC4 06C48305 370B6C9A 5098078A 26065EC4 0E76FF10 76FF16EB Š..v..v.á^.&...P.(.7..á.á^!&-. t 000160
 01064683 9021EB01 CF12369A 5052FA56 1BF8462B FE568BFC 46880A76 FF006A1B .j..v..F*.V±+F½.V*RP.6.ü.Š!..F.. 000180
 90CBC95E 90FF7AE9 C974FA46 0BF84688 00FA5E83 01F86E83 08460102 9925C01B .áX...F..n½..^*..F½.F*tèÒz..^èù. 0001A0
 102E9A06 77FF2608 77FF262E 74080A47 F6263574 830A47F6 26065EC4 000000C8 à...á^.&-G..t5&-G..t.&.w.&.w.... 0001C0
 26085789 26064789 26025789 26078926 99C02BF7 0A678026 065EC404 C48302C0 &..á.á^.&.g.½+à.&..&.W.&.G.&.W.& 0001E0
```

```
Dump of file SATURN:[PCCOMMON.DUMP.DLL]NEWMETA.TMP;1 on 18-APR-1990 10:48:01.69
File ID (741,17,0)   End of file block 111 / Allocated 112

Virtual block number 85 (00000055), 512 (0200) bytes

 7400773D 0C740072 30277400 613D9807 8A260A5E C4560000 0AC890CB C9044789 .G.èù.à...Vá^.&...=a.t'=r.t.=w.t 000000
 09BE90F1 EB02FC46 C603018E 9022EB00 01B901FC 46C6F62B 9000EEE9 99C02813 .+â.ÕŸ..+-óF=.¿..Š".ƒ..óF=.$þ.ƒ. 000020
 74003F80 260A5EC4 0A46FF80 FC46C6FE E6830002 CE814375 0002C6F7 90F4EB01 .$¶.%ó..uC.ö...ǀ±óF=..F.ó^.&.?.t 000040
 810E75C0 00A9C688 15750074 3D137400 62300674 00283098 078A2633 74C90837 7.èt3&...=+.tø=b.t.=t.u..ó`.âu.. 000060
 FF5601A4 68FE4E89 8DE88000 CE8190C4 EBC92B05 74C000A9 C6889000 EB4000CE ö.∂$Å..ó`.ât.+è$ó..ö..$§.N±hÊ.V. 000080
 478826FC 468A0E5E C4FF6AE9 037DC008 FA468908 C4830580 0CE29A06 76FF0876 v..v..ã....á..F'.â}.Õj.ó^..F=&.G 0000A0
 C02AF846 89175A05 E001C103 E001C888 F9F7000C B9990866 2DC38B1D 5C06FF0A ...\..û-f..¿..%'.àÍÁ.èÍÁ.Z..F½*â 0000C0
 89260789 2699C02B 0E5E8B00 000447C7 F85E8804 4789260E 5E889807 88F85E8B .^%....^.&.G..^½úG....^.+â.&..&. 0000E0
 5C06FF56 000004C8 C8C95EC2 8CC388B08 478826FA 468A0857 89260647 89260257 W.&.G.&.W..F'&.G..ū.ó^èùà...V..\ 000100
 087E812B 750B7E06 7E8113EB 0000FE46 C7077506 E0087E81 0E750B72 067E811D ..~.r.u..~.Á.u.úF±..Š..~.~.u+.~. 000120
 D868F9F7 000CB999 08662DC3 8815750C 0A47F626 065EC400 01FE46C7 2475FFFF ..u$úF±..ó^.&-G..u..û-f..¿..%'kÄ 000140
 68147502 440B048B 0744C681 02E6C1FE 76889090 7EEBC02B 06740117 5A87F606 .-.Z..t.+áŠ~...v±èl..óD....D.u.h 000160
 88F9F700 0CB9990B 66200646 88D57400 08025489 048902C4 8307C810 439A0200 ...C.ù..ó....T..Âtí.F.-f..¿..%'. 000180
 89260746 94880744 848802E6 C1FE7688 065EC4FC 4689175A 05E001C1 03E001C8 àÍÁ.èÍÁ.Z..F=á^..v±èl...D...F.&. 0001A0
 881107C6 DE880447 89260244 89020088 FC768802 57892607 89260857 89260647 G.&.W.&..&.W..v=¡...D.&.G..ß6... 0001C0
 C888F9F7 000CB999 08662D08 46880000 04C890CB C95E0001 88020A4F 8026065E ^.&.O..¡..^èù.à....F.-f..¿..%'.à 0001E0

Dump of file SATURN:[PCCOMMON.DUMP.DLL]NEWMETA.TMP;1 on 18-APR-1990 10:48:01.69
File ID (741,17,0)   End of file block 111 / Allocated 112

Virtual block number 86 (00000056), 512 (0200) bytes

 5EC47274 1007F626 FC5EC451 7400067E 83FE5E8C FC468917 5A05E001 C103E001 ÍÁ.èÍÁ.Z..F=.^±.-..tQá^=&-..trá^ 000000
 83081C08 329A0876 FF0A76FF 5C74C00B 02C48307 DD10FE9A 50E42A0B 478A2608 .&.G.*ôP.±.Ï..á..ât\.v..v..2.... 000020
 06478926 02578926 07892699 C028085E C4000002 47C72600 07C626FC 5EC404C4 á.á^=&ó..&úG...á^.+â.&..&.W.&.G. 000040
 C483082E 10FE9A50 E42A0847 8A26085E C4217410 07F626FC 5EC42AEB 08578926 &.W.Š*á^=&-..tÍá^.&.G.*ôP.±....á 000060
 0A478A26 065EC4F6 28560000 04C8C8C9 06480832 9A0876FF 0A76FF08 74C00802 ..ât..v..v..2.H.èùà...V+-á^.&.G. 000080
 01175A87 F6060868 F9F7000C B9990866 2DC38B15 75080A47 F6265575 023C0324 $.<.uU&-G..u..û-f..¿..%'kÄ.-.Z.. 0000A0
 08478A26 0677FF26 0877FF26 50287EC0 08FC4689 06472826 07882606 5E883974 t9.^.&..&+G..F=.ä-(P&.w.&.w.&.G. 0000C0
 8826065E C4FFFF8E 200A4F80 26065EC4 0874FC46 3808C483 07250EA0 9A50E42A *ôP...%..á.;F=t.á^.&.O. ƒ..á^.&. 0000E0
 89086688 000004C8 C8C95EC6 88000004 47C72602 57892607 89260857 88260647 G.&.W.&..&.W.&úG....ó^èùà...¦f.. 000100
 89260647 8926990A 47882604 478926C0 28257583 0A47F626 FC5EC4FE 5E8CFC46 F=.^±á^=&-G..uX+ä&.G.&.G..&.G.&. 000120
 1D54063B 0CFC4683 C28CC38B 17E8C28C C388FF08 47C62602 57892607 89260857 W.&..&.W.&óG...û.óŠ..û.ô.F=.;.T. 000140
 E9C03300 098A0872 106F1E38 065E88EC 885590C8 C999C02B 8D751056 163BC375 uú;.V.u§+â.èù.U.š.^.;.o.r.o..3âÕ 000160
 1EDE88D7 88EC8855 C850E588 001D7187 C6F375C0 850000FF FF9A5302 0AE901FE ±.Õ..S......âuµó.q...[]ùU.š.■.ß. 000180
 08468ED8 8EC08CF9 28D1F7AE F2FFFFB9 0A7EC4FF 758DAEF2 FFFFB9C0 33067EC4 á-.3â¿..·Û.u.á-.¿..·Û%i+'.â.Ä.F. 0001A0
 8B55CB5D C28C1FFA 88F388A4 F3C913A5 F3E90149 A4027400 01C6F706 4688FE87 .±.F.%ó..t.Êl1ÕµÊ.èµÊ.µ.'..ö]ùU. 0001C0
 0876FFEC 88550811 E9087EC5 1E990175 0AF983D2 33064688 0C4E8801 835756EC šVW°..N..F.3ø.'.u...é-.Õ..U.š.v. 0001E0

Dump of file SATURN:[PCCOMMON.DUMP.DLL]NEWMETA.TMP;1 on 18-APR-1990 10:48:01.69
File ID (741,17,0)   End of file block 111 / Allocated 112

Virtual block number 87 (00000057), 512 (0200) bytes

 5016C488 50EC8855 00CB50E5 88017CE9 0374C085 0000FFFF 9A5050C0 330676FF .v.3âPP......ât.Õ|..[]ù.U.šP.á.P 000000
 889A088A E80021E8 0000FFFF 9A074C68 1E074E68 1E106AA3 E0865800 00FFFF9A .....X.ÂÈj..hN..hL......ÕI.Õ¤... 000020
 00008B1E 075416FF 00FF6809 EE0A9E9A 09E10A4A 9A50C850 E5880001 B8088613 ...¦...[]ùP.J.Ã....Ÿ.h....T..£.. 000040
 88A6F3C8 88D18808 588E3174 003D8026 47017500 3D80267F FFB9074E 068EFF33 3...N.¿..&.=.u.G&.=.t1ƒX..ǀ.ùµ!. 000060
 412CAC92 04E0C00E 72412CAC 1D718F1F F788071E 061CE8E7 74AEF2C0 330874CA òt.3â·ÙtÓŠ.....%.«q.¯,Ar.âÅ..¯,A 000080
 581EFF04 74001D5A 3E8309F3 0A9E9A50 00FCB8EC 885500C3 1FEDEBAA C20A0572 r..ô^ŠÙ.Û.U.š¦■.P...µ..>Z..t...X 0000A0
 1FF48E06 5688C08E D88E06C8 885756EC 8855CB50 E5880A54 0A9E9A50 00FF881D .¦..P...T..[]ùU.šVW¡ù..Ä.â.V./¶. 0000C0
 88550002 CA5DE588 5E5F96E8 E8F788AE F2FFFFB9 C033970C 74964010 74C238AD Ù;ôt.∂.t..3â¿..·Û.%ŠŠ._^.[]ò..U. 0000E0
 0288C488 5049D1F7 AEF2FFFF B9C033FA 88921F74 C00B0A68 0A6E9A06 76FF57EC šW.v..n.h..ât...'3â¿..¯Û%ǀǀP.áE. 000100
 09060D05 18040203 02021601 0002CA5D E5885F58 0000FFFF 9A501651 521E5300 .S.RQ.P.....[_.[]ò.............. 000120
 00530052 02430041 02350212 12110010 120F160D 160C0808 070A0C09 0C080C07 ......................S.A.C.R.S. 000140
 16080D00 08D702CE 08A40084 09820A81 0A801606 09721C70 20600D6C 08590057 W.Y.l.m p.r...........Ê.ŏ.■..... 000160
 0AD48B1D 6DA3CB50 E58899FF FFB80008 E8CB5DE5 8899FFFF 881D6616 891D60A3 Êm...f.¦....[]ùÕ..¦....[]ùÊm.£â. 000180
 76CA3C04 72BC3C43 0A76243C 0472133C F7E24343 1674073A 2E1875E4 0A0024B9 ¿$..ôu..:.t.CCã%<.r.<$v.C<¥r.<òv 0001A0
 C388FA46 89E42A08 478A2608 5EC45657 000008C8 00C31066 A3980147 8A2E4301 .C..G..Èf.û.à...WVá^.&.G.*ô.F'.û 0001C0
 F6260774 830A47F6 26F84689 175A05E0 D1C103E0 D1C888F9 F7000C89 990B662D -f..¿..%'.àÍÁ.èÍÁ.Z..F½&-G..t.&- 0001E0
```

```
Dump of file SATURN:[PCCOMMON.DUMP.DLL]NEWMETA.TMP;1 on 18-APR-1990 10:48:01.69
File ID (741,17,0)   End of file block 111 / Allocated 112

Virtual block number 88 (00000058), 512 (0200) bytes

80260E74 010A47F6 26085EC4 900128E9 FFFFB820 0A4F8026 085EC40F 74400A47 G.at.á^.&.O. |..Õ+..á^.&-G..t.&. 000000
7689F08B 04478926 C028EF0A 67802602 0A4F8026 90E2EB00 000447C7 26200A4F O. &úG...Šã.&.O..&.g.ÿ+á&.G..Þ.v 000020
087E8137 7501175A 87F606D8 6BF9F700 0CB99908 6620C38B 4C750C0A 47F626FC •&-G..uL.ù-f..¿..¼¹kÄ.-.Z..u7.-. 000040
8810FE9A FA76FF0F 750A740A 7E811675 0B7E087E 810E740C 150A7E81 07750B72 r.u..~...t..~.~.u..~.t.u..v¹.±.. 000060
C3881575 080A47F6 26085EC4 04C48308 A5E80876 FF0A76FF 0C75C008 02C4830C ..á..âu..v..v.ÕÉ..á.á^.&-G..u..Û 000080
47882606 77282637 8826085E 88677401 175A87F6 060868F9 F7000C89 990B662D -f..¿..¼¹kÄ.-.Z..tg.^.&.7&+w.&.G 0000A0
FF265256 167EF60B 04478926 48024588 F87E8802 57892607 89264008 57882606 .&.W.a&..&.W..-½.E.H&.G..--.VR&. 0000C0
006A026A 0F74201D 7187F6FA 5E8819E8 FC468908 C4830CA6 0EA09AFA 76FF0677 w..v¹...Ï..á..F•Š..^¹-.q. t.j.j. 0000E0
46805600 018E17EB 07882606 468A065F C426085E C408C483 0CC91560 9A53006A j.S.'.è..á.á^.&á_..F.&..Š.ƒ..V.F 000100
5F5EE42A 06468AFE CCE90374 FC7639FC 468908C4 830AA80E A09AFA76 FF501606 ..P.v¹...´..á..F=9v•t.Õä±.F.*ð^ 000120
4E885252 D23352F8 56801652 FE568016 0676FF08 76FF4087 0EEC83EC 8855C8C9 èÙU.š.š.ñã.v..v...V±R..V½R3ØRR.Ñ 000140
FE468050 02CA8022 740200A9 2A750400 A910CA80 08740100 A90A4688 018AE80C .Ò...F.`..t..ò.`..u*`..t".ò.P.F± 000160
525101CA 8003EBFE 4E880875 58C08500 00FFFF9A 5050C033 50160676 FF0876FF .v..v..P3âPP......áXu..N±Š..ò.QR 000180
03740002 BAF0C2F6 0E75006E 301674C0 080000FF FF9A5050 C03350C7 0A000325 %...ÚP3âPP......ât.=n.u.-ôÞ¤..t. 0001A0
88E4E8C0 330018BA 00000927 9A500072 1D6F0638 FE468800 8DE9FDBA E90011BA ¤..Õ¤¤»Õ...F±;.o.r.P.'...¤..3âŠÕ. 0001C0
A90E7580 00A9C933 0A468861 75C00800 00FFFF9A 50F8468D 1653F45E 8D16500D ÅP..^¶S..F½P......âua.F.3è`..u.` 0001E0

Dump of file SATURN:[PCCOMMON.DUMP.DLL]NEWMETA.TMP;1 on 18-APR-1990 10:48:01.69
File ID (741,17,0)   End of file block 111 / Allocated 112

Virtual block number 89 (00000059), 512 (0200) bytes

023C008E E940F446 C6077501 3CF4468A F24E8880 81027580 1F8306F6 07754000 .au.-....u.Ÿ..N·.F¶<.u.6F¶aõ..<. 000000
B95151FF FFB95273 7400020A 46F77A74 C90AF446 88C03200 83E908F4 46C60775 u.6F¶.Õ..2â.F¶.ètz¼F...tsR¿..QQ¿ 000020
8D16524F EBC033FD 36E90374 0083300C 74C00800 00FFFF9A 50FA468D 16510002 ..Q..F*P......ât.=..t.Õó»3âŠOR.. 000040
18751AF6 7E833274 F8463923 75C00800 00FFFF9A 50F8468D 16500001 B850F646 F-P¦..P..F½P......âu#9F½t2.--.u. 000060
8D165050 50C03352 BE75C008 0000FFFF 9AFA76FF FC76FF00 FC5E8301 FA6E8352 R.n*..^•..v•.v¹......âuƒR3âPPP.. 000080
3350F846 8D160676 FF0876FF 287548C1 F6F44E8A AA75C008 000000E9 9A50FA46 F*P.Õ....âu¯.N¶-èHu(.v..v...F½P3 0000A0
80F24E0A 20C98003 7400080A 46F710C9 80037400 01F846F7 0000002D 9A5050C0 âPP.-...¼F½..t..è.¼F...t..è .N·. 0000C0
00C301C9 80037580 A8C933C1 2300F71D 68A1CB5D E5881D71 8F88D888 C28801C9 è..ô.Ä..q..Ï]ÙÀh.¼Ä#è3è´.u..è.û. 0000E0
33531274 201D7187 F6FC69E9 C0330009 BA08721D 6F1E3806 5E880CEC 83EC8855 U.š.š..^.;.o.r.¤..3âÕi•-.q. t.S3 000100
0856C50A 468EFA5E 8C667480 1D7187F6 00000E44 9A5016F4 46805141 415151C9 èQQAAQ.F¶.P.D...-.q..tf.^¹.F.éV. 000120
02EC833B 75AEF20A B049E30C 4E88F866 89F288FA 885657FC FC4689FE 4689C033 3â.F±.F••VV.¹.·.f½.N.DI¯.·Ùu;.š. 000140
E9002BE8 F4E2AA1A 74F83B0D 740A3CAC 0C4EB807 16FA88D4 88E22800 808ADC88 .Éa..+ã.å.¹.:..N.¯<.t.;«t.¨ã¶Ò+.Õ 000160
0093E9FA 5E8E5F5E E1E80014 E8E2EBFC 46FF0A80 AA001FE8 0375FB38 0D80009A ..¯.;«u.Õ..¯..F=Šãò..ŠÄ^_.^¹Õ.. 000180
F4468051 521E5306 5E881FE3 CA28CF88 1F061E51 53500C1F 18A69AFF FC887AEB Šz¦•..Ï...PSQ....ü+òD..^.S̄.RQ.F¶ 0001A0
08C4831F C3FA8858 58591F07 740808FE 5E01F45E 881175C0 0800000A C89A5016 .P.à....âu..^¶.^±.Ùt..Y[X.¹û..á. 0001C0
F6FE5E8E 26EBF900 208A03E8 001C8A08 7500098A 00013D00 7400603D 1874C008 .ât.=m.t.=..¤..u.¤..Š.¤ .¹Š&.^±- 0001E0

Dump of file SATURN:[PCCOMMON.DUMP.DLL]NEWMETA.TMP;1 on 18-APR-1990 10:48:01.69
File ID (741,17,0)   End of file block 111 / Allocated 112

Virtual block number 90 (0000005A), 512 (0200) bytes

2BFE4688 06EBF9C0 33001CBA 0EEBF803 751A3F80 085E8B0A 5E8E0E74 401D7187 .q.at..^..^..?.u.½Š.¤..3â¹Š..F±+ 000000
C51EEEE8 C1880475 C90B0C4E 88F84DE9 C85DE588 0472FA5E 8E5F5EF8 6688FC46 F•.f½^_.^¹r..Ï]ÙÕM«.N..èu..èŠY.é 000020
8A00013D 0D74006D 3D1774C0 081F071E 00000F63 9A5016F4 46805152 1E530856 V.S.RQ̄.F¶.P.c.......ât.=m.t.=..¤ 000040
80260A8B 0A74401D 7187F687 75C008F4 4688C2EB 00208AC7 E8001CBA CC750009 ..uã¤..Šú¤ .Šò.F¶.âuñ-.q.at..Õ&. 000060
8801FE4F 80260574 C308C08C 065EC4EC 885500A3 E8C03300 1CBAA6E8 02751A3F ?.u.ŠÏ¤..3âŠÉ.U.Šá^..å.Ût.&.O±.. 000080
A3127400 25E80875 001F8E3E 831E73FF F1300646 88575602 EC83EC88 55C85DE5 Ï]ÙU.š.š.VW.F.=þ.s..>_..u.Ò%.t.É 0000A0
E588SE5F 02C4830F 4815809A 0676FF08 750078E8 05740018 E8157500 82E81F8E ..Ò..u.Ò..t.Òx.u..v..¯.H..á._^.Ï 0000C0
50028051 0E4F8050 501EC033 FE5E89FE E3834306 5E880776 065E3900 F088C85D ]ÙÉÞ.9^.v..^.C.Ò±.^±3â.PP.O.Q̄¯.P 0000E0
880008A3 DA8E0574 D2081F92 A31F9016 87C28838 74FFFA83 08C48310 7717B49A .Ç.w..á..¹.t8.ô....É...Øt..ÖÉ... 000100
00000500 0AA30147 800002A3 0000A300 0A880C47 89484800 08A3C033 D88EFE5E ^±.Ä3âÉ..HH.G.¡..É..É...G.É..... 000120
8855C3D9 8EC18CD2 080502E8 1F921E8E DB33064E 88C08ED8 8CC31FD8 8C0006A3 È...Ã.Û.Ä.á.N.3Ù....Ò...Ø.é.]ÙU. 000140
5DE588C0 3302E800 01880574 401D7187 F60C7C00 F883117D 1D6F1E38 065E88EC š.^.;.o.)..«.|.-.q.at.¡..Š.3â.Ï] 000160
0008CA5D E588D31B 0A4628E8 D3EAD304 13890C5E 88085688 064688EC 885500C8 ù.U.š.F..V..^.¿..ÆÕÆŠ+F..Æ.Ï]ò.. 000180
C203C323 D818C22B D2F7D788 48C18806 7EC40A76 C556571E 4EE30E4E 88EC8855 U.š.N.DN.WVév.á-..êH.æ¼Ø+ô.Ù#û.ô 0001A0
8C0775F6 0818E391 A4F3C913 A5F3E9D1 C1289140 C203C323 D818C228 D2F7D688 .ø¼Ø+ô.Ù#û.ôã.+èÏÕµÉ.èµÉ.D..-u.. 0001C0
4E88C85D 08568806 46881F5F 5E8EE8C0 8E118205 C08CC775 FF0BD88E 03280508 Ä.(..Ä..uú.à....âŠƒ^_..F..V.]ù.N 0001E0
```

Dump of file SATURN:[PCCOMMON.DUMP.DLL]NEWMETA.TMP;1 on 18-APR-1990 10:48:01.69
File ID (741,17,0)   End of file block 111 / Allocated 112

Virtual block number 91 (0000005B), 512 (0200) bytes

```
AA2DB00A 79D2080E 750AF983 1374C00A 93FC071E 570A7EC5 1E085688 0646880E ..F..V..é~.W..=..ât..'.u..θy.¯-` 000000
27040276 393C3004 D38792F1 F793F1F7 0274C008 D23392F7 8BDAF700 D283D8F7 %Û.θ.%Ö.%.3θ.ât.%þ.%þ..Æ.0<9v..' 000020
5DE5885E 5F1F58DA 8CF272C7 38014480 FF448805 86AC4F05 88E275C3 08C288AA ^.ô.ûuã..O¯...D..D.;úr·.ÖX._^.Í] 000040
8BE3F700 08CA5DE5 8BE3F706 46880875 0A5E8808 080C5E88 08468BEC 885500C8 Ù.U.&.F..^..Ä.^.u..F.%D.Í]ò¯.%D. 000060
C00B0C46 885653EC 88550008 CA5DE588 D103E3F7 06468BC8 030C66F7 064688C8 à.F.%f..à.F.%D.Ï.Í]ò..U.&SV.F..à 000080
8B08568B 0A5E88C8 8B38E8D3 8BF1F706 46880888 F1F7D233 0846880A 4E881575 u..N..F.3θ%þ.Ä.F.%þ.Æ$8.à.^..V.. 0000A0
380C72D1 03E6F70A 4688910C 66F7F088 F3F7F475 C908D8D1 EAD1D8D1 E9D10646 F.ÌÕÌÛÌÕÌÄ.èu¶%μ.Ð%f...F.%Ì.Ìr.; 0000C0
A780048B 520002BB 000008CA 5DE588B8 5E960233 4E017606 463B0672 07770856 V.w.r.;F.v.N3θ.^[.Í]ò...£..R.à.Ì 0000E0
7500023D 07740001 30408112 7558C008 0000008D 9A521650 1653C48B 50B71D71 q.ñP.âS.P.R......âXu.Ÿà=..t.=..u 000100
E903731F A41EFFDB 33C28C1F A806C41E E31FA60E 885AD479 481D718F 08088106 .Ÿ...q.Kyâz..Ì.D.á.¯..ô3Û..É.s.ô 000120
73E81FB0 8F1FB0BE 007CE81F B08F1FB0 BE1FA41E FF0003BB C28C1FAC 06C401AE Û.á.¯..ôÉ....É.ƒ¯.¢¯.ô|.ƒ¯.¢¯.ôs 000140
1FA2BF1F 9EBED88E 0C078BC3 0000FFFF 9A131568 0E016A08 741FA23D 1F9EB800 .¡..=Ä.t.j..h.......ù¡...Äƒ..¢Ä. 000160
1FA2BF1F 9EBE003A E820CCBF 20CCBEEC 88550000 13109A00 6A006A03 6A0051E8 ðQ.j.j.j......U.šƒä ¢ä ò:.ƒ..¢Ä. 000180
06468A50 C033001A E81F80BF 1FB0BE00 23E81FB0 BF1FB0BE ECBB5503 EB0031E8 ô1.$.U.šƒ¯.¢¯.ô#.ƒ¯.¢¯.ô..3âP.F. 0001A0
02450805 8804EF83 0E73F73B C31FA41E FF00028B 07E31FA6 0E8B0000 FFFF9A50 P.......Ì.D.É....É.ù;%s..ÿ....E. 0001C0
28074E16 8800F0E9 0375074E 3639FF2B F62B5657 000014C8 00C3EEEB 1DFFF274 t·..$Ÿù.à...WV+-+.96N.u.Öþ...N.+ 0001E0
```

Dump of file SATURN:[PCCOMMON.DUMP.DLL]NEWMETA.TMP;1 on 18-APR-1990 10:48:01.69
File ID (741,17,0)   End of file block 111 / Allocated 112

Virtual block number 92 (0000005C), 512 (0200) bytes

```
C48313FC 186A9A0B 58681EF6 76FFF876 FF0C6AF8 5689F646 89F25689 F04689C0 à.Fþ.V·.F-.V%j..v%.v-.hX..j.=..á 000000
5EC40CEB 47EA7500 3F8026F6 46FFF65E C400BCE9 03767FFF FE814619 74C0080A ..ât.F.±..v.Ö¥.á^-.F-&.?.uöGŠ.á^ 000020
C4831408 175C9A04 6A500145 8DBA7500 3F8026F6 5E88F475 003F8026 F646FFF6 -.F-&.?.u¶.^-&.?.u¤.E.Pj..\.....á 000040
46886074 EE460BEC 468BFE56 89FC4689 02C48314 4110439A 56EE5689 EC468904 ..F$.VŸV.C.A..á..F=.V±.F$.FŸtm.F 000060
6A9A0B58 681EF076 FFF276FF 0C6A1F79 16891F77 A3EE5688 EC468866 74C20BFC =.ôtf.F$.VŸÊw...y.j..v·.vþ.hX..j 000080
5EC404EC 46830257 89260789 26FE5688 FC468BEC 5EC42C74 C00B0AC4 8310A318 .É..á..ât,á^$.F=.V±&..&.W..F$.á^ 0000A0
003F8026 F046FFF0 5EC4E8EB 0E74C00A 078826FC 46FFFC5E C4078A26 F046FFF0 þ.Fþ&..á^=.F=&...ât.$Ôá^þ.Fþ&.?. 0000C0
46890866 88560000 06C8F554 E9000288 90C8C95F 5EA77500 3F8026F0 5EC4F475 u¶á^þ&.?.uÏ^_èù.¡..ÕÏ%à...V¡f..F 0000E0
46017440 04C48313 8C08329A 53060E74 830A47F6 26FA5EC4 1CEBF628 FC5E8CFA '.^=+-$.á^'&¯G..t...S.2.¥..á.ât.F 000100
46881D5C 06FF0000 04C890CB C95EC688 D876FA46 391D5616 881D54A1 0CFA4683 .F'.ÀT...V.9F'vÀ.ô^èù.à.....\..F 000120
439A0200 68FE5E8C FC468917 5A05E001 C103E001 C888F9F7 000C8999 08662004 .-f..¿..%'.àÌÀ.éÌÀ.Z..F=.^±h...C 000140
47C726FC 5EC4080A 4F802611 74D00808 57892606 47892604 5EC402C4 83148710 .ñ..á.á^.&.G.&.W..Ât.&.O..á^=&ûG 000160
FC5EC408 57892606 47892640 FE5688FC 4688040A 4F802604 5EC49021 E8020002 ...$Ì.á^.&.O...F=.V±ä&.G.&.W.á^= 000180
C3C90000 0447C726 02578926 07892608 57882606 47882604 5EC40001 0247C726 &ûG...á^.&.G.&.W.&..&.W.&ûG...èù 0001A0
0A76FF53 CC8B04EC 83F588E9 F5ACE9C0 3300098A 0B721D6F 1E38065E 88EC8855 U.&.^.;.o.r.α..3äÕ¯%Ö¡%.$..â$.v. 0001C0
885500C8 5DE588FD 1D71A780 91E175C0 855A5900 000ECC9A 51160C76 FF0876FF .v..v..Q.ä...YZ.àuÄ..Ìq.».Í]ù.U. 0001E0
```

Dump of file SATURN:[PCCOMMON.DUMP.DLL]NEWMETA.TMP;1 on 18-APR-1990 10:48:01.69
File ID (741,17,0)   End of file block 111 / Allocated 112

Virtual block number 93 (0000005D), 512 (0200) bytes

```
88071E29 75003F83 1F848857 56EC8855 CB5DE588 01FE4F80 0474D808 065E88EC &.^..Ût..O±..Í]ûU.$VWÉ...?.u)..| 000000
FE44C704 C6830001 04C7961F 86A31F84 A3FE2440 24E899C0 33057501 76E80005 ..ôv.u.3à.$$ä$±É..É...ú....ô.ûD± 000020
83FEE180 FA744100 D0E9CB5D E5885E5F 0009E8C0 8ED88C06 4E881F8A 3689FFFE ±..ô...N..Ä.âÖ.._^.Í]ûÔÄ.At'.Ä±. 000040
05C20335 7401A8AD F003D088 1573C138 48437401 A8FE88AD FC02778B F273EEF9 'Ÿs·.w.=Û.±´.tCH;ês..Ä.þÛ¨.t5.ô. 000060
C688FE4C FEF90305 E8058948 C12BFE4C 89F9030C 74FE88E6 E8FE4489 F7880002 ...%.D±$Ì.±t..'.L±+éH..$..'±L±.ô 000080
03FE8825 74FFFE3D 021F9606 C626C302 7F891F92 1E8C2605 74D13813 1689DA8C .Ö¿..;Ìt.&.......ù&ô....=±.tX.±. 0000A0
FE4489F7 88000205 C203E274 01A8ADF0 03D088BC 73C13848 FE88F274 01A8ADF0 þÙ¨.t¨.±H;ês¥.À.þÙ¨.tã.ô....%.D± 0000C0
1E8E2605 74C73816 43BFD88C 12741F96 0EFE2615 E8D88E04 74C00808 4788E6E8 $Ì.G..ât..Ä$.&±....t..Ä¢C.;ût.&.. 0000E0
E8FE4DFE 0074005F E8984040 01240D74 C63B0068 E8C03306 778888E8 37881F8E ...7$É.w.3äôk.;ôt.$.∂∂.ô_.t.±M±ô 000100
51C399C0 33024789 07881F92 A3260474 C1381697 89088C98 E84E4E96 0574001D ..t..NNŠ..Ä¿..;èt.&É.....Ġ ³&.ûQ 000120
1572C603 C188F575 EAD10476 1F94163B 267FFF8A 414149C8 28037401 A8FE4588 .É±¨.t.+àÌAAα..&;...v.ÌôuX.. ¹r. 000140
1874001D E85152C3 59C033E5 75EAD1D2 F7087500 0CE8C628 C22302F7 0D72C203 .ôr.%θ#ô+6Ö..u.%θÌôuÌ3äYüRQÖ..t. 000160
1ED23350 53C35A59 58FE5589 4AD72BD6 88067789 FFFEFE44 C7F203F0 88FE8857 W.±.þ.·ûD±±..w..ø+≡J.U±XYZûSP3θ. 000180
00000AC8 C3D20802 745B5A1F FFFA8308 C4831501 17849A1F 06500001 88505252 RRP¡..P...Ç.....á..'..Z(t..θùà.... 0001A0
E899C028 0674FFFF C2F7FA56 89F84689 17891202 9A0676FF 006A0876 FF006A56 Vj..v.j..v.......F%.V'%ô..t.+à.$ 0001C0
9A50FE76 FF006A56 1274000B FE5689FC 468902C4 8317A210 439A56F8 7688902F /..v%V.C.À..á..F=.V±.Ât.Vj..v±P. 0001E0
```

```
Dump of file SATURN:[PCCOMMON.DUMP.DLL]NEWMETA.TMP;1 on 18-APR-1990 10:48:01.69
File ID (741,17,0)   End of file block 111 / Allocated 112

Virtual block number 94 (0000005E), 512 (0200) bytes

 3875000A 7E830657 56EC8B55 90CBC95E FE568BFC 46889007 EB08C483 174C0266 f.L..á.Š...F•.V±^èù.U.šVW..~..u8 000000
 44880074 F73B1174 48085636 8B4CEB27 720057E8 07754806 46880856 8807568F ¢V..V..F.Hu.ÒW.r'ŠL.6V.Ht.;¼t..D 000020
 885021EB 99FFFFB8 0675D20B 04730856 FE8104C6 8334735E 003EE856 0E468902 ..F.VÒ>.^s4.6..±V.s..@u.|...ŠIP. 000040
 07C033D3 8B085636 89025C89 1489E675 C085F958 0000FFFF 9A50C033 501652C4 áR.P3àP.....[*.âu|...\..6V..Æ3ä. 000060
 1C03DA88 2CEBF9F2 750856FE 8104C683 0C74024C 39F7880E 4E88CB5D E5885E5F _^.[]ù.N..%9L.t..ó..±V.u·'Š,.Ö.. 000080
 890475F7 3BDE75C0 850000FF FF9A5153 13730750 1E390675 F73BC18E D38B2672 r&.Æ.ê;¼u.9.P.s.SQ......âuß;¼u.. 0000A0
 AEF2C033 F788067E C4D98B27 E30E4E88 1E5657EC 885500C3 D1880487 92075016 .P.....ìù.U.šWV..N.D'.)á-..¼3ä·Û 0000C0
 5E1FC188 D1F74949 04740477 FF453A26 C933FF44 8AA6F30A 76C5FE88 C803D9F7 %).ù.±év.µ[.D.3è&:E.w.t.II¼i.é.^ 0000E0
 33057540 1F98A1CB 5152E38B 05721F9C 1E380872 D828DC8B 5A5900CB 5DE5885F _.[]ù.YZ.É+Är.;...r..DRQùÀ..ðu.3 000100
 132A0103 00050002 13620103 01CE0007 0E000203 00131F98 2EFF5152 F126E9C0 ãÒ&þRQ............ö...b.......*. 000120
 112F0105 00000010 176E0002 00260002 18530103 00220002 18080103 00070002 ..........."...S...&...n......./. 000140
 09A80103 003A0002 15890103 00000012 16CC0002 00880002 11800105 00870002 ..............ä...............´. 000160
 09D40103 00400002 12AC0103 00480002 0E640103 00440002 0E300103 003C0002 ..<...0...D...d...K...¯...M...å. 000180
 0FEC0203 01BC0007 00740203 01B40007 00480203 005C0002 09C10103 005B0002 ..[...ė...\...K...Ç...t...¥...š. 0001A0
 542D6E75 5220534D 00000000 00000000 00000000 00000000 00000000 01C50007 ..É......................MS Run-T 0001C0
 38383931 20296328 20746867 69727970 6F43202D 20797261 7262694C 20656069 ime Library - Copyright (c) 1988 0001E0

Dump of file SATURN:[PCCOMMON.DUMP.DLL]NEWMETA.TMP;1 on 18-APR-1990 10:48:01.69
File ID (741,17,0)   End of file block 111 / Allocated 112

Virtual block number 95 (0000005F), 512 (0200) bytes

 03F203F2 03F103F2 03EF03EE 03ED0011 70726F43 2074666F 736F7263 694D202C , Microsoft Corp..Ù.Ÿ.ÿ.·.þ.·.·. 000000
 03FF03FF 03FE03F0 03FB03FE 03FD03F7 03F603F5 03F403F3 03F203F1 03F003EF ÿ.Þ.þ.·.µ.¶.¾.-.¼.».±.«.».±..... 000020
 00150002 04150414 04120411 040A040A 04080407 04050404 04040403 04030402 ................................ 000040
 00190018 00120011 000A000F 000C000B 00090010 00000004 00170003 00140016 ................................ 000060
 00050028 00270026 00250024 00230022 00210020 001F001E 001D001C 001B001A ............ .!.".#.$.%.&.'.(... 000080
 00120005 00050007 000F0000 00000000 00090000 00000000 00000008 00070006 ................................ 0000A0
 00000000 00000000 00000000 00000000 00000000 00000000 00000000 00000007 ................................ 0000C0
 07D807D7 07D807D8 07D707D7 07D807D5 00000000 00000000 00000000 00000000 ................Í.Ä.■.■.Å.Û.■.Ä. 0000E0
 07E707E6 07EA07E9 07EA07E3 07E807E1 07E0070F 07E407DD 07DC07DE 07DE07DC É.B.B.É.Ï.Õ.Ó.Á.Ä.Ò.D.õ.Õ.õ.Ì.Ó. 000100
 00070006 00050004 00030002 000A0008 00060004 0005000C 00020007 07ED07F0 Þ.Ù............................. 000120
 00000000 00000000 00030009 0010000F 000F000E 0000000C 0008000A 00090008 ................................ 000140
 00000000 00000000 00000000 00000000 00000000 00000000 00000000 00000000 ................................ 000160
 04B8048A 04B80488 04B50484 04B80487 04B80485 00000000 00000010 00000000 ............ç.ì.ñ.ì.Ç.ç.ì.ì.¤.E. 000180
 04CC04CA 04C804C7 04C704C6 04C804C6 04C504C0 04BF04BE 04BD04BC 04BB04BC ¥.E.¥.§.ƒ.¢.ä.é.ó.à.ó.ú.ú.à.ò.ä. 0001A0
 00090009 00140013 00120004 0003000A 00070011 0006000F 000204D2 04D004CF ü.Å.Ø........................... 0001C0
 0020001F 001E001D 001C0018 001A0019 00180017 00160015 000E000D 000C0009 ................................ 0001E0

Dump of file SATURN:[PCCOMMON.DUMP.DLL]NEWMETA.TMP;1 on 18-APR-1990 10:48:01.69
File ID (741,17,0)   End of file block 111 / Allocated 112

Virtual block number 96 (00000060), 512 (0200) bytes

 00000006 00000006 00060000 00000000 00000000 00000009 00000000 00000000 ................................ 000000
 089E08A0 08900000 00000000 00000000 00000000 00000000 00000000 00000000 ................................ 000020
 00090002 000408AD 08AC08A5 08A908A9 08A208A6 08A008A3 08A208A1 089C089B ....À.Â.Ê...Ì.Á.·.·.Ê.¯.Ù....... 000040
 00030000 00000014 0013000B 00090003 000F000F 000E0008 00070006 00000011 ................................ 000060
 09670962 09650000 00000000 00000000 00080004 00070000 00000000 00100006 ..........................e.b.g. 000080
 1070106A 1068106A 0007000E 00000000 00000008 00070004 00030005 09640963 c.d.....................j.k.j.p. 0000A0
 05800582 05810581 0580057E 0580057D 0000000C 00000000 00040006 00030005 ...............}...~............ 0000C0
 0596058F 05940580 058C0588 05900589 0588058A 058A0588 05870584 05880587 ................................ 0000E0
 000C000B 00080007 00060005 00040003 000F0009 0002000A 05930592 05960595 ................................ 000100
 00000012 000F000E 0000000C 0008000A 00090008 00070006 00050004 00030002 ................................ 000120
 00000000 00000000 00000000 00000000 00000000 00000000 00000000 00000000 ................................ 000140
 06430642 06410645 0005000F 00000000 00000000 00000000 00000000 00000000 ........................E.A.B.C. 000160
 00000000 0008000A 00080007 00060005 00040003 00020648 06470646 06450644 D.E.F.G.H....................... 000180
 07190718 070E070D 070C070B 070E0709 07000000 00000000 00070006 00080000 ................................ 0001A0
 000A0008 00070006 00050004 00030002 07220721 071A0719 071D071C 071B071A .............!."................. 0001C0
 00000007 0006000C 00000000 00000013 00120011 0010000F 000E000D 000C000B ................................ 0001E0
```

```
Dump of file SATURN:[PCCOMMON.DUMP.DLL]NEWMETA.TMP;1 on 18-APR-1990 10:48:01.69
File ID (741,17,0)   End of file block 111 / Allocated 112

Virtual block number 97 (00000061), 512 (0200) bytes

000A0009 00080007 00060005 00000000 00000000 00000000 00000000 00000000 ................................ 000000
07DA07D9 07D707D4 07DE07D0 07DF07DC 07D50011 0010000F 000E0000 000C0008 ..............f.É.Ô.Ï.ß.å.■.).Ö. 000020
00770034 3042444E 53440009 07E207E4 07E307E2 07E107D2 07D307D8 07D607D8 Ä.ø.Ü.Æ.Ø.Ä.ã.D.ð.ã...DSNDB04.w. 000040
4C455300 4C44442E 52505845 0077004C 44442E52 50584500 4C44442E 52505845 EXPR.DDL.EXPR.DDL.w.EXPR.DDL.SEL 000060
29732877 65695600 6E6F7474 75626873 7550004C 44442E52 50584500 20544345 ECT .EXPR.DDL.Pushbutton.View(s) 000080
3F657275 7320756F 79206572 4120216E 6D756C6F 63206E6F 20646E65 70656420  depend on column! Are you sure? 0000A0
206E6F20 646E6570 65642078 65646E49 2F796548 006E6F74 74756268 73755000 .Pushbutton.Key/Index depend on  0000C0
4900544E 494C4C41 4D53003F 65727573 20756F79 20657241 20216E6D 756C6F63 column! Are you sure?.SMALLINT.I 0000E0
00524554 43415241 48430052 41484300 54414F4C 4600544E 49005245 4745544E NTEGER.INT.FLOAT.CHAR.CHARACTER. 000100
41524700 52414843 52415620 474E4F4C 00524156 474E4F4C 00524148 43524156 VARCHAR.LONGVAR.LONG VARCHAR.GRA 000120
4F4C0047 52415647 4E4F4C00 43494850 41524752 41560047 52415600 43494850 PHIC.VARG.VARGRAPHIC.LONGV. G.LO 000140
4D415453 45404954 00454D49 54004554 41440043 49485041 52475241 5620474E NG VARGRAPHIC.DATE.TIME.TIM. TAM 000160
52004345 44004C41 4D494345 44004E57 4F4E484E 5500504D 5453454D 49540050 P.TIMESTMP.UNKNOWN.DECIMAL.DEC.R 000180
414D5300 43495245 4D554E00 4E4F4953 49434552 5020454C 42554F44 004C4145 EAL.DOUBLE PRECISION.NUMERIC.SMA 0001A0
52414843 52415600 52414843 0054414F 4C460052 45474554 4E490054 4E494C4C LLINT.INTEGER.FLOAT.CHAR.VARCHAR 0001C0
44004752 4156474E 4F4C0047 52415600 43494850 41524700 52415647 4E4F4C00 .LONGVAR.GRAPHIC.VARG.LONGVARG.D 0001E0

Dump of file SATURN:[PCCOMMON.DUMP.DLL]NEWMETA.TMP;1 on 18-APR-1990 10:48:01.69
File ID (741,17,0)   End of file block 111 / Allocated 112

Virtual block number 98 (00000062), 512 (0200) bytes

45520043 4544004E 574F4E48 4E550050 4D545345 4D495400 454D4954 00455441 ATE.TIME.TIMESTMP.UNKNOWN.DEC.RE 000000
0054414F 4C460052 45474554 4E490054 4E494C4C 414D5300 54414F4C 46004C41 AL.FLOAT.SMALLINT.INTEGER.FLOAT. 000020
47005241 48435241 5620474E 4F4C0052 41484352 41560052 45544341 52414843 CHARACTER.VARCHAR.LONG VARCHAR.G 000040
49485041 52475241 5620474E 4F4C0043 49485041 52475241 56004349 48504152 RAPHIC.VARGRAPHIC.LONG VARGRAPHI 000060
4544004E 574F4E48 4E550050 4D415453 454D4954 00454D49 54004554 41440043 C.DATE.TIME.TIMESTAMP.UNKNOWN.DE 000080
0FA60FA7 004E4F49 53494345 52502045 4C42554F 44004C41 4552004C 414D4943 CIMAL.REAL.DOUBLE PRECISION.Ĩ.Ì. 0000A0
000A0011 00000000 00000000 00070006 00050004 00030002 0FA50FA4 0FA40FA3 È.È.È.È......................... 0000C0
00090004 00040004 00060006 00000009 00000000 00060006 00050004 00030002 ................................ 0000E0
00000000 00000000 00000000 005C005C 000807E2 000F0005 00030004 00090009 ............ã...\.\............ 000100
00000000 00000000 00000000 00000000 00000000 00001FEA 20001345 20002000 Å Å E.Å õ....................... 000120
00000000 00000000 00000000 00000000 00000000 00000000 00000000 00000000 ................................ 000140
00000000 00000000 00000000 00000000 00000000 00000000 00000000 00000000 ................................ 000160
00000000 00000000 00000000 00000000 00000000 00000000 00000000 00000000 ................................ 000180
00000000 00000000 00000000 00000000 00000000 00000000 00000000 00000000 ................................ 0001A0
00000000 00000000 00000000 00000000 00000000 00000000 00000000 00000000 ................................ 0001C0
00000000 00000000 00000000 00000000 00000000 00000000 00000000 00000000 ................................ 0001E0

Dump of file SATURN:[PCCOMMON.DUMP.DLL]NEWMETA.TMP;1 on 18-APR-1990 10:48:01.69
File ID (741,17,0)   End of file block 111 / Allocated 112

Virtual block number 99 (00000063), 512 (0200) bytes

00000000 00000000 00000000 00000000 00000000 00000000 00000000 00000000 ................................ 000000
00000000 00000000 00000000 00000000 00000000 00000000 00000000 00000000 ................................ 000020
00000000 00000000 00000000 00000000 00000000 00000000 00000000 00000000 ................................ 000040
00000000 00000000 00000000 00000000 00000000 00000000 00000000 00000000 ................................ 000060
00000000 00000000 00000000 00000000 00000000 00000000 00000000 00000000 ................................ 000080
00000000 00000000 00000000 00000000 00000000 00000000 00000000 00000000 ................................ 0000A0
00000000 00000000 00000000 00000000 00000000 00000000 00000000 00000000 ................................ 0000C0
00000000 00000000 00000000 00000000 00000000 00000000 00000000 00000000 ................................ 0000E0
00000000 00000000 00000000 00000000 00000000 00000000 00000000 00000000 ................................ 000100
00000000 00000000 00000000 00000000 00000000 00000000 00000000 00000000 ................................ 000120
00000000 00000000 00000000 00000000 00000000 00000000 00000000 00000000 ................................ 000140
00000000 00000000 00000000 00000000 00000000 00000000 00000000 00000000 ................................ 000160
00000000 00000000 00000000 00000000 00000000 00000000 00000000 00000000 ................................ 000180
00000000 00000000 00000000 00000000 00000000 00000000 00000000 00000000 ................................ 0001A0
00000000 00000000 00000000 00000000 00000000 00000000 00000000 00000000 ................................ 0001C0
00000000 00000000 00000000 00000000 00000000 00000000 00000000 00000000 ................................ 0001E0
```

```
Dump of file SATURN:[PCCOMMON.DUMP.DLL]NEWMETA.TMP;1 on 18-APR-1990 10:48:01.69
File ID (741,17,0)   End of file block 111 / Allocated 112

Virtual block number 100 (00000064), 512 (0200) bytes

00000000 00000000 00000000 00000000 00000000 00000000 00000000 00000000 ................................ 000000
00000000 00000000 00000000 00000000 00000000 00000000 00000000 00000000 ................................ 000020
00000000 00000000 00000000 00000000 00000000 00000000 00000000 00000000 ................................ 000040
00000000 00000000 00000000 00000000 00000000 00000000 00000000 00000000 ................................ 000060
00000000 00000000 00000000 00000000 00000000 00000000 00000000 00000000 ................................ 000080
00000000 00000000 00000000 00000000 00000000 00000000 00000000 00000000 ................................ 0000A0
00000000 00000000 00000000 00000000 00000000 00000000 00000000 00000000 ................................ 0000C0
00000000 00000000 00000000 00000000 00000000 00000000 00000000 00000000 ................................ 0000E0
FFFF0000 00000B6E 0000003D 4F464E49 5F454C49 465F435F 07560000 00000000 ................................ 000100
00000000 00000202 00000000 00000000 00000102 00000000 00000000 00000001 ......V._C_FILE_INFO=...n....... 000120
00000000 00000000 00000000 00000000 00000000 00000000 00000000 00000000 ................................ 000140
00000000 00000000 00000000 00000000 00000000 00000000 00000000 00000000 ................................ 000160
00000000 00000000 00000000 00000000 00000000 00000000 00000000 00000000 ................................ 000180
00000000 00000000 00000000 00000000 00000000 00000000 00000000 00000000 ................................ 0001A0
00000000 00000000 00000000 00000000 00000000 00000000 00000000 00000000 ................................ 0001C0
00000000 00000000 00000000 00000000 00000000 00000000 00000000 00000000 ................................ 0001E0

Dump of file SATURN:[PCCOMMON.DUMP.DLL]NEWMETA.TMP;1 on 18-APR-1990 10:48:01.69
File ID (741,17,0)   End of file block 111 / Allocated 112

Virtual block number 101 (00000065), 512 (0200) bytes

00000000 00000000 00000000 00000000 00000000 00000000 00000000 00000000 ................................ 000000
00000000 00000000 00000000 00000000 00000000 00000000 00000000 00000000 ................................ 000020
00000000 00000000 00000000 00000000 00000000 00000000 00000000 00000000 ................................ 000040
00000000 00000000 00000000 00000000 00000000 00000000 00000000 00000000 ................................ 000060
00000000 00000000 00000000 00000000 00000000 00000000 00000000 00000000 ................................ 000080
00000000 00000000 00000000 00000000 00000000 00000000 00000000 00000000 ................................ 0000A0
00000000 00000000 00000000 00000000 00000000 00000000 00000000 00000000 ................................ 0000C0
00000000 00000000 00000000 00000000 00000000 00000000 00000000 00000000 ................................ 0000E0
00000000 00000000 00000000 00000000 00000000 00000000 00000000 00000000 ................................ 000100
00000000 00000000 00000000 00000000 00000000 00000000 00000000 00000000 ................................ 000120
00000000 00000000 00000000 00000000 00000000 00000000 00000000 00000000 ................................ 000140
00000000 00000000 00000000 00000000 00000000 00000000 00000000 00000000 ................................ 000160
00000000 00000000 00000000 00000000 00000000 00000000 00000000 00000000 ................................ 000180
00000000 00000000 00000000 00000000 00000000 00000000 00000000 00000000 ................................ 0001A0
00000000 00000000 00000000 00000000 00000000 00000000 00000000 00000000 ................................ 0001C0
00000000 00000000 00000000 00000000 00000000 00000000 00000000 00000000 ................................ 0001E0

Dump of file SATURN:[PCCOMMON.DUMP.DLL]NEWMETA.TMP;1 on 18-APR-1990 10:48:01.69
File ID (741,17,0)   End of file block 111 / Allocated 112

Virtual block number 102 (00000066), 512 (0200) bytes

00000000 00000000 00000000 00000000 00000000 00000000 00000000 00000000 ................................ 000000
00000000 00000000 00000000 00000000 00000000 00000000 00000000 00000000 ................................ 000020
00000000 00000000 00000000 00000000 00000000 00000000 00000000 00000000 ................................ 000040
00000000 00000000 00000000 00000000 00000000 00000000 00000000 00000000 ................................ 000060
00000000 00000000 00000000 00000000 00000000 00000000 00000000 00000000 ................................ 000080
00000000 00000000 00000000 00000000 00000000 00000000 00000000 00000000 ................................ 0000A0
00000000 00000000 00000000 00000000 00000000 00000000 00000000 00000000 ................................ 0000C0
00000000 00000000 00000000 00000000 00000000 00000000 00000000 00000000 ................................ 0000E0
00000000 00000000 00000000 00000000 00000000 00000000 00000000 00000000 ................................ 000100
00000000 00000000 00000000 00000000 00000000 00000000 00000000 00000000 ................................ 000120
00000000 00000000 00000000 00000000 00000000 00000000 00000000 00000000 ................................ 000140
00000000 00000000 00000000 00000000 00000000 00000000 00000000 00000000 ................................ 000160
00000000 00000000 00000000 00000000 00000000 00000000 00000000 00000000 ................................ 000180
00000000 00000000 00000000 00000000 00000000 00000000 00000000 00000000 ................................ 0001A0
00000000 00000000 00000000 00000000 00000000 00000000 00000000 00000000 ................................ 0001C0
00000000 00000000 00000000 00000000 00000000 00000000 00000000 00000000 ................................ 0001E0
```

```
Dump of file SATURN:[PCCOMMON.DUMP.DLL]NEWMETA.TMP;1 on 18-APR-1990 10:48:01.69
File ID (741,17,0)   End of file block 111 / Allocated 112

Virtual block number 103 (00000067), 512 (0200) bytes

00000000 00000000 00000000 00000000 00000000 00000000 00000000 00000000 ................................ 000000
00000000 00000000 00000000 00000000 00000000 00000000 00000000 00000000 ................................ 000020
00000000 00000000 00000000 00000000 00000000 00000000 00000000 00000000 ................................ 000040
00000000 00000000 00000000 00000000 00000000 00000000 00000000 00000000 ................................ 000060
00000000 00000000 00000000 00000000 00000000 00000000 00000000 00000000 ................................ 000080
00000000 00000000 00000000 00000000 00000000 00000000 00000000 00000000 ................................ 0000A0
00000000 00000000 00000000 00000000 00000000 00000000 00000000 00000000 ................................ 0000C0
00000000 00000000 00000000 00000000 00000000 00000000 00000000 00000000 ................................ 0000E0
00000000 00000000 00000000 00000000 00000000 00000000 00000000 00000000 ................................ 000100
00000000 00000000 00000000 00000000 00000000 00000000 00000000 00000000 ................................ 000120
00000000 00000000 00000000 00000000 00000000 00000000 00000000 00000000 ................................ 000140
00000000 00000000 00000000 00000000 00000000 00000000 00000000 00000000 ................................ 000160
00000000 00000000 00000000 00000000 00000000 00000000 00000000 00000000 ................................ 000180
00000000 00000000 00000000 00000000 00000000 00000000 00000000 00000000 ................................ 0001A0
00000000 00000000 00000000 00000000 00000000 00000000 00000000 00000000 ................................ 0001C0
00000000 00000000 00000000 00000000 00000000 00000000 00000000 00000000 ................................ 0001E0

Dump of file SATURN:[PCCOMMON.DUMP.DLL]NEWMETA.TMP;1 on 18-APR-1990 10:48:01.69
File ID (741,17,0)   End of file block 111 / Allocated 112

Virtual block number 104 (00000068), 512 (0200) bytes

00000000 00000000 00000000 00000000 00000000 00000000 00000000 00000000 ................................ 000000
00000000 00000000 00000000 00000000 00000000 00000000 00000000 00000000 ................................ 000020
00000000 00000000 00000000 00000000 00000000 00000000 00000000 00000000 ................................ 000040
00000000 00000000 00000000 00000000 00000000 00000000 00000000 00000000 ................................ 000060
00000000 00000000 00000000 00000000 00000000 00000000 00000000 00000000 ................................ 000080
00000000 00000000 00000000 00000000 00000000 00000000 00000000 00000000 ................................ 0000A0
00000000 00000000 00000000 00000000 00000000 00000000 00000000 00000000 ................................ 0000C0
00000000 00000000 00000000 00000000 00000000 00000000 00000000 00000000 ................................ 0000E0
00000000 00000000 00000000 00000000 00000000 00000000 00000000 00000000 ................................ 000100
00000000 00000000 00000000 00000000 00000000 00000000 00000000 00000000 ................................ 000120
00000000 00000000 00000000 00000000 00000000 00000000 00000000 00000000 ................................ 000140
00000000 00000000 00000000 00000000 00000000 00000000 00000000 00000000 ................................ 000160
00000000 00000000 00000000 00000000 00000000 00000000 00000000 00000000 ................................ 000180
00000000 00000000 00000000 00000000 00000000 00000000 00000000 00000000 ................................ 0001A0
00000000 00000000 00000000 00000000 00000000 00000000 00000000 00000000 ................................ 0001C0
00000000 00000000 00000000 00000000 00000000 00000000 00000000 00000000 ................................ 0001E0

Dump of file SATURN:[PCCOMMON.DUMP.DLL]NEWMETA.TMP;1 on 18-APR-1990 10:48:01.69
File ID (741,17,0)   End of file block 111 / Allocated 112

Virtual block number 105 (00000069), 512 (0200) bytes

00000000 00000000 00000000 00000000 00000000 00000000 00000000 00000000 ................................ 000000
00000000 00000000 00000000 00000000 00000000 00000000 00000000 00000000 ................................ 000020
00000000 00000000 00000000 00000000 00000000 00000000 00000000 00000000 ................................ 000040
00000000 00000000 00000000 00000000 00000000 00000000 00000000 00000000 ................................ 000060
00000000 00000000 00000000 00000000 00000000 00000000 00000000 00000000 ................................ 000080
00000000 00000000 00000000 00000000 00000000 00000000 00000000 00000000 ................................ 0000A0
00000000 00000000 00000000 00000000 00000000 00000000 00000000 00000000 ................................ 0000C0
00000000 00000000 00000000 00000000 00000000 00000000 00000000 00000000 ................................ 0000E0
00000000 00000000 00000000 00000000 00000000 00000000 00000000 00000000 ................................ 000100
00000000 00000000 00000000 00000000 00000000 00000000 00000000 00000000 ................................ 000120
00000000 00000000 00000000 00000000 00000000 00000000 00000000 00000000 ................................ 000140
00000000 00000000 00000000 00000000 00000000 00000000 00000000 00000000 ................................ 000160
00000000 00000000 00000000 00000000 00000000 00000000 00000000 00000000 ................................ 000180
00000000 00000000 00000000 00000000 00000000 00000000 00000000 00000000 ................................ 0001A0
00000000 00000000 00000000 00000000 00000000 00000000 00000000 00000000 ................................ 0001C0
00000000 00000000 00000000 00000000 00000000 00000000 00000000 00000000 ................................ 0001E0
```

```
Dump of file SATURN:[PCCOMMON.DUMP.DLL]NEWMETA.TMP;1 on 18-APR-1990 10:48:01.69
File ID (741,17,0)   End of file block 111 / Allocated 112

Virtual block number 106 (0000006A), 512 (0200) bytes

00000000 00000000 00000000 00000000 00000000 00000000 00000000 00000000 ................................ 000000
00000000 00000000 00000000 00000000 00000000 00000000 00000000 00000000 ................................ 000020
00000000 00000000 00000000 00000000 00000000 00000000 00000000 00000000 ................................ 000040
00000000 00000000 00000000 00000000 00000000 00000000 00000000 00000000 ................................ 000060
00000000 00000000 00000000 00000000 00000000 00000000 00000000 00000000 ................................ 000080
00000000 00000000 00000000 00000000 00000000 00000000 00000000 00000000 ................................ 0000A0
00000000 00000000 00000000 00000000 00000000 00000000 00000000 00000000 ................................ 0000C0
00000000 00000000 00000000 00000000 00000000 00000000 00000000 00000000 ................................ 0000E0
00000000 00000000 00000000 00000000 00000200 00010000 00000000 00000000 ................................ 000100
00000000 00000000 00000000 00000000 00000000 00000000 00000000 00000000 ................................ 000120
00000000 00000000 00000000 00000000 00000000 00000000 00000000 00000000 ................................ 000140
00000000 00000000 00000000 00000000 00000000 00000000 00000000 00000000 ................................ 000160
00000000 00000000 00000000 00000000 00000000 00000000 00000000 00000000 ................................ 000180
00000000 00000000 00000000 00000000 00000000 00000000 00000000 00000000 ................................ 0001A0
00000000 00000000 00000000 00000000 00000000 00000000 00000000 00000000 ................................ 0001C0
00000000 00000000 00000000 00000000 00000000 00000000 00000000 00000000 ................................ 0001E0

Dump of file SATURN:[PCCOMMON.DUMP.DLL]NEWMETA.TMP;1 on 18-APR-1990 10:48:01.69
File ID (741,17,0)   End of file block 111 / Allocated 112

Virtual block number 107 (0000006B), 512 (0200) bytes

00000000 00000000 00000000 00000000 00000000 00000000 00000000 00000000 ................................ 000000
00000000 00000000 00000000 00000000 00000000 00000000 00000000 00000000 ................................ 000020
00000000 00000000 00000000 00000000 00000000 00000000 00000000 00000000 ................................ 000040
00000000 00000000 00000000 00000000 00000000 00000000 00000000 00000000 ................................ 000060
00000000 00000000 00000000 00000000 00000000 00000000 00000000 00000000 ................................ 000080
00000000 00000000 00000000 00000000 00000000 00000000 00000000 00000000 ................................ 0000A0
00000000 00000000 00000000 00000000 00000000 00000000 00000000 00000000 ................................ 0000C0
00000000 00000000 00000000 00000000 00000000 00000000 00000000 00000000 ................................ 0000E0
00000000 00000000 00000000 00000000 00000000 00000000 00000000 00000000 ................................ 000100
00000000 00000000 00000000 00000000 00000000 00000000 00000000 00000000 ................................ 000120
00000000 00000000 00000000 00000000 00000000 00000000 00000000 00000000 ................................ 000140
00000000 00000000 00000000 00000000 00000000 00000000 00000000 00000000 ................................ 000160
00000000 00000000 00000000 00000000 00000000 00000000 00000000 00000000 ................................ 000180
00000000 00000000 00000000 00000000 00000000 00000000 00000000 00000000 ................................ 0001A0
00000000 00000000 00000000 00000000 00000000 00000000 00000000 00000000 ................................ 0001C0
00000000 00000000 00000000 00000000 00000000 00000000 00000000 00000000 ................................ 0001E0

Dump of file SATURN:[PCCOMMON.DUMP.DLL]NEWMETA.TMP;1 on 18-APR-1990 10:48:01.69
File ID (741,17,0)   End of file block 111 / Allocated 112

Virtual block number 108 (0000006C), 512 (0200) bytes

00000000 00000000 00000000 00000000 00000000 00000000 00000000 00000000 ................................ 000000
00000000 00000000 00000000 00000000 00000000 00000000 00000000 00000000 ................................ 000020
00000000 00000000 00000000 00000000 00000000 00000000 00000000 00000000 ................................ 000040
00000000 00000000 00000000 00000000 00000000 00000000 00000000 00000000 ................................ 000060
00000000 00000000 00000000 00000000 00000000 00000000 00000000 00000000 ................................ 000080
00000000 00000000 00000000 00000000 00000000 00000000 00000000 00000000 ................................ 0000A0
00000000 00000000 00000000 00000000 00000000 00000000 00000000 00000000 ................................ 0000C0
00000000 00000000 00000000 00000000 00000000 00000000 00000000 00000000 ................................ 0000E0
00000000 00000000 00000000 00000000 00000000 00000000 00000000 00000000 ................................ 000100
00000000 00000000 00000000 00000000 00000000 00000000 00000000 00000000 ................................ 000120
00000000 00000000 00000000 00000000 00000000 00000000 00000000 00000000 ................................ 000140
00000000 00000000 00000000 00000000 00000000 00000000 00000000 00000000 ................................ 000160
00000000 00000000 00000000 00000000 00000000 00000000 00000000 00000000 ................................ 000180
00000000 00000000 00000000 00000000 00000000 00000000 00000000 00000000 ................................ 0001A0
00000000 00000000 00000000 00000000 00000000 00000000 00000000 00000000 ................................ 0001C0
00000000 00000000 00000000 00000000 00000000 00000000 00000000 00000000 ................................ 0001E0
```

```
Dump of file SATURN:[PCCOMMON.DUMP.DLL]NEWMETA.TMP;1 on 18-APR-1990 10:48:01.69
File ID (741,17,0)   End of file block 111 / Allocated 112

Virtual block number 109 (0000006D), 512 (0200) bytes

 00000000 00000000 00000000 00000000 00000000 00000000 00000000 00000000 ................................ 000000
 00000000 00000000 00000000 00000000 00000000 00000000 00000000 00000000 ................................ 000020
 00000000 00000000 00000000 00000000 00000000 00000000 00000000 00000000 ................................ 000040
 00000000 00000000 00000000 00000000 00000000 00000000 00000000 00000000 ................................ 000060
 00000000 00000000 00000000 00000000 00000000 00000000 00000000 00000000 ................................ 000080
 00000000 00000000 00000000 00000000 00000000 00000000 00000000 00000000 ................................ 0000A0
 00000000 00000000 00000000 00000000 00000000 00000000 00000000 00000000 ................................ 0000C0
 00000000 00000000 00000000 00000000 00000000 00000000 00000000 00000000 ................................ 0000E0
 00000000 00000000 00000000 00000000 00000000 00000000 00000000 00000000 ................................ 000100
 00000001 00000000 00000000 00000000 00000000 00000000 0758174E 00000000 ....N.X......................... 000120
 00000000 00000000 00000000 00000000 00000000 00000000 00000000 81818101 ................................ 000140
 00000000 00000000 00000000 00000000 00000000 00000000 00000000 00000000 ................................ 000160
 00000000 00000000 00000000 00000000 00000000 00000000 00000000 00000000 ................................ 000180
 00000000 00000000 00000000 00000000 00000000 00000000 00000000 00000000 ................................ 0001A0
 00000000 00000000 00000000 00000000 00000000 00000000 00000000 00000000 ................................ 0001C0
 00000000 00000000 00000000 00000000 00000000 00000000 00000000 00000000 ................................ 0001E0

Dump of file SATURN:[PCCOMMON.DUMP.DLL]NEWMETA.TMP;1 on 18-APR-1990 10:48:01.69
File ID (741,17,0)   End of file block 111 / Allocated 112

Virtual block number 110 (0000006E), 512 (0200) bytes

 00000000 00000000 00000000 00000000 00000000 00000000 00000000 00000000 ................................ 000000
 00000000 00000000 00000000 00000000 00000000 00000000 00000000 00000000 ................................ 000020
 0A0A0A0A 0A0A0A0A 0A0A0A0A 0A0A0A0A 0A0A0A0A 0A0A0A0A 0A0A0A0A 0A0A0A00 ................................ 000040
 0A0A0A0A 0A0A0A0A 0A0A0A0A 0A0A0A0A 0A0A0A0A 0A0A0A0A 0A0A0A0A 0A0A0A0A ................................ 000060
 0A0A0A0A 0A0A0A0A 0A0A0A0A 0A0A0A0A 0A0A0A0A 0A0A0A0A 0A0A0A0A 0A0A0A0A ................................ 000080
 0A0A0A0A 0A0A0A0A 0A0A0A0A 0A0A0A0A 0A0A0A0A 0A0A0A0A 0A0A0A0A 0A0A0A0A ................................ 0000A0
 0A0A0A0A 0A0A0A0A 0A0A0A0A 0A0A0A0A 0A0A0A0A 0A0A0A0A 0A0A0A0A 0A0A0A0A ................................ 0000C0
 0A0A0A0A 0A0A0A0A 0A0A0A0A 0A0A0A0A 0A0A0A0A 0A0A0A0A 0A0A0A0A 0A0A0A0A ................................ 0000E0
 0A0A0A0A 0A0A0A0A 0A0A0A0A 0A0A0A0A 0A0A0A0A 0A0A0A0A 0A0A0A0A 0A0A0A0A ................................ 000100
 0A0A0A0A 0A0A0A0A 0A0A0A0A 0A0A0A0A 0A0A0A0A 0A0A0A0A 0A0A0A0A 0A0A0A0A ................................ 000120
 00000000 00000000 00000000 00000000 00000000 00000000 00000000 0000000A ................................ 000140
 00000000 00000000 00000000 0000FFFF 14960200 FFFFFFFF 00002000 00000000 .... ........................... 000160
 1FCC1FCA 1FC81FC6 1FC41FC2 1FC01FBE 1FBC1FBA 1FB81FB6 1FB41FB2 1FB0FFFF ..¯.ý.Ç.Ñ.¡.¤.¥.ƒ.à.ò.é.ó.à.ò.ñ. 000180
 4D4E3C3C 1FE81FE6 1FE41FE2 1FE01FDE 1FDC1FDA 1FD81FD6 1FD41FD2 1FD01FCE ö.Å.Θ.å.ø.Á.Ö.É.Ñ.Á.ã.ô.Ì.Ò.<<NM 0001A0
 000A0D77 6F6C6672 65766F20 68636174 73202D0A 0D303030 36520000 3E3E4753 SG>>..R6000..- stack overflow... 0001C0
 0A0D3020 79622065 64697669 64207265 6765746E 69202D0A 0D333030 36520003 ..R6003..- integer divide by 0.. 0001E0

Dump of file SATURN:[PCCOMMON.DUMP.DLL]NEWMETA.TMP;1 on 18-APR-1990 10:48:01.69
File ID (741,17,0)   End of file block 111 / Allocated 112

Virtual block number 111 (0000006F), 512 (0200) bytes

 726F6620 65636170 73206867 756F6E65 20746F6E 202D0A0D 38303036 52000800 ...R6008..- not enough space for 000000
 756F6E65 20746F6E 202D0A0D 39303036 52000900 0A0D7374 6E656075 67726120  arguments.....R6009..- not enou 000020
 000A0D00 FC000A0D 746E656D 6E6F7269 766E6520 726F6620 65636170 73206867 gh space for environment...•.... 000040
 6F6C6620 2D0A0D32 30303652 00020020 726F7272 6520656D 6974206E 757200FF ..run-time error ...R6002..- flo 000060
 00020003 FFFFFF00 0A0D6465 64616F6C 20746F6E 20746E69 6F702067 6E697461 ating point not loaded.......... 000080
 00000000 00000000 00000000 00121D56 00020000 00110868 00020000 00101FA0 ........h.......V............... 0000A0
 00000000 00000000 00000000 00000000 00000000 00000000 00000000 00000000 ................................ 0000C0
 00000000 00000000 00000000 00000000 00000000 00000000 00000000 00000000 ................................ 0000E0
 00000000 00000000 00000000 00000000 00000000 00000000 00000000 00000000 ................................ 000100
 00000000 00000000 00000000 00000000 00000000 00000000 00000000 00000000 ................................ 000120
 00000000 00000000 00000000 00000000 00000000 00000000 00000000 00000000 ................................ 000140
 00000000 00000000 00000000 00000000 00000000 00000000 00000000 00000000 ................................ 000160
 00000000 00000000 00000000 00000000 00000000 00000000 00000000 00000000 ................................ 000180
 00000000 00000000 00000000 00000000 00000000 00000000 00000000 00000000 ................................ 0001A0
 00000000 00000000 00000000 00000000 00000000 00000000 00000000 00000000 ................................ 0001C0
 00000000 00000000 00000000 00000000 00000000 00000000 00000000 00000000 ................................ 0001E0
```

Dump of file SATURN:[PCCOMMON.DUMP.DLL]PRO.TMP;1 on 18-APR-1990 10:49:59.80
File ID (870,5,0)    End of file block 40 / Allocated 40

Virtual block number 1 (00000001), 512 (0200) bytes

```
00000000 00000040 00000000 00000088 0000FFFF 00000004 00000028 00B85A4D MZ¡.(...........¦.......@....... 000000
00000080 00000000 00000000 00000000 00000000 00000000 00000000 00000000 ................................ 000020
6F6E6E61 63206061 72676F72 70207369 685421CD 4C01B821 CD09B400 0EBA1F0E ..o..Ç.ë!¡.Lè!This program canno 000040
00000000 00000024 0A0D002E 65646F60 20534F44 206E6920 6E757220 65622074 t be run in DOS mode....$....... 000060
00070007 00000000 00030000 00000000 00068009 A324CD25 000A020E 0505454E NE......%è$£.................... 000080
00000000 00000000 00010001 00040000 00000298 00A50097 007C0078 00400004 ..@.x.|...É..................... 0000A0
21E60F00 21E600EE 000F0F00 000F00EC 02760F00 0275008E 086C0F00 086C002A *.l....(.f.u...v.š.......Ÿ.l¦..l¦ 0000C0
4F525003 00C80004 011E1E81 011E04ED 1F200F21 107E0313 02020E21 00000000 ....!.....-.!. .Ú...Ÿ.....à..PRO 0000E0
F6008000 10000A00 01000002 444E454F 52500600 01545241 54534F52 50080000 ...PROSTART...PROEND.........~.- 000100
45504F4C 4D440C6C 6064034E 49574D50 05534C4C 4143534F 44080001 5C014C00 .L.\...DOSCALLS.PMWIN.dml.DMLOPE 000120
41534C4D 44094556 41534C4D 44074C45 444F4057 454E4C4D 440B4C45 444F4D4E NMODEL.DMLNEWMODEL.DMLSAVE.DMLSA 000140
534C4D44 0A4F444E 5554554F 48544957 4E585454 52415453 4C4D4416 53414556 VEAS.DMLSTARTTXNWITHOUTUNDO.DMLS 000160
55514C4D 4412454C 444E4148 4C45444F 4D595245 55514C4D 44134E58 54504F54 TOPTXN.DMLQUERYMODELHANDLE.DMLQU 000180
15455059 544C4544 4F4D5952 4555514C 4D441145 4D414E4E 47495345 44595245 ERYDESIGNNAME.DMLQUERYMODELTYPE. 0001A0
4E45434C 54550F4C 54550345 4D414E45 4C49464C 45444F4D 59524555 514C4D44 DMLQUERYMODELFILENAME.UTL.UTLCEN 0001C0
45564153 4C54550E 474C4445 4C49464B 4349504C 54550E57 4F444E49 57524554 TERWINDOW.UTLPICKFILEDLG.UTLSAVE 0001E0
```

Dump of file SATURN:[PCCOMMON.DUMP.DLL]PRO.TMP;1 on 18-APR-1990 10:49:59.80
File ID (870,5,0)    End of file block 40 / Allocated 40

Virtual block number 2 (00000002), 512 (0200) bytes

```
0E495447 03544F4F 524E414D 48434142 59524555 514C5455 13474C44 454C4946 FILEDLG.UTLQUERYBACHMANROOT.GTI. 000000
45555149 54471247 534D5453 4F504954 470A4C4F 4F544554 41455243 4954475F _GTICREATETOOL.GTIPOSTMSG.GTIQUE 000020
54494C49 42495349 564C4F4F 54544553 49544714 574F444E 49574C4F 4F545952 RYTOOLWINDOW.GTISETTOOLVISIBILIT 000040
54485952 4555514D 46440B4D 46440353 55434F46 4C4F4F54 54455349 54470F59 Y.GTISETTOOLFOCUS.DFM.DFMQUERYHT 000060
00000000 00000000 00000597 03000003 01024554 49525753 4F44084F 4953034D M.SIO.DOSWRITE.................. 000080
86890000 88F84689 FA468900 00880000 FD5686C7 D88EFFFF 881E5657 0005E0C8 àÁ..WV.¦...Áú.V»..¦...F°.F½¦..... 0000A0
46880000 FFFF9A50 16FC4A86 8D1076FF 00FB2686 C600FD58 86C6FA20 8689FA22 "°.. °ó.X».ó.&«..v...J•.P......F 0000C0
E9037500 00300000 FFFF9A50 16FB2686 8D0A76FF 0C76FF01 A6E90375 0C46080A ..F.u.Õ¦..v..v...&«.P.....=..u.Õ 0000E0
037500FB 26BA80FE 5AB688FE 5A86FF00 04E90000 FE5A86C7 0528E900 01B80006 ..¡..Õ(.ú.Z±..Õ....Z±.ÑZ±.¤&«.u. 000100
FB26828A FE5AB688 0000E903 75020253 87F60888 98FB2682 8AFE5AB6 8B0035E9 Õ5..ÑZ±..&«..Ä-.S..u.Õ...ÑZ±..&« 000120
FD5882C6 FE5AB688 FFB9E9FD 588288FE 5AB688F8 26828AFE 5AB68800 08E9202C , Õ...ÑZ±..&«.ÑZ±..X»Õ¿..ÑZ±ó.X» 000140
5016F646 8D5016FB 26868D08 C48300FA 00569A50 16FB2686 8D5016FD 58868D00 ...X».P..&«.P.V.°..á...&«.P.F-.P 000160
8904C483 012E0086 9A5016FB 26868D00 66E90374 00003D00 0002319A 006A006A j.j..1...=..t.Õf...&«.P.Ñ....á.. 000180
8DFE5AB6 88FFEBE9 0003E903 755CFB26 BA80FE5A B68BFE5A 8EFF0004 E9FE5A86 .Z±Õ....Z±.ÑZ±.¤&«\u.Õ..ÕŠ..ÑZ±. 0001A0
25BA80FE 5AB68B00 01FD5686 C708C483 016A0056 9A5016FC 54868D50 16FB2782 .'«.P..T=.P.V.j..á.Ú.V»...ÑZ±.¤% 0001C0
42681E50 16FB2686 8D0098E9 00FB2682 C6FE5AB6 88FE5A86 FF0004E9 03743AFB «:t.Õ....Z±.ÑZ±ó.&«.Õ....&«.P.hB 0001E0
```

Dump of file SATURN:[PCCOMMON.DUMP.DLL]PRO.TMP;1 on 18-APR-1990 10:49:59.80
File ID (870,5,0)    End of file block 40 / Allocated 40

Virtual block number 3 (00000003), 512 (0200) bytes

```
16FE6086 8DFC4AB6 FFFC4CB6 FF016A00 6A0CC483 021C00CE 9A5016FE 60868D00 ...'±.P.ö....á.j.j..ÑL=.ÑJ=..'±. 000000
0A468B06 5EC4003A E9FE5A86 88FE5A86 890000FF FF9A4015 68006A00 CD681E50 P.hë.j.h.@.......Z±..Z±Õ:.á^..F. 000020
89260000 B8065EC4 0037E900 FB2686C6 003FE903 04E90257 89260789 260C568B .V.&..&.W.Õ..Õ?.ó.&«.Õ7.á^.¦..&. 000040
7500063D FFDCE903 7500023D 0018E900 1EE90021 E903C5E9 0000B807 89260247 G.&..¦..Õé.Õl.Õ..Õ..=..u.ÕÉ.=..u 000060
685016FB 26868D00 64E90374 00FB268E 80FFDFE9 FFC4E903 7500073D FFB6E903 .ÕÑ.=..u.Õá.ÕÕ../&«.t.Õd...&«.Ph 000080
C483027B 00109A50 16FB2686 8D00DC68 1E0049E9 03740000 300000FF FF9A0100 .......=..t.Õl..hÉ...&«.P...(..á 0000A0
037400FE 5ABE83FE 5AB68900 00FFFF9A 006A006A 5016F646 8D5016FB 26868D08 ...&«.P.F-.Pj.j........Z±./Z±.t. 0000C0
0E468B00 FB2686C6 0005E908 F7C01B01 FB268E80 0009E903 7410F646 F60009E9 Õ..-F-.t.Õ.../&«..à¼ÁÕ..ó.&«..F. 0000E0
08C48302 9B00569A 5016FA24 868D00F8 681EFA22 9E8CFA20 868900E4 B800ACE9 Õ^.¡Õ... °..".h½...$°.P.V....á. 000100
08C48302 BB00569A 5016FA24 868D0115 681EFA22 9E8CFA20 868900FE B800B7E9 ÕÑ.¡±... °..".h....$°.P.V.£..á. 000120
08C48302 DB00569A 5016FA24 868D0138 681EFA22 9E8CFA20 8689011B B80097E9 Õ..¡.... °..".hß...$°.P.V.Û...á. 000140
08C483FF FF00569A 5016FA24 868D0158 681EFA22 9E8CFA20 8689013E B80077E9 Õw.¡>... °..".hX...$°.P.V.....á. 000160
08C48303 F200569A 5016FA24 868D0171 681EFA22 9E8CFA20 8689015E B80057E9 Õw.¡^... °..".hq...$°.P.V.·..á. 000180
3DFF64E9 0375000A 3DFF4CE9 03750009 3D002BE9 002EE902 87E90001 B80037E9 Õ7.¡..Õ..Õ..Õ+.=..u.ÕL.=..u.Õd.= 0001A0
B6FF016A 006AFFC9 E9FFACE9 03750000 3DFF94E9 0375000C 3DFF7CE9 0375000B ..u.Õ|.=..u.Õ..=..u.Õ¯.Õè.j..j..Ñ 0001C0
868DFA20 B6FFFA22 B6FFFD56 B6FF5016 FA24868D 5016FB26 868DFC4A B6FFFC4C L=.ÑJ=..&«.P..$°.P.ÑV».Ñ"°.Ñ °.. 0001E0
```

Dump of file SATURN:[PCCOMMON.DUMP.DLL]PRO.TMP;1 on 18-APR-1990 10:49:59.80
File ID (870,5,0)   End of file block 40 / Allocated 40

Virtual block number 4 (00000004), 512 (0200) bytes

```
89260247 89260000 B8065EC4 0122E9FE 5A868BFE 5A868900 00FFFF9A 5016FC54 T•.P.......Z±..Z±Õ".6^.¡..&.G.&. 000000
00FC548A 80FE5A86 88FE5A86 FF0004E9 0000FE5A 86C70127 E90209E9 0000B807 .¡..Õ..Õ'.ú.Z±..Õ....Z±.ÑZ±.¤T•. 000020
828AFE5A B68B0000 E9037502 025387F6 D88B98FC 54828AFE 5AB68B00 35E90375 u.ÕS..ÑZ±..T•..Á-.S..u.Õ...ÑZ±.. 000040
82C6FE5A B68BFFB9 E9FB2682 88FE5AB6 88FC5482 8AFE5AB6 8B0008E9 202CFC54 T•, Õ...ÑZ±..T•.ÑZ±..&«Õ¿..ÑZ±6. 000060
FF0028E9 03750000 3D08C483 0443008C 9A5016FD 58868D50 16FB2686 8D00FB26 &«...&«.P..X».P...C..6.=..u.Õ(.. 000080
01B80006 E9037500 00300000 FFFF9A06 76FF0876 FF5016FC 54868D10 76FF0E76 v..v...T•.P.v..v......=..u.Õ..¡. 0000A0
5016FC4E 868D0077 E9025789 26078926 0C5688OA 468B065E C40010E9 016CE900 .Õl.Õ..6^..F..V.&..&.W.Õw...N•.P 0000C0
FF0E76FF FA5689F8 468904C4 83000001 4E9A5016 FC4E868D 04C48304 51017E9A .-.Q..6...N•.P.N.Å..6..F½.V'.v.. 0000E0
06E90375 00003D00 00FFFF9A 0676FF08 76FFF876 FFFA76FF 5016FC54 868D1076 v...T•.P.v'.v½.v..v......=..u.Õ. 000100
023DFF9C E9037500 013D001B E9001EE9 0100E900 01B80027 E90109E9 0001B800 .¡..Õ..Õ'.¡..Õ..Õ..Õ..=..u.Õ..=. 000120
5016FC46 8D37FF26 0277FF26 065EC4FF D9E9FEC6 E9037500 033DFEE4 E9037500 .u.Õõ±=..u.Õ6±Õl.6^.&.w.&.7.F•.P 000140
28868D37 FF260277 FF26065E C400BDE9 0001B800 06E90375 00003D00 00FFFF9A .....=..u.Õ..¡..Õ§.6^.&.w.&.7..( 000160
FE76FF00 6A006A0E 76FF009A E90001B8 0006E903 7500003D 0000FFFF 9A5016FC •.P.....=..u.Õ..¡..Õ...v.j.j..v± 000180
7500003D 16C48300 00FFFF9A 1076FF1E 6A5016FC 52868D50 16FC2886 8DFC76FF .v•..(•.P..R•.Pj..v.......6.=..u 0001A0
06E90375 00003000 00003A9A 5016FE5C 868DFC52 B6FF0066 E90001B8 0006E903 .Õ..¡..Õf..ÑR•..\±.P.:...=..u.Õ. 0001C0
E90001B8 0006E903 7500003D 0000FFFF 9AFE5CB6 FFFE5EB6 FF0049E9 0001B800 .¡..Õl..Ñ^±.Ñ\±.....=..u.Õ..¡..Õ 0001E0
```

Dump of file SATURN:[PCCOMMON.DUMP.DLL]PRO.TMP;1 on 18-APR-1990 10:49:59.80
File ID (870,5,0)   End of file block 40 / Allocated 40

Virtual block number 5 (00000005), 512 (0200) bytes

```
6A006A1D AD68FC52 B6FF0000 FFFF9AFC 52B6FF00 00FFFF9A 016AFC52 B6FF002E ...ÑR•j.......ÑR•......ÑR•hÙ.j.j 000000
08B81E56 57000218 C8000CCA C95F5E1F 0000E900 00B80000 FFFF9A00 6A006A00 .j.j......¡..Õ...^_èò..à...WV.¡. 000020
A3E90001 B80006E9 03750000 3D0000FF FF9A5016 F4468D0A 76FF0C76 FFD88E00 ..Ä.v..v..F¶.P.....=..u.Õ..¡..ÕÉ 000040
8B0285E9 0001B800 06E90375 00003D00 00FFFF9A 5016FE46 8DF476FF F676FF02 ..v-.v¶.F±.P.....=..u.Õ..¡..Õ... 000060
8FB8009B E9FDEE9E 8CFDEC86 890189B8 FDEA9E8C FDE88689 0177B800 89E9FE46 F±Õ..¡w...Ò»..õ»¡....š»..Ÿ»Õ..¡. 000080
9E8CFDE8 868901AA B80082E9 FDEE9E8C FDEC8689 01A4B8FD EA9E8CFD E8868901 ...Ò»..õ»¡È...š»..Ÿ»Õ..¡`...Ò».. 0000A0
868901E3 B8FDEA9E 8CFDE886 8901CBB8 0069E9FD EE9E8CFD EC868901 C5B8FDEA õ»¡é...š»..Ÿ»Õi.¡ù...Ò»..õ»¡D... 0000C0
E9FDEE9E 8CFDEC86 8901FAB8 FDEA9E8C FDE88689 01E9B800 50E9FDEE 9E8CFDEC š»..Ÿ»ÕP.¡Õ...Ò»..õ»¡'...š»..Ÿ»Õ 0000E0
0B3DFF80 E9037500 0A3DFF6F E9037500 093D002B E9002EE9 01FCE900 01B80037 7.¡..Õ•.Õ..Õ+.=..u.Õo.=..u.Õ..=. 000100
B6FF0000 FA46C7FF C9E9FFB3 E9037500 003DFFA2 E9037500 0C3DFF91 E9037500 .u.Õ..=..u.ÕÅ.=..u.Õ".Õè.úF'...Ñ 000120
E9000088 000007C7 26065EC4 0176E9F8 468BF846 89FFFF00 009AFDE8 B6FFFDEA õ».ÑÒ»......F½.F½Õv.6^.&ú...¡..Õ 000140
76FF0186 E9000188 0006E903 7500003D 000007A7 9AF476FF F676FF01 88E901A2 Å.Õ...v-.v¶.Ì...=..u.Õ..¡..Õ...v 000160
07DF9AF4 76FFF676 FF016DE9 0001B800 06E90375 00003D00 00FFFF9A F476FFF6 -.v¶.....=..u.Õ..¡..Õm..v-.v¶.Õ. 000180
00685016 FDF0868D 00FDF086 C6013AE9 0154E900 01B80006 E9037500 003D0000 ..=..u.Õ..¡..ÕT.Õ:.6.Þ»...Þ».Ph. 0001A0
08C48302 FB00109A 5016FDF0 868D0200 681E0040 E9037400 003D0000 02039A01 ......=..t.Õ@..h....Þ».P...«..6. 0001C0
0009E903 7400F87E 83F84689 000000E5 9A006A00 6A5016FC 468D5016 FDF0868D ..Þ».P.F•.Pj.j..Í....F½.~½.t.Õ.. 0001E0
```

Dump of file SATURN:[PCCOMMON.DUMP.DLL]PRO.TMP;1 on 18-APR-1990 10:49:59.80
File ID (870,5,0)   End of file block 40 / Allocated 40

Virtual block number 6 (00000006), 512 (0200) bytes

```
FDEEB6FF 5016FDF0 868D016A 006A016A 006A00FD F086C600 05E90374 10FC46F6 -F•.t.Õ..6.Þ».j.j.j.j...Þ».P.ÑŸ» 000000
0078E900 01FA46C7 0065E900 00FFFF9A 5016FEF2 868D0208 681E006A FDECB6FF .Ñš»j..h....·±.P.....Õe.úF'..Õx. 000020
8DF476FF F676FF00 ABE90001 B80006E9 03750000 3D0000FF FF9AF476 FFF676FF .v-.v¶.....=..u.Õ..¡..Õ¨..v-.v¶. 000040
FF9AF476 FFF676FF 008CE900 01B80006 E9037500 00300000 FFFF9A50 16FEF286 .·±.P.....=..u.Õ..¡..Õ...v-.v¶.. 000060
00013D00 1BE9006A E90001B8 0024E900 73E90001 B80006E9 03750000 3D0000FF ...=..u.Õ..¡..Õs.Õ$.¡..Õj.Õ..=.. 000080
01B8002F E90032E9 FFDCE9FF 83E90375 00033DFF 93E9037F 00023DFF EFE9037D ).Õÿ.=....Õ..=..u.Õ..ÕÉ.Õ2.Õ/.¡. 0000A0
E9037500 033DFE88 E9037500 023DFE82 E9037500 013D0023 E90026E9 0040E900 .Õ@.Õ&.Õ#.=..u.Õ.±=..u.Õ.±=..u.Õ 0000C0
00B80001 07C72606 5EC4FE43 E9037400 FA7E83FF D1E9FFD1 E9037500 043DFED1 l±=..u.Õl.Õi..~'.t.ÕC±6^.&ú...¡. 0000E0
000200E2 00040722 02030150 000605AF 02030019 900008CA C95F5E1F 0000E900 .Õ...^_èò.......£...P..."...ã... 000100
01030000 0006059F 00020000 0004073B 00020075 000304E4 02030000 000206A9 `.......ð...u...;............... 000120
02030014 00030412 020300FA 00050515 02030088 000305CD 02030088 0002018B ........ë...........'........... 000140
02030114 00050535 02030021 00030475 0203009A 00030056 02030109 00050586 ........V.......u...!...5....... 000160
0203004B 00010750 01030127 00050569 02030035 000307C6 0203002D 000306E5 Í...-...6...5...î...'...P...K... 000180
0203013C 00050572 020300C4 00040365 0203003F 000306CC 02030084 00040550 P...Ç...ä...?...e...6...r...<... 0001A0
00000000 00000000 00000061 000304C1 02030003 00040791 02030056 000306FE ±...V.......Æ...ê...a........... 0001C0
6A006A00 04FE46C7 FC5689FA 46890856 8B06468B D88EFFFF B81E5657 00000AC8 à...WV.¡...Ä.F..V..F'.V•úF±..j.j 0001E0
```

```
Dump of file SATURN:[PCCOMMON.DUMP.DLL]PRO.TMP;1 on 18-APR-1990 10:49:59.80
File ID (870,5,0)   End of file block 40 / Allocated 40

Virtual block number 7 (00000007), 512 (0200) bytes

 00FFFF9A 5016FA46 8000C868 020036FF 261C9A06 8EFFFF68 FFFF6800 6A006A01 .j.j.h..h......&.6..hà..F*.P.... 000000
 C80004CA C95F5E1F 0000E9FE 468B0000 FFFF9AF6 76FFF876 FFF85689 F6468900 ..F-.V½.v½.v-......F±Ō...^_èò..à 000020
 00CA9A00 6A036A01 6A006A01 6A006A01 CAE90E46 8BD88E00 08881E56 57000004 ...WV.¡...Ä.F.Ōò.j.j.j.j.j.j..ò. 000040
 8B06468B 0000FFFF 9A0676FF 0876FF00 6A1076FF 1276FF00 0000019A 50520000 ..RP.1....v..v.j..v..v.......F.. 000060
 6A006A00 00FFFF9A 37FF2602 77FF26FC 5EC41076 FF1276FF FE5689FC 46890856 V..F=.V±.v..v.á^=&.w.&.7.....j.j 000080
 FF1276FF 016A006A 018EE900 0001859A 50520000 01AE9A00 6A016A01 6A006A01 .j.j.j.j..Ō...RP.ç...Ō..j.j..v.. 0000A0
 FF1276FF 0063E90A 468B0170 E9000001 9A9A206A 006A021A 681E021F 681E1076 v..h...h..j.j .....Ōp..F.Ōc..v.. 0000C0
 76FF1276 FF005FE9 00020447 C726FC5E C4FE5689 FC468900 0001249A 006A1076 v.j..$....F=.V±á^=&úG...Ō_..v..v 0000E0
 1076FF12 76FF0040 E9000304 47C726FC 5EC4FE56 89FC4689 00000143 9A006A10 .j..C....F=.V±á^=&úG...Ōa¯.v..v. 000100
 3D001BE9 001EE900 21E90004 0447C726 FC5EC4FE 5689FC46 890000FF FF9A006A j.......F=.V±á^=&úG...Ō!.Ō..Ō..= 000120
 0A468B00 E9E9FFDF E9FFC3E9 037500E6 3DFFACE9 0375000C 3DFF95E9 03750002 @.u.Ō..=É.u.Ō¯.=Ì.u.Ōù.ŌŌ.ŌŌ..F. 000140
 71E90000 FFFF9A20 6A006A02 36681E02 3B681E10 76FF1276 FF016A00 6A0074E9 Ōt.j.j..v..v..h;..h6.j.j .....Ōq 000160
 9A1076FF 1276FF00 00FFFF9A 50520000 FFFF9A00 6A036A01 6A006A01 6A006A00 .j.j.j.j.j.j......RP......v..v.. 000180
 47C726FC 5EC4FE56 89FC4689 00000105 9A006A10 76FF1276 FF004BE9 0000FFFF ....ŌK..v..v.j.......F=.V±á^=&úG 0001A0
 3DFFA2E9 03750001 3D001BE9 001EE900 21E90000 01C09A10 76FF1276 FF000104 ....v..v..à...Ō!.Ō..Ō..=..u.ŌÀ.= 0001C0
 76FF1076 FF1276FF FFAFE900 51E9FFDF E9FF74E9 03750003 3DFFC0E9 03750002 ..u.Ōà.=..u.Ōt.ŌŌ.Ōa.Ō£..v..v..v 0001E0

Dump of file SATURN:[PCCOMMON.DUMP.DLL]PRO.TMP;1 on 18-APR-1990 10:49:59.80
File ID (870,5,0)   End of file block 40 / Allocated 40

Virtual block number 8 (00000008), 512 (0200) bytes

 03750020 30002BE9 002EE900 3AE90000 FFFF9A06 76FF0876 FF0A76FF 0C76FF0E ..v..v..v..v......Ō:.Ō..Ō+.= .u. 000000
 03750038 3DFE9BE9 03750030 3DFFC2E9 03750029 30FE8DE9 03750022 3DFF3AE9 Ō:.=".u.Ō.±=).u.Ōō.=0.u.Ō.±=;.u. 000020
 03000000 02002600 0200000E CAC95F5E 1F0000E9 00008A00 0088FF82 E9FE0EE9 Ō.±Ōý.¡..¤..Ō...^_èò.....&...... 000040
 03000000 06006700 02000700 0201EA01 03007C00 02004E01 03007A00 02003001 .=...z...N...|...Ō.......g...... 000060
 03001E00 02009801 03001000 02008901 03005F00 02002900 05008800 0200EF01 .ÿ........)......¿.............. 000080
 00005C00 02008501 03005B00 02007E01 03008300 02022E01 03001F00 0201D001 .À..........¯...~...[.......\.. 0000A0
 00000000 00000000 00000500 02000200 01CB0001 881F0200 3E89088E FFFF881E .¡...Ä.>...|..ù.................. 0000C0
 FFFFB9C0 33067EC4 1EDE88D7 88EC8855 00000000 00000000 00000000 00000000 ...............U.§.■.B.á-.3â¿.. 0000E0
 01C6F706 468BFE87 08468ED8 8EC08CF9 28D1F7AE F2FFFFB9 0A7EC4FF 7580AEF2 ·Û.u.á~.¿...Ü¼î+*.â.Ä.F...±.F.¼ó. 000100
 76C51EDE 88D788EC 8855C85D C28C1FFA 88F388A4 F3C913A5 F3E90149 A4027400 .t.ÊÌÌŌµÊ.èµÊ.µ.*..ō]ìU.§.■.B.év 000120
 13A5F3E9 D149A402 7401A8C7 88067EC4 D1F7AEF2 FFFFB9C0 33C08ED8 8CFE880A ..±.Ä.ó3â¿..·Ü¼ìó-..ú´.t.ÊÌÌŌµÊ. 000140
 F2FFFFB9 C0330A7E C40676C5 1EDE88D7 88EC8855 CB50C28C 1FFA88F3 88A4F3C9 èµÊ.µ.*..ō]ìU.§.■.B.év.á~.3â¿..· 000160
 C033067E C40788EC 885500C8 50FA88F3 881FFFFF 10C01805 74A6F3F9 28D1F7AE Ü¼î+*µ!t..â.....µ.*]ù.U.§.■á-.3â 000180
 0E468DFA 568CF846 89EC468D 56570000 16C800C8 50FA8B91 49D1F7AE F2FFFFB9 ¿...Ü¼îÌ..*]ù.à...WV.Fš.F½.V*.F. 0001A0
 26078926 08578926 06478926 08568806 4688420A 47C626F8 5EC4FE56 8CFC4689 .F=.V±á^½&óG.B.F..V.&.G.&.W.&..& 0001C0
 C4F0880C C4830143 033E9A53 060A76FF 0C76FFFC 76FF167F FF0447C7 26025789 .W.&úG.....v=.v..v..S.>.C..ó..þá 0001E0

Dump of file SATURN:[PCCOMMON.DUMP.DLL]PRO.TMP;1 on 18-APR-1990 10:49:59.80
File ID (870,5,0)   End of file block 40 / Allocated 40

Virtual block number 9 (00000009), 512 (0200) bytes

 006A53FA 76FF900F EB058826 02478E26 07FF263F 8826C02A 1278044F FF26F85E ^½&.O.x.*â&.?&..&.G.&..Š. .v*Sj. 000000
 04C48301 710EA49A 0676FF08 76FF0000 04C8CBC9 5F5EC688 06C483FF FF01C89A .à....á..ó^_èùà....v..v..£ ¬..á. 000020
 885590C8 C999C028 03EB04C4 83011800 EE9A50FE 76FF0E74 D008FE56 89FC4689 .F=.V±.Ât..v±P.Ÿ....á.Š.+â.eu.U. 000040
 50F8468A 50F4468A 50F5468A 50F6468A 00840000 FFFF9A50 16F4468D 0CEC83EC š.š..F¶.P.....Ç..F-P.F%P.F¶P.F½P 000060
 02578926 065EC40A 7400087E 830CC483 015B0F28 9A5007BC 20FA468B 50F9468A .F*P.F*-¥.P.(.[..á..-..t.á^.&.W. 000080
 99085C20 C388FA46 89E42A08 478A2608 5EC45657 000008C8 00CB5DE5 88078926 &...Ì]ù.à...WVá^.&.G.*ō.F*.û-\.. 0000A0
 74400A47 F6260774 830A47F6 26F84689 145005E0 D1C103E0 D1C888F9 F7000CB9 ¿..%*.àìÁ.êìÁ.P..F½&-G..t.&-G.ət 0000C0
 26200A4F 80260E74 010A47F6 26085EC4 900128E9 FFFFB820 0A4F8026 085EC40F .á^.&.O. ¡..Ō+..á^.&-G..t.&.O. & 0000E0
 47F626FC 7689F08B 04478926 C028EF0A 67802602 0A4F8026 90E2E800 000447C7 úG...Šã.&.O..&.g.ÿ+â&.G..Þ.v=&-G 000100
 07750868 087E8137 75011450 87F60608 68F9F700 0CB99908 5C2DC388 4C750C0A ..uL.û-\..¿..%*kÄ.-.P..u7.-.h.u. 000120
 02C48302 E413AE9A FA76FF0F 75FFFF0A 7E811675 0874087E 810E7402 710A7E81 .-.q.t..~.t.u..~...u..v*.Û.ō..á. 000140
 99085C20 C38B1575 080A47F6 26085EC4 04C4830E C1E80876 FF0A76FF 0C75C008 .âu..v..v.Ōè..á.á^.&-G..u..û-\.. 000160
 57882606 47882606 77282637 8826085E 88677401 145087F6 06D868F9 F7000CB9 ¿..%*kÄ.-.P..tg.^.&.7&+w.&.G.&.W 000180
 76FF0677 FF265256 167EF608 04478926 4802458B F87E8802 57892607 89264008 .a&..&.W..-½.E.H&.G..--.VR&.w..v 0001A0
 9A53006A 006A026A 0F74201A 6187F6FA 5E8819EB FC468908 C4830302 12169AFA *......á..F=Š..^*-.a. t.j.j.j.S. 0001C0
 FF501606 46805600 018E17E8 07882606 468A065F C426085E C408C483 032511D8 Ä.%..á.á^.&á_..F.&..Š./..V.F..P. 0001E0
```

```
Dump of file SATURN:[PCCOMMON.DUMP.DLL]PRO.TMP;1 on 18-APR-1990 10:49:59.80
File ID (870,5,0)   End of file block 40 / Allocated 40

Virtual block number 10 (0000000A), 512 (0200) bytes

8855CBC9 5F5EE42A 06468AFE CCE90374 FC7639FC 468908C4 8301AE12 169AFA76 v*...Û..á..F=9v=t.Õät.F.*õ^_èÙU. 000000
1D9C1689 1D9AA310 56880E46 881DAC1E 8C1DAAA3 1D808802 7817669A 000AB8EC $¡...f.(.¡¯.È`...¯..F..V.È...... 000020
25F67E80 038DE900 001DA406 C700001D A606C71D 8216891D 80A30856 88064688 .F..V.È......ú.Ì...ú.È...Õ...—% 000040
A31D9EA3 1DA0A31D 88A31DA2 A31D86A3 1D8AA3C0 2800011D A806C703 08E90374 t.Õ..ú.´...+áÈ..È..ÈÀ.È..È..È..È 000060
301F1006 C70A46FF 49753001 7F80260A 5EC40020 1F1006C7 1D98A31D 7EA31D84 ..È~.È..ú... .á^.&...0uI.F.ú...0 000080
0E75203F 80269028 E800001D 9E06C71D 8A06FF00 752B3F80 260A5E88 903EE800 .$>..^.&.?+u.....ú.....$(.&.? u. 0000A0
9806FFC7 752D3F80 260A5EC4 0DEB1D7E 06FF9014 EB1D9E06 FF1A7500 1D8A3E83 .>...u.....Š....-.Š.á^.&.?-uú... 0000C0
AE681E0A 76FF0C76 FFDD75C0 0802C483 0978E80E 5098078A 260A5E88 0A46FF1D ..F..^.&...P.Òx..á..àuÌ.v..v..hÙ 0000E0
AEA3D8F7 1DAEA11D 9806FF0C 7D001DAE 3E830C56 890A4689 08C48308 C7E80E1D ..Òú..á..F..V..>Ù..).....ÀÙ.%ÄÈÙ 000100
06FF2D75 2E3F8026 0A5EC400 201F1006 C7067530 1F103E83 0074001D 983E831D ..>...t..>..0u.ú... .á^.&.?.u-.. 000120
7D001DA8 3E830C56 890A4689 08C48308 7BE80E1D A8681E0A 76FF060A 46FF1DA0 ...F...v..h´..Ò(..á..F..V..>´..) 000140
7400683D 4074004E 3D3D7400 46309807 8A260A5E C41DA00E FF00011D A806C70A .ú.´.......á^.&...=F.t==N.t@=h.t 000160
C40A46FF 03754C3F 80260A5E C4097500 1D883E83 00021D88 06C70675 006C3D28 +=l.u.ú......>...u.á^.&.?Lu..F.á 000180
1D8806C7 D0E80010 1D8806C7 D8EB0001 1D8806C7 90024EE9 1C75003F 80260A5E ^.&.?.u.ÕN..ú.....ŠÀú.....ŠÀú... 0001A0
46831D86 06FF0875 00583D05 7400473D 0A740045 3DF84689 98078A26 C8E80008 ..Šà&....F½=E.t.=G.t.=X.u......F 0001C0
7500253D 0152E903 7E013FE9 03750063 3D0191E9 037E7874 00693DF8 468820F8 ½ .F½=i.tx-.Õ..=c.u.Õ?.-.ÕR.=%.u 0001E0

Dump of file SATURN:[PCCOMMON.DUMP.DLL]PRO.TMP;1 on 18-APR-1990 10:49:59.80
File ID (870,5,0)   End of file block 40 / Allocated 40

Virtual block number 11 (0000000B), 512 (0200) bytes

0247C726 0789261D A4A11FC4 261D9A1E C4157502 1D883E83 900159E9 0140E903 .Õa.ÕY...>...u.á...&á.ÀÈ.&..&úG. 000000
0170E903 75001DA6 3E83041D 9A068307 89261DA4 A11FC426 1D9A1EC4 00EB0000 ..Š.á...&á.ÀÈ.&........>Ì..u.Õp. 000020
06FF01AC E9FFFF88 01AFE903 75200A47 F6261D80 1EC4018D E9037400 1DA43E83 .>È..t.Õ§.á...&-G. u.ÕÈ.|..Õ¯... 000040
1D8606FF 1D8406FF F2EB086A 90C3EB02 C483019E E80E0A6A 00001D7E 06C71DA2 À.ú.~...j..Ò...á.Šú.j.Š·........ 000060
1D88A3C0 2B7A7401 1D883E83 0081E903 75081D88 3E830004 1DA806C7 1DA006FF ....ú.´....>...u.Õ...>...tz+äÈ.. 000080
909013EB 00001DAE 06C70A74 001D983E 83FA4689 1DAEA12B 741DAE06 39FA4689 .F*9.Ù.t(ÀÙ..F*.>...t.ú.Ù...Š... 0000A0
6A02C483 0130E80E 106A021D 9A06831D AEA3C02B 027DC008 1DAEA105 1DAE2E83 ..Ù..ÀÙ..à).+âÈÙ......j..Ò0..á.j 0000C0
C0081DAE A300052D FA468815 74001D98 3E832274 00FA7E83 02C48304 8DE80E3A :.Ò...á..-*.t".>...t..F*-..ÈÙ..á 0000E0
068302C4 8300F1E8 0E106A04 1D9A2E83 00001DAE 06C79007 EB1DAEA3 C028027D ).+âÈÙ.Š..ú.Ù........j..Òþ..á... 000100
49E80EF8 76FFF4EB 016A90FF 39E9026E E80E006A 90FF3FE9 106AFF10 E9021D9A ...Õ..j.Õ?..j..Òn.Õ9..j.¹¶.v½.ÒI 000120
DA7E0067 30057C00 6530FF0C E9037500 643D90FF 21E90428 E80E256A FF2AE903 .Õ*.j%.Ò(.ÕI..=d.u.Õ..=e.¦ =g.-Õ 000140
903AEBFE 5689FC46 89400C56 880A4688 0A4EFF0C 56880A46 88097400 1D883E83 .>...t..F..V..N..F..V.@.F=.V±Š:. 000160
00753D8F 7400733D FEE0E903 7500703D FEE4E903 75006F3D FE80E903 75006E3D =n.u.Õ.±=o.u.ÕÕ±=p.u.ÕÀ±=s.t.=u. 000180
88078A26 FC5EC4FC 46FF9034 E80A46FF 90B1E8FF 79E90375 00783DFE 89E90375 u.Õ¿±=x.u.Õy.ŠŸ..F.Š4..F=á^=&... 0001A0
FC468806 C483044C E80E0A76 FF0C76FF 500A4628 C38BEC75 253C0474 C00AF646 F-.ât.<%uš.ü+F.P.v..v..ÒL..á..F= 0001C0
47F6261D 801EC4FC 63E90374 C00AF646 88078A26 0A5EC40C 56890A46 89FE5688 .V±.F..V.á^.&...F-.ât.Òc=á...&-G 0001E0

Dump of file SATURN:[PCCOMMON.DUMP.DLL]PRO.TMP;1 on 18-APR-1990 10:49:59.80
File ID (870,5,0)   End of file block 40 / Allocated 40

Virtual block number 12 (0000000C), 512 (0200) bytes

8300201F 1006C706 74001DA0 3E835657 000012C8 CBC91DA4 A1FE51E9 0374200A . t.ÕQ±ÀÈ.èùà...WV.>...t.ú... .. 000000
88260788 261D9A1E C4197510 1D883E83 0774021D 883E831D A206FF04 740A067E ~..t...À..>...t..>...u.á...&..&. 000020
46890788 261D9A1E C4117400 1DA23E83 902CE804 1D9A0683 FE5689FC 46890257 W..F=.V±.....Š,..>À..t.á...&...F 000040
001D7E3E 8302109A 0683FE56 89FC4689 99078826 1D9A1EC4 0EE80000 FE46C7FC =úF±..Š.á...&....F=.V±......>~.. 000060
89F24689 1DAC1688 1DAAA11F 0EA3C02B 9003E806 46880674 FE4608FC 46880E74 t..F=.F±t..F.Š..+âÈ..À¯...¯..F·. 000080
882D07C6 26F246FF F25EC41D 750A067E 832B7D00 FE7E8331 75001DA2 3E83F456 V¶.>À..u1.-±.)+.-..u.á^·.F·&6.-. 0000A0
880000F6 46C79006 EB0001F6 46C7FE56 89FC4689 DAF70002 8308F7FE 5688FC46 F=.V±¾Ä.®.¾Õ.F=.V±úF-..Š..úF-..¦ 0000C0
001DA03E 830AC483 082813A4 9AFC76FF FE76FF50 1E0676FF FA5E8CF8 46891D8C ...F½.^*.v..P.v±.v=.È.+..á..>... 0000E0
0E3E8300 7EC90BF0 4E89C828 1DA80E88 04C48303 4700869A F876FFFA 76FF4574 tE.v*.v½.Ñ.G..á...¨.+à.Nþ.è-..>. 000100
7E89F47F C00849C1 88473005 C62605E8 F27EC4F0 4E880000 1F0E06C7 0675081F ..u.ú......Nþá~·Š.&6.0G.êI.á.¶.- 000120
7C613C07 74C90804 88078A26 F85EC4F2 76C5EE5E 8C1D860E 88F04E89 F4468CF2 ·.F¶.Nþ.....^Ÿév·á^½&.....èt.<a| 000140
8AA11475 001DA23E 83EE5E8E F45E8CF2 7689E375 003F8026 F846FF46 202C8003 .., F.F½&.7.uÐ.v·.^¶.^Ÿ.>À..u.À. 000160
CBC95F5E 02C48302 FFE80E50 C02B02EB 00018805 7500F67E 8308741D 9E06081D .....t..—.u.¡..Š.+âP.Ò...á.^_èù 000180
1D9A0683 FA5689F8 4689109C 1688109A A10001BE 18740006 7E835657 000010C8 à...WV.~..t.ƒ..À.......F½.V*.... 0001A0
1EC410E8 FA5689F8 46890257 88260788 261D9A1E C4137408 1D883E83 008FE902 .Õ...>...t.á...&..&.W..F½.V*Š.á. 0001C0
FA4608F8 46880E74 081D883E 83041D9A 0683FA5E 8CF84689 FC468907 88261D9A ..&...F=.F½.^*......>...t..F½.F* 0001E0
```

```
Dump of file SATURN:[PCCOMMON.DUMP.DLL]PRO.TMP;1 on 18-APR-1990 10:49:59.80
File ID (870,5,0)   End of file block 40 / Allocated 40

Virtual block number 13 (0000000D), 512 (0200) bytes

F24689FA 568BF846 8BFA5E8C F8468903 5B880975 00FC7E83 900AEB03 54881575 u.¡T.Š...-•.U.¡[..F½.^•.F½.V•.F· 000000
3B461574 003F8026 F246FFF2 5EC4900E E81DA80E 881C741D A03639F6 2BF45689 .V¶+-96..t...´.Š..á^·.F·& ?.t.F; 000020
0875001D 983E83FE 2B1DAE3E 8BF37500 3F8026F2 46FFF25E C44690ED EB107ECE ö~.ŠÙ.Fá^·.F·&.?.ωµ.>Û.+±.´...U. 000040
E80E5708 74001D98 3E8306C4 830183E8 0EF876FF FA76FF56 02C48301 59E80E57 W.ÒY..á.V.v•.v½.Ò°..á..>.... W.Ò 000060
7467067E 83FE5689 FC46891D 9C16881D 9AA10000 06C890CB C95F5E02 C483013C <..á.^_èù.à...À.......F=.V±.~.gt 000080
7E800006 1DA806C7 0675001D A03E83FA 4688C02A 9003E801 B0057547 067E8306 ..~.Gu.¯.Š..*á.F•.>...u.ú.´....– 0000A0
1DAC36FF 0676FF1D A836FF1D 8636FF00 011DA806 C7067500 1DA83E83 007400FA •.t..>´..u.ú.´....6...6´..v..6¯. 0000C0
1D7E3E83 1B7400FA 7E800EC4 8307A01E FF261C9C 068EFC76 FFFE76FF 1DAA36FF .6´..v±.v•....&.....á..–•.t..>–. 0000E0
3E831B74 001D7E3E 8304C483 07A41EFF 261C9C06 8E1DAA36 FF1DAC36 FF147500 .u..6¯..6´.....&..Ê..á..>–..t..> 000100
06C7081D 9A068304 C48307AC 1EFF261C 9C068E1D AA36FF1D AC36FF14 75001DA8 ´..u..6¯..6¯.....&..¯..á......ú. 000120
0804C483 07801EFF 261C9C06 8EFC76FF FE76FF1B 741D9E06 0B1D8AA1 00001F0E ....À......t..v±.v•....&..¯..á.. 000140
1EC43C75 001DA63E 83560000 00C890CB C90129E8 0E50C02B 02EB0001 B80574C0 åt.¡..Š.+áP.Ò).èù.à...V.>Ī..u<á. 000160
1D8236FF 10EBE42A 04882602 478E2607 FF26378B 2606468A 1478044F FF261D80 ..&.0.x..F.&.7&..&.G.&..*ôŠ..6.. 000180
02C890CB C95E1DA4 06FF9005 EB1DA606 FF077540 06C4830B 0301C89A 0676FF53 S.v..à....á.∂u...Ī.Š....Ê.^èù.à. 0001A0
1F1036FF 1D8036FF 1D8236FF 1BEB507E F60B0676 8B577500 1DA63E83 56570000 ..WV.>Ī..ωW.v..--PŠ..6...6...6.. 0001C0
D478044F FF261D80 1EC41E7E C00B4EC6 8B1DA606 FF047540 06C4830B 6B01C89A .à.k..á.∂u...Ī..óN.á-.á...&.O.xå 0001E0

Dump of file SATURN:[PCCOMMON.DUMP.DLL]PRO.TMP;1 on 18-APR-1990 10:49:59.80
File ID (870,5,0)   End of file block 40 / Allocated 40

Virtual block number 14 (0000000E), 512 (0200) bytes

06010646 8B077500 1DA63E83 D4EBE42A 05882602 478E2607 FF263F8B 261F10A0 ...&.?&..&.G.&..*ôŠå.>Ī..u..F... 000000
1D8036FF 1D8236FF 22EB5E75 001DA63E 830A768B 56570000 02C8C8C9 5F5E1DA4 Ê.^ èùà...WV.v..>Ī..u^Š".6...6.. 000020
74C00B4E C6880646 FF1DA606 FF047540 06C4830B DD01C89A 5098078A 26065EC4 á^.Ī...P.à.Ī..á.∂u...Ī..F..óN.àt 000040
2602478E 2607FF26 3F8B261D 801EC407 8A26065E C4CD7804 4FFF261D 801EC425 %á...&.O.xëá^.&..á...&.?&..&.G.& 000060
1DAAA156 00000CC8 CBC95F5E 1DA40601 0A468807 75001DA6 3E83CAEB E42A0588 ..*ôŠò.>Ī..u..F...Ê.^_èùà...VÀ¯. 000080
83081600 B69AF476 FF521DAE 368BFA46 89FC4689 C02BF656 89F44689 1DAC1688 ..¯..F¶.V-+à.F=.F•.6Û¯R.v¶.Ã.... 0000A0
3E834E01 75081F0E 3E8308EB 02EE8305 75101F0E 3E830676 2BF02BF8 468904C4 á..F½+Þ+v..>...u..Ÿ.Š..>...u.N.> 0000C0
71E80E50 98078A26 F446FF12 75301F10 3E831975 2D3F8026 F45EC422 75001D98 ...u"á^¶&.?-u..>..0u..F¶&...P.Òq 0000E0
FF077400 067E8318 74001D98 3E83077E F60B0874 301F103E 83F84EFF 02C483FE ±.á..N½.>..0t..–-..>...t..~..t.. 000100
FE7EE80E 56297500 1D983E83 0070E80E FC46FF07 74001F0E 3E830066 E80EFA46 F•.Òf..>...t..F=.Òp..>...u)V.Ò-± 000120
047500FC 7E830A74 001F0E3E 830039E8 0E047500 FA7E830A 7400067E 8302C483 .á..~..t..~•.u..Ò9..>...t..–=.u. 000140
201F1006 C70E7400 1D983E83 06C483FE B5E80EF4 76FFF676 FFF876FF 0040E80E .Òa..v½.v-.v¶.Òç±.á..>...t.ú... 000160
FDD2E80E 50002088 03EB002B B8057400 1D8A3E83 CBC95E02 C483FE38 E80E5600 .V.Ò8±.á.^èù.>...t.¡+.Š.¡ .P.Ò@» 000180
03EB0058 B8057400 1D863E83 1775101F 0E3E8302 C483FDC8 E80E306A CB02C483 .á.ùj0.Òà».á..>...u..>...t.¡X.Š. 0001A0
12752A3F 80260A5E C40001FE 46C75657 000006C8 CB02C483 FDAAE80E 50007888 ¡x.P.Ò`».á.ùà...WVúF±..á^.&.?*u. 0001C0
FFFFFE46 C708752D 3F80260A 5EC49060 EB0A46FF 021D9A06 83378B26 1D9A1EC4 á...&.7......F.Š'.á^.&.?-u.úF±.. 0001E0

Dump of file SATURN:[PCCOMMON.DUMP.DLL]PRO.TMP;1 on 18-APR-1990 10:49:59.80
File ID (870,5,0)   End of file block 40 / Allocated 40

Virtual block number 15 (0000000F), 512 (0200) bytes

0675303C 0A751DA0 3639387F 393C3F7C 303CFA46 88078A26 0A5E8BF6 2B0A46FF .F.+-.^.&...F•<0|?<9.;96..u.<0u. 000000
83C803E1 D1CE0302 E1C1CE8B 98058A26 1B7F393D 802606EB FB8B0030 1F1006C7 ú...0..«Š.&.=9..&....öêÃ..öĪÃ.à. 000020
468B3789 26065EC4 F08BEEF7 FE468B0C 468C0A7E 89DF7030 3D802647 F18B30E9 ÕO.þG&.=0)Õ.–..F..F±¥Y.þá^.&.7.F 000040
264701EB FC7EC406 4E8AFE5E 8CFC4689 03628857 000004C8 CBC95F5E 0C56880A ..V.^ èùà...W¡b..F=.^±.N.á–•Š.G& 000060
C95FC02B FE468CFC 7E899009 EBFE468C FC7E8900 01B8F475 0D382611 74003D80 .=.t.Ī8.u¶¡...~•.F±Š...~•.F±+à è 000080
F9F799C7 8B460488 3004F9F7 000AB999 C78B047E 8806768B 56570000 00C890CB ù.à...WV.v..~..ú.¿..¥•.0..F.ú.%• 0000A0
D0880C47 8826065E C40368BE 56570000 08C80004 C2C95F5E C68B4614 8830C280 .ô0..F.6^ èõ..à...WVfh.á^.&.G..À 0000C0
1A818AD9 8BD08BF8 7E8BC92B FA4689C2 03E001D0 8B08478B 26F84689 C203E0D1 ĪÀ.ô.F¥&.Ğ..ÀĪÀ.ô.F•+è.-½.À.1... 0000E0
26065EC4 5605C683 FC4E89E6 7C03F983 46410444 88083087 8AD9030A 88048808 ....Ö.1..0..D.AF.•.|Ī.N=.6.Vá^.& 000100
E80277FF 26065EC4 5646F08B FF6EE804 77FF2606 5EC45646 F08BFF7C E80677FF .W.Ò|..þFVá^.&.W.Òn..þFVá^.&.W.Ò 000120
F9F70064 B9990A47 8B26065E C45646F0 8BFF53E8 37FF2606 5EC45646 F08BFF60 '..þFVá^.&.7ÒS..þFVá^.&.G..¿d.¥• 000140
DA8C0368 8BFF27E8 52F9F700 6489990A 478B2606 5EC456F0 8BFF3BE8 50001305 ...PÒ;..þVá^.&.G..¿d.¥•RÒ'.¡h..Ö 000160
89080E16 1B080C06 2B02578B 26078826 065EC40E CD158A9A 000008C8 CBC95F5E ^ èùà......ē.á^.&..&.W.+........ 000180
EB99C02B 0675D00B FE5689FC 468904C4 830EF213 D29A5016 FB468DFA 5689F846 F½.V•.F½.P.Ø.·..á..F=.V±.Àu.+à.Š 0001A0
0E10F846 812574C0 0B04C483 0F0C1664 9AFC76FF FE76FF37 74000810 3E839045 E..>...t7.v±.v•.d....á..àt%.F½.. 0001C0
00011047 C726FC5E C4FE5689 FC468904 C4830AC7 13D29A50 16F8468D 00FA5683 .V•..F½.P.Ø.Ú..á..F=.V±á^•&ÚG... 0001E0
```

```
Dump of file SATURN:[PCCOMMON.DUMP.DLL]PRO.TMP;1 on 18-APR-1990 10:49:59.80
File ID (870,5,0)   End of file block 40 / Allocated 40

Virtual block number 16 (00000010), 512 (0200) bytes

99F9F700 04B99903 44805180 68016A06 76885657 000020C8 CBC9FE56 88FC4688 .F•.V±èùà ..WV.v.j.h.Q.D..¿..¼ª. 000000
D20BF9F7 0004B999 C68807D2 8F8BE3D1 085E8BEC 5689EA46 890F7617 329A5052 RP.2.v..Fõ.Vš.^.ïD.«Ø..ó.¿..¼ª.Ø 000020
8BC8880E 1068006A 0F901732 9A505299 0E468B3C 6A006A47 017E0208 7E830775 u..~..~.Gj.j<.F..RP.2...j.h...à. 000040
0160DE69 0A4688C8 88518068 016A0F82 17329AE6 5E89E44E 89505299 DA880C46 F..Õ.RP.Nõ.^l.2.ý.j.h.Q.è.F.i8m. 000060
E65613E4 4603E256 13E04603 0FE51732 9AE25E89 E04E8950 5299DA88 C703C303 .ú.ú.Õ.RP.NÁ.^â.2.[..FÁ.Vâ.FÕ.V] 000080
89C7030A 468BEC5E 11EA4E01 12CED381 A600C181 DA13C803 99DA8810 4688C888 .à.F..Õ..à.Õ.ê.[.Æö..Nõ.^š.F..ú. 0000A0
46894808 468BF846 8950448D EC5611EA 4601080E 1688080C A1101615 8A9AFC46 F•.....Å.......Fõ.Vš.DP.F½.F.H.F 0000C0
810974C0 0B04C483 0EAB1664 9A5016EE 46801A74 0008103E 83F24689 0C4688F6 -.F..F·.>...t..FŸ.P.d.¨..á..ât.. 0000E0
580000FF FF9A5016 C48B50EC 8B55CBC9 5F5EEC56 8BEA4688 00EC5E83 0E10EA6E nõ...^š..Fõ.Vš^_èúU.šP.á.P.....X 000100
0001880F 45187A9A 0732E800 21E80000 FFFF9A03 82681E03 84681E1A 5AA3E086 .ÁÈZ..h...h.......Õl.Õ2..z.E.|.. 000120
0384068E FF330000 881E038A 16FF00FF 68106811 189A1058 10C49A50 C850E588 .[]üP.á.[....h.h.......£..3..... 000140
F2C03308 74CA88A6 F3C888D1 88078E8E 3174003D 80264701 75003080 267FFFB9 ¿..&.=.u.G&.=.t1/....l.üµl.õt.3à· 000160
E8AAC20A 0572412C AC9204E0 C00E7241 2CAC1A61 BF1FF788 071E061C E8E774AE ÙtÕŠ.....¼.«a.¯,Ar.âÁ..¯,Ar..ö¨Š 000180
9A5000FF 88079C1E FF047400 079E3E83 10601118 9A5000FC 88EC8855 00C31FED Ú.Ú.U.šj•.P...m..>....t.....|..P. 0001A0
401074C2 3BAD1CA6 8E06568B C08ED88E 02638857 56EC8855 C85DE588 10CE1118 ..ö..[]ùU.šVW¡c..Ä.â.V./[.Ú;õt.ä 0001C0
9A0676FF 57EC8855 0002CA5D E58B5E5F 96E8EBF7 88AEF2FF FFB9C033 970C7496 .t..3à¿..·Û.¼ŠŠ._^.[]ò..U.šW.v.. 0001E0

Dump of file SATURN:[PCCOMMON.DUMP.DLL]PRO.TMP;1 on 18-APR-1990 10:49:59.80
File ID (870,5,0)   End of file block 40 / Allocated 40

Virtual block number 17 (00000011), 512 (0200) bytes

1651521E 530002B8 C4885049 D1F7AEF2 FFFFB9C0 33FA8892 1F74C00B 10E210E8 Ò.ã..ât...ª3à¿..·Û¼ÏlP.áE..S.RQ. 000000
000CB999 085C2D04 46881C72 06FF0000 04C80002 CA5DE588 5F5B0000 FFFF9A50 P.....[_.[]ò..à.....r..F.-\..¿.. 000020
5EC402C4 8311221A 359A0200 68FE5E8C FC468914 5005E001 C103E0D1 C888F9F7 ¼ª.àÏÁ.ēÏÁ.P..F•.^±h...5."..á.á^ 000040
5EC49021 EB020002 47C726FC 5EC4080A 4F802611 74D00808 57892606 47892604 .&.G.&.W..Ât.&.O..á^•&úG...Šl.á^ 000060
5EC40001 0247C726 FC5EC408 57892606 47892640 FE5688FC 4688040A 4F802604 .&.O...F•.V±ã&.G.&.W.á^•&úG...á^ 000080
1E3B065E 8BEC8B55 C3C90000 0447C726 02578926 07892608 57882606 47882604 .&.G.&.W.&..&.W.&úG...èúU.š.^.;. 0000A0
51160C76 FF0876FF 0A76FF53 CC8804EC 8307F4E9 07E8E9C0 3300098A 08721A5F _.r.¤..3âÕÕ.Õ¶..š..äS.v..v..v..Q 0000C0
3B065E88 0CEC83EC 885500CB 5DE588FD 1A61A780 91E175C0 855A5900 00FFFF9A ¯.....Y2.âuÃ..Ïa.».[]ù.U.š.š..^.; 0000E0
16F4468D 51414151 51C93353 1274201A 6187F607 A7E9C033 00098A08 721A5F1E ._.r.¤..3âÕÏ.-.a. t.S3èQQAAQ.F¶. 000100
57FCFC46 89FE4689 C0330856 C50A468E FA5E8C66 74801A61 87F60000 12019A50 P¯.....-.a..tf.^ª.F.éV.3â.F±.F==W 000120
88D488E2 2B0080BA DC8802EC 833B75AE F20A8049 E30C4E88 F86689F2 88FA8856 V.ª.·.f½.N.DI¯.·Ûu;.š..É¤..+ã.å. 000140
1FE80375 FB3800B0 009AE900 2BE8F4E2 AA1A74FB 3B00740A 3CAC0C4E 880716FA ª...N.¯<.t.;«t.¯ã¶Õ+.Õ..¯.;«u.Õ. 000160
11791766 9AFFFCB8 7AE80093 E9FA5E8E 5F5EE1E8 0014E8E2 EBFC46FF 0AB0AA00 .`¯..F•Šãõ..ŠÃ^_.^ªÕ..Šz¡•..f.y. 000180
75C00800 0011429A 5016F446 8051521E 53065E88 1FE3CA2B CF881F06 1E515350 PSQ....ù+õD..^.Š.RQ.F¶.P.B....àu 0001A0
30007400 60301874 C00808C4 831FC3FA 88585859 1F07740B 08FE5E01 F45E8811 ..^¶.^±.Ût..Y{X.ªû..á..ât.=m.t.= 0001C0
880A5E8E 0E74401A 6187F6FE 5E8E26E8 F90020BA 03E8001C 8A087500 098A0001 ..¤..u.¤..Š.¤ .ªŠ&.^±-.a.ãt..^.. 0001E0

Dump of file SATURN:[PCCOMMON.DUMP.DLL]PRO.TMP;1 on 18-APR-1990 10:49:59.80
File ID (870,5,0)   End of file block 40 / Allocated 40

Virtual block number 18 (00000012), 512 (0200) bytes

FA5E8E5F 5EF86688 FC4628FE 468806E8 F9C03300 1C8A0EEB F803751A 3F80085E ^..?.u.½Š.¤..3âªŠ..F±+F•.f½^_.^ª 000000
16F4468D 51521E53 0856C51E EEEBC188 0475C908 0C4E8806 88E9CB5D E5880472 r..[]ùÕ...N..èu..êŠŸ.éV.S.RQ¯.F¶. 000020
BAC7E800 1C8ACC75 00098A00 01300074 00603017 74C0081F 071E0000 12099A50 P.\.......ât.=m.t.=..¤..uäö..Šú¤ 000040
33001C8A A6E80275 1A3F8026 DA880A74 401A6187 F68775C0 08F44688 C2E80020  .Šõ.F¶.âuñ-.a.ãt..Õ&.?.u.Šl¤..3 000060
F60C7C00 F883117D 1A5F1E38 065E88EC 88550896 E9008357 56EC8855 00A3E8C0 âŠÈ.U.švW".Õ..U.š.^.;._.}..«.|.- 000080
CE027F81 26065EC4 56570000 0EC800C8 5DE588C0 3302E800 01B80574 401A6187 .a.ãt.|..Š.3â.[]ù.à...W̃Vá^.&...ö 0000A0
9A37FF26 0277FF26 33806801 E1680194 E999C028 0673A600 3F812607 7C0F7F12 ...|.&.?.ls.+â.Õ..hÃ.h.3&.w.&.7. 0000C0
01E16814 3617329A 505299F0 88F9F700 04B99940 51806801 6A07F8A3 141B1CD0 Å...É½.j.h.Qã.¿..¼ª.Þ.RP.2.6.hÃ. 0000E0
4689F456 1BF2462B 14C1106C 9AF45689 F2468937 FF260277 FF26065E C4338068 h.3á^.&.w.&.7.F·.V¶.l.ê.+F·.V¶.F 000100
46810A75 D20BF9F7 0004B999 4007F8A1 01E1FC56 813380FA 468126EB FC5689FA ª.V=Š&.Fª.3.V=Ã.À½.ã.¿..¼ª.Øu..F 000120
F70004B9 9907F8A1 07B207F8 0681D47C 00FC7E83 07F80EFF 4E01FC56 835180FA ª.Q.V=.N..½..-=.|å..½.ý.À½..¿..¼ 000140
B80575D2 08F9F701 90B99907 F8A10D75 D20BF9F7 00648999 07F8A11F 75D20BF9 ª.Øu.À½..¿d.¼ª.Øu.À½..¿..¼ª.Øu.| 000160
D09AFA76 FFFC76FF 51806801 6A076C07 F82E81F8 5E8CF646 89070488 03E8078A ¤.Š.¡å..F-.^½..½.l.j.h.Q.v=.vª.Å 000180
FCA1F65E C4000107 F606C715 2A1CA89A 5016FA46 80518068 016A07FC A314D31C .Æ.È•.j.h.Q.Fª.P.´.*.ú.-...á^-À• 0001A0
FCA107F6 06FF02C7 83F27EC4 F45689F2 46890002 05C28CC3 8B1F7D02 47392607 .&9G.}..û.ô....F·.V¶á-·.ú...-.À• 0001C0
1068006A 07F4A301 2826F65E C4E7D107 F63E8807 F60EFF07 FCA1F17C 05392607 .&9.|þÀ•...-..>-.ïÕá^-&+.È¶.j.h. 0001E0
```

Dump of file SATURN:[PCCOMMON.DUMP.DLL]PRO.TMP;1 on 18-APR-1990 10:49:59.80
File ID (870,5,0)   End of file block 40 / Allocated 40

Virtual block number 19 (00000013), 512 (0200) bytes

```
006A154B 1CA89A50 16FA468D 0E106800 6A07F2A3 153C1CD0 9AFA76FF FC76FF0E ..v=.v'.Å.<.È·.j.h...F'.P.´.K.j. 000000
A312BE1D 6C9AFA76 FFFC76FF 3C6A006A 07F0A315 5D1CD09A FA76FFFC 76FF3C6A j<.v=.v'.Å.].Èþ.j.j<.v=.v'.l.ƒ.È 000020
0007FE06 C707FA16 89F9F700 07B99963 CA2DC603 07FC0603 016007F8 066907EE Ÿ.ï.½.m...=..ó-ðc.¿..¾'..'.ú.±.. 000040
1E560000 06C8CB1F 1206FF00 05E80E08 75001F12 3E83C8C9 5F5EDA8C 07EEB800 .¦Ÿ..Ö^_èù.>...u..Õ......ùà...V. 000060
75003F80 26FA5EC4 00A8E903 75D008FC 5689FA46 8904C483 15D31B82 9A080068 h...ý.Æ..á..F'.V=.Åu.Õ´.á^'&.?.u 000080
FA46830E 1068006A 0AC48315 EA1B489A 081236FF 081436FF 5006036A 009CE903 .Õ..j..P.6...6...H.õ..á.j.h...F' 0000A0
C4F62B08 0E168908 0CA31642 17329A50 5204C483 15F418AE 9AFA76FF FC76FF03 ..v=.v'.Ù.¶..á.RP.2.B.È......+-á 0000C0
83460675 2D388026 FA5E8809 75040253 87F6D888 98008A26 1C740038 8026FA5E ^'&.8.t.&....Ä-.S..u..^'&.8-u.F. 0000E0
9A081636 FF081836 FF5052C6 03C28CC3 88036A1D 74003880 26FA5EC4 DB7C03FE ±.|Úá^'&.8.t.j..û.ô.óRP.6...6... 000100
0810A340 C01B013F 80260816 1EC40007 C6260816 1EC49009 EB0AC483 14021B48 H....á.Š..á...&ó..á...&.?..ââÈ.. 000120
00ADE903 7E09087F 832600B7 E9037D03 087F8326 065EC456 000006C8 90CBC95E ^èù.à...Vá^.&....).Õñ.&....~.ÕÜ. 000140
26177E07 C2FE8107 6CC6810A 778B2600 81E9037D 09087F83 260A7E03 087F8326 &....-.&....).Õ..&.w..ól..±ô.~.& 000160
88E3D108 5F882606 5E88900E E8000705 07D4878B E3D1085F 8B261075 03087F83 ....u.&._.ïD..å....Š...^.&._.ïD. 000180
0004B999 01448D46 EE830A77 8B26065E C4FA46FF 03750003 C6F7FA46 89070687 .ø..F'¼ó..u..F'á^.&.w..ŸF.D..¿.. 0001A0
087F8326 FE4689C2 2BFA4688 F9F70007 89990004 05C10301 6DCE69FA 4603F9F7 ¼'.F'ïöm..ē....¿..¼'.F'+ö.F±&... 0001C0
3926FE46 88065EC4 9018EB00 01B8187C 02047F83 26227509 7F0E4739 26157503 .u.&9G...u"&....|.¡..Š..á^..F±&9 0001E0
```

Dump of file SATURN:[PCCOMMON.DUMP.DLL]PRO.TMP;1 on 18-APR-1990 10:49:59.80
File ID (870,5,0)   End of file block 40 / Allocated 40

Virtual block number 20 (00000014), 512 (0200) bytes

```
0A5E8BD8 0B0C5E8B 08468BEC 8B55CBC9 5EC02BE5 7C01047F 83260775 EE7C0E47 G.|Ÿu.&....|ſ+â^èùU.š.F..^..Ä.^. 000000
D103E3F7 064688C8 030C66F7 064688C8 8BE3F700 08CA5DE5 8BE3F706 46880875 u..F.¼D.ſ]ò..¼D.à.F.¼f..à.F.¼D.ſ 000020
33057540 0856A1CB 5152E38B 0572085A 1E3B0872 D82BDC8B 5A590008 CA5DE58B .ſ]ò..YZ.É+Är.;.Z.r..DRQùÀV.âu.3 000040
FFFF9A52 16501653 C48B5087 1A61A780 D48B5200 02B80856 2EFF5152 F8E0E9C0 âÕÅ½RQ..V.£..R.å.Ïa.ñP.áS.P.R... 000060
8C0E885A D4794B1A 618F0808 B1067500 023D0774 00013D40 81127558 C0080000 ...âXu.Ÿâ=..t.=..u.Ÿ...e.KyåZ... 000080
8A1EFF00 038BC28C 1C9206C4 01AEE903 731C8A1E FF0B33C2 8C1C8E06 C41EE31C .D.á....ò3Ü....s.ÕÜ.á....ôÉ..... 0000A0
07680E01 6A0B741C 9A3D1C96 B80073E8 1C96BF1C 96BE007C E81C96BF 1C96BE1C .ƒ..€..Ò|.ƒ..€..Òs.¡..=..t.j..h. 0000C0
00001802 9A006A00 6A036A00 51E81C9A BF1C968E D88E10EE B8C30000 FFFF9A18 ......ù¦Ÿ..Äƒ..€..ÒQ.j.j.j...... 0000E0
1C9ABF1C 9ABEEC8B 5503EB00 31E81C9A BF1C968E 003AE81F 14BF1F14 BEEC8B55 U.šƒ..€..Ò:.ƒ..€..Ò1.Š.U.šƒ..€.. 000100
02B807E3 1C8C0E8B 0000FFFF 9A500646 8A50C033 001AE81C 9ABF1C9A 8E0023E8 Ò#.ƒ..€..Ò..3âP.F.P.........D.É. 000120
56570000 14C800C3 EEEB1DFF F2740245 0B058B04 EF830E73 F73BC31C 8A1EFF00 .....ú;¼s..ÿ....E.t·..ŠŸú.à...WV 000140
6AF85689 F64689F2 5689F046 89C02B03 84168B00 F0E90375 03843639 FF2BF62B +-+.96..u.Õþ.....+â.Fþ.V·.F-.V½j 000160
8CE90376 7FFFFE81 461974C0 0B0AC483 18EE1B72 9A078E68 1EF676FF F876FF0C ..v½.v-.h...r.Ÿ..á..ât.F.±..v.Õ¥ 000180
26F65E8B F475003F 8026F646 FFF65EC4 0CEB47EA 75003F80 26F646FF F65EC400 .á^-.F-&.?.uōGŠ.á^-.F-&.?.u¶.^-& 0001A0
8319331A 359A56EE 5689EC46 8904C483 18FD1AF0 9A046A50 01458D8A 75003F80 .?.uo.E.Pj..þ.».á..FŠ.VŸV.5.3.. 0001C0
1C67A3EE 568BEC46 8B6674C2 0BFC4688 6D74EE46 0BEC4688 FE5689FC 468902C4 á..F=.V±.FŠ.FŸtm.F=.ôtf.FŠ.VŸÈg. 0001E0
```

Dump of file SATURN:[PCCOMMON.DUMP.DLL]PRO.TMP;1 on 18-APR-1990 10:49:59.80
File ID (870,5,0)   End of file block 40 / Allocated 40

Virtual block number 21 (00000015), 512 (0200) bytes

```
8BEC5EC4 2C74C008 0AC48315 A61B729A 078E681E F076FFF2 76FF0C6A 1C691689 ..i.j..v·.vþ.h...r.ſ..á..át,á^š. 000000
26FC46FF FC5EC407 8A26F046 FFF05EC4 04EC4683 02578926 078926FE 568BFC46 F=.V±&..&.W..FŠ.á^þ.Fþ&..á^=.F=& 000020
C95F5EA7 75003F80 26F05EC4 F475003F 8026F046 FFF05EC4 E8EB0E74 C00A0788 ...ât.ŠÒá^þ.Fþ&.?.u¶á^þ&.?.uÏ^_è 000040
160C080B 070A0C09 0C080C07 09060005 18040203 02021601 F6DCE900 02B890CB ù.¦..ÕÉ-......................... 000060
09721C70 2060006C 08590057 00530052 02430D41 02350212 12110010 120F1600 ..........S.A.C.R.S.W.Y.l.m p.r. 000080
8B99FFFF 8B1A5616 891A5DA3 16080000 080702CE 08A40084 09820A81 0A801606 ..........Ê.ö.■.....È]...V.¦.... 0000A0
1674073A 2E1B75E4 0A0024B9 1988B81A 5DA3CB5D E58B99FF FFB80008 E8CB5DE5 ſ]ùÒ..¦....ſ]ùÈ].£..¿$..ðu..:.t. 0000C0
00C31A56 A3980147 8A2E4301 76CA3C04 72BC3C43 0A76243C 0472133C F7E24343 CCã¾<.r.<$v.C<¥r.<ðv.C..G..ÈV.ũ. 0000E0
06468B57 5602EC83 EC8B55CB 50E58B01 FE4F8026 0574C308 C08C065E C4EC8B55 U.šá^..å.ût.&.O±..ſ]ùU.£.£.VW.F. 000100
78E80574 0018E815 750082E8 1C7EA312 740025E8 0875001C 7E3E831E 73FFF13D =þ.s..>~..u.Ò%.t.È-.Ò..u.Ò..t.Òx 000120
43065E8B 0776065E 3900F0BB CB5DE58B 5E5F02C4 8318AE1E 609A0676 FF0B7500 .u..v..'.Û..á._^.ſ]ùÉþ.9^.v..^.C 000140
8B3874FF FA8308C4 831A6920 0C9A5002 B0510E4F 8050501E C033FE5E 89FEE383 .D±.^±3å.PP.O.Q‾.P.. ï..á..'.tß. 000160
0C47894B 480008A3 C033D88E FE5E8800 08A3DABE 0574D208 1C82A31C 801687C2 ô....È...Øt..ÒÈ...^±.Ä3âÈ..HH.G. 000180
064E88C0 8ED88CC3 1FD88C00 06A30000 05000AA3 01478000 02A30000 A3000AB8 ¦..È..È...G.È.....È...Ä.ũ.Ä.å.N. 0001A0
9A0676FF 006A0876 FF006A56 00000AC8 C3D98EC1 8CD20B03 C0E81C82 1E8EDB33 3Ü....Òä..Ø.ė.\ûà...Vj..v.j..v.. 0001C0
831B361A 359A56F8 768B902F EB99C02B 0674FFFF C2F7FA56 89F84689 1B1D1732 2....F½.V'¾ò..t.+á.Š/..v½V.5.6.. 0001E0
```

Dump of file SATURN:[PCCOMMON.DUMP.DLL]PRO.TMP;1 on 18-APR-1990 10:49:59.80
File ID (870,5,0) End of file block 40 / Allocated 40

Virtual block number 22 (00000016), 512 (0200) bytes

```
46889007 E808C483 1A952118 9A50FE76 FF006A56 1274D00B FE5689FC 468902C4 á..F•.V±.Ät.Vj..v±P..!...á.Š...F 000000
0374C00A AC0CE30E 4E88DF8B 0A76C506 7EC41E56 57EC8855 90CBC95E FE5688FC •.V±^èù.U.šWV.á-.év..Ô.N.D.¯.ât. 000020
C4D98827 E30E4E88 1E5657EC 8B55C850 E5885F5E 1FC28CC3 88AAF3C0 32F8E2AA ¯ã½2âµ´.û.ô.^_.Î]ùU.šWV..N.D'.1á 000040
04740477 FF453A26 C933FF44 8AA6F30A 76C5FE8B CB0309F7 AEF2C033 F788067E -..%3à·Ú¼).ù.±év.µÎ.D.3è&:E.w.t. 000060
46891C69 168B1C67 A1560000 06C80005 11E900CB 5DE5885F 5E1FC188 D1F74949 ||%1.ë.^_.Î]ù.Õ...à...VÀg...i..F 000080
F08804C4 831BFE00 B69A0676 FF0876FF 6E740846 08064688 7674C208 FC5689FA •.V•.ötv.F..F.tn.v..v..Ñ.±..á..Þ 0000A0
1C270086 9A37FF26 0277FF26 4A740247 08260788 26FA5EC4 04FA4683 909006E8 Š....F•.á^•&..&.G.tJ&.w.&.7.Ñ.'. 0000C0
77FF26FA 5EC40676 FF0876FF 56017530 3880261F C426FA5E C4DD7EC6 3B04C483 .á.;ó~Ïá^•&á.&.8=uîV.v..v.á^•&.w 0000E0
C0289004 E8C28C01 408D1FC4 26FA5EC4 8475C00B 0AC4831B 021B729A 37FF2602 .&.7.r....á..âuÇá^•&á..ə..ôŠ..+â 000100
080E750A F9831374 C00A93FC 071E570A 7EC51E08 56880646 880E4E88 CBC95E99 .^èù.N..F..V..é~.W..•..ât..•.u.. 000120
30040387 92F1F793 F1F70274 C00BD233 92F788DA F700D283 08F7AA2D B00A79D2 Øy.¯-¯%Ù.Ø.%Ö.%.30.ât.¼þ.¼þ..Æ.0 000140
58DA8CF2 72C73B01 448DFF44 880586AC 4F0588E2 75C308C2 88AA2704 0276393C <9v..'¯.ô.ùuã..O¯...D..D.;úr·.ÖX 000160
18D91D6C 9A37FF26 0277FF26 0A76FF0C 76FF065E C4EC8855 00CB5DE5 885E5F1F ._^.Î]ù.U.Šá^..v..v.&.w.&.7.(.\. 000180
471170C0 08084688 FF335356 57EC8855 0008CA5D E5880789 26025789 26065EC4 á¯.&.W.&...Î]ò..U.šWVS3..F..à).G 0001A0
1DDAF7D8 F70A5688 471170C0 080C4688 06568908 46890000 1DDAF7D8 F7065688 .V.%Á%Ö....F..V..F..ä).G.V.%Á%Ö. 0001C0
E8D38BF1 F7064688 D888F1F7 D2330846 880A4E88 1575C008 0A56890C 46890000 ...F..V..âu..N..F.30¼þ.Á.F.¼þ.ÆŠ 0001E0
```

Dump of file SATURN:[PCCOMMON.DUMP.DLL]PRO.TMP;1 on 18-APR-1990 10:49:59.80
File ID (870,5,0) End of file block 40 / Allocated 40

Virtual block number 23 (00000017), 512 (0200) bytes

```
910C66F7 F088F1F7 F4750808 D8D1EAD1 D9D1E8D1 06468808 56880A4E 88088838 8.Ä.N..V..F.ìŠìlìõìÄ.Ùu¶¼þ.Þ¼f.. 000000
D8F7DAF7 07754F96 D2334E01 76064638 06720777 0856380C 72D103E6 F70A4688 .F.%Ì.Ìr.;V.w.r.;F.v.N30.Ou.%Ö%Ä 000020
D8F70656 88471170 C0080846 88FF3357 53EC8855 0008CA5D E5885F5E 58000A83 .Ö.[^_.Î]ò..U.šSW3..F..à).G.V.%Ä 000040
890C4689 00001DDA F7D8F70A 56881070 C0080C46 88065689 08468900 001DDAF7 %Ö....F..V..F..â)..V.%Á%Ö....F.. 000060
D88848E8 43794FD2 33C288F1 F7064688 F1F70233 0846880A 4E881875 C0080A56 V..âu..N..F.30¼þ.F.¼þ.ó30ØyCŠH.Ä 000080
0A66F791 0C66F7C8 88F1F7F4 75D808D8 D1EAD1D9 D1E8D106 46880856 880A4E88 .N..V..F.ìŠìlìõìÄ.Ùu¶¼þ.à¼f..¼f. 0000A0
F707794F 08561806 46280C56 180A4628 06760646 38087207 7708563B 0C72D103 .ìr.;V.w.r.;F.v.+F..V.+F..V.Oy.¼ 0000C0
1CE8F628 FC5E8CFA 4689085C 88560000 06C80008 CA5DE588 585F000A 8308F70A Ö¼Ä.Ö._[.Î]ò..à...V¦\..F•.^•+-Š. 0000E0
881A4AA1 0CFA4683 46017440 04C4831C BE21609A 53060E74 830A47F6 26FA5EC4 á^•&-G..t..S.'ì/..á.ət.F.F•.ÀJ.. 000100
C850E588 01FE4F80 04740808 065E88EC 885590C8 C95EC688 D876FA46 391A4C16 .L.9F•vÄ.ó^èù.U.š.^..Ùt..O±..Î]ù 000120
A3FE2440 24E899C0 33057501 76E80005 88071E29 75003F83 1C748857 56EC8855 U.šVW£t..?.u)..|..Òv.U.3á.Š$ə$±È 000140
0009E8C0 8ED88C06 4E881C7A 3689FFFE FE44C704 C6830001 04C7961C 76A31C74 t.Èv..ú....ó.úD±±..óz..N..Ä.áÒ.. 000160
48437401 A8FE88AD FC02778B F273EEF9 83FEE180 FA744100 D0E9CB5D E5885E5F _^.Î]ùÔÄ.At•.Ä±.•Ys·.w.•Ù.±´.tCH 000180
89F9030C 74FE88E6 E8FE4489 F7880002 05C20335 7401A8AD F0030088 1573C138 ;ês..Ä.ÞÙ´.t5.ö....%.D±ŠÎ.±t..•. 0001A0
7F891C82 1E8C2605 74D13818 08890A8C C688FE4C FEF90305 E8058948 C128FE4C L±+éH..Š..•±L±.ó.Ö¿..;Ìt.&...... 0001C0
03D0888C 73C13848 FE88F274 01A8ADF0 03FE8825 74FFFE3D 021C8606 C626C302 .ú&ó....=±.t%.±.ÞÙ´.t·.±H;ès¥.Ä. 0001E0
```

Dump of file SATURN:[PCCOMMON.DUMP.DLL]PRO.TMP;1 on 18-APR-1990 10:49:59.80
File ID (870,5,0) End of file block 40 / Allocated 40

Virtual block number 24 (00000018), 512 (0200) bytes

```
0EFE2615 E8D88E04 74C00808 4788E6E8 FE4489F7 88000205 C203E274 01A8ADF0 ÞÙ´.tã.ó....%.D±ŠÎ.G..ât..ÄŠ.&±. 000000
C638006B E8C03306 778888E8 3788C7E 1E8E2605 74C73B1E F3BFD88C 12741C86 ..t..Äɇµ.;út.&..-..7ŠE.w.3âÒk.;ó 000020
C13B1F47 89D88C98 E84E4E96 0574001D E8FE4DFE 0D74005F E8984040 01240074 t.$.əə.Ò_.t.±M±Ò..t..NNŠ..Ä¿G.;è 000040
267FFFBA 414149C8 28037401 A8FE4588 51C399C0 33024789 07881C82 A3260474 t.&È....¯G.3á.ûQ.E±´.t.^àlAAɒ..& 000060
F7087500 0CE8C628 C223D2F7 0D72C203 1572C603 C18BF575 EAD10476 1C84163B ;...v.Ìõu¥.ë.ór..ôr.%Ø#¿ 5Ò..u.% 000080
88067789 FFFEFE44 C7F203F0 88FE8857 1874001D E85152C3 59C033E5 75EAD1D2 ØÌõuÌ3âYÙRQÒ..t.W.±.Þ.·úC.´ .w.. 0000A0
C4831E2F 200C9A1F 06500001 88505252 1ED23350 53C35A59 58FE5589 4AD72BD6 ø+•J.U±XYZÙSP3Ø.RRP|..P.... /..á 0000C0
46880856 88038C8F 3875000A 7E830657 56EC8855 C3D20802 74585A1F FFFA8308 ..•..Z[t..ØùU.šVW..~..uB¢...V..F 0000E0
003EE856 0E468902 44880074 F73B1174 48078C36 884CEB27 720057E8 07754806 .Hu.ÒW.r'ŠL.ó..Ht.;%t..D..F.VÒ>. 000100
9A50C033 501652C4 885021E8 99FFFF88 0675D208 0473078C FE8104C6 8334735E ^s4.ó..±..s..Øu.|...ŠIP.áR.P3âP. 000120
4E88CB5D E5885E5F 07C03303 88078C36 89025C89 1489E675 C085F958 0000FFFF ....[•.âu]...\..ó...Æ3á._^.Î]ù.N 000140
F73BC18E D3882672 1C030A88 2CE8F9F2 75078CFE 8104C683 0C74024C 39F7880E ..%9L.t..ó..±..u·•Š,.Ö..r&.Æ.ë;% 000160
D1880487 92038616 890475F7 380E75C0 850000FF FF9A5153 13730386 1E390675 u.9...s.SQ......âuB;%u.........Ì 000180
283C0474 203C50F7 74093CFB 74203CAC D83399C0 330676C5 1E5657EC 885500C3 û.U.šWV.év.3á.3Ù¯< t«<.t¼P<-t.<+ 0001A0
03071309 03D2D1E3 D1D2D1E3 D1FA88C8 880201E3 D1187230 2C1F7739 3CAC0175 u.¯<9w.,0r.ÌDÌØ.ù.•ÌDÌØìDÌØ.).ə. 0001C0
38E30C4E 88EC8855 CB5D5F5E 1FDAF700 D28308F7 0775932D 3C580CEB 00D28308 Ä.Ø.ŠÉX<-.u.%Ä.Ø.%Ö.^_]ùU.Š.N.D8 0001E0
```

```
Dump of file SATURN:[PCCOMMON.DUMP.DLL]PRO.TMP;1 on 18-APR-1990 10:49:59.80
File ID (870,5,0)   End of file block 40 / Allocated 40

Virtual block number 25 (00000019), 512 (0200) bytes

13ABF3E9 D1E08A0A 4688D128 D187D103 D323D818 D1280C74 DAF7D788 067EC457 Wá~..m¼Öt.+1.Ü#Æ.1.1+1.F..ÀïÕµ¨. 000000
CB5D0856 88064688 5FAAF3C9 13ABF3E9 D1C38EFF FFC381C3 8C10E3D1 87AAF3C9 èµ`.iD..ú.ú...úiÕµ¨.èµ`_.F..V.]ù 000020
085C2DC3 8B157508 0A47F626 5575023C 03240A47 8A26065E C4F62B56 000004C8 à...V+-ó^.&.G.$.<.uU&-G..u..ù-\. 000040
7EC00BFC 46890647 2B260788 26065E88 39740114 5087F606 D868F9F7 000C8999 .¿..%*kÁ.-.P..t9.^.&..&+G..F•.á~ 000060
5EC40B74 FC463B08 C4831FFC 12169A50 E42A0B47 8A260677 FF260877 FF265028 (P&.w.&.w.&.G.*õP...•..á.;F•t.á^ 000080
000447C7 26025789 26078926 08578826 06478826 065EC4FF FFBE200A 4F802606 .&.O. ƒ..á^.&.G.&.W.&..&.W.&úG.. 0000A0
00000004 21B40002 00070001 181C0103 00050001 18540103 000DCBC9 5EC68800 ..ó^èù....T...............Çl.... 0000C0
00210001 018A0103 00880001 21480105 01600007 13620203 00000006 1F7C0002 ..|.......b...'...Kl..........!. 0000E0
00400001 179E0103 003A0001 12420103 00260001 20A80103 00220001 20600103 ..   ..*...¨ ..&...B...:.......M. 000100
542D6E75 5220534D 00000000 00000000 005C0001 10380103 00580001 104E0103 ..N...[...;...\.........MS Run-T 000120
38383931 20296328 20746867 69727970 6F43202D 20797261 7262694C 20656D69 ime Library - Copyright (c) 1988 000140
6C69666F 72702074 6E657272 75430011 70726F43 2074666F 736F7263 694D202C , Microsoft Corp..Current profil 000160
61732074 6F6E2073 6920656C 69666F72 7020746E 65727275 430A0A73 25203A65 e: %s..Current profile is not sa 000180
79272074 63656C65 73206576 61732064 6E61206E 65706F20 6F542020 2E646576 ved.  To open and save select 'y 0001A0
6E612065 6C69666F 72702072 6568746F 6E61206E 65706F20 6F542020 2E277365 es'.  To open another profile an 0001C0
6C655300 2E276F6E 27207463 656C6573 20736567 6E616863 2065736F 6F6C2064 d loose changes select 'no'..Sel 0001E0

Dump of file SATURN:[PCCOMMON.DUMP.DLL]PRO.TMP;1 on 18-APR-1990 10:49:59.80
File ID (870,5,0)   End of file block 40 / Allocated 40

Virtual block number 26 (0000001A), 512 (0200) bytes

20726573 75207463 656C6553 00454C49 464F5250 00656C69 666F7270 20746365 ect profile.PROFILE.Select user  000000
6F727020 7265746E 69727020 7463656C 65530052 55502E2A 00656C69 666F7270 profile.*.PUR.Select printer pro 000020
206C6564 6F6D2073 7365636F 72702074 63656C65 53005250 502E2A00 656C6966 file.*.PPR.Select process model  000040
206C6564 6F6D2061 74616420 7463656C 6553004D 50502E2A 00656C69 666F7270 profile.*.PPM.Select data model  000060
656C6966 6F727020 32424420 7463656C 6553004D 44502E2A 00656C69 666F7270 profile.*.PDM.Select DB2 profile 000080
53005255 502E2A00 656C6966 6F727020 72657375 20657661 53003244 502E2A00 .*.PD2.Save user profile.*.PUR.S 0000A0
70206576 61530052 50502E2A 00656C69 666F7270 20726574 6E697270 20657661 ave printer profile.*.PPR.Save p 0000C0
20657661 53004D50 502E2A00 656C6966 6F727020 6C65646F 6D207373 65636F72 rocess model profile.*.PPM.Save  0000E0
42442065 76615300 4D44502E 2A00656C 69666F72 70206C65 646F6D20 61746164 data model profile.*.PDM.Save DB 000100
65737520 65766153 00454C49 464F5250 00324450 2E2A0065 6C69666F 72702032 2 profile.*.PD2.PROFILE.Save use 000120
69617661 20746579 20746F6E 20706C65 4800706C 65480065 6C69666F 72702072 r profile.Help.Help not yet avai 000140
6C62616C 69617661 20746579 20746F6E 20706C65 4800706C 65480065 6C62616C lable.Help.Help not yet availabl 000160
20202020 20202020 20202020 20202028 28282828 20202020 20202020 20000065 e..          (((((                000180
10101084 84848484 84848484 84101010 10101010 10101010 10101010 48202020    H............................ 0001A0
10100101 01010101 01010101 01010101 01010101 01018181 81818181 10101010 ................................ 0001C0
10100202 02020202 02020202 02020202 02020202 02028282 82828282 10101010 ................................ 0001E0

Dump of file SATURN:[PCCOMMON.DUMP.DLL]PRO.TMP;1 on 18-APR-1990 10:49:59.80
File ID (870,5,0)   End of file block 40 / Allocated 40

Virtual block number 27 (0000001B), 512 (0200) bytes

00000000 00000000 00000000 00000000 00000000 00000000 00000000 00201010 .. .............................. 000000
00000000 00000000 00000000 00000000 00000000 00000000 00000000 00000000 ................................ 000020
00000000 00000000 00000000 00000000 00000000 00000000 00000000 00000000 ................................ 000040
00000000 00000000 00000000 00000000 00000000 00000000 00000000 00000000 ................................ 000060
206E614A 20657554 00002320 2D280029 6C6C756E 2800296C 6C756E28 00000000 ....(null).(null).+- #..Tue Jan  000080
1C9C1F20 18371F20 1F200000 0000000A 30373931 2030303A 30303A30 30203130 01 00:00:00 1970...... . .7. ... 0000A0
00000000 00000000 00000000 00000000 00000000 00000000 00000000 00000000 ................................ 0000C0
00000000 00000000 00000000 00000000 00000000 00000000 00000000 00000000 ................................ 0000E0
00000000 00000000 00000000 00000000 00000000 00000000 00000000 00000000 ................................ 000100
00000000 00000000 00000000 00000000 00000000 00000000 00000000 00000000 ................................ 000120
00000000 00000000 00000000 00000000 00000000 00000000 00000000 00000000 ................................ 000140
00000000 00000000 00000000 00000000 00000000 00000000 00000000 00000000 ................................ 000160
00000000 00000000 00000000 00000000 00000000 00000000 00000000 00000000 ................................ 000180
00000000 00000000 00000000 00000000 00000000 00000000 00000000 00000000 ................................ 0001A0
00000000 00000000 00000000 00000000 00000000 00000000 00000000 00000000 ................................ 0001C0
00000000 00000000 00000000 00000000 00000000 00000000 00000000 00000000 ................................ 0001E0
```

```
Dump of file SATURN:[PCCOMMON.DUMP.DLL]PRO.TMP;1 on 18-APR-1990 10:49:59.80
File ID (870,5,0)    End of file block 40 / Allocated 40

Virtual block number 28 (0000001C), 512 (0200) bytes

00000000 00000000 00000000 00000000 00000000 00000000 00000000 00000000 ................................ 000000
00000000 00000000 00000000 00000000 00000000 00000000 00000000 00000000 ................................ 000020
00000000 00000000 00000000 00000000 00000000 00000000 00000000 00000000 ................................ 000040
00000000 00000000 00000000 00000000 00000000 00000000 00000000 00000000 ................................ 000060
00000000 00000000 00000000 00000000 00000000 00000000 00000000 00000000 ................................ 000080
00000000 00000000 00000000 00000000 00000000 00000000 00000000 00000000 ................................ 0000A0
00000000 00000000 00000000 00000000 00000000 00000000 00000000 00000000 ................................ 0000C0
00000000 00000000 00000000 00000000 00000000 00000000 00000000 00000000 .......................... ...... 0000E0
00000000 00000000 00000000 00000000 00000000 00000000 00000000 00000000 .......................... ...... 000100
00000000 00000000 00000000 00000000 00000000 00000000 00000000 00000000 ............................ .... 000120
00000000 00000000 00000000 00000000 00000000 00000000 00000000 00000000 ................................ 000140
00000000 00000000 00000000 00000000 00000000 00000000 00000000 00000000 ................................ 000160
00000000 00000000 00000000 00000000 00000000 00000000 00000000 00000000 ................................ 000180
00000000 00000000 00000000 00000000 00000000 00000000 00000000 00000000 ................................ 0001A0
00000000 00000000 00000000 00000000 00000000 00000000 00000000 00000000 ................................ 0001C0
00000000 00000000 00000000 00000000 00000000 00000000 00000000 00000000 ................................ 0001E0

Dump of file SATURN:[PCCOMMON.DUMP.DLL]PRO.TMP;1 on 18-APR-1990 10:49:59.80
File ID (870,5,0)    End of file block 40 / Allocated 40

Virtual block number 29 (0000001D), 512 (0200) bytes

00000000 00000000 00000000 00000000 00000000 00000000 00000000 00000000 ................................ 000000
00000000 00000000 00000000 00000000 00000000 00000000 00000000 00000000 ................................ 000020
00000000 00000000 00000000 00000000 00000000 00000000 00000000 00000000 ................................ 000040
00000000 00000000 00000000 00000000 00000000 00000000 00000000 00000000 ................................ 000060
00000000 00000000 00000000 00000000 00000000 00000000 00000000 00000000 ................................ 000080
435F038C 00000000 00000000 00000000 00000000 00000000 00000000 00000000 ..............................C 0000A0
07AA1982 07A61982 07A21982 FFFF1982 00000000 00304F46 4E495F45 4C49465F _FILE_INFO=...........Å...Ì...". 0000C0
01300111 00F30004 00850097 0078005A 0038001E FFFF0101 00000000 07AE1982 ..Ù...........;.Z.x...ç.å.µ...0. 0000E0
0000016C 0140012F 011000F2 00030084 00960077 0059003A 001EFFFF 0160014E N.m.....:.Y.w...Ç.Æ.·.../.M.l... 000100
00004650 00544445 00545345 00005A54 00000000 00000000 00000000 00000000 ................TZ..EST.EDT.PF.. 000120
00746153 69724675 68546465 57657554 6E6F406E 7553038E 08080818 08040001 ..........SunMonTueWedThuFriSat. 000140
6F4E7463 4F706553 6775416C 754A6E75 4A79614D 72704172 61406265 466E614A JanFebMarAprMayJunJulAugSepOctNo 000160
00000000 00000000 00011C9A 00000000 08640000 0200FFFF FFFF0080 63654476 vDec..........d................. 000180
00000000 00000000 00000000 00000000 02020000 00000000 00000000 01020000 ................................ 0001A0
00000000 00000000 00000000 00000000 00000000 00000000 00000000 00000000 ................................ 0001C0
00000000 00000000 00000000 00000000 00000000 00000000 00000000 00000000 ................................ 0001E0

Dump of file SATURN:[PCCOMMON.DUMP.DLL]PRO.TMP;1 on 18-APR-1990 10:49:59.80
File ID (870,5,0)    End of file block 40 / Allocated 40

Virtual block number 30 (0000001E), 512 (0200) bytes

00000000 00000000 00000000 00000000 00000000 00000000 00000000 00000000 ................................ 000000
00000000 00000000 00000000 00000000 00000000 00000000 00000000 00000000 ................................ 000020
00000000 00000000 00000000 00000000 00000000 00000000 00000000 00000000 ................................ 000040
00000000 00000000 00000000 00000000 00000000 00000000 00000000 00000000 ................................ 000060
00000000 00000000 00000000 00000000 00000000 00000000 00000000 00000000 ................................ 000080
00000000 00000000 00000000 00000000 00000000 00000000 00000000 00000000 ................................ 0000A0
00000000 00000000 00000000 00000000 00000000 00000000 00000000 00000000 ................................ 0000C0
00000000 00000000 00000000 00000000 00000000 00000000 00000000 00000000 ................................ 0000E0
00000000 00000000 00000000 00000000 00000000 00000000 00000000 00000000 ................................ 000100
00000000 00000000 00000000 00000000 00000000 00000000 00000000 00000000 ................................ 000120
00000000 00000000 00000000 00000000 00000000 00000000 00000000 00000000 ................................ 000140
00000000 00000000 00000000 00000000 00000000 00000000 00000000 00000000 ................................ 000160
00000000 00000000 00000000 00000000 00000000 00000000 00000000 00000000 ................................ 000180
00000000 00000000 00000000 00000000 00000000 00000000 00000000 00000000 ................................ 0001A0
00000000 00000000 00000000 00000000 00000000 00000000 00000000 00000000 ................................ 0001C0
00000000 00000000 00000000 00000000 00000000 00000000 00000000 00000000 ................................ 0001E0
```

```
Dump of file SATURN:[PCCOMMON.DUMP.DLL]PRO.TMP;1 on 18-APR-1990 10:49:59.80
File ID (870,5,0)   End of file block 40 / Allocated 40

Virtual block number 31 (0000001F), 512 (0200) bytes

00000000 00000000 00000000 00000000 00000000 00000000 00000000 00000000 ................................ 000000
00000000 00000000 00000000 00000000 00000000 00000000 00000000 00000000 ................................ 000020
00000000 00000000 00000000 00000000 00000000 00000000 00000000 00000000 ................................ 000040
00000000 00000000 00000000 00000000 00000000 00000000 00000000 00000000 ................................ 000060
00000000 00000000 00000000 00000000 00000000 00000000 00000000 00000000 ................................ 000080
00000000 00000000 00000000 00000000 00000000 00000000 00000000 00000000 ................................ 0000A0
00000000 00000000 00000000 00000000 00000000 00000000 00000000 00000000 ................................ 0000C0
00000000 00000000 00000000 00000000 00000000 00000000 00000000 00000000 ................................ 0000E0
00000000 00000000 00000000 00000000 00000000 00000000 00000000 00000000 ................................ 000100
00000000 00000000 00000000 00000000 00000000 00000000 00000000 00000000 ................................ 000120
00000000 00000000 00000000 00000000 00000000 00000000 00000000 00000000 ................................ 000140
00000000 00000000 00000000 00000000 00000000 00000000 00000000 00000000 ................................ 000160
00000000 00000000 00000000 00000000 00000000 00000000 00000000 00000000 ................................ 000180
00000000 00000000 00000000 00000000 00000000 00000000 00000000 00000000 ................................ 0001A0
00000000 00000000 00000000 00000000 00000000 00000000 00000000 00000000 ................................ 0001C0
00000000 00000000 00000000 00000000 00000000 00000000 00000000 00000000 ................................ 0001E0

Dump of file SATURN:[PCCOMMON.DUMP.DLL]PRO.TMP;1 on 18-APR-1990 10:49:59.80
File ID (870,5,0)   End of file block 40 / Allocated 40

Virtual block number 32 (00000020), 512 (0200) bytes

00000000 00000000 00000000 00000000 00000000 00000000 00000000 00000000 ................................ 000000
00000000 00000000 00000000 00000000 00000000 00000000 00000000 00000000 ................................ 000020
00000000 00000000 00000000 00000000 00000000 00000000 00000000 00000000 ................................ 000040
00000000 00000000 00000000 00000000 00000000 00000000 00000000 00000000 ................................ 000060
00000000 00000000 00000000 00000000 00000000 00000000 00000000 00000000 ................................ 000080
00000000 00000000 00000000 00000000 00000000 00000000 00000000 00000000 ................................ 0000A0
00000000 00000000 00000000 00000000 00000000 00000000 00000000 00000000 ................................ 0000C0
00000000 00000000 00000000 00000000 00000000 00000000 00000000 00000000 ................................ 0000E0
00000000 00000000 00000000 00000000 00000000 00000000 00000000 00000000 ................................ 000100
00000000 00000000 00000000 00000000 00000000 00000000 00000000 00000000 ................................ 000120
00000000 00000000 00000000 00000000 00000000 00000000 00000000 00000000 ................................ 000140
00000000 00000000 00000000 00000000 00000000 00000000 00000000 00000000 ................................ 000160
00000000 00000000 00000000 00000000 00000000 00000000 00000000 00000000 ................................ 000180
00000000 00000000 00000000 00000000 00000000 00000000 00000000 00000000 ................................ 0001A0
00000000 00000000 00000000 00000000 00000000 00000000 00000000 00000000 ................................ 0001C0
00000000 00000000 00000000 00000000 00000000 00000000 00000000 00000000 ................................ 0001E0

Dump of file SATURN:[PCCOMMON.DUMP.DLL]PRO.TMP;1 on 18-APR-1990 10:49:59.80
File ID (870,5,0)   End of file block 40 / Allocated 40

Virtual block number 33 (00000021), 512 (0200) bytes

00000000 00000000 00000000 00000000 00000000 00000000 00000000 00000000 ................................ 000000
00000000 00000000 00000000 00000000 00000000 00000000 00000000 00000000 ................................ 000020
00000000 00000000 00000000 00000000 00000000 00000000 00000000 00000000 ................................ 000040
00000000 00000000 00000000 00000000 00000000 00000000 00000000 00000000 ................................ 000060
00000000 00000000 00000000 00000000 00000000 00000000 00000000 00000000 ................................ 000080
00000000 00000000 00000000 00000000 00000000 00000000 00000000 00000000 ................................ 0000A0
00000000 00000000 00000000 00000000 00000000 00000000 00000000 00000000 ................................ 0000C0
00000000 00000000 00000000 00000000 00000000 00000000 00000000 00000000 ................................ 0000E0
00000000 00000000 00000000 00000000 00000000 00000000 00000000 00000000 ................................ 000100
00000000 00000000 00000000 00000000 00000000 00000000 00000000 00000000 ................................ 000120
00000000 00000000 00000000 00000000 00000000 00000000 00000000 00000000 ................................ 000140
00000000 00000000 00000000 00000000 00000000 00000000 00000000 00000000 ................................ 000160
00000000 00000000 00000000 00000000 00000000 00000000 00000000 00000000 ................................ 000180
00000000 00000000 00000000 00000000 00000000 00000000 00000000 00000000 ................................ 0001A0
00000000 00000000 00000000 00000000 00000000 00000000 00000000 00000000 ................................ 0001C0
00000000 00000000 00000000 00000000 00000000 00000000 00000000 00000000 ................................ 0001E0
```

```
Dump of file SATURN:[PCCOMMON.DUMP.DLL]PRO.TMP;1 on 18-APR-1990 10:49:59.80
File ID (870,5,0)   End of file block 40 / Allocated 40

Virtual block number 34 (00000022), 512 (0200) bytes

00000000 00000000 00000000 00000000 00000000 00000000 00000000 00000000 ................................ 000000
00000000 00000000 00000000 00000000 00000000 00000000 00000000 00000000 ................................ 000020
00000000 00000000 00000000 00000000 00000000 00000000 00000000 00000000 ................................ 000040
00000000 00000000 00000000 00000000 00000000 00000000 00000000 00000000 ................................ 000060
00000000 00000000 00000000 00000000 00000000 00000000 00000000 00000000 ................................ 000080
00000000 00000000 00000000 00000000 00000000 00000000 00000000 00000000 ................................ 0000A0
00000000 00000000 00000000 00000000 00000000 00000000 00000000 00000000 ................................ 0000C0
00000000 00000000 00000000 00000000 00000000 00000000 00000000 00000000 ................................ 0000E0
00000000 00000000 00000000 00000000 00000000 00000000 00000000 00000000 ................................ 000100
00000000 00000000 00000000 00000000 00000000 00000000 00000000 00000000 ................................ 000120
00000000 00000000 00000000 00000000 00000000 00000000 00000000 00000000 ................................ 000140
00000000 00000000 00000000 00000000 00000000 00000000 00000000 00000000 ................................ 000160
00000000 00000000 00000000 00000000 00000000 00000000 00000000 00000000 ................................ 000180
00000000 00000000 00000000 00000000 00000000 00000000 00000000 00000000 ................................ 0001A0
00000000 00000000 00000000 00000000 00000000 00000000 00000000 00000000 ................................ 0001C0
00000000 00000000 00000000 00000000 00000000 00000000 00000000 00000000 ................................ 0001E0

Dump of file SATURN:[PCCOMMON.DUMP.DLL]PRO.TMP;1 on 18-APR-1990 10:49:59.80
File ID (870,5,0)   End of file block 40 / Allocated 40

Virtual block number 35 (00000023), 512 (0200) bytes

00000000 00000000 00000000 00000000 00000000 00000000 00000000 00000000 ................................ 000000
00000000 00000000 00000000 00000000 00000000 00000000 00000000 00000000 ................................ 000020
00000000 00000000 00000000 00000000 00000000 00000000 00000000 00000000 ................................ 000040
00000000 00000000 00000000 00000000 00000000 00000000 00000000 00000000 ................................ 000060
00000000 00000000 00000000 00000000 00000000 00000000 00000000 00000000 ................................ 000080
00000000 00000000 00000000 00000000 00000000 00000000 00000000 00000000 ................................ 0000A0
00000000 00000000 00000000 00000000 00000000 00000000 00000000 00000000 ................................ 0000C0
00000000 00000000 00000000 00000000 00000000 00000000 00000000 00000000 ................................ 0000E0
00000000 00000000 00000000 00000000 00000000 00000000 00000000 00000000 ................................ 000100
00000000 00000000 00000000 00000000 00000000 00000000 00000000 00000000 ................................ 000120
00000000 00000000 00000000 00000000 00000000 00000000 00000000 00000000 ................................ 000140
00000000 00000000 00000000 00000000 00000000 00000000 00000000 00000000 ................................ 000160
00000000 00000000 00000000 00000000 00000000 00000000 00000000 02000001 ................................ 000180
00000000 00000000 00000000 00000000 00000000 00000000 00000000 00000000 ................................ 0001A0
00000000 00000000 00000000 00000000 00000000 00000000 00000000 00000000 ................................ 0001C0
00000000 00000000 00000000 00000000 00000000 00000000 00000000 00000000 ................................ 0001E0

Dump of file SATURN:[PCCOMMON.DUMP.DLL]PRO.TMP;1 on 18-APR-1990 10:49:59.80
File ID (870,5,0)   End of file block 40 / Allocated 40

Virtual block number 36 (00000024), 512 (0200) bytes

00000000 00000000 00000000 00000000 00000000 00000000 00000000 00000000 ................................ 000000
00000000 00000000 00000000 00000000 00000000 00000000 00000000 00000000 ................................ 000020
00000000 00000000 00000000 00000000 00000000 00000000 00000000 00000000 ................................ 000040
00000000 00000000 00000000 00000000 00000000 00000000 00000000 00000000 ................................ 000060
00000000 00000000 00000000 00000000 00000000 00000000 00000000 00000000 ................................ 000080
00000000 00000000 00000000 00000000 00000000 00000000 00000000 00000000 ................................ 0000A0
00000000 00000000 00000000 00000000 00000000 00000000 00000000 00000000 ................................ 0000C0
00000000 00000000 00000000 00000000 00000000 00000000 00000000 00000000 ................................ 0000E0
00000000 00000000 00000000 00000000 00000000 00000000 00000000 00000000 ................................ 000100
00000000 00000000 00000000 00000000 00000000 00000000 00000000 00000000 ................................ 000120
00000000 00000000 00000000 00000000 00000000 00000000 00000000 00000000 ................................ 000140
00000000 00000000 00000000 00000000 00000000 00000000 00000000 00000000 ................................ 000160
00000000 00000000 00000000 00000000 00000000 00000000 00000000 00000000 ................................ 000180
00000000 00000000 00000000 00000000 00000000 00000000 00000000 00000000 ................................ 0001A0
00000000 00000000 00000000 00000000 00000000 00000000 00000000 00000000 ................................ 0001C0
00000000 00000000 00000000 00000000 00000000 00000000 00000000 00000000 ................................ 0001E0
```

```
Dump of file SATURN:[PCCOMMON.DUMP.DLL]PRO.TMP;1 on 18-APR-1990 10:49:59.80
File ID (870,5,0)    End of file block 40 / Allocated 40

Virtual block number 37 (00000025), 512 (0200) bytes

00000000 00000000 00000000 00000000 00000000 00000000 00000000 00000000 ................................ 000000
00000000 00000000 00000000 00000000 00000000 00000000 00000000 00000000 ................................ 000020
00000000 00000000 00000000 00000000 00000000 00000000 00000000 00000000 ................................ 000040
00000000 00000000 00000000 00000000 00000000 00000000 00000000 00000000 ................................ 000060
00000000 00000000 00000000 00000000 00000000 00000000 00000000 00000000 ................................ 000080
00000000 00000000 00000000 00000000 00000000 00000000 00000000 00000000 ................................ 0000A0
00000000 00000000 00000000 00000000 00000000 00000000 00000000 00000000 ................................ 0000C0
00000000 00000000 00000000 00000000 00000000 00000000 00000000 00000000 ................................ 0000E0
00000000 00000000 00000000 00000000 00000000 00000000 00000000 00000000 ................................ 000100
00000000 00000000 00000000 00000000 00000000 00000000 00000000 00000000 ................................ 000120
00000000 00000000 00000000 00000000 00000000 00000000 00000000 00000000 ................................ 000140
00000000 00000000 00000000 00000000 00000000 00000000 00000000 00000000 ................................ 000160
00000000 00000000 00000000 00000000 00000000 00000000 00000000 00000000 ................................ 000180
00000000 00000000 00000000 00000000 00000000 00000000 00000000 00000000 ................................ 0001A0
00000000 00000000 00000000 00000000 00000000 00000000 00000000 00000000 ................................ 0001C0
00000000 00000000 00000000 00000000 00000000 00000000 00000000 00000000 ................................ 0001E0

Dump of file SATURN:[PCCOMMON.DUMP.DLL]PRO.TMP;1 on 18-APR-1990 10:49:59.80
File ID (870,5,0)    End of file block 40 / Allocated 40

Virtual block number 38 (00000026), 512 (0200) bytes

00000000 00000000 00000000 00000000 00000000 00000000 00000000 00000000 ................................ 000000
00000000 00000000 00000000 00000000 00000000 00000000 00000000 00000000 ................................ 000020
00000000 00000000 00000000 00000000 00000000 00000000 00000000 00000000 ................................ 000040
00000000 00000000 00000000 00000000 00000000 00000000 00000000 00000000 ................................ 000060
00000000 00000000 00000000 00000000 00000000 00000000 00000000 00000000 ................................ 000080
00000000 00000000 00000000 00000000 00000000 00000000 00000000 00000000 ................................ 0000A0
00000000 00000000 00000000 00000000 00000000 00000000 00000000 00000000 ................................ 0000C0
00000000 00000000 00000000 00000000 00000000 00000000 00000000 00000000 ................................ 0000E0
00000000 00000000 00000000 00000000 00000000 00000000 00000000 00000000 ................................ 000100
00000000 00000000 00000000 00000000 00000000 00000000 00000000 00000000 ................................ 000120
00000814 14440000 00000000 00000000 00000000 00000000 00000000 00000000 ................................ 000140
00000000 00000000 00000000 81818101 00000001 00000000 00000000 00000000 ...........................D..... 000160
00000000 00000000 00000000 00000000 00000000 00000000 00000000 00000000 ................................ 000180
00000000 00000000 00000000 00000000 00000000 00000000 00000000 00000000 ................................ 0001A0
00000000 00000000 00000000 00000000 00000000 00000000 00000000 00000000 ................................ 0001C0
00000000 00000000 00000000 00000000 00000000 00000000 00000000 00000000 ...........................  ..... 0001E0

Dump of file SATURN:[PCCOMMON.DUMP.DLL]PRO.TMP;1 on 18-APR-1990 10:49:59.80
File ID (870,5,0)    End of file block 40 / Allocated 40

Virtual block number 39 (00000027), 512 (0200) bytes

00000000 00000000 00000000 00000000 00000000 00000000 00000000 00000000 ................................ 000000
00000000 00000000 00000000 00000000 00000000 00000000 00000000 00000000 ................................ 000020
00000000 00000000 00000000 00000000 00000000 00000000 00000000 00000000 ................................ 000040
00000000 00000000 00000000 00000000 00000000 00000000 00000000 00000000 ................................ 000060
0A0A0A0A 0A0A0A0A 0A0A0A0A 0A0A0A00 00000000 00000000 00000000 00000000 ................................ 000080
0A0A0A0A 0A0A0A0A 0A0A0A0A 0A0A0A0A 0A0A0A0A 0A0A0A0A 0A0A0A0A 0A0A0A0A ................................ 0000A0
0A0A0A0A 0A0A0A0A 0A0A0A0A 0A0A0A0A 0A0A0A0A 0A0A0A0A 0A0A0A0A 0A0A0A0A ................................ 0000C0
0A0A0A0A 0A0A0A0A 0A0A0A0A 0A0A0A0A 0A0A0A0A 0A0A0A0A 0A0A0A0A 0A0A0A0A ................................ 0000E0
0A0A0A0A 0A0A0A0A 0A0A0A0A 0A0A0A0A 0A0A0A0A 0A0A0A0A 0A0A0A0A 0A0A0A0A ................................ 000100
0A0A0A0A 0A0A0A0A 0A0A0A0A 0A0A0A0A 0A0A0A0A 0A0A0A0A 0A0A0A0A 0A0A0A0A ................................ 000120
0A0A0A0A 0A0A0A0A 0A0A0A0A 0A0A0A0A 0A0A0A0A 0A0A0A0A 0A0A0A0A 0A0A0A0A ................................ 000140
00000000 00000000 00000000 0000000A 0A0A0A0A 0A0A0A0A 0A0A0A0A 0A0A0A0A ................................ 000160
00000000 00000000 00002000 00000000 00000000 00000000 00000000 00000000 ................................ 000180
2D0A0D30 30303652 00003E3E 4753404E 3C3CFFFF FFFF07B2 1E0E0000 00000000 ..................... .......... 0001A0
746E6920 2D0A0D33 30303652 0003000A 00776F6C 66726576 6F206B63 61747320 ........ÿ.....<<NMSG>>..R6000..- 0001C0
                                                                       stack overflow.....R6003..- int 0001E0
```

Dump of file SATURN:[PCCOMMON.DUMP.DLL]PRO.TMP;1 on 18-APR-1990 10:49:59.80
File ID (870,5,0)   End of file block 40 / Allocated 40

Virtual block number 40 (00000028), 512 (0200) bytes

```
6F6E2020 0A0D3830 30365200 08000A0D 30207962 20656469 76696420 72656765 eger divide by 0.....R6008..- no 000000
09000A0D 73746E65 60756772 6120726F 66206563 61707320 6867756F 6E652074 t enough space for arguments.... 000020
6520726F 66206563 61707320 6867756F 6E652074 6F6E2020 0A0D3930 30365200 .R6009..- not enough space for e 000040
72726520 65606974 206E7572 00FF000A 0000FC00 0A0D746E 65606E6F 7269766E nvironment...•......run-time err 000060
6F6E2074 6E696F70 20676E69 74616F6C 6620200A 00323030 36520002 0020726F or ...R6002..- floating point no 000080
00000005 085E0002 00000004 1C980002 0003FFFF FF000A00 64656461 6F6C2074 t loaded.................^..... 0000A0
00000000 FFFF0001 000E0352 0000011E 00000000 00000000 00000006 1A4C0002 ..L.................R........... 0000C0
00000000 00E1FFFF 00C80057 009F0065 00729400 000000E0 00000001 00000006 ........Â.Â...r.e...W.à...Â..... 0000E0
00000000 0000FFFF FFFF0002 000A002E 00430005 80020004 00E50004 00030000 ......|.......C.....@........... 000100
00030000 00000000 FFFFFFFF 000C000A 003A0033 00058002 000400EA 000A0003 ....ö.......3.:...É............. 000120
00020003 00000000 0000FFFF FFFF00E6 000A007A 00230005 80020004 00F50019 ..%.......#.z...|............... 000140
01120006 00030000 00000000 FFFFFFFF 00010000 0026000A 000D8002 0000010F ..........&..................... 000160
00000119 00040003 00000000 0000FFFF FFFF0002 00000026 000A003C 80020000 ....<...&....................... 000180
61206576 61530065 76615300 00003300 FFFFFFFF 00030000 0026000A 006C8002 ..l...&.........3...Save.Save a 0001A0
4F00796C 6E6F206E 6F697373 65732073 69687420 726F6620 65735500 2E2E2E73 s....Use for this session only.O 0001C0
00000000 00000000 00000000 00000000 00000070 6C654800 6C65636E 6143004B K.Cancel.Help................... 0001E0
```

File ID (766,30,0)   End of file block 195 / Allocated 196

Virtual block number 1 (00000001), 512 (0200) bytes

```
00000000 00000040 00000000 00000088 0000FFFF 00000004 000000C3 00E45A4D MZö.ù...........|........a....... 000000
00000080 00000000 00000000 00000000 00000000 00000000 00000000 00000000 ................................ 000020
6F6E6E61 63206061 72676F72 70207369 685421CD 4C01B821 CD09B400 0EBA1F0E ..¤..Ç.ël|.LèlThis program canno 000040
00000000 00000024 0A0D0D2E 65646F6D 20534F44 206E6920 6E757220 65622074 t be run in DOS mode....$....... 000060
0010002B 00000000 00010000 00000800 0028800E C5F39A5E 00020723 0505454E NE..#...^.µé..+.......... ..+... 000080
00000000 00000000 00010000 00040000 000007A5 01C201A2 01980198 0040002D -.a.....Â.ö.É.............. .... 0000A0
3AA20F00 3AA2095C 27E00F00 27E006D1 64060F00 64060081 00110F00 0011007E ~..........d...dï.Â'..Â'\.Â:..Â: 0000C0
029E0F00 029E0EAA 03420F00 03420E70 05100F00 05100E15 007A0F00 00790036 6.y...z.........p.B...B.`....... 0000E0
047E0F00 047E0FB1 05F80F00 05F80F4B 03160F00 03160F14 03420F00 03420EDA Ö.B...B.........K.½...½.Ÿ.~...~. 000100
02980F00 0298109D 00E80F00 00E81088 03640F00 0364104F 04940F00 04941000 ........O.d...d...Ö...Ö......... 000120
017A0F00 017A114B 017A0F00 017A112F 017A0F00 017A1113 03F60F00 03F610CD ë.~...~...z...z./.z...z.K.z...z. 000140
017A0F00 017A11D7 017A0F00 017A11B8 017A0F00 017A119F 031C0F00 031C1167 g.........z...z.É.z...z.■.z...z. 000160
03420F00 03421285 038A0F00 038A1246 03160F00 0316120F 017A0F00 017A11F3 µ.z...z.........F.........B...B. 000180
031C0F00 031C1369 031C0F00 031C1331 031C0F00 031C12F9 03420F00 0342128F ¢.B...B.¹.........1........i...... 0001A0
03420F00 03421486 07840F00 07841401 029E0F00 029E1301 029E0F00 029E13A1 Â........|.........Ç....Ç...B...B. 0001C0
01640F00 0164156E 01640F00 01641553 04160F00 0416150B 03680F00 036814C0 à.h...h.........S.d...d.n.d...d. 0001E0
```

Dump of file SATURN:[PCCOMMON.DUMP.DLL]PDLDGM.TMP;1 on 18-APR-1990 10:48:18.73
File ID (766,30,0)   End of file block 195 / Allocated 196

Virtual block number 2 (00000002), 512 (0200) bytes

```
004D4744 4C445006 25BA0F01 25BA150F 01060E00 010515CE 03E20F00 03E21589 ..â...â.ö.......Ô.¤%..¤%.PDLDGM. 000000
04AE047F 04620413 03F203C8 038A02FA 028F0280 0166000E 0010000A 00010000 ........â.f...¢.¹.¤.à.·...b...Û. 000020
52485445 4D5F1244 4F485445 4D064E49 57405005 534C4C41 43534F44 080004C8 à...DOSCALLS.PMWIN.METHOD._METHR 000040
53485445 4D5F1247 534D444E 45534854 454D5F0C 5353414C 43524554 53494745 EGISTERCLASS._METHSENDMSG._METHS 000060
45524150 454C474E 4953444E 45534854 454D5F18 4753 4D54 4E455241 50444E45 ENDPARENTMSG._METHSENDSINGLEPARE 000080
4E494544 4854454D 5F124554 4149544E 4154534E 49485445 4D5F1047 534D544E NTMSG._METHINSTANTIATE._METHDEIN 0000A0
4D5F1041 54414453 53414C43 59524555 51485445 4D5F1345 54414954 4E415453 STANTIATE._METHQUERYCLASSDATA._M 0000C0
4854454D 5F105453 4E495445 47485445 4D0B4753 4D54534E 49444E45 53485445 ETHSENDINSTMSG.METHGETINST._METH 0000E0
5353414C 4354534E 49455649 52454448 5445 4D5F 14535341 4C434556 49524544 DERIVECLASS._METHDERIVEINSTCLASS 000100
4D440C4E 5854504F 54534C4D 440A4D54 48455249 55514341 4C4D4400 6C6D6403 .dml.DMLACQUIREHTM.DMLSTOPTXN.DM 000120
52455551 4C4D4410 44494C4D 44595245 55514C4D 44004C45 444F4D45 4552464C LFREEMODEL.DMLQUERYDMLID.DMLQUER 000140
4D440B45 54415453 59524555 51524554 4C49464C 4D441345 50595454 4F4C5359 YSLOTTYPE.DMLFILTERQUERYSTATE.DM 000160
46595245 55514C4D 44114646 4F524554 4C49464C 4D440C4E 4F524554 4C49464C LFILTERON.DMLFILTEROFF.DMLQUERYF 000180
45524645 524D4744 00485345 52464552 4D47440A 4D47440 3 54494252 45544C49 ILTERBIT.DGM.DGMREFRESH.DGMREFRE 0001A0
440C5450 5245544E 45434D47 440B4D4F 4F5A5055 5445534D 47440C58 4F424853 SHBOX.DGMSETUPZOOM.DGMCENTERPT.D 0001C0
5445534D 47440E4E 46544E49 41505445 534D4744 004E464E 45504F54 45534D47 GMSETOPENFN.DGMSETPAINTFN.DGMSET 0001E0
```

Dump of file SATURN:[PCCOMMON.DUMP.DLL]PDLDGM.TMP;1 on 18-APR-1990 10:48:18.73

File ID (766,30,0)   End of file block 195 / Allocated 196

Virtual block number 3 (00000003), 512 (0200) bytes

```
47440954 49464047 44064E46 45534F4C 43544553 4D474400 4E46544E 45545845 EXTENTFN.DGMSETCLOSEFN.DGMFIT.DG 000000
444F4C50 58455741 52444D47 4413584F 42574152 444D4744 0A584F42 5449464D MFITBOX.DGMDRAWBOX.DGMDRAWEXPLOD 000020
4152444D 47441558 4F424445 444F4C50 58455741 52444D47 4412454E 494C4445 EDLINE.DGMDRAWEXPLODEDBOX.DGMDRA 000040
514D4744 104E4550 59524555 514D4744 08474E49 52545344 45444F4C 50584557 WEXPLODEDSTRING.DGMQUERYPEN.DGMQ 000060
44094540 41524644 4E574859 52455551 4D474411 4F464E49 52455355 59524555 UERYUSERINFO.DGMQUERYHWNDFRAME.D 000080
4E495245 53555445 534D4744 0E54494E 55544553 4D47440A 4E455054 45534D47 GMSETPEN.DGMSETUNIT.DGMSETUSERIN 0000A0
48535550 45444F4D 4D47440B 45544145 52434544 4F4D4D47 4400444F 4D034F46 FO.MOD.DGMMODECREATE.DGMMODEPUSH 0000C0
434E5546 4553554F 4D544553 45444F4D 4D474414 4C4C5550 45444F4D 4D47440B .DGMMODEPULL.DGMMODESETMOUSEFUNC 0000E0
4F425345 53534F52 43584F42 50485310 584F424E 49545050 48530A50 48530354 T.SHP.SHPPTINBOX.SHPBOXCROSSESBO 000100
54554403 544E4554 58455952 45555142 54585444 45444F4C 50584550 48531A58 X.SHPEXPLODEDTXTBQUERYEXTENT.DUT 000120
43455341 454C4552 4741424C 54551352 4F535255 4354494E 49474142 4C545510 .UTLBAGINITCURSOR.UTLBAGRELEASEC 000140
5145534C 54550A52 4F535255 43455441 52455449 4741424C 54551352 4F535255 URSOR.UTLBAGITERATECURSOR.UTLSEQ 000160
550E4854 474E454C 5145534C 54550C45 4B41404E 55514553 4C54550C 4548414D MAKE.UTLSEQUNMAKE.UTLSEQLENGTH.U 000180
45534C54 55004C45 5453414C 5145534C 54550C4C 4545564F 4D455251 45534C54 TLSEQREMOVEEL.UTLSEQLASTEL.UTLSE 0001A0
54504D45 5145534C 54550B4C 45485355 50514553 4C54550C 4C455453 52494651 QFIRSTEL.UTLSEQPUSHEL.UTLSEQEMPT 0001C0
44524203 4548414D 48434154 534C5455 0C404554 49444441 5145534C 54550D59 Y.UTLSEQADDITEM.UTLSTACKMAKE.BRD 0001E0
```

Dump of file SATURN:[PCCOMMON.DUMP.DLL]PDLDGM.TMP;1 on 18-APR-1990 10:48:18.73
File ID (766,30,0)   End of file block 195 / Allocated 196

Virtual block number 4 (00000004), 512 (0200) bytes

```
42454D53 00544E45 5645454B 414D454D 530C454D 53034554 41455243 44524209 .BRDCREATE.SME.SMEMAKEEVENT.SMEB 000000
41455243 4D454D00 4D454D03 5449534E 41525445 4D530A54 4E455645 444C4955 UILDEVENT.SMETRANSIT.MEM.MEMCREA 000020
534F5049 54470A49 54470350 41454859 4F525453 45444D45 4D0E5041 45484554 TEHEAP.MEMDESTROYHEAP.GTI.GTIPOS 000040
574F444E 49574C4F 4F545445 53495447 1047534D 444E4553 4954470A 47534D54 TMSG.GTISENDMSG.GTISETTOOLWINDOW 000060
41504C4F 4F545952 45555149 54471252 54504154 41445855 41544553 49544710 .GTISETAUXDATAPTR.GTIQUERYTOOLPA 000080
58545452 41545354 5541530C 52545354 45475455 41530A54 55415304 544E4552 RENT.SAUT.SAUTGETSTR.SAUTSTARTTX 0000A0
534F5053 49444E59 534C4450 0054494E 494E5953 4C44500A 4E59534C 4450064E N.PDLSYN.PDLSYNINIT.PDLSYNDISPOS 0000C0
54415453 415F104C 44504744 20415308 54584554 45455254 4E59534C 44500E45 E.PDLSYNTREETEXT.SA-DGPDL._ASTAT 0000E0
59464954 4F4E454B 41405455 4C4D4416 54554C4D 44055345 54415453 4C445045 EPDLSTATES.DMLUT.DMLUTMAKENOTIFY 000100
52505455 4C4D4412 54455352 45545349 47455254 554C4D44 1052454C 444E4148 HANDLER.DMLUTREGISTERSET.DMLUTPR 000120
41485946 49544F4E 594F5254 53454454 554C4D44 19594649 544F4E53 5345434F OCESSNOTIFY.DMLUTDESTROYNOTIFYHA 000140
54414C45 524E5545 54414C45 52524554 53494745 5254554C 4D441B52 454C444E NDLER.DMLUTREGISTERRELATEUNRELAT 000160
44585541 59524555 5154554C 4D441141 54414458 55415445 5354554C 4D440F45 E.DMLUTSETAUXDATA.DMLUTQUERYAUXD 000180
73752073 646F6874 65602064 6E612073 7463656A 626F204C 44502900 00415441 ATA..)PDL objects and methods us 0001A0
00000000 00000000 00000000 00000000 00606574 73797320 4153206E 69206465 ed in SA system................. 0001C0
28000200 02000000 25000A00 020002C8 1F02C483 FFFF0317 9A57D88E FFFFB81E .|...ÄW......á..ù......X.......+ 0001E0
```

Dump of file SATURN:[PCCOMMON.DUMP.DLL]PDLDGM.TMP;1 on 18-APR-1990 10:48:18.73
File ID (766,30,0)   End of file block 195 / Allocated 196

Virtual block number 5 (00000005), 512 (0200) bytes

```
040E4683 D88EFFFF B81E5657 00000EC8 00000000 00000000 00000000 00000000 ................à...WV.|...Ä.F.. 000000
FE578B26 FC478B26 0E5EC404 0E4683FA 5689F846 89FE578B 26FC478B 260E5EC4 á^.&.G=&.W±.F½.V'.F..á^.&.G=&.W± 000020
5EC40CC4 83000002 2C9A006A F876FFFA 76FF027E 685016F6 468DFE56 89FC4689 .F=.V±.F-.Ph-..v'.v½j..,.....á.á^ 000040
47C7260A 5EC40001 1C47C726 0A5EC400 94978926 00928789 26FA568B F84688OA ..F½.V'&....&....á^.&úG...á^.&úG 000060
00988789 260000B8 0A5EC400 012247C7 260A5EC4 00012047 C7260A5E C400011E ...á^.&úG ..á^.&úG"..á^.|..&.... 000080
26019000 9E87C726 0A5EC400 9A878926 009C8789 260000B8 0A5EC400 96878926 &....á^.|..&....&....á^.&ú.....& 0000A0
47892600 00B80A5E C4000000 A487C726 00C800A2 87C7260A 5EC40000 00A087C7 ú.....á^.&ú.Å.à.&ú.Ê...á^.|..&.G 0000C0
4789262E 47892600 00B80A5E C4284789 262A4789 260000B8 0A5EC424 47892626 &&.G$á^.|..&.G*&.G(á^.|..&.G.&.G 0000E0
BA878926 00BC8789 260000B8 0A5EC400 B6878926 00B88789 260000B8 0A5EC42C ,á^.|..&..|.&..Ñ.á^.|..&..¥.&..¤ 000100
C2878926 00C48789 260000B8 0A5EC400 BE878926 00C08789 260000B8 0A5EC400 .á^.|..&..à.&../.á^.|..&..á.&..ô 000120
CA878926 00CC8789 260000B8 0A5EC400 C6878926 00C88789 260000B8 0A5EC400 .á^.|..&..à.&..ó.á^.|..&..ä.&..ò 000140
D2878926 00D48789 260000B8 0A5EC400 CE878926 00D08789 260000B8 0A5EC400 .á^.|..&..Å.&..ö.á^.|..&..å.&..▪ 000160
DA878926 00DC8789 260000B8 0A5EC400 D6878926 00D88789 260000B8 0A5EC400 .á^.|..&..Ä.&..ø.á^.|..&..É.&..Ö 000180
0034050C 56880A46 8BF676FF 000001B3 9A505200 30050C56 880A4688 F676FF00 ..v-.F..V..0.RP.°....v-.F..V..4. 0001A0
0000880A 5EC40000 FFFF9A50 52003805 0C56880A 4688F676 FF000001 C69A5052 RP.ó....v-.F..V..8.RP.....á^.|.. 0001C0
0000880A 5EC400A6 87892600 A8878926 0000880A 5EC4008E 87892600 90878926 &....&....á^.|..&..´.&..Ì.á^.|.. 0001E0
```

Dump of file SATURN:[PCCOMMON.DUMP.DLL]PDLDGM.TMP;1 on 18-APR-1990 10:48:18.73

File ID (766,30,0)   End of file block 195 / Allocated 196

Virtual block number 6 (00000006), 512 (0200) bytes

```
87C7260A 5EC400E4 87892600 E6878926 0000B80A 5EC400AA 87892600 AC878926 &..¯.&..¯.á^.¡..&..Ì.&..ð.á^.&ú. 000000
00000252 9A006A00 92B7FF26 0094B7FF 260A5EC4 027F6850 16F2468D 000100E2 â....F·.Ph..á^.&.ñ..&.ñ..j..R... 000020
6AFC76FF FE76FF27 1268F276 FFF476FF 0C6A5052 000E050C 56880A46 880CC483 .á..F..V..B.RPj..v¶.v·h.'.v±.v=j 000040
D88E0008 B81E5657 000014C8 CBC95F5E 1F0000E9 0000B812 C4830000 FFFF9A00 .......á.¡..Õ...^_èùà...WV.¡...Á 000060
EE76FF08 D2685016 F8468DEE 5689EC46 89FE5788 26FC4788 260E5EC4 040E4683 .F..á^.&.G=&.W±.FŠ.VÝ.F½.Ph@..vÝ 000080
02D29A00 6AEC76FF EE76FF08 D3685016 F0468D0C C4830000 02AE9A00 6AEC76FF .vŠj..Û....á..Fþ.PhÆ..vÝ.vŠj..@. 0000A0
6AF876FF FA76FF08 B868F076 FFF276FF 0019E903 75FA4608 F846880C C4830000 ...á..F½.F°u.Õ...v·.vÞh¦..v°.v½j 0000C0
F276FF08 B768F876 FFFA76FF 0019E903 75F24608 F046880C C4830000 02F69A00 ..¬....á..Fþ.F·u.Õ...v°.v½hñ..v· 0000E0
03519A00 6AEC76FF EE76FF08 00685016 F6468D0C C4830000 030E9A00 6AF076FF .vÞj.......á..F-.PhÅ..vÝ.vŠj..Q. 000100
9A006A06 76FF0876 FF0A76FF 0C76FF08 F168EC76 FFEE76FF F676FF0C C4830000 ...á..v-.vÝ.vŠhþ..v..v..v..v.j.. 000120
006AEC76 FFEE76FF 08066850 16FC468D 002DE903 7500F47E 8312C483 0000FFFF .....á..~¶.u.Õ-..F=.Ph@..vÝ.vŠj. 000140
0000B80A C4830000 00479A00 6AFC76FF FE76FF26 5968006A 0CC48300 0003669A .f....á.j.hY&.v±.v=j..G....á.¡.. 000160
89265788 26244788 260A5EC4 D88E026C B81E5657 000024C8 CBC95F5E 1F0000E9 Õ...^_èùà$..WV.¡l..Áá^.&.G$&.W&. 000180
46890090 97882600 8E878826 0A5EC4E0 5689DE46 89085688 064688FA 5689F846 F½.V°¯.F..V..FB.VÁá^.&....&.....F 0001A0
0E5EC402 0E4683E4 5689E246 89FE5788 26FC4788 260E5EC4 040E4683 F65689F4 ¶.V-.F..á^.&.G=&.W±.Fã.VÕ.F..á^. 0001C0
75031A7F 83260A5E C40000FF FF9A5016 E8468DE2 76FFE476 FFDC4689 FE478826 &.G±.FÉ.vÕ.vã.FÒ.P.....á^.&....u 0001E0
```

Dump of file SATURN:[PCCOMMON.DUMP.DLL]PDLDGM.TMP;1 on 18-APR-1990 10:48:18.73
File ID (766,30,0)   End of file block 195 / Allocated 196

Virtual block number 7 (00000007), 512 (0200) bytes

```
E276FFE4 76FF0008 E9037500 E87E8300 78E90374 041A7F83 260A5EC4 000DE903 .Õ..á^.&....t.Õx..-Õ.u.Õ...vÕ.vã 000000
04999A00 6ADE76FF E076FF27 1468E276 FFE476FF 066A5016 F0468D00 00FFFF9A ......Fþ.Pj..vÕ.vãh.'.vÁ.vßj.... 000020
89F25688 F0468B00 00FFFF9A E276FFE4 76FF0008 E9037500 E87E8312 C4830000 ...á..-Õ.u.Õ...vÕ.vã......Fþ.V·. 000040
46880CC4 83000004 CA9A006A F076FFF2 76FFE276 FFE476FF DC76FFE0 56890E46 FB.VÁ.vÉ.vÕ.vã.v·.vÞj..Þ....á..F 000060
271068E2 76FFE476 FF5016FC 468D004F E9037500 DC7E83FF 88E90374 F24608F0 Þ.F·t.Õ...~É.u.ÕO..F=.P.vÕ.vãh.' 000080
006AF476 FFF676FF 264C6850 16E6468D 10C48300 0004819A 006A0676 FF0876FF .v..v.j..Ý....á..Fl.PhL&.v-.v¶j. 0000A0
C4830000 05449A00 6AFC76FF FE76FFE2 76FFE476 FFE676FF 0CC48300 0004EE9A .Ý....á..vl.vÕ.vã.v±.v=j..D....á 0000C0
02969A00 6AF876FF FA76FF08 04680676 FF0876FF 0019E903 75FA4608 F846880C ..F½.F°u.Õ...v..v.hå..v°.v½j.... 0000E0
3077FF26 3277FF26 0A5EC400 59E90375 32470826 30478826 0A5EC40C C4830000 ...á.á^.&.G0&.G2u.ÕY.á^.&.w2&.w0 000100
E9037400 003D0000 058F9A50 160E468D 3077FF26 3277FF26 0A5EC400 00057A9A .z...á^.&.w2&.w0.FB.P.....=..t.Õ 000120
5EC4FFC7 E90CC483 000005AD 9A006ADE 76FFE076 FFE276FF E476FFDC 76FF001C ...vÉ.vÕ.vã.vÁ.vßj..Ù....á.Õú.á^ 000140
5EC40059 E9037536 470B2634 478B260A 5EC40000 05C39A30 77FF2632 77FF260A .&.w2&.w0.ù...á^.&.G4&.G6u.ÕY.á^ 000160
F89A5016 DE468D34 77FF2636 77FF260A 5EC40000 05E39A34 77FF2636 77FF260A .&.w6&.w4.D...á^.&.w6&.w4.FB.P.½ 000180
0006169A 006ADE76 FFE076FF E276FFE4 76FFDC76 FF001CE9 03740000 3D000005 ...=..t.Õ...vÉ.vÕ.vã.vÁ.vßj..... 0001A0
08263847 88260A5E C4000006 2C9A3477 FF263677 FF260A5E C4FFC7E9 0CC48300 ..á.Õú.á^.&.w6&.w4.,...á^.&.G8&. 0001C0
FF263A77 FF260A5E C40000FF FF9A3877 FF263A77 FF260A5E C40059E9 03753A47 G:u.ÕY.á^.&.w:&.w8.....á^.&.w:&. 0001E0
```

Dump of file SATURN:[PCCOMMON.DUMP.DLL]PDLDGM.TMP;1 on 18-APR-1990 10:48:18.73
File ID (766,30,0)   End of file block 195 / Allocated 196

Virtual block number 8 (00000008), 512 (0200) bytes

```
E076FFE2 76FFE476 FFDC76FF 001CE903 74000030 0000FFFF 9A50160E 46803877 w8.F8.P.....=..t.Õ...vÉ.vÕ.vã.vÁ 000000
0000FFFF 9A3877FF 263A77FF 260A5EC4 FFC7E90C C4830000 06819A00 6ADE76FF .vßj.......á.Õú.á^.&.w:&.w8..... 000020
C1EE7688 EE46FF00 1AE90000 EE46C7EC 5689EA46 89405788 263E4788 260A5EC4 á^.&.G>&.W@.FÕ.VŠúFÝ..Õ...FÝ.vÝè 000040
E903773C 473926EE 46880A5E C4EC5689 EA468940 5088263E 4088260A 5EC402E6 Ì.á^.&.@>&.P@.FÕ.VŠá^..FÝ&9G<w.Õ 000060
00E90000 B8FFBEE9 0AC48300 00FFFF9A 006AEA76 FFEC76FF E276FFE4 76FF0019 ...vÕ.vã.vŠ.vÕj.......á.Õƒ.¡..Õ. 000080
F8468926 57882624 4788260A 5EC4D88E 03808B1E 56570000 1CC8C8C9 5F5E1F00 ..^_èùà...WV.¡...Äá^.&.G$&.W&.F½ 0000A0
6AF876FF FA76FF08 AD685016 F0468D50 16EC468D E44689E6 46890000 B8FA5689 .V°ì...Fl.FÕ.F§.P.Fþ.PhÙ..v°.v½j 0000C0
C4830000 07079A00 6AF876FF FA76FF08 AE685016 FC468D10 C4830000 06EA9A00 ..Õ....á..F=.PhÛ..v°.v½j.......á 0000E0
468B10C4 83000004 2E9A006A F876FFFA 76FF08AF 685016E8 46805016 F446800C ..F¶.P.FÒ.PhÉ..v°.v½j.......á..F 000100
00A89788 2600A687 88260A5E C40078E9 1A478826 0A5EC400 BDE90375 FA4608F8 ½.F°u.Õ§.á^.&.G.Õx.á^.&..Ì.&..´. 000120
882600A6 8788260A 5EC40070 E9009897 89260096 8789260A 5EC4F256 13F04603 .Fþ.V·á^.&....&....Õp.á^.&..Ì.&. 000140
C40047E9 00989789 26009687 89260A5E C4EA5613 E84603F2 5613F046 0300A897 .´..Fþ.V·.FÒ.VÕá^.&....&....ÕG.á 000160
E9009897 89260096 8789260A 5EC4F256 13F04603 00A89788 2600A687 88260A5E ^.&..Ì.&..´..Fþ.V·á^.&....&....Õ 000180
03750003 30FF98E9 03750002 30FF80E9 03750001 30001BE9 0044E900 01880024 $.¡..ÕO.Õ..=..u.Õ..=..u.Õ..=..u. 0001A0
9A878926 0A5EC4EE 5613EC46 0300AC97 882600AA 8788260A 5EC4FFDC E9FFBCE9 Õ¥.ÕÉ.á^.&..´.&..¯..FŠ.VÝá^.&... 0001C0
F846800B 8E069EB8 1E565700 0042C8C8 C95F5E1F 0000E900 0088009C 97892600 .&....¡..Õ...^_èùàB..WV.¡...Ä.F½ 0001E0
```

Dump of file SATURN:[PCCOMMON.DUMP.DLL]PDLDGM.TMP;1 on 18-APR-1990 10:48:18.73

File ID (766,30,0)   End of file block 195 / Allocated 196

Virtual block number 9 (00000009), 512 (0200) bytes

```
0A5EC402 79685016 D4468D0C C4830000 081D9A00 6A0676FF 0876FF08 80685016 .Ph¯..v..v.j.......6..F8.Phy.6^. 000000
FF0C76FF 08A06850 16F4468D 0CC48300 0008C49A 006A0092 B7FF2600 9487FF26 &.ñ..&.ñ..j..6....6..F¶.Ph...v.. 000020
FFFF9A50 16C2468D F876FFFA 76FF10C4 83000008 8C9A006A 0676FF08 76FF0A76 v..v..v.j.......6..v'.v%.Fó.P... 000040
037400C2 7E830197 E90375F6 4608F446 8B01A2E9 0375001E 7F83260A 5EC40000 ..6^.&....u.ÕÅ..F¶.F-u.Õ...~ô.t. 000060
000008AC 9A006A06 76FF0876 FF0A76FF 0C76FF08 A668016A 5016F046 8D018EE9 Õ...Fþ.Pj.hl..v..v..v..v.j..¯... 000080
00000330 9A006A06 76FF0876 FF0A76FF 0C76FF08 A668066A 5016EC46 8D12C483 .6..Fš.Pj.hl..v..v..v..v.j..O... 0000A0
C4026A00 6A0CC483 00000983 9A006AF0 76FFF276 FF057868 50160846 8D12C483 .6..FÄ.Phx..v·.vþj.......6.j.j.6 0000C0
03260A5E C4090900 369A5052 02571826 072B2608 5EC40A57 88260847 8826085E ^Ä&.G.&.W.6^Ä&+.&.W.RP.6.).6^.&. 0000E0
009A878B 260A5EC4 DE5689DC 46890257 13260703 26085EC4 00989713 26009687 ...&....6^Ä&..&.W..FÉ.V86^.&.... 000100
89E44689 DE5688DC 4688E256 89E04689 06571326 04470326 D85EC400 9C978826 &....6^Ä&.G.&.W..FÄ.Vã.FÉ.V8.Fö. 000120
8703260A 5EC4009C 978B2600 9A878826 0A5EC400 23E90375 EE4608EC 4688E656 Vl.Fš.FŸu.Õ#.6^.&....&....6^.&.. 000140
0000FFFF 9A50168E 4680F876 FFFA76FF 0087E9EA 5689E846 89008C97 1326008A ¤.&..¥..FÒ.VõÕ...v'.v%.Ff.P..... 000160
68501608 4680EC4 83000009 9B9A006A BE76FFC0 76FF08A6 68046A50 16FC468D .F=.Pj.hl..vâ.v/j.......6..FÄ.Ph 000180
BE76FFC0 76FF08A5 685016C4 4680CC4 83000009 B39A006A FC76FFFE 76FF0578 x..v±.v=j..*....6..F6.PhE..v6.vf 0001A0
0C470326 D85EC406 57882604 47882608 5EC4026A 006A0CC4 83000006 D29A006A j..@....6.j.j.6^Ä&.G.&.W.6^Ä&.G. 0001C0
6A006AD4 76FFD676 FFEA5689 E84689CA 5613C846 03FFFF00 369A5052 0E571326 &.W.RP.6....Fà.Vò.FÒ.Võ.vø.vâj.j 0001E0
```

Dump of file SATURN:[PCCOMMON.DUMP.DLL]POLOGM.TMP;1 on 18-APR-1990 10:48:18.73
File ID (766,30,0)   End of file block 195 / Allocated 196

Virtual block number 10 (0000000A), 512 (0200) bytes

```
00002AC8 CBC95F5E 1F0000E9 0000B800 00FFFF9A 016A006A 006A5016 DC468D02 ..FÉ.Pj.j.j......|..Õ...^_èùà*.. 000000
9A006A00 92B7FF26 009487FF 260A5EC4 02796850 160C4680 D88E07E9 881E5657 WV.|Õ..Ä.FÉ.Phy.6^.&.ñ..&¯ñ..j.. 000020
0ADB9A00 6A0676FF 0876FF0A 76FF0C76 FF08A168 5016FC46 800CC483 00000813 .....6..F=.PhÀ..v..v..v..v.j..Ü. 000040
7F83260A 5EC40000 0A9C9A50 16064680 3477FF26 3677FF26 0A5EC410 C4830000 ...6.6^.&.w6&.w4.F=.P.....6^.&.. 000060
FF260A5E C401F8E9 03740006 7E830201 E90375FE 460BFC46 88020CE9 03750020 .u.Õ...F=.F±u.Õ...~=.t.Õ½.6^.&. 000080
1E7F8326 0A5EC400 13E90374 000A7E83 0000084E 9A50160A 46803077 FF263277 w2&.w0.FÖ.P.N....~Ö.t.Õ..6^.&... 0000A0
FF0C76FF 08A66802 6A5016E8 4680D846 89000088 0003E900 01880006 E9037500 .u.Õ..|..Õ..|...FÄ.FÒ.Pj.hl..v.. 0000C0
FF0C76FF 08A66807 6A5016E0 468012C4 8300000A FB9A006A 0676FF08 76FF0A76 v..v..v.j..«....6..FÄ.Pj.hl..v.. 0000E0
E876FFEA 76FF0578 685016E4 468012C4 83000008 389A006A 0676FF08 76FF0A76 v..v..v.j..;....6..FÕ.Phx..võ.vò 000100
88260847 8826E45E C4026A00 6A0053E9 0375000B 7E830CC4 83000007 FE9A006A j..±....6..~Ä.u.ÕS.j.j.6^Õ&.G.&. 000120
00989713 26009687 03260A5E C40B9400 369A5052 02571826 072B26E4 5EC40A57 W.6^Õ&+.&.W.RP.6...6^.&....&.... 000140
EC468900 D2830032 05025713 26070326 E45EC400 88971326 00868703 260A5EC4 6^.&..Ñ.&..|.6^Õ&..&.W..2..@..Fš 000160
5202571B 26072B26 E45EC40A 57882608 47882 6E4 5EC4026A 006A0030 E9EE5689 .VŸÕ=.j.j.6^Õ&.G.&.W.6^Õ&+.&.W.R 000180
EC468902 57132607 0326E45E C4009897 13260096 8703260A 5EC40C3E 00369A50 P.6.>.6^.&....&....6^Õ&..&.W..Fš 0001A0
5689F046 89065713 26044703 26E45EC4 009C9788 26009A87 88260A5E C4EE5689 .VŸ6^.&....&....6^Õ&.G.&.W..Fþ.V 0001C0
8703260A 5EC4009C 97882600 9A878826 0A5EC4F6 5689F446 89EE5688 EC468BF2 ·.Fš.VŸ.F¶.V~6^.&....&....6^.&.. 0001E0
```

Dump of file SATURN:[PCCOMMON.DUMP.DLL]POLOGM.TMP;1 on 18-APR-1990 10:48:18.73
File ID (766,30,0)   End of file block 195 / Allocated 196

Virtual block number 11 (0000000B), 512 (0200) bytes

```
006A006A 5016EC46 8D026A00 6ADC76FF DE76FFFA 5689F846 89000C97 1326000A Õ.&..É..F%.V'.v8.vÉj.j..Fš.Pj.j. 000000
C40A5788 26084788 26E45EC4 026A006A 0063E903 7500087E 8300000C 7F9A016A j.......-Ä.u.Õc.j.j.6^Õ&.G.&.W.6 000020
E45EC400 98971326 00968703 260A5EC4 08E90036 9A505202 57182607 2826E45E ^Õ&+.&.W.RP.6.Õ.6^.&....&....6^Õ 000040
6ADC76FF DE76FFFA 5689F846 89F2568B F04688EE 5689EC46 89025713 26070326 &..&.W..Fš.VŸ.Fþ.V·.F%.V'.v8.vÉj 000060
1EC8CBC9 5F5E1F00 00E90000 88000009 FD9A016A 006A006A 5016EC46 8D026A00 .j..Fš.Pj.j.j..»...|..Õ...^_èùà. 000080
83FE5689 FC4689FE 578826FC 4788260E 5EC4040E 4683088E 0A14881E 56570000 ..WV.|...Ä.F..6^.&.G=&.W±.F=.V±. 0000A0
260A5EC4 000007C7 26F65EC4 F85689F6 4689FE57 8826FC47 88260E5E C4040E46 F..6^.&.G=&.W±.F~.V½6^~&ú...6^.& 0000C0
5EC402E6 C1FA768B FA46FF00 1AE90000 FA46C7F4 5689F246 8940578B 263E478B .G>&.Wa.F·.V¶úF'..Õ...F'.v'êl.6^ 0000E0
46800043 E903773C 473926FA 46880A5E C4F45689 F2468940 5088263E 4088260A .&.a>&.Pa.F·.V¶6^..F'&9G<w.ÕC..F 000100
16E2468D FC76FFFE 76FF0CC4 8300000A 309A006A F276FFF4 76FF2657 685016E2 ã.PhW&.v¶.v·j..O....6..v± v=.Fã. 000120
94E90009 E9000188 0006E903 75003F83 26F65EC4 0000FFFF 9AF676FF F876FF50 P.v%.v~.....6^-&.?.u.Õ..|. ^..Õ. 000140
260E5EC4 040E4683 D88E0C96 881E5657 000008C8 CBC95F5E 1F0000E9 000088FF .|..Õ...^_èùà...WV.|...Ä.F..6^.& 000160
08A66801 6A5016F8 4680F846 89FA4689 000088FE 5689FC46 89FE578B 26FC478B .G=&.W±.F=.V±|...F'.F%.F%.Pj.hl. 000180
06E90375 FA4608F8 468812C4 8300000A 4E9A006A 0676FF08 76FF0A76 FF0C76FF .v..v..v..v.j..N....6..F%.F'u.Õ. 0001A0
57000008 C8CBC95F 5E1F0000 E9000088 078926FC 5EC40000 880003E9 0001B800 .|..Õ..|..6^=&..|..Õ...^_èùà...W 0001C0
89000088 FE5689FC 4689FE57 8826FC47 88260E5E C4040E46 83D88E0D 64881E56 V.|d..Ä.F..6^.&.G=&.W±.F=.V±|... 0001E0
```

Dump of file SATURN:[PCCOMMON.DUMP.DLL]PDLDGM.TMP;1 on 18-APR-1990 10:48:18.73

```
File ID (766,30,0)   End of file block 195 / Allocated 196

Virtual block number 12 (0000000C), 512 (0200) bytes

 0D9F9A00 6A0676FF 0876FF0A 76FF0C76 FF08A668 026A5016 F8468DF8 4689FA46 F*.F½.F½.Pj.h!..v..v..v..v.j.... 000000
 B8078926 FC5EC400 00B80003 E90001B8 0006E903 75FA460B F8468812 C4830000 ...á..F½.F*u.Õ..¦..Õ..¦..á^=&..¦ 000020
 478B260E 5EC4040E 4683D88E 00D3881E 56570000 10C8CBC9 5F5E1F00 00E90000 ..Õ...^_èùà...WV.¦Æ..Ä.F..á^.&.G 000040
 08806850 16FC468D 07892602 47892600 00B8F05E C4F25689 F04689FE 578B26FC =&.W±.FÞ.V·á^Þ¦..&.G.&...F•.Ph¯. 000060
 00000A66 9A5016F4 468DFC76 FFFE76FF 0CC48300 000ECD9A 006A0676 FF0876FF .v..v.j..ë....á..v±.v•.F¶.P.f... 000080
 9A5016F6 468DFC76 FFFE76FF 00000511 9AFC76FF FE76FF00 68E90374 00F47E83 .-¶.t.Õh..v±.v•......v±.v•.F-.P. 0000A0
 000D1F9A 006AF676 FFF876FF 08836850 16FA468D 0045E903 7400003D 00000526 &...=..t.ÕE..F*.Ph°..v½.v-j..... 0000C0
 5688F646 88F05EC4 0000FFFF 9AFC76FF FE76FF00 21E90375 00FA7E83 0CC48300 ..á..-*.u.Õ!..v±.v•.....á^Þ.F-.V 0000E0
 000010C8 CBC95F5E 1F0000E9 0000B8FF A3E90009 E90000B8 02578926 078926F8 ½&..&.W.¦..Õ..ÕÈ.¦..Õ...^_èùà... 000100
 F05EC4F2 5689F046 89FE578B 26FC478B 260E5EC4 040E4683 D88E0E42 B81E5657 WV.¡B..Ä.F..á^.&.G=&.W±.FÞ.V·á^Þ 000120
 8300000F 9F9A006A 0676FF08 76FF08B1 685016FC 468D0789 26024789 26000088 ¦..&.G.&...F•.PhŸ..v..v.j....... 000140
 76FFFE76 FF0068E9 037400F4 7E830000 0E8C9A50 16F4468D FC76FFFE 76FF0CC4 á..v±.v•.F¶.P......-¶.t.Õh..v±.v 000160
 46800045 E9037400 00300000 0EB09A50 16F6468D FC76FFFE 76FF0000 0EA09AFC •......v±.v•.F-.P.¯...=..t.ÕE..F 000180
 FF0021E9 037500FA 7E830CC4 8300000E 799A006A F676FFF8 76FF0883 685016FA *.Ph°..v½.v-j..y....á..-*.u.Õ!.. 0001A0
 0009E900 00B80257 89260789 26F85688 F64688F0 5EC40000 0EE49AFC 76FFFE76 v±.v•.Õ...á^Þ.F-.V½&..&.W.¦..Õ.. 0001C0
 5EC4040E 4683D88E 0F14B81E 56570000 10C8CBC9 5F5E1F00 00E90000 B8FFA3E9 ÕÈ.¦..Õ...^_èùà...WV.¦...Ä.F..á^ 0001E0

Dump of file SATURN:[PCCOMMON.DUMP.DLL]PDLDGM.TMP;1 on 18-APR-1990 10:48:18.73
File ID (766,30,0)   End of file block 195 / Allocated 196

Virtual block number 13 (0000000D), 512 (0200) bytes

 16FC468D 07892602 47892600 00B8F05E C4F25689 F04689FE 578B26FC 478B260E .&.G=&.W±.FÞ.V·á^Þ¦..&.G.&...F•. 000000
 9A5016F4 468DFC76 FFFE76FF 0CC48300 0010719A 006A0676 FF0876FF 08B26850 Phÿ..v..v.j..q....á..v±.v•.F¶.P. 000020
 468DFC76 FFFE76FF 00000F72 9AFC76FF FE76FF00 68E90374 00F47E83 00000F5E ^....-¶.t.Õh..v±.v•.r....v±.v•.F 000040
 006AF676 FFF876FF 08836850 16FA468D 0045E903 7400003D 00000F82 9A5016F6 -.P.....=..t.ÕE..F*.Ph°..v½.v-j. 000060
 88F05EC4 00000FB6 9AFC76FF FE76FF00 21E90375 00FA7E83 0CC48300 000F4B9A .K....á..-*.u.Õ!..v±.v•.Ñ...á^Þ. 000080
 CBC95F5E 1F0000E9 0000B8FF A3E90009 E90000B8 02578926 078926F8 5688F646 F-.V½&..&.W.¦..Õ..ÕÈ.¦..Õ...^_èù 0000A0
 5689FC46 89FE578B 26FC478B 260E5EC4 040E4683 D88E0FE6 B81E5657 00000CC8 à...WV.¡I..Ä.F..á^.&.G=&.W±.F=.V 0000C0
 3B260A5E C400C897 132600C6 8703260A 5EC400C0 97882600 BE878826 0A5EC4FE ±á^.&../.&..á.á^.&..ó.&..à.á^.&; 0000E0
 86878826 00B8978B 26000AE9 03720086 873B2600 0AE9037D 0019E903 7E008897 .¦.-.Õ..).Õ..&;.Ñ.r.Õ..&..¦.&..Ñ 000100
 D8971326 00068703 260A5EC4 00D0978B 2600CE87 8B260A5E C4FA5689 F8468900 ..F½.V*á^.&..ö.&..Å.á^.&..ø.&..Ä 000120
 E90372F4 4638000B E9037D00 13E9037E F6563BFA 5688F846 88F65689 F4468900 ..F¶.V-.F½.V*;V--.Õ..).Õ..;F¶r.Õ 000140
 B7132600 E48F0326 0A5EC400 A0878826 009E8F8B 260A5EC4 F44688F6 56880006 ...V-.F¶á^.&....&.ñ..á^.&..õ.&.ñ 000160
 26078926 FC5EC4C1 88D68800 04E90372 C1380007 E9037D00 10E9037E D63800E6 Ì.;ø-.Õ..).Õ..;èr.Õ...ø.èá^=&..& 000180
 5EC4040E 4683D88E 10B8881E 56570000 08C8CBC9 5F5E1F00 00E90000 B8025789 .W.¦..Õ...^_èùà...WV.¦¦..Ä.F..á^ 0001A0
 260A5EC4 00BC978B 2600BAB7 8B260A5E C4FE5689 FC4689FE 578B26FC 478B260E .&.G=&.W±.F=.V±á^.&..¤.&..¥.á^.& 0001C0
 878B2600 CC978B26 000AE903 7700CA87 3B26000A E9037E00 19E9037D 00CC9738 ;.ä.).Õ..-.Õ..&;.ð.w.Õ..&..ä.&.. 0001E0

Dump of file SATURN:[PCCOMMON.DUMP.DLL]PDLDGM.TMP;1 on 18-APR-1990 10:48:18.73
File ID (766,30,0)   End of file block 195 / Allocated 196

Virtual block number 14 (0000000E), 512 (0200) bytes

 8826000A E9037700 DA873B26 000AE903 7E0019E9 037D000C 973B260A 5EC400CA ð.á^.&;.É.).Õ..-.Õ..&;.Ö.w.ú..&. 000000
 83D8F7FA 5688F846 880010E9 037C00FA 7E83FA56 89F84689 000A878B 26000C97 .É.&..Õ..F½.V*.-*.|.Õ...F½.V*½Ä. 000020
 26000AE9 037D0019 E9037E00 A4973B26 0A5EC4FA 5688F846 880006E9 DAF70002 ø.¾ÕÕ...F½.V*á^.&;.É.-.Õ..).Õ..& 000040
 00008802 57892607 8926FC5E C400A287 882600A4 97882600 0AE90372 00A2873B ;.Å.r.Õ..&..É.&..Å.á^=&..&.W.¦.. 000060
 26FC478B 260E5EC4 040E4683 D88E11A6 B81E5657 00000CC8 CBC95F5E 1F0000E9 Õ...^_èùà...WV.¡I..Ä.F..á^.&.G=& 000080
 C4830000 13139A00 6AFC76FF FE76FF26 49685016 F6468DFE 5689FC46 89FE578B .W±.F=.V±.F-.PhI&.v±.v•j.......á 0000A0
 B800021A 47C7260A 5EC400B7 E90000B8 00011A47 C7260A5E C400A3E9 F64688OC ..F-ÕÈ.á^.&úG...¦..Õñ.á^.&úG...¦ 0000C0
 00008800 021A47C7 260A5EC4 0099E900 00B80001 1A47C726 0A5EC400 A8E90000 ..Õ´.á^.&úG...¦..Õ..á^.&úG...¦.. 0000E0
 FC76FFFE 76FF2655 685016FB 468D007B E90000B8 00031A47 C7260A5E C4008AE9 Õ..á^.&úG...¦..Õ(..F½.PhU&.v±.v• 000100
 83000010 1D9A006A F876FFFA 76FF08B4 685016F4 468D0CC4 83000013 2B9A006A j..+....á..F¶.PhÇ..v*.v½j....... 000120
 2CE90000 B800041A 47C7260A 5EC4003B E90000B8 1A478926 F446880A 5EC40CC4 á.á^..F¶&.G.¦..Õ;.á^.&úG...¦..Õ, 000140
 E412D513 60A7FF2E 93C003FF ECE90376 00073000 012D0023 E90026E9 0001B800 .¦..Õ&.Õ#.-..=..v.Õ§..á...Im.f.Õ 000160
 4683D88E 1280B81E 56570000 08C8CBC9 5F5E1F13 0212C612 B7134213 0212F312 .µ...B.ñ.ó....^_èùà...WV.¦...Ä.F 000180
 FF260A5E C4057868 5016F846 8DFE5689 FC4689FE 578B26FC 478B260E 5EC4040E ..á^.&.G=&.W±.F=.V±.F½.Phx.á^.&. 0001A0
 8B260A5E C4008AE9 0375FA46 0BF84688 0CC48300 0012AA9A 006A3E77 FF264077 w@&.w>j..¨....á..F½.F*u.Õ..á^.&. 0001C0
 260A5EC4 02578926 078926FC 5EC40257 13260703 26F85EC4 0098978B 26009687 ...&....á^¥&..&.W.á^=&..&.W.á^.& 0001E0

Dump of file SATURN:[PCCOMMON.DUMP.DLL]PDLDGM.TMP;1 on 18-APR-1990 10:48:18.73
```

```
File ID (766,30,0)   End of file block 195 / Allocated 196

Virtual block number 15 (0000000F), 512 (0200) bytes

 C40A5789 26084789 26FC5EC4 0A571326 08470326 F85EC400 98978826 0096878B ....&....á^½&.G.&.W.á^=&.G.&.W.á 000000
 89260447 8926FC5E C4065713 26044703 26F85EC4 009C9788 26009A87 88260A5E ^.&....&....á^½&.G.&.W.á^=&.G.&. 000020
 478926FC 5EC40E57 13260C47 0326F85E C4009C97 8826009A 8788260A 5EC40657 W.á^.&....&....á^½&.G.&.W.á^=&.G 000040
 020E4683 D88E138A 881E5657 000012C8 CBC95F5E 1F0000E9 0000880E 5789260C .&.W.¡..Ő...^_èùà...WV.¡...Ä.F.. 000060
 C4F85689 F64689FE 578826FC 4788260E 5EC4040E 4683F046 89FE4788 260E5EC4 á^.&.G±.FÞ.F..á^.&.G=&.W±.F-.V½á 000080
 FE46C7F4 5689F246 89405788 263E4788 260A5EC4 07892602 47892600 0088F65E ^-¡..&.G.&..á^.&.G>&.Wə.F·.V¶úF± 0000A0
 C4F45689 F2468940 5088263E 4088260A 5EC402E6 C1FE768B FE46FF00 1AE90000 ..Ő...F±.v±ël.á^.&.ə>&.Pə.F·.V¶á 0000C0
 079A006A F276FFF4 76FF2655 685016FA 468D0054 E903773C 473926FE 46880A5E ^..F±&9G<w.ŐT..F*.PhU&.v¶.v·j... 0000E0
 46880CC4 83000013 B99A006A F276FFF4 76FF2649 685016EE 468D0CC4 83000015 ....á..FŸ.Ph!&.v¶.v·j..¿....á..F 000100
 E90009E9 0000B802 57892607 8926F456 88F2468B F65EC400 16E90374 F04639EE Ÿ9FÞt.Ő..á^-.F·.V¶&..&.W.¡..Ő..Ő 000120
 5EC40000 E246C7D8 8E1468B8 1E565700 003EC8C8 C95F5E1F 0000E900 0088FF83 ..¡..Ő...^_èùà>..WV.¡h..ÄúFã..á^ 000140
 4788260E 5EC4040E 46830000 CA46C7E6 5689E446 89009497 88260092 8788260A .&....&.....Fõ.V|úFò...F .á^.&.G 000160
 000015A4 9A006AE4 76FFE676 FF027968 50160046 80F65689 F44689FE 578826FC =&.W±.F¶.V-.FÅ.Phy..v|.v' '..É... 000180
 5016C246 800CC483 000015C2 9A006AE4 76FFE676 FF029D68 5016CC46 800CC483 .á..Fä.Ph...v|.vöj..ö....ı  Fö.P 0001A0
 89F6568B F4468B10 C4830000 16979A00 6ACC76FF CE76FF27 1668D476 FFD676FF .vø.våh.'.vö.väj.......á..F¶.V-. 0001C0
 17E90375 00187F83 26F05EC4 D846FF1E F0468300 07E90000 D846C7F2 5689F046 FÞ.V·úFÄ..Ő...FÞ..FÄá^Þ&....u.Ő. 0001E0

Dump of file SATURN:[PCCOMMON.DUMP.DLL]PDLDGM.TMP;1 on 18-APR-1990 10:48:18.73
File ID (766,30,0)   End of file block 195 / Allocated 196

Virtual block number 16 (00000010), 512 (0200) bytes

 5BE9E056 89DE4689 00E28300 02251C57 88261A47 8826F05E C4005AE9 C2468801 ..FöŐZ.á^Þ&.G.&.W.%...ã..FB.VÄŐ( 000000
 8826F05E C40041E9 E05689DE 468900E2 83000425 1C578826 1A478826 F05EC400 .á^Þ&.G.&.W.%...ã..FB.VÄŐA.á^Þ&. 000020
 18E9DE46 89E04689 00008800 27E9E056 89DE4689 00E28300 08251C57 88261A47 G.&.W.%...ã..FB.VÄŐ'.¡...FÅ.FBŐ. 000040
 08DE468B FFD9E9FF C2E90375 00503DFF 96E90375 003230FF B8E90375 00313D00 .=1.u.Ő¡.=2.u.Ő..=P.u.Őö.Ő)..FB. 000060
 76FF08A6 68016A50 16DA468D 0038E903 75101A47 F626F05E C4008EE9 0374E046 FÅt.Ő..á^Þ&-G..u.Ő8..FÖ.Pj.h!..v 000080
 FFDC76FF 26606850 52001605 F25688F0 46880EC4 83000016 B59A006A CC76FFCE ö.väj..ç....á..FÞ.V·...RPh'&.vÉ. 0000A0
 F276FF06 76FF0876 FF5016E2 468D0076 FFD276FF 0CC48300 0014EF9A 006ADA76 vÖj..ÿ....á..vø.vÅ.Fã.P.v..v..v· 0000C0
 18C48300 00FFFF9A 006A2F6A 5052003E 050C5688 0A460302 E0C1CA46 88F076FF .vÞ.FòêÅ..F..V..>.RPj/j.......á. 0000E0
 8926CA46 880A5EC4 FED5E901 2DE9C846 880006E9 037500C8 7E83CA46 FFC84689 .Fà.Fò.-à.u.Ő...FàŐ-.Ő!±á^..Fò&. 000100
 6A5016C4 468D0CC4 83000017 439A006A E476FFE6 76FF027F 68501604 468D3C47 G<.Få.Ph...v|.vöj..C....á..Fá.Pj 000120
 6A5016FC 468D12C4 83000017 8C9A006A 0676FF08 76FF2712 68D476FF 0676FF08 ..vø.våh.'.v..v.j.......á..F•.Pj 000140
 FE4608FC 468812C4 83000017 E89A006A 0676FF08 76FF0A76 FF0C76FF 08A66804 .h!..v..v..v..v.j..Ő....á..F•.F± 000160
 000017C8 9A006AFC 76FFFE76 FF057868 5016F846 8D0087E9 00008800 06E90374 t.Ő..¡..Őñ..F½.Phx..v±.v•j..à... 000180
 08470126 C65688C4 4688F85E C4025711 26070126 C65688C4 4688F85E C40CC483 .á.á^½.Fá.Vá&..&.W.á^½.Fá.Vá&.G. 0001A0
 8D0EC483 00001811 9A006AFC 76FFFE76 FF265068 F876FFFA 76FF036A 0A571126 &.W.j..v*.v½hP&.v±.v•j.......á.. 0001C0
 8812C483 00000E0E 9A006A06 76FF0876 FF0A76FF 0C76FF08 A668086A 5016EC46 Fš.Pj.h!..v..v..v..v.j.......á.. 0001E0

Dump of file SATURN:[PCCOMMON.DUMP.DLL]PDLDGM.TMP;1 on 18-APR-1990 10:48:18.73
File ID (766,30,0)   End of file block 195 / Allocated 196

Virtual block number 17 (00000011), 512 (0200) bytes

 006AEC76 FFEE76FF 05786850 16E8468D 0032E900 00880006 E90374EE 4608EC46 Fš.FŸt.Ő..¡..Ő2..FÒ.Phx..vŸ.všj. 000000
 E90000B8 02578926 078926E8 5EC40257 88260788 26F85EC4 0CC48300 00158C9A ......á.á^½&..&.W.á^Ő&..&.W.¡..Ő 000020
 00949788 26009287 88260A5E C4D88E15 45881E56 57000048 C8C8C95F 5E1F0000 ...^_èùàH..WV.¡E..Äá^.&....&.... 000040
 02796850 160E468D F64689F8 46890000 88E64689 E8468900 0088F256 89F04689 .FÞ.V̄·¡...FÒ.F|¡...F½.F-.FB.Phy. 000060
 76FF0A76 FF0C76FF 08A06850 16E6468D 0CC48300 0018FE9A 006AF076 FFF276FF .v·.vÞj..±....á..F|.Ph...v..v..v 000080
 FF0876FF 0A76FF0C 76FF08A1 685016F6 468D10C4 83000018 B59A006A 0676FF08 ..v.j..ç....á..F-.PhÅ..v..v..v.. 0000A0
 0018E29A 5016CA46 8D3077FF 263277FF 260A5EC4 10C48300 001AD39A 006A0676 v.j..&....á.á^.&.w2&.w0.Fò.P.ā.. 0000C0
 5EC4027F 685016EA 468D0000 10309A50 1688468D 3477FF26 3677FF26 0A5EC400 .á^.&.wá&.w4.F¡.P.0....Fõ.Ph..á^ 0000E0
 EA76FFEC 76FF5016 FC468D0C C4830000 191C9A00 6A0092B7 FF260094 B7FF260A .&.ñ..&.ñ..j.......á..F•.P.vš.võ 000100
 468D5016 CC468DFC 76FFFE76 FF10C483 00001A10 9A006A06 76FF0876 FF271068 h.'.v..v.j.......á..v±.v•.Fä.P.F 000120
 06E90375 26470826 24478826 0A5EC400 16E90374 00CC7E83 0000FFFF 9A5016FA *.P......-ä.t.Ő..á^.&.G$&.G&u.Ő. 000140
 8788260A 5EC4D056 89CE4689 00989788 26009687 88260A5E C4018CE9 0001B800 .¡..Ő..á^.&....&.....Fö.VÅá^.&.. 000160
 8788260A 5EC4D856 89D64689 00A09713 26009E87 03260A5E C4009897 88260096 ..&....á^.&....&.....Fø.VÅá^.&.. 000180
 8703260A 5EC4009C 97882600 9A878826 0A5EC4D4 56890246 89009C97 8826009A ..&.....Fø.Våá^.&....&....á^.&.. 0001A0
 46C7E456 89E24689 40578826 3E478826 0A5EC4DC 56890A46 8900A497 132600A2 Å.&..É..FÖ.VÉá^.&.G>&.Wə.Fã.VöúF 0001C0
 E45689E2 46894050 88263E40 88260A5E C402E6C1 EE7688EE 46FF001A E90000EE Ÿ..Ő...FŸ.vŸël.á^.&.ə>&.Pə.Fã.Vő 0001E0

Dump of file SATURN:[PCCOMMON.DUMP.DLL]PDLDGM.TMP;1 on 18-APR-1990 10:48:18.73
```

```
File ID (766,30,0)   End of file block 195 / Allocated 196

Virtual block number 18 (00000012), 512 (0200) bytes

9A006AE2 76FFE476 FF266168 50168A46 8D000EE9 03773C47 3926EE46 8B0A5EC4 6^..FY&9G<w.Õß..Fn.Pha&.\ .vãj.. 000000
830CC483 00001AB4 9A006AE2 76FFE476 FF264968 5016F446 8D0CC483 00001A28 (....6..F¶.Ph1&.vÕ.vãj..Ç....á.. 000020
0033E903 75001E7F 83260A5E C40040E9 0375E846 08E6468B 0021E903 7406F47E -¶.t.Õ!..Fl.FÒu.Õa.6^.&....u.Õ3. 000040
0A5EC400 16E90375 F8460BF6 46880024 E9037407 F47E8300 2AE90374 00CA7E83 .-Ь.t.Õ*..-¶.t.Õ$..F-.F½u.Õ..6^. 000060
470B2624 478B260A 5EC40054 E90003E9 0375008B 7E830009 E9037500 207F8326 &.. .u.Õ...~j.u.Õ..ÕT.6^.&.G$&.G 000080
76FFE476 FF032068 DE76FFE0 76FFFF34 E90003E9 037404F4 7E83000C E9037426 &t.Õ...~¶.t.Õ..Õ4..vÅ.vßh ..vÕ.v 0000A0
0676FF08 76FF0A76 FF0C76FF 08CC68E2 76FFE476 FF0CC483 00001723 9A006AE2 ãj..#....á..vÕ.vãhä..v..v..v..v. 0000C0
881E5657 000010C8 CBC95F5E 1F0000E9 000088FE F9E910C4 83000017 639A006A j..c....á.Õ*±j..Õ...^_èùà...WV.¡ 0000E0
0E5EC404 0E4683FC 5689FA46 89FE5788 26FC4788 260E5EC4 040E4683 D88E183F ?..Ä.F..6^.&.G=&.W±.FT.V=.F..6^. 000100
8B260A5E C4078926 02478926 00008BF0 5EC4F256 89F04689 FE578826 FC478826 &.G•&.W±.FÞ.V·6^Þj..&.G.&..6^.&. 000120
0A5EC402 E6C1F876 8BF846FF 001AE900 01F846C7 F65689F4 46894457 8B264247 GB&.WD.F¶.V-úF½..Õ...F½.v½ê1.6^. 000140
FE468D00 5AE90377 3C473926 F846880A 5EC4F656 89F44689 40508826 3E408826 &.a>&.Pa.F¶.V-6^..F½&9G<w.ÕZ..F± 000160
FFFC76FF 009687FF 260098B7 FF260A5E C4009AB7 FF26009C B7FF260A 5EC45016 .P6^.&.ñ..&.ñ..6^.&.ñ..&.ñ...v•. 000180
5EC40016 E9037500 FE7E8318 C4830000 1BFD9A00 6AF476FF F676FF26 4A68FA76 v*hJ&.v-.v¶j..»....6..-±.u.Õ..6^ 0001A0
260A5EC4 5016FE46 8DFF7DE9 0064E900 00880257 89260789 26F6568B F4468BF0 Þ.F¶.V-&..&.W.¡..Õd.Õ)..F±.P6^.& 0001C0
C4264A68 FA76FFFC 76FF0096 B7FF2600 9887FF26 0A5EC400 9A87FF26 009CB7FF .ñ..&.ñ..6^.&.ñ..&.ñ...v•.v*hJ&6 0001E0

Dump of file SATURN:[PCCOMMON.DUMP.DLL]PDLDGM.TMP;1 on 18-APR-1990 10:48:18.73
File ID (766,30,0)   End of file block 195 / Allocated 196

Virtual block number 19 (00000013), 512 (0200) bytes

0A5EC400 15E90375 00FE7E83 18C48300 0018799A 006A3E77 FF264077 FF260A5E ^.&.wa&.w>j..y....6..-±.u.Õ..6^. 000000
0010C8C8 C95F5E1F 0000E900 00880257 89260789 26F05EC4 40578826 3E478826 &.G>&.Wa6^Þ&..&.W.¡..Õ...^_èùà.. 000020
4683FA56 89F84689 FE578826 FC478826 0E5EC404 0E468308 8E1AF088 1E565700 .WV.¡Þ..Ä.F..6^.&.G=&.W±.F½.V*.F 000040
07892602 47892600 0088F05E C4F25689 F04689FE 578826FC 4788260E 5EC4040E ..6^.&.G=&.W±.FÞ.V·6^Þj..&.G.&.. 000060
C1FC7688 FC46FF00 1AE90001 FC46C7F6 5689F446 89445788 264247BB 260A5EC4 6^.&.GB&.WD.F¶.V-úF•..Õ...F•.v•è 000080
E903773C 473926FC 46880A5E C4F65689 F4468940 508B263E 408B260A 5EC402E6 ].6^.&.a>&.Pa.F¶.V-6^..F•&9G<w.Õ 0000A0
9687FF26 00988 7FF 260A5EC4 009AB7FF 26009CB7 FF260A5E C45016FE 468D005A Z..F±.P6^.&.ñ..&.ñ..6^.&.ñ..&.ñ. 0000C0
037500FE 7E8318C4 8300001D 429A006A F476FFF6 76FF265E 68F876FF FA76FF00 ..v*.v½h^&.v-.v¶j..B....6..-±.u. 0000E0
16FE468D FF7DE900 64E90000 B8025789 26078926 F6568BF4 468BF05E C40016E9 Õ..6^Þ.F¶.V-&..&.W.¡..Õd.Õ)..F±. 000100
76FFFA76 FF009687 FF260098 B7FF260A 5EC4009A B7FF2600 9CB7FF26 0A5EC450 P6^.&.ñ..&.ñ..6^.&.ñ..&.ñ...v*.v 000120
E9037500 FE7E8318 C4830000 1B9E9A00 6A3E77FF 264077FF 260A5EC4 265E68F8 ½h^&6^.&.wa&.w>j.......6..-±.u.Õ 000140
5F5E1F00 00E90000 B8025789 26078926 F05EC440 5788263E 4788260A 5EC40015 ..6^.&.G>&.Wa6^Þ&..&.W.¡..Õ...^  000160
F84689FE 578826FC 4788260E 5EC4040E 4683088E 1C35881E 56570000 1CC8CBC9 èùà...WV.¡5..Ä.F..6^.&.G=&.W±.F½ 000180
08A56850 16E8468D FE5689FC 4689FE57 8826FC47 88260E5E C4040E46 83FA5689 .V*.F..6^.&.G=&.W±.F•.V±.FÒ.PhÉ. 0001A0
16E8468D F876FFFA 76FF10C4 83000018 979A006A 0676FF08 76FF0A76 FF0C76FF .v..v..v..v.j.......6..v*.v½.FÒ. 0001C0
1E565700 000EC8CB C95F5E1F 0000E900 00FFFF9A 5016E446 8DFC76FF FE76FF50 P.v±.v•.FÕ.P.....Õ...^_èùà...WV. 0001E0

Dump of file SATURN:[PCCOMMON.DUMP.DLL]PDLDGM.TMP;1 on 18-APR-1990 10:48:18.73
File ID (766,30,0)   End of file block 195 / Allocated 196

Virtual block number 20 (00000014), 512 (0200) bytes

685016FC 468DF656 89F44689 FE578826 FC478826 0E5EC404 0E4683D8 8E1D7A88 ¡z..Ä.F..6^.&.G=&.W±.F¶.V-.F•.Ph 000000
7500F27E 83F24689 10C48300 001E519A 006A0676 FF0876FF 0A76FF0C 76FF08A3 È..v..v..v..v.j..Q....6..F·.-·.u 000020
006A0676 FF0876FF 0A76FF0C 76FF08A4 685016F8 468D00AE E9F2468B 0006E903 .Õ...F·ÕÜ..F½.PhÉ..v..v..v..v.j. 000040
878B260A 5EC4007E E9F2468B 0006E903 7500F27E 83F24689 10C48300 001DBF9A .«....6..F·.-·.u.Õ...F·Õ~.6^.&.. 000060
462B009C 978B2600 9A878826 0A5EC402 57892607 8926F45E C4009897 8B260096 ..&....6^¶&..&.W.6^.&....&....+F 000080
13FC4603 009897BB 26009687 8B260A5E C4065789 26044789 26F45EC4 FA5618F8 ½.V*6^¶&.G.&.W.6^.&....&.....F•. 0000A0
8703260A 5EC4009C 978B2600 9A878826 0A5EC40A 57892608 478926F4 5EC4FE56 V±6^¶&.G.&.W.6^.&....&....6^.&.. 0000C0
0070C8CB C95F5E1F 0000E900 00880E57 89260C47 8926F45E C400A497 132600A2 Å.&..Ê.6^¶&.G.&.W.¡..Õ...^_èùàp. 0000E0
50169446 8DFC4689 FE468900 0088F846 89FA4689 000088D8 8E1DF188 1E565700 .WV.¡Þ..Ä¡...F*.F½¡...F±.F=.F..P 000100
478B260A 5EC40CC4 8300001F 7D9A006A 009287FF 260094B7 FF260A5E C4027968 hy.6^.&.ñ..&.ñ..j..)....6.6^.&.G 000120
260A5EC4 02E6C1E4 7688E446 FF001AE9 0000E446 C7925689 90468944 57882642 B&.WD.F..V.úFÕ..Õ...FÕ.vÕèl.6^.& 000140
16F6468D 00AEE903 773C4739 26E4468B 0A5EC492 56899046 89405088 263E4088 .a>&.Pa.F..V.6^..FÕ&9G<w.ÕÜ..F-. 000160
FFB3E900 03E90375 03F67E83 0CC48300 001CE39A 006A9076 FF9276FF 26496850 Ph1&.v..v.j..D....6..—.u.Õ..Õ*. 000180
9476FF96 76FF0EC4 8300001F 239A006A 9076FF92 76FF2663 68501698 46804C6A jL.F..Phc&.v..v.j..#....6..v..v. 0001A0
F05688EE 46880000 FFFF9A50 16E6468D 046A5016 F84680 1E 6A006A50 16984680 .F..Pj.j..F½.Pj..Fl.P......FY.VÞ 0001C0
3826000A E9037E00 2EE9037D 00E69738 260A5EC4 00D28300 5005E856 18E6462B +Fl.VÕ.P..ø.6^.&;.l.).Õ..~.Õ..&; 0001E0

Dump of file SATURN:[PCCOMMON.DUMP.DLL]PDLDGM.TMP;1 on 18-APR-1990 10:48:18.73
```

File ID (766,30,0) End of file block 195 / Allocated 196

Virtual block number 21 (00000015), 512 (0200) bytes

```
87892600 02830050 05E85618 E6462BF0 5688EE46 880A5EC4 001FE903 7700E487 .ð.w.ð..á^..FŸ.Vb+Fl.Vò.P..@.&.. 000000
8E1EF588 1E565700 0022C8CB C95F5E1F 0000E900 00B8FF29 E900E697 892600E4 ð.&..l.ð).¡..ð...^_èùà"..WV.¡%.. 000020
FF0C76FF 088D680C C4830000 20739A00 6A0676FF 0876FF08 B5685016 EC4680D8 Ä.Fš.Phç..v..v.j..š ...á.h§..v.. 000040
EC76FFEE 76FF0279 685016E6 46800CC4 83000020 D09A006A 0676FF08 76FF0A76 v..v..v.j..Å ...á..Fl.Phy..vŸ.vš 000060
FF0876FF 088F6850 16FA468D 5016F046 8D5016F6 46800CC4 83000020 959A006A j... ...á..F-.P.Fb.P.F'.Phe..v.. 000080
76FF088E 685016E0 46805016 FE468D50 160E468D 14C48300 0020879A 006A0676 v.j..ñ ...á..Fß.P.F±.P.FÁ.Phƒ..v 0000A0
9A006A06 76FF0876 FF0A76FF 0C76FF08 F96814C4 83000021 3E9A006A 0676FF08 ..v.j..>l...á.h'..v..v..v..v.j.. 0000C0
E90375FC 460BFA46 88000021 829A5016 F4468DFA 76FFFC76 FF0CC483 00001E21 l....á..v•.v'.F¶.P.ÿl...F'.F•u.ð 0000E0
FF000021 DA9AFA76 FFFC76FF 00A2E903 7500E07E 8300A8E9 037400F4 7E8300B4 Ç..~¶.t.ð¨..~Á.u.ðÀ..v•.v'.ðl... 000100
FFE476FF 5016EA46 80007FE9 03740000 30000021 EA9A5016 E24680FA 76FFFC76 v•.v'.Fã.P.ðl..=..t.ð...Fð.P.vð. 000120
76FFE476 FF08EA68 EA76FF10 C4830000 21549A00 6AEC76FF EE76FF02 8768E276 vãh...vŸ.všj..Tl...á..vðhð..vð.v 000140
9A006AE2 76FFE476 FF08C068 003FE903 7500EA7E 830AC483 00002170 9A006AE2 ãj..pl...á..~ð.u.ð?.hâ..vð.vãj.. 000160
E276FFE4 76FF08C4 83000021 9C9A006A E276FFE4 76FF08AB 6808C483 00002183 .l...á.h¨..vð.vãj...l...á..vð.vã 000180
16F4468D F076FFF2 76FFFF69 E90CC483 0000220D 9A006A06 76FF0876 FF08C368 hû..v..v.j..."...á.ði..v·.vb.F¶. 0001A0
037500FE 7E83008E E9037400 F47E8300 C7E90375 F2460BF0 46880000 22949A50 P.."...Fb.F·u.ðú..~¶.t.ð/..~±.u. 0001C0
003D0000 22CC9A50 16E2468D F076FFF2 76FF0000 22BC9AF0 76FFF276 FF0085E9 ðç..v·.vb.¥"...v·.vb.Fã.P.ä"..=. 0001E0
```

Dump of file SATURN:[PCCOMMON.DUMP.DLL]PDLDGM.TMP;1 on 18-APR-1990 10:48:18.73
File ID (766,30,0) End of file block 195 / Allocated 196

Virtual block number 22 (00000016), 512 (0200) bytes

```
0022239A 006AEC76 FFEE76FF 028768E2 76FFE476 FF5016EA 4680007F E9037400 .t.ð...Fð.P.vð.vãh...vŸ.všj..#". 000000
037500EA 7E830AC4 83000022 3F9A006A E276FFE4 76FF08EA 68EA76FF 10C48300 ..á..vðhð..vð.vãj..?"...á..-ð.u. 000020
6AE276FF E476FF08 AB6808C4 83000022 529A006A E276FFE4 76FF08C1 68003FE9 ð?.hė..vð.vãj..R"...á.h¨..vð.vãj 000040
83000022 819A006A 0676FF08 76FF08C4 68E276FF E476FF08 C4830000 22689A00 ..k"...á..vð.vãhá..v..v.j..."... 000060
468DF676 FFF876FF 08C48300 0022E49A 006A0676 FF0876FF 08C668FF 69E90CC4 á.ði.hó..v..v.j..ð"...á..v½.v-.F 000080
000E7E83 005BE903 7400F47E 830064E9 0375F846 08F64688 000018CD 9A5016F4 ¶.P.ë....F-.F½u.ðd..-¶.t.ð[..~B. 0000A0
00001054 9A5016E2 468DF676 FFF876FF 00001044 9AF676FF F876FF00 52E90375 u.ðR..v½.v-.D....v½.v-.Fã.P.T... 0000C0
76FFE476 FF08C483 000022FD 9A006AE2 76FFE476 FF08C268 002FE903 7400003D =..t.ð/.hò..vð.vãj..»"...á..vð.v 0000E0
5F5E1F00 00E90000 88FFB9E9 0CC48300 001FA39A 006A0676 FF0876FF 08C568E2 ãhé..v..v.j..È....á.ð¿.¡..ð...^ 000100
5689F646 89009497 88260092 8788260A 5EC4D88E 202D881E 56570000 1CC8C8C9 èùà...WV.¡- .Áá^.&....&.....F-.V̄ 000120
76FF0279 685016F2 4680FE56 89FC4689 FE578826 FC478826 0E5EC404 0E4683F8 ½.F..á^.&.G=&.W±.F•.V±.F·.Phy..v 000140
5016E446 8D02D1E9 0375001C 7F83260A 5EC40CC4 83000023 829A006A F676FFF8 ½.v-j...#...á.á^.&....u.ðl..Fð.P 000160
E9037500 E47E8310 C4830000 23BE9A00 6A0676FF 0876FF08 9968FC76 FFFE76FF .v±.v=h...v..v.j..ƒ#...á..-ð.u.ð 000180
FFF476FF 00968 7FF 26009887 FF260A5E C4009AB7 FF26009C 87FF260A 5EC40036 6.á^.&.ñ..&.ñ..á^.&.ñ..&.ñ...v¶. 0001A0
009A878B 260A5EC4 0061E914 C4830000 20429A00 6A0676FF 0876FF03 2068F276 v·h ..v..v.j..B ...á.ða.á^.&.... 0001C0
037E0035 E9037D06 573826FC 5EC400A4 97132600 A2870326 0A5EC400 9C978826 &....á^.&..Å.&..Ê.á^=&;W.).ð5.-. 0001E0
```

Dump of file SATURN:[PCCOMMON.DUMP.DLL]PDLDGM.TMP;1 on 18-APR-1990 10:48:18.73
File ID (766,30,0) End of file block 195 / Allocated 196

Virtual block number 23 (00000017), 512 (0200) bytes

```
7D009897 39260A5E C40A5788 2608478B 26FC5EC4 0027E903 7304473B 260009E9 ð..&;G.s.ð'.á^=&.G.&.W.á^.&9...) 000000
3277FF26 0A5EC402 19E90000 880006E9 03770096 87392600 0AE9037E 0015E903 .ð..~.ð..&9...w.ð..¡..ð..á^.&.w2 000020
7E83008B E9037532 47082630 4788260A 5EC40000 24EA9A50 16FA468D 3077FF26 &.w0.F'.P.ð$..á^.&.G0&.G2u.ð...- 000040
9A3077FF 263277FF 260A5EC4 0075E903 75001E7F 83260A5E C40082E9 037400FA '.t.ð..á^.&....u.ðu.á^.&.w2&.w0. 000060
2FE90374 00003D00 0025359A 5016EA46 8D3077FF 263277FF 260A5EC4 00002520 %..á^.&.w2&.w0.Fð.P.5%..=..t.ð/ 000080
EC76FF08 AC68FC76 FFFE76FF 08C48300 0024869A 006AEA76 FFEC76FF 089A6800 .h...vš.vðj..Ñ$...á..v±.v=h¯..vš 0000A0
6A0676FF 0876FF0A 76FF0C76 FF089D68 FF84E90C C4830000 25409A00 6AEA76FF .vðj..M%...á.ðÇ.h...v..v..v..v.j 0000C0
5EC40000 259A9A50 16FA468D 3477FF26 3677FF26 0A5EC40C C4830000 25829A00 ...%...á.á^.&.w6&.w4.F'.P..%..á^ 0000E0
7500207F 83260A5E C40082E9 037400FA 7E83008B E9037536 47082634 4788260A .&.G4&.G6u.ð...-'.t.ð..á^.&.. .u 000100
8D3477FF 263677FF 260A5EC4 000025C3 9A3477FF 263677FF 260A5EC4 0075E903 .ðu.á^.&.w6&.w4.ü%..á^.&.w6&.w4. 000120
0025669A 006AEA76 FFEC76FF 089A6800 2FE90374 00003D00 0025D89A 5016EA46 Fð.P.Ä%..=..t.ð/.h...vš.vðj..f%. 000140
FF84E90C C4830000 25F09A00 6AEA76FF EC76FF08 AC68FC76 FFFE76FF 08C48300 ..á..v±.v=h¯..vš.vðj..þ%...á.ðÇ. 000160
3A77FF26 0A5EC40C C4830000 20589A00 6A0676FF 0876FF0A 76FF0C76 FF089E68 h...v..v..v..v.j..[ ...á.á^.&.w: 000180
7E83008E E903753A 47082638 4788260A 5EC40000 20E39A50 16FA468D 3877FF26 &.w8.F'.P.D ..á^.&.G8&.G:u.ð...- 0001A0
FF263A77 FF260A5E C4000021 089A3877 FF263A77 FF260A5E C40085E9 037400FA '.t.ð..á^.&.w:&.w8..l..á^.&.w:&. 0001C0
9A006AEA 76FFEC76 FF089A68 0058E903 7400003D 0000211B 9A5016EA 46803877 w8.Fð.P..l..=..t.ðX.h...vš.vðj.. 0001E0
```

Dump of file SATURN:[PCCOMMON.DUMP.DLL]PDLDGM.TMP;1 on 18-APR-1990 10:48:18.73

File ID (766,30,0) End of file block 195 / Allocated 196

Virtual block number 24 (00000018), 512 (0200) bytes

```
0026329A 006AEA76 FFEC76FF 08AD6850 16EE4680 5016E646 8D08C483 00002600 .&...á..F|.P.FŸ.PhÙ..vš.võj..2&. 000000
6AEA76FF EC76FF03 2068F276 FFF476FF EE76FFF0 76FFE676 FFE876FF 10C48300 ..á..vÒ.vl.vÞ.vŸ.v¶.v·h ..vš.võj 000020
1AB81E56 57000018 C8CBC95F 5E1F0000 E9000088 FF88E914 C4830000 23579A00 ..W#...á.Õ..¡..Õ...^_èùà...WV.¡. 000040
0374031A 7F83260A 5EC4FE56 89FC4689 00949788 26009287 8B260A5E C4D88E23 #.Äá^.&....&.....F=.V±á^.&....t. 000060
5EC40321 68FC76FF FE76FF00 23E90375 0090870B 26008E87 8B260A5E C40035E9 ÕS.á^.&....&....u.Õ#..v±.v=h!.á^ 000080
02796850 16E84680 0098E90C C4830000 26B99A00 6A008EB7 FF260090 B7FF260A .&.ñ..&.ñ..j..¿&...á.Õ...FÒ.Phy. 0000A0
EC468900 98978826 00968788 260A5EC4 0CC48300 00249D9A 006AFC76 FFFE76FF .v±.v=j...$...á.á^.&....&.....F$ 0000C0
8B260096 8788260A 5EC4F256 89F04689 009C9788 26009A87 8B260A5E C4EE5689 .VŸá^.&....&.....FÞ.V·á^.&....&. 0000E0
8B26009A 8788260A 5EC4F656 89F44689 00A09713 26009E87 03260A5E C4009897 ...á^.&....&.....F¶.V-á^.&....&. 000100
16EC468D E876FFEA 76FFFA56 89F84689 00A49713 2600A287 03260A5E C4009C97 ...á^.&..Å.&..Ê..F½.V'.võ.vÒ.F$. 000120
8E264FB8 1E565700 0018C8CB C95F5E1F 0000E900 00880000 FFFF9A08 6A086A50 Pj.j......¡..Õ...^_èùà...WV.¡O&. 000140
35E90374 031A7F83 260A5EC4 FE5689FC 46890094 97882600 92878826 0A5EC4D8 Äá^.&....&.....F=.V±á^.&....t.ÕS 000160
260A5EC4 032768FC 76FFFE76 FF0023E9 03750090 87082600 8E878826 0A5EC400 .á^.&....&....u.Õ#..v±.v=h'.á^.& 000180
76FF0279 685016E8 46800094 E90CC483 000027B7 9A006A00 8EB7FF26 009087FF .ñ..&.ñ..j..ñ'...á.Õ...FÒ.Phy..v 0001A0
5689EC46 89009897 88260096 8788260A 5EC40CC4 83000026 9E9A006A FC76FFFE ±.v=j...&...á.á^.&....&.....F$.V 0001C0
98978826 00968788 260A5EC4 F25689F0 4689009C 97882600 9A878826 0A5EC4EE Ÿá^.&....&.....FÞ.V·á^.&....&... 0001E0
```

Dump of file SATURN:[PCCOMMON.DUMP.DLL]PDLDGM.TMP;1 on 18-APR-1990 10:48:18.73
File ID (766,30,0) End of file block 195 / Allocated 196

Virtual block number 25 (00000019), 512 (0200) bytes

```
9C978826 009A8788 260A5EC4 F65689F4 468900A0 97132600 9E870326 0A5EC400 .á^.&....&.....F¶.V-á^.&....&... 000000
9A5016EC 468DE876 FFEA76FF FA5689F8 468900A4 97132600 A2870326 0A5EC400 .á^.&..Å.&..Ê..F½.V'.võ.vÒ.F$.P. 000020
C4040E46 83D88E27 4D881E56 57000014 C8CBC95F 5E1F0000 E9000088 0000FFFF ....¡..Õ...^_èùà...WV.¡M'.Ä.F..á 000040
F8468900 94978826 00928788 260A5EC4 F45689F2 4689FE57 8826FC47 88260E5E ^.&.G=&.W±.F¯.V¶á^.&....&.....F½ 000060
C4830000 28F49A00 6A0676FF 0876FF27 1068F276 FFF476FF 5016FC46 8DFA5689 .V'.F=.P.v¶.v·h.'.v..v.j..¶(...á 000080
F646FF00 1AE90000 F646C7F0 5689EE46 89405788 263E4788 260A5EC4 EC468910 ..F$á^.&.G>&.W@.FŸ.VÞúF-..Õ...F- 0000A0
473926F6 46880A5E C4F05689 EE468940 5088263E 4088260A 5EC402E6 C1F67688 .v-èl.á^.&.@>&.P@.FŸ.VÞá^..F-&9G 0000C0
76FFF076 FF265168 F876FFFA 76FFFC76 FFFE76FF F276FFF4 76FF003A E903773C <w.Õ:..v¶.v·.v±.v=.v'.v½hQ&.vÞ.v 0000E0
FF9DE900 09E9EC46 880006E9 037500EC 7E83EC46 8914C483 0000279C 9A006AEE Ÿj...'...á..F$.~$.u.Õ...F$Õ..Õ.. 000100
8B260E5E C4040E46 83D88E28 47881E56 57000008 C8CBC95F 5E1F0000 E9EC4688 .F$Õ...^_èùà...WV.¡G(.Ä.F..á^.&. 000120
5689FC46 89FE5788 26FC4788 260E5EC4 040E4683 FA5689F8 4689FE57 8826FC47 G=&.W±.F%.V'.F..á^.&.G=&.W±.F=.V 000140
009A8788 260A5EC4 02578926 078926F8 5EC40098 97882600 96878826 0A5EC4FE ±á^.&....&....á^½&..&.W.á^.&.... 000160
56570000 04C8CBC9 5F5E1F00 00E90000 B8025789 26078926 FC5EC400 9C978826 &....á^=&..&.W.¡..Õ...^_èùà...WV 000180
8B260A5E C4FE5689 FC4689FE 578826FC 4788260E 5EC4040E 4683D88E 2923881E .¡#).Ä.F..á^.&.G=&.W±.F=.V±á^.&. 0001A0
0004C8CB C95F5E1F 0000E900 00880257 89260789 26FC5EC4 00A09788 26009E87 ...&....á^=&..&.W.¡..Õ...^_èùà.. 0001C0
5EC4FE56 89FC4689 FE578826 FC478826 0E5EC404 0E4683D8 8E299288 1E565700 .WV.¡.).Ä.F..á^.&.G=&.W±.F=.V±á^ 0001E0
```

Dump of file SATURN:[PCCOMMON.DUMP.DLL]PDLDGM.TMP;1 on 18-APR-1990 10:48:18.73
File ID (766,30,0) End of file block 195 / Allocated 196

Virtual block number 26 (0000001A), 512 (0200) bytes

```
C8C95F5E 1F0000E9 00008802 57892607 8926FC5E C400A497 8B2600A2 8788260A .&..Å.&..Ê.á^=&..&.W.¡..Õ...^_èù 000000
5689F846 89FE5788 26FC4788 260E5EC4 040E4683 D88E2905 881E5657 000008C8 à...WV.¡().Ä.F..á^.&.G=&.W±.F%.V 000020
8B2600CE 8788260A 5EC4FE56 89FC4689 FE578826 FC478826 0E5EC404 0E4683FA °.F..á^.&.G=&.W±.F=.V±á^.&..ö.&. 000040
078926FC 5EC400C0 97882600 8E878826 0A5EC402 57892607 8926F85E C4000097 .Å.á^½&..&.W.á^.&..ƒ.&..à.á^=&.. 000060
C4040E46 83D88E2A 18881E56 57000004 C8CBC95F 5E1F0000 E9000088 02578926 &.W.¡..Õ...^_èùà...WV.¡.°.Ä.F..á 000080
8926FC5E C4325788 26304788 260A5EC4 FE5689FC 4689FE57 8826FC47 88260E5E ^.&.G=&.W±.F=.V±á^.&.GO&.W2á^=&. 0000A0
040E4683 D88E2A87 881E5657 000004C8 CBC95F5E 1F0000E9 00008802 57892607 .&.W.¡..Õ...^_èùà...WV.¡.°.Ä.F.. 0000C0
26FC5EC4 36578826 34478826 0A5EC4FE 5689FC46 89FE5788 26FC4788 260E5EC4 á^.&.G=&.W±.F=.V±á^.&.G4&.W6á^=& 0000E0
0E4683D8 8E2AC888 1E565700 0004C8CB C95F5E1F 0000E900 00880257 89260789 ..&.W.¡..Õ...^_èùà...WV.¡à°.Ä.F. 000100
FC5EC43A 57882638 4788260A 5EC4FE56 89FC4689 FE578826 FC478826 0E5EC404 .á^.&.G=&.W±.F=.V±á^.&.G8&.W:á^= 000120
4683D88E 2B09881E 56570000 04C8CBC9 5F5E1F00 00E90000 B8025789 26078926 &..&.W.¡..Õ...^_èùà...WV.¡.+.Ä.F 000140
078926FC 5EC41C47 88260A5E C4FE5689 FC4689FE 578826FC 4788260E 5EC4040E ..á^.&.G=&.W±.F=.V±á^.&.G.á^=&.. 000160
88260E5E C4020E46 83D88E28 4A881E56 57000000 C8CBC95F 5E1F0000 E9000088 ¡..Õ...^_èùà...WV.¡J+.Ä.F..á^.&. 000180
D88E2883 881E5657 000004C8 C8C95F5E 1F0000E9 0000881C 4789260A 5EC4FE47 G±á^.&.G.¡..Õ...^_èùà...WV.¡.+.Ä 0001A0
26FC5EC4 1A478826 0A5EC4FE 5689FC46 89FE5788 26FC4788 260E5EC4 040E4683 .F..á^.&.G=&.W±.F=.V±á^.$.G.á^=& 0001C0
0E5EC404 0E468308 8E2BAC88 1E565700 0004C8CB C95F5E1F 0000E900 00880789 ..¡..Õ...^_èùà...WV.¡¯+.. F..á^. 0001E0
```

Dump of file SATURN:[PCCOMMON.DUMP.DLL]PDLDGM.TMP;1 on 18-APR-1990 10:48:18.73

```
File ID (766,30,0)   End of file block 195 / Allocated 196

Virtual block number 27 (0000001B), 512 (0200) bytes

 8926FC5E C4009497 88260092 8788260A 5EC4FE56 89FC4689 FE578826 FC478826 &.G=&.W±.F=.V±á^.&....&....á^=&. 000000
 040E4683 D88E2BE5 881E5657 000004C8 CBC95F5E 1F0000E9 00008802 57892607 .&.W.¡..Õ...^_èùà...WV.¡|+.Ä.F.. 000020
 89262447 8926FE56 8BFC4688 0A5EC4FE 5689FC46 89FE578B 26FC478B 260E5EC4 á^.&.G=&.W±.F=.V±á^..F=.V±&.G$&. 000040
 0E5EC404 0E4683D8 8E2C2888 1E565700 0004C8CB C95F5E1F 0000E900 00882657 W&¡..Õ...^_èùà...WV.¡(,.Ä.F..á^. 000060
 26078926 FC5EC426 57882624 4788260A 5EC4FE56 89FC4689 FE578826 FC478826 &.G=&.W±.F=.V±á^.&.G$&.W&á^=&..& 000080
 5EC4040E 46830888E 2C65881E 56570000 04C8CBC9 5F5E1F00 00E90000 88025789 .W.¡..Õ...^_èùà...WV.¡e,.Ä.F..á^ 0000A0
 2A578926 28478926 FE5688FC 46880A5E C4FE5689 FC4689FE 578826FC 4788260E .&.G=&.W±.F=.V±á^..F=.V±&.G(&.W* 0000C0
 88260E5E C4040E46 83D88E2C A6881E56 57000004 C8CBC95F 5E1F0000 E9000088 ¡..Õ...^_èùà...WV.¡Î,.Ä.F..á^.&. 0000E0
 0000882E 5789262C 478926FE 5688FC46 880A5EC4 FE5689FC 4689FE57 8826FC47 G=&.W±.F=.V±á^..F=.V±&.G,&.W.¡.. 000100
 89FE4788 260E5EC4 020E4683 D88E2CE3 881E5657 000002C8 CBC95F5E 1F0000E9 Õ...^_èùà...WV.¡D,.Ä.F..á^.&.G±. 000120
 20881E56 57000002 C8CBC95F 5E1F0000 E9000088 1E478926 FE46880A 5EC4FE46 F±á^..F±&.G.¡..Õ...^_èùà...WV.¡ 000140
 00E90000 88204789 26FE4688 0A5EC4FE 4689FE47 88260E5E C4020E46 83D88E2D -.Ä.F..á^.&.G±.F±á^..F±&.G ¡..Õ. 000160
 87892600 88878926 0000880A 5EC4D88E 2D4F881E 56570000 00C8CBC9 5F5E1F00 ..^_èùà...WV.¡O-.Äá^.¡..&..¡.&.. 000180
 87892600 D8878926 0000880A 5EC400BA 87892600 BC878926 0000880A 5EC400B6 Ñ.á^.¡..&..¥.&..¤.á^.¡..&..Ä.&.. 0001A0
 87892600 C8878926 0000880A 5EC400DA 87892600 DC878926 0000880A 5EC400D6 ø.á^.¡..&..É.&..Ö.á^.¡..&..à.&.. 0001C0
 000CC8CB C95F5E1F 0000E900 008800CA 87892600 CC878926 0000880A 5EC400C6 6.á^.¡..&..ä.&..ò.¡..Õ...^_èùà.. 0001E0

Dump of file SATURN:[PCCOMMON.DUMP.DLL]PDLDGM.TMP;1 on 18-APR-1990 10:48:18.73
File ID (766,30,0)   End of file block 195 / Allocated 196

Virtual block number 28 (0000001C), 512 (0200) bytes

 4683FE56 89FC4689 FE578826 FC478826 0E5EC404 0E4683D8 8E2D7E88 1E565700 .WV.¡~-.Ä.F..á^.&.G=&.W±.F=.V±.F 000000
 8826FC47 88260E5E C4040E46 83FA5689 F84689FE 578826FC 4788260E 5EC4040E ..á^.&.G=&.W±.F½.V'.F..á^.&.G=&. 000020
 26F85EC4 20478826 0A5EC407 8926FC5E C41E4788 260A5EC4 F65689F4 4689FE57 W±.F¶.V-á^.&.G.á^=&..á^.&.G á^½& 000040
 56570000 0CC8CBC9 5F5E1F00 00E90000 88078926 F45EC422 4788260A 5EC40789 ..á^.&.G"á^¶&..¡..Õ...^_èùà...WV 000060
 C4040E46 83FE5689 FC4689FE 578826FC 4788260E 5EC4040E 4683D88E 2DF5881E .¡%-.Ä.F..á^.&.G=&.W±.F=.V±.F..á 000080
 89FE578B 26FC4788 260E5EC4 040E4683 F65689F4 4689FE57 8826FC47 88260E5E ^.&.G=&.W±.F¶.V-.F..á^.&.G=&.W±. 0000A0
 4788260A 5EC40257 89260789 26FC5EC4 32578826 30478826 0A5EC4FA 5689F846 F½.V'á^.&.G0&.W2á^=&..&.W.á^.&.G 0000C0
 078926F8 5EC43A57 88263847 88260A5E C4025789 26078926 F45EC436 57882634 4&.W6á^¶&..&.W.á^.&.G8&.W.á^½&.. 0000E0
 46890000 88D88E2E 72881E56 57000026 C8CBC95F 5E1F0000 E9000088 02578926 &.W.¡..Õ...^_èùà&..WV.¡r..ˊ  ..F 000100
 0088FE56 89FC4689 26578826 24478826 0A5EC4E4 4689E646 89000088 F44689F6 -.F¶¡...F!.Fõá^.&.G$&.W&.F=.V±¡. 000120
 E8685016 E84680F0 4689F246 89000088 EC4689EE 46890000 88E84689 EA468900 ..Fõ.FÒ¡...FŸ.Fš¡...F·.Fÿ.FÒ.PhŠ 000140
 E90375EA 4608E846 8810C483 00003059 9A006A06 76FF0876 FF0A76FF 0C76FF08 ..v..v..v..v.j..Y0...á..FÒ.Fõu.Õ 000160
 E0978826 000E8788 260A5EC4 0010E903 7500E087 0826000E 8788260A 5EC40074 t.á^.&..8.&..Ä.u.Õ..á^.&..8.&..Ä 000180
 006AE876 FFEA76FF 08A46850 16E4468D DE56890C 4689FFFF BAFF9C88 0006E900 .Õ..¡..¤...FÉ.V8.Fõ.PhÊ..võ.vÒj. 0001A0
 5016F446 80E65689 E446890A F7000283 D8F7E656 88E44688 0CC48300 002FDC9A .É/...á..Fõ.V¦¼Ä.ø.¼Õ.Fõ.V¦.F¶.P 0001C0
 0826000E 8788260A 5EC4002E E90CC483 00003027 9A006AE8 76FFEA76 FF08C968 hè..võ.vÒj..'0...á.Õ..á^.&..8.&. 0001E0

Dump of file SATURN:[PCCOMMON.DUMP.DLL]PDLDGM.TMP;1 on 18-APR-1990 10:48:18.73
File ID (766,30,0)   End of file block 195 / Allocated 196

Virtual block number 29 (0000001D), 512 (0200) bytes

 4689FFFF BAFF9C88 0006E900 E0978826 000E8788 260A5EC4 0010E903 7500E087 .Ä.u.Õ..á^.&..8.&..Ä.Õ..¡..¤...F 000000
 46890EC4 83000030 839A006A FC76FFFE 76FF08A6 68016A50 16F0468D DE56890C É.V8.Fÿ.Pj.h!..v±.v=j...0...á..F 000020
 0A76FF0C 76FF08A6 68046A50 16EC468D 00EFE9DA 46880006 E9037500 DA7E830A Õ.-Õ.u.Õ...FÕÕÿ..Fš.Pj.h!..v..v. 000040
 E9DA4688 0006E903 7500DA7E 830A4689 12C48300 0024D29A 006A0676 FF0876FF .v..v.j..ø$...á..FÕ.-Õ.u.Õ...FÕÕ 000060
 DA7E830A 46890CC4 83000030 AD9A006A F076FFF2 76FF0578 685016F8 46800080 §..F½.Phx..v·.vÿj..Ú0...á..FÕ.-Õ 000080
 00288A9A 006AEC76 FFEE76FF 05786850 16E04680 0093E9DA 46880006 E9037500 .u.Õ...FÕÕ...FÅ.Phx..vŸ.všj...(. 0000A0
 478826F8 5EC4026A 006A0069 E9DA4688 0006E903 75000A7E 830A4689 0CC48300 ..á..FÕ.-Õ.u.Õ...FÕÕi.j.j.á^½&.G 0000C0
 02571826 072826E0 5EC40841 00369A50 52025713 26070326 F85EC40A 57882608 .&.W.á^½&..&.W.RP.6.A.á^Å&+.&.W. 0000E0
 00A49718 2600A287 28260A5E C4E65688 E4468800 A8978926 00A68789 260A5EC4 á^.&..!.&..ˊ..Fõ.V¦á^.&+.Ä.&..É. 000100
 1F0000E9 DA468800 AC978926 00AA8789 260A5EC4 DE5613DC 4603F656 13F44603 .F¶.V-.FÉ.V8á^.&..ˊ.&..ˉ..FÕÕ... 000120
 89EA4689 000088F0 4689F246 89000088 D88E2F07 881E5657 000026C8 CBC95F5E ^_èùà&..WV.¡./.Ä¡...F·.Fÿ¡...Fõ. 000140
 000088F6 5689F446 89265788 26244788 260A5EC4 FFFFDE46 C7FF9CDC 46C7E846 FÕúFÉ..úF8..á^.&.G$&.W&.F¶.V-¡.. 000160
 08E86850 16EC468D FC4689FE 46890000 88E04689 E2468900 0088EC46 89EE4689 .FŸ.Fš¡...Fã.FÅ¡...F±.F=.Fš.PhŠ. 000180
 4DE90375 EE4608EC 468810C4 83000032 6D9A006A 0676FF08 76FF0A76 FF0C76FF .v..v..v..v.j..m2...á..F$.FŸu.ÕM 0001A0
 000031F7 9A006AEC 76FFEE76 FF08A468 5016E846 8DFFFFDE 46C7FF9C DC46C700 .úFÉ..úF8...FÒ.PhÊ..vŸ.všj..%1.. 0001C0
 76FF08C9 685016F0 4680EA56 89E84689 DAF70002 8308F7EA 5688E846 880CC483 .á..FÒ.Võ¼Ä.ø.¼Õ.FÒ.Võ.Fÿ.Phè..v 0001E0

Dump of file SATURN:[PCCOMMON.DUMP.DLL]PDLDGM.TMP;1 on 18-APR-1990 10:48:18.73
```

File ID (766,30,0)   End of file block 195 / Allocated 196

Virtual block number 30 (0000001E), 512 (0200) bytes

006AF476 FFF676FF 08A66802 6A5016E0 46800CC4 83000032 119A006A EC76FFEE Ÿ.všj...2...ó..FÅ.Pj.hl..v¬.v¶j. 000000
685016E4 468D00CB E9DA468B 0006E903 7500DA7E 830A4689 0EC48300 003238 9A .;2...á..FÖ.~Ö.u.Ö...FÖÖù..FÖ.Ph 000020
468B0006 E9037500 DA7E83DA 46890CC4 83000032 859A006A E076FFE2 76FF0578 x..vã.vÅj...2...ó..FÖ.~Ö.u.Ö...F 000040
002F609A 006A0676 FF0876FF 0A76FF0C 76FF08A6 68046A50 16FC468D 00A1E9DA ÖÖÅ..F=.Pj.hl..v..v..v..v.j..'/. 000060
026A006A 0CC48300 002FB19A 006AFC76 FFFE76FF 05786850 16F8468D 12C48300 ..ó..F½.Phx..v±.v=j..Ÿ/...ó.j.j. 000080
26F85EC4 30E40036 9A505202 57132607 0326E45E C40A578B 2608478B 26E45EC4 ó^Ö&.G.&.W.ó^Ö&..&.W.RP.6.0Öó^½& 0000A0
A2872B26 0A5EC4EA 5688E846 8800A897 892600A6 8789260A 5EC40257 1826072B +.&.W.ó^.&..l.&..'..FÒ.Võó^.&+.Å 0000C0
8800AC97 892600AA 8789260A 5EC4DE56 130C4603 F25613F0 460300A4 97182600 .&..É..Fþ.V·.FÉ.VBó^.&..`.&..¯.¡ 0000E0
8826008E 878B260A 5EC4088E 313CB81E 56570000 08C8CBC9 5F5E1F00 00E90000 ..Ö...^_èùà...WV.¡<1.Äó^.&....&. 000100
C4830000 31CC9A00 6AFC76FF FE76FF05 78685016 F8468DFE 5689FC46 89009097 ....F=.V±.F½.Phx..v±.v=j..ël...ó 000120
C400A897 892600A6 8789260A 5EC40002 83003205 0A578826 08478826 F85EC40C .ó^½&.G.&.W..2..Ø.ó^.&..l.&..`.ó 000140
5F5E1F00 00E90000 8800AC97 892600AA 8789260A 5EC40657 88260447 8826F85E ^½&.G.&.W.ó^.&..`.&..¯.¡..Ö...^ 000160
EE4689FE 578826FC 4788260E 5EC4040E 4683D88E 3302881E 56570000 2AC8CBC9 èùà*..WV.¡.3.Ä.F..ó^.&.G=&.W±.FŸ 000180
5016D646 800CC483 000033BC 9A006AEE 76FFF076 FF08A368 5016DE46 8DF05689 .Vþ.F8.PhÉ..vþ.vŸj..¥3...ó..Fø.P 0001A0
DAF70002 83D8F7D8 5688D646 880CC483 000033E7 9A006AEE 76FFF076 FF08A468 hÉ..vþ.vŸj..Ó3...ó..Fø.VÄ¼Ä.Ø.¼Ö 0001C0
46800CC4 83000033 FF9A006A EE76FFF0 76FF0883 685016FA 46800856 89064689 .Fø.VÄ.Fª.Ph°..vþ.vŸj...³...ó..F 0001E0

Dump of file SATURN:[PCCOMMON.DUMP.DLL]PDLDGM.TMP;1 on 18-APR-1990 10:48:18.73
File ID (766,30,0)   End of file block 195 / Allocated 196

Virtual block number 31 (0000001F), 512 (0200) bytes

76FF08C9 685016E6 46800CC4 83000034 179A006A EE76FFF0 76FF08AE 685016E2 ã.PhÛ..vþ.vŸj...4...ó..Fl.Phè..v 000000
CE9A006A EE76FFF0 76FF08C8 685016EA 46800CC4 83000034 2F9A006A EE76FFF0 Þ.vŸj../4...ó..Fõ.Phà..vþ.vŸj..ö 000020
5613E246 03EC5613 EA4603E0 5688DE46 880069E9 037500FA 7E830CC4 83000034 4...ó..¬ª.u.Öi..F8.VÅ.Fõ.Vš.Fã.V 000040
0A5EC400 1FE90377 00B6873B 26000AE9 037E002E E9037D00 88973826 0A5EC4E4 Öó^.&;.¡.).Õ..¬.Õ..&;.Ñ.w.Õ..ó^. 000060
880A5EC4 00889789 26008687 8926E456 13E24603 EC5613EA 4603E056 880E4688 .F8.VÅ.Fõ.Vš.Fã.VÖ&..Ñ.&..¡.ó^.. 000080
5688E646 880A5EC4 0013E900 BC978926 008A8789 26085613 D64603E8 5688E646 Fl.VÒ.Fø.VÄ&..¤.&..¥.Õ..ó^..Fl.V 0000A0
34F19A00 6A0676FF 0876FF08 A668066A 5016FC46 8D008C97 8926008A 878926E8 Ò&..¤.&..¥..F=.Pj.hl..v..v.j..þ4 0000C0
006AFC76 FFFE76FF 05786850 160A468D 00FCE903 75FE460B FC46880E C4830000 ...ó..F=.F±u.Õ=..FÖ.Phx..v±.v=j. 0000E0
83000035 239A006A 0676FF08 76FF08A6 68016A50 16F6468D 0CC48300 0035089A ..5...ó..F-.Pj.hl..v..v.j..#5... 000100
5EC4026A 006A0CC4 83000033 2A9A006A F676FFF8 76FF0578 685016F2 46800EC4 ó..F·.Phx..v½.v¬j..*3...ó.j.j.ó^ 000120
0789260A 5EC432AA 00369A50 52025713 26070326 F25EC40A 578B2608 478B26F2 ·&.G.&.W.ó^·&..&.W.RP.6.¯2ó^Ö&.. 000140
C40A5789 26084789 260A5EC4 00028300 28050257 8B26078B 260A5EC4 02578926 &.W.ó^Ö&..&.W..(..Ø.ó^Ö&.G.&.W.ó 000160
DA5EC40E 5789260C 4789260A 5EC4000A 8300642D 008C978B 26008A87 88260A5E ^.&..¤.&..¥.-d..Ö.ó^Ö&.G.&.W.ó^Ö 000180
76FFDC76 FF036A06 57892604 4789260A 5EC4000A 8300282D 0E578826 0C478826 &.G.&.W.-(..Ö.ó^Ö&.G.&.W.j..vÉ.v 0001A0
C406578B 2604478B 260A5EC4 0EC48300 0033A49A 006AFC76 FFFE76FF 2650680A ÖhP&.v±.v=j..É3...ó.ó^Ö&.G.&.W.ó 0001C0
7AB81E56 57000032 C8CBC95F 5E1F0000 E90000B8 008C9789 26008A87 89260A5E ^.&..¤.&..¥.¡..Õ...^_èùà2..WV.¡z 0001E0

Dump of file SATURN:[PCCOMMON.DUMP.DLL]PDLDGM.TMP;1 on 18-APR-1990 10:48:18.73
File ID (766,30,0)   End of file block 195 / Allocated 196

Virtual block number 32 (00000020), 512 (0200) bytes

08468D00 010246C7 EE5689EC 4689FE57 8826FC47 88260E5E C4040E46 83D88E33 3.Ä.F..ó^.&.G=&.W±.Fš.VŸúFØ...FÄ 000000
EE76FF08 A4685016 CE46800C C4830000 36369A00 6AEC76FF EE76FF08 A3685016 .PhÈ..vŸ.všj..66...ó..Fö.PhÉ..vŸ 000020
D05689CE 46890AF7 00028308 F7D05688 CE46880C C4830000 36619A00 6AEC76FF .všj..a6...ó..Fö.VÄ¼Ä.Ø.¼Ö.Fö.VÅ 000040
08AE6850 160C468D 0CC48300 0036799A 006AEC76 FFEE76FF 08836850 16FE468D .F±.Ph°..vŸ.všj..y6...ó..FÉ.PhÙ. 000060
006AEC76 FFEE76FF 08C96850 16E0468D 0CC48300 0036919A 006AEC76 FFEE76FF .vŸ.všj...6...ó..FÅ.Phè..vŸ.všj. 000080
0CC48300 0037489A 006AEC76 FFEE76FF 08C86850 16E4468D 0CC48300 0036A99A .`6...ó..Fõ.Phà..vŸ.všj..H7...ó. 0000A0
38260A5E C4DE5613 DC4603E6 5613E446 03DA568B D8468B00 69E90375 00FE7E83 .~±.u.Õi..FÄ.VÖ.FÕ.Vl.FÉ.VBó^.&; 0000C0
DA5688D8 46880A5E C4001FE9 03770006 87382600 0AE9037E 002EE903 7D000897 .Ä.).Õ..¬.Õ..&;.ø.w.Õ..ó^..FÄ.VÖ 0000E0
03E25688 E04688 0A 5EC40008 97892600 D6878926 DE56130C 4603E656 13E44603 .FÕ.Vl.FÉ.VÅ&..ø.&..Ä.ó^..FÄ.Vã. 000100
000A8789 26E25688 E046880A 5EC40013 E9000C97 8926000A 87892600 5613CE46 Fö.VÄ&..Ö.&..É.Õ..ó^..FÄ.Vã&..Ö. 000120
800EC483 00003762 9A006A06 76FF0876 FF08A668 076A5016 F6468D00 0C978926 &..É..F-.Pj.hl..v..v.j..b7...ó.. 000140
58685016 F44680 0E C4830000 377A9A00 6A0676FF 0876FF08 A668016A 5016FA46 Fª.Pj.hl..v..v.j..z7...ó..F¶.Ph( 000160
16044680 015EE903 75F8460B F646880C C4830000 37909A00 6AFA76FF FC76FF26 &.v=.vªj...7...ó..F-.F¥u.Õ^..Få. 000180
76FF08A6 68026A50 16F0468D 0CC48300 0037879A 006AF676 FFF876FF 05786850 Phx..v½.v¬j..ñ7...ó..Fþ.Pj.hl..v 0001A0
CB9A006A F076FFF2 76FF0578 685016E8 46800EC4 83000037 CF9A006A 0676FF08 ..v.j..ü7...ó..FÒ.Phx..v·.vþj..ù 0001C0
46803077 FF263277 FF260A5E C40015E9 0375001E 7F83260A 5EC40CC4 83000038 8...ó.ó^.&....u.Õ..ó^.&.w2&.w0.F 0001E0

Dump of file SATURN:[PCCOMMON.DUMP.DLL]PDLDGM.TMP;1 on 18-APR-1990 10:48:18.73

```
File ID (766,30,0)   End of file block 195 / Allocated 196

Virtual block number 33 (00000021), 512 (0200) bytes

 0000BA00 32B80009 E9037400 D27E8300 12E90375 00F47E83 0000243A 9A5016D2 ●.P.:$...~¶.u.Õ...~●.t.Õ..¡2.□.. 000000
 1B260F2B 26E85EC4 0A778B26 084F8B26 E85EC402 6A006A00 008A0000 880006E9 Õ..¡..□..j.j.á^Ò&.O.&.w.á^Ò&+.&. 000020
 5EC400B8 97132600 B6870326 0A5EC4D7 13C60335 4800369A FA8BF08B 51560277 w.VQ.Þ.ª.6.H5.6.■á^.&..Ñ.&..¡.á^ 000040
 83002805 02578B26 07882604 5EC40257 89260789 26045EC4 02571326 070326E8 Ò&..&.W.á^â&..&.W.á^â&..&.W..(.. 000060
 00DA8300 6420000C 978B2600 DA878B26 0A5EC40A 57892608 47892604 5EC400D2 ●.á^â&.G.&.W.á^.&..Õ.&..É.-d..Õ. 000080
 26045EC4 000A8300 282D0E57 8B260C47 8B26045E C40E5789 260C4789 26045EC4 á^â&.G.&.W.á^â&.G.&.W.·(..Õ.á^â& 0000A0
 83000035 8D9A006A F676FFF8 76FF2650 680476FF D676FF03 6A065789 26044789 .G.&.W.j..vø.vâhP&.v½.v-j..§5... 0000C0
 0000E900 00B8000C 97892600 DA878926 0A5EC406 57882604 47882604 5EC40EC4 á.á^â&.G.&.W.á^.&..Õ.&..É.¡..Õ.. 0000E0
 FE578B26 FC478B26 0E5EC404 0E4683D8 8E35EF88 1E565700 000CC8C8 C95F5E1F .^_èùà...WV.¡ÿ5.Ä.F..á^.&.G=&.W± 000100
 468D0CC4 83000039 3F9A006A FC76FFFE 76FF08AE 685016F4 468DFE56 89FC4689 .F=.V±.F¶.PhÛ..v±.v•j..?9...á..F 000120
 13F44603 FA568BF8 46880CC4 83000036 1E9A006A FC76FFFE 76FF08C8 685016F8 ½.Phà..v±.v•j...6...á..F½.Vª.F¶. 000140
 5EC40019 E9037700 C6873B26 000AE903 7E0028E9 037D00C8 973B260A 5EC4F656 V-á^.&;.à.).Õ(.-.Õ..&;.6.w.Õ..á^ 000160
 5F5E1F00 00E90000 8800C897 892600C6 878926F6 5613F446 03FA568B F84688 0A ..F½.Vª.F¶.V-&..6.&..à.¡..Õ...^_ 000180
 FF0876FF 0A76FF0C 76FF0880 685016FC 4680D88E 38FD881E 56570000 06C8CBC9 èùà...WV.¡»8.Ä.F=.Ph¯..v..v..v.¯ 0001A0
 00FA7E83 000037F4 9A5016FA 4680FC76 FFFE76FF 10C48300 00319F9A 006A0676 v.j...1...á..v±.v=.Fª.P.¶7...-ª. 0001C0
 05008897 8B260086 878B260A 5EC40023 E9037500 1E7F8326 0A5EC400 30E90374 t.Õ0.á^.&....u.Õ#.á^.&..Ñ.&..¡.. 0001E0

Dump of file SATURN:[PCCOMMON.DUMP.DLL]PDLDGM.TMP;1 on 18-APR-1990 10:48:18.73
File ID (766,30,0)   End of file block 195 / Allocated 196

Virtual block number 34 (00000022), 512 (0200) bytes

 00008789 26000088 0A5EC400 10E900D0 97892600 CE878926 0A5EC400 D2830032 2..●.á^.&..ö.&..Ä.Õ..á^.¡..&..Ä. 000000
 040E4683 D88E399A 881E5657 000004C8 CBC95F5E 1F0000E9 0000B800 CE878926 &..ö.¡..Õ...^_èùà...WV.|.9.Ä.F.. 000020
 5EC400A8 978B2600 A6878B26 0A5EC4FE 5689FC46 89FE578B 26FC478B 260E5EC4 á^.&.G=&.W±.F=.V±á^.&..|.&..¯.á^ 000040
 83088E3A 28881E56 57000004 C8C8C95F 5E1F0000 E90000B8 02578926 078926FC =&..&.W.¡..Õ...^_èùà...WV.¡(:.Ä. 000060
 AC978B26 00AA878B 260A5EC4 FE5689FC 4689FE57 8826FC47 88260E5E C4040E46 F..á^.&.G=&.W±.F=.V±á^.&..¯.&..¯ 000080
 3A68881E 56570000 18C8C8C9 5F5E1F00 00E90000 B8025789 26078926 FC5EC400 .á^•&..&.W.¡..Õ...^_èùà...WV.¡k: 0000A0
 F04689F2 46890000 88EA5689 E84689FE 578B26FC 478B260E 5EC4040E 4683D88E .Ä.F..á^.&.G=&.W±.FÕ.VÕj...F·.FÞ 0000C0
 8300003B 639A006A E876FFEA 76FF08BF 685016FC 46805016 F4468050 16F8468D .F½.P.F¶.P.F=.Ph¢..vÕ.vÒj..c;... 0000E0
 8300003B B69A006A 0676FF08 76FF0A76 FF0C76FF 08A66801 6A5016F0 468D14C4 á..FÞ.Pj.h!..v..v..v..v.j..Ñ;... 000100
 76FF3257 89263047 8926FE56 88FC468B 0A5EC400 80E90375 F24608F0 468812C4 á..FÞ.F·u.Õ..á^..F=.V±&.GÕ&.W2.v 000120
 35E90374 00003D00 0038F09A 5016EC46 8DFC76FF FE76FF00 003BE09A FC76FFFE ±.v=.Ä;...v±.v=.Fš.P.Þ;..=..t.Õ5 000140
 0676FF08 76FF0CC4 8300003B 7C9A006A EC76FFEE 76FF08CE 68F076FF F276FF00 ..v·.vÞhö..vŸ.vše..|;...á..v..v. 000160
 EA76FF08 E568006A 006AFFB3 E90CC483 00003B96 9A006AEC 76FFEE76 FF08B668 hÑ..vŸ.všj...;...á.Õª.j.j.h!..vÕ 000180
 0876FF0A 76FF0C76 FF08A668 026A5016 F0468D0C C4830000 3C0E9A00 6AE876FF .vÒj...<...á..FÞ.Pj.h!..v..v..v. 0001A0
 568BF446 880A5EC4 0080E903 75F2460B F0468812 C4830000 39859A00 6A0676FF .v.j..ç9...á..FÞ.F·u.Õ..á^..F¶.V 0001C0
 9A5016EC 468DF476 FFF676FF 00002470 9AF476FF F676FF36 57892634 478926F6 -&.G4&.W6.v-.v¶.p$...v-.v¶.Fš.P. 0001E0

Dump of file SATURN:[PCCOMMON.DUMP.DLL]PDLDGM.TMP;1 on 18-APR-1990 10:48:18.73
File ID (766,30,0)   End of file block 195 / Allocated 196

Virtual block number 35 (00000023), 512 (0200) bytes

 3C279A00 6AEC76FF EE76FF08 CE68F076 FFF276FF 0035E903 7400003D 00002485 .$..=..t.Õ5..v·.vÞhö..vŸ.vše..'< 000000
 83E90CC4 8300003C 419A006A EC76FFEE 76FF0886 680676FF 0876FF0C C4830000 ...á..v..v.hÑ..vŸ.všj..A<...á.Õª 000020
 5E1F0000 E90000B8 0CC48300 0039279A 006AE876 FFEA76FF 08E66800 6A006AFF .j.j.h!..vÕ.vÒj..'9...á.¡..Õ...^ 000040
 4689FE57 8826FC47 88260E5E C4040E46 83D88E3A AE881E56 5700000E C8C8C95F  èùà...WV.¡Û:.Ä.F..á^.&.G=&.W±.F 000060
 FF027F68 5016F446 8DFE5689 FC468900 94978B26 00928788 260A5EC4 FA5689F8 ½.Vªá^.&....&.....F=.V±.F¶.Ph... 000080
 080168F4 76FFF676 FFF876FF FA76FF01 6A0CC483 00003CEA 9A006AFC 76FFFE76 v±.v•j..Õ<...á.j..vª.v½.v-.v¶hî. 0000A0
 E9037500 F27E83F2 468916C4 8300003B 089A006A 0676FF08 76FF0A76 FF0C76FF .v..v..v..v.j...;...á..F·.-·.u.Õ 0000C0
 C4830000 3AE89A00 6AF876FF FA76FF08 E7680676 FF0876FF 0034E9F2 46880006 ...F·Õ4..v..v.hÕ..vª.v½j..Š:...á 0000E0
 C95F5E1F 0000E90C C4830000 04679A00 6A0676FF 0876FFF4 76FFF676 FF016A0C .j..v-.v¶.v..v.j..g....á.Õ...^_è 000100
 578B26FC 478B260E 5EC4040E 46830000 DC46C7D8 8E3C5B88 1E565700 0024C8C8 ùà$..WV.¡[<.ÄúFÉ...F..á^.&.G=&.W 000120
 679A006A 009287FF 260094B7 FF260A5E C4027968 5016E646 80E45689 E24689FE ±.Fã.VÕ.F|.Phy.á^.&.ñ..&.ñ..j..g 000140
 468D0CC4 8300003D 7F9A006A E276FFE4 76FF2649 685016FA 468D0CC4 83000030 =...á..Fª.Ph!&.vÕ.vãj...=...á..F 000160
 76FF0578 685016DE 468D0CC4 8300003D 979A006A E276FFE4 76FF2655 685016FC =.PhU&.vÕ.vãj...=...á..F8.Phx..v 000180
 98978B26 00968788 260A5EC4 0089E9FA 46880CC4 8300003C 989A006A E276FFE4 Õ.vãj...<...á..FªÕ..á^.&....&... 0001A0
 FF2600A4 B7FF260A 5EC4026A 006AEC56 89EA4689 0A571326 08470326 DE5EC400 .á^8&.G.&.W..FÕ.Všj.j.á^.&.ñÉ.&. 0001C0
 88260A5E C4F05689 EE468900 9C971326 009A8703 260A5EC4 38380036 9A00A2B7 ñÄ..6.;8á^.&....&.....FŸ.VÞá^.&. 0001E0

Dump of file SATURN:[PCCOMMON.DUMP.DLL]PDLDGM.TMP;1 on 18-APR-1990 10:48:18.73
```

```
File ID (766,30,0)   End of file block 195 / Allocated 196

Virtual block number 36 (00000024), 512 (0200) bytes

 E676FFE8 76FFF856 89F64689 F0568BEE 4688F456 89F24689 00989788 26009687 ...&.....F·.V¶.FŸ.VÞ.F-.V½.vÒ.vl 000000
 00043D00 0BE9000E E90011E9 00000C13 9A016A00 6A006A50 16EA468D 026A006A j.j..Fõ.Pj.j.j......Õ..Õ..Õ..=.. 000020
 83D88E3D 19BB1E56 57000018 C8CBC95F 5E1F0000 E9DC468B FFEFE9FF 6FE90375 u.Õo.Õÿ..FÉÕ...^_èùà...WV.¡.=.Á. 000040
 FFEA76FF 26496850 16F0468D EA5689E8 4689FE57 8826FC47 8B260E5E C4040E46 F..á^.&.G=&.W±.FÕ.Võ.FÞ.Ph!&.võ. 000060
 003ED09A 006AE876 FFEA76FF 28556850 16EC468D 0CC48300 003E8D9A 006AE876 vÒj...>...á..F$.PhU&.võ.vÒj..Á>. 000080
 FF0876FF 0A76FF0C 76FF088F 685016FC 46805016 F2468D50 16F64680 0CC48300 ..á..F-.P.F·.P.F=.Ph¢..v..v..v.. 0000A0
 9A006AE8 76FFEA76 FF032668 016A0108 E9F0468B 18C48300 003C8F9A 006A0676 v.j..¢<...á..FÞÕ..j.h&..võ.vÒj.. 0000C0
 FA7E8300 003F259A 5016FA46 8DFC76FF FE76FF01 18E90000 880AC483 00003F0C .?...á.¡..Õ...v±.v=.F*.P.X?...-* 0000E0
 00003F48 9A006AE8 76FFEA76 FF032668 500003B8 0003E900 01B80006 E9037500 .u.Õ..¡..Õ..¡..Ph&..võ.vÒj..H?.. 000100
 E9037500 FA7E8300 003F619A 5016FA46 8DF276FF F476FF00 DCE90000 880AC483 .á.¡..ÕÉ..v¶.v·.F*.P.a?...-*.u.Õ 000120
 B80AC483 00003F84 9A006AE8 76FFEA76 FF032668 500003B8 0003E900 01B80006 ..¡..Õ..¡..Ph&..võ.vÒj...?...á.¡ 000140
 01B80006 E9037500 FA7E8300 0039C89A 5016FA46 8DF676FF F876FF00 A0E90000 ..Õ...v½.v-.F*.P.à9...~*.u.Õ..¡. 000160
 64E90000 B80AC483 00003F9F 9A006AE8 76FFEA76 FF032668 500003B8 0003E900 .Õ..¡..Ph&..võ.vÒj...?...á.¡..Õd 000180
 2668016A 0049E900 00B80AC4 8300003F BA9A006A E876FFEA 76FF0326 68036A00 .j.h&..võ.vÒj..o?...á.¡..ÕI.j.h& 0001A0
 E9037500 013D0028 E9002EE9 0000880A C4830000 3D4F9A00 6AE876FF EA76FF03 ..võ.vÒj..O=...á.¡..Õ..Õ+.=..u.Õ 0001C0
 E9037500 063DFFA7 E9037500 043DFF73 E9037500 033DFF3F E9037500 023DFF08 ..=..u.Õ?.=..u.Õs.=..u.ÕI.=..u.Õ 0001E0

Dump of file SATURN:[PCCOMMON.DUMP.DLL]PDLDGM.TMP;1 on 18-APR-1990 10:48:18.73
File ID (766,30,0)   End of file block 195 / Allocated 196

Virtual block number 37 (00000025), 512 (0200) bytes

 478B260E 5EC4040E 4683D88E 3E4BB81E 56570000 00C8CBC9 5F5E1FFF 87E9FED0 Á±Õñ..^_èùà...WV.¡K>.Ä.F..á^.&.G 000000
 0004C8CB C95F5E1F 0000E900 00B80090 97892600 8E878926 0A5EC4FE 578B26FC =&.W±á^.&....&....¡..Õ...^_èùà.. 000020
 003B359A 0676FF08 76FF0789 26024789 260000B8 0E5EC4D8 8E4002B8 1E565700 .WV.¡.ə.Äá^.¡..&.G.&...v..v..5;. 000040
 01078326 0E5EC400 36E90374 00003000 0038459A 5016FC46 8D0676FF 0876FF00 ..v..v..F=.P.E;..=..t.Õ6.á^.&... 000060
 76FF0876 FF0011E9 0374FE56 390019E9 0374FC46 390C568B 0A468B00 02578326 &.W...F..V.9F=t.Õ..9V±t.Õ...v..v 000080
 E90001B8 07892602 47892600 00B80E5E C4FFB2E9 0016E900 00B80000 10889A06 ......¡..Õ..Õÿ.á^.¡..&.G.&..¡..Õ 0000A0
 76FF0E76 FF1076FF 5016FC46 8D088E40 35BB1E56 57000006 C8CBC95F 5E1F0000 ...^_èùà...WV.¡5ə.Ä.F=.P.v..v..v 0000C0
 76FF0027 E9FA4688 0006E903 7500FA7E 83FA4689 0CC483FF FF402D9A 0676FF08 ..v..-ə...á..F*.-*.u.Õ...F*Õ'..v 0000E0
 B80000FF FF9A0A76 FF0C76FF 016A5052 00DA8300 012DFE56 8BFC468B 0676FF08 ..v..F=.V±-...Õ.RPj..v..v......¡ 000100
 478B260E 5EC4040E 4683D88E 40BF8B1E 56570000 20C8CBC9 5F5E1F00 00E90000 ..Õ...^_èùà ..WV.¡¢ə.Ä.F..á^.&.G 000120
 F25689F0 4689FE57 8B26FC47 8B260E5E C4040E46 83E65689 E44689FE 578B26FC =&.W±.FÕ.Vl.F..á^.&.G=&.W±.FÞ.V· 000140
 89F44689 2A578B26 28478B26 0A5EC4FA 5689F846 89265788 26244788 260A5EC4 á^.&.G$&.W&.F½.V*á^.&.G(&.W*.F¶. 000160
 FFF076FF F276FF00 31E90375 00E07E83 E04689FE 478B260E 5EC4020E 4683F656 V-.F..á^.&.G±.FÁ.-Á.u.ÕI..v·.vÞ. 000180
 7500E27E 83E24689 10C48300 0041CC9A 006A0676 FF0876FF 27DB68E4 76FFE676 vl.võhÜ'.v..v.j..äA...á..Fã.-ã.u 0001A0
 000041E5 9A006AF0 76FFF276 FF088768 F476FFF6 76FF012A E9E2468B 0006E903 .Õ...FãÕ*..v-.v¶hñ..v·.vÞj..lA.. 0001C0
 880A5EC4 0CC48300 00421A9A 006AF076 FFF276FF 08886806 76FF0876 FF0CC483 .á..v..v.h¡..v·.vÞj...B...á.á^.. 0001E0

Dump of file SATURN:[PCCOMMON.DUMP.DLL]PDLDGM.TMP;1 on 18-APR-1990 10:48:18.73
File ID (766,30,0)   End of file block 195 / Allocated 196

Virtual block number 38 (00000026), 512 (0200) bytes

 8868F076 FFF276FF 0019E903 75F6460B F44682A 57892628 478926F2 5688F046 FÞ.V·&.G(&.W*.F¶.F-u.Õ...v·.vÞh¡ 000000
 F076FFF2 76FF0886 68F876FF FA76FF0C C4830000 42339A00 6AF476FF F676FF08 ..v-.v¶j..3B...á..v*.v½hÑ..v·.vÞ 000020
 FFFA76FF 088F6850 16FC468D 5016EC46 8D5016E8 46800CC4 83000042 559A006A j..UB...á..FÒ.P.F$.P.F=.Ph¢..v*. 000040
 FFF276FF 0676FF08 76FF005D E91A4788 260A5EC4 14C48300 003E759A 006AF876 v½j..u>...á.á^.&.G.Õ]..v..v..v·. 000060
 FFF076FF F276FF06 76FF0876 FF005BE9 0CC48342 9840879A FC76FFFE 76FFF076 vÞ.v±.v=.ñə.B.á.Õ[..v..v..v·.vÞ. 000080
 FFEE76FF F076FFF2 76FF0676 FF0876FF 003EE90C C4834285 40B79AE8 76FFEA76 võ.vÒ.ñə¢B.á.Õ>..v..v..v·.vÞ.vŸ. 0000A0
 03750002 3DFF9BE9 03750001 3D001BE9 001EE900 21E90CC4 83400740 B79AEC76 v$.ñə=ə.á.Õ!.Õ..Õ..=..u.Õ..=..u. 0000C0
 1E565700 0000C8CB C95F5E1F 0000E900 00B8FFDF E9FFA8E9 03750003 3DFFCDE9 Õë.=..u.Õ´.ÕÕ.¡..Õ...^_èùà...WV. 0000E0
 5F5E1F00 00E90000 8B1A4789 260A5EC4 FE478B26 0E5EC402 0E4683D8 8E4122B8 ¡"A.Ä.F..á^.&.G±á^.&.G.¡..Õ...^_ 000100
 FC4689FE 578B26FC 478B260E 5EC4040E 4683D88E 42F1BB1E 56570000 04C8CBC9 èùà...WV.¡ÞB.Ä.F..á^.&.G=&.W±.F= 000120
 57000004 C8CBC95F 5E1F0000 E90000B8 078926FC 5EC41A47 8B260A5E C4FE5689 .V±á^.&.G.á^=&..¡..Õ...^_èùà...W 000140
 260A5EC4 FE5689FC 4689FE57 8B26FC47 8B260E5E C4040E46 83D88E43 1ABB1E56 V.¡.C.Ä.F..á^.&.G=&.W±.F=.V±á^.& 000160
 000004C8 CBC95F5E 1F0000E9 0000B802 57892607 8926FC5E C42A578B 26284788 .G(&.W*á^=&..&.W.¡..Õ...^_èùà... 000180
 0A5EC4FE 5689FC46 89FE5788 26FC4788 260E5EC4 040E4683 D88E4353 BB1E5657 WV.¡SC.Ä.F..á^.&.G=&.W±.F=.V±á^. 0001A0
 0004C8CB C95F5E1F 0000E900 00B80257 89260789 26FC5EC4 2E578B26 2C478B26 &.G,&.W.á^=&..&.W.¡..Õ...^_èùà.. 0001C0
 5EC4FE56 89FC4689 FE578B26 FC478B26 0E5EC404 0E4683D8 8E4394B8 1E565700 .WV.¡.C.Ä.F..á^.&.G=&.W±.F=.V±á^ 0001E0

Dump of file SATURN:[PCCOMMON.DUMP.DLL]PDLDGM.TMP;1 on 18-APR-1990 10:48:18.73
```

```
File ID (766,30,0)   End of file block 195 / Allocated 196

Virtual block number 39 (00000027), 512 (0200) bytes

 CBC95F5E 1F0000E9 00008802 57892607 8926FC5E C4009097 8826008E 8788260A .&....&....á^•&..&.W.¡..Õ...^_èù 000000
 5689FC46 89FE578B 26FC478B 260E5EC4 040E4683 D88E43D5 881E5657 000010C8 à...WV.¡ĺC.Á.F..á^.&.G•&.W±.F=.V 000020
 02478926 000088F4 5EC4F656 89F44689 FE578826 FC478826 0E5EC404 0E4683FE ±.F..á^.&.G•&.W±.F¶.V-á^¶¡..&.G. 000040
 46803877 FF263A77 FF260A5E C4000040 4D9A3877 FF263A77 FF260A5E C4078926 &..á^.&.w:&.w8.Mə..á^.&.w:&.w8.F 000060
 006AF076 FFF276FF 08D66850 16F84680 0057E903 7400003D 0000405D 9A5016F0 Þ.P.)ə..=..t.ÕW..F½.Phø..v·.vÞj. 000080
 5EC40026 E90374FA 5639002E E90374F8 4639FE56 88FC468B 0CC48300 0041A19A .ÀA...á..F•.V±9F½t.Õ..9V•t.Õ&.á^ 0000A0
 00880000 40929A38 77FF263A 77FF260A 5EC40257 89260789 26F2568B F04688F4 ¶.FÞ.V·&..&.W.á^.&.w:&.w8..ə..¡. 0000C0
 4683D88E 4418881E 56570000 00C8CBC9 5F5E1F00 00E90000 88FF8CE9 0009E900 .Õ..Õ..¡..Õ...^_èùà...WV.¡.D.Ä.F 0000E0
 0000E900 008800A0 97892600 9E878926 0A5EC4FE 578826FC 4788260E 5EC4040E ..á^.&.G•&.W±á^¯&....&....¡..Õ.. 000100
 FE578826 FC478826 0E5EC404 0E4683D8 8E44EA88 1E565700 0000C8CB C95F5E1F .^_èùà...WV.¡õD.Á.F..á^.&.G•&.W± 000120
 881E5657 000014C8 CBC95F5E 1F0000E9 00008800 A4978926 00A28789 260A5EC4 á^¯&..Á.&..Ê.¡..Õ...^_èùà...WV.¡ 000140
 A5685016 EC468DFE 5689FC46 89FE5788 26FC4788 260E5EC4 040E4683 D88E451D .E.Á.F..á^.&.G•&.W±.F=.V±.F§.PhÊ 000160
 26009687 88260A5E C410C483 00003EB5 9A006A06 76FF0876 FF0A76FF 0C76FF08 ..v..v..v..v.j..ç>...á.á^.&....& 000180
 000305F6 5688F446 88FC5EC4 02578926 078926FC 5EC400DA 8300032D 0098978B ....-...Õ.á^•&..&.W.á^•.F¶.V-... 0001A0
 89260447 8926000A 8300032D F25688F0 4688FC5E C40A5789 26084789 26000283 .Ø.&.G.&.W.á^•.FÞ.V·-...Õ.&.G.&. 0001C0
 1F0000E9 0000880E 5789260C 47892600 02830003 05FA568B F84688FC 5EC40657 W.á^•.F½.V•....Ø.&.G.&.W.¡..Õ... 0001E0

Dump of file SATURN:[PCCOMMON.DUMP.DLL]PDLDGM.TMP;1 on 18-APR-1990 10:48:18.73
File ID (766,30,0)   End of file block 195 / Allocated 196

Virtual block number 40 (00000028), 512 (0200) bytes

 89FE5788 26FC4788 260E5EC4 040E4683 D88E4550 881E5657 00000AC8 CBC95F5E ^_èùà...WV.¡PE.Ä.F..á^.&.G•&.W±. 000000
 445F9A30 77FF2632 77FF260A 5EC40789 26024789 260000B8 FA5EC4FC 5689FA46 F¯.V•á^•¡..&.G.&..á^.&.w2&.w0._D 000020
 8D004AE9 03740000 3D000044 749A5016 F6468D30 77FF2632 77FF260A 5EC40000 ..á^.&.w2&.w0.F-.P.tD..=..t.ÕJ¯.. 000040
 0026E903 7500FE7E 830CC483 00004491 9A006AF6 76FFF876 FF08B368 5016FE46 F±.Ph•..v½.v-j...D...á..~±.u.Õ&. 000060
 02578926 078926F8 5688F646 88FA5EC4 000044CA 9A3077FF 263277FF 260A5EC4 á^.&.w2&.w0.ðD..á^•.F-.V½&..&.W. 000080
 D88E45FC 881E5657 00000AC8 CBC95F5E 1F0000E9 000088FF 99E90009 E9000088 ¡..Õ..Õ..¡..Õ...^_èùà...WV.¡•E.Ä 0000A0
 26024789 26000088 FA5EC4FC 5689FA46 89FE5788 26FC4788 260E5EC4 040E4683 .F..á^.&.G•&.W±.F¯.V•á^•¡..&.G.& 0000C0
 F6468D34 77FF2636 77FF260A 5EC40000 462E9A34 77FF2636 77FF260A 5EC40789 ..á^.&.w6&.w4..F..á^.&.w6&.w4.F- 0000E0
 9A006AF6 76FFF876 FF08B368 5016FE46 8D004AE9 03740000 30000046 439A5016 .P.CF..=..t.ÕJ..F±.Ph•..v½.v-j.. 000100
 0000467C 9A3477FF 263677FF 260A5EC4 0026E903 7500FE7E 830CC483 00004660 'F...á..-±.u.Õ&.á^.&.w6&.w4.|F.. 000120
 1F0000E9 000088FF 99E90009 E9000088 02578926 078926F8 5688F646 88FA5EC4 á^•.F~.V½&..&.W.¡..Õ..Õ..¡..Õ... 000140
 89FE5788 26FC4788 260E5EC4 040E4683 D88E46AC 881E5657 00000AC8 CBC95F5E ^_èùà...WV.¡¯F.Ä.F..á^.&.G•&.W±. 000160
 46DE9A38 77FF263A 77FF260A 5EC40789 26024789 260000B8 FA5EC4FC 5689FA46 F¯.V•á^•¡..&.G.&..á^.&.w:&.w8.8F 000180
 8D004AE9 03740000 30000046 F39A5016 F6468D38 77FF263A 77FF260A 5EC40000 ..á^.&.w:&.w8.F-.P.µF..=..t.ÕJ.. 0001A0
 0026E903 7500FE7E 830CC483 00004710 9A006AF6 76FFF876 FF08B368 5016FE46 F±.Ph•..v½.v-j...G...á..~±.u.Õ&. 0001C0
 02578926 078926F8 5688F646 88FA5EC4 0000472C 9A3877FF 263A77FF 260A5EC4 á^.&.w:&.w8.,G..á^•.F-.V½&..&.W. 0001E0

Dump of file SATURN:[PCCOMMON.DUMP.DLL]PDLDGM.TMP;1 on 18-APR-1990 10:48:18.73
File ID (766,30,0)   End of file block 195 / Allocated 196

Virtual block number 41 (00000029), 512 (0200) bytes

 D88E475C 881E5657 00000EC8 CBC95F5E 1F0000E9 000088FF 99E90009 E9000088 ¡..Õ..Õ..¡..Õ...^_èùà...WV.¡\G.Ä 000000
 FC478826 0E5EC404 0E4683F4 5689F246 89FE5788 26FC4788 260E5EC4 040E4683 .F..á^.&.G•&.W±.F¯.V¶.F..».&.G• 000020
 0001FE46 C7FC5689 FA468944 57882642 4788260A 5EC4F856 89F64689 FE578826 &.W±.F-.V½á^.&.GB&.WD.F•.V• ¯±.. 000040
 0A5EC4FC 5689FA46 8940508B 263E408B 260A5EC4 02E6C1FE 7688FE46 FF001AE9 Õ...F±.v±èl.á^.&.ə>&.Pə.F•.V•á^. 000060
 E90374FC 56390057 E90374FA 4639F456 88F2468B 0068E903 773C4739 26FE468B .F±&9G<w.Õh..F·.V¶9F•t.ÕW.9V•t.Õ 000080
 2642408B 260A5EC4 02E6C1FE 76880024 E903773C 47392640 FE4688DA 5EC4004F 0.á^..F±ə&9G<w.Õ$..v±èl.á^.&.əB& 0000A0
 57882642 4788260A 5EC4001B E90021E9 00008802 57892607 8926F65E C4445088 .PDá^-&..&.W.¡..Õl.Õ..á^.&.GB&.W 0000C0
 1E565700 0006C8CB C95F5E1F FF6FE900 03E90000 88025789 26078926 F65EC444 Dá^-&..&.W.¡..Õ..Õo..^_èùà...WV. 0000E0
 FF5016FE 468DFC56 89FA4689 FE578826 FC478826 0E5EC404 0E4683D8 8E480C88 |.H.Ä.F..á^.&.G•&.W±.F¯.V•.F±.P. 000100
 7E83001B E903750F FE7E830E C4830000 FFFF9A00 6A0676FF 0876FF0A 76FF0C76 v..v..v..v.j.......á..-±.u.Õ...- 000120
 880003E9 0001B800 06E90374 11FE7E83 0009E903 7510FE7E 830012E9 03750EFE ±.u.Õ...-±.u.Õ...-±.t.Õ..¡..Õ..¡ 000140
 83D88E48 F1881E56 57000006 CBC8C95F 5E1F0000 E90000B8 078926FA 5EC40000 ..á^•&..¡..Õ...^_èùà...WV.¡ÞH.Ä. 000160
 FF0A76FF 0C76FF50 16FA468D FE5689FC 4689FE57 8B26FC47 8B260E5E C4040E46 F..á^.&.G•&.W±.F=.V±.F•.P.v..v.. 000180
 00880003 E90001B8 0006E903 7424FA7E 830EC483 0000491E 9A006A06 76FF0876 v..v.j...I...á..-•$t.Õ..¡..Õ..¡. 0001A0
 4683D88E 4968881E 56570000 06C8CBC9 5F5E1F00 00E90000 88078926 FC5EC400 .á^•&..¡..Õ...^_èùà...WV.¡kI.Ä.F 0001C0
 76FFFC76 FF264968 5016FE46 8DFC5689 FA4689FE 578826FC 4788260E 5EC4040E ..á^.&.G•&.W±.F¯.V•.F±.Ph|&.v•.v 0001E0

Dump of file SATURN:[PCCOMMON.DUMP.DLL]PDLDGM.TMP;1 on 18-APR-1990 10:48:18.73
```

```
File ID (766,30,0)   End of file block 195 / Allocated 196

Virtual block number 42 (0000002A), 512 (0200) bytes

 0A5EC4D8 F7C01B01 1E7F8326 0A5EC400 32E9FE46 8B0CC483 000047C0 9A006AFA ªj..âG...á..F±Õ2.á^.&.....ã¼Äá^. 000000
 0016E900 19E92047 89260A5E C4D8F7C0 1B01207F 83260A5E C4002FE9 1E478926 &.G.Õ/.á^.&.. ..ã¼Äá^.&.G Õ..Õ.. 000020
 C95F5E1F 0000E900 00B8FFE7 E9FFD4E9 03750002 3DFFC6E9 03750001 3D0013E9 Õ..=..u.Õó.=..u.Õå.ÕÕ.¡..Õ..._è 000040
 1C478926 0A5EC4D8 F7C01B01 1C7F8326 0A5EC4D8 8E49CAB8 1E565700 0000C8CB ùà...WV.¡òÌ.Äá^.&.....ã¼Äá^.&.Ḡ. 000060
 8B260E5E C4040E46 83D88E4A 59B81E56 5700000C C8CBC95F 5E1F0000 E90000B8 ¡..Õ..._èùà...WV.¡YJ.Ä.F..á^.&. 000080
 0676FF08 76FF2710 68F676FF F876FF50 16FC468D F85689F6 4689FE57 8B26FC47 G•&.W±.F¯.V½.F•.P.v½.v-h.'.v..v. 0000A0
 16FA468D 0050E9F4 46880006 E9037500 F47E83F4 468910C4 8300004A E49A006A j..õJ...á..F¶.-¶.u.Õ...F¶ÕP..Fª. 0000C0
 7E83F446 890CC483 00004812 9A006A00 8EB7FF26 00908B7FF 260A5EC4 264C6850 PhL&á^.&.ñ..&.ñ..j...K...á..F¶.- 0000E0
 6AFC76FF FE76FF28 0068F676 FFF876FF FA76FF00 1FE9F446 8B0006E9 037500F4 ¶.u.Õ...F¶õ...vª.v½.v-h.(.v±.v•j 000100
 0E4683D8 8E4A83B8 1E565700 0016C8CB C95F5E1F 0000E90E C4830000 49F49A00 ..¶Ì...á.Õ...^_èùà...WV.¡.J.Ä.F. 000120
 F04689FE 47882600E 5EC4020E 4683EE56 89EC4689 FE578B26 FC478B26 0E5EC404 .á^.&.G•&.W±.F§.VŸ.F..á^.&.G±.Fþ 000140
 7E83F446 89F64689 0000B8FE 5689FC46 89FE578B 26FC478B 260E5EC4 040E4683 .F..á^.&.G•&.W±.F•.V±¡...F-.F¶.- 000160
 F27E8300 0003E39A 5016F246 8DEC76FF EE76FF00 C2E90000 B80006E9 037400F0 þ.t.Õ..¡..Õõ..vŸ.vš.F·.P.D....-· 000180
 68EC76FF EE76FFF0 76FF5016 F4468000 0004119A EC76FFEE 76FF000B E9037500 .u.Õ...vŸ.vš......F¶.P.vþ.vŸ.všh 0001A0
 76FF0008 E9037500 F27E83EA 468912C4 8300004C 139A006A 0676FF08 76FF2714 .'.v..v.j...L...á..Fõ.-·.u.Õ...v 0001C0
 0375F646 0BF4468B 0057E9EA 46880006 E9037500 EA7E8300 0004459A EC76FFEE Ÿ.vš.E....-õ.u.Õ...FõÕW..F¶.F-u. 0001E0

Dump of file SATURN:[PCCOMMON.DUMP.DLL]PDLDGM.TMP;1 on 18-APR-1990 10:48:18.73
File ID (766,30,0)   End of file block 195 / Allocated 196

Virtual block number 43 (0000002B), 512 (0200) bytes

 0676FF08 76FF2710 68EC76FF EE76FF50 16F84680 0043E900 46E90000 B80009E9 Õ..¡..ÕF.ÕC..F½.P.vŸ.všh.'.v..v. 000000
 FFFA76FF 27D868EC 76FFEE76 FFF076FF FC76FFFE 76FF10C4 8300004C 359A006A j..5L...á..v±.v•.vþ.vŸ.všhÄ'.vª. 000020
 D88E4B29 B81E5657 00001AC8 CBC95F5E 1F0000E9 12C48300 004AB39A 006AF876 v½j..ªJ...á.Õ...^_èùà...WV.¡)K.Ä 000040
 FC478B26 0E5EC404 0E4683EE 5689EC46 89FE578B 26FC478B 260E5EC4 040E4683 .F..á^.&.G•&.W±.F§.VŸ.F..á^.&.G• 000060
 899A5016 F2468DEC 76FFEE76 FFF84689 FA468900 00B8F656 89F44689 FE578B26 &.W±.F¶.V-¡...Fª.F½.vŸ.vš.F·.P.. 000080
 76FF066A 5016F846 8D00004B 9D9AEC76 FFEE76FF 000BE903 7500F27E 8300004B K...-·.u.Õ...vŸ.vš..K...F½.Pj..v 0000A0
 037500F2 7E83E646 8912C483 00004D04 9A006AF4 76FFF676 FF271468 EC76FFEE Ÿ.všh.'.v-.v¶j...M...á..FÌ.-·.u. 0000C0
 FC468D01 01E9E646 8B0006E9 037500E6 7E830000 4BD59AEC 76FFEE76 FF000BE9 Õ...vŸ.vš.[K...-Ì.u.Õ...FÌÕ...F• 0000E0
 460BF846 8B10C483 00004BBB 9A006A06 76FF0876 FF271068 EC76FFEE 76FF5016 .P.vŸ.všh.'.v..v.j..ÊK...á..F½.F 000100
 E90000B8 0009E903 74FA5639 0011E903 74F84639 FE568BFC 468B001F E90375FA ªu.Õ...F=.V±9F½t.Õ..9Vªt.Õ..¡..Õ 000120
 2677FF26 0A5EC408 A668016A 5016E846 8D0040E9 1A478B26 0A5EC400 B9E900BC ¥.Õ¿.á^.&.G.ÕM..FÕ.Pj.hÌ ⁶^.&.w& 000140
 FF260A5E C408A668 026A5016 E8468D00 3EE90EC4 8300004D 799A006A 2477FF26 &.w$j..yM...á.Õ>..FÕ.Pj.h  á^.&. 000160
 75000130 0013E900 65E90000 B8001CE9 0EC48300 004D809A 006A2477 FF262677 w&&.w$j..¯M...á.Õ..¡..Õe.Õ..=..u 000180
 9A006AE8 76FFEA76 FF264C68 5016F046 8DFFE4E9 FFC5E903 75000230 FFABE903 .Õ¨.=..u.Õé.ÕÕ..Fþ.PhL&.võ.vÒj.. 0001A0
 68EC76FF EE76FFF4 76FFF676 FFF076FF 0028E903 7500F07E 830CC483 00004DD8 ÛM...á..-þ.u.Õ(..vþ.v-.v¶.vŸ.všh 0001C0
 5E1F0000 E90000B8 0006E900 09E912C4 8300004C C09A006A FC76FFFE 76FF27D8 Û'.v±.v•j..àL...á.Õ..Õ..¡..Õ...^ 0001E0

Dump of file SATURN:[PCCOMMON.DUMP.DLL]PDLDGM.TMP;1 on 18-APR-1990 10:48:18.73
File ID (766,30,0)   End of file block 195 / Allocated 196

Virtual block number 44 (0000002C), 512 (0200) bytes

 4689FE57 8B26FC47 8B260E5E C4040E46 83D88E4C 4CB81E56 5700001A C8CBC95F _èùà...WV.¡LL.Ä.F..á^.&.G•&.W±.F 000000
 89FA4689 000088F6 5689F446 89FE578B 26FC478B 260E5EC4 040E4683 EE5689EC §.VŸ.F..á^.&.G•&.W±.F¶.V-¡...Fª. 000020
 76FFEE76 FF000BE9 037500F2 7E830000 4C8F9A50 16F2468D EC76FFEE 76FFF846 F½.vŸ.vš.F·.P..L...-·.u.Õ...vŸ.v 000040
 B39A006A F476FFF6 76FF2714 68EC76FF EE76FF05 6A5016F8 46800000 4CA39AEC $.ÈL...F½.Pj..vŸ.všh.'.v-.v¶j..ª 000060
 E67E8300 004CDA9A EC76FFEE 76FF0008 E9037500 F27E83E6 468912C4 8300004E N...á..FÌ.-·.u.Õ...vŸ.vš.ÕL...-Ì 000080
 0676FF08 76FF2710 68EC76FF EE76FF50 16FC468D 0101E9E6 46880006 E9037500 .u.Õ...FÌÕ...F•.P.vŸ.všh.'.v..v. 0000A0
 0374F846 39FE568B FC468B00 1FE90375 FA4608F8 468B10C4 8300004F 069A006A j...O...á..F½.Fªu.Õ...F•.V±9F½t. 0000C0
 4680004D E91A478B 260A5EC4 00B9E900 BCE90000 B80009E9 0374FA56 390011E9 Õ..9Vªt.Õ..¡..ÕŸ.Õ¿.á^.&.G.ÕM..F 0000E0
 003EE90E C4830000 4F289A00 6A2477FF 262677FF 260A5EC4 08A66801 6A5016E8 Õ.Pj.hÌ.á^.&.w&&.w$j..(O...á.Õ>. 000100
 E90EC483 00004F5F 9A006A24 77FF2626 77FF260A 5EC408A6 68026A50 16E8468D .FÕ.Pj.hÌ.á^.&.w&&.w$j.._O...á.Õ 000120
 468DFFE4 E9FFC5E9 03750002 3DFFABE9 03750001 3D0013E9 0065E900 00B8001C ..¡..Õe.Õ..=..u.Õ¨.ª..u.Õé.ÕÕ..F 000140
 FF0028E9 037500F0 7E830CC4 8300004F 8A9A006A E876FFEA 76FF264C 685016F0 þ.PhL&.võ.vÒj...O...á..-þ.u.Õ(.. 000160
 C4830000 4D579A00 6AFC76FF FE76FF27 DC68EC76 FFEE76FF F476FFF6 76FFF076 vþ.v-.v¶.vŸ.všhÉ'.v±.v•j..WM...á 000180
 4683D88E 4DF8B81E 56570000 04C8CBC9 5F5E1F00 00E90000 B80006E9 0009E912 .Õ..Õ..¡..Õ...^_èùà...WV.¡«M.Ä.F 0001A0
 685016FC 468D00E0 97892600 DE878926 0A5EC4FE 578B26FC 4788260E 5EC4040E ..á^.&.G•&.W±á^¯.&..ß.&..Å..F•.Ph 0001C0
 6AFC76FF FE76FF0C C4830000 50159A00 6A0092B7 FF260094 B7FF260A 5EC4027F ..á^.&.ñ..&.ñ..j...P...á..v±.v•j 0001E0

Dump of file SATURN:[PCCOMMON.DUMP.DLL]PDLDGM.TMP;1 on 18-APR-1990 10:48:18.73
```

```
File ID (766,30,0)   End of file block 195 / Allocated 196

Virtual block number 45 (0000002D), 512 (0200) bytes

 FF0876FF 271768FC 76FFFE76 FF0C6A50 52000E05 0C56880A 46880000 FFFF9A11 .......F..V..8.RPj..v±.v•h.'.v.. 000000
 5F5E1F00 00E90000 880000FF FF9AFC76 FFFE76FF 12C48300 004E6F9A 006A0676 v.j..oN...ó..v±.v•.....¡..Õ...^  000020
 0A5EC4FE 578B26FC 478B260E 5EC4040E 4683088E 4FAA881E 56570000 00C8CBC9 èùà...WV.¡ˆO.Ä.F..ó^.&.G•..W±ó^. 000040
 83D88E50 3A881E56 57000000 C8CBC95F 5E1F0000 E90000B8 32578926 30478926 &.G0&.W2¡..Õ...^_èùà...WV. :P.Ä. 000060
 1F0000E9 00008836 57892634 4789260A 5EC4FE57 8826FC47 88260E5E C4040E46 F..ó^.&.G•&.W±ó^.&.G4&.W6¡.  ... 000080
 89FE578B 26FC478B 260E5EC4 040E4683 D88E506B 881E5657 00000EC8 CBC95F5E ^_èùà...WV.¡kP.Ä.F..ó^.&.G•&.W±. 0000A0
 FF260094 B7FF260A 5EC4027F 685016FA 468DF246 89F44689 000088F8 5689F646 F¯.V½¡...F¶.F·.F•.Ph..ó^.&.ñ..&. 0000C0
 51039A00 6AF676FF F876FF26 49685016 FE468D0C C4830000 50EE9A00 6A0092B7 ñ..j..ŸP...ó..F±.PhI&.v½.v-j...Q 0000E0
 0106E9FE 46880AC4 8300004F E29A006A F676FFF8 76FF2659 68006A0C C4830000 ...ó.j.hY&.v½.v-j..ãO...ó..F±Õ.. 000100
 00005187 9A3077FF 263277FF 260A5EC4 0048E903 7532470B 2630478B 260A5EC4 ó^.&.G0&.G2u.ÕH.ó^.&.w2&.w0..Q.. 000120
 FF016A00 18E90374 00003D00 00519C9A 5016F246 8D3077FF 263277FF 260A5EC4 ó^.&.w2&.w0.F·.P..Q..=..t.Õ..j.. 000140
 8B260A5E C400C6E9 FFC8E90C C4830000 51B99A00 6AF276FF F476FFFA 76FFFC76 v•.v•.v¶.v·j..¿Q...ó.Õà.Õ6.ó^.&. 000160
 FF260A5E C4000047 8E9A3477 FF263677 FF260A5E C40048E9 03753647 08263447 G4&.G6u.ÕH.ó^.&.w6&.w4..G..ó^.&. 000180
 FA76FFFC 76FF016A 0018E903 7400003D 000047A3 9A5016F2 46803477 FF263677 w6&.w4.F·.P.ÈG..=..t.Õ..j..v•.v• 0001A0
 76FFF876 FF5016F2 4680006B E9FFC8E9 0CC48300 0052069A 006AF276 FFF476FF .v¶.v·j...R...ó.Õà.Õk..F·.P.v½.v 0001C0
 F4460BF2 468B14C4 83000045 809A006A 0676FF08 76FF0A76 FF0C76FF 080568F6 -h¦..v..v..v..v.j...E...ó..F·.F¶ 0001E0

Dump of file SATURN:[PCCOMMON.DUMP.DLL]PDLDGM.TMP;1 on 18-APR-1990 10:48:18.73
File ID (766,30,0)   End of file block 195 / Allocated 196

Virtual block number 46 (0000002E), 512 (0200) bytes

 0021E90C C4830000 3D029A00 6AF276FF F476FFFA 76FFFC76 FF016A00 18E90375 u.Õ..j..v•.v•.v¶.v·j...=...ó.Õ1. 000000
 DFE9FF98 E9037500 0330FF45 E9037500 0230FEF2 E9037500 01300018 E9001EE9 Õ..Õ..=..u.Õ·±=..u.ÕE.=..u.Õ..ÕÕ 000020
 260E5EC4 040E4683 D88E509C 881E5657 00000AC8 CBC95F5E 1F0000E9 000088FF .¡..Õ...^_èùà...WV.¡.P.Ä.F..ó^.& 000040
 5EC4FC56 89FA4689 2A578826 28478826 0A5EC4F8 5689F646 89FE578B 26FC478B .G•&.W±.F¯.V½ó^.&.G(&.W*.F•.V•ó^ 000060
 16FE468D 0050E900 00880006 E90374FC 4608FA46 88078926 02478926 000088F6 -¡..&.G.&...F•.F•t.Õ..¡..ÕP..F±. 000080
 F65EC400 13E90375 00FE7E83 0CC48300 0052029A 006AFA76 FFFC76FF 08836850 Ph•..v•.v•j..ØR...ó..~±.u.Õ..ó^- 0000A0
 6AFA76FF FC76FF08 EB68F676 FFF876FF 001CE902 57892607 8926FC56 8BFA468B .F•.V•&..&.W.Õ...V½.v-hŠ..v•.v•j 0000C0
 0E4683D8 8E5244B8 1E565700 0012C8CB C95F5E1F 0000E90C C4830000 50D69A00 ..øP...ó.Õ...^_èùà...WV.¡DR.Ä.F. 0000E0
 578B26FC 478B260E 5EC4040E 4683F656 89F44689 FE578B26 FC478B26 0E5EC404 .ó^.&.G•&.W±.F¶.V-.F..ó^.&.G•&.W 000100
 0006E903 7500F27E 83F24689 00004FF2 9A086AF4 76FFF676 FFF05689 EE4689FE ±.FŸ.Vþ.v-.v¶j..·O...F·.-·.u.Õ.. 000120
 FF08DD68 5016F846 8DFE5689 FC468926 57882624 478B260A 5EC4000F E9F2468B .F·ÕÕ.ó^.&.G$&.W&.F•.V±.F½.PhÏ.. 000140
 5688F846 880016E9 037400F2 7E83F246 890CC483 00005396 9A006AEE 76FFF076 vþ.vŸj...S...ó..F·.-·.t.Õ...F½.V 000160
 FE76FF08 D4680676 FF0876FF 0080E900 03E90375 FE563900 08E90374 FC4639FA •9F•t.Õ..9V±u.Õ..Õ...v..v.hå..v± 000180
 FFF676FF 0058E900 03E90375 00F27E83 F246890C C4830000 538E9A00 6AFC76FF .v•j..ƒS...ó..F·.-·.u.Õ..ÕX..v-. 0001A0
 03E90375 00F27E83 F246890C C4830000 5290 9A00 6A0676FF 0876FF28 0068F476 v¶h.(.v..v.j...R...ó..F·.-·.u.Õ. 0001C0
 53589A00 6AEE76FF F076FF08 D168F476 FFF676FF 0676FF08 76FF016A 0030E900 .Õ0.j..v..v..v-.v¶hÏ..vþ.vŸj..XS 0001E0

Dump of file SATURN:[PCCOMMON.DUMP.DLL]PDLDGM.TMP;1 on 18-APR-1990 10:48:18.73
File ID (766,30,0)   End of file block 195 / Allocated 196

Virtual block number 47 (0000002F), 512 (0200) bytes

 88000050 239AF476 FFF676FF 0000E900 03E90375 00F27E83 F2468912 C4830000 ...ó..F·.-·.u.Õ..Õ...v-.v¶.#P... 000000
 478B260E 5EC4040E 4683D88E 52E9881E 56570000 16C8CBC9 5F5E1F00 00E9F246 F·Õ...^_èùà...WV.¡ÕR.Ä.F..ó^.&.G 000020
 FA5689F8 4689FE57 8B26FC47 8B260E5E C4040E46 83F65689 F44689FE 578B26FC •&.W±.F¶.V-.F..ó^.&.G•&.W±.F½.V• 000040
 76FF0A76 FF0C76FF 08EE68F4 76FFF676 FF5016FC 468D5016 F0468D50 16EA468D .Fõ.P.Fþ.P.F•.P.v-.v¶hŸ..v..v..v 000060
 002EE9EE 46880006 E9037500 EE7E83EE 46891CC4 83000051 E39A006A 0676FF08 ..v.j..DQ...ó..FŸ.-Ÿ.u.Õ...FŸÕ.. 000080
 76FFFA76 FF08EF68 F476FFF6 76FFFC76 FFFE76FF F076FFF2 76FFEA76 FFEC76FF .vš.võ.v·.vþ.v±.v•.v-.v¶hÿ..v•.v 0000A0
 83D88E54 22881E56 57000024 C8CBC95F 5E1F0000 E918C483 000053EE 9A006AF8 ½j..ŸS...ó.Õ...^_èùà$..WV.¡"T.Ä. 0000C0
 26FC478B 260E5EC4 040E4683 F25689F0 4689FE57 8B26FC47 8B260E5E C4040E46 F..ó^.&.G•&.W±.Fþ.V·.F..ó^.&.G•& 0000E0
 4683EA56 89E84689 FE578B26 FC478B26 0E5EC404 0E4683FE 5689FC46 89FE578B .W±.F•.V±.F..ó^.&.G•&.W±.FÒ.Võ.F 000100
 5EC42A57 88262847 8B260A5E C40E5689 0C4689FE 578B26FC 478B260E 5EC4040E ..ó^.&.G•&.W±.FÊ.VBó^.&.G(&.W*ó^ 000120
 6A006A28 4789262A 47892600 00880A5E C4003BE9 03750008 02578926 078926E8 Ò&..&.W..Äu.Õ;.ó^.¡..&.G*&.G(j.j 000140
 7500E47E 83E44689 0CC48300 0055C19A 006A37FF 260277FF 26E85EC4 08886800 .h¦.ó^Ò&.w.&.7j..èU...ó..FÕ.-Õ.u 000160
 08025789 26078926 FC5EC426 57882624 478B260A 5EC40257 E9E4468B 0006E903 .Õ...FÕÕW.ó^.&.G$&.W&ó^•&..&.W.. 000180
 76FF0876 FF1A77FF 260A5EC4 24478926 26478926 0000B80A 5EC40044 E9037500 Äu.ÕD.ó^.¡..&.G&&.G$ó^.&.w..v..v 0001A0
 7500E47E 83E44689 0EC48300 0056189A 006A37FF 260277FF 26FC5EC4 08F16806 .hþ.ó^•&.w.&.7j...V...ó..FÕ.-Õ.u 0001C0
 08025789 26078926 DC5EC42E 5788262C 478B260A 5EC401F7 E9E4468B 0006E903 .Õ...FÕÕ%.ó^.&.G,&.W.ó^É&..&.W.. 0001E0

Dump of file SATURN:[PCCOMMON.DUMP.DLL]PDLDGM.TMP;1 on 18-APR-1990 10:48:18.73
```

```
File ID (766,30,0)   End of file block 195 / Allocated 196

Virtual block number 48 (00000030), 512 (0200) bytes

 FF260C5E C4088768 006A006A 2C478926 2E478926 0000880A 5EC4003B E9037500 Au.Õ;.á^.¡..&.G.&.G,j.j.hñ.á^É&. 000000
 A0E9E446 880006E9 037500E4 7E83E446 890CC483 00005649 9A006A37 FF260277 w.&.7j..IV...á..Fõ.-õ.u.Õ...FõÕ. 000020
 0CC48300 0056869A 006A008E B7FF2600 9087FF26 0A5EC426 4C685016 E6468001 ..F|.PhL&á^.&.ñ..&.ñ..j...V...á. 000040
 16EC468D 5016F846 805016F4 468D016F E9E44688 0006E903 7500E47E 83E44689 .Fõ.-õ.u.Õ...FõÕo..F¶.P.F½.P.F§. 000060
 E446891A C4830000 56C99A00 6A0676FF 0876FF27 F768F076 FFF276FF E676FF50 P.v|.v·.vÞh%'.v..v.j..èV...á..Fõ 000080
 468D0044 E9037502 470B2607 8B26FC5E C40132E9 E4468800 06E90375 00E47E83 .-õ.u.Õ...FõÕ2.á^=&..&.G.u.ÕÕ..F 0000A0
 10C48300 00572D9A 006A37FF 260277FF 26FC5EC4 271068F0 76FFF276 FF5016E0 Å.P.v·.vÞh.'á^=&.w.&.7j..-W...á. 0000C0
 E900E2E9 84A3B800 06E90375 E2563900 08E90374 E04639EE 5688EC46 8BE44689 .Fõ.F§.VŸ9FÁt.Õ..9Vãu.Õ..¡É.Õã.Õ 0000E0
 E9037502 470B2607 8B26E85E C400CEE9 84A3B800 06E90375 EE4608EC 46880011 ...F§.FŸu.Õ..¡É.Õö.á^Õ&..&.G.u.Õ 000100
 0054B49A 006A37FF 260277FF 26E85EC4 271068F0 76FFF276 FF5016E0 46800044 D..FÁ.P.v·.vÞh.'á^Ò&.w.&.7j..ÇT. 000120
 84A3B800 06E90375 E2563900 08E90374 E04639FA 568BF846 8BE44689 10C48300 ..á..Fõ.F½.V¹9FÁt.Õ..9Vãu.Õ..¡É. 000140
 470B2607 8B260C5E C4006AE9 84A38800 06E90375 FA460BF8 46880011 E9007EE9 Õ-.Õ...F½.F¹u.Õ..¡É.Õj.á^É&..&.G 000160
 006A37FF 260277FF 260C5EC4 271068F0 76FFF276 FF5016E0 46800044 E9037502 .u.ÕÕ..FÁ.P.v·.vÞh.'á^É&.w.&.7j. 000180
 06E90375 E2563900 08E90374 E04639F6 568BF446 8BE44689 10C48300 0055619A .aU...á..Fõ.F¶.V-9FÁt.Õ..9Vãu.Õ. 0001A0
 00E90000 B80006E9 84A38800 06E90375 F6460BF4 46880011 E9001AE9 84A38800 .¡É.Õ..Õ...F¶.F-u.Õ..¡É.Õ..¡..Õ. 0001C0
 578826FC 4788260E 5EC4040E 4683D88E 54CBB81E 56570000 20C8CBC9 5F5E1F00 ..^_èùà ..WV.¡ùT.Ä.F..á^.&.G=&.W 0001E0

Dump of file SATURN:[PCCOMMON.DUMP.DLL]PDLDGM.TMP;1 on 18-APR-1990 10:48:18.73
File ID (766,30,0)   End of file block 195 / Allocated 196

Virtual block number 49 (00000031), 512 (0200) bytes

 040E4683 FE5689FC 4689FE57 8B26FC47 8B260E5E C4040E46 83F25689 F04689FE ±.FÞ.V·.F..á^.&.G=&.W±.F=.V±.F.. 000000
 FE578B26 FC478B26 0E5EC404 0E4683EA 5689E846 89FE5788 26FC4788 260E5EC4 á^.&.G=&.W±.FÒ.Võ.F..á^.&.G=&.W± 000020
 89262847 8926EA56 8BE84688 0A5EC400 6FE90375 EA460BE8 4688E256 89E04689 .FÁ.Vã.FÒ.Fõu.Õo.á^..FÒ.Võ&.G(&. 000040
 7E83E446 890CC483 00005894 9A006AE8 76FFEA76 FF088868 0676FF08 76FF2A57 W*.v..v.h|..võ.vÒj...X...á..Fõ.- 000060
 76FFEA76 FF271068 F076FFF2 76FF5016 F8468001 C6E9E446 880006E9 037500E4 õ.u.Õ...FõÕó..F½.P.v·.vÞh.'.võ.v 000080
 0009E901 96E9E446 880006E9 037500E4 7E83E446 8910C483 000058F4 9A006AE8 Òj..¶X...á..Fõ.-õ.u.Õ...FõÕ..Õ.. 0000A0
 478926FE 5688FC46 880A5EC4 007CE903 75FE460B FC468BF8 4689FA46 89000088 ¡...F¹.F½.F=.F±u.Õ|.á^..F=.V±&.G 0000C0
 76FFFE76 FF08F268 0676FF08 76FFE076 FFE276FF 1A77FF26 0A5EC426 57892624 $&.W&á^.&.w..vã.vÁ.v..v.h·..v±.v 0000E0
 EC468D01 36E9E446 880006E9 037500E4 7E83E446 8912C483 00005924 9A006AFC =j..$Y...á..Fõ.-õ.u.Õ...FõÕó..F§ 000100
 7E83E446 8910C483 00005977 9A006AFC 76FFFE76 FF271068 F076FFF2 76FF5016 .P.v·.vÞh.'.v±.v=j..wY...á..Fõ.- 000120
 75E2460B E0468BEC 4689EE46 89000088 0009E901 06E9E446 880006E9 037500E4 õ.u.Õ...FõÕ..Õ..¡...FŸ.F§.FÁ.Fãu 000140
 76FF0887 680676FF 0876FF2E 5789262C 478926E2 5688E046 880A5EC4 006FE903 .Õo.á^..FÁ.Vã&.G,&.W..v..v.hñ..v 000160
 0083E9E4 46880006 E9037500 E47E83E4 46890CC4 83000059 A79A006A E076FFE2 ã.vÁj..ÌY...á..Fõ.-õ.u.Õ...FõÕ*. 000180
 468910C4 83000059 E49A006A E076FFE2 76FF2710 68F076FF F276FF50 16F44680 .F¶.P.v·.vÞh.'.vã.vÁj..õY...á..F 0001A0
 16E6468D F44689F6 46890000 B80009E9 0083E9E4 46880006 E9037500 E47E83E4 õ.-õ.u.Õ...FõÕ..Õ..¡...F-.F¶.F|. 0001C0
 7E83E446 890CC483 00005A24 9A006A00 8EB7FF26 009087FF 260A5EC4 264C6850 PhL&á^.&.ñ..&.ñ..j..$Z...á..Fõ.- 0001E0

Dump of file SATURN:[PCCOMMON.DUMP.DLL]PDLDGM.TMP;1 on 18-APR-1990 10:48:18.73
File ID (766,30,0)   End of file block 195 / Allocated 196

Virtual block number 50 (00000032), 512 (0200) bytes

 FFEC76FF EE76FFF8 76FFFA76 FFF476FF F676FF00 46E9E446 880006E9 037500E4 õ.u.Õ...FõÕF..v-.v¶.v¹.v½.vŸ.v§. 000000
 7E83E446 891AC483 00005791 9A006A06 76FF0876 FF27F668 F076FFF2 76FFE676 v|.v·.vÞh-'.v..v.j...W...á..Fõ.- 000020
 881E5657 00000CC8 CBC95F5E 1F0000E9 00008800 06E9E446 880006E9 037500E4 õ.u.Õ...FõÕ..¡..Õ...^_èùà...WV.¡ 000040
 0E5EC402 0E4683FC 5689FA46 89FE5788 26FC4788 260E5EC4 040E4683 D88E57DE ßW.Ä.F..á^.&.G=&.W±.F¯.V=.F..á^. 000060
 006AFA76 FFFC76FF 50520030 050C5688 0A468800 9BE9F446 8BF44689 FE478B26 &.G±.F¶.F¶Õ...F..V..0.RP.v=.v¹j. 000080
 005AE49A 5016FE46 8D3077FF 263277FF 260A5EC4 00005ACF 9A5016F6 4680636A jc.F-.P.üZ..á^.&.w2&.w0.F±.P.õZ. 0000A0
 069A5016 F6468D63 6A006AFA 76FFFC76 FF505200 34050C56 880A4688 007FE900 .Õ...F..V..4.RP.v=.v¹j.jc.F-.P.. 0000C0
 56880A46 880048E9 00003EE9 9A5016FE 46803477 FF263677 FF260A5E C4000058 [..á^.&.w6&.w4.F±.P.Õ>..ÕH..F..V 0000E0
 E90001FE 46C70000 FFFF9A50 16F6468D 636A006A FA76FFFC 76FF5052 0038050C ..ß.RP.v=.v¹j.jc.F-.P.....úF±..Õ 000100
 FF88E903 7500033D FF8CE903 75000230 FF5DE903 7500013D 001BE900 1EE90021 |.Õ..Õ..=..u.Õ].=..u.Õ..=..u.ÕE. 000120
 5EC4040E 4683D88E 5A50881E 56570000 0AC8CBC9 5F5E1F00 00E90000 B8FFDFE9 ÕÕ.¡..Õ...^_èùà...WV.¡PZ.Ä.F..á^ 000140
 4689FE57 8B26FC47 8B260E5E C4040E46 83FA5689 F84689FE 578826FC 4788260E .&.G=&.W±.F½.V¹.F..á^.&.G=&.W±.F 000160
 0375FE46 0BFC4688 00EAE9F6 468BF646 89FE4788 260E5EC4 020E4683 FE5689FC =.V±.F..á^.&.G±.F-.F-Õõ..F=.F±u. 000180
 835BF940 B79A5052 0030050C 56880A46 8BF876FF FA76FFFC 76FFFE76 FF0022E9 Õ"..v±.v=.v¹.v½.F..V..0.RP.ñ∂¹[. 0001A0
 005C199A F876FFFA 76FF006A 006A006A 3077FF26 3277FF26 0A5EC400 1CE90CC4 á.Õ..á^.&.w2&.w0j.j.j..v¹.v½..\. 0001C0
 56880A46 8BF876FF FA76FFFC 76FFFE76 FF0022E9 0375FE46 0BFC4688 0089E900 .Õ¿..F=.F±u.Õ"..v±.v=.v¹.v½.F..V 0001E0

Dump of file SATURN:[PCCOMMON.DUMP.DLL]PDLDGM.TMP;1 on 18-APR-1990 10:48:18.73
```

File ID (766,30,0)   End of file block 195 / Allocated 196

Virtual block number 51 (00000033), 512 (0200) bytes

```
006A006A 3477FF26 3677FF26 0A5EC400 1CE90CC4 835C4540 B79A5052 0034050C ..4.RP.ñ@E\.á.Õ..á^.&.w6&.w4j.j. 000000
76FFFE76 FF0022E9 0375FE46 08FC4688 0060E900 005C659A F876FFFA 76FF006A j..v'.v½.e\..Õm..F=.F±u.Õ"..v±.v 000020
0A5EC400 1CE90CC4 83427B40 B79A5052 0038050C 56880A46 88F876FF FA76FFFC =.v'.v½.F..V..8.RP.ñ@(B.á.Õ..á^. 000040
E9001EE9 0021E900 0041089A F876FFFA 76FF006A 006A006A 3877FF26 3A77FF26 &.w:&.w8j.j.j..v'.v½..A..Õ!.Õ..Õ 000060
000088FF DFE9FF96 E9037500 0330FF52 E9037500 0230FF0E E9037500 0130001B ..*..u.Õ..=..u.ÕR.*..u.Õ..ÕÕ.¡.. 000080
26FC4788 260E5EC4 040E4683 D88E5846 B81E5657 000026C8 C8C95F5E 1F0000E9 Õ...^ èùà&..WV.¡F[.Ä.F..á^.&.G=& 0000A0
4683F256 89F04689 FE578826 FC478826 0E5EC404 0E4683FA 5689F846 89FE5788 .W±.F½.V'.F..á^.&.G=&.W±.Fþ.V·.F 0000C0
000247C7 26000107 C726F05E C4E85689 E64689FE 578826FC 4788260E 5EC4040E ..á^.&.G=&.W±.F|.VÒá^Þ&ú...&úG.. 0000E0
890A4689 00989788 26009687 8B260A5E C47FFF02 47C726FF FF07C726 E65EC480 .á^l&ú...&úG...á^.&....&.....FÕ. 000100
3926FA56 88F84688 0A5EC4FE 5689FC46 89009C97 8B26009A 878B260A 5EC40C56 VÉá^.&....&.....F=.V±á^..F½.V'&9 000120
5EC47FFF 0247C726 FFFF07C7 26F05EC4 0022E903 742E5739 26002BE9 03742C47 G,t.Õ+.&9W.t.Õ".á^Þ&ú...&úG...á^ 000140
F876FFFA 76FF08D2 685016F4 468001A5 E9000088 80000247 C7260001 07C726E6 l&ú...&úG...¡..ÕE..F¶.PhØ..v'.v½ 000160
08F44688 017BE9EA 46880006 E9037500 EA7E83EA 46890CC4 83000058 649A006A j..dX...á..Fõ.-õ.u.Õ...FõÕ(..F¶. 000180
C4830000 5DC89A00 6AF476FF F676FF08 A668046A 5016E246 800020E9 0375F646 F-u.Õ ..Fã.Pj.hl..v-.v¶j..à]...á 0001A0
890CC483 00005DF4 9A006AF8 76FFFA76 FF08DD68 5016F446 800047E9 EA46890E ..FõÕG..F¶.Phï..v'.v½j..¶]...á.. 0001C0
76FFF676 FF08A668 086A5016 E2468001 26E9EA46 880006E9 037500EA 7E83EA46 Fõ.-õ.u.Õ...FõÕ&..Fã.Pj.hl..v-.v 0001E0
```

Dump of file SATURN:[PCCOMMON.DUMP.DLL]PDLDGM.TMP;1 on 18-APR-1990 10:48:18.73
File ID (766,30,0)   End of file block 195 / Allocated 196

Virtual block number 52 (00000034), 512 (0200) bytes

```
DE468D00 FAE9EA46 880006E9 037500EA 7E83EA46 890EC483 00005E1E 9A006AF4 ¶j...^...á..Fõ.-õ.u.Õ...FõÕ'..Fß Õ00000
06E90375 00EA7E83 EA46890C C4830000 5E539A00 6AF876FF FA76FF08 03685016 .Ph&..v'.v½j..S^...á..Fõ.-õ.u.Õ. 000020
F876FFFA 76FF08F4 685016EC 468D001E E90374E0 4608DE46 880000E9 EA468800 ..FõÕÄ..Fß.FÁt.Õ...F§.Ph¶..v'.v½ 000040
DE76FFE0 76FF08A6 68046A50 16EC4680 001DE9EA 46890CC4 8300005E 739A006A j..s^...á..FõÕ...F§.Pj.hl..vÁ.vß 000060
03750856 390008E9 03740646 39FA5688 F8468BEA 46890EC4 8300005E A69A006A j..l^...á..Fõ.F½.V'9F.t.Õ..9V.u. 000080
EA46890E C4830000 5EC79A00 6AF876FF FA76FF08 A668046A 5016EC46 80001DE9 Õ...F§.Pj.hl..v'.v½j..ú^...á..Fõ 0000A0
468910C4 8300005E F79A006A EC76FFEE 76FF265F 6850160A 4680F076 FFF276FF .v·.vÞ.FÕ.Ph_&.vŸ.v§j..X^...á..F 0000C0
76FF265F 6850160A 4680E676 FFE876FF 0027E9EA 46880006 E9037500 EA7E83EA õ.-õ.u.Õ...FõÕ'..vÒ.v|.FÕ.Ph_&.v 0000E0
000006C8 C8C95F5E 1F0000E9 EA4688EA 468910C4 8300005D 739A006A E276FFE4 Õ.vãj..s]...á..Fõ.FõÕ...^_èùÃ... 000100
FA5EC4FC 5689FA46 89FE5788 26FC4788 260E5EC4 040E4683 D88E5CA0 B81E5657 WV.¡.\.Ä.F..á^.&.G=&.W±.F¯.V=á^' 000120
07FE46C7 0024E900 06FE46C7 0019E91A 478B260A 5EC40789 26024789 26000088 ¡..&.G.&..á^.&.G.Õ..úF±..Õ$.úF±. 000140
FFE4E9FF DFE90375 00023DFF DFE90375 00013D00 13E9003A E9000088 001CE900 .Õ..¡..Õ:.Õ..=..u.ÕÕ.=..u.ÕÕ.ÕÕ. 000160
C4830000 5DAA9A00 6A2477FF 262677FF 260A5EC4 08A668FE 76FFFA76 FFFC76FF .v=.v'.v±hl.á^.&.w&&.w$j..`)...á 000180
FC478826 0E5EC404 0E4683D8 8E5F1488 1E565700 0004C8C8 C95F5E1F 0000E90E .Õ...^_èùà...WV.¡._.Ä.F..á^.&.G= 0001A0
5E1F0000 E9000088 078926FC 5EC400E2 878B260A 5EC4FE56 89FC4689 FE578826 &.W±.F=.V±á^.&..ã.Ã^=&..¡..Õ...^ 0001C0
89FE4788 260E5EC4 020E4683 0000F846 C7D88E5F A1881E56 57000008 C8C8C95F _èùà...WV.¡À_.ÄúF½...F..á^.&.G±. 0001E0
```

Dump of file SATURN:[PCCOMMON.DUMP.DLL]PDLDGM.TMP;1 on 18-APR-1990 10:48:18.73
File ID (766,30,0)   End of file block 195 / Allocated 196

Virtual block number 53 (00000035), 512 (0200) bytes

```
0A5EC400 0060719A 3077FF26 3277FF26 0A5EC400 E2878926 FE46880A 5EC4FE46 F±á^..F±&..ã.á^.&.w2&.w0.q'..á^. 000000
265A68FE 76FF003B E9037400 003D0000 60869A50 16FA468D 3077FF26 3277FF26 &.w2&.w0.F'.P..`..=..t.Õ;..v±hZ& 000020
260A5EC4 0016E903 7500F87E 83F84689 0AC48300 0060A19A 006AFA76 FFFC76FF .v=.v'j..À'...á..F½.-½.u.Õ..á^.& 000040
3077FF26 3277FF26 0A5EC4FF A8E90071 E9F84688 000047DC 9A3077FF 263277FF .w2&.w0.ÉG...F½Õq.Õ`.á^.&.w2&.w0 000060
E9037400 003D0000 51419A50 16FA468D 3077FF26 3277FF26 0A5EC400 00512C9A .,Q..á^.&.w2&.w0.F'.P.AQ..=..t.Õ 000080
7500F87E 83F84689 0AC48300 005F8A9A 006AFA76 FFFC76FF 265A68FE 76FF003B ;..v±hZ&.v=.v'j..._...á..F½.-½.u 0000A0
F84688FF A8E90009 E9F84688 00006058 9A3077FF 263277FF 260A5EC4 0016E903 .Õ..á^.&.w2&.w0.X'¯..F½Õ..Õ`..F½ 0000C0
26FC4788 260E5EC4 040E4683 D88E5FDB B81E5657 000004C8 C8C95F5E 1F0000E9 Õ...^_èùà...WV.¡Û_.Ä.F..á^.&.G=& 0000E0
000004C8 C8C95F5E 1F0000E9 0000B800 0007C726 FC5EC4FE 5689FC46 89FE5788 .W±.F=.V±á^=&ú...¯|..Õ...^_èùà... 000100
0A5EC4FE 5689FC46 89FE5788 26FC4788 260E5EC4 040E4683 D88E60E0 B81E5657 WV.¡À'.Ä.F..á^.&.G=&.W±.F=.V±á^. 000120
C8C8C95F 5E1F0000 E9000088 02578926 078926FC 5EC400E6 978B2600 E4878826 &..Õ.&..|.á^=&..&.W.¡..Õ...^_èùà 000140
DC56890A 4689FE57 8826FC47 88260E5E C4040E46 83D88E61 14881E56 57000038 8..WV.¡.a.Ä.F..á^.&.G=&.W±.FÕ.VÉ 000160
FE478826 0E5EC402 0E4683D6 56890446 89FE5788 26FC4788 260E5EC4 040E4683 .F..á^.&.G=&.W±.FÅ.Vø.F..á^.&.G± 000180
260E5EC4 040E4683 D256890D 4689FE57 8826FC47 88260E5E C4040E46 83F64689 .F-.F..á^.&.G=&.W±.FÅ.VØ.F..á^.& 0001A0
89C84689 FE578826 FC478826 0E5EC404 0E4683FE 5689FC46 89FE5788 26FC4788 .G=&.W±.F=.V±.F..á^.&.G=&.W±.Fà. 0001C0
07892602 47892600 0088C85E C40007C6 26FC5EC4 0000CC46 C7001408 46C7CA56 VòúFÄ..úFä..á^=&ó..á^à¡..&.G.&.. 0001E0
```

Dump of file SATURN:[PCCOMMON.DUMP.DLL]PDLDGM.TMP;1 on 18-APR-1990 10:48:18.73

```
File ID (766,30,0)   End of file block 195 / Allocated 196

Virtual block number 54 (00000036), 512 (0200) bytes

 00006224 9A006A06 76FF0876 FF08A668 026A5016 F8468D00 32E90374 07F67E83 .—.t.Õ2..F%.Pj.h|..v..v.j..$b.. 000000
 50160846 8D0CC483 0000624E 9A006AF8 76FFFA76 FF264C68 5016CC46 8D0EC483 .á..Fä.PhL&.v'.v½j..Nb...á..FÁ.P 000020
 60399A00 6A0676FF 0876FF27 1A680A76 FF0C76FF CC76FF02 0468FC76 FFFE76FF .v±.v•h...vä.v£.vÖh.'.v..v.j..9' 000040
 26009687 8B260A5E C40090E9 CE468B00 06E90375 00CE7E83 CE468918 C4830000 ...á..Fö.~ö.u.Õ...FöÕ..á^.&....& 000060
 8B260A5E C4E05689 DE468900 D2830032 050A5713 26084703 26005EC4 0098978B ....á^Ä&.G.&.W..2..Ø..F8.VÄá^.&. 000080
 76FFD476 FF0676FF E45689E2 46890257 13260703 26005EC4 009C978B 26009A87 ...&....á^Ä&..&.W..Fä.VÕ.vø.vå.v 0000A0
 00CE7E83 CE468900 001FC69A 5016E646 8D046A50 160E468D 1E6A006A FC76FFFE ±.v•j.j..F8.Pj..F|.P.ó....Fö.~ö. 0000C0
 57892607 8926E856 1BE6462B F0568BEE 468BC85E C4001CE9 CE468800 06E90375 u.Õ...FöÕ..á^à.FŸ.Vþ+F|.VÒ&..&.W 0000E0
 02050856 8B06468B D88E6157 B81E5657 000000C8 CBC95F5E 1F0000E9 00008802 .|..Õ...^_èùà...WV.¡Wa.Ä.F..V... 000100
 1E016A05 6AFFFF68 5BAD68D8 8E6304B8 1E565700 0000C8CB C95F5E1F 0000E900 .Õ...^_èùã...WV.¡.c.AhÚ[h..j.j.. 000120
 CBC95F5E 1F0000E9 18C48300 00FFFF9A 006A096A 016A006A 006A00E8 68000068 h..hÒ.J.j.j.j.j........á.Õ...^_èù 000140
 620C9A00 6A0676FF 0876FF08 DF680A76 FF0C76FF D88E6321 B81E5657 000000C8 à...WV.¡!c.Ä.v..v.hÔ..v..v.j...b 000160
 680A76FF 0C76FFD8 8E6358B8 1E565700 0000C8CB C95F5E1F 0000E90C C4830000 ...á.Õ...^_èùà...WV.¡Xc.Ä.v..v.h 000180
 0A5EC4D8 F7C01B01 3F83260A 5EC40CC4 83000063 6E9A006A 0676FF08 76FF08E1 Ä..v..v.j..nc...á.á^.&.?..ä¼Ää^. 0001A0
 685016FE 468D088E 6385B81E 56570000 02C8CBC9 5F5E1F00 00E90000 B8078926 &..¡..Õ...^_èùà...WV.¡.c.Ä.F±.Ph 0001C0
 03E90001 B80006E9 037502FE 7E830CC4 83000063 9B9A006A 0676FF08 76FF08D0 Ä..v..v.j..c...á..~±.u.Õ..¡..Õ. 0001E0

Dump of file SATURN:[PCCOMMON.DUMP.DLL]PDLDGM.TMP;1 on 18-APR-1990 10:48:18.73
File ID (766,30,0)   End of file block 195 / Allocated 196

Virtual block number 55 (00000037), 512 (0200) bytes

 03420008 055A0203 001F90CB C95F5E1F 0000E900 00B80789 260A5EC4 00008800 .|..á^.&..¡..Õ...^_èù.....Z...B. 000000
 01E50005 27360203 00740003 515E0203 00000002 63260002 02CE0007 00380203 ..8...ö...&c......xQ..t...6'..|. 000020
 035C0008 5A980203 01F00005 3E200203 02DF0007 62C50203 00F00004 540B0203 ...T..Þ...éb..Õ... >..Þ....Z..\. 000040
 0000002B 63C60002 036B0008 096C0203 0000002A 3D060002 01750005 28300203 ..0(..u...ø=*.....l...k...6c+... 000060
 02FE0008 60090203 62FC0002 63290005 009B0003 54770203 00170003 63410203 ..Ac......wT.......)c..=b...`..±. 000080
 03930008 5AAD0203 030F0008 60C00203 01270004 4E3E0203 002A0003 63DB0203 ..Ùc..*...>N..'...å'......ÙZ.... 0000A0
 00C90003 49980203 039F0008 58CD0203 013B0004 4E890203 0472000D 53200203 .. S..r....N..;...ë(.......I..è. 0000C0
 03370008 01A00203 01540004 19340203 01470004 4E520203 03230008 601E0203 ...`..#...RN..G...4...T.......7. 0000E0
 040E4683 D88EFFFF B81E5657 000014C8 02C30007 1DD00203 00630003 16E90203 ..Õ...c...T...Ù.à...WV.¡...Ä.F.. 000100
 FE578B26 FC478B26 0E5EC404 0E4683FE 5689FC46 89FE578B 26FC478B 260E5EC4 á^.&.G=&.W±.F=.V±.F..á^.&.G=&.W± 000120
 FA5689F8 4689FE57 8B26FC47 8B260E5E C4040E46 831E5789 261C4789 260A5EC4 á^.&.G.&.W..F..á^.&.G=&.W±.F½.V' 000140
 260A5EC4 12478B26 FC5EC4F4 5689F246 89FE578B 26FC478B 260E5EC4 040E4683 .F..á^.&.G=&.W±.F·.V¶á^•&.G.á^.& 000160
 685016EE 468D1FA5 F20008B9 DA8E1EF0 8B0A7F8D FE568BFC 468B0A5E C4204789 .G á^..F•.V±....Þ..Õ¿..·É..FŸ.Ph 000180
 7403127F 8326FC5E C40CC483 000000CA 9A006A1C 77FF261E 77FF260A 5EC408F7 %.á^.&.w.&.w.j..ò....á.á^•&....t 0001A0
 C4830000 01D79A00 6A1C77FF 261E77FF 260A5EC4 08F56850 16F6468D 006BE903 .Õk..F-.Ph%.á^.&.w.&.w.j..■....á 0001C0
 83F64E2B DA1BC82B F05E88EE 4E88FFFF 00D29A37 FF26006A F85EC428 6A006A0C .j.j(á^½j.&.7.Ø....NŸ.^Þ+à.Õ+N-. 0001E0

Dump of file SATURN:[PCCOMMON.DUMP.DLL]PDLDGM.TMP;1 on 18-APR-1990 10:48:18.73
File ID (766,30,0)   End of file block 195 / Allocated 196

Virtual block number 56 (00000038), 512 (0200) bytes

 5EC4000A 8300142D 18578B26 16478B26 0A5EC418 5C892616 4C89260A 76C4000B Ü.áv.&.L.&.\.á^.&.G.&.W.-...Õ.á^ 000000
 FC5EC422 4789260A 5EC41447 8B26FC5E C407FF26 F85EC410 5789260E 4789260A .&.G.&.W.á^½&..á^=&.G.á^.&.G"á^• 000020
 4F89260A 5EC4D9F7 C91B013C 01241A47 8A26FC5E C4244789 260A5EC4 16478B26 &.G.á^.&.G$á^•&.G.$.<..è%)á^.&.O 000040
 260A5EC4 000CE903 7404207F 83260A5E C41A4789 260A5EC4 10478B26 FC5EC42A *á^=&.G.á^.&.G.á^.&.. .t.Õ..á^.& 000060
 26FC5EC4 50520026 050C568B 0A468800 002C47C7 260A5EC4 0009E900 012C47C7 ÚG,..Õ..á^.&úG,...F..V..&.RPá^=& 000080
 C400FBE9 EC468B00 06E90375 00EC7E83 EC468908 C4830000 FFFF9A00 6A1877FF .w.j.......á..F§.~$.u.Õ. .FšÕ«.á 0000A0
 2877FF26 0A5EC403 25685052 000A050C 56880A46 88016A00 C8E92047 8B260A5E ^.&.G Õà.j..F..V....RPh%. ^.&.w( 0000C0
 25685052 000A050C 56880A46 88016A00 C3E90EC4 83000001 FF9A006A 2677FF26 &.w&j.......á.Õù.j..F..V....RPh% 0000E0
 56880A46 8B036A00 9BE90EC4 83000002 279A006A 2677FF26 2877FF26 0A5EC403 .á^.&.w(&.w&j..'....á.Õ..j..F..V 000100
 73E90EC4 83000002 4F9A006A 2677FF26 2877FF26 0A5EC403 25685052 000A050C ....RPh%.á^.&.w(&.w&j..O....á.Õs 000120
 779A006A 2677FF26 2877FF26 0A5EC403 25685052 000A050C 56880A46 88036A00 .j..F..V....RPh%.á^.&.w(&.w&j..w 000140
 2877FF26 0A5EC403 25685052 000A050C 56880A46 88036A00 4BE90EC4 83000002 ....á.ÕK.j..F..V....RPh%.á^.&.w( 000160
 50E90375 00023DFF 30E90375 00013D00 23E90EC4 830000FF FF9A006A 2677FF26 &.w&j.......á.Õ#.=..u.Õ0.=..u.ÕP 000180
 C8CBC95F 5E1F0000 E9000088 FFB5E9FF 90E90375 00043DFF 70E90375 00033DFF .*..u.Õp.=..u.Õ..Õç.¡..Õ...^_èùà 0001A0
 02B7B81E 56570000 04C8CBC9 5F5E1F00 00E90000 B8D88E00 08B81E56 57000000 ...WV.¡...Ä¡..Õ...^_èùà...WV.¡ñ. 0001C0
 5EC42047 8B260A5E C4FE5689 FC4689FE 578B26FC 478B260E 5EC4040E 4683D88E .Ä.F..á^.&.G=&.W±.F=.V±á^.&.G á^ 0001E0

Dump of file SATURN:[PCCOMMON.DUMP.DLL]PDLDGM.TMP;1 on 18-APR-1990 10:48:18.73
```

```
File ID (766,30,0)   End of file block 195 / Allocated 196

Virtual block number 57 (00000039), 512 (0200) bytes

 C4040E46 83D88E02 CE881E56 57000024 C8C8C95F 5E1F0000 E9000088 078926FC =&..¡..Õ...^ èùà$..WV.¡ö..Ä.F..á 000000
 89FE5788 26FC4788 260E5EC4 040E4683 FA5689F8 4689FE57 8826FC47 88260E5E ^.&.G=&.W±.F½.V'.F..á^.&.G=&.W±. 000020
 5EC4040E 46830E56 890C4689 FE578826 FC478826 0E5EC404 0E4683E2 5689E046 FÁ.Vã.F..á^.&.G=&.W±.FÉ.V8.F..á^ 000040
 E25613E0 46030C57 88260A47 88260A5E C4FE5689 FC4689FE 578826FC 4788260E .&.G=&.W±.F=.V±á^.&.G.&.W..FÁ.Vã 000060
 0A5EC4EE 5689EC46 890E5613 0C460310 5788260E 4788260A 5EC4EA56 89E84689 .FÒ.Võá^.&.G.&.W..FÉ.V8.Fš.VŸá^. 000080
 03185788 26164788 260A5EC4 F25689F0 4689E256 13E04603 14578826 12478826 &.G.&.W..FÁ.Vã.FÞ.V·á^.&.G.&.W.. 0000A0
 16E4468D FC76FFFE 76FF5016 E8468DF8 76FFFA76 FFF65689 F446890E 56130C46 FÉ.V8.F¶.V-.v'.v½.FÒ.P.v±.v=.Fð. 0000C0
 5EC4040E 4683D88E 0307881E 56570000 20C8C8C9 5F5E1F00 00E90000 FFFF9A50 P.....Õ...^ èùà ..WV.¡...Ä.F..á^ 0000E0
 4689FE57 8826FC47 88260E5E C4040E46 83EA5689 E84689FE 578826FC 4788260E .&.G=&.W±.FÕ.Võ.F..á^.&.G=&.W±.F 000100
 0E5EC404 0E4683E2 5689E046 89FE5788 26FC4788 260E5EC4 040E4683 E65689E4 ð.V|.F..á^.&.G=&.W±.FÁ.Vã.F..á^. 000120
 89E65613 E446030C 5788260A 4788260A 5EC4FE56 89FC4689 FE578826 FC478826 &.G=&.W±.F=.V±á^.&.G.&.W..Fð.V|. 000140
 260A5EC4 F25689F0 4689E256 13E04603 10578826 0E478826 0A5EC4EE 5689EC46 F§.VŸá^.&.G.&.W..FÁ.Vã.FÞ.V·á^.& 000160
 46031857 88261647 88260A5E C4F65689 F44689E6 5613E446 03145788 26124788 .G.&.W..Fð.V|.F¶.V-á^.&.G.&.W..F 000180
 0000FFFF 9AFC76FF FE76FF50 16EC468D E876FFEA 76FFFA56 89F84689 E25613E0 Å.Vã.F½.V'.võ.vÒ.F§.P.v±.v=..... 0001A0
 26FC4788 260E5EC4 040E4683 D88E03E6 881E5657 000010C8 CBC95F5E 1F0000E9 õ...^ èùà...WV.¡|..Ä.F..á^.&.G=& 0001C0
 88260E5E C4020E46 83F44689 FE478826 0E5EC402 0E4683FC 5689FA46 89FE5788 .W±.F‾.V=.F..á^.&.G±.F¶.F..á^.&. 0001E0

Dump of file SATURN:[PCCOMMON.DUMP.DLL]PDLDGM.TMP;1 on 18-APR-1990 10:48:18.73
File ID (766,30,0)   End of file block 195 / Allocated 196

Virtual block number 58 (0000003A), 512 (0200) bytes

 5EC4040E 4683F856 89F64689 FE578826 FC478826 0E5EC404 0E4683FE 4689FE47 G±.F±.F..á^.&.G=&.W±.F-.V½.F..á^ 000000
 260A5EC4 0034E903 7504207F 83260A5E C4F25689 F04689FE 578826FC 4788260E .&.G=&.W±.FÞ.V·á^.&.. .u.Õ4.á^.& 000020
 03750120 7F83260A 5EC4001A E9037507 207F8326 0A5EC400 27E90375 06207F83 .. .u.Õ'.á^.&.. .u.Õ..á^.&.. .u. 000040
 FFF876FF F076FFF2 76FF0037 E9000088 0006E903 7402207F 83260A5E C4000DE9 Õ..á^.&.. .t.Õ..¡..Õ7..v·.vÞ.v½. 000060
 1C77FF26 1E77FF26 0A5EC427 1A68FA76 FFFC76FF 1A77FF26 0A5EC4FE 76FFF676 v-.v±á^.&.w..v=.v'h.'á^.&.w.&.w. 000080
 4683D88E 04C0881E 56570000 16C8C8C9 5F5E1F00 00E918C4 83000000 A09A006A j.......á.Õ...^ èùà...WV.¡á..Ä.F 0000A0
 46891E57 88261C47 88260A5E C4EC5689 EA4689FE 578826FC 4788260E 5EC4040E ..á^.&.G=&.W±.Fõ.Všá^.&.G.&.W..F 0000C0
 20478826 0A5EC4F6 5689F446 89FE5788 26FC4788 260E5EC4 040E4683 F25689F0 Þ.V·.F..á^.&.G=&.W±.F¶.V-á^.&.G 0000E0
 08896801 6A0CC483 00000619 9A006AF0 76FFF276 FF088068 5016FC46 80007EE9 Õ-..F=.Ph¯..v·.vÞj.......á.j.h¿. 000100
 76FFF276 FF088168 5016FC46 8D0069E9 0AC48300 0006349A 006AF076 FFF276FF .v·.vÞj..4....á.Õi..F=.PhŸ..v·.v 000120
 0AC48300 0006649A 006AF076 FFF276FF 08CA6801 6A0CC483 00000649 9A006AF0 Þj..I....á.j.hò..v·.vÞj..d....á. 000140
 18E9001E E90CC483 000006C9 9A006AF0 76FFF276 FF088268 5016FC46 800039E9 Õ9..F=.Phý..v·.vÞj..è....á.Õ..Õ. 000160
 FFFE76FF FFDFE9FF CAE90375 00033DFF A2E90375 00023DFF 7AE90375 00013D00 .=..u.Õz.=..u.ÕÀ.=..u.Õò.ÕÕ..v±. 000180
 08F8468B 0000FFFF 9AEA76FF EC76FF50 16FC468D 0000FFFF 9A5016F8 4680FC76 v=.F½.P......F=.P.vš.võ......F½. 0001A0
 0CC48300 0006F49A 006AF876 FFFA76FF 088768EA 76FFEC76 FF008AE9 0375FA46 F'u.Õ...vš.võhñ..v'.v½j..¶....á. 0001C0
 76FFEC76 FF088868 F876FFFA 76FF008E E9EE4688 0006E903 7500EE7E 83EE4689 .FŸ.-Ÿ.u.Õ...FŸÕ...v'.v½h¡..vš.v 0001E0

Dump of file SATURN:[PCCOMMON.DUMP.DLL]PDLDGM.TMP;1 on 18-APR-1990 10:48:18.73
File ID (766,30,0)   End of file block 195 / Allocated 196

Virtual block number 59 (0000003B), 512 (0200) bytes

 EC76FF00 63E9EE46 880006E9 037500EE 7E83EE46 890CC483 00000725 9A006AEA õj..%....á..FŸ.-Ÿ.u.Õ...FŸÕc..vš 000000
 83EE4689 10C48300 0007609A 006AF876 FFFA76FF 27D868F4 76FFF676 FFEA76FF .võ.v-.v¶hÚ'.v'.v½j..'....á..FŸ. 000020
 76FF1A77 FF260A5E C4EA76FF EC76FF00 29E90032 E9EE4688 0006E903 7500EE7E -Ÿ.u.Õ...FŸÕ2.Õ)..vš.võá^.&.w..v 000040
 0000E9EE 4688EE46 8912C483 00000593 9A006AF0 76FFF276 FF27D868 F476FFF6 -.v¶hÄ'.v·.vÞj.......á..FŸ.FŸÕ.. 000060
 FE578826 FC478826 0E5EC404 0E4683D8 8E05AA88 1E565700 001EC8CB C95F5E1F .^ èùà...WV.¡¯..Ä.F..á^.&.G=&.W± 000080
 88260E5E C4040E46 83F25689 F046891E 5788261C 4788260A 5EC4E856 89E64689 .F‾.Vòá^.&.G.&.W..FÞ.V·.F..á^.&. 0000A0
 76FF0880 685016F8 46800069 E9204788 260A5EC4 F65689F4 4689FE57 8826FC47 G=&.W±.F¶.V-á^.&.G Õi..F½.Ph¯..v 0000C0
 00000807 9A006AF0 76FFF276 FF08B968 016A0CC4 83000007 EC9A006A F076FFF2 ·.vÞj..š....á.j.h¿..v·.vÞj...... 0000E0
 016A0CC4 83000008 1C9A006A F076FFF2 76FF08B1 685016F8 4680004C E90AC483 .á.ÕL..F½.PhŸ..v·.vÞj.......á.j. 000100
 300013E9 0150E900 0088001C E90AC483 0000089B 9A006AF0 76FFF276 FF08CA68 hò..v·.vÞj.......á.Õ..¡..Õ].Õ..= 000120
 EC468D03 E768006A F876FFFA 76FFFFE4 E9FFB7E9 03750007 30FF8FE9 03750006 ..u.Õ..=..u.Õñ.ÕÕ..v'.v½j.hÕ..F§ 000140
 76FF00DC E9037700 EC7E8300 09E90376 00EAE903 7300EE7E 830000FF FF9A5016 .P.......~Ÿ.s.Õõ.v.Õ...-š.w.ÕÉ..v 000160
 68E676FF E876FF00 56E90375 FE4608FC 46880000 FFFF9A50 16FC468D F876FFFA '.v½.F=.P......F=.F±u.ÕV..vÒ.v|h 000180
 46880006 E9037500 EA7E83EA 46890CC4 83000008 C69A006A FC76FFFE 76FF08B8 |..v±.v=j..õ....á..Fõ.-õ.u.Õ...F 0001A0
 EA46890C C4830000 090F9A00 6AE676FF E876FF08 8768FC76 FFFE76FF 0005E9EA õÕ{..v±.v=hñ..vÒ.v|j.......á..Fð 0001C0
 E876FF01 6AEC76FF EE76FFF8 76FFFA76 FF00AAE9 EA468800 06E90375 00EA7E83 .-õ.u.Õ...FõÕ^..v'.v½.vŸ.všj..vÒ 0001E0

Dump of file SATURN:[PCCOMMON.DUMP.DLL]PDLDGM.TMP;1 on 18-APR-1990 10:48:18.73
```

File ID (766,30,0)   End of file block 195 / Allocated 196

Virtual block number 60 (0000003C), 512 (0200) bytes

```
2E9A006A FC76FFFE 76FF2710 68F476FF F676FF50 16E2468D 0000FFFF 9AE676FF .vl......Fã.P.v-.v¶h.'.vt.v=j... 000000
09799A00 6AFC76FF FE76FF27 DC68F476 FFF676FF E676FFE8 76FF10C4 83000009 ....á..vò.vl.v-.v¶hÉ'.vt.v=j..y. 000020
FF5016F8 468D0039 E90042E9 EA468B00 06E90375 00EA7E83 EA468910 C4830000 ...á..Fö.-ö.u.Ö...FöÖB.Ö9..F½.P. 000040
27D868F4 76FFF676 FF1A77FF 260A5EC4 E676FFE8 76FF0000 06A89AE6 76FFE876 vò.vl.´....vò.vlá^.&.w..v-.v¶hÄ' 000060
20C8C8C9 5F5E1F00 00E9EA46 88EA4689 12C48300 0006049A 006AF076 FFF276FF .v·.vÞj.......á..Fö.FöÖ...^_èùà 000080
C4F25689 F04689FE 578B26FC 478B260E 5EC4040E 4683D88E 077D881E 56570000 ..WV.¡)..Ä.F..á^.&.G=&.Wt.FÞ.V·á 0000A0
89FE578B 26FC478B 260E5EC4 040E4683 E45689E2 46891E57 8B261C47 8B260A5E ^.&.G.&.W..Fã.Vö.F..á^.&.G=&.Wt. 0000C0
271068EA 76FFEC76 FF5016F8 468D01AF E9037500 1A7F8326 0A5EC4EC 5689EA46 Fö.Vší^.&....u.ÖÉ..F½.P.vš.vöh.' 0000E0
0000FFFF 9A5016EE 468DEA76 FFEC76FF 10C48300 000A429A 006AF076 FFF276FF .v·.vÞj..B....á..vš.vö.FŸ.P..... 000100
1A77FF26 0A5EC450 16FC468D 0000FFFF 9AEA76FF EC76FF00 08E90375 00EE7E83 .-Ÿ.u.Ö...vš.vö......F=.Pá^.&.w. 000120
E9037500 EE7E8312 C4830000 0A9D9A00 6AE276FF E476FF27 1468EA76 FFEC76FF .vš.vöh.'.vö.vãj.......á..-Ÿ.u.Ö 000140
4639FE56 88FC4688 0016E903 75FE460B FC468B00 00FFFF9A EA76FFEC 76FF000B ...vš.vö......F=.Ftu.Ö...F=.Vt9F 000160
76FF0876 FF5016E6 468D009C E90000E0 46C70008 E90374FA 56390010 E90374F8 ½t.Ö..9V*t.Ö..úFÄ..Ö...Fl.P.v..v 000180
FC76FFFE 76FFF876 FFFA76FF 10C48300 000AC99A 006AE276 FFE476FF 08D56806 .hÍ..vö.vãj..è....á..v*.v½.vt.v= 0001A0
16C48300 0008429A 006AE276 FFE476FF 27EC68EA 76FFEC76 FF1A77FF 260A5EC4 á^.&.w..vš.vöhš'.vö.vãj..B....á. 0001C0
7500E07E 83E04689 CCC48300 00FFFF9A 006AE676 FFE876FF EA76FFEC 76FF016A j..vš.vö.vò.vlj.......á..FÄ.-Ä.u 0001E0
```

Dump of file SATURN:[PCCOMMON.DUMP.DLL]PDLDGM.TMP;1 on 18-APR-1990 10:48:18.73
File ID (766,30,0)   End of file block 195 / Allocated 196

Virtual block number 61 (0000003D), 512 (0200) bytes

```
FF0A76FF 0C76FF26 5668F076 FFF276FF EA76FFEC 76FF009D E9E04688 0006E903 .Ö...FÄÖ...vš.vö.v·.vÞhV&.v..v.. 000000
66E9E046 880006E9 037500E0 7E830075 E914C483 0000FFFF 9A006A06 76FF0876 v..v.j.......á.Öu..-Ä.u.Ö...FÄÖf 000020
C4F076FF F276FF0C C4830000 08689A00 6AE276FF E476FF08 B2685016 F4468D00 ..F¶.Phý..vö.vãj..h....á..v·.vÞá 000040
8912C483 000007D7 9A006AE2 76FFE476 FF27D868 EA76FFEC 76FF1A77 FF260A5E ^.&.w..vš.vöhÄ'.vö.vãj..=....á.. 000060
0009569A F076FFF2 76FF5016 F4468D00 16E9E046 880006E9 037500E0 7E83E046 FÄ.-Ä.u.Ö...FÄÖ...F¶.P.v·.vÞ.V.. 000080
260E5EC4 040E4683 D88E0996 881E5657 000018C8 C8C95F5E 1F0000E9 E0468800 ..FÄÖ...^_èùà...WV.¡...Ä.F..á^.& 0000A0
4683EC56 89EA4689 1E578826 1C478B26 0A5EC4F6 5689F446 89FE578B 26FC478B .G=&.Wt.F¶.V-á^.&.G.&.W..Fö.Vš.F 0000C0
0121E903 75001A7F 83260A5E C4F05689 EE4689FE 578B26FC 478B260E 5EC4040E ..á^.&.G=&.Wt.FŸ.VÞá^.&....u.Öl. 0000E0
76FF10C4 8300000C 509A006A F476FFF6 76FF2710 68EE76FF F076FF50 16F8468D .F½.P.vÞ.vŸh.'.v-.v¶j..P....á..v 000100
0A209AEE 76FFF076 FF000BE9 037500F2 7E830000 0A0C9A50 16F2468D EE76FFF0 Þ.vŸ.F·.P......-·.u.Ö...vÞ.vŸ. . 000120
9A006AEA 76FFEC76 FF271468 EE76FFF0 76FF1A77 FF260A5E C45016FC 468D0000 ...F=.Pá^.&.w..vÞ.vŸh.'.vš.vöj.. 000140
460BFC46 8800000A 599AEE76 FFF076FF 000BE903 7500F27E 8312C483 00000007 .....á..-·.u.Ö...vÞ.vŸ.Y....F=.F 000160
00E846C7 0008E903 74FA5639 0010E903 74F84639 FE568BFC 46880016 E90375FE ±u.Ö...F=.Vt9F½t.Ö..9V*t.Ö..úFÖ. 000180
C4830000 0AE19A00 6AFC76FF FE76FFEE 76FFF076 FF1A77FF 260A5EC4 0045E900 .ÖE.á^.&.w..vÞ.vŸ.vt.v=j..Ä....á 0001A0
189A006A 0676FF08 76FF0A76 FF0C76FF 265868F4 76FFF676 FFEE76FF F076FF0C ..vÞ.vŸ.v-.v¶hX&.v..v..v..v.j.... 0001C0
5EC4F476 FFF676FF 002FE9E8 46880006 E9037500 E87E8300 3EE914C4 83000008 ....á.Ö>..-Ö.u.Ö...FÖÖ/..v-.v¶á^ 0001E0
```

Dump of file SATURN:[PCCOMMON.DUMP.DLL]PDLDGM.TMP;1 on 18-APR-1990 10:48:18.73
File ID (766,30,0)   End of file block 195 / Allocated 196

Virtual block number 62 (0000003E), 512 (0200) bytes

```
468912C4 83000009 F99A006A EA76FFEC 76FF27D8 68EE76FF F076FF1A 77FF260A .&.w..vÞ.vŸhÄ'.vš.vöj..'....á..F 000000
260E5EC4 040E4683 D88E0BA4 881E5657 000016C8 C8C95F5E 1F0000E9 E84688E8 Ö.FÖÖ...^_èùà...WV.¡É..Ä.F..á^.& 000020
468DF256 89F04689 1E578826 1C478B26 0A5EC4EC 5689EA46 89FE578B 26FC478B .G=&.Wt.FÖ.Vší^.&.G.&.W..FÞ.V·.F 000040
76FF027F 685016F4 468D0CC4 83000000 779A006A F076FFF2 76FF0885 685016F8 ½.Phç..v·.vÞj..w....á..F¶.Ph...v 000060
9A006AEA 76FFEC76 FF089868 0676FF08 76FF0CC4 83000000 909A006A F876FFFA '.v½j.......á..v..v..h...vš.vöj.. 000080
EA76FFEC 76FF08CE 680676FF 0876FF04 09E92047 8B260A5E C40CC483 000000B3 °....á.á^.&.G Ö...v..v..hö..vš.vö 0000A0
00000E18 9A006AEA 76FFEC76 FF08B668 F076FFF2 76FF0CC4 83000000 CC9A006A j..ë....á..v·.vÞhÑ..vš.vöj...... 0000C0
006A0676 FF0876FF 0A76FF0C 76FFF2652 68EA76FF EC76FFF4 76FFF676 FF0CC483 .á..v-.v¶.vš.vöhR&.v..v..v..v.j. 0000E0
FF08CF68 016A03C9 E9EE4688 0006E903 7500EE7E 83EE4689 14C48300 000E7B9A .(....á..FŸ.-Ÿ.u.Ö...FŸÖè.j.hü.. 000100
76FF0876 FF03A2E9 00012C47 C7260A5E C40AC483 00000E30 9A006AEA 76FFEC76 vš.vöj..=....á.á^.&úG,..ÖÄ..v..v 000120
EC76FF08 B668F076 FFF276FF 0CC48300 000E569A 006AEA76 FFEC76FF 08CE6806 .hö..vš.vöj..V....á..v·.vÞhÑ..vš 000140
FF0C76FF 265268EA 76FFEC76 FFF476FF F676FF0C C4830000 0EA29A00 6AEA76FF .vöj..Ä....á..v-.v¶.vš.vöhR&.v.. 000160
46880006 E9037500 EE7E83EE 468914C4 8300000F 059A006A 0676FF08 76FF0A76 v..v..v.j.......á..FŸ.-Ÿ.u.Ö...F 000180
2C47C726 0A5EC40A C4830000 0EC79A00 6AEA76FF EC76FF08 CF68026A 033FE9EE ŸÖ?.j.hü..vš.vöj..ú....á.á^.&úG, 0001A0
76FF0CC4 8300000E E09A006A EA76FFEC 76FF08B6 68F076FF F276FF03 18E90001 ..Ö...v·.vÞhÑ..vš.vöj..Ä....á..v 0001C0
EC76FFF4 76FFF676 FF0CC483 00000F1D 9A006AEA 76FFEC76 FF08CE68 0676FF08 ..v.hö..vš.vöj.......á..v-.v¶.vš 0001E0
```

Dump of file SATURN:[PCCOMMON.DUMP.DLL]PDLDGM.TMP;1 on 18-APR-1990 10:48:18.73

```
File ID (766,30,0)   End of file block 195 / Allocated 196

Virtual block number 63 (0000003F), 512 (0200) bytes

 6AEE4689 14C48300 000F459A 006A0676 FF0876FF 0A76FF0C 76FF2656 68EA76FF .võhV&.v..v..v..v.j..E....á..FŸj 000000
 EC76FF00 012C47C7 260A5EC4 0AC48300 000C079A 006AEA76 FFEC76FF 08CF6803 .hü..vš.võj.......á.á^.&úG,...vš 000020
 83EE4689 10C48300 000CCF9A 006A0676 FF0876FF 0A76FF0C 76FF264E 68EA76FF .võhN&.v..v..v..v.j..ü....á..FŸ. 000040
 6AF076FF F276FF08 D6685016 FC468002 6CE90275 E9EE4688 0006E903 7500EE7E ~Ÿ.u.Õ...FŸÕu.Õl..F•.Ph•..v·.vÞj 000060
 0FAF9A00 6AEA76FF EC76FF08 CE68FC76 FFFE76FF EE46890C C4830000 0F8E9A00 .......á..FŸ.v±.v•hö..vš.võj..£. 000080
 D99A006A F076FFF2 76FF08D1 68F476FF F676FFEA 76FFEC76 FF016A0C C4830000 ...á.j..vš.võ.v~.v¶h!..v·.vÞj..\ 0000A0
 08066850 16FC468D 0205E902 0EE9EE46 880006E9 037500EE 7E8312C4 8300000F ....á..~Ÿ.u.Õ...FŸÕ..Õ...F•.Ph•. 0000C0
 6AEA76FF EC76FF08 CE68FC76 FFFE76FF 0CC48300 000FF29A 006AF076 FFF276FF .v·.vÞj..·....á..v±.v•hö..vš.võj 0000E0
 83000010 399A006A F076FFF2 76FF08C8 68EA76FF EC76FF0C C4830000 10089A00 .......á..vš.võhü..v·.vÞj..9.... 000100
 08866BF0 76FFF276 FF01A6E9 01AFE9EE 46880006 E9037500 EE7E83EE 46890CC4 á..FŸ.~Ÿ.u.Õ...FŸÕ€.Õ!..v·.vÞhÑ. 000120
 FF265368 EA76FFEC 76FFF476 FFF676FF 0CC48300 0010859A 006AEA76 FFEC76FF .vš.võj.......á..v~.v¶.vš.võhS&. 000140
 06E90375 00EE7E83 EE468914 C4830000 100F9A00 6A0676FF 0876FF0A 76FF0C76 v..v..v..v.j.Õ....á..FŸ.~Ÿ.u.Õ. 000160
 FF0876FF 0AC48300 00109E9A 006AEA76 FFEC76FF 08CF6801 6A015CE9 EE468800 ..FŸÕ\.j.hü..vš.võj.......á..v.. 000180
 B668F076 FFF276FF 0125E90C C4830000 108A9A00 6AEA76FF EC76FF08 CE680676 v.hö..vš.võj..¤....á.Õ%..v·.vÞhÑ 0001A0
 265368EA 76FFEC76 FFF476FF F676FF0C C4830000 11069A00 6AEA76FF EC76FF08 ..vš.võj.......á..v~.v¶.vš.võhS& 0001C0
 E9037500 EE7E83EE 468914C4 83000011 799A006A 0676FF08 76FF0A76 FF0C76FF .v..v..v..v.j..y....á..FŸ.~Ÿ.u.Õ 0001E0

Dump of file SATURN:[PCCOMMON.DUMP.DLL]PDLDGM.TMP;1 on 18-APR-1990 10:48:18.73
File ID (766,30,0)   End of file block 195 / Allocated 196

Virtual block number 64 (00000040), 512 (0200) bytes

 0876FF0A C4830000 111F9A00 6AEA76FF EC76FF08 CF68026A 00DBE9EE 46880006 ...FŸÕU.j.hü..vš.võj.......á..v. 000000
 68F076FF F276FF00 A4E90CC4 83000011 389A006A EA76FFEC 76FF08CE 680676FF .v.hö..vš.võj..;....á.ÕE..v·.vÞh 000020
 76FFEC76 FF08CE68 0676FF08 76FF0CC4 83000011 549A006A EA76FFEC 76FF08B6 Ñ..vš.võj..T....á..v..v.hö..vš.v 000040
 0A76FF0C 76FF2658 68EA76FF EC76FFF4 76FFF676 FF0CC483 00001191 9A006AEA õj.......á..v~.v¶.vš.võhX&.v..v. 000060
 006AEA76 FFEC76FF 08CF6804 6AEE4689 14C48300 000DF19A 006A0676 FF0876FF .v..v.j..þ....á..FŸj.hü..vš.võj. 000080
 00073000 01200023 E90026E9 0029E900 012C47C7 260A5EC4 0AC48300 00005F9A .¯....á.á^.&úG,..Õ).Õ&.Õ#.-..=.. 0000A0
 0000880F C810A810 2711290F 610EB50E 2B0DA111 BDA7FF2E 93C003FF EFE90376 v.Õÿ..á...Ï§.À.+.ç.®.).'.´.à.¡.. 0000C0
 26FC4788 260E5EC4 040E4683 D88E0024 881E5657 000008C8 C8C95F5E 1F0000E9 Õ...^_èùà...WV.¡$..Ä.F..á^.&.G•& 0000E0
 5EC4FE56 89FC4689 FE578826 FC478826 0E5EC404 0E4683FA 5689F846 89FE5788 .W±.F½.V'.F..á^.&.G•&.W±.F•.V±á^ 000100
 5E1F0000 E90000B8 078926FC 5EC41A47 88260A5E C4078926 F85EC424 4788260A .&.G$á^½&..á^.&.G.á^•&..¡..Õ...^ 000120
 4689FE57 8826FC47 88260E5E C4040E46 83D88E11 E0881E56 57000004 C8C8C95F _èùà...WV.¡Á..Ä.F..á^.&.G•&.W±.F 000140
 000084C8 C8C95F5E 1F0000E9 00008807 8926FC5E C4224788 260A5EC4 FE5689FC ¯.V±á^.&.G"á^•&..¡..Õ...^_èùàÇ.. 000160
 C4FF7896 89FF7686 89FE5788 26FC4788 260E5EC4 040E4683 D88E123B 881E5657 WV.¡;..Ä.F..á^.&.G•&.W±..¯v...x.á 000180
 86C70001 FF5C86C7 0000FF70 86C7FF7E 9689FF7C 86891E57 88261C47 88260A5E ^.&.G.&.W...|...~.ú.p...ú.\...ú. 0001A0
 AD685016 FF6C868D 5016FF62 868D00E8 46C60080 46C60000 FF5E86C7 0000FF7A z...ú.^...óF..óFÒ...b..P..l..PhÙ 0001C0
 FFFF7EB6 FF088568 50160046 8D10C483 000012F6 9A006AFF 7CB6FFFF 7EB6FF08 ..Ñ~..Ñ|.j..~....á..FÅ.Phç..Ñ~.. 0001E0

Dump of file SATURN:[PCCOMMON.DUMP.DLL]PDLDGM.TMP;1 on 18-APR-1990 10:48:18.73
File ID (766,30,0)   End of file block 195 / Allocated 196

Virtual block number 65 (00000041), 512 (0200) bytes

 13609A00 6AD076FF D276FF02 7F685016 CC46800C C4830000 130E9A00 6AFF7CB6 Ñ|.j.......á..Fä.Ph...v®.vÂj..m. 000000
 00152D9A 006A0676 FF0876FF 0A76FF0C 76FF0578 685016FF 7286800C C4830000 ...á...r..Phx..v..v..v..v.j..~.. 000020
 86800298 E9037508 207F8326 0A5EC402 A5E90375 05207F83 260A5EC4 10C48300 ..á.á^.&.. .u.ÕE.á^.&.. .u.Õ.... 000040
 0013D09A 006AFF7C B6FFFF7E B6FF088E 685016FF 66868050 16FE468D 5016FF60 '..P.F±.P..f..Phƒ..Ñ~..Ñ|.j..Ì.. 000060
 03FF5C86 C70009E9 037400FF 668E8300 13E90374 01207F83 260A5EC4 14C48300 ..á.á^.&.. .t.Õ...ƒf..t.Õ..ú.\.. 000080
 0003FF5C 86C70006 E9037400 FE7E8300 0FE90374 02207F83 260A5EC4 001CE900 .Õ..á^.&.. .t.Õ...~±.t.Õ..ú.\... 0000A0
 C4032068 FF7686FF FF7886FF FF6C86FF FF6E86FF FF6286FF FF6486FF FF5C86FF .Ñ\..Ñd..Ñb..Ñn..Ñl..Ñx..Ñv.h .á 0000C0
 E9037500 FF708E83 FF708689 16C48300 0014499A 006A2677 FF262877 FF260A5E ^.&.w(&.w&j..I....á...p../p..u.Õ 0000E0
 03740720 7F83260A 5EC4000D E9037506 207F8326 0A5EC402 56E9FF70 86880007 ....p.ÕV.á^.&.. .u.Õ..á^.&.. .t. 000100
 7886FF20 77FF260A 5EC4FF72 86FFFF74 86FF5016 E8468050 16FF6886 8000F4E9 Õ¶...h..P.FÒ.P.Ñt..Ñr.á^.&.w .Ñx 000120
 1EC48300 0015479A 006AFF7C B6FFFF7E B6FF08FA 68CC76FF CE76FFFF 7686FFFF ..Ñv..vö.väh°..Ñ~..Ñ|.j..G....á. 000140
 6C86030A 57882608 478826FF 729EC401 EEE9FF70 86880007 E9037500 FF708E83 .ƒp..u.Õ....p.ÕŸ.á.r.&.G.&.W...l 000160
 03065788 26044788 26FF729E C4FF4E96 89FF4C86 89000283 003205FF 6E9613FF ...n..2..®...L...N.á.r.&.G.&.W.. 000180
 5788260C 478826FF 729EC4FF 529689FF 50868900 DA83000A 20FF6496 13FF6286 .b...d.-...Ö...P...R.á.r.&.G.&.W 0001A0
 03FF4E96 8BFF4C86 8BFF5A96 89FF5886 89000283 000A05FF 649613FF 6286030E ...b...d.....®...X...Z...L...N.. 0001C0
 E8468DFF 7686FFFF 7886FFFF 569689FF 54868900 D283000A 05FF6A96 13FF6886 .h...j.....®...T...V..Ñx..Ñv..FÒ 0001E0

Dump of file SATURN:[PCCOMMON.DUMP.DLL]PDLOGM.TMP;1 on 18-APR-1990 10:48:18.73
```

```
File ID (766,30,0)   End of file block 195 / Allocated 196

Virtual block number 66 (00000042), 512 (0200) bytes

 7403207F 83260A5E C4000015 E29A006A 006A046A 5016FF4C 868D1E6A 006A5016 .Pj.j...L..Pj.j.j..ã...á^.&.. .t 000000
 0015FD9A 006A0676 FF0876FF 0A76FF0C 76FF2663 68501680 46804C6A 000D2E903 .Õ@.jL.F..Phc&.v..v..v..v.j..».. 000020
 9EC40CC4 83000016 309A006A FF7CB6FF FF7EB6FF 08F86850 16E4468D 12C48300 ..á..Fõ.Ph½..Ñ~..Ñ|.j..0....á.á. 000040
 D4468BD6 56890446 89000283 005005FF 6E9613FF 6C860302 578B2607 8B26FF72 r.&..&.W...l...n..P..@..Få.V@.Få 000060
 578B2604 478B26FF 729EC4DE 56890C46 8900DA83 00502DE6 5613E446 03D65688 .V@.Fõ.Vl-P..Ö..FÉ.VBá.r.&.G.&.W 000080
 578B260C 478B26FF 729EC4DA 56890846 8900DA83 000A2DFF 649613FF 62860306 ...b...d.-...Ö..FÄ.VÖá.r.&.G.&.W 0000A0
 80468DFF 76B6FFFF 7BB6FFE2 5689E046 89000283 000A05FF 649613FF 6286030E ...b...d.....@..FÅ.Vã.Ñx..Ñv..F. 0000C0
 76FF0324 685016FC 46800000 FFFF9A00 6A006A04 6A501604 468D1E6A 006A5016 .Pj.j..Få.Pj.j.j.......F=.Ph$..v 0000E0
 E9037500 FF70BE83 FF708689 10C48300 00105E9A 006A0676 FF0876FF 0A76FF0C ..v..v..v.j..^....á...p../p..u.Õ 000100
 9A006AD0 76FFD276 FF029A68 016A0015 E9037500 FC7E8300 36E9FF70 868B0007 ....p.Õó..~=.u.Õ..j.h...v@.vÅj.. 000120
 1F0000E9 FF70868B 0007E9FF 70868B00 07E90375 00FF70BE 830AC483 00000F72 r....á../p..u.Õ....p.Õ....p.Õ... 000140
 89FE578B 26FC478B 260E5EC4 040E4683 D88E1274 B81E5657 00001CC8 CBC95F5E ^_èüà...WV.|t..Ä.F..á^.&.G=&.W±. 000160
 5016EE46 8D0001E8 46C7F456 89F24689 1E578B26 1C478B26 0A5EC4F8 5689F646 F=.V½á^.&.G.&.W..F·.V¶úFÕ...FŸ.P 000180
 08AD6850 16E4468D 5016FA46 8D0CC483 00001689 9A006AF6 76FFF876 FF027968 hy..v½.v-j..¿....á..F*.P.Fõ.PhÜ. 0001A0
 685016EC 468D5016 FE468D50 16EA468D 10C48300 00160B9A 006AF276 FFF476FF .v¶.v·j..Ü....á..Fõ.P.F±.P.F§.Ph 0001C0
 830011E9 03740120 7F83260A 5EC414C4 83000017 319A006A F276FFF4 76FF0BBE ƒ..v¶.v·j..1....á.á^.&.. .t.Õ... 0001E0

Dump of file SATURN:[PCCOMMON.DUMP.DLL]PDLDGM.TMP;1 on 18-APR-1990 10:48:18.73
File ID (766,30,0)   End of file block 195 / Allocated 196

Virtual block number 67 (00000043), 512 (0200) bytes

 FE7E8300 0EE90374 02207F83 260A5EC4 001BE900 03E846C7 0008E903 7400EC7E ~$.t.Õ..úFÒ..Õ..á^.&.. .t.Õ...~± 000000
 006AF276 FFF476FF 08E46800 49E92047 8B260A5E C40003E8 46C70005 E9037400 .t.Õ..úFÒ..á^.&.G ÕI.hõ..v¶.v·j. 000020
 EE76FFF0 76FFE476 FFE676FF FA76FFFC 76FFE876 FF003EE9 08C48300 0012DC9A .É....á.Õ>..vÕ.v=.v*.v].võ.vÞ.vŸ 000040
 0830000B E9000EE9 16C48300 00169C9A 006A2677 FF262877 FF260A5E C4032168 hI.á^.&.w(&.w&j.......á.Õ..Õ..=. 000060
 5EC4040E 4683088E 165CB81E 56570000 1CC8CBC9 5F5E1FFF C2E9FFAF E9037500 .u.Õ€.Õó..^_èüà...WV.|\..Ä.F..á^ 000080
 F45689F2 46891E57 8B261C47 8B260A5E C4F85689 F64689FE 578B26FC 478B260E .&.G=&.W±.F=.V½á^.&.G.&.W..F·.V¶ 0000A0
 FA468D0C C4830000 17E39A00 6AF676FF F876FF02 79685016 EE468D00 01E846C7 úFÒ...FŸ.Phy..v½.v-j..D....á..F* 0000C0
 8D5016EA 468D10C4 83000018 059A006A F276FFF4 76FF08AD 685016E4 468D5016 .P.Fõ.PhÜ..v¶.v·j.......á..Fõ.P. 0000E0
 260A5EC4 14C48300 00185B9A 006AF276 FFF476FF 08BE6850 16EC468D 5016FE46 F±.P.F§.Phƒ..v¶.v·j..[....á.á^.& 000100
 7F83260A 5EC4001B E90003E8 46C70008 E9037400 EC7E8300 11E90374 01207F83 .. .t.Õ...~$.t.Õ..úFÒ..Õ..á^.&.. 000120
 680049E9 20478B26 0A5EC400 03E846C7 0005E903 7400FE7E 83000EE9 03740220  .t.Õ...~±.t.Õ..úFÒ..á^.&.G ÕI.h 000140
 76FFFA76 FFFC76FF E876FF00 46E908C4 8300001B 889A006A F276FFF4 76FF08F6 ~..v¶.v·j.......á.ÕF..vÕ.v=.v*.v 000160
 83000017 619A006A 2677FF26 2877FF26 0A5EC403 2768EE76 FFF076FF E476FFE6 ].võ.vÞ.vŸh'.á^.&.w(&.w&j..a.... 000180
 CBC95F5E 1FFFBAE9 FFA7E903 75000830 FFAFE903 7500053D 0013E900 16E916C4 á.Õ..Õ..=..u.Õ€.=..u.ÕÏ.Õa..^_èü 0001A0
 46800676 FF0876FF FE5689FC 46890C56 880A468B D88E1786 B81E5657 000008C8 à...WV.|...Ä.F..V..F=.V±.v..v..F 0001C0
 0BE90375 00FA7E83 02578926 078926FE 5688FC46 880E5EC4 00000C1A 9A5016FA *.P.....á^..F=.V±&..&.W..~*.u.Õ. 0001E0

Dump of file SATURN:[PCCOMMON.DUMP.DLL]PDLDGM.TMP;1 on 18-APR-1990 10:48:18.73
File ID (766,30,0)   End of file block 195 / Allocated 196

Virtual block number 68 (00000044), 512 (0200) bytes

 260E5EC4 27146806 76FF0876 FF066A50 16FC468D 00000C2E 9A0676FF 0876FF00 ..v..v.......F=.Pj..v..v.h.'á^.& 000000
 FF0876FF 000BE903 7500FA7E 83F84689 12C48300 0017C69A 006A37FF 260277FF .w.&.7j..ó....á..F½.-*.u.Õ...v.. 000020
 F8468B07 89260247 89260000 880E5EC4 0013E903 7500F87E 8300000C 679A0676 v..g....-½.u.Õ..á^.|..&.G.&...F½ 000040
 1E565700 0020C8CB C95F5E1F 0000E900 00B8FF7A E90374FE 4608FC46 880011E9 Õ...F=.F±t.Õz.|..Õ...^_èüà ..WV. 000060
 5EC4040E 4683F656 89F44689 FE578B26 FC478B26 0E5EC404 0E4683D8 8E188B88 ||..Ä.F..á^.&.G=&.W±.F¶.V-.F..á^ 000080
 4689FE57 8B26FC47 8B260E5E C4040E46 83EC5689 EA4689FE 578B26FC 478B260E .&.G=&.W±.Fõ.V§.F..á^.&.G=&.W±.F 0000A0
 0000E903 7506207F 83260A5E C40000E8 46C7E446 891A478B 260A5EC4 F05689EE Ÿ.VÞá^.&.G..FÕúFÒ..á^.&.. .u.Õ.. 0000C0
 0000E903 7503207F 83260A5E C401DCE9 0000B800 06E90374 07207F83 260A5EC4 á^.&.. .t.Õ..|..ÕÉ.á^.&.. .u.Õ.. 0000E0
 76FFF076 FFE476FF 5052002E 050C5688 0A468800 2AE90374 05207F83 260A5EC4 á^.&.. .t.Õ*..F..V....RP.võ.vÞ.v 000100
 0006E903 7400E47E 830198E9 12C48300 0019199A 006AEA76 FFEC76FF 281268EE Ÿh.(.v§.võj.......á.Õ...~õ.t.Õ.. 000120
 880000FF FF9A5016 E6468DE4 76FFEA76 FFEC76FF EE76FFF0 76FF0189 E9000088 |..Õ...vÞ.vŸ.v§.võ.võ.F].P...... 000140
 0BE90375 00F27E83 00001804 9A5016F2 468DEE76 FFF076FF 0161E901 51E9E646 F]Õa.Õa..vÞ.vŸ.F·.P.å....~·.u.Õ. 000160
 EC76FF27 1468EE76 FFF076FF E476FF50 16E0468D 000018F8 9AEE76FF F076FF00 ..vÞ.vŸ.½....FÅ.P.võ.vÞ.·Ÿh.'.v§ 000180
 0018879A EE76FFF0 76FF0008 E9037500 F27E8312 C4830000 181B9A00 6AEA76FF .võj.......á..~·.u.Õ...vÞ vŸ.... 0001A0
 5016F846 8D001CE9 03750320 7F83260A 5EC40029 E9037505 207F8326 0A5EC400 .á^.&.. .u.Õ).á^.&.. .u.Õ...F½.P 0001C0
 F84689E2 5688E046 88000CE9 0CC483FF FF18809A EE76FFF0 76FFE076 FFE276FF .vã.vÅ.vÞ.vŸ.¯....á.Õ...FÅ.Vã.F½ 0001E0

Dump of file SATURN:[PCCOMMON.DUMP.DLL]PDLDGM.TMP;1 on 18-APR-1990 10:48:18.73
```

```
File ID (766,30,0)    End of file block 195 / Allocated 196

Virtual block number 69 (00000045), 512 (0200) bytes

68F876FF FA76FF06 76FF0876 FF5016FC 4680009F E90375FA 460BF846 88FA5689 .V*.F%.F*u.Ő...F*.P.v..v..v*.v%h 000000
46880006 E9037500 E87E83E8 468914C4 8300001B 6D9A006A F476FFF6 76FF0259 Y..v-.v¶j..m.....á..FÒ.-Ò.u.Ő...F 000020
9AEE76FF F076FF00 0BE90375 00F27E83 E25689E0 4689FA56 8BF84688 008BE9E8 ÒÒ...F%.V*.FÁ.Vä.-·.u.Ő...vÞ.vŸ. 000040
001A1D9A 006AE076 FFE276FF 271468EE 76FFF076 FF056A50 16F84680 00001A78 x....F%.Pj..vÞ.vŸh.'.vã.vÁj..... 000060
7500E87E 83000019 339AEE76 FFF076FF 0008E903 7500F27E 83E84689 12C48300 ..á..FÒ.-·.u.Ő...vÞ.vŸ.3....-Ò.u 000080
033DFEA7 E9037500 023D0013 E90016E9 0019E9FF 56E90025 E9E84688 0006E903 .Ő...FÒÒ%.ÒV.Ò..Ò..Ò..=..u.ÒI±=. 0000A0
D88E1971 B81E5657 000012C8 CBC95F5E 1F0000E9 E8468BFF E7E9FEA2 E9037500 .u.ÒÁ±ÒÒ..FÒÒ...^_èùà...WV.|q..Á 0000C0
1E578B26 1C478B26 0A5EC4F2 5689F046 89FE578B 26FC478B 260E5EC4 040E4683 .F..á^.&.G*&.W±.FÞ.V·á^.&.G.&.W. 0000E0
46890CC4 8300001C 319A006A F876FFFA 76FF08B5 685016F4 468DFA56 89F84689 .F%.V*.F¶.Phç..v*.v%j...1....á..F 000100
006AF476 FFF676FF 02786850 16FC468D 0055E9EE 46880006 E9037500 EE7E83EE Ÿ.-Ÿ.u.Ő...FŸÒU..F*.Phx..v-.v¶j. 000120
08568806 4688002B E9EE4688 0006E903 7500EE7E 83EE4689 0CC48300 001A969A ......á..FŸ.-Ÿ.u.Ő...FŸÒ+..F..V. 000140
88078926 F05EC400 00880003 E90001B8 0006E903 74FE5639 000EE903 74FC4639 9F*t.Ò..9V±t.Ò..|..Ò..|..á^Þ&..| 000160
478B260E 5EC4040E 4683D88E 1BCC881E 56570000 04C8CBC9 5F5E1F00 00E90000 ..Ò...^_èùà...WV.|ß..Á.F..á^.&.G 000180
5E1F0000 E9000088 078926FC 5EC41A47 88260A5E C4FE5689 FC4689FE 578826FC *&.W±.F*.V±á^.&.G.á^*&..|..Ò...^ 0001A0
4689FE57 8826FC47 88260E5E C4040E46 83D88E1C 82881E56 57000004 C8CBC95F _èùà...WV.|...Á.F..á^.&.G*&.W±.F 0001C0
01880006 E9037507 207F8326 0A5EC400 13E90375 06207F83 260A5EC4 FE5689FC *.V±á^.&.. .u.Ò..á^.&.. .u.Ò..|. 0001E0

Dump of file SATURN:[PCCOMMON.DUMP.DLL]PDLDGM.TMP;1 on 18-APR-1990 10:48:18.73
File ID (766,30,0)    End of file block 195 / Allocated 196

Virtual block number 70 (00000046), 512 (0200) bytes

B81E5657 000006C8 CBC95F5E 1F0000E9 00008807 8926FC5E C4000088 0003E900 .Ò..|..á^*&..|..Ò...^_èùà...WV.| 000000
0E5EC402 0E4683FC 5689FA46 89FE5788 26FC4788 260E5EC4 040E4683 D88E1CB8 £..Á.F..á^.&.G*&.W±.F¯.V*.F..á^. 000020
006A2677 FF262877 FF260A5E C4032568 FA76FFFC 76FFFE76 FFFE4689 FE478826 &.G±.F±.v±.v*.v*h%.á^.&.w(&.w&j. 000040
040E4683 D88E1D10 B81E5657 000004C8 CBC95F5E 1F0000E9 0EC48300 001C079A ......á.Ò...^_èùà...WV.|...Á.F... 000060
00880789 26FC5EC4 2A478826 0A5EC4FE 5689FC46 89FE5788 26FC4788 260E5EC4 á^.&.G*&.W±.F*.V±á^.&.G*&..|. 000080
FC478826 0E5EC404 0E4683D8 8E1D6888 1E565700 008CC8CB C95F5E1F 0000E900 .Ò...^_èùà...WV.|h..Á.F..á^.&.G* 0000A0
88260A5E C4004C8A 46C7F446 891A4788 260A5EC4 FF769689 FF748689 FE578826 &.W±..t...v.á^.&.G..F¶úF.L.á^.&. 0000C0
16084680 0004FF78 86C7FA46 89224788 260A5EC4 F25689F0 46891E57 8B261C47 G.&.W..FÞ.V·á^.&.G".F*ú.x....FÁ. 0000E0
76FF0279 68501682 468D0CC4 8300001E 179A006A FF7486FF FF7686FF 08856850 Phç..Ãv..Ãt.j........á..F..Phy..v 000100
479A006A D876FFDA 76FF027F 68501686 468D0CC4 8300001E 2F9A006A D876FFDA Ò.vÁj../.....á..F..Ph...vÒ.vÁj..G 000120
468D0CC4 8300001E 659A006A D876FFDA 76FF0280 685016F6 468D0CC4 8300001E ....á..F-.Ph...vÒ.vÁj..e.....á..F 000140
FF7E8680 10C48300 001E869A 006AF076 FFF276FF 27106886 76FF8876 FF5016FC *.P.v..v.h.'.v·.vÞj........á...-. 000160
F876FF10 C4830000 1EC99A00 6AFF7486 FFFF7686 FF08AD68 5016FF7A 86805016 .P..z..PhÙ..Ãv..Ãt.j..è.....á..v% 000180
207F8326 0A5EC400 00FFFF9A 8A76FF50 168C468D F476FFFC 76FFFE76 FFF676FF .v-.v±.v*.v¶.F..P.v.......á^.&.. 0001A0
0CC48300 001F0F9A 006AFF74 B6FFFF76 B6FF03E9 6850168C 468D0079 E9037403 .t.Òy..F..PhÒ..Ãv..Ãt.j........á. 0001C0
00FFFF9A 50160C46 8D046A50 16FF7A86 8D1E6A00 6A50168C 468D8276 FF8476FF .v..v..F..Pj.j...z..Pj...FÉ.P.... 0001E0

Dump of file SATURN:[PCCOMMON.DUMP.DLL]PDLDGM.TMP;1 on 18-APR-1990 10:48:18.73
File ID (766,30,0)    End of file block 195 / Allocated 196

Virtual block number 71 (00000047), 512 (0200) bytes

289A006A FF7486FF FF7686FF 08D768EC 76FFEE76 FF0000EE 46C70064 EC46C700 .úF£d.úFŸ...vŸ.v$h*..Ãv..Ãt.j..( 000000
880CC483 00001D51 9A006AFF 7486FFFF 7686FF08 08681E6A 006A0CC4 8300001F ....á.j.j.hÁ..Ãv..Ãt.j..Q....á.| 000020
478B260E 5EC4040E 4683D88E 1DA1881E 56570000 16C8CBC9 5F5E1F00 00E90000 ..Ò...^_èùà...WV.|Á..Á.F..á^.&.G 000040
F05689EE 4689FE57 8826FC47 88260E5E C4040E46 83FE5689 FC4689FE 578826FC *&.W±.F*.V±.F..á^.&.G*&.W±.FŸ.VÞ 000060
5EC4000D E9037505 207F8326 0A5EC4F4 5689F246 891E578B 261C478B 260A5EC4 á^.&.G.&.W..F·.V¶á^.&.. .u.Ò..á^ 000080
7500F67E 8300001A 649A5016 F6468DEE 76FFF076 FF0162E9 03740320 7F83260A .&.. .t.Òb..vÞ.vŸ.F-.P.d....--.u 0000A0
76FFF076 FF1A77FF 260A5EC4 5016F846 8000001B 509AEE76 FFF076FF 0008E903 .Ò...vÞ.vŸ.P....F%.Pá^.&.W..vÞ.v 0000C0
F076FF00 08E90375 00F67E83 12C48300 0020249A 006AF276 FFF476FF 271468EE Ÿh.'.v¶.v·j..$ ...á..--.u.Ò...vÞ 0000E0
FF260A5E C4F876FF FA76FF08 6A003AE9 0375FA46 08F8468B 00001AAD 9AEE76FF .vŸ.Ù....F%.F*u.Ò:.j..v*.v%á^.&. 000100
7E83EC46 8914C483 0000205E 9A006AF2 76FFF476 FF271968 EE76FFF0 76FF1A77 w..vÞ.vŸh.'.v¶.v·j..^ ...á..F$.- 000120
FFF076FF 1A77FF26 0A5EC4FC 76FFFE76 FF086A00 C0E9EC46 880006E9 037500EC $.u.Ò...F$Òá.j..v±.v*á^.&.w..vÞ. 000140
06E90375 00EC7E83 EC468914 C4830000 20A19A00 6AF276FF F476FF27 1868EE76 vŸh.'.v¶.v·j..Á ...á..F$.-$.u.Ò. 000160
FF1A77FF 260A5EC4 FC76FFFE 76FF086A 0000E903 7500EA7E 830086E9 EC468800 ..F$Ò...-Ò.u.Ò..j..v±.v*á^.&.w.. 000180
7500EC7E 83EC4689 14C48300 0020DE9A 006AF276 FFF476FF 271968EE 76FFF076 vÞ.vŸh.'.v¶.v·j..B ...á..F$.-$.u 0001A0
FF260A5E C4F876FF FA76FF00 32E90375 FA460BF8 46880043 E9EC4688 0006E903 .Ò...F$ÒC..F%.F*u.Ò2..v*.v%á^.&. 0001C0
06E90375 00EC7E83 EC46890E C4830000 1DFF9A00 6AF276FF F476FF27 18681A77 w.h.'.v¶.v·j........á..F$.-$.u.Ò. 0001E0

Dump of file SATURN:[PCCOMMON.DUMP.DLL]PDLDGM.TMP;1 on 18-APR-1990 10:48:18.73
```

File ID (766,30,0)   End of file block 195 / Allocated 196

Virtual block number 72 (00000048), 512 (0200) bytes

```
4683D88E 1F42B81E 56570000 04C8CBC9 5F5E1F00 00E9EA46 880006E9 EC468B00 ..FšÕ...FõÕ...^_èùà...WV.¡8..Ä.F 000000
5EC41E57 8B261C47 8B260A5E C4FE5689 FC4689FE 578B26FC 478B260E 5EC4040E ..á^.&.G=&.W±.F=.V±á^.&.G.&.W.á^ 000020
83D88E21 0AB81E56 5700003C C8CBC95F 5E1F0000 E9000088 02578926 078926FC =&..&.W.¡..Õ...^_èùà<..WV.¡.!.Ä. 000040
891E578B 261C478B 260A5EC4 E25689E0 4689FE57 8B26FC47 8B260E5E C4040E46 F..á^.&.G=&.W±.FÄ.Vãá^.&.G.&.W.. 000060
CC468D0C C4830000 219E9A00 6AD076FF D276FF08 B5685016 D8468D02 56890046 FÅ.V@.FÄ.Phç..v@.vÅj...!...á..Fë 000080
DA76FF02 7F685016 D4468D0C C4830000 21B69A00 6AD876FF DA76FF02 79685016 .Phy..vÖ.vÅj..Ñ!...á..Få.Ph...vÖ 0000A0
76FF0876 FF0A76FF 0C76FF05 78685016 C8468D0C C4830000 21F19A00 6AD876FF .vÄj..þ!...á..Fà.Phx..v .v..v..v 0000C0
006AD076 FFD276FF 08AD6850 16E4468D 50160C46 8D10C483 0000132D 9A006A06 .j..-....á..FÉ.P.Fõ.PhÙ. v@.vÅj. 0000E0
C4000A83 000A20DE 56130C46 0306578B 2604478B 26C85EC4 10C48300 0022779A .w"...á.á^à&.G.&.W..FÉ.V‡.   .Õ.á 000100
D283000A 05DE5613 DC46030E 578B260C 478B26C8 5EC40657 89260447 8926E05E ^Å&.G.&.W.á^à&.G.&.W..FÉ.VB....@ 000120
83000A2D E65613E4 46030257 8B260788 26C85EC4 0E578926 0C478926 E05EC400 .á^Å&.G.&.W.á^à&..&.W..FÕ.Vì-... 000140
76FF08F8 685016E8 468D008C E920478B 260A5EC4 02578926 078926E0 5EC4000A Õ.á^Å&..&.W.á^.&.G Õ¥..FÕ.Ph½..v 000160
0A05EA56 13E84603 0257B826 07B826E0 5EC40CC4 83000022 D19A006A D076FFD2 @.vÅj..i"...á.á^Å&..&.W..FÕ.Võ.. 000180
FFCA76FF 5016EC46 8D5016C4 46800098 E90A5789 26084789 26E05EC4 00D28300 ..@.á^Å&.G.&.W.Õ...Fá.P.F§.P.vò. 0001A0
006AD076 FFD276FF 08FA68D4 76FFD676 FFCC76FF CE76FF20 77FF260A 5EC4C876 vàá^.&.w .vö.vä.vø.våh*..v@.vÅj. 0001C0
C4000283 000A05C6 5613C446 030A578B 2608478B 26C85EC4 1EC48300 001FDD9A .Ì....á.á^à&.G.&.W..Fá.Vá....@.á 0001E0
```

Dump of file SATURN:[PCCOMMON.DUMP.DLL]PDLDGM.TMP;1 on 18-APR-1990 10:48:18.73
File ID (766,30,0)   End of file block 195 / Allocated 196

Virtual block number 73 (00000049), 512 (0200) bytes

```
0A05E656 13E44603 0A578B26 08478B26 C85EC400 40E90A57 89260847 8926E05E ^Å&.G.&.W.Õa.á^à&.G.&.W..Fõ.V!.. 000000
E9037D00 0630FF3C E9037500 0330001B E90A5789 26084789 26E05EC4 00D28300 ..@.á^Å&.G.&.W.Õ..=..u.Õ<.=..).Õ 000020
B81E5657 000000C8 CBC95F5E 1F0000E9 0000B8FF C0E9FF68 E9037F00 0730FFC8 ù.=....Õh.Õä.¡..Õ...^_èùà...WV.¡ 000040
C95F5E1F 0000E900 00B82C47 89260A5E C4FE478B 260E5EC4 020E4683 D88E2148 K!.Ä.F..á^.&.G±á^.&.G¸¡..Õ...^_è 000060
89FC4689 FE578B26 FC478B26 0E5EC404 0E4683D8 8E2350B8 1E565700 0004C8CB ùà...WV.¡P#.Ä.F..á^.&.G=&.W±.F=. 000080
56570000 00C8CBC9 5F5E1F00 00E90000 B8078926 FC5EC42C 478B260A 5EC4FE56 V±á^.&.G,á^=&..¡..Õ...^_èùà...WV 0000A0
5E1F0000 E90000B8 2A478926 0A5EC4FE 478B260E 5EC4020E 4683D88E 2379B81E .¡y#.Ä.F..á^.&.G±á^.&.G¯¡..Õ...^ 0000C0
4789260A 5EC4FE47 8B260E5E C4020E46 83D88E23 B2B81E56 57000000 C8CBC95F _èùà...WV.¡ÿ#.Ä.F..á^.&.G±á^.&.G 0000E0
260E5EC4 040E4683 D88E230B B81E5657 000012C8 CBC95F5E 1F0000E9 00008824 ¥¡..Õ...^_èùà...WV.¡Ü#.Ä.F..á^.& 000100
89FC4689 FE578B26 FC478B26 0E5EC404 0E4683F4 5689F246 89FE578B 26FC478B .G=&.W±.F¯.V¶.F..á^.&.G=&.W±.F•. 000120
21D49A00 6A0676FF 0876FF0A 76FF0C76 FF08AD68 5016EE46 8D5016F8 4680FE56 V±.F½.P.FŸ.PhÙ..v..v..v..v.j..á! 000140
8B260A47 8B260A5E C4003CE9 F6468800 06E90375 00F67E83 F6468914 C4830000 ...á..F-.—.u.Õ...F-Õ<.á^.&.G.&. 000160
F8460310 578B260E 478B260A 5EC40257 89260789 26F25EC4 F05613EE 46030C57 W..FŸ.Vbá^·&..&.W.á^.&.G.&.W..F½ 000180
B81E5657 000008C8 CBC95F5E 1F0000E9 0000B802 57892607 8926FC5E C4FA5613 .V*á^=&..&.W.¡..Õ...^_èùà...WV.¡ 0001A0
0E5EC404 0E4683FA 5689F846 89FE578B 26FC478B 260E5EC4 040E4683 D88E2404 .$.Ä.F..á^.&.G=&.W±.F½.V*.F..á^. 0001C0
0A5EC408 AD68F876 FFFA76FF FC76FFFE 76FFFE56 89FC4689 FE578B26 FC478B26 &.G=&.W±.F•.V±.v±.v=.v*.v/hÙ.á^. 0001E0
```

Dump of file SATURN:[PCCOMMON.DUMP.DLL]PDLDGM.TMP;1 on 18-APR-1990 10:48:18.73
File ID (766,30,0)   End of file block 195 / Allocated 196

Virtual block number 74 (0000004A), 512 (0200) bytes

```
56570000 0CC8CBC9 5F5E1F00 00E910C4 83000021 869A006A 1C77FF26 1E77FF26 &.w.&.w.j...!...á.Õ...^_èùà...WV 000000
C4040E46 83F65689 F44689FE 578B26FC 478B260E 5EC4040E 4683D88E 24B0B81E .¡¯$.Ä.F..á^.&.G=&.W±.F¶.V-.F..á 000020
89FE578B 26FC478B 260E5EC4 040E4683 FE5689FC 4689FE57 8B26FC47 8B260E5E ^.&.G=&.W±.F=.V±.F..á^.&.G=&.W±. 000040
77FF260A 5EC408F3 68F476FF F676FFFC 76FFFE76 FFF876FF FA76FFFA 5689F846 F½.V*.v*.v½.v±.v=.v~.v¶hµ.á^.&.w 000060
12B81E56 57000004 C8CBC95F 5E1F0000 E914C483 000024FB 9A006A1C 77FF261E .&.w.j..«$...á.Õ...^_èùà...WV.¡. 000080
C424478B 260A5EC4 FE5689FC 4689FE57 8B26FC47 8B260E5E C4040E46 83D88E25 %.Ä.F..á^.&.G=&.W±.F=.V±á^.&.G$á 0000A0
040E4683 D88E258F B81E5657 000014C8 CBC95F5E 1F0000E9 0000B807 8926FC5E ^=&..¡..Õ...^_èùà...WV.¡.%.Ä.F.. 0000C0
89F44689 1E578B26 1C478B26 0A5EC4F2 5689F046 89FE578B 26FC478B 260E5EC4 á^.&.G=&.W±.FÞ.V·á^.&.G.&.W..F¶. 0000E0
10C48300 D0244E9A 006A0676 FF0876FF 0A76FF0C 76FF0578 685016EC 468DF656 V~.F&.Phx..v..v..v..v.j..N$...á. 000100
EC5EC410 C4830000 25789A00 6AF476FF F676FF08 AD685016 FC468D50 16F8468D .F½.P.F=.PhÙ..v~.v¶j..x%...á.á^$ 000120
8B260847 8B26EC5E C4025789 26078926 F05EC4FE 5613FC46 0302578B 26078B26 &..&.W..F•.V±á^Þ&..&.W.á^$&.G.&. 000140
46030657 8B260447 8B26EC5E C40A5789 26084789 26F05EC4 FE5613FC 46030A57 W..F=.V±á^Þ&.G.&.W.á^$&.G.&.W..F 000160
FA5613F8 46030E57 8B260C47 8B26EC5E C4065789 26044789 26F05EC4 FA5613F8 ½.V*á^Þ&.G.&.W.á^$&.G.&.W..F½.V* 000180
25C8B81E 56570000 0EC8CBC9 5F5E1F00 00E90000 B80E5789 260C4789 26F05EC4 á^Þ&.G.&.W.¡..Õ...^_èùà...WV.¡à% 0001A0
8B260E5E C4020E46 83FE5689 FC4689FE 578B26FC 478B260E 5EC4040E 4683D88E .Ä.F..á^.&.G=&.W±.F=.V±.F..á^.&. 0001C0
83000027 039A006A 1C77FF26 1E77FF26 0A5EC408 B5685016 F8468DF2 4689FE47 G±.F·.F½.Phç.á^.&.w.&.w.j...'... 0001E0
```

Dump of file SATURN:[PCCOMMON.DUMP.DLL]PDLDGM.TMP;1 on 18-APR-1990 10:48:18.73

File ID (766,30,0) End of file block 195 / Allocated 196

Virtual block number 75 (0000004B), 512 (0200) bytes

```
07C626FC 5EC40CC4 83000026 269A006A F876FFFA 76FF027F 685016F4 46800CC4 6..F¶.Ph...v*.v½j..&&...6.6^=&6. 000000
260A5EC4 020468FC 76FFFE76 FF5016F2 46800037 E9037500 2E7F8326 0A5EC400 .6^.&....u.Õ7..F·.P.v±.v=h..6^.& 000020
83000026 099A006A 0676FF08 76FF0A76 FF0C76FF 271A68F4 76FFF676 FF1A77FF .w..v~.v¶h.'.v..v..v..v.j...&... 000040
FFFC76FF FE76FF22 77FF260A 5EC40018 E9037500 227F8326 0A5EC400 2CE91CC4 6.Õ,.6^.&..".u.Õ..6^.&.w".v±.v=. 000060
000000C8 CBC95F5E 1F0000E9 00008800 07C626FC 5EC40007 E90000FF FF9AF276 v·.....Õ..6^=&6..|..Õ...^_èùà... 000080
1E565700 0000C8CB C95F5E1F 0000E900 02050856 8B06468B D88E26AE 881E5657 WV.|Ú&.Ä.F..V....Õ...^_èùÕ...WV. 0000A0
9A006A2F 6A016A00 6A006A30 6A027068 1E016A05 6AFFFF68 1ADF6808 8E2794B8 |.'.ÄhÕ.h..j.j..hp.jÕj.j.j/j.. 0000C0
00030CAA 020302CE 000704AC 02030018 90CBC95F 5E1F0000 E918C483 0000FFFF .....6.Õ...^_èù.......ö...^... 0000E0
00071EED 0203049F 000E1EA5 0203034F 00080853 02030000 000327B6 00020074 t...Ñ'......Š...O...Ë.......Ù... 000100
000327D0 02030000 002B27B1 00020368 0008087A 02030000 002A00E0 0002020F Õ...Å.*.....z...k...Ý'+.....Å'.. 000120
00051503 02030378 00080698 02030116 00041A4B 0203009B 0003274B 02030017 ....K'......K...........x....... 000140
00002773 02030127 00041FA7 02030386 000808BD 0203002A 000326EB 02030217 ....Š&..*...........Ï...'...s'.. 000160
000327B9 00050147 00041FBB 0203039F 000808F4 0203013B 00041FF4 02030467 g...¶...;...¶.......Ê...G...¿'.. 000180
00000000 00000000 00000000 000002C3 000703D2 02030063 00030196 0203278C .'......c...®...Ù............... 0001A0
5F5E1F00 00E90000 8B0000FF FF9A0676 FF0876FF D88EFFFF 881E5657 000000C8 à...WV.|...Ä.v..v......|..Õ...^_ 0001C0
000AC800 04CAC95F 5E1F0000 E9000088 D88E0008 881E5657 000000C8 0004CAC9 èò..à...WV.|...Ä|..Õ...^_èò..à.. 0001E0
```

Dump of file SATURN:[PCCOMMON.DUMP.DLL]POLDGM.TMP;1 on 18-APR-1990 10:48:18.73
File ID (766,30,0) End of file block 195 / Allocated 196

Virtual block number 76 (0000004C), 512 (0200) bytes

```
4680FA56 89F84689 FE578B26 FC478B26 0E5EC404 0E4683D8 8E002CB8 1E565700 .WV.|,..Ä.F..6^.&.G=&.W±.F½.V*.F 000000
C4830000 FFFF9A00 6A0877FF 260A77FF 260A5EC4 271068F8 76FFFA76 FF5016FC =.P.v*.v½h.'6^.&.w.&.w.j.......6 000020
FF260A5E C4F876FF FA76FF00 6A0104E9 F6468B00 06E90375 00F67E83 F6468910 ..F-.~-.u.Õ...F-Õ..j..v*.v½6^.&. 000040
E9F6468B 0006E903 7500F67E 83F64689 0CC48300 00FFFF9A 006A0877 FF260A77 w.&.w.j.......6..F-.~-.u.Õ...F-Õ 000060
0A76FF0C 76FF0259 68FC76FF FE76FF00 6A006A50 52000805 0C56880A 46880005 f..F..V....RPj.j..v±.v=hY..v..v. 000080
E9F6468B 0006E903 7500F67E 83F64689 18C48300 0001149A 006A0676 FF0876FF .v..v.j.......6..F-.—.u.Õ...F-Õ 0000A0
7E83F646 890CC483 0000014D 9A006A06 76FF0876 FF0A76FF 0C76FF02 5A680095 ..hZ..v..v..v..v.j..M....6..F-.~ 0000C0
76FF0274 680C4789 260E4789 260000B8 0A5EC400 6AE9F646 8B0006E9 037500F6 -.u.Õ...F-Õj.6^.|..&.G.&.G.ht..v 0000E0
0006E903 7500F67E 83F64689 0CC48300 0001789A 006A0676 FF0876FF 0A76FF0C ..v..v..v.j..x....6..F-.—.u.Õ.. 000100
890CC483 0000FFFF 9A006A06 76FF0876 FF0A76FF 0C76FF02 7B680031 E9F6468B .F-Õ1.h(..v..v..v..v.j.......6.. 000120
000006C8 CBC95F5E 1F0000E9 0001B800 06E9F646 8B0006E9 037500F6 7E83F646 F-.~-.u.Õ...F-Õ..|..Õ...^_èùà... 000140
7500FA7E 83FA4689 0000FFFF 9A5016FC 46800676 FF0876FF D88E0045 881E5657 WV.|E..Ä.v..v..F=.P......F*.-*.u 000160
0000007A 9A006AFC 76FFFE76 FF029468 0A76FF0C 76FF001C E9FA468B 0006E903 .Õ...F*Õ...v..v.h...v±.v=j..z... 000180
F8468006 76FF0876 FFD88E01 A4881E56 5700000E C8CBC95F 5E1F0000 E90CC483 .6.Õ...^_èùà...WV.|Ê..Ä.v..v..F½ 0001A0
90685016 F4468000 92E9F246 8B0006E9 037500F2 7E83F246 89000001 B49A5016 .P.Ç....F·.-·.u.Õ...F·Õ...F¶.Ph. 0001C0
F2468800 06E90375 00F27E83 F246890C C4830000 025A9A00 6AF876FF FA76FF02 ..v*.v½j..Z....6..F·.-·.u.Õ...F· 0001E0
```

Dump of file SATURN:[PCCOMMON.DUMP.DLL]POLDGM.TMP;1 on 18-APR-1990 10:48:18.73
File ID (766,30,0) End of file block 195 / Allocated 196

Virtual block number 77 (0000004D), 512 (0200) bytes

```
C4830000 02A19A00 6AF476FF F676FF27 10680A76 FF0C76FF 5016FC46 8D0068E9 Õh..F=.P.v..v.h.'.v~.v¶j..Å....6 000000
08E90374 0E4639FE 568BFC46 8B0038E9 F2468800 06E90375 00F27E83 F2468910 ..F·.~·.u.Õ...F·Õ8..F=.V±9F.t.Õ. 000020
006AF876 FFFA76FF 0294680A 76FF0C76 FF001CE9 00008800 06E90375 10563900 .9V.u.Õ..|..Õ...v..v.h...v*.v½j. 000040
FF0876FF D88E01F3 881E5657 000006C8 CBC95F5E 1F0000E9 0CC48300 0001DC9A .É....6.Õ...^_èùà...WV.|æ..Ä.v.. 000060
76FF001C E9FA468B 0006E903 7500FA7E 83FA4689 00000203 9A5016FC 46800676 v..F=.P......F*.-*.u.Õ...F*Õ...v 000080
C8CBC95F 5E1F0000 E90CC483 0000022A 9A006AFC 76FFFE76 FF029468 0A76FF0C ..v.h...v±.v=j..*....6.Õ...^_èùà 0000A0
0E468338 4789260A 5EC4FE47 88260E5E C4020E46 83088E02 88881E56 57000036 6..WV.||..Ä.F..6^.&.G±6^.&.GÕ.F. 0000C0
88260E5E C4040E46 83125789 26104789 260A5EC4 FE578826 FC478826 0E5EC404 .6^.&.G=&.W±6^.&.G.&.W..F..6^.&. 0000E0
FC77FF26 FE77FF26 0E5EC404 0E468363 57892661 4789260A 5EC4FE57 8826FC47 G=&.W±6^.&.Ga&.Wc.F..6^.&.w±&.w= 000100
880A468B 3877FF26 0A5EC401 6A08C483 FFFF0000 9A505200 3A050C56 880A468B .F..V..:.RP......6.j.6^.&.w8.F.. 000120
E9037500 0030CA46 890000FF FF9A5052 0004050C 56880A46 88505200 3A050C56 V..:.RP.F..V....RP......Fò=..u.Õ 000140
89260000 880A5EC4 0000FFFF 9A0477FF 260677FF 260A5EC4 040EE9CA 46880006 ...FòÕ..6^.&.w.&.w......6^.|..&. 000160
260A5EC4 14478926 D646880A 5EC40000 FFFF9A50 16D6468D 026A0C47 89260E47 G.&.G.j..Fø.P.....6^..Fø&.G.6^.& 000180
001C050C 56880A46 880676FF 00001A47 C7260A5E C4FFFF18 47C726FF FF1647C7 ùG...&ùG...6^.&ùG....vø.F..V.... 0001A0
0CC48300 0000E99A 006A0676 FF0876FF 0A76FF0C 76FF0258 680000FF FF9A5052 RP.....h[..v..v..v..v.j..Õ....6. 0001C0
260A5EC4 00005B47 C7260A5E C40000FF FF9A5052 0034050C 56880A46 880676FF .vø.F..V..4.RP.....6^.&ùG[..6^.& 0001E0
```

Dump of file SATURN:[PCCOMMON.DUMP.DLL]POLDGM.TMP;1 on 18-APR-1990 10:48:18.73

File ID (766,30,0)   End of file block 195 / Allocated 196

Virtual block number 78 (0000004E), 512 (0200) bytes

D676FF67 47892669 47892600 00B80A5E C4000100 A787C726 0A5EC400 016547C7 úGe..á^.&ú.Ì...á^.|..&.Gi&.Gg.vø 000000
00978789 26009987 89260000 B80A5EC4 0000FFFF 9A505200 73050C56 880A4688 .F..V..s.RP.....á^.|..&....&.... 000020
009F8789 2600A187 89260000 B80A5EC4 00988789 26009087 89260000 B80A5EC4 á^.|..&....&....á^.|..&..À.&.... 000040
6377FF26 0A5EC400 6A006A04 77FF2606 77FF260A 5EC40676 FF3877FF 260A5EC4 á^.&.w8.vøá^.&.w.&.w.j.j.á^.&.wc 000060
5EC40000 00A987C7 260A5EC4 0000FFFF 9A505200 68050C56 880A4688 6177FF26 &.wø.F..V..k.RP.....á^.&ú.`...á^ 000080
FF0076FF D276FFD2 5689D046 8912578B 2610478B 260A5EC4 000000AD 87C7260A .&ú.Ù...á^.&.G.&.W..FÅ.V0.v0.vÅ. 0000A0
76FFD276 FF0000FF FF9AFFFF 68052268 D076FFD2 76FF0000 FFFF9A06 76FF0876 v..v.......v0.vÅh".h........v0.v 0000C0
0000DE46 C700C8DC 46C70000 DA46C700 C8D846C7 0000FFFF 9AFFFF68 05C068D0 Åhä.h.......úFÄà.úFÖ..úFÉà.úFB.. 0000E0
46C70000 EA46C700 64E846C7 0000E646 C70096E4 46C70000 E246C700 96E046C7 úFÅ..úFã..úFö..úFÌ..úFÒd.úFõ..úF 000100
FFD276FF 0000F646 C700C8F4 46C70000 F246C700 64F046C7 0000EE46 C70064EC &d.úFŸ..úFÞd.úF·..úF¶à.úF-...v0. 000120
76FFD276 FF0000FF FF9A026A D076FFD2 76FF0000 FFFF9A50 16084680 026AD076 vÅj..FÁ.P......v0.vÅj.......v0.v 000140
680076FF D276FF00 00FFFF9A 034E681E 116AD076 FFD276FF 0000FFFF 9A016AD0 Åj.......v0.vÅj..hN.......v0.vÅh 000160
76FFD276 FF0000FF FF9AFFFF 68063768 D076FFD2 76FF0000 FFFF9AFF FF6805D1 Ì.h........v0.vÅh7.h........v0.v 000180
0A468804 77FF2606 77FF260A 5EC41477 FF260A5E C40000FF FF9A5016 CC4680D0 Å.Fä.P......á^.&.w.á^.&.w.&.w..F. 0001A0
7652047E 830446FF 0003E900 300446C7 CA468900 00FFFF9A 505200AF 050C5688 .V..£.RP......FòúFå0.Õ...Få.~åRv 0001C0
0006509A 065A6806 576808 6A D476FF00 AF87FF26 00B1B7FF 260A5EC4 0043E903 .ÕC.á^.&.ñŸ.&.ñ£..våj.hW.hZ..]... 0001E0

Dump of file SATURN:[PCCOMMON.DUMP.DLL]PDLDGM.TMP;1 on 18-APR-1990 10:48:18.73
File ID (766,30,0)   End of file block 195 / Allocated 196

Virtual block number 79 (0000004F), 512 (0200) bytes

00FFFF9A FFFF68FF FF680C6A D476FF00 AFB7FF26 00B1B7FF 260A5EC4 CA468900 ..Fòá^.&.ñŸ.&.ñ£..våj.h..h...... 000000
77FF260A 5EC44400 680477FF 260677FF 260A5EC4 5016FC46 8DFFB1E9 CA468900 ..FòÕŸ..F=.Pá^.&.w.&.w.h.Dá^.&.w 000020
FE76FF04 77FF2606 77FF260A 5EC4CA46 8910C483 000002F0 9A006A61 77FF2663 c&.wøj..Þ....á..Fòá^.&.w.&.w..v± 000040
00AFB7FF 2600B1B7 FF260A5E C400A3E9 D4468B00 00FFFF9A 50160446 8DFC76FF .v=.Få.P......FåÕÉ.á^.&.ñŸ.&.ñ£. 000060
B1B7FF26 0A5EC4CA 46890000 06F79A07 176806EB 6806CF68 06CC6804 6A0476FF .våj.hä.hü.h$.h...¥....Fòá^.&.ñŸ 000080
70E9CA46 89000007 209A0740 68071468 06F46806 F168046A 316A00AF B7FF2600 .&.ñ£.jÌj.hþ.h¶.h..hə.. ....FòÕp 0000A0
9AFFFF68 07306807 1D68071A 68046A04 76FF00AF B7FF2600 B1B7FF26 0A5EC400 .á^.&.ñŸ.&.ñ£..våj.h..h..h=.h... 0000C0
68074368 046A0476 FF00AFB7 FF2600B1 B7FF260A 5EC40047 E9CA4689 00000749 Ì....FòÕG.á^.&.ñŸ.&.ñ£..våj.hC.h 0000E0
3230FFCC E9037500 3130001B E9001EE9 CA468900 00FFFF9A FFFF6805 11680746 F.h..h........FòÕ..Õ..=1.u.Õä.=2 000100
76FF00AF B7FF2600 B1B7FF26 0A5EC400 00E9FF93 E9037500 5030FF4D E9037500 .u.ÕM.=P.u.Õ..Õ..á^.&.ñŸ.&.ñ£..v 000120
5EC40000 FFFF9ACC 76FFCE76 FF3877FF 260A5EC4 CA468900 00FFFF9A 0676FF08 ..v.......Fòá^.&.w8.vö.vä.....á^ 000140
5700000A C8CBC95F 5E1F0000 E9000088 0000FFFF 9A0676FF 0876FF38 77FF260A .&.w8.v..v......|..Õ...^_èùà...W 000160
FE76FF50 16F84680 FE5689FC 46890657 8B260447 8B260A5E C4088E03 07B81E56 V.|...Äá^.&.G.&.W..F•.V±¯F%.P.v± 000180
468BF646 8910C483 00000688 9A006A61 77FF2663 77FF260A 5EC44400 68FC76FF .v=h.Dá^.&.wc&.wøj.......á..F-.F 0001A0
FF0876FF 0A76FF0C 76FF0259 68F876FF FA76FF00 6A006A50 52000805 0C56880A ..V....RPj.j..vª.v¥hŸ..v..v..v.. 0001C0
08579A00 6A0676FF 0876FF0A 76FF0C76 FF025A68 18C48300 00083E9A 006A0676 v.j..>....á.hZ..v..v..v..v.j..W. 0001E0

Dump of file SATURN:[PCCOMMON.DUMP.DLL]PDLDGM.TMP;1 on 18-APR-1990 10:48:18.73
File ID (766,30,0)   End of file block 195 / Allocated 196

Virtual block number 80 (00000050), 512 (0200) bytes

468B0CC4 83000004 199A006A 0676FF08 76FF0A76 FF0C76FF 0274680C C4830000 ...á.ht..v..v..v..v.j.......á..F 000000
6A036A01 6A006A01 6A006AD8 8E07C3B8 1E565700 0002C8CB C95F5E1F 0000E9F6 -Õ...^_èùà...WV.jÙ..Áj.j.j.j.j.j 000020
FE468900 00FFFF9A 1077FF26 1277FF26 0A5EC400 0008B49A 50520000 08AD9A01 ..Ù...ÑP.Ç...á^.&.w.&.w......F± 000040
5E1F0000 E9FE4688 0000FFFF 9A505200 00FFFF9A 016A016A 016A006A 016A006A j.j.j.j.j.j.......RP.......F±Õ...^ 000060
5EC4040E 46831077 FF261277 FF260A5E C4088E08 71B81E56 57000000 C8CBC95F _èùà...WV.jq..Äá^.&.w.&.w..F..á^ 000080
08CB881E 56570000 16C8CBC9 5F5E1F00 00E90000 FFFF9AFC 77FF26FE 77FF260E ¯&.w±&.w•.....Õ...^_èùà...WV.jù. 0000A0
8826FC47 88260E5E C4040E46 83F65689 F4468906 578B2604 478B260A 5EC4088E .Äá^.&.G.&.W..F¶.V-.F..á^.&.G•&. 0000C0
0E4683FC 5689FA46 89FE5788 26FC4788 260E5EC4 040E4683 F25689F0 4689FE57 W±.Fb.V·.F..á^.&.G•&.W±.Fª.V•.F. 0000E0
F276FF50 16FE4680 F476FFF6 76FFEC56 89EA4689 FE578826 FC478826 0E5EC404 .á^.&.G•&.W±.Fõ.V&.v-.v¶.F±.P.v· 000100
76FF0A76 FF0C76FF 027068FE 76FF5016 F8468D0E C4830000 FFFF9A00 6AF076FF .vÞj........á..F%.P.v±h)..v..v..v 000120
0091E9EE 46880006 E9037500 EE7E83EE 468912C4 83000008 259A006A 0676FF08 ..v.j..%....á..FŸ.~Ÿ.u.Õ...FŸÕ.. 000140
8910C483 0000FFFF 9A006AF8 76FFEA76 FFEC76FF 0676FF08 76FF0076 FFF276FF .v·.vÞ.v..v..vš.vÕ.v%j.......á.. 000160
77FF26EA 5EC4088C 68F476FF F676FF00 60E9EE46 880006E9 037500EE 7E83EE46 FŸ.~Ÿ.u.Õ...FŸÕ'..v~.v¶hŸ.á^õ&.w 000180
0031E9EE 46880006 E9037500 EE7E83EE 46890CC4 8300000A 219A006A 37FF2602 .&.7j..!....á..FŸ.~Ÿ.u.Õ...FŸÕ1. 0001A0
006AFA76 FFFC76FF 26468637 FF260277 FF26EA5E C40020E9 0375FC46 08FA4688 .Fª.F•u.Õ .á^õ&.w.&.7hH&.v•.vªj. 0001C0
08FEB81E 56570000 00C8CBC9 5F5E1F00 00E9EE46 880006E9 0CC48300 0007F49A .¶....á.Õ...FŸÕ...^_èùà...WV.j±. 0001E0

Dump of file SATURN:[PCCOMMON.DUMP.DLL]PDLDGM.TMP;1 on 18-APR-1990 10:48:18.73

File ID (766,30,0)   End of file block 195 / Allocated 196

Virtual block number 81 (00000051), 512 (0200) bytes

```
5F5E1F00 00E908C4 83000009 E79A006A 0877FF26 0A77FF26 0A5EC408 AB68D88E .Äh¨.ó^.&.w.&.w.j..Ó....ó.Õ...^_ 000000
5016FA46 8DFE76FF FE468914 4788260A 5EC4D88E 0A3EB81E 56570000 06C8C8C9 èùà...WV.¡>..Äó^.&.G..F±.v±.F*.P̄ 000020
006AFA76 FFFC76FF 00000AA7 9AFFFF68 0AA16802 6AFA76FF FC76FF00 000AC59A .é....v•.v*j.hÀ.h...Ī....v•.v*j. 000040
8DFE76FF 26578926 24478926 FC568BFA 46880A5E C400000A D89AFFFF 680AD268 h0.h...Ä...ó^..F*.V•&.G$&.W&.v±. 000060
FFFC76FF 00000AEB 9AFFFF68 0AE56802 6AFA76FF FC76FF00 000B099A 5016FA46 F*.P......v•.v*j.hÍ.h...Š....v•. 000080
2A578926 28478926 FC568BFA 46880A5E C4000008 1C9AFFFF 680B1668 006AFA76 v*j.h..h.......ó^..F*.V•&.G(&.W* 0000A0
0000082F 9AFFFF68 0B296802 6AFA76FF FC76FF00 000B4D9A 5016FA46 8DFE76FF .v±.F*.P.M....v•.v*j.h).h.../... 0000C0
2C478926 FC568BFA 46880A5E C4000008 609AFFFF 680B5A68 006AFA76 FFFC76FF .v•.v*j.hZ.h...'...ó^..F*.V•&.G, 0000E0
9AFFFF68 0B6D6800 6AFA76FF FC76FF00 000B919A 5016FA46 8DFE76FF 2E578926 &.W..v±.F*.P......v•.v*j.hm.h... 000100
FC568BFA 46880A5E C4000008 A49AFFFF 680B9E68 046AFA76 FFFC76FF 00000B73 s....v•.v*j.h..h...£...ó^..F*.V• 000120
08B16807 6AFA76FF FC76FF00 00FFFF9A 5016FA46 8DFE76FF 32578926 30478926 &.G0&.W2.v±.F*.P......v•.v*j.hŸ. 000140
76FFFC76 FF00000B CA9AFFFF 680BC468 056AFA76 FFFC76FF 00000BB7 9AFFFF68 h...ñ....v•.v*j.hó.h...ò....v•.v 000160
00FFFF9A FFFF68FF FF680A6A FA76FFFC 76FF0000 0BD09AFF FF680BD7 68086AFA *j.h■.h...ĩ....v•.v*j.h..h...... 000180
FC76FF10 77FF2612 77FF260A 5EC42257 89262047 8926FC56 8BFA468B 0A5EC400 .ó^..F*.V•&.G &.W"ó^.&.w.&.w..v• 0001A0
C4D88E0A 6AB81E56 57000008 C8C8C95F 5E1F0000 E90000B8 0000FFFF 9AFA76FF .v*.....¡..Õ...^_èùà...WV.¡j..Äó 0001C0
89FE578B 26FC478B 260E5EC4 040E4683 FE5689FC 46890A57 8B260847 8B260A5E ^.&.G.&.W..F•.V±̄.F..ó^.&.G•&.W±. 0001E0
```

Dump of file SATURN:[PCCOMMON.DUMP.DLL]PDLDGM.TMP;1 on 18-APR-1990 10:48:18.73
File ID (766,30,0)   End of file block 195 / Allocated 196

Virtual block number 82 (00000052), 512 (0200) bytes

```
5EC40CC4 8300000C 939A006A FC76FFFE 76FF08AC 68F876FF FA76FFFA 5689F846 F½.V*.v*.v½h¯..v±.v•j.......ó.ó^ 000000
FF0876FF 001EE903 750E470B 260C478B 260A5EC4 002EE903 750000AB 8F83260A .&.¢¨..u.Õ..ó^.&.G.&.G.u.Õ...v.. 000020
FF029A68 006A0CC4 8300000A 539A006A 0C77FF26 0E77FF26 0A5EC403 21680676 v.hI.ó^.&.w.&.w.j..S....ó.j.h... 000040
CBC95F5E 1F0000E9 0000B80E C4830000 09879A00 6A0676FF 0876FF0A 76FF0C76 v..v..v..v.j.......ó.¡..Õ...^_èù 000060
5689FC46 89FE578B 26FC478B 260E5EC4 040E4683 D88E0C18 881E5657 000008C8 à...WV.¡...Ä.F..ó^.&.G•&.W±.F=.V 000080
FE76FF00 1FE90375 FA460BF8 4688FA56 89F84689 0A578826 08478826 0A5EC4FE ±ó^.&.G.&.W..F½.V*.F½.F*u.Õ...v± 0000A0
B8FC5EC4 0037E900 40E90CC4 8300000C 579A006A F876FFFA 76FF08AA 68FC76FF .v•h¯..v*.v½j..W....ó.Õa.Õ7.ó^•¡ 0000C0
47892600 00B8FC5E C4044789 26064789 260000B8 FC5EC407 89260247 89260000 ..&.G.&..ó^•¡..&.G.&.G.ó^•¡..&.G 0000E0
08C8CBC9 5F5E1F00 00E90000 B80C4789 260E4789 260000B8 FC5EC408 4789260A .&.G.ó^•¡..&.G.&.G.¡..Õ...^_èùà. 000100
83FE5689 FC4689FE 578B26FC 4788260E 5EC4040E 4683D88E 0CC8B81E 56570000 ..WV.¡à..Ä.F..ó^.&.G•&.W±.F=.V±. 000120
77FF260A 5EC4F876 FFFA76FF FA5689F8 4689FE57 8B26FC47 8B260E5E C4040E46 F..ó^.&.G•&.W±.F½.V*.v*.v½ó^.&.w 000140
000CAE9A 006A0676 FF0876FF 0A76FF0C 76FF0282 68FC76FF FE76FF08 77FF260A .&.w..v±.v•h...v..v..v..v.j..Ü.. 000160
260E5EC4 040E4683 D88E0066 881E5657 000034C8 CBC95F5E 1F0000E9 18C48300 ..ó.Õ...^_èùà4..WV.¡f..Ä.F..ó^.& 000180
890C4689 FE578826 FC478826 0E5EC404 0E4683EE 5689EC46 89FE578B 26FC478B .G•&.W±.F$̄.VŸ.F..ó^.&.G•&.W±.Fê. 0001A0
88E45EC4 0000FA46 C7E65689 E44689FE 578826FC 4788260E 5EC4040E 4683DE56 VA.F..ó^.&.G•&.W±.FÕ.V|ùF'..ó^Õ¡ 0001C0
006ADC76 FFDE76FF 08A968EC 76FFEE76 FFE476FF E676FF07 89260247 89260000 ..&.G.&...vl.vÕ.vŸ.všh`..vn.vÊj. 0001E0
```

Dump of file SATURN:[PCCOMMON.DUMP.DLL]PDLDGM.TMP;1 on 18-APR-1990 10:48:18.73
File ID (766,30,0)   End of file block 195 / Allocated 196

Virtual block number 83 (00000053), 512 (0200) bytes

```
E8468D02 3DE90000 B80006E9 03750247 0B26078B 26E45EC4 10C48300 000E709A .p....ó.ó^Õ&..&.G.u.Õ..¡..Õ=..FÒ 000000
FF266168 5016CC46 8D0EC483 00000E88 9A006ADC 76FFDE76 FF08A668 086A5016 .Pj.hI..vA.vÊj.......ó..Fä.Pha&. 000020
2DE9037E 06573926 DA568808 4688EC5E C40CC483 00000EEF 9A006AE8 76FFEA76 vÕ.vÒj..ÿ....ó.ó^$.FÄ.VÖ&9W.-.Õ- 000040
13E9037E 02573926 CE5688CC 4688EC5E C4001FE9 03760447 39260009 E9037D00 .).Õ..&9G.v.Õ..ó^$.Fä.VÖ&9W.-.Õ. 000060
46805016 F0468D50 16F6468D 01C6E900 00B80006 E9037207 39260008 E9037D00 .).Õ..&9.r.Õ..¡..Õó..F-.P.FÞ.P.F 000080
16F4468D FC76FFFE 76FF14C4 83000000 0F9A006A DC76FFDE 76FF088F 685016FC •.Ph¢..vA.vÊj.......ó..v±.v•.F¶. 0000A0
FC76FFFE 76FF0000 0FA09AFC 76FFFE76 FF0071E9 037400F4 7E830000 0F8C9A50 P......-¶.t.Õq..v±.v•......v±.v• 0000C0
76FFE076 FFE276FF E476FFE6 76FF004E E9037400 00300000 0FB09A50 16E0468D .FÅ.P.¯...=..t.ÕN..vl.vÕ.vã.vÅ.v 0000E0
E45EC418 C4830000 0FE09A00 6A0676FF 0876FF0A 76FF0C76 FF02826B EC76FFEE Ÿ.všh...v..v..v..v.j..Å....ó.ó^Õ 000100
FF9AE901 1DE90000 B800000F FD9AFC76 FFFE76FF 0011E903 75024708 26078826 &..&.G.u.Õ...v±.v•.»...¡..Õ..Õ.. 000120
9AF076FF F276FF00 71E90374 00F47E83 00001016 9A5016F4 468DF076 FFF276FF .v·.vÞ.F¶.P......-¶.t.Õq..v·.vÞ. 000140
FFE676FF 004EE903 7400003D 0000103A 9A5016E0 468DF076 FFF276FF 0000102A *....v·.vÞ.FÅ.P.:...=..t.ÕN..vl. 000160
9A006A06 76FF0876 FF0A76FF 0C76FF02 8268EC76 FFEE76FF E076FFE2 76FFE476 vÕ.vã.vÅ.vŸ.všh...v..v..v..v.j.. 000180
0010879A F076FFF2 76FF0011 E9037502 47082607 8826E45E C418C483 0000106A j....ó.ó^Õ&..&.G.u.Õ...v·.vÞ.... 0001A0
037400F4 7E830000 FFFF9A50 16F4468D F676FFF8 76FFFF9A E90093E9 0000B800 .¡..Õ..Õ...v½.v—.F¶.P......-¶.t. 0001C0
003D0000 FFFF9A50 16E0468D F676FFF8 76FF0000 FFFF9AF6 76FFF876 FF0071E9 Õq..v½.v—......v½.v—.FÅ.P.....=. 0001E0
```

Dump of file SATURN:[PCCOMMON.DUMP.DLL]PDLDGM.TMP;1 on 18-APR-1990 10:48:18.73

```
File ID (766,30,0)   End of file block 195 / Allocated 196

Virtual block number 84 (00000054), 512 (0200) bytes

 76FF0C76 FF028268 EC76FFEE 76FFE076 FFE276FF E476FFE6 76FF004E E9037400 .t.ÕN..vl.võ.vã.vÅ.vŸ.všh...v..v 000000
 0011E903 7502470B 26078826 E45EC418 C4830000 00BD9A00 6A0676FF 0876FF0A ..v..v.j..§....á.á^õ&..&.G.u.Õ.. 000020
 C8CBC95F 5E1F0000 E90000B8 FF9AE900 09E90000 B80000FF FF9AF676 FFF876FF .v½.v-.....|..Õ..Õ..|..Õ...^ èùà 000040
 FA5689F8 4689FE57 8826FC47 88260E5E C4040E46 83088E00 D4881E56 57000008 ...WV.¡å..Ä.F..á^.&.G=&.W±.F½.V' 000060
 FF260A5E C4FC76FF FE76FFFE 5689FC46 89FE5788 26FC4788 260E5EC4 040E4683 .F..á^.&.G=&.W±.F=.V±.v±.v=á^.&. 000080
 0F569A00 6A0676FF 0876FF0A 76FF0C76 FF029968 F876FFFA 76FF0877 FF260A77 w.&.w..v'.v½h...v..v..v..v.j..V. 0000A0
 0E5EC404 0E468308 8E10A788 1E565700 0020C8C8 C95F5E1F 0000E918 C4830000 ...á.Õ...^_èùà ..WV.¡l..Ä.F..á^. 0000C0
 E04689FE 578826FC 4788260E 5EC4040E 4683EA56 89E84689 FE578826 FC478826 &.G=&.W±.FÕ.VÕ.F..á^.&.G=&.W±.FÅ 0000E0
 EC5EC400 00FA46C7 EE5689EC 4689FE57 8826FC47 88260E5E C4040E46 83E25689 .Vã.F..á^.&.G=&.W±.Fš.VŸúF'..á^š 000100
 6AE076FF E276FF08 EC68E876 FFEA76FF EC76FFEE 76FF0789 26024789 26000088 ¡..&.G.&...vŸ.vš.vÕ.vÒhš..vã.vÅj 000120
 468D01C6 E9000088 0006E903 7502470B 26078826 EC5EC410 C4830000 0E419A00 ..A....á.á^š&..&.G.u.Õ..¡..Õó..F 000140
 14C48300 0011829A 006AE076 FFE276FF 088F6850 16FC468D 5016F046 805016F6 -.P.Fb.P.F=.Ph¢..vã.vÅj.......á. 000160
 9AFC76FF FE76FF00 71E90374 00F47E83 00001256 9A5016F4 468DFC76 FFFE76FF .v±.v=.F¶.P.V....-¶.t.Õq..v±.v=. 000180
 FFEE76FF 004EE903 74000030 0000127A 9A5016E4 468DFC76 FFFE76FF 0000126A j....v±.v=.Fõ.P.z...=..t.ÕN..vŸ. 0001A0
 9A006A06 76FF0876 FF0A76FF 0C76FF02 8268E876 FFEA76FF E476FFE6 76FFEC76 vš.vl.võ.võ.vÒh...v..v..v..v.j.. 0001C0
 0012C79A FC76FFFE 76FF0011 E9037502 47082607 8826EC5E C418C483 000012AA ˆ....á.á^š&..&.G.u.Õ...v±.v=.Ú.. 0001E0

Dump of file SATURN:[PCCOMMON.DUMP.DLL]PDLDGM.TMP;1 on 18-APR-1990 10:48:18.73
File ID (766,30,0)   End of file block 195 / Allocated 196

Virtual block number 85 (00000055), 512 (0200) bytes

 037400F4 7E830000 12E09A50 16F4468D F076FFF2 76FFFF9A E9011DE9 0000B800 .¡..Õ..Õ...v·.vÞ.F¶.P.Å....-¶.t. 000000
 00300000 13049A50 16E4468D F076FFF2 76FF0000 12F49AF0 76FFF276 FF0071E9 Õq..v·.vÞ.¶....v·.vÞ.Fõ.F.....=. 000020
 76FF0C76 FF028268 E876FFEA 76FFE476 FFE676FF EC76FFEE 76FF004E E9037400 .t.ÕN..vŸ.vš.vl.võ.võ.vÒh...v..v 000040
 0011E903 7502470B 26078826 EC5EC418 C4830000 13349A00 6A0676FF 0876FF0A ..v..v.j..4....á.á^š&..&.G.u.Õ.. 000060
 9A5016F4 468DF676 FFF876FF FF9AE900 93E90000 B8000013 519AF076 FFF276FF .v·.vÞ.Q...¡..Õ..Õ...v½.v-.F¶.P. 000080
 468DF676 FFF876FF 00000F16 9AF676FF F876FF00 71E90374 00F47E83 00000F02 .....-¶.t.Õq..v½.v-......v½.v-.F 0000A0
 FFEA76FF E476FFE6 76FFEC76 FFEE76FF 004EE903 7400003D 00000F26 9A5016E4 õ.P.&...=..t.ÕN..vŸ.vš.vl.võ.võ. 0000C0
 8826EC5E C418C483 000010FE 9A006A06 76FF0876 FF0A76FF 0C76FF02 8268E876 vÒh...v..v..v..v.j..±....á.á^š&. 0000E0
 0088FF9A E90009E9 00008800 000F739A F676FFF8 76FF0011 E9037502 47082607 .&.G.u.Õ...v½.v-.s...¡..Õ..Õ..¡. 000100
 FC478826 0E5EC404 0E4683D8 8E1115B8 1E565700 001AC8C8 C95F5E1F 0000E900 .Õ...^_èùà...WV.¡...Ä.F..á^.&.G= 000120
 76FF0A76 FF0C76FF 028168F0 76FFF276 FF5016F6 468DF256 89F04689 FE578826 &.W±.FÞ.V·.F-.P.v·.vÞh...v..v..v 000140
 0148E9E6 46880006 E9037500 E67E83E6 468914C4 83000014 FB9A006A 0676FF08 ..v.j..½....á..Fl.-l.u.Õ...FlÕH. 000160
 26546850 16EC468D 0CC48300 0013E99A 006AF676 FFF876FF 26556850 16FA468D .F'.PhU&.v½.v-j..Õ....á..Fš.PhT& 000180
 C40109E9 00008800 06E90374 00EC7E83 0CC48300 0014409A 006AFA76 FFFC76FF .v=.v'j..ə....á..-š.t.Õ..¡..Õ..á 0001A0
 9A006A00 6A5016F4 468D38A7 68FE76FF 0000FFFF 9A5016FE 468D3877 FF260A5E ^.&.wß.F±.P......v±hI8.F¶.Pj.j.. 0001C0
 9A006AF6 76FFF876 FF265468 5016EC46 8D003BE9 0375F846 08F6468B 0000FFFF .....F-.F½u.Õ;..Fš.PhT&.v½.v-j.. 0001E0

Dump of file SATURN:[PCCOMMON.DUMP.DLL]PDLDGM.TMP;1 on 18-APR-1990 10:48:18.73
File ID (766,30,0)   End of file block 195 / Allocated 196

Virtual block number 86 (00000056), 512 (0200) bytes

 FA76FFFC 76FF08A6 68086A50 16F6468D 001AE903 7400EC7E 830CC483 00001463 c....á..-š.t.Õ...F-.Pj.hl..v=.v' 000000
 0C473926 F85688F6 46880A5E C40021E9 037400F4 7E830EC4 83000011 B99A006A j..¿....á..-¶.t.Õl.á^..F-.V½&9G. 000020
 0A5EC400 43E90375 00F47E83 0074E900 00880006 E903740E 57392600 0FE90374 t.Õ..&9W.t.Õ..j..Õt..-¶.u.ÕC.á^. 000040
 0472681E E876FFEA 76FF016A 006A0000 05E79A50 16E84680 1077FF26 1277FF26 &.w.&.w..FÒ.P.Õ...j.j..võ.vÒ.hr. 000060
 0028E900 00880006 E9037407 EE7E83EE 46890000 FFFF9A01 0468006A 046A681E .hj.j.h........FŸ.-Ÿ.t.Õ..¡..Õ(. 000080
 8910C483 00001220 9A006A06 76FF0876 FF0A76FF 0C76FF02 8468F676 FFF876FF .v½.v-h...v..v..v..v.j.. ....á.. 0000A0
 0E5EC404 0E468308 8E137188 1E565700 000EC8C8 C95F5E1F 0000E9E6 4688E646 Fl.FlÕ...^ èùà...WV.¡q..Ä.F..á^. 0000C0
 B8FE5689 FC46890E 5788260C 4788260A 5EC4FA56 89F84689 FE578826 FC478826 &.G=&.W±.F½.V'á^.&.G.&.W..F=.V±¡ 0000E0
 FF0C76FF 02786B0E 5789260C 478926FA 568BF846 880A5EC4 F44689F6 46890000 ...F-.F¶á^..F½.V'&.G.&.W.h(..v.. 000100
 46880006 E9037500 F27E83F2 46890CC4 83000013 A79A006A 0676FF08 76FF0A76 v..v..v.j..I....á..F·.-·.u.Õ...F 000120
 FA460BF8 46880088 E90375FA 56390008 E90374F8 4639FE56 8BFC4688 00A7E9F2 ·ÕI..F=.V±9F½t.Õ..9V'u.Õ...F½.F' 000140
 FA76FF0C C4830000 15CF9A00 6AF876FF FA76FF26 55685016 F4468D00 5CE90375 u.Õ\..F¶.PhU&.v'.v½j..Ü....á..v' 000160
 FF032168 0676FF08 76FF0CC4 83000015 E89A006A F476FFF6 76FF08E8 68F876FF .v½hÒ..v-.v¶j..Ò....á..v..v.hl.. 000180
 2AE9F246 880006E9 037500F2 7E83F246 890CC483 0000161E 9A006AF8 76FFFA76 v'.v½j.......á..F·.-·.u.Õ...F·Õ* 0001A0
 13D19A00 6AFC76FF FE76FF03 27680676 FF0876FF 0019E903 75FE4608 FC468800 ..F=.F±u.Õ...v..v.h'..v±.v=j..1. 0001C0
 040E4683 D88E1515 B81E5657 000004C8 CBC95F5E 1F0000E9 0000880C C4830000 ...á.¡..Õ...^_èùà...WV.¡...Å.F.. 0001E0

Dump of file SATURN:[PCCOMMON.DUMP.DLL]PDLDGM.TMP;1 on 18-APR-1990 10:48:18.73
```

```
File ID (766,30,0)   End of file block 195 / Allocated 196

Virtual block number 87 (00000057), 512 (0200) bytes

 26FC5EC4 0E578B26 0C478B26 0A5EC4FE 5689FC46 89FE578B 26FC478B 260E5EC4 ó^.&.G=&.W±.F=.V±ó^.&.G.&.W.ó^=& 000000
 0E4683D8 8E163888 1E565700 0004C8CB C95F5E1F 0000E900 00880257 89260789 ..&.W.|..Õ...^_èùà...WV.|8..Ä.F. 000020
 FC5EC412 57882610 478B260A 5EC4FE56 89FC4689 FE578B26 FC478B26 0E5EC404 .ó^.&.G=&.W±.F=.V±ó^.&.G.&.W.ó^= 000040
 4683D88E 1679881E 56570000 06C8C8C9 5F5E1F00 00E90000 88025789 26078926 &..&.W.|..Õ...^_èùà...WV.|y..Ä.F 000060
 FA76FFFE 5689FC46 891E578B 261C478B 260A5EC4 FA4689FE 478B260E 5EC4020E ..ó^.&.G±.F'ó^.Ï.G.&.W..F=.V±.v' 000080
 B8FC76FF FE76FF00 00FFFF9A FC76FFFE 76FF0676 FF0876FF 006A006A 006A006A j.j.j.j..v..v..v±.v=......v±.v=| 0000A0
 C8CBC95F 5E1F0000 E90000FF FF9A5052 001A050C 568B0A46 8B505203 E9BA03E3 D.¤Õ.RP.F..V....RP.....Õ...^_èùà 0000C0
 FE5689FC 4689FE57 8B26FC47 8B260E5E C4040E46 83088E16 BA881E56 57000012 ...WV.|¤..Ä.F..ó^.&.G=&.W±.F=.V± 0000E0
 0E578B26 0C478B26 0A5EC4F0 5689EE46 89FE578B 26FC478B 260E5EC4 040E4683 .F..ó^.&.G=&.W±.FŸ.Vÿó^.&.G.&.W. 000100
 6AF876FF FA76FF26 55685016 F2468000 98E90375 FA4608F8 4688FA56 89F84689 .F½.V'.F½.F'u.Õ...F·.PhU&.v'.v½j 000120
 77FF260A 5EC4FC76 FFFE76FF 0024E903 75F44608 F24680C C4830000 17B19A00 ..Ÿ....á..F·.F¶u.Õ$..v±.v=ó^.&.w 000140
 26496850 16F6468D 10C48300 0017C99A 006AF276 FFF476FF 27106804 77FF2606 .&.w.h.'.v¶.v·j..è....ó..F-.PhI& 000160
 E9037404 F67E8300 09E90375 08F67E83 0CC48300 0017FF9A 006AF876 FFFA76FF .v'.v½j.......á..—.u.Õ...—.t.Õ 000180
 B69A006A F876FFFA 76FF264C 68EE76FF F076FF00 19E90000 07C726EE 5EC4000B ..ó^Ÿ&ú...Õ...vÞ.vŸhL&.v'.v½j..Ñ 0001A0
 1F0000E9 00008800 0007C726 EE5EC400 0007C726 FC5EC400 10E90CC4 83000015 ....á.Õ..á^=&ú...ó^Ÿ&ú...|..Õ... 0001C0
 FE4680FC 76FFFC46 89384788 260A5EC4 D88E1727 881E5657 00000AC8 CBC95F5E ^_èùà...WV.|'..Äá^.&.G8.F=.v=.F± 0001E0

Dump of file SATURN:[PCCOMMON.DUMP.DLL]PDLDGM.TMP;1 on 18-APR-1990 10:48:18.73
File ID (766,30,0)   End of file block 195 / Allocated 196

Virtual block number 88 (00000058), 512 (0200) bytes

 0676FF08 76FF0A76 FF0C76FF 027C6850 16F6468D 5016FA46 80000014 0C9A5016 .P......F'.P.F-.Ph|..v..v..v..v. 000000
 0000FFFF 9AFA76FF 006AF676 FFF876FF 38A368FE 76FF14C4 83000015 689A006A j..k....ó..v±hÈ8.v½.v-j..v'..... 000020
 26FC478B 260E5EC4 040E4683 D88E182C B81E5657 000038C8 CBC95F5E 1F0000E9 Õ...^_èùà8..WV.|,..Ä.F..ó^.&.G=& 000040
 FF0000FA 46C7E456 89E24689 06578B26 04478B26 0A5EC4CA 5689C846 89FE578B .W±.FÃ.Vòó^.&.G.&.W..Fã.VÒÚF'... 000060
 F64688F8 5689F646 890E578B 260C478B 260A5EC4 0000FFFF 9A0C6AE2 76FFE476 vÕ.vãj......ó^.&.G.&.W..F-.V½.F- 000080
 76FF0876 FF0A76FF 0C76FF02 7C685016 F046805O 16E6468D 0089E903 75F84608 .FŸu.Õ...F|.P.FÞ.Ph|..v..v..v..v 0000A0
 9A5016FA 468DE676 FFF076FF F276FFE2 76FFE476 FF14C483 000019F2 9A006A06 .j..·....á..vÕ.vã.v·.vÞ.v|.F'.P. 0000C0
 16FC4680 0CC48300 00194D9A 006AF676 FFF876FF 26496850 16F4468D 0000FFFF .....F¶.PhI&.v½.v-j..M....ó..F=. 0000E0
 0011E903 7500067E 83D64689 0CC48300 0019C29A 006AF676 FFF876FF 26556850 PhU&.v½.v-j..ô....á..F=.~=.u.Õ.. 000100
 037504F4 7E830018 E9037508 F47E8302 83E9D646 8800001A 0C9AE276 FFE476FF .vÕ.vã......F=Õ°..¬¶.u.Õ...¬¶.u. 000120
 7E830009 E9037503 F47E8301 C7E90374 03FA7E83 0009E903 7502FA7E 830012E9 Õ...-'.u.Õ...-'.t.Õú..¬¶.u.Õ...~ 000140
 6AFC76FF FE76FF28 1368E276 FFE476FF E676FFC8 76FFCA76 FF0028E9 037405F4 ¶.t.Õ(..vò.và.v|.vÕ.vãh.(.v±.v=j 000160
 C876FFCA 76FFF676 FFF876FF 5016D046 8D0047E9 D6468912 C4830000 1A909A00 .......ó..F=ÕG..FÅ.P.v½.v~.vò.và 000180
 00067E83 D6468918 C4830000 1A2E9A00 6A0676FF 0876FF0A 76FF0C76 FF025968 hY..v..v..v..v.j........á..F=.~=. 0001A0
 FF028D68 D076FFD2 76FF020E E9D64688 0000184F 9AE276FF E476FF00 11E90375 u.Õ...vÕ.vã.O....F=Õ...v=.vÅh... 0001C0
 76FF0A76 FF0C76FF 025A6810 C4830000 1A479A00 6A0676FF 0876FF0A 76FF0C76 v..v..v..v.j..G....á.hZ..v..v..v 0001E0

Dump of file SATURN:[PCCOMMON.DUMP.DLL]PDLDGM.TMP;1 on 18-APR-1990 10:48:18.73
File ID (766,30,0)   End of file block 195 / Allocated 196

Virtual block number 89 (00000059), 512 (0200) bytes

 9A006A06 76FF0876 FF0A76FF 0C76FF02 74680CC4 8300001A 609A006A 0676FF08 ..v.j..'....á.ht..v..v..v..v.j.. 000000
 685016E0 468D00CE E903750E 470B260C 478B260A 5EC4D646 890CC483 00001BF0 Þ....á..F=ó^.&.G.&.G.u.Õö..FÅ.Ph 000020
 00A8E903 7500E07E 830CC483 00001A86 9A006A0C 77FF260E 77FF260A 5EC42654 T&á^.&.w.&.w.j..Ñ....á..~Å.u.Õ´. 000040
 CC468D0C C4830000 1AD39A00 6A0C77FF 260E77FF 260A5EC4 05786850 160C468D .FÉ.Phx.ó^.&.w.&.w.j..Æ....á..Fä 000060
 5EC4026A 006A10C4 8300001B 919A006A FC76FFFE 76FF08AD 68501608 46805016 .P.FÅ.PhÙ..v±.v=j.......ó.j.j.ó^ 000080
 0A5613D8 46031B25 00369A50 52025713 26070326 DC5EC40A 578B2608 478B260C É&.G.&.W.ó^É&..&.W.RP.6.X..FÅ.VÖ 0000A0
 0E571326 0C470326 DC5EC406 578B2604 478B260C 5EC4026A 006AEA56 89E84689 .FÒ.VÕj.j.ó^É&.G.&.W.ó^É&.G.&.W. 0000C0
 46801077 FF261277 FF260A5E C4EE5689 EC4689CE 5613CC46 03036E00 369A5052 RP.6.n..Fä.VÖ.F&.VŸó^.&.w.&.w..F 0000E0
 0BF04688 0082E900 CBE90000 8800001C 1A9AE276 FFE476FF 0000FFFF 9A5016E8 Ò.P......vÕ.vã.....|..Õù.Õ...FÞ. 000100
 FFE676FF C876FFCA 76FF0055 E9FA4688 006EE903 7500E67E 830077E9 0375F246 F·u.Õw..~l.u.Õn..F'ÕU..vò.và.vl. 000120
 4689C846 8B0043E9 12C48300 001BBB9A 006AF076 FFF276FF 271768E2 76FFE476 vÕ.vãh.'.v·.vÞj..£....á.ÕC..Fà.F 000140
 83000017 829A006A F076FFF2 76FF2717 68E276FF E476FFE6 76FF5016 D44680D4 á.Fá.P.vl.vÕ.vãh.'.v·.vÞj....... 000160
 5A68FFE7 E9FF9BE9 03750004 3DFFC8E9 03750001 3D0013E9 0016E900 19E912C4 á.Õ..Õ..Õ..=..u.Õà.=..u.Õ..ÕÕ.hZ 000180
 0A76FF0C 76FF0274 680CC483 00001C09 9A006A06 76FF0876 FF0A76FF 0C76FF02 ..v..v..v..v.j.......á.ht..v..v. 0001A0
 00880000 FFFF9AE2 76FFE476 FFD64689 0CC48300 0018639A 006A0676 FF0876FF .v..v.j..c....á..F=.vÕ.vã.....|. 0001C0
 FC478B26 0E5EC404 0E468308 8E189088 1E565700 0018C8CB C95F5E1F 0000E900 .Õ...^_èùà...WV.|...Ä.F..ó^.&.G= 0001E0

Dump of file SATURN:[PCCOMMON.DUMP.DLL]PDLDGM.TMP;1 on 18-APR-1990 10:48:18.73
```

File ID (766,30,0)   End of file block 195 / Allocated 196

Virtual block number 90 (0000005A), 512 (0200) bytes

```
46890E57 8B260C47 8B260A5E C4EC4689 EE468900 008BEA56 89E84689 FE578B26 &.Wt.FÒ.Võ|...FŸ.Fšá^.&.G.&.W..F 000000
1C969A00 6AE876FF EA76FF08 D0685016 FC468DF0 4689F246 89000088 FA5689F8 ½.V*|...F·.FÞ.F=.Phî..võ.vÒj.... 000020
F6468D0C C4830000 1CAE9A00 6AE876FF EA76FF08 D0685016 F4468D0C C4830000 ...á..F¶.PhÅ..võ.vÒj..Ü....á..F- 000040
260E4789 26000088 0A5EC40C C4830000 1CE29A00 6AF876FF FA76FF26 49685016 .PhI&.v*.v½j..ã....á.á^.|..&.G.& 000060
6AFC76FF FE76FF08 A668066A 5016EC46 8D0043E9 F4468801 05E9F646 8B0C4789 .G..F-Õ...F¶ÕC..Fš.Pj.hÎ..vt.v=j 000080
479A006A E876FFEA 76FF08A6 68016A50 16EC4680 0039E90E C4830000 1CFF9A00 .......á.Õ9..Fš.Pj.hÎ..võ.vÒj..G 0000A0
E9037500 023DFF85 E9037500 01300013 E90120E9 0000B800 1CE90EC4 8300001D ....á.Õ..|..Õ .Õ..=..u.Õç.=..u.Õ 0000C0
76FF08A6 68086A50 16EC468D 00BDE9EE 5689EC46 89FA568B F8468BFF E4E9FFCA ò.ÕÕ..F½.V*.Fš.VŸÕ§..Fš.Pj.hÎ..v 0000E0
6AE876FF EA76FF08 D3685016 F0468D00 A0E90EC4 8300001D 629A006A E876FFEA õ.vÒj..b....á.Õ...FÞ.PhÆ..võ.vÒj 000100
76FF08A6 68046A50 16EC4680 001DE903 75F2460B F046880C C4830000 1D879A00 .......á..FÞ.F·u.Õ...Fš.Pj.hÎ..v 000120
76FFFE76 FF08A668 066A5016 EC468D00 1AE90EC4 8300001D A49A006A F076FFF2 ·.vÞj..Ê....á.Õ...Fš.Pj.hÎ..vt.v 000140
006AE876 FFEA76FF 08A66808 6A5016EC 468D0043 E90EC483 00001DC1 9A006AFC =j..ê....á.ÕC..Fš.Pj.hÎ..võ.vÒj. 000160
E1A7FF2E 93C003FF D5E90376 00073000 012D0023 E90026E9 0EC48300 0019359A .S....á.Õ&.Õ#.-..=..v.ÕÎ..á...ÎÄ 000180
E90000B8 0006E903 74EE460B EC46881D 341CC91C C91D251D 251D251D 251D511D .Q.X.X.X.X.è.è.4..Fš.FŸt.Õ..|..Õ 0001A0
FF0876FF 0A76FF0C 76FF027B 680E5789 260C4789 26EE568B EC46880A 5EC40020 -.á^..Fš.VŸ&.G.&.W.h(..v..v..v.. 0001C0
D88E1C31 B81E5657 00000CC8 CBC95F5E 1F0000E9 0CC48300 0019049A 006A0676 v.j.......á.Õ...^_èùà...WV.|1..Ä 0001E0
```

Dump of file SATURN:[PCCOMMON.DUMP.DLL]PDLDGM.TMP;1 on 18-APR-1990 10:48:18.73
File ID (766,30,0)   End of file block 195 / Allocated 196

Virtual block number 91 (0000005B), 512 (0200) bytes

```
F44689FE 578B26FC 478B260E 5EC4040E 4683F846 89FE478B 260E5EC4 020E4683 .F..á^.&.Gt.F½.F..á^.&.G=&.Wt.F¶ 000000
0017E900 00FE46C7 FC5689FA 468903D8 168803D6 A1000007 C726F45E C4F65689 .V-á^¶&ú...Ä=...Ä..F*.V=úFt..Õ.. 000020
001DE903 7500FA7E 83FC5689 FA468903 D8978B03 D6878802 E3C1FE5E 8BFE46FF .Ft.^tëD...=...Ä..F*.V=.-*.u.Õ.. 000040
00018BFF C3E90009 E90000B8 078926FC 4688F45E C4000FE9 0374FA46 39F8468B .F½F*t.Õ..á^¶.F=&..|..Õ..Õù.|.. 000060
26FC478B 260E5EC4 040E4683 D88E1E3C 881E5657 000004C8 CBC95F5E 1F0000E9 Õ...^_èùà...WV.|<..Ä.F..á^.&.G=& 000080
C95F5E1F 0000E900 00880789 26FC5EC4 14478B26 0A5EC4FE 5689FC46 89FE578B .Wt.F=.Vtá^.&.G.á^=&..|..Õ...^_è 0000A0
89FC4689 FE578B26 FC478B26 0E5EC404 0E4683D8 8E1ED088 1E565700 0004C8CB ùà...WV.|Å..Ä.F..á^.&.G=&.Wt.F=. 0000C0
5F5E1F00 00E90000 B8025789 26078926 FC5EC406 578B2604 478B260A 5EC4FE56 Vtá^.&.G.&.W.á^=&..&.W.|..Õ...^_ 0000E0
FC4689FE 578B26FC 478B260E 5EC4040E 4683D88E 1F09881E 56570000 04C8CBC9 èùà...WV.|...Ä.F..á^.&.G=&.Wt.F= 000100
5E1F0000 E90000B8 02578926 078926FC 5EC46D57 8B266B47 8B260A5E C4FE5689 .Vtá^.&.Gk&.Wmá^=&..&.W.|..Õ...^ 000120
FE5689FC 46890E57 8B260C47 8B260A5E C4D88E1F 4A881E56 57000010 C8CBC95F _èùà...WV.|J..Äá^.&.G.&.W..F=.Vt 000140
6AFC76FF FE76FF26 55685016 F4468D00 6FE90000 B80006E9 0374FE46 08FC4688 ¯F=.Ftt.Õ..|..Õo..F¶.PhU&.vt.v=j 000160
C4830000 1FF49A00 6AF476FF F676FF08 DA685016 F0468D0C C4830000 1FDA9A00 ..Ö....á..FÞ.PhÖ..v¬.v¶j..¶....á 000180
76FFFA76 FF0EC483 00001C7E 9A006AF0 76FFF276 FF08A668 086A5016 F8468D0C ..F½.Pj.hÎ..v·.vÞj..¬....á..v*.v 0001A0
0000E900 008810C4 8300001E 259A006A 0676FF08 76FF0A76 FF0C76FF 028468F8 ½h...v..v..v..v.j..%....á.|..Õ.. 0001C0
89FC4689 0E578826 0C478826 0A5EC4D8 8E1F8888 1E565700 0010C8CB C95F5E1F .^_èùà...WV.|...Äá^.&.G.&.W..F=. 0001E0
```

Dump of file SATURN:[PCCOMMON.DUMP.DLL]PDLDGM.TMP;1 on 18-APR-1990 10:48:18.73
File ID (766,30,0)   End of file block 195 / Allocated 196

Virtual block number 92 (0000005C), 512 (0200) bytes

```
76FFFE76 FF265568 5016F446 8D006FE9 0000B800 06E90374 FE460BFC 468BFE56 Vt.F=.Ftt.Õ..|..Õo..F¶.PhU&.vt.v 000000
00002096 9A006AF4 76FFF676 FF08D868 5016F046 8D0CC483 0000207C 9A006AFC =j..| ...á..FÞ.PhÜ..v¬.v¶j... .. 000020
FA76FF0E C4830000 1FC29A00 6AF076FF F276FF08 A668086A 5016F846 8D0CC483 .á..F½.Pj.hÎ..v·.vÞj..ó....á..v* 000040
E90000B8 10C48300 0020139A 006A0676 FF0876FF 0A76FF0C 76FF0284 68F876FF .v½h...v..v..v..v.j... ...á.|..Õ 000060
46890E57 8B260C47 8B260A5E C4D88E20 20B81E56 57000010 C8CBC95F 5E1F0000 ...^_èùà...WV.|- .Äá^.&.G.&.W..F 000080
FE76FF26 55685016 F4468D00 6FE90000 B80006E9 0374FE46 0BFC4688 FE5689FC =.Vt¯F=.Ftt.Õ..|..Õo..F¶.PhU&.vt 0000A0
21389A00 6AF476FF F676FF08 DC685016 F0468D0C C4830000 211E9A00 6AFC76FF .v=j...I...á..FÞ.PhÉ..v¬.v¶j..8I 0000C0
FF0EC483 00002064 9A006AF0 76FFF276 FF08A668 086A5016 F8468D0C C4830000 ...á..F½.Pj.hÎ..v·.vÞj..d ...á.. 0000E0
00B810C4 83000020 B59A006A 0676FF08 76FF0A76 FF0C76FF 028468F8 76FFFA76 v*.v½h...v..v..v..v.j..ç ...á.|. 000100
0E578826 0C478826 0A5EC4D8 8E20CF88 1E565700 0010C8CB C95F5E1F 0000E900 .Õ...^_èùà...WV.|Ü .Äá^.&.G.&.W. 000120
FF265568 5016F046 8D006FE9 0000B800 06E90374 FE460BFC 468BFE56 89FC4689 .F=.Vt¯F=.Ftt.Õ..|..Õo..FÞ.PhU&. 000140
9A006AF0 76FFF276 FF08D268 5016F446 8D0CC483 000021C0 9A006AFC 76FFFE76 vt.v=j..áI...á..F¶.Ph@..v·.vÞj.. 000160
C4830000 21069A00 6AF476FF F676FF08 A668086A 5016F846 8D0CC483 0000210A ÖI...á..F½.Pj.hÎ..v¬.v¶j...I...á 000180
10C48300 0021579A 006A0676 FF0876FF 0A76FF0C 76FF0284 68F876FF FA76FF0E ..v*.v½h...v..v..v..v.j..WI...á. 0001A0
8B260C47 8B260A5E C4D88E21 71B81E56 57000010 C8CBC95F 5E1F0000 E90000B8 |..Õ...^_èùà...WV.|q!.Äá^.&.G.&. 0001C0
55685016 F0468D00 6FE90000 B80006E9 0374FE46 0BFC4688 FE5689FC 46890E57 W..F=.Vt¯F=.Ftt.Õ..|..Õo..FÞ.PhU 0001E0
```

Dump of file SATURN:[PCCOMMON.DUMP.DLL]PDLDGM.TMP;1 on 18-APR-1990 10:48:18.73

File ID (766,30,0)   End of file block 195 / Allocated 196

Virtual block number 93 (0000005D), 512 (0200) bytes

```
6AF076FF F276FF08 D3685016 F4468D0C C4830000 22629A00 6AFC76FF FE76FF26 &.v±.v•j..b"...á..F¶.Ph€..v·.vÞj 000000
000021A8 9A006AF4 76FFF676 FF08A668 086A5016 F8468D0C C4830000 227C9A00 ..|"...á..F½.Pj.hÎ..v~.v¶j..´|.. 000020
83000021 F99A006A 0676FF08 76FF0A76 FF0C76FF 028468F8 76FFFA76 FF0EC483 .á..v•.v½h...v..v..v..v.j..ª|... 000040
0C478B26 0A5EC408 8E22138B 1E565700 0010C8C8 C95F5E1F 0000E900 00B810C4 á.¡..Õ...^_èùà...WV.¡.".Äá^.&.G. 000060
5016F046 8D006FE9 00008800 06E90374 FE460BFC 468BFE56 89FC4689 0E578B26 &.W..F•.V±¯F•.F±t.Õ..¡..Õo..FÞ.P 000080
76FFF276 FF08DD68 5016F846 8D0CC483 00002304 9A006AFC 76FFFE76 FF265568 hU&.v±.v•j...#...á..F½.Phî..v·.v 0000A0
224A9A00 6AF876FF FA76FF08 A668086A 5016F446 8D0CC483 0000231E 9A006AF0 Þj...#...á..F¶.Pj.hÎ..v•.v½j..J" 0000C0
002289A 006A0676 FF0876FF 0A76FF0C 76FF0284 68F476FF F676FF0E C4830000 ...á..v~.v¶h...v..v..v..v.j...". 0000E0
88260A5E C4D88E22 B5B81E56 5700000C C8C8C95F 5E1F0000 E9000088 10C48300 ..á.¡..Õ...^_èùà...WV.¡ç".Äá^.&. 000100
F4468D00 5BE90000 B80006E9 0374FE46 08FC468B FE5689FC 46890E57 88260C47 G.&.W..F•.V±¯F•.F±t.Õ..¡..Õ[..F¶ 000120
FC76FFFE 76FF5016 F8468D0C C4830000 23AC9A00 6AFC76FF FE76FF26 55685016 .PhU&.v±.v•j..¯#...á..F½.P.v±.v• 000140
FF0C76FF 028468F8 76FFFA76 FF10C483 000022EC 9A006AF4 76FFF676 FF080E68 h8..v~.v¶j..ã"...á..v•.v½h...v.. 000160
0000C8C8 C95F5E1F 0000E900 00B810C4 83000023 309A006A 0676FF08 76FF0A76 v..v..v.j..=#...á.¡..Õ...^_èùà.. 000180
D88E23E5 881E5657 000004C8 CBC95F5E 1F0000E9 000088D8 8E2357B8 1E565700 .WV.¡W#.Á¡..Õ...^_èùà...WV¯¡Î#.Ä 0001A0
FF0EC483 0000238E 9A006A08 77FF260A 77FF260A 5EC408A6 68086A50 16FC468D .F•.Pj.hÎ.á^.&.w.Ï.w.j...#...á.. 0001C0
00B810C4 83000023 CB9A006A 0676FF08 76FF0A76 FF0C76FF 028468FC 76FFFE76 v±.v•h...v..v..v..v.j..ù#...á.¡. 0001E0
```

Dump of file SATURN:[PCCOMMON.DUMP.DLL]PDLDGM.TMP;1 on 18-APR-1990 10:48:18.73
File ID (766,30,0)   End of file block 195 / Allocated 196

Virtual block number 94 (0000005E), 512 (0200) bytes

```
FC478B26 0E5EC404 0E4683D8 8E23FC88 1E565700 0004C8C8 C95F5E1F 0000E900 .Õ...^_èùà...WV.¡=#.Ä.F..á^.&.G= 000000
0000FFFF 9AFC76FF FE76FF50 52007305 0C56880A 468BFE56 89FC4689 FE578B26 &.W±.F•.V±.F..V..s.RP.v±.v•..... 000020
FF0C76FF 0274680C C4830000 24A89A00 6A0676FF 0876FF0A 76FF0C76 FF025A68 hZ..v..v..v..v.j..¨$...á.ht..v.. 000040
0008C8C8 C95F5E1F 0000E900 00880CC4 83000024 379A006A 0676FF08 76FF0A76 v..v..v.j..7$...á.¡..Õ...^_èùà.. 000060
468BFE56 89FC4689 FE578B26 FC478B26 0E5EC404 0E4683D8 8E2451B8 1E565700 .WV.¡Q$.Ä.F..á^.&.G=&.W±.F•.V±.F 000080
025A6800 00FFFF9A 5016F846 8D016A00 6AFC76FF FE76FF50 52007305 0C56880A ..V..s.RP.v±.v•j.j..F½.P.....hZ. 0000A0
FF0A76FF 0C76FF02 74680CC4 83000025 289A006A 0676FF08 76FF0A76 FF0C76FF .v..v..v..v.j..(%...á.ht..v..v.. 0000C0
56570000 0EC8C8C9 5F5E1F00 00E90000 B80CC483 00002492 9A006A06 76FF0876 v..v.j...$...á.¡..Õ...^_èùà...WV 0000E0
C4040E46 83F45689 F24689FE 578B26FC 478B260E 5EC4040E 468308BE 24C5881E .¡é$.Á.F..á^.&.G=&.W±.F¯.V¶.F..á 000100
0A5EC450 16FC468D 000107C7 26F85EC4 FA5689F8 4689FE57 8826FC47 88260E5E ^.&.G=&.W±.F½.V•á^½&ú....F=.Pá^. 000120
76FFFE76 FF10C483 00002418 9A006AF2 76FFF476 FF271068 0477FF26 0677FF26 &.w.&.w.h.'.v¶.v·j...$...á..v±.v 000140
000030C8 CBC95F5E 1F0000E9 00008800 00FFFF9A 5016F646 80F876FF FA76FFFC =.v•.v½.F-.P.....¡..Õ...^_èùàO.. 000160
000088F0 5689EE46 89FE5788 26FC478B 260E5EC4 040E4683 D88E2542 881E5657 WV.¡B%.Ä.F..á^.&.G=&.W±.FŸ.VÞ¡.. 000180
4688DE46 89E04689 000088D2 56890046 89008705 0C56880A 4688E646 89E84689 .FÒ.F|.F..V.....FÅ.VØ¡...FÅ.F8.F 0001A0
26369A00 6AEE76FF F076FF26 49685016 F6468D06 56890446 89007705 0C56880A ..V..w..Få.Vø.F-.Ph|&.vÞ.vŸj..6& 0001C0
0A5EC40C C4830000 267A9A00 6AEE76FF F076FF26 55685016 F8468D0C C4830000 ...á..F½.PhU&.vÞ.vŸj..z&...á.á^. 0001E0
```

Dump of file SATURN:[PCCOMMON.DUMP.DLL]PDLDGM.TMP;1 on 18-APR-1990 10:48:18.73
File ID (766,30,0)   End of file block 195 / Allocated 196

Virtual block number 95 (0000005F), 512 (0200) bytes

```
7E83034A E90000B8 0006E903 740A5739 26000FE9 03740847 3926FA56 8BF84688 .F½.V•&9G.t.Õ..&9W.t.Õ..¡..ÕJ..~ 000000
C4830000 26A79A00 6AF876FF FA76FF08 A668086A 5016F246 8D001AE9 037404F6 ~.t.Õ...F·.Pj.hÎ..v•.v½j..Ï&...á 000020
76FF08A6 68F676FF 5016F246 8D001BE9 037407F6 7E830009 E9037506 F67E830E ..~~.u.Õ...~~.t.Õ...F·.P.v~hÎ..v 000040
DC9A006A F276FFF4 76FF0578 685016EA 468D0EC4 83000026 BF9A006A F876FFFA •.v½j..«&...á..Fõ.Phx..v¶.v·j..É 000060
00002768 9A006AF8 76FFFA76 FF08AD68 5016E246 8D501608 468D0CC4 83000026 &...á..FÄ.P.Fã.PhÙ..v•.v½j..k'.. 000080
EA5EC402 57892607 8926D45E C4E45613 E2460302 57882607 8826EA5E C410C483 .á.á^õ&..&.W..Fã.Võá^å&..&.W.á^õ 0000A0
08478B26 EA5EC406 57892604 478926D4 5EC40A56 13084603 06578B26 04478B26 &.G.&.W..FÄ.Võá^å&.G.&.W.á^õ&.G. 0000C0
0E578B26 0C478B26 EA5EC40A 57892608 47892604 5EC4E456 13E24603 0A578B26 &.W..Fã.Võá^å&.G.&.W.á^õ&.G.&.W. 0000E0
685016FC 468D019A E9037404 F67E830E 5789260C 478926D4 5EC40A56 13084603 .FÄ.Võá^å&.G.&.W..~~.t.Õ. .F=.Ph 000100
FFFE76FF 08A66808 6A5016F2 468D0CC4 83000027 859A006A F876FFFA 76FF080D Î..v•.v½j...'...á..F·.Pj.h ..v±. 000120
0027BA9A 006AF276 FFF476FF 05786850 16EA468D 0EC48300 00279D9A 006AFC76 v•j...'...á..Fõ.Phx..v¶.v·j..¤'. 000140
C4830000 27D29A00 6AFC76FF FE76FF08 AD685016 E2468D50 16084680 0CC48300 ..á..FÄ.P.Fã.PhÙ..v±.v•j..Ø'...á 000160
E9037401 DC7E830C C4830000 27F59A00 6AF876FF FA76FF08 D0685016 DC468D10 ..FÉ.PhÅ..v•.v½j..%'...á..~É.t.Õ 000180
020C7E83 0EC48300 0028189A 006AFC76 FFFE76FF 08A66806 6A5016E6 468D001A ...FÎ.Pj.hÎ..v±.v•j...(...á..~É. 0001A0
8D0EC483 00002830 9A006AFC 76FFFE76 FF08A668 076A5016 E6468000 1AE90374 t.Õ...FÎ.Pj.hÎ..v±.v•j..0(...á.. 0001C0
57882607 8B26D45E C40CC483 000028EA 9A006AE6 76FFE876 FF057868 50160E46 F8.Phx..vÒ.v|j..õ(...á.á^å&..&.W 0001E0
```

Dump of file SATURN:[PCCOMMON.DUMP.DLL]PDLDGM.TMP;1 on 18-APR-1990 10:48:18.73

```
File ID (766,30,0)   End of file block 195 / Allocated 196

Virtual block number 96 (00000060), 512 (0200) bytes

 26005EC4 DA561308 46030E57 88260C47 8826DE5E C4025789 26078926 D05EC402 .6^A&..&.W.6^8&.G.&.W..FA.VÖ6^A& 000000
 EA5EC40A 57892608 47892600 5EC40A57 88260847 8826045E C4065789 26044789 .G.&.W.6^8&.G.&.W.6^A&.G.&.W.6^ö 000020
 46030657 13260447 0326045E C40E571B 260C4728 26045EC4 06578826 04478826 &.G.&.W.6^8&+G.&.W.6^8&.G.&.W..F 000040
 97892600 97878926 FA5688F8 46880A5E C40E5789 260C4789 26005EC4 DA561308 Ä.VÖ6^A&.G.&.W.6^..F%.V*&....&.. 000060
 F368F876 FFFA76FF 5052009B 050C568B 0A468850 52009F05 0C56880A 46880099 ...F..V....RP.F..V....RP.v*.v%h¤ 000080
 5EC40257 88260788 26045EC4 0057E914 C4830000 25949A00 6AF876FF FA76FF08 ..v*.v%j...%...6.ÖW.6^8&..&.W.6^ 0000A0
 C4065789 26044789 26000A83 08882DDA 56880846 88005EC4 02578926 07892600 A&..&.W.6^A.FA.VÖ-|..Ö.&.G.&.W.6 0000C0
 06578826 04478826 D45EC40A 57892608 47892600 5EC40A57 88260847 8826045E ^8&.G.&.W.6^A&.G.&.W.6^8&.G.&.W. 0000E0
 5EC400A5 97892600 A3878926 F0568BEE 46880A5E C40E5789 260C4789 26005EC4 6^A&.G.&.W.6^..FŸ.Vþ&..È.&..È.6^ 000100
 76FF0676 FF1077FF 261277FF 260A5EC4 000005A4 9A026A10 77FF2612 77FF260A .&.w.&.w.j..È...6^.&.w.&.w..vø.v 000120
 2877FF26 2A77FF26 0A5EC410 77FF2612 77FF260A 5EC40000 FFFF9A01 6A036AD4 åj.j......6^.&.w.&.w.6^.&.w*&.w( 000140
 0E5EC404 0E4683D8 8E25C4B8 1E565700 0026C8CB C95F5E1F 0000E900 000C049A .....Õ...^_èùà&..WV.|6%.Ä.F..6^. 000160
 0087050C 56880A46 88EE4689 F0468900 0088F856 89F64689 FE578826 FC478826 &.G=&.W±.F=.V½|...Fþ.FŸ.F..V.... 000180
 468DE056 89DE4689 0077050C 56880A46 88E64689 E8468900 00880C56 890A4689 .FÖ.VÉ|...FÒ.F|.F..V..w..FB.VÀ.F 0001A0
 76FF2655 685016FC 468D0CC4 8300002A 279A006A F676FFF8 76FF2649 685016FA *.Ph|&.v½.v-j..'*...6..F=.PhU&.v 0001C0
 1E9A006A F676FFF8 76FF0578 685016F2 46800CC4 8300002A 3F9A006A F676FFF8 ½.v-j..?*...6..F·.Phx..v½.v-j... 0001E0

Dump of file SATURN:[PCCOMMON.DUMP.DLL]PDLDGM.TMP;1 on 18-APR-1990 10:48:18.73
File ID (766,30,0)   End of file block 195 / Allocated 196

Virtual block number 97 (00000061), 512 (0200) bytes

 00002A0F 9A006AFC 76FFFE76 FF08AD68 5016EA46 8D5016E2 468D0CC4 83000026 &...6..Fã.P.Fõ.PhÜ..v±.v=j...*.. 000000
 F25EC402 57892607 89260E5E C4EC5613 EA460302 57882607 8826F25E C410C483 .6.6^·&..&.W..Fõ.Vš6^8&..&.W.6^· 000020
 08478826 F25EC406 57892604 4789260E 5EC4E456 13E24603 06578826 04478826 &.G.&.W..Fã.VÖ6^8&.G.&.W.6^·&.G. 000040
 0E578826 0C478826 F25EC40A 57892608 4789260E 5EC4EC56 13EA4603 0A578826 &.W..Fõ.Vš6^8&.G.&.W.6^·&.G.&.W. 000060
 2600A387 8926F856 88F6468B 0A5EC40E 5789260C 4789260E 5EC4E456 13E24603 .Fã.VÖ6^8&.G.&.W.6^..F-.V½&..È.& 000080
 77FF2612 77FF260A 5EC40000 296C9A02 6A1077FF 261277FF 260A5EC4 00A59789 ..È.6^.&.w.&.w.j..l)..6^.&.w.&.w 0000A0
 FF260A5E C41077FF 261277FF 260A5EC4 00002986 9A016A03 6ADE76FF E076FF10 ..vÀ.vßj.j...)..6^.&.w.&.w.6^.&. 0000C0
 83088E29 85881E56 57000028 C8C8C95F 5E1F0000 E9000029 A19A2477 FF262677 w&&.w$.À)..Õ...^_èùà(..WV.|ç).Ä. 0000E0
 D8468900 77050C56 880A4688 FA5689F8 4689FE57 8826FC47 88260E5E C4040E46 F..6^.&.G=&.W±.F%.V*.F..V..w..FÄ 000100
 F876FFFA 76FF0578 685016E8 46800E56 890C4689 0087050C 56880A46 880A5689 .VÖ.F..V.....FÈ.VB.FÒ.Phx..v*.v½ 000120
 8300002B D99A006A F876FFFA 76FF2655 685016F0 468D0CC4 8300002B 989A006A j...+...6..Fþ.PhU&.v*.v½j..)+... 000140
 00008800 06E90374 0A573926 000FE903 74084739 26F25688 F04688DA 5EC40CC4 6.6^..Fþ.V·&9G.t.Õ..&9W.t.Õ..|.. 000160
 10C48300 0028F19A 006AF076 FFF276FF 08AD6850 16E4468D 5016E046 8D01C5E9 Õé..FÀ.P.Fõ.PhÜ..v·.vþj..þ+...6. 000180
 88260788 26E85EC4 0CC48300 002C729A 006AF076 FFF276FF 08AE6850 16FC468D .F=.PhÛ..v·.vþj..r,...6.6^Ò&..&. 0001A0
 E0460306 57882604 478826E8 5EC40257 89260789 26085EC4 E65613E4 46030257 W..Fõ.V|6^Ä&..&.W.6^Ò&.G.&.W..FÁ 0001C0
 478926FE 5613FC46 03E65688 E44688D8 5EC40657 89260447 8926085E C4E25613 .Vã6^Ä&.G.&.W.6^Ä.Fõ.V|.F=.V±&.G 0001E0

Dump of file SATURN:[PCCOMMON.DUMP.DLL]PDLDGM.TMP;1 on 18-APR-1990 10:48:18.73
File ID (766,30,0)   End of file block 195 / Allocated 196

Virtual block number 98 (00000062), 512 (0200) bytes

 5789260C 478926D8 5EC4E256 13E04603 0E578826 0C478826 E85EC40A 57892608 .&.W.6^Ò&.G.&.W..FÀ.Vã6^Ä&.G.&.W 000000
 016A5016 EC46800C C4830000 2C8C9A00 6AF076FF F276FF08 DD685016 F44680DE ..F¶.Ph|..v·.vþj...,...6..F&.Pj. 000020
 76FFEE76 FF057868 5016E846 800EC483 00002CA4 9A006AF4 76FFF676 FF08A668 h|..v-.v¶j..Ê,...6..FÒ.Phx..vŸ.v 000040
 006AF476 FFF676FF 08AD6850 16E4468D 5016E046 8D0CC483 00002CC1 9A006AEC &j..é,...6..FÀ.P.Fõ.PhÜ..v-.v¶j. 000060
 26078926 DC5EC4E6 5613E446 030A5788 26084788 26E85EC4 10C48300 002A5C9A .\*...6.6^Ò&.G.&.W..Fõ.V|6^É&..& 000080
 08478826 D85EC406 57892604 4789260C 5EC40657 88260447 8826085E C4025789 .W.6^Ä&.G.&.W.6^É&.G.&.W.6^Ä&.G. 0000A0
 0E578826 0C478826 D85EC40A 57892608 4789260C 5EC40002 83005005 0A578826 &.W..P..0.6^É&.G.&.W.6^Ä&.G.&.W. 0000C0
 5EC400A5 97892600 A3878926 FA5688F8 46880A5E C40E5789 260C4789 260C5EC4 6^É&.G.&.W.6^..F%.V*&..È.&..È.6^ 0000E0
 76FFDA76 FF1077FF 261277FF 260A5EC4 00002AF2 9A026A10 77FF2612 77FF260A .&.w.&.w.j..·*..6^.&.w.&.w..vÖ.v 000100
 2C77FF26 2E77FF26 0A5EC410 77FF2612 77FF260A 5EC40000 280C9A01 6A036AD8 Äj.j...+..6^.&.w.&.w.6^.&.w.&.w, 000120
 A3878826 0A5EC4D8 8E2B3888 1E565700 0020C8CB C95F5E1F 0000E900 0028279A .'+..Õ...^_èùà ..WV.|;+.Ä6^.&..È 000140
 0A5EC4EA 5689E846 89065788 26044788 260A5EC4 F25689F0 468900A5 97882600 .&..È..Fþ.V̄·6^.&.G.&.W..FÒ.Võ6^. 000160
 260A5EC4 00002066 9A016A03 6A505200 77050C56 880A4688 1077FF26 1277FF26 &.w.&.w..F..V..w.RPj.j..f-..6^.& 000180
 199A006A F076FFF2 76FF2655 685016F4 468D0000 2D4C9A01 6A1077FF 261277FF .w.&.w.j..L-...F¶.PhU&.v·.vþj... 0001A0
 0EC48300 002E319A 006AF476 FFF676FF 08A66804 6A5016FC 468D0CC4 8300002E ....6..F=.Pj.h|..v-.v¶j..1....6. 0001C0
 E4468D50 16E0468D 0CC48300 002E4E9A 006AFC76 FFFE76FF 05786850 16F8468D .F%.Phx..v±.v=j..N....6..FÀ.P.Fõ 0001E0

Dump of file SATURN:[PCCOMMON.DUMP.DLL]PDLDGM.TMP;1 on 18-APR-1990 10:48:18.73
```

```
File ID (766,30,0)   End of file block 195 / Allocated 196

Virtual block number 99 (00000063), 512 (0200) bytes

 2B260A5E C4E65688 E4468B10 C4830000 2EA09A00 6AF476FF F676FF08 AD685016 .PhÙ..v-.v¶j.......ó..Fô.Vlá^.&+ 000000
 571B2677 472B260A 5EC4E656 8BE4468B 02571126 070126F8 5EC47957 1B267747 Gw&.Wyá^½&..&.W..Fô.Vló^.&+Gw&.W 000020
 9A006AFC 76FFFE76 FF265068 F876FFFA 76FF036A 0A571126 08470126 F85EC479 yá^½&.G.&.W.j..v*.v½hP&.v±.v=j.. 000040
 C40CC483 00002EFA 9A006AF0 76FFF276 FF057868 5016EC46 800EC483 00002EB8 ¡....á..Fš.Phx..v·.vÞj..*....á.á 000060
 000018C8 9A116AE8 76FFEA76 FF025789 26078926 EC5EC402 57882607 8826F85E ^½&..&.W.á^š&..&.W..võ.vÒj..à... 000080
 C4830000 28839A00 6AF476FF F676FF27 1768E876 FFEA76FF 0B6AF876 FFFA76FF .v*.v½j..võ.vÒh.'.v-.v¶j...+...á 0000A0
 2F379A00 6A0676FF 0876FF0A 76FF0C76 FF025A68 00001967 9AE876FF EA76FF12 ..võ.vÔ.g...hZ..v..v..v..v.j..7/ 0000C0
 5EC40CC4 83000025 0F9A006A 0676FF08 76FF0A76 FF0C76FF 0274680C C4830000 ...á.ht..v..v..v..v.j...%...á.á^ 0000E0
 C95F5E1F 0000E900 00FFFF9A 2C77FF26 2E77FF26 0A5EC410 77FF2612 77FF260A .&.w.&.w.á^.&.w.&.w......Õ...^_è 000100
 E25689E0 468900A5 978B2600 A3878826 0A5EC4D8 8E2D95B8 1E565700 0020C8C8 ùà ..WV.¡.-.Äá^.&..Ê.&..ľ..FÁ.Vã 000120
 6A505200 77050C56 8B0A468B 1077FF26 1277FF26 0A5EC4FC 4689FE46 89000088 ¡...F±.F=á^.&.w.&.w..F..\..w.RPj 000140
 685016F6 46800000 2DEA9A01 6A1077FF 261277FF 260A5EC4 00002DD8 9A016A03 .j..Ã-..á^.&.w.&.w.j..ð-..  ̄-.Ph 000160
 E076FFE2 76FF2655 685016F8 46800CC4 8300002F E39A006A E076FFE2 76FF2649 I&.vã.vÁj..D/...á..F½.PhU&.vé.vÅ 000180
 16EE468D 006FE903 7407F67E 830009E9 037506F6 7E830CC4 83000030 009A006A j...0...á..—.u.Õ...—.t.Õo..FŸ. 0001A0
 AD685016 E8468050 16E4468D 0CC48300 00302A9A 006AE076 FFE276FF 05786850 Phx..vã.vÁj..*0...á..Fô.P.Fò.PhÙ 0001C0
 1BE4462B 7D578B26 7B478B26 0A5EC410 C4830000 30619A00 6AF876FF FA76FF08 ..v*.v½j..a0...á.á^.&.G(&.W)+Fô. 0001E0

Dump of file SATURN:[PCCOMMON.DUMP.DLL]PDLDGM.TMP;1 on 18-APR-1990 10:48:18.73
File ID (766,30,0)   End of file block 195 / Allocated 196

Virtual block number 100 (00000064), 512 (0200) bytes

 006AE076 FFE276FF 265068EE 76FFF076 FF036A06 57892604 478926EE 5EC4E656 Vlá^Ÿ&.G.&.W.j..vÞ.vŸhP&.vã.vÁj. 000000
 468BF456 89F24689 0099788B 26009787 8B260A5E C400DCE9 0EC48300 0030B19A .Ÿ0...á.ÕÉ.á^.&....&.....F·.V¶.F 000020
 77FF260A 5EC4F276 FFF476FF 0027E903 75F45639 0008E903 74F24639 FA568BF8 ½.V*9F·t.Õ..9V¶u.Õ'..v¶.v·á^.&.w 000040
 5016FC46 8D008CE9 10C48300 0030CC9A 006AF876 FFFA76FF 08ED6804 77FF2606 .&.w.hÙ..v*.v½j..ä0...á.Õ...F=.P 000060
 1BE90374 FE460BFC 468BEC46 890CC483 000030F2 9A006AF2 76FFF476 FF08D268 hø..v¶.v·j..·0...á..Fš.F=.F±t.Õ. 000080
 16E4468D EC46890C C4830000 31129A00 6AF276FF F476FF08 DD685016 FC468D00 ..F=.PhÏ..v¶.v·j...1...á..Fš.Fô. 0000A0
 260A5EC4 EC468910 C4830000 31309A00 6AFC76FF FE76FF08 AD685016 E8468050 P.Fò.PhÙ..v±.v=j..=1...á..Fšá^.& 0000C0
 002DFF9A 006AF276 FFF476FF 08E36850 52E6561B E4462B00 85978B26 0083878B ....&....+Fô.VlRPhD..v¶.v·j...-. 0000E0
 0CC48300 0031729A 006A0676 FF0876FF 0A76FF0C 76FF025A 68EC4689 0CC48300 ..á..FšhZ..v..v..v..v.j..rÎ...á. 000100
 1277FF26 0A5EC40C C4830000 2F1E9A00 6A0676FF 0876FF0A 76FF0C76 FF027468 ht..v..v..v..v.j.../...á.á^.&.w. 000120
 000008C8 CBC95F5E 1F0000E9 00002F55 9A2877FF 262A77FF 260A5EC4 1077FF26 &.w.á^.&.w*&.w(.U/..Õ...^_èùà... 000140
 46890000 8BFA5689 F8468900 A5978B26 00A3878B 260A5EC4 D88E2F69 8B1E5657 WV.¡i/.Äá^.&..È.&..È..F½.V*¡...F 000160
 A49A016A 036A5052 0077050C 568B0A46 8B1077FF 261277FF 260A5EC4 FC4689FE ±.F=á^.&.w.&.w..F..V..w.RPj.j..Ê 000180
 1077FF26 1277FF26 0A5EC400 002FB69A 016A1077 FF261277 FF260A5E C400002F /..á^.&.w.&.w.j..Ñ/..á^.&.w.&.w. 0001A0
 8B1E5657 000004C8 CBC95F5E 1F0000E9 00003190 9A2477FF 262677FF 260A5EC4 á^.&.w&&.w$..1..Õ...^_èùà...WV.¡ 0001C0
 38478B26 0A5EC4FE 5689FC46 89FE578B 26FC478B 260E5EC4 040E4683 D88E31A4 Ê1.Á.F..á^.&.G=&.W±.F=.V±á^.&.G8 0001E0

Dump of file SATURN:[PCCOMMON.DUMP.DLL]PDLDGM.TMP;1 on 18-APR-1990 10:48:18.73
File ID (766,30,0)   End of file block 195 / Allocated 196

Virtual block number 101 (00000065), 512 (0200) bytes

 0E4683D8 8E3220B8 1E565700 0008C8C8 C95F5E1F 0000E900 00B80789 26FC5EC4 á^=&..¡..Õ...^_èùà...WV.¡ 2.Ä.F. 000000
 F84689FE 478B260E 5EC4020E 4683FE56 89FC4689 FE578B26 FC478B26 0E5EC404 .á^.&.G=&.W±.F=.V±.F..á^.&.G±.F½ 000020
 FA468900 00FFFF9A F876FF00 6AFC76FF FE76FF00 AFB7FF26 00B187FF 260A5EC4 á^.&.ñŸ.&.ñ€..v±.v=j..v½......F* 000040
 8B260C47 8B260A5E C4D88E32 59B81E56 57000014 C8CBC95F 5E1F0000 E9FA4688 .F*Õ...^_èùà...WV.¡Y2.Äá^.&.G.&. 000060
 49685016 F6468DF0 5689EE46 8906578B 26044788 260A5EC4 FA5689F8 46890E57 W..F½.V*ã^.&.G.&.W..FŸ.VÞ.F-.PhÌ 000080
 6AF876FF FA76FF26 55685016 FC46800C C4830000 33029A00 6AF876FF FA76FF26 &.v*.v½j...3...á..F=.PhU&.v*.v½j 0000A0
 FFFA76FF 00002EDC 9A0A6AEE 76FFF076 FF013EE9 F646880C C4830000 332E9A00 ...3...á..F-Õ>..vÞ.vŸj..Ê....v*. 0000C0
 089AEE76 FFF076FF EC46890C C4830000 2FCB9A00 6AFC76FF FE76FF08 E968F876 v½hÕ..v±.v=j..Ù/...á..Fš.vÞ.vŸ.. 0000E0
 1FE90374 0A573926 0028E903 74084739 26FE568B FC4688 0A 5EC40132 E900002F /..Õ2.á^..F=.V±&9G.t.Õ(.&9W.t.Õ. 000100
 0149E90E C4830000 348A9A00 6A0676FF 0876FF0A 76FF0C76 FF029368 00C86800 .hà.h...v..v..v..v.j...4...á.ÕI. 000120
 0374F446 0BF2468B 0CC48300 0033B49A 006AFC76 FFFE76FF 08036850 16F2468D .F·.Ph€..v±.v=j..Ç3...á..F·.F¶t. 000140
 460BF246 8B0CC483 000033D7 9A006AFC 76FFFE76 FF08D268 5016F246 80003BE9 Õ;..F·.Phø..v±.v=j..■3...á..F·.F 000160
 46880CC4 83000034 029A006A FC76FFFE 76FF08DD 685016F2 46800018 E90374F4 ¶t.Õ...F·.PhÏ..v±.v=j...4...á..F 000180
 6AF276FF F476FF08 A668086A 5052000C 050C568B 0A468800 20E90375 F4460BF2 ·.F¶u.Õ ..F..V....RPj.hÌ..v¶.v·j 0001A0
 260677FF 260A5EC4 016A0000 33189A0A 6AEE76FF F076FF0E C4830000 32EA9A00 ..õ2...á..vÞ.vŸj...3..j.á^.&.w.& 0001C0
 00333F9A EE76FFF0 76FFEC46 890CC483 000000A9 9A006AFC 76FFFE76 FF0477FF .w..v±.v=j..`....á..Fš.vÞ.vŸ.73. 0001E0

Dump of file SATURN:[PCCOMMON.DUMP.DLL]PDLDGM.TMP;1 on 18-APR-1990 10:48:18.73
```

```
File ID (766,30,0)   End of file block 195 / Allocated 196

Virtual block number 102 (00000066), 512 (0200) bytes

00043DFE B2E9037F 00033DFF EFE9037D 00013D00 2BE9007F E90000B8 0034E900 .Ō4.¡..Ō..Ō+.=..).Ōÿ.=....Ōý±=.. 000000
76FF0C76 FF025A68 FFCCE9FE D1E90375 00083DFE D9E9037F 00053DFF DFE9037D ).ŌŌ.=....Ō)±=..u.Ō1±Ōä.hZ..v..v 000020
0676FF08 76FF0A76 FF0C76FF 0274680C C4830000 34A39A00 6A0676FF 0876FF0A ..v..v.j..£4...á.ht..v..v..v..v. 000040
00003159 9A006A06 76FF0876 FF0A76FF 0C76FF02 7B680CC4 83000034 BC9A006A j..¥4...á.h(..v..v..v..v.j..Y1.. 000060
B7FF260A 5EC4D88E 32B3B81E 56570000 00C8CBC9 5F5E1F00 00E9EC46 880CC483 .á..F‡Ō...^_èùà...WV.¡°2.Äá^.&.ñ 000080
0A77FF26 0A5EC404 77FF2606 77FF260A 5EC4016A 0000FFFF 9A00AFB7 FF2600B1 Ÿ,&.ñ€......j.á^.&.w.&.w.á^.&.w. 0000A0
5EC40000 FFFF9A04 77FF2606 77FF260A 5EC40CC4 83000034 2C9A006A 0877FF26 &.w.j..,4...á.á^.&.w.&.w......á^ 0000C0
0000E900 00880000 FFFF9A14 77FF260A 5EC40000 FFFF9A68 77FF2660 77FF260A .&.wm&.wk.....á^.&.w......¡..Ō.. 0000E0
680035E9 03750000 A7BF8326 0A5EC4D8 8E3406B8 1E565700 0002C8CB C95F5E1F .^_èùà...WV.¡ø4.Äá^.&.¢‡..u.Ō5.h 000100
76FF10C4 83000035 AC9A006A 0676FF08 76FF0A76 FF0C76FF 02856835 98683595 .5ħ.5h...v..v..v..v.j..˜5...á..v 000120
0C76FF02 8668FFFF 68FFFF68 0032E900 0035C29A 04E0681E 106A006A 38A668FE ±h‡8j.j..hÀ..ö5..Ō2.h..h..h...v. 000140
F9681E10 6A006A38 A668FE76 FF10C483 00003376 9A006A06 76FF0876 FF0A76FF .v..v..v.j..v3...á..v±h‡8j.j..h' 000160
00E90000 B800A787 89260A5E C4D8F7C0 1B0100A7 BF83260A 5EC40000 14209A04 .. ...á^.&.¢‡...á¾Äá^.&..‡.¡..Ō. 000180
439A5016 FE468D38 77FF260A 5EC4088E 3540B81E 56570000 02C8CBC9 5F5E1F00 ..^_èùà...WV.¡M5.Äá^.&.w8.F±.P.C 0001A0
FF0A76FF 0C76FF02 85683649 68364668 0035E903 7400587F 83260A5E C4000018 ...ā^.&..[.t.Ō5.hF6h16h...v..v.. 0001C0
36739A05 0F681E11 6A006A38 A668FE76 FF10C483 0000365D 9A006A06 76FF0876 v..v.j..]6...á..v±h‡8j.j..h...s6 0001E0

Dump of file SATURN:[PCCOMMON.DUMP.DLL]PDLDGM.TMP;1 on 18-APR-1990 10:48:18.73
File ID (766,30,0)   End of file block 195 / Allocated 196

Virtual block number 103 (00000067), 512 (0200) bytes

0035779A 006A0676 FF0876FF 0A76FF0C 76FF0286 68FFFF68 35606800 32E90000 ..Ō2.h'5h..h...v..v..v..v.j..w5. 000000
1B0158 7F 83260A5E C4000035 8D9A051B 681E116A 006A38A6 68FE76FF 10C48300 ..á..v±h‡8j.j..h....5..á^.&..[.. 000020
8E35EEB8 1E565700 0002C8CB C95F5E1F 0000E900 00885847 89260A5E C4D8F7C0 ä¾Äá^.&.G[¡..Ō...^_èùà...WV.¡Y5. 000040
0876FF0A 76FF0C76 FF028568 36E76836 E4680035 E9037500 657F8326 0A5EC4D8 Äá^.&..e.u.Ō5.hŌ6hŌ6h...v..v..v. 000060
0000363E 9A052868 1E126A00 6A38A668 FE76FF10 C4830000 36FB9A00 6A0676FF .v.j..«6...á..v±h‡8j.j..h(..>6.. 000080
83000036 289A006A 0676FF08 76FF0A76 FF0C76FF 028668FF FF683611 680032E9 Ō2.h.6h..h...v..v..v..v.j..(6... 0000A0
F7C01B01 657F8326 0A5EC400 0036DC9A 0538681E 126A006A 38A668FE 76FF10C4 á..v±h‡8j.j..h8..É6..á^.&..e..ä¾ 0000C0
83D88E36 9D881E56 57000006 C8CBC95F 5E1F0000 E90000B8 65478926 0A5EC4D8 Äá^.&.Ge¡..Ō...^_èùà...WV.¡.6.Ä. 0000E0
5016FE46 8D3877FF 260A5EC4 FC5689FA 4689FE57 8B26FC47 8B260E5E C4040E46 F..á^.&.G=&.W±.F¯.V=á^.&.w8.F±.P 000100
006A006A FA76FFFC 76FF1B63 68FE76FF 0000FFFF 9A00C868 00C86800 0035FF9A ..5..hà.hà.......v±hc..v=.v'j.j. 000120
0E5EC404 0E4683D8 8E373BB8 1E565700 0004C8CB C95F5E1F 0000E900 0037119A ..7..Ō...^_èùà...WV.¡;7.Ä.F..á^. 000140
89260A5E C4D8F7C0 1B0100A9 BF83260A 5EC4FE56 89FC4689 FE578B26 FC478B26 &.G=&.W±.F=.V±á^.&.¢`...á¾Äá^.&. 000160
000004C8 CBC95F5E 1F0000E9 0000B807 8926FC5E C400A987 8B260A5E C400A987 .`.á^.&..`.á^=&..¡..Ō...^_èùà... 000180
0A5EC4FE 5689FC46 89FE578B 26FC478B 260E5EC4 040E4683 D88E3795 B81E5657 WV.¡.7.Ä.F..á^.&.G=&.W±.F=.V±á^. 0001A0
078926FC 5EC400AD 878B260A 5EC400AD 8789260A 5EC4D8F7 C01B0100 ADBF8326 &.¢Ù...á¾Äá^.&..Ù.á^.&..Ù.á^=&.. 0001C0
8B260447 8B260A5E C4D88E37 E4B81E56 57000008 C8CBC95F 5E1F0000 E90000B8 ¡..Ō...^_èùà...WV.¡Ō7.Äá^.&.G.&. 0001E0

Dump of file SATURN:[PCCOMMON.DUMP.DLL]PDLDGM.TMP;1 on 18-APR-1990 10:48:18.73
File ID (766,30,0)   End of file block 195 / Allocated 196

Virtual block number 104 (00000068), 512 (0200) bytes

77FF260A 77FF260A 5EC42710 68F876FF FA76FF50 16FC468D FA5689F8 46890657 W..F½.V'.F=.P.v'.v½h.'á^.&.w.&.w 000000
006A0877 FF260A77 FF260A5E C4F876FF FA76FF00 6A10C483 000038D4 9A006A08 .j..á8...á.j..v'.v½á^.&.w.&.w.j. 000020
025968FC 76FFFE76 FF006A00 6A505200 08050C56 880A4688 0CC48300 0035079A ..5...á..F..V....RPj.j..v±.v=hY. 000040
52000C05 0C56880A 468818C4 83000038 ED9A006A 0676FF08 76FF0A76 FF0C76FF .v..v..v..v.j..Ú8...á..F..V....R 000060
76FF025A 680EC483 00003391 9A006A08 77FF260A 77FF260A 5EC408A6 68016A50 Pj.h‡.á^.&.w.&.w.j...3...á.hZ..v 000080
0876FF0A 76FF0C76 FF027468 0CC48300 0039069A 006A0676 FF0876FF 0A76FF0C ..v..v..v.j...9...á.ht..v..v..v. 0000A0
C69A006A 0676FF08 76FF0A76 FF0C76FF 027B680C C4830000 391F9A00 6A0676FF .v.j...9...á.h(..v..v..v..v.j..ó 0000C0
029B68D8 8E383388 1E565700 0000C8CB C95F5E1F 0000E900 00B80CC4 83000036 6...á.¡..Ō...^_èùà...WV.¡38.Äh.. 0000E0
C95F5E1F 0000E900 00B80CC4 83000038 AF9A006A 0676FF08 76FF0A76 FF0C76FF .v..v..v..v.j..£8...á.¡..Ō...^_è 000100
00AB8789 260A5EC4 FE478B26 0E5EC402 0E4683D8 8E3939B8 1E565700 0000C8CB ùà...WV.¡99.Ä.F..á^.&.G±á^.&..". 000120
8B260E5E C4040E46 83D88E39 69B81E56 57000004 C8CBC95F 5E1F0000 E90000B8 ¡..Ō...^_èùà...WV.¡i9.Ä.F..á^.&. 000140
57892607 8926FC5E C40A578B 26084788 260A5EC4 FE5689FC 4689FE57 8B26FC47 G=&.W±.F=.V±á^.&.G.&.W.á^=&..&.W 000160
02050856 8B06468B D88E3993 B81E5657 000000C8 CBC95F5E 1F0000E9 0000B802 .¡..Ō...^_èùà...WV.¡.9.Ä.F..V... 000180
1E016A00 6AFFFF68 06C668D8 8E3904B8 1E565700 0000C8CB C95F5E1F 0000E900 .Ō...^_èùā...WV.¡á9.Äh6.h..j.j.. 0001A0
CBC95F5E 1F0000E9 18C48300 00FFFF9A 006A016A 016A006A 006A00B3 68054668 hF.h°.j̄.j.j.j.j.......á.Ō...^_èù 0001C0
FF0876FF 0000FFFF 9A5016FC 46800A76 FF0C76FF D88E39F1 B81E5657 000004C8 à...WV.¡þ9.Ä.v..v..F=.P......v.. 0001E0

Dump of file SATURN:[PCCOMMON.DUMP.DLL]PDLDGM.TMP;1 on 18-APR-1990 10:48:18.73
```

```
File ID (766,30,0)   End of file block 195 / Allocated 196

Virtual block number 105 (00000069), 512 (0200) bytes

 CAC95F5E 1F0000E9 0000B80C C4830000 38649A00 6AFC76FF FE76FF02 75680676 v.hu..v±.v•j..dB...á.¡..Õ...^_èò 000000
 76FF0000 3A389A50 16FC468D 0A76FF0C 76FFD88E 3A28B81E 56570000 04C80008 ..à...WV.¡(:.Ä.v..v..F•.P.8:...v 000020
 08CAC95F 5E1F0000 E90CC483 00003A4E 9A006AFC 76FFFE76 FF027668 0676FF08 ..v.hv..v±.v•j..N:...á.Õ...^_èò. 000040
 37810203 00E20004 03930203 0491000E 352A0203 00000004 05C30005 005F9000 .. ...û.......*5..........ã....7 000060
 36AF0002 03BE0009 058A0203 01E50005 0BC70005 025C0005 31F10203 0422000C ..π...þ1..\...ú...Í......./...£6 000080
 31DF0203 0420000C 079A0203 00740003 38810203 05090010 34E80203 00000002 ......Ò4.......8..t.......-...Ô1 0000A0
 36140005 00F00004 343D0203 00000004 39F60002 02660005 05970203 01E50005 ..Í.......f...-9......=4..Þ....6 0000C0
 0B190005 04B7000F 17000205 00000005 0A8E0002 016A0005 08990203 63500002 ..Pc......j...............ñ..... 0000E0
 351A0203 00880002 14CA0103 037A0005 0B0A0005 02710005 05060203 05780005 ..x.......q...Ö...z...ð........5 000100
 24F90203 09FC0005 0AA40005 03CC000A 04030203 019C0004 063A0005 00FB0004 ..«...:............ä...Ê...•...*$ 000120
 0BA10005 3A200004 05140005 043E000C 07AC0203 01750005 08EA0203 035C0008 ..\...õ...u...¯...>....... :..À. 000140
 1AF80002 01080004 06A90203 00240004 05D40005 05230010 06D20203 00000005 ......Ø...#...å...$...`.......½. 000160
 37610203 0000002B 3A6A0002 01830005 05B50203 03D9000A 16F50203 0000002A *.....%...\...ç........j:+.....a7 000180
 0A810203 00980003 394F0203 02B00004 06EE0005 00170003 3A110203 044F000C ..O....:.......Ÿ...¯...09........ 0001A0
 1B440203 03E7000A 17130203 01160004 19200203 0C160005 0A910005 02840006 ..............  ...........Ó...D. 0001C0
 11E00203 637D0002 36820005 009C0005 0BB40005 00320001 376C0103 01900005 ......l7..2...Ç.......ý6..)c..À. 0001E0

Dump of file SATURN:[PCCOMMON.DUMP.DLL]PDLDGM.TMP;1 on 18-APR-1990 10:48:18.73
File ID (766,30,0)   End of file block 195 / Allocated 196

Virtual block number 106 (0000006A), 512 (0200) bytes

 05C60203 02920006 20810203 002A0003 3A900203 053F0010 07850203 02FE0008 ..±.......7....:..*....¯......ó. 000000
 03CE0203 04CE0010 06090203 39CC0004 39F90005 03860008 247C0203 019C0005 ......|$......¹9..ä9......ö...ö. 000020
 09660203 030F0008 123D0203 054F0010 02C80203 029E0006 320C0203 03F60008 ..-....2......à...O...=.......f. 000040
 0A940203 03930008 11CC0203 05B10005 0AE80005 01A90005 05170203 00B80003 ..¡.......`...Ò...Ÿ...ä......... 000060
 3A7A0203 01B70005 05280203 0404000B 35360203 0472000D 34120203 02AA0006 ..^....4..r...65......(...ñ...z: 000080
 063D0203 03230008 11F00203 09C30005 0AD50005 3A620004 05250005 02390005 ..9...%...b:..(...û...Þ...#...=. 0000A0
 08820103 01EB0004 06C90005 04490005 0B2C0005 01470004 03B40203 04E50010 ..Í...Ç...G...,...I...è...Š..... 0000C0
 0B700005 01C60005 05070203 03AD0008 042F0203 005C0002 08890103 005B0002 ..[.......\.../...Ù...■...ó...p. 0000E0
 04D00203 01540004 25AD0203 04B7000F 17030202 024A0005 14AE0203 0C4F0005 ..O...Û...J.......ñ...Ú%..T...Å. 000100
 09B80203 0417000C 187C0203 03370008 046C0203 04F60010 32990203 0486000E .......2..-...l...7...|.......¡. 000120
 00000000 638E0002 35630005 0CD00005 0B500005 01D40005 00130203 00630003 ..c........å...]...Ì...c5../c.... 000140
 FFFE76FF 0000FFFF 9A5016FC 46800C76 FF0E76FF D88EFFFF 881E5657 000014C8 à...WV.¡...Ä.v..v..F•.P......v±. 000160
 EC5EC4F2 5689F046 891E5788 261C4788 26EC5EC4 0000FFFF 9A5016EC 468DFC76 v=.F$.P.....á^$&.G.&.W..FÞ.V·á^$ 000180
 0876FF0A 76FF716A F85689F6 46891857 88261647 8826EC5E C4FA4689 1A478826 &.G..F*á^$&.G.&.W..F-.V½jq.v...v. 0001A0
 FFF876FF F076FFF2 76FF0000 FFFF9AF0 76FFF276 FFFC76FF FE76FF06 76FF006A j..v..v±.v=.v·.vÞ......v·.vÞ.v½. 0001C0
 000010C8 000ECAC9 5F5E1F00 00E90001 B8F44689 0000FFFF 9A5016FA 468DF676 v-.F*.P......F¶¡..Õ...^_èò..à... 0001E0

Dump of file SATURN:[PCCOMMON.DUMP.DLL]PDLDGM.TMP;1 on 18-APR-1990 10:48:18.73
File ID (766,30,0)   End of file block 195 / Allocated 196

Virtual block number 107 (0000006B), 512 (0200) bytes

 FE468900 00B8F246 89F44689 0000B8F6 4689F846 89000088 D88E0008 881E5657 WV.¡...Ä¡...F½.F-¡...F¶.F·¡...F± 000000
 81680876 FF0A76FF 5016F246 8D000000 189A5016 F646800C 76FF0E76 FFFC4689 .F•.v..v..F-.P......F·.P.v..v.h. 000020
 F0468B00 06E90375 00F07E83 F0468910 C4830000 011F9A00 6AF676FF F876FF02 ..v½.v-j.......á..FÞ.-Þ.u.Õ...FÞ 000040
 3D9A006A F276FFF4 76FF2649 685016FA 468D00CA E90375F4 460BF246 8B000BE9 ÕÜ..F·.F¶u.Õò..F*.PhI&.v¶.v·j..= 000060
 0001569A 006AF276 FFF476FF 26556850 16FC468D 006BE9FA 46880CC4 83000001 ....á..F*Õk..F=.PhU&.v¶.v·j..V.. 000080
 0052E90C C4830000 01719A00 6AFC76FF FE76FF08 E068F276 FFF476FF 0CC48300 ..á..v¶.v·hÁ..v±.v•j..q....á.ÕR. 0000A0
 76FFFE76 FF08E268 0CC48300 0001849A 006AF276 FFF476FF 26556850 16FC468D .F•.PhU&.v¶.v·j.......á.hã..v±.v 0000C0
 3DFFEFE9 037D0001 30001BE9 004AE900 01B80024 E908C483 000001BE 9A006AFC •j..ƒ....á.Õ$.¡..ÕJ.Õ..=..).Õÿ.= 0000E0
 01D19A00 6AF676FF F876FF02 5A68FFDC E9FFB1E9 03750004 3DFF85E9 037F0002 ....Õ..=..u.ÕŸ.ÕÊ.hZ..v½.v-j..ì. 000100
 5E1F0000 E90000B8 08C48300 00FFFF9A 006AF676 FFF876FF 02746808 C4830000 ...á.ht..v½.v-j.......á.¡..Õ...^ 000120
 0C76FF0E 76FFEE46 89F04689 0000B8D8 8E00A4B8 1E565700 001EC800 0ECAC95F _èò..à...WV.¡Ê..Ä¡...FÞ.FŸ.v..v. 000140
 1076FF12 76FF0000 00289A50 16E2468D F276FFF4 76FF0000 00CF9A50 16F2468D ¯F·.P.ü....v¶.v·.Fã.P.(....v..v. 000160
 FFF476FF 02786850 16EE468D FFFF0000 9A0676FF 0876FF0A 76FF0C76 FF0E76FF .v..v..v..v..v.......FŸ.Phx..v¶. 000180
 FFF076FF 08AD6850 16E6468D 5016FC46 8DEA4689 0CC48300 0002659A 006AF276 v·j..e....á..Fõ.F=.P.F|.PhÙ..vÞ. 0001A0
 E676FFE8 76FFFC76 FFFE76FF 5016EC46 8DEA4689 10C48300 0002929A 006AEE76 vŸj.......á..Fõ.F$.P.v±.v•.vÒ.v| 0001C0
 00EC7E83 EA468918 C4830000 02D29A00 6AEE76FF F076FF26 4A680876 FF0A76FF .v..v.hJ&.vÞ.vŸj..Ø....á..Fõ.~š. 0001E0

Dump of file SATURN:[PCCOMMON.DUMP.DLL]PDLDGM.TMP;1 on 18-APR-1990 10:48:18.73
```

File ID (766,30,0)   End of file block 195 / Allocated 196

Virtual block number 108 (0000006C), 512 (0200) bytes

```
ACE90375 F0460BEE 4688008D E9000088 0000FFFF 9A00C868 00C86800 11E90374 t.Õ..hà.hà......|..Õ§..FŸ.Fbu.Õ¯ 000000
FF0073E9 F646880C C4830000 02F19A00 6AEE76FF F076FF26 49685016 F6468000 ..F-.PhI&.vb.vŸj..þ....6..F-Õs.. 000020
46800075 E9000088 0CC48300 00030F9A 006AF276 FFF476FF 028868EE 76FFF076 vb.vŸh...v¶.v·j.......6.|..Õu..F 000040
08A66808 6A5016EE 46800CC4 83000003 299A006A EE76FFF0 76FF2655 685016F8 ½.PhU&.vb.vŸj..)....6..FŸ.Pj.hI. 000060
6AF276FF F476FF02 8968EE76 FFF076FF 0EC48300 0000EA9A 006AF876 FFFA76FF .v°.v½j..ō....6..vb.vŸh...v¶.v·j 000080
E9037D00 063DFF85 E9037500 0430001B E90024E9 0000B80C C4830000 02459A00 ..E....6.|..Õ$.Õ..=..u.Õ..=..).Õ 0000A0
56570000 08C8000E CAC95F5E 1F0000E9 0001B8FF 91E9FF75 E9037F00 073DFF9C ..=....Õu.Õ..|..Õ...^_èò..à...WV 0000C0
16F8468D FC76FFFE 76FF0000 02069A50 16FC468D 0C76FF0E 76FFD88E 01ED881E .¡Ü..Ä.v..v..F•.P......v±.v•.F½. 0000E0
8B26085E C4795789 26774789 26F85EC4 02578826 07882608 5EC40000 02169A50 P.....6^.&..&.W.6^½&.Gw&.Wy6^.&. 000100
8926F85E C4025788 26078826 085EC47D 5789267B 478926F8 5EC40657 88260447 G.&.W.6^½&.G(&.W)6^.&..&.W.6^½&. 000120
FF008597 89260083 878926F8 5EC40657 88260447 8826085E C4008197 89267F47 G.&....6^.&.G.&.W.6^½&....&..... 000140
6A036A50 52007705 FA5688F8 46880C76 FF0E76FF 0000FFFF 9A026A0C 76FF0E76 v..v.j.......v..v..F½.V°.w.RPj.j 000160
E9000088 0000FFFF 9A3077FF 263277FF 26F85EC4 0C76FF0E 76FF0000 FFFF9A01 .......v..v.6^½&.w2&.w0.....|..Õ 000180
5016FC46 800C76FF 0E76FF08 8E0382B8 1E565700 0012C800 0ECAC95F 5E1F0000 ...^_èò..à...WV.|...Ä.v..v..F•.P 0001A0
46890077 05F0568B EE468800 0003A29A 5016EE46 8DFC76FF FE76FF00 0003929A ......v±.v•.FŸ.P.Å....FŸ.Vb.w..F 0001C0
9A5016F4 468D5016 F2468D50 52008705 F0568BEE 46880876 FF0A76FF FA5689F8 ½.V°.v..v..FŸ.Vb...RP.F·.P.F¶.P. 0001E0
```

Dump of file SATURN:[PCCOMMON.DUMP.DLL]PDLDGM.TMP;1 on 18-APR-1990 10:48:18.73
File ID (766,30,0)   End of file block 195 / Allocated 196

Virtual block number 109 (0000006D), 512 (0200) bytes

```
6AF876FF FA76FF0C 76FF0E76 FF00BEE9 0000B800 06E90374 00F27E83 0000FFFF .....~·.t.Õ..|..Õ/..v..v..v°.v½j 000000
03700045 E9037E0A 573926F8 5EC40257 88260788 26085EC4 00000567 9A016A03 .j..g...6^.&..&.W.6^½&9W.-.ÕE.). 000020
571B2608 472B26F8 5EC40257 8826078B 26085EC4 0037E903 76084739 260009E9 Õ..&9G.v.Õ7.6^.&..&.W.6^½&+G.&.W 000040
0A578926 08478926 F85EC402 57882607 8826085E C4025711 26070126 F85EC40A .6^½&..&.W.6^.&..&.W.6^½&.G.&.W. 000060
19260847 2926F85E C402571B 26072B26 085EC402 57882607 8826F85E C40033E9 Õ3.6^½&..&.W.6^.&+.&.W.6^½&)G.&. 000080
FFFA76FF 0C76FF0E 76FF0257 89260789 26F85EC4 02578826 07882608 5EC40A57 W.6^.&..&.W.6^½&..&.W..v..v..v°. 0000A0
B81E5657 000004C8 000ECAC9 5F5E1F00 00E90000 B8000004 229A016A 036AF876 v½j.j..".....|..Õ...^_èò..à...WV.| 0000C0
9A006AFC 76FFFE76 FF028868 00000461 9A5016FC 46800C76 FF0E76FF D88E0451 Q..Ä.v..v..F•.P.a...h...v±.v•j.. 0000E0
0E76FFD8 8E058088 1E565700 0020C800 0ECAC95F 5E1F0000 E908C483 00000342 B....6.Õ...^_èò..à ..WV.|...Ä.v. 000100
E0468B00 0004719A 5016E046 8DF876FF FA76FF00 0005909A 5016F846 8D0C76FF .v..F½.P......v°.v½.FÅ.P.q....FÅ 000120
E4468D50 52008705 E2568BE0 46880876 FF0A76FF EC5689EA 46890077 05E2568B .Vã.w..Fõ.V§.v..v..FÅ.Vã...RP.Fõ 000140
0004C49A 016A036A EA76FFEC 76FF0C76 FF0E76FF 000004A0 9A5016E6 46805016 .P.FÌ.P......v..v..v§.võj.j..6.. 000160
E9037E00 95973926 E05EC406 57882604 47882608 5EC4005A E9037400 E47E8300 ..~õ.t.ÕZ.6^.&.G.&.W.6^Å&9...~.Õ 000180
5EC40095 97882600 93878826 E05EC400 18E90376 00938739 26000AE9 037D002A *.).Õ..&9...v.Õ..6^Å&....&....6^ 0001A0
04478926 085EC400 80978826 0088878B 26E05EC4 0018E906 57892604 47892608 .&.G.&.W.Õ..6^Å&....&....6^.&.G. 0001C0
0009E903 7E0048E9 037D0657 3926085E C40E578B 260C4788 26EA5EC4 06578926 &.W.6^õ&.G.&.W.6^.&9W.).ÕH.-.Õ.. 0001E0
```

Dump of file SATURN:[PCCOMMON.DUMP.DLL]PDLDGM.TMP;1 on 18-APR-1990 10:48:18.73
File ID (766,30,0)   End of file block 195 / Allocated 196

Virtual block number 110 (0000006E), 512 (0200) bytes

```
C40E571B 260C472B 26EA5EC4 06578826 04478826 085EC400 3AE90373 04473926 &9G.s.Õ:.6^.&.G.&.W.6^õ&+G.&.W.6 000000
0E578926 0C478926 EA5EC406 57882604 47882608 5EC40657 11260447 0126EA5E ^õ&.G.&.W.6^.&.G.&.W.6^õ&.G.&.W. 000020
0C472926 EA5EC406 571B2604 472B2608 5EC40657 88260447 8826EA5E C40037E9 Õ7.6^õ&.G.&.W.6^.&+G.&.W.6^õ&)G. 000040
87882 6E0 5EC40657 89260447 8926EA5E C4065788 2604478B 26085EC4 0E571926 &.W.6^.&.G.&.W.6^õ&.G.&.W.6^Å&.. 000060
573926EA 5EC400A1 97882600 9F878826 E05EC4F6 5689F446 89009997 88260097 ..&.....F¶.V-6^Å&....&..Å.6^õ&9W 000080
26E05EC4 08026850 16EE4680 0099E903 770C4739 260009E9 037E00A7 E9037D0E .).ÕI.~.Õ..&9G.w.Õ...FŸ.Ph0.6^Å& 0000A0
88000BE9 037400F2 7E83F246 890CC483 000007E0 9A006A00 97B7FF26 00998 7FF .ñ..&.ñ..j..Å....6..F·.~·.t.Õ... 0000C0
5EC4004C E97FFF00 A187C726 FFFF009F 87C726E0 5EC40014 E90374F0 460BEE46 FŸ.Fbt.Õ..6^Å&ú.....&ú.Å...ÕL.6^ 0000E0
88E0468B 5052009F 05E2568B E0468800 99978926 00978789 26F0568B EE468BE0 Å.FŸ.Vb&....&.....FÅ.Vã...RP.FÅ. 000100
9A006A00 A3B7FF26 00A5B7FF 26E05EC4 08F368EE 76FFF076 FF505200 9B05E256 Vã...RP.vb.vŸh¤.6^Å&.ñE.&.ñÈ.j.. 000120
573926EA 5EC4009D 97882600 98878826 E05EC4FF 40E9F246 8914C483 0000082C ,.....6..F·Õ⊙.6^Å&....&....6^õ&9W 000140
26E05EC4 08036850 16EE4680 0099E903 720C4739 260009E9 037D00A7 E9037E0E .~.ÕI.).Õ..&9G.r.Õ...FŸ.Pn€.6^Å& 000160
88000BE9 037400F2 7E83F246 890CC483 000008A0 9A006A00 97B7FF26 00998 7FF .ñ..&.ñ..j.......6..F·.~·. Õ... 000180
5EC4004C E9800000 9087C726 0001009B 87C726E0 5EC40014 E90374F0 460BEE46 FŸ.Fbt.Õ..6^Å&ú.....&ú........6^ 0001A0
88E0468B 5052009F 05E2568B E0468B00 99978926 00978789 26F0568B EE468BE0 Å.FŸ.Vb&....&.....FÅ.Vã...RP.FÅ. 0001C0
9A006A00 A3B7FF26 00A5B7FF 26E05EC4 08F368EE 76FFF076 FF505200 9B05E256 Vã...RP.vb.vŸh¤.6^Å&.ñE.&.ñÈ.j.. 0001E0
```

Dump of file SATURN:[PCCOMMON.DUMP.DLL]PDLDGM.TMP;1 on 18-APR-1990 10:48:18.73

File ID (766,30,0)   End of file block 195 / Allocated 196

Virtual block number 111 (0000006F), 512 (0200) bytes

```
000AE903 74009787 3926F656 88F4468B E05EC4FF 40E9F246 8914C483 000008E2 ã....á..F·Õa.á^Á.F¶.V-&9...t.Õ.. 000000
6A00A3B7 FF2600A5 B7FF26E0 5EC42655 685016FC 468D0007 E9037500 99973926 &9...u.Õ=..F=.PhU&á^Á&.ñÈ.&.ñÈ.j 000020
0374F446 39FE568B FC468B00 4FE90374 00F27E83 F246890C C4830000 091E9A00 .......á..F·.~·.t.ÕO..F=.V±9F¶t. 000040
093A9A00 6AF476FF F676FF08 A668046A 5016EE46 8D0039E9 0375F656 390008E9 Õ..9V-u.Õ9..FŸ.Pj.hl..v-.v¶j..:. 000060
C4830000 097B9A00 6AEE76FF F076FF03 2168F876 FFFA76FF F246890E C4830000 ...á..F·.vª.v½hl..vÞ.vŸj..(....á 000080
40E90375 00999739 26000AE9 03740097 873926FE 5688FC46 8BE05EC4 F246890C ..F·á^Á.F=.V±&9...t.Õ..&9...u.Õa 0000A0
83000009 979A006A 0097B7FF 260099B7 FF26E05E C408A668 046A5016 EE468D00 ..FŸ.Pj.hl.á^Á&.ñ..&.ñ..j....... 0000C0
46890CC4 83000005 A09A006A EE76FFF0 76FF0321 68F876FF FA76FFF2 46890EC4 á..F·.vª.v½hl..vÞ.vŸj.......á..F 0000E0
C95F5E1F 0000E900 00B80000 061D9A01 6A036AEA 76FFEC76 FF0C76FF 0E76FFF2 ·.v..v..vš.võj.j......|..Õ...^_è 000100
68000005 C99A5016 FC468D0C 76FF0E76 FFD88E05 B9B81E56 57000004 C8000ECA ò..à...WV.|¿..Ä.v..v..F=.P.è...h 000120
000014C8 000ECAC9 5F5E1F00 00E908C4 83000007 6C9A006A FC76FFFE 76FF028A ...v±.v=j..l....á.Õ...^_èò..à... 000140
4680FA76 FFFC76FF 000009DB 9A5016FA 468D0C76 FF0E76FF D88E09CB B81E5657 WV.|ù..Ä.v..v..Fª.P.Û....v=.vª.F 000160
F676FF08 76FF0A76 FFF65689 F4468900 7705EE56 88EC468B 000005D9 9A5016EC š.P.)....Fš.VŸ.w..F¶.V-.v..v..v- 000180
46880006 E9037500 F87E83F8 46890000 06089A50 16F04680 5016FE46 80F476FF .v¶.F±.P.FÞ.P......F½.~½.u.Õ...F 0001A0
6AF476FF F676FF0C 76FF0E76 FF019CE9 00008800 06E90375 00FE7E83 01ABE9F8 ½Õ¨..-±.u.Õ..|..Õ...v..v..v-.v¶j 0001C0
7E0048E9 037D0657 3926085E C40E578B 260C478B 26F45EC4 00000982 9A016A03 .j..ÿ...á^¶&.G.&.W.á^.&9W.).ÕH.~ 0001E0
```

Dump of file SATURN:[PCCOMMON.DUMP.DLL]PDLDGM.TMP;1 on 18-APR-1990 10:48:18.73
File ID (766,30,0)   End of file block 195 / Allocated 196

Virtual block number 112 (00000070), 512 (0200) bytes

```
260C472B 26F45EC4 06578B26 04478B26 085EC400 3AE90377 04473926 0009E903 .Õ..&9G.w.Õ:.á^.&.G.&.W.á^¶&+G.& 000000
0C478926 F45EC406 578B2604 478B2608 5EC40657 11260447 0126F45E C40E571B .W.á^¶&.G.&.W.á^.&.G.&.W.á^¶&.G. 000020
037D0045 E9037E06 57392608 5EC40657 8B260447 8B26F45E C4005CE9 0E578926 &.W.Õ\.á^¶&.G.&.W.á^.&9W.-.ÕE.). 000040
1B260447 2B26085E C406578B 2604478B 26F45EC4 0037E903 72044739 260009E9 Õ..&9G.r.Õ7.á^¶&.G.&.W.á^ &+G.&. 000060
26044789 26F45EC4 06578B26 04478B26 085EC40E 5719260C 472926F4 5EC40657 W.á^¶&)G.&.W.á^.&.G.&.W.á^¶&.G.& 000080
39260009 E9037D00 45E9037E 0A573926 F45EC402 578B2607 8B26085E C4065789 .W.á^.&..&.W.á^¶&9W.-.ÕE.).^ .&9 0000A0
26F45EC4 0A571B26 08472B26 F45EC402 578B2607 8B26085E C40037E9 03720847 G.r.Õ7.á^.&..&.W.á^¶&+G.&.W.á^¶& 0000C0
5EC40056 E90A5789 26084789 26F45EC4 02578B26 078B2608 5EC40257 11260701 ..&.W.á^.&..&.W.á^¶&.G.&.W.ÕV.á^ 0000E0
33E90372 07392600 08E9037D 0040E903 7E025739 26085EC4 02578B26 078B26F4 ¶&..&.W.á^.&9W.-.Õa.).Õ..&9.r.Õ3 000100
0A571926 08472926 F45EC402 57182607 2B26085E C402578B 26078B26 F45EC400 .á^¶&..&.W.á^.&+.&.W.á^¶&)G.&.W. 000120
F476FFF6 76FF0C76 FF0E76FF 02578926 078926F4 5EC40257 8B26078B 26085EC4 á^.&..&.W.á^¶&..&.W..v..v..v-.v¶ 000140
0A04B81E 56570000 04C8000E CAC95F5E 1F0000E9 0000B800 000A849A 016A036A j.j......|..Õ...^_èò..à...WV.|.. 000160
09EB9A00 6AFC76FF FE76FF02 97680000 0A149A50 16FC468D 0C76FF0E 76FFD88E .Ä.v..v..F•.P.....h...v±.v=j..Š. 000180
76FF0E76 FFD88E0C 1EB81E56 5700000C C8000ECA C95F5E1F 0000E908 C4830000 ...á.Õ...^_èò..à...WV.|...Ä.v..v 0001A0
5688F446 8B00000A 249A5016 F4468DFC 76FFFE76 FF00000C 2E9A5016 FC468D0C ..F=.P.......v±.v•.F¶.P.$....F¶.V 0001C0
FF00000C 059A016A 036AF876 FFFA76FF 0C76FF0E 76FFFA56 89F84689 007705F6 -.w..F½.Vª.v..v..vª.v½j.j....... 0001E0
```

Dump of file SATURN:[PCCOMMON.DUMP.DLL]PDLDGM.TMP;1 on 18-APR-1990 10:48:18.73
File ID (766,30,0)   End of file block 195 / Allocated 196

Virtual block number 113 (00000071), 512 (0200) bytes

```
0E76FF00 00FFFF9A 1076FF12 76FF0C76 FF0E76FF 00000408 9A016A0C 76FF0E76 v..v.j.......v..v..v..v.......v. 000000
000CC800 0ECAC95F 5E1F0000 E90000B8 0000FFFF 9A026AFB 76FFFA76 FF0C76FF .v..vª.v½j......|..Õ...^_èò..à.. 000020
8DFC76FF FE76FF00 000C679A 5016FC46 8D0C76FF 0E76FF08 8E0C578B 1E565700 .WV.|W..Ä.v..v..F=.P.g....v±.v•. 000040
76FF0C76 FF0E76FF FA5689F8 46890077 05F6568B F4468800 000C779A 5016F446 F¶.P.w....F¶.V-.w..F½.Vª.v..v..v 000060
89260847 8926F85E C402578B 26078B26 085EC400 0000699A 016A036A F876FFFA ª.v½j.j..i...á^.&..&.W.á^½&.G.&. 000080
76FF0C76 FF0E76FF 0E578926 0C478926 F85EC406 578B2604 478B2608 5EC40A57 W.á^.&.G.&.W.á^½&.G.&.W..v..v..v 0000A0
050CCC02 03000E0E CAC95F5E 1F0000E9 0000B800 000C989A 016A036A F876FFFA ª.v½j.j......|..Õ...^_èò.....ä.. 0000C0
0A007202 03000000 05023200 0201E500 05002902 03025C00 050CA802 03010B00 .Û...´...\...)...Î...Ž.......r.. 0000E0
030C3E02 03003200 0102AC01 0303E700 0A008802 03000000 280CE500 02030900 .)...Î.+.........Õ...¯...2...>.. 000100
050CF502 03029E00 060CB902 0300AC00 03000502 03029200 06043802 03002A00 .*...8..........¯...¿.......¥.. 000120
040E4683 D88EFFFF B81E5657 00000EC8 00000000 0002C300 070A4E02 03023900 .9...N...ù......à...WV.|...Ä.F.. 000140
FE578B26 FC478B26 0E5EC404 0E4683F6 5689F446 89FE578B 26FC478B 260E5EC4 á^.&.G•&.W±.F¶.V-.F..á^.&.G•&.W± 000160
9887C726 0A5EC400 EC978926 00EA8789 26FE568B FC46880A 5EC4FE56 89FC4689 .F=.V±á^..F=.V±&..õ.&..š.á^.&ú.. 000180
C7260A5E C4000000 9E87C726 0064009C 87C7260A 5EC4FFFF 009A87C7 26FF7400 .t.&ú.....á^.&ú...d.&ú.....á^.&ú 0001A0
F8468D00 0000A687 C7260096 00A487C7 260A5EC4 000000A2 87C72601 9000A087 .....&ú.Å...á^.&ú.Ê...&ú.Î....F½ 0001C0
F85EC400 26E90375 FA4608F8 46880AC4 830000FF FF9A006A 0A76FF0C 76FF5016 .P.v..v.j.......á..F½.Fªu.Õ&.á^½ 0001E0
```

Dump of file SATURN:[PCCOMMON.DUMP.DLL]PDLDGM.TMP;1 on 18-APR-1990 10:48:18.73

```
File ID (766,30,0)   End of file block 195 / Allocated 196

Virtual block number 114 (00000072), 512 (0200) bytes

 10C48300 00FFFF9A 006A0676 FF0876FF 0A76FF0C 76FF08A7 6837FF26 0277FF26 &.w.&.7hl..v..v..v..v.j.......6. 000000
 0000E900 00B8D88E 0008881E 56570000 00C8C8C9 5F5E1F00 00E9F246 88F24689 .F·.F·Ö...^_èùà...WV.¡...Ä¡..Ö.. 000020
 46890096 97882600 94878826 0A5EC4D8 8E00E688 1E565700 00B8C8CB C95F5E1F .^_èùà¡..WV.¡l..Äó^.&....&.....F 000040
 2600A487 8B260A5E C4885689 B6468900 EC978826 00EA8788 260A5EC4 C25689C0 &.Vòó^.&..ö.&..š..FÑ.V¡ó^.&..Ê.& 000060
 0A5EC4FE 5689FC46 8900A297 882600A0 8788260A 5EC48C56 89BA4689 00A69788 ..l..Fα.V¥ó^.&....&..Å..F=.V±ó^. 000080
 94468900 9E978826 009C8788 260A5EC4 9C56899A 4689009A 97882600 98878826 &....&.....F..V.ó^.&....&.....F. 0000A0
 76FF0279 6850169E 46800308 E90000B8 0006E903 74001E7F 83260A5E C4965689 .V.ó^.&....t.Ö..¡..Ö...F..Phy..v 0000C0
 F39A006A C076FFC2 76FF027F 685016B2 4680OCC4 83000001 AF9A006A C076FFC2 ó.vâj..£....ó..Fý.Ph...vò.vâj..µ 0000E0
 FF000BE9 0375008E 7E830000 FFFF9A50 168E468D B276FFB4 76FF0CC4 83000001 ....ó..vÇ.vý.F∫.P......~∫.u.Ö... 000100
 B676FFB8 76FF2714 68B276FF B476FF14 6A501604 46800000 FFFF9AB2 76FFB476 vÇ.vý......Få.Pj..vÇ.výh.'.v¡.vÑ 000120
 00FFFF9A B276FFB4 76FF0008 E9037500 8E7E8398 468912C4 83000003 329A006A j..2....ó..F..~∫.u.Ö...vÇ.vý.... 000140
 8B944688 A45689A2 46899C56 8B9A4688 026EE998 46880006 E9037500 987E8300 ..~..u.Ö...F.Ön..F..V..FÅ.VÊ.F.. 000160
 96568B94 4688AC56 89AA4689 FE5613FC 46039C56 8B9A4688 A85689A6 46899656 V..Fl.V´.F..V..F=.V±.F´.V¯.F..V. 000180
 6A286A00 6A286A00 6A5016A2 46809E76 FFA076FF 805689AE 46898C56 138A4603 .Fα.V¥.FÛ.V¯.v..v..FÅ.Pj j(j.j(j 0001A0
 8B8A4688 026A006A C65689C4 46899C56 889A4688 00000311 9A016A00 6A006A01 .j.j.j.......F..V..Fó.Vó. j..Fα. 0001C0
 56889A46 88CA5689 C8468996 56139446 03FFFF00 369A5052 00DA8300 012D8C56 V¥·...Ö.RP.6....F..V..Fà.' ·F..V 0001E0

Dump of file SATURN:[PCCOMMON.DUMP.DLL]PDLDGM.TMP;1 on 18-APR-1990 10:48:18.73
File ID (766,30,0)   End of file block 195 / Allocated 196

Virtual block number 115 (00000073), 512 (0200) bytes

 6A9E76FF A076FFD2 5689D046 89CA568B C84688CE 5689CC46 89FE5613 FC46039C ..F=.V±.Fä.Vö.Fà.Vò.FÅ.V∅.v..v.j 000000
 8900D283 006405A4 5688A246 880000FF FF9A016A 016A006A 5016C446 80026A00 .j..Fó.Pj.j.j.......FÅ.VÊ.d..∅.. 000020
 016A006A 006A036A 006A006A 006A006A 5016A246 8D9E76FF A076FFAC 5689AA46 F´.V¯.v..v..FÅ.Pj.j.j.j.j.j.j.j. 000040
 6AD476FF D676FF27 1F688276 FFB476FF 50160846 80216A00 D846C600 00FFFF9A .....6FÄ.jl.FÄ.P.vÇ.výh.'.vø.vâj 000060
 76FFA076 FF0143E9 98468800 06E90375 00987E83 98468912 C4830000 FFFF9A00 .......ó..F..~..u.Ö...F.ÖC..v..v 000080
 46809E76 FFA076FF 0000039E 9A036A9E 76FFA076 FF0000FF FF9A5016 FA46809E ..F*.P......v..v.j.......v..v..F 0000A0
 9A016A00 6A006A50 16A2468D 505203E3 00369A8A 76FF8C76 FF026A00 6A501608 Ä.Pj.j..v¥.vα.6.D.RP.FÅ.Pj.j.j.. 0000C0
 4688A456 89A24689 AC5688AA 46880000 FFFF9AFA 76FF9E76 FFA076FF 000003F3 µ....v..v..v*......F´.V¯.FÅ.VÊ.F 0000E0
 FFA076FF A85689A6 4689CA56 88C8468B AC5689AA 4689FE56 13FC4603 9C56889A ..V..F=.V±.F´.V¯.Fà.Vò.Fl.V´.v.. 000100
 006A006A 5016A246 80505204 5800369A BA76FFBC 76FF046A 006A06AE 681E9E76 v..hÛ.j.j..v¥.vα.6.[.RP.FÅ.Pj.j. 000120
 006AD476 FFD676FF 271268B2 76FFB476 FF016A50 16FF4886 80000004 689A006A j..k.....N..Pj..vÇ.výh.'.vø.vâj. 000140
 A85688A6 46880064 E9984688 0006E903 7500987E 83984689 12C48300 0001979A ......ó..F..~..u.Ö...F.Öd..Fl.V´ 000160
 006A5016 FF48868D 9E76FFA0 76FFA856 89A64689 96568894 46888056 89AE4689 .FÛ.V¯.F..V..Fl.V´.v..v...N..Pj. 000180
 680000FF FF9A006A 006A006A 5016A246 80505202 9000369A BA76FFBC 76FF046A j..v¥.vα.6...RP.FÅ.Pj.j.j......h 0001A0
 5E1F0000 E90000B8 0CC48300 00FFFF9A 006A0676 FF0876FF 0A76FF0C 76FF0320  ..v..v..v..v.j.......6.¡..Ö...^ 0001C0
 CBC95F5E 1F0000E9 00020508 56880646 88D88E00 FD881E56 57000000 C8CBC95F _èùà...WV.¡»..Ä.F..V....Ö...^_èù 0001E0

Dump of file SATURN:[PCCOMMON.DUMP.DLL]PDLDGM.TMP;1 on 18-APR-1990 10:48:18.73
File ID (766,30,0)   End of file block 195 / Allocated 196

Virtual block number 116 (00000074), 512 (0200) bytes

 C95F5E1F 0000E900 EC978826 00EA8788 26065EC4 D88E0498 B81E5657 000000C8 à...WV.¡...Äó^.&..ö.&..š.Ö...^_è 000000
 1E026A09 6AFFFF68 FFFF6832 6AFFFF68 04E668D8 8E048888 1E565700 0000C8CB ùà...WV.¡¡..Ähl.h..j2h..h..j.j.. 000020
 CBC95F5E 1F0000E9 1EC48300 00FFFF9A 006A0A6A 016A07B8 681E00EE 68068668 hÑ.hŸ..h¡.j.j.j.......ó.Ö...^_èù 000040
 00030098 02030000 000604DE 000201F0 0005020F 0203025C 00050364 02030012 ....d...\...Ö...Þ...ß........... 000060
 00030501 02030204 00050278 02030000 00280409 00020000 002A0380 00020087 ......*.....).+.....x........... 000080
 000401C2 0203002A 00030411 02030217 00050390 02030098 000300C9 02030017 ....è.....................*...ö... 0000A0
 0004020D 0203022D 00050357 02030493 000604E9 00050037 00030481 02030127 '.......7...Ö.......W...-....... 0000C0
 00000000 00000000 00000000 000004B0 000604E1 00050147 000401D6 0203013B ;...ø...G...Ä...¯............... 0000E0
 5689F846 89FE578B 26FC478B 260E5EC4 040E4683 D88EFFFF B81E5657 00000EC8 å...WV.¡...Ä.F..ó^.&.G=&.W±.F½.V 000100
 26FE568B FC46880A 5EC4FE56 89FC4689 FE578826 FC478826 0E5EC404 0E4683FA *.F..ó^.&.G=&.W±.F=.V±ó^..F=.V±& 000120
 87C7260A 5EC40000 008C87C7 26019000 8A87C726 0A5EC401 06978926 01048789 ....&....ó^.&ú.α...&ú.¥...ó^.&ú. 000140
 0AC48300 00FFFF9A 006A0A76 FF0C76FF 5016F246 80000000 C087C726 0096008E ∫...&ú.å....F·.P.v..v.j.......ó. 000160
 76FF0A76 FF0C76FF 08A76837 FF260277 FF26F25E C40026E9 0375F446 08F24688 .F·.F¶u.Ö&.ó^·&.w.&.7hl..v..v..v 000180
 000086C8 CBC95F5E 1F0000E9 F64688F6 468910C4 830000FF FF9A006A 0676FF08 ..v.j.......ó..F-.F-Ö...^_èùà... 0001A0
 AE878826 0A5EC486 56898446 895C5788 265A4788 260A5EC4 D88E0008 881E5657 WV.¡...Äó^.&.GZ&.W\.F..V.ã^.&..Û 0001C0
 46890084 97882600 82878826 0A5EC400 4CF846C7 96568994 46890080 97882600 .&..¯..F..V.úf½L.ó^.&..ý.&..Ç..F 0001E0

Dump of file SATURN:[PCCOMMON.DUMP.DLL]PDLDGM.TMP;1 on 18-APR-1990 10:48:18.73
```

```
File ID (766,30,0)   End of file block 195 / Allocated 196

Virtual block number 117 (00000075), 512 (0200) bytes

BA878826 0A5EC4FF 7C9689FF 7A868900 88978826 00868788 260A5EC4 82568980 ..V.á^.&..Ñ.&..¡...z...|.á^.&..¤ 000000
C4925689 90468900 C0978826 00BE8788 260A5EC4 FE5689FC 4689008C 97882600 .&..¥..F=.V±á^.&../.&..ä..F..V.á 000020
26FE5613 FC460382 56888046 880A5EC4 28578926 26478926 82568880 46880A5E ^..F..V.&.G&&.W(á^..F..V..F=.V±& 000040
7A86880A 5EC42C57 89262A47 8926FF7C 968BFF7A 86880A5E C4305789 262E4789 .G.&.W0á^...z...|.&.G*&.W,á^...z 000060
80002605 0C56880A 46880A5E C4345789 26324789 26925613 904603FF 7C9688FF ...|..F..V.&.G2&.W4á^..F..V..&.. 000080
01DD9A00 6A8476FF 8676FF26 4F685016 FA46801F A5F20008 890A8E1E F0880C7F ...Þ..Ö¿..·E..F².PhO&.v..v.j..Ï. 0000A0
0002049A 006A00AE 87FF2600 B0B7FF26 0A5EC402 79685016 8846800C C4830000 ...á..F..Phy.á^.&.ñ¯.&.ñÜ.j..... 0000C0
76FF9676 FF027F68 50168C46 8D0000FF FF9A146A 5016E446 8DFA76FF 0CC48300 ..á..v².Fõ.Pj.......F..Ph...v..v 0000E0
76FF076A 02046850 16984680 5016F846 8D009846 C60CC483 00000237 9A006A94 .j..7....á.6F...F½.P.F..Ph..j..v 000100
868918C4 830000FF FF9A006A 010487FF 26010687 FF260A5E C4271A68 8C76FF8E ..v.h.'á^.&.ñ..&.ñ..j.......á... 000120
16E4468D 006A5016 98468000 6A0030E9 FF7E868B 0007E903 7500FF7E 8E83FF7E ~../-..u.Õ....-.Õ0.j..F..Pj..Fõ. 000140
1CC48300 00FFFF9A 006A0676 FF0876FF 0A76FF0C 76FF0320 688876FF 8A76FF50 P.v..v.h ..v..v..v..v.j.......á. 000160
C8CBC95F 5E1F0000 E9000088 D88E00C4 881E5657 000000C8 CBC95F5E 1F0000E9 Õ...^_èùà...WV.¡á..Ä¡..Õ...^_èùà 000180
000000C8 CBC95F5E 1F0000E9 001C0508 56880646 88D88E02 90881E56 57000000 ...WV¯¡...Ä.F..V....Õ...^_èùä... 0001A0
1E565700 0000C8CB C95F5E1F 0000E900 02050856 88064688 D88E02A7 881E5657 WV.¡Ï..Ä.F..V....Õ...^_èùä...WV. 0001C0
56570000 00C8CBC9 5F5E1F00 00E90106 97882601 04878826 065EC4D8 8E02C488 ¡á..Äá^.&....&....Õ...ˣ_èùà...WV 0001E0

Dump of file SATURN:[PCCOMMON.DUMP.DLL]PDLDGM.TMP;1 on 18-APR-1990 10:48:18.73
File ID (766,30,0)   End of file block 195 / Allocated 196

Virtual block number 118 (00000076), 512 (0200) bytes

036A586A FFFF68FF FF68096A FFFF6803 1768346A FFFF6803 0F68D88E 02E1881E .¡Ä..Äh..h..j4h..h..j.h..h..j[j. 000000
C95F5E1F 0000E924 C4830000 FFFF9A00 6A086A01 6A08DC68 1E010868 078C681E .h¥.h...hÉ.j.j.j.......á$Õ...^_è 000020
03020002 00870003 00790203 00000007 03070002 028C0007 031A0005 000890C8 ù.........¥...........y......... 000040
01BE0203 02D90007 030A0005 00980003 00A70203 00170003 03320203 0000002B +.....2.......Ï...........\.../. 000060
00000000 029F0007 03120005 046700(6) 01EF0203 00370003 02790203 002A0003 ..*...y...7...ÿ...g............. 000080
FE578826 FC478826 0E5EC404 0E468300 00F246C7 D88EFFFF 881E5657 00000EC8 à...WV.¡...ÄúF·...F..á^.&.G=&.W± 0000A0
46880A5E C4FE5689 FC4689FE 578826FC 4788260E 5EC4040E 4683FA56 89F84689 .F½.V².F..á^.&.G=&.W±.F=.V±á^..F 0000C0
C4000000 BC87C726 019000BA 87C7260A 5EC40106 97892601 04878926 FE5688FC =.V±&....&....á^.&ú.¤...&ú.¥...á 0000E0
FFFF9A00 6A0A76FF 0C76FF50 16F4468D 000000C0 87C72600 9600BE87 C7260A5E ^.&ú./...&ú.â....F¶.P.v..v.j.... 000100
0C76FF08 A76837FF 260277FF 26F45EC4 0026E903 75F64608 F446880A C4830000 ...á..F¶.F-u.Õ&.á^¶&.w.&.7hÏ..v. 000120
C95F5E1F 0000E9F2 4688F246 8910C483 0000FFFF 9A006A06 76FF0876 FF0A76FF .v..v..v.j.......á..F·.F·Õ...^_è 000140
881E5657 00001EC8 CBC95F5E 1F0000E9 000088D8 8E000888 1E565700 0000C8CB ùà...WV.¡...Ä¡..Õ...^_èùà...WV¯¡ 000160
97882600 82878826 0A5EC4E4 5689E246 895C5788 265A4788 260A5EC4 D88E00C9 è..Äá^.&.GZ&.W\.Fã.VõZ^.&..ý.&.. 000180
8703260A 5EC40084 97882600 82878826 0A5EC428 57892626 4789260A 5EC40084 Ç.á^.&.G&&.W(á^.&..ý.&..Ç.á^.&.. 0001A0
C4008897 88260086 8788260A 5EC43057 89262E47 89260A5E C4008C97 1326008A ¤.&..¥.á^.&.G.&.W0á^.&..Ñ.&..¡.á 0001C0
26008E87 03260A5E C4008897 88260086 8788260A 5EC42C57 89262A47 89260A5E ^.&.G*&.W,á^.&..Ñ.&..¡.á^.&../.& 0001E0

Dump of file SATURN:[PCCOMMON.DUMP.DLL]PDLDGM.TMP;1 on 18-APR-1990 10:48:18.73
File ID (766,30,0)   End of file block 195 / Allocated 196

Virtual block number 119 (00000077), 512 (0200) bytes

F0880C7F 8D002605 0C56880A 46880A5E C4345789 26324789 260A5EC4 00C09713 ..à.á^.&.G2&.W4á^..F..V..&.....Þ 000000
C4830000 01899A00 6AE276FF E476FF26 4F685016 FE46801F A5F20008 890A8E1E ..Ö¿..·É..F±.PhO&.vÕ.vãj..¿....á 000020
0CC48300 00FFFF9A 006A00AE 87FF2600 B0B7FF26 0A5EC402 79685016 E646800C ..FÏ.Phy.á^.&.ñ¯.&.ñÜ.j........á. 000040
0C76FF03 2068E676 FFE876FF 5016EA46 8D0000FF FF9A146A 5016EA46 8DFE76FF .v±.Fõ.Pj.......Fõ.P.vÕ.vÏh ..v. 000060
57000000 C8CBC95F 5E1F0000 E914C483 0000FFFF 9A006A06 76FF0876 FF0A76FF .v..v..v.j.......á.Õ...^_èùà...W 000080
881E5657 000000C8 CBC95F5E 1F0000E9 001C0508 56880646 88088E00 E0881E56 V.¡Å..Ä.F..V....Õ...^_èùä...WV.¡ 0000A0
8E0220B8 1E565700 0000C8CB C95F5E1F 0000E900 02050856 88064688 D88E0203 ...Ä.F..V....Õ...^_èùä...WV.¡ .. 0000C0
0230881E 56570000 00C8CBC9 5F5E1F00 00E90106 97882601 04878826 065EC4D8 Äá^.&....&....Õ...ˣ_èùà...WV.¡=. 0000E0
08E0681E 036A5A6A FFFF68FF FF68096A FFFF6802 7368516A FFFF6802 6868D88E .Ähk.h..jQhs.h..j.h..h..jZj..hÄ. 000100
000890C8 C95F5E1F 0000E924 C4830000 FFFF9A00 6A196A01 6A096A68 1E010868 h...hj.j.j.j.......á$Õ...^_èù... 000120
0000002B 025E0002 00000008 02630002 00870003 007E0203 02180008 02760005 ..v......¯.......c.......ˣ.+... 000140
002A0003 019A0203 02350008 02660005 00980003 00AC0203 00170003 028E0203 ..........¯.......f...5.......*. 000160
00000000 00000000 01F80008 026E0005 04670000 01C80203 00370003 01EC0203 ..§...7...ù...g...n...«......... 000180
5689F446 89FE5788 26FC4788 260E5EC4 040E4683 D88EFFFF 881E5657 00000EC8 à...WV.¡...Ä.F..á^.&.G=&.W±.F¶.V 0001A0
26FE5688 FC46880A 5EC4FE56 89FC4689 FE578826 FC478826 0E5EC404 0E4683F6 -.F..á^.&.G=&.W±.F=.V±á^..F=.V±& 0001C0
87C7260A 5EC40000 008C87C7 26019000 8A87C726 0A5EC401 06978926 01048789 ....&....á^.&ú.¤...&ú.¥...á^.&ú. 0001E0

Dump of file SATURN:[PCCOMMON.DUMP.DLL]PDLDGM.TMP;1 on 18-APR-1990 10:48:18.73
```

File ID (766,30,0)   End of file block 195 / Allocated 196

Virtual block number 120 (00000078), 512 (0200) bytes

```
0AC48300 00FFFF9A 006A0A76 FF0C76FF 5016F846 80000000 C087C726 0096008E f...&ú.â....F½.P.v..v.j.......á. 000000
76FF0A76 FF0C76FF 08A76837 FF260277 FF26F85E C40026E9 0375FA46 08F84688 .F½.F*u.Õ&.á^½&.w.&.7hÏ..v..v..v 000020
000086C8 CBC95F5E 1F0000E9 F2468BF2 468910C4 830000FF FF9A006A 0676FF08 ..v.j.......á..F·.F·Õ...^_èùà... 000040
AE878826 0A5EC486 56898446 895C5788 265A4788 260A5EC4 D88E0008 881E5657 WV.¡_..Äá^.&.GZ&.W\.F..V.ã^.&..Û 000060
46890084 97882600 82878826 0A5EC400 4CE446C7 96568994 46890080 97882600 .&..¯..F..V.úFÕL.á^.&..ý.&..Ç..F 000080
BA878826 0A5EC4FF 7C9689FF 7A868900 88978826 00868788 260A5EC4 82568980 ..V.á^.&..Ñ.&..¡...z...|.á^.&..¤ 0000A0
C4925689 90468900 C0978826 008E8788 260A5EC4 FE5689FC 4689008C 97882600 .&..¥..F•.V±á^.&../.&..â..F..V.á 0000C0
26FE5613 FC460382 56888046 880A5EC4 28578926 26478926 82568880 46880A5E ^..F..V.&.G&&.W(á^..F..V..F•.V±& 0000E0
7A8688 0A 5EC42C57 89262A47 8926FF7C 9688FF7A 86880A5E C4305789 262E4789 .G.&.WOá^...z...|.&.G*&.W,á^...z 000100
80002605 0C5688 0A 46880A5E C4345789 26324789 26925613 904603FF 7C9688FF ...|..F..V.&.GZ&.W4á^..F..V..&.. 000120
01DD9A00 6A8476FF 8676FF26 4F685016 FA4680 1F A5F20008 B9DA8E1E F0880C7F ...Þ..Õ¿..·E..F*.PhO&.v..v.j..Ï. 000140
0002049A 006A00AE 87FF2600 8087FF26 0A5EC402 79685016 88468 00C C4830000 ...á..F..Phy.á^.&.ñ¯.&.ñÜ.j..... 000160
76FF9676 FF027F68 50168C46 800000FF FF9A146A 5016E646 80FA76FF 0CC48300 ..á..v*.F|.Pj.......F..Ph...v..v 000180
76FF076A 02046850 169846 8D 5016E446 80009846 C60CC483 00000237 9A006A94 .j..7....á.óF...FÕ.P.F..Ph..j..v 0001A0
868918C4 830000FF FF9A006A 010487FF 26010687 FF260A5E C4271A68 8C76FF8E ..v.h.'á^.&.ñ..&.ñ..j.......á... 0001C0
16E6468D 006A5016 98468D00 6A0030E9 FF7E8688 0007E903 7500FF7E BE83FF7E ~../~..u.Õ....~.ÕO.j..F..Pj..F|. 0001E0
```

Dump of file SATURN:[PCCOMMON.DUMP.DLL]PDLDGM.TMP;1 on 18-APR-1990 10:48:18.73
File ID (766,30,0)   End of file block 195 / Allocated 196

Virtual block number 121 (00000079), 512 (0200) bytes

```
1CC48300 00FFFF9A 006A0676 FF0876FF 0A76FF0C 76FF0320 688876FF 8A76FF50 P.v..v.h ..v..v..v..v.j.......á. 000000
C8CBC95F 5E1F0000 E90000B8 D88E00C4 B81E5657 000000C8 C8C95F5E 1F0000E9 Õ...^_èùà...WV.¡á..Ä¡..Õ...^_èùà 000020
000000C8 CBC95F5E 1F0000E9 001C0508 56880646 8BD88E02 90881E56 57000000 ...WV.¡...Ä.F..V....Õ...^_èùã... 000040
0000C8CB C95F5E1F 0000E901 06978826 0104878B 26065EC4 D88E02A7 B81E5657 WV.¡Ï..Äá^.&....&....Õ...*_èùà.. 000060
56570000 00C8CBC9 5F5E1F00 00E90002 0508568B 06468 8D8 8E02C4B8 1E565700 .WV.¡á..Ä.F..V....Õ...^_èùã...WV 000080
036A586A FFFF68FF FF68096A FFFF6803 1768336A FFFF6803 0F68D88E 02E5881E .¡Ï..Äh..h..j3h..h..j.h¯.h..j[j. 0000A0
C95F5E1F 0000E924 C4830000 FFFF9A00 6A0C6A01 6A0A8E68 1E010868 096E681E .hn.h...h..j.j.j.......á$Õ...^_è 0000C0
03320203 0000002B 03020002 00000009 03070002 00870003 00790203 000B90C8 ù.....y...................+.....Ž. 0000E0
02790203 002A0003 01BE0203 029F0009 03120005 00980003 00A70203 00170003 ......Ï................ƒ...*...y. 000100
00000000 02D00009 031A0005 028C0009 030A0005 04670000 01EF0203 00370003 ..7...ÿ...g.......¥.......Ï..... 000120
5689F846 89FE5788 26FC4788 260E5EC4 040E4683 D88EFFFF B81E5657 00000EC8 à...WV.¡...Ä.F..á^.&.G=&.W±.F½.V 000140
26FE5688 FC46880A 5EC4FE56 89FC4689 FE578826 FC478826 0E5EC404 0E4683FA *.F..á^.&.G•&.W±.F•.V±á^..F•.V±& 000160
87C7260A 5EC40000 008C87C7 26019000 BA87C726 0A5EC401 06978926 01048789 ....&....á^.&ú.¤...&ú.¥...á^.&ú. 000180
0AC48300 00FFFF9A 006A0A76 FF0C76FF 5016F446 80000000 C087C726 0096008E /...&ú.â....F¶.P.v..v.j.......á. 0001A0
76FF0A76 FF0C76FF 08A76837 FF260277 FF26F45E C40026E9 0375F646 08F44688 .F¶.F~u.Õ&.á^¶&.w.&.7hÏ..v..v..v 0001C0
000076C8 CBC95F5E 1F0000E9 F2468BF2 468910C4 830000FF FF9A006A 0676FF08 ..v.j.......á..F·.F·Õ...^_èùàv.. 0001E0
```

Dump of file SATURN:[PCCOMMON.DUMP.DLL]PDLDGM.TMP;1 on 18-APR-1990 10:48:18.73
File ID (766,30,0)   End of file block 195 / Allocated 196

Virtual block number 122 (0000007A), 512 (0200) bytes

```
AE878826 0A5EC48E 56898C46 895C5788 265A4788 260A5EC4 D88E0008 881E5657 WV.¡_..Äá^.&.GZ&.W\.F..V.á^.&..Û 000000
5EC40084 97882600 82878826 0A5EC400 4CE846C7 9A568998 46890080 97882600 .&..¯..F..V.úFÒL.á^.&..ý.&..Ç.á^ 000020
1326008A 8703260A 5EC40084 97882600 82878826 0A5EC428 57892626 4789260A .&.G&&.W(á^.&..ÿ.&..Ç.á^.&..¤.&. 000040
89260A5E C4008897 88260086 8788260A 5EC43057 89262E47 89260A5E C4008C97 .¥.á^.&.G.&.WOá^.&..Ñ.&..|.á^.&. 000060
00C09713 26008E87 03260A5E C4008897 88260086 8788260A 5EC42C57 89262A47 G*&.W,á^.&..Ñ.&..|.á^.&../.&..â. 000080
B9DA8E1E F0880C7F 80002605 0C56880A 46880A5E C4345789 26324789 260A5EC4 á^.&.GZ&.W4á^..F..V..&.....Þ..Õ¿ 0000A0
9046800C C4830000 01859A00 6A8C76FF 8E76FF26 4F685016 FE468D1F A5F20008 ..·E..F±.PhO&.v..v.j..ç....á..F. 0000C0
8DFE76FF 0CC48300 0001DC9A 006A00AE 87FF2600 8087FF26 0A5EC402 79685016 .Phy.á^.&.ñ¯.&.ñÜ.j..É....á..v±. 0000E0
0000020F 9A006A98 76FF9A76 FF027F68 50169446 800000FF FF9A146A 5016EA46 Fõ.Pj.......F..Ph...v..v.j...... 000100
C4271A68 9476FF96 76FF106A 02046850 169C468D 5016E846 80009C46 C60CC483 .á.óF...FÒ.P.F..Ph..j..v..v.h.'á 000120
E9037500 8A7E838A 468918C4 830000FF FF9A006A 010487FF 26010687 FF260A5E ^.&.ñ..&.ñ..j.......á..F..~..u.Õ 000140
FF032068 9076FF92 76FF5016 EA468D00 6A50169C 4680006A 0030E98A 46880006 ...F.ÕO.j..F..Pj..Fõ.P.v..v.h .. 000160
0000C8CB C95F5E1F 0000E91C C4830000 FFFF9A00 6A0676FF 0876FF0A 76FF0C76 v..v..v..v.j.......á.Õ...^_èùà.. 000180
D88E0265 881E5657 000000C8 CBC95F5E 1F0000E9 0000B8D8 8E00C4B8 1E565700 .WV.¡á..Ä¡..Õ...^_èùà...WV.¡e..Ä 0001A0
065EC4D8 8E027CB8 1E565700 0000C8CB C95F5E1F 0000E900 1C050856 8B06468B .F..V....Õ...^_èùã...WV.¡|..Äá^. 0001C0
46880D8E 0299881E 56570000 00C8CBC9 5F5E1F00 00E90106 97882601 04878826 &....&....Õ...*_èùà...WV.¡...Ä.F 0001E0
```

Dump of file SATURN:[PCCOMMON.DUMP.DLL]PDLDGM.TMP;1 on 18-APR-1990 10:48:18.73

```
File ID (766,30,0)   End of file block 195 / Allocated 196

Virtual block number 123 (0000007B), 512 (0200) bytes

 FF6802E4 68D88E02 8A881E56 57000000 C8C8C95F 5E1F0000 E9000205 08568806 ..V....Õ...^_èùà...WV.¡¤..Àhõ.h. 000000
 0882681E 0108680A 92681E03 6A5B6AFF FF68FFFF 68096AFF FF6802EC 68416AFF .jAhš.h..j.h¯.h..j[j..h..h...hý. 000020
 00870003 00790203 0008C8C9 5F5E1F00 00E924C4 830000FF FF9A006A 1C6A016A j.j.j.......á$Õ...^_èù....y..... 000040
 00980003 00A70203 00170003 03070203 00000028 02D70002 0000000A 02DC0002 ..Ê.......■.+..............Ì..... 000060
 04670000 01C70203 00370003 024E0203 002A0003 01960203 0274000A 02E70005 ..Ô...t.......*...N...7...ú...g. 000080
 040E4683 D88EFFFF 881E5657 00000EC8 02B2000A 02EF0005 0291000A 02DF0005 ..Ô.......ÿ...ÿ.à...WV.¡...Ä.F.. 0000A0
 FE578826 FC478826 0E5EC404 0E4683F6 5689F446 89FE5788 26FC4788 260E5EC4 á^.&.G•&.W±.F¶.V-.F..á^.&.G•&.W± 0000C0
 D487C726 0A5EC401 20978926 011E8789 26FE568B FC46880A 5EC4FE56 89FC4689 .F•.V±á^..F•.V±&....&.. .á^.&ú.å 0000E0
 5016F846 8D000000 DA87C726 00960008 87C7260A 5EC40000 000687C7 26019000 ...&ú.ø...á^.&ú.Ä...&ú.Õ....F½.P 000100
 FF26F85E C40026E9 0375FA46 0BF8468B 0AC48300 00FFFF9A 006A0A76 FF0C76FF .v..v.j.......á..F½.F¹u.Õ&.á^½&. 000120
 468910C4 830000FF FF9A006A 0676FF08 76FF0A76 FF0C76FF 08A76837 FF260277 w.&.7hÌ..v..v..v..v.j.......á..F 000140
 26744788 260A5EC4 D88E0008 881E5657 00008AC8 C8C95F5E 1F0000E9 F2468BF2 ·.F·Õ...^_èùà...WV.¡...Äá^.&.Gt& 000160
 4CE046C7 92568990 468900CA 97882600 C8878826 0A5EC482 56898046 89765788 .Wv.F..V.ã^.&..à.&..ò..F..V.úFÁL 000180
 C4FF7E96 89FF7C86 8900CE97 882600CC 8788260A 5EC4F846 89FA4689 00008800 .¡...F¹.F½á^.&..ä.&..ö...|...-.á 0001A0
 06978826 00D4878B 260A5EC4 FF789689 FF768689 00D2978B 2600D087 88260A5E ^.&..Å.&..Ø...v...x.á^.&..å.&..ø 0001C0
 7C86880A 5EC48E56 898C4689 00DA978B 26000887 88260A5E C4FE5689 FC468900 ..F•.V±á^.&..Ä.&..Ö..F..V.á^...| 0001E0

Dump of file SATURN:[PCCOMMON.DUMP.DLL]PDLDGM.TMP;1 on 18-APR-1990 10:48:18.73
File ID (766,30,0)   End of file block 195 / Allocated 196

Virtual block number 124 (0000007C), 512 (0200) bytes

 8926FE56 13FC4603 FF7E968B FF7C868B 0A5EC442 57892640 478926FF 7E968BFF ...-.&.Gə&.WBá^...|...-..F•.V±&. 000000
 FF76868B 0A5EC446 57892644 478926FF 789688FF 7686880A 5EC44A57 89264847 GH&.WJá^...v...x.&.GD&.WFá^...v. 000020
 7F8D0040 050C568B 0A46880A 5EC44E57 89264C47 89268E56 138C4603 FF78968B ..x..F..V.&.GL&.WNá^..F..V..ə... 000040
 0A8E1EF0 88267F8D 0040050C 56880A46 880A5EC4 1FA5F200 0889DA8E 1EF0880C ..Þ..Ö¿...Ê.á^..F..V..ə...&.Þ..Ö 000060
 46800CC4 83000001 FF9A006A 9076FF92 76FF0279 68501684 468D1FA5 F2000889 ¿...Ê..F..Phy..v..v.j.......á..F 000080
 5EC40279 68501684 468D0CC4 83000002 1E9A006A 8076FF82 76FF264F 685016F6 -.PhO&.v..v.j.......á..F..Phy.á^ 0000A0
 9276FF02 7F685016 88468D0C C4830000 02369A00 6A00C8B7 FF2600CA B7FF260A .&.ñò.&.ñà.j..6....á..F..Ph...v. 0000C0
 0876FF27 14688876 FF8A76FF 0E6A5016 F8468D0C C4830000 02569A00 6A9076FF .v.j..V....á..F½.Pj..v..v.h.'.v. 0000E0
 96E90375 60470826 5E478826 0A5EC400 9446C612 C4830000 02859A00 6A0676FF .v.j..ç....á.6F..á^.&.G^&.G'u.Õ. 000100
 E0468D08 C4830323 00009A50 16E2468D 0886681E 008BE903 75FA460B F8468B00 ..F½.F¹u.Õ...hÑ..Fã.P...#..á..FÁ 000120
 87FF2601 2087FF26 0A5EC427 1A688876 FF8A76FF 0E6A0204 68501694 468D5016 .P.F..Ph..j..v..v.h.'á^.&.ñ .&.ñ 000140
 F8E9FF7A 868B0007 E9037500 FF7A8E83 FF7A8689 18C48300 0003409A 006A011E ..j..ə....á...z../z..u.Õ....z.Õ½ 000160
 0A76FF0C 76FF5B6A 03206884 76FF8676 FF5016E2 468D006A 50169446 8D006A00 .j..F..Pj..Fã.P.v..v.h .j[.v..v. 000180
 08265E47 88260A5E C40093E9 FF7A8689 1EC48300 00038F9A 006A0676 FF0876FF .v..v.j.......á...z.Õ..á^.&.G^&. 0001A0
 68066A50 1680468D 08C48303 6800009A 5016E246 8008B068 1E0048E9 03756047 G'u.ÕH..h§..Fã.P...k..á..F..Pj.h 0001C0
 FF8276FF 265A6800 6A0EC483 00000355 9A006A5A 77FF265C 77FF260A 5EC408A6 Ì.á^.&.w\&.wZj..U....á.j.hZ&.v.. 0001E0

Dump of file SATURN:[PCCOMMON.DUMP.DLL]PDLDGM.TMP;1 on 18-APR-1990 10:48:18.73
File ID (766,30,0)   End of file block 195 / Allocated 196

Virtual block number 125 (0000007D), 512 (0200) bytes

 08C483FF FF00009A 5016E246 8D0BC268 1E0011E9 0AC48300 00FFFF9A 006A8076 v.j.......á.Õ...hô..Fã.P......á. 000000
 8F9A006A 0676FF08 76FF0A76 FF0C76FF 5A6A0320 688476FF 8676FF50 16E2468D .Fã.P.v..v.h .jZ.v..v..v..v.j..¢ 000020
 096A0320 68001EE9 FF7A868B 0007E903 7500FF7A BE83FF7A 868916C4 83000003 ....á...z../z..u.Õ....z.Õ..h .j. 000040
 12C8CBC9 5F5E1F00 00E90EC4 830000FF FF9A006A 0676FF08 76FF0A76 FF0C76FF .v..v..v..v.j.......á.Õ...^_èùà. 000060
 0E4683F4 5689F246 8900CA97 882600C8 8788260A 5EC4D88E 00C4881E 56570000 ..WV.¡á..Äá^.&..à.&..ò..F·.V̄¶.F. 000080
 5016EE46 8DFC4689 FE468900 0088FA56 89F84689 FE578826 FC478826 0E5EC404 .á^.&.G•&.W±.F½.V¹¡...F±.F•.FŸ.P 0000A0
 76FFFA76 FF264968 5016F646 800CC483 00000434 9A006AF2 76FFF476 FF027F68 h...v¶.v·j..4....á..F-.PhI&.v¹.v 0000C0
 18E90375 60470826 5E478826 0A5EC400 D7E9F646 880CC483 0000045F 9A006AF8 ½j.._....á..F-Õ■.á^.&.G^&.G'u.Õ. 0000E0
 265C6800 6A006A00 17E90AC4 83000004 799A006A F876FFFA 76FF265C 68126A00 .j.h\&.v¹.v½j..y....á.Õ..j.j.h\& 000100
 F076FF0E 6A5016FC 468D00A5 E90000B8 0CC48300 0004A69A 006AF876 FFFA76FF .v¹.v½j..Ì....á.j..ÕE..F•.Pj..vÞ 000120
 FC468B12 C4830000 04C69A00 6A011EB7 FF260120 B7FF260A 5EC42714 68EE76FF .vŸh.'á^.&.ñ .&.ñ..j..6....á..F• 000140
 003FE90A C4830000 04EF9A00 6AF876FF FA76FF26 5C68126A 0018E903 75FE460B .F±u.Õ..j.h\&.v¹.v½j..ÿ....á.Õ?. 000160
 089A006A F876FFFA 76FF265C 68009568 0019E903 7560470B 265E478B 260A5EC4 á^.&.G^&.G'u.Õ..h..h\&.v¹.v½j... 000180
 880AC483 000001E7 9A006AF8 76FFFA76 FF265C68 00976800 16E90AC4 83000005 ....á.Õ..h..h\&.v¹.v½j..Ô....á.¡ 0001A0
 C8C95F5E 1F0000E9 FF5EE903 7500083D FF21E903 7500043D 0013E900 16E90000 ..Õ..Õ..=..u.Õ!.=..u.Õ^.Õ...^_èù 0001C0
 0000C8CB C95F5E1F 0000E900 36050856 88064688 D88E03D6 881E5657 000000C8 à...WV.¡ø..Ä.F..V..6.Õ...^_èùã.. 0001E0

Dump of file SATURN:[PCCOMMON.DUMP.DLL]PDLDGM.TMP;1 on 18-APR-1990 10:48:18.73
```

File ID (766,30,0)    End of file block 195 / Allocated 196

Virtual block number 126 (0000007E), 512 (0200) bytes

```
56570000 00C8CBC9 5F5E1F00 00E90002 05085688 06468808 8E0538B8 1E565700 .WV.¡8..Ä.F..V....Õ...^_èùà...WV 000000
72881E56 57000000 C8CBC95F 5E1F0000 E9001C05 08568806 46880D8E 0555881E .¡U..Ä.F..V....Õ...^_èùã...WV.¡r 000020
B81E5657 000000C8 CBC95F5E 1F0000E9 01209788 26011E87 8826065E C4088E05 ..Äá^.&....&.. .Õ...^_èùà...WV.¡ 000040
68FFFF68 5A6AFFFF 6805CD68 096AFFFF 6805C568 406AFFFF 68058068 D88E058F ...Ah§.h..jÞhé.h..j.hē.h..jZh..h 000060
E92AC483 0000FFFF 9A006A1B 6A016A0C B2681E01 22680BC8 681E046A 5B6AFFFF ..j(j..hà.h"..hý.j.j.j.......é*Õ 000080
002A0288 00020087 00030079 02030530 000805C0 0005000C 90C8C95F 5E1F0000 ...^_èù.....à...0...y.........*. 0000A0
000305E8 0203054D 000805D0 00050000 00080585 00020000 002805B0 00020000 ....¯.+.....ç........Å...M...Õ... 0000C0
000302F9 0203056A 000805C8 0005002A 0003041C 0203009B 000300A7 02030017 ....Ī..........*...à...j...*... 0000E0
040E4683 D88EFFFF B81E5657 00000EC8 00000000 00000587 00080588 0005004A J...¡...........à...WV.¡...Ä.F... 000100
FE578826 FC478826 0E5EC404 0E4683FA 5689F846 89FE5788 26FC4788 260E5EC4 á^.&.G=&.W±.F½.V°.F..á^.&.G=&.W± 000120
8A87C726 0A5EC401 06978926 01048789 26FE5688 FC46880A 5EC4FE56 89FC4689 .F=.V±á^..F=.V±&....&.....á^.&ú.α 000140
5016F246 8D000000 C087C726 0096008E 87C7260A 5EC40000 008C87C7 26019000 ...&ú.¥...á^.&ú./...&ú.à....F¨.P 000160
FF26F25E C40026E9 0375F446 08F24688 0AC48300 00FFFF9A 006A0A76 FF0C76FF .v..v..j.......á..F¨.F¶u.Õ&.á^.&. 000180
468910C4 830000FF FF9A006A 0676FF08 76FF0A76 FF0C76FF 08A76837 FF260277 w.&.7hĪ..v..v..v..v.j........á..F 0001A0
265A4788 260A5EC4 D88E0008 881E5657 000076C8 CBC95F5E 1F0000E9 F6468BF6 -.F-Õ...^_èùàv..WV.¡_..Äá^.&.GZ& 0001C0
4CE846C7 9A568998 46890080 97882600 AE878826 0A5EC48E 56898C46 895C5788 .W\.F..V.Õ^.&..Ù.&..¯..F..V.úFÖL 0001E0
```

Dump of file SATURN:[PCCOMMON.DUMP.DLL]PDLDGM.TMP;1 on 18-APR-1990 10:48:18.73
File ID (766,30,0)    End of file block 195 / Allocated 196

Virtual block number 127 (0000007F), 512 (0200) bytes

```
82878826 0A5EC428 57892626 4789260A 5EC40084 97882600 82878826 0A5EC400 .á^.&..ý.&..Ç.á^.&.G&&.W(á^.&..ý 000000
5EC43057 89262E47 89260A5E C4008C97 1326008A 8703260A 5EC40084 97882600 .&..Ç.á^.&..¤.&..¥.á^.&.G.&.W0á^ 000020
88260086 8788260A 5EC42C57 89262A47 89260A5E C4008897 88260086 8788260A .&..Ñ.&..¡.á^.&.G*&.W,á^.&..Ñ.&. 000040
46880A5E C4345789 26324789 260A5EC4 00C09713 26008E87 03260A5E C4008897 .¡.á^.&../.&..à.á^.&.G2&.W4á^..F 000060
8E76FF26 4F685016 FE4680 1F A5F20008 890A8E1E F0880C7F 80002605 0C5688 0A ..V..&......Þ..Õ¿..É..F±.PhO&.v. 000080
B7FF2600 8087FF26 0A5EC402 79685016 9046800C C4830000 01859A00 6A8C76FF .v.j..ç.....á..F..Phy.á^.&.ñ¯.&.ñ 0000A0
50169446 8D0000FF FF9A146A 5016EA46 8DFE76FF 0CC48300 0001DC9A 006A00AE Û.j..É.....á..v±.Fõ.Pj........F..P 0000C0
169C4680 5016E846 8D009C46 C60CC483 0000020F 9A006A98 76FF9A76 FF027F68 h....v..v.j.......á.6F...FÕ.P.F.. 0000E0
FF9A006A 0104B7FF 26010687 FF260A5E C4271A68 9476FF96 76FF0E6A 02046850 Ph..j..v..v.h.'á^.&.ñ..&.ñ..j.... 000100
6A50169C 468D006A 0030E98A 468B0006 E9037500 8A7E838A 468918C4 830000FF ....á..F..~..u.Õ....F.Õ0.¡ .F..Pj 000120
FFFF9A00 6A0676FF 0876FF0A 76FF0C76 FF032068 9076FF92 76FF5016 EA468D00 ..FÕ.P.v..v.h ..v..v..v..v.:..... 000140
0E5EC404 0E468308 8E00C488 1E565700 001CC8CB C95F5E1F 0000E91C C4830000 ...á.Õ...^_èùà...WV.¡á..Ä.F..á^. 000160
5689E846 89008097 8B2600AE 878B260A 5EC4F656 89F44689 FE578B26 FC478826 &.G=&.W±.F¶.V-á^.&..Ù.&..¯...FÕ.V 000180
76FFEA76 FF027F68 5016E446 8DFC4689 FE468900 008BEC46 89EE4689 0000B8EA õ¡...FŸ.F§¡...F±.F=.FÕ.Ph...võ.v 0001A0
00000307 9A006AF4 76FF F676 FF264968 5016F246 8D0CC483 000002CC 9A006AE8 Õj..à.....á..F¨.Ph1&.v-.v¶j...... 0001C0
46800000 FFFF9A50 16F84680 4C77FF26 4E77FF26 0A5EC400 EAE9F246 8B0CC483 .á..F·Õõ.á^.&.wN&.wL.F½.P......F 0001E0
```

Dump of file SATURN:[PCCOMMON.DUMP.DLL]PDLDGM.TMP;1 on 18-APR-1990 10:48:18.73
File ID (766,30,0)    End of file block 195 / Allocated 196

Virtual block number 128 (00000080), 512 (0200) bytes

```
468D12C4 83000003 1F9A006A F876FFFA 76FF2714 68E476FF E676FF0E 6A5016FC •.Pj..v].võh.'.v°.v½j.......á..F 000000
08E90374 FE460BFC 46880CC4 83000003 489A006A F876FFFA 76FF08D2 685016EC §.Ph●..v°.v½j..K.....á..F=.F±t.Õ. 000020
83000003 659A006A F476FFF6 76FF265C 68009668 0019E903 74EE4608 EC4688 00 ..F§.FŸt.Õ..h..h\&.v-.v¶j..e.... 000040
E90000B8 0CC48300 0003AD9A 006AF476 FFF676FF 265C6800 6A006A00 17E90AC4 á.Õ..j.j.h\&.v-.v¶j..Ù....á.¡..Õ 000060
0009E903 7500F07E 830000FF FF9A5016 F046804C 77FF264E 77FF260A 5EC40064 d.á^.&.wN&.wL.FÞ.P.......~Þ.u.Õ.. 000080
0001969A 006AF476 FFF676FF 265C6850 5200008A 00008800 06E90000 8A028388 ¡..¤..Õ..¡..¤..RPh\&.v-.v¶j..... 0000A0
03750006 30FFA7E9 03750001 300013E9 0016E900 0088001C E90000B8 0CC48300 ..á.¡..Õ..¡..Õ..Õ..=..u.ÕĪ.=..u. 0000C0
001C0508 568B0646 8BD88E02 658B1E56 57000000 C8CBC95F 5E1FFFE4 E9FF06E9 Õ..Õõ..^_èùà...WV.¡e..Ä.F..V.... 0000E0
06978826 01048788 26065EC4 D88E03E3 881E5657 000000C8 CBC95F5E 1F0000E9 Õ...^_èùã...WV.¡Õ..Äá^.&.....&... 000100
00E90002 05085688 06468808 8E040088 1E565700 0000C8CB C95F5E1F 0000E901 .Õ...^_èùà...WV.¡....Ä.F..V....Õ. 000120
FFFF6804 53683F6A FFFF6804 4868088E 0421881E 56570000 00C8CBC9 5F5E1F00 ..^_èùã...WV.¡|..ÃhK.h..j?hS.h.. 000140
FFFF9A00 6A1A6A01 6A0DA068 1E010868 0C86681E 036A586A FFFF68FF FF68096A j.h¯.h..j[j..hÑ.h...h..j.j.j.... 000160
00870003 00790203 0419000C 04560005 000D90CB C95F5E1F 0000E924 C4830000 ...á$Õ...^_èù.......V.......y.... 000180
0000000C 04430002 00170003 046E0203 0000002B 043E0002 036B0008 02EA0203 ..Õ...k....>.+......n.........C.. 0001A0
04670000 01C70203 00370003 024E0203 002A0003 02840203 00980003 00A70203 ..Ī.......Ç...*...N...7...ú...g. 0001C0
00000000 00000000 03F8000C 04460005 030B000C 044E0005 03930008 03830203 ..........N...Ù...F...½......... 0001E0
```

Dump of file SATURN:[PCCOMMON.DUMP.DLL]PDLDGM.TMP;1 on 18-APR-1990 10:48:18.73

```
File ID (766,30,0)   End of file block 195 / Allocated 196

Virtual block number 129 (00000081), 512 (0200) bytes

 5689F846 89FE578B 26FC478B 260E5EC4 040E4683 D88EFFFF 881E5657 00000EC8 à...WV.¡...Ä.F..á^.&.G•&.W .F½.V 000000
 26FE568B FC46880A 5EC4FE56 89FC4689 FE578B26 FC478B26 0E5EC404 0E4683FA '.F..á^.&.G•&.W±.F•.V±á^...  .V±& 000020
 87C7260A 5EC40000 008C87C7 26019000 BA87C726 0A5EC401 06978926 01048789 ....&....á^.&ú.¤...&ú.¥...á  ²ú. 000040
 0AC48300 00FFFF9A 006A0A76 FF0C76FF 5016F246 8D000000 C087C726 012C008E ƒ.,.&ú.å....F·.P.v..v.j.......á. 000060
 76FF0A76 FF0C76FF 08A76837 FF260277 FF26F25E C40026E9 0375F446 08F2468B .F·.F¶u.Õ&.á^·&.w.&.7hÎ..v..v..v 000080
 0000C6C8 CBC95F5E 1F0000E9 F64688F6 468910C4 830000FF FF9A006A 0676FF08 ..v.j.......á..F-.F-Õ...^_èùàö.. 0000A0
 8B260A5E C4FF3E96 89FF3C86 895C578B 265A478B 260A5EC4 D88E0008 881E5657 WV.¡...Äá^.&.GZ&.W\..<...>.á^.&. 0000C0
 448689FF 46868900 00880000 FF3A86C7 FF4A9689 FF488689 0080978B 2600AE87 .Û.&..¯...H...J.ú.:...¡....F...D 0000E0
 89262647 89260A5E C4008497 8B26008B 878B260A 5EC4E446 89E64689 0000B8FF .¡...FÌ.Fõá^.&..ý.&..Ç.á^.&.G&&. 000100
 260A5EC4 008C9713 2600BA87 03260A5E C4008497 8B26008B 878B260A 5EC42857 W(á^.&..ý.&..Ç.á^.&..¤.&..¥.á^.& 000120
 C42C5789 262A4789 260A5EC4 0088978B 26008687 8B260A5E C4305789 262E4789 .G.&.WOá^.&..Ñ.&..¡.á^.&.G*&.W,á 000140
 32478926 0A5EC400 C0971326 008E8703 260A5EC4 0088978B 26008687 8B260A5E ^.&..Ñ.&..¡.á^.&..ƒ.&..å.á^.&.G2 000160
 468D1FA5 F20008B9 DA8E1EF0 880C7F8D 0026050C 56880A46 880A5EC4 34578926 &.W4á^..F..V..&.....Þ..Õ¿..·Ê..F 000180
 79685016 FF40868D 0CC48300 0001D19A 006AFF3C B6FFFF3E B6FF264F 685016FE ±.PhO&.Ñ>..Ñ<.j..Ì....á...ª..Phy 0001A0
 5016EA46 8DFE76FF 0CC48300 0001FB9A 006A00AE B7FF2600 8087FF26 0A5EC402 .á^.&.ñ¯.&.ñÛ.j..«....á..v±.Fõ.P 0001C0
 83000002 2D9A006A FF4886FF FF4AB6FF 027F6850 16FF4486 8D0000FF FF9A146A j........D..Ph...ÑJ..ÑH.j..-.... 0001E0

Dump of file SATURN:[PCCOMMON.DUMP.DLL]PDLDGM.TMP;1 on 18-APR-1990 10:48:18.73
File ID (766,30,0)   End of file block 195 / Allocated 196

Virtual block number 130 (00000082), 512 (0200) bytes

 0A5EC427 1468FF44 B6FFFF46 B6FF1C6A 5016E446 8D004CE8 46C70098 46C60CC4 á.6F..úFÒL..Fõ.Pj..ÑF..ÑD.h.'á^. 000000
 E9037500 FF3ABE83 FF3A8689 12C48300 0002729A 006A0104 B7FF2601 0687FF26 &.ñ..&.ñ..j..r....á...:../:..u.Õ 000020
 B6FF5016 98468D50 16E8468D 002CE903 75E6460B E4468B01 8CE9FF3A 86880007 ....:.Õ...Fõ.Fìu.Õ...FÒ.P.F..P.Ñ 000040
 0077E9FF 3A868914 C4830000 02A29A00 6AE476FF E676FF27 2668FF44 B6FFFF46 F..ÑD.h&'.vÌ.võj..Å....á...:.Õw. 000060
 6A0104B7 FF260106 B7FF260A 5EC42714 68FF44B6 FFFF46B6 FF0E6A50 16E4468D .Fõ.Pj..ÑF..ÑD.h.'á^.&.ñ..&.ñ..j 000080
 46880117 E9FF3A86 880007E9 037500FF 3ABE83FF 3A868912 C4830000 02EC9A00 ..š....á...:../:..u.Õ....:.Õ...F 0000A0
 FF44B6FF FF46B6FF 006A0204 68501698 46805016 E8468000 2EE90375 E64608E4 õ.Fìu.Õ...FÒ.P.F..Ph..j..ÑF..ÑD. 0000C0
 07E90375 00FF3ABE 83FF3A86 8918C483 00000334 9A006AE4 76FFE676 FF271A68 h.'.vÌ.võj..4....á...:../:..u.Õ. 0000E0
 4486FFFF 4686FF19 6A5016E4 4680004C E846C700 FF4C86C6 00CDE9FF 3A868800 ...:.Õë.Ó.L..úFÒL..Fõ.Pj..ÑF..ÑD 000100
 83FF3A86 8912C483 0000037F 9A006A01 0487FF26 010687FF 260A5EC4 271468FF .h.'á^.&.ñ..&.ñ..j.......á...:.. 000120
 5016E846 8D002FE9 0375E646 0BE4468B 0085E9FF 3A868800 07E90375 00FF3ABE ƒ:..u.Õ....:.Õ...Fõ.Fìu.Õ/..FÒ.P 000140
 FF9A006A E476FFE6 76FF271A 68FF44B6 FFFF46B6 FF006A02 04685016 FF4C868D ..L..Ph..j..ÑF..ÑD.h.'.vÌ.võj... 000160
 4C868D00 6A003AE9 FF3A868B 0007E903 7500FF3A BE83FF3A 868918C4 830000FF ....á...:../:..u.Õ....:.Õ:.j...L 000180
 FF0C76FF 032068FF 4086FFFF 4286FF50 16EA468D 006A5016 98468000 6A5016FF ..Pj..F..Pj..Fõ.P.ÑB..Ñª.h ..v.. 0001A0
 56570000 00C8CBC9 5F5E1F00 00E922C4 830000FF FF9A006A 0676FF08 76FF0A76 v..v..v.j.......á"Õ...^_èùà...WV 0001C0
 064688D8 8E03E288 1E565700 0000C8CB C95F5E1F 0000E900 0088D88E 00C4881E .¡á..Ä¡..Õ...^_èùà...WV¯¡ã..Ä.F. 0001E0

Dump of file SATURN:[PCCOMMON.DUMP.DLL]PDLDGM.TMP;1 on 18-APR-1990 10:48:18.73
File ID (766,30,0)   End of file block 195 / Allocated 196

Virtual block number 131 (00000083), 512 (0200) bytes

 08568806 4688D88E 03F9881E 56570000 00C8CBC9 5F5E1F00 00E9001C 0508568B .V....Õ...^_èùà...WV.¡'..Ä.F..V. 000000
 26010487 8B26065E C4D88E04 16881E56 57000000 C8CBC95F 5E1F0000 E9000205 ...Õ...^_èùõ...WV.¡...Äá^.&....& 000020
 3C6AFFFF 68046168 D88E0433 881E5657 000000C8 CBC95F5E 1F0000E9 0106978B ....Õ...^_èùà...WV.¡3..Äha.h..j< 000040
 016A0F84 681E0108 6800A468 1E036A00 8368FFFF 68FFFF68 096AFFFF 68046968 hÌ.h..j.h¯.h..h..j..hÉ.h...hÇ.j. 000060
 020303F1 00000464 0005000B CBC95F5E 1F0000E9 24C48300 00FFFF9A 006A0E6A j.j.......á$Õ...^_èù....d...þ... 000080
 02030017 00030485 0203040E 0000046C 00050000 00280454 00020087 00030079 y.......T.+.....l¯............... 0000A0
 0203042B 0000045C 0005002A 000301B1 02030000 00000459 00020098 000300A7 Ì.......Y.......Ý...*...\...+... 0000C0
 040E4683 D88EFFFF 881E5657 00000EC8 00000467 000001E3 02030037 000303CB ù...7...D...g...à...WV.¡...Ä.F.. 0000E0
 FE578B26 FC478B26 0E5EC404 0E4683F6 5689F446 89FE578B 26FC478B 260E5EC4 á^.&.G=&.W±.F¶.V-.F..á^.&.G•&.W± 000100
 BA87C726 0A5EC401 06978926 01048789 26FE568B FC46880A 5EC4FE56 89FC4689 .F=.V±á^..F=.V±&....&....á^.&ú.¤ 000120
 5016F846 8D000000 C087C726 0096008E 87C7260A 5EC40000 008C87C7 26019000 ...&ú.¥...á^.&ú.ƒ...&ú.å....F½.P 000140
 FF26F85E C40026E9 0375FA46 08F8468B 0AC48300 00FFFF9A 006A0A76 FF0C76FF .v..v.j.......á..F½.F¶u.Õ&.á^½&. 000160
 468910C4 830000FF FF9A006A 0676FF08 76FF0A76 FF0C76FF 08A76837 FF260277 w.&.7hÌ..v..v..v..v.j.......á..F 000180
 265A478B 260A5EC4 D88E0008 881E5657 0000C2C8 CBC95F5E 1F0000E9 F2468BF2 ·.F·Õ...^_èùàõ..WV.¡...Äá^.&.GZ& 0001A0
 FF4E9689 FF4C8689 0080978B 2600AE87 8B260A5E C4FF4296 89FF4086 895C578B .W\..ª...B.á^.&..Û.&..¯...L...N. 0001C0
 8B26008B 878B260A 5EC4FF48 8689FF4A 86890000 B80000FF 3E86C700 4CE846C7 úFÒL.ú.>...¡....J...H.á^.&..ý.&. 0001E0

Dump of file SATURN:[PCCOMMON.DUMP.DLL]PDLDGM.TMP;1 on 18-APR-1990 10:48:18.73
```

File ID (766,30,0)   End of file block 195 / Allocated 196

Virtual block number 132 (00000084), 512 (0200) bytes

```
03260A5E C4008497 8B2600B2 878B260A 5EC42857 89262647 89260A5E C4008497 .Ç.á^.&.G&&.W(á^.&..ý.&..Ç.á^.&. 000000
00B8978B 26008687 8B260A5E C4305789 262E4789 260A5EC4 00BC9713 26008A87 .¤.&..¥.á^.&.G.&.W0á^.&..Ñ.&..¡. 000020
008E8703 260A5EC4 00B8978B 26008687 8B260A5E C42C5789 262A4789 260A5EC4 á^.&.G*&.W,á^.&..Ñ.&..¡.á^.&../. 000040
8B0C7F8D 0026050C 56880A46 8B0A5EC4 34578926 32478926 0A5EC400 C0971326 &..à.á^.&.G2&.W4á^..F..V..&..... 000060
0001CD9A 006AFF40 B6FFFF42 B6FF264F 685016FE 468D1FA5 F20008B9 DA8E1EF0 Þ..Ö¿..·Ê..F±.PhO&.ÑB..Ñª.j..ë.. 000080
0001F79A 006A00AE B7FF2600 B0B7FF26 0A5EC402 79685016 FF44868D 0CC48300 ..á...D..Phy.á^.&.ñ¯.&.ñÛ.j..%.. 0000A0
FF4EB6FF 027F6850 16FF4886 8D0000FF FF9A146A 5016EA46 8DFE76FF 0CC48300 ..á..v±.Fõ.Pj........H..Ph...ÑN. 0000C0
6A020468 50169C46 8D5016E8 4680009C 46C60CC4 83000002 2C9A006A FF4CB6FF .ÑL.j.,.,....á.óF...FÒ.P.F..Ph..j 0000E0
00000278 9A006A01 04B7FF26 0106B7FF 260A5EC4 271A68FF 48B6FFFF 4AB6FF0E ..ÑJ..ÑH.h.'á^.&.ñ..&.ñ..j..x... 000100
E8468000 FF5086C6 0075E9FF 3E868800 07E90375 00FF3E8E 83FF3E86 8918C483 .á...>../>..u.Õ....>.Õu.ó.P...FÒ 000120
0106B7FF 260A5EC4 271A68FF 48B6FFFF 4AB6FF0F 6A020468 5016FF50 868D5016 .P..P..Ph..j..ÑJ..ÑH.h.'á^.&.ñ.. 000140
9C468D00 6A5016FF 50868D00 6AFF3E86 8918C483 0000FFFF 9A006A01 04B7FF26 &.ñ..j......á...>.j...P..Pj..F. 000160
0676FF08 76FF0A76 FF0C76FF 032068FF 44B6FFFF 46B6FF50 16EA4680 006A5016 .Pj..Fõ.P.ÑF..ÑD.h ..v..v..v..v. 000180
468BD88E 00C4B81E 56570000 00C8CBC9 5F5E1F00 00E922C4 830000FF FF9A006A j.......á"Õ...^_èùà...WV.¡á..Ä.F 0001A0
56880646 8BD88E02 CAB81E56 57000000 C8CBC95F 5E1F0000 E9001C05 08568806 ..V....Õ...^_èùã...WV.¡ò..Ä.F..V 0001C0
01048788 26065EC4 D88E02E7 B81E5657 000000C8 CBC95F5E 1F0000E9 00020508 ....Õ...^_èùã...WV.¡Ó..Äá^.&.... 0001E0
```

Dump of file SATURN:[PCCOMMON.DUMP.DLL]PDLDGM.TMP;1 on 18-APR-1990 10:48:18.73
File ID (766,30,0)   End of file block 195 / Allocated 196

Virtual block number 133 (00000085), 512 (0200) bytes

```
6AFFFF68 03326808 8E030488 1E565700 0000C8CB C95F5E1F 0000E901 06978826 &....Õ...^_èùà...WV.¡...Äh2.h..j 000000
016A107E 681E0108 680F8868 1E036A62 6AFFFF68 FFFF6809 6AFFFF68 033A6843 Ch:.h..j.h¯.h..jbj..h¡.h...h~.j. 000020
020302C2 000E0335 00050008 CBC95F5E 1F0000E9 24C48300 00FFFF9A 006A286A j(j.......á$Õ...^_èù....5...õ... 000040
02030017 00030355 02030000 002B0325 000202DF 000E033D 00050087 00030079 y.......*...Õ...%¯+.....U....... 000060
0203002A 000301AD 020302FC 000E032D 00050000 000E032A 0002009B 000300A7 ¦.......*.......-...■...Ù...*... 000080
040E4683 D88EFFFF B81E5657 000008C8 00000467 00000100F 02030037 000302B3 *...7...Õ...g...à...WV.¡...Ä.F.. 0000A0
FE578826 FC478826 0E5EC404 0E4683FA 5689F846 89FE578B 26FC478B 260E5EC4 á^.&.G=&.W±.F½.Vª.F..á^.&.G=&.W± 0000C0
1F0000E9 00008800 EC978926 00EA8789 26FE568B FC46880A 5EC4FE56 89FC4689 .F=.V±á^..F=.V±&..õ.&..š.¡..Õ... 0000E0
57000000 C8CBC95F 5E1F0000 E9000088 D88E0008 B81E5657 000000C8 CBC95F5E ^_èùà...WV.¡...Ä¡..Õ...^_èùà...W 000100
B81E5657 000000C8 CBC95F5E 1F0000E9 00020508 56880646 8BD88E00 5CB81E56 V¯¡\..Ä.F..V....Õ...^_èùã...WV.¡ 000120
1E565700 0000C8CB C95F5E1F 0000E900 EC978826 00EA878B 26065EC4 D88E0073 s..Äá^.&..õ.&..š.Õ...^_èùà...WV. 000140
681E00EE 68108268 1E026A09 6AFFFF68 FFFF6845 6AFFFF68 008E68D8 8E00908B ¡...Äh/.h..jEh..h..j.j¯.h..hŸ..h 000160
002B0081 00020005 CBC95F5E 1F0000E9 1EC48300 00FFFF9A 006A2A6A 016A10E8 Õ.j.j*j.......á.Õ...^_èù....Ý.+. 000180
000F0089 0005006B 000F00C1 00050000 000F00B6 00020017 00030009 02030000 ....\.......Ñ.......è¯...k...¿... 0001A0
040E4683 D88EFFFF B81E5657 00000EC8 00000000 00000000 00000000 00000088 ................à...WV.¡...Ä.F.. 0001C0
FE578826 FC478826 0E5EC404 0E4683FA 5689F846 89FE578B 26FC478B 260E5EC4 á^.&.G=&.W±.F½.Vª.F..á^.&.G=&.W± 0001E0
```

Dump of file SATURN:[PCCOMMON.DUMP.DLL]PDLDGM.TMP;1 on 18-APR-1990 10:48:18.73
File ID (766,30,0)   End of file block 195 / Allocated 196

Virtual block number 134 (00000086), 512 (0200) bytes

```
BA87C726 0A5EC401 06978926 01048789 26FE568B FC46880A 5EC4FE56 89FC4689 .F=.V±á^..F=.V±&....&....á^.&ú.¤ 000000
5016F446 8D000000 C087C726 0096008E 87C7260A 5EC40000 00BC87C7 26019000 ...&ú.¥...á^.&ú./...&ú.à....F¶.P 000020
FF26F45E C40026E9 0375F646 08F4468B 0AC48300 00FFFF9A 006A0A76 FF0C76FF .v..v.¦.......á..F¶.F-u.Õ&.á^¶&. 000040
468910C4 830000FF FF9A006A 0676FF08 76FF0A76 FF0C76FF 08A76837 FF260277 W.&.7h¦..v..v..v..v.j.......á..F 000060
265A478B 260A5EC4 D88E0008 B81E5657 00001EC8 CBC95F5E 1F0000E9 F2468BF2 ·.F·Õ...^_èùà...WV.¡...Äá^.&.GZ& 000080
57892626 4789260A 5EC40084 97882600 B2878826 0A5EC4E4 5689E246 895C578B .W\.Fã.Võã^.&..ý.&..Ç.á^.&.G&&.W 0000A0
89260A5E C4008C97 1326008A 8703260A 5EC40084 97882600 B2878826 0A5EC428 (á^.&..ý.&..Ç.á^.&..¤.&..¥.á^.&. 0000C0
5EC42C57 89262A47 89260A5E C4008897 88260086 8788260A 5EC43057 89262E47 G.&.W0á^.&..Ñ.&..¡.á^.&.G*&.W,á^ 0000E0
26324789 260A5EC4 00C09713 26008E87 03260A5E C4008897 8B260086 878B260A .&..Ñ.&..¡.á^.&../.&..à.á^.&.GZ& 000100
FE468D1F A5F20008 B9DA8E1E F08B0C7F 8D002605 0C56880A 46880A5E C4345789 .W4á^..F..V..&.....Þ..Ö¿..·Ê..F± 000120
0A5EC402 79685016 E6468D0C C4830000 019D9A00 6AE276FF E476FF26 4F685016 .PhO&.võ.vãj.......á..F¦.Phy.á^. 000140
FF9A146A 5016EA46 8DFE76FF 0CC48300 00FFFF9A 006A00AE B7FF2600 B0B7FF26 &.ñ¯.&.ñÛ.j.......á..v±.Fõ.Pj... 000160
9A006A06 76FF0876 FF0A76FF 0C76FF03 2068E676 FFE876FF 5016EA46 8D0000FF ....Fõ.P.võ.v¦h ..v..v..v..v.j.. 000180
00E90000 8BD88E00 C4B81E56 57000000 C8CBC95F 5E1F0000 E914C483 0000FFFF .....á.Õ...^_èùà...WV.¡á..Ä¡..Õ. 0001A0
5E1F0000 E9001C05 08568806 4688088E 01E7B81E 56570000 00C8CBC9 5F5E1F00 ..^_èùà...WV¯¡Ó..Ä.F..V....Õ...^ 0001C0
CBC95F5E 1F0000E9 00020508 56880646 8BD88E01 FEB81E56 57000000 C8CBC95F _èùã...WV.¡±..Ä.F..V....Õ...^_èù 0001E0
```

Dump of file SATURN:[PCCOMMON.DUMP.DLL]PDLDGM.TMP;1 on 18-APR-1990 10:48:18.73

File ID (766,30,0)    End of file block 195 / Allocated 196

Virtual block number 135 (00000087), 512 (0200) bytes

```
C95F5E1F 0000E901 06978B26 0104878B 26065EC4 D88E021B B81E5657 000000C8 à...WV.¡...Äá^.&....&....Õ...^_è 000000
FFFF6809 6AFFFF68 026E6846 6AFFFF68 02666808 8E02388B 1E565700 0000C8CB ùà...WV.¡8..Âhf.h..jFhn.h..j.h¯.. 000020
24C48300 00FFFF9A 006A106A 016A124B 681E0108 6810EC68 1E036A5A 6AFFFF68 h..jZj..hš.h...hH.j.j.j.......á$ 000040
002B0259 00020087 00030079 02030213 00100271 0005000B CBC95F5E 1F0000E9 Õ...^_èù....q.......Y.......Y.+. 000060
0010025E 0002009B 000300A7 02030230 00100261 00050017 00030289 02030000 ............a...0...Ï.......^... 000080
00100269 00050467 000D01AF 02030037 000301D0 0203002A 0003017E 02030000 ....~...*...Å...7...€...g...i... 0000A0
00F246C7 D88EFFFF 881E5657 00000EC8 00000000 00000000 00000000 000001F6 -...............à...WV.¡...ÄúF·. 0000C0
478B260E 5EC4040E 4683F656 89F44689 FE578B26 FC478B26 0E5EC404 0E468300 ..F..á^.&.G=&.W±.F¶.V-.F..á^.&.G 0000E0
5EC40106 97892601 04878926 FE568BFC 468B0A5E C4FE5689 FC4689FE 578B26FC =&.W±.F=.V±á^..F=.V±&....&....á^ 000100
000000C0 87C72600 96008E87 C7260A5E C4000000 BC87C726 0190008A 87C7260A .&ú.¤...&ú.¥...á^.&ú.ƒ...&ú.â... 000120
0026E903 75FA460B F846880A C4830000 FFFF9A00 6A0A76FF 0C76FF50 16F8468D .F½.P.v..v.j.......á..F½.F*u.Õ&. 000140
0000FFFF 9A006A06 76FF0876 FF0A76FF 0C76FF08 A76837FF 260277FF 26F85EC4 á^½&.w.&.7hÏ..v..v..v..v.j...... 000160
0A5EC4D8 8E0008B8 1E565700 0092C8CB C95F5E1F 0000E9F2 468BF246 8910C483 .á..F·.F·Õ...^_èùà...WV.¡...Äá^. 000180
94468900 B0978B26 00AE878B 260A5EC4 FF7E9689 FF7C8689 5C578B26 5A478B26 &.GZ&.W\..|...=.á^.&..Ù.&..¯..F. 0001A0
0A5EC4FF 769689FF 74868900 B4978B26 00B2878B 260A5EC4 004CE446 C7965689 .V.úFÕL.á^.&..ý.&..Ç...t...v.á^. 0001C0
89008C97 8B26008A 878B260A 5EC4FF70 9689FF6E 868900B8 978B2600 86878B26 &..Ñ.&..|...n...p.á^.&..¤.&..¥.. 0001E0
```

Dump of file SATURN:[PCCOMMON.DUMP.DLL]PDLDGM.TMP;1 on 18-APR-1990 10:48:18.73
File ID (766,30,0)    End of file block 195 / Allocated 196

Virtual block number 136 (00000088), 512 (0200) bytes

```
264F6850 16FA468D 8A568988 468900C0 97882600 BE878B26 0A5EC4FE 5689FC46 F=.V±á^.&../.&..á..F..V..F*.PhÕ& 000000
B7FF260A 5EC40279 68501680 468D0CC4 83000001 7A9A006A FF7CB6FF FF7EB6FF .Ñ~..Ñ|.j..z....á..F..Phy.á^.&.ñ 000020
0000FFFF 9A146A50 16E6468D FA76FF0C C4830000 01A19A00 6A00AEB7 FF260080 ¯.&.ñÙ.j..Å....á..v*.FÏ.Pj...... 000040
16E4468D 009846C6 0CC48300 0001D49A 006A9476 FF9676FF 027F6850 1684468D .F..Ph...v..v.j..å....á.6F...FÕ. 000060
04B7FF26 010687FF 260A5EC4 271A6884 76FF8676 FF106A02 04685016 98468050 P.F..Ph..j..v..v.h.'á^.&.ñ..&.ñ. 000080
0147E9FF 72868800 07E90375 00FF728E 83FF7286 8918C483 000002EE 9A006A01 .j..¥....á...r../r..u.Õ....r.ÕG. 0000A0
6A006A8E 56898C46 89FF7696 13FF7486 03021A00 369AFC76 FFFE76FF 026A006A j.j..v±.v=.6.....t...v..F..V.j.j 0000C0
C70190FC 46C79256 89904689 FF709613 FF6E8603 FFFF0036 9A8876FF 8A76FF04 ..v..v..6.....n...p..F..V.úF=..ú 0000E0
968BFF74 868B0A5E C4008C97 8926008A 878926FE 568BFC46 880A5EC4 0000FE46 F±..á^..F=.V±&..¤.&..¥.á^...t... 000100
262E4789 26FE5613 FC4603FF 76968BFF 7486880A 5EC42857 89262647 8926FF76 v.&.G&&.W(á^...t...v..F=.V±&.G.& 000120
70968BFF 6E86880A 5EC42C57 89262A47 8926FF70 968BFF6E 868B0A5E C4305789 .WOá^...n...p.&.G*&.W,á^...n...p 000140
F08B0C7F 80002605 0C568B0A 46880A5E C4345789 26324789 268A5613 884603FF ..F..V.&.G2&.W4á^..F..V..&.....Þ 000160
0676FF08 76FF0A76 FF0C76FF 08A66808 6A5016FF 7C86801F A5F20008 B9DA8E1E ..Õ¿..·E...|..Pj.hÏ..v..v..v..v. 000180
FFFF9A00 6AFF7CB6 FFFF7EB6 FF057868 5016FF78 868D12C4 83000000 AC9A006A j..¯....á...x..Phx..Ñ~..Ñ|.j.... 0001A0
006A5016 98468D00 6A0A5789 26084789 26FE568B FC468BFF 789EC40C C4830000 ...á.á.x..F=.V±&.G.&.W.j..F..Pj. 0001C0
00FFFF9A 006A0676 FF0876FF 0A76FF0C 76FF0320 688076FF 8276FF50 16E6468D .FÏ.P.v..v.h ..v..v..v..v.j..... 0001E0
```

Dump of file SATURN:[PCCOMMON.DUMP.DLL]PDLDGM.TMP;1 on 18-APR-1990 10:48:18.73
File ID (766,30,0)    End of file block 195 / Allocated 196

Virtual block number 137 (00000089), 512 (0200) bytes

```
5E1F0000 E90000B8 D88E00C9 B81E5657 000000C8 CBC95F5E 1F0000E9 1CC48300 ..á.Õ...^_èùà...WV.¡è..Ä¡..Õ...^ 000000
CBC95F5E 1F0000E9 001C0508 56880646 8B088E03 44881E56 57000000 C8CBC95F _èùà...WV¯.¡D..Ä.F..V....Õ...^_èù 000020
C95F5E1F 0000E901 06978B26 0104878B 26065EC4 D88E035B B81E5657 000000C8 Ã...WV.¡[..Äá^.&....&....Õ...¯_è 000040
00C8CBC9 5F5E1F00 00E90002 0508568B 06468BD8 8E03788B 1E565700 0000C8CB ùà...WV.¡x..Ä.F..V....Õ...^_èùÃ. 000060
FFFF68FF FF68096A FFFF6803 CB684F6A FFFF6803 C368D88E 0399B81E 56570000 ..WV.¡...Âhù.h..jOhù.h...j.h¯.h.. 000080
0000E924 C4830000 FFFF9A00 6A246A01 6A12F468 1E010868 124C681E 036A5B6A j[j..hL.h...h¶.j.j$j.......á$Õ.. 0000A0
0000002A 01FD0002 00870003 007E0203 03700011 038E0005 000C90CB C95F5E1F .^_èù...../...p...~.......=.*... 0000C0
00980003 02D30203 03910011 03CE0005 00170003 03E60203 0000002B 03B60002 ..Ñ.+.....Ï.......õ.......Æ..... 0000E0
04670000 018C0203 00370003 03200203 00000011 03B80002 002A0003 015B0203 ..[...*...£.......-...7.......g. 000100
00F246C7 D88EFFFF B81E5657 00000EC8 00000000 00000000 03530011 03C60005 ..6...S.........à...WV.¡...ÄúF·. 000120
478B260E 5EC4040E 4683F656 89F44689 FE578B26 FC478B26 0E5EC404 0E468300 ..F..á^.&.G=&.W±.F¶.V-.F..á^.&.G 000140
5EC40148 97892601 46878926 FE568BFC 468B0A5E C4FE5689 FC4689FE 578B26FC =&.W±.F=.V±á^..F=.V±&..F.&..H.á^ 000160
00000102 87C72600 96010087 C7260A5E C4000000 FE87C726 019000FC 87C7260A .&ú.=...&ú.±...á^.&ú.....&ú..... 000180
0026E903 75FA460B F846880A C4830000 FFFF9A00 6A0A76FF 0C76FF50 16F8468D .F½.P.v..v.j.......á..F½.F*u.Õ&. 0001A0
0000FFFF 9A006A06 76FF0876 FF0A76FF 0C76FF08 A76837FF 260277FF 26F85EC4 á^½&.w.&.7hÏ..v..v..v..v.j...... 0001C0
00008808 8E0008B8 1E565700 0000C8CB C95F5E1F 0000E9F2 468BF246 8910C483 .á..F·.F·Õ...^_èùà...WV.¡...Ä¡.. 0001E0
```

Dump of file SATURN:[PCCOMMON.DUMP.DLL]PDLDGM.TMP;1 on 18-APR-1990 10:48:18.73

File ID (766,30,0)   End of file block 195 / Allocated 196

Virtual block number 138 (0000008A), 512 (0200) bytes

```
0000E900 5E050856 88064688 D88E00C9 881E5657 000000C8 CBC95F5E 1F0000E9 Õ...^_èùà...WV.¡è..Ä.F..V..^.Õ.. 000000
5F5E1F00 00E90002 05085688 06468808 8E00E088 1E565700 0000C8CB C95F5E1F .^_èùã...WV.¡Á..Ä.F..V....Õ...^_ 000020
5E1F0000 E9014897 88260146 87882606 5EC4D88E 00FD881E 56570000 00C8CBC9 èùã...WV.¡»..Äá^.&..F.&..H.Õ...ˣ 000040
68096AFF FF680150 684E6AFF FF680148 68D88E01 1A881E56 57000000 C8CBC95F _èùà...WV.¡...ÄhH.h..jNhP.h..j.h 000060
830000FF FF9A006A 2B6A016A 135E681E 014A6812 F8681E03 6A5C6AFF FF68FFFF ..h..j\j..h½.hJ..h^.j.j+j....... 000080
01380002 00870003 007E0203 00D80012 01480005 0008CBC9 5F5E1F00 00E924C4 á$Õ...^_èù....K...Ä...~.......;. 0000A0
01400002 00F50012 01530005 00980003 00AC0203 00170003 01680203 0000002B +.....k.......¯.......S...%...ə. 0000C0
00F246C7 D88EFFFF 881E5657 00000EC8 00000000 01120012 01430005 00000012 ......C.........à...WV.¡...ÄúF·. 0000E0
478B260E 5EC4040E 4683F656 89F44689 FE578826 FC478826 0E5EC404 0E468300 ..F..á^.&.G•&.W±.F¶.V-.F..á^.&.G 000100
5EC40148 97892601 46878926 FE568BFC 46880A5E C4FE5689 FC4689FE 578826FC ▪&.W±.F•.V±á^..F•.V±&..F.&..H.á^ 000120
00000102 87C72600 96010087 C7260A5E C4000000 FE87C726 019000FC 87C7260A .&ú.▪...&ú.±...á^.&ú.....&ú..... 000140
0026E903 75FA460B F84688OA C4830000 FFFF9A00 6A0A76FF 0C76FF50 16F8468D .F½.P.v..v.j.......á..F½.Fªu.Õ&. 000160
0000FFFF 9A006A06 76FF0876 FF0A76FF 0C76FF08 A76837FF 260277FF 26F85EC4 á^½&.w.&.7hÌ..v..v..v..v.j...... 000180
00008808 8E000888 1E565700 0000C8CB C95F5E1F 0000E9F2 4688F246 8910C483 .á..F·.F·Õ...^_èùà...WV.¡...Ä¡.. 0001A0
0000E900 5E050856 88064688 D88E00C9 881E5657 000000C8 CBC95F5E 1F0000E9 Õ...^_èùà...WV¯¡è..Ä.F..V..^.Õ.. 0001C0
5F5E1F00 00E90002 05085688 06468808 8E00E088 1E565700 0000C8CB C95F5E1F .^_èùã...WV.¡Á..Ä.F..V....Õ...^_ 0001E0
```

Dump of file SATURN:[PCCOMMON.DUMP.DLL]PDLDGM.TMP;1 on 18-APR-1990 10:48:18.73
File ID (766,30,0)   End of file block 195 / Allocated 196

Virtual block number 139 (0000008B), 512 (0200) bytes

```
5E1F0000 E9014897 88260146 87882606 5EC4D88E 00FD881E 56570000 00C8CBC9 èùà...WV.¡»..Äá^.&..F.&..H.Õ...^ 000000
68096AFF FF680150 684D6AFF FF680148 68D88E01 1A881E56 57000000 C8CBC95F _èùà...WV.¡...ÄhH.h..jMhP.h..j.h 000020
830000FF FF9A006A 2C6A016A 13C8681E 014A6813 62681E03 6A5C6AFF FF68FFFF ..h..j\j..hb.hJ..hà.j.j,j....... 000040
01680203 0000002B 01380002 00870003 007E0203 0008CBC9 5F5E1F00 00E924C4 á$Õ...^_èù....~.......;.+.....k. 000060
01530005 00000013 01400002 00D80013 01480005 00980003 00AC0203 00170003 ......¯.......K...Ä...ə.......S. 000080
00F246C7 D88EFFFF 881E5657 00000EC8 00000000 01120013 01430005 00F50013 ..%...C.........à...WV.¡...ÄúF·. 0000A0
478B260E 5EC4040E 4683F656 89F44689 FE578826 FC478826 0E5EC404 0E468300 ..F..á^.&.G•&.W±.F¶.V-.F..á^.&.G 0000C0
5EC40148 97892601 46878926 FE568BFC 46880A5E C4FE5689 FC4689FE 578826FC ▪&.W±.F•.V±á^..F•.V±&..F.&..H.á^ 0000E0
00000102 87C72600 96010087 C7260A5E C4000000 FE87C726 019000FC 87C7260A .&ú.▪...&ú.±...á^.&ú.....&ú..... 000100
0026E903 75FA460B F84688OA C4830000 FFFF9A00 6A0A76FF 0C76FF50 16F8468D .F½.P.v..v.j.......á..F½.Fªu.Õ&. 000120
0000FFFF 9A006A06 76FF0876 FF0A76FF 0C76FF08 A76837FF 260277FF 26F85EC4 á^½&.w.&.7hÌ..v..v..v..v.j...... 000140
00008808 8E000888 1E565700 0000C8CB C95F5E1F 0000E9F2 4688F246 8910C483 .á..F·.F·Õ...^_èùà...WV.¡...Ä¡.. 000160
0000E900 5E050856 88064688 D88E00C9 881E5657 000000C8 CBC95F5E 1F0000E9 Õ...^_èùà...WV¯¡è..Ä.F..V..^.Õ.. 000180
5F5E1F00 00E90002 05085688 06468808 8E00E088 1E565700 0000C8CB C95F5E1F .^_èùã...WV.¡Á..Ä.F..V....Õ...^_ 0001A0
5E1F0000 E9014897 88260146 87882606 5EC4D88E 00FD881E 56570000 00C8CBC9 èùã...WV.¡»..Äá^.&..F.&..H.Õ...ˣ 0001C0
68096AFF FF680150 684C6AFF FF680148 68D88E01 1A881E56 57000000 C8CBC95F _èùà...WV.¡...ÄhH.h..jLhP.h..j.h 0001E0
```

Dump of file SATURN:[PCCOMMON.DUMP.DLL]PDLDGM.TMP;1 on 18-APR-1990 10:48:18.73
File ID (766,30,0)   End of file block 195 / Allocated 196

Virtual block number 140 (0000008C), 512 (0200) bytes

```
830000FF FF9A006A 2D6A016A 1432681E 014A6813 CC681E03 6A5C6AFF FF68FFFF ..h..j\j..hä.hJ..h2.j.j·j....... 000000
01380002 00870003 007E0203 01120014 01430005 0008CBC9 5F5E1F00 00E924C4 á$Õ...^_èù....C.......~.......;. 000020
01480005 00000014 01400002 00980003 00AC0203 00170003 01680203 0000002B +.....k.......¯.......ə.......K. 000040
00F246C7 D88EFFFF 881E5657 00000EC8 00000000 00F50014 01530005 00D80014 ..Ä...S...%.....à...WV.¡.  ÄúF·. 000060
478B260E 5EC4040E 4683F656 89F44689 FE578826 FC478826 0E5EC404 0E468300 ..F..á^.&.G•&.W±.F¶.V-.F...` &.G 000080
5EC40106 97892601 04878926 FE568BFC 46880A5E C4FE5689 FC4689FE 578826FC ▪&.W±.F•.V±á^..F•.V±&....&....á^ 0000A0
000000C0 87C72600 9600BE87 C7260A5E C4000000 BC87C726 019000BA 87C7260A .&ú.α...&ú.¥...á^.&ú.ƒ...&ú.á... 0000C0
0026E903 75FA460B F84688OA C4830000 FFFF9A00 6A0A76FF 0C76FF50 16F8468D .F½.P.v..v.j.......á..F½.Fªu.Õ&. 0000E0
0000FFFF 9A006A06 76FF0876 FF0A76FF 0C76FF08 A76837FF 260277FF 26F85EC4 á^½&.w.&.7hÌ..v..v..v..v.j...... 000100
0A5EC4D8 8E000888 1E565700 0076C8CB C95F5E1F 0000E9F2 4688F246 8910C483 .á..F·.F·Õ...^_èùàv..WV.¡...Äá^. 000120
56899846 8900B097 882600AE 8788260A 5EC48E56 898C4689 5C578826 5A478826 &.GZ&.W\.F..V.ã^.&..Û.&..¯..F..V 000140
5EC42857 89262647 89260A5E C400B497 88260082 8788260A 5EC4004C E846C79A .úFÒL.á^.&..ý.&..Ç.á^.&.G&&.W(á^ 000160
262E4789 260A5EC4 008C9713 2600BA87 03260A5E C400B497 88260082 8788260A .&..ý.&..Ç.á^.&..¤.&..¥.á^.&.G.& 000180
88260A5E C42C5789 262A4789 260A5EC4 00889788 26008687 88260A5E C4305789 .WOá^.&..Ñ.&..|.á^.&.G*&.W,á^.&. 0001A0
34578926 32478926 0A5EC400 C0971326 008E8703 260A5EC4 00889788 26008687 .Ñ.&..|.á^.&../.&..ã.á^.&.GZ&.W4 0001C0
685016FE 468D1FA5 F20008B9 DA8E1EF0 880C7F8D 0026050C 56880A46 880A5EC4 á^..F..V..&.....Þ..Ö¿..·E..F±.Ph 0001E0
```

Dump of file SATURN:[PCCOMMON.DUMP.DLL]PDLDGM.TMP;1 on 18-APR-1990 10:48:18.73

File ID (766,30,0)   End of file block 195 / Allocated 196

Virtual block number 141 (0000008D), 512 (0200) bytes

```
B7FF260A 5EC40279 68501690 46800CC4 83000001 8A9A006A 8C76FF8E 76FF264F O&.v..v.j..α....á..F..Phy.á^.&.ñ 000000
0000FFFF 9A146A50 16EA468D FE76FF0C C4830000 01E19A00 6A00AEB7 FF2600B0 ¯.&.ñÚ.j..Ã....á..v±.Fõ.Pj...... 000020
16E8468D 009C46C6 0CC48300 0002149A 006A9876 FF9A76FF 027F6850 1694468D .F..Ph...v..v.j.......á.6F...FÒ. 000040
04B7FF26 0106B7FF 260A5EC4 271A6894 76FF9676 FF0E6A02 04685016 9C468D50 P.F..Ph..j..v..v.h.'á^.&.ñ..&.ñ. 000060
8D006A00 30E98A46 8B0006E9 0375008A 7E838A46 8918C483 0000FFFF 9A006A01 .j.......á..F..¬..u.Õ...F.ÕO.j.. 000080
0676FF08 76FF0A76 FF0C76FF 03206890 76FF9276 FF5016EA 4680006A 50169C46 F..Pj..Fõ.P.v..v.h ..v..v..v..v. 0000A0
0088088E 00C9881E 56570000 00C8C8C9 5F5E1F00 00E91CC4 830000FF FF9A006A j.......á.Õ...^_èùà...WV.¡è..Ãj. 0000C0
00E9001C 05085688 06468808 8E026A88 1E565700 0000C8CB C95F5E1F 0000E900 .Õ...^_èùà...WV¯¡j..Ã.F..V....Õ. 0000E0
5E1F0000 E9000205 08568806 46880888E 0281881E 56570000 00C8C8C9 5F5E1F00 ..^_èùÃ...WV.¡...Á.F..V....Õ...^ 000100
1F0000E9 0106978B 26010487 8826065E C4088E02 9E881E56 57000000 C8C8C95F _èùÃ...WV.¡...Ãá^.&....&....Õ... 000120
096AFFFF 6802F168 486AFFFF 6802E968 D88E02BB 881E5657 000000C8 C8C95F5E ¯_èùà...WV.¡£..ÃhÕ.h..jKhþ.h..j. 000140
0000FFFF 9A006A29 6A016A15 38681E01 08681436 681E036A 586AFFFF 68FFFF68 h¯.h..j(j..h6.h...h8.j.j)j...... 000160
00020087 0003007E 02030279 001502EC 0005000B 90C8C95F 5E1F0000 E924C483 .á$Õ...^_èù.....§...y...~....... 000180
02030296 001502F4 0005009B 000300AC 02030017 0003030C 02030000 002B02DC É.+.............¯.......¶....... 0001A0
000202B3 001502E4 00050467 0000D1CC 02030037 00030253 0203002A 0003019B ....*...S...7...ä...g...õ...°... 0001C0
00F246C7 D88EFFFF 881E5657 00000EC8 00000000 00000000 00000000 001502E1 Ã...............à...WV.¡...ÄúF·. 0001E0
```

Dump of file SATURN:[PCCOMMON.DUMP.DLL]PDLDGM.TMP;1 on 18-APR-1990 10:48:18.73
File ID (766,30,0)   End of file block 195 / Allocated 196

Virtual block number 142 (0000008E), 512 (0200) bytes

```
478B260E 5EC4040E 4683FA56 89F84689 FE578826 FC478826 0E5EC404 0E468300 ..F..á^.&.G=&.W±.F½.V°.F..á^.&.G 000000
5EC40148 97892601 46878926 FE5688FC 46880A5E C4FE5689 FC4689FE 578826FC =&.W±.F=.V±á^..F=.V±&..F.&..H.á^ 000020
00000102 87C72600 96010087 C7260A5E C4000000 FE87C726 019000FC 87C7260A .&ú.=...&ú.±...á^.&ú.....&ú..... 000040
0026E903 75F6460B F44688OA C4830000 FFFF9A00 6A0A76FF 0C76FF50 16F4468D .F¶.P.v..v.j.......á..F¶.F-u.Õ&. 000060
0000FFFF 9A006A06 76FF0876 FF0A76FF 0C76FF08 A76837FF 260277FF 26F45EC4 á^¶&.w.&.7hÌ..v..v..v..v.j...... 000080
00008808 8E0008B8 1E565700 0000C8CB C95F5E1F 0000E9F2 4688F246 8910C483 .á..F·.F·Õ...^_èùà...WV.¡...Ãj.. 0000A0
0000E900 5E050856 88064688 D88E00C9 881E5657 000000C8 C8C95F5E 1F0000E9 Õ...^_èùà...WV¯¡è..Ã.F..V..^.Õ.. 0000C0
5F5E1F00 00E90002 05085688 06468808 8E00E088 1E565700 0000C8CB C95F5E1F .^_èùÃ...WV.¡Á..Ã.F..V....Õ...^_ 0000E0
5E1F0000 E9014897 88260146 87882606 5EC4088E 00F0881E 56570000 00C8C8C9 èùÃ...WV.¡»..Ãá^.&..F.&..H.Õ...ˣ 000100
68096AFF FF680150 68496AFF FF680148 68088E01 1A881E56 57000000 C8C8C95F _èùà...WV.¡...ÃhH.h..jIhP.h..j.h 000120
830000FF FF9A006A 276A016A 15A2681E 014A6815 3C681E03 6A5C6AFF FF68FFFF ¯..h..j\j..h<.hJ..hÅ.j.j'j....... 000140
01380002 00870003 007E0203 00D80016 01480005 0008C8C9 5F5E1F00 00E924C4 á$Õ...^_èù....K...Ã...-.......;. 000160
01430005 00F50016 01530005 00980003 00AC0203 00170003 01680203 00000028 +.....k¯.......¯.......S...¥...C. 000180
00F246C7 D88EFFFF 881E5657 00000EC8 00000000 00000016 01400002 01120016 ......ə.........à...WV.¡...ÄúF·. 0001A0
478B260E 5EC4040E 4683FA56 89F84689 FE578826 FC478826 0E5EC404 0E468300 ..F..á^.&.G=&.W±.F½.V°.F..á^.&.G 0001C0
5EC40148 97892601 46878926 FE5688FC 46880A5E C4FE5689 FC4689FE 578826FC =&.W±.F=.V±á^..F=.V±&..F.&..H.á^ 0001E0
```

Dump of file SATURN:[PCCOMMON.DUMP.DLL]PDLDGM.TMP;1 on 18-APR-1990 10:48:18.73
File ID (766,30,0)   End of file block 195 / Allocated 196

Virtual block number 143 (0000008F), 512 (0200) bytes

```
00000102 87C72600 96010087 C7260A5E C4000000 FE87C726 019000FC 87C7260A .&ú.=...&ú.±...á^.&ú.....&ú..... 000000
0026E903 75F6460B F44688OA C4830000 FFFF9A00 6A0A76FF 0C76FF50 16F4468D .F¶.P.v..v.j.......á..F¶.F-u.Õ&. 000020
0000FFFF 9A006A06 76FF0876 FF0A76FF 0C76FF08 A76837FF 260277FF 26F45EC4 á^¶&.w.&.7hÌ..v..v..v..v.j...... 000040
000088D8 8E0008B8 1E565700 0000C8CB C95F5E1F 0000E9F2 4688F246 8910C483 .á..F·.F·Õ...^_èùà...WV.¡...Ãj.. 000060
0000E900 5E050856 88064688 D88E00C9 881E5657 000000C8 C8C95F5E 1F0000E9 Õ...^_èùà...WV¯¡è..Ã.F..V..^.Õ.. 000080
5F5E1F00 00E90002 05085688 06468808 8E00E088 1E565700 0000C8CB C95F5E1F .^_èùÃ...WV.¡Á..Ã.F..V....Õ...^_ 0000A0
5E1F0000 E9014897 88260146 87882606 5EC4088E 00FD881E 56570000 00C8C8C9 èùÃ...WV.¡»..Ãá^.&..F.&..H.Õ...ˣ 0000C0
68096AFF FF680150 684A6AFF FF680148 68088E01 1A881E56 57000000 C8C8C95F _èùà...WV.¡...ÃhH.h..jJhP.h..j.h 0000E0
830000FF FF9A006A 266A016A 160C681E 014A6815 A6681E03 6A5C6AFF FF68FFFF ¯..h..j\j..hÌ.hJ..h..j.j&j....... 000100
01680203 00000028 01380002 00870003 007E0203 0008C8C9 5F5E1F00 00E924C4 á$Õ...^_èù...-.......;.+.....k. 000120
01400002 00F50017 01530005 00D80017 01480005 00980003 00AC0203 00170003 ......¯.......K...Ã...S...¥...ə. 000140
00F246C7 D88EFFFF 881E5657 00000EC8 00000000 01120017 01430005 00000017 ......C.........à...WV.¡...ÄúF·. 000160
478B260E 5EC4040E 4683F656 89F44689 FE578826 FC478826 0E5EC404 0E468300 ..F..á^.&.G=&.W±.F¶.V-.F..á^.&.G 000180
5EC40148 97892601 46878926 FE5688FC 46880A5E C4FE5689 FC4689FE 578826FC =&.W±.F=.V±á^..F=.V±&..F.&..H.á^ 0001A0
00000102 87C72600 64010087 C7260A5E C4000000 FE87C726 012C00FC 87C7260A .&ú.=.,.&ú.±...á^.&ú...d.&ú..... 0001C0
0026E903 75FA460B F84688OA C4830000 FFFF9A00 6A0A76FF 0C76FF50 16F8468D .F½.P.v..v.j.......á..F½.F°u.Õ&. 0001E0
```

Dump of file SATURN:[PCCOMMON.DUMP.DLL]PDLDGM.TMP;1 on 18-APR-1990 10:48:18.73

File ID (766,30,0)   End of file block 195 / Allocated 196

Virtual block number 144 (00000090), 512 (0200) bytes

```
 0000FFFF 9A006A06 76FF0876 FF0A76FF 0C76FF08 A76837FF 260277FF 26F85EC4 6^½&.w.&.7hÏ..v..v..v..v.j...... 000000
 0000B808 8E0008B8 1E565700 0000C8CB C95F5E1F 0000E9F2 468BF246 8910C483 .6..F·.F·Õ...^_èùà...WV.¡...Ä¡.. 000020
 0000E900 5E050856 8B06468B D88E00C9 8B1E5657 000000C8 CBC95F5E 1F0000E9 Õ...^_èùà...WV.¡è..Ã.F..V..^.Õ.. 000040
 5F5E1F00 00E90002 05085688 06468BD8 8E00E0B8 1E565700 0000C8CB C95F5E1F .^_èùÃ...WV.¡Á..Ã.F..V....Õ...^  000060
 5E1F0000 E9014897 8B260146 87882606 5EC4D88E 00FD881E 56570000 00C8CBC9 èùÃ...WV.¡»..Ä6^.&..F.&..H.Õ...* 000080
 68096AFF FF680150 68486AFF FF680148 68D88E01 1AB81E56 57000000 C8CBC95F _èùà...WV.¡...ÄhH.h..jHh. h..j.h 0000A0
 830000FF FF9A006A 256A016A 1658681E 014A6816 10681E03 6A5C6AFF FF68FFFF ¯..h..j\j..h..hJ..hX.j.jXj.  .... 0000C0
 013B0002 00870003 007E0203 01120018 01430005 0008C8C9 5F5E1F00 00E924C4 6$Õ...^_èù....C.......~.......;. 0000E0
 01400002 00D80018 01480005 00980003 00AC0203 00170003 01680203 0000002B +.....k¯.......¯........K...Ä...â. 000100
 00F646C7 D88EFFFF B81E5657 00000EC8 00000000 00F50018 01530005 00000018 ......S...¥.....à...WV.¡...ÁúF-. 000120
 4788260E 5EC4040E 4683FA56 89F84689 FE578826 FC478B26 0E5EC404 0E468300 ..F..6^.&.G=&.W±.F%.V*.F..6^.&.G 000140
 5EC40148 97892601 46878926 FE5688FC 46880A5E C4FE5689 FC4689FE 578826FC =&.W±.F=.V±6^..F=.V±&..F.&..H.6^ 000160
 00000102 87C72600 96010087 C7260A5E C4000000 FE87C726 019000FC 87C7260A .&ú.=...&ú.±...6^.&ú.....&ú..... 000180
 0026E903 75F4460B F24688OA C4830000 FFFF9A00 6A0A76FF 0C76FF50 16F2468D .F·.P.v..v.j.......6..F·.F¶u.Õ&. 0001A0
 0000FFFF 9A006A06 76FF0876 FF0A76FF 0C76FF08 A76837FF 260277FF 26F25EC4 6^·&.w.&.7hÏ..v..v..v..v.j...... 0001C0
 0000B808 8E0008B8 1E565700 0000C8CB C95F5E1F 0000E9F6 468BF646 8910C483 .6..F~.F-Õ...^_èùà...WV.¡...Ä¡.. 0001E0
```

Dump of file SATURN:[PCCOMMON.DUMP.DLL]PDLDGM.TMP;1 on 18-APR-1990 10:48:18.73
File ID (766,30,0)   End of file block 195 / Allocated 196

Virtual block number 145 (00000091), 512 (0200) bytes

```
 0000E900 5E050856 8B06468B D88E00C9 8B1E5657 000000C8 CBC95F5E 1F0000E9 Õ...^_èùà...WV.¡è..Ã.F..V..^.Õ.. 000000
 5F5E1F00 00E90002 0508568B 06468BD8 8E00E0B8 1E565700 0000C8CB C95F5E1F .^_èùÃ...WV.¡Á..Ã.F..V....Õ...^  000020
 5E1F0000 E9014897 8B260146 87882606 5EC4D88E 00FD881E 56570000 00C8CBC9 èùÃ...WV.¡»..Ä6^.&..F.&..H.Õ...* 000040
 68096AFF FF680150 68476AFF FF680148 68D88E01 1AB81E56 57000000 C8CBC95F _èùà...WV.¡...ÄhH.h..jGhP.h..j.h 000060
 830000FF FF9A006A 216A016A 16C2681E 014A6816 5C681E03 6A5C6AFF FF68FFFF ¯..h..j\j..h\.hJ..hô.j.j¦j....... 000080
 013B0002 00870003 007E0203 00F50019 01530005 0008C8C9 5F5E1F00 00E924C4 6$Õ...^_èù....S...¥...~.......;. 0000A0
 01400002 00980003 00AC0203 01120019 01430005 00170003 01680203 0000002B +.....k¯.......C.......¯.......â. 0000C0
 040E4683 D88EFFFF B81E5657 00000EC8 00000000 00080019 01480005 00000019 ......K...Ã.....à...WV.¡...Ã.F.. 0000E0
 FE578826 FC478B26 0E5EC404 0E4683F6 5689F446 89FE578B 26FC478B 260E5EC4 6^.&.G=&.W±.F¶.V-.F..6^.&.G=&.W± 000100
 8A87C726 0A5EC401 06978926 01048789 26FE568B FC46880A 5EC4FE56 89FC4689 .F=.V±6^..F=.V±&....&....6^.&ú.¤ 000120
 5016F846 80000000 C087C726 0096008E 87C7260A 5EC40000 008C87C7 26019000 ...&ú.¥...6^.&ú./...&ú.à....F%.P 000140
 FF26F85E C40026E9 0375FA46 08F8468B 0AC48300 00FFFF9A 006A0A76 FF0C76FF .v..v.j.......6..F%.F*u.Õ&.6^½&. 000160
 468910C4 830000FF FF9A006A 0676FF08 76FF0A76 FF0C76FF 08A76837 FF260277 w.&.7hÏ..v..v..v..v.j.......6..F 000180
 5E1F0000 E90000B8 D88E0008 B81E5657 000000C8 CBC95F5E 1F0000E9 F2468BF2 ·.F·Õ...^_èùà...WV.¡...Ä¡..Õ...^ 0001A0
 8E56898C 46895C57 88265A47 88260A5E C4D88E00 C4881E56 57000076 C8CBC95F _èùàv..WV¯¡6..Ä6^.&.GZ&.W\.F..V. 0001C0
 00B2878B 260A5EC4 004CE846 C79A5689 98468900 80978826 00AE878B 260A5EC4 Ã^.&..Û.&..¯..F..V.úFÒL.6^.&..ý. 0001E0
```

Dump of file SATURN:[PCCOMMON.DUMP.DLL]PDLDGM.TMP;1 on 18-APR-1990 10:48:18.73
File ID (766,30,0)   End of file block 195 / Allocated 196

Virtual block number 146 (00000092), 512 (0200) bytes

```
 0A5EC400 B4978826 00B2878B 260A5EC4 28578926 26478926 0A5EC400 B4978826 &..Ç.6^.&.G&&.W(6^.&..ý.&..Ç.6^. 000000
 97882600 B6878826 0A5EC430 5789262E 4789260A 5EC4008C 97132600 8A870326 &..¤.&..¥.6^.&.G.&.WÒ6^.&..Ñ.&.. 000020
 8703260A 5EC400B8 97882600 B6878826 0A5EC42C 5789262A 4789260A 5EC400B8 ¡.6^.&.G*&.W,6^.&..Ñ.&..¡.6^.&.. 000040
 7F8D0026 050C568B 0A46880A 5EC43457 89263247 89260A5E C400C097 132600BE ƒ.&..à.6^.&.G2&.W46^..F..V..&... 000060
 0001CC9A 006A8C76 FF8E76FF 264F6850 16FE468D 1FA5F200 08B9DA8E 1EF08B0C ..Þ..Õ¿..·È..F±.PhO&.v..v.j..ä.. 000080
 000001F3 9A006A00 AEB7FF26 008087FF 260A5EC4 02796850 1690468D 0CC48300 ..6..F..Phy.6^.&.ñ¯.&.ñÛ.j..µ... 0000A0
 9876FF9A 76FF027F 68501694 46800000 FFFF9A14 6A5016EA 468DFE76 FF0CC483 .6..v±.Fð.Pj........F..Ph...v..v. 0000C0
 9676FF0E 6A020468 50169C46 8D5016E8 468D009C 46C60CC4 83000002 269A006A j..&....6.6F...FÒ.P.F..Ph..j..v. 0000E0
 8A468918 C4830000 FFFF9A00 6A0104B7 FF260106 B7FF260A 5EC4271A 689476FF .v.h.'6^.&.ñ..&.ñ..j.......6..F. 000100
 9276FF50 16EA468D 006A5016 9C468D00 6A0030E9 8A468800 06E90375 008A7E83 .~..u.Õ...F.Õ0.j..F..Pj..FÕ.P.v. 000120
 1F0000E9 1CC48300 00FFFF9A 006A0676 FF0876FF 0A76FF0C 76FF0320 689076FF .v.h ..v..v..v..v.j.......6.Õ... 000140
 C95F5E1F 0000E900 1C050856 8B06468B D88E00D8 8B1E5657 000000C8 CBC95F5E ^_èùà...WV.¡Û..Ã.F..V....Õ...^_è 000160
 00C8CBC9 5F5E1F00 00E90002 0508568B 06468BD8 8E027CB8 1E565700 0000C8CB ùÃ...WV.¡|..Ã.F..V....Õ...^_èùÃ. 000180
 C8CBC95F 5E1F0000 E9010697 8B260104 87882606 5EC4D88E 0299881E 56570000 ..WV.¡...Ä6^.&....&....Õ...*_èùà 0001A0
 FF68FFFF 68096AFF FF6802EC 68446AFF FF6802E4 68D88E02 B6881E56 57000000 ...WV.¡Ñ..Ähõ.h..jDhš.h..j.h¯.h. 0001C0
 00E924C4 830000FF FF9A006A 1E6A016A 1B7C681E 01086816 C6681E03 6A586AFF .j[j..hó.h...h|.j.j.j.......6$Õ. 0001E0
```

Dump of file SATURN:[PCCOMMON.DUMP.DLL]PDLDGM.TMP;1 on 18-APR-1990 10:48:18.73

```
File ID (766,30,0)   End of file block 195 / Allocated 196

Virtual block number 147 (00000093), 512 (0200) bytes

 00170003 03070203 00000028 02D70002 00870003 00790203 0008CBC9 5F5E1F00 ..^_èù....y.......■.+........... 000000
 00370003 02650203 002A0003 01A00203 0274001A 02E70005 00980003 00A70203 ..Ĩ.......Ò...t...Ù...*...e...7. 000020
 02AE001A 02DF0005 0000001A 020C0002 0291001A 02EF0005 04670000 01DE0203 ..®...g...ÿ.......É.......Ô...Û. 000040
 5689F846 89FE578B 26FC478B 260E5EC4 040E4683 D88EFFFF 881E5657 00000EC8 à...WV.¡...Ä.F..á^.&.G=&.W±.F½.V 000060
 26FE568B FC46880A 5EC4FE56 89FC4689 FE578B26 FC478B26 0E5EC404 0E4683FA '.F..á^.&.G=&.W±.F=.V±á^..F=.V±& 000080
 87C7260A 5EC40000 008C87C7 26019000 8A87C726 0A5EC401 06978926 01048789 ....&....á^.&ú.¤...&ú.¥...á^.&ú. 0000A0
 0AC48300 00FFFF9A 006A0A76 FF0C76FF 5016F246 8D000000 C087C726 0096008E ƒ...&ú.à....F·.P.v..v.j.......á. 0000C0
 76FF0A76 FF0C76FF 08A76837 FF260277 FF26F25E C40026E9 0375F446 0BF2468B .F·.F¶u.Õ&.á^·&.w.&.7hĪ..v..v..v 0000E0
 00008AC8 CBC95F5E 1F0000E9 F6468BF6 468910C4 830000FF FF9A006A 0676FF08 ..v.j.......á..F-.F-Õ...^_èùà... 000100
 AE878B26 0A5EC482 56898046 895C578B 265A478B 260A5EC4 D88E0008 881E5657 WV.¡...Äá^.&.GZ&.W\.F..V.Ž^.&..Ô 000120
 86890084 978B2600 82878B26 0A5EC400 4CE046C7 92568990 46890080 978B2600 .&..¯..F..V.úFÄL.á^.&..ÿ.&..Ç... 000140
 8B260A5E C4FF7896 89FF7686 89008897 8B260086 878B260A 5EC4FF7E 9689FF7C |...~.á^.&..Ñ.&..¡...v...x.á^.&. 000160
 56898C46 8900C097 8B26008E 878B260A 5EC4FE56 89FC4689 008C978B 26008A87 .¤.&..¥..F=.V±á^.&..ƒ.&..á..F..V 000180
 03FF7E96 8BFF7C86 8B0A5EC4 28578926 26478926 FF7E968B FF7C868B 0A5EC48E .á^...|...~.&.G&&.W(á^...|...~.. 0001A0
 2C578926 2A478926 FF78968B FF76868B 0A5EC430 5789262E 478926FE 5613FC46 F=.V±&.G.&.WOá^...v...x.&.G*&.W, 0001C0
 8B0A468B 0A5EC434 57892632 4789268E 56138C46 03FF7896 8BFF7686 8B0A5EC4 á^...v...x..F..V.&.G2&.W4á^..F.. 0001E0

Dump of file SATURN:[PCCOMMON.DUMP.DLL]PDLDGM.TMP;1 on 18-APR-1990 10:48:18.73
File ID (766,30,0)   End of file block 195 / Allocated 196

Virtual block number 148 (00000094), 512 (0200) bytes

 76FF9276 FF027968 50168446 8D1FA5F2 000889DA 8E1EF08B 0C7F8D00 26050C56 V..&.....Þ..Õ¿..·É..F..Phy..v..v 000000
 000001FB 9A006A80 76FF8276 FF264F68 5016F646 8D0CC483 000001DC 9A006A90 .j..É....á..F-.PhO&.v..v.j..«... 000020
 83000002 139A006A 00AE87FF 26008087 FF260A5E C4027968 50168446 8D0CC483 .á..F..Phy.á^.&.ñ¯.&.ñÜ.j....... 000040
 6A5016F8 468D0CC4 83000002 339A006A 9076FF92 76FF027F 68501688 468D0CC4 á..F..Ph...v..v.j..3....á..F½.Pj 000060
 FA460BF8 468B12C4 83000002 969A006A 0676FF08 76FF2714 688876FF 8A76FF0E ..v..v.h.'.v..v.j........á..F½.F' 000080
 E2468D18 88681E00 11E908C4 83026500 009A5016 E2468D18 80681E00 14E90375 u.Õ...h...Fã.P...e..á.Õ...h...Fã 0000A0
 8A76FF0E 6A020468 50169446 8D5016E0 46800094 46C608C4 83FFFF00 009A5016 .P......á.óF...FÅ.P.F..Ph..j..v. 0000C0
 7A868918 C4830000 FFFF9A00 6A0104B7 FF260106 B7FF260A 5EC4271A 688876FF .v.h.'á^.&.ñ..&.ñ..j.......á...z 0000E0
 5016E246 8D006A50 1694468D 006A0030 E9FF7A86 880007E9 037500FF 7ABE83FF ../z..u.Õ....z.ÕO.j..F..Pj..Fã.P 000100
 E91CC483 0000FFFF 9A006A06 76FF0876 FF0A76FF 0C76FF03 20688476 FF8676FF .v..v.h ..v..v..v..v.j.......á.Õ 000120
 1F0000E9 001C0508 56880646 88088E00 C4881E56 57000000 C8CBC95F 5E1F0000 ...^_èùà...WV.¡á..Ä.F..V....Õ... 000140
 0000E901 06978826 0104878B 26065EC4 D88E02EF 881E5657 000000C8 CBC95F5E ^_èùã...WV.¡ÿ..Äá^.&....&....Õ.. 000160
 5F5E1F00 00E90002 0508568B 06468BD8 8E030C88 1E565700 0000C8CB C95F5E1F .ˣ_èùà...WV.¡...Ä.F..V....Õ...^_ 000180
 FF68096A FFFF6803 5F68426A FFFF6803 5768D88E 0320881E 56570000 00C8CBC9 èùã...WV.¡-..ÄhW.h..jBh_.h..j.h¯ 0001A0
 C4830000 FFFF9A00 6A2E6A01 6A197668 1E010868 1892681E 036A586A FFFF68FF .h..j[j..h..h..hv.j.j.j̃.......á 0001C0
 02510002 00870003 00790203 0325001B 03620005 000890CB C95F5E1F 0000E924 $Õ...^_èù.....b...X...y.......Q. 0001E0

Dump of file SATURN:[PCCOMMON.DUMP.DLL]PDLDGM.TMP;1 on 18-APR-1990 10:48:18.73
File ID (766,30,0)   End of file block 195 / Allocated 196

Virtual block number 149 (00000095), 512 (0200) bytes

 01C40203 00980003 00A70203 00170003 037A0203 0000002B 034A0002 0000002A *.....J.+.....z........Ĩ.......á. 000000
 034F0002 0304001B 03520005 00370003 02D80203 02E7001B 035A0005 002A0003 ..*...Z...Ó...Ä...7...R.......O. 000020
 040E4683 D88EFFFF 881E5657 00000EC8 00000000 00000000 00000000 0000001B ................à...WV.¡...Ä.F.. 000040
 FE578B26 FC478B26 0E5EC404 0E4683F6 5689F446 89FE578B 26FC478B 260E5EC4 á^.&.G=&.W±.F¶.V-.F..á^.&.G=&.W± 000060
 8A87C726 0A5EC401 06978926 01048789 26FE568B FC46880A 5EC4FE56 89FC4689 .F=.V±á^..F=.V±&....&....á^.&ú.¤ 000080
 5016F846 8D000000 C087C726 0096008E 87C7260A 5EC40000 008C87C7 26019000 ...&ú.¥...á^.&ú.ƒ...&ú.à....F½.P 0000A0
 FF26F85E C40026E9 0375FA46 0BF8468B 0AC48300 00FFFF9A 006A0A76 FF0C76FF .v..v.j.......á..F½.F'u.Õ&.á^½&. 0000C0
 468910C4 830000FF FF9A006A 0676FF08 76FF0A76 FF0C76FF 08A76837 FF260277 w.&.7hĪ..v..v..v..v.j.......á..F 0000E0
 265A478B 260A5EC4 D88E0008 881E5657 000086C8 CBC95F5E 1F0000E9 F2468BF2 ·.F·Õ...^_èùà...WV.¡...Äá^.&.GZ& 000100
 4CE446C7 96568994 46890080 978B2600 AE878B26 0A5EC486 56898446 895C578B .W\.F..V.Ž^.&..Û.&..¯..F..V.úFÕL 000120
 8B978B26 00B6878B 260A5EC4 82568980 468900B4 978B2600 82878B26 0A5EC400 .á^.&..ÿ.&..Ç..F..V.á^.&..Ñ.&..¡ 000140
 260A5EC4 FE5689FC 468900BC 978B2600 8A878B26 0A5EC4FF 7C9689FF 7A868900 ...z...|.á^.&..¤.&..¥..F=.V±á^.& 000160
 28578926 26478926 82568880 468B0A5E C4925689 90468900 C0978B26 008E878B ..ƒ.&..à..F..V.á^..F..V.&.G&&.W( 000180
 9688FF7A 86880A5E C4305789 262E4789 26FE5613 FC460382 56888046 880A5EC4 á^..F..V..F=.V±&.G.&.WOá^...z... 0001A0
 26324789 26925613 904603FF 7C9688FF 7A86880A 5EC42C57 89262A47 8926FF7C |.&.G*&.W,á^...z...|..F..V.&.G2& 0001C0
 FA468D1F A5F20008 89DA8E1E F08B0C7F 8D002605 0C56880A 46880A5E C4345789 .W4á^..F..V..&.....Þ..Õ¿..·É..F' 0001E0

Dump of file SATURN:[PCCOMMON.DUMP.DLL]PDLDGM.TMP;1 on 18-APR-1990 10:48:18.73
```

File ID (766,30,0)   End of file block 195 / Allocated 196

Virtual block number 150 (00000096), 512 (0200) bytes

```
0A5EC402 79685016 8846800C C4830000 01D09A00 6A8476FF 8676FF26 4F685016 .PhO&.v..v.j..ĩ....á..F..Phy.á^. 000000
FF9A146A 5016E646 8DFA76FF 0CC48300 0002049A 006A00AE B7FF2600 B0B7FF26 &.ñ¯.&.ñÜ.j.......á..v*.Fl.Pj... 000020
8D009846 C60CC483 00000237 9A006A94 76FF9676 FF027F68 50168C46 8D0000FF ....F..Ph...v..v.j..7....á.6F... 000040
26010687 FF260A5E C4271A68 8C76FF8E 76FF0E6A 02046850 16984680 5016E446 Fô.P.F..Ph..j..v..v.h.'á^.&.ñ..& 000060
FF7E868B 0007E903 7500FF7E BE83FF7E 868918C4 830000FF FF9A006A 010487FF .ñ..j.......á...~../~..u.Õ....~. 000080
0A76FF0C 76FF0320 688876FF 8A76FF50 16E64680 006A5016 98468D00 6A0030E9 Õ0.j..F..Pj..Fl.P.v..v.h ..v..v. 0000A0
B81E5657 000000C8 CBC95F5E 1F0000E9 1CC48300 00FFFF9A 006A0676 FF0876FF .v..v.j.......á.Õ...^_èùà...WV.¡ 0000C0
56880646 88D88E02 90881E56 57000000 C8CBC95F 5E1F0000 E90000B8 D88E00C4 á..Ä¡..Õ...^_èùà...WV.¡...Ä.F..V 0000E0
02050856 88064688 D88E02A7 B81E5657 000000C8 CBC95F5E 1F0000E9 001C0508 ....Õ...^_èùã...WV.¡Ĩ..Ä.F..V... 000100
97882601 04878826 065EC4D8 8E02C488 1E565700 0000C8CB C95F5E1F 0000E900 .Õ...^_èùã...WV.¡á..Äá^.&....&.. 000120
1768386A FFFF6803 0F68088E 02E1881E 56570000 00C8CBC9 5F5E1F00 00E90106 ..Õ...*_èùà...WV.¡Ä..Äh..h..j;h. 000140
6A106A01 6A1AD668 1E010868 197A681E 036A5D6A FFFF68FF FF68096A FFFF6803 .h..j.h¯.h..j]j..hz.h...h•.j.j.j 000160
03120005 00870003 00790203 000B90C8 C95F5E1F 0000E924 C4830000 FFFF9A00 .......á$Õ...^_èù.....y......... 000180
031A0005 00980003 00A70203 00170003 03320203 0000002B 03020002 029F001C ........+.....Ž.......Ĩ......... 0001A0
030A0005 04670000 01EF0203 00370003 02790203 002A0003 018E0203 028C001C ..¥.../...*...y...7...ÿ...g..... 0001C0
040E4683 D88EFFFF B81E5657 00000EC8 00000000 0000001C 03070002 02D9001C ..l.............à...WV.¡...Ä.F.. 0001E0
```

Dump of file SATURN:[PCCOMMON.DUMP.DLL]PDLDGM.TMP;1 on 18-APR-1990 10:48:18.73
File ID (766,30,0)   End of file block 195 / Allocated 196

Virtual block number 151 (00000097), 512 (0200) bytes

```
FE578826 FC478826 0E5EC404 0E4683F6 5689F446 89FE5788 26FC4788 260E5EC4 á^.&.G•&.W±.F¶.V-.F..á^.&.G•&.W± 000000
8A87C726 0A5EC401 06978926 01048789 26FE568B FC46880A 5EC4FE56 89FC4689 .F•.V±á^..F•.V±&....&....á^.&ú.¤ 000020
5016F846 8D000000 C087C726 009600BE 87C7260A 5EC40000 008C87C7 26019000 ...&ú.¥...á^.&ú./...&ú.á....F½.P 000040
FF26F85E C40026E9 0375FA46 0BF8468B 0AC48300 00FFFF9A 006A0A76 FF0C76FF .v..v.j.......á..F½.F*u.Õ&.á^½&. 000060
468910C4 830000FF FF9A006A 0676FF08 76FF0A76 FF0C76FF 08A76837 FF260277 w.&.7hĩ..v..v..v..v.j.......á..F 000080
265A4788 260A5EC4 D88E0008 B81E5657 000086C8 CBC95F5E 1F0000E9 F24688F2 ·.F·Õ...^_èùà...WV.¡...Äá^.&.GZ& 0000A0
4CE446C7 96568994 46890080 97882600 AE878826 0A5EC486 56898446 895C5788 .W\.F..V.ã^.&..Ü.&..¯..F..V.úFÕL 0000C0
88978826 00868788 260A5EC4 82568980 46890084 97882600 82878826 0A5EC400 .á^.&..ý.&..Ç..F..V.á^.&..Ñ.&..¡ 0000E0
260A5EC4 FE5689FC 4689008C 97882600 8A878826 0A5EC4FF 7C9689FF 7A868900 ...z...|.á^.&..¤.&..¥..F•.V±á^.& 000100
28578926 26478926 82568880 46880A5E C4925689 90468900 C0978826 008E8788 ../.&..á..F..V.á^..F..V.&.G&&.W( 000120
9688FF7A 86880A5E C4305789 262E4789 26FE5613 FC460382 56888046 880A5EC4 á^..F..V..F•.V±&.G.&.WÕá^...z... 000140
26324789 26925613 904603FF 7C9688FF 7A86880A 5EC42C57 89262A47 8926FF7C |.&.G*&.W,á^...z...|..F..V.&.GZ& 000160
FA46801F A5F20008 89DA8E1E F0880C7F 8D002605 0C56880A 46880A5E C4345789 .Wá^..F..V..&.....Þ..ÕŁ..·E..F* 000180
0A5EC402 79685016 8846800C C4830000 01009A00 6A8476FF 8676FF26 4F685016 .PhO&.v..v.j..ĩ....á..F..Phy.á^. 0001A0
FF9A146A 5016E646 8DFA76FF 0CC48300 0002049A 006A00AE 87FF2600 B0B7FF26 &.ñ¯.&.ñÜ.j.......á..v*.Fl.Pj... 0001C0
8D009846 C60CC483 00000237 9A006A94 76FF9676 FF027F68 50168C46 8D0000FF ....F..Ph...v..v.j..7....á.6F... 0001E0
```

Dump of file SATURN:[PCCOMMON.DUMP.DLL]PDLDGM.TMP;1 on 18-APR-1990 10:48:18.73
File ID (766,30,0)   End of file block 195 / Allocated 196

Virtual block number 152 (00000098), 512 (0200) bytes

```
26010687 FF260A5E C4271A68 8C76FF8E 76FF0E6A 02046850 1698468D 5016E446 Fô.P.F..Ph..j..v..v.h.'á^.&.ñ..& 000000
FF7E868B 0007E903 7500FF7E BE83FF7E 868918C4 830000FF FF9A006A 010487FF .ñ..j.......á...~../~..u.Õ....~. 000020
0A76FF0C 76FF0320 688876FF 8A76FF50 16E6468D 006A5016 98468D00 6A0030E9 Õ0.j..F..Pj..Fl.P.v..v.h ..v..v. 000040
B81E5657 000000C8 CBC95F5E 1F0000E9 1CC48300 00FFFF9A 006A0676 FF0876FF .v..v.j.......á.Õ...^_èùà...WV.¡ 000060
56880646 88D88E02 90881E56 57000000 C8CBC95F 5E1F0000 E9000088 D88E00C4 á..Ä¡..Õ...^_èùà...WV.¡...Ä.F..V 000080
02050856 8806468B D88E02A7 B81E5657 000000C8 CBC95F5E 1F0000E9 001C0508 ....Õ...^_èùã...WV.¡Ĩ..Ä.F..V... 0000A0
97882601 04878826 065EC4D8 8E02C488 1E565700 0000C8CB C95F5E1F 0000E900 .Õ...^_èùã...WV.¡á..Äá^.&....&.. 0000C0
17683A6A FFFF6803 0F68088E 02E1881E 56570000 00C8CBC9 5F5E1F00 00E90106 ..Õ...*_èùà...WV.¡Ä..Äh..h..j:h. 0000E0
6A116A01 6A1C1868 1E010868 1ADA681E 036A5D6A FFFF68FF FF68096A FFFF6803 .h..j.h¯.h..j]j..hÕ.h...h..j.j.j 000100
03020002 00870003 00790203 000B90C8 C95F5E1F 0000E924 C4830000 FFFF9A00 .......á$Õ...^_èù.....y......... 000120
018E0203 029F001D 03120005 00980003 00A70203 00170003 03320203 0000002B +.....2.......Ĩ...............ƒ. 000140
03070002 028C001D 031A0005 0467000D 01EF0203 00370003 02790203 002A0003 ..*...y...7...ÿ...g.......¥..... 000160
00F646C7 D88EFFFF B81E5657 00000EC8 00000000 0209001D 030A0005 0000001D ..........l.....à...WV.¡...ÄúF-. 000180
4788260E 5EC4040E 4683FA56 89F84689 FE578826 FC478826 0E5EC404 0E468300 ..F..á^.&.G•&.W±.F½.V*.F..á^.&.G 0001A0
5EC40106 97892601 04878926 FE5688FC 46880A5E C4FE5689 FC4689FE 578826FC •&.W±.F•.V±á^..F•.V±&....&....á^ 0001C0
000000C0 87C72600 96008E87 C7260A5E C4000000 BC87C726 0190008A 87C7260A .&ú.¤...&ú.¥...á^.&ú./...&ú.á... 0001E0
```

Dump of file SATURN:[PCCOMMON.DUMP.DLL]PDLDGM.TMP;1 on 18-APR-1990 10:48:18.73

File ID (766,30,0)   End of file block 195 / Allocated 196

Virtual block number 153 (00000099), 512 (0200) bytes

```
0026E903 75F4460B F246880A C4830000 FFFF9A00 6A0A76FF 0C76FF50 16F2468D .F·.P.v..v.j........á..F·.F¶u.Õ&. 000000
0000FFFF 9A006A06 76FF0876 FF0A76FF 0C76FF08 A76837FF 260277FF 26F25EC4 á^·&.w.&.7hI..v..v..v..v.j...... 000020
0A5EC4D8 8E000888 1E565700 0076C8CB C95F5E1F 0000E9F6 4688F646 8910C483 .á..F-.F-Õ...^_èùàv..WV.¡_..Äá^. 000040
56899846 8900B097 882600AE 878B260A 5EC48E56 898C4689 5C578B26 5A478B26 &.GZ&.W\.F..V.Õ^.&..Ü.&..¯..F..V 000060
5EC42857 89262647 89260A5E C4008497 882600B2 878B260A 5EC4004C E846C79A .úFÒL.á^.&..ý.&..Ç.á^.&.G&&.W(á^ 000080
262E4789 260A5EC4 00BC9713 26008A87 03260A5E C4008497 882600B2 878B260A .&..ý.&..Ç.á^.&..¤.&..¥.á^.&.G.& 0000A0
88260A5E C42C5789 262A4789 260A5EC4 00889788 26008687 88260A5E C4305789 .WÒá^.&..Ñ.&..¡.á^.&.G*&.W,á^.&. 0000C0
34578926 32478926 0A5EC400 C0971326 00BE8703 260A5EC4 00889788 26008687 .Ñ.&..¡.á^.&../.&..â.á^.&.GZ&.W4 0000E0
685016FE 46801FA5 F2000889 DA8E1EF0 880C7F8D 0026050C 56880A46 880A5EC4 á^..F..V..&.....Þ..Ö¿..·Ê..F±.Ph 000100
B7FF260A 5EC40279 68501690 46800CC4 83000001 BA9A006A 8C76FF8E 76FF264F O&.v..v.j..¤....á..F..Phy.á^.&.ñ 000120
0000FFFF 9A146A50 16EA468D FE76FF0C C4830000 01E19A00 6A00AEB7 FF260080 ¯.&.ñÜ.j..Ã....á..v±.Fõ.Pj...... 000140
16E8468D 009C46C6 0CC48300 0002149A 006A9876 FF9A76FF 027F6850 1694468D .F..Ph...v..v.j.........á.óF...FÒ. 000160
04B7FF26 010687FF 260A5EC4 271A6894 76FF9676 FF0E6A02 04685016 9C468D50 P.F..Ph..j..v..v.h.'á^.&.ñ..&.ñ. 000180
8D006A00 30E98A46 880006E9 0375008A 7E838A46 8918C483 0000FFFF 9A006A01 .j.......á..F..-..u.Õ...F.Õ0.j.. 0001A0
0676FF08 76FF0A76 FF0C76FF 03206890 76FF9276 FF5016EA 4680006A 50169C46 F..Pj..Fõ.P.v..v.h ..v..v..v..v. 0001C0
00B8D88E 00C9881E 56570000 00C8CBC9 5F5E1F00 00E91CC4 830000FF FF9A006A j.......á.Õ...^_èùà...WV.¡è..Ä¡. 0001E0
```

Dump of file SATURN:[PCCOMMON.DUMP.DLL]PDLDGM.TMP;1 on 18-APR-1990 10:48:18.73
File ID (766,30,0)   End of file block 195 / Allocated 196

Virtual block number 154 (0000009A), 512 (0200) bytes

```
00E9001C 05085688 06468808 8E026A88 1E565700 0000C8C8 C95F5E1F 0000E900 .Õ...^_èùà...WV.¡j..Ã.F..V....Õ. 000000
5E1F0000 E9000205 08568806 4688D88E 0281881E 56570000 00C8CBC9 5F5E1F00 ..^_èùÃ...WV.¡...Ã.F..V....Õ...^ 000020
1F0000E9 0106978B 26010487 8826065E C4D88E02 9E881E56 57000000 C8CBC95F _èùÃ...WV.¡...Äá^.&....&....Õ... 000040
096AFFFF 6802F168 386AFFFF 6802E968 D88E02B8 881E5657 000000C8 CBC95F5E ⁎_èùà...WV.¡£..ÄhÕ.h..j8hþ.h..j. 000060
0000FFFF 9A006A1F 6A016A1C E2681E01 08681C1C 681E036A 586AFFFF 68FFFF68 h̄..h..j[j..h..h...hã.j.j.j...... 000080
02030000 0028020C 00020087 0003007E 02030008 90CBC95F 5E1F0000 E924C483 .á$Õ...^_èù....¯.......Ê.+..... 0000A0
0203002A 0003019B 02030279 001E02EC 0005009B 000300AC 02030017 0003030C ........¯.......š...y.......•... 0000C0
00020283 001E02E4 00050296 001E02F4 00050467 000001CC 02030037 00030253 S...7...ä...g...¶.......Õ...•... 0000E0
00F246C7 D88EFFFF 881E5657 00000EC8 00000000 00000000 00000000 001E02E1 Ã..............à...WV.¡...ÄúF·. 000100
4788260E 5EC4040E 4683FA56 89F84689 FE578826 FC478826 0E5EC404 0E468300 ..F..á^.&.G=&.W±.F½.Vº.F..á^.&.G 000120
5EC40106 97892601 04878926 FE5688FC 46880A5E C4FE5689 FC4689FE 578826FC =&.W±.F=.V±á^..F=.V±&....&....á^ 000140
000000C0 87C72600 96008E87 C7260A5E C4000000 8C87C726 0190008A 87C7260A .&ú.¤...&ú.¥...á^.&ú./...Sú.â... 000160
0026E903 75F64608 F446880A C4830000 FFFF9A00 6A0A76FF 0C76FF50 16F4468D .F¶.P.v..v.j.......á..F¶.F-··Õ&. 000180
0000FFFF 9A006A06 76FF0876 FF0A76FF 0C76FF08 A76837FF 260277FF 26F45EC4 á^¶&.w.&.7hI..v..v..v..v.j...... 0001A0
00008808 8E000888 1E565700 0000C8CB C95F5E1F 0000E9F2 4688F246 8910C483 .á..F·.F·Õ...^_èùà...WV.¡...Ä¡.. 0001C0
895C578B 265A478B 260A5EC4 D88E00C9 881E5657 000076C8 CBC95F5E 1F0000E9 Õ...^_èùàv..WV.¡è..Äá^.&.GZ&.W\. 0001E0
```

Dump of file SATURN:[PCCOMMON.DUMP.DLL]PDLDGM.TMP;1 on 18-APR-1990 10:48:18.73
File ID (766,30,0)   End of file block 195 / Allocated 196

Virtual block number 155 (0000009B), 512 (0200) bytes

```
0A5EC400 4CE846C7 9A568998 46890080 97882600 AE878826 0A5EC48E 56898C46 F..V.á^.&..Ü.&..¯..F..V.úFÒL.á^. 000000
97882600 B2878B26 0A5EC428 57892626 4789260A 5EC400B4 97882600 B2878B26 &..ý.&..Ç.á^.&.G&&.W(á^.&..ý.&.. 000020
878B260A 5EC43057 89262E47 89260A5E C4008C97 1326008A 8703260A 5EC400B4 Ç.á^.&..¤.&..¥.á^.&.G.&.WÒá^.&.. 000040
C4008897 88260086 878B260A 5EC42C57 89262A47 89260A5E C4008897 88260086 Ñ.&..¡.á^.&.G*&.W,á^.&..Ñ.&..¡.á 000060
0C56880A 46880A5E C4345789 26324789 260A5EC4 00C09713 26008E87 03260A5E ^.&../.&..â.á^.&.GZ&.W4á^..F..V. 000080
6A8C76FF 8E76FF26 4F685016 FE468D1F A5F20008 890A8E1E F0880C7F 8D002605 .&.....Þ..Ö¿..·Ê..F±.PhO&.v..v.j 0000A0
006A00AE B7FF2600 8087FF26 0A5EC402 79685016 9046800C C4830000 01D19A00 ..Ì....á..F..Phy.á^.&.ñ¯.&.ñÜ.j. 0000C0
FF027F68 50169446 800000FF FF9A146A 5016EA46 80FE76FF 0CC48300 0001F89A .½....á..v±.Fõ.Pj.......F..Ph... 0000E0
02046850 169C4680 5016E846 80009C46 C60CC483 00000228 9A006A98 76FF9A76 v..v.j..+....á.óF...FÒ.P.F..Ph.. 000100
830000FF FF9A006A 010487FF 260106B7 FF260A5E C4271A68 9476FF96 76FF0E6A j..v..v.h.'á^.&.ñ..&.ñ..j....... 000120
EA468D00 6A50169C 4680006A 0030E98A 46880006 E9037500 8A7E838A 468918C4 á..F..~..u.Õ...F.Õ0.j..F..Pj..Fõ 000140
C4830000 FFFF9A00 6A0676FF 0876FF0A 76FF0C76 FF032068 9076FF92 76FF5016 .P.v..v.h ..v..v..v..v.j.......á 000160
00E9001C 05085688 06468808 8E00E088 1E565700 0000C8CB C95F5E1F 0000E91C .Õ...^_èùà...WV.¡Â..Ã.F..V....Õ. 000180
5E1F0000 E9000205 08568806 4688D88E 0281881E 56570000 00C8CBC9 5F5E1F00 ..^_èùÃ...WV.¡...Ã.F..V....Õ...^ 0001A0
1F0000E9 0106978B 26010487 8826065E C4D88E02 9E881E56 57000000 C8CBC95F _èùÃ...WV.¡...Äá^.&....&....Õ... 0001C0
096AFFFF 6802F168 376AFFFF 6802E968 D88E0288 881E5657 000000C8 CBC95F5E ⁎_èùà...WV.¡£..ÄhÕ.h..j7hþ.h..j. 0001E0
```

Dump of file SATURN:[PCCOMMON.DUMP.DLL]PDLDGM.TMP;1 on 18-APR-1990 10:48:18.73

```
File ID (766,30,0)   End of file block 195 / Allocated 196

Virtual block number 156 (0000009C), 512 (0200) bytes

0000FFFF 9A006A14 6A016A1D E8681E01 08681CE6 681E036A 5B6AFFFF 68FFFF68 h..h..j[j..h].h...hÒ.j.j.j...... 000000
00020087 0003007E 020302B3 001F02E4 0005000B 90CBC95F 5E1F0000 E924C483 .á$Õ...^_èù.....Õ...*...-....... 000020
0203002A 000301B2 0203009B 000300AC 02030017 0003030C 02030000 002B02DC É.+.............. .......ý...*... 000040
00020296 001F02F4 00050279 001F02EC 00050467 000D01E3 02030037 0003026A j...7...D...g...$...y...¶....... 000060
00F246C7 D88EFFFF B81E5657 00000EC8 00000000 00000000 00000000 001F02E1 Å...............à...WV.|...ÄúF·. 000080
478B260E 5EC4040E 4683FA56 89F84689 FE578B26 FC478B26 0E5EC404 0E468300 ..F..á^.&.G=&.W±.F½.V".F..á^.&.G 0000A0
5EC40106 97892601 04878926 FE568BFC 46880A5E C4FE5689 FC4689FE 578B26FC =&.W±.F=.V±á^..F=.V±&....&....á^ 0000C0
000000C0 87C72600 9600BE87 C7260A5E C4000000 BC87C726 0190008A 87C7260A .&ú.¤...&ú.¥...á^.&ú.ƒ...&ú.â... 0000E0
0026E903 75F6460B F446880A C4830000 FFFF9A00 6A0A76FF 0C76FF50 16F44680 .F¶.P.v..v.j........á..F¶.F-u.Õ&. 000100
0000FFFF 9A006A06 76FF0876 FF0A76FF 0C76FF08 A76837FF 260277FF 26F45EC4 á^¶&.w.&.7hÏ..v..v..v..v.j...... 000120
0A5EC4D8 8E000888 1E565700 0076C8CB C95F5E1F 0000E9F2 468BF246 8910C483 .á..F·.F·Õ...^_èùàv..WV.|_..Äá^. 000140
56899846 8900B097 8B2600AE 878B260A 5EC48E56 898C4689 5C578B26 5A478B26 &.GZ&.W\.F..V.Z^.&..Û.&..¯..F..V 000160
5EC42857 89262647 89260A5E C4008497 8B260082 878B260A 5EC4004C E846C79A .úFÒL.á^.&..ý.&..Ç.á^.&.G&&.W(á^ 000180
262E4789 260A5EC4 008C9713 2600BA87 03260A5E C4008497 8B260082 878B260A .&..ý.&..Ç.á^.&..¤.&..¥.á^.&.G.& 0001A0
8B260A5E C42C5789 262A4789 260A5EC4 00B8978B 26008687 8B260A5E C4305789 .WÓá^.&..Ñ.&..|.á^.&.G*&.W,á^.&. 0001C0
34578926 32478926 0A5EC400 C0971326 008E8703 260A5EC4 00B8978B 26008687 .Ñ.&..|.á^.&..ƒ.&..ã.á^.&.GZ&.W4 0001E0

Dump of file SATURN:[PCCOMMON.DUMP.DLL]POLDGM.TMP;1 on 18-APR-1990 10:48:18.73
File ID (766,30,0)   End of file block 195 / Allocated 196

Virtual block number 157 (0000009D), 512 (0200) bytes

685016FE 468D1FA5 F20008B9 DA8E1EF0 8B0C7F8D 0026050C 568B0A46 8B0A5EC4 á^..F..V..&.....þ..Ö¿..·E..^±.Ph 000000
B7FF260A 5EC40279 68501690 468D0CC4 83000001 8A9A006A 8C76FF8E 76FF264F O&.v..v.j..¤....á..F..Phy.á^.&.ñ 000020
0000FFFF 9A146A50 16EA468D FE76FF0C C4830000 01E19A00 6A00AE87 FF26008B ¯.&.ñÜ.j..Ã....á..v±.Fõ.Pj....... 000040
16E8468D 009C46C6 0CC48300 0002149A 006A9876 FF9A76FF 027F6850 1694468D .F..Ph...v..v.j........á.óF...FÒ. 000060
04B7FF26 010687FF 260A5EC4 271A6894 76FF9676 FF0E6A02 04685016 9C468D50 P.F..Ph..j..v..v.h.'á^.&.ñ..&.ñ. 000080
8D006A00 30E98A46 8B0006E9 0375008A 7E838A46 8918C483 0000FFFF 9A006A01 .j........á..F..~..u.Õ...F.ÕO.j.. 0000A0
0676FF08 76FF0A76 FF0C76FF 03206890 76FF9276 FF5016EA 4680006A 50169C46 F..Pj..Fõ.P.v..v.h ..v..v..v..v. 0000C0
00B8D08E 00C9881E 56570000 00C8CBC9 5F5E1F00 00E91CC4 830000FF FF9A006A j........á.Õ...^_èùà...WV.|è..Ä|. 0000E0
00E9001C 0508568B 06468BD8 8E026A8B 1E565700 0000C8CB C95F5E1F 0000E900 .Õ...^_èùà...WV.|j..Ä.F..V....Õ. 000100
5E1F0000 E9000205 08568B06 468BD08E 0281B81E 56570000 00C8CBC9 5F5E1F00 ..^_èùà...WV.|...Ä.F..V....Õ...^ 000120
1F0000E9 0106978B 26010487 8B26065E C4D88E02 9EB81E56 57000000 C8CBC95F _èùà...WV.|...Äá^.&....&....Õ... 000140
096AFFFF 6802F168 366AFFFF 6802E968 D88E02BB B81E5657 000000C8 CBC95F5E ¯_èùà...WV.|É..ÄhÕ.h..jóhþ.h..j. 000160
0000FFFF 9A006A13 6A016A1E EE681E01 08681DEC 681E036A 5B6AFFFF 68FFFF68 h..h..j[j..h$.h...hŸ.j.j.j...... 000180
02030296 002002F4 00050000 002002E1 0002000B 90CBC95F 5E1F0000 E924C483 .á$Õ...^_èù.....Ã. .....¶. ..... 0001A0
0005009B 000300AC 02030017 0003030C 02030000 002B020C 00020087 0003007E -........É.+.............. ...... 0001C0
00050467 000D01CC 02030037 00030253 0203002A 0003019B 020302B3 002002E4 õ. .*.......*...S...7...ë...g... 0001E0

Dump of file SATURN:[PCCOMMON.DUMP.DLL]POLDGM.TMP;1 on 18-APR-1990 10:48:18.73
File ID (766,30,0)   End of file block 195 / Allocated 196

Virtual block number 158 (0000009E), 512 (0200) bytes

00F646C7 D88EFFFF B81E5657 00000EC8 00000000 00000000 00000279 002002EC &. .y...........à...WV.|...ÄúF-. 000000
478B260E 5EC4040E 4683FA56 89F84689 FE578B26 FC478B26 0E5EC404 0E468300 ..F..á^.&.G=&.W±.F½.V".F..á^.&.G 000020
5EC40106 97892601 04878926 FE568BFC 46880A5E C4FE5689 FC4689FE 578B26FC =&.W±.F=.V±á^..F=.V±&....&....á^ 000040
000000C0 87C72600 9600BE87 C7260A5E C4000000 BC87C726 0190008A 87C7260A .&ú.¤...&ú.¥...á^.&ú.ƒ...&ú.â... 000060
0026E903 75F6460B F246880A C4830000 FFFF9A00 6A0A76FF 0C76FF50 16F2468D .F·.P.v..v.j........á..F·.F¶u.Õ&. 000080
0000FFFF 9A006A06 76FF0876 FF0A76FF 0C76FF08 A76837FF 260277FF 26F25EC4 á^·&.w.&.7hÏ..v..v..v..v.j...... 0000A0
0A5EC4D8 8E000888 1E565700 001EC8CB C95F5E1F 0000E9F6 468BF646 8910C483 .á..F-.F-Õ...^_èùà...WV.|...Äá^. 0000C0
89260A5E C4008497 8B260082 878B260A 5EC4E456 89E24689 5C578B26 5A478B26 &.GZ&.W\.Fã.VÕZ^.&..ý.&..Ç.á^.&. 0000E0
008C9713 2600BA87 03260A5E C4008497 8B260082 878B260A 5EC42857 89262647 G&&.W(á^.&..ý.&..Ç.á^.&..¤.&..¥. 000100
262A4789 260A5EC4 00B8978B 26008687 8B260A5E C4305789 262E4789 260A5EC4 á^.&.G.&.WOá^.&..Ñ.&..|.á^.&.G*& 000120
0A5EC400 C0971326 00BE8703 260A5EC4 00B8978B 26008687 8B260A5E C42C5789 .W,á^.&..Ñ.&..|.á^.&..ƒ.&..ã.á^. 000140
F20008B9 DABE1EF0 8B0C7F8D 0026050C 56880A46 880A5EC4 34578926 32478926 &.GZ&.W4á^..F..V..&.....þ..Ö¿..· 000160
685016E6 468D0CC4 83000001 A29A006A E276FFE4 76FF264F 685016FE 46801FA5 É..F±.PhO&.vÕ.vãj..Ã....á..F|.Ph 000180
16EA468D FE76FF0C C4830000 FFFF9A00 6A00AEB7 FF26008B B7FF260A 5EC40279 y.á^.&.ñ¯.&.ñÜ.j.......á..v±.Fõ. 0001A0
FF0B76FF 0A76FF0C 76FF0320 68E676FF E876FF50 16EA468D 0000FFFF 9A146A50 Pj.......Fõ.P.vÕ.v|h ..v..v..v.. 0001C0
D88E00C9 B81E5657 000000C8 CBC95F5E 1F0000E9 14C48300 00FFFF9A 006A0676 v.j.......á.Õ...^_èùà...WV.|è..Ä 0001E0

Dump of file SATURN:[PCCOMMON.DUMP.DLL]POLDGM.TMP;1 on 18-APR-1990 10:48:18.73
```

File ID (766,30,0)   End of file block 195 / Allocated 196

Virtual block number 159 (0000009F), 512 (0200) bytes

```
001C0508 56880646 88088E01 EC881E56 57000000 C8C8C95F 5E1F0000 E90000B8 j..ő...^_èùà...WV.¡š..Ä.F..V.... 000000
0000E900 02050856 8B06468B D88E0203 B81E5657 000000C8 CBC95F5E 1F0000E9 Ő...^_èùã...WV.¦...Ä.F..V....Ő.. 000020
00E90106 97882601 04878826 065EC4D8 8E0220B8 1E565700 0000C8CB C95F5E1F .^_èùã...WV.¡ ..Äá^.&....&....Ő. 000040
FFFF6802 7368506A FFFF6802 6B68D88E 023D881E 56570000 00C8CBC9 5F5E1F00 ..ˣ_èùà...WV.¡=..Ähk.h..jPhs.h.. 000060
FFFF9A00 6A186A01 6A1F7C68 1E010868 1EF2681E 036A5A6A FFFF68FF FF68096A j.h¯.h..jZj..h·.h...h|.j.j.j.... 000080
01FB0021 026E0005 00000021 02630002 000B90CB C95F5E1F 0000E924 C4830000 ...á$ő...^_èù.....c.!.....n.!.«. 0000A0
009B0003 00AC0203 00170003 028E0203 0000002B 025E0002 00870003 007E0203 ..~.......ˣ.+...............¯..... 0000C0
0467000D 01B40203 00370003 01D50203 002A0003 01830203 02180021 02760005 ..v.!.........*...f...7...Ç...g. 0000E0
00F246C7 D88EFFFF B81E5657 00000EC8 00000000 00000000 02350021 02660005 ..f.!.5.........à...WV.¡...ÄúF·. 000100
4788260E 5EC4040E 4683F656 89F44689 FE578826 FC478826 0E5EC404 0E468300 ..F..á^.&.G=&.W±.F¶.V-.F..á^.&.G 000120
5EC40106 97892601 04878926 FA5688F8 46880A5E C4FA5689 F84689FE 578826FC =&.W±.F½.V*á^..F½.V*&....&....á^ 000140
000000C0 87C72600 96008E87 C7260A5E C4000000 BC87C726 0190008A 87C7260A .&ú.¤...&ú.¥...á^.&ú.ƒ...&ú.à... 000160
0026E903 75FE460B FC46880A C4830000 FFFF9A00 6A0A76FF 0C76FF50 16FC468D .F•.P.v..v.j.......á..F•.F±u.Ő&. 000180
0000FFFF 9A006A06 76FF0876 FF0A76FF 0C76FF08 A76837FF 260277FF 26FC5EC4 á^•&.w.&.7hĪ..v..v..v..v.j...... 0001A0
0A5EC4D8 8E000888 1E565700 001EC8CB C95F5E1F 0000E9F2 4688F246 8910C483 .á..F·.F·Ő...^_èùà...WV.¡...Äá^. 0001C0
89260A5E C400B497 8B2600B2 8788260A 5EC4E456 89E24689 5C578826 5A478826 &.GZ&.W\.Fã.VŐã^.&..ý.&..Ç.á^.&. 0001E0
```

Dump of file SATURN:[PCCOMMON.DUMP.DLL]PDLDGM.TMP;1 on 18-APR-1990 10:48:18.73
File ID (766,30,0)   End of file block 195 / Allocated 196

Virtual block number 160 (000000A0), 512 (0200) bytes

```
008C9713 2600BA87 03260A5E C400B497 8B2600B2 8788260A 5EC42857 89262647 G&&.W(á^.&..ý.&..Ç.á^.&..¤.&..¥. 000000
262A4789 260A5EC4 0088978B 2600B687 8B260A5E C4305789 262E4789 260A5EC4 á^.&.G.&.W0á^.&..Ñ.&..¡.á^.&.G*& 000020
0A5EC400 C0971326 008E8703 260A5EC4 0088978B 2600B687 8B260A5E C42C5789 .W,á^.&..Ñ.&..¡.á^.&../.&..à.á^. 000040
F20008B9 DA8E1EF0 880C7F8D 0026050C 56880A46 880A5EC4 34578926 32478926 &.G2&.W4á^..F..V..&.....Þ..Ő¿..· 000060
685016E6 468D0CC4 83000001 A29A006A E276FFE4 76FF264F 685016FE 468D1FA5 Ē..F±.PhO&.vő.vāj..Å....á..FĪ.Ph 000080
16EA468D FE76FF0C C4830000 FFFF9A00 6A00AEB7 FF260080 B7FF260A 5EC40279 y.á^.&.ñ¯.&.ñÜ.j........á..v±.Fõ. 0000A0
FF0876FF 0A76FF0C 76FF0320 68E676FF E876FF50 16EA468D 0000FFFF 9A146A50 Pj........Fõ.P.vŐ.vĪh ..v..v..v.. 0000C0
D88E00C9 B81E5657 000000C8 CBC95F5E 1F0000E9 14C48300 00FFFF9A 006A0676 v.j........á.Ő...^_èùà...WV.¡è..Ä 0000E0
001C0508 56880646 88088E01 EC881E56 57000000 C8C8C95F 5E1F0000 E90000B8 j..Ő...^_èùà...WV¯¡š..Ä.F..V.... 000100
0000E900 02050856 8B06468B D88E0203 B81E5657 000000C8 CBC95F5E 1F0000E9 Ő...^_èùã...WV.¦...Ä.F..V....Ő.. 000120
00E90106 97882601 04878826 065EC4D8 8E0220B8 1E565700 0000C8CB C95F5E1F .^_èùã...WV.¡ ..Äá^.&....&....Ő. 000140
FFFF6802 7368526A FFFF6802 6B68D88E 023D881E 56570000 00C8CBC9 5F5E1F00 ..ˣ_èùà...WV.¡=..Ähk.h..jRhs.h.. 000160
FFFF9A00 6A206A01 6A200A6B 1E010868 1F80681E 036A5A6A FFFF68FF FF68096A j.h¯.h..jZj..h..h...h. j.j j.... 000180
00870003 007E0203 00000022 02630002 000B90CB C95F5E1F 0000E924 C4830000 ...á$Ő...^_èù.....c."....-..... 0001A0
01FB0022 026E0005 009B0003 00AC0203 00170003 028E0203 0000002B 025E0002 ..^.+..............¯.......n.".«. 0001C0
02180022 02760005 04670000 01B40203 00370003 01D50203 002A0003 01830203 ......*...f...7...Ç...g...v."... 0001E0
```

Dump of file SATURN:[PCCOMMON.DUMP.DLL]PDLDGM.TMP;1 on 18-APR-1990 10:48:18.73
File ID (766,30,0)   End of file block 195 / Allocated 196

Virtual block number 161 (000000A1), 512 (0200) bytes

```
00DC46C7 D88EFFFF 881E5657 000024C8 00000000 00000000 02350022 02660005 ..f.".5.........à$..WV.¡...ÄúFÉ. 000000
4788260E 5EC4040E 4683E856 89E64689 FE578826 FC478826 0E5EC404 0E468300 ..F..á^.&.G=&.W±.FĪ.VŐ.F..á^.&.G 000020
5EC40106 97892601 04878926 FE5688FC 46880A5E C4FE5689 FC4689FE 578826FC =&.W±.F•.V±á^..F•.V±&....&....á^ 000040
000000C0 87C72600 96008E87 C7260A5E C4000000 BC87C726 0190008A 87C7260A .&ú.¤...&ú.¥...á^.&ú.ƒ...&ú.à... 000060
0026E903 75F6460B F44688 0A C4830000 FFFF9A00 6A0A76FF 0C76FF50 16F4468D .F¶.P.v..v.j.......á..F¶.F-u.Ő&. 000080
0000FFFF 9A006A06 76FF0876 FF0A76FF 0C76FF08 A76837FF 260277FF 26F45EC4 á^¶&.w.&.7hĪ..v..v..v..v.j...... 0000A0
46890CC4 83000000 F99A006A E676FFE8 76FF027F 685016E2 468DDC46 8910C483 .á..FÉ.Fã.Ph...vŐ.v|j..*....á..F 0000C0
271468E2 76FFE476 FF0E6A50 16EA468D 016FE9DC 46880006 E9037500 DC7E83DC É.-É.u.Ő...FÉŐo..Fõ.Pj..vŐ.vāh.' 0000E0
E9DC468B 0006E903 7500DC7E 830C4689 12C48300 0001619A 006AFC76 FFFE76FF .v±.v•j..•....á..FÉ.-É.u.Ő...FÉŐ 000100
DC46890E C4830000 FFFF9A00 6AEA76FF EC76FF50 16F2468D E276FFE4 76FF013D =..vŐ.vã.F·.P.vš.võj.......á..FÉ 000120
FF046A50 16F8468D 0107E9DC 46880006 E9037560 F27E8300 09E90374 00DC7E83 .-É.t.Ő...-·'u.Ő...FÉŐ...F½.Pj.. 000140
7400DC7E 83DC4689 12C48300 0001989A 006AEA76 FFEC76FF 271468E2 76FFE476 vŐ.vāh.',vš.võj.......á..FÉ.-É.t 000160
FF08A668 016A5016 EE468D00 CAE9DC46 880006E9 0374FA46 0BF8468B 000BE903 .Ő...F½.F*t.Ő...FÉŐò..FŸ.Pj.hĪ.. 000180
4608EE46 88000BE9 037400DC 7E83DC46 890EC483 000001D9 9A006A06 76FF0876 v..v.j..\....á..FÉ.-É.t.Ő...FŸ.F 0001A0
025968F8 76FFFA76 FFEE76FF F076FF50 16DE468D 0093E9DC 46880006 E90374F0 Þt.Ő...FÉŐ...Fß.P.vÞ.vŸ.v*.v½hY. 0001C0
E9DC468B 0006E903 7500DC7E 830C4689 14C48300 0002099A 006AE676 FFE876FF .vŐ.v|j.......á..FÉ.-É.u.Ő...FÉŐ 0001E0
```

Dump of file SATURN:[PCCOMMON.DUMP.DLL]PDLDGM.TMP;1 on 18-APR-1990 10:48:18.73

File ID (766,30,0)   End of file block 195 / Allocated 196

Virtual block number 162 (000000A2), 512 (0200) bytes

```
0AC48300 0002309A 006AEE76 FFF076FF 265A6800 6A00003A 47C7260A 5EC4005D ].á^.&úG:..j.hZ&.vÞ.vŸj..0....á. 000000
9A006ADE 76FFE076 FF265A68 006A002D E9DC4688 0006E903 7500DC7E 83DC4689 .FÉ.-É.u.Õ...FÉÕ·.j.hZ&.vÁ.vßj.. 000020
1F0000E9 DC468800 06E9DC46 8B0006E9 0375000C 7E83DC46 890AC483 0000FFFF .....á..FÉ.-É.u.Õ...FÉÕ...FÉÕ... 000040
56898C46 895C578B 265A478B 260A5EC4 D88E0008 BB1E5657 000076C8 CBC95F5E ^_èùàv..WV.¡...Äá^.&.GZ&.W\.F..V 000060
B2878B26 0A5EC400 4CE846C7 9A568998 46890080 978B2600 AE878B26 0A5EC48E .²^.&..Ù.&..¯..F..V.úFÒL.á^.&..ý 000080
5EC400B4 978B2600 B2878B26 0A5EC428 57892626 4789260A 5EC400B4 978B2600 .&..Ç.á^.&.G&&.W(á^.&..ý.&..Ç.á^ 0000A0
8B260086 878B260A 5EC43057 89262E47 89260A5E C400BC97 132600BA 8703260A .&..α.&..¥.á^.&.G.&.W0á^.&..Ñ.&. 0000C0
03260A5E C4008897 8B260086 878B260A 5EC42C57 89262A47 89260A5E C4008897 .¡.á^.&.G*&.W,á^.&..Ñ.&..¡.á^.&. 0000E0
8D002605 0C5688 0A 46880A5E C4345789 26324789 260A5EC4 00C09713 2600BE87 .ƒ.&..â.á^.&.G2&.W4á^..F..V..&.. 000100
03409A00 6A8C76FF 8E76FF26 4F685016 FE468D1F A5F20008 89DA8E1E F08B0C7F ...Þ..Ö¿..·É..F±.PhO&.v..v.j..M. 000120
0003749A 006A00AE B7FF2600 B0B7FF26 0A5EC402 79685016 9046800C C4830000 ...á..F..Phy.á^.&.ñ¯.&.ñÜ.j..t.. 000140
76FF9A76 FF027F68 50169446 8D0000FF FF9A146A 5016EA46 80FE76FF 0CC48300 ..á..v±.Fõ.Pj.......F..Ph...v..v 000160
76FF0E6A 02046850 169C468D 5016E846 8D009C46 C60CC483 000000C7 9A006A98 .j..ú....á.6F...FÒ.P.F..Ph..j..v 000180
468918C4 83000003 2E9A006A 010487FF 26010687 FF260A5E C4271A68 9476FF96 ..v.h.'á^.&.ñ..&.ñ..j.......á..F 0001A0
76FF5016 EA468D00 6A50169C 468D006A 0030E98A 46880006 E9037500 8A7E838A ..~..u.Õ...F.Õ0.j..F..Pj..Fõ.P.v 0001C0
0000E91C C4830000 FFFF9A00 6A0676FF 0876FF0A 76FF0C76 FF032068 9076FF92 ..v.h ..v..v..v..v.j.......á.Õ.. 0001E0
```

Dump of file SATURN:[PCCOMMON.DUMP.DLL]PDLDGM.TMP;1 on 18-APR-1990 10:48:18.73
File ID (766,30,0)   End of file block 195 / Allocated 196

Virtual block number 163 (000000A3), 512 (0200) bytes

```
89F84689 42578826 40478826 0A5EC4D8 8E025C88 1E565700 0024C8CB C95F5E1F .^_èùà$..WV.¡\..Äá^.&.Gα&.WB.F½. 000000
5689F446 8900AC97 8B2600AA 878B260A 5EC4E056 89DE4689 08568806 4688FA56 V¹¯F..V..Fß.VÁá^.&..¯.&..¯..F¶.V 000020
478B260E 5EC4020E 4683E456 89E24689 FE578B26 FC478B26 0E5EC404 0E4683F6 -.F..á^.&.G=&.W±.Fã.VÕ.F..á^.&.G 000040
0DE90375 03367F83 260A5EC4 0000FFFF 9A5016E8 468DE276 FFE476FF DC4689FE ±.FÉ.vÕ.vã.FÒ.P.....á^.&..6.u.Õ. 000060
FFFF9AE2 76FFE476 FF000BE9 037500E8 7E830078 E9037404 367F8326 0A5EC400 .á^.&..6.t.Õx..~Ò.u.Õ...vÕ.vã... 000080
83000005 169A006A DE76FFE0 76FF2714 68E276FF E476FF06 6A5016F0 468D0000 ...FÞ.Pj..vÕ.vãh.'.vÁ.vßj....... 0000A0
89DE4689 F25688F0 46880000 FFFF9AE2 76FFE476 FF000BE9 037500E8 7E8312C4 á..~Ò.u.Õ...vÕ.vã......FÞ.V·.Fß. 0000C0
460BF046 880CC483 00000547 9A006AF0 76FFF276 FFE276FF E476FFDC 76FFE056 VÁ.vÉ.vÕ.vã.v·.vÞj..G....á..FÞ.F 0000E0
0876FF27 1068E276 FFE476FF 5016FC46 80004FE9 0375000C 7E83FF88 E90374F2 ·t.Õ...-É.u.ÕO..F=.P.vÕ.vãh.'.v. 000100
056B9A00 6AF476FF F676FF26 4C685016 E6468D10 C4830000 052E9A00 6A0676FF .v.j.......á..Fİ.PhL&.v~.v¶j..k. 000120
46880CC4 83000005 C09A006A FC76FFFE 76FFE276 FFE476FF E676FF0C C4830000 ...â..vİ.vÕ.vã.v±.v=j..â....á..F 000140
83000003 A79A006A F876FFFA 76FF08D4 680676FF 0876FF00 19E90375 FA4608F8 ½.Fªu.Õ...v..v.hå..vª.v½j..Ì.... 000160
05F69A4C 77FF264E 77FF260A 5EC40058 E903754E 470B264C 478B260A 5EC40CC4 á.á^.&.GL&.GNu.ÕX.á^.&.wN&.wL.-. 000180
6A001BE9 03740000 30000006 089A5016 DE468D4C 77FF264E 77FF260A 5EC40000 ..á^.&.wN&.wL.Fß.P.....=..t.Õ..j 0001A0
77FF260A 5EC4FFC8 E90CC483 00000629 9A006ADE 76FFE076 FFE276FF E476FF00 ..vÕ.vã.vÁ.vßj..)....á.Õà.á^.&.w 0001C0
77FF260A 5EC40059 E9037552 470B2650 478B260A 5EC40000 063F9A4C 77FF264E N&.wL.?...á^.&.GP&.GRu.ÕY.á^.&.w 0001E0
```

Dump of file SATURN:[PCCOMMON.DUMP.DLL]PDLDGM.TMP;1 on 18-APR-1990 10:48:18.73
File ID (766,30,0)   End of file block 195 / Allocated 196

Virtual block number 164 (000000A4), 512 (0200) bytes

```
3D000006 749A5016 DE468D50 77FF2652 77FF260A 5EC40000 065F9A50 77FF2652 R&.wP._...á^.&.wR&.wP.Fß.P.t...= 000000
0CC48300 0006929A 006ADE76 FFE076FF E276FFE4 76FFDC76 FF001CE9 03740000 ..t.Õ¯..vÉ.vÕ.vã.vÁ.vßj.......á. 000020
03755647 0B265447 8B260A5E C4000006 A89A5077 FF265277 FF260A5E C4FFC7E9 Õú.á^.&.wR&.wP.´...á^.&.GT&.GVu. 000040
46805477 FF265677 FF260A5E C40000FF FF9A5477 FF265677 FF260A5E C40059E9 ÕY.á^.&.wV&.wT.....á^.&.wV&.wT.F 000060
6ADE76FF E076FFE2 76FFE476 FFDC76FF 001CE903 74000030 0000FFFF 9A50160E ß.P.....=..t.Õ...vÉ.vÕ.vã.vÁ.vßj 000080
260A5EC4 0000FFFF 9A5477FF 265677FF 260A5EC4 FFC7E90C C4830000 06FD9A00 ..»....á.Õú.á^.&.wV&.wT.....á^.& 0000A0
5EC402E6 C1EE7688 EE46FF00 1AE90000 EE46C7EC 5689EA46 895C578B 265A478B .GZ&.W\.Fõ.VšúFŸ..Õ...FŸ.vŸèl.á^ 0000C0
76FF0019 E9037758 473926EE 46880A5E C4EC5689 EA46895C 508B265A 408B260A .&.αZ&.P\.Fõ.V±á^..FŸ&9GXw.Õ...v 0000E0
5F5E1F00 00E90000 B8FFBEE9 0AC48300 00FFFF9A 006AEA76 FFEC76FF E276FFE4 Õ.vã.v±.võj.......á.Õ/.¡..Õ...^_ 000100
C8CBC95F 5E1F0000 E9001C05 08568806 4688D88E 03FD8B1E 56570000 00C8CBC9 èùà...WV.¡»..Ä.F..V....Õ...^_èùà 000120
000000C8 CBC95F5E 1F0000E9 00020508 56880646 88D88E07 1AB81E56 57000000 ...WV.¡...Ä.F..V....Õ...^_èùà... 000140
0000C8CB C95F5E1F 0000E901 06978826 0104878B 26065EC4 D88E0737 BB1E5657 WV.¡7..Äá^.&....&....Õ...¯_èùà.. 000160
6AFFFF68 FFFF6809 6AFFFF68 078A6835 6AFFFF68 07826808 8E0754B8 1E565700 .WV.¡T..Äh..h..j5h..h..j.h¯..h..j 000180
1F0000E9 24C48300 00FFFF9A 006A166A 016A2134 681E0108 68200E68 1E036A5B [j..h. h...h4!j.j.j.......á$Õ... 0001A0
00050000 0023077A 00020074 000304E4 02030342 000805D6 02030013 CBC95F5E ^_èù....ø...B...Õ...t...z.#..... 0001C0
0203074C 0023077D 00050000 00280775 00020087 0003007E 0203072F 0023078D .¯#./...~.......u.+.....).#.L... 0001E0
```

Dump of file SATURN:[PCCOMMON.DUMP.DLL]PDLDGM.TMP;1 on 18-APR-1990 10:48:18.73

File ID (766,30,0)   End of file block 195 / Allocated 196

Virtual block number 165 (000000A5), 512 (0200) bytes

```
0203002A 000304AB 020302FE 0008058E 02030098 000300AC 02030017 000307A5 E.......¯...........±...¨...*... 000000
02030088 00030126 02030037 000303E6 02030467 0000035F 02030127 00040460 '...'......g...Ì...7...&...|... 000020
00000712 00230785 00050147 0004048E 02030323 000805A3 0203013B 000404C2 ô...;...Ē...#.......G.....#..... 000040
5689F446 89FE578B 26FC478B 260E5EC4 040E4683 D88EFFFF B81E5657 00000EC8 à...WV.|...Ä.F..ó^.&.G•&.W±.F¶.V 000060
26FE568B FC46880A 5EC4FE56 89FC4689 FE578B26 FC478B26 0E5EC404 0E4683F6 -.F..ó^.&.G•&.W±.F•.V±ó^..F•.V±& 000080
87C7260A 5EC40000 008C87C7 26019000 BA87C726 0A5EC401 06978926 01048789 ....&....ó^.&ú.¤...&ú.¥...ó^.&ú. 0000A0
0AC48300 00FFFF9A 006A0A76 FF0C76FF 5016F846 80000000 C087C726 0096008E ƒ...&ú.à....F½.P.v...v.j.......ó. 0000C0
76FF0A76 FF0C76FF 08A76837 FF260277 FF26F85E C40026E9 0375FA46 0BF8468B .F½.F°u.Õ&.ó^½&.w.&.7hÌ..v..v..v 0000E0
000086C8 CBC95F5E 1F0000E9 F2468BF2 468910C4 830000FF FF9A006A 0676FF08 ..v.j.......ó..F·.F·Õ...^_èùà... 000100
AE878B26 0A5EC486 56898446 895C578B 265A478B 260A5EC4 088E0008 B81E5657 WV.|...Äó^.&.GZ&.W\.F..V.Ž^.&..Ô 000120
46890084 978B2600 B2878B26 0A5EC400 4CE446C7 96568994 46890080 978B2600 .&..¯..F..V.úFöL.ó^.&..ý.&..Ç..F 000140
BA878B26 0A5EC4FF 7C9689FF 7A868900 B8978B26 00B6878B 260A5EC4 82568980 ..V.ó^.&..Ñ.&..|...z...|.ó^.&..¤ 000160
C4925689 90468900 C0978B26 00BE878B 260A5EC4 FE5689FC 468900BC 978B2600 .&..¥..F=.V±ó^.&..ƒ.&..à..F..V.ó 000180
26FE5613 FC460382 56888046 880A5EC4 28578926 26478926 82568880 46880A5E ^..F..V.&.G&&.W(ó^..F..V..F•.V±& 0001A0
7A86880A 5EC42C57 89262A47 8926FF7C 968BFF7A 86880A5E C4305789 262E4789 .G.&.W0ó^...z...|.&.G*&.W,ó^...z 0001C0
80002605 0C56880A 46880A5E C4345789 26324789 26925613 904603FF 7C968BFF ...|..F..V.&.G2&.W4ó^..F..V..&.. 0001E0
```

Dump of file SATURN:[PCCOMMON.DUMP.DLL]PDLDGM.TMP;1 on 18-APR-1990 10:48:18.73
File ID (766,30,0)   End of file block 195 / Allocated 196

Virtual block number 166 (000000A6), 512 (0200) bytes

```
01DD9A00 6A8476FF 8676FF26 4F685016 FA468D1F A5F20008 B90A8E1E F08B0C7F ...Þ..Ö¿...·E..F°.PhO&.v..v.j..ï. 000000
0002049A 006A00AE B7FF2600 B087FF26 0A5EC402 79685016 88468D0C C4830000 ...ó..F..Phy.ó^.&.ñ¯.&.ñÜ.j..... 000020
76FF9676 FF027F68 50168C46 800000FF FF9A146A 5016E646 8DFA76FF 0CC48300 ..ó..v°.F|.Pj.......F..Ph...v..v 000040
76FF0E6A 02046850 1698468D 5016E446 8D009846 C60CC483 00000237 9A006A94 .j..7....ó.6F...Fô.P.F..Ph..j..v 000060
868918C4 830000FF FF9A006A 010487FF 26010687 FF260A5E C4271A68 8C76FF8E ..v.h.'ó^.&.ñ..&.ñ..j.......ó... 000080
16E6468D 006A5016 98468D00 6A0030E9 FF7E868B 0007E903 7500FF7E BE83FF7E ~..ƒ-..u.Õ....-.Õ0.j..F..Pj..F|. 0000A0
1CC48300 00FFFF9A 006A0676 FF0876FF 0A76FF0C 76FF0320 688876FF 8A76FF50 P.v..v.h ..v..v..v..v.j.......ó. 0000C0
C8CBC95F 5E1F0000 E9000088 D88E00C4 B81E5657 000000C8 CBC95F5E 1F0000E9 Õ...^_èùà...WV.|ó..Ä|..Õ...^_èùà 0000E0
000000C8 CBC95F5E 1F0000E9 001C0508 56880646 8BD88E02 90B81E56 57000000 ...WV¯|...Ä.F..V....Õ...^_èùÃ... 000100
1E565700 0000C8CB C95F5E1F 0000E900 02050856 8B06468B D88E02A7 B81E5657 WV.|Ì..Ä.F..V....Õ...^_èùÃ...WV. 000120
56570000 00C8CBC9 5F5E1F00 00E90106 978B2601 04878B26 065EC4D8 8E02C4B8 |ó..Äó^.&....&....Õ...¯_èùà...WV 000140
036A506A FFFF68FF FF68096A FFFF6803 1768396A FFFF6803 0F68D88E 02E1B81E .|Ã..Äh..h..j9h..h..j.h¯.h..j}j. 000160
C95F5E1F 0000E924 C4830000 FFFF9A00 6A0F6A01 6A227668 1E010868 2138681E .h8!h...hv"j.j.j.......ó$Õ...^_è 000180
03020002 029F0024 03120005 00870003 00790203 00000024 03070002 000B90CB ù.......$.....y.........$.......¯ 0001A0
01BE0203 02BC0024 031A0005 00980003 00A70203 00170003 03320203 0000002B +.....2.......Ì.........$.¥...ƒ. 0001C0
00000000 02D90024 030A0005 04670000 01EF0203 00370003 02790203 002A0003 ..*...y...7...ÿ...g.....$.1..... 0001E0
```

Dump of file SATURN:[PCCOMMON.DUMP.DLL]PDLDGM.TMP;1 on 18-APR-1990 10:48:18.73
File ID (766,30,0)   End of file block 195 / Allocated 196

Virtual block number 167 (000000A7), 512 (0200) bytes

```
9A0088E9 00008800 06E90375 00003DFF FF39E99A D88EFFFF B81E5657 000000C8 à...WV.|...Ä.Õ9..=..u.Õ..|..Õ... 000000
B80006E9 03750000 3DFFFF63 199A0078 E9000088 0006E903 7500003D FFFF27A9 `'..=..u.Õ..|..Õx...c..=..u.Õ..| 000020
00003DFF FF04D19A 0052E900 00B80006 E9037500 003DFFFF 044C9A00 65E90000 ..Õe..L...=..u.Õ..|..ÕR..Ì...=.. 000040
339A002C E9000088 0006E903 7500003D FFFF0256 9A003FE9 00008800 06E90375 u.Õ..|..Õ?..V...=..u.Õ..|..Õ,..3 000060
00B80006 E9037500 003DFFFF 02FA9A00 19E90000 B80006E9 03750000 3DFFFF01 ...=..u.Õ..|..Õ...°...=..u.Õ..|. 000080
FFFF02FA 9AD88E00 08B81E56 57000000 C8CBC95F 5E1F0000 E90001B8 0006E900 .Õ..|..Õ...^_èùà...WV.|...Ä.°... 0000A0
D7E90000 B80006E9 03750000 3DFFFF02 CF9A00EA E9000088 0006E903 7500003D =..u.Õ..|..ÕÕ..ü...=..u.Õ..:..Õ■ 0000C0
06E90375 00003DFF FF04369A 00C4E900 00B80006 E9037500 003DFFFF 05A89A00 ..'...=..u.Õ..|..Õó..6...=..·.Õ. 0000E0
3DFFFF00 A99A009E E9000088 0006E903 7500003D FFFF031D 9A00B1E9 00008800 .|..ÕÝ......=..u.Õ..|..Õ...`...= 000100
0078E900 00B80006 E9037500 003DFFFF 02519A00 88E90000 B80006E9 03750000 ..u.Õ..|..Õ...Q...=..u.Õ..|..Õx. 000120
0006E903 7500003D FFFF0133 9A0065E9 00008800 06E90375 00003DFF FF03AE9A .Û...=..u.Õ..|..Õe..3...=..u.Õ.. 000140
003DFFFF 01339A00 3FE90000 B80006E9 03750000 3DFFFF01 339A0052 E9000088 |..ÕR..3...=..u.Õ..|..Õ?..3...=. 000160
9A0019E9 00008800 06E90375 00003DFF FF02D49A 002CE900 00B80006 E9037500 .u.Õ..|..Õ,..à...=..u.Õ..|..Õ... 000180
0000C8C8 C95F5E1F 0000E900 01B80006 E9000088 0006E903 7500003D FFFF0133 3...=..u.Õ..|..Õ..|..Õ...^_èùà.. 0001A0
FF01339A 0136E900 00B80006 E9037500 003DFFFF 01339AD8 8E00B7B8 1E565700 .WV.|ñ..Ä.3...=..u.Õ..|..ÕÕ..3.. 0001C0
E90000B8 0006E903 7500003D FFFF02CF 9A0123E9 00008800 06E90375 00003DFF .=..u.Õ..|..Õ#..ü...=..u.Õ..|..Õ 0001E0
```

Dump of file SATURN:[PCCOMMON.DUMP.DLL]PDLDGM.TMP;1 on 18-APR-1990 10:48:18.73

```
File ID (766,30,0)   End of file block 195 / Allocated 196

Virtual block number 168 (000000A8), 512 (0200) bytes

E9037500 003DFFFF 02FA9A00 FDE90000 B80006E9 03750000 3DFFFF03 429A0110 ...B...=..u.Õ..|..Õ»..ª...=..u.Õ 000000
FFFF02FA 9A0007E9 0000B800 06E90375 00003DFF FF02FA9A 00EAE900 00B80006 ..|..Õõ..ª...=..u.Õ..|..Õ■..ª... 000020
B1E90000 B80006E9 03750000 3DFFFF02 D49A00C4 E90000B8 0006E903 7500003D =..u.Õ..|..Õ6..Å...=..u.Õ..|..ÕY 000040
06E90375 00003DFF FF02D49A 009EE900 00B80006 E9037500 003DFFFF 02D49A00 ..Å...=..u.Õ..|..Õ...Å...=..u.Õ. 000060
3DFFFF02 569A0078 E90000B8 0006E903 75000030 FFFF0256 9A008BE9 00008800 .|..Õ...V...=..u.Õ..|..Õx..V...= 000080
0052E900 00B80006 E9037500 003DFFFF 07609A00 65E90000 B80006E9 03750000 ..u.Õ..|..Õe..m...=..u.Õ..|..ÕR. 0000A0
0006E903 7500003D FFFF011C 9A003FE9 0000B800 06E90375 00003DFF FF03D79A .■...=..u.Õ..|..Õ7......=..u.Õ.. 0000C0
003DFFFF 03A19A00 19E90000 B80006E9 03750000 3DFFFF01 1C9A002C E90000B8 |..Õ,......=..u.Õ..|..Õ...À...=. 0000E0
C5B81E56 57000000 C8CBC95F 5E1F0000 E90001B8 0006E900 00B80006 E9037500 .u.Õ..|..Õ..|..Õ...^_èùà...WV.|é 000100
03740000 3D034C00 AF9A002C E90000B8 0006E903 74000030 03390000 9AD88E01 ..Å...9.=..t.Õ..|..Õ,..£.L.=..t. 000120
E90001B8 0006E900 00B80006 E9037400 003DFFFF 01BD9A00 19E90000 B80006E9 Õ..|..Õ...§...=..t.Õ..|..Õ..|..Õ 000140
00020035 00020000 0021028A 00020000 00200277 00020028 90CBC95F 5E1F0000 ...^_èù.(...w. ......-.|.....5... 000160
0004000F 00020000 0023028D 00020000 00030022 00020000 0022029D 00020000 ......"....."........ .#......... 000180
002602C3 00020000 0006005B 00020000 00250326 00020000 0024023E 00020000 ....>.$.....&.%.....(.......ù.&. 0001A0
002802E9 00020000 0008006E 00020000 002702D6 00020000 00070094 00020000 ............ø.'.....n.......Õ.(. 0001C0
002B031F 00020000 000A00D1 00020000 002902FC 00020000 000900BE 00020000 ..../.......■.).....ì.........+. 0001E0

Dump of file SATURN:[PCCOMMON.DUMP.DLL]PDLDGM.TMP;1 on 18-APR-1990 10:48:18.73
File ID (766,30,0)   End of file block 195 / Allocated 196

Virtual block number 169 (000000A9), 512 (0200) bytes

000E010A 00020000 00000048 00020000 000C00F7 00020000 000B00E4 00020000 ....Õ.......%.......H........... 000000
00120156 00020000 00110143 00020000 00100130 00020000 000F011D 00020000 ...........0.......C.......V... 000020
001601A2 00020000 0015018F 00020000 0014017C 00020000 00130169 00020000 ....i.......|...............Å... 000040
001A01F2 00020000 001901DF 00020000 001801CC 00020000 00170081 00020000 ............â.......Ô.......`... 000060
001E0251 00020000 001D022B 00020000 001C0218 00020000 001B0205 00020000 .......................+.......Q... 000080
040E4683 D88EFFFF 881E5657 00000EC8 00000000 00000000 001F0264 00020000 ....d...........à...WV.|...Á.F.. 0000A0
FE578B26 FC478B26 0E5EC404 0E4683F6 5689F446 89FE5788 26FC478B 260E5EC4 6^.&.G=&.W±.F¶.V-.F..6^.&.G=&.W± 0000C0
9887C726 0A5EC400 EC978926 00EA8789 26FE568B FC468B0A 5EC4FE56 89FC4689 .F•.V±6^..F=.V±&..õ.&..š.6^.&ú.. 0000E0
C7260A5E C4000000 9E87C726 0064009C 87C7260A 5EC4FFFF 009A87C7 26FF7400 .t.&ú.....6^.&ú...d.&ú.....6^.&ú 000100
F8468000 0000A687 C7260096 00A487C7 260A5EC4 000000A2 87C72601 9000A087 .....&ú.Å...6^.&ú.Ê...&ú.Ì....F½ 000120
F85EC400 26E90375 FA460BF8 46880AC4 830000FF FF9A006A 0A76FF0C 76FF5016 .P.v..v.j.......6..F½.Fªu.Õ&.6^½ 000140
10C48300 00FFFF9A 006A0676 FF0876FF 0A76FF0C 76FF08A7 6837FF26 0277FF26 &.w.&.7hÌ..v..v..v..v.j.......6. 000160
8788260A 5EC4D88E 0008881E 56570000 68C8C8C9 5F5E1F00 00E9F246 8BF24689 .F·.F·Õ...^_èùàh..WV.|...Á6^.&.. 000180
A85689A6 468900EC 97882600 EA878826 0A5EC4C4 5689C246 89009697 88260094 ..&.....Fò.V66^.&..õ.&..š..FÌ.V´ 0001A0
00A29788 2600A087 88260A5E C4C05689 BE468900 A6978826 00A4878B 260A5EC4 6^.&..Ê.&..Ì..F/.Vä6^.&.....&..Å. 0001C0
9C878B26 0A5EC4A0 56899E46 89009A97 88260098 8788260A 5EC4FE56 89FC4689 .F=.V±6^.&....&.....F..V.6^.&... 0001E0

Dump of file SATURN:[PCCOMMON.DUMP.DLL]PDLDGM.TMP;1 on 18-APR-1990 10:48:18.73
File ID (766,30,0)   End of file block 195 / Allocated 196

Virtual block number 170 (000000AA), 512 (0200) bytes

8D01F1E9 0000B800 06E90374 001E7F83 260A5EC4 9A568998 4689009E 97882600 .&.....F..V.6^.&.....t.Õ..|..Õþ.. 000000
AA4689A0 56889E46 880CC483 00000292 9A006AC2 76FFC476 FF027968 5016A246 FÅ.Phy..v6.vôj.......6..F..V..F¯ 000020
5689B246 89FE5613 FC4603A0 56889E46 8B805689 AE46899A 56889846 8BAC5689 .V¯.F..V..FÜ.V¯.F..V..F=.V±.Fý.V 000040
006A5016 AA468DA2 76FFA476 FFB85689 B64689C0 5613BE46 039A568B 984688B4 Ç.F..V..Ff.Vä.FÑ.V|.vÊ.vÅ.F¯.Pj. 000060
6AC85689 C64689A0 56889E46 880000FF FF9A016A 006A006A 016A286A 006A286A j(j.j(j.j.j.j.......F..V..F6.Vàj 000080
89CA4689 9A561398 46030260 00369A50 5200DA83 00012DC0 5688BE46 88026A00 .j..Ff.Vä-...Ö.RP.6.m..F..V..Fò. 0000A0
D4568902 4689CC56 88CA4688 D05689CE 4689FE56 13FC4603 A056889E 4688CC56 Vä.F..V..F•.V±.Fö.VÅ.Fò.Vë.FØ.Vå 0000C0
CC5688CA 46880000 FFFF9A01 6A016A00 6A5016C6 468D026A 006AA276 FFA476FF .vÊ.vÅj.j..F6.Pj.j.j.......Fò.Vë 0000E0
52032D00 369A8E76 FFC076FF 046A006A 227A681E A276FFA4 76FF8056 89AE4689 .FÜ.V¯.vÊ.vÅ.hz"j.j..vä.v/.6.-.R 000100
6AC276FF C476FF02 7F685016 BA468D00 0003309A 006A006A 006A5016 AA468D50 P.F¯.Pj.j.j..=....F¤.Ph...v6.vôj 000120
6AA676FF A876FF27 14688A76 FFBC76FF 136A5016 D6468D0C C4830000 02829A00 ..ý....6..Fø.Pj..v¥.v¤h.'.v´.vÌj 000140
5016DA46 8D0095E9 9C468B00 06E90375 009C7E83 9C468912 C4830000 02E49A00 ..Õ....6..F..-..u.Õ...F.Õ...FÕ.P 000160
7E839C46 8912C483 0000FFFF 9A006AD6 76FFD876 FF271268 BA76FF8C 76FF026A j..v¥.v¤h.'.vÅ.vøj.......6..F..- 000180
899A568B 984688B8 5689B646 89B05688 AE468800 63E99C46 880006E9 0375009C ..u.Õ...F.Õc..FÜ.V¯.FÑ.V|.F..V.. 0001A0
52FFFF00 369ABE76 FFC076FF 046A006A 5016DA46 8DA276FF A476FFB0 5689AE46 FÜ.V¯.vÊ.vÅ.FÖ.Pj.j..vä.v/.6...R 0001C0
0676FF08 76FF0A76 FF0C76FF 03206800 00FFFF9A 006A006A 006A5016 AA468D50 P.F¯.Pj.j.j......h ..v..v..v..v. 0001E0

Dump of file SATURN:[PCCOMMON.DUMP.DLL]PDLDGM.TMP;1 on 18-APR-1990 10:48:18.73
```

```
File ID (766,30,0)   End of file block 195 / Allocated 196

Virtual block number 171 (000000AB), 512 (0200) bytes

 8E00E688 1E565700 0004C8CB C95F5E1F 0000E900 00880CC4 830000FF FF9A006A j.......á.¡..õ...^_èùà...WV.¡l.. 000000
 00880014 07C726FC 5EC4FE56 89FC4689 FE578B26 FC478B26 0E5EC404 0E4683D8 Ä.F..á^.&.G=&.W±.F=.V±á^=&ú...¡. 000020
 00E90002 0508568B 06468BD8 8E036D88 1E565700 0000C8CB C95F5E1F 0000E900 .õ...^_èùà...WV.¡m..Ä.F..V....õ. 000040
 E900EC97 8B2600EA 878B2606 5EC4D88E 03A1B81E 56570000 00C8CBC9 5F5E1F00 ..^_èùã...WV.¡À..Äá^.&..õ.&..š.õ 000060
 FF68FFFF 68616AFF FF6803EC 68D88E03 BEB81E56 57000000 C8C8C95F 5E1F0000 ...¯_èùà...WV.¡ƒ..Äh$.h..jah..h. 000080
 00E91EC4 830000FF FF9A006A 5E6A016A 23E4681E 00EE6822 82681E02 6A096AFF .j.j¯.h."hŸ..hõ#j.j^j.......á.õ. 0000A0
 00870003 009B0203 00000026 03E40002 01F00005 02460203 0000CBC9 5F5E1F00 ..^_èù....F...b...õ.&........... 0000C0
 00170003 04070203 02040005 01DF0203 0000002B 030F0002 0000002A 02040002 ...¯*.....ô.+.....ô......  ..... 0000E0
 00370003 03530203 002A0003 01800203 02170005 027D0203 009B0003 00C90203 ..è.......}..........*...  ..7. 000100
 00F646C7 D88EFFFF B81E5657 00000EC8 03B60026 03E70005 03990026 03EF0005 ..ÿ.&.....ô.&.Ñ.à...WV.¡...AuF-. 000120
 478B260E 5EC4040E 4683FA56 89F84689 FE578B26 FC478B26 0E5EC404 0E468300 ..F..á^.&.G=&.W±.F½.V*.F..á^.&.G 000140
 5EC40148 97892601 46878926 FE568BFC 4688OA5E C4FE5689 FC4689FE 578B26FC =&.W±.F=.V±á^..F=.V±&..F.&..H.á^ 000160
 00000102 87C72600 96010087 C7260A5E C4000000 FE87C726 019000FC 87C7260A .&ú.=...&ú.±...á^.&ú.....&ú..... 000180
 0026E903 75F4460B F24688OA C4830000 FFFF9A00 6A0A76FF 0C76FF50 16F24680 .F·.P.v..v.j........á..F·.F¶u.õ&. 0001A0
 0000FFFF 9A006A06 76FF0876 FF0A76FF 0C76FF08 A76837FF 260277FF 26F25EC4 á^·&.w.&.7hÌ..v..v..v..v.j...... 0001C0
 06468BD8 8E00088B 1E565700 0000C8CB C95F5E1F 0000E9F6 468BF646 8910C483 .á..F-.F-õ...^_èùà...WV.¡...Ä.F. 0001E0

Dump of file SATURN:[PCCOMMON.DUMP.DLL]PDLDGM.TMP;1 on 18-APR-1990 10:48:18.73
File ID (766,30,0)   End of file block 195 / Allocated 196

Virtual block number 172 (000000AC), 512 (0200) bytes

 08568806 4688D88E 00C9881E 56570000 00C8CBC9 5F5E1F00 00E9005E 0508568B .V..^.õ...^_èùà...WV.¡è..Ä.F..V. 000000
 26014687 8B26065E C4D88E00 E6881E56 57000000 C8CBC95F 5E1F0000 E9000205 ...õ...^_èùã...WV.¡l..Äá^.&..F.& 000020
 3D6AFFFF 68013168 D88E0103 B81E5657 000000C8 CBC95F5E 1F0000E9 0148978B ..H.õ...¯_èùà...WV.¡...Äh1.h..j= 000040
 6A016A24 4E681E01 4A6823E8 681E036A 5C6AFFFF 68FFFF68 096AFFFF 68013968 h9.h..j.h¯.h..j\j..hõ#hJ..hN$j.j 000060
 02030000 00270129 00020008 90CBC95F 5E1F0000 E924C483 0000FFFF 9A006A64 dj.......á$õ...^_èù.....).'..... 000080
 02030017 00030154 02030000 00280124 000200C1 00270134 00050087 0003007E ~.......4.'.ë...$.+.....T....... 0000A0
 00000000 00000000 000000FB 0027012C 0005000E 0027013C 0005009B 000300AC ¯.......<.'.ß...,.'.«........... 0000C0
 FE578B26 FC478B26 0E5EC404 0E468300 00F246C7 D88EFFFF B81E5657 00000EC8 à...WV.¡...ÄúF·...F..á^.&.G=&.W± 0000E0
 4688OA5E C4FE5689 FC4689FE 578B26FC 478B260E 5EC4040E 4683F656 89F44689 .F¶.V-.F..á^.&.G=&.W±.F=.V±á^..F 000100
 C4000000 FE87C726 019000FC 87C7260A 5EC40148 97892601 46878926 FE568BFC =.V±&..F.&..H.á^.&ú.=...&ú.±...á 000120
 FFFF9A00 6A0A76FF 0C76FF50 16F8468D 00000102 87C72600 96010087 C7260A5E ^.&ú.....&ú......F½.P.v..v.j.... 000140
 0C76FF08 A76837FF 260277FF 26F85EC4 0026E903 75FA460B F84688OA C4830000 ...á..F½.F*u.õ&.á^½&.w.&.7hÌ..v. 000160
 C95F5E1F 0000E9F2 468BF246 8910C483 0000FFFF 9A006A06 76FF0876 FF0A76FF .v..v..v.j........á..F·.F·õ...^_è 000180
 00C8CBC9 5F5E1F00 00E9005E 05085688 06468BD8 8E00088B 1E565700 0000C8CB ùà...WV.¡...Ä.F..V..^.õ...^_èùã. 0001A0
 57000000 C8CBC95F 5E1F0000 E9000205 08568806 4688D88E 00C9881E 56570000 ..WV.¡è..Ä.F..V....õ...^_èùã...W 0001C0
 000000C8 CBC95F5E 1F0000E9 0148978B 26014687 8B26065E C4D88E00 E6881E56 V.¡l..Äá^.&..F.&..H.õ...¯_èùà... 0001E0

Dump of file SATURN:[PCCOMMON.DUMP.DLL]PDLDGM.TMP;1 on 18-APR-1990 10:48:18.73
File ID (766,30,0)   End of file block 195 / Allocated 196

Virtual block number 173 (000000AD), 512 (0200) bytes

 5C6AFFFF 68FFFF68 096AFFFF 68013968 3E6AFFFF 68013168 D88E0103 B81E5657 WV.¡...Äh1.h..j>h9.h..j.h..h..j\ 000000
 5E1F0000 E924C483 0000FFFF 9A006A65 6A016A24 B8681E01 4A682452 681E036A j..hR$hJ..h¡$j.jej........á$õ...^ 000020
 02030000 00280124 00020000 00280129 00020087 0003007E 02030008 90CBC95F _èù.....~........).(.....$.+..... 000040
 0005000E 0028013C 000500C1 00280134 0005009B 000300AC 02030017 00030154 T.......¯.......4.(.ë...<.(.ß... 000060
 040E4683 D88EFFFF B81E5657 00000EC8 00000000 00000000 000000FB 0028012C ,.(.«............à...WV.¡...Ä.F.. 000080
 FE578B26 FC478B26 0E5EC404 0E4683FA 5689F846 89FE578B 26FC478B 260E5EC4 á^.&.G=&.W±.F½.V*.F..á^.&.G=&.W± 0000A0
 9887C726 0A5EC400 EC978926 00EA8789 26FE568B FC46880A 5EC4FE56 89FC4689 .F=.V±á^..F=.V±&..õ.&..š.á^.&ú.. 0000C0
 C7260A5E C4000000 9E87C726 0064009C 87C7260A 5EC4FFFF 009A87C7 26FF7400 .t.&ú.....á^.&ú...d.&ú.....á^.&ú 0000E0
 F2468000 0000A687 C7260096 00A487C7 260A5EC4 000000A2 87C72601 9000A087 .....&ú.Å...á^.&ú.Ê...&ú.Ì....F· 000100
 F25EC400 26E90375 F4460BF2 4688OAC4 830000FF FF9A006A 0A76FF0C 76FF5016 .P.v..v.j........á..F·.F¶u.õ&.á^· 000120
 10C48300 00FFFF9A 006A0676 FF0876FF 0A76FF0C 76FF08A7 6837FF26 0277FF26 &.w.&.7hÌ..v..v..v..v.j.......á. 000140
 878B260A 5EC4D88E 0008881E 56570000 68C8CBC9 5F5E1F00 00E9F646 8BF64689 .F-.F-õ...^_èùàh..WV.¡...Äá^.&.. 000160
 FA5689F8 468900EC 978B2600 EA878826 0A5EC4E6 5689E446 89009697 8B260094 ..&.....Fõ.V̄lá^.&..õ.&..š..F½.V* 000180
 00A2978B 2600A087 8B260A5E C4E25689 E0468900 A6978B26 00A4878B 260A5EC4 á^.&..Ê.&..Ì..FÅ.Vää^.&....&..Å. 0001A0
 9C878B26 0A5EC4C2 5689C046 89009A97 8B260098 878B260A 5EC4FE56 89FC4689 .F=.V±á^.&....&.....Få.Vôá^.&... 0001C0
 8001EFE9 00008800 06E90374 001E7F83 260A5EC4 BC5689BA 4689009E 978B2600 .&.....Fɑ.V¥á^.&....t.õ..¡..õÿ.. 0001E0

Dump of file SATURN:[PCCOMMON.DUMP.DLL]PDLDGM.TMP;1 on 18-APR-1990 10:48:18.73
```

File ID (766,30,0). End of file block 195 / Allocated 196

Virtual block number 174 (000000AE), 512 (0200) bytes

C84689C2 5688C046 8B0CC483 00000292 9A006AE4 76FFE676 FF027968 5016C446 Fá.Phy..vl.vôj.......á..Fâ.Vô.Fà 000000
56890046 89FE5613 FC4603C2 5688C046 88CE5689 CC46898C 5688BA46 88CA5689 .Vò.Fo.V¥.Fä.Vö.Fâ.Vô.F•.V±.FÅ.V 000020
006A5016 C8468DC4 76FFC676 FFD65689 D44689E2 5613E046 03BC5688 BA468802 ●.Fo.V¥.FÁ.Vã.Fâ.Vø.vó.vá.Fà.Pj. 000040
6AEA5689 E84689C2 5688C046 8B0000FF FF9A016A 006A006A 016A286A 006A286A j(j.j(j.j.j.j.......Fâ.Vô.Fò.Vöj 000060
89EC4689 BC56138A 4603026D 00369A50 52000A83 00012DE2 5688E046 88026A00 .j..FÁ.Vã-...Ö.RP.6.m..Fo.V¥.Fś. 000080
F65689F4 4689EE56 88EC4688 F25689F0 4689FE56 13FC4603 C25688C0 4688EE56 VŸ.Fä.Vö.F•.V±.FÞ.V·.Fš.VŸ.F¶.V– 0000A0
EE5688EC 46880000 FFFF9A01 6A016A00 6A5016E8 4680026A 006AC476 FFC676FF .vó.váj.j..FÒ.Pj.j.j.......Fš.VŸ 0000C0
52032B00 369AE076 FFE276FF 046A006A 24BC681E C476FFC6 76FFCE56 89CC4689 .Fä.Vö.vó.vá.h¥$j.j..vā.vÁ.6.+.R 0000E0
6AE476FF E676FF02 7F685016 D8468D00 00033B9A 006A006A 006A5016 C8468D50 P.Fà.Pj.j.j..;....FÁ.Ph...vl.vôj 000100
6AF876FF FA76FF27 14680876 FFDA76FF 136A5016 DC468D0C C4830000 02829A00 ..ÿ....á..FÉ.Pj..vÖ.vÁh.'.v'.vhj 000120
50169846 8D0093E9 BE468B00 06E90375 00BE7E83 BE468912 C4830000 02E29A00 ..ã....á..Ff.–f.u.Õ...FfÕ...F..P 000140
00BE7E83 BE468910 C4830000 FFFF9A00 6ADC76FF DE76FF27 1C680876 FFDA76FF .vÖ.vÁh.'.vB.vÉj.......ó..Ff.–f. 000160
CC46898C 5688BA46 88D65689 D44689CE 5688CC46 880063E9 BE468B00 06E90375 u.Õ...FfÕc..Fä.Vö.Få.Vø.Fo.V¥.Fä 000180
8D5052FF FF00369A E076FFE2 76FF046A 006A5016 98468DC4 76FFC676 FFCE5689 .Vö.vó.vá.F..Pj.j..vā.vÁ.6...RP. 0001A0
006A0676 FF0876FF 0A76FF0C 76FF0320 680000FF FF9A006A 006A006A 5016C846 Fà.Pj.j.j......h ..v..v..v..v.j. 0001C0
88D88E00 E6881E56 57000000 C8CBC95F 5E1F0000 E9000088 0CC48300 00FFFF9A ......á.|..Õ...^_èùà...WV.¡l..Ä. 0001E0

Dump of file SATURN:[PCCOMMON.DUMP.DLL]PDLDGM.TMP;1 on 18-APR-1990 10:48:18.73
File ID (766,30,0) End of file block 195 / Allocated 196

Virtual block number 175 (000000AF), 512 (0200) bytes

26065EC4 D88E036B B81E5657 000000C8 CBC95F5E 1F0000E9 00020508 56880646 F..V....Õ...^_èùà...WV.¡k..Äá^.& 000000
03876808 8E038888 1E565700 0000C8CB C95F5E1F 0000E900 EC978826 00EA8788 ..õ.&..š.Õ..._èùà...WV.¡...Ähñ. 000020
00826801 6A25B668 1E00EE68 24D2681E 026A096A FFFF68FF FF680081 68FFFF68 h..h..h..h..j.j..høShŸ..hÑ%j.h.. 000040
02460203 03630029 03BA0005 0000CBC9 5F5E1F00 00E91EC4 830000FF FF9A006A j.......á.Õ...^_èù....o.).c...F. 000060
02040002 00000029 03AE0002 03800029 03810005 00870003 00980203 01F00005 ..Þ...........Ÿ.).....Û.)....... 000080
00C90203 00170003 03D30203 02040005 01DF0203 0000002B 03A90002 0000002A *.....`.+.....Ô.......Æ.......è. 0000A0
00000000 00370003 03510203 002A0003 01800203 02170005 027D0203 00980003 ......)...........*...Q...7..... 0000C0
A8C78806 7EC4D1F7 AEF2FFFF B9C033C0 8ED88CFE 8B0A76C5 1EDE88D7 8BEC8855 U.š.●.B.év..±.Ä.â3â¿..·Ú¼ïá–..ú´ 0000E0
4688FF33 535657EC 8855CB5D C28C1FFA 8BF388A4 F3C913A5 F3E90149 A4027401 .t.ÈlìÕµÉ.èµÉ.µ.ª..õ}ÙJ.$WVS3..F 000100
56884711 7DC0080C 46880656 89084689 00001DDA F7D8F706 56884711 7DC00808 ..â).G.V.%Ä%Ö....F..V..F..â).G.V 000120
46880888 F1F7D233 0846880A 4E881575 C0080A56 890C4689 00001DDA F7D8F70A .%Ä%Ö....F..V..âu..N..F.30¼þ.Ä.F 000140
F1F7F475 D80B0801 EAD1D9D1 EBD10646 88085688 0A4E8BD8 8B38EBD3 8BF1F706 .%þ.Æ$8.Ä.N..V..F.ïŠïìïõïÄ.Ûu¶¼þ 000160
4F960233 4E017606 46380672 07770856 3B0C72D1 03E6F70A 4688910C 66F7F088 .Þ%f...F.%l.ìr.;V.w.r.;F.v.N3Ø.O 000180
0A5E88D8 080C5E88 08468BEC 88550008 CA5DE588 5F5E5B00 DA8308F7 0AF70775 u.%Ö%Ä.Ö.[^_.ì]ò..U.š.F..^..Ä.^. 0001A0
D103E3F7 06468BC8 030C66F7 06468BC8 8BE3F700 08CA5DE5 8BE3F706 46880875 u..F.%D.ì]ò..%D.à.F.%f..à.F.%D.ï 0001C0
18370320 00100378 0002000A 00000001 00000000 00000000 00000008 CA5DE588 .ì]ò.....................x.... .7. 0001E0

Dump of file SATURN:[PCCOMMON.DUMP.DLL]PDLDGM.TMP;1 on 18-APR-1990 10:48:18.73
File ID (766,30,0) End of file block 195 / Allocated 196

Virtual block number 176 (000000B0), 512 (0200) bytes

00344C44 27DB002E 482127D8 00282745 08F60022 264708E4 001C1D72 03220016 .."..r...ö.G&"..–.E'(.Ä'IK..Û'DL4. 000000
08980052 0696089A 004C0C8E 08990046 12780898 00404A7B 2800003A 4DF3270C É'µM:..((Jã...x.F.....L.....R... 000020
0F0C08A1 00700E3A 08A0006A 0A0C089E 006407E1 0890005E 00C8089C 0058005C \.X...ù.^...Ä.d.....j...:.p.À... 000040
00941460 08A6008E 138208A5 0088119E 08A40082 108008A3 007C0F0E 08A20076 v.Ä.B.|.È.¯...È.....È.....Ì.`... 000060
08AC0082 202508AB 00AC1DE9 08AA00A6 1C2D08EC 00A01AE8 08A9009A 153008A7 Ï.=... .Ö...š.-.Ï.ˆ.Õ.¯.¨.x ý.¯. 000080
2A1008AF 000029CD 08F700CA 298A08AE 00C4291B 08AD00BE 283F088C 00882312 .#⊥.¥.?(ƒ.Ù..)á.Ù..)ò.%.ë)Å.£..* 0000A0
00F42B7B 08EA00EE 28420883 00E82801 088200E2 2AC00881 000C2A7F 08800006 ø.¯..*É.Ÿ.â*ã.ý..+Ö.°.B+Ÿ.ð.(+¶. 0000C0
08020112 2C9E0887 010C2C5D 08D00106 2C200886 01002BD0 088500FA 28A408B4 Ç.Ê+ª.ç.ì+..Ñ. ,..Ì.],..ñ.,...●. 0000E0
2D76088D 01302047 08CA012A 2D180889 01242CD8 0888011E 438C08D3 0118434B KC..Æ..C..¡.Ù,$.¿..–*.ò.G-0.§.v- 000100
015432FA 08C2014E 313408C1 01482EFF 08C00142 2E6A08BF 013C20ED 08BE0136 6./.Ù-<.¢.j.8.â...H.ê.41N.ô.ª2T. 000120
08C90172 3A2008C8 016C3992 08C60166 38F508C5 016035E7 08C4015A 337208C3 û.r3Z.á.Ö5'.é.%8f.ó..9l.à. :r.è. 000140
411A08D1 01903FFA 08CE018A 3E4308CD 01843D11 08CC017E 3C5308CB 01783A63 c:x.Ù.S<–.ä..=..ë.C>..ö.ª?..1..A 000160
01B443CD 08D601AE 441008D5 01A80264 08D401A2 42E908CF 019C4312 08000196 ..Ä..C..ü.ÕBÅ.â.d.¯.1..DÒ.ø.ëCÇ. 000180
08DC01D2 46A408D8 01CC45F4 080A01C6 454808D9 01C04515 08D801BA 44E208D7 ●.âÐα.Ä..Eõ.).HEÓ.Ö.¶Eä.Ù.ÉFØ.É. 0001A0
4A5108E2 01F049C2 08E001EA 496308E1 01E448E9 08DF01DE 480408DE 01D84754 TGÄ.B..HB.Ô.ÖHÖ.Ä.cIÖ.Á.ôIÞ.â.QJ 0001C0
02145094 08E9020E 506308E6 02085032 08E50202 3AA608E7 01FC4FA2 08E301F6 –.D.ÀO=.Ô.Ï:..Ï.2P..Ï.cP..Õ..P.. 0001E0

Dump of file SATURN:[PCCOMMON.DUMP.DLL]PDLDGM.TMP;1 on 18-APR-1990 10:48:18.73

```
File ID (766,30,0)   End of file block 195 / Allocated 196

Virtual block number 177 (000000B1), 512 (0200) bytes

 08F10232 541A08F0 022C57D6 08EF0226 54C308EE 022052E1 08ED021A 523C08EB Š.<R..Ú.ÃR .Ÿ.ÙT&.ÿ.øW,.Þ..T2.þ. 000000
 5F992654 02505FD3 265A024A 5F0C08F4 02445C98 08F3023E 5B3E08F2 02385A48 HZ8.·.>[>.µ..\D.¶.._J.Z&ß_P.T&._ 000020
 00000000 00000004 614F08FA 02681EED 08F90262 610C08F8 025C6008 08F5FFFF ..%.Ä'\.½..ab.'.U.h.'.Oa........ 000040
 26490292 177E0327 028C1654 03210286 02AF0002 02800000 0001027A 04B8271A .'¡.z.........£...!.T...'.-...I& 000060
 03DE265E 028002FF 264A02AA 07752653 02A405A2 2652029E 001C2648 029802C6 ó...H&....R&Å.Ê.S&u.¨.J&..¯.^&ß. 000080
 02D41C7A 264C02CE 1BC40324 02C8126C 032002C2 19692651 028C11D8 264B02B6 Ñ.K&Å.¥.Q&i.ô. .l.à.$.á.ö.L&z.å. 0000A0
 265502F2 1D082650 02EC1233 264F02E6 1D99264E 02E01D60 265402DA 1CB3264D M&°.Ö.T&'.Å.N&..Ì.O&3.š.P&..·.U& 0000C0
 2371265B 03102348 2659030A 21432657 030408 9C 265802FE 098E2656 02F82102 .!½.V&..±.X&....W&C!..Y&H#..[&q# 0000E0
 033424A8 08A0032E 23FC265F 03281F3A 265D0322 23D3265C 031C23AA 265A0316 ..Z&¨#..\&ß#".]&:.(._&=#..Ù.¨$4. 000100
 00000000 00000000 FFFF26A6 26630346 25C02661 03402587 2660033A 250A08F3 µ..%:.'&.%a.a&ã%F.c&T&.......... 000120
 40D33FDB 020C49BA 5E353FE2 04189374 BC6A3FE8 00000000 00003FF0 00000000 ....Þ?......Ò?j¥t...ã?5^¤I..Ù?ÆM 000140
 999A3FC1 0624DD2F 1AA03FC6 C8B43958 10623FCE 56041893 74BC3FD4 39581062 b.X9å?¥t...Vö?b.X9Çàó?../ï$.ê?.. 000160
 A9FC3FA5 810624DD 2F1B3FAC AC083126 E9793FB3 33333333 33333FB9 99999999 ....¿?333333°?yÒ&1.¯¯?./ï$..Ë?=¨ 000180
 147B3F8A 9FBE76C8 B4393F92 6E978D4F DF3B3F98 9374BC6A 7EFA3FA0 624DD2F1 þØMb.?'~j¥t..?;ÒO..n.?9Çàv/..?(. 0001A0
 00380014 00370013 00360016 0035000B 0034000C 0033000A 00323F84 7AE147AE ÜGÃz.?2...3...4...5...6...7...8. 0001C0
 0042001C 0041001B 0040001A 003F000E 003C0010 003B0011 003A000F 0039001F ..9...:...;...<...?...@...A...B. 0001E0

Dump of file SATURN:[PCCOMMON.DUMP.DLL]PDLDGM.TMP;1 on 18-APR-1990 10:48:18.73
File ID (766,30,0)   End of file block 195 / Allocated 196

Virtual block number 178 (000000B2), 512 (0200) bytes

 004A0027 00490025 00480021 0047001D 0046002A 0045001E 00440028 0043002E ..C.(.D...E.*.F...G.!.H.%.I.'.J. 000000
 00520019 00510018 00500024 004F002B 004E002C 004D002D 004C0029 004B0026 &.K.).L.-.M.,.N.+.O.$.P...Q...R. 000020
 6E696E72 61570000 00000082 00810065 003E0064 003D005E 00610003 00530020  .S...a.^.=.d.>.e.........Warnin 000040
 75616320 6C6C6977 20746365 6A626F20 73696874 20676E69 7463656C 65530067 g.Selecting this object will cau 000060
 7720646E 6160606F 43206568 7420666F 2073746E 65746E6F 63206568 74206573 se the contents of the Command w 000080
 61772075 6F79206F 44203F20 64656361 6C706572 20656220 6F742077 6F646E69 indow to be replaced ? Do you wa 0000A0
 49207372 656C646E 61482072 6F727245 003F2064 6565636F 7270206F 7420746E nt to proceed ?.Error Handlers I 0000C0
 4900656C 62697369 56207265 6C646E61 4820726F 72724500 656C6269 7369766E nvisible.Error Handler Visible.I 0000E0
 6E492073 65746F4E 0066664F 20776569 56204C40 49006E4F 20776569 56204C4D ML View On.IML View Off.Notes In 000100
 34CE0002 055002FF 00010065 6C626973 69562073 65746F4E 00656C62 69736976 visible.Notes Visible.....P...ö4 000120
 05740CC0 0276056E 0A62025B 05680A36 025A0562 08F60259 055C07BB 02580556 V.X.£.\.Y.~.b.Z.6.h.[.b.n.v.å.t. 000140
 02780592 15000284 058C1369 02730586 08C30283 05800869 0274057A 0C130275 u...z.t.i.....û...s.i.........x. 000160
 11000299 0580109F 029805AA 00CC0282 05A4005E 0281059E 16710279 05981630 0...y.q.....^.Ê...ä.¨.....¯..... 000180
 05041E34 027D05CE 18880260 05C8171F 027C05C2 1824027B 058C1682 027A05B6 Ñ.z.ý.¥.(.$.ô.|...à.'...ö.).4.å. 0001A0
 026305F2 20250262 05EC1F83 026105E6 1F420280 05E01F01 027F05DA 1EC8027E ~.à.Ö.....Á...ß.Ì.a...š.b.X ·.c. 0001C0
 23D00268 0610234F 0267060A 22AD0266 0604220B 026505FE 21690264 05F820C7 ú %.d.i!±.e.."..f.Ü"..g.O#..h.ï# 0001E0

Dump of file SATURN:[PCCOMMON.DUMP.DLL]PDLDGM.TMP;1 on 18-APR-1990 10:48:18.73
File ID (766,30,0)   End of file block 195 / Allocated 196

Virtual block number 179 (000000B3), 512 (0200) bytes

 0634258C 0288062E 253A0287 062824BD 02860622 24490285 061C23F4 02690616 ..i.¶#....I$"...§$(...:%....¥%4. 000000
 028C0652 319C0297 064C2DBD 02880646 2F61028A 064029AD 0296063A 28330289 ..3+:...Ù)@...a/F....-L....1R... 000020
 35450290 067032AB 026A066A 003D0294 06643251 028E065E 1C2902BD 06583218 .2X...).^...Q2d...=.j.j.¨2p...E5 000040
 069437DC 029E068E 37B00295 06883733 02930682 3695026E 067C35E6 02910676 v...I5|.n..6....37.....7....É7.. 000060
 72500000 00000000 FFFF398B 029D06A6 3961029A 06A03931 029C069A 382B029B ..+8....19....a9Ì....9........Pr 000080
 FFFFFFD8 00000000 00000000 0000FFFF 00F50320 06C00000 00010073 7365636F ocess.....å. .%.............Ä... 0000A0
 01900000 00480000 00640000 00010005 00390269 00080000 00000096 00000190 ............i.9.......d...K..... 0000C0
 00000190 00000000 00000064 00000001 00050039 02690005 00000000 00960000 ...........i.9.......d.......... 0000E0
 00000000 0064FFFF FFD80000 00000000 00000005 026A026A 00050007 0000004B K.......j.j...........Ä...d..... 000100
 00000000 0000017C FFFFFFD8 00000118 00000000 00040030 00000001 00100000 .........0...........Ä...|....... 000120
 00100000 00000000 00000000 00000000 00000000 00000004 00080292 00020011 ................................ 000140
 00070011 00000000 00000000 00000000 00000000 00000000 00040030 00000006 ....0........................... 000160
 00000000 00000000 00000000 00000000 00000000 00000000 00000004 00080292 ................................ 000180
 FF740000 00000000 FFFF00BC 032007C6 00000001 FFFF06C8 00000000 00000000 ........à.......6. .¥.........t. 0001A0
 00000000 00000001 00050024 02400008 00000000 00960000 01AEFFFF FFD8FFFF ..Ä...Û............@.$.......... 0001C0
 0037FFFF FF740000 00010005 00240240 00050000 00000096 00000190 0000006F o...............@.$.......t...7. 0001E0

Dump of file SATURN:[PCCOMMON.DUMP.DLL]PDLDGM.TMP;1 on 18-APR-1990 10:48:18.73
```

```
File ID (766,30,0)    End of file block 195 / Allocated 196

Virtual block number 180 (000000B4), 512 (0200) bytes

 00000082 00000190 00000000 00040030 00000004 00000000 005FFFFF FF9C0000 ......_..........0............... 000000
 01AE0000 005A0000 01900000 00000004 0000023D 0003000E 00000096 000001AE Û..........=.............Z...Û. 000020
 000001AE 00000032 00000190 00000000 00040000 02500003 00100000 006E0000 ..n.......P.............Z...Û... 000040
 00000000 00000000 00000000 00000000 00000004 00000260 0003000F 00000046 F.......`....................... 000060
 00000000 00000000 00000000 00000000 00000000 00040030 00000006 00110000 ........0....................... 000080
 00000000 00000000 00000000 00000000 00000000 00000004 00080000 00070012 ................................ 0000A0
 00000000 FFFF0008 032008EA 00000001 07BA07CE 00000000 00000000 00000000 ............ö.¤.....ö. .Ä....... 0000C0
 00000001 00050007 02050008 00000000 00960000 01900000 0000FFFF FF740000 ..t............................. 0000E0
 FF740000 00010005 00070205 00050000 00000096 00000190 00000000 00000000 ...............................t. 000100
 00000000 00000010 00040030 00000004 00000000 005FFFFF FF9C0000 0037FFFF ..7......_..........0........... 000120
 000108DE 08F20000 00000000 00000000 00000000 00000000 00000000 00000000 ..........................·.B.... 000140
 00000096 000001AE FFFFFFD8 FFFFFF74 00000000 0000FFFF 00BC0320 09780000 ..x. .¥.........t...Ä...Û........ 000160
 00000000 00960000 01900000 006F0000 00000000 00010005 00160229 00080000 ....)............o.............. 000180
 00040000 0000005F FFFFFF9C 00000037 FFFFFF74 00000001 00050016 02290005 ..).........t...7........_....... 0001A0
 023D0003 000E0000 00960000 01AE0000 00820000 01900000 00000004 00300000 ..0..................Û..........=. 0001C0
 00000250 00030010 0000006E 000001AE 0000005A 00000190 00000000 00040000 ............Z...Û...n.......P... 0001E0

Dump of file SATURN:[PCCOMMON.DUMP.DLL]PDLDGM.TMP;1 on 18-APR-1990 10:48:18.73
File ID (766,30,0)    End of file block 195 / Allocated 196

Virtual block number 181 (000000B5), 512 (0200) bytes

 00040000 02600003 000F0000 00460000 01AE0000 00320000 01900000 00000004 ..........2...Û...F.......`..... 000000
 00000004 00300229 00060011 00000000 00000000 00000000 00000000 00000000 ..........................).0..... 000020
 00000000 00040008 02290007 00120000 00000000 00000000 00000000 00000000 ......................)......... 000040
 09800000 00000000 00000000 00000000 00000000 00000000 00000000 00000000 ................................ 000060
 00000190 FFFFFFD8 FFFFFF74 00000000 0000FFFF 00BC0320 0A9C0000 0001096C l....... .¥.........t...Ä....... 000080
 00960000 01900000 00480000 00000000 00010005 00060201 00080000 00000096 ......................K......... 0000A0
 0000004B 00000190 00000000 00000000 00000001 00050006 02010005 00000000 ............................K... 0000C0
 00000000 005FFFFF FF9C0000 0037FFFF FF740000 00000005 00150000 00050010 ..............t...7......_...... 0000E0
 0001000E 00000000 00000064 FFFFFFD8 00000000 00000000 00040000 00000004 ...............Ä...d............ 000100
 02920002 000F0000 00000000 0190FFFF FFD80000 012C0000 00000004 00940000 ..........,...Ä................. 000120
 00080262 0007000F 00000000 00000000 00000000 00000000 00000000 00040008 ............................b... 000140
 00040094 00000006 000E0000 00000000 00000000 00000000 00000000 00000004 ................................ 000160
 00000000 00000000 00000000 00000000 00000000 00000000 00000000 00000000 ................................ 000180
 032008D2 00000001 00004E45 48540045 534C4500 46494553 4C450A90 0AA40000 ..Ê...ELSEIF.ELSE.THEN......Ø. . 0001A0
 00000096 000001AE FFFFFFD8 FFFFFF74 00000000 0000FFFF 03CE08E8 0BD800BC ¥.Ä.Ò.ö.........t...Ä...Û........ 0001C0
 00000000 00960000 01900000 006F0000 00000000 00010005 00120222 00080000 ...."............o............. 0001E0

Dump of file SATURN:[PCCOMMON.DUMP.DLL]PDLDGM.TMP;1 on 18-APR-1990 10:48:18.73
File ID (766,30,0)    End of file block 195 / Allocated 196

Virtual block number 182 (000000B6), 512 (0200) bytes

 00040000 0000005F FFFFFF9C 00000037 FFFFFF74 00000001 00050012 02220005 .."..........t...7......_....... 000000
 00000005 000E0000 006F0000 01900000 00000000 00000000 00000004 00120000 .....................o......... 000020
 00300000 0001000F 00000000 00000064 FFFFFFD8 00000000 00000000 00050015 ............Ä...d.............0. 000040
 00040030 00000006 000F0000 00000000 00000000 00000000 00000000 00100004 ...............................0... 000060
 00000000 00000000 00000000 00000000 00000000 00000000 00000000 00000010 ................................ 000080
 FF740000 00000000 FFFF025D 08E80CC6 00BC0320 0CC00000 00010BB4 0BE00000 ..Ä.Ç.....à. .¥.ó.Ò.}.........t. 0000A0
 00000000 00000001 0005001D 02390008 00000000 00960000 01AEFFFF FFD8FFFF ..Ä...Û..........9.............. 0000C0
 0037FFFF FF740000 00010005 001D0239 00050000 00000096 00000190 0000004B K...............9.........t...7. 0000E0
 00000000 00000000 00000010 00040030 00000004 00000000 005FFFFF FF9C0000 ......_..........0.............. 000100
 0064FFFF FFD80000 00000000 00000005 00150000 0005000E 0000004B 00000190 ....K.......................Ä...d. 000120
 00000000 00000000 00000000 00000001 00040000 02830001 000F0000 00000000 ................................ 000140
 00000000 00000000 00000000 00000000 00000004 00120222 0006000F 00000000 ........"....................... 000160
 FFFF00BC 03200DAE 00000001 0CB40CCE 00000000 00000000 00000000 00000000 .................ö.Ç.....Û. .¥... 000180
 00050030 026F0008 00000000 012C0000 01AEFFFF FFD8FFFF FF740000 00000000 .......t...Ä...Û...,........o.=... 0001A0
 00010005 0030026F 00050000 0000012C 00000190 000000E1 00000000 00000001 ..........Ä.......,........o.=..... 0001C0
 00000010 00040030 00000004 00000000 00AAFFFF FF9C0000 0082FFFF FF740000 ..t............`.........0....... 0001E0

Dump of file SATURN:[PCCOMMON.DUMP.DLL]PDLDGM.TMP;1 on 18-APR-1990 10:48:18.73
```

```
File ID (766,30,0)   End of file block 195 / Allocated 196

Virtual block number 183 (000000B7), 512 (0200) bytes

 00000000 00000005 0005028F 00050019 00000064 00000190 00000000 00000000 ............d................... 000000
 00000190 00000000 00050018 02300005 000E0000 00C80000 01900000 00640000 ..d.......à.......0............. 000020
 01180000 01900000 00000004 008101F7 00030010 00000104 000001AE 000000F0 Þ...Û...........¥............... 000040
 000000C8 00000190 00000000 0004004B 02940003 00110000 012C0000 01AE0000 ..Û...,.........K...........à... 000060
 01AE0000 00A00000 01900000 00000004 001A0234 00030016 0000000C 000001AE Û...É.......4.................Û. 000080
 000001AE 00000078 00000190 00000000 00040031 025F0003 00150000 00B40000 ..Ç......._.1...........x...Û... 0000A0
 00640000 01AE0000 00500000 01900000 00000004 00470288 00030014 0000008C ..........Ğ...........P...Û...d. 0000C0
 0000003C 000001AE 00000028 00000190 0000000C 00040044 02840003 001A0000 ........D...........(...Û...<... 0000E0
 00120000 00000000 0064FFFF FFD80000 00000000 000C0004 001F023B 00030017 ....;..............Ä...d........ 000100
 00020018 00000000 00000190 FFFFFFD8 0000012C 00000010 00040030 00000001 ....0.......,...Ä............... 000120
 026F0006 00120000 00000000 00000000 00000000 00000000 00000004 00080292 ..............................o. 000140
 0008026F 00070018 00000000 00000000 00000000 00000000 00000010 00040030 0............................o... 000160
 00000000 00000000 00000000 00000000 00000000 00000000 00000000 00000004 ................................ 000180
 0000FFFF FF740000 00000000 FFFF008C 03200FC2 00000001 00A20086 00000000 ....Ñ.Å.....ô. .¥.........t..... 0001A0
 00000064 00000000 00000001 00050004 02770008 00000000 00960000 01900000 ...............w.............d... 0001C0
 01900000 00320000 00000000 00010005 00040277 00050000 00000096 00000190 ..............w.............2..... 0001E0

Dump of file SATURN:[PCCOMMON.DUMP.DLL]PDLDGM.TMP;1 on 18-APR-1990 10:48:18.73
File ID (766,30,0)   End of file block 195 / Allocated 196

Virtual block number 184 (000000B8), 512 (0200) bytes

 00000190 00000000 00000000 00000001 00050049 00000005 000E0000 00640000 ..d.........I................... 000000
 005FFFFF FF9C0000 0037FFFF FF740000 00010005 00150000 0005000F 00000032 2.................t...7........_. 000020
 00000000 00000000 00000000 00000000 00000010 00040030 00000004 00000000 ........0....................... 000040
 FF9C0000 00000000 FFFF0000 00010FB6 0FCA0000 00000000 00000000 00000000 ..............ò.Ñ................ 000060
 00000000 00000000 00050000 02930008 00000000 00960000 01900000 0000FFFF ................................ 000080
 00000000 00000000 00000005 00000293 00050000 00000096 00000190 00000000 ................................ 0000A0
 00000001 1080108E 00000000 00000000 00000000 00000000 00000000 00000000 ................................ 0000C0
 00000000 00960000 01AEFFFF FFD8FFFF FF740000 00000000 FFFF008C 032010F6 ~. .¥.........t...Ä...Û......... 0000E0
 00050000 00000096 00000190 00000000 00000000 00000001 00050086 02480008 ..H............................. 000100
 00000004 00000000 005FFFFF FF9C0000 0037FFFF FF740000 00010005 00860248 H.........t...7.......-......... 000120
 00920285 0003000E 00000096 000001AE 00000082 00000190 00000010 00040030 0...............Û............... 000140
 00040091 02950003 000F0000 006E0000 01AE0000 005A0000 01900000 00000004 ..........Z...Û...n............. 000160
 00000004 0093028A 00030010 00000046 000001AE 00000032 00000190 00000000 ........2...Û...F............... 000180
 00000010 00040030 00000001 00110000 00000000 0064FFFF FFD80000 00000000 ......Ä...d..............0....... 0001A0
 00000000 00000004 00080292 00020012 00000000 00000190 FFFFFFD8 0000012C ,...Ä........................... 0001C0
 00000000 00000010 00040030 02480006 00110000 00000000 00000000 00000000 ..................H.0........... 0001E0

Dump of file SATURN:[PCCOMMON.DUMP.DLL]PDLDGM.TMP;1 on 18-APR-1990 10:48:18.73
File ID (766,30,0)   End of file block 195 / Allocated 196

Virtual block number 185 (000000B9), 512 (0200) bytes

 00000000 00000000 00000004 00080248 00070012 00000000 00000000 00000000 ................H............... 000000
 00000001 10EA10FE 00000000 00000000 00000000 00000000 00000000 00000000 ........................±.õ..... 000020
 00000000 00960000 01AEFFFF FFD8FFFF FF740000 00000000 FFFF00C1 03201256 V. .è.........t...Ä...Û......... 000040
 00050000 00000096 00000190 0000004B 00000000 00000001 0005002F 02580008 ..X./...........K............... 000060
 00000004 00000000 005FFFFF FF9C0000 0037FFFF FF740000 00010005 00000000 ..........t...7.......-......... 000080
 00000000 00050010 0000004B 00000190 00000000 00000000 00000010 00040030 0....................K.-........ 0000A0
 00000000 00000000 00000000 00000000 00000000 00000000 00000000 00010005 ................................ 0000C0
 00000190 00000000 00000000 00000000 0000FFFF 00000001 124A125E 00000000 ....^.J......................... 0000E0
 00960000 01900000 00000000 00000000 00010005 00000000 00080000 00000096 ................................ 000100
 00000000 00000000 00000000 00000000 00000001 00050000 00000005 00000000 ................................ 000120
 00000000 00000000 FFFF0000 000112F6 13040000 00000000 00000000 00000000 ...............-................ 000140
 00000000 00000001 00050000 00000008 00000000 00960000 01900000 00000000 ................................ 000160
 00000000 00000000 00010005 00000000 00050000 00000096 00000190 00000000 ................................ 000180
 00000001 1360136E 00000000 00000000 00000000 00000000 00000000 00000000 ........................n.'..... 0001A0
 00000000 00080000 00000096 00000190 00000000 00000000 00000000 0000FFFF ................................ 0001C0
 00050000 00000005 00000000 00960000 01900000 00000000 00000000 00010005 ................................ 0001E0

Dump of file SATURN:[PCCOMMON.DUMP.DLL]PDLDGM.TMP;1 on 18-APR-1990 10:48:18.73
```

```
File ID (766,30,0)   End of file block 195 / Allocated 196

Virtual block number 186 (0000008A), 512 (0200) bytes

00000000 00000000 00000000 00000000 00000000 00000000 00000000 00000001 ................................ 000000
FFFFFFD8 FFFFFF74 00000000 0000FFFF 00C10320 14400000 000113CA 13080000 ..Ä.ò.....ã. .ê.........t...Ä... 000020
01900000 00480000 00000000 00010005 00080292 00080000 00000096 000001AE Û.........................K..... 000040
FFFFFF9C 00000037 FFFFFF74 00000001 00050008 02920005 00000000 00960000 ....................t...7....... 000060
00480000 01900000 00000000 00000000 00000004 00080292 00040000 0000005F _..............................K. 000080
00000096 000001AE 00000082 00000190 00000000 00050009 00000005 000E0000 .........................Û....... 0000A0
00100000 00000000 0064FFFF FFD80000 00000000 00000004 00840000 0003000F ....................Ä...d......... 0000C0
00060010 00000000 00000000 00000000 00000000 00000010 00040030 00000001 ....0........................... 0000E0
00000000 00000000 00000000 00000000 00000000 00000000 00100004 00300000 ..0............................. 000100
00000000 FFFFFF9C 00000000 0000FFFF 00000001 14341448 00000000 00000000 ........H.4..................... 000120
01900000 00000000 00000000 00010005 00000000 00080000 00000096 00000190 ................................ 000140
00000000 00000000 00000000 00000000 00050000 00000005 00000000 00960000 .......................... ..... 000160
00000000 FFFF0000 0001153A 15480000 00000000 00000000 00000000 00000000 ...................H.:..... .... 000180
00000001 00050000 00000008 00000000 00960000 01900000 0000FFFF FF9C0000 ..........:..................... 0001A0
00000000 00010005 00000000 00050000 00000096 00000190 00000000 00000000 ................................ 0001C0
15A415B2 00000000 00000000 00000000 00000000 00000000 00000000 00000000 ............................ý.É. 0001E0

Dump of file SATURN:[PCCOMMON.DUMP.DLL]PDLDGM.TMP;1 on 18-APR-1990 10:48:18.73
File ID (766,30,0)   End of file block 195 / Allocated 196

Virtual block number 187 (000000BB), 512 (0200) bytes

00080000 00000064 0000012C 00000000 FFFFFF9C 00000000 0000FFFF 00000001 ......................,...d....... 000000
00000000 00000000 00000000 00000000 00000000 00000000 00010005 00490000 ..I............................. 000020
00000000 FFFFFF9C 00000000 0000FFFF 00000001 160E161C 00000000 00000000 ................................ 000040
01900000 00000000 00000000 00010005 00000000 00080000 00000096 00000190 ................................ 000060
00000000 00000000 00000000 00000001 00050000 00000005 00000000 00960000 ................................ 000080
00030320 16000000 0001165A 16680000 00000000 00000000 00000000 00000000 ...................h.Z.....Ä. .Æ. 0000A0
008B022F 00080000 00000096 000001AE FFFFFFD8 FFFFFF74 00000000 0000FFFF .........t...Ä...Û............/... 0000C0
0005008B 022F0005 00000000 00960000 01900000 006F0000 00000000 00010005 ..........o...............//..... 0000E0
00100004 00300000 00040000 0000005F FFFFFF9C 00000037 FFFFFF74 00000001 ....t...7......_..........0..... 000100
00000000 00050015 00000005 000E0000 006F0000 01900000 00000000 00000000 ..............o................. 000120
01900000 00000004 00480294 0003000F 00000082 000001AE 00000096 00000190 ........Û..............K......... 000140
00000190 00000000 00040091 02950003 00110000 006E0000 01AE0000 005A0000 ..Z...Û...n..................... 000160
000A0000 01900000 00000004 0093028A 00030012 00000046 000001AE 00000032 2...Û...F....................... 000180
FFFFFFE2 00000190 00000000 0004001B 02360003 00160000 001E0000 01AE0000 ..Û...........6..............ã... 0001A0
0064FFFF FFD80000 00000000 00000004 00980296 00030010 FFFFFFF6 000001AE Û...-.........................Ä...d. 0001C0
00000190 FFFFFFD8 0000012C 00000010 00040030 00000001 00170000 00000000 ............0.......,...Ä....... 0001E0

Dump of file SATURN:[PCCOMMON.DUMP.DLL]PDLDGM.TMP;1 on 18-APR-1990 10:48:18.73
File ID (766,30,0)   End of file block 195 / Allocated 196

Virtual block number 188 (000000BC), 512 (0200) bytes

00000000 00000000 00000000 00000000 00000004 00080292 00020019 00000000 ................................ 000000
00000000 00000000 00000000 00000000 00000010 00040030 022F0006 00170000 ....../.0....................... 000020
00000000 00000000 00000000 00000000 00000000 00000004 0008022F 00070019 ..../........................... 000040
53495752 4548544F 004C4553 45534143 16C41608 00000000 00000000 00000000 ............Ä.Ä.CASESEL.OTHERWIS 000060
000001AE FFFFFFD8 FFFFFF74 00000000 0000FFFF 008C0320 189C0000 00010045 E....... .¥.........t...Ä...Û... 000080
00960000 01900000 006F0000 00000000 00010005 00000000 00080000 00000096 .........................o......... 0000A0
0000005F FFFFFF9C 00000037 FFFFFF74 00000001 00050000 00000005 00000000 ....................t...7......_... 0000C0
000E0000 006F0000 01900000 00000000 00000000 00000004 00000000 00040000 ...............................o..... 0000E0
0001000F 00000000 00000064 FFFFFFD8 00000000 00000000 00050015 00000005 ...................Ä...d........... 000100
00000006 000F0000 00000000 00000000 00000000 00000000 00100004 00300000 ..0............................. 000120
00000000 00000000 00000000 00000000 00000000 00000000 00000000 00040000 ................................ 000140
FFFFFF74 00000000 0000FFFF 008C0320 19840000 0001187E 18A40000 00000000 ......É.~....... .¥..........t... 000160
006F0000 00000000 00010005 0048028B 00080000 00000096 000001AE FFFFFFD8 Ä...Û..............H............o. 000180
00000037 FFFFFF74 00000001 00050048 02880005 00000000 00960000 01900000 ...................H.......t...7... 0001A0
01900000 00000000 00000000 00100004 00300000 00040000 0000005F FFFFFF9C ...._.........0.................. 0001C0
000001AE 00000082 00000190 00000000 0005009E 00000005 000E0000 006F0000 ..o.........................Û... 0001E0

Dump of file SATURN:[PCCOMMON.DUMP.DLL]PDLDGM.TMP;1 on 18-APR-1990 10:48:18.73
```

```
File ID (766,30,0)   End of file block 195 / Allocated 196

Virtual block number 189 (000000BD), 512 (0200) bytes

 006E0000 01AE0000 005A0000 01900000 00000004 00480294 0003000F 00000096 ..........K...........Z...Û...n. 000000
 00000000 00000190 FFFFFFD8 0000012C 00000000 00040000 01F70003 00100000 ......¼.........,...Ä........... 000020
 00120000 00000000 00000000 00000000 00000000 00000004 00080292 00020012 ................................ 000040
 00030011 00000046 000001AE 00000032 00000190 00000000 00040008 02880007 ................2...Û...F....... 000060
 02840003 00130000 001E0000 01AE0000 000A0000 01900000 000C0004 001F023B ;.................Û............. 000080
 00000000 00000000 00000000 00000000 00000000 00000000 0000000C 00040044 D............................... 0000A0
 FFFFFF74 00000000 0000FFFF 00BC0320 1AE40000 00011978 198C0000 00000000 ........x.....ð. .¥.........t... 0000C0
 006F0000 00000000 00010005 0010020F 00080000 00000096 000001AE FFFFFFD8 Ä...Û..........................o. 0000E0
 00000037 FFFFFF74 00000001 00050010 020F0005 00000000 00960000 01900000 .........................t...7... 000100
 01900000 00000000 00000000 00100004 00300000 00040000 0000005F FFFFFF9C ...._..........0................. 000120
 000001AE 0000005A 00000190 00000000 0005009E 00000005 000E0000 006F0000 ..o.....................Z...Û... 000140
 00000000 0190FFFF FFD80000 012C0000 00000004 00480294 0003000F 0000006E n.........K.......,...Ä......... 000160
 00000000 00000000 00000000 00000000 00000000 00040008 02920002 00110000 ................................ 000180
 00100000 00460000 01AE0000 00320000 01900000 00000004 0008020F 00070011 ..................2...Û...F..... 0001A0
 00030012 0000001E 000001AE 0000000A 00000190 0000000C 0004001F 02380003 ..;.................Û........... 0001C0
 00000000 00000000 00000000 00000000 00000000 00000000 000C0004 00440284 ..D............................. 0001E0

Dump of file SATURN:[PCCOMMON.DUMP.DLL]PDLDGM.TMP;1 on 18-APR-1990 10:48:18.73
File ID (766,30,0)   End of file block 195 / Allocated 196

Virtual block number 190 (000000BE), 512 (0200) bytes

 FF740000 00000000 FFFF00C1 03201C26 00000001 1AD81AEC 00000000 00000000 ........š.Ä.....&. .ê.........t. 000000
 00000000 00000001 00050041 02780008 00000000 00960000 01AEFFFF FFD8FFFF ..Ä...Û.............x.A........... 000020
 00000000 00000000 00010005 00410278 00050000 00000096 00000190 0000004B K...............x.A............. 000040
 00000037 FFFFFF74 00000000 00050000 00000005 000E0000 00480000 01900000 ......K.................t...7... 000060
 01AE0000 00820000 01900000 00100004 00300000 00040000 0000005F FFFFFF9C ...._..........0...............Û. 000080
 00000000 00000000 00000000 00000000 00040081 02300003 000F0000 00960000 ..........=..................... 0000A0
 00080320 1CF00000 00011C1A 1C2E0000 00000000 00000000 00000000 00000000 ..........................Þ. .Ä. 0000C0
 003A026B 00080000 00000096 000001AE FFFFFFD8 FFFFFF74 00000000 0000FFFF .........t...Ä...Û...........k.:. 0000E0
 0005003A 02680005 00000000 00960000 01900000 00480000 00000000 00010005 .........K...............k.:... 000100
 00100004 00300000 00040000 0000005F FFFFFF9C 00000037 FFFFFF74 00000001 ....t...7......_..........0..... 000120
 00000000 00050084 00000005 000E0000 00480000 01900000 00000000 00000000 ..............K................. 000140
 01900000 00000004 00480294 0003000F 00000096 000001AE 00000082 00000190 ........Û.............K......... 000160
 00000190 0000000C 00040044 02840003 00100000 006E0000 01AE0000 005A0000 ..Z...Û...n..........D........... 000180
 00000000 00000000 000C0004 0019026A 00030011 00000046 000001AE 00000032 2...Û...F.......j................ 0001A0
 00000001 1CE41CF8 00000000 00000000 00000000 00000000 00000000 00000000 ...........................½.ð..... 0001C0
 00000000 00960000 01AEFFFF FFD8FFFF FF740000 00000000 FFFF00C1 03201DF6 -. .ê.........t...Ä...Û......... 0001E0

Dump of file SATURN:[PCCOMMON.DUMP.DLL]PDLDGM.TMP;1 on 18-APR-1990 10:48:18.73
File ID (766,30,0)   End of file block 195 / Allocated 196

Virtual block number 191 (000000BF), 512 (0200) bytes

 00050000 00000096 00000190 0000004B 00000000 00000001 0005003F 02750008 ..u.?...........K................ 000000
 00000004 00000000 005FFFFF FF9C0000 0037FFFF FF740000 00010005 003F0275 u.?........t...7......._......... 000020
 00000000 0005000E 0000004B 00000190 00000000 00000000 00000010 00040030 0...................K........... 000040
 0004004B 02940003 000F0000 00960000 01AE0000 00820000 01900000 00000005 ..............Û.............K... 000060
 000C0004 00440284 00030010 0000006E 000001AE 0000005A 00000190 00000000 ........Z...Û...n.........D..... 000080
 0000000C 00040046 026A0003 00110000 00460000 01AE0000 00320000 01900000 ......2...Û...F.......j.F....... 0000A0
 1DFE0000 00000000 00000000 00000000 00000000 00000000 00000000 00000000 ..............................±. 0000C0
 00000190 00000000 FFFFFF74 00000000 0000FFFF 00C10320 1EFC0000 00011DEA ð.....▪. .ê.........t........... 0000E0
 00960000 01900000 00000000 00000000 00010005 003E0270 00080000 00000096 ........p.>..................... 000100
 0000005F FFFFFF9C 00000037 FFFFFF74 00000001 0005003E 02700005 00000000 ......p.>.......t...7......._... 000120
 00000000 00000000 00000000 00000000 00000000 00100004 00300000 00040000 ......0......................... 000140
 00000000 FFFF00C1 03201F8A 00000001 1EF01F04 00000000 00000000 00000000 ..............Þ....... .é....... 000160
 00000001 0005003C 026E0008 00000000 00960000 01900000 0000FFFF FF740000 ..t...................n.<....... 000180
 FF740000 00010005 003C026E 00050000 00000096 00000190 00000000 00000000 ...................n.<.......t. 0001A0
 00000000 00000010 00040030 00000004 00000000 005FFFFF FF9C0000 0037FFFF ..7......._.........0........... 0001C0
 00011F7E 1F920000 00000000 00000000 00000000 00000000 00000000 00000000 ...........................~... 0001E0

Dump of file SATURN:[PCCOMMON.DUMP.DLL]PDLDGM.TMP;1 on 18-APR-1990 10:48:18.73
```

```
File ID (766,30,0)   End of file block 195 / Allocated 196

Virtual block number 192 (000000C0), 512 (0200) bytes

01AEFFFF FFD8FFFF FF740000 00000000 FFFF0254 0320201E 03F50002 20180000 ... ..%..  .T.........t...Ä...Û. 000000
00000190 0000006F 00000000 00000001 00050038 02140008 00000000 00960000 ............8...........o....... 000020
005FFFFF FF9C0000 0037FFFF FF740000 00010005 00380214 00050000 00000096 ..........8.......t...7.......-. 000040
00000000 00000064 FFFFFFD8 00000000 00000010 00040030 00000004 00000000 ........0...........Ä...d....... 000060
00120000 00000000 0190FFFF FFD80000 012C0000 00100004 00300000 00010000 ......0.......,...Ä............. 000080
0003000F 00000096 000001AE 00000082 00000190 00000000 00040008 02920002 ......................Û......... 0000A0
02500003 00110000 006E0000 01AE0000 005A0000 01900000 00000004 00210230 =.!...........Z...Û...n.......P. 0000C0
00320260 00030010 00000046 000001AE 00000032 00000190 00000000 0004002B +...........2...Û...F.......`.2. 0000E0
00000000 00000000 00000000 00000000 00000000 00000000 00000000 00000004 ................................ 000100
FFD8FFFF FF740000 00000000 FFFF008C 03202142 00000001 200C2026 00000000 ....& . ....B! .¥.........t...Ä. 000120
0000006F 00000000 00000001 00050023 023F0008 00000000 00960000 01AEFFFF ..Û...........?.#...........o... 000140
FF9C0000 0037FFFF FF740000 00010005 0023023F 00050000 00000096 00000190 .............?.#.......t...7..... 000160
00000190 00000000 00000000 00000010 00040030 00000004 00000000 005FFFFF .._.........0................... 000180
00960000 01AE0000 00820000 01900000 00000005 009E0000 0005000E 0000006F o.........................Û..... 0001A0
00000000 00000190 FFFFFFD8 0000012C 00000000 00040084 00000003 000F0000 ................,...Ä........... 0001C0
00100000 006E0000 01AE0000 005A0000 01900000 00000004 00080292 00020013 ..................Z...Û...n..... 0001E0

Dump of file SATURN:[PCCOMMON.DUMP.DLL]PDLDGM.TMP;1 on 18-APR-1990 10:48:18.73
File ID (766,30,0)   End of file block 195 / Allocated 196

Virtual block number 193 (000000C1), 512 (0200) bytes

00030011 00000046 000001AE 00000032 00000190 00000000 0004009D 02A70003 ..I.............2...Û...F....... 000000
02380003 00120000 001E0000 01AE0000 000A0000 01900000 000C0004 00440284 ..D...............Û...........;. 000020
00000000 00000000 00000000 00000000 00000000 00000000 0000000C 0004001F ................................ 000040
08F52292 000E0320 228C0000 00010000 646F6874 654D2136 214A0000 00000000 ......J!6!Method......." .8.."%. 000060
00000008 00000000 00960000 0190FFFF FFD80000 00000000 00000000 FFFF0365 e..............Ä................ 000080
026A026A 00050007 0000004B 00000190 00000000 00000000 00000001 00050000 ....................K.......j.j. 0000A0
000400AA 00000001 000F0000 00000000 0064FFFF FFD80000 00140000 00000005 ...........Ä...d................ 0000C0
00000004 00080292 00020010 00000000 0000017C FFFFFFD8 00000118 00000000 .........Ä...|.................. 0000E0
00000000 000400AA 00000006 000F0000 00000000 00000000 00000000 00000000 ................................ 000100
01900000 00000004 00080292 00070010 00000000 00000000 00000000 00000000 ................................ 000120
00000190 00000000 00040022 02300003 00150000 006E0000 01AE0000 005A0000 ..Z...Û...n.......=."........... 000140
005A0000 01900000 00000004 00330260 00030016 0000006E 000001AE 0000005A Z...Û...n.......`.3...........Z. 000160
00000037 FFFFFF74 00000000 0004002C 02500003 00170000 006E0000 01AE0000 ..Û...n.......P.,.......t...7... 000180
00000000 00000000 00000000 00100004 00300000 00040000 0000005F FFFFFF9C ...._.........0................. 0001A0
0000FFFF 00000001 2278229A 00000000 00000000 00000000 00000000 00000000 ......................"x"....... 0001C0
00010005 00000000 00080000 00000096 00000190 00000000 FFFFFF9C 00000000 ................................ 0001E0

Dump of file SATURN:[PCCOMMON.DUMP.DLL]PDLDGM.TMP;1 on 18-APR-1990 10:48:18.73
File ID (766,30,0)   End of file block 195 / Allocated 196

Virtual block number 194 (000000C2), 512 (0200) bytes

00000000 00050000 00000005 00000000 00960000 01900000 00000000 00000000 ................................ 000000
23F40000 00000000 00000000 00000000 00000000 00000000 00000000 00000000 ..............................¶# 000020
00000000 00960000 01900000 0000FFFF FF9C0000 00000000 FFFF0000 000123E6 Ì#.............................. 000040
00050000 00000096 00000190 00000000 00000000 00000001 00050000 00000008 ................................ 000060
00000000 00000000 00000000 00000000 00000000 00000000 00010005 00000000 ................................ 000080
6E6F6974 61766972 65442065 74756269 72747441 2450245E 00000000 00000000 ........^$P$Attribute Derivation 0000A0
00000190 FFFFFFD8 00000000 00000000 0000FFFF 00DE0320 24DC0000 00010000 ......É$ .B..............Ä....... 0000C0
00480000 01900000 00000000 00000000 00010005 00000000 00080000 00000096 ..............................K. 0000E0
00000000 00000064 FFFFFFD8 00000014 00000000 0005026A 026A0005 00070000 ......j.j...........Ä...d....... 000100
00100000 00000000 017CFFFF FFD80000 01180000 00000004 00AC0000 0001000F ...... ...........Ä...|......... 000120
0006000F 00000000 00000000 00000000 00000000 00000000 00040008 02920002 ................................ 000140
02920007 00100000 00000000 00000000 00000000 00000000 00000004 00AC0000 ..¯............................. 000160
00000000 00000000 00000000 00000000 00000000 00000000 00000000 00040008 ................................ 000180
02560002 00000021 1EF60002 00000020 10F00002 002724BA 24E40000 00000000 ......ö$º$'...b. .....-.!.....V. 0001A0
054A0002 00000023 20120002 00000003 02740002 00000022 1F840002 00000002 ........".....t........ #.....J. 0001C0
07C00002 00000026 22860002 00000006 068A0002 00000024 213C0002 00000004 ......<!$.....¤........"&.....à. 0001E0

Dump of file SATURN:[PCCOMMON.DUMP.DLL]PDLDGM.TMP;1 on 18-APR-1990 10:48:18.73
```

File ID (766,30,0) End of file block 195 / Allocated 196

Virtual block number 195 (000000C3), 512 (0200) bytes

```
09720002 00000028 24560002 00000008 08E40002 00000027 23EC0002 00000007 ......$#'.....ð.......V$(.....r. 000000
08CC0002 0000002B 25B80002 0000000A 0A960002 00000029 24D60002 00000009 ......ø$).............|%+.....ä. 000020
10860002 0000000E 0F8C0002 0000000D 0DA80002 0000000C 0CBA0002 00000008 ......¤.......´.......¥......... 000040
13660002 00000012 12FC0002 00000011 12500002 00000010 10F00002 0000000F ......Þ.......P.......=.......f. 000060
15AA0002 00000016 15400002 00000015 143A0002 00000014 13D00002 00000013 ......Å.......:.......Ð.......^. 000080
18960002 0000001A 16CA0002 00000019 16600002 00000018 16140002 00000017 ..............`.......ð......... 0000A0
1CEA0002 0000001E 1C200002 0000001D 1ADE0002 0000001C 197E0002 0000001B ......~.......ß....... .......õ. 0000C0
00000000 00000000 00000000 00000000 00000000 00000000 00000000 0000001F ................................ 0000E0
00000000 00000000 00000000 00000000 00000000 00000000 00000000 00000000 ................................ 000100
00000000 00000000 00000000 00000000 00000000 00000000 00000000 00000000 ................................ 000120
00000000 00000000 00000000 00000000 00000000 00000000 00000000 00000000 ................................ 000140
00000000 00000000 00000000 00000000 00000000 00000000 00000000 00000000 ................................ 000160
00000000 00000000 00000000 00000000 00000000 00000000 00000000 00000000 ................................ 000180
00000000 00000000 00000000 00000000 00000000 00000000 00000000 00000000 ................................ 0001A0
00000000 00000000 00000000 00000000 00000000 00000000 00000000 00000000 ................................ 0001C0
00000000 00000000 00000000 00000000 00000000 00000000 00000000 00000000 ................................ 0001E0
```

Dump of file SATURN:[PCCOMMON.DUMP.DLL]PDLLOOKS.TMP;1 on 18-APR-1990 10:48:42.67
File ID (768,14,0) End of file block 11 / Allocated 12

Virtual block number 1 (00000001), 512 (0200) bytes

```
00000000 00000040 00000000 00000088 0000FFFF 00000004 0000000B 01145A4D MZ..............|.......Ð....... 000000
00000080 00000000 00000000 00000000 00000000 00000000 00000000 00000000 ................................ 000020
6F6E6E61 63206061 72676F72 70207369 685421CD 4C01B821 CD09B400 0EBA1F0E ..¤..Ç.ë||.LëThis program canno 000040
00000000 00000024 0A0D0D2E 65646F60 20534F44 206E6920 6E757220 65622074 t be run in DOS mode....$....... 000060
0002000A 00000000 00010000 00000800 000A800E 9C3D07EB 00020125 0505454E NE..X...Š.=..................... 000080
00000000 00000000 00010000 00040000 000001A7 00A0009C 00900090 00400031 1.Ð.........Ï.................... 0000A0
020C0F00 020C0043 012A0F00 012A002D 00980F00 00980021 00110F00 0011001E ........|.......-.*...*.C.É...É. 0000C0
008A0F00 008A0130 03C20F00 03C200EE 03400F00 034000B4 03960F00 03960076 v.......Ç.Ð...Ð.Ÿ.ô...ô.0....... 0000E0
002E0001 00000053 4B4F4F4C 4C445008 00780F01 00720147 009C0E00 0098013D *.......G.r...x..PDLLOOKS....... 000100
54454D5F 12535341 4C435245 54534947 45524854 454D5F12 444F4854 454D0600 ..METHOD._METHREGISTERCLASS._MET 000120
444F4C50 58455741 52444D47 44134D47 44034753 4D544E45 52415044 4E455348 HSENDPARENTMSG.DGM.DGMDRAWEXPLOD 000140
4152444D 47441558 4F424445 444F4C50 58455741 52444D47 4412454E 494C4445 EDLINE.DGMDRAWEXPLODEDBOX.DGMDRA 000160
53404744 094E4550 59524555 514D4744 0B474E49 52545344 45444F4C 50584557 WEXPLODEDSTRING.DGMQUERYPEN.DGMS 000180
72747320 2C737463 656A626F 20636968 70617267 204C4450 2D00004E 45505445 ETPEN..-PDL graphic objects, str 0001A0
00000000 00000000 00000020 72756F69 76616865 6220646E 61206572 75746375 ucture and behaviour ........... 0001C0
0A000200 02000000 08000A00 020002CB 1F02C483 FFFF0000 9A57D88E FFFFB81E .|...ÄW......á..ù............... 0001E0
```

Dump of file SATURN:[PCCOMMON.DUMP.DLL]PDLLOOKS.TMP;1 on 18-APR-1990 10:48:42.67
File ID (768,14,0) End of file block 11 / Allocated 12

Virtual block number 2 (00000002), 512 (0200) bytes

```
E90000B8 D88EFFFF B81E5657 000000C8 00000000 00000000 00000000 00000000 ................à...WV.|...Ä|..Õ 000000
00C8C8C9 5F5E1F00 00E90000 B8D88E00 08B81E56 57000000 C8C8C95F 5E1F0000 ...^_èùà...WV.|...Ä|..Õ...^_èùà. 000020
8E0036B8 1E565700 0000C8CB C95F5E1F 0000E900 00B8D88E 001FB81E 56570000 ..WV.|...Ä|..Õ...^_èùà...WV.|6.. 000040
FF68D88E 004DB81E 56570000 00C8C8C9 5F5E1F00 00E90002 0508568B 06468BD8 Ä.F..V....Õ...^_èùÃ...WV.|M..Äh. 000060
18C48300 00FFFF9A 006A5C6A 016A006A 006A5C6A 0000681E 016A036A FFFF68FF .h..j.j..h..j\j.j.j.j\j.......á. 000080
00010089 02030000 0002006F 00020045 00020072 00050004 C8C95F5E 1F0000E9 Õ...^_èù....r...E...o........... 0000A0
E90000B8 D88EFFFF B81E5657 000000C8 00000000 00000000 000A006A 00020008 ....j...........à...WV.|...Ä|..Õ 0000C0
08C8C8C9 5F5E1F00 00E90000 B8D88E00 08B81E56 57000000 C8C8C95F 5E1F0000 ...^_èùà...WV.|...Ä|..Õ...^_èùà. 0000E0
83FE5689 FC4689FE 578B26FC 478B260E 5EC4040E 4683D88E 001FB81E 56570000 ..WV.|...Ä.F..á^.&.G=&.W±.F=.V±. 000100
76FF006A 006A006A 006A016A FA5689F8 4689FE57 8B26FC47 8B260E5E C4040E46 F..á^.&.G=&.W±.F½.V'j.j.j.j.j..v 000120
FF006A1A C4830000 00AD9A00 6A0676FF 0876FF0A 76FF0C76 FF032068 FC76FFFE ±.v=h ..v..v..v..v.j..Ù....á.j.. 000140
00FFFF9A 006A0676 FF0876FF 0A76FF0C 76FF057B 68F876FF FA76FFFC 76FFFE76 v±.v=.v'.vÝh(..v..v..v..v.j..... 000160
00E90000 B8D88E00 36B81E56 57000000 C8C8C95F 5E1F0000 E90000B8 16C48300 ..á.|..Õ...^_èùà...WV.|6..Ä|..Õ. 000180
5E1F0000 E9000205 08568B06 468BD88E 00C7B81E 56570000 00C8C8C9 5F5E1F00 ..^_èùà...WV.|ú..Ä.F..V....Õ...^ 0001A0
6A1A6A00 0C681E01 6A056AFF FF68FFFF 68D88E00 DEB81E56 57000000 C8C8C95F _èùÃ...WV.|ß..Äh..h..j.j..h..j.j 0001C0
01000002 000590C8 C95F5E1F 0000E918 C4830000 FFFF9A00 6A5A6A01 6A006A00 .j.j.jZj.......á.Õ...^_èù....... 0001E0
```

Dump of file SATURN:[PCCOMMON.DUMP.DLL]PDLLOOKS.TMP;1 on 18-APR-1990 10:48:42.67

```
File ID (768,14,0)   End of file block 11 / Allocated 12

Virtual block number 3 (00000003), 512 (0200) bytes

01030005 0000000A 00FB0002 00180001 00860203 00080001 011A0203 00000003 ......................«......... 000000
E9000088 D88EFFFF B81E5657 000000C8 00000000 00000000 00000000 00060003 ..ø..............à...WV.¡...Ã¡..Õ 000020
4AC8C8C9 5F5E1F00 00E90000 B8D88E00 08881E56 57000000 C8C8C95F 5E1F0000 ...^_èùà...WV.¡...Ã¡..Õ...^_èùàJ 000040
838C5689 8A4689FE 578826FC 4788260E 5EC4040E 4683D88E 001F881E 56570000 ..WV.¡...Ã.F..á^.&.G=&.W±.F¤.V¥. 000060
89FE4788 260E5EC4 020E4683 EC5689EA 4689FE57 8826FC47 88260E5E C4040E46 F..á^.&.G=&.W±.Fõ.V§.F..á^.&.G±. 000080
88260E5E C4020E46 83D85689 D64689FE 578826FC 4788260E 5EC4040E 46830046 FÅ.F..á^.&.G=&.W±.Fø.VÅ.F..á^.&. 0000A0
57882612 4788260A 5EC4F656 89F44689 0C578826 0A478826 0A5EC4CE 4689FE47 G±.Fõá^.&.G.&.W..F¶.V-á^.&.G.&.W 0000C0
26164788 260A5EC4 F05689EE 46891057 88260E47 88260A5E C4B85689 B6468914 ..FR.V¡á^.&.G.&.W..FŸ.Vÿá^.&.G.& 0000E0
8910571B 260E472B 260A5EC4 1857B826 16478826 0A5EC4FA 5689F846 89185788 .W..F%.V*á^.&.G.&.W.á^.&+G.&.W.. 000100
56890246 890C571B 260A472B 260A5EC4 14578826 12478826 0A5EC4FE 5689FC46 F=.V±á^.&.G.&.W.á^.&+G.&.W..Fø.V 000120
FF0A76FF 0C76FF03 20688A76 FF8C76FF 006A006A 006A006A 016A0001 F246C7D4 àúF·..j.j.j.j.j..v¥.vαh ..v..v.. 000140
FF026A00 6ADC5689 DA4689F6 5688F446 881AC483 0000FFFF 9A006A06 76FF0876 v..v.j.......á..F¶.V-.FÖ.VÉj.j.. 000160
E05E89DE 4E89FE5E 13FC4E03 DA1BC82B F05E88EE 4E880224 00009AFC 76FFFE76 v±.v=...$..NŸ.^Þ+à.Ö.N=.^±.NB.^Å 000180
4688E856 89E64689 E05688DE 4688E456 89E24689 D45613D2 4603F656 88F4468B .F¶.V-.Fø.Vå.Fã.VÕ.FB.VÁ.F¦.VÒ.F 0001A0
89C64689 E45688E2 4688C456 89C24689 E85688E6 4688C056 89BE4689 F65688F4 ¶.V-.F/.Vä.F¦.VÒ.Fô.Vá.Fã.VÕ.Fó. 0001C0
6A50168E 468D8A76 FF8C76FF CC5689CA 4689FE56 13FC4603 F05688EE 4688C856 Và.FŸ.VÞ.F=.V±.Fò.Vë.v¥.v¤.F/.Pj 0001E0

Dump of file SATURN:[PCCOMMON.DUMP.DLL]PDLLOOKS.TMP;1 on 18-APR-1990 10:48:42.67
File ID (768,14,0)   End of file block 11 / Allocated 12

Virtual block number 4 (00000004), 512 (0200) bytes

8D026A00 6A8A76FF 8C76FF00 00FFFF9A F276FF00 6A006A01 6A006A00 6A006A00 .j.j.j.j.j..v·......v¥.v¤j.j.. 000000
76FF8C76 FFC45689 C24689E0 5688DE46 880000FF FF9A016A 006A006A 5016DA46 FÕ.Pj.j.j.......FB.VÁ.Fõ.Vá.v¥.v 000020
6A006A50 168E468D 50520269 00009AFC 76FFFE76 FF046A00 6AEA76FF EC76FF8A ¤.v§.võj.j..v±.v=...¦.RP.F/.Pj.j 000040
C45689C2 4689F056 88EE4688 CC5689CA 4689C456 88C24688 00000279 9A006A00 .j..y....Fó.Vá.Fò.Vë.FŸ.VÞ.Fó.Vá 000060
BE468D50 52FFFF00 009AFC76 FFFE76FF 046A006A D676FFD8 76FF8A76 FF8C76FF .v¥.v¤.vÅ.vøj.j..v±.v=.....RP.F/ 000080
B81E5657 000000C8 C8C95F5E 1F0000E9 00008800 00FFFF9A 006A006A 006A5016 .Pj.j.j.......j..Õ...^_èùà...WV.¡ 0000A0
8E029088 1E565700 0000C8C8 C95F5E1F 0000E900 02050856 88064688 D88E0036 6..Ã.F...V....Õ...^_èùã...WV.¡... 0000C0
0000FFFF 9A006A58 6A016A00 6A006A1A 6A002468 1E016A05 6AFFFF68 FFFF68D8 Åh..h..j.j..h$.j.j.j.j.j[j...... 0000E0
00020008 000102CC 02030288 00040285 00050009 90C8C95F 5E1F0000 E918C483 .á.Õ...^_èù.....ç........ä....... 000100
02030000 000A02AD 00020000 00090158 0002001B 00010138 02030000 000402B2 ý........B........X........Ù....... 000120
00000000 00000000 00000059 00020234 02030046 000201E1 02030032 000201F8 «...2...Ã...F...4...Y.......... 000140
08881E56 57000050 C8C8C95F 5E1F0000 E9000088 D88EFFFF B81E5657 000000C8 à...WV.¡...Ã¡..Õ...^_èùàP..WV.¡. 000160
260E5EC4 040E4683 B65689B4 4689FE57 8826FC47 88260E5E C4040E46 83D88E00 ..Ã.F..á^.&.G=&.W±.FÇ.VÑ.F..á^.& 000180
C4040E46 83CC4689 FE478826 0E5EC402 0E4683EC 5689EA46 89FE5788 26FC4788 .G=&.W±.Fõ.V§.F..á^.&.G±.Fä.F..á 0001A0
4683CA46 89FE4788 260E5EC4 020E4683 D85689D6 4689FE57 8826FC47 88260E5E ^.&.G=&.W±.Fø.VÁ.F..á^.&.G±.Fò.F 0001C0
4689FE47 88260E5E C4020E46 83D05689 CE4689FE 578826FC 4788260E 5EC4040E ..á^.&.G=&.W±.Fö.VÅ.F..á^.&.G±.F 0001E0

Dump of file SATURN:[PCCOMMON.DUMP.DLL]PDLLOOKS.TMP;1 on 18-APR-1990 10:48:42.67
File ID (768,14,0)   End of file block 11 / Allocated 12

Virtual block number 5 (00000005), 512 (0200) bytes

80468914 57882612 4788260A 5EC4F656 89F44689 0C578826 0A478826 0A5EC488 ¡á^.&.G.&.W..F¶.V-á^.&.G.&.W..F¯ 000000
89185788 26164788 260A5EC4 F05689EE 46891057 88260E47 88260A5E C4825689 .Vÿá^.&.G.&.W..FŸ.VÞá^.&.G.&.W.. 000020
5689FC46 8910571B 260E472B 260A5EC4 18578826 16478826 0A5EC4FA 5689F846 F%.V*á^.&.G.&.W.á^.&+G.&.W..F=.V 000040
F246C7D4 56890246 890C571B 260A472B 260A5EC4 14578826 12478826 0A5EC4FE ±á^.&.G.&.W.á^.&+G.&.W..Fø.VàúF· 000060
76FF0876 FF0A76FF 0C76FF03 20688476 FF8676FF 006A006A 006A006A 016A0001 ..j.j.j.j.j..vÑ.vÇh ..v..v..v..v 000080
76FFFE76 FF036A00 6ADC5689 DA4689F6 5688F446 881AC483 0000FFFF 9A006A06 .j.......á..F¶.V-.FÖ.VÉj.j..v±.v 0000A0
88F4468B E05E89DE 4E89FE5E 13FC4E03 DA1BC82B F05E88EE 4E880230 00009AFC =...O..NŸ.^Þ+à.Ö.N=.^±.NB.^Å.F¶. 0000C0
F65688F4 4688E856 89E64689 E05688DE 4688E456 89E24689 D45613D2 4603F656 V-.Fø.Vå.Fã.VÕ.FB.VÁ.F¦.VÒ.F¶.V- 0000E0
4688C456 89C24689 E45688E2 4688C056 89BE4689 E85688E6 46888C56 89BA4689 .F¤.V¥.F¦.VÒ.F/.Vä.Fã.VÕ.Fó.Vá.F 000100
6A006A00 6A50168A 468D8476 FF8676FF C85689C6 4689FE56 13FC4603 F05688EE Ÿ.VÞ.F=.V±.Fó.Và.vÑ.vÇ.F¤.Pj.j.j 000120
50160A46 8D026A00 6A8476FF 8676FF00 00FFFF9A F276FF00 6A006A01 6A006A00 .j.j.j.j..v·......vÑ.vÇj.j..FÕ.P 000140
EC76FF84 76FF8676 FFC05689 8E4689E0 5688DE46 88000002 D59A016A 006A006A j.j.j..¦....FB.VÁ.F/.Vå.vÑ.vÇ.v§ 000160
9A006A00 6A006A50 168A468D 50520250 00009AFC 76FFFE76 FF046A00 6AEA76FF .võj.j..v±.v=...].RP.F¤.Pj.j.j.. 000180
03028400 009AFC76 FFFE76FF 036A006A C056898E 4689F056 88EE4688 00000294 .....FŸ.VÞ.F/.Vàj.j..v±.v=...... 0001A0
76FFFE76 FF046A00 6ACE76FF D076FF84 76FF8676 FFC85689 C64689F0 5613EE46 FŸ.VÞ.Fó.Và.vÑ.vÇ.vÅ.võj.j..v±.v 0001C0
FFFE76FF 036A006A 00000333 9A006A00 6A006A50 168A468D 505202A5 00009AFC =...E.RP.F¤.Pj.j.j..3...j.j..v±. 0001E0

Dump of file SATURN:[PCCOMMON.DUMP.DLL]PDLLOOKS.TMP;1 on 18-APR-1990 10:48:42.67
```

File ID (768,14,0)   End of file block 11 / Allocated 12

Virtual block number 6 (00000006), 512 (0200) bytes

```
FFE85689 E64689E0 568BDE46 8BE05689 DE4689F0 5613EE46 0302F200 009AFC76 v=...·..FŸ.VÞ.FB.VÅ.FB.VÅ.Fì.VÒ. 000000
89E0568B DE468B00 00FFFF9A 016A006A 006A5016 DA468D02 6A006AB4 76FFB676 vÑ.vÇj.j..FÖ.Pj.j.j.......FB.VÁ. 000020
4E030A1B C82BF05E 8BEE4E8B 03230000 9AFC76FF FE76FF03 6A006AC0 5689BE46 F∫.Våj.j..v±.v=...#..NŸ.^Þ+à.Ö.N 000040
FC76FFFE 76FF046A 006AD676 FFD876FF B476FFB6 76FFC85E 89C64E89 FE5E13FC =.^±.N6.^à.vÑ.vÇ.vÄ.v∎j.j..v±.v= 000060
5F5E1F00 00E90000 B80000FF FF9A006A 006A006A 5016BA46 8D5052FF FF00009A .....RP.Fα.Pj.j.j......|..Õ...^_ 000080
C8CBC95F 5E1F0000 E9000205 08568B06 468BD88E 001FB81E 56570000 00C8CBC9 èùà...WV.¡...Ä.F..V....Ö...^_èùå 0000A0
6A006A00 6A1A6A00 36681E01 6A056AFF FF68FFFF 68D88E03 4AB81E56 57000000 ...WV.¡J..Äh..h..j.j..h6.j.j.j.j 0000C0
00080001 03860203 000990CB C95F5E1F 0000E918 C4830000 FFFF9A00 6A626A01 .jbj.......á.Õ...^_èù.......... 0000E0
0000000A 03670002 00000009 01640002 00180001 01440203 00000005 036C0002 ..l.......D.......d.......g..... 000100
00590002 02400203 03420005 036F0005 00460002 01ED0203 00320002 02070203 ......2...Ú...F...o...B...a...Y. 000120
08881E56 57000000 C8CBC95F 5E1F0000 E9000088 D88EFFFF B81E5657 000000C8 à...WV.¡...Ä¡..Õ...^_èùà...WV.¡. 000140
5EC4040E 4683D88E 001FB81E 56570000 4CC8CBC9 5F5E1F00 00E90000 B8D88E00 ..Ä¡..Õ...^_èùàL..WV.¡...Ä.F..á^ 000160
4689FE57 8B26FC47 8B260E5E C4040E46 838A5689 B84689FE 578B26FC 478B260E .&.G=&.W±.F¡.Vα.F..á^.&.G=&.W±.F 000180
578B26FC 478B260E 5EC4040E 4683CE46 89FE478B 260E5EC4 020E4683 EA5689E8 Ò.Võ.F..á^.&.G±.Fö.F..á^.&.G=&.W 0001A0
0C578B26 0A478B26 0A5EC4CC 4689FE47 8B260E5E C4020E46 83D65689 D44689FE ±.Få.V∎.F..á^.&.G±.Fäá^.&.G.&.W. 0001C0
8B260E47 8B260A5E C4865689 B4468914 578B2612 478B260A 5EC4F656 89F44689 .F¶.V-á^.&.G.&.W..FÇ.VÑá^.&.G.&. 0001E0
```

Dump of file SATURN:[PCCOMMON.DUMP.DLL]PDLLOOKS.TMP;1 on 18-APR-1990 10:48:42.67
File ID (768,14,0)   End of file block 11 / Allocated 12

Virtual block number 7 (00000007), 512 (0200) bytes

```
16478B26 0A5EC4FA 5689F846 8918578B 2616478B 260A5EC4 EE5689EC 46891057 W..F$.VŸá^.&.G.&.W..F½.V*á^.&.G. 000000
14578B26 12478B26 0A5EC4FE 5689FC46 8910571B 260E472B 260A5EC4 18578B26 &.W.á^.&+G.&.W..F=.V±á^.&.G.&.W. 000020
006A006A 006A006A 016A0001 F046C7D2 56890046 890C571B 260A472B 260A5EC4 á^.&+G.&.W..FÅ.V∅úFÞ..j.j.j.j.j. 000040
881AC483 0000FFFF 9A006A06 76FF0876 FF0A76FF 0C76FF03 20688876 FFBA76FF .vα.v¡h ..v..v..v..v.j.......á.. 000060
EE5E88EC 4E88022F 00009AFC 76FFFE76 FF036A00 6ADA5689 D84689F6 568BF446 F¶.V-.FÄ.VÖj.j..v±.v=.../..N$.^Ÿ 000080
89E04689 D25613D0 4603F656 8BF4468B DE5E89DC 4E89FE5E 13FC4E03 DA18C82B +à.Ö.N=.^±.NÉ.^B.F¶.V-.FÅ.V∅.FÅ. 0000A0
E6568BE4 468BBE56 89BC4689 F6568BF4 468BE656 89E44689 DE568BDC 468BE256 Vã.FÉ.VB.FÖ.Vì.F¶.V-.F¥.V/.FÖ.Vì 0000C0
76FFCA56 89C84689 FA568BF8 468BC656 89C44689 E2568BE0 468BC256 89C04689 .Få.Vò.FÁ.Vã.Fá.Vó.F½.V*.Fà.Vò.v 0000E0
FF0000FF FF9AF076 FF006A00 6A036A00 6A006A00 6A006A50 16BC468D B876FFBA α.v¡.F¥.Pj.j.j.j.j.j.j..vÞ...... 000100
8DB876FF BA76FF00 00FFFF9A 016A006A 006A5016 DB468002 6A006AB8 76FFBA76 vα.v¡j.j..FÅ.Pj.j.j.......vα.v¡. 000120
FFEA76FF B876FFBA 76FF0000 024D9A03 6AB876FF BA76FF00 00FFFF9A 5016F246 F·.P......vα.v¡j..M....vα.v¡.vö. 000140
929A006A 006A006A 5016BC46 8D505202 8200009A FC76FFFE 76FF046A 006AE876 vÒj.j..v±.v=.....RP.F¥.Pj.j.j... 000160
E44688C2 5689C046 89EE5688 EC468800 00FFFF9A F276FFB8 76FFBA76 FF000002 ....vα.v¡.v·......F$.VŸ.Fà.Vò.Fò 000180
9AFC76FF FE76FF04 6A006AD4 76FFD676 FFB876FF BA76FFCA 5689C846 89E65688 .Vì.Fà.Vò.vα.v¡.v∅.våj.j..v±.v=. 0001A0
C95F5E1F 0000E900 00B80000 FFFF9A00 6A006A00 6A5016BC 468D5052 FFFF0000 ....RP.F¥.Pj.j.j......|..Õ...^_è 0001C0
B81E5657 000004C8 CBC95F5E 1F0000E9 000088D8 8E003688 1E565700 0000C8CB ùà...WV.¡6..Ä¡..Õ...^_èùà...WV.¡ 0001E0
```

Dump of file SATURN:[PCCOMMON.DUMP.DLL]PDLLOOKS.TMP;1 on 18-APR-1990 10:48:42.67
File ID (768,14,0)   End of file block 11 / Allocated 12

Virtual block number 8 (00000008), 512 (0200) bytes

```
0107C726 FC5EC4FE 5689FC46 89FE578B 26FC478B 260E5EC4 040E4683 D88E02A9 `..Ä.F..á^.&.G=&.W±.F=.V±á^=&ú.. 000000
02050856 8B06468B D88E02C0 B81E5657 000000C8 CBC95F5E 1F0000E9 00008800 .¡..Õ...^_èùà...WV.¡á..Ä.F..V... 000020
1E016A05 6AFFFF68 FFFF68D8 8E02F4B8 1E565700 0000C8CB C95F5E1F 0000E900 .Ö...^_èùå...WV.¡¶..Äh..h..j.j.. 000040
90CBC95F 5E1F0000 E918C483 0000FFFF 9A006A5D 6A016A00 6A006A1A 6A004868 hH.j.j.j.j.j]j.......á.Õ...^_èù. 000060
00010138 02030000 00060316 00020008 00010330 0203007B 00020212 0203000B ........(...0...............B... 000080
000201F5 020302EC 00060319 00050000 000A0311 00020000 00090158 0002001B ....X....................&...%... 0000A0
00000000 0000006F 00020205 02030059 0002023F 02030046 000201DB 02030032 2...Ü...F...?...Y.......o....... 0000C0
08881E56 57000052 C8CBC95F 5E1F0000 E9000088 D88EFFFF B81E5657 000000C8 à...WV.¡...Ä¡..Õ...^_èùàR..WV.¡. 0000E0
260E5EC4 040E4683 845689B2 4689FE57 8B26FC47 8B260E5E C4040E46 83D88E00 ..Ä.F..á^.&.G=&.W±.Fÿ.VÇ.F..á^.& 000100
C4040E46 83CA4689 FE478B26 0E5EC402 0E4683EA 5689E846 89FE578B 26FC478B .G=&.W±.FÒ.Võ.F..á^.&.G±.Fò.F..á 000120
4683C846 89FE478B 260E5EC4 020E4683 D65689D4 4689FE57 8B26FC47 8B260E5E ^.&.G=&.W±.Få.V∎.F..á^.&.G±.Fà.F 000140
4689FE47 8B260E5E C4020E46 83CE5689 CC4689FE 578B26FC 478B260E 5EC4040E ..á^.&.G=&.W±.Fã.Võ.F..á^.&.G±.F 000160
AE468914 578B2612 478B260A 5EC4F656 89F44689 0C578B26 0A478B26 0A5EC486 Ñá^.&.G.&.W..F¶.V-á^.&.G.&.W..FÛ 000180
8918578B 2616478B 260A5EC4 EE5689EC 46891057 8B260E47 8B260A5E C4805689 .V¯á^.&.G.&.W..F$.VŸá^.&.G.&.W.. 0001A0
5689FC46 8910571B 260E472B 260A5EC4 18578B26 16478B26 0A5EC4FA 5689F846 F½.V*á^.&.G.&.W.á^.&+G.&.W..F=.V 0001C0
F046C7D2 56890046 890C571B 260A472B 260A5EC4 14578B26 12478B26 0A5EC4FE ±á^.&.G.&.W.á^.&+G.&.W..FÅ.V∅úFÞ 0001E0
```

Dump of file SATURN:[PCCOMMON.DUMP.DLL]PDLLOOKS.TMP;1 on 18-APR-1990 10:48:42.67

File ID (768,14,0)   End of file block 11 / Allocated 12

Virtual block number 9 (00000009), 512 (0200) bytes

```
76FF0876 FF0A76FF 0C76FF03 20688276 FFB476FF 006A006A 006A006A 016A0001 ..j.j.j.j.j..vÇ.vÿh ..v..v..v..v 000000
76FFFE76 FF036A00 6ADA5689 D84689F6 568BF446 881AC483 0000FFFF 9A006A06 .j.......á..F¶.V-.FÄ.VÖj.j..v±.v 000020
8BF4468B DE5E890C 4E89FE5E 13FC4E03 DA1BC828 EE5E8BEC 4E8B0240 00009AFC ▪...N..N§.^Ÿ+à.Ö.N▪.^±.NÉ.^B.F¶. 000040
F6568BF4 4688E656 89E44689 DE5688DC 4688E256 89E04689 D25613D0 4603F656 V-.FÄ.V0.FÄ.Vä.FÉ.VB.FÖ.VÌ.F¶.V- 000060
4688C256 89C04689 E25688E0 4688BE56 89BC4689 E65688E4 4688BA56 89B84689 .F¡.V¤.FÖ.VÌ.F¥.V/.FÄ.Vä.Få.VÖ.F 000080
6A006A00 6A501688 46808276 FFB476FF C65689C4 4689FE56 13FC4603 EE5688EC Å.VŸ.F▪.V±.Fé.Vó.vÇ.vý.F¡.Pj.j.j 0000A0
5016D846 8D026A00 6AB276FF B476FF00 00FFFF9A F076FF00 6A006A03 6A006A00 .j.j.j.j..vÞ......vÇ.vÿj.j..FÄ.P 0000C0
F2468DB2 76FFB476 FFBE5689 BC46890E 5688DC46 88000003 009A016A 006A006A j.j.j.......FÉ.VB.F¥.V/.vÇ.vý.F· 0000E0
E876FFEA 76FF8276 FFB476FF 00000268 9A036AB2 76FFB476 FF0000FF FF9A5016 .P......vÇ.vÿj..k....vÇ.vý.vò.vÒ 000100
0002BF9A 006A006A 006A5016 88468D50 52028800 009AFC76 FFFE76FF 046A006A j.j..v±.v▪.....RP.F¡.Pj.j.j..€.. 000120
FF036A00 6ABE5689 BC4689EE 5688EC46 880000FF FF9AF276 FF8276FF B476FF00 ..vÇ.vý.v·......F§.VŸ.F¥.V/j.j.. 000140
FFCE76FF B276FFB4 76FFC656 89C44689 EE5613EC 460302AF 00009AFC 76FFFE76 v±.v▪...É..F§.VŸ.Fé.Vó.vÇ.vý.vö. 000160
5E9A006A 006A006A 5016B846 8D505202 D000009A FC76FFFE 76FF046A 006ACC76 väj.j..v±.v▪...Å.RP.F¡.Pj.j.j..^ 000180
468BDE56 89DC4689 EE5613EC 4603031D 00009AFC 76FFFE76 FF036A00 6A000003 ...j.j..v±.v▪......F§.VŸ.FÉ.VB.F 0001A0
9A016A00 6A006A50 160B468D 026A006A B276FFB4 76FFE656 89E44689 DE5688DC Ê.VB.FÖ.VÌ.vÇ.vÿj.j..FÄ.Pj.j.j.. 0001C0
8B034E00 009AFC76 FFFE76FF 036A006A BE56898C 4689DE56 88DC4688 0000FFFF .....FÉ.VB.F¥.V/j.j..v±.v▪...N.. 0001E0
```

Dump of file SATURN:[PCCOMMON.DUMP.DLL]PDLLOOKS.TMP;1 on 18-APR-1990 10:48:42.67
File ID (768,14,0)   End of file block 11 / Allocated 12

Virtual block number 10 (0000000A), 512 (0200) bytes

```
76FFD676 FFB276FF B476FFC6 5E89C44E 89FE5E13 FC4E03DA 1BC82BEE 5E8BEC4E N§.^Ÿ+à.Ö.N▪.^±.Né.^ó.vÇ.vý.v▪.v 000000
FFFF9A00 6A006A00 6A501688 468D5052 FFFF0000 9AFC76FF FE76FF04 6A006AD4 åj.j..v±.v▪.....RP.F¡.Pj.j.j.... 000020
05085688 06468808 8E001FB8 1E565700 0000C8CB C95F5E1F 0000E900 00880000 ..j..Õ...^_èùà...WV.¡...Ä.F..V.. 000040
016A056A FFFF68FF FF68D88E 0375881E 56570000 00C8C8C9 5F5E1F00 00E90002 ..Õ...^_èùã...WV.¡u..Äh..h..j.j. 000060
C95F5E1F 0000E918 C4830000 FFFF9A00 6A008368 016A006A 006A1A6A 0066681E .hf.j.j.j.j.h..j.......á.Õ...^_è 000080
01440203 00000007 03970002 00080001 03820203 007B0002 02300203 000B90CB ù.....0...(...ý...............D. 0000A0
039A0005 00320002 02070203 0000000A 03920002 00000009 01640002 00180001 ......d....................2..... 0000C0
00000000 006F0002 02230203 00590002 025D0203 00460002 01E00203 03600007 ..m...Ú...F...j...Y...#...o..... 0000E0
9A0065E9 00008800 06E90375 00003DFF FF00F39A D88EFFFF 881E5657 000000C8 à...WV.¡...Ä.µ...=..u.Õ..¡..Õe.. 000100
880006E9 03750000 3DFFFF03 5F9A0052 E90000B8 0006E903 75000030 FFFF02A5 É...=..u.Õ..¡..ÕR.._....=..u.Õ..¡ 000120
000030FF FF03099A 002CE900 00B80006 E9037500 0030FFFF 00629A00 3FE90000 ..Õ7..b...=..u.Õ..¡..Õ,......*.. 000140
01880006 E90000B8 0006E903 7500003D FFFF038A 9A0019E9 00008800 06E90375 u.Õ..¡..Õ.......=..u.Õ..¡..Õ..¡. 000160
00220002 00000003 000F0002 00000002 00480002 000790CB C95F5E1F 0000E900 .Õ...^_èù.....H................". 000180
00080002 00000007 006E0002 00000006 005B0002 00000005 00350002 00000004 ......5.......[.......n......... 0001A0
47117DC0 0808468B FF335356 57EC8B55 00000000 00000000 00000000 0000000A ................U.§WVS3..F..å).G 0001C0
1DDAF7D8 F70A568B 47117DC0 080C468B 06568908 46890000 1DDAF7D8 F7065688 .V.ŸÄÄÖ....F..V..F..å).G.V.ŸÄÄÖ. 0001E0
```

Dump of file SATURN:[PCCOMMON.DUMP.DLL]PDLLOOKS.TMP;1 on 18-APR-1990 10:48:42.67
File ID (768,14,0)   End of file block 11 / Allocated 12

Virtual block number 11 (0000000B), 512 (0200) bytes

```
EBD38BF1 F706468B D8B8F1F7 D2330846 880A4E88 1575C00B 0A56890C 46890000 ...F..V..åu..N..F.30Ÿb.Ä.F.Ÿb.Æ§ 000000
910C66F7 F08BF1F7 F4750B0B D8D1EAD1 D9D1EBD1 06468808 568B0A4E 8BD88838 8.Ä.N..V..F.1§1)1õ1Ä.Ùu¶Ÿb.ÞŸf.. 000020
D8F7DAF7 07754F96 D2334E01 7606463B 06720777 0856380C 72D103E6 F70A468B .F.Ÿ|.1r.;V.w.r.;F.v.N30.Ou.ŸÖŸÄ 000040
00000001 00000000 0000FFFF 00000001 00000000 0008CA50 E5B85F5E 5B000A83 .Õ.{^_.[]ò....................... 000060
FFFF002E 0320002E 00000001 00000000 0000FFFF 008F0323 001C002E 03200016 .. .....#.€............. ..... 000080
03200052 00000001 00000000 0000FFFF 00170320 00400000 00010000 00000000 ..........ä. ..............R. . 0000A0
00170320 00700000 00010000 00000000 FFFF0288 080F005E 02A10323 0058002E ..X.#.Ä.^.Õ.¡..............p. ... 0000C0
003A0002 00000004 00280002 00000003 00100002 00000002 00040002 0006FFFF .......................(........:. 0000E0
00000000 00000000 00000000 00000007 006A0002 00000006 004C0002 00000005 ......L.......j................. 000100
00000000 00000000 00000000 00000000 00000000 00000000 00000000 00000000 ................................ 000120
00000000 00000000 00000000 00000000 00000000 00000000 00000000 00000000 ................................ 000140
00000000 00000000 00000000 00000000 00000000 00000000 00000000 00000000 ................................ 000160
00000000 00000000 00000000 00000000 00000000 00000000 00000000 00000000 ................................ 000180
00000000 00000000 00000000 00000000 00000000 00000000 00000000 00000000 ................................ 0001A0
00000000 00000000 00000000 00000000 00000000 00000000 00000000 00000000 ................................ 0001C0
00000000 00000000 00000000 00000000 00000000 00000000 00000000 00000000 ................................ 0001E0
```

Dump of file SATURN:[PCCOMMON.DUMP.DLL]PDLSYN.TMP;1 on 18-APR-1990 10:48:45.27
File ID (771,27,0)   End of file block 276 / Allocated 276

Virtual block number 1 (00000001), 512 (0200) bytes

```
00000000 00000040 00000000 00000088 0000FFFF 00000004 00000114 01745A40 MZt.............|........@....... 000000
00000080 00000000 00000000 00000000 00000000 00000000 00000000 00000000 ................................ 000020
6F6E6E61 63206061 72676F72 70207369 685421CD 4C01B821 CD09B400 0EBA1F0E ..¤..Ç.ël|.LëIThis program canno 000040
00000000 00000024 0A00002E 65646F6D 20534F44 206E6920 6E757220 65622074 t be run in DOS mode....$....... 000060
00080009 00000000 00062060 00000800 0009800A B2F06AD6 00340474 0505454E NE..t.4.øjbý........'-.......... 000080
00000000 00000000 00010000 00040000 00000528 01030180 00880088 0040000E ..@.....§.Æ.(................... 0000A0
22AC0F00 22AC074A 0EF20F00 0EF20657 4EB20F00 4EB20169 0FF80F00 0FF80054 T.½...½.i.ýN..ýNW.·...·.J.¯ª..¯ª 0000C0
02000E01 00000000 FE700E01 FB830EE6 447A0F00 44790A94 10980F00 1098097E ~.........yD..zD|.°«..p±........ 0000E0
49535345 52505845 4E59534C 44501400 004E5953 4C445006 3EE00F01 302A1EA2 Å.*=..Á>.PDLSYN...PDLSYNEXPRESSI 000100
4E59534C 44501500 02535543 4F465445 534E5953 4C44500E 00014550 59544E4F ONTYPE...PDLSYNSETFOCUS...PDLSYN 000120
00045946 49544F4E 4E59534C 44500C00 03534E4F 4954504F 54584554 444E4946 FINDTEXTOPTIONS...PDLSYNNOTIFY.. 000140
45544545 52544E59 534C4450 0E00054C 4C41544C 55414645 444E5953 4C445010 .PDLSYNDEFAULTALL...PDLSYNTREETE 000160
5849464E 59534C44 50130007 45455254 444C4955 424E5953 4C44500F 00065458 XT...PDLSYNBUILDTREE...PDLSYNFIX 000180
0009534E 4F495450 4F444E49 464E5953 4C445011 00085345 54554249 52545441 ATTRIBUTES...PDLSYNFINDOPTIONS.. 0001A0
50120008 54494E49 4E59534C 44500A00 0A434552 50444E49 464E5953 4C44500E .PDLSYNFINDPREC...PDLSYNINIT...P 0001C0
54524F52 52454E59 534C4450 0F000C41 54414458 55415952 4555514E 59534C44 DLSYNQUERYAUXDATA...PDLSYNERRORT 0001E0
```

Dump of file SATURN:[PCCOMMON.DUMP.DLL]PDLSYN.TMP;1 on 18-APR-1990 10:48:45.27
File ID (771,27,0)   End of file block 276 / Allocated 276

Virtual block number 2 (00000002), 512 (0200) bytes

```
464E5953 4C445011 000E4154 41445855 41544553 4E59534C 44501000 0D545845 EXT...PDLSYNSETAUXDATA...PDLSYNF 000000
16000100 00104553 4F505349 444E5953 4C445000 000F544C 55414645 44444E49 INDDEFAULT...PDLSYNDISPOSE...... 000020
4D445F0C 626F6C67 6C6D6407 00027802 6001E101 6A012100 B8005100 32002900 .).2.Q.¡.!.j.Ä.'.(...dmlglob._DM 000040
534F4408 54494E49 4C4D444D 46495F0B 6C6D6460 66690654 494E4942 4F4C474C LGLOBINIT.ifmdml._IFMDMLINIT.DOS 000060
42454552 464D454D 0C4B434F 4C42434F 4C4C414D 454D004D 454D0353 4C4C4143 CALLS.MEM.MEMALLOCBLOCK.MEMFREEB 000080
58545452 41545354 5541530C 52545354 45475455 41530A54 55415304 48434F4C LOCK.SAUT.SAUTGETSTR.SAUTSTARTTX 0000A0
53485341 48545541 53085455 50444954 55415309 54555052 54535455 41530A4E N.SAUTSTRPUT.SAUTIDPUT.SAUTHASHS 0000C0
454D414E 54494D49 4C454454 5541530F 454D414E 50495254 53545541 53005254 TR.SAUTSTRIPNAME.SAUTDELIMITNAME 0000E0
55514C4D 44134E58 54504F54 534C4D44 0A6C6D64 03544143 52545354 5541530A .SAUTSTRCAT.dml.DMLSTOPTXN.DMLQU 000100
4C4D440B 444C4549 46595245 55514C4D 440D454C 444E4148 4C45444F 4D595245 ERYMODELHANDLE.DMLQUERYFIELD.DML 000120
53494C45 4552464C 4D440B31 4E4C5259 52455551 4C4D440C 4E4C5259 52455551 QUERYRLN.DMLQUERYRLN1.DMLFREELIS 000140
54454D5F 0C444F48 54454D06 4B434142 4C4C4F52 4E585450 4F54534C 4D441254 T.DMLSTOPTXNROLLBACK.METHOD._MET 000160
44485445 4D5F1245 54414954 4E415453 4E494854 454D5F10 47534D44 4E455348 HSENDMSG._METHINSTANTIATE._METHO 000180
55440353 53414C43 45564952 45444854 454D5F10 45544149 544E4154 534E4945 EINSTANTIATE._METHDERIVECLASS.DU 0001A0
45544152 45544947 41424C54 5513524F 53525543 54494E49 4741424C 54551054 T.UTLBAGINITCURSOR.UTLBAGITERATE 0001C0
550E454B 414D4E55 5145534C 54550C45 4B414D51 45534C54 550A524F 53525543 CURSOR.UTLSEQMAKE.UTLSEQUNMAKE.U 0001E0
```

Dump of file SATURN:[PCCOMMON.DUMP.DLL]PDLSYN.TMP;1 on 18-APR-1990 10:48:45.27
File ID (771,27,0)   End of file block 276 / Allocated 276

Virtual block number 3 (00000003), 512 (0200) bytes

```
534C5455 0C4C4554 53524946 5145534C 54550D52 45424D45 4D534951 45534C54 TLSEQISMEMBER.UTLSEQFIRSTEL.UTLS 000000
54554C4D 44165455 4C4D4405 5954504D 45514553 4C54550B 4C454853 55505145 EQPUSHEL.UTLSEQEMPTY.DMLUT.DMLUT 000020
53524554 53494745 5254554C 4D441052 454C444E 41485946 49544F4E 4548414D MAKENOTIFYHANDLER.DMLUTREGISTERS 000040
53494745 5254554C 4D441859 4649544F 4E535345 434F5250 54554C4D 44125445 ET.DMLUTPROCESSNOTIFY.DMLUTREGIS 000060
54414458 55415445 5354554C 4D440F45 54414C45 524E5545 54414C45 52524554 TERRELATEUNRELATE.DMLUTSETAUXDAT 000080
554C414E 41135455 4C414E41 06415441 44585541 59524555 5154554C 4D441141 A.DMLUTQUERYAUXDATA.ANALUT.ANALU 0000A0
4C43534F 44084E45 504F534F 44074F49 53034C41 43494E4F 4E414345 4D414E54 TNAMECANONICAL.SIO.DOSOPEN.DOSCL 0000C0
03011A03 0F980300 51030110 44414552 534F4407 45544952 57534F44 0845534F OSE.DOSWRITE.DOSREAD...Q........ 0000E0
060E030C 1603063A 0301A503 0E340300 C1030FC7 03094703 08B90308 A6030F5C \..Ì..¿..G..ú..ê..4..Ê..:....... 000100
00000000 00000000 00000000 004C4C44 2E6E7973 6C64700A 0000066A 0306AE03 .Ö..j....pdlsyn.DLL............. 000120
0876FF50 01F42D0A 46880016 E9037D01 F40A7E81 D88EFFFF B81E5657 000004C8 à...WV.¡...Ä.~.¶.).Ö...F.-¶.P.v. 000140
78E9037C 0088FE7E 81FE46FF 0003E900 00FE46C7 0090E906 C4830C5E FF0676FF .v..^..é.Ö..úF±..Ö...F±.~±¡.|.Ö( 000160
58E90375 00003DFC 46890000 8788263B B6068ED8 03E0D1FE 46880170 0A5E6900 .i^.p..F±ÌÁ.Ä..Ñ;&.....F=*..u.ÖX 000180
F405FE46 88002FE9 03730218 87392606 5EC40212 97882602 10878826 065EC400 .é^.&....&....é^.&9...s.Ö/..F±.¶ 0001A0
76FF0876 FFFE76FF 000FE903 75000030 06C483FF FF09D09A 0676FF08 76FF5001 .P.v..v..Å....é.=..u.Ö...v±.v..v 0001C0
C95F5E1F FF78E906 C4830C5E FF0676FF 0876FFFE 76FF000F E906C483 0C5EFF06 ..^..é.Ö...v±.v..v..^..é.Öx..^_è 0001E0
```

Dump of file SATURN:[PCCOMMON.DUMP.DLL]PDLSYN.TMP;1 on 18-APR-1990 10:48:45.27
File ID (771,27,0)   End of file block 276 / Allocated 276

Virtual block number 4 (00000004), 512 (0200) bytes

```
10878826 FC5EC4FE 5689FC46 890E5688 0C4688D8 8E000888 1E565700 0004C8CB ùà...WV.|...Ä.F..V..F•.V±á^•&... 000000
FF0A76FF 0676FF08 76FF021A 97892602 18878926 FC5EC400 022D0212 97882602 .&....-..á^•&....&.....v..v..v.. 000020
56570000 08C8000A CAC95F5E 1F0000E9 0000880A C483FFFF 00009AFC 76FFFE76 v±.v•......á.|..Õ...^_èò..à...WV 000040
76C4FC5E 88FA4688 008A260E 76C4FC5E 88FC4689 0788260A 5EC4D88E 00C9881E .|è..Äá^.&...F•.^•áv.Ï...F•.^•áv 000060
649A1476 FF1676FF 1276FF0E 76FF1076 FF5016FE 46805016 FC468D00 00C6260E .&ó...F•.P.F±.P.v..v..v..v..v..d 000080
0AC48301 0800009A 1476FF16 76FFFE76 FF0676FF 0876FFF8 468912C4 83008809 ....á..F½.v..v..v±.v..v.......á. 0000A0
5E1F0000 E9F8468B 078926FC 46880A5E C4008826 FA468A0E 76C41F88 260A5EC4 á^.&...áv..F•&..á^..F•&...F½Õ...^ 0000C0
9A0676FF 0876FF13 0C681D6A 1676FFD8 8E0122B8 1E565700 000AC800 12CAC95F _èò..à...WV.|"..Ä.v.j.h...v..v.. 0000E0
89025788 26078826 065EC404 32E9F646 880006E9 03750000 3DF64689 0000FFFF .....F-•..u.Õ...F-Õ2.á^.&..&.W.. 000100
C408C483 FFFF00EA 9A004668 1E004468 1E002FE9 03750000 423E83FC 5689FA46 F•.V•.>B..u.Õ/..hD..hF..ô....á.á 000120
5EC40000 004206C7 0006E903 74024708 26078826 FA5EC402 57892607 8926FA5E ^•&..&.W.á^•&..&.G.t.Õ..ú.B...á^ 000140
08478926 0A478926 000088FA 5EC40647 89261846 88FA5EC4 04478926 164688FA •.F.&.G.á^•.F.&.G.á^•|..&.G.&.G. 000160
89260010 05FC5688 FA4688FA 5EC40000 0E47C726 FA5EC400 000C47C7 26FA5EC4 á^•&úG...á^•&úG...á^•.F•.V•...&. 000180
02148789 26FA5EC4 02000502 12978826 02108788 26FA5EC4 02129789 26021087 ...&....á^•&....&........á^•&.... 0001A0
97892602 18878926 FA5EC400 022D0212 97882602 10878826 FA5EC402 16978926 &....á^•&....&....-..á^•&....&.. 0001C0
021C8789 2614568B 12468BFA 5EC4022E 87892602 30878926 000088FA 5EC4021A ..á^•|..&..0.&....á^•.F..V.&.... 0001E0
```

Dump of file SATURN:[PCCOMMON.DUMP.DLL]PDLSYN.TMP;1 on 18-APR-1990 10:48:45.27
File ID (771,27,0)   End of file block 276 / Allocated 276

Virtual block number 5 (00000005), 512 (0200) bytes

```
56880A46 88FA5EC4 02229789 26022087 89261056 880E4688 FA5EC402 1E978926 &....á^•.F..V.&.. .&..".á^•.F..V 000000
FF260226 87FF26FA 5EC45016 FE468D12 76FF1476 FF022697 89260224 8789260C .&..$.&..&..v..v..F±.Pá^•&.ñ&.&. 000020
8302E8E9 F6468800 06E90375 00F67E83 F646890E C4830000 FFFF9A00 6A0224B7 ñ$.j.......á..F-.--.u.Õ...F-Õò.. 000040
2C8F8326 FA5EC402 2C878926 FA5EC400 00880003 E90001B8 0006E903 7457FE7E -±Wt.Õ..|..Õ..|..á^•&..,.á^•&.¢, 000060
FF26FA5E C4271E68 1276FF14 76FF5052 130805FC 5688FA46 88002EE9 03750002 ..u.Õ...F•.V•...RP.v..v.h.'á^•&. 000080
130A8789 26000088 FA5EC400 10E910C4 830000FF FF9A006A 022487FF 26022687 ñ&.&.ñ$.j.......á.Õ..á^•|..&.... 0000A0
02E6C1F8 76880019 E9037203 F3F87E81 F846FF00 03E90000 F846C713 08878926 &....úF½..Õ...F½.~¼•.r.Õ...v½èl. 0000C0
C4830453 17049AFA 76FFFC76 FFFFDAE9 03388089 26033A80 89260000 88FA5EC4 á^•|..&..:.&..8.Õò..v•.v•...S..á 0000E0
87FF26FA 5EC40477 FF26FA5E C40234E9 F6468800 06E90375 00F67E83 F6468904 ..F-.--.u.Õ...F-Õ4.á^•&.w.á^•&.ñ 000100
037500F6 7E83F646 890000FF FF9A5052 130405FC 5688FA46 88021C87 FF26021E ..&.ñ...F•.V•...RP......F-.--.u. 000120
00FFFF9A FA76FFFC 76FF1304 87FF2613 0687FF26 FA5EC401 FEE9F646 880006E9 Õ...F-Õ±.á^•&.ñ..&.ñ...v•.v•.... 000140
70E90375 00022C8F 8326FA5E C401D4E9 F6468800 06E90375 00F67E83 F6468900 ..F-.--.u.Õ...F-Õå.á^•&.¢,..u.Õp 000160
FA5EC400 0004759A FFFF6804 6F68016A 226A1304 87FF2613 0687FF26 FA5EC400 .á^•&.ñ..&.ñ..j"j.ho.h...u...á^• 000180
0687FF26 FA5EC400 0004919A FFFF6804 8868016A 216A1304 87FF2613 0687FF26 &.ñ..&.ñ..j!j.h..h.......á^•&.ñ. 0001A0
87FF2613 0687FF26 FA5EC400 0004A09A FFFF6804 A768016A 1F6A1304 87FF2613 .&.ñ..j.j.hÌ.h...Ù...á^•&.ñ..&.ñ 0001C0
026A1304 87FF2613 0687FF26 FA5EC400 0004C99A FFFF6804 C368016A 1E6A1304 ..j.j.hû.h...è...á^•&.ñ..&.ñ..j. 0001E0
```

Dump of file SATURN:[PCCOMMON.DUMP.DLL]PDLSYN.TMP;1 on 18-APR-1990 10:48:45.27
File ID (771,27,0)   End of file block 276 / Allocated 276

Virtual block number 6 (00000006), 512 (0200) bytes

```
F868026A 056A1304 87FF2613 0687FF26 FA5EC400 0004E59A FFFF6804 DF68026A j.hÔ.h...Ì...á^•&.ñ..&.ñ..j.j.h« 000000
FFFF6805 2568026A 166A1304 87FF2613 0687FF26 FA5EC400 0005019A FFFF6804 .h.......á^•&.ñ..&.ñ..j.j.h%.h.. 000020
130487FF 26130687 FF26FA5E C40088E9 03750002 2C8F8326 FA5EC400 00FFFF9A .....á^•&.¢,..u.Õ..á^•&.ñ..&.ñ.. 000040
87FF2613 0687FF26 FA5EC400 0005539A FFFF6805 4768FFFF 68052868 106A226A j•j.h+.h..hG.h...S...á^•&.ñ..&.ñ 000060
26130687 FF26FA5E C4000005 759AFFFF 68056968 FFFF6805 40680C6A 216A1304 ..j!j.hM.h..hi.h...u...á^•&.ñ..& 000080
0687FF26 FA5EC400 0005979A FFFF6805 8868FFFF 68056F68 0A6A1F6A 130487FF .ñ..j.j.ho.h..h..h.......á^•&.ñ. 0000A0
FF26FA5E C4000005 899AFFFF 6805AD68 FFFF6805 91680A6A 1E6A1304 87FF2613 .&.ñ..j.j.h..h..hÜ.h...¿...á^•&. 0000C0
FA5EC400 00050B9A FFFF6805 CF68FFFF 68058368 106A026A 130487FF 26130687 ñ..&.ñ..j.j.h°.h..hü.h...Ü...á^• 0000E0
C4000005 FD9AFFFF 6805F168 FFFF6805 0568136A 056A1304 87FF2613 0687FF26 &.ñ..&.ñ..j.j.hñ.h..hþ.h...»...á 000100
00FFFF9A FFFF68FF FF68FFFF 6805F768 036A166A 130487FF 26130687 FF26FA5E ^•&.ñ..&.ñ..j.j.h%.h..h..h...... 000120
0646880A 5EC4D88E 01AD881E 56570000 00C80014 CAC95F5E 1F0000E9 F6468800 ..F-Õ...^_èò..à...WV.|Ù..Äá^..F. 000140
56570000 00C8000B CAC95F5E 1F0000E9 00008802 30978926 022E8789 2608568B .V.&....&..0.|..Õ...^_èò..à...WV 000160
00008802 57892607 8926065E C4023097 8826022E 8788260A 5EC4D88E 0616881E .|...Äá^.&....&..0.á^.&..&.W.j.. 000180
0012E903 75000042 3E83088E 0642881E 56570000 00C80008 CAC95F5E 1F0000E9 Õ...^_èò..à...WV.|B..Ä.>B..u.Õ.. 0001A0
9A0676FF 0876FF04 77FF2606 5EC404C4 8301FA00 109A37FF 260277FF 26065EC4 á^.&.w.&.7...•..á.á^.&.w..v..v.. 0001C0
1C56881A 46880886 0672881E 56570000 14C80004 CAC95F5E 1F0000E9 0000FFFF ....Õ...^_èò..à...WV.|r..Ä.F..V. 0001E0
```

Dump of file SATURN:[PCCOMMON.DUMP.DLL]PDLSYN.TMP;1 on 18-APR-1990 10:48:45.27
File ID (771,27,0)   End of file block 276 / Allocated 276

Virtual block number 7 (00000007), 512 (0200) bytes

```
76C4EE5E 88F04688 008A2614 76C4EE5E 88EE4689 07882610 5EC4FE56 89FC4689 .F=.V±á^.&...FY.^Yáv.&...Fb.^Yáv 000000
76FF1476 FF1676FF 5016F646 805016EE 4680EE46 89078826 105EC400 00C62614 .&6..á^.&...FY.FY.P.F-.P.v..v..v 000020
0035E903 75073926 EE468810 5EC4EC46 8912C483 01610964 9A1A76FF 1C76FF18 ..v..v..d.a..á..F&á^..FY&9.u.Õ5. 000040
76FF0676 FF0876FF 078926EE 4688105E C4008826 F0468A14 76C41F88 26105EC4 á^.&..áv..Fb&..á^..FY&...v..v..v 000060
76FFFE76 FF1476FF 1676FF01 4AE999AF 880AC483 01780000 9A1A76FF 1C76FFF6 -.v..v....(..á.¡£.ÕJ..v..v..v±.v 000080
881A4688 F45689F2 4689021E 97882602 1C878826 1A5EC408 C483038C 02259AFC =.X.¥..á.á^.&....&.....F·.V¶.F.. 0000A0
9A006A02 2487FF26 022687FF 261A5EC4 440068F2 76FFF476 FF505202 28051C56 V..(.RP.v¶.v·h.Dá^.&.ñ&.&.ñ$.j.. 0000C0
022A8708 26022887 88261A5E C40012E9 037400EC 7E83EC46 8910C483 00000368 k....á..F&.-&.t.Õ..á^.&..(.&..*. 0000E0
0A4688FC 5EC400C5 E99980B8 008826F0 468A1476 C41F8826 105EC400 15E90374 t.Õ..á^.&..áv..Fb&..¡¯.Õé.á^=.F. 000100
329FC426 FC5EC403 34978926 03328789 260E5688 0C4688FC 5EC40336 87892648 H&..6.á^=.F..V.&..2.&..4.á^=&á.2 000120
C40000FF FF9A016A F276FFF4 76FF0001 47C62603 329FC426 FC5EC420 07C62603 .&6. á^=&á.2.&6G...v¶.v·j......á 000140
5EC4FA46 8906478B 26FC5EC4 0000022C 87C726FC 5EC4F846 89022C87 8826FC5E ^=&..,..F½á^=&ú.,...á^=&.G..F*á^ 000160
4688FC5E C4EC4689 06C48307 0A08589A FC76FFFE 76FF1876 FFFFFF06 47C726FC =&úG....v..v±.v=.[....á..F&á^=.F 000180
99A8EC7E 810000FF FF9AF276 FFF476FF 06478926 FA4688FC 5EC4022C 878926F8 ¥&..,.á^=.F*&.G..v¶.v·.......-&". 0001A0
1F0000E9 EC468800 8826F046 8A1476C4 1F882610 5EC40000 EC46C700 05E90374 t.Õ..úF&..á^.&..áv..Fb&...F&Õ... 0001C0
76FF1A76 FF1C76FF FE46890A 4688D88E 0686881E 56570000 04C80018 CAC95F5E ^_èò..à...WV.¡Ñ..Ä.F..F±.v..v..v 0001E0
```

Dump of file SATURN:[PCCOMMON.DUMP.DLL]PDLSYN.TMP;1 on 18-APR-1990 10:48:45.27
File ID (771,27,0) End of file block 276 / Allocated 276

Virtual block number 8 (00000008), 512 (0200) bytes

```
4A06AE9A 0676FF08 76FF0A76 FF0C76FF 0E76FF10 76FF1276 FF1476FF 1676FF18 ..v..v..v..v..v..v..v..v..v..Û.J 000000
C4830918 02149A0C 76FF0E76 FF004DE9 FC468800 06E90375 00FC7E83 FC468907 ..F=.-=.u.Õ...F=ÕM..v..v.......á 000020
FE462904 C4830929 02149A0C 76FF0E76 FF0031E9 00008800 06E90374 00003004 .=..t.Õ..|..Õ1..v..v....)..á.)F± 000040
0000E900 0088FF7E E9037E00 FE7E830C 460104C4 83068002 149A0C76 FF0E76FF .v..v.......á..F..-±.-.Õ-.|..Õ.. 000060
C4FA5689 F846891A 56881846 88D88E08 AE881E56 57000114 C80018CA C95F5E1F .^_èò..à...WV.¡Û..Ä.F..V..F½.V*á 000080
1A76FF16 76FF1276 FF1476FF 5016F646 805016FE EE868DFE EE868907 88260E5E ^.Ï....Y±..Y±.P.F-.P.v..v..v..v. 0000A0
FA76FF02 A8680019 E9037599 ABFEECBE 81FEEC86 8912C483 09A60964 9A1876FF .v..d.Ï..á...&±./&±¨.u.Õ..h¨..v* 0000C0
E9037507 3926FEEE 8688OE5E C4000FE9 03750000 3006C483 08530900 9AF876FF .v½.Ä.S..á.=..u.Õ..á^...Y±&9.u.Õ 0000E0
F676FF0A 76FF0C76 FF0017E9 03750C46 080A4688 078926FE EE8688OE 5EC40032 2.á^...Y±&...F..F.u.Õ...v..v..v- 000100
F876FFFA 76FF1276 FF1476FF 018EE999 AF880AC4 83080F00 009A1876 FF1A76FF .v..v....Õ..á.¡£.Õ/..v..v..v*.v½ 000120
56881846 88F45689 F2468902 1E978826 021C8788 26185EC4 08C48307 6402259A .X.d..á.á^.&....&.....F·.V¶.F..V 000140
A09A006A 022487FF 26022687 FF26185E C4440068 F276FFF4 76FF5052 0228051A ..(.RP.v¶.v·h.Dá^.&.ñ&.&.ñ$.j... 000160
F276FFF4 76FF0158 E99980B8 0006E903 7500FEEC 8E83FEEC 868910C4 83000007 ....á...&±./&±.u.Õ..|¯.ÕX..v¶.v· 000180
EC86890A C4830986 03A99AF8 76FFFA76 FF1676FF 5016FC46 80000008 189A016A J.......F=.P.v..v*.v½.`....á...& 0001A0
26F85EC4 F876FFFA 76FF0073 E90375FE 460BFC46 88007EE9 037400FE ECBE83FE ±./&±.t.Õ-..F=.F±u.Õs..v*.v½á^½& 0001C0
00000AFE 9A006AFC 76FFFE76 FF27F368 021CB7FF 26021EB7 FF26F85E C40677FF .w.á^½&.ñ..&.ñ..hµ'.v±.v=j..±... 0001E0
```

Dump of file SATURN:[PCCOMMON.DUMP.DLL]PDLSYN.TMP;1 on 18-APR-1990 10:48:45.27
File ID (771,27,0) End of file block 276 / Allocated 276

Virtual block number 9 (00000009), 512 (0200) bytes

```
022287FF 26F85EC4 0477FF26 F85EC400 38E90374 00FEEC8E 83FEEC86 8912C483 .á...&±./&±.t.Õ8.á^½&.w.á^½&.ñ". 000000
0A3F9A00 6AFC76FF FE76FF27 1D68021C 87FF2602 1EB7FF26 F85EC402 2087FF26 &.ñ .á^½&.ñ..&.ñ..h.'.v±.v=j..?. 000020
7500FEEC 8E83998O FEEC86C7 0006E903 74FE4608 FC4688FE EC868912 C4830000 ...á...&±.F=.F±t.Õ..ú.&±¯../&±.u 000040
76FFF476 FF000BE9 00000877 9AF276FF F476FFFC 4689FE46 890000B8 0017E903 .Õ..|...F±.F=.v¶.v·.w...Õ...v¶.v 000060
004BE903 75000042 3E830257 892607B9 26FE5688 FC468806 5EC40000 FFFF9AF2 ·.....á^..F=.V±&..&.W..>B..u.ÕK. 000080
F0468D01 6A37FF26 0277FF26 065EC4F2 76FFF476 FF0040E9 0375FE46 08FC4688 .F=.F±u.Õa..v¶.v·á^.&.w.&.7j..Fb 0000A0
F0868D00 6A37FF26 0277FF26 065EC418 76FF1A76 FFFEEC86 890000FF FF9A5016 .P.......&±.v..v.á^.&.w.&.7j...b 0000C0
1E565700 0000C800 16CAC95F 5E1F0000 E9FEEC86 8809E908 899A0100 685016FE ±.Ph...¿.Õ...&±Õ...^_èò..à...WV. 0000E0
50160646 800007C6 26085EC4 0038E900 00880006 E9037C02 067E8308 8E094F88 ¡O..Ä.~..|.Õ..|..Õ;.Ï^.&6...F..P 000100
FF1076FF 271A6802 1CB7FF26 021EB7FF 26125EC4 0C76FF02 04680876 FF0A76FF .v..v.h...v.á^.&.ñ..&.ñ..h.'.v.. 000120
08C1881E 56570000 02C80010 CAC95F5E 1F0000E9 18C48300 000ABC9A 006A0E76 v.j..¥....á.Õ...^_èò..à...WV.¡è. 000140
00F6E901 A6FE46C7 00FEE901 A7FE46C7 00C3E90C 46880199 FE46C706 4EFFD88E .Ä.N.úF±...F.Õû.úF±Ï.Õ±.úF±Ï.Õ-. 000160
0006E901 A1FE46C7 000EE901 A2FE46C7 00E6E901 A3FE46C7 00EEE901 A4FE46C7 úF±È.ÕY.úF±È.ÕÏ.úF±Å.Õ8.úF±Å.Õm. 000180
0086E901 9CFE46C7 008EE901 9CFE46C7 00C6E901 9AFE46C7 00CEE901 98FE46C7 úF±..Õö.úF±..Õ6.úF±..Õ/.úF±..ÕÑ. 0001A0
0096E901 91FE46C7 009EE901 90FE46C7 00A6E901 A0FE46C7 00AEE901 9FFE46C7 úF±..ÕÛ.úF±..ÕÏ.úF±..Õ..úF±..Õ.. 0001C0
0076E901 95FE46C7 007EE901 94FE46C7 0086E901 93FE46C7 008EE901 92FE46C7 úF±..Õ..úF±..Õ..úF±..Õ-.úF±..Õv. 0001E0
```

Dump of file SATURN:[PCCOMMON.DUMP.DLL]PDLSYN.TMP;1 on 18-APR-1990 10:48:45.27
File ID (771,27,0) End of file block 276 / Allocated 276

```
Virtual block number 10 (0000000A), 512 (0200) bytes

0056E901 A5FE46C7 005EE901 99FE46C7 0066E901 98FE46C7 006EE901 96FE46C7 úF±..Ön.úF±..Öf.úF±..Ö^.úF±E.ÖV. 000000
C003FFEA E9037600 173099A8 2D0043E9 0046E901 97FE46C7 004EE901 A8FE46C7 úF±´.ÖN.úF±._Öf.ÖC.-´.=..v.Öò..à 000020
0C700C60 0C680CC8 0CE80C90 0CD00CC0 0C880C80 0CA80CA0 0C980D06 A7FF2E93 ...I......´.¯.|.à.À...ò.à.h.'.p. 000040
FF0876FF 0A76FFFE 76FF0CE0 0C300C38 0CD80C40 0C480C50 0C580C88 0C800C78 x.....X.P.H.@.Ä.8.0.Å..v±.v..v.. 000060
0A468808 8E0C1EB8 1E565700 0000C800 0CCAC95F 5E1F0000 E90000FF FF9A0676 v......Ö...^_èò..à...WV.|...Ä.F. 000080
75023830 00ABE900 AEE90001 07C72606 5EC40089 E9000007 C726065E C40019E9 Ö..á^.&ú...Ö¯.á^.&ú...ÖÚ.Ö¯.=8.u 0000A0
083DFFC5 E9037501 F63D0013 E9037EFF 02E90375 02123000 43E9037E FFDFE903 .ÖÖ.~.ÖC.=..u.Ö@.~.Ö..=~.u.Öé.=. 0000C0
A2E90375 02313DFF AAE90375 02273DFF B2E90375 02153DFF C5E9FFB0 E9037502 .u.Ö§.Öé.=..u.Öý.='.u.Ö¯.=1.u.ÖÅ 0000E0
82E90375 02463D00 1BE9037E FF8FE903 75025430 FFA2E9FF 9AE90375 02353DFF .=5.u.Ö..ÖÅ.=T.u.Ö..~.Ö..=F.u.Ö. 000100
0BE9037E FF67E903 75025E3D FF7AE9FF 72E90375 024D3DFF 7AE90375 02493DFF .=I.u.Öz.=M.u.Ör.Öz.=^.u.Ög.~.Ö. 000120
75026C3D FF47E903 7F02673D FF5AE903 70026630 FF62E9FF 5AE90375 02563000 .=V.u.ÖZ.Öb.=f.).ÖZ.=g...ÖG.=l.u 000140
D88E0D59 B81E5657 000000C8 000ACAC9 5F5E1F00 00E90000 B8FF47E9 FF3FE903 .Ö?.ÖG.|..Ö...^_èò..à...WV.|Y..Ä 000160
26065EC4 00F3E900 0107C726 065EC400 FEE90000 07C72606 5EC40066 E90A4688 .F.Öf.á^.&ú...Ö±.á^.&ú...Öµ.á^.& 000180
065EC400 D2E90004 07C72606 5EC400DD E9000307 C726065E C400E8E9 000207C7 ú...ÖÒ.á^.&ú...ÖI.á^.&ú...Ö@.á^. 0001A0
5EC40081 E9000707 C726065E C4008CE9 000607C7 26065EC4 00C7E900 0507C726 &ú...Öú.á^.&ú...Ö¥.á^.&ú...ÖY.á^ 0001C0
C7E90375 02123000 43E9037E FFD4E903 75023830 00A3E900 A6E90008 07C72606 .&ú...ÖI.ÖÈ.=8.u.Öå.~.ÖC.=..u.Öú 0001E0

Dump of file SATURN:[PCCOMMON.DUMP.DLL]PDLSYN.TMP;1 on 18-APR-1990 10:48:45.27
File ID (771,27,0)   End of file block 276 / Allocated 276

Virtual block number 11 (0000000B), 512 (0200) bytes

B0E90375 02153DFF 6DE9FF86 E9037502 083DFF83 E9037501 F63D0013 E9037EFF .-.Ö..=-.u.Ö..=..u.Ö..Öm.=..u.Ö§ 000000
7502543D FF4AE9FF 79E90375 02353DFF 81E90375 02313DFF 7EE90375 02273DFF .='.u.Ö-.=1.u.Ö..=5.u.Öy.ÖJ.=T.u 000020
5CE90375 024D3DFF 59E90375 02493DFF 61E90375 02463000 1BE9037E FF84E903 .Ö..-.Ö..=F.u.Öa.=I.u.ÖY.=M.u.Ö\ 000040
7502673D FF41E903 7502663D FF12E903 75025E30 FF3BE903 7502563D FF22E9FF .Ö".=V.u.Ö;.=^.u.Ö..=f.u.ÖA.=g.u 000060
000004C8 000ACAC9 5F5E1F00 00E90000 B8FEF7E9 FF3CE903 75026C3D FF4FE903 .ÖO.=l.u.Ö<.Ö%±|..Ö...^_èò..à... 000080
04B7FF26 130687FF 26FC5EC4 FE5689FC 46890E56 880C468B D88E0E3C B81E5657 WV.|<..Ä.F..V..F=.V±á^=Ï.ñ..&.ñ. 0000A0
57000000 C8000ACA C95F5E1F 0000E900 00FFFF9A 0676FF00 6A0876FF 0A76FF13 ..v..v.j..v......Ö...^_èò..à...W 0000C0
0000E900 00880226 97892602 24878926 08568806 46880A5E C4088E0F 64881E56 V.|d..Äá^..F..V.&..$.&¯.&.|..Ö.. 0000E0
FF0A76FF 0C76FF06 76FF0876 FFD88E0F A3881E56 57000000 C80008CA C95F5E1F .^_èò..à...WV.|È..Ä.v..v..v..v.. 000100
000108A9 00020029 90000CCA C95F5E1F 0000E90C C483FFFF 0A959A0E 76FF1076 v..v.......á.Ö...^_èò...)...`... 000120
00060883 02030061 00050A63 0203023E 0009041D 02032005 0004052E 00050000 ......... ......>...c...a....... 000140
00070306 02030000 00040A03 0002190C 00040456 00050000 00030A78 0002000B Ü...x.......V.................. 000160
000405F4 00051B96 00040472 00050000 00050FE8 00022212 000405D8 00050159 Y...Ä....".Ò.......r.......¶... 000180
00040502 00051827 00040528 00050000 00090FCF 00020000 000608FC 00021F17 ....=........Ü.......(...'...Ø... 0001A0
00060834 02031D3B 000405B0 00051AB1 0004054A 000501E7 000903F3 02031E29 )...µ...Ö...J...Ý...¯...;...4... 0001C0
0004048E 00051FD1 000404FE 000501FE 00090459 020321C5 000405B6 0005010E ....Ñ...él..Y...±...±...¶....... 0001E0

Dump of file SATURN:[PCCOMMON.DUMP.DLL]PDLSYN.TMP;1 on 18-APR-1990 10:48:45.27
File ID (771,27,0)   End of file block 276 / Allocated 276

Virtual block number 12 (0000000C), 512 (0200) bytes

000404AA 0005020F 00090F8D 02030036 000401C0 02032155 00040594 00051A51 Q.......U!..à...6...........`... 000000
000406A0 02031EE3 000404E2 00050128 00070C05 0203225F 000405FA 00051CDB Û...¹...."......(...ã...Û....... 000020
00060842 0203196C 0004056C 00050222 00090531 020320E5 00040550 00050044 D...P...T ..1...".....l...l...B... 000040
00050D43 020318F6 0004058E 00051DF5 000404C6 00052075 00040572 0005008C ¥...r...u ..6...%.......-...C... 000060
260E5EC4 D88EFFFF B81E5657 000000C8 00000000 00000000 00000000 00000056 V...............à...WV.|...Äá^.& 000080
57000000 C8C8C95F 5E1F0000 E9000088 02578926 0789260A 5EC40257 8826078B ..&.W.á^.&..&.W.|..Ö...^_èùà...W 0000A0
00E90000 88025789 26078926 0A5EC402 57882607 88260E5E C4088E00 08881E56 V.|...Äá^.&..&.W.á^.&..&¯W.|..Ö. 0000C0
260A5EC4 02578826 0788260E 5EC4088E 0033881E 56570000 00C8C8C9 5F5E1F00 ..^_èùà...WV.|3..Äá^.&..&.W.á^.& 0000E0
0E5EC408 8E005E88 1E565700 0000C8C8 C95F5E1F 0000E900 00880257 89260789 ..&¯W.|..Ö...^_èùà...WV.|^..Äá^. 000100
000000C8 C8C95F5E 1F0000E9 00008802 57892607 89260A5E C402578B 26078826 &..&.W.á^.&..&¯W.|..Ö...^_èùà... 000120
E9000088 02578926 0789260A 5EC40257 8826078B 260E5EC4 D88E0089 B81E5657 WV.|...Äá^.&..&.W.á^.&..&¯W.|..Ö 000140
0A5EC402 57882607 88260E5E C4D88E00 B4881E56 57000000 C8C8C95F 5E1F0000 ...^_èùà...WV.|Ç..Äá^.&..&.W.á^. 000160
5EC4D88E 000F881E 56570000 00C8C8C9 5F5E1F00 00E90000 88025789 26078926 &..&¯W.|..Ö...^_èùà...WV.|Ö..Äá^ 000180
0000C8C8 C95F5E1F 0000E900 00880257 89260789 260A5EC4 02578826 0788260E .&..&.W.á^.&..&¯V.|..Ö...^_èùà.. 0001A0
00008802 57892607 89260A5E C402578B 26078826 0E5EC408 8E010A88 1E565700 .WV.|...Äá^.&..&.W.á^.&..&¯W.|.. 0001C0
5EC40257 8826078B 260E5EC4 D88E0135 B81E5657 000000C8 C8C95F5E 1F0000E9 Ö...^_èùà...WV.|5..Äá^.&..&.W.á^ 0001E0

Dump of file SATURN:[PCCOMMON.DUMP.DLL]PDLSYN.TMP;1 on 18-APR-1990 10:48:45.27
File ID (771,27,0)   End of file block 276 / Allocated 276
```

```
Virtual block number 13 (0000000D), 512 (0200) bytes

 C4D88E01 60881E56 57000000 C8CBC95F 5E1F0000 E90000B8 02578926 0789260A .&..&.W.|..Õ...^_èùà...WV.|'..Ãå 000000
 00C8CBC9 5F5E1F00 00E90000 B8025789 26078926 0A5EC402 57882607 8B260E5E ^.&..&.W.á^.&..&.W.|..Õ...^_èùà. 000020
 00B80257 89260789 260A5EC4 02578826 0788260E 5EC4D88E 0188B81E 56570000 ..WV.|...Ãá^.&..&.W.á^.&..&.W.|. 000040
 C40257B8 26078826 0E5EC408 8E01B688 1E565700 0000C8CB C95F5E1F 0000E900 .Õ...^_èùà...WV.|Ñ..Ãá^.&..&.W.á 000060
 D88E01E1 B81E5657 000000C8 CBC95F5E 1F0000E9 0000B802 57892607 89260A5E ^.&..&.W.|..Õ...^_èùà...WV.|Ã..Ã 000080
 C8CBC95F 5E1F0000 E90000B8 02578926 0789260A 5EC40257 8B260788 260E5EC4 á^.&..&.W.á^.&..&.W.|..Õ...^_èùà 0000A0
 B8025789 26078926 0A5EC402 57882607 8B260E5E C4D88E02 0CB81E56 57000000 ...WV.|...Ãá^.&..&.W.á^.&..&.W.| 0000C0
 02578826 0788260E 5EC4D88E 0237B81E 56570000 00C8CBC9 5F5E1F00 00E90000 ..Õ...^_èùà...WV.|7..Ãá^.&..&.W. 0000E0
 8E0262B8 1E565700 0000C8CB C95F5E1F 0000E900 00B80257 89260789 260A5EC4 á^.&..&.W.|..Õ...^_èùà...WV.|b.. 000100
 CBC95F5E 1F0000E9 0000B802 57892607 89260A5E C40257B8 26078826 0E5EC4D8 Ãá^.&..&.W.á^.&..&.W.|..Õ...^_èù 000120
 02578926 0789260A 5EC40257 88260788 260E5EC4 D88E028D B81E5657 000000C8 à...WV.|...Ãá^.&..&.W.á^.&..&.W. 000140
 57882607 8B260E5E C4D88E02 B8B81E56 57000000 C8CBC95F 5E1F0000 E90000B8 |..Õ...^_èùà...WV.||..Ãá^.&..&.W 000160
 02E3B81E 56570000 00C8CBC9 5F5E1F00 00E90000 B8025789 26078926 0A5EC402 .á^.&..&.W.|..Õ...^_èùà...WV.|D. 000180
 5EC40C47 89260E47 89260000 B80E5EC4 08478926 0A478926 0000B80E 5EC4D88E .Ãá^.|..&.G.&.G.á^.|..&.G.&.G.á^ 0001A0
 0000B80E 5EC41447 89261647 89260000 B80E5EC4 10478926 12478926 0000B80E .|..&.G.&.G.á^.|..&.G.&.G.á^.|.. 0001C0
 C95F5E1F 0000E900 00B81C47 89261E47 89260000 B80E5EC4 18478926 1A478926 &.G.&.G.á^.|..&.G.&.G.|..Õ...^_è 0001E0

Dump of file SATURN:[PCCOMMON.DUMP.DLL]PDLSYN.TMP;1 on 18-APR-1990 10:48:45.27
File ID (771,27,0)   End of file block 276 / Allocated 276

Virtual block number 14 (0000000E), 512 (0200) bytes

 261A77FF 260E5EC4 1C77FF26 1E77FF26 0E5EC4D8 8E030EB8 1E565700 0000C8CB ùà...WV.|...Ãá^.&.w.&.w.á^.&.w.& 000000
 0E77FF26 0E5EC410 77FF2612 77FF260E 5EC41477 FF261677 FF260E5E C41877FF .w.á^.&.w.&.w.á^.&.w.&.w.á^.&.w. 000020
 87FF2606 5EC40477 FF260677 FF260E5E C40877FF 260A77FF 260E5EC4 0C77FF26 &.w.á^.&.w.&.w.á^.&.w.&.w.á^.&.ñ 000040
 FF9A006A 446A0A76 FF0C76FF 021C87FF 26021E87 FF26065E C40228B7 FF26022A *.&.ñ(.á^.&.ñ..&.ñ...v..v.jDj... 000060
 D88E0379 B81E5657 000000C8 CBC95F5E 1F0000E9 0000B800 06E92CC4 830000FF ....á,Õ..|..Õ...^_èùà...WV.|y..Ã 000080
 C8CBC95F 5E1F0000 E90000B8 02578926 0789260A 5EC40257 8B260788 260E5EC4 á^.&..&.W.á^.&..&.W.|..Õ...^_èùà 0000A0
 02578926 0789260A 5EC40657 8B260447 8B260E5E C4D88E04 0CB81E56 57000000 ...WV.|...Ãá^.&.G.&.W.á^.&..&.W. 0000C0
 47892600 00B80E5E C4D88E04 37B81E56 57000000 C8CBC95F 5E1F0000 E90000B8 |..Õ...^_èùà...WV.|7..Ãá^.|..&.G 0000E0
 4789260E 47892600 00B80E5E C4084789 260A4789 260000B8 0E5EC404 47892606 .&.G.á^.|..&.G.&.G.á^.|..&.G.&.G 000100
 260E77FF 260E5EC4 D88E0463 B81E5657 000000C8 CBC95F5E 1F0000E9 0000B80C .|..Õ...^_èùà...WV.|c..Ãá^.&.w.& 000120
 2AB7FF26 065EC404 77FF2606 77FF260E 5EC40877 FF260A77 FF260E5E C40C77FF .w.á^.&.w.&.w.á^.&.w.&.w.á^.&.ñ* 000140
 03EF9A00 6A466A0A 76FF0C76 FF021CB7 FF26021E 87FF2606 5EC40228 87FF2602 .&.ñ(.á^.&.ñ..&.ñ...v..v.jFj..ÿ. 000160
 C4D88E04 A4B81E56 57000000 C8CBC95F 5E1F0000 E90000B8 0006E91C C4830000 ...á.Õ..|..Õ...^_èùà...WV.|É..Ãá 000180
 00C8CBC9 5F5E1F00 00E90000 B8025789 26078926 0A5EC402 57882607 8B260E5E ^.&..&.W.á^.&..&.W.|..Õ...^_èùà. 0001A0
 00B80257 89260789 260A5EC4 02578826 0788260E 5EC4D88E 0508B81E 56570000 ..WV.|...Ãá^.&..&.W.á^.&..&.W.|. 0001C0
 C40257B8 26078826 0E5EC4D8 8E0536B8 1E565700 0000C8CB C95F5E1F 0000E900 .Õ...^_èùà...WV.|6..Ãá^.&..&.W.á 0001E0

Dump of file SATURN:[PCCOMMON.DUMP.DLL]PDLSYN.TMP;1 on 18-APR-1990 10:48:45.27
File ID (771,27,0)   End of file block 276 / Allocated 276

Virtual block number 15 (0000000F), 512 (0200) bytes

 D88E0561 B81E5657 000000C8 CBC95F5E 1F0000E9 0000B802 57892607 89260A5E ^.&..&.W.|..Õ...^_èùà...WV.|a..Ã 000000
 CBC95F5E 1F0000E9 0000B802 57892607 89260A5E C40657B8 260447B8 260E5EC4 á^.&.G.&.W.á^.&..&.W.|..Õ...^_èù 000020
 02578926 0789260A 5EC40257 8B260788 260E5EC4 D88E058C B81E5657 000000C8 à...WV.|...Ãá^.&..&.W.á^.&..&.W. 000040
 8B260447 8B260E5E C4D88E05 B8B81E56 57000000 C8CBC95F 5E1F0000 E90000B8 |..Õ...^_èùà...WV.||..Ãá^.&.G.&. 000060
 E3B81E56 57000000 C8CBC95F 5E1F0000 E90000B8 02578926 0789260A 5EC40657 W.á^.&..&.W.|..Õ...^_èùà...WV.|D 000080
 5E1F0000 E90000B8 02578926 0789260A 5EC40657 8B260447 8B260E5E C4D88E05 ..Ãá^.&.G.&.W.á^.&..&.W.|..Õ...^ 0000A0
 26078926 0A5EC402 57882607 8B260E5E C4D88E06 0FB81E56 57000000 C8CBC95F _èùà...WV.|...Ãá^.&..&.W.á^.&..& 0000C0
 77FF260E 5EC4D88E 063BB81E 56570000 00C8CBC9 5F5E1F00 00E90000 B8025789 .W.|..Õ...^_èùà...WV.|;..Ãá^.&.w 0000E0
 C40228B7 FF26022A 87FF2606 5EC40215 6837FF26 0277FF26 0E5EC408 77FF260A .&.w.á^.&.w.&.7h..á^.&.ñ*.&.ñ(.á 000100
 06E91AC4 83000004 EE9A006A 476A0A76 FF0C76FF 021CB7FF 26021E87 FF26065E ^.&.ñ..&.ñ...v..v.jGj..Ÿ....á.Õ. 000120
 89260000 B80E5EC4 D88E0666 B81E5657 000000C8 CBC95F5E 1F0000E9 0000B800 .|..Õ...^_èùà...WV.|f..Ãá^.|..&. 000140
 0E5EC4D8 8E06C4B8 1E565700 0000C8CB C95F5E1F 0000E900 00B80447 89260647 G.&.G.|..Õ...^_èùà...WV.|á..Ãá^. 000160
 06E9B81E 56570000 00C8CBC9 5F5E1F00 00E90000 B80C4789 260E4789 260000B8 |..&.G.&.G.|..Õ...^_èùà...WV.|Õ. 000180
 57000000 C8CBC95F 5E1F0000 E90000B8 10478926 12478926 0000B80E 5EC4D88E .Ãá^.|..&.G.&.G.|..Õ...^_èùà...W 0001A0
 CBC95F5E 1F0000E9 0000B814 47892616 47892600 00B80E5E C4D88E07 0EB81E56 V.|...Ãá^.|..&.G.&.G.|..Õ...^_èù 0001C0
 FF261277 FF260E5E C41477FF 261677FF 260E5EC4 D88E0733 B81E5657 000000C8 à...WV.|3..Ãá^.&.w.&.w.á^.&.w.&. 0001E0

Dump of file SATURN:[PCCOMMON.DUMP.DLL]PDLSYN.TMP;1 on 18-APR-1990 10:48:45.27
File ID (771,27,0)   End of file block 276 / Allocated 276
```

Virtual block number 16 (00000010), 512 (0200) bytes

```
5EC437FF 260277FF 260E5EC4 0477FF26 0E5EC40C 77FF260E 77FF260E 5EC41077 w.6^.&.w.&.w.6^.&.w.6^.&.w.&.76^ 000000
356A0A76 FF0C76FF 021CB7FF 26021EB7 FF26065E C40228B7 FF26022A B7FF2606 .&.ñ*.&.ñ(.6^.&.ñ..&.ñ...v..v.j5 000020
B81E5657 000000C8 CBC95F5E 1F0000E9 0000B800 06E922C4 83000006 A79A006A j..I....6"Õ..|..Õ...^_èùà...WV.| 000040
0000C8CB C95F5E1F 0000E900 00B80000 0247C726 000107C7 260A5EC4 D88E0758 X..Ä6^.&ú...&úG...|..Õ...^_èùà.. 000060
0000B802 57892607 89260A5E C402578B 2607B826 0E5EC4D8 8E07D0B8 1E565700 .WV.|À..Ä6^.&..&.W.6^.&..&.W.|.. 000080
5EC40257 8B26078B 260E5EC4 D88E07F5 B81E5657 000000C8 CBC95F5E 1F0000E9 Õ...^_èùà...WV.|%..Ä6^.&..&.W.6^ 0000A0
C4D88E08 20B81E56 57000000 C8CBC95F 5E1F0000 E90000B8 02578926 0789260A .&..&.W.|..Õ...^_èùà...WV.| ..Ä6 0000C0
00C8CBC9 5F5E1F00 00E90000 B8025789 26078926 0A5EC402 578B2607 8B260E5E ^.&..&.W.6^.&..&.W.|..Õ...^_èùà. 0000E0
00B80257 89260789 260A5EC4 02578B26 078B260E 5EC4D88E 0848B81E 56570000 ..WV.|K..Ä6^.&..&.W.6^.&..&.W.|. 000100
C402578B 26078B26 0E5EC4D8 8E0876B8 1E565700 0000C8CB C95F5E1F 0000E900 .Õ...^_èùà...WV.|v..Ä6^.&..&.W.6 000120
D88E08A1 B81E5657 000000C8 CBC95F5E 1F0000E9 0000B802 57892607 89260A5E ^.&..&.W.|..Õ...^_èùà...WV.|À..Ä 000140
C8CBC95F 5E1F0000 E90000B8 02578926 0789260A 5EC40257 8B26078B 260E5EC4 6^.&..&.W.6^.&..&.W.|..Õ...^_èùà 000160
B8025789 26078926 0A5EC402 578B2607 8B260E5E C4D88E08 CCB81E56 57000000 ...WV.|ë..Ä6^.&..&.W.6^.&..&.W.| 000180
FF26022A B7FF2606 5EC4D88E 08F7B81E 56570000 00C8CBC9 5F5E1F00 00E90000 ..Õ...^_èùà...WV.|%..Ä6^.&.ñ*.&. 0001A0
83000007 B39A006A 506A0A76 FF0C76FF 021CB7FF 26021EB7 FF26065E C40228B7 ñ(.6^.&.ñ..&.ñ...v..v.jPj..*.... 0001C0
26065EC4 D88E0922 B81E5657 000000C8 CBC95F5E 1F0000E9 0000B800 06E910C4 6.Õ..|..Õ...^_èùà...WV.|"..Ä6^.& 0001E0
```

Dump of file SATURN:[PCCOMMON.DUMP.DLL]PDLSYN.TMP;1 on 18-APR-1990 10:48:45.27
File ID (771,27,0)   End of file block 276 / Allocated 276

Virtual block number 17 (00000011), 512 (0200) bytes

```
006A516A 0A76FF0C 76FF021C B7FF2602 1EB7FF26 065EC402 28B7FF26 022AB7FF .ñ*.&.ñ(.6^.&.ñ..&.ñ...v..v.jQj. 000000
0968B81E 56570000 00C8CBC9 5F5E1F00 00E90000 B80006E9 10C48300 00094B9A .K....6.Õ..|..Õ...^_èùà...WV.|h. 000020
57000000 C8CBC95F 5E1F0000 E90000B8 08478926 0A478926 0000B80E 5EC4D88E .Ä6^.|..&.G.&.G.|..Õ...^_èùà...W 000040
022AB7FF 26065EC4 01F46801 F46B0877 FF260A77 FF260E5E C4D88E09 AEB81E56 V.|Ü..Ä6^.&.w.&.w.h¶.h¶.Õ^.&.ñ*. 000060
0009919A 006A386A 0A76FF0C 76FF021C B7FF2602 1EB7FF26 065EC402 28B7FF26 &.ñ(.6^.&.ñ..&.ñ...v..v.j8j..... 000080
5EC4D88E 0903B81E 56570000 00C8CBC9 5F5E1F00 00E90000 B80006E9 18C48300 ..6.Õ..|..Õ...^_èùà...WV.|Æ..Ä6^ 0000A0
526A0A76 FF0C76FF 021CB7FF 26021EB7 FF26065E C40228B7 FF26022A B7FF2606 .&.ñ*.&.ñ(.6^.&.ñ..&.ñ...v..v.jR 0000C0
B81E5657 000000C8 CBC95F5E 1F0000E9 0000B800 06E910C4 8300000A 009A006A j.......6.Õ..|..Õ...^_èùà...WV.| 0000E0
0000C8CB C95F5E1F 0000E900 00B80847 89260A47 89260000 B80E5EC4 D88E0A2A *..Ä6^.|..&.G.&.G.|..Õ...^_èùà.. 000100
B7FF2606 5EC4022A 68022A68 0877FF26 0A77FF26 0E5EC4D8 8E0A70B8 1E565700 .WV.|p..Ä6^.&.w.&.w.h*.h*.Õ^.&.ñ 000120
539A006A 386A0A76 FF0C76FF 021CB7FF 26021EB7 FF26065E C40228B7 FF26022A *.&.ñ(.6^.&.ñ..&.ñ...v..v.j8j..S 000140
D88E0A95 B81E5657 000000C8 CBC95F5E 1F0000E9 0000B800 06E918C4 8300000A ....6.Õ..|..Õ...^_èùà...WV.|...Ä 000160
5EC40228 B7FF2602 2AB7FF26 065EC402 79680279 680877FF 260A77FF 260E5EC4 6^.&.w.&.w.hy.hy.Õ^.&.ñ*.&.ñ(.6^ 000180
0006E918 C4830000 0ACF9A00 6A386A0A 76FF0C76 FF021CB7 FF26021E B7FF2606 .&.ñ..&.ñ...v..v.j8j..Ü....6.Õ.. 0001A0
47892600 00B80E5E C4D88E0A ECB81E56 57000000 C8CBC95F 5E1F0000 E90000B8 |..Õ...^_èùà...WV.|š..Ä6^.|..&.G 0001C0
260E5EC4 D88E0B43 B81E5657 000000C8 CBC95F5E 1F0000E9 0000B80C 4789260E .&.G.|..Õ...^_èùà...WV.|C..Ä6^.& 0001E0
```

Dump of file SATURN:[PCCOMMON.DUMP.DLL]PDLSYN.TMP;1 on 18-APR-1990 10:48:45.27
File ID (771,27,0)   End of file block 276 / Allocated 276

Virtual block number 18 (00000012), 512 (0200) bytes

```
5EC40228 B7FF2602 2AB7FF26 065EC402 78680477 FF260E5E C40C77FF 260E77FF .w.&.w.6^.&.w.hx.6^.&.ñ*.&.ñ(.6^ 000000
0006E918 C4830000 0B269A00 6A386A0A 76FF0C76 FF021CB7 FF26021E B7FF2606 .&.ñ..&.ñ...v..v.j8j..&....6.Õ.. 000020
47892600 00B80E5E C4D88E0B 68B81E56 57000000 C8CBC95F 5E1F0000 E90000B8 |..Õ...^_èùà...WV.|h..Ä6^.|..&.G 000040
260E5EC4 D88E0BC3 B81E5657 000000C8 CBC95F5E 1F0000E9 0000B808 4789260A .&.G.|..Õ...^_èùà...WV.|û..Ä6^.& 000060
C40228B7 FF26022A B7FF2606 5EC40477 FF260677 FF260E5E C40877FF 260A77FF .w.&.w.6^.&.w.&.w.6^.&.ñ*.&.ñ(.6 000080
06E918C4 83000008 A69A006A 326A0A76 FF0C76FF 021CB7FF 26021EB7 FF26065E ^.&.ñ..&.ñ...v..v.j2j..I....6.Õ. 0000A0
89260000 B80E5EC4 D88ED0E8 B81E5657 000000C8 CBC95F5E 1F0000E9 0000B800 .|..Õ...^_èùà...WV.|Õ..Ä6^.|..&. 0000C0
89261247 89260000 B80E5EC4 0C478926 0E478926 0000B80E 5EC40847 89260A47 G.&.G.6^.|..&.G.&.G.6^.|..&.G.&. 0000E0
0677FF26 0E5EC4D8 8E0C44B8 1E565700 0000C8CB C95F5E1F 0000E900 00B81047 G.|..Õ...^_èùà...WV.|D..Ä6^.&.w. 000100
76FF021C B7FF2602 1EB7FF26 065EC402 28B7FF26 022AB7FF 26065EC4 0477FF26 &.w.6^.&.ñ*.&.ñ(.6^.&.ñ..&.ñ...v 000120
00C8CBC9 5F5E1F00 00E90000 B80006E9 14C48300 000C279A 006A616A 0A76FF0C ..v.jaj..'....6.Õ..|..Õ...^_èùà. 000140
00B80257 89260789 260A5EC4 02578B26 078B260E 5EC4D88E 0C85B81E 56570000 ..WV.|...Ä6^.&..&.W.6^.&..&.W.|. 000160
0A578B26 08478B26 0E5EC4D8 8E0CD6B8 1E565700 0000C8CB C95F5E1F 0000E900 .Õ...^_èùà...WV.|ø..Ä6^.&.G.&.W. 000180
8E0D01B8 1E565700 0000C8CB C95F5E1F 0000E900 00B80257 89260789 260A5EC4 6^.&..I.W.|..Õ...^_èùà...WV.|... 0001A0
CBC95F5E 1F0000E9 0000B802 57892607 89260A5E C402578B 26078B26 0E5EC4D8 Ä6^.&..&.W.6^.&..&.W.|..Õ...^_èù 0001C0
57892607 89260A5E C406578B 2604478B 260E5EC4 D88E0D2D B81E5657 000000C8 à...WV.|-..Ä6^.&.G.&.W.6^.&..I.W 0001E0
```

Dump of file SATURN:[PCCOMMON.DUMP.DLL]PDLSYN.TMP;1 on 18-APR-1990 10:48:45.27
File ID (771,27,0)   End of file block 276 / Allocated 276

```
Virtual block number 19 (00000013), 512 (0200) bytes

 88260788 260E5EC4 088E0058 881E5657 000000C8 CBC95F5E 1F0000E9 00008802 .|..Õ...^_èùà...WV.|X..Äá^.&..&. 000000
 881E5657 000000C8 CBC95F5E 1F0000E9 00008806 57892604 4789260E 5EC40257 W.á^.&.G.Ī.W.|..Õ...^_èùà...WV.| 000020
 1F0000E9 00008802 57892607 89260A5E C4065788 26044788 260E5EC4 088E0084 ...Äá^.&.G.&.W.á^.&..Ī.W.|..Õ... 000040
 4789260E 5EC40257 88260788 260A5EC4 088E0080 881E5657 000000C8 CBC95F5E ^_èùà...WV.|¯..Äá^.&..&.W.á^.&.G 000060
 27E16802 1CB7FF26 021EB7FF 26065EC4 0477FF26 0677FF26 0E5EC40A 57892608 .Ī.W.á^.&.w.&.w.á^.&.ñ..&.ñ..hÅ' 000080
 5F5E1F00 00E90000 880006E9 10C48300 00FFFF9A 006A37FF 260277FF 260A5EC4 á^.&.w.&.7j.......á.Õ..|..Õ...^ 0000A0
 26078926 0A5EC40A 57882608 4788260E 5EC4088E 000C881E 56570000 00C8CBC9 èùà...WV.|É..Äá^.&.G.&.W.á^.&..Ī 0000C0
 0788260E 5EC4088E 0E3A881E 56570000 00C8CBC9 5F5E1F00 00E90000 88025789 .W.|..Õ...^_èùà...WV.|:..Äá^.&.. 0000E0
 1E565700 0000C8CB C95F5E1F 0000E900 00880257 89260789 260A5EC4 02578826 &.W.á^.&..&.W.|..Õ...^_èùà...WV. 000100
 0000E900 00880257 89260789 260A5EC4 06578826 04478826 0E5EC408 8E0E6688 |f..Äá^.&.G.&.W.á^.&..Ī.W.|..Õ.. 000120
 89260A5E C4025788 26078826 0E5EC408 8E0E9188 1E565700 0000C8CB C95F5E1F .^_èùà...WV.|...Äá^.&..&.W.á^.&. 000140
 260E5EC4 088E0E80 881E5657 000000C8 CBC95F5E 1F0000E9 00008802 57892607 .&.W.|..Õ...^_èùà...WV.|§..Äá^.& 000160
 000000C8 CBC95F5E 1F0000E9 00008802 57892607 89260A5E C4065788 26044788 .G.&.W.á^.&..Ī.W.|..Õ...^_èùà... 000180
 0E478926 0000880E 5EC40847 89260A47 89260000 880E5EC4 088E0EE8 881E5657 WV.|Ò..Äá^.|..&.G.&.G.á^.|..&.G. 0001A0
 0000C8CB C95F5E1F 0000E900 00881047 89261247 89260000 880E5EC4 0C478926 &.G.á^.|..&.G.&.G.|..Õ...^_èùà.. 0001C0
 FF026A9A 0676FF08 76FF0C77 FF260E77 FF260E5E C4016A08 8E0F1488 1E565700 .WV.|...Äj.á^.&.w.&.w..v..v̄..j.. 0001E0

Dump of file SATURN:[PCCOMMON.DUMP.DLL]PDLSYN.TMP;1 on 18-APR-1990 10:48:45.27
File ID (771,27,0)   End of file block 276 / Allocated 276

Virtual block number 20 (00000014), 512 (0200) bytes

 88260E5E C4D88E0F 55881E56 57000002 C8C8C95F 5E1F0000 E9000088 0AC483FF ..á.|..Õ...^_èùà...WV.|U..Äá^.&. 000000
 C4016A09 6A0028E9 03741247 08261047 88260E5E C4003BE9 03750E47 08260C47 G.&.G.u.Õ;.á^.&.G.&.G.t.Õ(.j.j.á 000020
 26104789 260E5EC4 0CC4830F FC0D4D9A 0676FF08 76FF0C77 FF260E77 FF260E5E ^.&.w.&.w..v..v..M.=..á.á^.&.G.& 000040
 261277FF 260E5EC4 016A0026 E9037512 47082610 4788260E 5EC40036 E9125789 .W.Õ6.á^.&.G.&.G.u.Õ&.j.á^.&.w.& 000060
 880E4688 0E578926 0C478926 0E5EC40A C4831024 0E749A06 76FF0876 FF1077FF .w..v..v..t.$..á.á^.&.G.&.W..F.. 000080
 00FE7E83 FE46890C C4830F6F 0A959A06 76FF0876 FF006A00 6A505200 04051056 V....RPj.j..v..v....o..á..F±.~±. 0000A0
 FF261277 FF260E5E C4022CB7 FF26065E C4006A00 6A0060E9 FE468800 06E90375 u.Õ...F±Õm.j.j.á^.&.ñ,.á^.&.w.&. 0000C0
 260677FF 260E5EC4 0877FF26 0A77FF26 0E5EC40C 77FF260E 77FF260E 5EC41077 w.á^.&.w.&.w.á^.&.w.&.w.á^.&.w.& 0000E0
 0C76FF02 1CB7FF26 021EB7FF 26065EC4 02288 7FF 26022A87 FF26065E C40477FF .w.á^.&.ñ*.&.ñ(.á^.&.ñ..&.ñ...v. 000100
 0000C8CB C95F5E1F 0000E900 00880006 E926C483 00000C89 9A006A36 6A0A76FF .v.j6j..¿....á&Õ..|..Õ...^_èùà.. 000120
 47892600 00880E5E C4084789 260A4789 26000088 0E5EC408 8E0F8788 1E565700 .WV.|...Äá^.|..&.G.&.G.á^.|..&.G 000140
 00C8CBC9 5F5E1F00 00E90000 88104789 26124789 26000088 0E5EC40C 4789260E .&.G.á^.|..&.G.&.G.|..Õ...^_èùà. 000160
 026A9A06 76FF0876 FF0C77FF 260E77FF 260E5EC4 006A088E 1085881E 56570000 ..WV.|ç..Äj.á^.&.w.&.w..v..v̄..j. 000180
 260E5EC4 088E10F6 881E5657 000002C8 CBC95F5E 1F0000E9 0000880A C4830FC3 Û..á.|..Õ...^_èùà...WV.|-..Äá^.& 0001A0
 006A096A 0028E903 74124708 26104788 260E5EC4 003BE903 750E4708 260C4788 .G.&.G.u.Õ;.á^.&.G.&.G.t.Õ(.j.j. 0001C0
 10478926 0E5EC40C C4831190 004D9A06 76FF0876 FF0C77FF 260E77FF 260E5EC4 á^.&.w.&.w..v..v..M....á.á^.&.G. 0001E0

Dump of file SATURN:[PCCOMMON.DUMP.DLL]PDLSYN.TMP;1 on 18-APR-1990 10:48:45.27
File ID (771,27,0)   End of file block 276 / Allocated 276

Virtual block number 21 (00000015), 512 (0200) bytes

 1277FF26 0E5EC400 6A0026E9 03751247 08261047 88260E5E C40036E9 12578926 &.W.Õ6.á^.&.G.&.G.u.Õ&.j.á^.&.w. 000000
 0E46880E 5789260C 4789260E 5EC40AC4 8311C50E 749A0676 FF0876FF 1077FF26 &.w..v..v..t.é..á.á^.&.G.&.W..F. 000020
 FE7E83FE 46890CC4 8311100A 959A0676 FF0876FF 006A006A 50520004 05105688 .V....RPj.j..v..v.......á..F±.~± 000040
 261277FF 260E5EC4 022CB7FF 26065EC4 006A006A 0060E9FE 46880006 E9037500 .u.Õ...F±Õm.j.j.á^.&.ñ,.á^.&.w.& 000060
 0677FF26 0E5EC408 77FF260A 77FF260E 5EC40C77 FF260E77 FF260E5E C41077FF .w.á^.&.w.&.w.á^.&.w.&.w.á^.&.w. 000080
 76FF021C 87FF2602 1EB7FF26 065EC402 2887FF26 022A87FF 26065EC4 0477FF26 &.w.á^.&.ñ*.&.ñ(.á^.&.ñ..&.ñ...v 0000A0
 00C8CBC9 5F5E1F00 00E90000 880006E9 26C48300 0010989A 006A376A 0A76FF0C ..v.j7j.......á&Õ..|..Õ...^_èùà. 0000C0
 00880257 89260789 260A5EC4 02578826 0788260E 5EC4088E 1128881E 56570000 ..WV.|(..Äá^.&..&.W.á^.&..&.W.|. 0000E0
 C4025788 26078826 0E5EC408 8E125688 1E565700 0000C8CB C95F5E1F 0000E900 .Õ...^_èùà...WV.|V..Äá^.&..&.W.á 000100
 8E128188 1E565700 0000C8CB C95F5E1F 0000E900 00880657 89260447 89260E5E ^.&.G.Ī.W.|..Õ...^_èùà...WV.|... 000120
 C95F5E1F 0000E900 00880257 89260789 260A5EC4 06578826 04478826 0E5EC408 Äá^.&.G.&.W.á^.&..Ī.W.|..Õ...^_è 000140
 89260447 89260E5E C4025788 26078826 0E5EC408 8E12AD88 1E565700 0000C8CB ùà...WV.|Ù..Äá^.&..&.W.á^.&.G.Ī. 000160
 04478826 0E5EC408 8E120988 1E565700 0000C8CB C95F5E1F 0000E900 00880657 W.|..Õ...^_èùà...WV.|1..Äá^.&.G. 000180
 1E565700 0000C8C8 C95F5E1F 0000E900 00880257 89260789 260A5EC4 06578826 &.W.á^.&..Ī.W.|..Õ...^_èùà...WV. 0001A0
 065EC402 156837FF 260277FF 260A5EC4 0477FF26 0677FF26 0E5EC408 8E130588 |...Äá^.&.w.&.w.á^.&.w.&.7h..á^. 0001C0
 6A476A0A 76FF0C76 FF021C87 FF26021E 87FF2606 5EC40228 87FF2602 2AB7FF26 &.ñ*.&.ñ(.á^.&.ñ..&.ñ...v..v.jGj 0001E0

Dump of file SATURN:[PCCOMMON.DUMP.DLL]PDLSYN.TMP;1 on 18-APR-1990 10:48:45.27
File ID (771,27,0)   End of file block 276 / Allocated 276
```

Virtual block number 22 (00000016), 512 (0200) bytes

```
31B81E56 57000000 CBCBC95F 5E1F0000 E90000B8 0006E91A C4830000 12399A00 ..9....á.Õ..¡..Õ...^_èùà...WV.¡1 000000
5E1F0000 E90000B8 02578926 0789260A 5EC40657 8B260447 8B260E5E C4D88E13 ..Äá^.&.G.&.W.á^.&..Ĩ.W.¡..Õ...^ 000020
26078926 0A5EC402 57882607 8B260E5E C4D88E13 8FB81E56 57000000 CBCBC95F _èùà...WV.¡...Äá^.&..&.W.á^.&..& 000040
078B260E 5EC4D88E 13B8B81E 56570000 00CBCBC9 5F5E1F00 00E90000 B8025789 ¯W.¡..Õ...^_èùà...WV.¡£..Äá^.&.. 000060
1E565700 0000CBCB C95F5E1F 0000E900 00B80257 89260789 260A5EC4 02578826 &.W.á^.&..&¯W.¡..Õ...^_èùà...WV. 000080
1F0000E9 0000B802 57892607 89260A5E C4025788 26078826 0E5EC4D8 8E13E688 ¡Ì..Äá^.&..&.W.á^.&..&¯W.¡..Õ... 0000A0
0789260A 5EC40257 8B260788 260E5EC4 D88E1411 B81E5657 000000C8 CBC95F5E ^_èùà...WV.¡...Äá^.&..&.W.á^.&.. 0000C0
8B260E5E C4D88E14 3CB81E56 57000000 CBCBC95F 5E1F0000 E90000B8 02578926 &¯W.¡..Õ...^_èùà...WV.¡<..Äá^.&. 0000E0
57000000 CBCBC95F 5E1F0000 E90000B8 02578926 0789260A 5EC40657 8B260447 G.&.W.á^.&..Ĩ.W.¡..Õ...^_èùà...W 000100
68021CB7 FF26021E B7FF2606 5EC40477 FF260677 FF260E5E C4D88E14 67B81E56 V.¡g..Äá^.&.w.&.w.á^.&.ñ¯.&.ñ..h 000120
1F0000E9 0000B800 06E910C4 8300000E 1D9A006A 37FF2602 77FF260A 5EC427E1 Ä'á^.&.w.&.7j.......á.Õ..¡..Õ... 000140
FF26065E C40477FF 260677FF 260E5EC4 D88E1493 B81E5657 000000C8 CBC95F5E ^_èùà...WV.¡...Äá^.&.w.&.w.á^.&. 000160
E910C483 000014BF 9A006A37 FF260277 FF260A5E C427E168 021CB7FF 26021EB7 ñ¯.&.ñ..hÄ'á^.&.w.&.7j..¢....á.Õ 000180
26078826 0E5EC4D8 8E14DCB8 1E565700 0000CBCB C95F5E1F 0000E900 00B80006 ..¡..Õ...^_èùà...WV.¡É..Äá^.&..& 0001A0
B81E5657 000000C8 CBC95F5E 1F0000E9 0000B802 57892607 89260A5E C4025788 .W.á^.&..&¯W.¡..Õ...^_èùà...WV.¡ 0001C0
1F0000E9 0000B802 57892607 89260A5E C40657B8 260447B8 260E5EC4 D88E1525 %..Äá^.&.G.&.W.á^.&..Ĩ.W.¡..Õ... 0001E0
```

Dump of file SATURN:[PCCOMMON.DUMP.DLL]PDLSYN.TMP;1 on 18-APR-1990 10:48:45.27
File ID (771,27,0)   End of file block 276 / Allocated 276

Virtual block number 23 (00000017), 512 (0200) bytes

```
0789260A 5EC40257 8B260788 260E5EC4 D88E1550 B81E5657 000000C8 CBC95F5E ^_èùà...WV.¡P..Äá^.&..&.W.á^.&.. 000000
8B260E5E C4D88E15 7CB81E56 57000000 CBCBC95F 5E1F0000 E90000B8 02578926 &¯W.¡..Õ...^_èùà...WV.¡|..Äá^.&. 000020
57000000 CBCBC95F 5E1F0000 E90000B8 02578926 0789260A 5EC40657 8B260447 G.&.W.á^.&..Ĩ.W.¡..Õ...^_èùà...W 000040
00E90000 B8025789 26078926 0A5EC402 578B2607 8B260E5E C4D88E15 A7B81E56 V.¡Ĩ..Äá^.&..&.W.á^.&..&¯W.¡..Õ. 000060
260A5EC4 02578826 078B260E 5EC4D88E 1503B81E 56570000 00CBCBC9 5F5E1F00 ..^_èùà...WV.¡Æ..Äá^.&..&.W.á^.& 000080
0E5EC408 8E15FEB8 1E565700 0000CBCB C95F5E1F 0000E900 00B80257 89260789 ..&¯W.¡..Õ...^_èùà...WV.¡±..Äá^. 0000A0
000000C8 CBC95F5E 1F0000E9 0000B802 57892607 89260A5E C4025788 26078826 &..&.W.á^.&..&¯W.¡..Õ...^_èùà... 0000C0
E90000B8 02578926 0789260A 5EC40257 8B260788 260E5EC4 D88E1629 B81E5657 WV.¡)..Äá^.&..&.W.á^.&..&¯W.¡..Õ 0000E0
0A5EC402 57882607 8B260E5E C4D88E16 54B81E56 57000000 CBCBC95F 5E1F0000 ...^_èùà...WV.¡T..Äá^.&..&.W.á^. 000100
5EC4D88E 167FB81E 56570000 00CBCBC9 5F5E1F00 00E90000 B8025789 26078926 &..&¯W.¡..Õ...^_èùà...WV.¡...Äá^ 000120
0000CBCB C95F5E1F 0000E900 00B80257 89260789 260A5EC4 02578826 078B260E .&..&.W.á^.&..&¯W.¡..Õ...^_èùà.. 000140
0000B802 57892607 89260A5E C4025788 26078826 0E5EC408 8E16AA88 1E565700 .WV.¡^..Äá^.&..&.W.á^.&..&¯W.¡.. 000160
5EC40257 8B260788 260E5EC4 D88E16D5 B81E5657 000000C8 CBC95F5E 1F0000E9 Õ...^_èùà...WV.¡Í..Äá^.&..&.W.á^ 000180
C4D88E17 00B81E56 57000000 CBCBC95F 5E1F0000 E90000B8 02578926 0789260A .&..&¯W.¡..Õ...^_èùà...WV.¡...Äá 0001A0
00B80E5E C40C4789 260E4789 260000B8 0E5EC404 47892606 47892600 00B80E5E ^.¡..&.G.&.G.á^.Ĩ..&.G.&.G.á^.¡. 0001C0
47892600 00B80E5E C4144789 26164789 260000B8 0E5EC410 47892612 47892600 .&.G.&.G.á^.¡..&.G.&.G.á^.¡..&.G 0001E0
```

Dump of file SATURN:[PCCOMMON.DUMP.DLL]PDLSYN.TMP;1 on 18-APR-1990 10:48:45.27
File ID (771,27,0)   End of file block 276 / Allocated 276

Virtual block number 24 (00000018), 512 (0200) bytes

```
47892622 47892600 00B80E5E C41C4789 261E4789 260000B8 0E5EC418 4789261A .&.G.á^.¡..&.G.&.G.á^.¡..&.G"&.G 000000
56570000 00CBCBC9 5F5E1F00 00E90000 B8244789 26264789 260000B8 0E5EC420  á^.¡..&.G&&.G$¡..Õ...^_èùà...WV 000020
E908C483 11640000 9A0676FF 0876FF08 77FF260A 77FF260E 5EC4D88E 172BB81E .¡+..Äá^.&.w.&.w..v..v....d..á.Õ 000040
0510568B 0E468B08 8E17B2B8 1E565700 0002CBCB C95F5E1F 0000E900 00B80006 ..¡..Õ...^_èùà...WV.¡ÿ..Ä.F..V.. 000060
FE46890C C48317CA 0A959A06 76FF0876 FF505200 0C051056 8B0E468B 50520008 ..RP.F..V....RP.v..v....ò..á..F± 000080
8B0024E9 03740E47 0B260C47 8B260E5E C400E9E9 FE468B00 06E90375 00FE7E83 .~±.u.Õ...F±ÕÕ.á^.&.G.&.G.t.Õ$.. 0000A0
260C4789 260E5EC4 0BC48318 0803A79A 0676FF08 76FF5052 00080510 5688OE46 F..V....RP.v..v..Ì....á.á^.&.G.& 0000C0
77FF260E 5EC42477 FF262677 FF260E5E C4022CB7 FF26065E C4006A00 6A0E5789 .W.j.j.á^.&.ñ,.á^.&.w&&.w$á^.&.w 0000E0
FF260E5E C41877FF 261A77FF 260E5EC4 1C77FF26 1E77FF26 0E5EC420 77FF2622 "&.w á^.&.w.&.w.á^.&.w.&.w.á^.&. 000100
0C77FF26 0E77FF26 0E5EC410 77FF2612 77FF260E 5EC4006A 006A1477 FF261677 w.&.w.j.j.á^.&.w.&.w.á^.&.w.&.w. 000120
065EC406 77FF2606 5EC40477 FF260E5E C40877FF 260A77FF 260E5EC4 006A006A j.j.á^.&.w.&.w.á^.&.w.á^.&.w.á^. 000140
6A3C6A0A 76FF0C76 FF021CB7 FF26021E B7FF2606 5EC40228 B7FF2602 2AB7FF26 &.ñ*.&.ñ(.á^.&.ñ..&.ñ...v..v.j<j 000160
0000CBCB C95F5E1F 0000E900 00B80006 E9FE468B FE468942 C4830000 13729A00 ..r....áB.F±.F±Õ..¡..Õ...^_èùà.. 000180
47892600 00B80E5E C4044789 26064789 260000B8 0E5EC408 8E17E588 1E565700 .WV.¡Ì..Äá^.¡..&.G.&.G.á^.Ĩ..&.G 0001A0
47892612 47892600 00B80E5E C40C4789 260E4789 260000B8 0E5EC414 47892616 .&.G.á^.¡..&.G.&.G.á^.¡..&.G.&.G 0001C0
0E5EC41C 4789261E 47892600 00B80E5E C4184789 261A4789 260000B8 0E5EC410 .á^.¡..&.G.&.G.á^.¡..&.G.&.G.á^. 0001E0
```

Dump of file SATURN:[PCCOMMON.DUMP.DLL]PDLSYN.TMP;1 on 18-APR-1990 10:48:45.27
File ID (771,27,0)   End of file block 276 / Allocated 276

Virtual block number 25 (00000019), 512 (0200) bytes

```
26000088 0E5EC424 47892626 47892600 00880E5E C4204789 26224789 26000088 |..&.G"&.G á^.|..&.G&&.G$á^.|..& 000000
CBC95F5E 1F0000E9 0000882C 4789262E 47892600 00880E5E C4284789 262A4789 .G*&.G(á^.|..&.G.&.G,|..Õ...^_èù 000020
00009A06 76FF0876 FF0877FF 260A77FF 260E5EC4 D88E1915 881E5657 000000C8 à...WV.|...Äá^.&.w.&.w..v..v.... 000040
C4D88E19 88881E56 57000000 C8CBC95F 5E1F0000 E9000088 0006E908 C4831843 C..á.Õ..|..Õ...^_èùà...WV.||..Äá 000060
01349A06 76FF0876 FF1477FF 261677FF 260E5EC4 006A0C77 FF260E77 FF260E5E ^.&.w.&.w.j.á^.&.w.&.w..v..v..4. 000080
88D88E19 E8881E56 57000002 C8CBC95F 5E1F0000 E9000088 0006E90E C48319D0 Å..á.Õ..|..Õ...^_èùà...WV.|Š..Ä. 0000A0
1A890A95 9A0676FF 0876FF50 52000C05 1056880E 46885052 00080510 56880E46 F..V....RP.F..V....RP.v..v...... 0000C0
0E470826 0C478826 0E5EC401 D0E9FE46 880006E9 037500FE 7E83FE46 890CC483 .á..F±.-±.u.Õ...F±ÕÅ.á^.&.G.&.G. 0000E0
5EC408C4 831A8003 A79A0676 FF0876FF 50520008 05105688 0E468800 58E90374 t.ÕX..F..V....RP.v..v..Ĩ.§..á.á^ 000100
1A77FF26 0E5EC400 24E90374 0E470826 0C478826 0E5EC40E 5789260C 4789260E .&.G.&.W.á^.&.G.&.G.t.Õ$.á^.&.w. 000120
0E5EC40E 5789260C 4789260E 5EC408C4 83180506 929A0676 FF0876FF 1877FF26 &.w..v..v.......á.á^.&.G.&.W.á^. 000140
6A066A00 28E90374 1A470826 18478826 0E5EC400 38E90375 16470826 14478826 &.G.&.G.u.Õ;.á^.&.G.&.G.t.Õ(.j.j 000160
4789260E 5EC40CC4 83183C0D 4D9A0676 FF0876FF 1477FF26 1677FF26 0E5EC400 .á^.&.w.&.w..v..v..M.<..á.á^.&.G 000180
260E77FF 260E5EC4 0024E903 741A4708 26184788 260E5EC4 005AE91A 57892618 .&.W.ÕZ.á^.&.G.&.G.t.Õ$.á^.&.w.& 0001A0
5EC4006A 1A578926 18478926 0E5EC408 C4831862 06AC9A06 76FF0876 FF0C77FF .w..v..v..¯.b..á.á^.&.G.&.W.j.á^ 0001C0
89261447 89260E5E C40AC483 1A100E74 9A0676FF 0876FF18 77FF261A 77FF260E .&.w.&.w..v..v..t....á.á^.&.G.&. 0001E0
```

Dump of file SATURN:[PCCOMMON.DUMP.DLL]PDLSYN.TMP;1 on 18-APR-1990 10:48:45.27
File ID (771,27,0) End of file block 276 / Allocated 276

Virtual block number 26 (0000001A), 512 (0200) bytes

```
2A77FF26 0E5EC42C 77FF262E 77FF260E 5EC4022C 87FF2606 5EC4006A 006A1657 W.j.j.á^.&.ñ,.á^.&.w.&.w,á^.&.w* 000000
77FF260E 5EC42077 FF262277 FF260E5E C42477FF 262677FF 260E5EC4 2877FF26 &.w(á^.&.w&&.w$á^.&.w"&.w á^.&.w 000020
FF260E5E C41077FF 261277FF 260E5EC4 1877FF26 1A77FF26 0E5EC41C 77FF261E .&.w.á^.&.w.&.w.á^.&.w.&.w.á^.&. 000040
260E5EC4 0877FF26 0A77FF26 0E5EC414 77FF2616 77FF260E 5EC40C77 FF260E77 w.&.w.á^.&.w.&.w.á^.&.w.&.w.á^.& 000060
26021E87 FF26065E C4022887 FF26022A 87FF2606 5EC40677 FF26065E C40477FF .w.á^.&.w.á^.&.ñ*.&.ñ(.á^.&.ñ..& 000080
880006E9 FE4688FE 468942C4 83000018 F29A006A 3C6A0A76 FF0C76FF 021C87FF .ñ...v..v.j<j..·....6B.F±.F±Õ..| 0000A0
02578826 0788260E 5EC4D88E 1A2B881E 56570000 00C8CBC9 5F5E1F00 00E90000 ..Õ...^_èùà...WV.|+..Äá^.&..&.W. 0000C0
8E1C4288 1E565700 0000C8CB C95F5E1F 0000E900 00880257 89260789 260A5EC4 á^.&..&.W.|..Õ...^_èùà...WV.|B.. 0000E0
C95F5E1F 0000E900 00880257 89260789 260A5EC4 06578826 04478826 0E5EC4D8 Äá^.&.G.&.W.á^.&..Ĩ.W.|..Õ...^_è 000100
57892607 89260A5E C4025788 26078826 0E5EC4D8 8E1C6088 1E565700 0000C8CB ùà...WV.|m..Äá^.&..&.W.á^.&..&.W 000120
26044788 260E5EC4 D88E1C99 881E5657 000000C8 CBC95F5E 1F0000E9 00008802 .|..Õ...^_èùà...WV.|...Äá^.&.G.& 000140
881E5657 000000C8 CBC95F5E 1F0000E9 00008802 57892607 89260A5E C4065788 .W.á^.&..Ĩ.W.|..Õ...^_èùà...WV.| 000160
260A77FF 260E5EC4 02578926 0789260A 5EC40257 88260788 260E5EC4 D88E1CC4 á..Äá^.&..&.W.á^.&..&.W.á^.&.w.& 000180
9A006A37 FF260277 FF260E5E C427E168 021C87FF 26021E87 FF26065E C40877FF .w.á^.&.ñ..&.ñ..hÄ'á^.&.w.&.7j.. 0001A0
8E1CF088 1E565700 0000C8CB C95F5E1F 0000E900 00880006 E910C483 00001508 .....á.Õ..|..Õ...^_èùà...WV.|Þ.. 0001C0
CBC95F5E 1F0000E9 00008802 57892607 89260A5E C4025788 26078826 0E5EC4D8 Äá^.&..&.W.á^.&..&.W.|..Õ...^_èù 0001E0
```

Dump of file SATURN:[PCCOMMON.DUMP.DLL]PDLSYN.TMP;1 on 18-APR-1990 10:48:45.27
File ID (771,27,0) End of file block 276 / Allocated 276

Virtual block number 27 (0000001B), 512 (0200) bytes

```
0000E900 00880C47 89260E47 89260000 880E5EC4 D88E104D 881E5657 000000C8 à...WV.|M..Äá^.|..&.G.&.G.|..Õ.. 000000
260A77FF 260E5EC4 0C77FF26 0E5EC408 8E1078B8 1E565700 0000C8CB C95F5E1F .^_èùà...WV.|x..Äá^.&.w.á^.&.w.& 000020
0E468802 1C87FF26 021E87FF 26065EC4 022887FF 26022A87 FF26065E C40877FF .w.á^.&.ñ*.&.ñ(.á^.&.ñ..&.ñ...F. 000040
5F5E1F00 00E90000 880006E9 16C48300 001C1F9A 006A306A 50520010 05105688 .V....RPj=j.......á.Õ..|..Õ...^_ 000060
26078926 0A5EC412 57882610 4788260E 5EC4D88E 1D90881E 56570000 00C8CBC9 èùà...WV.|....Äá^.&.G.&.W.á^.&..Ĩ 000080
07C7260A 5EC4D88E 1DFA881E 56570000 00C8CBC9 5F5E1F00 00E90000 88025789 .W.|..Õ...^_èùà...WV.|ª..Äá^.&ú. 0000A0
C4D88E1E 26881E56 57000000 C8CBC95F 5E1F0000 E9000088 00000247 C7260210 ..&úG...|..Õ...^_èùà...WV.|&..Äá 0000C0
881E5657 000006C8 CBC95F5E 1F0000E9 00008808 4789260A 47892600 00880E5E ^.|..&.G.&.G.|..Õ...^_èùà...WV.| 0000E0
0877FF26 0E5EC40E 5789260C 4789260E 5EC40257 88260788 260A5EC4 D88E1E48 K..Äá^.&..&.W.á^.&.G.Ĩ.W.á^.&.w. 000100
021E87FF 26065EC4 022887FF 26022A87 FF26065E C40477FF 260677FF 260E5EC4 á^.&.w.&.w.á^.&.ñ*.&.ñ(.á^.&.ñ.. 000120
E9037500 FA7E83FA 468916C4 8300001D DD9A006A 3D6A5016 FC468D02 1C87FF26 &.ñ...F=.Pj=j..Ĩ....á..Fª.-ª.u.Õ 000140
5EC427E1 68021C87 FF26021E 87FF2606 5EC4FC76 FFFE76FF 0033E9FA 46880006 ...FªÕ3..v±.v=á^.&.ñ..&.ñ..hÄ'á^ 000160
CBC95F5E 1F0000E9 00008800 06E910C4 8300001D 309A006A 37FF2602 77FF260A .&.w.&.7j..0....á.Õ..|..Õ...^_èù 000180
57892607 89260A5E C40E5788 260C4788 260E5EC4 D88E1E70 881E5657 000000C8 à...WV.|p..Äá^.&.G.&.W.á^.&..Ĩ.W 0001A0
88260788 260E5EC4 D88E1F18 881E5657 000000C8 CBC95F5E 1F0000E9 00008802 .|..Õ...^_èùà...WV.|...Äá^.&..&. 0001C0
44881E56 57000000 C8CBC95F 5E1F0000 E9000088 02578926 0789260A 5EC40257 W.á^.&..&.W.|..Õ...^_èùà...WV.|D 0001E0
```

Dump of file SATURN:[PCCOMMON.DUMP.DLL]PDLSYN.TMP;1 on 18-APR-1990 10:48:45.27
File ID (771,27,0) End of file block 276 / Allocated 276

```
Virtual block number 28 (0000001C), 512 (0200) bytes

000000C8 CBC95F5E 1F0000E9 0000B80C 4789260E 47892600 00B80E5E C4D88E1F ..Äá^.|..&.G.&.G.|..Õ...^_èùà... 000000
5EC40877 FF260A77 FF260E5E C40C77FF 260E77FF 260E5EC4 D88E1F6F B81E5657 WV.|o..Äá^.&.w.&.w.á^.&.w.&.w.á^ 000020
3E6A0A76 FF0C76FF 021CB7FF 26021EB7 FF26065E C40228B7 FF26022A B7FF2606 .&.ñ*.&.ñ(.á^.&.ñ..&.ñ...v..v.j> 000040
B81E5657 000000C8 CBC95F5E 1F0000E9 0000B800 06E918C4 8300001E BF9A006A j..¢....á.Õ..|..Õ...^_èùà...WV.| 000060
5E1F0000 E90000B8 02578926 0789260A 5EC40257 8B26078B 260E5EC4 D88E1F94 ...Äá^.&..&.W.á^.&..&.W.|..Õ...^ 000080
0789260A 5EC40657 8B260447 8B260E5E C4D88E1F F0B81E56 57000000 C8CBC95F _èùà...WV.|Þ..Äá^.&.G.&.W.á^.&.. 0000A0
8B260E5E C4D88E20 1BB81E56 57000000 C8CBC95F 5E1F0000 E90000B8 02578926 &.W.|..Õ...^_èùà...WV.|. .Äá^.&. 0000C0
56570000 00C8CBC9 5F5E1F00 00E90000 B8025789 26078926 0A5EC402 578B2607 .&.W.á^.&..&.W.|..Õ...^_èùà...WV 0000E0
00E90000 B8025789 26078926 0A5EC406 578B2604 478B260E 5EC4D88E 2047B81E .|G .Äá^.&.G.&.W.á^.&..&.W.|..Õ. 000100
260A5EC4 02578B26 078B260E 5EC4D88E 2072B81E 56570000 00C8CBC9 5F5E1F00 ..^_èùà...WV.|r .Äá^.&..&.W.á^.& 000120
0E5EC4D8 8E209EB8 1E565700 0000C8CB C95F5E1F 0000E900 00B80257 89260789 ..&.W.|..Õ...^_èùà...WV.|. .Äá^. 000140
0000C8CB C95F5E1F 0000E900 00B80257 89260789 260A5EC4 06578B26 04478B26 &.G.&.W.á^.&..&.W.|..Õ...^_èùà.. 000160
00B80657 89260447 89260E5E C402578B 26078B26 0E5EC4D8 8E20C9B8 1E565700 .WV.|è .Äá^.&..&.W.á^.&.G.&.W.|. 000180
06578B26 04478B26 0E5EC4D8 8E20F5B8 1E565700 0000C8CB C95F5E1F 0000E900 .Õ...^_èùà...WV.|% .Äá^.&.G.&.W. 0001A0
8E2121B8 1E565700 0000C8CB C95F5E1F 0000E900 00B80257 89260789 260A5EC4 á^.&..&.W.|..Õ...^_èùà...WV.|!!. 0001C0
77FF2606 77FF260E 5EC40A57 89260847 89260E5E C402578B 26078B26 0A5EC4D8 Äá^.&..&.W.á^.&.G.&.W.á^.&.w.&.w 0001E0

Dump of file SATURN:[PCCOMMON.DUMP.DLL]PDLSYN.TMP;1 on 18-APR-1990 10:48:45.27
File ID (771,27,0)   End of file block 276 / Allocated 276

Virtual block number 29 (0000001D), 512 (0200) bytes

1EFB9A00 6A37FF26 0277FF26 0A5EC427 E168021C B7FF2602 1EB7FF26 065EC404 .á^.&.ñ..&.ñ..hÄ'á^.&.w.&.7j..«. 000000
C4D88E21 4DB81E56 57000000 C8CBC95F 5E1F0000 E90000B8 0006E910 C4830000 ...á.Õ..|..Õ...^_èùà...WV.|M!.Äá 000020
C8CBC95F 5E1F0000 E90000B8 02578926 0789260A 5EC40A57 8B260847 8B260E5E ^.&.G.&.W.á^.&..&.W.|..Õ...^_èùà 000040
B8025789 26078926 0A5EC402 578B2607 8B260E5E C4D88E21 ABB81E56 57000000 ...WV.|¨!.Äá^.&..&.W.á^.&..&.W.| 000060
02578B26 078B260E 5EC4D88E 21D7B81E 56570000 00C8CBC9 5F5E1F00 00E90000 ..Õ...^_èùà...WV.|×!.Äá^.&..&.W. 000080
2202B81E 56570000 00C8CBC9 5F5E1F00 00E90000 B8065789 26044789 260E5EC4 á^.&.G.&.W.|..Õ...^_èùà...WV.|." 0000A0
5F5E1F00 00E90000 B8025789 26078926 0A5EC406 578B2604 478B260E 5EC4D88E .Äá^.&.G.&.W.á^.&..&.W.|..Õ...^ 0000C0
26084789 260E5EC4 02578B26 078B260A 5EC4D88E 222EB81E 56570000 00C8CBC9 èùà...WV.|.".Äá^.&..&.W.á^.&.G.& 0000E0
5EC427E1 68021CB7 FF26021E B7FF2606 5EC40477 FF260677 FF260E5E C40A5789 .W.á^.&.w.&.w.á^.&.ñ..&.ñ..hÄ'á^ 000100
CBC95F5E 1F0000E9 0000B800 06E910C4 83000021 8E9A006A 37FF2602 77FF260A .&.w.&.7j...!...á.Õ..|..Õ...^_èù 000120
57892607 89260A5E C40A5788 26084788 260E5EC4 D88E225A B81E5657 000000C8 à...WV.|Z".Äá^.&.G.&.W.á^.&..&.W 000140
000107C7 260A5EC4 D88E2288 B81E5657 000000C8 CBC95F5E 1F0000E9 0000B802 .|..Õ...^_èùà...WV.||".Äá^.&ú... 000160
0E5EC4D8 8E22E4B8 1E565700 0000C8CB C95F5E1F 0000E900 00B80000 0247C726 &úG...|..Õ...^_èùà...WV.|ä".Äá^. 000180
26000088 0E5EC408 4789260A 47892600 00B80E5E C4104789 26124789 260000B8 |..&.G.&.G.á^.|..&.G.&.G.á^.|..& 0001A0
5EC4D88E 2309B81E 56570000 00C8CBC9 5F5E1F00 00E90000 B80C4789 260E4789 .G.&.G.|..Õ...^_èùà...WV.|.#.Äá^ 0001C0
4E01349A 0676FF08 76FF0877 FF260A77 FF260E5E C4016A04 77FF2606 77FF260E .&.w.&.w.j.á^.&.w.&.w..v..v..4.N 0001E0

Dump of file SATURN:[PCCOMMON.DUMP.DLL]PDLSYN.TMP;1 on 18-APR-1990 10:48:45.27
File ID (771,27,0)   End of file block 276 / Allocated 276

Virtual block number 30 (0000001E), 512 (0200) bytes

5EC4D88E 234AB81E 56570000 02C8CBC9 5F5E1F00 00E90000 B80006E9 0EC4831A ..á.Õ..|..Õ...^_èùà...WV.|J#.Äá^ 000000
066A0028 E903740E 470B260C 478B260E 5EC4003B E903750A 470B2608 478B260E .&.G.&.G.u.Õ;.á^.&.G.&.G.t.Õ(.j. 000020
89260E5E C40CC483 23FD004D 9A0676FF 0876FF08 77FF260A 77FF260E 5EC4016A j.á^.&.w.&.w..v..v..M.»#.á.á^.&. 000040
0677FF26 0E5EC400 24E90374 0E470B26 0C478B26 0E5EC400 5AE90E57 89260C47 G.&.W.ÕZ.á^.&.G.&.G.t.Õ$.á^.&.w. 000060
C4016A0E 5789260C 4789260E 5EC408C4 83242306 AC9A0676 FF0876FF 0477FF26 &.w..v..v..¯.#$.á.á^.&.G.&.W.j.á 000080
26084789 260E5EC4 0AC48324 480E749A 0676FF08 76FF0C77 FF260E77 FF260E5E ^.&.w.&.w..v..v..t.K$.á.á^.&.G.& 0000A0
0CC48323 6F0A959A 0676FF08 76FF5052 00040510 56880E46 88006A00 6A0A5789 .W.j.j..F..V....RP.v..v....o#.á. 0000C0
5EC4022C B7FF2606 5EC4006A 006A006D E9FE468B 0006E903 7500FE7E 83FE4689 .F±.~±.u.Õ...F±Õm.].j.á^.&.ñ,.á^ 0000E0
C40877FF 260A77FF 260E5EC4 0C77FF26 0E77FF26 0E5EC410 77FF2612 77FF260E .&.w.&.w.á^.&.w.&.w.á^.&.w.&.w.á 000100
26021EB7 FF26065E C40228B7 FF26022A B7FF2606 5EC40477 FF260677 FF260E5E ^.&.w.&.w.á^.&.ñ*.&.ñ(.á^.&.ñ..& 000120
1F0000E9 0000B800 06E926C4 8300001F D39A006A 3A6A0A76 FF0C76FF 021CB7FF .ñ...v..v.j:j..&....á&Õ..|..Õ... 000140
00B80847 89260A47 89260000 B80E5EC4 D88E238A B81E5657 000000C8 CBC95F5E ^_èùà...WV.|.#.Äá^.|..&.G.&.G.|. 000160
05105688 0E468800 6A006AD8 8E240CB8 1E565700 0002C8CB C95F5E1F 0000E900 .Õ...^_èùà...WV.|$$.Äj.j..¢..V.. 000180
46880006 E9037500 FE7E83FE 46890CC4 8323C60A 959A0676 FF0876FF 50520004 ..RP.v..v....á#.á..F±.~±.u ˜...F 0001A0
6A006A00 6A0877FF 260A77FF 260E5EC4 022CB7FF 26065EC4 006A006A 005FE9FE ±Õ_.j.j.á^.&.ñ,.á^.&.w.&.w..  i.j 0001C0
FF26065E C40228B7 FF26022A B7FF2606 5EC40477 FF260677 FF260E5E C4006A00 .j.á^.&.w.&.w.á^.&.ñ*.&.ñ(.á^.&. 0001E0

Dump of file SATURN:[PCCOMMON.DUMP.DLL]PDLSYN.TMP;1 on 18-APR-1990 10:48:45.27
File ID (771,27,0)   End of file block 276 / Allocated 276
```

```
Virtual block number 31 (0000001F), 512 (0200) bytes

 00008800 06E926C4 83000024 BF9A006A 3A6A0A76 FF0C76FF 021CB7FF 26021EB7 ñ..&.ñ...v..v.j:j..¢$...6&Õ..¡.. 000000
 89261647 89260000 B80E5EC4 D88E2501 B81E5657 000000C8 CBC95F5E 1F0000E9 Õ...^_èùà...WV.¡.%.Ä6^.¡..&.G.&. 000020
 5EC41047 89261247 89260000 B80E5EC4 08478926 0A478926 0000B80E 5EC41447 G.6^.¯|..&.G.&.G.6^.¡..&.G.&.G.6^ 000040
 A0881E56 57000000 C8CBC95F 5E1F0000 E90000B8 0C478926 0E478926 0000B80E .¡..&.G.&.G.¡..Õ...^_èùà...WV.¡. 000060
 76FF0876 FF0C77FF 260E77FF 260E5EC4 016A0477 FF260677 FF260E5E C4D88E25 %.Ä6^.&.w.&.w.j.6^.&¯w.&.w..v..v 000080
 EF881E56 57000002 C8CBC95F 5E1F0000 E90000B8 0006E90E C483251D 01349A06 ..4..%.6.Õ..¡..Õ...^_èùà...WV.¡ÿ 0000A0
 03741247 08261047 88260E5E C4003BE9 03750E47 08260C47 88260E5E C4D88E25 %.Ä6^.&.G.&.G.u.Õ;.6^.&.G.&.G.t. 0000C0
 0CC48326 A200409A 0676FF08 76FF0C77 FF260E77 FF260E5E C4016A06 6A0028E9 Õ(.j.j.6^.&.w.&.w..v..v..M.Ä&.6. 0000E0
 5EC40024 E9037412 47082610 4788260E 5EC4005A E9125789 26104789 260E5EC4 6^.&.G.&.W.ÕZ.6^.&.G.&.G.t.Õ$.6^ 000100
 89261047 89260E5E C408C483 26C806AC 9A0676FF 0876FF04 77FF2606 77FF260E .&.w.&.w..v..v..¯.à&.6.6^.&.G.&. 000120
 0E5EC40A C48326F7 0E749A06 76FF0876 FF1077FF 261277FF 260E5EC4 016A1257 W.j.6^.&.w.&.w..v..v..t.%&.6.6^. 000140
 76FF5052 00040510 56880E46 88505200 08051056 880E4688 0E578926 0C478926 &.G.&.W..F..V....RP.F..V....RP.v 000160
 006A0078 E9FE4688 0006E903 7500FE7E 83FE4689 0CC48326 140A959A 0676FF08 ..v.....&.6..F±.~±.u.Õ...F±Õx.j. 000180
 1077FF26 1277FF26 0E5EC414 77FF2616 77FF260E 5EC4022C 87FF2606 5EC4006A j.6^.&.ñ,.6^.&.w.&.w.6^.&.w.&.w. 0001A0
 77FF2606 77FF260E 5EC40877 FF260A77 FF260E5E C40C77FF 260E77FF 260E5EC4 6^.&.w.&.w.6^.&.w.&.w.6^.&.w.&.w 0001C0
 76FF0C76 FF021CB7 FF26021E B7FF2606 5EC40228 B7FF2602 2AB7FF26 065EC404 .6^.&.ñ*.&.ñ(.6^.&.ñ..&.ñ...v..v 0001E0

Dump of file SATURN:[PCCOMMON.DUMP.DLL]PDLSYN.TMP;1 on 18-APR-1990 10:48:45.27
File ID (771,27,0)   End of file block 276 / Allocated 276

Virtual block number 32 (00000020), 512 (0200) bytes

 57000000 C8CBC95F 5E1F0000 E90000B8 0006E92A C4830000 25839A00 6A3B6A0A .j;j...%...6*Õ..¡..Õ...^_èùà...W 000000
 260A4789 260000B8 0E5EC40C 4789260E 47892600 00B80E5E C4D88E26 2FB81E56 V.¡/&.Ä6^.¡..&.G.&.G.6^.¯|..&.G.& 000020
 105688OE 4688D88E 2793B81E 56570000 02C8CBC9 5F5E1F00 00E90000 B8084789 .G.¡..Õ...^_èùà...WV.¡.'.Ä.F..V. 000040
 46890CC4 8326680A 959A0676 FF0876FF 50520004 0510568B 0E468B50 52000805 ...RP.F..V.¯...RP.v..v....k&.6..F 000060
 260E5EC4 022CB7FF 26065EC4 006A006A 006AE9FE 46880006 E9037500 FE7E83FE ±.~±.u.Õ...F±Õj.j.j.6^.&.ñ,.6^.& 000080
 77FF260E 5EC40877 FF260A77 FF260E5E C4006A00 6A006A00 6A0C77FF 260E77FF .w.&.w.j.j.j.j.6^.&.w.&.w.6^.&.w 0000A0
 FF021CB7 FF26021E B7FF2606 5EC40228 B7FF2602 2AB7FF26 065EC404 77FF2606 .&.w.6^.&.ñ*.&.ñ(.6^.&.ñ..&.ñ... 0000C0
 C8CBC95F 5E1F0000 E90000B8 0006E92A C4830000 27769A00 6A3B6A0A 76FF0C76 v..v.j;j..v'...6*Õ..¡..Õ...`_'ùà 0000E0
 88025789 26078926 0A5EC402 57882607 88260E5E C4D88E27 C6881E56 57000000 ...WV.¡6'.Ä6^.&..&.W.6^.&..&¯W.¡ 000100
 77FF260E 77FF260E 5EC4D88E 2877B81E 56570000 00C8CBC9 5F5E1F00 00E90000 ..Õ...^_èùà...WV.¡w(.Ä6^.&.w.&.w 000120
 26065EC4 02288 7FF 26022AB7 FF26065E C4022768 0477FF26 0677FF26 0E5EC40C .6^.&.w¯&.w.h'.6^.&.ñ*.&.ñ(.6^.& 000140
 1AC48300 00285A9A 006A476A 50520010 0510568B 0E468B02 1CB7FF26 021EB7FF .ñ..&.ñ...F..V....RPjGj..Z(...6. 000160
 4788260E 5EC4D88E 28A2B81E 56570000 00C8CBC9 5F5E1F00 00E90000 B80006E9 Õ..¡..Õ...^_èùà...WV.¡Å(.Ä6^.&.G 000180
 56570000 06C8CBC9 5F5E1F00 00E90000 88025789 26078926 0A5EC412 57882610 .&.W.6^.&..Ĩ.W.¡..Õ...^_èùà...WV 0001A0
 FF260E5E C4125789 26104789 260E5EC4 02578826 0788260A 5EC4D88E 2906881E .¡.).Ä6^.&..&.W.6^.&.G.Ĩ.W.6^.&. 0001C0
 2887FF26 022AB7FF 26065EC4 02276804 77FF2606 77FF260E 5EC40C77 FF260E77 w.&.w.6^.&.w.&.w.h'.6^.&.ñ*.&.ñ( 0001E0

Dump of file SATURN:[PCCOMMON.DUMP.DLL]PDLSYN.TMP;1 on 18-APR-1990 10:48:45.27
File ID (771,27,0)   End of file block 276 / Allocated 276

Virtual block number 33 (00000021), 512 (0200) bytes

 891AC483 000028E9 9A006A47 6A5016FC 4680021C 87FF2602 1E87FF26 065EC402 .6^.&.ñ..&.ñ...F=.PjGj..Õ(...6.. 000000
 26021E87 FF26065E C4FC76FF FE76FF00 33E9FA46 880006E9 037500FA 7E83FA46 F*.~*.u.Õ...F*Õ3..v±.v=6^.&.ñ..& 000020
 00880006 E910C483 00002298 9A006A37 FF260277 FF260A5E C427E168 021CB7FF .ñ..hÄ'6^.&.w.&.7j..."...6.Õ..¡. 000040
 12578826 10478826 0E5EC408 8E2932B8 1E565700 0000C8CB C95F5E1F 0000E900 .Õ...^_èùà...WV.¡2).Ä6^.&.G.&.W. 000060
 8E29E188 1E565700 0000C8CB C95F5E1F 0000E900 00880257 89260789 260A5EC4 6^.&..Ĩ.W.¡..Õ...^_èùà...WV.¡Å). 000080
 0E5EC40C 4789260E 47892600 00880E5E C4084789 260A4789 260000B8 0E5EC4D8 Ä6^.¡..&.G.&.G.6^.¯|..&.G.&.G.6^. 0000A0
 1F0000E9 00008810 47892612 47892600 00880E5E C4144789 26164789 260000B8 ¡..&.G.&.G.6^.¡..&.G.&.G.¡..Õ... 0000C0
 0E5EC401 6A0477FF 260677FF 260E5EC4 D88E2A00 881E5657 000000C8 CBC95F5E ^_èùà...WV.¡.*.Ä6^.&.w.&.w.j.6^. 0000E0
 1F0000E9 00008800 06E90EC4 8327E901 349A0676 FF0876FF 1077FF26 1277FF26 &¯w.&.w..v..v..4.Õ'.6.Õ..¡..Õ... 000100
 0038E903 75124708 26104788 260E5EC4 D88E2A5C 881E5657 000002C8 CBC95F5E ^_èùà...WV.¡\*.Ä6^.&.G.&.G.u.Õ;. 000120
 FF1077FF 261277FF 260E5EC4 016A066A 0028E903 74164708 26144788 260E5EC4 6^.&.G.&.G.t.Õ(.j.j.6^.&.w.&.w.. 000140
 88260E5E C4005AE9 16578926 14478926 0E5EC40C C483280F 0D409A06 76FF0876 v..v..M..+.6.6^.&.G.&.W.ÕZ.6^.&. 000160
 3506AC9A 0676FF08 76FF0477 FF260677 FF260E5E C40024E9 03741647 08261447 G.&.G.t.Õ$.6^.&.w.&.w..v..v..¯.5 000180
 FF0876FF 1477FF26 1677FF26 0E5EC401 6A165789 26144789 260E5EC4 08C4832B +.6.6^.&.G.&.W.j.6^.&.w.&.w..v.. 0001A0
 50520008 0510568B 0E468B12 57892610 4789260E 5EC40AC4 832B640E 749A0676 v..t.d+.6.6^.&.G.&.W..F..V....RP 0001C0
 00FE7E83 FE46890C C4832A81 0A959A06 76FF0876 FF505200 04051056 880E4688 .F..V....RP.v..v.....*.6..F±.~±. 0001E0

Dump of file SATURN:[PCCOMMON.DUMP.DLL]PDLSYN.TMP;1 on 18-APR-1990 10:48:45.27
File ID (771,27,0)   End of file block 276 / Allocated 276
```

```
Virtual block number 34 (00000022), 512 (0200) bytes

FF261677 FF260E5E C4022CB7 FF26065E C4006A00 6A0078E9 FE468B00 06E90375 u.Õ...F±Õx.j.j.á^.&.ñ,.á^.&.w.&. 000000
260A77FF 260E5EC4 0C77FF26 0E77FF26 0E5EC410 77FF2612 77FF260E 5EC41477 w.á^.&.w.&.w.á^.&.w.&.w.á^.&.w.& 000020
FF26065E C40228B7 FF26022A B7FF2606 5EC40477 FF260677 FF260E5E C40877FF .w.á^.&.w.&.w.á^.&.ñ*.&.ñ(.á^.&. 000040
0000B800 06E92AC4 83000029 889A006A 396A0A76 FF0C76FF 021CB7FF 26021EB7 ñ..&.ñ...v..v.j9j...)...á*Õ..|.. 000060
89260A47 89260000 880E5EC4 D88E2A9C 881E5657 000000C8 CBC95F5E 1F0000E9 Õ...^_èùà...WV.|.*.Äá^.|..&.G.&. 000080
57000002 C8CBC95F 5E1F0000 E9000088 0C478926 0E478926 0000B80E 5EC40847 G.á^.Ï..&.G.&.G.|..Õ...^_èùà...W 0000A0
0876FF50 52000405 1056880E 46885052 00080510 56880E46 88D88E2C 00881E56 V.|.,.Ä.F..V....RP.F..V....RP.v. 0000C0
6A006A00 6AE9FE46 880006E9 037500FE 7E83FE46 890CC483 2AD80A95 9A0676FF .v....Ä*.á..F±.~±.u.Õ...F±Õj.j.j 0000E0
260E5EC4 0C77FF26 0E77FF26 0E5EC400 6A006A00 6A006A02 2CB7FF26 065EC400 .á^.&.ñ,.j.j.j.j.á^.&.w.&.w.á^.& 000100
C40228B7 FF26022A B7FF2606 5EC40477 FF260677 FF260E5E C40877FF 260A77FF .w.&.w.á^.&.w.&.w.á^.&.ñ*.&.ñ(.á 000120
06E92AC4 8300002B E39A006A 396A0A76 FF0C76FF 021CB7FF 26021EB7 FF26065E ^.&.ñ..&.ñ...v..v.j9j..D+...á*Õ. 000140
8B26078B 260E5EC4 D88E2C33 881E5657 000000C8 CBC95F5E 1F0000E9 0000B800 .|..Õ...^_èùà...WV.|3,.Äá^.&..&. 000160
E4881E56 57000000 C8CBC95F 5E1F0000 E9000088 02578926 0789260A 5EC40257 W.á^.&..&.W.|..Õ...^_èùà...WV.|Õ 000180
5F5E1F00 00E90000 88025789 26078926 0A5EC402 578B2607 8B260E5E C4D88E2C ,.Äá^.&..&.W.á^.&..&.W.|..Õ...^_ 0001A0
89260789 260A5EC4 0257B826 078B260E 5EC4D88E 2D0F881E 56570000 00C8CBC9 èùà...WV.|.-.Äá^.&..&.W.á^.&..&. 0001C0
04478B26 0E5EC408 8E2D3A88 1E565700 0000C8CB C95F5E1F 0000E900 00880257 W.|..Õ...^_èùà...WV.|:-.Äá  &.G. 0001E0

Dump of file SATURN:[PCCOMMON.DUMP.DLL]PDLSYN.TMP;1 on 18-APR-1990 10:48:45.27
File ID (771,27,0)   End of file block 276 / Allocated 276

Virtual block number 35 (00000023), 512 (0200) bytes

1E565700 0000C8CB C95F5E1F 0000E900 00880257 89260789 260A5EC4 06578B26 &.W.á^.&..&.W.|..Õ...^_èùà...WV. 000000
1F0000E9 0000B802 57892607 89260A5E C402578B 26078B26 0E5EC4D8 8E2D658B |e-.Äá^.&..&.W.á^.&..&.W.|..Õ... 000020
89260A5E C406578B 2604478B 260E5EC4 D88E2D91 881E5657 000000C8 CBC95F5E ^_èùà...WV.|.-.Äá^.&.G.&.W.á^.&. 000040
260E5EC4 D88E2DBC 881E5657 000000C8 CBC95F5E 1F0000E9 0000B802 57892607 .Ï.W.|..Õ...^_èùà...WV.|¥-.Äá^.& 000060
57000000 C8CBC95F 5E1F0000 E9000088 02578926 0789260A 5EC40257 8B26078B ..&.W.á^.&..&.W.|..Õ...^_èùà...W 000080
00E90000 88025789 26078926 0A5EC402 578B2607 8B260E5E C4D88E2D E8881E56 V.|Õ-.Äá^.&..&.W.á^.&..&.W.|..Õ. 0000A0
0C478926 0E478926 0000B80E 5EC4D88E 2E13881E 56570000 00C8CBC9 5F5E1F00 ..^_èùà...WV.|...Äá^.|..&.G.&.G. 0000C0
FF260E77 FF260E5E C4D88E2E 3E881E56 57000000 C8CBC95F 5E1F0000 E9000088 |..Õ...^_èùà...WV.|>..Äá^.&.w.&. 0000E0
FF26021E B7FF2606 5EC40228 B7FF2602 2AB7FF26 065EC404 77FF260E 5EC40C77 w.á^.&.w.á^.&.ñ*.&.ñ(.á^.&.ñ..&. 000100
5E1F0000 E9000088 0006E916 C4830000 2CC79A00 6A4B6A0A 76FF0C76 FF021CB7 ñ...v..v.jKj..ú,...á.Õ..|..Õ...^ 000120
0000B800 000247C7 26029A07 C7260A5E C4D88E2E 63881E56 57000000 C8CBC95F _èùà...WV.|c..Äá^.&ú...&úG...|.. 000140
0247C726 029B07C7 260A5EC4 D88E2E8B 881E5657 000000C8 CBC95F5E 1F0000E9 Õ...^_èùà...WV.|£..Äá^.&ú...&úG. 000160
9C07C726 0A5EC4D8 8E2EE088 1E565700 0000C8CB C95F5E1F 0000E900 00880000 ..|..Õ...^_èùà...WV.|Á..Äá^.&ú.. 000180
5EC4D88E 2F05881E 56570000 00C8CBC9 5F5E1F00 00E90000 88000002 47C72602 .&úG...|..Õ...^_èùà...WV.|./.Äá^ 0001A0
2A881E56 57000000 C8CBC95F 5E1F0000 E9000088 00000247 C7260290 07C7260A .&ú...&úG...|..Õ...^_èùà...WV.|* 0001C0
000000C8 CBC95F5E 1F0000E9 0000B800 000247C7 26029E07 C7260A5E C4D88E2F /.Äá^.&ú...&úG...|..Õ...^_èùà... 0001E0

Dump of file SATURN:[PCCOMMON.DUMP.DLL]PDLSYN.TMP;1 on 18-APR-1990 10:48:45.27
File ID (771,27,0)   End of file block 276 / Allocated 276

Virtual block number 36 (00000024), 512 (0200) bytes

C95F5E1F 0000E900 00880000 0247C726 029F07C7 260A5EC4 D88E2F4F 881E5657 WV.|O/.Äá^.&ú...&úG...|..Õ...^_è 000000
00E90000 88000002 47C72602 A007C726 0A5EC4D8 8E2F7488 1E565700 0000C8CB ùà...WV.|t/.Äá^.&ú...&úG...|..Õ. 000020
00000247 C72602A1 07C7260A 5EC4D88E 2F99881E 56570000 00C8CBC9 5F5E1F00 ..^_èùà...WV.|./.Äá^.&ú.Á.&úG... 000040
2602A607 C7260A5E C4D88E2F BE881E56 57000000 C8CBC95F 5E1F0000 E9000088 |..Õ...^_èùà...WV.|//.Äá^.&ú.Ï.& 000060
260A5EC4 D88E2FE3 881E5657 000000C8 CBC95F5E 1F0000E9 0000B800 000247C7 úG...|..Õ...^_èùà...WV.|D/.Äá^.& 000080
8E300888 1E565700 0000C8CB C95F5E1F 0000E900 00880000 0247C726 02A307C7 ú.È.&úG...|..Õ...^_èùà...WV.|.0. 0000A0
56570000 00C8CBC9 5F5E1F00 00E90000 88000002 47C72602 A407C726 0A5EC4D8 Äá^.&ú.È.&úG...|..Õ...^_èùà...WV 0000C0
C8CBC95F 5E1F0000 E9000088 00000247 C72601F4 07C7260A 5EC4D88E 302D881E .|-0.Äá^.&ú.¶.&úG...|..Õ...^_èùà 0000E0
1F0000E9 0000B800 000247C7 26026207 C7260A5E C4D88E30 52881E56 57000000 ...WV.|R0.Äá^.&ú.b.&úG...|..Õ... 000100
89260A5E C406578B 2604478B 260E5EC4 D88E3077 881E5657 000000C8 CBC95F5E ^_èùà...WV.|w0.Äá^.&.G.&.W.á^.&. 000120
260E5EC4 D88E309C 881E5657 000000C8 CBC95F5E 1F0000E9 0000B802 57892607 .Ï.W.|..Õ...^_èùà...WV.|.0.Äá^.& 000140
000000C8 CBC95F5E 1F0000E9 0000B802 57892607 89260A5E C406578B 2604478B .G.&.W.á^.&..Ï.W.|..Õ...^_èùà... 000160
C95F5E1F 0000E900 00880000 0247C726 02A207C7 260A5EC4 D88E30C8 881E5657 WV.|à0.Äá^.&ú.Á.&úG...|..Õ...^_è 000180
89260789 260A5EC4 06578B26 04478B26 0E5EC4D8 8E30F488 1E565700 0000C8CB ùà...WV.|¶0.Äá^.&.G.&.W.á^.&..Ï. 0001A0
0A07C726 0A5EC4D8 8E3119B8 1E565700 0000C8CB C95F5E1F 0000E900 00880257 W.|..Õ...^_èùà...WV.|.1.Äá^.&ú.. 0001C0
5EC4D88E 3145881E 56570000 00C8CBC9 5F5E1F00 00E90000 88000002 47C72602 .&úG...|..Õ...^_èùà...WV.|E1.Äá^ 0001E0

Dump of file SATURN:[PCCOMMON.DUMP.DLL]POLSYN.TMP;1 on 18-APR-1990 10:48:45.27
File ID (771,27,0)   End of file block 276 / Allocated 276
```

Virtual block number 37 (00000025), 512 (0200) bytes

```
B81E5657 000000C8 CBC95F5E 1F0000E9 00008800 000647C7 26022004 47C7260E .&úG. .&úG...|..Õ...^_èùà...WV.| 000000
1F0000E9 00008802 57892607 89260A5E C40657B8 2604478B 260E5EC4 D88E316A j1.Äá^.&.G.&.W.á^.&..Ï.W.|..Õ... 000020
00B80000 0247C726 025307C7 260A5EC4 D88E3190 B81E5657 000000C8 CBC95F5E ^_èùà...WV.|.1.Äá^.&ú.S.&úG...|. 000040
47C72602 2407C726 0A5EC4D8 8E31BCB8 1E565700 0000C8CB C95F5E1F 0000E900 .Õ...^_èùà...WV.|¥1.Äá^.&ú.$.&úG 000060
07C7260A 5EC4D88E 31E1B81E 56570000 00C8CBC9 5F5E1F00 00E90000 B8000002 ...|..Õ...^_èùà...WV.|Ä1.Äá^.&ú. 000080
C4D88E32 06B81E56 57000000 C8CBC95F 5E1F0000 E90000B8 00000247 C726025D ].&úG...|..Õ...^_èùà...WV.|.2.Äá 0000A0
B81E5657 000000C8 CBC95F5E 1F0000E9 00008800 000247C7 2601F807 C7260A5E ^.&ú.«.&úG...|..Õ...^_èùà...WV.| 0000C0
0000C8CB C95F5E1F 0000E900 00B80000 0247C726 022D07C7 260A5EC4 D88E322B +2.Äá^.&ú.-.&úG...|..Õ...^_èùà.. 0000E0
5F5E1F00 00E90000 B8000002 47C72602 4407C726 0A5EC4D8 8E3250B8 1E565700 .WV.|P2.Äá^.&ú.D.&úG...|..Õ...^_ 000100
E90000B8 00000247 C726022A 07C7260A 5EC4D88E 3275B81E 56570000 00C8CBC9 èùà...WV.|u2.Äá^.&ú.*.&úG...|..Õ 000120
000247C7 2601FC07 C7260A5E C4D88E32 9AB81E56 57000000 C8CBC95F 5E1F0000 ...^_èùà...WV.|.2.Äá^.&ú.•.&úG.. 000140
230447C7 260E5EC4 D88E328F B81E5657 000000C8 CBC95F5E 1F0000E9 00008800 .|..Õ...^_èùà...WV.|¢2.Äá^.&úG.# 000160
5EC4D88E 32E4B81E 56570000 00C8CBC9 5F5E1F00 00E90000 B8000006 47C72602 .&úG...|..Õ...^_èùà...WV.|Õ2.Äá^ 000180
00C8CBC9 5F5E1F00 00E90000 B8025789 26078926 0A5EC406 5782604 478B260E .&.G.&.W.á^.&..Ï.W.|..Õ...^_èùà. 0001A0
5E1F0000 E90000B8 00000247 C7260279 07C7260A 5EC4D88E 330AB81E 56570000 ..WV.|.3.Äá^.&ú.y.&úG...|..Õ...^ 0001C0
00008800 000247C7 2602A507 C7260A5E C4D88E33 36B81E56 57000000 C8CBC95F _èùà...WV.|63.Äá^.&ú.E.&úG...|.. 0001E0
```

Dump of file SATURN:[PCCOMMON.DUMP.DLL]PDLSYN.TMP;1 on 18-APR-1990 10:48:45.27
File ID (771,27,0) End of file block 276 / Allocated 276

Virtual block number 38 (00000026), 512 (0200) bytes

```
5EC40257 8B26078B 260E5EC4 D88E335B B81E5657 000000C8 CBC95F5E 1F0000E9 Õ...^_èùà...WV.|[3.Äá^.&..&.W.á^ 000000
C4D88E33 80B81E56 57000000 C8CBC95F 5E1F0000 E90000B8 02578926 0789260A .&..&.W.|..Õ...^_èùà...WV.|.3.Äá 000020
B7FF2602 2AB7FF26 065EC404 77FF2606 77FF260E 5EC40C77 FF260E77 FF260E5E ^.&.w.&.w.á^.&.w.&.w.á^.&.ñ*.&.ñ 000040
C4830000 2E9E9A00 6A436A0A 76FF0C76 FF021CB7 FF26021E B7FF2606 5EC40228 (.á^.&.ñ..&.ñ...v..v.jCj.......á 000060
8B260E5E C4D88E33 ABB81E56 57000000 C8CBC95F 5E1F0000 E90000B8 0006E918 .Õ..|..Õ...^_èùà...WV.|¨3.Äá^.&. 000080
56570000 00C8CBC9 5F5E1F00 00E90000 B8025789 26078926 0A5EC402 57882607 .&.W.á^.&..&.W.|..Õ...^_èùà...WV 0000A0
0000E900 00B80257 89260789 260A5EC4 02578B26 078B260E 5EC4D88E 3407B81E .|.4.Äá^.&..&.W.á^.&..&.W.|..Õ.. 0000C0
B7FF2602 2AB7FF26 065EC400 6A006AD8 8E3432B8 1E565700 0006C8CB C95F5E1F .^_èùà...WV.|24.Äj.j.á^.&.ñ*.&.ñ 0000E0
14C48300 0034D89A 006A406A 5016FC46 8D021CB7 FF26021E B7FF2606 5EC40228 (.Ã^.&.ñ..&.ñ...F•.Pj@j..Ä4...á. 000100
260677FF 260E5EC4 FC76FFFE 76FF0046 E9FA4688 0006E903 7500FA7E 83FA4689 .F•.-•.u.Õ...F•ÕF..v±.v•á^.&.w.& 000120
0C76FF02 1CB7FF26 021EB7FF 26065EC4 022BB7FF 26022AB7 FF26065E C40477FF .w.á^.&.ñ*.&.ñ(.á^.&.ñ..&.ñ...v. 000140
0000C8CB C95F5E1F 0000E900 00B80006 E918C483 000033EA 9A006A3F 6A0A76FF .v.j?j..Õ3...á.Õ..|..Õ...^_èùà.. 000160
00008802 57892607 89260A5E C40257B8 26078826 0E5EC4D8 8E345DB8 1E565700 .WV.|]4.Äá^.&..&.W.á^.&..&.W.|.. 000180
5EC40257 8B26078B 260E5EC4 D88E34F5 B81E5657 000000C8 CBC95F5E 1F0000E9 Õ...^_èùà...WV.|¾4.Äá^.&..&.W.á^ 0001A0
6AD88E35 20B81E56 57000000 C8CBC95F 5E1F0000 E90000B8 02578926 0789260A .&..&.W.|..Õ...^_èùà...WV.| 5.Äj 0001C0
0C76FF02 1CB7FF26 021EB7FF 26065EC4 022BB7FF 26022AB7 FF26065E C4006A00 .j.á^.&.ñ*.&.ñ(.Ã^.&.ñ..&.ñ...v. 0001E0
```

Dump of file SATURN:[PCCOMMON.DUMP.DLL]PDLSYN.TMP;1 on 18-APR-1990 10:48:45.27
File ID (771,27,0) End of file block 276 / Allocated 276

Virtual block number 39 (00000027), 512 (0200) bytes

```
0000C8CB C95F5E1F 0000E900 00B80006 E914C483 00003489 9A006A40 6A0A76FF .v.j@j...4...á.Õ..|..Õ...^_èùà.. 000000
28B7FF26 022AB7FF 26065EC4 0477FF26 0677FF26 0E5EC4D8 8E354BB8 1E565700 .WV.|K5.Äá^.&.w.&.w.á^.&.ñ*.&.ñ( 000020
14C48300 0035789A 006A406A 0A76FF0C 76FF021C B7FF2602 1EB7FF26 065EC402 .á^.&.ñ..&.ñ...v..v.j@j..x5...á. 000040
5EC4006A 006AD88E 3595B81E 56570000 00C8CBC9 5F5E1F00 00E90000 B80006E9 Õ..|..Õ...^_èùà...WV.|.5.Äj.j.á^ 000060
406A0A76 FF0C76FF 021CB7FF 26021EB7 FF26065E C4022BB7 FF26022A B7FF2606 .&.ñ*.&.ñ(.Ã^.&.ñ..&.ñ...v..v.j@ 000080
B81E5657 000000C8 CBC95F5E 1F0000E9 00008800 06E914C4 83000035 C99A006A j..è5...á.Õ..|..Õ...^_èùà...WV.| 0000A0
26065EC4 022BB7FF 26022AB7 FF26065E C40477FF 260677FF 260E5EC4 D88E35E6 Í5.Äá^.&.w.&.w.á^.&.ñ*.&.ñ(.á^.& 0000C0
00B80006 E914C483 00003613 9A006A41 6A0A76FF 0C76FF02 1CB7FF26 021EB7FF .ñ..&.ñ...v..v.jAj...6...á.Õ..|. 0000E0
C437FF26 0277FF26 0E5EC4D8 8E3630B8 1E565700 0000C8CB C95F5E1F 0000E900 .Õ...^_èùà...WV.|06.Äá^.&.w.&.7á 000100
6A0A76FF 0C76FF02 1CB7FF26 021EB7FF 26065EC4 022BB7FF 26022AB7 FF26065E ^.&.ñ*¯.&.ñ(.á^.&.ñ..&.ñ...v..v.j 000120
1E565700 0000C8CB C95F5E1F 0000E900 00B80006 E914C483 00003664 9A006A42 Bj..d6...á.Õ..|..Õ...^_èùà...WV. 000140
26065EC4 022BB7FF 26022AB7 FF26065E C437FF26 0277FF26 0E5EC4D8 8E3681B8 |.6.Äá^.&.w.&.7á^.&.ñ*¯.&.ñ(.á^.& 000160
00B80006 E914C483 00003684 9A006A4F 6A0A76FF 0C76FF02 1CB7FF26 021EB7FF .ñ..&.ñ...v..v.jOj..Ç6...á.Õ..|. 000180
C40257B8 26078B26 0E5EC4D8 8E3601B8 1E565700 0000C8CB C95F5E1F 0000E900 .Õ...^_èùà...WV.|16.Äá^.&..&.W.á 0001A0
8E3721B8 1E565700 0000C8CB C95F5E1F 0000E900 00B80657 89260447 89260E5E ^.&.G.Ï.W.|..Õ...^_èùà...WV.|!7. 0001C0
C95F5E1F 0000E900 00B80257 89260789 260A5EC4 06578B26 04478B26 0E5EC4D8 Äá^.&.G.&.W.á^.&..Ï.W.|..Õ...^_è 0001E0
```

Dump of file SATURN:[PCCOMMON.DUMP.DLL]PDLSYN.TMP;1 on 18-APR-1990 10:48:45.27
File ID (771,27,0) End of file block 276 / Allocated 276

Virtual block number 40 (00000028), 512 (0200) bytes

```
260277FF 260A5EC4 0477FF26 0677FF26 0E5EC4D8 8E374D88 1E565700 0000C8CB ùà...WV.¡H7.Äó^.&.w.&.w.ó^.&.w.& 000000
88021CB7 FF26021E B7FF2606 5EC40228 B7FF2602 2AB7FF26 065EC402 5E6837FF .7h^.ó^.&.ñ*.&.ñ(.ó^.&.ñ..&.ñ... 000020
1F0000E9 00008800 06E91AC4 83000037 049A006A 476A5052 00080510 56880E46 F..V....RPjGj...7...ó.Õ..|..Õ... 000040
89260A5E C40A5788 26084788 260E5EC4 D88E3779 B81E5657 000000C8 CBC95F5E ^ èùà...WV.¡y7.Äó^.&.G.&.W.ó^.&. 000060
260E5EC4 D88E37DC B81E5657 000000C8 CBC95F5E 1F0000E9 00008802 57892607 .Ï.W.|..Õ...^ èùà...WV.|È7.Äó^.& 000080
000000C8 CBC95F5E 1F0000E9 00008806 57892604 4789260E 5EC40257 88260788 ..&.W.ó^.&.G.Ï.W.|..Õ...^ èùà... 0000A0
00008802 57892607 89260A5E C4065788 26044788 260E5EC4 D88E3808 B81E5657 WV.|.8.Äó^.&.G.&.W.ó^.&..Ï.W.|.. 0000C0
C40477FF 260677FF 260E5EC4 D88E3834 B81E5657 000000C8 CBC95F5E 1F0000E9 Õ...^_èùà...WV.¡48.Äó^.&.w.&.w.ó 0000E0
1EB7FF26 065EC402 28B7FF26 022AB7FF 26065EC4 01F66837 FF260277 FF260A5E ^.&.w.&.7h-.ó^.&.ñ*.&.ñ(.ó^.&.ñ. 000100
0006E91A C4830000 37BF9A00 6A476A50 52000805 1056880E 4688021C B7FF2602 .&.ñ...F..V....RPjGj..¢7...ó.Õ.. 000120
88260847 88260E5E C4D88E38 60B81E56 57000000 C8CBC95F 5E1F0000 E90000B8 |..Õ...^_èùà...WV.|'8.Äó^.&.G.&. 000140
C3B81E56 57000000 C8CBC95F 5E1F0000 E90000B8 02578926 0789260A 5EC40A57 W.ó^.&..Ï.W.|..Õ...^_èùà...WV.|ü 000160
5E1F0000 E90000B8 06578926 04478926 0E5EC402 57882607 88260E5E C4D88E38 8.Äó^.&..&.W.ó^.&.G.Ï.W.|..Õ...^ 000180
0789260A 5EC40657 88260447 88260E5E C4D88E38 EFB81E56 57000000 C8CBC95F  èùà...WV.|ÿ8.Äó^.&.G.&.W.ó^.&.. 0001A0
FF260E5E C4D88E39 1BB81E56 57000000 C8CBC95F 5E1F0000 E90000B8 02578926 Ï.W.|..Õ...^_èùà...WV.|.9.Äó^.&. 0001C0
0228B7FF 26022AB7 FF26065E C4020868 37FF2602 77FF260A 5EC40477 FF260677 w.&.w.ó^.&.w.&.7h..ó^.&.ñ*.&.ñ(. 0001E0
```

Dump of file SATURN:[PCCOMMON.DUMP.DLL]PDLSYN.TMP;1 on 18-APR-1990 10:48:45.27
File ID (771,27,0) End of file block 276 / Allocated 276

Virtual block number 41 (00000029), 512 (0200) bytes

```
0038A69A 006A476A 50520008 05105688 0E468802 1CB7FF26 021EB7FF 26065EC4 ó^.&.ñ..&.ñ...F..V....RPjGj..Ï8. 000000
5EC4D88E 3947B81E 56570000 00C8CBC9 5F5E1F00 00E90000 B80006E9 1AC48300 ..ó.Õ..|..Õ...^ èùà...WV.|G9.Äó^ 000020
00C8CBC9 5F5E1F00 00E90000 B8025789 26078926 0A5EC40A 57882608 4788260E .&.G.&.W.ó^.&..Ï.W.|..Õ...^ èùà. 000040
B8065789 26044789 260E5EC4 02578826 0788260E 5EC4D88E 39AAB81E 56570000 ..WV.|¯9.Äó^.&..&.W.ó^.&.G.Ï.W.| 000060
57882604 4788260E 5EC4D88E 39D6B81E 56570000 00C8CBC9 5F5E1F00 00E90000 ..Õ...^ èùà...WV.|ø9.Äó^.&.G.&.W 000080
3A02B81E 56570000 00C8CBC9 5F5E1F00 00E90000 B8025789 26078926 0A5EC406 .ó^.&..Ï.W.|..Õ...^_èùà...WV.|.: 0000A0
B7FF2606 5EC40227 6837FF26 0277FF26 0A5EC404 77FF2606 77FF260E 5EC4D88E .Äó^.&.w.&.w.ó^.&.w.&.7h'.ó^.&.ñ 0000C0
6A505200 08051056 880E4688 021CB7FF 26021EB7 FF26065E C40228B7 FF26022A *.&.ñ(.ó^.&.ñ..&.ñ...F..V....RPj 0000E0
1E565700 0000C8CB C95F5E1F 0000E900 00B80006 E91AC483 0000398D 9A006A47 Gj...9...ó.Õ..|..Õ...^_èùà...WV. 000100
0000E900 00B80257 89260789 260A5EC4 0A578826 08478826 0E5EC4D8 8E3A2EB8 |.:.Äó^.&.G.&.W.ó^.&..Ï.W.|..Õ.. 000120
260A5EC4 0477FF26 0677FF26 0E5EC4D8 8E3A91B8 1E565700 0000C8CB C95F5E1F .^_èùà...WV.|.:.Äó^.&.w.&.w.ó^.& 000140
FF26021E B7FF2606 5EC40228 B7FF2602 2AB7FF26 065EC402 566837FF 260277FF .w̄.&.7hV.ó^.&.ñ*.&.ñ(.ó^.&.ñ..&. 000160
00008800 06E91AC4 8300003A 749A006A 476A5052 00080510 56880E46 88021CB7 ñ...F..V....RPjGj..t:...ó.Õ..|.. 000180
C40A5788 26084788 260E5EC4 D88E3ABD B81E5657 000000C8 CBC95F5E 1F0000E9 Õ...^ èùà...WV.|§:.Äó^.&.G.&.W.ó 0001A0
D88E3B20 B81E5657 000000C8 CBC95F5E 1F0000E9 00008802 57892607 89260A5E ^.&..Ï.W.|..Õ...^ èùà...WV.| ;.Ä 0001C0
CBC95F5E 1F0000E9 00008806 57892604 4789260E 5EC40257 88260788 260E5EC4 ó^.&..&.W.ó^.&.G.Ï.W.|..Õ...^_èù 0001E0
```

Dump of file SATURN:[PCCOMMON.DUMP.DLL]PDLSYN.TMP;1 on 18-APR-1990 10:48:45.27
File ID (771,27,0) End of file block 276 / Allocated 276

Virtual block number 42 (0000002A), 512 (0200) bytes

```
57892607 89260A5E C4065788 26044788 260E5EC4 D88E3B4C B81E5657 000000C8 à...WV.|L;.Äó^.&.G.&.W.ó^.&..&.W 000000
260677FF 260E5EC4 D88E3B78 B81E5657 000000C8 CBC95F5E 1F0000E9 00008802 .|..Õ...^_èùà...WV.|x;.Äó^.&.w.& 000020
065EC402 28B7FF26 022AB7FF 26065EC4 02496837 FF260277 FF260A5E C40477FF .w.ó^.&.w̄.&.7hI.ó^.&.ñ*.&.ñ(.ó^. 000040
C4830000 38039A00 6A476A50 52000805 1056880E 4688021C B7FF2602 1EB7FF26 &.ñ..&.ñ...F..V....RPjGj...;...ó 000060
88260E5E C4D88E38 A4B81E56 57000000 C8CBC95F 5E1F0000 E90000B8 0006E91A .Õ..|..Õ...^ èùà...WV.|È;.Äó^.&. 000080
57000000 C8CBC95F 5E1F0000 E90000B8 02578926 0789260A 5EC40A57 88260847 G.&.W.ó^.&..Ï.W.|..Õ...^_èùà...W 0000A0
C4023568 37FF2602 77FF260A 5EC40477 FF260677 FF260E5E C4D88E3C 07B81E56 V.|.<.Äó^.&.w.&.w.ó^.&.w̄.&.7h5.ó 0000C0
05105688 0E468802 1CB7FF26 021EB7FF 26065EC4 0228B7FF 26022AB7 FF26065E ^.&.ñ*.&.ñ(.ó^.&.ñ..&.ñ...F..V.. 0000E0
00C8CBC9 5F5E1F00 00E90000 B80006E9 1AC48300 0038EA9A 006A476A 50520008 ..RPjGj..ô;...ó.Õ..|..Õ...^ èùà. 000100
B8025789 26078926 0A5EC40A 57882608 4788260E 5EC4D88E 3C33B81E 56570000 ..WV.|3<.Äó^.&.G.&.W.ó^.&..Ï.W.| 000120
77FF2606 77FF260E 5EC4D88E 3C96B81E 56570000 00C8CBC9 5F5E1F00 00E90000 ..Õ...^_èùà...WV.|.<.Äó^.&.w.&.w 000140
FF26065E C40228B7 FF26022A B7FF2606 5EC40231 6837FF26 0277FF26 0A5EC404 .ó^.&.w̄.&.7h1.ó^.&.ñ*.&.ñ(.ó^.&. 000160
E91AC483 00003C79 9A006A47 6A505200 08051056 880E4688 021CB7FF 26021EB7 ñ..&.ñ...F..V....RPjGj..y<...ó.Õ 000180
08478826 0E5EC4D8 8E3CC2B8 1E565700 0000C8CB C95F5E1F 0000E900 00B80006 ..|..Õ...^ èùà...WV.|ô<.Äó^.&.G. 0001A0
1E565700 0000C8CB C95F5E1F 0000E900 00B80257 89260789 260A5EC4 0A578826 &.W.ó^.&..Ï.W.|..Õ...^_èùà...WV. 0001C0
065EC402 466837FF 260277FF 260A5EC4 0477FF26 0677FF26 0E5EC4D8 8E3D25B8 |%=.Äó^.&.w.&.w.ó^.&.w̄.&.7hF.ó^. 0001E0
```

Dump of file SATURN:[PCCOMMON.DUMP.DLL]PDLSYN.TMP;1 on 18-APR-1990 10:48:45.27
File ID (771,27,0) End of file block 276 / Allocated 276

Virtual block number 43 (0000002B), 512 (0200) bytes

```
00080510 568B0E46 8B021CB7 FF26021E 87FF2606 5EC40228 87FF2602 2AB7FF26 &.ñ*.&.ñ(.á^.&.ñ..&.ñ...F..V.... 000000
000000C8 CBC95F5E 1F0000E9 00008800 06E91AC4 8300003D 089A006A 476A5052 RPjGj...=...á.Õ..¡..Õ...^_èùà... 000020
00008802 57892607 89260A5E C40A578B 2608478B 260E5EC4 D88E3D51 8B1E5657 WV.¡Q=.Äá^.&.G.&.W.á^.&..Ī.W.¡.. 000040
5EC40257 8B26078B 260E5EC4 D88E3DB4 8B1E5657 000000C8 CBC95F5E 1F0000E9 Õ...^_èùà...WV.¡Ç=.Äá^.&..&.W.á^ 000060
D88E3DE0 8B1E5657 000000C8 CBC95F5E 1F0000E9 00008806 57892604 4789260E .&.G.Ī.W.¡..Õ...^_èùà...WV.¡Á=.Ä 000080
CBC95F5E 1F0000E9 00008802 57892607 89260A5E C406578B 2604478B 260E5EC4 á^.&.G.&.W.á^.&..Ī.W.¡..Õ...^_èù 0000A0
FF260277 FF260A5E C40477FF 260677FF 260E5EC4 D88E3E0C 8B1E5657 000000C8 à...WV.¡.>.Äá^.&.w.&.w.á^.&.w.&. 0000C0
468B021C 87FF2602 1EB7FF26 065EC402 2BB7FF26 022AB7FF 26065EC4 02666837 7hf.á^.&.ñ*.&.ñ(.á^.&.ñ..&.ñ..:F 0000E0
5E1F0000 E900008B 0006E91A C4830000 3D979A00 6A476A50 52000805 1056880E ..V....RPjGj...=...á.Õ..¡..Õ...^ 000100
0789260A 5EC40A57 8B260847 8B260E5E C4D88E3E 388B1E56 57000000 C8CBC95F _èùà...WV.¡8>.Äá^.&.G.&.W.á^.&.. 000120
FF260E5E C4D88E3E 988B1E56 57000000 C8CBC95F 5E1F0000 E900008B 02578926 Ī.W.¡..Õ...^_èùà...WV.¡.>.Äá^.&. 000140
022B87FF 26022AB7 FF26065E C4024D68 37FF2602 77FF260A 5EC40477 FF260677 w.&.w.á^.&.w.&.7hM.á^.&.ñ*.&.ñ(. 000160
003E7E9A 006A476A 50520008 0510568B 0E468B02 1CB7FF26 021EB7FF 26065EC4 á^.&.ñ..&.ñ...F..V....RPjGj..~>. 000180
5EC4D88E 3EC78B1E 56570000 00C8CBC9 5F5E1F00 00E90000 880006E9 1AC48300 ..á.Õ..¡..Õ...^_èùà...WV.¡ú>.Äá^ 0001A0
00C8CBC9 5F5E1F00 00E90000 88025789 26078926 0A5EC40A 57882608 4788260E .&.G.&.W.á^.&..Ī.W.¡..Õ...^_èùà. 0001C0
88065789 26044789 260E5EC4 02578B26 078B260E 5EC4D88E 3F2AB81E 56570000 ..WV.¡*7.Äá^.&..&.W.á^.&.G.Ī.W.¡ 0001E0
```

Dump of file SATURN:[PCCOMMON.DUMP.DLL]PDLSYN.TMP;1 on 18-APR-1990 10:48:45.27
File ID (771,27,0)   End of file block 276 / Allocated 276

Virtual block number 44 (0000002C), 512 (0200) bytes

```
57882604 4788260E 5EC4D88E 3F56881E 56570000 00C8CBC9 5F5E1F00 00E90000 ..Õ...^_èùà...WV.¡V7.Äá^.&.G.&.W 000000
3F82B81E 56570000 00C8CBC9 5F5E1F00 00E90000 88025789 26078926 0A5EC406 .á^.&..Ī.W.¡..Õ...^_èùà...WV.¡.? 000020
87FF2606 5EC40254 6837FF26 0277FF26 0A5EC404 77FF2606 77FF260E 5EC4D88E .Äá^.&.w.&.w.á^.&.w.&.7hT.á^.&.ñ 000040
6A505200 08051056 880E468B 021CB7FF 26021EB7 FF26065E C40228B7 FF26022A *.&.ñ(.á^.&.ñ..&.ñ...F..V....RPj 000060
1E565700 0000C8CB C95F5E1F 0000E900 00880006 E91AC483 00003F00 9A006A47 Gj...7...á.Õ..¡..Õ...^_èùà...WV. 000080
0000E900 00880257 89260789 260A5EC4 0A578B26 08478B26 0E5EC4D8 8E3FAE88 ¡Ú7.Äá^.&.G.&.W.á^.&..Ī.W.¡..Õ.. 0000A0
260A5EC4 0477FF26 0677FF26 0E5EC4D8 8E4011B8 1E565700 0000C8CB C95F5E1F .^_èùà...WV.¡.ə.Äá^.&.w.&.w.á^.& 0000C0
FF26021E B7FF2606 5EC40228 87FF2602 2AB7FF26 065EC402 126837FF 260277FF .w.&.7h..á^.&.ñ*.&.ñ(.á^.&.ñ..&. 0000E0
00008800 06E91AC4 8300003F F49A006A 476A5052 00080510 56880E46 88021CB7 ñ...F..V....RPjGj..¶?...á.Õ..¡.. 000100
C40A578B 2608478B 260E5EC4 D88E403D 8B1E5657 000000C8 CBC95F5E 1F0000E9 Õ...^_èùà...WV.¡=ə.Äá^.&.G.&.W.á 000120
D88E40A0 8B1E5657 000000C8 CBC95F5E 1F0000E9 00008802 57892607 89260A5E ^.&..Ī.W.¡..Õ...^_èùà...WV.¡.ə.Ä 000140
022AB7FF 26065EC4 02386837 FF260277 FF260A5E C40477FF 260677FF 260E5EC4 á^.&.w.&.w.á^.&.w.&.7h8.á^.&.ñ*. 000160
6A476A50 52000805 1056880E 4688021C B7FF2602 1EB7FF26 065EC402 2BB7FF26 &.ñ(.á^.&.ñ..&.ñ...F..V....RPjGj 000180
CC881E56 57000000 C8CBC95F 5E1F0000 E900008B 0006E91A C4830000 40839A00 ...ə...á.Õ..¡..Õ...^_èùà...WV.¡ä 0001A0
5E1F0000 E900008B 02578926 0789260A 5EC40A57 8B260847 8B260E5E C4D88E40 ə.Äá^.&.G.&.W.á^.&..Ī.W.¡..Õ...^ 0001C0
77FF260A 5EC40477 FF260677 FF260E5E C4D88E41 2F881E56 57000000 C8CBC95F _èùà...WV.¡/A.Äá^.&.w.&.w.á^.&.w 0001E0
```

Dump of file SATURN:[PCCOMMON.DUMP.DLL]PDLSYN.TMP;1 on 18-APR-1990 10:48:45.27
File ID (771,27,0)   End of file block 276 / Allocated 276

Virtual block number 45 (0000002D), 512 (0200) bytes

```
1CB7FF26 021EB7FF 26065EC4 022BB7FF 26022AB7 FF26065E C4026C68 37FF2602 .&.7hl.á^.&.ñ*.&.ñ(.á^.&.ñ..&.ñ. 000000
00E90000 880006E9 1AC48300 0041129A 006A476A 50520008 0510568B 0E468802 ..F..V....RPjGj...A...á.Õ..¦ .Õ. 000020
0A5EC40A 57882608 4788260E 5EC4D88E 4158881E 56570000 00C8CBC9 5F5E1F00 ..^_èùà...WV.¡[A.Äá^.&.G.&.W..^. 000040
5EC4D88E 41BEB81E 56570000 00C8CBC9 5F5E1F00 00E90000 88025789 26078926 &..Ī.W.¡..Õ...^_èùà...WV.¡/A.Äá^ 000060
00C8CBC9 5F5E1F00 00E90000 88065789 26044789 260E5EC4 02578B26 078B260E .&..&.W.á^.&.G.Ī.W.¡..Õ...^_èùà. 000080
88025789 26078926 0A5EC406 57882604 4788260E 5EC4D88E 41EAB81E 56570000 ..WV.¡õA.Äá^.&.G.&.W.á^.&..Ī.W.¡ 0000A0
77FF2606 77FF260E 5EC4D88E 4216881E 56570000 00C8CBC9 5F5E1F00 00E90000 ..Õ...^_èùà...WV.¡.B.Äá^.&.w.&.w 0000C0
FF26065E C40228B7 FF26022A B7FF2606 5EC40267 6837FF26 0277FF26 0A5EC404 .á^.&.w.&.7hg.á^.&.ñ*.&.ñ(.á^.&. 0000E0
E91AC483 000041A1 9A006A47 6A505200 08051056 880E468B 021C87FF 26021EB7 ñ..&.ñ...F..V....RPjGj..ÀA...á.Õ 000100
08478B26 0E5EC4D8 8E4242B8 1E565700 0000C8CB C95F5E1F 0000E900 00880006 ..¡..Õ...^_èùà...WV.¡BB.Äá^.&.G. 000120
1E565700 0000C8CB C95F5E1F 0000E900 00880257 89260789 260A5EC4 0A578B26 &.W.á^.&..Ī.W.¡..Õ...^_èùà...WV. 000140
0000E900 00880257 89260789 260A5EC4 06578B26 04478B26 0E5EC4D8 8E42A588 ¡ÉB.Äá^.&.G.&.W.á^.&..Ī.W.¡..Õ.. 000160
89260A5E C402578B 26078B26 0E5EC4D8 8E42D1B8 1E565700 0000C8CB C95F5E1F .^_èùà...WV.¡1B.Äá^.&..&.W.á^.&. 000180
260E5EC4 D88E42F0 8B1E5657 000000C8 CBC95F5E 1F0000E9 00008802 57892607 .&.W.¡..Õ...^_èùà...WV.¡»B.Äá^.& 0001A0
57000000 C8CBC95F 5E1F0000 E900008B 02578926 0789260A 5EC40257 8B26078B ..&.W.á^.&..&.W.¡..Õ...^_èùà...W 0001C0
CBC95F5E 1F0000E9 00008808 4789260A 47892600 00880E5E C4D88E43 28881E56 V.¡(C.Äá^.¡..&.G.&.G.¡..Õ...^_èù 0001E0
```

Dump of file SATURN:[PCCOMMON.DUMP.DLL]PDLSYN.TMP;1 on 18-APR-1990 10:48:45.27
File ID (771,27,0)   End of file block 276 / Allocated 276

```
Virtual block number 46 (0000002E), 512 (0200) bytes

 065EC437 FF260E5E C40877FF 260A77FF 260E5EC4 D88E4353 B81E5657 000000C8 à...WV.¡SC.Äó^.&.w.&.w.ó^.&.7ó^. 000000
 6A476A0A 76FF0C76 FF021CB7 FF26021E B7FF2606 5EC40228 B7FF2602 2AB7FF26 &.ñ*.&.ñ(.ó^.&.ñ..&.ñ...v..v.jGj 000020
 78B81E56 57000000 C8CBC95F 5E1F0000 E90000B8 0006E916 C4830000 42889A00 ...B...ó.Õ..¡..Õ...^_èùà...WV.¡x 000040
 5E1F0000 E90000B8 06578926 04478926 0E5EC402 578B2607 8B260E5E C4D88E43 C.Äó^.&..&.W.ó^.&.G.Ī.W.¡..Õ...^ 000060
 0789260A 5EC40657 8B260447 8B260E5E C4D88E43 CFB81E56 57000000 C8CBC95F _èùà...WV.¡ÙC.Äó^.&.G.&.W.ó^.&.. 000080
 8B260E5E C4D88E43 FBB81E56 57000000 C8CBC95F 5E1F0000 E90000B8 02578926 Ī.W.¡..Õ...^_èùà...WV.¡«C.Äó^.&. 0000A0
 56570000 00C8CBC9 5F5E1F00 00E90000 B8025789 26078926 0A5EC402 578B2607 .&.W.ó^.&..&̄.W.¡..Õ...^_èùà...WV 0000C0
 065EC402 2B87FF26 022AB7FF 26065EC4 0052681E 0A6A006A 006AD88E 4427B81E .¡'D.Äj.j.j..hR.ó^.&.ñ*̄.&.ñ(.ó^. 0000E0
 B80006E9 1AC48300 0043B29A 006A486A 0A76FF0C 76FF021C B7FF2602 1EB7FF26 &.ñ..&.ñ...v..v.jHj..ýC...ó.Õ..¡ 000100
 02578B26 078B260E 5EC4D88E 4452B81E 56570000 00C8CBC9 5F5E1F00 00E90000 ..Õ...^_èùà...WV.¡RD.Äó^.&..&.W. 000120
 8E44A2B8 1E565700 0000C8CB C95F5E1F 0000E900 00B80257 89260789 260A5EC4 ó^.&..&̄.W.¡..Õ...^_èùà...WV.¡ÀD. 000140
 021EB7FF 26065EC4 0228B7FF 26022AB7 FF26065E C4005468 1E0A6A00 6A006AD8 Äj.j.j..hT.ó^.&.ñ*̄.&.ñ(.ó^.&.ñ.. 000160
 0000E900 00B80006 E91AC483 00004485 9A006A48 6A0A76FF 0C76FF02 1CB7FF26 &.ñ...v..v.jHj...D...ó.Õ..¡..Õ.. 000180
 89260A5E C4025788 26078B26 0E5EC4D8 8E44CDB8 1E565700 0000C8CB C95F5E1F .^_èùà...WV.¡ëD.Äó^.&..&.W.ó^.&. 0001A0
 260E5EC4 D88E451D B81E5657 000000C8 CBC95F5E 1F0000E9 00008802 57892607 .&̄.W.¡..Õ...^_èùà...WV.¡.E.Äó^.& 0001C0
 57000000 C8CBC95F 5E1F0000 E90000B8 02578926 0789260A 5EC40257 8B26078B ..&.W.ó^.&..&̄.W.¡..Õ...^_èùà...W 0001E0
```

Dump of file SATURN:[PCCOMMON.DUMP.DLL]PDLSYN.TMP;1 on 18-APR-1990 10:48:45.27
File ID (771,27,0)   End of file block 276 / Allocated 276

```
Virtual block number 47 (0000002F), 512 (0200) bytes

 00E90000 B8025789 26078926 0A5EC402 578B2607 8B260E5E C4D88E45 48B81E56 V.¡HE.Äó^.&..&.W.ó^.&..&.W.¡..Õ. 000000
 260E5EC4 02578B26 078B260E 5EC4D88E 4573B81E 56570000 00C8CBC9 5F5E1F00 ..^_èùà...WV.¡sE.Äó^.&..&.W.ó^.& 000020
 5EC4D88E 459EB81E 56570000 00C8CBC9 5F5E1F00 00E90000 B8065789 26044789 .G.Ī.W.¡..Õ...^_èùà...WV.¡.E.Äó^ 000040
 00C8CBC9 5F5E1F00 00E90000 B8025789 26078926 0A5EC406 578B2604 478B260E .&.G.&.W.ó^.&..Ī.W.¡..Õ...^_èùà. 000060
 C40A5789 26084789 260E5EC4 02578B26 078B260A 5EC4D88E 45CAB81E 56570000 ..WV.¡ÒE.Äó^.&..&.W.ó^.&.G.Ī.W.ó 000080
 77FF260A 5EC427E1 68021CB7 FF26021E B7FF2606 5EC40477 FF260677 FF260E5E ^.&.w.&.w.ó^.&.ñ..&.ñ..hÄ'á^.&.w 0000A0
 000000C8 CBC95F5E 1F0000E9 00008800 06E910C4 83000029 C49A006A 37FF2602 .&.7j..ó)...ó.Õ..¡..Õ...^_èùà... 0000C0
 00008802 57892607 89260A5E C40A5788 26084788 260E5EC4 D88E45F6 B81E5657 WV.¡-E.Äó^.&.G.&.W.ó^.&..Ī.W.¡.. 0000E0
 5EC40257 8B26078B 260E5EC4 D88E4654 B81E5657 000000C8 CBC95F5E 1F0000E9 Õ...^_èùà...WV.¡TF.Äó^.&..&.W.ó^ 000100
 6AD88E46 80B81E56 57000000 C8CBC95F 5E1F0000 E90000B8 02578926 0789260A .&..&̄.W.¡..Õ...^_èùà...WV.¡.F.Äj 000120
 FF26021E B7FF2606 5EC40228 B7FF2602 2AB7FF26 065EC400 56681E0A 6A006A00 .j.j..hV.ó^.&.ñ*̄.&.ñ(.ó^.&.  .&. 000140
 5E1F0000 E90000B8 0006E91A C4830000 45009A00 6A486A0A 76FF0C76 FF021CB7 ñ...v..v.jHj...E...ó.Õ..¡..Õ...^ 000160
 26078926 0A5EC402 578B2607 8B260E5E C4D88E46 ABB81E56 57000000 C8CBC95F _èùà...WV.¡¨F.Äó^.&..&.W.ó^.&..& 000180
 77FF260E 5EC4D88E 46FBB81E 56570000 00C8CBC9 5F5E1F00 00E90000 B8025789 ̄.W.¡..Õ...^_èùà...WV.¡«F.Äó^.&.w 0001A0
 C40228B7 FF26022A B7FF2606 5EC40215 6837FF26 0277FF26 0A5EC404 77FF2606 .&.w.ó^.&.w̄.&.7h..ó^.&.ñ*.&.ñ(.ó 0001C0
 06E91AC4 83000046 DE9A006A 476A0A76 FF0C76FF 021CB7FF 26021EB7 FF26065E ^.&.ñ..&.ñ...v..v.jGj..ßF...ó.Õ. 0001E0
```

Dump of file SATURN:[PCCOMMON.DUMP.DLL]PDLSYN.TMP;1 on 18-APR-1990 10:48:45.27
File ID (771,27,0)   End of file block 276 / Allocated 276

```
Virtual block number 48 (00000030), 512 (0200) bytes

 8B26078B 260E5EC4 D88E4726 B81E5657 000000C8 CBC95F5E 1F0000E9 00008800 .¡..Õ...^_èùà...WV.¡&G.Äó^.&..&. 000000
 84B81E56 57000000 C8CBC95F 5E1F0000 E90000B8 02578926 0789260A 5EC40257 W.ó^.&..&̄.W.¡..Õ...^_èùà...WV.¡. 000020
 5E1F0000 E90000B8 02578926 0789260A 5EC40657 8B260447 8B260E5E C4D88E47 G.Äó^.&.G.&.W.ó^.&..Ī.W.¡..Õ...^ 000040
 26078926 0A5EC402 578B2607 8B260E5E C4D88E47 AFB81E56 57000000 C8CBC95F _èùà...WV.¡€G.Äó^.&..&.W.ó^.&..& 000060
 478B260E 5EC4D88E 47DBB81E 56570000 00C8CBC9 5F5E1F00 00E90000 B8025789 ̄.W.¡..Õ...^_èùà...WV.¡ÛG.Äó^.&.G 000080
 56570000 00C8CBC9 5F5E1F00 00E90000 B8025789 26078926 0A5EC406 578B2604 .&.W.ó^.&..Ī.W.¡..Õ...^_èùà...WV 0000A0
 0000E900 00B80257 89260789 260A5EC4 02578B26 078B260E 5EC4D88E 4806B81E .¡.H.Äó^.&..&.W.ó^.&..&̄.W.¡..Õ.. 0000C0
 260A5EC4 06578B26 04478B26 0E5EC4D8 8E4832B8 1E565700 0000C8CB C95F5E1F .^_èùà...WV.¡2H.Äó^.&.G.&.W.ó^.& 0000E0
 0E5EC4D8 8E485DB8 1E565700 0000C8CB C95F5E1F 0000E900 00B80257 89260789 ..Ī.W.¡..Õ...^_èùà...WV.¡]H.Äó^. 000100
 000000C8 CBC95F5E 1F0000E9 00008802 57892607 89260A5E C4025788 26078B26 &..&.W.ó^.&..&̄.W.¡..Õ...^_èùà... 000120
 E90000B8 02578926 0789260A 5EC40257 8B26078B 260E5EC4 D88E4889 B81E5657 WV.¡.H.Äó^.&..&.W.ó^.&..&̄.W.¡..Õ 000140
 0A5EC402 578B2607 8B260E5E C4D88E48 B4B81E56 57000000 C8CBC95F 5E1F0000 ...^_èùà...WV.¡ÇH.Äó^.&..&.W.ó^. 000160
 5EC4D88E 48DFB81E 56570000 00C8CBC9 5F5E1F00 00E90000 B8025789 26078926 &..&̄.W.¡..Õ...^_èùà...WV.¡ÒH.Äó^ 000180
 0000C8CB C95F5E1F 0000E900 00B80257 89260789 260A5EC4 02578B26 078B260E .&..&.W.ó^.&..&̄.W.¡..Õ...^_èùà.. 0001A0
 00008802 57892607 89260A5E C4025788 26078B26 0E5EC4D8 8E490AB8 1E565700 .WV.¡.I.Äó^.&..&.W.ó^.&..&̄.W.¡.. 0001C0
 0247C726 026407C7 260A5EC4 D88E4935 B81E5657 000000C8 CBC95F5E 1F0000E9 Õ...^_èùà...WV.¡5I.Äó^.&ú.d.&ÚG. 0001E0
```

Dump of file SATURN:[PCCOMMON.DUMP.DLL]PDLSYN.TMP;1 on 18-APR-1990 10:48:45.27
File ID (771,27,0)   End of file block 276 / Allocated 276

Virtual block number 49 (00000031), 512 (0200) bytes

```
8007C726 0A5EC4D8 8E496088 1E565700 0000C8CB C95F5E1F 0000E900 00880000 ..¦..Õ...^_èùà...WV.¦'I.Äá^.&ú.. 000000
5EC4D88E 4985881E 56570000 00C8CBC9 5F5E1F00 00E90000 88000002 47C72602 .&úG...¦..Õ...^_èùà...WV.¦ I.Äá^ 000020
AAB81E56 57000000 C8CBC95F 5E1F0000 E9000088 00000247 C7260206 07C7260A .&ú...&úG...¦..Õ...^_èùà... V.¦ˆ 000040
000000C8 CBC95F5E 1F0000E9 00008800 000247C7 26024707 C7260A5E C4D88E49 I.Äá^.&ú.G.&úG...¦..Õ...^_èu. .. 000060
C95F5E1F 0000E900 00880000 0247C726 026D07C7 260A5EC4 D88E49CF 881E5657 WV.¦ÜI.Äá^.&ú.m.&úG...¦..Õ...^_è 000080
00E90000 88000002 47C72602 0307C726 0A5EC4D8 8E49F488 1E565700 0000C8CB ùà...WV.¦¶I.Äá^.&ú...&úG...¦..Õ. 0000A0
00000247 C726022C 07C7260A 5EC4D88E 4A19881E 56570000 00C8CBC9 5F5E1F00 ..^_èùà...WV.¦.J.Äá^.&ú.,.&úG... 0000C0
26022807 C7260A5E C4D88E4A 3E881E56 57000000 C8CBC95F 5E1F0000 E9000088 ¦..Õ...^_èùà...WV.¦>J.Äá^.&ú.+.& 0000E0
260A5EC4 D88E4A63 881E5657 000000C8 CBC95F5E 1F0000E9 00008800 000247C7 úG...¦..Õ...^_èùà...WV.¦cJ.Äá^.& 000100
8E4A8888 1E565700 0000C8CB C95F5E1F 0000E900 00880000 0247C726 028207C7 ú...&úG...¦..Õ...^_èùà...WV.¦.J. 000120
56570000 00C8CBC9 5F5E1F00 00E90000 88000002 47C72602 7F07C726 0A5EC4D8 Äá^.&ú...&úG...¦..Õ...^_èùà...WV 000140
C8CBC95F 5E1F0000 E9000088 00000247 C726024A 07C7260A 5EC4D88E 4AAD881E .¦ÙJ.Äá^.&ú.J.&úG...¦..Õ...^_èùà 000160
1F0000E9 00008800 000247C7 26027A07 C7260A5E C4D88E4A D2881E56 57000000 ...WV.¦ÒJ.Äá^.&ú.z.&úG...¦..Õ... 000180
00880000 0247C726 024C07C7 260A5EC4 D88E4AF7 881E5657 000000C8 CBC95F5E ^_èùà...WV.¦÷J.Äá^.&ú.L.&úG...¦. 0001A0
47C72602 4B07C726 0A5EC4D8 8E481C88 1E565700 0000C8CB C95F5E1F 0000E900 .Õ...^_èùà...WV.¦.K.Äá^.&ú.K.&úG 0001C0
07C7260A 5EC4D88E 4B41881E 56570000 00C8CBC9 5F5E1F00 00E90000 88000002 ...¦..Õ...^_èùà...WV.¦AK.Äá^.&ú. 0001E0
```

Dump of file SATURN:[PCCOMMON.DUMP.DLL]PDLSYN.TMP;1 on 18-APR-1990 10:48:45.27
File ID (771,27,0) End of file block 276 / Allocated 276

Virtual block number 50 (00000032), 512 (0200) bytes

```
C4D88E48 66881E56 57000000 C8CBC95F 5E1F0000 E9000088 00000247 C72601F9 ª.&úG...¦..Õ...^_èùà...WV.¦fK.Äá 000000
881E5657 000000C8 CBC95F5E 1F0000E9 00008800 000247C7 26028107 C7260A5E ^.&ú...&úG...¦..Õ...^_èùà...WV.¦ 000020
0000C8CB C95F5E1F 0000E900 00880000 0247C726 027D07C7 260A5EC4 D88E4B88 .K.Äá^.&ú.}.&úG...¦..Õ...^_èùà.. 000040
5F5E1F00 00E90000 88000002 47C72602 8E07C726 0A5EC4D8 8E4B8088 1E565700 .WV.¦¯K.Äá^.&ú...&úG...¦..Õ...^_ 000060
E9000088 00000247 C7260272 07C7260A 5EC4D88E 4B05881E 56570000 00C8CBC9 èùà...WV.¦fK.Äá^.&ú.r.&úG...¦..Õ 000080
000247C7 26025507 C7260A5E C4D88E48 FA881E56 57000000 C8CBC95F 5E1F0000 ...^_èùà...WV.¦ªK.Äá^.&ú.U.&úG.. 0000A0
01F507C7 260A5EC4 D88E4C1F 881E5657 000000C8 CBC95F5E 1F0000E9 00008800 .¦..Õ...^_èùà...WV.¦.L.Äá^.&ú.%. 0000C0
0A5EC4D8 8E4C4488 1E565700 0000C8CB C95F5E1F 0000E900 00880000 0247C726 &úG...¦..Õ...^_èùà...WV.¦DL.Äá^. 0000E0
4C69881E 56570000 00C8CBC9 5F5E1F00 00E90000 88000002 47C72602 7807C726 &ú.(.&úG...¦..Õ...^_èùà...WV.¦iL 000100
57000000 C8CBC95F 5E1F0000 E9000088 00000247 C726027C 07C7260A 5EC4D88E .Äá^.&ú.|.&úG...¦..Õ...^_èùà...W 000120
CBC95F5E 1F0000E9 00008800 000247C7 26029707 C7260A5E C4D88E4C 8E881E56 V.¦.L.Äá^.&ú...&úG...¦..Õ...^_èù 000140
0000E900 00880000 0247C726 025207C7 260A5EC4 D88E4CB3 881E5657 000000C8 à...WV.¦ºL.Äá^.&ú.R.&úG...¦..Õ.. 000160
88000002 47C72602 0807C726 0A5EC4D8 8E4CD888 1E565700 0000C8CB C95F5E1F .^_èùà...WV.¦ÄL.Äá^.&ú...&úG...¦ 000180
C7260291 07C7260A 5EC4D88E 4CFD881E 56570000 00C8CBC9 5F5E1F00 00E90000 ..Õ...^_èùà...WV.¦»L.Äá^.&ú...&ú 0001A0
C7260A5E C4D88E4D 22881E56 57000000 C8CBC95F 5E1F0000 E9000088 00000247 G...¦..Õ...^_èùà...WV.¦"M.Äá^.&ú 0001C0
D88E4D47 881E5657 000000C8 CBC95F5E 1F0000E9 00008800 000247C7 26029007 ...&úG...¦..Õ...^_èùà...WV.¦GM.Ä 0001E0
```

Dump of file SATURN:[PCCOMMON.DUMP.DLL]PDLSYN.TMP;1 on 18-APR-1990 10:48:45.27
File ID (771,27,0) End of file block 276 / Allocated 276

Virtual block number 51 (00000033), 512 (0200) bytes

```
1E565700 0000C8CB C95F5E1F 0000E900 00880000 0247C726 020E07C7 260A5EC4 á^.&ú...&úG...¦..Õ...^_èùà...WV. 000000
00C8CBC9 5F5E1F00 00E90000 88000002 47C72602 0D07C726 0A5EC4D8 8E4D6C88 ¦lM.Äá^.&ú...&úG...¦..Õ...^_èùà. 000020
5E1F0000 E9000088 00000247 C726020C 07C7260A 5EC4D88E 4D91881E 56570000 ..WV.¦.M.Äá^.&ú...&úG...¦..Õ...^ 000040
00008800 000247C7 26023707 C7260A5E C4D88E4D 86881E56 57000000 C8CBC95F _èùà...WV.¦ÑM.Äá^.&ú.7.&úG...¦.. 000060
0247C726 024E07C7 260A5EC4 D88E4DD8 881E5657 000000C8 CBC95F5E 1F0000E9 Õ...^_èùà...WV.¦ÛM.Äá^.&ú.N.&úG. 000080
7307C726 0A5EC4D8 8E4E0088 1E565700 0000C8CB C95F5E1F 0000E900 00880000 ..¦..Õ...^_èùà...WV.¦.N.Äá^.&ú.s 0000A0
5EC4D88E 4E25881E 56570000 00C8CBC9 5F5E1F00 00E90000 88000002 47C72602 .&úG...¦..Õ...^_èùà...WV.¦%N.Äá^ 0000C0
4A881E56 57000000 C8CBC95F 5E1F0000 E9000088 00000247 C7260274 07C7260A .&ú.t.&úG...¦..Õ...^_èùà...WV.¦J 0000E0
000000C8 CBC95F5E 1F0000E9 00008800 000247C7 26025707 C7260A5E C4D88E4E N.Äá^.&ú.W.&úG...¦..Õ...^_èùà... 000100
C95F5E1F 0000E900 00880000 0247C726 022407C7 260A5EC4 D88E4E6F 881E5657 WV.¦oN.Äá^.&ú.$.&úG...¦..Õ...^_è 000120
47670203 01280007 46370203 00000009 4E940002 00000005 2C560002 000490C8 ù.....V,.......N......7F..(...gG 000140
00EE46C7 D88EFFFF 881E5657 000014C8 00000000 00000000 00000000 01350007 ..5.............à...WV.¦...ÄúFŸ. 000160
E9000088 0006E903 74F64608 F44688F6 5689F446 89025788 26078826 0E5EC400 .á^.&..&.W..F¶.V-.F¶.F-t.Õ..¦..Õ 000180
26F45EC4 0477FF26 045FC426 F45EC400 28E90375 0000423E 83263888 068E017D )...¦;&.>B..u.Õ(.á^¶&á_.&.w.á^¶& 0001A0
08478826 F45EC40C C483FFFF 011E9A37 FF260277 FF26065E C418DE68 1E0877FF .w..hB.á^.&.w.&.7.......á.á^¶&.G. 0001C0
882634C4 260474C4 26F476C4 0AEC5E68 0060E903 75000C7E 83EC4689 0847FF26 &.G..F&.-..u.Õ'.k^&.áv¶&át.&á4&. 0001E0
```

Dump of file SATURN:[PCCOMMON.DUMP.DLL]PDLSYN.TMP;1 on 18-APR-1990 10:48:45.27
File ID (771,27,0) End of file block 276 / Allocated 276

Virtual block number 52 (00000034), 512 (0200) bytes

```
000E05F6 5688F446 880039E9 0375F246 08F04688 F25689F0 46890850 88260640 a.&.P..Fb.V·.Fb.F·u.Õ9..F¶.V-... 000000
7500EE7E 83EE4689 0CC483F0 5EFF0676 FF0876FF 37FF2602 77FF26F4 5EC45052 RPá^¶&.w.&.7.v..v..^b.á..FŸ.~Ÿ.u 000020
882634C4 260474C4 26F476C4 0AEC5E68 00CFE999 A8880005 E9EE4688 0006E903 .Õ...FŸÖſ.¡¨.Õù.k^&.áv¶&át.&á4&. 000040
000E05F6 5688F446 880033E9 0375FA46 08F84688 FA5689F8 46890450 88260240 a.&.P..F½.V°.F½.F°u.Õ3..F¶.V-... 000060
7500EE7E 83EE4689 0CC483F8 5EFF0676 FF0876FF 37FF2602 77FF26F4 5EC45052 RPá^¶&.w.&.7.v..v..^½.á..FŸ.-Ÿ.u 000080
58E9037E 04473926 045FC426 F45EC408 478826F4 5EC40075 E9EE4688 0006E903 .Õ...FŸÕu.á^¶&.G.á^¶&á_.&9G.~.ÕX 0000A0
0000FFFF 9AF476FF F676FF0A 76FFFE56 89FC4689 0C578826 0A478826 F45EC400 .á^¶&.G.&.W..F=.V±.v..v-.v¶..... 0000C0
FF1076FF 001DE903 7400EE7E 83025789 26078926 FE5688FC 46880E5E C4EE4689 .FŸá^..F=.V±&..&.W..-Ÿ.t.Õ...v.. 0000E0
1F0000E9 EE468800 06E90CC4 83FFFF00 009A0676 FF0876FF 0A76FF0C 76FF0E76 v..v..v..v..v.......á.Õ...FŸÕ... 000100
0E76FF00 1DE90374 00047F83 26165EC4 D88E0008 881E5657 000008C8 C8C95F5E ^_èùà...WV.¡...Äá^.&....t.Õ...v. 000120
83263888 068E000A E90CC483 01A10000 9A0676FF 0876FF0A 76FF1476 FF0C76FF .v̄..v..v..v..v....Å..á.ÕÕ...¡;&. 000140
FF08C483 0064011E 9A37FF26 0277FF26 065EC418 F9681E00 16E90375 0000423E >B..u.Õ...h°.á^.&.w.&.7...d..á.. 000160
83F84689 0000FFFF 9A5016FA 46805000 0E0502E0 C1044788 26165EC4 1D6A0A76 v.j.á^.&.G.èÅ....P.F°.P......F½. 000180
5EC40257 89260789 26125688 10468BFA 5EC40086 E9F84688 0006E903 7500F87E -½.u.Õ...F½Õ..á^°.F..V.&..&.W.á^ 0001A0
88260788 260C5EC4 00000847 C726FA5E C4065789 26044789 26185688 16468BFA °.F..V.&.G.&.W.á^°&úG...á^.&..&. 0001C0
3926FE46 88165EC4 FE46FF00 03E90000 FE46C70C 5789260A 478926FA 5EC40257 W.á^°&.G.&.W.úF±..Õ...F±á^..F±&9 0001E0
```

Dump of file SATURN:[PCCOMMON.DUMP.DLL]POLSYN.TMP;1 on 18-APR-1990 10:48:45.27
File ID (771,27,0)   End of file block 276 / Allocated 276

Virtual block number 53 (00000035), 512 (0200) bytes

```
5EC4FFD7 E90E4089 26104089 26000088 FA5EC402 E6C1FE76 880017E9 037F0447 G...Õ...v±èl.á^°¡..&.a.&.a.Õa.á^ 000000
1E565700 0004C8C8 C95F5E1F 0000E900 00880257 89260789 26FC5688 FA46880C ..F°.V=&..&.W.¡..Õ...^_èùà...WV. 000020
C402E6C1 08778826 FC5EC4FE 5689FC46 89025788 26078826 0C5EC408 8E018C88 ¡¥..Äá^.&..&.W..F=.V±á×=&.w.èl.á 000040
FF0876FF 0A76FF10 76FF0C76 FF0E76FF 10508926 0E408926 14568812 4688FC5E ^=.F..V.&.a.&.P..v..v..v..v..v.. 000060
5EC4D88E 02D1881E 56570000 00C8C8C9 5F5E1F00 00E90CC4 8301E200 009A0676 v....ã..á.Õ...^_èùà...WV.¡1..Äá^ 000080
0006C8C8 C95F5E1F 0000E900 00880257 89260789 260A5EC4 02578826 0788260E .&..&.W.á^.&..&̄.W.¡..Õ...^_èùà.. 0000A0
890C5788 260A4788 26085EC4 0040E903 750A4608 08468808 8E032A88 1E565700 .WV.¡°..Ä.F..F.u.Õa.á^.&.G.&.W.. 0000C0
89084689 FE5688FC 4688FA46 89000001 6C9A0876 FF0A76FF 0676FFFE 5689FC46 F=.V±.v..v..v..l....F°.F=.V±.F.. 0000E0
1E565700 0034C8C8 C95F5E1F FF85E900 03E9FA46 880006E9 037500FA 7E830A56 V..-°.u.Õ...F°Õ..Õç..^_èùà4..WV. 000100
46C7E446 89E64689 00008804 94E246C7 FFFFE046 C70E4689 0A468808 8E035588 ¡U..Ä.F..FßúFÄ..úFã..¡...Fl.FõúF 000120
97882602 10878826 065EC4F2 4689F446 89000088 F8568CF6 46890E46 800001FA °...F8.F-.V½¡...F¶.F·á^.&....&.. 000140
5689CC46 89021697 88260214 87882606 5EC40A56 89084689 EA5689E8 46890212 ...FÒ.Võ.FÄ.VÕá^.&....&.....Fã.V 000160
FF0A76FF 016A5016 04468050 16FC4680 F046890A 46880789 260A4688 E85EC4CE õá^Õ.F.&...F..Fb.F=.P.Fâ.Pj..v.. 000180
8102C2E9 EC468800 06E90375 00EC7E83 EC468910 C483052A 10789A06 76FF0876 v..v..(.*..á..Fã.-ã.u.Õ...FšÕõ.. 0001A0
E999A888 021A9789 26021887 8926EA56 88E84688 065EC400 19E90374 02A8FC7E -=¨.t.Õ..á^..FÒ.Võ&....&....¡´.Õ 0001C0
76FF0876 FF0477FF 26065EC4 5016F246 800C76FF 0E76FF00 6A5016F6 4680029F ...F-.Pj..v..v..F·.Pá^.&.w..v..v 0001E0
```

Dump of file SATURN:[PCCOMMON.DUMP.DLL]POLSYN.TMP;1 on 18-APR-1990 10:48:45.27
File ID (771,27,0)   End of file block 276 / Allocated 276

Virtual block number 54 (00000036), 512 (0200) bytes

```
878926EA 5688E846 88065EC4 0019E903 7500003D EC468914 C48304FC 01849A06 ..Ç.=..á..Fš=..u.Õ..á^..FÒ.Võ&.. 000000
E90374F0 4639FC46 880081E9 037D01F4 F07E8102 54E9EC46 88021A97 89260218 ..&.....FšÕT..~Þ¶.).ÕŸ..F=9Fbt.Õ 000020
26065EC4 5016F246 80006AD4 76FFD676 FFF04689 078826E8 5EC402E8 6E830072 r..nÕ.á^Õ&...Fb.v=.vâj..F·.Pá^.& 000040
E9EC4688 0006E903 75000030 EC468910 C4830554 02C99A06 76FF0876 FF0477FF .w..v..v..è.T..á..Fš=..u.Õ...FšÕ 000060
8910C483 FFFF1078 9A0676FF 0876FFF0 76FF016A 50160446 805016FC 468001FF ...F=.P.Fâ.Pj..vb.v..v..(....á.. 000080
77FF2606 5EC4F276 FFF476FF 0031E901 D0E9EC46 880006E9 037500EC 7E83EC46 Fš.~š.u.Õ...FšÕÄ.Õ1..v¶.v·á^.&.w 0000A0
88021A97 89260218 878926EA 5688E846 88065EC4 EC468906 C4830315 03409A04 ..M....á..Fšá^..FÒ.Võ&....&....¡ 0000C0
EE4689FC 18878826 388A068E D8030170 F04669E3 D1FC5E88 0136E901 9CE999A8 ´.Õ..Õá..^=1D1Fbp..Ä..¤;&....=.FŸ 0000E0
FF03B1D2 46C7D046 89145805 E001C103 E0D1C888 EE468800 DEE90375 00EE7E83 .-Ÿ.u.Õa..FŸ.à1Á.è1Á.X..FÄúFøŸ.. 000100
16F2468D 5052000E 05F45688 F2460302 E0C10847 8826F25E C4006AD0 76FFD276 v@.vÂj.á^·&.G.èÅ..F·.V¶...RP.F·. 000120
06E90375 00003DEC 468914C4 8303C301 849A0676 FF0876FF 0477FF26 065EC450 Pá^.&.w..v..v..Ç.Õ..á..Fš=..u.Õ. 000140
00DC7E83 DC4EFF00 03E9DC46 89480447 8826005E C402E86E 83011AE9 EC468800 ..FšÕ...nÕ.á^Ä&.G.M.FEÕ...Nè.-É. 000160
26FE4688 E85EC402 E84683FE 46890000 261FC426 D05EC40A DC766800 5FE9037D ).Õ_.kvÉ.á^Ä&á.&...F±.FÕ.á^Õ.F±& 000180
03409A04 77FF2606 5EC4F276 FFF476FF 0031E903 73E84639 CE5688CC 46880789 ...Fš.Vö9FÒa.Õ1..v¶.v·á^.&.w..M. 0001A0
A0E999A9 88021A97 89260218 878926EA 5688E846 88065EC4 EC468906 C4830687 ...á..Fšá^..FÒ.Võ&....&....¡`.Õ. 0001C0
88065EC4 06C48306 DF03409A 0477FF26 065EC4F2 76FFF476 FF002EE9 FF95E900 .Õ..Õ...v¶.v·á^.&.w..M.Õ..á.á^.. 0001E0
```

Dump of file SATURN:[PCCOMMON.DUMP.DLL]POLSYN.TMP;1 on 18-APR-1990 10:48:45.27
File ID (771,27,0)   End of file block 276 / Allocated 276

Virtual block number 55 (00000037), 512 (0200) bytes

```
4688F046 89078826 E85EC400 6CE999A8 B8021A97 89260218 878926EA 5688E846 FÒ.Võ&....&.....¡´.Õl.á^Ò&...FÞ.F 000000
FF021A97 89260218 878926EA 5688E846 88065EC4 FE01E903 72E84639 DA5688D8 Ã.VÜ9FÒr.Õ.±á^..FÒ.Võ&....&..... 000020
E90372E8 4639DA56 88D8468B 06C48305 E1034D9A 0477FF26 065EC4F2 76FFF476 v¶.v·á^.&.w..M.Ä..á..FÄ.VÜ9FÒr.Õ 000040
00E999A8 B80006E9 99ACB800 06E9000F E9000088 0009E903 7402ABFC 7E810019 ...~•¨.t.Õ..¡..Õ..Õ..¡¨.Õ..¡´.Õ. 000060
89021297 88260210 87882606 5EC4088E 05AD881E 56570000 1CC8C8C9 5F5E1F00 ..^_èùà...WV.¡Ù..Äá^.&....&..... 000080
5EC4E656 89E44689 02169788 26021487 8826065E C4EE5689 EC4689F6 5689F446 F¶.V̄-.F&.VŸá^.&....&.....FÕ.VÌá^ 0000A0
76FF0876 FF0A76FF 006A006A 006A5016 FC4680FA 46890A46 88078926 0A4688F4 ¶.F.&...F..F'.F•.Pj.j.j..v..v..v 0000C0
02ABFC7E 8101D4E9 F2468800 06E90375 00F27E83 F2468910 C48307F0 10789A06 ..(.Þ..á..F·.~·.u.Õ...F·Õá..~•¨. 0000E0
1A978926 02188789 26F65688 F4468806 5EC40789 260A4688 0C5EC400 22E90374 t.Õ".á^..F.&..á^..F¶.V-&....&... 000100
02F46E83 002FE903 74FA4639 FC468800 5FE9037D 01F4FA7E 8101A8E9 00008802 .¡..Õ´..~'¶.).Õ_..F•9F't.Õ/..n¶. 000120
10789A06 76FF0876 FFFA76FF 006A006A 006A5016 FC4680FA 46890788 26F45EC4 á^¶&...F'.F•.Pj̄.j.j..v'.v..v..(. 000140
878926F6 5688F446 88065EC4 078926FA 46880C5E C40022E9 F2468910 C4830438 8..á..F·Õ".á^..F'&..á^..F¶.V-&.. 000160
3B8A068E D8030170 FA4669E3 D1FC5E88 0003E901 42E999A8 B8021A97 89260218 ..&....¡´.Õ8.Õ£..^•1Dìf'p..Ä..¤; 000180
89145805 E0D1C103 E0D1C888 F8468800 87E90375 00F87E83 F84689FC 18878826 &...•.F½.~½.u.Õ...F½.àlÁ.èlÁ.X.. 0001A0
00F07E83 F04EFF00 03E9F046 89480447 8826E85E C402F46E 83071EEA 46C7E846 FÒúFõ...n¶.á^Ò&.G.H.FÞÕ...NÞ.-Þ. 0001C0
26FE4688 F45EC402 F44683FE 46890088 261FC426 E85EC40A F0766800 50E9037D ).ÕP.kvÞ.á^Ò&á.&...F±.F¶.á^¶.F±& 0001E0
```

Dump of file SATURN:[PCCOMMON.DUMP.DLL]PDLSYN.TMP;1 on 18-APR-1990 10:48:45.27
File ID (771,27,0)   End of file block 276 / Allocated 276

Virtual block number 56 (00000038), 512 (0200) bytes

```
88F44688 065EC407 8926FA46 880C5EC4 0022E903 73F44639 E65688E4 46880789 ...FÕ.V}9F¶s.Õ".á^..F'&..á^..F¶. 000000
8926FA46 880C5EC4 0022E9FF A4E9009D E999A988 021A9789 26021887 8926F656 V-&....&....¡`.Õ..ÕE.Õ".á^..F'&. 000020
078826F4 5EC40075 E999A888 021A9789 26021887 8926F656 88F44688 065EC407 .á^..F¶.V-&....&....¡´.Õu.á^¶&.. 000040
4688065E C4FEACE9 037402A8 FC7E8100 0AE90373 F44639EE 5688EC46 88FA4689 .F'.Fš.VŸ9F¶s.Õ...~•¨.t.Õ¯±á^..F 000060
260C5EC4 0021E903 72F44639 EE5688EC 4688021A 97892602 18878926 F65688F4 ¶.V-&....&.....Fš.VŸ9F¶r.Õl.á^.& 000080
F45EC400 12E999AC B80006E9 001BE999 A8B80009 E9037402 ABFC7E81 000007C7 ú....~•¨.t.Õ..¡¨.Õ..Õ..¡¯.Õ..á^¶ 0000A0
D88E0855 881E5657 000002C8 CBC95F5E 1F0000E9 00008807 89260C5E C4078826 &..á^.&..¡..Õ...^_èùà...WV.¡U..Ä 0000C0
0876FF0A 76FF1076 FF1276FF 08C48309 BA02259A 0676FF08 76FF0C76 FF0E76FF .v..v..v..v..X.¤.¯á..v..v..v..v. 0000E0
14E90375 99A8FE7E 81001EE9 037500FE 7E83FE46 890AC483 06500716 9A0676FF .v....P..á..F±.~±.u.Õ...~±¨.u.Õ. 000100
CBC95F5E 1F0000E9 FE468807 8926145E C404C483 077416E9 9A0676FF 0876FF00 ..v..v..Õ.t..á.á^.&...F±Õ...^_èù 000120
E6968CFD E48689F6 4680FC56 8CFA4689 FDF6868D D88E096C 881E5657 00021CC8 à...WV.¡l..Ä..~».F'.V•.F-..Õ»¯..l 000140
9689FDF2 86890212 97882602 10878826 065EC4FD EE968CFD EC8689FD F68680FD »..~»..š»..Ÿ»á^.&....&......·».. 000160
8688065E C4078926 02FA4683 FA5EC407 882602FD F28683FD F29EC400 16E9FDF4 ¶»Õ..á.·»..·».&..á^'.F'.&..á^... 000180
FDF28689 00022DFC 5688FA46 88FFD2E9 0003E903 73021887 3926FDF4 9688FDF2 ·»..¶»&9...s.Õ..Õ0..F'.V•·.....·» 0001A0
0374F846 390A4688 001DE903 7D01F4F8 7E81F846 89078826 FDF29EC4 FDF49689 ..¶»á.·»&...F½.-½¶.).Õ...F.9F½t. 0001C0
030170F8 4669E301 0A5E8800 AAE90004 E9000088 0006E900 0DE90001 B80009E9 Õ..¡..Õl.Õ..¡..Õá.Õ¯..^.1DìF½p.. 0001E0
```

Dump of file SATURN:[PCCOMMON.DUMP.DLL]PDLSYN.TMP;1 on 18-APR-1990 10:48:45.27
File ID (771,27,0)   End of file block 276 / Allocated 276

Virtual block number 57 (00000039), 512 (0200) bytes

```
D1C103E0 D1C888F6 46880079 E9037500 F67E83F6 4689FC18 8788263B BA068ED8 Ä..¤;&...•.F-.—.u.Õy..F-.àlÁ.èl 000000
FDF08689 48044788 26FDE89E C402FDF2 AE8309D8 FDEA86C7 FDE88689 145805E0 Á.X...Ò»ú.õ»Ä..Ò·».á.Ò»&.G.H..Þ» 000020
0088261F C426FDE8 9EC40AFD F0866800 38E9037D 00FDF08E 83FDF08E FF0004E9 Õ....Þ».ƒÞ».).Õ;.kÂÞ».á.Ò»&á.&.. 000040
0373FDF2 8639FDE6 9688FDE4 86880789 26FE4688 FDF29EC4 02FDF286 83FE4689 .F±..·».á.·».F±&....Õ»..Ì»9.·»s. 000060
88F84689 078826FD F29EC400 31E90000 B80006E9 FFB7E900 30E90000 B80006E9 Õ..¡..Õ•.ÕŠ.Õ..¡..Õ1.á.·»&...F½. 000080
0003E900 01880006 E9037402 A80A7E81 FF1EE903 72FDF286 39FDEE96 88FDEC86 .š»..Ÿ»9.·»r.Õ...~.¯.t.Õ..¡..Õ.. 0000A0
DA46C7D8 46890A46 88D88E0A BCB81E56 5700003E C8CBC95F 5E1F0000 E9000088 ¡..Õ...^_èùà>..WV.¡¥..Ä.F..FÄúFÕ 0000C0
0088F256 8CF04689 D8468D00 01F446C7 DE4689E0 46890000 B809960C 46C7038E ƒ.úFÉ..¡¯...FÀ.FßúF¶...FÄ.FÞ.V·¡. 0000E0
D45689D2 4689E456 89E24689 02129788 26021087 8826065E C4EC4689 EE468900 ..FŸ.Fšá^.&....&.....Fš.VÕ.F@.Vå 000100
890A4688 0789260A 4688E25E C4C45689 C2468902 16978826 02148788 26065EC4 á^.&....&.....FÕ.Váá^š.F.&...F.. 000120
8910C483 0CC2107B 9A0676FF 0876FF0A 76FF016A 5016CE46 805016F6 4680EA46 FÕ.F-.P.FÕ.Pj..v..v..v..(.ô..á.. 000140
4688065E C40019E9 037402A8 F67E8102 E8E9E646 880006E9 037500E6 7E83E646 Fl.-l.u.Õ...FlÕS..—¯.t.Õ..á^..F 000160
5016FC46 80006A50 16F0468D 02C8E999 A888021A 97892602 18878926 E45688E2 å.VÕ&....&....¡´.Õà..FÞ.Pj..F•.P 000180
00003DE6 468914C4 83000501 849A0676 FF0876FF 0477FF26 065EC450 16EC468D .Fš.Pá^.&.w..v..v..Ç....á..Fl×.. 0001A0
46C7027E E9E6468B 021A9789 26021887 8926E456 88E24688 065EC400 19E90375 u.Õ..á^..Fš.VÕ&....&.....FlÕ-.úF 0001C0
26E25EC4 02E26E83 0096E903 74EA4639 F6468800 D5E9037D 01F4EA7E 810000FA '...~õ¶.).Õl..F-9Fõt.Õ...nã.á^ã& 0001E0
```

Dump of file SATURN:[PCCOMMON.DUMP.DLL]PDLSYN.TMP;1 on 18-APR-1990 10:48:45.27
File ID (771,27,0)   End of file block 276 / Allocated 276

Virtual block number 58 (0000003A), 512 (0200) bytes

```
805016F6 4680002E E9037400 FA7E83C8 5689C646 89D05688 CE4688EA 46890788 ...Fõ.Fõ.VÅ.Fö.Vå.-ª.t.Õ...F-.P. 000000
E9037500 0030E646 8910C483 097F107B 9A0676FF 0876FFEA 76FF016A 5016CE46 Fõ.P|..võ.v..v..(....á..F|=..u.Õ 000020
FA76FFC6 76FFC876 FF0001FA 46C70005 E9037402 ABF67E81 0214E9E6 46880006 ...F|Õ...—¨.t.Õ..úF"...vå.vó.v" 000040
000030E6 468910C4 83002E02 C99A0676 FF0876FF 0477FF26 065EC450 16EC4680 .F‡.Pá^.&.w..v..v..è....á..F|=.. 000060
008C0340 9A0477FF 26065EC4 EC76FFEE 76FF0031 E901D1E9 E6468800 06E90375 u.Õ...F|Õ1.Õ1..vŸ.v‡á^.&.w..M.¥. 000080
E9019DE9 99A88802 1A978926 02188789 26E45688 E2468806 5EC4E646 8906C483 .á..F|á^..Fã.VÕ&....&....|´.Õ..Õ 0000A0
037500E8 7E83E846 89FC1887 88263B8A 068ED803 0170EA46 69E301F6 5E880137 7..^-1Õ|Fõp..Ä..¤;&...=.FÕ.-Õ.u. 0000C0
FFCA76FF CC76FF08 63CC46C7 CA468914 5805E001 C103E001 C888E846 88000FE9 ÕÕ..FÕ.à|Á.è|Á.X..FõúFäc..vë.vò. 0000E0
26065EC4 5016EC46 80505200 0E05EE56 88EC4603 02E0C108 478826EC 5EC4FA76 v"á^‡&.G.èÁ..F‡.VŸ...RP.F‡.Pá^.& 000100
E9E64688 0006E903 75000030 E6468914 C4830E2B 01849A06 76FF0876 FF0477FF .w..v..v..Ç.+..á..F|=..u.Õ...F|Õ 000120
005FE903 7D00067E 83064EFF 0003E906 46894804 478826CA 5EC402E2 6E83011A ...nã.á^Õ&.G.H.FøÕ...Nø.~ø.).Õ_. 000140
C2468807 8926F846 88E25EC4 02E24683 F8468900 88261FC4 26CA5EC4 0AD67668 kvø.á^Õ&á.&...F%.Fã.á^ã.F%&...Fõ 000160
06C4830E 62034D9A 0477FF26 065EC4EC 76FFEE76 FF0031E9 0373E246 39C45688 .Vá9Fãs.Õ1..vŸ.v‡á^.&.w..M.b..á. 000180
E9FF95E9 00A0E999 A9B8021A 97892602 18878926 E45688E2 4688065E C4E64689 .F|á^..Fã.VÕ&....&....|`.Õ..Õ..Õ 0001A0
E45688E2 4688065E C406C483 0EBA0340 9A0477FF 26065EC4 EC76FFEE 76FF002E ...vŸ.v‡á^.&.w..M.¤..á.á^..Fã.VÕ 0001C0
39045688 D24688EA 46890788 26E25EC4 006CE999 A8B8021A 97892602 18878926 &....&....|´.Õl.á^ã&...Fõ.Fø.Vå9 0001E0
```

Dump of file SATURN:[PCCOMMON.DUMP.DLL]PDLSYN.TMP;1 on 18-APR-1990 10:48:45.27
File ID (771,27,0)   End of file block 276 / Allocated 276

Virtual block number 59 (0000003B), 512 (0200) bytes

```
EC76FFEE 76FF021A 97892602 18878926 E45688E2 4688065E C4FDDCE9 0372E246 Fãr.ÕÉ»á^..Fã.VÕ&....&.....vŸ.v‡ 000000
F67E8100 19E90372 E2463904 56880246 8806C483 0B750340 9A0477FF 26065EC4 á^.&.w..M.u..á..Fø.Vå9Fãr.Õ...— 000020
C95F5E1F 0000E999 A8B80006 E999AC88 0006E900 0FE90000 B80009E9 037402AB ¨.t.Õ..|..Õ..Õ..|¯.Õ..|´.Õ..._è 000040
020A0002 00000004 08EA0002 00000003 0C450002 03220003 08700005 000790C8 ù.....p..."...E.......õ......... 000060
00000000 00440004 037F0203 00360004 02280203 00000009 00870002 00000006 ..............(...6.......D..... 000080
4004C483 004F0214 9A0876FF 0A76FF1D 6A0676FF D88EFFFF 881E5657 000006C8 à...WV.|...Ä.v.j..v..v....O..á.ã 0000A0
0010E900 008A0000 880009E9 037500FA 7E83FA46 890000FF FF9A5016 FC468050 P.F=.P......Fª.-ª.u.Õ..|..¤..Õ.. 0000C0
5F5E1F00 00E9FE56 88FC4688 08C483FF FF01849A FC76FFFE 76FF0876 FF0A76FF .v..v..v±.v=.Ç....á..F=.V±Õ...^_ 0000E0
279A5016 F6468D0E 6A1D6A04 77FF2606 5EC4D88E 0008881E 56570000 0AC8CBC9 èùà...WV.|...Äá^.&.w.j.j..F-.P.⁷ 000100
03F36800 6A0A76FF 0C76FF00 8CE9FA46 880006E9 037500FA 7E83FA46 89000000 ....Fª.-ª.u.Õ...FªÕ...v..v.j.hµ. 000120
02478926 1056880E 4688F65E C4078926 124688F6 5EC40000 FFFF9A50 16FC4680 .F=.P.....á^-.F.&..á^-.F..V.&.G. 000140
06478926 F65EC406 C483FFFF 00009A04 77FF2606 5EC40A76 FF0C76FF 04578926 &.W..v..v.á^.&.w.......á.á^-&.G. 000160
89260A47 8926F65E C4033A90 88260338 80882606 5EC402E6 C1FC7688 08578926 &.W..v=è|.á^.&..8.&..:.á^-&.G.&. 000180
00E90000 B8033A90 89260338 808926F8 5688F646 88065EC4 02E6C1FC 768B0C57 W..v=è|.á^..F-.V%&..8.&..:.|..Õ. 0001A0
5689FC46 89033805 08568806 4688088E 006A881E 56570000 0CC8CBC9 5F5E1F00 ..^_èùà...WV.|j..Ä.F..V..8..F=.V 0001C0
26078826 FC5EC400 C1E90377 FC463813 04050856 88064688 04FC4683 0004E9FE ±Õ.¯.F=..F..V....;F=w.Õè.á^=&..& 0001E0
```

Dump of file SATURN:[PCCOMMON.DUMP.DLL]PDLSYN.TMP;1 on 18-APR-1990 10:48:45.27
File ID (771,27,0)   End of file block 276 / Allocated 276

Virtual block number 60 (0000003C), 512 (0200) bytes

```
5689F846 89F65688 F4468800 1DE9F846 89FA4689 000088F6 5689F446 89025788 .W..F¶.V-|...Fª.F%Õ...F¶.V-.F%.V 000000
F45EC400 7AE90375 F64608F4 4688F656 89F44689 0C578826 0A478826 F45EC4FA ªá^¶&.G.&.W..F¶.V-.F¶.F-u.Õz.á^¶ 000020
57392600 57E90374 02473926 0C56880A 4688F45E C40069E9 03740739 260E4688 .F.&9.t.Õ|.á^¶.F..V.&9G.t.ÕW.&9W 000040
26F85EC4 0C578826 0A478826 F45EC400 19E90375 FA4608F8 4688004E E9037404 .t.ÕN..F%.Fªu.Õ..á^¶&.G.&.W.á^%& 000060
C4025789 26078926 FC5EC40C 5788260A 478826F4 5EC40015 E90C5789 260A4789 .G.&.W.Õ..á^¶&.G.&.W.á^=& .&.W.á 000080
0000E900 0088FF2A E9FF5EE9 000CE900 00FFFF9A F476FFF6 76FF0477 FF26065E ^.&.w..v-.v¶.....Õ..Õ^.Õ*. ..Õ.. 0000A0
89260847 89260C56 880A4688 065EC408 8E012E88 1E565700 0000C8CB C95F5E1F .^_èùà...WV.|...Äá^..F..V.&.u.&. 0000C0
1E565700 0110C8CB C95F5E1F 00000E47 C726065E C400000C 47C72606 5EC40A57 W.ã^.&úG...á^.&úG....^_èùà...WV. 0000E0
4680F676 FFF876FF F85689F6 4689021E 97882602 1C878826 065EC408 8E022D88 |-..Äá^.&....&.....F-.V%.v%.v-.F 000100
12E90372 02ACFA7E 81FA46FF 0003E901 F4FA46C7 FEF48689 0000FFFF 9A5016FC =.P.......¶±úFª¶.Õ...Fª.-ª¯.r.Õ. 000120
83FEF486 890000FF FF9A0100 685016FE F6868DFA 76FF0106 E90086E9 FA468801 ..FªÕÑ.Õ...vª..-±.Ph.........¶±. 000140
FEF68680 5016FEF6 868D000A E90003E9 037400FE F68E8000 8EE90374 00FEF4BE ƒ¶±.t.Õ...ƒ-±.t.Õ..ÕÕ...-±.P..-± 000160
8026FEF0 9EC4FEF0 86FF0004 E9FEF296 8CFEF086 89FEF686 800000FF FF9A5016 .P.......-±..Þ±..·±Õ....Þ±á.Þ±&. 000180
1F87F6FF 2A1F8A26 FEF09EC4 0016E903 755F3F80 26FEF09E C40026E9 0375003F ?.u.Õ&.á.Þ±&.?_u.Õ..á.Þ±&..*.-.. 0001A0
FE76FFFA 76FF001D E9037400 3F8026FE F09EC4FF C9E90003 E90003E9 0374071F ..t.Õ..Õ..Õè.á¯Þ±&.?.t.Õ...vª.v± 0001C0
023C3D00 53E90056 E90EC483 00D40062 9A0676FF 0876FF50 16FEF686 80FC76FF .v=..-±.P.v..v..b.å..á.ÕV.ÕS.=<. 0001E0
```

Dump of file SATURN:[PCCOMMON.DUMP.DLL]PDLSYN.TMP;1 on 18-APR-1990 10:48:45.27
File ID (771,27,0)   End of file block 276 / Allocated 276

Virtual block number 61 (0000003D), 512 (0200) bytes

```
E9037502 2E3DFF2D E9037502 263DFF35 E9037501 F83D001B E90376FF 42E90375 u.ðB.v.ð..=½.u.ð5.=&.u.ð-.=..u.ð 000000
02983DFF 0AE90375 027E3DFF 12E90375 026A3DFF 1AE90375 025A3DFF 25E9FF25 %.ð%.=Z.u.ð..=j.u.ð..=~.u.ð..=.. 000020
12C8CBC9 5F5E1F00 00E90000 B8FEE1E9 FEFAE9FE FAE90375 02AA3DFF 02E90375 u.ð..=ª.u.ð¹±ð¹±ðÂ±|..ð...^_èùà. 000040
F676FFF6 5689F446 89022297 8B260220 878B2606 5EC4088E 0261B81E 56570001 ..WV.|a..Äá^.&.. .&..".F¶.V̄-.v- 000060
76FF00BF E9F2468B 0006E903 7500003D F2468900 0002849A 5016F846 8DF476FF .v¶.F½.P......F·=..u.ð...F·ð¢..v 000080
06E90375 00003DF2 46890000 FFFF9A50 16EE468D 186AF876 FFFA76FF F476FFF6 -.v¶.v¹.v½j..FŸ.P......F·=..u.ð. 0000A0
078B26FC 5EC404FC 46830004 E9FE5689 FC4689F0 568BEE46 880096E9 F2468800 ..F·ð...FŸ.Vþ.F=.V±ð...F=.á^=&.. 0000C0
16FEEE86 8D026A37 FF260277 FF26FC5E C4F476FF F676FF00 5DE90375 02470B26 &.G.u.ð]..v-.v¶á^=&.w.&.7j...Ÿ±. 0000E0
02E39A50 16FEEE86 8D5016FE EE868DFF C5E90003 E9037500 003D0000 FFFF9A50 P.....=..u.ð..ðé...Ÿ±.P..Ÿ±.P.D. 000100
03520062 9A0676FF 0876FF50 16FEEE86 8D37FF26 0277FF26 FC5EC402 26680000 ..h&.á^=&.w.&.7..Ÿ±.P.v..v..b.R. 000120
5F5E1F00 00E90000 B80000FF FF9AEE76 FFF076FF F476FFF6 76FFFF90 E90EC483 .á.ð...v-.v¶.vþ.vŸ.....|..ð...^_ 000140
5689F046 89022297 8B260220 878B2606 5EC4088E 03C6881E 56570001 1AC8CBC9 èùà...WV.|ó..Äá^.&.. .&.."..Fþ.V̄ 000160
E9EA468B 0006E903 7500003D EA468900 0003E99A 5016F846 8DF076FF F276FFF2 ·.v·.vþ.F½.P.ð....Fõ=..u.ð...Fõð 000180
00003DEA 46890000 05659A50 16E6468D 186AF876 FFFA76FF F076FFF2 76FF011C ...v·.vþ.v¹.v½j..Fl.P.e....Fõ=.. 0001A0
5EC404FC 46830004 E9FE5689 FC4689E8 568BE646 8800F3E9 EA468B00 06E90375 u.ð...Fõðµ..Fl.Vð.F=.V±ð...F=.á^ 0001C0
8D156A37 FF260277 FF26FC5E C4F076FF F276FF00 BAE90375 02470B26 078B26FC =&..&.G.u.ðo..v·.vþá^=&.w.&.7j.. 0001E0
```

Dump of file SATURN:[PCCOMMON.DUMP.DLL]PDLSYN.TMP;1 on 18-APR-1990 10:48:45.27
File ID (771,27,0)   End of file block 276 / Allocated 276

Virtual block number 62 (0000003E), 512 (0200) bytes

```
EE5689EC 4689F656 8BF4468B FFC6E900 03E90375 00003D00 0004129A 5016F446 F¶.P.....=..u.ð..ð6..F¶.V-.F§.VŸ 000000
26EC5EC4 F076FFF2 76FF005D E9037502 47082607 8B26EC5E C404EC46 830004E9 ð...F§.á^§&..&.G.u.ð]..v·.vþá^§& 000020
868DFFC5 E90003E9 03750000 3D000004 629A5016 FEE6868D 026A37FF 260277FF .w.&.7j...l±.P.b...=..u.ð..ðé... 000040
FEE6868D 37FF2602 77FF26EC 5EC401F8 68000004 7E9A5016 FEE6868D 5016FEE6 l±.P..l±.P.~...h½.á^§&.w.&.7..l± 000060
9AF476FF F676FFF0 76FFF276 FFFF90E9 0EC48304 9E00629A 0676FF08 76FF5016 .P.v..v..b....á.ð...v·.vþ.v-.v¶. 000080
5E1F0000 E9000088 000004B3 9AE676FF E876FFF0 76FFF276 FFFF33E9 00000614 ....ð3..v·.vþ.vð.vl.°...|..ð...^ 0000A0
89F04689 02229788 26022087 8B26065E C4D88E04 CAB81E56 5700011A C8CBC95F  èùà...WV.|ò..Äá^.&.. .&.."..Fþ. 0000C0
EE468800 06E90375 00003DEE 46890000 04E09A50 16F4468D F076FFF2 76FFF256 V̄·.v·.vþ.F¶.P.Ú....FŸ=..u.ð...FŸ 0000E0
003DEE46 89000006 C69A5016 EA468D18 6AF476FF F676FFF0 76FFF276 FF011CE9 ð...v·.vþ.v-.v¶j..Fõ.P.ó....FŸ=. 000100
C404FC46 830004E9 FE5689FC 4689EC56 8BEA468B 00F3E9EE 46880006 E9037500 .u.ð...FŸðµ..Fõ.V§.F=.V±ð...F=.á 000120
196A37FF 260277FF 26FC5EC4 F076FFF2 76FF008A E9037502 47082607 8B26FC5E ^=&..&.G.u.ðo..v·.vþá^=&.w.&.7j. 000140
5689F846 89E8568B E6468BFF C6E90003 E9037500 003D0000 05169A50 16E6468D .Fl.P.....=..u.ð..ð6..Fl.Vð.F½.V 000160
F85EC4F0 76FFF276 FF005DE9 03750247 08260788 26F85EC4 04F84683 0004E9FA ¹ð...F½.á^½&..&.G.u.ð]..v·.vþá^½ 000180
8DFFC5E9 0003E903 7500003D 000005AF 9A5016FE E6868D02 6A37FF26 0277FF26 &.w.&.7j...l±.P.£...=..u.ð..ðé.. 0001A0
E6868D37 FF260277 FF26F85E C402AA68 000005CB 9A5016FE E6868D50 16FEE686 .l±.P..l±.P.ù...h^.á^½&.w.&.7..l 0001C0
E676FFE8 76FFF076 FFF276FF FF90E90E C48305EB 00629A06 76FF0876 FF5016FE ±.P.v..v..b.Š..á.ð...v·.vþ.vð.vl 0001E0
```

Dump of file SATURN:[PCCOMMON.DUMP.DLL]PDLSYN.TMP;1 on 18-APR-1990 10:48:45.27
File ID (771,27,0)   End of file block 276 / Allocated 276

Virtual block number 63 (0000003F), 512 (0200) bytes

```
1F0000E9 00008800 0006009A EA76FFEC 76FFF076 FFF276FF FF33E900 0007759A .u...ð3..v·.vþ.v§.vð.....|..ð... 000000
F8468902 1E978826 021C8788 26065EC4 D88E0628 B81E5657 000112C8 CBC95F5E ^_èùà...WV.|+..Äá^.&....&.....F½ 000020
006A0224 87FF2602 2687FF26 065EC427 1E68F876 FFFA76FF 5016EE46 8DFA5689 .V̄¹.FŸ.P.v¹.v½h.'á^.&.ñ&.&.ñ$.j. 000040
FFF876FF FA76FF00 BCE9F646 8B0006E9 03750000 3DF64689 10C48300 00FFFF9A ......á..F-=..u.ð...F-ð¥..v¹.v½. 000060
E9F6468B 0006E903 7500003D F6468900 0006779A 5016F246 8D036AEE 76FFF076 vþ.vŸj..F·.P.w....F-=..u.ð...F-ð 000080
7502470B 26078B26 FC5EC404 FC468300 04E9FE56 89FC4689 F45688F2 46880093 ...F·.V¶.F=.V±ð...F=.á^=&..&.G.u 0000A0
0007109A 5016FEEE 868D016A 37FF2602 77FF26FC 5EC4F876 FFFA76FF 005AE903 .ðZ..v¹.v½á^=&.w.&.7j...Ÿ±.P.... 0000C0
FC5EC402 6A680000 072C9A50 16FEEE86 8D5016FE EE868D00 32E90374 00003000 .=..t.ð2...Ÿ±.P..Ÿ±.P.,...hj.á^= 0000E0
76FFFF93 E90EC483 074C0062 9A0676FF 0876FF50 16FEEE86 8D37FF26 0277FF26 &.w.&.7..Ÿ±.P.v..v..b.L..á.ð...v 000100
56570001 12C8CBC9 5F5E1F00 00E90000 88000007 619AF276 FFF476FF F876FFFA ¹.v½.v¶.v·.a...|..ð...^_èùà...WV 000120
76FF5016 EE468DFA 5689F846 89021E97 8B26021C 878B2606 5EC4D88E 078CB81E .|...Äá^.&....&.....F½.V̄¹.FŸ.P.v 000140
468910C4 83000007 C19A006A 02248 7FF 26022687 FF26065E C4271E68 F876FFFA ¹.v½h.'á^.&.ñ&.&.ñ$.j..è....á..F 000160
F2468D04 6AEE76FF F076FFF8 76FFFA76 FF00BCE9 F6468800 06E90375 00003DF6 -=..u.ð...F-ð¥..v¹.v½.vþ.vŸj..F· 000180
4689F456 8BF2468B 0093E9F6 46880006 E9037500 003DF646 89000007 ED9A5016 .P.Ú....F-=..u.ð...F-ð...F·.V¶.F 0001A0
F876FFFA 76FF005A E9037502 47082607 8B26FC5E C404FC46 830004E9 FE5689FC =.V±ð...F=.á^=&..&.G.u.ðZ..v¹.v½ 0001C0
8D0032E9 03740000 30000008 309A5016 FEEE868D 016A37FF 260277FF 26FC5EC4 á^=&.w.&.7j...Ÿ±.P.=...=..t.ð2.. 0001E0
```

Dump of file SATURN:[PCCOMMON.DUMP.DLL]PDLSYN.TMP;1 on 18-APR-1990 10:48:45.27
File ID (771,27,0)   End of file block 276 / Allocated 276

Virtual block number 64 (00000040), 512 (0200) bytes

```
EE868037 FF260277 FF26FC5E C4023C68 00000856 9A5016FE EE868D50 16FEEE86 .Ÿ±.P..Ÿ±.P.V...h<.á^=&.w.&.7..Ÿ 000000
F276FFF4 76FFF876 FFFA76FF FF93E90E C4830876 00629A06 76FF0876 FF5016FE ±.P.v..v..b.v..é.Õ...v'.v½.v¶.v· 000020
26065EC4 D88E08A2 881E5657 000112C8 CBC95F5E 1F0000E9 0000B800 0008889A .....|..Õ...^_èùà...WV.|Å..Äé^.& 000040
065EC427 1E68F876 FFFA76FF 5016EE46 8DFA5689 F8468902 1E978826 021C8788 ....&.....F½.V'.FŸ.P.v'.v½h.'é^. 000060
880006E9 03750000 3DF64689 10C48300 0008D79A 006A0224 87FF2602 2687FF26 &.ñ&.&.ñ$.j..=....é..F-=..u.Õ... 000080
F6468900 0009039A 5016F246 8D056AEE 76FFF076 FFF876FF FA76FF00 8CE9F646 F-Õ¥..v'.v½.vÞ.vŸj..F·.P.  ....F- 0000A0
FC468300 04E9FE56 89FC4689 F45688F2 46880093 E9F64688 0006E903 75000030 =..u.Õ...F-Õ...F·.V¶.F=.V±....F= 0000C0
37FF2602 77FF26FC 5EC4F876 FFFA76FF 005AE903 75024708 26078826 FC5EC404 .á^=&..&.G.u.ÕZ..v'.v½á^=&.w.&.7 0000E0
16FEEE86 8D5016FE EE868D00 32E90374 00003000 0009539A 5016FEEE 868D016A j...Ÿ±.P.S...=..t.Õ2...Ÿ±.P..Ÿ±. 000100
9A0676FF 0876FF50 16FEEE86 8D37FF26 0277FF26 FC5EC402 2E680000 096C9A50 P.l...h..á^=&.w.&.7..Ÿ±.P.v..v.. 000120
00E90000 B8000009 A19AF276 FFF476FF F876FFFA 76FFFF93 E90EC483 098C0062 b....é.Õ...v'.v½.v¶.v·.Å...|..Õ. 000140
89021E97 8826021C 87882606 5EC4D88E 0988881E 56570001 12C8CBC9 5F5E1F00 ..^_èùà...WV.||..Äé^.&....&..... 000160
0224B7FF 260226B7 FF26065E C4271E68 F876FFFA 76FF5016 EE468DFA 5689F846 F½.V'.FŸ.P.v'.v½h.'é^.&.ñ&.&.ñ$. 000180
76FFFA76 FF008CE9 F6468800 06E90375 00003DF6 468910C4 83000009 ED9A006A j..Ü....é..F-=..u.Õ...F-Õ¥..v'.v 0001A0
46880006 E9037500 0030F646 8900000A 199A5016 F2468D06 6AEE76FF F076FFF8 ½.vÞ.vŸj..F·.P......F-=..u.Õ...F 0001C0
47082607 8826FC5E C404FC46 830004E9 FE5689FC 4689F456 88F24688 0093E9F6 -Õ...F·.V¶.F=.V±Õ...F=.á^=&..&.G 0001E0
```

Dump of file SATURN:[PCCOMMON.DUMP.DLL]PDLSYN.TMP;1 on 18-APR-1990 10:48:45.27
File ID (771,27,0) End of file block 276 / Allocated 276

Virtual block number 65 (00000041), 512 (0200) bytes

```
699A5016 FEEE8680 016A37FF 260277FF 26FC5EC4 F876FFFA 76FF005A E9037502 .u.ÕZ..v'.v½á^=&.w.&.7j...Ÿ±.P.| 000000
C4029868 00000A82 9A5016FE EE868D50 16FEEE86 8D0032E9 03740000 3D00000A ...=..t.Õ2...Ÿ±.P..Ÿ±.P.....h..é 000020
FF93E90E C4830AA2 00629A06 76FF0876 FF5016FE EE868037 FF260277 FF26FC5E ^=&.w.&.7..Ÿ±.P.v..v..b.Å..é.Õ.. 000040
000004C8 CBC95F5E 1F0000E9 00008800 000AB79A F276FFF4 76FFF876 FFFA76FF .v'.v½.v¶.v·.ñ...|..Õ...^_èùà... 000060
5689FC46 89033A90 88260338 80882606 5EC402E6 C10C7688 D88E0ACE 881E5657 WV.|Õ..Å.v.èl.é^.&..8.&..:..F=.V 000080
0040E903 75FE4608 FC4688FE 5689FC46 890C5788 260A4788 26FC5EC4 0011E9FE ±Õ..é^=&.G.&.W..F=.V±.F=.F±u.Õ@. 0000A0
9A0677FF 260877FF 26FC5EC4 1076FF12 76FF002F E9037407 39260A46 88FC5EC4 é^=.F.&9.t.Õ/..v..v.é^=&.w.&.w.. 0000C0
FFA4E900 0CE90457 88260247 8826FC5E C4000EE9 03740000 3D08C483 001A01EA Õ....é.=..t.Õ..é^=&.G.&.W.Õ..ÕÊ. 0000E0
FF0E76FF 486AD88E 08E4881E 56570000 54C8CBC9 5F5E1F00 00E90000 8A0000B8 |..¤..Õ...^_èùàT..WV.|Õ..ÄjK.v.. 000100
08989A50 16AC4680 5016AC46 8D00F746 C60AC483 0C42022C 9A5016AC 468D0C76 v..F¯.P.,.B..é.ÕF½..F¯.P.F¯.P... 000120
0036E903 7D01F40A 7E810000 00A69A50 16FA468D 03F36800 6A5016AC 46800000 ...F¯.P].hµ..F'.P.Ì....~.¶.).Õ6. 000140
26105EC4 0EC48308 B80BDC9A 0676FF08 76FF0A76 FFFA76FF FC76FF50 16AC468D .F¯.P.v=.v'.v..v..v..Ê.|..é.á^.& 000160
46FF0003 E90000F8 46C70060 E90076E9 0A468800 06E90375 D0080257 89260789 ..&.W..Åu.Õ...F.Õv.Õm.úF½..Õ...F 000180
00008F83 26388C06 8ED803E0 D1F84688 01700A5E 690058E9 037C0088 F87E81F8 ½.-½|.|.ÕX.|^.p..F½IÅ.Ä..¥;&.e.. 0001A0
76FF0876 FF50FE46 8901F405 F84688FA 76FFFC76 FF5016AC 468D003A E9037500 .u.Õ:..F¯.P.v=.v'.F½.¶..F±P.v..v 0001C0
0009E9FE 46880006 E9037500 08025789 26078926 105EC40E C4830CD7 08DC9A06 ..É.=..é.á^.&..&.W..Åu.Õ...F±Õ.. 0001E0
```

Dump of file SATURN:[PCCOMMON.DUMP.DLL]PDLSYN.TMP;1 on 18-APR-1990 10:48:45.27
File ID (771,27,0) End of file block 276 / Allocated 276

Virtual block number 66 (00000042), 512 (0200) bytes

```
87882606 5EC4D88E 0C76881E 56570000 12C8CBC9 5F5E1F00 00E90232 88FF98E9 Õ..|2.Õ...^_èùà...WV.|v..Äé^.&.. 000000
FE5689FC 4689022A 97882602 28878826 065EC4F2 5689F046 89021E97 8826021C ..&.....FÞ.V·á^.&..(.&..*..F=.V± 000020
F076FFF2 76FFFC76 FFFE76FF 0C76FF0E 76FF086A 1076FF12 76FF01C2 E90A4688 .F.Õõ..v..v.j..v..v..v±.v=.v·.vÞ 000040
76FF0E76 FF1076FF 1276FF02 1FE91AC4 8300000D F89A006A 486A1476 FF1676FF .v..v.jHj..½....é.Õ...v..v..v..v 000060
E918C483 00000E25 9A006A4C 6A1476FF 1676FFF0 76FFF276 FFFC76FF FE76FF0C ..v±.v=.v·.vÞ.v..v.jLj..X....é.Õ 000080
1476FF16 76FFF076 FFF276FF FC76FFFE 76FF0C76 FF0E76FF 1076FF12 76FF01F2 ·..v..v..v..v..v±.v=.v·.vÞ.v..v. 0000A0
FE76FF0C 76FF0E76 FF076A10 76FF1276 FF01C5E9 18C48300 000E549A 006A406A jHj..T....é.Õé..v..v.j..v..v..v± 0000C0
76FF0196 E91AC483 00000E83 9A006A48 6A1476FF 1676FFF0 76FFF276 FFFC76FF .v=.v·.vÞ.v..v.jHj.......é.Õ...v 0000E0
486A1476 FF1676FF F076FFF2 76FFFC76 FFFE76FF 0C76FF0E 76FF056A 1076FF12 ..v.j..v..v..v±.v=.v·.vÞ.v..v.jH 000100
76FFFE76 FF0C76FF 0E76FF06 6A1076FF 1276FF01 67E91AC4 8300000E 829A006A j..ÿ....é.Õg..v..v.j..v..v..v±.v 000120
FF1276FF 0138E91A C4830000 0EE19A00 6A486A14 76FF1676 FFF076FF F276FFFC =.v·.vÞ.v..v.jHj..Å....é.Õ8..v.. 000140
006A486A 1476FF16 76FFF076 FFF276FF FC76FFFE 76FF0C76 FF0E76FF 096A1076 v.j..v..v..v±.v=.v·.vÞ.v..v.jHj. 000160
FFFC76FF FE76FF0C 76FF0E76 FF0A6A10 76FF1276 FF0109E9 1AC48300 000F109A ......é.Õ...v..v.j..v..v..v±.v=. 000180
04789A0A 5E8D000A E91AC483 00000F55 9A006A48 6A1476FF 1676FFF0 76FFF276 v·.vÞ.v..v.jHj..U....é.ÕÖ..^..x. 0001A0
76FF0C76 FF0E76FF 046AF476 FFF676FF F876FFFA 76FF0C8A 05989AF4 5E8D0F28 (..^¶......v'.v½.v—.v¶j..v..v..v 0001C0
88EE4689 1EC48300 00FFFF9A 006A496A 1476FF16 76FFF076 FFF276FF FC76FFFE ±.v=.v·.vÞ.v..v.jIj.......é..FŸ. 0001E0
```

Dump of file SATURN:[PCCOMMON.DUMP.DLL]PDLSYN.TMP;1 on 18-APR-1990 10:48:45.27
File ID (771,27,0) End of file block 276 / Allocated 276

Virtual block number 67 (00000043), 512 (0200) bytes

```
 01FD3000 13E9037E 01FE3000 36E9037E FF1DE903 75023C3D 0086E900 8FE9EE46 FŸÕ..Õ..=<.u.Õ..-.Õ6.=±.-.Õ..=». 000000
 FEBEE903 75022E3D FE3DE903 75022630 005EE9FE 75E90375 01F83DFF 95E9037C |.Õ..=½.u.Õu±Õ^.=&.u.Õ=±=..u.Õ/± 000020
 FF2BE903 75023E3D 0013E903 7EFF38E9 03750261 300043E9 FF43E903 75023230 =2.u.ÕC.ÕC.=a.u.Õ8.-.Õ..=>.u.Õ+. 000040
 03750298 3DFF3FE9 0375028C 3DFE5CE9 0375026A 300023E9 FF23E903 7502513D =Q.u.Õ#.Õ#.=j.u.Õ\±=..u.Õ?.=..u. 000060
 1E565700 0006C8CB C95F5E1F 0000E900 00B80000 E9FDBBE9 037502AA 3DFED9E9 Õ1±=ˆ.u.ÕE»Õ..|..Õ...^ èùà...WV. 000080
 0A76FF0C 76FF0E76 FF5016FC 46800789 26024789 260000B8 105EC4D8 8E0076B8 ¡v..Äá^.|..&.G.&...F=.P.v..v..v. 0000A0
 890000B8 0009E903 75FA4639 0A468BFA 46890EC4 83106E0C 6E9A0676 FF0876FF .v..v..n.n..á..Fª.F.9Fªu.Õ..¡... 0000C0
 FF0E76FF FC76FFFE 76FF1076 FF1276FF 0000FFFF 9A0C76FF 0E76FFFC 4689FE46 F±.F=.v..v.......v..v..v±.v=.v.. 0000E0
 5700041E C8C8C95F 5E1F0000 E912C483 0044006E 9A0676FF 0876FF0A 76FF0C76 v..v..v..v..n.D..á.Õ...^ èùà...W 000100
 5EC4F846 890E4789 26065EC4 0C478B26 065EC400 00FBE686 C7D88E10 01B81E56 V.¡...Äú.Ì«..á^.&.G.á^.&.G..F½á^ 000120
 0E5EC400 00E90375 000C7E83 FBE49689 FBE28689 F846030A 57882608 47882606 .&.G.&.W..F½..ã«..Õ«..~..u.Õ..á^. 000140
 46891CF4 878BE3D1 D88898FB E8868807 8A26FBE2 9EC40789 26024789 260000B8 |..&.G.&..á.ã«&....Õ«..ÄÌD..¶..F 000160
 05EE7E83 EE46891C F48788E3 D1D88898 FBE88688 01478A26 FBE29EC4 05A8E9EE ŸÕ´.á.ã«&.G...Õ«..ÄÌD..¶..FŸ.~Ÿ. 000180
 F846FF00 0FE90374 07EE7E83 001DE902 46FA46C7 FBE286FF F846FF00 0FE90374 t.Õ...F½..ã«úFªF.Õ...~Ÿ.t.Õ...F½ 0001A0
 FBE88688 01478A26 FBE29EC4 0593E902 49FA46C7 0005E902 56FA46C7 FBE286FF ..ã«úFªV.Õ..úFªI.Õ..á.ã«&.G...Õ« 0001C0
 31FA46C7 FBE286FF F846FF00 0FE90374 05EE7E83 EE46891C F48788E3 D1D88898 ..ÄÌD..¶..FŸ.~Ÿ.t.Õ...F½..ã«úFª1 0001E0
```

Dump of file SATURN:[PCCOMMON.DUMP.DLL]PDLSYN.TMP;1 on 18-APR-1990 10:48:45.27
File ID (771,27,0) End of file block 276 / Allocated 276

Virtual block number 68 (00000044), 512 (0200) bytes

```
 04FA46C7 054BE902 71FA46C7 0553E902 45FA46C7 055BE902 35FA46C7 0005E902 .Õ..úFª5.Õ[.úFªE.ÕS.úFªq.ÕK.úFª. 000000
 4DFA46C7 052BE902 66FA46C7 0533E902 27FA46C7 053BE902 76FA46C7 0543E902 .ÕC.úFªv.Õ;.úFª'.Õ3.úFªf.Õ+.úFªM 000020
 15FA46C7 050BE902 12FA46C7 0513E902 54FA46C7 051BE902 02FA46C7 0523E902 .Õ#.úFª..Õ..úFªT.Õ..úFª..Õ..úFª. 000040
 FBE88688 078A26FB E29EC4EC 568CEA46 89FBEA86 8DF846FF FBE286FF 0503E902 .Õ....ã«.F½..õ«.Fõ.V&á.ã«&....Õ« 000060
 8898FBE8 8688078A 26FBE29E C4FBE286 FF001EE9 EE46891C F48788E3 D1D88898 ..ÄÌD..¶..FŸÕ....ã«á.ã«&....Õ«.. 000080
 C40010E9 037501EE 7E830019 E903750F EE7E83F8 46FFEE46 891CF487 8BE3D1D8 ÄÌD..¶..FŸ.F½.-Ÿ.u.Õ...-Ÿ.u.Õ..á 0000A0
 E9037500 0C7E8300 07C626EA 46FFEA5E C4FFC0E9 078826FB E8868AEA 46FFEA5E ^õ.Fõ..Õ«&..Õà.á^õ.Fõ&6...-..u.Õ 0000C0
 26021EB7 FF26065E C40228B7 FF26022A B7FF2606 5EC4006A 5016FBEA 86800038 B...õ«.Pj.á^.&.ñ*.&.ñ(.á^.&.ñ..& 0000E0
 E9027EFA 46C7FBE6 868916C4 83000013 689A006A 4A6A0E76 FF1076FF 021CB7FF .ñ...v..v.jJj..k....á...Ì«úFª-.Õ 000100
 078826FB E8868AEA 46FFEA5E C4EC568C EA4689FB EA868DF8 46FFFBE2 86FF0445 E...ã«.F½..õ«.Fõ.V&á^õ.Fõ..Õ«&.. 000120
 9EC4FBE2 86FF001E E9EE4689 1CF48788 E3D1D888 98FBE886 88078A26 FBE29EC4 á.ã«&....Õ«..ÄÌD..¶..FŸÕ....ã«á. 000140
 09E90375 04EE7E83 F846FFEE 46891CF4 878BE3D1 D88898FB E8868807 8A26FBE2 ã«&....Õ«..ÄÌD..¶..FŸ.F½.-Ÿ.u.Õ. 000160
 EA46FFEA 5EC4FFC0 E9078826 FBE8868A EA46FFEA 5EC40010 E9037411 EE7E8300 ..~Ÿ.t.Õ..á^õ.Fõ..Õ«&..Õà.á^õ.Fõ 000180
 14700256 9A5016FB EA868D50 16EA468D 0066E903 75000C7E 83F84EFF 0007C626 &6...N½.-..u.Õf..Fõ.P..õ«.P.V.p. 0001A0
 046AF076 FFF276FF F476FFF6 76FF1FA5 A5A5A50A 8E1E0716 F08BF07E 8D08C483 .á..~Þ.Þ....ÕEEEE..v~.v¶.v·.vÞj. 0001C0
 021CB7FF 26021EB7 FF26065E C40228B7 FF26022A B7FF2606 5EC45016 FBEA868D ..õ«.Pá^.&.ñ*.&.ñ(.á^.&.ñ..&.ñ.. 0001E0
```

Dump of file SATURN:[PCCOMMON.DUMP.DLL]PDLSYN.TMP;1 on 18-APR-1990 10:48:45.27
File ID (771,27,0) End of file block 276 / Allocated 276

Virtual block number 69 (00000045), 512 (0200) bytes

```
 86FF0349 E9025AFA 46C7FBE6 86891EC4 83000000 C89A006A 496A0E76 FF1076FF .v..v.jIj..ù....á...Ì«úFªZ.ÕI... 000000
 8BE3D1D8 8898FBE8 8688078A 26FBE29E C4EC568C EA4689F8 EA868DF8 46FFFBE2 ã«.F½..õ«.Fõ.V&á.ã«&....Õ«..ÄÌD. 000020
 F48788E3 D1D88898 FBE88688 078A26FB E29EC4F8 E286FF00 1EE9EE46 891CF487 .¶..FŸÕ....ã«á.ã«&....Õ«..ÄÌD..¶ 000040
 8AEA46FF EA5EC400 10E90375 01EE7E83 0019E903 7510EE7E 83F846FF EE46891C ..FŸ.F½.-Ÿ.u.Õ...-Ÿ.u.Õ..á^õ.Fõ. 000060
 76FF5016 FBEA868D 5016FC46 800007C6 26EA46FF EA5EC4FF C0E90788 26FBE886 .Õ«&..Õà.á^õ.Fõ&6...F=.P..õ«.P.v 000080
 89FBEA86 800081E9 0375000C 7E83FA46 890EC483 14930C6E 9A0676FF 0876FF0A ..v..v..n....á..Fª.~..u.Õ....õ«. 0000A0
 EA868DEA 46FFFFEE E90003E9 0375003F 8026EA5E C4EA46FF 0003E9EC 568CEA46 Fõ.V&Õ...Fõá^õ&.?.u.Õ..ÕŸ..Fõ..õ 0000C0
 86C6FFDF E9EA4EFF 078826EA 5EC4FF47 8A26EA5E C40013E9 0377EA46 39D18CF8 «.19Fõw.Õ..á^õ&.G.á^õ&...NõÕÕ.6. 0000E0
 76FFFE76 FF0E76FF 1076FF08 C4830F20 016E9A50 16FBEA86 8D1EF468 1E27FBEA õ«'.h¶...õ«.P.n. ..á..v..v..v±.v 000100
 8D0228E9 FBE68689 12C48315 53006E9A 0676FF08 76FFFA76 FF5016FB EA868DFC =..õ«.P.vª.v..v..n.S..á...Ì«Õ(.. 000120
 E29EC4FB E286FFF8 46FF0788 26FBE886 8AEA46FF EA5EC4EC 568CEA46 89FBEA86 .õ«.Fõ.V&á^õ.Fõ..Õ«&...F½..ã«á.ã 000140
 26FBE29E C4FBE286 FF001EE9 EE46891C F48788E3 D1D88898 FBE88688 078A26FB «&....Õ«..ÄÌD..¶..FŸÕ....ã«á.ã«& 000160
 7E830024 E9037502 EE7E83F8 46FFEE46 891CF487 8BE3D1D8 8898FBE8 8688078A ....Õ«..ÄÌD..¶..FŸ.F½.-Ÿ.u.Õ$..- 000180
 E903740E EE7E8300 09E90375 09EE7E83 0012E903 7504EE7E 83001BE9 037503EE Ÿ.u.Õ...-Ÿ.u.Õ...-Ÿ.u.Õ...-Ÿ.t.Õ 0001A0
 16FC468D 0007C626 EA46FFEA 5EC4FFA5 E9078826 FBE8868A EA46FFEA 5EC40010 ..á^õ.Fõ..Õ«&..ÕE.á^õ.Fõ&6...F=. 0001C0
 0258FA7E 81FA4689 0EC48310 290C6E9A 0676FF08 76FF0A76 FF5016FB EA868050 P..õ«.P.v..v..v..n.)..á..Fª.-ªX. 0001E0
```

Dump of file SATURN:[PCCOMMON.DUMP.DLL]PDLSYN.TMP;1 on 18-APR-1990 10:48:45.27
File ID (771,27,0) End of file block 276 / Allocated 276

Virtual block number 70 (00000046), 512 (0200) bytes

```
8BE3D1D8 8898FBE8 8688078A 26FBE29E C4EC568C EA4689FB EA868D00 A9E90374 t.Õ`...õ«.Fõ.Vŝé.ã«&....Ò«..ÄìD. 000000
F4878BE3 D1D88898 FBE88688 078A26FB E29EC4FB E286FF00 1EE9EE46 891CF487 .¶..FŸÕ....ã«é.ã«&....Ò«..ÄìD..¶ 000020
FFC9E907 8826FBE8 868AEA46 FFEA5EC4 0010E903 7501EE7E 83F846FF EE46891C ..FŸ.F%.~Ÿ.u.Õ..é^õ.Fõ..Ò«&..Õè. 000040
FF26065E C4006A50 16FBEA86 8D0038E9 0375000C 7E830007 C626EA46 FFEA5EC4 é^õ.Fõ&é...~..u.Õ8...õ«.Pj.é^.&. 000060
9A006A4A 6A0E76FF 1076FF02 1CB7FF26 021EB7FF 26065EC4 022887FF 26022AB7 ñ*.&.ñ(.é^.&.ñ..&.ñ...v..v.jJj.. 000080
FE76FF0E 76FF1076 FF0027E9 0375000C 7E830030 E9FBE686 8916C483 0000126F o....é...l«Õ0..~..u.Õ'..v..v..v± 0000A0
4EFFFBE6 868912C4 83140A0D 6E9A0676 FF0876FF FA76FF50 16FBEA86 8DFC76FF .v•..õ«.P.v*.v..v..n....é...l«.N 0000C0
0000423E 8326388E 068E02AB 07C72612 5EC4FA7C E9F846FF FBE286FF 0083E9F8 ½Õ....ã«.F½Õ|*é^.&û.¨...ƒ;&.>B.. 0000E0
63E90000 8808C483 131E011E 9A37FF26 0277FF26 065EC41E F6681E00 16E90375 u.Õ...h-.é^.&.w.&.7......é.¦..Õc 000100
4E169FA7 FF2E93C0 03FFEAE9 03760013 3D00012D 0038E900 3EE90228 FA46C700 .úF*(.Õ>.Õ;.-..=..v.Õõ..å...Ï..N 000120
8C137E11 C411A411 7C164411 8411AC11 9C119411 3410E411 8C128216 81149F16 .........õ.4.....¯.Ç.D.|.Ê.é.~.¥ 000140
E6868807 8926FA46 88125EC4 0C478926 F8468806 5EC4F846 FF117411 6C118411 ...l.t..F%é^..F½&.G.é^..F*&....l 000160
1F0000E9 0E478826 065EC4D8 8E108388 1E565700 0000C8CB C95F5E1F 0000E9FB «Õ...^_èùà...WV.¦...Äé^.&.G.Õ... 000180
007EE903 74001CF2 3E830001 1CF406C7 D88E16F1 881E5657 000008C8 CBC95F5E ^_èùà.¯.WV.¦þ..Äú.¶....>·..t.Õ~. 0001A0
02470826 078826FC 5EC406FC 46830004 E9FE5E8C FC46891C 7A880001 1CF206C7 ú.·...¦z..F•.^±Õ...F•.é^•&..&.G. 0001C0
8026F85E C4F846FF 0003E9FA 5689F846 8902578B 26078826 FC5EC400 59E90375 u.ÕY.é^•&..&.W..F%.V*Õ...F½é^½&. 0001E0
```

Dump of file SATURN:[PCCOMMON.DUMP.DLL]PDLSYN.TMP;1 on 18-APR-1990 10:48:45.27
File ID (771,27,0) End of file block 276 / Allocated 276

Virtual block number 71 (00000047), 512 (0200) bytes

```
E999AA88 0006E903 75001CF4 8F83E301 D8889807 8A26F85E C40034E9 0375003F ?.u.Õ4.é^½&....ÄìD.e¶..u.Õ..¡`.Õ 000000
76FFFF94 E9FFBDE9 1CF48789 04448826 FC76C4E3 D1D88898 078A26F8 5EC400A0 ..é^½&....ÄìDév•&.D...¶.Õ§.Õ...v 000020
0676FF08 76FF0038 E9037500 022CBF83 26065EC4 04C48317 C302599A 0676FF08 ..v..Y.û..é.é^.&.¢,..u.Õ8..v.._v. 000040
ED09809A 0676FF08 76FF04C4 8317DF08 9A9A0676 FF0876FF 04C48317 D107849A ...ì..é..v..v....Õ..é..v..v..¯.Û 000060
04C48318 0903BE9A 0676FF08 76FF04C4 8317FB0A C69A0676 FF0876FF 04C48317 ..é..v..v..ó.«..é..v..v..ƒ....é. 000080
E9000088 04C48316 3506239A 0676FF08 76FF04C4 83181704 C29A0676 FF0876FF .v..v..õ....é..v..v..#.5..é.|..Õ 0000A0
FF9A5016 FC468D06 76FF0876 FFD88E17 0C881E56 57000052 C8CBC95F 5E1F0000 ...^_èùàR..WV.¦...Ä.v..v..F•.P.. 0000C0
39261456 88124688 FC5EC400 82E9FA46 880006E9 037500FA 7E83FA46 890000FF ....Ŧ*.-*.u.Õ...F*Õý.é^•.F..V.&9 0000E0
76FF1076 FF026A68 008FE900 00880006 E9037513 0A973926 000AE903 74130887 ...t.Õ..&9...u.Õ..¦..Õ..hj..v..v 000100
66E9FA46 880006E9 037500FA 7E83FA46 890AC483 17A70126 9AFC76FF FE76FF0E ..v±.v•.&.Ï..é..F*.-*.u.Õ...F*Õf 000120
C4830000 08039A00 6A0E76FF 1076FF27 12680A76 FF0C76FF 016A5016 AE468D00 ..FÛ.Pj..v..v.h.'.v..v.j.......é 000140
0C9E9A50 16AE468D 5016AE46 8D0034E9 FA468800 06E90375 00FA7E83 FA468912 ..F*.-*.u.Õ...F*Õ4..FÛ.P.FÛ.P... 000160
46890EC4 83188A00 629AFC76 FFFE76FF 5016AE46 8D0E76FF 1076FF02 6A680000 ..hj..v..v..FÛ.P.v±.v•.b....é..F 000180
76FF0A76 FF0C76FF D88E182F 881E5657 000006C8 CBC95F5E 1F0000E9 FA4688FA *.F*Õ...^_èùà...WV.¦/..Ä.v..v..v 0001A0
E9FE4688 0006E903 7500FE7E 83FE4689 0000FFFF 9A5016FA 468D106A 0E76FF10 ..v.j..F*.P......F±.-±.u.Õ...F±Õ 0001C0
F918279A 0676FF08 76FF0A76 FF0C76FF 0E76FF10 76FFFA76 FFFC76FF 036A0025 %.j..v•.v*.v..v..v..v..v..'.* 0001E0
```

Dump of file SATURN:[PCCOMMON.DUMP.DLL]PDLSYN.TMP;1 on 18-APR-1990 10:48:45.27
File ID (771,27,0) End of file block 276 / Allocated 276

Virtual block number 72 (00000048), 512 (0200) bytes

```
468D0676 FF0876FF D88E1914 881E5657 000052C8 CBC95F5E 1F0000E9 12C48318 ..é.Õ...^_èùàR..WV.¦...Ä.v..v..F 000000
124688FC 5EC40082 E9FA4688 0006E903 7500FA7E 83FA4689 0000183F 9A5016FC •.P.?....Ŧ*.-*.u.Õ...F*Õý.é^•.F. 000020
022E6800 8FE90000 880006E9 0375130A 97392600 0AE90374 13088739 26145688 .V.&9...t.Õ..&9...u.Õ..¦..Õ..h.. 000040
0006E903 7500FA7E 83FA4689 0AC4831A 3E01269A FC76FFFE 76FF0E76 FF1076FF .v..v..v±.v•.&.>..é..F*.-*.u.Õ.. 000060
BA9A006A 0E76FF10 76FF2712 680A76FF 0C76FF01 6A5016AE 468D0066 E9FA4688 .F*Õf..FÛ.Pj..v..v.h.'.v..v.j..¤ 000080
AE468D50 16AE468D 0034E9FA 46880006 E9037500 FA7E83FA 468912C4 83000018 ....é..F*.-*.u.Õ...F*Õ4..FÛ.P.FÛ 0000A0
195F0062 9AFC76FF FE76FF50 16AE468D 0E76FF10 76FF022E 68000018 DE9A5016 .P.ß...h...v..v..FÛ.P.v±.v•.b._. 0000C0
0C76FFD8 8E1974B8 1E565700 0006C8CB C95F5E1F 0000E9FA 4688FA46 890EC483 .é..F*.F*Õ...^_èùà...WV.¦t..Ä.v. 0000E0
06E90375 00FA7E83 FA468900 00192C9A 5016FC46 8D0A6A0E 76FF1076 FF0A76FF .v..v..v.j..F•.P.,....F*.-*.u.Õ. 000100
76FF0876 FF0A76FF 0C76FF0E 76FF1076 FFFC76FF FE76FF05 6A0025E9 FA468800 ..F*Õ%.j..v±.v•.v..v..v..v..v..v 000120
0876FFD8 8E1A5988 1E565700 0052C8CB C95F5E1F 0000E912 C48319CF 196C9A06 ..l.Û..é.Õ...^_èùàR..WV.¦Y..Ä.v. 000140
C4008 2E9 FA468800 06E90375 00FA7E83 FA468900 0019849A 5016FC46 8D0676FF .v..F•.P......Ŧ*.-*.u.Õ...F*Õý.é 000160
E9000088 0006E903 75130A97 3926000A E9037413 08873926 14568812 4688FC5E ^•.F..V.&9...t.Õ..&9...u.Õ..¦..Õ 000180
00FA7E83 FA46890A C48318B3 01269AFC 76FFFE76 FF0E76FF 1076FF02 3C68008F ..h<..v..v..v±.v•.&....é..F*.-*. 0001A0
76FF1076 FF271268 0A76FF0C 76FF016A 5016AE46 8D0066E9 FA468800 06E90375 u.Õ...F*Õf..FÛ.Pj..v..v.h.'.v..v 0001C0
AE468D00 34E9FA46 880006E9 037500FA 7E83FA46 8912C483 000019FF 9A006A0E .j.......é..F*.-*.u.Õ...F*Õ4..FÛ 0001E0
```

Dump of file SATURN:[PCCOMMON.DUMP.DLL]PDLSYN.TMP;1 on 18-APR-1990 10:48:45.27
File ID (771,27,0) End of file block 276 / Allocated 276

Virtual block number 73 (00000049), 512 (0200) bytes

```
FC76FFFE 76FF5016 AE468D0E 76FF1076 FF023C68 00001A23 9A5016AE 46805016 .P.FÛ.P.#...h<..v..v..FÛ.P.v±.v= 000000
1AB9B81E 56570000 06C8CBC9 5F5E1F00 00E9FA46 8BFA4689 0EC4831A A400629A .b.Ê..á..F².F²Ö...^_èùà...WV.|¿. 000020
FA7E83FA 46890000 1A719A50 16FC4680 0C6A0E76 FF1076FF 0A76FF0C 76FFD88E .Ä.v..v..v..v.j..F=.P.q....F².-² 000040
0A76FF0C 76FF0E76 FF1076FF FC76FFFE 76FF046A 0025E9FA 46880006 E9037500 .u.Õ...F²Õ%.j..v±.v=.v..v..v..v. 000060
189E881E 56570000 52C8CBC9 5F5E1F00 00E912C4 831B141A 819A0676 FF0876FF .v..v..Ý....á.Õ...^_èùàR..WV.|.. 000080
46880006 E9037500 FA7E83FA 46890000 1AC99A50 16FC4680 0676FF08 76FF088E .Ä.v..v..F=.P.è....F².-².u.Õ...F 0000A0
06E90375 130A9739 26000AE9 03741308 87392614 56881246 88FC5EC4 0082E9FA ²Õý.á^=.F..V.&9...t.Õ..&9...u.Õ. 0000C0
46890AC4 831CC801 269AFC76 FFFE76FF 0E76FF10 76FF0298 68008FE9 00008800 .|..Õ..h...v..v..v±.v=.&.à..á..F 0000E0
2712680A 76FF0C76 FF016A50 16AE468D 0066E9FA 46880006 E9037500 FA7E83FA ².-².u.Õ...F²Õf..FÛ.Pj..v..v.h.' 000100
E9FA4688 0006E903 7500FA7E 83FA4689 12C48300 0018449A 006A0E76 FF1076FF .v..v.j..D....á..F².-².u.Õ...F²Õ 000120
FF5016AE 46800E76 FF1076FF 02986800 0018689A 5016AE46 805016AE 46800034 4..FÛ.P.FÛ.P.h...h...v..v..FÛ.P. 000140
57000006 C8CBC95F 5E1F0000 E9FA4688 FA46890E C4831BE9 00629AFC 76FFFE76 v±.v=.b.Õ..á..F².F²Õ...^_èùà...W 000160
8900001B B69A5016 FC46800A 6A0E76FF 1076FF0A 76FF0C76 FF088E1B FEB81E56 V.|±..Ä.v..v..v..v.j..F=.P.Ñ.... 000180
FF0E76FF 1076FFFC 76FFFE76 FF066A00 25E9FA46 880006E9 037500FA 7E83FA46 F².-².u.Õ...F²Õ%.j..v±.v=.v..v.. 0001A0
57000052 C8CBC95F 5E1F0000 E912C483 1C591BF6 9A0676FF 0876FF0A 76FF0C76 v..v..v..v..-.Y..á.Õ...^_èùàR..W 0001C0
037500FA 7E83FA46 8900001C 0E9A5016 FC468006 76FF0876 FFD88E1C E3881E56 V.|D..Ä.v..v..F=.P......F².-².u. 0001E0
```

Dump of file SATURN:[PCCOMMON.DUMP.DLL]PDLSYN.TMP;1 on 18-APR-1990 10:48:45.27
File ID (771,27,0)   End of file block 276 / Allocated 276

Virtual block number 74 (0000004A), 512 (0200) bytes

```
0AC4831D E201269A FC76FFFE 76FF0E76 FF1076FF 02266800 87E9FA46 8B0006E9 Õ...F²Õ..h&..v..v..v±.v=.&.ã..á. 000000
026A0E76 FF1076FF 0A76FF0C 76FF005E E9FA4688 0006E903 7500FA7E 83FA4689 .F².-².u.Õ...F²Õ^..v..v..v..v.j. 000020
16AE468D 0034E9FA 46880006 E9037500 FA7E83FA 46890000 087F9A50 16AE4680 .FÛ.P......F².-².u.Õ...F²Õ4..FÛ. 000040
9AFC76FF FE76FF50 16AE468D 0E76FF10 76FF0226 6800001C AD9A5016 AE468050 P.FÛ.P.Û...h&..v..v..FÛ.P.v±.v=. 000060
8E1043B8 1E565700 0000C8CB C95F5E1F 0000E9FA 4688FA46 890EC483 102E0062 b....á..F².F²Õ...^_èùà...WV.¡C.. 000080
C4831D78 10389A06 76FF0876 FF0A76FF 0C76FF0E 76FF1076 FF006A00 6A006AD8 Äj.j.j..v..v..v..v..v..v..;.(..á 0000A0
5016FC46 800676FF 0876FFD8 8E1DFD88 1E565700 0052C8CB C95F5E1F 0000E912 .Õ...^_èùàR..WV.|»..Ä.v..v..F=.P 0000C0
0E76FF10 76FF01F8 680087E9 FA468800 06E90375 00FA7E83 FA468900 001D539A .S....F².-².u.Õ...F²Õ..h%..v..v. 0000E0
005EE9FA 46880006 E9037500 FA7E83FA 46890AC4 831E1C01 269AFC76 FFFE76FF .v±.v=.&....á..F².-².u.Õ...F²Õ^. 000100
7500FA7E 83FA4689 00001DA6 9A5016AE 46800264 0E76FF10 76FF0A76 FF0C76FF .v..v..v..v.j..FÛ.P.Ì....F².-².u 000120
FF1076FF 01F86800 001DC79A 5016AE46 805016AE 46800034 E9FA468B 0006E903 .Õ...F²Õ4..FÛ.P.FÛ.P.û...h%..v.. 000140
5E1F0000 E9FA4688 FA46890E C4831E69 00629AFC 76FFFE76 FF5016AE 46800E76 v..FÛ.P.v±.v=.b.Ì..á..F².F²Õ...^ 000160
76FF0C76 FF0E76FF 1076FF00 6A006A00 6AD88E1E 31881E56 57000000 C8CBC95F _èùà...WV.|1..Äj.j.j..v..v..v..v 000180
E8881E56 57000052 C8CBC95F 5E1F0000 E912C483 1ED01E29 9A0676FF 0876FF0A ..v..v..).Â..á.Õ...^_èùàR..WV.|$ 0001A0
880006E9 037500FA 7E83FA46 8900001E 419A5016 FC468006 76FF0876 FFD88E1E ..Ä.v..v..F=.P.A....F².-².u.* .. 0001C0
83FA4689 0AC4831F BE01269A FC76FFFE 76FF0E76 FF1076FF 02AA6800 87E9FA46 F²Õ..h^..v..v..v±.v=.&./..á..F². 0001E0
```

Dump of file SATURN:[PCCOMMON.DUMP.DLL]PDLSYN.TMP;1 on 18-APR-1990 10:48:45.27
File ID (771,27,0)   End of file block 276 / Allocated 276

Virtual block number 75 (0000004B), 512 (0200) bytes

```
16AE468D 026A0E76 FF1076FF 0A76FF0C 76FF005E E9FA468B 0006E903 7500FA7E -².u.Õ...F²Õ^..v..v..v..v.j..FÛ. 000000
AE468050 16AE468D 0034E9FA 46880006 E9037500 FA7E83FA 46890000 1E949A50 P......F².-².u.Õ...F²Õ4..FÛ.P.FÛ 000020
1F0A0062 9AFC76FF FE76FF50 16AE468D 0E76FF10 76FF02AA 6800001E B59A5016 .P.ç...h^..v..v..FÛ.P.v±.v=.b... 000040
6A006AD8 8E1F1F88 1E565700 0000C8CB C95F5E1F 0000E9FA 4688FA46 890EC483 .á..F².F²Õ...^_èùà...WV.|...Äj.j 000060
0000E912 C4831F57 1F179A06 76FF0876 FF0A76FF 0C76FF0E 76FF1076 FF006A00 .j..v..v..v..v..v..v....W..á.Õ.. 000080
001F2F9A 5016FC46 800676FF 0876FFD8 8E1FD988 1E565700 0006C8CB C95F5E1F .^_èùà...WV.|\..Ä.v..v..F=.P./.. 0000A0
08873926 14568812 4688FC5E C4003DE9 FA468800 06E90375 00FA7E83 FA468900 ..F².-².u.Õ...F²Õ=.á^=.F..V.&9.. 0000C0
FF0E76FF 1076FF02 6A68001A E9000088 0006E903 75130A97 3926000A E9037413 .t.Õ..&9...u.Õ..|..Õ..hj..v..v.. 0000E0
8E200088 1E565700 0006C8CB C95F5E1F 0000E90A C4831FF8 01269AFC 76FFFE76 v±.v=.&.½..á.Õ...^_èùà...WV.|. . 000100
FA468800 06E90375 00FA7E83 FA468900 00201D9A 5016FC46 800676FF 0876FFD8 Ä.v..v..F=.P.. ...F².-².u.Õ...F² 000120
0006E903 75130A97 3926000A E9037413 08873926 14568812 4688FC5E C4003DE9 Õ=.á^=.F..V.&9...t.Õ..&9...u.Õ.. 000140
0000E90A C4832068 01269AFC 76FFFE76 FF0E76FF 1076FF02 2E68001A E9000088 |..Õ..h...v..v..v±.v=.&.h .á.Õ.. 000160
0020809A 5016FC46 800676FF 0876FFD8 8E207088 1E565700 0006C8CB C95F5E1F .^_èùà...WV.|) .Ä.v..v..F=.P.. . 000180
08873926 14568812 4688FC5E C4003DE9 FA468800 06E90375 00FA7E83 FA468900 ..F².-².u.Õ...F²Õ=.á^=.F..V.&9.. 0001A0
FF0E76FF 1076FF02 3C68001A E9000088 0006E903 75130A97 3926000A E9037413 .t.Õ..&9...u.Õ..|..Õ..h<..v..v.. 0001C0
8E20ED88 1E565700 0006C8CB C95F5E1F 0000E90A C48320D8 01269AFC 76FFFE76 v±.v=.&.Ä .á.Õ...^_èùà...WV.|Û . 0001E0
```

Dump of file SATURN:[PCCOMMON.DUMP.DLL]PDLSYN.TMP;1 on 18-APR-1990 10:48:45.27
File ID (771,27,0)   End of file block 276 / Allocated 276

Virtual block number 76 (0000004C), 512 (0200) bytes

```
FA468800 06E90375 00FA7E83 FA468900 0020FD9A 5016FC46 8D0676FF 0876FFD8 Ä.v..v..F=.P.» ...F¹.-¹.u.Ö...F¹ 000000
0006E903 75130A97 3926000A E9037413 08873926 14568812 468BFC5E C4003DE9 Ö=.é^=.F..V.&9...t.Ö..&9...u.Ö.. 000020
0000E90A C4832148 01269AFC 76FFFE76 FF0E76FF 1076FF02 9868001A E9000088 ¡..Ö..h...v..v..v±.v=.&.HI.é.Ö.. 000040
0021609A 5016FC46 8D0676FF 0876FFD8 8E2150B8 1E565700 0006C8CB C95F5E1F .^_èùà...WV.¡]I.Ä.v..v..F=.P.ml. 000060
FFFE76FF 0E76FF10 76FF0226 68001AE9 FA468800 06E90375 00FA7E83 FA468900 ..F¹.-¹.u.Ö...F¹Ö..h&..v..v..v±. 000080
76FFD88E 21CDB81E 56570000 06C8CBC9 5F5E1F00 00E90AC4 8321B801 269AFC76 v=.&.¡I.é.Ö...^_èùà...WV.¡ëI.Ä.v 0000A0
001AE9FA 46880006 E9037500 FA7E83FA 46890000 21D09A50 16FC468D 0676FF08 ..v..F=.P.TI...F¹.-¹.u.Ö...F¹Ö.. 0000C0
C8CBC95F 5E1F0000 E90AC483 22050126 9AFC76FF FE76FF0E 76FF1076 FF01F868 h%..v..v..v±.v=.&..".é.Ö...^_èùà 0000E0
7E83FA46 89000022 2A9A5016 FC468006 76FF0876 FFD88E22 1AB81E56 57000006 ...WV.¡.".Ä.v..v..F=.P.""...F¹.~ 000100
5201269A FC76FFFE 76FF0E76 FF1076FF 02AA6800 1AE9FA46 880006E9 037500FA ¹.u.Ö...F¹Ö..h¯..v..v..v±.v=.&.R 000120
02030000 0004229F 000200DB 00061F82 02030011 CBC95F5E 1F0000E9 0AC48322 ".é.Ö...^_èù........Ü...."...... 000140
02030000 00092267 000200E9 00060B2F 02030000 00061676 0002024E 00092277 w"..N...v......./...Ö...g"...... 000160
02030267 000A1FA3 02030102 00060BCD 02030083 00050CB2 020300F5 00061CFB «...ℨ...ý.......ë........Ë...g... 000180
02030044 00040200 02030128 00071C89 02030036 0004007F 0203009D 0005104C L...........6.......(.......D... 0001A0
00000000 00000000 00000056 000502B7 020300C7 0006064E 02030135 00071600 ....5...N...ú...ñ...V........... 0001C0
8DFA5689 F8468902 1E978B26 021C878B 26065EC4 D88EFFFF B81E5657 00005CC8 à\..WV.¡...Äé^.&....&.....F%.V¹. 0001E0
```

Dump of file SATURN:[PCCOMMON.DUMP.DLL]POLSYN.TMP;1 on 18-APR-1990 10:48:45.27
File ID (771,27,0) End of file block 276 / Allocated 276

Virtual block number 77 (0000004D), 512 (0200) bytes

```
FF26065E C4023068 FE5689FC 468908C4 83FFFF03 A79A0676 FF0876FF 50160A46 F..P.v..v..Ï....é..F=.V±h0. ^.&. 000000
FC468800 01F646C7 00000095 9A505203 36050856 8806468B 033287FF 260334B7 ñ4.&.ñ2..F..V..6.RP.....úF-...F= 000020
26065EC4 02046800 20E90000 F646C700 08E90375 00F67E83 00C1E903 75FE4608 .F±u.Öè..--.u.Ö..úF-..Ö .h..é^.& 000040
076A5016 A8468D00 00FFFF9A 50520336 0508568B 06468B03 3287FF26 033487FF .ñ4.&.ñ2..F..V..6.RP......F´.Pj. 000060
26065EC4 F4468912 C4830000 00F59A00 6AFC76FF FE76FF27 1268F876 FFFA76FF .v¹.v%h.'.v±.v=j..%....é..F¶é^.& 000080
46800000 FFFF9A50 52033605 08568806 46885016 A8468D03 3287FF26 033487FF .ñ4.&.ñ2..F´.P.F..V..6.RP......F 0000A0
6AF44689 10C48300 00FFFF9A 006AFC76 FFFE76FF 27DA68F8 76FFFA76 FF5016A4 Ê.P.v¹.v%hÖ'.v±.v=j.......é..F¶j 0000C0
A65688A4 4688F446 890CC483 0000FFFF 9A006AFC 76FFFE76 FFF876FF FA76FF00 ..v¹.v%.v±.v=j.......é..F¶.FÊ.VI 0000E0
D88E0008 881E5657 000054C8 CBC95F5E 1F0000E9 000088FF 34E9FE56 89FC4689 .F=.V±Ö4.¡..Ö...^_èùàT..WV.¡...Ä 000100
3B68F846 89FA4689 0000B800 01022C87 C726065E C4FE4689 022C878B 26065EC4 é^.&..,..F±é^.&ú.,...¡...F¹.F%h; 000120
46C70000 00549A50 52033605 08568806 46880332 87FF2603 3487FF26 065EC402 .é^.&.ñ4.&.ñ2..F..V..6.RP.T...úF 000140
021EB7FF 26065EC4 0E76FF06 6A5016F8 46800039 E903750C 46080A46 880000FC =...F..F.u.Ö9..F%.Pj..v.é^.&.ñ.. 000160
7500FC7E 83FC4689 14C48300 0002159A 006A0A76 FF0C76FF 28116802 1C87FF26 &.ñ..h.(.v..v.j.......é..F=.-=.u 000180
AC9A0676 FF0876FF 1076FF12 76FF001A E90374FA 460BF846 88008DE9 0003E903 .Ö..Ö...F%.F¹t.Ö...v..v..v..v..¯ 0001A0
26065EC4 5016AC46 8D005DE9 0375FA46 0BF8468B FA5689F8 468908C4 83002D06 .-..é..F%.V¹.F%.F¹u.Ö]..F¯.Pé^.& 0001C0
8DFC4689 10C48300 0000B29A 006AF876 FFFA76FF 271C6802 1CB7FF26 021EB7FF .ñ..&.ñ..h.'.v¹.v%j..ý....é..F=. 0001E0
```

Dump of file SATURN:[PCCOMMON.DUMP.DLL]POLSYN.TMP;1 on 18-APR-1990 10:48:45.27
File ID (771,27,0) End of file block 276 / Allocated 276

Virtual block number 78 (0000004E), 512 (0200) bytes

```
8D0332B7 FF260334 87FF2606 5EC40022 E9037400 FC7E8300 00FFFF9A 5016AC46 F¯.P......~=.t.Ö".é^.&.ñ4.&.ñ2.. 000000
88022C87 8926FE46 88065EC4 0000000A 9A505203 36050856 8806468B 5016AC46 F¯.P.F..V..6.RP.Ö...é^..F±&..,.. 000020
4689022C 87882606 5EC4D88E 013C881E 56570000 54C8CBC9 5F5E1F00 00E9FC46 F=Ö...^_èùàT..WV.¡<..Äé^.&.....F 000040
26033487 FF26065E C4028668 0023E903 75000E7E 83000102 2C87C726 065EC4FE ±é^.&ú.,....~..u.Ö#.h..é^.&.ñ4.& 000060
87FF2606 5EC40230 680020E9 000002D3 9A505203 36050856 8806468B 033287FF .ñ2..F..V..6.RP.&...Ö .h0.é^.&.ñ 000080
080A468B 0000F846 C7000001 7A9A5052 03360508 56880646 88033287 FF260334 4.&.ñ2..F..V..6.RP.z...úF%..F... 0000A0
87FF2606 5EC40E76 FF096A50 16FA468D FA4689FC 46890000 880042E9 03750C46 F.u.Ö8.¡..F=.F¹.F¹.Pj..v.é^.&.ñ 0000C0
F87E83F8 468914C4 83000003 529A006A 0A76FF0C 76FF2811 68021C87 FF26021E ..&.ñ..h.(.v..v.j..R....é..F%.-% 0000E0
1EB7FF26 065EC450 16AC468D 005DE903 75FC4608 FA468800 68E90003 E9037500 .u.Ö..Öh..F¹.F=u.Ö]..F¯.Pé^.&.ñ. 000100
16AC468D F8468910 C4830000 01819A00 6AFA76FF FC76FF27 1C68021C 87FF2602 .&.ñ..h.'.v=.v¹j..Ý....é..F%.F¯. 000120
16AC468D 033287FF 260334B7 FF26065E C40022E9 037400F8 7E830000 02259A50 P.%....~%.t.Ö".é^.&.ñ4.&.ñ2..F¯. 000140
E9F8468B 022C8789 26FE468B 065EC400 0002509A 50520336 0508568B 06468850 P.F..V..6.RP.P...é^..F±&.....F%Ö 000160
021E9788 26021C87 8826065E C4D88E02 72B81E56 5700007E C8CBC95F 5E1F0000 ...^_èùà-..WV.¡r..Äé^.&....&..... 000180
46890CC4 8301E10A 959A0676 FF0876FF 006A006A 0A76FF0C 76FFE856 89E64689 .F¡.Vö.v..v.j.j..v..v....Ä..é..F 0001A0
9A5016F2 46800477 FF26065E C4029AE9 0000BA00 00880009 E9037500 D87E83D8 Ä.~Ä.u.Ö..¡..¤..Ö..é^.&.w..F·.P. 0001C0
87FF2602 22B7FF26 065EC400 00FFFF9A 5016E246 800477FF 26065EC4 00000411 ....é^.&.w..Fã.P.....é^.&.ñ".&.ñ 0001E0
```

Dump of file SATURN:[PCCOMMON.DUMP.DLL]POLSYN.TMP;1 on 18-APR-1990 10:48:45.27
File ID (771,27,0) End of file block 276 / Allocated 276

```
Virtual block number 79 (0000004F), 512 (0200) bytes

 6AEA76FF EC76FF02 20B7FF26 022287FF 26065EC4 0000FFFF 9A5016EA 468D0220  ..Fõ.P.....á^.&.ñ".&.ñ ..vš.võj 000000
 5EC404FC 46830004 E9FE5689 FC46890C 568BDA46 880000FF FF9A5016 DA468D18 ..FÖ.P......FÖ.VÉ.F=.V±Ö...F=.á^ 000020
 0005679A 37FF2602 77FF26FC 5EC45016 E2468D00 1AE90375 02470826 078B26FC =&..&.G.u.Õ...Fã.Pá^=&.w.&.7.g.. 000040
 C40000FF FF9ADA76 FFDC76FF 0220B7FF 26022287 FF26065E C4FFD3E9 D8468900 ..FÄÖ£.á^.&.ñ".&.ñ ..vÉ.vÖ.....á 000060
 C4501602 468D0005 E90375E0 4608DE46 88E05689 DE468902 57882607 88260A5E ^.&..&.W..FB.VÅ.FB.FÅu.Õ(..F@.Pá 000080
 E90C5688 0A468800 09E90374 02573926 0012E903 74073926 E05688DE 46880A5E ^..FB.VÅ&9.t.Õ..&9W.t.Õ...F..V.Õ 0000A0
 065EC4E2 76FFE476 FF006A03 6A505284 56888246 8884568C 824689DE 468D000F ...FB.F..V..F..V.RPj.j..vÕ.vãá^. 0000C0
 DE76FFE0 76FF27E2 68E676FF E876FF02 20B7FF26 022287FF 26065EC4 0477FF26 &.w.á^.&.ñ".&.ñ ..vÕ.vIhã'.vÅ.v8 0000E0
 FFF276FF F476FF00 56E90003 E9037500 D87E8308 468922C4 83000005 859A006A j.......á".FÄ.~Ä.u.Õ..ÕV..v¶.v·. 000100
 5016F246 8D0013E9 03740006 7E830846 890000FF FF9A5016 D6468D02 76FFD476 vå.v@.F@.P......FÄ.~@.t.Õ...F·.P 000120
 FFE076FF 27DA68E6 76FFE876 FF50160E 468D0846 890000FF FF9AD276 FFD476FF .vå.v@......FÄ.FB.P.vÕ.vIhÖ'.vÅ. 000140
 890000FF FF9A5016 F6468DF2 76FFF476 FFFF20E9 10C48300 0006619A 006ADE76 v8j..@....á.Õ ..v¶.v·.F-.P...... 000160
 FF0000FF FF9AF276 FFF476FF 00BAE903 7400F67E 83EE4689 F0468900 0088D846 FÄ|...Fþ.FŸ.—.t.Õ¤..v¶.v·....... 000180
 26022287 FF26065E C40097E9 03740000 300000FF FF9A5016 F8468DF2 76FFF476 v¶.v·.F%.P.....=..t.Õ..á^.&.ñ".& 0001A0
 E9037500 D87E8308 46890000 FFFF9A50 16864680 026AF876 FFFA76FF 022087FF .ñ ..v°.v%j..F..P......FÄ.~Ä.u.Õ 0001C0
 0EC483FF FF0FF99A 0676FF08 76FF0226 68501686 468D5016 D2468DFF BAE90003 ..Õ¤..F@.P.F..Ph&..v..v..°....á. 0001E0

Dump of file SATURN:[PCCOMMON.DUMP.DLL]PDLSYN.TMP;1 on 18-APR-1990 10:48:45.27
File ID (771,27,0)   End of file block 276 / Allocated 276

Virtual block number 80 (00000050), 512 (0200) bytes

 D4568802 4688000F E90374F0 4608EE46 88FF90E9 0003E903 750087E 83084689 .FÄ.-Ä.u.Õ..Õ...FŸ.Fþt.Õ...F@.Vå 000000
 006AEE76 FFF076FF 27E168E6 76FFE876 FFD276FF D476FF00 22E9F056 89EE4689 .FŸ.VþÕ"..vå.v@.vÕ.vIhÄ'.vþ.vŸj. 000020
 9AE276FF E476FF00 0006809A F276FFF4 76FFFF51 E9084689 10C48300 0003139A ......á..FÄÖQ..v¶.v·......vÕ.vã. 000040
 0088088E 03AF881E 56570000 00C8C8C9 5F5E1F00 00E9F056 88EE4688 0000FFFF .....FŸ.VþÕ...^_èùà...WV.|£..Ä|. 000060
 022C8F83 26065EC4 D88E069A 881E5657 0000A4C8 C8C95F5E 1F0000E9 0000BA00 .¤..Õ...^_èùàÉ.¯WV.|...Äá^.&.¢,. 000080
 FA46C700 FF5C86C6 F64689F8 46890000 88011BE9 0000BA00 00880009 E9037400 .t.Õ..|..¤..Õ..|...F%.F-ó.\..úF° 0000A0
 076A5016 A8468D00 ADE90375 FE4608FC 468BFE56 89FC4689 0C5688DA 4688004A J..F..V..F=.V±.F=.F±u.ÕÙ..F´.Pj. 0000C0
 12C48300 0007879A 006AFC76 FFFE76FF 27126802 1C87FF26 021E87FF 26065EC4 á^.&.ñ..&.ñ..h.'.v±.v=j.......á. 0000E0
 1F04681E 5016FF5C 868D0014 E9037500 FF5C8E80 0030E903 7400F47E 83F44689 .F¶.~¶.t.Õ=../\..u.Õ....\..P.h.. 000100
 8D5016A8 46805016 FF5C868D 0000FFFF 9A5016A8 46800000 07659A50 16FA4680 .F°.P.e....F´.P.......\..P.F´.P. 000120
 76FF27DA 68021C87 FF26021E 87FF2606 5EC45016 FC468000 00FFFF9A 5016FA46 F°.P......F=.Pá^.&.ñ..&.ñ..hÖ'.v 000140
 FE468900 00880009 E9037500 F47E83F4 468910C4 83000005 239A006A FC76FFFE ±.v=j..#....á..F¶.~¶.u.Õ..|...F± 000160
 76FF023C 685016FF 5C868D50 16F6468D 0031E903 7500FF5C 8E80FF48 E9FC4689 .F=ÕH../\..u.Õ1..F-.P..\..Ph<..v 000180
 4689F846 890000B8 0009E903 7500F47E 83F44689 0EC48306 180FF99A 0676FF08 ..v..°....á..F¶.~¶.u.Õ..|...F%.F 0001A0
 8326065E C4D88E06 B4881E56 570000A0 C8C8C95F 5E1F0000 E9F85688 F64688F6 -.F-.V%Õ...^_èùà...WV.|Ç..Äá^.&. 0001C0
 FF60868D 00FF6086 C6004AFE 46C7012B E90000BA 00008800 09E90374 00022C8F ¢,..t.Õ..|..¤..Õ+.úF±J.ó.'....'. 0001E0

Dump of file SATURN:[PCCOMMON.DUMP.DLL]PDLSYN.TMP;1 on 18-APR-1990 10:48:45.27
File ID (771,27,0)   End of file block 276 / Allocated 276

Virtual block number 81 (00000051), 512 (0200) bytes

 26021E87 FF26065E C4076A50 16AC468D 0000087D 9A5016FE 468D1F08 681E5016 .P.h...F±.P.)....F¯.Pj.á^.&.ñ..& 000000
 037400F8 7E83F846 8912C483 0000088D 9A006A0A 76FF0C76 FF271268 021C87FF .ñ..h.'.v..v.j..§....á..F%.-%.t. 000020
 0008929A 5016FE46 8D1F0068 1E5016FF 60868D00 0008069A 5016AC46 8D0033E9 Õ3..F¯.P.@.....'..P.h...F±.P.... 000040
 065EC407 6A5016AC 468D0000 08EA9A50 16FE468D 5016AC46 8D5016FF 60868000 ...'..P.F¯.P.F±.P.ŏ....F¯.Pj.á^. 000060
 0007199A 006A0228 87FF2602 2A87FF26 065EC427 1268021C 87FF2602 1E87FF26 &.ñ..&.ñ..h.'á^.&.ñ*.&.ñ(.j..... 000080
 5016FF60 868D0000 07509A50 16AC468D 0033E903 7400F87E 83F84689 12C48300 ..á..F%.-%.t.Õ3..F¯.P.P.....'..P 0000A0
 469A5016 FE468D50 16AC468D 5016FF60 868D0000 08FF9A50 16FE468D 1F0F681E .h...F±.P.......'..P.F¯.P.F±.P.F 0000C0
 890EC483 07C70FF9 9A0676FF 0876FF02 2E685016 FF60868D 5016FA46 8D000007 ....F°.P..'..Ph...v..v..°.ú..á.. 0000E0
 5F5E1F00 00E9FC56 88FA4688 FA4689FC 46890000 880009E9 037500F8 7E83F846 F%.-%.u.Õ..|...F=.F°.F°.V=Õ...^ 000100
 8A000088 0009E903 7400022C 8F832606 5EC4D88E 07F7881E 56570000 A0C8C8C9 èùà...WV.|%..Äá^.&.¢,..t.Õ..|..¤ 000120
 D79A5016 FE468D1F 11681E50 16FF6086 8D00FF60 86C6004A FE46C701 28E90000 ..Õ+.úF±J.ó.'....'..P.h...F±.P.= 000140
 87FF2606 5EC42712 68021C87 FF26021E 87FF2606 5EC4076A 5016AC46 80000009 ....F¯.Pj.á^.&.ñ..&.ñ..h.'á^.&.ñ 000160
 AC468D00 33E90374 00F87E83 F8468912 C4830000 08509A00 6A022887 FF26022A °.&.ñ(.j..P....á..F%.-%.t.Õ3..F¯ 000180
 16FF6086 80000009 EC9A5016 FE468D1F 16681E50 16FF6086 80000008 699A5016 .P.i.....'..P.h...F±.P.š.....'.. 0001A0
 26021E87 FF26065E C4076A50 16AC468D 0000082C 9A5016FE 46805016 AC468D50 P.F¯.P.F±.P.,....F¯.Pj.á^.&.ñ..& 0001C0
 037400F8 7E83F846 8912C483 000009AA 9A006A0A 76FF0C76 FF271268 021C87FF .ñ..h.'.v..v.j..¯....á..F%.-%.t. 0001E0

Dump of file SATURN:[PCCOMMON.DUMP.DLL]PDLSYN.TMP;1 on 18-APR-1990 10:48:45.27
File ID (771,27,0)   End of file block 276 / Allocated 276
```

Virtual block number 82 (00000052), 512 (0200) bytes

```
000A529A 5016FE46 8D1F1868 1E5016FF 60868000 0009C39A 5016AC46 8D0033E9 Õ3..F¯.P.ū.....'..P.h...F±.P.R.. 000000
16FF6086 8D5016FA 468D0000 097F9A50 16FE468D 5016AC46 8D5016FF 60868000 ...'..P.F¯.P.F±.P......F'.P..'.. 000020
00880009 E9037500 F87E83F8 46890EC4 83091A0F F99A0676 FF0876FF 022E6850 Ph...v..v..'....á..F½.-½.u.Õ..¡. 000040
8E094A88 1E565700 0020C8C8 C95F5E1F 0000E9FC 5688FA46 88FA4689 FC468900 ..F•.F'.F'.V•Õ...^_èùà ..WV.¡J.. 000060
46880006 E9037500 E47E83E4 46890000 04009A50 16E0468D 0477FF26 065EC4D8 Äá^.&.w..FÁ.P......Fõ.-õ.u.Õ...F 000080
5EC400DF E9037502 470B2607 88260A5E C400EEE9 03750C46 080A4688 0284E9E4 õÕ...F..F.u.ÕŸ.á^.&..&.G.u.ÕÕ.á^ 0000A0
468000BC E90375F6 460BF446 880001F2 46C7F656 89F44689 02578826 0788260A .&..&.W..F¶.V-úF·...F¶.F-u.Õ¥..F 0000C0
1EB7FF26 065EC404 77FF2606 5EC4E076 FFE276FF 006A036A 5016F446 8D5016E6 Ì.P.F¶.Pj.j..vã.vÅá^.&.w.á^.&.ñ. 0000E0
A19A006A F476FFF6 76FF27E2 68021CB7 FF26021E 87FF2606 5EC4021C B7FF2602 .&.ñ..á^.&.ñ..&.ñ..hã'.v-.v¶j..À 000100
5EC40015 E9037500 F27E8301 E2E90003 E9037500 E47E83E4 468922C4 83000008 ....á".Fõ.-õ.u.Õ..Õã..-·.u.Õ..á^ 000120
439AE676 FFE876FF 5016E046 8D0000F2 46C70257 89260789 26F65688 F44688OA ..F¶.V-&..&.W.úF·...FÁ.P.vÒ.vÌ.C 000140
006AF476 FFF676FF 27DA6802 1CB7FF26 021EB7FF 26065EC4 5016F446 8D00000C ....F¶.Pá^.&.ñ..&.ñ..hÖ'.v-.v¶j. 000160
065EC400 B4E9FF39 E90180E9 0003E903 7500E47E 83E44689 10C48300 000CD19A .Ì....á..Fõ.-õ.u.Õ..Õ..Õ9.ÕÇ.á^. 000180
0003E903 7500E47E 83E44689 00000428 9A5016F8 4680021C B7FF2602 1EB7FF26 &.ñ..&.ñ...F½.P.(....Fõ.-õ.u.Õ.. 0001A0
04479A50 16EE468D 186AF876 FFFA76FF 021CB7FF 26021EB7 FF26065E C40154E9 ÕT.á^.&.ñ..&.ñ...v'.v½j..FŸ.P.G. 0001C0
0004E9FE 5689FC46 89F05688 EE468801 26E90003 E9037500 E47E83E4 46890000 ...Fõ.-õ.u.Õ..Õ&..FŸ.VÞ.F•.V±Õ.. 0001E0
```

Dump of file SATURN:[PCCOMMON.DUMP.DLL]PDLSYN.TMP;1 on 18-APR-1990 10:48:45.27
File ID (771,27,0) End of file block 276 / Allocated 276

Virtual block number 83 (00000053), 512 (0200) bytes

```
260277FF 26FC5EC4 5016E046 800017E9 03750247 0B260788 26FC5EC4 04FC4683 .F•.á^•&..&.G.u.Õ...FÁ.Pá^•&.w.& 000000
04989AEE 76FFF076 FF021CB7 FF26021E 87FF2606 5EC4FFD6 E9000004 7D9A37FF .7.)...Õ•.á^.&.ñ..&.ñ...vÞ.vŸ... 000020
260E5EC4 0088E903 7510460B 0E468800 C6E90003 E9037500 E47E83E4 46890000 ...Fõ.-õ.u.Õ..Õ6..F..F.u.ÕE.á^.& 000040
75EC4608 EA468800 00F246C7 0005E900 01F246C7 EC5689EA 46890257 88260788 ..&.W..Fõ.VšúF·..Õ..úF·...Fõ.Fšu 000060
021EB7FF 26065EC4 E076FFE2 76FF0477 FF26065E C4006A50 16EA468D 0093E903 .Õ...Fõ.Pj.á^.&.w..vã.vÅá^.&.ñ.. 000080
7500E47E 83E44689 18C48300 000D1E9A 006AEA76 FFEC76FF 280F6802 1CB7FF26 &.ñ..h.(.vš.võj.......á..Fõ.-õ.u 0000A0
02578926 078926EC 5688EA46 880E5EC4 0010E903 7500F27E 830050E9 0003E903 .Õ..ÕP..-·.u.Õ..á^..Fõ.Vš&..&.W. 0000C0
0A109A00 6AEA76FF EC76FF27 DA68021C B7FF2602 1EB7FF26 065EC450 16EA468D .Fõ.Pá^.&.ñ..&.ñ..hÖ'.vš.võj.... 0000E0
06759AE0 76FFE276 FFFF5DE9 0003E900 03E90375 00E47E83 E4468910 C4830000 ...á..Fõ.-õ.u.Õ..Õ..Õ]..vã.vÅ.u. 000100
89F64689 0000B8D8 8E0A9D88 1E565700 005AC8CB C95F5E1F 0000E9E4 46880000 ...FõÕ...^_èùàZ..WV.¡...Ä¡...F-. 000120
FF26065E C40E76FF 1076FF50 16FC468D 00F6E900 03E90374 0C46080A 468BF446 F¶.F..F.t.Õ..Õ-..F•.P.v..v.á^.&. 000140
7E83F246 8914C483 000000D3 9A006A0A 76FF0C76 FF281168 021CB7FF 26021EB7 ñ..&.ñ..h.(.v..v.j..&....á..F·.- 000160
B7FF2606 5EC45016 A6468D00 B1E90003 E90374FE 460BFC46 8B0008E9 037400F2 ·.t.Õ...F•.F±t.Õ..ÕŸ..FÌ.Pá^.&.ñ 000180
F27E83F2 468910C4 8300000E 099A006A FC76FFFE 76FF271C 68021CB7 FF26021E ..&.ñ..h.'.v±.v•j.......á..F·.-· 0001A0
27146802 1CB7FF26 021EB7FF 26065EC4 026A5016 F8468000 7DE90003 E9037500 .u.Õ..Õ)..F½.Pj.á^.&.ñ..&.ñ..h.' 0001C0
FF0047E9 0003E903 7500F27E 83F24689 12C48300 000B3F9A 006A0A76 FF0C76FF .v..v.j..?....á..F·.-·.u.ñ..ÕG.. 0001E0
```

Dump of file SATURN:[PCCOMMON.DUMP.DLL]PDLSYN.TMP;1 on 18-APR-1990 10:48:45.27
File ID (771,27,0) End of file block 276 / Allocated 276

Virtual block number 84 (00000054), 512 (0200) bytes

```
021CB7FF 26021EB7 FF26065E C4F876FF FA76FF50 16A6468D 1076FFFC 76FFFE76 v±.v•.v..FÌ.P.v'.v½á^.&.ñ..&.ñ.. 000000
00008800 09E90375 00F27E83 F246891A C4830000 FFFF9A00 6A486A50 16F4468D .F¶.PjHj.......á..F·.-·.u.Õ..¡.. 000020
D88E0055 881E5657 000066C8 CBC95F5E 1F0000E9 F6568BF4 468BF446 89F64689 .F-.F¶.F¶.V-Õ...^_èùàf..WV.¡U..Ä 000040
50169A46 8DFC4689 FE468900 00889A46 899C4689 000088F8 4689FA46 89000088 ¡...F'.F½¡...F..F.¡...F±.F•.F..P 000060
10C48300 000F019A 006A0A76 FF0C76FF 27E96802 1CB7FF26 021EB7FF 26065EC4 á^.&.ñ..&.ñ..hÒ'.v..v.j.......á. 000080
F6468900 0088019A E90003E9 03749C46 0B9A4688 0008E903 7400EA7E 83EA4689 .Fõ.-õ.t.Õ...F..F.t.Õ..Õ..¡...F- 0000A0
006A0A76 FF0C76FF 27E76802 1CB7FF26 021EB7FF 26065EC4 5016F446 8DF44689 .F¶.F¶.Pá^.&.ñ..&.ñ..hÒ'.v..v.j. 0000C0
E90003E9 0374F646 08F4468B 0008E903 7400EA7E 83EA4689 10C48300 000F709A .p....á..Fõ.-õ.t.Õ...F¶.F-t.Õ..Õ 0000E0
E90003E9 037500EA 7E83EA46 8900000A AE9A5016 F8468D04 77FF2606 5EC40152 R.á^.&.w..F½.P.Û....Fõ.-õ.u.Õ..Õ 000100
26021EB7 FF26065E C49A76FF 9C76FFF8 76FFFA76 FF0032E9 0375000E 7E830132 2..-..u.Õ2..v'.v½.v..v.á^.&.ñ..& 000120
FA76FF00 2?E9EA46 8914C483 00000FA2 9A006AF4 76FFF676 FF440768 021CB7FF .ñ..h.D.v-.v¶j..Å....á..FõÕ/..v' 000140
6A9A76FF 9C76FF44 0768021C B7FF2602 1EB7FF26 065EC4F4 76FFF676 FFF876FF .v½.v-.v¶á^.&.ñ..&.ñ..h.D.v..v.j 000160
468DF876 FFFA76FF 00BCE900 03E90375 00EA7E83 EA468914 C4830000 0FF49A00 ..¶....á..Fõ.-õ.u.Õ..Õ¥..v'.v½.F 000180
FF26065E C450169E 468D009E E90003E9 0374EE46 08EC4688 0000FFFF 9A5016EC &.P......F§.FŸt.Õ..Õ...F..Pá^.&. 0001A0
7E83EA46 8910C483 0000102A 9A006AEC 76FFEE76 FF271C68 021CB7FF 26021EB7 ñ..&.ñ..h.'.vŸ.v&j..*....á..Fõ.- 0001C0
1468021C B7FF2602 1EB7FF26 065EC402 6A5016F0 4680006A E90003E9 037500EA õ.u.Õ..Õj..FÞ.Pj.á^.&.ñ..&.ñ..h. 0001E0
```

Dump of file SATURN:[PCCOMMON.DUMP.DLL]PDLSYN.TMP;1 on 18-APR-1990 10:48:45.27
File ID (771,27,0) End of file block 276 / Allocated 276

Virtual block number 85 (00000055), 512 (0200) bytes

```
0034E900 03E90375 00EA7E83 EA468912 C4830000 00949A00 6A0A76FF 0C76FF27 '.v..v.j.......é..Fõ.~õ.u.Õ..Õ4. 000000
021CB7FF 26021EB7 FF26065E C4F076FF F276FF50 169E468D 056AEC76 FFEE76FF .vŸ.vŠj..F..P.v·.vÞé^.&.ñ..&.ñ.. 000020
FF000BE9 0375FA46 0BF8468B EA46891A C4830000 0E4A9A00 6A486A50 16FC468D .F=.PjHj..J....é..Fõ.F%.Fªu.Õ... 000040
000808B7F 02030017 CBC95F5E 1F0000E9 FE568BFC 468B0000 0D3E9AF8 76FFFA76 vª.v½.>....F=.V±Õ...^_èü........ 000060
0008059B 02030000 000503D9 00020000 00040A6D 0002000B 000605F2 020301C8 à...·...Ù...m.......)........... 000080
00090E7C 00020079 000502B0 020300E9 00060BFE 0203006E 0005038D 020301D5 ſ.......n...±...Õ...¯...y...|... 0000A0
000805CB 0203008F 00050A29 02030102 00060C5E 0203016E 000805B8 02030000 ....£...n...^.......)........ú... 0000C0
00081086 020300AD 00050A3D 02030193 00080F2F 02030090 00050362 0203017F ....b......./.......=...Ù....... 0000E0
00060BD0 02030135 0007106A 020301A8 0008054B 02030128 00070EB9 0203019E ....¿...(...K...¨...j...5.  Å... 000100
00000000 00000000 00000000 00000146 00070110 020301BA 00080FC4 020300C7 ú...é...¤.......F..........  ... 000120
830A47F6 26065EC4 FFFFBE56 000012C8 00000000 00000000 00000000 00000000 ................à...Vf..é^.&-ǔ.. 000140
F02D0646 8BF08B04 C483005A 0C349A53 0600ADE9 0374400A 47F62600 B7E90375 u.Õñ.&-G.ât.ÕÜ..S.4.Z..é..Þ.F.-Þ 000160
C404C483 006C0962 9A0676FF 0876FFFA 468932E8 878B06D8 68F9F700 0CB99926 &.¿..%ªkÄ...Õ2.Fª.v..v..b.l..é.é 000180
8D1F1A68 1E617400 FA7E8364 7CC00B02 C4830087 17949A50 E42A0B47 8A26065E ^.&.G.*õP......é..å|d.~ª.ta.h... 0001A0
1E13745C FE7F8026 FC5EC4FE 568CFC46 89F2468D 08C48300 AB01849A 5016F046 FÞ.P.Ç.¨..é..F·.F=.V±é^=&..±\t.. 0001C0
FA76FFFC 76FFFE76 FF0A6AFC 4EFF03E8 08C48300 C3016E9A 5016F046 8D1F1C68 h...FÞ.P.n.û..é.Š..N=j..v±.v=.vª 0001E0
```

Dump of file SATURN:[PCCOMMON.DUMP.DLL]PDLSYN.TMP;1 on 18-APR-1990 10:48:45.27
File ID (771,27,0) End of file block 276 / Allocated 276

Virtual block number 86 (00000056), 512 (0200) bytes

```
26065EC4 FFFFBE03 74C00B04 C483FFFF 17DA9A50 16F0468D 08C48300 D017BE9A .ƒ.Å..é..FÞ.P.Ö....é..ât.ƒ..é^.& 000000
FE76FF1B 74D00BFE 5689FC46 89011017 3E9A0000 04C890CB C95EC68B 000A47C6 6G...ó^èù.à....>....F=.V±.Åt..v± 000020
08C890CB C999C028 9004EB0C C4830034 09A89A06 76FF0876 FF0A76FF 0C76FF50 P.v..v..v..v..´.4..é.Š..+ã.èù.à. 000040
FC76FFF0 8B04C483 01520ABA 9A0676FF 0876FFFC 568CFA46 890E468D 56570000 ..WV.F..Fª.V=.v..v..¤.R..é..Þ.v= 000060
560676FF 0876FFF8 880CC483 01630C8A 9A0676FF 0876FF0A 76FF0C76 FFFA76FF .vª.v..v..v..v..¤.c..é..½.v..v.V 000080
AEF2FFFF B9C03306 7EC41EDE 8BD78BEC 8B55CBC9 5F5EC78B 06C48300 F10B909A ...Þ..é..ú^ èùU.š.=.ß.é-.3á¿..·Û 0000A0
740001C6 F7064688 FE870846 8ED88EC0 8CF928D1 F7AEF2FF FFB90A7E C4FF758D .u.é-.¿..·Ú%1+ª.ã.Ä.F..±.F.%ó..t 0000C0
8B0A76C5 1EDE8BD7 8BEC8B55 CB50C2BC 1FFA8BF3 8BA4F3C9 13A5F3E9 D149A402 .Ê1ÎÕµÊ.èµÊ.µ.ª..ô]ùU.š.=.ß.év.. 0000E0
F3C913A5 F3E9D149 A4027401 A8C78806 7EC4D1F7 AEF2FFFF B9C033C0 8ED88CFE ±.Å.å3á¿..·Ú%1é-..ú¨.t.Ê1ÎÕµÊ.èµ 000100
F7AEF2FF FFB9C033 0A7EC406 76C51EDE 8BD78BEC 8B55C85D C28C1FFA 8BF38BA4 Ê.µ.ª..ô]ùU.š.=.ß.év.é-.3á¿..·Ú% 000120
FFB9C033 067EC4D7 8BEC8B55 00CB5DFA 8BF3881F FFFF1DC0 1B0574A6 F3F928D1 1+ªµÎt..ö.....µ.ª]ù.U.š.=é-.3á¿. 000140
AC0CE30E 4E8BDF8B 0A76C506 7EC41E56 57EC8B55 00CB5DFA 8B9149D1 F7AEF2FF .·Ú%Î1..ª]ù.U.šWV.é-.év..Õ.N.D.¯ 000160
8B06468B 56570000 12C8CB5D E58B5F5E 1FC28CC3 8BAAF3C0 32F8E2AA 0374C00A .ât.¨ã½2âµ¨.Ú.õ.^_.Î]ùà...WV.F.. 000180
8CF07E89 F275081F 1F87F6D8 8B98058A 26479002 E8F07EC4 F25689F0 46890856 V..FÞ.V·é-ÞŠ..G&.¯...Ã-....u·.-Þ. 0001A0
FC46890A C48302D8 25D09A57 F276FF50 04C48302 9802149A 5706006A 006AF246 F·j.j..W......é.P.v·W.ÅXÄ..é..F= 0001C0
57892607 89260A5E C4F2568B C7030247 8826FC5E C416740C 46080A46 88FE5689 .V±.F..F.t.é^=&.G..ú.V·é^.&..&.W 0001E0
```

Dump of file SATURN:[PCCOMMON.DUMP.DLL]PDLSYN.TMP;1 on 18-APR-1990 10:48:45.27
File ID (771,27,0) End of file block 276 / Allocated 276

Virtual block number 87 (00000057), 512 (0200) bytes

```
05989AF4 5E8D02E0 04029A3B C01E8D2D 740240EE 46F7EE46 89078826 FC5EC402 .é^=&...FŸ%FŸa.t-..à;...Å..^¶... 000000
46F69090 68E80257 89260789 26085688 0646880A 5EC47A74 0C46080A 46880314 ...F..F.tzé^..F..V.&..&.W.Šh..-F 000020
989AF45E 80032106 C79A0319 04029A21 3C1E8D19 75203F80 26F05EC4 367481EE Ÿ.tóé^Þ&.?-u...<l......ú.f..^¶.. 000040
740100EE 46F72AEB 002238EA 06C7A5A5 A5A50716 213CBEF4 7E809000 E8034805 .H.Š...~¶/<l..ÉÉÉÉú.ð8".Š*%FŸ..t 000060
A5DA8E1E 0716F08B F47E8D00 0805FE56 8BFC4688 CFE80136 04029A3B C01E8D0B ...à;...6.Šü.F=.V±....~¶.Þ....ÖE 000080
575690CB C95F5EDA 8C3D2A88 1FA5A5A5 A51F161E 071EF476 8D302ABF 1FA5A5A5 ÉÉÉ.¢*=.v¶.....ÉÉÉÉ.|*=.Ö^_èù.VW 0000A0
C3832204 1E8BF38B 5756C08E D08CCB5E 5FA5F300 0A89206E BF20208E C08ED88C .Ä.åf  ¢n ¿..µÉ_^ù.Å.åVW.µ¯..å".û 0000C0
880CC383 22041E8B F38B5756 16E8F38B D98EA5A5 FCD88EC1 8ED98CC0 8CF8880C ..«.å.).è.Å=ÉÉ.Ť.µŠ.VW.µ..å".û.. 0000E0
D08CCB5E 5F03FE47 C6FC7789 22041E89 4E7422C0 F881F38B A5A5FCC1 8ED98CFB «.).è=ÉÉ.µ.«é"tN..å".w=óG±. ^ù.Å 000100
F38B098E A5A5A5A5 FCD88EC1 8ED98CC0 8CF8880C C3832204 1E8BF38B 5756C08E .åVW.µ..å".û..«.å.).è.Å=ÉÉÉÉ.).µ 000120
0E7422C0 F881F38B A5A5A5A5 FCC18ED9 8CF8880C C3832204 1E8BF38B 575618EB Š.VW.µ..å".û..«.).è=ÉÉÉÉ.µ.«å"t. 000140
8EC18ED9 8CD88C57 5604E800 8C575613 E4E9CB5E 5FFC7789 07FE47C6 22041E89 ..å"óG±..w=_^ùÕõ.VW.ÅŠ.VW.Ä.).è. 000160
89CF7422 C0F881A5 A5027403 3CA5A5FE 4588ADFB 880CC383 22041E88 F38BFCD8 Ä=.µ..å".û.¯«Ù.E±ÉÉ<.t.ÉÉ.«å"tÙ. 000180
99078826 C08ED08C 14E80257 88260788 26C08ED0 8CCB5E5F D98EFC5F 8922041E .å"._=.)_^ù.Å.å&..&.W.Š..Å.å&... 0001A0
88000B83 DAF7DBF7 07798024 C78AD088 DA885756 99078803 E8025788 078B0AEB Š....W.Š¯...VW.Õ.Å.ú$.y.XÚXõ.Û.. 0001C0
03FE45C6 0F7500FF 80C18ED9 8CFC7D89 22D43E89 1C7422C0 FF810CC7 8322D43E >å".û...å"t..>å".)=.).è...u.óE±. 0001E0
```

Dump of file SATURN:[PCCOMMON.DUMP.DLL]PDLSYN.TMP;1 on 18-APR-1990 10:48:45.27
File ID (771,27,0) End of file block 276 / Allocated 276

Virtual block number 88 (00000058), 512 (0200) bytes

CB5E5F5D 1C64E8FB 88DB33CB 8887608D 5507FE45 C6FF63E9 CB5E5F19 05E89EB4 Ç.Ò.._^ùÒc.6E±.U§'..û3Û.«Òd.]_^ù 000000
FC7D8922 D43E89B1 7422C0FF 810CC783 FE458AFC 75882204 3E88C08E D88C5756 VW.Ä.ã.>å".u*.E±.û...å"tŸ.>å".)* 000020
3E898C74 22C0FF81 0CC78322 D43E8857 56CB5E5F A5A50274 033CA5A5 FCFE4588 .E±*ÉÉ<.t.ÉÉ_^ùVW.>å".û...å"t..> 000040
885756C0 8ED88C02 EBD08CCB 5E5FABAB FCC033C0 8ED88C03 FE45C6FC 7D8922D4 å".)*6E±..Ä.ã3å*¨¨_^ù.ÄŠ..Ä.åVW. 000060
7F8022D4 1E88FCFB 885756C0 8ED88C02 EBD08C11 E80C22D4 068322D4 1E88FCFB «*..å"..å".Š..ÄŠ..Ä.åVW.«*..å".. 000080
DE885F13 27E857FC 77882090 268955CB 5E5F0C22 D42E83A5 A5FC7788 0D7503FE ±.u..w*ÉÉ..å"._^ùU.&. .w*WÒ'._.B 0000A0
8C02EBD0 8C11EB0C 22D40683 22D41E88 FCFB8857 56C08ED8 8C02EBD0 8CE4EB5D ]Š8.ÄŠ..Ä.åVW.«*..å"..å".Š..ÄŠ.. 0000C0
5E5F0C22 D42E83A5 A5A5A5FC 7788OF75 07FE7F80 22D41E88 FCFB8857 56C08ED8 Ä.åVW.«*..å"..±.u..w*ÉÉÉÉ..å"._^ 0000E0
22D40683 22D41E88 FB885756 C08ED88C 02EBD08C E9EBDF87 F7882746 E8DF87C8 û.ÒÒL'.%.ÒŠÒ.ÄŠ..Ä.åVW.«..å"..Ã* 000100
A5ABFC0C 22D42E83 FE478AF3 8B22D41E 88FB8857 56C08ED8 8C02EBD0 8C10EB0C .Š..ÄŠ..Ä.åVW.«..å".µ.G±..å".*¨E 000120
9F028806 889A48EB 19C3BA19 BEB850EB 199ABA19 9088CB5E 5FA5A502 74033CA5 É<.t.ÉÉ_^ù|..¤..ŠP|ƒ.¤û.ŠH...... 000140
D0E89004 EB1408E8 900AEB13 8DE89010 EB13BEE8 36EB0632 BA062CB8 20502688 .&P |..¤2.Š6Ò/.Š..Ò§.Š..Ò..Š..ÒÅ 000160
BA063888 20502688 9F061D06 889AC30A F7000283 D8F70773 589E2050 268A5013 .P.&P .Xs.%Ä.@.%Òû.......&P |8.¤ 000180
FF047508 748B030A 7C8022D4 36890CEE 8322D436 88515320 90268955 5756063E >.VWU.&. SQ.6å".Ÿ..6å".|...t.u.. 0001A0
F6087403 FB801375 7F01F6FF 32FE5D8A 22D43E88 57CB5E5F 5D5B59D2 FF02EBD0 ÄŠ..@Y[]_^ùW.>å".]±2.-..u..«.t.- 0001C0
FE5D8A22 D43E8857 CBF9CBE4 0B03755F 8001F6F8 7480FF41 F6CB5F08 75F0FF41 A.Þu._ù-Ä..t½-.._u..Òù*ùW.>å".]± 0001E0

Dump of file SATURN:[PCCOMMON.DUMP.DLL]PDLSYN.TMP;1 on 18-APR-1990 10:48:45.27
File ID (771,27,0)   End of file block 276 / Allocated 276

Virtual block number 89 (00000059), 512 (0200) bytes

89CB5E5F 803180FF 320875F7 38FC7588 FE5D8A22 D43E8857 56CB5F7F 2180FF32 2..!._ùVW.>å".]±.u*;%u.2..!._^ù. 000000
56CB5E5F A880F480 ADA5A5CB 5E5FAB80 F480AD08 7503F880 A5FCC18E D98CFC7D )*.).ē*E.«.u.Û.¶.¨_^ùÉÉÛ.¶.¨^ùV 000020
5602EBC0 8ED08C57 5676EB00 0888F388 575604EB 25D8E857 5602EBC0 8ED08C57 W.Ä.åŠ.VWÒÄ%Š.VW.µ|..ŠvVW.Ä.åŠ.V 000040
575604EB 25A8E857 5602EBC0 8ED08C57 565EEB00 0488F388 575604EB 25C0E857 WÒå%Š.VW.µ|..Š^VW.Ä.åŠ.VWÒ'%Š.VW 000060
562EEB00 1488F388 575604EB 2590E857 5602EBC0 8ED08C57 5646EB00 0C88F388 .µ|..ŠFVW.Ä.åŠ.VWÒ.%Š.VW.µ|..Š.V 000080
5602EBC0 8ED08C57 5616EB00 1088F388 575604EB 2578E857 5602EBC0 8ED08C57 W.Ä.åŠ.VWÒx%Š.VW.µ|..Š.VW.Ä.åŠ.V 0000A0
FC7D8710 7407FE7D 80C18ED9 8C22D43E 88D88800 0088F388 575604EB 2560E857 WÒ'%Š.VW.µ|...Ä.>å".).è.)±.t..)* 0000C0
57560FEB 22D43E88 F788256B E821568F 02C383CB 5E5F5D20 3497FF20 90268955 U.&. ..4 ]_^ù.û.¢VIÒk%.%.>å"ŠÒVW 0000E0
575602EB C08ED08C 575676EB 000AB8F3 88575604 EB252FE8 575602EB C08ED08C .Ä.åŠ.VWÒ/%Š.VW.µ|..ŠvVW.Ä.åŠ.VW 000100
88575604 EB24FFE8 575602EB C08ED08C 57565EEB 0006B8F3 88575604 EB2517E8 Ò.%Š.VW.µ|..Š^VW.Ä.åŠ.VWÒ.$Š.VW. 000120
57562EEB 0016B8F3 88575604 EB24E7E8 575602EB C08ED08C 575646EB 000EB8F3 µ|..ŠFVW.Ä.åŠ.VWÒÒ$Š.VW.µ|..Š.VW 000140
575602EB C08ED08C 575616EB 0012B8F3 88575604 EB24CFE8 575602EB C08ED08C .Ä.åŠ.VWÒü$Š.VW.µ|..Š.VW.Ä.åŠ.VW 000160
24B2E856 057407FE 7D80C18E D98C22D4 3E88D888 0002B8F3 88575604 EB24B7E8 Òñ$Š.VW.µ|...Ä.>å".).è.)±.t.VÒÿ$ 000180
00008B00 EB0014B8 12EB0010 8B17EB00 0CB81CEB 00088B21 EB0004B8 FF39E95E ^Ò9.£..Š!£..Š.£..Š.£..Š.£..Š.£.. 0001A0
890CEF83 2B7407F2 7D803974 07FE7D80 22D43E88 57560018 8B03EB00 1CB808E8 Š.£..Š.£..VW.>å".)±.t9.)·.t+.ÿ.. 0001C0
FF209026 89553E73 18FB832F 731CFB83 087D88FC 7D89FC75 8BC08ED8 8C22D43E >å".Ä.å.u*.)*.)..«.s/.«.s>U.&. . 0001E0

Dump of file SATURN:[PCCOMMON.DUMP.DLL]PDLSYN.TMP;1 on 18-APR-1990 10:48:45.27
File ID (771,27,0)   End of file block 276 / Allocated 276

Virtual block number 90 (0000005A), 512 (0200) bytes

E822043E 890CEF83 C47407F2 7D8002C3 83CDEB24 45E802C3 83CB5E5F 5D203497 .4 ]_^ù.û.ÒE$Šë.û..)·.tá.ÿ..>å"Ò 000000
2689550C 22042E83 CB5E5F5D 203097FF 20902689 550C2204 2E83F787 8FEB2430 0$Š¢.%..å".U.&. ..0 ]_^ù..å".U.& 000020
32DF02E7 D0FB8AE3 D0E3D0CB 9E5E5FE0 0AE4D0E8 D1410025 9F5D2034 97FF2090 . ..4 ].%.A1ÒAÒ.Å_^.ûÃDÃD.«AÒ.Ò2 000040
FE448905 87AD0005 B9FB2BFE 884E4E22 D4368BFC C08ED88C 5756000C 8B03EBFF .Š.£..VW.Ä.å«.6å"ÑN.±+«¿..Û...D± 000060
5DE5885E 5F2387E8 037407FE 7D8022D4 3E885756 EC8855C8 5E5FF4E2 47471D8B ..GGå¶_^ùU.åVW.>å".)±.t.ÒñW_^.[] 000080
9A0677FF 260877FF 262E7408 0A47F626 3574830A 47F62606 5EC40000 00C800C8 ù.à...Ã^.&-G..t5&-G..t.&.w.Ž.w.. 0000A0
57892606 47892602 57892607 892699C0 28F70A67 8026065E C404C483 065534CC ä4U..á.á^.&.g.%+à.&..&.W.&.G.&.W 0000C0
773D0C74 00723D27 74006130 98078A26 0A5EC456 00000AC8 90CBC904 47892608 .&.G.èù.à...Vá^.&...=a.t'=r.t.=w 0000E0
90F1EB02 FC46C603 01BE9022 EB0001B9 01FC46C6 F62B9000 EEE999C0 2B137400 .t.+à.ÒŸ..←6F«.¿..Š".ƒ..6F«.Šþ. 000100
3F80260A 5EC40A46 FF80FC46 C6FEE683 0002CE81 43750002 C6F790F4 EB01098E ƒ..Š¶.%6..uC.ö...|±6F«..F.á^.&.? 000120
75C000A9 C6881575 00743D13 74006230 D6740028 3098078A 263374C9 08377400 .t7.èt3&...«+.t¤=b.t.=t.u..6^.åu 000140
01A468FE 4E898DE8 8000CE81 90C4E8C9 280574C0 00A9C688 9000EB40 00CE810E ..ö.ãŠÀ..ó^.ât.+èŠá..ö..Š§.N±hE. 000160
26FC468A 0E5EC4FF 6AE9037D C00BFA46 8908C483 09823180 9A0676FF 0876FF56 V.v..v...1...á..F*.à).Òj.á^..F«& 000180
F8468932 E405E0D1 C103E0D1 C888F9F7 000C8999 26F02DC3 8B380A06 FF0A4788 .G....;.û-Þ&.¿..%*.à1Á.è1Á.Ò2.F% 0001A0
07892699 C02B0E5E 88000004 47C7F85E 88044789 260E5E88 980788F8 5E88C02A *å.^%....^.&.G..^%ÙG.....^.+à.&.. 0001C0
FF560000 04C8C8C9 5EC28CC3 88084788 26FA468A 08578926 06478926 02578926 &.W.&.G.&.W..F*&.G..û.6^èúà...V. 0001E0

Dump of file SATURN:[PCCOMMON.DUMP.DLL]PDLSYN.TMP;1 on 18-APR-1990 10:48:45.27
File ID (771,27,0)   End of file block 276 / Allocated 276

```
Virtual block number 91 (0000005B), 512 (0200) bytes

 81287527 08067E81 13EB0000 FE46C707 750AE208 7E810E75 26FC067E 81380A06 ..;.-.*&u..-.ã.u.úF±..Š..-..'u+. 000000
 F9F7000C B99926F0 20C38815 750C0A47 F626065E C40001FE 46C72475 FFFF087E -...u$úF±..ó^.&-G..u..ü-Þ&.¿..¥* 000020
 75024408 04882052 C68102E6 C1FE7688 90907EEB C0280674 0132E487 F6060868 kÀ.-.ô2.t.+åŠ-...v±èl..óR ...D.u 000040
 F7000CB9 9926F02D 06468805 74000802 54890489 02C4830B CD34E19A 02006814 .h...Ä4ë..á....T..Àtí.F.-Þ&.¿..¥ 000060
 20549488 20528488 02E6C1FE 7688065E C4FC4689 32E405E0 D1C103E0 D1C888F9 *.àlÁ.èlÁ.ô2.F=ó^..v±èl...R ..T 000080
 07C6DE88 04478926 02448902 0088FC76 88025789 26078926 08578926 06478926 &.G,&.W.&..&.W..v*|...D.&.G..8ó. 0000A0
 F9F7000C B99926F0 20084688 000004C8 90CBC95E 00018802 0A4F8026 065E8811 ..^.&.O..|..^èù.à....F.-Þ&.¿..¥* 0000C0
 72741007 F626FC5E C4517400 067E83FE 5E8CFC46 8932E405 E001C103 E001C888 .àlÁ.èlÁ.ô2.F*.^±.~..tQá^*&-..tr 0000E0
 1E0C349A 0876FF0A 76FF5C74 C00802C4 830BDF36 C09A50E4 2A08478A 26085EC4 ó^.&.G.*ôP.à6Ô..á..àt\.v..v..4.. 000100
 89260257 89260789 2699C028 085EC400 000247C7 260007C6 26FC5EC4 04C4830C ..á.á^*&ó..&úG...ó^.+à.&..&.W.&. 000120
 0C3036C0 9A50E42A 08478A26 085EC421 741007F6 26FC5EC4 2AE80857 89260647 G.&.W.Š*á^=&-..tló^.&.G.*ôP.á60. 000140
 8A26065E C4F62856 000004C8 CBC90A4A 0C349A08 76FF0A76 FF0874C0 0802C483 .á..át..v..v..4.J.èùà...V+-á^.&. 000160
 E487F606 D868F9F7 000CB999 26F020C3 88157508 0A47F626 5575023C 03240A47 G.$.<.UU&-G..u..û-Þ&.¿..¥*kÀ.-.ô 000180
 8A260677 FF260877 FF265028 7EC008FC 46890647 28260788 26065E88 39740132 2.t9.^.&..&+G..F=.á-(P&.w.&.w.&. 0001A0
 065EC4FF FF8E200A 4F802606 5EC40874 FC463808 C4830827 333E9A50 E42A0847 G.*ôP.>3'..á.;F=t.ó^.&.O. ƒ..ó^. 0001C0
 000A88EC 8855CBC9 5EC68800 000447C7 26025789 26078926 08578826 06478826 &.G.&.W.&..&.W.&úG....ó^èÙU.š|.. 0001E0

Dump of file SATURN:[PCCOMMON.DUMP.DLL]PDLSYN.TMP;1 on 18-APR-1990 10:48:45.27
File ID (771,27,0)   End of file block 276 / Allocated 276

Virtual block number 92 (0000005C), 512 (0200) bytes

 88064688 3D501689 3D4EA310 56880E46 8830601E 8C3D5EA3 3D64880C 8838DC9A .É;..¡d=Ê^=..'=.F..V.ÊN=..P=.F.. 000000
 0BE90374 25F67E80 038DE900 00305806 C700003D 5A06C73D 3616893D 34A30856 V.É4=..6=ú.Z=..ú.X=..Õ...~%t.Õ. 000020
 32A33038 A33D52A3 3D54A330 3CA33D56 A33D3AA3 3D3EA3C0 2800013D 5C06C703 .ú.\=..+åÊ>=Ê:=ÊV=Ê<=ÊT=ÊR=Ê8=Ê2 000040
 903EEB00 303EC406 C70A46FF 49753001 7F80260A 5EC40020 3EC406C7 304CA33D =ÊL=ú.á> .á^.&...0ul.F.ú.á>0.Š>. 000060
 3D3E3E83 0E75203F 80269028 E800003D 5206C73D 3E06FF00 752B3F80 260A5E88 .^.&.?+u...>=ú.R=..Š(.&.? u..>>= 000080
 0A46FF3D 4C06FFC7 75203F80 260A5EC4 00EB3D32 06FF9014 EB305206 FF1A7500 .u...R=Š....2=Š.á^.&.?-uú..L=.F. 0000A0
 C7E80E3D 62681E0A 76FF0C76 FFD075C0 0802C483 0978E80E 5098078A 260A5E88 .^.&...P.Òx..á..åuI.v..v..hb=.Òù 0000C0
 4C3E8330 62A3D8F7 3062A130 4C06FF0C 7D003062 3E830C56 890A4689 08C48308 ..á..F..V..>b=.)...L=Àb=%ÀÊb=.>L 0000E0
 46FF3D54 06FF2D75 2E3F8026 0A5EC400 203EC406 C7067530 3EC43E83 0D74003D =.t..>á>0u.ú.á> .á^.&.?.u-..T=.F 000100
 5C06C70A 7D003D5C 3E830C56 890A4689 08C48308 7BE80E3D 5C681E0A 76FF060A ...v..h\=.Ò(..á..F..V..>\=.).ú.\ 000120
 006C3D28 7400683D 4074004E 3D3D7400 463D9807 8A260A5E C43D540E FF00013D =....T=á^.&...=F.t==N.t@=h.t+=l. 000140
 80260A5E C40A46FF 03754C3F 80260A5E C4097500 3D3C3E83 00023D3C 06C70675 u.ú.<=...><=.u.á^.&.?Lu..F.á^.&. 000160
 C8EB0008 3D3C06C7 D0EB0010 3D3C06C7 D8EB0001 3D3C06C7 90024EE9 1C75003F ?.u.ÕN..ú.<=..ŠÀú.<=..ŠÀú.<=..Šà 000180
 468B20F8 4683303A 06FF0875 00583005 7400473D 0A740045 3DF84689 98078A26 &....F½=E.t.=G.t.=X.u...:=.F½ .F 0001A0
 0140E903 7500253D 0152E903 7E013FE9 03750063 300191E9 037E7874 00693DF8 ½=i.tx~.Õ..=c.u.Õ?.~.ÕR.=%.u.Õ@. 0001C0
 00EB0000 0247C726 0789263D 58A11FC4 263D4E1E C4157502 3D3C3E83 900159E9 ÕY...><=.u.á.N=&á.ÀX=&..&úG...Š. 0001E0

Dump of file SATURN:[PCCOMMON.DUMP.DLL]PDLSYN.TMP;1 on 18-APR-1990 10:48:45.27
File ID (771,27,0)   End of file block 276 / Allocated 276

Virtual block number 93 (0000005D), 512 (0200) bytes

 30583E83 0170E903 7500305A 3E83043D 4E068307 89263D58 A11FC426 3D4E1EC4 á.N=&á.ÀX=&....N=..>Z=.u.Õp..>X= 000000
 06C73D56 06FF01AC E9FFFF88 01AFE903 75200A47 F626303D34 1EC401B0 E9037400 .t.Õ§.á.4=&-G. u.ÕÉ.¡..Õ¯...V=ú. 000020
 305406FF 3D3A06FF 3D3806FF F2E8086A 90C3EB02 C483019E E80E0A6A 00003032 2=..j..Ò...á.ŠÙ.j.Š·..8=..:=..T= 000040
 39FA4689 3D3CA3C0 287A7401 303C3E83 0081E903 7508303C 3E830004 305C06C7 ú.\=...><=.u.Õ...><=.tz+åÊ<=.F*9 000060
 30622E83 909013EB 00003062 06C70A74 00304C3E 83FA4689 3062A128 74306206 .b=t(Àb=.F*.>L=.t.ú.b=..Š.....b= 000080
 8DE80E3A 6A02C483 0130E80E 106A023D 4E06833D 62A3C02B 027DC008 3062A105 .Àb=.à).+åÊb=..N=.j..ÒO..á.j:.Ò. 0000A0
 C028027D C0083062 A300052D FA468815 7400304C 3E832274 00FA7E83 02C48304 ..á..~*.t".>L=.t..F*-..Êb=.à).+à 0000C0
 E9023D4E 068302C4 8300F1E8 0E106A04 3D4E2E83 00003062 06C79007 EB3062A3 Êb=Š..ú.b=....N=.j..Òb..á...N=.Õ 0000E0
 FF2AE903 49E80EF8 76FFF4E8 016A90FF 39E9026E E80E006A 90FF3FE9 106AFF10 ..j.Õ7..j..Òn.Õ9..j.Š¶.v½.Òl.Õ*. 000100
 3D3C3E83 DA7E0067 3D057C00 6530FF0C E9037500 643090FF 21E90428 E80E256A j%.Ò(.Õ!..=d.u.Õ..=e.|.=g.-Õ.><= 000120
 75006E3D 903AEBFE 5689FC46 89400C56 880A4688 0A4EFF0C 56880A46 88097400 .t..F..V..N..F..V.@.F=.V±Š:.=n.u 000140
 89E90375 0075308F 7400733D FEE0E903 7500703D FEE4E903 75006F3D FE80E903 .Õ.±=o.u.Õõ±=p.u.ÕÀ±=s.t.=u.u.Õ¿ 000160
 C00AF646 88078A26 FC5EC4FC 46FF9034 E80A46FF 9081E8FF 79E90375 00783DFE ±=x.u.Õy.ŠŸ..F.Š4..F=á^=&...F-.à 000180
 89FE5688 FC468806 C483044C E80E0A76 FF0C76FF 500A462B C388EC75 253C0474 t.<Xuš.Ù+F.P.v..v..ÒL..á..F=.V±. 0001A0
 0374200A 47F6263D 341EC4FC 63E90374 C00AF646 88078A26 0A5EC40C 56890A46 F..V.á^.&...F-.åt.Õc=á.4=&-G. t. 0001C0
 740A067E 8300203E C406C706 74003054 3E835657 000012C8 CBC93D58 A1FE51E9 ÕQ±ÀX=èÙà...WV.>T=.t.ú.á> ..-..t 0001E0

Dump of file SATURN:[PCCOMMON.DUMP.DLL]PDLSYN.TMP;1 on 18-APR-1990 10:48:45.27
File ID (771,27,0)   End of file block 276 / Allocated 276
```

Virtual block number 94 (0000005E), 512 (0200) bytes

```
46890257 88260788 26304E1E C4197510 303C3E83 0774023D 3C3E833D 5606FF04 ...V=.><=.t..><=.u.á.N=&..&.W..F 000000
FE46C7FC 46890788 26304E1E C4117400 30563E83 902CEB04 304E0683 FE5689FC =.V±..N=.Š,..>V=.t.á.N=&...F=úF± 000020
46880E74 0030323E 8302304E 0683FE56 89FC4689 99078826 304E1EC4 0EEB0000 ..Š.á.N=&....F=.V±..N=..>2=.t..F 000040
3E83F456 89F24689 30601688 305EA13E C2A3C028 9003EB06 46880674 FE460BFC =.F±t..F.Š..+áÈô>Å^=..'=.F·.V¶.> 000060
5688FC46 882007C6 26F246FF F25EC41D 750A067E 83287D00 FE7E8331 75003056 V=.u1.~±.)+.~..u.á^·.F·&6.-.F=.V 000080
46893040 880000F6 46C79006 EB0001F6 46C7FE56 89FC4689 DAF70002 8308F7FE ±%Å.Ø.%Ö.F=.V±úF-..Š..úF-..¡ə=.F 0000A0
76FF4574 0030543E 830AC483 11A73686 9AFC76FF FE76FF50 1E0676FF FA5E8CF8 ℅.^ª.v..P.v±.v=.Ñ6Ï..á..>T=.tE.v 0000C0
0675083E C23E8300 7EC90BF0 4E89C82B 305C0E88 04C4830C C302149A F876FFFA ª.v℅...û..á...\=+à.Nþ.è~..>ó>.u. 0000E0
F4468CF2 7E89F47F C00849C1 88473005 C62605EB F27EC4F0 4E880000 3EC206C7 ú.ó>...Nþá~·Š.&6.0G.éÏ.á.¶.~·.F¶ 000100
202C8003 7C613C07 74C90804 88078A26 F85EC4F2 76C5EE5E 8C303A0E 88F04E89 .Nþ..:=.^Ÿév·á^½&.....èt.<ə|.., 000120
52060830 3EA11475 0030563E 83EE5E8E F45E8CF2 7689E375 003F8026 F846FF46 F.F½&.?.uÐ.v·.^¶.^Ÿ.>V=.u.À>=..R 000140
000010C8 CBC95F5E 02C48302 FFE80E50 C02B02EB 00018805 7500F67E 83087430 =t..—.u.¦..Š.+áP.Ò...á.^_èúà... 000160
008FE902 304E0683 FA5689F8 46893050 1688304E A10001BE 18740006 7E835657 WV.~..t.ƒ..ÀN=..P=.F½.Vª.¯N=.Ö.. 000180
88263D4E 1EC410EB FA5689F8 46890257 88260788 26304E1E C4137408 303C3E83 .><=.t.á.N=&..&.W..F½.VªŠ.á.N=&. 0001A0
5A881575 FA460BF8 46880E74 08303C3E 8304304E 0683FA5E 8CF84689 FC468907 ..F=.F½.^ª..N=..><=.t..F½.Fªu.¡Z 0001C0
28F45689 F24689FA 5688F846 88FA5E8C F8468920 61880975 00FC7E83 900AEB20  Š...~=.u.¡ə .F½.^ª.F½.Vª.F·.V¶+ 0001E0
```

Dump of file SATURN:[PCCOMMON.DUMP.DLL]PDLSYN.TMP;1 on 18-APR-1990 10:48:45.27
File ID (771,27,0)   End of file block 276 / Allocated 276

Virtual block number 95 (0000005F), 512 (0200) bytes

```
EB107ECE 3B461574 003F8026 F246FFF2 5EC4900E E8305C0E 881C743D 543639F6 -96T=t...\=Š..á^·.F·&.?.t.F;ö~.Š 000000
59E80E57 0875003D 4C3E83FE 2B30623E 88F37500 3F8026F2 46FFF25E C44690ED Ú.Fá^·.F·&.?.uµ.>b=+±.>L=.u.W.ÒY 000020
C483013C E80E5708 7400304C 3E8306C4 8301B3E8 0EF876FF FA76FF56 02C48301 ..á.V.vª.v½.Òª..á..>L=.t.W.Ò<..á 000040
067E8306 7467067E 83FE5689 FC46893D 5016883D 4EA10000 06C890C8 C95F5E02 .^_èù.à...ÀN=..P=.F=.V±.~.gt..~. 000060
007400FA 7E800006 305C06C7 0675003D 543E83FA 4688C02A 9003EB01 B0057547 Gu.¯.Š..*á.Fª.>T=.u.ú.\=...~ª.t. 000080
305E36FF 306036FF 0676FF30 5C36FF3D 3A36FF00 01305C06 C7067500 305C3E83 .>\=.u.ú.\=...6:=.6\=.v..6'=.6^= 0000A0
FF147500 30323E83 187400FA 7E800EC4 83206E1E FF263BC8 068EFC76 FFFE76FF .v±.v=..à;&..n .á..~ª.t..>2=.u.. 0000C0
7500305C 3E831B74 0030323E 8304C483 20721EFF 263BC806 8E305E36 FF306036 6'=.6^=..à;&..r .á..>2=.t..>\=.u 0000E0
00003EC2 06C7083D 4E068304 C483207A 1EFF263B C8068E3D 5E36FF3D 6036FF14 ..6'=.6^=..à;&..z .á...N=.ú.ó>.. 000100
B80574C0 0B04C483 207E1EFF 263BC806 8EFC76FF FE76FF1B 74305206 0B303EA1 À>=..R=t..v±.v=..à;&..~ .á..át.¡ 000120
FF263D34 1EC43C75 00305A3E 83560000 00C890CB C90129E8 0E50C02B 02EB0001 ..Š.+áP.Ò).èù.à...V.>Z=.u<á.4=&. 000140
0676FF53 303636FF 10EBE42A 04882602 478E2607 FF26378B 2606468A 1478044F O.x..F.&.7&..&.G.&..*ôŠ..66=S.v. 000160
56570000 02C890CB C95E3058 06FF9005 EB305A06 FF077540 06C48314 7F300A9A ..O...á.əu...Z=Š....X=^èù.à...WV 000180
E7300A9A 3EC436FF 303436FF 303636FF 1BEB507E F6080676 88577500 305A3E83 .>Z=.uW.v..~-PŠ..66=.64=.6á>..Òó 0001A0
263EC4A0 D478044F FF263034 1EC41E7E C0084EC6 88305A06 FF047540 06C48314 ..á.əu...Z=.6N.à~.á.4=&.O.xà.6>& 0001C0
5F5E3058 06010646 88077500 305A3E83 D4EBE42A 05882602 478E2607 FF263F88 .7&..&.G.&..*ôŠà.>Z=.u..F...X=^_ 0001E0
```

Dump of file SATURN:[PCCOMMON.DUMP.DLL]PDLSYN.TMP;1 on 18-APR-1990 10:48:45.27
File ID (771,27,0)   End of file block 276 / Allocated 276

Virtual block number 96 (00000060), 512 (0200) bytes

```
26065EC4 303436FF 303636FF 22EB5E75 00305A3E 830A7688 56570000 02C8CBC9 èùà...WV.v..>Z=.u^Š".66=.64=á^.& 000000
341EC425 74C0084E C6880646 FF305A06 FF047540 06C48315 59300A9A 5098078A ...P..OY..á.əu...Z=.F..6N.àt%á.4 000020
E42A0588 2602478E 2607FF26 3F882630 341EC407 8A26065E C4CD7804 4FFF263D =&.O.xëá^.&..á.4=&.?&..&.G.&..*ô 000040
30601688 305EA156 00000CC8 CBC95F5E 30580601 0A468807 7500305A 3E83CAEB Šò.>Z=.u..F...X=^_èùà...VÀ^=..'= 000060
468904C4 83119202 149AF476 FF523062 3688FA46 89FC4689 C028F656 89F44689 .F¶.V~+à.F=.Fª.6b=R.v¶......á..F 000080
7500304C 3E834E01 75083EC2 3E8308EB 02EE8305 75103EC2 3E830676 28F028F8 ½+Þ+v..>ó>.u..Ÿ.Š..>ó>.u.N.>L=.u 0000A0
02C483FE 71E80E50 98078A26 F446FF12 75303EC4 3E831975 203F8026 F45EC422 "á^¶&.?-u..>á>Ou..F¶&...P.Òq±.á. 0000C0
E80EFA46 FF077400 067E831B 7400304C 3E83077E F6080874 303EC43E 83F84EFF .N½.>á>Ot..~~..>L=.t..~..t..Fª.Ò 0000E0
8302C483 FE7EE80E 56297500 304C3E83 0070E80E FC46FF07 74003EC2 3E830066 f..>ó>.t..F=.Òp..>L=.u)V.Ò~±.á.. 000100
0040E80E 047500FC 7E830A74 003EC23E 830039E8 0E047500 FA7E830A 7400067E ~..t..~ª.u..Ò9..>ó>.t..~=.u..Òə. 000120
E80E5600 203EC406 C70E7400 304C3E83 06C483FE B5E80EF4 76FFF676 FFF876FF .v½.v~.v¶.Òç±.á..>L=.t.û.á> .V.Ò 000140
CB02C483 FD02E80E 500020B8 03E8002B 88057400 303E3E83 CBC95E02 C483FE38 8±.á.^èù.>>=.t.¦+.Š.¦ .P.C¢=.á.ù 000160
500078B8 03E80058 88057400 303A3E83 1775103E C23E8302 C483FDC8 E80E306A j0.Òà=.á..>ó>.u..>:=.t.¦X.ɔ.,x.P 000180
304E1EC4 12752A3F 80260A5E C40001FE 46C75657 000006C8 CB02C483 FDAAE80E .Ò¨=.á.ùà...WVúF±..á^.&.?ªu.á.N= 0001A0
280A46FF FFFFFE46 C708752D 3F80260A 5EC49060 EB0A46FF 02304E06 83378B26 &.7..N=..F.Š'.á^.&.?-u.úF±...F.+ 0001C0
3EC406C7 0675303C 0A753054 3639387F 393C3F7C 303CFA46 88078A26 0A5E88F6 -.^.&...Fª<0|?<9.;96T=u.<Ou.ù.á> 0001E0
```

Dump of file SATURN:[PCCOMMON.DUMP.DLL]PDLSYN.TMP;1 on 18-APR-1990 10:48:45.27
File ID (771,27,0)   End of file block 276 / Allocated 276

```
Virtual block number 97 (00000061), 512 (0200) bytes

F18830E9 83C803E1 D1CE0302 E1C1CE88 98058A26 187F3930 802606E8 F8880030 0..«Š.&.=9..&....öèÄ..öIÄ.à.Õ0.þ 000000
0C56880A 46883789 26065EC4 F088EEF7 FE46880C 468C0A7E 89DF7D30 30802647 G&.=0)Ô.-..F..F±%Ÿ.Þá^.&.7.F..V. 000020
74003D80 264701EB FC7EC406 4E8AFE5E 8CFC4689 20688857 000004C8 CBC95F5E ^_èùà...W¦h .F•.^±.N.á~•Š.G&.=.t 000040
04C890CB C95FC028 FE468CFC 7E899009 EBFE468C FC7E8900 0188F475 00382611 .Ȅ8.u¶¦...~•.F±Š...~•.F±+å_èù.à. 000060
990A4788 26044789 26C02825 75830A47 F626FC5E C4FE5E8C FC468926 F0880000 ..¦Þ&.F•.^±á^•&-G..uX+å&.G.&.G.. 000080
4683C28C C38817E8 C28CC388 FF0847C6 26025789 26078926 08578926 06478926 &.G.&.W.&..&.W.&6G...û.ôŠ..û.ô.F 0000A0
087238F3 1E38065E 88EC8855 90C8C999 C028B075 38E0163B C375380E 0638OCFC •.;.88uû;.Å8u§+å.èù.U.ɛ.^.;.µ8r. 0000C0
8855CB5D E5880038 F587C6F3 75C08500 00FFFF9A 531822E9 1816E9C0 3300098A ¤..3äÕ..Ô".S......éuµó.%8..Í]ùU. 0000E0
0876FFEC 88552029 E9087EC5 1E990175 0AF98302 33064688 0C4E8801 B35756EC $VW"..N..F.3ø.'.u...é~.Õ) U.$.v. 000100
E8848034 30208C06 C7C850E5 8817DAE9 0374C085 0000FFFF 9A5050C0 330676FF .v.3äPP......àt.ÕÖ..Í]ùú.. 04¯.$ 000120
543E838A B0303120 8C06C708 E881B031 30208C06 C712E883 80333020 8C06C71C .ú.. 03¯.Š.ú.. 01¯.Š.ú.. 10¯..>T 000140
9A20888B 14432EE2 9A208EA3 E42A3231 208C06C7 06758C3C 21521EFF 04740021 !.t...R!<.u.ú.. 12*ôÈ. .ã.C.£. . 000160
2E889A20 8E36FF18 482F3C9A 50FFE405 208EA118 422F3C9A 5000FD88 183A385A Z8:.¦».P.</B.À. .ô.P.</K..6. ... 000180
D1D9D1FA D1D8D1D9 D1FAD129 747F80C2 F7C03302 54880C88 FC22D43E 88C31857 W.û.>å"=...T.3ã%ô..t)!'!!ÍÄ!'!!! 0001A0
C888C3F7 88065589 044D8902 45890000 05C73800 C2818FE6 80D8D1D9 D1FAD108 Ä!'!!ÍÄ.Í..ô.8ú....E..M..U..%û.à 0001C0
D1E201D3 D1E201F8 8AAD0C8A F08AADD4 8AC80AAD C888ADFC 22D43E88 EAE8D08A .ÅŠô.>å"=Ù.àÙ.à.àÙ.Þ.ÈÙ.%ÍãÍÆÍãÍ 0001E0

Dump of file SATURN:[PCCOMMON.DUMP.DLL]PDLSYN.TMP;1 on 18-APR-1990 10:48:45.27
File ID (771,27,0)   End of file block 276 / Allocated 276

Virtual block number 98 (00000062), 512 (0200) bytes

7238002D 3D7747E0 307FF025 E922EC8A F90A80B1 01CA8003 74CD0AD3 D1E2D103 ÆÍãÍÆ.èt..ò.Ÿ..'.$"Õ%Þ.=ÁGw=-.8r 000000
7F803D00 80050873 00D38301 C6801074 01C6F615 720777D1 3AE0D1E0 D1E0D138 ;ÍÁÍÁÍÁ:Íw.r.-ó.t..ó..Æ.s....=.. 000020
0589C033 FEDBE9C3 F78B0589 C68AE38A 024589E5 0AC70A7F E7801674 C00B1774 t..åt..Ô..ú.Í.E..D.ó...%úÕÜ±3å.. 000040
D088DA88 11E8DAF7 15790208 D833D088 1DE8C388 D088DA88 D233C3F7 88024589 .E..%û3ø.Õ.Å.ûŠ..Å3Ù.øy.%ÕŠ..Õ.Å 000060
1DE8C388 C888DA88 D2330474 E99E8480 24C48A00 D8830AF7 D8F70779 C008C388 .û.åy.%Ù%Õ.Ù..á$.Ç.Õt.3ø.Õ.à.ûŠ. 000080
24C48A00 D88309F7 D8F70779 C008C388 C888DA88 11E8D9F7 1579C908 D833C888 .à3Ù.èy.%!Š..Õ.à.û.åy.%Ù%!.`..á$ 0000A0
83C00100 26E803EB 0035E808 E8002BE8 0DE8003A E80785E9 85608DD2 33FF3380 .3.3ø§'.Õç.Õ:.Š.Õ+.Š.Õ5.Š.Õ&..à. 0000C0
2CE8C34E 75D20800 39E803E8 005DE808 E8003EE8 0DE8009C E8C3C801 67750002 ø.ug!àûÕ..Š.Õ>.Š.Õ].Š.Õ9..øuNûÕ, 0000E0
000283F5 D8F7D2F7 D1F70079 FF08C933 0041E803 E8007BE8 08E8002C E80DE800 .Š.Õ,.Š.Õ(.Š.ÕA.3è..y.%!%ø%Å%.ø. 000100
81F980CD 0AE82201 85D83300 1CE803E8 0056E8C3 CAD12175 000183C2 D1000183 .!.!ô.!.ul!ôûÕV.Š.Õ..3Üç."Õ.ë.'. 000120
F98808EE 8391AD91 AD93AD06 0A92AD00 A4E9FDE9 E9C30172 000283C3 130813F5 %.Ù.û.ø.r.ûÕÕ»ÕÉ.Ù..øÙ.Ù.Ù..Ÿ..' 000140
7F20F983 787203FE E9810874 C908E9D1 E901E901 E9D17FE5 8010CE80 F1220F86 Ñ."þ.ô..Í.ÍôÍôÍôÍô.ètÀ.Õ±.rx.' . 000160
D0E4D07F E183F988 E98A04EE 83C186AC C88AADF8 8AACDA8A D2332FE8 25E983CA ò.ÕX$/3ø.Õ¯.%Ù.à¯.è.Ÿ..Õ.'.Å.ÀÕÅ 000180
F501FA80 1A7C08F9 80D9F720 E983997F 20F98347 727EE980 4074C908 DCD0F901 Í'ÀÉ.ètM.Õ~rG.' ...Õ %!.'.|..'.% 0001A0
000A8001 8201FA80 15E3E1E8 08E980F6 32E68AC4 8AF88ADF 8AD30A01 E2800200 Àø.ã..Æ.Õ.%.á.]2-.Õ.ŠÀD..'.ý..Õ. 0001C0
E9C3D088 C0330001 80008 1F9 C3C388D0 88CA8AF3 E2000280 DAD0D801 D8D1EED0 ÀŸÍÀÍÙÀÕ.ø.åµ.ò.À.ûû'Ÿ..Í.3à.ÀûÕ 0001E0

Dump of file SATURN:[PCCOMMON.DUMP.DLL]PDLSYN.TMP;1 on 18-APR-1990 10:48:45.27
File ID (771,27,0)   End of file block 276 / Allocated 276

Virtual block number 99 (00000063), 512 (0200) bytes

89E0737F F0FA817F E680D78B 10EF8306 7C0322D4 36880131 E807B000 68E8FD35 5»Õh.¯.Õ1..6å".|..ÿ..ø.Í..'Þ.sÅ. 000000
7FE680D7 880080EF 81027C03 22D43688 0108E803 800087E8 FD0FE9C3 FE88067C |..±ûÕ.»Õ..¯.Õ...6å".|..ÿ...ø.Í. 000020
880053E8 C3FE8806 7C0110EF 83220436 88001EE8 C3FE8802 7C890F73 7F80FA81 .'..sÕ.|..±ûÕ...6å".ÿ..|..±ûÕS.. 000040
3688C08E A5A5A5A5 C18ED98C C08C22D4 3E88FCC3 FE88027C 010080EF 81220436 6å".ÿ...|..±û=.>å".å.Í.èÉÉÉ.å.6 000060
D1E9D100 35887FE5 80CF88F0 E783064C 89CA0A0F E183F98B 064C8800 108A22D4 å"¤...L..'.Ä..ò.L..ÕÞ.Ù.Í.¦5.ÍÕÍ 000080
8EA5A5C1 8ED98CC0 8C22D43E 88FC0082 E93FE8D9 F7047D04 33E981E9 D1E9D1E9 ÕÍÕÍÕ.Õ3.).%Í$?Õ..•.>å".å.Í.èÉÉ. 0000A0
0018887F E580CF8B 80E78302 4C89CA0A 7FE183F9 88024C8B 00808A22 D43688C0 å.6å"¤...L..'.Ä..ò.L..Õ..ù.Í.|.. 0000C0
C8880A74 C838FA08 8000E781 147CEF88 C838D9F7 487D0096 E981E032 CD8AE1D1 ÍÄ.ë2Ù.Õ..}H%);à.ÿ|..Õ...';àt..à 0000E0
08E98000 04C6140A 00028000 82F501FA 80147C08 F980D233 EA2B8000 E581EF8B .ÿ.Í..+õ3ø.'.|..'.%ý..ø....ó...Õ. 000100
EF8A0001 B8C3348A D188C933 C32C88E8 22EE8AD7 C18A2092 B80CE334 8AE7EB46 FŠÕ.4D.£. .èø.Ÿ"Õ.,û3è.Í.4û£...ÿ 000120
E2D3CC8A FD8B0274 000A8001 8281FA80 D30ADE22 D70AFAE2 D7D0EAD1 06E3E18A .ÀD.ÍõÅøã'.ø"B.Æ.'.ý..Õ.t..».ãÆã 000140
C3F50301 4C747F80 C3F7C3FA E2001480 4606E334 88F202CE 2BC80398 22D40E88 ..å"..à+ö.·.4D.F...ã'ûXû..tL!Æ%û 000160
D3F7E274 D0F77F80 A9D0F7E1 747F80A9 02508826 024488C3 E4D07FCC 80F8C8E9 Õà«.ã.ÀÕû.D.&.].`..tÅ%Å`..%ÅtãXÆ 000180
380A8EC1 8ED98CC2 8CF78793 0873E001 E301D578 EF32EC8A D87403F7 7F80C3F7 %û..%Æt Å.ã2ÿx[!D1Ås...%.ô.!.è.Õ; 0001A0
26064488 C3E4D07F CC80F875 E9C3F5D3 D15E747F F0C3F7C3 053B2604 880575C3 ûu...&;.ûXûÞ.t^!Æ%ûÕu«.ã.Àõû.D.& 0001C0
78EF32EC 8AD874D3 F77FF0C3 F7D3F7E2 7400F77F F0A9D0F7 E1747FF0 A9065088 .].`Þ.tÅ%Å`Þ.%ÅtãXÆ%ûÞ.%ÆtÅ.ã2ÿx 0001E0

Dump of file SATURN:[PCCOMMON.DUMP.DLL]PDLSYN.TMP;1 on 18-APR-1990 10:48:45.27
File ID (771,27,0)   End of file block 276 / Allocated 276
```

Virtual block number 100 (00000064), 512 (0200) bytes

```
880E7504 45382604 44881775 C33BDA8E C18ED98C C28CF787 930B73E0 D1E301D5 (ÍDÍÁs...Ì.ô.).ê.Ö;ûu..D.&;E.u.. 000000
358A015D 88024588 03E880F4 80024588 F787C305 38260488 05750245 38260244 D.&;E.u...&;.ü.Ì.E..¶.Š..E..]..5 000020
E40A6574 ED0AC001 C1D18000 CE81FF00 E7810174 88FF7C88 024C8880 CF8000B2 ý..ü..L..|..t..Ó...ð..ìêlâ.Úte.ð 000040
E30085C0 8A91D900 E8D0C900 497718FC 800CF6E5 2A91FA87 F3870573 EC3A5874 t(:ås..æ.'.*Í-É.■.wIÂèÀÓÁ)..ëç.D 000060
74D20A28 7E05F980 3E741D72 10E980D8 33D38801 C8800374 D208127C 0EF98055 U.'.|..●t..ù..Æ3Ü.Ô.r.t>.'.—+.●t 000080
880E8819 E8F875C1 FED301E2 D1237417 7708E980 FD8ADF8A F38AD68A 01CE8003 ..ð..■.µ.Ô.».Ô.w.t#Íãlæ±èu%Š..B. 0000A0
E0D020CA 8003743F C2F6FAE2 DAD1E8D1 20CA8003 743FC2F6 0097E9E8 D0C188D7 ■.èÀÒð..-ô?t..ò ÌŠÌÖã'-ô?t..ò ÀÀ 0000C0
0A730E88 D788F318 FA28FA41 E94575FF FC80C4FE DAD1D8D1 50730E13 D7031470 p..■.BsPÍÜÍÖ±á.■.uÉÕA'+'.æ.■.Bs. 0000E0
08EC800F 75FF0A64 74D80B0A 876A7610 EC800B75 D80800F6 000383F5 0AF7D3F7 ÌÆÌÖÌ.Æ.-Â.Ûu..å.vj.Ö.Ûtd..u..š. 000100
E9037400 209A3E80 F671D3D1 E2014874 CCFE0A78 FF0AD232 F28ADE8A F88A5876 v[.«.B.·20..x.±ätKÍãÍÆq¬.>. .t.Ô 000120
D1E0003A 74FFFC80 C4FE0773 00D38301 C6800F74 01C6F614 72077780 FA80017C |..'.w.r.-ó.t..ó..Æ.s.±á.■.t:ÀÀÍ 000140
9A3E80C3 F7880589 C68AE38A 02458922 D43E88C7 0A7FE780 80241774 7F80A908 À`..t.$..Ó..ú.>å".E..D.ó. .Ìû.>. 000160
D196348B ADFCF990 E9E679C3 F7880589 02458922 D43E88C0 33017EE9 03740020 .t.Ô~.3å.>å".E....Ìûylô.·•Ü.4.| 000180
E5027FED 8080EC80 C1320888 3088C874 ED0AD900 E1D10240 880674E4 0AD800E0 ÀÀÄ.ðtø.M.ÌÀÀ).Ûtù.=.Áżè.$.. ·..| 0001A0
9FC00BDA 88E7F7C6 88E88880 C98080CB 80EF8AFF 3250CD74 FFFC8080 C4800370 pÆ.á..■.tëP2..ÿ.ù..è..Š.óÌÓ.Ö.å. 0001C0
03E1F6C5 8801C880 03749E58 FA130803 E6F7C188 FA88000D2 83D803E7 F7C58B50 P.éÌÓ.Ä.●..'.ëÌÍ.Ä.'X.t..ù..é—Ä. 0001E0
```

Dump of file SATURN:[PCCOMMON.DUMP.DLL]PDLSYN.TMP;1 on 18-APR-1990 10:48:45.27
File ID (771,27,0) End of file block 276 / Allocated 276

Virtual block number 101 (00000065), 512 (0200) bytes

```
F787FF1A E9AD74FF FC80C4FE FF69E90A 75E40A03 D1E2D10B 78FF0A58 930388C7 ú.Æ.X..x.ÌãÌÆ.ðu.Õi.±á.■.tÙÕ...Ì 000000
E52A7FED 8081EC80 C1320874 E40A5C74 ED0AD800 E0D10244 8809D0E1 D1024D88 .M.ÌÀÀ).D.ÌÀÀÄ.Ût\.ðtÜ2è.$..Ü.*| 000020
7400209A 3E8080CF 80C93220 8A015D88 FF78E903 75FFFC80 80C480FF 7BE90371 q.Ô(..á..■.u.Ôx..]..-2è.Ü..>. .t 000040
0011E8EE 88001AE8 D8D1EAD1 80CE80C0 32248A01 54885020 9A3E02D9 D1E8D108 .ÌŠÌÌ.>. P.T..$2å.ö.ÌðÌÀÒ...ŸÒ.. 000060
C688FA88 15E3C033 96F3F71D 730338F8 80E9FF76 E9D08801 CA800374 D688C208 .ô.øt..ò..ÌÔv.Ô¯½;Æs.Ìæ.3åD..'.ó 000080
06C6C3E0 73C188D0 03C128FF FF8EC3F9 730313C1 034E0773 D788FA18 D8F7E1F7 ÌÄÌÄ.'.■s.N.ê.Æs'ûƒ..+ê.Â.êsÚÚó. 0000A0
209022D4 06C722D4 36FF3874 E40A3C77 EC3A0EED 800774ED 0A209C2E 8A00209A . .... .Út..Ü.:šw<.ðt8.óå"ú.ð". 0000C0
068F585B 5AFE0FE8 FF325253 5020A122 D406C758 585AFE4E E8D83202 33525350 PSR3●2ÜÒN±Z[Xú.å"À PSR2.Ö.±Z[X.. 0000E0
C033FE1A E8525350 20A122D4 06C722D4 36FF209A A2D23308 33C033FE 33E922D4 å"Ö3±3å3Ü3●À. .óå"ú.å"À PSRÒ.±3å 000100
7FE480AD A5A5A522 D43E88F7 881DE880 00F58106 6D88F787 D3E8209F A3209DA3 Ê. Ê. $Æ.Ì.m..Ì..Š..Ì.>å"ÊÊÊÙ.ð. 000120
74FFE025 DAD0E0D1 DED0E5D1 064488FC 066088C3 FE8B22D4 3688ABE6 0A80E680 .Ì..Ì¨.óå".±ü.m.■.D.ÌÍÀBÌÀÀÖÌÀ.t 000140
E2D0D001 E6008977 06A03DD8 F7C528C2 74C00806 8695F787 0977E838 E0E583D2 ●.ÌÂ;Òw..Ì..ø.åtó+éÌÀ=..w¿ÀÌÌÌÀš 000160
FF0B10CC 800FE480 AD93AD91 AD92C032 E08AACF8 88E086C0 D1C001C0 D157D0D1 ÌÌWÌâÌâÌå.À.½¯.Áżå.Ü.Ü.Ü.ö..å... 000180
83237248 74E77710 EF83C033 D888CB88 D18801C9 800374D2 08187C0E FF836374 tc...|..●t..è..Ì.ù.Ä3å.ÿ.wÖtHr#. 0001A0
0F7708EF 83E432C4 8AF88ADF 8AE88ACD 8AF18AD6 8A01CE80 0374D20A 2B7C06FF ..|+.●t..ö..■.þ.ë.$.Ô.½.á2ö.ÿ.w. 0001C0
D1DFD1DB D1E8D120 CA800374 3FC2F6CF 8716E8F5 7547D0D1 D3D1D1D1 E2D12374 t#ÌãÌÌÌÆÌÀGuÌŠ..ü-ô?t..ò ÌÒÌÜÌÒÌ 0001E0
```

Dump of file SATURN:[PCCOMMON.DUMP.DLL]PDLSYN.TMP;1 on 18-APR-1990 10:48:45.27
File ID (771,27,0) End of file block 276 / Allocated 276

Virtual block number 102 (00000066), 512 (0200) bytes

```
50035C13 014C1334 0208D0E5 D13870E5 D120CA80 03743FC2 F6975ECF 87F6E20A Öã~.Ü^.-ô?t..ò Ìlp;ÌÌÀÄ.4.L..\.P 000000
DAD1D9D1 D8D1DFD1 13742000 C7F7FE13 589E5810 00CE810F FFE68105 7488509F .P.t..Ì...ö..X.X.±Ìú. t.ÌÒÌÜÌÌÌö 000020
9F05748B 035C1B01 4C18342A D0F6D8D0 E5D10088 E9F6ECE9 0375E0FD 8320C583 .é .»Âu.Ö$-Ö..ÌÌÀÄ-Â*4.L..\..t.. 000040
FE130E13 CE13F50A F7D1F7D3 F7D7F7D0 F6F63313 73FE189E 1000CE81 0FFFE681 .Ì...ö....±s.3--ÀÌ■ÌÆÌÌÌÖÌ.ö.B.± 000060
E4E8D233 CA88D988 F8883074 4E407602 00ED8113 75E0C7F6 1875FF08 0004BEFC ●ƒ....u.-úÂu..Ü..vâNt=.«.).ò3●$ð 000080
C7F79700 82F28ACE 8AE98AD0 8AF88AC7 8AE08A97 27760100 ED811875 1FE0C7F7 ÌúÂ.u..Ü..v'..Â.ú.«.Ì.Ô.ö.·ý..Ìú 0000A0
85E90374 0020823E 80FC9065 E8E8E8D7 D1D3D1D1 D1E20171 7420ED83 12751000 ..u..Ü tqÌãÌÌÌÆÌ■ŠŠŠe.■.>ý .t.Ö. 0000C0
83087420 00C7F700 D7830003 83000183 01C6801A 7401C6F6 1F720777 80FA8003 ..'.w.r.-ó.t..ó..Ì..Æ..■.Ìû. t.. 0000E0
C70AC508 C032E086 2274ED01 0FE78080 240E8722 D43E88F7 883074E0 FD8320C5 é .»ÀtO.Ì.>å".B$..Ö.ÌÚt".Áżå.é.ú 000100
0020823E 80FCF5FD E90379C3 F78805EF 83A8C688 A8C188AA C68A055D 88064589 .E..]..ó`.é¨.ó¨.ÿ..Ìûy.Ö»Ì■.>ý . 000120
8808747F F025D088 064488FC C3FE88A8 A8A8A8F7 8822043E 88C03303 77E90374 t.Öw.3å.>å".Ì¨¨¨¨.±û■.D..ÀÌÞ.tÜ. 000140
74FFE03D 800005BC 70C1037F E0E98180 002DE1D1 E0D10074 7FF0E181 D133064D M.3Ì.ÀÞ.tÀÌÀÌÀ-...ÖÀ..êp¥...■À.t 000160
D1D3D1D1 D1E2D10E 751000C7 F7D800E5 D15D01CA 80037401 81E850D8 D1E60086 ÑÀÌÌÀPÒ..t..ò.]ÌÌÀÀÌú..u.ÌãÌÌÌÆÌ 000180
F0E18101 88064D88 FCF787F5 8CE9FF24 E98874E0 FD8320C5 8393E80A 75ED08D7 ■.Úu.$..é .»Àt.Ö$.Ö.Ì.Ì■.M..Ì.ÀÞ 0001A0
3D800005 9870C128 7FE0E981 802020E1 D1E0D198 747FF025 D0330644 88EF747F .tÿ.D.3ÀÌÞ.t.ÌÀÌÀ- ..ÖÀ.+êp....■ 0001C0
05C683F7 88509210 CC800FE4 80AD92AD 93ADC932 E88AAC50 D8D1E6D0 9874FFE0 À.t.ÀÌÌÀP¯.Ò2èÙ.Û.Ù.ö..ã..P.Ì.ó. 0001E0
```

Dump of file SATURN:[PCCOMMON.DUMP.DLL]PDLSYN.TMP;1 on 18-APR-1990 10:48:45.27
File ID (771,27,0) End of file block 276 / Allocated 276

Virtual block number 103 (00000067), 512 (0200) bytes

```
20B0BFFD 1F740020 B23E8000 05C6FCA4 4746A5A5 AB10CC80 0FE480AD FD20B0BF €¯ »Ù.ð..ð.¨ËEFGÊ«ó...>ý .t.»€¯  000000
D8D1EAD1 58FCAB08 D1ADAB08 D1ADAB08 D1ADED01 AB20B226 02E8D1E8 8BADF78B .XÙ.ÒÌÒ.&ý ¨ÌÙÙÌÄ¨ÙÌÄ¨ÙÌÄ¨«XÌðÌÄ 000020
03745F5B 59D788C2 08C108C3 080033E8 570037E8 570038E8 57003FE8 D9D1D8D1 ÌÙÌÌÒ?.WÒ;.WÒ7.WÒ3..û.è.ð.øY[_t. 000040
D1D8D1EF D1DAD109 D1D8D1EF D1DAD1D9 D1D8D1EF D108CA80 037407C2 F601CA80 .ò.-ö.t..ò.ÌÿÌÙÌÌÌÒÌÿÌÙÌÌÌÒÌÿÌÙÌ 000060
F588ED33 9752F6F7 3877F03B 0475D208 5C73D63B FF332080 3688FF08 E9DAD1D9 )ÌöÖ...6¯ 3.;øs\.Øu.;Þw;%-R.3Ù.% 000080
0874C00B 20AEA1EA 13F003E7 F70674C0 0820ACA1 50F28BE7 F70474C0 0820AAA1 À˙ .åt.%Ò.·PÀ¯ .åt.%Ò.Þ.õÀÙ .åt. 0000A0
AC1E1320 AA0E034F 13739391 9295E818 500D18CE 18DAF75A 92000283 E803E7F7 %Ó.Ò.Ø..Z%Ö.ö.Ì].Ò....s.O..¯ ..¯ 0000C0
AE1E1320 AC0E0320 AE061820 AC1E1820 AA0E2B4F C3ED7320 80161320 AE061320  ..Û ..¯ sÚÙO+.˙ ..¯ ..Û ..¯ ..Û 0000E0
20A8A310 0C0F2406 458A20A6 A3100C0F 24E43206 448AC9EB F520AA16 8BC21320  .ö..˙ %Šè.D.2ð$...ÈÌ .E.$...È´ 000100
C803E2F7 0674D20B 02558B04 8BCA8BE8 8BE1F708 E30D8891 1AE30C8B E8880833 3Ù.Š..D....D.%Ã.Ò.ð...U..Øt.%ã.à 000120
448850C1 08580501 DA13C803 E2F70874 D2081588 0E74C00B 02448BED 3355DA13 .ÖÙ3Ù.D..åt....Øt.%ã.à.ÕÌÌX.êP.D 000140
74D20804 55880F74 C00B0488 C933EA13 0803E2F7 06740208 02558800 74C00802 ..åt..U..Øt.%ã.Ã.õ3è...åt..U..Øt 000160
58000183 EA130803 E2F70974 D2081588 0F74C00B 04448BD1 D1EA1308 03E2F708 .%ã.Ã.õÌÌ.D..åt....Øt.%ã.Ã.õ.Ì.X 000180
33CA13E8 0320A626 F70874C0 08058BCA 13E80320 A826F708 74C00804 8850C308 .ûP...åt.%&´ .Ò.ð...åt.%&Ì .Ò.ð3 0001A0
558B1074 C00B0444 8BD301CA 13E803E2 F70874D2 08045588 0F74C00B 02448BDB Ù.D..åt..U..Øt.%ã.Ò.ðÌÆ.D..åt..U 0001C0
DA13C803 20A626F7 0874C00B 02458BED 33550003 83CA13E8 03E2F709 74D20802 ..Øt.%ã.Ò.ð.Æ.U3Ù.E..åt.%&Ì .à.Ö 0001E0
```

Dump of file SATURN:[PCCOMMON.DUMP.DLL]PDLSYN.TMP;1 on 18-APR-1990 10:48:45.27
File ID (771,27,0) End of file block 276 / Allocated 276

Virtual block number 104 (00000068), 512 (0200) bytes

```
03E2F70B 74D20804 558B1A74 C00B0444 8BDA13C8 0320A826 F70874C0 0802448B .D..åt.%&´ .à.Ö.D..åt..U..Øt.%ã. 000000
A0EA1308 0320A626 F70874C0 0B04458B EA130803 20A826F7 04448B05 D1DA13C8 à.ÕÌ[.D.%&´ .Ã.õ.E..åt.%&Ì .Ã.õ. 000020
D3D1D1D1 E2D1D7D1 D3D1D1D1 E2D1D7D1 D3D1D1D1 E2D15A97 C50320A8 26F620A6 Ì -&´ .é.ZÌãÌÌÌÆÌøÌãÌÌÌÆÌøÌãÌÌÌÆ 000040
FF4C74ED 085077F5 3B04C0EE 810874F6 08208336 8B00208B 06C6C3F6 085ED7D1 Ìø^.-ûó.ý ..6° .-t..Ÿå.;%wP.ÚtL. 000060
06C75859 5A5B505F FC3EE802 33C9330B 33575553 52515020 B5220406 C7220436 6å"ú.å"ç PQRSUW3Û3è3ØÒ>=_][ZYXú. 000080
C933C033 FC1AE922 D4068F58 595A5B5D 5FF801E8 FF335755 53525150 20BD2204 å"§ PQRSUW3.ÒÌ«_][ZYX..å"Ö.=3å3è 0000A0
B5BFFBF8 E8575553 52515020 B0220406 C7220436 FF20B2A2 FF33ED33 DB330233 3ø3Û3Û3.Åý .6å"û.å"§ PQRSUWÒ½«€ç 0000C0
003B3306 C60028E8 013B3306 C60E5688 DB335756 EC8855C6 EBABABAB ABC03320  3å¨¨¨¨¨ŠóU.$VW3U.V.ó.3;.Ò(.ó.3;. 0000E0
8B5E5F00 06E80E5E 8B023357 56EC8855 CB5DE58B 5E5F0089 40C98005 730A763B ;v.s..èa.._^.Ì]ùU.$VW3Ø.^.Ò.._^. 000100
D88EA4F3 20D8BF06 76C527EB F63340B1 067664F9 830A4E8B C08ED88C FCCB5DE5 Ì]ù=.Ã.å.N¯..ªdv.Ÿa3-Š'év.€Ã µË.Ã 000120
20C68F0A 76030676 2B5D12F5 E85520CE 8F064E01 0C468B06 7689200B BE0A4E8B .N./Ã .v..F..N.€ö ÙÒ%.]+v..v.€ó 000140
8B98078A 26065EC4 565704EC 83EC8855 C30A8CC7 8B065D89 04458902 75890089 ...u..E..]..ú.ÖùU.$.$.WVá^.&.... 000160
16740065 3D98078A 26065E8B 07EB0020 0598078A 26065E8B 0C74011F 1F87F608 Ã-....t..^.&.... .Š..^.&...=e.t. 000180
FFF08B98 078A2606 5EC40846 8C067E89 F275041F 1F87F608 8B98058A 2647F88B .«G&....Ã-....u·.~..F.á^.&....Þ. 0001A0
FC7E89E9 75C00A06 46FFF78B 078826C6 8BF88B98 078A2606 5E8B2E07 C6260646 F.&ó...^.&....½.ó&...%.F..åuÕ.~= 0001C0
75003D80 26470774 2E3D8026 9008EB06 7EC45657 06EC83EC 8855CB5D E58B5F5E ^_.Ì]ùU.$.$.WVá~.Š..&.=.t.G&.=.u 0001E0
```

Dump of file SATURN:[PCCOMMON.DUMP.DLL]PDLSYN.TMP;1 on 18-APR-1990 10:48:45.27
File ID (771,27,0) End of file block 276 / Allocated 276

Virtual block number 105 (00000069), 512 (0200) bytes

```
80260D74 653D8026 900EEB06 7E8B6774 003F8026 0646FFDF 8B08468C 067E89F3 µ.~..F..Ô.F.&.?.tg.~.Š..&.=et.&. 000000
7E8BFE56 89FC4689 064EFFC2 8CC78B08 468C067E 89ED7500 30802647 0774453D =Et.G&.=.uÚ.~..F..ú.ô.N..F=.V±.~ 000020
C5FA5E8C 064EFF03 752E3F80 26D F8808 468C067E 89F97430 3D80264F 9002EB06 .Š..O&.=0t°.~..F..Ò&.?.u..N..^°é 000040
90CB5DE5 8B5F5EFA 5E8EFE5E 8CFC7689 F275C00A 078826AC 065EC406 46FFFC76 v=.F.á^.¯&...åu·.v=.^±.^°^_.Ì]ù. 000060
CB5D0001 B8057227 7B08829A 275703E2 9A065EC4 27520402 9A3BCA1E 8DEC8855 U.$..ò;...R'á^..å.W'...('r.¦..]ù 000080
04C48327 9F359C9A 0C76FF0E 76FF2474 00067E83 565708EC 83EC8855 CB5DC02B +å]ùU.$.$.WV.~..t$.v..v...5.'.á. 0000A0
B9359C9A 0C76FF0E 76FF90CB 5DE58B5F 5E1FA5A5 A5A5DA8E 1EF08BFB 8B085EC4 á^..«.Þ..ÕËËËË.^_.Ì]ù..v..v...5¿ 0000C0
559A085E C427C104 029AF85E 8D1FA5A5 A5A5DA8E 1E0716F0 8BF87E8D 04C48327 '.á..-½.Þ....ÕËËËË..^½...ê'á^..U 0000E0
3EC8168B 3EC6A147 7400214C 3E805657 0AEC83EC 8B5590CB 5DE58B5F 5E283505 .5(^_.Ì]ù.U.$.$.WV.>LÌ.tGÀó>..à> 000100
89FC4689 0C568B0A 4603C02B 02E80001 B805752D 3F8326F8 5EC4FA56 89F84689 .F½.V°á^½&.?-u.¦..Š.+å.F..V..F=. 000120
58EB06C4 83045DE8 0EFC76FF FE76FF50 C0289003 E80001B8 067E000E 7E83FE56 V±.~..~.¦..Š..+åP.v±.v=.Ò]..á.ŠX 000140
FA5689F8 468908C4 83287338 749A37FF 260277FF 260477FF 260677FF 26065EC4 á^.&.w.&.w.&.w.&.7.t8s(.á..F½.V° 000160
B805752D 3F8326F8 8BF85EC4 C02B02EB 0001B805 7E000E7E 8350400E 46B85052 RP.F.aP.~..~.¦..Š.+åá^½.½&.?-u.¦ 000180
46890C56 8B0A468B 0AC4832B CD35F29A 50520C56 8B0A4603 C703C02B 02E80001 ..Š.+å.ú.F..V.RP.·5ë(.á..F..V..F 0001A0
FC5EC414 7E000E7E 832D07C6 26FC46FF FC5EC40A 752D3F83 26F85EC4 FE5689FC =.V±á^½&.?-u.á^=.F=&ó.-.~..~.á^= 0001C0
0308F7C0 1B01214C 3E80501E 2146882E 07C626FC 5E8BFC46 FF07B826 01478A26 &.G.&...F=.^=&ó..¦FÌ.P.>LÌ..å¥Ã. 0001E0
```

Dump of file SATURN:[PCCOMMON.DUMP.DLL]PDLSYN.TMP;1 on 18-APR-1990 10:48:45.27
File ID (771,27,0) End of file block 276 / Allocated 276

```
Virtual block number 106 (0000006A), 512 (0200) bytes

 5EC40774 00107E83 FE5689FC 468908C4 832A0701 849A5052 FE5688FC 46030E46 F..F=.V±RP.Ç..*.6..F=.V±.-..t.6^ 000000
 08F08848 02478826 F85EC45E 74303F80 26065FC4 26F85EC4 FC46FF45 07C626FC =&6.E.F=6^%&6_.&.?0t^6^%&.G.H.Þ. 000020
 5EC4F9F7 0064B999 C688157C 64FE83FC 46FF2D07 C626FC5E C4F08808 F7087DF6 -).%Ä.Þ6^=&6.-.F=.±d|..6.¿d.%*6^ 000040
 0026FC5E C4F9F700 0AB999C6 88157C0A FE83FC46 FFF288F9 F799C688 070026FC =&...6.%*.·.F=.±.|..6.¿..%*6^=&. 000060
 90CB5DE5 885F5E0C 56880A46 88070026 C688FC5E C4FC46FF F288F9F7 99C68807 ..6.%*.·.F=6^=.6&...F..V.^_.|]ù. 000080
 49E80E06 76FF0876 FF0A76FF 0C76FF0E 76FF1076 FF01214C 06C604EC 83EC8855 U.$.$.6.Ll..v..v..v..v..v..v..Òl 0000A0
 7400214C 3E8000F2 46C612EC 83EC8855 CB50E588 00214C06 C6FE5689 FC4689FE ±.F=.V±6.Ll..|]ùU.$.$.6F·..>Ll.t 0000C0
 4603C02B 02E80001 88057520 3F8326F4 5EC4F656 89F44689 3EC8168B 3EC6A151 QÅ6>..à>.F¶.V-6^¶&.?-u.|..Š.+å.F 0000E0
 C4F05689 EE468921 4E0603FC 46886A75 0E463921 4EA1FE56 89FC4689 0C56880A ..V..F=.V±ÅNI9F.uj.F=..Nl.FŸ.VÞ6 000100
 77F,F2604 77FF2606 77FF2606 5EC44AEB 0007C626 EE5E8830 07C626EE 46FFEE5E ^Ÿ.FŸ&6.0.^Ÿ&6..ŠJ6^.&.w.&.w.&.w 000120
 26500E46 03024788 26F45EC4 5052F656 89F44689 08C4832A 3738749A 37FF2602 .&.7.t87*.6..F¶.V-RP6^¶&.G..F.P& 000140
 880A4688 0AC48318 6035F29A 50520C56 880A4603 C02B02EB 0001B805 75203F83 .?-u.|..Š.+å.F..V.RP.·5'..6..F.. 000160
 8326F45E C42D07C6 26FC46FF FC5EC40A 752D3F83 26F45EC4 FE5689FC 46890C56 V..F=.V±6^¶&.?-u.6^=.F=&6.-6^¶&. 000180
 3007C626 FC46FFFC 5EC406C4 830205E8 0EFC76FF FE76FF50 0001881D 7F00027F .....|..P.v±.v=.Ò...6.6^=.F=&6.0 0001A0
 0108E80E FC76FFFE 76FF5000 0188687E 000E7E83 FC460102 478826F4 5EC40AEB Š.6^¶&.G..F=.~..~h|..P.v±.v=.ÒÄ. 0001C0
 88260874 00214C3E 80437D00 027F8326 F45EC42E 07C626FC 46FFFC5E C406C483 .6.6^=.F=&6..6^¶&....)C.>Ll.t.&. 0001E0

Dump of file SATURN:[PCCOMMON.DUMP.DLL]PDLSYN.TMP;1 on 18-APR-1990 10:48:45.27
File ID (771,27,0)   End of file block 276 / Allocated 276

Virtual block number 107 (0000006B), 512 (0200) bytes

 E80EFC76 FFFE76FF 500E4689 0E468803 7E0E4638 D8F70247 88260EEB D8F70247 G.%ÄŠ.&.G.%Ä;F.-..F..F.P.v±.v=.Ò 000000
 0C56880A 468808C4 832B4E37 AE9AFC76 FFFE76FF 50003088 0E76FF06 C4830196 ...6..v.|0.P.v±.v=.Û7N+.6..F..V. 000020
 E80E0676 FF0876FF 0A76FF0C 76FF0E76 FF01214C 06C604EC 83EC8855 CB50E588 .|]ùU.$.$.6.Ll..v..v..v..v..v..Ò 000040
 0677FF26 065EC456 06EC83EC 885590C8 5DE58800 214C06C6 FE5689FC 4689FE6E n±.F=.V±6.Ll..|]ù.U.$.$.V6^.&.w. 000060
 88263EC6 1EC43EC8 16893EC6 A308C483 288A3874 9A37FF26 0277FF26 0477FF26 &.w.&.w.&.7.t8.+.6.È6>..à>6.6>&. 000080
 FE5689FC 46890C56 880A4603 C02B9003 EB0001B8 0675203F 8326214E A3480247 G.HÈNI&.?-u.|..Š..+å.F..V..F=.V± 0000A0
 01B0047D 214E3639 4E02778B 263EC61E C40AC483 2C8A35F2 9A50520E 76FF5306 .S.v.RP.·5.,.6.6.6>&.w.N96NI).¯. 0000C0
 0C76FF0E 76FF1076 FF1F7F0E 4639C688 077CFCFE 83214E36 892150A2 C02A02EB Š.*åÅPI.6NI.±=|..69F....v..v..v. 0000E0
 FA5E8C1E 74002150 3E8090CB 5DE5885E 0CC483FD 93E80E06 76FF0876 FF0A76FF .v..v..v..Ò.».å.^.|]ù..>Pl.t..^* 000100
 76FF0E76 FF00FE47 C626FC5E C4FA5E8E FE5E8CFC 7689F975 00FF7C80 46FC76C5 év=F.|..u*.v=.^±.^*6^=&6G±..v..v 000120
 83067465 0E7E83EC 8B55CB5D E58B5E0A C483FEF6 E80E0676 FF0876FF 0A76FF0C ..v..v..v..Ò-±.6.^.|]ùU.$.-.et.. 000140
 7E839035 EBFB8FE8 0E0676FF 0876FF0A 76FF0C76 FF1076FF 1276FF19 75450E7E -.Eu..v..v..v..v..v..v..Ò.«Š5..- 000160
 FF1276FF CB5D0AC4 83FD39E8 0E0676FF 0876FF0A 76FF0C76 FF1076FF 1875660E .fu..v..v..v..v..v..Ò9».6.]ù.v.. 000180
 74000A7E 83EC8B55 90CB5D0C C483FEC0 E80E0676 FF0876FF 0A76FF0C 76FF1076 v..v..v..v..v..Òå±.6.]ù.U.$.-..t 0001A0
 08568806 46030A46 880676FF 0876FF50 4004C483 2CA50214 9A0676FF 0876FF29 ).v..v....É,.6.ƏP.v..v..F..F..V. 0001C0
 C7087412 7703F883 D88E1EEC 88554590 D88CC888 CB5D0AC4 83274A36 E49A5052 RP.Ò6J'.6.]ú.à.Ä.EU.$..Ä.«.w.t.ú 0001E0

Dump of file SATURN:[PCCOMMON.DUMP.DLL]PDLSYN.TMP;1 on 18-APR-1990 10:48:45.27
File ID (771,27,0)   End of file block 276 / Allocated 276

Virtual block number 108 (0000006C), 512 (0200) bytes

 8321642D 22D4A1C8 4D501FE5 8802ED83 F8215416 8921520E 8908EB21 64220406 .å"dIŠ...RI..TI½.Û..Í.]MùÅå"-dI" 000000
 8C21568F F388C321 568ED98E A5A5FCD8 8EC18ED9 8CC08C21 568FF38B C8F3F60C .-µù.µ¢VI.å.).è.Ä=ÈÈ.)/VIû.µ¢VI. 000020
 758803EB 07FE45C6 FC7D89FC 7588C321 568ED98E A5A5A5A5 FCD88EC1 8ED98CC0 å.).è.Ä=ÈÈÈÈ.)/VIû.u=.)=6E±.Š..u 000040
 D1FAD1D8 D1D9D1FA D1D8D1D9 D1FAD105 8925747F 80C2F702 54880C88 C033FCFC ==3å...T.%6..t%..1*111ÄI*111ÄI*1 000060
 C3064589 04458902 45890589 C3065589 3800C281 8FE68004 40890245 8908D1D9 \1Ä.E..M..Ì..6.8.U.Û...E..E..E.Û 000080
 0000FFFF 9A22D668 1E22D868 1E38EEA3 E0865800 00FFFF9A 5016C488 50EC8855 U.$P.6.P.....X.ÅEŸ8.hÄ".hø"..... 0000A0
 00FF682D 962F3C9A 2D892EE2 9A50CB5D E58B0001 B82AF53C 009A006C E80021E8 ÒI.ÒI...<%*¡...|]ùP.ã..-.</.-h.. 0000C0
 E28E3174 00308026 47017500 3080267F FFB922D8 068EFF33 000DBB1E 22DE16FF ..B".£..3...Ä"¿..&.=.u.G&.=.t1/ã 0000E0
 72412CAC 38F58F1F F788071E 061CEBE7 74AEF2C0 330874CA 88A6F3C8 88D18826 &.1.ùµl.òt.3å·ÙtÒŠ.....%.¢%8¯,Ar 000100
 C48850B7 38F5A780 D4885200 028800C3 1FEDEBAA C20A0572 412CAC92 04E0C00E .åÅ..¯,Ar..ò¯ŠÙ.û.E..R.å.Ì%8ñP.6 000120
 F58F0808 81067500 02300774 00013040 81127558 C0080000 FFFF9A52 16501653 S.P.R......åXu.Ÿə=..t.=..u.Ÿ...% 000140
 38AE06C4 00CAE903 7338A61E FFD833C2 8C38AA06 C41EE338 A80E885A D4794838 8Kyå2..´;D.6.´;.63Ù..Ì;s.Òb.6.0; 000160
 863D38B2 880073E8 38A48F38 A08E007C E838B28F 3B82BE38 A61EFF00 0388C28C .ÒE....Ì;/ý;¢ý;Ò|./.;¢È;Òs.|ý;=Ñ 000180
 6A036A00 51E83886 BF38828E D88E0ACD 88C30000 FFFF9A2E 6F680E01 6A087438 ;t.j..ho......ù|è..Ä/ý;¢Ñ;ÒQ.}.j 0001A0
 5503EB00 31E83886 BF38828E 003AE83E D28F3ED2 BEEC8855 00002E6A 9A006A00 .j..j...U.å/Ø>¢Ø>Ò:./ý;¢Ñ;Ò1.Š.U 0001C0
 0000FFFF 9A500646 8A50C033 001AE838 B68F38B6 BE0023E8 38868F38 868EEC88 .å/Ñ;¢Ñ;Ò#./Ñ;¢Ñ;Ò..3åP.F.P..... 0001E0

Dump of file SATURN:[PCCOMMON.DUMP.DLL]PDLSYN.TMP;1 on 18-APR-1990 10:48:45.27
File ID (771,27,0)   End of file block 276 / Allocated 276
```

```
Virtual block number 109 (0000006D), 512 (0200) bytes

 EEEB10FF F2740245 08058804 EF830E73 F73BC33B A61EFF00 02BB07E3 3BA80E8B ..';D.£....‖;û;%s..ÿ....E.t·..$Ÿ 000000
 2F3C9A50 00FFB83B 061EFF04 74003B08 3E83209B 2F3C9A50 00FCB8EC 8B5500C3 û.U.š|=.P.</.-.>.;.t....:|..P.</ 000020
 3BAD3BDA BE06568B C08ED88E 2E70B857 56EC8855 FE86E900 028BCB5D E5882EEC §..‖ù|..Õ.±U.šVW|p..Ä.å.V./Ö;Ù; 000040
 57EC8855 0002CA5D E58B5E5F 96EBEBF7 8BAEF2FF FFB9C033 970C7496 401074C2 ðt.ə.t..3å¿..·Ù.%$$._^.‖ò..U.šW 000060
 530002BB C48B5049 D1F7AEF2 FFFFB9C0 33FA8B92 1F74C00B 2F002F0C 9A0676FF .v.../././.åt...*3å¿..¯Ù%‖P.éE..S 000080
 0C070906 00051804 02030202 16010002 CA5DE58B 5F5B0000 FFFF9A50 1651521E .RQ.P.....[_.‖ò............... 0000A0
 00570053 00520243 00410235 02121211 0D10120F 1600160C 0808070A 0C090C08 ....................S.A.C.R.S.W. 0000C0
 F1A31608 000008D7 02CE08A4 0D840982 0A810A80 16060972 1C702060 0D6C0B59 Y.l.m p.r...........Ê.ð.■.....Èþ 0000E0
 24B92F72 BB38F1A3 C85DE58B 99FFFFB8 0008E8CB 5DE58B99 FFFFB838 EA168938 8..ð8|.....‖ùÒ..|....‖ùÈþ8Er/¿$ 000100
 430176CA 3C04728C 3C430A76 243C0472 133CF7E2 43431674 073A2E18 75E40A00 ..ðu..:.t.CCä%<.r.<$v.C<¥r.<ðv.C 000120
 F02DC38B FA4689E4 2A08478A 26085EC4 56570000 08C800C3 38EAA398 01478A2E ..G..Èõ8û.à...WVé^.&.G.*ö.F*.ù-þ 000140
 0A47F626 0774830A 47F626F8 468932E4 05E0D1C1 03E0D1C8 88F9F700 0CB99926 &.¿..%*.àlÁ.èlÁ.ð2.F%&-G..t.&-G. 000160
 0A4F8026 0E74010A 47F62608 5EC49001 2BE9FFFF B8200A4F 8026085E C40F7440 ət.é^.&.O. |..ð+..é^.&-G..t.&.O. 000180
 26FC7689 F0880447 8926C02B EF0A6780 26020A4F 802690E2 EB000004 47C72620 &úG...Šã.&.O..&.g.ÿ+ð&.G..þ.v=& 0001A0
 26FC087E 81377501 32E487F6 06D868F9 F7000CB9 9926F02D C3884C75 0C0A47F6 -G..uL.û-Þ&.¿..%*kÄ.-.ð2.u7.-.=& 0001C0
 83312636 C09AFA76 FF0F752F 120A7E81 16752708 087E810E 7430830A 7E810775 u..-.*0t..-..'u..-../u..v*.ð6&1. 0001E0

Dump of file SATURN:[PCCOMMON.DUMP.DLL]PDLSYN.TMP;1 on 18-APR-1990 10:48:45.27
File ID (771,27,0)   End of file block 276 / Allocated 276

Virtual block number 110 (0000006E), 512 (0200) bytes

 F02DC38B 1575080A 47F62608 5EC404C4 830C79E8 0876FF0A 76FF0C75 C00802C4 ó..åu..v..v.Òy..á.á^.&-G..u..û-þ 000000
 2606478B 2606772B 26378826 085E8867 740132E4 87F60608 68F9F700 0CB99926 &.¿..%*kÄ.-.ð2.tg.^.&.7&+w.&.G.& 000020
 0677FF26 5256167E F60B0447 89264802 4588F87E 8B025789 26078926 4008578B .W.ə&..&.W..-½.E.H&.G..--.VR&.W. 000040
 006A006A 026A0F74 2038F587 F6FA5E8B 19EBFC46 8908C483 3144333E 9AFA76FF .v*.>301.é..F=Š..^*-.%B t.j.j.j. 000060
 1606468D 560001BE 17EB0788 2606468A 065FC426 085EC408 C4833167 3DD29A53 S.Ø=g1.é.é^.&é..F.&..Š./..V.F.. 000080
 CBC95F5E E42A0646 8AFECCE9 0374FC76 39FC4689 08C4832F 46333E9A FA76FF50 P.v*.>3F/.é..F=9v=t.Õä±.F.*ö^_èù 0000A0
 E80C4E8B 5252D233 52F8568D 1652FE56 8D160676 FF0876FF 40B70EEC 83EC8855 U.š.š.ñə.v..v...V±R..V½R3ØRR.Ñ.Ò 0000C0
 76FFFE46 8D5002CA 80227402 00A92A75 0400A910 CA800874 0100A90A 4688018A ...F.`..t..ò.`..u*`..t".ò.P.F±.v 0000E0
 03255251 01CA8003 EBFE4E8B 087558C0 850000FF FF9A5050 C0335016 0676FF08 ..v..P3åPP......åXu..N±Š..ò.QRX. 000100
 118A0374 00028AF0 C2F60E75 006E3D16 74C00B00 00FFFF9A 5050C033 50C70A00 ..úP3åPP......åt.=n.u.-ðþa..t.¤. 000120
 50D088E4 EBC03300 188A0000 17AD9A50 0D7238F3 0638FE46 8B008DE9 FDBAE900 .Õ∞Õ...F±;.µ8r.P.Ù...¤..3åŠõ.ÂP 000140
 4000A90E 758000A9 C9330A46 8B6175C0 0800002E 069A50F8 46801653 F45E8016 ..^¶S..F½P......åua.F.3è`..u.`.ə 000160
 0775023C 008EE940 F446C607 75013CF4 468AF24E 88808102 75803B5D 06F60775 u.-.];.u.Ÿ..N·.F¶<.u.óF¶əÕ..<.u. 000180
 0002B951 51FFFFB9 52737400 020A46F7 7A74C90A F44688C0 320083E9 08F446C6 óF¶.Õ..2å.F¶.ètz%F...tsR¿..QQ¿.. 0001A0
 F6468D16 524FE8C0 33FD36E9 03740083 300C74C0 0B0000FF FF9A50FA 46801651 Q..F*P......åt.=..t.Õ6»3äŠOR..F- 0001C0
 83521875 1AF67E83 3274F846 392375C0 0B0000FF FF9A50F8 46801650 0001B850 P|..P..F½P......åu#9F½t2.—.u.R. 0001E0

Dump of file SATURN:[PCCOMMON.DUMP.DLL]PDLSYN.TMP;1 on 18-APR-1990 10:48:45.27
File ID (771,27,0)   End of file block 276 / Allocated 276

Virtual block number 111 (0000006F), 512 (0200) bytes

 FA468D16 505050C0 33528E75 C0080000 FFFF9AFA 76FFFC76 FF00FC5E 8301FA6E n*..^=..v=.v*......åu/R3åPPP..F* 000000
 50C03350 F8468D16 0676FF08 76FF2875 48C1F6F4 4E8AAA75 C0080000 32879A50 P..2...åu`.N¶-èHu(.v..v...F½P3åP 000020
 01C980F2 4E0A20C9 80037400 080A46F7 10C98003 740001F8 46F70000 31C89A50 P.ù1..%F½..t..è.%F...t..è .N·.è. 000040
 8B5500C3 01C98003 7580A8C9 33C123D0 F738ECA1 CB5DE58B 38F58F88 D88BC28B .ô.Ä..%B.‖ùÅŠ8%Ä#è3è'.u..è.û.U. 000060
 51C93353 12742038 F587F6FC 69E9C033 00098A08 7238F31E 3B065E8B 0CEC83EC &.š..^.;.µ8r.¤..3äÕi=-.%B t.S3èQ 000080
 C0330856 C50A468E FA5E8C66 748038F5 87F60000 32E29A50 16F44680 51414151 QAAQ.F¶.P.ã2..-.%B.tf.^*.F.éV.3å 0000A0
 DC8802EC 833875AE F20A8049 E30C4E8B F86689F2 8BFA8856 57FCFC46 89FE4689 .F±.F==WV.*.·.f%.N.DI¯.·Ùu;.š..É 0000C0
 009AE900 28E8F4E2 AA1A74F8 380D740A 3CAC0C4E 8B0716FA 8BD488E2 2B00808A ¤..+ã.å.*...N.¯<.t.;«t.¯ã¶Õ+.Õ.. 0000E0
 7AEB0093 E9FA5E8E 5F5EE1EB 0014E8E2 EBFC46FF 0AB0AA00 1FE80375 FB3B0DB0 ¯.;«u.Ò..¯¯..F=ŠäÒ..ŠÄ^_.^*Õ..Šz 000100
 5016F446 8D51521E 53065E8B 1FE3CA2B CF881F06 1E515350 308038DC 9AFFFCB8 |=..É;§0PSQ....Ù+ÒD..^.Š.RQ.F¶.P 000120
 C00808C4 831FC3FA 8B585B59 1F0774DB 0BFE5E01 F45E8B11 75C00B00 002F669A .f/...åu..^¶.^±.Ùt..Y[X.*û..é..å 000140
 F587F6FE 5E8E26EB F900208A 03EB001C BA087500 09BA0001 30007400 60301874 t.=m.t.=..¤..u.¤..Š.¤ .*Š&.^±-.% 000160
 FC462BFE 468B06EB F9C03300 1CBA0EEB F803751A 3F80085E 8B0A5E8E 0E744038 8ət..^..^..?.u.½Š.¤..3å*Š..F±+F= 000180
 0856C51E EEEBC18B 0475C90B 0C4E8BFB 4DE9CB5D E58B0472 FA5E8E5F 5EF8668B .f%^_.^*r..‖ùÕM«.N..èu..èŠŸ.éV. 0001A0
 00098A00 013D0D74 00603017 74C0081F 071E0000 34019A50 16F44680 51521E53 S.RQ.F¶.P..4......åt.=m.t.=..¤.. 0001C0
 1A3F8026 DA8B0A74 4038F587 F68775C0 0BF4468B C2EB0020 BAC7EB00 1CBACC75 uä¤..Šú¤ .Šõ.F¶.åuñ-.%Bət..Õ&.7. 0001E0

Dump of file SATURN:[PCCOMMON.DUMP.DLL]PDLSYN.TMP;1 on 18-APR-1990 10:48:45.27
File ID (771,27,0)   End of file block 276 / Allocated 276
```

Virtual block number 112 (00000070), 512 (0200) bytes

```
5DE58801 FE4F8026 0574C308 C08C065E C4EC8855 00A3EBC0 33001CBA A6EB0275 u.$|¤..3äŠÈ.U.$á^..å.ût.&.O±..|] 000000
3B68A312 740025E8 08750038 683E831E 73FFF13D 06468857 5602EC83 EC8855CB ÙU.$.$.VW.F.=þ.s..>h;.u.Ò%.t.Èh; 000020
CB5DE58B 5E5F02C4 8333E63E 229A0676 FF0B7500 78E80574 0018E815 750082E8 Ò..u.Ò..t.Òx.u..v..">]3.á._^.]]ù 000040
269A5002 B0510E4F 8D50501E C033FE5E B9FEE383 43065E8B 0776065E 3900F08B £Þ.9^.v..^.C.D±.^±3ã.PP.O.Q¯.P.& 000060
FE5E8800 08A3DA8E 0574D208 3B6CA33B 6A1687C2 8B3874FF FA8308C4 83351540 ə.5.á..ª.t8.ò..j;Èl;.@t..ÖÈ...^± 000080
06A30000 05000AA3 01478000 02A30000 A3000AB8 0C478948 480008A3 C03308BE .Ä3âÈ..HH.G.¡..È..È...G.È.....È. 0000A0
000000C8 C3D98EC1 8CD20808 D6E83B6C 1E8ED833 064E88C0 8ED88CC3 1FD88C00 ..Ä.Ù.Ä.å.N.3Ù..l;Ò©..@.ê.lùà... 0000C0
006A006A 08468C06 7E89F275 081F1F87 F6088898 058A2647 9002EB06 7EC45657 WVá-.Š..G&....Ä-....u·.-..F.j.j. 0000E0
1EF0883E CABF0008 050AC483 354125D0 9A570876 FF5004C4 8335D202 149A5706 .W...@5.á.P.v.W.ÄXA5.á....¢ò>.Þ. 000100
46890856 88064688 56570000 0AC8CBC9 5F5EDA8C 3ECAB81F A5A5A5A5 DA8E1E07 ...ÖÉÉÉ.¡ò>.Ö^_èùà...WV.F..V..F 000120
833007C6 26F846FF F85EC4FE 5689FC46 89085788 26064788 260C5EC4 FA5689F8 %.V¹6^.&.G.&.W._F=.V±á^%.F%&6.O. 000140
9003EB07 8A26FC46 FF097400 3F8026FC 5EC4F876 C5F65E8C 0A4E882E 7E000A7E ~..~..N..^-év%á^=&.?.t..F=&..Š.. 000160
287C000A 7E830007 C626F85E C40A4E89 F65E8EFA 5E8CF876 89E7E246 04883080 ¯O..FãÒ.v%.^ª.^-.N.á^¥&6...~..|( 000180
F87E89F5 74393D80 264F3005 C6269006 EBF87EC4 F84EFF1F 7C353F80 26FC5EC4 á^=&.7S|..N%á-%Š..&6.OO&.=9t%.-% 0001A0
08568806 468815E8 0247FF26 0C5EC409 75313F80 26065EC4 07FE260F 88FA468C .Fª.O&±.á^.&.?1u.á^.&.G.Š..F..V. 0001C0
0136E900 B35756EC 88550000 90C8C95F 5E08C483 35C501B4 9A0676FF 52505240 əRPR.v..Ç.éS.á.^_èù...U.$VWª.Ö6. 0001E0
```

Dump of file SATURN:[PCCOMMON.DUMP.DLL]PDLSYN.TMP;1 on 18-APR-1990 10:48:45.27
File ID (771,27,0) End of file block 276 / Allocated 276

Virtual block number 113 (00000071), 512 (0200) bytes

```
88C03302 EB0001B8 05744038 F587F60C 7C00FB83 117D38F3 1E3B065E 88EC8855 U.$.^.;.µ8)..«.|.-.%8ət.¡..Š.3â. 000000
189A5706 561E067E C40A76C5 56571E00 85E90375 C90B0E4E 8BEC8855 00CB5DE5 []ù.U.$.N..èu.Òç..WVév.á-..V.W.. 000020
73F903D8 8EFFFF05 D88C0773 F1034950 73000A83 C12B5778 D20B0E4E 8B36AA41 A^6.N..@xW+è.Ö.sPI.þs..Ä....Ä.ªs 000040
C1289140 C603C323 DB1BC62B C703C323 DB1BC72B 48C18841 C08E3719 05C08C07 ..å..7.åA.èH+ú.Û#û.ú+6.Û#û.6ə.+è 000060
EBC08E37 4F2DC08C D175FFFF 83088E37 2420088C 0775FFFE 835CE391 FCA4F3FD »µÊ=.D\.±.u..Ä-$7.Ä...ul.á-07.á$ 000080
C1289140 C203C323 DB1BC22B D2F7D688 C203C323 DB1BC22B D2F7D788 48C188C8 à.èH.¤%@+ò.Û#û.ò.¤%@+ò.Û#û.6ə.+è 0000A0
8E379205 C08CC775 FF08D88E 375B05D8 8C0775F6 0818E391 A4F3C913 A5F3E901 ÌÕµÊ.èµÊ.D..-u..Ä.[7.Ä..uú.å..7. 0000C0
0C74DAF7 D788067E C45738E3 0C4E88EC 8855CB5D 08568806 46881F5F 5E8EEBC0 åŠƒ^..F..V.]ùU.$.N.DØW6-..¤%Öt. 0000E0
81C38C10 E3D187AA F3C913AB F3E9D1E0 8A0A4688 D12B0187 D1030323 DB18D128 +1.Û#£.1.1+1.F..Ä1Õµ¨.èµ¨..¯.û. 000100
1E08568B 0646880E 4E88CB5D 08568806 46885FAA F3C913AB F3E9D1C3 8E3790C3 û.7.ù1Õµ¨.èµ^_.F..V.]ù.N..F..V.. 000120
88DAF700 D2830BF7 AA2D800A 79D20B0E 750AF983 1374C00A 93FC071E 570A7EC5 é~.W..=..ât..ª.u..@y.¯-¨%Ù.@.%Ö. 000140
88E275C3 0BC288AA 27040276 393C3004 D38792F1 F793F1F7 0274C00B D23392F7 ¥.30.ât.¥þ.¥þ..Æ.0<9v..'¨.ò.ûuã. 000160
578DE42A 078A00CB 5DE58B5E 5F1F58DA 8CF272C7 38014480 FF448805 86AC4F05 .O¯...D..D.;úr·.ÖX._^.]]ù...*ò.W 000180
768DC08E D88CFC57 56EC8855 CB580000 348A9A53 1650521E 51000289 DC885301 .S.É¿..Q.RP.S..4..[ûU.$VW=.Ä.å.v 0001A0
AA91A4F3 9198ACC8 8B3B1E8F 500928E8 553B16BE A536A536 A536A536 3B168F06 .¢.;6E6E6E6Eƒ.;UÒ(.]¢.;.à¯..µÊ.^ 0001C0
58CB5DE5 8B5E5FC7 88DA8C08 5D8C3B1E 0645C704 40890255 891D89FF 32380CBF ¢.;2....U..M.úÉ..;.]..Ö.ú_^.]]ùX 0001E0
```

Dump of file SATURN:[PCCOMMON.DUMP.DLL]PDLSYN.TMP;1 on 18-APR-1990 10:48:45.27
File ID (771,27,0) End of file block 276 / Allocated 276

Virtual block number 114 (00000072), 512 (0200) bytes

```
88E17202 0CE8D833 3B401E89 00ACE9D8 330185E8 EF88FF33 D78840C9 8030C980 .è0.èə.¤3..ÿÒ..3ÙÒ¨...ə;3ÙÒ..rÄ. 000000
72D888C5 03C475D2 0B3B402E F7C388EA 88F88838 4026F7C7 8850E072 0205E8F8 ¥Ò..rÅP.ú%&ə;.%.ô.Û%.ə;.@uó.é.Är 000020
A3C0333B 4416893B 42A33B38 0E89CE03 3B363E89 FCB5E8D8 73000383 F80358BE ƒX.%.Æ.¤ÄŠç=.>6;.ô..8;ÈB;..D;3âÈ 000040
4E417401 FDE8DB33 00E7E89F 750B0880 CD800375 01ADE891 3B3EA33B 3AA33B3C <;È:;È>;.ÒÙ.u..ë..Ûu.ÒÒ.3ÙÒ».tAN 000060
03EB0402 C9814E27 7502742D 3C06742B 3C317400 3B333E80 1274453C 1C74443C <Òt.<Et..>3;.t1<+t.<-t.u'N.è..Š. 000080
DBF70275 9E5840C9 80037502 C5F6008B E8509F01 6CE84600 003B4206 C70EC980 .è.ú.B;..FÒl..PÒ..-é.u..èəX.u.%Ù 0000A0
3B443E2B 047510C5 F63B3E3E 03F80330 C9800374 1872C1F7 0675FF08 3B423E88 .>B;..u.%èr.t..è0.«.>>;-é.u.+>D; 0000C0
46A13875 5E5901AC E8003B54 06C63B36 3E880A73 E83B4A8E 5156507F 0190FF81 .....PVQ/J;Òs..>6;6.T;.Ò¨.Y^uBÀF 0000E0
3C3E8380 074D8004 747FF006 45F70003 83F5D8F7 D3F71374 80C5F638 481E8B3B ;..N;-é.t.%Æ%Ä%.Æ.%E.Þ.t..M...>< 000100
4006C63F FF8BC301 C980C302 CD800375 003B3C3E 8338542E 8A08C980 0376073B ;.v..è...T;.><;.u..ë.û.è.ûÉ.?6.ə 000120
33C3DFEB DE78D803 E3D1E3D1 C303E3D1 02CD80ED 770CCCFB 81177200 E4E80A3B ;.ÒÔ.r..«ã.wÛ.ë.1D.Û1D1D.Äx8SÒû3 000140
1999FF81 00078300 D58300D3 83000358 008AE850 28720006 E8D788DF 88EF88FF ..ÿ.Ò.¤Òə.r(PÒ..X.À.Æ..f..¤..... 000160
C7F61675 3B3E0608 C50BC788 EEEB3B3E 06FF01CA 800374C0 0A0D7200 B8E8E572 r]ÕÉ.r..ât..ò...>;$Ÿ.ú.é..>;u.-ù 000180
1E893B46 168920C9 8010C980 06E80575 D20B0975 8000F881 0F7480C5 F6177480 .t.-é.t..«..u..@u.Š..è..è ..F;.. 0001A0
FF0B0040 B8F1EB38 3E0EFF00 25E80973 1999FF81 1C74C208 C308C508 C78B3B48 H;.ú.é.û.ôt.....s.Ò%...>;$þ|ə... 0001C0
E8C28853 5557C35E AB92AB96 AB95AB93 AB923B4A BFF78856 F6EB002A E84B0678 x.HÒª.Š-V.%¢J;.¨.¨.¨.¨^ûAUS.ôÒ 0001E0
```

Dump of file SATURN:[PCCOMMON.DUMP.DLL]PDLSYN.TMP;1 on 18-APR-1990 10:48:45.27
File ID (771,27,0) End of file block 276 / Allocated 276

Virtual block number 115 (00000073), 512 (0200) bytes

```
2D3C0874 005EE8C3 D7D105D1 D3D1E2D1 F81358E8 1358D813 58D00300 08E8000E ..Ò...ÀX.ÀX.ÒX.%1ã1Æiíi1æûÒ^.t.<- 000000
1DEB397D 3B40063A 072C027E 093C4572 302C4A74 004EE8C3 4E460175 2B3C0674 t.<+u.FNÚÒN.tJ,OrE<.-.,.:.ə;)9Ŝ. 000020
3C06FF08 CD803B3E 0EFF0E74 10C5F626 77093C2A 72302C20 742E3C33 740037E8 Ò7.t3<.t ,Or*<.w&-é.t...>;.ë...< 000040
23733B38 363BC3F9 4EC9EB10 CD803B3A 06FF0975 10C5F6F4 EB20CD80 C3E4323B ;2ôù.ë Ŝ¶-é.u...:;.ë.ŜèN°ú;68;s# 000060
02777A3C 0672613C E274003C E6740A3C EA74093C EE74203C 10740038 323E80AC ˆ.>2;.t.< tŸ<.tõ<.tÌ<.tã<ar.<zw. 000080
E7D13E78 03FE05AD 4974C208 C108C508 F888AD95 AD91AD92 AD57C3C0 32C35F24 $ û2âÛWÙ.Ù.Ù.Ù.%.é.ê.ôtIÙ.±.x>1Ó 0000A0
FA81F633 D30AD922 43F075CB FED7D0D0 D1D7D105 D1D1D1E2 D100058B DFD1E8D1 1Ò1ÒE..1ã1111l∎1ÂÂ∎±ÙUÞC")
.Æ3-.° 0000C0
3B540E80 0FE80007 80F57FF0 3D0E74FF F0A90007 80C613FE 13EE13CE 13F58001 ..¥.ö.Ÿ.±.6.∎.`Þ.t.=Þ.¥.∎.Ŝ...T; 0000E0
DC8B5A59 C3FF0A06 45890475 89026D89 00895FF7 8BF888E8 8BC888D8 8BC03301 .3â.Ä.à.Ò.¥.¥ ...m..u..E...ÛYZ.È 000100
3B562EFF 5152F198 E9C03305 75403B56 A1CB5152 E38B0572 3B5A1E3B 0B72D82B +Är.;.Z;r..DRÕùÂV;ǝu.3âÕ.þRQ..V; 000120
89F25689 F04689C0 2B22D816 8B00F0E9 03752208 3639FF2B F62B5657 000014C8 à...WV+-+.96Ä"u.Õþ...Ä"+â.FÞ.V·. 000140
FE814619 74C0080A C4833C74 40DC9A26 E2681EF6 76FFF876 FF0C6AF8 5689F646 F-.V½j..v½.v-.hã&.Éǝt<.á..ât.F.± 000160
003F8026 F646FFF6 5EC40CEB 47EA7500 3F8026F6 46FFF65E C4008CE9 03767FFF ..v.Õ¥.á^-.F-&.?.uõGŜ.á^-.F-&.?. 000180
56EE5689 EC468904 C4833C83 3FCE9A04 6A500145 8D8A7500 3F8026F6 5E8BF475 u¶.^-&.?.uα.E.Pj..ö7.<.á..F$.VŸV 0001A0
EC468866 74C208FC 46886074 EE4608EC 4688FE56 89FC4689 02C4833C B934E19A .Ä4¿<.á..F∎.V±.F$.FŸtm.F∎.ôtf.F$ 0001C0
C0080AC4 83370140 0C9A26E2 681EF076 FFF276FF 0C6A3AFD 16893AFB A3EE5688 .VŸÈ«:..»:j..v·.vÞ.hã&.Éǝ.7.á..â 0001E0
```

Dump of file SATURN:[PCCOMMON.DUMP.DLL]PDLSYN.TMP;1 on 18-APR-1990 10:48:45.27
File ID (771,27,0) End of file block 276 / Allocated 276

Virtual block number 116 (00000074), 512 (0200) bytes

```
C4078A26 F046FFF0 5EC404EC 46830257 89260789 26FE568B FC4688EC 5EC42C74 t,á^Ŝ.F∎.V±&..&.W..F$.á^Þ.FÞ&..á 000000
3F8026F0 5EC4F475 003F8026 F046FFF0 5EC4E8EB 0E74C00A 078826FC 46FFFC5E ^∎.F∎&...ât.ŜÒá^Þ.FÞ&.?.u¶á^Þ&.? 000020
47F626FA 5EC41CEB F62BFC5E 8CFA4689 26F08856 000006C8 90CBC95F 5EA77500 .uÏ^_èù.à...V¡Þ&.F°.^∎+-Ŝ.á^°&-G 000040
FA463938 E0168B38 DEA10CFA 46834601 744004C4 833C340C 349A5306 0E74830A ..t.¯S.4.4<.á.ǝt.F.F°.Â88..Â89F° 000060
E0D1C88B F9F7000C 899926F0 2D04468B 3B0A06FF 000004C8 90CBC95E C68BD876 vÄ.ô^èù.à......;.F.·Þ&.¿..¥°.à1Â 000080
26064789 26045EC4 02C4B33D 2934E19A 020068FE 5E8CFC46 8932E405 E0D1C103 .è1Â.ô2.F∎.^±h...Ä4)=.á.á^.&.G.& 0000A0
040A4F80 26045EC4 9021E802 000247C7 26FC5EC4 080A4F80 261174D0 0B085789 .W..Ât.&.O..á^∎&úG...Ŝ1.á^.&.O.. 0000C0
2606478B 26045EC4 00010247 C726FC5E C4085789 26064789 2640FE56 8BFC468B .F∎.V±ǝ&.G.&.W.á^∎&úG...á^.&.G.& 0000E0
09BA0B72 38F31E38 065E88EC 8B55C3C9 00000447 C7260257 89260789 2608578B .W.&..&.W.&úG...èÛW.Ŝ.^.;.µ8r.α. 000100
59000033 6A9A5116 0C76FF08 76FF0A76 FF53CC8B 04EC83F1 E4E9F1D8 E9C03300 .3âÕÃþÕôþ.$..öS.v..v..v..Q.j3..Y 000120
E58B01FE 4F800474 DB0B065E 8BEC8B55 00CB5DE5 8BFD38F5 A78091E1 75C0855A Z.âuÄ..Ï¥8».[]ù.U.Ŝ.^..Ùt..O±..[ 000140
244024EB 99C03305 750176E8 0005B807 1E297500 3F833B5E BB5756EC 8B55CB5D JùW.ŜVW£^;.?.u)..¦..Òv.u.3â.Ŝ$ǝ$ 000160
E8C08ED8 8C064E8B 38643689 FFFEFE44 C704C683 000104C7 963B60A3 3B5EA3FE ±È^;È`;.ú....6.ÚD±±..6d;.N..Ä.âÒ 000180
7401A8FE 88ADFC02 778BF273 EEF983FE E180FA74 4100D0E9 CB5DE58B 5E5F0009 .._^.Ï]ùÕÄ.At°.Ä±.°Ÿs·.W.∎Ù.±´.t 0001A0
030C74FE 8BE6EBFE 4489F78B 000205C2 03357401 A8ADF003 D08B1573 C13B4843 CH;ès..Ä.ÞÙ´.t5.ô....¥.D±Ŝl.±t.. 0001C0
3B6C1E8C 260574D1 3830A5B9 DA8CC68B FE4CFEF9 0305EB05 8948C128 FE4C89F9 °.L±+èH..Ŝ..°±L±.ô.Ô¿EO;1t.&..l; 0001E0
```

Dump of file SATURN:[PCCOMMON.DUMP.DLL]PDLSYN.TMP;1 on 18-APR-1990 10:48:45.27
File ID (771,27,0) End of file block 276 / Allocated 276

Virtual block number 117 (00000075), 512 (0200) bytes

```
8B8C73C1 3B48FE8B F27401A8 ADF003FE 8B2574FF FE3D023B 7006C626 C3027F89 ...Û&6.p;.=±.t%.±.ÞÙ´.t·.±H;ês¥. 000000
2615EBD8 8E0474C0 0808478B E6EBFE44 89F78B00 0205C203 E27401A8 ADF003D0 Â.ÞÙ´.tã.ô....¥.D±Ŝl.G..ât..ÄŜ.& 000020
0068E8C0 3306778B 8BE8378B 3B681E8E 260574C7 3B3EB5BF D88C1274 3B700EFE ±.p;t..Ä¢ç>;út.&..h;.7ŜE.w.3âÒk. 000040
3F09B9D8 8C98EB4E 4E960574 001DE8FE 4DFE0074 005FE898 40400124 0D74C63B ;ót.$.ǝǝ.Ò_.t.±M±Ò..t..NNŜ..Ä¿.? 000060
FF8A4141 49C82B03 7401A8FE 458B51C3 99C03302 4789078B 3B6CA326 0474C13B ;êt.&Él;..¯G.3â.ÛQ.E±´.t.+à1AAα. 000080
75000CE8 C62BC223 D2F70D72 C2031572 C603C18B F575EAD1 0476386E 1638267F .&;.n;v.1õu¥.ê.ór..ôr.¥Ø#ô+6Ò..u 0000A0
7789FFFE FE44C7F2 03F088FE 8B571874 001DE851 52C359C0 33E575EA D1D2F708 .¥Ø1õul3âYÛRQÒ..t.W.±.Þ.·ÚD±±..w 0000C0
3D734026 9A1F0650 0001B850 52521ED2 335053C3 5A5958FE 55894AD7 2BD68B06 ..∎+∎J.U±XYZÚSP3Ø.RRP¦..P...&ǝs= 0000E0
44469A06 76FF006A 0876FF00 6A560000 0AC8C3D2 0B02745B 5A1FFFFA 8308C483 .á..°..Z[t..ØÛà...Vj..v.j..v..FD 000100
02C48340 1434E19A 56F8768B 902FEB99 C02B0674 FFFFC2F7 FA5689F8 46893FFB «?.F%.V°%ô..t.+â.Ŝ/..v½V.Ä4.ǝ.á. 000120
8BFC468B 9007EB08 C4833FBE 37AE9A50 FE76FF00 6A561274 D00BFE56 89FC4689 .F∎.V±.Ât.Vj..v±P.07ƒ7.á.Ŝ...F∎. 000140
57E80775 4806468B 08568B22 E0BF3875 000A7E83 065756EC 8B5590CB C95EFE56 V±^èù.U.ŜVW..~..uß¢Ä".V..F.Hu.ÒW 000160
04C68334 735E003E E8560E46 8902448B 0D74F73B 11744826 E03684C EB277200 .r'ŜL.6Ä&Ht.;¥t..D..F.VÒ>.^s4.6. 000180
F95B0000 FFFF9A50 C0335016 52C48B50 21EB99FF FFB80675 D2080473 26E0FE81 .±Â&s..Øu.¦...ŜIP.6R.P3âP.....[° 0001A0
024C39F7 8B0E4E8B CB5DE58B 5E5F07C0 33D38B26 E0368902 5C891489 E675C085 .âul...\..6Â&.Æ3â._^.Ï]ù.N..¥9L. 0001C0
22DA1E39 0675F73B C18ED38B 26721C03 DA8B2CEB F9F27526 E0FE8104 C6830C74 t..6..±Â&u·°Ŝ,.Ö..F&.Æ.è;¥u.9.Ö" 0001E0
```

Dump of file SATURN:[PCCOMMON.DUMP.DLL]PDLSYN.TMP;1 on 18-APR-1990 10:48:45.27
File ID (771,27,0) End of file block 276 / Allocated 276

```
Virtual block number 118 (00000076), 512 (0200) bytes

 57EC8855 00C30188 04879222 DA168904 75F738DE 75C08500 00FFFF9A 51531373 s.SQ......ðuñ;%u...Ö"....ìû.U.$W 000000
 FF448AA6 F30A76C5 FE88C803 D9F7AEF2 C033F788 067EC4D9 8827E30E 4E881E56 V..N.D'.\ó~..%3à·ÙÄ).û.±év.µÎ.D. 000020
 56880646 88EC8855 00CB5DE5 885F5E1F C188D1F7 49490474 0477FF45 3A26C933 3èê:E.w.t.II%Ì.ê.^_.Í]ù.U.$.F..V 000040
 2509478A 2E09648A 56530008 CA50E588 D3180A46 2BE8D3EA D3FFFFB9 0C5E8808 ..^.¿..Æõ&$+F..Æ.[Ĵò..SV.d...G.% 000060
 56C35B5E F3E10738 2E048802 E88302EE 830005B9 0AC3830A C6831675 C43A8080 ..:óu..6..ü.¿...Ÿ..Š....:.Äµ^[ûV 000080
 F500013D D001E301 F4E2DFD1 DDD1DAD1 DBD1E8D1 0005B9FF 33AD93AD 92AD95AD Ù.Ù.Ù.Ù3.¿...ÌÒÎÚÎÒÎÎÎÕã¶ÌDÎÁ=..% 0000A0
 CD0000FF FFFFFFFF FFFC66C3 08448906 5C890454 89026C89 3C895E03 FE2D08D1 1Ü-±.^.<.l..T..\..D.ûf•........ë 0000C0
 C08ED88C 06C3075B 40008BC0 33300144 C60104C6 3B7EBEFF FDCCCCCC CCCCCCCC ääääääå».ƒ~;6..60.03å.Äa[.û..Ä.â 0000E0
 20B30279 C90B0674 7FF0C1F7 20B37F07 6480064C 885EA5F3 00048957 3B72BFFC •er;W¿..µÉ^.L..d..* %èþ.t..èy.*- 000100
 E4F64D80 91E2F74D 10BAC88B 3FFE05AD F8BABB74 80A8AC3B 79BEFF33 FF7BE853 SÒ(.3.ƒy;¨´.t£.¥Ù.±7.àα.M%ã.¯M-ð 000120
 4195B802 04E83872 BEDFF757 13430F81 12F4E981 FA13C803 E7F69AB0 D713C803 .à.ʘ¯.-Ò.à.ª.Õ¶..ÕC.W%Õƒr;Ò..£.A 000140
 C033F788 D9F791AD 93AD92AD 95AD97AD 575F0080 E8419F8B 57470972 5FFF13E8 Ò.._r.GWE.AÒ.._WÙ.Ù.Ù.Ù.Ù.%1.%3â 000160
 10B9387F 8FD91301 13E91303 9AD68156 C480F4E2 DCD00ED1 DDD10AD1 EBD10CE3 D.ÌŠÌÒÌÌÌßÄ£ã¶¯åV.ø...Õ.Ì.)¢.;¿. 000180
 D0D301D2 D1D5D1D6 D1E4D000 D0D301D2 D1D50106 D1E4D050 56555253 51C03200 .ZåQSRUVPÀÒÌøÌÌÌØÌÆÀÀÀÒÌøÌÌÌØÌÆÀ 0001A0
 3004D000 D301D201 D5D1D6D1 E4D00014 D9135901 1359E913 59F11359 E5025900 ÀY.ÌY.þY.ÒY.ÌY.)..ÀÒÌøÌÌÌØÌÆÀÀ.0 0001C0
 08893890 8DC3075B 5A000188 0C883B7E BE12C183 FCAEF3FD 30B0494F BDE259AA ˆYã§OI¯O»µÜ•.ê.ƒ~;..|..Z[.ù§.;¿. 0001E0

Dump of file SATURN:[PCCOMMON.DUMP.DLL]PDLSYN.TMP;1 on 18-APR-1990 10:48:45.27
File ID (771,27,0)   End of file block 276 / Allocated 276

Virtual block number 119 (00000077), 512 (0200) bytes

 0404D8F6 C42AC42A E022C72B 00048800 078F0844 01084788 2EABF3C0 33FD8800 ..»3àµ¨..G..D.¢..|..+ú"Ä*á*á-Ä.. 000000
 0256113E 0046013E 27F72E04 8806C683 F72BF103 08C3830F 28D92856 53C88898 ..àSV+)+Ò.û..þ+%.ó....%'>.F.>.V. 000020
 ADC80BAD 91ADF587 0EED83BC 754F02C5 835B5EE6 E202C383 02EE8300 0456833E >.V...Ÿ..û.ãl^[.é.Ou¥.Ú..%Ù.Û.àÙ 000040
 D3D1D1D1 07D1E2D1 084CFF00 78C00BF5 8BAD93AD 91AD97AD D10A92AD CD0AC808 .à.ëÙ..ÌÙ.Ù.Ù.Ù.%.âx..L.ÌãÌøÌÌÌÆ 000060
 0BCDD108 6C01D501 C5130D13 CD13FD13 F58001FA 81ED33D5 0BEF2300 018DD001 ÌÅ§..#ÿ.(3Ù.ª..%.».ë.Ì.éÌÌ.l.Ìë. 000080
 07C80000 00000000 000004A0 00000000 000000C3 06448904 5C89024C 893C89C5 é.<.L..\..D.û..................à. 0000A0
 9E00368E 18C98F04 00000000 18BE8C20 00000000 00000E9C 40000000 00000000 .......a........ ¥ƒ......¢è..6.. 0000C0
 F9DE8E01 AA938A47 C980E98C E00005C2 781F49FF CFA60500 6890C5AD A82B7085 çp+´Ùé.k.f|ü.|.xôÍ.Å.Õ.èGα.¯..B* 0000E0
 58E21965 2CFFFAA3 D70A3D70 A3D70AFF FDCCCCCC CCCCCCCC CD0353AA 7EE8FB9D .«Š~¨S.ëääääääå»..æÈp=.æÈ*.,e.ãX 000100
 811EAD45 39948AFF CBE69594 BEC440E1 5BFFE6AB CC771184 61CEFDFF F301B717 .ñÌæ.»öa..wä¨|.[ÃMáƒ..Ìù.¤.9EÙ.Ý 000120
 AEC03143 25637A19 3AFE57DD D0467C64 8CE4A1FF 2CA87FEA 27A539E9 A5FF96CF Ü..ÉÒ9É'ò.´,.ÀÒ¥d|FÂÌW±:.zc%C1âÙ 000140
 FE7BE857 53F573EF D10074FF 080AC383 0AE8830F F743C78B 0579FF08 43608BFC •EmC..y.ÈûC%Ò.Š..ù...t.Ìÿs%SWÒ(± 000160
 08CA5DE5 88E3F706 46880B75 0A5E88D8 080C5E88 084688EC 885500C3 ECEB5B5F _[Šãû.U.&.F..^..Ä.^.u..F.%D.Í]ò. 000180
 063FE000 02001308 CA50E588 D103E3F7 064688C8 030C66F7 064688C8 88E3F700 ¯%D.à.F.%f..à.F.%D.Ì.Í]ò.....Å7. 0001A0
 03407A01 03000000 093F3E00 02000700 032E8401 03000500 032EBC01 03000000 .....¥...............>?.......za. 0001C0
 0831E902 03003C00 0317E801 03003A00 0330F801 03002600 0340C501 03002200 .*...éa..&...«=..:...Ò...<...Ò1. 0001E0

Dump of file SATURN:[PCCOMMON.DUMP.DLL]PDLSYN.TMP;1 on 18-APR-1990 10:48:45.27
File ID (771,27,0)   End of file block 276 / Allocated 276

Virtual block number 120 (00000078), 512 (0200) bytes

 03322B01 03004B00 03330201 03028700 08321202 03004400 0332CE01 03027F00 .....ö2..D....2.......3..K...+2. 000000
 0832AB02 03008800 0337E101 05029000 08386E02 03008700 03412501 05004D00 .M...%A......n8......Ä7......¨2. 000020
 00000000 00000000 00000000 00005C00 032D6901 03005B00 032D7C01 03029900 .....|·..[...i·..\.............. 000040
 00000000 00000000 00000000 00000000 00000000 00000000 00000000 00000000 ................................ 000060
 00000000 00000000 00000000 00000000 00000000 00000000 00000000 00000000 ................................ 000080
 00000000 00000000 00000000 00000000 00000000 00000000 00000000 00000000 ................................ 0000A0
 00000000 00000000 00000000 00000000 00000000 00000000 00000000 00000000 ................................ 0000C0
 00000000 00000000 00000000 00000000 00000000 00000000 00000000 00000000 ................................ 0000E0
 00000000 00000000 00000000 00000000 00000000 00000000 00000000 00000000 ................................ 000100
 00000000 00000000 00000000 00000000 00000000 00000000 00000000 00000000 ................................ 000120
 00000000 00000000 00000000 00000000 00000000 00000000 00000000 00000000 ................................ 000140
 00000000 00000000 00000000 00000000 00000000 00000000 00000000 00000000 ................................ 000160
 00000000 00000000 00000000 00000000 00000000 00000000 00000000 00000000 ................................ 000180
 00000000 00000000 00000000 00000000 00000000 00000000 00000000 00000000 ................................ 0001A0
 00000000 00000000 00000000 00000000 00000000 00000000 00000000 00000000 ................................ 0001C0
 00000000 00000000 00000000 00000000 00000000 00000000 00000000 00000000 ................................ 0001E0

Dump of file SATURN:[PCCOMMON.DUMP.DLL]PDLSYN.TMP;1 on 18-APR-1990 10:48:45.27
File ID (771,27,0)   End of file block 276 / Allocated 276
```

```
Virtual block number 121 (00000079), 512 (0200) bytes

00000000 00000000 00000000 00000000 00000000 00000000 00000000 00000000 ................................ 000000
00000000 00000000 00000000 00000000 00000000 00000000 00000000 00000000 ................................ 000020
00000000 00000000 00000000 00000000 00000000 00000000 00000000 00000000 ................................ 000040
00000000 00000000 00000000 00000000 00000000 00000000 00000000 00000000 ................................ 000060
00000000 00000000 00000000 00000000 00000000 00000000 00000000 00000000 ................................ 000080
00000000 00000000 00000000 00000000 00000000 00000000 00000000 00000000 ................................ 0000A0
00000000 00000000 00000000 00000000 00000000 00000000 00000000 00000000 ................................ 0000C0
00000000 00000000 00000000 00000000 00000000 00000000 00000000 00000000 ................................ 0000E0
00000000 00000000 00000000 00000000 00000000 00000000 00000000 00000000 ................................ 000100
00000000 00000000 00000000 00000000 00000000 00000000 00000000 00000000 ................................ 000120
00000000 00000000 00000000 00000000 00000000 00000000 00000000 00000031 1............................... 000140
00000000 00000000 00000000 00000000 00000000 00000000 00000000 00000000 ................................ 000160
00000000 00000000 00000000 00000000 00000000 00000000 00000000 00000000 ................................ 000180
00000000 00000000 00000000 00000000 00000000 00000000 00000000 00000000 ................................ 0001A0
00000000 00000000 00000000 00000000 00000000 00000000 00000000 00000000 ................................ 0001C0
00000000 00000000 00000000 00000000 00000000 00000000 00000000 00000000 ................................ 0001E0

Dump of file SATURN:[PCCOMMON.DUMP.DLL]PDLSYN.TMP;1 on 18-APR-1990 10:48:45.27
File ID (771,27,0)   End of file block 276 / Allocated 276

Virtual block number 122 (0000007A), 512 (0200) bytes

00000000 00000000 00000000 00000000 00000000 00000000 00000000 00000000 ................................ 000000
00000000 00000000 00000000 00000000 00000000 00000000 00000000 00000000 ................................ 000020
00000000 00000000 00000000 00000000 00000000 00000000 00000000 00000000 ................................ 000040
00000000 00000000 00000000 00000000 00000000 00000000 00000000 00000000 ................................ 000060
00000000 00000000 00000000 00000000 00000000 00000000 00000000 00000000 ................................ 000080
00000000 000C000C 00000000 000C0000 00000000 00000000 00000000 00000000 ..................É.....É.É..... 0000A0
000C0000 00000000 0000000C 00000000 000C0000 00000000 0000000C 000C0000 ..É.É.........É.....É.........É. 0000C0
00000000 00000000 00000000 00000000 00000000 00000000 0000000C 000C000C É.É.É........................... 0000E0
000C0000 00000000 0000000C 0000000C 00000000 00000000 00000000 00000000 ................É...É.........É. 000100
00000000 00000000 000C0000 00000000 0000000C 00000000 00000000 0000000C É...........É.........É......... 000120
000C000C 00000000 000C0000 000C0000 00000000 00000000 00000000 00000000 ..................É...É.....É.É. 000140
0000000C 00000000 000C0000 000C000C 0000000C 00000000 0000000C 0000000C É...É.......É...É.É...É.....É... 000160
00000000 00000000 00000000 0000000C 00000000 00000000 00000000 00000000 ................É............... 000180
000C000C 00000000 00000000 0000000C 000C000C 00000000 00000000 000C0000 ..É.........É.É.É...........É.É. 0001A0
00000000 00000000 00000000 00000000 0000000C 000C000C 000C000C 000C000C É.É.É.É.É.É.É................... 0001C0
00000000 00000000 000C0000 00000000 00000000 000C000C 0000000C 0000000C É...É...É.É...........É......... 0001E0

Dump of file SATURN:[PCCOMMON.DUMP.DLL]PDLSYN.TMP;1 on 18-APR-1990 10:48:45.27
File ID (771,27,0)   End of file block 276 / Allocated 276

Virtual block number 123 (0000007B), 512 (0200) bytes

00000000 00000000 00000000 00000000 00000000 00000000 00000000 00000000 ................................ 000000
00000000 00000000 00000000 00000000 00000000 00000000 00000000 00000000 ................................ 000020
00000000 00000000 00000000 00000000 00000000 00000000 00000000 00000000 ................................ 000040
00000000 00000000 00000000 00000000 00000000 00000000 00000000 00000000 ................................ 000060
00000000 00000000 00000000 00000000 00000000 00000000 00000000 00000000 ................................ 000080
00000000 00000000 00000000 00000000 00000000 00000000 00000000 00000000 ................................ 0000A0
00000000 00000000 00000000 00000000 00000000 00000000 00000000 00000000 ................................ 0000C0
00000000 00000000 00000000 00000000 00000000 00000000 00000000 00000000 ................................ 0000E0
00000000 00000000 00000000 00000000 00000000 00000000 00000000 00000000 ................................ 000100
00000000 00000000 00000000 00000000 00000000 00000000 00CA0000 00000000 ......ð......................... 000120
00000000 00000000 00000000 00000000 00000000 00000000 00000000 00000000 ................................ 000140
00000000 00000000 00000000 00000000 00000000 00000000 00000000 00000000 ................................ 000160
00000000 00000000 00000000 00000000 00000000 00000000 00000000 00000000 ................................ 000180
00000000 00000000 00000000 00000000 00000000 00000000 00000000 00000000 ................................ 0001A0
00000000 00000000 00000000 00000000 00000000 00000000 00000000 00000000 ................................ 0001C0
00000000 00000000 00000000 00000000 00000000 00000000 00000000 00000000 ................................ 0001E0

Dump of file SATURN:[PCCOMMON.DUMP.DLL]PDLSYN.TMP;1 on 18-APR-1990 10:48:45.27
File ID (771,27,0)   End of file block 276 / Allocated 276
```

```
Virtual block number 124 (0000007C), 512 (0200) bytes

00000000 00000000 00000000 00000000 00000000 00000000 00000000 00000000 ................................ 000000
00000000 00000000 00000000 00000000 00000000 00000000 00000000 00000000 ................................ 000020
00000000 00000000 00000000 00000000 00000000 00000000 00000000 00000000 ................................ 000040
00000000 00000000 00000000 00000000 00000000 00000000 00000000 00000000 ................................ 000060
00000000 00000000 00000000 00000000 00000000 00000000 00000000 00000000 ................................ 000080
00000000 00000000 00000000 00000000 00000000 00000000 00000000 00000000 ................................ 0000A0
00000000 00000000 00000000 00000000 00000000 00000000 00720000 00000000 ......r......................... 0000C0
00000000 00000000 00000000 00000000 00000000 00000000 00000000 00000000 ................................ 0000E0
00000000 00D30000 00000000 00000000 00000000 00000000 00000000 00000000 ..........................Æ..... 000100
00000000 00000000 00000000 00000000 00000000 00000000 00000000 00000000 ................................ 000120
00000000 00000000 00000000 00000000 00000000 00000000 00000000 00000000 ................................ 000140
00000000 00000000 00000000 00000000 00000000 00000000 00000000 00000000 ................................ 000160
00000000 00000000 00000000 00000000 00000000 00000000 00000000 00000000 ................................ 000180
00000000 00000000 00000000 00000000 00000000 00000000 00000000 00000000 ................................ 0001A0
00000000 00000000 00000000 00000000 00000000 00000000 00000000 00000000 ................................ 0001C0
00000000 00000000 00000000 00000000 00000000 00000000 00000000 00000000 ................................ 0001E0

Dump of file SATURN:[PCCOMMON.DUMP.DLL]PDLSYN.TMP;1 on 18-APR-1990 10:48:45.27
File ID (771,27,0)   End of file block 276 / Allocated 276

Virtual block number 125 (0000007D), 512 (0200) bytes

00000000 00000000 00000000 00000000 00000000 00000000 00000000 00000000 ................................ 000000
00000000 00000000 00000000 00000000 00000000 00000000 00000000 00000000 ................................ 000020
00000000 00000000 00000000 00000000 00000000 00000000 00000000 00000000 ................................ 000040
00000000 00000000 00000000 00000000 00000000 00000000 00000000 00000000 ................................ 000060
00000000 00000000 00000000 00300000 00000000 00000000 00000000 00000000 ..................0............. 000080
00000000 00000000 00000000 00000000 00000000 00000000 00000000 00000000 ................................ 0000A0
00000000 00000000 00000000 00000000 00000000 00000000 00000000 00000000 ................................ 0000C0
00000000 00000000 00000000 00000000 00000000 00000000 00000000 00000000 ................................ 0000E0
00000000 00000000 00000000 00000000 00000000 00000000 00000000 00000000 ................................ 000100
00000000 00000000 00000000 00000000 00000000 00000000 00000000 00000000 ................................ 000120
00000000 00000000 00000000 00000000 00000000 00000000 00000000 00000000 ................................ 000140
00000000 00000000 00000000 00000000 00000000 00000000 00000000 00000000 ................................ 000160
00000000 00000000 00000000 00000000 00000000 00000000 00000000 00000000 ................................ 000180
00000000 00000000 00000000 00000000 00000000 00000000 00000000 00000000 ................................ 0001A0
00000000 00000000 00000000 00000000 00000000 00000000 00000000 00000000 ................................ 0001C0
00000000 00000000 00000000 00000000 00000000 00000000 00000000 00000000 ................................ 0001E0

Dump of file SATURN:[PCCOMMON.DUMP.DLL]PDLSYN.TMP;1 on 18-APR-1990 10:48:45.27
File ID (771,27,0)   End of file block 276 / Allocated 276

Virtual block number 126 (0000007E), 512 (0200) bytes

00000000 00000000 00000000 00000000 00000000 00000000 00000000 00000000 ................................ 000000
00000000 00000000 00000000 00000000 00000000 00000000 00000000 00000000 ................................ 000020
00000000 00000000 00000000 00000000 00000000 00000000 00000000 00000000 ................................ 000040
00000000 00000000 00000000 00000000 00000000 00000000 00000000 00000000 ................................ 000060
00000000 00000000 00000000 00000000 00000000 00000000 00000000 00000000 ................................ 000080
00000000 00000000 00000000 00000000 00000000 00000000 00000000 00000000 ................................ 0000A0
00000000 00000000 00000000 00000000 00000000 00000000 00000000 00000000 ................................ 0000C0
00000000 00000000 00000000 00000000 00000000 00000000 00000000 00000000 ................................ 0000E0
00000000 00000000 00000000 00000000 00000000 00000000 00000000 00000000 ................................ 000100
000000A8 00000000 00000000 00000000 00000000 00000000 00000000 00000000 ............................'... 000120
00000000 00000000 00000000 00000000 00000000 00000000 00000000 00000000 ................................ 000140
00C00000 00000000 00000000 000000B5 00000000 00000000 00000000 00000000 ................ç.............à. 000140
000000BB 00000000 00000000 00000000 00000000 00000000 00000000 000000C4 á...........................£... 000160
00000000 00000000 00000000 00000000 00000000 00000000 00000000 00000000 ................................ 000180
000000C3 00000000 00000000 000000BE 00C50000 000000BC 00000000 00000000 ........¥.....é./...........û... 0001A0
00000000 00000000 00000000 00000000 00000000 00000000 00000000 00C10000 ..è............................. 0001C0
00B80000 00000000 00000000 000000C2 00000000 00B70000 00000000 00000000 ..........ñ.....ô.............¡. 0001E0

Dump of file SATURN:[PCCOMMON.DUMP.DLL]PDLSYN.TMP;1 on 18-APR-1990 10:48:45.27
File ID (771,27,0)   End of file block 276 / Allocated 276
```

Virtual block number 127 (0000007F), 512 (0200) bytes

```
00000000 00000000 00000000 00000000 00BD0000 00000000 00BA0000 00000089 ¿.....¤.......§................. 000000
00000000 00000000 00000000 00000000 000000B6 00000000 00000000 00BF0000 ..¢.........Ñ................... 000020
00000000 00C60000 00000000 00000000 00000000 00000000 00000000 00000000 ..........................Ó..... 000040
00000000 00000000 00000000 00000000 00000000 00000000 00000000 00000000 ................................ 000060
00000000 00000000 00000000 00000000 00000000 00000000 00000000 00000000 ................................ 000080
00000000 00000000 00000000 00000000 00000000 00000000 00000000 00000000 ................................ 0000A0
00000000 00CC0000 00000000 00000000 00000000 00000000 00000000 00000000 ..........................ä..... 0000C0
00000000 00000000 00000000 00000000 00000000 00000000 00000000 00000000 ................................ 0000E0
00000000 00000000 00000000 00000000 00000000 00000000 00000000 00000000 ................................ 000100
00000000 00000000 00000000 00000000 00000000 00000000 00000000 00000000 ................................ 000120
00000000 00000000 00000000 00000000 00000000 00CB0000 00000000 00000000 ..........Û..................... 000140
00000000 00000000 00000000 00000000 00000000 00000000 00000000 00000000 ................................ 000160
00000000 00000000 00000000 00000000 00000000 00000000 00000000 00000000 ................................ 000180
00000000 00000000 00000000 00000000 00000000 00000000 00000000 00000000 ................................ 0001A0
00000000 00000000 00000000 00000000 00000000 00000000 00000000 00000000 ................................ 0001C0
00000000 00000000 00000000 00000000 00000000 00000000 00000000 00000000 ................................ 0001E0
```

Dump of file SATURN:[PCCOMMON.DUMP.DLL]PDLSYN.TMP;1 on 18-APR-1990 10:48:45.27
File ID (771,27,0)   End of file block 276 / Allocated 276

Virtual block number 128 (00000080), 512 (0200) bytes

```
00000000 00000000 00000000 00000000 00000000 00000000 00000000 00000000 ................................ 000000
00000000 00000000 00000000 00000000 00000000 00000000 00000000 00000000 ................................ 000020
00000000 00000000 00A10000 00000000 00000000 00000000 00000000 00000000 ......................À......... 000040
00000000 00000000 00000000 00000000 00000000 00000000 00000000 00000000 ................................ 000060
00000000 00000000 00000000 00000000 00000000 00000000 00000000 00000000 ................................ 000080
00000000 00000000 00000000 00000000 00000000 00000000 00000000 00000000 ................................ 0000A0
00000000 00000000 00000000 00000000 00000000 00000000 00000000 00000000 ................................ 0000C0
00000000 00000000 00000000 00000000 00000000 00000000 00000000 00000000 ................................ 0000E0
00000000 00000000 00000000 00000000 00000000 00000000 00000000 00000000 ................................ 000100
00000000 00000000 00000000 00000000 00000000 00000000 00000000 00000000 ................................ 000120
00000000 00000000 00000000 00000000 00000000 00000000 00000000 00000000 ................................ 000140
00000000 00000000 00000000 00000000 00000000 00000000 00000000 00000000 ................................ 000160
00000000 00000000 00000000 00000000 00000000 00000000 00000000 00000000 ................................ 000180
00000000 00000000 00000118 01190000 00000000 00000000 00000000 00000000 ................................ 0001A0
00000000 00000000 00000000 00000000 00000000 00000000 00000000 00000000 ................................ 0001C0
00000000 00000000 00000000 00000000 00000000 00000000 00000000 00000000 ................................ 0001E0
```

Dump of file SATURN:[PCCOMMON.DUMP.DLL]PDLSYN.TMP;1 on 18-APR-1990 10:48:45.27
File ID (771,27,0) . End of file block 276 / Allocated 276

Virtual block number 129 (00000081), 512 (0200) bytes

```
00000000 00000000 00000000 00000000 00000000 00000000 00000000 00000000 ................................ 000000
00000000 00000000 00000000 00000000 00000000 00000000 00000000 00000000 ................................ 000020
00000000 00000000 00000000 00000000 00000000 00000000 00000000 00000000 ................................ 000040
00000000 00000000 00000000 00000000 0000011A 00000000 00000000 00000000 ................................ 000060
00000000 00000000 00000000 00000000 00000000 00000000 00000000 00000000 ................................ 000080
00000000 00000000 0000011B 00000000 00000000 00000000 00000000 00000000 ................................ 0000A0
00000000 00000000 00000000 00000117 00000000 00000000 00000000 00000000 ................................ 0000C0
00000000 00000000 00000000 00000000 00000000 00000000 00000000 00000000 ................................ 0000E0
00000000 00000000 00000000 00000000 00000000 00000000 00000000 00000000 ................................ 000100
00000000 00000000 00000000 00000000 00000000 00000000 00000005 00050000 ..f.f........................... 000120
00000000 00000000 00000000 00000000 00000000 00000000 00000000 00000000 ................................ 000140
00000000 00000000 00000000 00000000 00000000 00000000 00000000 00000000 ................................ 000160
00000000 00000000 00000000 00000000 00000000 00000000 00000000 00000000 ................................ 000180
00000000 00000000 00000000 00000000 00000000 00000000 00000000 00000000 ................................ 0001A0
00000005 00000000 00000000 00000000 00000000 00000000 00000000 00000000 ............................f... 0001C0
00000000 00000000 00000000 00000000 00000000 00000000 00000000 00000000 ................................ 0001E0
```

Dump of file SATURN:[PCCOMMON.DUMP.DLL]PDLSYN.TMP;1 on 18-APR-1990 10:48:45.27
File ID (771,27,0)   End of file block 276 / Allocated 276

```
Virtual block number 130 (00000082), 512 (0200) bytes

00000000 00000000 00000000 00000000 00000000 00000000 00000000 00000000 ................................ 000000
00000000 00000000 00000000 00000000 00000000 00000000 00000005 00000000 ....f........................... 000020
00000000 00000000 00000000 00000000 00000000 00000000 00000000 00000005 f............................... 000040
00000000 00000000 00000000 00000000 00000000 00000000 00000000 00000000 ................................ 000060
00DF0000 00000000 000000DF 00DF0000 00000000 00DF00DF 00000000 00DF0000 ..Ô.....Ô.Ô.......Ô.Ô.........Ô. 000080
00000000 00000000 000000DF 00DF00DF 00DF0000 00000000 000000DF 00000000 ....Ô.........Ô.Ô.Ô.Ô........... 0000A0
00000000 00000000 00000000 00000000 00000000 00000000 00000000 00000000 ................................ 0000C0
000000DF 00000000 00000000 000000DF 00DF0000 00000000 000000DF 000000DF Ô...Ô.........Ô.Ô...........Ô... 0000E0
00000000 00000000 00000000 00000000 00000000 00000000 00DF0000 00000000 ......Ô......................... 000100
000000DF 00000000 000000DF 000000DF 00DF00DF 00000000 00DF0000 00DF0000 ..Ô...Ô.....Ô.Ô.Ô...Ô.......Ô... 000120
00000000 00000000 00000000 00000000 000000DF 00000000 00DF0000 00DF00DF Ô.Ô...Ô.....Ô................... 000140
00DF00DF 00000000 00000000 00DF0000 00000000 00000000 00000000 000000DF Ô.................Ô.........Ô.Ô. 000160
000000DF 00DF00DF 00DF00DF 00DF00DF 00DF00DF 00000000 00000000 000000DF Ô...........Ô.Ô.Ô.Ô.Ô.Ô.Ô.Ô.Ô... 000180
00000000 00DF00DF 000000DF 000000DF 00000000 00000000 00000000 00000000 ................Ô...Ô...Ô.Ô..... 0001A0
00000000 00000000 00000000 00000000 00000000 00000000 00DF0000 00000000 ......Ô......................... 0001C0
00000000 00000000 00000000 00000000 00000000 00000000 00000000 00000000 ................................ 0001E0

Dump of file SATURN:[PCCOMMON.DUMP.DLL]PDLSYN.TMP;1 on 18-APR-1990 10:48:45.27
File ID (771,27,0)   End of file block 276 / Allocated 276

Virtual block number 131 (00000083), 512 (0200) bytes

00000000 00000000 00000000 00000000 00000000 00000000 00000000 00000000 ................................ 000000
00000000 00000000 00000000 00000000 00000000 00000000 00000000 00000000 ................................ 000020
0000002C 00000000 00000000 00000000 00000000 00000000 00000000 00000000 ............................,... 000040
00000000 00000000 00000000 00000000 00000000 00000000 00000000 00000000 ................................ 000060
00000000 00000000 00000000 00000000 00000000 00000000 00000000 00000000 ................................ 000080
00000000 00000000 00000000 00000000 00000000 00000000 00000000 00000000 ................................ 0000A0
00000000 00000000 00000000 00000000 00000000 00000000 00000000 00000000 ................................ 0000C0
00000000 002D002E 00000000 00000000 00000000 0000002A 0000002B 00000000 ....+...*.................-..... 0000E0
00000000 00000000 00000000 00000000 00000000 00000000 00000000 00000000 ................................ 000100
00000000 00000000 00000000 00000000 00000000 00000000 00000000 00000000 ................................ 000120
00000000 00000000 00000000 00000000 00000000 00000000 00000000 00000000 ................................ 000140
00000000 00000000 00000000 00000000 00000000 00000000 00000000 00000000 ................................ 000160
00000000 00000000 00910000 00000000 00000000 00000000 00000000 00000000 ................................ 000180
00000000 00000000 00000000 00000000 00000000 00000000 00000000 00000000 ................................ 0001A0
00000000 00000000 00000000 00000000 00000000 00000000 00000000 00000000 ................................ 0001C0
00000000 00000000 00000000 00000000 00000000 00000000 00000000 00000000 ................................ 0001E0

Dump of file SATURN:[PCCOMMON.DUMP.DLL]PDLSYN.TMP;1 on 18-APR-1990 10:48:45.27
File ID (771,27,0)   End of file block 276 / Allocated 276

Virtual block number 132 (00000084), 512 (0200) bytes

00000000 00000000 00000000 00000000 00000000 00000000 00000000 00000000 ................................ 000000
00000000 00000000 00000000 00000000 00000000 00000000 00000000 00000000 ................................ 000020
00000000 00000000 00000000 00000000 00000000 00000000 00000000 00000000 ................................ 000040
00000000 00000000 00000000 00000000 00000000 00000000 00000000 00000000 ................................ 000060
00000000 00000000 00000000 00000000 00000000 00000000 00000000 00000000 ................................ 000080
00000000 00000000 00000000 00000000 00000000 00000000 00000000 00000000 ................................ 0000A0
00000000 00000000 00000000 00000000 00000000 00000000 00000000 00000000 ................................ 0000C0
00000000 00000000 00000000 00000000 00000000 00000000 00000000 00000000 ................................ 0000E0
00000000 00000000 00000000 00000000 00000000 00A20000 00000000 00000000 ..........Â..................... 000100
00000000 00000000 00000000 00000000 00000000 00000000 00000000 00000000 ................................ 000120
00000000 00000000 00000000 00000000 00000000 00000000 00000000 00000000 ................................ 000140
00000000 00000000 00000000 00000000 00000000 00000000 00000000 00000000 ................................ 000160
00000000 00000000 00000000 00000000 00000000 00000000 00000000 00000000 ................................ 000180
00000000 00000000 00000000 00000000 00000000 00000000 00000000 00000000 ................................ 0001A0
00000000 00000000 00000000 00000000 00000000 00000000 00000000 00000000 ................................ 0001C0
00000000 00000000 00000000 00000000 00000000 00000000 00000000 00000000 ................................ 0001E0

Dump of file SATURN:[PCCOMMON.DUMP.DLL]PDLSYN.TMP;1 on 18-APR-1990 10:48:45.27
File ID (771,27,0)   End of file block 276 / Allocated 276
```

```
Virtual block number 133 (00000085), 512 (0200) bytes

 00000000 00000000 00000000 00000000 00000000 00000000 00000000 00000000 ................................ 000000
 00000000 00000000 00000000 00000000 00000000 00000000 00000000 00000000 ................................ 000020
 00000000 00000000 00000000 00000000 00000000 00000000 00000000 00000000 ................................ 000040
 00000000 00000000 00000000 00000000 00000000 00000000 00000000 00000000 ................................ 000060
 00000001 00000000 00000000 00000000 00000000 00000000 00000000 00000000 ............................1... 000080
 00000000 00000000 00000000 00000000 00000000 00000000 00000000 00000000 ................................ 0000A0
 00000000 00000000 00000000 00000000 00000000 00000000 00000000 00000000 ................................ 0000C0
 00000000 00000000 00000000 00000000 00000000 00000000 00000000 00000000 ................................ 0000E0
 00000000 00000000 00000000 00000000 00000000 00000000 00000000 00000000 ................................ 000100
 00000000 00000000 00000000 00000000 00000000 00000000 00000000 00000000 ................................ 000120
 00000000 00000000 00000000 00000000 00000000 00000000 00000000 00000000 ................................ 000140
 00000000 00000000 00000000 00000000 00000000 00000000 00000000 00000000 ................................ 000160
 00000000 00000000 00000000 00000000 00000000 00000000 00000000 00000000 ................................ 000180
 00000000 00E200E2 00000000 00E20000 00000000 00000000 00000000 00000000 ..................ã.....ã.ã..... 0001A0
 00E20000 00000000 000000E2 00000000 00E20000 00000000 000000E2 00E20000 ..ã.ã.........ã.....ã.........ã. 0001C0
 00000000 00000000 00000000 00000000 00000000 00000000 000000E2 00E200E2 ã.ã.ã........................... 0001E0

Dump of file SATURN:[PCCOMMON.DUMP.DLL]PDLSYN.TMP;1 on 18-APR-1990 10:48:45.27
File ID (771,27,0)   End of file block 276 / Allocated 276

Virtual block number 134 (00000086), 512 (0200) bytes

 00E20000 00000000 000000E2 000000E2 00000000 00000000 00000000 00000000 ................ã...ã.........ã. 000000
 00000000 00000000 00E20000 00000000 000000E2 00000000 00000000 000000E2 ã...........ã.........ã......... 000020
 00E200E2 00000000 00E20000 00E20000 00000000 00000000 00000000 00000000 ..................ã...ã.....ã.ã. 000040
 000000E2 00000000 00E20000 00E200E2 000000E2 00000000 000000E2 000000E2 ã...ã.......ã...ã.ã...ã.....ã... 000060
 00000000 00000000 00000000 000000E2 00000000 00000000 00000000 00000000 ................ã............... 000080
 00E200E2 00000000 00000000 000000E2 00E200E2 00000000 00000000 00E20000 ..ã.........ã.ã.ã...........ã.ã. 0000A0
 00000000 00000000 00000000 00000000 000000E2 00E200E2 00E200E2 00E200E2 ã.ã.ã.ã.ã.ã.ã................... 0000C0
 00000000 00000000 00E20000 00000000 00000000 00E200E2 000000E2 000000E2 ã...ã...ã.ã...........ã......... 0000E0
 00000000 00000000 00000000 00000000 00000000 00000000 00000000 00000000 ................................ 000100
 00000000 00000000 00000000 00000000 00000000 00000000 00000000 00000000 ................................ 000120
 00000000 00000000 00000000 00000000 00000000 00000000 00000000 00000000 ................................ 000140
 00000000 00000000 00000000 00000000 00000000 00000000 00000000 00000000 ................................ 000160
 00000000 00000000 00000000 00000000 00000033 00000000 00000000 00000000 ............3................... 000180
 00000000 00000000 00000000 00000000 00000000 00000000 00000000 00000000 ................................ 0001A0
 00000000 00000000 00000000 00000000 00000000 00000000 00000000 00000000 ................................ 0001C0
 00000000 00000000 00000000 00000000 00000000 00000000 00000000 00000000 ................................ 0001E0

Dump of file SATURN:[PCCOMMON.DUMP.DLL]PDLSYN.TMP;1 on 18-APR-1990 10:48:45.27
File ID (771,27,0)   End of file block 276 / Allocated 276

Virtual block number 135 (00000087), 512 (0200) bytes

 00000000 00000000 00000000 00000000 00000000 00000000 00000000 00000000 ................................ 000000
 00000000 00000000 00000000 00000000 00000000 00000000 00000000 00000000 ................................ 000020
 00000000 00000000 00000000 00000000 00000000 00000000 00000000 00000000 ................................ 000040
 00000000 00000000 00000000 00000000 00000000 00000000 00000000 00000000 ................................ 000060
 00000000 00090009 00000000 00090000 00000000 00000000 00000000 00000000 ..................).....).)..... 000080
 00090000 00000000 00000009 00000000 00090000 00000000 00000009 00090000 ..).).........).....).........). 0000A0
 00000000 00000000 00000000 00000000 00000000 00000000 00000009 00090009 ).).)........................... 0000C0
 00090000 00000000 00000009 00000009 00000000 00000000 00000000 00000000 ................)...).........). 0000E0
 00000000 00000000 00090000 00000000 00000009 00000000 00000000 00000009 )...........).........)......... 000100
 00090009 00000000 00090000 00090000 00000000 00000000 00000000 00000000 ..................)...).....).). 000120
 00000009 00000000 00090000 00090009 00000009 00000000 00000009 00000009 )...).......)...).)...).....)... 000140
 00000000 00000000 00000000 00000009 00000000 00000000 00000000 00000000 ................)............... 000160
 00090009 00000000 00000000 00000009 00090009 00000000 00000000 00090000 ..).........).).)...........).). 000180
 00000000 00000000 00000000 00000000 00000009 00090009 00090009 00090009 ).).).).).).)................... 0001A0
 00000000 00000000 00090000 00000000 00000000 00090009 00000009 00000009 )...)...).)...........)......... 0001C0
 00000000 00000000 00000000 00000000 00000000 00000000 00000000 00000000 ................................ 0001E0

Dump of file SATURN:[PCCOMMON.DUMP.DLL]PDLSYN.TMP;1 on 18-APR-1990 10:48:45.27
File ID (771,27,0)   End of file block 276 / Allocated 276
```

```
Virtual block number 136 (00000088), 512 (0200) bytes

00000000 00000000 00000000 00000000 00000000 00000000 00000000 00000000 ................................ 000000
00000000 00000000 00000000 00000000 00000000 00000000 00000000 00000000 ................................ 000020
00000000 00000000 00000000 00000000 00000000 00000000 00000000 00000000 ................................ 000040
00000000 00000000 00000000 00000000 00000000 003D0000 00000000 00000000 ..........=..................... 000060
00000000 00000000 00000000 00000000 00000000 00000000 00000000 00000000 ................................ 000080
00000000 00000000 00000000 00000000 00000000 00000000 00000000 00000000 ................................ 0000A0
00000000 00000000 00000000 00000000 00000000 00000000 00000000 00000000 ................................ 0000C0
00000000 00000000 00000000 00000000 00000000 00000000 00000000 00000000 ................................ 0000E0
00000000 00000000 00000000 00000000 00000000 00000000 00000000 00000000 ................................ 000100
00000000 00000000 00000000 00000000 00000000 00000000 00000000 00000000 ................................ 000120
00000000 00000000 00000000 00000000 00000000 00000000 00000000 00000000 ................................ 000140
00000000 00FC00FA 00000000 00FC0000 00000000 00000000 00000000 00000000 ..................■.....¹.■..... 000160
00FC0000 00000000 000000FC 00000000 00FC0000 00000000 000000FB 00FB0000 ..«.«.........■.....■.........■. 000180
00000000 00000000 00000000 00000000 00000000 00000000 000000FC 00FC00FC ■.■.■........................... 0001A0
00FC0000 00000000 000000FA 000000FC 00000000 00000000 00000000 00000000 ................■...¹.........■. 0001C0
00000000 00000000 00FC0000 00000000 000000FA 00000000 00000000 000000FC ■...........¹.........■......... 0001E0

Dump of file SATURN:[PCCOMMON.DUMP.DLL]PDLSYN.TMP;1 on 18-APR-1990 10:48:45.27
File ID (771,27,0)   End of file block 276 / Allocated 276

Virtual block number 137 (00000089), 512 (0200) bytes

00FC00FC 00000000 00FC0000 00F90000 00000000 00000000 00000000 00000000 ..................¹...■.....■.■. 000000
000000FB 00000000 00FC0000 00FC00FA 000000FC 00000000 000000FC 000000FC ■...■.......■...¹.■...■.....«... 000020
00000000 00000000 00000000 000000FC 00000000 00000000 00000000 00000000 ................■............... 000040
00FC00FC 00000000 00000000 000000FC 00FC00FC 00000000 00000000 00FC0000 ..■.........■.■.■...........■.■. 000060
00000000 00000000 00000000 00000000 000000FC 00FC00FC 00FC00FB 00FC00FC ■.■.«.■.■.■.■................... 000080
00000000 00000000 00FC0000 00000000 00000000 00FC00FC 000000FC 000000FB «...■...■.■...........■......... 0000A0
00000000 00000000 00000000 00000000 00000000 00000000 00000000 00000000 ................................ 0000C0
00000000 00000000 00000000 00000000 00000000 00000000 00000000 00000000 ................................ 0000E0
00000000 00000000 00000000 00000000 00000000 00000000 00000000 00000000 ................................ 000100
00000000 00000000 00000000 00000000 00000000 00000000 00000000 00000000 ................................ 000120
00000000 00000086 00000000 00000000 00000000 00000000 00000000 00000000 ................................ 000140
00000000 00000000 00000000 00000000 00000000 00000000 00000000 00000000 ................................ 000160
00000000 00000000 00000000 00000000 00000000 00000000 00000000 00000000 ................................ 000180
00000000 00000000 00000000 00000000 00000000 00000000 00000000 00000000 ................................ 0001A0
00000000 00000000 00000000 00000000 00000000 00000000 00000000 00000000 ................................ 0001C0
00000000 00000000 00000000 00000000 00000000 00000000 00000000 00000000 ................................ 0001E0

Dump of file SATURN:[PCCOMMON.DUMP.DLL]PDLSYN.TMP;1 on 18-APR-1990 10:48:45.27
File ID (771,27,0)   End of file block 276 / Allocated 276

Virtual block number 138 (0000008A), 512 (0200) bytes

00000000 00000000 00000000 00000000 00000000 00000000 00000000 00000000 ................................ 000000
00000000 00000000 00000000 00000000 00000000 00000000 00000000 00000000 ................................ 000020
00000000 00000000 00000000 00000000 00000000 00000000 00000000 00000000 ................................ 000040
00000000 00000000 00000000 00000000 00000000 00000000 00000000 00000000 ................................ 000060
00000000 00000000 00000000 00000000 00000000 00000000 00000000 00000000 ................................ 000080
00000000 00000000 00000000 00000000 00000000 00000000 00000000 00000000 ................................ 0000A0
00000000 00000000 00000000 00000000 00000000 00000062 00000000 00000000 ........b....................... 0000C0
00000000 00000000 00000000 00000000 00000000 00000000 00000000 00000000 ................................ 0000E0
00000000 00000000 00000000 00000000 00000000 00000000 00000000 00000000 ................................ 000100
00000000 00000000 00000000 00000000 00000000 00000000 00000000 00000000 ................................ 000120
00000000 00000000 00000000 00000000 00000000 00000000 00000000 00000000 ................................ 000140
00000000 00000000 00000000 00000000 00000000 00000000 00000000 00000000 ................................ 000160
00000000 00000000 00000000 00000000 00000000 00000000 00000000 00000000 ................................ 000180
00000000 00000000 00000000 00000000 00000000 00000000 00000000 00000000 ................................ 0001A0
00000000 00000000 00000000 00000000 00000000 00000000 00000000 00000000 ................................ 0001C0
00000000 00000000 00000000 00000000 00000000 00000000 00000000 00000000 ................................ 0001E0

Dump of file SATURN:[PCCOMMON.DUMP.DLL]PDLSYN.TMP;1 on 18-APR-1990 10:48:45.27
File ID (771,27,0)   End of file block 276 / Allocated 276
```

```
Virtual block number 139 (0000008B), 512 (0200) bytes

 00000000 00000000 00000000 00000000 00000000 00000000 00000000 00000000 ................................ 000000
 00000000 00000000 00000000 00000000 00000000 00000000 00000000 00000000 ................................ 000020
 00000000 00000000 00000000 00000000 00000000 00000000 00000000 0000007D )............................... 000040
 00000000 00000000 00000000 00000000 00000000 00000000 00000000 00000000 ................................ 000060
 00000000 00000000 00000000 00000000 00000000 00000000 00000000 00000000 ................................ 000080
 00000000 00000000 00000000 00000000 00000000 00000000 00000000 00000000 ................................ 0000A0
 00000000 00000000 00000000 00000000 00000000 00000000 00000000 00000000 ................................ 0000C0
 00000000 00000000 00000000 00000000 00000000 00000000 00000000 00000000 ................................ 0000E0
 00000000 00000000 00000000 00000000 00000000 00000000 00000000 00000000 ................................ 000100
 00000000 00000000 00000000 00000000 00000000 00000000 00000000 00000000 ................................ 000120
 00000000 00000000 00000000 00000000 00000000 00000000 00000000 00000000 ................................ 000140
 00000000 00000000 00000000 00000000 00000000 00000000 00000000 00000000 ................................ 000160
 00000000 00000000 00000000 00000000 00000000 00000000 00000000 00000000 ................................ 000180
 00000000 00000000 00000080 00000000 00000000 00000000 00000000 00000000 ................................ 0001A0
 00000000 00000000 00000000 00000000 00000000 00000000 00000000 00000000 ................................ 0001C0
 00000000 00000000 00000000 00000000 00000000 00000000 00000000 00000000 ................................ 0001E0

Dump of file SATURN:[PCCOMMON.DUMP.DLL]PDLSYN.TMP;1 on 18-APR-1990 10:48:45.27
File ID (771,27,0)   End of file block 276 / Allocated 276

Virtual block number 140 (0000008C), 512 (0200) bytes

 00000000 00000000 00000000 00000000 00000000 00000000 00000000 00000000 ................................ 000000
 00000000 00000000 00000000 00000000 00000000 00000000 00000000 00000000 ................................ 000020
 00000000 00000000 00000000 00000000 00000000 00000000 00000000 00000000 ................................ 000040
 00000000 00000000 00000000 00000000 00000000 00000000 00000000 00000000 ................................ 000060
 00000000 00000000 00000000 00000000 00000000 00000000 00000000 00000000 ................................ 000080
 00000000 00000000 00000000 00000000 00000000 00000100 00000000 00000000 ................................ 0000A0
 00000000 00000000 00000000 00000000 00000000 00000000 00000000 00000000 ................................ 0000C0
 00000000 00000000 00000000 00000000 00000000 00000000 00000000 00000000 ................................ 0000E0
 00000103 00000000 00000000 00000000 00000000 00000000 00000102 00000000 ................................ 000100
 00000000 00000000 00000000 00000000 00000000 00000000 00000000 00000000 ................................ 000120
 00000000 00000000 00000000 00000000 00000000 00000000 00000000 00000000 ................................ 000140
 00000000 00000000 00000000 00000000 00000000 00000000 00000000 00000101 ................................ 000160
 00000000 00000000 00000000 00000000 00000000 00000000 00000000 00000000 ................................ 000180
 00000000 00000000 00000000 00000000 00000000 00000000 00000000 00000000 ................................ 0001A0
 00000000 00000000 00000000 00000000 00000000 00000000 00000000 00000000 ................................ 0001C0
 00000000 00000000 00000000 00000000 00000000 00000000 00000000 00000000 ................................ 0001E0

Dump of file SATURN:[PCCOMMON.DUMP.DLL]PDLSYN.TMP;1 on 18-APR-1990 10:48:45.27
File ID (771,27,0)   End of file block 276 / Allocated 276

Virtual block number 141 (0000008D), 512 (0200) bytes

 00000000 00000000 00000000 00000000 00000000 00000000 00000000 00000000 ................................ 000000
 00000000 00000000 00000000 00000000 00000000 00000000 00000000 00000000 ................................ 000020
 00000000 00000000 00000000 00000000 00000000 00000000 00000000 00000000 ................................ 000040
 00000000 00000000 00000000 00000000 00000000 00000000 00000000 00000000 ................................ 000060
 00000000 00CD0000 00000000 00000000 00000000 00000000 00000000 00000000 ..........................ë..... 000080
 00000000 00000000 00000000 00000000 00000000 00000000 00000000 00000000 ................................ 0000A0
 00000000 00000000 00000000 00000000 00000000 00000000 00000000 00000000 ................................ 0000C0
 00000000 00000000 00000000 00000000 00000000 00000000 00000000 00000000 ................................ 0000E0
 00000000 00000000 00000000 00000000 00000000 00000000 00000000 00000000 ................................ 000100
 00000000 00000000 00000000 00000000 00000000 00000000 00000000 00000000 ................................ 000120
 00000000 00000000 00000000 00000000 00000000 00000000 00000000 00000000 ................................ 000140
 00000000 00000000 00000000 00000000 00000000 00000000 00000000 00000000 ................................ 000160
 00000000 00000000 00000000 00000000 00000000 00000000 00000000 00000000 ................................ 000180
 00000000 00000000 00000000 00000000 00000000 00000000 00000000 00000000 ................................ 0001A0
 00000000 00000000 00000000 00000000 00000000 00000000 00000000 00000000 ................................ 0001C0
 00000000 00000000 00000000 00000000 00000000 00000000 00000000 00000000 ................................ 0001E0

Dump of file SATURN:[PCCOMMON.DUMP.DLL]PDLSYN.TMP;1 on 18-APR-1990 10:48:45.27
File ID (771,27,0)   End of file block 276 / Allocated 276
```

```
Virtual block number 142 (0000008E), 512 (0200) bytes

00000000 00000000 00000000 00000000 00000000 00000000 00000000 00000000 ................................ 000000
00000000 00000000 00000000 00000000 00000000 00000000 00000000 00000000 ................................ 000020
00000000 00000000 00000000 00000000 00000000 00000000 00000000 00000000 ................................ 000040
00000000 00000000 00000000 00000000 00000000 00000000 00000000 00000000 ................................ 000060
00000000 00000000 00000000 00000000 00000000 00000000 00000000 00000000 ................................ 000080
00000000 00000000 00000000 00000000 00000000 00000000 00000000 00000000 ................................ 0000A0
00000000 00000000 00000000 00000000 00000000 00000000 00000000 00000000 ................................ 0000C0
00000000 00000000 00000000 00000000 00000000 00000000 00000000 00000000 ................................ 0000E0
00000000 00000000 00000000 00000000 00000000 00000000 00000000 00000000 ................................ 000100
00000000 00000000 00000000 00000000 00000000 00000000 00000000 00000000 ................................ 000120
00000000 00000000 00000000 00000000 00000000 00000000 00000000 00000000 ................................ 000140
00A50000 00000000 00000000 00000000 00000000 00000000 00000000 00000000 ..............................É. 000160
00000000 00000000 00000000 00000000 00000000 00000000 00000000 00000000 ................................ 000180
00000000 00000000 00000000 00000000 00000000 00000000 00000000 00000000 ................................ 0001A0
00000000 00000000 00000000 00000000 00000000 00000000 00000000 00000000 ................................ 0001C0
00000000 00000000 00000000 00000000 00000000 00000000 00000000 00000000 ................................ 0001E0

Dump of file SATURN:[PCCOMMON.DUMP.DLL]PDLSYN.TMP;1 on 18-APR-1990 10:48:45.27
File ID (771,27,0)   End of file block 276 / Allocated 276

Virtual block number 143 (0000008F), 512 (0200) bytes

00000000 00000000 00000000 00000000 00000000 00000000 00000000 00000000 ................................ 000000
00000000 00000000 00000000 00000000 00000000 00000000 00000000 00000000 ................................ 000020
00000000 00000000 00000000 00000000 00000000 00000000 00000000 00000000 ................................ 000040
00000000 00000000 00000000 00000000 00000000 00000000 00000000 00000000 ................................ 000060
00000000 00000000 00000000 00000000 00000000 00000000 00000000 00000000 ................................ 000080
00000000 00000000 00000000 00000000 00000000 00000000 00000000 00000000 ................................ 0000A0
00000000 00000000 00000000 00000000 00000000 00000000 00000000 00000000 ................................ 0000C0
00000000 00000000 00000000 00000000 00000000 00000000 00000000 00000000 ................................ 0000E0
00000000 00000000 00000000 00000000 00000000 00000000 00000000 00000000 ................................ 000100
00000000 00000000 00000000 00000000 00000000 00000000 00000000 00000000 ................................ 000120
00000000 00000000 00000000 00000000 00000000 00000000 00000000 00000000 ................................ 000140
00000000 00000000 00000000 00000000 00000000 00000000 00000000 00000000 ................................ 000160
00000000 00000000 00000000 00000000 00000000 00000000 00000000 00000000 ................................ 000180
00000000 00000000 00000000 00000000 00000000 00000000 00000000 00000000 ................................ 0001A0
00000000 00000000 00000000 00000000 00000000 00000000 00000000 00000000 ................................ 0001C0
00000000 00000000 00000000 00000000 00000000 00000000 00000000 00000000 ................................ 0001E0

Dump of file SATURN:[PCCOMMON.DUMP.DLL]PDLSYN.TMP;1 on 18-APR-1990 10:48:45.27
File ID (771,27,0)   End of file block 276 / Allocated 276

Virtual block number 144 (00000090), 512 (0200) bytes

00000000 00000000 00000000 00000000 00000000 00000000 00000000 00000000 ................................ 000000
00000000 00000000 00000000 00000000 00000000 00000000 00000000 00000000 ................................ 000020
00000000 00000000 00000000 00000000 00000000 00000000 00000000 00000000 ................................ 000040
00000000 00000000 00000000 00000000 00000000 00000000 00000000 01100000 ................................ 000060
00000000 00000000 00000000 00000000 00000000 00000000 00000000 00000000 ................................ 000080
00000000 00000000 00000000 00000000 00000000 00000000 00000000 00000000 ................................ 0000A0
00000000 00000000 00000000 00000000 00000000 00000000 00000000 00000000 ................................ 0000C0
00000000 00000000 00000000 00000000 00000000 00000000 00000000 00000000 ................................ 0000E0
00000000 00000000 00000000 00000000 00000000 00000000 00000000 00000000 ................................ 000100
00000000 00000000 00000000 00000000 00000000 00000000 00000000 00000000 ................................ 000120
00000000 00000000 00000000 00000000 00000000 00000000 00000000 00000000 ................................ 000140
00000000 00000000 00000000 00000000 00000000 00000000 00000000 00000000 ................................ 000160
00000000 00000000 00000000 00000000 00000000 00000000 00000000 00000000 ................................ 000180
00000000 00000000 00000000 00000000 00000000 00000000 00000000 00000000 ................................ 0001A0
00000000 00000000 00000000 00400000 00000000 00000000 00000000 00000000 ..................@............. 0001C0
00000000 00000000 00000000 00000000 00000000 00000000 00000000 00000000 ................................ 0001E0

Dump of file SATURN:[PCCOMMON.DUMP.DLL]PDLSYN.TMP;1 on 18-APR-1990 10:48:45.27
File ID (771,27,0)   End of file block 276 / Allocated 276
```

```
Virtual block number 145 (00000091), 512 (0200) bytes

00000000 00000000 00000000 00000000 00000000 00000000 00000000 00000000 ................................ 000000
00000000 00000000 00000000 00000000 00000000 00000000 00000000 00000000 ................................ 000020
00000000 00000000 00000000 00000000 00000000 00000000 00000000 00000000 ................................ 000040
00000000 00000000 00000000 00000000 00000000 00000000 00000000 00000000 ................................ 000060
00000000 00000000 00000000 00000000 00000000 00000000 00000000 00000000 ................................ 000080
00000000 00000000 00000000 00000000 00000000 00000000 00000000 00000000 ................................ 0000A0
00000000 00000000 00000000 00000000 00000000 00000000 00000000 00000000 ................................ 0000C0
00000000 00000000 00000000 00000000 00000000 00000000 00000000 00000000 ................................ 0000E0
00000000 00000000 00000000 00000000 00000000 00000000 00000000 00000000 ................................ 000100
00000000 00000000 00000000 00000000 00000000 00000000 00000000 00000000 ................................ 000120
00000000 00000000 00000000 00000000 00000000 00000000 009A0000 00000000 ................................ 000140
00000000 00000000 00000000 00000000 00000000 00000000 00000000 00000000 ................................ 000160
00000000 00000000 00000000 00000000 00000000 00000000 00000000 00000000 ................................ 000180
00000000 00000000 00000000 00000000 00000000 00000000 00000000 00000000 ................................ 0001A0
00000000 00000000 00000000 00000000 00000000 00000000 00000000 00000000 ................................ 0001C0
00000000 00000000 00000000 00000000 00000000 00000000 00000000 00000000 ................................ 0001E0

Dump of file SATURN:[PCCOMMON.DUMP.DLL]PDLSYN.TMP;1 on 18-APR-1990 10:48:45.27
File ID (771,27,0)   End of file block 276 / Allocated 276

Virtual block number 146 (00000092), 512 (0200) bytes

00000000 00000000 00000000 00000000 00000000 00000000 00000000 00000000 ................................ 000000
00000000 00000000 00000000 00000000 00000000 00000000 00000000 00000000 ................................ 000020
00000000 00000000 00000000 00000000 00000000 00000000 00000000 00000000 ................................ 000040
00000000 00000000 00000000 00000000 00000000 00000000 00000000 00000000 ................................ 000060
00000000 00000000 00000000 00000000 00000000 00000000 00000000 00000000 ................................ 000080
00000000 0000003C 00000000 00000000 00000000 00000000 00000000 00000000 ........................<....... 0000A0
00000000 00000000 00000000 00000000 00000000 00000000 00000000 00000000 ................................ 0000C0
00000000 00000000 00000000 00000000 00000000 00000000 00000000 00000000 ................................ 0000E0
00000000 00000000 00000000 00000000 00000000 00000000 00000000 00000000 ................................ 000100
00000000 00000000 00000000 00000000 00000000 00000000 00000000 00000000 ................................ 000120
00000000 00000000 00000000 00000000 00000000 00000000 00000000 00000000 ................................ 000140
00000000 00000000 00000000 00000000 00000000 00000000 00000000 00000000 ................................ 000160
00000000 00000000 00000000 00000000 00000000 00000000 00000000 00000000 ................................ 000180
00000000 00000000 00000000 00000000 00000000 00000000 00000000 00000000 ................................ 0001A0
00000000 00000000 00000000 00000000 00000000 00000000 00000000 00000000 ................................ 0001C0
00000000 00000000 00000000 00000000 00000000 00000000 00000000 00000000 ................................ 0001E0

Dump of file SATURN:[PCCOMMON.DUMP.DLL]PDLSYN.TMP;1 on 18-APR-1990 10:48:45.27
File ID (771,27,0)   End of file block 276 / Allocated 276

Virtual block number 147 (00000093), 512 (0200) bytes

00000000 00000000 00000000 00000000 00000000 00000000 00000000 00000000 ................................ 000000
00000000 00000000 00000000 00000000 00000000 00000000 00000000 00000000 ................................ 000020
00000000 00000000 00000000 00000000 00000000 00000000 00000000 00000000 ................................ 000040
00290000 00000000 00000000 00000000 00000000 00000000 00000000 00000000 ..............................). 000060
00000000 00000000 00000000 00280000 00000000 00000000 00000000 00000000 .................(.............. 000080
00000000 00000000 00000000 00000000 00000000 00000000 00000000 00000000 ................................ 0000A0
00000000 00000000 00000000 00000000 00000000 00000000 00000000 00000000 ................................ 0000C0
00000000 00000000 00000000 00000000 00000000 00000000 00000000 00000000 ................................ 0000E0
00000000 00000000 00000000 00000000 00000000 00000000 00AE0000 00000000 ......Ô......................... 000100
00000000 00000000 00000000 00000000 00000000 00000000 00000000 00000000 ................................ 000120
00000000 00000000 00000000 00000000 00000000 00000000 00000000 00000000 ................................ 000140
00000000 00000000 00000000 00000000 00000000 00000000 00000000 00AA0000 ..ª............................. 000160
00000000 00000000 00000000 00000000 00A900AD 00000000 00000000 00000000 .............Ü.`................ 000180
00000000 00000000 00000000 00000000 00000000 00000000 00000000 00000000 ................................ 0001A0
00AC0000 00000000 00000000 00000000 00000000 00000000 00000000 00000000 ..............................¯. 0001C0
00000000 00000000 00000000 00000000 00000000 00000000 00000000 00000000 ................................ 0001E0

Dump of file SATURN:[PCCOMMON.DUMP.DLL]PDLSYN.TMP;1 on 18-APR-1990 10:48:45.27
File ID (771,27,0)   End of file block 276 / Allocated 276
```

```
Virtual block number 148 (00000094), 512 (0200) bytes

00000000 00000000 00000000 00000000 00000000 00000000 00000000 00000000 ................................ 000000
00000000 00000000 00000000 00AB0000 00000000 00000000 00000000 00000000 ................................ 000020
00000000 00000000 00000000 00000000 00000000 00000000 00000000 00000000 ................................ 000040
00000000 00000000 00000000 00000000 00000000 00000000 00000000 00000000 ................................ 000060
00000000 00000000 00000000 00000000 00000000 00000000 00000000 00000000 ................................ 000080
00000000 00000000 00000000 00000000 00000000 00000000 00680000 00000000 ......h......................... 0000A0
00000000 00000000 00000000 00000000 00000000 00000000 00000000 00000000 ................................ 0000C0
00000000 00000000 00000000 00000000 00000000 00000000 00000000 00000000 ................................ 0000E0
00000000 00000000 00000000 00000000 00000000 00000000 00670000 00000000 ......g......................... 000100
00000000 00000000 00000000 00000000 00000000 00000000 00000000 00000000 ................................ 000120
00000000 00000000 00000000 00000000 00000000 00000000 00000000 00000000 ................................ 000140
00000000 00000000 00000000 00000000 00000000 00000000 006A0000 00000000 ......j......................... 000160
00690000 00000000 00000000 00000000 00000000 00000000 00000000 00000000 ..............................i. 000180
00000000 00000000 00000000 00000000 00000000 00000000 00000000 00000000 ................................ 0001A0
00000000 00000000 00000000 00000000 00000000 00000000 00000000 00000000 ................................ 0001C0
00000000 00000000 00000000 00000000 00000000 00000000 00000000 00000000 ................................ 0001E0

Dump of file SATURN:[PCCOMMON.DUMP.DLL]PDLSYN.TMP;1 on 18-APR-1990 10:48:45.27
File ID (771,27,0)   End of file block 276 / Allocated 276

Virtual block number 149 (00000095), 512 (0200) bytes

00000000 00000000 00000000 00000000 00000000 00000000 00000000 00000000 ................................ 000000
00000000 00000000 00000000 00000000 00000000 00000000 00000000 00000000 ................................ 000020
00000000 00000000 00000000 00000000 00000000 00000000 00000000 00000000 ................................ 000040
00000000 00000000 00000000 00000000 00000000 00000000 00000000 00000000 ................................ 000060
00000000 00000000 00000000 00000000 00000000 00000000 00000000 00000000 ................................ 000080
00000000 00000000 00000000 00000000 00000000 00000000 00000000 00000000 ................................ 0000A0
00000000 00000000 00000000 00000000 00000000 00000000 00000000 00000000 ................................ 0000C0
00000000 00000000 00000000 00000000 00000000 00000000 00C90000 00000000 ......è......................... 0000E0
00000000 00000000 00000000 00000000 00000000 00000000 00000000 00000000 ................................ 000100
00000000 00000000 00000000 00000000 00000000 00000000 00000000 00000000 ................................ 000120
00000000 00000000 00000000 00000000 00000000 00000000 00000000 00000000 ................................ 000140
00000000 00000000 00000000 00000000 00000000 00000000 00000000 00000000 ................................ 000160
00000000 00000000 00000000 00000000 00000000 00000000 00000000 00000000 ................................ 000180
00000000 00000000 00000000 00AF0000 00000000 00000000 00000000 00000000 ................£............... 0001A0
00000000 00000000 00000000 00000000 00000000 00000000 00000000 00000000 ................................ 0001C0
00000000 00000000 00000000 00000000 00000000 00000000 00000000 00000000 ................................ 0001E0

Dump of file SATURN:[PCCOMMON.DUMP.DLL]PDLSYN.TMP;1 on 18-APR-1990 10:48:45.27
File ID (771,27,0)   End of file block 276 / Allocated 276

Virtual block number 150 (00000096), 512 (0200) bytes

00000000 00000000 00000000 00000000 00000000 00000000 00000000 00000000 ................................ 000000
00000000 00000000 00000000 00000000 00800000 00000000 00000000 00000000 ................................ 000020
00000000 00000000 00000000 00000000 00000000 00000000 00000000 00000000 ................................ 000040
00000000 00000000 00000000 00000000 00000000 00000000 00000000 00000000 ................................ 000060
00000000 00000000 00000000 00000000 00000000 00000000 00000000 00000000 ................................ 000080
00000000 00000000 00000000 00000000 00000000 00000000 00000000 00000000 ................................ 0000A0
00000000 00000000 00000000 00000000 00000000 00000000 00000000 00000000 ................................ 0000C0
00000000 00000000 00000000 00000000 00000000 00B40000 00000000 00000000 ..........Ç..................... 0000E0
00000000 00000000 00000000 00000000 00000000 00000000 00000000 00000000 ................................ 000100
00000000 00000000 00000000 00000000 00000000 00000000 00000000 00000000 ................................ 000120
00000000 00000000 00000000 00000000 00000000 00000000 00000000 00000000 ................................ 000140
00000000 00000000 00000000 00000000 00000000 00000000 00000000 00000000 ................................ 000160
00000000 00000000 00000000 00000000 00000000 00000000 00000000 00000000 ................................ 000180
00000000 00000000 00000000 00000000 00000000 00000000 00000000 00000000 ................................ 0001A0
00000000 00000000 00000000 00000000 00000000 00000000 00000000 00000000 ................................ 0001C0
00000000 00000000 00000000 00000000 00000000 00B30000 00000000 00000000 ..........°..................... 0001E0

Dump of file SATURN:[PCCOMMON.DUMP.DLL]PDLSYN.TMP;1 on 18-APR-1990 10:48:45.27
File ID (771,27,0)   End of file block 276 / Allocated 276
```

```
Virtual block number 151 (00000097), 512 (0200) bytes

 00000000 00000000 00000000 00000000 00000000 00000000 00000000 00000000 ................................ 000000
 00000000 00000000 00000000 00000000 00000000 00000000 00000000 00000000 ................................ 000020
 00000000 00000000 00000000 00000000 00000000 00000000 00000000 00000000 ................................ 000040
 00000000 00000000 00000000 00000000 00000000 00000000 00000000 00000000 ................................ 000060
 00000000 00000000 00000000 00000000 00000000 00000000 00000000 00000000 ................................ 000080
 00000000 00000000 00000000 00000000 00000000 00000000 00000000 00000000 ................................ 0000A0
 00000000 00000000 00000000 00000000 00000000 00000000 00000000 00000000 ................................ 0000C0
 00000000 00000000 00000000 00000000 00000000 00000116 00000000 00000000 ................................ 0000E0
 00000000 00000000 00000000 00000000 00000000 00000000 00000000 00000000 ................................ 000100
 00000000 00000000 00000000 00000000 00000000 00000000 00000000 00000000 ................................ 000120
 00000000 00000000 00000000 00000000 00000000 00000000 00000000 00000000 ................................ 000140
 00000000 00000000 00000000 00000000 00000000 00000000 00000000 00000000 ................................ 000160
 00000000 00000000 00000000 00000000 00000000 00000000 00000000 00000000 ................................ 000180
 00000000 00000000 00000000 00000000 00000000 00000000 00000000 00000000 ................................ 0001A0
 00000000 00000000 00000000 00000000 00000000 00000000 00000000 00000000 ................................ 0001C0
 00000000 00000000 00000000 00000000 00000000 00000000 00000000 00000000 ................................ 0001E0

Dump of file SATURN:[PCCOMMON.DUMP.DLL]PDLSYN.TMP;1 on 18-APR-1990 10:48:45.27
File ID (771,27,0)   End of file block 276 / Allocated 276

Virtual block number 152 (00000098), 512 (0200) bytes

 00000000 00000000 00000000 00000000 00000000 00000000 00000000 00000000 ................................ 000000
 00000000 00000000 00000000 00000000 00000000 00000000 00000000 00000000 ................................ 000020
 00000000 00000049 00000000 00000000 00000000 00000000 00000000 00000000 ........................I....... 000040
 00000000 00000000 00000000 00000000 00000000 00000000 00000000 00000000 ................................ 000060
 00000000 00000000 00000000 00000000 00000000 00000000 00000000 00000000 ................................ 000080
 00000000 00000000 00000000 00000000 00000000 00000000 00000000 00000000 ................................ 0000A0
 00000000 00000000 00000000 00000000 00000000 00000000 00000000 00000000 ................................ 0000C0
 00000000 00000000 00000000 00000000 00000000 00000000 00000000 00000000 ................................ 0000E0
 00000000 00F000F0 00000000 00F00000 00000000 00000000 00000000 00000000 ..................þ.....þ.þ..... 000100
 00F00000 00000000 000000F0 00000000 00F00000 00000000 000000F0 00F00000 ..þ.þ.........þ.....þ.........þ. 000120
 00000000 00000000 00000000 00000000 00000000 00000000 000000F0 00F000F0 þ.þ.þ........................... 000140
 00F00000 00000000 000000F0 000000F0 00000000 00000000 00000000 00000000 ................þ...þ.........þ. 000160
 00000000 00000000 00F00000 00000000 000000F0 00000000 00000000 000000F0 þ...........þ.........þ......... 000180
 00F000F0 00000000 00F00000 00F00000 00000000 00000000 00000000 00000000 ..................þ...þ.....þ.þ. 0001A0
 000000F0 00000000 00F00000 00F000F0 000000F0 00000000 000000F0 000000F0 þ...þ.......þ...þ.þ...þ.....þ... 0001C0
 00000000 00000000 00000000 000000F0 00000000 00000000 00000000 00000000 ................þ............... 0001E0

Dump of file SATURN:[PCCOMMON.DUMP.DLL]PDLSYN.TMP;1 on 18-APR-1990 10:48:45.27
File ID (771,27,0)   End of file block 276 / Allocated 276

Virtual block number 153 (00000099), 512 (0200) bytes

 00F000F0 00000000 00000000 000000F0 00F000F0 00000000 00000000 00F00000 ..þ.........þ.þ.þ...........þ.þ. 000000
 00000000 00000000 00000000 00000000 000000F0 00F000F0 00F000F0 00F000F0 þ.þ.þ.þ.þ.þ.þ................... 000020
 00000000 00000000 00F00000 00000000 00000000 00F000F0 000000F0 000000F0 þ...þ...þ.þ...........þ......... 000040
 00000000 00000000 00000000 00000000 00000000 00000000 00000000 00000000 ................................ 000060
 00000000 00000000 00000000 00000000 00000000 00000000 00000000 00000000 ................................ 000080
 00000000 00000000 00000000 00000000 00000000 00000000 00000000 00000000 ................................ 0000A0
 00000000 00000000 00000000 00000000 00000000 00000000 00000000 00000000 ................................ 0000C0
 00000000 00000000 00000000 00000000 00000000 00000000 00000000 00000000 ................................ 0000E0
 00000000 00000000 00000000 00000000 00000000 00000000 00000000 00000000 ................................ 000100
 00000000 00000000 00000000 00000000 00000000 00000000 00000000 00000000 ................................ 000120
 00000000 00000000 00000000 00000000 00000000 00000000 00000000 00000000 ................................ 000140
 00000000 00000000 00000000 00000000 00000000 00000000 00000000 00000000 ................................ 000160
 00000000 00000000 00000000 00000000 00000000 00000000 00000000 00000000 ................................ 000180
 00000000 00000000 00000000 00000000 00000000 00000000 00000000 00000000 ................................ 0001A0
 00000000 00000000 00000000 00000000 00000000 00000000 00000000 00000000 ................................ 0001C0
 00000000 00000000 00000000 00000000 00010000 00000000 00000000 00000000 ................................ 0001E0

Dump of file SATURN:[PCCOMMON.DUMP.DLL]PDLSYN.TMP;1 on 18-APR-1990 10:48:45.27
File ID (771,27,0)   End of file block 276 / Allocated 276
```

```
Virtual block number 154 (0000009A), 512 (0200) bytes

00000000 00000000 00000000 00000000 00000000 00000000 00000000 00000000 ................................ 000000
00000000 00000000 00000000 00000000 00000000 00000000 00000000 00000000 ................................ 000020
00000000 00000000 00000000 00000000 00000000 00000000 00000000 00000000 ................................ 000040
00000000 00000000 00000000 00000000 00000000 00000000 00000000 00000000 ................................ 000060
00000000 00000000 00000000 00000000 00000000 00000000 00000000 00000000 ................................ 000080
00000000 00000008 00000000 00000000 00000000 00000000 00000000 00000000 ........................Á....... 0000A0
00000000 00000000 00000000 00000000 00000000 00000000 00000000 00000000 ................................ 0000C0
00000000 00000000 00000000 00000000 00000000 00000000 00000000 00000000 ................................ 0000E0
00000000 00000000 00000000 00000000 00000000 00000000 00000000 00000000 ................................ 000100
00000000 00000000 00000000 00000000 00000000 00000000 00000000 00000000 ................................ 000120
00000000 00000000 00000000 00000000 00000000 00000000 00000000 00000000 ................................ 000140
00000000 00060000 00000000 00000000 00000000 00000000 00000000 00000007 ................................ 000160
00000000 00000000 00080000 00000000 00000000 00000000 00000000 00070000 ................................ 000180
00000000 00000000 00000000 00000000 00000000 00000000 00000000 00000006 ................................ 0001A0
00000000 00000000 00060000 00000000 00000006 00000000 00000000 00000000 ................................ 0001C0
00000000 00000000 00080000 00000000 00000000 00060000 00000000 00000000 ................................ 0001E0

Dump of file SATURN:[PCCOMMON.DUMP.DLL]PDLSYN.TMP;1 on 18-APR-1990 10:48:45.27
File ID (771,27,0)   End of file block 276 / Allocated 276

Virtual block number 155 (0000009B), 512 (0200) bytes

00000000 00000000 00000000 00000000 00000000 00000006 00000000 00000000 ................................ 000000
00000000 00000000 00000000 00000000 00000000 00000006 00000000 00000000 ................................ 000020
00000000 00000006 00080006 00000000 00090000 00000000 00000000 00000000 ................................ 000040
00000000 00000000 00000000 00000000 00000000 00060006 00060000 00090000 ................................ 000060
00000000 00000000 00000000 00000000 00080000 00000000 00000000 00000000 ................................ 000080
00000000 00000000 00000000 00000000 00000000 00000000 00000000 00000000 ................................ 0000A0
00000000 00000000 00000000 00000000 00000000 00000000 00000000 00000000 ................................ 0000C0
00000000 00000000 00000000 00000000 00000000 00000000 00000000 00000000 ................................ 0000E0
00000000 00000000 00000000 00000000 00000000 00000000 00000000 00000000 ................................ 000100
00000000 00000000 00000000 00000000 00000000 00000000 00000000 00000000 ................................ 000120
00000000 00000000 00000000 00000000 00000000 00000000 00000000 00000000 ................................ 000140
00000000 00000000 00000000 00000000 00000000 00000000 00000000 00000000 ................................ 000160
00000000 00000000 00000000 00000000 00000000 00000000 00000000 00000000 ................................ 000180
00000000 00000000 00000000 00000000 00000000 00000000 00760000 00000000 ......v......................... 0001A0
00000000 00000000 00000000 00000000 00000000 00000000 00000000 00000000 ................................ 0001C0
00000000 00000000 00000000 00000000 00000000 00000000 00000000 00000000 .............................  ... 0001E0

Dump of file SATURN:[PCCOMMON.DUMP.DLL]PDLSYN.TMP;1 on 18-APR-1990 10:48:45.27
File ID (771,27,0)   End of file block 276 / Allocated 276

Virtual block number 156 (0000009C), 512 (0200) bytes

00000000 00000000 00000000 00000000 00000000 00000000 00000000 00000000 ................................ 000000
00000000 00000000 00000000 00000000 00000000 00000000 00000000 00000000 ................................ 000020
00000000 00000000 00000000 00000000 00000000 00000000 00000000 00000000 ................................ 000040
00000000 00000000 00000000 00000000 00000000 00000000 00000000 00000000 ................................ 000060
00000000 00000000 00000000 00000000 00000000 00000000 00000000 00000000 ................................ 000080
00000000 00000000 00000000 00000000 00000000 00000000 00000000 00000000 ................................ 0000A0
00000000 00000000 00000000 00000000 00000000 00000000 00000000 00000000 ................................ 0000C0
00000000 00000000 00000000 00000000 00000000 00000000 00000000 00000000 ................................ 0000E0
00000000 00000113 00000000 00000000 00000000 00000000 00000000 00000000 ................................ 000100
00000000 00000000 00000000 00000000 00000000 00000000 00000000 00000000 ................................ 000120
00000000 00000000 00000000 00000000 00000000 00000000 00000000 00000000 ................................ 000140
00000000 00000000 00000000 00000000 00000000 00000000 00000000 00000000 ................................ 000160
00000000 00000000 00000000 00000000 00000000 00000000 00000000 00000000 ................................ 000180
00000000 00000000 00000000 00000000 00000000 00000000 00000000 00000000 ................................ 0001A0
00000000 00000000 00000000 00000000 00000000 00000000 00000000 00000000 ................................ 0001C0
00000000 00000000 00000000 00000000 00000000 00000000 00000000 00000000 ................................ 0001E0

Dump of file SATURN:[PCCOMMON.DUMP.DLL]PDLSYN.TMP;1 on 18-APR-1990 10:48:45.27
File ID (771,27,0)   End of file block 276 / Allocated 276
```

Virtual block number 157 (0000009D), 512 (0200) bytes

```
00000000 00000000 00000000 00000000 00000000 00000000 00000000 00000000 ................................ 000000
00000000 00000000 00000000 00000000 00000000 00000000 00000000 00000000 ................................ 000020
00000000 00000000 00000000 00000000 00000000 00000000 00000000 00000000 ................................ 000040
00000000 00000000 00000000 00000000 00000000 00000000 00000000 00000000 ................................ 000060
00000000 00000000 00000000 00000000 00000000 00000046 00000000 00000000 ........F....................... 000080
00000000 00000000 00000000 00000000 00000000 00000000 00000000 00000000 ................................ 0000A0
00000000 00000000 00000000 00000000 00000000 00000000 00000000 00000000 ................................ 0000C0
00000000 00000000 00000000 00000000 00000000 00000000 00000000 00000000 ................................ 0000E0
00000000 00000000 00000000 00000000 00000000 00000000 00000000 00000000 ................................ 000100
00EC0000 00000000 000000EC 00EC0000 00000000 00EC00EC 00000000 00EC0000 ..ì.....ì.ì.......ì.ì.........ì. 000120
00000000 00000000 000000EC 00EC00EC 00EC0000 00000000 000000EC 00000000 ....ì.........ì.ì.ì............. 000140
00000000 00000000 00000000 00000000 00000000 00000000 00000000 00000000 ................................ 000160
000000EC 00000000 00000000 000000EC 00EC0000 00000000 000000EC 000000EC ì...ì.........ì.ì...........ì... 000180
00000000 00000000 00000000 00000000 00000000 00000000 00EC0000 00000000 ......ì......................... 0001A0
000000EC 00000000 000000EC 000000EC 00EC00EC 00000000 00EC0000 00EC0000 ..ì...ì.....ì.ì.ì...ì.......ì... 0001C0
00000000 00000000 00000000 00000000 000000EC 00000000 00EC0000 00EC00EC ì.ì...ì.....ì................... 0001E0
```

Dump of file SATURN:[PCCOMMON.DUMP.DLL]PDLSYN.TMP;1 on 18-APR-1990 10:48:45.27
File ID (771,27,0)   End of file block 276 / Allocated 276

Virtual block number 158 (0000009E), 512 (0200) bytes

```
00EC00EC 00000000 00000000 00EC0000 00000000 00000000 00000000 000000EC ì.................ì.........ì.ì. 000000
000000EC 00EC00EC 00EC00EC 00EC00EC 00EC00EC 00000000 00000000 000000EC ì...........ì.ì.ì.ì.ì.ì.ì.ì.ì... 000020
00000000 00EC00EC 000000EC 000000EC 00000000 00000000 00000000 00000000 ................ì...ì...ì.ì..... 000040
00000000 00000000 00000000 00000000 00000000 00000000 00EC0000 00000000 ......ì......................... 000060
00000000 00F600F6 00000000 00F60000 00000000 00000000 00000000 00000000 ..................-.....-.-..... 000080
00F60000 00000000 000000F6 00000000 00F60000 00000000 000000F6 00F60000 ..-.-.........-.....-.........-. 0000A0
00000000 00000000 00000000 00000000 00000000 00000000 000000F6 00F600F6 -.-.-........................... 0000C0
00F60000 00000000 000000F6 000000F6 00000000 00000000 00000000 00000000 ................-...-.........-. 0000E0
00000000 00000000 00F60000 00000000 000000F6 00000000 00000000 000000F6 -...........-.........-......... 000100
00F600F6 00000000 00F60000 00F60000 00000000 00000000 00000000 00000000 ..................-...-.....-.-. 000120
000000F6 00000000 00F60000 00F600F6 000000F6 00000000 000000F6 000000F6 -...-.......-...-.-...-.....-... 000140
00000000 00000000 00000000 000000F6 00000000 00000000 00000000 00000000 ................-............... 000160
00F600F6 00000000 00000000 000000F6 00F600F6 00000000 00000000 00F60000 ..-.........-.-.-...........-.-. 000180
00000000 00000000 00000000 00000000 000000F6 00F600F6 00F600F6 00F600F6 -.-.-.-.-.-.-................... 0001A0
00000000 00000000 00F60000 00000000 00000000 00F600F6 000000F6 000000F6 -...-...-.-...........-......... 0001C0
00000000 00000000 00000000 00000000 00000000 00000000 00000000 00000000 ................................ 0001E0
```

Dump of file SATURN:[PCCOMMON.DUMP.DLL]PDLSYN.TMP;1 on 18-APR-1990 10:48:45.27
File ID (771,27,0)   End of file block 276 / Allocated 276

Virtual block number 159 (0000009F), 512 (0200) bytes

```
01210000 00000000 00000000 00000000 00000000 012A0000 00000000 01300000 ..0.......*...................!. 000000
00000000 00000000 00000138 0139013A 01350000 00000000 0000011E 00000000 ..............5.:.9.8........... 000020
00000000 00000000 00000000 00000000 00000000 00000000 00000000 00000000 ................................ 000040
00000000 00000000 00000000 00000122 01230000 00000000 00000000 00000140 @.............#."............... 000060
00000000 00000000 00000000 00000000 00000000 00000000 013B0000 00000000 ......;......................... 000080
00000134 00000000 0000013C 00000128 01290126 00000000 011F0000 00000000 ............&.).(...<.......4... 0000A0
00000000 00000000 00000000 00000000 00000000 00000000 013F0000 012F0000 ../...?......................... 0000C0
0130012E 00000000 00000000 01200000 00000000 00000000 00000000 0000011C .................. ...........0. 0000E0
00000124 0128011D 01250000 012C0132 01310127 00000000 00000000 0000013E >...........'.1.2.,...%...+.$... 000100
00000000 01360137 0000012D 00000000 00000000 00000000 00000000 00000000 ....................-...7.6..... 000120
00000000 00000000 00000000 00000000 00000000 00000000 01330000 00000000 ......3......................... 000140
00000000 00000000 00000000 00000000 00000000 00000000 00000000 00000000 ................................ 000160
00000000 00000000 00000000 00000000 00000000 00000000 00000000 00000000 ................................ 000180
00000000 00000000 00000000 00000000 00000000 00000000 00000000 00000000 ................................ 0001A0
00000000 00000000 00000025 00000000 00000000 00000000 00000000 00000000 ....................%........... 0001C0
00000000 00000000 00000000 00000000 00000000 00000000 00000000 00000000 ................................ 0001E0
```

Dump of file SATURN:[PCCOMMON.DUMP.DLL]PDLSYN.TMP;1 on 18-APR-1990 10:48:45.27
File ID (771,27,0)   End of file block 276 / Allocated 276

```
Virtual block number 160 (000000A0), 512 (0200) bytes

00000000 00000000 00000000 00000000 00000000 00000000 00000000 00000000 ................................ 000000
00000000 00000000 00000000 00000000 00000000 00000000 00000000 00000000 ................................ 000020
00000000 00000000 00000000 00000000 00000000 00000000 00000000 00000000 ................................ 000040
00000000 00000000 00000000 00000000 00000000 00000000 00000000 00000000 ................................ 000060
00000000 00000000 00000000 00000000 00000000 00000000 00000000 00000000 ................................ 000080
00000000 00000000 00000000 00000000 00000000 00000000 00000000 00000000 ................................ 0000A0
00000025 00000000 00000000 00000000 00000000 00000000 00000000 00000000 ............................%... 0000C0
00000000 00000000 00000000 00000000 00000000 00000000 00000000 00000000 ................................ 0000E0
00000000 00000000 00000000 00000000 00000000 00000000 00000000 00000000 ................................ 000100
00000000 00000000 00000000 00000000 00000000 00000000 00000000 00000022 "............................... 000120
00000000 00000000 00000000 00000000 00000000 00000000 00000000 00000000 ................................ 000140
00000000 00000000 00000000 00000000 00000000 00000000 00000000 00000000 ................................ 000160
00000000 00000000 00000000 00000000 00000000 00000000 00000000 00000000 ................................ 000180
00000000 00000000 00000000 00000000 00000000 00000000 00000000 00000000 ................................ 0001A0
00000000 00000000 00000000 00000000 00000000 00000000 00000000 00000000 ................................ 0001C0
00000000 00000000 00000000 00000000 00000000 00000000 00000000 00000000 ................................ 0001E0

Dump of file SATURN:[PCCOMMON.DUMP.DLL]PDLSYN.TMP;1 on 18-APR-1990 10:48:45.27
File ID (771,27,0)   End of file block 276 / Allocated 276

Virtual block number 161 (000000A1), 512 (0200) bytes

00000000 00000000 00000000 00000000 00000000 00000000 00000000 00000000 ................................ 000000
00000000 00000000 00000000 00000000 00000000 00000000 00000000 00000000 ................................ 000020
00000000 00000000 00000000 00000000 00000000 00000000 00000000 00000000 ................................ 000040
00000000 00000000 00000000 00000000 00000000 00000000 00000000 00000000 ................................ 000060
00000000 00000000 00000000 00000000 00000000 00000000 00000000 00000000 ................................ 000080
00000000 00000000 00000000 00000000 00000000 00000000 00000000 00000000 ................................ 0000A0
00000000 00000000 00000000 00000000 00000000 00000000 00000000 00000000 ................................ 0000C0
00000000 00000000 00000000 00000000 00000000 00000000 00000000 00000000 ................................ 0000E0
00000000 00000000 00000000 00000000 00000000 00000000 00000000 00000000 ................................ 000100
00000000 00370000 00000000 00000000 00000000 00000000 00000000 00000000 ..........................7..... 000120
00000000 00000000 00000000 00000000 00000000 00000000 00000000 00000000 ................................ 000140
00000000 00000000 00000000 00000000 00000000 00000000 00000000 00000000 ................................ 000160
00000000 00000000 00000000 00000000 00000000 00000000 00000000 00000000 ................................ 000180
00000000 00000000 00000000 00000000 00000000 00000000 00000000 00000000 ................................ 0001A0
00000000 00000000 00000000 00000000 00000000 00000000 00000000 00000000 ................................ 0001C0
00000000 00000000 00000000 00000000 00000000 00000000 00000000 00000000 ................................ 0001E0

Dump of file SATURN:[PCCOMMON.DUMP.DLL]PDLSYN.TMP;1 on 18-APR-1990 10:48:45.27
File ID (771,27,0)   End of file block 276 / Allocated 276

Virtual block number 162 (000000A2), 512 (0200) bytes

00000000 00000000 00000000 00000000 00000000 00000000 00000000 00000000 ................................ 000000
00000000 00000000 00000000 00000000 00000000 00000000 00000000 00000000 ................................ 000020
00000000 00000000 00000000 00000000 00000000 00000000 00000000 00000000 ................................ 000040
00000000 00000000 00000000 00000000 00000000 00000000 00000000 00000000 ................................ 000060
00000000 00000000 00000000 00000000 00000000 00000000 00000000 00000000 ................................ 000080
00000000 00000000 00000000 00000000 004B0000 00000000 00000000 00000000 ..............K................. 0000A0
00000000 00000000 00000000 00000000 00000000 00000000 00000000 00000000 ................................ 0000C0
00000000 00000000 00000000 00000000 00000000 00000000 00000000 00000000 ................................ 0000E0
00000000 00000000 00000000 00000000 00000000 00000000 00000000 00000000 ................................ 000100
00000000 00E600E6 00000000 00E60000 00000000 00000000 00000000 00000000 ..................l.....l.l..... 000120
00E60000 00000000 000000E6 00000000 00E60000 00000000 000000E6 00E60000 ..l.l.........l.....l.........l. 000140
00000000 00000000 00000000 00000000 00000000 00000000 000000E6 00E600E6 l.l.l........................... 000160
00E60000 00000000 000000E6 000000E6 00000000 00000000 00000000 00000000 ................l...l.........l. 000180
00000000 00000000 00E60000 00000000 000000E6 00000000 00000000 000000E6 l...........l.........l......... 0001A0
00E600E6 00000000 00E60000 00E60000 00000000 00000000 00000000 00000000 ..................l...l.....l.l. 0001C0
000000E6 00000000 00E60000 00E600E6 000000E6 00000000 000000E6 000000E6 l...l.......l...l.l...l.....l... 0001E0

Dump of file SATURN:[PCCOMMON.DUMP.DLL]PDLSYN.TMP;1 on 18-APR-1990 10:48:45.27
File ID (771,27,0)   End of file block 276 / Allocated 276
```

```
Virtual block number 163 (000000A3), 512 (0200) bytes

00000000 00000000 00000000 000000E6 00000000 00000000 00000000 00000000 ................|............... 000000
00E600E6 00000000 00000000 000000E6 00E600E6 00000000 00000000 00E60000 ..|.........|.|.|...........|.|. 000020
00000000 00000000 00000000 00000000 000000E6 00E600E6 00E600E6 00E600E6 |.|.|.|.|.|.|................... 000040
00000000 00000000 00E60000 00000000 00000000 00E600E6 000000E6 000000E6 |...|...|.|...........|......... 000060
00000000 00000000 00000000 00000000 00000000 00000000 00000000 00000000 ................................ 000080
00000000 00000000 00000000 00000000 00000000 00000000 00000000 00000000 ................................ 0000A0
00000000 00000000 00000000 00000000 00000000 00000000 00000000 00000000 ................................ 0000C0
00000000 00000000 00000000 00000000 00000000 00000000 00000000 00000000 ................................ 0000E0
00000000 00000000 00000000 00000000 00000000 00000000 00000000 00000000 ................................ 000100
00000000 00000000 00000000 00000000 00000000 00000000 00000000 00000000 ................................ 000120
00000000 00000000 00000000 00000000 00000000 00000000 00000000 00000000 ................................ 000140
00000000 00000000 00000000 00000000 00000000 00000000 00000000 00000000 ................................ 000160
00000000 00000000 00000032 00000000 00000000 00000000 00000000 00000000 ....................2........... 000180
00000000 00000000 00000000 00000000 00000000 00000000 00000000 00000000 ................................ 0001A0
00000000 00000000 00000000 00000000 00000000 00000000 00000000 00000000 ................................ 0001C0
00000000 00000000 00000000 00000000 00000000 00000000 00000000 00000000 ................................ 0001E0

Dump of file SATURN:[PCCOMMON.DUMP.DLL]PDLSYN.TMP;1 on 18-APR-1990 10:48:45.27
File ID (771,27,0)   End of file block 276 / Allocated 276

Virtual block number 164 (000000A4), 512 (0200) bytes

00000000 00000000 00000000 00000000 00000000 00000000 00000000 00000000 ................................ 000000
00000000 00000000 00000000 00000000 00000000 00000000 00000000 00000000 ................................ 000020
00000000 00000000 00000000 00000000 00000000 00000000 00000000 00000000 ................................ 000040
00000000 00000000 00000000 00000000 00000000 00000000 00000000 00000000 ................................ 000060
00000000 00000000 00000000 00000000 00000000 00000000 00000000 00000000 ................................ 000080
00000000 00000000 00000000 00000000 00000000 00000000 00000000 00000000 ................................ 0000A0
00000000 00000000 00000000 00000000 00000000 00000000 00000000 00000000 ................................ 0000C0
00000000 00000000 00000000 00000000 00000000 00000000 00000000 00000000 ................................ 0000E0
00000000 00000000 00000000 00000000 00000000 00000000 006C0000 00000000 ......l......................... 000100
00000000 00000000 00000000 00000000 00000000 00000000 00000000 00000000 ................................ 000120
00000000 00000000 00000000 00000000 00000000 00000000 00000000 00000000 ................................ 000140
00000000 00000000 00000000 00000000 00000000 00000000 00000000 00000000 ................................ 000160
00000000 00000000 00000000 00000000 00000000 00000000 00000000 00000000 ................................ 000180
00000000 00000000 00000000 00000000 00000000 00000000 00000000 00000000 ................................ 0001A0
00000000 00000000 00000000 00000000 00000000 00000000 00000000 00000000 ................................ 0001C0
00000000 00000000 00000000 00000000 00000000 00000000 00000000 00000000 ................................ 0001E0

Dump of file SATURN:[PCCOMMON.DUMP.DLL]PDLSYN.TMP;1 on 18-APR-1990 10:48:45.27
File ID (771,27,0)   End of file block 276 / Allocated 276

Virtual block number 165 (000000A5), 512 (0200) bytes

00000000 00000000 00000000 00000000 00000000 00000000 00000000 00000000 ................................ 000000
00000000 00000000 00000000 00000000 00000000 00000000 00000000 00000000 ................................ 000020
00000000 00000000 00000000 00000000 00000000 00000000 00000000 00000000 ................................ 000040
00000000 0000002F 00000000 00000000 00000000 00000000 00000000 00000000 ......................../....... 000060
00000000 00000000 00000000 00000000 00000000 00000000 00000000 00000000 ................................ 000080
00000000 00000000 00000000 00000000 00000000 00000000 00000000 00000000 ................................ 0000A0
00000000 00000000 00000000 00000000 00000000 00000000 00000000 00000000 ................................ 0000C0
00000000 00000000 00000000 00000000 00000000 00000000 00000000 00000000 ................................ 0000E0
00000000 00000000 00000000 00000000 00000000 00000000 00000000 00000000 ................................ 000100
00000000 00000000 00000000 00000000 00000000 00000000 00000000 00000000 ................................ 000120
00000000 00000000 00000000 00000000 00000000 00000000 00000000 00000000 ................................ 000140
00000000 00000000 00000000 00000000 00000000 00000000 00000000 00000000 ................................ 000160
00000000 00000000 00000000 00000000 00000000 00000000 00000000 00000000 ................................ 000180
00000000 00000000 00000000 00000000 00000000 00000000 00000000 00000000 ................................ 0001A0
00000000 00000000 00000000 00000000 00000000 00000000 00000000 00000000 ................................ 0001C0
00000000 00000000 00000000 004A0000 00000000 00000000 00000000 00000000 ..................J............. 0001E0

Dump of file SATURN:[PCCOMMON.DUMP.DLL]PDLSYN.TMP;1 on 18-APR-1990 10:48:45.27
File ID (771,27,0)   End of file block 276 / Allocated 276
```

```
Virtual block number 166 (000000A6), 512 (0200) bytes

00000000 00000000 00000000 00000000 00000000 00000000 00000000 00000000 ................................ 000000
00000000 00000000 00000000 00000000 00000000 00000000 00000000 00000000 ................................ 000020
00000000 00000000 00000000 00000000 00000000 00000000 00000000 00000000 ................................ 000040
00000000 00000000 00000000 00000000 00000000 00000000 00000000 00000000 ................................ 000060
00000000 00000000 00000000 00000000 00000000 00000000 00000000 00000000 ................................ 000080
00000000 00000000 00000000 00000000 00000000 00000000 00000000 00000000 ................................ 0000A0
00000000 00000000 00000000 00000000 00000000 00000000 00000000 00000000 ................................ 0000C0
00000000 00000000 00000000 00000000 00000000 00000000 00000000 00000000 ................................ 0000E0
00000000 00000000 00000000 00000000 00000000 00000000 00000000 00000000 ................................ 000100
00000000 00000000 00000000 00000000 00000000 00000000 00000000 00000000 ................................ 000120
00000000 00000000 00000000 00000000 00000000 00000000 00000000 00000000 ................................ 000140
00000000 00000000 00000000 00000000 00000000 00000000 00970000 00000000 ................................ 000160
00000000 00000000 00000000 00000000 00000000 00000000 00000000 00000000 ................................ 000180
00000000 00000000 00000000 00000000 00000000 00000000 00000000 00000000 ................................ 0001A0
00000000 00000000 00000000 00000000 00000000 00000000 00000000 00000000 ................................ 0001C0
00000000 00000000 00000000 00000000 00000000 00000000 00000000 00000000 ................................ 0001E0

Dump of file SATURN:[PCCOMMON.DUMP.DLL]PDLSYN.TMP;1 on 18-APR-1990 10:48:45.27
File ID (771,27,0)   End of file block 276 / Allocated 276

Virtual block number 167 (000000A7), 512 (0200) bytes

00000000 00000000 00000000 00000000 00000000 00000000 00000000 00000000 ................................ 000000
00000000 00000000 00000000 00000000 00000000 00000000 00000000 00000000 ................................ 000020
00000000 00000000 00000000 00000000 00000000 00000000 00000000 00000000 ................................ 000040
00000000 00000000 00000000 00000000 00000000 00000000 00000000 00000000 ................................ 000060
00000000 00000000 00000000 00000000 00000000 00000000 00000000 00000000 ................................ 000080
00000000 00000000 00000000 00000000 00000000 00000000 00000000 00000000 ................................ 0000A0
00000000 00000035 00000000 00000000 00000000 00000000 00000000 00000000 ........................5....... 0000C0
00000000 00000000 00000000 00000000 00000000 00000000 00000000 00000000 ................................ 0000E0
00000000 00000000 00000000 00000000 00000000 00000000 00000000 00000000 ................................ 000100
00000000 00000000 00000000 00000000 00000000 00000000 00000000 00000000 ................................ 000120
00000000 00000000 00000000 00000000 00000000 00000000 00000000 00000000 ................................ 000140
00000000 00000000 00000000 00000000 00000000 00000000 00000000 00000000 ................................ 000160
00000000 00000000 00000000 00000000 00000000 00000000 00000000 00000000 ................................ 000180
00000000 00000000 00000000 00000000 00000000 00000000 00000000 00000000 ................................ 0001A0
00000000 00000000 00000000 00000000 00000000 00000000 00000000 00000000 ................................ 0001C0
00000000 00000000 00000000 00000000 00000000 00000000 00000000 00000000 ................................ 0001E0

Dump of file SATURN:[PCCOMMON.DUMP.DLL]PDLSYN.TMP;1 on 18-APR-1990 10:48:45.27
File ID (771,27,0)   End of file block 276 / Allocated 276

Virtual block number 168 (000000A8), 512 (0200) bytes

00000000 00000000 00000000 00000000 00000000 00000000 00000000 00000000 ................................ 000000
00000000 00000000 00000000 00000000 00000000 00000000 00000000 00000000 ................................ 000020
00000000 00000000 00000000 00000000 00000000 00340000 00000000 00000000 ..........4..................... 000040
00000000 00000000 00000000 00000000 00000000 00000000 00000000 00000000 ................................ 000060
00000000 00000000 00000000 00000000 00000000 00000000 00000000 00000000 ................................ 000080
00000000 00000000 00000000 00000000 00000000 00000000 00000000 00000000 ................................ 0000A0
00000000 00000000 00000000 00000000 00000000 000E0000 00000000 00000000 ................................ 0000C0
00000000 00000000 00000000 0000000A 00000000 00000000 00000000 00000000 ................................ 0000E0
0000000C 00000000 00000000 00000000 00000000 00000000 00000000 00000000 ................................ 000100
00000000 000E0000 00000000 00000000 00000000 00000000 000B0000 00000000 ................................ 000120
00000000 00000008 00000000 00000000 00000000 00000000 00000000 00000000 ................................ 000140
00000000 0000000F 00000000 00000000 00000000 00000000 00000000 00000000 ................................ 000160
00000000 00000000 00000000 00000000 00000000 00000000 00000000 00000000 ................................ 000180
00000000 000C000C 00000000 00000000 00000000 0000000C 0000000C 00000000 ................................ 0001A0
00000000 00000000 00000000 00000000 00000000 00000000 00000000 00000000 ................................ 0001C0
00000000 00000000 00000000 00000000 00000000 00000000 00000000 00000000 ................................ 0001E0

Dump of file SATURN:[PCCOMMON.DUMP.DLL]PDLSYN.TMP;1 on 18-APR-1990 10:48:45.27
File ID (771,27,0)   End of file block 276 / Allocated 276
```

Virtual block number 169 (000000A9), 512 (0200) bytes

```
00000000 00000000 00000000 00000000 00000000 00000000 00000000 00000000 ................................ 000000
00000000 00000000 00000000 00000000 00000000 00000000 00000000 00000000 ................................ 000020
00000000 00000000 00000000 00000000 00000000 00000000 00000000 00000000 ................................ 000040
00000000 00000000 00000000 00000000 00000000 00000000 00000000 00000000 ................................ 000060
00000000 00000000 00000000 00000000 00000000 00000000 00000000 00000000 ................................ 000080
00000000 00000000 00000000 00000000 00000000 00000000 00000000 00000000 ................................ 0000A0
00000000 00000000 00000000 00000000 00000000 00000000 00000000 00000000 ................................ 0000C0
00000000 00000000 00000000 00000000 00000000 00000000 00000000 00000000 ................................ 0000E0
00000000 00000000 00000000 00000000 00000000 00000000 00000000 00000000 ................................ 000100
00000000 00000000 00000000 00000000 00000000 00000000 00000000 00000000 ................................ 000120
00000000 00000000 00000000 00000000 00000000 00000000 00000000 00000052 R............................... 000140
00000000 00000000 00000000 00000000 00000000 00000000 00000000 00000000 ................................ 000160
00000000 00000000 00000000 00000000 00000000 00000000 00000000 00000000 ................................ 000180
00000000 00000000 00000000 00000000 00000000 00000000 00000000 00000000 ................................ 0001A0
00000000 00000000 00000000 00000000 00000000 00000000 00000000 00000000 ................................ 0001C0
00000000 00000000 00000000 00000000 00000000 00000000 00000000 00000000 ................................ 0001E0
```

Dump of file SATURN:[PCCOMMON.DUMP.DLL]PDLSYN.TMP;1 on 18-APR-1990 10:48:45.27
File ID (771,27,0) End of file block 276 / Allocated 276

Virtual block number 170 (000000AA), 512 (0200) bytes

```
00000000 00000000 00000000 00000000 00000000 00000000 00000000 00000000 ................................ 000000
00000000 00000000 00000000 00000000 00000000 00000000 00000000 00000000 ................................ 000020
00000000 00000000 00000000 00000000 00000000 00000000 00000000 00000000 ................................ 000040
00000000 00000000 00000000 00000000 00000000 00000000 00000000 00000000 ................................ 000060
00000000 00000000 00000000 00000000 00000000 00000000 00000000 00000000 ................................ 000080
00000000 00000000 003B0000 00000000 00000000 00000000 00000000 00000000 ......................;......... 0000A0
00000000 00000000 00000000 00000000 00000000 00000000 00000000 00000000 ................................ 0000C0
00000000 00000000 00000000 00000000 00000000 00000000 00000000 00000000 ................................ 0000E0
00000000 00000000 00000000 00000000 00000000 00000000 00000000 00000000 ................................ 000100
00000000 00000000 00000000 00000000 00000000 00000000 00000000 00000000 ................................ 000120
00000000 00000000 00000000 00000000 00000000 00000000 00000000 00000000 ................................ 000140
00000000 00000000 00000000 00000000 00000000 00000000 00000000 00000000 ................................ 000160
00000000 00000000 00000000 00000000 00000000 00000000 00000000 00000000 ................................ 000180
00000000 00000000 00000000 00000000 00000000 00000000 00000000 00000000 ................................ 0001A0
00000000 00000000 00000000 00000000 00000000 00000000 00000000 00000000 ................................ 0001C0
00000000 00000000 00000000 00000000 00000000 00000000 00000000 00000000 ................................ 0001E0
```

Dump of file SATURN:[PCCOMMON.DUMP.DLL]PDLSYN.TMP;1 on 18-APR-1990 10:48:45.27
File ID (771,27,0) End of file block 276 / Allocated 276

Virtual block number 171 (000000AB), 512 (0200) bytes

```
00000000 00000000 00000000 00000000 00000000 00000000 00000000 00000000 ................................ 000000
00000000 00000000 00000000 00000000 00000000 00000000 00000058 00000000 ....X........................... 000020
00000000 00000000 00000000 00000000 00000000 00000000 00000000 00000000 ................................ 000040
00000000 00000000 00000000 00000000 00000000 00000000 00000000 00000000 ................................ 000060
00000000 00000000 00000000 00000000 00000000 00000000 00000000 00000000 ................................ 000080
00000000 00000000 00000000 00000000 00000000 00000000 00000000 00000000 ................................ 0000A0
00000000 00000000 00000000 00000000 00000000 00000000 00000000 00000000 ................................ 0000C0
00000000 00000000 00000000 00000000 00000000 00000000 00000000 00000000 ................................ 0000E0
00000000 00000000 00000000 00000000 00000000 00000000 00000000 00000000 ................................ 000100
00000000 00000000 00000000 00000000 00000000 00000000 00000000 00000000 ................................ 000120
00000000 00000000 00000000 00000000 00000000 00000000 00000000 00000000 ................................ 000140
00000000 00000000 00000000 00000000 00000000 00000000 00000000 00000000 ................................ 000160
00000000 00000083 00000000 00000000 00000000 00000000 00000000 00000000 ................................ 000180
00000000 00000000 00000000 00000000 00000000 00000000 00000000 00000000 ................................ 0001A0
00000000 00000000 00000000 00000000 00000000 00000000 00000000 00000000 ................................ 0001C0
00000000 00000000 00000000 00000000 00000000 00000000 00000000 00000000 ................................ 0001E0
```

Dump of file SATURN:[PCCOMMON.DUMP.DLL]PDLSYN.TMP;1 on 18-APR-1990 10:48:45.27
File ID (771,27,0) End of file block 276 / Allocated 276

```
Virtual block number 172 (000000AC), 512 (0200) bytes

00000000 00000000 00000000 00000000 00000000 00000000 00000000 00000000 ................................ 000000
00000000 00000000 00000000 00000000 00000000 00000000 00000000 00000000 ................................ 000020
00000000 00000000 00000000 00000000 00000000 00000000 00000000 00000000 ................................ 000040
00000000 00000000 00000000 00000000 00000000 00000000 00000000 00000000 ................................ 000060
00000000 00000000 00000000 00000000 00000000 00000000 00000000 00000000 ................................ 000080
00000000 00000000 00000000 00000000 00000000 00000000 00000000 00000000 ................................ 0000A0
00000000 00000000 00000000 00000000 00000000 00000000 00000000 00000000 ................................ 0000C0
00000000 00000000 00000000 00000000 00000000 00000000 00000000 00000000 ................................ 0000E0
00000000 00000000 00000000 00000000 00930000 00000000 00000000 00000000 ................................ 000100
00000000 00000000 00000000 00000000 00000000 00000000 00000000 00000000 ................................ 000120
00000000 000000FE 00000000 00000000 00000000 00000000 00000000 00000000 ................................ 000140
00000000 00000000 00000000 00000000 00000000 00000000 00000000 00000000 ................................ 000160
00000000 00000000 00000000 00000000 00000000 00000000 00000000 00000000 ................................ 000180
00000000 00000000 000000FD 00000000 00000000 00000000 00000000 00000000 .......................*........ 0001A0
00000000 00000000 00000000 00000000 000000FD 00000000 00000000 00000000 ...........*.................... 0001C0
00000000 00000000 00000000 00000000 00000000 00000000 00000000 00000000 ................................ 0001E0

Dump of file SATURN:[PCCOMMON.DUMP.DLL]PDLSYN.TMP;1 on 18-APR-1990 10:48:45.27
File ID (771,27,0)   End of file block 276 / Allocated 276

Virtual block number 173 (000000AD), 512 (0200) bytes

00000000 00000000 00000000 000000FF 00000000 00000000 00000000 00000000 ................................ 000000
00000000 00000000 00000000 00000000 00000000 00000000 00000000 00000000 ................................ 000020
00000000 00000000 00000000 00000000 00000000 00000000 00000000 00000000 ................................ 000040
00000000 00000000 00000000 00000000 00000000 00000000 00000000 00000000 ................................ 000060
00000000 00000000 00000000 00000000 00000000 00000000 00000000 00000000 ................................ 000080
00000000 00000000 00000000 00000000 00000000 00000000 00000000 00000000 ................................ 0000A0
00000000 00000000 00000000 00000000 00000000 00000000 00000000 00000000 ................................ 0000C0
00000000 00000000 00000000 00000000 00000000 00000000 00000000 00000000 ................................ 0000E0
00000000 00000000 00000000 00000000 00000000 00000000 00000000 00000000 ................................ 000100
00000000 00000000 00000000 00000000 00000000 00000000 00000000 00000000 ................................ 000120
00000000 00000000 00000000 00000000 00000000 00000000 00000000 00000000 ................................ 000140
00000000 00000000 00000000 00000000 00000000 00000000 00000000 00000000 ................................ 000160
00000000 00000000 00000000 00000000 00000000 00000000 00000000 00000000 ................................ 000180
00000000 00000000 00000000 00000000 00000000 00000000 00000000 00000000 ................................ 0001A0
00000000 00000000 00000000 00000000 00000000 00000000 00000000 00000000 ................................ 0001C0
00000000 00000000 00000000 00000000 00000000 00000000 00000000 00000000 ................................ 0001E0

Dump of file SATURN:[PCCOMMON.DUMP.DLL]PDLSYN.TMP;1 on 18-APR-1990 10:48:45.27
File ID (771,27,0)   End of file block 276 / Allocated 276

Virtual block number 174 (000000AE), 512 (0200) bytes

00000000 00000000 00000000 00000000 00000000 00000000 00000000 00000000 ................................ 000000
00000000 00000000 00000000 00000000 00000000 00000000 00000000 00000000 ................................ 000020
00000000 00000000 00000000 00000000 00000000 00000000 00000000 00000000 ................................ 000040
00000000 00000000 00000000 00000000 00000000 00000000 00000000 00000000 ................................ 000060
00000000 00000000 00000000 00000000 00000000 00000000 00000000 00000000 ................................ 000080
00000000 00000000 00000000 00000000 00000000 00000000 00000000 00000000 ................................ 0000A0
00000000 00000000 00000000 00000000 00000000 00000000 00000000 00000000 ................................ 0000C0
00000000 00000000 00000000 00000000 00000000 00000000 00000000 00000000 ................................ 0000E0
00000000 00000000 00000000 00000000 00000000 00000000 00000000 00000000 ................................ 000100
00000000 00000000 00000000 00000000 00000000 00000000 00000000 00000000 ................................ 000120
00000000 00000000 00000000 00000000 00000000 00000000 00000000 00000000 ................................ 000140
00000000 00000000 00000000 0000005F 00000000 00000000 00000000 00000000 ..............._................ 000160
00000000 00000000 00000000 00000000 00000000 00000000 00000000 00000000 ................................ 000180
0000000E 00000000 00000000 00000000 00000000 00000000 00000000 00000000 ....T.......................B... 0001A0
00000000 00000000 00000000 00000000 00000000 00000000 00000000 0000000E B............................... 0001C0
00000000 00000000 00000000 00000000 00000000 00000000 00000000 00000000 ................................ 0001E0

Dump of file SATURN:[PCCOMMON.DUMP.DLL]PDLSYN.TMP;1 on 18-APR-1990 10:48:45.27
File ID (771,27,0)   End of file block 276 / Allocated 276
```

```
Virtual block number 175 (000000AF), 512 (0200) bytes

 00000000 000000DE 00000000 00000000 00000000 00000000 00000000 00000000 ........................ß....... 000000
 00000000 00000000 00000000 00000000 00DE0000 00000000 00000000 000000DE ß.............ß................. 000020
 00000000 000000DE 00000000 00000000 00000000 00000000 00000000 00000000 ........................ß....... 000040
 00000000 000000DE 00DE00DE 00000000 00000000 00000000 00000000 00000000 ....................ß.ß.ß....... 000060
 00000000 00DE0000 00000000 00000000 00000000 00000000 00000000 00000000 ..........................ß..... 000080
 00000000 00000000 00000000 00000000 00000000 00000000 00000000 00000000 ................................ 0000A0
 00000000 00000000 00DE0000 00000000 000000DE 000000DE 000000DE 00DE00DE ß.ß.ß...ß...ß.........ß......... 0000C0
 00000000 00000000 00000000 00000000 00000000 00000000 000000DE 00DE00DE ß.ß.ß........................... 0000E0
 00000026 00000000 00000000 00000000 00DE0000 000000DE 00000000 00000000 ........ß.....ß.............&... 000100
 00000000 00000000 00000000 00000000 00000000 00000000 00000000 00000000 ................................ 000120
 00000000 00000000 00000000 00000000 00000000 00000000 00000000 00000000 ................................ 000140
 00000000 00000000 00000000 00000000 00000000 00000000 00000000 00000000 ................................ 000160
 00000000 00000000 00000000 00000000 00000000 00000000 00000000 00000000 ................................ 000180
 00000000 00000000 00000000 00270000 00000000 00000000 00000000 00000000 ..................'............. 0001A0
 00000000 00000000 00000000 00000000 00000000 00000000 00000000 00000000 ................................ 0001C0
 00000000 00000000 00000000 00000000 00000000 00000000 00000000 00000000 ................................ 0001E0

Dump of file SATURN:[PCCOMMON.DUMP.DLL]PDLSYN.TMP;1 on 18-APR-1990 10:48:45.27
File ID (771,27,0)   End of file block 276 / Allocated 276

Virtual block number 176 (000000B0), 512 (0200) bytes

 00000000 00000000 00000000 00000000 00000000 00000000 00000000 00000000 ................................ 000000
 00000000 00000000 00000000 00000000 00000000 00000000 00000000 00000000 ................................ 000020
 00000000 00000000 00000000 00000000 00000000 00000000 00000000 00000000 ................................ 000040
 00270000 00000000 00000000 00000000 00000000 00000000 00000000 00000000 ..............................'. 000060
 00000000 00000000 00000000 00000000 00000000 00000000 00000000 00000000 ................................ 000080
 00000000 00000000 00000000 00000000 00000000 00000000 00000000 00000000 ................................ 0000A0
 00000000 00000000 00000000 00000000 00000000 00000000 00000000 00000000 ................................ 0000C0
 00000000 00000000 00000000 00000000 00000000 00000000 00000000 00000000 ................................ 0000E0
 00000000 00000000 00000000 00000000 00000000 00000000 00000000 00000000 ................................ 000100
 00000000 00000000 00000000 00000000 00000000 00000000 00000000 00000000 ................................ 000120
 00000000 00000000 00000000 00000000 00000000 00000000 00000000 00000000 ................................ 000140
 00000000 00000000 00000000 00000000 00000000 00000000 00000000 00000000 ................................ 000160
 00000000 00000000 00000000 00000000 00000000 00000000 00000000 00000000 ................................ 000180
 00000000 00000000 00700000 00000000 00000000 00000000 00000000 00000000 ......................p......... 0001A0
 00000000 00000000 00000000 00000000 00000000 00000000 00000000 00000000 ................................ 0001C0
 00000000 00000000 00000000 00000000 00710000 00000000 00000000 00000000 ..............q................. 0001E0

Dump of file SATURN:[PCCOMMON.DUMP.DLL]PDLSYN.TMP;1 on 18-APR-1990 10:48:45.27
File ID (771,27,0)   End of file block 276 / Allocated 276

Virtual block number 177 (000000B1), 512 (0200) bytes

 00000000 00000000 00000000 00000000 00000000 00000000 00000000 00000000 ................................ 000000
 00000000 00000000 00000000 00000000 00000000 00000000 00000000 00000000 ................................ 000020
 00000000 00000000 00000000 00000000 00000000 00000000 00000000 00000000 ................................ 000040
 00000000 00000000 00000000 00000000 00000000 00000000 00000000 00000000 ................................ 000060
 00000000 00000000 00000000 00000000 00000000 00000000 00000000 00000000 ................................ 000080
 00000000 00000000 00000000 00000000 00000000 00000000 00000000 00000000 ................................ 0000A0
 00000000 00000000 00000000 00000000 00000000 00000000 00000000 00000000 ................................ 0000C0
 00000000 00000000 00000000 00000000 00000000 00000000 00000000 00000000 ................................ 0000E0
 00000000 00000000 00000000 00000000 00000000 00000000 00000000 00000000 ................................ 000100
 00000000 00000000 00000000 00000000 00000000 00000000 00000000 00000000 ................................ 000120
 00000000 00000000 00000000 00000000 00000000 00000000 00000000 00000000 ................................ 000140
 000000E1 00000000 00000000 00000000 00000000 00000000 000000E1 00000000 ....Á.......................Á... 000160
 00000000 00000000 00000000 00000000 00000000 000000E0 00000000 000000E1 Á.......À....................... 000180
 00000000 00000000 00000000 00000000 00000000 00000000 00000000 00000000 ................................ 0001A0
 00000000 000000E1 00000000 00000000 00000000 00000000 00000000 00000000 ........................Á....... 0001C0
 00000000 00000000 00000000 00000000 00E10000 00000000 00000000 000000E1 Á.............Á................. 0001E0

Dump of file SATURN:[PCCOMMON.DUMP.DLL]PDLSYN.TMP;1 on 18-APR-1990 10:48:45.27
File ID (771,27,0)   End of file block 276 / Allocated 276
```

```
Virtual block number 178 (000000B2), 512 (0200) bytes

00000000 000000E1 00000000 00000000 00000000 00000000 00000000 00000000 ........................Ā....... 000000
00000000 000000E1 00E100E1 00000000 00000000 00000000 00000000 00000000 ....................Ā.Ā.Ā....... 000020
00000000 00E10000 00000000 00000000 00000000 00000000 00000000 00000000 ..........................Ā..... 000040
00000000 00000000 00000000 00000000 00000000 00000000 00000000 00000000 ................................ 000060
00000000 00000000 00E10000 00000000 000000E1 000000E1 000000E1 00E100E1 Ā.Ā.Ā...Ā...Ā.........Ā......... 000080
00000000 00000000 00000000 00000000 00000000 00000000 000000E1 00E100E1 Ā.Ā.Ā........................... 0000A0
00000000 00000000 00000000 00000000 00E10000 000000E1 00000000 00000000 ........Ā.....Ā................. 0000C0
00000000 00000000 00000000 00000078 00000000 00000000 00000000 00000000 ................x............... 0000E0
00000000 00000000 00000000 00000000 00000000 00000077 00000000 00000000 ........w....................... 000100
00000000 00000000 00000000 00000000 00000000 00000000 00000000 00000000 ................................ 000120
00000000 00000000 00000000 00000078 00000000 00000000 00000000 00000000 ................x............... 000140
00000000 00000000 00000000 00000000 00000000 00000000 00000000 00000000 ................................ 000160
00000000 00000000 00000000 00000000 00000000 00000000 00000000 00000000 ................................ 000180
00000000 00000000 00000000 00000000 00000000 00000000 00000000 00000000 ................................ 0001A0
00000000 00000000 00000000 00000000 00000000 00000000 00000000 00000000 ................................ 0001C0
00000078 00000000 00000000 00000000 00000000 00000000 00000000 00000000 ............................x... 0001E0

Dump of file SATURN:[PCCOMMON.DUMP.DLL]PDLSYN.TMP;1 on 18-APR-1990 10:48:45.27
File ID (771,27,0)    End of file block 276 / Allocated 276

Virtual block number 179 (000000B3), 512 (0200) bytes

00000000 00000000 00000000 00780000 00000000 00000000 00780000 00000000 ......x...........x............. 000000
00780000 00000000 00000000 00000000 00000000 00000000 00000000 00000000 ..............................x. 000020
00900000 00000000 00000090 00900000 00000000 00900090 00000000 00900000 ................................ 000040
008F0000 00000000 00000090 00900090 00900000 00000000 00000090 00000000 ................................ 000060
00000000 00000000 00000000 00000000 00000000 00000000 00000000 00000000 ................................ 000080
00000090 00000000 00000000 00000090 00900000 00000090 00000090 00000090 ................................ 0000A0
00000000 00000000 00000000 00000000 00000000 00000000 00900000 00000000 ................................ 0000C0
00000090 00000000 00000090 00000090 00900090 00000000 00900000 00900000 ................................ 0000E0
00000000 00000000 00000000 00000000 00000090 00000000 00900000 00900090 ................................ 000100
00900090 00000000 00000000 00900000 00000000 00000000 00000000 00000090 ................................ 000120
00000090 00900090 00900090 00900090 00900090 00000000 00000000 00000090 ................................ 000140
00000000 00900090 00000090 00000090 00000000 00000000 00000000 00000000 ................................ 000160
00000000 00000000 00000000 00000000 00000000 00000000 00900000 00000000 ................................ 000180
00000000 00000000 00000000 00000000 00900000 00000000 00000000 00000000 ................................ 0001A0
00000000 00000000 00000000 00000000 00000000 00000000 00000000 00000000 ................................ 0001C0
00000000 00000000 00000000 00000000 00000000 00000000 00000000 00000000 ................................ 0001E0

Dump of file SATURN:[PCCOMMON.DUMP.DLL]PDLSYN.TMP;1 on 18-APR-1990 10:48:45.27
File ID (771,27,0)    End of file block 276 / Allocated 276

Virtual block number 180 (000000B4), 512 (0200) bytes

00000000 00000000 00000000 00000000 00000000 00000000 00000000 00000000 ................................ 000000
00000000 00000000 00000000 00000000 00000000 00000000 00000000 00000000 ................................ 000020
00000000 00000000 00000000 00000000 00000000 00000000 00000000 00000000 ................................ 000040
00000000 00000000 00000000 00000000 00000000 00000000 00000000 00000000 ................................ 000060
00000000 00000000 00000000 00000000 00000000 00000000 00000000 00000000 ................................ 000080
00000000 00000000 00000000 00000000 00000000 00000000 00000000 00000000 ................................ 0000A0
00000000 00000000 00000000 00000000 00000000 00000000 00000000 00000000 ................................ 0000C0
00000000 00000000 00000000 00000000 00000000 00000000 00000000 00000000 ................................ 0000E0
00000000 00000000 00000000 00000000 00000000 00000000 00000000 00000000 ................................ 000100
00000000 00000000 00000000 00000000 00000000 00000000 00000000 00000000 ................................ 000120
00000000 00000000 00000000 00000000 00000000 00000000 00000000 00000000 ................................ 000140
00000000 00000000 00000000 00000000 00000000 00000000 00000000 00000000 ................................ 000160
00000000 00000000 00000000 00000000 00000000 00000000 00000000 00000000 ................................ 000180
00000000 00000000 00000000 00000000 00000000 00000000 00000000 00000000 ................................ 0001A0
00000000 00000000 00000000 00000000 00000000 00000000 00000000 00000000 ................................ 0001C0
00000000 00000000 00000000 00000000 00000000 00000000 00000000 00000000 ................................ 0001E0

Dump of file SATURN:[PCCOMMON.DUMP.DLL]PDLSYN.TMP;1 on 18-APR-1990 10:48:45.27
File ID (771,27,0)    End of file block 276 / Allocated 276
```

```
Virtual block number 181 (000000B5), 512 (0200) bytes

 00000000 00000000 00000000 00000000 00000000 00000000 00000000 00000000 ................................ 000000
 00000000 00000000 00000000 00000000 00000000 00000000 00000000 00000000 ................................ 000020
 00000000 00000000 00000000 00000000 00000000 00000000 00000000 00000000 ................................ 000040
 00000000 00000000 00000000 00000000 00000000 00000000 00000000 00000000 ................................ 000060
 00000000 00000000 00000000 00000000 00000000 00000000 00000000 00000000 ................................ 000080
 00000000 00000000 00000000 00000000 00000000 00000000 00000000 00000000 ................................ 0000A0
 00000000 00000000 00000000 00000000 00000000 00000000 00000000 00000000 ................................ 0000C0
 00000000 00000000 00000000 00000000 00000000 00000000 00000000 00000000 ................................ 0000E0
 00000000 00000000 00000000 000000B1 00000000 00000000 00000000 00000000 ................ý............... 000100
 00000000 00000000 00000000 00B20000 00000000 00000000 00000000 00000000 ..................ý............. 000120
 00000000 00000000 00000000 00000000 00000000 00000000 00000000 00000000 ................................ 000140
 00000000 00000000 00000000 00000000 00000000 00000000 00000000 00000000 ................................ 000160
 00000000 00000000 00000000 00000000 00000000 00000000 00000000 00000000 ................................ 000180
 00000000 00000000 00000000 00000000 00000000 00000000 00000000 00000000 ................................ 0001A0
 00000000 00000000 00000000 00000000 00000000 00000000 00000000 00000000 ................................ 0001C0
 00B20000 00000000 00000000 00000000 00000000 00000000 00000000 00000000 ..............................ý. 0001E0

Dump of file SATURN:[PCCOMMON.DUMP.DLL]PDLSYN.TMP;1 on 18-APR-1990 10:48:45.27
File ID (771,27,0)   End of file block 276 / Allocated 276

Virtual block number 182 (000000B6), 512 (0200) bytes

 000000E5 00000000 00000000 00000000 00000000 00000000 000000E5 00000000 ....å.......................å... 000000
 00000000 00000000 00000000 00000000 00000000 000000E5 00000000 000000E5 å.......å....................... 000020
 00000000 00000000 00000000 00000000 00000000 00000000 00000000 00000000 ................................ 000040
 00000000 000000E5 00000000 00000000 00000000 00000000 00E30000 00000000 ......D.................å....... 000060
 00000000 00000000 00000000 00000000 00E50000 00000000 00000000 000000E5 å.............å................. 000080
 00000000 000000E5 00000000 00000000 00000000 00000000 00000000 00000000 ........................å....... 0000A0
 00000000 000000E5 00E500E5 00000000 00000000 00000000 000000E4 00000000 ....ð...............å.å.å....... 0000C0
 00000000 00E50000 00000000 00000000 00000000 00000000 00000000 00000000 ..........................å..... 0000E0
 00000000 00000000 00000000 00000000 00000000 00000000 00000000 00000000 ................................ 000100
 00000000 00000000 00E50000 00000000 000000E5 000000E5 000000E5 00E500E5 å.å.å...å...å.........å......... 000120
 00000000 00000000 00000000 00000000 00000000 00000000 000000E5 00E500E5 å.å.å........................... 000140
 00000000 00000000 00000000 00000000 00E50000 000000E5 00000000 00000000 ........å.....å................. 000160
 00000000 00000000 00000000 00000000 00000000 00000000 00000000 00000000 ................................ 000180
 00000000 00000000 00000000 00000000 00000000 00000000 00000000 00000000 ................................ 0001A0
 00000000 00000000 00000000 00000000 00000000 00000000 00000000 00000000 ................................ 0001C0
 00000000 00000000 0000007E 00000000 00000000 00000000 00000000 00000000 ....................~........... 0001E0

Dump of file SATURN:[PCCOMMON.DUMP.DLL]PDLSYN.TMP;1 on 18-APR-1990 10:48:45.27
File ID (771,27,0)   End of file block 276 / Allocated 276

Virtual block number 183 (000000B7), 512 (0200) bytes

 00000000 00000000 00000000 00000000 00000000 00000000 00000000 00000000 ................................ 000000
 00000000 00000000 00000000 00000000 00000000 00000000 00000000 00000000 ................................ 000020
 00000000 00000000 00000000 00000000 00000000 00000000 007F0000 00000000 ................................ 000040
 00000000 00000000 00000000 00000000 00000000 00000000 00000000 00000000 ................................ 000060
 0000007F 00000000 00000000 00000000 00000000 00000000 00000000 00000000 ................................ 000080
 00000000 00000000 00000000 007F0000 00000000 00000000 007F0000 00000000 ................................ 0000A0
 007F0000 00000000 00000000 00000000 00000000 00000000 00000000 00000000 ................................ 0000C0
 00000000 00000000 00000000 00000000 00000000 00000000 00000000 00000000 ................................ 0000E0
 00000000 00000000 00000000 00000000 00000000 00000000 00000000 00000000 ................................ 000100
 00000000 00000000 00000000 00000000 00000000 00000000 00000000 00000000 ................................ 000120
 00000041 00000000 00000000 00000000 00000000 00000000 00000000 00000000 ............................A... 000140
 00000000 00000000 00000000 00000000 00000000 00000000 00000000 00000000 ................................ 000160
 00000000 00000000 00000000 00000000 00000000 00000000 00000000 00000000 ................................ 000180
 00000000 00000000 00000000 00000000 00000000 00000000 00000000 00000000 ................................ 0001A0
 00000000 00000000 00000000 00000000 00000000 00000000 00000000 00000000 ................................ 0001C0
 00000000 00000000 00000000 00000000 00000000 00000000 00000000 00000000 ................................ 0001E0

Dump of file SATURN:[PCCOMMON.DUMP.DLL]PDLSYN.TMP;1 on 18-APR-1990 10:48:45.27
File ID (771,27,0)   End of file block 276 / Allocated 276
```

Virtual block number 184 (000000B8), 512 (0200) bytes

```
00000000 00000000 00000000 00000000 00000000 00000000 00000000 00000000 ................................ 000000
00000000 00000000 00000000 00000000 00000000 00000000 00000000 00000000 ................................ 000020
00000000 00000000 00000000 00000000 00000000 00000000 00000000 00000000 ................................ 000040
00000000 00000000 00000000 00000000 00000000 00000000 00000000 00000000 ................................ 000060
00000000 00000000 00000000 00000000 00000000 00000000 00000000 00000000 ................................ 000080
00000000 00000000 00000000 00000000 00000000 00000000 00000000 00000000 ................................ 0000A0
00000000 00000000 00000000 00000000 00000000 00000000 00000000 00000000 ................................ 0000C0
00000000 00000000 00000000 00000000 00000000 00000000 00000000 010E0000 ................................ 0000E0
00000000 00000000 00000000 00000000 00000000 0000010F 00000000 00000000 ................................ 000100
00000000 00000000 00000000 00000000 00000000 0000010F 00000000 00000000 ................................ 000120
00000000 00000000 00000000 00000000 00000000 010F0000 00000000 00000000 ................................ 000140
00000000 00000000 00000000 00000000 00000000 00000000 00000000 00000000 ................................ 000160
00000000 00000000 00000000 00000000 00000000 00000000 00000000 00000000 ................................ 000180
010F0000 00000000 00000000 00000000 00000000 00000000 00000000 00000000 ................................ 0001A0
00000000 00000000 00000000 00000000 00000000 00000000 00000000 00000000 ................................ 0001C0
00000000 00000000 00000000 00000000 00000000 00000000 00000000 00000000 ................................ 0001E0
```

Dump of file SATURN:[PCCOMMON.DUMP.DLL]PDLSYN.TMP;1 on 18-APR-1990 10:48:45.27
File ID (771,27,0)   End of file block 276 / Allocated 276

Virtual block number 185 (000000B9), 512 (0200) bytes

```
00000000 00000000 00000000 00000000 00000000 00000000 00000000 00000000 ................................ 000000
00000000 00000000 00000000 00000000 00000000 00000000 00000000 00000000 ................................ 000020
00000000 00000000 00000000 003E0000 00000000 00000000 00000000 00000000 ..................>............. 000040
00000000 0000003F 00000000 00000000 00000000 00000000 00000000 00000000 ........................?....... 000060
00000000 0000003F 00000000 00000000 00000000 00000000 00000000 00000000 ........................?....... 000080
00000000 003F0000 00000000 00000000 00000000 00000000 00000000 00000000 ..........................?..... 0000A0
00000000 00000000 00000000 00000000 00000000 00000000 00000000 00000000 ................................ 0000C0
00000000 00000000 00000000 00000000 00000000 00000000 00000000 00000000 ................................ 0000E0
00000000 00000000 00000000 00000000 00000000 00000000 00000000 00000000 ................................ 000100
00000000 00000000 00000000 00000000 003F0000 00000000 00000000 00000000 ..............?................. 000120
00000000 00000000 00000000 00000000 00000000 00000000 00000000 00000000 ................................ 000140
00000000 00000000 00000000 00000000 00000000 00000000 00000000 00000000 ................................ 000160
00000000 00000000 00000000 00000000 00000000 00000000 00000000 00000000 ................................ 000180
00000000 00000000 00000000 00000000 00000000 00000000 00000000 00000000 ................................ 0001A0
00000000 00000000 00000000 00000000 00000000 00000000 00000000 00000000 ................................ 0001C0
00000000 00000000 00000000 00000000 00000000 00000000 00000000 00000000 ................................ 0001E0
```

Dump of file SATURN:[PCCOMMON.DUMP.DLL]PDLSYN.TMP;1 on 18-APR-1990 10:48:45.27
File ID (771,27,0)   End of file block 276 / Allocated 276

Virtual block number 186 (000000BA), 512 (0200) bytes

```
00000000 00000000 00000000 00000000 00000000 00000000 00000000 00000000 ................................ 000000
00000000 00000000 00000000 00000000 00000000 00000000 00000000 00000000 ................................ 000020
00000000 00000000 00000000 00000000 00000000 00000000 00000000 00000000 ................................ 000040
00000000 00000000 00000000 00000000 00000000 00000000 00000000 00000000 ................................ 000060
00000000 00000000 00000000 00000000 00000000 00000000 00000000 00000000 ................................ 000080
00000000 00000000 00000000 00000000 00000000 00000000 00000000 00000000 ................................ 0000A0
00000000 00000000 00000000 00000000 00000000 00000000 00000000 00000000 ................................ 0000C0
00000000 00000000 00000000 00000000 00000000 00000000 00000000 00000000 ................................ 0000E0
00000000 00000084 00000000 00000000 00000000 00000000 00000000 00000000 ................................ 000100
00000000 00000000 00000000 00000000 00850000 00000000 00000000 00000085 ................................ 000120
00000000 00000000 00000000 00000000 00000000 00000000 00000000 00000000 ................................ 000140
00000000 00000000 00850000 00000000 00000000 00000000 00000000 00000000 ................................ 000160
00000000 00000000 00000000 00000000 00000000 00000000 00000000 00000000 ................................ 000180
00000000 00000000 00000000 00000000 00000000 00000000 00000000 00000000 ................................ 0001A0
00000000 00000000 00850000 00000000 00000000 00000085 00000000 00000085 ................................ 0001C0
00000000 00000000 00000000 00000000 00000000 00000000 00000000 00000085 ................................ 0001E0
```

Dump of file SATURN:[PCCOMMON.DUMP.DLL]PDLSYN.TMP;1 on 18-APR-1990 10:48:45.27
File ID (771,27,0)   End of file block 276 / Allocated 276

```
Virtual block number 187 (000000BB), 512 (0200) bytes

00000000 00000000 00000000 00000000 00850000 00000085 00000000 00000000 ................................ 000000
00000000 00000000 00000000 00000000 00000000 00000000 00000000 00000000 ................................ 000020
00000000 00000000 00000000 00000000 00000000 00000000 00000000 00000000 ................................ 000040
00000000 00000000 00000000 00000000 00000000 00000000 00000000 00000000 ................................ 000060
00000000 00000000 00000000 00000000 00000000 00000060 00000000 00000000 ........`....................... 000080
00000000 00000000 00000000 00000000 00000000 00000000 00000000 00000000 ................................ 0000A0
00000000 00000000 00000000 00000000 00000000 00000000 00000000 00000000 ................................ 0000C0
00000000 00000000 00000000 00000000 00000000 00000000 00000000 00000000 ................................ 0000E0
00000000 00000000 00000000 00000000 00000000 00000000 00000000 00000000 ................................ 000100
00000000 00000000 00000000 00000000 00000000 00000000 00000000 00000000 ................................ 000120
00000000 00000000 00000000 00000000 00000000 00000000 00000000 00000000 ................................ 000140
00610000 00000000 00000000 00000000 00000000 00000000 00000000 00000000 ..............................a. 000160
00000000 00000000 00000000 00000000 00000000 00000000 00000000 00000000 ................................ 000180
00000000 00000000 00000000 00000000 00000000 00000000 00000000 00000000 ................................ 0001A0
00000000 00000000 00000000 00000000 00000000 00000000 00000000 00000000 ................................ 0001C0
00000000 00000000 00000000 00000000 00000000 00000000 00000000 00000000 ................................ 0001E0

Dump of file SATURN:[PCCOMMON.DUMP.DLL]PDLSYN.TMP;1 on 18-APR-1990 10:48:45.27
File ID (771,27,0)   End of file block 276 / Allocated 276

Virtual block number 188 (000000BC), 512 (0200) bytes

00000000 00000000 00000000 00000000 00000000 00000000 00000000 0000007B {............................... 000000
00000000 00000000 00000000 00000000 00000000 00000000 00000000 00000000 ................................ 000020
00000000 00000000 007C0000 00000000 00000000 00000000 00000000 00000000 ......................|......... 000040
00000000 00000000 00000000 00000000 00000000 00000000 00000000 00000000 ................................ 000060
00000000 00000000 00000000 00000000 00000000 00000000 00000000 00000000 ................................ 000080
00000000 00000000 007C0000 00000000 0000007C 00000000 00000000 00000000 ............|.........|......... 0000A0
00000000 00000000 00000000 00000000 00000000 00000000 00000000 007C0000 ..|............................. 0000C0
00000000 00000000 00000000 00000000 007C0000 00000000 00000000 00000000 ..............|................. 0000E0
00000000 00000000 00000000 00000000 00000000 00000000 00000000 00000000 ................................ 000100
00000000 00000000 00000000 00000000 00000000 00000000 00000000 00000000 ................................ 000120
00000000 00000000 00000000 00000000 00000000 00000000 00000000 00000000 ................................ 000140
00A30000 00000000 00000000 000000A4 00000000 00000000 00000000 00000000 ................£.............£. 000160
00000000 00000000 00000000 00000000 00000000 00000000 00000000 00000000 ................................ 000180
00000000 00000000 00000000 00000000 00000000 00000000 00000000 00000000 ................................ 0001A0
00000000 00000000 00000000 00000000 00000000 00000000 00A40000 00000000 ......£......................... 0001C0
00000000 00000000 00000000 00000000 00000000 00000000 00000000 00000000 ................................ 0001E0

Dump of file SATURN:[PCCOMMON.DUMP.DLL]PDLSYN.TMP;1 on 18-APR-1990 10:48:45.27
File ID (771,27,0)   End of file block 276 / Allocated 276

Virtual block number 189 (000000BD), 512 (0200) bytes

00000000 000000A4 00000000 00000000 00000000 00000000 00000000 00000000 ........................£....... 000000
00000000 00000000 00000000 000000A4 00000000 00000000 00A40000 00000000 ......£.........£............... 000020
00A40000 00000000 00000000 00000000 00000000 00000000 00000000 00000000 ..............................£. 000040
00000000 00000000 00000000 00000000 00000000 00000000 00000000 00000000 ................................ 000060
00000000 00000000 00000000 00000000 00000000 00000000 00000000 00000000 ................................ 000080
00000000 00000000 00000000 00000000 00000000 00000000 00000000 00000000 ................................ 0000A0
00000000 00000000 00000000 00000000 00000000 00000000 00000000 00000000 ................................ 0000C0
00000000 00000000 00000000 00000000 00000000 00000000 00000000 00000000 ................................ 0000E0
00000000 00000114 00000000 00000000 00000000 00000000 00000000 00000000 ................................ 000100
00000000 00000000 00000000 00000000 00000000 00000000 00000000 00000000 ................................ 000120
00000000 01150000 00000000 00000000 00000000 00000000 00000000 00000000 ................................ 000140
00000000 00000000 00000000 00000000 00000000 00000000 00000000 00000000 ................................ 000160
00000000 00000000 00000000 00000000 00000000 00000000 00000000 00000000 ................................ 000180
00000000 00000000 00000000 00000000 00000000 00000000 00000000 00000000 ................................ 0001A0
00000000 00000000 00000000 00000000 01150000 00000000 00000000 00000000 ................................ 0001C0
00000000 00000000 00000000 00000000 00000000 00000000 00000000 00000000 ................................ 0001E0

Dump of file SATURN:[PCCOMMON.DUMP.DLL]PDLSYN.TMP;1 on 18-APR-1990 10:48:45.27
File ID (771,27,0)   End of file block 276 / Allocated 276
```

```
Virtual block number 190 (000000BE), 512 (0200) bytes

00000000 00000000 00000000 00000000 00000000 00000000 00000000 00000000 ................................ 000000
00000000 00000000 00000000 00000000 00000000 00000000 00000000 00000000 ................................ 000020
00000000 00000000 00000000 00000000 00000000 00000000 00000000 00000000 ................................ 000040
00000000 00000000 00000000 00000000 00000000 00000000 00000000 00000000 ................................ 000060
00000000 00000000 00000000 00000000 00000000 00000047 00000000 00000000 ........G....................... 000080
00000000 00000000 00000000 00000000 00000000 00000000 00000000 00000000 ................................ 0000A0
00000000 00000000 00000000 00000000 00000000 00480000 00000000 00000000 ..........H..................... 0000C0
00000000 00000000 00000000 00000000 00000000 00000000 00000000 00000000 ................................ 0000E0
00000000 00000000 00000000 00000000 00000000 00000000 00000000 00000000 ................................ 000100
00480000 00000000 00000000 00000000 00000000 00000000 00000000 00000000 ..............................H. 000120
00000000 00000000 00000000 00000000 00000000 00000000 00000000 00000000 ................................ 000140
00000000 00000000 00000000 00000000 00000000 00000000 00000000 00000098 ................................ 000160
00000000 00000000 00000000 00000000 00000000 00000000 00000000 00000000 ................................ 000180
00000000 00000000 00000000 00000000 00000000 00000000 00000000 00000000 ................................ 0001A0
00000000 00000000 00000000 00000000 00990000 00000000 00000000 00000000 ................................ 0001C0
00000000 00000000 00000000 00000000 00000000 00000000 00000000 00000000 ................................ 0001E0

Dump of file SATURN:[PCCOMMON.DUMP.DLL]PDLSYN.TMP;1 on 18-APR-1990 10:48:45.27
File ID (771,27,0)   End of file block 276 / Allocated 276

Virtual block number 191 (000000BF), 512 (0200) bytes

00000000 00000000 00000000 00000000 00000000 00000000 00000000 00000000 ................................ 000000
00000000 00000000 00000000 00000000 00000000 00000000 00000000 00000000 ................................ 000020
00000000 00000000 00000000 00000000 00000000 00000000 00000000 00000000 ................................ 000040
00000000 00000000 00000000 00000000 00000000 00000000 00000000 00000099 ................................ 000060
00000000 00000000 00000000 00000000 00000000 00000000 00000000 00000099 ................................ 000080
00000000 00000000 00000000 00000000 00990000 00000000 00000000 00000000 ................................ 0000A0
00000000 00000000 00000000 00000000 00000000 00000000 00000000 00000000 ................................ 0000C0
00000000 00000000 00000000 00000000 00000000 00000000 00000000 00000000 ................................ 0000E0
00000000 00000000 00000000 00000000 00000000 00000000 00000000 00000000 ................................ 000100
00000000 00000000 00000000 00000000 00000000 00000000 00000000 00000000 ................................ 000120
00000000 00000000 00000000 00000000 00000000 00000000 00000000 00000000 ................................ 000140
00000000 00000000 00000000 00000000 00000000 00000000 00000000 00000000 ................................ 000160
00000000 00000000 00000000 00000000 00000000 00000000 00000000 00000000 ................................ 000180
00000000 00000000 00000000 00000000 00000000 00000000 00000000 00000000 ................................ 0001A0
00000000 00000000 00000000 00000000 00000000 00000000 00000000 00000000 ................................ 0001C0
00000000 00000000 00000000 00000000 00000000 00000000 00000000 00000000 ................................ 0001E0

Dump of file SATURN:[PCCOMMON.DUMP.DLL]PDLSYN.TMP;1 on 18-APR-1990 10:48:45.27
File ID (771,27,0)   End of file block 276 / Allocated 276

Virtual block number 192 (000000C0), 512 (0200) bytes

00000000 00000000 00000000 00000000 00000000 00000000 00000000 00000000 ................................ 000000
00000000 00000000 00000006 00060000 00000000 00000000 00000000 00000000 ..................#.#........... 000020
00000000 00000000 00000000 00000000 00000000 00000000 00000000 00000000 ................................ 000040
00000000 00000000 00000000 00000000 00000000 00000000 00000000 00000000 ................................ 000060
00000000 00000000 00000000 00000000 00000000 00000000 00000000 00000000 ................................ 000080
00000000 00000000 00000000 00000000 00000000 00000000 00000000 00000000 ................................ 0000A0
00000000 00000000 00000000 00000000 00000000 00000000 00000000 00000000 ................................ 0000C0
00000000 00000000 00000000 00000000 00000006 00000000 00000000 00000000 .............#.................. 0000E0
00000000 00000000 00000000 00000000 00000000 00000000 00000000 00000000 ................................ 000100
00000000 00000000 00000006 00000000 00000000 00000000 00000000 00000000 ....................#........... 000120
00000000 00000000 00000000 00000006 00000000 00000000 00000000 00000000 ................#............... 000140
00000000 00000000 00000000 00000000 00000000 00000000 00000000 00000000 ................................ 000160
00000000 00000000 00000000 00000000 00070000 00000000 00000000 00000000 ..............#................. 000180
00000000 00000000 00000000 00000088 00000000 00000000 00000000 00000000 ................................ 0001A0
00000000 00000000 00000000 00000000 00000000 00000000 00000000 00000000 ................................ 0001C0
00000000 00000000 00000000 00000000 00000000 00000000 00000000 00000000 ................................ 0001E0

Dump of file SATURN:[PCCOMMON.DUMP.DLL]PDLSYN.TMP;1 on 18-APR-1990 10:48:45.27
File ID (771,27,0)   End of file block 276 / Allocated 276
```

```
Virtual block number 193 (000000C1), 512 (0200) bytes

00890000 00000000 00000000 00000089 00000000 00000000 00000000 00000000 ................................ 000000
00000000 00000000 00000000 00000000 00000000 00000000 00000000 00000000 ................................ 000020
00000000 00000000 00000000 00000000 00000000 00000000 00000000 00000000 ................................ 000040
00000000 00000000 00000000 00000000 00000000 00000000 00890000 00000000 ................................ 000060
00000000 00000000 00000000 00000000 00000000 00000000 00000000 00000000 ................................ 000080
00000000 00000089 00000000 00000089 00000000 00000000 00000000 00000000 ................................ 0000A0
00000000 00000000 00000000 00000089 00000000 00000000 00890000 00000000 ................................ 0000C0
00890000 00000089 00000000 00000000 00000000 00000000 00000000 00000000 ................................ 0000E0
00000000 00000000 00000000 00000000 00000000 00000000 00000000 00000000 ................................ 000100
00000000 00000000 00000000 00000000 00000000 00000000 00000000 00000059 Y............................... 000120
00000000 00000000 00000000 00000000 00000000 00000000 00000000 00000000 ................................ 000140
00000000 00000000 00000000 00000000 00000000 00000000 00000000 00000000 ................................ 000160
00000000 00000000 00000000 00000000 00000000 00000000 00000000 00000000 ................................ 000180
00000000 00000000 00000000 00000000 00000000 00000000 00000000 00000000 ................................ 0001A0
00000000 00000000 00000000 00000000 00000000 00000000 00000000 00000000 ................................ 0001C0
00000000 00000000 00000000 00000000 00000000 00000000 00000000 00000000 ................................ 0001E0

Dump of file SATURN:[PCCOMMON.DUMP.DLL]PDLSYN.TMP;1 on 18-APR-1990 10:48:45.27
File ID (771,27,0)   End of file block 276 / Allocated 276

Virtual block number 194 (000000C2), 512 (0200) bytes

00000000 00000000 00000000 00000000 00000000 00000000 00000000 00000000 ................................ 000000
00000000 00000000 00000000 00000000 00000000 00000000 00000000 00000000 ................................ 000020
00000000 00000000 00000000 00000000 00000000 00000000 00000000 00000000 ................................ 000040
00000000 00000000 00000000 00000000 005A0000 00000000 00000000 00000000 .............Z.................. 000060
00000000 00000000 00000000 00000042 00000000 00000000 00000000 00000000 ...............B................ 000080
00000000 00000000 00000000 00000000 00000000 00000000 00000000 00000000 ................................ 0000A0
00000000 00000000 00000000 00000000 00000000 00000000 00000000 00000000 ................................ 0000C0
00000000 00000000 00000000 00000000 00000000 00000000 00000000 00000000 ................................ 0000E0
00000000 00000000 00000000 00000000 00000000 00000000 00000000 00000000 ................................ 000100
00000000 00000000 00000000 00000000 00000000 00000043 00000000 00000000 ........C....................... 000120
00000000 00000000 00000000 00000000 00000000 00000043 00000000 00000000 ........C....................... 000140
00000000 00000000 00000000 00000000 00000000 00430000 00000000 00000000 ..........C..................... 000160
00000000 00000000 00000000 00000000 00000000 00000000 00000000 00000000 ................................ 000180
00000000 00000000 00000000 00000000 00000000 00000000 00000000 00000000 ................................ 0001A0
00430000 00000000 00000000 00000000 00000000 00000000 00000000 00000000 ..............................C. 0001C0
00000000 00000000 00000000 00000000 00000000 00000000 00000000 00000000 ................................ 0001E0

Dump of file SATURN:[PCCOMMON.DUMP.DLL]PDLSYN.TMP;1 on 18-APR-1990 10:48:45.27
File ID (771,27,0)   End of file block 276 / Allocated 276

Virtual block number 195 (000000C3), 512 (0200) bytes

00000000 00000000 00000000 00000000 00000000 00000000 00000000 00000000 ................................ 000000
00000000 00000000 00000000 00000000 00000000 00000000 00000000 00000000 ................................ 000020
00000000 00000000 00000000 00000000 00000000 00000000 00000000 00000000 ................................ 000040
00000000 00000000 00000000 00000000 00000000 00000000 00000000 00000000 ................................ 000060
00000000 00000000 00000000 00000000 00000000 00000000 00000000 00000000 ................................ 000080
00000000 00000000 00000000 00000000 00000000 00000000 00000000 00000000 ................................ 0000A0
00000000 00000000 00000000 00000000 00000000 00000000 00000000 00000000 ................................ 0000C0
00000000 00000000 00000000 00000000 00000000 00000000 00000000 00000000 ................................ 0000E0
00000000 00000000 00000000 00000000 00000000 00000000 00000000 00000000 ................................ 000100
00000000 00000000 00000000 00000000 00000000 00000000 00000000 00000000 ................................ 000120
00000000 00000000 00000000 00000000 00000000 00000000 00000000 00000000 ................................ 000140
00000000 00000000 00000000 00000000 00000000 00000000 00000000 00000000 ................................ 000160
00000000 00000000 00000000 00000000 00000000 00000000 00000000 00000000 ................................ 000180
00000000 00000000 00000000 00000000 00000000 00000000 00000000 00000000 ................................ 0001A0
00000000 00000000 00000000 00000000 00000000 00000000 00000000 00000000 ................................ 0001C0
00000000 00000000 00000000 00000000 00000000 00000000 00000000 00000000 ................................ 0001E0

Dump of file SATURN:[PCCOMMON.DUMP.DLL]PDLSYN.TMP;1 on 18-APR-1990 10:48:45.27
File ID (771,27,0)   End of file block 276 / Allocated 276
```

```
Virtual block number 196 (000000C4), 512 (0200) bytes

00000000 00000000 00000000 00000000 00000000 00000000 00000000 00000000 ................................ 000000
00000000 00000000 00000000 00000000 00000000 00000000 00000000 00000000 ................................ 000020
00000000 00000000 00000000 00000000 00000000 00000000 00000000 00000000 ................................ 000040
00000000 00000000 00000000 00000000 00000000 00000000 00000000 00000000 ................................ 000060
00000000 00000000 00000000 00000000 00000000 00000000 00000000 00000000 ................................ 000080
00000000 00000000 00000000 00000000 00000000 00000000 00000000 00000000 ................................ 0000A0
00000000 00000000 00000000 00000000 00000000 00000000 00000000 00000000 ................................ 0000C0
00000000 00000000 00000000 00000000 00000000 00000000 00000000 00000079 y............................... 0000E0
00000000 00000000 00000000 00000000 00000000 00000000 00000000 00000000 ................................ 000100
00000000 00000000 00000000 00000000 00000000 00000000 00000000 00000000 ................................ 000120
00000000 00000000 00000000 00000000 00000000 00000000 00000000 0000007A z............................... 000140
00000000 00000000 00000000 00000000 00000000 00000000 00000000 00000000 ................................ 000160
00000000 00000000 00000000 00000000 00000000 00000000 00000000 00000000 ................................ 000180
00000000 00000000 00000000 00000000 00000000 00000000 00000000 00000000 ................................ 0001A0
00000000 00000000 00000000 00000000 00000000 00000000 00000000 00000000 ................................ 0001C0
00000000 00000000 007A0000 00000000 0000007A 00000000 00000000 00000000 ............z.........z......... 0001E0

Dump of file SATURN:[PCCOMMON.DUMP.DLL]PDLSYN.TMP;1 on 18-APR-1990 10:48:45.27
File ID (771,27,0)   End of file block 276 / Allocated 276

Virtual block number 197 (000000C5), 512 (0200) bytes

00000000 00000000 00000000 00000000 00000000 00000000 00000000 007A0000 ..z............................. 000000
00000000 00000000 00000000 00000000 007A0000 00000000 00000000 00000000 ..............z................. 000020
00000000 00000000 00000000 00000000 00000000 00000000 00000000 00000000 ................................ 000040
00000000 00000000 00000000 00000000 00000000 00000000 00000000 00000000 ................................ 000060
00000000 00000000 00000000 00000000 00000000 00000000 00000000 00000000 ................................ 000080
00000000 00000000 00000000 00000000 00000000 00000000 00000000 00000000 ................................ 0000A0
00000000 00000000 00000000 00000000 00000000 00000000 00000000 00000000 ................................ 0000C0
00000000 00000000 00000000 00000000 00000000 00000000 00000000 00000000 ................................ 0000E0
00000000 00000000 00000000 00000000 00000000 00000000 00000000 00000000 ................................ 000100
00000000 00000000 00000000 00000000 00000000 00000000 00000000 00000000 ................................ 000120
00000000 00000000 00000000 00000000 00000000 00000000 00000000 00000000 ................................ 000140
00000000 00000000 00000000 00000000 00000000 00000000 00000000 00000000 ................................ 000160
00000000 00000000 00000000 00000000 00000000 00000000 00000000 00000000 ................................ 000180
00000000 00000000 00000000 00000000 00000000 00000000 00000000 00000000 ................................ 0001A0
00000000 00000000 00000000 00000000 00000000 00000000 00000000 0000005B [............................... 0001C0
00000000 00000000 00000000 00000000 00000000 00000000 00000000 00000000 ................................ 0001E0

Dump of file SATURN:[PCCOMMON.DUMP.DLL]PDLSYN.TMP;1 on 18-APR-1990 10:48:45.27
File ID (771,27,0)   End of file block 276 / Allocated 276

Virtual block number 198 (000000C6), 512 (0200) bytes

00000000 00000000 00000000 00000000 00000000 00000000 00000000 00000000 ................................ 000000
00000000 00000000 00000000 00000000 00000000 00000000 00000000 00000000 ................................ 000020
00000000 00000000 00000000 00000000 00000000 00000000 00000000 00000000 ................................ 000040
00000000 00000000 00000000 00000000 00000000 00000000 00000000 00000000 ................................ 000060
00000000 00000000 00000000 00000000 00000000 00000000 00000000 00000000 ................................ 000080
00000000 00000000 00000000 00000000 00000000 00000000 00000000 00000000 ................................ 0000A0
00000000 00000000 00000000 00000000 00000000 00000000 00000000 00000000 ................................ 0000C0
00000000 00000000 00000000 00000000 00000000 00000000 00000000 00000000 ................................ 0000E0
00000000 00000000 00000000 00000000 005C0000 00000000 00000000 00000000 ..............\................. 000100
00000000 00000000 00000000 00000000 00000000 00000000 00000000 00000000 ................................ 000120
00000000 00000000 00000000 00000000 00000000 00000000 00000000 00000000 ................................ 000140
00000000 00000000 00000000 00000000 00000000 00000000 00000000 00000000 ................................ 000160
00000000 00000000 00000000 00000000 00000000 00000000 00000000 00000000 ................................ 000180
00000000 00000000 00000000 00000000 00000000 00000000 00000000 00000000 ................................ 0001A0
00000000 00000000 00000000 00000000 00000000 00000000 00000000 00000000 ................................ 0001C0
00000000 00000000 00000000 00000000 00000000 00000000 00000000 00000000 ................................ 0001E0

Dump of file SATURN:[PCCOMMON.DUMP.DLL]PDLSYN.TMP;1 on 18-APR-1990 10:48:45.27
File ID (771,27,0)   End of file block 276 / Allocated 276
```

```
Virtual block number 199 (000000C7), 512 (0200) bytes

 00000000 00000000 00000000 00000000 00000000 00000000 00000000 00000000 ................................ 000000
 00000000 00000000 00000000 00000000 00000000 00000000 00000000 00000000 ................................ 000020
 00000000 00000000 00000000 00000000 00000000 00000000 00000000 00000000 ................................ 000040
 00000000 00000000 00000000 00000000 00000000 00000000 00000000 00000000 ................................ 000060
 000000F5 00000000 00000000 00000000 00000000 00000000 000000F5 00000000 ....¥.......................¥... 000080
 000000F2 00000000 00000000 00000000 00000000 000000F5 00000000 000000F5 ¥.......¥...................'... 0000A0
 00000000 00000000 00000000 00000000 00000000 00000000 00000000 00000000 ................................ 0000C0
 00000000 00F500F5 00000000 00000000 00000000 00000000 00F50000 00000000 ......¥.................¥.¥..... 0000E0
 00000000 00000000 00000000 00000000 00F50000 000000F3 00000000 00F500F5 ¥.¥.....µ.....¥................. 000100
 00000000 000000F5 00000000 00F50000 00000000 00F50000 000000F5 00000000 ....¥.....¥.......¥.....¥....... 000120
 00000000 000000F5 00F500F5 00000000 00000000 00000000 000000F5 000000F1 þ...¥...............¥.¥.¥....... 000140
 00000000 00F50000 00000000 000000F4 00000000 00000000 000000F5 00000000 ....¥...........¶.........¥..... 000160
 00000000 00000000 00000000 00000000 00000000 00000000 00000000 00000000 ................................ 000180
 00000000 00000000 00F50000 00000000 000000F5 000000F5 000000F5 00F500F5 ¥.¥.¥...¥...¥.........¥......... 0001A0
 00000000 00000000 00000000 00000000 00000000 00000000 000000F5 00F500F5 ¥.¥.¥........................... 0001C0
 00000000 00000000 00000000 00000000 00F50000 000000F5 00000000 00000000 ........¥.....¥................. 0001E0

Dump of file SATURN:[PCCOMMON.DUMP.DLL]PDLSYN.TMP;1 on 18-APR-1990 10:48:45.27
File ID (771,27,0)    End of file block 276 / Allocated 276

Virtual block number 200 (000000C8), 512 (0200) bytes

 00000000 00000000 00000000 00000000 00000000 00000000 00000000 00000000 ................................ 000000
 00000000 00000000 00000000 00000000 00000000 00000000 00000000 00000000 ................................ 000020
 00000000 00000000 00000000 00000000 00000000 00000000 00000000 00000000 ................................ 000040
 00000000 00000000 00000000 00000075 00000000 00000000 00000000 00000000 ................u............... 000060
 00000000 00000000 00000000 00000000 00000000 00000000 00000000 00000000 ................................ 000080
 00000000 00000000 00000000 00000000 00000000 00000000 00000000 00000000 ................................ 0000A0
 00000000 00000000 00000000 00000000 00000000 00000000 00740000 00000000 ......t......................... 0000C0
 00000000 00000000 00000000 30000000 00000000 00000000 00000000 00000000 ................................ 0000E0
 00000075 00000000 00000000 00000000 00000000 00000000 00000000 00000000 ............................u... 000100
 00000000 00000000 00000000 00750000 00000000 00000000 00750000 00000000 ......u...........u............. 000120
 00750000 00000000 00000000 00000000 00000000 00000000 00000000 00000000 ..............................u. 000140
 000000DB 00000000 00000000 00000000 00000000 00000000 00000000 00000000 ............................Û... 000160
 00000000 00000000 00000000 00000000 00000000 00000000 00000000 000000DB Û............................... 000180
 00000000 00000000 00000000 00000000 00000000 00000000 00000000 00000000 ................................ 0001A0
 00000000 000000DB 00000000 00000000 00000000 00000000 00000000 00000000 ........................Û....... 0001C0
 00000000 00000000 00000000 00000000 00DB0000 00000000 00000000 000000DB Û.............Û................. 0001E0

Dump of file SATURN:[PCCOMMON.DUMP.DLL]PDLSYN.TMP;1 on 18-APR-1990 10:48:45.27
File ID (771,27,0)    End of file block 276 / Allocated 276

Virtual block number 201 (000000C9), 512 (0200) bytes

 00000000 000000DB 00000000 00000000 00000000 00000000 00000000 00000000 ........................Û....... 000000
 00000000 000000DB 00DB00DA 00000000 00000000 00000000 00000000 00000000 ....................Ú.Û.Û....... 000020
 00000000 00DB0000 00000000 00000000 00000000 00000000 00000000 00000000 ..........................Û..... 000040
 00000000 00000000 00000000 00000000 00000000 00000000 00000000 00000000 ................................ 000060
 00000000 00000000 00DB0000 00000000 000000DB 000000DB 000000DB 00DB00DB Û.Û.Û...Û...Û.........Û......... 000080
 00000000 00000000 00000000 00000000 00000000 00000000 000000DB 00DB00DB Û.Û.Û........................... 0000A0
 00000000 00000000 00000000 00000000 00DB0000 000000DB 00000000 00000000 ........Û.....Û................. 0000C0
 00000000 00000000 00000000 00000000 00000000 00000000 00000000 00000000 ................................ 0000E0
 00000000 00000000 00000000 00000000 00000000 00000000 00000000 00000000 ................................ 000100
 00000000 00000000 00000000 00000000 00000000 00000000 00000000 00000000 ................................ 000120
 00000000 00000000 00000000 00000000 00000000 00000000 00000000 00000000 ................................ 000140
 00000000 00000000 00000000 00000000 00000000 00000000 00000000 00000000 ................................ 000160
 00000000 00000000 00000000 00000000 00000000 00000000 00000000 00000000 ................................ 000180
 00000000 00000000 00000000 00000000 00000000 00000000 00000000 00000000 ................................ 0001A0
 00000000 00000000 00000000 00000000 00000000 00000000 00000000 00000000 ................................ 0001C0
 00000000 00000000 00000000 00000000 00000000 00000000 00000000 00000000 ................................ 0001E0

Dump of file SATURN:[PCCOMMON.DUMP.DLL]PDLSYN.TMP;1 on 18-APR-1990 10:48:45.27
File ID (771,27,0)    End of file block 276 / Allocated 276
```

```
Virtual block number 202 (000000CA), 512 (0200) bytes

00000000 00000000 00000000 00000000 00000000 00000000 00000000 00000000 ................................ 000000
00000000 00000000 00000000 00000000 00000000 00000000 00000000 00000000 ................................ 000020
00000000 00000000 00000000 00000000 00000000 00000000 00000000 00000000 ................................ 000040
00000000 00000000 00000000 00000000 00000000 00000000 00000000 00000000 ................................ 000060
00000000 00000000 00000000 00000000 00000000 00000000 00000000 00000000 ................................ 000080
00000000 00000000 00000000 00000000 00000000 00000000 00000000 00000000 ................................ 0000A0
00000000 00000000 00000000 00000000 00000000 00000000 00000000 00000000 ................................ 0000C0
00000000 00000112 00000000 00000000 00000000 00000000 00000000 00000000 ................................ 0000E0
00000000 00000111 00000000 00000000 00000000 00000000 00000000 00000000 ................................ 000100
00000000 01120000 00000000 00000000 00000000 00000000 00000000 00000000 ................................ 000120
00000000 00000000 00000000 00000000 00000000 00000000 00000000 00000000 ................................ 000140
00000000 00000000 00000000 00000000 00000000 00000000 00000000 00000000 ................................ 000160
00000000 00000000 00000000 00000000 00000000 00000000 00000000 00000000 ................................ 000180
00000000 00000000 00000000 00000000 01120000 00000000 00000000 00000000 ................................ 0001A0
00000000 00000000 00000000 00000000 00000000 00000000 00000000 00000000 ................................ 0001C0
00000000 00000000 00000000 00000000 00000000 00000000 00000000 00000000 ................................ 0001E0

Dump of file SATURN:[PCCOMMON.DUMP.DLL]PDLSYN.TMP;1 on 18-APR-1990 10:48:45.27
File ID (771,27,0)   End of file block 276 / Allocated 276

Virtual block number 203 (000000CB), 512 (0200) bytes

00000000 00000000 00000000 00000000 00000000 00000000 00000000 00000000 ................................ 000000
00000000 00000000 00000000 00000000 00000000 00000000 00000000 00000000 ................................ 000020
00000000 00000000 00000000 00000000 00000000 00000000 00000000 00000000 ................................ 000040
00000000 00000000 00000000 00000000 00000000 00000045 00000000 00000000 ........E....................... 000060
00000000 00000000 00000000 00000000 00000000 00000044 00000000 00000000 ........D....................... 000080
00000000 00000000 00000000 00000000 00000000 00450000 00000000 00000000 ..........E..................... 0000A0
00000000 00000000 00000000 00000000 00000000 00000000 00000000 00000000 ................................ 0000C0
00000000 00000000 00000000 00000000 00000000 00000000 00000000 00000000 ................................ 0000E0
00450000 00000000 00000000 00000000 00000000 00000000 00000000 00000000 ..............................E. 000100
00000000 00000000 00000000 00000000 00000000 00000000 00000000 00000000 ................................ 000120
00000000 00000000 00000000 00000000 00000000 00000000 00000000 00000000 ................................ 000140
00000000 00000000 00000000 00000000 00000000 00000000 00000000 00000000 ................................ 000160
00000000 00000000 00000000 00000000 00000000 00000000 00000000 00000000 ................................ 000180
00000000 00000000 00000000 00000000 00000000 00000000 00000000 00000000 ................................ 0001A0
00000000 00000000 00000000 00000000 00000000 00000000 00000000 00000000 ................................ 0001C0
00000000 00000000 00000000 00000000 00000000 00000000 00000000 00000000 ................................ 0001E0

Dump of file SATURN:[PCCOMMON.DUMP.DLL]PDLSYN.TMP;1 on 18-APR-1990 10:48:45.27
File ID (771,27,0)   End of file block 276 / Allocated 276

Virtual block number 204 (000000CC), 512 (0200) bytes

00000000 00000000 00000000 00000000 00000000 00000000 00000000 00000000 ................................ 000000
00000000 00000000 00000000 00000000 00000000 00000000 00000000 00000000 ................................ 000020
00000000 00000000 00000000 00000000 00000000 00000000 00000000 00000000 ................................ 000040
00000000 00000000 00000000 00000000 00000000 00000000 00000000 00000000 ................................ 000060
00000000 00000000 000000EF 00000000 00000000 00000000 00000000 00000000 ....................ÿ........... 000080
00000000 000000EF 00000000 000000EF 000000EF 00000000 00000000 00000000 ............ÿ...ÿ.......ÿ....... 0000A0
00000000 00000000 00000000 00000000 00000000 00000000 00000000 00000000 ................................ 0000C0
00000000 00000000 00EF0000 00000000 00000000 00000000 00000000 00000000 ......................ÿ......... 0000E0
00EF0000 00000000 00000000 00EF00EF 00000000 00EF00EF 00000000 00000000 ........ÿ.ÿ.....ÿ.ÿ...........ÿ. 000100
00000000 00EF0000 000000EF 00000000 00000000 00000000 00000000 00000000 ....................ÿ.....ÿ..... 000120
00000000 00000000 000000EF 00000000 00000000 000000EF 00000000 00EE0000 ..Ÿ.....ÿ...........ÿ........... 000140
00000000 00000000 000000ED 00000000 00000000 000000EF 00EF00EF 00000000 ....ÿ.ÿ.ÿ...........Ü........... 000160
00000000 00000000 00000000 00000000 00000000 00EF0000 00000000 00000000 ..........ÿ..................... 000180
000000EF 000000EF 000000EF 00EF00EF 00000000 00000000 00000000 00000000 ................ÿ.ÿ.ÿ...ÿ...ÿ... 0001A0
00000000 00000000 000000EF 00EF00EF 00000000 00000000 00EF0000 00000000 ......ÿ.........ÿ.ÿ.ÿ........... 0001C0
00EF0000 000000EF 00000000 00000000 00000000 00000000 00000000 00000000 ........................ÿ.....ÿ. 0001E0

Dump of file SATURN:[PCCOMMON.DUMP.DLL]PDLSYN.TMP;1 on 18-APR-1990 10:48:45.27
File ID (771,27,0)   End of file block 276 / Allocated 276
```

```
Virtual block number 205 (000000CD), 512 (0200) bytes

 000000F8 00000000 00000000 00000000 00000000 00000000 000000F8 00000000 ....½.......................½... 000000
 000000F8 00000000 00000000 00000000 00000000 000000F8 00000000 000000F8 ½.......½...................½... 000020
 00000000 00000000 00000000 00000000 00000000 00000000 00000000 00000000 ................................ 000040
 00000000 00F800F8 00000000 00000000 00000000 00000000 00F80000 00000000 ......½.................½.½..... 000060
 00000000 00000000 00000000 00000000 00F80000 000000F8 00000000 00F800F8 ½.½.....½.....½................. 000080
 00000000 000000F8 00000000 00F80000 00000000 00F80000 000000F8 00000000 ....½.....½.......½.....½....... 0000A0
 00000000 000000F8 00F800F8 00000000 00000000 00000000 000000F8 000000F8 ½...½...............½.½.½....... 0000C0
 00000000 00F80000 00000000 000000F8 00000000 00000000 00F700F8 00000000 ....½.¾.........½.........½..... 0000E0
 00000000 00000000 00000000 00000000 00000000 00000000 00000000 00000000 ................................ 000100
 00000000 00000000 00F80000 00000000 000000F8 000000F8 000000F8 00F800F8 ½.½.½...½...½.........½......... 000120
 00000000 00000000 00000000 00000000 00000000 00000000 000000F8 00F800F8 ½.½.½........................... 000140
 00000000 00000000 00000000 00000000 00F80000 000000F8 00000000 00000000 ........½.....½................. 000160
 00000000 00000000 00000000 00000000 00000000 00000000 00000000 00000000 ................................ 000180
 00000000 00000000 00000000 00000000 00000000 00000000 00000000 00000000 ................................ 0001A0
 00000000 00000000 00000000 00000000 00000000 00000000 00000000 00000000 ................................ 0001C0
 00000000 00000000 00000000 00000000 00000000 00000000 00000000 00000000 ................................ 0001E0

Dump of file SATURN:[PCCOMMON.DUMP.DLL]PDLSYN.TMP;1 on 18-APR-1990 10:48:45.27
File ID (771,27,0)   End of file block 276 / Allocated 276

Virtual block number 206 (000000CE), 512 (0200) bytes

 00000000 00000000 00000000 00C80000 00000000 00000000 00000000 00000000 ..................à............. 000000
 00000000 00000000 00000000 00000000 00000000 00000000 00000000 00000000 ................................ 000020
 00000000 000000C7 00000000 00000000 00000000 00000000 00000000 00000000 ........................ú....... 000040
 00000000 00000000 00000000 00000000 00000000 00000000 00000000 00000000 ................................ 000060
 00000000 00000000 00000000 00000000 00000000 00000000 00000000 00000000 ................................ 000080
 00000000 00000000 00000000 00000000 00000000 00000000 00000000 00000000 ................................ 0000A0
 00C80000 00000000 00000000 00000000 00000000 00000000 00000000 00000000 ..............................à. 0000C0
 000000EB 00000000 00000000 00000000 00000000 00000000 000000EB 00000000 ....Š.......................Š... 0000E0
 00000000 00000000 00000000 00000000 00000000 000000EB 00000000 000000EB Š.......Š....................... 000100
 00000000 00000000 00000000 00000000 00000000 00000000 00000000 00000000 ................................ 000120
 00000000 00E900EB 00000000 00000000 00000000 00000000 00EB0000 00000000 ......Š.................Š.Ö..... 000140
 00000000 00000000 00000000 00000000 00EB0000 00000000 00000000 00E800EB Š.Ö...........Š................. 000160
 00000000 000000EB 00000000 00000000 00000000 00E70000 000000EA 00000000 ....ō.....Ó.............Š....... 000180
 00000000 000000EB 00EB00EB 00000000 00000000 00000000 000000EB 00000000 ....Š...............Š.Š.Š....... 0001A0
 00000000 00EB0000 00000000 00000000 00000000 00000000 00000000 00000000 ..........................Š..... 0001C0
 00000000 00000000 00000000 00000000 00000000 00000000 00000000 00000000 ................................ 0001E0

Dump of file SATURN:[PCCOMMON.DUMP.DLL]PDLSYN.TMP;1 on 18-APR-1990 10:48:45.27
File ID (771,27,0)   End of file block 276 / Allocated 276

Virtual block number 207 (000000CF), 512 (0200) bytes

 00000000 00000000 00EB0000 00000000 000000EB 000000EB 000000EB 00EB00EB Š.Š.Š...Š...Š.........Š......... 000000
 00000000 00000000 00000000 00000000 00000000 00000000 000000EB 00EB00EB Š.Š.Š........................... 000020
 00000000 00000000 00000000 00000000 00EB0000 000000EB 00000000 00000000 ........Š.....Š................. 000040
 00000000 00000000 00000000 00000000 00000000 00000000 00000000 00000000 ................................ 000060
 00000000 00000000 00000000 00000000 00000000 00000000 00000000 00000000 ................................ 000080
 00000000 00000000 00000000 00000000 00000000 00000000 00000000 00000000 ................................ 0000A0
 00960000 00000000 00000000 00000000 00000000 00000000 00000000 00000000 ................................ 0000C0
 00000000 00000000 00000000 00000000 00000000 00000000 00000000 00000000 ................................ 0000E0
 00000000 00000000 00000000 00000000 00000000 00000000 00000000 00000000 ................................ 000100
 00000000 00000000 00000000 00000000 00000000 00000000 00000000 00000000 ................................ 000120
 00000000 00000000 00950000 00000000 00000000 00000000 00000000 00000000 ................................ 000140
 00000000 00000000 00000000 00000096 00000000 00000000 00000000 00000000 ................................ 000160
 00000000 00000000 00000000 00000096 00000000 00000000 00000000 00000000 ................................ 000180
 00960000 00000000 00000000 00000000 00000000 00000000 00000000 00000000 ................................ 0001A0
 00000000 00000000 00000000 00000000 00000000 00000000 00000000 00000000 ................................ 0001C0
 00000000 00000000 00000000 00000000 00000000 00000000 00000000 00000000 ................................ 0001E0

Dump of file SATURN:[PCCOMMON.DUMP.DLL]PDLSYN.TMP;1 on 18-APR-1990 10:48:45.27
File ID (771,27,0)   End of file block 276 / Allocated 276
```

```
Virtual block number 208 (00000000), 512 (0200) bytes

00000000 00000000 00000000 00000000 00000000 00000000 00000000 00000000 ................................ 000000
00000000 0000004D 00000000 00000000 00000000 00000000 00000000 00000000 ........................M....... 000020
00000000 00000000 00000000 00000000 004D0000 00000000 00000000 0000004D M.............M................. 000040
00000000 00000000 00000000 00000000 00000000 00000000 00000000 00000000 ................................ 000060
00000000 00000000 004D0000 00000000 00000000 00000000 00000000 00000000 ......................M......... 000080
00000000 00000000 00000000 00000000 00000000 00000000 00000000 00000000 ................................ 0000A0
00000000 00000000 00000000 00000000 00000000 00000000 00000000 00000000 ................................ 0000C0
00000000 00000000 004D0000 00000000 00000000 0000004D 0000004D 0000004C L...M...M.............M......... 0000E0
00000000 00000000 00000000 00000000 00000000 00000000 00000000 0000004D M............................... 000100
00000000 00000000 00000000 00000000 004D0000 00000000 00000000 00000000 ..............M................. 000120
00000000 00000000 00000000 00000000 00000000 00000000 00000000 00000000 ................................ 000140
00000000 00000000 00000000 00000000 00000000 00000000 00000000 00000000 ................................ 000160
00000000 00000000 00000000 00000000 00000000 00000000 00000000 00000000 ................................ 000180
00000000 00000000 00000000 00000000 00000000 00000000 00000000 00000000 ................................ 0001A0
00000000 00000000 00000000 00000000 00000000 00000000 00000000 00000000 ................................ 0001C0
00000000 00000000 00000000 00000000 00000000 00000000 00000000 00000000 ................................ 0001E0

Dump of file SATURN:[PCCOMMON.DUMP.DLL]PDLSYN.TMP;1 on 18-APR-1990 10:48:45.27
File ID (771,27,0)   End of file block 276 / Allocated 276

Virtual block number 209 (00000001), 512 (0200) bytes

00000000 00000000 00000000 00000000 00000000 00000000 00000000 00000000 ................................ 000000
00000000 00000000 00000000 00000000 00000000 00000000 00000000 00000000 ................................ 000020
00000000 00000000 00000053 00000000 00000000 00000000 00000000 00000000 ....................S........... 000040
00000000 00000000 00000000 00000000 00000000 00000000 00000000 00000000 ................................ 000060
00540000 00000000 00000000 00000000 00000000 00000000 00000000 00000000 ..............................T. 000080
00000000 00000000 00000000 00000000 00000000 00000000 00000000 00000000 ................................ 0000A0
00000000 00000000 00000000 00000000 00000000 00000000 00000000 00000000 ................................ 0000C0
00000000 00000000 00000000 00000000 00000000 00000000 00000000 00000000 ................................ 0000E0
00000000 00000000 00000000 00000000 00000000 00000000 00000000 00000000 ................................ 000100
00000000 00000000 00000000 00000000 00000000 00000000 00000000 00000000 ................................ 000120
00000000 00000000 00000000 00000000 00000000 00000000 00000000 00000000 ................................ 000140
00000000 00000000 00000000 00000000 00000000 00000000 00000000 00000000 ................................ 000160
00000000 00000000 00000000 00000000 00000000 00000000 00000000 00000000 ................................ 000180
00000000 00000000 00000000 00000000 00000000 00000000 00000000 00000000 ................................ 0001A0
00000000 00000000 00000000 00000000 00000000 00000000 00390000 00000000 ......9......................... 0001C0
00000000 00000000 00000000 00000000 00000000 00000000 00000000 00000000 ................................ 0001E0

Dump of file SATURN:[PCCOMMON.DUMP.DLL]PDLSYN.TMP;1 on 18-APR-1990 10:48:45.27
File ID (771,27,0)   End of file block 276 / Allocated 276

Virtual block number 210 (00000002), 512 (0200) bytes

00000000 00000000 00000000 00000000 003A0000 00000000 00000000 00000000 ..............:................. 000000
00000000 00000000 00000000 00000000 00000000 00000000 00000000 00000000 ................................ 000020
00000000 00000000 00000000 00000000 00000000 00000000 00000000 00000000 ................................ 000040
00000000 00000000 00000000 00000000 00000000 00000000 00000000 00000000 ................................ 000060
00000000 00000000 00000000 00000082 00000000 00000000 00000000 00000000 ................................ 000080
00000000 00000000 00000000 00000000 00000000 00000000 00000000 00000000 ................................ 0000A0
00000000 00000000 00000000 00000000 00000000 00000000 00000000 00000000 ................................ 0000C0
00000000 00000000 00000000 00000000 00000000 00000000 00820000 00000000 ................................ 0000E0
00000000 00000000 00000000 00000000 00000000 00000000 00000000 00000000 ................................ 000100
00000000 00000081 00000000 00000000 00000000 00000000 00000000 00000000 ................................ 000120
00000000 00000000 00000000 00000000 00000000 00000000 00820000 00000000 ................................ 000140
00820000 00000000 00000000 00000000 00000000 00000000 00000000 00000000 ................................ 000160
00000100 00000000 00000000 00000000 00000000 00000000 00000100 00000000 ................................ 000180
00000100 00000100 00000000 00000000 00000000 00000100 00000000 00000100 ................................ 0001A0
00000000 00000000 00000000 00000000 00000000 00000000 00000000 010C0000 ................................ 0001C0
00000000 01000100 00000000 00000000 00000000 00000000 01000000 00000000 ................................ 0001E0

Dump of file SATURN:[PCCOMMON.DUMP.DLL]PDLSYN.TMP;1 on 18-APR-1990 10:48:45.27
File ID (771,27,0)   End of file block 276 / Allocated 276
```

```
Virtual block number 211 (00000003), 512 (0200) bytes

 00000000 00000000 00000000 00000000 01000000 00000100 00000100 01000100 ................................ 000000
 00000000 00000100 00000000 01000000 00000000 01000000 00000100 00000000 ................................ 000020
 00000000 00000100 01000100 00000000 00000000 00000000 00000100 00000100 ................................ 000040
 00000000 01000000 00000000 00000100 00000000 00000000 01000100 00000000 ................................ 000060
 00000000 00000000 00000000 00000000 00000000 00000000 00000000 00000000 ................................ 000080
 00000000 00000000 01000000 00000000 00000100 00000100 00000100 01000100 ................................ 0000A0
 00000000 00000000 00000000 00000000 00000000 00000000 00000100 01000100 ................................ 0000C0
 00000000 00000000 00000000 00000000 01000000 00000100 01000000 00000000 ................................ 0000E0
 00000000 00000000 00000000 00000000 00000000 00000000 00000000 00000000 ................................ 000100
 00000000 00000000 00000000 00000000 00000000 00000000 00000000 00000000 ................................ 000120
 00000000 00000000 00000000 00000000 00000000 00000000 00000000 00000000 ................................ 000140
 00000000 00000000 00000000 00000000 00000000 00000000 00000000 00000000 ................................ 000160
 00000000 00000000 00000000 00000000 00000000 00000000 00000000 00000000 ................................ 000180
 00000000 00000000 00000000 00000000 00000000 00000000 00000000 00000000 ................................ 0001A0
 00000000 00000000 00000000 00000000 00000000 00000000 00000000 00000000 ................................ 0001C0
 00000000 00000000 00000000 00000000 00000000 00000000 00000000 00000000 ................................ 0001E0

Dump of file SATURN:[PCCOMMON.DUMP.DLL]PDLSYN.TMP;1 on 18-APR-1990 10:48:45.27
File ID (771,27,0)   End of file block 276 / Allocated 276

Virtual block number 212 (00000004), 512 (0200) bytes

 00000000 00000000 00000000 00000000 00000000 00000000 00000000 00000000 ................................ 000000
 00000000 00000000 00000000 00000000 00000000 00000000 00000000 00000000 ................................ 000020
 00000000 00000000 00000000 00000000 00000000 00000000 00000000 00000000 ................................ 000040
 00000000 00000000 00000000 00000000 00000000 00000000 00000000 00000000 ................................ 000060
 00000000 00000000 00000000 00000000 00000000 00000000 00000000 00000000 ................................ 000080
 00000000 00000000 00000000 00000000 00000000 00000000 00000000 00000000 ................................ 0000A0
 00000000 0000005E 00000000 00000000 00000000 00000000 00000000 00000000 ........................^....... 0000C0
 00000000 00000000 00000000 00000000 00000000 00000000 00000000 0000005E ^............................... 0000E0
 00000000 00000000 00000000 00000000 00000000 00000000 00000000 00000000 ................................ 000100
 00000000 00000000 005E0000 00000000 00000000 00000000 00000000 00000000 ......................^......... 000120
 00000000 00000000 00000000 00000000 00000000 00000000 00000000 00000000 ................................ 000140
 00000000 00000000 00000000 00000000 00000000 00000000 00000000 00000000 ................................ 000160
 00000000 00000000 005E0000 00000000 0000005E 0000005E 0000005E 0000005E ^...^...^...^.........^......... 000180
 00000000 00000000 00000000 00000000 00000000 00000000 0000005E 005E005D ].^.^........................... 0001A0
 00000000 008C008C 00000000 008C0000 005E0000 00000000 00000000 00000000 ..............^................. 0001C0
 008C0000 00000000 0000008C 00000000 008C0000 00000000 0000008C 008C0000 ................................ 0001E0

Dump of file SATURN:[PCCOMMON.DUMP.DLL]PDLSYN.TMP;1 on 18-APR-1990 10:48:45.27
File ID (771,27,0)   End of file block 276 / Allocated 276

Virtual block number 213 (00000005), 512 (0200) bytes

 00000000 00000000 00000000 00000000 00000000 00000000 0000008C 008C008C ................................ 000000
 008C0000 00000000 0000008C 0000008C 00000000 00000000 00000000 00000000 ................................ 000020
 00000000 00000000 008C0000 00000000 0000008C 00000000 00000000 0000008C ................................ 000040
 008C008C 00000000 008C0000 008C0000 00000000 00000000 00000000 00000000 ................................ 000060
 0000008C 00000000 008C0000 008C008C 0000008C 00000000 0000008C 0000008C ................................ 000080
 00000000 00000000 00000000 0000008C 00000000 00000000 00000000 00000000 ................................ 0000A0
 008C008C 00000000 00000000 0000008C 008C008C 00000000 00000000 008C0000 ................................ 0000C0
 00000000 00000000 00000000 00000000 0000008C 008C008C 008C008C 008C008C ................................ 0000E0
 00000000 00000000 008C0000 00000000 00000000 008C008C 0000008C 0000008C ................................ 000100
 00000000 00000000 00000000 00000000 00000000 00000000 00000000 00000000 ................................ 000120
 008A0000 00000000 0000008A 008A0000 00000000 008A008A 00000000 008A0000 ................................ 000140
 00000000 00000000 0000008A 008A008A 008A0000 00000000 0000008A 00000000 ................................ 000160
 00000000 00000000 00000000 00000000 00000000 00000000 00000000 00000000 ................................ 000180
 0000008A 00000000 00000000 0000008A 008A0000 00000000 0000008A 0000008A ................................ 0001A0
 00000000 00000000 00000000 00000000 00000000 00000000 008A0000 00000000 ................................ 0001C0
 0000008A 00000000 0000008A 0000008A 008A008A 00000000 008A0000 008A0000 ................................ 0001E0

Dump of file SATURN:[PCCOMMON.DUMP.DLL]PDLSYN.TMP;1 on 18-APR-1990 10:48:45.27
File ID (771,27,0)   End of file block 276 / Allocated 276
```

```
Virtual block number 214 (00000006), 512 (0200) bytes

 00000000 00000000 00000000 00000000 0000008A 00000000 008A0000 008A008A ................................ 000000
 008A008A 00880000 00000000 008A0000 00000000 00000000 00000000 0000008A ................................ 000020
 0000008A 008A008A 008A008A 008A008A 008A008A 00000000 00000000 0000008A ................................ 000040
 00000000 008A008A 0000008A 0000008A 00000000 00000000 00000000 00000000 ................................ 000060
 00000000 00000000 00000000 00000000 00000000 00000000 008A0000 00000000 ................................ 000080
 00000000 00000000 00000000 00000000 00880000 00000000 00000000 00000000 ................................ 0000A0
 00000000 00000000 00000000 0000008D 00000000 00000000 00000000 00000000 ................................ 0000C0
 00000000 00000000 00000000 00000000 00000000 00000000 00000000 00000000 ................................ 0000E0
 00000000 00000000 00000000 00000000 00000000 00000000 00000000 00000000 ................................ 000100
 008E0000 00000000 00000000 0000008E 00000000 0000008E 00000000 00000000 ................................ 000120
 00000000 00000000 00000000 00000000 00000000 00000000 00000000 00000000 ................................ 000140
 00000000 00000000 00000000 00000000 00000000 0000008E 00000000 00000000 ................................ 000160
 00000000 00000000 00000000 00000000 00000000 0000008E 008E0000 00000000 ................................ 000180
 00000000 00000000 00000000 00000000 00000000 008E0000 00000000 00000000 ................................ 0001A0
 00000000 0000008E 00000000 0000008E 00000000 00000000 00000000 00000000 ................................ 0001C0
 00000000 00000000 00000000 0000008E 00000000 00000000 008E0000 00000000 ................................ 0001E0

Dump of file SATURN:[PCCOMMON.DUMP.DLL]PDLSYN.TMP;1 on 18-APR-1990 10:48:45.27
File ID (771,27,0)   End of file block 276 / Allocated 276

Virtual block number 215 (00000007), 512 (0200) bytes

 008E0000 0000008E 00000000 00000000 00000000 00000000 00000000 00000000 ................................ 000000
 00000000 00000000 00000000 00000000 00000000 00000106 00000000 00000000 ................................ 000020
 00000000 00000000 00000000 00000000 00000000 00000000 00000000 00000000 ................................ 000040
 00000000 00000000 00000000 00000000 00000000 00000000 00000000 00000000 ................................ 000060
 00000106 00000000 00000000 00000000 00000000 00000000 00000106 00000000 ................................ 000080
 00000000 00000000 00000000 00000000 00000000 00000000 00000000 00000000 ................................ 0000A0
 00000000 00000000 00000000 00000000 00000000 00000000 00000000 00000000 ................................ 0000C0
 00000000 00000000 00000000 00000000 00000000 00000000 00000000 00000106 ................................ 0000E0
 00000000 00000000 00000000 00000000 00000000 00000000 00000000 00000000 ................................ 000100
 00000000 00000000 00000000 00000000 00000000 00000000 00000000 00000000 ................................ 000120
 00000000 00000000 00000000 00000000 00000000 00000000 00000000 00000000 ................................ 000140
 00000000 00000000 00000000 00000000 00000000 00000000 00000000 00000000 ................................ 000160
 00000000 00000000 00000000 00000000 00000000 00000000 00000000 00000000 ................................ 000180
 00000000 00000000 00000000 00000107 00000000 00000000 00000000 00000000 ................................ 0001A0
 00000000 00000000 00000000 00000000 00000000 00000000 00000000 00000000 ................................ 0001C0
 00000000 00000000 00000000 00000000 00000000 00000000 00000000 00000000 ................................ 0001E0

Dump of file SATURN:[PCCOMMON.DUMP.DLL]PDLSYN.TMP;1 on 18-APR-1990 10:48:45.27
File ID (771,27,0)   End of file block 276 / Allocated 276

Virtual block number 216 (00000008), 512 (0200) bytes

 01080000 00000000 00000000 00000000 00000000 00000108 00000000 00000000 ................................ 000000
 00000000 00000000 00000000 00000000 00000000 00000000 00000000 00000000 ................................ 000020
 00000000 00000000 00000000 00000000 00000000 00000108 00000000 00000000 ................................ 000040
 00000000 00000000 00000000 00000000 00000000 00000000 00000000 00000000 ................................ 000060
 00000000 00000000 00000000 00000000 00000000 01080000 00000000 00000000 ................................ 000080
 00000000 00000000 00000108 00000108 00000000 00000000 00000000 00000000 ................................ 0000A0
 00000000 00000000 00000000 00000108 00000000 00000000 00000000 00000000 ................................ 0000C0
 01080000 00000000 01080000 00000000 00000000 00000000 00000000 00000000 ................................ 0000E0
 00000000 00000000 00000000 00000000 00000000 00000000 00000000 00000000 ................................ 000100
 00000000 00000000 00000000 00000000 00000000 00000000 00000000 00000000 ................................ 000120
 00000000 00000000 00000000 00000000 00000000 00000000 00000000 00000000 ................................ 000140
 00000000 00000000 00000000 00000000 00000000 00000000 00000000 00000000 ................................ 000160
 00000000 00000000 00000000 00000000 00000000 00000000 00000000 00000000 ................................ 000180
 00000000 00000000 00000000 00000000 00000000 00000018 00000000 00000000 ................................ 0001A0
 00000000 00000000 00000000 00000000 00000000 00000000 00000000 00000000 ................................ 0001C0
 00000000 00000000 00000000 00000000 00000000 00000000 00000000 00000000 ................................ 0001E0

Dump of file SATURN:[PCCOMMON.DUMP.DLL]PDLSYN.TMP;1 on 18-APR-1990 10:48:45.27
File ID (771,27,0)   End of file block 276 / Allocated 276
```

```
Virtual block number 217 (000000D9), 512 (0200) bytes

 00000000 00000000 00000000 00000000 00000000 00000000 00000000 00000000 ................................ 000000
 00000000 00000000 00000000 00000000 00000000 00000000 00000000 00000000 ................................ 000020
 00000000 00000000 00000000 00000000 00000000 00000000 00000000 00000000 ................................ 000040
 00000000 00000000 00000000 00000000 00000000 00000000 00000000 00000000 ................................ 000060
 00000000 00000000 00000000 00000000 00000000 00000000 00000000 00000000 ................................ 000080
 00000000 00000000 00000000 00000000 00000000 00000000 00000000 00000000 ................................ 0000A0
 00000000 00000000 00000000 00000000 00000000 00000000 00000000 00000000 ................................ 0000C0
 00000000 00000000 00000000 00000000 00000000 00000000 00130000 00000000 ................................ 0000E0
 00000000 00000012 00000000 00000000 00000000 00000000 00000000 00000000 ................................ 000100
 00000000 00000000 00000000 00000000 00000000 00000000 00000000 00000000 ................................ 000120
 00000000 00000000 00000000 00000000 00000000 00000000 00000000 00000000 ................................ 000140
 00000000 00000000 00000000 00000000 00000000 00000000 00000000 00000000 ................................ 000160
 00000000 00000000 00000000 00000000 00000000 00000000 00000000 00000000 ................................ 000180
 00000000 00000000 00000000 00000000 00000000 00000000 00000000 00000000 ................................ 0001A0
 00000000 00000000 00000000 00000000 00000000 00000000 00000000 00000000 ................................ 0001C0
 00190000 00000000 00000019 00190000 00000000 00190019 00000000 00190000 ................................ 0001E0

Dump of file SATURN:[PCCOMMON.DUMP.DLL]PDLSYN.TMP;1 on 18-APR-1990 10:48:45.27
File ID (771,27,0)   End of file block 276 / Allocated 276

Virtual block number 218 (0000000A), 512 (0200) bytes

 00000000 00000000 00000019 00190019 00190000 00000000 00000019 00000000 ................................ 000000
 00000000 00000000 00000000 00000000 00000000 00000000 00000000 00000000 ................................ 000020
 00000019 00000000 00000000 00000019 00190000 00000000 00000019 00000019 ................................ 000040
 00000000 00000000 00000000 00000000 00000000 00000000 00190000 00000000 ................................ 000060
 00000019 00000000 00000019 00000019 00190019 00000000 00190000 00190000 ................................ 000080
 00000000 00000000 00000000 00000000 00000019 00000000 00190000 00190019 ................................ 0000A0
 00190019 00000000 00000000 00190000 00000000 00000000 00000000 00000019 ................................ 0000C0
 00000019 00190019 00190019 00190019 00190019 00000000 00000000 00000019 ................................ 0000E0
 00000000 00190019 00000019 00000019 0000001A 00000000 00000000 00000000 ................................ 000100
 00000000 00000000 00000000 00000000 00000000 00000000 00190000 001A0000 ................................ 000120
 00000000 00000000 00000000 00000000 001A0000 00000000 00000000 00000000 ................................ 000140
 00000000 00000000 00000000 00000000 00000000 00000000 00000000 00000000 ................................ 000160
 00000000 00000000 00000000 00000000 00000000 00000000 00000000 00000000 ................................ 000180
 00000000 00000000 00000000 00000000 00000000 00000000 00000000 00000000 ................................ 0001A0
 00000000 00000000 00000000 00000000 00000000 00000000 00000000 00000000 ................................ 0001C0
 00000000 00000000 00000000 00000000 00000000 00000000 00000000 00000000 ................................ 0001E0

Dump of file SATURN:[PCCOMMON.DUMP.DLL]PDLSYN.TMP;1 on 18-APR-1990 10:48:45.27
File ID (771,27,0)   End of file block 276 / Allocated 276

Virtual block number 219 (000000DB), 512 (0200) bytes

 00000000 00000000 00000000 00000000 00000000 00000000 00000000 00000000 ................................ 000000
 00000000 00000000 00000000 00000000 00000000 00000000 00000000 00000000 ................................ 000020
 00000000 00000000 00000000 00000000 00000000 00000000 00000000 00000000 ................................ 000040
 0000001D 00000000 00000000 00000000 00000000 00000000 00000000 00000000 ................................ 000060
 00000000 00000000 00000000 001C0000 00000000 00000000 00000000 00000000 ................................ 000080
 001D0000 00000000 00000000 00000000 00000000 00000000 00000000 00000000 ................................ 0000A0
 00000000 00000000 00000000 00000000 00000000 00000000 00000000 00000000 ................................ 0000C0
 00000000 00000000 00000000 00000000 00000000 00000000 00000000 00000000 ................................ 0000E0
 00000000 00000000 00000000 00000000 00000000 00000000 00000000 00000000 ................................ 000100
 00000000 00000000 00000000 00000000 00000000 00000000 00000000 00000000 ................................ 000120
 00000000 00000000 00000000 00000000 00000000 00000000 00000000 00000000 ................................ 000140
 00000000 00000000 00000000 00000000 00000000 00000000 00000000 00000000 ................................ 000160
 00000000 00000000 00000000 00000000 00000000 00000000 00000000 00000000 ................................ 000180
 00000000 00000000 00000000 00000000 00000000 00000000 00000000 00000000 ................................ 0001A0
 00000000 00000000 00000000 00000000 00000000 00000000 00000000 00000000 ................................ 0001C0
 00000000 00000000 00000000 00000000 0000001F 00000000 00000000 00000000 ................................ 0001E0

Dump of file SATURN:[PCCOMMON.DUMP.DLL]PDLSYN.TMP;1 on 18-APR-1990 10:48:45.27
File ID (771,27,0)   End of file block 276 / Allocated 276
```

```
Virtual block number 220 (000000DC), 512 (0200) bytes

00000000 00000000 00000000 00000000 00000000 00000000 00000000 00000000 ................................ 000000
00000000 00000000 00000000 00000000 00200000 00000000 00000000 00000000 ................................ 000020
00000000 00000000 00000000 00000000 00000000 00000000 00000000 00000000 ................................ 000040
00000000 00000000 00000000 00000000 00000000 00000000 00000000 00000000 ................................ 000060
00000000 00000000 00000000 00000000 00000000 00000000 00000000 00000000 ................................ 000080
00000000 00000000 00000000 00000000 00000000 00000000 00140000 00000000 ................................ 0000A0
00000000 00000000 00000000 00000000 00000000 00000000 00000000 00000000 ................................ 0000C0
00000000 00000000 00000000 00000000 00000000 00000000 00000000 00000000 ................................ 0000E0
00000000 00000000 00000000 00000000 00000000 00000000 00000000 00000000 ................................ 000100
00000000 00000000 00000000 00000000 00000000 00000000 00000000 00000000 ................................ 000120
00000000 00000000 00000000 00000000 00000000 00000000 00000000 00000000 ................................ 000140
00000000 00000000 00000000 00000000 00000000 00000000 00000000 00000000 ................................ 000160
00000000 00000000 00000000 00000000 00000000 00000000 00000000 00000000 ................................ 000180
00000000 00000000 00000000 00000000 00000000 00000000 00000000 00000000 ................................ 0001A0
00000000 00000000 00000000 00000000 00000000 00000000 00000000 00000000 ................................ 0001C0
00000000 00000000 00000000 00000000 00000000 00000000 00000000 00000000 ................................ 0001E0

Dump of file SATURN:[PCCOMMON.DUMP.DLL]PDLSYN.TMP;1 on 18-APR-1990 10:48:45.27
File ID (771,27,0)   End of file block 276 / Allocated 276

Virtual block number 221 (000000DD), 512 (0200) bytes

00000000 00000000 00000000 00000000 00000000 00000000 00000000 00000000 ................................ 000000
00000000 00000000 00000000 00000000 00000000 00000000 00000000 00000016 ................................ 000020
00000000 00000000 00000000 00000000 00000000 00000000 00000000 00000000 ................................ 000040
00000000 00000000 00160000 00000000 00000000 00000000 00000000 00000000 ................................ 000060
00000000 00000000 00000000 00000000 00000000 00000000 00000000 00000000 ................................ 000080
00000000 00000000 00000000 00000000 00000000 00000000 00000000 00000000 ................................ 0000A0
00000000 00000000 00000000 00000000 00000016 00000000 00000000 00000000 ................................ 0000C0
00000000 00000000 00000000 00000000 00000000 00000000 00000015 00160000 ................................ 0000E0
00000000 00000000 00000000 00000000 00160000 00000000 00000000 00000000 ................................ 000100
00000000 00000000 00000000 00000000 00000000 00000000 00000000 00000000 ................................ 000120
00000000 00000000 00000000 00000000 00000000 00000000 00000000 00000000 ................................ 000140
00000000 00000000 00000000 00000000 00000000 00000000 00000000 00000000 ................................ 000160
00000000 00000000 00000000 00000000 0000004E 00000000 0000004F 00000000 ....O.......N................... 000180
00000000 00000000 00000000 00000000 00000000 00000000 00000000 00000000 ................................ 0001A0
00000000 00000000 00000000 00000000 00000000 00000000 00000000 00000000 ................................ 0001C0
00000000 00000000 00000000 00000000 00000000 00000000 00000000 00000000 ................................ 0001E0

Dump of file SATURN:[PCCOMMON.DUMP.DLL]PDLSYN.TMP;1 on 18-APR-1990 10:48:45.27
File ID (771,27,0)   End of file block 276 / Allocated 276

Virtual block number 222 (000000DE), 512 (0200) bytes

00000000 00000000 00000000 00000000 00000000 00000000 00000000 00000000 ................................ 000000
00000000 00000000 00000000 00000000 00000000 00000000 00000000 00000000 ................................ 000020
00000000 00000000 00000000 00000000 00000000 00000000 00000000 00000000 ................................ 000040
00000000 00000000 00000000 00000000 00000000 00000000 00000000 00000000 ................................ 000060
00000000 00000000 00000000 00000000 00000000 00000000 00000000 00000000 ................................ 000080
00000000 00000000 00000000 00000000 00000000 00000000 00000000 00000000 ................................ 0000A0
00000000 00000000 00000000 00000000 00000000 00000000 00000000 00000000 ................................ 0000C0
00000057 00000000 00000000 00000000 00000000 00000000 00000000 00000000 ............................W... 0000E0
00000000 00000000 00000000 00000000 00000000 00000000 00000000 00000000 ................................ 000100
00000000 00000000 00000000 00000000 00000000 00000000 00000000 00000000 ................................ 000120
00000000 00000000 00000000 00000000 00000000 00000000 00000000 00000000 ................................ 000140
00000000 00000000 00000000 00000000 00000055 00000000 00000000 00000000 ............U................... 000160
00000000 00000000 00000000 00000000 00000000 00000000 00000000 00000000 ................................ 000180
00000000 00000000 00000000 00000000 00000000 00000000 00000000 00000000 ................................ 0001A0
00000000 00000000 00000000 00000000 00000000 00000056 00000000 00000000 ........V....................... 0001C0
00000000 00000000 00000000 00000000 00000000 00000000 00000000 00000000 ................................ 0001E0

Dump of file SATURN:[PCCOMMON.DUMP.DLL]PDLSYN.TMP;1 on 18-APR-1990 10:48:45.27
File ID (771,27,0)   End of file block 276 / Allocated 276
```

```
Virtual block number 223 (000000DF), 512 (0200) bytes

00000000 00000000 00000000 00000000 00000000 00000000 00000000 00000000 ................................ 000000
00000000 00000000 00000000 00000000 00000000 00000000 00000000 00000000 ................................ 000020
00000000 00000000 00000000 00000000 00000000 00000000 00000000 00000000 ................................ 000040
00000000 00000000 00000000 00000000 000000A7 00000000 00000000 00000000 ............I................... 000060
00000000 00000000 00000000 00000000 00000000 00000000 00000000 000000A6 I............................... 000080
00000000 00000000 00000000 00000000 00000000 00000000 00000000 00000000 ................................ 0000A0
00000000 00000000 00000000 00000000 00000000 00000000 00000000 00000000 ................................ 0000C0
00000000 00000000 00000000 00000000 00000000 00000000 00000000 00000000 ................................ 0000E0
00000000 00000000 00000000 00000000 00000000 00000000 00000000 00000000 ................................ 000100
00000000 00000000 00000000 00000000 00000000 00000000 00000000 00000000 ................................ 000120
00000000 00000000 00000000 00000000 00000000 00000000 00000000 00000000 ................................ 000140
00000000 00000000 00000000 00000000 00000000 00000000 00000000 00000000 ................................ 000160
00000000 00000000 00000000 00000000 00000000 00000000 00000000 00000000 ................................ 000180
00000000 00000000 00000000 00000000 00000000 00000000 00000000 00000000 ................................ 0001A0
00000000 00000000 00000000 00000000 00000000 00000000 00000000 00000000 ................................ 0001C0
00000000 00000000 00000000 00000000 00000000 00000000 00000000 00000000 ................................ 0001E0

Dump of file SATURN:[PCCOMMON.DUMP.DLL]PDLSYN.TMP;1 on 18-APR-1990 10:48:45.27
File ID (771,27,0)   End of file block 276 / Allocated 276

Virtual block number 224 (000000E0), 512 (0200) bytes

00000000 00000000 00000000 00000000 00000000 00000000 00000000 00000000 ................................ 000000
00000000 00000000 00000000 00000000 00000000 00000000 00000000 00000000 ................................ 000020
00000000 00000000 00000000 00000000 00000000 00000000 00000000 00000000 ................................ 000040
00000000 00000000 00000000 00000000 00000000 00000000 00000000 00000000 ................................ 000060
00000000 00000000 00000000 00000000 00000000 00000000 00000000 00000000 ................................ 000080
00000000 00000000 00000000 00000000 00000000 00380000 00000000 00000000 ..........8..................... 0000A0
00000000 00000000 00000000 00000000 00000000 00000000 00000000 00000000 ................................ 0000C0
00000000 00000000 00000000 00000000 00000000 00000000 00000000 00000000 ................................ 0000E0
00000000 00000000 00000000 00000000 00000000 00000000 00000000 00000000 ................................ 000100
00000000 00000000 00000000 00000000 00000000 00000000 00000000 00000000 ................................ 000120
00000000 00000000 00000000 00000000 00000000 00000000 00000000 00000000 ................................ 000140
00000000 00000000 00000000 00000000 00000000 00000000 00000000 00000000 ................................ 000160
00000000 00000000 00000000 00000000 00000000 00000000 00000000 00000000 ................................ 000180
00000000 00000000 00000000 00000000 00000000 00000000 00000000 00000000 ................................ 0001A0
00000000 00000000 00000000 00000000 00000000 00000000 00000000 00000000 ................................ 0001C0
00000000 00000000 00000000 00000000 00000000 00000000 00000000 00000000 ................................ 0001E0

Dump of file SATURN:[PCCOMMON.DUMP.DLL]PDLSYN.TMP;1 on 18-APR-1990 10:48:45.27
File ID (771,27,0)   End of file block 276 / Allocated 276

Virtual block number 225 (000000E1), 512 (0200) bytes

00000000 00000000 00000000 001E0000 00000000 00000000 00000000 00000000 ................................ 000000
00000000 00000000 00000000 00000000 00000000 00000000 00000000 00000000 ................................ 000020
001B0000 00000000 0000001B 001B0000 00000000 001B001B 00000000 001B0000 ................................ 000040
00000000 00000000 0000001B 001B001B 001B0000 00000000 0000001B 00000000 ................................ 000060
00000000 00000000 00000000 00000000 00000000 00000000 00000000 00000000 ................................ 000080
0000001B 00000000 00000000 0000001B 001B0000 00000000 0000001B 0000001B ................................ 0000A0
00000000 00000000 00000000 00000000 00000000 00000000 001B0000 00000000 ................................ 0000C0
0000001B 00000000 0000001B 0000001B 001B001B 00000000 001B0000 001B0000 ................................ 0000E0
00000000 00000000 00000000 00000000 0000001B 00000000 001B0000 001B001B ................................ 000100
001B001B 00000000 00000000 001B0000 00000000 00000000 00000000 0000001B ................................ 000120
0000001B 001B001B 001B001B 001B001B 001B001B 00000000 00000000 0000001B ................................ 000140
00000000 001B001B 0000001B 0000001B 00000000 00000000 00000000 00000000 ................................ 000160
00000000 00000000 00000000 00000000 00000000 00000000 001B0000 00000000 ................................ 000180
00000000 00000000 00000000 00000000 00000000 00000000 00000000 00000000 ................................ 0001A0
00000000 00000000 00000000 00000000 00000000 00000000 00000000 00000000 ................................ 0001C0
00000000 00000000 00000000 00000000 00000000 00000000 00000000 00000000 ................................ 0001E0

Dump of file SATURN:[PCCOMMON.DUMP.DLL]PDLSYN.TMP;1 on 18-APR-1990 10:48:45.27
File ID (771,27,0)   End of file block 276 / Allocated 276
```

```
Virtual block number 226 (000000E2), 512 (0200) bytes

00000000 00000000 00000000 00000000 00000000 00000000 00000000 00000000 ................................ 000000
00000000 00000000 00000000 00000000 00000000 00000000 00000000 00000000 ................................ 000020
00000000 00000000 00000000 00000000 00000000 00000000 00000000 00000000 ................................ 000040
00000000 00000000 00000000 00000000 00000000 00000000 00000000 00000000 ................................ 000060
00000000 00000000 00000000 00000000 00000000 00000000 00000000 00000000 ................................ 000080
00000000 00000000 00000000 00000000 00000000 00000000 00000000 00000000 ................................ 0000A0
00000021 00000000 00000000 00000000 00000000 00000000 00000000 00000000 ............................!... 0000C0
00000000 00000000 00000000 00000000 00000000 00000000 00000000 00000000 ................................ 0000E0
00000000 00000000 00000000 00000000 00000000 00000000 00000000 00000000 ................................ 000100
00040000 00000000 00000004 00040000 00000000 00040004 00000000 00040000 ..♦.....♦.♦.......♦.♦.........♦. 000120
00000000 00000000 00000004 00040004 00040000 00000000 00000004 00000000 ....♦.........♦.♦.♦.♦........... 000140
00000000 00000000 00000000 00000000 00000000 00000000 00000000 00000000 ................................ 000160
00000004 00000000 00000000 00000004 00040000 00000000 00000004 00000004 ♦...♦.........♦.♦...........♦... 000180
00000000 00000000 00000000 00000000 00000000 00000000 00040000 00000000 ......♦......................... 0001A0
00000004 00000000 00000004 00000004 00040004 00000000 00040000 00040000 ..♦...♦.....♦.♦.♦...♦.......♦... 0001C0
00000000 00000000 00000000 00000000 00000004 00000000 00040000 00040004 ♦.♦...♦.....♦................... 0001E0

Dump of file SATURN:[PCCOMMON.DUMP.DLL]PDLSYN.TMP;1 on 18-APR-1990 10:48:45.27
File ID (771,27,0)   End of file block 276 / Allocated 276

Virtual block number 227 (000000E3), 512 (0200) bytes

00040004 00000000 00000000 00040000 00000000 00000000 00000000 00000004 ♦.................♦.........♦.♦. 000000
00000004 00040004 00040004 00040004 00040004 00000000 00000000 00000004 ♦...........♦.♦.♦.♦.♦.♦.♦.♦.♦... 000020
00000000 00040004 00000004 00000004 00000000 00000000 00000000 00000000 ................♦...♦...♦.♦..... 000040
00000000 00000000 00000000 00000000 00000000 00000000 00040000 00000000 ......♦......................... 000060
00000000 00000000 00000000 00000000 00000000 00000000 00000000 00000000 ................................ 000080
00000000 00000000 00000000 00000000 00000000 00000000 00000000 00000000 ................................ 0000A0
00000000 00000000 00000000 00000000 00000000 00000000 00000000 00000000 ................................ 0000C0
00000000 00000000 00000000 00000000 00000000 00020000 00000000 00000000 ..........☻..................... 0000E0
00000000 00000000 00000000 00000000 00000000 00000000 00000000 00000000 ................................ 000100
00000000 00000000 00000000 00000000 00000000 00000000 00000000 00000000 ................................ 000120
00000000 00000000 00000000 00000000 00000000 00000000 00000000 00000000 ................................ 000140
00000000 00000000 00000000 00000000 00000000 00000000 00000000 00000000 ................................ 000160
00000000 00000000 00000000 00000000 00000000 00000000 00000000 00000000 ................................ 000180
00000000 00000000 00000000 00000000 00000000 00000000 00000000 00000000 ................................ 0001A0
00000000 00000000 00000000 00000000 00000000 00000000 00000000 00000000 ................................ 0001C0
00000000 00000000 00000000 00000000 00000000 00000000 00000000 00000000 ................................ 0001E0

Dump of file SATURN:[PCCOMMON.DUMP.DLL]PDLSYN.TMP;1 on 18-APR-1990 10:48:45.27
File ID (771,27,0)   End of file block 276 / Allocated 276

Virtual block number 228 (000000E4), 512 (0200) bytes

00000000 00000000 00000000 00000000 00000000 00000000 00000000 00000000 ................................ 000000
00000000 00000000 00000000 00000000 00000000 00000000 00000000 00000000 ................................ 000020
000000CE 00CF0000 00000000 00000000 00000000 00000000 00000000 00000000 ..........................Ï.Î... 000040
00000000 00000000 00000000 00000000 00000000 00000000 00000000 00000000 ................................ 000060
00000000 00000000 00000000 00000000 00000000 00000000 00000000 00000000 ................................ 000080
00000000 00000000 00000000 00000000 00000000 00000000 00000000 00000000 ................................ 0000A0
00000000 00000000 00000000 00000000 00000000 00000000 00000000 00000000 ................................ 0000C0
00000000 00000000 00000000 00000000 00000000 00000000 00000000 00000000 ................................ 0000E0
00000000 00000000 00000000 00000000 00000000 00000000 00000000 00000000 ................................ 000100
00000000 00000000 00000000 00000000 00000000 00000000 00000000 00000000 ................................ 000120
00000000 00000000 00000000 00000000 00000000 00000000 00000000 00000000 ................................ 000140
00000000 00000000 00000000 00000000 00000000 00000000 00000000 00000000 ................................ 000160
00000000 00000000 00000000 00000000 00000000 00000000 00000000 00000000 ................................ 000180
00000000 00000000 00000000 00000000 00000000 00000000 00000000 00000000 ................................ 0001A0
00000000 00000000 00000000 00000000 00000000 00000000 00000000 00000000 ................................ 0001C0
00000000 00000000 00000000 00000000 00000000 00000000 00000000 00000000 ................................ 0001E0

Dump of file SATURN:[PCCOMMON.DUMP.DLL]PDLSYN.TMP;1 on 18-APR-1990 10:48:45.27
File ID (771,27,0)   End of file block 276 / Allocated 276
```

```
Virtual block number 229 (000000E5), 512 (0200) bytes

00000000 00000000 00000000 00000000 00000000 00000000 00000000 00000000 ................................ 000000
00000000 00000000 00000000 00000000 00000000 00000000 00000000 00000000 ................................ 000020
00000000 00000000 00000000 00000000 00000000 00000000 00000000 00000000 ................................ 000040
00000000 00000000 00000000 00000000 00000000 00000000 00000000 00000000 ................................ 000060
00000000 00000000 00000000 00000000 00000000 00000000 00000000 00000000 ..............Á................. 000080
00000000 00000000 00000000 00000000 00000000 00000000 00000000 00000000 ................................ 0000A0
00000000 00000000 00000000 00000000 00000000 00000000 00000000 00000000 ................................ 0000C0
00000000 00000000 00000000 00000000 00000000 00000000 00000000 00000000 ................................ 0000E0
00000000 00000000 00000000 00000000 00000000 00000000 00000000 00000000 ................................ 000100
00000000 00000000 00000000 00000000 00000000 00000000 00000000 00000000 ................................ 000120
00000000 00000000 00000000 00000000 00000000 00000000 00000000 00000000 ................................ 000140
00000000 00000000 00000000 00000000 00000000 00000000 00000000 00000000 ................................ 000160
00000000 00000000 00000000 00000000 00000000 00000000 00000000 00000000 ................................ 000180
00000000 00000000 00000000 00000000 00000000 00000000 00000000 00000000 ................................ 0001A0
00000000 00000000 00000000 00000000 00000000 00000000 00000000 00000000 ................................ 0001C0
00000000 00000000 00000000 00000000 00000000 00000000 00000000 00000000 ................................ 0001E0

Dump of file SATURN:[PCCOMMON.DUMP.DLL]PDLSYN.TMP;1 on 18-APR-1990 10:48:45.27
File ID (771,27,0)   End of file block 276 / Allocated 276

Virtual block number 230 (000000E6), 512 (0200) bytes

00000000 00000000 00000000 00000000 00000000 00000000 00000000 00000000 ................................ 000000
00000000 00000000 00000000 00000000 00000000 00000000 00000017 00000000 ................................ 000020
00000000 00000000 00000000 00000000 00000000 00000000 00000000 00000000 ................................ 000040
00000000 00000000 00000000 00000000 00000000 00000000 00000000 00000000 ................................ 000060
00000000 00000000 00000000 00000000 00000000 00000000 00000000 00000000 ................................ 000080
00000000 00000000 00000000 00000000 00000000 00000000 00000000 00000000 ................................ 0000A0
00000000 00000000 00000000 00000000 00000000 00000000 00000000 00000000 ................................ 0000C0
00000000 00000000 00000000 00000000 00000000 00000000 00000000 00000000 ................................ 0000E0
00000000 00000000 00000000 00000000 00000000 00000000 00000000 00000000 ................................ 000100
00000000 00000000 00000000 00000000 00000000 00000000 00000000 00000000 ................................ 000120
00000000 00000000 00000000 00000000 00000000 00000000 00000000 00000000 ................................ 000140
00000000 00000000 00000000 00000000 00000000 00000000 00000000 00000000 ................................ 000160
00000000 00000000 00000000 00000000 00000000 00000000 00000000 00000000 ................................ 000180
00000000 00000000 00000000 00000000 00000000 00000000 00000000 00000000 ................................ 0001A0
00000000 00000000 00000000 00000000 00000000 00000000 00000000 00000000 ................................ 0001C0
00000000 00000000 00000000 00000000 00000000 00000000 00000000 00000000 ................................ 0001E0

Dump of file SATURN:[PCCOMMON.DUMP.DLL]PDLSYN.TMP;1 on 18-APR-1990 10:48:45.27
File ID (771,27,0)   End of file block 276 / Allocated 276

Virtual block number 231 (000000E7), 512 (0200) bytes

00000000 00000000 00000000 00000000 00000000 00000000 00000000 00000000 ................................ 000000
00000000 00000000 00000000 00000000 00000000 00000000 00000000 00000000 ................................ 000020
00000000 00000000 00000000 00000000 00000000 00000000 00000000 00000000 ................................ 000040
00000000 00000000 00000000 00000000 00000000 00000000 00000000 00000000 ................................ 000060
00000000 00000000 00000000 00000000 00000000 00000000 00000000 00000000 ................................ 000080
00000000 00000000 00000000 00000000 00000000 00000000 00000000 00000000 ................................ 0000A0
00000000 00000000 00000000 00000000 00000000 00000000 00000000 00000000 ................................ 0000C0
00000000 00000000 00000000 00000000 00000000 00000000 00000000 00000000 ................................ 0000E0
00000000 00000000 00000000 00000000 00000000 00000000 00000000 00000000 ................................ 000100
00000000 00000000 00000000 00000000 00000000 00000000 00000000 00000000 ................................ 000120
00000000 00000000 00000000 00000000 00000000 00000000 00000000 00000000 ................................ 000140
00000000 00000000 00000000 00000000 00000000 00000000 00000000 00000000 ................................ 000160
00000000 00000000 00000000 00000000 00000000 00000000 00000000 00000000 ................................ 000180
00000000 00000000 00000000 00000000 00000000 00000000 00000000 00000000 ................................ 0001A0
00000000 00000000 00000000 00000000 00000000 00000000 00000000 00000000 ................................ 0001C0
00000000 00000000 00000000 00000000 00000000 00000000 00000000 00000000 ................................ 0001E0

Dump of file SATURN:[PCCOMMON.DUMP.DLL]PDLSYN.TMP;1 on 18-APR-1990 10:48:45.27
File ID (771,27,0)   End of file block 276 / Allocated 276
```

```
Virtual block number 232 (000000E8), 512 (0200) bytes

00000000 00000000 00000000 00000000 00000000 00000000 00000000 00000000 ................................ 000000
00000000 00000000 00000000 00000000 00000000 00000000 00000000 00000000 ................................ 000020
00000000 00000000 00000000 00000000 00000000 00000000 00000000 00000000 ................................ 000040
00000000 00000000 00000000 00000000 00000000 00000000 00000000 00000000 ................................ 000060
00000000 00000000 00000000 00000000 00000000 00000000 00000000 00000000 ................................ 000080
00000000 00000000 00000000 00000000 00000000 00000000 00000000 00000000 ................................ 0000A0
00000000 00000000 00000000 00000000 00000000 00000000 00000000 00000000 ................................ 0000C0
00000000 00000000 00000000 00000000 00000000 00000000 00000000 00000000 ................................ 0000E0
00000000 00000000 00000000 00000000 00000000 00000000 00000000 00000000 ................................ 000100
00000000 00000000 00000000 00000000 009F0000 00000000 00000000 00000000 ................................ 000120
00000000 00000000 00000000 00000000 00000000 00000000 00000000 00000000 ................................ 000140
00000000 00000000 00000000 00000000 00000000 00000000 00000000 00000000 ................................ 000160
00000000 00000000 00000000 00000000 00000000 00000000 00000000 00000000 ................................ 000180
00000000 00000000 00000000 00000000 00000000 00000000 00000000 00000000 ................................ 0001A0
00000000 00000000 00000000 00000000 00000000 00000000 00000000 0000009F ................................ 0001C0
00000000 00000000 00000000 00000000 00000000 00000000 00000000 00000000 ................................ 0001E0

Dump of file SATURN:[PCCOMMON.DUMP.DLL]PDLSYN.TMP;1 on 18-APR-1990 10:48:45.27
File ID (771,27,0)   End of file block 276 / Allocated 276

Virtual block number 233 (000000E9), 512 (0200) bytes

00000000 00000000 00000000 00000000 009F0000 00000000 009E0000 00000000 ................................ 000000
00000000 00000000 00000000 00000000 00000000 00000000 00000000 00000000 ................................ 000020
00000000 00000000 00000000 00000000 00000000 00000000 00000000 00000000 ................................ 000040
00000000 00000000 00000000 00000000 00000000 00000000 00000000 00000000 ................................ 000060
00000000 00000000 00000000 00000000 00000000 00000000 00000000 00000000 ................................ 000080
00000000 00000000 00000000 00000000 00000000 00000000 00000000 00000000 ................................ 0000A0
00000000 00000000 00000000 00000000 00000000 00000000 00000000 00000000 ................................ 0000C0
00000000 00000000 00000000 00000000 00000000 00000000 00000000 00000000 ................................ 0000E0
00000000 00000000 00000000 00000000 00000000 00000000 00000000 00000000 ................................ 000100
00000000 00000000 00000000 00000000 00000000 00000000 00000000 00000000 ................................ 000120
00000000 00000000 00000000 00000000 00000000 00000000 00000000 00000000 ................................ 000140
00000000 00000000 00A00000 00000000 00000000 00000000 00000000 00000000 ................................ 000160
00000000 00000000 00000000 00000000 00000000 00000000 00000000 00000000 ................................ 000180
00000000 00000000 00000000 00000000 00000000 00000000 00000000 00000000 ................................ 0001A0
00000000 00000000 00000000 00000000 00000000 00000000 00000000 00000000 ................................ 0001C0
0000009D 00000000 00000000 00000000 00000000 00000000 0000009C 00000000 ................................ 0001E0

Dump of file SATURN:[PCCOMMON.DUMP.DLL]PDLSYN.TMP;1 on 18-APR-1990 10:48:45.27
File ID (771,27,0)   End of file block 276 / Allocated 276

Virtual block number 234 (000000EA), 512 (0200) bytes

00000000 00000000 00000000 00000000 00000000 00000000 00000000 00000000 ................................ 000000
00000000 00000000 00000000 00000000 00000000 00000000 00000000 00000000 ................................ 000020
00000000 00000000 00000000 00000000 00000000 00000000 00000000 00000000 ................................ 000040
00000000 00000000 00000000 00000000 00000000 00000000 00000000 00000000 ................................ 000060
00000000 00000000 00000000 00000000 00000000 00000000 00000000 00000000 ................................ 000080
00000000 00000000 00000000 00000000 00000000 00000000 00000000 00000000 ................................ 0000A0
00000000 00000000 00000000 00000000 00000000 00000000 00000000 00000000 ................................ 0000C0
00000000 00000000 00000000 00000000 00000000 00000000 00000000 00000000 ................................ 0000E0
00000000 00000000 00000000 00000000 00000000 00000000 00000000 00000000 ................................ 000100
00000000 00000000 00000000 00000000 00000000 00000000 00000000 00000000 ................................ 000120
00000000 00000000 00000000 00000000 00000000 00000000 00000000 00000000 ................................ 000140
006E0000 00000000 00000000 0000006E 00000000 00000000 00000000 00000000 ................n.............n. 000160
00000000 00000000 00000000 00000000 00000000 00000000 00000000 00000000 ................................ 000180
00000000 00000000 00000000 00000000 00000000 00000000 00000000 00000000 ................................ 0001A0
00000000 00000000 00000000 00000000 00000000 00000000 006E0000 00000000 ......n......................... 0001C0
00000000 00000000 00000000 00000000 00000000 00000000 00000000 00000000 ................................ 0001E0

Dump of file SATURN:[PCCOMMON.DUMP.DLL]PDLSYN.TMP;1 on 18-APR-1990 10:48:45.27
File ID (771,27,0)   End of file block 276 / Allocated 276
```

```
Virtual block number 235 (000000EB), 512 (0200) bytes

 00000000 0000006E 00000000 0000006E 00000000 00000000 00000000 00000000 ................n.......n....... 000000
 00000000 00000000 00000000 0000006E 00000000 00000000 006E0000 00000000 ......n.........n............... 000020
 006E0000 0000006D 00000000 00000000 00000000 00000000 00000000 00000000 ........................m.....n. 000040
 00000000 00000000 00000000 00000000 00000000 00000000 00000000 00000000 ................................ 000060
 00000000 00000000 00000000 00000000 00000000 00000000 00000000 00000000 ................................ 000080
 00000000 00000000 00000000 00000000 00000000 00000000 00000000 00000000 ................................ 0000A0
 00000000 00000000 00000000 00000000 00000000 00000000 00000000 00000000 ................................ 0000C0
 00000000 00000000 00000000 00000000 00000000 00000000 00000000 00000000 ................................ 0000E0
 00000000 00000000 00000000 00000000 00000000 00000000 00000000 00000000 ................................ 000100
 00000000 00000000 00000000 00000000 00000000 00000000 00000000 00000000 ................................ 000120
 00000000 00000000 00000000 00000000 00000000 00000000 00000000 00000000 ................................ 000140
 00000000 00000000 00000000 00000000 00000000 00000000 00000000 00000000 ................................ 000160
 00000000 00000000 00000000 00000000 00000000 00000000 00000000 00000000 ................................ 000180
 00000000 00000000 00000000 00000000 00000000 00000000 00000000 00000000 ................................ 0001A0
 00000000 00000000 00000000 00000000 00000000 0000006F 00000000 00000000 ........o....................... 0001C0
 00000000 00000000 00000000 00000000 00000000 00000000 00000000 00000000 ................................ 0001E0

Dump of file SATURN:[PCCOMMON.DUMP.DLL]PDLSYN.TMP;1 on 18-APR-1990 10:48:45.27
File ID (771,27,0)   End of file block 276 / Allocated 276

Virtual block number 236 (000000EC), 512 (0200) bytes

 00000000 00000000 00000000 00000000 00000000 00000000 00000000 00000000 ................................ 000000
 00000000 00000000 00000087 00000000 00000000 00000000 00000000 00000000 ................................ 000020
 00000000 00000000 00000000 00000000 00000087 00000000 00000000 00000000 ................................ 000040
 00000000 00000000 00000000 00000000 00000000 00000000 00000000 00000000 ................................ 000060
 00000000 00000000 00000000 00000000 00000000 00000000 00000000 00000000 ................................ 000080
 00000000 00000000 00000000 00000000 00000000 00000000 00000000 00000000 ................................ 0000A0
 00000000 00000000 00000000 00000000 00000000 00000000 00000000 00000000 ................................ 0000C0
 00000000 00000000 00000000 00000000 00000000 00000000 00000000 00000000 ................................ 0000E0
 00000000 00000000 00000000 00000000 00000000 00000000 00000000 00000000 ................................ 000100
 00000000 00000000 00000000 00000000 00000000 00000000 00000000 00000000 ................................ 000120
 00730000 00000000 00000073 00730000 00000000 00730073 00000000 00730000 ..s.....s.s.......s.s.........s. 000140
 00000000 00000000 00000073 00730073 00730000 00000000 00000073 00000000 ....s.........s.s.s.s........... 000160
 00000000 00000000 00000000 00000000 00000000 00000000 00000000 00000000 ................................ 000180
 00000073 00000000 00000000 00000073 00730000 00000000 00000073 00000073 s...s.........s.s...........s... 0001A0
 00000000 00000000 00000000 00000000 00000000 00000000 00730000 00000000 ......s......................... 0001C0
 00000073 00000000 00000073 00000073 00730073 00000000 00730000 00730000 ..s...s.....s.s.s...s.......s... 0001E0

Dump of file SATURN:[PCCOMMON.DUMP.DLL]PDLSYN.TMP;1 on 18-APR-1990 10:48:45.27
File ID (771,27,0)   End of file block 276 / Allocated 276

Virtual block number 237 (000000ED), 512 (0200) bytes

 00000000 00000000 00000000 00000000 00000073 00000000 00730000 00730073 s.s...s.....s................... 000000
 00730073 00000000 00000000 00730000 00000000 00000000 00000000 00000073 s.................s.........s.s. 000020
 00000073 00730073 00730073 00730073 00730073 00000000 00000000 00000073 s...........s.s.s.s.s.s.s.s.s... 000040
 00000000 00730073 00000073 00000073 00000000 00000000 00000000 00000000 ................s...s...s.s..... 000060
 00000000 00000000 00000000 00000000 00000000 00000000 00730000 00000000 ......s......................... 000080
 00000000 00000109 00000000 00000000 00000000 00000000 00000000 00000000 ................................ 0000A0
 00000000 00000000 00000000 00000000 00000000 00000000 00000000 00000000 ................................ 0000C0
 00000000 00000000 00000000 00000000 00000000 00000000 00000000 00000000 ................................ 0000E0
 00000000 00000000 00000000 00000000 00000000 00000000 00000000 00000000 ................................ 000100
 00000000 00000000 00000000 00000000 00000108 00000000 00000000 00000000 ................................ 000120
 00000000 00000000 00000000 00000000 00000000 00000000 00000000 00000000 ................................ 000140
 00000000 00000000 00000000 0000010A 00000000 00000000 00000000 00000000 ................................ 000160
 00000000 00000000 00000000 00000000 00000000 00000000 00000000 00000000 ................................ 000180
 00000000 00000000 00000000 00000000 00000000 00000000 00000000 00000000 ................................ 0001A0
 00000000 00000000 00000000 00000000 00000000 00000000 00000000 00000000 ................................ 0001C0
 00000000 00000000 00000000 00000000 00000000 00000000 00000000 00000000 ................................ 0001E0

Dump of file SATURN:[PCCOMMON.DUMP.DLL]PDLSYN.TMP;1 on 18-APR-1990 10:48:45.27
File ID (771,27,0)   End of file block 276 / Allocated 276
```

Virtual block number 238 (000000EE), 512 (0200) bytes

```
00000000 00000000 00000000 00000000 00000000 00000000 00000000 00000000 ................................ 000000
00000000 00000000 00000000 00000000 00000000 00000000 00000000 00000000 ................................ 000020
00000000 00000000 00000000 00000000 00000000 00000000 00000000 00000000 ................................ 000040
00000000 00000000 00000000 00000000 00000000 00000000 00000000 00500000 ..P............................. 000060
00000000 00000051 00000000 00000000 00000000 00000000 00000000 00000000 ........................Q....... 000080
00000000 00000000 00000000 00000000 00510000 00000000 00000000 00000051 Q............Q.................. 0000A0
00000000 00000000 00000000 00000000 00000000 00000000 00000000 00000000 ................................ 0000C0
00000000 00000000 00510000 00000000 00000000 00000000 00000000 00000000 ......................Q......... 0000E0
00000000 00000000 00000000 00000000 00000000 00000000 00000000 00000000 ................................ 000100
00000000 00000000 00000000 00000000 00000000 00000000 00000000 00000000 ................................ 000120
00000000 00000000 00510000 00000000 00000000 00000051 00000051 00000000 ....Q...Q.............Q......... 000140
00000000 00000000 00000000 00000000 00000000 00000000 00000000 00000051 Q............................... 000160
00000000 00000000 00000000 00000000 00510000 00000000 00000000 00000000 .............Q.................. 000180
00000000 00000000 00000000 00000000 00000000 00000000 00000000 00000000 ................................ 0001A0
00000000 00000000 00000000 00000000 00000000 00000000 00000000 00000000 ................................ 0001C0
00000000 00000000 00000000 00000000 00000000 00000000 00000000 00000000 ................................ 0001E0
```

Dump of file SATURN:[PCCOMMON.DUMP.DLL]PDLSYN.TMP;1 on 18-APR-1990 10:48:45.27
File ID (771,27,0)   End of file block 276 / Allocated 276

Virtual block number 239 (000000EF), 512 (0200) bytes

```
00000000 00000000 00000000 00000000 00000000 00000000 00000000 00000000 ................................ 000000
00000000 00000000 00000000 00000000 00000000 00000000 00980000 00000000 ................................ 000020
00000000 00000000 00000000 00000000 00000000 00000000 00000000 00000000 ................................ 000040
00000000 00000000 00000000 00000000 00000000 00000000 00000000 00000000 ................................ 000060
00000000 00000000 00000000 00000000 00000000 00000000 00000000 00000000 ................................ 000080
00000000 00000000 00000000 00000000 00000000 00000000 00000000 00000000 ................................ 0000A0
00000000 00000000 00000000 00000000 00000000 00000000 00000000 00000000 ................................ 0000C0
00000000 00000000 00000000 00000000 00000000 00000000 00000000 00000000 ................................ 0000E0
00000000 00000000 00000000 00000000 00000000 00000000 00000000 00000000 ................................ 000100
00000000 00000000 00000000 00000000 00000000 00000000 00000000 00000000 ................................ 000120
00000000 00000000 00000000 00000000 00000000 00000000 00000000 00000000 ................................ 000140
00000000 00000000 00000000 00000000 00000000 00000000 00000000 00000000 ................................ 000160
00000000 00000000 00000000 00000000 00000000 00000000 00000000 00000000 ................................ 000180
00000000 00000000 00000000 00000000 00000000 00000000 00000000 00000000 ................................ 0001A0
00000000 00000000 00000000 00000000 00000000 00000000 00000000 00000000 ................................ 0001C0
00000000 00000000 00680000 00000000 00000000 00000000 00000000 00000000 ......................k......... 0001E0
```

Dump of file SATURN:[PCCOMMON.DUMP.DLL]PDLSYN.TMP;1 on 18-APR-1990 10:48:45.27
File ID (771,27,0)   End of file block 276 / Allocated 276

Virtual block number 240 (000000F0), 512 (0200) bytes

```
00000000 00000000 00000000 00000000 00000000 00000000 00000000 00000000 ................................ 000000
00000000 00000000 00000000 00000000 00000000 00000000 00000000 00000000 ................................ 000020
00000000 00000000 00000000 00000000 00000000 00000000 00000000 00000000 ................................ 000040
00000000 00000000 00000000 00000000 00000000 00000000 00000000 00000000 ................................ 000060
00000000 00000000 00000000 00000000 00000000 00000000 00000000 00000000 ................................ 000080
00000000 00000000 00000000 00000000 00000000 00000000 00000000 00000000 ................................ 0000A0
00000000 00000000 00000000 00000000 00000000 00000000 00000000 00000000 ................................ 0000C0
00000000 00000000 00000000 00000000 00000000 00000000 00000000 00000000 ................................ 0000E0
00000000 00000000 00000000 00000000 00000000 00000000 00000000 00000000 ................................ 000100
00000000 00000000 00000000 00000000 00000000 00000000 00000000 00000000 ................................ 000120
00000000 00000000 00000000 00000000 00000000 00000000 00000000 00000000 ................................ 000140
00000000 00000000 00000000 00000000 00000000 00000000 00000000 00000000 ................................ 000160
00940000 00000000 00000000 00000000 00000000 00000000 00000000 00000000 ................................ 000180
00000000 00000000 00000000 00000000 00000000 00000000 00000000 00000000 ................................ 0001A0
00000000 00000000 00000000 00000000 00000000 00000000 00000000 00000000 ................................ 0001C0
00000000 00000000 00000000 00000000 00000000 00000000 00000000 00000000 ................................ 0001E0
```

Dump of file SATURN:[PCCOMMON.DUMP.DLL]PDLSYN.TMP;1 on 18-APR-1990 10:48:45.27
File ID (771,27,0)   End of file block 276 / Allocated 276

```
Virtual block number 241 (000000F1), 512 (0200) bytes

00000000 00000000 00920000 00000000 00000000 00000000 00000000 00000000 ................................ 000000
00000000 00000000 00000000 00000000 00000000 00000000 00000000 00000000 ................................ 000020
00000000 00000000 00000000 00000000 00000000 00000000 00000000 00000000 ................................ 000040
00000000 00000000 00000000 00000000 00000000 00000000 00000000 00000000 ................................ 000060
00000000 00000000 00000000 00000000 00000000 00000000 00000000 00000000 ................................ 000080
00000000 00000000 00000000 00000000 00000000 00000000 00000000 00000000 ................................ 0000A0
00000000 00000000 00000000 00000000 00000000 00000000 00000000 00000000 ................................ 0000C0
00000000 00000000 00000000 00000000 00000000 00000000 00000000 00000000 ................................ 0000E0
00000000 00000000 00000000 00000000 00000000 00000000 00000000 00000000 ................................ 000100
00000000 00000000 00000000 00000000 00000000 00000000 00000000 00000000 ................................ 000120
00000000 00000000 00000000 00000000 00000000 00000000 00000000 00000000 ................................ 000140
00000000 00000000 00000000 00000000 00000000 00000000 00000000 00000000 ................................ 000160
00000000 00000000 00000000 00000000 00000000 00000000 00640000 00000000 ......d......................... 000180
00000000 00000000 00000000 00000000 00000000 00000000 00000000 00000000 ................................ 0001A0
00000000 00000000 00000000 00000000 00000000 00000000 00000000 00000000 ................................ 0001C0
00000000 00000000 00000000 00000000 00000000 00000000 00630000 00000000 ......c......................... 0001E0

Dump of file SATURN:[PCCOMMON.DUMP.DLL]PDLSYN.TMP;1 on 18-APR-1990 10:48:45.27
File ID (771,27,0)   End of file block 276 / Allocated 276

Virtual block number 242 (000000F2), 512 (0200) bytes

00000000 00000000 00000000 00000000 00000000 00000000 00000000 00000000 ................................ 000000
00000000 00000000 00000000 00000000 00000000 00000000 00000000 00000000 ................................ 000020
00000000 00000000 00000000 00000000 00000000 00000000 00660000 00000000 ......f......................... 000040
00650000 00000000 00000000 00000000 00000000 00000000 00000000 00000000 ..............................e. 000060
00000000 00000000 00000000 00000000 00000000 00000000 00000000 00000000 ................................ 000080
00000000 00000000 00000000 00000000 00000000 00000000 00000000 00000000 ................................ 0000A0
00000000 00020000 00000000 00000000 00000000 00000000 00000000 00000003 ................................ 0000C0
00000000 00000000 00040000 00000000 00000000 00000000 00000000 00030000 ................................ 0000E0
00000000 00000000 00000000 00000000 00000000 00000000 00000000 00000002 ................................ 000100
00000000 00000000 00020000 00000000 00000002 00000000 00000000 00000000 ................................ 000120
00000000 00000000 00040000 00000000 00000000 00020000 00000000 00000000 ................................ 000140
00000000 00000000 00000000 00000000 00000000 00000002 00000000 00000000 ................................ 000160
00000000 00000000 00000000 00000000 00000000 00000002 00000000 00000000 ................................ 000180
00000000 00000002 00040002 00000000 00000000 00000000 00000000 00000000 ................................ 0001A0
00000000 00000000 00000000 00000000 00000000 00020002 00020000 00000000 ................................ 0001C0
00000000 00000000 00000000 00000000 00040000 00000000 00000000 00000000 ................................ 0001E0

Dump of file SATURN:[PCCOMMON.DUMP.DLL]PDLSYN.TMP;1 on 18-APR-1990 10:48:45.27
File ID (771,27,0)   End of file block 276 / Allocated 276

Virtual block number 243 (000000F3), 512 (0200) bytes

00000000 00000000 00000000 00000000 00000000 00000000 00000000 00000000 ................................ 000000
00000000 00000000 00000000 00000000 00000000 00000000 00000000 00000000 ................................ 000020
00000000 00000000 00000000 00000000 00000000 00000000 00000000 00000000 ................................ 000040
00000000 00000000 00000000 00000000 00000000 00000000 00000000 00000000 ................................ 000060
00000000 00000000 00000000 00000000 00000000 00000000 00000000 00000000 ................................ 000080
00000000 00000000 00000000 00000000 00000000 00000000 00000000 00000000 ................................ 0000A0
00000000 00000000 00000000 00000000 00000000 00000000 00000000 00000000 ................................ 0000C0
00000000 00000000 00000000 00000000 00000000 00000000 00000000 00000000 ................................ 0000E0
00000000 00000000 00000000 00000000 00000000 00000000 00000000 00000000 ................................ 000100
00000000 00000000 00000000 00000000 00000000 00000000 00000000 00000000 ................................ 000120
00000000 00000000 00000000 00000000 00000000 00000000 00000000 00000000 ................................ 000140
00000000 00000000 00000000 00000000 00000000 00000000 00000000 00000000 ................................ 000160
00000000 00360000 00000000 00000000 00000000 00000000 00000000 00000000 ..........................6..... 000180
00000000 00050000 00000000 00000000 00000000 00000000 00000000 00000000 ................................ 0001A0
00000000 00000000 00000000 00000000 00000000 00000000 00000000 00000000 ................................ 0001C0
00000000 00000000 00000000 00000000 00000000 00000000 00000000 00000005 ................................ 0001E0

Dump of file SATURN:[PCCOMMON.DUMP.DLL]PDLSYN.TMP;1 on 18-APR-1990 10:48:45.27
File ID (771,27,0)   End of file block 276 / Allocated 276
```

Virtual block number 244 (000000F4), 512 (0200) bytes

```
00000000 00000000 00050000 00000000 00000005 00000000 00000000 00000000 ................................ 000000
00000000 00000000 00000000 00000000 00000000 00050000 00000000 00000000 ................................ 000020
00000000 00000000 00000000 00000000 00000000 00000005 00000000 00000000 ................................ 000040
00000000 00000000 00000000 00000000 00000000 00000005 00000000 00000000 ................................ 000060
00000000 00000005 00000005 00000000 00000000 00000000 00000000 00000000 ................................ 000080
00000000 00000000 00000000 00000000 00000000 00050005 00050000 00000000 ................................ 0000A0
00000000 00000000 00000000 00000000 00000000 00000000 00000000 00000000 ................................ 0000C0
00000000 00000000 00000000 00000000 00000000 00000000 00000000 00000000 ................................ 0000E0
00000000 00000000 00000000 00000000 00000000 00000000 00000000 00000000 ................................ 000100
00000000 00000000 00000000 00000000 00000000 00000000 00000000 00000000 ................................ 000120
00000000 00000000 00000000 00000000 00000000 00000000 00000000 00000000 ................................ 000140
00000000 00000000 00000024 00000000 00000000 00000000 00000000 00000000 ......................$......... 000160
00000000 00000000 00000000 00000000 00000000 00000000 00000000 00000000 ................................ 000180
00000000 00000000 00000000 00000000 00000000 00000000 00000000 00000000 ................................ 0001A0
00000000 00000000 00000000 00000000 00000000 00000000 00000000 00000000 ................................ 0001C0
00000000 00000000 00000000 00000000 00000000 00000000 00000000 00000000 ................................ 0001E0
```

Dump of file SATURN:[PCCOMMON.DUMP.DLL]PDLSYN.TMP;1 on 18-APR-1990 10:48:45.27
File ID (771,27,0)   End of file block 276 / Allocated 276

Virtual block number 245 (000000F5), 512 (0200) bytes

```
00000000 00000000 00000000 00000000 00000000 00000000 00000000 00000000 ................................ 000000
00000000 00000000 00000000 00000000 00000000 00000000 00000000 00000000 ................................ 000020
00000000 00000000 00000000 00000000 00000000 00000000 00000000 00000000 ................................ 000040
00000023 00000000 00000000 00000000 00000000 00000000 00000000 00000000 ............................#... 000060
00000000 00000000 00000000 00000000 00000000 00000104 00000000 00000000 ................................ 000080
00000000 00000000 00000000 00000000 00000000 00000000 00000000 00000000 ................................ 0000A0
00000000 00000000 00000000 00000000 00000000 00000000 00000000 00000000 ................................ 0000C0
00000104 00000000 00000000 00000000 00000000 00000000 00000104 00000000 ................................ 0000E0
00000000 00000000 00000000 00000000 01050000 00000000 00000000 00000000 ................................ 000100
00000000 00000000 00000000 00000000 00000000 00000000 00000000 00000000 ................................ 000120
00000000 00000000 00000000 00000000 00000000 00000000 00000000 00000104 ................................ 000140
00000000 00000000 00000000 00000000 00000000 00000000 00000000 00000000 ................................ 000160
00000000 00000000 00000000 00000000 00000000 00000000 00000000 00000000 ................................ 000180
00000000 00000000 00000000 00000000 00000000 00000000 00000000 00000105 ................................ 0001A0
00000000 00000000 00000000 00000000 00000000 00000000 00000000 00000000 ................................ 0001C0
00000000 00000000 00000000 00000011 01050000 00000000 01050000 00000000 ................................ 0001E0
```

Dump of file SATURN:[PCCOMMON.DUMP.DLL]PDLSYN.TMP;1 on 18-APR-1990 10:48:45.27
File ID (771,27,0)   End of file block 276 / Allocated 276

Virtual block number 246 (000000F6), 512 (0200) bytes

```
00000000 00000000 00000000 00100000 00000000 00000000 00000000 00000000 ................................ 000000
6F43202D 20797261 7262694C 20656069 54206E75 52205340 00000000 00000000 ........MS Run-Time Library - Co 000020
70726F43 2074666F 736F7263 694D202C 38383931 20296328 20746867 69727970 pyright (c) 1988, Microsoft Corp 000040
00000000 0000002E 002A002A 002A0000 676F6C2E 6E79736C 64700077 00000011 ....w.pdlsyn.log..*.*.*......... 000060
00000000 00840056 00A90000 0000007A 002B00AF 00000000 00700000 00430000 ..C...p.....£.+.z......`.V....... 000080
00270000 000000A2 000700AF 00000000 009B00AC 00430000 0000008E 00810043 C.........C.¯.......£.¤.Å.....'. 0000A0
01830087 00000000 00C00158 00380000 000000B6 01200025 00000000 00AC0102 ..¯.....X.-.Ñ.....8.X.â......... 0000C0
00E80204 000A0000 000000DE 01D90028 00000000 000401AE 000F0000 000000CA b.......Ò.å.....(.).ß.........Ò. 0000E0
00000106 02850002 00000000 00FC025A 00070000 000000F2 022F002F 00000000 ....£./.·.......Z.¤............. 000100
00000000 01600306 022F0000 0000011A 02DB0088 00000000 01100280 00860000 .... .........Ü......./...'..... 000120
006F0000 00000000 0000008C 00000000 00000000 00800000 00000000 00000015 ..............................o. 000140
0371008A 00000000 00000000 00890000 00000000 0000005E 00000000 00000000 ........^.....................q. 000160
0188042F 00490000 00000000 00000296 00000000 017E0404 00980000 0000016A j.........~...............I./... 000180
00000000 00000089 00000000 00000000 00880000 000001A6 04580248 00000000 ....N.[.Î....................... 0001A0
00000000 00000000 00150000 000001C4 05030092 00000000 0180049C 008A0000 ......¯..........á.............. 0001C0
00150000 00000000 00000295 00000000 01E20559 00910000 000001CE 052E0285 ....ð.......Y.ã................. 0001E0
```

Dump of file SATURN:[PCCOMMON.DUMP.DLL]PDLSYN.TMP;1 on 18-APR-1990 10:48:45.27
File ID (771,27,0)   End of file block 276 / Allocated 276

```
Virtual block number 247 (000000F7), 512 (0200) bytes

 05DB0015 00000000 00000000 028A0000 00000200 05800093 00000000 01EC0584 ..š.......¯....................Ü. 000000
 023C0633 02AA0000 0000021E 06070037 00000000 00000000 02140000 00000214 ................7.........˙.3.<. 000020
 00000246 065E02AA 00000000 00000000 02150000 00000000 00000226 00000000 ....&....................˙.^.F... 000040
 00000000 026406E1 02450000 00000000 0000040D 00000000 025A068C 00AD0000 ..Ù.¥.Z.....M.........E.Å.d..... 000060
 02710000 00000000 00000060 00000000 0282072B 00720000 0000026E 07060059 Y...n.....r.+........'.........q. 000080
 07ED003F 00000000 02A007C8 025C0000 00000000 000001FA 00000000 02960750 P.......ª.........\.à.......?.Ü. 0000A0
 02C8086E 003C0000 000002BE 0843003E 00000000 02B40818 003A0000 000002AA ˙.....:...Ç.....>.C./.....<.n.à. 0000C0
 000002E6 08EF0041 00000000 020C08C4 00420000 00000202 08990014 00000000 ........#.....B.6.É.....A.ÿ.Ì... 0000E0
 00000000 031809A6 01F40000 000002FA 09600205 00000000 02F0091A 02700000 ..p...b.......'.ª.....¶.Ì....... 000100
 026E0000 00000322 09CB0271 00000000 00000000 00820000 00000000 00000245 E...................q.ù.".....n. 000120
 00000082 00000000 00000000 02450000 0000034A 0A68022A 00000000 032C0A22 ".,......*.h.J.....E............. 000140
 00000000 02450000 00000000 00000279 00000000 03720A8D 02710000 00000000 ......q...r.....y.........E..... 000160
 00000000 00000278 00000000 03900AE4 02710000 00000000 00000082 00000000 ..............q.ô.......x....... 000180
 00000000 00000000 00820000 000003A4 083B0245 00000000 00000000 00090000 .............E.;.Ê.............. 0001A0
 02320000 00000000 0000025B 00000000 00000000 02A90000 000003CC 08600271 q.'.š.....`..........[.........2. 0001C0
 08E0007C 00000000 00000000 026A0000 000003E0 08BB0269 00000000 00000000 .........Ì.£.Å.....j.........|.À. 0001E0

Dump of file SATURN:[PCCOMMON.DUMP.DLL]PDLSYN.TMP;1 on 18-APR-1990 10:48:45.27
File ID (771,27,0)   End of file block 276 / Allocated 276

Virtual block number 248 (000000F8), 512 (0200) bytes

 00000000 005A0000 00000000 000002AA 00000000 FFFF0C3C 02990000 000003EA ð........<........˙.........Z..... 000000
 0000043A 0CCE0045 00000000 041C0C7D 00610000 00000000 00000073 00000000 ....s..........a.}.......E.ð.:... 000020
 00000000 04D00CF9 00150000 00000000 00000292 00000000 00000000 02870000 ..........................ª.Å..... 000040
 005A0000 00000000 00000245 00000000 00000000 02420000 00000000 00000240 @.........B.........E.........Z. 000060
 00000271 00000000 00000000 00610000 00000000 00000073 00000000 00000000 .........s..........a..........q... 000080
 00000000 02450000 00000000 00000242 00000000 00000000 02290000 00000000 ......).........B.........E..... 0000A0
 00000000 00000061 00000000 00000000 00730000 00000000 0000005A 00000000 ....Z.........s..........a....... 0000C0
 00000000 00000000 023D0000 000004E4 00250022 00000000 00000000 02710000 ..q..........".X.ð.....=........ 0000E0
 02040000 0000050C 0DA80067 00000000 04F8007C 02320000 000004EE 0D500058 X.P.Ÿ.....2.|.%.....g.˙......... 000100
 0E5E0033 00000000 05200E32 00670000 00000516 00040232 00000000 00000000 .........2.å.......g.2. ......3.^. 000120
 05520EB5 002C0000 0000053E 0E890058 00000000 00000000 02600000 00000534 4.....'.........X...>.....,.ç.R. 000140
 0000057E 0F0C0275 00000000 055C0EE0 00580000 00000000 00000250 00000000 ....P..........X.À.\.....u...~... 000160
 05840F4D 00000000 007A0000 00000000 00000080 00000000 00000000 00840000 ...........................z.....M... 000180
 00800000 00000580 10AD0084 00000000 00000000 02680000 00000598 0F7F007B {..........k............Ù.¯....... 0001A0
 124E0044 00000000 05C01120 005D05B6 10EE0000 0000007A 00000000 00000000 .........z.....Ÿ.Ñ.]. .å.....D.N. 0001C0
 05E812D1 022E0000 000005DE 12A500A4 00000000 05D41279 02320000 000005CA ð.....2.y.å.....É.É.B........1.Ò. 0001E0

Dump of file SATURN:[PCCOMMON.DUMP.DLL]PDLSYN.TMP;1 on 18-APR-1990 10:48:45.27
File ID (771,27,0)   End of file block 276 / Allocated 276

Virtual block number 249 (000000F9), 512 (0200) bytes

 00000610 13290232 00000000 00000000 02150000 000005FC 12FD00A4 00000000 ....Ê.».•.................2.)..... 000000
 00000000 062413B3 00460000 0000061A 1387008D 00000000 00000000 02840000 ..........................F.°.$..... 000020
 02860000 0000064C 14340232 00000000 06381409 02980000 0000062E 130E026A j.B...........8.....2.4.L....... 000040
 148B001C 00000000 00000000 02040000 00000660 145F008E 00000000 00000000 ..........._.'...................... 000060
 0692151D 00480000 0000067E 14D4001C 00000000 00000000 02040000 00000674 t...................å.-.....K.¯..... 000080
 00000680 15740019 00000000 069C1548 00150000 00000000 00000294 00000000 ................H.........t.¯... 0000A0
 00000000 06C415CB 00A50000 000006BA 159F008E 00000000 00000000 02300000 ..0..............¤.....Ê.ù.á..... 0000C0
 00230000 000006E2 164C00A6 00000000 06D81621 00A70000 000006CE 15F600A8 ˙.-.ð.....Ì.I.Ä.....Ì.L.ã.....#. 0000E0
 16F8003D 00000000 070016CD 00480000 000006F6 16A20010 00000000 06EC1677 w.š.......Å.-.....H.È.......=.%. 000100
 00000000 00810000 00000000 00000052 00000000 07221723 026F0000 0000070A ......o.#."......R................ 000120
 00000000 00000080 00000000 00000000 009F0000 00000000 0000005C 076417AA ˙.d.\............................. 000140
 00000000 00000000 006F0000 00000000 0000005E 00000000 00000000 007D0000 ..)..........^..........o........ 000160
 00810000 00000000 00000052 00000000 07861900 026F0000 0000076E 17D0004E N.Ï.n......o..........R............ 000180
 0000007A 00000000 00000000 009F0000 00000000 0000005C 07A419B0 00000000 ....¯.Ê.\......................z... 0001A0
 00000000 007D0000 00000000 00000080 00000000 00000000 005F0066 19E30000 ..D.f._......................)..... 0001C0
 000007E6 1A23004E 00000000 00000000 006F0000 00000000 0000005E 00000000 ....^..........o..........N.#.Ì... 0001E0

Dump of file SATURN:[PCCOMMON.DUMP.DLL]PDLSYN.TMP;1 on 18-APR-1990 10:48:45.27
File ID (771,27,0)   End of file block 276 / Allocated 276
```

Virtual block number 250 (000000FA), 512 (0200) bytes

```
00000000 08041C65 001C0000 00000000 000002A8 00000000 07FA1C3A 00A00000 ....:.'.....`...........e....... 000000
00150000 00000836 1CBC00A2 00000000 00000000 028F0000 00000818 1C910005 ....................À.¥.6....... 000020
1D450031 00000000 08401CE8 00150000 00000000 00000204 00000000 00000000 ....................ò.a.....1.E. 000040
08681D70 00490000 00000000 000001FF 00000000 00000000 025F0000 0000085E ^....._.....................1.p.h. 000060
00000890 1E1E0210 00000000 087C1DF2 006A0000 00000872 1D950051 00000000 ....Q...r.....j.·.|............. 000080
00000000 08A41E68 00510000 0000089A 1E430049 00000000 00000000 02040000 .............I.C.......Q.h.Ê..... 0000A0
01FF0000 00000000 00000234 00000000 08CC1F3C 001A0000 000008AE 1F10006A j...Ü.......<.ä.....4........... 0000C0
1FE8001B 00000000 08E01F8C 00570000 00000806 1F670049 00000000 00000000 .........I.g.ø.....W...À.......ò. 0000E0
0912203F 00470000 000008FE 20130015 00000000 00000000 02360000 000008F4 ¶.....6............ ±.....G.7 .. 000100
00000930 20960018 00000000 091C206A 00150000 00000000 00000288 00000000 ...............j ......... 0... 000120
00000000 094420ED 009E0000 0000093A 20C100A1 00000000 00000000 02300000 ..0.........À.è :........Ù D..... 000140
00650000 00000962 2145009E 00000000 00000000 02040000 00000958 21190065 e..!X..................E!b.....e. 000160
22260083 00000000 098021FA 00150000 00000976 21CF0081 00000000 096C21A3 È!(.......ü!v......."!........£" 000180
09A822B0 00830000 0000099E 22520015 00000000 00000000 02040000 00000994 ...................R"........"´. 0001A0
00000000 0000009E 00000000 09CA2301 020F0000 000009B2 220C0213 00000000 ......É"ý.........#ò............. 0001C0
00000000 09E423B2 00800000 00000000 0000005F 09DA2342 00000000 007A0000 ..z.....B#Ö._.............#ö..... 0001E0
```

Dump of file SATURN:[PCCOMMON.DUMP.DLL]PDLSYN.TMP;1 on 18-APR-1990 10:48:45.27
File ID (771,27,0) End of file block 276 / Allocated 276

Virtual block number 251 (000000FB), 512 (0200) bytes

```
02880000 00000A0C 24F90080 00000000 00000000 009E0000 000009F8 2404020F ..å$%..................'$........ 000000
0000007A 00000000 00000000 00790000 00000A24 2598009E 00000000 00000000 ...........X$.....y.........z... 000020
00000000 02880000 00000A48 26270080 00000000 00000000 005F0A34 25E70000 ..Ö%4._.............'&H.......... 000040
00000A66 27BE0080 00000000 00000000 00790000 00000A5C 2788009E 00000000 .......'\.....y...........ƒ'f... 000060
00000000 00000000 00490000 00000000 00000277 00000000 0A8E286F 00400000 ..a.o(......w..........I......... 000080
02040000 00000AC0 28FE0062 00000000 0A98289A 00150000 00000000 00000227 '.............(......b.±(å....... 0000A0
292A0015 00000000 00000000 02270000 00000000 00000049 00000000 00000000 ........I..........'...........*) 0000C0
00000000 009E0000 00000B00 2A05023F 00000000 0A042909 00620000 00000ACA ò.....b.1)å.....?..*............ 0000E0
2A540000 0000007A 00000000 00000000 009C0000 00000000 000000AE 00000000 ....Ü....................z.....T* 000100
00000000 00000000 009E0000 00000B2E 2BF8023F 00000000 08102A94 005F0806 .._..*......?.%+................ 000120
02320000 00000B42 2CDC0226 00000000 08382C28 009C0000 00000000 000000AE Ö............+,8.....&.É,B.....2. 000140
2D500081 00000000 00000000 02A70000 00000860 2D32009D 00000000 084C2D07 .-L.......2-'.....[............]- 000160
00000000 02860000 00000000 00000015 00000000 00000000 02070000 00000412 ................................ 000180
00000000 00000015 00000000 00000000 02110000 00000000 00000015 00000000 ................................ 0001A0
00000000 08CE2D89 001F0000 00000008 00000015 00000000 00000000 02300000 ..0.........................-ö..... 0001C0
02320000 00000BE2 2DE0023C 00000000 08082D84 008F0000 00000000 00000238 ;...........Ç-À.....<.À-å.....2. 0001E0
```

Dump of file SATURN:[PCCOMMON.DUMP.DLL]PDLSYN.TMP;1 on 18-APR-1990 10:48:45.27
File ID (771,27,0) End of file block 276 / Allocated 276

Virtual block number 252 (000000FC), 512 (0200) bytes

```
2E360245 00000000 00000000 00090000 00000000 00000292 00000000 0C002E08 ..............................E.6. 000000
0C282E83 02380000 00000C1E 2E580271 00000000 00000000 00820000 00000C14 .................q.[.......;.".(. 000020
00000C46 2F220263 00000000 0C3C2EFD 02800000 00000C32 2ED80225 00000000 ....%.Ä.2........».<.....c."/F... 000040
00000000 00000000 02250000 00000C64 2F6C01F7 00000000 0C502F47 023A0000 ..:.G/P.....%.l/d.....%.......... 000060
02340000 00000C82 2FB60200 00000000 00000000 02630000 00000C78 2F910200 .../x.....c............Ñ/......4. 000080
00000209 00000000 0CAA3000 02650000 00000000 00000289 00000000 0C962FD8 Ü/.................e..0`......... 0000A0
0CD2306F 02620000 00000CBE 304A01F4 00000000 0C843025 02650000 00000000 .......e.%0Ç.....¶.J0/.....b.o0ø. 0000C0
00000000 00000248 00000000 0CE63094 00260000 00000000 00000241 00000000 ....A.........&..0!......K........ 0000E0
00000000 00000000 02630000 00000000 0000024C 00000000 000430C0 00290000 ..).å0.......L.........c......... 000100
020A0000 00000D22 3111002A 00000000 00000000 024F0000 00000018 30EC0200 ..å0.......0.........*..1"....... 000120
31840253 00000000 00403188 00770000 00000036 31620220 00000000 002C3130 «1,...... .b16.....w..1à.....S.Ç1 000140
00683223 01FB0000 0000005E 31FE0250 00000000 00543109 02240000 0000004A J.....$.\1T.....].±1^.....«.#2h. 000160
00000086 3292022A 00000000 007C3260 02440000 00000072 32480220 00000000 ....-.H2r.....D.m2|......*..2.... 000180
00000000 00A43302 00550000 0000009A 320C0223 00000000 009032B7 01FC0000 ..».Ñ2.......#.É2.......U..3É..... 0001A0
00040000 00000DC2 33530243 00000000 00000000 02680000 000000B8 332E0279 y..3¡.....h..........C.S3ó........ 0001C0
00000227 00000000 00000000 00490000 00000000 00000277 00000000 00EA3378 x3ó.....w..........I.........'... 0001E0
```

Dump of file SATURN:[PCCOMMON.DUMP.DLL]PDLSYN.TMP;1 on 18-APR-1990 10:48:45.27
File ID (771,27,0) End of file block 276 / Allocated 276

```
Virtual block number 253 (000000FD), 512 (0200) bytes

 0E12342A 00060000 000000FE 33FF001D 00000000 00F433A3 00150000 00000000 ........É3¶........3±.......*4.. 000000
 00000E26 34ED0012 00000000 0E1C3455 00150000 00000000 00000239 00000000 ....9...........U4........Ü4&... 000020
 00000000 00000000 02220000 00000E44 35430283 00000000 0E303518 00950000 .....50.......C5D.....".......... 000040
 00150000 00000000 00000201 00000000 0E6235DE 02210000 00000E4E 35800015 ...5N.....!.85b.................. 000060
 0000000C 00000000 0E8C3679 02020000 00000000 00000015 00000000 0E763628 (6v.................y6¥......... 000080
 00000000 000C0000 00000000 00000064 00000000 00000000 02020000 00000000 ................d................ 0000A0
 00000EC6 36C90258 00000000 00000000 00640000 00000000 00000202 00000000 ..... .........d.........X.è66... 0000C0
 00000000 00000000 025E0000 00000EE4 37450070 00000000 0ED03719 00030000 .....7Ä.....p.E7Ð.....^......... 0000E0
 004C0000 00000F02 3800000E 00000000 0EF837D4 00700000 00000EEE 37710003 ..q7Ÿ.....p.å7%........8......L. 000100
 388B004C 00000000 070C3858 000E0000 00000000 000001F6 00000000 0F16382C ,8......-...........X8É.....L.É8 000120
 00000000 02080000 00000F48 39130050 00000000 0F3438E7 00130000 00000F2A *.......Ó84.....P..9H........... 000140
 00000F66 39CE003B 00000000 0F5C39A2 00500000 00000F52 393F0013 00000000 ......?9R.....P.Å9\.....;.ð9f... 000160
 00000000 0F843A26 00380000 00000000 00000227 00000000 0F7A39FA 00560000 ..V.ª9z.....'.........;.&:...... 000180
 00560000 00000FA2 3AB50038 00000000 00000000 02560000 00000F98 3A890056 V..:......V.........;.ç:Å.....V. 0001A0
 00000249 00000000 0FCA3870 00780000 00000FB6 38440034 00000000 0FAC3818 .;¯.....4.D;Ñ.....x.p;ð.....I... 0001C0
 00000000 02350000 00000FE8 38FF0078 00000000 0FD43B9C 00340000 00000000 ......4..;å.....x..;Ô.....5..... 0001E0

Dump of file SATURN:[PCCOMMON.DUMP.DLL]PDLSYN.TMP;1 on 18-APR-1990 10:48:45.27
File ID (771,27,0)   End of file block 276 / Allocated 276

Virtual block number 254 (000000FE), 512 (0200) bytes

 00000000 00000231 00000000 10063C8E 00780000 00000FF2 3C280034 00000000 ....4.+<·.....x..<......1....... 000000
 00000000 00000000 02460000 00001024 301D0078 00000000 10103CBA 00340000 ..4.¤<......x..=$.....F......... 000020
 00750000 00001042 3008002D 00000000 10383DAC 00780000 0000102E 30490034 4.I=......x.¯=8.....-.Ä=8.....u. 000040
 3E930075 00000000 10603E30 002D0000 00000000 00000266 00000000 10563E04 .>V.....f.........-.0>'.....u..> 000060
 10883F22 00750000 0000107E 3E8F002D 00000000 00000000 02400000 00001074 t.....M.........-.¢>~.....u."?.. 000080
 00000000 00000254 00000000 10A63F7A 006E0000 00001092 3F4E0035 00000000 ....5.N?......n.z?I.....T....... 0000A0
 00000000 00000000 02120000 000010C4 4009006E 00000000 10B03FA6 00350000 ..5.Ï?¯.....n..@á............... 0000C0
 00350000 00000000 00000238 00000000 10E24098 006E0000 000010CE 40350035 5.5@ð.....n..@â.....8.........5. 0000E0
 41530035 00000000 00000000 026C0000 00001100 4127006E 00000000 10EC40C4 Ä@ì.....n.'A......l.........5.SA 000100
 1132420E 00760000 0000111E 41E20017 00000000 111441B6 006E0000 0000110A ......n.ÑA........âA......v..B2. 000120
 0000115A 42900076 00000000 113C423A 00170000 00000000 00000267 00000000 ....g............:B<.....v..BZ... 000140
 00000000 116442C9 02710000 00000000 00000015 00000000 00000000 02450000 ..E...................q.èBd..... 000160
 02450000 00000000 00000036 00000000 11824320 000C0000 0000116E 42F50049 I.%Bn....... C......6.........E. 000180
 43C7009E 00000000 11A04370 02710000 00000000 00000082 00000000 1196434B KC................q.pC........ÚC 0001A0
 11C8444A 02540000 000011BE 441F01F8 00000000 118443F3 007E0000 000011AA ˆ.....~.µCÇ.....%..D/.....T.JDÈ. 0001C0
 000011E6 45150226 00000000 11DC44C5 02540000 000011D2 449A01F8 00000000 ....%..D@.....T.éDÉ.....&..EÌ... 0001E0

Dump of file SATURN:[PCCOMMON.DUMP.DLL]PDLSYN.TMP;1 on 18-APR-1990 10:48:45.27
File ID (771,27,0)   End of file block 276 / Allocated 276

Virtual block number 255 (000000FF), 512 (0200) bytes

 00000000 12044596 00490000 000011FA 45680084 00000000 11F04540 02320000 ..2.@Eþ.......kE*.....I..E...... 000000
 00850000 00001222 45EE0049 00000000 00000000 02040000 00001218 45C20085 ..ðE................I.ŸE"....... 000020
 46F30232 00000000 124046A3 02540000 00001236 467801F8 00000000 122C464C LF,.....%.xF6.....T.ÈF@.....2.µF 000040
 1272477C 00210000 0000125E 471E00A3 00000000 00000000 02150000 00001254 T...............È..G^.....!.|Gr. 000060
 00001290 47D30032 00000000 127C47A7 00810000 00000000 00000230 00000000 ....*...........ÌG|.....2.£G.... 000080
 00000000 12AE482A 00280000 0000129A 47FE0084 00000000 00000000 02600000 ..'...........±G......+.*HÙ..... 0000A0
 01FE0000 000012C2 4881028C 00000000 12884855 00840000 00000000 00000250 P...........UH¦.........Hô.....±. 0000C0
 492D027E 00000000 12E04902 025A0000 00000BBA 48D701FD 00000000 12CC48AC ˜Hä.....».æHo.....Z..IÅ.....¬.-I 0000E0
 130849A2 02060000 000012FE 497D0280 00000000 12F44958 02640000 000012EA ð.....d.XI¶........)I±........ÅI.. 000100
 00001326 4A110203 00000000 131C49EC 02600000 00001312 49C70247 00000000 ....G.úI......m.&I.........J&... 000120
 00000000 13444A80 02820000 0000133A 4A58022B 00000000 13304A36 022C0000 ....6JD.....+.[J:.........JD..... 000140
 024C0000 00001362 4AEF027A 00000000 13584ACA 024A0000 0000134E 4AA5027F ..ÉJN.....J.ðJX.....z.ŸJb.....L. 000160
 4B830281 00000000 13804B5E 01F90000 00001376 4B39024B 00000000 136C4B14 .Kl.....K.9Kv.....*.^K.........K 000180
 13A84BF2 02720000 0000139E 4BCD028E 00000000 13944BA8 027D0000 0000138A ......).´K.........ëK......r. K´. 0001A0
 000013C6 4C61027B 00000000 138C4C3C 01F50000 00001382 4C170255 00000000 ....U..Lý.....%.<L¥.....(.aLo  . 0001C0
 00000000 13E44CD0 02520000 000013DA 4CAB0297 00000000 13D04C86 027C0000 ..|..LÅ.......¨LÖ.....R.ÅLö....  0001E0

Dump of file SATURN:[PCCOMMON.DUMP.DLL]PDLSYN.TMP;1 on 18-APR-1990 10:48:45.27
File ID (771,27,0)   End of file block 276 / Allocated 276
```

Virtual block number 256 (00000100), 512 (0200) bytes

```
020E0000 00001402 4D3F0290 00000000 13F84D1A 02910000 000013EE 4CF50208 ..%LŸ........M%.......?M........ 000000
4D030237 00000000 14204DAE 020C0000 00001416 4D890200 00000000 140C4D64 dM.........M........ÜM .....7.ÆM 000020
14484E42 02740000 0000143E 4E100273 00000000 143440F8 024E0000 0000142A *.....N.¥M4.....s..N>.....t.BNH. 000040
00000001 14660058 00000000 0F204E8C 02240000 00001452 4E670257 00000000 ....W.gNR.....$..N .....X.f..... 000060
1484008A 0001147E 00800001 14780076 00011472 006C0001 146C0062 00000000 ....b.l...l.r...v.x.....~....... 000080
000114A2 008C0001 149C00B2 00011496 00A80001 1490009E 0001148A 00940001 ..................ÿ.....¥.Å... 0000A0
00F80001 14C000EE 000114BA 00E40001 14B400DA 000114AE 00000001 14A800C6 ó.´..Å.Û...Ö.Ç...ð.¤...Ÿ.å...%. 0000C0
00000000 000114E4 01660008 14D80116 000114D2 010C0001 14CC0102 000114C6 ó.....ä.....@.....Ä...f.ð....... 0000E0
00021502 01B60000 00000000 000114FC 01AC0004 14F00184 000214EA 01700000 ..p.ð.....Þ...¯.•.........Ñ..... 000100
01F20000 00000000 00011520 01E80002 151401D4 00000000 00000001 150E01CA ò...........å.....Ô. ..........  000120
154A0288 0007153E 02420003 15380224 00011532 021A0002 152C0206 00021526 &..........2...$.8..B.>.....J. 000140
00011562 028A0001 155C02B0 00011556 02A60001 1550029C 00000000 00000002 ..........P...Ì.V...¯.\...¤.b... 000160
02F60001 158002EC 0001157A 02E20001 157402D8 0001156E 02CE0001 156802C4 ö.h...ö.n...Ä.t...ã.z...å.....~. 000180
15A403AA 0005159E 03780004 15980350 00041592 03280001 158C031E 00041586 ..........(.....P.....x.....´.Ê. 0001A0
000315C2 04220000 00000000 000115BC 04180005 158003E6 000315AA 03C80003 ..à.¯...Ì.¯.....¥.........".ð... 0001C0
04EA0002 15E00406 00000000 00000001 15DA04CC 000715CE 04860007 15C80440 Ø.à.....ð...ã.Ö.........ø.Å...ð. 0001E0
```

Dump of file SATURN:[PCCOMMON.DUMP.DLL]POLSYN.TMP;1 on 18-APR-1990 10:48:45.27
File ID (771,27,0)   End of file block 276 / Allocated 276

Virtual block number 257 (00000101), 512 (0200) bytes

```
16040526 00000000 00000001 FFFF051C 00000000 00000003 15F204FE 000215E6 Ì...±.·.......................&... 000000
00051622 058A0005 161C0558 00021616 05440000 00000000 00011610 053A0002 ..:...........D.....X.......".... 000020
00000002 164605EE 0002163A 05DA0002 163405C6 00000000 00000001 162E05BC ¥...........6.4...Ö.:....Ÿ.F..... 000040
1664062A 0001165E 06200000 00000000 00011658 06160002 164C0602 00000000 ......L.....X.......... .^...*.d. 000060
00021688 06660000 00000000 0002167C 06520002 1670063E 0001166A 06340001 ..4.j...>.p...R.|.........f..... 000080
00000001 16A60698 0002169A 06840000 00000000 00011694 067A0000 00000000 ......z.....................Ì..... 0000A0
16C406D4 0001168E 06CA0001 168806C0 000116B2 06B60002 16AC06A2 00000000 ....Å.¯...Ñ.ÿ...å.|...ð./...å.á. 0000C0
000A16E2 07060001 16DC06FC 000116D6 06F20001 16D006E8 000116CA 06DE0001 ..B.ð...Ö.Å...·.ø...•.É.....ã... 0000E0
00000001 17060800 000216FA 07EC0000 00000000 000116F4 07E2000C 16E8076A j.Ö...å.¶.........ã.•.......... 000100
17240846 00000000 00000001 171E083C 00031712 081E0002 170C080A 00000000 ..................<...........F.$. 000120
00011748 08AA0000 00000000 0004173C 08820000 00000000 00011730 08780005 ..x.0............<...........´.N... 000140
08FA0002 176008E6 00000000 00000001 175A080C 0004174E 08840000 00000000 ......Ç.N...É.Z..........Ì.'...•. 000160
17840922 00000000 00000001 177E0918 00021772 09040000 00000000 0001176C l............r.....~...........".... 000180
00000000 00000001 17A20968 00000000 00000003 1796094A 000217BA 09360002 ..6.....J............h.Å.......... 0001A0
09AE0000 00000000 000117C0 09A40000 00000000 000317B4 09860002 17A80972 r.´.....Ç..........Ê.å.........Ö. 0001C0
00000000 000117E4 0A620004 17D80A3A 000617D2 09FE0003 17CC09E0 000517C6 ó...Å.ã...±.@...:.Ä...b.ð....... 0001E0
```

Dump of file SATURN:[PCCOMMON.DUMP.DLL]POLSYN.TMP;1 on 18-APR-1990 10:48:45.27
File ID (771,27,0)   End of file block 276 / Allocated 276

Virtual block number 258 (00000102), 512 (0200) bytes

```
00041802 080C0006 17FC0AD0 00000000 00000005 17F60A9E 000517EA 0A6C0000 ..l.ð.....~..........Å.•......  . 000000
08660002 18200852 00000000 00000001 181A0848 0001180E 083E0001 18080834 4.....>.....H.............R. ...f. 000020
18440804 0002183E 08C00000 00000000 00011838 08B60004 182C088E 00041826 &.........Ñ.8..........å.>...å.D. 000040
00011862 0C2E0001 185C0C24 00011856 0C1A0005 185008E8 0001184A 08DE0001 ..B.J...Ö.P......V...$.\.....b... 000060
0C7E0002 18800C6A 0002187A 0C560001 18740C4C 0001186E 0C420001 18680C38 8.h...B.n...L.t...V.z._.j......~. 000080
18A40CBA 0001189E 0C800002 18980C9C 00021892 0C880000 00000000 0001188C ...........................¤.É. 0000A0
000118C2 0D1E0002 188C0D0A 00031886 0CEC0002 18800C08 000218AA 0CC40001 ..á.´...Å.¯...ã.Ñ.....¥.....ð... 0000C0
00640001 18E0005A 000118DA 0D500001 18D40D46 000118CE 0D3C0002 18C80028 (.à...<.ð...F.å...P.Ö...Z.Å...d. 0000E0
19040DA0 000218FE 0D8C0001 18F80D82 000118F2 0D780001 145A006E 000118E6 Ì...n.Z...x.·.....%.....±....... 000100
00011922 0DF00004 191C0DC8 00011916 0DBE0000 00000000 00021910 0DAA0001 ..´..........f.....à.....þ."... 000120
0E360001 19400E2C 0001193A 0E220001 19340E18 0002192E 0E040001 19280DFA ª.(............4...".:....x.@...6. 000140
196A0E9A 0003195E 0E7C0002 19580E68 00021952 0E540001 194C0E4A 00021946 F...J.L...T.R...h.X...|.^.....J. 000160
00000000 00000003 19820ED6 00021976 0EC20001 19700EB8 00000000 00000003 .........|.p...ð.v...ø.......... 000180
00000003 19A60F3A 0002199A 0F260000 00000000 00031994 0F080002 19880EF4 ¶..................&.....:.Ì..... 0001A0
19C40FA8 00000000 00000003 19BE0FBA 000319B2 0F6C0002 19AC0F58 00000000 ....X.¯...l.ÿ.....f..........´.á. 0001C0
00000000 00000003 19E21016 000319D6 0FF80003 19D00FDA 000319CA 0FBC0002 ..¥.ð...Ö.Å...%.ø.....ã......... 0001E0
```

Dump of file SATURN:[PCCOMMON.DUMP.DLL]POLSYN.TMP;1 on 18-APR-1990 10:48:45.27
File ID (771,27,0)   End of file block 276 / Allocated 276

```
Virtual block number 259 (00000103), 512 (0200) bytes

 10980002 1A001084 00000000 00000003 19FA1066 000319EE 10480002 19E81034 4.Ò...H.Ÿ...f.ª................. 000000
 1A241110 00000000 00000003 1A1E10F2 00031A12 10D40003 1A0C1086 00031A06 ....Ñ.....å....................$. 000020
 00011A42 116A0001 1A3C1160 00031A36 11420000 00000000 00031A30 11240002 ..$.0........B.6...'.<...j.B... 000040
 11CE0001 1A6011C4 00011A5A 11BA0001 1A5411B0 00021A4E 119C0004 1A481174 t.N.....N...¯.T...¤.Z...á.'...ö. 000060
 1A8411F6 00000000 00000001 1A7E11EC 00011A72 11E20001 1A6C11D8 00011A66 f...Ä.l...â.r...ß.-.........-... 000080
 00011AA2 123C0001 1A9C1232 00011A96 12280000 00000000 00031A90 120A0002 ..............(.....2.....<.Å... 0000A0
 12780002 1AC01264 00000000 00000001 1ABA125A 00000000 00000002 1AAE1246 F.Ô.........Z.¤.........d.å...x. 0000C0
 1AE412A0 00000000 00000001 1ADE1296 00021AD2 12820000 00000000 00011ACC ä...........Ø.....ß...........ð. 0000E0
 00011B02 120C0001 1AFC12D2 00011AF6 12C80001 1AF012BE 00011AEA 12B40002 ..Ç.õ.../.Þ...à.-...Ø.=...É..... 000100
 13180001 1B20130E 0001181A 13040001 1B1412FA 00011B0E 12F00001 1B0812E6 |.....Þ.....ª.................. 000120
 1B44134A 00011B3E 13400001 1B381336 00011B32 132C0001 1B2C1322 00011B26 &...".,....,.2...6.8...a.>...J.D. 000140
 00011B62 137C0001 1B5C1372 00011B56 13680001 1B50135E 00011B4A 13540001 ..T.J...^.P...h.V...r.\...|.b... 000160
 13B80001 1B8013AE 00011B7A 13A40001 1B74139A 00011B6E 13900001 1B681386 ..h.....n.....t...É.z...Ô.....|. 000180
 1BA413EA 000115FE 13E00001 1B981306 00011B92 13CC0001 1B8C13C2 00011B86 ....ô.....ß.....ø.....Å.±...õ.Ê. 0001A0
 00011BC2 141C0001 1BBC1412 00011BB6 14080001 1BB013FE 00011BAA 13F40001 ..¶.¯...±.¯.....Ñ.....¥.....' .. 0001C0
 6F500001 1BEC144E 00011BDA 14440001 1BD4143A 00011BCE 14300001 1BC81426 &.à...O.ð...:.å...D.Ö...N.ß... `o 0001E0

Dump of file SATURN:[PCCOMMON.DUMP.DLL]PDLSYN.TMP;1 on 18-APR-1990 10:48:45.27
File ID (771,27,0)   End of file block 276 / Allocated 276

Virtual block number 260 (00000104), 512 (0200) bytes

 676E6968 73755000 0A642520 666F2064 25203A65 74617473 20612067 6E697070 pping a state: %d of %d..Pushing 000000
 56555453 5251504F 4E4D4C4B 4A494847 46454443 4241000A 65746174 73206120  a state..ABCDEFGHIJKLMNOPQRSTUV 000020
 005F7A79 78777675 74737271 706F6E6D 6C6B6A69 68676665 64636261 5A595857 WXYZabcdefghijklmnopqrstuvwxyz_. 000040
 003E003C 0030002D 00393837 36353433 32313000 3F7D7B50 5B265E25 24234021 !@#$%^&[]()?.0123456789.-.=.<.>. 000060
 00021C82 1C0A0000 29002800 2E002700 22003A00 3B002C00 0920002F 002A002B +.*./. ..,.;.:.".'...(.)........ 000080
 1C5E0006 1CA01C5C 00051C9A 1C5A0009 1C941C58 00041C8E 1C4D0003 1C881C40 @.....M.....X.....Z.....\.....^. 0000A0
 1CC41C69 000C1CBE 1C66000B 1CB81C64 000A1CB2 1C620008 1CAC1C60 00071CA6 |...'.¯...b.ý...d.¦...f./...i.á. 0000C0
 00111CE2 1C730010 1CDC1C71 000F1CD6 1C6F000E 1CD01C6D 00121CCA 1C6B0000 ..k.ð...m.Å...o.ø...q.É...s.â... 0000E0
 00000000 00000000 00000000 00000000 00000000 00143BB8 1C770013 1CE81C75 u.Ò...w.|;...................... 000100
 00000000 00000000 00000000 00000000 00000000 00000000 00000000 00000000 ................................ 000120
 00000000 00000000 00000000 00000000 00000000 00000000 00000000 00000000 ................................ 000140
 00000000 00000000 00000000 00000000 00000000 00000000 00000000 00000000 ................................ 000160
 00000000 00000000 00000000 00000000 00000000 00000000 00000000 00000000 ................................ 000180
 00000000 00000000 00000000 00000000 00000000 00000000 00000000 00000000 ................................ 0001A0
 00000000 00000000 00000000 00000000 00000000 00000000 00000000 00000000 ................................ 0001C0
 00000000 00000000 00000000 00000000 00000000 00000000 00000000 00000000 ................................ 0001E0

Dump of file SATURN:[PCCOMMON.DUMP.DLL]PDLSYN.TMP;1 on 18-APR-1990 10:48:45.27
File ID (771,27,0)   End of file block 276 / Allocated 276

Virtual block number 261 (00000105), 512 (0200) bytes

 00000000 00000000 00000000 00000000 00000000 00000000 00000000 00000000 ................................ 000000
 00000000 00000000 00000000 00000000 00000000 00000000 00000000 00000000 ................................ 000020
 00000000 00000000 00000000 00000000 00000000 00000000 00000000 00000000 ................................ 000040
 00000000 00000000 00000000 00000000 00000000 00000000 00000000 00000000 ................................ 000060
 00000000 00000000 00000000 00000000 00000000 00000000 00000000 00000000 ................................ 000080
 00000000 00000000 00000000 00000000 00000000 00000000 00000000 00000000 ................................ 0000A0
 00000000 00000000 00000000 00000000 00000000 00000000 00000000 00000000 ................................ 0000C0
 00000000 00000000 00000000 00000000 00000000 00000000 00000000 00000000 ................................ 0000E0
 4C494620 464F2044 4E450027 00000000 00000000 00000000 00000000 00000000 ...................'.END OF FIL 000100
 2000005C 005C002D 002D0077 6F6C4600 2D002D00 776F6C46 00202620 00000A45 E... & .Flow.-.-.Flow.-.-.\.\..  000120
 48202020 20202020 20202020 20202020 20202028 28282828 20202020 20202020          (((((               H 000140
 10101010 10101084 84848484 84848484 84101010 10101010 10101010 10101010 ................................ 000160
 10101010 10100101 01010101 01010101 01010101 01010101 01018181 81818181 ................................ 000180
 00201010 10100202 02020202 02020202 02020202 02020202 02028282 82828282 ............................... . 0001A0
 00000000 00000000 00000000 00000000 00000000 00000000 00000000 00000000 ................................ 0001C0
 00000000 00000000 00000000 00000000 00000000 00000000 00000000 00000000 ................................ 0001E0

Dump of file SATURN:[PCCOMMON.DUMP.DLL]PDLSYN.TMP;1 on 18-APR-1990 10:48:45.27
File ID (771,27,0)   End of file block 276 / Allocated 276
```

```
Virtual block number 262 (00000106), 512 (0200) bytes

00000000 00000000 00000000 00000000 00000000 00000000 00000000 00000000 ................................ 000000
00000000 00000000 00000000 00000000 00000000 00000000 00000000 00000000 ................................ 000020
1FE81CEE 1FEA1CF0 20001CF8 202E2740 202A2630 20262764 202226A6 FFFF2C16 .,..|&" d'& 0&* a'. %.. b.õ.\ ). 000040
296C6C75 6E280000 00000000 00000000 1C9C1C49 22751EDE 22771EE0 22141E5A Z.."Å.w"B.u"I.............(nul\; 000060
2F062078 2F062074 2F062070 2F0638A2 2F060000 23202D28 00296C6C 756E2800 .(null).+- #.../Å;./p ./t ./x ./ 000080
00000000 000080C0 E0F0F8FC FEFF0000 00007878 31364D05 01010000 0000207C | .......M61xx.....±•½þÅâ....... 0000A0
00000000 00000000 00000000 00000000 00000000 00000000 00000000 00000000 ................................ 0000C0
00000000 00000000 00000000 00000000 00000000 00000000 00000000 00000000 ................................ 0000E0
00000000 00000000 00000000 00000000 00000000 00000000 00000000 00000000 ................................ 000100
00000000 00000000 00000000 00000000 00000000 00000000 00000000 00000000 ................................ 000120
FFFFFFFF 00000000 00000000 00000000 00000000 00000000 00000000 00000000 ................................ 000140
00000000 00000000 00000000 00000000 00000000 00303030 28650000 7FEFFFFF ..ÿ...e+000..................... 000160
00000000 00000000 00000000 00000000 00000000 00000000 00000000 00000000 ................................ 000180
00000000 00000000 00000000 00000000 00000000 00000000 00000000 00000000 ................................ 0001A0
00000000 00000000 00000000 00000000 00000000 00000000 00000000 00000000 ................................ 0001C0
00000000 00000000 00000000 00000000 00000000 00000000 00000000 00000000 ................................ 0001E0

Dump of file SATURN:[PCCOMMON.DUMP.DLL]PDLSYN.TMP;1 on 18-APR-1990 10:48:45.27
File ID (771,27,0)    End of file block 276 / Allocated 276

Virtual block number 263 (00000107), 512 (0200) bytes

00000000 00000000 00000000 00000000 00000000 00000000 00000000 00000000 ................................ 000000
00000000 00000000 00000000 00000000 00000000 00000000 00000000 00000000 ................................ 000020
00000000 00000000 00000000 00000000 00000000 00000000 00000000 00000000 ................................ 000040
00000000 00000000 00000000 00000000 00000000 00000000 00000000 00000000 ................................ 000060
00000000 00000000 00000000 00000000 00000000 00000000 00000000 00000000 ................................ 000080
00000000 00000000 00000000 00000000 00000000 00000000 00000000 00000000 ................................ 0000A0
00000000 00000000 00000000 00000000 00000000 00000000 00000000 00000000 ................................ 0000C0
2E9F3EE0 3EE00000 00002164 00000000 00000000 00000000 00000000 00000000 ..................dl....Å>Å>.. 0000E0
00000000 00000000 00000000 00000000 00000000 00000000 00000000 38C83EE0 Å>à;............................ 000100
00000000 00000000 00000000 00000000 00000000 00000000 00000000 00000000 ................................ 000120
00000000 00000000 00000000 00000000 00000000 00000000 00000000 00000000 ................................ 000140
00000000 00000000 00000000 00000000 00000000 00000000 00000000 00000000 ................................ 000160
00000000 00000000 00000000 00000000 00000000 00000000 00000900 00000000 ................................ 000180
00000000 00000000 00000000 00000000 00000000 00000000 00000000 00000000 ................................ 0001A0
00000000 00000000 00000000 00000000 00000000 00000000 00000000 00000000 ................................ 0001C0
00000000 00000000 00000000 00000000 00000000 00000000 00000000 00000000 ................................ 0001E0

Dump of file SATURN:[PCCOMMON.DUMP.DLL]PDLSYN.TMP;1 on 18-APR-1990 10:48:45.27
File ID (771,27,0)    End of file block 276 / Allocated 276

Virtual block number 264 (00000108), 512 (0200) bytes

00000000 00000000 00000000 00000000 00000000 00000000 00000000 00000000 ................................ 000000
00000000 00000000 00000000 00000000 00000000 00000000 00000000 00000000 ................................ 000020
00000000 00000000 00000000 00000000 00000000 00000000 00000000 00000000 ................................ 000040
00000000 00000000 00000000 00000000 00000000 00000000 00000000 00000000 ................................ 000060
00000000 00000000 00000000 00000000 00000000 00000000 00000000 00000000 ................................ 000080
00000000 00000000 00000000 00000000 00000000 00000000 00000000 00000000 ................................ 0000A0
00000000 00000000 00000000 00000000 00000000 00000000 00000000 00000000 ................................ 0000C0
00000000 00000000 00000000 00000000 00000000 00000000 00000000 00000000 ................................ 0000E0
00000000 00000000 00000000 00000000 00000000 00000000 00000000 00000000 ................................ 000100
00000000 00000000 00000000 00000000 00000000 00000000 00000000 00000000 ................................ 000120
00000000 00000000 00000000 00000000 00000000 00000000 00000000 00000000 ................................ 000140
00000000 00000000 00000000 00000000 00000000 00000000 00000000 00000000 ................................ 000160
00000000 00000000 00000000 00000000 00000000 00000000 00000000 00000000 ................................ 000180
00000000 00000000 00000000 00000000 00000000 00000000 00000000 00000000 ................................ 0001A0
00000000 00000000 00000000 00000000 00000000 00000000 00000000 00000000 ................................ 0001C0
00000000 00000000 00000000 00000000 00000000 00000000 00000000 00000000 ................................ 0001E0

Dump of file SATURN:[PCCOMMON.DUMP.DLL]PDLSYN.TMP;1 on 18-APR-1990 10:48:45.27
File ID (771,27,0)    End of file block 276 / Allocated 276
```

```
Virtual block number 265 (00000109), 512 (0200) bytes

 00000000 00000000 00000000 00000000 00000000 00000000 00000000 00000000 ................................ 000000
 00000000 00000000 00000000 00000000 00000000 00000000 00000000 00000000 ................................ 000020
 00000000 00000000 00000000 00000000 00000000 00000000 00000000 00000000 ................................ 000040
 00000000 00000000 00000000 00000000 00000000 00000000 00000000 00000000 ................................ 000060
 00000000 00000000 00000000 00000000 00000000 00000000 00000000 00000000 ................................ 000080
 00000000 00000000 00000000 00000000 00000000 00000000 00000000 00000000 ................................ 0000A0
 00000000 00000000 00000000 00000000 00000000 00000000 00000000 00000000 ................................ 0000C0
 00000000 00000000 00000000 00000000 00000000 00000000 00000000 00000000 ................................ 0000E0
 00000000 0001FFFF 00000000 26F80000 003D4F46 4E495F45 4C49465F 435F22E0 Â"_C_FILE_INFO=..¥&............ 000100
 00000000 00000000 00000000 02020000 00000000 00000000 01020000 00000000 ................................ 000120
 00000000 00000000 00000000 00000000 00000000 00000000 00000000 00000000 ................................ 000140
 00000000 00000000 00000000 00000000 00000000 00000000 00000000 00000000 ................................ 000160
 00000000 00000000 00000000 00000000 00000000 00000000 00000000 00000000 ................................ 000180
 00000000 00000000 00000000 00000000 00000000 00000000 00000000 00000000 ................................ 0001A0
 00000000 00000000 00000000 00000000 00000000 00000000 00000000 00000000 ................................ 0001C0
 00000000 00000000 00000000 00000000 00000000 00000000 00000000 00000000 ................................ 0001E0

Dump of file SATURN:[PCCOMMON.DUMP.DLL]PDLSYN.TMP;1 on 18-APR-1990 10:48:45.27
File ID (771,27,0)   End of file block 276 / Allocated 276

Virtual block number 266 (0000010A), 512 (0200) bytes

 00000000 00000000 00000000 00000000 00000000 00000000 00000000 00000000 ................................ 000000
 00000000 00000000 00000000 00000000 00000000 00000000 00000000 00000000 ................................ 000020
 00000000 00000000 00000000 00000000 00000000 00000000 00000000 00000000 ................................ 000040
 00000000 00000000 00000000 00000000 00000000 00000000 00000000 00000000 ................................ 000060
 00000000 00000000 00000000 00000000 00000000 00000000 00000000 00000000 ................................ 000080
 00000000 00000000 00000000 00000000 00000000 00000000 00000000 00000000 ................................ 0000A0
 00000000 00000000 00000000 00000000 00000000 00000000 00000000 00000000 ................................ 0000C0
 00000000 00000000 00000000 00000000 00000000 00000000 00000000 00000000 ................................ 0000E0
 00000000 00000000 00000000 00000000 00000000 00000000 00000000 00000000 ................................ 000100
 00000000 00000000 00000000 00000000 00000000 00000000 00000000 00000000 ................................ 000120
 00000000 00000000 00000000 00000000 00000000 00000000 00000000 00000000 ................................ 000140
 00000000 00000000 00000000 00000000 00000000 00000000 00000000 00000000 ................................ 000160
 00000000 00000000 00000000 00000000 00000000 00000000 00000000 00000000 ................................ 000180
 00000000 00000000 00000000 00000000 00000000 00000000 00000000 00000000 ................................ 0001A0
 00000000 00000000 00000000 00000000 00000000 00000000 00000000 00000000 ................................ 0001C0
 00000000 00000000 00000000 00000000 00000000 00000000 00000000 00000000 ................................ 0001E0

Dump of file SATURN:[PCCOMMON.DUMP.DLL]PDLSYN.TMP;1 on 18-APR-1990 10:48:45.27
File ID (771,27,0)   End of file block 276 / Allocated 276

Virtual block number 267 (0000010B), 512 (0200) bytes

 00000000 00000000 00000000 00000000 00000000 00000000 00000000 00000000 ................................ 000000
 00000000 00000000 00000000 00000000 00000000 00000000 00000000 00000000 ................................ 000020
 00000000 00000000 00000000 00000000 00000000 00000000 00000000 00000000 ................................ 000040
 00000000 00000000 00000000 00000000 00000000 00000000 00000000 00000000 ................................ 000060
 00000000 00000000 00000000 00000000 00000000 00000000 00000000 00000000 ................................ 000080
 00000000 00000000 00000000 00000000 00000000 00000000 00000000 00000000 ................................ 0000A0
 00000000 00000000 00000000 00000000 00000000 00000000 00000000 00000000 ................................ 0000C0
 00000000 00000000 00000000 00000000 00000000 00000000 00000000 00000000 ................................ 0000E0
 00000000 00000000 00000000 00000000 00000000 00000000 00000000 00000000 ................................ 000100
 00000000 00000000 00000000 00000000 00000000 00000000 00000000 00000000 ................................ 000120
 00000000 00000000 00000000 00000000 00000000 00000000 00000000 00000000 ................................ 000140
 00000000 00000000 00000000 00000000 00000000 00000000 00000000 00000000 ................................ 000160
 00000000 00000000 00000000 00000000 00000000 00000000 00000000 00000000 ................................ 000180
 00000000 00000000 00000000 00000000 00000000 00000000 00000000 00000000 ................................ 0001A0
 00000000 00000000 00000000 00000000 00000000 00000000 00000000 00000000 ................................ 0001C0
 00000000 00000000 00000000 00000000 00000000 00000000 00000000 00000000 ................................ 0001E0

Dump of file SATURN:[PCCOMMON.DUMP.DLL]PDLSYN.TMP;1 on 18-APR-1990 10:48:45.27
File ID (771,27,0)   End of file block 276 / Allocated 276
```

```
Virtual block number 268 (0000010C), 512 (0200) bytes

00000000 00000000 00000000 00000000 00000000 00000000 00000000 00000000 ................................ 000000
00000000 00000000 00000000 00000000 00000000 00000000 00000000 00000000 ................................ 000020
00000000 00000000 00000000 00000000 00000000 00000000 00000000 00000000 ................................ 000040
00000000 00000000 00000000 00000000 00000000 00000000 00000000 00000000 ................................ 000060
00000000 00000000 00000000 00000000 00000000 00000000 00000000 00000000 ................................ 000080
00000000 00000000 00000000 00000000 00000000 00000000 00000000 00000000 ................................ 0000A0
00000000 00000000 00000000 00000000 00000000 00000000 00000000 00000000 ................................ 0000C0
00000000 00000000 00000000 00000000 00000000 00000000 00000000 00000000 ................................ 0000E0
00000000 00000000 00000000 00000000 00000000 00000000 00000000 00000000 ................................ 000100
00000000 00000000 00000000 00000000 00000000 00000000 00000000 00000000 ................................ 000120
00000000 00000000 00000000 00000000 00000000 00000000 00000000 00000000 ................................ 000140
00000000 00000000 00000000 00000000 00000000 00000000 00000000 00000000 ................................ 000160
00000000 00000000 00000000 00000000 00000000 00000000 00000000 00000000 ................................ 000180
00000000 00000000 00000000 00000000 00000000 00000000 00000000 00000000 ................................ 0001A0
00000000 00000000 00000000 00000000 00000000 00000000 00000000 00000000 ................................ 0001C0
00000000 00000000 00000000 00000000 00000000 00000000 00000000 00000000 ................................ 0001E0

Dump of file SATURN:[PCCOMMON.DUMP.DLL]PDLSYN.TMP;1 on 18-APR-1990 10:48:45.27
File ID (771,27,0)   End of file block 276 / Allocated 276

Virtual block number 269 (0000010D), 512 (0200) bytes

00000000 00000000 00000000 00000000 00000000 00000000 00000000 00000000 ................................ 000000
00000000 00000000 00000000 00000000 00000000 00000000 00000000 00000000 ................................ 000020
00000000 00000000 00000000 00000000 00000000 00000000 00000000 00000000 ................................ 000040
00000000 00000000 00000000 00000000 00000000 00000000 00000000 00000000 ................................ 000060
00000000 00000000 00000000 00000000 00000000 00000000 00000000 00000000 ................................ 000080
00000000 00000000 00000000 00000000 00000000 00000000 00000000 00000000 ................................ 0000A0
00000000 00000000 00000000 00000000 00000000 00000000 00000000 00000000 ................................ 0000C0
00000000 00000000 00000000 00000000 00000000 00000000 00000000 00000000 ................................ 0000E0
00000000 00000000 00000000 00000000 00000000 00000000 00000000 00000000 ................................ 000100
00000000 00000000 00000000 00000000 00000000 00000000 00000000 00000000 ................................ 000120
00000000 00000000 00000000 00000000 00000000 00000000 00000000 00000000 ................................ 000140
00000000 00000000 00000000 00000000 00000000 00000000 00000000 00000000 ................................ 000160
00000000 00000000 00000000 00000000 00000000 00000000 00000000 00000000 ................................ 000180
00000000 00000000 00000000 00000000 00000000 00000000 00000000 00000000 ................................ 0001A0
00000000 00000000 00000000 00000000 00000000 00000000 00000000 00000000 ................................ 0001C0
00000000 00000000 00000000 00000000 00000000 00000000 00000000 00000000 ................................ 0001E0

Dump of file SATURN:[PCCOMMON.DUMP.DLL]PDLSYN.TMP;1 on 18-APR-1990 10:48:45.27
File ID (771,27,0)   End of file block 276 / Allocated 276

Virtual block number 270 (0000010E), 512 (0200) bytes

00000000 00000000 00000000 00000000 00000000 00000000 00000000 00000000 ................................ 000000
00000000 00000000 00000000 00000000 00000000 00000000 00000000 00000000 ................................ 000020
00000000 00000000 00000000 00000000 00000000 00000000 00000000 00000000 ................................ 000040
00000000 00000000 00000000 00000000 00000000 00000000 00000000 00000000 ................................ 000060
00000000 00000000 00000000 00000000 00000000 00000000 00000000 00000000 ................................ 000080
00000000 00000000 00000000 00000000 00000000 00000000 00000000 00000000 ................................ 0000A0
00000000 00000000 00000000 00000000 00000000 00000000 00000000 00000000 ................................ 0000C0
00000000 00000000 00000000 00000000 00000000 00000000 00000000 00000000 ................................ 0000E0
00000000 00000000 00000000 00000000 00000000 00000000 00000000 00000000 ................................ 000100
00000000 00000000 00000000 00000000 00000000 00000000 00000000 00000000 ................................ 000120
00000000 00000000 00000000 00000000 00000000 00000000 00000000 00000000 ................................ 000140
00000000 00000000 00000000 00000000 00000000 00000000 00000000 00000000 ................................ 000160
00000000 00000000 00000000 00000000 00000000 00000000 00000000 00000000 ................................ 000180
00000000 00000000 00000000 00000000 00000000 00000000 00000000 00000000 ................................ 0001A0
00000000 00000000 00000000 00000000 00000000 00000000 00000000 00000000 ................................ 0001C0
00000000 00000000 00000000 00000000 00000000 00000000 00000000 00000000 ................................ 0001E0

Dump of file SATURN:[PCCOMMON.DUMP.DLL]PDLSYN.TMP;1 on 18-APR-1990 10:48:45.27
File ID (771,27,0)   End of file block 276 / Allocated 276
```

```
Virtual block number 271 (0000010F), 512 (0200) bytes

00000000 00000000 00000000 00000000 00000000 00000000 00000000 00000000 ................................ 000000
00000000 00000000 00000000 00000000 00000000 00000000 00000000 00000000 ................................ 000020
00000000 00000000 00000000 00000000 00000000 00000000 00000000 00000000 ................................ 000040
00000000 00000000 00000000 00000000 00000000 00000000 00000000 00000000 ................................ 000060
00000000 00000000 00000000 00000000 00000000 00000000 00000000 00000000 ................................ 000080
00000000 00000000 00000000 00000000 00000000 00000000 00000000 00000000 ................................ 0000A0
00000000 00000000 00000000 00000000 00000000 00000000 00000000 00000000 ................................ 0000C0
00000000 00000000 00000000 00000000 00000000 00000000 00000000 00000000 ................................ 0000E0
00000000 00000000 00000000 00000000 00000000 00000000 02000001 00000000 ................................ 000100
00000000 00000000 00000000 00000000 00000000 00000000 00000000 00000000 ................................ 000120
00000000 00000000 00000000 00000000 00000000 00000000 00000000 00000000 ................................ 000140
00000000 00000000 00000000 00000000 00000000 00000000 00000000 00000000 ................................ 000160
00000000 00000000 00000000 00000000 00000000 00000000 00000000 00000000 ................................ 000180
00000000 00000000 00000000 00000000 00000000 00000000 00000000 00000000 ................................ 0001A0
00000000 00000000 00000000 00000000 00000000 00000000 00000000 00000000 ................................ 0001C0
00000000 00000000 00000000 00000000 00000000 00000000 00000000 00000000 ................................ 0001E0

Dump of file SATURN:[PCCOMMON.DUMP.DLL]PDLSYN.TMP;1 on 18-APR-1990 10:48:45.27
File ID (771,27,0)   End of file block 276 / Allocated 276

Virtual block number 272 (00000110), 512 (0200) bytes

00000000 00000000 00000000 00000000 00000000 00000000 00000000 00000000 ................................ 000000
00000000 00000000 00000000 00000000 00000000 00000000 00000000 00000000 ................................ 000020
00000000 00000000 00000000 00000000 00000000 00000000 00000000 00000000 ................................ 000040
00000000 00000000 00000000 00000000 00000000 00000000 00000000 00000000 ................................ 000060
00000000 00000000 00000000 00000000 00000000 00000000 00000000 00000000 ................................ 000080
00000000 00000000 00000000 00000000 00000000 00000000 00000000 00000000 ................................ 0000A0
00000000 00000000 00000000 00000000 00000000 00000000 00000000 00000000 ................................ 0000C0
00000000 00000000 00000000 00000000 00000000 00000000 00000000 00000000 ................................ 0000E0
00000000 00000000 00000000 00000000 00000000 00000000 00000000 00000000 ................................ 000100
00000000 00000000 00000000 00000000 00000000 00000000 00000000 00000000 ................................ 000120
00000000 00000000 00000000 00000000 00000000 00000000 00000000 00000000 ................................ 000140
00000000 00000000 00000000 00000000 00000000 00000000 00000000 00000000 ................................ 000160
00000000 00000000 00000000 00000000 00000000 00000000 00000000 00000000 ................................ 000180
00000000 00000000 00000000 00000000 00000000 00000000 00000000 00000000 ................................ 0001A0
00000000 00000000 00000000 00000000 00000000 00000000 00000000 00000000 ................................ 0001C0
00000000 00000000 00000000 00000000 00000000 00000000 00000000 00000000 ................................ 0001E0

Dump of file SATURN:[PCCOMMON.DUMP.DLL]PDLSYN.TMP;1 on 18-APR-1990 10:48:45.27
File ID (771,27,0)   End of file block 276 / Allocated 276

Virtual block number 273 (00000111), 512 (0200) bytes

00000000 00000000 00000000 00000000 00000000 00000000 00000000 00000000 ................................ 000000
00000000 00000000 00000000 00000000 00000000 00000000 00000000 00000000 ................................ 000020
00000000 00000000 00000000 00000000 00000000 00000000 00000000 00000000 ................................ 000040
00000000 00000000 00000000 00000000 00000000 00000000 00000000 00000000 ................................ 000060
00000000 00000000 00000000 00000000 00000000 00000000 00000000 00000000 ................................ 000080
00000000 00000000 00000000 00000000 00000000 00000000 00000000 00000000 ................................ 0000A0
00000000 00000000 00000000 00000000 00000000 00000000 00000000 00000000 ................................ 0000C0
00000000 00000000 00000000 00000000 00000000 00000000 00000000 00000000 ................................ 0000E0
00000000 00000000 00000000 00000000 00000000 00000000 00000000 00000000 ................................ 000100
00000000 00000000 00000000 00000000 00000000 00000000 00000000 00000000 ................................ 000120
00000000 00000000 00000000 00000000 00000000 00000000 00000000 00000000 ................................ 000140
00000000 00000000 00000000 00000000 00000000 00000000 00000000 00000000 ................................ 000160
00000000 00000000 00000000 00000000 00000000 00000000 00000000 00000000 ................................ 000180
00000000 00000000 00000000 00000000 00000000 00000000 00000000 00000000 ................................ 0001A0
00000000 00000000 00000000 00000000 00000000 00000000 00000000 00000000 ................................ 0001C0
00000000 00000000 00000000 00000000 00000000 00000000 00000000 00000000 ................................ 0001E0

Dump of file SATURN:[PCCOMMON.DUMP.DLL]PDLSYN.TMP;1 on 18-APR-1990 10:48:45.27
File ID (771,27,0)   End of file block 276 / Allocated 276
```

```
Virtual block number 274 (00000112), 512 (0200) bytes

00000000 00000000 00000000 00000000 00000000 00000000 00000000 00000000 ................................ 000000
00000000 00000000 00000000 00000000 00000000 00000000 00000000 00000000 ................................ 000020
00000000 00000000 00000000 00000000 00000000 00000000 00000000 00000000 ................................ 000040
00000000 00000000 00000000 00000000 00000000 00000000 00000000 00000000 ................................ 000060
00000000 00000000 00000000 00000000 00000000 00000000 00000000 00000000 ................................ 000080
00000000 00000000 00000000 00000000 00000000 00000000 00000000 00000000 ................................ 0000A0
00000000 00000000 00000000 00000000 00000000 00000000 00000000 00000000 ................................ 0000C0
32D80000 00000000 00000000 00000000 00000000 00000000 00000000 00000000 ..............................Ä2 0000E0
00000000 00000000 81818101 00000001 00000000 00000000 00000000 000022E2 ä".............................. 000100
00000000 00000000 00000000 00000000 00000000 00000000 00000000 00000000 ................................ 000120
00000000 00000000 00000000 00000000 00000000 00000000 00000000 00000000 ................................ 000140
00000000 00000000 00000000 00000000 00000000 00000000 00000000 00000000 ................................ 000160
00000000 00000000 00000000 00000000 00000000 00000000 00000000 00000000 ................................ 000180
00000000 00000000 00000000 00000000 00000000 00000000 00000000 00000000 ................................ 0001A0
00000000 00000000 00000000 00000000 00000000 00000000 00000000 00000000 ................................ 0001C0
00000000 00000000 00000000 00000000 00000000 00000000 00000000 00000000 ................................ 0001E0

Dump of file SATURN:[PCCOMMON.DUMP.DLL]PDLSYN.TMP;1 on 18-APR-1990 10:48:45.27
File ID (771,27,0)   End of file block 276 / Allocated 276

Virtual block number 275 (00000113), 512 (0200) bytes

0A0A0A0A 0A0A0A0A 0A0A0A00 00000000 00000000 00000000 00000000 00000000 ................................ 000000
0A0A0A0A 0A0A0A0A 0A0A0A0A 0A0A0A0A 0A0A0A0A 0A0A0A0A 0A0A0A0A 0A0A0A0A ................................ 000020
0A0A0A0A 0A0A0A0A 0A0A0A0A 0A0A0A0A 0A0A0A0A 0A0A0A0A 0A0A0A0A 0A0A0A0A ................................ 000040
0A0A0A0A 0A0A0A0A 0A0A0A0A 0A0A0A0A 0A0A0A0A 0A0A0A0A 0A0A0A0A 0A0A0A0A ................................ 000060
0A0A0A0A 0A0A0A0A 0A0A0A0A 0A0A0A0A 0A0A0A0A 0A0A0A0A 0A0A0A0A 0A0A0A0A ................................ 000080
0A0A0A0A 0A0A0A0A 0A0A0A0A 0A0A0A0A 0A0A0A0A 0A0A0A0A 0A0A0A0A 0A0A0A0A ................................ 0000A0
0A0A0A0A 0A0A0A0A 0A0A0A0A 0A0A0A0A 0A0A0A0A 0A0A0A0A 0A0A0A0A 0A0A0A0A ................................ 0000C0
0A0A0A0A 0A0A0A0A 0A0A0A0A 0A0A0A0A 0A0A0A0A 0A0A0A0A 0A0A0A0A 0A0A0A0A ................................ 0000E0
00000000 00000000 0000000A 0A0A0A0A 0A0A0A0A 0A0A0A0A 0A0A0A0A 0A0A0A0A ................................ 000100
00000000 00000000 00000000 00000000 00000000 00000000 00000000 00000000 ................................ 000120
00000000 00000000 00000000 00000000 00000000 00000000 00000000 00000000 ................................ 000140
00000000 0200FFFF FFFF0000 00000000 00000000 00000000 00000000 00000000 ................................ 000160
00000000 00000000 00000000 00000000 20000000 00000000 00000000 00000000 ............... ................ 000180
00000000 00000000 00000000 00000000 00000000 00000000 00000000 00000000 ................................ 0001A0
1C7C388A 38B61B9E FFFF3B80 30083BA8 18280000 00002080 2CAC0000 2032037E -.2 ..˜,. ....(.ˆ;.=˜;....Ñ;¤;|. 0001C0
414D203A 00FD3E3E 4753404E 3C3C0000 00000000 00003BBE 00000000 00000000 ........ƒ;........<<NMSG>>».: MA 0001E0

Dump of file SATURN:[PCCOMMON.DUMP.DLL]PDLSYN.TMP;1 on 18-APR-1990 10:48:45.27
File ID (771,27,0)   End of file block 276 / Allocated 276

Virtual block number 276 (00000114), 512 (0200) bytes

69006500 203A726F 72726520 746E696F 702D676E 6974616F 6C66202D 0A004854 TH..- floating-point error: .e.i 000000
66726576 6F006800 0A003020 79622065 64697669 64006700 0A006469 6C61766E nvalid...g.divide by 0...h.overf 000020
696C7078 65007000 0A00776F 6C667265 766F2068 63617473 006E000A 00776F6C low...n.stack overflow...p.expli 000040
61747320 2D0A0D30 30303652 0000000A 0D646574 6172656E 65672079 6C746963 citly generated.....R6000..- sta 000060
72656765 746E6920 2D0A0D33 30303652 0003000A 00776F6C 66726576 6F206B63 ck overflow.....R6003..- integer 000080
6E652074 6F6E202D 0A0D3830 30365200 08000A00 30207962 20656469 76696420  divide by 0.....R6008..- not en 0000A0
30365200 09000A00 73746E65 6D756772 6120726F 66206563 61707320 6867756F ough space for arguments.....R60 0000C0
7269766E 6520726F 66206563 61707320 6867756F 6E652074 6F6E202D 0A0D3930 09..- not enough space for envir 0000E0
0020726F 72726520 656D6974 2D6E7572 00FF000A 0D00FC00 0A00746E 656D6E6F onment...•......run-time error . 000100
6F6C2074 6F6E2074 6E696F70 20676E69 74616F6C 66202D0A 0D323030 36520002 ..R6002..- floating point not lo 000120
38BC0002 00000006 38B40002 00000002 12D60002 0005FFFF FF000A00 64656461 aded..........•.......Ç;......¥; 000140
00000000 00000000 00000000 00000009 38E00002 00000008 26F20002 00000007 ......·&......Ä8................ 000160
00000000 00000000 00000000 00000000 00000000 00000000 00000000 00000000 ................................ 000180
00000000 00000000 00000000 00000000 00000000 00000000 00000000 00000000 ................................ 0001A0
00000000 00000000 00000000 00000000 00000000 00000000 00000000 00000000 ................................ 0001C0
00000000 00000000 00000000 00000000 00000000 00000000 00000000 00000000 ................................ 0001E0

File ID (780,20,0)   End of file block 2 / Allocated 4
```

Virtual block number 1 (00000001), 512 (0200) bytes

```
00000000 00000040 00000000 00000088 0000FFFF 000C0004 00000002 002A5A4D MZ*.............|.......a....... 000000
00000080 00000000 00000000 00000000 00000000 00000000 00000000 00000000 ................................ 000020
6F6E6E61 63206D61 72676F72 70207369 685421CD 4C01B821 CD09B400 0EBA1F0E ..p..Ç.ë||.Lë!This program canno 000040
00000000 00000024 0A0D002E 65646F6D 20534F44 206E6920 6E757220 65622074 t be run in DOS mode....$....... 000060
00000005 00000000 00020000 00000000 00048009 37C5FA27 00070083 0505454E NE......'*é7.................... 000080
00000000 00000000 00010000 00040000 0000010A 00830083 00680068 00400030 0.a.h.h......................... 0000A0
02100E21 000A0022 00360E00 0036001E 000F0F00 000F001C 006C0F00 006C0014 ..l..l...........6...6."...|... 0000C0
434E5546 474E4950 5041404D 44500E00 0050414D 4D445006 00020E21 00000000 ....|....PDMMAP...PDMMAPPINGFUNC 0000E0
6960616E 20676E69 72747320 6120736E 72757465 522C0000 00000301 01000001 ..........,Returns a string nami 000100
00000000 00000000 006C6C64 2060726F 6620454C 49464F52 50206568 7420676E ng the PROFILE form dll......... 000120
00008F83 0102FE5E 69FE46FF 0003E900 00FE46C7 D88EFFFF 881E5657 000002C8 à...VV.|...ÄúF±..Õ...F±í^±...¢.. 000140
FE466900 1EE90374 00008739 0A468801 02FE5E69 0038E9FF FFB80006 E9037400 .t.Õ..|..Õ8.í^±...F.9...t.Õ..íF± 000160
FF88FF86 E90009E9 00008808 C483FFFF 00009A06 76FF0876 FF501E00 02050102 ......P.v..v.......á.|..Õ..ÕÑ.|. 000180
00000000 00040008 00020000 00030050 00020002 900006CA C95F5E1F 0000E9FF .Õ...^_èò.......P............... 0001A0
00000000 00000000 00000500 02000200 01CB0001 B81F0000 3E89088E FFFFB81E .|...Ä.>...|..Ù................. 0001C0
A8C78806 7EC4D1F7 AEF2FFFF B9C033C0 8ED88CFE 880A76C5 1EDE88D7 88EC8B55 U.å.ø.B.év..±.Ä.å3å¿..·Ü%1ó-..ú´ 0001E0
```

Dump of file SATURN:[PCCOMMON.DUMP.DLL]PDMMAP.TMP;1 on 18-APR-1990 10:49:18.55
File ID (780,20,0) End of file block 2 / Allocated 4

Virtual block number 2 (00000002), 512 (0200) bytes

```
00000000 00000000 0000CB50 C28C1FFA 88F388A4 F3C913A5 F3E9D149 A4027401 .t.Ê||ÕµÊ.èµÊ.µ.ª..ô]ù.......... 000000
00000000 00000000 00000000 00000000 00000000 00004644 464F5250 414423F1 þ#DAPROFDF...................... 000020
00000000 00000000 00000000 00000000 00000000 00000000 00000000 00000000 ................................ 000040
00000000 00000000 00000000 00000000 00000000 00000000 00000000 00000000 ................................ 000060
00000000 00000000 00000000 00000000 00000000 00000000 00000000 00000000 ................................ 000080
00000000 00000000 00000000 00000000 00000000 00000000 00000000 00000000 ................................ 0000A0
00000000 00000000 00000000 00000000 00000000 00000000 00000000 00000000 ................................ 0000C0
00000000 00000000 00000000 00000000 00000000 00000000 00000000 00000000 ................................ 0000E0
00000000 00000000 00000000 00000000 00000000 00000000 00000000 00000000 ................................ 000100
00000000 00000000 00000000 00000000 00000000 00000000 00000000 00000000 ................................ 000120
00000000 00000000 00000000 00000000 00000000 00000000 00000000 00000000 ................................ 000140
00000000 00000000 00000000 00000000 00000000 00000000 00000000 00000000 ................................ 000160
00000000 00000000 00000000 00000000 00000000 00000000 00000000 00000000 ................................ 000180
00000000 00000000 00000000 00000000 00000000 00000000 00000000 00000000 ................................ 0001A0
00000000 00000000 00000000 00000000 00000000 00000000 00000000 00000000 ................................ 0001C0
00000000 00000000 00000000 00000000 00000000 00000000 00000000 00000000 ................................ 0001E0
```

```
Dump of file SATURN:[PCCOMMON.DUMP.DLL]MEM.TMP;1 on 18-APR-1990 10:47:47.01
File ID (723,10,0)   End of file block 25 / Allocated 28

Virtual block number 1 (00000001), 512 (0200) bytes

 00000000 00000040 00000000 00000088 0000FFFF 00000004 00000019 01725A4D MZr.............|.......@....... 000000
 00000080 00000000 00000000 00000000 00000000 00000000 00000000 00000000 ................................ 000020
 6F6E6E61 63206D61 72676F72 70207369 685421C0 4C01B821 CD09B400 0EBA1F0E ..¤..Ç.ë|.LëIThis program canno 000040
 00000000 00000024 0A0D0D2E 65646F6D 20534F44 206E6920 6E757220 65622074 t be run in DOS mode....$....... 000060
 0004000B 00000000 00010000 00001000 000B8005 F971D343 002501A8 0505454E NE..´.X.CÆq'.................... 000080
 00000000 00000000 00010000 00040000 0000024D 01780170 00980098 00400051 Q.@.....p.x.M................... 0000A0
 0BC80F00 0BC800CD 08740F00 08730040 00F60F00 00F6002C 00D00F00 000D002A *.......,.-...-.@.s...t.ë.à...à. 0000C0
 077E0F00 077D021C 02460F00 024601F4 00840F00 008401E7 05420F00 0542018F ..B...B.Ô.Ç...Ç.¶.F...F...)...-. 0000E0
 4D140000 4D454D03 07C00F21 07B8029B 000C0E21 00000000 00060F01 0002029A ............|.....|.!.å..MEM...M 000100
 48455441 4552434D 454D0000 01444952 454E574F 59524555 51455241 48534D45 EMSHAREQUERYOWNERID...MEMCREATEH 000120
 45524148 534D454D 0F000344 4952454E 574F5952 4555514D 454D0F00 02504145 EAP...MEMQUERYOWNERID...MEMSHARE 000140
 455A4953 4B434F4C 42595245 55514552 4148534D 454D1600 04545245 564E4F43 CONVERT...MEMSHAREQUERYBLOCKSIZE 000160
 4C424545 5246454D 400C0006 455A4953 4B434F4C 42595245 5551454D 4D110005 ...MEMQUERYBLOCKSIZE...MEMFREEBL 000180
 4C414D45 4D000008 4B434F4C 42434F4C 4C414552 4148534D 454D1200 074B434F OCK...MEMSHAREALLOCBLOCK...MEMAL 0001A0
 534D454D 11000A50 41454859 4F525453 45444D45 4D0E0009 4B434F4C 42434F4C LOCBLOCK...MEMDESTROYHEAP...MEMS 0001C0
 4C414353 4F440800 00230010 000A0001 0000084B 434F4C42 45455246 45524148 HAREFREEBLOCK.........#...DOSCAL 0001E0

Dump of file SATURN:[PCCOMMON.DUMP.DLL]MEM.TMP;1 on 18-APR-1990 10:47:47.01
File ID (723,10,0)   End of file block 25 / Allocated 28

Virtual block number 2 (00000002), 512 (0200) bytes

 084F4953 03525450 45544144 494C4156 4C54550E 4C545503 4E49574D 5005534C LS.PMWIN.UTL.UTLVALIDATEPTR.SIO. 000000
 03026E03 03A00307 510304BD 03042E03 00000307 E203030B 45544952 57534F44 DOSWRITE...â........§..Q.....n.. 000020
 62755320 72656761 6E614D20 79726F6D 654D4000 00068E03 00770301 00030567 g.....w.......MMemory Manager Sub 000040
 61606863 61422039 38393120 74686769 7279706F 43202963 28206D65 74737973 system (c) Copyright 1989 Bachma 000060
 00000000 002E636E 49202C73 6D657473 7953206E 6F697461 6D726F66 6E49206E n Information Systems, Inc...... 000080
 00000000 0B000200 02000000 02000900 020002C8 1FFFFF00 009AD88E FFFFB81E .|...Ä......ù................... 0000A0
 E9037400 003D0000 FFFF9A50 16FC4680 0042681E D88EFFFF B81E5657 000006C8 à...WV.|...Ã.hB..F=.P.....=..t.Õ 0000C0
 FFFF9AFF 6AFF6A50 52FFFFBA 00008800 00004E06 C70006E9 0001004E 06C70009 ..ú.N...Õ..ú.N...|..¤..RPj.j.... 0000E0
 037400F9 83FA4E89 D9F7C91B 00013DFF FF00009A 0023E903 7401004C 3E830000 ...>L..t.Õ#......=...è%).N'.'.t. 000100
 00013D00 00FFFF9A 005236FF 2606C406 8E0046E9 0000004C 06C70078 E90003E9 Õ..Õx.ú.L...ÕF...6.&.6R......=.. 000120
 00000079 9A005836 FF2606C6 068E004C E90003E9 037400F9 83FA4E89 D9F7C91B .è%).N'.'.t.Õ..ÕL...6.&.6X..y... 000140
 F7C91B00 013D0002 00009A00 29E90003 E9037400 F983FA4E 89D9F7C9 1B000130 =...è%).N'.'.t.Õ..Õ)....@.=...è% 000160
 0088FA4E 89D9F7C9 1B00013D FFFF004C 9A000FE9 0003E903 7400F983 FA4E89D9 ).N'.'.t.Õ..Õ...L...=...è%).N'|. 000180
 00790001 009C0103 0008C8C9 5F5E1F00 00E9FA46 880000FF FF9A5052 00358A00 .¤5.RP......F'Õ...^_èù........y. 0001A0
 00000006 00880002 008D0001 00E70103 008C0001 003E0103 00000004 004F0002 ..O.......>.......Ó.......|..... 0001C0
 00000000 00000000 0000000B 00080002 0000000A 00E20002 00980001 00160103 ..........â..................... 0001E0

Dump of file SATURN:[PCCOMMON.DUMP.DLL]MEM.TMP;1 on 18-APR-1990 10:47:47.01
File ID (723,10,0)   End of file block 25 / Allocated 28

Virtual block number 3 (00000003), 512 (0200) bytes

 0A668300 00FFFF9A FF6AFF6A 50520045 BA000888 D88EFFFF B81E5657 000002C8 à...WV.|...Ã|..¤E.RPj.j.. ....f. 000000
 0007C726 065EC400 1BE90375 00003D06 C483FFFF 00ED9A0A 76FF5016 FE4680FD ».F±.P.v..Ü....á.=..u.Õ..Ć .&ú.. 000020
 00088807 8926FE46 88065EC4 001CE986 21880000 00669A50 520061BA 00088800 .|..¤¤.RP.f...|!.Õ..á^..F±&  |.. 000040
 08881E56 57000004 C80006CA C95F5E1F 0000E900 00880000 FFFF9A50 52FFFFBA ¤..RP.....|..Õ...^_èò..à...WV.|. 000060
 EE00009A 0676FF50 16FC4680 00000019 9AFF6AFF 6A505200 B08A0008 8BD88E00 ..Ã|..¤¯.RPj.j.......F=.P.v....Ÿ 000080
 FF0047E9 86238800 0000E9A 50520009 BA000888 0013E903 74000030 06C48300 ..á.=..t.Õ..|..¤).RP.@...|#.ÕG.. 0000A0
 00FC9A50 5200F7BA 00088800 13E90375 00003D04 C483002C 08639AFC 76FFFE76 v±.v=.c.,..á.=..u.Õ..|..¤%.RP.=. 0000C0
 0000004A 9A505200 10BA0008 8802C483 FFFF048C 9A0676FF 001EE986 28880000 ..|(.Õ...v.......á.|..¤..RP.J... 0000E0
 5201468A 000488D8 8E007FB8 1E565700 0012C800 02CAC95F 5E1F0000 E90000B8 |..Õ...^_èò..à...WV.|...Ã|..¤F.R 000100
 E9037400 003D06C4 83009F00 009A0E76 FF5016F4 46800000 00909AFF 6AFF6A50 Pj.j.......F¶.P.v.......á.=..t.Õ 000120
 13E90375 0107F626 F45EC401 12E98623 B8000001 6A9A5052 0165BA00 04880013 ..|..¤e.RP.j...|#.Õ..á^¶&-..u.Õ. 000140
 F45EC40A 46010001 250A4688 00F3E986 26880000 00859A50 520087BA 00048800 .|..¤..RP.ç...|&.Õ«..F.X...F.á^¶ 000160
 28F25688 065EC400 00FFFF9A 006A5016 F24680DA 76FF0031 E9037500 127F8326 &....u.Õ1..v..F·.Pj......á^..V·+ 000180
 5016F846 B000ACE9 00008800 00014B9A 5052011D BA000488 02578926 078926C0 6&..&.W.|..¤..RP.K...|..Õ¯..F%.P 0001A0
 04880013 E9037500 003D0EC4 83FFFF00 009A0A76 FFF476FF F676FF50 16FE4680 .F±.P.v~.v¶.v.......á.=..u.Õ..|. 0001C0
 5EC40000 01B19A50 5201ACBA 0004B800 76E98629 B8000001 FA9A5052 01F5BA00 .¤%.RP.'...|).Õv.|..¤¯.RP.Ÿ...á^ 0001E0
```

```
Dump of file SATURN:[PCCOMMON.DUMP.DLL]MEM.TMP;1 on 18-APR-1990 10:47:47.01
File ID (723,10,0)   End of file block 25 / Allocated 28

Virtual block number 4 (00000004), 512 (0200) bytes

 C02B0257 8B26FA5E C4FC5689 FA4689C1 0303E1C1 FE4E8B0C 578B260A 478B26F4 ¶&.G.&.W..N±èÅ..è.F'.V•á^'&.W.+å 000000
 8AEE5EC4 02478B26 0C468AEE 5EC407B9 260A468B EE5EC4F0 5689EE46 89F8460B .F½.FŸ.Vÿá^Ÿ.F.&..á^Ÿ.F.&.G.á^Ÿ. 000020
 57892607 8926065E C4C10B04 C183F84E 8BC02B02 578B26FA 5EC40347 8826FE46 F±&.G.á^'&.W.+å.N½.è..èá^.&..&.W 000040
 0676FF08 76FF088E 0115B81E 56570000 10C8000A CAC95F5E 1F0000E9 0000B802 .|..Õ...^_èò..à...WV.|...Ä.v..v. 000060
 9AFF6AFF 6A505202 C0BA0004 B80106E9 8627B800 06E90375 00003D00 00FFFF9A .....=..u.Õ..|'.Õ..|..¤à.RPj.j.. 000080
 BA0004B8 0013E903 7400003D 06C48301 3500009A 0A76FF50 16F6468D 00000126 &....F-.P.v....5..á.=..t.Õ..|..¤ 0000A0
 07BA0004 B80013E9 03750107 F626F65E C400CAE9 8623B800 0002E49A 5052020F Ô.RP.Õ...|#.Õò.á^-&-..u.Õ..|..¤. 0000C0
 FF9A0876 FF001BE9 03750012 7F8326F6 5EC400AB E98626B8 0000030C 9A505203 .RP.....|&.Õ¨.á^-&....u.Õ...v... 0000E0
 8BFA4689 00042D06 46880083 E90000B8 000001E7 9A505201 E28A0004 B80000FF ...|..¤å.RP.Ô...|..Õ...F.-...F'. 000100
 03478A26 F05EC4F4 46890004 05078B26 F05EC4F2 5689F046 89FA460B C02B0856 V.+å.F'.Fþ.V·á^þ&......F¶á^þ&.G. 000120
 37FF2602 77FF26FC 5EC4FE56 89FC4689 0C578B26 0A470326 F65EC403 E0C1E42A *ÕèÁ.á^-&.G.&.W..F•.V±á^•&.w.&.7 000140
 000002C5 9A505202 97BA0004 B80013E9 03750000 3D0000FF FF9AF476 FFFA76FF .v'.v¶.....=..u.Õ..|..¤..RP.é... 000160
 0006CAC9 5F5E1F00 00E90000 B8000003 7C9A5052 0377BA00 04B80013 E98627B8 |'.Õ..|..¤w.RP.|...|..Õ...^_èò.. 000180
 FA468000 0002A09A FF6AFF6A 50520304 BA0004B8 D88E0276 B81E5657 00000AC8 à...WV.|v..Ä|..¤à.RPj.j.......F' 0001A0
 FE7E8300 00038F9A 5052038A BA0004B8 FE468906 C48302AF 00009A0E 76FF5016 .P.v....€..á..F±|..¤..RP......~± 0001C0
 46880029 E9862688 0006E903 750107F6 26FA5EC4 003BE986 23880006 E9037400 .t.Õ..|#.Õ;.á^'&-..u.Õ..|&.Õ)..F 0001E0

Dump of file SATURN:[PCCOMMON.DUMP.DLL]MEM.TMP;1 on 18-APR-1990 10:47:47.01
File ID (723,10,0)   End of file block 25 / Allocated 28

Virtual block number 5 (00000005), 512 (0200) bytes

 8926065E C4078B26 F65EC4F8 5689F646 89D30BC1 0BC92B0C 5E8B022B 0004200A .-..+Ø.^.+è.è.Æ.F-.V½á^-&..á^.&. 000000
 0462BA00 04B8D88E 03A8B81E 56570000 0AC8000A CAC95F5E 1F0000E9 0000B807 .|..Õ...^_èò..à...WV.|´..Ä|..¤b. 000020
 04B8FE46 8906C483 03C80000 9A0E76FF 5016FA46 8D000003 B99AFF6A FF6A5052 RPj.j..¿....F'.P.v....à..á..F±|. 000040
 07F626FA 5EC4003C E98623B8 0006E903 7400FE7E 83000003 D99A5052 03B08A00 .¤ .RP.ì....-±.t.Õ..|#.Õ<.á^'&-. 000060
 F64689D3 0BC10BC9 2B0C5E8B D22B0004 2D0A468B 002AE986 26880006 E9037501 .u.Õ..|&.Õ*..F.-..+Ø.^.+è.è.Æ.F- 000080
 000CC800 0ACAC95F 5E1F0000 E90000B8 07882606 5EC40247 8A26F65E C4F85689 .V½á^-&.G.á^.&..|..Õ...^_èò..à.. 0000A0
 8D5016FA 46800000 04479AFF 6AFF6A50 5204F9BA 00048BD8 8E0436B8 1E565700 .WV.|6..Ä|..¤'.RPj.j..G....F'.P. 0000C0
 04679A50 52043EBA 00048BF8 46890CC4 83045600 C59A0A76 FF0C76FF 5016F446 F¶.P.v..v..é.V..á..F½|..¤>.RP.g. 0000E0
 86268800 06E90374 0107F626 F45EC400 4FE98624 B80006E9 037400F8 7E830000 ...-½.t.Õ..|$.ÕO.á^¶&-..t Õ..|&. 000100
 46030A46 8BFE4689 00048800 03E90006 B80006E9 03750207 F626F45E C40030E9 Õ=.á^¶&-..u.Õ..|..Õ..|...ı .F..F 000120
 0000E900 00880257 89260789 26065EC4 D60BC10B C92B0277 8B26FA5E C4022BFE ±+Øá^'&.w.+è.è.øá^.&..&.W.|..Õ.. 000140
 9AFF6AFF 6A505205 A0BA0004 B8D88E04 C5B81E56 57000010 C80008CA C95F5E1F .^_èò..à...WV.|é..Ä|..¤..RPj.j.. 000160
 BA0004B8 0013E903 7400003D 06C48304 ED00009A 0E76FF50 16F4468D 00000406 ø....F¶.P.v....Ú..á.=..t.Õ..|..¤ 000180
 FEBA0004 B80013E9 03740107 F626F45E C400D8E9 8623B800 0005C49A 505205BF ¢.RP.á...|#.ÕÄ.á^¶&-..t.Õ..|..¤± 0001A0
 16FE468D 5016F846 8D0A4601 0001250A 468800B9 E98626B8 00000603 9A505205 .RP.....|&.Õ¿..F.%...F..F½.P.F±. 0001C0
 0611BA00 04B80013 E9037500 003D0EC4 8301D100 009A0A76 FFF476FF F676FF50 P.v-.v¶.v....1..á.=..u.Õ..|..¤.. 0001E0

Dump of file SATURN:[PCCOMMON.DUMP.DLL]MEM.TMP;1 on 18-APR-1990 10:47:47.01
File ID (723,10,0)   End of file block 25 / Allocated 28

Virtual block number 6 (00000006), 512 (0200) bytes

 478B26F4 5EC40000 04FE9A50 5204CDBA 0004B800 7AE98629 B8000006 169A5052 RP.....|).Õz.|..¤ë.RP.±...á^¶&.G 000000
 89F8460B C02B0257 8B26FA5E C4FC5689 FA4689C1 0303E1C1 FE4E8B0C 578B260A .&.W..N±èÅ..è.F'.V•á^'&.W.+å.F½. 000020
 8826FE46 8AF05EC4 02478B26 0C468AF0 5EC407B9 260A468B F05EC4F2 5689F046 Fþ.V·á^þ.F.&..á^þ.F.&.G.á^þ.F±&. 000040
 57892607 8926F846 0BC02BD0 8BD22BC1 0BED2AFE 4E8AC02A 0E668A06 5EC40347 G.á^..f.*å.N±*Ú.è+Ø.Å+å.F½&..&.W 000060
 0577BA00 04B8D88E 056FB81E 56570000 10C8000A CAC95F5E 1F0000E9 0000B802 .|..Õ...^_èò..à...WV.|o..Ä|..¤w. 000080
 058F00C5 9A0676FF 0876FF50 16F8468D 5016FC46 8D000005 B09AFF6A FF6A5052 RPj.j.......F=.P.F½.P.v..v..é... 0000A0
 86268800 06E90374 0107F626 F85EC400 79E98624 B80006E9 03740000 3D0CC483 .á.=..t.Õ..|$.Õy.á^½&-..t.Õ..|&. 0000C0
 8826F05E C4F25689 F04689F4 4608C02B 02578B26 FC5EC4F4 46890646 880067E9 Õg..F..F¶á^=&.W.+å.F¶.Fþ.V·á^þ&. 0000E0
 75000030 00000367 9AF676FF F476FF37 FF260277 FF26FC5E C4F64689 00040507 .....F-á^=&.w.&.7.v¶.v-.g...=..u 000100
 9A505207 28BA0004 B80013E9 8627B800 0005A59A 5052069E BA0004B8 0013E903 .Õ..|..¤..RP.É...|'.Õ..|..¤(.RP. 000120
 00048BD8 8E0696B8 1E565700 000EC800 04CAC95F 5E1F0000 E90000B8 0000072D -...|..Õ...^_èò..à...WV.|...Ä|.. 000140
 C59A0A76 FF0C76FF 5016F646 8D5016FC 46800000 06A79AFF 6AFF6A50 52078DBA ¤..RPj.j..Ì....F=.P.F-.P.v..v..é 000160
 B80006E9 037400FA 7E830000 07409A50 520738BA 00048BFA 46890CC4 83068E00 ./..á..F'|..¤;.RP.ª....-'.t.Õ..| 000180
 C02B0257 8B26FC5E C40024E9 86268800 06E90374 0107F626 F65EC400 36E98624 $.Õ6.á^-&-..t.Õ..|&.Õ$.á^•&.W.+å 0001A0
 CAC95F5E 1F0000E9 0000B807 8926065E C4078B26 F25EC4F4 5689F246 890A460B .F..F·.V¶á^·&..á^.&..|..Õ...^_èò 0001C0
 8D000007 6A9AFF6A FF6A5052 081EBA00 04B8D88E 0759B81E 56570000 0EC80008 ..à...WV.|Y..Ä|..¤..RPj.j..j.... 0001E0
```

```
Dump of file SATURN:[PCCOMMON.DUMP.DLL]MEM.TMP;1 on 18-APR-1990 10:47:47.01
File ID (723,10,0)   End of file block 25 / Allocated 28

Virtual block number 7 (00000007), 512 (0200) bytes

07618A00 04B8FA46 890CC483 078100C5 9A0A76FF 0C76FF50 16F6468D 5016FC46 F=.P.F-.P.v..v..é....ó..F°|..¤a. 000000
E9037401 07F626F6 5EC40037 E98624B8 0006E903 7400FA7E 83000007 929A5052 RP......-°.t.Õ..|$.Õ7.ó^-ᴿ-..t.Õ 000020
478A26F2 5EC4F456 89F24689 0A4608C0 28025788 26FC5EC4 0025E986 26B80006 ..|&.ÕX.ó^=&.W.+ô.F..F·.V' ⁵^·&.G 000040
FB010300 00000400 C8000200 0B08CAC9 5F5E1F00 00E90000 B8078826 065EC402 .ó^.&..|..Õ..._èò.....à..  ...« 000060
F2000200 00000705 ED000200 8D000108 23010300 00000508 12000200 8C000107 ...............▌.......Ù.......· 000080
FF010300 14000302 81020300 00000807 EA000200 22000101 95010300 00000A07 ...........ᴺ...Õ................ 0000A0
4680646A D88EFFFF B81E5657 00000CC8 00000000 E6000207 18010300 27000102 ...'.......Ì....à...WV.|...Ãjd.F 0000C0
28FE5688 06C8068E 00C0E900 01B80006 E9037500 00300000 FFFF9A03 6A5016FE ±.Pj......=..u.Õ..|..Õä...à..V±+ 0000E0
89F44689 00521688 260050A1 2606C806 8E0005FC 46C70052 16892600 50A326C0 &&ÈP.&..R.úF=....à.&ÀP.&..R..F¶. 000100
E9FFFF07 C726F45E C4000BE9 03750000 3DFC4EFF FC468814 F4468300 04E9F656 V-Õ...F¶..F=.N==..u.Õ..ó^¶&ú...Õ 000120
75000030 00000016 9A036A50 16FE468D 00AA6800 05005406 C72606CA 068EFFE3 D...ò.&ú.T...h¯..F±.Pj......=..u 000140
89F84689 00581689 260056A3 26C028FE 568806CC 068E004E E90001B8 0006E903 .Õ..|..ÕN...ä..V±+ä&ÈV.&..X..F½. 000160
26F85EC4 0008E903 75000030 FC4EFFFC 468822F8 46830004 E90005FC 46C7FA56 V°úF=..Õ...F½".F=.N==..u.Õ..ó^½& 000180
0010C8CB C95F5E1F 0000E900 00B80005 005A06C7 2606CE06 8EFFE3E9 000007C7 ú...ÕD...ö.&ú.Z...|..Õ..._èùà.. 0001A0
260050A1 2606C806 8EFA4689 FC468900 00B80000 F446C708 8E000888 1E565700 .WV.|...ÃúF¶..|...F=.F°..à.&ÀP.& 0001C0
03750000 3D04C483 01620255 9A5016FE 468DFFFF 00009A00 05E90374 0052060B ..R.t.Õ........F±.P.U.b..ó.=..u. 0001E0

Dump of file SATURN:[PCCOMMON.DUMP.DLL]MEM.TMP;1 on 18-APR-1990 10:47:47.01
File ID (723,10,0)   End of file block 25 / Allocated 28

Virtual block number 8 (00000008), 512 (0200) bytes

5689F646 89005216 8B260050 06032606 C8068E14 FE466801 17E90001 B80006E9 Õ..|..Õ..kF±...à.&..P.&..R..F-.V 000000
B80006E9 03750000 300AC483 018C049F 9AF676FF F876FF06 76FF5016 F4468DF8 ½.F¶.P.v..v½.v-......ó.=..u.Õ..| 000020
C483FFFF 05799A50 01A70035 9AF676FF F876FF06 76FF5016 FA468D00 DBE90001 ..ÕÜ..F°.P.v..v½.v-.5.Ì.P.y....ó 000040
06CC068E 22C068FF FF009C9A 80024F80 26FA5EC4 008AE900 03E90375 0000300C .=..u.Õ..Õ..ó^°&.O.......kâ"..ä. 000060
03EEC1FE 7688001C E9037201 00FE7E81 F25689F0 46890058 168B2600 56060326 &..V.&..X..Fb.V·.-±..r.Õ...v±èŸ. 000080
F6078926 064688F6 5EC40240 0826E0D2 D9F607E9 8007E183 FE4E8B01 80F05EC4 ó^b¯..N±.Ã..Õ.-1@Ã&.a.ó^-.F.&..- 0000A0
F65EC400 09E90001 1247C726 F65EC400 0CE90374 010646F6 0015E903 75040646 F..u.Õ..-F..t.Õ..ó^-&úG...Õ..ó^- 0000C0
FF0008E9 037500F4 7E83002A E9000088 07892640 FE468808 5EC40000 1247C726 &úG...ó^..F±@&..|..Õ°..-¶.u.Õ... 0000E0
0000E900 01B80000 FFFF9AFC 76FF0008 E90375FC 4608FA46 88000002 469AF476 v¶.F....F°.F=u.Õ...v=.....|..Õ.. 000100
8B260050 A12606C8 068E0000 FC46C7D8 8E00F588 1E565700 0008C8CB C95F5E1F .^_èùà...WV.|½..ÃúF=....à.&ÀP.&. 000120
0372FC46 390054A1 2606CA06 8EFC46FF 14F84683 0007E9FA 5689F846 89005216 .R¯..F½.V°Õ...F½..F=..ò.&ÀT.9F=r. 000140
C8E90088 E90000B8 078926FC 4688065E C4000FE9 0374FF3F 8326F85E C4001EE9 Õ..ó^½&.?.t.Õ..ó^..F=&..|..Õ..Õù 000160
14005406 682606CA 068E0500 54068326 06CA068E FE468900 54A12606 CA068EFF ...ò.&ÀT..F±..ò.&..T....ò.&k.T.. 000180
FE466800 4CE90001 B80006E9 03750000 300000FF FF9A0052 36FF2606 C8068E50 P..à.&.6R......=..u.Õ..|..ÕL.kF± 0001A0
F8468300 04E90005 FC46C7FA 5689F846 89005216 8B260050 06032606 C8068E14 ...à.&..P.&..R..F½.V°úF=..Õ...F½ 0001C0
FE468806 5EC4FFE3 E9FFFF07 C726F85E C4000BE9 03750000 3DFC4EFF FC468814 ..F=.N==..u.Õ..ó^½&ú...ÕD.ó^..F± 0001E0

Dump of file SATURN:[PCCOMMON.DUMP.DLL]MEM.TMP;1 on 18-APR-1990 10:47:47.01
File ID (723,10,0)   End of file block 25 / Allocated 28

Virtual block number 9 (00000009), 512 (0200) bytes

00008806 5EC4088E 0250B81E 56570000 0AC8CBC9 5F5E1F00 00E90000 B8078926 &..|..Õ..._èùà...WV.|]..Ãó^.|.. 000000
89005816 8B260056 A12606CC 068EFA46 89005AA1 2606CE06 8E078926 02478926 &.G.&....ö.ÏÀZ..F°..ä.&ÀV.&..X.. 000020
3F8326F6 5EC40022 E9037500 003DFA4E FFFA4688 22F64683 0004E9F8 5689F646 F-.V½Õ...F-".F°.N°=..u.Õ".ó^-&.7 000040
26065EC4 FFCCE900 03E90257 89260789 26F85688 F6468806 5EC40013 E9037400 .t.Õ..ó^..F-.V½&..&.W.Õ..Õä.ó^.& 000060
8B260056 06032606 CC068E22 005A0668 2606CE06 8E0098E9 03740247 0B260788 ..&.G.t.Õ....ò.&k.Z."..ä.&..V.&. 000080
005A0668 2606CE06 8E05005A 06832606 CE068E02 57892607 8926065E C4005816 .X.ó^.&..&.W...ò.&..Z....ò.&k.Z. 0000A0
89260000 B8065EC4 0013E903 75000030 000002D8 9A005836 FF2606CC 068E5022 "P..ä.&.6X..Ü...=..u.Õ..ó^.|..&. 0000C0
F6468900 22050257 8B260788 26065EC4 0004FA46 C7007FE9 0001B807 89260247 G.&..|..Õ..úF°..ó^.&..&.W..".F- 0000E0
000007C7 26F65EC4 0008E903 75000030 FA4EFFFA 468822F6 46830004 E9F85689 .V½Õ...F-".F°.N°=..u.Õ..ó^-&ú... 000100
00020502 57882607 8826065E C40020FA 46C70000 07C7261F C426065E C4FFE3E9 ÕD.ó^.&ó.&ú...úF° .ó^.&..&.W.... 000120
03E90375 000030FA 4EFFFA46 880007C6 26FC46FF FC5EC400 0AE9FE56 89FC4689 .F=.V±Õ..ó^=.F=&ó...F°.N°=..u.Õ. 000140
0E76FF20 6AD88E03 46881E56 5700000A C8CBC95F 5E1F0000 E9000088 FFE5E900 .Õl.|..Õ..._èùà...WV.|F..Ãj .v. 000160
03750000 3D000000 889A5000 00880003 E9000288 0006E903 75010A46 F60C76FF .v.-F..u.Õ..T..Õ..|..P.....=..u. 000180
C4FA5689 F84689C0 28178826 0C5EC400 93E90001 88000007 C7260C5E C4000EE9 Õ..ó^.&ú...|..Õ..ó^.&..+ô.F½.V°ó 0001A0
46830004 E9FE5689 FC4689FA 5688F846 880004F6 46C70C57 89260A47 8926065E ^.&.G.&.W.úF-...F½.V°.F=.V±Õ...F 0001C0
FFDEE907 89260247 89260000 B8FC5EC4 0010E903 75000030 F64EFFF6 468808FC =..F-.N-=..u.Õ..ó^=|..&.G.&..Õ8. 0001E0
```

```
Dump of file SATURN:[PCCOMMON.DUMP.DLL]MEM.TMP;1 on 18-APR-1990 10:47:47.01
File ID (723,10,0)   End of file block 25 / Allocated 28

Virtual block number 10 (0000000A), 512 (0200) bytes

 00003008 C4830126 064B9AF8 76FFFA76 FF03E868 0A76FF00 040847C7 26065EC4 ó^.&úG....v.hò..v'.v½.K.&..ó.=.. 000000
 00B80006 E90001B8 000007C7 260C5EC4 00000233 9A37FF26 0C5EC400 19E90375 u.Õ..ó^.&.7.3...ó^.&ú...|..Õ..|. 000020
 04B80006 E9037501 0C46F608 8E04A7B8 1E565700 000EC8CB C95F5E1F 0000E900 .Õ...^_èùà...WV.|Ï..Ä-F..u.Õ..|. 000040
 03750000 3D000004 C79A036A 5016F846 8D5022FA 4668FA46 890001B8 0003E900 .Õ..|...F'kF'"P.F½.Pj..ú...=..u. 000060
 26FA4688 085EC406 57892604 478926C0 2BF85688 085EC400 8DE90001 B80006E9 Õ..|..Õ..ó^..V½+ó&.G.&.W.ó^..F'& 000080
 5EC4F456 89F24689 02578926 0789260E 5EC40657 8B260447 8B26085E C4024789 .G.ó^.&.G.&.W.ó^.&..&.W..F·.V¶ó^ 0000A0
 5EC4000A E9FE5689 FC468900 0205F456 8BF2468B 0020F646 C7078926 06468BF2 ·.F.&..úF- ..F·.V¶....F=.V±Õ..ó^ 0000C0
 0FE90375 FA4EFFFF E5E90003 E9037500 003DF64E FFF6468B 0007C626 FC46FFFC •.F•&ó...F-.N-=..u.Õ..Õ!..N'u.Õ. 0000E0
 57000008 C8CBC95F 5E1F0000 E90000B8 FFE9E900 0007C726 F25EC422 F2468300 ..F·"ó^-&ú...ÕÕ.|..Õ...^_èùà...W 000100
 2301F7C9 1B03E82D 0A468B00 00FE46C7 FA4689FC 46890000 B8D88E05 81B81E56 V.|...Ä|...F=.F'úF±...F.¯Õ..è¼i# 000120
 00B80003 E90003B8 0006E903 75010C46 F65016FE 468DF876 FFF84689 03E805C1 è.Õ..F½.v½.F±.P-F..u.Õ..|..Õ..|. 000140
 6A006A03 E868006A FE76FF00 78E90001 B80006E9 03750000 3D000005 A79A5000 .P.Ï...=..u.Õ..|..Õx..v±j.hÒ.j.j 000160
 8B065EC4 0024E900 03E90374 FC4608FA 4688FC56 89FA4689 0000FFFF 9A006A00 .j.......F'.V•.F'.F•t.Õ..Õ$.ó^.. 000180
 002DE900 00B80447 89260647 89260000 8B065EC4 02578926 078926FC 568BFA46 F'.V•&..&.W.ó^.|..&.G.&.G.|..Õ-. 0001A0
 FF0008E9 037500FE 7E830000 FFFF9AFA 76FFFC76 FF0008E9 0375FC46 0BFA468B .F'.F=u.Õ...v•.v'......-±.u.Õ... 0001C0
 5EC4088E 0653B81E 56570000 0AC8CBC9 5F5E1F00 00E90001 B8000005 5C9AFE76 v±.\...|..Õ...^_èùà...WV.|S..Äó^ 0001E0

Dump of file SATURN:[PCCOMMON.DUMP.DLL]MEM.TMP;1 on 18-APR-1990 10:47:47.01
File ID (723,10,0)   End of file block 25 / Allocated 28

Virtual block number 11 (0000000B), 512 (0200) bytes

 5689F646 890C578B 260A478B 26065EC4 0018E903 7500003D FA468908 478B2606 .&.G..F'=..u.Õ..ó^.&.G.&.W..F-.V 000000
 FC468300 04E9FE56 89FC4689 F8568BF6 46880082 E90000B8 0006E903 74D008F8 ½.Ât.Õ..|..Õ...F-.V½.F=.V±Õ...F= 000020
 5EC40019 E9037502 47082607 8B26FC5E C40032E9 03750000 3DFA4EFF FA468B08 ..F'.N'=..u.Õ2.ó^=&..&.G.u.Õ..ó^ 000040
 BCE9084F FF26065E C4FFC6E9 0003E903 75D00800 0007029A 37FF2602 77FF26FC =&.w.&.7......Âu.Õ..Õ6.ó^.&.O.Õ¥ 000060
 B8065EC4 00000713 9AF876FF 001CE900 01B80006 E9037500 087F8326 065EC4FF .ó^.&....u.Õ..|..Õ...v½.....ó^.| 000080
 8E072AB8 1E565700 0006C8CB C95F5E1F 0000E900 00B80A47 89260C47 89260000 ..&.G.&.G.|..Õ...^_èùà...WV.|*.. 0000A0
 E9FC5689 FA468900 58168B26 0056A126 06CC068E FE468900 5AA12606 CE068E08 Ä..õ.&ÂZ..F±..ä.&ÂV.&..X..F'.V=Õ 0000C0
 E9037407 39260646 8BFA5EC4 0027E903 7500003D FE4EFFFE 468B22FA 46830004 ...F'".F±.N±=..u.Õ'.ó^'.F.&9.t.Õ 0000E0
 00B8085E C4FFC7E9 0016E900 00B80257 89260789 26FC568B FA468B08 5EC40016 ..ó^..F'.V=&..&.W.|..Õ..Õú.ó^.|. 000100
 C4D88E07 EDB81E56 57000000 C8CBC95F 5E1F0000 E90001B8 07892602 47892600 .&.G.&..|..Õ...^_èùà...WV.|Ú..Äó 000120
 5EC40000 07C89A02 70FF2606 76C40004 8B001DE9 03750647 08260447 8B26065E ^.&.G.&.G.u.Õ..E¯.óv.&.p..à...ó^ 000140
 FF0876FF 001CE903 750C470B 260A478B 26065EC4 04478926 06478926 0000B806 .|..&.G.&.G.ó^.&.G.&.G.u.Õ...v.. 000160
 FFFF07C7 26065EC4 000EE900 01B80006 E9037500 003D04C4 83054807 229A0676 v..".H..ó.=..u.Õ..|..Õ..ó^.&ú... 000180
 8B260A47 8B26065E C4D88E08 6BB81E56 5700000A C8CBC95F 5E1F0000 E90000B8 |..Õ...^_èùà...WV.|k..Äó^.&.G.&. 0001A0
 F84683F6 46FF0007 E90000F6 46C7FC46 89084788 26065EC4 FA5689F8 46890C57 W..F½.V'Ž^.&.G..F=úF-..Õ...F-.F½ 0001C0
 468B0A5E C4000FE9 03740247 0B26078B 26F85EC4 0021E903 72F64639 FC468B08 ..F=9F-r.Õ!.ó^Y&..&.G.t.Õ..ó^..F 0001E0

Dump of file SATURN:[PCCOMMON.DUMP.DLL]MEM.TMP;1 on 18-APR-1990 10:47:47.01
File ID (723,10,0)   End of file block 25 / Allocated 28

Virtual block number 12 (0000000C), 512 (0200) bytes

 0AB85003 E0C1FC46 8B04FC46 83FE4689 FC468BFF CDE9008D E90000B8 078926F6 -&..|..Õ..Õë..F=.F±.F=..F=èÅ.PE. 000000
 8B26065E C4005CE9 0001B800 06E90375 00003000 0003FC9A 0270FF26 0676C400 .óv.&.p..•...=..u.Õ..|..Õ\.ó^.&. 000020
 08F84683 0004E900 04F646C7 FA5689F8 4689C103 03E1C1FE 4E8B0C57 8B260A47 G.&.W..N±èÄ..è.F½.V'úF-..Õ...F½. 000040
 5EC4FFDE E9078926 02478926 000088F8 5EC40010 E9037500 003DF64E FFF6468B .F-.N-=..u.Õ..ó^½|..&.G.&..ÕB.ó^ 000060
 000006C8 CBC95F5E 1F0000E9 00008807 8926FE46 8B0A5EC4 08478926 FC468B06 ..F=&.G.ó^..F±&..|..Õ...^_èùà... 000080
 02478B26 065EC4FE 5689FC46 8906578B 2604478B 26065EC4 088E08E3 B81E5657 WV.|D..Äó^.&.G.&.W..F=.V±Ž^.&.G. 0000A0
 39260A46 8BFC5EC4 0027E903 7500003D FA4EFFFA 468822FC 46830004 E9FA4689 .F'Õ...F="..F'.N'=..u.Õ'.ó^=.F.&9 0000C0
 C4FFC7E9 0016E900 01B80257 89260789 26FE568B FC468B0C 5EC40016 E9037407 .t.Õ..ó^..F=.V±&..&.V.|..Õ..Õú.ó 0000E0
 D4B81E56 5700000A C8CBC95F 5E1F0000 E90000B8 07892602 47892600 00B80C5E ^.|..&.G.&..|..Õ...^_èùà...WV.|à 000100
 01B80006 E9037500 003D08C4 8308B50A CA9A0676 FF0876FF 5016F646 8DD88E09 ..Å.F-.P.v..v..ò.ç..Ž.=..u.Õ..|. 000120
 5689FC46 89000205 F8568BF6 46880020 FA46C707 89260A46 8BF65EC4 0051E900 .ÕQ.ó^-.F.&..úF' ..F-.V½....F=.V 000140
 C4FFE5E9 0003E903 7500003D FA4EFFFA 46880007 C626FC46 FFFC5EC4 000AE9FE ±Õ..ó^=.F=&ó...F'.N'=..u.Õ..Õ!.ó 000160
 56570000 0CC8CBC9 5F5E1F00 00E90000 B8025789 26078926 F8568BF6 46880C5E ^..F-.V½&..&.W.|..Õ...^_èùà...WV 000180
 46890247 8B26065E C4F65689 F4468906 57882604 47882606 5EC4088E 0A4FB81E .|O..Äó^.&.G.&.W..F¶.V-Ž^.&.G..F 0001A0
 FC4689FE 468BFA56 89F84689 F6568BF4 46880789 26024789 26000088 0A5EC4FE ±ó^.|..&.G.&...F¶.V-.F½.V'.F±.F= 0001C0
 16E90374 003F8326 F85EC400 25E90375 00003DFC 4EFFFC46 8B22F846 830004E9 Õ...F½".F=.N==..u.Õ%.ó^½&.7.t.Õ. 0001E0
```

```
Dump of file SATURN:[PCCOMMON.DUMP.DLL]MEM.TMP;1 on 18-APR-1990 10:47:47.01
File ID (723,10,0)   End of file block 25 / Allocated 28

Virtual block number 13 (00000000), 512 (0200) bytes

 880522FE 4668FFC9 E9007BE9 0000B802 57892607 8926FA56 88F84688 0A5EC400 .á^..F%.V*&..&.W.|..Õ(.Õè.kF±".. 000000
 FE466800 03FC46C7 005AE900 01B80006 E9037500 00300000 09599AF6 76FF5000 .P.v-.Y...=..u.Õ..|..ÕZ.úF=..kF± 000020
 000030FC 4EFFFC46 8822F846 830004E9 FA5689F8 46890022 05F65688 F4460322 ".F¶.V-."..F%.V*Õ...F%".F=.N==.. 000040
 078926F6 5688F446 0322FE46 680A5EC4 FFE3E900 0007C726 F85EC400 0BE90375 u.Õ..á^%&ú...ÕO.á^.kF±".F¶.V-&.. 000060
 0002011C 00020009 90CBC95F 5E1F0000 E9000088 04024783 26065EC4 02578926 &.W.á^.&.G..|..Õ...^_èù......... 000080
 00080AD2 00020022 00010693 01030000 00060186 00020000 00040A61 00020000 ....a..................."...@... 0000A0
 00020799 010300E1 000206B4 01030027 0001088A 01030026 00010856 01030000 ....V...&.......'...Ç...Ä....... 0000C0
 88085EC4 088EFFFF 881E5657 000006C8 00000000 00000000 00000000 000000E2 â...............à...WV.|...Äá^.| 0000E0
 7301067E 830019E9 03750052 06082600 50A12606 D0068E07 89260247 89260000 ..&.G.&....Â.&ÂP.&..R.u.Õ...~..s 000100
 46894806 46880076 E90000B8 0006E903 77064639 0054A126 0602068E 0010E903 .Õ....@.&ÂT.9F.w.Õ..|..Õv..F.H.F 000120
 FF3F8326 FA5EC4FC 5689FA46 89005216 88260050 06032606 00068E14 FE4668FE ±kF±...Â.&..P.&..R..F*.V=á^*&.?. 000140
 76FFFC76 FF0035E9 00008800 06E90374 0C470826 0A478826 FA5EC400 10E90375 u.Õ..á^*&.G.&.G.t.Õ..|..Õ5..v=.v 000160
 FA468808 5EC40016 E9000088 0006E903 7500003D 06C483FF FF01619A FE76FFFA *.v±.a....á.=..u.Õ..|..Õ..á^..F* 000180
 8E000888 1E565700 0006C8CB C95F5E1F 0000E900 01880257 89260789 26FC5688 .V=&..&.W.|..Õ...^_èùà...WV.|... 0001A0
 5016FA46 8D078926 02478926 0000B80A 5EC40789 26024789 26000088 0E5EC4D8 Äá^.|..&.G.&..á^.|..&.G.&...F*.P 0001C0
 2A08468A 0050E900 00B80006 E9037400 003D06C4 83009700 009A50E4 2A09468A .F.*ÕP......á.=..t.Õ..|..ÕP..F.* 0001E0

Dump of file SATURN:[PCCOMMON.DUMP.DLL]MEM.TMP;1 on 18-APR-1990 10:47:47.01
File ID (723,10,0)   End of file block 25 / Allocated 28

Virtual block number 14 (0000000E), 512 (0200) bytes

 0A478826 FA5EC400 33E90000 B80006E9 03760847 3926FE46 88FA5EC4 FE4689E4 Õ.F±á^*.F±&9G.v.Õ..|..Õ3.á^*&.G. 000000
 26FC5688 FA46880A 5EC40257 89260789 260E5EC4 C10303E1 C1FE4E88 0C578826 &.W..N±èÃ..èá^.&..&.W.á^..F*.V=& 000020
 009C9AD8 8E00CD88 1E565700 0004C8CB C95F5E1F 0000E900 01880257 89260789 ..&.W.|..Õ...^_èùà...WV.|ë..Ã... 000040
 03720100 067E81FE 5689FC46 89005816 88260056 06032606 04068E22 C068FFFF ..kâ"..â.&..V.Ï..X..F=.V±.~...r. 000060
 D9F707E9 8307E183 064E8800 01BAE42A 02408A26 FC5EC403 EEC10676 88002CE9 Õ,..v.èŸ.á^=&.ã.*õa...N..Ã..Õ.%) 000080
 00300000 01E79A02 70FF2608 76C4000A B8008EE9 00008800 06E90375 C285E203 &ã.õu.Õ..|..Õ..£..áv.&.p..Õ...=. 0000A0
 03750000 300000FF FF9A0270 FF260876 C40004B8 0071E900 01880006 E9037500 ,u.Õ..|..Õq.£..áv.&.p......=..u. 0000C0
 00F90252 9A0876FF 0A76FF00 1CE90375 0107F626 085EC400 54E90001 B80006E9 Õ..|..ÕT.á^.&-..u.Õ...v..v..R.*. 0000E0
 EEC10676 88001CE9 03720100 067E8100 2CE90001 B80006E9 03750000 3D04C483 .á.=..u.Õ..|..Õ,..~...r.Õ...v.èŸ 000100
 5F5E1F00 00E90000 B8024008 26E002D9 F607E980 07E18306 4E8801B0 FC5EC403 .á^=¯..N..Ã..Õ.-1@Ä&.ã.|..Õ...^_ 000120
 0104E900 01880006 E9037401 07F62606 5EC4088E 0169881E 56570000 08C8CBC9 èùà...WV.||..Äá^.&-..t.Õ..|..Õ.. 000140
 0000300A C48302A5 09CC9A06 76FF0876 FFF876FF 005C681E F8468901 7000359A .5.p..F%.h\..v%.v..v..ã.Ê..á.=.. 000160
 E9037500 00300AC4 83FFFF0A 479A0676 FF0876FF F876FF00 5C681E00 23E90374 t.Õ#..h\..v%.v..v..G....á.=..u.Õ 000180
 07E90000 FE46C7FC 5689FA46 890C5788 260A4788 26065EC4 008CE900 01880006 ..|..Õ¥.á^.&.G.&.W..F*.V=úF±..Õ. 0001A0
 470B2607 8826FA5E C40087E9 03770847 3926FE46 88065EC4 08FA4683 FE46FF00 ..F±.F*.á^..F±&9G.w.Õ..á^*&..&.G 0001C0
 E42A0240 8A26005C 1EC403EE C1FE7688 002AE903 720100FE 7E810031 E9037502 .u.Õ1..-±..r.Õ*..v±èŸ.á.\.&.ã.*Õ 0001E0

Dump of file SATURN:[PCCOMMON.DUMP.DLL]MEM.TMP;1 on 18-APR-1990 10:47:47.01
File ID (723,10,0)   End of file block 25 / Allocated 28

Virtual block number 15 (0000000F), 512 (0200) bytes

 77FF26FA 5EC4FFA7 E90003E9 0375C285 E2D309F7 07E98307 E183FE4E 8800018A ¤...N±.Ã..Õ.%\&ã.õu.Õ..ÕÏ.á^*&.w 000000
 7688001D E9037201 00FE7E81 0030E900 01880006 E9037500 00300000 01CA9A02 ..ò...=..u.Õ..|..ÕO..-±..r.Õ...v 000020
 0088FF63 E9024008 26E002D9 F607E980 07E183FE 4E8801B0 005C1EC4 03EEC1FE ±èŸ.á.\.¯..N±.Ã..Õ.-1@Ä&.ã.Õc.|. 000040
 0C578826 0A478826 065EC4D8 8E025A88 1E565700 0010C8CB C95F5E1F 0000E900 .Õ...^_èùà...WV.|Z..Äá^.&.G.&.W. 000060
 C4F65689 F4468906 57882604 47882606 5EC4FE56 89FC4689 C10303E1 C10A4E88 .N.èÃ..è.F=.V±á^.&.G.&.W..F¶.V-á 000080
 000030FA 4EFFFA46 8822F446 830004E9 F0880273 00359AFA 46890247 8826065E ^.&.G..F*.5.a..ÞÕ...F¶".F*.N*=.. 0000A0
 7201000A 7E810033 E90375FE 38003AE9 037500FF 833F8826 F45EC400 ACE90375 u.Õ¯.á^¶&.?...u.Õ:.;±u.Õ3..~...r 0000C0
 8307E183 0A4E8800 01BAE42A 02478A26 F6468EF4 5E0303E8 C10A5E88 002CE903 .Õ,..^.èŠ..^¶.F-&.G.*õa...N..Ã.. 0000E0
 FFFF9A50 16F8468D 570277FF 26FC5EC4 FFA3E900 03E90375 C285E203 D9F707E9 Õ.%\&ã.õu.Õ..ÕÈ.á^=&.w.W.F%.P... 000100
 B80006E9 03750247 3926F846 88FC5EC4 0047E900 01880006 E9037500 00300000 ..=..u.Õ..|..ÕG.á^=.F%&9G.u.Õ..| 000120
 0A4E8801 80F6468E F45E0303 E8C10A5E 88001FE9 03720100 0A7E8100 32E90001 ..Õ2..~...r.Õ...^.èŠ..^¶.F-¯..N. 000140
 000008C8 C8C95F5E 1F0000E9 000088FF 42E90247 0826E002 D9F607E9 8007E183 .Ã..Õ.-1@Ä&.G.ÕB.|..Õ...^_èùà... 000160
 89F84689 00581688 260056A1 26060406 8EFE4689 48064688 D88E0381 881E5657 WV.|...Ã.F.H.F±...à.&ÂV.&..X..F%. 000180
 E9037500 0030FC4E FFFC4688 22F84683 0004E9FC 4689005A A1260606 068EFA56 V*..a.&ÂZ..F=Õ...F%".F=.N==..u.Õ 0001A0
 EEC1FE76 88004EE9 03720100 FE7E81FF DFE90003 E9037400 3F8326F8 5EC4006A j.á^%&.?.t.Õ..ÕO..-±..r.ÕN..v±èŸ 0001C0
 28E90375 C285E2D3 D9F707E9 8307E183 FE4E8800 01BAE42A 02408A26 F85EC403 .á^%&.ã.*õa...N±.Ã..Õ.%\&ã.õu.Õ( 0001E0
```

```
Dump of file SATURN:[PCCOMMON.DUMP.DLL]MEM.TMP;1 on 18-APR-1990 10:47:47.01
File ID (723,10,0)   End of file block 25 / Allocated 28

Virtual block number 16 (00000010), 512 (0200) bytes

 F607E980 07E183FE 4E8801B0 F85EC403 EEC1FE76 8B001EE9 03720100 FE7E8100 ..-±..r.Õ...v±èŸ.á^½¯..N±.Ã..Õ.- 000000
 02880002 00790001 03320103 000690CB C95F5E1F FF84E902 40202600 F6E00209 ]@Ã-Ã& ã.Õ...^_èù.....2...y..... 000020
 042E0103 00000008 04940002 00000006 038C0002 00000005 020E0002 00000004 ..............¥................. 000040
 16FA468D D88EFFFF 881E5657 000006C8 00000000 00000000 00000000 00250001 ..X.............à...WV.|...Ã.F°. 000060
 0000E900 00880002 A3FA4688 000CE900 01880006 E9037500 00300000 FFFF9A50 P.....=..u.Õ..|..Õ...F°É..|..Õ.. 000080
 000004C8 CBC95F5E 1F0000E9 0002A1D8 8E000888 1E565700 0000C8CB C95F5E1F .^_èùà...WV.|...ÃÃ..Õ...^_èùà... 0000A0
 0001B800 06E90375 00003004 C483FFFF 033E9A50 16FC468D D88E003D B81E5657 WV.|=..Ã.F=.P.>....á.=..u.Õ..|.. 0000C0
 04A3F9F7 0022B999 0056062B 26000006 8EFC4688 07892600 02A1FC5E C40024E9 Õ$.á^=Ã..&...F•....&+.V..¿".¼°É. 0000E0
 5E1F0000 E90004A1 D88E0054 881E5657 000000C8 CBC95F5E 1F0000E9 00008800 .|..Õ...^_èùà...WV.|T..ÃÃ..Õ...^ 000100
 0000005E 00010012 01030000 000900A4 00020000 00040060 00020003 90C8C95F _èù.....`.......É............^... 000120
 085EC4F4 5689F246 890C5788 260A4788 26085EC4 D88EFFFF 881E5657 000012C8 Ã...WV.|...Ãó^.&.G.&.W..F·.V¶á^. 000140
 46880000 FE46C7EE 46890004 05064688 F0468900 04050646 88FC4689 08478B26 &.G..F•.F.....FÞ.F.....FŸúF±...F 000160
 C4007AE9 0372FE46 39FC4688 08F84683 FE46FF00 07E9FA56 89F84689 F45688F2 ·.V¶.F½.V°Õ...F±.F½..F=9F±r.Õz.á 000180
 9A006A00 6A37FF26 0277FF26 F85EC4FF DCE90003 E9037402 47082607 8B26F85E ^½&..&.G.t.Õ..ÕÉ.á^½&.w.&.7j.j.. 0001A0
 ACE90003 E90372F6 4639F046 88FFBAE9 0003E903 74FFF67E 83F64689 0000FFFF .....F-.—.t.Õ..Õ¤..FÞ9F-r.Õ..Õ¯ 0001C0
 02039A37 FF260277 FF26F85E C4FE76FF EE76FF10 76FF1276 FF0C76FF 0E76FFFF ..v..v..v..v..vŸ.v±á^½&.w.&.7... 0001E0

Dump of file SATURN:[PCCOMMON.DUMP.DLL]MEM.TMP;1 on 18-APR-1990 10:47:47.01
File ID (723,10,0)   End of file block 25 / Allocated 28

Virtual block number 17 (00000011), 512 (0200) bytes

 46880000 FE46C7FF 74E90128 E90000B8 FF7DE900 03E90375 00003010 C4830120 -..á.=..u.Õ..Õ).|..Õ(.Õt.úF±...F 000000
 C40044E9 0372FE46 39FC4688 08F84683 FE46FF00 07E9FA56 89F84689 F45688F2 ·.V¶.F½.V°Õ...F±.F½..F=9F±r.ÕD.á 000020
 FE76FFEE 76FF1076 FF1276FF 0C76FF0E 76FF0032 E9037502 47082607 8B26F85E ^½&..&.G.u.Õ2..v..v..v..v..vŸ.v± 000040
 008EE900 00880006 E9037400 003010C4 8301E502 039A37FF 260277FF 26F85EC4 á^½&.w.&.7...Í..á.=..t.Õ..|..Õ/. 000060
 01880006 E9037500 003008C4 83018808 D89A0876 FF0A76FF 5016FE46 8DFFAAE9 Õ¨..F±.P.v..v..Ü....á.=..u.Õ..|. 000080
 FFEE76FF 37FF2608 5EC4FA56 89F84689 F45688F2 460303E0 C1FE4688 009AE900 .Õ...F±éÃ..F·.V¶.F½.V°á^.&.7.vŸ. 0000A0
 F626085E C40063E9 0001B800 06E90375 00003008 C483FFFF 06489AF8 76FFFA76 v°.v½.X....á.=..u.Õ..|..Õc.á^.&- 0000C0
 0006E903 7500030D 06C483FF FF03799A 0876FF0A 76FFFE76 FF001FE9 03750107 ..u.Õ...v±.v..v..y....á.=..u.Õ.. 0000E0
 260277FF 26F85EC4 FE76FFEE 76FF1076 FF1276FF 0C76FF0E 76FF0038 E90001B8 |..Õ8..v..v..v..v..vŸ.v±á^½&.w.& 000100
 5E1F0000 E90000B8 0006E900 01880006 E9037500 003010C4 83FFFF02 039A37FF .7......á.=..u.Õ..|..Õ..|..Õ...^ 000120
 0E5EC400 00FFFF9A 0C76FF06 76FF0876 FFD88E00 08B81E56 57000000 C8CBC95F _èùà...WV.|...Ã.v..v..v.....á^. 000140
 0000E900 00880789 260A4688 125EC400 0FE90001 B80006E9 03740000 3D078926 Ë..=..t.Õ..|..Õ..á^..F.&..|..Õ.. 000160
 00000007 00C00002 00000005 01830002 00000004 01510002 000690C8 C95F5E1F .^_èù.....Q.......•.........Ã.... 000180
 00000000 00000000 00E40002 02190103 00E30002 00800103 00000008 020B0002 ..............D.......Õ......... 0001A0
 E0865800 00FFFF9A 5016C488 50EC8855 00000000 00000000 00000000 00000000 ................U.$P.á.P.....X.Ã 0001C0
 E5880001 88FFFF02 1C9A00F6 E80021E8 0000FFFF 9A006068 1E006268 1E048AA3 È...hb..h'......Õ!.Õ-......|...Í 0001E0

Dump of file SATURN:[PCCOMMON.DUMP.DLL]MEM.TMP;1 on 18-APR-1990 10:47:47.01
File ID (723,10,0)   End of file block 25 / Allocated 28

Virtual block number 18 (00000012), 512 (0200) bytes

 FFB90062 068EFF33 0000BB1E 006816FF 00FF6800 4600F69A 003900A2 9A50C85D ]ùP.Ã.9..-.F.h....h..£..3...b.¿. 000000
 74AEF2C0 330874CA 88A6F3C8 88D18804 6C8E3174 003D8026 47017500 3D80267F .&.=.u.G&.=.t1/l..1.ù¤Í.Õt.3á·Ût 000020
 1FEDEBAA C20A0572 412CAC92 04E0C00E 72412CAC 04918F1F F788071E 061CE8E7 ÕŠ.....¥.¢..¯,Ar.áÃ..¯,Ar..Õ¨ŠÚ. 000040
 00F69A50 00FFB804 7A1EFF04 7400047C 3E83004B 00F69A50 00FCB8EC 885500C3 Û.U.ß|=.P.-.K..>|..t...z '..P.-. 000060
 74964010 74C238AD 06E08E06 5688C08E D88EFFFF 885756EC 8855CB5D E58800AC ¯..|]ùU.ßVW|...Ã.á.V./Ã.Û \t.ã.¢ 000080
 00C69A06 76FF57EC 88550002 CA5DE588 5E5F96EB EBF788AE F2FFFFB9 C033970C ..3á¿..·Û.¼ŠŠ._^.|]Õ..U.ßW....6. 0000A0
 9A501651 521E5300 0288C488 504901F7 AEF2FFFF B9C033FA 88921F74 C00800C0 Ã..Õt...°3á¿..¯Û¼|IP.ÕÉ..S.RQ.P. 0000C0
 9A521650 1653C488 50870491 A7800488 52000288 0002CA5D E5885F58 0000FFFF ....[_.|]Õ..£..R.Ã.Ï..ñP.ÕS.P.R. 0000E0
 885AD479 4804918F 08088106 7500023D 07740001 3D408112 7558C008 0000FFFF .....ÃXu.Ÿã=..t.=..u.Ÿ.....KyÃZ. 000100
 FF000388 C28C06C0 06C401AE E9037306 881EFFD8 33C28C06 8C06C41E E3068A0E .¤.D.á.¥..Õ3Û..|.ã.ÕÛ.á.Ã..ÕÉ... 000120
 0E016A08 7406C43D 06C48800 73E806C4 8F06C48E 007CE806 C48F06C4 8E06881E .|./á.¢á.Õ|./á.¢á.Õs.|á.=á.t.j.. 000140
 01A49A00 6A006A03 6A0051E8 06C48F06 C48ED88E 00CC88C3 0000FFFF 9A01A968 h`......Û|á..Ã/á.¢á.ÕQ.j.j.j..È. 000160
 BF06C48E EC885503 E80031E8 06C48F06 C48E003A E8078B8F 07B88EEC 88550000 ..U.ß/|.¢|.Õ:./á.¢á.Õ1.Š.U.ß/á.¢ 000180
 07E3068A 0E880000 FFFF9A50 06468A50 C033001A E806C48F 06C48E00 23E806C4 á.Õ#./á.¢á.Õ..3áP.F.P.......¤.Õ. 0001A0
 000014C8 00C3EEEB 1DFFF274 02450805 8804EF83 0E73F738 C306881E FF000288 È....|.Û;¼s..ÿ....E.t·..ŠŸù.à... 0001C0
 5689F646 89F25689 F04689C0 28006216 8800F0E9 03750062 3639FF2B F6285657 WV+—+.96b.u.ÕÞ...b.+á.FÞ.V·.F-.V 0001E0
```

```
Dump of file SATURN:[PCCOMMON.DUMP.DLL]MEM.TMP;1 on 18-APR-1990 10:47:47.01
File ID (723,10,0)   End of file block 25 / Allocated 28

Virtual block number 19 (00000013), 512 (0200) bytes

 03767FFF FE814619 74C0080A C4830290 04529A04 6C681EF6 76FFF876 FF0C6AF8 %j..v%.v-.hl..R....á..ât.F.±..v. 000000
 5E88F475 003F8026 F646FFF6 5EC40CEB 47EA7500 3F8026F6 46FFF65E C4008CE9 Õ¥.á^-.F-&.?.uõG$.á^-.F-&.?.u¶.^ 000020
 D5033F9A 56EE5689 EC468904 C483029F 03FA9A04 6A500145 8D8A7500 3F8026F6 -&.?.uо.E.Pj..*....á..F$.VŸV.?.f 000040
 A3EE5688 EC468866 74C208FC 46886D74 EE4608EC 4688FE56 89FC4689 02C48302 ..ó..F=.V±.F$.FŸtm.F=.ôtf.F$.VŸÈ 000060
 5EC42C74 C00B0AC4 83010004 529A046C 681EF076 FFF276FF 0C6A0699 16890697 ......j..v·.vÞ.hl..R....á..ât,á^ 000080
 46FFFC5E C4078A26 F046FFF0 5EC404EC 46830257 89260789 26FE5688 FC4688EC $.F=.V±&..&.W..F$.á^Þ.FÞ&..á^=.F 0000A0
 5EA77500 3F8026F0 5EC4F475 003F8026 F046FFF0 5EC4E8EB 0E74C00A 078826FC =&...ât.$Õá^Þ.FÞ&.?.u¶á^Þ&.?.uÏ^ 0000C0
 55CB50E5 8801FE4F 80260574 C30BC08C 065EC4EC 8855FD18 E90002B8 90C8C95F _èù.¦..Õ.=U.$á^..$.ût.&.O±..Ï]ùW 0000E0
 82E806AC A3127400 25E80875 0006AC3E 831E73FF F1300646 88575602 EC83EC88 ¯$.$.VW.F.=þ.s..>¯..u.Ö%.t.Ê¯.Ò. 000100
 F08BCB5D E58B5E5F 02C48302 5004A09A 0676FF08 750078E8 05740018 E8157500 .u.Ò..t.Òx.u..v....P..á._^.Ï]üEÞ 000120
 73064C9A 5002B051 0E4F8D50 501EC033 FE5E89FE E3834306 5E880776 065E3900 .9^.v..^.C.D±.^±3á.PP.O.Õ¯.P.L.s 000140
 D88EFE5E 880008A3 DA8E0574 020B06B0 A306AE16 87C28838 74FFFA83 08C48303 ..á..*.t8.ô..Ö.Ê¯..Øt..ÖÊ...^±.Ä 000160
 8C0006A3 00000500 0AA30147 800002A3 0000A300 0AB80C47 89484800 08A3C033 3áÈ..HH.G.¦..Ê..Ê...G.Ê.....Ê... 000180
 6A560000 0ACBC3D9 8EC18CD2 0800F6E8 06801E8E DB33064E 88C08ED8 8CC31FD8 Ä.ü.Ä.á.N.3Ü..¯.Ò-..Ø.ê.1üà...Vj 0001A0
 902FE899 C02B0674 FFFFC2F7 FA5689F8 46890427 074A9A06 76FF006A 0876FF00 ..v.j..v..J.'..F%.V*%ô..t.+á.$/. 0001C0
 07029A50 FE76FF00 6A561274 D00BFE56 89FC4689 02C48304 40033F9A 56F8768B .v%V.?.@..á..F=.V±.Ät.Vj..v±P... 0001E0

Dump of file SATURN:[PCCOMMON.DUMP.DLL]MEM.TMP;1 on 18-APR-1990 10:47:47.01
File ID (723,10,0)   End of file block 25 / Allocated 28

Virtual block number 20 (00000014), 512 (0200) bytes

 C4D98827 E30E4E8B 1E5657EC 885590CB C95EFE56 88FC4688 9007EB08 C483039F ...á.$...F=.V±^èù.U.$WV..H.D'.\á 000000
 04740477 FF453A26 C933FF44 8AA6F30A 76C5FE8B CB03D9F7 AEF2C033 F7880C67E -..%3á·Ü%l.ù.±év.µl.D.3è&:E.w.t. 000020
 CB5DE588 01FE4F80 0474D808 065E88EC 885500CB 5DE5885F 5E1FC188 D1F74949 II%l.ê.^_.Ï]ù.U.$.^..Ût..O±..Ï]ù 000040
 A3FE2440 24EB99C0 33057501 76E80005 B8071E29 75003F83 06A28857 56EC8855 U.$VWEÀ..?.u)..|..Òv.u.3á.$$@$±È 000060
 0009E8C0 8ED88C06 4E8806A8 3689FFFE FE44C704 C6830001 04C79606 A4A306A2 Â.ÊÊ..ú....6.úD±±..6´..N..Ä.âÒ.. 000080
 48437401 A8FE88AD FC027788 F273EEF9 83FEE180 FA744100 D0E9C85D E58B5E5F _^.Ï]ùÒÂ.At*.Â±.*Ÿs·.w.=Ü.±´.tCH 0000A0
 89F9030C 74FE8BE6 E8FE4489 F7880002 05C20335 7401A8AD F0030088 1573C138 ;ès..Â.ÞÜ´.t5.ô....%.D±$l.±t_.*. 0000C0
 7F8906B0 1E8C2605 74D13801 AAB9DA8C C688FE4C FEF90305 E8058948 C128FE4C L±+èH..$..*±L±.6.Ö¿¯.;lt.&..¯... 0000E0
 03D088BC 73C13848 FE88F274 01A8ADF0 03FE8825 74FFFE30 02068406 C626C302 .ù&ó.Ç..=±.t%.±.ÞÜ´.t·.±H;ès¥.Â. 000100
 0EFE2615 E8D88E04 74C00808 4788E6EB FE4489F7 88000205 C203E274 01A8ADF0 ÞÜ´.tâ.ô....%.D±$l.G..ât..Ä$.&±. 000120
 C63B0068 E8C03306 7788B8E8 378806AC 1E8E2605 74C73805 338FD88C 12740684 Ç.t..Äe3.;út.&..¯..7$E.w.3âÒk.;6 000140
 C13B0587 B9D88C98 E84E4E96 0574001D E8FE4DFE 0074005F E8984040 01240074 t.$.@@.Ò_.t.±N±Ò..t..NN$..Ä¿..;è 000160
 267FFF8A 414149C8 28037401 A8FE4588 51C399C0 33024789 07880680 A3260474 t.&E¯....G.3á.ùQ.E±´.t.+âIAA□..& 000180
 F7087500 0CE8C628 C22302F7 0072C203 1572C603 C188F575 EAD10476 06821638 ;.ý.v.1ôu%.ê.ór..ór.%@#ò+6Ò..u.% 0001A0
 88067789 FFFEFE44 C7F203F0 88FE8857 1874001D E85152C3 59C033E5 75EAD1D2 @1ôul3âYÜRQÒ..t.W.±.Þ.·úD±±..w.. 0001C0
 C483040C 064C9A1F 06500001 88505252 1ED23350 53C35A59 58FE5589 4AD72806 ø+=J.U±XYZÜSP3Ø.RRP|..P...L....á 0001E0

Dump of file SATURN:[PCCOMMON.DUMP.DLL]MEM.TMP;1 on 18-APR-1990 10:47:47.01
File ID (723,10,0)   End of file block 25 / Allocated 28

Virtual block number 21 (00000015), 512 (0200) bytes

 46880856 88006ABF 3875000A 7E830657 56EC8855 C3D20802 74585A1F FFFA8308 ..*..Z[t..@ÇU.$VW..~..uB¢j..V..F 000000
 003EE856 0E468902 44880074 F73B1174 48046A36 884CE827 720057E8 07754806 .Hu.ÒW.r'$L.6j.Ht.;%t..D..F.VÒ>. 000020
 9A50C033 501652C4 885021E8 99FFFFB8 06750208 0473046A FE8104C6 8334735E ^s4.ó..±j.=..Øu.|...$ÍP.áR.P3âP. 000040
 4E88CB50 E5885E5F 07C03303 88046A36 89025C89 1489E675 C085F95B 0000FFFF ....[*.âul...\..6j..Æ3â._^.Ï]ù.N 000060
 F73BC18E D3882672 1C03DA88 2CE8F9F2 75046AFE 8104C683 0C74024C 39F7880E ..%9L.t..ó..±j.u·*$,.Ö..r&.Æ.è;% 000080
 D1880487 92006416 890475F7 3BDE75C0 850000FF FF9A5153 13730064 1E390675 u.9.d.=.SQ......âuB;%u...d.....Ï 0000A0
 D128D187 D103D323 D818D128 0C74DAF7 D788067E C45738E3 0C4E88EC 885500C3 û.U.$.N.D8Wá~..=%Öt.+1.ÜW£.1.1+1 0000C0
 F3C913A8 F3E9D1C3 8EFFFFC3 81C38C10 E30187AA F3C913AB F3E9D1E0 8A0A4688 .F..ÂlÕµ¨.èµ^.1D..Û.Û...ûlÕµ¨.èµ 0000E0
 88E3F706 46880875 0A5E8808 080C5E8B 084688EC 8855C85D 08568806 46885FAA ¨..F..V.]ùW.$.F..^..Ä.^.u..F.%D. 000100
 03000808 CA5DE588 D103E3F7 064688C8 030C66F7 064688C8 88E3F700 08CA5DE5 Ï]ò..%D.à.F.%f..à.F.%D.1.Ï]ò.... 000120
 03008800 01073501 05000000 08063C00 02000700 0101BE01 03000500 0101F601 .-......./.......<.......5...... 000140
 03002700 04012002 03002600 0106E801 03000000 0805BC00 02002200 0106A001 .....".....¥.......$...&... ...'.. 000160
 00000000 00000000 00005C00 01001901 03005800 01002C01 03004000 01014001 .@...M...,...[.......\.......... 000180
 54206E75 5220534D 00000000 00000000 00000000 00000008 00000002 0001FFFF .......................MS Run-T 0001A0
 38383931 20296328 20746867 69727970 6F43202D 20797261 7262694C 20656069 ime Library - Copyright (c) 1988 0001C0
 00000001 00475542 45445F4D 45400011 70726F43 2074666F 736F7263 694D202C , Microsoft Corp..MEM_DEBUG..... 0001E0
```

```
Dump of file SATURN:[PCCOMMON.DUMP.DLL]MEM.TMP;1 on 18-APR-1990 10:47:47.01
File ID (723,10,0)   End of file block 25 / Allocated 28

Virtual block number 22 (00000016), 512 (0200) bytes

00000606 07C001D9 07C007C0 00000000 00000000 00000000 00000000 00000000 .....................å.å.).å.ø... 000000
00000000 00000000 00000000 00000000 00000000 00000000 00000000 00000000 ................................ 000020
00000000 00000000 00000000 00000000 00000000 00000000 00000000 00000000 ................................ 000040
00000000 00000000 00000000 00000000 00000000 00000000 00000000 00000000 ................................ 000060
00000000 00000000 00000000 00000000 00000000 00000000 00000000 00000000 ................................ 000080
00000000 00000000 00000000 00000000 00000000 00000000 00000000 00000000 ................................ 0000A0
00000000 00000000 00000000 00000000 00000000 00000000 00000000 00000000 ................................ 0000C0
00000000 00000000 00000000 00000000 00000000 00000000 00000000 00000000 ................................ 0000E0
00000000 00000000 00000000 00000000 00000000 00000000 00000000 00000000 ................................ 000100
00000000 00000000 00000000 00000000 00000000 00000000 00000000 00000000 ................................ 000120
00000000 00000000 00000000 00000000 00000000 00000000 00000000 00000000 ................................ 000140
00000000 00000000 00000000 00000000 00000000 00000000 00000000 00000000 ................................ 000160
00000000 00000000 00000000 00000000 00000000 00000000 00000000 00000000 ................................ 000180
00000000 00000000 00000000 00000000 00000000 00000000 00000000 00000000 ................................ 0001A0
00000000 00000000 00000000 00000000 00000000 00000000 00000000 00000000 ................................ 0001C0
00000000 00000000 00000000 00000000 00000000 00000000 00000000 00000000 ................................ 0001E0

Dump of file SATURN:[PCCOMMON.DUMP.DLL]MEM.TMP;1 on 18-APR-1990 10:47:47.01
File ID (723,10,0)   End of file block 25 / Allocated 28

Virtual block number 23 (00000017), 512 (0200) bytes

00000000 00000000 00000000 00000000 00000000 00000000 00000000 00000000 ................................ 000000
00000000 00000000 00000000 00000000 00000000 00000000 00000000 00000000 ................................ 000020
00000000 00000000 00000000 00000000 00000000 00000000 00000000 00000000 ................................ 000040
00000000 00000000 00000000 00000000 00000000 00000000 00000000 00000000 ................................ 000060
00000000 00000000 00000000 00000000 00000000 00000000 00000000 00000000 ................................ 000080
00000000 00000000 00000000 00000000 00000000 00000000 00000000 00000000 ................................ 0000A0
00000000 00000000 00000000 00000000 00000000 00000000 00000000 00000000 ................................ 0000C0
00000000 00000000 00000000 00000000 00000000 00000000 00000000 00000000 ................................ 0000E0
00000000 00000000 00000000 00000000 00000000 00000000 00000000 00000000 ................................ 000100
00000000 00000000 00000000 00000000 00000000 00000000 00000000 00000000 ................................ 000120
00000000 00000000 00000000 00000000 00000000 00000000 00000000 00000000 ................................ 000140
00000000 00000000 00000000 00000000 00000000 00000000 00000000 00000000 ................................ 000160
00000000 00000000 00000000 00000000 00000000 00000000 00000000 00000000 ................................ 000180
00000000 00000000 00000000 00000000 00000000 00000000 00000000 00000000 ................................ 0001A0
00000000 00000000 00000000 00000000 00000000 00000000 00000000 00000000 ................................ 0001C0
00000000 00000000 00000000 00000000 00000000 00000000 00000000 00000000 ................................ 0001E0

Dump of file SATURN:[PCCOMMON.DUMP.DLL]MEM.TMP;1 on 18-APR-1990 10:47:47.01
File ID (723,10,0)   End of file block 25 / Allocated 28

Virtual block number 24 (00000018), 512 (0200) bytes

465F435F 006A0000 00000000 00000000 00000000 00000000 00000000 00000000 ..........................j._C_F 000000
00000001 00000000 00000000 00000000 00000000 00000030 4F464E49 5F454C49 ILE_INFO=........................ 000020
00000000 00000000 00000000 00000000 00000000 00000000 00000000 81818101 ................................ 000040
00000000 00000000 00000000 00000000 00000000 00000000 00000000 00000000 ................................ 000060
00000000 00000000 00000000 00000000 00000000 00000000 00000000 00000000 ................................ 000080
00000000 00000000 00000000 00000000 00000000 00000000 00000000 00000000 ................................ 0000A0
00000000 00000000 00000000 00000000 00000000 00000000 00000000 00000000 ................................ 0000C0
00000000 00000000 00000000 00000000 00000000 00000000 00000000 00000000 ................................ 0000E0
00000000 00000000 00000000 00000000 00000000 00000000 00000000 00000000 ................................ 000100
00000000 00000000 00000000 00000000 00000000 00000000 00000000 00000000 ................................ 000120
0A0A0A0A 0A0A0A0A 0A0A0A0A 0A0A0A0A 0A0A0A0A 0A0A0A0A 0A0A0A0A 0A0A0A00 ................................ 000140
0A0A0A0A 0A0A0A0A 0A0A0A0A 0A0A0A0A 0A0A0A0A 0A0A0A0A 0A0A0A0A 0A0A0A0A ................................ 000160
0A0A0A0A 0A0A0A0A 0A0A0A0A 0A0A0A0A 0A0A0A0A 0A0A0A0A 0A0A0A0A 0A0A0A0A ................................ 000180
0A0A0A0A 0A0A0A0A 0A0A0A0A 0A0A0A0A 0A0A0A0A 0A0A0A0A 0A0A0A0A 0A0A0A0A ................................ 0001A0
0A0A0A0A 0A0A0A0A 0A0A0A0A 0A0A0A0A 0A0A0A0A 0A0A0A0A 0A0A0A0A 0A0A0A0A ................................ 0001C0
0A0A0A0A 0A0A0A0A 0A0A0A0A 0A0A0A0A 0A0A0A0A 0A0A0A0A 0A0A0A0A 0A0A0A0A ................................ 0001E0
```

```
Dump of file SATURN:[PCCOMMON.DUMP.DLL]MEM.TMP;1 on 18-APR-1990 10:47:47.01
File ID (723,10,0)   End of file block 25 / Allocated 28

Virtual block number 25 (00000019), 512 (0200) bytes

 0A0A0A0A 0A0A0A0A 0A0A0A0A 0A0A0A0A 0A0A0A0A 0A0A0A0A 0A0A0A0A 0A0A0A0A ................................ 000000
 0A0A0A0A 0A0A0A0A 0A0A0A0A 0A0A0A0A 0A0A0A0A 0A0A0A0A 0A0A0A0A 0A0A0A0A ................................ 000020
 00000000 00000000 00000000 00000000 00000000 00000000 00000000 0000000A ................................ 000040
 06CC06CA 06C806C6 06C4FFFF 00000000 00000000 00000000 00000000 20000000 ... ....................ó.ó.à.ò.ä. 000060
 68636174 7320200A 0D303030 36520000 3E3E4753 404E3C3C 06D40602 06D006CE ô.Å.@.å.<<NMSG>>..R6000..- stack 000080
 64207265 6765746E 6920200A 0D333030 36520003 000A0077 6F6C6672 65766F20  overflow.....R6003..- integer d 0000A0
 756F6E65 20746F6E 20200A0D 38303036 52000800 0A0D3020 79622065 64697669 ivide by 0.....R6008..- not enou 0000C0
 39303036 52000900 0A0D7374 6E656D75 67726120 726F6620 65636170 73206867 gh space for arguments.....R6009 0000E0
 6E6F7269 766E6520 726F6620 65636170 73206867 756F6E65 20746F6E 20200A00 ..- not enough space for environ 000100
 00020020 726F7272 65206560 6974206E 757200FF 000A0000 FC000A0D 746E6560 ment...*......run-time error ... 000120
 64616F6C 20746F6E 20746E69 6F702067 6E697461 6F6C6620 200A0D32 30303652 R6002..- floating point not load 000140
 00000000 00000000 00000000 00000000 0008006C 00020001 FFFFFF00 0A0D6465 ed.........l.................... 000160
 00000000 00000000 00000000 00000000 00000000 00000000 00000000 00000000 ................................ 000180
 00000000 00000000 00000000 00000000 00000000 00000000 00000000 00000000 ................................ 0001A0
 00000000 00000000 00000000 00000000 00000000 00000000 00000000 00000000 ................................ 0001C0
 00000000 00000000 00000000 00000000 00000000 00000000 00000000 00000000 ................................ 0001E0
                                                      Dump of file SATURN:[PCCOMMON.DUMP.DLL]METHGLOB.TMP;1 on 18-APR-1990 10:47:51.18
File ID (726,3,0)   End of file block 2 / Allocated 4

Virtual block number 1 (00000001), 512 (0200) bytes

 00000000 00000040 00000000 00000088 0000FFFF 000C0004 00000002 00365A4D MZ6.............|........a....... 000000
 00000080 00000000 00000000 00000000 00000000 00000000 00000000 00000000 ................................ 000020
 6F6E6E61 63206D61 72676F72 70207369 685421CD 4C01B821 CD09B400 0EBA1F0E ..¤..Ç.ëI|.LëIThis program canno 000040
 00000000 00000024 0A0D0D2E 65646F6D 20534F44 206E6920 6E757220 65622074 t be run in DOS mode....$....... 000060
 00010004 00000000 00030000 00000800 0004800E A88F434A 00070099 0505454E NE......JC.´.................... 000080
 00000000 00000000 00010000 00040000 00000120 007E007C 00600060 00400021 !.a.'.'.|.~. .................... 0000A0
 00120F01 000C0022 00110F00 0011001F 005C0F00 005C0018 001C0F00 001C0015 ..........\...\........."....... 0000C0
 06000001 00000154 494E4942 4F4C4748 5445405F 00000042 4F4C4748 54454D08 .METHGLOB..._METHGLOBINIT....... 0000E0
 00000000 03010153 53414C43 52455453 49474552 48544540 5F12444F 48544540 METHOD._METHREGISTERCLASS....... 000100
 00007364 6F687465 6D20646E 61202973 28746365 6A624F20 616C6C69 6E61561D .Vanilla Object(s) and methods.. 000120
 FF002E9A D88EFFFF 881E5657 000000C8 00000000 00000000 00000000 00000000 ................à...WV.|...Ä.... 000140
 00000000 00040008 00020000 0002000F 00020002 CBC95F5E 1F0000E9 00018BFF .|..Õ...^_èù.................... 000160
 08881E56 57000000 C8CBC95F 5E1F0000 E9000088 D88EFFFF 881E5657 000000C8 à...WV.|...Ä|..Õ...^_èùà...WV.|. 000180
 0000681E 006AD88E 001F881E 56570000 00C8CBC9 5F5E1F00 00E90000 8BD88E00 ..Ä|..Õ...^_èùà...WV.|...Äj..h.. 0001A0
 00020002 CBC95F5E 1F0000E9 12C48300 00FFFF9A 006A006A 016A006A 006A026A j.j.j.j.j.j.......á.Õ...^_èù.... 0001C0
 1F02C483 FFFF0000 9A57D88E FFFF881E 00000008 0001004D 02030000 00040036 6.......M........|...ÄW......á.. 0001E0

Dump of file SATURN:[PCCOMMON.DUMP.DLL]METHGLOB.TMP;1 on 18-APR-1990 10:47:51.18
File ID (726,3,0)   End of file block 2 / Allocated 4

Virtual block number 2 (00000002), 512 (0200) bytes

 00000000 00000000 00000000 00000000 04000200 02000000 01000A00 020002C8 ù............................... 000000
 00000000 00000000 00000000 00020004 00020001 FFFF0017 0190000A 00000001 ................................ 000020
 00000000 00000000 00000000 00000000 00000000 00000000 00000000 00000000 ................................ 000040
 00000000 00000000 00000000 00000000 00000000 00000000 00000000 00000000 ................................ 000060
 00000000 00000000 00000000 00000000 00000000 00000000 00000000 00000000 ................................ 000080
 00000000 00000000 00000000 00000000 00000000 00000000 00000000 00000000 ................................ 0000A0
 00000000 00000000 00000000 00000000 00000000 00000000 00000000 00000000 ................................ 0000C0
 00000000 00000000 00000000 00000000 00000000 00000000 00000000 00000000 ................................ 0000E0
 00000000 00000000 00000000 00000000 00000000 00000000 00000000 00000000 ................................ 000100
 00000000 00000000 00000000 00000000 00000000 00000000 00000000 00000000 ................................ 000120
 00000000 00000000 00000000 00000000 00000000 00000000 00000000 00000000 ................................ 000140
 00000000 00000000 00000000 00000000 00000000 00000000 00000000 00000000 ................................ 000160
 00000000 00000000 00000000 00000000 00000000 00000000 00000000 00000000 ................................ 000180
 00000000 00000000 00000000 00000000 00000000 00000000 00000000 00000000 ................................ 0001A0
 00000000 00000000 00000000 00000000 00000000 00000000 00000000 00000000 ................................ 0001C0
 00000000 00000000 00000000 00000000 00000000 00000000 00000000 00000000 ................................ 0001E0
```

Dump of file SATURN:[PCCOMMON.DUMP.DLL]MOD.TMP;1 on 18-APR-1990 10:47:55.47
File ID (736,57,0)   End of file block 42 / Allocated 44

Virtual block number 1 (00000001), 512 (0200) bytes

```
00000000 00000040 00000000 000000B8 0000FFFF 00000004 0000002A 011D5A4D MZ..*...........|.......a....... 000000
00000080 00000000 00000000 00000000 00000000 00000000 00000000 00000000 ................................ 000020
6F6E6E61 63206D61 72676F72 70207369 685421CD 4C01B821 CD09B400 0EBA1F0E ..o..Ç.ë|.LëIThis program canno 000040
00000000 00000024 0A0D0D2E 65646F6D 20534F44 206E6920 6E757220 65622074 t be run in DOS mode....$....... 000060
00060004 00000000 0003214A 00000000 00048009 73C2CB31 0037036E 0505454E NE..n.7.1üôs........J!.......... 000080
00000000 00000000 00010000 00040000 00000425 01E001D4 00600060 0040004A J.a.`.`.å.Á.X................... 0000A0
0CF00F21 0CD80463 2EB00F00 2EAF0171 08660F00 086500E3 09080F00 09080047 G.......D.e...f.q.£...¯.c.Ü.|.b. 0000C0
4D474416 00014F46 4E494554 41545354 45534544 4F4D4D47 44130000 444F4D03 .MOD...DGMMODESETSTATEINFO...DGM 0000E0
45555145 444F4D4D 47441500 02544E45 56455945 4B535345 434F5250 45444F4D MODEPROCESSKEYEVENT...DGMMODEQUE 000100
04545352 49465952 45555145 444F4D4D 47441100 034F464E 49455441 54535952 RYSTATEINFO...DGMMODEQUERYFIRST. 000120
45444F4D 4D474408 00055443 4E554645 53554F4D 54455345 444F4D40 47441400 ..DGMMODESETMOUSEFUNCT...DGMMODE 000140
52455551 45444F4D 4D474416 00074C4C 55504544 4F4D4D47 440B0006 48535550 PUSH...DGMMODEPULL...DGMMODEQUER 000160
4E554659 454B5952 45555145 444F4D4D 47441400 0854434E 55464553 554F4D59 YMOUSEFUNCT...DGMMODEQUERYKEYFUN 000180
47441800 0A455441 54534553 554F4D59 52455551 45444F4D 4D474416 00095443 CT...DGMMODEQUERYMOUSESTATE...DG 0001A0
45444F4D 4D474419 000B544E 45564545 53554F4D 53534543 4F525045 444F4D4D MMODEPROCESSMOUSEEVENT...DGMMODE 0001C0
54534544 45444F4D 4D47440E 000C5941 52524154 434E5546 4553554F 4D544553 SETMOUSEFUNCTARRAY...DGMMODEDEST 0001E0
```

Dump of file SATURN:[PCCOMMON.DUMP.DLL]MOD.TMP;1 on 18-APR-1990 10:47:55.47
File ID (736,57,0)   End of file block 42 / Allocated 44

Virtual block number 2 (00000002), 512 (0200) bytes

```
5345444F 4D4D4744 12000E48 544E5952 45555145 444F4D4D 47440F00 00594F52 ROY...DGMMODEQUERYNTH...DGMMODES 000000
54415453 59454B59 52455551 45444F4D 4D474414 000F5443 4E554659 454B5445 ETKEYFUNCT...DGMMODEQUERYKEYSTAT 000020
01810074 002F0010 00070001 00001145 54414552 4345444F 4D4D4744 00001045 E...DGMMODECREATE........./.t... 000040
4F4C4243 4F4C4C41 4D454D00 4D454D03 534C4C41 43534F44 084E4957 4D500500 ..PMWIN.DOSCALLS.MEM.MEMALLOCBLO 000060
45564F4D 45525145 534C5455 0E545544 034B434F 4C424545 52464D45 4D0C4B43 CK.MEMFREEBLOCK.DUT.UTLSEQREMOVE 000080
4C54550C 4C455453 52494651 45534C54 55004C45 48544E51 45534C54 55084C45 EL.UTLSEQNTHEL.UTLSEQFIRSTEL.UTL 0000A0
52455551 4D474414 4D474403 4D455449 5145534C 54550A4C 45485355 50514553 SEQPUSHEL.UTLSEQITEM.DGM.DGMQUER 0000C0
47440E54 45534646 4F4C4C4F 5243534D 47440F54 4E455458 45574F44 4E495759 YWINDOWEXTENT.DGMSCROLLOFFSET.DG 0000E0
55514D47 44125345 444F4D59 52455551 4D47440D 54504D52 4F46534E 4152544D MTRANSFORMPT.DGMQUERYMODES.DGMQU 000100
41524431 4E4F5454 55425952 4555514D 47441354 4E45494C 43444E57 48595245 ERYHWNDCLIENT.DGMQUERYBUTTON1DRA 000120
414C5952 4555514D 47441347 41524432 4E4F5454 55425952 4555514D 47441347 G.DGMQUERYBUTTON2DRAG.DGMQUERYLA 000140
1745444F 4D455355 4F4D5453 414C5952 4555514D 47441554 50455355 4F4D5453 STMOUSEPT.DGMQUERYLASTMOUSEMODE. 000160
55425445 534D4744 1141544C 45444C4C 4F524353 48535550 59524555 514D4744 DGMQUERYPUSHSCROLLDELTA.DGMSETBU 000180
534D4744 11474152 44324E4F 54545542 5445534D 47441147 41524431 4E4F5454 TTON1DRAG.DGMSETBUTTON2DRAG.DGMS 0001A0
444F4D45 53554F4D 5453414C 5445534D 47441354 50455355 4F4D5453 414C5445 ETLASTMOUSEPT.DGMSETLASTMOUSEMOD 0001C0
0302AD03 016F0302 2A03080F 03027303 02114554 49525753 4F44084F 49530345 E.SIO.DOSWRITE...s.....*..o..Ù.. 0001E0
```

Dump of file SATURN:[PCCOMMON.DUMP.DLL]MOD.TMP;1 on 18-APR-1990 10:47:55.47
File ID (736,57,0)   End of file block 42 / Allocated 44

Virtual block number 3 (00000003), 512 (0200) bytes

```
07980306 D80301C5 03006D03 03080304 970303F3 03073903 03910301 110300AE Ö........9..µ.........m..é..Ù.... 000000
79706F43 20296328 20606574 73797362 7553206D 61726761 69444600 00000003 .....FDiagram Subsystem (c) Copy 000020
53206E6F 6974616D 726F666E 49206E61 6D686361 42203938 39312074 68676972 right 1989 Bachmen Information S 000040
8806468B D88EFFFF 8B1E5657 00000EC8 00000000 2E636E49 202C736D 65747379 ystems, Inc.....à...WV.|...Ä.F.. 000060
260000B8 F65EC400 8DE98D2A B80006E9 0374F846 0BF6468B F85689F6 46890856 V..F-.V%.F-.F%t.Ö..|*.Ö..é^-|..& 000080
8B10FC46 830004E9 000DBEFE 5689FC46 89000405 F8568BF6 46880789 26024789 .G.&...F-.V%....F=.V±/..Ö...F=.. 0000A0
00000447 C726FC5E C4078926 02478926 0000B8FC 5EC40019 E9037500 00304EC6 óN=..u.Ö..é^=|..&.G.&..é^=&úG... 0000C0
304EC68B 0AF24683 0004E900 02BEF456 89F24689 000405F8 568BF646 8BFFD8E9 ÖÄ..F-.V%.å..F·.V¶/..Ö...F·..óN= 0000E0
FFD8E900 000447C7 26F25EC4 07892602 47892600 0088F25E C40019E9 03750000 ..u.Ö..é^·|..&.G.&..é^·&úG...ÖÄ. 000100
F6468908 56880646 88D88E00 08881E56 5700000E C8CBC95F 5E1F0000 E90000B8 |..Ö...^_èùà...WV.|...Ä.F..V..F- 000120
FC468900 0405F856 8BF6468B 0066E98D 2A880006 E90374F8 460BF646 8BF85689 .V%.F-.F¶t.Ö..|*.Öf..F-.V%....F= 000140
000447C7 26FC5EC4 000CE903 7500003D 4EC68810 FC468300 04E90000 BEFE5689 .V±/..Ö...F=..óN=..u.Ö..é^=&úG.. 000160
4EC688OA F2468300 04E90002 BEF45689 F2468900 D405F856 8BF6468B FFE5E900 .Ö|..F-.V%.å..F·.V¶/..Ö...F·..óN 000180
C8CBC95F 5E1F0000 E90000B8 FFE5E900 000447C7 26F25EC4 000CE903 75000030 =..u.Ö..é^·&úG...Ö|.|..Ö...^_èùà 0001A0
037C0000 30000001 7E9A096A 016A006A 0000FE46 C7D88E00 C3B81E56 57000002 ...WV.|Û..ÄúF±..j.j.j.,~...=¯..|. 0001C0
006A10FE 4E830004 E9037C00 00300000 01959A0A 6A016A00 6A08FE4E 830004E9 Ö...N±.j.j.j......=..|.Ö...N±.j. 0001E0
```

```
Dump of file SATURN:[PCCOMMON.DUMP.DLL]MOD.TMP;1 on 18-APR-1990 10:47:55.47
File ID (736,57,0)   End of file block 42 / Allocated 44

Virtual block number 4 (00000004), 512 (0200) bytes

 CBC95F5E 1F0000E9 FE468820 FE4E8300 04E9037C 00003000 00FFFF9A 086A016A j.j......=..|.Õ...N± .F±Õ...^_èù 000000
 0009E903 7D000A7E 830012E9 03750846 08064688 D88E0157 881E5657 000014C8 à...WV.¡W..Ä.F..F.u.Õ...~..).Õ.. 000020
 C70000FF FF9A5016 F6468006 76FF0876 FF00BEE9 802AB800 06E9037F 010A7E83 .~....Õ..|*.Õ/..v..v..F~.P.....û 000040
 F876FF00 8AE9037C 02FE7E83 0000EC46 C7FE46FF 0008E900 01EC46C7 0000FE46 F±..ÚFš..Õ...F±ÚFš...~±.|.Õ...v½ 000060
 D1C103E0 D1E0D1C8 880A4688 0000FFFF 9A5016F2 468DEC76 FF006A00 6AF676FF .v~j.j..vš.F·.P......F..öìÁìÁ.èì 000080
 FC5689FA 46890257 88260788 26EE5EC4 F05689EE 46890004 05F45688 F24603E0 Å.F·.V¶.å..FŸ.Vþá^Ÿ&..&.W..F".V= 0000A0
 7400003D FA5EFF0E 76FF0C76 FF0676FF 0876FFF2 76FFF476 FF003DE9 0375D008 .Åu.Õ=..v¶.v·.v..v..v..v..^"=..t 0000C0
 4789260E 4688EE5E C4064789 260C4688 EE5EC400 010447C7 26EE5EC4 0020E903 .Õ .á^Ÿ&ÚG...á^Ÿ.F.&.G.á^Ÿ.F.&.G 0000E0
 4688D88E 01B8881E 56570000 22C8CBC9 5F5E1F00 00E90000 88FF65E9 0003E908 .Õ..Õe.|..Õ...^_èùà"..WV.||..Ä.F 000100
 E67E8300 0FE90375 01E67E83 0000FFFF 9A5016E6 46800C76 FF0E76FF 01C0E906 .Õå..v..v..F|.P.......~|.u.Õ...~| 000120
 26105EC4 0000FFFF 9A5016F0 468D0C76 FF0E76FF 0188E900 01880006 E9037503 .u.Õ..|..Õ|..v..v..Fþ.P.....á^.& 000140
 F4462806 57882604 47882610 5EC4E456 89E24689 F25618F0 462B0257 88260788 ..&.W.+Fþ.V·.Fã.VÕá^.&.G.&.W.+F¶ 000160
 5E800334 05009A03 2C00FD9A E25E8003 2700FD9A E25E80E0 56890E46 89F65618 .V~.FB.VÁ.^ã.».'..^ã.».,....4..^ 000180
 02209ADC 8808EC83 0350050F 9A034605 009A0341 00FD9ADE 5E80033C 00FD9ADE B.».<..^B.».A....F....P..š..É.~. 0001A0
 00949A08 1E1E801F A5A5A5A5 DA8E1E07 16F088E8 7E8008C4 83FFFF05 F39A0355 U..µ....á..~Õ.þ....ÕEEEE........ 0001C0
 0041E9E6 4688010A E9000088 0006E903 72031F05 149A037D 00709AE8 5E800378 x..^Õ.p.)......r.Õ..|..Õ...FÌÕA. 0001E0

Dump of file SATURN:[PCCOMMON.DUMP.DLL]MOD.TMP;1 on 18-APR-1990 10:47:55.47
File ID (736,57,0)   End of file block 42 / Allocated 44

Virtual block number 5 (00000005), 512 (0200) bytes

 FF0035E9 FE5689FC 46890084 050A5688 08468800 00043E9A 016A0C76 FF0E76FF .v..v.j..>....F..V.....F=.V±Õ5.. 000000
 13E90016 E9FE5689 FC468900 A4050A56 88084688 0000044B 9A016A0C 76FF0E76 v..v.j..K....F..V..Ê..F=.V±Õ..Õ. 000020
 9A5016FB 46800C76 FF0E76FF 0000E9FF CEE90375 000330FF B7E90375 00013000 .=..u.Õñ.=..u.Õö.Õ...v..v..F½.P. 000040
 E9037402 47082607 8826FC5E C40000FF FF9AF876 FFFA76FF 016A006A 0000FFFF ....j.j..v°.v½.....á^=&..&.G.t.Õ 000060
 26FC5EC4 1476FF50 16F0468D 0C76FF0E 76FF0876 FF0A76FF 001AE900 00880006 ..|..Õ...v..v..v..v..Fþ.P.v.á^=& 000080
 FF0000FF FF9A006A 0C76FF0E 76FF0000 FFFF9A00 6A0C76FF 0E76FF00 5FE91FFF ..Õ_..v..v.j.......v..v.j....... 0000A0
 1DE90000 FFFF9A10 76FF1276 FF0C76FF 0E76FF00 00FFFF9A 0676FF0C 76FF0E76 v..v..v........v..v..v..v.....Õ. 0000C0
 01880000 E9FFAAE9 03750003 30FF82E9 03750001 30FE39E9 0375C008 001AE900 .Õ...åu.Õ9±=..u.Õÿ.=..u.Õ¨.Õ..|. 0000E0
 46890084 05085688 064688D8 8E02AA88 1E565700 0048C8C8 C95F5E1F 0000E900 .Õ...^_èùàH..WV.|¨..Ä.F..V..Ç..F 000100
 E89A5016 F4468D0A 76FF0C76 FF002AE9 03750247 08260788 26FC5EC4 FE5689FC =.V±á^=&..&.G.u.Õ*..v..v..F¶.P.Õ 000120
 0C76FF1F FF26FC5E C41676FF 5016F446 800A76FF 0C76FF06 76FF0876 FF000002 ....v..v..v..v..F¶.P.v.á^=&...v. 000140
 7E0095E9 03700257 3926E656 88E4468B 0E5EC400 00FFFF9A 5016E446 800A76FF .v..FÕ.P.....á^..FÕ.V|&9W.).Õ..~ 000160
 03700076 E9037E02 573926EE 568BEC46 880E5EC4 0088E903 77073926 0008E903 .Õ..&9.w.Õ..á^..Fš.VŸ&9W.~.Õv.). 000180
 E9037E00 57E9037D 06573926 EA568BE8 46880E5E C40069E9 03720739 260008E9 Õ..&9.r.Õi.á^..FÕ.Võ&9W.).ÕW.~.Õ 0001A0
 E9037D00 37E9037E 06573926 F25688F0 46880E5E C40049E9 03770447 39260009 ..&9G.w.Õl.á^..Fþ.V·&9W.~.Õ7.).Õ 0001C0
 88124688 0000046A 9A1276FF 1476FF0A 76FF0C76 FF0029E9 03720447 39260009 ..&9G.r.Õ)..v..v..v..v..j.  ..F.. 0001E0

Dump of file SATURN:[PCCOMMON.DUMP.DLL]MOD.TMP;1 on 18-APR-1990 10:47:55.47
File ID (736,57,0)   End of file block 42 / Allocated 44

Virtual block number 6 (00000006), 512 (0200) bytes

 9A5016C4 46800A76 FF0C76FF 0202E91F A5A5A5A5 DA8E1E07 16F08804 7E801456 V..~å.þ....ÕEEEE.Õ...v..v..Fá.P. 000000
 03760739 260008E9 03700035 E9037E02 573926E6 5688E446 880E5EC4 0000FFFF ....á^..FÕ.V|&9W.~.Õ5.).Õ..&9.v. 000020
 83000105 E6568BE4 468BE256 89E04689 DAF70002 8308F7C6 5688C446 880028E9 Õ(..Fá.VÕ%Ä.ø.%Õ.FÁ.Vã.FÕ.V|.... 000040
 E9037E00 2EE9037D 02573926 EE568BEC 46880E5E C40059E9 CE5689CC 46890002 ø..Fã.VöÕY.á^..Fš.VŸ&9W.).Õ..~.Õ 000060
 8300012D EE5688EC 468BE256 89E04689 C6568BC4 46880021 E9037307 39260008 ..&9.s.Õ|..Fá.VÕ.FÁ.Vã.Fš.VŸ-... 000080
 46890257 88260788 260E5EC4 E04689E2 46890000 880019E9 CE5689CC 4689000A Õ..Fã.VöÕ..|...Fã.FÁá^.&..&.W..F 0000A0
 76044739 260009E9 03700036 E9037E06 573926EA 568BE846 880E5EC4 CE5689CC &.Võá^..FÕ.Võ&9W.~.Õ6.).Õ..&9G.v 0000C0
 000105EA 5688E846 880E5689 DC46890A F7000283 D8F7CA56 88C84688 0028E903 .Õ(..Fà.VÕ%Ä.ø.%Õ.FÉ.VB.FÕ.VÕ... 0000E0
 037E002F E9037006 573926F2 5688F046 880E5EC4 0058E902 56890046 89000283 .ø..FÁ.VøÕ[.á^..Fþ.V·&9W.).Õ/.~. 000100
 012DF256 88F04688 DE56890C 4689CA56 88C84688 0021E903 73044739 260009E9 Õ..&9G.s.Õ|..Fà.Vò.FÉ.VB.Fþ.V·~. 000120
 57882604 4788260E 5EC40C46 890E4689 00008800 1AE90256 89004689 000A8300 ..Õ..FÁ.VøÕ..|...FB.FÉá^.&.G.&.W 000140
 880C4688 50520AF7 00028308 F7E25688 E046880A 76FF0C76 FFD25689 D0468906 ..FÁ.Vø.v..v..FÁ.Vã%Ä.ø.%ÕRP.FÉ. 000160
 03F09A50 16884680 0A76FF0C 76FF0000 FFFF9A02 6A50520A F7000283 D8F7DE56 VB%Ä.ø.%ÕRPj.......v..v..F|.P.þ. 000180
 8876FFBA 76FFC256 89C04689 D2568800 46888E56 898C4689 CE5688CC 46880000 ...Fã.Vö.F¥.V/.FÁ.Vø.Fã.VÕ.v¤.v| 0001A0
 006A0076 E98D2888 0006E903 74000030 0000FFFF 9A016A50 168C4680 016A006A j.j..F¥.Pj......=..t.Õ..|+.Õv.j. 0001C0
 16044680 5016CC46 8D026A01 6A0A76FF 0C76FF00 00FFFF9A C076FF8C 76FF016A j..v¥.vå......v..v.j.j..Fã.P.Få. 0001E0
```

```
Dump of file SATURN:[PCCOMMON.DUMP.DLL]MOD.TMP;1 on 18-APR-1990 10:47:55.47
File ID (736,57,0)   End of file block 42 / Allocated 44

Virtual block number 7 (00000007), 512 (0200) bytes

 8900C405 08568806 46880000 05889A50 16044680 0A76FF0C 76FF0000 FFFF9A50 P......v..v..Få.P......F..V..å.. 000000
 0A76FF0C 76FF0676 FF0876FF 001AE903 75024708 26078826 FC5EC4FE 5689FC46 F=.V±á^=&..&.G.u.Õ...v..v..v..v. 000020
 1E565700 0012C8C8 C95F5E1F 0000E900 00881FFF 26FC5EC4 1676FF50 1604468D .Få.P.v.á^=&..|..Õ...^_èùà...WV. 000040
 7501EE7E 83004EE9 06468800 0002C09A 5016EE46 8D0C76FF 0E76FFD8 8E04A188 |Å..Ä.v..v..FŸ.P.å....Ŧ.ÕN..~Ÿ.u 000060
 E90007F0 46C70000 FFFF9A50 16F24680 0C76FF0E 76FF00E9 E9000188 0006E903 .Õ..|..ÕÕ..v..v..F·.P.....úFÞ..Õ 000080
 00FFFF9A 5016F246 8D0C76FF 0E76FF00 C2E90001 880006E9 037503EE 7E83003A :..~Ÿ.u.Õ..|..Õõ..v..v..F·.P.... 0000A0
 FF0E76FF 0000E9FF C9E90375 00043DFF AAE90375 00023D00 13E90009 F046C700 .úFÞ..Õ..=..u.Õ¯.=..u.Õè.Õ...v.. 0000C0
 B89A006A 0C76FF0E 76FF0000 03999A00 6A0C76FF 0E76FF00 0004599A 006A0C76 v.j..Y....v..v.j.......v..v.j..| 0000E0
 C1F0468B 0051E900 0003FF9A 006A006A 016A006A 0010E903 7500F27E 83000003 ....~·.u.Õ..j.j.j.j......ÕQ..FÞè 000100
 002DE903 75024708 26078826 FC5EC4FE 5689FC46 89000405 0A568808 460304E0 Å..F..V.....F=.V±á^=&..&.G.u.Õ-. 000120
 16F4468D 0C76FF0E 76FF0876 FF0A76FF 000004CF 9A5016F4 468D0C76 FF0E76FF .v..v..F¶.P.Ü....v..v..v..v..F¶. 000140
 000507A2 02030015 C8C95F5E 1F0000E9 00008800 06E91FFF 26FC5EC4 1076FF50 P.v.á^=&..Õ..|..Õ...^_èù....Å... 000160
 000407F1 00020000 00030370 000200E1 0005084D 02030069 00040220 0203015B [... ...|...M...Ä...p.......þ... 000180
 0001075C 01030078 000504F9 020300F5 000508DC 02030160 00050875 02030000 ....u...m..,É...X...'...x...\... 0001A0
 000505B0 0203009D 00050792 0203008D 0005071E 02030109 00050801 02030024 $............................... 0001C0
 00050882 02030003 00010167 010300AC 000501E8 0203004B 000108A5 0103011F ....É...K...Š...¯...g...Æ....... 0001E0

Dump of file SATURN:[PCCOMMON.DUMP.DLL]MOD.TMP;1 on 18-APR-1990 10:47:55.47
File ID (736,57,0)   End of file block 42 / Allocated 44

Virtual block number 8 (00000008), 512 (0200) bytes

 00050826 02030149 0005088F 0203005F 00010779 0103008A 0005072E 02030137 7.......¤...y...........I...&... 000000
 000A7E83 D88EFFFF B81E5657 000004C8 00000000 00000000 00000000 000000CD ë...............Ä...WV.|. .Ä.~.. 000020
 468D00E8 68006A0A 76FF0040 E98D2AB8 0006E903 7408460B 06468800 08E90375 u.Õ...F..F.t.Õ..|*.Õa..v., hÕ..F 000040
 26FE5688 FC468806 5EC40020 E98D29B8 0006E903 7500003D 0000FFFF 9A5016FC =.P.....=..u.Õ..|).Õ .á^..F~.V±& 000060
 0000C800 06CAC95F 5E1F0000 E90000B8 04C483FF FF00009A 50520257 89260789 ..&.W.RP......á.|..Õ...^_èò..à.. 000080
 8D2AB800 06E90374 08460806 4688000B E9037500 0A7E83D8 8E0008B8 1E565700 .WV.|...Ä.~..u.Õ...F..F.Ŧ.Õ..|*. 0000A0
 04C80006 CAC95F5E 1F0000E9 00008800 00FFFF9A 0676FF08 76FF0A76 FF0014E9 Õ...v..v..v......|..Õ...^_èò..à. 0000C0
 0006E903 7408460B 06468800 08E90375 0C460B0A 468BD88E 0075B81E 56570000 ..WV.|u..Ä.F..F.u.Õ...F..Ŧ.t.Õ.. 0000E0
 5B00BB9A 0676FF08 76FF0000 FFFF9A50 16FC468D 0A76FF0C 76FF0034 E98D2AB8 |*.Õ4..v..v..F=.P......v..v..£.[ 000100
 08CAC95F 5E1F0000 E90000B8 0000FFFF 9A0676FF 0876FF50 16FC468D 04C48300 ..á..F=.P.v..v......|..Õ...^_èò. 000120
 03740846 0B064688 0008E903 750C460B 0A4688D8 8E00B688 1E565700 0008C800 .à...WV.|Ñ..Ä.F..F.u.Õ...F..Ŧ.t. 000140
 76FF5016 F8468D00 0000E29A 5016F846 8D0A76FF 0C76FF00 2FE98D2A 880006E9 Õ..|*.Õ/..v..v..F½.P.ã....F½.P.v 000160
 C80008CA C95F5E1F 0000E900 00B80000 FFFF9A50 16FC468D 016A006A 0676FF08 ..v.j.j..F=.P.....|..Õ...^_èò..à 000180
 06E90374 08460806 4688000B E903750C 460B0A46 88D88E01 19B81E56 57000004 ...WV.|...Ä.F..F.u.Õ...F..Ŧ.t.Õ. 0001A0
 0876FFFC 76FFFE76 FF000001 459A5016 FC468D0A 76FF0C76 FF0027E9 8D2AB800 .|*.Õ'..v..v..F=.P.E....v±.v=.v. 0001C0
 8E0177B8 1E565700 0004C800 08CAC95F 5E1F0000 E90000B8 0000FFFF 9A0676FF .v......|..Õ...^_èò..à...WV.|w.. 0001E0

Dump of file SATURN:[PCCOMMON.DUMP.DLL]MOD.TMP;1 on 18-APR-1990 10:47:55.47
File ID (736,57,0)   End of file block 42 / Allocated 44

Virtual block number 9 (00000009), 512 (0200) bytes

 0006E903 7408460B 06468800 08E9037D 000A7E83 0014E903 750E460B 0C468808 Ä.F..F.u.Õ...~..).Õ...F..F.t.Õ.. 000000
 990A4688 FC76FFFE 76FF0000 01A39A50 16FC468D 0C76FF0E 76FF002D E98D2AB8 |*.Õ-..v..v..F=.P.È....v±.v=.F.. 000020
 56570000 00C8000A CAC95F5E 1F0000E9 00008800 00FFFF9A 0676FF08 76FF5052 RP.v..v......|..Õ...^_èò..à...WV 000040
 E98D2AB8 0006E903 7408460B 06468800 08E90375 0C460B0A 4688088E 01CD881E .|ë..Ä.F..F.u.Õ...F..Ŧ.t.Õ..|*.Õ 000060
 C95F5E1F 0000E900 00B80257 89260789 26065EC4 02578826 0788260A 5EC4001A ..á^.&..&.W.á^.&..&.W.|..Õ...^_è 000080
 0016E98D 2AB80006 E903740C 460B0A46 88D88E02 32B81E56 57000000 C80008CA ò..à...WV.|2..Ä.F..F.t.Õ..|*.Õ¯. 0000A0
 0000C800 08CAC95F 5E1F0000 E90000B8 02578926 07892608 56880646 880A5EC4 á^..F..V.&..&.W.|..Õ...^_èò..à.. 0000C0
 830012E9 03750846 08064688 001DE903 750E460B 0C4688D8 8E0278B8 1E565700 .WV.|(..Ä.F..F.u.Õ...F..Ŧ.u.Õ... 0000E0
 0C5EC404 E6C10A76 88001DE9 8D2AB800 06E9037F 0C0A7E83 0009E903 7D000A7E ~..).Õ...~....Õ..|*.Õ...v.è|.á^. 000100
 57000008 C8000ACA C95F5E1F 0000E900 00B80650 89260440 89260856 88064688 .F..V.&.@.&.P.|..Õ...^_èò..à...W 000120
 8D2AB800 06E90374 08460806 4688000B E903750C 460B0A46 88D88E02 B5B81E56 V.|ç..Ä.F..F.u.Õ...F..Ŧ.t.Õ..|*. 000140
 518B2601 8B26065E C402E7C1 FE880042 E9037E0C FE834600 01E90000 BE0057E9 ÕW./..Õ..F.±.~.Õ8..±èÕ.á^.&..&.Q 000160
 FFFF02AD 9AFC76FF FE76FF56 0A76FF0C 76FF0023 E90375D0 08FE5689 FC468902 ..F=.V±.Åu.Õ#..v..v.V.v±.v=.Ü... 000180
 08CAC95F 5E1F0000 E90000B8 FFB5E900 09E9F846 880006E9 03750000 3DF84689 .F½=..u.Õ...F½Õ..Õç.|..Õ...^_èò. 0001A0
 03750846 0B064688 001DE903 750E460B 0C4688D8 8E0313B8 1E565700 0000C800 .à...WV.|...Ä.F..F.u.Õ...F..Ŧ.u. 0001C0
 E6C10A76 880021E9 8D2AB800 06E9037F 0C0A7E83 0009E903 7D000A7E 830012E9 Õ...~..).Õ...~....Õ..|*.Õ|..v.è| 0001E0
```

```
Dump of file SATURN:[PCCOMMON.DUMP.DLL]MOD.TMP;1 on 18-APR-1990 10:47:55.47
File ID (736,57,0)   End of file block 42 / Allocated 44

Virtual block number 10 (0000000A), 512 (0200) bytes

 C95F5E1F 0000E900 00B80257 89260789 26065EC4 06508826 04408826 0C5EC404 .á^.&.a.&.P.á^.&..&.W.¡..Õ..._^_è 000000
 1046080E 46880033 E9037516 46081446 88088E03 99881E56 57000004 C8000ACA ò..à...WV.¡...Ä.F..F.u.Õ3..F..F. 000020
 7D00127E 830012E9 03750846 08064688 001DE903 750C4608 0A468800 28E90375 u.Õ(..F..F.u.Õ...F..F.u.Õ...~..) 000040
 05165688 14460304 E0C11246 88004DE9 8D2A8800 06E9037F 0C127E83 0009E903 .Õ...~....Õ..¡*.ÕM..F.èÁ..F..V.. 000060
 0605FE56 88FC4688 0A5EC407 89260E5E C4044788 26FC5EC4 FE5689FC 46890004 ...F=.V±á^=&.G.á^.&..á^..F=.V±.. 000080
 0000E900 00880789 26065EC4 0E478826 FC5EC41F A5A5A5A5 DA8E1EF0 88FB8800 ..«.Þ..ÕEEEE.á^=&.G.á^.&..¡..Õ.. 0000A0
 7E830012 E9037512 46081046 88D88E03 FB881E56 5700002A C80012CA C95F5E1F .^_èò..à*..WV.¡«..Ä.F..F.u.Õ...~ 0000C0
 160C4680 1076FF12 76FF020E E98D2A88 0006E903 7F0C0E7E 830009E9 037D000E ..Ţ.Õ...~....Õ..¡*.Õ...v..v..FÈ. 0000E0
 08568806 4688EA56 89E84689 0C56880A 4688F046 8905AD01 4F9A0000 02029A50 P......O.Ü..FÞ.F..V..FÒ.VÕ.F..V. 000100
 FF0000FF FF9A5016 F4468050 16E84680 026A016A 1076FF12 76FFEE56 89EC4689 .F$.VŸ.v..v.j.j..FÒ.P.F¶.P...... 000120
 C70000FF FF9A5016 E4468010 76FF1276 FF0000FF FF9A5016 E6468010 76FF1276 v..v..FÌ.P......v..v..FÕ.P.....ú 000140
 DE76FF01 81E9037C 02F27E83 0000D646 C7F246FF 0008E900 010646C7 0000F246 F·..úFø..Õ...F·úFø...~·.|.Õ...vß 000160
 DA568808 460304E0 C10E4688 0000FFFF 9A501608 46800676 FF006A00 6ADC76FF .vÉj.j..vø.FÄ.P......F.èÄ..FÄ.VÕ 000180
 21E90375 00E47E83 0009E903 7400E67E 830053E9 0E4688FE 5689FC46 89000405 ....F=.V±.F.ÕS..-Ì.t.Õ...-Õ.u.ÕÌ 0001A0
 8305CA04 999AD876 FFDA76FF 1076FF12 76FF5016 E8468050 16F44680 F076FF00 ..vÞ.F¶.P.FÒ.P.v..v..vÕ.vÄ...ò.. 0001C0
 E90CC483 00EF07E9 9ADE76FF D876FFDA 76FF1076 FF1276FF F076FF00 37E912C4 á.Õ7..vÞ.v..v..vÕ.vÄ.v..Õ.ÿ..á.Õ 0001E0

Dump of file SATURN:[PCCOMMON.DUMP.DLL]MOD.TMP;1 on 18-APR-1990 10:47:55.47
File ID (736,57,0)   End of file block 42 / Allocated 44

Virtual block number 11 (0000000B), 512 (0200) bytes

 00E67E83 0000E9FF CCE90375 000430FF 04E90375 000230FF A6E90375 C00B001A ...åu.ÕÌ.=..u.Õå.=..u.Õä.Õ...~Ì. 000000
 0034E903 74008687 0B260084 87882608 5EC40070 E9037400 E47E8300 79E90374 t.Õy..~Õ.t.Õp.á^Ä&....&....t.Õ4. 000020
 E9037400 A6870826 00A48788 26D85EC4 0024E903 74764708 2674478B 26D85EC4 á^Ä&.Gt&.Gvt.Õ$.á^Ä&..Ê.&..Ì.t.Õ 000040
 FF1276FF 5016F446 8DF076FF 002AE903 75009687 0B260094 87882608 5EC40012 ..á^Ä&....&....u.Õ*..vÞ.F¶.P.v.. 000060
 5EC40060 E90003E9 03740000 3D10C483 040902A2 9A0E76FF D876FFDA 76FF1076 v..vÕ.vÄ.v..Ä.)..á.=..t.Õ..Õ'.á^ 000080
 76FF1276 FFD876FF DA76FF00 46E90375 D008E256 89E04689 02578826 078826FC =&..&.W..FÄ.Vå.Äu.ÕF..vÕ.vÄ.v..v 0000A0
 FC5EC400 010447C7 26FC5EC4 0027E903 74000030 E05EFFF0 76FF5016 F4468010 ..F¶.P.vÞ.^Ä=..t.Õ'.á^=&úG...á^= 0000C0
 0088FE6E E90003E9 0E478926 F04688FC 5EC41FA5 A5A5A51F 161EF476 80067F80 ....v¶...EEEE.á^=.FÞ&.G.Õ..Õn±¡. 0000E0
 E903750E 46080C46 88D88E04 9F881E56 57000000 C8000ECA C95F5E1F 0000E900 .Õ...^_èò..à...WV.¡...Ä.F..F.u.Õ 000100
 880006E9 037F010A 7E830009 E9037D00 0A7E8300 12E90375 08460806 4688001D ...F..F.u.Õ...~..).Õ...~....Õ..¡ 000120
 E9000088 00069089 26000480 89260856 88064688 0C5EC40A 0A766800 1DE98D2A *.Õ..kv..á^..F..V.&...å.&..ø.¡..Õ 000140
 001DE903 750E4608 0C468808 8E06E388 1E565700 0000C800 0ACAC95F 5E1F0000 ...^_èò..à...WV.¡D..Ä.F..F.u.Õ.. 000160
 8D2AB800 06E9037F 010A7E83 0009E903 7D000A7E 830012E9 03750846 08064688 .F..F.u.Õ...~..).Õ...~....Õ..¡*. 000180
 00880257 89260789 26065EC4 00069088 2600D480 88260C5E C40A0A76 680021E9 ÕÌ.kv..á^.&..å.&..ø.á^.&..&.W.¡. 0001A0
 0009E903 7D00127E 83088E07 41881E56 57000004 C8000ACA C95F5E1F 0000E900 .Õ...^_èò..à...WV.¡A..Ä.~..).Õ.. 0001C0
 88144603 E001C103 E0D1E0D1 C8881246 880049E9 8D2AB800 06E9037F 01127E83 .~....Õ..¡*.ÕÌ..F..àÌÁÌÁ.èÌÁ.F.. 0001E0

Dump of file SATURN:[PCCOMMON.DUMP.DLL]MOD.TMP;1 on 18-APR-1990 10:47:55.47
File ID (736,57,0)   End of file block 42 / Allocated 44

Virtual block number 12 (0000000C), 512 (0200) bytes

 C4064788 26FC5EC4 0789260E 5EC40447 8826FC5E C4FE5689 FC468900 D4051656 V..å..F=.V±á^=&.G.á^.&..á^=&.G.á 000000
 C80012CA C95F5E1F 0000E900 00880789 26065EC4 08478826 FC5EC407 89260A5E ^.&..á^=&.G.á^.&..¡..Õ...^_èò..à 000020
 FF0E76FF 016A0876 FF0676FF 0016E903 75020646 F6088E07 A3881E56 57000000 ...WV.¡È..Ä-F..u.Õ...v..v.Ţ..v.. 000040
 76FF0E76 FF006A0A 76FF0676 FF0016E9 03750106 46F60AC4 83085401 809A0C76 v..¯.Ţ..á.-F..u.Õ...v..v.j..v..v 000060
 02000000 01083500 02000E0A CAC95F5E 1F0000E9 0000880A C483065E 01809A0C ..¯.^..á.¡..Õ...^_èò.....5...... 000080
 03000000 04081700 0200E100 05052802 03006900 04056002 03000000 02036E00 .n.......`...¡...÷...Ä.......... 0000A0
 03003300 04015E02 03009000 05050802 03002200 03009002 03001400 03003402 .4...........".............^...3.. 0000C0
 0300CD00 05051802 03004E00 04018402 03004200 04021902 0300AC00 05040202 .Ð...¯.......B...Ç...N.......ê.. 0000E0
 00000000 00000000 00000000 00000000 00000000 00000000 00005C00 04010002 .....\.......................... 000100
 028E1E88 F3885756 C08ED08C C85E5FA5 F3000A89 007A8F00 42BEC08E D88C5756 VW.Ä.á/B.¢z.¿..µÈ_^ù.Å.åVW.µ.... 000120
 C383028E 1E88F388 575616E8 F38809BE A5A5FCD8 8EC18ED9 8CC08CF8 880CC383 .û..«.å.).è.Ä=ÉÉ.Ţ.µŠ.VW.µ.....û 000140
 CB5E5F03 FE47C6FC 7789028E 1E894E74 027AF881 F388A5A5 FCC18ED9 8CF8880C ..«.).è=ÉÉ.µ.«z.tN.....w=óG±._^ù 000160
 D98EA5A5 A5A5FCD8 8EC18ED9 8CC08CF8 880CC383 028E1E88 F3885756 C08ED08C .Å.åVW.µ.....û..«.å.).è.Ä=ÉÉÉÉ.) 000180
 027AF881 F388A5A5 A5A5FCC1 8ED98CF8 880CC383 028E1E88 F3885756 18E8F388 .µŠ.VW.µ.....û..«.).è=ÉÉÉÉ.µ.«z. 0001A0
 8ED98CD8 8C575604 E8D08C57 560557E9 CB5E5FFC 778907FE 47C6028E 1E890E74 t.....óG±..w=_^ùÕW.VW.ÅŠ.VW.Ä.). 0001C0
 74027AF8 81A5A502 74033CA5 A5FE4588 ADF8880C C383028E 1E88F388 FCD88EC1 è.Ä=.µ.....û..«Ü.E±ÉÉ<.t.ÉÉ.«z.t 0001E0
```

Dump of file SATURN:[PCCOMMON.DUMP.DLL]MOD.TMP;1 on 18-APR-1990 10:47:55.47
File ID (736,57,0)   End of file block 42 / Allocated 44

Virtual block number 13 (0000000D), 512 (0200) bytes

```
8B26C08E D08C14EB 02578826 078826C0 8ED08CCB 5E5FD98E FC5F8902 8E1E89CF Ù....._•.)_^ù.Ä.å&..&.W.Š..Ä.å&. 000000
DB83DAF7 DBF70779 8024C78A D08BDA8B 57569907 8803EB02 5788078B 0AEB9907 ..Š....W.Š....VW.Ö.Ä.ú$.y.%Ü%Ö.Ü 000020
45C60F75 00FF80C1 8ED98CFC 7D89028E 3E891C74 027AFF81 0CC78302 8E3E8800 ..>...ú...z.t..>...)•.).ê...u.6E 000040
5F5D00D7 E8FB88DB 33C88887 608D5507 FE45C6FF 63E9CB5E 5F0A78E8 9EB403FE ±.Ç.Òx._^ùÕc.6E±.U§'..ù3Ü.«Ò•.]_ 000060
89028E3E 89817402 7AFF810C C783FE45 8AFC758B 028E3E8B C08ED88C 5756CB5E ^ùVW.Ä.ã.>...u•.E±.û...z.tÝ.>... 000080
8C74027A FF810CC7 83028E3E 8B5756CB 5E5FA5A5 0274033C A5A5FCFE 4588FC7D )•.E±•ÊÊ<.t.ÊÊ_^ùVW.>...ü...z.t. 0000A0
56C08ED8 8C02EBD0 8CCB5E5F ABABFCC0 33C08ED8 8C03FE45 C6FC7D89 028E3E89 .>...)•6E±..Ä.ã3ä•¨¨_^ù.ÄŠ..Ä.åV 0000C0
028E1E8B FCFB8B57 56C08ED8 8C02EBD0 8C11EB0C 028E0683 028E1E8B FCFB8B57 W.«•.........Š..ÄŠ..Ä.åVW.«•.... 0000E0
5F049AE8 57FC778B 009C2689 55CB5E5F 0C028E2E 83A5A5FC 77880075 03FE7F80 ..±.u..w•ÊÊ....._^ùU.&...w•WÒ.._ 000100
EBD08C11 EB0C028E 0683028E 1E8BFCFB 8B5756C0 8ED88C02 EBD08CE4 EB50DE8B .B]ŠÕ.ÄŠ..Ä.åVW.«•.........Š..ÄŠ 000120
0C028E2E 83A5A5A5 A5FC778B 0F7507FE 7F80028E 1E8BFCFB 8B5756C0 8ED88C02 ..Ä.åVW.«•......±.u..w•ÊÊÊÊ..... 000140
0683028E 1E8BF8BB 5756C08E D88C02EB D08CE9EB DF87F78B 19FEE80F 87CB5E5F _^ù.ÒÒ±..¥.ÒŠÒ.ÄŠ..Ä.åVW.«...... 000160
FC0C028E 2E83FE47 8AF38802 8E1E8BFB 8B5756C0 8ED88C02 EBD08C10 EB0C028E ...Š..ÄŠ..Ä.åVW.«.....µ.G±.....• 000180
FF031D9A 48EB07C8 BA07C3B8 50EB079F BA0795B8 CB5E5FA5 A5027403 3CA5A5AB ¨ÊÊ<.t.ÊÊ_^ù|..¤..ŠP|ú.¤à.ŠH.... 0001A0
9004EB05 7EE8900A EB0530E8 9010EB05 31E836EB 02C4BA02 BEB80072 26889FFF ...&r.|/.¤á.Š6Ò1.Š..ÒO.Š..Ò~.Š.. 0001C0
CAB80072 26889F02 AF031D9A C30AF700 D283D8F7 0773589E 0072268A 500543E8 ÒC.P.&r..Xs.¥Ä.ø.%ÖÜ...£...&r.|ò 0001E0
```

Dump of file SATURN:[PCCOMMON.DUMP.DLL]MOD.TMP;1 on 18-APR-1990 10:47:55.47
File ID (736,57,0)   End of file block 42 / Allocated 44

Virtual block number 14 (0000000E), 512 (0200) bytes

```
75087488 030A7C80 028E3689 0CEE8302 8E368851 53009C26 89555756 02D0BA02 .¤Ä.VWU.&..SQ.6...Ÿ..6...|...t.u 000000
7403FB80 13757F01 F6FF32FE 508A028E 3E8857CB 5E5F505B 5902FF02 EBD0FF04 ..ÄŠ..øY[]_^ùW.>...]±2.-..u..«.t 000020
8A028E3E 8857CBF9 CBE40803 755F8001 F6F87480 FF41F6CB 5F0875F0 FF41F608 .-A.Þu._ù-Ä..t½-.._u..ðù¹ùW.>... 000040
5E5F8031 80FF3208 75F738FC 7588FE5D 8A028E3E 8B5756CB 5F7F2180 FF32FE5D ]±2..|._ùVW.>...]±_u•;¥u.2..1._^ 000060
5E5FAB80 F480ADA5 A5CB5E5F AB80F480 AD087503 FB80A5FC C18ED98C FC7D89CB ù.)•.).Ê•Ê.«.u.Ù.¶.¨_^ùÊÊÙ.¶.¨¯^ 000080
EBC08ED0 8C575676 EB0008B8 F3885756 04EB188A E8575602 EBC08ED0 8C5756CB ùVW.Ä.åŠ.VWÒ..Š.VW.µ¯..ŠvVW.Ä.ãŠ 0000A0
04EB185A E8575602 EBC08ED0 8C57565E EB0004B8 F3885756 04EB1872 E8575602 .VWÒr.Š.VW.µ|..Š^VW.Ä.åŠ.VWÒZ.Š. 0000C0
EB0014B8 F3885756 04EB1842 E8575602 EBC08ED0 8C575646 EB000CB8 F3885756 VW.µ|..ŠFVW.Ä.åŠ.VWÒB.Š.VW.µ|..Š 0000E0
EBC08ED0 8C575616 EB0010B8 F3885756 04EB182A E8575602 EBC08ED0 8C57562E .VW.Ä.åŠ.VWÒ*.Š.VW.µ|..Š.VW.Ä.åŠ 000100
87107407 FE7D80C1 8ED98C02 8E3E88D8 880000B8 F3885756 04EB1812 E8575602 .VWÒ..Š.VW.µ|...Ä.>...).ê.)±.t.. 000120
DFE8028E 3E88F788 181DE801 108F02C3 83CB5E5F 5D005697 FF009C26 8955FC7D )•U.&....V.]_^ù.û.¢..Ò...¥.>..ŠÒ 000140
02EBC08E D08C5756 76EB000A B8F38857 5604EB17 E1E85756 02EBC08E D08C5756 VW.Ä.åŠ.VWÒÄ¯Š.VW.µ|..ŠvVW.Ä.åŠ. 000160
5604EB17 B1E85756 02EBC08E D08C5756 5EEB0006 B8F38857 5604EB17 C9E85756 VWÒè.Š.VW.µ|..Š^VW.Ä.åŠ.VWÒÝ.Š.V 000180
2EEB0016 B8F38857 5604EB17 99E85756 02EBC08E D08C5756 46EB000E B8F38857 W.µ|..ŠFVW.Ä.åŠ.VWÒ..Š.VW.µ|..Š. 0001A0
02EBC08E D08C5756 16EB0012 B8F38857 5604EB17 81E85756 02EBC08E D08C5756 VW.Ä.åŠ.VWÒ..Š.VW.µ|..Š.VW.Ä.åŠ. 0001C0
E8560574 07FE7D80 C18ED98C 028E3E88 D8880002 B8F38857 5604EB17 69E85756 VWÒi.Š.VW.µ|...Ä.>...).ê.)±.t.VÒ 0001E0
```

Dump of file SATURN:[PCCOMMON.DUMP.DLL]MOD.TMP;1 on 18-APR-1990 10:47:55.47
File ID (736,57,0)   End of file block 42 / Allocated 44

Virtual block number 15 (0000000F), 512 (0200) bytes

```
880DE800 148B12EB 00108817 E8000C88 1CEB0008 BB21E800 048BFF39 E95E1764 d.^Õ9.£..Š|£..Š.£..Š.£..Š.£..Š.£ 000000
EF832B74 07F27D80 397407FE 7D80028E 3E885756 00188803 E8001C88 08E80000 ..Š.£..Š.£..VW.>...)±.t9.)·.t+.ÿ 000020
9C268955 3E7318FB 832F731C F883087D 88FC7D89 FC7588C0 8ED88C02 8E3E890C ..>...Ä.å.u•.)•.)..«.s/.«.s>U.&. 000040
8E3E890C EF83C474 07F27D80 02C383CD EB16F7E8 02C383CB 5E5F5000 5697FF00 ...V.]_^ù.û.Ò%.Šë.û..)·.tá.ÿ..>. 000060
550C028E 2E83CB5E 5F500052 97FF009C 2689550C 028E2E83 F787BFEB 16E2E802 .Òã.Š¢¯¥.....U.&....R.]_^ù.....U 000080
02E7D0F8 8AE3D0E3 D0CB9E5E 5FE00AE4 D0E8D141 00259F5D 005697FF 009C2689 .&....V.].%.AÌÒÄÕ.Ä_^.ùÄDÄD.«ÄÖ. 0000A0
890587AD 0005B9F8 2BFE884E 4E028E36 8BFCC08E D88C5756 000CB803 EBFF32DF Ö2.Š.£..VW.Ä.å•.6..ÑN.±+«¿..Ù... 0000C0
885E5F16 69E80374 07FE7D80 028E3E88 5756EC88 55CB5E5F F4E24747 1D8BFE44 D±..GGã¶_^ùU.ŠVW.>...)±.t.Òi._^. 0000E0
12E883B0 33300098 06C71CEB 84B03430 009806C7 00CAE914 B58A0075 8BCB50E5 [)ùEu.¤ç.Òò.ú...04¯.Š.ú...03¯¯.Š. 000100
758C3C01 0C1EFF04 7400010E 3E838AB0 30310098 06C708EB 81B03130 009806C7 ú...01¯.Š.ú...10¯..>...t.....<.u 000120
1CFE9A50 00FDB806 3F1FAE9A 00948802 E71CA49A 009AA3E4 2A323100 9806C706 .ú...12*ðÊ...Ê.Ò.£...Ò.?.¡».P.±. 000140
880C88FC 028E3E88 C3065C22 729A009A 36FF0650 1CFE9A50 FFE40500 9AA10647 G.À...ð.P.±.P..6...r"\.û.>..•... 000160
818FE680 D8D10901 FAD10801 D9D1FAD1 D8D1D901 FAD12974 7F80C2F7 C0330254 T.3ã%ð..t)1•111Ä1•1)1Ä1•111Ä.|.. 000180
88ADFC02 8E3E88EA EBD08AC8 88C3F788 06558904 4D890245 89000005 C73800C2 ð.ðú....E..M..U..%û.à.ÄŠð.>..•Ù. 0001A0
CA800374 CD0AD301 E2D1D301 E2D1D301 E2D1F88A ADDC8AF0 8AADD48A C80AADC8 åÙ.à.åÙ.Þ.ÉÙ.%1ã1Æ1ã1Æ1ã1Æ.ët..ò 0001C0
0777D13A E0D1E0D1 E0D13B72 38002D3D 7747E03D 7FF025E9 22EC8AF9 0A808101 .Ÿ..•.ã"Ò%Þ.=ÁGw=-.8r;1Ä1Ä1Ä:1w. 0001E0
```

```
Dump of file SATURN:[PCCOMMON.DUMP.DLL]MOD.TMP;1 on 18-APR-1990 10:47:55.47
File ID (736,57,0)   End of file block 42 / Allocated 44

Virtual block number 16 (00000010), 512 (0200) bytes

 C70A7FE7 801674C0 0B17747F 80300080 05087300 D38301C6 80107401 C6F61572 r.-ó.t..ó..Æ.s....*..t..åt..ó..û 000000
 8BDA8802 33C3F788 02458905 89C033FE DBE9C3F7 880589C6 8AE38A02 4589E50A .Ì.E..D.ó...÷ûÕÛ±3å...E..÷û3Ø.Õ. 000020
 830AF70B F70779C0 08C38800 880A8811 E80AF715 79020BDB 33D0881D E8C388D0 Å.ûS..Å3Û.Øy.÷ÕS..Õ.Å.û.åy.÷Û÷Õ. 000040
 E8D9F715 79C90BDB 33C8881D EBC388C8 88DA8802 330474E9 9E848024 C48A000B Ü..é$.Ç.Õt.3Ø.Õ.à.ûS..à3Ü.èy.÷1S 000060
 07B5E985 60800233 FF338024 C48A00DB 8309F70B F70779C0 08C388C8 880A8811 ..Õ.à.û.åy.÷Û÷1.Û..é$.3.3Ø§'.Õç. 000080
 EB009CE8 C3C8D167 7500D283 C0D10026 E803EB00 35E808E8 002BE80D EB003AE8 Õ:.Š.Õ+.Š.ÕS.Š.Õ&.1å.Ø.ug1àûÕ..Š 0000A0
 007BE808 EB002CE8 0DEB002C E8C34E75 D20B0039 E803EB00 5DE808EB 003EE800 .Õ>.Š.Õ].Š.Õ9..ØuÑûÕ,.Š.Õ,.Š.Õ(. 0000C0
 D1217500 D183C201 00D18300 D283F5D8 F7D2F701 F70D79FF 08C93300 41E803EB Š.ÕA.3è..y.÷1÷Ø÷Å÷.Ø..1.1ó.1.ul1 0000E0
 C3017200 D283C313 DB13F581 F980CD0A E82201B5 DB33001C E803E800 56E8C3CA òûÕV.Š.Õ..3Ûç."Õ.é.'.÷.Û.û.Ø.r.û 000100
 D17FE580 10CE80F1 220FB6F9 8808EE83 91AD91AD 93ADD60A 92AD00A4 E9FDE9E9 ÕÕ»ÕÊ.Ù..øÙ.Ù.Ù..Ÿ..'Ñ."þ.ð..Ì.1 000120
 ACDA8AD2 332FE825 E983CA7F 20F98378 7203FEE9 810874C9 08E9D1E9 D1E9D1E9 Õ1Õ1Õ1Õ.ètÅ.Õ±.rx.' .ð.Õ÷S/3Ø.Õ¯ 000140
 7EE9804D 74C90BDC D0F9D100 E4007FE1 83F988E9 8A04EE83 C186ACC8 8AADF88A .ÝÛ.à¯.é.Ÿ..Õ.'.Å.ÅÕÅ1'ÅE.ètM.Õ- 000160
 F88ADF8A 030A01E2 80D2D0F5 01FA801A 7C08F980 D9F720E9 83997F20 F9834772 rG.' ...Õ ÷1.'.|..'.÷ÅØ.ã..Æ.Õ.% 000180
 00D2800A D0D8D1D8 D1EED000 DA8001B2 01FA8015 E3E1EB08 E980F632 E68AC48A .ó.12-.Õ.SÅD..'.ÿ..Õ.ÅY1Å1ÛÅÕ.Ø. 0001A0
 880131E8 07B00068 E8FD35E9 C30088C0 33000180 0081F9C3 C3880088 CA8AF3E2 ãµ.ð.Å.ÛÛ'Ÿ..1.3å.ÅÛÕ5»Õh.¯.Õ1.. 0001C0
 0087E8FD 0FE9C3FE 88067C89 E0737FF0 FA817FE6 80D78810 EF83067C 03028E36 6...|..ÿ..m.1..'þ.sÅ.|..±ÛÕ.»Õ.. 0001E0

Dump of file SATURN:[PCCOMMON.DUMP.DLL]MOD.TMP;1 on 18-APR-1990 10:47:55.47
File ID (736,57,0)   End of file block 42 / Allocated 44

Virtual block number 17 (00000011), 512 (0200) bytes

 FE88027C 890F737F 80FA817F E6800788 0080EF81 027C0302 8E368801 08E803B0 ¯.ð...6...|..ÿ...m.1..'..sÕ.|..± 000000
 88027C01 0080EF81 028E3688 0053E8C3 FE88067C 0110EF83 028E3688 001EE8C3 ûÕ...6...ÿ..|..±ûÕS..6...ÿ...|.. 000020
 83F98806 4C880010 BA028E36 88C08EA5 A5A5A5C1 8ED98CC0 8C028E3E 88FCC3FE ±ûe.>...å.1.éÉÉÉ.å.6..¤...L..'. 000040
 047D0433 E981E9D1 E9D1E9D1 E9D10035 B87FE580 CF88F0E7 83064C89 CADA0FE1 Å..ð.L..Õþ.Ù.Ì.|5.1Õ1Õ1Õ1Õ.Õ3.). 000060
 024C8800 808A028E 3688C08E A5A5C18E D98CC08C 028E3E88 FC0082E9 3FE809F7 ÷1S?Õ..e.>...å.1.éÉÉ.å.6..¤...L. 000080
 7D0096E9 81ED32CD 8AE1D100 18887FE5 80CF8880 E783024C 89CA0A7F E183F988 .'.Å..ð.L..Õ..Ù.Ì.|..1Å.é2Û.Õ..) 0000A0
 800233EA 288000E5 81EF88C8 880A74C8 38FA0880 00E78114 7CEF88C8 3809F748 HK);à.ÿ|..Õ...';àt..à.ÿ.Ì..+Õ3Ø. 0000C0
 8A009E88 0CE3348A E7E84608 E9800004 C6140A00 D2800082 F501FA80 147C08F9 '.|..'.÷ÿ..Ø...ó...Õ.FSÕ.4D.£... 0000E0
 0AFAE2D7 D0EAD106 E3E18AEF 8A00018B C3348AD1 88C933C3 2C88E822 EE8AD7C1 èm.Ÿ"Õ.,û3è.1.4ÛÉ...ÿ.ÅD.1ÕÅmã'. 000100
 F202CE28 C8039802 8E0E88E2 D3CC8AFD 88027400 DA8001B2 81FA8003 0ADE22D7 m"B.Æ.'.ÿ..Õ.t..».ãÆã......à+Õ.· 000120
 4488C3E4 D07FCC80 FBC8E9C3 F5D3D14C 747F80C3 F7C3FAE2 00148046 06E33488 .4D.F...ã'ÛÅû..tL1Æ÷ûÕà«.ã.Åõû.D 000140
 32EC8AD8 74D3F77F 80C3F7D3 F7E27400 F77F80A9 D0F7E174 7F80A902 5D8B2602 .&.].`..tÅ÷Å`..÷ÅtÕ÷Æ÷û..÷ÆtÅ.ã2 000160
 C3F7C305 38260488 0575C338 DA8EC18E D98CC28C F787930B 73E001E3 D10578EF ÿx11D1Ås...÷.ð.).é.Õ;Ûu...&;.ÛÅû 000180
 A9D0F7E1 747FF0A9 06508826 06448BC3 E4D07FCC 80FB75E9 C3F5D3D1 5E747FF0 Þ.t^1Æ÷ûÕu«.ã.ÅÕû.D.&.].`Þ.tÅ÷Å` 0001A0
 8CF78793 0873E001 E3D10578 EF32EC8A D874D3F7 7FF0C3F7 D3F7E274 D0F77FF0 Þ.÷ÅtÕ÷Æ÷ûÞ.÷ÆtÅ.ã2ÿx11D1Ås...÷. 0001C0
 26048805 7502453B 26024488 0E750445 3B260444 881775C3 38DA8EC1 8ED98CC2 ó.1.é.Õ;Ûu..D.&;E.u..D.&;E.u...& 0001E0

Dump of file SATURN:[PCCOMMON.DUMP.DLL]MOD.TMP;1 on 18-APR-1990 10:47:55.47
File ID (736,57,0)   End of file block 42 / Allocated 44

Virtual block number 18 (00000012), 512 (0200) bytes

 FF7C8802 4C8880CF 80008235 8A015D88 02458803 EB80F480 024588F7 87C3053B ;.û.÷.E..¶.Š..E..]..5ÿ..Û..L..|. 000000
 91FA87F3 870573EC 3A5B74E4 0A6574ED 0AC001C1 D18000CE 81FF00E7 81017488 .t..Õ...ð..1é1å.Ûte.ðt[:ãs..µ.'. 000020
 800374D2 0B127C0E F98055E3 0085CD8A 91D9D0E8 D0C9D049 7718FC80 DCF6E52A *Ì-É.=.wIÅèÅÕÅ1..èç.DU.'.|..Øt.. 000040
 8ADF8AF3 8A068A01 CE800374 D20A2B7E 05F9803E 74107210 E9800833 D38801C8 û..Æ3Û.Õ.r.t>.'.-+.Øt..ð..Ø.µ.Õ. 000060
 3FC2F600 97E9E8D0 C1880788 DE8819E8 F875C1FE D3D1E2D1 23741777 08E980FD ».Õ.w.t#1ã1Æ±èuñŠ..B.m.èÅÕÕ..-ð? 000080
 D1D8D150 730E13D7 031470E0 D020CA80 03743FC2 F6FAE2DA D1E8D120 CA800374 t..ð 1Š1Õã'-ð?t..ð ÅÅp..m.ÅsP1Û1 0000A0
 0BD0F600 D383F5DA F7D3F70A 73DE8807 88F318FA 28FA41E9 4575FFFC 80C4FEDA Õ±å.=.uÉÕA'+'.µ.m.Ås.÷Æ÷Õ÷.Æ.-Å. 0000C0
 0AD232F2 8ADE8AF8 8A587608 EC800F75 FF0A6474 D80BDA87 6A7610EC 8008750B Ûu..ã.vj.Õ.Ûtd..u..ã.v[.«.B.·2Ø. 0000E0
 C6F61472 077780FA 80017CE9 03740000 A63E80F6 710301E2 D14874CC FE0A78FF .x.±ätK1ã1Æq¬.>Ì..t.Õ|..'.:.r.-ó 000100
 7FE78080 2417747F 80A9D8D1 E0D03A74 FFFC80C4 FE077300 D38301C6 800F7401 .t..ó..Æ.s.±á.=.t:ÅÅ1Å`..t.¨..Õ. 000120
 3E88C033 017EE903 740000A6 3E80C3F7 880589C6 8AE38A02 4589028E 3E88C70A .û.>...E..D.ó...÷û.>Ì..t.Õ-..'.> 000140
 D1024D88 0674E40A D8D0E0D1 963488AD FCF99DE9 E679C3F7 88058902 4589028E ...E....÷ûy1Õ.'=Û.4.1ÅÅÅ.ðtø.M.1 000160
 50CD74FF FC8080C4 800370E5 027FED80 80EC80C1 32D88830 88C874E0 0AD9D0E1 ÅÅ1.Ûtù.=.Å2è.ã..Û..1pÆ.á..=.tèP 000180
 8800D283 D803E7F7 C588509F C008DA88 E7F7C688 E88880C9 8080C880 EF8AFF32 2..ÿ.ù..è..Š.ó÷Õ.Õ.å.P.é÷Õ.Å.Ø.. 0001A0
 E2D10878 FF0A5893 D388C703 E1F6C588 01C88003 749E58FA 13D803E6 F7C188FA '.é÷1.Å.'X.t..ù..é-Å.û.Æ.X..x.1ã 0001C0
 D1024488 D900E1D1 024D88F7 87FF1AE9 AD74FFFC 80C4FEFF 69E90A75 E40AD3D1 1Æ.ðu.Õ1.±á.=.tÛÕ...÷.M.1ÅÅ1.D.1 0001E0
```

```
Dump of file SATURN:[PCCOMMON.DUMP.DLL]MOD.TMP;1 on 18-APR-1990 10:47:55.47
File ID (736,57,0)   End of file block 42 / Allocated 44

Virtual block number 19 (00000013), 512 (0200) bytes

 FFFC8080 C480FF7B E90371E5 2A7FED80 81EC80C1 32DB74E4 0A5C74ED 0AD8D0E0 ÅÄÄ.Ût\.ðtÙ2è.š..Ù.*lq.ð(..é..•. 000000
 885000A6 3E02D9D1 EBD10874 0000A63E 8080CF80 C93220BA 015D88FF 78E90375 u.Õx..]..-2è.Ü..>[..t.\$||.>[.P. 000020
 DD8B01CA 800374D6 8BC20B00 11E8EE88 001AE808 D1EAD180 CE80C032 248A0154 T..$2à.ö.|ö|ÀÒ...ŸÒ...ð.øt..ò..T 000040
 4E0773D7 88FA1BD8 F7E1F7C6 88FA8815 E3C03396 F3F71D73 D33BF880 E9FF76E9 Õv.Õ¯½;Æs.¥µ.3äÒ..*.6¼Ä¼Ä.*.øs.N 000060
 0774ED0A 00A82E8A 0000A606 C6C3ED73 C1880003 C128FFFF BEC3F973 D313C103 .è.Æs*ú/..+è.Å.èsÚÚó.|.....´..Út. 000080
 5AFE4EE8 DB32D233 52535000 A9028E06 C7028E36 FF3874E4 0A3C77EC 3A0EED80 .Ú.:šw<.ðtß.6..ú...`.PSR3Ø2ÜÒN±Z 0000A0
 D2330B33 C033FE33 E9028E06 8F585B5A FE0FE8FF 32525350 00AD028E 06C7585B [Xú...Ù.PSR2.Ò.±Z[X....Õ3±3ã3Ü3Ø 0000C0
 88F787D3 EB00ABA3 00A9A3C0 33FE1AE8 52535000 AD028E06 C7028E36 FF00A6A2 Å|..6..ú...Ù.PSRÒ.±3äÈ`.È¨.ŠÆ.¥. 0000E0
 88028E36 88A8E60A 80E6807F E480ADA5 A5A5028E 3E88F788 1DEB8000 F581066D m..%..Š..¥.>..ÈÈÈÙ.ð..|..]¨.6... 000100
 95F78709 77E83BE0 E5830274 FFE025DA D0E0D1DE D0E5D106 4488FC06 6088C3FE ±û.m.•.D.||Ä8|ÄÄÒXÄ.t@.[Ä;Òw..¥. 000120
 E086C001 C001C001 570DD1E2 D0D0D1E6 D0B97706 A03D08F7 C528C274 C00BD686 .ø.ðtò+è¼Ä=..w¿Ä|||Ää||W|à|à|à.Å 000140
 0374D208 187C0EFF 836374FF 0B10CC80 0FE480AD 93A091AD 92C032E0 8AACF888 .½¯.Å2à.Ù.Ù.Ù.ð..ä...tc...|..Øt. 000160
 01CE8003 74D20A28 7C06FF83 23724874 E77710EF 83C033D8 88C888D1 8801C980 .è..|.ù.Ä3à.ÿ.wÒtHr#...|+.Øt..ö. 000180
 47D001D3 D1D1D1E2 D123740F 7708EF83 E432C48A F88ADF8A EB8ACD8A F18AD68A .ø.þ.ë.Š.Ò.½.á2ð.ÿ.w.t#|ä|||Æ|ÄG 0001A0
 743FC2F6 975ECF87 F6E2DAD1 DFD10BD1 E8D120CA 8003743F C2F6CF87 16EBF575 uXŠ..ü-ö?t..ò |Ò|Ù|Ò|Òä-.ü^.-ö?t 0001C0
 CE810FFF E6810574 88509F50 035C1301 4C133402 D8D0E5D1 3B70E5D1 20CA8003 ..ò ||p;||ÄÄ.4.L...\.P.P.t..|...ö 0001E0

Dump of file SATURN:[PCCOMMON.DUMP.DLL]MOD.TMP;1 on 18-APR-1990 10:47:55.47
File ID (736,57,0)   End of file block 42 / Allocated 44

Virtual block number 20 (00000014), 512 (0200) bytes

 F6ECE903 75E0FD83 20C583DA D1D9D1DB D1DFD113 742000C7 F7FE1358 9E581000 ..X.X.±¥ú. t.|Ò|Ù|||Ö.é .»Åu.Õ§- 000000
 FE1B9E10 00CE810F FFE6819F 05748B03 5C1B014C 18342AD0 F6D8D0E5 D10088E9 Õ..||ÄÄ-Ä*4.L..\..t...|...ð....± 000020
 E0C7F618 75FF0B00 04BEFCFE 130E13CE 13F50AF7 D1F7D3F7 D7F7D0F6 F6331373 •.3--Ä¥•¥Æ¥|¥Ò¥.ð.ß.±•/....u.-úÅ 000040
 760100ED 8118751F E0C7F7E4 EBD233CA 88D988FB 8830744E 40760200 ED811375 u..Ù..v@Nt•.«.).ò3ØŠò¥úÅ.u..Ù..v 000060
 E2D17174 20ED8312 751000C7 F7970082 F28ACE8A E98ADD8A FB8AC78A E08A9727 '..Å.ú.«.|.Õ.ò.·ý..¥ú..u..Ù tq|ã 000080
 01C6F61F 72077780 FA800385 E9037400 008E3E80 FC9065EB EBE807D1 D3D1D1D1 |||Æ|•ŠŠŠe.•.>/..t.Õ...*.w.r.-ó. 0000A0
 3E88F788 3074E0FD 8320C583 08742000 C7F70007 83000383 00D18301 C6801A74 t..ó..|..Æ..•.¥ú. t..é .»ÅtÒ.¥.> 0000C0
 C188AAC6 8A055D88 064589C7 0AC50BC0 32E08622 74EDD10F E7808024 DE87028E ...B$..Ó.|Ùt".Å2à.é.ú.E..]..ó¯.è 0000E0
 028E3E88 C0330377 E9037400 008E3E80 FCF5FDE9 0379C3F7 8805EF83 ABC688AB ¨.ó¨.ÿ..¥ûy.Õ»¥•.>/..t.Õw.3à.>.. 000100
 D1D0747F F0E181D1 33064D88 D8747FF0 25D08806 4488FCC3 FE88ABAB ABABF788 .¥¨¨¨¨.±û•.D..ÄXÞ.tÜ.M.31.Äþ.tÅ| 000120
 03740181 E850D8D1 E6D08674 FFE03D80 0005BC70 C1037FE0 E9818000 2DE1D1E0 Å|Ä-...ÕÅ..èp¥...=Å.tÑÄ||ÄPÒ..t. 000140
 8320C583 93EB0A75 ED08D7D1 D3D1D1D1 E2D10E75 1000C7F7 D8D0E5D1 5D01CA80 .ò.]||ÄÄ¥ú..u.|ä|||Æ|•.Ùu.Š..é . 000160
 7FF025D0 33064488 EF747FF0 E1810188 064D88FC F787F58C E9FF24E9 8874E0FD »Åt.Õ$.Õ.¥.¥•.M..|.Äþ.tÿ.D.3ÄXþ. 000180
 8AAC50D8 D1E6D098 74FFE030 8000059B 70C1287F E0E98180 202DE1D1 E0019B74 t.|Å|Ä· ..ÕÅ.+èp....=Å.t.Å||ÄP¯. 0001A0
 10CC800F E480ADFD 008C8F05 C683F788 509210CC 800FE480 AD92AD93 ADC932E8 Ò2èÙ.Ù.Ù.ð..ä..P.¥.ó.¢¥.»Ù.ð..ä. 0001C0
 008E2602 E8D1E888 ADF78800 BCBFFD1F 7400008E 3E800005 C6FCA447 46A5A5AB ¨ÈÈFGÈ•ó...>/..t.»¢¥..¥Ù.Ò|Ò.&/. 0001E0

Dump of file SATURN:[PCCOMMON.DUMP.DLL]MOD.TMP;1 on 18-APR-1990 10:47:55.47
File ID (736,57,0) . End of file block 42 / Allocated 44

Virtual block number 21 (00000015), 512 (0200) bytes

 003BE857 003FE8D9 D1D8D1D8 D1EAD158 FCAB08D1 ADABD8D1 ADAB08D1 ADEDD1AB ¨|ÙÙ|Ä¨Ù|Ä¨Ù|Ä¨•X|ö|Ä|Ù||ò7.Wò;. 000000
 08CA8003 7407C2F6 01CA8003 745F5B59 D78BC20B C10BC30B 0033E857 0037E857 WÒ7.WÒ3..û.è.ô.•Y[_t..ò.-ó.t..ò. 000020
 3300BC36 88FF08E9 DAD1D9D1 DB01EFD1 DAD1D9D1 DB01EFD1 DAD1D9D1 DB01EFD1 |ÿ|Ù||ö|ÿ|Ù||ö|ÿ|Ù||öÕ...6¥.3 000040
 F288E7F7 0474C008 0086A1F5 88ED3397 52F6F73B 77F03804 75D2085C 73D638FF .;øs\.Øu.;Þw;¥-R.3Ù.¥ÄÑ..ât.¥Ó.· 000060
 DAF75A92 00D283E8 03E7F708 74C00800 8AA1EA13 F003E7F7 0674C008 0088A150 PÅ|..ât.¥Ó.Þ.ðÅ¤..ât.¥Ó.Ò.Ø..Z¥ö 000080
 ED7300BC 161300BA 06130088 1E130086 0E034F13 73939192 95E81850 DD1BCE18 .ö.|].Ò....s.O..Ñ...|...¤...¥.sÛ 0000A0
 8AC9EBF5 00861688 C213008A 1E130088 0E03008A 06180088 1E180086 0E2B4FC3 ÚO+.Ñ...|...¤...|...¤..ó..Ñ.¥Šè. 0000C0
 0D8B911A E30C88EB 88D83300 B4A3100C 0F240645 8A00B2A3 100C0F24 E4320644 D.2ó$...Èý..E.$...ÈÇ.3Ù.Š..D.... 0000E0
 74C00B02 4488ED33 550A13C8 03E2F706 74D20B02 5588048B CA88E888 E1F708E3 D.¥Ä.Ò.ò...Ù..Øt.¥ã.à.ÖU3Ú.D..ât 000100
 74D20B02 55880074 C00B0244 8850C10B 58D5D10A 13C803E2 F70874D2 0B15880E ....Øt.¥ã.à.Ö|(X.èP.D..ât..U..Øt 000120
 44880101 EA130803 E2F70874 D20B0455 880F74C0 0B0488C9 33EA130B 03E2F706 .¥ã.Ä.ò3è...ât..U..Øt.¥ã.Ä.ò||.D 000140
 26F70874 C00B0488 50C30858 000183EA 130803E2 F70974D2 0B15880F 74C00B04 ..ât....Øt.¥ã.Ä.ò.|.X.ÚP...ât.¥& 000160
 0455880F 74C00B02 44880B33 CA13E803 008226F7 0874C008 058BCA13 E80300B4 Ç..Ò.ò...ât.¥&ý..Ò.ò3Ù.D..ât..U. 000180
 CA13E803 E2F70974 D20B0255 881074C0 0B044488 D3D1CA13 E803E2F7 0874D20B .Øt.¥ã.Ò.ò|Æ.D..ât..U..Øt.¥ã.Ò.ò 0001A0
 0B0426F7 0874C008 024488DA 13C80300 B226F708 74C00B02 4588ED33 55000383 .Æ.U3Ù.E..ât.¥&ý..à.Ö.D..ât.¥&Ç. 0001C0
 B426F704 4488D5D1 DA13C803 E2F70874 D20B0455 881A74C0 0B04448B DA13C803 .à.Ö.D..ât..U..Øt.¥ã.à.Ö||.D.¥&Ç 0001E0
```

```
Dump of file SATURN:[PCCOMMON.DUMP.DLL]MOD.TMP;1 on 18-APR-1990 10:47:55.47
File ID (736,57,0)   End of file block 42 / Allocated 44

Virtual block number 22 (00000016), 512 (0200) bytes

 D15A97C5 03008426 F60082A0 EA130803 008226F7 0874C008 04458BEA 13080300 ..Ã.ð.E..ât.X&ý..Ã.ð.ý.-&Ç..é.Z1 000000
 0000BE06 C6C3F60B 5ED7D1D3 D1D1D1E2 D1D7D1D3 D1D1D1E2 D1D7D1D3 D1D1D1E2 ã111Æ1ªïã111Æ1ªïã111Æ1ª^.-ûó./.. 000020
 515000C1 028E06C7 028E36FF 4C74E00B 5077F53B 04C0EE81 0874F60B 00BF368B .6¢..-t..Ÿâ.;%wP.ÚtL.6..ú...è.PQ 000040
 33575553 52515000 C9028E06 C758595A 5B5D5FFC 3EE8D233 C9330833 57555352 RSUW3Û3è3ØÒ>ª_][ZYXú...è.PQRSUW3 000060
 00BEA2FF 33ED330B 330233C9 33C033FC 1AE9028E 068F5859 5A5B5D5F FBD1E8FF .Ò1«_][ZYX....Ö.ª3â3è3Ø3Û3Û3.Ã/. 000080
 8855C6EB ABABABAB C03300C1 BFFBF8E8 57555352 515000C9 028E06C7 028E36FF .6..Û...è.PQRSUWÒ%««¢è.3â""""""$óU. 0000A0
 7680071E FC5756EC 885508EB A536A536 A536A536 00E0BF0E 7680071E FC5756EC $VW•...v.¢Á.6E6E6E6E$.U.$VW•...v 0000C0
 D2FF5553 00E8028E 06C7028E 36FF00E0 BF0008BE A536A536 A536A536 0008BF06 .¢Ã.6E6E6E6E/Ã.¢Á..6..ú...Ò.SU.● 0000E0
 C600D61E 8C00041E 89C88AC9 33CB50E5 885E5FDA 8C00E888 0872028E 068F585D ][....r.¡Ò..Ò_^.[]û3è.à..â...ø.6 000100
 C0331874 033C0C74 073C1274 03FC8000 E8BF0100 FF06C605 75030230 0000FF06 ....ª..u.6....¢Ò..ª.t.<.t.<.t.3â 000120
 D20E89A5 A5A5A503 BC8E07EB 8000EF0E 80A5A5A5 A503BCBE 03B117EB ABABABAB """"$.Ý./¥.EEEE..ÿ..$./¥.Eʟ"E..● 000140
 D23E8307 750000FF 3E8021B0 9475C00B 04C48306 6520139A 50000288 1EF18800 ..þ.¡●.P.. e..ó..âu.¯!.>...u. >● 000160
 FC8B145B 1FAE9A4B 00041E8B 1874F60B 00EEB48B E6D10810 A3982280 02720300 ..r.¯".È..1l.ÇŸ..-t...â.K.Ö.[.E• 000180
 F30004B9 C033FE8B 028E368B C3F90501 8BFF59E9 14941CFE 9A56148C 1FAE9A00 ..Û...V.±...ÕY.¦..¹û.6...±3â¿..µ 0001A0
 4C8B055C 8A3FE02D D778FFF0 25E1747F F0A9F88A 06448803 DEBFFCC3 F8FE8BAB ¨.±½Û•¢ß..D..½`Þ.tÃ%Þ.xª-Á?.\..L 0001C0
 10050974 10A880CF 8003D1D1 D1E2D1D3 D1D1D1E2 D1D3D1D1 D1E2D156 01548803 ..T.Vïã111Æïã111Æ1ã11Æ.Ü.´.t... 0001E0
```

```
Dump of file SATURN:[PCCOMMON.DUMP.DLL]MOD.TMP;1 on 18-APR-1990 10:47:55.47
File ID (736,57,0)   End of file block 42 / Allocated 44

Virtual block number 23 (00000017), 512 (0200) bytes

 57D8BDE3 F7AFB1B8 5236EBF9 0372FEF8 83064589 3FE005F8 D1DAD1D9 D1EBD100 .1$11101½.Ã7.E..«±r.¹$6R¡ÝE%D§ÃW 000000
 C188D38B DDD1E813 F9F5F7C1 88D38BDD D1E803F5 F7C033D3 88FFFFBD 0373EA03 .Ós.§...Æ3ó%%.Ò11.Æ.ê%%¹.Ò11.Æ.ê 000020
 D1D3D1E1 D1D0D1D3 D1E1D1D0 D1D3D1E1 D1C033DE 03C888DD 88F5F758 F088F5F7 %%.Þ%%%.1.à.B3â1Ã1Æ1Ã1Ã1Æ1Ã1Ã1Æ1 000040
 066D83F8 A5E85FF8 13E8575E 000005C7 02408904 5D890645 08D0D103 D1E1D1D0 Ã1Ã1Æ1Ã.E..]..M.ú...^WÒ.«_ÒE%.m. 000060
 26065E8B 0C740102 9587F6D8 8B98078A 26065EC4 565704EC 83EC8855 00C3F810 .%û.U.$.$.WVá^.&....Ã-....t..^.& 000080
 9587F6D8 8B98058A 2647FB8B 16740065 3D98078A 26065E8B 07E80020 0598078A .... .$..^.&...ªe.t..«G&....Ã-.. 0000A0
 078A2606 5E8B2E07 C6260646 FFF08B98 078A2606 5EC40846 8C067E89 F2750402 ..u·.-..F.á^.&....Þ.F.&ó...^.&.. 0000C0
 06EC83EC 8B55CB5D E58B5F5E FC7E89E9 75C00A06 46FFF78B 078826C6 8BF8B898 ..½.ó&...%.F..âuÕ.~ª^_.[]ûU.$.$. 0000E0
 0646FFDF 8B08468C 067E89F3 75003D80 26470774 2E3D8026 9008EB06 7EC45657 WVá~.$..&.ª.t.G&.ª.uæ.~..F..Ô.F. 000100
 89ED7500 3D802647 07744530 80260074 65308026 900EEB06 7E886774 003F8026 &.?.tg.~.$..&.ªet.&.ªEt.G&.ª.uÛ. 000120
 89F97430 3D80264F 9002EB06 7E88FE56 89FC4689 064EFFC2 8CC78B08 468C067E ~..F..ú.ô.N..Fª.V±.~.$..O&.ª0t¹. 000140
 078826AC 065EC406 46FFFC76 C5FA5E8C 064EFF03 752E3F80 26DF8808 468C067E ~..F..O&.?.u..N..^¹évª.F.á^.¯&.. 000160
 16960094 9A0B261E 8DEC8B55 90CB5DE5 885F5EFA 5E8EFE5E 8CFC7689 F275C00A .âu·.vª.^±.^¹^_.[]û.U.$..&...... 000180
 565708EC 83EC8855 CB5DC02B CB5D0001 88057216 BF05149A 16980074 9A065EC4 á^..t......¢.r.¦..]û+â]ûU.$.$.WV 0001A0
 A5A5DA8E 1EF088F8 88085EC4 04C48316 E31D829A 0C76FF0E 76FF2474 00067E83 .~..t$.v..v....D..á.á^..«.Þ..ÖEE 0001C0
 1E0716F0 8BF87E8D 04C48316 FD1D829A 0C76FF0E 76FF90CB 5DE5885F 5E1FA5A5 EE.^_.[]û..v..v....».á..-½.Þ... 0001E0
```

```
Dump of file SATURN:[PCCOMMON.DUMP.DLL]MOD.TMP;1 on 18-APR-1990 10:47:55.47
File ID (736,57,0)   End of file block 42 / Allocated 44

Virtual block number 24 (00000018), 512 (0200) bytes

 8B5590CB 5DE5885F 5E177901 E79A085E C4170500 949AF85E 8D1FA5A5 A5A5DA8E .ÖEEEE..^½.....á^..Ô.y.^_.[]û.U. 000000
 3F8326F8 5EC4FA56 89F84689 0CDE1688 0CDCA147 74000106 3E805657 0AEC83EC $.$.WV.>...tGÃÉ...8..F½.V̄¹á^½&.? 000020
 E8000188 067E000E 7E83FE56 89FC4689 0C56880A 4603C02B 02E80001 B805752D -u.¦..$.+â.F..V..Fª.V±.-..-.¦..$ 000040
 260477FF 260677FF 26065EC4 58E806C4 83045DE8 0EFC76FF FE76FF50 C0289003 ..+âP.v±.vª.Ò]..á.$Xá^.&.w.&.w.& 000060
 7E000E7E 8350400E 46885052 FA5689F8 468908C4 8317B71F C89A37FF 260277FF .w.&.7.à.ñ..á..F½.V¹RP.F.∂P.-..- 000080
 880A4603 C703C02B 02E80001 B805752D 3F8326F8 8BF85EC4 C02802E8 00018805 .¦..$.+âá^½.½&.?-u.¦..$.+â.û.F.. 0000A0
 75203F83 26F85EC4 FE5689FC 46890C56 880A4688 0AC48318 111DD89A 50520C56 V.RP.Ã....á..F..V..Fª.V±á^½&.?-u 0000C0
 5E8BFC46 FF078826 01478A26 FC5EC414 7E000E7E 832007C6 26FC46FF FC5EC40A .á^ª.Fª&ó.-.-..~.á^ª&.G.&...Fª.^ 0000E0
 349A5052 FE5688FC 46030E46 0308F7C0 18010106 3E80501E 0100882E 07C626FC ª&ó..¦...P.>....â%Ã.F..Fª.V±RP.4 000100
 26F85EC4 FC46FF45 07C626FC 5EC40774 00107E83 FE5689FC 468908C4 83194B1D .K..á..Fª.V±.-..t.á^ª&ó.E.Fªá^½& 000120
 C626FC5E C4F088D8 F70B7DF6 08F08848 02478826 F85EC45E 74303F80 26065FC4 á_.&.?0t^á^½&.G.H.Þ.-}.%Ã.Þá^ª&ó 000140
 FFF288F9 F799C688 070026FC 5EC4F9F7 00648999 C688157C 64FE83FC 46FF2007 .¯.Fª.±d|..ó.¿d.%¹á^ª&...ó.%¹.·. 000160
 C4FC46FF F288F9F7 99C68807 0026FC5E C4F9F700 0AB999C6 88157C0A FE83FC46 Fª.±.|..ó.¿..%¹á^ª&...ó.%¹.·.Fªá 000180
 FF010106 06C604EC 83EC8855 90CB5DE5 885F5E0C 56880A46 88070026 C688FC5E ^ª.ó&...F..V.^_.[]û.U.$.$.ó..... 0001A0
 00010606 C6FE5689 FC4689FE 49E80E06 76FF0876 FF0A76FF 0C76FF0E 76FF1076 v..v..v..v..v.¯v..Ò[±.Fª.V±ó.... 0001C0
 89F44689 0CDE1688 0CDCA151 74000106 3E8000F2 46C612EC 83EC8855 CB5DE58B .[]ûU.$.$.óF·..>...tQÃÉ...8..F¶. 0001E0
```

Dump of file SATURN:[PCCOMMON.DUMP.DLL]MOD.TMP;1 on 18-APR-1990 10:47:55.47
File ID (736,57,0) End of file block 42 / Allocated 44

Virtual block number 25 (00000019), 512 (0200) bytes

```
08A1FE56 89FC4689 0C56880A 4603C02B 02EB0001 8805752D 3F8326F4 5EC4F656 V-á^¶&.?-u.¡..Š.+&.F..V..F=.V±À. 000000
EE5E8830 07C626EE 46FFEE5E C4F05689 EE468901 080603FC 46886A75 0E463901 .9F.uj.F=.....FŸ.VÞá^Ÿ.FŸ&6.0.^Ÿ 000020
08C48319 7B1FCB9A 37FF2602 77FF2604 77FF2606 77FF2606 5EC44AEB 0007C626 &6..ŠJá^.&.w.&.w.&.w.&.7.à.(..á. 000040
C02B02EB 0001B805 752D3F83 26500E46 03024788 26F45EC4 5052F656 89F44689 .F¶.V-RPá^¶&.G..F.P&.?-u.¡..Š.+á 000060
26F45EC4 FE5689FC 46890C56 880A4688 0AC48314 9A10D89A 50520C56 880A4603 .F..V.RP.Ä....á..F..V..F=.V±á^¶& 000080
FE76FF50 00018810 7F00027F 8326F45E C42D07C6 26FC46FF FC5EC40A 752D3F83 .?-u.á^=.F=&6.-á^¶&......|..P.v± 0000A0
FC460102 478B26F4 5EC40AEB 3007C626 FC46FFFC 5EC406C4 830205E8 0EFC76FF .v=.Ò...á.á^=.F=&6.0Š.á^¶&.G..F= 0000C0
07C626FC 46FFFC5E C406C483 0108E80E FC76FFFE 76FF5000 0188687E 000E7E83 .~..-hj..P.v±.v=.ÒÄ..á.á^=.F=&6. 0000E0
D8F70247 88260EEB D8F70247 88260874 0001063E 80437D00 027F8326 F45EC42E .á^¶&....)C.>...t.&.G.%ÄŠ.&.G.%Ä 000100
50003088 0E76FF06 C4830196 E80EFC76 FFFE76FF 500E4689 0E468803 7E0E463B ;F.~..F..F.P.v±.v=.Ò...á..v.¡0.P 000120
06C604EC 83EC8855 CB5DE58B 0C56880A 468B08C4 831A921F 669AFC76 FFFE76FF .v±.v=.f....á..F..V..Ì]ÙU.Š.Š.6. 000140
010606C6 FE5689FC 4689FE6E E80E0676 FF0876FF 0A76FF0C 76FF0E76 FF010106 ....v..v..v..v..v..Òn±.F=.V±6... 000160
9A37FF26 0277FF26 0477FF26 0677FF26 065EC456 06EC83EC 885590CB 5DE58800 ..Ì]ù.U.Š.Š.Vá^.&.w.&.w.&.w.&.7. 000180
06752D3F 83260108 A3480247 88260CDC 1EC40CDE 16890CDC A308C483 1ACE1FC8 à.ö..á.ÈÉ...8.6.É.&.G.HÈ..&.?-u. 0001A0
1BCE10D8 9A50520E 76FF5306 FE5689FC 46890C56 880A4603 C0289003 E8000188 ¡..Š..+á.F..V..F=.V±.S.v.RP.Ä.ö. 0001C0
83010836 89010AA2 C02A02EB 0180047D 01083639 4E027788 260CDC1E C40AC483 .á.á.É.&.w.N96..).¯.Š.*ãÅ...6... 0001E0
```

Dump of file SATURN:[PCCOMMON.DUMP.DLL]MOD.TMP;1 on 18-APR-1990 10:47:55.47
File ID (736,57,0) End of file block 42 / Allocated 44

Virtual block number 26 (0000001A), 512 (0200) bytes

```
93E80E06 76FF0876 FF0A76FF 0C76FF0E 76FF1076 FF1F7F0E 4639C688 077CFCFE ±=|..69F....v..v..v..v..v..v..Ò. 000000
7689F975 00FF7C80 46FC76C5 FA5E8C1E 7400010A 3E8090CB 5DE5885E 0CC483FD ».à.^.Ì]ù..>...t..^*év=F.|..u*.v 000020
E80E0676 FF0876FF 0A76FF0C 76FF0E76 FF00FE47 C626FC5E C4FA5E8E FE5E8CFC =.^±.^*á^=&6G±..v..v..v..v..v..Ò 000040
FF1076FF 1276FF19 75450E7E 83067465 0E7E83EC 8855CB5D E5885E0A C483FEF6 -±.á.^.Ì]ÙU.Š.~.et..~.Eu..v..v.. 000060
76FF0C76 FF1076FF 1875660E 7E839035 EBFB8FE8 0E0676FF 0876FF0A 76FF0C76 v..v..v..v..Ò.«Š5..~.fu..v..v..v 000080
FF0876FF 0A76FF0C 76FF1076 FF1276FF CB5D0AC4 83FD39E8 0E0676FF 0876FF0A ..v..v..Ò9».á.]ù.v..v..v..v..v.. 0000A0
1BE91D6A 9A0676FF 0876FF29 74000A7E 83EC8855 90CB5D0C C483FEC0 E80E0676 v..Òã±.á.]ù.U.Š.~..t).v..v..j.Ò. 0000C0
CB5D0AC4 83168E1E 9C9A5052 08568806 46030A46 880676FF 0876FF50 4004C483 .á.∂P.v..v..F..F..V.RP......á.]ù 0000E0
89010C0E 8908E801 1E028E06 C7087412 7703FB83 D88E1EEC 88554590 D88CC888 .à.Ä.EU.Š..Ä.«.w.t.û.....Š...... 000100
8CC08C01 108FF388 CBF3F60C B3011E2D 028EA1CB 4D5D1FE5 8802E083 F8010E16 ...%.Ú..Ì.]MùÀ..-..*.-µù.µ¢...á. 000120
A5A5A5A5 FC088EC1 8ED98CC0 8C01108F F388C301 108ED98E A5A5FC08 8EC18ED9 \.ê.Ä=ÉÉ.\/..û.µ¢...á.\.ê.Ä=ÉÉÉÉ 000140
80C2F702 54880C8B C033FCFC 758803E8 07FE45C6 FC7D89FC 7588C301 108ED98E .\/..û.u=.)=6E±.Š..u==3á...T.%ô. 000160
8FE68004 4D890245 89D8D1D9 D1FAD1D8 D1D9D1FA D1D8D1D9 D1FAD105 8925747F .tX..Ì*Ì]ÌÄÌ*Ì]ÌÄÌ*Ì]ÌÄ.E..M..Ì. 000180
1A391CFE 9A5000FC B8EC8855 C3064589 04458902 45890589 C3065589 3800C281 .ò.8.U.û...E..E..E.ÙU.Š¡=.P.±.9. 0001A0
885504AE E90002B8 CB5DE58B 1CAE1CFE 9A5000FF B802901E FF047400 02923E83 .>...t.....|..P.±.Û..Ì]ù¡..ÒÛ.U. 0001C0
F2FFFFB9 C033970C 74964010 74C23BAD 0B368E06 5688C08E D88EFFFF 885756EC ŠVW|...Ä.á.V./6.Ù;ôt.∂.t..3á¿..· 0001E0
```

Dump of file SATURN:[PCCOMMON.DUMP.DLL]MOD.TMP;1 on 18-APR-1990 10:47:55.47
File ID (736,57,0) End of file block 42 / Allocated 44

Virtual block number 27 (0000001B), 512 (0200) bytes

```
8B921F74 C00B1CC2 1CCE9A06 76FF57EC 88550002 CA5DE588 5E5F96EB EBF788AE Û.%Š$._^.Ì]ò..U.ŠW.v..ô.ô..ât... 000000
E5885F58 0000FFFF 9A501651 521E5300 02B8C488 5049D1F7 AEF2FFFF B9C033FA *3á¿..¯Û%ÌÌP.áE..S.RO.P.....{_.Ì 000020
7EC4D1F7 AEF2FFFF B9C033C0 8ED88CFE 880A76C5 1EDE88D7 88EC8855 0002CA5D ]ò..U.Š.=.8.év..±.Ä.á3á¿...Û%Tá~ 000040
C4D788EC 8855CB5D C28C1FFA 88F388A4 F3C913A5 F3E90149 A4027401 A8C78806 ..û´.t.ÉÌÌÕµÉ.èµÉ.µ.*..ô]ÙU.Š.=6 000060
26479002 EB067EC4 56570000 00C800CB 5DFA8891 4901F7AE F2FFFFB9 C033067E ~.3á¿...Û%ÌÌ..*]ù.à...WVá~.Š..G& 000080
04C4831D 88106A9A 5706006A 006A0846 8C067E89 F2750802 9587F608 88980S8A ....Ä~....u·.~..F.j.j..W.j.¡..á. 0000A0
881FA5A5 A5A5DA8E 1E071EF0 880CE08F 0008050A C4831D08 23119A57 0876FF50 P.v.W..#...á....¢Å..Þ....ÛÉÉÉÉ.¡ 0000C0
478B260C 5EC4FA56 89F84689 08568806 46885657 00000AC8 CBC95F5E DA8C0CE0 Å..Ò^_èùà...WV.F..V..F%.V*á^.&.G 0000E0
5E8C0A4E 882E7E00 0A7E8330 07C626F8 46FFF85E C4FE5689 FC468908 57882606 .&.W..¯F=.V±á^%.FŸ&6.0.~..~..N..^ 000100
F87689E7 E2460488 30809003 E8078A26 FC46FF09 74003F80 26FC5EC4 F876C5F6 -év%á^=&.?.t..F=&..Š..¯0..Fãô.v% 000120
FF1F7C35 3F8026FC 5EC4287C 000A7E83 0007C626 F85EC40A 4E89F65E 8EFA5E8C .^*.^-.N.á^%&6...~..|(á^=&.?5|.. 000140
5EC407FE 26DF88FA 468CF87E 89F57439 3D80264F 3005C626 9006E8F8 7EC4F84E N%á-%Š..&6.00&.=9t%.-%.F*.Ò&±.á^ 000160
1D349A06 76FF5250 52400856 8806468B 15E80247 FF260C5E C4097531 3F802606 .&.?1u.á^.&.G.Š..F..V.∂RPR.v..4. 000180
C40A76C5 56571E00 B5E90375 C9080E4E 88EC8855 000090C8 C95F5E08 C4831DA8 ¨..á.^_èù...U.Š.N..èu.Òç..WVév.á 0001A0
D88C0773 F1034950 7300DA83 C12B5778 D20B0E4E 881E9022 CC9A5706 561E067E ~..V.W.ã"...N..ØxW+ê.Ö.sPI.þs..Ä 0001C0
DB1BC62B C703C323 DB1BC72B 48C18841 C08E1ED1 05C08C07 73F90308 8EFFFF05 ....Ä.*s..á.Ì..âA.éH+ú.ÛWù.ú+6.Û 0001E0
```

Dump of file SATURN:[PCCOMMON.DUMP.DLL]MOD.TMP;1 on 18-APR-1990 10:47:55.47
File ID (736,57,0) End of file block 42 / Allocated 44

Virtual block number 28 (0000001C), 512 (0200) bytes

```
D175FFFF 83D88E1E DC2D088C 0775FFFE 835CE391 FCA4F3FD C1289140 C603C323 #ú.6ã.+ê»µÊ=.D\.±.u..Ã-É..Ä...uí 000000
D818C228 D2F7D688 C203C323 DB18C228 D2F7D788 48C188C8 EBC08E1F 072DC08C .ã-...ãŠà.èH.æ%@+ð.Ûwü.ð.ø%@+ð.Û 000020
FF08D88E 1F130508 8C0775F6 0818E391 A4F3C913 A5F3E9D1 C1289140 C203C323 #û.6ã.+èÍÕµÊ.èµÊ.D..-u..Ä....Ä.. 000040
C45738E3 0C4E88EC 8855CB5D 08568806 46881F5F 5E8EEBC0 8E1F4A05 C08CC775 uú.å.J..åŠ/^_..F..V.]ùU.‡.N.D8Wé 000060
F3C913AB F3E9D1E0 8A0A4688 D12BD187 D103D323 DB18D128 0C74DAF7 D788067E -..æ%Öt.+Ì.Û÷Æ.Ì.Ì+Ì.F..ÄÌÕµ¨.èµ 000080
078AC85D 08568806 46885FAA F3C913AB F3E9D1C3 8E1F55C3 81C38C10 E3D187AA ˆ.ÌD..û.ùU..ûÌÕµ¨.èµ¯_.F..V.]ù.. 0000A0
D88CFC57 56EC8855 CB580000 1D289A53 1650521E 510002B9 DC8B5301 578DE42A *ð.W.S.É¿..Q.RP.S.(..¯[ùU.‡VW=.Ä 0000C0
9198ACC8 8803A88F 5D040FE8 5503A08E A536A536 A536A536 03A08F06 768DC08E .å.v.¢..6É6É6É6É/..UÒ..]¢ˆ..à¯.. 0000E0
885E5FC7 88DA8C08 508C03A8 0645C704 40890255 891D89FF 3203968F AA91A4F3 µÊ.ˆ¢..2....U..M.úÉ.´..]..Ö.ú_^. 000100
028E3688 EDE6E903 DE8F028E 3688C801 03C406C6 C85DE588 C033EC88 55C85DE5 ]]ùU.‡3ã.[]ùó.á..ù.6..¢8.ÕÌÚ.Õ.. 000120
DE8E028E 3E88F032 E903DE8F 028E3688 EFD9E903 DE8F028E 3688ED89 E903DE8F ¢8.Õ¿Ú.6..¢8.Õlÿ.6..¢8.Õ2Þ.>../8 000140
3E88C358 5FA8ABAB A8028E3E 88FCC033 5750F01E E903DE8E 028E3E88 ED98E903 .Õ.Ú.>../8.Õ.ÞPW3ã=.>..¨¨¨¨¯Xû.> 000160
A5A503DE 8F028E36 88C3028E 3688A5A5 A5A5028E 3E88803DE 8EC30875 F73B028E ..;¥u.ûf8..>..ÉÉÉÉ.6..û.6..¢8.ÉÉ 000180
74FF0674 FF58028E 368804EB 03DEBEC3 08EE83A5 A5A5A503 E68FC308 EE83A5A5 ÉÉ.Ÿ.û¢|.ÉÉÉÉ.Ÿ.ûf8.Š..6..X.t..t 0001A0
88E0FF06 448F0444 8F02448F 048F5802 8E368804 E803DE8E E0FF34FF 0274FF04 ..t..4.Å/8.Š..6..X...D..D..D..Å. 0001C0
E3A5A5A5 A5028E3E 8817EB51 ED320579 C90891AD F388A5A5 A5A503DE BF028E36 6..¢8.ÉÉÉÉ.µÙ..èy.2ÙQŠ..>..ÉÉÉÉD 0001E0
```

Dump of file SATURN:[PCCOMMON.DUMP.DLL]MOD.TMP;1 on 18-APR-1990 10:47:55.47
File ID (736,57,0) End of file block 42 / Allocated 44

Virtual block number 29 (0000001D), 512 (0200) bytes

```
8E3E88E4 E208C683 595EED0C E8028E3E 88565EEF 1CE8030E BF028E36 8856511C .QV.6..¢8.Ò.ÿ^V.>..Ò.Ú^Y.6.ã8.>. 000000
4107E180 C88AE803 04812377 037030F C02D2874 7FF025E8 8A064488 C3F78802 ..%û.D..Ò%Þ.t+-å?=p.w#Ÿ.ÆÒ.à.Ä.A 000020
C48850EC 8855C306 6C88E0D2 06408A06 6C8610C0 8008F7D8 8898E8D0 E8D0E8D0 ÀÒÀÒÀÒ..Ä%Û.ë..l..ã.@Å.l.ùU.ŠP.é 000040
006CE800 21E80000 FFFF9A03 EE681E03 F0681E08 14A3E086 580000FF FF9A5016 .P.....X.ÂÈ...hÞ..hŸ......Òl.Òl. 000060
8B1E03F6 16FF00FF 6821801C FE9A2173 1CA49A50 C85DE588 0001881E B924F69A .-$¿.¡...[]ûP.É.$!.±..!h....-..É 000080
F3C888D1 8807FA8E 31740030 80264701 75003D80 267FFFB9 03F0068E FF330000 ..3...Þ.¿..&.=.u.G&.=.t1/ª..Ì.ùµ 0000A0
AC9204E0 C00E7241 2CAC0818 8F1FF788 071E061C E8E774AE F2C03308 74CA88A6 Ì.Òt.3ã·ÙtÓŠ.....¥.¢..¯,Ar.åÅ..¯ 0000C0
9A521650 1653C488 50870818 A780D488 52000288 00C31FED EBAAC20A 0572412C ,Ar..ð˚ŠÚ.û.É..R.å.Ì..ñP.éS.P.R. 0000E0
885A0479 48081B8F 08088106 75000230 07740001 3D408112 7558C008 0000FFFF .....åXu.Ýã=..t.*..u.Ý.....Kyå2. 000100
FF00038B C28C081A 06C4FAA2 E903730B 121EFFD8 33C28C0B 1606C41E E308140E ...D.é....ó3Ù....ø.ÕÅ*é....ðÉ... 000120
0E016A08 74081E30 081E8800 73E80810 8F0808BE 007CE80B 1E8F081E 8E08121E ...f..¢..Ò|.f..¢..Òs.¡..=..t.]... 000140
22549A00 6A006A03 6A0051E8 081E8F08 1E8ED88E 1CD488C3 0000FFFF 9A225968 hY"......û¡å..Ä/..¢..ÒQ.].].]..T" 000160
8F081E8E EC885503 E80031E8 081E8F08 1E8E003A E80CE88F 0CE88EEC 88550000 ..U.‡/Ò.¢Ò.Ò:./..¢..Ò1.Š.U.‡/..¢ 000180
07E30814 0E880000 FFFF9A50 06468A50 C033001A E8081E8F 081E8E00 23E8081E ..Ò#./..¢..Ò..3åP.F.P.........D. 0001A0
88EC8855 00C3EEE8 1DFFF274 02450805 8804EF83 0E73F738 C308121E FF00028B É......û;%s..ÿ....E.t·..ŠŸû.U.‡. 0001C0
335756EC 88550008 CA5DE588 D3180A46 28E8D3EA D3FFFFB9 0C5E8808 56880646 F..V..^.¿..ÆõÆŠ+F..Æ.[]ò..U.‡VW3 0001E0
```

Dump of file SATURN:[PCCOMMON.DUMP.DLL]MOD.TMP;1 on 18-APR-1990 10:47:55.47
File ID (736,57,0) End of file block 42 / Allocated 44

Virtual block number. 30 (0000001E), 512 (0200) bytes

```
5DE5885E 5F0D8940 C9800573 0A763800 0AC106C6 0028E801 0AC106C6 0E56880B Û.V.6.ê..Ò(.6.ê..;v.s..èã.._^.[] 000000
7664F983 0A4E88C0 8ED88CFC C85DE588 5E5F0006 E80E5E88 D2335756 EC8855C8 ùU.‡VW3@.^.Ò.._^.]]ù=.Ä.å.N..ªdv 000020
064E010C 46880676 890A3E8E 0A4E8808 8EA4F30A 3E8F0676 C527E8F6 33408106 .Ýã3-Š'év.¢>.µÉ.Ä.N./>..v..F..N. 000040
DA8CC788 065D8904 45890275 8900890A 2C8F0A76 0306762B 5D0456E8 550A348F ¢4.UÒV.]+v..v.¢,....u..E..]..û.Ö 000060
02E88302 EE830005 890AC383 0AC68316 75C43A80 80250947 8A2E0964 8A5653C3 ûSV.d...G.%..:éu..ó..û.¿...Ÿ..Š. 000080
D1DDD1DA D1D8D1E8 D1000589 FF33AD93 AD92AD95 AD56C35B 5EF3E107 3B2E0488 ...;.Äµ^[ÙVÙ.Ù.Ù.Ù3.¿...ÌÒÌÙÌÒÌÌÌ 0000A0
C3084489 065C8904 5489026C 893C895E 03FE200B D1F50001 3D00D1E3 D1F4E20F Ôã¶ÌDÌÅ=..%ÌÙ-±.^.<.l..T..\..D.û 0000C0
C0333001 44C60104 C60AAE8E FFFDCCCC CCCCCCCC CCCD0000 FFFFFFFF FFFFFC66 f=........ëãããããã».fÙ.6..60.03å 0000E0
F720837F 07648006 4C885EA5 F30004B9 570AA28F FCC08ED8 8C06C307 58400088 .Äã[.û..Ä.å=¢Å.W¿..µÉ^.L..d..° % 000100
883FFE05 ADF88A88 7480A8AC 0AA98EFF 33FF78E8 532D8302 79C90806 747FF0C1 èÞ.t..èy.°-SÒ(.3./`.¯`.tÉ.¥Ù.±7. 000120
5713430F 8112F4E9 81FA13C8 03E7F69A 80D713C8 03E4F64D 8091E2F7 40108AC8 åα.M%ã.¯M-ð.à.ø¯.-Ó.à.°.Ó¶..ÓC.W 000140
AD95AD97 AD575F06 15E823DA 88574709 725FFF13 E823008B 078CE80A A28EDFF7 %Ó/Ä.Ò..ÉÆ#Ò.._r.GWÉÒ#Ò.._WÙ.Ù.Ù 000160
039AD681 56C480F4 E2DCD00E D1D0D1DA D1E8D10C E3C033F7 88D9F791 AD93AD92 .Ù.Ù.%).%3åD.ÌŠÌÒÌÌÌ8ÅÉã¶¯.åV.ø.. 000180
D0D0D3D1 D2D1D5D1 D6D1E4D0 50565552 5351C032 0010890A AF8FD913 D113E913 .Õ.Ì.)¢É.¿...2åQSRUVPÅÒÌøÌÌÌ®ÌÆÅÅ 0001A0
D1E4D000 14D91359 D11359E9 1359F113 59E50259 D0D0D3D1 D2D1D5D1 D6D1E4D0 ÅÒÌøÌÌÌ®ÌÆÅÅY.ÌY.ÞY.ÒY.ÌY.\..ÅÒÌ 0001C0
880C880A AE8E12C1 83FCAEF3 FD308049 4F8DE259 AA3004D0 D0D3D1D2 D1D5D1D6 øÌÌÌ®ÌÆÅÅ.O˚YãŠOÌ¯O»µÛ=.é./Ù...| 0001E0
```

```
Dump of file SATURN:[PCCOMMON.DUMP.DLL]MOD.TMP;1 on 18-APR-1990 10:47:55.47
File ID (736,57,0)   End of file block 42 / Allocated 44

Virtual block number 31 (0000001F), 512 (0200) bytes

 89C02B03 F0168800 F0E90375 03F03639 FF2BF62B 56570000 14C8C307 5B5A0001 ..Z[.ûà...WV+-+.96Þ.u.ðÞ...Þ.+à. 000000
 0B0AC483 256A2726 9A07FA68 1EF676FF F876FF0C 6AF85689 F64689F2 5689F046 FÞ.V·.F-.V½j..v½.v-.h*..&'j%.á.. 000020
 FFF65EC4 0CEB47EA 75003F80 26F646FF F65EC400 BCE90376 7FFFFE81 461974C0 ât.F.±..v.Õ¥.á^-.F-&.?.uõG$.á^-. 000040
 8904C483 257926CE 9A046A50 01458DBA 75003F80 26F65E8B F475003F 8026F646 F-&.?.u¶.^-&.?.u¤.E.Pj..ö&y%.á.. 000060
 0BFC468B 6D74EE46 0BEC468B FE5689FC 468902C4 8325AF26 139A56EE 5689EC46 F$.VŸV..&£%.á..F•.V±.F$.FŸtm.F•. 000080
 8527269A 07FA681E F076FFF2 76FF0C6A 0A231689 0A21A3EE 5688EC46 8B6674C2 ôtf.F$.VŸÈl...#.j..v·.vÞ.h*..&'. 0000A0
 FFF05EC4 04EC4683 02578926 078926FE 5688FC46 8BEC5EC4 2C74C00B 0AC48321 l.á..ât,á^$.F•.V±&..&.W..F$.á^Þ. 0000C0
 F475003F 8026F046 FFF05EC4 EBEB0E74 C00A0788 26FC46FF FC5EC407 8A26F046 FÞ&..á^•.F•&...ât.Šõá^Þ.FÞ&.?.u¶ 0000E0
 8801FE4F 80260574 C30BC08C 065EC4EC 8B5590CB C95F5EA7 75003F80 26F05EC4 á^Þ&.?.ul^_èü.U.šá^..â.ût.&.0±.. 000100
 A3127400 25EB0875 000AFE3E 831E73FF F13D0646 8B575602 EC83EC8B 55CB5DE5 [)üW.$.$.VŴ.F.=þ.s..>±..u.Õ%.t.È 000120
 E58B5E5F 02C48325 2A2C1A9A 0676FF0B 75007BE8 05740018 E8157500 82E80AFE ±.Ò..u.Ò..t.Òx.u..v...,*%.á._^.[ 000140
 50028051 0E4F8D50 501EC033 FE5E89FE E3834306 5E880776 065E3900 F0B8CB5D ]ùEÞ.9^.v..^.C.D±.^±3â.PP.0.Ō.P 000160
 8B0008A3 DA8E0574 D20B0B02 A30B0016 87C28B38 74FFFA83 08C48326 4720C69A .ó-G&.á..*.t8.ò....È...@t..ÕÈ... 000180
 00000500 0AA30147 8D0002A3 0000A300 0AB80C47 89484800 08A3C033 D88EFE5E ^±.Ä3äÈ..HH.G.|..È..È...G.È..... 0001A0
 0AC8C309 8EC18CD2 0B059CE8 0B021E8E DB33064E 8BC08ED8 8CC31FD8 8C0006A3 È...Ä.û.Ä.â.N.3Ü....Ò...@.ė.\ûà. 0001C0
 C02B0674 FFFFC2F7 FA5689F8 468926FB 2E7C9A06 76FF006A 0876FF00 6A560000 ..Vj..v.j..v..|.«&.F½.V*%ö..t.+â 0001E0

Dump of file SATURN:[PCCOMMON.DUMP.DLL]MOD.TMP;1 on 18-APR-1990 10:47:55.47
File ID (736,57,0)   End of file block 42 / Allocated 44

Virtual block number 32 (00000020), 512 (0200) bytes

 FE76FF00 6A561274 D00BFE56 89FC4689 02C48327 1426139A 56F8768B 902FEB99 .Š/..v½V..&.'.á..F•.V±.Ât.Vj..v± 000000
 E30E4E8B 1E5657EC 8B5590C8 C95EFE56 8BFC468B 9007EB08 C4832673 1F669A50 P.f.s&.á.Š...F•.V±^èü.U.šWV..N.D 000020
 FF453A26 C933FF44 8AA6F30A 76C5FE8B CB03D9F7 AEF2C033 F78B067E C4D98B27 '.1á~..%3á·Ù%l.ù.±év.µ!.D.3è&:E. 000040
 85E8EF8B FF33078B 40C98030 C98058CB 5DE58B5F 5E1FC188 D1F74949 04740477 w.t.II%l.é.^_.[)ùX.è0.èa.m3..ÿò. 000060
 8B0ACE26 F7C78850 E0720205 E8F888E1 72020CE8 DB330ACE 1E8900AC E9DB3301 .3ÜŎ¯...ö.3ÜŎ..rÄ.¥ò..rÁP.û%&ö.. 000080
 3E89FC85 EBDB7300 D383F803 588E72D8 88C503C4 75D20B0A CE2EF7C3 8BEA8BF8 ½.ð.Û%.ö..@uá.é.ÄrƒX.½.Æ.sÅŠç•.> 0000A0
 037501AD E8910ACC A30AC8A3 0ACAA3C0 330AD216 890AD0A3 0AC60E89 CE030AC4 á..ö..ó.ÈÅ...@.3âÈò.Èà.Èä..ÒÜ.u. 0000C0
 74000AC1 3E801274 453C1C74 443C4E41 7401FDE8 DB3300E7 E89F75D8 0B80CD80 .ë..Üu.ÒÓ.3ÜÒ».tAN<Dt.<Et..>ê..t 0000E0
 9F016CE8 4600000A D006C70E C98003EB 0402C981 4E277502 742D3C06 742B3C31 1<+t.<-t.u'N.è..Š..è.ú.Å...FÒl.. 000100
 03741872 C1F70675 FF0B0AD0 3E8BDBF7 02759E58 40C98003 7502C5F6 008BE850 PÒ..-é.u..èaX.u.%Ü.>Å...u.%êr.t. 000120
 0394E80A D88E5156 507F0190 FF810AD2 3E2B0475 10C5F60A CC3E03FB 0330C980 .è0.«.>ä.-é.u.+>@......PVQƒÄ.Ò.. 000140
 D8F7D3F7 137480C5 F60AD61E 8B0AD4A1 38755E59 01ACE800 0AE206C6 0AC43E8B .>á.ó.ã..Ò¯.Y^u8Åâ...ø.-é.t.%Æ%Ä 000160
 CA3E830A E22E8A08 C9800376 070ACA3E 8380074D 8004747F F00645F7 000383F5 %.Æ.%E.Þ.t..M...>ò..v..è...ã..>ò 000180
 80ED770C CCFB8117 7200E4E8 0A0ACE06 C63FFFBB C301C980 C302CD80 0375000A ..u..ë.û.è.ûE.76.ö..ÒÒ.r..«ö.wÜ. 0001A0
 E8502872 00D6E8D7 8BDF8BEF 8BFF33C3 DFEBDE78 D803E3D1 E3D1C303 E3D102CD ë.1D.ù1D1D.ÄxßŠÒû3..ÿ.Ô.øÒø.r(PÒ 0001C0
 01CA8003 74C00A0D 7200BBE8 E5721999 FF8100D7 83000583 000383D0 0358008A ..X.Å.Æ..{..ø.....r1ÒE.r..ât..ò. 0001E0

Dump of file SATURN:[PCCOMMON.DUMP.DLL]MOD.TMP;1 on 18-APR-1990 10:47:55.47
File ID (736,57,0)   End of file block 42 / Allocated 44

Virtual block number 33 (00000021), 512 (0200) bytes

 09758000 FB810F74 80C5F617 7480C7F6 16750ACC 0608C508 C788EEEB 0ACC06FF ..ã.ŠŸ.ú.é..ã.u.-ú.t.-é.t..«..u. 000000
 FF811C74 C208C308 C508C788 0AD61E89 0AD41689 20C98010 C98006EB 0575D208 .@u.Š..è..è ..â...ø..ú.é.û.ôt... 000020
 0AD88FF7 8B56F6EB 002AE848 0678FF08 00408BF1 EB0ACC0E FF0025E8 09731999 ..ø.Ò%...ä.Šþ¡a...x.HÒ*.Š-V.%eÄ. 000040
 58E81358 D8135800 03000BE8 000EE8C2 8B535557 C35EAB92 AB96AB95 AB93AB92 .¨.¨.¨.¨^ûWUS.öÒ..Ò...ÄX.ÄX.ÒX 000060
 4A74004E E8C34E46 0175283C 0674203C 0874005E E8C3D7D1 D5D1D301 E2D1F813 .%1ã1Æ1{1øûÒ^.t.<-t.<+u.FNûÒN.tJ 000080
 3C2A7230 2C20742E 3C337400 37E81DEB 397D0ACE 063A072C 027E093C 4572302C ,OrE<.~.,.:.ö.)9$.Ò7.t3<.t ,Or*< 0000A0
 097510C5 F6F4EB20 CD80C3E4 320ACA06 FF08CD80 0ACC0EFF 0E7410C5 F6267709 .w&-é.t...ä..ë...ò.2öû.ë Š¶-é.u. 0000C0
 093CEE74 203C1074 000AC03E 80AC2373 0AC6363B C3F94EC9 EB10CD80 0AC806FF ..à..ë.ŠèN*û;66.s#¯.>â..t.< tŸ<. 0000E0
 AD95AD91 AD92AD57 C3C032C3 5F240277 7A3C0672 613CE274 003CE674 0A3CEA74 tõ<.tl<.tã<ar.<zw.$ û2âûWÜ.Û.Û.Û 000100
 D1D5D1D1 D1E2D100 0588DFD1 E8D1E7D1 3E7803FE 05AD4974 C208C108 C508F888 .½.é.ê.ôtlÜ.±.x>1Ò1Ō1ÒE..1ã11111 000120
 000780C6 13FE13EE 13CE13F5 8001FA81 F633030A D92243F0 75C8FED7 D0D001D7 ø1ÅÅø±ûwÞC"\.Æ3-.*..%.ö.Ÿ.±.ó.ø. 000140
 5FF78BF8 8BE88BC8 8BD88BC0 33010AE2 0E800FEB 000780F5 7FF03D0E 74FFF0A9 `Þ.t.=Þ.%.ø.Š...ã..3â.Ä.à.Ò.%.%_ 000160
 44010847 8B2EABF3 C033FD88 0008890A E4B0C3FF 0A064589 04758902 6D890089 ...m..u..E...û§ð.¿...»3âµ¨..G..Ď 000180
 0308C383 DF2B0928 5653C888 980404D8 F6C42AC4 2AE022C7 2B0004B8 0007BF08 .¢..|..+ú"Å*á*á-Ä....âSV+. Ô.û.. 0001A0
 E6E202C3 8302EE83 00045683 3E025611 3E004601 3E27F72E 048B06C6 83F72BF1 þ+%.ó....%'>.F.>.V.>.V...Ÿ. ¨.ã] 0001C0
 AD91AD97 ADD10A92 ADCD0AC8 0BADC80B AD91ADF5 870EED83 BC754F02 C5B35B5E ^[.é.Ou¥.Ü..%Ü.Ü.âÜ.à.ëÜ..1Ü.Û.Û 0001E0
```

```
Dump of file SATURN:[PCCOMMON.DUMP.DLL]MOD.TMP;1 on 18-APR-1990 10:47:55.47
File ID (736,57,0)    End of file block 42 / Allocated 44

Virtual block number 34 (00000022), 512 (0200) bytes

FA81ED33 D508EF23 0001BDD0 D1D3D1D1 D1D7D1E2 D1084CFF 0078C008 F588AD93 .Ù.%.àx..L.ïãïøïïï£ïÀ§..#ÿ.ï3Ù.* 000000
C3064489 045C8902 4C893C89 C508CDD1 086C01D5 D1C5130D 13CD13FD 13F58001 ..%.».ë.ï.éïï.ï.ïë.é.<.L..\..D.Ù 000020
0000000E 9C400000 00000000 0007C800 00000000 00000004 A0000000 00000000 ..................à.........à..... 000040
FFCFA605 00689DC5 ADA82870 859E0036 8E1BC98F 04000000 0018BEBC 20000000 ... ¥/......èè..6..çp+ Ùé.k.ïïù. 000060
CCCCCCCC CCCD0353 AA7EE8FB 9DF9DE8E 01AA93BA 47C980E9 8CE00005 C2781F49 ï.xöï.À.Ö.èGα.`..ß*.«Š-`S.ëëëëëë 000080
ABCC7711 8461CEFD FFF3D187 1758E219 652CFFFA A3D70A3D 70A3D70A FFFDCCCC ëë»..ȧp¤.æ£*.,e.ãX.ñïæ.»öa..wë¨ 0000A0
FF2CA87F EA27A539 E9A5FF96 CFB11EAD 453994BA FFCBE695 94BEC44D E15BFFE6 ï.[ÀMéƒ..ïù.α.9ÉÙ.Ýü..ÉÖ9É'ö.´.. 0000C0
DFF72B8A B80579FF 08283088 FCAEC031 4325637A 193AFE57 DD00467C 648CE4A1 ÀßVd|FÂïWs:.zcXC1âÙ=É0+..y.É.+%Ö 0000E0
D8080 65E 88EC8855 C3ECE858 5FFE7BE8 5753F573 EFD10074 FF080AC3 830AE883 .Š..ù...t.ïÿs%SWÒ(±_[ŠšùU.š.^..Ù 000100
750176E8 00058807 1E297500 3F830AF4 885756EC 8855C85D E58801FE 4F800474 t..O±..ï]ùU.šVWÉ¶..7.u)..ï..Òv.u 000120
0AFA3689 FFFEFE44 C704C683 000104C7 960AF6A3 0AF4A3FE 244024E8 99C03305 .3à.Šš@š±É¶.È-..ù....6.ùD±±..6*. 000140
7788F273 EEF983FE E180FA74 41000DE9 CB5DE588 5E5F0009 E8C08ED8 8C064E88 .N..À.àÒ..^.ï]ùÕÀ.At*.Àt.*Ÿs·.w 000160
4489F788 000205C2 03357401 A8ADF003 D0881573 C13B4843 7401A8FE 88ADFC02 .»Ù.±´.tCH;ès..À.ÞÙ´.t5.ö....%.D 000180
3B225A89 DA8CC688 FE4CFEF9 0305E805 8948C128 FE4C89F9 030C74FE 88E6E8FE ±Šï.±t..*.L±+èH..Š..*±L±.6.Ö¿Z"; 0001A0
F27401A8 ADF003FE 882574FF FE3D0208 0606C626 C3027F89 08021E8C 26057401 ït.&........ùšö....=±.tX.±.ÞÙ´.t· 0001C0
08084788 E6E8FE44 89F78800 0205C203 E27401A8 ADF00300 888C73C1 3848FE88 .±H;ès¥.À.ÞÙ´.tã.ö....%.D±Šï.G.. 0001E0

Dump of file SATURN:[PCCOMMON.DUMP.DLL]MOD.TMP;1 on 18-APR-1990 10:47:55.47
File ID (736,57,0)    End of file block 42 / Allocated 44

Virtual block number 35 (00000023), 512 (0200) bytes

88E83788 0AFE1E8E 260574C7 382CAD8F 088C1274 08060EFE 2615E8D8 8E0474C0 åt..ÀŠ.å±...t..ÀéÙ,;ùt.&..±..7ŠÉ 000000
4E960574 001DE8FE 4DFE0074 005FE898 40400124 0074C638 006BE8C0 33067788 .w.3àÖk.;ót.$.@@.Ö_.t.±M±Ö..t..N 000020
7401A8FE 458851C3 99C03302 47890788 0802A326 0474C138 2D01B9D8 8C98E84E NŠ..Àz.-;ët.åÉ.....G.3à.ùQ.É±´.t 000040
D2F70072 C2031572 C603C188 F575EAD1 04760804 1638267F FFBA4141 49C82B03 .+àIAAα..&;...v.ïõu%.é.ór..ör.%0 000060
03F088FE 88571874 001DE851 52C359C0 33E575EA D1D2F708 75000CE8 C62BC223 #ö+öÖ..u.%0ïõuï3àYùRÖÖ..t.W.±.Þ. 000080
00018850 52521ED2 335053C3 5A5958FE 55894AD7 28068806 7789FFFE FE44C7F2 ·ùD±±..w..ø+øJ.U±XYZùSP30.Rk ï.. 0000A0
000A7E83 065756EC 8855C302 08027458 5A1FFFFA 8308C483 26E02DC6 9A1F0650 P...6-Àå.å..*..Z(t..ùÙU.šVW.. .. 0000C0
0074F738 11744807 F8368B4C E8277200 57E80775 48064688 08568803 F88F3875 uß¢%..V..F.Hu.ÖW.r'ŠL.6%.Ht.;%t. 0000E0
21E899FF FF880675 D2080473 07F8FE81 04C68334 735E003E E8560E46 89024488 .D..F.Vò>.^s4.ö..±%.ø..øu.ï...Šï 000100
33038807 F8368902 5C891489 E675C085 F95B0000 FFFF9A50 C0335016 52C48850 P.éR.P3àP.....[*.åuï....\..6%..£3 000120
DA8B2CE8 F9F27507 F8FE8104 C6830C74 024C39F7 880E4E88 C85DE588 5E5F07C0 å._^.ï]ù.N..%9L.t..6..±%.u·*Š,.Ö 000140
75F7380E 75C08500 00FFFF9A 51531373 03F21E39 0675F738 C18ED388 26721C03 ..r£.£.è;%u.9.·..s.SQ......åuß;%u 000160
F7064688 08750A5E 88D8080C 5E880846 88EC8855 00C3D188 04879203 F2168904 ...·......ïù.U.š.F..^..À.^.u..F.% 000180
0C08CA5D E588D103 E3F70646 88C8030C 66F70646 88C888E3 F70008CA 5DE588E3 D.ï]ö..%D.à.F.%f..à.F.%D.ï.ï]ö.. 0001A0
07000222 6E010300 05000222 A6010300 0000042D 36000200 0000032D 86000200 ...Ñ-.......6-.......ï*.......n*... 0001C0
87000222 D9010500 2600022E 65010301 8500061F C2020300 2200022E 1A010300 .......*...ö.......e...&...ï*... 0001E0

Dump of file SATURN:[PCCOMMON.DUMP.DLL]MOD.TMP;1 on 18-APR-1990 10:47:55.47
File ID (736,57,0)    End of file block 42 / Allocated 44

Virtual block number 36 (00000024), 512 (0200) bytes

5C000221 53010300 58000221 66010300 40000221 F0010300 8800021F 99010500 ...........ÞI..M...fI..[...SI..\ 000000
54206E75 52205340 00000000 00000000 00000000 00000000 00000000 00000000 ........................MS Run-T 000020
38383931 20296328 20746867 69727970 6F43202D 20797261 7262694C 20656069 ime Library - Copyright (c) 1988 000040
15740048 16A80044 15EAFFFF 185A0011 70726F43 2074666F 736F7263 694D202C , Microsoft Corp..Z...ö.D.´.H.t. 000060
0A4E107A 0CE3107C 0CE51019 0C5F0DED 0AF30DEF 0AF50E12 0AFD0050 1684004C L...P.»...%.ÿ.æ.Ù_...ï.|.D.z.N. 000080
00000088 1CC80084 1CC80080 1CC8007C 1CC8080A 1CC80074 72717304 00000AA1 À....sqrt.à...à.|.Ã...à...à..... 0000A0
00000000 00000000 000080C0 E0F0F8FC FEFF0000 00007878 31364005 01010000 ......M61xx.....±»¾ÞÀÀ........... 0000C0
00000000 00000000 00000000 00000000 00000000 00000000 00000000 00000000 ................................ 0000E0
00000000 00000000 00000000 00000000 00000000 00000000 00000000 00000000 ................................ 000100
00000000 00000000 00000030 30302865 00203A02 0000007A 00000000 00790078 x.y.....z....: .e+000........... 000120
00000000 00000000 00000000 00000000 00000000 00000000 00000000 00000000 ................................ 000140
00000000 00000000 00000000 00000000 00000000 00000000 00000000 00000000 ................................ 000160
00000000 00000000 00000000 00000000 00000000 00000000 00000000 00000000 ................................ 000180
00000000 00000000 00000000 00000000 00000000 00000000 00000000 00000000 ................................ 0001A0
00000000 00000000 00000000 00000000 00000000 00000000 00000000 00000000 ................................ 0001C0
00000000 00000000 00000000 00000000 00000000 00000000 00000000 00000000 ................................ 0001E0
```

```
Dump of file SATURN:[PCCOMMON.DUMP.DLL]MOD.TMP;1 on 18-APR-1990 10:47:55.47
File ID (736,57,0)   End of file block 42 / Allocated 44

Virtual block number 37 (00000025), 512 (0200) bytes

00000000 00000000 00000000 00000000 00000000 00000000 00000000 00000000 ................................ 000000
00000000 00000000 00000000 00000000 00000000 00000000 00000000 00000000 ................................ 000020
00000000 00000000 00000000 00000000 00000000 00000000 00000000 00000000 ................................ 000040
00000000 00000000 00000000 00000000 00000000 00000000 00000000 00000000 ................................ 000060
00000000 00000000 00000000 00000000 00000000 00000000 00000000 00000000 ................................ 000080
011E0000 00000000 00000000 00000000 00000000 00000000 00000000 00000000 ................................ 0000A0
20202020 20202020 20202020 20282828 28282020 20202020 20202000 00000000 .....        (((((              0000C0
10848484 84848484 84848410 10101010 10101010 10101010 10104820 20202020      H........................... 0000E0
01010101 01010101 01010101 01010101 01010101 81818181 81811010 10101010 ................................ 000100
02020202 02020202 02020202 02020202 02020202 82828282 82821010 10101010 ................................ 000120
00000000 00000000 00000000 00000000 00000000 00000000 00000020 10101010 .... ........................... 000140
00000000 00000000 00000000 00000000 00000000 00000000 00000000 00000000 ................................ 000160
00000000 00000000 00000000 00000000 00000000 00000000 00000000 00000000 ................................ 000180
00000000 00000000 00000000 00000000 00000000 00000000 00000000 00000000 ................................ 0001A0
00000000 00000000 00000000 00000000 00000000 00000000 00000000 00000000 ..........................   ..... 0001C0
00003FE0 00000000 00000000 7FEFFFFF FFFFFFFF 00000000 00000000 00000000 ..................ÿ.......  Å?.. 0001E0

Dump of file SATURN:[PCCOMMON.DUMP.DLL]MOD.TMP;1 on 18-APR-1990 10:47:55.47
File ID (736,57,0)   End of file block 42 / Allocated 44

Virtual block number 38 (00000026), 512 (0200) bytes

00000000 00000000 00000000 00000000 00004000 00000000 00003FF0 00000000 ....Þ?.......@.................. 000000
00000000 00000000 00000000 00000000 00000000 FFFF0CF0 22890CF0 0CF00000 ..Þ.Þ..″Þ....................... 000020
00000000 00000000 00000000 00000000 00000000 00000000 00000000 00000000 ................................ 000040
00000000 00000000 00000000 00000000 00000000 00000000 00000000 00000000 ................................ 000060
00000000 00000000 00000000 00000000 00000000 00000000 00000000 00000000 ................................ 000080
00000000 00000000 00000000 00000000 00000000 00000000 00000000 00000000 ................................ 0000A0
00000000 00000000 00000000 00000000 00000000 00000000 00000000 00000000 ................................ 0000C0
00000000 00000000 00000000 00000000 00000000 00000000 00000000 00000000 ................................ 0000E0
00000000 00000000 00000000 00000000 00000000 00000000 00000000 00000000 ................................ 000100
00000000 00000000 00000000 00000000 00000000 00000000 00000000 00000000 ................................ 000120
00000000 00000000 00000000 00000000 00000000 00000000 00000000 00000000 ................................ 000140
00000000 00000000 00000000 00000000 00000000 00000000 00000000 00000000 ................................ 000160
00000000 00000000 00000000 00000000 00000000 00000000 00000000 00000000 ................................ 000180
00000000 00000000 00000000 00000000 00000000 00000000 00000000 00000000 ................................ 0001A0
00000000 00000000 00000000 00000000 00000000 00000000 00000000 00000000 ................................ 0001C0
00000000 00000000 00000000 00000000 00000000 00000000 00000000 00000000 ................................ 0001E0

Dump of file SATURN:[PCCOMMON.DUMP.DLL]MOD.TMP;1 on 18-APR-1990 10:47:55.47
File ID (736,57,0)   End of file block 42 / Allocated 44

Virtual block number 39 (00000027), 512 (0200) bytes

00000000 00000000 00000000 00000000 00000000 00000000 00000000 00000000 ................................ 000000
00000000 00000000 00000000 00000000 00000000 00000000 00000000 00000000 ................................ 000020
00000000 00000000 00000000 00000000 00000000 00000000 00000000 00000000 ................................ 000040
00000000 00000000 00000000 00000000 00000000 00000000 00000000 00000000 ................................ 000060
00000000 00000000 00000000 00000000 00000000 00000000 00000000 00000000 ................................ 000080
00000000 00000000 00000000 00000000 00000000 00000000 00000000 00000000 ................................ 0000A0
00000000 00000000 00000000 00000000 00000000 00000000 00000000 00000000 ................................ 0000C0
00000000 00000000 00000000 00000000 00000000 00000000 00000000 00000000 ................................ 0000E0
00000000 00000000 00000000 00000000 00000000 00000000 00000000 00000000 ................................ 000100
00000000 00000000 00000000 00000000 00000000 00000000 00000000 00000000 ................................ 000120
00000000 00000000 00000000 00000000 00000000 00000000 00000000 00000000 ................................ 000140
00000000 00000000 00000000 00000000 00000000 00000000 00000000 00000000 ................................ 000160
00000000 00000000 00000000 00000000 00000000 00000000 00000000 00000000 ................................ 000180
00000000 00000000 00000000 00000000 00000000 00000000 00000000 00000000 ................................ 0001A0
00000000 00000000 00000000 00000000 00000000 00000000 00000000 00000000 ................................ 0001C0
00000000 00000000 00000000 00000000 00000000 00000000 00000000 00000000 ................................ 0001E0
```

```
Dump of file SATURN:[PCCOMMON.DUMP.DLL]MOD.TMP;1 on 18-APR-1990 10:47:55.47
File ID (736,57,0)   End of file block 42 / Allocated 44

Virtual block number 40 (00000028), 512 (0200) bytes

 00000000 00000000 00000000 00000000 00000000 00000000 00000000 00000000 ................................ 000000
 00000000 00000000 00304F46 4E495F45 4C49465F 435F03F8 00000000 00000000 ........½._C_FILE_INFO=......... 000020
 00000000 00000000 00000000 00000000 00008181 81010000 00010000 00000000 ................................ 000040
 00000000 00000000 00000000 00000000 00000000 00000000 00000000 00000000 ................................ 000060
 00000000 00000000 00000000 00000000 00000000 00000000 00000000 00000000 ................................ 000080
 00000000 00000000 00000000 00000000 00000000 00000000 00000000 00000000 ................................ 0000A0
 00000000 00000000 00000000 00000000 00000000 00000000 00000000 00000000 ................................ 0000C0
 00000000 00000000 00000000 00000000 00000000 00000000 00000000 00000000 ................................ 0000E0
 00000000 00000000 00000000 00000000 00000000 00000000 00000000 00000000 ................................ 000100
 00000000 00000000 00000000 00000000 00000000 00000000 00000000 00000000 ................................ 000120
 0A0A0A0A 0A0A0A0A 0A0A0A0A 0A0A0A0A 0A0A0A0A 0A000000 00000000 00000000 ................................ 000140
 0A0A0A0A 0A0A0A0A 0A0A0A0A 0A0A0A0A 0A0A0A0A 0A0A0A0A 0A0A0A0A 0A0A0A0A ................................ 000160
 0A0A0A0A 0A0A0A0A 0A0A0A0A 0A0A0A0A 0A0A0A0A 0A0A0A0A 0A0A0A0A 0A0A0A0A ................................ 000180
 0A0A0A0A 0A0A0A0A 0A0A0A0A 0A0A0A0A 0A0A0A0A 0A0A0A0A 0A0A0A0A 0A0A0A0A ................................ 0001A0
 0A0A0A0A 0A0A0A0A 0A0A0A0A 0A0A0A0A 0A0A0A0A 0A0A0A0A 0A0A0A0A 0A0A0A0A ................................ 0001C0
 0A0A0A0A 0A0A0A0A 0A0A0A0A 0A0A0A0A 0A0A0A0A 0A0A0A0A 0A0A0A0A 0A0A0A0A ................................ 0001E0

Dump of file SATURN:[PCCOMMON.DUMP.DLL]MOD.TMP;1 on 18-APR-1990 10:47:55.47
File ID (736,57,0)   End of file block 42 / Allocated 44

Virtual block number 41 (00000029), 512 (0200) bytes

 0A0A0A0A 0A0A0A0A 0A0A0A0A 0A0A0A0A 0A0A0A0A 0A0A0A0A 0A0A0A0A 0A0A0A0A ................................ 000000
 0A0A0A0A 0A0A0A0A 0A0A0A0A 0A0A0A0A 0A0A0A0A 0A0A0A0A 0A0A0A0A 0A0A0A0A ................................ 000020
 00000000 00000000 00000000 00000000 00000000 000A0A0A 0A0A0A0A 0A0A0A0A ................................ 000040
 00000000 00000000 00000000 00000000 00000000 00000000 00000000 00000000 ................................ 000060
 00000000 00000000 00000000 00000000 00000000 00000000 00000000 00000000 ................................ 000080
 00000000 00000000 00000000 00000000 00000000 00000000 00000000 00000000 ................................ 0000A0
 00000000 00000000 00000000 00000000 00000000 00000000 00000000 00000000 ................................ 0000C0
 00000000 00000000 00000000 00000000 00000000 00000000 00000000 00000000 ................................ 0000E0
 00000000 00000000 00000000 00000000 00000000 00000000 00000000 00000000 ................................ 000100
 0B1C201C 00540010 00002000 00000000 00000000 00000000 00000000 00000000 ..................... ....T.. .. 000120
 3C3C0000 00000000 00004014 00000000 00000814 062D0000 0000008C 1BF00000 ..Þ.......-..........@........<< 000140
 746E696F 702D676E 6974616F 6C66202D 0A0D4854 414D203A 00FD3E3E 4753404E NMSG>>».: MATH..- floating-point 000160
 79622065 64697669 64006700 0A0D6469 6C61766E 69006500 203A726F 72726520  error: .e.invalid...g.divide by 000180
 6C667265 766F2068 63617473 006E000A 0D776F6C 66726576 6F006800 0A0D3020  0...h.overflow...n.stack overfl 0001A0
 0078000A 0D646574 6172656E 65672079 6C746963 696C7078 65007000 0A0D776F ow...p.explicitly generated...x. 0001C0
 007A000A 0D726F72 72652047 4E495300 79000A0D 726F7272 65204E49 41404F44 DOMAIN error...y.SING error...z. 0001E0

Dump of file SATURN:[PCCOMMON.DUMP.DLL]MOD.TMP;1 on 18-APR-1990 10:47:55.47
File ID (736,57,0)   End of file block 42 / Allocated 44

Virtual block number 42 (0000002A), 512 (0200) bytes

 6F206863 61747320 2D0A0030 30303652 0000000A 0D726F72 72652053 534F4C54 TLOSS error.....R6000..- stack o 000000
 76696420 72656765 746E6920 2D0A0033 30303652 0003000A 0D776F6C 66726576 verflow.....R6003..- integer div 000020
 6867756F 6E652074 6F6E202D 0A0D3830 30365200 08000A00 30207962 20656469 ide by 0.....R6008..- not enough 000040
 0A0D3930 30365200 09000A0D 73746E65 6D756772 6120726F 66206563 61707320  space for arguments.....R6009.. 000060
 656D6E6F 7269766E 6520726F 66206563 61707320 6867756F 6E652074 6F6E202D - not enough space for environme 000080
 36520002 0020726F 72726520 656D6974 2D6E7572 00FF000A 0D00FC00 0A00746E nt...*......run-time error ...R6 0000A0
 64656461 6F6C2074 6F6E2074 6E696F70 20676E69 74616F6C 66202D0A 00323030 002..- floating point not loaded 0000C0
 00000000 00000000 00000000 00000000 00000000 00000000 000000FF FF000A00 ................................ 0000E0
 00000000 00000403 FA000200 00000308 0E000200 02FF0000 00000000 00000000 ......................'......... 000100
 00000000 00000000 00000000 00000000 00000000 00000000 00000000 00000000 ................................ 000120
 00000000 00000000 00000000 00000000 00000000 00000000 00000000 00000000 ................................ 000140
 00000000 00000000 00000000 00000000 00000000 00000000 00000000 00000000 ................................ 000160
 00000000 00000000 00000000 00000000 00000000 00000000 00000000 00000000 ................................ 000180
 00000000 00000000 00000000 00000000 00000000 00000000 00000000 00000000 ................................ 0001A0
 00000000 00000000 00000000 00000000 00000000 00000000 00000000 00000000 ................................ 0001C0
 00000000 00000000 00000000 00000000 00000000 00000000 00000000 00000000 ................................ 0001E0
```

```
Dump of file SATURN:[PCCOMMON.DUMP.DLL]METHOD.TMP;1 on 18-APR-1990 10:47:52.68
File ID (731,15,0)   End of file block 13 / Allocated 16

Virtual block number 1 (00000001), 512 (0200) bytes

 00000000 00000040 00000000 00000088 0000FFFF 00000004 00000000 01825A4D MZ..............|.......a....... 000000
 00000080 00000000 00000000 00000000 00000000 00000000 00000000 00000000 ................................ 000020
 6F6E6E61 63206061 72676F72 70207369 685421CD 4C01B821 CD09B400 0EBA1F0E ..o..Ç.ël|.LëlThis program canno 000040
 00000000 00000024 0A0D002E 65646F6D 20534F44 206E6920 6E757220 65622074 t be run in DOS mode....$....... 000060
 00020003 00000000 00000000 00000800 0003800A 7688E93B 002801BE 0505454E NE..ƒ.(.;Õ.v.................... 000080
 00000000 00000000 00010000 00040000 00000266 01580154 00580058 0040000E ..a.X.X.T.X.f................... 0000A0
 00444F48 54454D06 00080E01 00000000 00480F00 00480193 166C0F00 166C0028 (.l...l...H...H..........METHOD. 0000C0
 4C435245 54534947 45524854 454D5F12 00014753 4D444E45 53485445 4D5F0C00 .._METHSENDMSG..._METHREGISTERCL 0000E0
 544E4154 534E4948 5445405F 10000354 534E4954 45474854 454D0800 02535341 ASS...METHGETINST..._METHINSTANT 000100
 454D5F10 00054154 41445353 414C4359 52455551 4854454D 5F130004 45544149 IATE..._METHQUERYCLASSDATA..._ME 000120
 4D544E45 52415044 4E455348 5445405F 12000647 534D5453 4E49444E 45534854 THSENDINSTMSG..._METHSENDPARENTM 000140
 5445405F 18000853 53414C43 54534E49 45564952 45444854 454D5F14 00074753 SG..._METHDERIVEINSTCLASS..._MET 000160
 4E494544 4854454D 5F120009 47534D54 4E455241 50454C47 4E495344 4E455348 HSENDSINGLEPARENTMSG..._METHDEIN 000180
 0008534E 464C4D44 52455453 49474552 4854454D 12000A45 54414954 4E415453 STANTIATE...METHREGISTERDMLFNS.. 0001A0
 4C414353 4F440800 000A0001 00000C53 53414C43 45564952 45444854 454D5F10 ._METHDERIVECLASS.........DOSCAL 0001C0
 4C4C4145 52414853 4D454D12 50414548 45544145 52434D45 4D0D4D45 4D03534C LS.MEM.MEMCREATEHEAP.MEMSHAREALL 0001E0

Dump of file SATURN:[PCCOMMON.DUMP.DLL]METHOD.TMP;1 on 18-APR-1990 10:47:52.68
File ID (731,15,0)   End of file block 13 / Allocated 16

Virtual block number 2 (00000002), 512 (0200) bytes

 4148534D 454D0F4B 434F4C42 45455246 45524148 534D454D 1148434F 4C42434F OCBLOCK.MEMSHAREFREEBLOCK.MEMSHA 000000
 010C4449 52454E57 4F595245 55514552 4148534D 454D1454 5245564E 4F434552 RECONVERT.MEMSHAREQUERYOWNERID.. 000020
 D20300E2 0313C903 15ED0312 46031154 030F6B03 0C4E0315 4703079E 03102403 .$.....G..N..k..T..F..Ú..è..ã..@ 000040
 00000000 00000000 00000000 0000004C 4C442E64 6F687465 6D0A0000 156E030A ..n....method.DLL............... 000060
 00FFFF9A 0006681E 016A001D E9037400 00063E83 D88EFFFF B81E5657 000006C8 à...WV.|...Ä.>...t.Õ..j..h...... 000080
 FF0A76FF 0676FF1D 6A000636 FF0065E9 FA468800 06E90375 00FA7E83 FA468900 ..F*.-*.u.Õ...F*Õe..6..j..v..v.. 0000A0
 0277FF26 085EC400 3FE9FA46 880006E9 037500FA 7E83FA46 890000FF FF9A0876 v.......F*.-*.u.Õ...F*Õ?.á^.&.w. 0000C0
 FF0019E9 FA468800 06E90375 00FA7E83 FA468900 00FFFF9A 5016FC46 8D37FF26 &.7.F=.P......F*.-*.u.Õ...F*Õ... 0000E0
 0002C8C8 C95F5E1F 0000E900 00B808C4 83FFFF00 009AFC76 FFFE76FF 006A0676 v.j..v±.v=......é.|..Õ...^_èùà.. 000100
 46890000 001D9A00 06681E01 6A001DE9 03740000 063E8308 8E000888 1E565700 .WV.|...Ä.>...t.Õ..j..h........F 000120
 5E1F0000 E90000FF FF9A0676 FF0876FF 000EE9FE 46880006 E9037500 FE7E83FE ±.-±.u.Õ...F±Õ...v..v......Õ...^ 000140
 0000BA00 00B80009 E9037306 46390004 A1D88E00 A5B81E56 5700000A C8CBC95F _èùà...WV.|E..ÄÀ..9F.s.Õ..|..¤.. 000160
 20E90374 00F67E83 F6468900 0001609A 5016F846 8D000036 FF000236 FF007FE9 Õ...6...6...F½.P.'....F-.--.t.Õ  000180
 09E90374 02400826 008826F8 76C402E3 C1065E88 0015E903 75FA4608 F8468800 ..F½.F*u.Õ...^.èD.áv½&..&.a.t.Õ. 0001A0
 9A5016FC 468D30FF 260270FF 26F876C4 02E3C106 5E880038 E900008A 00008800 .|..¤..Õ8..^.èD.áv½&.p.&.0.F=.P. 0001C0
 E9FE5688 FC468800 09E90000 BA000088 0009E903 7500F67E 83F64689 00000069 i....F-.--.u.Õ..|..¤..Õ...F=.V±Õ 0001E0

Dump of file SATURN:[PCCOMMON.DUMP.DLL]METHOD.TMP;1 on 18-APR-1990 10:47:52.68
File ID (731,15,0)   End of file block 13 / Allocated 16

Virtual block number 3 (00000003), 512 (0200) bytes

 04A10137 E9037306 46390004 A1D88E00 EBB81E56 5700001A C8CBC95F 5E1F0000 ...^_èùà...WV.|Š..ÄÀ..9F.s.Õ7.À. 000000
 C483FFFF 00009A50 02E0C100 04A15016 E6468000 04A30014 05064688 FA468900 ..F*.F....È...Fl.PÀ..èÀ.P......á 000020
 0F9A5016 F24680E6 76FFE876 FF01CFE9 F0468800 06E90375 00F07E83 F0468906 ..Fþ.-þ.u.Õ...FþÕÜ..vÒ.vl.F·.P.. 000040
 27E90375 0002060B 0000A101 ADE9F046 880006E9 037500F0 7E83F046 89000002 ....Fþ.-þ.u.Õ...FþÕÜ.À......u.Õ' 000060
 880006E9 037500F0 7E83F046 89000001 119A5016 EC468000 0036FF00 0236FF00 ..6...6...F&.P......Fþ.-þ.u.Õ... 000080
 39FA4688 EA46FF00 03E90000 EA46C7EC 4689EE46 89000088 0009E901 7DE9F046 FþÕ).Õ..|...FŸ.FšúFõ..Õ...Fõ.F*9 0000A0
 F276C402 E3C1EA5E 88025088 26008826 EC76C402 E3C1EA5E 880023E9 0372EA46 Fõr.Õ#..^õèD.áv$&..&.P..^õèD.áv· 0000C0
 16E90372 EA463900 04A1EA46 FF0003E9 EA4689FA 4688FFCF E9025089 26008926 &..&.P.ÕÜ..F*.FõÕ...FõÀ..9Fõr.Õ. 0000E0
 03750002 06080000 A1FFDCE9 00892602 40892600 0088F276 C402E3C1 EA5E8800 ..^õèD.áv·|..&.a.&..ÕÉ.À......u. 000100
 880006E9 037500F0 7E83F046 8904C483 018C0090 9A000036 FF000236 FF0022E9 Õ"..6...6.....¥..á..Fþ.-þ.u.Õ... 000120
 F2468000 0036FF00 0236FF00 24E90002 16890000 A3E85688 E6468800 0DE9F046 FþÕÏ..Fl.VÒÈ......Õ$..6...6...F· 000140
 C402E3C1 065E8800 A9E9F046 880006E9 037500F0 7E83F046 89000003 239A5016 .P.#....Fþ.-þ.u.Õ...FþÕ`..^.èD.á 000160
 FF0A76FF F676FFF8 76FF0014 E9037500 08F85689 F6468902 50882600 8826F276 v·&..&.P..F-.V½.Àu.Õ...v½.v-.v.. 000180
 00F07E83 F0468906 C48302AE 00009A14 6A5016F6 46800078 E9000003 609A0876 v..m...Õx..F-.Pj....Û..á..Fþ.-þ. 0001A0
 50892600 8926F856 88F64688 F276C402 E3C1065E 880057E9 F0468800 06E90375 u.Õ...FþÕW..^.èD.áv·.F-.V½&..&.P 0001C0
 F0468800 06E90375 00F07E83 F0468900 0001DF9A 5016FC46 8DF676FF F876FF02 ..v½.v-.F=.P.Õ....Fþ.-þ.u.Õ...Fþ 0001E0
```

Dump of file SATURN:[PCCOMMON.DUMP.DLL]METHOD.TMP;1 on 18-APR-1990 10:47:52.68
File ID (731,15,0)   End of file block 13 / Allocated 16

Virtual block number 4 (00000004), 512 (0200) bytes

```
E9000088 02578926 078926FE 5688FC46 88085EC4 07892606 4688FC5E C4001FE9 Õ..á^=.F.&..á^..F•.V±&..&.W.|..Õ 000000
E903760E 4739260A 4688065E C4D88E01 8F881E56 5700001C C8C8C95F 5E1F0000 ...^_èùà...WV.|...Äá^..F.&9G.v.Õ 000020
16E4468D FE46890E 47892600 14050A46 88065EC4 F846890E 478B2606 5EC40154 T.á^.&.G..F½á^..F....&.G..F±.FÕ. 000040
E9EC4688 0006E903 7500EC7E 83EC4689 06C48304 E800009A 5002E0C1 FE468850 P.F±èÂ.P...Š..á..F&.-&.u.Õ...FšÕ 000060
46880006 E9037500 EC7E83EC 46890000 04459A50 16EE4680 E476FFE6 76FF01EC &..vl.vÕ.FŸ.P.E....F&.-&.u.Õ...F 000080
8D1077FF 261277FF 26065EC4 002AE903 75124708 26104788 26065EC4 01CAE9EC &Õò.á^.&.G.&.G.u.Õ*.á^.&.w.&.w.. 0000A0
00880009 E90193E9 EC468800 06E90375 00EC7E83 EC468900 0002E39A 5016E846 FÕ.P.D....F&.-&.u.Õ...FšÕ..Õ..|. 0000C0
F65E8800 23E90372 F64639F8 4688F646 FF0003E9 0000F646 C7E84689 EA468900 ..FÕ.FÕüF-..Õ...F-.F¥9F-r.Õ#..^- 0000E0
FFCFE902 50892600 8926EE76 C402E3C1 F65E8802 50882600 8826E876 C402E3C1 èD.ávÕ&..&.P..^-èD.ávŸ&..&.P.ÕÙ. 000100
EE76C402 E3C1F65E 880016E9 0372F646 39FE4688 F646FF00 03E9F646 89F84688 .F%.F-Õ...F-.F±9F-r.Õ...^-èD.ávŸ 000120
065EC400 25E90375 12470826 10478826 065EC4FF DCE90089 26024089 26000088 |..&.a.&..ÕE.á^.&.G.&.G.u.ÕX.á^. 000140
E9EC4688 0006E903 7500EC7E 83EC4689 04C48303 3400909A 1077FF26 1277FF26 &.w.&.w....4..á..F&.-&.u.Õ...FšÕ 000160
77FF2612 77FF2606 5EC40027 E9125789 26104789 26E65688 E4468806 5EC400EC &.á^..FÕ.Vl&.G.&.W.Õ'.á^.&.w.&.w 000180
0A5E8800 81E9EC46 880006E9 037500EC 7E83EC46 89000004 0E9A5016 EE468D10 ..FŸ.P......F&.-&.u.Õ...FšÕŸ..^. 0001A0
008EE999 AD880006 E9037500 08F45689 F2468902 50882600 8826EE76 C402E3C1 èD.ávŸ&..&.P..F·.V¶.Âu.Õ..|Ù.Õ.. 0001C0
83EC4689 06C48303 E800009A 50001005 E0D1C103 E0D1C888 0C468850 16F2468D .F·.P.F..àÍÁ.èÍÁ...P...Š..á..Fš. 0001E0
```

Dump of file SATURN:[PCCOMMON.DUMP.DLL]METHOD.TMP;1 on 18-APR-1990 10:47:52.68
File ID (731,15,0)   End of file block 13 / Allocated 16

Virtual block number 5 (00000005), 512 (0200) bytes

```
008926F4 5688F246 88EE76C4 02E3C10A 5E880060 E9EC4688 0006E903 7500EC7E ~&.u.Õ...FšÕ'..^.èD.ávŸ.F·.V¶&.. 000000
0006E903 7500EC7E 83EC4689 00000527 9A5016FA 4680F276 FFF476FF 02508926 &.P..v¶.v·.F•.P.'....F&.-&.u.Õ.. 000020
5688FA46 880E5EC4 00010247 C726FA5E C4078926 0A4688FA 5EC40028 E9EC4688 .F&Õ(.á^•.F.&..á^•&ùG...á^..F•.V 000040
C4D88E03 AF881E56 5700000C C8C8C95F 5E1F0000 E9000088 02578926 078926FC =&..&.W.|..Õ...^_èùà...WV.|E..Äá 000060
FF261277 FF26065E C40099E9 0000BA00 00880009 E903760E 4739260A 4688065E ^..F.&9G.v.Õ..|..¤..Õ..á^.&.w.&. 000080
0003E900 01880006 E90374FA 4608F846 88F64689 0000068E 9A5016F8 46801077 w..F½.P......F-.F½.F•t.Õ..|..Õ.. 0000A0
03E90001 880006E9 03740240 0826008B 26F44689 F876C402 E3C10A5E 88000088 |...^.èD.áv½.F¶&..&.a.t.Õ..|..Õ. 0000C0
76C402E3 C10A5E88 0038E900 008A0000 880009E9 0375F646 08F44608 00008800 .|...F¶.F-u.Õ._|..¤..ÕB..^.èD.áv 0000E0
00880009 E9037500 F67E83F6 46890000 05809A50 16FC4680 30FF2602 70FF26F8 ½&.p.&.0.F•.P.¯....F-.~-.u.Õ..|. 000100
8E05F888 1E565700 0008C8C8 C95F5E1F 0000E9FE 5688FC46 880009E9 0000BA00 .¤..Õ...F•.V±Õ...^_èùà...WV.|«.. 000120
F8468800 06E90375 00F87E83 F8468900 00FFFF9A 5016FE46 800A76FF 0C76FFD8 Ä.v..v..F±.P......F½.-½.u.Õ...F½ 000140
83F84689 00000628 9A5016FA 46800A76 FF0C76FF 0034E903 741DFE7E 80005CE9 Õ\..-±.t.Õ4..v..v..F•.P.(....F½. 000160
001FE900 00880789 260E5EC4 078826FA 5EC40031 E9F84688 0006E903 7500F87E ~½.u.Õ...F¥Õ1.á^•&..á^.&..|..Õ.. 000180
1F0000E9 0CC4830A 5FFF2606 5EC40A76 FF0C76FF 0E76FF10 76FF1276 FF1476FF .v..v..v..v..v..v.á^.&._..á.Õ... 0001A0
000006F8 9A5016FC 46800A76 FF0C76FF D88E0680 881E5657 000004C8 C8C95F5E ^_èùà...WV.|§..Ä.v..v..F•.P.½... 0001C0
5FFF2606 5EC40A76 FF0C76FF 0E76FF10 76FF1276 FF1476FF 001FE903 7400003D =¯.t.Õ...v..v..v..v..v..v.á^.&._ 0001E0
```

Dump of file SATURN:[PCCOMMON.DUMP.DLL]METHOD.TMP;1 on 18-APR-1990 10:47:52.68
File ID (731,15,0)   End of file block 13 / Allocated 16

Virtual block number 6 (00000006), 512 (0200) bytes

```
10C8C8C9 5F5E1F00 00E90000 88078926 0E5EC407 88260A5E C40012E9 0CC4830A ..á.Õ..á^.&..á^.&..|..Õ...^_ ¯à. 000000
F07E83F0 468906C4 8307E001 879A0676 FF5016F4 4680088E 074C881E 56570000 ..WV.|L..Ä.F¶.P.v....Â..á..Fþ.-þ 000020
03A79AF4 76FFF676 FF0876FF 1676FF50 16F8468D 0000E9F0 46880006 E9037500 .u.Õ...FþÕÂ..F½.P.v..v..v~.v¶.Ï. 000040
4789260A 4688F85E C400A5E9 F0468800 06E90375 00F07E83 F046890C C4830577 w..á..Fþ.-þ.u.Õ...FþÕE.á^½.F.&.G 000060
88F85EC4 08478926 104688F8 5EC40657 89260447 89260E56 880C4688 F85EC402 .á^½.F...V.&.G.&.W.á^½.F.&.G.á^½. 000080
FE568CFC 46891846 800E4789 26164688 F85EC40C 5789260A 47892614 56881246 F..V.&.G.&.W.á^½.F.&.G..F..F•.V± 0000A0
478826FC 5EC402FC 46830037 E90372F2 46391646 88F246FF 0003E900 00F246C7 úF·..Õ...F·.F.9F·r.Õ7..F•.á^•&.G 0000C0
C406F276 68FE5788 26FC4788 26FC5EC4 04FC4683 10408926 F85EC406 F27668FE ±kv·.á^½&.a..F•.á^•&.G•&.V±kv·.á 0000E0
C95F5E1F 0000E900 0088FC46 89FE4689 000088FF 88E91450 89261240 8926F85E ^½&.a.&.P.ÕE.|...F±.F•|..Õ...^_è 000100
46C70129 E9000088 0006E903 74104608 0E4688D8 8E07A688 1E565700 0014C8C8 ùà...WV.|Ï..Ä.F..F.t.Õ..|..Õ).ÜF 000120
8826F85E C40044E9 0375D008 FA5689F8 46890C57 88260A47 8826165E C499AEEC &0.á^.&.G.&.W..F½.V•.Âu.ÕD.á^½&. 000140
FF0676FF 0876FF00 1FE90374 0739260C 4688F85E C40034E9 03750447 08260247 G.&.G.u.Õ4.á^½.F.&9.t.Õ...v..v.. 000160
83FFBCE9 06F84683 00CFE90C C483025F FF26F85E C41276FF 1476FF0E 76FF1076 v..v..v..v.á^½&._..á.ÕÜ..F½.ÕV.. 000180
89F44689 00100518 56881646 880000F2 46C70089 E9EC4688 0006E903 74000A7E -..t.Õ...FšÕ¿.úF¯...F..V.....F¶. 0001A0
FF26F45E C40086E9 03770E47 3926F246 88165EC4 06F44683 F246FF00 07E9F656 V-Õ...F·.F¶.á^..F·&9G.w.Õ..á^¶&. 0001C0
0006E903 74F04608 EE4688F0 5689EE46 8906C483 09C905F3 9A1A76FF 1C76FF37 7.v..v..µ.è..á..FŸ.Vþ.FŸ.Fþt.Õ.. 0001E0
```

Dump of file SATURN:[PCCOMMON.DUMP.DLL]METHOD.TMP;1 on 18-APR-1990 10:47:52.68
File ID (731,15,0)   End of file block 13 / Allocated 16

Virtual block number 7 (00000007), 512 (0200) bytes

```
89FC4689 08C48302 5FFF26F4 5EC40E76 FF1076FF 0676FF08 76FF0061 E999A988 |`.Õa..v..v..v..v.á^¶&._..á..F=. 000000
0A76FF0C 76FFFC76 FFFE76FF 1276FF14 76FFEE76 FFF076FF 1A76FF1C 76FFFE56 V±.v..v..vÞ.vŸ.v..v..v±.v=.v..v. 000020
64E90009 E9EC4688 0006E903 7599AEEC 7E81EC46 8907B508 A19A0676 FF0876FF .v..v..À.ç..F$.-$Ü.u.Õ...F$Õ..Õd 000040
7F83260A 5EC4D88E 08A9881E 56570000 14C80018 CAC95F5E 1F0000E9 EC4688FF ..F$Õ...^_èò..à...WV.|`..Ää^.&.. 000060
C7078926 F85EC407 88260A5E C4FA5689 F8468910 56880E46 880018E9 03740102 ..t.Õ...F¯.V..F½.V*á^.&..á^½&..ú 000080
0A5EC406 F44683F2 46FF0007 E9F65689 F4468900 10050C56 880A4688 0000F246 F·...F..V.....F¶.V-Õ...F·.F¶.á^. 0000A0
06C4830A AE05F39A 0676FF08 76FF37FF 26F45EC4 007BE903 770E4739 26F24688 .F·&9G.w.Õ(.á^¶&.7.v..v..µ.Ü..á. 0000C0
1076FF12 76FF1476 FF0056E9 99A98800 06E90374 F0460BEE 4688F056 89EE4689 .FŸ.VÞ.FŸ.FÞt.Õ..|`.ÕV..v..v..v. 0000E0
FFFC76FF FE76FF12 76FF1476 FFFE5689 FC468908 C483025F FF26F45E C40E76FF .v.á^¶&._..á..F=.V±.v..v..v±.v=. 000100
46880006 E9037500 0030EC46 8910C483 096A09EE 9A0676FF 0876FFEE 76FFF076 vÞ.vŸ.v..v..Ÿ.j..á..F$=..u.Õ...F 000120
4680D88E 09F6881E 56570000 06C8CBC9 5F5E1F00 00E90000 B8FF6FE9 0009E9EC $Õ..Õo.|..Õ...^_èùà...WV.|-..Ã.F 000140
0039E9FA 46880006 E9037500 FA7E83FA 468906C4 830A5801 879A1276 FF5016FC =.P.v....[..á..F*.-*.u.Õ...F*Õ9. 000160
89260647 89260C56 880A4688 FC5EC404 57892602 47892610 56880E46 88FC5EC4 á^=.F..V.&.G.&.W.á^=.F..V.&.G.&. 000180
000ECAC9 5F5E1F00 00E90000 B80C5789 260A4789 2608568B 064688FC 5EC40857 W.á^=.F..V.&.G.&.W.|..Õ...^_èò.. 0001A0
FA5689F8 46890010 050C5688 0A468800 00F646C7 D88E0ADA B81E5657 000010C8 à...WV.|Ö..ÁÚF-...F..V.....F½.V* 0001C0
FF37FF26 F85EC400 91E90377 0E473926 F646880A 5EC406F8 4683F646 FF0007E9 Õ...F-.F½.á^..F-&9G.w.Õ..á^½&.7. 0001E0
```

Dump of file SATURN:[PCCOMMON.DUMP.DLL]METHOD.TMP;1 on 18-APR-1990 10:47:52.68
File ID (731,15,0)   End of file block 13 / Allocated 16

Virtual block number 8 (00000008), 512 (0200) bytes

```
A9880006 E90374F4 460BF246 88F45689 F2468906 C4830BE1 05F39A06 76FF0876 v..v..µ.Ã..á..F·.V¶.F·.F¶t.Õ..|` 000000
FE5689FC 468908C4 83025FFF 26F85EC4 1276FF14 76FF1676 FF1876FF 00A5E999 .ÕE..v..v..v..v.á^½&._..á..F=.V± 000020
409A0676 FF0876FF F276FFF4 76FF0E76 FF1076FF FC76FFFE 76FF1676 FF1876FF .v..v..v±.v=.v..v..v¶.v·.v..v..a 000040
06E90375 00F07E83 0000F046 C70005E9 037499AE F07E81F0 468914C4 830C2F08 ./..á..FÞ.-ÞÛ.t.Õ..úFÞ...-Þ.u.Õ. 000060
FF1476FF 0E76FF10 76FF0A76 FF0C76FF 0676FF08 76FFFF59 E90042E9 F0468800 ..FÞÕ8.ÕY..v..v..v..v..v..v..v.. 000080
46C70005 E9037499 AEF07E81 F046890A E908A19A 1676FF18 76FF006A 016A1276 v.j.j..v..v..À.Õ..FÞ.-ÞÛ.t.Õ..úF 0000A0
00E39A06 76FFD88E 0848881E 56570000 16C8CBC9 5F5E1F00 00E9F046 880000F0 Þ...FÞÕ...^_èùà...WV.|H..Ã.v..D. 0000C0
FF0876FF 0161E999 A8880006 E90374F2 460BF046 88F25689 F0468902 C4830C88 ...á..FÞ.V·¯FÞ.F·t.Õ..|´.Õa..v.. 0000E0
A9880006 E90374F6 460BF446 88F65689 F4468906 C4830CC0 05F39AF0 76FFF276 v·.vÞ.µ.à..á..F¶.V-.F¶.F-  Õ..|` 000100
00009A08 77FF26F4 5EC45016 F8468D00 7DE90374 01027F83 26F45EC4 0139E999 .Õ9.á^¶&....t.Õ)..F½.Pá^¶&  ‹.... 000120
EA4680F8 76FFFA76 FF0106E9 EE468800 06E90375 00EE7E83 EE468906 C4830D08 ...á..FŸ.~Ÿ.u.Õ...FŸÕ...v*.v..Fõ 000140
FFF676FF EA76FFEC 76FFFC76 FFFE76FF FE568CFC 46890E46 8D000007 5C9A5016 .P.\....F..F=.V±.v±.v=.v$.võ.v-. 000160
00EE7E83 FC4689FE 46890000 B8EE4689 10C48300 C609EE9A F076FFF2 76FFF476 v¶.v·.vÞ.Ÿ.6..á..FŸ|...F±.F=.-Ÿ. 000180
46890E46 8D004BE9 03740202 7F8326F4 5EC4005E E900B2E9 EE468800 06E90375 u.Õ...FŸÕý.Õ^.á^¶&....t.ÕK..F..F 0001A0
B8EE4689 0AC48302 5FFF26F0 5EC40876 FF5016F8 4680FC76 FFFE76FF FE568CFC =.V±.v±.v=.F½.P.v.á^Þ&._..á..FŸ| 0001C0
EE468800 06E90375 00EE7E83 EC5689EA 4689FA56 88F84688 FC4689FE 46890000 ...F±.F=.F½.V*.Fõ.V$.-Ÿ¯u.Õ...FŸ 0001E0
```

Dump of file SATURN:[PCCOMMON.DUMP.DLL]METHOD.TMP;1 on 18-APR-1990 10:47:52.68
File ID (731,15,0) . End of file block 13 / Allocated 16

Virtual block number 9 (00000009), 512 (0200) bytes

```
890E4680 02578926 078926FA 568BF846 880A5EC4 0051E999 AAB80006 E9005AE9 ÕZ.Õ..|`.ÕQ.á^..F½.V*&..&.W..F.. 000000
F276FFF4 76FFF676 FFF876FF FA76FFEA 76FFEC76 FFFC76FF FE76FFFE 568CFC46 F=.V±.v±.v=.v$.võ.v*.v½.v-.v¶.v· 000020
5F5E1F00 00E9EE46 88FC4689 FE468900 00B8EE46 8914C483 08880840 9AF076FF .vÞ.a....á..FŸ|...F±.F=.FŸÕ...^_ 000040
88F45689 F2468902 C4830C60 00E39A06 76FFD88E 0C56881E 56570000 14C8CBC9 èùà...WV.|V..Ã.v..D.`..á..F·.V¶¯ 000060
80FC76FF FE76FFFE 568CFC46 890C468D 0156E999 A8880006 E90374F4 460BF246 F·.F¶t.Õ..|´.ÕV..F..F=.V±.v±.v=. 000080
46890000 B8F04689 10C4830E 5F06859A F276FFF4 76FF0876 FF0A76FF 5016FA46 F*.P.v..v..v¶.v·.ç._..á..FÞ|...F 0000A0
E705F39A F276FFF4 76FFFA76 FF0113E9 F0468800 06E90375 00F07E83 FC4689FE ±.F=.-Þ.u.Õ...FÞÕ...v*.v¶.v·.µ.Ó 0000C0
46890C46 8000EBE9 99A98800 06E90374 F8460BF6 4688F856 89F64689 06C4830E ..á..F-.V½.F-.F½t.Õ..|`.Õ$..F..F 0000E0
000CE39A 5016EC46 800876FF 0A76FF00 25E90374 01027F83 26F65EC4 FE568CFC =.V±á^-&....t.Õ%..v..v..F$.P.D.. 000100
89EC4689 0A568808 4688000C E900B3E9 F0468800 06E90375 00F07E83 F0468900 ..FÞ.-Þ.u.Õ...FÞÕ°.Õ...F..V..F$. 000120
76FF016A 026AEC76 FFEE76FF 0876FF0A 76FFF676 FFF876FF F276FFF4 76FFEE56 VŸ.v¶.v·.v½.v-.v..v..vŸ.v$j.j..v 000140
C70005E9 037499AE F07E81FC 4689FE46 890000B8 F046890F 1A08A19A FC76FFFE ±.v=.À....FÞ|...F±.F=.-ÞÛ.t.Õ..ú 000160
E904C483 00F40090 9A0876FF 0A76FF00 11E90374 01027F83 26F65EC4 0000F046 FÞ..á^-&....t.Õ...v..v....¶..á.Õ 000180
76FFFC76 FFFE76FF FE568CFC 46890C46 8D002BE9 03740202 7F8326F6 5EC4003E >.á^-&....t.Õ+..F..F=.V±.v±.v=.v 0001A0
0006E999 AAB80006 E9FC4689 FE468900 008808C4 83065FFF 26F25EC4 0876FF0A ..v.á^·&._..á.|...F±.F=Õ..|`.Õ.. 0001C0
830FBC00 E39A0676 FFD88E00 EAB81E56 57000010 C8CBC95F 5E1F0000 E9F04688 .FÞÕ...^_Èùà...WV.|õ..Ã.v..D.¥.. 0001E0
```

Dump of file SATURN:[PCCOMMON.DUMP.DLL]METHOD.TMP;1 on 18-APR-1990 10:47:52.68
File ID (731,15,0)   End of file block 13 / Allocated 16

Virtual block number 10 (0000000A), 512 (0200) bytes

```
8CFC4689 10468D00 86E999A8 B80006E9 0374F446 08F2468B F45689F2 468902C4 á..F·.V¶.F·.F¶t.Õ..¡´.Õ...:..F•. 000000
C4830FE8 07449AF2 76FFF476 FF0876FF 0A76FF50 16FA468D FC76FFFE 76FFFE56 V±.v±.v•.F°.P.v..v..v¶.v·.ι Ò..á 000020
FFFA76FF 0043E9F0 46880006 E9037500 F07E83FC 4689FE46 89000088 F0468910 ..Fþ¡...F±.F•.~þ.u.Õ...FþÕC.. °. 000040
A9B80006 E90374F8 460BF646 8BF85689 F6468906 C4830E33 05F39AF2 76FFF476 v¶.v·.µ.3..á..F~.V½.F~.F½t.Õ..¡´ 000060
1F0000E9 00008802 57892607 89260C5E C4065788 26044788 26F65EC4 0018E999 .Õ..á^~&.G.&.W.á^.&..&.W.¡..Õ... 000080
0EE999AC B80006E9 03740A46 0808468B D88E0F73 881E5657 000014C8 CBC95F5E ^_èùà...WV.¡s..Ã.F..F.t.Õ..¡¯.Õ. 0000A0
99A88800 06E90374 F4460BF2 468BF456 89F24689 02C48310 8600E39A 0676FF01 ..v..D....á..F·.V¶.F·.F¶t.Õ..¡´. 0000C0
F476FF08 76FF0A76 FF5016FA 468DFC76 FFFE76FF FE568CFC 46890E46 8D00ECE9 Õ&..F..F•.V±.v±.v•.F°.P.v..v..v¶ 0000E0
0006E903 7500F07E 83FC4689 FE468900 0088F046 8910C483 0F7D0685 9AF276FF .v·.ç.)..á..Fþ¡...F±.F•.~þ.u.Õ.. 000100
F6468BF8 5689F646 8906C483 113B05F3 9AF276FF F476FFFA 76FF00A9 E9F0468B .FþÕ`..v°.v¶.v·.µ.;..á..F~.V½.F~ 000120
76FF0A76 FF0025E9 03740102 7F8326F6 5EC40081 E999A988 0006E903 74F8460B .F½t.Õ..¡`.Õ..á^~&....t.Õ%..v..v 000140
000CE900 52E9F046 880006E9 037500F0 7E83F046 8900000E 9D9A5016 EC468008 ..F&.P......Fþ.~þ.u.Õ...FþÕR.Õ.. 000160
76FFF876 FFF276FF F476FFFE 568CFC46 890E468D EE5689EC 46890A56 88084688 .F..V..F&.VŸ.F..F•.V±.v¶.v·.v½.v 000180
F0468910 4708A19A FC76FFFE 76FF016A 0C76FFEC 76FFEE76 FF0876FF 0A76FFF6 ~.v..v..vŸ.v&.v.j..v±.v•.À.G..Fþ 0001A0
D88E102C 881E5657 000010C8 CBC95F5E 1F0000E9 F0468BFC 4689FE46 89000088 ¡...F±.F•.FþÕ...^_èùà...WV.¡...Ã 0001C0
89F24689 02C48311 B600E39A 0676FF00 D0E999AC B80006E9 03740E46 080C468B .F..F.t.Õ..¡¯.ÕÀ.̄v..D.Ñ..á..F·. 0001E0
```

Dump of file SATURN:[PCCOMMON.DUMP.DLL]METHOD.TMP;1 on 18-APR-1990 10:47:52.68
File ID (731,15,0)   End of file block 13 / Allocated 16

Virtual block number 11 (0000000B), 512 (0200) bytes

```
FFFE76FF FE568CFC 46891246 8D00AEE9 99A88800 06E90374 F4460BF2 468BF456 V¶.F·.F¶t.Õ..¡´.ÕÜ..F..F•.V±.v±. 000000
0088F046 8910C483 11E20744 9AF276FF F476FF0C 76FF0E76 FF5016FA 468DFC76 v•.F°.P.v..v..v¶.v·.D.ã..á..Fþ¡. 000020
9AF276FF F476FFFA 76FF0068 E9F0468B 0006E903 7500F07E 83FC4689 FE468900 ..F±.F•.~þ.u.Õ...FþÕk..v°.v¶.v·. 000040
468D0043 E999A988 0006E903 74F8460B F6468BF8 5689F646 8906C483 122D05F3 µ.·..á..F~.V½.F~.F½t.Õ..¡´.ÕC..F 000060
FF0C76FF 0E76FF08 76FF0A76 FFF676FF F876FFF2 76FFF476 FFFE568C FC468912 ..F•.V±.v¶.v·.v½.v~.v..v..v..v.. 000080
00E9F046 88FC4689 FE468900 0088F046 89108208 A19AFC76 FFFE76FF 016A1076 v.j..v±.v•.À.ý..Fþ¡...F±.F•.FþÕ. 0000A0
EA468902 C4831297 00E39A06 76FFD88E 115C881E 56570000 1EC8CBC9 5F5E1F00 ..^_èùà...WV.¡\..Ã.v..D....á..Fõ 0000C0
FA76FFFA 568CF846 8912468D 0150E999 A8880006 E90374EC 460BEA46 88EC5689 .V$.Fõ.F$t.Õ..¡´.ÕP..F..F½.V°.v° 0000E0
88E24689 10C48312 C307449A EA76FFEC 76FF0C76 FF0E76FF 5016F246 8DF876FF .v½.F·.P.v..v..v$.võ.D.Û..á..Fã¡ 000100
EA76FFEC 76FFF276 FF010DE9 E2468800 06E90375 00E27E83 F84689FA 46890000 ...F°.F½.~ã.u.Õ...FãÕ...v·.v$.võ 000120
C700E5E9 99A98800 06E90374 F0460BEE 468BF056 89EE4689 06C48313 1B05F39A .µ....á..FŸ.Vþ.FŸ.Fþt.Õ..¡`.Õl.ú 000140
EE5EC406 F44683E8 46FF0007 E9F65689 F4468900 1005F056 88EE4688 0000E846 FÕ...FŸ.Vþ....F¶.V~Õ...FÕ.F¶.á^Ÿ 000160
06C48311 7705F39A EA76FFEC 76FF37FF 26F45EC4 0082E903 770E4739 26E8468B .FÕ&9G.w.Õý.á^¶&.7.v$.võ.µ.w..á. 000180
FA568CF8 46891246 8D008DE9 99A98800 06E90374 E6460BE4 468BE656 89E44689 .Fõ.Vl.Fõ.Flt.Õ..¡`.Õ...F..F½.V° 0001A0
89000088 FE5689FC 468908C4 83025FFF 26F45EC4 0C76FF0E 76FFF876 FFFA76FF .v°.v½.v..v.á^¶&._..á..F•.V±¡... 0001C0
0876FF0A 76FFE476 FFE676FF EA76FFEC 76FFFA56 8CF84689 12468DF8 4689FA46 F°.F½.F..F½.V°.v$.võ.vl.võ.v..v. 0001E0
```

Dump of file SATURN:[PCCOMMON.DUMP.DLL]METHOD.TMP;1 on 18-APR-1990 10:47:52.68
File ID (731,15,0)   End of file block 13 / Allocated 16

Virtual block number 12 (0000000C), 512 (0200) bytes

```
89FA4689 000088E2 46891258 08A19AF8 76FFFA76 FF016A10 76FFFC76 FFFE76FF .v±.v•.v.j..v°.v½.À.X..Fã¡...F°. 000000
0088FF38 E90009E9 E2468800 06E90375 99AEE27E 810010E9 037500E2 7E83F846 F½.~ã.u.Õ...~ãÕ.u.Õ...FãÕ..Õ8.¡. 000020
02C48314 1A00E39A 0676FF08 8E124E88 1E565700 001EC8CB C95F5E1F 0000E900 .Õ...^_èùà...WV.¡N..Ã.v..D....á. 000040
FA568CF8 46891446 8D014BE9 99A88800 06E90374 EC460BEA 4688EC56 89EA4689 .Fõ.V$.Fõ.F$t.Õ..¡`.ÕK..F..F½.V° 000060
8910C483 14460744 9AEA76FF EC76FF0C 76FF0E76 FF5016F2 468DF876 FFFA76FF .v°.v½.F·.P.v..v..v$.võ.D.F..á.. 000080
EC76FFF2 76FF0108 E9E2468B 0006E903 7500E27E 83F84689 FA468900 0088E246 Fã¡...F°.F½.~ã.u.Õ...FãÕ...v·.v$ 0000A0
E999A988 0006E903 74F0460B EE4688F0 5689EE46 8906C483 14AC05F3 9AEA76FF .võ.µ.¯..á..FŸ.Vþ.FŸ.Fþt.Õ..¡`.Õ 0000C0
06F44683 E846FF00 07E9F656 89F44689 001005F0 5688EE46 880000E8 46C700E0 À.úFÕ...FŸ.Vþ....F¶.V~Õ...FÕ.F¶. 0000E0
F45EC400 9CE90374 07392610 468BF45E C400ADE9 03770E47 3926E846 8BEE5EC4 á^Ÿ.FÕ&9G.w.ÕÜ.á^¶.F.&9.t.Õ..á^¶ 000100
E90374E6 460BE446 8BE65689 E4468906 C4831525 05F39AEA 76FFEC76 FF37FF26 &.7.v$.võ.µ.%..á..Fõ.Vl.Fõ.Flt.Õ 000120
F45EC40C 76FF0E76 FFF876FF FA76FFFA 568CF846 8914468D 007AE999 A9880006 ..¡`.Õz..F..F½.V°.v°.v½.v..v.á^¶ 000140
FFFA568C F8468914 468DF846 89FA4689 000088FE 5689FC46 8908C483 025FFF26 &._..á..F•.V±¡...F°.F½.F..F½.V°. 000160
FFFA76FF 016A1276 FFFC76FF FE76FF08 76FF0A76 FFE476FF E676FFEA 76FFEC76 v$.võ.vl.võ.v..v..v±.v•.v.j..v°. 000180
E999A888 FF3DE900 09E9E246 88F84689 FA468900 0088E246 89139408 A19AF876 v½.À....Fã¡...F°.F½.FãÕ..Õ=.¡¯.Õ 0001A0
9A0676FF 0876FF0A 76FF0C76 FFD88E13 D1881E56 57000000 C8CBC95F 5E1F0000 ...^_èùà...WV.¡¦..Ã.v..v..v..v.. 0001C0
0A460808 468BD88E 154F881E 56570000 0AC80008 CAC95F5E 1F0000E9 000010E7 Ó...Õ...^_èò..à...WV.¡O..Ã.F..F. 0001E0
```

```
Dump of file SATURN:[PCCOMMON.DUMP.DLL]METHOD.TMP;1 on 18-APR-199. 10:47:52.68
File ID (731,15,0)   End of file block 13 / Allocated 16

Virtual block number 13 (0000000D), 512 (0200) bytes

 08F84688 FA5689F8 468902C4 83150100 E39A0676 FF005DE9 99AC8800 06E90374 t.Õ..¡¯.Õ]..v..D.ì..é..F½.V°.F½. 000000
 FF0E76FF FC76FFFE 76FFFE56 8CFC4689 10468000 38E999A8 880006E9 0374FA46 F°t.Õ..¡´.Õ;..F..F•.V±.v±.v•.v.. 000020
 89FE4689 00008CF6 468910C4 83130806 859AF876 FFFA76FF 0876FF0A 76FF0C76 v..v..v..v°.v½.ç.Ü..é..F-¡...F±. 000040
 740E4608 0C468808 8E157688 1E565700 000AC8CB C95F5E1F 0000E9F6 4688FC46 F•.F-Õ...^_èüà...WV.¡v..Ä.F..F.t 000060
 4608F846 88FA5689 F8468902 C4831650 00E39A06 76FF005D E999AC88 0006E903 .Õ..¡¯.Õ]..v..D.P..é..F½.V°.F½.F 000080
 76FF1276 FFFC76FF FE76FFFE 568CFC46 8914468D 0038E999 A8880006 E90374FA °t.Õ..¡´.Õ;..F..F•.V±.v±.v•.v..v 0000A0
 4689FE46 890000B8 F6468910 C4831591 07449AF8 76FFFA76 FF0C76FF 0E76FF10 ..v..v..v°.v½.D....é..F-¡...F±.F 0000C0
 00020000 0002008D 00020000 00011610 00020008 CBC95F5E 1F0000E9 F64688FC •.F-Õ...^_èü..................... 0000E0
 0203002F 00020007 0203001C 00020043 0203000E 0002008A 02030000 000315F5 %.......¤.......C.......•.../... 000100
 DAF7D788 067EC457 38E30C4E 88EC8855 00000051 000206CD 02030041 00021560 '...A...ë...Q...U.£.N.D8Wá-..¤XÖ 000120
 8C10E301 87AAF3C9 13A8F3E9 D1E08A0A 4688D128 D187D103 D323D818 D128OC74 t.+ì.ÜW£.ì.ì+ì.F..ÄìÕµ¨.èµ¨.ìD.. 000140
 00010033 01050001 C85D0856 88064688 5FAAF3C9 13A8F3E9 D1C38EFF FFC381C3 û.ù...ùìÕµ¨.èµ´_.F..V.]ù....3... 000160
 00000000 00000000 00000000 00000000 00000000 00000000 00000000 00000088 ................................ 000180
 00000000 00000000 00000000 00000000 00000000 00000000 00000000 00000000 ................................ 0001A0
 00000000 00000000 00000000 00000000 00000000 00000000 00000000 00000000 ................................ 0001C0
 00000000 00000000 00000000 00000000 00000000 00000000 00000000 00000000 ................................ 0001E0

Dump of file SATURN:[PCCOMMON.DUMP.DATA]MODEL.SQL;1 on 18-APR-1990 10:36:13.06
File ID (471,15,0)   End of file block 1 / Allocated 4

Virtual block number 1 (00000001), 512 (0200) bytes

 6765746E 69206564 6F630A0D 28206C65 646F6D20 656C6261 74206574 61657263 create table model (..code integ 000000
 6E202932 33287261 68637261 7620656D 616E0A0D 2C6C6C75 6E20746F 6E207265 er not null,..name varchar(32) n 000020
 756E2074 6F6E2072 65676574 6E69206E 6F697372 65760A0D 2C6C6C75 6E20746F ot null,..version integer not nu 000040
 0D0A0D3B 296C6C75 6E20746F 6E20746E 696C6C61 6D732065 7079740A 0D2C6C6C ll,..type smallint not null);... 000060
 00000000 00000000 00000000 00000000 00000000 00000000 00000000 0000540A .T.............................. 000080
 00000000 00000000 00000000 00000000 00000000 00000000 00000000 00000000 ................................ 0000A0
 00000000 00000000 00000000 00000000 00000000 00000000 00000000 00000000 ................................ 0000C0
 00000000 00000000 00000000 00000000 00000000 00000000 00000000 00000000 ................................ 0000E0
 00000000 00000000 00000000 00000000 00000000 00000000 00000000 00000000 ................................ 000100
 00000000 00000000 00000000 00000000 00000000 00000000 00000000 00000000 ................................ 000120
 00000000 00000000 00000000 00000000 00000000 00000000 00000000 00000000 ................................ 000140
 00000000 00000000 00000000 00000000 00000000 00000000 00000000 00000000 ................................ 000160
 00000000 00000000 00000000 00000000 00000000 00000000 00000000 00000000 ................................ 000180
 00000000 00000000 00000000 00000000 00000000 00000000 00000000 00000000 ................................ 0001A0
 00000000 00000000 00000000 00000000 00000000 00000000 00000000 00000000 ................................ 0001C0
 00000000 00000000 00000000 00000000 00000000 00000000 00000000 00000000 ................................ 0001E0
```

```
Dump of file SATURN:[PCCOMMON.DUMP.DLL]LOGIN.TMP;1 on 18-APR-1990 10:47:42.39
File ID (721,13,0)   End of file block 28 / Allocated 28

Virtual block number 1 (00000001), 512 (0200) bytes

00000000 00000040 00000000 00000088 0000FFFF 00000004 0000001C 00825A4D MZ..............|........a....... 000000
00000080 000000GJ 00000000 00000000 00000000 00000000 00000000 00000000 ................................ 000020
6F6E6E61 63206061 72676F72 70207369 685421CD 4C01B821 CD098400 0EBA1F0E ..a..Ç.è!|.Lè!This program canno 000040
00000000 00000024 0A0D0D2E 65646F60 20534F44 206E6920 6E757220 65622074 t be run in DOS mode....$....... 000060
00030004 00000000 00020C88 00000000 00048009 62683E05 000A008A 0505454E NE..a...|>kb.................... 000080
00000000 00000000 00010000 00040000 00000144 0090008A 00600060 00400024 $.a.'.'.....D................... 0000A0
1B700F21 190801C9 02020E21 00000000 19EE0F00 19E00024 00820F00 00820017 ..ý...ý.$.Ú...Ÿ.....!...è.Ä.!.p. 0000C0
4F4C5445 474E4947 4F4C1100 014E4947 4F4C4E49 474F4C0A 00004E49 474F4C05 .LOGIN...LOGINLOGIN...LOGINGETLO 0000E0
5F0E4954 4703534C 4C414353 4F440800 0010000A 00010000 02454041 4E4E4947 GINNAME...........DOSCALLS.GTI._ 000100
03000003 01024554 49525753 4F44084F 4953034C 4F4F5445 54414552 43495447 GTICREATETOOL.SIO.DOSWRITE...... 000120
73627573 20797469 6C696361 46204E49 474F4C20 6E616D68 63614220 00000098 .... Bachman LOGIN Facility subs 000140
08064688 D88EFFFF 881E5657 000010C8 00000000 00000000 0000006D 65747379 ystem..........à...WV.¡...Á.F... 000160
00FE46C6 0AC48300 6E00609A 5016F646 8D0676FF 0876FF09 6A001CE9 03750846 F.u.õ..j..v..v..F-.P.'.n..á.6F±. 000180
00FFFF9A FF6A1F6A 5016F046 8D096A50 16F6468D 5016F246 8D00F646 C60004E9 Õ..óF-..F·.P.F-.Pj..FÞ.Pj.j..... 0001A0
FFFF0010 9A007668 1E004268 1EF476FF 001CE903 7500F47E 83F44689 12C48300 ..á..F¶.-¶.u.Õ...v¶.hB..hv...... 0001C0
00E90000 880006E9 89418800 06E90374 00F27E83 000FE900 18E98940 880AC483 .á.¡a.Õ..Õ...-'.t.Õ..¡A.Õ..¡..Õ. 0001E0

Dump of file SATURN:[PCCOMMON.DUMP.DLL]LOGIN.TMP;1 on 18-APR-1990 10:47:42.39
File ID (721,13,0)   End of file block 28 / Allocated 28

Virtual block numb'' 2 (00000002), 512 (0200) bytes

04CAC95F 5E1F0000 E9000088 D88E0008 881E5657 000000C8 0004CAC9 5F5E1F00 ..^_èò..à...WV.¡...Á¡..Õ...^_èò. 000000
00000000 000E0002 00400203 00000004 00A00002 00000002 00270002 00039000 ......'...............M......... 000020
FFFC568C FA46890E 46805657 000008C8 00000000 00000000 00000000 00000000 ................à...WV.F..F*.Ve. 000040
76FF0876 FF0A76FF 0C76FFFA 76FFFC76 FFF08804 C4830044 008A9A06 76FF0876 v..v....D..á..Þ.v=.v*.v..v..v..v 000060
CBC9SF5E C78806C4 83FFFF01 609A5606 76FF0876 FFF8880C C4830055 02049A06 ....U..á..½.v..v.V.'....á..ú^_èù 000080
8BAAF3C0 32F8E2AA 0374C00A ACOCE30E 4E88DF88 0A76C506 7EC41E56 57EC8855 U.$WV.á-.év..Õ.N.D.¯.åt.´ã½2ã¯. 0000A0
75008208 7E810E75 006A067E 81168A06 FF560000 04C8C850 E5885F5E 1FC28CC3 ù.õ.^_.[]ùà...V.....-.j.u..-.ý.u 0000C0
F626065E C40001FE 46C72475 FFFF087E 81287500 76067E81 13E80000 FE46C707 .úF±..Š..-.v.u+.-...u$úF±..á^.&- 0000E0
90907EEB C0280674 010C5287 F6060868 F9F7000C 8999005E 20C38815 750C0A47 G..u..û-^..¿..¾*kÁ.-.R..t.+áŠ-.. 000100
54890489 02C48301 900FB59A 02006814 75024408 04881250 C68102E6 C1FE7688 .v±è|..óP....D.u.h....ç.....á....T 000120
C4FC4689 0C5205E0 D1C103E0 D1C888F9 F7000C89 99005E20 06468805 74000802 ..Åt(.F.-^..¿..¾*.àÌÁ.èÌÁ.R..F=á 000140
88025789 26078926 08578926 06478926 12529488 12508488 02E6C1FE 7688065E ^..v±è|....P....R.&.G.&.W.&..&.W.. 000160
90CBC95E 00018802 0A4F8026 065E8811 07C6DE88 04478926 02448902 0088FC76 v=¡...D.&.G..Rõ...^.&.O..¡..^èù. 000180
5E8CFC46 890C5205 E001C103 E001C888 F9F7000C 8999005E 20084688 000004C8 à....F.-^..¿..¾*.àÌÁ.èÌÁ.R..F=.^ 0001A0
8301AF10 929A50E4 2A08478A 26085EC4 72741007 F626FC5E C4517400 067E83FE ±.-..tQá^=&-..trá^.&.G.*õP...£.. 0001C0
000247C7 260007C6 26FC5EC4 04C48301 EE0F1A9A 0876FF0A 76FF5C74 C00802C4 á..åt\.v..v....Ÿ..á.á^=&ó..&úG.. 0001E0

Dump of file SATURN:[PCCOMMON.DUMP.DLL]LOGIN.TMP;1 on 18-APR-1990 10:47:42.39
File ID (721,13,0)   End of file block 28 / Allocated 28

Virtual block number 3 (00000003), 512 (0200) bytes

741007F6 26FC5EC4 2AE80857 89260647 89260257 89260789 2699C028 085EC400 .á^.+à.&..&.W.&.G.&.W.Š*á^=&-..t 000000
0F1A9A08 76FF0A76 FF0874C0 0802C483 02001092 9A50E42A 08478A26 085EC421 !á^.&.G.*õP......á..åt..v..v.... 000020
A3105688 0E46881A 061E8C1A 04A31A0A 8800F710 869A000A 88EC8855 CBC90028 (.èùU.£¡....Ñ.¾.¡...É.......F...V.É 000040
E9000019 FE06C700 001A0006 C719DC16 89190AA3 08568806 468819F6 168919F4 ¶...-..F...V.ÉÖ....É.ú.....ú.±...Õ 000060
A319E2A3 19FCA319 E0A319E4 A3C02800 011A0206 C70308E9 037425F6 7E80038D ...-%t.Õ..ú.....+àÉÕ.ÉÁ.É=.Éã.É 000080
46FF4975 30017F80 260A5EC4 00201B6A 06C719F2 A31908A3 19DEA319 F8A319FA *.É½.Éã.ÉÁ.É·.ú.j. .á^.&...0ul.F 0000A0
9028EB00 0019F806 C719E406 FF0D752B 3F80260A 5E88903E E8003018 6A06C70A .ú.j.0.Š>..^.&.?+u...õ.ú.½...Š(. 0000C0
3F80260A 5EC400EB 190806FF 9014EB19 F806FF1A 750019E4 3E830E75 203F8026 &.? u..>õ..u...½.Š.....Å.Š.á^.&.? 0000E0
0C76FFD0 75C00802 C4830978 E80E5098 078A260A 5E880A46 FF19F206 FFC77520 -uú..'..F..^.&...P.Õx..á..åul.v. 000100
A119F206 FF0C7D00 1A083E83 0C56890A 468908C4 8308C7E8 0E1A0868 1E0A76FF .v..h...Õú..á..F...V..>....)....'.Å 000120
80260A5E C4002018 6A06C706 7530186A 3E830074 0019F23E 831A08A3 D8F71A08 ..¾AÉ...>·..t..>j.Õu.ú.j. .á^.&. 000140
0C56890A 468908C4 83087BE8 0E1A0268 1E0A76FF 060A46FF 19FA06FF 20752E3F ?.u-..*...F...v..h...Õ(..á..F...V. 000160
004E3030 74004630 98078A26 0A5EC419 FA0EFF00 011A0206 C70A7D00 1A023E83 .>....).ú........*.á^.&....=F.t==N. 000180
4C3F8026 0A5EC409 750019E2 3E830002 19E206C7 0675006C 302B7400 68304074 tã=h.t+=(.u.ú.ã.....>ã..u.á^.&.?L 0001A0
001019E2 06C7D8EB 000119E2 06C79002 4EE91C75 003F8026 0A5EC40A 46FF0375 u..F.á^.&.?.u.ÕN...ú.ã...ŠÁú.ã... 0001C0
08750058 3D057400 47300A74 00453DF8 46899807 8A26C8E8 000819E2 06C7D0E8 ŠÁú.ã...Šà&....F½=E.t.=G.t.=X.u. 0001E0
```

```
Dump of file SATURN:[PCCOMMON.DUMP.DLL]LOGIN.TMP;1 on 18-APR-1990 10:47:42.39
File ID (721,13,0)   End of file block 28 / Allocated 28

Virtual block number 4 (00000004), 512 (0200) bytes

 E9037E01 3FE90375 00633001 91E9037E 78740069 30F84688 20F84683 19E006FF ..Á..F½ .F½=i.tx-.Õ..=c.u.Õ?.-.Õ 000000
 2619FEA1 1FC42619 F41EC415 750219E2 3E839001 59E90140 E9037500 25300152 R.=X.u.Õa.ÕY...>ã..u.á.¶.&á.À±.& 000020
 1A003E83 0419F406 83078926 19FEA11F C42619F4 1EC400E8 00000247 C7260789 ..&úG...Š.á.¶.&á.À±.&....¶...>.. 000040
 FFB801AF E9037520 0A47F626 19DA1EC4 018DE903 740019FE 3E830170 E9037500 .u.Õp..>±..t.Õ§.á.Õ.&-G. u.ÕÉ.¡. 000060
 06FFF2EB 086A90C3 EB02C483 019EE80E 0A6A0000 190806C7 19FC06FF 01ACE9FF .Õ¯...•.ú.À...j..Õ...á.Šú.j.Š... 000080
 740119E2 3E830081 E9037508 19E23E83 00041A02 06C719FA 06FF19E0 06FF190E ß...À...•.ú......>ã..u.Õ...>ã..t 0000A0
 1A0806C7 0A740019 F23E83FA 46891A08 A128741A 080639FA 468919E2 A3C0287A z+àÉã..F•9...t(À...F•.>...t.ú... 0000C0
 E80E106A 0219F406 831A08A3 C028027D C0081A08 A1051A08 2E839090 13E80000 ..Š........À...á).+àÉ....¶..j..Ò 0000E0
 052DFA46 88157400 19F23E83 227400FA 7E8302C4 83048DE8 0E3A6A02 C4830130 0..á.j:.Õ...á..-•.t".>...t..F•-. 000100
 F1E80E10 6A0419F  2E830000 1A0806C7 9007E81A 08A3C028 027DC008 1A08A300 .É...á).+àÉ..Š..ú.......¶..j..Õþ 000120
 F4E8016A 90FF39E9 026EE80E 006A90FF 3FE9106A FF10E902 19F40683 02C48300 ..á...¶..Õ..j.Õ?..j..Õn.Õ9..j.Š¶ 000140
 7C00653D FF0CE903 75006430 90FF21E9 0428E80E 256AFF2A E90349E8 0EF876FF .v½.Õl.Õ•.j%.Õ(.Õl..=d.u.Õ..=e.| 000160
 FC468940 0C56880A 46880A4E FF0C5688 0A468809 740019E2 3E830A7E 00673005 .=g.~O.>ã..t..F..V..N..F..V.a.F• 000180
 733DFEE0 E9037500 7030FEE4 E9037500 6F30FE80 E9037500 6E30903A EBFE5689 .V±Š:.=n.u.Õ.±=o.u.ÕÕ±=p.u.ÕÀ±=s 0001A0
 C4FC46FF 9034E80A 46FF9081 EBFF79E9 03750078 30FEB9E9 03750075 3D8F7400 .t.=u.u.Õ¿±=x.u.Õy.ŠY..F.Š4..F•á 0001C0
 044CE80E 0A76FF0C 76FF500A 462BC388 EC75253C 0474C00A F6468807 8A26FC5E ^•&...F-.àt.<%uš.ù+F.P.v..v..ÕL. 0001E0

Dump of file SATURN:[PCCOMMON.DUMP.DLL]LOGIN.TMP;1 on 18-APR-1990 10:47:42.39
File ID (721,13,0)   End of file block 28 / Allocated 28

Virtual block number 5 (00000005), 512 (0200) bytes

 C4FC63E9 0374C00A F6468807 8A260A5E C40C5689 0A4689FE 5688FC46 8806C483 .á..F=.V±.F..V.á^.&...F-.át.Õc•á 000000
 C7067400 19FA3E83 56570000 12C8C8C9 19FEA1FE 51E90374 200A47F6 26190A1E .Ö.&-G. t.ÕQ±À±.èùà...WV.>•..t.ú 000020
 F41EC419 751019E2 3E830774 0219E23E 8319FC06 FF04740A 067E8300 201B6A06 .j. ..-..t...•..>ã..t..>ã..u.á.¶ 000040
 F41EC411 740019FC 3E83902C EB0419F4 0683FE56 89FC4689 02578826 07882619 .&..&.W..F•.V±..¶..Š,..>•..t.á.¶ 000060
 19F40683 FE5689FC 46899907 882619F4 1EC40EE8 0000FE46 C7FC4689 07882619 .&...F•úF±..Š.á.¶.&....F•.V±..¶. 000080
 16881A04 A11B68A3 C0289003 EB06468B 0674FE46 08FC4688 0E740019 083E8302 ..>À..t..F•.F±t..F.Š..+àÉh.À.... 0000A0
 46FFF25E C410750A 067E8328 7D00FE7E 83317500 19FC3E83 F45689F2 46891A06 ...F .V¶.>•..ul.~±.)+.-..u.á^..F 0000C0
 9006E800 01F646C7 FE5689FC 46890AF7 00028308 F7FE5688 FC46882D 07C626F2 ·&ó.-.F•.V±%A.Ø.%Õ.F•.V±úF-..Š.. 0000E0
 C48306F1 10889AFC 76FFFE76 FF501E06 76FFFA5E 8CF84689 19E68800 00F646C7 úF-..¡l..F½.^•.v..P.v±.v•...þ..á 000100
 08F04E89 C82B1A02 0E8804C4 83020010 709AF876 FFFA76FF 45740019 FA3E830A ..>•..tE.v•.v½.p....á.....+à.NÞ. 000120
 49C18847 3005C626 05E8F27E C4F04E88 00001B68 06C70675 081B683E 83007EC9 è-..>h..u.ú.h....NÞá-·Š.&ó.OG.èI 000140
 08048807 8A26F85E C4F276C5 EE5E8C19 E00E88F0 4E89F446 8CF27E89 F47FC00B .â.¶.-·.F¶.NÞ..À..^Yév·á^½&..... 000160
 FC3E83EE 5E8EF45E 8CF27689 E375003F 8026F846 FF46202C 80037C61 3C0774C9 èt.<a|.., F.F½&.?.uD.v·.^¶.^Y.>• 000180
 8302FFE8 0E50C028 02E80001 88057500 F67E830B 7419F806 0819E4A1 14750019 ..u.ÀÕ...½.t..--.u.¡..Š.+àP.Õ... 0001A0
 89F84689 19F61688 19F4A100 018E1874 00067E83 56570000 10C8C8C9 5F5E02C4 á.^_èùà...WV.-..t./..À¶...-..F½. 0001C0
 89F84689 02578826 07882619 F41EC413 740819E2 3E83008F E90219F4 0683FA56 V•.¶..Õ...>ã..t.á.¶.&..&.W..F½. 0001E0

Dump of file SATURN:[PCCOMMON.DUMP.DLL]LOGIN.TMP;1 on 18-APR-1990 10:47:42.39
File ID (721,13,0)   End of file block 28 / Allocated 28

Virtual block number 6 (00000006), 512 (0200) bytes

 0E740819 E23E8304 19F40683 FA5E8CF8 4689FC46 89078826 19F41EC4 10E8FA56 V•Š.á.¶.&...F•.F½.^•..¶...>ã..t. 000000
 F8468BFA 5E8CF846 89125F88 097500FC 7E83900A EB125888 1575FA46 08F8468B .F½.F•u.¡X.Š...~•.u.¡_..F½.^•.F½ 000020
 8026F246 FFF25EC4 900EEB1A 020E881C 7419FA36 39F628F4 5689F246 89FA568B .V•.F·.V¶+-96•.t.....Š..á^·.F·&. 000040
 83FE2B1A 083E88F3 75003F80 26F246FF F25EC446 90EDEB10 7ECE3846 1574003F ?.t.F;ö-.ŠU.Fá^·.F·&.7.u¤.>..+±. 000060
 19F23E83 06C48301 83E80EF8 76FFFA76 FF5602C4 830159E8 0E570875 0019F23E >·..u.W.ÕY..á.V.v•.v½.Õ•..á..>·. 000080
 5689FC46 8919F616 8819F4A1 000006C8 90CBC95F 5E02C483 013CE80E 57087400 .t.W.Õ<..á.^_èù.à...À¶...-..F•.V 0000A0
 06C70675 0019FA3E 83FA4688 C02A9003 EB018005 7547067E 83067467 067E83FE ±.-.gt..-.Gu.¯.Š..•ã.F•.>•..u.ú. 0000C0
 FF1A0236 FF19E036 FF00011A 0206C706 75001A02 3E830074 00FA7E80 00061A02 .....-•.t..>...u.ú......6À..6... 0000E0
 00FA7E80 0EC48316 8C1EFF26 18F6068E FC76FFFE 76FF1A04 36FF1A06 36FF0676 v..6...6...v±.v•..-.&.....á..-•. 000100
 083E8304 C4831690 1EFF2618 F6068E1A 0436FF1A 0636FF14 75001908 3E831B74 t..>À..u..6...6....-.&.....á..>À 000120
 8304C483 16981EFF 26°8F606 8E1A0436 FF1A0636 FF147500 1A023E83 18740019 ..t..>...u..6...6....-.&.....á.. 000140
 1EFF2618 F6068EFC 76FFFE76 FF1B7419 F8060B19 E4A10000 1B6806C7 0P19F406 .¶..ú.h...ÀÕ...½.t..v±.v•..-.&.. 000160
 003E8356 000000C8 90CBC901 29E80E50 C02802E8 00018805 74C00804 C48·169C ...á..àt.¡..Š.+àP.Õ).èù.à...V.>. 000180
 E42A0488 2602478E 2607FF26 37882606 468A1478 044FFF26 190A1EC4 3C75.01A ..u<á.O.&.O.x..F.&.7&..&.G.&..•Õ 0001A0
 19FE06FF 9005EB1A 0006FF07 754006C4 8309C900 A49A0676 FF53190C 36FF1UEB Š..6É.S.v..É.è..à.àu.....Š....±. 0001C0
 36FF190C 36FF1BEB 507EF608 06768857 75001A00 3E835657 000002C8 90CBC95E ^èù.à...WV.>...uW.v..--PŠ..6É..6 0001E0
```

```
Dump of file SATURN:[PCCOMMON.DUMP.DLL]LOGIN.TMP;1 on 18-APR-1990 10:47:42.39
File ID (721,13,0)   End of file block 28 / Allocated 28

Virtual block number 7 (00000007), 512 (0200) bytes

 19DA1EC4 1E7EC00d 4EC6881A 0006FF04 754006C4 830A3100 A49A186A 36FF190A Ö..6j..Ê.1..á.âu......6N.â~.á.Ö. 000000
 75001A00 3E8304E8 E42A0588 2602478E 2607FF26 3F8B2618 6AA00478 044FFF26 &.O.xå.j.&.?&..&.G.&..*ôŠå.>...u 000020
 36FF22E8 5E75001A 003E830A 76885657 000002C8 CBC95F5E 19FE0601 06468807 ..F...±.^_èùà...WV.v..>...u^Š".6 000040
 0646FF1A 0006FF04 754006C4 830AA300 A49A5098 078A2606 5EC4190A 36FF190C É..6O.á^.Ë...P.Ê.Ê..á.âu......F. 000060
 FF263F88 2619DA1E C4078A26 065EC4CD 78044FFF 2619DA1E C42574C0 084EC688 .6N.át%á.Ö.&.O.xëá^.&..á.Ö.&.?&. 000080
 0CC8CBC9 5F5E19FE 06010A46 88077500 1A003E83 CAEBE42A 05882602 478E2607 .&.G.&..*ôŠb.>...u..F...±.^_èùà. 0000A0
 F476FF52 1A083688 FA4689FC 4689C028 F65689F4 46891A06 16881A04 A1560000 ..VÀ.......F¶.V~+å.F=.F*.6..R.v¶ 0000C0
 18683E83 08E802EE 83057510 18683E83 06762BF0 28F84689 04C48306 DC10709A .p.É..á..F½+Þ+v..>h..u..Ÿ.Š..>h. 0000E0
 8A26F446 FF127530 186A3E83 19752D3F 8026F45E C4227500 19F23E83 4E017508 .u.N.>·..u"á^¶&.?-u..>j.Ou..F¶&. 000100
 831B7400 19F23E83 077EF608 08743018 6A3E83F8 4EFF02C4 83FE71E8 0E509807 ..P.Òq±.á..N%.>j.Ot..-~..>·..t.. 000120
 750019F2 3E830070 E80EFC46 FF077400 18683E83 0066E80E FA46FF07 7400067E ~..t..F*.Òf..>h..t..F=.Òp..>·..u 000140
 0A74001B 683E8300 39E80E04 7500FA7E 830A7400 067E8302 C483FE7E E80E5629 )V.Ò~±.á..-..t..-*.u..Ò9..>h..t. 000160
 740019F2 3E8306C4 83FE85E8 0EF476FF F676FFF8 76FF0040 E80E0475 00FC7E83 .~=.u..Òâ..v½.v~.v¶.Òç±.á..>·..t 000180
 208803E8 00288805 740019E4 3E83CBC9 5E02C483 FE38E80E 56002018 6A06C70E .ú.j. .V.Ò8±.á.^èù.>ö..t.¡+.Š.¡ 0001A0
 740019E0 3E831775 10186B3E 8302C483 FDC8E80E 306AC802 C483FD02 E80E5000 .P.Ò8».á.ùj0.Òà».á..>h..u..>Á..t 0001C0
 0A5EC400 01FE46C7 56570000 06C8C802 C483FDAA E80E5000 788803E8 00588805 .¡X.Š.¡x.P.Ò`».á.ùà...WVúF±..á^. 0001E0

Dump of file SATURN:[PCCOMMON.DUMP.DLL]LOGIN.TMP;1 on 18-APR-1990 10:47:42.39
File ID (721,13,0)   End of file block 28 / Allocated 28

Virtual block number 8 (00000008), 512 (0200) bytes

 75203F80 260A5EC4 9060E80A 46FF0219 F4068337 882619F4 1EC41275 2A3F8026 &.?*u.á.¶.&.7..¶...F.Š'.á^.&.?-u 000000
 19FA3639 3B7F393C 3F7C303C FA468807 8A260A5E 88F6280A 46FFFFFF FE46C708 .úF±...F.+-.^.&...F*<0|?<9.;96*. 000020
 0302E1C1 CE889805 8A26187F 39308026 06E8FB88 0030186A 06C70675 30?C0A75 u.<0u.ú.j.0..«Š.&.=9..&....òëÄ.. 000040
 5EC4F088 EEF7FE46 880C468C 0A7E890F 7D303080 2647F188 30E983C8 03E1. ¹CE öÌÅ.à.Ö0.þG&.=0)Ò.-..F..F±%Ÿ.Þá^ 000060
 C4064E8A FE5E8CFC 46891266 88570000 04C8C8C9 5F5E0C56 880A4688 37892.06 .&.7.F..V.^_èùà...Wif..F=.^±.N.á 000080
 8CFC7E89 9009E8FE 468CFC7E 890001B8 F4750D38 26117400 30802647 01E8FC/E -=Š.G&.=.t.Ë8.u¶¡...-=.F±Š...-=. 0000A0
 1E126E68 1E168BA3 E0865800 00FFFF9A 5016C488 50EC8855 90C8C95F C02BFE46 F±+å_èù.U.$P.á.P.....X.ÀÈ¡..hn.. 0000C0
 0CB10D1A 9A50CB5D E5880001 88098011 CA9A042C E80021E8 0000FFFF 9A126C68 hl......Òl.Ò,..ò...¡...İ]ùP...Ÿ. 0000E0
 47017500 3D80267F FFB9126E 068EFF33 0000B81E 127416FF 00FF680C 8E006E9A .n./.h....t..E..3...n.¿..&.=.u.G 000100
 F788071E 061CE8E7 74AEF2C0 330874CA 88A6F3C8 88D18816 788E3174 00308026 &.=.t1/x..Ì.ùµÌ.òt.3á·ÙtÒŠ.....¼ 000120
 00FC88EC 885500C3 1FEDE8AA C20A0572 412CAC92 04E0C00E 72412CAC 168F8F1F .¢¢.¯,Ar.àÅ..¯,Ar..ò¯ŠÙ.û.U.$¡=. 000140
 8855CB5D E5880024 006E9A50 00FF8816 861EFF04 74001688 3E830CC3 006E9A50 P.n.ù..>...t.....¡..P.n.$..İ]ùU. 000160
 F2FFFFB9 C033970C 74964010 74C238AD 19008E06 5688C08E 088E0090 885756EC $VW¡...Á.á.V./..Ù;òt.â.t..3á¿..· 000180
 88921F74 C0080038 003E9A06 76FF57EC 88550002 CA5DE588 5E5F96EB EBF788AE Û.%ŠŠ._^.İ]ò..U.$W.v..>.8..ât... 0001A0
 E58B5F58 0000FFFF 9A501651 521E5300 028BC488 50490 1F7 AEF2FFFF B9C033FA *3á¿..¯Ù4ÌlP.áÉ..S.RQ.P.....[_.İ 0001C0
 F7000C89 99005E20 C38BFA46 89E42A08 478A2608 5EC45657 000008C8 0002CA5D ]ò..à...WVá^.&.G.*Ò.F*.û-^..¿..¼ 0001E0

Dump of file SATURN:[PCCOMMON.DUMP.DLL]LOGIN.TMP;1 on 18-APR-1990 10:47:42.39
File ID (721,13,0)   End of file block 28 / Allocated 28

Virtual block number 9 (00000009), 512 (0200) bytes

 085EC40F 74400A47 F6260774 830A47F6 26F84689 0C5205E0 01C103E0 01C888F9 *.àIÁ.èIÁ.R..F½&-G..t.&-G.ât.á^. 000000
 000447C7 26200A4F 80260E74 010A47F6 26085EC4 90012BE9 FFFFB820 0A4F8026 &.O. ¡..Ò+..á^.&-G..t.&.O. &ùG.. 000020
 4C750C0A 47F626FC 7689F088 04478926 C028EF0A 67802602 0A4F8026 90E2EB00 .$ã.&.O..&.g.ÿ+ä&.G..Þ.v=&-G..uL 000040
 400A7E81 0775006A 087E8137 75010C52 87F60608 68F9F700 0CB99900 5E20C388 .û·^..¿..%*kÁ.-.R..u7.-.j.u..-.M 000060
 0C75C008 02C4830E C010929A FA76FF0F 7500440A 7E811675 0076087E 810E740E .t..-.v.u..-.D.u..v*...à..á..âu. 000080
 F7000C89 99005E20 C3881575 080A47F6 26085EC4 04C48304 AFE80876 FF0A76FF .v..v.ÒÉ..á.á^.&-G..u..û-^..¿..¼ 0000A0
 89264008 57882606 47882606 77282637 88260 85E 88677401 0C5287F6 06086BF9 *kÁ.-.R..tg.^.&.7&+w.&.G.&.W.â&. 0000C0
 13E09AFA 76FF0677 FF265256 167EF608 04478926 48024588 F87E8802 57892607 .&.W..-½.E.H&.G..--.VR&.w..v*.Á. 0000E0
 0F0113A2 9A53006A 006A026A 0F742016 8F87F6FA 5E8819E8 FC468908 C4830EDE &..á..F=Š..^*-.¢. t.j.j.j.S.Á... 000100
 E09AFA76 FF501606 46805600 018E17E8 07882606 468A065F C426085E C408C483 .á.á^.&á_..F.&..Š./..V.F..P.v*.Á 000120
 28560000 04C8C8C9 5F5EE42A 06468AFE CCE90374 FC7639FC 468908C4 83007813 .x..á..F=9v=t.Òa±.F.*ò^_èùà...V+ 000140
 F9F7000C B999005E 20C38815 75080A47 F6265575 023C0324 0A478A26 065EC4F6 -á^.&.G.$.<.uU&-G..u..û-^..¿..%* 000160
 0877FF26 50287EC0 08FC4689 06472826 07882606 5E883974 010C5287 F6060868 kÁ.-.R..t9.^.&..&+G..F=.â~(P&.w. 000180
 200A4F80 26065EC4 0874FC46 3808C483 0E5713E0 9A50E42A 08478A26 0677FF26 &.w.&.G.*òP.Á.W..á.;F=t.á^.&.O. 0001A0
 C8C95EC6 88000004 47C72602 57892607 89260857 88260647 8826065E C4FFFF8E /..á^.&.G.&.W.&..&.W.&ùG....ó^èù 0001C0
 06468857 5602EC83 EC8855C8 5DE58801 FE4F8026 0574C308 C08C065E C4EC8855 U.$á^..à.ùt.&.O±..İ]ùU.š.š.VW.F. 0001E0
```

```
Dump of file SATURN:[PCCOMMON.DUMP.DLL]LOGIN.TMP;1 on 18-APR-1990 10:47:42.39
File ID (721,13,0)   End of file block 28 / Allocated 28

Virtual block number 10 (0000000A), 512 (0200) bytes

 78E80574 0018E815 750082E8 180AA312 740025E8 08750018 DA3E831E 73FFF130 =þ.s..>ö..u.ö%.t.Eö.ò..u.ò..t.òx 000000
 43065E88 0776065E 3900F088 CB50E588 5E5F02C4 830F6E15 809A0676 FF087500 .u..v....n..á._^.[]ùEþ.9^.v..^.C 000020
 883874FF FA8308C4 830FE917 849A5002 80510E4F 8050501E C033FE5E 89FEE383 .D±.^±3á.PP.O.O̅.P...Õ..á..*.t8. 000040
 0C478948 48000aA3 C033D88E FE5E8800 08A30A8E 0574D20B 18DEA318 DC1687C2 ò..É.È8..@t..OÈ...^±.Ä3âÈ..HH.G. 000060
 064E88C0 8ED88CC3 1FD88C00 06A30000 05000AA3 01478000 02A30000 A3000A88 |..È..È...G.È.....È...Ä.ù.Ä.â.N. 000080
 F7AEF2FF FF89C033 067EC4D7 88EC8855 C3098EC1 8C020805 60E8180E 1E8ED833 3Ù..B.Ò'..@.è.]ÙU.$.ªá~.3â¿..·Ù% 0000A0
 F883117D 16801E38 065E88EC 885507E4 E9008357 56EC8855 00CB50FA 88914901 }I..*]ù.U.$VW*.Õõ.U.$.^.;.§.)..« 0000C0
 1E380872 D82BDC88 5A5900C8 5DE588C0 3302E800 01880574 40168F87 F60C7C00 .|.-.¢.ât.¡..Š.3â.[]ù.YZ.É+Ar.;. 0000E0
 D4885200 028816A6 2EFF5152 F8E6E9C0 33057540 16A6A1C8 5152E388 057216AA `.r..DRQùÀ|.âu.3âÒ|«RQ..|.£..R.â 000100
 02300774 00013040 81127558 C0080000 FFFF9A52 16501653 C4885087 168FA780 .]¢.ñP.áS.P.R......âXu.Ÿâ=..t.=. 000120
 7318EA1E FFD833C2 8C18EE06 C41EE318 EC0E885A D4794816 8F8F0808 81067500 .u.Ÿ...¢.KyâZ..$.D.á.Ÿ..ò3Ù..õ.s 000140
 18F68F18 F68E007C E818F68F 18F68E18 EA1EFF00 0388C28C 18F206C4 01AEE903 .ÕÙ.á.·..òÉ....õ./-.¢-.Ò|./-.¢-. 000160
 8F18E48E D88E0E3F 86C30000 FFFF9A11 57680E01 6A087418 E83018E4 880073E8 Òs.¡ò.=Ò.t.j..hW......ù¡?..Ä/ò.¢ 000180
 8F18E48E 003AE818 6C8F186C BEEC8855 00001152 9A006A00 6A036A00 5i.ª18E8 Ò.ÒQ.j.j.j..R...U.$/l.¢l.Ò:./ò.¢ 0001A0
 8A50C033 001AE818 F68F18F6 8E0023E8 18F68F18 F68EEC88 5503E800 31E.ª8E8 Ò.Ò1.Š.U.$/-.¢-.Ò#./-.¢-.Ò..3âP. 0001C0
 08058804 EF830E73 F738C318 EA1EFF00 028807E3 18EC0E88 0000FFFF 9A50C546 F.P.......$.D.£....õ.ù;%s..ÿ.... 0001E0

Dump of file SATURN:[PCCOMMON.DUMP.DLL]LOGIN.TMP;1 on 18-APR-1990 10:47:42.39
File ID (721,13,0)   End of file block 28 / Allocated 28

Virtual block number 11 (0000000B), 512 (0200) bytes

 6E168800 F0E90375 126E3639 FF28F628 56570000 14C800C3 EEEB1DFF F2740245 E.t·..ŠŸù.à...WV+-+.96n.u.Òþ...n 000000
 123E183A 9A167868 1EF676FF F876FF0C 6AF85689 F64689F2 5689F046 89C02812 .+â.Fþ.V·.F-.V½j..V½.v-.hx..:.>. 000020
 0CE847EA 75003F80 26F646FF F65EC400 8CE90376 7FFFFE81 461974C0 080AC483 .á..ât.F.±..v.ÕŸ.á^-.F-&.?.uõG$. 000040
 124D172C 9A046A50 01458DBA 75003F80 26F65E88 F475003F 8026F646 FFF65EC4 á^-.F-&.?.u¶.^-&.?.uø.E.Pj...,.M. 000060
 6D74EE46 08EC4688 FE5689FC 468902C4 8312830F 859A56EE 5689EC46 8904C483 .á..F$.VŸV.ç....á..F•.V±.F$.FŸtm 000080
 1678681E F076FFF2 76FF0C6A 18C71689 18C5A3EE 5688EC46 886674C2 08FC4688 .F•.òtf.F$.VŸÈé...ú.j..v·.vþ.hx. 0000A0
 04EC4683 02578926 078926FE 5688FC46 88EC5EC4 2C74C008 0AC48310 15183A9A .:....á..ât,á^$.F•.V±&..&.W..F$. 0000C0
 8026F046 FFF05EC4 E8E80E74 C00A0788 26FC46FF FC5EC407 8A26F046 FFF05EC4 á^þ.Fþ&..á^•.F•&...ât.$Òá^þ.Fþ&. 0000E0
 005E8856 000006C8 F9E2E900 028890C8 C95F5EA7 75003F80 26F05EC4 F475003F ?.u¶á^þ&.?.uI^_èù.¡..Òã*à...V¡^. 000100
 744004C4 8311FE0F 1A9A5306 0E74830A 47F626FA 5EC41CE8 F628FC5E 8CFA4689 .F*.^•+-Š.á^*&-G..t..S...±..á.ât 000120
 168A06FF 000004C8 90C8C95E C6880876 FA463912 4E168812 4CA10CFA 46834601 .F.F*.ÀL...N.9F*vA.ó^èù.à....... 000140
 020068FE 5E8CFC46 890C5205 E001C103 E001C888 F9F7000C 8999005E 20044688 .F.-^..¿..¥*.àiÁ.èiÁ.R..F•.^±h.. 000160
 26FC5EC4 080A4F80 26117400 08085789 26064789 26045EC4 02C48312 F90F859A .ç.*..á.á^.&.G.&.W..Àt.&.O..á^•& 000180
 C4085789 26064789 2640FE56 88FC4688 040A4F80 26045EC4 9021E802 000247C7 ùG...$!.á^.&.O...F•.V±â&.G.&.W.á 0001A0
 00000447 C7260257 89260789 26085788 26064788 26045EC4 00010247 C726FC5E ^•&ùG...á^.&.G.&.W.&..&.W.&ùG... 0001C0
 FF53CC88 04EC8305 7CE90570 E9C03300 098A0872 16801E38 065E88EC 8855C3C9 èùW.$.^.;.§.r.¤..3âÕp.Ò|..$..âS. 0001E0

Dump of file SATURN:[PCCOMMON.DUMP.DLL]LOGIN.TMP;1 on 18-APR-1990 10:47:42.39
File ID (721,13,0)   End of file block 28 / Allocated 28

Virtual block number 12 (0000000C), 512 (0200) bytes

 00CB5DE5 88FD168F A78091E1 75C0855A 590000FF FF9A5116 0C76FF08 76FF0A76 v..v..v..Q.....YZ.âuÅ..I¢.».[]ù. 000000
 33531274 20168F87 F6052FE9 C0330009 8A087216 8D1E3806 5E880CEC 83EC8855 U.$.$..^.;.§.r.¤..3âÒ/.-.¢. t.S3 000020
 0856C50A 468EFA5E 8C667480 168F87F6 000013C8 9A5016F4 46805141 415151C9 èQQAAQ.F¶.P.ù...-.¢..tf._^*.F.éV. 000040
 02EC8338 75AEF20A 8049E30C 4E88F866 89F288FA 885657FC FC4689FE 4689C033 3â.F±.F••WV.*.·.f½.N.DI¯.·Ùu;.$. 000060
 E90028E8 F4E2AA1A 74F83800 740A3CAC 0C4E8807 16FA88D4 88E22800 808ADC88 .É¤..+ã.â.*...N.¯<.t.;«t.¯ã¶Ò+.Õ 000080
 0093E9FA 5E8E5F5E E1E80014 E8E2E8FC 46FF0A80 AA001FE8 0375F838 0080009A ..¯.;«u.Ò..`¯..F•$âÒ..$Â^_.^*Õ.. 0000A0
 F4468051 521E5306 5E881FE3 CA28CF88 1F061E51 53501343 10869AFF FC887AE8 $z¡•..Ñ.C.PSQ....ù+ÒD..^.$̄.RQ.F¶ 0000C0
 08C4831F C3FA8858 58591F07 740808FE 5E01F45E 881175C0 08000000 989A5016 .P......âu..^¶.^±.Ùt..Y(X.*û..á. 0000E0
 F6FE5E8E 26E8F900 208A03E8 001C8A08 7500098A 00013000 74006030 1874C008 .ât.=m.t.=..¤..u.¤..$.¤ .*$&.^±- 000100
 28FE4688 06E8F9C0 33001C8A 0EE8F803 751A3F80 085E880A 5E8E0E74 40168F87 .¢.ât..^..^..?.u.½$.¤..3â*$..F±+ 000120
 C51EEEE8 C1880475 C9080C4E 880413E9 C85DE588 0472FA5E 8E5F5EF8 6688FC46 F•.f½^_.^*r..[]ùÒ...N..èu..èŠŸ.é 000140
 8A000130 00740060 301774C0 081F071E 000014A3 9A5016F4 46805152 1E530856 V.S.RQ̄.F¶.P.È.......ât.=m.t.=..¤ 000160
 80260A88 0A744016 8F87F687 75C008F4 4688C2E8 00208AC7 E8001C8A CC750009 ..uao..Šùo .$ò.F¶.âuñ-.¢.ât..O&. 000180
 C85DE588 01FE4F80 0474D808 065E88EC 885500A3 E8C03300 1C8AA6E8 02751A3F ?.u.$|¤..3â$È.U.$.^..Ùt..O±..[]ù 0001A0
 A3FE2440 24E899C0 33057501 76E80005 88071E29 75003F83 18008857 56EC8855 U.$VWEÀ..?.u)..¡..Òv.u.3â.$$â$±È 0001C0
 0009E8C0 8ED88C06 4E881806 3689FFFE FE44C704 C6830001 04C79618 D2A31800 À.È0..ú....ó.ùD±±..6ø..N..A.âO.. 0001E0
```

```
Dump of file SATURN:[PCCOMMON.DUMP.DLL]LOGIN.TMP;1 on 18-APR-1990 10:47:42.39
File ID (721,13,0)   End of file block 28 / Allocated 28

Virtual block number 13 (00000000), 512 (0200) bytes

 48437401 ABFE88AD FC027788 F273EEF9 83FEE180 FA744100 D0E9C85D E5885E5F _^.I]ùÕÅ.At•.Å±.•Ys·.w.•Ù.±´.tCH 000000
 89F9030C 74FE88E0 EBFE4489 F7880002 05C20335 7401A8AD F0030088 1573C138 ;és..Å.ÞÙ´.t5.ô....¥.D±$].±t..•. 000020
 7F89180E 1E8C2605 74D13B11 5889DA8C C688FE4C FEF90305 E8058948 C128FE4C L±•èH..Š..•±L±.6.Ö¿X.;]t.&..ß... 000040
 03D0888C 73C13848 FE88F274 01A8ADF0 03FE8825 74FFFE30 0218E206 C626C302 .ù&ó.â..=±.t%.±.ÞÙ´.t´.±N;ès¥.Å. 000060
 0EFE2615 E8D88E04 74C00808 4788E6E8 FE4489F7 88000205 C203E274 01A8ADF0 ÞÙ´.tã.ó....¥.D±$].G..ât..ÅŠ.&±. 000080
 C63B0068 E8C03306 778888E8 3788180A 1E8E2605 74C73816 138FD88C 127418E2 ã.t..Å¢..;ût.&..Ö..7$E.w.3âÖk.;6 0000A0
 C13B1667 B9D88C98 E84E4E96 0574001D E8FE4DFE 0074005F E8984040 01240074 t.$.ªª.Ò_.t.±M±Ò..t..NN$..Ä¿g.;é 0000C0
 267FFFBA 414149C8 28037401 A8FE4588 51C399C0 33024789 0788180E A3260474 t.&Èß....G.3â.ûQ.E±´.t.•àIAA¤..& 0000E0
 F7087500 0CE8C628 C22302F7 0072C203 1572C603 C188F575 EAD10476 18E0163B ;.Å.v.ìõu%.é.ór..ór.%@#ö•6Ò..u.% 000100
 88067789 FFFEFE44 C7F203F0 88FE8857 18740010 E85152C3 59C033E5 75EAD1D2 @ìõu[3âYûRQÒ..t.W.±.Þ.´ûD±±..w.. 000120
 C4831488 17849A1F 06500001 88505252 1ED23350 53C35A59 58FE5589 4AD72806 ø•øJ.U±XYZûSP3@.RRP¦..P........á 000140
 1759198A 9A0676FF 006A0876 FF006A56 00000AC8 C3020802 745B5A1F FFFA8308 ..•..Z[t..@ùà...Vj..v.j..v..¤.Y. 000160
 468902C4 8317720F 859A56F8 7688902F E899C028 0674FFFF C2F7FA56 89F84689 .F%.V•%ó..t.•á.$/..v%V.ç.r..é..F 000180
 FE5688FC 46889007 E808C483 171C1972 9A50FE76 FF006A56 1274D008 FE5689FC •.V±.Åt.Vj..v±P.r....ó.Š...F•.V± 0001A0
 720057E8 07754806 46880856 881276BF 3875000A 7E830657 56EC8855 90C8C95E ^èù.U.šVW..-..uß¢v..V..F.Hu.ÒW.r 0001C0
 FE8104C6 8334735E 003EE856 0E468902 44880074 F7381174 48167636 884CE827 'ŠL.6v.Ht.;¥t..D..F.VÒ>.^s4.6..± 0001E0

Dump of file SATURN:[PCCOMMON.DUMP.DLL]LOGIN.TMP;1 on 18-APR-1990 10:47:42.39
File ID (721,13,0)   End of file block 28 / Allocated 28

Virtual block number 14 (0000000E), 512 (0200) bytes

 C085F958 0000FFFF 9A50C033 501652C4 885021E8 99FFFF88 06750208 04731676 v.s..@u.¡...$!P.6R.P3âP.....[•.á 000000
 0C74024C 39F7880E 4E88C85D E5885E5F 07C03303 88167636 89025C89 1489E675 ul...\..6v..Æ3à._^.I]ù.N..%9L.t. 000020
 13731270 1E390675 F738C18E D3882672 1C030A88 2CE8F9F2 751676FE 8104C683 .6..±v.u •Š,.Ö..r&.Æ.è;¥u.9.p.s. 000040
 1E5657EC 885500C3 01880487 92127016 890475F7 380E75C0 850000FF FF9A5153 SQ......àuß;¥u...p.....ìù.U.šWV. 000060
 C933FF44 8AA6F30A 76C5FE88 C80309F7 AEF2C033 F788067E C4098827 E30E4E88 .N.D'.16-..%3à·Ù%).ù.±év.µ].D.3è 000080
 1E085688 0646880E 4E8800C8 50E5885F 5E1FC188 D1F74949 04740477 FF453A26 &:E.w.t.II%ï.ë.^_.I]ù_.N..F..V.. 0000A0
 88DAF700 D28308F7 AA20800A 79D2080E 750AF983 1374C00A 93FC071E 570A7EC5 é~.W..•..ât..•.u..@y.¯·¯%Ù.@.%Ö. 0000C0
 88E275C3 08C288AA 27040276 393C3004 D38792F1 F793F1F7 0274C008 D23392F7 %.3@.ât.%þ.%þ..Æ.0<9v..'¯.ô.ûuã. 0000E0
 02030202 160100C8 50E5885E 5F1F580A 8CF272C7 38014480 FF448805 86AC4F05 .O¯...D..D.;úr·.ÒX._^.I]ù....... 000100
 00410235 02121211 0010120F 1600160C 0808070A 0C090C08 0C070906 00051804 ..........................5.A. 000120
 02CE08A4 00840982 0A810A80 16060972 1C702060 006C0859 00570053 00520243 C.R.S.W.Y.l.m p.r...........Ê.ö. 000140
 C850E588 99FFFF88 0008E8C8 50E58899 FFFF8816 84168916 88A31608 000008D7 ø.....ÈÈ...Ç.¡....I]ùÒ..¡....I]ù 000160
 3C430A76 243C0472 133CF7E2 43431674 073A2E18 75E40A00 2489180A 881688A3 ÈE.EO.¿$..ôu..:..t.CCã%<.r.<$v.C< 000180
 D788067E C45738E3 0C4E88EC 885500C3 1684A398 01478A2E 430176CA 3C04728C ¥r.<òv.C..G..ÈÇ.ú.U.š.N.D8Wá~..ø 0001A0
 E3D187AA F3C913AB F3E9D1E0 8A0A4688 D1280187 01030323 0818012B 0C74DAF7 %Ot.•ì.Ù#Æ.ì.ì•ì.F..ÅiÒµ¨.èµ´.ìD 0001C0
 08468BEC 8855CB5D 38568806 46885FAA F3C913AB F3E9D1C3 8EFFFFC3 81C38C10 ..ù.ù...ùiÒµ¨.èµ´_.F..V.]ùU.š.F. 0001E0

Dump of file SATURN:[PCCOMMON.DUMP.DLL]LOGIN.TMP;1 on 18-APR-1990 10:47:42.39
File ID (721,13,0)   End of file block 28 / Allocated 28

Virtual block number 15 (0000000F), 512 (0200) bytes

 030C66F7 064688C8 88E3F700 08CA5DE5 88E3F706 46880875 0A5E8808 080C5E88 .^..Å.^.u..F.%D.[]ò..%D.à.F.%f.. 000000
 03000500 0111A401 03000000 02173E00 02000C08 CA5DE588 D103E3F7 064688C8 à.F.%D.ì.[]ò.....>.......É...... 000020
 03002200 01170801 03008800 0119A501 05000000 04169C00 02000700 01116C01 .l................É.......Ä...".. 000040
 03004D00 0110EE01 03003A00 01140C01 03002100 03152C02 03002600 01182301 .#...&...,...!.......:...Y...M.. 000060
 542D6E75 5220534D 00000000 00000000 00005C00 010C9101 03005800 010CA401 .É...[.......\..........MS Run-T 000080
 38383931 20296328 20746867 69727970 6F43202D 20797261 7262694C 20656D69 ime Library - Copyright (c) 1988 0000A0
 6E69676F 6C206E6F 20726F72 72650011 70726F43 2074666F 736F7263 694D202C , Microsoft Corp..error on login 0000C0
 00000000 00000001 FFFF0002 00000066 00020000 0A642520 3A657461 65726320  create: %d.....f............... 0000E0
 00000000 00000000 00000000 00000202 00000000 00000000 00000102 00000000 ................................ 000100
 00000000 00000000 00000000 00000000 00000000 00000000 00000000 00000000 ................................ 000120
 00000000 00000000 00000000 00000000 00000000 00000000 00000000 00000000 ................................ 000140
 00000000 00000000 00000000 00000000 00000000 00000000 00000000 00000000 ................................ 000160
 00000000 00000000 00000000 00000000 00000000 00000000 00000000 00000000 ................................ 000180
 00000000 00000000 00000000 00000000 00000000 00000000 00000000 00000000 ................................ 0001A0
 00000000 00000000 00000000 00000000 00000000 00000000 00000000 00000000 ................................ 0001C0
 00000000 00000000 00000000 00000000 00000000 00000000 00000000 00000000 ................................ 0001E0
```

```
Dump of file SATURN:[PCCOMMON.DUMP.DLL]LOGIN.TMP;1 on 18-APR-1990 10:47:42.39
File ID (721,13,0)   End of file block 28 / Allocated 28

Virtual block number 16 (00000010), 512 (0200) bytes

00000000 00000000 00000000 00000000 00000000 00000000 00000000 00000000 ................................ 000000
00000000 00000000 00000000 00000000 00000000 00000000 00000000 00000000 ................................ 000020
00000000 00000000 00000000 00000000 00000000 00000000 00000000 00000000 ................................ 000040
00000000 00000000 00000000 00000000 00000000 00000000 00000000 00000000 ................................ 000060
00000000 00000000 00000000 00000000 00000000 00000000 00000000 00000000 ................................ 000080
00000000 00000000 00000000 00000000 00000000 00000000 00000000 00000000 ................................ 0000A0
00000000 00000000 00000000 00000000 00000000 00000000 00000000 00000000 ................................ 0000C0
00000000 00000000 00000000 00000000 00000000 00000000 00000000 00000000 ................................ 0000E0
00000000 00000000 00000000 00000000 00000000 00000000 00000000 00000000 ................................ 000100
00000000 00000000 00000000 00000000 00000000 00000000 00000000 00000000 ................................ 000120
00000000 00000000 00000000 00000000 00000000 00000000 00000000 00000000 ................................ 000140
00000000 00000000 00000000 00000000 00000000 00000000 00000000 00000000 ................................ 000160
00000000 00000000 00000000 00000000 00000000 00000000 00000000 00000000 ................................ 000180
00000000 00000000 00000000 00000000 00000000 00000000 00000000 00000000 ................................ 0001A0
00000000 00000000 00000000 00000000 00000000 00000000 00000000 00000000 ................................ 0001C0
00000000 00000000 00000000 00000000 00000000 00000000 00000000 00000000 ................................ 0001E0

Dump of file SATURN:[PCCOMMON.DUMP.DLL]LOGIN.TMP;1 on 18-APR-1990 10:47:42.39
File ID (721,13,0)   End of file block 28 / Allocated 28

Virtual block number 17 (00000011), 512 (0200) bytes

00000000 00000000 00000000 00000000 00000000 00000000 00000000 00000000 ................................ 000000
00000000 00000000 00000000 00000000 00000000 00000000 00000000 00000000 ................................ 000020
00000000 00000000 00000000 00000000 00000000 00000000 00000000 00000000 ................................ 000040
00000000 00000000 00000000 00000000 00000000 00000000 00000000 00000000 ................................ 000060
00000000 00000000 00000000 00000000 00000000 00000000 00000000 00000000 ................................ 000080
00000000 00000000 00000000 00000000 00000000 00000000 00000000 00000000 ................................ 0000A0
00000000 00000000 00000000 00000000 00000000 00000000 00000000 00000000 ................................ 0000C0
00000000 00000000 00000000 00000000 00000000 00000000 00000000 00000000 ................................ 0000E0
00000000 00000000 00000000 00000000 00000000 00000000 00000000 00000000 ................................ 000100
00000000 00000000 00000000 00000000 00000000 00000000 00000000 00000000 ................................ 000120
00000000 00000000 00000000 00000000 00000000 00000000 00000000 00000000 ................................ 000140
00000000 00000000 00000000 00000000 00000000 00000000 00000000 00000000 ................................ 000160
00000000 00000000 00000000 00000000 00000000 00000000 00000000 00000000 ................................ 000180
00000000 00000000 00000000 00000000 00000000 00000000 00000000 00000000 ................................ 0001A0
00000000 00000000 00000000 00000000 00000000 00000000 00000000 00000000 ................................ 0001C0
00000000 00000000 00000000 00000000 00000000 00000000 00000000 00000000 ................................ 0001E0

Dump of file SATURN:[PCCOMMON.DUMP.DLL]LOGIN.TMP;1 on 18-APR-1990 10:47:42.39
File ID (721,13,0)   End of file block 28 / Allocated 28

Virtual block number 18 (00000012), 512 (0200) bytes

00000000 00000000 00000000 00000000 00000000 00000000 00000000 00000000 ................................ 000000
00000000 00000000 00000000 00000000 00000000 00000000 00000000 00000000 ................................ 000020
00000000 00000000 00000000 00000000 00000000 00000000 00000000 00000000 ................................ 000040
00000000 00000000 00000000 00000000 00000000 00000000 00000000 00000000 ................................ 000060
00000000 00000000 00000000 00000000 00000000 00000000 00000000 00000000 ................................ 000080
00000000 00000000 00000000 00000000 00000000 00000000 00000000 00000000 ................................ 0000A0
00000000 00000000 00000000 00000000 00000000 00000000 00000000 00000000 ................................ 0000C0
00000000 00000000 00000000 00000000 00000000 00000000 00000000 00000000 ................................ 0000E0
00000000 00000000 00000000 00000000 00000000 00000000 00000000 00000000 ................................ 000100
00000000 00000000 00000000 00000000 00000000 00000000 00000000 00000000 ................................ 000120
00000000 00000000 00000000 00000000 00000000 00000000 00000000 00000000 ................................ 000140
00000000 00000000 00000000 00000000 00000000 00000000 00000000 00000000 ................................ 000160
00000000 00000000 00000000 00000000 00000000 00000000 00000000 00000000 ................................ 000180
00000000 00000000 00000000 00000000 00000000 00000000 00000000 00000000 ................................ 0001A0
00000000 00000000 00000000 00000000 00000000 00000000 00000000 00000000 ................................ 0001C0
00000000 00000000 00000000 00000000 00000000 00000000 00000000 00000000 ................................ 0001E0
```

```
Dump of file SATU. :[PCCOMMON.DUMP.DLL]LOGIN.TMP;1 on 18-APR-1990 10:47:42.39
File ID (721,13,0)   End of file block 28 / Allocated 28

Virtual block number 19 (00000013), 512 (0200) bytes

 00000000 00000000 00000000 00000000 00000000 00000000 00000000 00000000 ................................ 000000
 00000000 00000000 00000000 00000000 00000000 00000000 00000000 00000000 ................................ 000020
 00000000 00000000 00000000 00000000 00000000 00000000 00000000 00000000 ................................ 000040
 00000000 00000000 00000000 00000000 00000000 00000000 00000000 00000000 ................................ 000060
 00000000 00000000 00000000 00000000 00000000 00000000 00000000 00000000 ................................ 000080
 00000000 00000000 00000000 00000000 00000000 00000000 00000000 00000000 ................................ 0000A0
 00000000 00000000 00000000 00000000 00000000 00000000 00000000 00000000 ................................ 0000C0
 00000000 00000000 00000000 00000000 00000000 00000000 00000000 00000000 ................................ 0000E0
 00000000 00000000 00000000 00000000 00000000 00000000 00000000 00000000 ................................ 000100
 00000000 00000000 00000000 00000000 00000000 00000000 00000000 00000000 ................................ 000120
 00000000 00000000 00000000 00000000 00000000 00000000 00000000 00000000 ................................ 000140
 00000000 00000000 00000000 00000000 00000000 00000000 00000000 00000000 ................................ 000160
 00000000 00000000 00000000 00000000 00000000 00000000 00000000 00000000 ................................ 000180
 00000000 00000000 00000000 00000000 00000000 00000000 00000000 00000000 ................................ 0001A0
 00000000 00000000 00000000 00000000 00000000 00000000 00000000 00000000 ................................ 0001C0
 00000000 00000000 00000000 00000000 00000000 00000000 00000000 00000000 ................................ 0001E0

Dump of file SATURN:[PCCOMMON.DUMP.DLL]LOGIN.TMP;1 on 18-APR-1990 10:47:42.39
File ID (721,13,0)   End of file block 28 / Allocated 28

Virtual block number 20 (00000014), 512 (0200) bytes

 00000000 00000000 00000000 00000000 00000000 00000000 00000000 00000000 ................................ 000000
 00000000 00000000 00000000 00000000 00000000 00000000 00000000 00000000 ................................ 000020
 00000000 00000000 00000000 00000000 00000000 00000000 00000000 00000000 ................................ 000040
 00000000 00000000 00000000 00000000 00000000 00000000 00000000 00000000 ................................ 000060
 00000000 00000000 00000000 00000000 00000000 00000000 00000000 00000000 ................................ 000080
 00000000 00000000 00000000 00000000 00000000 00000000 00000000 00000000 ................................ 0000A0
 00000000 00000000 00000000 00000000 00000000 00000000 00000000 00000000 ................................ 0000C0
 00000000 00000000 00000000 00000000 00000000 00000000 00000000 00000000 ................................ 0000E0
 00000000 00000000 00000000 00000000 00000000 00000000 00000000 00000000 ................................ 000100
 00000000 00000000 00000000 00000000 00000000 00000000 00000000 00000000 ................................ 000120
 00000000 00000000 00000000 00000000 00000000 00000000 00000000 00000000 ................................ 000140
 00000000 00000000 00000000 00000000 00000000 00000000 00000000 00000000 ................................ 000160
 00000000 00000000 00000000 00000000 00000000 00000000 00000000 00000000 ................................ 000180
 00000000 00000000 00000000 00000000 00000000 00000000 00000000 00000000 ................................ 0001A0
 00000000 00000000 00000000 00000000 00000000 00000000 00000000 00000000 ................................ 0001C0
 00000000 00000000 00000000 00000000 00000000 00000000 00000000 00000000 ................................ 0001E0

Dump of file SATURN:[PCCOMMON.DUMP.DLL]LOGIN.TMP;1 on 18-APR-1990 10:47:42.39
File ID (721,13,0)   End of file block 28 / Allocated 28

Virtual block number 21 (00000015), 512 (0200) bytes

 00000000 00000000 00000000 00000000 00000000 00000000 00000000 00000000 ................................ 000000
 00000000 00000000 00000000 00000000 00000000 00000000 00000000 00000000 ................................ 000020
 00000000 00000000 00000000 00000000 00000000 00000000 00000000 00000000 ................................ 000040
 00000000 00000000 00000000 00000000 00000000 00000000 00000000 00000000 ................................ 000060
 00000000 00000000 00000000 00000000 00000000 00000000 00000000 00000000 ................................ 000080
 00000000 00000000 00000000 00000000 00000000 00000000 00000000 00000000 ................................ 0000A0
 00000000 00000000 00000000 00000000 00000000 00000000 00000000 00000000 ................................ 0000C0
 00000000 00000000 00000000 00000000 00000000 00000000 00000200 00010000 ................................ 0000E0
 00000000 00000000 00000000 00000000 00000000 00000000 00000000 00000000 ................................ 000100
 00000000 00000000 00000000 00000000 00000000 00000000 00000000 00000000 ................................ 000120
 00000000 00000000 00000000 00000000 00000000 00000000 00000000 00000000 ................................ 000140
 00000000 00000000 00000000 00000000 00000000 00000000 00000000 00000000 ................................ 000160
 00000000 00000000 00000000 00000000 00000000 00000000 00000000 00000000 ................................ 000180
 00000000 00000000 00000000 00000000 00000000 00000000 00000000 00000000 ................................ 0001A0
 00000000 00000000 00000000 00000000 00000000 00000000 00000000 00000000 ................................ 0001C0
 00000000 00000000 00000000 00000000 00000000 00000000 00000000 00000000 ................................ 0001E0
```

```
Dump of file SATURN:[PCCOMMON.DUMP.DLL]LOGIN.TMP;1 on 18-APR-1990 10:47:42.39
File ID (721,13,0)    End of file block 28 / Allocated 28

Virtual block number 22 (00000016), 512 (0200) bytes

00000000 00000000 00000000 00000000 00000000 00000000 00000000 00000000 ................................ 000000
00000000 00000000 00000000 00000000 00000000 00000000 00000000 00000000 ................................ 000020
00000000 00000000 00000000 00000000 00000000 00000000 00000000 00000000 ................................ 000040
00000000 00000000 00000000 00000000 00000000 00000000 00000000 00000000 ................................ 000060
00000000 00000000 00000000 00000000 00000000 00000000 00000000 00000000 ................................ 000080
00000000 00000000 00000000 00000000 00000000 00000000 00000000 00000000 ................................ 0000A0
00000000 00000000 00000000 00000000 00000000 00000000 00000000 00000000 ................................ 0000C0
00000000 00000000 00000000 00000000 00000000 00000000 00000000 00000000 ................................ 0000E0
00000000 00000000 00000000 00000000 00000000 00000000 00000000 00000000 ................................ 000100
00000000 00000000 00000000 00000000 00000000 00000000 00000000 00000000 ................................ 000120
00000000 00000000 00000000 00000000 00000000 00000000 00000000 00000000 ................................ 000140
00000000 00000000 00000000 00000000 00000000 00000000 00000000 00000000 ................................ 000160
00000000 00000000 00000000 00000000 00000000 00000000 00000000 00000000 ................................ 000180
00000000 00000000 00000000 00000000 00000000 00000000 00000000 00000000 ................................ 0001A0
00000000 00000000 00000000 00000000 00000000 00000000 00000000 00000000 ................................ 0001C0
00000000 00000000 00000000 00000000 00000000 00000000 00000000 00000000 ................................ 0001E0

Dump of file SATURN:[PCCOMMON.DUMP.DLL]LOGIN.TMP;1 on 18-APR-1990 10:47:42.39
File ID (721,13,0)    End of file block 28 / Allocated 28

Virtual block number 23 (00000017), 512 (0200) bytes

00000000 00000000 00000000 00000000 00000000 00000000 00000000 00000000 ................................ 000000
00000000 00000000 00000000 00000000 00000000 00000000 00000000 00000000 ................................ 000020
00000000 00000000 00000000 00000000 00000000 00000000 00000000 00000000 ................................ 000040
00000000 00000000 00000000 00000000 00000000 00000000 00000000 00000000 ................................ 000060
00000000 00000000 00000000 00000000 00000000 00000000 00000000 00000000 ................................ 000080
00000000 00000000 00000000 00000000 00000000 00000000 00000000 00000000 ................................ 0000A0
00000000 00000000 00000000 00000000 00000000 00000000 00000000 00000000 ................................ 0000C0
00000000 00000000 00000000 00000000 00000000 00000000 00000000 00000000 ................................ 0000E0
00000000 00000000 00000000 00000000 00000000 00000000 00000000 00000000 ................................ 000100
00000000 00000000 00000000 00000000 00000000 00000000 00000000 00000000 ................................ 000120
00000000 00000000 00000000 00000000 00000000 00000000 00000000 00000000 ................................ 000140
00000000 00000000 00000000 00000000 00000000 00000000 00000000 00000000 ................................ 000160
00000000 00000000 00000000 00000000 00000000 00000000 00000000 00000000 ................................ 000180
00000000 00000000 00000000 00000000 00000000 00000000 00000000 00000000 ................................ 0001A0
00000000 00000000 00000000 00000000 00000000 00000000 00000000 00000000 ................................ 0001C0
00000000 00000000 00000000 00000000 00000000 00000000 00000000 00000000 ................................ 0001E0

Dump of file SATURN:[PCCOMMON.DUMP.DLL]LOGIN.TMP;1 on 18-APR-1990 10:47:42.39
File ID (721,13,0)    End of file block 28 / Allocated 28

Virtual block number 24 (00000018), 512 (0200) bytes

00000000 00000000 00000000 00000000 00000000 00000000 00000000 00000000 ................................ 000000
00000000 00000000 00000000 00000000 00000000 00000000 00000000 00000000 ................................ 000020
00000000 00000000 00000000 00000000 00000000 00000000 00000000 00000000 ................................ 000040
00000000 00000000 00000000 00000000 00000000 00000000 00000000 00000000 ................................ 000060
00000000 00000000 00000000 00000000 00000000 00000000 00000000 00000000 ................................ 000080
00000000 00000000 00000000 00000000 00000000 00000000 00000000 00000000 ................................ 0000A0
FFFF0C46 00000000 00000000 00000000 00000000 00000000 00000000 00000000 ............................F... 0000C0
00000000 00002320 20280029 6C6C756E 2800296C 6C756E28 00000000 00000000 ........(null).(null).+- #...... 0000E0
00000000 00000000 00000000 00000000 00000000 000018F6 18701187 18701870 p.p...p.-....................... 000100
00000000 00000000 00000000 00000000 00000000 00000000 00000000 00000000 ................................ 000120
00000000 00000000 00000000 00000000 00000000 00000000 00000000 00000000 ................................ 000140
00000000 00000000 00000000 00000000 00000000 00000000 00000000 00000000 ................................ 000160
00000000 00000000 00000000 00000000 00000000 00000000 00000000 00000000 ................................ 000180
00000000 00000000 00000000 00000000 00000000 00000000 00000000 00000000 ................................ 0001A0
00000000 00000000 00000000 00000000 00000000 00000000 00000000 00000000 ................................ 0001C0
00000000 00000000 00000000 00000000 00000000 00000000 00000000 00000000 ................................ 0001E0
```

```
Dump of file SATURN:[PCCOMMON.DUMP.DLL]LOGIN.TMP;1 on 18-APR-1990 10:47:42.39
File ID (721,13,0)   End of file block 28 / Allocated 28

Virtual block number 25 (00000019), 512 (0200) bytes

00000000 00000000 00000000 00000000 00000000 00000000 00000000 00000010 ................................ 000000
00000000 00000000 00000000 00000000 00000000 00000000 00000000 00000000 ................................ 000020
00000000 00000000 00000000 00000000 00000000 00000000 00000000 00000000 ................................ 000040
00000000 00000000 00000000 00000000 00000000 00000000 00000000 00000000 ................................ 000060
00000000 00000000 00000000 00000000 00000000 00000000 00000000 00000000 ................................ 000080
00000000 00000000 00000000 00000000 00000000 00000000 00000000 00000000 ................................ 0000A0
00000000 00000000 00000000 00000000 00000000 00000000 00000000 00000000 ................................ 0000C0
00000000 00000000 00000000 00000000 00000000 00000000 00000000 00000000 ................................ 0000E0
00000000 00000000 00000000 00000000 00000000 00000000 00000000 00000000 ................................ 000100
00000000 00000000 00000000 00000000 00000000 00000000 00000000 00000000 ................................ 000120
00000000 00000000 00000000 00000000 00000000 00000000 00000000 00000000 ................................ 000140
00000000 00000000 00000000 00000000 00000000 00000000 00000000 00000000 ................................ 000160
00000000 00000000 00000000 00000000 00000000 00000000 00000000 00000000 ................................ 000180
00000000 00000000 00000000 00000000 00000000 00000000 00000000 00000000 ................................ 0001A0
00000000 00000000 00000000 00000000 00000000 00000000 00000000 00000000 ................................ 0001C0
00000000 00000000 00000000 00000000 00000000 00000000 00000000 00000000 ................................ 0001E0

Dump of file SATURN:[PCCOMMON.DUMP.DLL]LOGIN.TMP;1 on 18-APR-1990 10:47:42.39
File ID (721,13,0)   End of file block 28 / Allocated 28

Virtual block number 26 (0000001A), 512 (0200) bytes

00000000 00000000 00000000 00000000 00000000 00000000 00000000 00000000 ................................ 000000
00000000 00000000 00000000 00000000 00000000 00000000 00000000 00000000 ................................ 000020
00000000 00000000 00000000 00000000 00000000 00000000 00000000 00000000 ................................ 000040
00000000 00000000 00000000 00000000 00000000 00000000 00000000 00000000 ................................ 000060
00000000 00000000 00000000 00000000 00000000 00000000 00000000 00000000 ................................ 000080
00000000 00000000 00000000 00000000 00000000 00000000 00000000 00000000 ................................ 0000A0
00000000 00000000 00000000 00000000 00000000 00000000 00000000 00000000 ................................ 0000C0
00000000 00000000 00000000 00000000 00000000 00000000 00000000 00000000 ................................ 0000E0
18E612D2 00000000 0000003D 4F464E49 5F454C49 465F435F 12760000 00000000 ......v._C_FILE_INFO=.........1. 000100
00000000 0200FFFF FFFF0101 00000000 169A12D2 169612D2 169212D2 168E12D2 ................................ 000120
00000000 00000000 00000000 00008181 81010000 00010000 00000000 00000000 ................................ 000140
00000000 00000000 00000000 00000000 00000000 00000000 00000000 00000000 ................................ 000160
00000000 00000000 00000000 00000000 00000000 00000000 00000000 00000000 ................................ 000180
00000000 00000000 00000000 00000000 00000000 00000000 00000000 00000000 ................................ 0001A0
00000000 00000000 00000000 00000000 00000000 00000000 00000000 00000000 ................................ 0001C0
00000000 00000000 00000000 00000000 00000000 00000000 00000000 00000000 ................................ 0001E0

Dump of file SATURN:[PCCOMMON.DUMP.DLL]LOGIN.TMP;1 on 18-APR-1990 10:47:42.39
File ID (721,13,0)   End of file block 28 / Allocated 28

Virtual block number 27 (0000001B), 512 (0200) bytes

00000000 00000000 00000000 00000000 00000000 00000000 00000000 00000000 ................................ 000000
00000000 00000000 00000000 00000000 00000000 00000000 00000000 00000000 ................................ 000020
0A0A0A0A 0A0A0A0A 0A0A0A0A 0A0A0A0A 0A000000 00000000 00000000 00000000 ................................ 000040
0A0A0A0A 0A0A0A0A 0A0A0A0A 0A0A0A0A 0A0A0A0A 0A0A0A0A 0A0A0A0A 0A0A0A0A ................................ 000060
0A0A0A0A 0A0A0A0A 0A0A0A0A 0A0A0A0A 0A0A0A0A 0A0A0A0A 0A0A0A0A 0A0A0A0A ................................ 000080
0A0A0A0A 0A0A0A0A 0A0A0A0A 0A0A0A0A 0A0A0A0A 0A0A0A0A 0A0A0A0A 0A0A0A0A ................................ 0000A0
0A0A0A0A 0A0A0A0A 0A0A0A0A 0A0A0A0A 0A0A0A0A 0A0A0A0A 0A0A0A0A 0A0A0A0A ................................ 0000C0
0A0A0A0A 0A0A0A0A 0A0A0A0A 0A0A0A0A 0A0A0A0A 0A0A0A0A 0A0A0A0A 0A0A0A0A ................................ 0000E0
0A0A0A0A 0A0A0A0A 0A0A0A0A 0A0A0A0A 0A0A0A0A 0A0A0A0A 0A0A0A0A 0A0A0A0A ................................ 000100
0A0A0A0A 0A0A0A0A 0A0A0A0A 0A0A0A0A 0A0A0A0A 0A0A0A0A 0A0A0A0A 0A0A0A0A ................................ 000120
00000000 00000000 00000000 00000000 000A0A0A 0A0A0A0A 0A0A0A0A 0A0A0A0A ................................ 000140
00000000 00000000 FFFF12D8 00002000 00000000 00000000 00000000 00000000 .................. ..Ä........... 000160
6B636174 7320200A 00303030 36520000 3E3E4753 4D4E3C3C 124E0000 00000000 ......N.<<NMSG>>..R6000..- stack 000180
64207265 6765746E 6920200A 00333030 36520003 000A0077 6F6C6672 65766F20  overflow.....R6003..- integer d 0001A0
756F6E65 20746F6E 20200A00 38303036 52000800 0A0D3020 79622065 64697669 ivide by 0.....R6008..- not enou 0001C0
39303036 52000900 0A0D7374 6E656D75 67726120 726F6620 65636170 73206867 gh space for arguments.....R6009 0001E0
```

```
Dump of file SATURN:[PCCOMMON.DUMP.DLL]LOGIN.TMP;1 on 18-APR-1990 10:47:42.39
File ID (721,13,0)   End of file block 28 / Allocated 28

Virtual block number 28 (0000001C), 512 (0200) bytes

 6E6F7269 766E6520 726F6620 65636170 73206867 756F6E65 20746F6E 20200A00 ..- not enough space for environ 000000
 00020020 726F7272 65206560 6974206E 757200FF 000A0000 FC000A00 746E6560 ment...*......run-time error ... 000020
 64616F6C 20746F6E 20746E69 6F702067 6E697461 6F6C6620 200A0032 30303652 R6002..- floating point not load 000040
 00041278 00020600 00030060 00020000 0002169E 00020003 FFFFFF00 0A006465 ed..................'.......x... 000060
 00000000 00000000 00000000 00000000 00000000 00000000 00000000 00000000 ................................ 000080
 00000000 00000000 00000000 00000000 00000000 00000000 00000000 00000000 ................................ 0000A0
 00000000 00000000 00000000 00000000 00000000 00000000 00000000 00000000 ................................ 0000C0
 00000000 00000000 00000000 00000000 00000000 00000000 00000000 00000000 ................................ 0000E0
 00000000 00000000 00000000 00000000 00000000 00000000 00000000 00000000 ................................ 000100
 00000000 00000000 00000000 00000000 00000000 00000000 00000000 00000000 ................................ 000120
 00000000 00000000 00000000 00000000 00000000 00000000 00000000 00000000 ................................ 000140
 00000000 00000000 00000000 00000000 00000000 00000000 00000000 00000000 ................................ 000160
 00000000 00000000 00000000 00000000 00000000 00000000 00000000 00000000 ................................ 000180
 00000000 00000000 00000000 00000000 00000000 00000000 00000000 00000000 ................................ 0001A0
 00000000 00000000 00000000 00000000 00000000 00000000 00000000 00000000 ................................ 0001C0
 00000000 00000000 00000000 00000000 00000000 00000000 00000000 00000000 ................................ 0001E0

Dump of file SATURN:[PCCOMMON.DUMP.DLL]LOG.TMP;1 on 18-APR-1990 10:47:37.08
File ID (718,13,0)   End of file block 35 / Allocated 36

Virtual block number 1 (00000001), 512 (0200) bytes

 00000000 00000040 00000000 00000088 0000FFFF 00000004 00000022 01AC5A4D MZ˜.".........¡.......a....... 000000
 00000080 00000000 00000000 00000000 00000000 00000000 00000000 00000000 ................................ 000020
 6F6E6E61 63206D61 72676F72 70207369 685421CD 4C01B821 CD09B400 0EBA1F0E ..¤..Ç.el¡.LeIThis program canno 000040
 00000000 00000024 0A0D0D2E 65646F6D 20534F44 206E6920 6E757220 65622074 t be run in DOS mode....$....... 000060
 00050007 00000000 00030000 00000000 00068009 0086F9A4 000A0146 0505454E NE..F...£¤...................... 000080
 00000000 00000000 00010001 00040000 00000100 00A4009A 007C0078 00400021 !.a.x.|...£.Á.................... 0000A0
 1F9E0F00 1F90008E 000F0F00 000F008C 02BE0F00 02BD0057 03160F00 03160020  .......W.§...ƒ................. 0000C0
 474F4C03 01F40004 012B1EB1 012B043C 2C300F21 1A920291 02020E21 00000000 ....I.......!.D,<.+.Y.+...¶..LOG 0000E0
 0010000A 00010000 02455449 5257474F 4C080001 454C4747 4F54474F 4C090000 ...LOGTOGGLE...LOGWRITE......... 000100
 52455551 4C4D4412 6C6D6403 4E49574D 5005534C 4C414353 4F440800 007C0045 E.|...DOSCALLS.PMWIN.dml.DMLQUER 000120
 4555514C 4D440F45 4C494647 4F4C5445 534C4D44 004544D41 4E4E4749 53454459 YDESIGNNAME.DMLSETLOGFILE.DMLQUE 000140
 4C54550F 474C4445 4C49464B 4349504C 54550E4C 54550345 4C494647 4F4C5952 RYLOGFILE.UTL.UTLPICKFILEDLG.UTL 000160
 544F4F52 4E414D48 43414259 52455551 4C545513 48544150 45534E45 444E4F43 CONDENSEPATH.UTLQUERYBACHMANROOT 000180
 44074554 49525753 4F440845 534F4C43 534F4408 4E45504F 534F4407 4F495303 .SIO.DOSOPEN.DOSCLOSE.DOSWRITE.D 0001A0
 69745520 53554220 6E616D68 63614210 00000289 03000003 01024441 4552534F OSREAD......¿....Bachman BUS Uti 0001C0
 00000000 00000000 00000000 00000000 00006065 74737973 62757320 7974696C lity subsystem.................. 0001E0

Dump of file SATURN:[PCCOMMON.DUMP.DLL]LOG.TMP;1 on 18-APR-1990 10:47:37.08
File ID (718,13,0)   End of file block 35 / Allocated 36

Virtual block num ·r 2 (00000002), 512 (0200) bytes

 00003D00 00FFFF9A 5016FF08 86800676 FF0876FF D88EFFFF 881E5657 0002FCC8 à=..WV.¡...Á.v..v......P.....=.. 000000
 75000030 0000FFFF 9A5016FF 2E868006 76FF0876 FF0287E9 86EB8800 06E90375 u.Ô..¡Š.Ô...v..v......P.....=..u 000020
 01016850 16FD0486 8D01C8E9 0374FF30 8608FF2E 86880268 E986E888 0006E903 .Ô..¡Š.Ôh.......0.t.Ôù....».Ph.. 000040
 8D08C483 00C2016E 9A5016FD 04868000 42681E00 42E90374 00003D00 00FFFF9A .....=..t.ÔB..hB....».P.n.ó..á.. 000060
 09E90374 00FF2CBE 83FF2C86 890000FF FF9A006A 006A5016 98468D50 16FD0486 ..».P.F..Pj.j............ƒ,..t.Ô. 000080
 9A5016FF 34868000 4A681E50 16FF0886 8D00FD04 86C60005 E9037410 9846F600 .-F..t.Ô..ó..»......P.hJ...4..P. 0000A0
 16FF3486 80006A00 5C681E50 16FD0486 8D016A00 6A016A00 6A0CC483 010001B4 Ç....á.j.j.j.j....».P.h\.j...4.. 0000C0
 00B0E901 B5E90000 B800ABE9 FF328688 FF328689 0000FFFF 9A5016FE 06868D50 P...±.P.......2...2.Ô¨.¡..Ôç.Ô§. 0000E0
 64681E00 A0E9FF30 9689FF2E 868908C4 83014500 EA9A5016 FE068680 0062681E .hb....±.P.õ.E..á.......0.Ô...hd 000100
 FE068680 0079681E 005EE900 46E9FE46 88FE4689 FFFF0000 9A5016FE 06868000 ....±.P......F±.F±ÔF.Ô^..hy....± 000120
 9A5016FE 06868000 7B681E00 41E9FF30 9689FF2E 868908C4 83016200 EA9A5016 .P.ö.b..á.......0.ÔA..h(....±.P. 000140
 03750007 300018E9 013AE995 C1B80024 E9FF3096 89FF2E86 8908C483 023400EA ö.4..á.......0.Ô$.¡ê.Ô:.Ô..=..u. 000160
 E90113E9 95C1B800 24E9FFDC E9FFA2E9 03750009 30FFCAE9 03750008 30FFB5E9 Ôç.=..u.Ôò.=..u.ÔÀ.ÔÉ.Ô$.¡ê.Ô..Ô 000180
 32BE83FF DCE9FF30 E9037500 033DFF68 E9037500 023DFF56 E9037500 013D001B ..=..u.ÔV.=..u.Ôk.=..u.Ô=.ÔÉ../2 0001A0
 6A006A00 21E90374 ,F308608 FF2E8688 FEF7E903 7509FE7E 830009E9 037402FF ..t.Ô...~±.u.Ô¼±......0.t.ÔI.j.j 0001C0
 76FF00B4 E995C1B8 0000024F 9A206A00 6A5016FF 34868000 7D681E01 6A006A01 .j.j..h)...4..Pj.j .O...¡ê.ÔÇ..v 0001E0
```

```
Dump of file SATURN:[PCCOMMON.DUMP.DLL]LOG.TMP;1 on 18-APR-1990 10:47:37.08
File ID (718,13,0)   End of file block 35 / Allocated 36

Virtual block number 3 (00000003), 512 (0200) bytes

 E90093E9 86EBB800 06E90375 00003000 00029A9A FF2EB6FF FF30B6FF 0676FF08 ..v..Ñ0..Ñ.......=..u.Ô..¡$.Ô..Ô 000000
 6A006A01 6A006AuC C483027C 01B49A50 169A468D 0096681E 5016FF08 8680008A .......P.h...F..P.Ç.|..á.j.j.j.j 000020
 06E90374 FFFF2CBE 83FF2C86 890000FF FF9A146A 006A00AE 681E5016 9A468001 ..F..P.hÙ.j.j..........,-ƒ,..t.Ô. 000040
 C483FFFF 00109AFF 2EB6FFFF 30B6FF00 38E90374 06FF2CBE 83004BE9 95C18800 .¡è.ÔK..ƒ,..t.Ô;..Ñ0..Ñ........á 000060
 00300000 FFFF9A00 6A006A06 76FF0876 FF0023E9 86EBB800 06E90375 00003004 .=..u.Ô..¡$.Ô#..v..v.j.j......=. 000080
 1E565700 0004C800 04CAC95F 5E1F0000 E9000088 0006E986 EBB80006 E9037500 .u.Ô..¡$.Ô..¡..Ô...^_èò..à...WV. 0000A0
 86EBB800 06E90375 00003000 0000389A 5016FC46 800A76FF 0C76FF08 8E000888 |...Á.v..v..F=.P.ß...=..u.Ô..¡$. 0000C0
 FC76FFFE 76FF0676 FF0876FF 001AE995 C3B80006 E90374FE 460BFC46 8B002BE9 Ô+..F•.F±t.Ô..¡ù.Ô...v..v..v±.v= 0000E0
 00000002 012A0002 000A9000 08CAC95F 5E1F0000 E9000088 08C48300 7A011E9A ...z..á.¡..Ô...^_èò.......•..... 000100
 00880002 01F40103 00000006 02C10002 00000004 03030002 00680004 00610203 ..a...h...........ê.......¶..... 000120
 00480001 008F0103 00350003 02010203 00270003 02000203 00140003 00190203 ..............'...1...5.......K. 000140
 880A4688 D88EFFFF B81E5657 000074C8 00000000 00000000 00490004 00E80203 ..Ò...I.........Èt..WV.¡...Ã.F.. 000160
 3D0000FF FF9A501C 5C468D23 6A0676FF 0876FF00 078C46C7 B65689B4 46890C56 V..FÇ.VÑúF¥...v..v.j#.F..P.....= 000180
 FFFF0184 9A50168E 468000C0 681E5016 8C468D00 5AE90009 880006E9 03750000 ..u.Ô..¡..ÔZ..F..P.hä..Fƒ.P.Ç... 0001A0
 FF2619AE 068EFFFF 68FFFF68 016A006A 016A006A BA568C88 46898E46 800CC483 .á..Fƒ.F¡.V¤j.j.j.j.h..h....Ù.&. 0001C0
 00FFFF9A B076FFB2 76FFB256 89804689 0000FFFF 9A501684 468001F4 68020036 6..h¶..FÇ.P......F .Vý.vý.v ..... 0001E0

Dump of file SATURN:[PCCOMMON.DUMP.DLL]LOG.TMP;1 on 18-APR-1990 10:47:37.08
File ID (718,13,0)   End of file block 35 / Allocated 36

Virtual block number 4 (00000004), 512 (0200) bytes

 0103E90E 468B088E 0008881E 56570000 04C80008 CAC95F5E 1F0000E9 BC468800 ..F¥Ô...^_èò..à...WV.¡...Ã.F.ÔÆ. 000000
 006A1076 FF1276FF 00000129 9A505200 0001229A 006A036A 016A006A 016A006A j.j.j.j.j.j.."...RP.)....v..v.j. 000020
 FC5EC410 76FF1276 FFFE5689 FC468908 56880646 880000FF FF9A0676 FF0876FF .v..v.......F..V..F•.V±.v..v.á^= 000040
 0477FF26 0677FF26 FC5EC401 FE681076 FF1276FF 0000FFFF 9A37FF26 0277FF26 &.w.&.7.......v..v.h±.á^•&.w.&.w. 000060
 017EE900 0001E69A 50520000 010F9A00 6A016A01 6A006A01 6A006A00 00FFFF9A .....j.j.j.j.j.j..Ô...RP.|...Ô-. 000080
 46880160 E9000001 C89A206A 006A0008 681E000D 681E1076 FF1276FF 016A006A j.j..v..v..hï..hÁ.j.j .ù...Ô'..F 0000A0
 00070847 C726FC5E C4FE5689 FC468900 00017C9A 006A1076 FF1276FF 0044E90A .ÔD..v..v.j..|....F•.V±á^•&úG... 0000C0
 E9000808 47C726FC 5EC4FE56 89FC4689 0000FFFF 9A006A10 76FF1276 FF0038E9 Ô8..v..v.j.......F=.V±á^=&úG...Ô 0000E0
 46880100 E9FFE7E9 FFCBE903 75021230 FFB4E903 7502083D 0013E900 16E90019 ..Ô..Ô..=..u.ÔÇ.=..u.Ôù.ÔÔ.Ô...F 000100
 E90000FF FF9A206A 006A00F4 681E00F9 681E1076 FF1276FF 016A006A 008EE90A .Ô..j.j..v..v..h•..h¶.j.j .....Ô 000120
 1076FF12 76FF0000 FFFF9A50 520000FF FF9A006A 036A016A 006A016A 006A008B ..j.j.j.j.j.j......RP......v..v. 000140
 015D9A00 6A1076FF 1276FF00 58E90000 FFFF9A10 76FF1276 FF0000FF FF9A016A j.......v..v......ÔX..v..v.j..]. 000160
 76FF0000 01F39A02 6A1076FF 1276FF00 090847C7 26FC5EC4 FE5689FC 46890000 ...F•.V±á^•&úG....v..v.j..#....v 000180
 E9037500 023DFF88 E9037500 0130001B E9001EE9 0021E900 0001FE9A 1076FF12 ..v..±...Ô1.Ô..Ô..=..u.Ô..=..u.Ô 0001A0
 FF0C76FF 0E76FF10 76FF1276 FFFFA2E9 004EE9FF DFE9FF5A E9037500 033DFFB3 ³.=..u.ÔZ.ÔÔ.ÔN.ÔÅ..v..v..v..v.. 0001C0
 03750022 3DFF23E9 03750020 30002BE9 0037E900 00FFFF9A 0676FF08 76FF0A76 v..v..v......Ô7.Ô+.= .u.Ô#.=".u. 0001E0

Dump of file SATURN:[PCCOMMON.DUMP.DLL]LOG.TMP;1 on 18-APR-1990 10:47:37.08
File ID (718,13,0)   End of file block 35 / Allocated 36

Virtual block number 5 (00000005), 512 (0200) bytes

 0088FFB5 E9FE05E9 03750038 3DFEABE9 03750030 3DFFC5E9 03750029 3DFE90E9 Ô.±=).u.Ôé.=0.u.Ô ±=;.u.Ô.±Ôç.¡. 000000
 03007A00 02007C01 03000000 02006500 0200110E CAC95F5E 1F0000E9 00008A00 .¤..Ô...^_èò.....e.......|...z.. 000020
 03008600 02011101 03000000 04004E00 02007E00 02022A01 03007C00 02008D01 .....|...*...~...N.............. 000040
 03001000 0200F801 03008800 02014701 03000000 0600A600 02000700 02023501 .5.......!.......G.......½...... 000060
 03009E00 02006800 05008300 02027901 03001F00 02020E01 03001E00 02000701 .■...............y...•...h...... 000080
 00000000 00000000 00005800 04002B02 03005C00 0200C401 03005800 02008D01 .§...(...á...\...•...X.......... 0000A0
 00000000 00000000 00000500 02000200 01C80001 B81F0200 3E89D88E FFFFB81E .¡...Á.>...¡..ù................. 0000C0
 B30A47F6 26065EC4 FFFFBE56 000012C8 00000000 00000000 00000000 00000000 .................à...V/..á^.&-G.. 0000E0
 4A2D0646 8BF08B04 C483005A 067C9A53 0600ADE9 0374400A 47F62600 B7E90375 u.Ôñ.&-G.ât.ÔÙ..S.|.Z..á..Þ.F.-J 000100
 C404C483 006C03AA 9A0676FF 0876FFFA 46891142 87B806D8 68F9F700 0C899905 ..¿..¥•kA...B..F•.v..v..˙.l..á.á 000120
 8D011068 1E617400 FA7E8364 7CC00B02 C4830087 110C9A50 E42A0847 8A26065E ^.&.G.*ÔP.É....á..â|d.~•.ta.h... 000140
 1E13745C FE7F8026 FC5EC4FE 568CFC46 89F2468D 08C48300 AB12069A 5016F046 FÞ.P.......á..F .F=.V±á^•&..±\t.. 000160
 FA76FFFC 76FFFE76 FF0A6AFC 4EFF03EB 08C48300 C3016E9A 5016F046 8D011268 h...FÞ.P.n.û..á.Š..N=j..v±.v=.v• 000180
 26065EC4 FFFFBE03 74CC0804 C483FFFF 12589A50 16F0468D 08C48300 D0123C9A .<.Å..á..FÞ.P.X....á..ât./..á^.& 0001A0
 FE76FF1B 74000BFE 5689FC46 89011011 869A0000 04C890CB C95EC68B 00C'47C6 óG....ó^èù.à.........F=.V±.Ât..v± 0001C0
 08C890CB C999C02B 9004E80C C4830034 03F09A06 76FF0876 FF0A76FF 0C76( 50 P.v..v..v..v..Þ.4..á.Š..•à.èù.à. 0001E0
```

```
Dump of file SATURN:[PCCOMMON.DUMP.DLL]LOG.TMP;1 on 18-APR-1990 10:47:37.08
File ID (718,13,0)   End of file block 35 / Allocated 36

Virtual block number 6 (00000006), 512 (0200) bytes

FC76FFF0 8804C463 01520502 9A0676FF 0876FFFC 568CFA46 890E468D 56570000 ..WV.F..F¹.V•.v..v....R..á..Þ.v• 000000
560676FF 0876FFF8 880CC483 01630702 9A0676FF 0876FF0A 76FF0C76 FFFA76FF .v¹.v..v..v..v....c..á..½.v...v.V 000020
AEF2FFFF B9C03306 7EC41EDE 88D788EC 8855C8C9 5F5EC788 06C48300 F105D89A .Ä.þ..á..ú^ èÉU.š.¤.ˆ.á-.3ä¿...Û 000040
740001C6 F7064688 FE870846 8ED88EC0 8CF92801 F7AEF2FF FFB90A7E C4FF758D .u.á-.¿...Ú%i+¹.å.Ä.F..±.F.%ó..t 000060
F84689EC 46805657 000016C8 CB5DC28C 1FFA88F3 88A4F3C9 13A5F3E9 D149A402 .Ë¦ïÕµÊ.èµÊ.µ.¹..ó]ùà...WV.F$.F% 000080
89260647 89260856 88064688 420A47C6 26F85EC4 FE568CFC 46890E46 80FA568C .V¹.F..F•.V±á^½&óG.ß.F..V.&.G.&. 0000A0
02290702 9A53060A 76FF0C76 FFFC76FF 167FFF04 47C72602 57892607 89260857 W.&..&.W.&úG.....v•.v..v..S...). 0000C0
900FEB05 88260247 8E2607FF 263F8826 C02A1278 044FFF26 F85EC4F0 880CC483 .á..Þá^½&.O.x.*ä&.?&..&.G.&..Š.. 0000E0
478A2608 5EC45657 000008C8 CBC95F5E C68806C4 83013602 349A006A 53FA76FF .v¹Sj..4.6..á..ó^_èùà...WVá^.&.G 000100
26F84689 113E05E0 D1C103E0 D1C888F9 F7000C89 99054A20 C388FA46 89E42A08 .*ö.F¹.ù-J..¿..%¹.àïÄ.èïÄ.>..F½& 000120
26085EC4 900128E9 FFFFB820 0A4F8026 085EC40F 74400A47 F6260774 830A47F6 -G..t.&-G.ât.á^.&.O. |..Ô+..á^.& 000140
C02BEF0A 67802602 0A4F8026 90E2EB00 000447C7 26200A4F 80260E74 010A47F6 -G..t.&.O. &úG...Šã.&.O..&.g.ÿ+â 000160
87F60608 68F9F700 0C899905 4A20C388 4C750C0A 47F626FC 7689F088 04478926 &.G..Þ.v•&-G..uL.ù-J..¿..%¹kA.-. 000180
75FFFF0A 7E811675 0562087E 810E7402 D00A7E81 07750556 087E8137 7501113E >..u7.-.V.u..-.ï.t..-.b.u..-...u 0001A0
26085EC4 04C48311 31E80876 FF0A76FF 0C75C008 02C48303 5019309A FA76FF0F ..v¹.0.P..á..âu..v..v.Ò1..á.á^.& 0001C0
88260 85E 88677401 113E87F6 06D868F9 F7000C89 99054A20 C3881575 080A47F6 -G..u..ù-J..¿..%¹kA.->..tg.^.&. 0001E0

Dump of file SATURN:[PCCOMMON.DUMP.DLL]LOG.TMP;1 on 18-APR-1990 10:47:37.08
File ID (718,13,0)   End of file block 35 / Allocated 36

Virtual block number 7 (00000007), 512 (0200) bytes

04478926 48024588 F87E8802 57892607 89264008 57882606 47882606 77282637 7&+w.&.G.&.W.â&..&.W..-½.E.H&.G. 000000
7587F6FA 5E8819E8 FC468908 C483036E 16809AFA 76FF0677 FF265256 167EF608 .--.VR&.w..v¹.¯.n..á..F•Š..^¹-.u 000020
07882606 468A065F C426085E C408C483 039114B4 9A53006A 006A026A 0F742017 . t.j.j.j.S.Ç....á.á^.&á ..F.&.. 000040
CCE90374 FC7639FC 468908C4 8301FE16 809AFA76 FF501606 46805600 018E17E8 Š./..V.F..P.v¹.¯.±..á..F=9v•t.Ôä 000060
262E7408 0A47F626 3574830A 47F62606 5EC40000 00C8C8C9 5F5EE42A 06468AFE ±.F.*ö^_èùà...á^.&-G..tŠ&-G..t.& 000080
57892607 892699C0 28F70A67 8026065E C404C483 02E7183E 9A0677FF 260877FF .w.&.w..>.Ó..á.á^.&.g.%+â.&..&.W 0000A0
74006130 98078A26 0A5EC456 00000AC8 90C8C904 47892608 57892606 47892602 .&.G.&.W.&.G.èù.à...Vá^.&...=a.t 0000C0
018E9022 E8000189 01FC46C6 F6289000 EEE999C0 28137400 77300C74 00723027 ¹=r.t.=w.t.+ä.ÖŸ..+-óF=.¿..Š".ƒ. 0000E0
FF80FC46 C6FEE683 0002CE81 43750002 C6F790F4 E801098E 90F1E802 FC46C603 .óF•.Šþ.ƒ..Š¶.%ó..uC.ö...Ì±óF•.. 000100
00743013 74006230 0674002B 3098078A 263374C9 08377400 3F80260A 5EC40A46 F.á^.&.?.t7.èt3&...=+.t¤=b.t.=t. 000120
8000CE81 90C4E8C9 280574C0 00A9C688 9000EB40 00CE810E 75C000A9 C6881575 u..ó`.âu..ö.âŠÀ..ó`.ât.+èŠá..ö.. 000140
6AE9037D C008FA46 8908C483 03CA14F2 9A0676FF 0876FF56 01A468FE 4E8980E8 Š§.N±hÊ.V.v..v..`.b..á..F¹.â).Ôj 000160
C103E0D1 C888F9F7 000C8999 054A20C3 88174006 FF0A4788 26FC468A DE5EC4FF .á^..F=&.G...â..ù-J..¿..%¹.àïÄ.è 000180
88000004 47C7F85E 88044789 260E5E88 980788F8 5E88C02A F8468911 3E05E001 ïÄ.>..F½*â.^½....^.&.G..^½úG.... 0001A0
5EC28CC3 88084788 26FA468A 08578926 06478926 02578926 07892699 C02B0E5E ^.+â.&..&.W.&.G.&.W..F¹&.G..ù.ó^ 0001C0
13E80000 FE46C707 75052A08 7E810E75 0556067E 81174006 FF560000 04C8C8C9 èùà...V..â..-.V.u..-.*.u.úF±..Š. 0001E0

Dump of file SATURN:[PCCOMMON.DUMP.DLL]LOG.TMP;1 on 18-APR-1990 10:47:37.08
File ID (718,13,0)   End of file block 35 / Allocated 36

Virtual block number 8 (00000008), 512 (0200) bytes

20C38815 750C0A47 F626065E C40001FE 46C72475 02CF087E 81287505 62067E81 .-.b.u+.-.ù.uŠúF±..á^.&-G..u..û- 000000
C68102E6 C1FE7688 90Y07EEB C0280674 01113E87 F606086B F9F7000C 8999054A J..¿..%¹kÁ.-.>..t.+âŠ-...v±ê|..ó 000020
064688D5 74000802 54890489 02C48306 1518539A 02006814 75024408 04??0114 .....D.u.h...S....á....T..Àtî.F. 000040
02E6C1FE 7688065E C4FC4689 113E05E0 D1C103E0 D1C888F9 F7000C89 990??A2D -J..¿..%¹.àïÄ.èïÄ.>..F•á^..v±ê|. 000060
02448902 0088FC76 88025789 26078926 08578926 06478926 01169488 0114??88 ........&.G.&.W.&..&.W..v•|...D. 000080
20084688 000004C8 90C8C95E 00018802 0A4F8026 065E8811 07C6DE88 04478926 &.G..ßó...^.&.O..|..^èù.à....F.- 0000A0
C4517400 067E83FE 5E8CFC46 89113E05 E001C103 E0D1C888 F9F7000C 8999054A J..¿..%¹.àïÄ.èïÄ.>..F•.^±.-..tQá 0000C0
76FF5C74 C00B02C4 83062719 309A50E4 2A08478A 26085EC4 72741007 F626FC5E ^=&-..trá^.&.G.*óP.0.'..á..ât\.v 0000E0
2699C02B 085EC400 000247C7 260007C6 26FC5EC4 04C48306 66067C9A 0876FF0A ..v..|.f..á.á^•&ó..&úG...á^.+â.& 000100
08478A26 085EC421 741007F6 26FC5EC4 2AE80857 89260647 89260257 89260789 ..&.W.&.G.&.W.Š*á^=&-..tìá^.&.G. 000120
000004C8 C8C90492 067C9A08 76FF0A76 FF0874C0 0802C483 06781930 9A50E42A *óP.0.x..á..ât..v..v..|...èùà... 000140
000C8999 054A20C3 88157508 0A47F626 5575023C 03240A47 8A26065E C4F62856 V+-á^.&.G.$.<.uU&-G..u..û-J..¿.. 000160
FF265028 7EC008FC 46890647 28260788 26065E88 39740111 3E87F606 0868F9F7 %¹kÁ.-.>..t9.^_&..&+G..F•.à-(P&. 000180
4F802606 5EC40874 FC463808 C483056F 16809A50 E42A0847 8A260677 FF260877 w.&.w.&.G.*óP.¯.o..á.;F=t.á^.&.O 0001A0
5EC68800 000447C7 26025789 26078926 08578826 06478826 065EC4FF FF8E200A . ƒ..á^.&.G.&.W.&..&.W.&úG....ó^ 0001C0
1AAEA310 56880E46 881AC01E 8C1A8EA3 1AC48806 D019889A 000A88EC 8855C8C9 èùU.š¡...¡.À.¡á.Ê/...â..F..V.ÈÛ. 0001E0
```

```
Dump of file SATURN:[PCCOMMON.DUMP.DLL]LOG.TMP;1 on 18-APR-1990 10:47:37.08
File ID (718,13,0)   End of file block 35 / Allocated 36

Virtual block number 9 (00000009), 512 (0200) bytes

 038DE900 001AB804 C700001A 8A06C71A 9616891A 94A30856 88064688 1AB01689 .. ̄..F..V.È......ú.α...ú.ı...Ō.. 000000
 1AB4A31A 9CA31AB6 A31A9AA3 1A9EA3C0 2800011A 8C06C703 08E90374 25F67E80 .--%t.Ō..ú.¥...+äÈ..È..ÈÑ.È..ÈÇ. 000020
 C70A46FF 49753001 7F80260A 5EC40020 1C2406C7 1AACA31A 92A31A98 A31AB2A3 Èÿ.È..È..È ̄.ú.$. .á^.&...0uI.F.ú 000040
 80269028 E800001A 8206C71A 9E06FF0D 752B3F80 260A5E88 903EEB00 301C2406 .$.0.Š>..^.&.?+u.....ú.ý...Š(.&. 000060
 75203F80 260A5EC4 00EB1A92 06FF9014 EB1A8206 FF1A7500 1A9E3E83 0E75203F ? u..>...u...ý.Š......Š.á^.&.?-u 000080
 76FF0C76 FF0D75C0 0802C483 0978E80E 5098078A 260A5E88 0A46FF1A AC06FFC7 ú.. ̄..F..^.&...P.Ōx..á..àuï.v..v 0000A0
 1AC2A11A AC06FF0C 7D001AC2 3E830C56 890A4689 08C48308 C7E80E1A C2681E0A ..hó..Òú..á..F..V..>ó..)... ̄.Àó. 0000C0
 2E3F8026 0A5EC400 201C2406 C7067530 1C243E83 0074001A AC3E831A C2A308F7 %ÀÈó..> ̄..t..>$.Ou.ú.$. .á^.&.?. 0000E0
 3E830C56 890A4689 08C48308 7BE80E1A 8C681E0A 76FF060A 46FF1AB4 06FF2D75 u-..Ç..F...v..h¥..Ò(..á..F..V..> 000100
 4074004E 30307400 46309807 8A260A5E C41AB40E FF00011A 8C06C70A 7D001ABC ¥..).ú.¥.....Ç.á^.&...=F.t==N.tâ 000120
 03754C3F 80260A5E C4097500 1A9C3E83 00021A9C 06C70675 006C302B 7400683D =h.t+=l.u.ú......>...u.á^.&.?Lu. 000140
 D0E80010 1A9C06C7 08E80001 1A9C06C7 90024EE9 1C75003F 80260A5E C40A46FF .F.á^.&.?.u.ŌN..ú.....ŠÀú.....ŠÀ 000160
 06FF0875 00583D05 7400473D 0A740045 30F84689 98078A26 C8E80008 1A9C06C7 ú.....Šà&....F½=E.t.=G.t.=X.u... 000180
 0152E903 7E013FE9 03750063 300191E9 037E7874 006930F8 468820F8 46831A9A ...F½ .F½=i.tx-.Ō..=c.u.Ō?.-.ŌR. 0001A0
 0789261A 88A11FC4 261AAE1E C4157502 1A9C3E83 900159E9 0140E903 7500253D =%.u.Ōâ.ŌY...>...u.á.Ú.&á.Àı.&.. 0001C0
 75001ABA 3E83041A AE068307 89261A88 A11FC426 1AAE1EC4 00EB0000 02-¨^726 &úG...Š.á.Ú.&á.Àı.&....Ú...>o..u 0001E0

Dump of file SATURN:[PCCOMMON.DUMP.DLL]LOG.TMP;1 on 18-APR-1990 10:47:37.08
File ID (718,13,0)   End of file block 35 / Allocated 36

Virtual block number 10 (0000000A), 512 (0200) bytes

 E9FFFF88 01AFE903 75200A47 F6261A94 1EC4018D E9037400 1A883E83 0170E903 .Ōp..>ı..t.Ō§.á...&-G. u.Ō£.ı..Ō 000000
 1A9806FF F2E8086A 90C3E802 C483019E E80E0A6A 00001A92 06C71AB6 06FF01AC  ̄...Ñ.ú.....j..Ò...á.Šù.j.Š·.... 000020
 287A7401 1A9C3E83 0081E903 75081A9C 3E830004 1ABC06C7 1AB406FF 1A9A06FF ......Ç.ú.¥....>...u.Ō...>...tz+ 000040
 00001AC2 06C70A74 001AAC3E 83FA4689 1AC2A128 741AC206 39FA4689 1A9CA3C0 àÈ...F*9.ô.t(Àó..F*.> ̄..t.ú.ó... 000060
 0130E80E 106A021A AE06831A C2A3C028 027DC008 1AC2A105 1AC22E83 909013EB Š.....ô..Àó..à).+àÈó...Ú..j..Ò0. 000080
 A300052D FA468815 74001AAC 3E832274 00FA7E83 02C48304 8DE80E3A 6A02C483 .á.j:.Ò...á..-*.t".> ̄..t..F*-..È 0000A0
 8300F1E8 0E106A04 1AAE2E83 00001AC2 06C79007 EB1AC2A3 C028027D C0081AC2 ô..à).+àÈó.Š..ú.ô.....Ú..j..Òp.. 0000C0
 76FFF4E8 016A90FF 39E9026E E80E006A 90FF3FE9 106AFF10 E9021AAE 068302C4 á...Ú..Ō..j.Ō?..j..Ōn.Ō9..j.Š¶.v 0000E0
 3D057C00 653DFF0C E9037500 643D90FF 21E90428 E80E256A FF2AE903 49E80EF8 %.ÒI.Ō*.j%.Ò(.ÒI..=d.u.Ō..=e.|.= 000100
 5689FC46 89400C56 880A4688 0A4EFF0C 56880A46 88097400 1A9C3E83 DA7E0067 g.-Ō.>...t..F..V..N..F..V.ə.F=.V 000120
 7400733D FEE0E903 75007030 FEE4E903 75006F3D FE80E903 75006E30 903AEBFE ±Š:.=n.u.Ō.±=o.u.Ōō±=p.u.ŌÀ±=s.t 000140
 FC5EC4FC 46FF9034 E80A46FF 9081E8FF 79E90375 007830FE 89E90375 0075308F .=u.u.Ō¿±=x.u.Ōy.ŠŸ..F.Š4..F=á^= 000160
 C483044C E80E0A76 FF0C76FF 500A462B C388EC75 253C0474 C00AF646 88078A26 &...F-.ât.<%uš.ü+F.P.v..v..ŌL..á 000180
 941EC4FC 63E90374 C00AF646 88078A26 0A5EC40C 56890A46 89FE5688 FC468806 ..F=.V±.F..V.á^.&...F-.ât.Ōc=á.. 0001A0
 2406C706 74001AB4 3E835657 000012C8 CBC91A88 A1FE51E9 0374200A 47F6261A .&-G. t.ŌO±Àı.èùà...WV.>Ç..t.ú.$ 0001C0
 261AAE1E C4197510 1A9C3E83 0774021A 9C3E831A 8606FF04 740A067E 8300201C . ..-..t...Ñ..>...t..>...u.á.Ú.& 0001E0

Dump of file SATURN:[PCCOMMON.DUMP.DLL]LOG.TMP;1 on 18-APR-1990 10:47:37.08
File ID (718,13,0)   End of file block 35 / Allocated 36

Virtual block number 11 (0000000B), 512 (0200) bytes

 261AAE1E C4117400 1AB63E83 902CEB04 1AAE0683 FE5689FC 46890257 88260788 ..&.W..F=.V±..Ú..Š,..>Ñ..t.á.Ú.& 000000
 83021AAE 0683FE56 89FC4689 99078826 1AAE1EC4 0EE80000 FE46C7FC 46890788 ...F=úF±..Š.á.Ú.&....F=.V±..Ú... 000020
 1AC01688 1ABEA11C 22A3C028 9003EB06 46880674 FE4608FC 46880E74 001A923E >...t..F=.F±t..F.Š..+àÈ".À/...à. 000040
 26F246FF F25EC41D 750A067E 83287D00 FE7E8331 75001AB6 3E83F456 89F24689 .F·.V¶.>Ñ..ul.-±.)+.-..u.á^·.F·& 000060
 46C79006 E80001F6 46C7FE56 89FC4689 DAF7000D2 83D8F7FE 5688FC46 882007C6 ó.·.F=.V±%A.@.%Ö.F=.V±úF-..Š..úF 000080
 830AC483 08EF1926 9AFC76FF FE76FF50 1E0676FF FA5E8CF8 46891AA0 880000F6 -..ı...F%.^*.v..P.v±.v=.&.ÿ..á.. 0000A0
 7EC908F0 4E89C82B 1A8C0E88 04C48307 08190E9A F876FFFA 76FF4574 001AB43E >Ç..tÈ.v*.v%......á...¥.+à.NÞ.è- 0000C0
 C00849C1 88473005 C62605EB F27EC4F0 4E880000 1C2206C7 0675081C 223E8300 ..>"..u.ú."....NÞá-·Š.&ó.OG.èl.à 0000E0
 74C90804 88078A26 F85EC4F2 76C5EE5E 8C1A9A0E 88F04E89 F4468CF2 7E89F47F .¶.-·.F¶.NÞ.....^Ÿév·á^%&.....èt 000100
 001A863E 83EE5E8E F45E8CF2 7689E375 003F8026 F846FF46 202C8003 7C613C07 .<a|.., F.F%&.?.uO.v·.^¶.^Ÿ.>Ñ.. 000120
 02C48302 FFE80E50 C02802E8 00018805 7500F67E 8308741A 8206081A 9EA11475 u.À....ý.t..~-.u.ı..Š.+àP.Ò...á. 000140
 FA5689F8 46891A80 16881AAE A100018E 18740006 7E835657 000010C8 CBC95F5E ^_èùà...WV.~..t./..ÀÚ... ̄..F%.V* 000160
 FA5689F8 46890257 88260788 261AAE1E C4137408 1A9C3E83 008FE902 1AAE0683 . ̄Ú..Ō...>...t.á.Ú.&..&.W..F%.V* 000180
 46880E74 081A9C3E 83041AAE 0683FA5E 8CF84689 FC468907 88261AAE 1EC410EB Š.á.Ú.&...F=.F%.^*..Ú...>...t..F 0001A0
 5688F846 88FA5E8C F8468901 23880975 00FC7E83 900AEB01 1C881575 FA4608F8 %.F*u.ı..Š...-=.u.ı#..F%.^*.F%.V 0001C0
 003F8026 F246FFF2 5EC4900E EB1ABC0E 881C741A 843639F6 28F45689 F24689FA *.F·.V¶+-96Ç.t...¥.Š..á^·.F·&.?. 0001E0
```

```
Dump of file SATURN:[PCCOMMON.DUMP.DLL]LOG.TMP;1 on 18-APR-1990 10:47:37.08
File ID (718,13,0)   End of file block 35 / Allocated 36

Virtual block number 12 (0000000C), 512 (0200) bytes

 AC3E83FE 281AC23E 88F37500 3F8026F2 46FFF25E C44690ED EB107ECE 38461574 t.F;ö~.$Ú.Fá^·.F·&.?.uµ.>ô.+±.>¯ 000000
 74001AAC 3E8306C4 830183E8 0EF876FF FA76FF56 02C48301 59E80E57 0875001A ..u.W.ÒY..á.V.v*.v½.Ò°..á..>¯..t 000020
 83FE5689 FC46891A 8016881A AEA10000 06C890CB C95F5E02 C483013C E80E5708 .W.Ò<..á.^_èù.à...ÀÙ...¯..F=.V±. 000040
 1ABC06C7 0675001A 843E83FA 4688C02A 9003E801 80057547 067E8306 7467067E ~.gt..~.Gu.¯.$..*á.F*.>Ç..u.ú.¥. 000060
 0676FF1A 8C36FF1A 9A36FF00 011A8C06 C7067500 1ABC3E83 007400FA 7L 00006 ...~*.t..>¥..u.ú.¥....6...6¥..v. 000080
 1B7400FA 7E800EC4 8317421E FF261980 068EFC76 FFFE76FF 1ABE36FF 1AC 36FF .6à..6ƒ..v±.v=..¯.&..B..á..~*.t. 0000A0
 001A923E 8304C483 17461EFF 26198006 8E1ABE36 FF1AC036 FF147500 1A92.E83 .>...u..6à..6ƒ...¯.&..F..á..>... 0000C0
 AE068304 C483174E 1EFF2619 B0068E1A 8E36FF1A C036FF14 75001ABC 3E831B74 t..>¥..u..6à..6ƒ...¯.&..N..á...Û 0000E0
 17521EFF 26198006 8EFC76FF FE76FF1B 741AB206 081A9EA1 00001C22 06C7081A ..ú."...À....ý.t..v±.v=..¯.&..R. 000100
 001ABA3E 83560000 00C890CB C90129E8 0E50C02B 02E80001 880574C0 0804C483 .á..àt.¡..$.+àP.Ò).èù.à...V.>¤.. 000120
 10EBE42A 04882602 478E2607 FF26378B 2606468A 1478044F FF261A94 1EC43C75 u<á...&.O.x..F.&.7&..&.G.&..*ôŠ. 000140
 C95E1AB8 06FF9005 EB1ABA06 FF077540 06C4830E C702349A 0676FF53 1A9636FF .6..S.v..4.ú..á.∂u...¤.Š....¡.^è 000160
 1A9436FF 1A9636FF 18E8507E F6080676 88577500 1ABA3E83 56570000 02C890CB ù.à...WV.>¤..uW.v..--P$..6...6.. 000180
 FF261A94 1EC41E7E C0084EC6 881ABA06 FF047540 06C4830F 2F02349A 1C2436FF .6$..4./..á.∂u...¤..ôN.â-.á...&. 0001A0
 88077500 1ABA3E83 D4EBE42A 05882602 478E2607 FF263F88 261C24A0 0478044F O.xà.$.&.?&..&.G.&..*ô$à.>¤..u.. 0001C0
 1A9636FF 22EB5E75 001ABA3E 830A7688 56570000 02C8CBC9 5F5E1AB8 06010646 F...¡.^_èùà...WV.v..>¤..u^$".6.. 0001E0

Dump of file SATURN:[PCCOMMON.DUMP.DLL]LOG.TMP;1 on 18-APR-1990 10:47:37.08
File ID (718,13,0)   End of file block 35 / Allocated 36

Virtual block number 13 (0000000D), 512 (0200) bytes

 C6880646 FF1ABA06 FF047540 06C4830F A102349A 5098078A 26065EC4 1A9436FF .6..á^.&...P.4.À..á.∂u...¤..F..6 000000
 2607FF26 3F88261A 941EC407 8A26065E C4CD7804 4FFF261A 941EC425 74C0084E N.àt%á...&.O.xeá^.&...á...&.?&..& 000020
 00000CC8 CBC95F5E 1A880601 0A468807 75001ABA 3E83CAE8 E42A0588 2602478E .G.&..*ôŠò.>¤..u..F...¡.^_èùà... 000040
 0E9AF476 FF521AC2 3688FA46 89FC4689 C02BF656 89F44689 1AC01688 1ABEA156 VÀ/...á..F¶.V-+à.F=.F*.6ô¯R.v¶.. 000060
 75081C22 3E8308E8 02EE8305 75101C22 3E830676 28F028F8 468904C4 83080A19 .Ö..á..F½+P+v..>"..u..Ÿ.$..>"..u 000080
 98078A26 F446FF12 75301C24 3E831975 203F8026 F45EC422 75001AAC 3E834E01 .N.>¯..u"á^¶&.?·u..>$.0u..F§&... 0000A0
 067E831B 74001AAC 3E83077E F6080874 301C243E 83F84EFF 02C483FE 71E80E50 P.Òq±.á..N½.>$.0t..--..>¯..t..~. 0000C0
 56297500 1AAC3E83 0070E80E FC46FF07 74001C22 3E830066 E80EFA46 FF077400 .t..F*.Òf..>"..t..F=.Òp..>¯..u)V 0000E0
 7E830A74 001C223E 830039E8 0E047500 FA7E830A 7400067E 8302C483 FE7EE80E .Ò-±.á..-..t..-*.u..Ò9..>"..t..- 000100
 C70E7400 1AAC3E83 06C483FE B5E80EF4 76FFF676 FFF876FF 0040E80E 047500FC =.u..Òâ..v½.v-.v¶.Òç±.á..>¯..t.ú 000120
 50002088 03EB002B 88057400 1A9E3E83 CBC95E02 C483FE38 E80E5600 201C2406 .$. .V.Ò8±.á.^èù.>...t.¡+.$.¡ .P 000140
 88057400 1A9A3E83 1775101C 223E8302 C483FDC8 E80E306A CB02C483 FD02E80E .Ò@».á.ùj0.Òà».á..>"..u..>...t.¡ 000160
 80260A5E C40001FE 46C75657 000006C8 CB02C483 FDAAE80E 50007888 03EB0058 X.Š.¡x.P.Ò¨».á.ùà...WVúF±..á^.&. 000180
 C708752D 3F80260A 5EC49060 E80A46FF 021AAE06 83378826 1AAE1EC4 12752A3F ?*u.á.Ù.&.7..Ù...F.$'.á^.&.?-u.ú 0001A0
 0A751AB4 3639387F 393C3F7C 303CFA46 88078A26 0A5E88F6 280A46FF FFFFFE46 F±...F.+-.^.&...F*<0|?<9.;96Ç.u. 0001C0
 D1CE0302 E1C1CE88 98058A26 187F393D 802606E8 F8880030 1C2406C7 0675303C <0u.ú.$.0..«Š.&.=9..&....öeÃ..öi 0001E0

Dump of file SATURN:[PCCOMMON.DUMP.DLL]LOG.TMP;1 on 18-APR-1990 10:47:37.08
File ID (718,13,0)   End of file block 35 / Allocated 36

Virtual block number 14 (0000000E), 512 (0200) bytes

 26065EC4 F08BEEF7 FE46880C 468C0A7E 89DF7D30 30802647 F18830E9 83C803E1 Å.à.ÕO.þG&.=0)Ô.~..F..F±¥Y.Þá^.& 000000
 FC7EC406 4E8AFE5E 8CFC4689 012A8857 000004C8 CBC95F5E 0C56880A 46883789 .7.F..V.^ èùà...W¡*..F=.^±.N.á-= 000020
 FE468CFC 7E899009 E8FE468C FC7E8900 0188F475 00382611 74003080 264701EB $.G&.=.t.Ë8.u¶¡...~=.F±Š...~=.F± 000040
 26C02825 75830A47 F626FC5E C4FE5E8C FC468905 4A880000 04C890C8 C95FC028 +á_èù.à...¡J..F=.^±á^=&-G..uX+á& 000060
 C28CC388 FF0847C6 26025789 26078926 08578926 06478926 990A4788 26044789 .G.&.G..&.G.&.W.&..&.W.&6G....ù.ô 000080
 88EC8855 90C8C999 C028BD75 173A1638 C3751738 06380CFC 4683C28C C38817E8 $..ù.ô.F=.;.8.uù;.:.u$+à.èù.U.&. 0000A0
 7587C6F3 75C08500 00FFFF9A 5301FAE9 01EEE9C0 3300098A 08721773 1E38065E ^.;.s.r.¤..3àÕY.Õ*.S......àuxó.u 0000C0
 D1F7AEF2 FFFFB9C0 33C08ED8 8CFE880A 76C51EDE 88D788EC 8855C85D E5880017 ...[]ùU.$.=.B.év..±.Å.à3à¿...ÛX1 0000E0
 56EC8855 C850C28C 1FFA88F3 88A4F3C9 13A5F3E9 D149A402 7401A8C7 88067EC4 á-..ú´.t.É1iÕµÉ.èµÉ.µ.*..õ]ùU.$V 000100
 76FF0876 FFEC8855 0709E908 7EC51E99 01750AF9 83023306 46880C4E 88018357 W*..N..F.3Ø.*.u....é-.Õ..U.$.v..v 000120
 FF9A5016 C48850EC 885500C8 50E58801 7CE90374 C0850000 FFFF9A50 50C03306 .3àPP......àt.Õ|...[]ù.U.$P.á.P.. 000140
 8B1ACC9A 0740E800 21E80000 FFFF9A01 30681E01 32681E17 6EA3E086 580000FF ...X.Aèn..h2..hÕ......Õl.Õã..ã.. 000160
 FF33000D 8B1E0138 16FF00FF 6812AC13 5C9A129F 13089A50 CB5DE588 0001B80E .¡...[]ùP......\.^.h....8..£..3. 000180
 74CA88A6 F3CB88D1 88053CBE 31740030 80264701 75003D80 267FFFB9 0132068E ..2.¿..&.=.u.G&.=.t1/<..1.ù¶l.õt 0001A0
 0572412C AC9204E0 C00E7241 2CAC1775 8F1FF788 071E061C EBE774AE F2C03308 .3à ÚtÓŠ.....%.¢u.¯,Ar.âÁ..¯,Ar. 0001C0
 88173C1E FF04740· 173E3E83 12B1135C 9A5000FC 88EC8855 00C31FED EBAAC20A .ô´ŠÚ.ú.U.š¡•.P.\.Ÿ..>>...t...<.¡ 0001E0
```

```
Dump of file SATURN:[PCCOMMON.DUMP.DLL]LOG.TMP;1 on 18-APR-1990 10:47:37.08
File ID (718,13,0)   End of file block 35 / Allocated 36

Virtual block number 15 (0000000F), 512 (0200) bytes

 3BAD19BA 8E06568B C08E088E 0515B857 56EC8B55 C850E588 1312135C 9A5000FF ..P.\....I]ùU.$VW¡...Ä.å.V./¤.Ü; 000000
 57EC8B55 0002CA5D E5885E5F 96E8EBF7 88AEF2FF FFB9C033 970C7496 401074C2 ôt.ə.t..3à¿..·Û.%S$._^.I]ò..U.$W 000020
 530002BB C48B5049 D1F7AEF2 FFFFB9C0 33FA8B92 1F74C008 1326132C 9A0676FF .v..,.&..ât...'3à¿..¯Ü%IIP.áE..S 000040
 0C070906 00051804 02030202 16010002 CA5DE588 5F5B0000 FFFF9A50 1651521E .RQ.P.....(_.I]ò................ 000060
 00570053 00520243 00410235 02121211 0D10120F 1600160C 0808070A 0C090C08 ....................S.A.C.R.S.W. 000080
 71A31608 000008D7 02CE0BA4 00840982 0A810A80 16060972 1C70206D 006C0B59 Y.l.m p.r...........Ê.ö.■.....Èq 0000A0
 24891392 8B1771A3 CB5DE58B 99FFFFB8 0008E8CB 50E58B99 FFFFB817 6A168917 ...j.¡....I]ùÒ..¡....I]ùÈq.£..¿$ 0000C0
 430176CA 3C04728C 3C430A76 243C0472 133CF7E2 43431674 073A2E18 75E40A00 ..ðu..:.t.CCã%<.r.<$v.C<¥r.<òv.C 0000E0
 C88BF9F7 000CB999 054A2004 46881740 06FF0000 04C800C3 176AA398 01478A2E ..G..Èj.û.à.....ə..F.·J..¿..%'.à 000100
 47892604 5EC402C4 83136618 539A0200 68FE5E8C FC468911 3E05E0D1 C103E0D1 ÌÂ.èÌÂ.>..F•.^±h...S.f..á.á^.&.G 000120
 4F802604 5EC49021 E8020002 47C726FC 5EC4080A 4F802611 74D00808 57892606 .&.W..Ât.&.O..á^•&úG...ŠI.á^.&.O 000140
 47882604 5EC40001 0247C726 FC5EC408 57892606 47892640 FE568BFC 4688040A ...F•.V±ə&.G.&.W.á^•&úG...á^.&.G 000160
 08721773 1E38065E 88EC8B55 C3C90000 0447C726 02578926 07892608 57882606 .&.W.&..&.W.&úG...èùU.$.^.;.s.r. 000180
 00FFFF9A 51160C76 FF0876FF 0A76FF53 CC8804EC 83FF22E9 FF16E9C0 3300098A ¤..3àÕ..Õ"..$..aS.v..v..v..Q.... 0001A0
 0676FF08 76FF4087 0EEC83EC 885500CB 5DE588FD 1775A780 91E175C0 855A5900 .YZ.àuÅ..Ìu.».I]ù.U.$.$.ñə.v..v. 0001C0
 A910CA80 08740100 A90A4688 018AE80C 4E885252 D23352F8 56801652 FE568016 ..V±R..V%R30RR.N.Ò...F.`..t..ò.` 0001E0

Dump of file SATURN:[PCCOMMON.DUMP.DLL]LOG.TMP;1 on 18-APR-1990 10:47:37.08
File ID (718,13,0)   End of file block 35 / Allocated 36

Virtual block number 16 (00000010), 512 (0200) bytes

 00FFFF9A 5050C033 50160676 FF0876FF FE468050 02CA8022 740200A9 2A750400 ..u*`..t".ò.P.F±.v..v..P3àPP.... 000000
 0B0000FF FF9A5050 C03350C7 0A000325 525101CA 8003EBFE 4E880875 58C08500 ..àXu..N±Š..ò.QR%...úP3àPP...... 000020
 17730638 FE468800 80E9FE68 E90011BA 03740002 BAF0C2F6 0E75006E 301674C0 àt.=n.u.-òÞ¤..t.¤..Öh±Ö...F±;.s. 000040
 00FFFF9A 50F8468D 1653F45E 8D165000 88E4E8C0 3300188A 000011F5 9A500072 r.P.%...¤..3àŠð.ÂP..^¶S..F%P.... 000060
 F24E8880 81027580 198706F6 07754000 A90E7580 00A9C933 0A468861 75C00800 ..àua.F.3è`..u.`.əu.-....u.Ý..N· 000080
 C90AF446 88C03200 83E908F4 46C60775 023C008E E940F446 C6077501 3CF4468A .F¶<.u.óF¶əð..<.u.óF¶.Õ..2à.F¶.è 0000A0
 74C00800 0014D09A 50FA468D 16510002 B95151FF FFB95273 7400020A 46F77A74 tz%F...tsR¿..QQ¿..Q..F'P.Ï....ât 0000C0
 00FFFF9A 50F8468D 16500001 8850F646 8D16524F EBC033FD E4E90374 00833D0C .=..t.Õð»3àŠOR..F-P¡..P..F%P.... 0000E0
 9AFA76FF FC76FF00 FC5E8301 FA6E8352 18751AF6 7E833274 F8463923 75C00800 ..àu#9F½t2.--.u.R.n'..^•..v•.v'. 000100
 F6F44E8A AA75C008 000015F9 9A50FA46 8D165050 50C03352 BE75C008 0000FFFF .....àu/R3àPPP..F'P.'....àu`.N¶- 000120
 80037400 01F846F7 00001530 9A5050C0 3350F846 8D160676 FF0876FF 287548C1 èHu(.v..v...F%P3àPP.=...%F%..t.. 000140
 6CA1CB50 E58B1775 8F880888 C28801C9 80F24E0A 20C98003 7400080A 46F710C9 è.%F....t..è .N·.è..ó.A..u..I]ùÀI 000160
 BA087217 731E3B06 5E880CEC 83EC8855 00C301C9 80037580 A8C933C1 23D0F717 .%Â#è3è`.u..è.û.U.$.$..^.;.s.r.¤ 000180
 00001654 9A5016F4 46805141 415151C9 33531274 20177587 F6FD17E9 C0330009 ..3àÕ.»-.u. t.S3èQQAAQ.F¶.P.T... 0001A0
 89F28BFA 885657FC FC4689FE 4689C033 0856C50A 468EFA5E 8C667480 177587F6 -.u..tf.^'.F.éV.3à.F±.F••WV.'.·. 0001C0
 0C4E8807 16FA88D4 88E22800 608ADC88 02EC833B 75AEF20A 8049E30C 4E88F866 f½.N.DI¯.·Ùu;.š..É¤..+ã.å.'...N. 0001E0

Dump of file SATURN:[PCCOMMON.DUMP.DLL]LOG.TMP;1 on 18-APR-1990 10:47:37.08
File ID (718,13,0)   End of file block 35 / Allocated 36

Virtual block number 17 (00000011), 512 (0200) bytes

 46FF0A80 AA001FE8 C375FB3B 00B0009A E90028E8 F4E2AA1A 74FB3B0D 740A3CAC ¯<.t.;«t.`ã¶Ò+.Õ..¯.;«u.Ò..`¯..F 000000
 1F061E51 53501455 19889AFF FC887AE8 0093E9FA 5E8E5F5E E1EB0014 E8E2EBFC •Šàð..ŠÃ^_.^'Ö..Š±¡•..¡.U.PSQ... 000020
 5E01F45E 881175C0 03000013 869A5016 F4468051 521E5306 5E881FE3 CA28CF88 .ü+òD..^.Š.RQ.F¶.P......âu..^¶.^ 000040
 7500098A 00013D00 74006030 1874C008 08C4831F C3FA8858 58591F07 74D808FE ±.Üt..Y(X.'ü..á..ât.=m.t.=..¤..u 000060
 751A3F80 085E880A 5E8E0E74 40177587 F6FE5E8E 26E8F900 208A03EB 001C8A08 .¤..$.¤ .'$&.^±-.u.ət..^..^..?.u 000080
 CB5DE588 0472FA5E 8E5F5EF8 6688FC46 28FE4688 06E8F9C0 33001CBA 0EEBF803 .%$.¤..3à'$..F±+F•.f%^_.^'r..I]ù 0000A0
 00001773 9A5016F4 46805152 1E530856 C51EEEEB C1880475 C9080C4E 88F8F8E9 Õ««.N..èu..éŠŸ.éV.S.RQ¯F¶.P.■... 0000C0
 4688C2E8 00208AC7 EB001C8A CC750009 8A000130 00740060 301774C0 081F071E ....ât.=m.t.«..¤..uä¤..Šú¤ .Šó.F 0000E0
 885500A3 EBC03300 1C8AA6E8 02751A3F 80260A88 0A744017 7587F687 75C008F4 ¶.àuñ-.u.ət..Õ&.?.u.$I¤..3àŠÈ.U. 000100
 F13D0646 88575602 EC83EC88 55CB5DE5 8801FE4F 80260574 C308C08C 065EC4EC $á^..â.ût.&.O±..I]ùU.$.$.VW.F.=þ 000120
 750078E8 05740018 E8157500 82E81992 A3127400 25E80875 0019923E 831E73FF .s..>...u.ÒX.t.È..Ò..u.Ò..t.Òx.u 000140
 E3834306 5E880776 065E3900 F08BCB5D E5885E5F 02C48317 581C2C9A 0676FF08 ..v..,.X..á._^.I]ùEÞ.9^.v..^.C.D 000160
 87C28838 74FFFA83 08C48318 871E309A 50028051 0E4F8050 501EC033 FE5E89FE ±.^±3à.PP.O.Q¯.P.O....á..'.t8.ó. 000180
 0A880C47 89484800 08A3C033 D88EFE5E 880008A3 DA8E0574 02081996 A3199416 ...È...@t..ÒÈ...^±.Ä3àÈ..HH.G.¡. 0001A0
 DB33064E 88C08ED8 8CC31FD8 8C0006A3 00000500 0AA30147 800002A3 0000A300 .É..È...G.É.....É...Â.û.Â.â.N.3Û 0001C0
 49D1F7AE F2FFFFB9 C033067E C4D788EC 8855C3D9 8EC18CD2 08036EE8 19961E8E ....Òn..@.è.1ùU.š.±á-.3ã¿..·Ü%iI 0001E0
```

```
Dump of file SATURN:[PCCOMMON.DUMP.DLL]LOG.TMP;1 on 18-APR-1990 10:47:37.08
File ID (718,13,0)   End of file block 35 / Allocated 36

Virtual block number 18 (00000012), 512 (0200) bytes

 7C00F883 117D1773 1E38065E 88EC8855 0024E900 B35756EC 885500C8 5DFA8891 ..•]ù.U.$VW•.Õ$.U.$.^.;.s.)..«.| 000000
 7EC51E08 56880646 880E4E88 00CB5DE5 88C03302 E8000188 05744017 7587F60C .-.u.ât.¡..Š.3à.]]ù..N..F..V..é- 000020
 92F788DA F7000¯83 DBF7AA2D 800A79D2 080E750A F9831374 C00A93FC 071E570A .W..•..ât..•.u..@y.¯-¯%Ü.@.%Ö.%. 000040
 4F0588E2 75C308C2 88AA2704 0276393C 30040387 92F1F793 F1F70274 C0080233 30.ât.%þ.%þ..£.0<9v..'¨.ò.úuâ..0 000060
 0B72D828 DC885A59 00CB5DE5 885E5F1F 58DA8CF2 72C73801 4480FF44 880586AC ¯...D..D.;úr·.OX. ^.]]ù.YZ.É+Ãr. 000080
 52000288 175C2EFF 5152F8D2 E9C03305 7540175C A1CB5152 E3880572 17601E38 ;.'.r..DRQÙÂ\.âu.Ŝàð@%RQ..\.£..R 0000A0
 07740001 3D408112 7558C008 00001590 9A521650 1653C488 50871775 A780048B .Â.]u.ñP.áS.P.R......àXu.Ÿâ=..t. 0000C0
 A21EFFD8 33C28C19 A606C41E E319A40E 885AD479 4B17758F 08088106 7500023D =..u.Ÿ...u.KyåZ..Ê.D.á.|..ó3Ù..Â 0000E0
 BF19AEBE 007CE819 AEBF19AE BE19A21E FF00038B C28C19AA 06C401AE E9037319 .s.ÕÜ.á.¨..ôÉ....Â./Ü.€Ü.Ò|./Ü.€ 000100
 9CBED88E 133288C3 0000FFFF 9A1A5968 0E016A08 7419A03D 199C8800 73E819AE Ü.Òs.¡..=..t.j..hY......ù¡2..Á/. 000120
 9CBE003A E81C26BF 1C26BEEC 88550000 1A549A00 6A006A03 6A0051E8 19A08F19 .€..òo.j.j.j..T...U.š/&.€&.Ò:./. 000140
 C033001A E819AEBF 19AE8E00 23E819AE BF19AEBE EC885503 E80031E8 19A08F19 .€..Ò1.Š.U.š/Ü.€Ü.Ò#./Ü.€Ü.Ò..3à 000160
 8804EF83 0E73F738 C319A21E FF0002BB 07E319A4 0E880000 FFFF9A50 06468A50 P.F.P.......Ê.D.Ê....Â.ù;%s..ÿ.. 000180
 8800F0E9 03750132 3639FF28 F6285657 000014C8 00C3EEEB 1DFFF274 02450805 ..E.t·..ŠYù.à...WV+-+.962.u.Ðÿ.. 0001A0
 1EE69A05 3C681EF6 76FFF876 FF0C6AF8 5689F646 89F25689 F04689C0 28013216 .2.+à.FÞ.V·.F-.V½j..v½.v-.h<..|. 0001C0
 47EA7500 3F8026 5 46FFF65E C4008CE9 03767FFF FE814619 74C0080A C4831840 â..á..ât.F.±..v.Õ¥.á^-.F-&.?.uõG 0001E0

Dump of file SATURN:[PCCOMMON.DUMP.DLL]LOG.TMP;1 on 18-APR-1990 10:47:37.08
File ID (718,13,0)   End of file block 35 / Allocated 36

Virtual block number 19 (00000013), 512 (0200) bytes

 1DD89A04 6A500145 8DBA7500 3F8026F6 5E88F475 003F8026 F646FFF6 5EC40CEB Š.á^-.F-&.?.u¶.^-&.?.uo.E.Pj..Â. 000000
 EE460BEC 4688FE56 89FC4689 02C4831B 8518539A 56EE5689 EC468904 C4831B4F O..á..F&.VŸV.S....á..F=.Vz.F&.FŸ 000020
 681EF076 FFF276FF 0C6A197D 1689197B A3EE5688 EC468866 74C208FC 46886074 tm.F=.òtf.F$.VŸÈ(...).j..v·.vÞ.h 000040
 46830257 89260789 26FE5688 FC4688EC 5EC42C74 C0080AC4 8318831E E69A053C <..].•..á..ât,á^š.F=.Vz&..&.W..F 000060
 F046FFF0 5EC4E8EB 0E74C00A 078826FC 46FFFC5E C4078A26 F046FFF0 5EC404EC &.á^Þ.FÞ&..á^•.F•&...ât.ŠÒá^Þ.FÞ 000080
 88560000 06C8F6CE E90002B8 90CBC95F 5EA77500 3F8026F0 5EC4F475 003F8026 &.?.u¶á^Þ&.?.ul^_èù.¡..Òõ-à...V¡ 0000A0
 04C4831B 00067C9A 53060E74 830A47F6 26FA5EC4 1CEBF62B FC5E8CFA 4689054A J..F•.^••-Š.á^•&-G..t..S.|.....Â. 0000C0
 065E88EC 885590C8 C95EC688 D876FA46 39173A16 881738A1 0CFA4683 46017440 ât.F.F•.Â8...:.9F•vÂ.ó^èù.U.&.^. 0000E0
 76E80005 88071E29 75003F83 19888857 56EC8855 CB5DE588 01FE4F80 04740808 .Üt..O±..]]ùW.$VWE...?.u)..¡..Òv 000100
 3689FFFE FE44C704 C6830001 04C79619 8AA31988 A3FE2440 24E899C0 33057501 .u.3à.$$â$±È..È...ú....ó.úÐ±±..6 000120
 F273EEF9 83FEE180 FA744100 D0E9CB50 E5885E5F 0009E8C0 8E088C06 4E88198E ...N..Â.àÒ..¯^.|]ùÒÂ.At•.Ãz.•Ÿs· 000140
 F7880002 05C20335 7401A8AD F0030088 1573C13B 48437401 A8FE88AD FC027788 .w.•U.±¨.tCH;ès..Â.ÞÙ¨.tS.ô....% 000160
 5A89DA8C C688FE4C FEF90305 E8058948 C128FE4C 89F9030C 74FE88E6 EBFE4489 .D±Š|.±t..•.L±+èH..Š..•±L±.ó.Ò¿Z 000180
 01A8ADF0 03FE8825 74FFFE30 02199A06 C626C302 7F891996 1E8C2605 74D13B1A .;ìt.&.......ù&ó....=±.t%.±.ÞÙ¨. 0001A0
 4788E6E8 FE4489F7 88000205 C203E274 01A8ADF0 03D0888C 73C13848 FE88F274 t¨.±H;ès¥.Â.ÞÙ¨.tà.ô....%.D±Š|.G 0001C0
 37881992 1E8E2605 74C7381C BFBFD88C 1274199A 0EFE2615 EBD88E04 74C00808 ..ât..ÂŠ.&±...t..Â€€.;út.&.....7 0001E0

Dump of file SATURN:[PCCOMMON.DUMP.DLL]LOG.TMP;1 on 18-APR-1990 10:47:37.08
File ID (718,13,0)   End of file block 35 / Allocated 36

Virtual block number 20 (00000014), 512 (0200) bytes

 0574001D E8FE4DFE 0D74005F E8984040 01240074 C63B0068 E8C03306 778888E8 ŠE.w.3àÒk.;ót.$.ââ.Ò_.t.±M±Ò..t. 000000
 A8FE4588 51C399C0 33024789 07881996 A3260474 C1381D13 B9D88C98 EB4E4E96 .NNŠ..Ä¿..;èt.&È....¯G.3à.úQ.E±¨ 000020
 0072C203 1572C603 C188F575 EAD10476 19981638 267FFFBA 414149C8 28037401 .t.+àIAAo..&;...v.ìõu%.ê.ór..ôr. 000040
 8BFE8857 18740010 E85152C3 59C033E5 75EAD1D2 F7087500 0CE8C628 C22302F7 %@Wò+6Ò..u.%@ìõul3àYúRQÒ..t.W.±. 000060
 88505252 1ED23350 53C35A59 58FE5589 4AD72806 88067789 FFFEFE44 C7F203F0 Þ.¨úD±±..W..@+@J.U±XYZùSP3@.RRP¡ 000080
 FF006A56 00000AC8 C3D20802 74585A1F FFFA8308 C4831BFB 1E309A1F 06500001 ..P...0.«..á..•..Z[t..@ùà...Vj.. 0000A0
 7688902F E899C028 0674FFFF C2F7FA56 89F84689 1E051F6A 9A0676FF 006A0876 v.j..v..j....F½.V•%ò..t.+à.Š/..v 0000C0
 10C81F22 9A50FE76 FF006A56 1274D00B FE5689FC 468902C4 831E1E18 539A56F8 ½V.Š....á..F=.Vz.Ât.Vj..vzP."..à. 0000E0
 8B013A8F 3875000A 7E830657 56EC8855 90C8C95E FE5688FC 46889007 E808C483 .á.Š...F=.Vz^èù.U.$VW..-..uß€:.. 000100
 0E468902 44880074 F7381174 48053A36 884CE827 720057E8 07754806 46880856 V..F.Hu.ÒW.r'ŠL.6:.Ht.;%t..D..F. 000120
 501652C4 885021E8 99FFFF88 0675020B 0473053A FE8104C6 8334735E 003EE856 VÒ>.^s4.6..±:.s..@u.¡...ŠIP.@R.P 000140
 E5885E5F 07C03303 88053A36 89025C89 1489E675 C085F958 0000FFFF 9A50C033 3àP.....[•.âul...\..6:..£3à._^.| 000160
 D3882672 1C03DA88 2CE8F9F2 75053AFE 8104C683 0C74024C 39F7880E 4E88C850 ]ù.N..%9L.t..ó..±:.u·•Š,.Ö..r&.£ 000180
 92013416 890475F7 380E75C0 850000FF FF9A5153 13730134 1E390675 F738C18E .è;%u.9.4.s.SQ......âuß;%u...4.. 0001A0
 CB03D9F7 AEF2C033 F788067E C4098827 E30E4E88 1E5657EC 885500C3 D1880487 ...ìù.U.ŠWV..N.D'.1á-..%3à·Ù%).ù 0001C0
 5DE5885F 5E1FC188 D1F74949 04740477 FF453A26 C933FF44 8AA6F30A 76C5FE88 .±év.µl.D.3è&:E.w.t.II%ì.è.^_.|] 0001E0
```

```
Dump of file SATURN:(PCCOMMON.DUMP.DLL)LOG.TMP;1 on 18-APR-1990 10:47:37.08
File ID (718,13,0)   End of file block 35 / Allocated 36

Virtual block number 21 (00000015), 512 (0200) bytes

 0128D187 D1030323 D818D128 0C74DAF7 D788067E C45738E3 0C4E88EC 885500C8 ù.U.å.N.D8Wá-..æ%öt.+1.ÜWE.1.1+1 000000
 F3C913A8 F3E9D1C3 ^EFFFFC3 81C38C10 E3D187AA F3C913A8 F3E901E0 8A0A4688 .F..ÅlÕµ¨.èµ¨.ìD..ù.ù...ùlÕµ¨.èµ 000020
 88E3F706 46880875 0A5E88D8 080C5E88 084688EC 8855C850 08568806 46885FAA ˇ_.F..V.]ùU.å.F..^..Ã.^.u..F.%D. 000040
 03001208 CA5DE588 C103E3F7 064688C8 030C66F7 064688C8 88E3F700 08CA5DE5 í]ò..%D.à.F.%f..à.F.%D.1.í]ò.... 000060
 03000000 061D4800 02000000 041DEA00 02000700 011A6E01 03000500 011AA601 .[.......n.......õ.......H...... 000080
 03002600 011ECF01 03002200 011E8401 03008800 011F5501 05008000 05155802 .[.......U..........".. Ü...&.. 0000A0
 03009A00 05161D02 03003A00 0116DC01 03009100 0517FC02 03008800 05158402 .........•.......É...:.......... 0000C0
 03004D00 0119F001 03004800 01167401 03004400 01164001 03003C00 01126601 .f...<...a...D...t...K...Þ...M.. 0000E0
 542D6E75 5220534D 00000000 00000000 00005C00 01127F01 03005800 01129201 .....[.......\...........MS Run-T 000100
 38383931 2029632B 20746867 69727970 6F432020 20797261 7262694C 20656D69 ime Library - Copyright (c) 1988 000120
 6F662067 6F4C0053 4E474953 45440011 70726F43 2074666F 736F7263 694D202C , Microsoft Corp..DESIGNS.Log fo 000140
 20726F66 20736E6F 6974704F 00770047 4F4C2E2A 00732520 6E676973 65642072 r design %s.*.LOG.w.Options for  000160
 20676F6C 206E6570 6F206F74 20656C62 616E5500 61007700 656C6966 20676F6C log file.w.a.Unable to open log  000180
 7453003F 7325206E 67697365 6420726F 6620676F 6C20706F 74530021 656C6966 filel.Stop log for design %s?.St 0001A0
 20796461 65726C61 20732520 656C6946 0000676F 6C20726F 73697664 6120706F op advisor log..File %s already  0001C0
 616C6961 76612074 65792074 6F6E2070 6C654800 706C6548 002E7374 73697865 exists..Help.Help not yet availa 0001E0

Dump of file SATURN:(PCCOMMON.DUMP.DLL)LOG.TMP;1 on 18-APR-1990 10:47:37.08
File ID (718,13,0)   End of file block 35 / Allocated 36

Virtual block number 22 (00000016), 512 (0200) bytes

 00656C62 616C6961 76612074 65792074 6F6E2070 6C654800 706C6548 00656C62 ble.Help.Help not yet available. 000000
 00002320 20280029 6C6C756E 2800296C 6C756E28 00000000 00000000 005C005C \.\.........(null).(null).+- #.. 000020
 00000000 00000000 00000000 00000000 000019B0 1C301A89 1C301C30 00000000 ....0.0...0.¯................... 000040
 00000000 00000000 00000000 00000000 00000000 00000000 00000000 00000000 ................................ 000060
 00000000 00000000 00000000 00000000 00000000 00000000 00000000 00000000 ................................ 000080
 00000000 00000000 00000000 00000000 00000000 00000000 00000000 00000000 ................................ 0000A0
 00000000 00000000 00000000 00000000 00000000 00000000 00000000 00000000 ................................ 0000C0
 00000000 00000000 00000000 00000000 00000000 00000000 00000000 00000000 ................................ 0000E0
 00000000 00000000 00000000 00000000 00000000 00000000 00000000 00000000 ................................ 000100
 00000000 00000000 00000000 00000000 00000000 00000000 00000000 00000000 ................................ 000120
 00000000 00000000 00000000 00000000 00000000 00000000 00000000 00000000 ................................ 000140
 00000000 00000000 00000000 00000000 00000000 00000000 00000000 00000000 ................................ 000160
 00000000 00000000 00000000 00000000 00000000 00000000 00000000 00000000 ................................ 000180
 00000000 00000000 00000000 00000000 00000000 00000000 00000000 00000000 ................................ 0001A0
 00000000 00000000 00000000 00000000 00000000 00000000 00000000 00000000 ................................ 0001C0
 00000000 00000000 00000000 00000000 00000000 00000000 00000000 00000000 ................................ 0001E0

Dump of file SATURN:(PCCOMMON.DUMP.DLL)LOG.TMP;1 on 18-APR-1990 10:47:37.08
File ID (718,13,0)   End of file block 35 / Allocated 36

Virtual block number 23 (00000017), 512 (0200) bytes

 00000000 00000000 00000000 00000000 00000000 00000000 00000000 00000000 ................................ 000000
 00000000 00000000 00000000 00000000 00000000 00000000 00000000 00000000 ................................ 000020
 00000000 00000000 00000000 00000000 00000000 00000000 00000000 00000000 ................................ 000040
 00000000 00000000 00000000 00000000 00000000 00000000 00000000 00000000 ................................ 000060
 00000000 00000000 00000000 00000000 00000000 00000000 00000000 00000000 ................................ 000080
 00000000 00000000 00000000 00000000 00000000 00000000 00000000 00000000 ................................ 0000A0
 00000000 00000000 00000000 00000000 00000000 00000000 00000000 00000000 ................................ 0000C0
 00000000 00000000 00000000 00000000 00000000 00000000 00000000 00000000 ................................ 0000E0
 00000000 00000000 00000000 00000000 00000000 00000000 00000000 00000000 ................................ 000100
 00000000 00000000 00000000 00000000 00000000 00000000 00000000 00000000 ................................ 000120
 00000000 00000000 00000000 00000000 00000000 00000000 00000000 00000000 ................................ 000140
 00000000 00000000 00000000 00000000 00000000 00000000 00000000 00000000 ................................ 000160
 00000000 00000000 00000000 00000000 00000000 00000000 00000000 00000000 ................................ 000180
 00000000 00000000 00000000 00000000 00000000 00000000 00000000 00000000 ................................ 0001A0
 00000000 00000000 00000000 00000000 00000000 00000000 00000000 00000000 ................................ 0001C0
 00000000 00000000 00000000 00000000 00000000 00000000 00000000 00000000 ................................ 0001E0
```

```
Dump of file SATURN:[PCCOMMON.DUMP.DLL]LOG.TMP;1 on 18-APR-1990 10:47:37.08
File ID (718,13,0)   End of file block 35 / Allocated 36

Virtual block number 24 (00000018), 512 (0200) bytes

 00000000 00000000 00000000 00000000 00000000 00000000 00000000 00000000 ................................ 000000
 00000000 00000000 00000000 00000000 00000000 00000000 00000000 00000000 ................................ 000020
 00000552 00000030 4F464E49 5F454C49 465F435F 013A0000 00000000 00000000 ..........:._C_FILE_INFO=...R... 000040
 00000202 00000600 00000000 00000102 00000000 00000000 00000001 19AE0000 ..Ù............................. 000060
 00000000 00000000 00000000 00000000 00000000 00000000 00000000 00000000 ................................ 000080
 00000000 00000000 00000000 00000000 00000000 00000000 00000000 00000000 ................................ 0000A0
 00000000 00000000 00000000 00000000 00000000 00000000 00000000 00000000 ................................ 0000C0
 00000000 00000000 00000000 00000000 00000000 00000000 00000000 00000000 ................................ 0000E0
 00000000 00000000 00000000 00000000 00000000 00000000 00000000 00000000 ................................ 000100
 00000000 00000000 00000000 00000000 00000000 00000000 00000000 00000000 ................................ 000120
 00000000 00000000 00000000 00000000 00000000 00000000 00000000 00000000 ................................ 000140
 00000000 00000000 00000000 00000000 00000000 00000000 00000000 00000000 ................................ 000160
 00000000 00000000 00000000 00000000 00000000 00000000 00000000 00000000 ................................ 000180
 00000000 00000000 00000000 00000000 00000000 00000000 00000000 00000000 ................................ 0001A0
 00000000 00000000 00000000 00000000 00000000 00000000 00000000 00000000 ................................ 0001C0
 00000000 00000000 00000000 00000000 00000000 00000000 00000000 00000000 ................................ 0001E0

Dump of file SATURN:[PCCOMMON.DUMP.DLL]LOG.TMP;1 on 18-APR-1990 10:47:37.08
File ID (718,13,0)   End of file block 35 / Allocated 36

Virtual block number 25 (00000019), 512 (0200) bytes

 00000000 00000000 00000000 00000000 00000000 00000000 00000000 0000C000 ................................ 000000
 00000000 00000000 00000000 00000000 00000000 00000000 00000000 00000000 ................................ 000020
 00000000 00000000 00000000 00000000 00000000 00000000 00000000 00000000 ................................ 000040
 00000000 00000000 00000000 00000000 00000000 00000000 00000000 00000000 ................................ 000060
 00000000 00000000 00000000 00000000 00000000 00000000 00000000 00000000 ................................ 000080
 00000000 00000000 00000000 00000000 00000000 00000000 00000000 00000000 ................................ 0000A0
 00000000 00000000 00000000 00000000 00000000 00000000 00000000 00000000 ................................ 0000C0
 00000000 00000000 00000000 00000000 00000000 00000000 00000000 00000000 ................................ 0000E0
 00000000 00000000 00000000 00000000 00000000 00000000 00000000 00000000 ................................ 000100
 00000000 00000000 00000000 00000000 00000000 00000000 00000000 00000000 ................................ 000120
 00000000 00000000 00000000 00000000 00000000 00000000 00000000 00000000 ................................ 000140
 00000000 00000000 00000000 00000000 00000000 00000000 00000000 00000000 ................................ 000160
 00000000 00000000 00000000 00000000 00000000 00000000 00000000 00000000 ................................ 000180
 00000000 00000000 00000000 00000000 00000000 00000000 00000000 00000000 ................................ 0001A0
 00000000 00000000 00000000 00000000 00000000 00000000 00000000 00000000 ................................ 0001C0
 00000000 00000000 00000000 00000000 00000000 00000000 00000000 00000000 ................................ 0001E0

Dump of file SATURN:[PCCOMMON.DUMP.DLL]LOG.TMP;1 on 18-APR-1990 10:47:37.08
File ID (718,13,0)   End of file block 35 / Allocated 36

Virtual block number 26 (0000001A), 512 (0200) bytes

 00000000 00000000 00000000 00000000 00000000 00000000 00000000 00000000 ................................ 000000
 00000000 00000000 00000000 00000000 00000000 00000000 00000000 00000000 ................................ 000020
 00000000 00000000 00000000 00000000 00000000 00000000 00000000 00000000 ................................ 000040
 00000000 00000000 00000000 00000000 00000000 00000000 00000000 00000000 ................................ 000060
 00000000 00000000 00000000 00000000 00000000 00000000 00000000 00000000 ................................ 000080
 00000000 00000000 00000000 00000000 00000000 00000000 00000000 00000000 ................................ 0000A0
 00000000 00000000 00000000 00000000 00000000 00000000 00000000 00000000 ................................ 0000C0
 00000000 00000000 00000000 00000000 00000000 00000000 00000000 00000000 ................................ 0000E0
 00000000 00000000 00000000 00000000 00000000 00000000 00000000 00000000 ................................ 000100
 00000000 00000000 00000000 00000000 00000000 00000000 00000000 00000000 ................................ 000120
 00000000 00000000 00000000 00000000 00000000 00000000 00000000 00000000 ................................ 000140
 00000000 00000000 00000000 00000000 00000000 00000000 00000000 00000000 ................................ 000160
 00000000 00000000 00000000 00000000 00000000 00000000 00000000 00000000 ................................ 000180
 00000000 00000000 00000000 00000000 00000000 00000000 00000000 00000000 ................................ 0001A0
 00000000 00000000 00000000 00000000 00000000 00000000 00000000 00000000 ................................ 0001C0
 00000000 00000000 00000000 00000000 00000000 00000000 00000000 00000000 ................................ 0001E0
```

```
Dump of file SATURN:[PCCOMMON.DUMP.DLL]LOG.TMP;1 on 18-APR-1990 10:47:37.08
File ID (718,13,0)   End of file block 35 / Allocated 36

Virtual block number 27 (0000001B), 512 (0200) bytes

00000000 00000000 00000000 00000000 00000000 00000000 00000000 00000000 ................................ 000000
00000000 00000000 00000000 00000000 00000000 00000000 00000000 00000000 ................................ 000020
00000000 00000000 00000000 00000000 00000000 00000000 00000000 00000000 ................................ 000040
00000000 00000000 00000000 00000000 00000000 00000000 00000000 00000000 ................................ 000060
00000000 00000000 00000000 00000000 00000000 00000000 00000000 00000000 ................................ 000080
00000000 00000000 00000000 00000000 00000000 00000000 00000000 00000000 ................................ 0000A0
00000000 00000000 00000000 00000000 00000000 00000000 00000000 00000000 ................................ 0000C0
00000000 00000000 00000000 00000000 00000000 00000000 00000000 00000000 ................................ 0000E0
00000000 00000000 00000000 00000000 00000000 00000000 00000000 00000000 ................................ 000100
00000000 00000000 00000000 00000000 00000000 00000000 00000000 00000000 ................................ 000120
00000000 00000000 00000000 00000000 00000000 00000000 00000000 00000000 ................................ 000140
00000000 00000000 00000000 00000000 00000000 00000000 00000000 00000000 ................................ 000160
00000000 00000000 00000000 00000000 00000000 00000000 00000000 00000000 ................................ 000180
00000000 00000000 00000000 00000000 00000000 00000000 00000000 00000000 ................................ 0001A0
00000000 00000000 00000000 00000000 00000000 00000000 00000000 00000000 ................................ 0001C0
00000000 00000000 00000000 00000000 00000000 00000000 00000000 00000000 ................................ 0001E0

Dump of file SATURN:[PCCOMMON.DUMP.DLL]LOG.TMP;1 on 18-APR-1990 10:47:37.08
File ID (718,13,0)   End of file block 35 / Allocated 36

Virtual block number 28 (0000001C), 512 (0200) bytes

00000000 00000000 00000000 00000000 00000000 00000000 00000000 00000000 ................................ 000000
00000000 00000000 00000000 00000000 00000000 00000000 00000000 00000000 ................................ 000020
00000000 00000000 00000000 00000000 00000000 00000000 00000000 00000000 ................................ 000040
00000000 00000000 00000000 00000000 00000000 00000000 00000000 00000000 ................................ 000060
00000000 00000000 00000000 00000000 00000000 00000000 00000000 00000000 ................................ 000080
00000000 00000000 00000000 00000000 00000000 00000000 00000000 00000000 ................................ 0000A0
00000000 00000000 00000000 00000000 00000000 00000000 00000000 00000000 ................................ 0000C0
00000000 00000000 00000000 00000000 00000000 00000000 00000000 00000000 ................................ 0000E0
00000000 00000000 00000000 00000000 00000000 00000000 00000000 00000000 ................................ 000100
00000000 00000000 00000000 00000000 00000000 00000000 00000000 00000000 ................................ 000120
00000000 00000000 00000000 00000000 00000000 00000000 00000000 00000000 ................................ 000140
00000000 00000000 00000000 00000000 00000000 00000000 00000000 00000000 ................................ 000160
00000000 00000000 00000000 00000000 00000000 00000000 00000000 00000000 ................................ 000180
00000000 00000000 00000000 00000000 00000000 00000000 00000000 00000000 ................................ 0001A0
00000000 00000000 00000000 00000000 00000000 00000000 00000000 00000000 ................................ 0001C0
00000000 00000000 00000000 00000000 00000000 00000000 00000000 00000000 ................................ 0001E0

Dump of file SATURN:[PCCOMMON.DUMP.DLL]LOG.TMP;1 on 18-APR-1990 10:47:37.08
File ID (718,13,0)   End of file block 35 / Allocated 36

Virtual block number 29 (0000001D), 512 (0200) bytes

00000000 00000000 00000000 00000000 00000000 00000000 00000000 00000000 ................................ 000000
00000000 00000000 00000000 00000000 00000000 00000000 00000000 00000000 ................................ 000020
00000000 00000000 00000000 00000000 00000000 00000000 00000000 00000000 ................................ 000040
00000000 00000000 00000000 00000000 00000000 00000000 00000000 00000000 ................................ 000060
00000000 00000000 00000000 00000000 00000000 00000000 00000000 00000000 ................................ 000080
00000000 00000000 00000000 00000000 00000000 00000000 00000000 00000000 ................................ 0000A0
00000000 00000000 00000000 00000000 00000000 00000000 00000000 00000000 ................................ 0000C0
00000000 00000000 00000000 00000000 00000000 00000000 00000000 00000000 ................................ 0000E0
00000000 00000000 00000000 00000000 00000000 00000000 00000000 00000000 ................................ 000100
00000000 00000000 00000000 00000000 00000000 00000000 00000000 00000000 ................................ 000120
00000000 00000000 00000000 00000000 00000000 00000000 00000000 00000000 ................................ 000140
00000000 00000000 00000000 00000000 00000000 00000000 00000000 00000000 ................................ 000160
00000000 00000000 00000000 00000000 00000000 00000000 00000000 00000000 ................................ 000180
00000000 00000000 00000000 00000000 00000000 00000000 00000000 00000000 ................................ 0001A0
00000000 00000000 00000000 00000000 00000000 00000000 00000000 00000000 ................................ 0001C0
00000000 00000000 00000000 00000000 00000000 00000000 00000000 00000000 ................................ 0001E0
```

```
Dump of file SATURN:[PCCOMMON.DUMP.DLL]LOG.TMP;1 on 18-APR-1990 10:47:37.08
File ID (718,13,0)   End of file block 35 / Allocated 36

Virtual block number 30 (0000001E), 512 (0200) bytes

00000000 00000000 00000000 00000000 00000000 00000000 00000000 00000000 ................................ 000000
00000000 00000000 00000000 00000000 00000000 00000000 00000000 00000000 ................................ 000020
00000000 00000000 00000000 00000200 00010000 00000000 00000000 00000000 ................................ 000040
00000000 00000000 00000000 00000000 00000000 00000000 00000000 00000000 ................................ 000060
00000000 00000000 00000000 00000000 00000000 00000000 00000000 00000000 ................................ 000080
00000000 00000000 00000000 00000000 00000000 00000000 00000000 00000000 ................................ 0000A0
00000000 00000000 00000000 00000000 00000000 00000000 00000000 00000000 ................................ 0000C0
00000000 00000000 00000000 00000000 00000000 00000000 00000000 00000000 ................................ 0000E0
00000000 00000000 00000000 00000000 00000000 00000000 00000000 00000000 ................................ 000100
00000000 00000000 00000000 00000000 00000000 00000000 00000000 00000000 ................................ 000120
00000000 00000000 00000000 00000000 00000000 00000000 00000000 00000000 ................................ 000140
00000000 00000000 00000000 00000000 00000000 00000000 00000000 00000000 ................................ 000160
00000000 00000000 00000000 00000000 00000000 00000000 00000000 00000000 ................................ 000180
00000000 00000000 00000000 00000000 00000000 00000000 00000000 00000000 ................................ 0001A0
00000000 00000000 00000000 00000000 00000000 00000000 00000000 00000000 ................................ 0001C0
00000000 00000000 00000000 00000000 00000000 00000000 00000000 00000000 ................................ 0001E0

Dump of file SATURN:[PCCOMMON.DUMP.DLL]LOG.TMP;1 on 18-APR-1990 10:47:37.08
File ID (718,13,0)   End of file block 35 / Allocated 36

Virtual block number 31 (0000001F), 512 (0200) bytes

00000000 00000000 00000000 00000000 00000000 00000000 00000000 00000000 ................................ 000000
00000000 00000000 00000000 00000000 00000000 00000000 00000000 00000000 ................................ 000020
00000000 00000000 00000000 00000000 00000000 00000000 00000000 00000000 ................................ 000040
00000000 00000000 00000000 00000000 00000000 00000000 00000000 00000000 ................................ 000060
00000000 00000000 00000000 00000000 00000000 00000000 00000000 00000000 ................................ 000080
00000000 00000000 00000000 00000000 00000000 00000000 00000000 00000000 ................................ 0000A0
00000000 00000000 00000000 00000000 00000000 00000000 00000000 00000000 ................................ 0000C0
00000000 00000000 00000000 00000000 00000000 00000000 00000000 00000000 ................................ 0000E0
00000000 00000000 00000000 00000000 00000000 00000000 00000000 00000000 ................................ 000100
00000000 00000000 00000000 00000000 00000000 00000000 00000000 00000000 ................................ 000120
00000000 00000000 00000000 00000000 00000000 00000000 00000000 00000000 ................................ 000140
00000000 00000000 00000000 00000000 00000000 00000000 00000000 00000000 ................................ 000160
00000000 00000000 00000000 00000000 00000000 00000000 00000000 00000000 ................................ 000180
00000000 00000000 00000000 00000000 00000000 00000000 00000000 00000000 ................................ 0001A0
00000000 00000000 00000000 00000000 00000000 00000000 00000000 00000000 ................................ 0001C0
00000000 00000000 00000000 00000000 00000000 00000000 00000000 00000000 ................................ 0001E0

Dump of file SATURN:[PCCOMMON.DUMP.DLL]LOG.TMP;1 on 18-APR-1990 10:47:37.08
File ID (718,13,0)   End of file block 35 / Allocated 36

Virtual block number 32 (00000020), 512 (0200) bytes

00000000 00000000 00000000 00000000 00000000 00000000 00000000 00000000 ................................ 000000
00000000 00000000 00000000 00000000 00000000 00000000 00000000 00000000 ................................ 000020
00000000 00000000 00000000 00000000 00000000 00000000 00000000 00000000 ................................ 000040
00000000 00000000 00000000 00000000 00000000 00000000 00000000 00000000 ................................ 000060
00000000 00000000 00000000 00000000 00000000 00000000 00000000 00000000 ................................ 000080
00000000 00000000 00000000 00000000 00000000 00000000 00000000 00000000 ................................ 0000A0
00000000 00000000 00000000 00000000 00000000 00000000 00000000 00000000 ................................ 0000C0
00000000 00000000 00000000 00000000 00000000 00000000 00000000 00000000 ................................ 0000E0
00000000 00000000 00000000 00000000 00000000 00000000 00000000 00000000 ................................ 000100
00000000 00000000 00000000 00000000 00000000 00000000 00000000 00000000 ................................ 000120
00000000 00000000 00000000 00000000 00000000 00000000 00000000 00000000 ................................ 000140
00000000 00000000 00000000 00000000 00000000 00000000 00000000 00000000 ................................ 000160
00000000 00000000 00000000 00000000 00000000 00000000 00000000 00000000 ................................ 000180
00000000 00000000 00000000 00000000 00000000 00000000 00000000 00000000 ................................ 0001A0
00000000 00000000 00000000 00000000 00000000 00000000 00000000 00000000 ................................ 0001C0
00000000 00000000 00000000 00000000 00000000 00000000 00000000 00000000 ................................ 0001E0
```

```
Dump of file SATURN:[PCCOMMON.DUMP.DLL]LOG.TMP;1 on 18-APR-1990 10:47:37.08
File ID (718,13,0)   End of file block 35 / Allocated 36

Virtual block number 33 (00000021), 512 (0200) bytes

00000000 00000000 00000000 00000000 00000000 00000000 00000000 00000000 ................................ 000000
00000000 00000000 00000000 00000000 00000000 00000000 00000000 00000000 ................................ 000020
18D41748 18D41744 `9D4199E 18D40000 00000000 013C1132 00000000 00000000 ........2.<.......Å...Å.D.Å.H.Å. 000040
00000000 00000000 uJ000000 00000200 FFFFFFFF 01010000 00001750 18D4174C L.Å.P........................... 000060
00000000 00000000 00000000 00000000 00000000 00000000 81818101 00000001 ................................ 000080
00000000 00000000 00000000 00000000 00000000 00000000 00000000 00000000 ................................ 0000A0
00000000 00000000 00000000 00000000 00000000 00000000 00000000 00000000 ................................ 0000C0
00000000 00000000 00000000 00000000 00000000 00000000 00000000 00000000 ................................ 0000E0
00000000 00000000 00000000 00000000 00000000 00000000 00000000 00000000 ................................ 000100
00000000 00000000 00000000 00000000 00000000 00000000 00000000 00000000 ................................ 000120
00000000 00000000 00000000 00000000 00000000 00000000 00000000 00000000 ................................ 000140
00000000 00000000 00000000 00000000 00000000 00000000 00000000 00000000 ................................ 000160
0A0A0A0A 0A0A0A0A 0A0A0A0A 0A0A0A0A 0A0A0A0A 0A0A0A0A 0A0A0A00 00000000 ................................ 000180
0A0A0A0A 0A0A0A0A 0A0A0A0A 0A0A0A0A 0A0A0A0A 0A0A0A0A 0A0A0A0A 0A0A0A0A ................................ 0001A0
0A0A0A0A 0A0A0A0A 0A0A0A0A 0A0A0A0A 0A0A0A0A 0A0A0A0A 0A0A0A0A 0A0A0A0A ................................ 0001C0
0A0A0A0A 0A0A0A0A 0A0A0A0A 0A0A0A0A 0A0A0A0A 0A0A0A0A 0A0A0A0A 0A0A0A0A ................................ 0001E0

Dump of file SATURN:[PCCOMMON.DUMP.DLL]LOG.TMP;1 on 18-APR-1990 10:47:37.08
File ID (718,13,0)   End of file block 35 / Allocated 36

Virtual block number 34 (00000022), 512 (0200) bytes

0A0A0A0A 0A0A0A0A 0A0A0A0A 0A0A0A0A 0A0A0A0A 0A0A0A0A 0A0A0A0A 0A0A0A0A ................................ 000000
0A0A0A0A 0A0A0A0A 0A0A0A0A 0A0A0A0A 0A0A0A0A 0A0A0A0A 0A0A0A0A 0A0A0A0A ................................ 000020
0A0A0A0A 0A0A0A0A 0A0A0A0A 0A0A0A0A 0A0A0A0A 0A0A0A0A 0A0A0A0A 0A0A0A0A ................................ 000040
0A0A0A0A 0A0A0A0A 0A0A0A0A 0A0A0A0A 0A0A0A0A 0A0A0A0A 0A0A0A0A 0A0A0A0A ................................ 000060
00000000 00000000 00000000 00000000 00000000 00000000 0000000A 0A0A0A0A ................................ 000080
FFFF0000 00000000 00000000 00000000 FFFF1BDA 00002000 00000000 00000000 .........  ..O.................. 0000A0
66726576 6F206B63 61747320 2D0A0D30 30303652 00003E3E 4753404E 3C3CFFFF ..<<NMSG>>..R6000..- stack overf 0000C0
20656469 76696420 72656765 746E6920 2D0A0D33 30303652 0003000A 0D776F6C low.....R6003..- integer divide  0000E0
61707320 6867756F 6E652074 6F6E2020 0A0D3830 30365200 08000A0D 30207962 by 0.....R6008..- not enough spa 000100
6F6E2020 0A0D3930 30365200 09000A0D 73746E65 6D756772 6120726F 66206563 ce for arguments.....R6009..- no 000120
0A0D746E 65606E6F 7269766E 6520726F 66206563 61707320 6867756F 6E652074 t enough space for environment.. 000140
0D323030 36520002 0020726F 72726520 65606974 206E7572 00FF000A 0D00FC00 .=......run-time error ...R6002. 000160
FF000A0D 64656461 6F6C2074 6F6E2074 6E696F70 20676E69 74616F6C 6620200A .- floating point not loaded.... 000180
00000000 00000006 173A0002 00000005 054C0002 00000004 17540002 0003FFFF ......T.......L.......:......... 0001A0
00501400 009000E0 00140001 00000006 00000000 FFFF0001 000E0352 0000012B +...R...................Å.....P. 0001C0
003E0005 80010001 00F90000 00050000 00000000 00F5FFFF 01F4004A 01130050 P...J.¶...%...........'.......>. 0001E0

Dump of file SATURN:[PCCOMMON.DUMP.DLL]LOG.TMP;1 on 18-APR-1990 10:47:37.08
File ID (718,13,0)   End of file block 35 / Allocated 36

Virtual block number 35 (00000023), 512 (0200) bytes

005A002E 00148002 000400FA 00110003 00000000 0000FFFF FFFF01FE 00080109 ....±...............ª.........Z. 000000
000A005A 001E0014 80020004 010C000F 00030000 00000000 FFFFFFFF 0208000A ..........................Z... 000020
0001000C 0026000A 000F8002 0400011C 00020003 00000000 0000FFFF FFFF0212 ..........................&..... 000040
FFFF0002 000C0026 000A003F 80020000 011F0006 00030000 00000000 FFFFFFFF ....................?...&....... 000060
FFFFFFFF 0003000C 0026000A 006F8002 00000126 00040003 00000000 0000FFFF ............&.....o...&......... 000080
616C7065 527E0000 00000300 656C6966 20676F6C 20726F66 20736E6F 6974704F Options for log file......-Repla 0000A0
43004B4F 00656C69 66206F74 20646E65 7070417E 0073746E 65746E6F 6320651 ce contents.-Append to file.OK.C 0000C0
00000000 00000000 00000000 00000000 00000000 0000706C 6548006C 65636E6, ancel.Help...................... 0000E0
00000000 00000000 00000000 00000000 00000000 00000000 00000000 00000000 ................................ 000100
00000000 00000000 00000000 00000000 00000000 00000000 00000000 00000000 ................................ 000120
00000000 00000000 00000000 00000000 00000000 00000000 00000000 00000000 ................................ 000140
00000000 00000000 00000000 00000000 00000000 00000000 00000000 00000000 ................................ 000160
00000000 00000000 00000000 00000000 00000000 00000000 00000000 00000000 ................................ 000180
00000000 00000000 00000000 00000000 00000000 00000000 00000000 00000000 ................................ 0001A0
00000000 00000000 00000000 00000000 00000000 00000000 00000000 00000000 ................................ 0001C0
00000000 00000000 00000000 00000000 00000000 00000000 00000000 00000000 ................................ 0001E0
```

```
Dump of file SATURN:[PCCOMMON.DUMP.DLL]FILTTOOL.TMP;1 on 18-APR-1990 10:45:55.46
File ID (665,18,0)   End of file block 42 / Allocated 44

Virtual block number 1 (00000001), 512 (0200) bytes

 00000000 00000040 00000000 00000088 0000FFFF 00000004 00000027 01165A40 MZ..'...........|.......a....... 000000
 00000080 00000000 00000000 00000000 00000000 00000000 00000000 00000000 ................................ 000020
 6F6E6E61 63206061 72676F72 70207369 685421CD 4C01B821 CD098400 0EBA1F0E ..□..Ç.e!¡.L.!This program canno 000040
 00000000 00000024 0A00002E 65646F60 20534F44 206E6920 6E757220 65622074 t be run in DOS mode....$....... 000060
 00080007 00000000 00030000 00000000 0006800E 93929721 000704C5 0505454E NE..é...!....................... 000080
 00000000 00000000 00010001 00040000 0000054C 00A30093 007C0078 0040000E ..a.x.|...È.L................... 0000A0
 112E0F00 112E0309 000F0F00 000F0307 263E0F00 263E0082 022E0F00 022E 756 V.........>&..>&................ 0000C0
 46414408 01000004 05621E81 056204D3 08000F01 0AF40422 00040E01 0000 00 ........".¶.....&.b.Ÿ.b......DAF 0000E0
 E3036F03 30001400 0E000A00 01000001 434F5250 4C4F4F54 08000052 45544C49 ILTER...TOOLPROC...........0.o.D 000100
 414C4044 006C6D64 034E4957 40500553 4C4E0353 4C4C4143 534F4408 00041503 .....DOSCALLS.NLS.PMWIN.dml.DMLA 000120
 46595245 55514C4D 44004C45 444F4045 4552464C 40440C4D 54484552 49555143 COUIREHTM.DMLFREEMODEL.DMLQUERYF 000140
 53595245 55515245 544C4946 4C4D4413 5453494C 45455246 4C4D4408 444C4549 IELD.DMLFREELIST.DMLFILTERQUERYS 000160
 40441446 464F5245 544C4946 4C4D440C 4E4F5245 544C4946 4C4D4408 45544154 TATE.DMLFILTERON.DMLFILTEROFF.DM 000180
 44494C4D 44595245 55514C4D 44165245 544C4946 45564954 43415952 4555514C LQUERYACTIVEFILTER.DMLQUERYDMLID 0001A0
 44494C40 44454D41 4E544E49 52505952 4555514C 4D441645 4D414E54 4E495250 PRINTNAME.DMLQUERYPRINTNAMEDMLID 0001C0
 5759454B 4C4C4159 52455551 4C4D4413 454C4241 5245544C 49464449 4C4D440F .DMLIDFILTERABLE.DMLQUERYALLKEYW 0001E0

Dump of file SATURN:[PCCOMMON.DUMP.DLL]FILTTOOL.TMP;1 on 18-APR-1990 10:45:55.46
File ID (665,18,0)   End of file block 42 / Allocated 44

Virtual block number 2 (00000002), 512 (0200) bytes

 52435245 544C4946 4C4D440F 53524554 4C494659 52455551 4C4D440F 5344524F ORDS.DMLQUERYFILTERS.DMLFILTERCR 000000
 51524554 4C49464C 4D441259 4F525453 45445245 544C4946 4C4D4410 45544145 EATE.DMLFILTERDESTROY.DMLFILTERQ 000020
 4C49464C 4D441845 4D414E54 45535245 544C4946 4C4D4410 454D414E 59524555 UERYNAME.DMLFILTERSETNAME.DMLFIL 000040
 46544553 5245544C 49464C4D 44164556 4953554C 434E4946 59524555 51524554 TERQUERYFINCLUSIVE.DMLFILTERSETF 000060
 4C4D4410 444E4146 59524555 51524554 4C49464C 4D441245 56495355 4C434E49 INCLUSIVE.DMLFILTERQUERYFAND.DML 000080
 41455243 59524555 51524554 4C49464C 4D441844 4E414654 45535245 544C4946 FILTERSETFAND.DMLFILTERQUERYCREA 0000A0
 49544E4F 49544145 52435445 53524554 4C49464C 4D44194C 454D4954 4E4F4954 TIONTIMEL.DMLFILTERSETCREATIONTI 0000C0
 4D44174C 454D4954 45544144 50555952 45555152 45544C49 464C4D44 194C454D MEL.DMLFILTERQUERYUPDATETIMEL.DM 0000E0
 51524554 4C49464C 4D44184C 454D4954 45544144 50555445 53524554 4C49464C LFILTERSETUPDATETIMEL.DMLFILTERQ 000100
 52435445 53524554 4C49464C 4D441955 454D4954 4E4F4954 41455243 59524555 UERYCREATIONTIMEU.DMLFILTERSETCR 000120
 45544144 50555952 45555152 45544C49 464C4D44 1955454D 49544E4F 49544145 EATIONTIMEU.DMLFILTERQUERYUPDATE 000140
 4D441755 454D4954 45544144 50555445 53524554 4C49464C 4D441755 454D4954 TIMEU.DMLFILTERSETUPDATETIMEU.DM 000160
 53524554 4C49464C 4D441559 42444554 41455243 59524555 51524554 4C49464C LFILTERQUERYCREATEDBY.DMLFILTERS 000180
 45544144 50555952 45555152 45544C49 464C4D44 17594244 45544145 52435445 ETCREATEDBY.DMLFILTERQUERYUPDATE 0001A0
 4C49464C 4D441659 42444554 41445055 54455352 45544C49 464C4D44 15594244 DBY.DMLFILTERSETUPDATEDBY.DMLFIL 0001C0
 5945484 44415245 544C4946 4C4D4413 5344524F 5759454B 59524555 51524554 TERQUERYKEYWORDS.DMLFILTERADDKEY 0001E0

Dump of file SATURN:[PCCOMMON.DUMP.DLL]FILTTOOL.TMP;1 on 18-APR-1990 10:45:55.46
File ID (665,18,0)   End of file block 42 / Allocated 44

Virtual block number 3 (00000003), 512 (0200) bytes

 44165345 50595454 43454A42 4F595245 55515245 544C4946 4C4D4419 44524F57 WORD.DMLFILTERQUERYOBJECTTYPES.D 000000
 43524554 4C49464C 4D440F45 50595454 43454A42 4F444441 5245544C 49464C4D MLFILTERADDOBJECTTYPE.DMLFILTERC 000020
 54414552 434D454D 004D454D 03444E49 46524554 4C49464C 4D440045 474E4148 HANGE.DMLFILTERFIND.MEM.MEMCREAT 000040
 4F4C4243 4F4C4C41 4D454D00 50414548 594F5254 5345444D 454D0E50 41454845 EHEAP.MEMDESTROYHEAP.MEMALLOCBLO 000060
 4F544C4C 49484954 47084954 47035452 45564E4F 43455241 48534D45 4D0F4B43 CK.MEMSHARECONVERT.GTI.GTIKILLTO 000080
 49544712 47534044 4E455349 54470A43 4F52504C 4F4F5446 45444954 470E4C4F OL.GTIDEFTOOLPROC.GTISENDMSG.GTI 0000A0
 50415441 44585541 59524555 51495447 12574F44 4E49574C 4F4F5459 52455551 QUERYTOOLWINDOW.GTIQUERYAUXDATAP 0000C0
 4C4F4F54 59524555 51495447 12525450 41544144 58554154 45534954 47105254 TR.GTISETAUXDATAPTR.GTIQUERYTOOL 0000E0
 5445524C 4C0A5458 454E4C4C 06444145 484C4C06 6C6C6C6D 6405544E 45524150 PARENT.dmlll.LLHEAD.LLNEXT.LLRET 000100
 534F4408 4F495303 594F5254 5345444C 4C094854 474E454C 4C4C0845 56454952 RIEVE.LLLENGTH.LLDESTROY.SIO.DOS 000120
 00000000 00000000 004C4C44 20524554 4C49460A 000000EF 03010145 54495257 WRITE...ÿ....FILTER DLL......... 000140
 F4468900 00FFFF9A 5016FA46 80026A00 00F446C7 D88EFFFF B81E5657 00000CC8 à...WV.¡...AüF¶..j..F*.P......F¶ 000160
 890000FF FF9A5016 FC468D2D 6A446AFA 76FF008A E9F4468B 0006E903 75000030 =..u.Ô...F¶ô□..v*jDj-.F=.P...... 000180
 8926FA46 8BFC5EC4 0090E9F4 468B0000 00AC9AFA 76FF000E E9037500 003DF446 F¶=..u.Ô...v*.^....F¶Ô..á^•.F*&. 0001A0
 FFFF0056 9A505200 0205FE56 8BFC468B FC77FF26 FE77FF26 065EC404 06468307 ..F..á^.&.w±&.w=.F=.V±...RP.V... 0001C0
 F4468900 00FFFF9A 5016F646 80505200 0205FE56 8BFC468B 0A76FF01 6A08C483 .á.j..v..F=.V±...RP.F-.P......F¶ 0001E0
```

```
Dump of file SATURN:[PCCOMMON.DUMP.DLL]FILTTOOL.TMP;1 on 18-APR-1990 10:45:55.46
File ID (665,18,0)   End of file block 42 / Allocated 44

Virtual block number 4 (00000004), 512 (0200) bytes

 28478926 0A4688FC 5EC40032 E9F44688 0000FFFF 9AFA76FF 000EE903 7500003D =..u.Õ...v*......F¶Õ2.á^•.F.&.G+ 000000
 890000FF FF9AFC76 FFFE76FF 0A76FF29 57892627 478926F8 5688F646 88FC5EC4 á^•.F-.V%&.G'&.W).v..v±.v•...... 000020
 0000F046 C7D88E00 08881E56 57000010 C80006CA C95F5E1F 0000E9F4 4688F446 F¶.F¶Õ...^_èò..à...WV.¡...ÄúFÞ.. 000040
 05E90000 8A000188 010EE999 FFFF0000 9A0A76FF 0C76FF10 76FF00EC E90E4688 .F.Õ§..v..v..v.......Õ..¡..¤..Õ. 000060
 76FFF476 FF0000FF FF9A5016 F2468DFE 76FF0000 FFFF9A50 16FE468D 1076FF01 ..v..F±.P......v±.F·.P......v¶.v 000080
 016A006A 0000FFFF 9A5016FA 468D1076 FFF85689 F6468900 00FFFF9A 800868F2 ·h........F-.V%.v..F*.P.....j.j. 0000A0
 FF9AFA76 FFFC76FF 01006800 0236FF26 0A12068E FFFF68FF FF68F676 FFF876FF .v%.v-h..h......&.6..h...v•.v*.. 0000C0
 008A0000 88000107 C7260A5E C4008AE9 0000FFFF 9A006A10 76FFF046 890000FF ....FÞ.v.j......Õ..á^.&ú...¡..¤. 0000E0
 00FFFF9A 2777FF26 2977FF26 FA5EC400 0001589A 5016FA46 8D1076FF 0082E900 .Õ...v..F*.P.X...á^*&.w)&.w'.... 000100
 76FF0C76 FF0E76FF 1076FF00 51E90000 8A000088 0000004E 9A37FF26 FA5EC400 .á^*&.7.N...¡..¤..Õ¤..v..v..v..v 000120
 E9037510 033DFF1E E9037510 0130002B E90037E9 0000FFFF 9A0676FF 0876FF0A ..v..v......Õ7.Õ+.=..u.Õ..=..u.Õ 000140
 000088FF 88E9FF79 E903751D 803DFF0F E903751D AD3DFF9A E9037510 043DFF04 ..=..u.Õ..=Ü.u.Õ..=¯.u.Õy.Õ¡.¡.. 000160
 00000001 01120002 03000006 012A0203 00129000 0CCAC95F 5E1F0000 E900008A ¤..Õ...^_èò.......*...Å......... 000180
 00000006 00F70002 007D0003 017F0103 00000004 007E0002 00000002 01670002 ..g.......~............)...%..... 0001A0
 037F0006 01E80203 246C0002 016A0005 00130003 01450103 03730006 018C0203 ......s...E.......j...l$..Õ..... 0001C0
 03340005 00190203 03990006 01370203 00260004 01800203 00180004 00990203 ..........§...&...7...........4. 0001E0

Dump of file SATURN:[PCCOMMON.DUMP.DLL]FILTTOOL.TMP;1 on 18-APR-1990 10:45:55.46
File ID (665,18,0)   End of file block 42 / Allocated 44

Virtual block number 5 (00000005), 512 (0200) bytes

 03510005 00380203 038F0006 00D80203 03420005 01C80203 03AC0006 01AD0203 ..Ü...¯...à...B...Ü...e...;...Q. 000000
 03740846 08064688 0007C626 0A5EC400 00F846C7 D88EFFFF 881E5657 000046C8 àF..WV.¡...ÄúF%..á^.&6...F..F.t. 000020
 F446C700 EE46C600 8A46C600 C446C600 FC46C600 C046C602 89E90000 880006E9 Õ..¡..Õ¿.óFà.óF•.óFá.óF¤.óFŸ.úF¶ 000040
 C8468D50 16F4468D 266A8E46 890000FF FF9A5016 FA468D50 16F6468D 026A0000 ..j..F-.P.F*.P......F/j&.F¶.P.Fà 000060
 9A504008 478B2606 5EC45016 EE468D0A 6A8E4689 0000FFFF 9A5016F2 468D5016 .P.F·.P......F/j..FŸ.Pá^.&.G.ƏP. 000080
 8D0A6A08 C48300AE 00CE9A06 77FF2606 5EC45016 C0468D0A 6A08C483 009800CE ö....á.j..Fà.Pá^.&.w..ö.Ü..á.j.. 0000A0
 77FF2606 5EC45016 FC468D0A 6A08C483 00C400CE 9A0A77FF 26065EC4 5016BA46 F¤.Pá^.&.w..ö.á..á.j..F•.Pá^.&.w 0000C0
 8300F000 109A0A76 FF0C76FF 5016EE46 800129E9 CC468808 C4830000 00CE9A02 ..ö.Ï..á..FàÕ)..FŸ.P.v..v....Þ.. 0000E0
 0A76FF0C 76FF5016 C0468D08 C4830103 00109A0A 76FF0C76 FF5016D7 468D08C4 á..F•.P.v..v.......á..Fà.P.v..v. 000100
 50168A46 8D08C483 01290010 9A0A76FF 0C76FF50 16D7468D 08C48301 1600109A ......á..F•.P.v..v....)..á..F¤.P 000120
 5200109A 0A76FF0C 76FF5016 C0468D00 E1E908C4 83013F00 109A0A76 FF0C76FF .v..v....?..á.ÕÄ..Fà.P.v..v....R 000140
 FF0C76FF 5016EE46 8D08C483 01650010 9A0A76FF 0C76FF50 16D7468D 08C48301 ..á..F•.P.v..v....e..á..FŸ.P.v.. 000160
 8A468D08 C4830188 :0109A0A 76FF0C76 FF5016D7 468D08C4 83017800 109A0A76 v....x..á..F•.P.v..v.......á..F¤ 000180
 109A0A76 FF0C76FF 50168A46 80007FE9 08C48301 A100109A 0A76FF0C 76FF5016 .P.v..v....À..á.Õ...F¤.P.v..v... 0001A0
 76FF5016 EE468D08 C48301C7 00109A0A 76FF0C76 FF5016D7 468D08C4 83018400 .Ç..á..F•.P.v..v....ú..á..FŸ.P.v 0001C0
 8D08C483 01ED0010 9A0A76FF 0C76FF50 16D7468D 08C48301 DA00109A 0A76FF0C ..v....Õ..á..F•.P.v..v....Ú..á.. 0001E0

Dump of file SATURN:[PCCOMMON.DUMP.DLL]FILTTOOL.TMP;1 on 18-APR-1990 10:45:55.46
File ID (665,18,0)   End of file block 42 / Allocated 44

Virtual block number 6 (00000006), 512 (0200) bytes

 3DFED0E9 0375C008 001AE900 1DE908C4 83021F00 109A0A76 FF0C76FF 5016C046 Fá.P.v..v.......á.Õ..Õ...àu.ÕÄ±= 000000
 4F00109A 0A76FF0C 76FF0042 681E0000 E9FF84E9 03750002 3DFF2AE9 03750001 ..u.Õ*.=..u.Õ..Õ...hB..v..v....O 000020
 0A6A0C04 6F832606 5EC40001 F846C700 0DE9037F 0C047F83 26065EC4 08C48302 ..á.á^.&......Õ..úF%..á^.&.o..j. 000040
 9A0A76FF 0C76FF50 16C4468D 08C48302 6200CE9A 0477FF26 065EC450 16C4468D .Fá.Pá^.&.w..ö.b..á..Fá.P.v..v.. 000060
 7F832606 5EC408C4 83029400 109A0A76 FF0C76FF 50160946 8008C483 02750010 ..u..á..Fl.P.v..v.......á.á^.&.. 000080
 76FF5016 FC468008 C48302A7 00109A0A 76FF0C76 FF004468 1E0012E9 037C0A02 ..|.Õ...hD..v..v....Ï..á..F•.P.v 0000A0
 9A0A76FF 0C76FF00 46681E00 15E90375 00F87E83 08C48302 C200109A 0A76FF0C ..v....ô..á..~%.u.Õ...hF..v..v.. 0000C0
 E9000088 08C483FF FF00109A 0A76FF0C 76FF004A 681E0012 E908C483 02070010 ..▪..á.Õ...hJ..v..v.......á.¡..Õ 0000E0
 C48303C4 00869A06 76FF0876 FFD88E00 08881E56 5700002C C8C8C95F 5E1F0000 ...^_èùà,..WV.¡...Ä.v..v..Ñ.á..á 000100
 FF0003E9 00000846 C700DC46 C60001FE 46C70000 D446C700 000646C7 DA468904 ..FÕúF•..úFå..úF±..óFÉ.úFÁ..Õ... 000120
 00FE7E83 000CE903 74203880 260676C4 D85E8800 82E90372 D846390A 46880846 FÄ.FO9FÄr.Õ...^Aáv.&.8 t.Õ...~±. 000140
 00D47E83 0023E903 74203880 260676C4 D85E8800 00FE46C7 FFD7E900 03E90375 u.Õ..Õ•.úF±...^Aáv.&.8 t.Õ#..-å. 000160
 88FFA0E9 DC428806 46FFD676 88008A26 0676C4D8 5E880001 D446C700 1AE90374 t.Õ..úFå...^Aáv.&...v•.F•.BÉÕ... 000180
 0676C4D8 5E88FF85 E90003E9 03750004 7E83000C E9037420 38802606 76C4D85E ^Aáv.&.8 t.Õ...-å.u.Õ..Õ...^Äáv. 0001A0
 76FF0876 FF5016DC 4680000C 42C60676 88FF70E9 DC428806 46FFD676 88008A26 &...v•.F•.BÉÕp..v•6BÉ..FÉ.P.v..v 0001C0
 D88E02EF 881E5657 000036C8 CBC95F5E 1F0000E9 00008808 C4830082 00569A06 ..V....á.¡..Õ...^_èùà6..WV.¡ÿ..Ä 0001E0
```

```
Dump of file SATURN:[PCCOMMON.DUMP.DLL]FILTTOOL.TMP;1 on 18-APR-1990 10:45:55.46
File ID (665,18,0)   End of file block 42 / Allocated 44

Virtual block number 7 (00000007), 512 (0200) bytes

 FF02E79A 0676FF08 76FF0551 E90001B8 0006E903 740C4608 0A468800 00FE46C7 úF±...F..F.t.Õ..¡..Õ0..v..v..Õ.. 000000
 8D266ACA 46890000 004F9A50 16FC468D 5016FA46 8D026A00 00F846C7 04C483FF ..á.úF%..j..F*.P.F=.P.O....Fòj&. 000020
 88D8468A F2468B3D 468ACA46 89000000 689A5016 F6468050 16CC4680 5016F846 F%.P.Fa.P.F-.P.h....Fò.Fï.F·.FÜ. 000040
 C4001AE9 03740147 3826F446 8A065EC4 034FE9D0 46880000 07C7260A 5EC4F446 F¶á^.&ú....FÁÕ0.á^..F¶&8G.t.Õ..á 000060
 26F4468A 065EC400 44E90002 FE46C708 4789260A 5EC40031 2DE42A07 8A26065E ^.&..*ö-1.á^.&.G.úF±..Õ0.á^..F¶& 000080
 4F8A2606 5EC4E0[illegible] C103E001 E0D1C888 E42A078A 26065EC4 002FE903 74024738 8G.t.Õ/.á^.&..*ö.àiÁiÁ.èiÁá^.&.O 0000A0
 FE768804 8AE900[illegible] 880006E9 0003FE46 C7084789 260A5EC4 02112DC1 03ED2A01 .*Ú.è-..á^.&.G.úF±..Õ..¡..Õ...v± 0000C0
 0A5EC400 302DE42A 008A2606 76C4FE5E 88001CE9 03740140 3826F446 8A065EC4 á^..F¶&8a.t.Õ...^±áv.&..*ö-0.á^. 0000E0
 FE5E8800 34E90374 02403826 F4468A06 5EC4FE76 88004CE9 02FE4683 06478926 &.G..F±.ÕL..v±á^..F¶&8a.t.Õ4..^± 000100
 C103ED2A 01488A26 065EC4FE 7688E0D1 C103E0D1 E0D1C888 E42A008A 260676C4 áv.&..*ö.àiÁiÁ.èiÁ.v±á^.&.H.*Ú.è 000120
 008A2606 76C4FE5E 880410E9 0001B800 06E903FE 46830647 89260A5E C402102D -..á^.&.G..F±.Õ..¡..Õ...^±áv.&.. 000140
 0A5EC402 102DC103 ED2A0148 8A26065E C4FE7688 E0D1C103 E0D1E0D1 C888E42A *ö.àiÁiÁ.èiÁ.v±á^.&.H.*Ú.è-..á^. 000160
 078A2606 5EC4001A E9037401 473826F4 468A065E C4024EE9 03FE4683 0A478926 &.G..F±.ÕN.á^..F¶&8G.t.Õ..á^.&.. 000180
 03740247 3826F446 8A065EC4 0044E900 02FE46C7 06478926 0A5EC400 302DE42A *ö-0.á^.&.G.úF±..ÕD.á^..F¶&8G.t. 0001A0
 C103ED2A 014F8A26 065EC4E0 D1C103E0 D1E0D1C8 88E42A07 8A26065E C4002FE9 Õ/.á^.&..*ö.àiÁiÁ.èiÁá^.&.O.*Ú.è 0001C0
 468A065E C4FE7688 036FE900 01B80006 E90003FE 46C70647 89260A5E C402102D -..á^.&.G.úF±..Õ..¡..Õo..v±á^..F 0001E0

Dump of file SATURN:[PCCOMMON.DUMP.DLL]FILTTOOL.TMP;1 on 18-APR-1990 10:45:55.46
File ID (665,18,0)   End of file block 42 / Allocated 44

Virtual block number 8 (00000008), 512 (0200) bytes

 83084789 260A5EC4 00312DE4 2A008A26 0676C4FE 5E88001C E9037401 403826F4 ¶&8a.t.Õ...^±áv.&..*ö-1.á^.&.G.. 000000
 8A260676 C4FE5E88 0034E903 74024038 26F4468A 065EC4FE 7688004C E902FE46 F±.ÕL..v±á^..F¶&8a.t.Õ4..^±áv.&. 000020
 5EC40211 2DC103ED 2A01488A 26065EC4 FE7688E0 D1C103E0 D1E0D1C8 8BE42A00 .*ö.àiÁiÁ.èiÁ.v±á^.&.H.*Ú.è-..á^ 000040
 D1C88BE4 2A008A26 0676C4FE 5E8802F5 E90001B8 0006E903 FE468308 4789260A .&.G..F±.Õ..¡..ÕX..^±áv.&..*ö.àí 000060
 830A4789 260A5EC4 02102DC1 03ED2A01 488A2606 5EC4FE76 88E0D1C1 03E0D1E0 ÁiÁ.èiÁ.v±á^.&.H.*Ú.è-..á^.&.G.. 000080
 2A014F8A 26065EC4 E0D1C103 E0D1E001 C888E42A 078A2606 5EC40133 E903FE46 F±.Õ3.á^.&..*ö.àiÁiÁ.èiÁá^.&.O.* 0000A0
 26065EC4 001BE903 74044738 26F4468A 065EC40A 4789260A 5EC40210 2DC103ED Ú.è-..á^.&.G.á^..F¶&8G.t.Õ..á^.& 0000C0
 473826F4 468A065E C40045E9 0005FE46 C7084789 260A5EC4 00312DE4 2A03478A .G.*ö-1.á^.&.G.úF±..ÕE.á^..F¶&8G 0000E0
 044F8A26 065EC4E0 D1C103E0 D1E0D1C8 88E42A03 478A2606 5EC40030 E9037405 .t.Õ0.á^.&.G.*ö.àiÁiÁ.èiÁá^.&.O. 000100
 C4FE7688 0228E900 01880006 E90006FE 46C70847 89260A5E C402112D C103ED2A *Ú.è-..á^.&.G.úF±..Õ..¡..Õ+..v±á 000120
 260A5EC4 00302DE4 2A008A26 0676C4FE 5E88001C E9037401 403826F4 468A065E ^..F¶&8a.t.Õ...^±áv.&..*ö-0.á^.& 000140
 C4FE5E88 0034E903 74024038 26F4468A 065EC4FE 7688004C E902FE46 83064789 .G..F±.ÕL..v±á^..F¶&8a.t.Õ4..^±á 000160
 2DC103ED 2A01488A 26065EC4 FE7688E0 D1C103E0 D1E0D1C8 88E42A00 8A260676 v.&..*ö.àiÁiÁ.èiÁ.v±á^.&.H.*Ú.è- 000180
 0B001AE9 001DE900 20E901B1 E90001B8 0006E903 FE468306 4789260A 5EC40210 ..á^.&.G..F±.Õ..¡..ÕY.Õ .Õ..Õ... 0001A0
 26065EC4 FE7688FF E0E9FED0 E9037500 0230FDB0 E9037500 013DFCAA E90375C0 àu.Õ¯•=..u.Õ§»=..u.ÕÁ±ÕÁ..v±á^.& 0001C0
 000447C7 260A5EC4 001BE903 74003880 260676C4 FE5E8800 0FE90375 00FF7880 .x..u.Õ...^±áv.&.8.t.Õ..á^.&úG.. 0001E0

Dump of file SATURN:[PCCOMMON.DUMP.DLL]FILTTOOL.TMP;1 on 18-APR-1990 10:45:55.46
File ID (665,18,0)   End of file block 42 / Allocated 44

Virtual block number 9 (00000009), 512 (0200) bytes

 E9037401 403826F2 468A065E C4FE7688 0157E900 00880000 0247C726 0A5EC400 .á^.&úG...¡..ÕW..v±á^..F·&8a.t.Õ 000000
 7688004C E902FE46 83044789 260A5EC4 00302DE4 2A008A26 0676C4FE 5E88001C ...^±áv.&..*ö-0.á^.&.G..F±.ÕL..v 000020
 D1E0D1C8 88E42A00 8A260676 C4FE5E88 0034E903 74024038 26F2468A 065EC4FE ±á^..F·&8a.t.Õ4..^±áv.&..*ö.àiÁi 000040
 FE468304 4789260A 5EC40210 2DC103ED 2A01488A 26065EC4 FE7688E0 D1C103E0 Á.èiÁ.v±á^.&.H.*Ú.è-..á^.&.G..F± 000060
 C4FE7688 0010E903 75014038 26F2468A 065EC4FE 7688000D E90001B8 0006E903 .Õ..¡..ÕY..v±á^..F·&8a.u.Õ...v±á 000080
 4789260A 5EC40030 2DE42A00 8A260676 C4FE5E88 001CE903 74000178 8026065E ^.&.x..t.Õ...^±áv.&..*ö-0.á^.&.G 0000A0
 FE7688E0 D1C103E0 D1E0D1C8 88E42A00 8A260676 C4FE5E88 0031E902 FE468302 ..F±.Õ1..^±áv.&..*ö.àiÁiÁ.èiÁ.v± 0000C0
 9A0676FF 0876FF03 FE458302 4789260A 5EC40210 2DC103ED 2A01488A 26065EC4 á^.&.H.*Ú.è-..á^.&.G..F±..v..v.. 0000E0
 76C4FE5E 88004CE9 00008800 06E90373 FE4639FC 4688FC46 8904C483 0210C0086 Ñ.•..á..F•.F•9F±s.Õ..¡..ÕL..^±áv 000100
 26065EC4 FE768800 28E90374 50388026 0676C4FE 5E88000F E9037570 3880??06 .&.8pu.Õ...^±áv.&.8Pt.Õ(..v±á^.& 000120
 04478326 0A5EC400 08E90374 4D017880 26065EC4 FE768800 10E90375 60017??90 .x.mu.Õ...v±á^.&.x.Mt.Õ..á^.&.G. 000140
 02680676 FF0876FF D88E030C 881E5657 000022C8 CBC95F5E 1F0000E9 0000880C .¡..Õ...^_èüà"..WV.¡É..Ä.v..v.h. 000160
 E90000B8 0006E903 740C4608 0A468800 00FFFF9A 006A006A 216A006A 01436801 .hC.j.j!j.j.......F..F.t.Õ..¡..Õ 000180
 5016DE46 8D010268 0676FF08 76FF0000 FFFF9A50 16DE4680 0A76FF0C 76FF0029 )..v..v..F8.P......v..v.h...F8.P 0001A0
 FF0876FF D88E0954 881E5657 00002AC8 CBC95F5E 1F0000E9 0000B800 00FFFF9A .....¡..Õ...^_èüà*..WV.¡T..Ä.v.. 0001C0
 5016FC46 8D0A76FF 0C76FF00 000A329A 006A006A 006A006A 016E6801 05680676 v.h..hn.j.j.j.j..2....v..v..F•.P 0001E0
```

Dump of file SATURN:[PCCOMMON.DUMP.DLL]FILTTOOL.TMP;1 on 18-APR-1990 10:45:55.46
File ID (665,18,0) End of file block 42 / Allocated 44

Virtual block number 10 (0000000A), 512 (0200) bytes

```
56890646 8900000A 509AFC76 FFFE76FF 0000FFFF 9AFC76FF FE76FF00 00FFFF9A ......v±.v•......v±.v•.P....F•.V 000000
FF0876FF 0000098E 9A50160A 46800676 FFD876FF 0060E903 75084608 06468808 Ä.F•.FÄu.Õ'..vÄ.v•.FO.P......v.. 000020
00FFFF9A FC76FFFE 76FF0000 09609A50 160A4680 006A006A 01616801 05680676 v.h..h•.j.j..FÖ.P.■....v±.v•.... 000040
00008800 0CE90856 89064689 0000FFFF 9AFC76FF FE76FF00 14E90375 00003000 .=..u.Õ...v±.v•......F•.VÄÕ..¡.. 000060
88881E56 5700000A C8C8C95F 5E1F0000 E90000B8 FF95E908 56890646 8900008A ¤...F•.VÄÕ..¡..Õ...^_èùà...WV.¡¡ 000080
080A4688 00000901 9A006A00 6A096A00 6A014368 01086806 76FF0876 FFD88E09 ..Ä.v..v.h..hC.j.j.j.j..l....F.. 0000A0
0876FF00 00FFFF9A 5016F646 8D0A76FF 0C76FF00 26E90000 880006E9 03740C46 F.t.Õ..¡..Õ&..v..v..F-.P......v. 0000C0
881E5657 00000AC8 CBC95F5E 1F0000E9 000009A1 9A5016F6 46800108 680676FF .v.h...F-.P.Ä...Õ...^_èùà...WV.¡ 0000E0
0A468800 000A989A 006A006A 096A006A 01436801 1C680676 FF0876FF D88E0A7F ...Ä.v..v.h..hC.j.j.j.j.......F. 000100
76FF0000 FFFF9A50 16F6468D 0A76FF0C 76FF0026 E90000B8 0006E903 740C4608 .F.t.Õ..¡..Õ&..v..v..F-.P......v 000120
1E565700 002AC8C8 C95F5E1F 0000E900 000ACC9A 5016F646 80011C68 0676FF08 ..v.h...F-.P.ä...Õ...^_èùà*..WV. 000140
46880000 0AF99A00 6A006A21 6A006A01 43680127 680676FF 0876FF08 8E0AE088 ¡Ä..Ä.v..v.h'.hC.j.j!j.j..*....F 000160
880000FF FF9A5016 F846800A 76FF0C76 FF005EE9 00008800 06E90374 0C46080A ..F.t.Õ..¡..Õ^..v..v..F½.P...... 000180
468904C4 8308E200 EA9A5016 F8468000 26E90006 46C60007 E90374FA 4608F846 F½.F*t.Õ..6F•.Õ&..F½.P.õ.ã..á..F 0001A0
01276806 76FF0876 FF08C483 03FF0000 9AFC76FF FE76FF50 16064680 FE5689FC •.V±.F•.P.v±.v•......á..v..v.h'. 0001C0
76FFD88E 0841B81E 56570000 2AC8C8C9 5F5E1F00 00E90000 0B2D9A50 16064680 .F•.P.-...Õ...^_èùà*..WV.¡A..Ä.v 0001E0
```

Dump of file SATURN:[PCCOMMON.DUMP.DLL]FILTTOOL.TMP;1 on 18-APR-1990 10:45:55.46
File ID (665,18,0) End of file block 42 / Allocated 44

Virtual block number 11 (0000000B), 512 (0200) bytes

```
E903740C 460B0A46 8B00000B 5A9A006A 006A216A 006A0143 68012668 06"'FF08 ..v.h&.hC.j.j!j.j..Z....F..F.t.Õ 000000
0374FA46 08F8468B 0000FFFF 9A5016F8 46800A76 FF0C76FF 005EE900 0088 106 ..¡..Õ^..v..v..F½.P......F½.F*t. 000020
D6468DFE 5689FC46 8904C483 0B9900EA 9A5016F8 46800026 E9000646 C6000.E9 Õ..6F•.Õ&..F½.P.õ....á..F•.V±.F• 000040
C69A5016 D6468001 26680676 FF0876FF 08C48308 8200009A FC76FFFE 76FF5016 .P.v±.v•...ÿ..á..v..v.h&..F•.P.ó 000060
01286806 76FF0876 FFD88E0B DAB81E56 5700002A C8C8C95F 5E1F0000 E900000B ...Õ...^_èùà*..WV.¡Ö..Ä.v..v.h(. 000080
5EE90000 880006E9 03740C46 080A4688 000008F3 9A006A00 6A216A00 6A014368 hC.j.j!j.j..ø....F..F.t.Õ..¡..Õ^ 0000A0
000646C6 0007E903 74FA4608 F8468800 00FFFF9A 5016F846 8D0A76FF 0C76FF00 ..v..v..F½.P......F½.F*t.Õ..6F•. 0000C0
76FFFE76 FF501606 4680FE56 89FC4689 04C4830C 3200EA9A 5016F846 800026E9 Õ&..F½.P.õ.2..á..F•.V±.F•.P.v±.v 0000E0
1F0000E9 00000C5F 9A501606 46800128 680676FF 0876FF08 C4830C4B 00009AFC •...K..á..v..v.h(..F•.P._...Õ... 000100
216A006A 01436801 24680676 FF0876FF D88E0C73 881E5657 00002AC8 CBC95F5E ^_èùà*..WV.¡s..Ä.v..v.h$.hC.j.j! 000120
0A76FF0C 76FF005E E90000B8 0006E903 740C4608 0A468800 000C8C9A 006A006A j.j.......F..F.t.Õ..¡..Õ^..v..v. 000140
16F8468D 0026E900 D646C600 07E90374 FA4608F8 46880000 FFFF9A50 16F84680 .F½.P......F½.F*t.Õ..6F•.Õ&..F½. 000160
830CE400 009AFC76 FFFE76FF 50160646 8DFE5689 FC468904 C4830CC8 00EA9A50 P.õ.ù..á..F•.V±.F•.P.v±.v•...Õ.. 000180
0008C8C8 C95F5E1F D000E900 000CF89A 50160646 8D012468 0676FF08 76FF08C4 á..v..v.h$..F•.P.½...Õ...^_èùà.. 0001A0
8900000E 2A9A0676 FF0876FF 000009EC 9A0676FF 0876FFD8 8E000C88 1E565700 .WV.¡...Ä.v..v..š....v..v..*.... 0001C0
0000FFFF 9A5016F8 4680FC76 FFFE76FF 0076E903 75FE4608 FC4688FE 5689FC46 F•.V±.F•.F±u.Õv..v±.v•.F½.P..... 0001E0
```

Dump of file SATURN:[PCCOMMON.DUMP.DLL]FILTTOOL.TMP;1 on 18-APR-1990 10:45:55.46
File ID (665,18,0) End of file block 42 / Allocated 44

Virtual block number 12 (0000000C), 512 (0200) bytes

```
83006400 8C9AF876 FFFA76FF 0A76FF0C 76FF005E E9849288 0006E903 75000030 =..u.Õ..¡..Õ^..v..v..v*.v½...d.. 000000
03750000 3000000A 309A0676 FF0876FF 003CE900 01B80006 E9037400 003008C4 á.=..t.Õ..¡..Õ<..v..v..=...=..u. 000020
FC468900 00BA0000 B8000CE9 FE5689FC 46890000 09F79A06 76FF0876 FF0014E9 Õ...v..v..¥....F•.V±Õ..¡..¤...F• 000040
D646C7D8 8E0DA588 1E565700 0030C8CB C95F5E1F 0000E900 0088FF7F E9FE5689 .V±Õ..¡..Õ...^_èùà0..WV.¡E..ÄùF• 000060
46080E46 88000000 259A006A 006A006A 006A016E 68011368 0676FF08 76FF0000 ...v..v.h..hn.j.j.j.j..¥....F..F 000080
16D44680 0A76FF0C 76FF0000 FFFF9A50 16FC4680 0E76FF10 76FF0010 E9037510 .u.Õ...v..v..F•.P......v..v..Få. 0000A0
0A76FF0C 76FF0000 FFFF9A0A 76FF0C76 FF0008E9 03750004 7E830000 FFFF9A50 P......~å.u.Õ...v..v.......v..v. 0000C0
FF0008E9 03750004 7E830256 89D04689 FA5688F8 46880000 FFFF9A50 16F84680 .F½.P......F½.V*.FÅ.V@.-å.u.Õ... 0000E0
C40A76FF 0C76FF00 81E90375 02470B26 078826F8 5EC40000 FFFF9A0A 76FF0C76 v..v......á^½&..&.G.u.Õ...v..v.á 000100
61680113 680676FF 0876FF00 00FFFF9A 50160846 8D026A37 FF260277 FF26F85E ^½&.w.&.7j..FÄ.P......v..v.h..ha 000120
50160846 8D0035E9 03751046 080E4688 00000F6C 9A501608 46800676 FF006A01 .j..v•.FÄ.P.l....F..F.u.ÕS..FÄ.P 000140
68011368 0676FF08 76FF001A E9037500 003008C4 83007D00 9D9AFC76 FFFE76FF .v±.v•...}..á.=..u.Õ...v..v.h..h 000160
0A76FF0C 76FFFF70 E904F846 830646FF 00000E77 9A016A00 6A0676FF 006A0164 d.j..v•j.j..w....F•.F½.Õp..v..v. 000180
0E59881E 56570000 02C8C8C9 5F5E1F00 00E90000 880000FF FF9AD076 FFD276FF .v@.vÅ.....¡..Õ...^_èùà...WV.¡Y. 0001A0
FF000000 809A0676 FF0876FF 0060E903 75000800 00FFFF9A 0676FF08 76FFD88E .Ä.v..v.......Äu.Õ'..v..v..¯.... 0001C0
06E90374 FE46390A 4688003E E90375FF FE7E83FE 46890000 10019A06 76FF0876 v..v.......F±.~±.u.Õ>..F.9F±t.Õ. 0001E0
```

```
Dump of file SATURN:[PCCOMMON.DUMP.DLL]FILTTOOL.TMP;1 on 18-APR-1990 10:45:55.46
File ID (665,18,0)   End of file block 42 / Allocated 44

Virtual block number 13 (0000000D), 512 (0200) bytes

 0676FF08 76FF0011 E9037500 00300000 0E179A06 76FF0876 FF0033E9 00018800 .j..Õ3..v..v......=..u.Õ...v..v. 000000
 C8CBC95F 5E1F0000 E90000B8 FFB9E9FE 4689FFFF 880006E9 FE468900 0000B89A .É....F±Õ..j...F±Õ¿.j..Õ...^_èùà 000020
 9A006A00 6A006A00 6A016E68 01226806 76FF0876 FFD8BE0F 9EB81E56 57000020  ..WV.j...Á.v..v.h".hn.j.j.j.j.. 000040
 C70000FF FF9A5016 FA46800E 76FF1076 FF0010E9 03751046 080E4688 00001002 ø....F..F.u.Õ...v..v..Fª.P.....ú 000060
 9A136A50 16E64680 E276FF0A 76FF0C76 FFE246FF 0003E900 00E446C7 0001E246 Fâ..úFÕ..Õ...Fã.v..v..vã.Fİ.Pj.. 000080
 FFFFCDE9 0003E903 7400E67E 800087E9 0003E903 7500E07E 83E04689 0000FFFF .....FÁ.~Á.u.Õ..Õ...~İ.t.Õ..Õë.. 0000A0
 76FF0876 FF005CE9 037500FE 7E830000 FFFF9A50 16FE4680 E276FF0A 76FF0C76 v..v..vã.F±.P......~±.u.Õ\..v..v 0000C0
 33E90375 1046080E 46880000 11109A50 16E64680 E476FF00 6A016168 01226806 .h".ha.j..vÕ.Fİ.P......F..F.u.Õ3 0000E0
 0676FF08 76FF001A E9037500 003006C4 830F490F 969AFA76 FFFC76FF E276FF00 ..vã.v=.vª...I..ó.=..u.Õ...v..v. 000100
 0000E900 00B8FF52 E9L446FF 00000F2C 9A016A00 6AE476FF 006A0164 68012268 h".hd.j..vÕj.j..,....FÕÕR.j..Õ.. 000120
 10E90375 0C460B0A 46880001 FE46C7D8 8E1027B8 1E565700 0002C8CB C5_^5E1F .^_èùà...WV.j'..ÁúF±...F..F.u.Õ. 000140
 0676FF08 76FF0035 E9037500 FE7E8300 00FFFF9A 5016FE46 8D0A76FF 0C7c F00 ..v..v..F±.P......~±.u.Õ5..v..v. 000160
 6A012568 011F6806 76FF0876 FF000011 889A006A 006A016A 006A0125 68011:68 h..h%.j.j.j.j.......v..v.h..h%.j 000180
 6A006A00 6A012568 011E6806 76FF0876 FF0032E9 000011A4 9A006A00 6A006A00 .j.j.j..É..Õ2..v..v.h..h%.j.j.j 0001A0
 0010409A 006A006A 016A006A 01256801 1F680676 FF0876FF 0000118D 9A006A00 .j..§....v..v.h..h%.j.j.j.j..ä.. 0001C0
 0A468800 01FE46C7 D88E112D B81E5657 000002C8 CBC95F5E 1F0000E9 00008800 .j..Õ...^_èùà...WV.j-..ÁúF±...F. 0001E0

Dump of file SATURN:[PCCOMMON.DUMP.DLL]FILTTOOL.TMP;1 on 18-APR-1990 10:45:55.46
File ID (665,18,0)   End of file block 42 / Allocated 44

Virtual block number 14 (0000000E), 512 (0200) bytes

 35E90375 00FE7E83 0000FFFF 9A5016FE 46800A76 FF0C76FF 0010E903 750C4608 .F.u.Õ...v..v..F±.P......~±.u.Õ5 000000
 0676FF08 76FF0000 122F9A00 6A006A01 6A006A01 25680120 680676FF 0876FF00 ..v..v.h .h%.j.j.j.j../....v..v. 000020
 68012068 0676FF08 76FF0032 E9000012 4B9A006A 006A006A 006A0125 68012168 hI.h%.j.j.j.j..K...Õ2..v..v.h .h 000040
 6A016A00 6A012568 01216806 76FF0876 FF000012 649A006A 006A006A 006A0125 %.j.j.j.j..d....v..v.hI.h%.j.j.j 000060
 FFD88E11 04B81E56 57000002 C8CBC95F 5E1F0000 E90000B8 0000116F 9A006A00 .j..o...j..Õ...^_èùà...WV.jä..Ä. 000080
 75FFFE7E 83FE4689 000012BA 9A006A00 6AFF6A00 6A016568 0A76FF06 76FF0876 v..v..v.he.j.j.j.j..¤....F±.~±.u 0000A0
 76FF0000 12D49A00 6A006AFE 76FF006A 0164680A 76FF0676 FF0876FF 003AE903 .Õ:..v..v..v.hd.j..v±j.j..å....v 0000C0
 00B8FF8D E9FE4689 00001216 9A006A00 6AFE76FF 006A0165 680A76FF 0676FF08 ..v..v.he.j..v±j.j.......F±Õ§.j. 0000E0
 681E0102 680676FF 0876FFD8 8E127B88 1E565700 0000C8CB C95F5E1F 0000E900 .Õ...^_èùà...WV.j{..Á.v..v.h...h 000100
 680676FF 0876FF00 0013279A 004F681E 01276806 76FF0876 FF000013 159A004E N......v..v.h'..hO..'....v..v.h 000120
 0876FF00 00134B9A 0051681E 01286806 76FF0876 FF000013 399A0050 681E0126 &..hP..9....v..v.h(..hQ..K....v. 000140
 00136F9A 0053681E 01086806 76FF0876 FF000013 5D9A0052 681E0124 680676FF .v.h$..hR..]....v..v.h...hS..o.. 000160
 9012739A 0676FF08 76FF0122 68000000 919A0054 681E011C 680676FF 0876FF00 ..v..v.h...hT......h"..v..v..s.. 000180
 739A0676 FF0876FF 01056806 C48313A1 12739A06 76FF0876 FF011368 06C48313 ..á.h...v..v..s.À..á.h...v..v..s 0001A0
 FF000013 D49A006A 006A016A 006A0125 68011E68 0676FF08 76FF06C4 8310ED12 .Ú..á..v..v.h..h%.j.j.j.j..å.... 0001C0
 20680676 FF0876FF 000013ED 9A006A00 6A006A00 6A012568 011F6806 76FF0876 v..v.h..h%.j.j.j.j..Ú....v..v.h  0001E0

Dump of file SATURN:[PCCOMMON.DUMP.DLL]FILTTOOL.TMP;1 on 18-APR-1990 10:45:55.46
File ID (665,18,0)   End of file block 42 / Allocated 44

Virtual block number 15 (0000000F), 512 (0200) bytes

 6A006A01 25680121 680676FF 0876FF00 0014069A 006A006A 016A006A 01256801 .h%.j.j.j.j.......v..v.hI.h%.j.j 000000
 8E12F188 1E565700 0000C8CB C95F5E1F 0000E900 00880000 12949A00 6A006A00 .j.j......j..Õ...^_èùà...WV.jþ.. 000020
 1452094C 9A0676FF 0876FF0E 76FF1076 FF04C483 143E12E9 9A0676FF 0876FF08 Á.v..v..Õ.>..á..v..v..v..v..L.R. 000040
 0876FF0E 76FF1076 FF08C483 14660A77 9A0676FF 0876FF0E 76FF1076 FF08C483 .á..v..v..v..v..w.f..á..v..v..v. 000060
 FF08C483 148E0839 9A0676FF 0876FF0E 76FF1076 FF08C483 147A0AD8 9A0676FF .v..Á.z..á..v..v..v..v..9....á.. 000080
 9A0676FF 0876FF0E 76FF1076 FF08C483 14A208D2 9A0676FF 0876FF0E 76FF1076 v..v..v..v..Ø.Á..á..v..v..v..v.. 0000A0
 76FF1076 FF08C483 14000004 9A0676FF 0876FF0E 76FF1076 FF08C483 14B60C6B k.Ñ..á..v..v..v..v....Á..á..v..v 0000C0
 76FF0C76 FF0E76FF 1076FF0C C483137F 0E519A06 76FF0876 FF0A76FF 0C76FF0E ..v..v..v..v..Q....á..v..v..v..v 0000E0
 15121125 9A0676FF 0876FF0E 76FF1076 FF0CC483 14FE101F 9A0676FF 0876FF0A ..v..v....±..á..v..v..v..v..%... 000100
 5F5E1F00 00E90000 B808C483 142A11CC 9A0676FF 0876FF0E 76FF1076 FF08C483 .á..v..v..v..v..ä.*..á.j..Õ...^_ 000120
 76FF0000 FFFF9A50 16FC4680 0A76FF0C 76FFD88E 1410B81E 56570000 04C8CBC9 èùà...WV.j...Á.v..v..F=.P......v̄ 000140
 76FF0A76 FF0C76FF FC76FFFE 76FF08C4 83156709 809A0676 FF0876FF 0A76FF0C ..v..v..v..¯.g..á..v±.v=.v..v..v 000160
 D88E152A B81E5657 00002CC8 CBC95F5E 1F0000E9 0CC48314 EA14159A 0676FF08 ..v....õ..á.Õ...^_èùà,..WV.j*..Á 000180
 AF9A5016 D4468001 6A006AFC 5689FA46 890000FF FF9A006A 056A0676 FF0876FF .v..v.j.j.......F¯.V=j.j..Få.P.£ 0001A0
 28F0468B FE4689E4 4628EC46 8B0000FF FF9A5016 E44680D6 76FF0876 FF000015 ....v..v..FÕ.P......Fš+FÕ.F±.Fþ+ 0001C0
 4689F8D1 C22B99F6 4628E046 88F84689 F8D1C22B 99FE462B DC4688F6 4689E846 FÒ.F-.FÉ+F±.+òi½.F½.FÁ+F-.+òi½.F 0001E0
```

Dump of file SATURN:[PCCOMMON.DUMP.DLL]FILTTOOL.TMP;1 on 18-APR-1990 10:45:55.46
File ID (665,18,0) End of file block 42 / Allocated 44

Virtual block number 16 (00000010), 512 (0200) bytes

```
C95F5E1F 0000FFFF 9A026A00 6A006AF4 76FFF876 FF036A00 6A0676FF 0876FFF4 ¶.v..v.j.j..v½.v¶j.j.j......^_è 000000
FE5689FC 46890000 FFFF9A00 6A0676FF 0876FFD8 8E157C88 1E565700 004EC8CB üàN..WV.¡|..Ä.v..v.j.......F•.V± 000020
89000016 619A006A 006A006A 006A0165 68010568 0676FF08 76FF00E1 E90C4688 .F.ÕÄ..v..v.h..he.j.j.j.j..a.... 000040
50168846 8D505221 CA830000 00022886 46880168 68010568 0676FF08 76FFB646 FÑ.v..v.h..hh..FÑ+θ....òIRP.F¡.P 000060
8D501688 46800000 FFFF9A50 160A4680 216A0102 680676FF 0876FF00 0013889A .£....v..v.h..jI.FÕ.P......F¡.P. 000080
77FF26FC 5EC40086 E9000088 0006E903 74000030 08C4830D FD008C9A 50160A46 FÕ.P...»..á.=..t.Õ..¡..Õ..á^•&.w 0000A0
880006E9 03748446 08824688 0000FFFF 9A501682 46805016 88468027 77FF2629 )&.w'.F¡.P.Fý.P......Fý.FÇt.Õ..¡ 0000C0
4D14159A 0676FF08 76FF2777 FF262977 FF26FC5E C48276FF 8476FF00 58E90001 ..Õ[..vÇ.vÿá^•&.w)&.w'.v..v....M 0000E0
19E90000 FFFF9A01 0268006A 01316800 6A206A06 76FF0876 FF0033E9 0CC48315 ..á.Õ3..v..v.j j.h1.j.h.......Õ. 000100
0000E900 0088FFE7 E9FFD0E9 03750005 30FF17E9 03750001 300013E9 0016E900 .Õ..Õ..=..u.Õ..=..u.ÕÅ.ÕÕ.¡..Õ.. 000120
00880000 FFFF9A00 6A0676FF 0876FFD8 8E160988 1E565700 0000C8C8 C95F5E1F .^_èùà...WV.¡...Ä.v..v.j......¡. 000140
16169A00 6A0676FF 0876FF08 8E172D88 1E565700 00AEC8CB C95F5E1F 0000E900 .Õ¯..^_èùàÜ..WV.¡-..Ä.v..v.j.... 000160
087E8000 0016769A 50160846 8D216A01 02680676 FF0876FF FC5689FA 46890000 ...F°.V̄•.v..v.h..jI.FÄ.P.v....~Ä 000180
00FFFF9A 206A006A 0055681E 0067681E 0676FF08 76FF016A 006A001E E9037400 .t.Õ..j.j..v..v..hg..hU.j.j .... 0001A0
86890000 17D99A50 16084680 046AFF6A 01686801 05680676 FF0876FF 0103E900 .Õ...v..v.h..hk.j.j..FÄ.P.\..... 0001C0
0876FF00 0016389A 006A006A FF5686FF 006A0163 68010568 0676FF08 76FFFF56 V..v..v.h..hc.j..ÑV.j.j..;....v. 0001E0
```

Dump of file SATURN:[PCCOMMON.DUMP.DLL]FILTTOOL.TMP;1 on 18-APR-1990 10:45:55.46
File ID (665,18,0) End of file block 42 / Allocated 44

Virtual block number 17 (00000011), 512 (0200) bytes

```
16FF5286 8D501608 46802777 FF262977 FF26FA5E C404C483 160F12E9 9A0676FF .v..Õ.Õ..á.á^•&.w)&.w'.FÄ.P..R.. 000000
86FF2777 FF262977 FF26FA5E C40018E9 0375FF54 8608FF52 86880000 16809A50 P.¯.....R...T.u.Õ..á^•&.w)&.w'.Ñ 000020
08468008 C4831848 00569A50 16FF5886 80007868 1E0000FF FF9AFF52 86FFFF54 T..ÑR.......h(...X..P.V.K..á..FÄ 000040
83168700 109A5016 FF58868D 0083681E 08C48318 5000109A 5016FF58 86805016 .P..X..P...)..á..h....X..P...... 000060
6A5016FF 5886801D 8168FE76 FF0000FF FF9A5016 FE468028 77FF26FA 5EC408C4 á.á^•&.w+.F±.P......v±hŸ...X..Pj 000080
00FFFF9A 50520000 FFFF9A01 02680676 FF0876FF 016A006A 0000FFFF 9A006A00 .j......j.j..v..v.h.......RP.... 0000A0
E99A0676 FF0876FF D88E1751 881E5657 000000C8 CBC95F5E 1F0000E9 00008800 .¡..Õ...^_èùà...WV.¡Q..Ä.v..v..Õ 0000C0
88000018 9D9A5052 00001896 9A010268 0676FF08 76FF016A 006A04C4 8317E612 .|..á.j.j¯..v..v.h.......RP.....¡ 0000E0
6A010268 0676FF08 76FFD88E 1884881E 56570000 22C8C8C9 5F5E1F00 00E90000 ..Õ...^_èùà"..WV.¡Ç..Ä.v..v.h..j 000100
C7260E5E C40000FF FF9A5016 DE46800A 76FF0C76 FF000017 799A5016 DE468021 I.F8.P.ȳ....v..v..F8.P.....á^.&ú 000120
0676FF08 76FFD88E 18F2881E 56570000 22C8C8C9 5F5E1F00 00E90000 88000107 ...¡..Õ...^_èùà"..WV.¡·..Ä.v..v. 000140
DE46800A 76FF0C76 FF000107 C7260E5E C4000019 079A5016 DE468021 6A010868 h..jI.F8.P.¯....á^.&ú....v..v..F8 000160
76FFD88E 1936881E 56570000 0AC8C8C9 5F5E1F00 00E90000 880000FF FF9A5016 .P.....¡..Õ...^_èùà...WV.¡6..Ä.v 000180
FF9A5016 F646800: 76FF0C76 FF000019 489A5016 F6468009 6A011C68 0676FF08 ..v.h..j..F-.P.K̄....v..v..F-.P.. 0001A0
197A881E 5657000( 2CC8C8C9 5F5E1F00 00E90000 88000107 C7260E5E C40000FF ...á^.&ú...¡..Õ...^_èùà,..WV.¡z. 0001C0
80000019 8F9A5016 D4468021 6A012768 0676FF08 76FF0001 07C7260E 5EC4D88E .Àá^.&ú....v..v.h'.J̄I.Få.P...... 0001E0
```

Dump of file SATURN:[PCCOMMON.DUMP.DLL]FILTTOOL.TMP;1 on 18-APR-1990 10:45:55.46
File ID (665,18,0) End of file block 42 / Allocated 44

Virtual block number 18 (00000012), 512 (0200) bytes

```
FC468000 DAE90000 880000FF FF9A006A 006A0A76 FF0C76FF 0015E903 7400047E -å.t.Õ...v..v.j.j......¡..ÕÖ..F• 000000
F84688FA 5689F846 8904C483 1A5000EA 9A5016FC 468004C4 831A1201 6E9A5016 .P.n....á..F•.P.õ.P..á..F½.V°.F½ 000020
7E83F646 8908C483 18C10304 9A501604 4680F876 FFFA76FF 0041E903 75FA4608 .F°u.ÕA..v°.v½.Få.P.å.ė..á..F-.- 000040
5EC40008 E9FE5689 FC468904 C4831838 01889AF8 76FFFA76 FF0017E9 037400F6 -.t.Õ...v°.v½.¡.8..á..F=.V±Õ..á^ 000060
FC7E8300 12E90375 003F8326 0E5EC400 0007C726 0E5EC400 08E90000 07C7260E .&ú...Õ..á^.&ú...á^.&.?.u.Õ...-• 000080
76FF016A 006A0000 FFFF9A02 6A016A00 6A0031E9 0374FFFE 7E83003A E90374FF .t.Õ:..-±.t.Õ1.j.j.j......j.j..v 0000A0
0011E900 0007C726 0E5EC400 00179D9A 206A006A 0090681E 0096681E 0676FF08 ..v..h...h..j.j .....á^.&ú...Õ.. 0000C0
00002AC8 CBC95F5E 1F0000E9 00008800 0019F39A FC76FFFE 76FF0A76 FF0C76FF .v..v..v±.v•.µ...¡..Õ...^_èùà*.. 0000E0
50160646 8D216A01 26680676 FF0876FF 000107C7 260E5EC4 D88E198E 881E5657 WV.¡/..Àá^.&ú....v..v.h&.J̄I.F•.P 000100
00008800 0018DC9A 096A006A 0A76FF0C 76FF0015 E9037400 D67E8000 0019D89A .Ü....~•.t.Õ...v..v.j.j..Ē...¡.. 000120
F8468904 C48318 6A 00EA9A50 16FC4680 04C48318 38016E9A 5016FC46 8000C3E9 Õú..F•.P.n.8..á..F=.P.õ.j..á..F½ 000140
C4831A36 03D49A50 16064680 F876FFFA 76FF002A E90375FA 4608F846 88FA5689 .V°.F½.F°u.Õ*..v°.v½.F•.P.å.6..á 000160
000007C7 260E5EC4 0008E9FE 5689FC46 8904C483 1A050188 9AF876FF FA76FF08 ..v°.v½.¡....á..F•.V±Õ..á^.&ú... 000180
006A0031 E90374FF FE7E8300 3AE90374 FFFC7E83 0012E903 75003F83 260E5EC4 á^.&.?.u.Õ...-•.t.Õ:..-±.t.Õ1.j. 0001A0
9A206A00 6A000068 1E00E368 1E0676FF 0876FF01 6A006A00 001A969A 026A016A j.j......j.j..v..v..hD..hï.j.j . 0001C0
0000FFFF 9AFC76FF FE76FF0A 76FF0C76 FF0011E9 000007C7 260E5EC4 00001A81 Ÿ...á^.&ú...Õ...v..v..v±.v•..... 0001E0
```

```
Dump of file SATURN:[PCCOMMON.DUMP.DLL]FILTTOOL.TMP;1 on 18-APR-1990 10:45:55.46
File ID (665,18,0)   End of file block 42 / Allocated 44

Virtual block number 19 (00000013), 512 (0200) bytes

 FF000107 C7260E5E C4D88E1A E4B81E56 5700002A C8CBC95F 5E1F0000 E90000B8 ¡..Õ...^_èùà*..WV.¡Õ..Äá^.&ú.... 000000
 0C76FF00 15E90374 00067E80 00001B01 9A501606 468D216A 01286806 76FF0876 v..v.h(.]I.F•.P......~•.t.Õ...v. 000020
 8904C483 1C6C0uEA 9A5016FC 468D0086 E90000B8 00001CDE 9A006A00 6A0A76FF .v.j.j..B...¡..ÕÑ..F•.P.õ.l..á.. 000040
 185C0304 9A501606 4680F876 FFFA76FF 002AE903 75FA460B F8468BFA 5689F846 F½.V•.F½.F•u.Õ*..v•.v½.F•.P.å.\. 000060
 07C7260E 5EC40008 E9FE5689 FC468904 C4831B28 01B89AF8 76FFFA76 FF08C483 .á..v•.v½.¡.+..á..F•.V±Õ..á^.&ú. 000080
 0031E903 74FFFE7E 83003AE9 0374FFFC 7E830012 E9037500 3F83260E 5EC40000 ..á^.&.?.u.Õ...~•.t.Õ:..~±.t.Õ1. 0000A0
 6A006A01 28681E01 2E681E06 76FF0876 FF016A00 6A00001B A59A026A 016A006A j.j.j..E...j.j..v..v..h...h(.j.j 0000C0
 FFFF9AFC 76FFFE76 FF0A76FF 0C76FF00 11E90000 07C7260E 5EC40000 18C09A20  .å...á^.&ú...Õ...v..v..v±.v•... 0000E0
 0107C726 0E5EC4D8 8E18F388 1E565700 002AC8CB C95F5E1F 0000E900 00B80000 ..¡..Õ...^_èùà*..WV.¡µ..Äá^.&ú.. 000100
 FF0015E9 03740006 7E800000 1C109A50 16064680 216A0124 680676FF 0876FF00 ..v..v.h$.]I.F•.P......~•.t.Õ... 000120
 C4831D6E 00EA9A50 16FC468D 0086E900 00B80000 FFFF9A00 6A006A0A 76FF0C76 v..v.j.j......¡..ÕÑ..F•.P.õ.n..á 000140
 03D49A50 16064680 F876FFFA 76FF002A E90375FA 460BF846 8BFA5689 F8468904 ..F½.V•.F½.F•u.Õ*..v•.v½.F•.P.å. 000160
 260E5EC4 0008E9FE 5689FC46 8904C483 1C3A01B8 9AF876FF FA76FF08 C4831C5E ^..á..v•.v½.¡.:..á..F•.V±Õ..á^.& 000180
 E90374FF FE7E8300 3AE90374 FFFC7E83 0012E903 75003F83 260E5EC4 000007C7 ú...á^.&.?.u.Õ...~•.t.Õ:..~±.t.Õ 0001A0
 6A017368 1E017968 1E0676FF 0876FF01 6A006A00 001CA79A 026A016A 006A0031 1.j.j.j..I...j.j..v..v..hy..hs.j 0001C0
 9AFC76FF FE76FF0A 76FF0C76 FF0011E9 000007C7 260E5EC4 00001CC2 9A206A00 .j .õ...á^.&ú...Õ...v..v..v±.v•. 0001E0

Dump of file SATURN:[PCCOMMON.DUMP.DLL]FILTTOOL.TMP;1 on 18-APR-1990 10:45:55.46
File ID (665,18,0)   End of file block 42 / Allocated 44

Virtual block number 20 (00000014), 512 (0200) bytes

 76FF0876 FFD88E   F5B81E56 5700002A CBCBC95F 5E1F0000 E90000B8 0000102A *...¡..Õ...^_èùà*..WV.¡%..Ä.v..v 000000
 76FF0000 0E929A50 16F8468D 0A76FF0C 76FFFE56 89FC4689 0000175E 9A006A06 .j..^....F•.V±.v..v..F½.P......v 000020
 F876FFFA 76FFD646 8900001E 609A006A 006AFF6A 006A0165 68011368 0676FF08 ..v.h..he.j.j.j.j..m....F•.v•.v½ 000040
 00D22B06 46880168 68011368 0676FF08 76FF0055 E90375FF D67E8300 00FFFF9A ......~•.u.ÕU..v..v.h..hh..F•+•. 000060
 FF9A206A 50160846 800A76FF 0C76FF00 001E999A 50160846 8D505220 CA830000 ...ò RP.FÄ.P......v..v..FÄ.Pj .. 000080
 06468900 0017BA9A 006A006A 0676FF00 6A016568 01136806 76FF0876 FF0000FF ....v..v.h..he.j..v•j.j..o....F• 0000A0
 1DF7B81E 56570000 02C8CBC9 5F5E1F00 00E90000 B8000107 C7260E5E C4FFA2E9 ÕÅ.á^.&ú...¡..Õ...^_èùà...WV.¡%. 0000C0
 76FFFE46 8900001E 339A006A 006A006A 006A0124 68011E68 0676FF08 76FFD88E .Ä.v..v.h..h$.j.j.j.j..3....F±.v 0000E0
 CBCBC95F 5E1F0000 E90000B8 000107C7 260E5EC4 0000FFFF 9AFE76FF 0A76FF0C ..v..v±.....á^.&ú...¡..Õ...^_èùà 000100
 9A006A00 6A006A00 6A012468 01206806 76FF0876 FFD88E1E 8EB81E56 57000002 ...WV.¡/..Ä.v..v.h .h$.j.j.j.j.. 000120
 0000B800 0107C726 0E5EC400 00FFFF9A FE76FF0A 76FF0C76 FFFE4689 00001ED7 •....F±.v..v..v±.....á^.&ú...¡.. 000140
 001E049A 006A0676 FF0876FF 08BE1F07 B81E5657 000020C8 CBC95F5E 1F0000E9 Õ...^_èùà ..WV.¡...Ä.v..v.j..... 000160
 01226806 76FF0876 FF000010 5B9A5016 F84680DA 76FF0C76 FFFE5689 FC468900 ..F•.V±.v..v..F½.P.[....v..v.h". 000180
 7E830000 1E419AF8 76FFFA76 FFF64689 00001FC6 9A006A00 6AFF6A00 6A016568 he.j.j.j.j..ó....F-.v•.v½.A....- 0001A0
 505213CA 83000000 D228F646 88016868 01226806 76FF0876 FF0074E9 0375FFF6 -.u.Õt..v..v.h".hh..F-+•....ò.RP 0001C0
 9A5016E0 46805016 E2468027 77FF2629 77FF26FC 5EC40000 20119A50 16E2468D .Fã.P.. ..á^•&.w)&.w'.Fã.P.FÁ.P. 0001E0

Dump of file SATURN:[PCCOMMON.DUMP.DLL]FILTTOOL.TMP;1 on 18-APR-1990 10:45:55.46
File ID (665,18,0)   End of file block 42 / Allocated 44

Virtual block number 21 (00000015), 512 (0200) bytes

 76FF0876 FF0000FF FF9AE076 FF0A76FF 0C76FF00 0EE90375 00E07E83 0000FFFF .....~Å.u.Õ...v..v..vÅ......v..v 000000
 C7260E5E C4FF83E9 F6468900 001F209A 006A006A F676FF00 6A016568 01226806 .h".he.j..v~j.j.. ....F-Õ..á^.&ú 000020
 0E76FF10 76FFD88E 1F50B81E 56570000 00C8CBC9 5F5E1F00 00E90000 B8000107 ...¡..Õ...^_èùà...WV.¡P..Ä.v..v. 000040
 0006E903 74003F83 260E5EC4 0CC48320 7B18EA9A 0676FF08 76FF0A76 FF0C76FF .v..v..v..v_.õ.( .á.á^.&.?.t.Õ.. 000060
 0CC4831D 60192E9A 0676FF08 76FF0A76 FF0C76FF 0E76FF10 76FF01BE E90000B8 ¡..Õ/..v..v..v..v..v..v.....'..á. 000080
 76FF0A76 FF0C76FF 0E76FF10 76FF0192 E90000B8 0006E903 74003F83 260E5EC4 á^.&.?.t.Õ..¡..Õ...v..v..v..v..v 0000A0
 76FF0166 E90000B8 0006E903 74003F83 260E5EC4 0CC48320 D319729A 0676FF08 ..v..r.& .á.á^.&.?.t.Õ..¡..Õf..v 0000C0
 74003F83 260E5EC4 0CC48320 FF19869A 0676FF08 76FF0A76 FF0C76FF 0E76FF10 ..v..v..v..v..v..Ñ.. .á.á^.&.?.t 0000E0
 2B18EB9A 0676FF08 76FF0A76 FF0C76FF 0E76FF10 76FF013A E90000B8 0006E903 .Õ..¡..Õ:..v..v..v..v..v..v..$.+ 000100
 FF0C76FF 0E76FF10 76FF010E E90000B8 0006E903 74003F83 260E5EC4 0CC48321 I.á.á^.&.?.t.Õ..¡..Õ...v..v..v.. 000120
 E90000B8 0006E903 74003F83 260E5EC4 0CC48321 571ADC9A 0676FF08 76FF0A76 v..v..v...É.WI.á.á^.&.?.t.Õ..¡..Õ 000140
 260E5EC4 0CC48321 831CED9A 0676FF08 76FF0A76 FF0C76FF 0E76FF10 76FF00E2 ã..v..v..v..v..v..v..Ù..I.á.á^.& 000160
 0676FF08 76FF0A76 FF0C76FF 0E76FF10 76FF0086 E90000B8 0006E903 74003F83 .?.t.Õ..¡..ÕÑ..v..v..v..v..v..v. 000180
 0E76FF10 76FF008A E90000B8 0006E903 74003F83 260E5EC4 0CC48321 AF1DEF9A .ÿ.€I.á.á^.&.?.t.Õ..¡..Õ...v..v. 0001A0
 0006E903 74003F83 260E5EC4 0CC48321 DB1F489A 0676FF08 76FF0A76 FF0C76FF .v..v..v..v..H.ÛI.á.á^.&.?.t.Õ.. 0001C0
 0CC48322 071EB69A 0676FF08 76FF0A76 FF0C76FF 0E76FF10 76FF005E E90000B8 ¡..Õ^..v..v..v..v..v..v..Ñ..".á. 0001E0
```

```
Dump of file SATURN:[PCCOMMON.DUMP.DLL]FILTTOOL.TMP;1 on 18-APR-1990 10:45:55.46
File ID (665,18,0)   End of file block 42 / Allocated 44

Virtual block number 22 (00000016), 512 (0200) bytes

 76FF0A76 FF0C76FF 0E76FF10 76FF0032 E9000088 0006E903 74003F83 260E5EC4 á^.&.?.t.Õ..¡..Õ2..v..v..v..v..v 000000
 00880006 E9000088 0006E903 74003F83 260E5EC4 0CC48320 4F1EFF9A 0676FF08 ..v....O .á.á^.&.?.t.Õ..¡..Õ..¡. 000020
 86890000 880001FF 5686C7D8 8E203688 1E565700 00AEC8C8 C95F5E1F 0000E900 .Õ...^_èüàÜ..WV.¡6 .Àú.V...¡.... 000040
 680676FF 0876FFFC 5689FA46 8900001F 5D9A006A 0676FF08 76FFFF52 8689FF54 T...R..v..v.j..]....F*.V=.v..v.h 000060
 00001804 9A010268 0676FF08 76FF016A 006A0000 1D129A50 16084680 216A0102 ..j!.FÀ.P.....j.j..v..v.h...å... 000080
 681E01CD 681E0676 FF0876FF 016A006A 001EE903 7400087E 80000018 0B9A5052 RP.Ü....-Á.t.Õ..j.j..v..v..hë..h 0000A0
 868D5016 D8468D27 77FF2629 77FF26FA 5EC400E4 E900001D C49A206A 006A018C ¥.j.j .á...Õð.á^*&.w)&.w'.FÀ.P.. 0000C0
 77FF2629 77FF26FA 5EC40073 E90374FF 548608FF 52868800 0018029A 5016FF52 R..P.......R...T.t.Õs.á^*&.w)&.w 0000E0
 468008C4 83230C00 569A5016 FF588680 01E1681E 0000FFFF 9A5016FF 52868D27 '..R..P......hÃ...X..P.V..#.á..F 000100
 103C0010 9A5016FF 58868D01 E9681E08 C483231E 00109A50 16FF5886 8D5016D8 Á.P..X..P....#.á..hÕ...X..P...<. 000120
 5016FF58 868D1081 68FE76FF 0000186F 9A5016FE 46802877 FF26FA5E C408C483 .á.á^*&.w+.F±.P.o....v±hŸ...X..P 000140
 202E9A06 76FF0876 FFFF5286 FFFF5486 FF5016FF 56868000 0018849A 006A006A j.j........V..P.ÑT..ÑR..v..v...  000160
 76FF08C4 83238709 809A0676 FF0876FF 2777FF26 2977FF26 FA5EC40C C4832379 y#.á.á^*&.w)&.w'.v..v..¯..#.á..v 000180
 31881E56 5700002C C8C8C95F 5E1F0000 E9000088 04C48320 A718AC9A 0676FF08 ..v..¯.Ï .á.¡..Õ...^_èüà,..WV.¡1 0001A0
 46890000 224F9A00 6A0676FF 0876FF04 46890646 89000088 0001D846 C7D88E22 ".ÀúFÀ..¡...F#.Få.v.¯v.j..O"...F 0001C0
 E9037500 DA7E8000 00226A9A 5016DA46 8D216A01 02680676 FF0876FF FE5689FC =.V±.v..v.h..j!.FO.P.j"...-Ö.u.Õ 0001E0

Dump of file SATURN:[PCCOMMON.DUMP.DLL]FILTTOOL.TMP;1 on 18-APR-1990 10:45:55.46
File ID (665,18,0)   End of file block 42 / Allocated 44

Virtual block number 23 (00000017), 512 (0200) bytes

 08D44688 000022C5 9A501604 46805016 DA468D27 77FF2629 77FF26FC 5EC40053 S.á^=&.w)&.w'.FÖ.P.Få.P.é"...Få. 000000
 16084680 000022E8 9A501604 46802777 FF262977 FF26FC5E C40015E9 03740646 F#t.Õ..á^=&.w)&.w'.Få.P.Õ"...FÀ. 000020
 5EC40023 E9037500 D87E830C C4832360 202E9A06 76FF0876 FFD476FF D676FF50 P.v#.vå.v..v... '#.á..-Á.u.Õ#.á^ 000040
 00173A9A 016A0676 FF0876FF 0000FFFF 9AD476FF D676FF27 77FF2629 77FF26FC =&.w)&.w'.v#.vå......v..v.j..:.. 000060
 46880178 E90E4688 088E239F 881E5657 000004C8 C8C95F5E 1F0000E9 00008800 .¡..Õ...^_èüà...WV.¡.#.Á.F.Õx..F 000080
 006A1076 FF1276FF 04C48324 8F15749A 1076FF12 76FFFE56 89FC4689 08568806 ..V..F=.V±.v..v..t.¢$.á..v..v.j. 0000A0
 1315229A 1076FF12 76FF2777 FF262977 FF26FC5E C40000FF FF9AFC76 FFFE76FF .v±.v=.....á^=&.w)&.w'.v..v..".. 0000C0
 0139E900 0022839A 50520000 227C9A01 02681076 FF1276FF 016A006A 08C48325 %.á.j.j..v..v.h...|"..RP..".Õ9. 0000E0
 46880118 E9000022 A79A206A 006A01F3 681E01F8 681E1076 FF1276FF 016A006A j.j..v..v..h½..h¤.j.j .Ï"..Õ...F 000100
 08E9000E E90011E9 08C48325 5116019A 1076FF12 76FF0A76 FF0C76FF 0010E90A .Õ...v..v..v..v....0%.á.Õ..Õ..Õ. 000120
 89FC4689 0000238A 9A006A10 76FF1276 FF00EAE9 FFEFE9FF 08E90375 01053000 .=..u.ÕÜ.Õÿ.Õõ..v..v.j..o#...F=. 000140
 1076FF12 76FF000C E99904C4 83256323 979A1076 FF1276FF 0060E90A 4688FE56 V±.F.Õ'..v..v...#c%.á..ÕÉ..v..v. 000160
 76FF0088 E99904C4 83258717 259A1076 FF1276FF 00CAE999 04C48325 7522299A .)"u%.á..Õò..v..v..%..%.á..Õ¡..v 000180
 E99904C4 83243018 AC9A1076 FF1276FF 00A6E999 04C48325 9917499A 1076FF12 ..v..!..%.á..Õ!..v..v..¯.0$.á..Õ 0001A0
 FF88E903 75013130 FFB4E903 75000230 FFAAE903 75000130 002BE900 2EE90094 ..Õ..Õ+.=..u.Õ`.=..u.ÕÇ.=1.u.Õ.. 0001C0
 FF0E76FF 1076FF12 76FF0043 E9FFCFE9 FFC0E903 75013530 FFB6E903 75013230 =2.u.ÕÑ.=5.u.Õà.Õu.ÕC..v..v..v.. 0001E0

Dump of file SATURN:[PCCOMMON.DUMP.DLL]FILTTOOL.TMP;1 on 18-APR-19°° 10:45:55.46
File ID (665,18,0)   End of file block 42 / Allocated 44

Virtual block number 24 (00000018), 512 (0200) bytes

 2230FF31 E9037500 20300023 E90043E9 0000262F 9A0676FF 0876FF0A 76FF0C76 v..v..v..v../&..ÕC.Õ#.= .u.Õ1.=" 000000
 FF1076FF 1276FFFF 80E9FE68 E9037500 3830FEF0 E9037500 303DFEDA E9037500 .u.Õ0±=0.u.Õþ±=;.u.Õh±Õ§..v..v.. 000020
 00419000 0ECAC95F 5E1F0000 E90000FF FF9A0676 FF0876FF 0A76FF0C 76FF0E76 v..v..v..v..v.....Õ...^_èò...À. 000040
 02E10004 1F730203 00610004 0EE60203 00E10004 09E10203 03000006 23300203 ..0#..À...À...À...ì...a..¯s...Ã. 000060
 00820001 04160103 00000002 24930002 035F0005 00DC0203 01660004 11F40203 ..¶...f...É..._....$............ 000080
 01F20004 0C140203 00F10004 24180203 00000004 22F90002 00600004 0E860203 ..Ñ...m...*".......$..þ.......·. 0000A0
 007F0003 1F8C0103 007E0003 245D0103 00030002 042F0103 02720004 19630203 ..c...r.../.......]$..-......... 0000C0
 02F80004 1FF70203 007A0004 153A0203 01790004 1F310203 00000006 24740002 ..t$......1...y...:...z...%...«. 0000E0
 03E90007 0F880203 00080003 15F80103 00870003 23050103 00860003 13030103 ..........{#......%.......£...Õ. 000100
 03F00007 0FEE0203 00880003 24F70103 008A0003 10A90103 01010004 18270203 ..'.......`.......%$......Ÿ...Þ. 000120
 020E0004 18190203 00130003 24D20103 018A0004 087B0203 02880004 081A0203 ..........(.......0$............ 000140
 01120004 0A180203 00190003 15880103 008F0004 10800203 03F70007 0FC60203 ..6...¥......................... 000160
 001F0003 25380103 001E0003 24A70103 03120004 24500203 001A0003 159F0103 ..........P$......Ï$......8%.... 000180
 03220004 23F80203 02A00004 199F0203 038E0006 23450203 04020007 0FA90203 ..`.......E#..............½#..". 0001A0
 00A60004 1FE00203 01A60004 1ACD0203 01250004 19170203 04080007 1F9A0203 ..............%...e...Ì...À...Ì. 0001C0
 02860004 1E1A0203 00330004 0F110203 00830003 25EC0103 02280004 00460203 ..F...(...$%..°.......3.......Ñ. 0001E0
```

Dump of file SATURN:[PCCOMMON.DUMP.DLL]FILTTOOL.TMP;1 on 18-APR-1990 10:45:55.46
File ID (665,18,0)   End of file block 42 / Allocated 44

Virtual block number 25 (00000019), 512 (0200) bytes

```
01C00004 0CAD0203 00450003 16FA0103 00800004 10AE0203 01360004 114D0203 ..M...6...Ù...§...°...E...Ù...à. 000000
004D0004 0EA20203 004D0003 24D90103 02420004 10E00203 00410004 0F870203 ......A...Å...B...1$..M...Å...M. 000020
025A0004 0AB90203 014F0004 1EE80203 02CD0004 1E7F0203 00CD0004 0EC60203 ..6...ë.......è...Ò...O...¿...Z. 000040
01CB0001 881F0002 3E89088E FFFF881E 00000000 00000000 01DA0004 1C280203 ..(...Ö..........|...À.>...¡..ù. 000060
00000000 00000000 00000000 00000000 00000000 00000000 00000500 02000200 ................................ 000080
2BD1F7AE F2FFFFB9 0A7EC4FF 758DAEF2 FFFFB9C0 33067EC4 1EDE8807 88EC8855 U.$.■.8.á-.3à¿...Û.u.á-.¿...Ú%1+ 0000A0
88F388A4 F3C913A5 F3E9D149 A4027400 01C6F706 4688FE87 08468ED8 8EC08CF9 °.à.Ä.F...±.F.%ó..t.Ê11ÔµÊ.èµÊ.µ. 0000C0
D1F7AEF2 FFFFB9C0 33C08ED8 8CFE880A 76C51EDE 880788EC 8855C850 C28C1FFA °..ö]ùU.$.■.8.év..±.À.à3à¿...Ú%1 0000E0
88EC8855 CB5DC28C 1FFA88F3 88A4F3C9 13A5F3E9 D149A402 7401A8C7 88067EC4 á-..ú`.t.Ê11ÔµÊ.èµÊ.µ.°..ö]ùU.$. 000100
881FFFFF 1DC01805 74A6F3F9 2BD1F7AE F2FFFFB9 C0330A7E C40676C5 1EDE8807 ■.8.év.á-.3à¿...Ú%1+°µ1t..à..... 000120
8B5500CB 5DFA8891 49D1F7AE F2FFFFB9 C033067E C4078BEC 8B5500CB 5DFA88F3 µ.°]ù.U.$.■á-.3à¿...Ú%11..°]ù.U. 000140
2E9A0000 08C80603 E9087EC5 1E990175 0AF983D2 3306468B 0C4E8801 835756EC $VW°..N..F.30.°.u...é-.Õ..à..... 000160
5016F846 8DFA5689 F8468902 30161802 2E062802 57882607 8826065E C4011304 ...á^.&..&.W.+.....0..F%.V°.F%.P 000180
FF377400 02323E83 9045E899 C0280675 D008FE56 89FC4689 04C48301 3802769A .v.8..á..F•.V±.Àu.+à.ŠE..>2..t7. 0001A0
9A5016F8 468000FA 56830E10 F8468125 74C00804 C4830152 05089AFC 76FFFE76 v±.v•...R..á..àt%.F%...V°..F%.P. 0001C0
8855C8C9 FE5688FC 46880001 1047C726 FC5EC4FE 5689FC46 8904C483 FFFF0276 v....á..F•.V±á^•&ùG....F•.V±èùU. 0001E0
```

Dump of file SATURN:[PCCOMMON.DUMP.DLL]FILTTOOL.TMP;1 on 18-APR-1990 10:45:55.46
File ID (665,18,0)   End of file block 42 / Allocated 44

Virtual block number 26 (0000001A), 512 (0200) bytes

```
50F8468A 50F4468A 50F5468A 50F6468A 00840000 FFFF9A50 16F4468D 0CECB3EC &.&..F¶.P.....Ç..F-P.F%P.F¶P.F%P 000000
02578926 065EC40A 7400087E 830CC483 00F10506 9A50078C 2DFA4688 50F9468A .F°P.F°-¥.P.ø.þ..á..-..t.á^.&.W. 000020
83261C7C 00027F83 26237C00 3F832606 5EC45657 000008C8 00CB5DE5 88078926 &...|)ù.à...WVá^.&.?.|#&....|.&. 000040
81E999FF FFB80A7D 50^A7F83 26077C00 087F8326 0E7C0006 7F832615 7C00047F ...|.&....|.&....|.&...P).¡...Õ. 000060
08478826 0A470126 F9F7000C 89990847 8826197C 0C087F83 26065EC4 9^^09000 ....á^.&....|.&.G..¿..%°&.G.&.G. 000080
0A478826 50400847 88260677 FF260477 FF260277 FF2637FF 26085789 26F ^799 .%°&.W.&.7&.w.&.w.&.w.&.G.ƏP&.G. 0000A0
8904C483 019E00EA 9A5016F8 468DFA56 89F84689 0CC48302 4A05069A 5000:02D -P.P.ø.J..á..F%.V°.F%.P.ð....á.. 0000C0
8BF8468B 1FA5F200 0989DA8E 1EF08BFB 88FE5688 065EC491 74D008FE 5689FC46 F•.V±.Àt.á^..V±.«.Þ..O¿...È..F%. 0000E0
0673A600 3F812607 7C0F7F12 CE027F81 26065EC4 56570000 0EC8CBC9 5F5EFA56 V°^ èùà...WVá^.&...ö...|.&.?.1s. 000100
51806801 6A021AA3 028F0948 9A37FF26 0277FF26 33806801 E1680194 E999C028 +à.Õ..hÅ.h.3&.w.&.7.M.¢.È..j.h.Q 000120
FF260277 FF26065E C4338068 01E16802 DA09E49A 505299F0 8BF9F700 04899940 Ə.¿..%°.Þ.RP.ô.O.hÅ.h.3á^.&.w.&. 000140
813380FA 468126EB FC5689FA 4689F456 18F2462B 03650A18 9AF45689 F2468937 7.F`.V¶...e.+F`.V¶.F°.V•Š&.F°.3. 000160
021A0EFF 4E01FC56 835180FA 46810A75 D20BF9F7 0004B999 40021AA1 01E1FC56 V•Ã.À..Ə.¿..%°.Ɵu..F°.Q.V•.N.... 000180
0064B999 021AA11F 75D20BF9 F70004B9 99021AA1 07B2021A 0681047C 00FC7E83 .-•.|à....ÿ.À...¿..%°.Ɵu.À...¿d. 0001A0
5E8CF646 89078288 03E80798 B80575D2 08F9F701 90899902 1AA10075 D20BF9F7 %°.Ɵu.À...¿..%°.Ɵu.¡..Š.¡ÿ..F-.^ 0001C0
80518068 016A021E A3037709 489AFA76 FFFC76FF 51806801 6A076C02 1A2E81F8 %....l.j.h.Q.v•.v°.H.w.È..j.h.Q. 0001E0
```

Dump of file SATURN:[PCCOMMON.DUMP.DLL]FILTTOOL.TMP;1 on 18-APR-1990 10:45:55.46
File ID (665,18,0)   End of file block 42 / Allocated 44

Virtual block number 27 (0000001B), 512 (0200) bytes

```
05C28CC3 881F7D02 47392602 1EA1F65E C4000102 1806C703 CE09209A 5016FA46 F°.P. .ö.ú.....á^-À..&9G.)..ú.ó. 000000
180EFF02 1EA1F17C 05392602 1EA10218 06FF02C7 83F27EC4 F45689F2 46890002 ...F`.V¶á-`.ú.....À..&9.|þÀ..... 000020
03E00948 9AFA76FF FC76FF0E 1068006A 0216A301 2B26F65E C4E7D102 183E8802 ..>..iÖá^-&+.È...j.h...v•.v°.H.À. 000040
0109489A FA76FFFC 76FF3C6A 006A03EF 09209A50 16FA468D 0E106800 6A0214A3 È..j.h...F°.P. .ý.j.j<.v•.v°.H.. 000060
021E0603 0160021A 06690210 A302370A 189AFA76 FFFC76FF 3C6A006A 0212A304 .È..j.j<.v•.v°...7.È..i...m..... 000080
3E83C8C9 5F5EDA8C 02108800 00022006 C7021C16 89F9F700 07B99963 CA20C603 .6·ðc.¿..%°....ú. ...¡...Ö^_èù.> 0000A0
8904C483 0477088E 9A022268 1E560000 06C8CB0A F406FF00 05E80E08 75000AF4 ¶..u..Õ....¶.úà...V.h"....w..á.. 0000C0
023636FF 5006036A 009CE903 75003F80 26FA5EC4 00A8E903 75D008FC 5689FA46 F°.V•.Àu.Õ`.á^°&.?.u.Õ..j..P.66. 0000E0
0498088A 9AFA76FF FC76FF03 FA46830E 1068006A 0AC48304 8E08609A 023436FF .64..`....á.j.h...F°..v•.v°..... 000100
98008A26 1C740038 8026FA5E C4F62802 30168902 2EA304E6 09E49A50 5204C483 .á.RP.ô.Ì.È....0.+-á^°&.8.t.&... 000120
74003880 26FA5EC4 DB7C03FE 83460675 2D388026 FA5E8809 75040697 87F6D888 .À-....u..^°&.8-u.F.±.|Úá^°&.8.t 000140
1EC49009 E80AC483 02A60860 9A023836 FF023A36 FF5052C6 03C28CC3 88036A1D .j..ú.ö.6RP.6:..68..`.|..á.Š..á. 000160
065EC456 000006C8 90C8C95E 0232A340 C01B013F 80260238 1EC40007 C6260238 ß.&ó..á.ß.&.?..äaÈ2.^èù.à...Vá^. 000180
09087F83 260A7E03 087F8326 00ADE903 7E09087F 832600B7 E9037D03 087F8326 &....).ðñ.&....-.ÕÙ.&....-.&.... 0001A0
E3D1085F 88261075 03087F83 26177E07 C2FE8107 6CC6810A 77882600 81E9037D ).Õ..&.w..ól..±ó.-.&.....u.&._.ìD 0001C0
03750003 C6F7FA46 8907B487 88E3D108 5F882606 5E88900E E8000705 07828788 ..ý....Š...^.&._.ìD..Ç..F°%ó_.u. 0001E0
```

```
Dump of file SATURN:[PCCOMMON.DUMP.DLL]FILTTOOL.TMP;1 on 18-APR-1990 10:45:55.46
File ID (665,18,0)   End of file block 42 / Allocated 44

Virtual block number 28 (0000001C), 512 (0200) bytes

05C10301 6DCE69F% 4603F9F7 0004B999 01448D46 EE830A77 8B26065E C4FA46FF .F*á^.&.w..ŸF.D..¿..%*.F*iöm..é. 000000
26227509 7F0E4739 26157503 087F8326 FE4689C2 2BFA4688 F9F70007 B9990004 ...¿..%*.F*+ö.F±&....u.&9G...u"& 000020
7C01047F 83260775 EE7C0E47 3926FE46 8B065EC4 9018E800 0188187C 02047F83 ....|.¡..Š..é^..F±&9G.|Ÿu.&....| 000040
505299F9 F70004B9 99034480 51806801 6A067688 56570000 20C8CBC9 5EC02BE5 |+à^èùà ..WV.v.j.h.Q.D..¿..%*.RP 000060
07750208 F9F70004 B999C688 07B08F88 E301085E 8BEC5689 EA468906 2409E49A .ö.$..Fõ.Vš.^.ÌD.e¯..ó.¿..%*.@u. 000080
0C4688C8 880E1068 006A063E 09E49A50 52990E46 883C6A00 6A47017E 02087E83 .~..~.Gj.j<.F..RP.ö.>.j.h...à.F. 0000A0
C303016D DE690A46 88C88851 8068016A 066009E4 9AE65E89 E44E8950 5299DA88 .Ö.RP.NÖ.^|.ö.'.j.h.Q.à.F.ì@m..ù 0000C0
C888E656 13E44603 E25613E0 46030693 09E49AE2 5E89E04E 89505299 DA88C703 .ú.Ö.RP.NÁ.^ä.ö....FÁ.Vä.Fö.V|.à 0000E0
FC4689C7 030A4688 EC5E11EA 4E0112CE D381A600 C181DA13 C803990A 88104688 .F..Ö..à.Ö.è.|.Æó..Nõ.^š.F..ú.F• 000100
88F64689 48084688 F8468950 448DEC56 11EA4601 02301688 022EA106 C4042E9A ...á.À....0..Fõ.Vš.DP.F%.F.N.F-. 000120
EA6E8109 74C00804 C483044A 05089A50 16EE468D 1A740002 323E83F2 46890C46 F..F·.>2..t..FŸ.P...J..á..ät..nõ 000140
071E570A 7EC51E08 56880646 880E4E88 CBC95F5E EC5688EA 468800EC 5E830E10 ...^$..Fõ.Vš^_èù.N..F..V..é-.W.. 000160
C0080233 92F788DA F700D283 DBF7AA2D 800A79D2 080E750A F9831374 C00A93FC •..ät..*.u..@y.¯-`%Ü.@.%Ö.%.3@.ä 000180
880586AC 4F0588E2 75C308C2 88AA2704 0276393C 30040387 92F1F793 F1F70274 t.%þ.%þ..#.0<9v..'¨.ó.úuã..0¯... 0001A0
00FFFF9A 5016C488 50EC8855 00CB50E5 885E5F1F 580A8CF2 72C73801 4480FF44 D..D.;úr¨.OX._^.|]ù.U.&P.á.P.... 0001C0
8805F308 AA9A0350 E80021E8 0000FFFF 9A027868 1E027A68 1E070BA3 E0865800 .X.ÀÉÀ..hz..hx......Ò!.ÒP..´.µ.¡ 0001E0

Dump of file SATURN:[PCCOMMON.DUMP.DLL]FILTTOOL.TMP;1 on 18-APR-1990 10:45:55.46
File ID (665,18,0)   End of file block 42 / Allocated 44

Virtual block number 29 (0000001D), 512 (0200) bytes

068EFF33 0000B81E 028016FF 00FF6807 7A082A9A 07600706 9A50CB50 E5880001 ...|]ùP.@.m..*.z.h.......£..3... 000000
330874CA 88A6F3C8 88D18806 84BE3174 00308026 47017500 3080267F FFB9027A z.¿..&.=.u.G&.=.t1/...ì.ùµ|.òt.3 000020
C20A0572 412CAC92 04E0C00E 72412CAC 07DF8F1F F788071E 061CE8E7 74AEF2C0 à·ÙtÓŠ.....%.¢Ó.¯,Ar.äÀ..¯,Ar..ô 000040
00FF8806 921EFF04 74000694 3E83077F 082A9A50 00FC88EC 885500C3 1FEDE8AA ¯$Ù.ù.U.š¡•.P.*....>...t.....¦.. 000060
74C23BAD 0A1CBE06 5688C08E D88EFFFF 885756EC 8855CB5D E58807E0 082A9A50 P.*.À..|]ùU.$VW|...Ä.ä.V./..Ù;ôt 000080
76FF57EC 88550002 CA50E588 5E5F96E8 EBF788AE F2FFFFB9 C033970C 74964010 .a.t..3à¿..`Ù.%$$._^.|]ò..U.&U.v 0000A0
521E5300 028BC488 50490 1F7 AEF2FFFF B9C033FA 88921F74 C00807F4 07FA9A06 ..*.¶..ät...*3ä¿..¯Ù%||P.áE..S.R 0000C0
4E88DF88 0A76C506 7EC41E56 57EC8855 0002CA5D E5885F5B 0000FFFF 9A501651 Q.P.....[_.|]ò..U.$WV.á-.év..Ô.N 0000E0
06C80005 8FE9CB5D E5885F5E 1FC28CC3 88AAF3C0 32F8E2AA 0374C00A AC0CE30E .D.¯.ät.¯ã½2äµ¨.ù.ô.^_.|]ùÖ...à. 000100
FF0876FF 6E740846 08064688 7674C208 FC5689FA 468909E7 168809E5 A1560000 ..VÀ|...Ó..F*.V=.ôtv.F..F.tn.v.. 000120
4A740247 08260788 26FA5EC4 04FA4683 909006E8 F08804C4 83080A00 869A0676 v..Ñ.Ö..á..ÞŠ....F*.á^*&..&.G.tJ 000140
56D17530 3880261F C426FA5E C4DD7EC6 3804C483 09030086 9A37FF26 0277FF26 &.w.&.7.Ñ....á.;ó-ïá^*&á.&.8=uiV 000160
26FA5EC4 8475C008 0AC48308 3400E09A 37FF2602 77FF26FA 5EC40676 FF0876FF .v..v.á^*&.w.&.7.À.4..á..áuÇá^*& 000180
0277FF26 0A76FF0C 76FF065E C4EC8855 C8C95E99 C0289004 E8C28C01 408D1FC4 á..a..óŠ..+â.^èùU.šä^..v..v.&.w. 0001A0
FF335356 57EC8855 0008CA5D E5880789 26025789 26065EC4 08850A18 9A37FF26 &.7...ç.á^.&.W.&...|]ò..U.$WVS3. 0001C0
47117DC0 080C4688 06568908 46890000 10DAF7D8 F7065688 47117DC0 08084688 .F..ä).G.V.%A%O....F..V..F..ä).G 0001E0

Dump of file SATURN:[PCCOMMON.DUMP.DLL]FILTTOOL.TMP;1 on 18-APR-1990 10:45:55.46
File ID (665,18,0)   End of file block 42 / Allocated 44

Virtual block number 30 (0000001E), 512 (0200) bytes

D888F1F7 02330846 880A4E88 1575C008 0A56890C 46890000 10DAF7D8 F70A5688 .V.%A%Ö....F..V..àu..N..F.3@%þ.Á 000000
F475D808 D801EAD1 09D1E801 06468808 56880A4E 88D88838 E8D388F1 F7064688 .F.%þ.Æ$8.À.N..V..F.ì$ì|ìóìÀ.Ùu¶ 000020
D2334E01 76064638 06720777 08563B0C 72D103E6 F70A4688 910C66F7 F088F1F7 %þ.Þ%f...F.%|.ìr.;V.w.r.;F.v.N3@ 000040
88D8080C 5E880846 88EC8855 0008CA5D E5885F5E 5800DA83 D8F7DAF7 07754F96 .Ou.%Ö%Ä.Ö.(^_.|]ò..U.$.F..^..Ä. 000060
E3F70646 88C8030C 66F70646 88C888E3 F70008CA 5DE588E3 F7064688 08750A5E ^.u..F.%D.|]ò¯.%D.à.F.%f..à.F.%D 000080
001DDAF7 D8F70656 8847117D C0080846 88FF3357 53EC8855 0008CA5D E588D103 .ì.|]ò..U.$SW3..F..ä).G.V.%A%Ö.. 0000A0
C0080A56 890C468? 00001DDA F7D8F70A 5688107D C0080C46 88065689 08468900 ..F..V..F..ä)..V.%A%Ö....F..V..á 0000C0
880A4E88 D8884BE6 ;3794FD2 33C288F1 F7064688 F1F7D233 0846880A 4E881875 u..N..F.3@%þ.F.%þ.ó3@ÖγÇ$N.À.N.. 0000E0
0C72D103 0A66F791 0C66F7C8 88F1F7F4 75D80808 D1EAD109 D1E8D106 46880856 V..F.ì$ì|ìóìÀ.Ùu¶%þ.à%f..%f..ìr. 000100
83D8F7DA F707794F 08561806 46280C56 180A4628 06760646 38087207 77085638 ;V.w.r.;F.v.+F..V.+F..V.Oy.%Ö%Ä. 000120
FFFF9A52 16501653 C4885087 07DFA780 04885200 028B0008 CA5DE588 585F000A Ò._[.|]ò..£..R.à.ÌÒ.ñP.áS.P.R... 000140
080E885A 04794807 DF8F0808 81067500 02300774 00013040 81127558 C0080000 ...äXu.Ÿa=..t.=..u.Ÿ...Ô.KγàZ... 000160
061EFF00 0388C28C 0A0E06C4 01AEE903 730A061E FF0833C2 8C0A0A06 C41EE30A .D.á....ó3Ù....s.ÖÙ.á....óÉ..... 000180
37680E01 6A08740A 12300A12 880073E8 0A12BF0A 128E007C E80A12BF 0A128E0A ./..¢..Ò|./..¢..Òs.¡..=..t.j..h7 0001A0
00000832 9A006A00 6A036A00 51E80A12 8F0A128E 088E0800 88C30000 FFFF9A08 ......Ù¡...Ä/..¢..ÒQ.j.j.j..2... 0001C0
0A128F0A 128EEC88 5503E800 31E80A12 8F0A128E 003AE80A F68F0AF6 8EEC8855 U.$/-.¢-.Ò:./..¢..Ò1.Š.U.$/..¢.. 0001E0
```

```
Dump of file SATURN:[PCCOMMON.DUMP.DLL]FILTTOOL.TMP;1 on 18-APR-1990 10:45:55.46
File ID (665,18,0)   End of file block 42 / Allocated 44

Virtual block number 31 (0000001F), 512 (0200) bytes

 028807E3 0A080E88 0000FFFF 9A500646 8A50C033 001AE80A 128F0A12 8E0023E8 Ò#./..e..Ò..3äP.F.P.........D.£. 000000
 56570000 14C800C3 EEE810FF F2740245 08058804 EF830E73 F738C30A 061EFF00 .....ü;Ës..ÿ....E.t·..ŠŸü.à...WV 000020
 6AF85689 F6468/F2 5689F046 89C02802 7A168800 F0E90375 027A3639 FF2BF62B +-+.96z.u.Ðþ...z.+à.Fþ.V·.F-.V½j 000040
 8CE90376 7FFFFE81 461974C0 080AC483 0C1E0DE0 9A068468 1EF676FF F876FF0C ..v½.v~.h...Å....á..àt.F.±..v.Õ¥ 000060
 26F65E88 F475003F 8026F646 FFF65EC4 0CE847EA 75003F80 26F646FF F65EC400 .á^-.F-&.?.uõGŠ.á^-.F-&.?.u¶.^-& 000080
 830C630C CD9A56EE 5689EC46 8904C483 0C2D0D88 9A046A50 01458D8A 75003F80 .?.u□.E.Pj....-..á..F$.VŸV.ë.c.. 0000A0
 09E5A3EE 5688EC46 886674C2 08FC4688 6D74EE46 08EC4688 FE5689FC 468902C4 á..F•.V±.F$.FŸtm.F•.ôtf.F$.VŸÊÌ. 0000C0
 8BEC5EC4 2C74C008 0AC48309 3600E09A 0684681E F076FFF2 76FF0C6A 09E71689 ..Ô.j..v·.vÞ.h...Å.6..á..àt,á^$. 0000E0
 26FC46FF FC5EC407 8A26F046 FFF05EC4 04EC4683 02578926 078926FE 5688FC46 F•.V±&..&.W..F$.á^Þ.FÞ&..á^•.F•& 000100
 C95F5EA7 75003F80 26F05EC4 F475003F 8026F046 FFF05EC4 E8E80E74 C00A0788 ...àt.ŠÒá^Þ.FÞ&.?.u¶á^Þ&.?.uÌ^_è 000120
 EC8855C8 5DE58801 FE4F8026 0574C308 C08C065E C4EC8855 FABEE900 028890C8 Ù.|..Ò/*U.$á^..à.Ût.&.O±..Ì]ùU.$ 000140
 750082E8 09FAA312 740025E8 08750009 FA3E831E 73FFF130 06468857 5602EC83 .$.VW.F.=þ.s..>*..u.ÒX.t.È*.Ò..u 000160
 3900F088 C850E588 5E5F02C4 8308DE0E 849A0676 FF087500 78E80574 0018E815 .Ò..t.Òx.u..v....8..á._^.Ì]ùEÞ.9 000180
 83000110 309A5002 80510E4F 8050501E C033FE5E 89FEE383 43065E88 0776065E ^.v..^.C.D±.^±3à.PP.O.Ō¯.P.O.... 0001A0
 C033D88E FE5E8800 08A3DA8E 0574D208 09FEA309 FC1687C2 883874FF FA8308C4 á..*.t8.ò..•.È±..@t..OÈ...^±.A3à 0001C0
 1FD88C00 06A30000 05000AA3 01478000 02A30000 A3000A88 0C478948 480008A3 È..HH.G.j..È..È...G.È.....È...Ä. 0001E0

Dump of file SATURN:[PCCOMMON.DUMP.DLL]FILTTOOL.TMP;1 on 18-APR-1990 10:45:55.46
File ID (665,18,0)   End of file block 42 / Allocated 44

Virtual block number 32 (00000020), 512 (0200) bytes

 FF006A56 00000AC8 C3098EC1 8CD20801 4CE809FE 1E8ED833 064E88C0 8ED88CC3 Û.Ä.à.N.3Ü..±.ÒL..@.ê.]ùà...Vj.. 000000
 7688902F EB99C028 0674FFFF C2F7FA56 89F84689 008509E4 9A0676FF 006A0876 v.j..v..ð.ç..F½.V*Xó..t.+à.$/..v 000020
 002D10E6 9A50FE76 FF006A56 1274000B FE5689FC 468902C4 8300CE0C CD9A56F8 ½V.ë.ö..á..F•.V±.Àt.Vj..v±P.Ì.-. 000040
 067EC409 8827E30E 4E881E56 57EC8855 90CBC95E FE5688FC 46889007 E808C483 .á.Š...F•.V±^èù.U.$WV..N.D'.Ìá~. 000060
 49490474 0477FF45 3A26C933 FF448AA6 F30A76C5 FE88C803 D9F7AEF2 C033F788 .X3à·ÜKÌ.ù.±év.µÌ.D.3è&:E.w.t.ÌÌ 000080
 3CF87420 3CAC0B33 99C03306 76C51E56 57EC8855 00C850E5 885F5E1F C1880F17 Xl.ė.^_.Ì]ù.U.$WV.év.3à.3Ü¯< t«< 0000A0
 D1E3D1FA 88C888D2 D1E3011B 72302C1F 77393CAC 0175283C 04742D3C 50F77409 .tXP<-ţ.<+u.¯<9w.,0r.ÌDÌ@.ù.*ÌDÌ 0000C0
 5F5E1FDA F700D283 D8F70775 93203C58 DCE80002 83080307 13090302 D1E3D1D2 @ÌDÌ@.Ì.■.Ä.@.ŠÉX<-.u.XÄ.@.XÖ.^_ 0000E0
 75003F83 09F08857 56EC8855 C850E588 01FE4F80 04740808 065E88EC 8855C85D ]ùU.$.^..Üt..O±..Ì]ùU.$VWÉÞ..?.ū 000100
 C6830001 04C79609 F2A309F0 A3FE2440 24E899C0 33057501 76E80005 88071E29 )..¡..Òv.u.3à.$$a$±ÈÞ.È·..ú....ó 000120
 FA744100 D0E9C850 E5885E5F 0009E8C0 8ED88C06 4E8809F6 3689FFFE FE44C704 .ÚD±±..6~..N..Ä.àÒ.._^.Ì]ùÒÄ.At* 000140
 7401A8AD F0030088 1573C138 48437401 A8FE88AD FC027788 F273EEF9 83FEE180 .Ä±.*Ys·.w.•Ü.±´.tCH;ès..Ä.ÞÜ´.t 000160
 FEF90305 E8058948 C128FE4C 89F9030C 74FE88E6 EBFE4489 F7880002 05C20335 5.ö....X.D±$Ì.±t..*.L±•èH..Š..*± 000180
 74FFFE3D 020A0206 C626C302 7F8909FE 1E8C2605 74013808 3889DA8C C688FE4C L±.6.O¿8.;Ìt.&..±....ù&6....=±.t 0001A0
 88000205 C203E274 01A8ADF0 03D088BC 73C13848 FE88F274 01A8ADF0 03FE8825 X.±.ÞÜ´.t·.±H;ès¥.Å.ÞÜ´.tã.ó.... 0001C0
 74C7380F 178FD88C 12740A02 0EFE2615 E8088E04 74C00808 4788E6E8 FE4489F7 X.D±$Ì.G..ät..A$.&±...t..Ä¢..;ùt 0001E0

Dump of file SATI N:[PCCOMMON.DUMP.DLL]FILTTOOL.TMP;1 on 18-APR-1990 10:45:55.46
File ID (665,18,L.   End of file block 42 / Allocated 44

Virtual block number 33 (00000021), 512 (0200) bytes

 0D74005F E8984040 01240074 C638006B E8C03306 778888EB 378809FA 1E8E2605 .&..*..7$E.w.3äÒk.;ót.$.aa.Ò_.t. 000000
 33024789 078809FE A3260474 C1380F68 B9D88C98 E84E4E96 0574001D E8FE4DFE ±M±Ò..t..NNŠ..Á¿k.;ét.&È±....G.3 000020
 C188F575 EAD10476 0A001638 267FFF8A 414149C8 28037401 A8FE4588 51C399C0 à.ùQ.E±´.t.+àÌAA□..&;...v.ÌõuX.ë 000040
 E85152C3 59C033E5 75EAD1D2 F7087500 0CE8C628 C22302F7 0D72C203 1572C603 .ór..ór.X@#ö+6Ò..u.X@ÌõuÌ3äYùRQÒ 000060
 53C35A59 58FE5589 4AD72806 88067789 FFFEFE44 C7F203F0 88FE8857 1874001D ..t.W.±.Þ.·ùO±±..w..@+■J.U±XYZùS 000080
 C3020802 74585A1F FFFA8308 C483009A 10309A1F 06500001 88505252 1ED23350 P3@.RRP¡..P...O....á..*..Z[t..@ù 0000A0
 884CE827 720057E8 07754806 46880856 8802828F 3875000A 7E830657 56EC8855 U.$VW..~..u8¢...V..F.Hu.ÒW.r'ŠL. 0000C0
 04730682 FE8104C6 8334735E 003EE856 0E468902 44880074 F73B1174 48068236 6..Ht.;Xt..D..F.VÒ>.^s4.ó..±..s. 0000E0
 1489E675 C085F958 0000FFFF 9A50C033 501652C4 885021E8 99FFFF88 06750208 .@u.¡...$ÌP.áR.P3äP.....[*.àuÌ.. 000100
 8104C683 0C74024C 39F7880E 4E88C85D E5885E5F 07C03303 88068236 89025C89 .\..6...Æ3à._^.Ì]ù.N..X9L.t..ó.. 000120
 FF9A5153 1373027C 1E390675 F738C18E D3882672 1C030A88 2CE8F9F2 750682FE ±..u·*$,.Ò..F&.Æ.ė;Xu.9.|.s.SQ.. 000140
 C45738E3 0C4E88EC 885500C3 D1880487 92027C16 890475F7 38DE75C0 850000FF ....àuß;Xu...|.....Ìù.U.$.N.D8Wá 000160
 F3C913A8 F3E9D1E0 8A0A4688 D1280187 01030323 D8180128 0C74DAF7 D788067E ~..■XÒt.+Ì.U#&.Ì.Ì+Ì.F..ÄìÒµ¨.èµ 000180
 000CC850 08568806 '46885FAA F3C913A8 F3E901C3 8EFFFFC3 81C38C10 E3D187AA ´.ìD..ù.ù...ùìÒµ¨.èµ¯_.F..V.]ù.. 0001A0
 00000006 0FA00002 00000004 10200002 00070001 084C0103 00050001 08840103 ..........L.......  ............ 0001C0
 00260001 10CF0103 00220001 10840103 00210001 017A0103 00880001 11190105 ..........z...Ì......."...ü...&. 0001E0
```

```
Dump of file SATURN:[PCCOMMON.DUMP.DLL]FILTTOOL.TMP;1 on 18-APR-1990 10:45:55.46
File ID (665,18,0)   End of file block 42 / Allocated 44

Virtual block number 34 (00000022), 512 (0200) bytes

005C0001 07400103 00580001 07600103 04190008 08540203 00400001 0ACE0103 ..ö...M...T.......`...[...M...\. 000000
6F432020 207972o1 7262694C 20656069 54206E75 5220534D 00000000 00000000 ........MS Run-Time Library - Co 000020
70726F43 2074666F 736F7263 694D202C 38383931 20296328 20746867 69727970 pyright (c) 1988, Microsoft Corp 000040
206F7420 676E6968 746F4E00 00000000 00000060 61200060 70200030 00200011 .. .0. pm. am........Nothing to  000060
65746C69 46006465 69666963 65705320 7265746C 6946206F 4E006574 656C6564 delete.No Filter Specified.Filte 000080
70207427 6E646C75 6F430072 6F727245 002E6465 74656C65 64207369 20002072 r . is deleted..Error.Couldn't p 0000A0
6854202E 65606954 2F657461 44206E6F 69746165 72432040 4F524620 65737261 arse FROM Creation Date/Time. Th 0000C0
72724500 7D6D603A 68687B20 79792064 64206060 20736920 74616072 6F662065 e format is mm-dd-yy (hh:mm).Err 0000E0
6144206E 6F69746' 65724320 4F542065 73726170 2074276E 646C756F 4300726F or.Couldn't parse TO Creation Da 000100
2079792D 6464206( 60207369 20746160 726F6620 65685420 2E656069 542F6574 te/Time. The format is mm-dd-yy  000120
4F524620 65737261 70207427 6E646C75 6F430072 6F727245 007D6060 3A68687B (hh:mm).Error.Couldn't parse FRO 000140
69207461 60726F66 20656854 202E6560 69542F65 74614420 65746164 7055204D M Update Date/Time. The format i 000160
276E646C 756F4300 726F7272 45007D60 603A6868 7B207979 20646420 60602073 s mm-dd-yy (hh:mm).Error.Couldn' 000180
65685420 2E656069 542F6574 61442065 74616470 55204F54 20657372 61702074 t parse TO Update Date/Time. The 0001A0
68746F4E 007D6060 3A68687B 20797920 64642060 60207369 20746160 726F6620  format is mm-dd-yy (hh:mm).Noth 0001C0
64656966 69636570 53207265 746C6946 206F4E00 796C7070 61206F74 20676E69 ing to apply.No Filter Specified 0001E0

Dump of file SATURN:[PCCOMMON.DUMP.DLL]FILTTOOL.TMP;1 on 18-APR-1990 10:45:55.46
File ID (665,18,0)   End of file block 42 / Allocated 44

Virtual block number 35 (00000023), 512 (0200) bytes

746F6E20 706C6548 00706C65 48002E64 656E6966 65642000 20726574 6C694600 .Filter . defined..Help.Help not 000000
00000000 00000000 00000000 00000000 0000656C 62616C69 61766120 74657920  yet available.................. 000020
406E7553 FFFF022A 023A0226 00010000 46500054 44450054 53450000 5A540000 ..TZ..EST.EDT.PF....&.:.*...SunM 000040
61407270 41726140 o265466E 614A0074 61536972 46756854 64655765 75546E6F onTueWedThuFriSat.JanFebMarAprMa 000060
08000800 00000000 00006365 44766F4E 74634F70 65536775 416C754A 6E754A79 yJunJulAugSepOctNovDec.......... 000080
00000000 00000000 00000000 00000000 00000000 00000000 00000236 08000867 g...6........................... 0000A0
00000000 00000000 00000000 00000000 00000000 00000000 00000000 00000000 ................................ 0000C0
00000000 00000000 00000000 00000000 00000000 00000000 00000000 00000000 ................................ 0000E0
00000000 00000000 00000000 00000000 00000000 00000000 00000000 00000000 ................................ 000100
00000000 00000000 00000000 00000000 00000000 00000000 00000000 00000000 ................................ 000120
00000000 00000000 00000000 00000000 00000000 00000000 00000000 00000000 ................................ 000140
00000000 00000000 00000000 00000000 00000000 00000000 00000000 00000000 ................................ 000160
00000000 00000000 00000000 00000000 00000000 00000000 00000000 00000000 ................................ 000180
00000000 00000000 00000000 00000000 00000000 00000000 00000000 00000000 ................................ 0001A0
00000000 00000000 00000000 00000000 00000000 00000000 00000000 00000000 ................................ 0001C0
00000000 00000000 00000000 00000000 00000000 00000000 00000000 00000000 ................................ 0001E0

Dump of file SATURN:[PCCOMMON.DUMP.DLL]FILTTOOL.TMP;1 on 18-APR-1990 10:45:55.46
File ID (665,18,0)   End of file block 42 / Allocated 44

Virtual block number 36 (00000024), 512 (0200) bytes

00000000 00000000 00000000 00000000 00000000 00000000 00000000 00000000 ................................ 000000
00000000 00000000 00000000 00000000 00000000 00000000 00000000 00000000 ................................ 000020
00000000 00000000 00000000 00000000 00000000 00000000 00000000 00000000 ................................ 000040
00000000 00000000 00000000 00000000 00000000 00000000 00000000 00000000 ................................ 000060
00000000 00000000 00000000 00000000 00000000 00000000 00000000 00000000 ................................ 000080
00000000 00000000 00000000 00000000 00000000 00000000 00000000 00000000 ................................ 0000A0
00000000 00000000 00000000 00000000 00000000 00000000 00000000 00000000 ................................ 0000C0
00000000 00000000 00000000 00000000 00000000 00000000 00000000 00000000 ................................ 0000E0
00000000 00000000 00000000 00000000 00000000 00000000 00000000 00000000 ................................ 000100
00000000 00000000 00000000 00000000 00000000 00000000 00000000 00000000 ................................ 000120
00000000 00000000 00000000 00000000 00000000 00000000 00000000 00000000 ................................ 000140
00000000 00000000 00000000 00000000 00000000 00000000 00000000 00000000 ................................ 000160
00000000 00000000 00000000 00000000 00000000 00000000 00000000 00000000 ................................ 000180
00000000 00000000 00000000 00000000 00000000 00000000 00000000 00000000 ................................ 0001A0
00000000 00000000 00000000 00000000 00000000 00000000 00000000 00000000 ................................ 0001C0
00000000 00000000 00000000 00000000 00000000 00000000 00000000 00000000 ................................ 0001E0
```

```
Dump of file SATU 'N:[PCCOMMON.DUMP.DLL]FILTTOOL.TMP;1 on 18-APR-1990 10:45:55.46
File ID (665,18,0,   End of file block 42 / Allocated 44

Virtual block number 37 (00000025), 512 (0200) bytes

 00000000 00000000 00000000 00000000 00000000 00000000 00000000 00000000 ................................ 000000
 00000000 00000000 00000000 00000000 00000000 00000000 00000000 00000000 ................................ 000020
 00000000 00000000 00000000 00000000 00000000 00000000 00000000 00000000 ................................ 000040
 00000000 00000000 00000000 00000000 00000000 00000000 00000000 00000000 ................................ 000060
 00000000 00000000 00000000 00000000 00000000 00000000 00000000 00000000 ................................ 000080
 20202020 20202020 20000000 00000030 4F464E49 5F454C49 465F435F 02820000 ....C_FILE_INFO=......            0000A0
 10101010 10101010 48202020 20202020 20202020 20202020 20202028 28282828 (((((                  H........ 0000C0
 01018181 81818181 10101010 10101084 84848484 84848484 84101010 10101010 ................................ 0000E0
 02028282 82828282 10101010 10100101 01010101 01010101 01010101 01010101 ................................ 000100
 00000000 00000000 00201010 10100202 02020202 02020202 02020202 02020202 ................................ 000120
 00000000 00000000 00000000 00000000 00000000 00000000 00000000 00000000 ................................ 000140
 00000000 00000000 00000000 00000000 00000000 00000000 00000000 00000000 ................................ 000160
 00000000 00000000 00000000 00000000 00000000 00000000 00000000 00000000 ................................ 000180
 005A003B 001EFFFF 00000000 00000000 00000000 00000000 00000000 00000000 ..............................;.Z. 0001A0
 00840096 00770059 003A001E FFFF0160 014E0130 011100F3 00040085 00970078 x...ç.Å.µ...O.N.m.....:.Y.w...Ç. 0001C0
 81010000 00010000 00000000 00000000 00000000 016C014D 012F0110 00F20003 ♯.·.../.M.l...................... 0001E0

Dump of file SATURN:[PCCOMMON.DUMP.DLL]FILTTOOL.TMP;1 on 18-APR-1990 10:45:55.46
File ID (665,18,0)   End of file block 42 / Allocated 44

Virtual block number 38 (00000026), 512 (0200) bytes

 00000000 00000000 00000000 00000000 00000000 00000000 00000000 00008181 ................................ 000000
 00000000 00000000 00000000 00000000 00000000 00000000 00000000 00000000 ................................ 000020
 00000000 00000000 00000000 00000000 00000000 00000000 00000000 00000000 ................................ 000040
 00000000 00000000 00000000 00000000 00000000 00000000 00000000 00000000 ................................ 000060
 00000000 00000000 00000000 00000000 00000000 00000000 00000000 00000000 ................................ 000080
 00000000 00000000 00000000 00000000 00000000 00000000 00000000 00000000 ................................ 0000A0
 00000000 00000000 00000000 00000000 00000000 00000000 00000000 00000000 ................................ 0000C0
 0A000000 00000000 00000000 00000000 00000000 00000000 00000000 00000000 ................................ 0000E0
 0A0A0A0A 0A0A0A0A 0A0A0A0A 0A0A0A0A 0A0A0A0A 0A0A0A0A 0A0A0A0A 0A0A0A0A ................................ 000100
 0A0A0A0A 0A0A0A0A 0A0A0A0A 0A0A0A0A 0A0A0A0A 0A0A0A0A 0A0A0A0A 0A0A0A0A ................................ 000120
 0A0A0A0A 0A0A0A0A 0A0A0A0A 0A0A0A0A 0A0A0A0A 0A0A0A0A 0A0A0A0A 0A0A0A0A ................................ 000140
 0A0A0A0A 0A0A0A0A 0A0A0A0A 0A0A0A0A 0A0A0A0A 0A0A0A0A 0A0A0A0A 0A0A0A0A ................................ 000160
 0A0A0A0A 0A0A0A0A 0A0A0A0A 0A0A0A0A 0A0A0A0A 0A0A0A0A 0A0A0A0A 0A0A0A0A ................................ 000180
 0A0A0A0A 0A0A0A0A 0A0A0A0A 0A0A0A0A 0A0A0A0A 0A0A0A0A 0A0A0A0A 0A0A0A0A ................................ 0001A0
 0A0A0A0A 0A0A0A0A 0A0A0A0A 0A0A0A0A 0A0A0A0A 0A0A0A0A 0A0A0A0A 0A0A0A0A ................................ 0001C0
 000A0A0A 0A0A0A0A 0A0A0A0A 0A0A0A0A 0A0A0A0A 0A0A0A0A 0A0A0A0A 0A0A0A0A ................................ 0001E0

Dump of file SATURN:[PCCOMMON.DUMP.DLL]FILTTOOL.TMP;1 on 18-APR-1990 10:45:55.46
File ID (665,18,0)   End of file block 42 / Allocated 44

Virtual block number 39 (00000027), 512 (0200) bytes

 00000000 00000000 00000000 00000000 00000000 00000000 00000000 0000.900 ................................ 000000
 36520000 3E3E4753 4D4E3C3C FFFF0000 00000000 00000000 00000000 00002000 ....................<<NMSG>>..R6 000020
 00333030 36520003 000A0077 6F6C6672 65766F20 68636174 73202D0A 00303030 000..- stack overflow.....R6003. 000040
 38303036 52000800 0A003020 79622065 64697669 64207265 6765746E 69202D0A .- integer divide by 0.....R6008 000060
 6E656075 67726120 726F6620 65636170 73206867 756F6E65 20746F6E 20200A00 ..- not enough space for argumen 000080
 65636170 73206867 756F6E65 20746F6E 20200A00 39303036 52000900 0A007374 ts.....R6009..- not enough space 0000A0
 6974206E 757200FF 000A0000 FC000A00 746E6560 6E6F7269 766E6520 726F6620  for environment...▪......run-ti 0000C0
 6F702067 6E697461 6F6C6620 200A0032 30303652 00020020 726F7272 65206560 me error ...R6002..- floating po 0000E0
 00020000 00050A12 00020002 FFFFFF00 0A006465 64616F6C 20746F6E 20746E69 int not loaded.................. 000100
 00000000 FFFF0001 000E0352 00000562 00000000 00000000 00000000 00060284 ................b...R........... 000120
 00000000 0452FFFF 010000E0 017CFFEB FFBF1400 02D00446 00080001 00000023 #.......F.Å...¢.Š.|.Å.....R..... 000140
 00000000 0000FFFF FFFF0101 0008003C 00020019 80000001 0456000C 00050000 ......V.......▪.<............... 000160
 00050000 00000000 FFFFFFFF 01020008 00A100C5 001B8002 00080463 00000006 ....c.......é.Å................. 000180
 00000007 00000000 0000FFFF FFFF0104 00080020 00840019 80000001 04640008 ..d.......Ç. ................... 0001A0
 046E0000 00060000 00000000 FFFFFFFF 01050020 00A40092 001B8000 0000046D m.........É. .................n. 0001C0
 0008046F 00000006 00000000 0000FFFF FFFF0127 0008005C 00920115 80030008 ........\...'...............o... 0001E0
```

```
Dump of file SATURN:[PCCOMMON.DUMP.DLL]FILTTOOL.TMP;1 on 18-APR-1990 10:45:55.46
File ID (665,18,0)   End of file block 42 / Allocated 44

Virtual block number 40 (00000028), 512 (0200) bytes

80020008 0470000^ 00060000 00000000 FFFFFFFF 01260008 005C0084 01158002 ......\...&...............p..... 000000
01158002 00080471 00000006 00000000 0000FFFF FFFF0128 0008005C 00680115 ..k.\...(..............q....... 000020
00320052 80030008 04720000 00060000 00000000 FFFFFFFF 01240008 005C005D ].\...$..............r.....R.2. 000040
006A001E 00528002 00080473 00000006 00000000 0000FFFF FFFF0108 0008006A j.................s.....R...j. 000060
003A00A5 001D00CA 80010002 0474000F 00050000 00000000 FFFFFFFF 011C0008 ..................t.....ò...Ê.:. 000080
0121000A 00410038 00078000 00040484 000C0003 00000000 0000FFFF FFFF0106 .....................•.8.A...!. 0000A0
FFFF0120 000A0038 00380131 80000004 0491000C 00030000 00000000 FFFFFFFF ....................1.8.8... ... 0000C0
FFFFFFFF 011F000A 00560022 00068001 0004049E 00120003 00000000 0000FFFF ..................ø.".V......... 0000E0
0000FFFF FFFF011E 000A0032 00220131 80000004 0481000A 00030000 00000000 ..........Ý.....1.".2........... 000100
00000000 FFFFFFFF 01130030 00A40042 00188000 000104BC 00000007 00000000 ........¥.......•.£.=........... 000120
00000000 0000FFFF FFFF0103 00080030 00820019 80000001 04800009 00050000 ......§.........0............... 000140
00050000 00000000 FFFFFFFF 01070008 00300032 00198000 000104C7 00080005 ....ú.......2.0................. 000160
000C0005 00000000 0000FFFF FFFF0109 0008003E 009C00CD 80000001 0403000C ..Æ.....ë...>................... 000180
04E00008 00050000 00000000 FFFFFFFF 010C0008 003E0077 00CD8000 000, :E0 À.....e.w.>...................Ù. 0001A0
000104F6 00080005 00000000 0000FFFF FFFF011D 00080024 000200CD 80000 )1 ....é.•.$...................-... 0001C0
80020000 05020003 00030000 00000000 FFFFFFFF 01180008 0036001E 001980u0 ......6......................... 0001E0

Dump of file SATURN:[PCCOMMON.DUMP.DLL]FILTTOOL.TMP;1 on 18-APR-1990 10:45:55.46
File ID (665,18,0)   End of file block 42 / Allocated 44

Virtual block number 41 (00000029), 512 (0200) bytes

00528002 04000506 00050003 00000000 0000FFFF FFFF0131 000C0026 00080016 ....&...1......................R. 000000
0008008E 80020000 050C0007 00030000 00000000 FFFFFFFF 0001000C 0026000B ..&............................. 000020
0026000B 00CA8002 00000514 00060003 00000000 0000FFFF FFFF0132 000C0026 &...2.....................ò...&. 000040
000C0026 00080106 80020000 051B0006 00030000 00000000 FFFFFFFF 0135000C ..5.......................&... 000060
0119000C 0026000B 01428002 01000522 00040003 00000000 0000FFFF FFFF0002 ................"......B...&..... 000080
FFFF011A 00080046 002F00CD 80000001 05270010 00050000 00000000 FFFFFFFF ..............'.....ë./.F....... 0000A0
FFFFFFFF 0118000B 00580043 00C08000 00010538 00140005 00000000 0000FFFF ............B.....è.C.(......... 0000C0
0000FFFF FFFF0122 0025009E 00AA00CF 80000001 054D0000 00070000 00000000 ..........M.....ü.´...%."....... 0000E0
00000000 FFFFFFFF 012A0008 00180092 00F08000 0001054E 00050005 00000000 .........N.....Þ.......*......... 000100
00000000 0000FFFF FFFF0130 00080017 008400F0 80000001 05540003 00050000 ......T.....Þ.......0........... 000120
00050000 00000000 FFFFFFFF 012F0008 001A0068 00F08000 00010558 00050005 ....X.....Þ.k...../............. 000140
726F4620 7265746C 6946FFFF FFFF012E 00080017 005D00F0 80000001 055E0003 ..^.....Þ.]...........Filter For 000160
00000000 3A737265 746C6946 00003A65 6D616E20 7265746C 69460000 00030060 m.....Filter name:..Filters:.... 000180
2920524F 20282065 6D6F537E 00736E6F 6974706F 206C6F72 746E6F43 00000000 ....Control options.~Some ( OR ) 0001A0
2920544F 4E202820 65766973 756C6378 457E0029 20444E41 2028206C 6C417E00 .~All ( AND ).~Exclusive ( NOT ) 0001C0
62206465 74616572 43003A73 64726F77 79654B00 00657669 73756C63 6E497E00 .~Inclusive..Keywords:.Created b 0001E0

Dump of file SATURN:[PCCOMMON.DUMP.DLL]FILTTOOL.TMP;1 on 18-APR-1990 10:45:55.46
File ID (665,18,0)   End of file block 42 / Allocated 44

Virtual block number 42 (0000002A), 512 (0200) bytes

6A624F00 64657461 64707520 656D6954 00646574 61657263 20656D69 54003A79 y:.Time created.Time updated.Obj 000000
6C65447E 00796C70 7041004B 4F7E003A 79622064 65746164 7055003A 73746365 ects:.Updated by:.~OK.Apply.~Del 000020
20616972 65746972 4300706C 6548006C 65636E61 43007261 656C7E43 00657465 ete.C~lear.Cancel.Help.Criteria  000040
72460000 6E6F6974 616E6962 6D6F6320 61697265 74697243 00676E69 74736574 testing.Criteria combination..Fr 000060
00000000 00000000 00000000 0000003A 6F54003A 6D6F7246 003A6F54 003A6D6F om:.To:.From:.To:............... 000080
00000000 00000000 00000000 00000000 00000000 00000000 00000000 00000000 ................................ 0000A0
00000000 00000000 00000000 00000000 00000000 00000000 00000000 00000000 ................................ 0000C0
00000000 00000000 00000000 00000000 00000000 00000000 00000000 00000000 ................................ 0000E0
00000000 00000000 00000000 00000000 00000000 00000000 00000000 00000000 ................................ 000100
00000000 00000000 00000000 00000000 00000000 00000000 00000000 00000000 ................................ 000120
00000000 00000000 00000000 00000000 00000000 00000000 00000000 00000000 ................................ 000140
00000000 00000000 00000000 00000000 00000000 00000000 00000000 00000000 ................................ 000160
00000000 00000000 00000000 00000000 00000000 00000000 00000000 00000000 ................................ 000180
00000000 00000000 00000000 00000000 00000000 00000000 00000000 00000000 ................................ 0001A0
00000000 00000000 00000000 00000000 00000000 00000000 00000000 00000000 ................................ 0001C0
00000000 00000000 00000000 00000000 00000000 00000000 00000000 00000000 ................................ 0001E0
```

```
Dump of file SATURN:[PCCOMMON.DUMP.MSG]FLFORM.MSG;1 on 18-APR-1990 10:54:04.24
File ID (1012,11,0)   End of file block 3 / Allocated 4

Virtual block number 1 (00000001), 512 (0200) bytes

 E7000000 00000000 00000000 00000000 01000100 64464C46 00464753 4D4B4DFF .MKMSGF.FLFd...................Ó 000000
 52013101 11010E01 08010801 05010200 FF00FC00 F900F600 F300F000 ED00EA00 .õ.Ú.Þ.µ.¯.¹.ª................1.R 000020
 2F021201 F701E301 C801C501 C2018F01 BC018901 B6018301 B0019C01 85017201 .r......°.Ñ.¿.¥.¢.ò.é.à.Ð.¼.../ 000040
 1F030802 F002ED02 D802C702 C402C102 B1029802 98029502 85027502 58024902 .I.X.u.........Ý.è.á.ú.Á.Ú.Þ.... 000060
 65046204 5F045C04 59045604 53045004 34041A04 17041404 11040E03 30032003 .·.0..........4.P.S.V.Y.\._.b.e 000080
 95049204 8F048C04 89048604 83048004 7D047A04 77047404 71046E04 68046804 .h.k.n.q.t.w.z.}................ 0000A0
 C504C204 BF048C04 89048604 B3048004 AD04AA04 A704A404 A1049E04 9B049804 .......Å.Ê.Ì.¯.Ù.¯.°.Ñ.¿.¥.¢.ò.é 0000C0
 490A0049 0A0D490A 0D490A0D 490A0049 0A0D490A 0D490A0D 4904CE04 CB04C804 .à.ù.ö.I..I..I..I..I..I..I..I..I 0000E0
 55525453 5F4C465F 4C4D445F 534D450A 00490A00 490A0049 0A00490A 00490A00 ..I..I..I..I..I..EMS_DML_FL_STRU 000100
 55525453 5F4C465F 4C4D445F 534D450A 00535254 54415F54 45475F45 52555443 CTURE_GET_ATTRS..EMS_DML_FL_STRU 000120
 5254535F 4C465F4C 4D445F53 4D450A00 52545441 5F454341 4C505F45 52555443 CTURE_PLACE_ATTR..EMS_DML_FL_STR 000140
 4C5F4545 52465F4C 4D445F53 4D450A00 544E455F 4543414C 505F4552 55544355 UCTURE_PLACE_ENT..EMS_DML_FREE_L 000160
 5F534D45 0A0D4D52 4F46534E 4152545F 4C44505F 4C4D445F 534D450A 00545349 IST..EMS_DML_PDL_TRANSFORM..EMS_ 000180
 490A0049 0A0D490A 00490A00 490A0049 0A005352 41565F54 4E495250 5F4C4D44 DML_PRINT_VARS..I..I..I..I..I..I 0001A0
 746E6574 6E6F4365 72757463 75727453 776F6C46 64644145 0A00490A 00490A00 ..I..I..EAddFlowStructureContent 0001C0
 53776F6C 466C6544 450A0073 65727574 63757274 53776F6C 46646441 450A0073 s..EAddFlowStructures..EDelFlowS 0001E0

Dump of file SATURN:[PCCOMMON.DUMP.MSG]FLFORM.MSG;1 on 18-APR-1990 10:54:04.24
File ID (1012,11,0)   End of file block 3 / Allocated 4

Virtual block number 2 (00000002), 512 (0200) bytes

 75727453 7473616C 42776F6C 46450A00 73746E65 746E6F43 65727574 63757274 tructureContents..EFlowBlastStru 000000
 74637572 7453656C 62616E45 776F6C46 450A0074 73654E6F 746E4965 72757463 ctureIntoNest..EFlowEnableStruct 000020
 6F635377 6F6C4645 0A006574 61676976 614E776F 6C46450A 00746964 45657275 ureEdit..EFlowNavigate..EFlowSco 000040
 6D6D6F43 4D57776F 6C46450A 00747365 4E6D6F72 46657275 74637572 74537275 urStructureFromNest..EFlowWMComm 000060
 74696E49 450A0049 0A00490A 006C6F72 746E6F43 4D57776F 6C46450A 00646E61 and..EFlowWMControl..I..I..EInit 000080
 00746E65 7645776F 6C467469 6E49450A 006E6F69 74616E69 74736544 776F6C46 FlowDestination..EInitFlowEvent. 0000A0
 6F6C4674 696E4945 0A006563 72756F53 776F6C46 74696E49 450A0049 0A00490A .I..I..EInitFlowSource..EInitFlo 0000C0
 72757463 75727453 776F6C46 70655245 0A00490A 00736572 75746375 72745377 wStructures..I..ERepFlowStructur 0000E0
 450A0073 65727574 63757274 53776F6C 46706552 450A0073 746E6574 6E6F4365 eContents..ERepFlowStructures..E 000100
 746E6576 45776F6C 46657461 64705545 0A00490A 00797274 6E456574 61647055 UpdateEntry..I..EUpdateFlowEvent 000120
 20202020 20202020 454D414E 4C464554 41445055 5F524F52 52455F46 4C460A00 ..FLF_ERROR_UPDATEFLNAME          000140
 5F464C46 0A00656D 614E776F 6C466574 61647055 20452020 20202020 20202020           E_UpdateFlowName..FLF_ 000160
 20204554 41524854 574F5247 54435552 54534C46 45544144 50555F52 4F525245 ERROR_UPDATEFLSTRUCTGROWTHRATE   000180
 52687477 6F724765 72757463 75727453 776F6C46 65746164 70552045 20202020     E_UpdateFlowStructureGrowthR 0001A0
 4F524754 43555254 534C4645 54414450 555F524F 5252455F 464C460A 00657461 ate..FLF_ERROR_UPDATEFLSTRUCTGRO 0001C0
 75746375 72745377 6F6C4665 74616470 55204520 20202020 2054494E 55485457 WTHUNIT         E_UpdateFlowStructu 0001E0

Dump of file SATURN:[PCCOMMON.DUMP.MSG]FLFORM.MSG;1 on 18-APR-1990 10:54:04.24
File ID (1012,11,0)   End of file block 3 / Allocated 4

Virtual block number 3 (00000003), 512 (0200) bytes

 74616470 55450A00 490A0049 0A00490A 00490A00 74696E55 6874776F 72476572 reGrowthUnit..I..I..I..I..EUpdat 000000
 53776F6C 46657461 64705545 0A006570 79546572 75746375 72745377 6F6C4665 eFlowStructureType..EUpdateFlowS 000020
 490A0049 0A00490A 00490A00 490A0049 0A00656D 756C6F56 65727574 63757274 tructureVolume..I..I..I..I..I..I 000040
 0A00490A 00490A00 490A0049 0A00490A 00490A00 490A0049 0A00490A 00490A00 ..I..I..I..I..I..I..I..I..I..I.. 000060
 00490A00 490A0049 0A00490A 00490A00 490A0049 0A00490A 00490A00 490A0049 I..I..I..I..I..I..I..I..I..I..I. 000080
 490A0049 0A00490A 00490A00 490A0049 0A00490A 00490A00 490A0049 0A00490A .I..I..I..I..I..I..I..I..I..I..I 0000A0
 6F6E7953 74655379 6669746F 4E776F6C 46450A00 490A0049 0A00490A 00490A00 ..I..I..I..I..EFlowNotifySetSyno 0000C0
 00000000 00000000 00000000 00000000 00000000 650A000A 00656061 4E60796E nymName....e.................... 0000E0
 00000000 00000000 00000000 00000000 00000000 00000000 00000000 00000000 ................................ 000100
 00000000 00000000 00000000 00000000 00000000 00000000 00000000 00000000 ................................ 000120
 00000000 00000000 00000000 00000000 00000000 00000000 00000000 00000000 ................................ 000140
 00000000 00000000 00000000 00000000 00000000 00000000 00000000 00000000 ................................ 000160
 00000000 00000000 00000000 00000000 00000000 00000000 00000000 00000000 ................................ 000180
 00000000 00000000 00000000 00000000 00000000 00000000 00000000 00000000 ................................ 0001A0
 00000000 00000000 00000000 00000000 00000000 00000000 00000000 00000000 ................................ 0001C0
 00000000 00000000 00000000 00000000 00000000 00000000 00000000 00000000 ................................ 0001E0
```

Dump of file SATURN:[PCCOMMON.DUMP.PBIN]FINDBND.EXE;1 on 18-APR-1990 10:54:53.17
File ID (381,21,0) End of file block 28 / Allocated 28

Virtual block number 1 (00000001), 512 (0200) bytes 00000000 00000040 00000000 00000088 0000FFFF 00000004 0000001C 01D15A4D MZ1.............¡.......ª....... 000000
00000080 00000000 00000000 00000000 00000000 00000000 00000000 00000000 ................................ 000020
6F6E6E61 63206061 72676F72 70207369 685421CD 4C01B821 CD09B400 0EBA1F0E ..o..Ç.ëí¡.Lí!This program canno 000040
00000000 00000024 0A0D0D2E 65646F6D 20534F44 206E6920 6E757220 65622074 t be run in DOS mode....$....... 000060
00020003 00030000 0001008C 0A000000 0003020A EB61B87F 00020075 0505454E NE..u....¡aŠ........¥........... 000080
00000000 00000000 00010000 00040000 000000F7 00670063 00580058 0040002A *.@.X.X.c.g.÷................... 0000A0
646E6264 6E696607 0A700F01 08C702EF 02010E01 00000000 2D2A0F00 2D2A0013 ..*-..*-........ÿ.ú...p..findbnd 0000C0
20797469 6C697455 26000053 4C4E0353 4C4C4143 534F4408 00000A00 01000000 .........DOSCALLS.NLS..&Utility 0000E0
0000646E 69626C71 7320726F 66207365 6C696620 646E622E 20646E69 66206F74 to find .bnd files for sqlbind.. 000100
02067E83 D88EFFFF 881E5657 000148C8 00000000 00000000 00000000 00000000 ................ÈH..WV.¡...Ø.~.. 000120
02389A01 6A08C483 003004A8 9A004268 1E37FF26 0277FF26 085EC400 20E9037C |.Ò .é^.&.w.&.7.hB..¨.0..é.j..8. 000140
B0685016 80468037 FF260277 FF26085E C4005968 1E076A04 08468302 C483006F o..é..F..j..hY.é^.&.w.&.7.F..Ph. 000160
7904A89A 005F681E 37FF2602 77FF2608 5EC40020 E9037500 00300000 FFFF9A00 ......=..u.Ò .é^.&.w.&.7.h_..´.y 000180
05049A50 16FEB886 8D007D68 1E501680 468D02C4 83009002 389A016A 08C48300 ..é.j..8....é..F..P.h)...¡±.P... 0001A0
00000000 00000000 CBC95F5E 1F04C483 FFFF058A 9A5016FE B8868D0C C483009E ...é...¡±.P......é..^_èù........ 0001C0
92A30094 0E894900 9C1E8C00 9A268900 962689FC 0001EFE9 00000000 00000000 ........Òy..=.&...&......1....É. 0001E0

Dump of file SATURN:[PCCOMMON.DUMP.PBIN]FINDBND.EXE;1 on 18-APR-1990 10:54:53.17
File ID (381,21,0) End of file block 28 / Allocated 28

Virtual block number 2 (00000002), 512 (0200) bytes

E80000FF FF9A501E 04C08804 8EA3E086 580000FF FF9A5016 C4885000 901E8900 .....P.é.P.....X.ÀÉ/.¡é..P.....Ò 000000
EF36FF04 F136FF04 F336FF04 F536FF00 FA06889A 00F50088 9A002601 AE9A004B K..Ü.&..¡.%..¡.ª..6%..6µ..6þ..6ÿ 000020
011E0668 9A500238 009806C7 36000388 01180238 9A5000FF 00009A04 ED36FF04 ..6Ú......P.8...¡..6ú...8.P.h... 000040
04A806C6 38049C06 C6087500 04C03E80 0000B800 9816FF50 00FF8801 2E07749A .t...¡..P....É...>é..u.6...;6.´. 000060
F3C888D1 88049C8E 43740030 80264701 75003080 267FFFB9 0092068E FF334800 .K3.....¿..&.=.u.G&.=.tC/...l.ùµ 000080
412CAC04 B1147500 F88304C5 8F1FF788 071E062E E8E774AE F2C03308 74CA88A6 |.òt.3à·ÙtÒŠ.....%.«é..«.u.Ý.¯,A 0000A0
0288C31F 16F7E2AA 480'74C0 FEAC9198 ACEEEBAA C20A1172 412CAC92 E0D21972 r.@Á.¯,Ar..ò¯ŠŸ¯..¯±ât.H¨ãX..ùÉ. 0000C0
00013040 81127558 C0080000 FFFF9A52 16501653 C4885087 04C5A780 04A85200 .R.å.Té.ñP.éS.P.R......åXu.Ý@=.. 0000E0
9A531652 0E01208A 500C8850 50C0335A D4794804 C58F0808 81067500 0230 774 t.=..u.Ý...é.KyåZ3àPP.ÉPo ..R.S. 000100
16057307 401EFF36 DB33DA8C 074406C5 00923688 29E30742 0E885858 0000F7FF ....XX..B.D).6..é.D..Ò3Û6..@.s.. 000120
4CBE0068 E8074C8F 074C8E1F 1607401E FF360003 B8DA8C07 4806C536 0478E91F .Õx.6é.H..ÖÉ..6..@.../L.«L.Òh./L 000140
5503E800 49E80750 8F074C8E 0052E80A 648F0A64 8EEC8855 C8005FE8 074C8F07 .«L.Ò_.ùU.±/d.«d.ÒR./L.«P.Ò|.Š.U 000160
067E830B 74C00801 3306929A 0032E807 508F0750 8E0038E8 07508F07 508EEC88 .±/P.ëP.Ò;./P.«P.Ò2....3..åt..~. 000180
028807E3 07420E88 0000FFFF 9A500646 8A500001 880000E8 00FF0646 C7057500 .u.úF...Ò..¡..P.F.P.......B.D.É. 0001A0
068F0500 068F00C3 EEE81DFF F2740245 08058804 EF830E73 F738C307 401EFF00 ...@.ù;¼s..y....E.t·..ŠŸû....... 0001C0
F69604F9 1E8C3604 F7368936 F77500FF 7C800674 4EF08800 921E8E00 90A10502 ..À.......ÞNt..|..u¼6.6%.6..ª..- 0001E0

Dump of file SATURN:[PCCOMMON.DUMP.PBIN]FINDBND.EXE;1 on 18-APR-1990 10:54:53.17
File ID (381,21,0) End of file block 28 / Allocated 28

Virtual block number 3 (00000003), 512 (0200) bytes

C00AF774 093CF874 203CACFA 75C00A42 AC0001BF D23304FE 36893696 0175FF04 ..u..6.6±.3Ø¢..¯B.åu*¯< t«<.t%.å 000000
AC41C933 E8EB4203 745C3C24 74223C54 74C00AE8 74093CEC 74203CAC 4E476374 tcGN¯< t$<,tÒ.åtî<"t$<\t.BŠÒ3èA¯ 000020
223C2774 C00AAC4E 01E8CE75 01A8D113 E9D1C188 D7E8D103 0474223C FA745C3C <\t"<"t..ÎŠ»è1Ò.î´.uöŠ.N¯.åt'<" 000040
A8D113E9 D1C188DF E8D10304 74223CFA 745C3CAC 41C933F0 E8420374 5C3CC274 tò<\t.BŠÞ3èA¯<\t"<"t..1ŠÒ.è1Ò.1´ 000060
0673043C E8FE2440 C203C788 E7D1E7D1 47D70307 0304ED3E 891F169F E8067501 .uøŠ....>Ù..ª.øG1Ò1Ò.ú.ö@Š±Ò<.s. 000080
FE368804 C3830257 8C363F89 360716F8 03D88804 F11E8C04 EFA3FD84 E9000888 |..ÒÇ«ÉŸ...Þ..Ä.½...6.76.W..ù..6± 0000A0
E90375C0 0AF77409 3CF87420 3CACAAC0 3303E8FA 75C00AAA AC4EA400 921E8E04 .....ÉN¯¯.åu*Š.3à¯¯< t«<.t%.åu.Ò 0000C0
74223C63 74C00AD6 74093CDA 74203CAC 4EAAD788 04C38302 578C363F 89360081 ..6.76.W..ù..@¨N¯< tÒ<.tø.åtc<"t 0000E0
AAF3E9D1 5CB0D5E8 AAF35C80 0674223C FA745C3C AC41C933 E8EBAA03 745C3C26 &<\t.¯ŠÒ3èA¯<\t"<"t.¯\µ¨Š1¯\1Òµ¯ 000100
E8AA0374 5C3C8674 223C2A74 C00AAC4E D7874FAA 22B0D787 46C9EBAA 22B00573 s.¯"¨ŠèF.ª¯"Ò.ªN¯.åt"<"tÑ<\t.¯Š 000120
C7EBAA22 B09573AA F3E9D15C B0D5EBAA F35C8006 74223CFA 745C3CAC 41C933F0 Þ3èA¯<\t"<"t.¯\µ¨Š1¯\1Òµ¯s.¯"¨Šú 000140
8855FF22 E905002E FF0475C0 85026728 5C9A0000 0247C700 0007C71F 16AAC033 3à¯..ù...ùG....\(g..åu.....Ò".U. 000160
050406C7 05048951 06217400 087E8306 4EC4FE46 8D00248A 05068850 0001B8EC å|..PÉ..¤Š..F±åN..-...t1.Q¿..ú... 000180
1652531E 050436FF 0EE80000 FFFF9A50 50C03350 1652531E 51001089 511E0001 ...Q¿..Q.SR.P3àPP.....Š..6...SR. 0001A0
88560CEC 83EC8855 CB5DE588 99C03303 7493C085 DA8C0017 C3810000 FFFF9A50 P......ù...Ò.à.t.3à..|]ùU.&.Š.V¡ 0001C0
FFF08804 C48304E4 09749AF6 76FF1EFC 568CFA46 890A468D F85E8CF6 4689055E ^..F-.^½.F..Fª.V«..v~.t.Ò..é..Þ. 0001E0

Dump of file SATURN:[PCCOMMON.DUMP.PBIN]FINDBND.EXE;1 on 18-APR-1990 10:54:53.17
File ID (381,21,0)   End of file block 28 / Allocated 28

Virtual block number 4 (00000004), 512 (0200) bytes

```
FFF876FF F446890C C48304F6 0B029AF6 76FFF876 FF0676FF 0876FFFA 76FFFC76 v..v..v..v..v%.v-...-..6..F¶.v%. 000000
89EC4680 565716EC 83EC8855 90CB50E5 885EF446 8806C483 04410A56 9A56F676 v-V.V.A..6..F¶^.I]ù.U.&.&.WV.F&. 000020
06478926 08568L06 4688420A 47C626F8 5EC4FE56 8CFC4689 0E468DFA 568CF846 F%.V*.F..F=.V±6^%&6G.B.F..V.&.G. 000040
0B029A53 060A76FF 0C76FFFC 76FF167F FF0447C7 26025789 26078926 08578926 &.W.&..&.W.&ùG.....v=.v..v..S... 000060
EB058826 02478E26 07FF263F 8826C02A 1278044F FF26F85E C4F0880C C483057C |..6..Þ6^%&.O.x.*à&.?&..&.G.&..Š 000080
88554590 581E90C8 50E5885F 5EC68806 C48304C8 07EC9A50 C02B53FA 76FF9010 ...v*S+àP.&.à..6..6^_.I]ù..X.EU. 0000A0
08460B06 4688F056 89EE4689 04C48305 8C158C9A 501E052A 8818EC83 D88E1EEC &..Ä.&.¡*..P.¥.¥..6.¯FŸ.VÞ.F..F. 0000C0
8EE9C02B 900094E9 00018807 75C00806 C4830610 198C9AEE 76FF5250 C02B2075 u +àPR.vŸ.¥....6..6u.¡..Ö...+àÖ. 0000E0
88FA4689 FC4689C0 2BF85689 F6468908 56880646 88F45E8C F2468905 32889000 ..¡2..F..^¶.F..V..F-.V%+à.F=.F*. 000100
16529A50 C02BEE76 FFF076FF 5016EE46 8D04F336 FF04F536 FF3774F0 4608EE46 FŸ.FÞt7.6%..6µ..FŸ.P.vÞ.vŸ+àP.R. 000120
3E8031EB EC468805 7400048A 3E830C74 0204BA3E 830E7540 EC46890E C483065A Z..6..F&àu..>¤..t..>¤..t..F&§1.> 000140
5016EE46 8D04F336 FF04F536 FFF05E8C EE468905 3D8803E8 05358805 740004C0 à..t.¡5.Š.¡=..FŸ.^Þ.6%..6µ..FŸ.P 000160
9A5000FC 88EC8855 C8405D1F E58802E0 830EC483 0550180E 9A50C02B EE76FF1E ..vŸ+àP...P..6..Ù..Ï.]MùU.&¡=.P. 000180
E90002B8 C85DE588 06720774 9A5000FF 88054A1E FF047400 054C3E83 059F0774 t....>L..t...J.¡..P.t.r..I]ù¡..Ö 0001A0
749A5000 01880686 06689A11 7455F480 FBE2E032 ACFCE432 004289F6 3356FA98 .*V3-¿B.2Ö=¯2Àä«.¶Ut..h...¡..P.t 0001C0
053A26FF FFB9FF33 F633C033 0092068E 0550068F 054E068F CB5E0001 8806A807 .´.¡..^ù..N...P.....3à3-3.¿..&:. 0001E0
```

Dump of file SATURN:[PCCOMMON.DUMP.PBIN]FINDBND.EXE;1 on 18-APR-1990 10:54:53.17
File ID (381,21,0)   End of file block 28 / Allocated 28

Virtual block number 5 (00000005), 512 (0200) bytes

```
39E90009 88067300 C1E8C603 E6D1E601 FE88FE24 40C78846 FA75AE46 AEF20674 t.·ÜFÜu*F.ùä$±.±illl.6Öé.s.¡..Ö9 000000
049C0638 2604882B E3490716 F6331F06 D888FE03 F888CF88 04F5168C 04F3A3FA *Èµ...%..ù.%.±.Á..3-..ID+..&;... 000020
C00AAAAC 04C38302 578C263F 89260A74 595E5FA7 F3000689 049CBF57 56511075 u.QVW¢..¿..µÏ_^Yt.&.?&.W..ù.¯¯.à 000040
C08ED88E 00088857 56EC8855 00054E2E FF07161F 16024F89 260F8926 D5E2FA75 u*àI&..&.O.......N..U.&VW¡...Ä.à 000060
E5885E5F 96E8E8F7 88AEF2FF FF89C033 970C7496 401074C2 38AD075E 8E065688 .V.ƒ^.Ù;öt.ä.t..3à¿...Ù.%§Š._^.Ï 000080
D1F7AEF2 FFFFB9C0 33FA8892 1F74C008 06810744 9A0676FF 57EC8855 0002CA5D ]ò..U.&W.v..D.Ÿ..ât...*3à¿..¯Ù%Ï 0000A0
03009A1E 885A0002 CA5DE588 5F580000 FFFF9A50 1651521E 530002B8 C4885049 IP.6E..S.RQ.P.....[_.I]ò..Z..... 0000C0
0E89490C 7558C085 0000FFFF 9A1E5150 410FC980 49C88819 7200941E 38267208 Är&;...r..ùI.è.APQ.......àXu.I.. 0000E0
83EC8855 00E2FFC3 88E38802 7206F81E 38087208 280C880E E8F8009A 1E870094 ......%Š..É+Ar.;.%.r..D.ù.ä.U.&. 000100
03E001C8 88F9F700 0C899905 522DC388 FA4689E4 2A08478A 26085EC4 565708EC &.WV6^.&.G.*ö.F*.ù-R..¿..%*.àIÁ. 000120
88200A4F 8026085E C40F7440 0A47F626 0774830A 47F626F8 46890642 05E0D1C1 èIÁ.B..F%&-G..t.&-G.ät.6^.&.O. ¡ 000140
802690E2 E8000004 47C72620 0A4F8026 0E74010A 47F62608 5EC49001 39E9FFFF ..Ö9..6^.&-G..t.&.O. &ùG...Šä.&. 000160
99055220 C3885175 0C0A47F6 26FC7689 F0880447 8926C02B EF0A6780 26020A4F O..&.g.y+à&.G..Þ.v=&-G..uQ.ù-R.. 000180
089C0A7E 81077505 5E087E81 37750106 4287F6E3 D1D803E3 D1D888F9 F7000C89 ¿..%*.AiD.AiD-.B..u7.~.^.u..~... 0001A0
FF0C75C0 0B02C483 09141F82 9AFA76FF 0F75074A 0A7E8116 75056A08 7E810E74 t..~.j.u..-.J.u..v*.ý....6..àu.. 0001C0
F9F7000C B9990552 20C3881A 75080A47 F626085E C404C483 11FCE808 76FF0A76 v..v.Ö=..6.á^.&-G..u..ù-R..¿..%* 0001E0
```

Dump of file SATURN:[PCCOMMON.DUMP.PBIN]FINDBND.EXE;1 on 18-APR-1990 10:54:53.17
File ID (381,21,0)   End of file block 28 / Allocated 28

Virtual block number 6 (00000006), 512 (0200) bytes

```
57882606 47882606 77282637 8826085E 88697401 064287F6 E301D803 E301D888 .AiD.AiD-.B..ti.^.&.7&+w.&.G.&.W 000000
76FF0677 FF265256 167EF608 04478926 4802458B FB7E8802 57892607 89264008 .ä&..&.W..-%.E.H&.G..-~.VR&.w..v 000020
5050C02B 500002B8 11742004 C587F6FA 5E881BEB FC468908 C4830934 1C109AFA *...4..6..F=Š..^*-.é. t.¡..P+àPP 000040
468D50C6 8B0001BE 19E80788 2606468A 065FC426 085EC408 C4830959 18D29A53 S.Ö.Y..6.6^.&6_..F.&..Š.ƒ...6P.F 000060
5F5EE42A 06468AFE BEE90374 FC7639FC 468908C4 83077E1C 109AFA76 FF501606 ..P.v*...~..6.¯F=9v=t.Ö/±.F.*Ö^_ 000080
FE46C707 75099E08 7E810E75 055E067E 8106FA06 FF5604EC 83EC8855 C85DE588 .I]ùU.&.&.V..*..-.^.u..~...u.ùF± 0000A0
750C0A47 F626065E C40001FE 46C72975 088E087E 81307505 6A067E81 13E80000 ..Š..-.j.uO.-...u)ùF±..6^.&-G..u 0000C0
0081E9C0 2B077401 064287F6 E301D803 E301D888 F9F7000C B9990552 20C3881A ..ù-R..¿..%*.AiD.AiD-.B..t.+àÖ.. 0000E0
02C4830A 951DC99A 50020088 15750244 08048806 BEC681E6 D30281FE 76889090 ...v±Ÿ.ÆÏ.6/....D.u.¡..P.è....6. 000100
064205E0 D1C103E0 D1C888F9 F7000C89 9905522D 06468802 74D00802 54890489 ...T..Àt@.F.-R..¿..%*.àIÁ.èIÁ.B. 000120
07892608 57892606 47892606 C0948806 8E8488E6 D1E6D1FE 7688065E C4FC4689 .F=6^..v±illl..ƒ...à.&.G.&.W.&.. 000140
01880 20A 4F802606 5E881107 C60E8804 47892602 44890200 88FC7688 02578926 &.W..v=¡...D.&.G..Bó...^.&.O..¡. 000160
E0D1C103 E0D1C888 F9F7000C B9990552 2D084688 04EC83EC 8855C85D E5885E00 .^.I]ùU.&.š..F.-R..¿..%*.àIÁ.èIÁ 000180
2A08478A 26085EC4 75741007 F626FC5E C4517400 067E83FE 5E8CFC46 89064205 .B..F=.^±.~..tQá^=&-..tuá^.&.G.* 0001A0
26FC5EC4 04C4830A E618429A 0876FF0A 76FF5F74 C00B02C4 830AA71F B29A50E4 ÖP.ý.Ï..6..ât_.v..v..B.Ï..6.6^=& 0001C0
20EB0857 89260647 89260257 89260789 2699C02B 085EC400 000247C7 260007C6 6..&ùG...6^.+Ï.&..&.W.&.G.&.W.Š- Q001E0
```

```
Dump of file SATURN:[PCCOMMON.DUMP.PBIN]FINDBND.EXE;1 on 18-APR-1990 10:54:53.17
File ID (381,21,0)   End of file block 28 / Allocated 28

Virtual block number 7 (00000007), 512 (0200) bytes

 FF0E74C0 0802C4L3 0AF81F82 9A50E42A 08478A26 085EC424 741007F6 26FC5EC4 â^•&-..t$á^.&.G.*ðP.ý.%..á..ât.. 000000
 08FA8809 E819F89A 000A88EC 885590C8 5DE58804 C48308A6 18429A08 76FF0A76 v..v..@.[..á..[]ù.U.&|...%.$.¡*. 000020
 CC168908 CAA30856 88064688 08E61689 08E4A310 56880E46 8808F61E 8C08F4A3 Ê¶...-..F..V.Èõ...]..F..V.Èò...ä 000040
 28000108 F206C703 18E90374 25F67E80 039DE900 0008EE06 C7000008 F006C708 .ú.Þ...ú.Ÿ...Õ...--%t.Õ..ú.·...+ 000060
 0A5A06C7 08E2A308 C8A308CE A308E8A3 08EAA308 D2A308EC A308D0A3 08D4A3C0 âÈâ.ÈÂ.Èâ.Èê.Èõ.ÈÒ.Èó.Èâ.Èã.ú.Z. 000080
 752B3F80 260A5E88 903EE800 300A5A06 C70A46FF 49753001 7F80260A 5EC40020  .á^.&...0uI.F.ú.Z.0.$>..^.&.?+u 0000A0
 E808E806 FF1A7500 08D43E83 0E75203F 80269028 E8000008 E806C708 D406FF00 ...â.ú.Ô...$(.&.? u..>â..u...Ô.$ 0000C0
 5098078A 260A5E88 0A46FF08 E206FFC7 75203F80 260A5EC4 00E808C8 06FF9014 ....à.$.á^.&.?-uú..ã..F..^.&...P 0000E0
 0A468908 C48308F2 E80E501E 08F8880A 76FF0C76 FF0075C0 0802C483 09AAE80E .Ô`..á..âuï.v..v.¡%..P.Ò`..á..F. 000100
 5A3E8300 740008E2 3E8308F8 A308F708 F8A108E2 06FF0C70 0008F83E 830C5689 .V..>%..)...ã.Å%.%ÅÈ%..>ã..t..>Z 000120
 F2880A76 FF060A46 FF08EA06 FF2E752E 3F80260A 5EC40020 0A5A06C7 0675300A .Ou.ú.Z. .á^.&.?.u...ô..F...v.|· 000140
 EA0EFF00 0108F206 C70A7D00 08F23E83 0C56890A 468908C4 8308A5E8 0E501E08 ..P.ÒE..á..F..V..>·..).ú.·.....ô 000160
 08D206C7 0675006C 302B7400 683D4074 004E3030 74004630 98078A26 0A5EC408 .á^.&...=F.t==N.t@=h.t+=l.u.ú.@. 000180
 5CE91C75 003F8026 0A5EC40A 46FF0375 4C3F8026 0A5EC409 750008D2 3E830002 ...>@..u.á^.&.?Lu..F.á^.&.?.u.Õ\ 0001A0
 46899807 8A26C8E8 000808D2 06C7D0E8 00100802 06C7D8E8 00010802 06C79002 ..ú.@...$Aú.@...$Âú.@...$â&....F 0001C0
 78740069 30F84688 20F84683 080006FF 08750058 3D057400 47300A74 004530F8 %=E.t.=G.t.=X.u...Å..F% .F%=i.tx 0001E0

Dump of file SATURN:[PCCOMMON.DUMP.PBIN]FINDBND.EXE;1 on 18-APR-1990 10:54:53.17
File ID (381,21,0)   End of file block 28 / Allocated 28

Virtual block number 8 (00000008), 512 (0200) bytes

 3E839001 67E9014C E9037500 25300160 E9037E01 49E90375 00633001 9FE9037E -.Ò..=c.u.ÒI.-.Ò'.=%.u.ÒL.Òg...> 000000
 C42608E4 1EC40DEB 00000247 C7260789 2608EEA1 1FC42608 E41EC415 75020802 @..u.á.ô.&á.ÀY.&..&úG...$.á.ô.&á 000020
 01C8E903 740008EE 3E83017E E9037500 08F03E83 0408E406 8307B926 08EEA11F .ÀY.&....Ô...>Þ..u.Ô-..>Ÿ..t.Õù. 000040
 0A880000 08C806C7 08EC06FF 018AE9FF FF88018D E9037520 0A47F626 08CA1EC4 á.ò.&-G. u.Ô§.|..Ôo...&.ú.à...|. 000060
 06C708EA 06FF08D0 06FF08CE 06FF90F0 E8000888 90C1E802 C48301AC E80E5000 .P.Ò`..á.$è.|..$Þ...ö...Å...õ.ú. 000080
 F80639FA 468908D2 A3C0287E 74010802 3E830085 E9037508 08D23E83 000408F2 ·....>@..u.Ô...>@..t-+âÈ@..F*9.% 0000A0
 A10508F8 2E839090 13E80000 08F806C7 0A740008 E23E83FA 468908F8 A1287408 .t(À%..F*.>ã..t.ú.%...$.....%..À 0000C0
 0E50003A 8802C483 013AE80E 50001088 0208E406 8308F8A3 C028027D C00808F8 %..â).+âÈ%...ô..|..P.Ô:..á.|:.P. 0000E0
 0270C008 08F8A300 0520FA46 88157400 08E23E83 227400FA 7E8302C4 8304A1E8 ÒÀ..á..-*.t".>â..t..F*·..È%..â). 000100
 068302C4 8300F7E8 0E500010 880408E4 2E830000 08F806C7 9007E808 F8A3C028 +âÈ%.$..ú.%.....ô..|..P.Ò%..á... 000120
 0EF876FF 90F3E800 0188FF30 E90277E8 0E50C028 FF35E900 1088FF06 E90208E4 ô..Õ..|..Õ5.+âP.Òw.ÒO.|..$ø..v%. 000140
 30057C00 6530FEFE E9037500 643090FF 15E90436 E80E5000 2588FF20 E90355E8 ÒU.Õ .|%.P.Ò6.Õ...=d.u.Õ±±=e.|.= 000160
 5689FC46 89400C56 880A4688 0A4EFF0C 56880A46 88097400 08D23E83 D87E0067 g.-Ä.>@..t..F..V..N..F..V.@.F=.V 000180
 7400733D FED6E903 7500703D FED8E903 75006F3D FE72E903 75006E3D 903AE8FE ±$:.=n.u.Òr±=o.u.ÒÄ±=p.u.Òø±=s.t 0001A0
 FC5EC4FC 46FF9034 E80A46FF 9081E8FF 75E90375 00783DFE A8E90375 00753D88 .=u.u.Ò ±=x.u.Òu.$Ÿ..F.$4..F•á^• 0001C0
 C483045E E80E0A76 FF0C76FF 500A4628 C388EC75 253C0474 C00AF646 88078A26 &...F-.ât.<%uš.ù+F.P.v..v..Ò^..á 0001E0

Dump of file SATURN:[PCCOMMON.DUMP.PBIN]FINDBND.EXE;1 on 18-APR-1990 10:54:53.17
File ID (381,21,0)   End of file block 28 / Allocated 28

Virtual block numb.. 9 (00000009), 512 (0200) bytes

 CA1EC4FC 53E90374 C00AF646 88078A26 0A5EC40C 56890A46 89FE5688 FC468806 ..F•.V±.F..V.á^.&...F-.ât.ÕS•á.ò 000000
 740008EA 3E835657 12EC83EC 8855C850 E58808EE A1FE43E9 0374200A 47F62608 .&-G. t.ÕC±ÀY..[]ùU.$.$.WV.>õ..t 000020
 C4197510 08023E83 07740208 D23E8308 EC06FF04 740A067E 8300200A 5A06C706 .ú.Z. ..-..t...$..>@..t..>@..u.á 000040
 C4117400 08EC3E83 902CE804 08E40683 FE5689FC 46890257 88260788 2608E41E .Õ.&..&.W..F•.V±..Õ..$,..>$..t.á 000060
 0683FE56 89FC4689 99078826 08E41EC4 0EE80000 FE46C7FC 46890788 2608E41E .Õ.&...F•úF±..$.á.Õ.&....F•.V±.. 000080
 08F4A10A 58A3C028 9003E806 46880674 FE4608FC 46880E74 0008C83E 830208E4 Õ...>à..t..F•.F±t..F.$..+âÈX.Å¶. 0000A0
 F25EC410 750A067E 832B7D00 FE7E8331 750008EC 3E83F456 89F24689 08F61688 ..-..F·.V¶.>$..u1.-±.)+.-..u.á^· 0000C0
 E80001F6 46C7FE56 89FC4689 DAF70002 8308F7FE 5688FC46 882007C6 26F246FF .F·&6.-.F•.V±%Ä.@.%Õ.F•.V±úF-..$ 0000E0
 10031FA8 9AFC76FF FE76FF50 1E0676FF FA5E8CF8 468908D6 880000F6 46C79006 ..úF-..|@..F%.^*.v..P.v±.v•.´... 000100
 4E89C82B 08F20E88 04C48308 081F2A9A F876FFFA 76FF4574 0008EA3E 830AC483 .á..>õ..tE.v*.v%.*....á...·.+à.N 000120
 88473005 C62605EB F27EC4F0 4E880000 0A5806C7 0675080A 583E830D 7EC908F0 Þ.è-..>X..u.ú.X....NÞá-·$.&ó.0G. 000140
 88078A26 F85EC4F2 76C5EE5E 8C08000E 88F04E89 F4468CF2 7E89F47F C00849C1 èI.à.¶.-·.F¶.NÞ..Å..^Ÿév·á^%&... 000160
 83EE5E8E F45E8CF2 7689E375 003F8026 F846FF46 202C8003 7C613C07 74C90804 ..èt.<a|.., F.F%&.?.uD.v·.^¶.^Ÿ. 000180
 11E80E50 C02802EB C'018805 7500F67E 83087408 E8060808 04A11475 0008EC3E >$..u.Àâ...Ò.t..--.u.|..$.+âP.Ò. 0001A0
 16880BE4 A10001BE 18740006 7E835657 10EC83EC 8855C85D E5885F5E 02C48303 ..á.^_.[]ùU.$.$.WV,-..t.ƒ..Àõ... 0001C0
 88260788 2608E41E C'137408 08023E83 008FE902 08E40683 FA5689F8 468908E6 |..F%.V*..Ò..Ò...>@..t.á.Ò.&..&. 0001E0
```

```
Dump of file SATURN:[PCCOMMON.DUMP.PBIN]FINDBND.EXE;1 on 18-APR-1990 10:54:53.17
File ID (381,21,0)   End of file block 28 / Allocated 28

Virtual block number 10 (0000000A), 512 (0200) bytes

 830408E4 0683FA5E 8CF84689 FC468907 882608E4 1EC410EB FA5689F8 46890257 W..F%.V°$.á.ò.&...F=.F%.^°..ò... 000000
 F8468906 CDB80975 00FC7E83 900AE806 C6881575 FA4608F8 46880E74 0808023E >ø..t..F%.F°u.¡ó.$...-=.u.¡ë..F% 000020
 5EC4900E EB08F20E 881C7408 EA3639F6 28F45689 F24689FA 5688F846 88FA5E8C .^°.F%.V°.F·.V¶+-96ö.t....$..á^ 000040
 88F37500 3F8026F2 46FFF25E C44690ED EB107ECE 38461574 003F8026 F246FFF2 ·.F·&.?.t.F;ö-.$Ü.Fá^·.F·&.?.uæ. 000060
 8301BDE8 0EF876FF FA76FF56 02C48301 5FEB0E57 08750008 E23E83FE 2808F83E >%.+±.>ä..u.W.ò_..á.V.v°.v%.ò§.. 000080
 E4A106EC 83EC8855 90CB5DE5 885F5E02 C4830142 EB0E5708 740008E2 3E8306C4 á..>ä..t.W.ò8..Ã.^_.|]ù.U.å.å.Àô 0000A0
 4688C02A 9003E801 80057547 067E8306 7467067E 83FE5689 FC468908 E6168808 ...|..F=.V±.-.gt..~.Gu.¯.$..*á.F 0000C0
 0108F206 C7067500 08F23E83 007400FA 7E800006 08F206C7 06750008 EA3E83FA °.>ö..u.ú.·....-°.t..>·..u.ú.·.. 0000E0
 FF260750 068EFC76 FFFE76FF 08F436FF 08F636FF 0676FF08 F236FF08 0036FF00 ..6Å..6·..v..6-..6¶..v±.v=..P.&. 000100
 26075006 8E08F436 FF08F636 FF147500 08C83E83 187400FA 7E800EC4 8306FC1E .=..á..-°.t..>à..u..6-..6¶...P.& 000120
 50068E08 F436FF08 F636FF14 750008F2 3E831874 0008C83E 8304C483 07001EFF .....á..>à..t..>·..u..6-..6¶...P 000140
 FE76FF1B 7408E806 0B08D4A1 00000A58 06C70808 E4068304 C4830708 1EFF2607 .&.....á...ò..ú.X...Àå...ò.t..v± 000160
 880133E8 0E50C02B 02EB0001 880574C0 0804C483 070C1EFF 26075006 8EFC76FF .v=..P.&.....á..ât.¡..$.+äP.ò3.. 000180
 26378826 06468A15 78044FFF 2608CA1E C4307500 08F03E83 56EC8855 90CB5DE5 |]ù.U.šV.>Þ..u=á.ò.&.O.x..F.&.7& 0001A0
 754006C4 8312E707 EC9A0676 FF5308CC 36FF9011 EBE42A04 88260247 8E2607FF ..&.G.&..*ò$...6ä.S.v..š.Ó..á.âu 0001C0
 88577500 08F03E83 565702EC 83EC8855 90CB5D5E 08EE06FF 9005EB08 F006FF07 ...Þ.$....Ÿ.^]ù.U.š.š.WV.>Þ..uW. 0001E0
```

```
Dump of file SATURN:[PCCOMMON.DUMP.PBIN]FINDBND.EXE;1 on 18-APR-1990 10:54:53.17
File ID (381,21,0)   End of file block 28 / Allocated 28

Virtual block number 11 (0000000B), 512 (0200) bytes

 FF047540 06C48313 5307EC9A 0A5A36FF 08CA36FF 08CC36FF 18EB507E F6080676 v..--P$..6ä..6ò..6Z..š.S..á.âu.. 000000
 478E2607 FF263F88 260A5AA0 0478044F FF2608CA 1EC41E7E C0084EC6 8808F006 .Þ..óN.â-.á.ò.&.O.xå.Z.&.?&..&.G 000020
 83EC8855 CB5DE588 5F5E08EE 06010646 88077500 08F03E83 D4EBE42A 05882602 .&..*ó$å.>Þ..u..F...Ÿ.^_.|]ùW.š. 000040
 5098078A 26065EC4 08CA36FF 08CC36FF 22EB5E75 0008F03E 830A7688 565702EC å.WV.v..>Þ..u^$".6ä..6ò¯á^.&...P 000060
 4FFF2608 CA1EC425 74C0084E C6880646 FF08F006 FF047540 06C48313 C907EC9A .š.è..á.âu...Þ..F..óN.â±Xá.ò.&.O 000080
 3E83CAE8 E42A0588 2602478E 2607FF26 3F882608 CA1EC407 8A26065E C4CD7804 .xeá^.&..á.ò.&.?&..&.G.&..*ó$ò.> 0000A0
 08F61688 08F4A154 0CEC83EC 8855CB5D E5885F5E 08EE0601 0A468807 750008F0 Þ..u..F...Ÿ.^_.|]ùW.š.š.VÀ¶...-. 0000C0
 468904C4 830FEE1 2A9AF476 FF5208F8 3688FA46 89FC4689 C028F656 89F44689 .F¶.V-+â.F=.F¯.6%.R.v¶.*.Ÿ..á..F 0000E0
 750008E2 3E834E01 75080A58 3E8308EB 02EE8305 75100A58 3E830676 28F028F8 %+Þ+v..>X..u..Ÿ.Š..>X..u.N.>ä..u 000100
 02C483FE 67E80E50 98078A26 F446FF12 75300A5A 3E831975 203F8026 F45EC422 "á^¶&.?·u..>Z.0u..F¶&...P.Òg±.á. 000120
 E80EFA46 FF077400 067E831B 740008E2 3E83077E F6080874 300A5A3E 83F84EFF .N%.>2.0t..--..>ä..t..-..t..F°.Ò 000140
 8302C483 FE74E80E 56297500 08E23E83 0072E80E FC46FF07 74000A58 3E830068 h..>X..t..F=.Òr..>ä..u)V.Òt±.á.. 000160
 0042E80E 04750OFC 7E830A74 000A583E 83003BE8 0E047500 FA7E830A 7400067E -..t..-°.u..Ò;..>X..t..-=.u..ÒB. 000180
 E80E5600 200A5A06 C70E7400 08E23E83 06C483FE AFE80EF4 76FFF676 FFF876FF .V%.v-.v¶.Ò£±.á..>ä..t.ú.Z. .V.Ò 0001A0
 C483FDC6 E80E5000 208803EB 00288805 74000804 3E83C85D E5885E02 C483FE2E .±.á.^.|]ù.>å..t.¡+.Š.¡ .P.Òó».á 0001C0
 03EB0058 88057400 08D03E83 1775100A 583E8302 C483FD8A E80E5000 3088C802 .ù¡0.P.Òn».á..>X..u..>Å..t.¡X.Š. 0001E0
```

```
Dump of file SATURN:[PCCOMMON.DUMP.PBIN]FINDBND.EXE;1 on 18-APR-1990 10:54:53.17
File ID (381,21,0)   End of file block 28 / Allocated 28

Virtual block number 12 (0000000C), 512 (0200) bytes

 2A3F8026 0A5EC400 01FE46C7 565706EC 83EC8855 CB02C483 FD9CE80E 50007888 ¡x.P.Ò.».á.ùW.š.š.WVúF±..á^.&.?* 000000
 FE46C708 752D3F80 260A5EC4 9061EB0A 46FF0208 E4068337 882608E4 1EC41275 u.á.ò.&.7..ò...F.Šø.á^.&.?-u.úF± 000020
 303C0A75 08EA3639 3C7F393C 407C303C FA468807 8A260A5E 88F6280A 46FFFFFF ...F.+-.^.&...F°<0|â<9.<96ö.u.<0 000040
 E101CE03 E1D1E1D1 CE889805 8A261C7F 39308026 06E8F888 00300A5A 06C70675 u.ú.2.0..«Š.&.=9..&....öIÀIÀ.öIÀ 000060
 8926065E C4F088EE F7FE4688 0C468C0A 7E89DE7D 30308026 47F18830 E983C803 .à.Ò0.þG&.=0)8.-..F..F±¥Ÿ.Þá^.&. 000080
 4E8AFE5E 8CFC4689 06048857 04EC83EC 885590C8 5DE5885F 5E0C5688 0A468837 7.F..V.^_.|]ù.U.š.š.W¡å..F=.^±.N 0000A0
 7E899009 EBFE468C FC7E8900 018BF475 00382611 74003D80 264701EB FC7EC406 .á-=Š.G&¯=.t.&8.u¶|...-=.F±Š...- 0000C0
 FC5689FA 468904F5 168804F3 A15606EC 83EC8855 90C85DE5 885FC028 FE468CFC =.F±+á_.|]ù.U.š.š.VÀµ...%..F°.V= 0000E0
 909006EB F08804C4 83160A1F 2A9A0676 FF0876FF 6E740846 08064688 7674C208 .òtv.F¯.F.tn.v..v..*....á..ÞŠ... 000100
 3B04C483 16331F2A 9A37FF26 0277FF26 4A740247 08260788 26FA5EC4 04FA4683 .F°.á^°&..&.G.tJ&.w.&.7.*.3..á.; 000120
 37FF2602 77FF26FA 5EC40676 FF0876FF 56017530 3880261F C426FA5E C4DD7EC6 6-ìá^°&á.&.8=uïV.v..v.á^°&.w.&.7 000140
 E5885E99 C0289004 E8C28C01 40801FC4 26FA5EC4 8475C008 0AC48312 A91F6C9A .l.`..á..âuÇá^°&á..ə..ôŠ..+â.^.ï 000160
 805016F2 46800876 FF0A76FF 168319F8 9A0014B8 088E1EEC 88554590 581ECB5D ]ù.X.EU.š..Ä¡...%....v..v..F·.P. 000180
 73E9FFFF 88077540 14C48316 9F20C29A 0C76FF0E 76FF1076 FF1276FF 5016EE46 FŸ.P.v..v..v..v..ò ...á.âu.¡..Òs 0001A0
 76FF5000 2F88FC56 89FA4689 06C48316 8720369A 0876FF0A 76FF5000 5C889001 ..¡\.P.v..v..6 ñ..á..F°.V=¡/.P.v 0001C0
 46882775 FC4608FA 46881075 C208F856 89F64689 06C48317 0220369A 0876FF0A ..v..6 ...á..F-.V%.ôu..F°.F=u'.F 0001E0
```

```
Dump of file SATURN:[PCCOMMON.DUMP.PBIN]FINDBNO.EXE;1 on 18-APR-1990 10:54:53.17
File ID (381,21,0)   End of file block 28 / Allocated 28

Virtual block number 13 (0000000D), 512 (0200) bytes

 89F85688 F646880C 76F64639 FC568BFA 46880874 FC460BFA 468819E8 0A568808 ..V.Š..F*.F•t..F*.V•9F-v..F-.V%. 000000
 76FFF476 FF2374u0 0806C483 17231FD6 9AFA76FF FC76FF50 002EB8FC 5689FA46 F*.V•¡..P.v•.v*.ø.#..á..Åt#.v¶.v 000020
 76FF0087 E9EC4689 0EC48317 37242E9A 0676FF08 76FF0A76 FFEE76FF F076FFF2 ·.vÞ.vŸ.v..v..v...$7..á..F$Õñ..v 000040
 0008FC56 89FA4689 02C48317 691DC99A 50000505 04C48317 431F2A9A 0876FF0A ..v..*.C..á....P.è.i..á..F*.V•.À 000060
 DA8808C4 83177C1E CA9AFA76 FFFC76FF 0876FF0A 76FF0088 E9FFFFEC 46C70875 u.úFå..Ö...v..v..v•.v*.ò.|..á.¡Ö 000080
 8317A819 8C9AFA76 FFFC76FF 50C02808 C48317BD 1E849AFA 76FFFC76 FF501E06 ..P.v•.v*......á.+âP.v•.v*.¥.`.. 0000A0
 9A505206 C48317B2 20369AFA 76FFFC76 FF50002E B8501E06 DF882174 C00B06C4 á..åt|¡Ö..P¡..P.v•.v*.6 ý..á.RP. 0000C0
 E0242E9A 0676FFFA 76FFFC76 FFEE76FF F076FFF2 76FFF476 FF08C483 17CF1ECA ò.ü..á..v¶.v·.vÞ.vŸ.v•.v*.v...$À 0000E0
 17FC1D84 9AEE76FF F076FF04 C48317EE 1DB49AFA 76FFFC76 FFEC4689 0EC48317 ..á..F$.v•.v*.Ç.Ÿ..á..vÞ.vŸ.Ç.•. 000100
 581E90CB 4D501FE5 8802ED83 EC468804 C48315E5 10849AF2 76FFF476 FF04C483 .á..v¶.v·.Ç.|..á..F$.Ú..|.]Mù..X 000120
 76FFFF72 968CFF70 8689FF20 86805657 184619F8 9A00E488 D88E1EEC 88554590 .EU.å..Ã¡ð..%.F.WV.. ...p...r..v 000140
 40FF7886 890EC483 18851652 9A0676FF 0876FF0A 76FF0C76 FF0E76FF 1076FF12 ..v..v..v..v..v..v..R....á...x.@ 000160
 5C3C2874 2F3CFF1E 8688078A 26085EC4 36750004 8A3E8307 7402048A 3E834475 uD.>¤..t..>¤..uóá^.å......</t(<\ 000180
 9689FF7A 868904C4 8318B315 8C9A501E 06E48819 743A017F 80260774 C00A2474 t$.åt.å...:t.¡ð..P.¥.*..á...z... 0001A0
 5016FF7E 868DFF7A B6FFFF7C 86FF5000 7F889001 13E9FF78 86880875 D00BFF7C |..Åu...x.Ö...¡..P.Ñ|..Ñz...-..P 0001C0
 FF70B6C5 FF1C9E8C 7F7A8EC4 00FD46C6 FF7C9689 FF7A8689 0AC48319 3C1F429A .B.<..á...z...|.óF».å/z.....éÑp. 0001E0

Dump of file SATURN.[PCCOMMON.DUMP.PBIN]FINDBNO.EXE;1 on 18-APR-1990 10:54:53.17
File ID (381,21,0)   End of file block 28 / Allocated 28

Virtual block number 14 (0000000E), 512 (0200) bytes

 1C9E8EFF 729E8CFF 70B689ED 75003080 26464704 88058A26 00743B30 802600E8 Š.å.=;t.å....GFå.=.uÙ.Ñp...r.... 000000
 89FF7486 89C28CFF 708688FF 708EFF00 07C626FF 709EC4FF 7C868CFF 7ABE89FF ../z...|.á.p.åó....p...p..ö..t.. 000020
 B812742F 3F802618 745C3F80 26FF749E C4FF7296 8CFF7086 89FF2086 80FF7696 .v... ...p...r.á.t.å.?\t.å.?/t.¡ 000040
 9AFF7086 FFFF7286 FF0876FF 0A76FF08 C4831952 1E849AFF 7086FF16 501E06E9 Ö..P..Ñp....R..á..v..v..Ñr..Ñp.. 000060
 529A0676 FFFF7086 FFFF7286 FF0C76FF 0E76FF10 76FF1276 FF08C483 19711E84 ..q..á..v..v..v..v..Ñr..Ñp..v..R 000080
 05E90374 0004BA3E 830A7402 04BA3E83 FF16E903 7440FF78 86890EC4 83166216 .b..á...x.ât.Ö...>¤..t..>¤..t.Ö. 0000A0
 FEE6E9FF 17E90374 D008FF7A 86FFC28C C388FEF8 E9037500 3F8026FF 7A9EC4FF .á.z.å.?.u.Ö½±.ü.ö..z..Åt.Ö..Öl± 0000C0
 50C03350 FE468D16 0676FF08 76FF02EC 83EC8855 90C84D50 1FE58802 ED835F5E ^_.Ù..|.]Mù.U.š.š..v..v...F±P3áP 0000E0
 0078E900 05B80000 8A0C7400 01FE46F7 1374020A 46F61675 C00B0000 FFFF9A50 P.......åu.-F..t.%F±..t.¤..¡..Öx. 000100
 06F4A151 52C85152 E3880572 06F81E3B 08720828 DC885A59 00CB50E5 880084E9 Ö...|)ù.YZ.É+Ár.;.%.r..DRQùRQÀ¶. 000120
 070A0C09 0C080C07 09060005 18040203 02021601 06F42EFF E712E9C0 33057540 @u.3âÕ.Ö..¶..................... 000140
 206000D6C 08590057 00530052 02430041 02350212 12110010 120F1600 160C0808 ..............S.A.C.R.S.W.Y.l.m 000160
 B8048A16 8904C1A3 16080000 080702CE 0BA40084 09820A81 0A801606 09721C70 p.r...........É.o.■.....Èè...¤.¡ 000180
 2E1875E4 0A002489 1A1CB804 C1A3C850 E58899FF FFB80008 E8C85DE5 8899FFFF ....|)ùÐ..¡....|)ùÉè.£..¿$..ðu.. 0001A0
 A3980147 8A2E4301 76CA3C04 728C3C43 0A76243C 0472133C F7E24343 1674073A :.t.CCã¼<.r.<$v.C<¥r.<òv.C..G..È 0001C0
 C103E0D1 C888F9F7 000CB999 05522004 468806FA 06FF04EC 83EC8855 00C3048A ¤.û.U.š.š...*..F.-R..¿..X*.àÌÀ.è 0001E0

Dump of file SATURN:[PCCOMMON.DUMP.PBIN]FINDBNO.EXE;1 on 18-APR-1990 10:54:53.17
File ID (381,21,0)   End of file block 28 / Allocated 28

Virtual block number 15 (0000000F), 512 (0200) bytes

 89260647 8926045E C402C483 2C141DC9 9A500200 88FE5E8C FC468906 4205E001 ìÀ.B..F•.^±|..P.è...,.á.á^.å.G.å. 000000
 4688040A 4F802604 5EC420E8 02000247 C726FC5E C4080A4F 80261074 D00B0857 W..Åt.å.O..á^•åúG...Š á^.å.O...F 000020
 57882606 47882604 5EC40001 0247C726 FC5EC408 57892606 47892640 FE5..38FC •.V±@å.G.å.W.á^•åúG...á^.å.G.å.W 000040
 8A26065E C4F62856 04EC83EC 8855C35D E5880000 0447C726 02578926 0789..608 .å..å.W.åúG....|)ùU.š.š.V+-á^.å. 000060
 0803E301 D888F9F7 000CB999 05522DC3 881A7508 0A47F626 5A75023C 03240A47 G.$.<.u2å-G..u..û-R..¿..%*.ÃÌD.À 000080
 260877FF 2650287E C008FC46 89064728 26078826 065E8839 74010642 87F6E301 ÌD-.B..t9.^.å..å+G..F•.á-(På.w.å 0000A0
 8E200A4F 8026065E C40874FC 463808C4 831AE21C 109A50E4 2A08478A 260677FF .w.å.G.*ðP...â..á.;F•t.á^.å.O. / 0000C0
 50E5885E C6880000 0447C726 02578926 07892608 57882606 47882606 5EC4FFFF ..á^.å.G.å.W.å..å.W.åúG....ó^.|} 0000E0
 FF53CC88 04EC83FE 8EE9FE82 E9C03300 098A0872 04C31E38 065E88EC 885590C8 ù.U.š.^.;.û.r.¤..3âÕ.±Ö.±.š..äS. 000100
 00CB50E5 88F004C5 A78091E1 75C0855A 590000FF FF9A5116 0C76FF08 76FF0A76 v..v..v..Q.....¥Z.àuÃ..Ìé.».|)ù. 000120
 33531274 2004C587 F6FE41E9 C0330009 8A087204 C31E3806 5E880CEC 83EC8855 U.š.š..^.;.û.r.¤..3âÕA±-.é. t.S3 000140
 0856C50A 468EFA5E 8C7D7480 04C587F6 00001BFB 9A5016F4 46805141 415151C9 èQQAAQ.F¶.P.«...-.é..t)._^*.F.éV. 000160
 5E8E1E52 75AEF20A 8060E30C 4E88F866 89F288FA 885657FC FC4689FE 4689C033 3á.F±.F••VV.*.·.f%.N.D'¯.·ÙuR..^ 000180
 D488E228 00808A03 73022830 0200BADC 8802EC83 1F4E7600 A83D189D 25469AFA *.FX..=´.vN..š..É¤..=(.s.¤..+ã.å 0001A0
 E80375F8 38008000 9AE90028 E8F4E2AA 1A74FB38 00740A3C AC0C4E88 0716FA88 .*...N.¯<.t.;«t.´ã¶Ó+.Ö..¯.;«u.Ö 0001C0
 7419F89A FFFC887A E80093E9 FA5E8E5F 5EE1E800 14E8E2EB FC46FF0A 80AA001F ..^¯..F•ŠãÖ..ŠÃ^_.^*Ö..Šz¡•..%.t 0001E0
```

Dump of file SATURN:[PCCOMMON.DUMP.PBIN]FINDBND.EXE;1 on 18-APR-1990 10:54:53.17
File ID (381,21,0)   End of file block 28 / Allocated 28

Virtual block number 16 (00000010), 512 (0200) bytes

```
C0080000 079E9A50 16F4468D 51521E53 065E881F E3CA2BCF 881F061E 5153501C .PSQ....ü+òD..^.S.RQ.F¶.P......å 000000
0074006D 301874C0 0808C483 1FC3FA88 5858591F 07740808 FE5E01F4 5E881175 u..^¶.^±.Ut..Y[X.ªü..á..åt.=m.t. 000020
0A5E8E0E 74400-C5 87F6FE5E 8E26E8F9 00208A03 E8001CBA 08750009 8A000130 *..¤..u.¤..$.¤ .ª$£.^±-.é.ät..^. 000040
5E8E5F5E F8668BFC 4628FE46 8806E8F9 C033001C 8A0EE8F8 03751A3F 80085E88 .^..?.u.½$.¤..3à¹$..F±+F•.f½^_.^ 000060
F4468051 521E5308 56C51EEE E8C18804 75C9080C 4E88FD0E E9C850E5 880472FA ªr..[]üÒ.».N..èu..é$Y.éV.S.RQ.F¶ 000080
C7E8001C 8ACC7500 098A0001 30007400 60301774 C0081F07 1E00001C EA9A5016 .P.ð.......åt.=m.t.*..¤..uäo..$ü 0000A0
001CBAA6 E802751A 3F80260A 880A7440 04C587F6 8775C008 F4468BC2 E800208A ¤ .$ò.F¶.åuñ-.é.ät..Ò&.?.u.$l¤.. 0000C0
5602EC83 EC8855C8 5DE58801 FE4F8026 0574C308 C08C065E C4EC8855 A3E8C033 3à$ÈU.&á^..à.ût.&.O±..[]üU.&.&.V 0000E0
0018E815 750082E8 0734A312 740025E8 08750007 343E831E 73FFF130 06468857 W.F.=þ.s..>4..u.Ò%.t.É4.Ò..u.Ò.. 000100
0776065E 3900F088 C850E588 5E5F02C4 831CCF25 6C9A0676 FF087500 78E80574 t.Òx.u..v..[%ü..á._^.[]üÈÞ.9^.v. 000120
FA8308C4 831DFD27 169A5002 80510E4F 8D50501E C033FE5E 89FEE383 43065E88 .^.C.D±.^±3à.PP.O.Õ¯.P..'».á..ª 000140
480008A3 C033D88E FE5E8800 08A30A8E 0574020B 0738A307 361687C2 883874FF .t8.ô..6.È8..ºt..OÈ...^±.Ä3àÈ..H 000160
8ED88CC3 1FD88C00 06A30000 05000AA3 01478000 02A30000 A3000A88 0C478948 H.G.¡..È..È...G.È.....È...Ä.û.Ä. 000180
33067EC4 1EDE8807 88EC8855 C3098EC1 8C020807 38E80738 1E8ED833 064E88C0 à.N.3Ü..8.Ò8..º.è.]üU.$.¤.B.á-.3 0001A0
4688FE87 08468E08 8EC08CF9 28D1F7AE F2FFFFB9 0A7EC4FF 7580AEF2 FFFFB9C0 à¿.. Û.u.á~.¿.. ÛÄ]+ª.à.Á.F..±.F 0001C0
88D788EC 8855C850 C28C1FFA 88F388A4 F3C913A5 F3E90149 A4027400 01C6F706 .¼ó..t.È]]ÕµÈ.èµÈ.µ.ª..ô]üU.$.¤. 0001E0
```

Dump of file SATURN:[PCCOMMON.DUMP.PBIN]FINDBND.EXE;1 on 18-APR-1990 10:54:53.17
File ID (381,21,0)   End of file block 28 / Allocated 28

Virtual block number 17 (00000011), 512 (0200) bytes

```
D149A402 7401A8C7 88067EC4 D1F7AEF2 FFFFB9C0 33C08ED8 8CFE880A 76C51EDE º.év..±.Ä.à3à¿.. ÛÄ]á-..ú´.t.È]] 000000
C0330A7E C40676C5 1EDE8807 88EC8855 CB5DC28C 1FFA88F3 88A4F3C9 13A5F3E9 ÕµÈ.èµÈ.µ.ª..ô]üU.&.¤.B.év.á~.3à 000020
C4D788EC 885500CB 5DFA88F3 881FFFFF 1DC01805 74A6F3F9 28D1F7AE F2FFFFB9 ¿.. ÛÄ]+ªµ]t..á.....µ.ª]ù.U.&.¤á 000040
DF880A76 C5067EC4 1E5657EC 885500CB 5DFA8891 49D1F7AE F2FFFFB9 C033067E -.3à¿.. ÛÄ]]..ª]ù.U.$WV.á~.év..Ò 000060
57EC8855 CB5DE588 5F5E1FC2 8CC388AA F3C032F8 E2AA0374 C00AAC0C E30E4E88 .N.D.¯.åt.¯à½2àµ´.ú.ò.^_.[]üU.$W 000080
FF448AA6 F30A76C5 FE88C803 D9F7AEF2 C033F788 067EC4D9 8827E30E 4E881E56 V..N.D'.]á-..X3à ÛÄ].ù.±év.µ].D. 0000A0
E9008357 56EC8855 00C850E5 885F5E1F C1880 1F7 49490474 0477FF45 3A26C933 3è&:E.w.t.]]X].è.^_.[]ù.U.$VW*.Ò 0000C0
3302E800 01880574 4004C587 F60C7C00 F883117D 04C31E38 065E88EC 8855081A ..U.$.^.;.ú.)..«.|.-.é.åt.¡..$.3 0000E0
AEF2F888 0A468AD9 F741AEF2 FFFFB9C0 330F8806 7EC457EC 885500C8 5DE588C0 à.[]ù.U.$Wá-..Ò3à¿.. ÛAX].F..« Ü 000100
1F2A9A57 06067EC4 57EC8855 00C85DE5 885FC28C C788C78E FF330474 0538264F O&8.t.3..ú.ú.ó_.[]ù.U.$Wá-..W.*. 000120
C4832017 1ECA9A50 520AE804 C4830575 D2080975 C0085820 1010C99A 50401E29 ).åP.è.. [.åu.¯ºu..á.$.RP.ò.. .á 000140
2647AEF2 F00A468A 4FU9F741 AEF2FFFF 89C03306 7EC457EC 8855C850 E5885F08 ._.[]üU.$Wá-.3à¿.. ÛAX1O.F.» ÛG& 000160
0A76C51E 575620EC 83EC8855 CB5DE588 5FFCC28C C78804E8 D088C033 06, 0538 8_t.3à.Å$..ú.ò•_.[]üU.$_$ VW.év. 000180
0381E002 07E18001 80C888F8 881474C0 0AACABF3 E07E8DC0 33001089 C08L 08C .Å.à¿..3à.-Äµ ¯.åt..½.à¯..Å.ºÁY. 0001A0
D303B1E0 0207E180 0180C888 F8881974 00FF25AC D2330676 C5E7E8E0 4308E/D3 Æy.CÅ$Òév.3º¯%..t..½.à¯..Å.ºÁY.Æ 0001C0
0C46080A 46885657 0EECB3EC 8855C85D E5885E5F 1FDA8CFF 4480E674 E04322EF y"CÅt].D..O._^.[]üU.$.$.WV.F..F. 0001E0
```

Dump of file SATURN:[PCCOMMON.DUMP.PBIN]FINDBND.EXE;1 on 18-APR-1990 10:54:53.17
File ID (381,21,0)   End of file block 28 / Allocated 28

Virtual block number 18 (00000012), 512 (0200) bytes

```
19E80002 8EFA5689 F8468908 56880646 880C5689 0A468904 F5168804 F3A10075 u.Åµ...%..F..V..F..V..F½.Vª/..$. 000000
26078826 F85EC4F0 034004C4 8321421F 2A9A37FF 260277FF 2604F846 83F85EC4 á^½.F½.&.w.&.7.*.B].á.ä.Þá^½&..& 000020
07892602 478926C0 28125EC4 1A727FFF FE81F676 89D5767F FFFE8106 7402470B .G.t..±..v].v-.±..r.á^.+à&.G.&.. 000040
57892607 89260E5E C402C483 21971DC9 9A562FEB 000A04C1 06C70007 04BA06C7 ú.¤...ú.è...$/V.è..].á.á^.&..&.W 000060
FFFF8800 0804C106 C7000C04 8A06C707 89260247 8926C02B 125EC41F 75D00802 ..Åu.á^.+à&.G.&..ú.¤...ú.è...¡.. 000080
77FF2604 F84683F8 5EC4901A E80002BE FA5689F8 46890C56 880A4688 900285E9 Òç...F..V..F½.Vª/..$..á^½.F½.&.w 0000A0
767FFFFE 81067402 47082607 8826F85E C4F00340 04C48321 E81F2A9A 37FF2602 .&.7.*.$].á.ä.Þá^½&..&.G.t..±..v 0000C0
127400FE 7E83FE7E 89F6754F 03750004 C48080F8 880F74C0 08FE4689 04C3A1D5 ]Åü..F±.åt..½.$á..u.Ou-.-±.~±.t. 0000E0
04C48322 0F1F2A9A 1676FF18 76FFFE76 03037400 04C03E80 F003000E 05FE4688 .F±....Þ.>à..t..v±.v..v..*..".á. 000100
1E1DB49A 37FF2602 77FF260E 5EC41876 7FFE3D05 75D20802 13C60302 2BF64603 .F-+º.ó.º.ºu.*±.v.á^.&.w.&.7.Ç.. 000120
75D00802 57892607 8926125E C402C483 223E1DC9 9A56FF00 E90E5EC4 04C48322 ".á.á^.Ò..V.è.>".á.á^.&..&.W..Åu 000140
0788260E 5EC490FF 0FE90E5E C404C483 22821D84 9A37FF26 0277FF26 0E5EC419 .á^.&.w.&.7.Ç..".á.á^.Ò...á^.&.. 000160
02470826 078826F8 5EC4FA56 89F84689 08568806 4688F456 89F24689 02578826 &.W..F .V¶.F..V..F½.Vªá^½&..&.G. 000180
FF2604F8 4683F85E C408C483 22981ECA 9AF276FF F476FF37 FF260277 FF266A74 tj&.w.&.7.v¶.v .ò..".á.á^½.F½.&. 0001A0
76FF37FF 260277FF 26F85EC4 903CE8F2 46014004 C48322B7 1F2A9A37 FF260277 w.&.7.*.ñ".á.ä.F $<.á^½&.w.&.7.v 0001C0
8323451F 2A9A37FF 260277FF 2604F846 83F85EC4 08C48322 CD1ECA9A F276FFF4 ¶.v .ò.ë".á.á^½.F½.&.w.&.7.*.E#. 0001E0
```

```
Dump of file SATURN:[PCCOMMON.DUMP.PBIN]FINDBND.EXE;1 on 18-APR-1990 10:54:53.17
File ID (381,21,0)   End of file block 28 / Allocated 28

Virtual block number 19 (00000013), 512 (0200) bytes

C02AF25E C4B97502 47082607 8826F85E C4F246FF 2007C626 F25EC4F2 460104C4 &..F.&^.&6. .F.&^%&..&.G.u&^.*& 000000
FB46890C 56880A46 88F45689 F2468902 57882607 8826125E C4078826 FF478826 &.G.&..&^.&..&.W..F..V¶.F..V..F% 000020
E80007C6 26F246FF F25EC43F 7500FE7E 83457502 47082607 8826F85E C4FA5689 .V*&^%&..&.G.u£.-±.u?&^..F.&6..$ 000040
F84683F8 5EC408C4 83435B1E CA9AF276 FFF476FF 37FF2602 77FF26F8 5EC49033 3.&^%&.w.&.7.v¶.v..ò.(#.&.&^%.F% 000060
C2750247 08260788 26F85EC4 F2460140 04C48323 871F2A9A 37FF2602 7..?604 .&.w.&.7.*..#.&.@.F.&^%&..&.G.uò 000080
1E049CB8 08C48323 941ECA9A F276FFF4 76FF501E 049CB800 A6E90375 00FE.E83 .-±.u.Ò1.¡...P.v¶.v..ò..#.&.¡... 0000A0
819804C5 848A1EEB F27EC4F6 28377400 04C03E80 F2460104 C483202C 1F2A9.50 P.*., .&..F..>&..t7+-&-.$...&..Ÿ 0000C0
C008FE4E FFFE4688 46470588 2641040F 2404C584 8A470588 2641040F 24F8D304 .£%$..A&..G..&.$..A&..GF.F±.N±.& 0000E0
07EBF27E 88FE4E88 F6280788 26FE468A F246FFF2 5EC438EB F4468CF2 7E890875 uÂ.-..F¶$;&^..F..F±&..+-.N±.-.$. 000100
8CF27E89 90E7E804 C5848AEB 740004C5 8C800E74 C00849C1 88464705 8826FF80 ¯.&..GF.él.ât..¥é..t$..&.$Ó..-.. 000120
8855CB50 E5885F5E C0280007 C626F25E C40007C6 26F246FF F25E88FE 4E89F446 F¶.N±.^..F.&6..&^.&6..+&^_.[]ùW. 000140
003DD233 0646886F 75C00806 C4832101 198C9A08 76FF0A76 FF50C033 04EC83EC $.$.3&P.v..v..¥..l.&..&uo.F.3@=. 000160
5050C033 F5FCE9C0 3300168A 08740001 30420E74 00033013 74000230 42197400 .t.B=..t.*..t.B=..t.o..3&Ò•%3&PP 000180
9A000104 FB06C708 76FF0A76 FF5016FC 468D1076 FF1276FF 0C76FF0E 76FF5250 PR.v..v..v..v..F•.P.v..v.ú.«.... 0001A0
067E83FC 468BF5CD E90374C0 0B0380E9 03750206 7E830000 04FB06C7 0000FFFF ....ú.«....~..u.Ö...ât.Öe%.F•.-. 0001C0
000AB818 75000718 3E8008BE 0989B81E 56EC8855 CB5DE588 FE468AE0 8A057500 .u..Â.F±.[]ùW.$V.¡...Â.>...u.¡.. 0001E0

Dump of file SATURN:[PCCOMMON.DUMP.PBIN]FINDBND.EXE;1 on 18-APR-1990 10:54:53.17
File ID (381,21,0)   End of file block 28 / Allocated 28

Virtual block number 20 (00000014), 512 (0200) bytes

74C085AD FC07198E 06568801 071806C6 0000FFFF 9A500719 881E5007 25881E50 P.¡%.P.¡..P.....6.....V./..•Ù.ât 000000
8CFA4689 05528856 06EC83EC 8855CB50 E5885E1F 000188F3 77D43AF7 72D03A08 .:Âr%:&w¡...^.[]ùW.&.&.V¡R..F*. 000020
46834601 744004C4 83244018 429A5306 0E74830A 47F626FA 5EC41CEB F628FC5E ^•+-$.&^*&-G..t..S.@.a$.&.at.F.F 000040
280773C4 3B06F8A1 5A5990CB 5DE5885E C6880876 FA463906 8C168806 BAA10CFA *.Ào...¥.9F*vÀ.6^.[]ù.YZÀ%.;&s.+ 000060
56EC8855 CB5DE588 01FE4F80 04740808 065E88EC 8855F9E8 C033C851 52D8F7C4 &%ÄRQù3&$*U.$.^..Üt..O±..[]ùW.&V 000080
2CA3072A A3FE2440 24E899C0 33057501 73E80005 88071E29 75003F83 072A8857 WE*..7.u)..¡..Òs.u.3&.$$a$±E*.È 0000A0
E5885E5F 0009E8C0 8ED88C06 4E880730 3689FFFE FE44C704 C6830001 04C79607 ..ú....6.ùD±±..60..N..Â.&Ò.._^.| 0000C0
1573C138 48427401 A8FE88AD FC027788 F273EEF9 83FEE180 FA744100 CEE9CB50 ]ùÖö.At*.Â±.*¥s..w.•Ù.±..tBH;ès. 0000E0
C128FE4C 89F9030C 74FE88E6 EBFE4489 F7880002 05C20334 7401A8AD F0030088 .Â.ÞÙ..t4.ò....%.D±$l.±t..*.L±+ê 000100
06C626C3 027F8907 381E8C26 05740138 D18CDA8C C688FE4C FEF90305 E8058948 H..$..*±L±.6.Ö.l;lt.&..8....ù&6. 000120
7401A8AD F0030088 8073C138 48FE88F2 7401A8AD F003FE88 2574FFFE 3D02073C <..=±.t%.±.ÞÙ..t..±H;ès§.Â.ÞÙ..t 000140
8C117407 3C0EFE26 14E8088E 0474C008 084788E6 EBFE4489 F7880002 05C203E2 ã.ò....%.D±$l.G..ât..Â$.&±.<.t.. 000160
40400124 0074C638 006AE8C0 33067788 8CE83788 07341E8E 260574C7 38078C08 Â.•;üt.&..4..7$¥.w.3&Òj.;ót.$.@a 000180
880738A3 260474C1 38D18CD8 8C99E84E 4E960574 001CE8FE 4DFE0074 005EE898 .Ò^.t.±M±Ò..t..NN$..Â.l;èt.&È8.. 0001A0
D1047607 3A163826 7FFFBA41 4149C828 037401A8 FE458851 C399C033 02478907 ..G.3&.ùO.E±..t.+&lAAo..&;.:.v.l 0001C0
C033E575 EAD102F7 0875000C E8C628C2 23D2F700 72C20315 72C603C1 88F575EA òu%.ê.ór..ôr.%@#ò+6Ò..u.%@lõu[3& 0001E0

Dump of file SATURN:[PCCOMMON.DUMP.PBIN]FINDBND.EXE;1 on 18-APR-1990 10:54:53.17
File ID (381,21,0)   End of file block 28 / Allocated 28

Virtual block number 21 (00000015), 512 (0200) bytes

FE55894A D72BD688 067789FF FEFE44C7 F203F088 FE885718 740010E8 5152C359 YÙRQÒ..t.W.±.P..ùD±±..w..@+@J.U± 000000
5B5A1FFF FA8308C4 83252527 169A1F06 50000188 5052521E D2335053 C35A5958 XYZùSP3@.RRP¡..P....'%%.&..*..Z[ 000020
57E80775 48064688 08568800 9ABF3875 000A7E83 065756EC 885500C3 02080274 t..@ù.U.$VW..-..u8¢...V..F.Nu.ÒW 000040
04C68334 735E003E E8560E46 89024488 0074F73B 11744804 9A36884C E8277200 .r'$L.6..Nt.;%t..D..F.VÒ>.^s4.6. 000060
F95B0000 FFFF9A50 C0335016 52C48850 21E899FF FF880675 D2080473 049AFE81 .±..s..@u.¡...$lP.&R.P3&P.....[* 000080
024C39F7 880E4E88 C85DE588 5E5F07C0 33038804 9A368902 5C891489 E675C085 .&ul...\..6...£3&._^.[]ù.N..%9L. 0000A0
00941E39 0675F738 C18ED388 26721C03 DA882CE8 F9F27504 9AFE8104 C6830C74 t..6..±..u.*$,.Ö..F&.£.è;%u.9... 0000C0
880E4E88 00C30188 04879200 94168904 75F7380E 75C08500 0007C49A 51531373 s.SQ.&....&u8;%u..........lù..N.. 0000E0
DBF7AA2D 800A79D2 080E750A F9831374 C00A93FC 071E570A 7EC51E08 56880646 F..V..é-.W..•..ât..*.u..@y.¯-¯%U 000100
88AA2704 0276393C 30040387 92F1F793 F1F70274 C0080233 92F788DA F7000283 .@.%Ò.%.3@.ât.%þ.%þ..£.0<9v..'^. 000120
00C850E5 885E5F1F 580A8CF2 72C73801 4480FF44 880586AC 4F0588E2 75C308C2 ò.ùuã..O¯...D..D.;úr..ÖK._^.[]ù. 000140
07749A27 0506689A 5200068A 03740008 3000058A 08740000A 3000078A 2174C00B .ât|o..=..t.o..=..t.o..R.ñ..'.t. 000160
04F11688 2604EFA1 26075206 8E5618EC 83EC8855 00285002 4F9A50FF FF88284B K(¡..P.O.P(.U.$.$.V..R.&Äÿ.&..þ. 000180
04F11688 2604EFA1 260A6216 890A60A3 0A5E1689 0A5CA399 C028FE56 89FC4689 .F•.V±+à.£\...^.È'...b.&Äÿ.&..þ. 0001A0
8908C483 295E2064 9A37FF26 0277FF26 FC5EC450 1E06ECB8 51E8FE56 89FC4689 .F•.V±$Q¡$..Pá^•&.w.&.7.d ^).&.. 0001C0
46E808C4 83013CE8 0E37FF26 0277FF26 FC5EC450 F676FF17 74D008F6 5689F446 F¶.V-.Ât..v-Pá^•&.w.&.7.Ò<..&.$F 0001E0
```

Dump of file SATURN:[PCCOMMON.DUMP.PBIN]FINDBND.EXE;1 on 18-APR-1990 10:54:53.17
File ID (381,21,0) End of file block 28 / Allocated 28

Virtual block number 22 (00000016), 512 (0200) bytes

```
26078826 FC5EC404 FC468335 75C00804 C4830329 E80E37FF 260277FF 26FC5EC4 &^=&.w.&.7.Ò)..&..&u5.F=.&^=&..& 000000
0E37FF26 0277"F26 FC5EC493 75223C80 2602478E 2607FF26 37882628 74024708 .G.t+&.7&..&.G.&.<"u.&^=&.w.&.7. 000020
89EA4689 0A621.9B 0A60A100 00E846C7 00E2E9FF FF88CB74 C00804C4 8302F4E8 Ò¶..&..&tùj..Õã.úFÒ..À'...b..Fõ. 000040
E475EC46 0BEA4ou8 E846FFEC 5689EA46 89065788 26044788 26EA5EC4 14E8EC56 V&$.&^õ&.G.&.W..Fõ.V&.FÒ.Fõ.F&uÒ 000060
52068EAD 74D008FA 5689F846 8902C483 29F910C9 9A500004 05E0D1E0 D1E84688 .FÒiÁ1Á...P.è.*).&..F%.V*.Átü..R 000080
E80A6216 880A60A1 04EDA326 E8468807 54068E04 F1168926 04EFA326 FA568807 ..V*&Ëÿ.&..þ...T..FÒ&EÙ.À'...b.$ 0000A0
02578826 078826EA 5EC41A74 C208EC56 89EA4689 06578826 04478826 EA5EC408 .&^õ&.G.&.W..Fõ.V&.òt.&^õ&..&.W. 0000C0
880A60A1 07892602 478926C0 28F85EC4 D1E80257 89260789 2604F846 83F85EC4 &^%.F%.&..&.W.Ŝ1&^%+à&.G.&..À'.. 0000E0
0A621689 0A60A306 57882604 4788260A 601EC423 74C208EC 5689EA46 890A6216 .b..Fõ.V&.òt#&.'.&.G.&.W.Ê'...b. 000100
E846C71A EC83EC88 55C850E5 885EC028 CCEB04C4 832A5E1D 849AEA76 FFEC76FF .v&.võ.Ç.^*.&.Šä+â^.[]ùW.&.&.úFÒ 000120
3CE64688 078A26FC 5EC422E8 FE5689FC 4689F856 89F64689 08568806 46880000 ...F..V..F-.V%.F=.V±Š"&^=&...F|< 000140
46390C56 880A4688 FC46FFF8 5689F646 89C28CC3 880A753A 3C04742F 3C08745C \t.</t.<:u..û.õ.F-.V%.F=.F..V.9F 000160
88F64688 D9E8FC46 FF8F74C0 0802C483 2AC8248C 9A509807 8A26FC5E C41973FC =s.&^=&...P.¥$à*.&..âtc.F=$\.F-. 000180
740C5638 0575C338 40085688 06468820 753A3F80 260A5EC4 0C56890A 4689F856 V%.F..V.&^.&.7:u .F..V.∂;ûu.;V.t 0001A0
2F3C0874 5C3CE646 88078A26 0A5EC401 62E904C4 83016CE8 0E0676FF 0876FF10 ..v..v..Òl..&.Õb.&^.&...F|<\t.</ 0001C0
EA468904 C4832AF2 044E9A06 76FF0876 FFFA4689 4006462B C3880975 3A3C0474 t.<:u..û+F.∂.F*.v..v..N.·*.&..Fõ 0001E0
```

Dump of file SATURN:[PCCOMMON.DUMP.PBIN]FINDBND.EXE;1 on 18-APR-1990 10:54:53.17
File ID (381,21,0) End of file block 28 / Allocated 28

Virtual block number 23 (00000017), 512 (0200) bytes

```
9AEA76FF EC76FF50 1E06EF88 F45689F2 46890A5E 16880A5C A18A74D0 08EC5689 .V&.Átà\...^..F·.V¶¡ÿ..P.v&.võ. 000000
C4832836 1F009AEA 76FFEC76 FF501E06 F188008C E90375C0 0808C483 280C1F00 ...+.&..âu.ÕV.¡þ..P.v&.võ...&+.& 000020
EC76FF2D 742F3C31 743A3C35 745C3CE6 4688078A 260A5EC4 00A2E903 75C00808 ..âu.ÕÀ.&^.&...F|<\t5<:t1</t-.v& 000040
04C48300 8AE80E50 0876FF0F 74000808 56890646 8904C483 28632004 9AEA76FF .võ.. c+.&..F..V..Át..v.P.Õ¤..&. 000060
1DC99A50 40FA4603 04C48328 701F2A9A EA76FFEC 76FF00A9 E9FFFF88 6374C008 .âtc¡..Õ`..v&.võ.*.p+.&..F*∂P.è. 000080
76FF0676 FF0876FF FA76FFEA 76FFEC76 FFD574D0 08F05689 EE468902 C4832895 .+.&..FŸ.VÞ.Átí.v&.võ.v*.v..v..v 0000A0
0057E80E 5052FA46 2808C483 28C11ECA 9A5052FA 46030AC4 832BA21F 429A50F0 ÞP.B.Á+.&..F*RP.Ò.è+.&.+F*RP.ÒW. 0000C0
0374D008 EC5689EA 468904C4 83181E04 4E9A5050 C028E846 FF9D75C0 0804C483 .&..âu..FÒ+àPP.N....&..Fõ.V&.Át. 0000E0
E8065788 26044788 26F25EC4 0D74F446 08F24688 FE85E903 7500E87E 83FF11E9 Õ...~Õ.u.Õç±.F·.F¶t.&^·&.G.&.W.$ 000100
00088804 EC83EC88 55C850E5 88C02804 C4830084 E80E5052 0A621688 0A60A107 .À'...b.RP.Ò...&.+â.[]ùW.&.&.¡.. 000120
56880646 88FC5EC4 56E8FFFF 880575D0 08FE5689 FC468902 C4832C8F 1DC99A50 P.è.€,.&..F=.V±.Âu.¡..ŠVé^=.F..V 000140
1EC41474 0A62060B 0A60A104 47892606 478926C0 28FC5EC4 02578926 07892608 .&..&.W.&^=+â&.G.&.G.À'...b.t.&. 000160
880A6216 890A60A3 FE5688FC 468800E8 06578926 04478926 FE5688FC 46880A5C \..F=.V±&.G.&.W.Š..F=.V±È'...b.. 000180
03750846 08064688 08EC83EC 8855CB50 E588C028 0A5E1689 0A5CA3FE 5688FC46 F=.V±È\...^.+à.[]ùW.$.$..F..F.u. 0001A0
260277FF 26065EC4 7D74D008 FA5689F8 46890657 88260447 8826065E C40092E9 Õ..&^.&.G.&.W..F%.V*.Át)&^.&.w.& 0001C0
88260788 26065EC4 347DC008 08C48328 AA1F009A 37FF2602 77FF26F8 5EC437FF .7&^%&.w.&.7...`(.&..à)4&^.&..&. 0001E0
```

Dump of file SATURN:[PCCOMMON.DUMP.PBIN]FINDBND.EXE;1 on 18-APR-1990 10:54:53.17
File ID (381,21,0) End of file block 28 / Allocated 28

Virtual block number 24 (00000018), 512 (0200) bytes

```
88F85EC4 02578926 07892606 5EC40257 88260788 26F85EC4 FE5689FC 46890257 W..F=.V±&^%&..&.W.&^.&..&.W.&^%. 000000
75D008FA 5689F846 89065788 26044788 26F85EC4 02578926 078926FE 5688FC46 F=.V±&..&.W.&^%&.G.&.W..F%.V*.Åu 000020
28590002 001190C8 50E588FF 6EE90856 89064689 06578826 04478826 065EC497 .&^.&.G.&.W..F..V.Õn..[]ù.....Y( 000040
24DC0103 008A0001 1D730103 00050001 02840103 00000003 24C20002 00000001 ......õ$...............$.......É$ 000060
27850103 00220001 276A0103 00970001 00520103 00900001 24900103 00040002 .......$......R.......j'..*...ç' 000080
04920103 00400001 04820103 003A0001 1C3C0103 00310001 00E80103 0^260001 ..&...Š...1...<...:.......∂..... 0000A0
C0D80103 00590001 01F00103 004D0001 01C20103 00480001 19020103 0041'0001 ..A...®...K...õ...M...Þ...Y...Ù. 0000C0
542D6E75 5220534D 00000000 00000000 00000000 00000000 00000000 005(0001 ..\......................MS Run-T 0000E0
38383931 20296328 20746867 69727970 6F43202D 20797261 7262694C 20656069 ime Library - Copyright (c) 1988 000100
616E663C 20732520 3A656761 73550011 70726F43 2074666F 736F7263 694D202C , Microsoft Corp..Usage: %s <fna 000120
6E692064 6E696620 6F742065 6C62616E 55004854 41504400 0A646E62 2E3E6560 me>.bnd..DPATH.Unable to find in 000140
006E6160 68636162 20732520 646E6962 6C717300 0A732520 656C6966 20747570 put file %s..sqlbind %s bachman. 000160
00000000 00000000 00000000 00000000 0000FFFF 0000024F 00000000 00000000 ........O....................... 000180
00000000 00000000 00000000 00000000 00000000 00000000 00000000 00000000 ................................ 0001A0
00000000 00000000 00000000 00000000 00000000 00000000 00000000 00000000 ................................ 0001C0
00000000 00000000 00000000 00000000 00000000 00000000 00000000 00000000 ................................ 0001E0
```

```
Dump of file SATURN:[PCCOMMON.DUMP.PBIN]FINDBND.EXE;1 on 18-APR-1990 10:54:53.17
File ID (381,21,0)   End of file block 28 / Allocated 28

Virtual block number 25 (00000019), 512 (0200) bytes

00000000 00000000 00000000 00000000 00000000 00000000 00000000 00000000 ................................ 000000
00000000 00000000 00000000 00000000 00000000 00000000 00000000 00000000 ................................ 000020
00000000 00000000 00000000 00000000 00000000 00000000 00000000 00000000 ................................ 000040
00000000 00000000 00000000 00000000 00000000 00000000 00000000 00000000 ................................ 000060
00000000 00000000 00000000 00000000 00000000 00000000 00000000 00000000 ................................ 000080
00000000 00000000 00000000 00000000 00000000 00000000 00000000 00000000 ................................ 0000A0
00000000 00000000 00000000 00000000 00000000 00000000 00000000 00000000 ................................ 0000C0
00000000 00000000 00000000 00000000 00000000 00000000 00000000 00000000 ................................ 0000E0
00000000 00000000 00000000 00000000 00000000 00000000 00000000 00000000 ................................ 000100
00000000 00000000 00000000 00000000 00000000 00000000 00000000 00000000 ................................ 000120
00000000 00000000 00000000 00000000 00000000 00000000 00000000 00000000 ................................ 000140
00000000 00000000 00000000 00000000 00000000 00000000 00000000 00000000 ................................ 000160
00000000 00000000 00000000 00000000 00000000 00000000 00000000 00000000 ................................ 000180
00000000 00000000 00000000 00000000 00000000 00000000 00000000 00000000 ................................ 0001A0
00000000 00000000 00000000 00000000 00000000 00000000 00000000 00000000 ................................ 0001C0
00000000 00000000 00000000 00000000 00000000 00000000 00000000 00000000 ................................ 0001E0
```

```
Dump of file SATURN:[PCCOMMON.DUMP.PBIN]FINDBND.EXE;1 on 18-APR-1990 10:54:53.17
File ID (381,21,0)   End of file block 28 / Allocated 28

Virtual block number 26 (0000001A), 512 (0200) bytes

00000000 00000000 00000000 00000000 00000000 00000000 00000000 00000000 ................................ 000000
00000000 00000000 00000000 00000000 00000000 00000000 00000000 00000000 ................................ 000020
00000000 00000000 00000000 00000000 00000000 00000000 00000000 00000000 ................................ 000040
00000000 00000000 00000000 00000000 00000000 00000000 00000000 00000000 ................................ 000060
00000000 00000000 00000000 00000000 00000000 00000000 00000000 00000000 ................................ 000080
00000000 00000000 00000000 00000000 00000000 00000000 00000000 00000000 ................................ 0000A0
00000000 00000000 00000000 00000000 00000000 00000000 00000000 00000000 ................................ 0000C0
00000000 00000000 00000000 00000000 00000000 00000000 00000000 00000000 ................................ 0000E0
00000000 00000000 00000000 00000000 00000000 00000000 00000000 00000000 ................................ 000100
00000000 00000000 00000000 00000000 00000000 00000000 00000000 00000000 ................................ 000120
00000000 00000000 00000000 00000000 00000000 00000000 00000000 00000000 ................................ 000140
00000000 00000000 00000000 00000000 00000000 00000000 00000000 00000000 ................................ 000160
00000001 FFFF003D 4F464E49 5F454C49 465F435F 009A0000 00000000 00000000 ............_C_FILE_INFO=....... 000180
00000000 00000000 81818100 14000000 00000000 00000000 00000000 00000000 ................................ 0001A0
0000000A 0A0A0A0A 0A0A0A0A 0A0A0A0A 0A0A0A0A 0A0A0A00 00000000 00000000 ................................ 0001C0
00000000 00000000 00000001 00000000 00000000 00000000 00000000 00000000 ................................ 0001E0
```

```
Dump of file SATURN:[PCCOMMON.DUMP.PBIN]FINDBND.EXE;1 on 18-APR-1990 10:54:53.17
File ID (381,21,0)   End of file block 28 / Allocated 28

Virtual block number 27 (0000001B), 512 (0200) bytes

4550534D 4F430000 00000000 00000000 00000000 00000000 00000000 00000000 ..........................COMSPE 000000
00000000 00000000 606F632E 646E6160 606F6300 6578652E 64606300 632F0043 C./c.cmd.exe.command.com........ 000020
00000000 00000102 00000000 00000000 00000001 FFFF0000 0000055A 00000000 ....Z........................... 000040
00000000 00000000 00000000 00000000 00000000 00000000 00000202 00000000 ................................ 000060
00000000 00000000 00000000 00000000 00000000 00000000 00000000 00000000 ................................ 000080
00000000 00000000 00000000 00000000 00000000 00000000 00000000 00000000 ................................ 0000A0
00000000 00000000 00000000 00000000 00000000 00000000 00000000 00000000 ................................ 0000C0
00000000 00000000 00000000 00000000 00000000 00000000 00000000 00000000 ................................ 0000E0
00000000 00000000 00000000 00000000 00000000 00000000 00000000 00000000 ................................ 000100
00000000 00000000 00000200 00010000 00000000 00000000 00000000 00000000 ................................ 000120
00000000 00000000 00000000 00000000 00000000 00000000 00000000 00000000 ................................ 000140
00000000 00000000 00000000 00000000 00000000 00000000 00000000 00000000 ................................ 000160
00000000 00000000 00000000 00000000 00000000 00000000 00000000 00000000 ................................ 000180
756E2800 296C6C75 6E280000 00000000 0000009C 06360000 00000000 00000000 ..........6...........(null).(nu 0001A0
2E003F2A 00005C00 48544150 00657865 2E00606F 632E0000 2320202B 00296C6C ll).+- #...com..exe.PATH.\..*?.. 0001C0
070A068C 0706068C 0702068C 06FE068C 074E068C 00000C70 FFFFFFFF 002E2E00 ........p.....N...t............. 0001E0
```

```
Dump of file SATURN:[PCCOMMON.DUMP.PBIN]FINDBND.EXE;1 on 18-APR-1990 10:54:53.17
File ID (381,21,0)   End of file block 28 / Allocated 28

Virtual block number 28 (0000001C), 512 (0200) bytes

00000000 00000000 00000000 00000000 00000000 00000000 00020101 00000000 ................................ 000000
FFFF2502 00000000 00000000 00000000 00000000 20000000 00000000 00000000 ...........  ................%.. 000020
6F206863 61747320 200A0030 30303652 00003E3E 4753404E 3C3C0750 0754068C ¥.T.P.<<NMSG>>..R6000..- stack o 000040
76696420 72656765 746E6920 200A0033 30303652 0003000A 00776F6C 66726576 verflow.....R6003..- integer div 000060
6867756F 6E652074 6F6E2020 0A003830 30365200 08000A00 30207962 20656469 ide by 0.....R6008..- not enough 000080
0A003930 30365200 09000A00 73746E65 60756772 6120726F 66206563 61707320  space for arguments.....R6009.. 0000A0
65606E6F 7269766E 6520726F 66206563 61707320 6867756F 6E652074 6F6E202D - not enough space for environme 0000C0
36520002 0020726F 72726520 65606974 206E7572 00FF000A 0D00FC00 C**0746E nt...*......run-time error ...R6 0000E0
64656461 6F6C2074 6F6E2074 6E696F70 20676E69 74616F6C 6620200A 00: 3030 002..- floating point not loaded 000100
67697373 61207265 746E696F 70206C6C 756E202D 0A003130 30365200 0100.A00 .....R6001..- null pointer assig 000120
65602068 67756F6E 6520746F 6E20200A 00353030 36520005 000A0074 6E65606E nment.....R6005..- not enough me 000140
6F662064 61622020 0A003630 30365200 06000A00 63657865 206E6F20 79726F60 mory on exec.....R6006..- bad fo 000160
6E652064 61622020 0A003730 30365200 07000A00 63657865 206E6F20 74616072 rmat on exec.....R6007..- bad en 000180
00000107 0E000200 03FFFFFF 000A0063 65786520 6E6F2074 6E65606E 6F726976 vironment on exec............... 0001A0
00000000 00000000 00000000 00000000 00000307 52000200 00000205 54000200 ...T.......R.................... 0001C0
00000000 00000000 00000000 00000000 00000000 00000000 00000000 00000000 ................................ 0001E0
```

```
Dump of file SATURN:[PCCOMMON.DUMP.DLL]IFMDML.TMP;1 on 18-APR-1990 10:47:01.12
File ID (704,15,0)   End of file block 124 / Allocated 124

Virtual block number 1 (00000001), 512 (0200) bytes

00000000 00000040 00000000 00000088 0000FFFF 00000004 0000007C 013C5A4D MZ<.|...........|.......a....... 000000
00000080 00000000 00000000 00000000 00000000 00000000 00000000 00000000 ................................ 000020
6F6E6E61 63206061 72676F72 70207369 685421CD 4C01B821 CD09B400 0EBA1F0E ..o..Ç.él|.LéIThis program canno 000040
00000000 00000024 0A0D0D2E 65646F60 20534F44 206E6920 6E757220 65622074 t be run in DOS mode....$....... 000060
00080019 00000000 00010000 00000800 0019800E 72959753 00020383 0505454E NE......S..r.................... 000080
00000000 00000000 00010000 00040000 00000405 01280112 01080108 00400021 !.a.......(..................... 0000A0
087A0F00 087A0280 080E0F00 080E01EB 19CC0F00 19CC0046 00110F00 00110043 C.......F.ä...ä.S.B...B...z...z. 0000C0
06120F00 061204A3 03380F00 03380468 0C140F00 0C1403A3 08E80F00 08E8030C ..Ô...Ô.È.......k.B...B.È....... 0000E0
0F8C0F00 0F8C07C0 08AA0F00 08AA0709 16820F00 16820590 07D80F00 07D80508 ..Ä...Ä...ÿ...ÿ... ... .ë....... 000100
042C0F00 042C097E 018C0F00 018C095B 040C0F00 040C0915 040C0F00 040C08CF ü...............[.......~.,.....  000120
01380F00 01380A1C 00C20F00 00C20A0D 011E0F00 011E09F8 030C0F00 030C09C4 á.......½.........ô...ô...B...B. 000140
02020E01 00000000 1A180F00 1A1808E7 08100F00 0810082F 0F400F00 0F400A33 3.a...a./.......Ô............... 000160
018C013F 006F0024 001B0015 00010000 004C4D44 4D464906 1F300F01 1D92008F ......0..IFMDML.........$.o.?... 000180
4D500554 494E4942 4F4C474C 4D440B62 6F6C676C 60640700 024E0233 02210200 ..!.3.N...dmlglob.DMLGLOBINIT.PM 0001A0
45545349 47455248 5445405F 12444F48 54454006 534C4C41 43534F44 084E4957 WIN.DOSCALLS.METHOD._METHREGISTE 0001C0
544E4154 534E4948 5445405F 1047534D 444E4553 4854454D 5F0C5353 414C4352 RCLASS._METHSENDMSG._METHINSTANT 0001E0

Dump of file SATURN:[PCCOMMON.DUMP.DLL]IFMDML.TMP;1 on 18-APR-1990 10:47:01.12
File ID (704,15,0)   End of file block 124 / Allocated 124

Virtual block number 2 (00000002), 512 (0200) bytes

534C4D44 0A6C6D64 03455441 49544E41 54534E49 45444854 454D5F12 45544149 IATE._METHDEINSTANTIATE.dml.DMLS 000000
55514C40 4400454C 444E4148 4C45444F 4D595245 55514C4D 44134E58 54504F54 TOPTXN.DMLQUERYMODELHANDLE.DMLQU 000020
4E4C5259 52455551 4C4D4408 444C4549 46544553 4C4D4408 444C4549 46595245 ERYFIELD.DMLSETFIELD.DMLQUERYRLN 000040
4C45524E 554C4D44 08455441 4C45524C 4D440931 4E4C5259 52455551 4C4D440C .DMLQUERYRLN1.DMLRELATE.DMLUNREL 000060
4D440944 494C4D44 59524555 514C4D44 0D545349 4C454552 464C4D44 08455441 ATE.DMLFREELIST.DMLQUERYDMLID.DM 000080
464C4D44 08455441 54535952 45555152 45544C49 464C4D44 13455445 4C45444C LDELETE.DMLFILTERQUERYSTATE.DMLF 0000A0
524E5854 504F5453 4C4D4412 46464F52 45544C49 464C4D44 0C4E4F52 45544C49 ILTERON.DMLFILTEROFF.DMLSTOPTXNR 0000C0
54535455 41530A4E 58545452 41545354 5541530C 54554153 044B4341 424C4C4F OLLBACK.SAUT.SAUTSTARTTXN.SAUTST 0000E0
45445455 41530F45 53414350 55545541 530A5455 50444954 55415309 54555052 RPUT.SAUTIOPUT.SAUTUPCASE.SAUTDE 000100
49474142 4C545510 54554403 54414352 54535455 41530A45 4D414E54 494D494C LIMITNAME.SAUTSTRCAT.DUT.UTLBAGI 000120
54550A52 4F535255 43455441 52455449 4741424C 54551352 4F535255 4354494E NITCURSOR.UTLBAGITERATECURSOR.UT 000140
45405349 5145534C 54550E45 4B414D4E 55514553 4C54550C 454B414D 5145534C LSEQMAKE.UTLSEQUNMAKE.UTLSEQISME 000160
54550A59 54504D45 5145534C 5455084C 45485355 50514553 4C54550C 5245424D MBER.UTLSEQPUSHEL.UTLSEQEMPTY.UT 000180
45444045 4D0E5041 45484554 41455243 4D454D00 4D454D03 54524F53 5145534C LSEQSORT.MEM.MEMCREATEHEAP.MEMDE 0001A0
4C414E41 06525454 41455441 4552434D 4144006D 61640350 41454859 4F525453 STROYHEAP.dam.DAMCREATEATTR.ANAL 0001C0
5257534F 44084F49 53034D55 4E444E45 50504145 4D414E54 554C414E 41135455 UT.ANALUTNAMEAPPENDNUM.SIO.DOSWR 0001E0

Dump of file SATURN:[PCCOMMON.DUMP.DLL]IFMDML.TMP;1 on 18-APR-1990 10:47:01.12
File ID (704,15,0)   End of file block 124 / Allocated 124

Virtual block number 3 (00000003), 512 (0200) bytes

6874656D 20646E61 20297328 7463656A 624F206C 6D44206D 66491000 00455449 ITE...Ifm Dml Object(s) and meth 000000
1F02C483 FFFF0000 9A57D88E FFFF881E 00000000 00000000 00000000 0073646F ods...............|...ÄW......á.. 000020
00000000 00000000 00000000 00000000 19000200 02000000 0F000A00 020002CB Ù............................... 000040
5689F846 89FE578B 26FC478B 260E5EC4 040E4683 D88EFFFF 881E5657 000008C8 à...WV.|...Ä.F..á^.&.G=&.W±.F½.V 000060
0F6A0A76 FF0C76FF 1F6AFE56 89FC4689 FE578826 FC478826 0E5EC404 0E4683FA •.F..á^.&.G=&.W±.F=.V±j..v...v.j. 000080
C95F5E1F 0000E914 C4830000 FFFF9A00 6AFC76FF FE76FF27 1868F876 FFFA76FF .v•.vÿh.'.v±.v=j.......á.Ö...^ è 0000A0
89F84689 FE578826 FC478826 0E5EC404 0E468308 8E000888 1E565700 0008C8CB ùà...WV.|...Ä.F..á^.&.G=&.W±.F½. 0000C0
6A0A76FF 0C76FF1F 6AFE5689 FC4689FE 578826FC 4788260E 5EC4040E 4683FA56 V•.F..á^.&.G=&.W±.F=.V±j..v..v.j 0000E0
5F5E1F00 00E914C4 83000000 529A006A FC76FFFE 76FF2719 68F876FF FA76FF0F ..v•.vÿh.'.v±.v=j..R....á.Ö...^  000100
EE4689FE 578826FC 4788260E 5EC4040E 46830D88E 0069881E 56570000 18C8CBC9 èùà...WV.||..Ä.F..á^.&.G=&.W±.FŸ 000120
FE578826 FC478826 0E5EC404 0E4683F6 4689FE47 88260E5E C4020E46 83F05689 .Vþ.F..á^.&.G±.F-.F..á^.&.G=&.W± 000140
C4040E46 83F45689 F24689FE 578826FC 4788260E 5EC4040E 4683EA56 89E84689 .FÒ.VÔ.F..á^.&.G=&.W±.F·.V¶.F..á 000160
76FF4400 68EE76FF F076FF50 16F8468D FE5689FC 4689FE57 8826FC47 88260E5E ^.&.G=&.W±.F=.V±.F½.P.vþ.vŸh.D.v 000180
008DE9EC 46880006 E9037500 EC7E83EC 468910C4 83000001 DD9A006A E876FFEA õ.vÒj..Ÿ....á..Fš.-š.u.Õ...FšÕ.. 0001A0
76FFF876 FFFA76FF 006A006A 006A006A 006A006A 006A006A 006AF276 FFF476FF .v¶.v·j.j.j.j.j.j.j.j.j..v•.v½.v 0001C0
037500EC 7E83EC46 8926C483 0000FFFF 9A006AF6 76FFFC76 FFFE76FF EE76FFF0 þ.vŸ.v±.v=.v-j.......á&.Fš.-š.u. 0001E0
```

```
Dump of file SATURN:[PCCOMMON.DUMP.DLL]IFMDML.TMP;1 on 18-APR-1990 10:47:01.12
File ID (704,15,0)   End of file block 124 / Allocated 124

Virtual block number 4 (00000004), 512 (0200) bytes

 2CE999BD 880006E9 037537F6 7E83000F E9037536 F67E8300 44E9EC46 880006E9 Õ...FšÕD..~-6u.Õ...~-7u.Õ..¡§.Õ, 000000
 0000839A 006AF876 FFFA76FF 27EA68EE 76FFF076 FF37FF26 0277FF26 FC5EC400 .á^•&.w.&.7.vÞ.vŸhõ'.v*.v½j..°.. 000020
 46C7D88E 00CA861E 56570000 18C8C8C9 5F5E1F00 00E9EC46 8BEC4689 10C48300 ..á..F&.FšÕ...^_èùà...WV.¡Õ..ÄúF 000040
 0E4683FA 5689F846 89FE5788 26FC4788 260E5EC4 040E4683 0004EA46 C70000E8 Õ..úFõ...F..á^.Ī.G=&.Wż.F½.V*.F. 000060
 578826FC 4788260E 5EC4040E 4683F256 89F04689 FE578826 FC478826 0E5EC404 .á^.&.G=&.Wż.FÞ.V·.F..á^.&.G•&.W 000080
 FF106AF0 76FFF276 FF036AF6 4689FE47 88260E5E C4020E46 83EE5689 EC4689FE ż.F&.VŸ.F..á^.&.Gż.F-j..v·.vÞj.. 0000A0
 7500F47E 83F44689 14C48300 0002A39A 006A0A76 FF0C76FF 271868F8 76FFFA76 v*.v½h.'.v..v.j..Ê....á..F¶.-¶.u 0000C0
 0A76FF0C 76FF2717 68F876FF FA76FF06 6A5016F6 468D00CC E9F44688 0006E903 .Õ...F¶Õä..F-.Pj..v*.v½h.'.v..v. 0000E0
 00F67E83 009AE9F4 46880006 E9037500 F47E83F4 468912C4 83000003 4C9A006A j..L....á..F¶.~¶.u.Õ...F¶Õ...—. 000100
 326A5016 FC4680F8 76FFFA76 FF006A00 6A0A76FF 0C76FF00 6A006A00 37E90375 u.Õ7.j.j..v..v.j.j..v*.v½.F=.Pj2 000120
 FFFA76FF 005AE9F4 46880006 E9037500 F47E83F4 468918C4 83000001 909A006A j.......á..F¶.~¶.u.Õ...F¶ÕZ..v*. 000140
 0C76FFF8 76FFFA76 FFF44689 0000032B 9A5016E8 468D206A 0A76FF0C 76FFF876 v½.v..v.j .FÕ.P.+....F¶.v*.v½.v. 000160
 F876FFFA 76FF016A EC76FFEE 76FFF446 890000FF FF9A5016 EA468021 6A0A76FF .v.j!.Fõ.P......F¶.vŸ.všj..v*.v½ 000180
 5700002E C8C8C95F 5E1F0000 E912C483 00000147 9A006A0A 76FF0C76 FF271768 h.'.v..v.j..G....á.Õ...^_èùà...W 0001A0
 890000B8 EA5689E8 4689FE57 8826FC47 88260E5E C4040E46 83D88E01 FA881E56 V.¡*..Á.F..á^.&.G=&.Wż.FÕ.Võ¡... 0001C0
 76FF2714 68E876FF EA76FF10 6A5016D8 468DF446 89F64689 000088E4 4689E646 F!.Fõ¡...F-.F¶.FÁ.Pj..võ.vÕh.'.v 0001E0

Dump of file SATURN:[PCCOMMON.DUMP.DLL]IFMDML.TMP;1 on 18-APR-1990 10:47:01.12
File ID (704,15,0)   End of file block 124 / Allocated 124

Virtual block num..er 5 (00000005), 512 (0200) bytes

 03D8E9D6 46880006 E9037500 D67E8306 468912C4 83000003 DC9A006A 0A76FF0C ..v.j..É....á..F•.~•.u.Õ...F•ÕÜ. 000000
 0000040E 9A006A0A 76FF0C76 FF271968 E876FFEA 76FF106A D876FFDA 76FF036A j..vÕ.vÁj..võ.vÕh.'.v..v.j...... 000020
 FFEA76FF 046A5016 E4468003 A6E9D646 880006E9 03750006 7E830646 8914C483 .á..F•.~•.u.Õ...F•ÕI..Fõ.Pj..võ. 000040
 FF0F6A50 16F4468D D6468912 C4830000 04319A00 6A0A76FF 0C76FF27 1468E876 vÕh.'.v..v.j..1....á..F•.F¶.Pj.. 000060
 7500067E 83064689 12C48300 0004879A 006A0A76 FF0C76FF 271468E8 76FFEA76 võ.vÕh.'.v..v.j.......á..F•.~•.u 000080
 76FFF676 FFE876FF EA76FF00 19E90375 F64608F4 46880351 E9064688 0006E903 .Õ...F•ÕQ..F¶.F-u.Õ...võ.vÕ.v~.v 0000A0
 76FF2714 68E876FF EA76FF1D 6A5016EC 468D0646 890AC483 00000596 9A006AF4 ¶j.......á..F•.F&.Pj..võ.vÕh.'.v 0000C0
 02F8E9D6 46880006 E9037500 D67E8306 468912C4 83000004 829A006A 0A76FF0C ..v.j..ý....á..F•.~•.u.Õ...F•Õ«. 0000E0
 00067E83 D646890C C4830000 04E49A00 6A0A76FF 0C76FF45 8E68E876 FFEA76FF .võ.vÕh.E.v..v.j..Õ....á..F•.~•. 000100
 76FF0C76 FF271368 E876FFEA 76FF126A 5016E046 80020DE9 D6468800 06E90375 u.Õ...F•ÕÅ..FÁ.Pj..võ.vÕh.'.v..v 000120
 DC468002 9EE9D646 880006E9 03750006 7E830646 8912C483 00000516 9A006A0A .j.......á..F•.~•.u.Õ...F•Õ...FÉ 000140
 D6468912 C4830000 05489A00 6A0A76FF 0C76FF27 1368E876 FFEA76FF 136A5016 .Pj..võ.vÕh.'.v..v.j..H....á..F• 000160
 FF271368 E876FFEA 76FF056A 5016FC46 80026CE9 D6468800 06E90375 00067E83 .-•.u.Õ...F•Õl..F•.Pj..võ.vÕh.'. 000180
 3AE9D646 880006E9 03750006 7E830646 8912C483 0000064C 9A006A0A 76FF0C76 v..v.j..L....á..F•.~•.u.Õ...F•Õ: 0001A0
 03750247 08260788 26D25EC4 04D24683 0004E9D4 5689D246 89E25688 E0468802 ..FÁ.Vä.F•.VàÕ...F•.á^Ø&..&.G.u. 0001C0
 D646890A C4830000 05E79A00 6A37FF26 0277FF26 D25EC4E8 76FFEA76 FF002FE9 Õ/..võ.vÕá^Ø&.w.&.7j..Õ....á..F• 0001E0

Dump of file SATURN:[PCCOMMON.DUMP.DLL]IFMDML.TMP;1 on 18-APR-1990 10:47:01.12
File ID (704,15,0)   End of file block 124 / Allocated 124

Virtual block number 6 (00000006), 512 (0200) bytes

 04E9FA56 89F84689 DE56880C 4688FF8E E901ECE9 D6468800 06E90375 00067E83 .~•.u.Õ...F•Õš.Õ/..FÉ.V8.F½.V*Õ. 000000
 77FF26F8 5EC4E876 FFEA76FF 002FE903 7502470B 26078826 F85EC404 F8468300 ..F½.á^½&..&.G.u.Õ/..võ.vÕá^½&.w 000020
 0198E9D6 46880006 E9037500 D67E8306 46890AC4 830000FF FF9A006A 37FF2602 .&.7j.......á..F•.~•.u.Õ...F•Õ.. 000040
 F0468300 04E9F256 89F04689 FE5688FC 468800C7 E90375E6 4608E446 88FF8EE9 Õ/..FÕ.F!u.Õú..F=.Vż.FÞ.V·Õ...FÞ 000060
 C4458A68 E876FFEA 76FFE476 FFE676FF 00A2E903 7502470B 26078826 F05EC404 .á^Þ&..&.G.u.ÕÅ..v!.võ.võ.vÕh.Eá 000080
 880006E9 03750006 7E830646 8910C483 0000067B 9A006A37 FF260277 FF26F05E ^Þ&.w.&.7j..(....á..F•.~•.u.Õ... 0000A0
 83000006 869A006A 37FF2602 77FF26F0 5EC42721 68E876FF EA76FF01 36E90646 F•Õ6..võ.vÕh!'á^Þ&.w.&.7j..Ñ.... 0000C0
 E476FFE6 76FFEC76 FFEE76FF 0107E906 46880006 E9037500 D67E8306 46890CC4 á..F•.~•.u.Õ...F•Õ...vŸ.vš.v!.võ 0000E0
 D6468914 C4830000 07179A00 6A37FF26 0277FF26 F05EC445 8D68E876 FFEA76FF .võ.vÕh.Eá^Þ&.w.&.7j.......á..F• 000100
 5689F046 89FE5688 FC468800 C6E9FF48 E900CCE9 D6468800 06E90375 00067E83 .-•.u.Õ...F•Õa.ÕK.Õ6..F•.Vż.FÞ.V 000120
 6A0A76FF 0C76FF05 6A00A4E9 03750247 08260788 26F05EC4 04F04683 0004E9F2 ·Õ...FÞ.á^Þ&..&.G.u.ÕÊ.j..v..v.j 000140
 468914C4 83000002 719A006A 37FF2602 77FF26F0 5EC42719 68E876FF EA76FF04 ..võ.vÕh.'á^Þ&.w.&.7j..q....á..F 000160
 0277FF26 F05EC427 2168E876 FFEA76FF 0068E9D6 46880006 E9037500 D67E8306 •.-•.u.Õ...F•Õk..võ.vÕh!'á^Þ&.w. 000180
 FF003CE9 D6468800 06E90375 00067E83 D646890C C4830000 077F9A00 6A37FF26 &.7j.......á..F•.~•.u.Õ...F•Õ<.. 0001A0
 A79A006A 37FF2602 77FF26F0 5EC4458D 68E876FF EA76FF00 6A006AEC 76FFEE76 vŸ.všj.j..võ.vÕh.Eá^Þ&.w.&.7j..Ī 0001C0
 C8C95F5E 1FFF49E9 0003E906 46880006 E9037500 D67E8306 468914C4 83000003 ....á..F•.~•.u.Õ...F•Õ..Õ!..^_èù 0001E0
```

```
Dump of file SATURN:[PCCOMMON.DUMP.DLL]IFMDML.TMP;1 on 18-APR-1990 10:47:01.12
File ID (704,15,0)   End of file block 124 / Allocated 124

Virtual block number 7 (00000007), 512 (0200) bytes

 5689F846 89FE5788 26FC4788 260E5EC4 040E4683 088E0363 881E5657 000008C8 à...WV.¡c..Ä.F..á^.&.G=&.W±.F%.V 000000
 136AFC76 FFFE76FF 036AFE56 89FC4689 FE578826 FC478826 0E5EC404 0E4683FA •.F..á^.&.G=&.W±.F•.V±j..v±.v=j. 000020
 C95F5E1F 0000E914 C4830000 07469A00 6A0A76FF 0C76FF27 1868F876 FFFA76FF .v•.v½h.'.v..v.j..F....á.Õ...^ è 000040
 89F84689 FE578826 FC478826 0E5EC404 0E4683D8 8E07A888 1E565700 0008C8C8 ùà...WV.¡ ..Ä.F..á^.&.G=&.W±.F%. 000060
 6AFC76FF FE76FF04 6AFE5689 FC4689FE 578826FC 4788260E 5EC4040E 4683FA56 V•.F..á^.&.G=&.W±.F•.V±j..v±.v=j 000080
 5F5E1F00 00E914C4 83000007 F29A006A 0A76FF0C 76FF2718 68F876FF FA76FF12 ..v•.v½h.'.v..v.j..`....á.Õ...^  0000A0
 F84689FE 578826FC 4788260E 5EC4040E 4683088E 0809881E 56570000 08C8C8C9 èùà...WV.¡...Ä.F..á^.&.G=&.W±.F% 0000C0
 0F6AFC76 FFFE76FF FE5689FC 4689FE57 8826FC47 88260E5E C4040E46 83FA5689 .V•.F..á^.&.G=&.W±.F•.V±.v±.v=j. 0000E0
 C95F5E1F 0000E912 C4830000 08539A00 6A0A76FF 0C76FF27 1468F876 FFFA76FF .v•.v½h.'.v..v.j..S....á.Õ..._è 000100
 89FC4689 FE578826 FC478826 0E5EC404 0E4683D8 8E086A88 1E565700 0008C8C8 ùà...WV.¡j..Ä.F..á^.&.G=&.W±.F•. 000120
 FF016AF8 76FFFA76 FFFA5689 F84689FE 578826FC 4788260E 5EC4040E 4683FE56 V±.F..á^.&.G=&.W±.F%.V•.v•.v½j.. 000140
 C8C95F5E 1F0000E9 12C48300 0008829A 006A0A76 FF0C76FF 271268FC 76FFFE76 v±.v=h.'.v..v.j..ÿ....á.Õ...^ èù 000160
 5689F846 89FE5788 26FC4788 260E5EC4 040E4683 088E08C9 881E5657 00000AC8 à...WV.¡è..Ä.F..á^.&.G=&.W±.F%.V 000180
 02478926 000088FC 5EC4FE56 89FC4689 FE578826 FC478826 0E5EC404 0E4683FA •.F..á^.&.G=&.W±.F•.V±á^=¡..&.G. 0001A0
 0009119A 006A0A76 FF0C76FF 271468F8 76FFFA76 FF106AFC 76FFFE76 FF078926 &...v±.v=j..v•.v½h.'.v..v.j..... 0001C0
 46C7D88E 0928881E 56570000 10C8C8C9 5F5E1F00 00E90000 88F64689 12C48300 ..á..F-¡..Õ...^_èùà...WV.¡(..AùF 0001E0

Dump of file SATURN:[PCCOMMON.DUMP.DLL]IFMDML.TMP;1 on 18-APR-1990 10:47:01.12
File ID (704,15,0)   End of file block 124 / Allocated 124

Virtual block number 8 (00000008), 512 (0200) bytes

 FF066A50 16FA4680 F85689F6 4689FE57 8826FC47 88260E5E C4040E46 830001FA •...F..á^.&.G=&.W±.F-.V½.F•.Pj.. 000000
 7500F47E 83F44689 12C48300 000A039A 006A0A76 FF0C76FF 271768F6 76FFF876 v½.v-h.'.v..v.j.......á..F¶.-¶.u 000020
 0A76FF0C 76FF2714 68F676FF F876FF0F 6A5016FC 46800070 E9F44688 0006E903 .Õ...F¶Õp..F=.Pj..v½.v-h.'.v..v. 000040
 08FC4688 003EE9F4 46880006 E9037500 F47E83F4 468912C4 83000009 7D9A006A j..)....á..F¶.-¶.u.Õ...F¶Õ>..F=. 000060
 006A316A 5016FC46 8DF676FF F876FF00 6A006A0A 76FF0C76 FF0033E9 0374FE46 F±t.Õ3..v..v.j.j..v½.v-.F=.Pj1j. 000080
 C8C8C95F 5E1F0000 E9F44688 0006E903 7500F47E 83F44689 14C48300 0002E39A .D....á..F¶.-¶.u.Õ...F¶Õ..._èùà 0000A0
 89FE5788 26FC4788 260E5EC4 040E4683 0000FA46 C7D88E09 9A881E56 5700000C ...WV.¡...ÀùF•...F..á^.&.G=&.W±. 0000C0
 0AD09A00 6A0A76FF 0C76FF27 1768F676 FFF876FF 066A5016 FA4680F8 5689F646 F-.V½.F•.Pj..v½.v-h.'.v..v.j..Å. 0000E0
 76FF0F6A 5016FC46 8D005EE9 F4468800 06E90375 00F47E83 F4468912 C4830000 ...á..F¶.-¶.u.Õ...F¶Õ^..F=.Pj..v 000100
 037500F4 7E83F446 8912C483 000009D1 9A006A0A 76FF0C76 FF271468 F676FFF8 ½.v-h.'.v..v.j..ì....á..F¶.-¶.u. 000120
 00000464 9A006AFC 76FFFE76 FFF676FF F876FF00 6A006A00 2CE9F446 880006E9 Õ...F¶Õ,.j.j..v½.v-.v±.v=j..d... 000140
 56570000 14C8C8C9 5F5E1F00 00E9F446 880006E9 037500F4 7E83F446 890EC483 .á..F¶.-¶.u.Õ...F¶Õ...^_èùà...WV 000160
 C4040E46 83F05689 EE4689FE 578826FC 4788260E 5EC4040E 4683088E 0A67881E .¡g..Ä.F..á^.&.G=&.W±.FŸ.Vþ.F..á 000180
 271468EE 76FFF076 FFu46A50 16F24680 FA5689F8 4689FE57 8826FC47 88260E5E ^.&.G=&.W±.F%.V•.F .Pj..vþ.vŸh.' 0001A0
 468000A1 E90375F4 4608F246 88EC4689 12C48300 0008979A 006A0A76 Fr.^76FF .v..v.j.......á..F$.F .F¶u.ÕÀ..F 0001C0
 468912C4 8300000B D19A006A F276FFF4 76FF2713 68EE76FF F076FF05 6A5.'6FC •.Pj..vþ.vŸh.'.v¶.v j..ì....á..F 0001E0

Dump of file SATURN:[PCCOMMON.DUMP.DLL]IFMDML.TMP;1 on 18-APR-1990 10:47:01.12
File ID (704,15,0)   End of file block 124 / Allocated 124

Virtual block number 9 (00000009), 512 (0200) bytes

 FF001CE9 03740247 0826078B 26FC5EC4 010AE9EC 46880006 E9037500 EC7E83EC $.-$.u.Õ...F$Õ..á^=&..&.G.t.Õ... 000000
 7500EC7E 83EC4689 0CC48300 000A9E9A 006AF276 FFF476FF 458968EE 76FFF076 vþ.vŸh.E.v¶.v j.......á..F$.-$.u 000020
 0C76FF27 1968EE76 FFF076FF 046AF276 FFF476FF 056A0000 E9EC4688 0006E903 .Õ...F$ÕÀ.j..v¶.v j..vþ.vŸh.'.v. 000040
 6A0098E9 EC468800 06E90375 00EC7E83 EC468914 C4830000 0C389A00 6A0A76FF .v.j..;....á..F$.-$.u.Õ...F$Õ..j 000060
 8300000C 6D9A006A 0A76FF0C 76FF2718 68EE76FF F076FF04 6AF876FF FA76FF05 ..v•.v½j..vþ.vŸh.'.v..v.j..m.... 000080
 76FFF076 FF066A50 16F64680 0066E9EC 46880006 E9037500 EC7E83EC 468914C4 á..F$.-$.u.Õ...F$Õf..F-.Pj..vþ.v 0000A0
 0006E903 7500EC7E 83EC4689 12C48300 000CA19A 006AF876 FFFA76FF 271268EE Ÿh.'.v•.v½j..À....á..F$.-$.u.Õ.. 0000C0
 006AF876 FFFA76FF 458868EE 76FFF076 FF001CE9 037500F6 7E830034 E9EC4688 .F$Õ4..--.u.Õ...vþ.vŸh.E.v•.v½j. 0000E0
 C8C8C95F 5E1F0000 E9EC4688 0006E903 7500EC7E 83EC4689 0CC48300 0008699A .i....á..F$.-$.u.Õ...F$Õ..._èùà 000100
 F25689F0 4689FE57 8826FC47 88260E5E C4040E46 83D88E08 22881E56 57000012 ...WV.¡"..Ä.F..á^.&.G=&.W±.Fþ.V 000120
 76FF4588 68F076FF F276FFFA 5689F846 89FE5788 26FC4788 260E5EC4 040E4683 .F..á^.&.G=&.W±.F%.V•.v .vþh.E.v 000140
 0004E9FE 5689FC46 89FA5688 F84688EE 46890CC4 83000000 509A006A 0A76FF0C ..v.j..P....á..FŸ.F%.V•.F=.V±Õ.. 000160
 F076FFF2 76FF046A 5016F446 800086E9 03750247 0826078B 26FC5EC4 04FC4683 .F•.á^=&..&.G.u.ÕÑ..F¶.Pj..v .vþ 000180
 037500EE 7E83EE46 8912C483 00000094 9A006A37 FF260277 FF26FC5E C4271468 h.'á^=&.w.&.7j.......á..FŸ.-Ÿ.u. 0001A0
 76FF046A F476FFF6 76FF056A 0039E903 75F64608 F4468800 80E9EE46 880006E9 Õ...FŸÕ...F¶.F-u.Õ9.j..v-.v¶j..v 0001C0
 7E83EE46 8914C483 000000CD 9A006A37 FF260277 FF26FC5E C4271968 F076FFF2 .vþh.'á^=&.w.&.7j..ë....á..FŸ.- 0001E0
```

```
Dump of file SATURN:[PCCOMMON.DUMP.DLL]IFMDML.TMP;1 on 18-APR-1990 10:47:01.12
File ID (704,15,0)   End of file block 124 / Allocated 124

Virtual block number 10 (0000000A), 512 (0200) bytes

 271868F0 76FFF276 FF046A0A 76FF0C76 FF056A00 3CE9EE46 880006E9 037500EE Ÿ.u.Õ...FŸÕ<.j..v..v.j..v.vÞh.' 000000
 0006E903 7500EE7E 83EE4689 14C48300 000C069A 006A37FF 260277FF 26FC5EC4 á^=&.w.&.7j.......á..FŸ.~Ÿ.u.Õ.. 000020
 DA468900 0088U88E 0CC7B81E 56570000 38C8C8C9 5F5E1FFF 37E90003 E9EE4688 .FŸÕ..Õ7..^_èüàß..WV.¡ú..Á¡...FÖ 000040
 260E5EC4 040E4683 CE5689CC 4689FE57 8826FC47 88260E5E C4040E46 83D84689 .FÁ.F..á^.&.G=&.Wz.Fø.Vö.F..á^.& 000060
 5016D446 8DFE4689 FE478826 0E5EC402 0E4683D2 56890046 89FE5788 26FC4788 .G=&.Wz.FÅ.VØ.F..á^.&.Gz.Fz.Få.P 000080
 7E83CA46 8912C483 00000E86 9A006A0A 76FF0C76 FF271268 CC76FFCE 76FF096A j..vö.vàh.'.v..v.j.......á..Fò.~ 0000A0
 0C76FF27 1468CC76 FFCE76FF 046A5016 D8468D01 07E9CA46 880006E9 037500CA ò.u.Õ...FòÕ...FÁ.Pj..vö.vàh.'.v. 0000C0
 880005E9 CA468800 06E90375 00CA7E83 CA468912 C4830000 0EC59A00 6A0A76FF .v.j..é....á..Fò.~ò.u.Õ...FòÕf.. 0000E0
 FFDA76FF 271F68CC 76FFCE76 FFD076FF D276FFFE 76FF0025 E90375DA 460BD846 FÄ.FÖu.Õ%..vz.vØ.vÅ.vö.vàh.'.vÕ. 000100
 6A006A04 C4830EEC 00869AD0 76FFD276 FFCA4689 12C48300 0000079A 006A0876 vÁj.......á..Fò.vØ.vÅ.Ñ.&..á.j.j 000120
 0003E903 75003F80 26D05EC4 C8468940 C6030F29 01AA9AF0 88D476FF D676FF0A ..vø.vå.Þ.`.)..6ã.Fàá^Å&.?.u.Õ.. 000140
 006AE0D1 C103E0D1 E0D1C888 FE462BC8 4688001D E90377C8 4639FE46 88C846FF .Fà.Fz9Fàw.Õ...Fà+Fz.àIÁIÁ.èIÁj. 000160
 76FFD276 FF004268 1E0012E9 0375003F 8026005E C40F4401 829A5016 D4468D50 P.Få.P...D.á^Å&.?.u.Õ...hB..vØ.v 000180
 50520AC4 830F6900 F89AD476 FFD676FF 5016DC46 8D0A6A08 C4830F59 00109AD0 Å...Y..á.j..FÉ.P.vø.vå.½.i...á.RP 0001A0
 1E565700 0010C8CB C95F5E1F 0000E900 008808C4 83FFFF00 109AD076 FFD276FF .vØ.vÅ......á.¡..Õ...^_èüà...WV. 0001C0
 FA4689FE 578826FC 4788260E 5EC4040E 4683F046 89F24689 00008808 8E00F688 ¡~..Á¡...F .FÞ.F..á^.&¯G=&.Wz.F* 0001E0

Dump of file SATURN:[PCCOMMON.DUMP.DLL]IFMDML.TMP;1 on 18-APR-1990 10:47:01.12
File ID (704,15,0)   End of file block 124 / Allocated 124

Virtual block number 11 (0000000B), 512 (0200) bytes

 00000E54 9A006A0A 76FF0C76 FF271468 FA76FFFC 76FF046A 5016F046 8DFC5689 .V=.FÞ.Pj..v=.v*h.'.v..v.j..T... 000000
 0008E903 75F2460B F0468801 13E9F846 880006E9 037500F8 7E83F846 8912C483 .á..F½.~½.u.Õ...F½Õ...FÞ.F u.Õ.. 000020
 0C76FF27 1468FA76 FFFC76FF 106A5016 F0468D00 18FE46C7 0037E900 °<FE46C7 úFz..Õ7.úFz...FÞ.Pj..v=.v*h.'.v. 000040
 8D00C9E9 F8468800 06E90375 00F87E83 F8468912 C4830000 10399A00 6A 476FF .v.j..9....á..F½.~½.u.Õ...F½Õè.. 000060
 12C48300 0010809A 006AF076 FFF276FF 271268FA 76FFFC76 FFFE76FF 5016F446 F¶.P.vz.v=.v*h.'.v .vÞj.......á. 000080
 FA76FFFC 76FF00F6 568301F4 46830096 E9F84688 0006E903 7500F87E 83F84689 .F½.~½.u.Õ...F½Õ...F¶..V~..v=.v* 0000A0
 9A006A0A 76FF0C76 FF271768 FA76FFFC 76FF096A 5016F446 8D0000FF FF9A246A j$......F¶.Pj..v=.v*h.'.v..v.j.. 0000C0
 46880000 10CF9AFA 76FFFC76 FF0011E9 037500F8 7E83F846 8912C483 0000108E ƒ....á..F½.~½.u.Õ...v=.v*.ü....F 0000E0
 0FBC9A00 6AF076FF F276FF27 1768FA76 FFFC76FF FE76FF50 16F4468D 0044E9F8 ½ÕD..F¶.P.vz.v=.v*h.'.v .vÞj..¥. 000100
 E9F84688 0006E903 7500F87E 830000FF FF9AFA76 FFFC76FF F8468912 C4830000 ...á..F½.v=.v*......~½.u.Õ...F½Õ 000120
 0E5EC404 0E468308 8E0F81B8 1E565700 0028C8C8 C95F5E1F 0000E900 00880006 ..¡..Õ...^_èüà(..WV.¡...Ä.F..á^. 000140
 E24689FE 578826FC 4788260E 5EC4040E 4683E856 89E64689 FE578826 FC478826 &.G=&.Wz.FÎ.VÕ.F..á^.&.G=&.Wz.Fã 000160
 4689F646 89000088 EC5689EA 4689FE57 8826FC47 88260E5E C4040E46 83E45689 .VÕ.F..á^.&.G=&.Wz.Fõ.Vš¡...F~.F 000180
 00E046C7 DC4689DE 46890000 88F04689 F2468900 0088F846 89FA4689 000088F4 ¶¡...F*.F½¡...F .FÞ¡...FB.FÉúFÁ. 0001A0
 FF9A5016 EE4680E6 76FFE876 FFFC4689 FE468900 00880846 89DA4689 00008800 .¡...FÕ.FÁ¡...Fz.F=.vÕ.vl.FŸ.P.. 0001C0
 76FF106A 5016F046 8D0000FF FF9AE676 FFE876FF 0008E903 7500EE7E 830000FF ....~Ÿ.u.Õ...vÕ.vl......FÞ.Pj..v 0001E0

Dump of file SATURN:[PCCOMMON.DUMP.DLL]IFMDML.TMP;1 on 18-APR-1990 10:47:01.12
File ID (704,15,0)   End of file block 124 / Allocated 124

Virtual block number 12 (0000000C), 512 (0200) bytes

 037500E0 7E83E046 8912C483 000011F0 9A006A0A 76FF0C76 FF271468 E676FFE8 Ò.vlh.'.v..v.j..Þ....á..FÁ.-Á.u. 000000
 76FF106A F076FFF2 76FF1C6A 0026E903 75F2460B F0468803 ABE9E046 880006E9 Õ...FÁÕ ..FÞ.F u.Õ&.j..v .vÞj..v 000020
 037500E0 7E83E046 8914C483 00001222 9A006A0A 76FF0C76 FF271968 E676FFE8 Ò.vlh.'.v..v.j..".....á..FÁ.-Á.u. 000040
 6A0A76FF 0C76FF27 1468E676 FFE876FF 1C6A5016 F8468D03 68E9E046 880006E9 Õ...FÁÕk..F½.Pj..vÒ.vlh.'.v..v.j 000060
 460BF846 880339E9 E0468800 06E90375 00E07E83 E0468912 C4830000 12629A00 ..b....á..FÁ.-Á.u.Õ...FÁÕ9..F½.F 000080
 6A0A76FF 0C76FF27 1968E676 FFE876FF 1C6AF876 FFFA76FF 1D6A0026 E90375FA *u.Õ&.j..v*.v½j..vÒ.vlh.'.v..v.j 0000A0
 460BF046 8802F9E9 E0468800 06E90375 00E07E83 E0468914 C4830000 10069A00 .......á..FÁ.-Á.u.Õ...FÁÕ*..FÞ.F 0000C0
 76FFE876 FF1D6AF0 76FFF276 FF1C6A00 26E90375 FA460BF8 46880031 E90375F2 u.Õ1..F½.F*u.Õ&.j..v .vÞj..vÕ.v 0000E0
 0006E903 7500E07E 83E04689 14C48300 0012EA9A 006AF876 FFFA76FF 271868E6 lh.'.v*.v½j..õ....á..FÁ.-Á.u.Õ.. 000100
 1468E676 FFE876FF 106A5016 DC468D00 23E90374 E4460BE2 468802AE E9E0468B .FÁÕÜ..Fã.FÕt.Õ#..FÉ.Pj..vÒ.vlh. 000120
 8D015EE9 0374EC46 0BEA4688 E0468912 C4830000 13419A00 6A0A76FF 0C76FF27 '.v..v.j..A....á..FÁ.Fõ.Fšt.Õ^.. 000140
 68E676FF E876FF50 00038800 03E90005 880006E9 0375E446 0BE2468B 5016D846 FÁ.P.Fã.FÕu.Õ..¡..Õ..¡..P.vÒ.vlh 000160
 006A5052 DE5688DC 46880006 E9E4568B E2468800 09E90375 E4460BE2 46882713 .'.Fã.FÕu.Õ...Fã.VÕÕ...FÉ.VBRPj. 000180
 DA5688D8 4688021A E9E0468B 0006E903 7500E07E 83E04689 12C48300 00139D9A ......á..FÁ.-Á.u.Õ...FÁÕ...FÁ.VÕ 0001A0
 0045E903 75DE460B 0C468800 C5E90375 02470826 07B826FC 5EC4FE56 89FC4689 .F=.Vzá^=&..&.G.u.Õé..FÉ.Fßu.ÕE. 0001C0
 0013E29A 006A37FF 260277FF 26FC5EC4 271468E6 76FFE876 FF046A50 16E24680 .Fã.Pj..vÒ.vlh.'á^=&.w.&.7j..ã.. 0001E0
```

```
Dump of file SATURN:[PCCOMMON.DUMP.DLL]IFMDHL.TMP;1 on 18-APR-1990 0:47:01.12
File ID (704,15,0)   End of file block 124 / Allocated 124

Virtual block number 13 (0000000D), 512 (0200) bytes

46830007 E90375E4 4608E246 880087E9 0003E903 7500E07E 83E04689 12C48300 ..á..FÁ.-Á.u.Õ..Õ...Fã.Fõu.Õ...F 000000
6A37FF26 0277FF26 FC5EC427 1468E676 FFE876FF 106A5016 EA468DFF A1E904FC ▪.ÕÀ..Fõ.Pj..vÒ.vlh.'á^▪&.w.&.7j 000020
0374EC46 08EA4688 0042E900 03E90375 00E07E83 E0468912 C4830000 14769A00 ..v....á..FÁ.-Á.u.Õ..Õ▪..Fõ.Fêt. 000040
FC5EC400 16E90375 02573926 0009E903 74073926 0C56880A 4688FC5E C40030E9 Õ0.á^▪.F..V.&9.t.Õ..&9W.u.Õ..á^▪ 000060
E676FFE8 76FFFF2C E904FC46 830004E9 000AE9F6 5689F446 89025788 26078826 &..&.W..F¶.V-Õ..Õ...F▪.Õ,..vÒ.vl 000080
F4468000 32E9011A E9E04688 0006E903 7500E07E 830000FF FF9AD876 FFDA76FF .vÒ.vÂ......-Á.u.Õ...FÁÕ..Õ2..F¶ 0000A0
E0468912 C4830000 14C19A00 6AEA76FF EC76FF27 1468E676 FFE876FF 1C6A5016 .Pj..vÒ.vlh.'.v&.võj..ê....á..FÁ 0000C0
EC4608EA 46880040 E90375F6 4608F446 8800E5E9 E0468800 06E90375 00E07E83 .~Á.u.Õ...FÁÕl..F¶.F-u.Õ▪..Fõ.Fã 0000E0
006AF476 FFF676FF 271968E6 76FFE876 FF106AEA 76FFEC76 FF1C6A00 35E90375 u.Õ5.j..v&.võj..vÒ.vlh.'.v-.v¶j. 000100
EC4608EA 4688009A E9E04688 0006E903 7500E07E 83E04689 14C48300 0015019A ......á..FÁ.~Á.u.Õ...FÁÕ...Fõ.Fã 000120
006A0A76 FF0C76FF 271868E6 76FFE876 FF106AEA 76FFEC76 FF1C6A00 35E90375 u.Õ5.j..v&.võj..vÒ.vlh.'.v..v.j. 000140
F6460BF4 4688005A E9E04688 0006E903 7500E07E 83E04689 14C48300 0015419A .A....á..FÁ.-Á.u.Õ...FÁÕZ..F¶.F~ 000160
006A0A76 FF0C76FF 271868E6 76FFE876 FF1C6AF4 76FFF676 FF106A00 35E90375 u.Õ5.j..v-.v¶j..vÒ.vlh.'.v..v.j. 000180
037500EE 7E83001A E9E04688 0006E903 7500E07E 83E04689 14C48300 0011809A .¯....á..FÁ.-Á.u.Õ...FÁÕ...~Ÿ.u. 0001A0
1E565700 0010C8C8 C95F5E1F 0000E900 00880000 FFFF9AE6 76FFE876 FF0008E9 Õ...vÒ.vl.....¡..Õ...^_èùà...WV. 0001C0
880000F0 46C7F456 89F24689 FE578826 FC478826 0E5EC404 0E468308 8E10F588 ¡X..Ä.F..á^.&.G▪&.W±.F¯.V¶úFÞ..¡ 0001E0
```

```
Dump of file SATURN:[PCCOMMON.DUMP.DLL]IFMDHL.TMP;1 on 18-APR-1990 10:47:01.12
File ID (704,15,0)   End of file block 124 / Allocated 124

Virtual block number 14 (0000000E), 512 (0200) bytes

00117F9A 5016FA46 8DF276FF F476FFF6 4689F846 89000088 FC4689FE 46890000 ...F±.F▪¡...F%.F-.v¶.v .F*.P.... 000000
FFF476FF 106A5016 F6468000 0011939A F276FFF4 76FF0008 E9037500 FA7E8300 ..-*.u.Õ...v¶.v ......F-.Pj..v¶. 000020
06E90375 00F07E83 F0468912 C4830000 16209A00 6A0A76FF 0C76FF27 1468F276 v h.'.v..v.j.. ....á..FÞ.-Þ.u.Õ. 000040
9A006A0A 76FF0C76 FF271468 F276FFF4 76FF1C6A 5016FC46 8D0117E9 F0468800 ..FÞÕ...F▪.Pj..v¶.v h.'.v..v.j.. 000060
75F8460B F6468800 E5E9F046 880006E9 037500F0 7E83F046 8912C483 00001660 '....á..FÞ.-Þ.u.Õ...FÞÕl..F-.F%u 000080
9A006A0A 76FF0C76 FF271968 F276FFF4 76FF1D6A F676FFF8 76FF1C6A 0035E903 .Õ5.j..v%.v-j..v¶.v h.'.v..v.j.. 0000A0
75FE460B FC468800 A5E9F046 880006E9 037500F0 7E83F046 8914C483 000016A0 .....á..FÞ.-Þ.u.Õ...FÞÕE..F▪.F±u 0000C0
9A006A0A 76FF0C76 FF271968 F276FFF4 76FF1C6A FC76FFFE 76FF1D6A 0035E903 .Õ5.j..v±.v▪j..v¶.v h.'.v..v.j.. 0000E0
75F84608 F6468800 65E9F046 880006E9 037500F0 7E83F046 8914C483 000016E8 Š....á..FÞ.-Þ.u.Õ...FÞÕe..F-.F%u 000100
68F276FF F476FF1C 6AFC76FF FE76FF1D 6A0035E9 0375FE46 08FC4688 0040E903 .Õ▪..F▪.F±u.Õ5.j..v±.v▪j..v¶.v h 000120
46880006 E9037500 F07E83F0 468914C4 83000012 AD9A006A F676FFF8 76FF2718 .'.v%.v-j..Ù....á..FÞ.-Þ.u.Õ...F 000140
5E1F0000 E9000088 0000156A 9AF276FF F476FF00 08E90375 00FA7E83 001AE9F0 ÞÕ...-*.u.Õ...v¶.v .j...¡..Õ...^ 000160
4689FE57 8826FC47 88260E5E C4040E46 83088E15 81881E56 5700001A C8CBC95F  èùà...WV.¡...Á.F..á^.&.G▪&.W±.F 000180
0E5EC404 0E4683FA 5689F846 89FE5788 26FC4788 260E5EC4 040E4683 EE5689EC Ŝ.VŸ.F..á^.&.G▪&.W±.F%.V*.F..á^. 0001A0
76FF2713 68EC76FF EE76FF12 6A5016F4 468DE856 89E64689 FE578826 FC478826 &.G▪&.W±.Fl.VÒ.F¶.Pj..vŸ.všh.'.v 0001C0
00AAE9EA 46880006 E9037500 EA7E83EA 468912C4 83000017 DF9A006A 0A76FF0C ..v.j..Õ....á..Fõ.-õ.u.Õ...FõÕ¯. 0001E0
```

```
Dump of file SATURN:[PCCOMMON.DUMP.DLL]IFMDHL.TMP;1 on 18-APR-1990 10:47:01.12
File ID (704,15,0)   End of file block 124 / Allocated 124

Virtual block number 15 (0000000F), 512 (0200) bytes

E9037502 470B2607 8826FC5E C404FC46 830004E9 FE5689FC 4689F656 88F44688 .F¶.V-.F▪.V±Õ...F▪.á^▪&..&.G.u.Õ 000000
3A9A006A 37FF2602 77FF26FC 5EC42714 68EC76FF EE76FF03 6A5016F0 468D0060 '..FÞ.Pj..vŸ.všh.'á^▪&.w.&.7j..: 000020
0374F046 39FA5688 F8468BFF 8AE90003 E9037500 EA7E83EA 468912C4 83000018 ....á..Fõ.-õ.u.Õ..Õ¤..F%.V*9FÞt. 000040
E90000FF FF9A37FF 260277FF 26FC5EC4 5016E646 8D0014E9 0374F256 39001CE9 Õ..9V t.Õ...Fl.Pá^▪&.w.&.7.....Õ 000060
C4830000 15EE9A00 6A0A76FF 0C76FF27 1568EC76 FFEE76FF F476FFF6 76FFFF8D ...v-.v¶.vŸ.všh.'.v..v.j..Ÿ....á 000080
C4040E46 83088E1 28881E56 5700001A C8CBC95F 5E1F0000 E9EA4688 EA468910 ..Fõ.FõÕ...^ èùà...WV.¡+..Ä.F..á 0000A0
89FE5788 26FC478e 260E5EC4 040E4683 EE5689EC 4689FE57 8826FC47 88260E5E ^.&.G▪&.W±.FŜ.VŸ.F..á^.&.G▪&.W±. 0000C0
07C726E6 5EC4E856 89E64689 FE578826 FC478826 0E5EC404 0E4683FA 5689F846 F%.V*.F..á^.&.G▪&.W±.Fl.VÒá^l&ú. 0000E0
83000017 879A006A 0A76FF0C 76FF2713 68EC76FF EE76FF12 6A5016F4 468D0000 ...F¶.Pj..vŸ.všh.'.v..v.j....... 000100
FE5689FC 4689F656 88F44688 009CE9EA 46880006 E9037500 EA7E83EA 468912C4 á..Fõ.-õ.u.Õ...FõÕ...F¶.V-.F▪.V± 000120
EE76FF03 6A5016F0 468D0052 E9037502 470B2607 8826FC5E C404FC46 830004E9 Õ...F▪.á^▪&..&.G.u.ÕR..FÞ.Pj..vŸ 000140
EA7E83EA 468912C4 83000019 609A006A 37FF2602 77FF26FC 5EC42714 68EC76FF .všh.'á^▪&.w.&.7j..'....á..Fõ.-õ 000160
C40006E9 0374F256 39000EE9 0374F046 39FA5688 F84688FF 8AE90003 E9037500 .u.Õ..Õ¤..F%.V*9FÞt.Õ..9V t.Õ..á 000180
9A006A0A 76FF0C76 FF271568 EC76FFEE 76FFF476 FFF676FF FF98E907 FF26E65E ^l&..Õ...v-.v¶.vŸ.všh.'.v..v.j.. 0001A0
8E1857B8 1E565700 0000C8C8 C95F5E1F 0000E9EA 4688EA46 8910C483 00001888 £....á..Fõ.FõÕ...^_èùà...WV.¡W.. 0001C0
FF68FFFF 68D88E19 7D881E56 57000002 C8CBC95F 5E1F0000 E9085688 06468808 Ä.F..V.Õ...^_èùà...WV.¡)..Äh..h. 0001E0
```

```
Dump of file SATURN:[PCCOMMON.DUMP.DLL]IFMDML.TMP;1 on 18-APR-1990 10:47:01.12
File ID (704,15,0)   End of file block 124 / Allocated 124

Virtual block number 16 (00000010), 512 (0200) bytes

 FE468918 C4830000 FFFF9A00 6A576A02 6A006A00 6A006A00 44681E01 6A556AFF .jUj..hD.j.j.j.jWj.......á..F± 000000
 02030000 0002199C 0002000B 00051447 02030010 90CBC95F 5E1F0000 E9FE468B .F±Õ...^_èù.....G...Ù.......... 000020
 02031975 00021?9F 000500FF 000515B0 02030073 0005109A 0203010C 0007181B ....É.......ä...§...........u... 000040
 0002002B 00041986 020300A0 00050310 0203011F 00051501 02030113 00051714 ........ı................Å...+... 000060
 0203004B 00040A41 02030000 00191997 0002003E 00041913 02030000 00170ED8 Ä...........>...........A...K... 000080
 040E4683 D88EFFFF 881E5657 000012C8 0000005C 00040AFC 02030144 00061063 c...D...•...\...à...WV.¡...Ä.F.. 0000A0
 FE578B26 FC478B26 0E5EC404 0E4683FA 5689F846 89FE578B 26FC478B 260E5EC4 á^.&.G=&.W±.F½.Vº.F..á^.&.G=&.W± 0000C0
 C4040E46 83F45689 F24689FE 578B26FC 478B260E 5EC4040E 4683FE56 89FC4689 .F=.V±.F..á^.&.G=&.W±.F·.V¶.F..á 0000E0
 1768F876 FFFA76FF 106AEE76 FFF076FF F05689EE 4689FE57 8B26FC47 8B260E5E ^.&.G=&.W±.FŸ.Vÿ.vÿ.vŸj..vº.v½h. 000100
 F6468800 06E90375 00F67E83 F6468912 C4830000 FFFF9A00 6A0A76FF 0C76FF27 '.v..v.j.......á..F-.—.u.Õ...F- 000120
 07C72608 5EC40035 E906468B D88E0008 881E5657 000000C8 CBC95F5E 1F0000E9 Õ...^_èùà...WV.¡...Ä.F.Õ5.á^.&ú. 000140
 C726085E C40037E9 000407C7 26085EC4 0042E900 0607C726 085EC400 4DE90003 ..ÕM.ã^.&ú...ÕB.á^.&ú...Õ7.á^.&ú 000160
 3DFF88E9 03750057 3DFFCEE9 03750056 3D0023E9 002CE999 AE88002C E9000507 ...Õ,.¡Ù.Õ,.Õ#.=V.u.Õö.=W.u.ÕE.= 000180
 0062C8C8 C95F5E1F 0000E900 0088FFD4 E9FFCCE9 03750059 3DFFC9E9 03750058 X.u.Õè.=Y.u.Õà.Õå.¡..Õ...^_èùàb. 0001A0
 4683F456 89F24689 FE578B26 FC478B26 0E5EC404 0E46830B 8E00A08B 1E565700 .WV.¡...A.F..á^.&.G=&.W±.F¯.V¶.F 0001C0
 5689F846 89FE578B 26FC478B 260E5EC4 040E4683 F64689FE 478B260E 5EC4020E ..á^.&.G±.F-.F..á^.&.G=&.W±.F½.V 0001E0

Dump of file SATURN:[PCCOMMON.DUMP.DLL]IFMDML.TMP;1 on 18-APR-1990 10:47:01.12
File ID (704,15,0)   End of file block 124 / Allocated 124

Virtual block number 17 (00000011), 512 (0200) bytes

 EA468800 06E90375 00EA7E83 EA468906 C483FFFF 00989AF6 76FF5016 F0468DFA '.Fþ.P.v-......á..Fõ.-õ.u.Õ...Fõ 000000
 0001E39A 006A0A76 FF0C76FF 271368F2 76FFF476 FFF076FF 5016EC46 8D000EE9 ÕB..F$.P.vþ.v¶.v·h.'.v..v.j..D.. 000020
 89FC4689 EE5688EC 468800AB E9EA468B 0006E903 7500EA7E 83EA4689 12C48300 ..á..Fõ.-õ.u.Õ...Fõõ¨..F$.VŸ.F=. 000040
 F476FF50 169E468D 004BE903 7502470B 26078B26 FC5EC404 FC468300 04E9FE56 V±Õ...F=.á^=&..&.G.u.ÕK..F..P.v¶ 000060
 EA7E83EA 468910C4 83000002 2B9A006A 37FF2602 77FF26FC 5EC4271C 68F276FF .v·h.'á^=&.w.&.7j..+....á..Fõ.-õ 000080
 00000247 9A50169E 468DFE6A 006A0161 68F876FF FA76FFFF BCE90003 E9037500 .u.Õ..Õ¥..vº.v½ha.j.j±.F..P.G... 0000A0
 83000000 7A9A006A 0A76FF0C 76FF2715 68F276FF F476FFEC 76FFEE76 FFFFA2E9 ÕÅ..vŸ.v$.v¶.v·h.'.v..v.j..z.... 0000C0
 00E90000 880000FF FF9A016A 006A006A 006A0164 68F876FF FA76FFEA 468910C4 á..Fõ.vº.v½hd.j.j.j.j......¡..Õ. 0000E0
 578B26FC 478B260E 5EC4040E 46830B8E 0115881E 56570000 0EC8CBC9 5F5E1F00 ..^_èùà...WV.¡...Ä.F..á^.&.G=&.W 000100
 FC478B26 0E5EC404 0E4683FE 4689FE47 8B260E5E C4020E46 83FC5689 FA4689FE ±.F¯.V=.F..á^.&.G±.F±.F..á^.&.G= 000120
 F27E83F2 468906C4 83015C00 989AFE76 FF5016F8 468DF656 89F44689 FE578B26 &.W±.F¶.V-.F½.P.v±...\..á..F·.-· 000140
 76FF2711 68FA76FF FC76FFF8 76FFF476 FFF676FF 0025E9F2 46880006 E9037500 .u.Õ...F·Õ%..v-.v¶.v½.v=.vºh.'.v 000160
 025E881E 56570000 B4C8CBC9 5F5E1F00 00E912C4 83000001 8D9A006A 0A76FF0C ..v.j.......á.Õ...^_èùàÇ..WV.¡^. 000180
 8B260E5E C4020E46 83A65689 A44689FE 578B26FC 478B260E 5EC4040E 46830B8E .A.F..á^.&.G=&.W±.FË.VÌ.F..á^.&. 0001A0
 5EC4040E 4683F8 5 89F64689 FE578B26 FC478B26 0E5EC404 0E4683A8 4689FE47 G±.F¯.F..á^.&.G=&.W±.F-.V½.F..á^ 0001C0
 FFF876FF 078926u2 47892600 0088985E C49A5689 984689FE 578B26FC 478B260E .&.G=&.W±.F..V.á^.¡..&.G.&...v½. 0001E0

Dump of file SATURN:[PCCOMMON.DUMP.DLL]IFMDML.TMP;1 on 18-APR-1990 10:47:01.12
File ID (704,15,0)   End of file block 124 / Allocated 124

Virtual block number 18 (00000012), 512 (0200) bytes

 BC880006 E90374FF FE7E83FE 46890000 03909A00 6A006A00 6A006A01 6568F676 v-he.j.j.j.j.......F±.-±.t.Õ..¡¥ 000000
 9A5016AA 468D5052 4CCA8300 0000022B FE468801 6868F676 FFF876FF 0142E999 .ÕB..v½.v-hh..F±+@....ðLRP.F¯.P. 000020
 0006E903 7500A07E 83A04689 06C48302 A500989A A876FF50 16A2468D 0000020C .....FÅ.P.v¯...É..á..F..-..u.Õ.. 000040
 9A006A0A 76FF0C76 FF271368 A476FFA6 76FFA276 FF50169C 468D0100 E9A0468B .F.Õ...F..P.vÅ.vÌ.vÊh.'.v..v.j.. 000060
 899E5688 9C468800 CDE9A046 880006E9 037500A0 7E83A046 8912C483 00000427 '....á..F..-..u.Õ...F.Õë..F..V.. 000080
 16FF4C86 8D0067E9 03750247 08260788 26FA5EC4 04FA4683 0004E9FC 5689FA46 Fº.V=Õ...Fº.á^º&..&.G.u.Õg...L.. 0000A0
 468910C4 83000004 8A9A006A 37FF2602 77FF26FA 5EC4271C 68A476FF A676FF50 P.vÌ.vÊh.'á^º&.w.&.7j.......á..F 0000C0
 08C483FF FF008C9A 5016FF4C 868D5016 AA468DFF 8BE90003 E9037500 A07E83A0 ..-..u.Õ..ÕE..F¯.P..L..P......á. 0000E0
 E90003E9 02578926 0789269B 5EC40257 8B26078B 26FA5EC4 0017E903 7400003D =..t.Õ..á^º&..&.W.á^.&..&.W.Õ..Õ 000100
 C4830000 02D79A00 6A0A76FF 0C76FF27 1568A476 FFA676FF 9C76FF9E 76FFFF86 ...v..v..vÌ.vÊh.'.v..v.j..■....á 000120
 998CA046 C70005E9 0000A046 C70008E9 03750247 08260788 26985EC4 A0468910 ..F.á^.&..&.G.u.Õ..úF...Õ..úF.¥. 000140
 8B260E5E C4040E46 83088E02 EE881E56 5700005C C8C8C95F 5E1F0000 E9A0468B .F.Õ...^_èùà\..WV.¡Y..Á.F..á^.&. 000160
 5689FC46 89FE578B 26FC478B 260E5EC4 040E4683 F85689F6 4689FE57 8B26FC47 G=&.W±.F¯.V½.F..á^.&.G=&.W±.F=.V 000180
 C626A45E C4004AFA 46C7A656 89A44689 FE578B26 FC478B26 0E5EC404 0E4683FE ±.F..á^.&.G=&.W±.FÊ.VÌúF'J.á^È&6 0001A0
 76FFFB76 FF5016A8 468D0000 05609A50 16FA468D 00C2681E A476FFA6 76FF0007 ...vÌ.vÊ.hó..Fº.P.`....F´.P.v½.v 0001C0
 0029E903 7400F47E 83F44689 10C48300 0005909A 006A0A76 FF0C76FF 271C68F6 -h.'.v..v.j.......á..F¶.-¶.t.Õ). 0001E0
```

```
Dump of file SATURN:[PCCOMMON.DUMP.DLL]IFMDML.TMP;1 on 18-APR-1990 10:47:01.12
File ID (704,15,0)   End of file block 124 / Allocated 124

Virtual block number 19 (00000013), 512 (0200) bytes

8D5016A8 4680A476 FFA676FF 00000575 9A5016FA 468D00C7 681EA476 FFA676FF .vl.vÊ.hú..F*.P.u....vl.vÊ.F´.P. 000000
9A006AFC 76FFFE76 FF271C68 F676FFF8 76FF5016 A8468D00 0005B39A 5016FA46 F*.P.*....F´.P.v½.v-h.'.v±.v=j.. 000020
FA468D00 C9681EA4 76FFA676 FF0029E9 037400F4 7E83F446 8910C483 00000300 Å....á..F¶.-¶.t.Õ)..vl.vÊ.hè..F* 000040
E9000088 0000FFFF 9A5016FA 468D5016 A84680A4 76FFA676 FF000005 C89A5016 .P.à....vl.vÊ.F´.P.F*.P.....|..Õ 000060
0A76FF0C 76FF4B6A 0000FE46 C7D88E04 C3881E56 57000080 C8CBC95F 5E1F0000 ...^_èùà¯..WV.|û..ÄúF±..jK.v..v. 000080
C70023E9 0E468800 00FFFF9A 5016FF50 868D0AC4 83044800 CE9A5016 FF508680 ..P._P.ö.K..é...P..P......F.Õ#.ú 0000A0
E9013AE9 0001B80C 1CE90002 EE46C700 1AF846C7 0029E900 02EE46C7 0018F846 F½..úFŸ..Õ).úF½..úFŸ..Õ..|..Õ:.Õ 0000C0
5016F046 8D0676F: 0876FFFF E4E9FF0A E9037500 0530FFD5 E9037500 02300013 ..=..u.Õ(.=..u.ÕÕ.ÕÕ..v..v..Fþ.P 0000E0
F276FF06 76FF0876 FF0102E9 EC468800 06E90375 00EC7E83 EC468900 00FFFF9A ......F&.-&.u.Õ...F&Õ...v..v..v· 000100
E9EC4688 0006E903 7500EC7E 83EC4689 0000FFFF 9A5016F4 468DF876 FFF076FF .vþ.v½.F¶.P......F&.-&.u.Õ...F&Õ 000120
75024708 26078B26 FA5EC404 FA468300 04E9FC56 89FA4689 F65688F4 46880007 ■..F¶.V-.F*.V=Õ...F*.á^*&..&.G.u 000140
00FFFF9A 50169C46 80EE76FF 37FF2602 77FF26FA 5EC40676 FF0876FF 0075E903 .Õu..v..v.á^*&.w.&.7.vŸ.F..P.... 000160
037400EC 7E83EC46 89000006 059A5016 9C468D00 0DE90374 00EC7E83 EC468900 ..F&.-&.t.Õ...F..P......F&.-&.t. 000180
46C70018 E9037400 003D08C4 8305F900 8C9A5016 9C468050 16FF5086 800033E9 Õ3...P..P.F..P...*..á.=..t.Õ..úF 0001A0
FF0676FF 0876FFFF 78E90003 E9EA5689 E8468902 578B2607 8826FA5E C40001FE ±..á^*&..&.W..FÕ.VõÕ..Õx..v..v.. 0001C0
26078926 EA5688E8 4688105E C40013E9 037500FE 7E830000 FFFF9AF4 76FFF676 v-.v¶......-±.u.Õ..á^..FÕ.Võ&..& 0001E0

Dump of file SATURN:[PCCOMMON.DUMP.DLL]IFMDML.TMP;1 on 18-APR-1990 10:47:01.12
File ID (704,15,0)   End of file block 124 / Allocated 124

Virtual block number 20 (00000014), 512 (0200) bytes

14C8C8C9 5F5E1F00 00E9EC46 88078926 02478926 00008810 5EC40000 E9025789 .W.Õ..á^.|..&.G.&...F&Õ...^_èùà. 000000
83FE5689 FC4689FE 578B26FC 4788260E 5EC4040E 4683088E 05DF881E 56570000 ..WV.|Õ..Ä.F..á^.&.G=&.W±.F=.V±. 000020
89EC4689 FE578826 FC478826 0E5EC404 0E4683F6 4689FE47 88260E5E C4020E46 F..á^.&.G±.F-.F..á^.&.G=&.W±.F&. 000040
47892600 0088F85E C4FA5689 F84689FE 578826FC 4788260E 5EC4040E 4683EE56 VŸ.F..á^.&.G=&.W±.F½.V*á^½|..&.G 000060
0EC48303 9F05D79A FC76FFFE 76FFEC76 FFEE76FF F676FF50 16F24680 07892602 .&...F·.P.v-.vŸ.v$.v±.v=.■....á. 000080
F85EC400 16E90375 F44608F2 46880021 E9F04688 0006E903 7500F07E 83F04689 .Fþ.-þ.u.Õ...FþÕ|..F·.F¶u.Õ..á^½ 0000A0
881E5657 000008C8 CBC95F5E 1F0000E9 00008802 57892607 8926F456 88F24688 .F·.V¶&..&.W.|..Õ...^_èùà...WV.| 0000C0
0E5EC404 0E4683FE 5689FC46 89FE5788 26FC4788 260E5EC4 040E4683 D88E0776 v..Ä.F..á^.&.G=&.W±.F=.V±.F..á^. 0000E0
FF271268 FC76FFFE 76FF026A F876FFFA 76FFFA56 89F84689 FE578826 FC478826 &.G=&.W±.F½.V*.v*.v½j..v±.v=h.'. 000100
30881E56 57000000 C8CBC95F 5E1F0000 E912C483 0000053D 9A006A0A 76FF0C76 v..v.j..=....á.Õ...^_èùà...WV.|Õ 000120
07EB68D8 8E088F88 1E565700 0002C8C8 C95F5E1F 0000E908 56880646 88D88E08 ..Ä.F..V.Õ...^_èùà..¯WV.|...ÄhS. 000140
8918C483 0000FFFF 9A006A55 6A026A00 6A006A00 6A00CC68 1E016A30 6AFFFF68 h..jÕj..hä.j.j.j.j.jUj.......á.. 000160
00000003 08AE0002 00080005 07360203 000090C8 C95F5E1F 0000E9FE 4688FE46 F±.F±Õ...^_èù.....6...Û...Û..... 000180
00920005 06CD0203 01810006 05220203 007E0005 06510203 01660006 06E30203 ..D...f...Q...-...".......ë..... 0001A0
00000017 07010002 00AC0005 067C0203 00300002 035E0103 00280004 08C80203 ..à...+...^...=...|...¯......... 0001C0
00000000 00000000 08870003 08810005 00000019 08A90002 003E0004 08780203 ..x...>...`.......Ÿ............. 0001E0

Dump of file SATURN:[PCCOMMON.DUMP.DLL]IFMDML.TMP;1 on 18-APR-1990 10:47:01.12
File ID (704,15,0)   End of file block 124 / Allocated 124

Virtual block number 21 (00000015), 512 (0200) bytes

5689FA46 89FE5788 26FC4788 260E5EC4 040E4683 D88EFFFF 881E5657 000010C8 à...WV.|...Ä.F..á^.&.G=&.W±.F*.V 000000
4788260E 5EC4040E 4683F656 89F44689 FE578826 FC478826 0E5EC404 0E4683FC =.F..á^.&.G=&.W±.F¶.V-.F..á^.&.G 000020
76FFF676 FF066AFE 4689FE47 88260E5E C4020E46 83F25689 F04689FE 578826FC =&.W±.Fþ.V .F..á^.&.G±.F±j..v-.v 000040
83F84689 14C48300 0000809A 006A0A76 FF0C76FF 271868FA 76FFFC76 FF0A6AF4 ¶j..v=.v*h.'.v..v.j..¯....á..F½. 000060
76FF086A 5016FE46 8D0035E9 037500FE 7E830099 E9F8468B 0006E903 7500F87E -½.u.Õ...F½Õ...-±.u.Õ5..F±.Pj..v 000080
037500F8 7E83F846 8912C483 000000EA 9A006A0A 76FF0C76 FF271768 FA76FFFC =.v*h.'.v..v.j..õ....á..F½.-½.u. 0000A0
1768FA76 FFFC76FF 086A5016 FE468D00 01FE46C7 0037E900 5EE9F846 880006E9 Õ...F½Õ^.Õ7.úF±...F±.Pj..v=.v*h. 0000C0
F8468800 06E90375 00F87E83 F8468912 C4830000 011D9A00 6A0A76FF 0C76FF27 '.v..v.j.......á..F½.-½.u.Õ...F½ 0000E0
00FFFF9A 006A0A76 FFC=76FF 271768FA 76FFFC76 FF016AF0 76FFF276 FF0024E9 Õ$..v·.vþj..v=.v*h.'.v..v.j..... 000100
260E5EC4 040E4683 D88E0008 881E5657 00001AC8 CBC95F5E 1F0000E9 12^48300 ..á.Õ...^_èùà...WV.|...Ä.F..á^.& 000120
0C76FF27 1468F876 FFFA76FF 0A6A5016 EA468DFA 5689F846 89FE5788 26FC 788 .G=&.W±.F%.V*.Fõ.Pj..v*.v½h.'.v. 000140
80013BE9 F2468800 06E90375 00F27E83 F2468912 C4830000 01989A00 6A0A, FF .v.j.......á..F·.-·.u.Õ...F·Õ;.. 000160
8912C483 000001CA 9A006A0A 76FF0C76 FF271368 F876FFFA 76FF046A 5016F446 F¶.Pj..v*.v½h.'.v..v.j..ò....á.. 000180
1368F876 FFFA76FF 056A5016 EE468D01 09E9F246 880006E9 037500F2 7E83F246 F·.-·.u.Õ...F·Õ...FŸ.Pj..v*.v½h. 0001A0
F2468800 06E90375 00F27E83 F2468912 C4830000 02A19A00 6A0A76FF 0C76FF27 '.v..v.j..Å....á..F·.-·.u.Õ...F· 0001C0
02470826 078826E6 5EC404E6 46830004 E9E85689 E64689F6 5688F446 880007E9 Õ■..F¶.V-.Fl.VòÕ...Fl.á^l&..&.G. 0001E0
```

```
Dump of file SATURN:[PCCOMMON.DUMP.DLL]IFMDML.TMP;1 on 18-APR-1990 10:47:01.12
File ID (704,15,0)   End of file block 124 / Allocated 124

Virtual block number 22 (00000016), 512 (0200) bytes

 890AC483 00000269 9A006A37 FF260277 FF26E65E C4F876FF FA76FF00 2FE90375 u.Ö/..v°.v½á^l&.w.&.7j..i....á.. 000000
 FE5689FC 4689F056 88EE4688 FF8EE900 89E9F246 880006E9 037500F2 7E83F246 F·.-·.u.Ö...F·Ö..Öf..FŸ.VÞ.F=.V± 000020
 26FC5EC4 F876F,FA 76FF002F E9037502 47082607 8826FC5E C404FC46 830004E9 Ö...F=.á^=&..&.G.u.Ö/..v°.V½á^=& 000040
 E9F24688 0006E903 7500F27E 83F24689 0AC48300 00FFFF9A 006A37FF 260277FF .w.&.7j.......á..F·.-·.u.Ö...F·Ö 000060
 006A0A76 FF0C76FF 271968F8 76FFFA76 FF0A6AEA 76FFEC76 FF066AFF 8EE90038 8.Öf.j..vš.vöj..v°.V½h.'.v..v.j. 000080
 C8C8C95F 5E1F0000 E9F24688 0006E903 7500F27E 83F24689 14C48300 0000759A .u....á..F·.-·.u.Ö...F·Ö...^ èùà 0000A0
 FA5689F8 4689FE57 8826FC47 88260E5E C4040E46 83088E01 34881E56 57000008 ...WV.¡4..Ä.F..á^.&.G=&.W±.F℅.V° 0000C0
 FF0F6A0A 76FF0C76 FF0E6AFE 5689FC46 89FE5788 26FC4788 260E5EC4 040E4683 .F..á^.&.G=&.W±.F=.V±j..v..v.j.. 0000E0
 C8C95F5E 1F0000E9 14C48300 0001669A 006AFC76 FFFE76FF 271868F8 76FFFA76 v°.V½h.'.v±.v=j..f....á.Ö...^ èù 000100
 5689F846 89FE5788 26FC4788 260E5EC4 040E4683 D88E02C7 881E5657 000008C8 á...WV.¡ú..Ä.F..á^.&.G=&.W±.F℅.V 000120
 0F6A0A76 FF0C76F, 0E6AFE56 89FC4689 FE578826 FC478826 0E5EC404 0E4683FA °.F..á^.&.G=&.W±.F=.V±j..v..v.j. 000140
 C95F5E1F 0000E914 C4830000 03119A00 6AFC76FF FE76FF27 1968F876 FFFA76FF .v°.V½h.'.v±.v=j.......á.Ö...^ è 000160
 89EE4689 FE578826 FC478826 0E5EC404 0E468308 8E032888 1E565700 0018C8C8 ùà...WV.¡(..Ä.F..á^.&.G=&.W±.FŸ. 000180
 89FE5788 26FC4788 260E5EC4 040E4683 F64689FE 4788260E 5EC4020E 4683F056 VÞ.F..á^.&.G±.F-.F..á^.&.G=&.W±. 0001A0
 5EC4040E 4683F456 89F24689 FE578826 FC478826 0E5EC404 0E4683EA 5689E846 FÖ.Vö.F..á^.&.G=&.W±.F·.V¶.F..á^ 0001C0
 EA76FF44 0068EE76 FFF076FF 5016F846 8DFE5689 FC4689FE 578826FC 4788260E .&.G=&.W±.F=.V±.F½.P.vÞ.vŸh.D.vö 0001E0

Dump of file SATURN:[PCCOMMON.DUMP.DLL]IFMDML.TMP;1 on 18-APR-1990 10:47:01.12
File ID (704,15,0)   End of file block 124 / Allocated 124

Virtual block number 23 (00000017), 512 (0200) bytes

 830080E9 EC468800 06E90375 00EC7E83 EC468910 C4830000 049C9A00 6AE876FF .vÖj.......á..Fš.-š.u.Ö...FšÖ... 000000
 6A006AF2 76FFF476 FF0075E9 998D8800 06E90375 37F67E83 000FE903 7536F67E —6u.Ö...--7u.Ö..¡§.Öu..v¶.v·j.j 000020
 76FFFE76 FFEE76FF F076FFF8 76FFFA76 FF006A00 6A006A00 6A006A00 6A006A00 .j.j.j.j.j.j.j..v°.v½.vÞ.vŸ.v±.v 000040
 002CE9EC 46880006 E9037500 EC7E83EC 468926C4 830000FF FF9A006A F676FFFC •.v-j.......á&.Fš.-š.u.Ö...FšÖ,. 000060
 00000372 9A006AF8 76FFFA76 FF27EA68 EE76FFF0 76FF37FF 260277FF 26FC5EC4 á^=&.w.&.7.vÞ.vŸhö'.v°.v½j..r... 000080
 0E468308 8E0389B8 1E565700 0008C8C8 C95F5E1F 0000E9EC 4688EC46 8910C483 .á..Fš.FšÖ...^ èùà...WV.¡...Ä.F. 0000A0
 578826FC 4788260E 5EC4040E 4683FA56 89F84689 FE578826 FC478826 0E5EC404 .á^.&.G=&.W±.F℅.V°.F..á^.&.G=&.W 0000C0
 0A76FF0C 76FF2718 68F876FF FA76FF05 6AFC76FF FE76FF03 6AFE5689 FC4689FE ±.F=.V±j..v±.v=j..v°.V½h.'.v..v. 0000E0
 4683D88E 0489881E 56570000 08C8C8C9 5F5E1F00 00E914C4 83000004 069A006A j.......á.Ö...^ èùà...WV.¡¿..Ä.F 000100
 8826FC47 88260E5E C4040E46 83FA5689 F84689FE 578826FC 4788260E 5EC4040E ..á^.&.G=&.W±.F℅.V°.F..á^.&.G=&. 000120
 76FF0C76 FF271868 F876FFFA 76FF046A FC76FFFE 76FF046A FE5689FC 4689FE57 W±.F=.V±j..v±.v=j..v°.V½h.'.v..v 000140
 83D88E05 1A881E56 57000008 C8C8C95F 5E1F0000 E914C483 00000503 9A006A0A .j.......á.Ö...^ èùà...WV.¡...Ä. 000160
 26FC4788 260E5EC4 040E4683 FE5689FC 4689FE57 8826FC47 88260E5E C4040E46 F..á^.&.G=&.W±.F=.V±.F..á^.&.G=& 000180
 0A76FF0C 76FF2712 68FC76FF FE76FF01 6AF876FF FA76FFFA 5689F846 89FE5788 .W±.F½.V°.v°.v½j..v±.v=h.'.v..v. 0001A0
 4683D88E 0578881E 56570000 1AC8C8C9 5F5E1F00 00E912C4 83000005 649A006A j..d....á.Ö...^ èùà...WV.¡(..Ä.F 0001C0
 8826FC47 88260E5E C4040E46 83EE5689 EC4689FE 578826FC 4788260E 5EC4040E ..á^.&.G=&.W±.FŠ.VŸ.F..á^.&.G=&. 0001E0

Dump of file SATURN:[PCCOMMON.DUMP.DLL]IFMDML.TMP;1 on 18-APR-1990 10:47:01.12
File ID (704,15,0)   End of file block 124 / Allocated 124

Virtual block number 24 (00000018), 512 (0200) bytes

 F44680E8 5689E646 89FE5788 26FC4788 260E5EC4 040E4683 FA5689F8 4689FE57 W±.F½.V°.F..á^.&.G=&.W±.F|.VÖ.F¶ 000000
 EA468912 C4830000 068E9A00 6A0A76FF 0C76FF27 1368EC76 FFEE76FF 046A5016 .Pj..vŸ.všh.'.v..v.j.......á..Fõ 000020
 46830004 E9FE5689 FC4689F6 5688F446 8800AAE9 EA468800 06E90375 00EA7E83 .-õ.u.Ö...FõÖ'..F¶.V-.F=.V±Ö...F 000040
 1468EC76 FFEE76FF 036A5016 F0468000 60E90375 02470826 078826FC 5EC404FC =.á^=&..&.G.u.Ö'..FÞ.Pj..vŸ.všh. 000060
 03E90375 00EA7E83 EA468912 C4830000 06E99A00 6A37FF26 0277FF26 FC5EC427 'á^=&.w.&.7j..Ö....á..Fõ.-õ.u.Ö. 000080
 C45016E6 46800014 E90374F2 5639001C E90374F0 4639FA56 88F84688 FF8AE900 .Öα..F½.V°9FÞt.Ö..9V·t.Ö...F|.Pá 0000A0
 271568EC 76FFEE76 FFF476FF F676FFFF 80E90000 FFFF9A37 FF260277 FF26FC5E ^=&.w.&.7.....Ö...v-.v¶.vŸ.všh.' 0000C0
 1AC8C8C9 5F5E1F00 00E9EA46 8BEA4689 10C48300 0005C39A 006A0A76 FF0C76FF .v..v.j..ü....á..Fõ.FõÖ...^ èùà. 0000E0
 83EE5689 EC4689FE 578826FC 4788260E 5EC4040E 4683D88E 050A881E 56570000 ..WV.¡Ö..Ä.F..á^.&.G=&.W±.FŠ.VŸ. 000100
 26FC4788 260E5EC4 040E4683 FA5689F8 4689FE57 8826FC47 88260E5E C4040E46 F..á^.&.G=&.W±.F½.V°.F..á^.&.G=& 000120
 1368EC76 FFEE76FF 046A5016 F4468000 0007C726 E65EC4E8 5689E646 89FE5788 .W±.F|.VÖá^|&ú....F¶.Pj..vŸ.všh. 000140
 EA468800 06E90375 00EA7E83 EA468912 C4830000 06369A00 6A0A76FF 0C76FF27 '.v..v.j..6....á..Fõ.-õ.u.Ö...Fõ 000160
 02470826 078826FC 5EC404FC 46830004 E9FE5689 FC4689F6 5688F446 88009CE9 Ö...F¶.V-.F=.V±Ö...F=.á^=&..&.G. 000180
 6A37FF26 0277FF26 FC5EC427 1468EC76 FFEE76FF 036A5016 F0468000 52E90375 u.ÖR..FÞ.Pj..vŸ.všh.'á^=&.w.&.7j 0001A0
 4639FA56 88F84688 FF8AE900 03E90375 00EA7E83 EA468912 C4830000 080F9A00 .......á..Fõ.-õ.u.Ö..Öα..F½.V°9F 0001C0
 EE76FFF4 76FFF676 FFFF9BE9 07FF26E6 5EC40006 E90374F2 5639000E E90374F0 Þt.Ö..9V·t.Ö..á^|&..Ö...v-.v¶.vŸ 0001E0
```

```
Dump of file SATURN:[PCCOMMON.DUMP.DLL]IFMDML.TMP;1 on 18-APR-1990 10:47:01.12
File ID (704,15,0)   End of file block 124 / Allocated 124

Virtual block number 25 (00000019), 512 (0200) bytes

1F0000E9 EA4688E4 468910C4 83000007 6A9A006A 0A76FF0C 76FF2715 68EC76FF .vâh.'.v..v.j..j....á..Fõ.Fõõ... 000000
02C8CBC9 5F5E1F00 00E90856 88064688 D88E0706 881E5657 000000C8 CBC95F5E ^_èuà...WV.|...Ä.F..V.Õ...^_èuà. 000020
026A006A 006A006A 00F6681E 016A556A FFFF68FF FF68D88E 082CB81E 56570000 ..WV.|,..Áh..h..jUj..h-.j.j.j.j. 000040
08480002 0008C8C9 5F5E1F00 00E9FE46 88FE4689 18C48300 00FFFF9A 006A566A jVj.......á..Fz.FzÕ...^_èu....K. 000060
07C20203 00280004 08650203 08240004 084E0005 01DC0007 06CA0203 00000004 ......Ò...Ê...N...$...e...+...Ò. 000080
00000000 005C0004 02180203 00480004 04670203 00000019 08460002 003E0004 ..>...F.......g...K.......\..... 0000A0
5689F846 89FE5788 26FC4788 260E5EC4 040E4683 D88EFFFF 881E5657 000008C8 à...WV.|...Ä.F..á^.&.G=&.Wz.F%.V 0000C0
0F6A0A76 FF0C76FF 116AFE56 89FC4689 FE578826 FC478826 0E5EC404 0E4683FA °.F..á^.&.G=&.Wz.F=.Vzj..v..v.j. 0000E0
C95F5E1F 0000E914 C4830000 FFFF9A00 6AFC76FF FE76FF27 1868F876 FFFA76FF .v°.v%h.'.vz.v=j.......á.Õ...^_è 000100
89F84689 FE578826 FC478826 0E5EC404 0E468308 8E000888 1E565700 0008C8C8 ùà...WV.|...Ä.F..á^.&.G=&.Wz.F%. 000120
6A0A76FF 0C76FF11 6AFE5689 FC4689FE 578826FC 4788260E 5EC4040E 4683FA56 V°.F..á^.&.G=&.Wz.F=.Vzj..v..v.j 000140
5F5E1F00 00E914C4 83000000 529A006A FC76FFFE 76FF2719 68F876FF FA76 F0F ..v°.v%h.'.vz.v=j..R....á.Õ...^_ 000160
F24689FE 578826FC 4788260E 5EC4040E 46830D8E 0069881E 56570000 24C8C4C9 èuà$..WV.|i..Ä.F..á^.&.G=&.Wz.F^ 000180
260E5EC4 040E4683 E65689E4 4689FE57 8826FC47 88260E5E C4040E46 83F45689 .V¶.F..á^.&.G=&.Wz.FÕ.Vl.F..á^.& 0001A0
89FC4689 FE578826 FC478826 0E5EC404 0E4683F8 5689F646 89FE5788 26FC4788 .G=&.Wz.F-.V%.F..á^.&.G=&.Wz.F=. 0001C0
FE76FFF2 76FFF476 FFE25689 E04689FE 578826FC 4788260E 5EC4040E 4683FE56 Vz.F..á^.&.G=&.Wz.FÅ.Vã.v¶.v·.vz 0001E0

Dump of file SATURN:[PCCOMMON.DUMP.DLL]IFMDML.TMP;1 on 18-APR-1990 10:47:01.12
File ID (704,15,0)   End of file block 124 / Allocated 124

Virtual block number 26 (0000001A), 512 (0200) bytes

76FF0329 E9E84688 0006E903 7500003D E8468900 0001709A 5016EE46 8DFC76FF .v=.FŸ.P.p....FÒ=..u.Õ...FÒÕ)..v 000000
880006E9 03750000 30E84689 0000FFFF 9A5016FA 468DF676 FFF876FF F276FFF4 ¶.v·.v%.v-.F°.P......FÒ=..u.Õ... 000020
6A016A00 6A0024E9 0374F856 39002CE9 0374F646 39FE568B FC468803 02E9E846 FÒÕ...F=.Vz9F-t.Õ,.9V%t.Õ$.j.j.j 000040
8302C8E9 E8468800 01E846C7 00000311 9A206A00 6A006A00 6A013868 1E016A00 .j..h8.j.j.j.j .....úFÒ...FÒÕà.. 000060
76FFF476 FF0A6AE4 76FFE676 FF056A02 97E90374 22FA7E83 0009E903 7522EE7E -Ÿ"u.Õ...-°"t.Õ..j..vl.võj..v¶.v 000080
0003E903 7500E87E 83E84689 14C48300 0002109A 006A0A76 FF0C76FF 271868F2 ·h.'.v..v.j.......á..FÒ.-Õ.u.Õ.. 0000A0
0002559A 006A0A76 FF0C76FF 271768F2 76FFF476 FF016AE0 76FFE276 FF026AE9 Õj..vã.vÅj..v¶.v h.'.v..v.j..U.. 0000C0
76FFF876 FF056A00 F8E9FA46 88023AE9 0003E903 7500E87E 83E84689 12C48300 ..á..FÒ.-Õ.u.Õ..Õ:..F°Õ%.j..v%.v 0000E0
83E84689 14C48300 00028A9A 006A0A76 FF0C76FF 271868F2 76FFF476 FF036AF6 -j..v¶.v h.'.v..v.j.......á..FÒ. 000100
1868F276 FFF476FF 036AF676 FFF876FF 056A000E E90202E9 0003E903 7500E87E -Õ.u.Õ..Õ..Õ8.j..v%.v-j..v¶.v·h. 000120
01CDE900 03E90375 00E87E83 E8468914 C4830000 02E39A00 6A0A76FF 0C76FF27 '.v..v.j..D....á..FÒ.-Õ.u.Õ..Õë. 000140
7E83E846 890000FF FF9A5016 F0468006 6AF676FF F876FFF2 76FFF476 FF00A9E9 Õ`..v¶.v·.v%.v-j..FÞ.P......FÒ.- 000160
0A76FF0C 76FF2718 68F276FF F476FF03 6AF676FF F876FF13 6A0035E9 037500F0 Þ.u.Õ5.j..v%.v-j..v¶.v·h.'.v..v. 000180
016A006A 002FE901 74E90003 E9037500 E87E83E8 468914C4 83000003 6E9A006A j..n....á..FÒ.-Õ.u.Õ..Õt.Õ/.j.j. 0001A0
F276FFF4 76FF0000 E846C700 00FFFF9A 206A006A 006A006A 0169681E 016A006A j.j..hi.j.j.j.j .....úFÒ...v¶.v· 0001C0
F8E90375 00213DFF 35E90375 001E3000 18E9001E E9015CE9 E8468800 00FFFF9A ......FÒÕ\.Õ..Õ..=..u.Õ5.=!.u.Õ% 0001E0

Dump of file SATURN:[PCCOMMON.DUMP.DLL]IFMDML.TMP;1 on 18-APR-1990 10:47:01.12
File ID (704,15,0)   End of file block 124 / Allocated 124

Virtual block number 27 (0000001B), 512 (0200) bytes

FFF476FF 046AFC76 FFFE76FF 046A00F8 E9EE4688 0000E9FF 5AE90375 002230FE z=".u.ÕZ.Õ...FŸÕ%.j..vz.v=j..v¶. 000000
03E90375 00E87E83 E8468914 C4830000 00839A00 6A0A76FF 0C76FF27 1868F276 v·h.'.v..v.j..°....á..FÒ.-Õ.u.Õ. 000020
0A76FF0C 76FF2718 68F276FF F476FF04 6AFC76FF FE76FF04 6A000EE9 00E9E900 .ÕÕ.Õ8.j..vz.v=j..v¶.v·h.'.v..v. 000040
FFF476FF 00A9E900 84E90003 E9037500 E87E83E8 468914C4 83000003 FC9A006A j..=....á..FÒ.-Õ.u.Õ..ÕÇ.Õ`..v¶. 000060
0035E903 7500F07E 83E84689 00000287 9A5016F0 4680066A FC76FFFE 76FFF276 v·.vz.v=j..FÞ.P.ñ....FÒ.-Þ.u.Õ5. 000080
000001ED 9A006A0A 76FF0C76 FF271868 F276FFF4 76FF046A FC76FFFE 76FF126A j..vz.v=j..v¶.v·h.'.v..v.j..Û... 0000A0
9F681E01 6A006A01 6A006A00 2FE9005B E90003E9 037500E8 7E83E846 8914C483 .á..FÒ.-Õ.u.Õ..Õ[.Õ/.j.j.j.j..h. 0000C0
46880000 E846C700 0003219A F276FFF4 76FF0000 01809A20 6A006A00 6A006A01 .j.j.j.j .¯....v¶.v·.l...úFÒ...F 0000E0
E9037500 2230FEF8 E9037500 2130FF35 E9037500 1E30001B E9001EE9 0043E9E8 ÕÕC.Õ..Õ..=..u.Õ5.=!.u.Õ%z=".u.Õ 000100
0004359A F276FFF4 76FF0008 E9037500 E87E8398 40E846C7 0005E900 00E9FF5A Z.Õ..Õ..úFÒà..-Õ.u.Õ...v¶.v·.5.. 000120
260E5EC4 040E4683 D88E00CA 881E5657 000036C8 C8C95F5E 1F0000E9 E8468800 ..FÒÕ...^_èuà6..WV.|Ò..Ä.F..á^.& 000140
5016F446 8D036A0A 76FF0C76 FF0C76FF 0E76FFDE 56890C46 89FE5788 26FC478B .G=&.Wz.FË.V8.v8.vÉ.v..v.j..F¶.P 000160
FF0C76FF DC76FFDE 76FF0357 E9004688 0006E903 7500003D D0468900 00FFFF9A ......FÅ=..u.Õ...FÅÕW..v8.vÉ.v.. 000180
FF032EE9 D0468800 06E90375 00003D00 46890000 FFFF9A50 16E04680 046A0A76 v.j..FÅ.P......FÅ=..u.Õ...FÅÕ... 0001A0
0006E903 75000030 D0468900 0005C69A 50160846 8DF476FF F676FFDC 76FFDE76 v8.vÉ.v-.v¶.FÄ.P.ó....FÅ=..u.Õ.. 0001C0
13CE46C7 002CE900 05CE46C7 0034E900 05CE46C7 0021E908 46880307 E9004688 .FÅÕ...FÅÕ!.úFö..Õ4.úFö..Õ,.úFö. 0001E0
```

```
Dump of file SATURN:[PCCOMMON.DUMP.DLL]IFMDML.TMP;1 on 18-APR-1990 10:47:01.12
File ID (704,15,0)   End of file block 124 / Allocated 124

Virtual block number 28 (0000001C), 512 (0200) bytes

 002230FF D7E90375 002130FF D7E90375 001E3000 1BE902E3 E9000188 0024E900 .0$.j..00.0..=..u.0a.=!.u.0a.=". 000000
 9ACE76FF F476FFF6 76FF036A 0A76FF0C 76FFDC76 FFDE76FF FFDCE9FF D7E90375 u.0a.0E..v8.vE.v..v.j..v-.v¶.vö. 000020
 5689F846 89E25688 E0468802 98E90046 880006E9 03750000 30004689 00000639 9....FÅ=..u.0...FÅ0...FÅ.Vã.F%.V 000040
 37FF2602 77FF26F8 5EC4DC76 FFDE76FF 00A5E903 75024708 26078826 F85EC4FA "á^%&..&.G.u.0E..v8.vEá^%&.w.&.7 000060
 21E90A46 880252E9 D0468800 06E90375 00003000 46890000 01499A50 160A4680 .F0.P.I....FÅ=..u.0...FÅ0R..F00! 000080
 E9022EE9 00018800 24E90012 D646C700 2CE90004 D646C700 34E90004 D646C700 .úF..04.úF..0,.úF..0$.j..0..0 0000A0
 DE76FFFF DCE9FFD7 E9037500 2230FFD7 E9037500 2130FFD7 E9037500 1E30001B ..=..u.0a.=!.u.0a.=".u.0a.0E..v8 0000C0
 D0468900 00FFFF9A D676FF37 FF260277 FF26F85E C4046A0A 76FF0C76 FFDC76FF .vE.v..v.j.á^%&.w.&.7.v......FÅ 0000E0
 FFDE76FF 0F6A5016 F0468DFF 4CE904F8 468301DF E9004688 0006E903 75000030 =..u.0...FÅ00..F%.0L..FÞ.Pj..v8. 000100
 06E90375 00007E83 D0468912 C4830000 06F19A00 6A0A76FF 0C76FF27 13680C76 vEh.'.v..v.j..þ....á..FÅ.-Å.u.0. 000120
 078826E4 5EC404E4 46830004 E9E65689 E44689F2 5688F046 8801A6E9 00468800 ..FÅ0!..FÞ.V .F0.V!0...F0.á^0&.. 000140
 0000FFFF 9A006A37 FF260277 FF26E45E C4DC76FF DE76FF00 2FE90375 02470826 &.G.u.0/..v8.vEá^0&.w.&.7j...... 000160
 FF056A50 16EC4680 FF8EE901 58E90046 880006E9 03750000 7E830046 890AC483 .á..FÅ.-Å.u.0...FÅ0X.0/..F$.Pj.. 000180
 7500007E 83004689 12C48300 0007999A 006A0A76 FF0C76FF 2713680C 76FFDE76 v8.vEh.'.v..v.j.......á..FÅ.-Å.u 0001A0
 FC5EC404 FC468300 04E9FE56 89FC4689 EE5688EC 46880123 E9004688 0006E903 .0...FÅ0#..F$.VŸ.F•.V±0...F=.á^= 0001C0
 77FF26FC 5EC4056A 0A76FF0C 76FFDC76 FFDE76FF 0055E903 75024708 26078826 &..&.G.u.0U..v8.vE.v..v.j.á^=&.w 0001E0

Dump of file SATURN:[PCCOMMON.DUMP.DLL]IFMDML.TMP;1 on 18-APR-1990 10:47:01.12
File ID (704,15,0)   End of file block 124 / Allocated 124

Virtual block number 29 (0000001D), 512 (0200) bytes

 DC76FFDE 76FF0027 E90003E9 03750000 7E830046 89000005 809A046A 37FF2602 .&.7j.......FÅ.-Å.u.0..0'..v8.vE 000000
 98E90003 E90003E9 03750000 7E830046 890000FF FF9A37FF 260277FF 26FC5EC4 á^=&.w.&.7......FÅ.-Å.u.0..0..0. 000020
 10C48300 0007C89A 006A0A76 FF0C76FF 2715680C 76FFDE76 FFEC76FF EE76FFFF ..vŸ.v$.v8.vEh.'.v..v.j..à....á. 000040
 FF271468 DC76FFDE 76FF0A6A 50160246 8D007EE9 D0468800 06E90375 00007E83 .-Å.u.0...FÅ0-..F0.Pj..v8.vEh.'. 000060
 4CE90046 880006E9 03750000 7E830046 8912C483 000007FD 9A006A0A 76FF0C76 v..v.j..»....á..FÅ.-Å.u.0...FÅ0L 000080
 0003A39A 006A0A76 FF0C76FF 2719680C 76FFDE76 FF0A6A02 76FFD476 FF056A00 .j..vå.v0j..v8.vEh.'.v..v.j..È.. 0000A0
 FFE276FF DC76FFDE 76FF0017 E9004688 0006E903 7500007E 83004689 14C48300 ..á..FÅ.-Å.u.0...FÅ0...v8.vE.vã. 0000C0
 4683088E 0494881E 56570000 08C8CBC9 5F5E1F00 00E90046 880000FF FF9AE076 vÅ......FÅ0...^_èùà...WV.j...Å.F 0000E0
 8826FC47 88260E5E C4040E46 83FE5689 FC4689FE 578826FC 4788260E 5EC4040E ..á^.&.G=&.W±.F=.V±.F..á^.&.G=&. 000100
 6A0A76FF 0C76FF27 1268FC76 FFFE76FF 016AF876 FFFA76FF FA5689F8 4689FE57 W±.F%.V°.v°.v%j..v±.v=h.'.v..v.j 000120
 06468808 8E083A88 1E565700 0000C8CB C95F5E1F 0000E912 C4830000 066E9A00 ..n....á.0...^_èùà...WV.j:..Å.F. 000140
 6A556AFF FF68FFFF 68088E08 99881E56 57000002 C8CBC95F 5E1F0000 E9085688 .V.0...^_èùà..¯WV.j...Ah..h..jUj 000160
 E9FE4688 FE468918 C4830000 FFFF9A00 6A596A02 6A006A00 6A006A01 D6681E01 ..h•.j.j¯j.j.jŸj.......á..F±.F±0 000180
 00050888 000200E7 00050511 0203000B 00050823 0203000F 90CBC95F 5E1F0000 ...^ èù.....#...Ü.......0...j... 0001A0
 00050300 02030891 0005088B 000500F5 00050768 0203008B 0002042A 01030000 ....¥........k...%...£.......Å... 0001C0
 00040882 020300AC 000504EA 0203012C 0005047D 0203002B 00040802 02030092 ....•...+...)...,...õ...¯....... 0001E0

Dump of file SATURN:[PCCOMMON.DUMP.DLL]IFMDML.TMP;1 on 18-APR-1990 10:47:01.12
File ID (704,15,0)   End of file block 124 / Allocated 124

Virtual block number 30 (0000001E), 512 (0200) bytes

 000406BC 020300CF 00050747 02030000 00190883 00020088 000504C1 0203003E >...è...|...°.......G...ü...¥... 000000
 040E4683 D88EFFFF 881E5657 000012C8 00000000 00000000 00000000 0000005C \...............à...WV.j...Å.F.. 000020
 FE578826 FC478826 0E5EC404 0E4683FA 5689F846 89FE5788 26FC4788 260E5EC4 á^.&.G=&.W±.F%.V°.F..á^.&.G=&.W± 000040
 F476FF04 6AF05689 EE4689FE 578826FC 4788260E 5EC4040E 4683F456 89F24689 .F .V¶.F..á^.&.G=&.W±.FŸ.VÞj..v¶ 000060
 468914C4 83000000 9A9A006A 0A76FF0C 76FF2718 68F876FF FA76FF0C 6AF276FF .v j..v°.v%h.'.v..v.j.......á..F 000080
 1768F876 FFFA76FF 016AEE76 FFF076FF 006EE9F6 46880006 E9037500 F67E83F6 -.--.u.0...F-0n..vÞ.vŸj..v°.v%h. 0000A0
 F6468800 06E90375 00F67E83 F6468912 C4830000 FFFF9A00 6A0A76FF 0C76FF27 '.v..v.j.......á..F-.--.u.0...F- 0000C0
 FF9A006A 6C6A5016 FC4680F8 76FFFA76 FF0A76FF 0C76FFEE 76FFF076 FF0038E9 0;..vÞ.vŸ.v..v..v°.v%.F•.Pj!j... 0000E0
 5E1F0000 E9F6468? 0006E9F6 46880006 E9037500 F67E83F6 468914C4 830000FF ....á..F-.--.u.0...F-0...F-0...^ 000100
 4689EC46 890000?? F04689F2 46890000 88088E00 08881E56 57000022 C8CBC95F èùà"..WV.j...Åj...F .FÞj...F&.F 000120
 8DF65689 F44689FE 578826FC 4788260E 5EC4040E 4683E246 89E44689 000088EA 0|...F0.Fã.F..á^.&.G•&.W±.F¶.V-. 000140
 8912C483 0000170D 9A006A0A 76FF0C76 FF271468 F476FFF6 76FF0C6A 5016E646 F|.Pj..v-.v¶h.'.v..v.j..)....á.. 000160
 76FFF676 FF0C6AE6 76FFE876 FF046A02 0EE9EE46 880006E9 037500EE 7E83EE46 FŸ.-Ÿ.u.0...FŸ0..j..v0.v|j..v-.v 000180
 0006E903 7500EE7E 83EE4689 14C48300 0001AF9A 006A0A76 FF0C76FF 271968F4 ¶h.'.v..v.j..£....á..FŸ.-Ÿ.u.0.. 0001A0
 DE9A006A 0A76FF0C 76FF2713 68F476FF F676FF04 6A5016F0 46800109 E9EE4688 .FŸ0)..FÞ.Pj..v-.v¶h.'.v..v.j..8 0001C0
 FFF676FF 056A5016 EA468001 50E90003 E9037500 EE7E83EE 468912C4 83000001 ....á..FŸ.-Ÿ.u.0..0P..F0.Pj..v-. 0001E0
```

```
Dump of file SATURN:[PCCOMMON.DUMP.DLL]IFMDML.TMP;1 on 18-APR-1990 10:47:01.12
File ID (704,15,0)   End of file block 124 / Allocated 124

Virtual block number 31 (0000001F), 512 (0200) bytes

 03E90375 00EE7.83 EE468912 C4830000 02819A00 6A0A76FF 0C76FF27 1368F476 v¶h.'.v..v.j..Ÿ....á..FŸ.-Ÿ.u.Ô. 000000
 47082607 8826DE5E C404DE46 830004E9 E05689DE 4689F256 88F04688 0121E900 .Ôl..FÞ.V·.FB.VÀÔ...FB.á^B&..&.G 000020
 00027F9A 006A37FF 260277FF 26DE5EC4 F476FFF6 76FF006A 006A0030 E9037502 .u.Ô0.j.j..v-.v¶á^B&.w.&.7j..... 000040
 89FC4689 EC5688EA 4688FF8D E90002E9 0003E903 7500EE7E 83EE4689 0EC48300 ..á..FŸ.-Ÿ.u.Ô..Ô0.Ô§..FÔ.V&.F=. 000060
 FFF676FF 006A006A 0030E903 75024708 26078826 FC5EC404 FC468300 04E9FE56 V±Ô...F=.á^=&..&.G.u.Ô0.j.j..v-. 000080
 E9037500 EE7E83EE 46890EC4 83000002 FC9A006A 37FF2602 77FF26FC 5EC4F476 v¶á^=&.w.&.7j..=....á..FŸ.-Ÿ.u.Ô 0000A0
 006A0A76 FF0C76FF 271368F4 76FFF676 FF126A50 16E2468D FF8DE900 80E90003 ..Ô..Ô§..Fã.Pj..v-.v¶h.'.v..v.j. 0000C0
 F84689E4 5688E246 88004EE9 0003E903 7500EE7E 83EE4689 12C48300 0000679A .g....á..FŸ.-Ÿ.u.Ô..ÔN..Fã.VÔ.F½ 0000E0
 C4F476FF F676FF00 2CE90375 02470826 078826F8 5EC404F8 46830004 E9FA5689 .V°Ô...F½.á^½&..&.G.u.Ô,..v-.v¶á 000100
 E90003E9 037500EE 7E83EE46 890AC483 0000FFFF 9A006A37 FF260277 FF26F85E ^½&.w.&.7j.......á..FŸ.-Ÿ.u.Ô..Ô 000120
 0003499A E276FFE4 76FFF476 FFF676FF 0011E903 75E44608 E24688FF C1E90003 ..Ôè..Fã.FÔu.Ô...v-.v¶.vÔ.vã.I.. 000140
 F0468800 0003659A EA76FFEC 76FFF476 FFF676FF 0011E903 75EC4608 EA468800 ..FÔ.F$u.Ô...v-.v¶.v$.vÔ.e....FÞ 000160
 1F0000E9 EE468800 00FFFF9A F076FFF2 76FFF476 FFF676FF 0011E903 75F24608 .F·u.Ô...v-.v¶.v·.vÞ......FŸÔ... 000180
 89FE5788 26FC4788 260E5EC4 040E4683 D88E00FB 881E5657 000008C8 CBC95F5E ^ èùà...WV.¡«..Ä.F..á^.&.G=&.W±. 0001A0
 FF0C76FF 136AFE56 89FC4689 FE578826 FC478826 0E5EC404 0E4683FA 5689F846 F½.V°.F..á^.&.G=&.W±.F=.V±j..v.. 0001C0
 0000E914 C4830000 01489A00 6AFC76FF FE76FF27 1868F876 FFFA76FF 0F6A0A76 v.j..v°.v½h.'.v±.v=j..H....á.Ô.. 0001E0

Dump of file SATURN:[PCCOMMON.DUMP.DLL]IFMDML.TMP;1 on 18-APR-1990 10:47:01.12
File ID (704,15,0)   End of file block 124 / Allocated 124

Virtual block number 32 (00000020), 512 (0200) bytes

 FE578826 FC4788,  0E5EC404 0E468308 8E037C88 1E565700 0008C8C8 C95F5E1F .^ èùà...WV.¡|..Ä.F..á^.&.G=&.W± 000000
 0C76FF13 6AFE566v FC4689FE 578826FC 4788260E 5EC4040E 4683FA56 89F84689 .F½.V°.F..á^.&.G=&.W±.F=.V±j..v. 000020
 00E914C4 83000003 C69A006A FC76FFFE 76FF2719 68F876FF FA76FF0F 6A0A76FF .v.j..v°.v½h.'.v±.v=j..6....á.Ô. 000040
 578826FC 4788260E 5EC4040E 4683088E 0300881E 56570000 18C8C8C9 5F5E1F00 ..^ èùà...WV.¡¡..Ä.F..á^.&.G=&.W 000060
 FC478826 0E5EC404 0E4683F6 4689FE47 88260E5E C4020E46 83F05689 EE4689FE ±.FŸ.VÞ.F..á^.&.G±.F-.F..á^.&.G= 000080
 83F45689 F24689FE 578826FC 4788260E 5EC4040E 4683EA56 89E84689 FE578826 &.W±.FÔ.VÔ.F..á^.&.G=&.W±.F·.V¶. 0000A0
 68EE76FF F076FF50 16F8468D FE5689FC 4689FE57 8826FC47 88260E5E C4040E46 F..á^.&.G=&.W±.F=.V±.F½.P.vÞ.vŸh 0000C0
 46880006 E9037500 EC7E83EC 468910C4 83000006 459A006A E876FFEA 76FF4400 .Ô.vÔ.vÔj..E....á..F&.-&.u.Ô...F 0000E0
 006A006A 006A006A 006A006A 006A006A F276FFF4 76FF0110 E9F6468B 0181E9EC &Ô...F-Ô...v¶.v·j.j.j.j.j.j.j.j. 000100
 0005409A 006A3B6A FC76FFFE 76FFEE76 FFF076FF F876FFFA 76FF006A 006A006A j.j.j..v°.v½.vÞ.vŸ.v±.v=j;j..M.. 000120
 006A006A 006A006A 006A006A 006A006A F276FFF4 76FF0100 E9EC4689 2AC48300 ..á°.F$Ô...v¶.v·j.j.j.j.j.j.j.j. 000140
 0005899A 006A396A FC76FFFE 76FFEE76 FFF076FF F876FFFA 76FF006A 006A006A j.j.j..v°.v½.vÞ.vŸ.v±.v=j9j..... 000160
 006A006A 006A006A 006A006A 006A006A F276FFF4 76FF00C0 E9EC4689 2AC48300 ..á°.F$Ôà..v¶.v·j.j.j.j.j.j.j.j. 000180
 26C48300 0005E19A 006A3A6A FC76FFFE 76FFEE76 FFF076FF F876FFFA 76FF006A j..v°.v½.vÞ.vŸ.v±.v=j:j..Ä....á& 0001A0
 006A006A 006A006A 006A006A 006A006A 006A006A F276FFF4 76FF0084 E9EC4689 .F$Ô...v¶.v·j.j.j.j.j.j.j.j.j.j. 0001C0
 F876FFFA 76FFFF6A 006A006A 006A006A 006A006A 006A006A 006A006A 006A006A j.j.j.j.j.j.j.j.j.j.j.j.j..v°.v½ 0001E0

Dump of file SATURN:[PCCOMMON.DUMP.DLL]IFMDML.TMP;1 on 18-APR-1990 10:47:01.12
File ID (704,15,0)   End of file block 124 / Allocated 124

Virtual block number 33 (00000021), 512 (0200) bytes

 8D88002C E9EC4689 42C48300 0000CF9A 006A3C6A FC76FFFE 76FFEE76 FFF076FF .vÞ.vŸ.v±.v=j<j..ü....áB.F$Ô,.¡§ 000000
 3DFEC8E9 03750038 3DFF53E9 0375003A 3DFF18E9 03750039 300023E9 0061E999 .Ôa.Ô#.=9.u.Ô..=:.u.ÔS.=;.u.Ôu±= 000020
 0277FF26 FC5EC400 2CE9EC46 880006E9 037500EC 7E83FFD4 E9FF7FE9 0375003C <.u.Ô..Ôá..-$.u.Ô...F$Ô,.á^=&.w. 000040
 88EC4689 10C48300 0004279A 006AF876 FFFA76FF 27EA68EE 76FFF076 FF37FF26 &.7.vÞ.vŸhõ'.v°.v½j..'....á..F&. 000060
 4788260E 5EC4040E 4683D88E 043E881E 56570000 08C8C8C9 5F5E1F00 00E9EC46 F$Ô...^ èùà...WV.¡>..Ä.F..á^.&.G 000080
 FE5689FC 4689FE57 8826FC47 88260E5E C4040E46 83FA5689 F84689FE 578826FC =&.W±.F½.V°.F..á^.&.G=&.W±.F=.V± 0000A0
 000004B8 9A006A0A 76FF0C76 FF271868 F876FFFA 76FF056A FC76FFFE 76FF036A j..v±.v=j..v°.v½h.'.v..v.j..E... 0000C0
 88260E5E C4040E46 83D88E06 62881E56 57000008 C8C8C95F 5E1F0000 E914C483 .á.Ô...^ èùà...WV.¡b..Ä.F..á^.&. 0000E0
 5689FC46 89FE5788 26FC4788 260E5EC4 040E4683 FA5689F8 4689FE57 8826FC47 G=&.W±.F½.V°.F..á^.&.G=&.W±.F=.V 000100
 0006AC9A 006A0A76 FF0C76FF 271868F8 76FFFA76 FF046AFC 76FFFE76 FF046AFE ±j..v±.v=j..v°.v½h.'.v..v.j..¯.. 000120
 260E5EC4 040E4683 D88E06C3 881E5657 000008C8 CBC95F5E 1F0000E9 14C48300 ..á.Ô...^_èùà...WV.¡û..Ä.F..á^.& 000140
 89F84689 FE578826 FC478826 0E5EC404 0E4683FE 5689FC46 89FE5788 26FC4788 .G=&.W±.F=.V±.F..á^.&.G=&.W±.F½. 000160
 00000700 9A006A0A 76FF0C76 FF271268 FC76FFFE 76FF016A F876FFFA 76FFFA56 V°.v°.v½j..v±.v=h.'.v..v.j...... 000180
 88260E5E C4040E46 83D88E07 24881E56 57000012 C8C8C95F 5E1F0000 E912C483 .á.Ô...^_èùà...WV.¡$..Ä.F..á^.&. 0001A0
 5689F646 89FE5788 26FC4788 260E5EC4 040E4683 F45689F2 4689FE57 8826FC47 G=&.W±.F¯.V¶.F..á^.&.G=&.W±.F-.V 0001C0
 FF271268 F276FFF4 76FF116A 5016FA46 8DFE4689 FE478826 0E5EC402 0E4683F8 ½.F..á^.&.G±.F±.F°.Pj..v¶.v·h.'. 0001E0
```

```
Dump of file SATURN:[PCCOMMON.DUMP.DLL]IFMDML.TMP;1 on 18-APR-1990 10:47:01.12
File ID (704,15,0)   End of file block 124 / Allocated 124

Virtual block number 34 (00000022), 512 (0200) bytes

 56E9F046 8B0006E9 037500F0 7E83F046 8912C483 0000076C 9A006A0A 76FF0C76 v..v.j..l....á..FÞ.-Þ.u.Õ...FÞÕV 000000
 8B001DE9 0377EE46 39FE468B EE468940 082A01AA 9AFA76FF FC76FF0A 6A006A00 .j.j..v•.v•.`.•.ª.FŸ.F±9FŸw.Õ... 000020
 1EFA76FF 083C0182 9A5016FA 46805000 6AE001C1 03E0D1E0 D1C88BFE 4628EE46 FŸ+F±.àlÁlÁ.èlÁj.P.F•.P...<..v•. 000040
 00000EC8 CBC95F5E 1F0000E9 0000880A C483FFFF 01029AF6 76FFF876 FF01FA68 h•..v½.v-......á.j..Õ...^_èùà... 000060
 FC4680F6 5689F446 89FE5788 26FC4788 260E5EC4 040E4683 D88E0783 881E5657 WV.j...Ä.F..á^.&.G=&.W±.F¶.V-.F= 000080
 F2468912 C4830000 08889A00 6A0A76FF 0C76FF27 1468F476 FFF676FF 0C6A5016 .Pj..v-.v¶h.'.v..v.j..j....á..F· 0000A0
 FF271268 F476FFF6 76FF196A 5016F846 8000C7E9 F2468800 06E90375 00F27E83 .-·.u.Õ...F·Õú..F½.Pj..v-.v¶h.'. 0000C0
 95E9F246 8B0006E9 037500F2 7E83F246 8912C483 000008FF 9A006AFC 76FFFE76 v±.v=j.......á..F·.-·.u.Õ...F·Õ. 0000E0
 F676FF11 6A5016F8 46800000 FFFF9A24 6AF476FF F676FF00 FA568301 F8468300 ..F½..V•..v-.v¶j$......F½.Pj..v- 000100
 E9037500 F27E83F2 468912C4 83000009 3C9A006A 0A76FF0C 76FF2717 68F476FF .v¶h.'.v..v.j..<....á..F·.-·.u.Õ 000120
 F476FFF6 76FF1\ A 5016F846 800043E9 F2468800 00094D9A F476FFF6 76FF0011 ...v-.v¶.M....F·ÕC..F½.Pj..v-.v¶ 000140
 00FFFF9A F476FFF6 76FFF246 8912C483 000007D8 9A006AFC 76FFFE76 FF271768 h.'.v±.v=j..Ä....á..F·.v-.v¶.... 000160
 5700001A C8C8C95F 5E1F0000 E90000B8 0006E9F2 46880006 E9037500 F27E8300 ..-·.u.Õ...F·Õ..j..Õ...^_èùà...W 000180
 040E4683 EE5689EC 4689FE57 8826FC47 88260E5E C4040E46 83088E08 54881E56 V.jT..Ä.F..á^.&.G=&.W±.F§.VŸ.F.. 0001A0
 FE578826 FC478826 0E5EC404 0E4683FA 5689F846 89FE5788 26FC4788 260E5EC4 á^.&.G=&.W±.F½.V•.F..á^.&.G=&.W± 0001C0
 279A006A 0A76FF0C 76FF2713 68EC76FF EE76FF04 6A5016F4 4680E856 89E64689 .Fl.VÕ.F¶.Pj..vŸ.všh.'.v..v.j..' 0001E0

Dump of file SATURN:[PCCOMMON.DUMP.DLL]IFMDML.TMP;1 on 18-APR-1990 10:47:01.12
File ID (704,15,0)   End of file block 124 / Allocated 124

Virtual block number 35 (00000023), 512 (0200) bytes

 4689F656 88F4468B 00AAE9EA 46880006 E9037500 EA7E83EA 468912C4 8300000A ....á..Fõ.-õ.u.Õ...FõÕ`..F¶.V-.F 000000
 6A5016F0 46800060 E9037502 47082607 8826FC5E C404FC46 830004E9 FE5689FC =.V±Õ...F=.á^=&..&.G.u.Õ'..FÞ.Pj 000020
 468912C4 8300000A 829A006A 37FF2602 77FF26FC 5EC42714 68EC76FF EE76FF03 ..vŸ.všh.'á^=&.w.&.7j.......á..F 000040
 0374F256 39001CE9 0374F046 39FA5688 F8468BFF 8AE90003 E9037500 EA7E83EA õ.-õ.u.Õ..Õo..F½.V•9FÞt.Õ..9V·t. 000060
 F476FFF6 76FFFF8C E90000FF FF9A37FF 260277FF 26FC5EC4 5016E646 800014E9 Õ...Fl.Pá^=&.w.&.7.....Õ...v-.v¶ 000080
 E9EA4688 EA468910 C4830000 08869A00 6A0A76FF 0C76FF27 1568EC76 FFEE76FF .vŸ.všh.'.v..v.j.......á..Fõ.FõÕ 0000A0
 8826FC47 88260E5E C4040E46 83088E09 73881E56 5700001A C8CBC95F 5E1F0000 ...^_èùà...WV.js..Ä.F..á^.&.G=&. 0000C0
 0E4683FA 5689F846 89FE5788 26FC4788 260E5EC4 040E4683 EE5689EC 4689FE57 W±.F§.VŸ.F..á^.&.G=&.W±.F½.V•.F. 0000E0
 6A5016F4 46800000 07C726E6 5EC4E856 89E64689 FE578826 FC478826 0E5EC404 .á^.&.G=&.W±.Fl.VÕá^l&ú....F¶.Pj 000100
 EA7E83EA 468912C4 83000008 589A006A 0A76FF0C 76FF2713 68EC76FF EE76FF04 ..vŸ.všh.'.v..v.j..[....á..Fõ.-õ 000120
 C404FC46 830004E9 FE5689FC 4689F656 88F4468B 009CE9EA 46880006 E9037500 .u.Õ...FõÕ...F¶.V-.F=.V±Õ...F=.á 000140
 5EC42714 68EC76FF EE76FF03 6A5016F0 46800052 E9037502 47082607 8826FC5E ^=&..&.G.u.ÕR..FÞ.Pj..vŸ.všh.'á^ 000160
 8AE90003 E9037500 EA7E83EA 468912C4 83000008 A89A006A 37FF2602 77FF26FC =&.w.&.7j..`....á..Fõ.-õ.u.Õ..Õo 000180
 FF9BE907 FF26E65E C40006E9 0374F256 39000EE9 0374F046 39FA5688 F8468BFF ..F½.V•9FÞt.Õ..9V·t.Õ..á^l&..Õ.. 0001A0
 8910C483 000009CF 9A006A0A 76FF0C76 FF271568 EC76FFEE 76FFF476 FFF676FF .v-.v¶.vŸ.všh.'.v..v.j..u....á.. 0001C0
 E9085688 06468808 8E0A9F88 1E565700 0000C8CB C95F5E1F 0000E9EA 4688EA46 Fõ.FõÕ...^_èùà...WV.j...Ä.F..V.Õ 0001E0

Dump of file SATURN:[PCCOMMON.DUMP.DLL]IFMDML.TMP;1 on 18-APR-1990 10:47:01.12
File ID (704,15,0)   End of file block 124 / Allocated 124

Virtual block number 36 (00000024), 512 (0200) bytes

 FE681E01 6A556AFF FF68FFFF 68088E08 C5881E56 57000002 C8CBC95F 5E1F0000 ...^_èùà...WV.jé..Äh..h..jUj..h± 000000
 5E1F0000 E9FE4688 FE468918 C4830000 FFFF9A00 6A586A02 6A006A00 6A006A01 .j.j.j.j.jXj.......á..F±.F±Õ...^ 000020
 02030000 000608E4 000201DC 00070A63 02030008 00050320 0203000C 90CBC95F _èù.....·...Ü...c...Ê...Õ....... 000040
 0002003E 00040803 02030000 001707FE 00020028 000408FE 02030073 00050919 ....s...±...+...±...........>... 000060
 0005005C 00040220 02030144 000608E2 0203004B 00040500 02030000 00190B0F Õ...........K...à...D...-...\... 000080
 89000088 088EFFFF 881E5657 00000EC8 00000000 00000000 000008BD 000608E7 Õ...§...........à...WV.j...Äj... 0000A0
 5EC4040E 4683FA56 89F84689 FE578826 FC478826 0E5EC404 0E4683F2 4689F446 F¶.F·.F..á^.&.G=&.W±.F½.V•.F..á^ 0000C0
 4689FE57 8826FC47 88260E5E C4040E46 83FE5689 FC4689FE 578826FC 4788260E .&.G=&.W±.F=.V±.F..á^.&.G=&.W±.F 0000E0
 9A006A0A 76FF0C76 FF271868 F876FFFA 76FF026A FC76FFFE 76FF126A F45689F2 ·.V¶j..v±.v=j..v•.v½h.'.v..v.j.. 000100
 6AF276FF F476FF00 39E9F646 880006E9 037500F6 7E83F646 8914C483 000000A3 È....á..F-.—.u.Õ...F-Õ9..v¶.v·j 000120
 F67E83F6 468912C4 830000FF FF9A006A 0A76FF0C 76FF2717 68F876FF FA76FF01 ..v•.v½h.'.v..v.j.......á..F-.-- 000140
 08881E56 5700001A C8C8C95F 5E1F0000 E9F6468B 0006E9F6 46880006 E9037500 .u.Õ...F-Õ...F-Õ...^_èùà...WV.j. 000160
 EA468DF2 5689F046 8vFE5788 26FC4788 260E5EC4 040E4683 0000EE46 C7D88E00 ..AúfŸ...F..á^.&.G=&.W±.FÞ.V·.Fõ 000180
 EE468912 C4830000 013B9A00 6A0A76FF 0C76FF27 1468F076 FFF276FF u. 45016 .Pj..v·.vÞh.'.v..v.j..;....á..FŸ 0001A0
 68F076FF F276FF02 6AEA76FF EC76FF12 6A01BDE9 EE468800 06E90375 00t 7E83 .-Ÿ.u.Õ...FŸÕ§.j..vš.võj..v·.vÞh 0001C0
 46880006 E9037500 EE7E83EE 468914C4 83000001 6D9A006A 0A76FF0C 76FF2719 .'.v..v.j..m....á..FŸ.-Ÿ.u.Õ...F 0001E0
```

Dump of file SATURN:[PCCOMMON.DUMP.DLL]IFMDML.TMP;1 on 18-APR-1990 10:47:01.12
File ID (704,15,0)    End of file block 124 / Allocated 124

Virtual block number 37 (00000025), 512 (0200) bytes 0002129A 006A0A76 FF0C76FF 271368F0 76FFF276 FF036A50 16E6468D 0188E9EE YÖ...Fl.Pj..v·.vÞh.'.v..v.j..... 000000
0001EC9A E676FFc8 76FFF076 FFF276FF 0017E903 7500EE7E 83EE4689 12C48300 ..á..FY.-Y.u.Ö...v·.vÞ.vÒ.vl.ã.. 000020
078826F8 5EC404F8 46830004 E9FA5689 F84689E8 5688E646 880145E9 EE468800 ..FYÖE..Fl.VÒ.F%.V¹Ö...F%.á^%&.. 000040
00000271 9A006A37 FF260277 FF26F85E C4F076FF F276FF00 40E90375 02470826 &.G.u.Öa..v·.vÞá^%&.w.&.7j..q... 000060
00000232 9AE676FF E876FFF0 76FFF276 FF0017E9 037500EE 7E83EE46 890AC483 .á..FY.-Y.u.Ö...v·.vÞ.vÒ.vl.2... 000080
6A0A76FF 0C76FF27 1368F076 FFF276FF 046A5016 FC4680FF ADE900E6 E9EE4688 .FYÖl.ÖU..F•.Pj..v·.vÞh.'.v..v.j 0000A0
76FFFE76 FFF076FF F276FF00 17E90375 00EE7E83 EE468912 C4830000 00709A00 ..p....á..FY.-Y.u.Ö...v·.vÞ.vz.v 0000C0
C404F446 830004E9 F65689F4 4689FE56 88FC4688 00A0E9EE 46880000 02919AFC •......FYÖ...F•.Vz.F¶.V-Ö...F¶.á 0000E0
006A37FF 260277FF 26F45EC4 F076FFF2 76FF0040 E9037502 47082607 8826F45E ^¶&..&.G.u.Öa..v·.vÞá^¶&.w.&.7j. 000100
FC76FFFE 76FFF076 FFF276FF 0017E903 7500EE7E 83EE4689 0AC48300 00FFFF9A ......á..FY.-Y.u.Ö...v·.vÞ.vz.v= 000120
FFF076FF F276FF00 11E90375 FE4608FC 4688FFAD E90041E9 EE468800 0002869A .Ñ....FYÖA.ÖU..F•.Fzu.Ö...v·.vÞ. 000140
76FFE876 FFF076FF F276FF00 11E90375 E84608E6 46880000 02D29AFC 76FFFE76 vz.v•.•....Fl.FÖu.Ö...v·.vÞ.vÖ.v 000160
06468808 8E00CF88 1E565700 0000C8C8 C95F5E1F 0000E9EE 46880000 FFFF9AE6 l......FYÖ...^_èùà...WV.jü..A.F. 000180
6A306AFF FF68FFFF 68088E02 E9881E56 57000002 C8C8C95F 5E1F0000 E9085688 .V.Ö...^_èùà...WV.jÖ..Äh..h..jÖj 0001A0
E9FE4688 FE468918 C4830000 FFFF9A00 6A6C6A02 6A006A00 6A006A02 4C681E01 ..hL.j.j.j.j.jlj.......á..Fz.FzÖ 0001C0
00070308 00050000 00070308 0002000B 0005018D 02030007 90C8C95F 5E1F0000 ...^_èù.........Ü............... 0001E0

Dump of file SATURN:[PCCOMMON.DUMP.DLL]IFMDML.TMP;1 on 18-APR-1990 10:47:01.12
File ID (704,15,0)    End of file block 124 / Allocated 124

Virtual block number 38 (00000026), 512 (0200) bytes

000401CC 02030000 00190303 0002003E 00040106 0203002B 00040322 020302E1 Ä...".......>............ä... 000000
040E4683 D88EFFFF 881E5657 000066C8 00000000 00000000 00000000 0000005C \..............âf..WV.j...Ä.F.. 000020
FE578826 FC478826 0E5EC404 0E4683AA 5689A846 89FE5788 26FC4788 260E5EC4 á^.&.G=&.Wz.F`.V`.F..á^.&.G=&.Wz 000040
C4040E46 83A65689 A44689FE 578826FC 4788260E 5EC4040E 46838256 89804689 .F`.Vý.F..á^.&.G=&.Wz.FÉ.Vl.F..á 000060
271468A8 76FFAA76 FF0C6A50 16A0468D 9C56899A 4689FE57 8826FC47 88260E5E ^.&.G=&.Wz.F..V..F..Pj..v`.v`h.' 000080
E99E4688 0006E903 75009E7E 839E4689 12C48300 0000AE9A 006A9A76 FF0C76FF .v..v.j..Ü....á..F..-..u.Ö...F.Ö 0000A0
010A9A00 6AB076FF B276FF27 1868A876 FFAA76FF 036A0A76 FF0C76FF 026A1131 l.j..v..v.j..v`.v`h.'.vý.v`j.... 0000C0
A676FFA8 76FFAA76 FF00FCE9 9E468800 06E90375 009E7E83 9E468914 C4830000 ...á..F..-..u.Ö...F.Ö•..v`.v`.vl 0000E0
D2E99E46 880006E9 0375009E 7E839E46 890000FF FF9A5016 B4468D02 6AA476FF .vÉj..FÇ.P.......F..-..u.Ö...F.Ö• 000100
C4830000 01449A00 6A0A76FF 0C76FF27 1768A876 FFAA76FF 016A5016 B4468D00 ..FÇ.Pj..v`.v`h.'.v..v..j..D....á 000120
A476FFA6 76FF1A6A 5016AC46 8D00ADE9 9E468800 06E90375 009E7E83 9E468912 ..F..-..u.Ö...F.Ö...F`.Pj..vl.vÉ 000140
7E839E46 8918C483 000001B3 9A006AA0 76FFA276 FF272068 A876FFAA 76FF166A j..v`.v`h.'.vÄ.v.j..°.....á..F..- 000160
76FFA076 FFA276FF 002FE903 74AE460B AC468800 66E99E46 880006E9 0375009E ..u.Ö...F.Öf..F`.Füt.Ö/..vÄ.v..v 000180
C4830000 FFFF9A00 6A736A50 16AC468D A876FFAA 76FF0A76 FF0C76FF A476FFA6 l.vÉ.v..v..v`.v`.F`.Pjsj.......á 0001A0
AC76FFAE 76FF2718 68A876FF AA76FF05 6A0A76FF 0C76FF04 6A0026E9 9E468918 ..F.Ö&.j..v..v.j..v`.v`h.'.vÜ.v` 0001C0
881E5657 00001AC8 C8C95F5E 1F0000E9 9E46889E 468914C4 830000FF FF9A006A j.......á..F..F.Ö...^_èùà...WV.j 0001E0

Dump of file SATURN:[PCCOMMON.DUMP.DLL]IFMDML.TMP;1 on 18-APR-1990 10:47:01.12
File ID (704,15,0)    End of file block 124 / Allocated 124

Virtual block number 39 (00000027), 512 (0200) bytes

89FA4689 00008BEE 5689EC46 89FE5788 26FC4788 260E5EC4 040E4683 D88E0008 ...A.F..á^.&.G=&.Wz.Fš.VYj...F°. 000000
76FF0C76 FF271468 EC76FFEE 76FF026A 5016FC46 80F44689 F6468900 008BF846 F%j...F-.F¶.F•.Pj..vY.všh.'.v..v 000020
FF036A01 79E9E646 880006E9 037500E6 7E83E646 8912C483 00000249 9A006A0A .j..l.....á..Fl.-l.u.Ö...FlÖy.j.. 000040
14C48300 00027B9A 006A0A76 FF0C76FF 271968EC 76FFEE76 FF026AFC 76FFFE76 vz.v•j..vY.všh.'.v..v.j..(....á. 000060
68EC76FF EE76FF03 6A5016F8 46800144 E9E64688 0006E903 7500E67E 83E64689 .Fl.-l.u.Ö...FlÖÖ..F%.Pj..vY.všh 000080
46880006 E9037500 E67E83E6 468912C4 83000002 FE9A006A 0A76FF0C 76FF2713 .'.v..v.j..z......á..Fl.-l.u.Ö...F 0000A0
47082607 8826F05E C404F046 830004E9 F25689F0 4689FA56 88F84688 0112E9E6 lÖ...F%.V°.FÞ.V·Ö...FÞ.á^Þ&..&.G 0000C0
0AC48300 00034C9A 006A37FF 260277FF 26F05EC4 EC76FFEE 76FF002F E9037502 .u.Ö/..vY.všá^Þ&.w.&.7j..L.....á. 0000E0
FFEE76FF 076A5016 F4468DFF 8EE900C4 E9E64688 0006E903 7500E67E 83E64689 .Fl.-l.u.Ö...FlÖá.Ö/..F¶.Pj..vY. 000100
06E90375 00E67E83 E6468912 C4830000 00799A00 6A0A76FF 0C76FF27 1368EC76 všh.'.v..v.j..y.....á..Fl.-l.u.Ö. 000120
078826E8 5EC404E8 46830004 E9EA5689 E84689F6 5688F446 88008FE9 E6468800 ..FlÖ...F¶.V-.FÖ.VöÖ...FÖ.á^Ö&.. 000140
0000FFFF 9A006A37 FF260277 FF26E85E C4EC76FF EE76FF00 2FE90375 02470826 &.G.u.Ö/..vY.všá^Ö&.w.&.7j....... 000160
0375FA46 08F84688 FFBEE900 41E9E646 880006E9 037500E6 7E83E646 890AC483 .á..Fl.-l.u.Ö...FlÖA.Ö/..F%.F°u. 000180
E90375F6 460BF446 88E64689 0000039F 9AF876FF FA76FFEC 76FFEE76 FF0014E9 Ö...vY.vš.v°.v%......Fl.F¶.F-u.Ö 0001A0
57000012 C8C8C95F 5E1FE646 890000FF FF9AF476 FFF676FF EC76FFEE 76FF0014 ...vY.vš.v-.v¶......Fl.^_èùà...W 0001C0
040E4683 F65689F4 4689FE57 8826FC47 88260E5E C4040E46 83D88E01 D0881E56 V.jÄ...A.F..á^.&.G=&.Wz.F¶.V-.F.. 0001E0

```
Dump of file SATURN:[PCCOMMON.DUMP.DLL]IFMDML.TMP;1 on 18-APR-1990 10:47:01.12
File ID (704,15,0)   End of file block 124 / Allocated 124

Virtual block number 40 (00000028), 512 (0200) bytes

 1468F476 FFF676FF 046A5016 FC468DF0 5689EE46 89FE5788 26FC4788 260E5EC4 á^.&.G=&.Wt.FŸ.VÞ.F=.Pj..v-.v¶h. 000000
 F2468800 06E90375 00F27E83 F2468912 C4830000 02149A00 6A0A76FF 0C76FF27 '.v..v.j.......á..F·.-·.u.Õ...F· 000020
 000003FA 9A006AFC 76FFFE76 FF271468 F476FFF6 76FF026A 5016F846 8D0051E9 ÕQ..F%.Pj..v-.v¶h.'.vt.v=j..*... 000040
 76FFFA76 FFF476FF F676FF00 1FE9F246 880006E9 037500F2 7E83F246 8912C483 .á..F·.-·.u.Õ...F·Õ...v-.v¶.v*.v 000060
 1E565700 0058C8CB C95F5E1F 0000E9F2 46890000 00089AEE 76FFF076 FF026AF8 %j..vÞ.vŸ.Ü....F·Õ...^_èüàX..WV. 000080
 5EC4040E 4683FA56 89F84689 FE578826 FC478826 0E5EC404 0E468308 8E038388 ¡°..Ä.F..á^.&.G=&.Wt.F%.V*.F..á^ 0000A0
 4689FE57 8826FC47 88260E5E C4040E46 83F65689 F44689FE 578826FC 4788260E .&.G=&.Wt.F¶.V-.F..á^.&.G=&.Wt.F 0000C0
 83000004 2C9A006A 0A76FF0C 76FF271C 68F876FF FA76FF50 16A84680 FE5689FC =.Vt.F`.P.v*.v½h.'.v..v.j..,.... 0000E0
 FFFF9AFC 76FFFE76 FF5016A8 468DF476 FFF676FF 0000FFFF 9A5016A8 468D10C4 á..F`.P......v-.v¶.F`.P.vt.v=... 000100
 FFF476FF F676FF02 54680000 05169AFC 76FFFE76 FFF476FF F676FF02 15680000 ..h...v-.v¶.vt.v=.....hT..v-.v¶. 000120
 8E0471B8 1E565700 000EC8CB C95F5E1F 0000E900 00880000 FFFF9AFC 76FFFE76 vt.v=.....¡..Õ...^_èüà...WV.¡q.. 000140
 4788260E 5EC4040E 4683FA56 89F84689 FE578826 FC478826 0E5EC404 0E4683D8 Ä.F..á^.&.G=&.Wt.F%.V*.F..á^.&.G 000160
 76FF0C76 FF271468 F876FFFA 76FF046A 5016FC46 8DF65689 F44689FE 578826FC =&.Wt.F¶.V-.F=.Pj..v*.v½h.'.v..v 000180
 F676FF00 2AE9F246 890006E9 037500F2 7E83F246 8912C483 000005A7 9A006A0A .j..Ì....á..F·.-·.u.Õ...F·Õ*..v- 0001A0
 468912C4 83000004 C89A006A FC76FFFE 76FF2714 68F876FF FA76FF02 6AF476FF .v¶j..v*.v½h.'.vt.v=j..ù....á..F 0001C0
 00E90856 88064688 D88E052D B81E5657 000000C8 C8C95F5E 1F0000E9 F2468BF2 ·.F·Õ...^_èüà...WV.¡-..Ä.F..V.Õ. 0001E0

Dump of file SATURN:[PCCOMMON.DUMP.DLL]IFMDML.TMP;1 on 18-APR-1990 10:47:01.12
File ID (704,15,0)   End of file block 124 / Allocated 124

Virtual block number 41 (00000029), 512 (0200) bytes

 0276681E 016A306A FFFF68FF FF68088E 05C4B81E 56570000 02C8C8C9 5F5E1F00 ..^_èüà...WV.¡á..Äh..h..j0j..hv. 000000
 5F5E1F00 00E9FE46 8BFE4689 18C48300 00FFFF9A 006A6D6A 026A006A 006A006A j.j¯j.j.jmj.......á..Ft.FtÕ...^_ 000020
 05E30002 015C0006 05020203 00080005 03800203 01510006 04EE0203 000CCBC9 èü....Ÿ...Q.......Ü.......\...D¯ 000040
 05FD0203 058C0008 05E60005 00920005 045A0203 01710006 04D80203 00000008 ......Å...q...Z.......Ì...¥...». 000060
 02C90203 00480004 018A0203 00000019 05DE0002 003E0004 05740203 00280004 ..+...t...>...ß...........K...è. 000080
 040E4683 D88EFFFF B81E5657 00006CC8 00000000 00000000 00000000 005C0004 ..\.............àl..WV.¡...Ä.F.. 0000A0
 FE578826 FC478826 0E5EC404 0E4683A6 5689A446 89FE5788 26FC4788 260E5EC4 á^.&.G=&.Wt.FÊ.VÌ.F..á^.&.G=&.Wt 0000C0
 C4040E46 83AA5689 A84689FE 578826FC 4788260E 5EC4040E 4683A256 89A04689 .F..VÅ.F..á^.&.G=&.Wt.F`.V`.F..á 0000E0
 76FF0000 9846C7AC 4689AE46 89000088 96568994 4689FE57 8826FC47 88260E5E ^.&.G=&.Wt.F..V.¡...FÜ.F¯úF....v 000100
 880006E9 03750000 309A4689 0000FFFF 9A501680 468DA076 FFA276FF A476FFA6 Ì.vÊ.vÅ.v..F¯.P......F.=..u.Õ... 000120
 76FF2718 68A476FF A676FF04 6A0A76FF 0C76FF04 6A007EE9 80468801 CCE99A46 F.Õa..F¯Õ~.j..v..v.j..vÌ.vÊh.'.v 000140
 0191E99A 46880006 E9037500 9A7E839A 468914C4 83000000 EF9A006A A076FFA2 Å.v.j..y....á..F..-..u.Õ...F.Õ.. 000160
 6F9A006A A076FFA2 76FF2718 68A476FF A676FF03 6A0A76FF 0C76FF04 6A0059E9 ÕY.j..v..v.j..vÌ.vÊh.'.vÅ.v.j..o 000180
 001CE900 01FE46C7 0159E99A 46880006 E9037500 9A7E839A 468914C4 83000001 ....á..F..-..u.Õ...F.ÕY.úFt..Õ.. 0001A0
 FFA676FF FFE4E9FF AAE90375 002A30FF 7AE90375 00293000 13E9014B E90001B8 ¡..ÕK.Õ..=).u.Õz.=*.u.Õ`.Õß..vÌ. 0001C0
 0006E903 75009A7E 839A4689 0000FFFF 9A501682 468D026A A876FFAA 76FFA476 vÊ.v`.v`j..Fý.P......F..-..u.Õ.. 0001E0

Dump of file SATURN:[PCCOMMON.DUMP.DLL]IFMDML.TMP;1 on 18-APR-1990 10:47:01.12
File ID (704,15,0)   End of file block 124 / Allocated 124

Virtual block number 42 (0000002A), 512 (0200) bytes

 109A006A 9476FF96 76FF2714 68A476FF A676FF0C 6A50169C 4680010B E99A468B .F.Õ...F..Pj..vÌ.vÊh.'.v..v.j... 000000
 AA76FF50 16AC4680 0009E99A 46880006 E9037500 9A7E839A 468912C4 83000002 ....á..F..-..u.Õ...F.Õ1..F¯.P.v` 000020
 460BAC46 8B14C483 FFFF0714 9AA476FF A676FF9C 76FF9E76 FF006A00 6AA876FF .v`j.j..v..v..vÌ.vÊ......á..F¯.F 000040
 468DA476 FFA676FF 0A76FF0C 76FFA876 FFAA76FF 9C76FF9E 76FF003E E90374AE Ût.Õ>..v..v..v`.v`.v..v..vÌ.vÊ.F 000060
 70E99A46 880006E9 0375009A 7E839A46 8918C483 0000FFFF 9A006A74 6A5016AC ¯.Pjtj.......á..F..-..u.Õ...F.Õp 000080
 9A006AAC 76FFAE76 FF271868 A476FFA6 76FF056A 0A76FF0C 76FF066A 0035E900 .Õ5.j..v..v.j..vÌ.vÊh.'.vÜ.v¯j.. 0000A0
 016A5016 82468D00 38E99A46 880006E9 0375009A 7E839A46 8914C483 00000242 B....á..F..-..u.Õ...F.Õß..Fý.Pj. 0000C0
 009A7E83 9A468912 C4830000 FFFF9A00 6A0A76FF 0C76FF27 1768A476 FFA676FF .vÌ.vÊh.'.v..v.j.......á..F..-.. 0000E0
 0008881E 56570000 18C8C8C9 5F5E1F00 00E90000 880006E9 9A468800 06E90375 u.Õ...F.Õ..¡..Õ...^_èüà...WV.¡.. 000100
 F45689F2 4689FE57 8826FC47 88260E5E C4040E46 83EE4689 F0468900 0088D88E .Ä¡...FÞ.FŸ.F..á^.&.G=&.Wt.F·.V¶ 000120
 12C48300 0003139A 006A0A76 FF0C76FF 271468F2 76FFF476 FF046A50 16EE4680 .FŸ.Pj..v¶.v·h.'.v..v.j.......á. 000140
 F476FF00 80E90375 F0460BEE 468801BA E9EC4688 0006E903 7500EC7E 83EC4689 .Fš.-š.u.Õ...FšÕa..FŸ.FÞu.Õ¯..v¶ 000160
 8CE90003 E9037500 0030EC46 89000000 809A5016 FE468DEE 76FFF076 FFF276FF .v·.vÞ.vŸ.Ft.P......Fš=..u.Õ..Õ. 000180
 EE76FFF0 76FF2719 68F276FF F476FF04 6A0A76FF 0C76FF02 6A0073E9 FE468B00 ..FtÕs.j..v..v.j..v¶.v·h.'.vÞ.vŸ 0001A0
 6A004EE9 0150E9EC 46880006 E9037500 EC7E83EC 468914C4 83000003 4B9A006A j..K....á..Fš.-š.u.Õ...FšÕP.ÕN.j 0001C0
 83000000 B79A006A EE76FFF0 76FF2719 68F276FF F476FF03 6A0A76FF 0C76FF03 ..v..v.j..v¶.v·h.'.vÞ.vŸj..ñ.... 0001E0
```

```
Dump of file SATURN:[PCCOMMON.DUMP.DLL]IFMDML.TMP;1 on 18-APR-1990 10:47:01.12
File ID (704,15,0)   End of file block 124 / Allocated 124

Virtual block number 43 (0000002B), 512 (0200) bytes

 E9037500 29300C13 E90016E9 0118E9EC 46880006 E9037500 EC7E83EC 468914C4 á..F$.-$.u.Ö...F$Ö..Ö..Ö..=).u.Ö 000000
 0C76FF27 1468F276 FFF476FF 066A5016 FA468000 00E9FF85 E9037500 2A3DFF85 ..=*.u.Öç.Ö...F*.Pj..v¶.v·h.'.v. 000020
 08FA4688 0030E900 03E90375 00EC7E83 EC468912 C4830000 03039A00 6A0A76FF .v.j..&....á..F$.-$.u.Ö..Ö=..F*. 000040
 0A76FF0C 76FF2719 68F276FF F476FF06 6AFA76FF FC76FF05 6A0032E9 0375FC46 F•u.Ö2.j..v•.v*j..v¶.v·h.'.v..v. 000060
 096A5016 F6468000 00E90003 E9037500 EC7E83EC 468914C4 83000002 A99A006A j..`....á..F$.-$.u.Ö..Ö...F-.Pj. 000080
 88F64688 EC468912 C4830000 03969A00 6A0A76FF 0C76FF27 1368F276 FFF476FF .v¶.v·h.'.v..v.j.......á..F$.F-. 0000A0
 76FF002C E9037502 47082607 8826E85E C404E846 830004E9 EA5689E8 4689F856 V½.FÖ.VöÖ...FÖ.á^Ö&..&.G.u.Ö,..v 0000C0
 7500EC7E 83EC4689 0AC48300 00FFFF9A 006A37FF 260277FF 26E85EC4 F276FFF4 ¶.v·á^Ö&.w.&.7j.......á..F$.-$.u 0000E0
 76FFF876 FFF276FF F476FF00 11E90375 F84608F6 4688FFC1 E90003E9 0003E903 .Ö..Ö..Öè..F-.F¥u.Ö...v¶.v·.v½.v 000100
 0E468308 8E026E88 1E565700 000EC8C8 C95F5E1F 0000E9EC 46880000 FFFF9AF6 -......F$Ö...^_èùà...WV.in..Ä.F. 000120
 578826FC 4788260E 5EC4040E 4683FA56 89F84689 FE578826 FC478826 0E5EC404 .á^.&.G=&.W±.F½.V*.F..á^.&.G=&.W 000140
 9A006A0A 76FF0C76 FF271468 F876FFFA 76FF066A 5016FC46 80F45689 F24689FE ±.F·.V¶.F=.Pj..v*.v½h.'.v..v.j.. 000160
 FFF276FF F476FF00 22E9F646 880006E9 037500F6 7E83F646 8912C483 00000501 .....á..F-.--.u.Ö...F-Ö"..v¶.v·. 000180
 C8C95F5E 1F0000E9 10C48300 0004029A 006AFC76 FFFE76FF 271C68F8 76FFFA76 v*.v½h.'.v±.v•j.......á.Ö...^_èù 0001A0
 5689F246 89FE5788 26FC4788 260E5EC4 040E4683 088E0489 881E5657 000064C8 àd..WV.i...A.F..á^.&.G=&.W±.F¯.V 0001C0
 4788260E 5EC4040E 4683EA56 89E84689 FE578826 FC478826 0E5EC404 0E4683F4 ¶.F..á^.&.G=&.W±.FÖ.Vö.F..á^.&.G 0001E0

Dump of file SATURN:[PCCOMMON.DUMP.DLL]IFMDML.TMP;1 on 18-APR-1990 10:47:01.12
File ID (704,15,0)   End of file block 124 / Allocated 124

Virtual block number 44 (0000002C), 512 (0200) bytes

 76FF0C76 FF271468 F276FFF4 76FF076A 5016FC46 80F85689 F64689FE 578826FC =&.W±.F-.V½.F=.Pj..v¶.v·h.'.v..v 000000
 FFF676FF F876FF00 20E90375 FE4608FC 4688EC46 8912C483 000005AC 9A006A0A .j..¯....á..F$.F=.F±u.Ö·..V½.v-. 000020
 000005CF 9A006AFC 76FFFE76 FF271A68 F276FFF4 76FF006A 020468E8 76FFEA76 vö.vÖh..j..v¶.v·h.'.v±.v=j..ü... 000040
 FF9A006A 0A76FF0C 76FF2714 68F276FF F476FF04 6A5016EE 4680012F E918C483 .á.Ö/..F¥.Pj..v¶.v·h.'.v..v.j... 000060
 F476FF50 16FA468D 00FDE9EC 46880006 E9037500 EC7E83EC 468912C4 83000005 ....á..F$.-$.u.Ö...F$Ö»..F*.P.v¶ 000080
 E9037500 EC7E83EC 468910C4 83000006 359A006A EE76FFF0 76FF2716 68F276FF .v·h.'.vÞ.v¥j..5....á..F$.-$.u.Ö 0000A0
 FFF076FF 271C68F2 76FFF476 FF50169C 468D00AE E9FA4688 00C0E9EC 46880006 ...F$Öe..F*ÖU..F..P.v¶.v·h.'.vÞ. 0000C0
 46800097 E9EC4688 0006E903 7500EC7E 83EC4689 10C48300 0006999A 006AEE76 v¥j.......á..F$.-$.u.Ö...F$Ö...F 0000E0
 15680000 06BF9AF6 76FFF876 FF50169C 4680E876 FFEA76FF 000006A9 9A50169C ..P.`....vö.vÖ.F..P.v½.v-.¢...h. 000100
 271C68F2 76FFF476 FF50169C 46800000 FFFF9AF6 76FFF876 FFE876FF EA76FF02 ..vö.vÖ.v½.v-......F..P.v¶.v·h.' 000120
 EA76FF00 00FFFF9A 50169C46 80EC4689 10C48300 0004009A 006A0A76 FF0C76FF .v..v.j..Å....á..F$.F..P......vö 000140
 75002930 0013E900 1CE90000 880000FF FF9AF676 FFF876FF 50169C46 80E876FF .vÖ.F..P.v½.v-.....i..Ö..Ö..=).u 000160
 56570000 0EC8C8C9 5F5E1F00 00E90000 88FFE4E9 FF42E903 75002A30 FFAEE903 .ÖÜ.=*.u.Ö8.Öð.i..Ö...^_èùà...WV 000180
 C4040E46 83FE5689 FC4689FE 578826FC 4788260E 5EC4040E 46830088E 0518881E .i...Ä.F..á^.&.G=&.W±.F=.V±.F..á 0001A0
 271468FC 76FFFE76 FF066A50 16F84680 F45689F2 4689FE57 8826FC47 88260E5E ^.&.G=&.W±.F·.V¶.F½.Pj..v±.v•h.' 0001C0
 E9F64688 0006E903 7500F67E 83F64689 12C48300 00076C9A 006A0A76 FF0C76FF .v..v.j..l....á..F-.--.u.Ö...F-Ö 0001E0

Dump of file SATUPN:[PCCOMMON.DUMP.DLL]IFMDML.TMP;1 on 18-APR-1990 10:47:01.12
File ID (704,15,0:   End of file block 124 / Allocated 124

Virtual block number 45 (0000002D), 512 (0200) bytes

 00000574 9A006AF8 76FFFA76 FF271468 FC76FFFE 76FF026A F276FFF4 76FF002A *..v¶.v·j..v±.v•h.'.v*.v½j..t... 000000
 06468808 8E06F288 1E565700 0000C8C8 C95F5E1F 0000E9F6 4688F646 8912C483 .á..F-.F-Ö...^_èùà...WV.i`..Ä.F. 000020
 6A306AFF FF68FFFF 68D88E07 89881E56 57000002 C8C8C95F 5E1F0000 E908568B .V.Ö...^_èùà..¯WV.i...Äh..h..jÖj 000040
 E9FE468B FE468918 C4830000 FFFF9A00 6A6E6A02 6A006A00 6A006A02 9A681E01 ..h..j.j.j.j.jnj.......á..F±.F±Ö 000060
 0006067E 020300D8 00050472 02030151 0006066A 0203000E 90C8C95F 5E1F0000 ...^_èù.....j...Q...r...Ü..~... 000080
 000907A8 00020781 000907AB 00050171 00060654 020300E7 000502DF 0203015C \...Ö...Ö...T...q............... 0000A0
 00040739 02030028 000407C2 02030092 00050140 02030000 000C01A6 00020000 ....¦.......a.......ö...+...9... 0000C0
 00000000 0000005C 00040441 02030048 00040108 02030000 001907A3 0002003E >...È.......Ä...K...A...\....... 0000E0
 88000086 46C79A46 899C4689 00008800 04EA46C7 088EFFFF 881E5657 00007CC8 à|..WV.i...ÄúFö..i...F..F.úF...i 000100
 0E46838C 56898A46 89FE5788 26FC4788 260E5EC4 040E4683 92468994 46890000 ...F..F..F..á^.&.G=&.W±.F..V..F. 000120
 578826FC 478826GE 5EC4040E 46839056 898E4689 FE578826 FC478826 0E5EC404 .á^.&.G=&.W±.F..V..F..á^.&.G=&.W 000140
 FC478826 0E5EC404 0E4683F0 4689FE47 88260E5E C4020E46 83EE5689 EC4689FE ±.F$.V¥.F..á^.&.G±.FÞ.F..á^.&.G= 000160
 0C76FF27 18688A76 FF8C76FF 026A8E76 FF9076FF 0F6AFE56 89FC4689 FE578826 &.W±.F=.V±j..v..v.j..v..v.h.'.v. 000180
 FF0374E9 84468800 06E90375 00847E83 84468914 C4830000 00F49A00 6A0A76FF .v.j..¶....á..F..~..u.Ö...F.Öt.. 0001A0
 50169E46 80FFFF04 389A5016 9E4680EC 76FFEE76 FF8E76FF 9076FF8A 76FF8C76 v..v..v..v..v¥.vš.F..P.B....F..P 0001C0
 7E838446 8912C483 00000126 9A006A0A 76FF0C76 FF271768 8A76FF8C 76FF016A j..v..v.h.'.v..v.j..&....á..F..- 0001E0
```

```
Dump of file SATURN:[PCCOMMON.DUMP.DLL]IFMDML.TMP;1 on 18-APR-1990 10:47:01.12
File ID (704,15,0)   End of file block 124 / Allocated 124

Virtual block number 46 (0000002E), 512 (0200) bytes

9076FF27 13688A76 FF8C76FF 046A5016 92468003 26E98446 880006E9 03750084 ..u.Ō...F.Ō&..F..Pj..v..v.h.'.v. 000000
C402F4E9 8446E80C 06E90375 00847E83 84468912 C4830000 01679A00 6A8E76FF .v.j..g....á..F..~..u.Ō...F.Ō¶.á 000020
76FF2715 688A76FF 8C76FF92 76FF9476 FF985689 96468902 57882607 8826925E ^.&..&.W..F..V..v..v..v..v.h.'.v 000040
02B3E984 46880006 E9037500 847E8384 468910C4 83000001 999A006A 8E76FF90 ..v.j.......á..F..~..u.Ō...F.Ō°. 000060
12C48300 0001D59A 006A8E76 FF9076FF 2714688A 76FF8C76 FF036A50 16F8468D .F½.Pj..v..v.h.'.v..v.j..f....á. 000080
0C76FF00 22E90375 FE4608FC 46880281 E9844688 0006E903 7500847E 83844689 .F..~..u.Ō...F.Ō...F=.F±u.Ō"..v. 0000A0
88844689 10C48300 0002159A 006AFC76 FFFE76FF 27FF688A 76FF8C76 FF0A76FF .v..v..v.h.'.v±.v=j.......á..F.. 0000C0
76FFFA76 FF0A76FF 0C76FF50 16FC468D 002FE903 74FE4608 FC468801 E4E9F046 FÞŌŌ..F•.F±t.Ō/..F•.P.v..v..v•.v 0000E0
FF844689 1AC48300 0002749A 006A9676 FF9876FF 43F8688A 76FF8C76 FF366AF8 ½j6.v..v.h«C.v..v.j..t....á..F.. 000100
0006E903 7500003D 84468900 0002CD9A 50168846 809676FF 9876FF8A 76FF8C76 v..v..v..v..F..P.ë....F.=..u.Ō.. 000120
9676FF98 76FF0A76 FF0C76FF 5016F246 80002FE9 03742288 7E8301ED E9844688 .F.ŌÚ..-."t.Ō/..F·.P.v..v..v..v. 000140
5BE98446 891AC483 00000281 9A006AF8 76FFFA76 FF43FB68 8A76FF8C 76FF376A j7.v..v.h«C.v•.v½j..Ÿ....á..F.Ō( 000160
FF376A96 76FF9876 FF0A76FF 0C76FF50 16FC4680 002FE903 74FE4608 FC468801 ..F•.F±t.Ō/..F•.P.v..v..v..v.j7. 000180
76FF8C76 FF844689 1AC48300 0003109A 006AF876 FFFA76FF 43FB688A 76FF8C76 v..v.h«C.v•.v½j.......á..F..v..v 0001A0
E9844688 0006E903 75000030 84468900 00032F9A 5016F646 80F876FF FA76FF8A ..v•.v½.F-.P./....F.=..u.Ō...F.Ō 0001C0
76FF366A F876FFFA 76FF0A76 FF0C76FF 5016F246 80002FE9 037422F6 7E830151 Q..—"t.Ō/..F·.P.v..v..v•.v½j6.v 0001E0

Dump of file SATURN:[PCCOMMON.DUMP.DLL]IFMDML.TMP;1 on 18-APR-1990 10:47:01.12
File ID (704,15,0)   End of file block 124 / Allocated 124

Virtual block number 47 (0000002F), 512 (0200) bytes

8C76FF00 8FE98446 891AC483 0000037E 9A006A96 76FF9876 FF43FB68 8A76FF8C ..v.h«C.v..v.j..-....á..F.Ō¢..v. 000000
46880006 E9037500 00308446 890000FF FF9A5016 F64680F8 76FFFA76 FF8A76FF .v..v•.v½.F-.P......F.=..u.Ō...F 000020
0C76FF50 16FC468D 0030E903 74FE4608 FC468800 3EE90374 22F67E83 00EFE984 .Ōÿ..--"t.Ō>..F•.F±t.ŌO..F•.P.v. 000040
038C9A00 6A9676FF 9876FF43 FB688A76 FF8C76FF F076FFF8 76FFFA76 FF0A76FF .v..v•.v½.vÞ.v..v.h«C.v..v.j..¥. 000060
76FF0C76 FF5016FC 46800030 E90374FE 4608FC46 88003BE9 8446891A C4830000 ...á..F.Ō;..F•.F±t.ŌO..F•.P.v..v 000080
0000FFFF 9A006AF8 76FFFA76 FF43FB68 8A76FF8C 76FFF076 FF9676FF 9876FF0A ..v..v..vÞ.v..v.h«C.v•.v½j...... 0000A0
FF8C76FF FF41E9FE A8E90375 00373DFE 14E90375 00363000 13E98446 891AC483 .á..F.Ō..=6.u.Ō.±=7.u.Ō´±ŌA..v.. 0000C0
0C76FF8A 76FF8C76 F.844689 0000040B 9A5016EA 46800A6A 0A76FF0C 76FF8A76 v..v..v.j..Fõ.P......F..v..v..v. 0000E0
096A0A76 FF0C76FF 8A76FF8C 76FF8446 89000004 269A5016 9A468D08 C.0A76FF .v.j..F..P.&....F..v..v..v..v.j. 000100
881E5657 00005CC8 C8C95F5E 1F0000E9 84468884 46890000 FFFF9A50 16.'468D .F..P......F..F.Ō...^_èùà\..WV.¡ 000120
76FF1276 FF1476FF 0000AA46 C70001FE 46C70001 FC46C700 00A846C7 0B8L.1008 ...ÁúF´..úF•..úF±..úF¯...v..v..v 000140
0375D008 A65689A4 4689AE56 88AC4688 0000FFFF 9A5016AC 46800F6A 0E76FF10 ..v.j..F¯.P......F¯.VÚ.FÊ.VÎ.Åu. 000160
26A45EC4 04A44683 0004E900 00880003 E90001B8 0006E903 7400AA7E 83000FE9 Ō...-´.t.Ō..¡..Ō..¡..Ō...FÊ.á^Ê& 000180
80468001 6A37FF26 0277FF26 A45EC412 76FF1476 FF0068E9 03750247 08260788 ..&.G.u.Ōh..v..v.á^Ê&.w.&.7j..F¯ 0001A0
76FF5016 80468D00 D7E9A846 880006E9 037500A8 7E83A846 890000FF FF9A5016 .P......F´.~´.u.Ō...F´Ō=..F¯.P.v 0001C0
0676FF08 76FF0A76 FF0C76FF 001CE903 74000030 08C48305 48008C9A 0A76FF0C ..v....K..á.=..t.Ō...v..v..v..v. 0001E0

Dump of file SATURN:[PCCOMMON.DUMP.DLL]IFMDML.TMP;1 on 18-APR-1990 10:47:01.12
File ID (704,15,0)   End of file block 124 / Allocated 124

Virtual block number 48 (00000030), 512 (0200) bytes

26AC5EC4 0051E903 7401AA7E 83FF85E9 0001AA46 C7A84689 0000FFFF 9AFC76FF .v=......F´úF´..Ō...-´.t.ŌQ.á^¯& 000000
FF0876FF 00000592 9AAC76FF AE76FF12 76FF1476 FF0011E9 03750247 08260788 ..&.G.u.Ō...v..v..vÛ.v¯......v.. 000020
FF0C76FF 0E76FF10 76FF1276 FF1476FF 08C48305 A500569A 0A76FF0C 76FF0676 v..v..v..V.Ê..á..v..v..v..v..v.. 000040
02470826 07882 6AC 5EC40034 E9037400 AA7E8300 D904389A 0676FF08 76FF0A76 v..v..v..8.1..-´.t.Ō4.á^¯&..&.G. 000060
FF0876FF 0A76FF0C 76FF0000 FFFF9AAC 76FFAE76 FF1276FF 1476FF00 11E90375 u.Ō...v..v..vÛ.v¯......v..v..v.. 000080
40881E56 57000022 C80010CA C95F5E1F 0000E900 008808C4 83FFFF00 569A0676 v..V....á.¡..Ō...^_èò..á"..WV.¡@ 0000A0
FF026A5? 16EC468D EA5689E8 4689FE57 8826FC47 88260E5E C4040E46 83088E04 ..Á.F..á^.&.G=&.W±¯FŌ.VŌ.F&.Pj.. 0000C0
7500E7? 830E4689 12C483?? 0006319A 006A0A76 FF0C76FF 271468E8 76FFEA76 vŌ.vÒh.'.v..v.j..1....á..F8.-8.u 0000E0
FF026AEC 76FFEE76 FF0F6A00 26E90375 EE4608EC 46880285 E90E4688 0006E903 .Ō...F8Ō...F&.FŸu.Ō&.j..v¥.v§j.. 000100
7500DE7E 830E4689 14C48300 0006639A 006A0A76 FF0C76FF 271968E8 76FFEA76 vŌ.vÒh.'.v..v.j..c....á..F8.~8.u 000120
0A76FF0C 76FF2715 68E876FF EA76FF03 6A5016F4 46800245 E90E4688 0006E903 .Ō...F8ŌE..F¶.Pj..vŌ.vÒh.'.v..v. 000140
16F046B0 0213E90E 46880006 E9037500 DE7E830E 468912C4 83000006 959A006A j.......á..F8.-8.u.Ō...F8Ō...FÞ. 000160
830E4689 12C48300 0006C09A 006A0A76 FF0C76FF 271368E8 76FFEA76 FF046A50 Pj..vŌ.vÒh.'.v..v.j..á....á..F8. 000180
9A006A0A 76FF0C76 FF271568 E876FFEA 76FFF476 FFF676FF 0025E903 75000E7E -8.u.Ō%..v-.v¶.vŌ.vÒh.'.v..v.j.. 0001A0
04E44683 0004E9E6 5687E446 89F65688 F4468801 C2E90E46 8810C483 000000A6 Ì....á..F8Ōó..F¶.V-.FŌ.VÌŌ...FŌ. 0001C0
6A37F?26 0277FF26 E45EC4E8 76FFEA76 FF002CE9 03750247 08260788 26E45EC4 á^Ō&..&.G.u.Ō,..vŌ.vŌá^Ō&.w.&.7j 0001E0
```

```
Dump of file SATURN:[PCCOMMON.DUMP.DLL]IFMOML.TMP;1 on 18-APR-1990 10:47:01.12
File ID (704,15,0)   End of file block 124 / Allocated 124

Virtual block number 49 (00000031), 512 (0200) bytes

 5688F046 88FFC1F9 0051E900 03E90375 000E7E83 DE46890A C4830000 07509A00 ..P....á..FB.~B.u.Õ..Õq.Õè..FÞ.V 000000
 EA76FF00 2CE90375 024700B26 078B26E0 5EC404E0 46830004 E9E25689 E04689F2 ·.FÂ.VäÕ...FÂ.á^Â&..&.G.u.Õ,..vð 000020
 0375000E 7E830E46 890AC483 0000FFFF 9A006A37 FF260277 FF26E05E C4ι`76FF .vÕá^Â&.w.&.7j.......á..FB.~B.u. 000040
 006A0A76 FF0C76FF 271568E8 76FFEA76 FFF476FF F676FFFF C1E90003 E90G ЗE9 Õ..Õ..Õë..v-.v¶.vð.vÕh.'.v..v.j. 000060
 9A006A0A 76FF0C76 FF271568 E876FFEA 76FFF076 FFF276FF 10C48300 0005F`9A .þ....á..v·.vÞ.vð.vÕh.'.v..v.j.. 000080
 EA76FF07 6A5016F8 46800009 E9DE4688 0006E903 75000E7E 8310C483 000007CF ü....á..~B.u.Õ...FBÕ\..F½.Pj..vð 0000A0
 E9037500 DE7E83DE 468912C4 83000008 269A006A 0A76FF0C 76FF2713 68E876FF .vÕh.'.v..v.j..&....á..FB.~B.u.Õ 0000C0
 8826FC5E C404FC46 830004E9 FE5689FC 4689FA56 88F84688 00A7E9DE 46880006 ...FBÕÎ..F½.V°.F•.V±Õ...F•.á^•&. 0000E0
 0277FF26 FC5EC428 0268E876 FFEA76FF 0A76FF0C 76FF0060 E9037502 47082607 .&.G.u.Õ'..v..v..vð.vÕh.(á^•&.w. 000100
 76FF106A 002EE900 03E90375 000E7E83 DE468910 C4830000 07819A00 6A37FF26 &.7j.......á..FB.~B.u.Õ..Õ..j..v 000120
 75000E7E 83DE4689 0CC48300 0007029A 006A37FF 260277FF 26FC5EC4 E876FFEA õ.vÕá^•&.w.&.7j.......á..FB.~B.u 000140
 6A0A76FF 0C76FF27 1568E876 FFEA76FF F876FFFA 76FFFF8D E90003E9 0003E903 .Õ..Õ..Õ...v°.v½.vð.vÕh.'.v..v.j 000160
 088E058F 881E5657 00005CC8 CBC95F5E 1F0000E9 DE468810 C4830000 07A09A00 .......á..FBÕ...^_èùà\..WV.¡¢..Á 000180
 FC478826 0E5EC404 0E4683F6 5689F446 89FE5788 26FC4788 260E5EC4 040E4683 .F..á^.&.G•&.W±.F¶.V-.F..á^.&.G• 0001A0
 68FA5689 F84689FE 578826FC 4788260E 5EC4040E 4683F256 89F04689 FE578826 &.W±.FÞ.V·.F..á^.&.G•&.W±.F½.V°h 0001C0
 F476FFF6 76FF026A 5016FC46 80000009 6C9AF876 FFFA76FF F076FFF2 76FF0284 ...v·.vÞ.v°.v½.l....F•.Pj..v-.v¶ 0001E0

Dump of file SATURN:[PCCOMMON.DUMP.DLL]IFMOML.TMP;1 on 18-APR-1990 10:47:01.12
File ID (704,15,0)   End of file block 124 / Allocated 124

Virtual block number 50 (00000032), 512 (0200) bytes

 468D003E E90375FE 4608FC46 8812C483 00000935 9A006A0A 76FF0C76 FF271468 h.'.v..v.j..5....á..F•.F±u.Õ>..F 000000
 16A4468D 10C48300 0009879A 006AFC76 FFFE76FF 271C68F4 76FFF676 FF5016A4 Ê.P.v-.v¶h.'.v±.v•j.......á..FÊ. 000020
 FF021568 000009AA 9AF876FF FA76FF50 16A4468D F076FFF2 76FF0000 09949A50 P......v·.vÞ.FÊ.P.v°.v½.`...h... 000040
 76FF271C 68F476FF F676FF50 16A4468D 0000FFFF 9AF876FF FA76FFF0 76FFF276 v·.vÞ.v°.v½......FÊ.P.v-.v¶h.'.v 000060
 468DF076 FFF276FF 0000FFFF 9A5016A4 468D10C4 83000008 829A006A 0A76FF0C ..v.j.......á..FÊ.P......v·.vÞ.F 000080
 1E565700 0004C8C8 C95F5E1F 0000E900 00880000 FFFF9AF8 76FFFA76 FF5016A4 Ê.P.v°.v½.....¡..Õ...^_èùà...WV. 0000A0
 C4830000 09F69A00 6A37FF26 0277FF26 065EC463 38685016 FE468008 8E089C88 ¡...Á.F±.PhBcá^.&.w.&.7j..~....á 0000C0
 FE46880C C4830000 090C9A00 6A37FF26 0277FF26 0A5EC463 38685016 FC46800C ..F•.PhBcá^.&.w.&.7j.......á..F± 0000E0
 88260E5E C4040E46 83088E09 C1881E56 5700001E C8C8C95F 5E1F0000 E9FC4628 +F•Õ...^_èùà...WV.¡ê..Ä.F..á^.&. 000100
 5689E246 89FE5788 26FC4788 260E5EC4 040E4683 F45689F2 4689FE57 8826FC47 G•&.W±.F¯.V¶.F..á^.&.G•&.W±.Fã.V 000120
 FFFF9A50 16FA468D 026AF856 89F64689 FE578826 FC478826 0E5EC404 0E4683E4 Õ.F..á^.&.G•&.W±.F-.V½j..F°.P... 000140
 00FFFF9A 5016E646 80FA76FF 0113E9EA 46880006 E9037500 EA7E83EA 46890000 ...Fõ.~õ.u.Õ...FõÕ...v°.Fl.P.... 000160
 76FFE876 FF00ECE9 EA468800 00FFFF9A FA76FF00 0EE90375 00EA7E83 EA468900 ..Fõ.~õ.u.Õ...v°......FõÕš..vÒ.v 000180
 EA7E83EA 468910C4 83000009 DA9A006A 0A76FF0C 76FF5141 68F276FF F476FFE6 l.v¶.v·hAQ.v..v.j..Ö....á..Fõ.~õ 0001A0
 80E676FF E876FF00 00FFFF9A E676FFE8 76FF0001 F046C700 A5E90003 E9037500 .u.Ö..ÕE.úFÞ...vÒ.vl......vÒ.vl. 0001C0
 E476FF02 04680014 E9037400 F07E8300 78E90374 00003D00 00FFFF9A 5016FC46 F•.P.....=..t.Õx..-Þ.t.Õ..h...vð 0001E0

Dump of file SATURN:[PCCOMMON.DUMP.DLL]IFMOML.TMP;1 on 18-APR-1990 10:47:01.12
File ID (704,15,0)   End of file block 124 / Allocated 124

Virtual block number 51 (00000033), 512 (0200) bytes

 FFFE76FF 271068F2 76FFF476 FF5016EC 46800000 08EF9AF6 76FFF876 FFE276FF .vã.v½.v-.y....Fš.P.v¶.v·h.'.v±. 000000
 2368F276 FFF476FF E276FFE4 76FFF676 FFF876FF 10C48300 000B4A9A 006AFC76 v•j..J....á..v½.v-.vð.vã.v¶.v·h# 000020
 519A006A FC76FFFE 76FF0000 F046C714 C4830000 0AB39A00 6AEC76FF EE76FF27 '.vŸ.všj..°....á.úFÞ...v±.v•j..Q 000040
 000A919A FA76FF00 00FFFF9A E676FFE8 76FF0000 EA46C7FF 70E906C4 83000008 ....á.Õp.úFõ...vÒ.vl......v°.... 000060
 260E5EC4 040E4683 D88E0A13 881E5657 000008C8 CBC95F5E 1F0000E9 EA468800 ..FõÕ...^_èùà...WV.¡...Ä.F..á^.& 000080
 89F84689 FE578826 FC478826 0E5EC404 0E4683FE 5689FC46 89FE5788 26FC4788 .G•&.W±.F=.V±.F..á^.&.G•&.W±.F½. 0000A0
 00000825 9A006A0A 76FF0C76 FF271268 FC76FFFE 76FF016A F876FFFA 76FFFA56 V°.v°.v½j..v±.v•h.'.v..v.j..%... 0000C0
 88260E5E C4040E46 83088E08 94881E56 57000066 C8C8C95F 5E1F0000 E912C483 .á.Õ...^_èùàf..WV.¡...Ä.F..á^.&. 0000E0
 5689E646 89FE5788 26FC4788 260E5EC4 040E4683 F45689F2 4689FE57 8826FC47 G•&.W±.F¯.V¶.F..á^.&.G•&.W±.Fl.V 000100
 FA468002 6A0001F0 46C7F856 89F64689 FE578826 FC478826 0E5EC404 0E4683E8 Õ.F..á^.&.G•&.W±.F-.V½úFÞ..j..F° 000120
 16FC468D FA76FF01 02E9EE46 880006E9 037500EE 7E83EE46 8900000A 5E9A5016 .P.^....FŸ.~Ÿ.u.Õ...FŸÕ...v°.F•. 000140
 000BE9EE 46880000 0B7D9AFA 76FF000E E9037500 EE7E83EE 46890000 0A7D9A50 P.}....FŸ.~Ÿ.u.Õ...v°.}....FŸÕU. 000160
 8910C483 0000080C 9A006A0A 76FF0C76 FF514068 F276FFF4 76FFFC76 FFFE76FF .v±.v=.v¶.v·h@Q.v..v.j..É....á.. 000180
 76FF0000 0AD59AF: 76FFFE76 FF0001F0 46C70094 E90003E9 037500EE 7E83EE46 FŸ.~Ÿ.u.Õ..Õ..úFÞ...v±.v=.{....v 0001A0
 680014E9 037400F0 7E83006C E9037400 00300000 0AE59A50 16EA468D FC76FFFE ±.v•.Fõ.P.l...=..t.Õl..-Þ.t.Õ..h 0001C0
 6AEA76FF EC76FFF2 76FFF476 FF00000B 0A9AF676 FFF876FF E676FFE8 76FF0204 ...vÒ.vl.v½.v-......v¶.v·.vš.võj 0001E0
```

```
Dump of file SATURN:[PCCOMMON.DUMP.DLL]IFMDML.TMP;1 on 18-APR-1990 10:47:01.12
File ID (704,15,0)   End of file block 124 / Allocated 124

Virtual block number 52 (00000034), 512 (0200) bytes

 9A50169A 468DFFA4 E90003E9 037500EE 7E83EE46 89000004 C39A5016 9A468002 ..F..P.û....FŸ.-Ÿ.u.Õ..ÕÉ..F..P. 000000
 E90000F0 46C70000 09589AF6 76FFF876 FF50169A 468DE676 FFE876FF 00000942 B....vÒ.vI.F..P.v½.v-.X...úFÞ..Õ 000020
 CBC95F5E 1F00C3E9 EE468800 000C769A FA76FF00 0008759A FC76FFFE 76FFFF7C |..v±.v•.u....v•.v....FŸÕ...^ èù 000040
 5689EA46 89FE5788 26FC4788 260E5EC4 040E4683 D88E08F3 881E5657 00001CC8 å...WV.¡µ..Ä.F..á^.&.G•&.W±.FÕ.V 000060
 EC76FF03 6A5016F2 468DF056 89EE4689 FE578826 FC478826 0E5EC404 0E4683EC &.F..á^.&.G•&.W±.FŸ.VÞ.F·.Pj..v& 000080
 89F4568B F24688E8 468912C4 8300000C 989A006A 0A76FF0C 76FF2713 68EA76FF .võh.'.v..v.j.......á..FÒ.F·.V¶. 0000A0
 5016F646 800075E9 03750247 08260788 26FC5EC4 04FC4683 0004E9FE 5689FC46 F•.V±Õ...F•.á^•&..&.G.u.Õu..F-.P 0000C0
 8912C483 00000E27 9A006A37 FF260277 FF26FC5E C4271468 EA76FFEC 76FF046A j..v&.võh.'á^•&.w.&.7j..'....á.. 0000E0
 76FF2714 68EA76FF EC76FF02 6A5016E4 468DFFBA E90003E9 037500E8 7E83E846 FÒ.-Õ.u.Õ..Õo..FÕ.Pj..v&.võh.'.v 000100
 EE468DFF 8BE90003 E9037500 E87E83E8 468912C4 8300000E 689A006A F676FFF8 ½.v-j..h....á..FÒ.-Õ.u.Õ..Õ...FŸ 000120
 FF271568 EA76FFEC 76FFF276 FFF476FF FF78E900 00FFFF9A E476FFE6 76FF5016 .P.vI.vÕ.....Õx..v¶.v·.v&.võh.'. 000140
 06E9E846 880006E9 037500E8 7E83E846 8910C483 000000AF 9A006A0A 76FF0C76 v..v.j..É....á..FÒ.-Õ.u.Õ...FÒÕ. 000160
 260E5EC4 040E4683 D88E0068 881E5657 000022C8 CBC95F5E 1F0000E9 E8468800 ..FÒÕ...^ èùà"..WV.¡h..Ä.F..á^.& 000180
 890E4689 FE578826 FC478826 0E5EC404 0E4683F0 5689EE46 89FE5788 26FC4788 .G•&.W±.FŸ.VÞ.F..á^.&.G•&.W±.FB. 0001A0
 8300000F 649A006A 0A76FF0C 76FF2713 68EE76FF F076FF04 6A5016E4 468DE056 VÁ.FÕ.Pj..vÞ.vŸh.'.v..v.j..d.... 0001C0
 FE5689FC 4689E656 88E4468B 0240E9E2 46880006 E9037500 E27E83E2 468912C4 á..Fã.-ã.u.Õ...FãÕΩ..FÕ.VI.F•.V± 0001E0

Dump of file SATURN:[PCCOMMON.DUMP.DLL]IFMDML.TMP;1 on 18-APR-1990 10:47:01.12
File ID (704,15,0)   End of file block 124 / Allocated 124

Virtual block number 53 (00000035), 512 (0200) bytes

 260277FF 26FC5EC4 086A0036 E9037502 47082607 8826FC5E C404FC46 830004E9 Õ...F•.á^•&..&.G.u.Õ6.j.á^•&.w.& 000000
 76FF5016 DE468D12 C4830000 10089A00 6A7D6A50 16F2468D EE76FFF0 76FF37FF .7.vÞ.vŸ.F·.Pj}j.......á..FB.P.v 000020
 76FF0C76 FF271568 EE76FFF0 76FFE476 FFE676FF FFB7E900 0010229A F276FFF4 ¶.v·."...Õñ..vI.vÕ.vÞ.vŸh.'.v..v 000040
 76FF2713 68EE76FF F076FF03 6A5016E4 468DE246 8910C483 00000F87 9A006A0A .j.......á..Fã.FÕ.Pj..vÞ.vŸh.'.v 000060
 0004E9FE 5689FC46 89E6568B E4468BE2 468912C4 8300000F D09A006A 0A76FF0C ..v.j..Å....á..Fã.FÕ.VI.F•.V±Õ.. 000080
 EE76FFF0 76FF086A 5016EC46 800126E9 03750247 08260788 26FC5EC4 04FC4683 .F•.á^•&..&.G.u.Õ&..F&.Pj..vÞ.vŸ 0000A0
 037500E2 7E83E246 8912C483 00001046 9A006A37 FF260277 FF26FC5E C4271268 h.'á^•&.w.&.7j..F....á..Fã.-ã.u. 0000C0
 76FFF076 FF37FF26 0277FF26 FC5EC406 6A003AE9 037500EC 7E83FFBA E90003E9 Õ..Õo..-&.u.Õ:.j.á^•&.w.&.7.vÞ.v 0000E0
 FF260277 FF26FC5E C450160E 468D12C4 83000010 9A9A006A 7D6A5016 F2468DEE Ÿ.F·.Pj}j.......á..FB.Pá^•&.w.&. 000100
 0277FF26 FC5EC427 1368EE76 FFF076FF 036A5016 E8468DFF 77E90000 10AD9A37 7.Ù...Õw..FÒ.Pj..vÞ.vŸh.'á^•&.w. 000120
 88E8468B FF44E900 03E90375 00E27E83 E2468912 C4830000 10CC9A00 6A37FF26 &.7j..ä....á..Fã.-ã.u.Õ..ÕD..FÒ. 000140
 086A0036 E9037502 47082607 8826F65E C404F646 830004E9 F85689F6 4689EA56 Võ.F-.V½Õ...F-.á^-&..&.G.u.Õ6.j. 000160
 C4830000 FFFF9A00 6A7D6A50 16F2468D EE76FFF0 76FF37FF 260277FF 26F65EC4 á^-&.w.&.7.vÞ.vŸ.F·.Pj}j.......á 000180
 EE76FFF0 76FFE876 FFEA76FF FFB7E900 000E499A F276FFF4 76FF5016 DE468012 ..FB.P.v¶.v·.I...Õñ..vÕ.vÒ.vÞ.vŸ 0001A0
 FFE476FF E676FFFE C7E9E246 8910C483 000010F1 9A006A0A 76FF0C76 FF271568 h.'.v..v.j..þ....á..FãÕù±.vI.vÕ. 0001C0
 76FFE076 FFE24689 10C48300 0000F89A 006A0A76 FF0C76FF 271568EE 76FFF076 vÞ.vŸh.'.v..v.j..½....á..Fã.vÁ.v 0001E0

Dump of file SATURN:[PCCOMMON.DUMP.DLL]IFMDML.TMP;1 on 18-APR-1990 10:47:01.12
File ID (704,15,0)   End of file block 124 / Allocated 124

Virtual block number 54 (00000036), 512 (0200) bytes

 DE76FFE0 76FF001A E9000088 0006E903 7500FA7E 830000FF FF9A5016 FA468DDE B.F•.P......-•.u.Õ..¡..Õ...vÁ.vB 000000
 1E565700 0070C8C8 C95F5E1F 0000E9E2 4688E246 890000FF FF9AFFFF 68056868 hk.h........Fã.FãÕ...^_èùàp..WV. 000020
 E84689FE 578826FC 4788260E 5EC4040E 4683F846 89FA4689 000088D8 8E0E9488 ¡...Ä¡...F•.F½.F..á^.&.G•&.W±.FÒ 000040
 260E5EC4 040E4683 92568990 4689FE57 8826FC47 88260E5E C4040E46 83EA5689 .VÕ.F..á^.&.G•&.W±.F..V..F..á^.& 000060
 89EC4689 FE578826 FC478826 0E5EC404 0E4683E2 5689E046 89FE5788 26FC4788 .G•&.W±.FÁ.Vã.F..á^.&.G•&.W±.F&. 000080
 83000011 F89A006A 0A76FF0C 76FF2714 68E876FF EA76FF02 6A5016F0 468DEE56 VŸ.FÞ.Pj..võ.vÒh.'.v..v.j..½.... 0000A0
 800189E9 E4468800 06E90374 F2460BF0 46880008 E9037400 E47E83E4 468912C4 á..FÕ.-Õ.t.Õ...FÞ.F·t.Õ...FãÕ¿.. 0000C0
 8912C483 0000122A 9A006AF0 76FFF276 FF271468 E876FFEA 76FF036A 5016F446 F¶.Pj..võ.vÒh.'.v·.vÞj..*....á.. 0000E0
 1368E876 FFEA76FF 046A5016 F8468D01 87E9E446 880006E9 037500E4 7E83E446 FÕ.-Õ.u.Õ...FÕÕ...F½.Pj..võ.vÒh. 000100
 E4468800 06E90375 00E47E83 E4468912 C4830000 12989A00 6AF076FF F276FF27 '.v·.vÞj.......á..Fõ.-Õ.u.Õ...Fõ 000120
 4688009B E90374F6 563900A3 E90374F4 46399256 88904688 0001E646 C70155E9 ÕU.úFI...F..V.9F¶t.ÕÉ.9V-t.Õ...F 000140
 0076E903 75024708 26078826 FC5EC404 FC468300 04E9FE56 89FC4689 FA5688F8 ½.V•.F•.V±Õ...F•.á^•&..&.G.u.Õv. 000160
 83000013 109A006A 37FF2602 77FF26FC 5EC4271C 68E876FF EA76FF50 1694468D .F..P.võ.vÒh.'á^•&.w.&.7j....... 000180
 E276FF02 04680014 E9037400 E67E83FF BCE90003 E9037500 E47E83E4 468910C4 á..FÕ.-Õ.u.Õ..Õ¥..-I.t.Õ..h...vã 0001A0
 E276FF00 0013489A 50169446 800000E6 46C70000 133C9AEC 76FFEE76 FFE076FF .vÁ.vŸ.v&.<...úFI...F..P.K....vã 0001C0
 76FF5016 94468000 6CE9FF77 E9000013 619AEC76 FFEE76FF 50169446 80E076FF .vÁ.F..P.vŸ.v&.a...Õw.ÕI..F..P.v 0001E0
```

```
Dump of file SATURN:[PCCOMMON.DUMP.DLL]IFMDML.TMP;1 on 18-APR-1990 10:47:01.12
File ID (704,15,0)   End of file block 124 / Allocated 124

Virtual block number 55 (00000037), 512 (0200) bytes

 037400E4 7E83E446 8910C483 00001388 9A006AF4 76FFF676 FF271C68 E876FFEA ō.vōh.'.v-.v¶j.......á..Fō.-ō.t. 000000
 00000CEF 9AEC76FF EE76FFE0 76FFE276 FF020468 0014E903 7400E67E 830042E9 ōB..-Ì.t.Ō..h...vâ.vÁ.vŸ.vš.ÿ... 000020
 EC76FFEE 76FF5016 94468DE0 76FFE276 FF000000 209A5016 94468000 00E646C7 úFÌ...F..P. ....vâ.vÁ.F..P.vŸ.vš 000040
 FF271568 E876FFEA 76FFF876 FFFA76FF 0022E903 75FA4608 F8468800 0000369A .6....F%.F°u.Ō"..v°.v%.vō.vōh.'. 000060
 D022C8CB C95F5E1F 0000E900 008BE446 8910C483 00000ED8 9A006A0A 76FF0C76 v..v.j..Ū....á..Fō¡..Ō...^_èùà". 000080
 4683EE56 89EC4689 FE578826 FC478826 0E5EC404 0E468308 8E114188 1E565700 .WV.¡A..Ā.F..á^.&.G=&.W±.FĪ.VŸ.F 0000A0
 8826FC47 88260E5E C4040E46 83F65689 F44689FE 578826FC 4788260E 5EC4040E ..á^.&.G=&.W±.F¶.V-.F..á^.&.G=&. 0000C0
 F0468DFE 5689FC46 89FE5788 26FC4788 260E5EC4 040E4683 FA5689F8 4689FE57 W±.F%.V°.F..á^.&.G=&.W±.F=.V±.FÞ 0000E0
 E6468912 C4830000 14779A00 6A0A76FF 0C76FF27 1368EC76 FFEE76FF 036A5016 .Pj..vŸ.všh.'.v..v.j..w....á..FÌ 000100
 4689F256 88F04688 DE4689E0 46890000 880143E9 E6468800 06E90375 00E67E83 .-Ì.u.Ō...FÌŌC.¡...FÁ.F8.FÞ.V·.F 000120
 6A50160E 46800052 E9037502 47082607 8826E85E C404E846 830004E9 EA5689E8 Ō.Vōō...FŌ.á^Ō&..&.G.u.ŌR..F8.Pj 000140
 468912C4 83000011 889A006A 37FF2602 77FF26E8 5EC42714 68EC76FF EE76FF04 ..vŸ.všh.'á^Ō&.w.&.7j..E....á..F 000160
 56390008 E90374DE 4639FA56 88F84688 00E2E9E6 46880006 E9037500 E67E83E6 Ì.-Ì.u.Ō...FÌŌä..F%.V°9F8t.Ō..9V 000180
 02578926 078926F^ 5EC40257 88260788 26E85EC4 FF98E900 03E90003 E90374E0 Āt.Ō..Ō..Ō..á^Ō&..&.W.á^=&..&.W. 0001A0
 8910C483 0000152. 9A006A0A 76FF0C76 FF271568 EC76FFEE 76FFF076 FFF276FF .v·.vÞ.vŸ.všh.'.v..v.j..&....á.. 0001C0
 39000EE9 03740E46 39FA5688 F8468800 81E9E646 880006E9 037500E6 7E83E646 FÌ.-Ì.u.Ō...FÌŌ...F%.V°9F8t.Ō..9 0001E0

Dump of file SATURN:[PCCOMMON.DUMP.DLL]IFMDML.TMP;1 on 18-APR-1990 10:47:01.12
File ID (704,15,0)   End of file block 124 / Allocated 124

Virtual block number 56 (00000038), 512 (0200) bytes

 FA76FF27 1468EC76 FFEE76FF 026A5016 E2468000 65E90000 880006E9 0374E056 VÁt.Ō..¡..Ōe..Fâ.Pj..vŸ.všh.'.v° 000000
 FF0033E9 E6468800 06E90375 00E67E83 E6468912 C4830000 14169A00 6AF876FF .v%j.......á..FÌ.-Ì.u.Ō...FÌŌ3.. 000020
 6A676AFC 76FFFE76 FFEC76FF EE76FF0A 76FF0C76 FFE276FF E476FFF4 76FFF676 v-.v¶.vō.vâ.v..v..vŸ.vš.v±.v=jgj 000040
 A5B81E56 57000012 C8C8C95F 5E1F0000 E9E64688 E6468918 C4830000 0F329A00 ..2....á..FÌ.FÌŌ...^_èùà...WV.¡Ē 000060
 260E5EC4 040E4683 F25689F0 4689FE57 8826FC47 88260E5E C4040E46 83088E13 ..Ā.F..á^.&.G=&.W±.FÞ.V·.F..á^.& 000080
 6A5016F4 46800789 26024789 26000088 FC5EC4FE 5689FC46 89FE5788 26FC4788 .G=&.W±.F=.V±á^=¡..&.G.&...F¶.Pj 0000A0
 EE7E83EE 468912C4 83000016 149A006A 0A76FF0C 76FF2713 68F076FF F276FF07 ..v·.vÞh.'.v..v.j.......á..FŸ.-Ÿ 0000C0
 FFF676FF FA5689F8 46890257 88260788 26F45EC4 0068E9EE 46880006 E9037500 .u.Ō...FŸŌk.á^¶&..&.W..F%.V°.v-. 0000E0
 7E83EE46 8910C483 00001647 9A006A0A 76FF0C76 FF271568 F076FFF2 76FFF476 v¶.v·.vÞh.'.v..v.j..G....á..FŸ.- 000100
 76FF2714 68F076FF F276FF02 6AFC76FF FE76FF00 2AE9EE46 880006E9 037500EE Ÿ.u.Ō...FŸŌ*..v±.v=j..v·.vÞh.'.v 000120
 000000C8 C8C95F5E 1F0000E9 EE4688EE 468912C4 83000014 D89A006A F876FFFA °.v%j..Ā....á..FŸ.FŸŌ...^_èùà... 000140
 1664881E 56570000 02C8C8C9 5F5E1F00 00E90856 88064688 D88E157F 881E5657 WV.¡...Ā.F..V.Ō...^_èùà...WV.¡d. 000160
 00FFFF9A 006A666A 026A006A 006A006A 028E681E 016A306A FFFF6811 2168D88E .Āhl.h..jOj..hƒ.j.j.j.j.jƒj..... 000180
 05380203 01510006 12EF0203 0018C8C9 5F5E1F00 00E9FE46 88FE4689 18C48300 ..á..F±.F±Ō...^_èù....ÿ...Q...8. 0001A0
 0F450203 00E70005 02310203 015C0006 12CA0203 023A000A 05040203 00080005 ..Ū.......:...ò...\...1...Ō...E. 0001C0
 16830002 01E90007 11070203 01710006 12D90203 165C000A 16860005 01DC0007 ..É.......\...1...q.......Ō..... 0001E0

Dump of file SATURN:[PCCOMMON.DUMP.DLL]IFMDML.TMP;1 on 18-APR-1990 10:47:01.12
File ID (704,15,0)   End of file block 124 / Allocated 124

Virtual block number 57 (00000039), 512 (0200) bytes

 03F00203 02040008 0C430203 00920005 0D070203 01F50007 11270203 0000000A ......'...%...........C.......Þ. 000000
 046C0203 02120008 00510203 00280004 169D0203 01900007 0CBA0203 00A00005 ......¤...........+...Q.......l. 000020
 167E0002 003E0004 15D30203 00000017 04E70002 01A10007 0CCA0203 00AC0005 ..¯...ò...Ā...Ō.......£...>...~. 000040
 11240005 01C00007 00490203 01850007 0C620203 00480004 15620203 00000019 ......b...K...b...ç...I...â...$. 000060
 040E4683 D88EFFFF 881E5657 000090C8 00000000 005C0004 085F0203 0989000A ..¿...._...\.....à...WV.¡...Ā.F.. 000080
 FE578826 FC478826 0E5EC404 0E468388 56898646 89FE5788 26FC4788 260E5EC4 á^.&.G=&.W±.F..V..F..á^.&.G=&.W± 0000A0
 C4040E46 83825689 804689FE 578826FC 4788260E 5EC4040E 46839856 89964689 .F..V..F..á^.&.G=&.W±.F..V..F..á 0000C0
 FF768689 000088E6 4689E846 890000B8 8C56898A 4689FE57 8826FC47 88260E5E ^.&.G=&.W±.F..V.¡...FÒ.FÌ¡....v. 0000E0
 0088F446 89F64689 000088FF 708689FF 72868900 00880000 FF7886C7 FF748689 ..t.ú.x...|....r...p.¡...f-.F¶¡. 000100
 006A8A76 FF8C76FF 27146886 76FF8876 FF0A6A50 16FF7C86 80FC4689 FE468900 ..F±.F=..|..Pj..v..v.h.'.v..v.j. 000120
 FF026A04 43E9FF7A 86880007 E9037500 FF7ABE83 FF7A8689 12C48300 0000E99A .Ō....á...z..ƒz..u.Ō....z.ŌC.j.. 000140
 14C48300 00014B9A 006A9676 FF9876FF 27186886 76FF8876 FF036A0A 76FF0C76 v..v.j..v..v.h.'.v..v.j..K....á. 000160
 76FF8276 FF8676FF 8876FF04 0BE9FF7A 86880007 E9037500 FF7ABE83 FF7A8689 ..z..ƒz..u.Ō....z.Ō...v..v..v..v 000180
 E9FF7A86 880007E9 037500FF 7ABE83FF 7A868900 00FFFF9A 50169A46 80026A80 .j..F..P.......z..ƒz..u.Ō....z.Ō 0001A0
 83000001 E19A006A 0A76FF0C 76FF2717 688676FF 8876FF01 6A50169A 468D030E 8..F..Pj..v..v.h.'.v..v.j..Ā.... 0001C0
 FF8276FF 5016E646 80C3A9E9 FF7A8688 0007E903 7500FF7A BE83FF7A 868912C4 á...z..ƒz..u.Ō....z.Ō`..FÌ.P.v.. 0001E0
```

Dump of file SATURN:[PCCOMMON.DUMP.DLL]IFMDML.TMP;1 on 18-APR-1990 10:47:01.12
File ID (704,15,0)   End of file block 124 / Allocated 124

Virtual block number 58 (0000003A), 512 (0200) bytes

```
0374E846 0BE6468B 10C483FF FF05159A 8676FF88 76FFFF7C B6FFFF7E B6FF8076 v..Ñ-..Ñ|..v..v.......á..F|.FÒt. 000000
E6468086 76FF8( 6 FF0A76FF 0C76FF80 76FF8276 FFFF7CB6 FFFF7EB6 FF0032E9 Ò2..Ñ-..Ñ|..v..v..v..v..v..v..F| 000020
FF046AE6 76FFEL.5 FF046A00 27E9FF7A 868918C4 830000FF FF9A006A 736A5016 .Pjsj.......á...z.Ò'.j..vÒ.v|j.. 000040
FF7ABE83 FF7A8689 14C48300 0002169A 006A0A76 FF0C76FF 27186886 76FF8876 v..v.h.'.v..v.j.......á...z../z. 000060
8C76FF27 14688676 FF8876FF 036A5016 8E468003 13E9FF7A 86880007 E9037500 .u.Ò....z.Ò...F..Pj..v..v.h.'.v. 000080
E9FF7A86 8B0007E9 037500FF 7ABE83FF 7A868912 C4830000 02489A00 6A8A76FF .v.j..K....á...z../z..u.Ò....z.Ò 0000A0
83000003 1F9A006A 8A76FF8C 76FF2713 688676FF 8876FF04 6A5016FC 468D02DE Ñ..F=.Pj..v..v.h.'.v..v.j....... 0000C0
57882607 8826FC5E C402A9E9 FF7A868B 0007E903 7500FF7A BE83FF7A 868912C4 á...z../z..u.Ò....z.Ò`.á^=&..&.W 0000E0
7A868900 0002829A 5016F246 8D8E76FF 9076FF86 76FF8876 FFFA5689 F8468902 ..F%.V*.v..v..v..v..F·.P.ý.....z 000100
1684468D F876FFFA 76FF8676 FF8876FF 0270E9FF 7A868800 07E90375 00003DFF .*..u.Ò....z.Òp..v..v..v*.v%.F.. 000120
E9037421 F27E8302 47E9FF7A 86880007 E9037500 003DFF7A 86890000 FFFF9A50 P.......z.*..u.Ò....z.ÒG..-·|t.Ò 000140
89FA568B F8468800 0EE90374 21847E83 FF769689 FF748689 9056888E 468B000E ...F..V...t...v..-.|t.Ò...F%.V*. 000160
76FF8876 FF126A50 16F4468D 01A1E903 75FF7686 0BFF7486 8BFF7696 89FF7486 .t...v...t...v.u.ÒÀ..F¶.Pj..v..v 000180
7500FF7A BE83FF7A 868912C4 83000003 599A006A FF74B6FF FF76B6FF 27136886 .h.'.Ñv..Ñt.j..Y....á...z../z..u 0001A0
26F45EC4 27136886 76FF8876 FF036A50 16FF7086 8D01D5E9 FF7A868B 0007E903 .Ò....z.Òl...p..Pj..v..v.h.'á^¶& 0001C0
86880007 E9037500 FF7ABE83 FF7A8689 12C48300 0003B69A 006A37FF 260277FF .w.&.7j..Ñ....á...z../z..u.Ò.... 0001E0
```

Dump of file SATU"N:[PCCOMMON.DUMP.DLL]IFMDML.TMP;1 on 18-APR-1990 10:47:01.12
File ID (704,15,0)   End of file block 124 / Allocated 124

Virtual block number 59 (0000003B), 512 (0200) bytes

```
078B26EE 5EC404EE 46830004 E9F05689 EE4689FF 729688FF 70868801 98E9FF7A z.Ò....p...r..FŸ.VÞÒ...FŸ.á^Ÿ&.. 000000
0277FF26 EE5EC427 14688676 FF8876FF 046A5016 92468000 86E90375 02470826 &.G.u.Ò...F..Pj..v..v.h.'á^Ÿ&.w. 000020
E9FF7A86 8B0007E9 037500FF 7ABE83FF 7A868912 C4830000 ..FF9A00 6A37FF26 &.7j.......á...z../z..u.Ò....z.Ò 000040
076A0001 FF7886C7 0034E903 74E85639 003CE903 74E64639 94568B92 4688013E >..F..V.9F|t.Ò<.9vÒt.Ò4.ú.x...j. 000060
00B19A00 6A0A76FF 0C76FF27 18688676 FF8876FF 076A37FF 260277FF 26EE5EC4 á^Ÿ&.w.&.7j..v..v.h.'.v..v.j..Ÿ. 000080
74B6FFFF 76B6FF00 7CE90374 00FF788E 83FF67E9 0003E9FF 7A868914 C4830000 ...á...z.Ò..Òg../x..t.Ò|..Ñv..Ñt 0000A0
006A606A 5016EA46 8D8676FF 8876FF37 FF260277 FF26F45E C48076FF 8276FFFF ..v..v.á^¶&.w.&.7.v..v..Fõ.Pjmj. 0000C0
FF076A00 A3E9FF7A 86880007 E9037500 FF7ABE83 FF7A8689 18C48300 0001B79A .ñ....á...z../z..u.Ò....z.ÒE.j.. 0000E0
14C48300 00040E9A 006A0A76 FF0C76FF 27186886 76FF8876 FF076AEA 76FFEC76 v&.võj..v..v.h.'.v..v.j.......á. 000100
E90375FF 728608FF 70868800 68E9FF7A 86880007 E9037500 FF7ABE83 FF7A8689 ..z../z..u.Ò...z.Òk...p...r.u.Ò 000120
75FE4608 FC4688FF 7A868900 0004E19A FF7086FF FF72B6FF 8676FF88 76FF0017 ...v..v..Ñr..Ñp..Å.....z..F=.Fzu 000140
75F64608 F44688FF 7A868900 0005019A FC76FFFE 76FF8676 FF8876FF 0015E903 .Ò...v..v..vz.v=.......z..F¶.F-u 000160
0000E9FF 7A8688FF 7A868900 00FFFF9A F476FFF6 76FF8676 FF8876FF 0015E903 .Ò...v..v..v-.v¶.......z...z.Ò.. 000180
6A5016EA 4680F846 89FA4689 00008808 8E000888 1E565700 0016C8CB C95F5E1F .^_èùà...WV.¡...A¡...F*.F%.Fõ.Pj 0001A0
EE7E83EE 468912C4 83000004 899A006A 0A76FF0C 76FF2713 680676FF 0876FF16 ..ṽ..v.h.'.v..v.j.......á..FŸ.-Ÿ 0001C0
9A5016F4 46801A6A 0E76FF10 76FF0676 FF0876FF 00EEE9EE 46880006 E9037500 .u.Ò...FŸÒŸ..v..v..v..v.j..F¶.P. 0001E0
```

Dump of file SATURN:[PCCOMMON.DUMP.DLL]IFMDML.TMP;1 on 18-APR-1990 10:47:01.12
File ID (704,15,0)   End of file block 124 / Allocated 124

Virtual block number 60 (0000003C), 512 (0200) bytes

```
89F04689 F6568BF4 468800C4 E9EE468B 0006E903 7500EE7E 83EE4689 0000FFFF .....FŸ.-Ÿ.u.Ò...FŸÒá..F¶.V-.FÞ. 000000
03750247 0B26078B 26F05EC4 0068E903 74FA4608 F8468804 F0468300 04E9F256 V·Ò...FÞ..F%.F*t.Òh.á^Þ&..&.G.u. 000020
02470826 078826FC 5EC404FC 46830004 E9FE5689 FC4689EC 5688EA46 880059E9 ÒY..Fò.V&.F=.VzÒ...F=.á^=&..&.G. 000040
03740257 3926001C E5037407 3926FC5E C402578B 26078826 F05EC400 34E90375 u.Ò4.á^Þ&..&.W.á^=&9.t.Ò..&9W.t. 000060
88125EC4 FF89E9FF 89E90003 E9FA5689 F8468902 57882607 8826FC5E C.`013E9 Ò..á^=&..&.W..F%.V*Ò..Ò¿.Ò..á^.. 000080
EE468900 0006309A F476FFF6 76FF0676 FF0876FF 02578926 078926FA 566 `846 F%.V*&..&.W..v..v..v-.v¶.=....FŸ 0000A0
C8C8C95F 5E1F0000 E9EE468B EE468900 0004C19A EA76FFEC 76FF0676 FF08.5FF .v..v..v&.võ.è....FŸ.FŸÒ...^_èùà 0000C0
CE9A5016 FF50868D 0A76FF0C 76FF4B6A 0000FE46 C7D88E05 1D881E56 57000080 ¯..WV.¡...ÀúFz..jK.v..v...P.¯P.ö 0000E0
00FFFF9A 5016F046 8D0676FF 0876FF00 0007299A 5016FF50 86800AC4 83074700 .G..á...P..P.)....v..v..FÞ.P.... 000100
0876FF00 02EE46C7 0018F846 C700FCE9 EC468800 06E90375 00EC7E83 EC468900 ..F&.-&.u.Ò...F&Ò=.úF%..úFŸ...v. 000120
E9037500 EC7E83EC 46890000 05709A50 16F4468D F876FFF0 76FFF276 FF0676FF .v..v·.vÞ.v%.F¶.P.p....F&.-&.u.Ò 000140
8B26FA5E C404FA46 830004E9 FC5689FA 4689F656 88F4468B 00C7E9EC 46880006 ...F&Òú..F¶.V-.F*.V=Ò...F*.á^*&. 000160
9C468DEE 76FF37FF 260277FF 26FA5EC4 0676FF08 76FF0075 E9037502 47082607 .&.G.u.Òu..v..v.á^*&.w.&.7.vŸ.F. 000180
EC468900 00FFFF9A 50169C46 80000DE9 037400EC 7E83EC46 89000001 199A5016 .P......F&.-&.t.Ò...F..P......F& 0001A0
7400003D 08C483FF FF008C9A 50169C46 8D5016FF 50868000 33E90374 00EC7E83 .-&.t.Ò3...P..P.F..P......á.=..t 0001C0
FFFF78E9 0003E9EA 5689E846 89025788 26078826 FA5EC400 01FE46C7 0018E903 .Ò..úFz..á^*&..&.W..FÒ.VõÒ..Òx.. 0001E0
```

```
Dump of file SATURN:[PCCOMMON.DUMP.DLL]IFMDML.TMP;1 on 18-APR-1990 10:47:01.12
File ID (704,15,0)   End of file block 124 / Allocated 124

Virtual block number 61 (0000003D), 512 (0200) bytes

 88E84688 0E5EC400 10E90375 00FE7E83 00000629 9AF476FF F676FF06 76FF0876 v..v..v−.v¶.)....~ž.u.Ö..á^..FÒ. 000000
 D88E0657 881E5657 00001AC8 C8C95F5E 1F0000E9 EC468802 57892607 8926EA56 Võ&..&.W..FšÖ...^_èùà...WV.¡W..Ä 000020
 0088EE56 89EC4689 FE578826 FC478826 0E5EC404 0E4683F4 4689F646 89000088 ¡...F·.F¶.F..á^.&.G=&.Wz.Fâ.VŸ¡. 000040
 9A006A0A 76FF0C76 FF271468 EC76FFEE 76FF026A 5016F446 8DF04689 F2468900 ..F·.FÞ.F¶.Pj..vŸ.vâh.'.v..v.j.. 000060
 75F6460B F4468801 63E9E646 880006E9 037500E6 7E83E646 8912C483 00000830 0....á..Fl.−l.u.Ö...FlÖc..F¶.F−u 000080
 9A006A0A 76FF0C76 FF271968 EC76FFEE 76FF026A F476FFF6 76FF036A 0035E903 .ÖS.j..v−.v¶j..vŸ.vâh.'.v..v.j.. 0000A0
 036A5016 F0468D01 23E9E646 880006E9 037500E6 7E83E646 8914C483 00000862 b....á..Fl.−l.u.Ö...FlÖ#..FÞ.Pj. 0000C0
 00E67E83 E6468912 C4830000 05439A00 6A0A76FF 0C76FF27 1368EC76 FFEE76FF .vŸ.vâh.'.v..v.j..C....á..Fl.−l. 0000E0
 5EC404E8 46830004 E9EA5689 E84689F2 5688F046 8800F1E9 E6468800 06E90375 u.Ö...FlÖþ..FÞ.V·.FÖ.VõÖ...FÖ.á^ 000100
 9A006A37 FF260277 FF26E85E C4EC76FF EE76FF00 2CE90375 02470826 078826E8 Ö&..&.G.u.Ö,..vŸ.vâá^Ö&.w.&.7j.. 000120
 75F2460B F04688FF C1E90003 E90003E9 037500E6 7E83E646 890AC483 0000FFFF .....á..Fl.−l.u.Ö..Ö..Öè..FÞ.F·u 000140
 46880006 E9037500 E67E8300 00077C9A F076FFF2 76FFEC76 FFEE76FF 0011E903 .Ö...vŸ.vš.v·.vÞ.|....~l.u.Ö...F 000160
 0009409A 006A0A76 FF0C76FF 271468EC 76FFEE76 FF046A50 16F84680 0078E9E6 lÖx..F½.Pj..vŸ.vâh.'.v..v.j..M.. 000180
 35E90375 FA4608F8 46880046 E9E64688 0006E903 7500E67E 83E64689 12C48300 ..á..Fl.~l.u.Ö...FlÖF..F½.Fªu.ÖS 0001A0
 0007F09A 006A0A76 FF0C76FF 271968EC 76FFEE76 FF046AF8 76FFFA76 FF046A00 .j..vª.v½j..vŸ.vâh.'.v..v.j..Þ.. 0001C0
 C95F5E1F 0000E9E6 46880006 E9E64688 0006E903 7500E67E 83E64689 14C48300 ..á..Fl.−l.u.Ö...FlÖ...FlÖ...^_è 0001E0

Dump of file SATURN:[PCCOMMON.DUMP.DLL]IFMDML.TMP;1 on 18-APR-1990 10:47:01.12
File ID (704,15,0)   End of file block 124 / Allocated 124

Virtual block number 62 (0000003E), 512 (0200) bytes

 89F84689 FE578826 FC478826 0E5EC404 0E468308 8E07AC88 1E565700 000EC8C8 ùà...WV.¡¯..Ä.F..á^.&.G=&.Wz.F½. 000000
 76FF046A 5016FC46 80F45689 F24689FE 578826FC 4788260E 5EC4040E 4683FA56 Vª.F..á^.&.G=&.Wz.F·.V¶.F=.Pj..v 000020
 037500F6 7E83F646 8912C483 000009F1 9A006A0A 76FF0C76 FF271468 F876FFFA ª.v½h.'.v..v.j..þ....á..F-.−−.u. 000040
 006AFC76 FFFE76FF 271C68F8 76FFFA76 FFF276FF F476FF00 22E9F646 880006E9 Ö...F−Ö"..v¶.v·.vª.v½h.'.vz.v=j. 000060
 040E4683 D88E0979 881E5657 00005EC8 C8C95F5E 1F0000E9 10C48300 0009009A ......á.Ö...^ èùà^..WV.¡y..Ä.F.. 000080
 FE578826 FC478826 0E5EC404 0E4683F6 5689F446 89FE5788 26FC4788 260E5EC4 á^.&.G=&.Wz.F¶.V−.F..á^.&.G=&.Wz 0000A0
 5016A246 80FA5689 F84689FE 578826FC 4788260E 5EC4040E 4683F056 89EE4689 .FŸ.VÞ.F..á^.&.G=&.Wz.F½.Vª.FÅ.P 0000C0
 FF9A5016 A2468D10 C4830000 09C09A00 6A0A76FF 0C76FF27 1C68F476 FFF676FF .v−.v¶h.'.v..v.j..á....á..FÅ.P.. 0000E0
 FFF076FF 02156800 00FFFF9A F876FFFA 76FF5016 A2468DEE 76FFF076 FF0000FF ....vÞ.vŸ.FÅ.P.vª.v½.....h...vÞ. 000100
 00FFFF9A F876FFFA 76FFEE76 FFF076FF 02546800 000AAD9A F876FFFA 76FFEE76 vŸ.vª.v½.Ü...hT..vÞ.vŸ.vª.v½.... 000120
 260E5EC4 040E4683 D88E0A08 881E5657 00000EC8 C8C95F5E 1F0000E9 00008800 .¡..Ö...^ èùà...WV.¡...Ä.F..á^.& 000140
 89F44689 FE578826 FC478826 0E5EC404 0E4683FA 5689F846 89FE5788 26FC4788 .G=&.Wz.F½.Vª.F..á^.&.G=&.Wz.F¶. 000160
 8300000B 3E9A006A 0A76FF0C 76FF2714 68F876FF FA76FF04 6A5016FC 468DF656 V−.F=.Pj..vª.v½h.'.v..v.j..>.... 000180
 FFFA76FF 026AF476 FFF676FF 002AE9F2 46880006 E9037500 F27E83F2 468912C4 á..F·.−·.u.Ö...F·Ö*..v−.v¶j..vª. 0001A0
 5E1F0000 E9F2468B F2468912 C4830000 0A629A00 6AFC76FF FE76FF27 1468F876 v½h.'.vz.v=j..b....á..F·.F·Ö...^ 0001C0
 0002C8C8 C95F5E1F 0000E908 56880646 8BD88E0A C4881E56 57000000 C8C8C95F _èùà...WV.¡á..Ä.F..V.Ö...^_èùà.. 0001E0

Dump of file SATURN:[PCCOMMON.DUMP.DLL]IFMDML.TMP;1 on 18-APR-1990 10:47:01.12
File ID (704,15,0)   End of file block 124 / Allocated 124

Virtual block number 63 (0000003F), 512 (0200) bytes

 6A026A00 6A006A00 6A030C68 1E016A30 6AFFFF68 01836808 8E085888 1E565700 .WV.¡[..Äh..h..jOj..h..j.j.j.j.j 000000
 0A850203 001190CB C95F5E1F 0000E9FE 4688FE46 8918C483 0000FFFF 9A006A67 gj.......á..Fz.FzÖ...^_èù...... 000020
 06700203 00E70005 02890203 015C0006 0A990203 00080005 08E10203 01510006 ..Q...Ä...Ü.......\.......Ö...). 000040
 08700005 00000008 087A0002 007E0005 06800203 01710006 0A6F0203 01660006 ..f...o...q.......~...z........). 000060
 06710002 00AC0005 06C20203 00280004 08940203 00920005 07130203 08530008 ..S...............+...ö...¯...g. 000080
 08800203 00480004 04510203 00000019 08750002 003E0004 08080203 00000017 ..........>...u.......Q...K.... 0000A0
 040E4683 D88EFFFF 881E5657 00009EC8 00000000 00000000 00000000 005C0004 ..\...............à...WV.¡...Ä.F.. 0000C0
 8826FC47 88260E5E C4040E46 83FF7E96 89FF7C86 89FE5788 26FC4788 260E5EC4 á^.&.G=&.Wz..|...~..F..á^.&.G=&. 0000E0
 83825689 804689FE 578826FC 4788260E 5EC4040E 4683FF70 9689FF6E 8689FE57 Wz..n...p..F..á^.&.G=&.Wz.F..V.. 000100
 89FE4788 260E5EC4 020E4683 D6568904 4689FE57 8826FC47 88260E5E C4040E46 F..á^.&.G=&.Wz.Fâ.Vø.F..á^.&.Gz. 000120
 89000088 0000FF66 86C7FF62 8689FF64 86890000 88DE4689 E0468900 00880C46 Fé¡...FÅ.F8¡....d...b.ú.f....¡... 000140
 86FF086A 50160C46 80F24689 F4468900 0088FC46 89FE4689 000088EE 4689F046 fÞ.FŸ¡...Fz.Fø¡....F¶.F·.FÉ.Pj..Ñ 000160
 6A868DFF 68868912 C4830000 00E99A00 6A0A76FF 0C76FF27 1768FF7C 86FFFF7E ~..Ñ|.h.'.v..v.j..Ö.....á....h...j 000180
 12C48300 0001589A 006A0476 FFD676FF 271468FF 7C86FFFF 7E86FF0A 6A5016FF ..Pj..Ñ~..Ñ|.h.'.vø.vâj...X....á. 0001A0
 7086FFFF 7C86FFFF 7E86FF06 0AE9FF68 86880007 E9037500 FF688E83 FF688689 ..h../h..u.Ö....h.Ö...Ñ~..Ñ|..Ñp 0001C0
 E9FF6886 880007E9 03750000 30FF6886 89000001 8A9A5016 EA4680FF 6E86FFFF ..Ñn..Fö.P.¤.....h.=..u.Ö....h.Ö 0001E0
```

Dump of file SATURN:[PCCOMMON.DUMP.DLL]IFMDML.TMP;1 on 18-APR-1990 10:47:01.12
File ID (704,15,0)   End of file block 124 / Allocated 124

Virtual block number 64 (00000040), 512 (0200) bytes

```
7086FF27 1868FF7C B6FFFF7E B6FF046A 0A76FF0C 76FF046A 0128E9EA 468805DD  I..Föö(.j..v..v.j..Ñ-..Ñ|.h.'.Ñp 000000
68868800 07E90375 00FF688E 83FF6886 8914C483 00000205 9A006AFF 6EB6FFFF  ..Ñn.j........á...h../h..u.Ö....h 000020
890000FF FF9A5u16 FF768680 0A6A8076 FF8276FF FF7CB6FF FF7EB6FF 0598E9FF  .Ö...Ñ-..Ñ|..v..v.j...v..P...... 000040
FF7886FF FF7CB6FF FF7EB6FF 0568E9FF 68868800 07E90375 00FF688E 83FF6886  .h../h..u.Ö....h.Ök..Ñ-..Ñ|..Ñx. 000060
FF688688 0007E903 75u0FF68 8E83FF68 86890000 FFFF9A50 16EA468D FF7686FF  .Ñv..Fö.P.......h../h..u.Ö....h. 000080
FFD476FF D676FFFF 7686FFFF 7886FF50 16844680 0034E903 7402EA7E 8.`53CE9  Ö<..-ö.t.Ö4..F..P.Ñx..Ñv..vø.vå. 0000A0
FF688689 18C48300 0002339A 006AFF6E B6FFFF70 B6FF5142 68FF7CB6 FFF.7EB6  Ñ-..Ñ|.hßQ.Ñp..Ñn.j..3....á...h. 0000C0
FF6EB6FF FF7086FF 271868FF 7CB6FFFF 7EB6FF03 6A0A76FF 0C76FF04 6A00.9E9  Ö'.j..v..v.j..Ñ-..Ñ|.h.'.Ñp..Ñn. 0000E0
C704C0E9 FF688688 0007E903 7500FF68 8E83FF68 868914C4 83000002 AC9A006A  j.._....á...h../h..u.Ö....h.Öå.ú 000100
FFA3E903 7500273D FED0E903 75002630 0013E904 82E90001 88001CE9 0001F646  f-..Ö..|..Öý.Ö..=&.u.ÖÅ±='.u.ÖÈ. 000120
68868900 00FFFF9A 50168846 80026A80 76FF8276 FFFF7CB6 FFFF7EB6 FFFFE4E9  Öß..Ñ-..Ñ|..v..v.j..F..P.......h 000140
0000FFFF 9A006A0A 76FF0C76 FF271768 FF7CB6FF FF7EB6FF 016A5016 88468DFF  ..F..Pj..Ñ-..Ñ|.h.'.v..v.j...... 000160
03748246 08804688 0447E9FF 68868800 07E90375 00FF688E 83FF6886 8912C483  .á...h../h..u.Ö....h.ÖG..F..F.t. 000180
6A006A50 16884680 50168046 80006A00 6A006A00 6AFF7CB6 FFFF7EB6 FF007CE9  Ö|..Ñ-..Ñ|.j.j.j.j..F..P.F..Pj.j 0001A0
6CB6FF04 02E9FF68 86880007 E9037500 FF688E83 FF688689 0000FFFF 9A006A00  .j........h../h..u.Ö....h.Ö...Ñl 0001C0
746A5016 DE468DFF 7CB6FFFF 7EB6FF0A 76FF0C76 FF8076FF 8276FFFF 6AB6FFFF  ..Ñj..v..v..v..v..Ñ-..Ñ|..Fß.Pjt 0001E0
```

Dump of file SATURN:[PCCOMMON.DUMP.DLL]IFMDML.TMP;1 on 18-APR-1990 10:47:01.12
File ID (704,15,0)   End of file block 124 / Allocated 124

Virtual block number 65 (00000041), 512 (0200) bytes

```
8D03C0E9 FF688688 0007E903 7500FF68 8E83FF68 868918C4 83000003 A79A006A  j..I....á...h../h..u.Ö....h.Öå.. 000000
149AFF7C B6FFFF7E B6FFFF6A B6FFFF6C B6FF006A 006A8076 FF8276FF 50160E46  Fß.P.v..v.j.j..Ñl..Ñj..Ñ-..Ñ|... 000020
FF8076FF 8276FFFF 6AB6FFFF 6CB6FF00 45E90374 E0460BDE 468814C4 83FFFF07  ....á..Fß.FÁt.ÖE..Ñl..Ñj..v..v.. 000040
86891BC4 830000FF FF9A006A 746A5016 DE468DFF 7CB6FFFF 7EB6FF0A 76FF0C76  v..v..Ñ-..Ñ|..Fß.Pjtj.......á... 000060
046A0A76 FF0C76FF 066A0029 E9034CE9 FF688688 0007E903 7500FF68 8E83FF68  h../h..u.Ö....h.ÖL.Ö).j..v..v.j. 000080
83FF6886 8914C483 0000041B 9A006ADE 76FFE076 FF271868 FF7CB6FF FF7EB6FF  .Ñ-..Ñ|.h.'.vÁ.vßj.......á...h.. 0000A0
68FF7CB6 FFFF7EB6 FF036A50 16084680 030FE9FF 68868800 07E90375 00FF688E  /h..u.Ö....h.Ö...FÁ.Pj..Ñ-..Ñ|.h 0000C0
0007E903 7500FF68 8E83FF68 868912C4 83000004 529A006A D476FFD6 76FF2714  .'.vø.våj..R....á...h../h..u.Ö.. 0000E0
6AD476FF D676FF27 1368FF7C B6FFFF7E B6FF046A 5016FC46 80020BE9 FF688688  ..h.ÖÁ..F=.Pj..Ñ-..Ñ|.h.'.vø.våj 000100
5EC402A1 E9FF6886 880007E9 037500FF 688E83FF 68868912 C4830000 00C29A00  ..ó....á...h../h..u.Ö....h.ÖÁ.á^ 000120
16EC468D D876FFDA 76FFFF7C B6FFFF7E B6FFFA56 89F84689 02578826 078826FC  •&..&.W..F½.Vª.Ñ-..Ñ|..vÖ.vÁ.F&. 000140
FA76FFFF 7CB6FFFF 7EB6FF01 FDE90003 E9037500 0030FF68 86890000 048A9A50  P.o.....h.=..u.Ö..Ö»..Ñ-..Ñ|..vª 000160
EC7E8301 D5E90003 E9037500 0030FF68 86890000 0118 9A50 16FF7A86 8DF876FF  .v½..z..P.......h.=..u.Ö..Ö|..~$ 000180
4688000E E9037421 FF7A8E83 FF649689 FF628689 DA5688D8 4688000E E9037421  It.Ö...FÁ.VO..b...d../z.It.Ö...F 0001A0
126A5016 EE468D01 99E90375 FF648608 FF628688 FF649689 FF628689 FA5688F8  ½.Vª..b...d...b...d.u.Ö...FŸ.Pj. 0001C0
68868912 C4830000 05509A00 6AFF62B6 FFFF64B6 FF271368 FF7CB6FF FF7EB6FF  .Ñ-..Ñ|.h.'.Ñd..Ñb.j..]....á...h 0001E0
```

Dump of file SATURN:[PCCOMMON.DUMP.DLL]IFMDML.TMP;1 on 18-APR-1990 10:47:01.12
File ID (704,15,0)   End of file block 124 / Allocated 124

Virtual block number 66 (00000042), 512 (0200) bytes

```
271368FF 7CB6FFFF 7EB6FF04 6A5016F2 46800164 E90003E9 037500FF 688E83FF  ../h..u.Ö..Öd..F·.Pj..Ñ-..Ñ|.h.' 000000
E9037500 FF688E83 FF688689 12C48300 0005B79A 006A37FF 260277FF 26EE5EC4  á^Y&.w.&.7j..ñ....á...h../h..u.Ö 000020
08260788 26E65EC4 04E64683 0004E9E8 5689E646 89F45688 F2468801 20E90003  ..Ö-..F·.V¶.F|.VÖÖ...F|.á^|&..&. 000040
77FF26E6 5EC42714 68FF7CB6 FFFF7EB6 FF066A50 16FF7286 8D0089E9 03750247  G.u.Ö....r..Pj..Ñ-..Ñ|.h.'á^|&.w 000060
8800D3E9 0003E903 7500FF68 8E83FF68 868912C4 83000006 0F9A006A 37FF2602  .&.7j.......á...h../h..u.Ö..ÖŒ.. 000080
C4096A00 01FF6686 C70036E9 0374E056 39003EE9 03740E46 39FF7496 88FF7286  .r...t.9Fßt.Ö>.9VÁt.Ö6.ú.f...j.á 0000A0
8A9A006A 0A76FF0C 76FF2718 68FF7CB6 FFFF7EB6 FF096A37 FF260277 FF26E65E  ^|&.w.&.7j..Ñ-..Ñ|.h.'.v..v.j... 0000C0
B6FFFF64 B6FF0078 E9037400 FF668E83 FF64E900 03E9FF68 868914C4 83000006  ....á...h.Ö..Öd../f..t.Öx..Ñd..Ñ 0000E0
6A5016E2 468DFF7C B6FFFF7E B6FF37FF 260277FF 26EE5EC4 8076FF82 76FFFF62  b..v..v.á^Y&.w.&.7.Ñ-..Ñ|..Fã.Pj 000100
76FF096A 0036E900 03E90375 00FF688E 83FF6886 8918C483 00000333 9A006A6E  nj..3....á...h../h..u.Ö..Ö6.j..v 000120
C4830000 03E49A00 6A0A76FF 0C76FF27 1868FF7C B6FFFF7E B6FF096A E276FFE4  ö.våj..Ñ-..Ñ|.h.'.v..v.j..ß....á 000140
7EB6FF00 17E90375 F44608F2 46880000 E90003E9 037500FF 688E83FF 68868914  ...h../h..u.Ö..Ö...F·.F¶u.Ö...Ñ- 000160
FF0017E9 0375FE46 08FC4688 FF688689 0000060E 9AF276FF F476FFFF 7CB6FFFF  ..Ñ|..v¶.v·.ß.....h..F=.F±u.Ö... 000180
17E90375 F0460BEE 4688FF68 86890000 07009AFC 76FFFE76 FFFF7CB6 FFFF7EB6  Ñ-..Ñ|..v±.v=.......h..FŸ.Fþu.Ö. 0001A0
1F0000E9 FF688688 FF688689 0000FFFF 9AEE76FF F076FFFF 7CB6FFFF 7EB6FF00  ..Ñ-..Ñ|..vÞ.vŸ.......h...h.Ö... 0001C0
176A5016 EE468DFB 4689FA46 89000088 D88E0008 881E5657 000016C8 C8C95F5E  ^_èuå...WV.¡...Á¡...Fª.F½.FŸ.Pj. 0001E0
```

```
Dump of file SATURN:[PCCOMMON.DUMP.DLL]IFMDML.TMP;1 on 18-APR-1990 10:47:01.12
File ID (704,15,0)   End of file block 124 / Allocated 124

Virtual block number 67 (00000043), 512 (0200) bytes

 00F27E83 F2468912 C4830000 05269A00 6A0A76FF 0C76FF27 13680676 FF0876FF .v..v.h.'.v..v.j..&....á..F.-.. 000000
 FF9A5016 F4468D1B 6A1276FF 1476FF06 76FF0876 FF00EEE9 F2468800 06E90375 u.Ö...F.ÖY..v..v..v..v.j..F¶.P.. 000020
 5689EA46 89F6568B F4468800 C4E9F246 880006E9 037500F2 7E83F246 890000FF ....F.-.u.Ö...F.Öá..F¶.V-.Fö.V 000040
 E9037502 47082607 8826EA5E C40068E9 0374FA46 08F8468B 04EA4683 0004E9EC &Ö...Fö..F%.F*t.Öh.á^ö&..&.G.u.Ö 000060
 75024708 26078826 FC5EC404 FC468300 04E9FE56 89FC4689 F05688EE 46880059 Y..FY.VÞ.F=.V±Ö...F=.á^=&..&.G.u 000080
 E9037402 57392600 1CE90374 073926FC 5EC40257 88260788 26EA5EC4 0034E903 .Ö4.á^ö&..&.W.á^=&9.t.Ö..&9W.t.Ö 0000A0
 4688165E C4FF89E9 FF89E900 03E9FA56 89F84689 02578826 078826FC 5EC40013 ..á^=&..&.W..F%.V*Ö..Ö¿.Ö..á^..F 0000C0
 FFF24689 0000083C 9AF476FF F676FF06 76FF0876 FF025789 26078926 FA5688F8 %.V*&..&.W..v..v..v-.v¶.<....F.. 0000E0
 80C8C8C9 5F5E1F00 00E9F246 88F24689 0000068C 9AEE76FF F076FF06 76FF0876 v..v..vÞ.vY.¥....F..F.Ö...^_èùà 000100
 00CE9A50 16FF5086 8D0A76FF 0C76FF4B 6A0000FE 46C7D88E 071C881E 56570000 ..WV.¡...ÁùF±..jK.v..v...P..P.ö. 000120
 0000FFFF 9A5016F0 46800676 FF0876FF 00000928 9A5016FF 5086800A C4830946 F..á...P..P.(....v..v..FÞ.P..... 000140
 FF0876FF 0002EE46 C7001AF8 46C700FC E9E8468B 0006E903 7500E87E 83E84689 .FÒ.~Ö.u.Ö...FÒÖ=.úF%..úFY...v.. 000160
 06E90375 00E87E83 E8468900 00076F9A 5016F446 8DF876FF F076FFF2 76FF0676 v..v..vÞ.v%.F¶.P.o....FÒ.~Ö.u.Ö. 000180
 078826FA 5EC404FA 46830004 E9FC5689 FA4689F6 5688F446 8800C7E9 E8468800 ..FÒÖu..F¶.V-.F*.V=Ö...F*.á^*&.. 0001A0
 169C468D EE76FF37 FF260277 FF26FA5E C40676FF 0876FF00 75E90375 02470826 &.G.u.Öu..v..v.á^*&.w.&.7.vY.F.. 0001C0
 83E84689 0000FFFF 9A50169C 4680000D E9037400 E87E83E8 46890000 02899A50 P......FÒ.~Ö.t.Ö...F..P......FÒ. 0001E0

Dump of file SATURN:[PCCOMMON.DUMP.DLL]IFMDML.TMP;1 on 18-APR-1990 10:47:01.12
File ID (704,15,0)   End of file block 124 / Allocated 124

Virtual block number 68 (00000044), 512 (0200) bytes

 03740000 3008C483 FFFF008C 9A50169C 46805016 FF50868D 0033E903 7400E87E ~Ö.t.Ö3...P..P.F..P......á.=..t. 000000
 76FFFF78 E90003E9 EC5689EA 46890257 88260788 26FA5EC4 0001FE46 C70018E9 Ö..úF±..á^*&..&.W..Fö.V±Ö..Öx..v 000020
 5688EA46 880E5EC4 0010E903 7500FE7E 83000008 289AF476 FFF676FF 0676FF08 ..v..v~.v¶.(....~±.u.Ö..á^..Fö.V 000040
 83088E08 56881E56 5700000E C8C8C95F 5E1F0000 E9E8468B 02578926 078926EC $&..&.W..FÒÖ...^_èùà...WV.¡V..Ä. 000060
 26FC4788 260E5EC4 040E4683 FA5689F8 4689FE57 8826FC47 88260E5E C4040E46 F..á^.&.G=&.W±.F%.V*.F..á^.&.G=& 000080
 6A0A76FF 0C76FF27 1468F876 FFFA76FF 066A5016 FC468DF4 5689F246 89FE5788 .W±.F..V¶.F=.Pj..v*.v%h.'.v..v.j 0000A0
 76FFF476 FF0022E9 F6468800 06E90375 00F67E83 F6468912 C4830000 0A239A00 ..#....á..F-.--.u.Ö...F-Ö"..v¶.v 0000C0
 5F5E1F00 00E910C4 83000007 429A006A FC76FFFE 76FF271C 68F876FF FA76FFF2 ..v*.v%h.'.v±.v=j..B....á.Ö...^_ 0000E0
 88260E5E C4040E4  83EE4689 F0468900 0088D88E 09A8881E 56570000 14C8C8C9 èùà...WV.¡..Áj...FÞ.FY.F..á^.&. 000100
 FF0C76FF 271468F4 76FFF476 FF046A50 16EE468D F45689F2 4689FE57 8826FC47 G=&.W±.F..V¶.FY.Pj..v¶.v.h.'.v.. 000120
 46880159 E9EC4688 0006E903 7500EC7E 83EC4689 12C48300 000ADF9A 006A0A76 v.j..Ö....á..F$.-$.u.Ö...F$ÖY..F 000140
 89000004 929A5016 FA4680EE 76FFF076 FFF276FF F476FF00 80E90375 F04608EE Y.FÞu.Ö..v¶.v..vÞ.vY.F*.P...... 000160
 F476FF04 6A0A76FF 0C76FF04 6A0073E9 FA468800 8CE90003 E9037500 0030EC46 F$=..u.Ö..Ö...F*Ös.j..v..v.j..v¶ 000180
 E9037500 EC7E83EC 468914C4 8300000B 179A006A EE76FFF0 76FF2719 68F276FF .v.h.'.vÞ.vYj.......á..F$.-&.u.Ö 0001A0
 76FF2719 68F276FF F476FF03 6A0A76FF 0C76FF04 6A004EE9 00EFE9EC 46880006 ...F$Öy.ÖN.j..v..v.j..v¶.v.h.'.v 0001C0
 0087E9EC 46880006 E9037500 EC7E83EC 468914C4 83000009 F29A006A EE76FFF0 Þ.vYj.......á..F$.~$.u.Ö...F$Öñ. 0001E0

Dump of file SATURN:[PCCOMMON.DUMP.DLL]IFMDML.TMP;1 on 18-APR-1990 10:47:01.12
File ID (704,15,0)   End of file block 124 / Allocated 124

Virtual block number 69 (00000045), 512 (0200) bytes

 066A5016 F6468D00 00E9FF85 E9037500 2730FF85 E9037500 26300013 E90016E9 Ö..Ö..=&.u.Ö..='.u.Öç.Ö...F-.Pj. 000000
 00EC7E83 EC468912 C4830000 089F9A00 6A0A76FF 0C76FF27 1468F276 FFF476FF .v¶.v.h.'.v..v.j.......á..F$.-$. 000020
 F476FF06 6AF676FF F876FF04 6A0032E9 0375F846 08F6468B 0030E900 03E90375 u.Ö..Ö=..F-.F%u.Ö2.j..v%.v-j..v¶ 000040
 E9037500 EC7E83EC 468914C4 8300000A 759A006A 0A76FF0C 76FF2719 68F276FF .v.h.'.v..v.j..u....á..F$.-$.u.Ö 000060
 08629A00 6A0A76FF 0C76FF27 1468F276 FFF476FF 076A5016 FC468D00 00E90003 ..Ö...F=.Pj..v¶.v.h.'.v..v.j..b. 000080
 00000EC8 C8C95F5E 1F0000E9 EC468800 06E90375 00EC7E83 EC468912 C4830000 ...á..F$.-$.u.Ö...F$Ö...^_èùà... 0000A0
 0E4683FA 5689F846 89FE5788 26FC4788 260E5EC4 040E4683 D88E0A3A 881E5657 WV.¡:..Ä.F..á^.&.G=&.W±.F%.V*.F. 0000C0
 68F876FF FA76FF07 6A5016F2 468DFE56 89FC4689 FE578826 FC478826 0E5EC404 .á^.&.G=&.W±.F=.V±.F..Pj..v*.v%h 0000E0
 46880006 E9037500 F67E83F6 468912C4 8300000C 789A006A 0A76FF0C 76FF2714 .'.v..v.j..(....á..F-.--.u.Ö...F 000100
 68F876FF FA76FF07 6AF276FF F476FF11 6A0035E9 0375F446 08F2468B 006CE9F6 -Öl..F..F¶u.Ö5.j..v¶.v.j..v*.v%h 000120
 46880006 E9037500 F67E83F6 468914C4 8300000C 809A006A 0A76FF0C 76FF2719 .'.v..v.j........á..F-.--.u.Ö...F 000140
 9A006A0A 76FF0C76 FF271868 F876FFFA 76FF076A FC76FFFE 76FF116A 002CE9F6 -Ö,.j..v±.v=j..v*.v%h.'.v..v.j.. 000160
 8E08F4B8 1E565700 0064C8C8 C95F5E1F 0000E9F6 4688F646 8914C483 000008CE ö....á..F-.F-Ö...^_èùàd..WV.¡¶.. 000180
 4788260E 5EC4040E 4683F456 89F24689 FE578826 FC478826 0E5EC404 0E4683D8 Ä.F..á^.&.G=&.W±.F..V¶.F..á^.&.G 0001A0
 F85689F6 4689FE57 8826FC47 88260E5E C4040E46 83EA5689 E84689FE 578826FC =&.W±.FÒ.Vö.F..á^.&.G=&.W±.F-.V% 0001C0
 12C48300 0000619A 006A0A76 FF0C76FF 271468F2 76FFF476 FF076A50 16FC468D .F=.Pj..v¶.v.h.'.v..v.j..a....á. 0001E0
```

```
Dump of file SATURN:[PCCOMMON.DUMP.DLL]IFMDML.TMP;1 on 18-APR-1990 10:47:01.12
File ID (704,15,0)   End of file block 124 / Allocated 124

Virtual block number 70 (00000046), 512 (0200) bytes

FF006A02 0468E876 FFEA76FF F676FFF8 76FF0020 E90375FE 4608FC46 8BEC4689 .F$.F•.F±u.Õ-..v½.v-.võ.vÕh..j.. 000000
5016EE46 8D012FE9 18C48300 0000B49A 006AFC76 FFFE76FF 271A68F2 76FFF476 v¶.v h.'.v±.v•j.......Á.Õ/..FŸ.P 000020
7E83EC46 8912L483 00000DB4 9A006A0A 76FF0C76 FF271468 F276FFF4 76FF046A j..v¶.v h.'.v..v.j..Ç....á..F$.~ 000040
76FFF076 FF271668 F276FFF4 76FF5016 FA468000 FDE9EC46 880006E9 037500EC &.u.Õ...F±Õ»..Fª.P.v¶.v h.'.vÞ.v 000060
FA468800 CDE9EC46 880006E9 037500EC 7E83EC46 8910C483 000000EA 9A006AEE Ÿj..õ....á..F$.~&.u.Õ...F±Õë..Fª 000080
C4830000 0E4E9A00 6AEE76FF F076FF27 1C68F276 FFF476FF 50169C46 8D00AEE9 ÕÙ..F..P.v¶.v h.'.vÞ.vŸj..N....á 0000A0
EA76FF00 000E5E9A 50169C46 8D0097E9 EC468800 06E90375 00EC7E83 EC468910 ..F$.~&.u.Õ...F±Õ...F..P.^....võ 0000C0
FFF876FF E876FFEA 76FF0215 6800000E 749AF676 FFF876FF 50169C46 8DE876FF .vÕ.F..P.v½.v-.t...h...võ.vÕ.v½. 0000E0
0C3B9A00 6A0A76FF 0C76FF27 1C68F276 FFF476FF 50169C46 8D0000FF FF9AF676 v-......F..P.v¶.v h.'.v..v.j..;. 000100
F876FF50 169C4680 E876FFEA 76FF0000 FFFF9A50 169C4680 EC468910 C4830000 ...á..F$.F..P......võ.vÕ.F..P.v½ 000120
42E90375 002730FF AEE90375 00263000 13E9001C E9000088 0000FFFF 9AF676FF .v-.....|..Õ..Õ..=&.u.ÕÙ.='.u.Õ8 000140
C4040E46 83088E0C CD881E56 5700000E C8CBC95F 5E1F0000 E9000088 FFE4E9FF .Õõ.¡..Õ...^_èùà...WV.¡e..A.F..á 000160
89FE5788 26FC4788 260E5EC4 040E4683 FE5689FC 4689FE57 8826FC47 88260E5E ^.&.G•&.W±.F•.V±.F..á^.&.G•&.W±. 000180
0F219A00 6A0A76FF 0C76FF27 1468FC76 FFFE76FF 066A5016 F84680F4 5689F246 F .V¶.F½.Pj..v±.v•h.'.v..v.j..!. 0001A0
FF026AF2 76FFF476 FF002AE9 F6468800 06E90375 00F67E83 F6468912 C4830000 ...á..F-.--.u.Õ...F-Õª..v¶.v j.. 0001C0
00E9F646 8BF64689 12C48300 0000299A 006AF876 FFFA76FF 271468FC 76FFFE76 v±.v•h.'.vª.v½j..)....á..F-.F-Õ. 0001E0

Dump of file SATURN:[PCCOMMON.DUMP.DLL]IFMDML.TMP;1 on 18-APR-1990 10:47:01.12
File ID (704,15 )   End of file block 124 / Allocated 124

Virtual block number 71 (00000047), 512 (0200) bytes

CBC95F5E 1F0000E9 08568B06 4688088E 0EA7B81E 56570000 00C8CBC9 5F5E1F00 ..^_èùà...WV.¡T..A.F..V.Õ...^_èù 000000
006A006A 006A0330 681E016A 306AFFFF 68037168 D88E0F3E 881E5657 000002C8 à..WV.¡>..Ahq.h..j0j..h0.j.j.j. 000020
02030012 CBC95F5E 1F0000E9 FE468BFE 468918C4 830000FF FF9A006A 686A026A j.jhj.......á..F±.F±Õ...^_èù.... 000040
020300E7 00050AA8 0203015C 00060E33 0203000B 0005097B 02030151 00060E1F ....Q...(...Ù...3...\.....Õ... 000060
00050000 000C0F5D 0002007E 0005088C 02030171 00060E09 02030166 0006087C |...f.......q.......~...}....... 000080
000200AC 000508C1 0203002B 00040F77 02030092 00050912 02030F36 000C0F60 ...6..........W...+...è.....~... 0000A0
02030000 00190F58 0002008B 0005018B 0203003E 00040EEE 02030000 00170870 p.......Ÿ...>.......|...X....... 0000C0
040E4683 D88EFFFF 881E5657 000014C8 00000225 000902F4 0203004B 00040654 T...K...¶...X...à...WV.¡...A.F.. 0000E0
FE578826 FC478826 0E5EC404 0E4683F8 5689F646 89FE5788 26FC4788 260E5EC4 á^.&.G•&.W±.F-.V½.F..á^.&.G•&.W± 000100
C4040E46 83EE5689 EC4689FE 578826FC 4788260E 5EC4040E 4683FC56 89FA4689 .Fª.V•.F..á^.&.G•&.W±.F$.VŸ.F..á 000120
F676FFF8 76FF036A F076FFF2 76FF166A F25689F0 4689FE57 8826FC47 88260E5E ^.&.G•&.W±.FÞ.V j..v .vÞj..v½.v- 000140
880006E9 037500F4 7E83F446 8914C483 0000010C 9A006A0A 76FF0C76 FF271868 h.'.v..v.j.......á..F¶.-¶.u.Õ... 000160
0000FFFF 9A1A6AE. 76FFEE76 FF026A0A 76FF0C76 FFF676FF F876FF01 6DE9F446 F¶Õm..v½.v-.v..v.j..vŸ.všj...... 000180
468DFA76 FFFC76FF F676FFF8 76FF0140 E9F4468B 0006E903 7500F47E 83F44689 .F¶.-¶.u.Õ...F¶Õa..v½.v-.v•.vª.F 0001A0
00E9E9FE 46880118 E9F4468B 0006E903 7500F47E 83F44689 0000FFFF 9A5016FE ±.P......F¶.-¶.u.Õ...F¶Õ...F±ÕÕ. 0001C0
00000144 9A006A0A 76FF0C76 FF271868 F676FFF8 76FF046A FA76FFFC 76FF046A j..v•.vªj..v½.v-h.'.v..v.j..D... 0001E0

Dump of file SATURN:[PCCOMMON.DUMP.DLL]IFMDML.TMP;1 on 18-APR-1990 10:47:01.12
File ID (704,15,0)   End of file block 124 / Allocated 124

Virtual block number 72 (00000048), 512 (0200) bytes

FA76FFFC 76FF046A 00D4E900 DDE9F446 880006E9 037500F4 7E83F446 8914C483 .á..F¶.-¶.u.Õ...F¶Õï.Õå.j..v•.vª 000000
7E83F446 8914C483 0000017C 9A006A0A 76FF0C76 FF271868 F676FFF8 76FF056A j..v½.v-h.'.v..v.j..|....á..F¶.- 000020
F676FFF8 76FF066A FA76FFFC 76FF046A 009CE900 A5E9F446 880006E9 037500F4 ¶.u.Õ...F¶ÕE.Õ..j..v•.vªj..v½.v- 000040
880006E9 037500F4 7E83F446 8914C483 000001B4 9A006A0A 76FF0C76 FF271868 h.'.v..v.j..Ç....á..F¶.-¶.u.Õ... 000060
76FF0C76 FF271868 F676FFF8 76FF066A FA76FFFC 76FF106A 0064E900 6DE9F446 F¶Õm.Õd.j..v•.vªj..v½.v-h.'.v..v 000080
002CE900 35E9F446 880006E9 037500F4 7E83F446 8914C483 0000FFFF 9A006A0A .j.......á..F¶.-¶.u.Õ...F¶ÕS.Õ.. 0000A0
6FE90375 002030FF 3FE90375 002A30FF 0FE90375 00273000 23E9002C E9F4468B .F¶Õ..Õ#.='.u.Õ..=ª.u.Õ7.=-.u.Õo 0000C0
08881E56 57000012 C8CBC95F 5E1F0000 E9000088 FFD4E9FF 9FE90375 004C30FF .=L.u.Õ..Õå.¡..Õ...^_èùà...WV.¡. 0000E0
FF056A50 16FC4680 F65689F4 4689FE57 8826FC47 88260E5E C4040E46 83D88E00 ..A.F..á^.&.G•&.W±.F¶.V-.F•.Pj.. 000100
7500F27E 83F24689 12C48300 0002C49A 006A0A76 FF0C76FF 271368F4 76FFF676 v-.v¶h.'.v..v.j..á....á..F .~ .u 000120
F85EC404 F8468300 04E9FA56 89F84689 FE568BFC 4688008E E9F2468B 0006E903 .Õ...F Õf..F•.V±.F½.VªÕ...F½.á^½ 000140
FF9A006A 37FF2602 77FF26F8 5EC4F476 FFF676FF 002FE903 7502470B 26078826 &..&.G.u.Õ/..v-.v¶á^½&.w.&.7j... 000160
5016EE46 8DFF8EE9 0070E9F2 46880006 E9037500 F27E83F2 46890AC4 830000FF ....á..F .~ .u.Õ...F Õp.Õf..FŸ.P 000180
7E83F246 8912C483 000002F9 9A006A0A 76FF0C76 FF271468 F476FFF6 76FF036A j..v-.v¶h.'.v..v.j..ª....á..F .~ 0001A0
271968F4 76FFF676 FF036AEE 76FFF076 FF166A00 38E9F246 880006E9 037500F2 .u.Õ...F Õ;.j..vÞ.vŸj..v-.v¶h.' 0001C0
E9F2468B 0006E903 7500F27E 83F24689 14C48300 00007C9A 006A0A76 FF0C76FF .v..v.j..|....á..F .~ .u.Õ...F Õ 0001E0
```

```
Dump of file SATURN:[PCCOMMON.DUMP.DLL]IFMDML.TMP;1 on 18-APR-1990 10:47:01.12
File ID (704,15,0)   End of file block 124 / Allocated 124

Virtual block number 73 (00000049), 512 (0200) bytes

0E5EC404 0E4683D8 8E020F88 1E565700 000EC8C8 C95F5E1F 0000E900 00880006 ..j..Ô...^ èüà...WV.j...Ä.F..á^. 000000
F24689FE 578826FC 4788260E 5EC4040E 4683FA56 89F84689 FE578826 FC478826 &.G=&.Wz.F%.V*.F..á^.&.G=&.Wz.F· 000020
FFFF9A50 16FC468D 026A0A76 FF0C76FF F876FFFA 76FF0007 C626F25E C4F45689 .V¶á^·&ó...v*.v%.v..v.j..F=.P... 000040
FF0022E9 F6468800 06E90374 FE4608FC 46880008 E9037400 F67E83F6 46890000 ...F-.—.t.Ô...F=.F±t.Ô...F-Ô".. 000060
00E9F646 88F64689 0000FFFF 9AF276FF F476FF02 6AFC76FF FE76FFF8 76FFFA76 v*.v%.vz.v=j..v¶.v·......F-.F-Ô. 000080
C8C95F5E 1F0000E9 08568806 46880088E 0325881E 56570000 00C8C8C9 5F5E1F00 ..^_èüà...WV.j%..Ä.F..V.Ô...^_èü 0000A0
006A006A 006A035A 081E016A 306AFFFF 68FFFF68 088E038E 881E5657 000002C8 à...WV.j/..Äh..h..jOj..hZ.j.j-j. 0000C0
0203000A C8C95F5E 1F0000E9 FE4688FE 468918C4 830000FF FF9A006A 736A026A j.jzj........á..Fz.FzÔ...^_èü.... 0000E0
00050028 000403F7 02030092 000503A4 02030000 00000300 000200E7 00050004 à...Ô...i........Ê.......¥...+... 000100
02030000 00190308 00020088 0005036E 0203003E 00040241 02030386 000003E0 Ä...Ñ...A...>...n...j...Ä....... 000120
040E4683 088EFFFF 881E5657 000014C8 0000005C 0004028F 020300C5 000500AC ¯...é.......\...à...WV.j...Ä.F.. 000140
FE578826 FC478826 0E5EC404 0E4683FC 5689FA46 89FE5788 26FC4788 260E5EC4 á^.&.G=&.Wz.F*.V=.F..á^.&.G=&.Wz 000160
C4040E46 83EE5689 EC4689FE 578826FC 4788260E 5EC4040E 4683F856 89F64689 .F-.V%.F..á^.&.G=&.Wz.F$.VŸ.F..á 000180
76FF026A 0A76FF0C 76FFFA76 FFFC76FF F25689F0 4689FE57 8826FC47 88260E5E ^.&.G=&.Wz.FÞ.V·.v=.v*.v..v.j..v 0001A0
FF176A01 75E9F446 880006E9 037500F4 7E83F446 890000FF FF9A186A EC76FFEE Ÿ.vŝj.......F¶.-¶.u.Ô...F¶Ôu.j.. 0001C0
14C48300 00010C9A 006A0A76 FF0C76FF 271868FA 76FFFC76 FF036AF0 76FFF276 v·.vÞj..v=.v*h.'.v..v.j.......á. 0001E0

Dump of file SATURN:[PCCOMMON.DUMP.DLL]IFMDML.TMP;1 on 18-APR-1990 10:47:01.12
File ID (704,15,0)   End of file block 124 / Allocated 124

Virtual block number 74 (0000004A), 512 (0200) bytes

468DF676 FFF876FF FA76FFFC 76FF0140 E9F44688 0006E903 7500F47E 83F44689 .F¶.-¶.u.Ô...F¶Ôa..v=.v*.v%.v-.F 000000
00E9E9FE 46880118 E9F44688 0006E903 7500F47E 83F44689 0000FFFF 9A5016FE z.P......F¶.-¶.u.Ô...F¶Ô...F±ÔÔ. 000020
00000144 9A006A0A 76FF0C76 FF271868 FA76FFFC 76FF046A F676FFF8 76FF066A j..v%.v-j..v=.v*h.'.v..v.j..D... 000040
F676FFF8 76FF066A 0004E900 00E9F446 880006E9 037500F4 7E83F446 8914C483 .á..F¶.-¶.u.Ô...F¶Ôi.Ôà.j..v%.v- 000060
7E83F446 8914C483 0000017C 9A006A0A 76FF0C76 FF271868 FA76FFFC 76FF056A j..v=.v*h.'.v..v.j..|....á..F¶.- 000080
FA76FFFC 76FF066A F676FFF8 76FF0E6A 009CE900 A5E9F446 880006E9 037500F4 ¶.u.Ô...F¶ÔE.Ô..j..v%.v-j..v=.v* 0000A0
880006E9 037500F4 7E83F446 8914C483 00000184 9A006A0A 76FF0C76 FF271868 h.'.v..v.j..Ç....á..F¶.-¶.u.Ô... 0000C0
76FF0C76 FF271868 FA76FFFC 76FF066A F676FFF8 76FF066A 0064E900 60E9F446 F¶Ôm.Ôd.j..v%.v-j..v=.v*h.'.v..v 0000E0
002CE900 35E9F446 880006E9 037500F4 7E83F446 8914C483 0000FFFF 9A006A0A .j.......á..F¶.-¶.u.Ô...F¶05.Ô.. 000100
A7E90375 002E30FF 3FE90375 002830FF 0FE90375 00283000 23E9002C E9F44688 .F¶Ô,.Ô#.=(.u.Ô..=+.u.Ô?.=..u.ÔI 000120
08881E56 57000012 C8C8C95F 5E1F0000 E9000088 FFD4E9FF 67E90375 004D30FF .=M.u.Ôg.Ôà.j..Ô...^ èüà...WV.j. 000140
FF056A50 16FC4680 FA5689F8 4689FE57 8826FC47 88260E5E C4040E46 83088E00 ..Ä.F..á^.&.G=&.Wz.F%.V*.F=.Pj.. 000160
7500F27E 83F24689 12C48300 0002C49A 006A0A76 FF0C76FF 271368F8 76FFFA76 v*.v%h.'.v..v.j..á....á..F·.-·.u 000180
F45EC404 F4468300 04E9F656 89F44689 FE5688FC 468800BE E9F24688 00L 903 .Ô...F·Ô/..F=.Vz.F¶.V-Ô...F¶.á^¶ 0001A0
FF9A006A 37FF2602 77FF26F4 5EC4F876 FFFA76FF 002FE903 75024708 2607.426 &..&.G.u.Ô/..v*.v%á^¶&.w.&.7j... 0001C0
5016EE46 80FFBEE9 0070E9F2 46880006 E9037500 F27E83F2 46890AC4 83000LFF ....á..F·.-·.u.Ô...F·Ôp.Ô/..FŸ.P 0001E0

Dump of file SATURN:[PCCOMMON.DUMP.DLL]IFMDML.TMP;1 on 18-APR-1990 10:47:01.12
File ID (704,15,0)   End of file block 124 / Allocated 124

Virtual block number 75 (0000004B), 512 (0200) bytes

7E83F246 8912C483 000002F9 9A006A0A 76FF0C76 FF271468 F876FFFA 76FF036A j..v*.v%h.'.v..v.j..*....á..F·.- 000000
271968F8 76FFFA76 FF036AEE 76FFF076 FF176A00 3BE9F246 880006E9 037500F2 ·.u.Ô...F·Ô;.j..vÞ.vŸj..v*.v%h.' 000020
E9F24688 0006E903 7500F27E 83F24689 14C48300 0000A99A 006A0A76 FF0C76FF .v..v.j..`....á..F·.-·.u.Ô...F·Ô 000040
0E5EC404 0E468308 8E020F88 1E565700 000EC8C8 C95F5E1F 0000E900 00880006 ..j..Ô...^ èüà...WV.j...Ä.F..á^. 000060
F24689FE 578826FC 4788260E 5EC4040E 4683FA56 89F84689 FE578826 FC478826 &.G=&.Wz.F%.V*.F..á^.&.G=&.Wz.F· 000080
FFFF9A50 16FC468D 026A0A76 FF0C76FF F876FFFA 76FF0007 C626F25E C4F45689 .V¶á^·&ó...v*.v%.v..v.j..F=.P... 0000A0
FF0022E9 F6468800 06E90374 FE460BFC 46880008 E9037400 F67E83F6 46890000 ...F-,—.t.Ô...F=.F±t.Ô...F-Ô".. 0000C0
00E9F646 88F64689 0000FFFF 9AF276FF F476FF02 6AFC76FF FE76FFF8 76FFFA76 v*.v%.vz.v=j..v¶.v·......F-.F-Ô. 0000E0
C8C95F5E 1F0000E9 08568806 468800 88E 0325881E 56570000 00C8C8C9 5F5E1F00 ..^_èüà...WV.j%..Ä.F..V.Ô...^_èü 000100
006A006A 006A0372 681E016A 306AFFFF 68FFFF68 088E038E 881E5657 000002C8 à...WV.j/..Äh..h..jOj..hr.j.j.j. 000120
0203000A C8C95F5E 1F0000E9 FE4688FE 468918C4 830000FF FF9A006A 746A026A j.jtj........á..Fz.FzÔ...^_èü.... 000140
02030028 000403F7 02030092 000503A4 02030000 000E0300 000200E7 00050004 à...Ô...i........Ê.......¥...+... 000160
000500C5 00050077 02030000 00190308 00020088 0005036E 0203003E 00040241 A...>...n...j...Ä........W...é... 000180
1CAE068E D88EFFFF 881E5657 000000C8 0000005C 0004028F 02030386 000E03E0 Ä...Ñ.......\...à...WV.j...Ä..Û. 0001A0
30FFFF08 3E9A015C E9000088 0006E903 75000030 FFFF08A1 9A0200A3 2606468B .F.&È...À...=..u.Ô..j..Ô\..>...= 0001C0
0136E900 00880006 E9037500 003DFFFF 08A89A01 49E90000 880006E9 03750000 ..u.Ô..j..ÔI.. ...=..u.Ô..j..Ô6. 0001E0
```

```
Dump of file SATURN:[PCCOMMON.DUMP.DLL]IFMDML.TMP;1 on 18-APR-1990 10:47:01.12
File ID (704,15,0)   End of file block 124 / Allocated 124

Virtual block number 76 (0000004C), 512 (0200) bytes

 0006E903 7500003D FFFF198F 9A0123E9 00008800 06E90375 000030FF FF0BD79A .a...=..u.Õ..¡..Õ#......=..u.Õ.. 000000
 003DFFFF 0B609A00 FDE90000 880006E9 03750000 3DFFFF16 769A0110 E9000088 ¡..Õ...v...=..u.Õ..¡..Õ»..m...=. 000020
 9A0007E9 00008300 06E90375 000030FF FF0F509A 00EAE900 00880006 E9037500 .u.Õ..¡..Õõ..P...=..u.Õ..¡..Õa.. 000040
 880006E9 03750000 3DFFFF03 F09A00C4 E9000088 0006E903 7500003D FFFF02CF ü...=..u.Õ..¡..Õá..Þ...=..u.Õ..¡ 000060
 000030FF FF02F89A 009EE900 00880006 E9037500 003DFFFF 03D09A00 81E90000 ..ÕŸ..Å...=..u.Õ..¡..Õ...«...=.. 000080
 989A0078 E9000088 0006E903 7500003D FFFF05D6 9A0088E9 00008800 06E90375 u.Õ..¡..Õ...ø...=..u.Õ..¡..Õx... 0000A0
 00880006 E9037500 003DFFFF 03009A00 65E90000 880006E9 03750000 3DFFFF07 ...=..u.Õ..¡..Õe..Å...=..u.Õ..¡. 0000C0
 75000030 FFFF0086 9A003FE9 00008800 06E90375 000030FF FF00E29A 0052E900 .ÕR..à...=..u.Õ..¡..Õ?......=..u 0000E0
 0AD49A00 19E90000 880006E9 03750000 3DFFFF00 FA9A002C E9000088 0006E903 .Õ..¡..Õ,..'...=..u.Õ..¡..Õ...Å. 000100
 00020014 90CBC95F 5E1F0000 E90001B8 0006E900 00880006 E9037500 003DFFFF ..=..u.Õ..¡..Õ..¡..Õ...^_èù..... 000120
 00020000 00050040 00020000 0004002D 00020000 0003001A 00020000 00020066 f...............-.......Ð....... 000140
 00020000 00090111 00020000 000800FE 00020000 000700E8 00020000 00060053 S.......Š.......±............... 000160
 00020000 00000008 00020000 000C009F 00020000 0008008C 00020000 000A0079 y.......................Ä....... 000180
 00020000 00120137 00020000 001100B2 00020000 001000C5 00020000 000E0124 $.......é.......ý.......7....... 0001A0
 00000000 00190008 00020000 00160170 00020000 0014015D 00020000 0013014A J.......].......p............... 0001C0
 5689EE46 89FE5788 26FC4788 260E5EC4 040E4683 D88EFFFF 881E5657 000022C8 à"..WV.¡...Ä.F..á^.&.G=&.W±.FŸ.V 0001E0

Dump of file SATURN:[PCCOMMON.DUMP.DLL]IFMDML.TMP;1 on 18-APR-1990 10:47:01.12
File ID (704,15,0)   End of file block 124 / Allocated 124

Virtual block number 77 (0000004D), 512 (0200) bytes

 4788260E 5EC4040E 4683E856 89E64689 FE578826 FC478826 0E5EC404 C..683F0 Þ.F..á^.&.G=&.W±.F|.VÒ.F..á^.&.G 000000
 F85689F6 4689FE57 8826FC47 88260E5E C4040E46 83E05689 DE4689FE 576?26FC =&.W±.F8.VÅ.F..á^.&.G=&.W±.F-.V½ 000020
 FE478826 0E5EC402 0E4683E4 5689E246 89FE5788 26FC4788 260E5EC4 040E?683 .F..á^.&.G=&.W±.Fâ.VÕ.F..á^.&.G± 000040
 FF066A50 16EC4680 F45689F2 4689FE57 8826FC47 88260E5E C4040E46 83FA4689 .F°.F..á^.&.G=&.W±.F .V¶.F‡.Pj.. 000060
 7500EA7E 83EA4689 12C48300 0000F59A 006ADE76 FFE076FF 271268EE 76FFF076 vÞ.vŸh.'.vÅ.v8j..%....á..Fõ.~õ.u 000080
 76FFE876 FF136A01 3EE9EA46 880006E9 037400EC 7E830140 E9EA4688 0006E903 .Õ...FõÕM..~‡.t.Õ...FõÕ>.j..vÕ.v 0000A0
 83EA4689 14C48300 00012A9A 006A0A76 FF0C76FF 271868EE 76FFF076 FF066AE6 Ìj..vÞ.vŸh.'.v..v.j..*....á..Fõ. 0000C0
 1868EE76 FFF076FF 086ADE76 FFE076FF 176A0109 E9EA4688 0006E903 7500EA7E ~õ.u.Õ...FõÕ..j..vÅ.v8j..vÞ.vŸh. 0000E0
 EA468800 06E90375 00EA7E83 EA468914 C4830000 015F9A00 6A0A76FF 0C76FF27 '.v..v.j.._....á..Fõ.~õ.u.Õ...Fõ 000100
 929A006A 0A76FF0C 76FF2718 68EE76FF F076FF0A 6AF276FF F476FF0E 6A0004E9 Õâ.j..v¶.v¯j..vÞ.vŸh.'.v..v.j... 000120
 016AE276 FFE476FF 009FE9EA 46880006 E9037500 EA7E83EA 468914C4 83000001 ....á..Fõ.~õ.u.Õ...FõÕ...vÕ.vãj. 000140
 00EA7E83 EA468912 C4830000 01C19A00 6A0A76FF 0C76FF27 1768EE76 FFF076FF .vÞ.vŸh.'.v..v.j..ê....á..Fõ.~õ. 000160
 006A0A76 FF0C76FF 271768EE 76FFF076 FF0C6A03 6A006CE9 EA468800 06E90375 u.Õ...FõÕl.j.j..vÞ.vŸh.'.v..v.j. 000180
 F8460BF6 46880030 E9EA4688 0006E903 7500EA7E 83EA4689 10C48300 0001FE9A .±....á..Fõ.~õ.u.Õ...FõÕ=..F-.F½ 0001A0
 FFFF9A00 6ADE76FF E076FF27 1468EE76 FFF076FF 0F6A5016 FC468000 32E90374 t.Õ2..F=.Pj..vÞ.vŸh.'.vÅ.v8j.... 0001C0
 000012C8 CBC95F5E 1F0000E9 EA468800 06E90375 00EA7E83 EA468912 C4830000 ...á..Fõ.~õ.u.Õ...FõÕ...^_èùà... 0001E0

Dump of file SATURN:[PCCOMMON.DUMP.DLL]IFMDML.TMP;1 on 18-APR-1990 10:47:01.12
File ID (704,15,0)   End of file block 124 / Allocated 124

Virtual block number 78 (0000004E), 512 (0200) bytes

 F44680FA 5689F846 89FE5788 26FC4788 260E5EC4 040E4683 D88E0008 881E5657 WV.¡...Á.F..á^.&.G=&.W±.F½.V'.F¶ 000000
 F2468912 C4830000 02889A00 6A0A76FF 0C76FF27 1468F876 FFFA76FF 066A5016 .Pj..v'.v½h.'.v..v.j.......á..F· 000020
 68F876FF FA76FF06 6AF476FF F676FF13 6A0103E9 F2468800 06E90375 00F27E83 .-·.u.Õ...F·Õ..j..v—.v¶j..v'.v½h 000040
 46880006 E9037500 F27E83F2 468914C4 83000002 809A006A 0A76FF0C 76FF2719 .'.v..v.j..§....á..F·.-·.u.Õ...F 000060
 0002F29A 006A0A76 FF0C76FF 271468F8 76FFFA76 FF086A50 16EE4680 00CEE9F2 ·Õö..FŸ.Pj..v'.v½h.'.v..v.j..·.. 000080
 176A0A76 FF0C76FF 086A009C E9F24688 0006E903 7500F27E 83F24689 12C48300 ..á..F·.-·.u.Õ...F·Õ..j..v..v.j. 0000A0
 00F27E83 F2468914 C4830000 03249A00 6AEE76FF F076FF27 1968F876 FFFA76FF .v'.v½h.'.vÞ.vŸj..$....á..F·.-·. 0000C0
 76FF0C76 FF271468 F876FFFA 76FF0A6A 5016FC46 800067E9 F2468800 06E90375 u.Õ...F·Õg..F=.Pj..v'.v½h.'.v..v 0000E0
 FF0A6A00 35E9F246 880006E9 037500F2 7E83F246 8912C483 00000359 9A006A0A .j..Ÿ....á..F·.-·.u.Õ...F·Õ5.j.. 000100
 14C48300 0000819A 006AFC76 FFFE76FF 271968F8 76FFFA76 FF0E6A0A 76FF0C76 v..v.j..v'.v½h.'.v±.v=j..Ÿ....á. 000120
 24881E56 57000008 C8CBC95F 5E1F0000 E9F24688 0006E903 7500F27E 83F24689 .F·.-·.u.Õ...F·Õ...^_èùà...WV.¡$ 000140
 260E5EC4 040E4683 FE5689FC 4689FE57 8826FC47 88260E5E C4040E46 83088E02 ..Ä.F..á^.&.G=&.W±.F=.V±.F..á^.& 000160
 76FF2712 68FC76FF FE76FF01 6AF876FF FA76FFFA 5689F846 89FE5788 26FC4788 .G=&.W±.F½.V'.v'.v½j..v±.v=h.'.v 000180
 037F881E 56570000 00C8CBC9 5F5E1F00 00E912C4 83000002 569A006A 0A76FF0C ..v.j..V....á.Õ...^_èùà...WV.¡.. 0001A0
 68FFFF68 D88E030E 881E5657 000002C8 CBC95F5E 1F0000E9 08568806 4688D88E .Ä.F..V.Õ...^_èùà..¯WV.¡8..Áh..h 0001C0
 468918C4 830000FF FF9A006A 706A026A 006A006A 006A038A 681E016A 306AFFFF ..jÕj..h..j.j¯j.j.jpj.......á..F 0001E0
```

```
Dump of file SATURN:[PCCOMMON.DUMP.DLL]IFMDML.TMP;1 on 18-APR-1990 10:47:01.12
File ID (704,15,0)   End of file block 124 / Allocated 124

Virtual block number 79 (0000004F), 512 (0200) bytes

00050028 00040417 02030000 001003FD 00020005 CBC95F5E 1F0000E9 FE4688FE ±.F±Õ...^_èù....»...........+... 000000
00000000 00000000 00000000 001903F8 0002003E 000403C7 02030306 00100400 ....ø...ú...>...¾............... 000020
5689F446 89FE5788 26FC4788 260E5EC4 040E4683 D88EFFFF B81E5657 00001EC8 à...WV.¡...Ä.F..á^.&.G=&.W±.F¶.V 000040
4788260E 5EC4040E 4683EE56 89EC4689 FE578826 FC478826 0E5EC404 0E4683F6 -.F..á^.&.G=&.W±.Fâ.VŸ.F..á^.&.G 000060
FA5689F8 4689FE57 8826FC47 88260E5E C4040E46 83E45689 E24689FE 578826FC =&.W±.Fâ.VÕ.F..á^.&.G=&.W±.F¾.V' 000080
FE478826 0E5EC402 0E4683EA 5689E846 89FE5788 26FC4788 260E5EC4 040E4683 .F..á^.&.G=&.W±.FÕ.VÕ.F..á^.&.G± 0000A0
C4830000 000E9A00 6AE276FF E476FF27 1268F476 FFF676FF 066AF276 FFE64689 .Fî.v·j..v-.v¶h.'.vÕ.vâj..8....á 0000C0
E9F0468B 0006E903 7400F27E 830109E9 F0468800 06E90375 00F07E83 F0468910 ..Fþ.-þ.u.Õ...FþÕ...-·.t.Õ...FþÕ 0000E0
01139A00 6A0A76FF 0C76FF27 1868F476 FFF676FF 066AEC76 FFEE76FF 136A00FA •.j..vŸ.vèj..v-.v¶h.'.v..v.j.... 000100
6AE276FF E476FF17 6A00C5E9 F0468800 06E90375 00F07E83 F0468914 C4830000 ...á..Fþ.-þ.u.Õ...FþÕé.j..vÕ.vâj 000120
F07E83F0 468914C4 83000001 469A006A 0A76FF0C 76FF2718 68F476FF F676FF0A ..v-.v¶h.'.v..v.j..F....á..Fþ.-þ 000140
0C76FF27 1768F476 FFF676FF 016AE876 FFEA76FF 0090E9F0 46880006 E9037500 .u.Õ...FþÕ...vÕ.vÕj..v-.v¶h.'.v. 000160
6A005DE9 F0468800 06E90375 00F07E83 F0468912 C4830000 01759A00 6A0A76FF .v.j..u....á..Fþ.-þ.u.Õ...FþÕ].j 000180
88F04689 10C48300 0001A39A 006A0A76 FF0C76FF 271768F4 76FFF676 FF086A01 .j..v-.v¶h.'.v..v.j..È....á..Fþ. 0001A0
E276FFE4 76FF2714 68F476FF F676FF0F 6A5016FC 46800032 E90374FA 4608F846 F¾.F*t.Õ2..F=.Pj..v-.v¶h.'.vÕ.vâ 0001C0
C95F5E1F 0000E9F0 46880006 E9037500 F07E83F0 468912C4 830000FF FF9A006A j.......á..Fþ.-þ.u.Õ...FþÕ...^_è 0001E0

Dump of file SATURN:[PCCOMMON.DUMP.DLL]IFMDML.TMP;1 on 18-APR-1990 10:47:01.12
File ID (704,15,0)   End of file block 124 / Allocated 124

Virtual block number 80 (00000050), 512 (0200) bytes

89FC4689 FE578826 FC478826 0E5EC404 0E468308 8E000888 1E565700 000EC8C8 ùà...WV.¡...Ä.F..á^.&.G=&.W±.F=. 000000
83000002 309A006A 0A76FF0C 76FF2714 68FC76FF FE76FF06 6A5016F8 4680FE56 V±.F¾.Pj..v±.v=h.'.v..v.j..Õ.... 000020
76FF066A F876FFFA 76FF136A 009CE9F6 46880006 E9037500 F67E83F6 468912C4 á..F-.--.u.Õ...F-Õ..j..v'.v¾j..v 000040
037500F6 7E83F646 8914C483 00000262 9A006A0A 76FF0C76 FF271968 FC76FFFE ±.v=h.'.v..v.j..b....á..F-.—.u. 000060
6A0A76FF 0C76FF27 1468FC76 FFFE76FF 0A6A5016 F2468000 67E9F646 880006E9 Õ...F-Õg..F·.Pj..v±.v=h.'.v..v.j 000080
0C76FF0A 6A0035E9 F6468800 06E90375 00F67E83 F6468912 C4830000 02979A00 .......á..F-.—.u.Õ...F-Õ5.j..v. 0000A0
468914C4 83000000 9A9A006A F276FFF4 76FF2719 68FC76FF FE76FF17 6A0A76FF .v.j..v±.v=h.'.v¶.v·j.......á..F 0000C0
8E01C988 1E565700 0000C8CB C95F5E1F 0000E9F6 46880006 E9037500 F67E83F6 -.--.u.Õ...F-Õ...^_èùà...WV.¡è.. 0000E0
FF68FFFF 68088E02 B0881E56 57000002 C8CBC95F 5E1F0000 E9085688 06468808 Ä.F..V.Õ...^_èùà...WV.¡§..Äh..h. 000100
FE468918 C4830000 FFFF9A00 6A6F6A02 6A006A00 6A006A03 A2681E01 6A306AFF .jOj..hÅ.j.j.j.j.joj.......á..F± 000120
00050028 000402F6 02030000 0011020C 00020005 90CBC95F 5E1F0000 E9FE4688 .F±Õ...^_èù.....É.......-...+... 000140
00000000 00000000 00000000 001902D7 0002003E 000401F8 02030285 001102DF Õ...ç...«...>...■............... 000160
5689F646 89FE5788 26FC4788 260E5EC4 040E4683 D88EFFFF B81E5657 00000CC8 à...WV.¡...Ä.F..á^.&.G=&.W±.F-.V 000180
4788260E 5EC4020E 4683FE56 89FC4689 FE578826 FC478826 0E5EC404 0E4683F8 ½.F..á^.&.G=&.W±.F=.V±.F..á^.&.G 0001A0
50520006 050C5688 0A468804 57892602 478926FE 5688FC46 880A5EC4 FA4689FE ±.F*á^..F=.V±&.G.&.W..F..V....RP 0001C0
88F44689 12C48300 00FFFF9A 006A0676 FF0876FF 271268F6 76FFF876 FFFA76FF .v'.v¾.v-h.'.v..v.j.......á..F¶. 0001E0

Dump of file SATURN:[PCCOMMON.DUMP.DLL]IFMDML.TMP;1 on 18-APR-1990 10:47:01.12
File ID (704,15,0)   End of file block 124 / Allocated 124

Virtual block number 81 (00000051), 512 (0200) bytes

4788260E 5EC4040E 4683D88E 0008881E 56570000 04C8CBC9 5F5E1F00 00E9F446 F¶Õ...^_èùà...WV.¡...Ä.F..á^.&.G 000000
5E1F0000 E90000B8 078926FC 5EC40647 88260A5E C4FE5689 FC4689FE 578826FC =&.W±.F=.V±á^.&.G.á^=&..¡..Õ...^ 000020
5F5E1F00 00E90457 88260247 8826065E C4088E00 92881E56 57000000 C8CBC95F _èùà...WV.¡...Äá^.&.G.&.W.Õ...^_ 000040
006A086A 0384681E 016A306A FFFF68FF FF68088E 00C8881E 56570000 02C8CBC9 Èùà...WV.¡ù..Äh..h..jOj..hÇ.j.j. 000060
0005CBC9 5F5E1F00 00E9FE46 88FE4689 18C48300 00FFFF9A 006A706A 016A006A j.j.j)j.......á..F±.F±Õ...^_èù.. 000080
003E0004 00750203 00280004 01090203 00000012 00EF0002 00C30012 00F20005 ..·...û...ÿ...........+...u...>. 0000A0
040E4683 D88EFFFF B81E5657 00000AC8 00000000 00000000 00000019 00EA0002 ..õ.............à...WV.¡...Ä.F.. 0000C0
FE578826 FC478826 0E5EC404 0E4683FE 5689FC46 89FE5788 26FC4788 260E5EC4 á^.&.G=&.W±.F=.V±.F..á^.&.G=&.W± 0000E0
76FF2712 68FC76FF FE76FF02 6AF676FF F876FF00 07C626F6 5EC4F856 89F64689 .F-.V½á^-&ó...v½.v-j..v±.v=h.'.v 000100
000000C8 CBC95F5E 1F0000E9 FA4688FA 468912C4 830000FF FF9A006A 0A76FF0C ..v.j.......á..F*.F*Õ...^_èùà... 000120
0074881E 56570000 02C8CBC9 5F5E1F00 00E90856 88064688 D88E0008 881E5657 WV.¡...Ä.F..V.Õ...^_èùà..¯WV.¡t. 000140
00FFFF9A 006A7F6A 026A006A 006A006A 03C6681E 016A306A FFFF68FF FF68D88E .Äh..h..jOj..hó.j.j.j.j.j.j..... 000160
00960005 00280004 00A00203 0005CBC9 5F5E1F00 00E9FE46 88FE4689 18C48300 ..á..F±.F±Õ...^_èù....Ú...+..... 000180
00000000 00000019 008E0002 003E0004 00570203 00000013 00930002 006C0013 ..l...........W...>............. 0001A0
5689FC46 89FE5788 26FC4788 260E5EC4 040E4683 D88EFFFF B81E5657 00000AC8 à...WV.¡...Ä.F..á^.&.G=&.W±.F=.V 0001C0
F876FF00 07C626F6 5EC4F856 89F64689 FE578826 FC478826 0E5EC404 0E4683FE ±.F..á^.&.G=&.W±.F-.V½á^-&ó...v½ 0001E0
```

```
Dump of file SATURN:[PCCOMMON.DUMP.DLL]IFMDML.TMP;1 on 18-APR-1990 10:47:01.12
File ID (704,15,0)   End of file block 124 / Allocated 124

Virtual block number 82 (00000052), 512 (0200) bytes

 468912C4 830000FF FF9A006A 0A76FF0C 76FF2712 68FC76FF FE76FF02 6AF676FF .v~j..vz.veh.'.v..v.j.......6..F 000000
 260E5EC4 040E4683 D88E0008 B81E5657 00000AC8 CBC95F5E 1F0000E9 FA4688FA '.F'Õ...^ èùà...WV.¡...Ä.F..6^.& 000020
 89FC4689 FE578?26 FC478826 0E5EC404 0E4683FA 5689F846 89FE5788 26FC4788 .G=&.Wz.F%.V'.F..6^.&.G=&.Wz.F•. 000040
 00000057 9A006A0A 76FF0C76 FF271468 F876FFFA 76FF186A FC76FFFE 76FFFE56 Vz.vz.vej..v'.V%h.'.v..v.j..W... 000060
 CBC95F5E 1F0000E9 00008800 06E9F646 880006E9 037500F6 7E83F646 8912C483 .6..F-.--.u.Õ...F-Õ..¡..Õ...^_èù 000080
 56570000 02C8CBC9 5F5E1F00 00E90856 88064688 D88E0074 881E5657 000000C8 à...WV.¡t..Ä.F..V.Õ...^_èùà..¯WV 0000A0
 6A008068 026A006A 006A006A 0302681E 016A306A FFFF68FF FF68D88E 00E8881E .¡Õ..Ah..h..jÕj..h@.j.j¯j.j.h..j 0000C0
 00040122 02030005 90CBC95F 5E1F0000 E9FE4688 FE468918 C4830000 FFFF9A00 .......á..Fz.FzÕ...^_èù.....". .. 0000E0
 00190102 000200E0 0014010A 0005003E 0004008C 02030000 00140107 00020028 +...........¥...>.......Å....... 000100
 16FE468D D88EFFFF 881E5657 000004C8 00000000 00000000 00000000 00000000 ................à...WV.¡...Ä.Fz. 000120
 63386850 16FC468D 0CC48300 0000309A 006A37FF 260277FF 26065EC4 63386850 Ph8cá^.&.w.&.7j..=....6..F=.Ph8c 000140
 5F5E1F00 00E9FC46 28FE4688 0CC48300 00FFFF9A 006A37FF 260277FF 260A5EC4 á^.&.w.&.7j.......á..Fz+F=Õ...^_ 000160
 FF0C76FF 271668E0 76FFE276 FF50160E 4680D88E 0008881E 56570000 2CC8CBC9 èùà,..WV.¡...Ä.F8.P.vā.vÄh.'.v.¯ 000180
 4683028D E9084688 0006E903 7500087E 83084689 10C48300 0000E29A 006A0A76 v.j..ã....á..FÄ.-A.u.Õ...FAÕ§..F 0001A0
 8826FC47 88260E5E C4040E46 83E25689 E04689FE 578826FC 4788260E 5EC4040E ..á^.&.G=&.Wz.FÄ.Vā.F..á^.&.G=&. 0001C0
 50000388 0003E900 03880006 E9037429 DE7E8350 16E8468D E65689E4 4689FE57 Wz.FÕ.VÌ.FÕ.P.-B)t.Õ..¡..Õ..¡..P 0001E0

Dump of file SATURN:[PCCOMMON.DUMP.DLL]IFMDML.TMP;1 on 18-APR-1990 10:47:01.12
File ID (704,15,0)   End of file block 124 / Allocated 124

Virtual block number 83 (00000053), 512 (0200) bytes

 8BE84688 D8468912 C4830000 013C9A00 6A0A76FF 0C76FF27 1368E076 FFE276FF .vā.vÄh.'.v..v.j..<....á..FÄ.FÕ. 000000
 46800086 E9037502 47082607 8826F85E C404F846 830004E9 FA5689F8 4689EA56 VÕ.F%.V'Õ...F%.á^%&..&.G.u.Õ...F 000020
 C4271468 E076FFE2 76FF5000 04880003 E90004B8 0006E903 7429DE7E 835016F2 ·.P.-B)t.Õ..¡..Õ..¡..P.vā.vÄh.'á 000040
 E90003E9 03750008 7E830846 8912C483 00000168 9A006A37 FF260277 FF26F85E ^%&.w.&.7j..k....á..FÄ.-Ä.u.Õ..Õ 000060
 83000001 AC9A006A F276FFF4 76FF2714 68E076FF E276FF02 6A501604 4680FFA9 `..Få.Pj..vā.vÄh.'.v¶.v·j..¯.... 000080
 00031C9A D476FFD6 76FF5016 E4468DFF 7AE90003 E9037500 D87E83D8 468912C4 á..FÄ.-Ä.u.Õ..Õz..FÕ.P.v@.vå.... 0000A0
 000001EF 9A006A0A 76FF0C76 FF271568 E076FFE2 76FFE876 FFEA76FF FF67E900 .Õg..vÕ.vÕ.vā.vÄh.'.v..v.j..ÿ... 0000C0
 037429DE 7E835016 0A468001 86E90846 880006E9 03750008 7E830846 8910C483 .á..FÄ.-Ä.u.Õ...FAÕ...FÕ.P.-B)t. 0000E0
 549A006A 0A76FF0C 76FF2713 68E076FF E276FF50 00048800 03E90004 880006E9 Õ..¡..Õ..¡..P.vā.vÄh.'.v..v.j..T 000100
 46890C56 880A4688 0143E908 46880006 E9037500 D87E8308 468912C4 83000002 ....á..FÄ.-Ä.u.Õ...FAÕC..FÖ.VÉ.F 000120
 835016EC 4680D0F9 E9037502 47082607 8826F85E C404F846 830004E9 FA5689F8 %.V'Õ...F%.á^%&..&.G.u.Õ'..F$.P. 000140
 76FF0C76 FF271468 E076FFE2 76FF5000 06880003 E9000688 0006E903 7429DE7E ~B)t.Õ..¡..Õ..¡..P.vā.vÄh.'.v..v 000160
 6A5016FC 4680FF. · E90003E9 03750008 7E830846 8912C483 00000283 9A006A0A .j.......á..FÄ.-A.u.Õ..ÕU..F=.Pj 000180
 087E8308 468912L. 83000003 389A006A EC76FFEE 76FF2714 68E076FF E276FF02 ..vā.vÄh.'.vŸ.vśj..;....á..FÄ.-Ä 0001A0
 00FFFF9A 50160446 800A6AFC 76FFFE76 FFE076FF E276FFFF 7EE90003 E9037500 .u.Õ..Õ-..vā.vÄ.vz.v=j..Få.P.... 0001C0
 16F6468D D476FFD6 76FFE076 FFE276FF FF57E900 03E90375 00087E83 D8468900 ..FÄ.-Ä.u.Õ..ÕW..vā.vÄ.v@.vå.F-. 0001E0

Dump of file SATURN:[PCCOMMON.DUMP.DLL]IFMDML.TMP;1 on 18-APR-1990 10:47:01.12
File ID (704,15,0)   End of file block 124 / Allocated 124

Virtual block number 84 (00000054), 512 (0200) bytes

 76FF0032 E9037402 F67E83FF 32E90003 E9037500 D87E8308 46890000 FFFF9A50 P......FÄ.-A.u.Õ..Õ2..--.t.Õ2..v 000000
 0010E903 7400F07E 83084689 0000FFFF 9A5016F0 46800476 FFD676FF E476FFE6 Ì.vÕ.v@.vå.FÞ.P......FÄ.-Þ.t.Õ.. 000020
 68E076FF E276FFDA 76FFDC76 FFFEF4E9 0000FFFF 9AD476FF D676FF50 16E4468D .FÕ.P.v@.vå.....Õ¶z.vÉ.vÕ.vā.vÄh 000040
 CBC95F5E 1F0000E9 D8468808 468910C4 83000000 219A006A 0A76FF0C 76FF2715 .'.v..v.j..!....á..FÄ.FÄÕ...^ èù 000060
 5689EE46 89FE5788 26FC4788 260E5EC4 040E4683 D88E005A 881E5657 000024C8 à$..WV.¡Z..Ä.F..á^.&.G=&.Wz.FŸ.V 000080
 76FFF076 FF5016EC 4680DE56 890C4689 FE578826 FC478826 0E5EC404 0E4683F0 Þ.F..á^.&.G=&.Wz.FÉ.V8.F$.P.vÞ.v 0000A0
 0006E903 7500E07E 83E04689 10C48300 0003E09A 006A0A76 FF0C76FF 271668EE Ÿh.'.v..v.j..Ä....á..FÄ.-Ä.u.Õ.. 0000C0
 76FF5000 04880003 E90004B8 0006E903 7429EC7E 835016E2 46800303 E9E04688 .FÄÕ...Fā.P.-$)t.Õ..¡..Õ..¡..P.v 0000E0
 037500E0 7E83E046 9912C483 0000047A 9A006A0A 76FF0C76 FF271368 EE76FFF0 Þ.vŸh.'.v..v.j..z....6..FÄ.-Ä.u. 000100
 26FC5EC4 04FC4683 0004E9FE 5689FC46 89E45688 E2468802 C0E9E046 880006E9 Õ...FÄÕá..Fā.VÕ.F=.VzÕ...F=.á^=& 000120
 5EC45000 08880003 E9000888 0006E903 7429EC7E 830047E9 03750247 08260788 ..&.G.u.ÕG..-$)t.Õ..¡..Õ..¡..Pá^ 000140
 8D12C483 0000056E 9A006A7D 6A5016F2 4680EE76 FFF076FF 37FF2602 77FF26FC =&.w.&.7.vÞ.vŸ.F·.Pj)j..n....á.. 000160
 1568EE76 FFF076FF E276FFE4 76FFFFA6 E9000005 859AF276 FFF476FF 50160C46 FÉ.P.v¶.v·.....ÕI..vÕ.vā.vÞ.vŸh. 000180
 E9037429 EC7E8350 16E2468D E0468910 C4830000 04AE9A00 6A0A76FF 0C76FF27 '.v..v.j..Ù....á..FÄ.Fā.P.-$)t.Õ 0001A0
 05229A00 6A0A76FF 0C76FF27 1368EE76 FFF076FF 50000388 0003E900 03880006 ..¡..Õ..¡..P.vÞ.vŸh.'.v..v.j..". 0001C0
 8826FC5E C404FC46 830004E9 FE5689FC 4689E456 88E24688 E0468912 C4830000 ...á..FÄ.Fā.VÕ.F=.VzÕ...F=.á^=&.. 0001E0
```

```
Dump of file SATURN:[PCCOMMON.DUMP.DLL]IFMDML.TMP;1 on 18-APR-1990 10:47:01.12
File ID (704,15,0)   End of file block 124 / Allocated 124

Virtual block number 85 (00000055), 512 (0200) bytes

75000030 00008800 03E90008 880006E9 037426EC 7E830184 E9037502 47082607 .&.G.u.Ö...-&&t.Ö..¡..Ö..¡..*..u 000000
FFF076FF 50000068 0003E900 08880006 E9037426 EC7E8350 16EA4680 0098E903 .Ö...Fõ.P.-&&t.Ö..¡..Ö..¡..P.vÞ. 000020
00E07E83 E0468912 C4830000 058A9A00 6A37FF26 0277FF26 FC5EC427 1268EE76 vŸh.'á^•&.w.&.7j..¤....á..FÁ.-Á. 000040
0003E900 06880006 E9037429 EC7E8300 48E90375 00EA7E83 FF8FE900 03E90375 u.Ö..Ö...-õ.u.ÖK..-$)t.Ö..¡..Ö.. 000060
061F9A00 6A7D6A50 16F24680 EE76FFF0 76FF37FF 260277FF 26FC5EC4 50000688 ¡..Pá^•&.w.&.7.vÞ.vŸ.F·.Pj)j.... 000080
16E64680 FF38E90( 0006329A 37FF2602 77FF26FC 5EC45016 DC468012 C4830000 ...á..FÉ.Pá^•&.w.&.7.2...Ö;..F¦. 0000A0
FC5EC427 1368EE76 FFF076FF 50000388 0003E900 03880006 E9037429 EC7E8350 P.-$)t.Ö..¡..Ö..¡..P.vÞ.vŸh.'á^• 0000C0
FEF7E900 03E90375 00E07E83 E0468912 C4830000 06519A00 6A37FF26 0277FF26 &.w.&.7j..Q....á..FÁ.-Á.u.Ö..Ö%± 0000E0
E9037502 47082607 8826F65E C404F646 830004E9 F85689F6 4689E856 88E64688 .F¦.VÖ.F-.VŸÖ...F-.á^-&..&.G.u.Ö 000100
FF37FF26 0277FF26 F65EC450 00088800 03E90008 880006E9 037429EC 7E830047 G..-$)t.Ö..¡..Ö..¡..Pá^-&.w.&.7. 000120
76FFF476 FF50160C 468012C4 830000FF FF9A006A 7D6A5016 F24680EE 76FFF076 vÞ.vŸ.F·.Pj)j.......á..FÉ.P.v¶.v 000140
006A0A76 FF0C76FF 271568EE 76FFF076 FFE676FF E876FFFF A6E90000 01809AF2 ·.....Ö¦..vÖ.v¦.vÞ.vŸh.'.v..v.j. 000160
0C76FF27 1568EE76 FFF076FF E276FFE4 76FFFE69 E9E04689 10C48300 0006769A .v....á..FÁÖi±.vÖ.vã.vÞ.vŸh.'.v. 000180
0000FFFF 9A5016FA 4680DC76 FFDE76FF E0468910 C4830000 00759A00 6A0A76FF .v.j..u....á..FÁ.v8.vÉ.F•.P..... 0001A0
0000FFFF 9AFFFF68 FFFF680C 76FFDE76 FF001AE9 00008800 06E90375 00FA7E83 .-•.u.Ö..¡..Ö...v8.vÉh..h....... 0001C0
5EC4040E 4683D88E 0358881E 56570000 7AC8C8C9 5F5E1F00 00E9E046 88E04689 .FÁ.FÁÖ...^_èùàz..WV.¡X..A.F..á^ 0001E0

Dump of file SATURN:[PCCOMMON.DUMP.DLL]IFMDML.TMP;1 on 18-APR-1990 10:47:01.12
File ID (704,15,0)   End of file block 124 / Allocated 124

Virtual block number 86 (00000056), 512 (0200) bytes

4689FE57 8826FC47 88260E5E C4040E46 83945689 924689FE 578826FC 4788260E .&.G•&.W±.F..V..F..á^.&.G•&.W±.F 000000
0E5EC404 0E46839E 56899C46 89FE5788 26FC4788 260E5EC4 040E4683 8C56898A ..V..F..á^.&.G•&.W±.F..V..F..á^. 000020
FF0C76FF 27166892 76FF9476 FF501690 4680FE56 89FC4689 FE578826 FC478826 &.G•&.W±.F•.V±.F..P.v..v.h.'.v.. 000040
468002A8 E98E4688 0006E903 75008E7E 838E4689 10C48300 0007789A 006A0A76 v.j..x....á..F..-..u.Ö...F.Ö¨..F 000060
FF271468 9276FF94 76FF5000 0A880003 E9000C88 0006E903 7429907E 83501696 ..P.-.)t.Ö..¡..Ö..¡..P.v..v.h.'. 000080
65E98E46 880006E9 0375008E 7E838E46 8912C483 00000390 9A006A8A 76FF8C76 v..v.j.......á..F..-..u.Ö...F.Öe 0000A0
008E7E83 8E468900 00FFFF9A 5016A046 801A6A9C 76FF9E76 FF9276FF 9476FF02 ..v..v..v..v.j..F..P......F..-.. 0000C0
26A076C4 02E3C19A 5E889A46 FF0003E9 00009A46 C70238E9 8E468800 06E90375 u.Ö...F.Ö;.úF...Ö...F..^.èD.áv.& 0000E0
E3C19A5E 88271468 9276FF94 76FF036A 5016F846 800058E9 03750240 08260088 ..&.ə.u.ÖX..F%.Pj..v..v.h.'.^.èD 000100
06E90375 008E7E83 8E468912 C4830000 08889A00 6A30FF26 0270FF26 A076C402 .áv.&.p.&.0j.......á..F..-..u.Ö. 000120
0003E900 03E90374 FA563900 08E90374 F8463998 56889646 8801DFE9 8E468800 ..F.ÖÖ..F..V.9F%t.Ö..9V•t.Ö..Ö.. 000140
76C402E3 C19A5E88 0152E903 75024008 26008826 A076C402 E3C19A5E 88FF90E9 Ö...^.èD.áv.&..&.ə.u.ÖR..^.èD.áv 000160
E9000388 0006E903 7429907E 83501686 4680F256 89F04689 02508826 008826A0 .&..&.P..FÞ.V·.F..P.-.)t.Ö..¡..Ö 000180
8912C483 000008FE 9A006A0A 76FF0C76 FF271368 9276FF94 76FF5000 03880003 ..¡..P.v..v.h.'.v..v.j..±.....á.. 0001A0
E900009A 46C7F446 89F64689 00008801 55E98E46 880006E9 0375008E 7E838E46 F..-..u.Ö...F.ÖU.¡...F-.F¶úF...Ö 0001C0
835016F4 46800069 E9037502 40082600 88268676 C402E3C1 9A5E889A 46FF0003 ...F..^.èD.áv.&..&.ə.u.Öi..F¶.P. 0001E0

Dump of file SATURN:[PCCOMMON.DUMP.DLL]IFMDML.TMP;1 on 18-APR-1990 10:47:01.12
File ID (704,15,0)   End of file block 124 / Allocated 124

Virtual block number 87 (00000057), 512 (0200) bytes

E3C19A5E 88271468 9276FF94 76FF5000 04880003 E9000488 0006E903 7429907E -.)t.Ö..¡..Ö..¡..P.v..v.h.'.^.èD 000000
06E90375 008E7E83 8E468912 C4830000 09659A00 6A30FF26 0270FF26 8676C402 .áv.&.p.&.0j..e....á..F..-..u.Ö. 000020
0003E900 03E90374 F6563900 08E90374 F44639F2 5688F046 88000FE9 8E468800 ..F.ÖÖ..FÞ.V 9F¶t.Ö..9V-t.Ö..Ö.. 000040
8876FF02 57892607 8926FC5E C4025088 26008826 8676C402 E3C19A5E 88FF7FE9 Ö...^.èD.áv.&..&.P.á^•&..&.W..v. 000060
838E4689 10C48300 0007359A 006A0A76 FF0C76FF 27156892 76FF9476 FF8676FF .v..v..v.h.'.v..v.j..5....á..F.. 000080
74F65639 000EE903 74F44639 F25688F0 46880078 E98E4688 0006E903 75008E7E -..u.Ö...F.Öx..FÞ.V·9F¶t.Ö..9V-t 0000A0
FFFF9A50 16A44680 026A9C76 FF9E76FF 9276FF94 76FF005C E9000088 0006E903 .Ö..¡..Ö\..v..v..v..v.j..FÊ.P... 0000C0
FC76FFFE 76FF9276 FF9476FF 0A76FF0C 76FF9C76 FF9E76FF 8A76FF8C 76FF0000 ...v..v..v..v..v..v..v..v..v±.v• 0000E0
8E468918 C4830000 04489A00 6A500067 880003E9 006D8800 06E90374 29%.'E83 .-.)t.Ö..¡m.Ö..¡g.Pj..H....á..F. 000100
88260E5E C4040E46 83088E06 C6881E56 57000046 C8C8C95F 5E1F0000 E98E 488 .F.Ö...^_èùàF..WV.¡ó..Ä.F..á^.&. 000120
56898C46 89FE5788 26FC4788 260E5EC4 040E4683 D85689D6 4689FE57 8826F.47 G•&.W±.Fø.VÁ.F..á^.&.G•&.W±.F¥.V 000140
4788260E 5EC4040E 4683C456 89C24689 FE578826 FC478826 0E5EC404 0E46838E ƒ.F..á^.&.G•&.W±.Fó.Vá.F..á^.&.G 000160
C85689C6 4689FE57 8826FC47 88260E5E C4040E46 83FE5689 FC4689FE 578826FC •&.W±.F•.V±.F..á^.&.G•&.W±.Fó.Và 000180
468910C4 8300000A CA9A006A 0A76FF0C 76FF2716 680676FF D876FF50 16044680 .Fà.P.vA.vøh.'.v..v.j..ò....á..F 0001A0
0C880006 E9037429 047E8350 160E4680 049AE9C0 46880006 E9037500 C07E83C0 á.-à.u.Ö...Fãö...F8.P.-å)t.Ö..¡. 0001C0
C4830000 08509A00 6ABC76FF 8E76FF27 14680676 FFD876FF 50000A88 0003E900 .Ö..¡..P.vA.vøh.'.vƒ.v¥j..P....á 0001E0
```

```
Dump of file SATURN:[PCCOMMON.DUMP.DLL]IFMDML.TMP;1 on 18-APR-1990 10:47:01.12
File ID (704,15,0)   End of file block 124 / Allocated 124

Virtual block number 88 (00000058), 512 (0200) bytes

6AC276FF C476FFD6 76FFD876 FF0457E9 C0468800 06E90375 00C07E83 C0468912 ..Fà.~à.u.Õ...FàÕW..vÄ.vø.vá.vôj 000000
E246C704 2DE9C046 880006E9 037500C0 7E83C046 89000007 A59A5016 CA46801B ..Fò.P.É....Fà.~à.u.Õ...FàÕ-.úFâ 000020
F0468000 58E90375 02400B26 008B26CA 76C402E3 C1E25E8B E246FF00 03E90000 ..Õ...Fã.^ãèD.ávò&..&.a.u.ÕX..Fþ 000040
39E0568B DE46B803 D1E9C046 880006E9 037500C0 7E83C046 FFD876FF 036A5016 .Pj..vÄ.vøh.'.^ãèD.ávò&.p.&.0j.. 000060
8B26CA76 C402E3C1 E25E88FF 90E90003 E90003E9 8912C483 000007FE ±....á..Fà.~à.u.Õ...FàÕI..F8.VÁ9 000080
0BE4468B 00000EA1 9ACA76FF CC76FFD6 76FFD876 0374F256 390008E9 0374F046 Fþt.Õ..9V t.Õ..Õ..Õ...^ãèD.ávò&. 0000A0
FF500004 880003E9 00048800 06E90374 29047E83 FFE65689 E4468902 508B2600 .&.P..Fõ.V¦.vÁ.vø.vä.vò.À....Fõ. 0000C0
7500C07E 83C0468. 12C48300 000C579A 006A0A76 5016F446 8D033FE9 0375E646 F¦u.Õ?..F¶.P.~â)t.Õ..¡..Õ..¡..P. 0000E0
5E8BE246 FF0003E9 0000E246 C7CE4689 00468900 FF0C76FF 27136806 76FFD876 vÄ.vøh.'.v..v.j..W....á..Fà.~à.u 000100
06E90374 29047E83 5016CE46 8D0069E9 03750240 00B80340 E9C04688 0006E903 .Õ...FàÕa.¡...FÀ.FòúFã..Õ...Fã.^ 000120
70FF26F4 76C402E3 C1E25E88 27146806 76FFD876 0B260088 26F476C4 02E3C1E2 ãèD.áv¶&..&.a.u.Õi..Fö.P.~â)t.Õ. 000140
02CAE9C0 46880006 E9037500 C07E83C0 468912C4 FF500006 880003E9 00068800 .¡..Õ..¡..P.vÁ.vøh.'.^ãèD.áv¶&.p 000160
C1E25E88 FF7FE900 03E90003 E9037400 56390008 8300000C BE9A006A 30FF2602 .&.0j../....á..Fà.~à.u.Õ...FàÕò. 000180
FFD876FF F476FFF6 76FF0257 89260789 26FC5EC4 E90374CE 4639E656 88E4468B .Fõ.V¦9Fot.Õ..9VÂt.Õ..Õ..Õ...^ãè 0001A0
06E90375 00C07E83 C0468910 C4830000 00109A00 02508826 008826F4 76C402E3 D.áv¶&..&.P.á^•&..&.W..v~.v¶.vÁ. 0001C0
                                            6A0A76FF 0C76FF27 15680676 vøh.'.v..v.j.......á..Fà.~à.u.Õ. 0001E0

Dump of file SATURN:[PCCOMMON.DUMP.DLL]IFMDML.TMP;1 on 18-APR-1990 10:47:01.12
File ID (704,15,0)   End of file block 124 / Allocated 124

Virtual block number 89 (00000059), 512 (0200) bytes

7429D47E 835016F8 468D01F4 E9037402 470B2607 8826FC5E C40263E9 C0468800 ..FàÕc.á^•&..&.G.t.Õ¶..F½.P.~â)t 000000
9A006A0A 76FF0C76 FF271368 D676FFD8 76FF5000 03B80003 E90003B8 0006E903 .Õ..¡..Õ..¡..P.vÄ.vøh.'.v..v.j.. 000020
46C70000 BA46C702 11E9C046 880006E9 037500C0 7E83C046 8912C483 00000082 .....á..Fà.~à.u.Õ...FàÕ..úFo..úF 000040
46800136 E9037502 40082600 8826F876 C402E3C1 E25E88E2 46FF0003 E90000E2 ã..Õ...Fã.^ãèD.áv½&..&.a.u.Õ6..F 000060
88271368 D676FFD8 76FF5000 03B80003 E90003B8 0006E903 7429047E 835016EC &.P.~â)t.Õ..¡..Õ..¡..P.vÄ.vøh.'. 000080
00C07E83 C0468912 C4830000 00F89A00 6A30FF26 0270FF26 F876C402 E3C1E25E ^ãèD.áv½&.p.&.0j..½....á..Fá.~á. 0000A0
88E246FF 0003E900 000246C7 E84689EA 46890000 88019FE9 C0468800 06E90375 u.Õ...FàÕ..¡...Fõ.FòúF@..Õ...Fã. 0000C0
E9037429 D47E8350 160A468D 0081E903 7502400B 26008826 EC76C402 E3C1D25E ^@èD.ávš&..&.a.u.ÕŸ..FÕ.P.~â)t.Õ 0000E0
FF26EC76 C402E3C1 D25E8827 14680676 FFD876FF 50000688 0003E900 06880006 ..¡..Õ..¡..P.vÁ.vøh.'.^@èD.ávš&. 000100
29E9C046 880006E9 037500C0 7E83C046 8912C483 00000E38 9A006A30 FF260270 p.&.0j..;....á..Fà.~à.u.Õ...FàÕ) 000120
680676FF 0876FF50 00068800 03E90006 880006E9 03742904 7E835016 CE468001 ..Fö.P.~â)t.Õ..¡..Õ..¡..P.vÁ.vøh 000140
468B0006 E9037500 C07E83C0 468912C4 8300000A 879A006A E876FFEA 76FF2714 .'.vö.vÒj.......á..Fà.~à.u.Õ...F 000160
E90001BA 46C70008 E90374D0 56390010 E90374CE 4639E656 88E4468B 00E6E9C0 àÕ¦..Fõ.V¦9Fot.Õ..9VÂt.Õ..úFo..Õ 000180
0789260C 5688DA46 8BFC5EC4 FEB2E900 03E90003 E9037500 BA7E83FF 37E90003 ..Õ7..~o.u.Õ..Õ..Õy±á^•.FO.VÉ&.. 0001A0
06E90375 00C07E83 C0468900 000EC49A F876FFFA 76FFD676 FFD876FF 02578926 &.W..vÁ.vø.v².v½.á....Fà.~à.u.Õ. 0001C0
7500C07E 83C04689 0000FFFF 9AEC76FF EE76FFD6 76FFD876 FF0083E9 C0468800 ..FàÕ...vÁ.vø.vŸ.vš......Fà.~à.u 0001E0

Dump of file SATURN:[PCCOMMON.DUMP.DLL]IFMDML.TMP;1 on 18-APR-199U ):47:01.12
File ID (704,15,0)   End of file block 124 / Allocated 124

Virtual block number 90 (0000005A), 512 (0200) bytes

0006E903 74005639 000EE903 74CE4639 E65688E4 46880060 E9C0468B 0006E903 .Õ...FàÕ'..Fõ.V¦9Föt.Õ..9VÂt.Õ.. 000000
76FFD676 FFD876FF C676FFC8 76FFC276 FFC476FF BC76FFBE 76FF0044 E90000B8 ¡..ÕD..v/.v¥.vá.vô.và.vó.vÄ.vø.v 000020
C4830000 09E69A00 6A500068 880003E9 006EB800 06E90374 29047E83 FC76FFFE ±.v•.~â)t.Õ..¡n.Õ..¡h.Pj..Ì....á 000040
00070300 0203000B 00050BA8 0203000E 90CBC95F 5E1F0000 E9C0468B C0468918 ..Fá.FàÕ...^_èù.....¯...Ù....... 000060
0007068C 02030000 001506A9 0005010C 00070458 020300E7 00050202 020301CD ë...@...Ô...Ï...É...`........... 000080
00050AF7 02030000 001506A6 00020092 000509AE 020301F5 000706AC 020301E9 Õ...¯...¾...Ü.......Ï.......¾... 0000A0
00040F2A 02030000 00190A03 00020088 000502AD 0203003E 000408E1 020300AC ¯...Ã...>...Ù...¡...........ª... 0000C0
040E4683 D88EFFFF B81E5657 000012C8 00000000 00000000 00000000 0000004B K...............à...WV.¡...Ä.F.. 0000E0
FE578826 FC478826 0E5EC404 0E4683FA 5689F846 89FE5788 26FC4788 260E5EC4 á^.&.G•&.W±.F½.V².F..á^.&.G•&.W± 000100
C4040E46 83F45689 F24689FE 578826FC 4788260E 5EC4040E 4683FE56 89FC4689 .F•.V±.F..á^.&.G•&.W±.F .V¶.F..á 000120
76FF076A 0A76FF0C 76FFF876 FFFA76FF F05689EE 4689FE57 8826FC47 88260E5E ^.&.G•&.W±.FŸ.Vþ.v².v½.v..v.j..v 000140
FA76FF00 60E9F646 880006E9 037500F6 7E83F646 89000000 A49A266A FC76FFFE ±.v•j&.Ê....F-.—.u.Õ...F-Õ'..v² 000160
7500F67E 83F64689 0000FFFF 9A046AF2 76FFF476 FF156A0A 76FF0C76 FFF876FF .v½.v..v.j..v¶.v j.......F-.——.u 000180
76FF0C76 FF271768 F876FFFA 76FF026A EE76FFF0 76FF0033 E9F6468B 0006E903 .Õ...F-Õ3..vþ.vŸj..v².v½h.'.v..v 0001A0
5F5E1F00 00E9F646 880006E9 037500F6 7E83F646 8912C483 0000FFFF 9A006A0A .j.......á..F-.——.u.Õ...F-Õ...^_ 0001C0
76FF2713 680676FF 0876FF05 6A5016F8 4680D88E 0008881E 56570000 0AC8CBC9 èúà...WV.¡...Ä.F½.Pj..v..v.h.'.v̄ 0001E0
```

```
Dump of file SATURN:[PCCOMMON.DUMP.DLL]IFMDML.TMP;1 on 18-APR-1990 10:47:01.12
File ID (704,15,0)   End of file block 124 / Allocated 124

Virtual block number 91 (0000005B), 512 (0200) bytes

 0099E9F6 46880006 E9037500 F67E83F6 468912C4 83000001 949A006A 0A76FF0C ..v.j.......á..F-.--.u.Ö...F-Ö.. 000000
 E9037502 470B26G7 8B26FC5E C404FC46 830004E9 FE5689FC 4689FA56 8BF84688 .F½.V*.F=.V±Ö...F=.á^=&..&.G.u.Ö 000020
 F67E83F6 468908C4 83FFFF00 F29A0676 FF0B76FF 37FF2602 77FF26FC 5EC4002A *.á^=&.w.&.7.v..v..`....á..F-.— 000040
 76FF0C76 FF271568 0676FF08 76FFF876 FFFA76FF FFC3E900 03E90003 E9037500 .u.Ö..Ö..Öù..v*.v½.v..v.h.'.v..v 000060
 0676FF08 76FF001F E9F64688 0006E903 7500F67E 8310C483 00000004 9A006A0A .j..á....á..--.u.Ö...F-Ö...v..v. 000080
 2EC8CBC9 5F5E1F00 00E9F646 8BF64689 0AC48300 00FFFF9A 006A0A76 FF0C76FF .v..v.j.......á..F-.F-Ö...^_èùà. 0000A0
 B8E65689 E44689FE 578B26FC 47B8260E 5EC4040E 46830B8E 00FA8B1E 56570000 ..WV.¡*..Ä.F..á^.&.G=&.W±.FÕ.VI¡ 0000C0
 DE468900 00B8FC46 89FE4689 00008BE0 4689E246 89000088 EC4689EE 46890000 ...FŸ.Få¡...Fã.FÂ¡...F±.F=¡...F8 0000E0
 7E83DA46 89000002 4E9^5016 F4468007 6A0A76FF 0C76FFE4 76FFE676 FFDC4689 .FÉ.vl.vÕ.v..v.j..F¶.P.N....FÖ.~ 000100
 FFFF9A50 16064680 156A0A76 FF0C76FF E476FFE6 76FF0260 E90003E9 03.‾00DA Ö.u.Ö..Öm..vl.vÕ.v..v.j..F¤.P... 000120
 76FF2713 68E476FF E676FF05 6A50160C 46800249 E90003E9 0375000A 7E83.?00 ...-Ö.u.Ö..Ö1..FÉ.Pj..vl.vÕh.'.v 000140
 0287E90A 46880006 E9037500 DA7E830A 468912C4 83000002 A99A006A 0A76F??C ..v.j..`....á..FÖ.~Ö.u.Ö...FÖÕ.. 000160
 12C48300 0002D89A 006A0A76 FF0C76FF 271368E4 76FFE676 FF046A50 16FC4680 .F=.Pj..vl.vÕh.'.v..v.j..Ä....á. 000180
 FF271368 E476FFE6 76FF066A 5016E046 8001E8E9 0003E903 75000A7E 83DA4689 .FÖ.-Ö.u.Ö..ÖÖ..FÂ.Pj..vl.vÕh.'. 0001A0
 46800189 E90003E9 0375000A 7E830A46 8912C483 00000307 9A006A0A 76FF0C76 v..v.j.......á..FÖ.-Ö.u.Ö..Ö¿..F 0001C0
 468912C4 83000001 179A006A 0A76FF0C 76FF2713 68E476FF E676FF03 6A5016EC &.Pj..vl.vÕh.'.v..v.j.......á..F 0001E0

Dump of file SATURN:[PCCOMMON.DUMP.DLL]IFMDML.TMP;1 on 18-APR-1990 10:47:01.12
File ID (704,15,0)   End of file block 124 / Allocated 124

Virtual block number 92 (0000005C), 512 (0200) bytes

 04E84683 0004E9EA 5689E846 890E5688 DC468801 8AE90003 E9037500 DA7E830A Ö.-Ö.u.Ö..Ö...FÉ.VB.FÖ.VõÖ...FÖ. 000000
 6A37FF26 0277FF26 E85EC4E4 76FFE676 FF002CE9 03750247 0B260788 26E85EC4 á^Ö&..&.G.u.Ö,..vl.vÖá^Ö&.w.&.7j 000020
 5688FC46 8BFFC1E9 013FE900 03E90375 000A7E83 0A46890A C4830000 03A09A00 .......á..FÖ.-Ö.u.Ö..Ö7.Öè..F=.V 000040
 E676FF00 2CE90375 02470B26 07B82602 5EC404D2 46830004 E9045689 D24689FE ±.F0.VåÖ...F0.á^0&..&.G.u.Ö,..vl 000060
 0375000A 7E830A46 890AC483 00000189 9A006A37 FF260277 FF26025E C4E476FF .vÖá^0&.w.&.7j..¿....á..FÖ.-Ö.u. 000080
 26F05EC4 04F04683 0004E9F2 5689F046 89E25688 E04688FF C1E900F1 E90003E9 Ö..Öp.Öè..FÂ.Vã.FÞ.V·Ö...FÞ.á^Þ& 0000A0
 03529A00 6A37FF26 0277FF26 F05EC4E4 76FFE676 FF002CE9 03750247 0B260788 ..&.G.u.Ö,..vl.vÖá^Þ&.w.&.7j..R. 0000C0
 F84689EE 5688EC46 8BFFC1E9 00A3E900 03E90375 000A7E83 DA46890A C4830000 ...á..FÖ.-Ö.u.Ö..ÖE.Öè..F&.VŸ.F½ 0000E0
 0277FF26 F85EC400 2AE90375 02470B26 07B826FB 5EC404F8 46830004 E9FA5689 .V*Ö...F½.á^½&..&.G.u.Ö*.á^½&.w. 000100
 0057E900 03E90375 000A7E83 DA468908 C4830165 00F29AE4 76FFE676 FF37FF26 &.7.vl.vÖ.·.e..á..FÖ.-Ö.u.Ö..ÖW. 000120
 46890000 04949A26 6AF476FF F676FF07 6A0A76FF 0C76FFE4 76FFE676 FFFFC3E9 Öù..vl.vÖ.v..v.j..v-.v¶j&......F 000140
 76FFD876 FF156A0A 76FF0C76 FFE476FF E676FF00 2AE90003 E9037500 DA7E830A Ö.-Ö.u.Ö..Ö*..vl.vÖ.v..v.j..vÂ.v 000160
 E90375DE 46080C46 880000E9 0003E903 75000A7E 83DA4689 0000FFFF 9A046AD6 ¤j.......FÖ.-Ö.u.Ö..Ö...FÉ.F8u.Ö 000180
 76FF0011 E90375FE 4608FC46 88000004 DB9ADC76 FFDE76FF E476FFE6 76FF0011 ...vl.vÖ.vB.vÉ.Ü....F=.F±u.Ö...v 0001A0
 E476FFE6 76FF0011 E90375E2 4608E046 88000004 F79AFC76 FFFE76FF E476FFE6 l.vÖ.v±.v=.¼....FÂ.Fãu.Ö...vl.vÖ 0001C0
 FFEE76FF E476FFE6 76FF0011 E90375EE 4608EC46 88000005 139AE076 FFE276FF .vã.vÂ......F&.FŸu.Ö...vl.vÖ.vŸ. 0001E0

Dump of file SATURN:[PCCOMMON.DUMP.DLL]IFMDML.TMP;1 on 18-APR-1990 10:47:01.12
File ID (704,15,0)   End of file block 124 / Allocated 124

Virtual block number 93 (0000005D), 512 (0200) bytes

 5EC40035 E9064688 D88E0106 881E5657 000000C8 CBC95F5E 1F0000FF FF9AEC76 v&......^_èùà...WV.¡¤..Ä.F.Õ5.á^ 000000
 C40037E9 000407C7 26085EC4 0042E900 0607C726 085EC400 4DE90003 07C72608 .&ú...ÕM.&^.&ú...ÕB.á^.&ú...Õ7.á 000020
 03750057 30FFCEE9 03750056 300023E9 002CE999 AE88002C E9000507 C726085E ^.&ú...Õ,.¡Ü.Õ,.Õ#.=V.u.Õö.=W.u. 000040
 C95F5E1F 0000E900 0088FFD4 E9FFCCE9 03750059 30FFC9E9 03750058 30FFB8E9 ÕE.=X.u.Õè.=Y.u.Õã.Õå.¡..Õ...^_è 000060
 89F24689 FE578B26 FC478826 0E5EC404 0E468308 8E0524B8 1E565700 0062C8CB ùàb..WV.¡$..Ä.F..á^.&.G=&.W±.F‾. 000080
 89FE5788 26FC4788 260E5EC4 040E4683 F64689FE 47B8260E 5EC4020E 4683F456 V¶.F..á^.&.G±.F-.F..á^.&.G=&.W±. 0000A0
 06E90375 00EA7E83 EA468906 C483043C 051C9AF6 76FF5016 F04680FA 5689F846 F½.V*.FÞ.P.v-...<..á..Fõ.-õ.u.Õ. 0000C0
 006A0A76 FF0C76FF 271368F2 76FFF476 FFF076FF 5016EC46 8D000EE9 EA468800 ..FõÕ8..F&.P.vÞ.v¶.v·h.'.v..v.j. 0000E0
 EE5688EC 468800A8 E9EA4688 0006E903 7500EA7E 83EA4689 12C48300 0006679A .g....á..Fõ.-õ.u.Õ...FõÕ¨..F&.VŸ 000100
 169E4680 004BE903 7502470B 26078826 FC5EC404 FC468300 04E9FE56 89FC4689 .F=.V±Õ...F=.á^=&..&.G.u.ÕK..F.. 000120
 468910C4 83000002 779A006A 37FF2602 77FF26FC 5EC4271C 68F276FF F476FF50 P.v¶.v·h.'á^=&.w.&.7j..w....á..F 000140
 9A50169E 4680FE6A 006A0161 68F876FF FA76FFFF 8CE90003 E9037500 EA7E83EA õ.-õ.u.Õ..ÕV..v*.v½ha.j.j±.F..P. 000160
 119A006A 0A76FF0C 76FF2715 68F276FF F476FFEC 76FFEE76 FFFFA2E9 0000FFFF ....ÕÂ..vŸ.vš.v¶.v·h.'.v..v.j... 000180
 88000006 909A016A 006A006A 006A0164 68F876FF FA76FFEA 468910C4 83000006 ....á..Fõ.v*.v½hd.j.j.j.j......¡ 0001A0
 47B8260E 5EC4040E 4683088E 0599881E 56570000 0EC8CBC9 5F5E1F00 00E90000 ..Õ...^_èùà...WV.¡...Ä.F..á^.&.G 0001C0
 0E5EC404 0E4683FE 4689FE47 88260E5E C4020E46 83FC5689 FA4689FE 578826FC =&.W±.F‾.V=.F..á^.&.G±.F±.F..á^. 0001E0
```

Dump of file SATURN:[PCCOMMON.DUMP.DLL]IFMDML.TMP;1 on 18-APR-1990 10:47:01.12
File ID (704,15,0)   End of file block 124 / Allocated 124

Virtual block number 94 (0000005E), 512 (0200) bytes

```
468906C4 8305E005 1C9AFE76 FF5016F8 4680F656 89F44689 FE578826 FC478826 &.G=&.W±.F¶.V-.F%.P.v±...Å..á..F 000000
68FA76FF FC76FFF8 76FFF476 FFF676FF 0025E9F2 46880006 E9037500 F27E83F2 ·.-·.u.Õ...F·Ö%..v-.v¶.v%.v=.v*h 000020
56570000 B4C8CEC9 5F5E1F00 00E912C4 83000006 AF9A006A 0A76FF0C 76FF2711 .'.v..v.j..€....á.Õ...^_èùàÇ..WV 000040
C4020E46 83A65689 A44689FE 578826FC 4788260E 5EC4040E 4683088E 06E2881E .¡ã..Ä.F..á^.&.G=&.W±.FÊ.Vl.F..á 000060
4683F856 89F64689 FE578826 FC478826 0E5EC404 0E4683A8 4689FE47 88260E5E ^.&.G±.F´.F..á^.&.G=&.W±.F-.V%.F 000080
07892602 47892600 0088985E C49A5689 984689FE 578826FC 4788260E 5EC4040E ..á^.&.G=&.W±.F..V.á^.|..&.G.&.. 0000A0
E90374FF FE7E83FE 46890000 08149A00 6A006A00 6A006A01 6568F676 FFF876FF .v%.v-he.j.j.j.j.......F±.-±.t.Õ 0000C0
46805052 4CCA8300 0000022B FE468801 6868F676 FFF876FF 0142E999 8CB80006 ..¡¥.ÕB..v%.v-hh..F±+@....òLRP.F 0000E0
7500A07E 83A04689 06C48307 29051C9A AB76FF50 16A24680 000006C8 9A5016AA ^.P.ù....FÅ.P.v´...)..á..F..-..u 000100
76FF0C76 FF271368 A476FFA6 76FFA276 FF50169C 46800100 E9A04688 0006E903 .Õ...F.Õ...F..P.vÅ.vl.vÊh.'.v..v 000120
9C468800 CDE9A046 880006E9 037500A0 7E83A046 8912C483 000008AB 9A006A0A .j..¨....á..F..-..u.Õ...F.Õë..F. 000140
8D0067E9 03750247 08260788 26FA5EC4 04FA4683 0004E9FC 5689FA46 899E5688 .V..F*.V=Õ...F*.á^*&..&.G.u.Õg.. 000160
83000009 0E9A006A 37FF2602 77FF26FA 5EC4271C 68A476FF A676FF50 16FF4C86 .L..P.vl.vÊh.'á^*&.w.&.7j....... 000180
FF008C9A 5016FF4C 86805016 AA4680FF BBE90003 E9037500 A07E83A0 468910C4 á..F..-..u.Õ..ÕE..F¯.P..L..P.... 0001A0
02578926 07892698 5EC40257 88260788 26FA5EC4 0017E903 7400003D 08C483FF ..á.=..t.Õ..á^*&..&.W.á^.&..&.W. 0001C0
075B9A00 6A0A76FF 0C76FF27 1568A476 FFA676FF 9C76FF9E 76FFFF86 E90003E9 Õ..Õ...v..v..vl.vÊh.'.v..v.j..[. 0001E0
```

Dump of file SATURN:[PCCOMMON.DUMP.DLL]IFMDML.TMP;1 on 18-APR-1990 10:47:01.12
File ID (704,15,0)   End of file block 124 / Allocated 124

Virtual block number 95 (0000005F), 512 (0200) bytes

```
C70005E9 0000A046 C70008E9 03750247 08260788 26985EC4 A0468910 C4830000 ...á..F.á^.&..&.G.u.Õ..úF...Õ..ú 000000
C4040E46 83088E07 72881E56 5700005C C8CBC95F 5E1F0000 E9A04688 998CA046 F.¥..F.Õ...^_èùà\..WV.¡r..Ä.F..á 000020
89FE5788 26FC4788 260E5EC4 040E4683 F85689F6 4689FE57 8826FC47 88260E5E ^.&.G=&.W±.F=.V%.F..á^.&.G=&.W±. 000040
C4004AFA 46C7A656 89A44689 FE578826 FC478826 0E5EC404 0E4683FE 5689FC46 F=.V±.F..á^.&.G=&.W±.FÊ.VlúF*J.á 000060
FF5016A8 46800000 FFFF9A50 16FA4680 03E4681E A476FFA6 76FF0007 C626A45E ^Ê&ó...vl.vÊ.hÕ..F*.P......F´.P. 000080
7400F47E 83F44689 10C48300 0008549A 006A0A76 FF0C76FF 271C68F6 76FFF876 v%.v-h.'.v..v.j..T....á..F¶.-¶.t 0000A0
4680A476 FFA676FF 000009F9 9A5016FA 468003E9 681EA476 FFA676FF 0029E903 .Õ)..vl.vÊ.hÕ..F*.P.*....vl.vÊ.F 0000C0
76FFFE76 FF271C68 F676FFF8 76FF5016 A8468000 000A379A 5016FA46 805016A8 ´.P.F*.P.7....F´.P.v%.v-h.'.v±.v 0000E0
EB681EA4 76FFA676 FF0029E9 037400F4 7E83F446 8910C483 000009C1 9A006AFC =j..è....á..F¶.-¶.t.Õ)..vl.vÊ.h$ 000100
000009A6 9A5016FA 46805016 A84680A4 76FFA676 FF00000A 4C9A5016 FA468003 ..F*.P.L....vl.vÊ.F´.P.F*.P.¶... 000120
88260E5E C4040E46 83088E09 47B81E56 57000008 C8CBC95F 5E1F0000 E9000088 ¡..Õ...^_èùà...WV.¡G..Ä.F..á^.&. 000140
5689F846 89FE5788 26FC4788 260E5EC4 040E4683 FE5689FC 4689FE57 8826FC47 G=&.W±.F=.V±.F..á^.&.G=&.W±.F%.V 000160
8300000A 149A006A 0A76FF0C 76FF2712 68FC76FF FE76FF02 6AF876FF FA76FFFA *.v*.v%j..v±.v=h.'.v..v.j....... 000180
1F0000E9 08568806 4688D88E 0A63881E 56570000 00C8CBC9 5F5E1F00 00E912C4 á.Õ...^_èùà...WV.¡c..Ä.F..V.Õ... 0001A0
006A03EE 681E016A 306AFFFF 68082368 088E0AC2 881E5657 000002C8 CBC95F5E ^_èùà..¯WV.¡ó..Ah#.h..jÕj..hY.j. 0001C0
CBC95F5E 1F0000E9 FE4688FE 468918C4 830000FF FF9A006A 756A026A 006A006A j¯j.j.juj.......á..F±.F±Õ...^_èù 0001E0
```

Dump of file SATURN:[PCCOMMON.DUMP.DLL]IFMDML.TMP;1 on 18-APR-1990 10:47:01.12
File ID (704,15,0)   End of file block 124 / Allocated 124

Virtual block number 96 (00000060), 512 (0200) bytes

```
000207E2 0103002B 00040AFB 02030181 000609E4 02030008 000504BF 0203000D ....«...Û...õ.......«...+...â... 000000
00050227 0203003E 00040AAB 02030000 001708CF 00020000 00160AE1 0002003D =...Ã.......ü..........>...'... 000020
00160AE4 000500CF 0005046A 020300C5 00050077 02030000 00190ADC 00020088 ¡...É.......w...é...j...ü...õ... 000040
00000000 00000000 00000000 00000000 00000000 0000005C 000403EE 02030ABA ¤...Ý...\....................... 000060
28D1F7AE F2FFFFB9 0A7EC4FF 758DAEF2 FFFFB9C0 33067EC4 1EDE88D7 88EC8855 U.&.¤.B.á-.3à¿...Û.u.á-.¿...ÛKl+ 000080
88F388A4 F3C913A5 F3E90149 A4027400 01C6F706 4688FE87 08468ED8 8EC08CF9 *.á.Á.F..±.F.%ó..t.Êl|ÕµÊ.èµÊ.µ. 0000A0
D1F7AEF2 FFFFB9C^ 33C08ED8 8CFE8B0A 76C51EDE 88D788EC 8855C85D C28C1FFA *..ó]ùU.$.¤.B.év..±.Á.á3à¿...ÛKl 0000C0
88EC8855 C850C28· 1FFA88F3 88A4F3C9 13A5F3E9 D149A402 7401A8C7 88067EC4 á-..ú´.t.Êl|ÕµÊ.èµÊ.µ.*..ó]ùU.$. 0000E0
881FFFFF 10C01805 74A6E3F9 28D1F7AE F2FFFFB9 C0330A7E C40676C5 1EDE88D7 ¤.B.év.á-.3à¿...ÛKl+*µlt..á..... 000100
885500C8 5DFA8891 49D1F7AE F2FFFFB9 C033067E C4D788EC 885500C8 5DFA88F3 µ.*]ù.U.$.¤ó-.3à¿...ÛKl|..*]ù.U. 000120
8CC388AA F3C032F8 E2AA0374 C00AAC0C E30E4E88 DF880A76 C5067EC4 1E5657EC $WV.á-.év..Õ.N.D.¯.ât.¯ã½2àµ^.ù. 000140
568CF846 89EC4680 56570000 16C8003E E9018357 56EC8855 C850E588 5F5E1FC2 ó.^_.|]ùU.$VW*.Õ>.à...WV.F$.F%.V 000160
08578926 06478926 08568806 4688420A 47C626F8 5EC4FE56 8CFC4689 0E4680FA *.F¯..F=.V±á^½&óG.B.F..V.&.G.&.W. 000180
C4830177 03BC9A53 060A76FF 0C76FFFC 76FF167F FF0447C7 26025789 26078926 &..&.W.&úG.....v=.v..v..S.¥.w..á 0001A0
76FF900F E8058826 02478E26 07FF263F 8826C02A 1278044F FF26F85E C4F0880C ..Þá^½&.O.x.*ä&.7&..&.G.&..$...v 0001C0
FF260A76 FF0C76FF 065EC4EC 8855C8C9 5F5EC688 06C483FF FF02469A 006A53FA *Sj..F....á..ó^_èùU.$á^..v..v.&. 0001E0
```

```
Dump of file SATURN:[PCCOMMON.DUMP.DLL]IFMDML.TMP;1 on 18-APR-1990 10:47:01.12
File ID (704,15,0)   End of file block 124 / Allocated 124

Virtual block number 97 (00000061), 512 (0200) bytes

 535657EC 885500J8 CA5DE588 07892602 57892606 5EC4014C 01AA9A37 FF260277 w.&.7.ˆ.L.á^.&.W.&...I]ò..U.&WVS 000000
 7DC0080C 46880656 89084689 00001D0A F7D8F706 56884711 7DC00808 4688FF33 3..F..à).G.V.%À%Ö....F..V..F..ò) 000020
 F1F7D233 0846880A 4E881575 C0080A56 890C4689 00001D0A F7D8F70A 56884711 .G.V.%À%Ö....F..V..àu..N..F.3Ø%þ 000040
 D8080801 EA010901 E8D10646 88085688 0A4E88D8 8838EBD3 88F1F706 46880888 .À.F.%þ.ÆSß.À.N..V..F.ISIIIòIÀ.Ù 000060
 4E017606 46380672 07770856 380C7201 03E6F70A 4688910C 66F7F088 F1F7F475 u¶%þ.Þ%f...F.%I.Ir.;V.w.r.;F.v.N 000080
 26085EC4 56570000 08C80008 CA5DE588 5F5E5800 DA8308F7 DAF70775 4F960233 3Ø.Ou.%Ö%À.Ö.[^_.I]ò..à...WVá^.& 0000A0
 46891464 05E0D1C1 03E0D1C8 88F9F700 0C899908 7020C388 FA4689E4 2A08478A .G.*ô.F*.û-p..¿..%*.àIÀ.èIÀ.d..F 0000C0
 5EC49001 28E9FFFF 88200A4F 8026085E C40F7440 0A47F626 0774830A 47F626F8 %&-G..t.&-G.ät.á^.&.O. |..Ö+..á^ 0000E0
 EF0A6780 26020A4F 802690E2 E8000004 47C72620 0A4F8026 0E74010A 47F62608 .&-G..t.&.O. &ùG...Sã.&.O..&.g.ÿ 000100
 06D868F9 F7000C89 99087020 C3884C75 0C0A47F6 26FC7689 F0880447 8926C028 +ò&.G..Þ.v=&-G..uL.û-p..¿..%*kÀ. 000120
 FF0A7E81 16750888 087E810E 7402EF0A 7E810775 087C087E 81377501 146487F6 -.d..u7.-.|.u..-.ÿ.t..-...u..-.. 000140
 5EC404C4 830C85E8 0876FF0A 76FF0C75 C00802C4 83036212 209AFA76 FF0F75FF .u..v*. .b..á..àu..v..v.Òç..á.á^ 000160
 085E8867 74011464 87F606D8 68F9F700 0C899908 7020C388 1575080A 47F62608 .&-G..u..û-p..¿..%*kÀ.-.d..tg.^. 000180
 89264802 4588F87E 88025789 26078926 40085788 26064788 2606772B 26378826 &.7&+w.&.G.&.W.ä&..&.W..-%.E.H&. 0001A0
 F6FA5E88 19E8FC46 8908C483 03801088 9AFA76FF 0677FF26 5256167E F6080447 G..--.VR&.w..v*......á..F=S..^*- 0001C0
 2606468A 065FC426 085EC408 C48303A3 104A9A53 006A006A 026A0F74 201A7587 .u. t.j.j.j.S.J.È..á.á^.&á_..F.& 0001E0

Dump of file SATURN:[PCCOMMON.DUMP.DLL]IFMDML.TMP;1 on 18-APR-1990 10:47:01.12
File ID (704,15,0)   End of file block 124 / Allocated 124

Virtual block num r 98 (00000062), 512 (0200) bytes

 0374FC76 39FC4689 08C48301 9810889A FA76FF50 16064680 5600018E 17E80788 ..S./..V.F..P.v*......á..F=9v=t. 000000
 C01E8C10 BEA31DC4 8802F912 449A000A 88EC8855 CBC95F5E E42A0646 8AFECCE9 Ôa±.F.*ô^_èüU.$¡...D.*.¡á.È/...à 000020
 001D8A06 C7109616 891094A3 08568806 46881080 16891DAE A3105688 0E46881D ..F..V.ÈÜ...¯..F..V.È......ú.¤.. 000040
 9AA31D9E A3C02800 0110BC06 C70308E9 037425F6 7E800380 E9000010 8806C700 .ú.¡...Õ...--%t.Õ..ú.¥...+àÈ..È. 000060
 260A5EC4 00201F24 06C710AC A31D92A3 1D98A31D 82A31D84 A31D9CA3 1D86A31D .ÈÑ.È..ÈÇ.Èý.È..È..Ȉ.ú.$. .á^.& 000080
 C71D9E06 FF0D752B 3F80260A 5E88903E EB00301F 2406C70A 46FF4975 30017F80 ...0uI.F.ú.$.0.$>..^.&.?+u.....ú 0000A0
 1D9206FF 9014E81D B206FF1A 75001D9E 3E830E75 203F8026 9028E800 001DB206 .ý...$(.&.? u..>...u...ý.S...... 0000C0
 C4830978 E80E5098 078A260A 5E880A46 FF10AC06 FFC77520 3F80260A 5EC40DEB S.á^.&.?-uú..¯..f..^.&...P.Òx..à 0000E0
 10C23E83 0C56890A 468908C4 8308C7E8 0E1DC268 1E0A76FF 0C76FFD0 75C00802 ..âuï.v..v..hö..Òü..á..F..V..>ô. 000100
 2406C706 75301F24 3E830074 001DAC3E 831DC2A3 D8F71DC2 A11DAC06 FF0C7D00 .)...¯.Àô.%ÀÈò..>¯..t..>$.0u.ú.$ 000120
 83087BE8 0E1D8C68 1E0A76FF 060A46FF 1D8406FF 20752E3F 80260A5E C400201F . .á^.&.?.u-..Ç..F...v..h¥..Ò(.. 000140
 98078A26 0A5EC41D 840EFF00 0110BC06 C70A7D00 1D8C3E83 0C56890A 468908C4 á..F..V..>¥..).ú.¥.....Ç.á^.&... 000160
 75001D9C 3E830002 109C06C7 0675006C 30287400 68304074 004E303D 7400463D =F.t==N.t@=h.t+=(.u.ú......>...u 000180
 00011D9C 06C79002 4EE91C75 003F8026 0A5EC40A 46FF0375 4C3F8026 0A5EC409 .á^.&.?Lu..F.á^.&.?.u.ÒN..ú..... 0001A0
 47300A74 004530F8 -6899807 8A26C8E8 00081D9C 06C7D0E8 0010109C 06C7D8EB SÀú.....SÀú.....Sà&....F½=E.t.=G 0001C0
 00633001 91E9037E 78740069 30F84688 20F84683 109A06FF 08750058 30057400 .t.=X.u......F½ .F½=i.tx-.Õ..=c. 0001E0

Dump of file SATURN:[PCCOMMON.DUMP.DLL]IFMDML.TMP;1 on 18-APR-1990 10:47:01.12
File ID (704,15,0)   End of file block 124 / Allocated 124

Virtual block number 99 (00000063), 512 (0200) bytes

 AE1EC415 75021D9C 3E839001 59E90140 E9037500 25300152 E9037E01 3FE90375 u.Õ?.-.ÕR.=%.u.Õa.ÕY...>...u.á.Û 000000
 83078926 1D88A11F C42610AE 1EC400EB 00000247 C7260789 261D88A1 1FC4261D .&á.À¡.&..&úG...S.á.Û.&á.À¡.&... 000020
 0A47F626 1D941EC4 01BDE903 74001088 3E830170 E9037500 108A3E83 0410AE06 .Û...>¤..u.Õp..>¡..t.Õ§.á...&-G. 000040
 E802C483 019EE80E 0A6A0000 109206C7 108606FF 01ACE9FF FFB801AF E9037520  u.ÕÈ.¡..Õ¯...Ñ.ú.....j..Õ...á.S 000060
 E9037508 1D9C3E83 0004108C 06C710B4 06FF109A 06FF1098 06FFF2EB 086A90C3 û.j.S..........Ç.ú.¥....>...u.Õ 000080
 AC3E83FA 46891DC2 A128741D C20639FA 46891D9C A3C0287A 74011D9C 3E830081 ...>...tz+âÈ...F*9.ô.t(Àô..F*.>¯ 0000A0
 8310C2A3 C028027D C0081DC2 A1051DC2 2E839090 13E80000 1DC206C7 0A74001D ..t.ú.ô...S.....ò..Àô..à).+àÈò.. 0000C0
 1DAC3E83 227400FA 7E8302C4 83048DE8 0E3A6A02 C4830130 E80E106A 021DAE06 .Û..j..Ò0..á.j:.Ò...á..-*.t".>¯. 0000E0
 2E830000 10C206C7 9007EB1D C2A3C028 027DC008 1DC2A300 0520FA46 88157400 .t..F*-..Èò..à).+àÈò.S..ú.ô..... 000100
 026EE80E 006A90FF 3FE9106A FF10E902 10AE0683 02C48300 F1E80E10 6A041DAE Û..j..Òþ..á...Û..Õ..j.Õ7..j..Òn. 000120
 7500643D 90FF21E9 0428E80E 256AFF2A E90349E8 0EF876FF F4E8016A 90FF39E9 Õ9..j.S¶.v½.ÒI.Õ*.j%.Ò(.ÒI..=d.u 000140
 46880A4E FF0C5688 0A468809 74001D9C 3E830A7E 00673005 7C006530 FF0CE903 .Õ..=e.|.=g.-Ö.>...t..F..V..N..F 000160
 703DFEE4 E9037500 6F30FE80 E9037500 6E30903A E8FE5689 FC468940 0C56880A ..V.a.F=.V±S:.=n.u.Õ.±=o.u.ÕÕ±=p 000180
 46FF9081 E8FF79E9 03750078 30FEB9E9 03750075 308F7400 733DFEE0 E9037500 .u.ÕÀ±=s.t.=u.u.Õ¿±=x.u.Õy.SŸ..F 0001A0
 76FF500A 4628C388 EC75253C 0474C00A F6468807 8A26FC5E C4FC46FF 9034E80A .S4..F=á^=&...F-.ät.<%uS.û+F.P.v 0001C0
 F6468807 8A260A5E C40C5689 0A4689FE 5688FC46 8806C483 044CE80E 0A76FF0C ..v..ÒL..á..F=.V±.F..V.á^.&...F- 0001E0
```

Dump of file SATURN:[PCCOMMON.DUMP.DLL]IFMDML.TMP;1 on 18-APR-1990 10:47:01.12
File ID (704,15,0) End of file block 124 / Allocated 124

Virtual block number 100 (00000064), 512 (0200) bytes

```
56570000 12C8C8C9 1D88A1FE 51E90374 200A47F6 261D941E C4FC63E9 0374C00A .åt.Õc•é...&-G. t.ÕO±À¦.èùà...WV 000000
3E830774 021D9C3E 831DB606 FF04740A 067E8300 201F2406 C7067400 1D843E83 .>Ç..t.ú.$. ..-..t...Ñ..>...t..> 000020
3E83902C EB041?AE 0683FE56 89FC4689 02578826 07882610 AE1EC419 75101D9C ...u.é.Û.&..&.W..F•.V±..Û..$,..> 000040
46899907 88261DAE 1EC40EEB 0000FE46 C7FC4689 0788261D AE1EC411 74001D86 Ñ..t.é.Û.&...F•úF±..$.é.Û.&....F 000060
C0289003 EB064688 0674FE46 08FC4688 0E74001D 923E8302 1DAE0683 FE5689FC •.V±..Û...>...t..F•.F±t..F.$..+à 000080
067E8328 7D00FE7E 83317500 1D863E83 F45689F2 46891DC0 16881D8E A11F22A3 Ê".Àƒ...é..F .V¶.>Ñ..u1.-±.)+.-. 0000A0
FE5689FC 46890AF7 00028308 F7FE5688 FC468820 07C626F2 46FFF25E C41D750A .u.é^.F &6.-.F•.V±XÁ.®.%Ö.F•.V± 0000C0
76FFFE76 FF501E06 76FFFA5E 8CF84689 1DA08800 00F646C7 9006E800 01F646C7 úF-..$..úF-..¦...F%.^*.v..P.v±.v 0000E0
0E8804C4 8303C? 0 869AF876 FFFA76FF 4574001D 843E830A C48308A9 12169AFC •...`..é..>Ç..tE.v*.v%.Ñ.é..é... 000100
05E8F27E C4F04E.3 00001F22 06C70675 081F223E 83007EC9 08F04E89 C82B1D8C ¥.+à.NÞ.è-..>"..u.ú."....NÞé-`$. 000120
C4F276C5 EE5E8C1D 9A0E88F0 4E89F446 8CF27E89 F47FC008 49C18847 3005C626 &6.OG.èl.à.¶.-`.F¶.NÞ.....^Ÿév`é 000140
8CF27689 E375003F 8026F846 FF46202C 80037C61 3C0774C9 08048807 8A26F85E ^%&.....èt.<a|.., F.F%&.?.uD.v`. 000160
02EB0001 88057500 F67E8308 741D8206 081D9EA1 1475001D 863E83EE 5E8EF45E ^¶.^Ÿ.>Ñ..u.À....ý.t..--.u.¦..$. 000180
1DAEA100 018E1874 00067E83 56570000 10C8C8C9 5F5E02C4 8302FFE8 0E50C02B +áP.Ò...é.^_èùà...WV.-...t./..ÀÛ. 0001A0
0788261D AE1EC413 7408109C 3E83008F E9021DAE 0683FA56 89F84689 10801688 ..¯..F%.V*.¯Û..Ô...>...t.é.Û.&.. 0001C0
1DAE0683 FA5E8CF8 4689FC46 89078826 1DAE1EC4 10E8FA56 89F84689 02578826 &.W..F%.V*$.é.Û.&...F•.F%.^*..Û. 0001E0
```

Dump of file SATURN:[PCCOMMON.DUMP.DLL]IFMDML.TMP;1 on 18-APR-1990 10:47:01.12
File ID (704,15,0) End of file block 124 / Allocated 124

Virtual block number 101 (00000065), 512 (0200) bytes

```
890425B8 097500FC 7E83900A EB041E88 1575FA46 08F84688 0E74081D 9C3E8304 ..>...t..F%.F*u.¦..$...-•.u.¦%.. 000000
900EEB1D 8C0E881C 741D8436 39F628F4 5689F246 89FA5688 F84688FA 5E8CF846 F%.^*.F%.V*.F`.V¶+-96Ç.t...¥.$.. 000020
75003F80 26F246FF F25EC446 90EDEB10 7ECE3846 1574003F 8026F246 FFF25EC4 é^`.F`&.?.t.F;ö-.$Û.Fé^`.F`&.?.u 000040
83E80EF8 76FFFA76 FF5602C4 830159E8 0E570875 001DAC3E 83FE2B1D C23E88F3 µ.>ó.+±.>¯..u.W.ÒY..é.V.v*.v%.Ò* 000060
881DAEA1 000006C8 90CBC95F 5E02C483 013CE80E 57087400 1DAC3E83 06C48301 ..é..>¯..t.W.Ò<..é.^_èù.à...ÀÛ.. 000080
83FA4688 C02A9003 EB018005 7547067E 83067467 067E83FE 5689FC46 891D8016 .¯..F•.V±.-.gt..-.Gu¯.$..*à.F*. 0000A0
FF00011D 8C06C706 7500108C 3E830074 00FA7E80 0006108C 06C70675 001D843E >Ç..u.ú.¥....-*.t..>¥..u.ú.¥.... 0000C0
501EFF26 1C80068E FC76FFFE 76FF1D8E 36FF1DC0 36FF0676 FF1D8C36 FF1D9A36 6...6¥..v..6à..6/..v±.v•..¯.&..P 0000E0
1EFF261C 80068E1D 8E36FF1D C036FF14 75001092 3E831874 00FA7E80 0EC48308 ..é..-*.t..>...u..6à..6/...¯.&.. 000100
261C8006 8E1D8E36 FF1DC036 FF147500 108C3E83 1874001D 923E8304 C4830854 T..é..>...t..>¥..u..6à..6/...¯.& 000120
76FFFE76 FF18741D 8206081D 9EA10000 1F2206C7 081DAE06 8304C483 085C1EFF ..\..é...Û..ú."...À....ý.t..v±.v 000140
90CBC901 29E80E50 C02802E8 00018805 74C00804 C4830860 1EFF261C 80068EFC •..¯.&..`..é..åt.¦..$.+áP.Ò).èù. 000160
2607FF26 37882606 468A1478 044FFF26 10941EC4 3C75001D 8A3E8356 000000C8 à...V.>¤..u<é...&.O.x..F.&.7&..& 000180
8A06FF07 754006C4 83088102 469A0676 FF531096 36FF10E8 E42A0488 2602478E .G.&..*ð$..6..S.v..F....é.ǝu...¤ 0001A0
507EF608 06768857 75001D8A 3E835657 000002C8 90CBC95E 108806FF 9005EB1D .$....¦.^èù.à...WV.>¤..uW.v..--P 0001C0
4EC6881D 8A06FF04 754006C4 8308E902 469A1F24 36FF1094 36FF1096 36FF18E8 $..6...6...6$..F.Õ..é.ǝu...¤..6N 0001E0
```

Dump of file SATURN:[PCCOMMON.DUMP.DLL]IFMDML.TMP;1 on 18-APR-1990 10:47:01.12
File ID (704,15,0) End of file block 124 / Allocated 124

Virtual block number 102 (00000066), 512 (0200) bytes

```
E42A0588 2602478E 2607FF26 3F88261F 24A00478 044FFF26 10941EC4 1E7EC008 .à-.é...&.O.xé.$.&.7&..&.G.&..*ð 000000
8A3E830A 76885657 000002C8 C8C95F5E 10880601 06468807 75001D8A 3E8304E8 $à.>¤..u..F...¦.^_èùà...WV.v..>¤ 000020
754006C4 830C5802 469A5098 078A2606 5EC41094 36FF1096 36FF22E8 5E75001D ..u^$".6...6..é^.Ï...P.F.[..é.ǝu 000040
C4078A26 065EC4CD 78044FFF 2610941E C42574C0 084EC688 0646FF10 8A06FF04 ...¤..F..6N.àtXé...&.O.xëé^.&..é 000060
06010A46 88077500 108A3E83 CAE8E42A 05882602 478E2607 FF263F88 261D941E ...&.7&..&.G.&..*ðŠò.>¤..u..F... 000080
FA4689FC 4689C028 F65689F4 46891DC0 16881D8E A1560000 0CC8C8C9 5F5E1D88 ¦.^_èùà...VÀƒ...é..F¶.V-+é.F•.F* 0000A0
83057510 1F223E83 067628F0 28F84689 04C48308 9400869A F476FF52 10C23688 .6ò¯R.v¶.Ñ....é..F¥+Þ+v..>"..u.. 0000C0
1F243E83 19752D3F 8026F45E C4227500 1DAC3E83 4E017508 1F223E83 08E802EE ¥.$..>"..u.N.>¯..u"é^¶&.?-u..>$. 0000E0
077EF608 0874301F 243E83F8 4EFF02C4 83FE71E8 0E509807 8A26F446 FF127530 Ou..F¶&...P.Òq±.é..N%.>$.Ot..--. 000100
E80EFC46 FF077400 1F223E83 0066E80E FA46FF07 7400067E 83187400 1DAC3E83 .>¯..t..-..t..F*.Òf..>"..t..F•.Ò 000120
39E80E04 7500FA7E 8?DA7400 067E8302 C483FE7E E80E5629 75001DAC 3E830070 p..>¯..u)V.Ò-±.é..-..t..-*.u..Ò9 000140
83FE85E8 0EF476FF F676FFF8 76FF0040 E80E0475 00FC7E83 0A74001F 22?C8300 ..>"..t..-•.u..Òǝ..v%.v-.v¶.Òç±. 000160
7400109E 3E83C8C9 5E02C483 FE38E80E 5600201F 2406C70E 74001DAC 3E8 ?6C4 é..>¯..t.ú.$. .V.Ò8±.é.^èù.>...t 000180
101F223E 8302C483 FDC8E80E 306AC802 C483FD02 E80E5000 208803E8 0028?805 .¦+.$.¦ .P.Ò0».é.ùjO.Òà».é..>".. 0001A0
56570000 06C8C802 C483FDAA E80E5000 788803E8 00588805 7400109A 3E831775 u..>...t.¦X.$.¦x.P.Ò`».é.ùà...WV 0001C0
9060E80A 46FF021D AE068337 88261DAE 1EC41275 2A3F8026 0A5EC400 01FE46C7 úF±..é^.&.7*u.é.Û.&.7..Û...F.$'. 0001E0
```

```
Dump of file SATUR":[PCCOMMON.DUMP.DLL]IFMDML.TMP;1 on 18-APR-1990 10:47:01.12
File ID (704,15,0)   End of file block 124 / Allocated 124

Virtual block number 103 (00000067), 512 (0200) bytes

 3F7C303C FA468807 8A260A5E 8BF6280A 46FFFFFF FE46C708 75203F80 260A5EC4 &^.&.?-u.úF±...F.+-.^.&...F*<0|? 000000
 8A261B7F 393D80.6 06EBF888 00301F24 06C70675 303C0A75 10843639 387F393C <9.;96Ç.u.<0u.ü.$.0..«$.&.=9..&. 000020
 880C468C 0A7E89DF 7D303080 2647F188 30E983C8 03E1D1CE 0302E1C1 CE889805 ...öèÅ..ö1Å.à.Õ0.þG&.=0)Õ.-..F.. 000040
 4689042C 88570000 04C8C8C9 5F5E0C56 880A4688 37892606 5EC4F088 EEF7FE46 F±%Y.Þá^.&.7.F..V.^_èüà...W¡,..F 000060
 468CFC7E 890001B8 F4750D38 26117400 30802647 01E8FC7E C4064E8A FE5E8CFC =.^±.N.á-=$.G&.=.t.ÈB.u¶|...-•.F 000080
 071E570A 7EC51E08 56880646 880E4E88 90C8C95F C028FE46 8CFC7E89 9009E8FE ±$...-=.F±+à èü_.N..F..V..é-.W.. 0000A0
 C0080233 92F7880A F7000283 D8F7AA20 800A7902 080E750A F9831374 C00A93FC =..àt..*.u..Øy.¯-`%Ü.0.%Ö.%.30.à 0000C0
 880586AC 4F0588E2 75C308C2 88AA2704 0276393C 30040387 92F1F793 F1F70274 t.%þ.%þ..&.0<9v..'`.ô.üuã..0¯... 0000E0
 00FFFF9A 5016C488 50EC8855 00CB50E5 885E5F1F 580A8CF2 72C73801 448DFF44 D..D.;úr`.ÖX._^.[]ü.U.&P.&.P.... 000100
 88084513 589A039E E80021E8 0000FFFF 9A043268 1E043468 1E1A6EA3 E0865800 .X.ÅÉn..h4..hŽ......Ò1.Ò...X.E.¡ 000120
 068EFF33 0000B81E 043A16FF 00FF680E DA0F8A9A 0ECD0F36 9A50C850 E5880001 ...[]üP.6.ë....Ö.h....:..€..3... 000140
 330874CA 88A6F3C8 88018808 3E8E3174 00308026 47017500 3080267F FF890434 4.¿..&.=.u.G&.=.t1/>..[.ü¡|.ôt.3 000160
 C20A0572 412CAC92 04E0C00E 72412CAC 1A758F1F F788071E 061CE8E7 74AEF2C0 à·ÜtÓ$.....¥.«u.¯,Ar.àÁ..¯,Ar..ô 000180
 00FF8808 4C1EFF04 7400084E 3E830EDF 0F8A9A50 00FCB8EC 885500C3 1FEDEBAA ˆ$Ü.ü.U.$¡•.P...Ô..>N..t...L.¡.. 0001A0
 74C238AD 1CBABE06 568BC08E D88E02E1 885756EC 8855C850 E5880F40 0F8A9A50 P...a..[]üU.$VW¡Ã..Ã.â.V./o.Ù;ôt 0001C0
 76FF57EC 88550002 CA5DE588 5E5F96E8 E8F788AE F2FFFF89 C033970C 74964010 .a.t..3à¿...Ü.%$$._^.[]ò..U.$W.v 0001E0

Dump of file SATURN:[PCCOMMON.DUMP.DLL]IFMDML.TMP;1 on 18-APR-1990 10:47:01.12
File ID (704,15,0)   End of file block 124 / Allocated 124

Virtual block number 104 (00000068), 512 (0200) bytes

 521E5300 028BC488 504901F7 AEF2FFFF 89C033FA 88921F74 C00B0F54 0F5A9A06 ..Z.T..àt...*3à¿...Ü%IIP.áE..S.R 000000
 89990870 20044688 1C8606FF 000004C8 0002CA50 E5885F58 0000FFFF 9A501651 Q.P.....[_.[]ò..à........F.·p..¿ 000020
 02C4830F 9415139A 020068FE 5E8CFC46 89146405 E001C103 E001C888 F9F7000C ..%*.àiÁ.ÈiÁ.d..F•.^±h........á. 000040
 9021E802 000247C7 26F.5EC4 080A4F80 26117400 08085789 26064789 26045EC4 á^.&.G.&.W..Àt.&.O..á^•&úG...$I. 000060
 00010247 C726FC5E C4085789 26064789 2640FE56 88FC4688 040A4F80 26. ˜EC4 á^.&.O...F•.V±a&.G.&.W.á^•&úG... 000080
 065E88EC 8855C3C9 00000447 C7260257 89260789 26085788 26064788 2604.:C4 á^.&.G.&.W.&..&.W.&úG...èÜU.&.^. 0000A0
 0C76FF08 76FF0A76 FF53CC88 04EC8304 60E90454 E9C03300 098A0872 1A731E38 ;.s.r.o..3àÕT.Õ'..&..a$.v..v..v. 0000C0
 5E880CEC 83EC8855 00CB5DE5 88FD1A75 A78091E1 75C0855A 590000FF FF9A5116 .Q.....YZ.áuÅ..Ïu.».[]ù.U.&.&..^ 0000E0
 46805141 415151C9 33531274 201A7587 F60413E9 C0330009 8A08721A 731E3806 .;.s.r.o..3àÕ..-.u. t.S3èOQAAQ.F 000100
 FC4689FE 4689C033 0856C50A 468EFA5E 8C667480 1A7587F6 00001073 9A5016F4 ¶.P.s...-.u..tf._^*.F.éV.3à.F±.F• 000120
 88E22800 808ADC88 02EC8338 75AEF20A 8049E30C 4E88F866 89F288FA 885657FC •WV.*.·.f%.N.DI¯.·Üu;.&..Éo..+à. 000140
 0375FB38 0080009A E90028E8 F4E2AA1A 74F83800 740A3CAC 0C4E8807 16FA8804 à.*...N.¯<.t.;«t.¯à¶Ô+.Ö..¯.;«u. 000160
 12449AFF FC887AE8 0093E9FA 5E8E5F5E E1E80014 E8E2E8FC 46FF0A80 AA001FE8 Ò..¯¯..F•$àÒ..$Ã^_.^*Ö..$±¡=..D. 000180
 0800000F 849A5016 F4468051 521E5306 5E881FE3 CA28CF88 1F061E51 53500FE8 $.PSQ....u+òO..^.$.RQ.F¶.P.Ç.... 0001A0
 74006030 1874C008 08C4831F C3FA8858 58591F07 740808FE 5E01F45E 8811750C àu..^¶.^±.Ùt..Y[X.*ù..á..àt.=m.t 0001C0
 5E8E0E74 401A7587 F6FE5E8E 26E8F900 208A03E8 001C8A08 7500098A 00013000 .=..o..u.o..$.o .*$&.^±-.u.àt..^ 0001E0

Dump of file SATURN:[PCCOMMON.DUMP.DLL]IFMDML.TMP;1 on 18-APR-1990 10:47:01.12
File ID (704,15,0)   End of file block 124 / Allocated 124

Virtual block number 105 (00000069), 512 (0200) bytes

 8E5F5EF8 6688FC46 28FE4688 06E8F9C0 33001C8A 0EE8F803 751A3F80 085E880A ..^..?.u.%$.o..3à*$..F±+F•.f%^_. 000000
 46805152 1E530856 C51EEEE8 C1880475 C9080C4E 8802F7E9 C85DE588 0472FA5E ^*r..[]üÒ%..N..èu..è$Y.éV.S.RQ¯.F 000020
 E8001C8A CC750009 8A00013D 00740060 301774C0 081F071E 00001148 9A5016F4 ¶.P.K.......àt.=m.t.=..o..uào..$ 000040
 1C8AA6E8 02751A3F 80260A88 0A74401A 7587F687 75C008F4 4688C2E8 00208AC7 úo .$ö.F¶.àuñ-.u.àt..Ö&.?.u.$lo. 000060
 7C00F883 117D1A73 1E38065E 88EC8855 FC20E900 835756EC 885500A3 E8C03300 .3à$É.U.$VW*.Õ •U.&.^.;.s.)..«.| 000080
 086E1E38 08720828 0C885A59 00C85DE5 88C03302 E8000188 0574401A 7587F60C .-.u.àt.¡..$.3à.[]ù.YZ.É+Àr.;.n. 0000A0
 A7800488 52000288 086A2EFF 5152FC74 E9C03305 7540086A A1C85152 E3880572 r..DRQùÀj.àu.3àÕt•RQ..j.E..R.à.Ì 0000C0
 7500023D 07740001 30408112 7558C008 0000FFFF 9A521650 1653C488 50871A75 u.ñP.áS.P.R......àXu.Ÿa=..t.=..u 0000E0
 E903731C 9E1EFFD8 33C28C1C A206C41E E31CA00E 885AD479 481A758F 08088106 .Ÿ...u.KyÀZ....D.á.À..ó3Ü....s.Õ 000100
 73E81CAA 8F1CAA8E 007CE81C AA8F1CAA 8E1C9E1E FF000388 C28C1CA6 06C401AE Ü.á.Ì..öE......ƒ¯.«`.Õ|.ƒ`.«`.Ôs 000120
 1CAE8F1C AA8ED88E 0F6088C3 0000FFFF 9A12E568 0E016A08 741CAE3D 1CAA8800 .¡¯.=Ü.t.j..hÍ......ù¡'..Àƒ`.«Ü. 000140
 1CAE8F1C AA8E003A E81F268F 1F268EEC 88550000 12E09A00 6A006A03 6A0051E8 ÒQ.j.j.j..À...U.$/&.«&.Ò:.ƒ`.«Ü. 000160
 06468A50 C033001A E81CAE8F 1CAE8E00 23E81CAE 8F1CAE8E EC885503 E80031E8 Ò1.$.U.$/Û.«Ù.Ò#./Û.«Û.Ò..3àP.F. 000180
 02450805 8804EF83 0E73F738 C31C9E1E FF00028B 07E31CA0 0E880000 FFFF9A50 P.........D.E......ù;%s..ÿ....E. 0001A0
 28043416 8800F0E9 03750434 3639FF28 F6285657 000014C8 00C3EEE8 10FFF274 t·..$Yù.à...WV+-+.964.u.Òþ...4.+ 0001C0
 C48313CC 16269A08 3E681EF6 76FFF876 FF0C6AF8 5689F646 89F25689 F04689C0 à.Fþ.V·.F-.V%j..v%.v-.h>..&.ä..á 0001E0
```

```
Dump of file SATURN:[PCCOMMON.DUMP.DLL]IFMDML.TMP;1 on 18-APR-1990 10:47:01.12
File ID (704,15,0)   End of file block 124 / Allocated 124

Virtual block number 106 (0000006A), 512 (0200) bytes

5EC40CE8 47EA7500 3F8026F6 46FFF65E C4008CE9 03767FFF FE814619 74C0080A ..ât.F.±..v.Õ¥.á^-.F-&.?.uõG$.á^ 000000
C483130B 15CE9A04 6A500145 8DBA7500 3F8026F6 5E8BF475 003F8026 F646FFF6 -.F-&.?.u¶.^-&.?.uo.E.Pj..ö.Û..á 000020
46886074 EE460.EC 4688FE56 89FC4689 02C48314 1115139A 56EE5689 EC468904 ..F$.V¥V......á..F•.V±.F$.F¥tm.F 000040
269A083E 681EF076 FFF276FF 0C6A1C7D 16891C78 A3EE5688 EC468866 74C208FC •.ôtf.F$.V¥È(...).j..v·.vÞ.h>..& 000060
5EC404EC 46830257 89260789 26FE5688 FC4688EC 5EC42C74 C0080AC4 83113016 .0..á..ât,á^$.F•.V±&..&.W..F$.á^ 000080
003F8026 F046FFF0 5EC4E8E8 0E74C00A 078826FC 46FFFC5E C4078A26 F046FFF0 Þ.FÞ&..á^•.F•&...ât.$Õá^Þ.FÞ&.?. 0000A0
00051804 02030202 1601FA70 E90002B8 90C8C95F 5EA77500 3F8026F0 5EC4F475 u¶á^Þ&.?.uÌ^_èù.¡..Õp*.......... 0000C0
00520243 00410235 02121211 0010120F 1600160C 0808070A 0C090C08 0C070906 .........................S.A.C.R. 0000E0
00000807 02CE08A4 00840982 0A810A80 16060972 1C702060 006C0859 00570053 S.W.Y.l.m p.r...........Ê.ö.■... 000100
881A71A3 C85DE588 99FFFF88 0008E8C8 5DE58899 FFFF881A 6A16891A 71A31608 ..Èq...j.¡....[]ùÒ..¡....[]ùÈq.Ê 000120
3C0472BC 3C430A76 243C0472 133CF7E2 43431674 073A2E18 75E40A00 24891466 f.¿$..Õu..:.t.CCã¥<.r.<$v.C<¥r.< 000140
8801FE4F 80260574 C-08C08C 065EC4EC 885500C3 1A6AA398 01478A2E 430176CA òv.C..G..Èj.ù.U.$á^..á.ùt.&.O±.. 000160
A3127400 25E80875 001C923E 831E73FF F1300646 88575602 EC83EC88 $¢^85DE5 []ùW.$.$.VW.F.=þ.s..>...u.ÒX.t.Ê 000180
E5885E5F 02C48313 8C16849A 0676FF08 750078E8 05740018 E8157500 82£ 1C92 ..Ò..u.Ò..t.Òx.u..v..Ç....á._^.[ 0001A0
5002B051 0E4F8D50 501EC033 FE5E89FE E3834306 5E880776 065E3900 F08b·B50 ]ùEÞ.9^.v..^.C.D±.^±3å.PP.O.Ō .P 0001C0
880008A3 DA8E0574 D20B1C96 A31C9416 87C28838 74FFFA83 08C48315 4718609A .'.G..á..*.t8.ò....Ê...■t..ÒÊ... 0001E0

Dump of file SATURN:[PCCOMMON.DUMP.DLL]IFMDML.TMP;1 on 18-APR-1990 10:47:01.12
File ID (704,15,0)   End of file block 124 / Allocated 124

Virtual block number 107 (0000006B), 512 (0200) bytes

00000500 0AA30147 800002A3 0000A300 0AB80C47 89484800 08A3C033 D88EFE5E ^±.Á3åÈ..HH.G.¡..È..È...G.È..... 000000
0AC8C309 8EC18CD2 080136E8 1C961E8E 0B33064E 88C08ED8 8CC31FD8 8C0006A3 È...Á.ù.Á.â.N.3Ù....Ò6..■.è.1ùà. 000020
C02B0674 FFFFC2F7 FA5689F8 468915FB 195E9A06 76FF006A 0876FF00 6A560000 ..Vj..v.j..v..^.«..F½.V*¼ô..t.+á 000040
FE76FF00 6A561274 D008FE56 89FC4689 02C48316 1415139A 56F87688 902FE899 .$/..v½V......á..F•.V±.Ât.Vj..v± 000060
E30E4E88 1E5657EC 885590C8 C95EFE56 88FC4688 9007E808 C4831573 19169A50 P...s..á.$...F•.V±^èù.U.$WV..N.D 000080
FF453A26 C933FF44 8AA6F30A 76C5FE88 CB03D9F7 AEF2C033 F788067E C4D98B27 '.1á~..¼3à·Ù¼1.ù.±év.µ].D.3è&:E. 0000A0
FC5E8CFA 46890870 88560000 06C800C8 5DE5885F 5E1FC188 D1F74949 04740477 w.t.]]¼1.è.^_.[]ù.à...V|p..F*.^■ 0000C0
0CFA4683 46017440 04C48315 E019929A 53060E74 830A47F6 26FA5EC4 1CEBF628 +-$.á^*&-G..T..S...Á..á.ât.F.F*. 0000E0
01FE4F80 0474DB08 065E88EC 885590C8 C95EC688 D876FA46 391A6016 881A5EA1 Å^...'.9F*vÁ.ó^èù.U.$.^..Ùt..O±. 000100
24E899C0 33057501 76E80005 88071E29 75003F83 1C888857 56EC8855 CB5DE588 .[]ùW.$VWE...?.u)..¡..Òv.u.3å.$$ 000120
8ED88C06 4E881C8E 3689FFFE FE44C704 C6830001 04C7961C 8AA31C88 A3FE2440 a$±È..È...ù....ó.ùD±±..ó...N..Ä. 000140
A8FE88AD FC027788 F273EEF9 83FEE180 FA744100 D0E9CB5D E5885E5F 0009E8C0 àÒ.._^.[]ùÒÅ.At*.Ã±.*Ys·.w.■Ù.±¯ 000160
74FE88E6 E8FE4489 F7880002 05C20335 7401A8AD F003D088 1573C138 48437401 .tCH;ès..Å.ÞÙ´.t5.ô....¼.D±$].±t 000180
1E8C2605 74D13812 E6890A8C C688FE4C FEF90305 E8058948 C128FE4C 89F9030C ..*.L±+èH..$..*±L±.ó.O¿l.;it.&.. 0001A0
73C13848 FE88F274 01A8ADF0 03FE8825 74FFFE3D 021C9A06 C626C302 7F891C96 .....ù&ó....=±.t%.±.ÞÙ´.t´.±H;ès 0001C0
E8D88E04 74C00808 4788E6E8 FE4489F7 88000205 C203E274 01A8ADF0 03D0888C ¥.Å.ÞÙ´.tã.ô....¼.D±$].G..ät..Å$ 0001E0

Dump of file SATURN:[PCCOMMON.DUMP.DLL]IFMDML.TMP;1 on 18-APR-1990 10:47:01.12
File ID (704,15,0)   End of file block 124 / Allocated 124

Virtual block number 108 (0000006C), 512 (0200) bytes

E8C03306 77888BEB 37881C92 1E8E2605 74C73B17 47BFD88C 12741C9A 0EFE2615 .&±...t..Á¢G.;ùt.&.....7$E.w.3àò 000000
B9088C98 EB4E4E96 0574001D E8FE40FE 0074005F E8984040 01240074 C638006B k.;ót.$.ââ.Ò_.t.±M±Ò..t..NN$..Ä¿ 000020
414149C8 2B037401 A8FE4588 51C399C0 33024789 07881C96 A3260474 C138179B ..;èt.&È....G.3å.ùQ.E±´.t.+à1AA 000040
0CE8C628 C22302F7 0072C203 1572C603 C18BF575 EAD10476 1C981638 267FFFBA ¤..&;...v.1õu¼.è.ór..ór.¼■¥ó+óÒ. 000060
FFFEFE44 C7F203F0 88FE8857 18740010 E85152C3 59C033E5 75EAD1D2 F7087500 .u.¼■1ÕuI3åYùRQÒ..t.W.±.Þ.·ùD±±. 000080
18609A1F 06500001 88505252 1ED23350 53C35A59 58FE5589 4AD72806 88067789 .W..■+■J.U±XYZùSP3■.RRP¡..P...'. 0000A0
88043C8F 3875000A 7E830657 56EC8855 C3020802 74585A1F FFFA8308 C4831683 ...á..*..Z[t..■ÙÙ.$VW..~..uß«<.. 0000C0
0E468902 44880074 F7381174 48083C36 884CE827 720057E8 07754806 46880856 V..F.Hu.ÒW.r'$L.ó<.Ht.;¼t..D..F. 0000E0
501652C4 885021E8 99FFFF88 06750208 0473083C FE8104C6 8334735E 003EE856 VÒ>.^s4.ó..±<.s..■u.¡...$IP.áR.P 000100
E5885E5F 07C03303 88083C36 89025C89 1489E675 C085F958 0000FFFF 9A50C033 3àP.....[*.âu]...\..ó<..Æ3å._^.[ 000120
03882672 1C030A88 2CE8F9F2 75083CFE 8104C683 0C74024C 39F7880E 4E88C85D ]ù.N..¼9L.t..ó..±<.u·*$,.Ò..r&.Æ 000140
92043616 890475F7 38DE75C0 850000FF FF9A5153 13730436 1E390675 F73BC18E .è;¼u.9.ó.s.SQ......âuß;¼u...ó.. 000160
01030323 D818D128 0C74DAF7 D788067E C45738E3 0C4E88EC 885500C3 D1880487 ...1ù.U.$.N.DßWá-..■¼Òt.+1.Ù■Æ.1 000180
F3E901C3 8EFFFFC3 81C38C10 E3D187AA F3C913AB F3E9D1E0 8A0A4688 D12B0187 .1+1.F..Å1Òµ´.èµ¯.1D..ù.ù...ù1Òµ 0001A0
46880875 0A5E88D8 080C5E88 084688EC 8855C850 08568806 46885FAA F3C913AB ¨.èµ¨_.F..V.]ùW.$.F..^..Ä.^.u..F 0001C0
CA5DE588 D103E3F7 06468BC8 030C66F7 064688C8 88E3F700 08CA5DE5 88E3F706 .¼D.[]ò..¼D.à.F.¼f..à.F.¼D.1.[]ò 0001E0
```

```
Dump of file SATURN:[PCCOMMON.DUMP.DLL]IFMDML.TMP;1 on 18-APR-1990 10:47:01.12
File ID (704,15,0)   End of file block 124 / Allocated 124

Virtual block number 109 (0000006D), 512 (0200) bytes

 2DC38815 75080A47 F6265575 023C0324 0A478A26 065EC4F6 28560000 04C80008 ..à...V+-á^.&.G.$.<.uU&-G..u..û- 000000
 08FC4689 06472826 07882606 5E883974 01146487 F6060868 F9F7000C 89990870 p..¿..X*kÄ.-.d..t9.^.&..&+G..F•. 000020
 0874FC46 3808C483 18501088 9A50E42A 08478A26 0677FF26 0877FF26 50287EC0 à-(P&.w.&.w.&.G.*óP...P..á.;F•t. 000040
 47C72602 57892607 89260857 88260647 8826065E C4FFFF8E 200A4F80 26065EC4 á^.&.O. ƒ..á^.&.G.&.W.&..&.W.&úG 000060
 000811D4 02030007 000312FA 01030005 00031332 0103000C C8C95EC6 88000004 ....ó^èù....2.......•.......å... 000080
 001719E6 0002003A 00031084 01030026 000318FF 01030022 00031884 01030252 R...Ç...".......&...Ç...:...|... 0000A0
 00030EC0 01030088 00031949 01050040 0003127C 01030000 001917D0 00020000 ....Å.......|...M...Ì.......å... 0000C0
 54206E75 5220534D 00000000 00000000 00000000 0000005C 00030EAD 0103005B [...Ù...\...............MS Run-T 0000E0
 38383931 20296328 20746867 69727970 6F43202D 20797261 7262694C 20656069 ime Library - Copyright (c) 1988 000100
 00540000 43FC004E 00C243FB 002E0011 70726F43 2074666F 736F7263 6940202C , Microsoft Corp....«Cö.N.•C..T. 000120
 00010072 08C1271C 006C0862 44000066 080143FF 006007A0 43FE005A 006143FD »Ca.Z.±C..'..C..f..Db.l..'è.r... 000140
 09924589 0090081A 458A008A 0A5F4588 00840920 271E007E 03580002 007801F2 ·.x...[.-..' ....E.....E.....E.. 000160
 00841579 458E00AE 10ED4580 00A80F79 272100A2 00EE271F 009C0C8F 45880096 ...E¢....'Ÿ.A.|'y.¯..EÜ.Ù..Ey.Ç. 000180
 04884404 00002000 2000776F 6C460000 00000000 FFFF184F 440600BA 17234407 .D#.¤..DO.........Flow.-.-...DÉ. 0001A0
 FFFF0828 271C00EE 076E4405 00E80256 440300E2 02E64402 000C0100 44010006 •..D..É..DÌ.ã..DV.Ò..Dn.Ÿ..'(... 0001C0
 43FE0112 038143FB 010C028F 43FC0106 032043FD 01000573 271C0000 00000000 .......'s...»C ...•C¢...«C....±C 0001E0

Dump of file SATURN:[PCCOMMON.DUMP.DLL]IFMDML.TMP;1 on 18-APR-1990 10:47:01.12
File ID (704,15,0)   End of file block 124 / Allocated 124

Virtual block number 110 (0000006E), 512 (0200) bytes

 06FE4406 013005D2 4407012A 012C0002 01240000 0001011E 051243FF 01180481 Ÿ....C........$...,.*..D@.O..D±. 000000
 77746562 20776F6C 66206120 65746165 72632074 276E6143 00000000 0000FFFF ........Can't create a flow betw 000020
 20776F6C 46204100 666C6573 74692064 6E612074 63656A62 6F206E61 206E6565 een an object and itself.A Flow  000040
 6972502D 6E6F4E20 61206F74 20646574 63656E6E 6F632065 6220746F 6E6E6163 cannot be connected to a Non-Pri 000060
 20656220 746F6E6E 61632077 6F6C4620 41007373 65636F72 50206576 6974696D mitive Process.A Flow cannot be  000080
 6F725020 65766974 69606972 50206E6F 4E206120 6F742064 65746365 6E6E6F63 connected to a Non-Primitive Pro 0000A0
 43F001F2 000043FC 01EC048C 000201E6 00C20001 01E00832 271C0000 73736563 cess...'2.Å...ô.Ì.....$.•C..·.»C 0000C0
 02140374 43FC020E 043643FB 0208071C 271C0000 64250000 00000000 FFFF0061 a.........%d...'....«Cö...•Ct... 0000E0
 271F0232 00F30002 022C0000 00010226 06B843FF 0220065A 43FE021A 030543FD »Cf...±CZ. ..CÉ.&........µ.2..' 000100
 00000001 00000000 0000FFFF 0A974406 0244096B 4407023E 084C2721 0238077B (.8.!'L.>..Dk.D..D............ 000120
 FFFF0350 55F1026E 005255F0 026809FB 55F30262 068E55F2 FFFF00C7 00020256 V...ú...·U/.b.µU«.h.ÞUR.n.þUP... 000140
 27230292 05255688 028C01C8 00020286 00000001 028003AB 271C0000 00000000 .......' ..........à...¡V%...#' 000160
 05102723 02800481 271C02AA 02660002 02A40000 00010000 00000000 FFFF0469 i.............Ê...f.¯..'..¯.#'.. 000180
 02D4088C 271C02CE 05870002 02C80000 00010000 00000000 FFFF06EA 578002B6 Ñ..Wö..............à...ñ.ö..'..å. 0001A0
 51410304 00605140 02EC1139 272802E6 08EB2726 02E00A0B 272302DA 08942724 $'..Ö.#'..Å.&'$.Ì.('9.$.àQ'...AQ 0001C0
 00000001 0000000C 0000FFFF 15774400 025C09FB 514302FE 068E5142 02F80350 P.½.8Qƒ.±.CQ«.\..Dw............. 0001E0

Dump of file SATURN:[PCCOMMON.DUMP.DLL]IFMDML.TMP;1 on 18-APR-1990 10:47:01.12
File ID (704,15,0)   End of file block 124 / Allocated 124

Virtual block number 111 (0000006F), 512 (0200) bytes

 00000000 0000FFFF 0A002723 03280ABC 52080322 0971271C 031C07A4 00020316 ....Ê....'q."..R¥.(.#'.......... 000000
 52000352 0CC52723 034C08EC 27250346 09A3271C 03400A32 0002033A 00000001 ....:...2.à..'Ê.F.X'$.L.#'è.R.ÅR 000020
 00000000 FFFF031D 271C036A 02070002 03640000 00010000 00000000 FFFF0E9F ..............d.....j..'........ 000040
 03940000 00010000 00000000 FFFF031D 271C0382 02070002 037C0000 00010000 ......|........'................ 000060
 0000FFFF 01C10002 03AC0000 00010000 00000000 FFFF0377 271C039A 021C0002 .......'w................è..... 000080
 00000000 FFFF0000 271C0000 00000000 FFFF008A 633803BE 00000001 00000000 ........ƒ.8c...........'........ 0000A0
 00010000 2D002D00 776F6C46 00000000 0000FFFF 006C4400 030C0000 271C0000 ...'..É..Dl.........Flow.-.-.... 0000C0
 060A4403 0410076A 4402040A 05914401 0404093F 440403FE 01CE0002 03F80000 ..½...ö.±..D?....D.....Dj....DÖ. 0000E0
 23202D2B 00296C6C 756E2800 296C6C75 6E280000 00000000 FFFF0A5B 271C0416 ...'(.........(null).(null).+- # 000100
 00000000 00000000 00000000 00000000 1C801F30 13151F30 1F300000 00000000 ......0.0...0................... 000120
 00000000 00000000 00000000 00000000 00000000 00000000 00000000 00000000 ................................ 000140
 00000000 00000000 00000000 00000000 00000000 00000000 00000000 00000000 ................................ 000160
 00000000 00000000 00000000 00000000 00000000 00000000 00000000 00000000 ................................ 000180
 00000000 00000000 00000000 00000000 00000000 00000000 00000000 00000000 ................................ 0001A0
 00000000 00000000 00000000 00000000 00000000 00000000 00000000 00000000 ................................ 0001C0
 00000000 00000000 00000000 00000000 00000000 00000000 00000000 00000000 ................................ 0001E0
```

```
Dump of file SATURN:[PCCOMMON.DUMP.DLL]IFMDML.TMP;1 on 18-APR-1990 10:47:01.12
File ID (704,15,0)   End of file block 124 / Allocated 124

Virtual block number 112 (00000070), 512 (0200) bytes

 00000000 00000000 00000000 00000000 00000000 00000000 00000000 00000000 ................................ 000000
 00000000 00000000 00000000 00000000 00000000 00000000 00000000 00000000 ................................ 000020
 00000000 00000r00 00000000 00000000 00000000 00000000 00000000 00000000 ................................ 000040
 00000000 00000000 00000000 00000000 00000000 00000000 00000000 00000000 ................................ 000060
 00000000 00000000 00000000 00000000 00000000 00000000 00000000 00000000 ................................ 000080
 00000000 00000000 00000000 00000000 00000000 00000000 00000000 00000000 ................................ 0000A0
 00000000 00000000 00000000 00000000 00000000 00000000 00000000 00000000 ................................ 0000C0
 00000000 00000000 00000000 00000000 00000000 00000000 00000000 00000000 ................................ 0000E0
 00000000 00000000 00000000 00000000 00000000 00000000 00000000 00000000 ................................ 000100
 00000000 00000000 00000000 00000000 00000000 00000000 00000000 00000000 ................................ 000120
 00000000 00000000 00000000 00000000 00000000 00000000 00000000 00000000 ................................ 000140
 00000000 00000000 00000000 00000000 00000000 00000000 00000000 00000000 ................................ 000160
 00000000 00000000 00000000 00000000 00000000 00000000 00000000 00000000 ................................ 000180
 00000000 00000000 00000000 00000000 00000000 00000000 00000000 00000000 ................................ 0001A0
 00000000 00000000 00000000 00000000 00000000 00000000 00000000 00000000 ................................ 0001C0
 00000000 00000000 00000000 00000000 00000000 00000000 00000000 00000000 ................................ 0001E0

Dump of file SATURN:[PCCOMMON.DUMP.DLL]IFMDML.TMP;1 on 18-APR-1990 10:47:01.12
File ID (704,15,0)   End of file block 124 / Allocated 124

Virtual block number 113 (00000071), 512 (0200) bytes

 00000000 00000000 00000000 00000000 00000000 00000000 00000000 00000000 ................................ 000000
 00000000 00000000 00000000 00000000 00000000 00000000 00000000 00000000 ................................ 000020
 00000000 00000000 00000000 00000000 00000000 00000000 00000000 00000000 ................................ 000040
 00000000 00000000 00000000 00000000 00000000 00000000 00000000 00000000 ................................ 000060
 00000000 000000. 1 00000000 00000000 00000000 00000000 00000000 00000000 ................................ 000080
 00000000 000000uu 00000000 00000000 00000000 00000000 00000000 00000000 ................................ 0000A0
 00000000 00000000 00000000 00000000 00000000 00000000 00000000 00000000 ................................ 0000C0
 00000000 00000000 00000000 00000000 00000000 00000000 00000000 00000000 ................................ 0000E0
 00000000 00000000 00000000 00000000 00000000 00000000 00000000 00000000 ................................ 000100
 00000000 00304F46 4E495F45 4C49465F 435F043C 00000000 00000000 00000000 ...........<._C_FILE_INFO=...... 000120
 0200FFFF FFFF0101 00000000 085E1460 085A1460 08561460 08521460 FFFF1460 '...'.R.'.V.'.Z.'.^............. 000140
 00000000 00000000 01020000 00000000 00000000 00011CAE 00000000 08780000 ..x.....Û....................... 000160
 00000000 00000000 00000000 00000000 00000000 00000000 00000000 02020000 ................................ 000180
 00000000 00000000 00000000 00000000 00000000 00000000 00000000 00000000 ................................ 0001A0
 00000000 00000000 00000000 00000000 00000000 00000000 00000000 00000000 ................................ 0001C0
 00000000 00000000 00000000 00000000 00000000 00000000 00000000 00000000 ................................ 0001E0

Dump of file SATURN:[PCCOMMON.DUMP.DLL]IFMDML.TMP;1 on 18-APR-1990 10:47:01.12
File ID (704,15,0)   End of file block 124 / Allocated 124

Virtual block number 114 (00000072), 512 (0200) bytes

 00000000 00000000 00000000 00000000 00000000 00000000 00000000 00000000 ................................ 000000
 00000000 00000000 00000000 00000000 00000000 00000000 00000000 00000000 ................................ 000020
 00000000 00000000 00000000 00000000 00000000 00000000 00000000 00000000 ................................ 000040
 00000000 00000000 00000000 00000000 00000000 00000000 00000000 00000000 ................................ 000060
 00000000 00000000 00000000 00000000 00000000 00000000 00000000 00000000 ................................ 000080
 00000000 00000000 00000000 00000000 00000000 00000000 00000000 00000000 ................................ 0000A0
 00000000 00000000 00000000 00000000 00000000 00000000 00000000 00000000 ................................ 0000C0
 00000000 00000000 00000000 00000000 00000000 00000000 00000000 00000000 ................................ 0000E0
 00000000 00000000 00000000 00000000 00000000 00000000 00000000 00000000 ................................ 000100
 00000000 00000000 00000000 00000000 00000000 00000000 00000000 00000000 ................................ 000120
 00000000 00000000 00000000 00000000 00000000 00000000 00000000 00000000 ................................ 000140
 00000000 00000000 00000000 00000000 00000000 00000000 00000000 00000000 ................................ 000160
 00000000 00000000 00000000 00000000 00000000 00000000 00000000 00000000 ................................ 000180
 00000000 00000000 00000000 00000000 00000000 00000000 00000000 00000000 ................................ 0001A0
 00000000 00000000 00000000 00000000 00000000 00000000 00000000 00000000 ................................ 0001C0
 00000000 00000000 00000000 00000000 00000000 00000000 00000000 00000000 ................................ 0001E0
```

```
Dump of file SATURN:[PCCOMMON.DUMP.DLL]IFMDML.TMP;1 on 18-APR-1990 10:47:01.12
File ID (704,15,0)   End of file block 124 / Allocated 124

Virtual block number 115 (00000073), 512 (0200) bytes

 00000000 00000000 00000000 00000000 00000000 00000000 00000000 00000000 ................................ 000000
 00000000 00000000 00000000 00000000 00000000 00000000 00000000 00000000 ................................ 000020
 00000000 00000000 00000000 00000000 00000000 00000000 00000000 00000000 ................................ 000040
 00000000 00000000 00000000 00000000 00000000 00000000 00000000 00000000 ................................ 000060
 00000000 00000000 00000000 00000000 00000000 00000000 00000000 00000000 ................................ 000080
 00000000 00000000 00000000 00000000 00000000 00000000 00000000 00000000 ................................ 0000A0
 00000000 00000000 00000000 00000000 00000000 00000000 00000000 00000000 ................................ 0000C0
 00000000 00000000 00000000 00000000 00000000 00000000 00000000 00000000 ................................ 0000E0
 00000000 00000000 00000000 00000000 00000000 00000000 00000000 00000000 ................................ 000100
 00000000 00000000 00000000 00000000 00000000 00000000 00000000 00000000 ................................ 000120
 00000000 00000000 00000000 00000000 00000000 00000000 00000000 00000000 ................................ 000140
 00000000 00000000 00000000 00000000 00000000 00000000 00000000 00000000 ................................ 000160
 00000000 00000000 00000000 00000000 00000000 00000000 00000000 00000000 ................................ 000180
 00000000 00000000 00000000 00000000 00000000 00000000 00000000 00000000 ................................ 0001A0
 00000000 00000000 00000000 00000000 00000000 00000000 00000000 00000000 ................................ 0001C0
 00000000 00000000 00000000 00000000 00000000 00000000 00000000 00000000 ................................ 0001E0

Dump of file SATURN:[PCCOMMON.DUMP.DLL]IFMDML.TMP;1 on 18-APR-1990 10:47:01.12
File ID (704,15,0)   End of file block 124 / Allocated 124

Virtual block number 116 (00000074), 512 (0200) bytes

 00000000 00000000 00000000 00000000 00000000 00000000 00000000 00000000 ................................ 000000
 00000000 00000000 00000000 00000000 00000000 00000000 00000000 00000000 ................................ 000020
 00000000 00000000 00000000 00000000 00000000 00000000 00000000 00000000 ................................ 000040
 00000000 00000000 00000000 00000000 00000000 00000000 00000000 00000000 ................................ 000060
 00000000 00000000 00000000 00000000 00000000 00000000 00000000 00000000 ................................ 000080
 00000000 00000000 00000000 00000000 00000000 00000000 00000000 00000000 ................................ 0000A0
 00000000 00000000 00000000 00000000 00000000 00000000 00000000 00000000 ................................ 0000C0
 00000000 00000000 00000000 00000000 00000000 00000000 00000000 00000000 ................................ 0000E0
 00000000 00000000 00000000 00000000 00000000 00000000 00000000 00000000 ................................ 000100
 00000000 00000000 00000000 00000000 00000000 00000000 00000000 00000000 ................................ 000120
 00000000 00000000 00000000 00000000 00000000 00000000 00000000 00000000 ................................ 000140
 00000000 00000000 00000000 00000000 00000000 00000000 00000000 00000000 ................................ 000160
 00000000 00000000 00000000 00000000 00000000 00000000 00000000 00000000 ................................ 000180
 00000000 00000000 00000000 00000000 00000000 00000000 00000000 00000000 ................................ 0001A0
 00000000 00000000 00000000 00000000 00000000 00000000 00000000 00000000 ................................ 0001C0
 00000000 00000000 00000000 00000000 00000000 00000000 00000000 00000000 ................................ 0001E0

Dump of file SATURN:[PCCOMMON.DUMP.DLL]IFMDML.TMP;1 on 18-APR-1990 10:47:01.12
File ID (704,15,0)   End of file block 124 / Allocated 124

Virtual block number 117 (00000075), 512 (0200) bytes

 00000000 00000000 00000000 00000000 00000000 00000000 00000000 00000000 ................................ 000000
 00000000 00000000 00000000 00000000 00000000 00000000 00000000 00000000 ................................ 000020
 00000000 00000000 00000000 00000000 00000000 00000000 00000000 00000000 ................................ 000040
 00000000 00000000 00000000 00000000 00000000 00000000 00000000 00000000 ................................ 000060
 00000000 00000000 00000000 00000000 00000000 00000000 00000000 00000000 ................................ 000080
 00000000 00000000 00000000 00000000 00000000 00000000 00000000 00000000 ................................ 0000A0
 00000000 00000000 00000000 00000000 00000000 00000000 00000000 00000000 ................................ 0000C0
 00000000 00000000 00000000 00000000 00000000 00000000 00000000 00000000 ................................ 0000E0
 00000000 00000000 00000000 00000000 00000000 00000000 00000000 00000000 ................................ 000100
 00000000 00000000 00000000 00000000 00000000 00000000 00000000 00000000 ................................ 000120
 00000000 00000000 00000000 00000000 00000000 00000000 00000000 00000000 ................................ 000140
 00000000 00000000 00000000 00000000 00000000 00000000 00000000 00000000 ................................ 000160
 00000000 00000000 00000000 00000000 00000000 00000000 00000000 00000000 ................................ 000180
 00000000 00000000 00000000 00000000 00000000 00000000 00000000 00000000 ................................ 0001A0
 00000000 00000000 00000000 00000000 00000000 00000000 00000000 00000000 ................................ 0001C0
 00000000 00000000 00000000 00000000 00000000 00000000 00000000 00000000 ................................ 0001E0
```

```
Dump of file SATURN:[PCCOMMON.DUMP.DLL]IFMDML.TMP;1 on 18-APR-1990 10:47:01.12
File ID (704,15,0)   End of file block 124 / Allocated 124

Virtual block numer 118 (00000076), 512 (0200) bytes

00000000 00000000 00000000 00000000 00000000 00000000 00000000 00000000 ................................ 000000
00000000 00000000 00000000 00000000 00000000 00000000 00000000 00000000 ................................ 000020
00000000 00000000 00000000 00000000 00000000 00000000 00000000 00000000 ................................ 000040
00000000 00000000 00000000 00000000 00000000 00000000 00000000 00000000 ................................ 000060
00000000 00000000 00000000 00000000 00000000 00000000 00000000 00000000 ................................ 000080
00000000 00000000 00000000 00000000 00000000 00000000 00000000 00000000 ................................ 0000A0
00000000 00000000 00000000 00000000 00000000 00000000 00000000 00000000 ................................ 0000C0
00000000 00000000 00000000 00000000 00000000 00000000 00000000 00000000 ................................ 0000E0
00000000 00000000 00000000 00000000 00000000 00000000 00000000 00000000 ................................ 000100
00000000 00000000 00000000 00000000 00000000 00000000 00000000 00000000 ................................ 000120
00000000 00000000 00000000 00000000 00000000 00000000 00000000 00000000 ................................ 000140
00000000 00000000 00000000 00000000 00000000 00000000 00000000 00000000 ................................ 000160
00000000 00000000 00000000 00000000 00000000 00000000 00000000 00000000 ................................ 000180
00000000 00000000 00000000 00000000 00000000 00000000 00000000 00000000 ................................ 0001A0
00000000 00000000 00000000 00000000 00000000 00000000 00000000 00000000 ................................ 0001C0
00000000 00000000 00000000 00000000 00000000 00000000 00000000 00000000 ................................ 0001E0

Dump of file SATURN:[PCCOMMON.DUMP.DLL]IFMDML.TMP;1 on 18-APR-1990 10:47:01.12
File ID (704,15,0)   End of file block 124 / Allocated 124

Virtual block number 119 (00000077), 512 (0200) bytes

00000000 00000000 00000000 00000000 00000000 00000000 00000000 00000000 ................................ 000000
00000000 00000000 00000000 00000000 00000000 00000000 00000000 00000000 ................................ 000020
00000000 00000000 00000000 00000000 00000000 00000000 00000000 00000000 ................................ 000040
00000000 00000000 00000000 00000000 00000000 00000000 00000000 00000000 ................................ 000060
00000000 00000000 00000000 00000000 00000000 00000000 00000000 00000000 ................................ 000080
00000000 00000000 00000000 00000000 00000000 00000000 00000000 00000000 ................................ 0000A0
00000000 00000000 00000000 00000000 00000000 00000000 00000000 00000000 ................................ 0000C0
00000000 00000000 00000000 00000000 00000000 00000000 00000000 00000000 ................................ 0000E0
00000000 00000000 00000000 00000000 00000000 00000000 00000000 00000000 ................................ 000100
00000000 00000000 02000001 00000000 00000000 00000000 00000000 00000000 ................................ 000120
00000000 00000000 00000000 00000000 00000000 00000000 00000000 00000000 ................................ 000140
00000000 00000000 00000000 00000000 00000000 00000000 00000000 00000000 ................................ 000160
00000000 00000000 00000000 00000000 00000000 00000000 00000000 00000000 ................................ 000180
00000000 00000000 00000000 00000000 00000000 00000000 00000000 00000000 ................................ 0001A0
00000000 00000000 00000000 00000000 00000000 00000000 00000000 00000000 ................................ 0001C0
00000000 00000000 00000000 00000000 00000000 00000000 00000000 00000000 ................................ 0001E0

Dump of file SATURN:[PCCOMMON.DUMP.DLL]IFMDML.TMP;1 on 18-APR-1990 10:47:01.12
File ID (704,15,0)   End of file block 124 / Allocated 124

Virtual block number 120 (00000078), 512 (0200) bytes

00000000 00000000 00000000 00000000 00000000 00000000 00000000 00000000 ................................ 000000
00000000 00000000 00000000 00000000 00000000 00000000 00000000 00000000 ................................ 000020
00000000 00000000 00000000 00000000 00000000 00000000 00000000 00000000 ................................ 000040
00000000 00000000 00000000 00000000 00000000 00000000 00000000 00000000 ................................ 000060
00000000 00000000 00000000 00000000 00000000 00000000 00000000 00000000 ................................ 000080
00000000 00000000 00000000 00000000 00000000 00000000 00000000 00000000 ................................ 0000A0
00000000 00000000 00000000 00000000 00000000 00000000 00000000 00000000 ................................ 0000C0
00000000 00000000 00000000 00000000 00000000 00000000 00000000 00000000 ................................ 0000E0
00000000 00000000 00000000 00000000 00000000 00000000 00000000 00000000 ................................ 000100
00000000 00000000 00000000 00000000 00000000 00000000 00000000 00000000 ................................ 000120
00000000 00000000 00000000 00000000 00000000 00000000 00000000 00000000 ................................ 000140
00000000 00000000 00000000 00000000 00000000 00000000 00000000 00000000 ................................ 000160
00000000 00000000 00000000 00000000 00000000 00000000 00000000 00000000 ................................ 000180
00000000 00000000 00000000 00000000 00000000 00000000 00000000 00000000 ................................ 0001A0
00000000 00000000 00000000 00000000 00000000 00000000 00000000 00000000 ................................ 0001C0
00000000 00000000 00000000 00000000 00000000 00000000 00000000 00000000 ................................ 0001E0
```

```
Dump of file SATURN:[PCCOMMON.DUMP.DLL]IFMDML.TMP;1 on 18-APR-1990 10:47:01.12
File ID (704,15,0)    End of file block 124 / Allocated 124

Virtual block number 121 (00000079), 512 (0200) bytes

00000000 00000000 00000000 00000000 00000000 00000000 00000000 00000000 ................................ 000000
00000000 00000000 00000000 00000000 00000000 00000000 00000000 00000000 ................................ 000020
00000000 00000000 00000000 00000000 00000000 00000000 00000000 00000000 ................................ 000040
00000000 00000000 00000000 00000000 00000000 00000000 00000000 00000000 ................................ 000060
00000000 00000000 00000000 00000000 00000000 00000000 00000000 00000000 ................................ 000080
00000000 00000000 00000000 00000000 00000000 00000000 00000000 00000000 ................................ 0000A0
00000000 00000000 00000000 00000000 00000000 00000000 00000000 00000000 ................................ 0000C0
00000000 00000000 00000000 00000000 00000000 00000000 00000000 00000000 ................................ 0000E0
00000000 00000000 00000000 00000000 00000000 00000000 00000000 00000000 ................................ 000100
00000000 00000000 00000000 00000000 00000000 00000000 00000000 00000000 ................................ 000120
00000000 00000000 00000000 00000000 00000000 00000000 00000000 00000000 ................................ 000140
00000000 00000000 00000000 00000000 00000000 00000000 00000000 00000000 ................................ 000160
00000000 00000000 00000000 00000000 00000000 00000000 00000000 00000000 ................................ 000180
00000000 00000000 00000000 00000000 00000000 00000000 00000000 00000000 ................................ 0001A0
00000000 00000000 00000000 00000000 00000000 00000000 00000000 00000000 ................................ 0001C0
00000000 00000000 00000000 00000000 00000000 00000000 00000000 00000000 ................................ 0001E0

Dump of file SATURN:[PCCOMMON.DUMP.DLL]IFMDML.TMP;1 on 18-APR-1990 10:47:01.12
File ID (704,15,0)    End of file block 124 / Allocated 124

Virtual block number 122 (0000007A), 512 (0200) bytes

00000000 00000000 00000000 00000000 00000000 00000000 00000000 00000000 ................................ 000000
00000000 00000000 00000000 00000000 00000000 00000000 00000000 00000000 ................................ 000020
00000000 00000000 00000000 00000000 00000000 00000000 00000000 00000000 ................................ 000040
00000000 00000000 00000000 00000000 00000000 00000000 00000000 00000000 ................................ 000060
00000000 00000000 00000000 00000000 00000000 00000000 00000000 00000000 ................................ 000080
00000000 00000000 00000000 00000000 00000000 00000000 00000000 00000000 ................................ 0000A0
00000000 00000000 00000000 00000000 00000000 00000000 00000000 00000000 ................................ 0000C0
00000000 00000000 00000000 00000000 00000000 00000000 00000000 00000000 ................................ 0000E0
00000000 00000000 00000000 00000000 00000000 00000000 00000000 00000000 ................................ 000100
00000000 00000000 00000000 00000000 00000000 00000000 00000000 00000000 ................................ 000120
00000000 00000000 00000000 0000043E 14580000 00000000 00000000 00000000 ..............X.>............... 000140
00000000 00000000 00000000 00000000 00000000 00000000 81818101 00000001 ................................ 000160
00000000 00000000 00000000 00000000 00000000 00000000 00000000 00000000 ................................ 000180
00000000 00000000 00000000 00000000 00000000 00000000 00000000 00000000 ................................ 0001A0
00000000 00000000 00000000 00000000 00000000 00000000 00000000 00000000 ................................ 0001C0
00000000 00000000 00000000 00000000 00000000 00000000 00000000 00000000 ................................ 0001E0

Dump of file SATURN:[PCCOMMON.DUMP.DLL]IFMDML.TMP;1 on 18-APR-1990 10:47:01.12
File ID (704,15,0)    End of file block 124 / Allocated 124

Virtual block number 123 (0000007B), 512 (0200) bytes

00000000 00000000 00000000 00000000 00000000 00000000 00000000 00000000 ................................ 000000
00000000 00000000 00000000 00000000 00000000 00000000 00000000 00000000 ................................ 000020
00000000 00000000 00000000 00000000 00000000 00000000 00000000 00000000 ................................ 000040
0A0A0A0A 0A0A0A0A 0A0A0A0A 0A0A0A0A 0A0A0A0A 0A0A0A0A 0A0A0A00 00000000 ................................ 000060
0A0A0A0A 0A0A0A0A 0A0A0A0A 0A0A0A0A 0A0A0A0A 0A0A0A0A 0A0A0A0A 0A0A0A0A ................................ 000080
0A0A0A0A 0A0A0A0A 0A0A0A0A 0A0A0A0A 0A0A0A0A 0A0A0A0A 0A0A0A0A 0A0A0A0A ................................ 0000A0
0A0A0A0A 0A0A0A0A 0A0A0A0A 0A0A0A0A 0A0A0A0A 0A0A0A0A 0A0A0A0A 0A0A0A0A ................................ 0000C0
0A0A0A0A 0A0A0A0A 0A0A0A0A 0A0A0A0A 0A0A0A0A 0A0A0A0A 0A0A0A0A 0A0A0A0A ................................ 0000E0
0A0A0A0A 0A0A0A0A 0A0A0A0A 0A0A0A0A 0A0A0A0A 0A0A0A0A 0A0A0A0A 0A0A0A0A ................................ 000100
0A0A0A0A 0A0A0A0A 0A0A0A0A 0A0A0A0A 0A0A0A0A 0A0A0A0A 0A0A0A0A 0A0A0A0A ................................ 000120
0A0A0A0A 0A0A0A0A 0A0A0A0A 0A0A0A0A 0A0A0A0A 0A0A0A0A 0A0A0A0A 0A0A0A0A ................................ 000140
00000000 00000000 00000000 00000000 00000000 00000000 0000000A 0A0A0A0A ................................ 000160
FFFF0862 16620000 00000000 00000000 00000000 00002000 00000000 00000000 ......... ................b.b... 000180
66726576 6F206863 61747320 2D0A0D30 30303652 00003E3E 47534D4E 3C3CFFFF ..<<NMSG>>..R6000..- stack overf 0001A0
20656469 76696420 72656765 746E6920 2D0A0D33 30303652 0003000A 00776F6C low.....R6003..- integer divide  0001C0
61707320 6867756F 6E652074 6F6E2020 0A0D3830 30365200 08000A0D 30207962 by 0.....R6008..- not enough spa 0001E0
```

```
Dump of file SATURN:[PCCOMMON.DUMP.DLL]IFNDML.TMP;1 on 18-APR-1990 10:47:01.12
File ID (704,15,0)   End of file block 124 / Allocated 124

Virtual block number 124 (0000007C), 512 (0200) bytes

 6F6E202D 0A0D3930 30365200 09000A0D 73746E65 6D756772 6120726F 66206563 ce for arguments.....R6009..- no 000000
 0A0D746E 656D6E6F 7269766E 6520726F 66206563 61707320 6867756F 6E652074 t enough space for environment.. 000020
 0D323030 36520002 0020726F 72726520 656D6974 206E7572 00FF000A 0D00FC00 .*......run-time error ...R6002. 000040
 FF000A0D 64656461 6F6C2074 6F6E2074 6E696F70 20676E69 74616F6C 66202D0A .- floating point not loaded.... 000060
 010A0002 00000004 00FA0002 00000003 00000002 00000002 00480002 0017FFFF ......H.......A.......*.......O. 000080
 029E0002 00000008 027A0002 00000007 02500002 00000006 02020002 00000005 ..............P.......z......... 0000A0
 035E0002 0000000C 03340002 00000008 03100002 0000000A 02C20002 00000009 ......o...............4.......^. 0000C0
 03B80002 00000011 03A60002 00000010 038E0002 0000000E 03760002 0000000D ......v...............|.......i. 0000E0
 03F20002 00000015 02F20002 00000014 03D60002 00000013 03CA0002 00000012 ......o.......*.................. 000100
 00000000 00000019 1A600002 00000018 08720002 00000017 1CAC0002 00000016 ......-.......r.......'......... 000120
 00000000 00000000 00000000 00000000 00000000 00000000 00000000 00000000 ................................ 000140
 00000000 00000000 00000000 00000000 00000000 00000000 00000000 00000000 ................................ 000160
 00000000 00000000 00000000 00000000 00000000 00000000 00000000 00000000 ................................ 000180
 00000000 00000000 00000000 00000000 00000000 00000000 00000000 00000000 ................................ 0001A0
 00000000 00000000 00000000 00000000 00000000 00000000 00000000 00000000 ................................ 0001C0
 00000000 00000000 00000000 00000000 00000000 00000000 00000000 00000000 ................................ 0001E0

Dump of file SATURN:[PCCOMMON.DUMP.DLL]IMTAB.TMP;1 on 18-APR-1990 10:47:16.73
File ID (705,14,0)   End of file block 92 / Allocated 92

Virtual block number 1 (00000001), 512 (0200) bytes

 00000000 00000040 00000000 00000088 0000FFFF 00000004 00000059 014C5A4D MZL.Y...........|.......a....... 000000
 00000080 00000000 00000000 00000000 00000000 00000000 00000000 00000000 ................................ 000020
 6F6E6E61 63206D61 72676F72 70207369 685421CD 4C01B821 CD09B400 0EBA1F0E ..o..Ç.el|.LeIThis program canno 000040
 00000000 00000024 0A0D0D2E 65646F6D 20534F44 206E6920 6E757220 65622074 t be run in DOS mode....$....... 000060
 0005000E 00000000 00020000 00000400 00068009 184DF242 000704E6 0505454E NE..|...B M..................... 000080
 00000000 00000000 00010007 00040000 0000056D 000F0005 00CC0080 00400037 7.a.¯.a.f.Ô.m................... 0000A0
 00C40F00 00C308CC 4E040F00 4E0403CE 00110F00 001103C8 35EE0F00 35EE0058 [.Y5..Y5ü.......ö..N...Na.ü...á. 0000C0
 00CE1EF1 00CE0818 0E3F0E21 00000000 09500F21 21FA08E1 00480F00 0048080B Ü.H...H.Ä.*||.P|....!.?...ö.þ.ö. 0000E0
 005A1EF1 005A0854 00A01EF1 00A0084A 01181EF1 01180838 00F81EF1 00F80828 (.½.þ.½.8...þ...J...þ...T.Z.þ.Z. 000100
 00040005 00030005 00020005 00010005 00761EF1 00760866 00881EF1 0088085A Z.¡.þ.¡.f.v.þ.v................. 000120
 0003EA03 AF001000 07000100 00006261 74606905 000F0005 000E0005 00000005 .............imtab.........£.õ.. 000140
 494D544E 45525446 414D4144 13606164 03534C4C 4143534F 44084E49 57405005 .PMWIN.DOSCALLS.dam.DAMAFTRENTMI 000160
 41404144 13584946 4C4F5650 5845544E 45525446 41404144 13584946 4C4F564E NVOLFIX.DAMAFTRENTEXPVOLFIX.DAMA 000180
 49465359 454B544E 45525446 41404144 11584946 4C4F5658 4140544E 45525446 FTRENTMAXVOLFIX.DAMAFTRENTKEYSFI 0001A0
 4E453352 4F46424D 41441445 50595452 45505553 544E4552 5446414D 41441358 X.DAMAFTRENTSUPERTYPE.DAMBFOR3EN 0001C0
 1A584946 5952414D 49525059 454B5254 46414D41 44144550 59545245 50555354 TSUPERTYPE.DAMAFTRKEYPRIMARYFIX. 0001E0

Dump of file SATURN:[PCCOMMON.DUMP.DLL]IMTAB.TMP;1 on 18-APR-1990 10:47:16.73
File ID (705,14,0)   End of file block 92 / Allocated 92

Virtual block num·er 2 (00000002), 512 (0200) bytes

 46414D41 441F5849 46455441 4C45524E 55534149 4C414A42 4F525446 414D4144 DAMAFTROBJALIASUNRELATEFIX.DAMAF 000000
 46424D41 44125849 46455441 4C45524E 55524542 4D454D54 434A5254 54415254 TRATTRJCTMEMBERUNRELATEFIX.DAMBF 000020
 41440F50 4F4C5445 53503352 4F46424D 41440F45 4D414E54 43454A42 4F33524F OR3OBJECTNAME.DAMBFOR3PSETLOP.DA 000040
 124C4F56 4E494D54 45535052 5446414D 41441154 45535059 454B3352 4F46424D MBFOR3KEYPSET.DAMAFTRPSETMINVOL. 000060
 58455445 53505254 46414D41 44114C4F 56505845 54455350 33524F46 42404144 DAMBFOR3PSETEXPVOL.DAMAFTRPSETEX 000080
 4B33524F 46424D41 440F4C4F 5658414D 54455350 52544641 4D414411 4C4F5650 PVOL.DAMAFTRPSETMAXVOL.DAMBFOR3K 0000A0
 59454852 5446414D 41440E52 54544159 454B5254 46414D41 440E5254 54415945 EYATTR.DAMAFTRKEYATTR.DAMAFTRKEY 0000C0
 33524F46 42404144 11454352 554F5352 54544133 524F4642 4D414412 54455350 PSET.DAMBFOR3ATTRSOURCE.DAMBFOR3 0000E0
 4D414412 4C4F564E 494D5049 48535052 5446414D 41441253 4C4C554E 52545441 ATTRNULLS.DAMAFTRPSHIPMINVOL.DAM 000100
 5658414D 50494853 50525446 414D4144 124C4F56 50584550 49485350 52544641 AFTRPSHIPEXPVOL.DAMAFTRPSHIPMAXV 000120
 4C4E494D 4D4F4452 5446414D 41441352 5454414D 49445254 46414D41 440E4C4F OL.DAMAFTRDIMATTR.DAMAFTRDOMMINL 000140
 46424D41 44144854 474E454C 4E494D4D 4F443352 4F46424D 41441448 54474E45 ENGTH.DAMBFOR3DOMMINLENGTH.DAMBF 000160
 4E454C47 56414D4F 44525446 414D4144 13485447 4E454C47 5641404F 4433524F OR3DOMAVGLENGTH.DAMAFTRDOMAVGLEN 000180
 44525446 41404144 12485447 4E454C58 414D4D4F 44525446 414D4144 13485447 GTH.DAMAFTRDOMMAXLENGTH.DAMAFTRD 0001A0
 41441245 554C4156 4E494D4D 4F445254 46414D41 44124550 59544154 41444D4F OMDATATYPE.DAMAFTRDOMMINVALUE.DA 0001C0
 0F525454 41404F44 52544641 4D41440E 45554C41 5658414D 4D4F4452 5446414D MAFTRDOMMAXVALUE.DAMAFTRDOMATTR. 0001E0
```

```
Dump of file SATURN:[PCCOMMON.DUMP.DLL]INTAB.TMP;1 on 18-APR-1990 10:47:16.73
File ID (705,14,0)   End of file block 92 / Allocated 92

Virtual block number 3 (00000003), 512 (0200) bytes

 4F4D524F 4E544E45 33524F46 424D4144 11555452 47544E45 33524F46 424D4144 DAMBFOR3ENTGRTU.DAMBFOR3ENTNORMO 000000
 59454B33 524F4642 4D414414 4C564C4D 524F4E54 4E453352 4F46424D 4144124B K.DAMBFOR3ENTNORMLVL.DAMBFOR3KEY 000020
 46424D41 44144550 59545445 53503352 4F464240 41441052 4F544143 49444E49 INDICATOR.DAMBFOR3PSETTYPE.DAMBF 000040
 54415441 444D4F44 33524F46 424D4144 13454C42 41524F54 53525454 4133524F OR3ATTRSTORABLE.DAMBFOR3DOMDATAT 000060
 524F4642 4D414416 4544554C 43584542 41545641 33524F46 424D4144 14455059 YPE.DAMBFOR3AVTABEXCLUDE.DAMBFOR 000080
 58454E49 4D4A424F 33524F46 424D4144 144B4341 42444545 46415445 4D4D4933 3IMMETAFEEDBACK.DAMBFOR3OBJMINEX 0000A0
 4533524F 46424D41 44114C4F 5658414D 544E4533 524F4642 4D414411 4C4F5650 PVOL.DAMBFOR3ENTMAXVOL.DAMBFOR3E 0000C0
 424D4144 124C4F56 4E494D54 45535033 524F4642 4D414412 54435057 5247544E NTGRWPCT.DAMBFOR3PSETMINVOL.DAMB 0000E0
 52415053 5345434F 52504041 53154D41 53034C4F 5658414D 54455350 33524F46 FOR3PSETMAXVOL.SAM.SAMPROCESSPAR 000100
 54414449 4C415610 52464245 4D414E45 54414449 4C41560F 52455446 41544E45 ENTAFTER.VALIDATENAMEBFR.VALIDAT 000120
 5445534C 4D440C5  4F4C5354 494E494C 4D44086C 60640352 54464145 4D414E45 ENAMEAFTR.dml.DMLINITSLOT.DMLSET 000140
 6F6D204D 4920726  6620656C 6966204C 4C442100 00008803 04014E46 54494E49 INITFN.......IDLL file for IM mo 000160
 53594C41 4E414241 54595245 55510F00 0073656C 62617420 6174656D 206C6564 del meta tables...QUERYTABANALYS 000180
 28FE46C7 088EFFFF 881E5657 000002C8 00000000 00000000 00000000 00000154 T...............à...WV.j...ÁûF±( 0001A0
 006A006A 016A106A 036A21FA 681E08C4 83FFFF00 009A21FA 681E006A 07DE6800 .h8.j..h*!......á..h*!j.j.j.j.j. 0001C0
 024A681E 006A036A 046A026A 21FA681E 0000005A 9A000068 1E5016FE 4680006A j..F±.P.h...Z....h*!j.j.j.j..hJ. 0001E0

Dump of file SATURN:[PCCOMMON.DUMP.DLL]INTAB.TMP;1 on 18-APR-1990 10:47:16.73
File ID (705,14,0)   End of file block 92 / Allocated 92

Virtual block number 4 (00000004), 512 (0200) bytes

 4680006A 006A006A 016A026A 046A21FA 681E0000 00789A00 08681E50 16FE4680 .F±.P.h...x....h*!j.j.j.j.j.j..F 000000
 16FE4680 006A006A 006A016A 026A056A 21FA681E 00000096 9A000068 1E5016FE ±.P.h........h*!j.j.j.j.j.j..F±. 000020
 1E5016FE 4680006A 006A006A 016A026A 066A21FA 681E0000 00849A00 1C681E50 P.h...Ç....h*!j.j.j.j.j.j..F±.P. 000040
 3C681E50 16FE4680 006A006A 006A016A 026A076A 21FA681E 00000002 9A002C68 h,..@....h*!j.j.j.j.j.j..F±.P.h< 000060
 9A004868 1E5016FE 4680006A 006A006A 016A026A 086A21FA 681E0000 00F09A00 ..Þ....h*!j.j.j.j.j.j..F±.P.hK.. 000080
 012C9A00 5C681E50 16FE4680 006A006A 006A016A 026A096A 21FA681E 0000010E .....h*!j.j.j.j.j.j..F±.P.h\..,. 0000A0
 0000014A 9A007068 1E5016FE 4680006A 006A006A 016A026A 0A6A21FA 681E0000 ...h*!j.j.j.j.j.j..F±.P.hp..J... 0000C0
 681E0000 01689A00 82681E50 16FE4680 006A006A 006A016A 026A086A 21FA681E .h*!j.j.j.j.j.j..F±.P.h...h....h 0000E0
 21FA681E 00000186 9A009668 1E5016FE 4680006A 006A006A 016A026A 0C6A21FA *!j.j.j.j.j.j..F±.P.h........h*! 000100
 0E6A21FA 681E0000 01A49A00 AA681E50 16FE4680 006A006A 006A016A 026A006A j.j.j.j.j.j..F±.P.h¯..Ê....h*!j. 000120
 026A0F6A 21FA681E 000001C2 9A008768 1E5016FE 4680006A 006A006A 016A026A j.j.j.j.j..F±.P.hñ..ó....h*!j.j. 000140
 016A026A 106A21FA 681E0000 01E09A00 C5681E50 16FE4680 006A006A 006A016A j.j.j.j..F±.P.hé..Å....h*!j.j.j. 000160
 006A016A 026A116A 21FA681E 000001FE 9A000368 1E5016FE 4680006A 006A006A j.j.j..F±.P.h#..±....h*!j.j.j.j. 000180
 006A006A 046A296A 2C6A21FA 681E0000 021C9A00 E4681E50 16FE4680 006A006A j.j..F±.P.hô.......h*!j,j)j.j.j. 0001A0
 006A006A 006A056A 016A2E6A 21FA681E 0000023A 9A00F468 1E5016FE 4680006A j..F±.P.h¶..:....h*!j.j.j.j.j.j. 0001C0
 46800252 681E006A 026A106A 126A21FA 681E0000 02589A00 FC681E50 16FE4680 .F±.P.h=..X....h*!j.j.j.j..hR..F 0001E0

Dump of file SATURN:[PCCOMMON.DUMP.DLL]INTAB.TMP;1 on 18-APR-1990 10:47:16.73
File ID (705,14,0)   End of file block 92 / Allocated 92

Virtual block number 5 (00000005), 512 (0200) bytes

 16FE4680 028A681E 006A026A 106A136A 21FA681E 00000276 9A010968 1E5016FE ±.P.h...v....h*!j.j.j.j..h...F±. 000000
 1E5016FE 4680006A 006A006A 026A106A 146A21FA 681E0000 02949A01 11681E50 P.h........h*!j.j.j.j.j.j..F±.P. 000020
 27681E50 16FE4680 0292681E 006A026A 106A156A 21FA681E 000002B2 9A011B68 h...ý....h*!j.j.j.j..h...F±.P.h' 000040
 9A013268 1E5016FE 4680029A 681E006A 026A106A 166A21FA 681E0000 02D09A01 ..Å....h*!j.j.j.j..h...F±.P.h2.. 000060
 030C9A01 3A681E50 16FE4680 02A2681E 006A026A 106A176A 21FA681E 000002EE Ÿ....h*!j.j.j.j..hÅ..F±.P.h:.... 000080
 0000032A 9A014568 1E5016FE 468002AA 681E006A 026A106A 186A21FA 681E0000 ...h*!j.j.j.j..hˆ..F±.P.hE..*... 0000A0
 681E0000 03489A01 4D681E50 16FE4680 02B2681E 006A026A 106A196A 21FA681E .h*!j.j.j.j..hý..F±.P.hM..H....h 0000C0
 21FA681E 00000366 9A015768 1E5016FE 468002BA 681E006A 026A106A 1A6A21FA *!j.j.j.j..ho..F±.P.hW..f....h*! 0000E0
 286A21FA 681E0000 FFFF9A01 60681E50 16FE4680 02C2681E 006A026A 106A186A j.j.j.j..hò..F±.P.h'.......h*!j+ 000100
 106A286A 21FA681E 000003A2 9A016868 1E5016FE 468002E2 681E006A 026A106A j.j.j..hâ..F±.P.hk..Å....h*!j(j. 000120
 026A106A 2A6A21FA 681E0000 03C09A01 75681E50 16FE4680 006A006A 006A026A j.j.j.j..F±.P.hu..à....h*!j*j.j. 000140
 006A026A 106A296A 21FA681E 000003DE 9A018368 1E5016FE 4680006A 006A006A j.j.j..F±.P.h...8....h*!j)j.j.j. 000160
 006A006A 026A106A 1C6A21FA 681E0000 03FC9A01 91681E50 16FE4680 006A006A j.j..F±.P.h...=....h*!j.j.j.j.j. 000180
 02CA681E 006A026A 106A1F6A 21FA681E 0000041A 9A019E68 1E5016FE 46..006A j..F±.P.h........h*!j.j.j.j..hò. 0001A0
 4680006A 006A006A 036A046A 1D6A21FA 681E0000 04389A01 A9681E50 16FE.68D .F±.P.h`..8....h*!j.j.j.j.j.j..F 0001C0
 16FE4680 006A006A 006A016A 026A1E6A 21FA681E 00000456 9A01B468 1E50..FE ±.P.hÇ..V....h*!j.j.j.j.j.j..F±. 0001E0
```

Dump of file SATURN:[PCCOMMON.DUMP.DLL]INTAB.TMP;1 on 18-APR-1990 10:47:16.73
File ID (705,14,0)   End of file block 92 / Allocated 92

Virtual block number 6 (00000006), 512 (0200) bytes

```
1E5016FE 46800202 681E006A 026A106A 206A21FA 681E0000 04749A01 88681E50 P.hE..t....h°|j j.j.j..h@..F±.P. 000000
CF681E50 16FE468D 0262681E 006A026A 106A216A 21FA681E 00000492 9A01C368 hú_.......h°|j!j.j.j..hb..F±.P.hü 000020
9A010768 1E501.FE 468D026A 681E006A 026A106A 226A21FA 681E0000 04809A01 ..¯....h°|j"j.j.j..hj..F±.P.h■.. 000040
04EC9A01 00681E50 16FE468D 006A006A 006A046A 096A246A 21FA681E 000004CE ö....h°|j$j.j.j.j.j..F±.P.hl..Î. 000060
0000050A 9A01E768 1E5016FE 468D006A 006A006A 016A046A 256A21FA 681E0000 ...h°|j%j.j.j.j.j..F±.P.hÒ...... 000080
681E0000 05289A01 F2681E50 16FE468D 020A681E 006A026A 106A236A 21FA681E .h°|j#j.j.j..hÖ..F±.P.h·..(....h 0000A0
21FA681E 00000546 9A01FB68 1E5016FE 468D006A 006A006A 026A106A 266A21FA °|j&j.j.j.j.j..F±.P.h«..F....h°| 0000C0
2C6A21FA 681E0000 05649A02 00681E50 16FE468D 006A006A 006A036A 046A276A j'j.j.j.j.j..F±.P.h...d....h°|j, 0000E0
046A206A 21FA681E 00000582 9A020C68 1E5016FE 468D006A 006A006A 046A296A j)j.j.j.j..F±.P.h........h°|j-j. 000100
046A4C6A 2F6A21FA 681E0000 05A09A02 14681E50 16FE468D 02EA681E 006A036A j.j..hõ..F±.P.h........h°|j/jLj. 000120
006A036A 046A306A 21FA681E 000005BE 9A021C68 1E5016FE 468D006A 006A006A j.j.j..F±.P.h.../....h°|j0j.j.j. 000140
681E006A 026A106A 316A21FA 681E0000 003C9A02 21681E50 16FE468D 006A006A j.j..F±.P.h!..<....h°|j1j.j.j..h 000160
02FA681E 006A026A 106A326A 21FA681E 000005FA 9A022968 1E5016FE 468D02F2 ·..F±.P.h)..°....h°|j2j.j.j..h°. 000180
468D0302 681E006A 026A106A 336A21FA 681E0000 06189A02 32681E50 16FE468D .F±.P.h2.......h°|j3j.j.j..h...F 0001A0
16FE468D 006A006A 006A016A 026A346A 21FA681E 00000636 9A023A68 1E5016FE ±.P.h:..6....h°|j4j.j.j.j.j..F±. 0001C0
340847C7 26065EC4 065F8C26 04478926 21FA8806 5EC40000 03849A02 43681E50 P.hC......á^.¡°|&.G.&._.á^.&úG.4 0001E0
```

Dump of file SATURN:[PCCOMMON.DUMP.DLL]INTAB.TMP;1 on 18-APR-1990 10:47:16.73
File ID (705,14,0)   End of file block 92 / Allocated 92

Virtual block number 7 (00000007), 512 (0200) bytes

```
0282B800 001847C7 26065EC4 002F1047 C726065E C40A4789 26FE4688 065EC400 .á^..F±&.G.á^.&úG./.á^.&úG...¡.. 000000
C9680000 36FF2621 F2068E00 6A006A28 FC1E8C28 FAA3027A 8828D61E 8C28D4A3 É&(..ø(¡z.É°(..ø(j.j...·I&.6..hè 000020
881E5657 000002C8 CBC95F5E 1F0000FF FF9A5052 001A0508 56880646 88136A00 .j..F..V....RP......^_èùà...WV.¡ 000040
026A29D8 681E08C4 83001D00 009A29D8 681E006A 01EE6800 28FE46C7 D88E0008 ...ÄúF±(.hY.j..hÁ)......á..hÄ)j. 000060
106A036A 29D8681E 00000702 9A030A68 1E5016FE 468D006A 006A006A 046A4C6A jLj.j.j.j..F±.P.h........hÁ)j.j. 000080
036A046A 046A29D8 681E0000 07209A03 0F681E50 16FE468D 006A006A 006A016A j.j.j.j..F±.P.h... ....hÁ)j.j.j. 0000A0
006A036A 046A056A 29D8681E 0000073E 9A031768 1E5016FE 468D024A 681E006A j..hJ..F±.P.h...>....hÁ)j.j.j.j. 0000C0
681E026A 036A046A 066A29D8 681E0000 075C9A03 1C681E50 16FE468D 0366681E .hf..F±.P.h...\....hÁ)j.j.j.j..h 0000E0
0252681E 006A026A 106A076A 29D8681E 0000077A 9A032668 1E5016FE 468D036E n..F±.P.h&..z....hÁ)j.j.j.j..hR. 000100
468D0376 681E006A 026A106A 086A29D8 681E0000 07989A03 29681E50 16FE468D .F±.P.h).......hÁ)j.j.j.j..hv..F 000120
16FE468D 037E681E 006A026A 106A096A 29D8681E 00000786 9A033168 1E5016FE ±.P.h1..Ñ....hÁ)j.j.j.j..h~..F±. 000140
1E5016FE 468D0262 681E006A 026A106A 0A6A29D8 681E0000 07D49A03 37681E50 P.h7..å....hÁ)j.j.j.j..hb..F±.P. 000160
47681E50 16FE468D 026A681E 006A026A 106A086A 29D8681E 000007F2 9A033F68 h?..·....hÁ)j.j.j.j..hj..F±.P.hG 000180
9A034D68 1E5016FE 468D025A 681E006A 026A106A 0C6A29D8 681E0000 08109A03 .......hÁ)j.j.j.j..hZ..F±.P.hM.. 0001A0
4688065E C4000C08 47C72606 5EC4065F 8C260447 89262908 88065EC4 000005DC É...á^.¡Á)&.G.&._.á^.&úG...á^..F 0001C0
00021047 C726065E C400060E 47C72606 5EC40016 0C47C726 065EC40A 478926FE ±&.G.á^.&úG...á^.&úG...á^.&úG... 0001E0
```

Dump of file SATURN:[PCCOMMON.DUMP.DLL]INTAB.TMP;1 on 18-APR-1990 10:47:16.73
File ID (705,14,0)   End of file block 92 / Allocated 92

Virtual block number 8 (00000008), 512 (0200) bytes

```
0036FF26 21F2068E 00'A006A 2B141E8C 2B12A303 5E8B2A2C 1E8C2A2A A3035688 ¡V.È**..,*¡^.È.+...+j.j....·I&.6. 000000
57000002 C8C8C95F 5E1F0000 069F9A50 52001A05 08568806 4688136A 0C¯°6800 .hö_j..F..V....RP......^_èùà...W 000020
C6681E08 C48306C5 00009A28 C6681E00 6A04C068 0028FE46 C7D88E06 808.`E56 V.¡¯..ÄúF±(.hâ.j..hó+...Ë..á..hó 000040
6A28C668 1E000008 E59A0386 681E5016 FE468D00 6A006A00 6A046A4C 6A02.\28 +j.jLj.j.j.j..F±.P.h...Í....hó+j 000060
6A046A28 C6681E00 0009039A 038B681E 5016FE46 8D006A00 6A006A01 6A046A03 .j.j.j.j.j..F±.P.h........hó+j.j 000080
6A046A05 6A2BC668 1E000009 219A0392 681E5016 FE468D00 6A006A00 6A016A04 .j.j.j.j..F±.P.h...I....hó+j.j.j 0000A0
6A016A02 6A066A2B C6681E00 00093F9A 0399681E 5016FE46 8D006A00 6A006A01 .j.j.j..F±.P.h...?....hó+j.j.j.j 0000C0
6A006A05 6A016A07 6A2BC668 1E000009 5D9A03A0 681E5016 FE468D00 6A006A00 .j.j..F±.P.h...]....hó+j.j.j.j.j 0000E0
6A006A00 6A056A01 6A086A2B C6681E00 00097B9A 03A7681E 5016FE46 8D006A00 .j..F±.P.hl..(....hó+j.j.j.j.j.j 000100
8D006A00 6A006A05 6A016A09 6A2BC668 1E000009 999A03AC 681E5016 FE468D00 ..F±.P.h¯.......hó+j.j.j.j.j.j.. 000120
FE468D00 6A006A00 6A016A10 6A0A6A2B C6681E00 0009B79A 03B4681E 5016FE46 F±.P.hÇ..ñ....hó+j.j.j.j.j.j..F± 000140
5016FE46 8D006A00 6A006A01 6A046A0B 6A2BC668 1E000009 D59A03B8 681E5016 .P.hE..í....hó+j.j.j.j.j.j..F±.P 000160
681E5016 FE468D00 6A006A00 6A016A04 6A0C6A2B C6681E00 0009F39A 03C3681E .hû..µ....hó+j.j.j.j.j.j..F±.P.h 000180
03D6681E 5016FE46 8D006A00 6A006A01 6A106A00 6A2BC668 1E000006 E49A03CE ö..ð....hó+j.j.j.j.j.j..F±.P.hø. 0001A0
4D9A03DE 681E5016 FE468D02 4A681E00 6A036A04 6A0E6A2B C6681E00 000A2F9A ./....hó+j.j.j.j..hJ..F±.P.hB..M 0001C0
000A6B9A 03E3681E 5016FE46 8D046668 1E006A03 6A046A0F 6A2BC668 1E00000A ....hó+j.j.j.j..hf..F±.P.hD..k.. 0001E0
```

```
Dump of file SATURN:[PCCOMMON.DUMP.DLL]IMTAB.TMP;1 on 18-APR-1990 10:47:16.73
File ID (705,14,0)   End of file block 92 / Allocated 92

Virtual block number 9 (00000009), 512 (0200) bytes

 1E00000A 899A03ED 681E5016 FE468D04 6E681E02 6A036A04 6A106A28 C6681E00 ..hó+j.j.j.j..hn..F±.P.hÚ....... 000000
 C6681E00 000AA79A 03F0681E 5016FE46 8D025268 1E006A02 6A106A11 6A28C668 hó+j.j.j.j..hR..F±.P.hÞ..Ï....hó 000020
 6A28C668 1E00000A C59A03F8 681E5016 FE468D04 76681E00 6A026A10 6A126A28 +j.j.j.j..hv..F±.P.h½..é....hó+j 000040
 6A146A28 C6681E00 000AE39A 03FE681E 5016FE46 8D047E68 1E006A02 6A106A13 .j.j.j..h~..F±.P.h±..Ð....hó+j.j 000060
 6A106A15 6A28C668 1E000008 019A0403 681E5016 FE468D04 86681E00 6A026A10 .j.j..h...F±.P.h........hó+j.j.j 000080
 6A026A10 6A106A28 C6681E00 00081F9A 040C681E 5016FE46 8D048E68 1E006A02 .j..h...F±.P.h........hó+j.j.j.j 0000A0
 1E006A02 6A106A17 6A28C668 1E000008 309A0412 681E5016 FE468D04 9E681E00 ..h...F±.P.h...=....hó+j.j.j.j.. 0000C0
 6A681E00 6A026A10 6A186A28 C6681E00 00085B9A 0418681E 5016FE46 8D026268 hb..F±.P.h...[....hó+j.j.j.j..hj 0000E0
 8D025A68 1E006A02 6A106A16 6A28C668 1E000008 799A0423 681E5016 FE468D02 ..F±.P.h#..y....hó+j.j.j.j..hZ.. 000100
 FE468D02 72681E00 6A026A10 6A196A28 C6681E00 0008979A 0429681E 5016FE46 F±.P.h).......hó+j.j.j.j..hr..F± 000120
 5016FE46 8D006A00 6A006A02 6A106A1A 6A28C668 1E000008 859A0432 681E5016 .P.h2..ç....hó+j.j.j.j.j.j..F±.P 000140
 681E5016 FE468D00 6A006A00 6A026A10 6A186A28 C6681E00 0008039A 043A681E .h:..£....hó+j.j.j.j.j.j..F±.P.h 000160
 044D681E 5016FE46 8D006A00 6A006A02 6A106A1C 6A28C668 1E000008 F19A0442 B..þ....hó+j.j.j.j.j.j..F±.P.hM. 000180
 209A0459 681E5016 FE468D04 A6681E00 6A026A10 6A1E6A28 C6681E00 000C0F9A ......hó+j.j.j.j..hÏ..F±.P.hY..- 0001A0
 0008C79A 045F681E 5016FE46 8D04AE68 1E006A02 6A106A1F 6A28C668 1E00000C ....hó+j.j.j.j..hÚ..F±.P.h_..ú.. 0001C0
 8926FE46 8B065EC4 001F0847 C726065E C4065F8C 26044789 2628C688 065EC400 .á^.¡ó+&.G.&._.á^.&úG...á^..F±&. 0001E0

Dump of file SATURN:[PCCOMMON.DUMP.DLL]IMTAB.TMP;1 on 18-APR-1990 10:47:16.73
File ID (705,14,0)   End of file block 92 / Allocated 92

Virtual block number 10 (0000000A), 512 (0200) bytes

 065EC400 021047C7 26065EC4 00100E47 C726065E C400180C 47C72606 5EC40A47 G.á^.&úG...á^.&úG...á^.&úG...á^. 000000
 6A00CA68 000036FF 2621F206 8E006A00 6A00011B 47C72606 5EC40016 1647C726 &úG...á^.&úG...j.j....1&.6..hò.j 000020
 42A304DE 882C1A1E 8C2C18A3 04868800 0008829A 5052001A 05085688 06468813 ..F..V....RP.....¡Ñ.È.,....,¡8.ÈB 000040
 8C2EA2A3 04FE882C 6A1E8C2C 68A304EE 882C901E 8C2C8EA3 04E6882C 441E8C2C ,..D,¡l.È.,...,¡Ÿ.Èh,..j,¡±.ÈÀ.. 000060
 081E8C2E 06A304C6 882E081E 8C2E06A3 04C6882E 581E8C2E 56A304F6 882EA41E .È.¡-.ÈV...X.¡ó.È......¡ó.È..... 000080
 882CD81E 8C2CD6A3 0516882E 0C1E8C2E 0AA3048E 882E0C1E 8C2E0AA3 048E882E .¡/.È......¡/.È......¡..È#,..Ä,¡ 0000A0
 881E5657 000002C8 C8C95F5E 1F2CFE1E 8C2CFCA3 0506882D 241E8C2D 22A3051E ..È"-..$-¡..È=,..±,.^_èùà...WV.¡ 0000C0
 016A3086 681E08C4 8308A800 009A3086 681E006A 01566800 28FE46C7 088E0893 ...ÁúF±(.hV.j..h.0...¯..á..h.0j. 0000E0
 046A026A 3086681E 00000082 9A052668 1E5016FE 468D006A 006A006A 046A4C6A jLj.j.j.j..F±.P.h&.......h.0j.j. 000100
 036A046A 036A3086 681E0000 00A09A05 28681E50 16FE468D 056E681E 006A036A j.j..hn..F±.P.h+.......h.0j.j.j. 000120
 006A026A 106A046A 3086681E 0000008E 9A053268 1E5016FE 468D0576 681E006A j..hv..F±.P.h2../....h.0j.j.j.j. 000140
 006A006A 026A106A 056A3086 681E0000 000C9A05 36681E50 16FE468D 006A006A j.j..F±.P.h6..É....h.0j.j.j.j.j. 000160
 006A006A 006A026A 106A066A 3086681E 000000FA 9A054268 1E5016FE 468D006A j..F±.P.hB..ª....h.0j.j.j.j.j.j. 000180
 468D006A 006A006A 016A046A 076A3086 681E0000 0A119A05 4E681E50 16FE468D .F±.P.hN.......h.0j.j.j.j.j.j..F 0001A0
 16FE468D 006A006A 006A016A 046A086A 3086681E 00000E36 9A055A68 1E5016FE ±.P.hZ..6....h.0j.j.j.j.j.j..F±. 0001C0
 080847C7 26065EC4 065F8C26 04478926 30868806 5EC40000 0D649A05 65681E50 P.he..d...á^.¡.0&.G.&._.á^.&úG.. 0001E0

Dump of file SATURN:[PCCOMMON.DUMP.DLL]IMTAB.TMP;1 on 18-APR-1990 10:47:16.73
File ID (705,14,0)   End of file block 92 / Allocated 92

Virtual block number 11 (0000000B), 512 (0200) bytes

 0036FF26 21F2068E 006A006A 00001847 C726065E C40A4789 26FE468B 065EC400 .á^..F±&.G.á^.&úG...j.j....1&.6. 000000
 57000002 C8C8C95F 5E1F0000 0C9D9A50 52001A05 08568806 4688136A 00DF6800 .hÖ.j..F..V....RP......^_èùà...W 000020
 DC681E08 C4830045 00009A31 DC681E00 6A015668 0028FE46 C7D88E00 30881E56 V.¡O..ÁúF±(.hV.j..hÉ1...Ë..á..hÉ 000040
 6A31DC68 1E00000E E59A057E 681E5016 FE468D00 6A006A00 6A046A4C 6A016A31 1j.jLj.j.j.j..F±.P.h~..Í....hÉ1j 000060
 6A036A31 DC681E00 000F039A 0583681E 5016FE46 8D058C68 1E006A03 6A046A02 .j.j.j..h¥..F±.P.h........hÉ1j.j 000080
 6A106A04 6A31DC68 1E00000F 219A0588 681E5016 FE468D05 C4681E00 6A036A04 .j.j..há..F±.P.h...!....hÉ1j.j.j 0000A0
 6A026A10 6A056A31 DC681E00 000F3F9A 058C681E 5016FE46 8D006A00 6A006A02 .j.j.j..F±.P.h...?....hÉ1j.j.j.j 0000C0
 6A006A02 6A106A06 6A31DC68 1E00000F 5D9A0595 681E5016 FE468D00 6A006A00 .j.j..F±.P.h...]....hÉ1j.j.j.j.j 0000E0
 6A006A00 6A016A04 6A076A31 DC681E00 000F789A 059E681E 5016FE46 8D006A00 .j..F±.P.h...(....hÉ1j.j.j.j.j.j 000100
 8D006A00 6A006A01 6A046A08 6A31DC68 1E00000F 999A05A7 681E5016 FE468D00 ..F±.P.hÏ.......hÉ1j.j.j.j.j.j.. 000120
 C726065E C4065F8C 26044789 2631DCB8 065EC400 000E189A 0582681E 5016FE46 F±.P.hý......á^.¡É1&.G.&._.á^.&ú 000140
 2621F206 8E006A00 6A000018 47C72606 5EC40A47 8926FE46 88065EC4 00080847 G...á^..F±&.G.á^.&úG...j.j....1& 000160
 02C8CBC9 5F5E1F00 000E829A 5052001A 05085688 06468813 6A00E068 000036FF .6..hÁ.j..F..V....RP......^_èùà. 000180
 08C4830E A800009A 3332681E 006A04C0 680028FE 46C7D88E 0E93881E 56570000 ..WV.¡...ÁúF±(.hà.j..h23...¯..á. 0001A0
 681E0000 10489A05 CC681E50 16FE468D 006A006A 006A046A 4C6A026A 3332681E .h23j.jLj.j.j.j..F±.P.hä..H....h 0001C0
 3332681E 00001066 9A05D168 1E5016FE 468D006A 006A006A 056A016A 036A3332 23j.j.j.j.j.j..F±.P.hi..f....h23 0001E0
```

```
Dump of file SATURN:[PCCOMMON.DUMP.DLL]INTAB.TMP;1 on 18-APR-1990 10:47:16.73
File ID (705,14,0)   End of file block,92 / Allocated 92

Virtual block number 12 (0000000C), 512 (0200) bytes

 056A3332 681E0000 10849A05 D7681E50 16FE468D 006A006A 006A056A 016A046A j.j.j.j.j..F±.P.h®.......h23j. 000000
 296A066A 3332681E 000010A2 9A05DE68 1E5016FE 4680006A 006A006A 056A016A j.j.j.j..F±.P.h®..Á....h23j.j) 000020
 016A106A 076A3332 6b1E0000 10C09A05 E7681E50 16FE468D 006A006A 006A046A j.j.j.j..F±.P.hÖ..á....h23j.j.j. 000040
 006A026A 106A086A 3332681E 0000100E 9A05F268 1E5016FE 4680006A C.'4006A j.j.j..F±.P.h·..®....h23j.j.j.j. 000060
 681E026A 026A106A 096A3332 681E0000 10FC9A05 FA681E50 16FE468D 066 581E .hÑ..F±.P.h¹..=....h23j.j.j.j..h 000080
 06C6681E 026A036A 046A0A6A 3332681E 0000111A 9A060568 1E5016FE 4680'68E /..F±.P.h........h23j.j.j.j..h6. 0000A0
 468D070A 681E006A 036A046A 1E6A3332 681E0000 11389A06 10681E50 16FE468D .F±.P.h...8....h23j.j.j.j..h...F 0000C0
 16FE468D 0602681E 006A036A 046A086A 3332681E 00001156 9A061668 1E5016FE ±.P.h...V....h23j.j.j.j..h®..F±. 0000E0
 1E5016FE 468006DA 681E006A 036A046A 0C6A3332 681E0000 11749A06 1F681E50 P.h...t....h23j.j.j.j..hÖ..F±.P. 000100
 2A681E50 16FE468D 024A681E 006A036A 046A006A 3332681E 00001192 9A062368 h#.......h23j.j.j.j..hJ..F±.P.h* 000120
 9A062F68 1E5016FE 468006E2 681E006A 026A046A 0E6A3332 681E0000 11B09A06 ..¯....h23j.j.j.j..hã..F±.P.h/.. 000140
 11EC9A06 35681E50 16FE468D 006A006A 006A026A 106A0F6A 3332681E 000011CE ö....h23j.j.j.j.j.j..F±.P.h5..&. 000160
 0000120A 9A063F68 1E5016FE 468D0252 681E006A 026A106A 106A3332 681E0000 ...h23j.j.j.j..hR..F±.P.h?...... 000180
 681E0000 12289A06 47681E50 16FE468D 06EA681E 006A026A 106A116A 3332681E .h23j.j.j.j..hõ..F±.P.hG..(....h 0001A0
 3332681E 00001246 9A064C68 1E5016FE 4680025A 681E006A 026A106A 126A3332 23j.j.j.j..hZ..F±.P.hL..F....h23 0001C0
 146A3332 681E0000 12649A06 55681E50 16FE468D 06F2681E 006A036A 046A136A j.j.j.j..h·..F±.P.hU..d....h23j. 0001E0

Dump of file SATURN:[PCCOMMON.DUMP.DLL]INTAB.TMP;1 on 18-APR-1990 10:47:16.73
File ID (705,14,0)   End of file block 92 / Allocated 92

Virtual block number 13 (0000000D), 512 (0200) bytes

 026A156A 3332681E 00001282 9A065868 1E5016FE 4680006A 006A006A 016A026A j.j.j.j.j..F±.P.hX.......h23j.j. 000000
 026A106A 166A3332 681E0000 12A09A06 5F681E50 16FE468D 006A006A 006A016A j.j.j.j..F±.P.h_.......h23j.j.j. 000020
 006A026A 106A176A 3332681E 000012BE 9A066868 1E5016FE 46800262 681E006A j..hb..F±.P.hh..¯/....h23j.j.j.j. 000040
 681E006A 036A046A 186A3332 681E0000 0EC79A06 70681E50 16FE468D 026A681E .hj..F±.P.hp..ú....h23j.j.j.j..h 000060
 006A006A 006A016A 026A196A 3332681E 000012FA 9A067668 1E5016FE 46800272 r..F±.P.hv..°....h23j.j.j.j.j. 000080
 468006FA 681E006A 026A106A 1A6A3332 681E0000 13189A06 80681E50 16FE468D .F±.P.h........h23j.j.j.j..h°..F 0000A0
 16FE468D 006A006A 006A026A 106A186A 3332681E 00001336 9A068568 1E5016FE ±.P.h...6....h23j.j.j.j.j.j..F±. 0000C0
 1E5016FE 4680006A 006A006A 026A106A 1C6A3332 681E0000 13549A06 8F681E50 P.h...T....h23j.j.j.j.j.j..F±.P. 0000E0
 A2681E50 16FE468D 006A006A 006A026A 106A106A 3332681E 00001372 9A069768 h...r....h23j.j.j.j.j.j..F±.P.hÅ 000100
 9A06AE68 1E5016FE 46800712 681E006A 026A106A 1F6A3332 681E0000 13909A06 .......h23j.j.j.j..h...F±.P.hÚ.. 000120
 468B065E C4001F08 47C72606 5EC4065F 8C260447 89263332 B8065EC4 0000102A *...á^.¡23&.G.&._.á^.&úG...á^..F 000140
 00021047 C726065E C400130E 47C72606 5EC4001A 0C47C726 065EC40A 478926FE ±&.G.á^.&úG...á^.&úG...á^.&úG... 000160
 68000036 FF2621F2 068E006A 006A0001 1847C726 065EC400 121647C7 26065EC4 á^.&úG...á^.&úG...j.j....!&.6..h 000180
 22883386 1E8C3384 A3071A88 00000FE5 9A505200 1A050856 88064688 136A00CD è.j..F..V....RP.|....|..É.3...3¡" 0001A0
 C95F5E1F 33F81E8C 33F6A307 32883302 1E8C3300 A3072A88 33AC1E8C 33AAA307 .É¯3..¯3¡*.ÉÀ3..ø3¡2.É-3..¾3.^_è 0001C0
 10080000 9A37F268 1E006A00 8E680028 FE46C7D8 8E0FF688 1E565700 0002C8C8 ùà...WV.¡-..ÁúF±(.h/.j..h·7...... 0001E0

Dump of file SATURN:[PCCOMMON.DUMP.DLL]INTAB.TMP;1 on 18-APR-1990 10:47:16.73
File ID (705,14,0)   End of file block 92 / Allocated 92

Virtual block number 14 (0000000E), 512 (0200) bytes

 0014889A 073A681E 5016FE46 80006A00 6A006A01 6A026A02 6A37F268 1E08C483 .á..h·7j.j.j.j.j.j..F±.P.h:..... 000000
 1E000014 A99A0741 681E5016 FE468007 4E681E02 6A036A04 6A036A37 F2681E00 ..h·7j.j.j.j..hN..F±.P.hA..`.... 000020
 065EC400 0012DC9A 0747681E 5016FE46 80075668 1E006A03 6A046A04 6A37F268 h·7j.j.j.j..hV..F±.P.hG..É...á^. 000040
 5EC40A47 8926FE46 88065EC4 00040847 C726065E C4065F8C 26044789 2637F288 ¡·7&.G.&.._.á^.&úG...á^..F±&.G.á^ 000060
 05085688 06468813 6A000668 000036FF 2621F206 8E006A00 6A000018 47C72606 .&úG...j.j.....!&.6..h®.j..F..V.. 000080
 881E5657 000002C8 CBC95F5E 1F38961E 8C3894A3 075E8800 0014009A 5052001A ..RP.....|^.É.8...8.^ èùà...WV.| 0000A0
 026A3880 681E08C4 83144E00 009A3880 681E006A 04026800 28FE46C7 088E1439 9..ÁúF±(.h..j..h¯8...Ñ...á..h¯8j. 0000C0
 046A036A 3880681E 00001562 9A076668 1E5016FE 4680006A 006A006A 046A4C6A jLj.j.j.j..F±.P.hf..b....h¯8j.j. 0000E0
 036A046A 046A3880 681E0000 15809A07 68681E50 16FE468D 081E681E 026A036A j.j..h...F±.P.hk........h¯8j.j.j. 000100
 006A036A 046A056A 3880681E 0000159E 9A077168 1E5016FE 46800826 681E026A j..h&..F±.P.hq.......h¯8j.j.j.j. 000120
 006A006A 016A026A 066A3880 681E0000 15BC9A07 77681E50 16FE468D 0832681E .h2..F±.P.hw..¼....h¯8j.j.j.j.j. 000140
 083A681E 006A036A 046A076A 3880681E 000015DA 9A078268 1E5016FE 4680006A j..F±.P.h...Ó....h¯8j.j.j.j..h:. 000160
 46800272 681E006A 026A106A 086A3880 681E0000 15F89A07 86681E50 16FE468D .F±.P.h...½....h¯8j.j.j.j..hr..F 000180
 16FE468D 006A004A 006A056A 016A096A 3880681E 00001616 9A078C68 1E5016FE ±.P.h........h¯8j.j.j.j.j.j..F±. 0001A0
 1E5016FE 468000 \ 006A006A 016A046A 0A6A3880 681E0000 16349A07 96681E50 P.h...4....h¯8j.j.j.j.j.j..F±.P. 0001C0
 A6681E50 16FE468D 006A006A 006A016A 046A086A 3880681E 00001652 9A079F68 h...R....h¯8j.j.j.j.j.j..F±.P.hÌ 0001E0
```

Dump of file SATURN:[PCCOMMON.DUMP.DLL]IMTAB.TMP;1 on 18-APR-1990 10:47:16.73
File ID (705,14,0)   End of file block 92 / Allocated 92

Virtual block number 15 (0000000F), 512 (0200) bytes

```
9A07AD68 1E5016FE 468D006A 006A006A 016A046A 0C6A3880 681E0000 16709A07 ..p....h¯8j.j.j.j.j.j..Fz.P.hÙ.. 000000
16AC9A07 B468:E50 16FE468D 006A006A 006A016A 086A0D6A 3880681E 0000168E .....h¯8j.j.j.j.j.j..Fz.P.hÇ..¨. 000020
000016CA 9A07BD68 1E5016FE 468D006A 006A006A 016A086A 0E6A3880 681E0000 ...h¯8j.j.j.j.j.j..Fz.P.h§..ò... 000040
681E0000 14609A07 C6681E50 16FE468D 006A006A 006A016A 026A0F6A 3880681E .h¯8j.j.j.j.j.j..Fz.P.hó..m....h 000060
3880681E 00001706 9A07CC68 1E5016FE 468D006A 006A006A 016A026A 106A3880 ¯8j.j.j.j.j.j..Fz.P.hä.......h¯8 000080
126A3880 681E0000 17249A07 D6681E50 16FE468D 006A006A 006A016A 106A116A j.j.j.j.j.j..Fz.P.hø..$....h¯8j. 0000A0
106A136A 3880681E 00001742 9A07DE68 1E5016FE 468D0252 681E006A 026A106A j.j.j..hR..Fz.P.h8..B....h¯8j.j. 0000C0
026A106A 146A3880 681E0000 17609A07 E6681E50 16FE468D 0842681E 006A026A j.j..hB..Fz.P.hl..`....h¯8j.j.j. 0000E0
006A026A 106A156A 3880681E 0000177E 9A07F168 1E5016FE 4680084A 681E006A j..hJ..Fz.P.hþ..~....h¯8j.j.j.j. 000100
681E006A 036A046A 166A3880 681E0000 179C9A07 F7681E50 16FE4680 025A681E .hZ..Fz.P.h%.......h¯8j.j.j.j..h 000120
0852681E 006A036A 046A176A 3880681E 000017BA 9A080068 1E5016FE 4680024A J..Fz.P.h...¤....h¯8j.j.j.j..hR. 000140
46800262 681E006A 026A106A 186A3880 681E0000 17D89A08 05681E50 16FE4680 .Fz.P.h...A....h¯8j.j.j.j..hb..F 000160
16FE4680 026A681E 006A026A 106A196A 3880681E 000017F6 9A080868 1E5016FE z.P.h...-....h¯8j.j.j.j..hj..Fz. 000180
1E5016FE 46800272 681E006A 036A046A 1A6A3880 681E0000 18149A08 10681E50 P.h........h¯8j.j.j.j..hr..Fz.P. 0001A0
C4001A08 47C72606 5EC4065F 8C260447 89263880 88065EC4 00001544 9A081668 h...D...á^.¡¯8&.G.&._.á^.&úG...á 0001C0
C726065E C400170E 47C72606 5EC40017 0C47C726 065EC40A 478926FE 4688065E ^..Fz&.G.á^.&úG...á^¯&úG...á^.&ú 0001E0
```

Dump of file SATURN:[PCCOMMON.DUMP.DLL]IMTAB.TMP;1 on 18-APR-1990 10:47:16.73
File ID (705,14,0)   End of file block 92 / Allocated 92

Virtual block number 16 (00000010), 512 (0200) bytes

```
FF2621F2 068E006A 006A0001 1847C726 065EC400 151647C7 26065EC4 00021047 G...á^.&úG...á^.&úG...j.j....1&. 000000
1E8C3902 A3085A88 000014F5 9A505200 1A050856 88064688 136A00CF 68000036 6..hü.j..F..V....RP.%...¡Z.Ê.9.. 000020
3A341E8C 3A32A308 72883A12 1E8C3A10 A3086A88 3A0E1E8C 3A0CA308 62883904 .9¡b.Ê.:...:¡j.Ê.:...:¡r.Ê2:..4: 000040
82883A84 1E8C3A82 A30892B8 3A801E8C 3A7EA308 7A883A38 1E8C3A36 A3088A88 ¡..Ê6:..8:¡z.Ê~:...:¡..Ê.:...:¡. 000060
A308AA88 3AAA1E8C 3AA8A308 A2883A5E 1E8C3A5C A3089A88 3A5A1E8C 3A58A308 .ÊX:..Z:¡..Ê\:..^:¡Å.Ê´:..´:¡¨.Ê 000080
8E151088 1E565700 0002C8C8 C95F5E1F 38841E8C 3882A308 82883AD0 1E8C3ACE ö:..Å:¡ý.Êý;..Ç;.^ èùà...WV.¡... 0000A0
6A4C6A02 6A3CB2 1 1E08C483 15250000 9A3CB268 1E006A04 02680028 FE46C7D8 ÀúFz(.h..j..hý<...%..á..hý<j.jLj 0000C0
6A016A04 6A036A.. 82681E00 00195F9A 088A681E 5016FE46 80006A00 6A006A04 .j.j.j..Fz.P.hα.._....hý<j.j.j.j 0000E0
6A006A01 6A046A04 6A3CB268 1E000019 7D9A088F 681E5016 FE468D00 6A006A00 .j.j..Fz.P.he..)¯...hý<j.j.j.j.j 000100
6A006A00 6A016A04 6A056A3C 82681E00 001989A 08C6681E 5016FE46 80006A00 .j..Fz.P.hó.......hý<j.j.j.j.j.j 000120
80006A00 6A006A05 6A016A06 6A3CB268 1E000019 899A08CD 681E5016 FE468D00 ..Fz.P.hè..¿....hý<j.j.j.j.j.j.. 000140
FE468D00 6A006A00 6A056A01 6A076A3C 82681E00 0019D79A 0804681E 5016FE46 Fz.P.hå..m....hý<j.j.j.j.j.j..Fz 000160
5016FE46 80024A68 1E006A03 6A046A08 6A3CB268 1E000019 F59A0808 681E5016 .P.hÅ..%....hý<j.j.j.j..hJ..Fz.P 000180
681E5016 FE468D00 6A006A00 6A016A08 6A096A3C 82681E00 001A139A 080D681E .hì.......hý<j.j.j.j.j.j..Fz.P.h 0001A0
08E6681E 5016FE46 80006A00 6A006A01 6A026A0A 6A3CB268 1E00001A 319A08E2 â..1....hý<j.j.j.j.j.j..Fz.P.hl. 0001C0
6D9A08F3 681E5016 FE468000 6A006A00 6A016A08 6A0B6A3C 82681E00 001A4F9A .O....hý<j.j.j.j.j.j..Fz.P.hµ..m 0001E0
```

Dump of file SATURN:[PCCOMMON.DUMP.DLL]IMTAB.TMP;1 on 18-APR-1990 10:47:16.73
File ID (705,14,0)   End of file block 92 / Allocated 92

Virtual block number 17 (00000011), 512 (0200) bytes

```
001A8B9A 08FC681E 5016FE46 80006A00 6A006A01 6A016A0C 6A3CB268 1E00001A ....hý<j.j.j.j.j.j..Fz.P.h•..... 000000
1E00001A A99A0906 681E5016 FE468D00 6A006A00 6A016A04 6A006A3C 82681E00 ..hý<j.j.j.j.j.j..Fz.P.h...`.... 000020
82681E00 001AC79A 0912681E 5016FE46 8D006A00 6A006A01 6A046A0E 6A3CB268 hý<j.j.j.j.j.j..Fz.P.h...ú....hý 000040
6A3CB268 1E00001A E59A091A 681E5016 FE468D00 6A006A00 6A016A10 6A0F6A3C <j.j.j.j.j.j..Fz.P.h...Í....hý<j 000060
6A116A3C 82681E00 0016E89A 0922681E 5016FE46 8D097868 1E026A03 6A046A10 .j.j.j..hx..Fz.P.h"..Ò....hý<j.j 000080
6A106A12 6A3CB268 1E00001B 219A0929 681E5016 FE468D02 52681E00 6A026A10 .j.j..hR..Fz.P.h)..!....hý<j.j.j 0000A0
6A026A10 6A136A3C 82681E00 001B3F9A 0931681E 5016FE46 8D098068 1E006A02 .j..h...Fz.P.h1..7....hý<j.j.j.j 0000C0
1E006A02 6A106A14 6A3CB268 1E00001B 509A0936 681E5016 FE468D09 88681E02 ..h...Fz.P.h6..]....hý<j.j.j.j.. 0000E0
94681E00 6A026A10 6A156A3C 82681E00 001B789A 0930681E 5016FE46 8D025A68 hZ..Fz.P.h=..(....hý<j.j.j.j..h. 000100
80026268 1E006A02 6A106A16 6A3CB268 1E00001B 999A0946 681E5016 FE468D09 ..Fz.P.hF.......hý<j.j.j.j..hb.. 000120
FE468D02 6A681E00 6A026A10 6A176A3C 82681E00 001B879A 0950681E 5016FE46 Fz.P.hP..ñ....hý<j.j.j.j..hj..Fz 000140
5016FE46 80099C68 1E006A03 6A046A18 6A3CB268 1E00001B D59A0958 681E5016 .P.hX..Í....hý<j.j.j.j..h...Fz.P 000160
681E5016 FE468D00 6A006A00 6A026A10 6A196A3C 82681E00 001BF39A 095E681E .h^..µ....hý<j.j.j.j.j.j..Fz.P.h 000180
096C681E 5016FE46 8D006A00 6A006A02 6A106A1A 6A3CB268 1E00001C 119A0961 a.......hý<j.j.j.j.j.j.:Fz.P.hl. 0001A0
88065EC4 001A0847 C726065E C4065F8C 26044789 263CB288 065EC400 0019419A .A...á^.¡ý<&.G.&._.á^.&úG...á^.. 0001C0
021047C7 26065EC4 00180E47 C726065E C400310C 47C72606 5EC40A47 8926FE46 Fz&.G.á^.&úG.1.á^¯&úG...á^.&úG.. 0001E0
```

```
Dump of file SATURN:[PCCOMMON.DUMP.DLL]INTAB.TMP;1 on 18-APR-1990 10:47:16.73
File ID (705,14,0)   End of file block 92 / Allocated 92

Virtual block number 18 (00000012), 512 (0200) bytes

 000036FF 2621F206 8E006A00 6A000118 47C72606 5EC40014 1647C726 065EC400 .á^.&úG...á^.&úG...j.j....I&.6.. 000000
 B83D061E 8C3004A3 09A4B800 0018849A 5052001A 05085688 06468813 6A00CB68 hù.j..F..V....RP.....¡Ê.Ê.=...=¡ 000020
 09CCB83D 7C1E6C3D 7AA309C4 B83D781E 8C3076A3 09BC8830 301E8C30 2EA30984 Ç.Ê.=..0=¡¥.Êv=..x=¡á.Êz=..|=¡ä. 000040
 9CA309AC B830521E 8C3050A3 09E48830 2C1E8C30 2AA3090C B83D561E 8C3054A3 ÊI=..V=¡Ê.Ê*=..,=¡ö.ÊP=..R=¡¯.Ê. 000060
 088E1900 881E5657 000002C8 CBC95F5E 1F30C41E 8C30C2A3 09D4B830 9E1E8C30 =...=¡å.Êö=..á=.^_èùà...WV.¡...À 000080
 016A046A 026A4084 681E08C4 83192200 009A4084 681E006A 02866800 28FE46C7 úF±(.h..j..hÇa...ª..á..hÇaj.j.j. 0000A0
 006A016A 046A036A 4084681E 00001D3E 9A09EC68 1E5016FE 4680006A 006A006A j.j.j..F±.P.h$..>....hÇaj.j.j.j. 0000C0
 006A006A 016A046A 046A4084 681E0000 1D5C9A09 F4681E50 16FE4680 006A006A j.j..F±.P.h¶..\....hÇaj.j.j.j.j. 0000E0
 006A006A 006A016A 046A056A 4084681E 00001D7A 9A09FC68 1E5016FE 4680006A j..F±.P.h•..z....hÇaj.j.j.j.j.j. 000100
 4680006A 006A006A 016A046A 066A4084 681E0000 1D989A0A 04681E50 16FE4680 .F±.P.h........hÇaj.j.j.j.j.j..F 000120
 16FE4680 006A006A 006A016A 046A076A 4084681E 00001D86 9A0A0C68 1E5016FE ±.P.h...Å....hÇaj.j.j.j.j.j..F±. 000140
 1E5016FE 4680006A 006A006A 016A016A 086A4084 681E0000 1DD49A0A 14681E50 P.h...å....hÇaj.j.j.j.j.j..F±.P. 000160
 22681E50 16FE4680 006A006A 006A016A 086A096A 4084681E 00001DF2 9A0A1C68 h...·....hÇaj.j.j.j.j.j..F±.P.h" 000180
 9A0A2E68 1E5016FE 4680006A 006A006A 016A046A 0A6A4084 681E0000 1E109A0A .......hÇaj.j.j.j.j.j..F±.P.h... 0001A0
 1E4C9A0A 36681E50 16FE4680 006A006A 006A016A 106A086A 4084681E 00001E2E .....hÇaj.j.j.j.j.j..F±.P.hó..L. 0001C0
 00001E6A 9A0A3E68 1E5016FE 4680A060 681E006A 026A106A 0C6A4084 681E0000 ...hÇaj.j.j.j..h`..F±.P.h>..j... 0001E0

Dump of file SA..RN:[PCCOMMON.DUMP.DLL]INTAB.TMP;1 on 18-APR-1990 10:47:16.73
File ID (705,14,0)   End of file block 92 / Allocated 92

Virtual block number 19 (00000013), 512 (0200) bytes

 681E0000 1E889A0A 48681E50 16FE4680 0A68681E 026A036A 046A006A 4084681E .hÇaj.j.j.j..hh..F±.P.hH.......h 000000
 4084681E 00001EA6 9A0A4E68 1E5016FE 4680A070 681E026A 036A046A 0E6A4084 Çaj.j.j.j..hp..F±.P.hN..I....hÇa 000020
 106A4084 681E0000 1EC49A0A 54681E50 16FE4680 0A78681E 006A036A 046A0F6A j.j.j.j..hx..F±.P.hT..á....hÇaj. 000040
 89264084 88065EC4 00001803 9A0A5768 1E5016FE 46800262 681E006A 026A106A j.j.j..hb..F±.P.hW......á^.¡Ça&. 000060
 0C47C726 065EC40A 478926FE 4688065E C4001008 47C72606 5EC4065F 8C260447 G.&._.á^.&úG...á^..F±&.G.á^.&úG. 000080
 0036FF26 21F2068E 006A006A 00001847 C726065E C4000F0E 47C72606 5EC40019 ..á^¯&úG...á^.&úG...j.j....I&.6. 0000A0
 410C1E8C 410AA30A 80B80000 1C819A50 52001A05 08568806 4688136A 00CC6800 .hä.j..F..V....RP.....j..Ê.A...A 0000C0
 8888417E 1E8C417C A30A8088 41321E8C 4130A30A 90884158 1E8C4156 A30A8888 ¡..ÊVA..XA¡..ÊOA..2A¡..Ê|A..~A¡. 0000E0
 ECB81E56 57000002 C8CBC95F 5E1F41A4 1E8C41A2 A30A9088 41CA1E8C 41C8A30A .ÊàA..òA¡..ÊÀA..ÊA.^_èùà...WV.¡ì 000100
 6A026A43 3A681E08 C4831D01 00009A43 3A681E00 6A008E68 0028FE46 C7D88E1C ..ÀúF±(.h/.j..h:C......á..h:Cj.j 000120
 6A046A03 6A433A68 1E00001F C19A0A98 681E5016 FE468000 6A006A00 6A016A08 .j.j.j.j..F±.P.h...è....h:Cj.j.j 000140
 6A016A04 6A046A43 3A681E00 001FDF9A 0A9E681E 5016FE46 800AAA68 1E006A03 .j..h¨..F±.P.h...Ô....h:Cj.j.j.j 000160
 5F8C2604 47892643 3A88065E C400001D 209A0AA4 681E5016 FE468000 6A006A00 .j.j..F±.P.hÊ.. ...á^.¡:C&.G.&._ 000180
 6A006A00 001847C7 26065EC4 0A478926 FE468806 5EC40004 0847C726 065EC406 .á^.&úG...á^..F±&.G.á^.&úG...j.J 0001A0
 1F00001F 229A5052 001A0508 56880646 88136A00 00680000 36FF2621 F2068E00 ....I&.6..hÀ.j..F..V....RP.".... 0001C0
 009A43F8 681E006A 02606800 28FE46C7 D88E1F6F 881E5657 000002C8 CBC95F5E ^_èùà...WV.¡o..ÀúF±(.h`.j..h½C.. 0001E0

Dump of file SATURN:[PCCOMMON.DUMP.DLL]INTAB.TMP;1 on 18-APR-1990 10:47:16.73
File ID (705,14,0)   End of file block 92 / Allocated 92

Virtual block number 20 (00000014), 512 (0200) bytes

 9A0A8268 1E5016FE 4680006A 006A006A 046A4C6A 026A43F8 681E08C4 831F8400 ....á..h½Cj.jLj.j.j.j..F±.P.hý.. 000000
 20AC9A0A 87681E50 16FE4680 024A681E 006A036A 046A036A 43F8681E 0000208E . ...h½Cj.j.j.j..hJ..F±.P.hñ..¯  000020
 000020CA 9A0A8C68 1E5016FE 4680006A 006A006A 056A016A 046A43F8 681E0000 ...h½Cj.j.j.j.j.j..F±.P.h¥..ò .. 000040
 681E0000 20E89A0A C6681E50 16FE4680 006A006A 006A016A 106A056A 43F8681E .h½Cj.j.j.j.j.j..F±.P.hó..Ò ...h 000060
 43F8681E 00002106 9A0ACE68 1E5016FE 4680081A 681E026A 036A046A 066A43F8 ½Cj.j.j.j..h...F±.P.hö...I...h½C 000080
 086A43F8 681E0000 21249A0A D5681E50 16FE4680 0252681E 006A026A 106A076A j.j.j.j..hR..F±.P.hÍ..$I...h½Cj. 0000A0
 106A096A 43F8681E 00002142 9A0ADD68 1E5016FE 46800822 681E026A 026A106A j.j.j..h"..F±.P.hÌ..BI...h½Cj.j. 0000C0
 026A106A 0A6A43F8 681E0000 21609A0A E3681E50 16FE4680 082A681E 026A026A j.j..h*..F±.P.hD..'I...h½Cj.j.j. 0000E0
 006A026A 106A086A 43F8681E 0000217E 9A0AE968 1E5016FE 4680025A 681E006A j..hZ..F±.P.hÕ..-I...h½Cj.j.j.j. 000100
 681E006A 026A106A 0C6A43F8 681E0000 219C9A0A F2681E50 16FE4680 0262681E .hb..F±.P.h·...I...h½Cj.j.j.j..h 000120
 0832681E 006A036A 046A006A 43F8681E 000021BA 9A0AFA68 1E5016FE 4680026A j..F±.P.hª..¤I...h½Cj.j.j.j..h2. 000140
 4680006A 006A006A 026A106A 0E6A43F8 681E0000 21D89A08 00681E50 16FE4680 .F±.P.h...AI...h½Cj.j.j.j.j.j..F 000160
 16FE4680 006A006A 006A026A 106A0F6A 43F8681E 000021F6 9A080368 1E5016FE ±.P.h...-I...h½Cj.j.j.j.j.j..F±. 000180
 0F0847C7 26065EC4 065F8C26 04478926 43F88806 5EC40000 1FA39A08 0E681E50 P.h...Ê...á^.¡½C&.G.&._.á^.&úG.. 0001A0
 065EC400 000E47C7 26065EC4 00320C47 C726065E C40A4789 26FE4688 065EC400 .á^..F±&.G.á^.&úG.2.á^¯&úG...á^. 0001C0
 21F2068E 006A006A 00011847 C726065E C4000A16 47C72606 5EC40002 1047C726 &úG...á^.&úG...á^.&úG...j.j....I 0001E0
```

```
Dump of file SATURN:[PCCOMMON.DUMP.DLL]IMTAB.TMP;1 on 18-APR-1990 10:47:16.73
File ID (705,14,0)   End of file block 92 / Allocated 92

Virtual block number 21 (00000015), 512 (0200) bytes

 444AA308 3AB80000 202B9A50 52001A05 08568806 4688136A 00D16800 0036FF26 &.6..hl.j..F..V....RP.+ ..¡:.ÈJD 000000
 1E8C452E A30852B8 45561E8C 4554A308 4AB8449C 1E8C449A A30842B8 444C1E8C ..LD¡B.È.D...D¡J.ÈTE..VE¡R.È.E.. 000020
 44981E8C 4496A308 6AB8455A 1E8C4558 A30862B8 45341E8C 4532A308 5AB84530 0E¡2.È2E..4E¡b.ÈXE..ZE¡j.È.D...D 000040
 9A465868 1E006A00 8E680028 FE46C7D8 8E203C88 1E565700 0002C8C8 C95F5E1F .^_èùà...WV.¡< .ÀúF±(.h/.j..hXF. 000060
 0872681E 5016FE46 a0006A00 6A006A04 6A4C6A02 6A465868 1E08C483 20510000 ..Ō .á..hXFj.jLj.j.j.j..F±.P.hr. 000080
 2D9A0877 681E5016 FE468008 82681E00 6A026A10 6A036A46 58681E00 00230F9A ..#...hXFj.j.j.j..h...F±.P.hw..· 0000A0
 0020709A 087E681E 5016FE46 8008A668 1E006A03 6A046A04 6A465868 1E000023 #...hXFj.j.j.j..hl..F±.P.h~..p . 0000C0
 8926FE46 88065EC4 00040847 C726065E C4065F8C 26044789 26465888 065EC400 .á^.¡XF&.G.&._.á^.&úG...á^..F±&. 0000E0
 065EC400 021047C7 26065EC4 00040E47 C726065E C40018OC 47C72606 5EC40A47 G.á^.&úG...á^¯.&úG...á^.&úG...á^. 000100
 1A050856 8806468B 136A0002 68000036 FF2621F2 068E006A 006A0000 1847C726 &úG...j.j...·l&.6..h@.j..F..V... 000120
 B0881E56 57000002 C8C8C95F 5E1F46AC 1E8C46AA A308AE88 00002266 9A505200 .RP.f"..¡Û.È¨F..¯F.^_èùà...WV.¡§ 000140
 6A026A47 16681E08 C4832202 00009A47 16681E00 6A017C68 0028FE46 C7D88E22 ".ÀúF±(.h|.j..h.G...Ō".á..h.Gj.j 000160
 6A046A07 6A471668 1E000024 019A0886 681E5016 FE468008 E6681E00 6A026A10 .j.j..hl..F±.P.hŘ...$...h.Gj.j.j 000180
 6A026A10 6A036A47 16681E00 00241F9A 0880681E 5016FE46 800C0268 1E006A03 .j..h...F±.P.h§...$...h.Gj.j.j.j 0001A0
 6A006A04 6A4C6A04 6A471668 1E000024 309A08C1 681E5016 FE468008 F2681E00 ..h·..F±.P.hé..=$...h.Gj.jLj.j.j 0001C0
 4A681E00 6A036A04 6A096A47 16681E00 002458 9A 08C8681E 5016FE46 80006A00 .j..F±.P.hà..[$...h.Gj.j.j.j..hJ 0001E0

Dump of file SATURN:[PCCOMMON.DUMP.DLL]IMTAB.TMP;1 on 18-APR-1990 10:47:16.73
File ID (705,14,0)   End of file block 92 / Allocated 92

Virtual block number 22 (00000016), 512 (0200) bytes

 80006A00 6A006A05 6A016A05 6A471668 1E000024 799A08CD 681E5016 FE468002 ..F±.P.hë..y$...h.Gj.j.j.j.j.j.. 000000
 FE46800B FA681E00 6A036A04 6A066A47 16681E00 0024979A 08D2681E 5016FE46 F±.P.h@...$...h.Gj.j.j.j..h*..F± 000020
 5016FE46 80006A00 6A006A01 6A106A08 6A471668 1E000024 859A08DA 681E5016 .P.hO..ç$...h.Gj.j.j.j.j.j..F±.P 000040
 00090847 C726065E C4065F8C 26044789 26471688 065EC400 0022F19A 0800681E .hï..þ"..á^.¡.G&.G.&._.á^.&úG... 000060
 26065EC4 00060E47 C726065E C40028OC 47C72606 5EC40A47 8926FE46 88065EC4 á^..F±&.G.á^.&úG.+.á^¯.&úG...á^.& 000080
 1E8C47DA A30C1288 47861E8C 47B4A30C 0A880000 1847C726 065EC400 041047C7 úG...á^.&úG...¡..ÈÇG..ŘG¡..ÈÖG.. 0000A0
 9A505200 1A050856 8806468B 136A0003 68000036 FF2621F2 068E006A 006A47DC ÉGj.j...·l&.6..h&.j..F..V....RP. 0000C0
 1E006A00 E4680028 FE46C7D8 8E23AF88 1E565700 0002C8C8 C95F5E1F 00002394 .#...^_èùà...WV.¡É#.ÀúF±(.hô.j.. 0000E0
 16FE468D 006A006A 006A046A 01006802 6A489268 1E08C483 23C40000 9A489268 h.H...Ā#.á..h.Hj.h..j.j.j.j..F±. 000100
 5016FE46 80006A00 6A006A04 6A010068 036A4892 681E0000 25959A0C 1A681E50 P.h....%...h.Hj.h..j.j.j.j..F±.P 000120
 681E5016 FE46800C 30681E00 6A036A04 6A046A48 92681E00 0025839A 0C20681E .h ..*%...h.Hj.j.j.j..hO..F±.P.h 000140
 0C2A681E 5016FE46 80024A68 1E006A03 6A046A05 6A489268 1E000025 D1, 0C24 $..i%...h.Hj.j.j.j..hJ..F±.P.h*. 000160
 88065EC4 00050847 C726065E C4065F8C 26044789 26489288 065EC400 002_ 39A .D#..á^.¡.H&.G.&._.á^.&úG...á^.. 000180
 6A000468 000036FF 2621F206 8E006A00 6A000018 47C72606 5EC40A47 89261E46 F±&.G.á^.&úG...j.J̄...·l&.6..há.j 0001A0
 25418B1E 56570000 02C8C8C9 5F5E1F00 0025309A 5052001A 05085688 06468813 ..F..V....RP.0%...^_èùà...WV.¡A% 0001C0
 096A026A 4976681E 08C48325 5600009A 4976681E 006A00E4 680028FE 46C7D88E .ÀúF±(.hô.j..hvl...V̄%.á..hvlj.j. 0001E0

Dump of file SATURN:[PCCOMMON.DUMP.DLL]IMTAB.TMP;1 on 18-APR-1990 10:47:16.73
File ID (705,14,0)   End of file block 92 / Allocated 92

Virtual block number 23 (00000017), 512 (0200) bytes

 026A106A 036A4976 681E0000 26809A0C 38681E50 16FE4680 006A006A 006A046A j.j.j.j..F±.P.h8...&...hvlj.j.j. 000000
 006A036A 046A046A 4976681E 0000269E 9A0C3E68 1E5016FE 46800C4E 681E026A j..hN..F±.P.h>...&...hvlj.j.j.j. 000020
 681E006A 036A046A 056A4976 681E0000 268C9A0C 45681E50 16FE4680 0C66681E .hf..F±.P.hE..¥&...hvlj.j.j.j..h 000040
 5EC4065F 8C260447 89264976 88065EC4 00002576 9A0C4868 1E5016FE 4680024A J..F±.P.hH..v%..á^.¡vl&.G.&._.á^ 000060
 26FE4688 065EC400 040E47C7 26065EC4 00200C47 C726065E C4000508 47C72606 .&úG...á^.&úG. .á^.&úG...á^.¯F±& 000080
 36FF2621 F2068E00 6A006A00 001847C7 26065EC4 00021047 C726065E C40A4789 .G.á^.&úG...á^.&úG...j.j...·l&.6 0000A0
 000002C8 C8C95F5E 1F000026 109A5052 001A0508 56880646 8B136A00 D5680000 ..hf.j..F..V....RP..&...^_èùà... 0000C0
 681E08C4 83264300 009A4A5A 681E006A 010A6800 28FE46C7 D88E262E 881E5657 WV.¡.&.ÀúF±(.h..j..hZJ...C̄&.á..h 0000E0
 4A5A681E 00002786 9A0C6E68 1E5016FE 4680006A 006A006A 046A4C6A 026A4A5A ZJj.jLj.j.j.j..F±.P.hn...'...hZJ 000100
 046A4A5A 681E0000 27A49A0C 73681E50 16FE4680 0C8E681E 026A036A 046A036A j.j.j.j..h...F±.P.hs..Ê'...hZJj. 000120
 046A056A 4A5A681E 000027C2 9A0C7868 1E5016FE 46800252 681E006A 026A106A j.j.j..hR..F±.P.hx..ô'...hZJj.j. 000140
 026A106A 066A4A5A 681E0000 27E09A0C 80681E50 16FE4680 0C96681E 026A036A j.j..h...F±.P.h...Á'...hZJj.j.j. 000160
 8C260447 89264A5A 88065EC4 00002662 9A0C8568 1E5016FE 46800CA2 681E006A j..hÅ..F±.P.h...b&..á^.¡ZJ&.G.&. 000180
 5EC40002 1047C726 065EC40A 478926FE 4688065E C4000608 47C72606 5EC4065F _.á^.&úG...á^..F±&.G.á^.&úG...á^ 0001A0
 05085688 06468813 6A000768 000036FF 2621F206 8E006A00 6A000018 47C72606 ¯.&úG...j.j...·l&.6..h@.j..F..V.. 0001C0
 00008806 5EC4088E 2734881E 56570000 00C8C8C9 5F5E1F00 0027239A 5052001A ..RP.#'...^_èùà...WV.¡4'.Àá^.¡.. 0001E0
```

```
Dump of file SATURN:[PCCOMMON.DUMP.DLL]IMTAB.TMP;1 on 18-APR-1990 10:47:16.73
File ID (705,14,0)   End of file block 92 / Allocated 92

Virtual block number 24 (00000018), 512 (0200) bytes

47C72606 5EC40000 0A47C726 065EC400 000847C7 26065EC4 04478926 06478926 &.G.&.G.á^.&úG...á^.&úG...á^.&úG 000000
5052001A 05085688 06468813 6A000868 000036FF 2621F206 8E006A00 6A000018 ...j.j....!&.6..hÄ.j..F..V....RP 000020
06478926 0000F806 5EC4088E 2846881E 56570000 00C8C8C9 5F5E1F00 0028359A .5(...^_èùà...WV.¡F(.Äá^.j..&.G. 000040
6A000018 47C72606 5EC40000 0A47C726 065EC400 000847C7 26065EC4 04478926 &.G.á^.&úG...á^.&úG...á^.&úG...j 000060
0028919A 5052001A 05085688 06468813 6A000968 000036FF 2621F206 8E006A00 .j....!&.6..h).j..F..V....RP..(. 000080
4864681E 006A00E4 680028FE 46C7D88E 28A2881E 56570000 02C8C8C9 5F5E1F00 ..^_èùà...WV.¡Å(.ÄúF±(.hô.j..hdK 0000A0
AA681E50 16FE468D 006A006A 006A016A 026A026A 4864681E 08C48327 4900009A ...I'.á..hdKj.j.j.j.j.j..F±.P.h^ 0000C0
9A0CAE68 1E5016FE 468D006A 006A006A 006A046A 006A4864 681E0000 27689A0C ..h'...hdKj.j.j.j.j.j..F±.P.hÛ.. 0000E0
298C9A0C AF681E50 16FE468D 006A006A 006A026A 106A036A 4864681E 0000296E n)...hdKj.j.j.j.j.j..F±.P.hE...) 000100
000029AA 9A0C8668 1E5016FE 468D006A 006A006A 016A106A 046A4864 681E0000 ...hdKj.j.j.j.j.j..F±.P.hÑ..¯).. 000120
5EC40000 29329A0C 8A681E50 16FE468D 006A006A 006A016A 016A056A 4864681E .hdKj.j.j.j.j.j..F±.P.ho..2)..á^ 000140
C40A4789 26FE4688 065EC400 050847C7 26065EC4 065F8C26 04478926 4864B806 .¡dK&.G.&._.á^.&úG...á^..F±&.G.á 000160
08568806 4688136A 00DA6800 0036FF26 21F2068E 006A006A 00001847 C726065E ^.&úG...j.J....!&.6..hO.j..F..V. 000180
0028FE46 C7D88E28 FE881E56 57000002 C8C8C95F 5E1F0000 28ED9A50 52001A05 ...RP.Ú(...^_èùà...WV.¡±(.ÄúF±(. 0001A0
6A006A00 6A046A4C 6A026A4C 48681E08 C4832913 00009A4C 48681E00 6A017C68 h|.j..hHL....).á..hHLj.jLj.j.j.j 0001C0
8D006A00 6A006A05 6A016A03 6A4C4868 1E00002A 599A0CF0 681E5016 FE468000 ..F±.P.hÞ..Y*...hHLj.j.j.j.j.j.. 0001E0

Dump of file SATURN:[PCCOMMON.DUMP.DLL]IMTAB.TMP;1 on 18-APR-1990 10:47:16.73
File ID (705,14,0)   End of file block 92 / Allocated 92

Virtual block number 25 (00000019), 512 (0200) bytes

FE468D00 6A006A00 6A056A01 6A046A4C 48681E00 002A779A 0CF5681E 5016FE46 F±.P.hK..w*...hHLj.j.j.j.j.j..F± 000000
5016FE46 8D006A00 6A006A02 6A106A05 6A4C4868 1E00002A 959A0CF9 681E5016 .P.h±...*...hHLj.j.j.j.j.j..F±.P 000020
681E5016 FE468D00 6A006A00 6A026A10 6A066A4C 48681E00 002A839A 0D02681E .h...**...hHLj.j.j.j.j.j..F±.P.h 000040
0D11681E 5016FE46 8D006A00 6A006A03 6A046A07 6A4C4868 1E00002A D19A0D08 ...Ñ*...hHLj.j.j.j.j.j..F±.P.h.. 000060
0D9A0D14 681E5016 FE468D00 6A006A00 6A036A04 6A086A4C 48681E00 002AEF9A .ÿ*...hHLj.j.j.j.j.j..F±.P.h.... 000080
0029509A 0D19681E 5016FE46 8D006A00 6A006A03 6A046A09 6A4C4868 1E00002B +...hHLj.j.j.j.j.j..F±.P.h...P). 0000A0
8926FE46 88065EC4 00090847 C726065E C4065F8C 26044789 264C4888 065EC400 .á^.¡HL&.G.&._.á^.&úG...á^..F±&. 0000C0
6A006A00 001847C7 26065EC4 00070E47 C726065E C4001C0C 47C72606 5EC40A47 G.á^.&úG...á^¯&úG...á^.&úG...j.j 0000E0
1F000029 F69A5052 001A0508 56880646 88136A00 08680000 36FF2621 F2068E00 ....!&.6..hÛ.j..F..V....RP.-)... 000100
009A4DC4 681E006A 00E46800 28FE46C7 D88E2A07 881E5657 000002C8 C8C95F5E ^_èùà...WV.¡.*.ÄúF±(.hô.j..háM.. 000120
9A002568 1E5016FE 468D006A 006A006A 016A026A 026A4DC4 681E08C4 832A1C00 ..¯*.á..háMj.j.j.j.j.j..F±.P.hX.. 000140
2BEC9A0D 2D681E50 16FE468D 006A006A 006A016A 026A036A 4DC4681E 00002BCE ö+...háMj.j.j.j.j.j..F±.P.h-..š+ 000160
00002C0A 9A003568 1E5016FE 46800064 681E006A 036A046A 046A4DC4 681E0000 ...háMj.j.j.j..hd..F±.P.h5....,.. 000180
5EC40000 2A3B9A00 38681E50 16FE468D 0040681E 006A026A 106A056A 4DC4681E .háMj.j.j.j..hə..F±.P.h8..;*..á^ 0001A0
C40A4789 26FE4688 065EC400 050847C7 26065EC4 065F8C26 04478926 4DC4B806 .¡áM&.G.&._.á^.&úG...á^..F±&.G.á 0001C0
068E006A 006A0000 1847C726 065EC400 040E47C7 26065EC4 001F0C47 C726065E ^.&úG...á^¯&úG...á^.&úG...j.j... 0001E0

Dump of file SATURN:[PCCOMMON.DUMP.DLL]IMTAB.TMP;1 on 18-APR-1990 10:47:16.73
File ID (705,14,0)   End of file block 92 / Allocated 92

Virtual block number 26 (0000001A), 512 (0200) bytes

C95F5E1F 00002B68 9A505200 1A050856 88064688 136A000C 68000036 FF2621F2 ·!&.6..hÉ.j..F..V....RP.k+...^_è 000000
28910000 9A4EA868 1E006A01 7C680028 FE46C7D8 8E287CB8 1E565700 0002C8C8 ùà...WV.¡|+.ÄúF±(.h|.j..h´N...¯+ 000020
002CC89A 0D6C681E 5016FE46 8D006A00 6A006A04 6A4C6A02 6A4EA868 1E08C483 .á..h´Nj.jLj.j.j.j..F±.P.hl..ù,. 000040
1E00002C E99A0D72 681E5016 FE468D00 8A681E02 6A036A04 6A056A4E A8681E00 ..h´Nj.j.j.j..h...F±.P.hr..Õ,... 000060
A8681E00 0020079A 0D79681E 5016FE46 8D025A68 1E006A02 6A106A04 6A4EA868 h´Nj.j.j.j..hZ..F±.P.hy_..-...h´ 000080
6A4EA868 1E00002B B09A0D81 681E5016 FE468D02 4A681E00 6A036A04 6A036A4E Nj.j.j.j..hJ..F±.P.h...¯+...h´Nj 0000A0
264EA888 065EC400 002CAD9A 0D86681E 5016FE46 8D0DAA68 1E006A03 6A046A06 .j.j.j..h´..F±.P.h...Ù,..á^.¡´N& 0000C0
47C72606 5EC40A47 8926FE46 88065EC4 00060847 C726065E C4065F8C 26044789 .G.&._.á^.&úG...á^..F±&.G.á^.&úG 0000E0
5EC40004 1647C726 065EC400 021047C7 26065EC4 00060E47 C726065E C400330C .3.á^¯&úG...á^.&úG...á^.&úG...á^ 000100
05085688 06468813 6A000068 000036FF 2621F206 8E006A00 6A000118 47C72606 .&úG...j.j....!&.6..hÍ.j..F..V.. 000120
680028FE 46C7D88E 2C79881E 56570000 02C8C8C9 5F5E1F00 002C689A 5052001A ..RP.h,...^_èùà...WV.¡y,.ÄúF±(.h 000140
006A006A 006A046A 4C6A026A 5024681E 08C4832C 8E00009A 5024681E 006A00E4 ô.j..h$P....,.á..h$Pj.jLj.j.j.j. 000160
46800OC8 681E026A 036A046A 036A5024 681E0000 2DF89A0D B2681E50 16FE468D .F±.P.hý..½-...h$Pj.j.j.j..hà..F 000180
16FE468D 0008681E 006A036A 046A046A 5024681E 00002E16 9A0DB768 1E5016FE ±.P.hñ.......h$Pj.j.j.j..hÄ..F±. 0001A0
1E5016FE 46800OE0 681E006A 026A106A 056A5024 681E0000 2E349A00 BD681E50 P.h§..4....h$Pj.j.j.j..hÄ..F±.P. 0001C0
C4000508 47C72606 5EC4065F 8C260447 89265024 88065EC4 00002D25 9A0DC168 hè..%-..á^.¡$P&.G.&._.á^.&úG...á 0001E0
```

```
Dump of file SATURN:[PCCOMMON.DUMP.DLL]INTAB.TMP;1 on 18-APR-1990 10:47:16.73
File ID (705,14,0)   End of file block 92 / Allocated 92

Virtual block number 27 (0000001B), 512 (0200) bytes

 8E006A00 6A000113 47C72606 5EC40002 1047C726 065EC40A 478926FE 4688065E ^..F±&.G.á^.&úG...á^.&úG...j.j.. 000000
 5F5E1F00 002D959A 5052001A 05085688 06468813 6A000E68 000036FF 2621F206 .·!&.6..h8.j..F..V....RP..-...^  000020
 8B00009A 5108681E 006A010A 680028FE 46C7D88E 2DA6881E 56570000 02C8CBC9 èùà...WV.¡l·.ÁúF±(.h..j..h.Q...Ē 000040
 2EEC9A00 E8681E50 16FE468D 006A006A 006A016A 046A026A 5108681E 08C48320 -.á..h.Qj.j.j.j.j.j..F±.P.hÒ..&. 000060
 00002F0A 9A00F568 1E5016FE 468D006A 006A006A 016A086A 036A5108 681E0000 ...h.Qj.j.j.j.j.j..F±.P.h%.../.. 000080
 681E0000 2F289A00 FA681E50 16FE468D 006A006A 006A046A 4C6A046A 5108681E .h.Qj.jLj.j.j.j..F±.P.h*..(/...h 0000A0
 5108681E 00002F46 9A00FF68 1E5016FE 468D006A 006A006A 036A046A 056A5108 .Qj.j.j.j.j.j..F±.P.h...F/...h.Q 0000C0
 51088806 5EC40000 2D0A9A0E 02681E50 16FE4680 006A006A 006A026A 106A066A j.j.j.j.j.j..F±.P.h...Ö-..á^.¡.Q 0000E0
 C726065E C40A4789 26FE4688 065EC400 060847C7 26065EC4 065F8C26 04478926 &.G.&._.á^.&úG...á^..F±&.G.á^.&ú 000100
 46C7D88E 2E9A881E 56570000 02C8CBC9 5F5E1F00 050E47C7 26065EC4 00280C47 G.(.á^.&úG....^_èùà...WV.¡...ÁúF 000120
 006A016A 046A026A 5212681E 08C4832E AF00009A 5212681E 006A01A2 680028FE ±(.hÅ.j..h.R...Ē..á..h.Rj.j.j.j. 000140
 006A006A 016A086A 036A5212 681E0000 2FDC9A0E 0C681E50 16FE468D 006A006A j.j..F±.P.h...É/...h.Rj.j.j.j.j. 000160
 006A006A 006A046A 2E6A046A 5212681E 00002FFA 9A0E1968 1E5016FE 468D006A j..F±.P.h...*/...h.Rj.j.j.j.j.j. 000180
 468D006A 006A006A 016A026A 056A5212 681E0000 30189A0E 25681E50 16FE468D .F±.P.h%...0...h.Rj.j.j.j.j.j..F 0001A0
 16FE468D 006A006A 006A016A 086A066A 5212681E 00003036 9A0E2D68 1E5016FE ±.P.h-.:60...h.Rj.j.j.j.j.j..F±. 0001C0
 1E5016FE 468D006A 006A006A 026A106A 076A5212 681E0000 30549A0E 35681E50 P.h5..T0...h.Rj.j.j.j.j.j..F±.P. 0001E0

Dump of file SATURN:[PCCOMMON.DUMP.DLL]INTAB.TMP;1 on 18-APR-1990 10:47:16.73
File ID (705,14,0)   End of file block 92 / Allocated 92

Virtual block number 28 (0000001C), 512 (0200) bytes

 49681E50 16FE468D Q06A006A 006A036A 046A086A 5212681E 00003072 9A0E4068 hə..r0...h.Rj.j.j.j.j.j..F±.P.hI 000000
 9A0E4C68 1E5016FE 468D006A 006A006A 026A106A 096A5212 681E0000 30909A0E ...0...h.Rj.j.j.j.j.j..F±.P.hL.. 000020
 2ECE9A0E 56681E50 16FE468D 006A006A 006A036A 046A0A6A 5212681E 000030AE Ù0...h.Rj.j.j.j.j.j..F±.P.hV..ö. 000040
 26FE4688 065EC400 0A0847C7 26065EC4 065F8C26 04478926 52128806 5EC40000 ..á^.¡.R&.G.&._.á^.&úG...á^..F±& 000060
 56570000 02C8CBC9 5F5E1F00 080E47C7 26065EC4 00290C47 C726065E C40A4789 .G.á^.&úG.).á^.&úG....^_èùà...WV 000080
 53B4681E 08C4832F 9F00009A 53B4681E 006A01C8 680028FE 46C7D88E 2F8A881E .¡./.ÁúF±(.hà.j..hÇS....¯/.á..hÇS 0000A0
 036A53B4 681E0000 31449A0E 5D681E50 16FE468D 006A006A 006A016A 046A026A j.j.j.j.j.j..F±.P.h]..D1...hÇSj. 0000C0
 086A046A 53B4681E 00003162 9A0E6A68 1E5016FE 468D006A 006A006A 016A086A j.j.j.j.j..F±.P.hj..b1...hÇSj.j. 0000E0
 016A086A 056A53B4 681E0000 31809A0E 6F681E50 16FE468D 006A006A 006A016A j.j.j.j..F±.P.ho...1...hÇSj.j.j. 000100
 006A016A 086A066A 53B4681E 0000319E 9A0E7A68 1E5016FE 468D006A 006A006A j.j.j..F±.P.hz...1...hÇSj.j.j.j. 000120
 006A006A 016A026A 076A53B4 681E0000 318C9A0E 86681E50 16FE468D 006A006A j.j..F±.P.h...¥1...hÇSj.j.j.j.j. 000140
 006A006A 006A036A 046A086A 53B4681E 000031DA 9A0E8E68 1E5016FE 468D006A j..F±.P.h...01...hÇSj.j.j.j.j.j. 000160
 468D006A 006A006A 036A046A 096A53B4 681E0000 31F89A0E 96681E50 16FE468D .F±.P.h...%1...hÇSj.j.j.j.j.j..F 000180
 16FE468D 006A006A 006A036A 046A0A6A 53B4681E 00003216 9A0E9968 1E5016FE ±.P.h....2...hÇSj.j.j.j.j.j..F±. 0001A0
 1E5016FE 468D006A 006A006A 036A046A 086A53B4 681E0000 32349A0E A1681E50 P.hÀ..42...hÇSj.j.j.j.j.j..F±.P. 0001C0
 C4000808 47C72606 5EC4065F 8C260447 892653B4 88065EC4 00002F8E 9A0EAB68 h¨..f/..á^.¡ÇS&.G.&._.á^.&úG...á 0001E0

Dump of file SATURN:[PCCOMMON.DUMP.DLL]INTAB.TMP;1 on 18-APR-1990 10:47:16.73
File ID (705,14,0)   End of file block 92 / Allocated 92

Virtual block number 29 (0000001D), 512 (0200) bytes

 C8C95F5E 1F00080L 47C72606 5EC4002A 0C47C726 065EC40A 478926FE 4688065E ^..F±&.G.á^.&úG.*.á^.&úG....^_èù 000000
 83310700 009A557L 581E006A 01566800 28FE46C7 088E30F2 881E5657 000002C8 à...WV.¡·0.ÁúF±(.hV.j..h|U....1. 000020
 000032CA 9A0E8468 1E5016FE 468D006A 006A006A 016A046A 026A557C 681E08C4 á..h|Uj.j.j.j.j.j..F±.P.hÇ..ò2.. 000040
 681E0000 32E89A0E C1681E50 16FE4680 006A006A 006A046A 2E6A036A 557C681E .h|Uj.j.j.j.j.j..F±.P.hè..Ò2...h 000060
 557C681E 00003306 9A0EC968 1E5016FE 468D006A 006A006A 016A026A 046A557C |Uj.j.j.j.j.j..F±.P.hè...3...h|U 000080
 066A557C 681E0000 33249A0E D1681E50 16FE4680 006A006A 006A046A 4C6A056A j.jLj.j.j.j..F±.P.hí..$3...h|Uj. 0000A0
 086A076A 557C681E 00003342 9A0ED968 1E5016FE 468D006A 006A006A 016A026A j.j.j.j.j..F±.P.h)..B3...h|Uj.j. 0000C0
 036A046A 086A557C 681E0000 33609A0E E1681E50 16FE4680 006A006A 006A016A j.j.j.j..F±.P.hÅ..'3...h|Uj.j.j. 0000E0
 8C260447 8926557C 88065EC4 00003126 9A0EE668 1E5016FE 468D006A 006A006A j.j.j..F±.P.hl..&1..á^.¡|U&.G.&. 000100
 56570000 00C8CBC9 5F5E1F0A 478926FE 4688065E C4000808 47C72606 5EC4065F _.á^.&úG...á^..F±&.G..^_èùà...WV 000120
 76FF0876 FF000033 8C9AFFFF 68338668 006A016A 0676FF08 76FF088E 3278881E ¯¡x2.Å.v...v.j.j.hÂ3h...¥3...v..v 000140
 FFFF6833 E068006A 036A0676 FF0876FF 00003301 9AFFFF68 33C86800 6A026A06 .j.j.hú3h...13...v..v.j.j.hÁ3h.. 000160
 0676FF08 76FF0000 33F89AFF FF6833F5 68006A04 6A0676FF 0876FF00 0033E69A .13...v..v.j.j.h%3h...«3...v..v. 000180
 9AFFFF68 341F6800 6A066A06 76FF0876 FF000034 109AFFFF 68340A68 006A056A j.j.h.4h....4...v..v.j.j.h.4h... 0001A0
 6A0676FF 0876FF00 00343A9A FFFF6834 3468006A 076A0676 FF0876FF 00003425 %4...v..v.j.j.h44h...:4...v..v.j 0001C0
 649AFFFF 68345E68 006A096A 0676FF08 76FF0000 344F9AFF FF683449 68006A08 .j.hI4h...O4...v..v.j.j.h^4h...d 0001E0
```

```
Dump of file SATURN:[PCCOMMON.DUMP.DLL]IMTAB.TMP;1 on 18-APR-1990 10:47:16.73
File ID (705,14,0)   End of file block 92 / Allocated 92

Virtual block number 30 (0000001E), 512 (0200) bytes

0B6A0676 FF0876FF 00003479 9AFFFF68 34736800 6A0A6A06 76FF0876 FF000034 4...v..v.j.j.hs4h...y4...v..v.j. 000000
34A39AFF FF683490 68006A0C 6A0676FF 0876FF00 00348E9A FFFF6834 8868006A j.h.4h....4...v..v.j.j.h.4h...É4 000020
6A0E6A06 76FF0876 FF0000FF FF9AFFFF 68FFFF68 006A006A 0676FF08 76FF0000 ...v..v.j.j.h..h........v..v.j.j 000040
0034E29A FFFF6834 DC68006A 0F6A0676 FF0876FF 000034CD 9AFFFF68 34C76800 .hú4h...ë4...v..v.j.j.hÉ4h...ä4. 000060
006A116A 0676FF08 76FF0000 34F79AFF FF6834F1 68006A10 6A0676FF 0876FF00 ..v..v.j.j.hþ4h...%4...v..v.j.j. 000080
00003521 9AFFFF68 351B6800 6A126A06 76FF0876 FF000035 0C9AFFFF 68350668 h.5h....5...v..v.j.j.h.5h...!5.. 0000A0
68006A14 6A0676FF 0876FF00 0035369A FFFF6835 3068006A 136A0676 FF0876FF .v..v.j.j.h05h...65...v..v.j.j.h 0000C0
FF000035 609AFFFF 68355A68 006A156A 0676FF08 76FF0000 35489AFF FF683545 E5h...K5...v..v.j.j.hZ5h...`5... 0000E0
8468006A 176A0676 FF0876FF 00003575 9AFFFF68 356F6800 6A166A06 76FF0876 v..v.j.j.ho5h...u5...v..v.j.j.h. 000100
76FF0000 359F9AFF FF683599 68006A18 6A0676FF 0876FF00 00358A9A FFFF6835 5h....5...v..v.j.j.h.5h....5...v 000120
35C36800 6A1A6A06 76FF0876 FF000035 B49AFFFF 6835AE68 006A196A 0676FF08 ..v.j.j.hú5h...Ç5...v..v.j.j.hú5 000140
0876FF00 0035DE9A FFFF6835 D868006A 1B6A0676 FF0876FF 000035C9 9AFFFF68 h...è5...v..v.j.j.hA5h...B5...v. 000160
002290C8 C95F5E1F 0000E900 00B80000 33A79AFF FF6833A1 68006A1C 6A0676FF .v.j.j.hÀ3h...I3..¡..Ô...^_èù.". 000180
30EA0001 35C60005 1F670001 34370005 1CE40001 33E30005 00000001 34B20002 ..ý4......D3..ð...74..g...ð5..ò0 0001A0
00000005 32B00002 2C710001 35480005 32700001 35DB0005 0FEE0001 33F80005 ..%3..Ý...Ù5..p2..H5..q,...2.... 0001C0
00000006 33920002 28F60001 35090005 03EE0005 32AC0203 28740001 35330005 ..35..t+..¯2..Ý....5..-(...3.... 0001E0
```

```
Dump of file SATURN:[PCCOMMON.DUMP.DLL]IMTAB.TMP;1 on 18-APR-1990 10:47:16.73
File ID (705,14,0)   End of file block 92 / Allocated 92

Virtual block number 31 (0000001F), 512 (0200) bytes

2F820001 35810005 03FA0005 34B80203 00000001 33A40005 29FF0001 351E0005 ...5...)..É3......¡4..ª...Ý5.../ 000000
088B0001 33B90005 15080001 34220005 19050001 33CE0005 00900001 2E890103 ..........ó3......"4.......¿3.... 000020
2D9E0001 355D0005 289A0001 34F40005 2E920001 359C0005 0E880001 35870005 ...5.......5.......¶4...(..]5...- 000040
002B0001 35720005 06A80001 34000005 23A70001 34760005 26260001 34A00005 ...4..&&..v4..!#...4..´...r5..(. 000060
22B50001 34610005 20340001 344C0005 14310001 34B50005 272C0001 34CA0005 ..ô4..,'..ç4..1...L4..4 ..a4..ç" 000080
1F02C483 FFFF0000 9A57D88E FFFFB81E 283E0001 34DF0005 25390001 34B80005 ...4..9%..Ô4..>(.¡...AW......á.. 0000A0
00000000 00000000 00000000 00000000 06000200 02000000 04000A00 020002C8 ù............................... 0000C0
83FFFF00 009A56D2 681E006A 017C6800 28FE46C7 D88EFFFF B81E5657 000002C8 à...WV.¡...ÄuF±(.h|.j..h@V...... 0000E0
0000005A 9A0EEE68 1E5016FE 468D006A 006A006A 016A046A 016A56D2 681E08C4 á..h@Vj.j.j.j.j.j..F±.P.hŸ..Z... 000100
681E0000 00789A0E F6681E50 16FE468D 006A006A 006A046A 4C6A026A 56D2681E .h@Vj.jLj.j.j.j..F±.P.h-..x....h 000120
56D2681E 000000S' 9A0EFB68 1E5016FE 468D006A 006A006A 026A106A 036A56D2 @Vj.j.j.j.j.j..F±.P.h«.......h@V 000140
056A56D2 681E00C  00849A0E FE681E50 16FE468D 006A006A 006A026A 106A046A j.j.j.j.j.j..F±.P.h±..Ç....h@Vj. 000160
106A066A 56D2681E 00000002 9A0F0268 1E5016FE 468D006A 006A006A 026A106A j.j.j.j.j..F±.P.h...@....h@Vj.j. 000180
026A106A 076A56D2 681E0000 00F09A0F 0E681E50 16FE468D 0F5A681E 006A026A j.j..hZ..F±.P.h...Þ....h@Vj.j.j. 0001A0
006A036A 046A086A 56D2681E 0000010E 9A0F1768 1E5016FE 46800F52 681E006A j..hR..F±.P.h........h@Vj.j.j.j. 0001C0
681E006A 026A106A 096A56D2 681E0000 012C9A0F 24681E50 16FE4680 0F4A681E .hJ..F±.P.h$..,....h@Vj.j.j.j..h 0001E0
```

```
Dump of file SATURN:[PCCOMMON.DUMP.DLL]IMTAB.TMP;1 on 18-APR-1990 10:47:16.73
File ID (705,14,0)   End of file block 92 / Allocated 92

Virtual block number 32 (00000020), 512 (0200) bytes

5728A30F 3A885726 1E8C5724 A30F3288 0000FFFF 9A0F2968 1E5016FE 468D0F62 b..F±.P.h)......¡2.ÈSW..&W¡:.È(W 000000
4688065E C4000908 47C72606 5EC4065F 8C260447 89265602 88065EC4 572A1E8C ..*Wó^.¡@V&.G.&._.á^.&úG...á^..F 000020
00001847 C726065E C4000616 47C72606 5EC40002 1047C726 065EC40A 478926FE ±&.G.á^.&úG...á^.&úG...á^.&úG... 000040
00FFFF9A 5052001A 05085688 06468813 6A106A00 0036FF26 21F4068E 006A006A j.j...¶!&.6..j.j..F..V....RP.... 000060
584E681E 006A0402 680028FE 46C7D88E 0008881E 56570000 02C8CBC9 5F5E1F00 ..^_èuà...WV.¡...ÄuF±(.h..j..hNX 000080
72681E50 16FE468D 006A006A 006A016A 046A016A 584E681E 08C48300 1D00009A ......á..hNXj.j.j.j.j.j..F±.P.hr 0000A0
9A0F7A68 1E5016FE 468D006A 006A006A 046A4C6A 026A584E 681E0000 02009A0F .......hNXj.jLj.j.j.j..F±.P.hz.. 0000C0
023C9A0F 7F681E50 16FE4680 1046681E 006A026A 106A036A 584E681E 0000021E .....hNXj.j.j.j..hF..F±.P.h...<. 0000E0
0000025A 9A0F8768 1E5016FE 4680104E 681E006A 026A106A 046A584E 681E0000 ...hNXj.j.j.j..hN..F±.P.h...Z... 000100
681E0000 02789A0F 93681E50 16FE4680 1056681E 006A026A 106A056A 584E681E .hNXj.j.j.j..hV..F±.P.h...x....h 000120
584E681E 00000296 9A0F9E68 1E5016FE 4680105E 681E006A 026A106A 066A584E NXj.j.j.j..h^..F±.P.h........hNX 000140
086A584E 681E0000 02849A0F A1681E50 16FE4680 1066681E 006A036A 046A076A j.j.j.j..hf..F±.P.hÀ..Ç....hNXj. 000160
106A096A 584E681E 000002D2 9A0FA468 1E5016FE 468D0F62 681E006A 026A106A j.j.j..hb..F±.P.hÊ..@....hNXj.j. 000180
036A046A 0A6A584E 681E0000 02F09A0F AD681E50 16FE4680 0F52681E 006A026A j.j..hR..F±.P.hÙ..Þ....hNXj.j.j. 0001A0
006A036A 046A086A 584E681E 0000030E 9A0FBA68 1E5016FE 468D0F4A 681E006A j..hJ..F±.P.hº.......hNXj.j.j.j. 0001C0
681E006A 036A046A 0C6A584E 681E0000 032C9A0F C2681E50 16FE4680 0F4A681E .hJ..F±.P.hò..,....hNXj.j.j.j..h 0001E0
```

```
Dump of file SATURN:[PCCOMMON.DUMP.DLL]IMTAB.TMP;1 on 18-APR-1990 10:47:16.73
File ID (705,14,0)   End of file block 92 / Allocated 92

Virtual block number 33 (00000021), 512 (0200) bytes

 006A006A 006A046A 4C6A006A 584E681E 0000034A 9A0FCA68 1E5016FE 4680OF4A J..F±.P.hò..J....hNXj.jLj.j.j.j. 000000
 4680006A 006A00oA 046A096A 0E6A584E 681E0000 03689A0F CF681E50 16FE4680 .F±.P.hü..h....hNXj.j.j.j.j.j..F 000020
 16FE4680 006A006' 006A016A 046A0F6A 584E681E 00000386 9A0FD768 1E5016FE ±.P.h■.......hNXj.j.j.j.j.j..F±. 000040
 1E5016FE 4680006  006A006A 016A026A 106A584E 681E0000 03A49A0F E1681E50 P.hÅ..Ê....hNXj.j.j.j.j.j..F±.P. 000060
 F3681E50 16FE4680 006A006A 006A016A 026A116A 584E681E 000003C2 9A0FEC68 h±..ô....hNXj.j.j.j.j.j..F±.P.hµ 000080
 9A0FFB68 1E5016FE 46800F5A 681E006A 026A106A 126A584E 681E0000 03E09A0F ..Å....hNXj.j.j.j..hZ..F±.P.h«.. 0000A0
 041C9A10 04681E50 16FE4680 106E681E 006A026A 106A136A 584E681E 000003FE ±....hNXj.j.j.j..hn..F±.P.h..... 0000C0
 0000043A 9A100868 1E5016FE 4680006A 006A006A 016A026A 146A584E 681E0000 ...hNXj.j.j.j.j.j..F±.P.h...:... 0000E0
 681E0000 04589A10 16681E50 16FE4680 1076681E 006A036A 046A156A 584E681E .hNXj.j.j.j..hv..F±.P.h...X....h 000100
 584E681E 00000476 9A101E68 1E5016FE 4680107E 681E006A 026A106A 166A584E NXj.j.j.j..h~..F±.P.h...v....hNX 000120
 186A584E 681E0000 04949A10 26681E50 16FE4680 1086681E 006A026A 106A176A j.j.j.j..h...F±.P.h&.......hNXj. 000140
 046A196A 584E681E 00000482 9A102E68 1E5016FE 4680006A 006A006A 016A046A j.j.j.j.j..F±.P.h...ý....hNXj.j. 000160
 026A106A 1A6A584E 681E0000 04D09A10 34681E50 16FE4680 006A006A 006A016A j.j.j.j..F±.P.h4..Å....hNXj.j.j. 000180
 3AB858A2 1E8C58A0 A30F3288 0000003C 9A103868 1E5016FE 46800F4A 681E006A j..hJ..F±.P.h;..<...¡2.È.X..ÅX¡: 0001A0
 C4001A08 47C72606 5EC4065F 8C260447 8926584E B8065EC4 58A61E8C 58A4A30F .ÈÊX..ÎXâ^.¡NX&.G.&._.á^.&úG...á 0001C0
 C726065E C4001216 47C72606 5EC40002 1047C726 065EC40A 478926FE 4688065E ^..F±&.G.á^.&úG...á^.&úG...á^.&ú 0001E0

Dump of file SATURN:[PCCOMMON.DUMP.DLL]IMTAB.TMP;1 on 18-APR-1990 10:47:16.73
File ID (705,14,0)   End of file block 92 / Allocated 92

Virtual block number 34 (00000022), 512 (0200) bytes

 5052001A 05085688 06468813 6A016A00 0036FF26 21F4068E 006A006A 00011847 G...j.j...¶I&.6..j.j..F..V....RP 000000
 006A023A 680028FE 46C7D88E 01AE881E 56570000 02C8C8C9 5F5E1F00 00019D9A ......^_èûà...WV.¡Û..ÁúF±(.h:.j. 000020
 16FE4680 006A006A 006A046A 4C6A016A 5C50681E 08C48301 C300009A 5C50681E .hP\...Ũ..á..hP\j.jLj.j.j.j..F±. 000040
 1E5016FE 4680006A 006A006A 016A046A 026A5C50 681E0000 05A49A10 8E681E50 P.h...Ê....hP\j.j.j.j.j.j..F±.P. 000060
 98681E50 16FE4680 006A006A 006A016A 106A036A 5C50681E 000005C2 9A109368 h...ô....hP\j.j.j.j.j.j..F±.P.h. 000080
 9A10A368 1E5016FE 468010FA 681E006A 026A106A 046A5C50 681E0000 05E09A10 ..Å....hP\j.j.j.j..h°..F±.P.hÈ.. 0000A0
 061C9A10 AA681E50 16FE4680 1102681E 006A026A 106A056A 5C50681E 000005FE ±....hP\j.j.j.j..h...F±.P.h^.... 0000C0
 0000063A 9A108268 1E5016FE 46800F62 681E006A 026A106A 066A5C50 681E0000 ...hP\j.j.j.j..hb..F±.P.hý..:... 0000E0
 681E0000 06589A10 88681E50 16FE4680 0F52681E 006A026A 106A076A 5C50681E .hP\j.j.j.j..hR..F±.P.h£..X....h 000100
 5C50681E 00000676 9A10C868 1E5016FE 4680006A 006A006A 016A026A 086A5C50 P\j.j.j.j.j.j..F±.P.hà..v....hP\ 000120
 0A6A5C50 681E0000 06949A10 CD681E50 16FE4680 006A006A 006A026A 106A096A j.j.j.j.j.j..F±.P.hë.......hP\j. 000140
 046A086A 5C50681E 00000682 9A100868 1E5016FE 4680110A 681E026A 036A046A j.j.j..h...F±.P.hA..ý....hP\j.j. 000160
 016A026A 0C6A5C50 681E0000 06D09A10 DC681E50 16FE4680 0F4A681E 006A036A j.j..hJ..F±.P.hÉ..Å....hP\j.j.j. 000180
 006A026A 106A006A 5C50681E 000006EE 9A10E168 1E5016FE 4680006A 006A006A j.j.j..F±.P.hÃ..Ÿ....hP\j.j.j.j. 0001A0
 681E006A 026A106A 0E6A5C50 681E0000 070C9A10 E8681E50 16FE4680 0F5A681E .hZ..F±.P.hÒ.......hP\j.j.j.j..h 0001C0
 5C80A30F 3AB85C7E 1E8C5C7C A30F3288 000001E2 9A10F168 1E5016FE 46800F6A j..F±.P.hþ..ã...¡2.È|\..~\¡:.È.\ 0001E0

Dump of file SATURN:[PCCOMMON.DUMP.DLL]IMTAB.TMP;1 on 18-APR-1990 10:47:16.73
File ID (705,14,0)   End of file block 92 / Allocated 92

Virtual block number 35 (00000023), 512 (0200) bytes

 4688065E C4000E08 47C72606 5EC4065F 8C260447 89265C50 88065EC4 5C821E8C ...\á^.¡P\&.G.&._.á^.&úG...á^..F 000000
 00011847 C726065E C4000016 47C72606 5EC40001 1047C726 065EC40A 478926FE ±&.G.á^.&úG...á^.&úG...á^.&úG... 000020
 0005419A 5052001A 05085688 06468813 6A026A00 0036FF26 21F4068E 006A006A j.j...¶I&.6..j.j..F..V....RP.A.. 000040
 5E8A681E 006A02D2 680028FE 46C7D88E 0552881E 56570000 02C8C8C9 5F5E1F00 ..^_èûà...WV.¡R..ÁúF±(.h®.j..h.^ 000060
 12681E50 16FE4680 006\006A 006A046A 4C6A016A 5E8A681E 08C48305 6700009A ...g..á..h.^j.jLj.j.j.j..F±.P.h. 000080
 9A111768 1E5016FE 4680006A 006A006A 016A046A 026A5E8A 681E0000 07^^9A11 ..Å....h.^j.j.j.j.j.j..F±.P.h... 0000A0
 081C9A11 1F681E50 16FE4680 11AE681E 026A036A 046A036A 5E8A681E 000( 7FE ±....h.^j.j.j.j..hÛ..F±.P.h..... 0000C0
 0000083A 9A112668 1E5016FE 4680118E 681E026A 026A106A 046A5E8A 681E· 00 ...h.^j.j.j.j..h/..F±.P.h&..:... 0000E0
 681E0000 08589A11 32681E50 16FE4680 1106681E 006A026A 106A056A 5E8A681E .h.^j.j.j.j..h●..F±.P.h2..X....h 000100
 5E8A681E 00000876 9A113868 1E5016FE 46800F62 681E006A 026A106A 066A5E8A .^j.j.j.j..hb..F±.P.h;..v....h.^ 000120
 086A5E8A 681E0000 08949A11 44681E50 16FE4680 0F52681E 006A026A 106A076A j.j.j.j..hR..F±.P.hD.......h.^j. 000140
 046A096A 5E8A681E 00000882 9A115168 1E5016FE 46800F4A 681E006A 036A046A j.j.j..hJ..F±.P.hQ..ý....h.^j.j. 000160
 036A046A 0A6A5E8A 681E0000 08D09A11 5C681E50 16FE4680 0F4A681E 006A036A j.j..hJ..F±.P.h\..Å....h.^j.j.j. 000180
 006A036A 046A086A 5E8A681E 000008EE 9A116468 1E5016FE 468011CE 681E026A j..hö..F±.P.hd..Ÿ....h.^j.j.j.j. 0001A0
 006A006A 036A046A 0E6A5E8A 681E0000 090C9A11 68681E50 16FE4680 0F4A681E .hJ..F±.P.hh.......h.^j.j.j.j.j. 0001C0
 006A006A 006A016A 026A0C6A 5E8A681E 00000586 9A116068 1E5016FE 4680006A j..F±.P.hm.......h.^j.j.j.j.j.j. 0001E0
```

```
Dump of file SATURN:[PCCOMMON.DUMP.DLL]INTAB.TMP;1 on 18-APR-1990 10:47:16.73
File ID (705,14,0)   End of file block 92 / Allocated 92

Virtual block number 36 (00000024), 512 (0200) bytes

 46800F5A 681E006A 026A106A 006A5E8A 681E0000 09489A11 73681E50 16FE468D .Fz.P.hs..N....h.^j.j.j.j..h2..F 000000
 16FE468D 11DE681E 006A026A 106A0F6A 5E8A681E 00000966 9A117A68 1E5016FE z.P.hz..f....h.^j.j.j.j..hB..Fz. 000020
 1E5016FE 46800C6A 006A006A 016A026A 106A5E8A 681E0000 09849A11 83681E50 P.h........h.^j.j.j.j.j.j..Fz.P. 000040
 97681E50 16FE468D 11DE681E 006A026A 106A116A 5E8A681E 000009A2 9A119168 h...Å....h.^j.j.j.j..hB..Fz.P.h. 000060
 9A11A568 1E5016FE 4680006A 006A006A 016A086A 126A5E8A 681E0000 09C09A11 ..á....h.^j.j.j.j.j.j..Fz.P.hÉ.. 000080
 89265E8A 88065EC( 5E8C1E8C 5E8AA30F 3A885E88 1E8C5E86 A30F3288 000007C2 ó...¡2.ÉÑ^..¡^¡:.Èo^..¥^á^.¡.^&. 0000A0
 1047C726 065EC40A 478926FE 4688065E C4001208 47C72606 5EC4065F 8C260447 G.&._.á^.&úG...á^..Fz&.G.á^.&úG. 0000C0
 0036FF26 21F4068E 006A006A 00011847 C726065E C4000016 47C72606 5EC40001 ..á^‾&úG...á^.&úG...j.j...¶l&.6. 0000E0
 56570000 02C8CBC9 5F5E1F00 00077D9A 5052001A 05085688 06468813 6A036A00 .j.j..F..V....RP.)....^_èùà...WV 000100
 615C681E 08C48307 A300009A 615C681E 006A008E 680028FE 46C7D88E 078E881E .¡...ÄúFz(.h/.j..h\a...Ē..á..h\a 000120
 026A615C 681E0000 0A949A11 E6681E50 16FE468D 006A006A 006A016A 086A016A j.j.j.j.j.j..Fz.P.hl.......h\aj. 000140
 046A036A 615C681E 00000A82 9A11EC68 1E5016FE 4680006A 006A006A 016A026A j.j.j.j.j..Fz.P.hš..ý....h\aj.j. 000160
 036A046A 046A615C 681E0000 0AD09A11 F1681E50 16FE468D 006A006A 006A016A j.j.j.j..Fz.P.hþ..Å....h\aj.j.j. 000180
 8C260447 8926615C 88065EC4 0000092A 9A11F968 1E5016FE 46801200 681E006A j..h...Fz.P.h*..*...á^.¡\a&.G.&. 0001A0
 006A0000 1847C726 065EC40A 478926FE 4688065E C4000408 47C72606 5EC4065F _.á^.&úG...á^..Fz&.G.á^.&úG...j. 0001C0
 1F00000A 319A5052 001A0508 56880646 88136A04 6A000036 FF2621F4 068E006A J...¶l&.6..j.j..F..V....RP.1.... 0001E0

Dump of file SATURN:[PCCOMMON.DUMP.DLL]INTAB.TMP;1 on 18-APR-1990 10:47:16.73
File ID (705,14,0)   End of file block 92 / Allocated 92

Virtual block number 37 (00000025), 512 (0200) bytes

 009A621A 681E006A 02F86800 28FE46C7 D88E0A42 881E5657 000002C8 CBC95F5E ^_èùà...WV.¡B..ÄúFz(.h%.j..h.b.. 000000
 9A120868 1E5016FE 4680006A 006A006A 046A4C6A 016A621A 681E08C4 830A5700 .Ū..á..h.bj.jLj.j.j.j..Fz.P.h... 000020
 0B9C9A12 00681E50 16FE468D 006A006A 006A016A 046A026A 621A681E 00000B7E -....h.bj.j.j.j.j.j..Fz.P.h..... 000040
 00000BBA 9A121568 1E5016FE 4680006A 006A006A 016A106A 036A621A 681E0000 ...h.bj.j.j.j.j.j..Fz.P.h...a... 000060
 681E0000 08D89A12 1D681E50 16FE468D 129A681E 006A026A 106A046A 621A681E .h.bj.j.j.j..h...Fz.P.h...Å....h 000080
 621A681E 00000BF6 9A122468 1E5016FE 468012A2 681E006A 026A106A 056A621A .bj.j.j.j..hÅ..Fz.P.h$..-....h.b 0000A0
 076A621A 681E0000 0C149A12 2C681E50 16FE468D 006A006A 006A036A 046A066A j.j.j.j.j.j..Fz.P.h,.......h.bj. 0000C0
 106A086A 621A681E 00000C32 9A123568 1E5016FE 46800F62 681E006A 026A106A j.j.j..hb..Fz.P.h5..2....h.bj.j. 0000E0
 016A026A 096A621A 681E0000 0C509A12 3E681E50 16FE468D 0F52681E 006A026A j.j..hR..Fz.P.h>..P....h.bj.j.j. 000100
 006A036A 046A0A6A 621A681E 00000C6E 9A124868 1E5016FE 4680006A 006A006A j.j.j..Fz.P.hK..n....h.bj.j.j.j. 000120
 681E006A 036A046A 086A621A 681E0000 0C8C9A12 52681E50 16FE468D 006A006A j.j..Fz.P.hR.......h.bj.j.j.j..h 000140
 12AA681E 026A036A 046A0C6A 621A681E 00000CAA 9A125868 1E5016FE 46800F4A J..Fz.P.h(..‾....h.bj.j.j.j..h‾. 000160
 46800F4A 681E006A 036A046A 006A621A 681E0000 0CC89A12 63681E50 16FE468D .Fz.P.hc..à....h.bj.j.j.j..hJ..F 000180
 16FE468D 006A006A 006A016A 026A0E6A 621A681E 00000CE6 9A126768 1E5016FE z.P.hg..l....h.bj.j.j.j.j.j..Fz. 0001A0
 1E5016FE 46800F5A 681E006A 026A106A 0F6A621A 681E0000 00049A12 6[illegible]1E50 P.hl.......h.bj.j.j.j..h2..Fz.P. 0001C0
 7C681E50 16FE468D 006A006A 006A016A 046A116A 621A681E 00000022 9A1[illegible]368 hs..*....h.bj.j.j.j.j.j..Fz.P.h| 0001E0

Dump of file SATURN:[PCCOMMON.DUMP.DLL]INTAB.TMP;1 on 18-APR-1990 10:47:16.73
File ID (705,14,0)   End of file block 92 / Allocated 92

Virtual block number 38 (00000026), 512 (0200) bytes

 9A128368 1E5016FE 468012B2 681E006A 026A106A 126A621A 681E0000 0D409A12 ..a....h.bj.j.j.j..hý..Fz.P.h... 000000
 0A769A12 91681E50 16FE468D 0F6A681E 006A026A 106A136A 621A681E 0000005E ^....h.bj.j.j.j..hj..Fz.P.h...v. 000020
 04478926 621A8806 5EC4624C 1E8C624A A30F3A88 62481E8C 6246A30F 32880000 ..¡2.Èfb..Hb¡:.ÈJb..Lbá^.¡.b&.G. 000040
 00011047 C726065E C40A4789 26FE4688 065EC400 130847C7 26065EC4 065F8C26 &._.á^.&úG...á^..Fz&.G.á^.&úG... 000060
 6A000036 FF2621F4 068E006A 006A0001 1847C726 065EC400 0F1647C7 26065EC4 á^‾&úG...á^.&úG...j.j...¶l&.6..j 000080
 881E5657 000002C8 CBC95F5E 1F00000B 189A5052 001A0508 56880646 88136A05 .j..F..V....RP......^_èùà...WV.¡ 0000A0
 016A6512 681E08C4 83084100 009A6512 681E006A 05326800 28FE46C7 D88E082C ,..ÄúFz(.h2.j..h.e...Ā..á..h.ej. 0000C0
 046A026A 6512681E 00000E32 9A128A68 1E5016FE 4680006A 006A006A 046A4C6A jLj.j.j.j..Fz.P.ho..2....h.ej.j. 0000E0
 016A106A 036A6512 681E0000 0E509A12 8F681E50 16FE468D 006A006A 006A016A j.j.j.j..Fz.P.he..P....h.ej.j.j. 000100
 026A036A 046A046A 6512681E 00000E6E 9A12C768 1E5016FE 4680006A 006A006A j.j.j..Fz.P.hú..n....h.ej.j.j.j. 000120
 681E006A 026A106A 056A6512 681E0000 0E8C9A12 CF681E50 16FE468D 13CE681E .hö..Fz.P.hü.......h.ej.j.j.j..h 000140
 006A006A 006A016A 026A066A 6512681E 00000EAA 9A120668 1E5016FE 46801306 ■..Fz.P.h■..‾....h.ej.j.j.j.j.j. 000160
 46800F62 681E006A 026A106A 076A6512 681E0000 0EC89A12 DC681E50 16FE468D .Fz.P.hÉ..à....h.ej.j.j.j..hb..F 000180
 16FE468D 0F52681E 006A026A 106A086A 6512681E 00000EE6 9A12E668 1E5016FE z.P.hl..l....h.ej.j.j.j..hR..Fz. 0001A0
 1E5016FE 4680006A 006A006A 016A046A 096A6512 681E0000 0F049A12 EF681E50 P.hý.......h.ej.j.j.j.j.j..Fz.P. 0001C0
 03681E50 16FE468D 006A006A 006A036A 046A0A6A 6512681E 00000F22 9A12FC68 h■..*....h.ej.j.j.j.j.j..Fz.P.h. 0001E0
```

```
Dump of file SATURN:[PCCOMMON.DUMP.DLL]INTAB.TMP;1 on 18-APR-1990 10:47:16.73
File ID (705,14,0)   End of file block 92 / Allocated 92

Virtual block number 39 (00000027), 512 (0200) bytes

 9A130868 1E5016FE 4680F4A 681E006A 026A106A 086A6512 681E0000 0F409A13 ..a....h.ej.j.j.j..hJ..F±.P.h... 000000
 0F7C9A13 14681E50 16FE468D 0F4A681E 006A036A 046A0C6A 6512681E 00000F5E ^....h.ej.j.j.j..hJ..F±.P.h...|. 000020
 00000F9A 9A131D68 1E5016FE 468D006A 006A006A 036A046A 006A6512 681E0000 ...h.ej.j.j.j.j.j..F±.P.h....... 000040
 681E0000 0F889A13 26681E50 16FE468D 0F4A681E 006A036A 046A0E6A 6512681E .h.ej.j.j.j..hJ..F±.P.h&..¡....h 000060
 6512681E 00000F06 9A133068 1E5016FE 468D1406 681E006A 036A046A 0F6A6512 .ej.j.j.j..h...F±.P.h0..ø....h.e 000080
 116A6512 681E0000 0F‾49A13 34681E50 16FE468D 130E681E 026A036A 046A106A j.j.j.j..h8..F±.P.h4..¶....h.ej. 0000A0
 106A126A 6512681E 00001012 9A133868 1E5016FE 4680F4A 681E006A 0‾‘4046A j.j.j..hJ..F±.P.h8.......h.ej.j. 0000C0
 026A106A 136A6512 681E0000 10309A13 3D681E50 16FE468D 13E6681E 006.‘26A j.j..hl..F±.P.h=..0....h.ej.j.j. 0000E0
 006A026A 106A146A 6512681E 0000104E 9A134468 1E5016FE 468D13EE 681E‿06A j..hŸ..F±.P.hD..N....h.ej.j.j.j. 000100
 006A006A 016A026A 156A6512 681E0000 106C9A13 4C681E50 16FE468D 006A006A j.j..F±.P.hL..l....h.ej.j.j.j.j. 000120
 0F5A681E 006A026A 106A166A 6512681E 0000108A 9A135868 1E5016FE 468D006A j..F±.P.hX.......h.ej.j.j.j..hZ. 000140
 468D006A 006A006A 026A106A 186A6512 681E0000 10A89A13 5F681E50 16FE468D .F±.P.h_..´....h.ej.j.j.j.j.j..F 000160
 16FE468D 140E681E 006A026A 106A176A 6512681E 000010C6 9A136868 1E5016FE ±.P.hh.‾6....h.ej.j.j.j..h...F±. 000180
 1E5016FE 468D006A 006A006A 016A026A 196A6512 681E0000 10E49A13 76681E50 P.hv..ö....h.ej.j.j.j.j.j..F±.P. 0001A0
 84681E50 16FE468D 006A006A 006A016A 026A1A6A 6512681E 00001102 9A137D68 h)......h.ej.j.j.j.j.j..F±.P.h. 0001C0
 9A138A68 1E5016FE 468D006A 006A006A 016A026A 1B6A6512 681E0000 11209A13 .. ....h.ej.j.j.j.j..F±.P.h... 0001E0
```

```
Dump of file SATURN:[PCCOMMON.DUMP.DLL]INTAB.TMP;1 on 18-APR-1990 10:47:16.73
File ID (705,14,0)   End of file block 92 / Allocated 92

Virtual block number 40 (00000028), 512 (0200) bytes

 115C9A13 94681E50 16FE468D 13F6681E 006A036A 046A1C6A 6512681E 00000B60 '....h.ej.j.j.j..h÷..F±.P.h...\. 000000
 0000117A 9A139A68 1E5016FE 468D13FE 681E006A 036A046A 106A6512 681E0000 ...h.ej.j.j.j..h±..F±.P.h...z... 000020
 681E0000 11989A13 A2681E50 16FE468D 006A006A 006A016A 046A1E6A 6512681E .h.ej.j.j.j.j.j..F±.P.hÅ.......h 000040
 6512681E 000011B6 9A13A968 1E5016FE 468D0F6A 681E006A 026A106A 1F6A6512 .ej.j.j.j..hj..F±.P.h`..Ñ....h.e 000060
 216A6512 681E0000 11D49A13 B2681E50 16FE468D 006A006A 006A016A 026A206A j j.j.j.j.j..F±.P.hý..å....h.ej! 000080
 046A226A 6512681E 000011F2 9A13B768 1E5016FE 468D006A 006A006A 016A026A j.j.j.j.j..F±.P.hñ..·....h.ej"j. 0000A0
 65401E8C 653EA30F 32B80000 0E149A13 C1681E50 16FE468D 0F4A681E 006A036A j.j..hJ..F±.P.hë......¡2.È>e..ãe 0000C0
 8C260447 89266512 B8065EC4 65B61E8C 65B4A30F 42B86544 1E8C6542 A30F3AB8 ¡:.ÈBe..De¡B.ÈÇe..Ñeá^.¡.e&.G.&. 0000E0
 5EC40001 1047C726 065EC40A 478926FE 46B8065E C4002208 47C72606 5EC4065F _.á^.&úG.".á^..F±&.G.á^.&úG...á^ 000100
 6A076A00 0036FF26 21F4068E 006A006A 00011847 C726065E C4001616 47C72606 ‾&úG...á^.&úG...j.j...¶!&.6..j.j 000120
 00E0881E 56570000 02C8CBC9 5F5E1F00 000DCF9A 5052001A 05085688 06468813 ..F..V....RP.ü....^_èùà...WV.¡Å. 000140
 206A016A 6A44681E 08C4830D F500009A 6A44681E 006A01A2 680028FE 46C7D88E .Aúf±(.hÅ.j..hDj...Ï..á..hDjj.j 000160
 036A046A 026A6A44 681E0000 12D09A14 1E681E50 16FE468D 006A006A 006A046A j.j.j.j..F±.P.h...Å....hDjj.j.j. 000180
 006A026A 106A036A 6A44681E 000012EE 9A142368 1E5016FE 468D1478 681E006A j..hx..F±.P.h#..Ÿ....hDjj.j.j.j. 0001A0
 681E006A 026A106A 046A6A44 681E0000 130C9A14 20681E50 16FE468D 1480681E .h...F±.P.h·.......hDjj.j.j.j..h 0001C0
 006A006A 006A016A 026A056A 6A44681E 0000132A 9A143968 1E5016FE 468D1488 ...F±.P.h9..*....hDjj.j.j.j.j.j. 0001E0
```

```
Dump of file SATURN:[PCCOMMON.DUMP.DLL]INTAB.TMP;1 on 18-APR-1990 10:47:16.73
File ID (705,14,0)   End of file block 92 / Allocated 92

Virtual block number 41 (00000029), 512 (0200) bytes

 468D006A 006A006A 036A106A 066A6A44 681E0000 13489A14 42681E50 16FE468D .F±.P.hB..H....hDjj.j.j.j.j.j..F 000000
 16FE468D 1490681E 006A026A 106A076A 6A44681E 00001366 9A144968 1E5016FE ±.P.hI..f....hDjj.j.j.j..h...F±. 000020
 1E5016FE 468D006A 006A006A 016A046A 086A6A44 681E0000 13849A14 51681E50 P.hQ.......hDjj.j.j.j.j.j..F±.P. 000040
 5C681E50 16FE468D 006A006A 006A016A 026A096A 6A44681E 000013A2 9A145568 hU..Å....hDjj.j.j.j.j.j..F±.P.h\ 000060
 9A146868 1E5016FE 468D006A 006A006A 016A026A 0A6A6A44 681E0000 13C09A14 ..å....hDjj.j.j.j.j.j..F±.P.hk.. 000080
 46B8065E C4000A08 47C72606 5EC4065F 8C260447 89266A44 B8065EC4 0000113E >...á^.¡Dj&.G.&._.á^.&úG...á^..F 0000A0
 2621F406 8E006A00 6A000018 47C72606 5EC40001 1047C726 065EC40A 478926FE ±&.G.á^.&úG...á^‾&úG...j.j...¶!& 0000C0
 0002C8C8 C95F5E1F 0000126D 9A505200 1A050856 88064688 136A086A 000036FF .6..j.j..F...V....RP.m....^_èùà.. 0000E0
 1E08C483 12930000 9A68E668 1E006A01 56680028 FE46C7D8 8E127EB8 1E565700 .WV.¡-..ÅúF±(.hV.j..hlk......á.. 000100
 E6681E00 0014779A 14AC681E 5016FE46 80006A00 6A006A04 6A206A01 6A68E668 hlkj.j j.j.j.j..F±.P.h‾..w....hl 000120
 6A68E668 1E000014 959A1481 681E5016 FE468014 EC681E00 6A036A04 6A026A68 kj.j.j.j..h&..F±.P.hŸ.......hlkj 000140
 6A046A68 E6681E00 0014B39A 14BE681E 5016FE46 8014F468 1E006A02 6A106A03 .j.j.j..h¶..F±.P.h/..°....hlkj.j 000160
 6A046A05 6A68E668 1E000014 D19A14C7 681E5016 FE468014 FC681E00 6A036A04 .j.j..h=..F±.P.hú..ì....hlkj.j.j 000180
 6A016A02 6A066A68 E6681E00 0014EF9A 14D1681E 5016FE46 80006A00 6A006A03 .j.j.j..F±.P.hl..ÿ....hlkj.j.j.j 0001A0
 1E006A03 6A046A07 6A68E668 1E000015 009A14D5 681E5016 FE468000 6A006A00 .j.j..F±.P.hí.......hlkj.j.j.j.. 0001C0
 6A006A00 6A016A02 6A086A68 E6681E00 0015289A 14DC681E 5016FE46 80150468 h...F±.P.hÉ..+....hlkj.j.j.j.j.j 0001E0
```

```
Dump of file SATURN:[PCCOMMON.DUMP.DLL]INTAB.TMP;1 on 18-APR-1990 ':47:16.73
File ID (705,14,0)   End of file block 92 / Allocated 92

Virtual block number 42 (0000002A), 512 (0200) bytes

 065EC406 5F8C2604 47892668 E6B8065E C4000012 B29A14E6 681E5016 FE468000 ..F±.P.h|..ÿ...á^.¡lk&.G.&._.á^. 000000
 1847C726 065EC400 011047C7 26065EC4 0A478926 FE468806 5EC40008 0847C726 &úG...á^..F±&.G.á^.&úG...á^¯&úG. 000020
 149A5052 001A0508 56880646 88136A0C 6A000036 FF2621F4 068E006A 006A0000 ..j.j...¶!&.6..j.j..F..V....RP.. 000040
 681E006A 017C6800 28FE46C7 D88E1425 881E5657 000002C8 CBC95F5E 1F000014 ....^_èùà...WV.¡%..ÁúF±(.h|.j..h 000060
 1E5016FE 4680006A 006A006A 046A206A 016A603C 681E08C4 83143A00 009A603C <m...:..á..h<mj.j j.j.j.j..F±.P. 000080
 11681E50 16FE468D 154E681E 006A036A 046A026A 6D3C681E 000015E2 9A150C68 h...â....h<mj.j.j.j..hN..F±.P.h. 0000A0
 9A151E68 1E5016FE 468D1556 681E006A 036A046A 036A603C 681E0000 16009A15 .......h<mj.j.j.j..hV..F±.P.h... 0000C0
 163C9A15 28681E50 16FE468D 1566681E 006A036A 046A046A 6D3C681E 0000161E .....h<mj.j.j.j..hf..F±.P.h(..<. 0000E0
 0000165A 9A152E68 1E5016FE 4680006A 006A006A 016A046A 056A603C 681E0000 ..h<mj.j.j.j.j.j..F±.P.h...Z... 000100
 681E0000 14599A15 33681E50 16FE468D 155E681E 006A036A 046A066A 6D3C681E .h<mj.j.j.j..h^..F±.P.h3..Y....h 000120
 6D3C681E 00001696 9A153A68 1E5016FE 4680006A 006A006A 036A046A 076A603C <mj.j.j.j.j.j..F±.P.h:.......h<m 000140
 096A6D3C 681E0000 16849A15 3E681E50 16FE468D 006A006A 006A016A 026A086A j.j.j.j.j.j..F±.P.h>..Ç....h<mj. 000160
 89266D3C 88065EC4 000015C4 9A154568 1E5016FE 468D1572 681E006A 036A046A j.j.j..hr..F±.P.hE..á....á^.¡<m&. 000180
 1047C726 065EC40A 478926FE 4688065E C4000908 47C72606 5EC4065F 8C260447 G.&._.á^.&úG...á^..F±&.G.á^.&úG. 0001A0
 88064688 136A006A 000036FF 2621F406 8E006A00 6A000018 47C72606 5EC40001 ..á^¯&úG...j.j...¶!&.6..j.j..F.. 0001C0
 FE46C7D8 8E159088 1E565700 0002C8CB C95F5E1F 0000157F 9A505200 1A050856 V....RP......^_èùà...WV.¡...ÁúF± 0001E0

Dump of file SATURN:[PCCOMMON.DUMP.DLL]INTAB.TMP;1 on 18-APR-1990 10:47:16.73
File ID (705,14,0)   End of file block 92 / Allocated 92

Virtual block number 43 (0000002B), 512 (0200) bytes

 6A006A04 6A206A01 6A6EB868 1E08C483 15A50000 9A6EB868 1E006A00 E4680028 (.hô.j..h¡n...E..á..h¡nj.j j.j.j 000000
 9E681E00 6A036A04 6A026A6E B8681E00 0017689A 157A681E 5016FE46 8D006A00 .j..F±.P.hz..k....h¡nj.j.j.j..h. 000020
 8D15A668 1E006A02 6A106A03 6A6EB868 1E000017 899A157F 681E5016 FE468D15 ..F±.P.h........h¡nj.j.j.j..hÎ.. 000040
 FE468D15 AE681E00 6A026A10 6A046A6E B8681E00 0017A79A 1587681E 5016FE46 F±.P.h...Î....h¡nj.j.j.j..hÛ..F± 000060
 5016FE46 8D006A00 6A006A01 6A026A05 6A6EB868 1E000017 C59A1590 681E5016 .P.h...é....h¡nj.j.j.j.j.j..F±.P 000080
 00050847 C726065E C4065F8C 26044789 266E8888 065EC400 0016789A 1596681E .h...x...á^.¡¡n&.G.&._.á^.&úG... 0000A0
 006A006A 00001847 C726065E C4000110 47C72606 5EC40A47 8926FE46 88065EC4 á^..F±&.G.á^.&úG...á^¯&úG...j.j. 0000C0
 5F5E1F00 0017089A 5052001A 05085688 06468813 6A126A00 0036FF26 21F4068E ..¶!&.6..j.j..F..V....RP......^_ 0000E0
 2E00009A 6F9C681E 006A0130 680028FE 46C7D88E 1719881E 56570000 02C8CBC9 èùà...WV.¡...ÁúF±(.h0.j..h.o...¯ 000100
 187C9A15 86681E50 16FE468D 006A006A 006A046A 206A016A 6F9C681E 08C48317 ..á..h.oj.j j.j.j.j..F±.P.hÑ..|. 000120
 0000189A 9A15B868 1E5016FE 468D15EA 681E006A 036A046A 026A6F9C 681E0000 ...h.oj.j.j.j..hõ..F±.P.hÊ...... 000140
 681E0000 18B89A15 C8681E50 16FE468D 15F2681E 006A026A 106A036A 6F9C681E .h.oj.j.j.j..h..F±.P.hà..¡....h 000160
 6F9C681E 000018D6 9A15D168 1E5016FE 4680006A 006A006A 036A046A 046A6F9C .oj.j.j.j.j.j..F±.P.hÍ..ø....h.o 000180
 066A6F9C 681E0000 18F49A15 D8681E50 16FE468D 15FA681E 006A036A 046A056A j.j.j.j..hª..F±.P.hU..¶....h.oj. 0001A0
 106A076A 6F9C681E 00001912 9A15DF68 1E5016FE 4680006A 006A006A 016A026A j.j.j.j.j..F±.P.hÔ.......h.oj.j. 0001C0
 04478926 6F9CB806 5EC40000 174D9A15 E6681E50 16FE468D 006A006A 006A026A j.j.j.j..F±.P.h|..M...á^.¡.o&.G. 0001E0

Dump of file SATURN:[PCCOMMON.DUMP.DLL]INTAB.TMP;1 on 18-APR-1990 10:47:16.73
File ID (705,14,0)   End of file block 92 / Allocated 92

Virtual block number 44 (0000002C), 512 (0200) bytes

 00011047 C726065E C40A4789 26FE4688 065EC400 070847C7 26065EC4 065F8C26 &._.á^.&úG...á^..F±&.G.á^.&úG... 000000
 08568806 4688136A 136A0000 36FF2621 F4068E00 6A006A00 001847C7 26065EC4 á^¯&úG...j.j...¶!&.6..j.j..F..V. 000020
 0028FE46 C7D88E18 2A881E56 57000002 C8CBC95F 5E1F0000 18199A50 52001A05 ...RP......^_èùà...WV.¡*..ÁúF±(. 000040
 6A006A00 6A046A20 6A016A70 CC681E08 C483183F 00009A70 CC681E00 6A017C68 h|.j..häp...?..á..häpj.j j.j.j.j 000060
 8D164268 1E006A03 6A046A02 6A70CC68 1E000019 C99A1602 681E5016 FE468000 ..F±.P.h...è....häpj.j.j.j..hB.. 000080
 FE468D16 4A681E ) 6A036A04 6A036A70 CC681E00 0019E79A 1607681E 5016FE46 F±.P.h...Ó....häpj.j.j.j..hJ..F± 0000A0
 5016FE46 8D1652ᵕ 1E006A03 6A046A04 6A70CC68 1E00001A 059A1614 681E5016 .P.h........häpj.j.j.j..hR..F±.P 0000C0
 681E5016 FE468D00 6A006A00 6A016A04 6A056A70 CC681E00 001A239A 161E681E .h...#....häpj.j.j.j.j.j..F±.P.h 0000E0
 1629681E 5016FE46 8D006A00 6A006A03 6A046A06 6A70CC68 1E00001A 419A1624 $..A....häpj.j.j.j.j.j..F±.P.h). 000100
 709A1633 681E5016 FE468D16 5E681E00 6A036A04 6A076A70 CC681E00 00185E9A .^....häpj.j.j.j..h^..F±.P.h3..) 000120
 001A9B9A 1637681E 5016FE46 8D006A00 6A006A01 6A026A08 6A70CC68 1E00001A ....häpj.j.j.j.j.j..F±.P.h7..... 000140
 C4000019 AB9A163E 681E5016 FE468000 6A006A00 6A026A10 6A096A70 CC681E00 ..häpj.j.j.j.j.j..F±.P.h>..¨...á 000160
 0A478926 FE468806 5EC40009 0847C726 065EC406 5F8C2604 47892670 CCB8065E ^.¡ap&.G.&._.á^.&úG...á^..F±&.G. 000180
 6A000036 FF2621F4 068E006A 006A0000 1847C726 065EC400 011047C7 26065EC4 á^.&úG...á^¯&úG...j.j...¶!&.6..j 0001A0
 881E5657 000002C8 CBC95F5E 1F000019 669A5052 001A0508 56880646 88136A14 .j..F..V....RP.f....^_èùà...WV.¡ 0001C0
 016A7248 681E08C4 83198C00 009A7248 681E006A 00E46800 28FE46C7 D88E1977 w..ÁúF±(.hô.j..hHr......á..hHrj. 0001E0
```

```
Dump of file SATURN:[PCCOMMON.DUMP.DLL]INTAB.TMP;1 on 18-APR-1990 10:47:16.73
File ID (705,14,0)   End of file block 92 / Allocated 92

Virtual block number 45 (0000002D), 512 (0200) bytes

 046A026A 724868:E 00001852 9A166668 1E5016FE 468D006A 006A006A 046A206A j j.j.j.j..Fz.P.hf..R....hHrj.j. 000000
 026A106A 036A7248 681E0000 1B709A16 68681E50 16FE4680 1692681E 006A036A j.j..h...Fz.P.hk..p....hHrj.j.j. 000020
 006A026A 106A046A 7248681E 00001B8E 9A167668 1E5016FE 4680169A 681E006A j..h...Fz.P.hv.......hHrj.j.j.j. 000040
 006A006A 016A026A 056A7248 681E0000 1BAC9A16 82681E50 16FE4680 16A2681E .hÅ..Fz.P.h...¯....hHrj.j.j.j.j. 000060
 5EC4065F 8C260447 89267248 8B065EC4 00001A5F 9A168868 1E5016FE 4680006A j..Fz.P.h..._...á^.¡Hr&.G.&._.á^ 000080
 47C72606 5EC40001 1047C726 065EC40A 478926FE 4688065E C4000508 47C72606 .&úG...á^..Fz&.G.á^.&úG...á^¯.&úG 0000A0
 9A505200 1A050856 8B06468B 136A0E6A 000036FF 2621F406 8E006A00 6A000018 ...j.j...¶!&.6..j.j..F..V....RP. 0000C0
 1E006A01 30680028 FE46C7D8 8E1B0088 1E565700 0002C8C8 C95F5E1F 00001AEF ÿ....^_èùà...WV.¡...ÄúFz(.h0.j.. 0000E0
 5016FE46 8D006A00 6A006A04 6A206A01 6A732C68 1E08C483 1B150000 9A732C68 h,s.......á..h,sj.j j.j.j.j..Fz.P 000100
 681E5016 FE468D16 E6681E00 6A036A04 6A026A73 2C681E00 001C639A 16AA681E .h¯..c....h,sj.j.j.j..hl..Fz.P.h 000120
 168C681E 5016FE46 8D16EE68 1E006A02 6A106A03 6A732C68 1E00001C 819A16AF £.......h,sj.j.j.j..hŸ..Fz.P.h¥. 000140
 8D9A16C5 681E5016 FE468D16 F6681E00 6A036A04 6A046A73 2C681E00 001C9F9A ......h,sj.j.j.j..h~..Fz.P.hé..§ 000160
 001CDB9A 16CF681E 5016FE46 8D006A00 6A006A03 6A046A05 6A732C68 1E00001C ....h,sj.j.j.j.j.j..Fz.P.hü..Û.. 000180
 1E00001C F99A16D3 681E5016 FE468D00 6A006A00 6A016A02 6A066A73 2C681E00 ..h,sj.j.j.j.j.j..Fz.P.h&..'.... 0001A0
 065EC400 0018349A 160A681E 5016FE46 8D006A00 6A006A02 6A106A07 6A732C68 h,sj.j.j.j.j.j..Fz.P.hÖ..4...á^. 0001C0
 5EC40A47 8926FE46 8B065EC4 00070847 C726065E C4065F8C 26044789 26732C88 ¡,s&.G.&._.á^.&úG...á^..Fz&.G.á^ 0001E0

Dump of file SATURN:[PCCOMMON.DUMP.DLL]INTAB.TMP;1 on 18-APR-1990 10:47:16.73
File ID (705,14,0   End of file block 92 / Allocated 92

Virtual block number 46 (0000002E), 512 (0200) bytes

 6A0F6A00 0036FF26 21F4068E 006A006A 00001847 C726065E C4000110 47C72606 .&úG...á^.&úG...j.j...¶!&.6..j.j 000000
 1C11B81E 56570000 02C8C8C9 5F5E1F00 001C009A 5052001A 05085688 06468B13 ..F..V....RP......^_èùà...WV.¡.. 000020
 206A016A 745C681E 08C4831C 2600009A 745C681E 006A017C 68002BFE 46C7D88E .ÄúFz(.h|.j..h\t...Ë..á..h\tj.j 000040
 036A046A 026A745C 681E0000 1DB09A16 FE681E50 16FE4680 006A006A 006A046A j.j.j.j..Fz.P.hz..¯....h\tj.j.j. 000060
 006A036A 046A036A 745C681E 00001DCE 9A170368 1E5016FE 468D1742 681E006A j..hB..Fz.P.h...ö....h\tj.j.j.j. 000080
 681E006A 036A046A 046A745C 681E0000 1DEC9A17 10681E50 16FE4680 174A681E .hJ..Fz.P.h...&....h\tj.j.j.j..h 0000A0
 006A006A 006A016A 046A056A 745C681E 00001E0A 9A171A68 1E5016FE 468D1752 R..Fz.P.h........h\tj.j.j.j.j.j. 0000C0
 468D175E 681E006A 036A046A 066A745C 681E0000 1E289A17 20681E50 16FE4680 .Fz.P.h ..(....h\tj.j.j.j..h^..F 0000E0
 16FE4680 006A006A 006A036A 046A076A 745C681E 00001C45 9A172568 1E5016FE z.P.hX..E....h\tj.j.j.j.j.j..Fz. 000100
 1E5016FE 4680006A 006A006A 016A026A 086A745C 681E0000 1E649A17 2F681E50 P.h/..d....h\tj.j.j.j.j.j..Fz.P. 000120
 3A681E50 16FE4680 006A006A 006A026A 106A096A 745C681E 00001E82 9A173368 h3.......h\tj.j.j.j.j.j..Fz.P.h: 000140
 065EC400 090847C7 26065EC4 065F8C26 04478926 745C8806 5EC40000 10929A17 ......á^.¡\t&.G.&._.á^.&úG...á^. 000160
 F4068E00 6A006A00 001847C7 26065EC4 00011047 C726065E C40A4789 26FE4688 .Fz&.G.á^.&úG...á^¯.&úG...j.j...¶ 000180
 C8C8C95F 5E1F0000 1D4D9A50 52001A05 08568806 4688136A 116A0000 36FF2621 !&.6..j.j..F..V....RP.M....^_èùà 0001A0
 C4831D73 00009A75 D8681E00 6A01EE68 0028FE46 C7D88E10 5EB81E56 57000002 ...WV.¡^..ÄúFz(.hŸ.j..hÄu...s..á 0001C0
 1E00001F 399A1766 681E5016 FE468D00 6A006A00 6A046A4C 6A016A75 D8681E08 ..hÄuj.jLj.j.j.j..Fz.P.hf..9.... 0001E0

Dump of file SATURN:[PCCOMMON.DUMP.DLL]INTAB.TMP;1 on 18-APR-1990 10:47:16.73
File ID (705,14,0)   End of file block 92 / Allocated 92

Virtual block number 47 (0000002F), 512 (0200) bytes

 D8681E00 001F579A 1768681E 5016FE46 8D006A00 6A006A03 6A046A02 6A75D868 hÄuj.j.j.j.j.j..Fz.P.hk..W....hÄ 000000
 6A75D868 1E00001F 759A1773 681E5016 FE468D00 6A006A00 6A016A10 6A036A75 uj.j.j.j.j.j..Fz.P.hs..u....hÄuj 000020
 6A066A75 D8681E00 001F939A 1778681E 5016FE46 8D0F6268 1E006A02 6A106A04 .j.j.j..hb..Fz.P.h(.......hÄuj.j 000040
 6A046A07 6A75D868 1E00001F 819A1784 681E5016 FE468D00 6A006A02 6A036A04 .j.j.j.j..Fz.P.h...Ÿ....hÄuj.j.j 000060
 6A016A02 6A086A75 D8681E00 001FCF9A 1788681E 5016FE46 8D0F4A68 1E006A03 .j..hJ..Fz.P.h...ü....hÄuj.j.j.j 000080
 1E006A02 6A106A09 6A75D868 1E00001F ED9A1780 681E5016 FE468D00 6A006A00 .j.j..Fz.P.h...Ü....hÄuj.j.j.j.. 0000A0
 AE681E00 6A036A04 6A0A6A75 D8681E00 0020089A 1794681E 5016FE46 8D0F5A68 hZ..Fz.P.h.... ...hÄuj.j.j.j..hÛ 0000C0
 8D006A00 6A006A01 6A026A08 6A75D868 1E000020 299A1790 681E5016 FE468D17 ..Fz.P.h...) ...hÄuj.j.j.j.j.j.. 0000E0
 FE468D17 86681E00 6A036A04 6A0C6A75 D8681E00 0020479A 17A5681E 5016FE46 Fz.P.hE..G ...hÄuj.j.j.j..hÑ..Fz 000100
 0847C726 065EC406 5F8C2604 47892675 D888065E C400001E 469A17AA 681E5016 .P.h¯..F...á^.¡Äu&.G.&._.á^.&úG. 000120
 006A0001 1847C726 065EC400 091647C7 26065EC4 0A478926 FE468806 5EC4000C ..á^..Fz&.G.á^.&úG...á^¯.&úG...j. 000140
 1F00001E D69A5052 001A0508 56880646 88136A08 6A000036 FF2621F4 068E006A j...¶!&.6..j.j..F..V....RP.ø.... 000160
 009A77C6 681E006A 02146800 28FE46C7 D88E1EE7 8B1E5657 000002C8 C8C95F5E ^_èùà...WV.¡Ó..ÄúFz(.h..j..hów.. 000180
 9A178E68 1E5016FE 4680006A 006A006A 046A4C6A 016A77C6 681E08C4 831EFC00 .ā..á..hówj.jLj.j.j.j..Fz.P.hf.. 0001A0
 211C9A17 C3681E50 16FE4680 006A006A 006A036A 046A026A 77C6681E 000020FE z ...hówj.j.j.j.j.j..Fz.P.hū...! 0001C0
 0000213A 9A17C868 1E5016FE 468D006A 006A006A 016A106A 036A77C6 681E0000 ...hówj.j.j.j.j.j..Fz.P.hù..:!.. 0001E0
```

```
Dump of file SATURN:[PCCOMMON.DUMP.DLL]INTAB.TMP;1 on 18-APR-1990 10:47:16.73
File ID (705,14,0)   End of file block 92 / Allocated 92

Virtual block number 48 (00000030), 512 (0200) bytes

 681E0000 21589A17 03681E50 16FE468D 0F62681E 006A026A 106A046A 77C6681E .hówj.j.j.j..hb..F±.P.h&..XI...h 000000
 77C6681E 00002176 9A17DC68 1E5016FE 468D006A 006A026A 036A046A 066A77C6 ówj.j.j.j.j.j..F±.P.hÉ..vI...hów 000020
 086A77C6 681E0000 21949A17 E0681E50 16FE468D 0F4A681E 006A036A 046A076A j.j.j.j..hJ..F±.P.hÅ...!...hówj. 000040
 106A096A 77C6681E 00002182 9A17E568 1E5016FE 468D006A 006A006A 016A026A j.j.j.j.j..F±.P.hI..ÿI...hówj.j. 000060
 036A046A 0A6A77C6 681E0000 21D09A17 EC681E50 16FE468D 0F5A681E 006A026A j.j..hZ..F±.P.h&..ÀI...hówj.j.j. 000080
 006A036A 046A086A 77C6681E 000021EE 9A17F568 1E5016FE 468D006A 006A006A j.j.j..F±.P.hX..ŸI...hówj.j.j.j. 0000A0
 006A006A 016A026A 0C6A77C6 681E0000 220C9A17 FA681E50 16FE468D 006A006A j.j..F±.P.h'..."...hówj.j.j.j.j. 0000C0
 180C681E 006A03 4 046A006A 77C6681E 0000222A 9A180268 1E5016FE 468D006A j..F±.P.h...*"...hówj.j.j.j..h.. 0000E0
 26065EC4 065F8C<o 04478926 77C68806 5EC40000 1F189A18 07681E50 16FE468D .F±.P.h.......á^.¡ów&.G.&._.á^.& 000100
 011847C7 26065EC4 00091647 C726065E C40A4789 26FE4688 065EC400 000847C7 úG...á^..F±&.G.á^.&úG...á^¯.&úG.. 000120
 209B9A50 52001A05 08568806 4688136A 0A6A0000 36FF2621 F4068E00 6A006A00 .j.j...¶I&.6..j.j..F..V....RP..  000140
 DA681E00 6A021468 0028FE46 C7D88E20 AC881E56 57000002 C8C8C95F 5E1F0000 ...^ èùà...WV.¡¯ .ÁúF±(.h..j..hÖ 000160
 681E5016 FE468000 6A006A00 6A046A4C 6A016A79 DA681E08 C48320C1 00009A79 y...Ẽ .á..hOyj.jLj.j.j.j..F±.P.h 000180
 1819681E 5016FE46 8D006A00 6A006A03 6A046A02 6A79DA68 1E000022 E19A1814 ...Â"...hOyj.j.j.j.j.j..F±.P.h.. 0001A0
 1D9A1821 681E5016 FE468000 6A006A00 6A016A10 6A036A79 DA681E00 0022FF9A .."...hOyj.j.j.j.j.j..F±.P.hI... 0001C0
 002389A 1829681E 5016FE46 8D0F6268 1E006A02 6A106A04 6A79DA68 1E000023 #...hOyj.j.j.j..hb..F±.P.h)..;#. 0001E0

Dump of file SATURN:[PCCOMMON.DUMP.DLL]INTAB.TMP;1 on 18-APR-1990 10:47:16.73
File ID (705,14,0)   End of file block 92 / Allocated 92

Virtual block number 49 (00000031), 512 (0200) bytes

 1E000023 599A1832 681E5016 FE468D00 6A006A02 6A036A04 6A076A79 DA681E00 ..hOyj.j.j.j.j.j..F±.P.h2..Y#... 000000
 0A681E00 0023779/ 1836681E 5016FE46 8D0F4A68 1E006A03 6A046A08 6A79DA68 hOyj.j.j.j..hJ..F±.P.h6..w#...hÖ 000020
 6A79DA68 1E000023 959A1838 681E5016 FE468D00 6A006A00 6A016A02 6A096A79 yj.j.j.j.j.j..F±.P.h;...#...hOyj 000040
 6A086A79 DA681E00 0023839A 1842681E 5016FE46 8D0F5A68 1E006A02 6A106A0A .j.j.j..hZ..F±.P.hB..°#...hOyj.j 000060
 6A046A0C 6A79DA68 1E000023 D19A1848 681E5016 FE468D18 68681E00 6A036A04 .j.j..hh..F±.P.hK..Ì#...hOyj.j.j 000080
 6A016A02 6A066A79 DA681E00 0023EF9A 1856681E 5016FE46 8D006A00 6A006A03 .j.j.j..F±.P.hV..ÿ#...hOyj.j.j.j 0000A0
 1E006A03 6A046A00 6A79DA68 1E000024 009A185E 681E5016 FE468D00 6A006A00 .j.j..F±.P.h^...$...hOyj.j.j.j.. 0000C0
 C4065F8C 26044789 26790A88 065EC400 0020E09A 1863681E 5016FE46 8D187068 hp..F±.P.hc..Á ..á^.¡Oy&.G.&._.á 0000E0
 C726065E C4000A16 47C72606 5EC40A47 8926FE46 88065EC4 00000847 C726065E ^.&úG...á^..F±&.G.á^.&úG...á^¯&ú 000100
 5052001A 05085688 06468813 6A096A00 0036FF26 21F4068E 006A006A 00011847 G...j.j...¶I&.6..j.j..F..V....RP 000120
 FFFE4689 0788260A 5EC4088E 228F881E 56570000 02C8C8C9 5F5E1F00 00227E9A .-"...^ èùà...WV.¡.".Áá^.&...F±. 000140
 FF000024 889A1878 681E5016 FE468D00 6A006A00 6A016A02 6A016A06 76FF0876 v..v.j.j̄.j.j.j.j..F±.P.hx..£$... 000160
 FF000024 D89A187E 681E5016 FE468D18 C8681E00 6A036A04 6A026A06 76FF0876 v..v.j.j.j.j..hà..F±.P.h-..Ù$... 000180
 FF000024 F89A1886 681E5016 FE468D19 E0681E02 6A036A04 6A036A06 76FF0876 v..v.j.j.j.j..hÀ..F±.P.h...«$... 0001A0
 FF000025 189A1880 681E5016 FE468D1A 64681E00 6A026A10 6A046A06 76FF0876 v..v.j.j.j.j..hd..F±.P.h....%... 0001C0
 FF000025 389A1896 681E5016 FE468D18 D8681E00 6A036A04 6A056A06 76FF0876 v..v.j.j.j.j..hÄ..F±.P.h...;%... 0001E0

Dump of file SATURN:[PCCOMMON.DUMP.DLL]INTAB.TMP;1 on 18-APR-1990 10:47:16.73
File ID (705,14,0)   End of file block 92 / Allocated 92

Virtual block number 50 (00000032), 512 (0200) bytes

 FF000025 589A1899 681E5016 FE468D19 5C681E00 6A036A04 6A066A06 76FF0876 v..v.j.j.j.j..h\..F±.P.h...[%... 000000
 FF000025 789A189E 681E5016 FE468D00 6A006A00 6A046A4C 6A076A06 76FF0876 v..v.j.jLj.j.j.j..F±.P.h...(%... 000020
 FF000025 989A18A3 681E5016 FE468D00 6A006A00 6A036A04 6A086A06 76FF0876 v..v.j.j.j.j.j.j..F±.P.hÉ...%... 000040
 FF000025 889A18A8 681E5016 FE468D00 6A006A00 6A026A10 6A096A06 76FF0876 v..v.j.j.j.j.j.j..F±.P.h¨..£%... 000060
 FF000025 D89A18B3 681E5016 FE468D1A E8681E00 6A036A04 6A0A6A06 76FF0876 v..v.j.j.j.j..hÖ..F±.P.h°..Ù%... 000080
 FF000025 F89A1888 681E5016 FE468D00 6A006A00 6A016A04 6A086A06 76FF0876 v..v.j.j.j.j.j.j..F±.P.h£..«%... 0000A0
 FF000026 189A188D 681E5016 FE468D00 6A006A00 6A016A04 6A0C6A06 76FF0876 v..v.j.j.j.j.j.j..F±.P.h§...&... 0000C0
 C4000022 C39A188F 681E5016 FE468D00 6A006A00 6A016A02 6A0D6A06 76FF0876 v..v.j.j.j.j.j.j..F±.P.h¢..ú"..á 0000E0
 14680028 FE46C7D8 8E247288 1E565700 0002C8C8 C95F5E1F 078926FE 46880A5E ^..F±&...^ èùà...WV.¡r$.ÄúF±(.h. 000100
 08C483FF FF246A9A 7BcE681E 5016FE46 8D08C483 22A40000 9A7BEE68 1E006A02 .j..hŸ(...Ẽ".á..F±.P.hŸ(.j$...á. 000120
 478926FE 4688065E C4000008 47C72606 5EC4065F 8C260447 89267BEE Bc.'5EC4 á^.¡Ÿ(&.G.&._.á^.&úG...á^..F±&.G 000140
 000036FF 2621F406 8E006A00 6A000018 47C72606 5EC40007 1047C726 065ι`40A .á^.&úG...á^¯.&úG...j.j...¶I&.6.. 000160
 1E565700 0002C8C8 C95F5E1F 00002461 9A505200 1A050856 88064688 136A:36A j.j..F..V....RP.a$...^ èùà...WV. 000180
 5016FE46 8D08C483 264A0000 9A7E0268 1E006A03 90680028 FE46C7D8 8E263588 ¡5&.ÁúF±(.h..j..h.-...J&.á..F±.P 0001A0
 16FE468D 006A006A 006A026A 106A0E6A 7E02681E 08C48326 58246A9A 7E02681E .h.-.j$[&.á..h.-j.j.j.j.j.j..F±. 0001C0
 1E5016FE 46801810 681E006A 036A046A 0F6A7E02 681E0000 27249A18 6C681E50 P.hl..$'...h.-j.j.j.j..h...F±.P. 0001E0
```

```
Dump of file SATURN:[PCCOMMON.DUMP.DLL]INTAB.TMP;1 on 18-APR-1990 10:47:16.73
File ID (705,14,0)   End of file block 92 / Allocated 92

Virtual block number 51 (00000033), 512 (0200) bytes

 87681E50 16FE46R0 1B5C681E 006A036A 046A106A 7E02681E 00002742 9A1B7C68 h|..B'...h.-j.j.j.j..h\..F±.P.h. 000000
 9A1B9368 1E5016FE 4680006A 006A006A 036A046A 116A7E02 681E0000 27609A1B ..''...h.-j.j.j.j.j.j..F±.P.h... 000020
 279C9A1B 9B681E50 16FE4680 006A006A 006A036A 046A126A 7E02681E 0000277E ~'...h.-j.j.j.j.j.j..F±.P.h....' 000040
 000027BA 9A1BA368 1E5016FE 46801C52 681E006A 036A046A 136A7E02 681E0000 ...h.-j.j.j.j..hR..F±.P.hÉ..o'.. 000060
 681E0000 27D89A1B AA681E50 16FE468D 1BC6681E 006A026A 106A146A 7E02681E .h.-j.j.j.j..hó..F±.P.h^..Ä'...h 000080
 7E02681E 000027F6 9A1BAE68 1E5016FE 46801B64 681E006A 036A046A 156A7E02 .-j.j.j.j..hd..F±.P.hÜ..-'...h.- 0000A0
 176A7E02 681E0000 28149A1B B5681E50 16FE468D 1B64681E 006A036A 046A166A j.j.j.j..hd..F±.P.hç...(...h.-j. 0000C0
 89267E02 B8065EC4 0000249B 9A1BB068 1E5016FE 468D1B64 681E006A 036A046A j.j.j..hd..F±.P.h$...$..á^.¡.-&. 0000E0
 1847C726 065EC40A 47B926FE 468B065E C4001708 47C72606 5EC4065F 8C260447 G.&._.á^.&úG...á^..F±&.G.á^.&úG. 000100
 B09A5052 001A050¯ 56880646 88136A19 6A000036 FF2621F4 068E006A 006A0000 ..j.J...¶!&.6..j.j..F..V....RP.¯ 000120
 681E006A 031E680‚ 28FE46C7 D88E26C1 881E5657 000002C8 CBC95F5E 1F000026 &...^_èùà...WV.¡é&.ÄúF±(.h..j..h 000140
 6A819268 1E08C483 26E7246A 9A819268 1E5016FE 468D08C4 83260600 009A8192 .....ǽ&.6..F±.P.h...j$ó&.6..h..j 000160
 6A0F6A81 92681E00 0028D39A 1C5A681E 5016FE46 80006A00 6A006A02 6A106A0E .j.j.j.j.j..F±.P.hZ..Æ(...h..j.j 000180
 6A046A10 6A819268 1E000028 F19A1C6A 681E5016 FE468D18 10681E00 6A036A04 .j.j..h...F±.P.hj..þ(...h..j.j.j 0001A0
 6A036A04 6A116A81 92681E00 00290F9A 1C75681E 5016FE46 8D1B5C68 1E006A03 .j..h\..F±.P.hu...)...h..j.j.j.j 0001C0
 6A006A03 6A046A12 6A819268 1E000029 2D9A1C81 681E5016 FE468000 6A006A00 .j.j..F±.P.h...-)...h..j.j.j.j.j 0001E0

Dump of file SATURN:[PCCOMMON.DUMP.DLL]INTAB.TMP;1 on 18-APR-1990 10:47:16.73
File ID (705,14,0)   End of file block 92 / Allocated 92

Virtual block number 52 (00000034), 512 (0200) bytes

 A0681E00 6A036A04 6A136A81 92681E00 0029489A 1C89681E 5016FE46 80006A00 .j..F±.P.h...K)...h..j.j.j.j..h. 000000
 801BC668 1E006A02 6A106A14 6A819268 1E000029 699A1C91 681E5016 FE468D1C ..F±.P.h...i)...h..j.j.j.j..hó.. 000020
 C726065E C4065F8C 26044789 26819288 065EC400 0027069A 1C98681E 5016FE46 F±.P.h....'..á^.¡..&.G.&._.á^.&ú 000040
 2621F406 8E006A00 6A000018 47C72606 5EC40A47 8926FE46 88065EC4 00140847 G...á^..F±&.G.á^.&úG...j.J...¶!& 000060
 0002C8CB C95F5E1F 0000285F 9A505200 1A050856 88064688 136A196A 000036FF .6..j.j..F..V....RP._(...^_èùà.. 000080
 8D08C483 28850000 9A848068 1E006A03 44680028 FE46C7D8 8E287088 1E565700 .WV.¡p(.ÄúF±(.hD.j..h¯.....(.á.. 0000A0
 006A006A 006A026A 106A0E6A 8480681E 08C48328 96246A9A 8480681E 5016FE46 F±.P.h¯..j$.(.6..h¯.j.j.j.j.j.j. 0000C0
 4680006A 006A006A 036A046A 0F6A8480 681E0000 2A289A1C A8681E50 16FE468D .F±.P.h¯..(*...h¯.j.j.j.j.j.j..F 0000E0
 16FE4680 1B10681E 006A036A 046A106A 8480681E 00002A46 9A1C8868 1E5016FE ±.P.h¡..F*...h¯.j.j.j.j..h...F±. 000100
 1E5016FE 468D1B5C 681E006A 036A046A 116A8480 681E0000 2A649A1C C6681E50 P.hó..d*...h¯.j.j.j.j..h\..F±.P. 000120
 D0681E50 16FE4680 006A006A 006A036A 046A126A 8480681E 00002A82 9A1CD168 hÌ...*...h¯.j.j.j.j.j.j..F±.P.hÏ 000140
 9A1CE568 1E5016FE 4680006A 006A006A 036A046A 136A8480 681E0000 2AA09A1C ...*...h¯.j.j.j.j.j.j..F±.P.hÌ.. 000160
 2ADC9A1C ED681E50 16FE468D 1CFE681E 006A036A 046A146A 8480681E 00002ABE ƒ*...h¯.j.j.j.j..h±..F±.P.hÚ..É* 000180
 00002885 9A1CF968 1E5016FE 468D1BC6 681E006A 026A106A 156A8480 681E0000 ...h¯.j.j.j.j..hó..F±.P.h*..ç(.. 0001A0
 47B926FE 468B065E C4001508 47C72606 5EC4065F 8C260447 89268480 88065EC4 á^.¡¯.&.G.&._.á^.&úG...á^..F±&.G 0001C0
 56880646 88136A1A 6A000036 FF2621F4 068E006A 006A0000 1847C726 065EC40A .á^.&úG...j.J...¶!&.6..j.j..F..V 0001E0

Dump of file SATURN:[PCCOMMON.DUMP.DLL]INTAB.TMP;1 on 18-APR-1990 10:47:16.73
File ID (705,14,0)   End of file block 92 / Allocated 92

Virtual block number 53 (00000035), 512 (0200) bytes

 28FE46C7 D88E29C5 881E5657 000002C8 CBC95F5E 1F000029 B49A5052 001A0508 ....RP.Ç)...^_èùà...WV.¡é).ÄúF±( 000000
 29EB246A 9A87F468 1E5016FE 468D08C4 83290A00 009A87F4 681E006A 02D26800 .h®.j..h¶....Õ).á..F±.P.h¶..j$$) 000020
 0028989A 1006681E 5016FE46 8D006A00 6A006A03 6A046A0E 6A87F468 1E08C483 .á..h¶.j.j.j.j.j.j..F±.P.h....+. 000040
 1E00002B 899A1D11 681E5016 FE468D00 6A006A00 6A036A04 6A0F6A87 F4681E00 ..h¶.j.j.j.j.j.j..F±.P.h...¿+... 000060
 F4681E00 002BD79A 1D10681E 5016FE46 8D006A00 6A006A03 6A046A10 6A87F468 h¶.j.j.j.j.j.j..F±.P.h...æ+...h¶ 000080
 6A87F468 1E00002B F59A1D2B 681E5016 FE468D00 6A006A00 6A036A04 6A116A87 .j.j.j.j.j.j..F±.P.h+..%+...h¶.j 0000A0
 2687F4B8 065EC400 002A0A9A 1D36681E 5016FE46 8D006A00 6A006A03 6A046A12 .j.j.j.j.j..F±.P.hó...*..á^.¡¶.& 0000C0
 47C72606 5EC40A47 8926FE46 8B065EC4 00120847 C726065E C4065F8C 26044789 .G.&._.á^.&úG...á^..F±&.G.á^.&úG 0000E0
 9A505200 1A050856 88064688 136A186A 000036FF 2621F406 8E006A00 6A000018 ...j.J...¶!&.6..j.j..F..V....RP. 000100
 1E006A02 D2680028 FE46C7D8 8E283888 1E565700 0002C8C8 C95F5E1F 00002B27 '+...^_èùà...WV.¡8+.ÄúF±(.h®.j.. 000120
 8AC6681E 08C4832B 5E246A9A 8AC6681E 5016FE46 8D08C483 284D0000 9A8AC668 hó....Ĥ+.á..F±.P.hó..j$^+.á..hó. 000140
 0F6A8AC6 681E0000 2C649A1D 42681E50 16FE468D 006A006A 006A036A 046A0E6A j.j.j.j.j.j..F±.P.hB..Ç,...hó.j. 000160
 046A106A 8AC6681E 00002CD2 9A1D4D68 1E5016FE 4680006A 006A006A 0?'A046A j.j.j.j.j..F±.P.hM..®,...hó.j.j. 000180
 036A046A 116A8AC6 681E0000 2CF09A1D 59681E50 16FE4680 006A006A 006A036A j.j.j.j..F±.P.hY..Þ,...hó.j.j.j. 0001A0
 006A036A 046A126A 8AC6681E 0000200E 9A106768 1E5016FE 4680006A 006A036A j.j.j..F±.P.hg...-...hó.j.j.j.j. 0001C0
 065F8C26 04478926 8AC68806 5EC40000 2B7D9A1D 72681E50 16FE468D 006A006A j.j..F±.P.hr..)+..á^.¡6.&.G.&._. 0001E0
```

```
Dump of file SATURN:[PCCOMMON.DUMP.DLL]INTAB.TMP;1 on 18-APR-1990 10:47:16.73
File ID (705,14,^)   End of file block 92 / Allocated 92

Virtual block number 54 (00000036), 512 (0200) bytes

 006A006A 00001847 C726065E C40A4789 26FE4688 065EC400 120847C7 26065EC4 á^.&úG...á^..F±&.G.á^.&úG...j.j. 000000
 5F5E1F00 002C409A 5052001A 05085688 06468813 6A1C6A00 0036FF26 21F4068E ..¶!&.6..j.j..F..V....RP.@,...^_ 000020
 6600009A 8098C31E 006A02D2 680028FE 46C7D88E 2C51881E 56570000 02C8C8C9 èùà...WV.jQ,.ÁúF±(.h0.j..h.....T 000040
 6A036A04 6A0E6A80 98681E08 C4832C77 246A9A80 98681E50 16FE4680 08C4832C ,.á..F±.P.h...j$w,.á..h..j.j.j.j 000060
 1E006A03 6A046A0F 6A809868 1E000020 CD9A1D7E 681E5016 FE468D10 AE681E00 ..hù..F±.P.h~..ë-...h..j.j.j.j.. 000080
 F0681E00 6A036A04 6A106A80 98681E00 002DE89A 1D88681E 5016FE46 8D1AF068 hÞ..F±.P.h...$-...h..j.j.j.j..hÞ 0000A0
 8D1AF068 1E006A03 6A046A11 6A809868 1E00002E 099A1D92 681E5016 FE468D1A ..F±.P.h........h..j.j.j.j..hÞ.. 0000C0
 FE468D18 5C681E00 6A036A04 6A126A80 98681E00 002E279A 1D90681E 5016FE46 F±.P.h...'....h..j.j.j.j..h\..F± 0000E0
 0847C726 065EC406 5F8C2604 4789268D 9888065E C400002C 969A1DA5 681E5016 .P.hÉ.....á^.j..&.G.&._.á^.&úG. 000100
 36FF2621 F4068E00 6A006A00 011847C7 26065EC4 0A478926 FE468806 5EC40012 ..á^..F±&.G.á^.&úG...j.J...¶!&.6 000120
 57000002 C8C8C95F 5E1F0000 20599A50 52001A05 08568806 4688136A 1D6A0000 ..j.j..F..V....RP.Y-...^_èùà...W 000140
 FE468D08 C483207F 00009A90 6A681E00 6A020268 0028FE46 C7D88E2D 6AB81E56 V.jj-.ÁúF±(.h0.j..hj......á..F± 000160
 468D1AF0 681E006A 036A046A 0E6A906A 681E08C4 83209024 6A9A906A 681E5016 .P.hj..j$.-.á..hj.j.j.j.j..hÞ..F 000180
 16FE468D 1AF0681E 006A036A 046A0F6A 906A681E 00002EE6 9A1D8668 1E5016FE ±.P.hÑ..!....hj.j.j.j.j..hÞ..F±. 0001A0
 1E5016FE 468D1AF0 681E006A 036A046A 106A906A 681E0000 2F049A1D 88681E50 P.hÉ../...hj.j.j.j.j..hÞ..F±.P. 0001C0
 C8681E50 16FE468D 1AF0681E 006A036A 046A116A 906A681E 00002F22 9A1DC168 hè.."/...hj.j.j.j.j..hÞ..F±.P.hù 0001E0

Dump of file SATURN:[PCCOMMON.DUMP.DLL]INTAB.TMP;1 on 18-APR-1990 10:47:16.73
File ID (705,14,0)   End of file block 92 / Allocated 92

Virtual block number 55 (00000037), 512 (0200) bytes

 9A1DD568 1E5016FE 468D1C4A 681E006A 036A046A 126A906A 681E0000 2F409A1D ..@/...hj.j.j.j.j..hJ..F±.P.hf.. 000000
 4688065E C4001208 47C72606 5EC4065F 8C260447 8926906A B8065EC4 00002DAF £-..á^.jj.&.G.&._.á^.&úG...á^..F 000020
 88136A1E 6A000036 FF2621F4 068E006A 006A0001 1847C726 065EC40A 478926FE ±&.G.á^.&úG...j.J...¶!&.6..j.j.. 000040
 D88E2E83 B81E5657 000002C8 C8C95F5E 1F00002E 729A5052 001A0508 56880646 F..V....RP.r....^_èùà...WV.j...Á 000060
 9A933C68 1E5016FE 468D08C4 832E9800 009A933C 681E006A 02D26800 28FE46C7 úF±(.h0.j..h<........á..F±.P.h<.. 000080
 1DDF681E 5016FE46 8D1AF068 1E006A03 6A046A0E 6A933C68 1E08C483 2EA9246A j$`..á..h<.j.j.j.j..hÞ..F±.P.hÔ. 0000A0
 1D9A1DE4 681E5016 FE468D1A F0681E00 6A036A04 6A0F6A93 3C681E00 002FFF9A ../...h<.j.j.j.j..hÞ..F±.P.hõ... 0000C0
 0030389A 1DEA681E 5016FE46 8D1AF068 1E006A03 6A046A10 6A933C68 1E000030 0...h<.j.j.j.j..hÞ..F±.P.hõ..;0. 0000E0
 1E000030 599A1DF4 681E5016 FE468D1A F0681E00 6A036A04 6A116A93 3C681E00 ..h<.j.j.j.j..hÞ..F±.P.h¶..YO... 000100
 065EC400 002EC89A 1DFE681E 5016FE46 8D1C4A68 1E006A03 6A046A12 6A933C68 h<.j.j.j.j..hJ..F±.P.h±..à...á^. 000120
 5EC40A47 8926FE46 88065EC4 00120847 C726065E C4065F8C 26044789 26933C88 j<.&.G.&._.á^.&úG...á^..F±&.G.á^ 000140
 1A050856 88064688 136A1F6A 000036FF 2621F406 8E006A00 6A000118 47C72606 .&úG...j.J...¶!&.6..j.j..F..V... 000160
 60680028 FE46C7D8 8E2F9C88 1E565700 0002C8C8 C95F5E1F 00002F88 9A505200 .RP../...^_èùà...WV.j./.ÁúF±(.h` 000180
 08C4832F C2246A9A 960E681E 5016FE46 8008C483 2F810000 9A960E68 1E006A02 .j..h.....Ÿ/.á..F±.P.h...j$ò/.á. 0001A0
 681E0000 31189A1E 08681E50 16FE4680 006A006A 006A016A 026A0E6A 960E681E .h..j.j.j.j.j.j..F±.P.h....1...h 0001C0
 B8065EC4 00002FE1 9A1E1268 1E5016FE 468D1AF0 681E006A 036A046A 0F6A960E ..j.j.j.j..hÞ..F±.P.h...Ã/..á^.j 0001E0

Dump of file SATURN:[PCCOMMON.DUMP.DLL]INTAB.TMP;1 on 18-APR-1990 10:47:16.73
File ID (705,14,0)   End of file block 92 / Allocated 92

Virtual block number 56 (00000038), 512 (0200) bytes

 065EC40A 478926FE 4688065E C4000F08 47C72606 5EC4065F 8C260447 89.:960E ..&.G.&._.á^.&úG...á^..F±&.G.á^. 000000
 001A0508 56880646 88136A20 6A000036 FF2621F4 068E006A 006A0001 184.:726 &úG...j.J...¶!&.6..j j..F..V.... 000020
 031E6800 28FE46C7 D88E3085 881E5657 000002C8 C8C95F5E 1F000030 A49A.052 RP.É0...^_èùà...WV.jçO.ÁúF±(.h.. 000040
 1E08C483 30D8246A 9A986E68 1E5016FE 468D08C4 8330CA00 009A986E 681E006A j..hn....Õ0.á..F±.P.hn..j$Ú0.á.. 000060
 6E681E00 0031D79A 1E17681E 5016FE46 8D1AF068 1E006A03 6A046A0E 6A986E68 hn.j.j.j.j..hÞ..F±.P.h...ø1...hn 000080
 6A986E68 1E000031 F59A1E1E 681E5016 FE468D1A F0681E00 6A036A04 6A0F6A98 .j.j.j.j..hÞ..F±.P.h...%1...hn.j 0000A0
 6A116A98 6E681E00 0032139A 1E29681E 5016FE46 8D1AF068 1E006A03 6A046A10 .j.j.j..hÞ..F±.P.h)...2...hn.j.j 0000C0
 6A046A12 6A986E68 1E000032 319A1E30 681E5016 FE468D1A F0681E00 6A036A04 .j.j..hÞ..F±.P.h0..12...hn.j.j.j 0000E0
 6A036A04 6A136A98 6E681E00 00324F9A 1E38681E 5016FE46 8D1AF068 1E006A03 .j..hÞ..F±.P.h8..O2...hn.j.j.j.j 000100
 1E006A03 6A046A14 6A986E68 1E000032 609A1E42 681E5016 FE468D18 5C681E00 ..h\..F±.P.hB..m2...hn.j.j.j.j.. 000120
 C4065F8C 26044789 26986E88 065EC400 0030FA9A 1E4E681E 5016FE46 8D1C4A68 hJ..F±.P.hN..*0..á^.jn.&.G.&._.á 000140
 8E006A00 6A000118 47C72606 5EC40A47 8926FE46 88065EC4 00140847 C726065E ^.&úG...á^..F±&.G.á^.&úG...j.J.. 000160
 C95F5E1F 00003163 9A505200 1A050856 88064688 136A216A 000036FF 2621F406 .¶!&.6..j!j..F..V....RP.c1...^_è 000180
 31890000 9A988C68 1E006A02 F8680028 FE46C7D8 8E317488 1E565700 0002C8C8 ùà...WV.jt1.ÁúF±(.h%.j..h......1 0001A0
 006A036A 046A0E6A 988C681E 08C48331 9A246A9A 988C681E 5016FE46 8008C483 .á..F±.P.h...j$.1.á..h..j.j.j.j. 0001C0
 681E006A 036A046A 0F6A988C 681E0000 332C9A1E 58681E50 16FE468D 1AF0681E .hÞ..F±.P.hX..,3...h..j.j.j.j..h 0001E0
```

```
Dump of file SATURN:[PCCOMMON.DUMP.DLL]INTAB.TMP;1 on 18-APR-1990 10:47:16.73
File ID (705,14,0)   End of file block 92 / Allocated 92

Virtual block number 57 (00000039), 512 (0200) bytes

 1AF0681E 006A034A 046A106A 9B8C681E 0000334A 9A1E6268 1E5016FE 468D1AF0 Þ..F±.P.hb..J3...h..j.j.j.j..hÞ. 000000
 468D185C 681E006A 036A046A 116A9B8C 681E0000 33689A1E 68681E50 16FE4680 .F±.P.hh..h3...h..j.j.j.j..h\..F 000020
 16FE4680 1AF0681E 006A036A 046A126A 9B8C681E 00003386 9A1E7268 1E5016FE ±.P.hr...3...h..j.j.j.j..hÞ..F±. 000040
 1E5016FE 468D1C4A 681E006A 036A046A 136A9B8C 681E0000 33A49A1E 7E681E50 P.h~..£3...h..j.j.j.j..hJ..F±.P. 000060
 C4001308 47C72606 5EC4065F 8C260447 89269B8C 88065EC4 00003189 9A1E8668 h...¿1..á^.¡..&.G.&._.á^.&úG...á 000080
 6A000036 FF2621F4 068E006A 006A0001 1847C726 065EC40A 478926FE 4688065E ^..F±&.G.á^.&úG...j.]...¶!&.6..j 0000A0
 881E5657 000002C8 CBC95F5E 1F000032 889A5052 001A0508 56880646 88136A22 "j..F..V....RP.¡2...^_èùà...WV.¡ 0000C0
 1E5016FE 468D08C4 83320E00 009A9E84 681E006A 031E6800 28FE46C7 D88E32C9 è2.ÄúF±(.h..j..h.....Ē2.á..F±.P. 0000E0
 5016FE46 8D1AF068 1E006A03 6A046A0E 6A9E8468 1E08C483 32EF246A 9A9E8468 h...j$ÿ2.á..h..j.j.j.j..hÞ..F±.P 000100
 681E5016 FE468D1A F0681E00 6A036A04 6A0F6A9E 84681E00 0034639A 1E90681E .h...c4...h..j.j.j.j..hÞ..F±.P.h 000120
 1EA0681E 5016FE46 8D1AF068 1E006A03 6A046A10 6A9E8468 1E000034 819A1E9A ....4...h..j.j.j.j..hÞ..F±.P.h.. 000140
 B09A1EA6 681E5016 FE468D1A F0681E00 6A036A04 6A116A9E 84681E00 00349F9A ..4...h..j.j.j.j..hÞ..F±.P.hI..§ 000160
 0034D89A 1EB0681E 5016FE46 8D185C68 1E006A03 6A046A12 6A9E8468 1E000034 4...h..j.j.j.j..h\..F±.P.h¯..Ü4. 000180
 1E000034 F99A1EBC 681E5016 FE468D1A F0681E00 6A036A04 6A136A9E 84.²1E00 ..h..j.j.j.j..hÞ..F±.P.h¥..*4... 0001A0
 065EC400 00330E9A 1EC4681E 5016FE46 8D1C4A68 1E006A03 6A046A14 6A9L 468 h..j.j.j.j..hJ..F±.P.há...3..á^. 0001C0
 5EC40A47 8926FE46 88065EC4 00140847 C726065E C4065F8C 26044789 269Eb 88 ¡..&.G.&._.á^.&úG...á^..F±&.G.á^ 0001E0

Dump of file SATURN:[PCCOMMON.DUMP.DLL]INTAB.TMP;1 on 18-APR-1990 10:47:16.73
File ID (705,14,0)   End of file block 92 / Allocated 92

Virtual block number 58 (0000003A), 512 (0200) bytes

 1A050856 88064688 136A236A 000036FF 2621F406 8E006A00 6A000118 47C72606 .&úG...j.j...¶!&.6..j#j..F..V... 000000
 4E680028 FE46C7D8 8E340088 1E565700 0002C8CB C95F5E1F 000033EF 9A505200 .RP.ÿ3...^_èùà...WV.¡.4.ÄúF±(.hN 000020
 08C48334 26246A9A A1A2681E 5016FE46 8008C483 34150000 9AA1A268 1E006A04 .j..hÁÁ....4.á..F±.P.hÁÁ.j$&4.á. 000040
 681E0000 35B89A1E CE681E50 16FE4680 1AF0681E 006A036A 046A0E6A A1A2681E .hÁÁj.j.j.j..hÞ..F±.P.hö..¡5...h 000060
 A1A2681E 00003506 9A1ED968 1E5016FE 4680006A 006A006A 016A026A 0F6AA1A2 ÁÁj.j.j.j.j.j..F±.P.h\..ø5...hÁÁ 000080
 116AA1A2 681E0000 35F49A1E E2681E50 16FE4680 1AF0681E 006A036A 046A106A j.j.j.j..hÞ..F±.P.hâ..¶5...hÁÁj. 0000A0
 046A126A A1A2681E 00003612 9A1EE868 1E5016FE 468D1AF0 681E006A 036A046A j.j.j..hÞ..F±.P.hÒ...6...hÁÁj.j. 0000C0
 036A046A 136AA1A2 681E0000 36309A1E EE681E50 16FE4680 1810681E 006A036A j.j..h...F±.P.h¥..06...hÁÁj.j.j. 0000E0
 006A036A 046A146A A1A2681E 0000364E 9A1EF968 1E5016FE 468D1AF0 681E006A j..hÞ..F±.P.hª..N6...hÁÁj.j.j.j. 000100
 681E006A 036A046A 156AA1A2 681E0000 366C9A1E FF681E50 16FE4680 1AF0681E .hÞ..F±.P.h...l6...hÁÁj.j.j.j..h 000120
 1F60681E 006A036A 046A166A A1A2681E 0000368A 9A1F0668 1E5016FE 468D1F58 X..F±.P.h....6...hÁÁj.j.j.j..h`. 000140
 468D1AF0 681E006A 036A046A 176AA1A2 681E0000 36A89A1F 10681E50 16FE4680 .F±.P.h...´6...hÁÁj.j.j.j..hÞ..F 000160
 16FE4680 185C681E 006A036A 046A186A A1A2681E 00003445 9A1F1A68 1E5016FE ±.P.h...E4...hÁÁj.j.j.j..h\..F±. 000180
 1E5016FE 468D1AF0 681E006A 036A046A 196AA1A2 681E0000 36E49A1F 24681E50 P.h$..06...hÁÁj.j.j.j..hÞ..F±.P. 0001A0
 40681E50 16FE4680 1AF0681E 006A036A 046A1A6A A1A2681E 00003702 9A1F3068 h0...7...hÁÁj.j.j.j..hÞ..F±.P.hä 0001C0
 9A1F4868 1E5016FE 468D1AF0 681E006A 036A046A 186AA1A2 681E0000 37209A1F .. 7...hÁÁj.j.j.j..hÞ..F±.P.hH.. 0001E0

Dump of file SATURN:[PCCOMMON.DUMP.DLL]INTAB.TMP;1 on 18-APR-1990 10:47:16.73
File ID (705,14,0)   End of file block 92 / Allocated 92

Virtual block number 59 (0000003B), 512 (0200) bytes

 359A9A1F 40681E50 16FE4680 1C4A681E 006A036A 046A1C6A A1A2681E 0000373E >7...hÁÁj.j.j.j..hJ..F±.P.hM...5 000000
 26FE4688 065EC400 1C0847C7 26065EC4 065F8C26 04478926 A1A28806 5EC40000 ..á^.¡ÁÁ&.G.&._.á^.&úG...á^..F±& 000020
 06468813 6A246A00 0036FF26 21F4068E 006A006A 00011847 C726065E C40A4789 .G.á^.&úG...j.]...¶!&.6..j$j..F. 000040
 46C7D88E 3555881E 56570000 02C8CBC9 5F5E1F00 0035449A 5052001A 05085688 .V....RP.D5...^_èùà...WV.¡U5.ÄúF 000060
 246A9AA5 F0681E50 16FE4680 08C48335 6A00009A A5F0681E 006A0260 680028FE ±(.h`.j..hÞE...]5.á..F±.P.hÞE.j$ 000080
 FD9A1F68 681E5016 FE468D1A F0681E00 6A036A04 6A0E6AA5 F0681E08 C483357B (5.á..hÞEj.j.j.j..hÞ..F±.P.hh..» 0000A0
 0036C69A 1F60681E 5016FE46 80006A00 6A006A01 6A026A0F 6AA5F068 1E000037 7...hÞEj.j.j.j.j.j..F±.P.hm..66. 0000C0
 8926FE46 88065EC4 000F0847 C726065E C4065F8C 26044789 26A5F088 065EC400 .á^.¡ÞE&.G.&._.á^.&úG...á^..F±&. 0000E0
 88064688 136A256A 000036FF 2621F406 8E006A00 6A000018 47C72606 5EC40A47 G.á^.&úG...j.]...¶!&.6..j%j..F.. 000100
 FE46C7D8 8E379A88 1E565700 0002C8CB C95F5E1F 00003789 9A505200 1A050856 V....RP..7...^_èùà...WV.¡.7.ÄúF± 000120
 C0246A9A A850681E 5016FE46 8008C483 37AF0000 9AA85068 1E006A02 60680028 (.h`.j..hP´...Ē7.á..F±.P.hP´.j$á 000140
 388C9A1F 75681E50 16FE4680 1AF0681E 006A036A 046A0E6A A850681E 08C48337 7.á..hP´j.j.j.j..hÞ..F±.P.hu..¥8 000160
 000037DF 9A1F7A68 1E5016FE 468D1AF0 681E006A 036A046A 0F6AA850 681E0000 ...hP´j.j.j.j..hÞ..F±.P.hz..Ö7.. 000180
 478926FE 4688065E C4000F08 47C72606 5EC4065F 8C260447 8926A850 88065EC4 á^.¡P´&.G.&._.á^.&úG...á^..F±&.G 0001A0
 56880646 88136A26 6A000036 FF2621F4 068E006A 006A0000 1847C726 065EC40A .á^.&úG...j.]...¶!&.6..j&j..F..V 0001C0
 28FE46C7 D88E3859 881E5657 000002C8 CBC95F5E 1F000038 489A5052 001A0508 ....RP.H8...^_èùà...WV.¡Y8.ÄúF±( 0001E0
```

Dump of file SATURN:[PCCOMMON.DUMP.DLL]INTAB.TMP;1 on 18-APR-1990 10:47:16.73
File ID (705,14,0) End of file block 92 / Allocated 92

Virtual block number 60 (0000003C), 512 (0200) bytes

```
387F246A 9AAAB068 1E5016FE 468D08C4 83386E00 009AAA80 681E006A 02606800 .h'.j..h¯`...n8.á..F±.P.h¯`.j$.8 000000
0039789A 1F81681E 5016FE46 801AF068 1E006A03 6A046A0E 6AAAB068 *F08C483 .á..h¯`j.j.j.j..hÞ..F±.P.h...(9. 000020
C4000038 9E9A1F86 681E5016 FE468D1F 8E681E00 6A036A04 6A0F6AAA BU 31E00 ..h¯`j.j.j.j..h...F±.P.h....8..á 000040
0A478926 FE468806 5EC4000F 0847C726 065EC406 5F8C2604 478926AA B08.)65E ^.j¯`&.G.&._.á^.&úG...á^..F±&.G. 000060
08568806 4688136A 276A0000 36FF2621 F4068E00 6A006A00 011847C7 2606>EC4 á^.&úG...j.J...¶!&.6..j'j..F..V. 000080
0028FE46 C7D88E39 18881E56 57000002 C8C8C95F 5E1F0000 39079A50 52001A05 ...RP..9...^_èùà...WV.j.9.ÁúF±(. 0000A0
83393E24 6A9AAD10 681E5016 FE468D08 C4833920 00009AAD 10681E00 6A028668 h..j..h.Ù...¯9.á..F±.P.h.Ù.j$>9. 0000C0
00003A3A 9A1F9668 1E5016FE 468D1AF0 681E006A 036A046A 0E6AAD10 681E08C4 á..h.Ùj.j.j.j..hÞ..F±.P.h...::.. 0000E0
681E0000 3A589A1F 98681E50 16FE468D 1810681E 006A036A 046A0F6A AD10681E .h.Ùj.j.j.j..h...F±.P.h...X:...h 000100
88065EC4 00003950 9A1FA668 1E5016FE 468D006A 006A006A 036A046A 106AAD10 .Ùj.j.j.j.j.j..F±.P.h!..)9..á^.j 000120
065EC40A 478926FE 468B065E C4001008 47C72606 5EC4065F 8C260447 8926AD10 .Ù&.G.&._.á^.&úG...á^..F±&.G.á^. 000140
001A0508 56880646 88136A28 6A000036 FF2621F4 068E006A 006A0001 1847C726 &úG...j.J...¶!&.6..j(j..F..V.... 000160
02866800 28FE46C7 D88E3907 881E5657 000002C8 C8C95F5E 1F000039 C69A5052 RP.69...^_èùà...WV.j■9.ÁúF±(.h.. 000180
1E08C483 39FD246A 9AAF9668 1E5016FE 468D08C4 8339EC00 009AAF96 681E006A j..h.£...Ĩ9.á..F±.P.h.£.j$»9.á.. 0001A0
96681E00 0038179A 1FAD681E 5016FE46 801FCC68 1E006A03 6A046A0E 6AAF9668 h.£j.j.j.j..h■..F±.P.hÙ...;...h. 0001C0
6AAF9668 1E00003B 359A1F87 681E5016 FE468D18 10681E00 6A036A04 6A0F6AAF £j.j.j.j..h...F±.P.hñ..5;...h.£j 0001E0
```

Dump of file SATURN:[PCCOMMON.DUMP.DLL]INTAB.TMP;1 on 18-APR-1990 10:47:16.73
File ID (705,14,0) End of file block 92 / Allocated 92

Virtual block number 61 (0000003D), 512 (0200) bytes

```
26AF9688 065EC400 003A1C9A 1FC1681E 5016FE46 801AF068 1E006A03 6A046A10 .j.j.j..hÞ..F±.P.hè...:..á^.j.££ 000000
47C72606 5EC40A47 8926FE46 88065EC4 00100847 C726065E C4065F8C 26044789 .G.&._.á^.&úG...á^..F±&.G.á^.&úG 000020
9A505200 1A050856 88064688 136A296A 000036FF 2621F406 8E006A00 6A000118 ...j.J...¶!&.6..j)j..F..V....RP. 000040
1E006A02 60680028 FE46C7D8 8E3AB488 1E565700 0002C8C8 C95F5E1F 00003AA3 È:...^_èùà...WV.¡Ç:.ÁúF±(.h'.j.. 000060
B21C681E 08C4833A DA246A9A B21C681E 5016FE46 8D08C483 3AC90000 9AB21C68 h.ÿ...Ĩ:.á..F±.P.h.ÿ.j$Ö:.á..h.ÿ 000080
0F6AB21C 681E0000 3BF49A1F D4681E50 16FE468D 1AF0681E 006A036A 046A0E6A j.j.j.j..hÞ..F±.P.hå..¶;...h.ÿj. 0000A0
8926B21C B8065EC4 00003AF9 9A1FDD68 1E5016FE 46801810 681E006A 036A046A j.j.j..h...F±.P.hĩ..*:..á^.j.ÿ&. 0000C0
1847C726 065EC40A 478926FE 4688065E C4000F08 47C72606 5EC4065F 8C260447 G.&._.á^.&úG...á^..F±&.G.á^.&úG. 0000E0
809A5052 001A0508 56880646 88136A2A 6A000036 FF2621F4 068E006A 006A0001 ..j.J...¶!&.6..j*j..F..V....RP.. 000100
681E006A 02606800 28FE46C7 D88E3B91 881E5657 000002C8 C8C95F5E 1F00003B ;...^_èùà...WV.j.;.ÁúF±(.h'.j..h 000120
6AB47C68 1E08C483 3887246A 9AB47C68 1E5016FE 468D08C4 8338A600 009AB47C |Ç...T;.á..F±.P.h|Ç.j$ñ;.á..h|Çj 000140
6A0F6AB4 7C681E00 003CB39A 1FE8681E 5016FE46 801AF068 1E006A03 6A046A0E .j.j.j..hÞ..F±.P.hÖ..*<...h|Çj.j 000160
47892684 7C88065E C400003B D69A1FEF 681E5016 FE468D1A F0681E00 6A036A04 .j.j..hÞ..F±.P.hÿ..■;..á^.j|Ç&.G 000180
011847C7 26065EC4 0A478926 FE468806 5EC4000F 0847C726 065EC406 5F8C2604 .&._.á^.&úG...á^..F±&.G.á^.&úG.. 0001A0
3C3F9A50 52001A05 08568806 4688136A 286A0000 36FF2621 F4068E00 6A006A00 .j.J...¶!&.6..j+j..F..V....RP.?< 0001C0
DC681E00 6A030C68 0028FE46 C7D88E3C 50881E56 57000002 C8C8C95F 5E1F0000 ...^_èùà...WV.¡P<.ÁúF±(.hÉ.j..hÉ 0001E0
```

Dump of file SATURN:[PCCOMMON.DUMP.DLL]INTAB.TMP;1 on 18-APR-1990 10:47:16.73
File ID (705,14,0) End of file block 92 / Allocated 92

Virtual block number 62 (0000003E), 512 (0200) bytes

```
0E6AB60C 681E08C4 833C7624 6A9AB60C 681E5016 FE468D08 C4833C65 00009AB6 Ñ...e<.á..F±.P.hÉÑ.j$v<.á..hÉÑj. 000000
046A0F6A B60C681E 00003C95 9A1FF668 1E5016FE 468D1AF0 681E006A 036A046A j.j.j..hÞ..F±.P.h-...<...hÉÑj.j. 000020
036A046A 106AB60C 681E0000 3D909A1F FF681E50 16FE468D 1AF0681E 006A036A j.j..hÞ..F±.P.h....=...hÉÑj.j.j. 000040
006A036A 046A116A B60C681E 00003DAE 9A200568 1E5016FE 468D1AF0 681E006A j..hÞ..F±.P.h. .Ù=...hÉÑj.j.j.j. 000060
681E006A 036A046A 126AB60C 681E0000 3DCC9A20 0C681E50 16FE468D 1AF0681E .hÞ..F±.P.h. .ä=...hÉÑj.j.j.j..h 000080
1AF0681E 006A036A 046A136A B60C681E 00003DEA 9A201268 1E5016FE 468D1AF0 Þ..F±.P.h. .õ=...hÉÑj.j.j.j..hÞ. 0000A0
468D006A 006A006A 016A026A 146AB60C 681E0000 3E089A20 18681E50 16FE468D .F±.P.h. ..>...hÉÑj.j.j.j.j.j..F 0000C0
16FE468D 205C681E 006A036A 046A156A B60C681E 00003E26 9A202168 1E5016FE ±.P.h! .&>...hÉÑj.j.j.j..h\ .F±. 0000E0
1E5016FE 468D1AF0 681E006A 036A046A 166AB60C 681E0000 3E449A20 29681E50 P.h) .D>...hÉÑj.j.j.j..hÞ..F±.P. 000100
3B681E50 16FE468D 1810681E 006A036A 046A176A B60C681E 00003E62 9A203468 h4 .b>...hÉÑj.j.j.j..h...F±.P.h; 000120
9A204668 1E5016FE 468D006A 006A006A 036A046A 186AB60C 681E0000 3E809A20  ..>...hÉÑj.j.j.j.j.j..F±.P.hF . 000140
30549A20 4F681E50 16FE468D 185C681E 006A036A 046A196A B60C681E 00003E9E .>...hÉÑj.j.j.j..h\..F±.P.hO .T= 000160
26FE4688 065EC40^ 190847C7 26065EC4 065F8C26 04478926 B60CB806 5EC40000 ..á^.¡ÉÑ&.G.&._.á^.&úG...á^..F±& 000180
06468813 6A2C6AC  0036FF26 21F4068E 006A006A 00011847 C726065E C40A4789 .G.á^.&úG...j.J...¶!&.6..j,j..F. 0001A0
46C7D88E 300FB81E 56570000 02C8C8C9 5F5E1F00 003CFE9A 5052001A 0508568B .V....RP.±<...^_èùà...WV.j.■.ÁúF 0001C0
246A9ABA B8681E50 16FE468D 08C48330 2400009A BAB8681E 006A02D2 680028FE ±(.h■.j..h¡¤...Ŝ=.á..F±.P.h¡¤.j$ 0001E0
```

```
Dump of file SATURN:[PCCOMMON.DUMP.DLL]INTAB.TMP;1 on 18-APR-1990 10:47:16.73
File ID (705,14,0)   End of file block 92 / Allocated 92

Virtual block number 63 (0000003F), 512 (0200) bytes

 509A2064 681E5J16 FE468D00 6A006A00 6A036A04 6A0E6ABA B8681E08 C4833035 5=.á..h¡¤j.j.j.j.j..F±.P.hd .] 000000
 003F7B9A 2060681E 5016FE46 8D006A00 6A006A03 6A046A0F 6ABAB868 1E00003F ?...h¡¤j.j.j.j.j..F±.P.hm .(?. 000020
 1E00003F 999A2073 681E5016 FE468D00 6A006A00 6A036A04 6A106ABA B8681E00 ..h¡¤j.j.j.j.j..F±.P.hs ..?... 000040
 B8681E00 003FB79A 207A681E 5016FE46 8D006A00 6A006A03 6A046A11 6ABAB868 h¡¤j.j.j.j.j..F±.P.hz .ñ?...h¡ 000060
 B8B8065E C4000030 729A2085 681E5016 FE468D18 5C681E00 6A036A04 6A126ABA ¤j.j.j.j..h\..F±.P.h. .r*..á^.¡¡ 000080
 26065EC4 0A478926 FE468806 5EC40012 0847C726 065EC406 5F8C2604 4789268A ¤&.G.&._.á^.&úG...á^..F±&.G.á^.& 0000A0
 52001A05 08568806 4688136A 206A0000 36FF2621 F4068E00 6A006A00 011847C7 úG...j.J...¶!&.6..j-j..F..V....R 0000C0
 6A02D268 0028FE46 C7D88E3E FAB81E56 57000002 C8CBC95F 5E1F0000 3EE99A50 P.Ô>...^_èùà...WV.¡*>.ÄúF±(.h®.j 0000E0
 681E08C4 833F2024 6A9ABD8A 681E5016 FE468008 C4833F0F 00009ABD 8A681E00 ..h.§....?.á..F±.P.h.§.j$ ?.á..h 000100
 BD8A681E 00004076 9A209168 1E5016FE 468D1AF0 681E006A 036A046A 0E6ABD8A .§j.j.j.j..hÞ..F±.P.h. .vâ...h.§ 000120
 106ABD8A 681E0000 40949A20 97681E50 16FE468D 1AF0681E 006A036A 046A0F6A j.j.j.j..hÞ..F±.P.h. ..â...h.§j. 000140
 046A116A BD8A681E 00004082 9A209068 1E5016FE 468D1AF0 681E006A 036A046A j.j.j..hÞ..F±.P.h. .ýâ...h.§j.j. 000160
 036A046A 126ABD8A 681E0000 40D09A20 A3681E50 16FE468D 1B10681E 006A036A j.j..h...F±.P.hÊ .Àâ...h.§j.j.j. 000180
 8C260447 8926BD8A B8065EC4 00003F3F 9A20AE68 1E5016FE 468D1B5C 681E006A j..h\..F±.P.hÜ .??..á^.¡.§&.G.&. 0001A0
 006A0001 1847C726 065EC40A 478926FE 4688065E C4001208 47C72606 5EC4065F _.á^.&úG.:.á^..F±&.G.á^.&úG...j. 0001C0
 1F000040 029A5052 001A0508 56880646 88136A2E 6A000036 FF2621F4 068E006A J...¶!&.6..j.j..F..V....RP..â... 0001E0

Dump of file SATURN:[PCCOMMON.DUMP.DLL]INTAB.TMP;1 on 18-APR-1990 10:47:16.73
File ID (705,14,0)   End of file block 92 / Allocated 92

Virtual block number 64 (00000040), 512 (0200) bytes

 009AC05C 681E006A 02AC6800 28FE46C7 D88E4013 B81E5657 000002C8 CBC95F5E ^_èùà...WV.¡.â.ÄúF±(.h¯.j..h\à.. 000000
 6A026A0E 6AC05C68 1E08C483 4039246A 9AC05C68 1E5016FE 468D08C4 83402800 .(â.á..F±.P.h\à.j$9â.á..h\àj.j.j 000020
 6A016A02 6A0F6AC0 5C681E00 00418F9A 208A681E 5016FE46 8D006A00 6A006A01 .j.j.j..F±.P.h¤ ..A...h\àj.j.j.j 000040
 1E006A03 6A046A*^ 6AC05C68 1E000041 AD9A20C0 681E5016 FE468D00 6A006A00 .j.j..F±.P.hà .ÙA...h\àj.j.j.. 000060
 5C681E00 6A036A'  6A116AC0 5C681E00 0041C89A 20C9681E 5016FE46 8D1AF068 hÞ..F±.P.hè .ùA...h\àj.j.j..h\ 000080
 065EC406 5F8C2604 478926C0 5C88065E C4000040 589A20CE 681E5016 FE468D18 ..F±.P.hö .Xâ..á^.¡\à&.G.&._.á^. 0000A0
 F4068E00 6A006A00 011847C7 26065EC4 0A478926 FE468806 5EC40011 0847C726 &úG...á^..F±&.G.á^.&úG...j.J...¶ 0000C0
 C8CBC95F 5E1F0000 41189A50 52001A05 08568806 4688136A 2F6A0000 36FF2621 !&.6..j/j..F..V....RP..A...^_èùà 0000E0
 C4834141 00009AC3 08681E00 6A028668 0028FE46 C7D88E41 2C881E56 57000002 ...WV.¡,A.ÄúF±(.h..j..h.û...ÄA.á 000100
 006A006A 036A046A 0E6AC308 681E08C4 83415224 6A9AC308 681E5016 FE468008 ..F±.P.h.û.j$RA.á..h.ûj.j.j.j.j. 000120
 20F4681E 006A036A 046A0F6A C308681E 0000428A 9A200A68 1E5016FE 4680006A j..F±.P.hÖ ..B...h.ûj.j.j.j..h¶ 000140
 4680006A 006A006A 036A046A 106AC308 681E0000 42A89A20 E2681E50 16FE468D .F±.P.hâ .`B...h.ûj.j.j.j.j..F 000160
 47C72606 5EC4065F 8C260447 8926C308 B8065EC4 00004171 9A20E068 1E5016FE ±.P.hÙ .qA..á^.¡.û&.G.&._.á^.&úG 000180
 FF2621F4 068E006A 006A0000 1847C726 065EC40A 478926FE 4688065E C4001008 ...á^..F±&.G.á^.&úG...j.J...¶!&. 0001A0
 000002C8 CBC95F5E 1F000042 169A5052 001A0508 56880646 88136A30 6A000036 6..j0j..F..V....RP..B...^_èùà... 0001C0
 468D08C4 83423C00 009AC58E 681E006A 023A6800 28FE46C7 D88E4227 B81E5657 WV.¡'B.ÄúF±(.h:.j..h.é...<B.á..F 0001E0

Dump of file SATURN:[PCCOMMON.DUMP.DLL]INTAB.TMP;1 on 18-APR-1990 10:47:16.73
File ID (705,14,0)   End of file block 92 / Allocated 92

Virtual block number 65 (00000041), 512 (0200) bytes

 8D006A00 6A006A01 6A086A0E 6AC58E68 1E08C483 424D246A 9AC58E68 1E5016FE ±.P.h.é.j$MB.á..h.éj.j.j.j.j.j.. 000000
 C726065E C4065F8C 26044789 26C58E88 065EC400 00426C9A 2108681E 5016FE46 F±.P.h.!.lB..á^.¡.é&.G.&._.á^.&ú 000020
 2621F406 8E006A00 6A000018 47C72606 5EC40A47 8926FE46 88065EC4 000E0847 G...á^..F±&.G.á^.&úG...j.J...¶!& 000040
 0002C8CB C95F5E1F 000042F3 9A505200 1A050856 88064688 136A316A 000036FF .6..j1j..F..V....RP.µB...^_èùà.. 000060
 8D08C483 43190000 9AC7C868 1E006A02 3A68002B FE46C7D8 8E430488 1E565700 .WV.¡.C.ÄúF±(.h:.j..hàú...¯C.á.. 000080
 2114681E 006A036A 046A0E6A C7C8681E 08C48343 2A246A9A C7C8681E 5016FE46 F±.P.hàú.j$*C.á..hàúj.j.j.j..h.! 0000A0
 26065EC4 065F8C26 04478926 C7C88806 5EC40000 43499A21 0E681E50 16FE468D .F±.P.h.!.IC..á^.¡àú&.G.&._.á^.& 0000C0
 21F4068E 006A006A 00001847 C726065E C40A4789 26FE468B 065EC400 0E0847C7 úG...á^..F±&.G.á^.&úG...j.J...¶! 0000E0
 02C8CBC9 5F5E1F00 0043949A 5052001A 05085688 06468813 6A326A00 0036FF26 &.6..j2j..F..V....RP..C...^_èùà. 000100
 08C48343 BA00009A CA02681E 006A0286 680028FE 46C7D88E 43A5881E 56570000 ..WV.¡ÊC.ÄúF±(.h..j..h.ò...ôC.á. 000120
 6A006A00 6A016A02 6A0E6ACA 02681E08 C48343CB 246A9ACA 02681E50 16FE468D .F±.P.h.ò.j$ûC.á..h.òj.j.j.j.j.j 000140
 8D1AF068 1E006A03 6A046A0F 6ACA0268 1E000044 A99A211C 681E5016 FE468000 ..F±.P.h.!.`D...h.òj.j.j.j..hÞ.. 000160
 FE468D1A F0681E00 6A036A04 6A106ACA 02681E00 0043EA9A 2126681E 5016FE46 F±.P.h&!.õC...h.òj.j.j.j..hÞ..F± 000180
 0847C726 065EC406 5F8C2604 478926CA 0288065E C4000044 889A212B 681E5016 .P.h+!..D..á^.¡.ò&.G.&._.á^.&úG. 0001A0
 36FF2621 F4068E00 6A006A00 011847C7 26065EC4 0A478926 FE468806 5EC40010 ..á^..F±&.G.á^.&úG...j.J...¶!&.6 0001C0
 57000002 C8CBC95F 5E1F0000 44359A50 52001A05 08568806 4688136A 336A0000 ..j3j..F..V....RP.5D...^_èùà...W 0001E0
```

```
Dump of file SATURN:[PCCOMMON.DUMP.DLL]INTAB.TMP;1 on 18-APR-1990 10:47:16.73
File ID (705,14,0)   End of file block 92 / Allocated 92

Virtual block number 66 (00000042), 512 (0200) bytes

 FE468008 C483445B 00009ACC 88681E00 6A02F868 0028FE46 C7D88E44 46B81E56 V.¡FD.ÄúF±(.h%.j..h.ä...[D.Á..F± 000000
 4680006A 006A006A 016A026A 0E6ACC88 681E08C4 83446C24 6A9ACC88 681E5016 .P.h.ä.j$lD.Á..h.äj.j.j.j.j.j..F 000020
 16FE4680 006A^06A 006A016A 026A0F6A CC88681E 00004586 9A213668 1E5016FE ±.P.h6I..E...h.äj.j.j.j.j..F±. 000040
 1E5016FE 4680216C 681E006A 036A046A 106ACC88 681E0000 45A49A21 42681E50 P.hBI.ÊE...h.äj.j.j.j..hll.F±.P. 000060
 52681E50 16FE4680 006A006A 006A036A 046A116A CC88681E 000045C2 9A214868 hKI.öE...h.äj.j.j.j.j.j..F±.P.hR 000080
 9A215768 1E5016FE 4680006A 006A006A 036A046A 126ACC88 681E0000 45E09A21 I.ÀE...h.äj.j.j.j.j.j..F±.P.hWI. 0000A0
 44C79A21 61681E50 16FE4680 006A006A 006A036A 046A136A CC88681E 000045FE ±E...h.äj.j.j.j.j.j..F±.P.haI.ùD 0000C0
 26FE4688 065EC400 130847C7 26065EC4 065F8C26 04478926 CC888806 5EC40000 ..Á^.¡.ä&.G.&._.Á^.&úG...Á^..F±& 0000E0
 06468813 6A346A00 0036FF26 21F4068E 006A006A 00001847 C726065E C40A4789 .G.Á^.&úG...j.J...¶I&.6..j4j..F. 000100
 46C7D88E 4523B81E 56570000 02C8C8C9 5F5E1F00 0045129A 5052001A 05085688 .V....RP..E...^_èùà...WV.¡#E.ÄúF 000120
 246A9ACF 80681E50 16FE4680 08C48345 3800009A CF80681E 006A0260 680028FE ±(.h'.j..h.ü...ßE.Á..F±.P.h.ü.j$ 000140
 B09A2178 681E5016 FE468021 90681E00 6A036A04 6A0E6ACF 80681E08 C4834549 IE.Á..h.üj.j.j.j..h.I.F±.P.hxI.§ 000160
 0045689A 21826^1E 5016FE46 8D006A00 6A006A03 6A046A0F 6ACF8068 1E000046 F...h.üj.j.j.j.j.j..F±.P.h.I.hE. 000180
 8926FE46 88065 :4 000F0847 C726065E C4065F8C 26044789 26CF8088 065EC400 .Á^.¡.u&.G.&._.Á^.&úG...Á^..F±&. 0001A0
 88064688 136A35oA 000036FF 2621F406 8E006A00 6A000018 47C72606 5EC40A47 G.Á^.&úG...j.J...¶I&.6..j5j..F.. 0001C0
 FE46C7D8 8E465A88 1E565700 0002C8C8 C95F5E1F 00004649 9A505200 1A050856 V....RP.IF...^_èùà...WV.¡ZF.ÄúF± 0001E0

Dump of file SATURN:[PCCOMMON.DUMP.DLL]INTAB.TMP;1 on 18-APR-1990 10:47:16.73
File ID (705,14,0)   End of file block 92 / Allocated 92

Virtual block number 67 (00000043), 512 (0200) bytes

 80246A9A D1E0681E 5016FE46 8D08C483 466F0000 9AD1E068 1E006A02 60680028 (.h'.j..hÀI...oF.Á..F±.P.hÀI.j$. 000000
 477C9A21 9C681E50 16FE468D 006A006A 006A016A 026A0E6A D1E0681E 08C48346 F.Á..hÀIj.j.j.j.j.j..F±.P.h.I.|G 000020
 0000469F 9A21A168 1E5016FE 4680006A 006A006A 036A046A 0F6AD1E0 681E0000 ...hÀIj.j.j.j.j.j..F±.P.hÀI..F.. 000040
 478926FE 468B065E C4000F08 47C72606 5EC4065F 8C260447 892601E0 88065EC4 Á^.¡ÀI&.G.&._.Á^.&úG...Á^..F±&.G 000060
 56880646 88136A36 6A000036 FF2621F4 068E006A 006A0000 1847C726 065EC40A .Á^.&úG...j.J...¶I&.6..j6j..F..V 000080
 28FE46C7 D88E4719 881E5657 000002C8 C8C95F5E 1F000047 089A5052 001A0508 ....RP..G...^_èùà...WV.¡.G.ÄúF±( 0000A0
 473F246A 9AD44068 1E5016FE 468D08C4 83472E00 009AD440 681E006A 02866800 .h..j..hâÂ...¯G.Á..F±.P.hâÂ.j$?G 0000C0
 00483B9A 21A968.2 5016FE46 8D006A00 6A006A03 6A046A0E 6AD44068 1E08C483 .Á..hâÂj.j.j.j.j.j..F±.P.h`I.;H. 0000E0
 1E000048 599A21AE 681E5016 FE468D0F 5A681E00 6A036A04 6A0F6AD4 40681E00 ..hâÂj.j.j.j..hZ..F±.P.hÛI.YH... 000100
 065EC400 00475E9ₘ 21B6681E 5016FE46 8D218C68 1E006A03 6A046A10 6AD44068 hâÂj.j.j.j..h¥I.F±.P.hÑI.^G..Á^. 000120
 5EC40A47 8926FE46 88065EC4 00100847 C726065E C4065F8C 26044789 26044088 ¡âÂ&.G.&._.Á^.&úG...Á^..F±&.G.Á^ 000140
 6A376A00 0036FF26 21F4068E 006A006A 00011847 C726065E C4000F16 47C72606 .&úG...Á^¯&úG...j.j...¶I&.6..j7j 000160
 47D8881E 56570000 02C8C8C9 5F5E1F00 0047C79A 5052001A 05085688 06468813 ..F..V....RP.úG...^_èùà...WV.¡AG 000180
 C6681E50 16FE468D 08C48347 ED00009A D6C6681E 006A0286 680028FE 46C7D88E .ÄúF±(.h..j..hó#...ÜG.Á..F±.P.hó 0001A0
 681E5016 FE468D21 E2681E00 6A036A04 6A0E6AD6 C6681E08 C48347FE 246A9AD6 #.j$±G.Á..hó#j.j.j.j..hãI.F±.P.h 0001C0
 21CA681E 5016FE46 801B1068 1E006A03 6A046A0F 6AD6C668 1E000049 219A21C4 ÁI.II...hó#j.j.j.j..h...F±.P.hòI 0001E0

Dump of file SATURN:[PCCOMMON.DUMP.DLL]INTAB.TMP;1 on 18-APR-1990 10:47:16.73
File ID (705,14,0)   End of file block 92 / Allocated 92

Virtual block number 68 (00000044), 512 (0200) bytes

 1D9A21D5 681E5016 FE46801B 5C681E00 6A036A04 6A106AD6 C6681E00 00493F9A .?I...hó#j.j.j.j..h\..F±.P.hII.. 000000
 FE468806 5EC40010 0847C726 065EC406 5F8C2604 47892606 C6B8065E C4000048 H..Á^.¡ó#&.G.&._.Á^.&úG...Á^..F± 000020
 468B136A 386A0000 36FF2621 F4068E00 6A006A00 011847C7 26065EC4 0A478926 &.G.Á^.&úG...j.J...¶I&.6..j8j..F 000040
 FF088E48 BEB81E56 57000000 C8C8C95F 5E1F0000 48AD9A50 52001A05 08568806 ..V....RP.ÜH...^_èùà...WV.¡/H.Ä. 000060
 D468006A 2F6A0676 FF0876FF 000049C5 9AFFFF68 49BF6800 6A106A06 76FF0876 v..v.j.j.h¢Ih...ŽI...v..v.j/j.hÂ 000080
 76FF0000 49EF9AFF FF6849E9 68006A1E 6A0676FF 0876FF00 0049DA9A FFFF6849 Ih...ÖI...v..v.j.j.hÖIh...ÿI...v 0000A0
 4A136800 6A206A06 76FF0876 FF00004A 049AFFFF 6849FE68 006A1F6A 0676FF08 ..v.j.j.h±Ih....J...v..v.j j.h.J 0000C0
 0876FF00 004A2E9A FFFF684A 2868006A 216A0676 FF0876FF 00004A19 9AFFFF68 h....J...v..v.j!j.h(Jh....J...v. 0000E0
 684A5268 006A236A 0676FF08 76FF0000 4A439AFF FF684A30 68006A22 6A0676FF .v.j"j.h=Jh...CJ...v..v.j#j.hRJh 000100
 FF0876FF 00004A6D 9AFFFF68 4A676800 6A256A06 76FF0876 FF00004A 589AFFFF ...XJ...v..v.j%j.hgJh...mJ...v.. 000120
 FF684A91 68006A26 6A0676FF 0876FF00 004A829A FFFF684A 7C68006A 246A0676 v.j$j.h|Jh....J...v..v.j&j.h.Jh. 000140
 76FF0876 FF00004A AC9AFFFF 684AA668 006A296A 0676FF08 76FF0000 4A979AFF ...J...v..v.j)j.hIJh...¯J...v..v 000160
 FFFF684A D068006A 276A0676 FF0876FF 00004AC1 9AFFFF68 4AB86800 6A2C6A06 .j,j.hÉJh...êJ...v..v.j'j.hÅJh.. 000180
 0676FF08 76FF0000 4AEB9AFF FF684AE5 β8006A28 6A0676FF 0876FF00 004AD69A .øJ...v..v.j(j.hIJh...ŠJ...v..v. 0001A0
 9AFFFF68 4B0F6800 6A2B6A06 76FF0876 FF00004B 009AFFFF 684AFA68 006A2A6A j*j.h*Jh....K...v..v.j+j.h.Kh... 0001C0
 6A0676FF 0876FF00 004B2A9A FFFF684B 2468006A 206A0676 FF0876FF 00004B15 .K...v..v.j-j.h$Kh...*K...v..v.j 0001E0
```

Dump of file SATURN:[PCCOMMON.DUMP.DLL]IMTAB.TMP;1 on 18-APR-1990 10:47:16.73
File ID (705,14,0)   End of file block 92 / Allocated 92

Virtual block number 69 (00000045), 512 (0200) bytes

```
549AFFFF 68484E68 006A306A 0676FF08 76FF0000 483F9AFF FF684839 68006A2E .j.h9Kh...?K...v..v.j0j.hNKh...T 000000
326A0676 FF0876FF 00004869 9AFFFF68 48636800 6A316A06 76FF0876 FF000048 K...v..v.j1j.hcKh...iK...v..v.j2 000020
48939AFF FF68488D 68006A33 6A0676FF 0876FF00 00487E9A FFFF6848 7868006A j.hxKh...-K...v..v.j3j.h.Kh....K 000040
6A356A06 76FF0876 FF000048 A89AFFFF 6848A268 006A346A 0676FF08 76FF0000 ...v..v.j4j.hÅKh...´K...v..v.j5j 000060
0048D29A FFFF6848 CC68006A 366A0676 FF0876FF 000048BD 9AFFFF68 48876800 .hñKh...§K...v..v.j6j.häKh...@K. 000080
006A386A 0676FF08 76FF0000 48E79AFF FF6848E1 68006A37 6A0676FF 0876FF00 ..v..v.j7j.hÅKh...ÒK...v..v.j8j. 0000A0
00004C11 9AFFFF68 4C086800 6A396A06 76FF0876 FF0000FF FF9AFFFF 6848E468 hôHh........v..v.j9j.h.Lh....L.. 0000C0
68006A38 6A0676FF 0876FF00 004C269A FFFF684C 2068006A 3A6A0676 FF0876FF .v..v.j:j.h Lh...&L...v..v.j;j.h 0000E0
FF00004C 509AFFFF 684C4A68 006A3C6A 0676FF08 76FF0000 4C389AFF FF684C35 5Lh...;L...v..v.j<j.hJLh...PL... 000100
7468006A 3E6A0676 FF0876FF 00004C65 9AFFFF68 4C5F6800 6A306A06 76FF0876 v..v.j=j.h_Lh...eL...v..v.j>j.ht 000120
76FF0000 4C8F9AFF FF684C89 68006A3F 6A0676FF 0876FF00 004C7A9A FFFF684C Lh...zL...v..v.j?j.h.Lh....L...v 000140
4C836800 6A416A06 76FF0876 FF00004C A49AFFFF 684C9E68 006A406A 0676FF08 ..v.j@j.h.Lh...£L...v..v.jAj.h°L 000160
0876FF00 004CCE9A FFFF684C C868006A 426A0676 FF0876FF 00004CB9 9AFFFF68 h...¿L...v..v.jBj.hàLh...öL...v. 000180
684CF268 006A446A 0676FF08 76FF0000 4CE39AFF FF684CD0 68006A43 6A0676FF .v.jCj.hiLh...DL...v..v.jDj.h·Lh 0001A0
FF0876FF 00004D00 9AFFFF68 4D076800 6A456A06 76FF0876 FF00004C F89AFFFF ...½L...v..v.jEj.h.Mh....M...v.. 0001C0
FF684D31 68006A47 6A0676FF 0876FF00 004D229A FFFF684D 1C68006A 466A0676 v.jFj.h.Mh..."M...v..v.jGj.h1Mh. 0001E0
```

Dump of file SATURN:[PCCOMMON.DUMP.DLL]IMTAB.TMP;1 on 18-APR-1990 10:47:16.73
File ID (705,14,0)   End of file block 92 / Allocated 92

Virtual block number 70 (00000046), 512 (0200) bytes

```
76FF0876 FF00004D 4C9AFFFF 684D4668 006A486A 0676FF08 76FF0000 4D379AFF ..7M...v..v.jHj.hFMh...LM...v..v 000000
FFFF684D 7068006A 4A6A0676 FF0876FF 00004061 9AFFFF68 4D586800 6A496A06 .jIj.h(Mh...aM...v..v.jJj.hpMh.. 000020
0676FF08 76FF0000 4D889AFF FF684D85 68006A4B 6A0676FF 0876FF00 004D769A .vM...v..v.jKj.h.Mh....M...v..v. 000040
9AFFFF68 4DAF6800 6A406A06 76FF0876 FF00004D A09AFFFF 6840 9A68 006A4C6A jLj.h.Mh....M...v..v.jMj.h€Mh... 000060
6A0676FF 0876FF00 004DCA9A FFFF684D C468006A 4E6A0676 FF0876FF 00004085 çM...v..v.jNj.hÊMh...òM...v..v.j 000080
F49AFFFF 684DEE68 006A516A 0676FF08 76FF0000 4DDF9AFF FF684D09 68006A4F Oj.h)Mh...ÒM...v..v.jQj.hÝMh...¶ 0000A0
5E1F0000 E9000088 00004980 9AFFFF68 49AA6800 6A506A06 76FF0876 FF00004D M...v..v.jPj.h¯Ih...¯I..¡..Ö...^ 0000C0
00050824 00034A16 000520A4 00034A55 00051822 00034812 0005003B 90CBC95F _èù.;....K..".. .UJ..Ê ...J..$... 0000E0
00053AAC 00034CA1 00050000 000348F6 000201A6 000349AD 00054124 00034D1F ¯M..$A..Ül..Ï...-K......ÀL..¯:.. 000100
02030000 000548D3 00022830 0003487B 0005262D 0003483C 000530AD 000.'BE4 ôK..ÙO..<K..-&..(K..0+..ÆH...... 000120
00052689 00034851 00050000 0006499B 00024886 0003400C 000503EE 0005 ?03 .I..Ÿ...ÉM..ÑH...I......QK..¿&.. 000140
020332C1 00034C0E 0005443E 00034073 0005298D 00034866 00050A3A 00034A01 .J..:...fK..§)..sM..>D...L..è2.. 000160
00052C49 00034890 00053C48 00034CC8 0005009D 0001498A 010303FA 00054BFC •K..•....I......ùL..H<...K..I,.. 000180
000547D0 00034DC7 000539CF 00034C8C 0005354D 00034C38 0005054A 00034907 ®I..J...BL..MS...L..ù9..ùM..ÅG.. 0001A0
000500D8 00034A28 00051D56 00034AFD 00054652 0003409D 00053851 00034C62 bL..Q8...M..RF..»J..V...+J..Ä... 0001C0
0005316C 000348F9 00052868 000340F1 00052062 00034BA5 00051E0F 00034A40 @J..Ô...ÉK..b-..þM..h(..•K..l1.. 0001E0
```

Dump of file SATURN:[PCCOMMON.DUMP.DLL]IMTAB.TMP;1 on 18-APR-1990 10:47:16.73
File ID (705,14,0)   End of file block 92 / Allocated 92

Virtual block number 71 (00000047), 512 (0200) bytes

```
00051AF8 00034A94 00051276 00034A7F 00053EF2 00034CF5 0005196F 00034827 'K..o...%L..·>...J..v....J..%... 000000
00050000 000349C2 000542FC 00034049 00052E7B 0003488A 000533F8 00034C23 #L..%3..¤K..(...IM..•B..ôI...... 000020
00051588 00034AD3 00053007 00034CE0 00052287 00034A6A 00050786 000349EC &I......jJ...".ÀL...*..ÆJ...... 000040
00053910 00034C77 0005400B 0003400A 00053889 00034C86 00051C09 00034AE8 ÒJ......ÑL...;...M...@..wL...9.. 000060
00052F94 000348CF 00053792 00034C4D 00054711 00034082 00051711 00034AA9 `J......ÿM...G..ML...7..üK.../.. 000080
0000421F 00034034 00054390 0003405E 0005141D 00034ABE 00054518 00034088 .M...E../J......^M...C..4M...B.. 0000A0
8A000288 006A0E30 680000A3 26064688 21F6068E 088EFFFF 881E5657 000002C8 à...WV.¡...Ä..-!.F.&È..h=.j.¡..¤ 0000C0
8A000288 04C483FF FF338A9A 50520040 8A000288 08C483FF FF00009A 50520030 0.RP......á.¡..¤@.RP..3...á.¡..¤ 0000E0
0020E903 7251FE7E 83FE46FF 0003E900 00FE46C7 04C483FF FF49939A 50520069 i.RP..I...á.úF±..Ô...F±.-±Qr.Ô . 000100
FF04E904 C4830002 9FFF2621 F8068E20 FE5E6850 52FFFF8A 0002878D 20FE5E68 k^±-....¤..RPk^±-..%I&.....á.Ôå. 000120
26000207 C726125E C4088E00 08881E56 57000000 C8C8C95F 5E1F0000 E90001B8 ¡..Ô...^_èùà...WV.¡...Äá^.&ú...& 000140
5F5E1F00 5207C726 065EC400 1207C726 0A5EC400 0107C726 0E5EC400 200247C7 úG. .á^.Ēú...á^.&ú...á^.&ú.R..^_ 000160
93000200 00000500 27000200 00000300 47000200 00000100 37000200 0510CAC9 èò.....7.......G.......'........ 000180
DAF7D788 067EC457 38E30C4E 88EC8855 00000000 00000700 A3000200 00000600 ........È.........U.ê.N.DØWá~..æXÖ 0001A0
8C10E3D1 87AAF3C9 13A8F3E9 D1E08A0A 46880128 D187D103 D323D818 D1280C74 t.+Ï.ÙW£.Ï.Ï+Ï.F..ÀiÖµ¨.èµ´.ÏD.. 0001C0
00020033 01050001 CB500856 88064688 5FAAF3C9 13A8F3E9 D1C38EFF FFC381C3 ù.ù...ùiÕµ´.èµ´_.F..V.)ù....3... 0001E0
```

```
Dump of file SATURN:[PCCOMMON.DUMP.DLL]INTAB.TMP;1 on 18-APR-1990 10:47:16.73
File ID (705,14,0)   End of file block 92 / Allocated 92

Virtual block number 72 (00000048), 512 (0200) bytes

45494800 43534544 00535449 424C4156 00000000 00000000 00000000 00000088 ................VALBITS.DESC.NIE 000000
454E494D 00535345 4E4B4349 4854584F 42544E45 00454C59 54535948 43524152 RARCHYSTYLE.ENTBOXTHICKNESS.MINE 000020
43544553 50004354 44495758 4F42544E 454E494D 00544847 49454858 4F42544E NTBOXHEIGHT.MINENTBOXWIDTH.PSETC 000040
00535345 4E4B4349 4854454C 43524943 54455350 00535549 44415245 4C435249 IRCLERADIUS.PSETCIRCLETHICKNESS. 000060
44414548 574F5252 41504948 5350004E 454C4441 4548574F 52524150 49485350 PSHIPARROWHEADLEN.PSHIPARROWHEAD 000080
43524152 4F580053 55494441 52504F52 44524145 54504948 53500048 54444957 WIDTH.PSHIPTEARDROPRADIUS.XORARC 0000A0
55494441 52435241 444E4100 31535549 44415243 5241444E 41005355 49444152 RADIUS.ANDARCRADIUS1.ANDARCRADIU 0000C0
45444953 4E49584F 424E494D 00524C43 45444953 54554F58 4F424E49 4D003253 S2.MINBOXOUTSIDECLR.MINBOXINSIDE 0000E0
53455341 494C4100 4B434142 44454546 4154454D 0052454E 49464544 00524C43 CLR.DEFINER.METAFEEDBACK.ALIASES 000100
54584554 41444D47 4400534E 47495345 44474E48 43005352 54544145 45524600 .FREEATTRS.CHNGDESIGNS.DGMDATEXT 000120
4C4C4100 53544E45 4C4C4100 534E4941 4D4F444C 4C410053 4D49444C 4C410053 S.ALLDIMS.ALLDOMAINS.ALLENTS.ALL 000140
56414C4C 41005345 5341494C 414C4C41 00535254 54414C4C 41005350 49485350 PSHIPS.ALLATTRS.ALLALIASES.ALLAV 000160
5350414D 53595350 414D4C4C 4100534E 47445458 4550414D 4C4C4100 53424154 TABS.ALLMAPEXTDGNS.ALLMAPSYSMAPS 000180
4F4E4144 4C4C4100 53524554 4C49464C 4C410053 54454D41 4E50414D 4C4C4100 .ALLMAPNAMETS.ALLFILTERS.ALLDANO 0001A0
44005344 524F5759 454B4C4C 41005453 494C4C45 53005245 544C4946 00534554 TES.FILTER.SELLIST.ALLKEYWORDS.D 0001C0
4F495352 45564D46 4900454D 414E4244 4D464900 5345544F 4E005345 544F4E41 ANOTES.NOTES.IFMDBNAME.IFMVERSIO 0001E0

Dump of file SATURN:[PCCOMMON.DUMP.DLL]INTAB.TMP;1 on 18-APR-1990 10:47:16.73
File ID (705,14,0)   End of file block 92 / Allocated 92

Virtual block number 73 (00000049), 512 (0200) bytes

49464544 004D4649 5F544E45 52525543 00534D46 4900534D 4F444545 5246004E N.FREEDOMS.IFMS.CURRENT_IFM.DEFI 000000
54455350 4C4C4100 43534544 52524500 454D414E 00545359 4C414E41 0052454E NER.ANALYST.NAME.ERRDESC.ALLPSET 000020
00000003 0012004D 554E4E45 47005345 544F4E4C 4C410053 5945484C 4C410053 S.ALLKEYS.ALLNOTES.GENNUM....... 000040
00000005 00150000 00000005 00140000 00000003 00000000 00000003 000A0000 ................................ 000060
0000000A 00050000 00000000 FFFF0000 00000000 FFFF0000 00000003 00160000 ................................ 000080
00000010 00020000 00000017 00070000 00000006 00060000 00000003 00120000 ................................ 0000A0
00000004 00140000 00000004 000A0000 00000013 00050000 0000000F 00040000 ................................ 0000C0
00000003 002F0000 00000006 00080000 00000004 00070000 00000004 00000000 ........................./..... 0000E0
5600454D 414E0000 00000006 00150000 00000000 00090000 00000018 00030000 ..........................NAME.V 000100
53455341 494C4100 4D49004E 4941404F 44464544 00435345 44005354 49424C41 ALBITS.DESC.DEFDOMAIN.IM.ALIASES 000120
59454B00 5345544F 4E005345 544F4E41 4400534E 4941404F 44005352 54544100 .ATTRS.DOMAINS.DANOTES.NOTES.KEY 000140
00010000 00000005 00060000 00000000 FFFF0000 00000000 027A0053 44524F57 WORDS.z......................... 000160
4F564E49 4D00454D 414E0000 00000004 00070000 0000000B 00050000 00000016 ......................NAME.MINVO 000180
4D524F4E 00555452 47005443 50575247 004C4F56 50584500 4C4F5658 414D004C L.MAXVOL.EXPVOL.GRWPCT.GRTU.NORM 0001A0
49440053 4B414552 4245D041 4E00454E 494C5455 4F004B4F 4D524F4E 004C564C LVL.NORMOK.OUTLINE.NAMEBREAKS.DI 0001C0
004D4900 45505954 52455055 53004353 45440053 5449424C 4156004D 41524741 AGRAM.VALBITS.DESC.SUPERTYPE.IM. 0001E0

Dump of file SATURN:[PCCOMMON.DUMP.DLL]INTAB.TMP;1 on 18-APR-1990 10:47:16.73
File ID (705,14,0)   End of file block 92 / Allocated 92

Virtual block number 74 (0000004A), 512 (0200) bytes

52545441 00534550 59544255 53005359 45480053 54455350 00534553 41494C41 ALIASES.PSETS.KEYS.SUBTYPES.ATTR 000000
44524F57 59454800 5345544F 4E005345 544F4E41 44005352 54544150 4F540053 S.TOPATTRS.DANOTES.NOTES.KEYWORD 000020
50414D00 5350414D 53595350 41400053 46455254 4E450053 444F4854 454D0053 S.METHODS.ENTREFS.MAPSYSMAPS.MAP 000040
00010000 00000014 00020046 45524C44 50004241 54564100 5350414D 52455355 USERMAPS.AVTAB.PDLREF........... 000060
00050000 0000000F 00020000 00000006 00090000 00000010 00030000 00000018 ................................ 000080
004C0000 00000002 00080000 0000001E 00050000 00000002 00170000 0000000A .............................L. 0000A0
FFFF0000 00000000 FFFF0000 00000000 FFFF0000 00000000 03560000 00000010 ......V......................... 0000C0
FFFF0000 00000000 FFFF0000 00000000 FFFF0000 00000000 FFFF0000 00000000 ................................ 0000E0
5449544E 4500454D 414E0000 00000000 FFFF0000 00000000 FFFF0000 00000000 ................................ 000100
4C500053 45495449 544E455F 53490053 45495449 544E455F 4C46004D 46490059 .......................NAME.ENTIT 000120
00020032 5F434952 54454D00 53534543 43415F4D 55430053 45495449 544E455F Y.IFM.FL_ENTITIES.IS_ENTITIES.PL 000140
415F4C46 004D4649 00525454 4100454D 414E0000 00000016 001D0000 0000001A _ENTITIES.CUM_ACCESS.METRIC_2... 000160
53454343 415F4D55 43005352 5454415F 4C500053 52545441 5F534900 53525454 ..............NAME.ATTR.IFM.FL_A 000180
454D414E 00000000 0017001D 00000000 00180005 0000325F 43495254 454D0053 TTRS.IS_ATTRS.PL_ATTRS.CUM_ACCES 0001A0
4D414E45 4352554F 5300454C 4241524F 54530045 4352554F 5300534C 4C554E00 S.METRIC_2..................NAME 0001C0
                                                                        .NULLS.SOURCE.STORABLE.SOURCENAM 0001E0
```

```
Dump of file SATURN:[PCCOMMON.DUMP.DLL]INTAB.TMP;1 on 18-APR-1990 10:47:16.73
File ID (705,14,0)   End of file block 92 / Allocated 92

Virtual block number 75 (0000004B), 512 (0200) bytes

 0054434A 52545441 4E574F00 54434A52 54544152 42400053 5449424C 41560045 E.VALBITS.NBRATTRJCT.OWNATTRJCT. 000000
 41004353 4544004E 49414D4F 44004D49 44005245 4E574F50 4F540052 454E574F OWNER.TOPOWNER.DIM.DOMAIN.DESC.A 000020
 5759454B 00535945 4B005345 5341494C 4100434F 52505649 52454400 42415456 VTAB.DERIVPROC.ALIASES.KEYS.KEYW 000040
 00534554 4F4E4144 00444954 524F504D 49004D55 4E44524F 004D4900 5344524F ORDS.IM.ORDNUM.IMPORTID.DANOTES. 000060
 41005352 54544159 454B4600 4B52414D 00485445 4D564952 45440053 45544F4E NOTES.DERIVMETH.MARK.FKEYATTRS.A 000080
 44500053 50414D52 45535550 414D0053 50414D53 59535041 40005346 45525454 TTREFS.MAPSYSMAPS.MAPUSERMAPS.PD 0000A0
 00000013 00010015 00020000 00000004 000E0000 00000003 000E0053 4645524C LREFS........................... 0000C0
 00000008 00090000 00000002 000B0000 00000014 00070000 00000008 00060000 ................................ 0000E0
 0000001D 00020000 00000002 00180000 00000005 000F0000 0000001A 00010000 ................................ 000100
 00000000 FFFF0000 00000000 FFFF0000 00000000 04B60000 0000000E 004C0000 ..L.......Ä..................... 000120
 00050052 45424D45 4D005245 4E574F00 4D554E44 524F0000 00000000 FFFF0000 ..........ORDNUM.OWNER.MEMBER... 000140
 52455055 5300454D 414E0000 00000000 FFFF0000 00000009 00050000 00000008 ....................NAME.SUPER 000160
 434F5250 00424154 56410044 524F004D 4944544C 55414645 44005245 4E574F00 .OWNER.DEFAULTDIM.ORD.AVTAB.PROC 000180
 47564100 4E454C58 414D004E 454C4E49 4D004550 59544154 41440045 52554445 EDURE.DATATYPE.MINLEN.MAXLEN.AVG 0001A0
 43455250 00454C41 43530045 554C4156 58414D00 45554C41 564E494D 004E454C LEN.MINVALUE.MAXVALUE.SCALE.PREC 0001C0
 534E4941 4D4F4442 55530053 45534149 4C410053 5449424C 4156004E 4F495349 ISION.VALBITS.ALIASES.SUBDOMAINS 0001E0

Dump of file SATURN:[PCCOMMON.DUMP.DLL]INTAB.TMP;1 on 18-APR-1990 10:47:16.73
File ID (705,14,0)   End of file block 92 / Allocated 92

Virtual block number 76 (0000004C), 512 (0200) bytes

 00534554 4F4E4144 004D4900 43534544 00534452 4F575945 4B005352 54544100 .ATTRS.KEYWORDS.DESC.IM.DANOTES. 000000
 00000023 00010009 00060000 00000013 00070000 444F4854 454D0053 45544F4E NOTES.METHOD................#... 000020
 0000000C 00050000 00000003 00070000 00000002 00080000 00000005 00060000 ................................ 000040
 00000000 FFFF0000 00000000 FFFF0000 00000000 071A0000 00000017 00010000 ................................ 000060
 00000000 FFFF0000 00000000 FFFF0000 00000000 08820000 00000000 FFFF0000 ................................ 000080
 00000000 FFFF0000 00000000 FFFF0000 00000000 FFFF0000 00000000 FFFF0000 ................................ 0000A0
 50584500 4C4F5658 414D004C 4F564E49 4D00454D 414E0000 00000000 FFFF0000 ..........NAME.MINVOL.MAXVOL.EXP 0000C0
 42495349 564C4542 414C0043 4F4C0043 53454400 45505954 00504F4C 004C4F56 VOL.LOP.TYPE.DESC.LOC.LABELVISIB 0000E0
 4B414552 424C4542 414C0054 53554A4C 4542414C 00434F4C 4C454241 4C00454C LE.LABELLOC.LABELJUST.LABELBREAK 000100
 53455341 494C4100 59544954 4E450053 5449424C 41560040 41524741 49440053 S.DIAGRAM.VALBITS.ENTITY.ALIASES 000120
 00535254 54415945 4B460053 44524F57 59454B00 53504948 53500053 59454B00 .KEYS.PSHIPS.KEYWORDS.FKEYATTRS. 000140
 5550414D 00535041 4D535953 50414D00 4D490053 45544F4E 00534554 4F4E4144 DANOTES.NOTES.IM.MAPSYSMAPS.MAPU 000160
 000E0004 00000004 00000000 00090009 00000000 00120002 00535041 4D524553 SERMAPS......................... 000180
 0000FFFF 00000000 0000085A 00000000 00310001 00000000 0003000F 00000000 ..............1.....Z........... 0001A0
 0000FFFF 00000000 0000FFFF 00000000 0000FFFF 00000000 0000FFFF 00000000 ................................ 0001C0
 314E494D 00000000 0000FFFF 00000000 0000FFFF 00000000 0000FFFF 00000000 ............................MIN1 0001E0

Dump of file SATURN:[PCCOMMON.DUMP.DLL]INTAB.TMP;1 on 18-APR-1990 10:47:16.73
File ID (705,14,0)   End of file block 92 / Allocated 92

Virtual block nun' ér 77 (0000004D), 512 (0200) bytes

 3258414D 004C4F56 324E494D 004C4F56 31505845 004C4F56 3158414D 004C4F56 VOL.MAX1VOL.EXP1VOL.MIN2VOL.MAX2 000000
 49440043 4F4C504F 52445241 45540045 4C595453 004C4F56 32505845 004C4F56 VOL.EXP2VOL.STYLE.TEARDROPLOC.DI 000020
 53500031 54455350 0053544E 494F5047 45530053 5449424C 4156004D 41524741 AGRAM.VALBITS.SEGPOINTS.PSET1.PS 000040
 00000000 00130003 00000000 00030008 00005345 544F4E41 44004D49 00325445 ET2.IM.DANOTES.................. 000060
 00000000 0000FFFF 00000000 0000FFFF 00000000 00190001 00000000 00130003 ................................ 000080
 0000000C 00040000 58444E49 0052454E 574F0054 50474553 00000000 0000FFFF ........SEGPT.OWNER.INDX........ 0000A0
 4E450053 5449424C 41560052 4F544143 49444E49 00435345 4400454D 414E0000 ..NAME.DESC.INDICATOR.VALBITS.EN 0000C0
 44524F57 59454B00 53544553 50005352 54544100 53455341 494C4100 59544954 TITY.ALIASES.ATTRS.PSETS.KEYWORD 0000E0
 414D0053 50414D53 59535041 4D004D49 00534554 4F4E0053 45544F4E 41440053 S.DANOTES.NOTES.IM.MAPSYSMAPS.MA 000100
 00000012 00030000 00000011 00050000 00000013 00020053 50414052 45535550 PUSERMAPS....................... 000120
 00000000 FFFF0000 00000000 FFFF0000 00000000 09A40000 00000032 00010000 ....2.....É..................... 000140
 00000000 FFFF0000 00000000 FFFF0000 00000000 FFFF0000 00000000 FFFF0000 ................................ 000160
 00050011 00020007 00060012 00010000 4D490059 42444553 5500454D 414E0000 ..NAME.USEDBY.IM................ 000180
 083A0000 0000001B 00010000 00000004 000F0007 00090011 00030012 00070010 ...............................: 0001A0
 53454400 4540414E 00534555 4C415600 544E4500 59424445 53550000 00000000 ......USEDBY.ENT.VALUES.NAME.DES 0001C0
 0000000E 00050007 00070000 53544942 4C415600 4D490045 44554C43 58450043 C.EXCLUDE.IM.VALBITS............ 0001E0
```

Dump of file SATURN:[PCCOMMON.DUMP.DLL]IMTAB.TMP;1 on 18-APR-1990 10:47:16.73
File ID (705,14,0)   End of file block 92 / Allocated 92

Virtual block number 78 (0000004E), 512 (0200) bytes

```
00000000 08AE0000 0000001E 00020000 00000028 00010000 00000004 000C0000 ............+.............Û..... 000000
00004353 45440052 454E574F 00444E45 004E4947 45420000 00000000 FFFF0000 ..........BEGIN.END.OWNER.DESC.. 000020
00020000 43534544 004D4900 59424445 53550045 554C4156 00000000 0003000B ........VALUE.USEDBY.IM.DESC.... 000040
414E0000 00000020 00010000 0000000A 00090014 00030015 00070012 00050016 ......................... .....NA 000060
00030000 53525454 41484600 52545441 00534553 41494C41 00544553 5000454D ME.PSET.ALIASES.ATTR.FKATTRS.... 000080
5500004E 454C0000 00000005 000F0000 00000006 000F001A 00050000 00000015 ..........................LEN..U 0000A0
00000005 000E0002 00040006 00020001 00005453 554A0043 4F4C0059 42444553 SEDBY.LOC.JUST.................. 0000C0
00000000 00150001 00030015 0005000D 0005000C 00030009 00080003 00160007 ................................ 0000E0
5345544F 4E005344 524F5759 454B004C 4358454C 434E4900 504F4C00 454D414E NAME.LOP.INCLEXCL.KEYWORDS.NOTES 000100
43525300 45444F43 44574B00 4D49464F 544E4552 52554300 43534544 004D4900 .IM.DESC.CURRENTOFIM.KWDCODE.SRC 000120
00160005 00170002 000A0006 00210001 00005942 44455355 004D4900 45444F43 CODE.IM.USEDBY....!............. 000140
4C544954 00000000 001F0001 00000000 00080009 00100004 00160003 00180007 ............................TITL 000160
00060022 00010000 4D490054 58455400 44524F57 59454B00 59424445 53550045 E.USEDBY.KEYWORD.TEXT.IM....".. 000180
00000033 00010000 0000000C 00090017 00030019 00070017 00050018 0002000B ............................3... 0001A0
00180005 00190002 0000534C 4C414300 4C445000 52454E57 4F00454D 414E0000 ..NAME.OWNER.PDL.CALLS.......... 0001C0
5245565F 4D324244 00000000 000E0035 00000000 00130031 00000000 001A0007 ........1.......5.......DB2M_VER 0001E0
```

Dump of file SATURN:[PCCOMMON.DUMP.DLL]IMTAB.TMP;1 on 18-APR-1990 10:47:16.73
File ID (705,14,0)   End of file block 92 / Allocated 92

Virtual block number 79 (0000004F), 512 (0200) bytes

```
4D324244 0050414D 53595350 414D004D 4900454D 414E0059 454B5300 4E4F4953 SION.SKEY.NAME.IM.MAPSYSMAP.DB2M 000000
4A424F00 454D414E 4A424F00 59454B53 4A424F44 54584500 4E4F4953 5245565F _VERSION.EXTDOBJSKEY.OBJNAME.OBJ 000020
5350414D 004D4900 4E455244 4C494843 00594548 53544E45 52415000 45505954 TYPE.PARENTSKEY.CHILDREN.IM.MAPS 000040
45005945 4B53004E 4F495352 45565F4D 32424400 544E4552 41500050 414D5359 YSMAP.PARENT.DB2M_VERSION.SKEY.E 000060
49480059 454B534E 45470059 454B534A 424F4454 58450059 454B534E 47445458 XTDGNSKEY.EXTDOBJSKEY.GENSKEY.HI 000080
414E5041 4D004E47 44545845 50414D00 4A424F44 50414D00 4D490059 524F5453 STORY.IM.MAPDOBJ.MAPEXTDGN.MAPNA 0000A0
45505954 4A424F00 454D414E 4A424F00 4E4F4953 5245565F 4D324244 0054454D MET.DB2M_VERSION.OBJNAME.OBJTYPE 0000C0
4944004A 424F4450 414D0059 454B5300 45505954 4E474400 454D414E 4E474400 .DGNNAME.DGNTYPE.SKEY.MAPDOBJ.DI 0000E0
454B0053 4C4544 ° 4D5F5453 414C004D 4649004D 4900454D 414E004A 424F4741 AGOBJ.NAME.IM.IFM.LAST_MODELS.KE 000100
4D594E4F 4E5953uJ 43534544 00534554 4F4E5F44 4E4F4345 53005344 524F5759 YWORDS.SECOND_NOTES.DESC.SYNONYM 000120
00000003 00120000 00000000 FFFF0000 00000000 FFFF0000 00000000 FFFF0053 S............................... 000140
0000000F 00480000 00000003 000A0000 00000003 00000000 00000005 00150000 ..........................H..... 000160
524F5453 5F4F464E 49005353 45434F52 5000454D 414E004A 424F4741 49440000 ..DIAGOBJ.NAME.PROCESS.INFO_STOR 000180
43455300 534D594E 4F4E5953 004D4900 44530053 574F4C46 5F4F464E 49005345 ES.INFO_FLOWS.SD.IM.SYNONYMS.SEC 0001A0
49004353 4544004A 424F5F53 5542004A 424F5F53 59530053 45544F4E 5F444E4F OND_NOTES.SYS_OBJ.BUS_OBJ.DESC.I 0001C0
5F4D554E 004E4F49 53524556 5F4D4900 454D414E 42445F4D 4900454D 414E5F4D M_NAME.IM_DBNAME.IM_VERSION.NUM_ 0001E0
```

Dump of file SATURN:[PCCOMMON.DUMP.DLL]IMTAB.TMP;1 on 18-APR-1990 10:47:16.73
File ID (705,14,0)   End of file block 92 / Allocated 92

Virtual block number 80 (00000050), 512 (0200) bytes

```
5F544944 45005354 4E455645 00534452 4F575945 4B005453 494C4C45 53004843 CH.SELLIST.KEYWORDS.EVENTS.EDIT_ 000000
50480053 46455254 54410053 46455254 4E450054 53594C41 4E410045 54415453 STATE.ANALYST.ENTREFS.ATTREFS.HP 000020
00210000 0000001C 00220053 54584554 41444D47 44004552 4F545348 00434F52 ROC.HSTORE.DGMDATEXTS.".......!. 000040
00230000 00000026 00010000 0000000A 001E0000 0000000A 001F0000 0000000C ........................&.....#. 000060
414E0000 00000003 00180000 00000003 00170000 00000004 002F0000 00000006 ....../.......................NA 000080
4F4C4654 554F0057 4F4C464E 4900454E 494C5455 4F004A42 4F474149 4400454D ME.DIAGOBJ.OUTLINE.INFLOW.OUTFLO 0000A0
4C455200 45505954 00534554 4F4E5F44 4E4F4345 5300534D 594E4F4E 59530057 W.SYNONYMS.SECOND_NOTES.TYPE.REL 0000C0
5344524F 57594548 0048435F 4D554E00 43534544 004D4649 0044535F 44455441 ATED_SD.IFM.DESC.NUM_CH.KEYWORDS 0000E0
00000006 001D0000 00000003 001F0000 00000004 001F0053 4645525F 4C445000 .PDL_REFS....................... 000100
4F495441 4E495453 45440045 4352554F 53004A42 4F474149 44004540 414E0000 ..NAME.DIAGOBJ.SOURCE.DESTINATIO 000120
5345544F 4E5F444E 4F434553 00534D59 4E4F4E59 53005354 4E454D47 4553004E N.SEGMENTS.SYNONYMS.SECOND_NOTES 000140
45564500 43534544 004D4649 004A424F 5F535953 00525241 5F525453 5F504100 .AP_STR_ARR.SYS_OBJ.IFM.DESC.EVE 000160
53455255 54435552 54535F4C 46005344 524F5759 454B0048 435F4D55 4E00544E NT.NUM_CH.KEYWORDS.FL_STRUCTURES 000180
001E0000 434F4C45 4D414E00 53455255 54435552 54535F4C 46004747 49525400 .TRIGG.FL_STRUCTURES.NAMELOC.... 0001A0
001D0000 00000012 00220004 00210004 001E0000 00000013 00220005 00210005 ..!...".........!...".......... 0001C0
58444E49 00545047 45530000 00000002 00260000 00000004 00200000 00000005 ...... .......&.......SEGPT.INDX 0001E0
```

```
Dump of file SATURN:[PCCOMMON.DUMP.DLL]INTAB.TMP;1 on 18-APR-1990 10:47:16.73
File ID (705,14,0)    End of file block 92 / Allocated 92

Virtual block number 81 (00000051), 512 (0200) bytes

41494400 454D41.. 00000000 0005001F 00005245 4E574F00 4A424F47 41494400 .DIAGOBJ.OWNER..........NAME.DIA 000000
544E4F43 00574F4C 4654554F 00574F4C 464E4900 454E494C 54554F00 4A424F47 GOBJ.OUTLINE.INFLOW.OUTFLOW.CONT 000020
45524148 53005345 544F4E5F 444E4F43 45530053 4D594E4F 4E595300 534E4941 AINS.SYNONYMS.SECOND_NOTES.SHARE 000040
5F4D554E 00435345 44004D46 49004A42 4F5F5359 53005841 4D5F4445 52500044 D.PRED_MAX.SYS_OBJ.IFM.DESC.NUM_ 000060
53455255 54435552 54535F53 49005245 424D554E 00534452 4F575945 4B004843 CH.KEYWORDS.NUMBER.IS_STRUCTURES 000080
00000004 001D0000 00000003 001F0000 00000004 001F0053 4645525F 4C445000 .PDL_REFS....................... 0000A0
5000454E 494C5455 4F004A42 4F474149 4400454D 414E0000 00000002 00290000 ..).......NAME.DIAGOBJ.OUTLINE.P 0000C0
5300534D 594E4F4E 59530045 56495449 4D495250 00444C49 48430054 4E455241 ARENT.CHILD.PRIMITIVE.SYNONYMS.S 0000E0
5F465245 50005845 4C504D4F 43005245 424D554E 00534554 4F4E5F44 4E4F4345 ECOND_NOTES.NUMBER.COMPLEX.PERF_ 000100
004E4548 575F4749 5254004E 55525F4E 45485700 54494E55 5F47524F 004A424F OBJ.ORG_UNIT.WHEN_RUN.TRIG_WHEN. 000120
41434F4C 00574F4C 4654554F 00574F4C 464E4900 43534544 004D4649 004C4450 PDL.IFM.DESC.INFLOW.OUTFLOW.LOCA 000140
43555254 535F4C50 00534452 4F575945 4B004843 5F4D554E 0045524F 54535F4C L_STORE.NUM_CH.KEYWORDS.PL_STRUC 000160
53494345 52500045 4C414353 004D554E 44524F00 53544E45 56450053 45525554 TURES.EVENTS.ORDNUM.SCALE.PRECIS 000180
4645525F 4C445000 444C4948 43480042 49534E57 4F440042 49535055 004E4F49 ION.UPSIB.DOWNSIB.HCHILD.PDL_REF 0001A0
00220000 444F4952 45505F48 41455000 54494E55 5F514552 46005145 52460053 S.FREQ.FREQ_UNIT.PEAK_PERIOD..". 0001C0
001F0000 0000000( 001F0000 00000003 00100000 00000004 00220000 00000005 ......"......................... 0001E0

Dump of file SATURN:[PCCOMMON.DUMP.DLL]INTAB.TMP;1 on 18-APR-1990 10:47:16.73
File ID (705,14,0)    End of file block 92 / Allocated 92

Virtual block number 82 (00000052), 512 (0200) bytes

00230000 00000014 00320000 0000001D 00220000 0000001D 00220000 00000003 ......"......."......2.......#. 000000
5F4C4600 574F4C46 5F4F464E 4900454D 414E0000 0000000C 00240008 0025000A ..%...$.......NAME.INFO_FLOW.FL_ 000020
53534543 4F525000 4D554E44 524F0053 52545441 5F4C4600 53454954 49544E45 ENTITIES.FL_ATTRS.ORDNUM.PROCESS 000040
54574F52 47004854 574F5247 20544E45 43524550 00454D55 4C4F5600 4C445000 .PDL.VOLUME.PERCENT GROWTH.GROWT 000060
00000000 00040028 00000000 00020027 00000000 000F001F 00535449 4E552048 H UNITS.........'.......(....... 000080
4540414E 00000000 001C003C 0014003B 0013003A 00140039 00120037 00120036 6...7...9...:...;...<.......NAME 0000A0
46455254 4E455F41 44005352 5454415F 4C460045 52555443 55525453 5F4C4600 .FL_STRUCTURE.FL_ATTRS.DA_ENTREF 0000C0
00030026 00005241 54530059 5449544E 455F5349 004D554E 44524F00 4C445000 .PDL.ORDNUM.IS_ENTITY.STAR..&... 0000E0
4540414E 00000000 0007002A 00000000 00040017 00000000 00040028 00000000 ....(...............*.......NAME 000100
59540052 454E574F 00595449 544E455F 4C460045 52555443 55525453 5F4C4600 .FL_STRUCTURE.FL_ENTITY.OWNER.TY 000120
00260000 52545441 5F534900 4D554E44 524F004C 44500046 45525454 41004550 PE.ATTREF.PDL.ORDNUM.IS_ATTR..&. 000140
00000003 00270004 00260000 00000004 00180000 00000003 00270000 00000004 ......'...............&...'..... 000160
00534549 5449544E 45005353 45434F52 5000454D 414E0000 00000009 00280000 ..+.......NAME.PROCESS.ENTITIES. 000180
002E0000 00000002 002D0000 00000018 00220000 4D554E44 524F0053 52545441 ATTRS.ORDNUM.."......-......... 0001A0
53525454 415F4C50 00455255 54435552 54535F4C 5000454D 414E0000 00000002 ......NAME.PL_STRUCTURE.PL_ATTRS 0001C0
00000003 002C0052 4156004D 554E4452 4F004C44 50004645 52544E45 5F414400 .DA_ENTREF.PDL.ORDNUM.VAR.,..... 0001E0

Dump of file SATURN:[PCCOMMON.DUMP.DLL]INTAB.TMP;1 on 18-APR-1990 10:47:16.73
File ID (705,14,0)    End of file block 92 / Allocated 92

Virtual block number 83 (00000053), 512 (0200) bytes

54435552 54535F4C 5000454D 414E0000 00000013 004C0000 00000003 002D0000 ..-.......L.......NAME.PL_STRUCT 000000
52545441 5F414400 45505954 0052454E 574F0059 5449544E 455F4C50 00455255 URE.PL_ENTITY.OWNER.TYPE.DA_ATTR 000020
00000003 002D0000 00000004 002C0052 4156004D 554E4452 4F004C44 50.. .645 EF.PDL.ORDNUM.VAR.,........-.... 000040
5F4F464E 4900454D 414E0000 0000000F 004D0000 00000004 002C0003 002D .00 ..-...,........M.......NAME.INFO_ 000060
554E4452 4F005352 5454415F 53490053 45495449 544E455F 53490053 524F5.53 STORE.IS_ENTITIES.IS_ATTRS.ORDNU 000080
4900454D 414E0000 00000004 002B0000 00000002 002A0000 00000012 0021004D M.I.......*.......+.......NAME.I 0000A0
50004645 52544E45 5F414400 53525454 415F5349 00455255 54435552 54535F53 S_STRUCTURE.IS_ATTRS.DA_ENTREF.P 0000C0
002B0000 00000003 00290000 53595449 544E455F 4C46004D 554E4452 4F004C44 DL.ORDNUM.FL_ENTITYS..).......+. 0000E0
00455255 54435552 54535F53 4900454D 414E0000 00000005 00170000 00000004 ..............NAME.IS_STRUCTURE. 000100
50004645 52545441 5F414400 45505954 0052454E 574F0059 5449544E 455F5349 IS_ENTITY.OWNER.TYPE.DA_ATTREF.P 000120
00000003 002A0000 00000004 00290052 5454415F 4C46004D 554E4452 4F004C44 DL.ORDNUM.FL_ATTR.)........*..... 000140
4F474149 4400454D 414E0000 00000005 00180000 00000004 00290003 002A0000 ..*...)...............NAME.DIAGO 000160
4D554E00 43534544 004D4649 00534D59 4E4F4E59 5300454E 494C5455 4F004A42 BJ.OUTLINE.SYNONYMS.IFM.DESC.NUM 000180
0022004C 44500045 50595400 53534543 4F525000 5344524F 5759454B 0048435F _CH.KEYWORDS.PROCESS.TYPE.PDL.". 0001A0
494C5455 4F004A42 4F474149 4400454D 414E0000 0000000E 00510000 00000017 ......Q.......NAME.DIAGOBJ.OUTLI 0001C0
5759454B 0048435F 4D554E00 43534544 004D4649 00534D59 4E4F4E59 5300454E NE.SYNONYMS.IFM.DESC.NUM_CH.KEYW 0001E0
```

```
Dump of file SATURN:[PCCOMMON.DUMP.DLL]INTAB.TMP;1 on 18-APR-1990 10:47:16.73
File ID (705,14,0)   End of file block 92 / Allocated 92

Virtual block number 84 (00000054), 512 (0200) bytes

 000E0051 00004C44 50004550 59540053 5345434F 52500057 4F4C4600 5344524F ORDS.FLOW.PROCESS.TYPE.PDL..Q... 000000
 4D594E4F 4E595300 454E494C 54554F00 4A424F47 41494400 454D414E 00000000 ....NAME.DIAGOBJ.OUTLINE.SYNONYM 000020
 5F4F464E 49005344 524F5759 45480048 435F4D55 4E004353 4544004D 46490053 S.IFM.DESC.NUM_CH.KEYWORDS.INFO_ 000040
 00000000 00100021 00004C44 50004550 59540053 5345434F 52500045 524F5453 STORE.PROCESS.TYPE.PDL..!....... 000060
 49484300 544E4552 41500053 5345434F 52500044 494C4450 00000000 000E0051 Q.......PDLID.PROCESS.PARENT.CHI 000080
 434E4552 45464552 00544F4F 5200454D 414E004E 574F4400 5055004E 4552444C LDREN.UP.DOWN.NAME.ROOT.REFERENC 0000A0
 00140031 00150032 00004E4C 52544F4F 52005900 58004550 59544C44 50005345 ES.PDLTYPE.X.Y.ROOTRLN..2...1... 0000C0
 00060035 00060034 00060033 00060032 00060031 00060030 00000000 00140050 P.......0...1...2...3...4...5... 0000E0
 0006003D 0006003C 0006003B 0006003A 00060039 00060038 00060037 00060036 6...7...8...9...:...;...<...=... 000100
 00060045 00060044 00060043 00060042 00060041 00060040 0006003F 0006003E >...?...@...A...B...C...D...E... 000120
 0006004D 0006004C 0006004B 0006004A 00060049 00060048 00060047 00060046 F...G...H...I...J...K...L...M... 000140
 00050034 00050033 00050032 00050031 00050030 00000000 0006004F 0006004E N...O.......0...1...2...3...4... 000160
 0005003C 0005003B 0005003A 00050039 00050038 00050037 00050036 00050035 5...6...7...8...9...:...;...<... 000180
 00050044 00050043 00050042 00050041 00050040 0005003F 0005003E 0005003D =...>...?...@...A...B...C...D... 0001A0
 0005004C 0005004B 0005004A 00050049 00050048 00050047 00050046 00050045 E...F...G...H...I...J...K...L... 0001C0
 00040033 00040032 00040031 00040030 00000000 0005004F 0005004E 0005004D M...N...O.......0...1...2...3... 0001E0

Dump of file SATURN:[PCCOMMON.DUMP.DLL]INTAB.TMP;1 on 18-APR-1990 10:47:16.73
File ID (705,14,0)   End of file block 92 / Allocated 92

Virtual block number 85 (00000055), 512 (0200) bytes

 0004003B 0004003A 00040039 00040038 00040037 00040036 00040035 00040034 4...5...6...7...8...9...:...;... 000000
 00040043 00040042 00040041 00040040 0004003F 0004003E 0004003D 0004003C <...=...>...?...@...A...B...C... 000020
 0004004B 0004004A 00040049 00040048 00040047 00040046 00040045 00040044 D...E...F...G...H...I...J...K... 000040
 00030032 00030031 00030030 00000000 0004004F 0004004E 0004004D 0004004C L...M...N...O.......0...1...2... 000060
 0003003A 00030039 00030038 00030037 00030036 00030035 00030034 00030033 3...4...5...6...7...8...9...:... 000080
 00030042 00030041 00030040 0003003F 0003003E 0003003D 0003003C 0003003B ;...<...=...>...?...@...A...B... 0000A0
 0003004A 00030049 00030048 00030047 00030046 00030045 00030044 00030043 C...D...E...F...G...H...I...J... 0000C0
 00000000 0009004E 00000000 0003004F 0003004E 0003004D 0003004C 0003004B K...L...M...N...O.......N....... 0000E0
 00000000 0008004E 0008004D 0008004C 0008004A 00080049 00080048 00080047 G...H...I...J...L...M...N....... 000100
 00080039 00080038 00080037 00080036 00080035 00080034 00080033 00080030 0...3...4...5...6...7...8...9... 000120
 00080046 00080044 00080043 00080041 0008003F 0008003C 0008003B 0008003A :...;...<...?...A...C...D...F... 000140
 434F5250 00000000 00080048 00000000 0008004B 00000000 0008004F 0008004B K...O.......K.......H.......PROC 000160
 4C444E41 48444E4F 43005354 4E454D45 54415453 00454C42 41495241 56535345 ESSVARIABLE.STATEMENTS.CONDHANDL 000180
 4E49004C 44500044 4F485445 4D00434F 52505458 4500434F 5250544E 4, 05245 ER.INTPROC.EXTPROC.METHOD.PDL.IN 0001A0
 00320002 00310002 00300053 45494649 444F4D00 53545550 54554F00 53: 5550 PUTS.OUTPUTS.MODIFIES.0...1...2. 0001C0
 003A0002 00390002 00380002 00370002 00360002 00350002 00340002 00330002 ..3...4...5...6...7...8...9...:. 0001E0

Dump of file SATURN:[PCCOMMON.DUMP.DLL]INTAB.TMP;1 on 18-APR-1990 10:47:16.73
File ID (705,14,0)   End of file block 92 / Allocated 92

Virtual block number 86 (00000056), 512 (0200) bytes

 00420002 00410002 00400002 003F0002 003E0002 003D0002 003C0002 003B0002 ..;...<...=...>...?...@...A...B. 000000
 004A0002 00490002 00480002 00470002 00460002 00450002 00440002 00430002 ..C...D...E...F...G...H...I...J. 000020
 00000007 00260000 00000002 00510002 004F0002 004E0002 004D0002 004C0002 ..L...M...N...O...Q.......&..... 000040
 4D455441 54530045 4C424149 52415653 5345434F 52500000 00000004 00160000 ..........PROCESSVARIABLE.STATEM 000060
 434F5250 54584500 434F5250 544E4900 52454C44 4E414844 4E4F4300 53544E45 ENTS.CONDHANDLER.INTPROC.EXTPROC 000080
 56535345 434F5250 00000000 00180005 00004C44 50004554 55424952 54544100 .ATTRIBUTE.PDL..........PROCESSV 0000A0
 53544E45 4D455441 5453004E 45485744 45524547 47495254 00454C42 41495241 ARIABLE.TRIGGEREDWHEN.STATEMENTS 0000C0
 4D464900 434F5250 54584500 434F5250 544E4900 52454C44 4E414844 4E4F4300 .CONDHANDLER.INTPROC.EXTPROC.IFM 0000E0
 534D5241 50545550 4E490000 0000000F 00220000 4C445000 53534543 4F52505F _PROCESS.PDL..".......INPUTPARMS 000100
 45544154 53005340 52415053 45494649 444F4D00 534D5241 50545550 54554F00 .OUTPUTPARMS.MODIFIESPARMS.STATE 000120
 54554F00 534D5241 50545550 4E490052 454C444E 4148444E 4F430053 544E454D MENTS.CONDHANDLER.INPUTPARMS.OUT 000140
 544E454D 45544154 53005340 52415053 45494649 444F4D00 534D5241 50545550 PUTPARMS.MODIFIESPARMS.STATEMENT 000160
 47524154 55504E49 00455255 4445434F 52500052 454C444E 4148444E 4F430053 S.CONDHANDLER.PROCEDURE.INPUTARG 000180
 00160000 53475241 444F4D00 53475241 444F4D00 53475241 54555054 554F0053 S.OUTPUTARGS.MODARGS.MODARGS.... 0001A0
 45434F52 50005357 4F4C464F 464E4900 45524548 57004F46 4E490000 00000005 ......INFO.WHERE.INFOFLOWS.PROCE 0001C0
 4C464F46 4E490045 52454857 004F464E 49005443 55525453 5F4C4600 53455353 SSES.FL_STRUCT.INFO.WHERE.INFOFL 0001E0
```

```
Dump of file SATURN:[PCCOMMON.DUMP.DLL]IMTAB.TMP;1 on 18-APR-1990 10:47:16.73
File ID (705,14,0)   End of file block 92 / Allocated 92

Virtual block number 87 (00000057), 512 (0200) bytes

 4F495449 444E4F43 00544355 5254535F 4C460053 45535345 434F5250 0053574F OWS.PROCESSES.FL_STRUCT.CONDITIO 000000
 00534555 4C415C00 53455455 42495254 54410059 5449544E 45005347 5241004E N.ARGS.ENTITY.ATTRIBUTES.VALUES. 000020
 4C460052 454C444E 4148444E 4F430045 524F5453 4F464E49 00484755 4F524854 THROUGH.INFOSTORE.CONDHANDLER.FL 000040
 524F5453 4F464E49 00455245 48570053 45434E41 54534E49 00544355 5254535F  STRUCT.INSTANCES.WHERE.INFOSTOR 000060
 00544355 5254535F 4C460048 47554F52 48540052 454C444E 4148444E 4F430045 E.CONDHANDLER.THROUGH.FL_STRUCT. 000080
 0045524F 54534F46 4E490053 52545441 00455245 48570053 45434E41 54534E49 INSTANCES.WHERE.ATTRS.INFOSTORE. 0000A0
 4E450054 43555254 535F4C46 00484755 4F524854 0052454C 444E4148 444E4F43 CONDHANDLER.THROUGH.FL_STRUCT.EN 0000C0
 54530045 52454857 00535254 54410054 434E4954 53494400 45505954 59544954 TITYTYPE.DISTINCT.ATTRS.WHERE.ST 0000E0
 00525454 41524544 524F0053 53454C4E 5500454C 49485700 53544E45 4D455441 ATEMENTS.WHILE.UNLESS.ORDERATTR. 000100
 0052454C 444E4148 444E4F43 0045524F 54534F46 4E490052 54544150 554F5247 GROUPATTR.INFOSTORE.CONDHANDLER. 000120
 5F4C4600 4F544E49 00484755 4F524854 00454055 4C4F565F 44455443 45505845 EXPECTED_VOLUME.THROUGH.INTO.FL_ 000140
 43534100 52545441 00000000 0008003E 00000000 0008003D 00005443 55525453 STRUCT..=.......>.......ATTR.ASC 000160
 00400000 46494553 4C450054 53455400 474E4956 41480052 54544100 47414C46 FLAG.ATTR.HAVING.TEST.ELSEIF..@. 000180
 4C455300 46494553 4C450053 544E454D 45544154 53005453 45540000 00000008 ......TEST.STATEMENTS.ELSEIF.SEL 0001A0
 00080042 004E4F49 53534552 50584500 45534957 52454854 4F005352 4F544345 ECTORS.OTHERWISE.EXPRESSION.B... 0001C0
 53005445 47524154 0053544E 454D4554 41545300 524F5443 454C4553 00000000 ....SELECTOR.STATEMENTS.TARGET.S 0001E0

Dump of file SATURN:[PCCOMMON.DUMP.DLL]IMTAB.TMP;1 on 18-APR-1990 10:47:16.73
File ID (705,14,0)   End of file block 92 / Allocated 92

Virtual block number 88 (00000058), 512 (0200) bytes

 4C494857 00524F53 52554300 45524548 5700524F 54415245 54490045 4352554F OURCE.ITERATOR.WHERE.CURSOR.WHIL 000000
 54415055 4F524700 47414C46 43534100 53525454 4144524F 004C4954 4E550045 E.UNTIL.ORDATTRS.ASCFLAG.GROUPAT 000020
 43004550 59544E45 48570053 544E454D 45544154 5300474E 49564148 00535254 TRS.HAVING.STATEMENTS.WHENTYPE.C 000040
 45485700 524F5443 454C4553 00000000 0008003E 00005245 4C444E41 48444E4F ONDHANDLER..>.......SELECTOR.WHE 000060
 52454C44 4E414844 4E4F4300 53544E45 4D455441 54530052 4F535255 43004552 RE.CURSOR.STATEMENTS.CONDHANDLER 000080
 4F430053 544E454D 45544154 53004C49 544E5500 454C4948 57005345 4D495400 .TIMES.WHILE.UNTIL.STATEMENTS.CO 0000A0
 4F430053 47524100 524F5441 5245504F 00535341 4C430052 454C444E 4148444E NDHANDLER.CLASS.OPERATOR.ARGS.CO 0000C0
 5F4C5000 4E4F4954 494E4946 45440053 5345434F 52500052 454C444E 4148444E NDHANDLER.PROCESS.DEFINITION.PL_ 0000E0
 41560045 554C4156 00000000 001F0022 00130021 0011001F 000E001E 004A424F OBJ.........!...".......VALUE.VA 000100
 45544154 53005352 4156004E 4F495449 444E4F43 00000000 00030012 0045554C LUE.........CONDITION.VARS.STATE 000120
 5449544E 45004741 4C465F4C 4C410047 414C465F 59544954 4E450053 544E454D MENTS.ENTITY_FLAG.ALL_FLAG.ENTIT 000140
 001F0002 00005954 49544E45 5F4C5000 45524F54 535F4D46 49005254 54410059 Y.ATTR.IFM_STORE.PL_ENTITY...... 000160
 00004554 55424952 5454415F 4C500045 54554249 52545441 00000000 00060017 ........ATTRIBUTE.PL_ATTRIBUTE.. 000180
 45480045 54414400 45505954 4C445000 45505954 00000000 00060018 001F0005 ............TYPE.PDLTYPE.DATE.KE 0001A0
 4D455441 54530054 4E455645 00000000 0008004A 00004353 45440044 524F5759 YWORD.DESC..J.......EVENT.STATEM 0001C0
 00000000 00240000 0025000C 00230000 52454C44 4E414844 4E4F4300 53544E45 ENTS.CONDHANDLER..#...%...$..... 0001E0

Dump of file SATURN:[PCCOMMON.DUMP.DLL]IMTAB.TMP;1 on 18-APR-1990 10:47:16.73
File ID (705,14,0)   End of file block 92 / Allocated 92

Virtual block number 89 (00000059), 512 (0200) bytes

 09AC0203 02680003 08A20203 02EA0003 09D40203 003421F6 21F421F2 FFFF0000 ....·1¶!-!4...å...õ...Å...k...¯. 000000
 050E0203 01760003 08620203 00760003 04C60203 01F20003 088A0203 00EE0003 ..Ÿ.......·...ó...v...b...v..... 000020
 21F80002 00FE0003 084A0203 027E0003 08AA0203 02F80003 07320203 03770003 ..w...2...«...¯...~...J...±...½! 000040
 08420203 03890003 090C0203 02060003 08720203 01850003 072A0203 00000007 ......*.......r.......É.......B. 000060
 04DE0203 02910003 08820203 03100003 08620203 010E0003 09840203 00880003 ......Ç.......b.......ý.......B. 000080
 05160203 039C0003 09E40203 02180003 087A0203 01980003 07220203 00140003 ......".......z.......ô......... 0000A0
 04E60203 03240003 0C120203 01200003 098C0203 00A00003 04F60203 02A00003 ......-.......¥..._.......$...|. 0000C0
 09C40203 02300003 08920203 02800003 051E0203 01AA0003 0A800203 00280003 ..(.......´.......¯.......0...Å. 0000E0
 04EE0203 03830004 0F420203 00880003 075E0203 03390003 02820203 01330003 ..3.......9...^...£...B...°...Ÿ. 000100
 09CC0203 02440003 089A0203 02C20003 05060203 01800003 0A880203 003C0003 ..<.......§.......ô.......D...ä. 000120
 0F320203 01000003 0A900203 03500003 04CE0203 00500003 04FE0203 01450003 ..E...±...P...ö...P.......Å...2. 000140
 0C0A0203 02580003 086A0203 01570003 08520203 02050003 086A0203 03C90004 ..è...j...f...R...W...j...X..... 000160
 04D60203 01E30003 035E0203 00620003 048E0203 03090004 0F3A0203 00080003 ..Ü...:...\.../...b...^...D...ø. 000180
 444F4D5F 53534543 4F52500E 00010352 00000000 01670003 085A0203 03650003 ..e...Z...g.....R....PROCESS_MOD 0001A0
 574F4C46 0E00574F 4C465F4F 464E490A 00545345 445F4543 52554F53 0C004C45 EL..SOURCE_DEST..INFO_FLOW..FLOW 0001C0
 4F5F544E 45544E4F 430F0045 524F5453 5F4F464E 49080054 505F4554 554F525F _ROUTE_PT..INFO_STORE..CONTENT_O 0001E0
```

```
Dump of file SATURN:[PCCOMMON.DUMP.DLL]IMTAB.TMP;1 on 18-APR-1990 10:47:16.73
File ID (705,14,0)   End of file block 92 / Allocated 92

Virtual block number 90 (0000005A), 512 (0200) bytes

 5F455341 42415441 440F0054 4E455645 06005353 45434F52 50080054 43454A42 BJECT..PROCESS..EVENT..DATABASE_ 000000
 52555443 55525453 5F574F4C 460F0054 4E455645 5F574F4C 46080054 4E455645 EVENT..FLOW_EVENT..FLOW_STRUCTUR 000020
 10004554 5542?752 5454415F 574F4C46 0F005954 49544E45 5F574F4C 460C0045 E..FLOW_ENTITY..FLOW_ATTRIBUTE.. 000040
 00000059 5449544E 455F4552 4F545300 00455255 54435552 54535F45 524F5453 STORE_STRUCTURE..STORE_ENTITY... 000060
 54554249 52545441 5F45524F 54531000 4C45444F 4D5F5453 594C414E 410E0352 R..ANALYST_MODEL..STORE_ATTRIBUT 000080
 44500E00 59544954 4E455F4C 44500800 45525554 43555254 535F4C44 500E0045 E..PDL_STRUCTURE..PDL_ENTITY..PD 0000A0
 41530A00 484E4953 5F454352 554F535F 4C445010 00455455 42495254 54415F4C L_ATTRIBUTE..PDL_SOURCE_SINK..SA 0000C0
 4C445012 004C4450 0400444F 4854454D 5F595449 544E450E 00595449 544E455F _ENTITY..ENTITY_METHOD..PDL..PDL 0000E0
 544F4F52 5F535345 434F5250 5F4C4450 1100444F 4854454D 5F595449 544E455F _ENTITY_METHOD..PDL_PROCESS_ROOT 000100
 414E5245 544E495F 4C445012 00434F52 505F4C41 4E524554 58455F4C 44501200 ..PDL_EXTERNAL_PROC..PDL_INTERNA 000120
 45544154 535F444E 45530F00 544E454D 45544154 535F4F44 0000434F 52505F4C L_PROC..DO_STATEMENT..SEND_STATE 000140
 00000000 00000000 00544E45 4D455441 54535F45 56494543 45521200 544E454D MENT..RECEIVE_STATEMENT......... 000160
 54415453 5F455441 45524311 00544E45 4D455441 54535F4C 414E4749 53110352 R..SIGNAL_STATEMENT..CREATE_STAT 000180
 5F455441 44505511 00544E45 4D455441 54535F45 54454C45 44110054 4E454D45 EMENT..DELETE_STATEMENT..UPDATE_ 0001A0
 4F100054 4E454D45 54415453 5F455645 49525445 52130054 4E454D45 54415453 STATEMENT..RETRIEVE_STATEMENT..O 0001C0
 00455455 42495254 54415F50 554F5247 10004554 55424952 5454415F 52454452 RDER_ATTRIBUTE..GROUP_ATTRIBUTE. 0001E0

Dump of file SATURN:[PCCOMMON.DUMP.DLL]IMTAB.TMP;1 on 18-APR-1990 10:47:16.73
File ID (705,14,0)   End of file block 92 / Allocated 92

Virtual block number 91 (0000005B), 512 (0200) bytes

 00544E45 4D455441 54535F46 4945534C 45110054 4E454D45 54415453 5F46490D .IF_STATEMENT..ELSEIF_STATEMENT. 000000
 1100524F 5443454C 45535F45 5341430E 00544E45 4D455441 54535F45 5341430F .CASE_STATEMENT..CASE_SELECTOR.. 000020
 4D455441 54535F48 43414552 4F461200 544E454D 45544154 535F4E47 49535341 ASSIGN_STATEMENT..FOREACH_STATEM 000040
 54535F50 4F4F4C0F 00544E45 4D455441 54535F45 5059544E 45485713 00544E45 ENT..WHENTYPE_STATEMENT..LOOP_ST 000060
 00000000 00000000 004E4F49 53534552 5058455F 4C44500F 00544E45 4D455441 ATEMENT..PDL_EXPRESSION......... 000080
 54534E4F 43454C50 4D49535F 4C445010 00454C42 41495241 565F4C44 50000352 R..PDL_VARIABLE..PDL_SIMPLECONST 0000A0
 1100544E 454D45 4 4154535F 4E454857 0F00544E 4154534E 4F435F4C 44500000 ..PDL_CONSTANT..WHEN_STATEMENT.. 0000C0
 55525453 5050415F 42495254 54411100 54435552 54535050 415F5954 49544E45 ENTITY_APPSTRUCT..ATTRIB_APPSTRU 0000E0
 4E454D45 54415453 5F45544F 4E0F0045 54454C4F 53424F5F 50504154 0E005443 CT..TAPP_OBSOLETE..NOTE_STATEMEN 000100
 00010001 00010001 00010001 0001004E 4548575F 44455245 47474952 540F0054 T..TRIGGERED_WHEN............... 000120
 004C4544 4F4D5F41 54414408 00010001 00010001 00010001 00010001 00010352 R...................DATA_MODEL. 000140
 5454410A 00504948 5352454E 54524150 0C005445 535F5006 00595449 544E4507 .ENTITY..P_SET..PARTNERSHIP..ATT 000160
 00000000 0000004E 4941404F 4407004E 4F49534E 454D4944 0A004554 55424952 RIBUTE..DIMENSION..DOMAIN....... 000180
 41494C41 06005945 4B5F544E 45080054 505F4554 554F525F 50494853 500F0352 R..PSHIP_ROUTE_PT..ENT_KEY..ALIA 0001A0
 0045554C 41565F45 4C424157 4F4C4C41 1000454C 4241545F 45554C41 560C0053 S..VALUE_TABLE..ALLOWABLE_VALUE. 0001C0
 4E474945 524F460C 004E4F49 54434E55 4A5F5254 54410E00 44524F57 59454B08 .KEYWORD..ATTR_JUNCTION..FOREIGN 0001E0

Dump of file SATURN:[PCCOMMON.DUMP.DLL]IMTAB.TMP;1 on 18-APR-1990 10:47:16.73
File ID (705,14,0)   End of file block 92 / Allocated 92

Virtual block number 92 (0000005C), 512 (0200) bytes

 4D415246 5F45474C 41484300 004E4749 5345445F 45474E41 48430E00 5945485F _KEY..CHANGE_DESIGN..CHANGE_FRAM 000000
 5345544F 4E060053 45544F4E 5F524509 00524554 4C494607 00545845 54050045 E..TEXT..FILTER..ER_NOTES..NOTES 000020
 00000000 0000000C 0050414D 5F4D505F 59544954 4E450E00 444F4854 454D0700 ..METHOD..ENTITY_PM_MAP......... 000040
 4E474953 45445F54 58455F50 414D0F00 50414D5F 4D505F42 49525454 410E0352 R..ATTRIB_PM_MAP..MAP_EXT_DESIGN 000060
 50414D5F 4D455453 59535F50 414D0F00 454C4241 545F454D 414E5F50 414D0F00 ..MAP_NAME_TABLE..MAP_SYSTEM_MAP 000080
 4C49464F 52505F4E 47495345 445F4144 12005041 4D5F5245 53555F50 414D0000 ..MAP_USER_MAP..DA_DESIGN_PROFIL 0000A0
 00000000 00000000 00000001 00010001 00010001 00010001 00010001 00010045 E............................... 0000C0
 00000000 00000000 00000000 00000000 00000000 00000000 00000000 00000000 ................................ 0000E0
 00000000 00000000 00000000 00000000 00000000 00000000 00000000 00000000 ................................ 000100
 00000000 00000000 00000000 00000000 00000000 00000000 00000000 00000000 ................................ 000120
 00000000 00000000 00000000 00000000 00000000 00000000 00000000 00000000 ................................ 000140
 00000000 00000000 00000000 00000000 00000000 00000000 00000000 00000000 ................................ 000160
 00000000 00000000 00000000 00000000 00000000 00000000 00000000 00000000 ................................ 000180
 00000000 00000000 00000000 00000000 00000000 00000000 00000000 00000000 ................................ 0001A0
 00000000 00000000 00000000 00000000 00000000 00000000 00000000 00000000 ................................ 0001C0
 00000000 00000000 00000000 00000000 00000000 00000000 00000000 00000000 ................................ 0001E0
```

File ID (29,26,0)    End of file block 61 / Allocated 64

Virtual block number 1 (00000001), 512 (0200) bytes

```
00000000 00000040 00000000 00000088 0000FFFF 00000004 00000030 00C15A4D MZè.=...........|.......a....... 000000
00000080 00000000 00000000 00000000 00000000 00000000 00000000 00000000 ................................ 000020
6F6E6E61 63206D61 72676F72 70207369 685421CD 4C01B821 CD09B400 0E8A1F0E ..o..Ç.ë|¡.LëlThis program canno 000040
00000000 00000024 0A0D0D2E 65646F6D 20534F44 206E6920 6E757220 65622074 t be run in DOS mode....$....... 000060
00060003 00030000 00011956 20000000 0003000A E58890BB 0002009D 0505454E NE......£..|....... V........... 000080
00000000 00000000 00010000 00040000 0000011F 006F0063 00580058 00400004 ..a.X.X.c.o..................... 0000A0
4C4C4154 534E4907 14300F01 12570665 050C0E01 00000000 63860F00 63860013 ...c...c........e.W...0..INSTALL 0000C0
4C41434F 49560853 4C4C4143 534F4408 00002A00 21001900 13000A00 01000000 ...........|.*...DOSCALLS.VIOCAL 0000E0
00000053 4C4E0353 4C4C4143 44424B08 49504148 53405007 4E495740 5005534C LS.PMWIN.PMSHAPI.KBDCALLS.NLS... 000100
00FE46C7 D88EFFFF B81E5657 000092C8 00000000 00000000 00000000 00000000 ................à...WV.|...ĂúF±. 000120
FF0A76FF 5052004F BA047888 00CCE900 01B80006 E9037400 01300038 0B249A00 ..$.8.=..t.Õ..|..Õä.|x.¤0.RP.v.. 000140
60BA0478 B800A5E9 0001B800 06E90374 0001300A C4830056 07989A06 76FF0876 v..v....V..á.=..t.Õ..|..ÕE.|x.¤m 000160
5200798A 0478B800 87E90001 B80006E9 03740001 3D04C483 008A0576 9A505200 .RP.v....á.=..t.Õ..|..Õ..|x.¤y.R 000180
8D14C483 00982580 9A5016FF 6E868000 4C681E50 5200A1BA 0478B800 42681E50 P.hB.|x.¤À.RP.hL...n..P.¯%...á.. 0001A0
00013004 C48300C5 12409A50 5200BEBA 0478B804 C48300A8 2BB49A50 16FF6E86 .n..P.Ç+´..á.|x.¤ƒ.RP.a.é..á.=.. 0001C0
E9037400 013004C4 8300E518 629A5052 00DEBA04 78B80001 FE46C700 05E90374 t.Õ..úF±..|x.¤B.RP.b.|..á.=..t.Õ 0001E0
```

Dump of file SATURN:[PCCOMMON.DUMP]INSTALL.EXE;1 on 18-APR-1990 10:27:36.56
File ID (29,26,0)    End of file block 61 / Allocated 64

Virtual block number 2 (00000002), 512 (0200) bytes

```
0000E9FE 468B06C4 83FFFF0C 729A5052 FFFFBA04 7888FE76 FF0001FE 46C70005 ..úF±...v±|x.¤..RP.r....á..F±Õ.. 000000
681E00E6 E90000B8 0081E906 468BD88E 0008881E 56570000 00C890C8 C95F5E1F .^_èù.à...WV.|...Ă.F.Õ..|..Õl..h 000020
008B681E 00B0E904 C4830133 1C8B9A00 74681E00 BFE904C4 8301241C B89A005A Z.¯|.$..á.Õ¢..ht..|.3..á.Õ¯..h.. 000040
B89A00C0 681E0092 E904C483 01511C88 9A00A468 1E00A1E9 04C48301 421CB89A .|.B..á.ÕÀ..hÊ..|.Q..á.Õ...hâ..| 000060
7E1CB89A 00F8681E 0074E904 C483016F 1CB89A00 E1681E00 83E904C4 8301601C .'..á.Õ...hÃ..|.o..á.Õt..h%..|.~ 000080
77E90375 00123000 53E90056 E904C483 01E91CB8 9A011168 1E0065E9 04C48301 ..á.Õe..h...|.Õ..á.ÕV.ÕS.=..u.Õw 0000A0
C6E9FF7E E9037500 0630FFC2 E9037500 033DFF6A E9037500 023D0018 E90376FF .v.Õ..=..u.Õj.=..u.Õö.=..u.Õ~.Õ6 0000C0
3DE90375 006F3DFF 54E90375 006C3DFF 7AE90375 00573DFF A0E90375 001A3DFF .=..u.Õ..=W.u.Õz.=l.u.ÕT.=o.u.Õ= 0000E0
468B08C4 8300141C B89A0140 681E0876 FF0A76FF FF9BE9FF 71E90375 00713DFF .=q.u.Õq.Õ...v..v..ha..|.....á..F 000100
01FF6886 C7FFFFFF 6686C7D8 8E00FEB8 1E565700 01B4C8C8 C95F5E1F 0000E906 .Õ...^_èùàÇ..WV.|±..Ăú.f...ú.h.. 000120
6A5016FF 68868001 17685016 FE4C868D 0A76FF50 16FF6686 8D0676FF 0876FF00 ..v..v...f..P.v...L±.Ph....h..Pj 000140
FF6486FF 0676FF08 76FF0015 E9037500 FF648E83 FF648689 0000FFFF 9A006A00 .j........d../d..u.Õ...v..v..Ñd. 000160
3D08C483 02F50D18 9A0676FF 0876FF50 16FF7086 8D0103E9 06C48302 6A00F69A .-.j..á.Õ....p..P.v..v....%..á.= 000180
5AB6FFFE 6086FF50 16FE5486 8D5016FE 56868D00 E1E90001 B80006E9 03750000 ..u.Õ..|..ÕÃ...V±.P..T±.P.Ñ'±.ÑZ 0001A0
00FF6EBE 83FF6E86 8916C483 0C5EFF50 16FF7086 8D5016FE 63868DFE 58B6FFFE ±.ÑX±..c±.P..p..P.^..á...n../n.. 0001C0
8D011768 5016FE4C 868DFF66 B6FF0001 FF6C86C7 00A2E9FF 6E868800 07E90375 u.Õ....n.ÕÀ.ú.l....Ñf...L±.Ph... 0001E0
```

Dump of file SATURN:[PCCOMMON.DUMP]INSTALL.EXE;1 on 18-APR-1990 10:27:36.56
File ID (29,26,0)    End of file block 61 / Allocated 64

Virtual block number 3 (00000003), 512 (0200) bytes

```
B6FF0676 FF0876FF 0015E903 7500FF64 BE83FF64 86890000 FFFF9A50 16FF6886 .h..P.......d../d..u.Õ...v..v..Ñ 000000
5AB6FFFE 6086FF50 16FE5486 8D5016FE 56868D00 61E906C4 83011500 F69AFF64 d..-....á.Õa...V±.P..T±.P.Ñ'±.ÑZ 000020
00FF6EBE 83FF6E86 8916C483 0C5EFF50 16FF7086 8D5016FE 63868DFE 58B6FFFE ±.ÑX±..c±.P..p..P.^..á...n../n.. 000040
5EC4000A E9037512 46081046 88FF7FE9 FF6C86FF 0022E9FF 6E868800 07E90375 u.Õ....n.Õ"...l.Õ...F..F.u.Õ..á^ 000060
D88E0201 B81E5657 000098C8 90C8C95F 5E1F0000 E9000088 070126FF 6C868810 ...l.&..|..Õ...^_èù.à...WV.|...Ă 000080
9A0676FF 0876FF08 C4830392 22FA9A50 16FF6A86 8D0A76FF 0C76FF00 00FE46C7 úF±...v..v...j..P̄.*"...á..v..v.. 0000A0
5B064688 001CE903 743A017F 8026065E C40029E9 03770002 3D04C483 03C0235A Z#å..á.=..w.Õ).á^.&...:t.Õ...F.. 0000C0
86800676 FF0876FF 0014E908 C48303D7 22B49A50 16FF6A86 8D505200 02050856 V....RP..j..P.Ç"■..á.Õ...v..v... 0000E0
036A006A 0146681E 0676FF08 76FF5016 FF6A868D 08C48303 F322B49A 5016FF6A j..P.Ç"µ..á...j..P.v..v..hF.j.j. 000100
7C000030 FC468906 C4830429 1D3E9A06 76FF0876 FF800068 10C48304 040EA59A .É....á.h...v..v..>.)..á..F==..| 000120
468908C4 83043F1D 3E9A5016 FF6A868D 83016800 806800C3 E90001B8 0006E903 .Õ..|..Õù.h..h....j..P.>.?..á..f 000140
FF2610CC 068E0093 E90001B8 02C48302 531D149A FC76FF00 11E9037C 00003DFA *=..|.Õ...v=...S..á.|..Õ....ä.&. 000160
FF688689 08C48304 901EFC9A FC76FF05 0836FF26 050A36FF 2610CE06 8E000036 6....ö.&.6..&.6...v=.=.....á...h. 000180
20409AFA 76FF0508 36FF2605 0A36FF26 10CE068E FF68B6FF 003DE903 7700003D =..w.Õ=..Ñh...ö.&.6..&.6...v'.a 0001A0
E90001FE 46C704C4 8304B80E 189A015C 681E0014 E90375FF 68863808 C48304A5 E..á.;.h.u.Õ...h\....£..á.úF±..Õ 0001C0
9A036A02 6A02C483 04D21D14 9AFA76FF 02C48304 C61D149A FC76FFFF 95E90003 ..Õ...v=...6..á..v'...0..á.j.j.. 0001E0
```

```
Dump of file SATURN:[PCCOMMON.DUMP]INSTALL.EXE;1 on 18-APR-1990 10:27:36.56
File ID (29,26,0)   End of file block 61 / Allocated 64

Virtual block number 4 (00000004), 512 (0200) bytes

 76FFD88E 036C881E 56570000 92C8CBC9 5F5E1F00 00E9FE46 8804C483 03841200 .....á..F±Õ...^_èùà...WV.¡l..Ä.v 000000
 04C48305 39235A9A 0676FF08 76FF08C4 83050822 FA9A5016 FF6E868D 0A76FF0C ..v...n..P."..á..v..v..Z#9..á. 000020
 50520002 05085688 06468800 1CE90374 3A017F80 26065EC4 0029E903 77000230 *..w.Õ).á^.&...:t.Õ...F..V....RP 000040
 22849A50 16FF6E86 8D0676FF 0876FF00 14E908C4 83055022 849A5016 FF6E868D ..n..P.Ç"P..á.Õ...v..v...n..P.Ç" 000060
 0000E940 C01BG1FE 7E83FE46 8904C483 04671041 9A5016FF 6E868D08 C483055E ^..á...n..P.A.g..á..F±.-±..àãÕ.. 000080
 D0068EFE 46FF0003 E90001FE 46C7D88E 04EA881E 56570000 20C890C8 C95F5E1F .^_èù.à ..WV.¡Õ..ÁúF±..Õ...F±..Å 0000A0
 C48305C2 25809A50 16E04680 0174681E FE76FF00 7AE90376 FE463900 02A12610 .&Ã..9F±v.Õz..v±.ht..FÅ.P.¯%ò..á 0000A0
 FF0876FF 05DD1223 9A04C483 05CA0621 9A5016E0 46800000 E9037501 FE7E830A ..-±.u.Õ...FÅ.P.l.ò..á..#.ï..v.. 0000C0
 681E306A FFFF6805 F568006A 006A0CC4 8305E70E A59A016A 006A017C 681E0676 v..h|.j.j..E.Õ..á.j.j.h%.h..jO.h 0000E0
 01B804C4 83061A0E 189A0198 681E0012 E9037500 00300EC4 83060901 F99A0194 ...'....á.=..u.Õ...h........á.¡. 000100
 12239AD8 8E057E88 1E565700 0012C8C8 C95F5E1F 04FD1223 9AFF73E9 0008E900 .Õ..Õs..#.»..^_èùà...WV.¡~..Ä.#. 000120
 8306550E A59A046A 006A01AC 681E0676 FF0876FF 02C48306 4D0EE19A 026A0637 7.j..Ã.M..á..v..v..h¯.j.j..E.U.. 000140
 9A116A50 16EE4680 026A016A 068A238E 9A0005E9 03740000 3D066223 8E9A0CC4 á...#b.=..t.Õ....#..j.j..FY.Pj.. 000160
 3D08C483 069E283E 9A5016F3 46800676 FF0876FF 0000E903 7500003D 0000FFFF ....=..u.Õ...v..v..Fµ.P.>(...á.= 000180
 02C48306 B80EE19A 016A001D E904C483 06AB1200 9A016AFF 6A000FE9 03740000 ..t.Õ..j.j..........á.Õ..j..Ã.E..á. 0001A0
 B81E5657 000092C8 CBC95F5E 1FFF79E9 08C48305 AC0EA59A 026A006A 01E9681E .hÕ.j.j..E.¯..á.Õy..^_èùà...WV.¡ 0001C0
                                                                                                    0001E0

Dump of file SATURN:[PCCOMMON.DUMP]INSTALL.EXE;1 on 18-APR-1990 10:27:36.56
File ID (29,26,0)   End of file block 61 / Allocated 64

Virtual block number 5 (00000005), 512 (0200) bytes

 76FF0C76 FF00A7E9 00008800 06E90374 2E3F8026 0A5EC400 00FE46C7 088E0629 )..ÁúF±..á^.&.?.t.Õ..¡..Õl..v..v 000000
 E9037510 1246F610 C4830723 25B09A50 16FF6E86 8D01F568 1E0676FF 0876FF0A ..v..v..h%...n..P.¯%#..á.-F..u.Õ 000020
 0006E903 7400013D 08C48307 4304E29A 5016FF6E 86805052 076C8A04 78880056 V.¡x.¤l.RP..n..P.ã.C..á.=..t.Õ.. 000020
 68075068 006A006A 08C48307 4D22849A 5016FF6E 868D01FA 681E005C E90001B8 ¡..Õ\..h'...n..P.Ç"M..á.j.j.h).h 000040
 50520028 8A047888 0024E900 2DE90EC4 83077901 F99A5016 FF6E868D 306A05EA ô.jO..n..P.'.y..á.Õ-.Õ$.¡x.¤(.RP 000060
 E90000B8 0006E900 01B80006 E9037400 013D08C4 83063003 649A5016 FF6E868D ..n..P.d.O..á.=..t.Õ..¡..Õ..¡..Õ 000080
 E9037701 067E8300 01FE46C7 D88E06D0 881E5657 000096C8 90CBC95F 5E1F0000 ...^_èù.à...WV.¡Å..ÁúF±...-..w.Õ 0000A0
 86C60005 E908C483 070422FA 9A5016FF 6E868D04 77FF2606 77FF2608 5E..001C ..á^¯.&.w.&.w...n..P."...á.Õ..ó. 0000C0
 89FF6A86 89080020 5C9A03E2 36FF2603 E436FF26 1002068E 4240680F 6A0C'F6E n..j.haB..@.&.6ò.&.6ã..\-....j.. 0000E0
 83082712 009A016A 056A008F E9037400 FE7E8300 09E90375 00FF6E8E 80FF6C96 .!../n..u.Õ...-±.t.Õ..j.j....'.. 000100
 0E882610 D2068E08 4020289A FF6A86FF FF6C86FF 4240680F 6A86A068 016A04C4 á.j.h..j.haB.Ñl..Ñj..(-ã...@.&.. 000120
 0200681E FF6A86FF FF6C86FF 50520857 2D5C9A51 53DA18C8 2803E41E 882603E2 ã.&..ô.+à.OSO.\-W.RP.Ñl..Ñj..h.. 000140
 FF6E86C6 08C48308 780EA59A 036A006A 0233681E 10C48308 670EA59A 016A006A j.j..E.g..á..h3.j.j..E.x..á.ó.n. 000160
 00FF6E8E 8004C483 08A32532 9A5016FF 6E868004 C4830886 11819A05 6A026A00 .j.j.......á...n..P.2%É..á../n.. 000180
 FF43E903 75000130 04C48308 BF08CF9A 5016FF6E 86800000 FE46C7FF DCE90375 u.ÕÉ.úF±....n..P.ù.¢..á.=..u.ÕC. 0001A0
 C8C8C95F 5E1F0000 E90000B8 08C48307 C622FA9A 0C76FF0E 76FF5016 FF6E868D ..n..P.v..v..'"ó..á.¡..Õ...^_èùà 0001C0
                                                                                                    0001E0

Dump of file SATURN:[PCCOMMON.DUMP]INSTALL.EXE;1 on 18-APR-1990 10:27:36.56
File ID (29,26,0)   End of file block 61 / Allocated 64

Virtual block number 6 (00000006), 512 (0200) bytes

 01FC7E83 FC468904 C48307E9 235A9A06 76FF0876 FFD88E07 A0881E56 57000004 ...WV.¡...Ä.v..v..Z#Õ..á..F•.-•. 000000
 068E000B E9FE4688 078A2606 5EC4000C E903743A 017F8026 065EC400 19E90377 w.Õ..á^.&...:t.Õ..á^.&...F±Õ.... 000000
 7603E416 38261002 068E02C4 83094B0F F19A5098 FE468AFE 468803E8 A0261004 Å.&.Õ..F±.F±.P.þ.K..á...@.&;.Õ.v 000020
 02C48309 5C23729A 5098FE46 8A0024E9 037203E2 06382600 0AE90373 0033E903 .Õ3.s.Õ..&;.ã.r.Õ$..F±.P.r#\..á. 000040
 235A9A06 76FF0876 FF00C8E9 0001880A C4830970 0EA59A07 6A026A02 64681E50 P.hd.j.j..É.p..á.¡..Õà..v..v..Z# 000060
 FF0876FF 02A3681E 0012E903 755CFF78 8026065E C4FC7688 FC468904 C4830995 ...á..F•.v•á^.&.x.\u.Õ...hÉ..v.. 000080
 001CE903 7400003D 04C48309 BF10889A 0676FF08 76FF08C4 8309A322 849A0676 v..Ç"É..á..v..v....¢..á.=..t.Õ.. 0000A0
 076A376A 0028E903 75000030 08C48309 D300189A 0676FF08 76FF0676 FF0876FF .v..v..v..v....Ã..á.=..u.Õ(.j7j. 0000C0
 01B80CC4 8309FD0E A59A076A 026A02A5 681E0676 FF0876FF 04C48309 E912009A ...Õ..á..v..v..hÉ.j.j..É.»..á.¡. 0000E0
 7688001B E9037702 FC7E83FC 468904C4 8308E423 5A9A0676 FF0876FF 0038E900 .Õ;..v..v..Z#õ..á..F•.-•.w.Õ...v 000100
 1F0000E9 00008800 FF40C626 065EC4FC 76880008 E903745C FF788026 065EC4FC •á^.&.x.\t.Õ...v•á^.&óã..¡..Õ... 000120
 830A5B11 9F9A5016 FE468050 16FC4680 D88E08D7 881E5657 000006C8 CBC95F5E ^_èùà...WV.¡•..Ä.F•.P.F±.P...[.. 000140
 02C6681E 04C4830A 7311819A 166A006A 06C4830A 6729009A 026A016A 006A08C4 á¯j.j.j...)g..á.j.j....s..á..hó. 000160
 FA468802 C4830AB2 23729A50 98FA468A FA46880A 88238E9A 04C4830A 781CB89A .¡.(..á...#...F'.F'.P.r#ÿ..á..F' 000180
 9A006668 1E02FD68 1E5098FA 468AFFD6 E9037459 FA7E8000 09E90375 4EFA7E80 .-'Nu.Õ...-'Yt.Õø..F'.P.h»..hf.. 0001A0
 0EA59A03 6A006A03 01681E0A D012239A 002FE903 7459FA7E 800AC483 0AC31C64 d.û..á..-'Yt.Õ/..#.À..h..j.j..É. 0001C0
                                                                                                    0001E0
```

```
Dump of file SATURN:[PCCOMMON.DUMP]INSTALL.EXE;1 on 18-APR-1990 10:27:36.56
File ID (29,26,0)   End of file block 61 / Allocated 64

Virtual block number 7 (00000007), 512 (0200) bytes

 6A02C483 0AF61AD2 9A016A00 00FFFF9A 006A03E6 36FF2610 06068E08 C483-921 I..á...ø.&.6I.j......j..@.-..á.j 000000
 6AFFFF68 08146L04 C483080A 11819AFE 76FFFC76 FF04C483 08041200 9A166A01 .j.......á..v•.v±......á.h..h..j 000020
 D88E0A3C 881E5657 000098C8 CBC95F5E 1F0000E9 00008806 C4830A4D 29009A02 ...)M..á.¡..Õ...^_èùà...WV.¡<..Ä 000040
 769A5052 07168A03 E8885016 FE468000 8FFE46C7 0000FFFF 9A006A08 5112239A .#.Q.j......ûF±..¯F±.P¡Ò.¤..RP.v 000060
 8D800068 0CC48308 7825B09A 5016FF6A 868D0325 681E0319 681E08C4 8308670F .g..á..h...h%...j..P.¯%x..á.h... 000080
 1E5016FF 6A868000 18E9037C 000030FF 68868906 C4830896 1D3E9A50 16FF6A86 .j..P.>....á...h.=..|.Õ....j..P. 0000A0
 C91EFC9A FF6886FF 5016FA46 80046A00 CCE90001 8808C483 08AF0E18 9A032868 h•....£..á.¡..Õë.j..F•.P.Ãh..•.è 0000C0
 018808C4 83080B0E 189A0351 681E5016 FF6A868D 0018E903 75000430 08C48308 ..á.=..u.Õ....j..P.hQ....Ù..á.¡. 0000E0
 03E86800 6A0002A3 26FA4688 1008068E 02C4830A EA1D149A FF6886FF 0099E900 .Õ...Ãh....õ..á...Ä..F•&Ê..j.hÕ. 000100
 6A505208 4ABA03E6 8803E416 892603E2 A326100A 068E0833 20289AFC 76FF006A j..v•.(-3...Õ.&Êã.&..ð.¡|.¤J.RPj 000120
 9A06C483 0C322900 9A026A08 00680C2A 6800000A E19A006A 006A0000 FFFF9A00 ......|.j..Å...h•.h..j...)2..á.. 000140
 DE068E02 C4830C20 21F99A00 0036FF26 100C068E 0000A326 100C068E 08F82713 .'%...£.&Ê....£.&.6...•I ..á...B 000160
 5F5E1F00 00E90000 880006E9 00018800 06E90374 0008050A 16892605 08A32610 .&É..&.....Åt.Õ..¡..Õ..¡..Õ...^_ 000180
 809A5016 FF70868D 0377681E 0676FF08 76FFD88E 082C881E 56570000 90C8CBC9 èùà...WV.¡,..Ä.v..v..hw...p..P.¯ 0001A0
 868D0386 681E0676 FF0876FF 04C4830C 8720DA9A 5016FF70 868D0CC4 830C9F25 %...á...p.'.P..-ñ..á..v..v..h.... 0001C0
 0374000A 7E8304C4 830C0620 0A9A5016 FF70868D 0CC4830C C525809A 5016FF70 p..P.¯%é..á...p..P..-ø..á..-..t. 0001E0

Dump of file SATURN:[PCCOMMON.DUMP]INSTALL.EXE;1 on 18-APR-1990 10:27:36.56
File ID (29,26,0)  .End of file block 61 / Allocated 64

Virtual block number 8 (00000008), 512 (0200) bytes

 FE0E779A 0380681E 08C4830C EF0EA59A 036A006A 0395681E 0CE31223 9A0024E9 Õ$..#.D..h..j.j..E.ÿ..á..h¯..w.± 000000
 1B9A006A 03E636FF 26100606 8E04C483 0C480E77 9A040F68 1E000CE9 04C4830C ..á.Õ...h...w.H..á...ø.&.6I.j... 000020
 8D5016F4 46805016 FEDA868D D88E0C7A 881E5657 000126C8 CBC95F5E 1F00000C ....^_èùà&..WV.¡z..Á..Õ±.P.F¶.P. 000040
 037400FF 62BE8014 C4830D56 61989A06 76FF0876 FF5016FF 62868050 16FEE086 .Á±.P¯..b..P.v...v...aV..á../b..t. 000060
 7400FEE0 BE8002C4 8300870F 3E9A5098 FF62868A FF628688 00650F14 9A0009E9 Õ.....e...b...b..P.>.....á../Á±.t 000080
 FEE0868D 08C48300 950F769A 5016FEE0 868D5016 FE468000 81FE46C7 0018E903 .Õ..úF±...F±.P..Á±.P.v....á...Á± 0000A0
 03745CFE DF8A80F2 76880015 E9037501 F27E83F2 468904C4 830DC423 5A9A5016 .P.Z#á..á..F·.~·.u.Õ...v·.¤Õ±\t. 0000C0
 46800081 FE46C704 C483000C 2CCE9A50 16FEE086 8D00FEDF 82C6F276 8B0008E9 Õ...v·6.Õ±...Á±.P.ö,É..á.úF±...F 0000E0
 8804C483 0E08235A 9A0A76FF 0C76FF08 C48300EA 0F769A0A 76FF0C76 FF5016FE ±.P.v..v..v.õ..á..v..v..Z#...á.. 000100
 08C4830C 9122849A 0A76FF0C 76FF0462 681E0012 E903755C FF788026 0A5EC4F0 Þá^.&.x.\u.Õ...hb..v..v..Ç"...á. 000120
 FE568CFC 46890A46 80088E00 20881E56 57000004 C8CBC95F 5E1F0000 E90000B8 ¡..Õ...^_èùà...WV.¡ ..Á.F..F•.V± 000140
 04C4830E 531C889A 0464681E 08C4830E 4826949A 0676FF08 76FFFC76 FFFE76FF .v±.v•.v¯..v...&K..á..hd..¡.S..á. 000160
 8300441C 889A04A2 681E0484 681E0E60 238E9A00 05E90374 0000300E 60238E9A ..#'.=..t.Õ....#m..h...hÅ..¡.0.. 000180
 FFFE76FF FE568CFC 46890A46 80088E0E 23881E56 57000004 C8CBC95F 5E1F08C4 á..^_èùà...WV.¡#..Á.F..F•.V±.v±. 0001A0
 8E0E7FB8 1E565700 0004C8C8 C95F5E1F 08C4830E 3F26949A 0676FF08 76FFFC76 v•.v¯..v...&?..á..^_èùà...WV.¡... 0001C0
 76FFFC76 FFFE76FF 04C4830E D711819A 0676FF08 76FFFE56 8CFC4689 0E468D08 Á.F..F•.V±.v..v....¯ø..á..v±.v•.v 0001E0

Dump of file SATURN:[PCCOMMON.DUMP]INSTALL.EXE;1 on 18-APR-1990 10:27:36.56
File ID (29,26,0)   End of file block 61 / Allocated 64

Virtual block number 9 (00000009), 512 (0200) bytes

 067E8308 8E0EAD88 1E565700 0000C8C8 C95F5E1F 08C4830E 9826949A 0A76FF0C ..v...&...á..^_èùà...WV.¡Ù..Ä.~. 000000
 1F0000FF FF9A00C8 6803E868 0008E900 000F0B9A 00C86800 C868000E E9037401 .t.Õ..hà.hà.....Õ..hÕ.hà....... 000020
 8A0000FF FF9A5016 FC468D50 16FA468D D88E0EE9 881E5657 000006C8 CBC95F5E ^_èùà...WV.¡Õ..A.F•.P.F•.P...... 000040
 9A509806 468A088E 0F1C881E 56570000 02C8CBC9 5F5E1F00 00E90040 0598FA46 F¯..ð.Õ...^_èùà...WV.¡...Á.F..P. 000060
 00E9D8F7 C01BD1F9 83C88800 00FFFF9A FE76FFFE 46890040 2002C483 0EC32372 r#ù..á.-ð..F±.v±......à.•..ã%AÕ. 000080
 9A5098FE 468AFE46 880F920F 149AD88E 0F46881E 56570000 04C8CBC9 5F5E1F00 ..^_èùà...WV.¡F..Á......F±.F±.P. 0000A0
 FE468A5C 0247C626 065EC43A 0147C626 065EC407 8826065E C402C483 0F522372 r#R¯..á.á^.&..á^.&6G.:á^.&6G.\.F± 0000C0
 9A0A76FF 0C76FF50 52000305 08568806 46885000 402D02C4 830F8523 729A5098 .P.r#...á.-ð.P.F..V....RP.v..v.. 0000E0
 C95F5E1F 0000E9FC 46880007 C626065E C40007E9 03750000 30FC4689 0000FFFF .....F•=..u.Õ..á^.&6...F=Õ...^_è 000100
 016A5000 402D02C· 83103023 729A5098 06468AD8 8E0F7E88 1E565700 0012C8C8 ùà...WV.¡-..Á.F..P.r#0..á.-ð.Pj. 000120
 2D289AF2 76FFF476 FFFA76FF FC76FFFE 76FF006A 00000670 9A126A50 16EE468D .FY.Pj..p...j..v±.v•.v•.v¶.v·.(- 000140
 FF006A08 8E0FF988 1E565700 0000C8CB C95F5E1F 0000E90F 852D289A 50521037 7.RP.(-ç.Õ...^_èùà...WV.¡•..Äj.. 000160
 C4831005 2CEC9A06 76FF0876 FF001AE9 03744006 C483106C 2C929A06 76FF0876 v..v...,l..á.ðt.Õ...v..v..$,...á 000180
 881E5657 000008C8 CBC95F5E 1F0000E9 00008800 06E90001 880006E9 03744004 .ðt.Õ..¡..Õ..¡..Õ...^_èùà...WV.¡ 0001A0
 11E90374 00003D08 C483108A 23309A50 52400856 88064688 04A7681E D88E1049 I..À.hI..F..V.ðRP.0#¤¯.á.=..t.Õ. 0001C0
 5C6AFE56 89FC4689 08568806 468800BA E904C483 100C1041 9A0676FF 0876FF00 ..v..v..A.É..á.Õ¤..F..V..F=.V±j\ 0001E0
```

```
Dump of file SATURN:[PCCOMMON.DUMP]INSTALL.EXE;1 on 18-APR-1990 10:27:36.56
File ID (29,26,0)   End of file block 61 / Allocated 64

Virtual block number 10 (0000000A), 512 (0200) bytes

 4688005F E9037500 0BFE5689 FC468906 C4831130 28109A50 5240FE56 8BFC4688 .F=.V±ƏRP..(0..á..F=.V±.Åu.Ő_..F 000000
 0000E903 75FE5639 0008E903 74FC4639 08568806 4688FA56 89F84689 FE5688FC =.V±.F½.V*.F..V.9F=t.Ő..9V±u.Ő.. 000020
 10419A06 76FF0876 FF0007C6 26FC5EC4 FFAEE900 03E90374 3AFF7F80 26FC5EC4 á^=&...:t.Ő..ŐÚ.á^=&ó...v..v..A. 000040
 F85EC4FF 81E9‹C07 C626FC5E C40039E9 0001B800 06E90374 00013004 C4831163 c..á.=..t.Ő..¡..Ő9.á^=&ó.\Ő..á^½ 000060
 0006E903 7400013D 04C48310 5810419A 0676FF08 76FF001C E9037500 017F8026 &....u.Ő...v..v..A.X..á.=..t.Ő.. 000080
 0676FFD8 8E1090B8 1E565700 0000C8C8 C95F5E1F 0000E900 00B80006 E90001B8 ¡..Ő..¡..Ő...^_èùà...WV.¡...Á.v. 0000A0
 76FF0876 FFD88E11 89B81E56 57000000 C8C8C95F 5E1F0000 FFFF9A00 6A0876FF .v.j.......^_èūà...WV.¡...Á.v..v 0000C0
 C6D88E11 A7B81E56 57000002 C8C8C95F 5E1F0000 FFFF9A00 6A0A76FF 0C76FF06 ..v..v.j.......^_èùà...WV.¡Ī..Äó 0000E0
 6A0000FF FF9A006A 5016FE46 8DFF6AFF 6A0876FF 006A0676 FF07FF46 C620FE46 F± óF...v.j..v.j.j..F±.Pj......j 000100
 03064688 D88E11C8 B81E5657 000000C8 C8C95F5E 1F04C483 10A41181 9A006A00 .j....Ê..á..^_èùà...WV.¡ù..Á.F.. 000120
 6AD88E12 08B81E56 57000000 C8C8C95F 5E1F04C4 8311F611 C39A0676 FF500846 F.P.v..ù.-..á..^_èùà...WV.¡...Áj 000140
 04AA681E D88E1228 B81E5657 00007AC8 C8C95F5E 1F04C483 121911C3 9A006AFF .j..ù....á..^_èùãz..WV.¡+..Á.h¯. 000160
 0000BA00 00B8F246 89E64689 0000B800 00B846C7 08C48312 D90E779A 04B8681E .h¡..w.\..á.úFÁ..¡...Fl.F¡..¤.. 000180
 46800400 68000012 969A006A 50160A46 8D040068 F05689EE 4689FE56 89FC4689 .F=.V±.FY.VÞh...FO.Pj......h...F 0001A0
 FA5689F8 4689C028 E85688EC 5689EA46 89C028DA 56880000 FFFF9A00 6A5016E8 Ò.Pj.......VO+à.Fõ.V$.VÒ+à.F½.V* 0001C0
 681E0000 13389A00 6A006A04 D5681E04 E3681E00 00FFFF9A 006A006A 04C7681E .hú.j.j.......hO..hÍ.j.j..;....h 0001E0

Dump of file SATURN:[PCCOMMON.DUMP]INSTALL.EXE;1 on 18-APR-1990 10:27:36.56
File ID (29,26,0)   End of file block 61 / Allocated 64

Virtual block number 11 (0000000B), 512 (0200) bytes

 1E050168 1E001DE9 0375000B F05689EE 468908C4 8312F61C 2C9A04F3 681E04F1 Þ..hµ..,-..á..FŸ.VÞ.Åu.Ő...h... 000000
 051F681E 0511681E 003FE903 74D008FE 5689FC46 8908C483 13131C2C 9A050368 h...,....á..F=.V±.Åt.Ő?..h...h.. 000020
 681E0011 E9037500 003D06C4 8313592C 929A0544 681E006A 08C48313 210E1B9A ...!..á.j..hD...,Y..á.=..u.Ő...h 000040
 040068EE 76FFF076 FF01C9E9 0001D846 C70000FF FF9A006A 006A0552 681E0560 '..hR.j.j......úFÅ..Őè..vÞ.vŸh.. 000060
 50168646 8DF876FF FA76FF01 ABE90375 D00B0AC4 83137D24 2A9AEA76 FFEC76FF .v$.võ.*$)..á..Åu.Ő¨..v*.v½.F..P 000080
 13A6283E 9A501686 46800577 681E10C4 83138E26 369AEA76 FFEC76FF 056E681E .hn..v$.võ.6&...á..hw..F..P.>(Ĭ. 0000A0
 5689F446 8906C483 13092810 9AEA76FF EC76FF30 6A0049E9 03740000 3D08C483 .á.=..t.ŐI.j=.vš.võ..()..á..F¶.V 0000C0
 057F681E 50168646 8D0676FF 0876FF50 5240F656 8BF44688 0029E903 75000BF6 -.Åu.Ő)..F¶.V-ƏRP.v..v..F..P.h.. 0000E0
 283E9A50 16864680 0580681E 0115E9FF 66E914C4 8313F01C 649AFC76 FFFE76FF .v±.v=.d.Þ..á.Őf.Ő...h...F..P.>( 000100
 F4468906 C483142D 28109AF8 76FFFA76 FF306A00 FCE90374 00003008 C4831408 ...á.=..t.Ő=.j=.v*.v½..(-..á..F¶ 000120
 83144628 849AF876 FFFA76FF 0591681E 056A000C 46C6000F E9037500 0BF65689 .V-.Åu.ŐŐ.óFÉ.j..h...v*.v½..(F.. 000140
 0001F246 C708C483 146222FA 9A50160C 46800597 681E0019 E9037400 003D0AC4 á.=..t.Ő...h...FÉ.P.*"b..á.úF·.. 000160
 1E0014E9 03740000 3D0AC483 147B2884 9AF876FF FA76FF05 9C681E08 6A0062E9 Őb.j..h...v*.v½..((..á.=..t.Ő... 000180
 9AF876FF FA76FF05 A9681E06 6A0032E9 08C48314 9222FA9A 50160C46 8D05A568 hÉ..FÉ.P.*"...á.Ő2.j..h`..v*.v½. 0001A0
 08C48314 F122FA9A 50160C46 8D05B068 1E0016E9 03740000 3D0AC483 14AB2884 .(¨..á.=..t.Ő...h¯..FÉ.P.*"b..á. 0001C0
 46805052 40F65688 F4468800 07C626F4 5EC40038 E9037500 0C7E8000 01E646C7 úFl...~É.u.Ő;.á^¶&ó...F¶.V-ƏRP.F 0001E0

Dump of file SATURN:[PCCOMMON.DUMP]INSTALL.EXE;1 on 18-APR-1990 10:27:36.56
File ID (29,26,´)   End of file block 61 / Allocated 64

Virtual block number 12 (0000000C), 512 (0200) bytes

 649AFC76 FFFE76FF 05B4681E 50168646 8DF876FF FA76FF06 76FF0876 FF50160C É.P.v..v..v*.v½.F..P.hÇ..v±.v=.d 000000
 FE37E908 C4831236 1C649AFC 76FFFE76 FFEA76FF EC76FFFE 4EE91CC4 8315081C ....á.ŐN±.v$.võ.v±.v=.d.6..á.Ő7± 000020
 C483154D 1C649AFC 76FFFE76 FF05C468 1E0676FF 0876FF00 18E90374 00F27E83 .-·.t.Ő...v..v..há..v±.v=.d.M..á 000040
 8315661C 649AFC76 FFFE76FF 05D6681E 0676FF08 76FF0018 E9037400 E67E830C ..-Ì.t.Ő...v..v..hø..v±.v=.d.f.. 000060
 4608FC46 8804C483 157F1B44 9AEE76FF F076FF00 0EE90375 F04608EE 46880CC4 á..FŸ.FÞu.Ő...vÞ.vŸ.D....á..F=.F 000080
 9AE876FF 00001590 9ADA76FF 04C48315 9B1B449A FC76FFFE 76FF000E E90375FE ±u.Ő...v±.v=.D....á..vŐ......vÒ. 0000A0
 000068C8 90C8C95F 5E1F0000 E9D84688 04C48312 570E779A 05E7681E 0000FFFF .....hÓ..w.W..á..FÄŐ...^_èù.àh.. 0000C0
 006A006A 0CC48316 050EA59A 036A006A 05EA681E 068E681E D88E1248 B81E5657 WV.¡H..Á.hƒ..hõ.j.j..E...á.j.j. 0000E0
 0020E903 74D0089A 56899846 890000FF FF9A006A 006A006A 006A006A 068E681E .hƒ.j.j.j.j.j.......F..V..Åt.Ő . 000100
 017CE900 01B80AC4 8316190E 189A0608 681E068E 681E5000 00FFFF9A 006A006A j.j......P.hƒ..h.........á.¡..Ő|. 000120
 10E0068E 0160E900 01B80006 E9037500 003D04C4 83152C17 919A9876 FF9A76FF .v..v.........á.=..u.Ő..¡..Ő'...Å. 000140
 2610E006 8E03C8A3 26000A88 10E0068E 00020506 C62610E0 068E0302 0406C626 &ó......Á.&ó......Á.¡..&Èà...Á.& 000160
 06C72610 E0068E01 9003CC06 C72610E0 068E01F4 03CA06C7 2610E006 8E03C6A3 Èó...Á.&ú.ò.¶...Á.&ú.ä.....Á.&ú. 000180
 068E03D2 A32603D4 A3260000 8810E006 8E000003 D006C726 10E0068E 000003CE ò.....Á.&ú.Å.....Á.¡..&Èå.&È●... 0001A0
 DC06C726 10E0068F 03D8A326 03DAA326 00008810 E0068E00 00030606 C72610E0 Á.&ú.●.....Á.¡..&ÈO.&ÈÁ...Á.&ú.É 0001C0
 BA0345B8 0638681E 0676FF08 76FF03DE A32603E0 A3260000 8810E006 8E000003 .....Á.¡..&ÈÁ.&È8..v..v..h8.¡E.¤ 0001E0
```

Dump of file SATURN:[PCCOMMON.DUMP]INSTALL.EXE;1 on 18-APR-1990 10:27:36.56
File ID (29,26,0)   End of file block 61 / Allocated 64

Virtual block number 13 (0000000D), 512 (0200) bytes

```
B09A5052 16FE8A02 C4B80640 681E0676 FF0876FF 0CC48316 F125B09A 505216EA ö.RP.¯Xþ..á..v..v..h∂.¡á.¤±.RP.¯ 000000
0676FF08 76FF08C4 83171C22 FA9A5052 1744BA02 06880652 681E0CC4 83170525 %...á..hR.¡..¤D.RP.*"...á..v..v. 000020
10E0068E 006403JC 06C72610 E0068E0C C483176F 25B09A50 169C468D 0667681E .hg..f..P.¯%o..á...Â.&ú.É.d...Â. 000040
FF9A9876 FF9A76FF 50520C08 8A020488 006A006A 03E0168C 2603DEA3 269C468D .F.&É8.&..Â.j.j.¡..¤..RP.v..v... 000060
810E1B9A 0670681E 0668681E 50000015 F59A006A 006A0020 E90374D0 080000FF ....Ât.Õ .j.j..%...P.hh..h)..... 000080
C95F5E1F 0000E900 008804C4 8315C70E 779A068A 681E0012 E9000188 0AC48317 ..á.¡..Õ...hø..w.ú..á.¡..Õ...^_è 0000A0
FE468D00 6A006A00 6A0676FF 0876FF00 6A006AD8 8E158488 1E565700 0008C8CB ùà...WV.¡Ç..Âj.j..v..v.j.j.j..F± 0000C0
5016F846 805043FE 46680097 E9000088 0006E903 7400FE7E 83000017 FD9A5016 .P.»....-±.t.Õ..¡..Õ..kF±CP.F½.P 0000E0
FFFC76FF 0676FF08 76FF006A 006AFC56 89FA4689 C02BF856 88000012 879A006A j.......V½+à.F*.V•j.j..v..v..v•. 000100
7700FE7E 8343FA46 83FE4EFF 0007E900 00FFFF9A 5016FE46 805043FE 4668FA76 v*kF±CP.F±.P.....Õ...N±.F*C.-±.w 000120
9A006A00 6A0021E° 03740000 300000FF FF9A37FF 260277FF 26FA5EC4 0038E903 .Õ;.á^*&.w.&.7.....=..t.Õl.j.j.. 000140
FFFFB5E9 0AC4831  D70E1B9A 06E0681E 50520006 05FC568B FA468850 0000175F _...P.F*.V=...RP.hÅ....■..á.Õç.. 000160
76FF088E 1799881E 56570000 96C8CBC9 5F5E1F00 00E90000 88000015 889AF876 v½.....¡..Õ...^_èùà...WV.¡...Å.v 000180
5016FF70 86800875 681E0CC4 83189325 809A5016 FF70868D 0863681E 0676FF08 ..v..hc...p..P.¯%...á..hu...p..P 0001A0
77681E50 16FF7086 800018E9 03740008 FF6C9689 FF6A8689 08C48318 841C2C9A .,.Ç..á...j...l..Åt.Õ....p..P.hw 0001C0
FF6E9E88 FF6E86FF 0004E900 00FF6E86 C70081E9 00018808 C4831900 0E779A08 ..w....á.¡..Õ..ú.n...Õ....n...n. 0001E0
```

Dump of file SATURN:[PCCOMMON.DUMP]INSTALL.EXE;1 on 18-APR-1990 10:27:36.56
File ID (29,26,0)   End of file block 61 / Allocated 64

Virtual block number 14 (0000000E), 512 (0200) bytes

```
9287FF02 E3C1FF6E 9E880676 FF0876FF 003CE903 75089287 08089087 8802E3C1 èD.........u.Õ<..v..v...n.èD..ñ. 000000
80681EFF 6A86FFFF 6C86FF0C C4831914 1C649AFF 6A86FFFF 6C86FF08 9087FF08 ..ñ...Ñl..Ñj..d....á..Ñl..Ñj..h. 000020
FF70868D 04C48319 3518449A FF6A86FF FF6C86FF FFACE908 C4831927 24CC9A08 ..a$'..á.Õ¯..Ñl..Ñj..D.S..á...p. 000040
00000000 00000000 000090C8 C95F5E1F 0000E900 008804C4 83184728 849A5016 .P.Ç+G..á.¡..Õ...^_èù........... 000060
5008DC1E 8908DEA3 08E00E89 4908E81E 8C08E626 8908E226 89FC0000 00000000 ......•.&ä..&l...Õ.l..Â.É8...É.P 000080
811A489A 0048E800 00FFFF9A 501E000C 88D0AA3  E0865800 00FFFF9A 5016C488 .á.P.....X.ÂÉ..¡...P.....ÕK..H.. 0000A0
9A003936 FF003836 FF003D36 FF003F36 FF004136 FF19942E 329A198F 578E9A18 ...W...2....6A..6?..6=..6;..69.. 0000C0
8819C82E EE9A1988 208E9A50 1A0208E4 06C73600 03881982 1AD29A50 19990000 ....P.@.ý.¡..6ú.Õ.@.P.ƒ·¡..Ÿ.à.¡ 0000E0
068EFF33 48000CF4 06C6380C E806C608 7500000C 3E800000 8808E416 FF5000FF ..P..Õ.E...>...u.6.Õ.;6.¶..K3... 000100
330874CA 88A6F3C8 88D1880C E88E4374 003D8026 47017500 3080267F FF89080E 8.¿..&.=.u.G&.=.tC/Õ..l.ùµl.õt.3 000120
AC92E0D2 1972412C AC048114 7500F883 00118F1F F788071E 062EE8E7 74AEF2C0 à·ÙtÕŠ.....%.¢...«.u.Ý.¯,Ar.@Å.¯ 000140
A7800488 52000288 C31F16F7 E2AA4801 74C0FEAC 9198ACEE E8AAC20A 1172412C ,Ar..õ¨ŠŸ¨..¨±ât.H¨ä%..ùÉ..R.à.Ï 000160
7500023D 07740001 30408112 7558C008 0000FFFF 9A521650 1653C488 50870011 ..ñP.6S.P.R......àXu.Ÿ∂=..t.=..u 000180
58580000 FFFF9A53 16520E19 8A8A50DC 885050C0 335AD479 4800118F 08088106 .Ÿ.....Kyå Z3àPP.ÉP¤¤..R.S.....XX 0001A0
C5361334 E91F1605 73108C1E FF360833 DA8C10C0 06C5080E 368829E3 108E0E88 ..ƒ.D).6ß.é.à..O3Ü6..¥.s...Õ4.6è 0001C0
5FE810C8 8F10C88E 0068E810 C88F10C8 8E1F1610 8C1EFF36 000388DA 8C10C406 .6..OÉ..6..¥...ƒà.¢à.Õh.ƒà.¢à.Õ_ 0001E0
```

Dump of file SATURN:[PCCOMMON.DUMP]INSTALL.EXE;1 on 18-APR-1990 10:27:36.56
File ID (29,26,0)   End of file block 61 / Allocated 64

Virtual block number 15 (0000000F), 512 (0200) bytes

```
8F10CC8E EC885503 E80049E8 10CC8F10 C88E0052 E8142E8F 142E8EEC 8855C800 .ùU.$ƒ..¢..ÕR.ƒà.¢ä.Õl.Š.U.$ƒä.¢ 000000
0646C705 7500067E 830874C0 0819CD2E 0C9A0032 E810CC8F 10CC8E00 38E810CC à.Õ;.ƒä.¢a.Õ2....ë..àt..-..u.ùF. 000020
C3108C1E FF00028B 07E3108E 0E880000 FFFF9A50 06468A50 00018800 0DE800FF ..Õ..¡..P.F.P.......ƒ.D.£....¥.ù 000040
5EC4FFFF 8E5612EC 83EC8855 00C3EEE8 1DFFF274 02450805 8804EF83 0E73F738 ;%s..ÿ....E.t·..ŠŸû.U.š.š.Vƒ..á^ 000060
8804C483 189537F2 9A530600 87E90374 400A47F6 2600C1E9 0375830A 47F62606 .&-G..u.Õé.&-G.∂t.Õñ..S.·7...á.. 000080
FF0876FF FA46890E 428788E3 D1D803E3 D1D888F9 F7000CB9 99004E2D 064688F0 Þ.F.-N..¿..%*.ÂiD.ÂiD..B..F*.v.. 0000A0
697CC008 02C48318 C31D149A 50E42A08 478A2606 5EC404C4 8318A735 089A0676 v...Sl..á.á^.&.G.*õP...ù..á..à|i 0000C0
568CFC46 89F24680 08C48318 E822FA9A 5016F046 80501E0D 4A886674 00FA7E83 .~*.tf¡J..P.FÞ.P.*"Õ..á..F·.F•.V 0000E0
9004E808 C4831C03 22849A50 16F0468D 501E004C 8815745C FE7F8026 FC5EC4FE ±á^•&..±\t.¡L..P.FÞ.P.Ç"...á.Š.. 000100
200A9A50 16F0468D 08C4831C 1052249A FA76FFFC 76FFFE76 FF50000A 88FC4EFF .N•¡..P.v±.v•.v*.$R...á..FÞ.P..- 000120
83EC8855 90C850E5 885EC688 000A47C6 26065EC4 FFFF8E03 74C00804 C4831801 ...á..át./..á^.&6G...6^.|]ù.U.š. 000140
76FF0876 FF0A76FF 0C76FF50 FE76FF18 740008FE 5689FC46 891C544F 1A9A04EC š...Ol..F•.V±.Ât..v±P.v..v..v..v 000160
890E468D 565708EC 83CC8855 90C850E5 8899C028 9004E80C C483186A 354C9A06 ..LSj..á.Š..+á..|]ù.U.š.š.WV.F.. 000180
76FF0C76 FFFA76FF FC76FFF0 8804C483 1C9A3664 9A0676FF 0876FFFC 5C^¯FA46 F*.V•.v..v..d6...á..Þ.v•.v*.v..v 0001A0
06C4831C 3537469A 560676FF 0876FFF8 880CC483 1CA84460 9A0676FF 087. F0A  ..v..v..'D¨..á..½.v...v.V.F7S..á. 0001C0
568CFA46 890A468D F85E8CF6 468900SA 88560CEC 83EC8855 CB50E588 5F5E.'88 .ú^_.|]ùU.š.š.V¡Z..F-.^½.F..F*.V 0001E0
```

```
Dump of file SATURN:[PCCOMMON.DUMP]INSTALL.EXE;1 on 18-APR-1990 10:27:36.56
File ID (29,26,0)   End of file block 61 / Allocated 64

Virtual block nu  er 16 (00000010), 512 (0200) bytes

 76FFF876 FF0676FF 0876FFFA 76FFFC76 FFF08804 C4831CF4 36649AF6 76FF1EFC •..v-.d6¶..á..Þ.v•.v•.v..v..vh.v 000000
 885EF446 8806C483 1C7E3746 9A56F676 FFF876FF F446890C C4831D06 44609AF6 -.'D...á..F¶.vh.v-V.F7~..á..F¶^. 000020
 00FFFF9A 531254E9 1248E9C0 3300098A 0872000F 1E38065E 88EC8855 90CB5DE5 |}ù.U.š.^.;...r.¤..3áÕH.ÕT.S.... 000040
 FE568D16 0676F.08 76FF40B7 0EEC83EC 8855CB5D E5880000 1187C6F3 75C08500 ..áuµó.....|}ùU.š.š.ñð.v..v...V± 000060
 2A750400 A910CA80 08740100 A90A4688 018AEB0C 4E885252 D23352F8 568D1652 R..V½R3ØRR.N.Ò...F.`..t..ò.`..u* 000080
 58C08500 00FFFF9A 5050C033 50160676 FF0876FF FE468D50 02CA8022 740200A9 `..t".ò.P.F±.v..v..P3áPP......äX 0000A0
 3D1674C0 0B0000FF FF9A5050 C03350C7 0AD00325 525101CA 8003EBFE 4E880875 u..N±Š..ò.QR%...úP3áPP......ât.= 0000C0
 9A500D72 000F063B FE468800 8DE911AE E90011BA 03740002 8AF0C2F6 0E75006E n.u.-ôÞ¤..t.¤..ÕÜ.Õ...F±;...r.P. 0000E0
 75C00800 001A5C9A 50F8468D 1653F45E 8D165000 88E4EBC0 3300188A 00001D20 -...¤..3áŠõ.ÁP..^¶S..F½P.\....âu 000100
 3CF4468A F24E8880 81027580 0F4906F6 07754000 A90E7580 00A9C933 0A468861 a.F.3è`..u.`.ðu.-.|..u.Ý..N·.F¶< 000120
 46F77A74 C90AF446 88C03200 83E908F4 46C60775 023C008E E940F446 C6077501 .u.óF¶ðÕ..<.u.óF¶.Õ..2à.F¶.èt±%F 000140
 00833D0C 74C00800 00FFFF9A 50FA468D 16510002 B95151FF FF895273 7400020A ...tsR¿..QQ¿..Q..F•P......ât.=.. 000160
 75C00800 00FFFF9A 50F84680 16500001 B850F646 8D16524F EBC03311 2AE90374 t.Õ*.3áŠOR..F-P¡..P..F½P......âu 000180
 0000FFFF 9AFA76FF FC76FF00 FC5E8301 FA6E8352 18751AF6 7E833274 F8463923 #9F½t2.--.u.R.n•..^•..v•.v•..... 0001A0
 287548C1 F6F44E8A AA75C008 00001E45 9A50FA46 8D165050 50C03352 BE75C008 .âu/R3âPPP..F•P.E....âu`.N¶-êHu( 0001C0
 46F710C9 80037400 01F846F7 00001089 9A5050C0 3350F846 8D160676 FF0876FF .v..v...F½P3âPP.....%F½..t..è.%F 0001E0

Dump of file SATURN:[PCCOMMON.DUMP]INSTALL.EXE;1 on 18-APR-1990 10:27:36.56
File ID (29,26,0)   End of file block 61 / Allocated 64

Virtual block number 17 (00000011), 512 (0200) bytes

 23D0F700 08A1CB50 E5880011 8F880888 C28801C9 80F24E0A 20C98003 7400080A ...t..è .N·.è..ò.Á.....|}ùÁ..%Á# 000000
 0C4E883F 73000F1E 38065E88 C03308EC 83EC8855 00C301C9 80037580 A8C933C1 è3è`.u..è.û.U.ã.š.3à.^.;...s7.N. 000020
 740A3C0D 25878A10 74080011 87F6087E C40C4E88 D2335745 75020011 87F64CE3 DL-....uEW3Ø.N.á-.-....t...X.<.t 000040
 E90009BA 0674C008 5F00001E 699A5016 FA468D51 5706530A 002587C6 4942AA08 .`BIó.X..S.WQ.F•.P.i...._.ât.¤..Õ 000060
 FE880876 C5071E57 56FB0D11 A780CB5D E5880475 80001187 F6C203FA 4688101E ...F•.ó-....u..|}ù.[..«VW..év..± 000080
 0200118F 80260875 1A3C1E74 C43AAC04 00118F80 2606750A 3C800084 2BE3C888 .àD(Ç..<.u.&.....¯:át.<.u.&..... 0000A0
 E2E8E774 0A3C8007 740FF983 CB5DE588 5E5F1F06 08462BC7 88EAE247 058805E8 Š...Gãõ.ú+F..._^.|}ù.•.t..<.tÓŠã 0000C0
 74C00800 001F439A 5016FA46 80515016 F9468D53 1C75D808 24744000 1187F626 &-...ât$.Ûu.S.F̄•.PQ.F•.P.C....ât 0000E0
 001FC99A 5016FA46 8D515016 F9468D53 00F946C6 86EB0A80 0FA7E95E 5F1F0607 ...^ÕI.¯.ŠÑóF•.S.F•.PQ.F•.P.è.. 000100
 5050FFFF B8531C75 08001187 F6263574 010C7E83 3674FFFF FA46F7DC 75C00800 ..êûÉ%F•..t6.-..t5&-....u.S¡..PP 000120
 0A3C0025 878826F9 468AFF6F E90F750A F97E8000 001EA09A 5016FC46 8D5008F7 %AP.F•.P......-•.u.Õo..F•&..X.<. 000140
 8A087200 0F1E3806 5E880CEC 83EC8855 0099E8C5 750AF97E 80FF58E9 00800274 t.¯.Õ(..-•.uéŠ..U.š.š..^.;...r.¤ 000160
 00002019 9A5016F4 46805141 415151C9 33531274 20001187 F60F19E9 C0330009 ..3âÕ..-... t.S3èQQAAQ.F¶.P.. .. 000180
 89F288FA 885657FC FC4689FE 4689C033 0856C50A 468EFA5E 8C7D7480 001187F6 -....t).^•.F.éV.3â.F±.F••WV.•.`. 0001A0
 8802EC83 1F4E7600 A8301CD8 4F749AFA 5E8E1E52 75AEF20A B060E30C 4E88F866 f½.N.D'¯, ÛuR..^•.tOA.=`.vN..š.. 0001C0
 1A74FB38 00740A3C AC0C4E88 0716FA88 0488E228 00808A03 7302283D 02008ADC É¤..=(.s.¤..+à.à.•...N.¯<.t.;«t. 0001E0

Dump of file SATURN:[PCCOMMON.DUMP]INSTALL.EXE;1 on 18-APR-1990 10:27:36.56
File ID (29,26,0)   End of file block 61 / Allocated 64

Virtual block number 18 (00000012), 512 (0200) bytes

 5EE1E800 14E8E2E8 FC46FF0A B0AA001F E80375F8 38008000 9AE9002B E8F4E2AA `ã¶Ò+.Õ..¯.;«u.Ò..`¯..F•Šãò..ŠÃ^ 000000
 065E881F E3CA28CF 881F061E 51535020 A42DE89A FFFC887A E80093E9 FA. 8E5F  .^•Õ..Šz¡•..Ò-É PSQ....ü+òD..^. 000020
 58585 91F 0774D808 FE5E01F4 5E881175 C0080000 FFFF9A50 16F4468D 515. E53 Š.RQ.F¶.P......âu..^¶.^±.Ût..Y(X 000040
 00208A03 E8001C8A 08750009 8A000130 0074006D 3D1874C0 0808C483 1FC3+A88 .•ù..á..ât.=m.t.=..¤..u.¤..Š.¤ . 000060
 C033001C 8A0EEBF8 03751A3F 80085E88 0A5E8E0E 74400011 87F6FE5E 8E26E8F9 •Š&.^±-...ât..^..^..?.u.%Š.¤..3à 000080
 75C9080C 4E8800E6 E9CB5DE5 880472FA 5E8E5F5E F86688FC 462BFE46 8806E8F9 •Š..F±+F•.f½^_.^•r..|}ùÕ|..N..èu 0000A0
 6D3D1774 C0081F07 1E000021 1A9A5016 F4468D51 521E5308 56C51EEE E8C18804 ..èŠY.éV.S.RQ¯F¶.P..!......ât.=m 0000C0
 001187F6 8775C008 F44688C2 E800208A C7E8001C 8ACC7500 098A0001 30007400 .t.=..¤..uâ¤..Šú¤ .Šó.F¶.âuñ-... 0000E0
 0574C308 C08C065E C4EC8855 A3E8C033 001C8AA6 E802751A 3F80260A 880A7440 ât..Õ&.?.u.ŠI¤..3áŠÈU.šá^..à.ût. 000100
 0875000F 543E831E 73FFF130 06468857 5602EC83 EC8855C8 50E58801 FE4F8026 &.O±..|}ùU.š.š.VW.F.=þ.s..>T..u. 000120
 8320FF4F 9A9A0676 FF087500 78E80574 0018E815 750082E8 0F54A312 740025E8 ÒX.t.ÉT.Ò..u.Ò..t.Òx.u..v...O. . 000140
 8050501E C033FE5E 89FEE383 43065E88 0776065E 3900F088 CB50E588 5E5F02C4 á._^.|}ùÉP.9^.v..^.C.D±.^±3à.PP. 000160
 05740208 0F58A30F 561687C2 883874FF FA8308C4 83222051 449A5002 80510E4F O.Ō¯.P.DQ-".á..•.t8.ò..V.ÈX..@t. 000180
 01478000 02A30000 A3000A88 0C478948 480008A3 C033088E FE5E8800 08A3DA8E .OÈ...^±.A3àÈ..HH.G.¡..È..È...G. 0001A0
 8CD20820 36E80F58 1E8ED833 064E88C0 8ED88CC3 1FD88C00 06A3000D 05000AA3 È.....È...A.û.A.à.N.3Ü..X.Òó-.@. 0001C0
 F2FFFFB9 0A7EC4FF 758DAEF2 FFFFB9C0 33067EC4 1EDE88D7 88EC8855 C3D98EC1 ê.1ùU.š.•.B.á~.3ã¿..·Û.u.á~.¿..· 0001E0
```

```
Dump of file SATURN:[PCCOMMON.DUMP]INSTALL.EXE;1 on 18-APR-1990 10:27:36.56
File ID (29,26,0)   End of file block 61 / Allocated 64

Virtual block number 19 (00000013), 512 (0200) bytes

 F3C913A5 F3E9D149 A4027400 01C6F706 4688FE87 08468ED8 8EC08CF9 2BD1F7AE ÙK|+•.å.Ä.F...F.%6..t.Ê||ÕµÊ.èµ 000000
 FFFF89C0 33C08ED3 8CFE880A 76C51EDE 880788EC 8855C850 C28C1FFA 88F388A4 Ê.µ.•..ó]ùU.$.e.8.év...Ã.å3å¿.. 000020
 C850C28C 1FFA88F3 88A4F3C9 13A5F3E9 D149A402 7401A8C7 88067EC4 D1F7AEF2 ·ÙK|á-..ú´.t.Ê||ÕµÊ.èµÊ.µ.•..ó]ù 000040
 1DC01805 74A6F3F9 2BD1F7AE F2FFFF89 C0330A7E C40676C5 1EDE8807 88EC8855 U.$.e.8.év.á-.3å¿..·ÙK|+•µ|t..å. 000060
 5DFA8891 49D1F7AE F2FFFF89 C033067E C4D788EC 885500C8 5DFA88F3 881FFFFF ....µ.•]ù.U.$.eá-.3å¿..·ÙK||..•] 000080
 00B202EB 01B2C850 C38802EB 00202DC3 88077402 0F7987F6 065E88EC 885500C8 ù.U.$.^.-.y..t..ù- .Š..ù]ùý.Š.ý. 0000A0
 067400FF 250E8CA0 907FE8FF FF0E8A06 C7008408 75E40A0E 8AA114EC 83EC8855 U.$.$.Åo..ðu.Ç.ú.o...Š...¥.%..t. 0000C0
 04E183F8 4E883C75 C0080000 FFFF9A50 5316F65E 8D000AF6 46C766E8 0E8C2688 .&¥.ŠfúF-...^-.SP......åu<.N%.Ã. 0000E0
 00FFFF9A 5050C033 5016EC46 8D2375C0 080000FF FF9A5053 160008F8 46C711E3 D.úF%...SP......åu#.F$.P3åPP.... 000100
 E03CEC46 881BEBFF FF880574 C0080000 23D89A50 5316F84E 8914E311 75C00800 ..åu.D..N%.SP.ÙW...åt.¡..Š..F$<Å 000120
 06EC83EC 8855C850 E5882259 52D69A50 0674D20A 00840EBC 26880475 C00A0474 t..åu..&¥.Ç..@t.P.@RY".|]ùU.$.$. 000140
 FA76880A 7E88907C E899C028 067F000A 7E83FE56 89FC4689 08568806 46885657 WV.F..V..F•.V±.~....+å.Š|..~..v• 000160
 1075FC46 39085688 064.8823 7540F088 04C48324 2432849A 0C76FF0E 76FF45E8 ŠE.v..v...2$$.å..Þåu#.F..V.9F•u. 000180
 C688FC46 FFFC5EC4 30E8FA76 890A7E89 45E8FA76 890A7E89 99C02808 75FE5639 9V±u.+à..~..v•ŠE.~..v•Š0á^•.F•.6 0001A0
 8ED88807 FF260257 88260788 26AF7804 4FFF260C 5EC4E674 4FE9740A 3CU.·926 &..<.tÒOt|á^.&.O.x£&..&.W.&...Ä. 0001C0
 83EC8855 90C850E5 885F5E08 56880646 880007C6 26FC5EC4 ABE8E42A 078A2 ·2 ö&..•ðŠ á^•&ó...F..V.^_.|]ù.U.$. 0001E0

Dump of file SATURN:[PCCOMMON.DUMP]INSTALL.EXE;1 on 18-APR-1990 10:27:36.56
File ID (29,26,0)   End of file block 61 / Allocated 64

Virtual block number 20 (00000014), 512 (0200) bytes

 83250836 649A0A76 FF0C76FF F88804C4 8324ED23 5A9A0676 FF0876FF 565706EC $.WV.v..v..Z#Ù$.å..%.v..v..dó.%. 000000
 FA46890C C4832S1A 2F8C9A06 76FF0876 FF500001 88570A76 FF0C76FF F08804C4 å..Þ.v..v.W¡..P.v..v..¥/.%.å..F• 000020
 5DE5885F 5EFFFF88 03E8C028 0475FA7E 3906C483 24583746 9A560A76 FF0C76FF .v..v.V.F7($.å.9-•u.+åŠ.¡..^_.|] 000040
 FF004E1E 88137800 520EFFFE 5689FC46 89085688 06468856 06EC83EC 885590C8 ù.U.$.$.V.F..V..F•.V±..R.x...N.. 000060
 0AFE83F0 8804C483 24D03284 9A501E00 4E8800E8 E42A078A 26005006 8E004E06 .N...P.&..*ðŠ.¡N..P..2ï$.å..Þ.±. 000080
 26FC5EC4 1EEB99C0 280575FE 56390A75 FC463908 56880646 882575FF FE831A74 t..±.u%.F..V.9F•u.9V±u.+å.Š.á^•& 0000A0
 90C85DE5 885E909C E8FC46FF 078826C6 88FC5EC4 900FE808 56880646 880007C6 6...F..V.Š..á^•.6&...F•Š..^.|]ù. 0000C0
 47C626F8 5EC4FE56 8CFC4689 0E468DFA 568CF846 89EC468D 565716EC 83EC8855 U.$.$.WV.F$.F%.V•.F..F•.V±á^½&6G 0000E0
 76FF167F FF0447C7 26025789 26078926 08578926 06478926 08568806 4688420A .8.F..V.&.G.&.W.&..&.W.&ùG.....v 000100
 8826C02A 1278044F FF26F85E C4F0880C C4832628 44609A53 060A76FF 0C76FFFC •.v..v..S.'D(&.å..Þá^½&.O.x.*å&. 000120
 5EC68806 C4832566 33809A50 C02853FA 76FF9010 E8058826 02478E26 07FF263F 7&..&.G.&..Š...v•S+åP..3f%.å..6^ 000140
 5EC4FE56 8CFC4689 0E468DFA 568CF846 89EC468D 14EC83EC 885590C8 5DE5885F .|]ù.U.$.$..F$.F%.V•.F..F•.V±á^ 000160
 235A9A50 52025789 26078926 08578926 06478926 08568806 4688490A 47C626F8 ½&6G.I.F..V.&.G.&.W.&..&.W.RP.Z# 000180
 8825FC38 829A5306 0A76FF0C 76FFFC76 FFFE76FF 04478926 F85EC404 C4832680 .&.å.á^½&.G..v±.v•.v..v..S..8•%. 0001A0
 F08804C4 8326C536 649A501E FC5E8CFA 4689005A 885608EC 83EC8855 90C850E5 |]ù.U.$.Š.V¡Z..F•.^•.P.dóé&.å..Þ 0001C0
 FC76FFF8 46890CC4 83260744 609AFA76 FFFC76FF 0676FF08 76FF0A76 FF0C76FF .v..v..v..v..v•.v•.'Dæ&.å..F½.v• 0001E0

Dump of file SATURN:[PCCOMMON.DUMP]INSTALL.EXE;1 on 18-APR-1990 10:27:36.56
File ID (29,26,0)   End of file block 61 / Allocated 64

Virtual block number 21 (00000015), 512 (0200) bytes

 03750D0C 0684FFFF 88EC8855 CB5DE588 5EF84688 06C48326 7037469A 56FA76FF .v•V.F7p&.å..F½^.|]ùU.$¡......u. 000000
 88C22800 880277C2 3800032D 0375FE02 7F830F4A 1E8808E6 16880003 2008E0A1 ÀÀ.-....|...J....±u.-..;ów..Å+ó. 000020
 2874FFFE 3007E80F 4A368808 88C888FF C3E83C74 C0080003 E856EC88 55C35DE5 |]ùU.$VÒ£..åt<ÒÙ..à.Ä.6J.Š.=±.t( 000040
 02C28303 030575FF FE3DF475 01A8ADF0 03D00342 4248FFFE 8AF47401 A8ADF003 .ÞÙ´.t¶o±.H88.Å.ÞÙ´.u¶=±.u..£.ó. 000060
 88C888FF 77E82C74 C0080087 E856EC88 55C85DE5 885EC188 D3E8CA88 D777CA3B ;òwæ.ðŠ£.ê^.|]ùU.$VÒ...åt,Òw..à. 000080
 F47501A8 ADF003D0 03424248 FFFE8AF4 7401A8AD F0031A74 FFFE3D07 E80F4A36 6J.Š.=±.t..ÞÙ´.t¶o±.H88.Å.ÞÙ´.u¶ 0000A0
 03C38306 5E880F4A 36884274 C008004B E856EC88 55C85DE5 885EC188 E1E8CA03 .ðŠÅ.ê^.|]ùU.$VÒK..åtB.6J..^..û. 0000C0
 01A8ADF0 03D00342 4248FFFE 8AF47401 A8ADF003 2174FFFE 3007E8C9 33FEE380 .D±3èŠ.=±.t!.ÞÙ´.t¶o±.H88.Å.ÞÙ´. 0000E0
 EC8855C8 5DE5885E C103F3F7 D2335BFF 03E8530A E858C803 F3F7D233 9250F475 u¶P.30¼µ.åXŠOSÒ..[30¼µ.ê^.|]ùU.$ 000100
 00C35DE5 8801FE4F 80088806 74C00826 A94F9A9A 50107500 3F830F4A 88000188 ¡..£J..7.u.P..O`&.åt..Ä.O±..|]ù. 000120
 04740538 264FAEF2 F8880A46 8AD9F741 AEF2FFFF 89C0330F 88067EC4 57EC8855 U.$W6-..Õ3å¿..·ÙA¼|.F..«·ÙO&8.t. 000140
 2D74C00A FF80065E C40A76C5 1ED688EC 885500C8 5DE5885F C28CC788 C78EFF33 3..ú.ú.ò_.|]ù.U.$.ø.év.á^.¯..åt- 000160
 E180C91A 1A3C412C E0864104 C10220E1 80C91A1A 3C412CF3 74E03A43 278A26AC ˜&.'C:Åtµ,A<..è.Ã .è.A.Å,A<..è.Ã 000180
 0A7EC406 76C51E56 57EC8855 00C850F2 881F98FF 1CC01AD3 74C43A41 04C10220  .è.A;åt£.à.....]ù.U.$WV.év.á~. 0001A0
 E33A0672 E73A4746 1C74C00A 2074E40A 058A2624 8A20865A 8341873E E30E4E88 .N.D>ñA*ZÑ .$&...ðt .åt.FG:Òr.:D 0001C0
 49027200 00890974 E03AC933 D7E20875 E03AC602 0277C33A 0672C73A E6020277 w..l:úr.:úw..ó:Åu.åæ3è:Åt.¿..r.I 0001E0
```

Dump of file SATURN:[PCCOMMON.DUMP]INSTALL.EXE;1 on 18-APR-1990 10:27:36.56
File ID (29,26,0)   End of file block 61 / Allocated 64

Virtual block number 22 (00000016), 512 (0200) bytes

```
0000FA01 16151411 100F0808 0402160F 08080402 CB50E588 5F5E1FC1 88D1F749 I%I.è.^_.Í]ù..................•.. 000000
1E880A75 00083D06 46881OEC 83EC8855 297F298D 29772995 29950004 07060503 .......).)w).).)U.$.$..F.=..u... 000020
46890247 88FE4689 0/88F64E 89F85E89 5772015C E80EDB33 5F74108E 1F0B10BC ¥.../.t_3U.Ò\.rW.^½.N-...F±.G..F 000040
00043D48 7600013D 00750000 0C3E8060 75D2080A 56880846 88FA4689 U4 788FC •.G..F•¯F..V..@u'.>...u.=..vK=.. 000060
89FE4688 024789FC 4688F85E 8828F6A7 FF2EE3D1 D8884777 00043D90 23E. ;F77 wOS#.=..wG.AiD..I-(.^½.F•.G..F±. 000080
88C888EA 74C908FE 4E880775 C908FC4E 8805F1E9 C0330016 8A044789 FA46uB07 ..F•.G.¤..3àÒþ..N•.èu..N±.ètõ.à. 0000A0
000C3E80 044F8907 89025789 00028990 04E8008B C033C888 F85E8890 15EBF85E ^½$...^½.à3à.Å$..¿...W....O..>.. 0000C0
F2468050 522ABF88 CA8C0575 02F98324 7C72740B 0A28EC9F 8A2EF65E 88507400 .tP.^-...$(.Ùtr|$.•.u..ò¡¢•RP.F· 0000E0
0475C908 2AECB8CA 8CD8F6FF 7EE94F74 C0080000 FFFF9A53 515016FD 46805016 .P.Fþ.POS......àtOÕ-.-Ù.ò¡$•.èu. 000100
83287502 F983064E 882074C9 0BD8E800 001A8A9A 5016F246 80505253 D08BC033 3à.ÅSRP.F·.P.....ŠÙ.èt-.N..•.u(. 000120
21CD2584 23801F0E 1E280FBA 0F741E89 0F72068C 21CD3584 23802175 000F723E >r..ul¯#Ç5èl..r...t.¤.+...¯#ÇXèl 000140
88289188 0075C908 0F881375 D2080257 88289688 267508F9 83064E88 F85E881F ..^½.N..•.u&¡.+.W..@u....èu.¡.+. 000160
06750004 3D057400 023D99FA 4688108C 1EFF0003 88CA8C2B 90880374 C908044F O..èt.¡.+.ðE....¥..F•.=..t.=..u. 000180
00000C3E 809019E8 000A8928 F51E800A 74D808EC 8855C85D E588FC56 88FE4688 .F±.V•.Í]ùW.$.Ut...¥(¿..$...>... 0001A0
49900DE8 F9F8E248 07740738 2E000A89 28E81E8D 9008E800 068928E1 1E8D0A75 u...Ã(¿..$....$(¿...8.t.Kã½•$..I 0001C0
FFAAE80E 00018806 46881F16 FCEC8855 45C85DE5 88F80803 0E8E1E80 E1F60680 ¯.-Å../..A½.Í]ùEU.$•...F.E...Ò`. 0001E0
```

Dump of file SATURN:[PCCOMMON.DUMP]INSTALL.EXE;1 on 18-APR-1990 10:27:36.56
File ID (29,26,0)   End of file block 61 / Allocated 64

Virtual block number 23 (00000017), 512 (0200) bytes

```
EC885545 0004CA40 50E58804 C4831FFF 52500846 88098828 E2978A2E D233C887 .ù3@...â(.).F.PR...á..Í]Mò..EU.$ 000000
50EFDAE8 0E500003 880002CA 4D50E588 58087440 27FF5318 9A500004 881F16FC •..¡..P..S.'@t.X.Í]Mò..¡..P.ÒÖyP 000020
04EC835C 7400013D 32740002 300EC2A1 00750000 473E830B 8E186A88 521E509F .P.R¡j..Á.>G..u.Àõ.=..t2=..t\.$. 000040
890F72A1 0046890F 74A1F275 003CC8FE 45450056 89045688 048002C5 83EC8855 U.$.é.¯..V..V.EE±à<.u·Àt..F.Àr.. 000060
C0335351 56575506 0EFC1689 0EC0168B 0EFAA30E 8EA1C8F9 589E581F 5A5D0246 F.]Z.X.X•ùÀ/.È•...à...•..UWVQS3à 000080
C8F8589E 581F5A07 5D5F5E59 58580EFA 1EFFFC50 0002880E C0A30E8E A30EC2A3 Èò.È/.Èà.¡..P=..•.X[Y^_].Z.X.X½ù 0000A0
5A0704C4 831FFFFE D1E80ED8 33500008 8850E432 1F160652 515310C4 2EFF36C8 ùó..á.SQR...2óP¡..P3Ù.Õl±...á..Z 0000C0
468904C4 8328E652 409A501E 0EFE8818 EC83D88E 1EEC8855 4590581E 00C85859 Y(ù..X.EU.$..Á.$.¡±..P.@R|+.á..F 0000E0
B80775C0 0806C483 2C3A2C92 9AEE76FF 5250C028 20750846 08064688 F05689EE Ÿ.Vþ.F..F.u +àPR.vŸ..,:,.á..ău.¡ 000100
5689F646 89085688 064688F4 5E8CF246 890F0688 90008EE9 C0289000 94E90001 ..Õ...+àÕ...¡...F·.^¶.F..V..F-.V 000120
76FF5016 EE468D00 3F36FF00 4136FF37 74F04608 EE468BFA 4689FC46 89C028F8 ½+à.F=.F•.FŸ.Fþt7.6A..6?..FŸ.P.v 000140
00063E83 0C740200 063E830E 7540EC46 890EC483 2C84530E 9A50C028 EE76FFF0 Þ.vŸ+àP.8S.,.á..Fš@u..>...t..>.. 000160
4136FFF0 5E8CEE46 890F1188 03E80F09 88057400 000C3E80 31E8EC46 88057400 .t..Fš$1.>...t.¡..Š.¡...FŸ.^Þ.6A 000180
501FE588 02E0830E C4832AFA 559A9A50 C028EE76 FF1E5016 EE468000 3F36FF00 ..6?..FŸ.P..vŸ+àP..U•*.á..Ù..Í.] 0001A0
1675C008 00001EC0 9A5050C0 3350FE46 8D160676 FF0876FF 02EC83EC 8855C84D MùU.$.š..v..v...F±P3àPP.à....àu. 0001C0
885500C8 50E58802 86E902AA E9000588 0000BA0C 740001FE 46F71374 020A46F6 -F..t.¥F±..t.o..¡..Õ`.ÕÑ..Í]ù.U. 0001E0
```

Dump of file SATURN:[PCCOMMON.DUMP]INSTALL.EXE;1 on 18-APR-1990 10:27:36.56
File ID (29,26,0)   End of file block 61 / Allocated 64

Virtual block number 24 (00000018), 512 (0200) bytes

```
FFEC8855 00C85DE5 880298E9 0374C085 0000FFFF 9A5050C0 330676FF 0876FFEC $.v..v.3àPP......àt.Õ...Í]ù.U.$. 000000
0876FFEC 885500C8 5DE58802 7AE90374 C0850000 FFFF9A50 50C03306 76FF0876 v..v.3àPP......àt.Õz..Í]ù.U.$.v. 000020
5E880846 88EC8855 00C85DE5 88025CE9 0374C085 000012B9 9A5050C0 330676FF .v.3àPP.¿....àt.Õ\..Í]ù.U.$.F..^ 000040
88C8030C 66F70646 88C888E3 F70008CA 5DE588E3 F7064688 08750A5E 88D8080C ..Á.^.u..F.¥D.Í]ò..¥D.à.F.¥f..à. 000060
D2330846 880A4E88 1575C008 0C468856 53EC8855 0008CA5D E5880103 E3F70646 F.¥D.Ì.Í]ò..U.$SV.F..áu..N..F.3@ 000080
D8D1EAD1 D8D1E9D1 06468808 56880A5E 88C88838 E8D388F1 F7064688 D888F1F7 ¥þ.Á.F.¥þ.Æ$8.à.^..V..F.ÌÕÌÙÌòÌÃ 0000A0
76064638 06720777 0856380C 720103E6 F70A4688 910C66F7 F088F3F7 F475C908 .èu¶¥µ.Þ¥f...F.¥Ì.Ìr.;V.w.r.;F.v 0000C0
74000F20 3E8361CE 2EEE9A50 00FCB8EC 88550000 08CA5DE5 88585E96 D2334E01 .N3@.^[.Í]ò...U.$¡=.P.Ÿ.õa.>`..t 0000E0
0872D828 0C885A59 E8DCE900 0288C85D E5882DC8 2EEE9A50 00FF880F 1E1EFF04 .....¡..P.Ÿ.à-.Í]ù¡..ÕÉŠY2.É+Ár. 000100
89F63356 0F222EFF E88CE9C0 33057540 0F22A151 52C85152 E3880572 0F261E38 ;.&.r..DRQÙRQÀ".@u.3àÕ¥Š..".V3-¿ 000120
0001882E 222EEE9A 50000188 20DC2D8E 9A117455 F480F8E2 E032ACFC E4320042 8.2ô•¯2Àã«.¶Ut../·É-¡..P.Ÿ.".|.. 000140
AE46AEF2 0674053A 26FFFF89 FF33F633 C03308DE 068E0F2A 068F0F28 068FC85E ^ù..(...•...8.3à3-3.¿..&:.t.·ÙFÙ 000160
168C0D3F A3EB59E9 00098806 73282DE8 C603E6D1 E6D1FE88 FE2440C7 8846FA75 u•F.ú@$±.±ilil.6ò-+s.¡..ÕYŠÈ?... 000180
BF575651 10750CE* 06382604 8828E349 0716F633 1F060888 FE03F888 CF880D41 A..u.½.±.A..3-..1D+..&;.Ò.u.QVW¢ 0001A0
892605E2 FA75C00   AAAC04C3 8302578C 263F8926 0A74595E 5FA7F300 06890CE8 Ò.¿..µI_^Yt.&.?&.W..ü.¯`.àu•ãI&. 0001C0
10EE8E06 5688C08E D88E2815 885756EC 8855000F 282EFF07 161F1602 4F89260F .&.O.......(..U.šVW¡.+.Á.à.V./Ÿ. 0001E0
```

Dump of file SATURN:[PCCOMMON.DUMP]INSTALL.EXE;1 on 18-APR-1990 10:27:36.56
File ID (29,26,0)   End of file block 61 / Allocated 64

Virtual block number 25 (00000019), 512 (0200) bytes

```
88550002 CA5DE588 5E5F96E8 E8F788AE F2FFFF89 C033970C 74964010 74C238AD Ù;ôt.@.t..3à¿...Û.¥$$._^.[]ò..U. 000000
0288C488 504901F7 AEF2FFFF 89C033FA 88921F74 C0082E28 2E8E9A06 76FF57EC &W.v..ƒ.+..ât...°3à¿..`Ü¼[]P.ÀE. 000020
09060005 18040203 02021601 0002CA5D E5885F58 000021A3 9A501651 521E5300 .S.RQ.P.Ê[..(_.[]ò.............. 000040
00530052 02430041 02350212 12110010 120F1600 160C0808 070A0C09 0C080C07 ......................5.A.C.R.S. 000060
16080000 08D702CE 08A40084 09820A81 0A801606 09721C70 2060006C 08590057 W.Y.l.m p.r...........Ê.ö.■..... 000080
2F248800 00A3CB5D E58899FF FF880008 E8CB5DE5 8899FFFF 88000616 890000A3 È......¡....[]ùÕ..¡....[]ùÈ..£$/ 0000A0
76CA3C04 728C3C43 0A76243C 0472133C F7E24343 1674073A 2E1875E4 0A002489 ¿$..ðu..:.t.CCã¥<.r.<$v.C<¥r.<bv 0000C0
20289A0A 76FF500C 76FF50C0 28561AEC 83EC8855 00C30006 A3980147 8A2E4301 .C..G..È..û.U.ß.ß.V+äP.v.P.v..(· 0000E0
90028FE9 C0280675 000C7E83 0674000A 7E83FA56 89F84689 FE5689FC 46893007 .0.F=.V±.F½.V°.~..t..~..u.+äÕ... 000100
88F9F700 0C899930 5D58AA9A 5306501E 004E8800 86E90374 0C0A47F6 260E5EC4 á^.&-G..t.Õ..¡N..P.S.`[]0.¿..¥°. 000120
0E5EC407 8A26065E C4257804 4FFF260E 5EC46575 010E3E87 F6E3D1D8 03E3D1D8 ÀìD.ÀìD-.>..ueá^.&.O.x¥á^.&..á^. 000140
FF1076FF 16E80788 260988C6 8E307602 47812606 73010783 26027788 260F8826 &..&.w.&...s.&.G.v0.6.1&..Š..v.. 000160
83FF78E9 0374200A 47F6260E 5EC406C4 83309733 809A5098 078A2606 5EC40E76 v.á^.&...P..3.0.á.á^.&-G. t.Õ(.. 000180
004E8824 75080A47 F6260E5E C400FA5E 8301F86E 83084601 318625C0 18010646 F...à¥.1.F..n½..^°.á^.&-G..u$¡N. 0001A0
23E90375 010E3E87 F6E3D1D8 03E3D1D8 88F9F700 0C899931 2158AA9A 5306501E .P.S.`[[1.¿..¥°.ÀìD.ÀìD-.>..u.Õ# 0001C0
04050E46 88F05689 EE468900 0A051056 880E4688 0187E903 75FA4608 F8468801 ..F½.F°u.Õ...F..V.....F¥.VÞ.F... 0001E0
```

Dump of file SATURN:[PCCOMMON.DUMP]INSTALL.EXE;1 on 18-APR-1990 10:27:36.56
File ID (29,26,0)   End of file block 61 / Allocated 64

Virtual block number 26 (0000001A), 512 (0200) bytes

```
0E72FA56 38D22807 88267E74 003F8326 E65EC4E8 5689E646 89EC5689 EA468900 ..Fõ.V$.F[.VÒá^[&.?.t-&..+■;V°r. 000000
76FF5000 00F646C7 F4468904 4788260E 5EC49090 09E8F846 880776F8 46380577 w.;F½v..F½Š...á^.&.G..F¶úF-..P.v 000020
0126F44E 88C0280E 5EC40AC4 8331A358 F69A37FF 260277FF 260E5EC4 0676FF08 ..v.á^.&.w.&.7.-[È1.á.á^.+à.N¶&. 000040
084601E0 03FFFFB9 F6461306 4E01F44E 88C02802 470126E0 03314989 F646130F ..F-¿11&À&.G.+à.N¶.N..F-¿..&À.F. 000060
26065EC4 26780FFF 26EA5EC4 64E80729 26E65EC4 FA5619F8 4629F656 88F44688 .F¶.V-)F½.V°á^[&).Šdá^õ&..x&á^.& 000080
E8078826 D988C68F 31880247 81260673 01078326 02778826 0F88260E 5EC4078A ..á^.&..&.w.&...s.&.G.£1.ó.1&..Š 0000A0
742007F6 26EE5EC. 36C48332 3533809A 5098078A 26065EC4 0E76FF10 76FF9017 ...v..v.á^.&...P..352.á.á^¥&-. t 0000C0
7374FA46 08F84688 00FA5E83 01F86E83 08460132 1925C018 01064683 008FE903 .Õ...F...à¥.2.F..n½..^°..F½.F°ts 0000E0
04050E46 88E85689 E6468900 0A051056 880E4688 6774FA46 08F84688 90FF0AE9 Õ....F½.F°tg.F..V.....F[.VÒ.F... 000100
26027788 260F8826 0E5EC407 8A26065E C425780F FF26EA5E C4EC5689 EA468900 ..Fõ.V$á^õ&..x¥á^.&..á^.&..&.w.& 000120
078A2606 5EC40E76 FF1076FF 16E80788 260988C6 8E326502 47812606 73010783 ...s.&.G.e2.6.1&..Š..v..v.á^.&.. 000140
28FE5688 FC46880A 76FF50C0 28187420 07F626E6 5EC406C4 83325A33 809A5098 .P..3Z2.á.á^[&-. t.+àP.v..F=.V±+ 000160
5E8301F8 6E830846 01FFFF25 C0180106 468320E8 2EF82D5C 9A5052FA 5618F846 F½.V°RP.\-½.Š .F...à¥...F..n½..^ 000180
4E200646 885602EC 83EC8855 90CB5DE5 885E90FF 7AE9C974 FA4608F8 468800FA °..F½.F°tèÕz..^.[]ù.U.ß.ß.V.F.·N 0001A0
26077483 0A47F626 065EC4FE 46890E3E 05E0D1C1 03E0D1C8 88F9F700 0C899900 ..¿..¥°.àìÀ.èìÀ.>..F±á^.&-G..t.& 0001C0
802690E9 E8200A4F 80260874 020A47F6 26065EC4 008FE9FF FF880674 400A47F6 -G.@t.¡..Õ¢.á^.&-G..t.&.O. ŠÕ.&. 0001E0
```

Dump of file SATURN:[PCCOMMON.DUMP]INSTALL.EXE;1 on 18-APR-1990 10:27:36.56
File ID (29,26,0)   End of file block 61 / Allocated 64

Virtual block number 27 (0000001B), 512 (0200) bytes

```
D88BF9F7 000CB999 004E20C3 8827750C 0A47F626 065E88F8 2780FE5E 88010A4F O...^±.'«.^.&-G..u'.û-N..¿..¥°.Ä 000000
47882606 5EC49013 F804C483 26CEE806 76FF0600 75010E3E 87F6E3D1 D803E301 [D.ÀìD-.>..u...v.Òo&.á.Š..á^.&.G 000020
478A2606 77FF2608 77FF2606 5EC40277 FFFE5E88 02578926 07892608 57882606 .&.W.&..&.W..^±.w.á^.&.w.&.w.&.G 000040
047F8326 1C75FFFF 300574C0 08044789 26065EC4 08C4832F D01EFC9A 50E42A08 .°ÕP.•.À/.á.á^.&.G..àt.*..u.&... 000060
26378826 044FFF26 90FF4FE9 00000447 C7260A47 08261080 9003E820 80057400 .t.¯ Š..¯.&.G.&úG...ÕO..&.O.&.7& 000080
2A08478A 26085EC4 565708EC 83EC8855 C850E588 5EE42A04 8A260247 8E2607FF ..&.G.&..°ö^.[]ùU.ß.ß.WVá^.&.G.* 0000A0
47F626F8 46890E3E 05E0D1C1 03E0D1C8 88F9F700 0C899900 4E20C388 FA4689E4 ô.F°.û-N..¿..¥°.àìÀ.èìÀ.>..F½&-G 0000C0
47F62608 5EC49001 39E9FFFF 88200A4F 8026085E C40F7440 0A47F626 0774830A ..t.&-G.@t.á^.&.O. ¡..Õ9..á^.&-G 0000E0
8926C028 EF0A6780 26020A4F 802690E2 E8000004 47C72620 0A4F8026 0E74010A ..t.&.O. &úG...Šã.&.O..&.g.ÿ+à&. 000100
D10803E3 D1088BF9 F7000CB9 99004E20 C3885175 0C0A47F6 26FC7689 F0880447 G..Þ.v=&-G..uO.û-N..¿..¥°.ÀìD.Àì 000120
0A7E8116 75006608 7E810E74 34300A7E 81077500 5A087E81 3775010E 3E87F6E3 D-.>..u7.-.Z.u..-.04t..-.f.u..-. 000140
C404C483 2586E808 76FF0A76 FF0C75C0 0802C483 34A85886 9AFA76FF 0F752EC4 á.u..v°..[`4.á..àu..v..v.Ò.¥.á.á 000160
0E3E87F6 E3D1D803 E3D1088B F9F7000C 8999004E 20C3881A 75080A47 F626085E ^.&-G..u..û-N..¿..¥°.ÀìD.ÀìD-.>. 000180
F87E8802 57892607 89264008 57882606 47882606 77282637 8826085E 88697401 .ti.^.&.7&+w.&.G.&.W.@&..&.W..-½ 0001A0
FC46890B C48334C8 20409AFA 76FF0677 FF265256 167EF608 04478926 48024588 .E.H&.G..-~.VR&.w..v°.@ à4.á..F• 0001C0
085EC408 C48334ED 58029A53 5050C028 50000288 1174200D 1187F6FA 5E881BEB Š..^°-... t.¡..P+àPPS..[Ü4.á.á^. 0001E0
```

Dump of file SATURN:[PCCOMMON.DUMP]INSTALL.EXE;1 on 18-APR-1990 10:27:36.56
File ID (29,26,0) End of file block 61 / Allocated 64

Virtual block number 28 (0000001C), 512 (0200) bytes

```
83333720 409AFA76 FF501606 468D50C6 8B00018E 19EB0788 2606468A 065FC426 &6_..F.&..$./...6P.F..P.v*.a 73. 000000
F626065E C4EC8855 CB5DE588 5F5EE42A 06468AFE BEE90374 FC7639FC 468908C4 6..F=9v=t.O/±.F.*8^_.|}ùU.$á^.&- 000020
26065EC4 04C48334 3A21E49A 0677FF26 0877FF26 2E74080A 47F62635 74830A47 G..t5&-G..t.&.w.&.w..8!:4.6.6^.& 000040
83EC8855 CB5D0447 89260857 89260647 89260257 892607B9 2699C028 F70A6780 .g.%+à.&..&.W.&.G.&.W.&.G.}ùU.$. 000060
9000EFE9 99C02813 7400773D 0C740072 30277400 61309807 8A260A5E C4560AEC $.V6^.&...=a.t'=r.t.=w.t.+à.Öÿ.. 000080
0002C6F7 90F4EB01 09BE90F1 EB02FC46 C60301BE 9022EB00 018901FC 46C6F62B +-6F=.¿..$".f..6F=.$þ./..$¶.%6.. 0000A0
078A2633 74C90837 74003F80 260A5EC4 0A46FF80 FC46C6FE E6830002 CE814375 uC.ö...|±6F=..F.6^.&.?.t7.èt3&.. 0000C0
C6889000 EB4000CE 810E75C0 00A9C688 15750074 30137400 62300674 002B3098 .=+.t=b.t.=t.u..6`.âu..ö.aŠÅ..6 0000E0
3E9A0676 FF0876FF 565001A4 88FE4E89 8DEB8000 CE8190C4 EBC92805 74C000A9 `.át.+èŠ6..ö..$§.N±¡Ê.PV.v..v..> 000100
C3881086 06FF0A47 8826FC46 8A0E5EC4 FF69E903 7DC00BFA 468908C4 8335271D .'S.6..F'.à).Öi.6^..F=&.G...Ñ..ú 000120
88980788 F85E88C0 2AF84689 0E3E05E0 D1C103E0 D1C888F9 F7000C89 99004E2D ·N..¿..%'.àiÅ.èiÅ.>..F½*ä.^½.... 000140
26064789 26025789 26078926 99C0280E 5E880000 0447C7F8 5E880447 89260E5E ^.&.G..^ÝúG....^.+à.&..&.W.&.G.& 000160
81108606 FF5604EC 83EC8855 90CB5DE5 885EC28C C3880847 8826FA46 8A085789 .W..F'&.G..ù.ô^.|}ù.U.$.$.V..Ñ.. 000180
3422087E 81307500 66067E81 13E80000 FE46C707 75368E08 7E810E75 005A067E -.Z.u..-..6u.úF±..$..-.f.u0.-."4 0001A0
E3010888 F9F7000C 8999004E 2DC3881A 750C0A47 F626065E C40001FE 46C72975 u)úF±..6^.&-G..u..ù-N..¿..%'.AiD 0001C0
0B04880F 2CC68· 6 D30281FE 76889090 0081E9C0 28077401 0E3E87F6 E301D803 .AiD-.>..t.+àÕ.....v±Ý.Æ|.6,.... 0001E0
```

Dump of file SATURN:[PCCOMMON.DUMP]INSTALL.EXE;1 on 18-APR-1990 10:27:36.56
File ID (29,26,0). End of file block 61 / Allocated 64

Virtual block number 29 (0000001D), 512 (0200) bytes

```
99004E2D 06468802 74D00802 54890489 02C48337 8521F99A 50020088 15750244 D.u.¡..P.*!.7.6....T..Åt®.F.-N.. 000000
2C848BE6 D1E6D1FE 7688065E C4FC4689 0E3E05E0 D1C103E0 D1C88BF9 F7000C89 ¿..%'.àiÅ.èiÅ.>..F=6^..v±i|il.., 000020
47892602 44890200 88FC7688 02578926 07892608 57892606 4789260F 2E94880F .....&.G.&.W.&..&.W..v=¡...D.&.G 000040
2D084688 04EC83EC 8855CB5D E5885E00 0188020A 4F802606 5E881107 C6DE8804 ..B6...^.&.O..¡..^.|}ùU.&.&..F.- 000060
C4517400 067E83FE 5E8CFC46 890E3E05 E0D1C103 E001C888 F9F7000C 8999004E N..¿..%'.àiÅ.èiÅ.>..F=.^±.~..t06 000080
76FF5F74 C00802C4 8337975B 869A50E4 2A08478A 26085EC4 75741007 F626FC5E ^=&-..tuà^.&.G.*8P..[.7.6..àt_.v 0000A0
2699C028 085EC400 000247C7 260007C6 26FC5EC4 04C48337 D637F29A 0876FF0A ..v..·7=7.6.6^=&6..&úG...6^.+ã.& 0000C0
0B478A26 085EC424 741007F6 26FC5EC4 2DE80857 89260647 89260257 89260789 ..&.W.&.G.&.W.$-6^=&-..t$6^.&.G. 0000E0
50E58804 C48335F1 37F29A08 76FF0A76 FF0E74C0 0802C483 37E85886 9A50E42A *8P..[Ò7.6..àt..v..v..·7þ5.6..[] 000100
881A7508 0A47F62ᴗ 5A75023C 03240A47 8A26065E C4F62856 04EC83EC 885590CB ù.U.$.$.V+-6^.&.G.$.<.uZ&-G..u.. 000120
26078826 065E8839 74010E3E 87F6E3D1 D803E3D1 D888F9F7 000C8999 004E20C3 ū-N..¿..%'.AiD.AiD-.>..t9.^.&..& 000140
83360820 409A50E4 2A08478A 260677FF 260877FF 2650287E C008FC46 8906472B +G..F=.à-(P&.w.&.w.&.G.*8P.a Ü6. 000160
07892608 57882606 47882606 5EC4FFFF 8E200A4F 8026065E C40874FC 463808C4 6.;F=t.6^.&.O. f..6^.&.G.&.W.&.. 000180
C756573A 8320E89A 010AB8EC 885590CB 5DE5885E C6880000 0447C726 02578926 &.W.&úG....6^.|}ù.U.$¡...Ò-.:WVú 0001A0
A3C02812 76168C12 74A3FEF8 8680125C 1689125A A3085688 06468800 00126C06 .l....F..V.ÉZ...\...½±Èt...v.+àÈ 0001C0
8688078A 260A5EC4 12701689 126EA310 56880E46 881286A3 1260A312 80A3127A ±.È..È'.È...F..V.Èn...p.á^.&.... 0001E0
```

Dump of file SATURN:[PCCOMMON.DUMP]INSTALL.EXE;1 on 18-APR-1990 10:27:36.56
File ID (29,26,0) End of file block 61 / Allocated 64

Virtual block number 30 (0000001E), 512 (0200) bytes

```
078A260A 5EC40A46 FF0821E8 0E177408 0F7987F6 D8889805 35E90375 C00AFEF6 -±.âu.Ö5...Ä-.y..t..Ö!..F.6^.&.. 000000
891288A3 991268A3 C02804D4 E9037425 3F80260A 5E88ED75 080F7987 F6D88898 ..Ä-.y..uÚ.^.&.?%t.Öå.+àÈh..È... 000020
A3126AA3 1278A312 7EA398F8 46881272 A3127CA3 1258A312 62A31290 A3128A16 ...È..Èb.Èx.È|.Èr..F½.È-.Èx.Èj.È 000040
46FF127E 06FF0775 2A3F8026 0A5E880A 46FF0010 126606C7 00011264 06C7125E ^.ú.d...ú.f....F..^.&.?*u...-..F 000060
E1D1E1D1 127C0E88 98058A26 0A7E8841 74040F79 87F6D888 98078A26 0A5E880A ..^.&....Ä-.y..tA.~.&.....|.1Ä1Ä 000080
0A7E8907 75040F79 87F6D888 98058A26 47127C0E 8930E983 C803E1D1 127C0E03 ..|.1Ä.à.ÖO..|.G&....Ä-.y..um.-. 0000A0
4E3D0874 00463098 078A260A 5E881262 06FF9005 E8127806 FF0774C9 080C468C .F..èt...x.$....b..^.&...=F.t.=N 0000C0
64740050 30307400 4C309807 8A260A5E 880A46FF 00101266 06C7900A E8097400 .t.$..ú.f....F..^.&...=L.t==P.td 0000E0
8A260A5E C40A46FF 00011264 06C7900A E8557400 70306874 006C3000 7400683D =h.t.×l.th=p.tU$..ú.d....F.6^.&. 000100
8A260A5E 880A46FF 9048E800 20059807 8A260A5E 88407401 0F7987F6 D8889807 ...Ä-.y..tM.^.&.... .$H..F..^.&. 000120
83057465 FE83F088 C6889003 E820448D 0674010F 7984F618 7466FE83 F0889807 ...Þ.±ft.-.y..t..D $...6.Þ.±et.. 000140
8898078A 260A5EC4 90EDE80A 46FF90AA E80A4EFF AFE80002 126406C7 087567FE ±gu.ú.d...$Ê.N.$`..F.$Ú.6^.&.... 000160
880A46FF F846FE06 755E3F80 260A5E88 0A46FF12 6A06FF00 85E90374 58FE83F0 Þ.±[t.Ö....j..F..^.&.?^u.±F½.F.¡ 000180
260A5EC4 01F87680 08C4833B 245C549A 127436FF 127636FF 5098F846 8A500100 ..P.F½.P.6v..6t..T\$;.6..v½.6^.& 0001A0
3F80260A 5EC41CEB 018826F8 468A1274 3EC4D888 98078A26 0A46FF31 75503F80 .?]u1.F.&....Aá>t..F½&..$.6^.&.? 0001C0
260B7500 3F80260A 5EC40A46 FF018826 F8468A12 743EC408 8898078A 261C745D ]t.&....Aá>t..F½&...F.á^.&.?.uU& 0001E0
```

```
Dump of file SATURN:[PCCOMMON.DUMP]INSTALL.EXE;1 on 18-APR-1990 10:27:36.56
File ID (29,26,0)   End of file block 61 / Allocated 64

Virtual block number 31 (0000001F), 512 (0200) bytes

 0918E80E 00011272 06C7009E E9037469 FE83F088 C02802EB 00738805 74003F80 .7.t.¡s.Š.+â.Þ.±it.Õ..ú.r....Ô.. 000000
 9006FF12 7C0EFF12 4806FF04 752DFE83 14752BFE 8305742D FE83F088 08E4E80E .Õ8..Þ.±-t..±+u..±-u...h...|.... 000020
 83F08808 ABE80EL6 C483385E 5A609A56 125A36FF 125C36FF 12860EFF 9016E812 .Š.......6\..6Z.V.'Z^;.á..Ô..Þ. 000040
 0EFF9037 E800788E 067558FE 83057478 FE83F088 089CE80E 129006FF 387530FE ±0uß.....Ô...Þ.±xt..±Xu.ƒx.Š7... 000060
 12860EFF 18E8006F BE125E06 FF06C483 387C5A60 9A56125A 36FF125C 36FF1286 ...6\..6Z.V.'Z|;.á...^.ƒo.Š..... 000080
 00632DC6 880283E9 0375F608 00648E06 C483384D 5A609A56 125A36FF 125C36FF .6\..6Z.V.'ZM8.á.ƒd..-u.Õ...ó-c. 0000A0
 1278A312 7CA30001 88097500 12783E83 30A0A7FF 2E93C003 0248E903 76001530 =..v.ÕK..á...Î.=.>x..u.¡..È|.Èx. 0000C0
 038AE80E 50000A88 125806FF 90EFE800 01889002 0FE902C4 83028DE8 0E50C02B +âP.Ô...á.Ô...¡..Šÿ...X.¡..P.Ô¤. 0000E0
 128E1E8C 128CA312 92881284 16891282 A3127016 88126EA1 90F4E800 0888E5E8 Š|¡..Š¶.Àn...p.È......¡..È...... 000100
 89FC4689 02578826 07882612 821EC413 75101266 3E831270 1E8C126E A3128C88 ¡..Èn...p..>f..u.á...&..&.W..F=. 000120
 12643E83 02C48303 61E80E50 00108BFE 5E8CFC46 89078826 12821EC4 0DE8FE56 V±Š.á...&...F=.^±¡..P.Ôa..á..>d. 000140
 6EA3128C 88128E1E 8C128CA3 12968812 800EFF04 7500127E 3E830086 E9037402 .t.Ô...>-..u.....¡..È......¡..Èn 000160
 031AE80E 50001088 1288A312 8AA3C02B 2C753AFE 83F08807 7FE80E12 701E8C12 ...p..Ô...Þ.±:u,+âÈ..È..¡..P.Ô.. 000180
 12860EFF 90903BEB 02578926 07892612 98160812 96A11292 1688FC5E C402C483 .á.á^=....À......&..&.W.Š;...... 0001A0
 00127A3E 830163E9 03740012 803E8306 C4833054 5A609A56 125A36FF 125C36FF .6\..6Z.V.'ZT=.á..>...t.Ôc..>z.. 0001C0
 12820683 26750012 7E3E8307 89261292 A1FC5EC4 900183E9 FFFF8801 59E90374 t.ÔY.¡..Ô...á^=À..&...>-..u&.... 0001E0

Dump of file SATURN:[PCCOMMON.DUMP]INSTALL.EXE;1 on 18-APR-1990 10:27:36.56
File ID (29,26,0)   End of file block 61 / Allocated 64

Virtual block number 32 (00000020), 512 (0200) bytes

 0BE90212 6E068300 E3E90374 1012663E 83127016 89126EA3 12841688 1282A102 .À......Èn...p..>f..t.ÔÐ...n..ÔU 000000
 3E830085 E9037400 12903E83 9000C9E9 12701689 126EA312 84168812 82A19000 ..À......Èn...p.Ôè...>...t.Ô...> 000020
 8315752B FE830574 2DFE83F0 880685E8 0E06E9E8 0E000112 7206C77E 7500125E ^..u-ú.r....ÔÕ..Ôç..Þ.±-t..±+u.. 000040
 125A36FF 125C36FF 12860EFF 909017E8 129006FF 127C0EFF 126806FF 047520FE ±-u...h...|.....Š........6\..6Z. 000060
 83057478 FE83F088 0670E80E 1A7530FE 83F08806 78E80E06 C483308E 5A609A56 V.'Z.=.á..Ô(..Þ.±0u..Ôp..Þ.±xt.. 000080
 38885A60 9A56125A 36FF125C 36FF1286 0EFF125E 06FF19EB 129006FF 067558FE ±Xu.....Š...^......6\..6Z.V.'Z.8 0000A0
 30E330E3 30E3309A 309A309A 38C838A0 2CE8030B E80E90FE 32E90010 8806C483 .á.¡..Ô2±..ÔÀ.Š,.;à;.=.=.=D=D=D= 0000C0
 126C3E83 30043OE3 30E338C8 30E338BE 30E330E3 38083802 38C430E3 30E330E3 D=D=D=á;0;Ä;D=D=ƒ;D=à;D=D=.=.>l. 0000E0
 8305A8E8 0E509807 8A260A5E C42B7400 3F80260A 5EC49041 E8127A06 FF2A7500 .u°..z.ŠA.á^.&.?.t+á^.&...P.Ô¨.. 000100
 80A1FEA7 E9037500 127.3E83 0A750012 803E8311 7401FE83 1C74F608 F08802C4 á..Þ.-t..±.t..>...u..>z..u.ÔÏ±À. 000120
 7E3E83D0 7500126C 3E830E75 12800639 1260A10A 46FFFFFF 126006C7 90.*B12 .Š+.ú.'....F.À'.9...u..>l..uÀ.>- 000140
 12663E83 56570AEC 83EC8855 C85DE588 5F5E90FA 88E91260 A31280A1 0A74.12 ..tÔÀ..È'.Ô.'.^ .|)ùU.Š.Š.WV.>f. 000160
 FC468907 8826126E 1EC400EB FE5689FC 46890257 88260788 26126E1E C4137510 .u.á.n.&..&.W..F=.V±Š.á.n.&...F= 000180
 1012663E 8302126E 06831175 00127E3E 83F85689 F64689FE 5688FC46 88FE5E8C .^±.F=.V±.f-.V½.>-..u...n...>f.. 0001A0
 E9037400 12623E83 0560E80E 04750012 6A3E8308 7400067E 8302126E 06830575 u...n...-..t..>j..u..Ô'..>b..t.Ô 0001C0
 00127E3E 833974C0 080BF7C0 1801F980 C8880824 0F79848A 9026E806 7E88000Z 0..-.Š&...y.$..à.'..áYÀ.át9.>-.. 0001E0

Dump of file SATURN:[PCCOMMON.DUMP]INSTALL.EXE;1 on 18-APR-1990 10:27:36.56
File ID (29,26,0)   End of file block 61 / Allocated 64

Virtual block number 33 (00000021), 512 (0200) bytes

 FF081674 40F08804 EFE80E1F 74C00805 61E80EFC 46FF0788 26C688FC 5EC40875 u.á^=.6&...F=.Ôa..ât..Ôÿ..Þat... 000000
 904DE812 6C06FF07 75FFFE83 90C4E898 008A2612 741EC48F 7400126A 3E830974 tl.>j..t«á.t.&...Šá..±.u...l.ŠM. 000020
 2612741E C40F7400 126A3E83 23750012 7C3E832A 74001278 3E834674 00067E83 .-..tF.>x..t*.>|..u#.>j..t.á.t.& 000040
 FF125C36 FF12860E FF1574C0 08000825 E42A0F79 848A900A E8D8F7C0 18013880 .8..àYÀŠ....y.*ÔX...ât......6\.. 000060
 56390575 F64639FE 5688FC46 88217500 127E3E83 06C48340 125A609A 56125A36 6Z.V.'Z.à.á..>-..u!.F=.V±9f-u.9V 000080
 06EC83EC 8855CB5D E5885F5E 0007C626 FC5EC407 7400067E 83128006 FF1174F8 ½t.......-..t.á^=&ó..^_.|)ùU.Š.Š. 0000A0
 74001262 3E83045E E80E0475 0012723E 830141E9 03740012 583E8306 76885657 WV.v..>X..t.ÔA..>r..u..Ô^..>b..t 0000C0
 E9037400 125E3E83 00C7E903 74001290 3E8301A0 E90184E9 03740012 7E3E8300 ..>-..t.ÔÇ.Ô...>...t.Ôú..>^..t.Ô 0000E0
 0EFF1268 06FF0475 2DFF8300 80E90374 28FF8308 742DFF83 F8880402 E80E0080 §..Ô...½..-t...+t.Ô¯...-u...h... 000100
 9A501288 88500380 0E7D38FF 834F7508 FE830082 E9F82800 30889000 9AE9127C |.Ô...¡0.+½Ô...±.uO..8).¯.P¡..P. 000120
 06C48340 C45A609A 57125A36 FF125C36 FF12860E FF1574FF FF8367E8 402860FA ''+âŠg...t......6\..6Z.W.'Zâa.á. 000140
 E9128A16 891288A3 0AF70002 8308F712 8A168812 88A10082 E9037500 12683E83 .>h..u.Ôÿ.À......YÀ.0.YÔÈ......Ô 000160
 16131288 0603F875 C9FED2D1 E0D10281 128A1688 1288A180 74040F79 85F6009A ..-.y..t§À......Ÿ.ÌÀÌ0±èu½...... 000180
 0E125E06 FF128A16 11128806 0199C788 30EF8312 8A168912 88A3D2D1 E001128A ..ÌÀÌ0È.......y0.ú..........^.. 0001A0
 E9037580 0F7985F6 FF6EE903 75FFFF83 FF76E903 75C00803 A9E80EF8 880345E8 ÔE..½.Ô`..âu.Ôv....u.Ôn.-.y..u.Ô 0001C0
 20C78303 74010F79 85F63C9C 60FA9A50 12888850 0480FF44 E9037410 FE83FF64 d..±.t.ÔD.¯.P¡..P.''.<-.y..t..ú 0001E0
```

```
Dump of file SATURN:[PCCOMMON.DUMP]INSTALL.EXE;1 on 18-APR-1990 10:27:36.56
File ID (29,26,0)   End of file block 61 / Allocated 64

Virtual block number 34 (00000022), 512 (0200) bytes

 127E3E83 0000128A 06C71288 A31286A1 FF19E900 57B8FF1C E9037502 0F7985F6 -.y..u.Õ..¡W.Õ..À..È..ú......>~. 000000
 26078826 126E1EC4 14751012 663E835D 74001258 3E830775 00125E3E 837C7500 .u|.>^..u..>X..t].>f..u.á.n.&..& 000020
 14750212 643E83FE 5E8CFC46 89078826 126E1EC4 900EEBFE 5689FC46 8902578B .W..F=.V±Š..á.n.&...F=.^±.>d..u. 000040
 583E8307 89261288 A1FC5EC4 900AEB02 57892607 8926128A 16881288 A1FC5EC4 á^=À......&..&.W.Š..á^=À..&...>X 000060
 5E02126E 06830575 1012663E 8302126E 0683127E 06FF04EB 128006FF 06750012 ..u.....Š...~...n...>f..u...n..^ 000080
 3E830E74 0012623E 830281E8 0E0000F6 46C75657 52EC83EC 885590C8 5DE5885F _.Î]ù.U.Š.ŠRWVúF~...Õ...>b..t..> 0000A0
 805689AE 46890040 05028CFA 568CF846 8984468D 9001C4E9 010BE903 7400127E ~..t.ÕÁ.Õá...FÇ.F½.V°.@.a..FÛ.V¯ 0000C0
 078826C6 8BF846FF F85EC40B 7520FE83 1A7520FE 83057428 FE83F088 0224E80E .Õ$..Þ.±+t..±-u..±-u.á^½.F½.ó&.. 0000E0
 8BF85EC4 471E73F8 46398056 8BAE4688 901EEBF6 7E8BF088 0200E80E 127C0EFF ..|..Õ...Þ.--Š...FÛ.V¯9F½s.Gá^½. 000100
 752EFE83 F67E8907 75C00802 C4830174 E80E56F0 880100E8 0EF846FF 078826C6 ó&...F½.Õï..ÞV.Õt..á..áu±.~~.±.u 000120
 E8078826 C68BF846 FFF85EC4 3A73F846 39805688 AE468845 74C00802 2DE80E4D M.Õ-..átE.FÛ.V¯9F½s:á^½.F½.ó&..Š 000140
 56F08801 8BE80EF8 46FF0788 26C68BF8 5EC4471E 73F84639 805688AE 46889018 ...FÛ.V¯9F½s.Gá^½.ó&...F½.Õ...ÞV 000160
 7545FE83 057465FE 830085E9 037500F6 7E83F67E 890775C0 0802C483 0122E80E .Õ"..á..áu±.--.--.u.Õ...±et..±Eu 000180
 0E078826 C68BF846 FFF85EC4 6873F846 39805688 AE468873 74C00801 CDE80E7B (.Õe..âts.FÛ.V¯9F½shá^½.F½.ó&... 0001A0
 8BAE4688 2E7520FE 833974C0 08019FE8 0E417528 FE830574 20FE83F0 8B0145E8 ÕE..Þ.±-t..±+uA.Õ...át9.±-u..FÛ. 0001C0
 C41D73F8 46398056 8BAE4688 16E80788 26C68BF8 46FFF85E C42373F8 46398056 V¯9F½s#á^½.F½.ó&..Š..FÛ.V¯9F½s.á 0001E0
```

```
Dump of file SATURN:[PCCOMMON.DUMP]INSTALL.EXE;1 on 18-APR-1990 10:27:36.56
File ID (29,26,0)   End of file block 61 / Allocated 64

Virtual block number 35 (00000023), 512 (0200) bytes

 12860EFF D875C00B 02C48300 91E80E56 F08800FA E80EF846 FF078826 C68BF85E ^½.ó&...F½.Õ°..ÞV.Õ...á..âuÁ.... 000000
 5EC45174 00F67E83 68750012 7E3E8306 C48343CA 5A609A56 125A36FF 125C36FF .6\..6Z.V.'ZòC.á..>~..uh.~~.tQá^ 000020
 900EEBFE 5689FC46 8902578B 26078826 126E1EC4 14751012 663E8300 07C626F8 ¥&ó...>f..u.á.n.&..&.W..F=.V±Š.. 000040
 8E500002 251264A1 FC76FFFE 76FF5016 84468DFE 5E8CFC46 89078826 126E1EC4 á.n.&...F=.^±.FÇ.P.v±.v=Ád.%..P. 000060
 02126E06 83057510 12663E83 02126E06 83128006 FF0AC483 0F661EFF 2610E206 .ã.&..f..á.......n...>f..u...n.. 000080
 74C00800 B5E80E00 74040F79 87F6065E 8B1774FF 067E83EC 8B55CB5D E58B5F5E ^_.Î]ìW.Š.~..t..^.~.y..t..Õç..ât 0000A0
 22E8C028 04750676 38F08800 33E80E56 02EC83EC 8B55CB5D C02802E8 0001B805 .Ī..Š.+à]ìW.Š.Š.V.Õ3..Þ;v.u.+âŠ" 0000C0
 8806C483 44005A60 9A56125A 36FF125C 36FF1286 0EFF18EB FFFFB805 75FFFE83 .±.u.¡..Š......6\..6Z.V.'Z.D.á.¡ 0000E0
 478E2607 FF263788 26117804 4FFF2612 5A1EC412 8606FF56 90CB5DE5 8B5E0001 ..^.Î]ù.V....á.Z.&.O.x.&.7&..&.G 000100
 0E5602EC 83EC8855 90CB5E04 C4834438 32849A53 125C36FF 0DEBE42A 048A2602 .&..*óŠ..6\.S..28D.á.^ù.U.Š.Š.V. 000120
 125C36FF 12860EFF 9016EB12 6C06FF07 75FFFE83 F375080F 7984F6F0 8BFFC5E8 Õé..Þ~.y..uæ.±.u...l.Š.......6\. 000140
 3E8310E8 0001B805 75001278 3E83CB50 E5885E06 C4833F57 5A609A56 125A36FF .6Z.V.'ZW?.á.^.Î]ù.>x..u.¡..Š..> 000160
 C6A312CC 8842FC2D E89A000A 8BEC8B55 90CBC028 90EEEB12 7C0EFF07 7E00127C |..~...|.ŠY.+àù.U.Š¡...Õ-=B¡ä.Èó 000180
 C7129E16 89129CA3 08568806 46881288 16891286 A310568B 0E468B12 C81E8C12 ...à..F..V.ÈÑ...¡..F..V.È......ú 0001A0
 A3C02800 0112C406 C7031BE9 037425F6 7E80039D E9000012 C006C700 0012C206 .ô...ú.à...Õ...--%t.Õ..ú.á...+àÈ 0001C0
 0020142C 06C71284 A3129AA3 12A0A312 BAA3128C A312A4A3 128EA312 A2A312A6 |.ÈÀ.È/.ÈÈ.È¥.Èo.È..È..ÈÇ.ú.,. . 0001E0
```

```
Dump of file SATURN:[PCCOMMON.DUMP]INSTALL.EXE;1 on 18-APR-1990 10:27:36.56
File ID (29,26,0) · End of file block 61 / Allocated 64

Virtual block number 36 (00000024), 512 (0200) bytes

 FF0D7528 3F80260A 5E88903E EB003014 2C06C70A 46FF4975 30017F80 260A5EC4 á^.&...0uI.F.ú.,.0.Š>..^.&.?+u.. 000000
 9014EB12 BA06FF1A 750012A6 3E830E75 203F8026 9028EB00 00128A06 C712A606 .Î.ú.¤...Š(.&.? u..>Î..u...¤.Š.. 000020
 E80E5098 078A260A 5E880A46 FF128406 FFC7752D 3F80260A 5EC400EB 129A06FF ....Š.á^.&.?-uú..Ç..F..^.&...P.Õ 000040
 56890A46 8908C483 08F2E80E 501E12CA B80A76FF 0C76FFDD 75C00802 C48309AA `..á..âui.v..v.¡ò..P.Õ·..á..F..V 000060
 30142C3E 83007400 12843E83 12CAA308 F712CAA1 128406FF 0C7D0012 CA3E830C ..>ò..)...Ç.Àò.%ÀÈò..>Ç..t..>,.0 000080
 1E12C488 0A76FF06 0A46FF12 BC06FF2E 752E3F80 260A5EC4 0020142C 06C70675 u.ú.,  .á^.&.?.u...¥..F...v.¡á.. 0000A0
 C412BC0E FF000112 C406C70A 7D0012C4 3E830C56 890A4689 08C48308 A5E80E50 P.ÕE..á..F..V..>á..).ú.á.....¥.á 0000C0
 000212A4 06C70675 006C3028 7400683D 4074004E 303D7400 46309807 8A260A5E ^.&...=F.t==N.t@=h.t+=l.u.ú.È... 0000E0
 90025CE9 1C75003F 80260A5E C40A46FF 03754C3F 80260A5E C4097500 12A43E83 .>È..u.á^.&.?Lu..F.á^.&.?.u.Õ\.. 000100
 30F84689 98078A26 C8E80008 12A406C7 D0E80010 12A406C7 D8E80001 12A406C7 ú.È...ŠÀú.È...ŠÀú.È...Š&&....F½= 000120
 037E7874 00693DF8 468820F8 468312A2 06FF0875 00583005 7400473D 0A740045 E.t.=G.t.=X.u...Å..F½ .F½=i.tx~. 000140
 12A43E83 900167E9 014CE903 7500253D 0160E903 7E0149E9 03750063 3D019FE9 Õ..=c.u.ÕI.-.Õ'.=%.u.ÕL.Õg...>È. 000160
 A11FC426 12861EC4 00E80000 0247C726 07892612 C0A11FC4 2612861E C4157502 .u.á.Ñ.&á.Àà.&..&úG...Š.á.Ñ.&á.À 000180
 1EC401CB E9037400 12C03E83 017EE903 750012C2 3E830412 86068307 892612C0 à.&....Ñ...>ò..u.Õ~..>à..t.Õù.á. 0001A0
 50000AB8 0000129A 06C712BE 06FF01BA E9FFFFB8 01BDE903 75200A47 F626129C ..&-G. u.Õ§.¡..Õ¤.../.ú.....¡..P 0001C0
 12C406C7 12BC06FF 12A206FF 12A006FF 90F0E800 088890C1 E802C483 01ACE80E .Õ¯..á.Šè.¡..Šp.......À...¥.ú.á. 0001E0
```

```
Dump of file SATURN:[PCCOMMON.DUMP]INSTALL.EXE;1 on 18-APR-1990 10:27:36.56
File ID (29,26,0)   End of file block 61 / Allocated 64

Virtual block number 37 (00000025), 512 (0200) bytes

 7412CA06 39FA4689 12A4A3C0 2B7E7401 12A43E83 0085E903 750812A4 3E830004 ...>Ê..u.Õ...>Ê..t-+âÈÊ..F°9.ò.t 000000
 12CAA105 12CA2EF3 909013EB 000012CA 06C70A74 0012B43E 83FA4689 12CAA128 (Àò..F°.>Ç..t.ú.ò...Š.....ò..Àò. 000020
 A1E80E50 003A8802 C483013A E80E5000 10880212 86068312 CAA3C02B 027DC00B .à).+âÊò...Ñ..¡..P.Ò:..á.¡:.P.ÒÀ 000040
 C028027D C00812CA A300052D FA468815 740012B4 3E832274 00FA7E83 02C48304 ..á..-°.t".>Ç..t..F°-..Êò..à).+à 000060
 12B60683 02C48300 F7E80E50 00108804 12B62E83 000012CA 06C79007 EB12CAA3 Êò.Š..ú.ò.....Ñ..¡..P.Ò%..á...Ñ. 000080
 55E80EF8 76FF90F3 E80001B8 FF30E902 77E80E50 C028FF35 E9001088 FF06E902 .Õ..¡..Õ5.+âP.Òw.ÒO.¡..Šµ..v½.ÒU 0000A0
 00673005 7C00653D FEFEE903 7500643D 90FF15E9 0436E80E 500025B8 FF20E903 .Õ .¡%.P.Ò6.Õ...=d.u.Õ±±=e.|.=g. 0000C0
 EBFE5689 FC468940 0C5688OA 46880A4E FF0C5688 0A468809 740012A4 3E83D87E ~Á.>Ê..t..F..V..N..F..V.@.F=.V±Š 0000E0
 3D887400 733DFE06 E9037500 703DFE08 E9037500 6F3DFE72 E9037500 6E30903A :.=n.u.Õr±=o.u.ÕÀ±=p.u.Õw±=s.t.= 000100
 8A26FC5E C4FC46FF 9034E80A 46FF9081 EBFF75E9 03750078 30FEABE9 03750075 u.u.Õ¨±=x.u.Õu.ŠŸ..F.Š4..F=á^=&. 000120
 8806C483 045EE80E 0A76FF0C 76FF500A 462BC388 EC75253C 0474C00A F6468807 ..F-.ât.<Xuš.ù+F.P.v..v..Ò^..á.. 000140
 26129C1E C4FC53E9 0374C00A F6468807 8A260A5E C40C5689 0A4689FE 5688FC46 F=.V±.F..V.á^.&...F-.ât.ÒS=á...& 000160
 C7067400 12BC3E83 565712EC 83EC8855 CB5DE588 12C0A1FE 43E90374 200A47F6 -G. t.ÒC±Àà..|]ùW.š.š.WV.>¥..t.ú 000180
 B61EC419 751012A4 3E830774 0212A43E 8312BE06 FF04740A 067E8300 20142C06 .,. ..~..t.../..>Ê..t..>Ê..u.á.Ñ 0001A0
 B61EC411 740012BE 3E83902C E8041286 0683FE56 89FC4689 02578826 07882612 .&..&.W..F=.V±..Ñ..Š,..>/..t.á.Ñ 0001C0
 12B60683 FE5689FC 46899907 88261286 1EC40EEB 0000FE46 C7FC4689 07882612 .&...F=úF±..Š.á.Ñ.&....F=.V±..Ñ. 0001E0

Dump of file SATURN:[PCCOMMON.DUMP]INSTALL.EXE;1 on 18-APR-1990 10:27:36.56
File ID (29,26,0)   End of file block 61 / Allocated 64

Virtual block number 38 (00000026), 512 (0200) bytes

 168812C6 A1142AA3 C0289003 E806468B 0674FE46 08FC468B 0E740012 9A3E8302 ..>...t..F=.F±t..F.Š..+âÊ°.Àó... 000000
 46FFF25E C41D750A 067E832B 7D00FE7E 83317500 128E3E83 F45689F2 468912C8 à..F·.V¶.>/..ul.-±.)+.-..u.á^·.F 000020
 9006E800 01F646C7 FE5689FC 46890AF7 00D283D8 F7FE5688 FC46882D 07C626F2 ·&ó.·.F=.V±¼À.@.¼Ò.F=.V±úF-..Š.. 000040
 C4834961 587C9AFC 76FFFE76 FF501E06 76FFFA5E 8CF84689 12A88800 00F646C7 úF-..¡·..F½.^°.v..P.v±.v=.|[a].á 000060
 08F04E89 C82812C4 0E8804C4 83446923 5A9AF876 FFFA76FF 45740012 BC3E830A ..>¥..tE.v°.v½.Z#iD.á...á.+à.NÞ. 000080
 49C18847 3005C626 05EBF27E C4F04E88 0000142A 06C70675 08142A3E 83007EC9 è-..>°..u.ú.°....NÞá-·Š.&ó.OG.èl 0000A0
 08048807 8A26F85E C4F276C5 EE5E8C12 A20E88F0 4E89F446 8CF27E89 F47FC008 .á.¶.-·.F¶.NÞ..Å..^Ÿév·á^½&..... 0000C0
 8E3E83EE 5E8EF45E 8CF27689 E375003F 8026F846 FF46202C 80037C61 3C0774C9 èt.<a|..., F.F½&.?.uÒ.v·.^¶.^Ÿ.>/ 0000E0
 830311E8 0E50C028 02E80001 88057500 F67E8308 7412BA06 0812A6A1 14750012 ..u.À|...¤.t..--.u.¡..Š.+âP.Ò... 000100
 12881688 1286A100 018E1874 00067E83 565710EC 83EC8855 CB5DE588 5F5E02C4 á.^_.|]ùW.š.š.WV.-..t./..ÀÑ...¡. 000120
 02578826 07882612 861EC413 740812A4 3E83008F E9021286 0683FA56 89F84689 .F½.V°..Ñ..Ò...>Ê..t.á.Ñ.&..&.W. 000140
 A43E8304 12860683 FA5E8CF8 4689FC46 89078826 12861EC4 10EBFA56 89F84689 .F½.V°Š.á.Ñ.&...F=.F½.^°..Ñ...>Ê 000160
 5E8CF846 890F3888 097500FC 7E83900A E80F3488 1575FA46 08F84688 0E740812 ..t..F½.F°u.¡4.Š...-=.u.¡;..F½.^ 000180
 FFF25EC4 900EEB12 C40E881C 7412BC36 39F62BF4 5689F246 89FA5688 F84688FA °.F½.V°.F .V¶+-96¥.t...á.Š..á^·. 0001A0
 CA3E88F3 75003F80 26F246FF F25EC446 90EDEB10 7ECE3846 1574003F 8026F246 F·&.?.t.F;ó-.ŠÚ.Fá^·.F·&.?.uµ.>ò 0001C0
 06C48301 8DE80EF8 76FFFA76 FF5602C4 83015FE8 0E570875 0012B43E 83FE2B12 .+±.>Ç..u.W.Ò_..á.V.v°.v½.Ò§..á. 0001E0

Dump of file SATURN:[PCCOMMON.DUMP]INSTALL.EXE;1 on 18-APR-1990 10:27:36.56
File ID (29,26,0)   End of file block 61 / Allocated 64

Virtual block number 39 (00000027), 512 (0200) bytes

 8812B6A1 06EC83E( 885590CB 5DE5885F 5E02C483 0142E80E 57087400 12B43E83 .>Ç..t.W.ÒB..á.^_.|]ù.U.š.š.ÀÑ.. 000000
 83FA4688 C02A900> ¿B018005 7547067E 83067467 067E83FE 5689FC46 89128816 .¡..F=.V±.-.gt..-.Gu.¯.Š..°à.F°. 000020
 FF000112 C406C706 750012C4 3E830074 00FA7E80 000612C4 06C70675 0012BC3E >¥..u.ú.á....-°.t..>á..u.ú.á.... 000040
 5E1EFF26 10E4068E FC76FFFE 76FF12C6 36FF12C8 36FF0676 FF12C436 FF12A236 6Å..6á..v..6à..66..v±.v=..Ò.&..^ 000060
 1EFF2610 E4068E12 C636FF12 C836FF14 7500129A 3E831874 00FA7E80 0EC4830F ..á..-°.t..>...u..6à..66...Ò.&.. 000080
 2610E406 8E12C636 FF12C836 FF147500 12C43E83 18740012 9A3E8304 C4830F62 b..á..>...t..>á..u..6à..66...Ò.& 0000A0
 76FFFE76 FF1B7412 8A060812 A6A10000 142A06C7 08128606 8304C483 0F6A1EFF ..j..á...Ñ..ú.°...Àl...¤.t..v±.v 0000C0
 50E58801 33E80E50 C02802E8 00018805 74C00804 C4830F6E 1EFF2610 E4068EFC =..Ò.&..n..á..ât.¡..Š.+âP.Ò3..|) 0000E0
 07FF2637 88260646 8A157804 4FFF2612 9C1EC430 750012C2 3E83S6EC 885590CB ù.U.$V.>ó..u=á...&.O.x..F.&.7&.. 000100
 FF077540 06C4834C 4533809A 0676FF53 129E36FF 9011EBE4 2A048826 02478E26 &.G.&..°òŠ...6..S.v...3EL.á.@u.. 000120
 06768857 750012C2 3E835657 02EC83EC 885590CB 505E12C0 06FF9005 EB12C206 .ó.Š....á.^]ù.U.š.š.WV.>ó..uW.v. 000140
 C206FF04 754006C4 834C8133 809A142C 36FF129C 36FF129E 36FF18EB 507EF608 .--PŠ..6...6...6,...3ŸL.á.@u...ô 000160
 2602478E 2607FF26 3F882614 2CA00478 044FFF26 129C1EC4 1E7EC00B 4EC68812 ..6N.à-.á...&.O.xâ.,.&.7&..&.G.& 000180
 02EC83EC 8855CB5D E5885F5E 12C00601 06468807 750012C2 3E8304EB E42A0588 ..°òŠâ.>ó..u..F...à.^_.|]ùW.š.š. 0001A0
 809A5098 078A2606 5EC4129C 36FF129E 36FF22EB 5E750012 C23E830A 76885657 WV.v..>ó..u^Š".6...6.¯á^.&...P.. 0001C0
 78044FFF 26129C1E C42574C0 084EC688 0646FF12 C206FF04 754006C4 834D2733 3'M.á.@u...ó..F..6N.ât%á...&.O.x 0001E0
```

Dump of file SATURN:[PCCOMMON.DUMP]INSTALL.EXE;1 on 18-APR-1990 10:27:36.56
File ID (29,26,0)   End of file block 61 / Allocated 64

Virtual block number 40 (00000028), 512 (0200) bytes

```
12C23E83 CAEBE42A 05882602 478E2607 FF263F88 26129C1E C4078A26 065EC4CD èá^.&..á...&.?&..&.G.&..*ôŠò.>ô. 000000
468912C8 168812C6 A1560CEC 83EC8855 CB5DE58B 5F5E12C0 06010A46 88077500 .u..F...á.^_.Ì]ùU.$.$.VÀó...à..F 000020
2BF84689 04C48349 4C235A9A F476FF52 12CA368B FA4689FC 4689C02B F65689F4 ¶.V-+à.F=.F¯.6ò.R.v¶.Z#LI.á..F½+ 000040
C4227500 12843_83 4E017508 142A3E83 08EB02EE 83057510 142A3E83 067628F0 Þ+v..>*..u..Ý.Š..>*..u.N.>Ç..u"á 000060
4EFF02C4 83FE67E8 0E509807 8A26F446 FF127530 142C3E83 1975203F 8026F45E ^¶&.?-u..>,.0u..F¶&...P.Ògt.á..N 000080
0068E80E FA46FF07 7400067E 831B7400 12843E83 077EF608 08743014 2C3E83F8 ½.>,.0t..--..>Ç..t..-..t..F*.Òh. 0000A0
067E8302 C483FE74 E80E5629 75001284 3E830072 E80EFC46 FF077400 142A3E83 .>*..t..f•.Òr..>Ç..u)V.Òt±.á..-. 0000C0
76FF0042 E80E0475 00FC7E83 0A740014 2A3E8300 38E80E04 7500FA7E 830A7400 .t..-*.u..Ò;..>*..t..-•.u..ÒB..v 0000E0
FE2EE80E 56002014 2C06C70E 74001284 3E8306C4 83FEAFE8 0EF476FF F676FFF8 ½.v-.v¶.Ò£±.á..>Ç..t.ú.,. .V.Ò.± 000100
CB02C483 FDC6E80E 50002088 03E80028 88057400 12A63E83 CB5DE588 5E02C483 .á.^.Ì]ù.>Ì..t.¡+.Š.| .P.Òó».á.ù 000120
788803EB 00588805 740012A2 3E831775 10142A3E 8302C483 FD8AE80E 50003088 ¡0.P.Òo».á..>*..u..>À..t.¡X.Š.¡x 000140
12752A3F 80260A5E C40001FE 46C75657 06EC83EC 8855C802 C483FD9C E80E5000 .P.Ò.».á.ùU.$.$.WVúF±..á^.&.?*u. 000160
FFFFFE46 C7087520 3F80260A 5EC49061 EB0A46FF 0212B606 83378826 12B61EC4 á.Ñ.&.7..Ñ...F.Ša.á^.&.?-u.úF±.. 000180
0675303C 0A75128C 36393C7F 393C407C 303CFA46 88078A26 0A5E8BF6 280A46FF .F.+-.^.&...F*<0|a<9.<96¥.u.<0u. 0001A0
C803E1D1 CE03E1D1 E1D1CE88 98058A26 1C7F393D 802606EB F8880030 142C06C7 ú.,.0..«Š.&.=9..&....oïÃÌÃ.oïÃ.à 0001C0
88378926 065EC4F0 88EEF7FE 46880C46 8C0A7E89 DE7D3030 802647F1 8830E983 .ÒÒ.þG&.=0)ß.-..F..F±¼Ý.Þá^.&.7. 0001E0
```

Dump of file SATURN:[PCCOMMON.DUMP]INSTALL.EXE;1 on 18-APR-1990 10:27:36.56
File ID (29,26,0)   End of file block 61 / Allocated 64

Virtual block number 41 (00000029), 512 (0200) bytes

```
C4064E8A FE5E8CFC 46890F42 885704EC 83EC8855 90CB5DE5 885F5E0C 56880A46 F..V.^_.Ì]ù.U.$.$.W¡B..F•.^±.N.á 000000
8CFC7E89 9009E8FE 468CFC7E 89000188 F4750038 26117400 30802647 01E8FC7E ~•Š.G&¯.=.t.&8.u¶¡...~•.F±Š...~•. 000020
0A47F626 FC5EC4FE 5E8CFC46 89004E88 04EC83EC 885590C8 5DE5885F C028FE46 F±+à_.Ì]ù.U.$.$.¡N..F•.^±á^•&-G. 000040
47C62602 57892607 89260857 89260647 8926990A 47882604 478926C0 28257583 .uX+ã&.G.&.G..&.G.&.W.&..&.W.&6G 000060
8899C028 8D750E88 1638C375 0E860638 0CFC4683 C28CC388 17E8C28C C388FF08 ...ù.òŠ..ù.ò.F•.;.Ñ.uù;.¡.u§+â.. 000080
D808065E 88EC8855 F9E8C033 C8515208 F7C42807 73C4380F 26A15A59 90CB50E5 Ì]ù.YZÀ&.;ás.+á¼ÀRQù3áŠ*U.$.^..Ù 0000A0
750173E8 00058807 1E297500 3F830F4A 885756EC 8855C85D E58801FE 4F800474 t..0±..Ì]ùU.$VWEJ..?.u)..¡.. Òs.u 0000C0
0F503689 FFFEFE44 C704C683 000104C7 960F4CA3 0F4AA3FE 244024E8 99C03305 .3á.Š$a$±ÈJ.ÈL..ú....ó.úD±±..6P. 0000E0
778BF273 EEF983°E E180FA74 4100CEE9 CB5DE588 5E5F0009 E8C08ED8 8C064E88 .N..Á.àÒ.._^.Ì]ùÒó.At*.Ã±.*Ýs·.w 000100
4489F788 000205' ' 03347401 A8ADF003 00881573 C1384842 7401A8FE 88ADFC02 .•Ù.±´.tBH;ès..Å.ÞÙ´.t4.ô....%.D 000120
D138D18C DA8CC688 FE4CFEF9 0305E805 8948C128 FE4C89F9 030C74FE 88E6EBFE ±ŠÌ.±t..*.L±+èH..Š..*±L±.6.Ö.Ì;Ì 000140
88F27401 A8ADF003 FE882574 FFFE3002 0F5C06C6 26C3027F 890F581E 8C260574 t.&..X....ù&6.\..=±.t%.±.ÞÙ´.t·. 000160
C0080847 88E6EBFE 4489F788 000205C2 03E27401 A8ADF003 D0888073 C13848FE ±H;ès§.Å.ÞÙ´.tã.ô....¥.D±ŠÌ.G..ã 000180
77888CE8 37880F54 1E8E2605 74C73807 8CD88C11 740F5C0E FE2614E8 D88E0474 t..AŠ.&±.\.t..Ã.a;ùt.&..Ì..7Š¥.w 0001A0
E84E4E96 0574001C E8FE4DFE 0D74005E E8984040 01240D74 C638006A E8C03306 .3àÒj.;6t.$.aa.Ò^.t.±M±Ò..t..NNŠ 0001C0
C8280374 01A8FE45 8851C399 C0330247 8907880F 58A32604 74C138D1 8CD88C99 ..A.Ì;èt.&ÈX....G.3à.ÙQ.E±´.t.+à 0001E0
```

Dump of file SATURN:[PCCOMMON.DUMP]INSTALL.EXE;1 on 18-APR-1990 10:27:36.56
File ID (29,26,0)   End of file block 61 / Allocated 64

Virtual block number 42 (0000002A), 512 (0200) bytes

```
28C22302 F70072C2 031572C6 03C188F5 75EAD104 760F5A16 38267FFF 8A414149 IAAo..&;.Z.v.iõuX.è.ór..ór.X0#ô+ 000000
44C7F203 F08BFE8B 57187400 1DE85152 C359C033 E575EAD1 D2F70875 000CE8C6 6Ò..u.X0iõuI3àYúRQÒ..t.W.±.Þ.·úÒ 000020
1F065000 01885052 521ED233 5053C35A 5958FE55 894AD728 D6880677 89FFFEFE ±±..w..ø+•J.U±XYZúSP30.RRP¡..P.. 000040
3875000A 7E830657 56EC8855 00C30208 0274585A 1FFFFA83 08C4834C 0751449A .DQ.L.á..*..Z(t..0ù.U.$VW..-..uß 000060
44880074 F7381174 480CE636 884CE827 720057E8 07754806 46880856 8808E68F «Ì..V..F.Hu.ÒW.r'ŠL.6Ì.Ht.;%t..D 000080
885021E8 99FFFF88 06750208 04730CE6 FE8104C6 8334735E 003EE856 0E468902 ..F.VÒ>.^s4.6..±Ì.s..0u.¡...ŠIP. 0000A0
07C03303 880CE636 89025C89 1489E675 C085F958 000017D3 9A50C033 501652C4 áR.P3áP.Æ...(*.àuÌ...\..6Ì..Æ3à. 0000C0
1C030A88 2CE8F9F2 750CE6FE 8104C683 0C74024C 39F7880E 4E88C85D E5885E5F _^.Ì]ù.N..%9L.t..ó..±Ì.u·*Š,.Ö.. 0000E0
890475F7 38DE75C0 850000FF FF9A5153 137308E0 1E390675 F738C18E 03882672 r&.Æ.è;%u.9.À.s.SQ.....àu8;%u.. 000100
C00AAC0C E30E4E88 DF880A76 C5067EC4 1E5657EC 885500C3 D1880487 9208E016 .Á.....ìù.U.$WV.á-.év..Ò.N.D.¯.á 000120
46880C4E 88018357 56EC8855 CB5DE588 5F5E1FC2 8CC388AA F3C032F8 E2AA0374 t.´â½2àµ´.ù.ò.^_.Ì]ùU.$VW*..N..F 000140
46890041 1688003F A15606EC 83EC8855 0A69E908 7EC51E99 01750AF9 83D23306 .30.*.u...é-.Òi¯U.&.&.VÀ?...A..F 000160
F08804C4 83528E23 5A9A0676 FF0876FF 6E740846 08064688 7674C208 FC5689FA *.V•.ótv.F..F.tn.v..v..Z#.R.á..Þ 000180
52B7235A 9A37FF26 0277FF26 4A740247 08260788 26FA5EC4 04FA4683 909006E8 Š....F*.á^*&..&.G.tJ&.w.&.7.Z#ñR 0001A0
77FF26FA 5EC40676 FF0876FF 56017530 3880261F C426FA5E C4DD7EC6 3804C483 .á.;ó-Ìá^*&á.&.8=uiV.v..v.á^*&.w 0001C0
C0289004 E8C28C01 408D1FC4 26FA5EC4 8475C008 0AC48351 3358409A 37FF2602 .&.7.a(3Q.á..àuÇà^*&á..a..òŠ..+â 0001E0
```

Dump of file SATURN:[PCCOMMON.DUMP]INSTALL.EXE;1 on 18-APR-1990 10:27:36.56
File ID (29,26,0) End of file block 61 / Allocated 64

Virtual block number 43 (0000002B), 512 (0200) bytes

```
0575FFFF 8BC0080C 00FFFF9A 50485000 01B85016 06468DEC 8B55C85D E5B85E99 .^.[]ùU.$.F..P¡..PHP......å¡..u. 000000
530853C9 53C953C1 53C953C9 53C953C9 53C953C1 53C953C9 00CB5000 8406468A .F.Ç.]ù.èSèSèSèSèSèSèSèSèSèSèSÁS 000020
23CDF809 75000230 0E750000 0C3E8006 468804EC 83EC8855 53C953C9 53085308 ÄSASèSèSU.&.&..F..>...u.=..u.¥e# 000040
47882672 52692A7A 9AD8332F 7410BE1E 0B108C1E 880A7500 083D21CD 4C843F73 s?ÇLel=..u...¥.../.t/3Ü.z°iRr&.G 000060
04A7FF2E 52F8A7FF 2E057500 000C3E80 C033E301 D9881D75 C0081874 00013D04 .=..t..àu..]]D3à.>...u...I½R..I. 000080
5506FE56 89FC4689 02578807 88F17400 03300574 00000C3E 80905CE8 9065E853 S$e.S\..>...t.=..tþ...W..F=.V±.U 0000A0
8C889004 E8024789 07890447 890E7500 000C3E80 127408F9 83064E88 C0335657 WV3à.N..°.t..>...u..G....G.S..¡. 0000C0
1AE99A50 00038810 C41EFF36 008CB890 18E8075D 5F5E04C4 83FC5EFF FC515000 .PQ=.^=.6.^ ].S..¡..6..á.¡..P.Ö. 0000E0
540F2DE8 9A0014B8 D88E1EEC 88554590 581ECB5D E588C033 9003E8FF FFB8534A JS¡..S..3à.T]ù.X.EU.$..Ä¡...Ö-.T 000100
285D009A 0C76FF0E 76FF1076 FF1276FF 5016EE46 8D5016F2 46800876 FF0A76FF .v..v..F·.P.FŸ.P.v..v..v..v...]+ 000120
06C48354 435BC89A 0876FF0A 76FF5000 5CB89001 73E9FFFF 88077540 14C48354 T.á.àu.¡..Ös..¡\.P.v..v..à[CT.á. 000140
C208F856 89F64689 06C48354 8E5BC89A 0876FF0A 76FF5000 2F88FC56 89FA4689 .F°.V=¡/.P.v..v..à[.T.á..F-.V½.ô 000160
FC568BFA 46880874 FC4608FA 468819E8 0A568808 46882775 FC4608FA 46881075 u..F°.F=u'.F..V.S..F°.F=t..F°.V= 000180
54AF2810 9AFA76FF FC76FF50 002E88FC 5689FA46 89F85688 F64688OC 76F64639 9F-v..F-.V½.F°.V=¡..P.v=.v°..(£T 0001A0
C3606C9A 0676FF08 76FF0A76 FFEE76FF F076FFF2 76FFF476 FF237400 0806C483 .á..At#.v¶.v·.vÞ.vŸ.v..v..v..l'ù 0001C0
F521F99A 50000505 04C48354 CF235A9A 0876FF0A 76FF0087 E9EC4689 0EC48354 T.á..FšÒñ..v..v..Z#uT.á....P.°I% 0001E0
```

Dump of file SATURN:[PCCOMMON.DUMP]INSTALL.EXE;1 on 18-APR-1990 10:27:36.56
File ID (29,26,0) End of file block 61 / Allocated 64

Virtual block number 44 (0000002C), 512 (0200) bytes

```
FFFC76FF 0876FF0A 76FF008B E9FFFFEC 46C70875 000BFC56 89FA4689 02C48354 T.á..F°.V=.Åu.úF$..Ö...v..v..v=. 000000
50C02808 C4835519 22849AFA 76FFFC76 FF501E10 7AB808C4 83550822 FA9AFA76 v°.°".U.á.¡z..P.v=.v°.Ç".U.á.+àP 000020
76FFFC76 FF50002E 88501E10 7FB82174 C00B06C4 8355342C 929AFA76 FFFC76FF .v=.v°..,4U.á..àt!¡...P¡..P.v=.v 000040
FFEE76FF F076FFF2 76FFF476 FF08C483 555822FA 9A505206 C483553E 58C89AFA °.à[>U.á.RP.°"[U.á..v¶.v·.vÞ.vŸ. 000060
C483557A 21E49AFA 76FFFC76 FFEC4689 0EC48355 6C606C9A 0676FFFA 76FFFC76 v=.v°.v..l'lU.á..F$.v=.v°.ÖlzU.á 000080
EC468804 C48353D0 21E49AF2 76FFF476 FF04C483 558821E4 9AEE76FF F076FF04 ..vÞ.vŸ.Öl.U.á..v¶.v·.ÖlÁS.á..F$ 0000A0
868D5657 55022DE8 9A00E488 D88E1EEC 88554590 581E90CB 4D5D1FE5 8802ED83 .Ü..[.]Mù..X.EU.$..Ä¡Ö..Ö-@UWV.. 0000C0
9A0676FF 0876FF0A 76FF0C76 FF0E76FF 1076FF12 76FFFF72 968CFF70 8689FF20 ...p...r..v..v..v..v..v..v..v.. 0000E0
26085EC4 36750D0D 063E8307 74020006 3E834475 40FF7886 890EC483 5611530E 8S.V.á...x.àuD.>...t..>...uóá^.& 000100
409A501E 10848819 743A017F 80260774 C00A2474 5C3C2874 2F3CFF1E 8688078A ......</t(<\t$.àt.&...:t.¡...P.∂ 000120
86FF5000 7F889001 13E9FF78 86880875 0008FF7C 9689FF7A 868904C4 83563F52 R?V.á...z...|..Åu...x.Ö...¡..P.Ñ 000140
00FD46C6 FF7C9689 FF7A8689 0AC48356 C851FA9A 5016FF7E 868DFF7A 86FFFF7C |..Ñz...-..P.°QàV.á...z...|.óF». 000160
75003080 26464704 88058A26 00743830 802600E8 FF7086C5 FF1C9E8C FF7ABEC4 á/z.....éÑp.S.&.=;t.&....GF&.=.u 000180
708EFF00 07C626FF 709EC4FF 7C868CFF 7ABE89FF 1C9E8EFF 729E8CFF 708689ED Ú.Ñp...r......fz...|.á.p.&ó....p 0001A0
26FF749E C4FF7296 8CFF7086 89FF2086 80FF7696 89FF7486 89C28CFF 708688FF ...p..ó..t...v... ...p...r.á.t.& 0001C0
0A76FF08 C483560E 22849AFF 7086FF16 501E1089 8812742F 3F802618 745C3F80 .?\t.&.?/t.¡...P..Ñp..Ç"8V.á..v. 0001E0
```

Dump of file SATURN:[PCCOMMON.DUMP]INSTALL.EXE;1 on 18-APR-1990 10:27:36.56
File ID (29,26,0) End of file block 61 / Allocated 64

Virtual block number 45 (0000002D), 512 (0200) bytes

```
FF0C76FF 0E76FF10 76FF1276 FF08C483 56FD2284 9AFF7086 FFFF7286 FF0876FF .v..Ñr..Ñp..Ç"»V.á..v..v..v..v.. 000000
00063E83 FF16E903 7440FF78 86890EC4 8353EE53 DE9A0676 FFFF7086 FFFF7286 Ñr..Ñp..v..ßSŸS.á...x.àt.Ö...>.. 000020
86FFC28C C388FEF8 E9037500 3F8026FF 7A9EC4FF 05E90374 0D00063E 830A7402 .t..>...t.Ö..á.z.&.?.u.Öñ±.ù.ò.. 000040
3679881E 56EC8855 90C84D50 1FE58802 ED835F5E FEE6E9FF 17E90374 DÜL.¯F7A z..Àt.Ö..Öl±^_.Ü..[.]Mù.U.$V.¡yó 000060
108C06C6 0000FFFF 9A501080 881E5010 99881E50 000A8818 7500108C 3E8U.¯8E .Á.>...u.¡..P.¡..P.¡..P.....ó... 000080
068FC850 E5885E1F 000188F3 77D43AF7 72D03A08 74C085AD FC10808E 0656B.01 ..V./..=Ü.àt.:Àr%:àwµ¡...^.[]ù.. 0000A0
1E8C3600 43368936 F77500FF 7C800674 4EF08808 DE1E8E08 DCA110A2 068F10A0 ....Å.ÀÉ...8..ÞNt..|..u%6.6C.6.. 0000C0
093CF874 203CACFA 75C00A42 AC0001BF D233109E 36893696 0175FF04 F6960045 E..-..u..6.6..30¢..¨8.àu°¨< t«<. 0000E0
3CE9E802 C2830573 0151E868 74C00AE8 74093CEC 74203CAC 4E477774 C00AF774 t%.àtwGN¯< t$<.tÒ.àthÒQ.s..ò.SÖ< 000100
D113E901 C18BCDE8 D1030474 223CFA74 5C3CAC41 C933DEEB 4203745C 3C247422 "t$<\t.BŠB3èA¯<\t°<"t..I$ë.èiÖ.i 000120
E8420374 5C3CAE74 223CF1E8 02C28305 73011AE8 3174C00A AC4E01E8 C47501A8 ¨.uàS.N¯.àt1Ò..s..ò.$þ<"tÛ<\t.B$ 000140
891F1688 E8CC7501 A80113E9 D1C18805 E8D10304 74223CFA 745C3CAC 41C933E6 |3èA¯<\t°<"t..I$I.èiÖ.1´.uàS.... 000160
1E8C0038 A3C159E9 00088806 73012DE8 FE24C203 C788E7D1 E7D147D7 030D393E >9..æGiÖiÖ.ú.ò$±Ö-.s.¡..ÖYéÈ;... 000180
FA75C00A AAAC08DE 1E8E109E 368804C3 8302578C 363F8936 0716F803 D888003D =..Å.%..6.?6.W..ú..6....B.¯¨.àu° 0001A0
4E04C383 02578C36 3F893600 85E90375 C00AF774 093CF874 203CACAA C03303EB $.3á¯¨< t«<.t%.àu.Ö..6.?6.W..ú.N 0001C0
E0E8AA03 745C3C27 74223CEB EBA80373 0079E86A 74C00AD9 74093CDD 74203CAC ¯< ti<.t).àtjÖy.s.¨$$<"t'<\t.¯$Å 0001E0
```

Dump of file SATURN:[PCCOMMON.DUMP]INSTALL.EXE;1 on 18-APR-1990 10:27:36.56
File ID (29,26,0)   End of file block 61 / Allocated 64

Virtual block number 46 (0000002E), 512 (0200) bytes

```
4EC1EBAA 22B00673 AAF3E901 5CB0CDEB AAF35CB0 0674223C FA745C3C AC41C933 3èA^<\t*<"t.¯\µ^Se¯\iÕµ^s.¯"^SèN 000000
FA745C3C AC41C933 E8EBAA03 745C3CAF 74223CF3 EBAB0373 0041E832 74C00AAC ¯.ât2ÕA.s.^Sµ<"tE<\t.^SÕ3èA^<\t* 000020
000007C7 1F16AAC0 33C9EBAA 22B08E73 AAF3E901 5CB005EB AAF35CB0 0674223C <"t.¯\µ^S(¯\iÕµ^s.¯"^Sè3â^..ú... 000040
5652EC8B 55C350E5 8BF94624 8A047358 0008E850 EC8B5510 A02EFF00 000247C7 úG.......U.$PÒ..Xs..$F*.[]úU.$RV 000060
0057689A 5010A5B8 1E5010B1 B81E5000 0AB81875 0010A43E 80D88E57 4E88501E .P¡NW.A.>E..u.¡..P.¡Y.P.¡E.P.hW. 000080
C350E58B 5A5E1FF> F377D43A F772D03A 0974C085 ADFC10A5 BE5A0110 A406C600 .ó.E..Z/E.=Ü.ât.:Âr¥;åwµ*.^Z.[]ú 0000A0
C0850000 51E39A1E 5150410F C98049C8 88197208 E01E3826 72D80308 E61E8B5A Z..[..Âr&;.A.r..ül.è.APQ..DO...â 0000C0
FFC38BE3 8802720F 261E3808 72D82BDC 880EEBF8 08E61E87 08E00E89 490C7558 Xu.[..A...[.%S..E+Âr.;.&.r..D.ú. 0000E0
E001C103 E001C888 F9F7000C 8999004E 2004468B 10B606FF 04EC83EC 8B5500E2 ã.U.$.$...Ñ..F.-N..¿..¥*.àiA.èiA 000100
08578926 06478926 045EC402 C48355AA 21F99A50 020088FE 5E8CFC46 890E3E05 .>..F=.^±¡..P.*[¯U.á.á^.&.G.&.W. 000120
8BFC468B 040A4F80 26045EC4 20E80200 0247C726 FC5EC408 0A4F8026 10740008 .Ât.&.O..á^=&úG...$ á^.&.O...F=. 000140
26085788 26064788 26045EC4 00010247 C726FC5E C4085789 26064789 2640FE56 V±@&.G.&.W.á^=&úG...á^.&.G.&.W.& 000160
26085EC4 1874FFFE 83067688 56EC8855 C350E58B 00000447 C7260257 89260789 ..&.W.&úG....[]úU.$V.v..±.t.á^.& 000180
47882608 5EC49075 EBFFFF88 0674020A 47F62607 74800A47 F6261475 010A47F6 -G..u.&-G..t.&-G..t.¡..$u.á^.&.G 0001A0
26107506 47392602 57882607 8826085E C404C483 FF36E853 06087508 47082606 .&.G.u..SÒ6..á.á^.&..&.W.&9G.u.& 0001C0
5EC40788 26C6881F C4260FFF 260447FF 2607FF26 C8750004 7F83260A 75085739 9W.u.&....uà&..&.G.&..&á..ó&..á^ 0001E0
```

Dump of file SATURN:[PCCOMMON.DUMP]INSTALL.EXE;1 on 18-APR-1990 10:27:36.56
File ID (29,26,0)   End of file block 61 / Allocated 64

Virtual block number 47 (0000002F), 512 (0200) bytes

```
D1D888F9 F7000CB9 99004E2D C3881875 400A47F6 26010A4F 8026EF0A 67802608 .&.g.y&.O..&-G.@u..ú-N..¿..¥*.Äi 000000
09BA0872 000F1E3B 065E8BEC 8B5590CB 5D5EE42A C68B040E 3E8F80E3 D1D803E3 D.ÄiD..>...ó*Ò^]ù.U.$.^.;...r.¤. 000020
59000020 6C9A5116 0C76FF08 76FF0A76 FF53CC8B 04EC8304 66E9D45A E9C03300 .3àÒZàÒfâ.$..àS.v..v..v..Q.l ..Y 000040
067EC4D9 8827E30E 4E881E56 57EC8B55 00CB5DE5 8BFD0D11 A78091E1 75C0855A Z.àuÄ..]..».[]ù.U.$WV..N.D'.]á-. 000060
49490474 0477FF45 3A26C933 FF448AA6 F30A76C5 FE8BC803 D9F7AEF2 C033F78B .K3à ÚK).ù.±év.µ[.D.3è&:E.w.t.II 000080
000F1E3B 065E8BEC 8B550116 E9008357 56EC8B55 00CB5DE5 8B5F5E1F C188D1F7 ¥i.é.^_.[]ù.U.$VW*.Ò..U.$.^.;... 0000A0
064688EC 8B5500CB 5DE58BC0 3302EB00 01B80574 400D1187 F60C7C00 FB83117D )..«.|.-...@t.¡..$.3à.[]ù.U.$.F. 0000C0
33067EC4 57EC8B55 0008CA5D E58BD31B 0A4628EB D3EAD331 35B90C5E 88085688 .V..^.¿51ÆõÆ$+F..Æ.[]ò..U.$Wá-.3 0000E0
C28CC78B 04E8D08B C0330674 05382647 AEF2FD0A 468A4FD9 F741AEF2 FFFFB9C0 â¿...ÜA¥1O.F.»^ÜG&8.t.3à.ÀS..ú.ô 000100
C22BD2F7 D78B4BC1 88067EC4 0A76C556 571E4EE3 0E4E88EC 8B55CB5D E58B5FFC =_.[]úU.$.N.DN.WVév.á~..èH.=¥Ø+ô 000120
E391A4F3 C913A5F3 E9D1C128 9140C203 C323081B C22BD2F7 D68BC203 C323081B .ÜWú.ô.ø¥Ø+ô.ÜWú.ô@.+èiÕµE.èµE.D 000140
8B06468B 1F5F5E8E EBC08E5C 3805C08C C775FF0B D88E3041 05D88C07 75F60818 ..-u..Ä.AO.A..uú.à.8\.àS/^ ..F.. 000160
D187D103 D323D81B D12B0C74 DAF7D78B 067EC457 38E30C4E 8BEC8B55 CB5D0856 V.]úU.$.N.DBWá-..ø¥Òt.+i.ÜWE.i.i 000180
13ABF3E9 D1C38E5C 43C381C3 8C10E301 87AAF3C9 13ABF3E9 D1E08A0A 46ABD128 +i.F..ÄiÕµ^.èµ^.iD..ú.üC\.üiÕµ^. 0001A0
C00A93FC 071E570A 7EC51E08 56880646 880E4E8B CB500856 88064688 5F> F3C9 èµ^_.F..V.]ù.N..F..V..é-.W..=..â 0001C0
F1F70274 C00BD233 92F78BDA F7000283 DBF7AA2D 800A79D2 080E750A F98_ 374 t..¯.u..øy.¯-^¥Ü.Ø.¥O.¥.3Ø.ât.¥þ 0001E0
```

Dump of file SATURN:[PCCOMMON.DUMP]INSTALL.EXE;1 on 18-APR-1990 10:27:36.56
File ID (29,26,0)   End of file block 61 / Allocated 64

Virtual block number 48 (00000030), 512 (0200) bytes

```
448DFF44 880586AC 4F0588E2 75C308C2 88AA2704 0276393C 3004D387 92F1F793 .¥þ..Æ.0<9v..'^.ó.ùuâ..O¯...D..D 000000
0D750C46 080A468B 56570EEC 83EC8B55 00CB5DE5 8B5E5F1F 580A8CF2 72C73801 .;ùr^.OX._^.[]ù.U.$.$.WV.F..F.u. 000020
5EC419EB 0002BEFA 5689F846 8908568B 06468B0C 56890A46 89004116 8B003FA1 Ä?...A..F¯.V..F..V..F½.V*ƒ..$.á^ 000040
47082607 8826F85E C4F00340 04C4835D 80235A9A 37FF2602 77FF2604 F84683F8 ½.F½.&.w.&.7.Z#.].á.@.Þá^½&..&.G 000060
06C70789 26024789 26C02812 5EC41A72 7FFFFE81 F6768905 767FFFFE 81067402 .t..±..vl.v-.±..r.á^.+â&.G.&..ú. 000080
08025789 26078926 0E5EC402 C4835D05 21F99A56 2FE8000A 000006C7 00070006 ....ú.....$/V.*|(].á.á^.&..&.W.. 0000A0
85E9FFFF 88000800 0006C700 0C000606 C7078926 02478926 C028125E C41F75D0 Äu.á^.+â&.G.&..ú.....ú.....¡..Òç 0000C0
260277FF 2604F846 83F85EC4 901AE800 02BEFA56 89F84689 0C56880A 46889002 ...F..V..F½.V*ƒ..$..á^½.F½.&.w.& 0000E0
A1D5767F FFFE8106 7402470B 26078826 F85EC4F0 034004C4 835E2923 5A9A37FF .7.Z#)^.á.@.Þá^½&..&.G.t..±..víÀ 000100
46881274 00FE7E83 FE7E89F6 754F0375 00001080 80F8880F 74C008FE 4689000F ...F±.ât..½.§...u.Ou-.-±.-±.t..F 000120
460304C4 835E4D23 5A9A1676 FF1876FF FE760303 7400000C 3E80F003 000E05FE ±....Þ.>...t..v±.v..v..Z#M^.á..F 000140
835E5C21 E49A37FF 260277FF 260E5EC4 18767FFE 30057502 080213C6 03D228F6 -+Ø.ó.Ø.Øu.=±.v.á^.&.w.&.7.ô!\^. 000160
C419750D 08025789 26078926 125EC402 C4835E7C 21F99A56 FF0DE90E 5EC404C4 á.á^.Ò..V.*||^.á.á^.&..&.W..Äu.á 000180
88260788 260E5EC4 90FF0FE9 0E5EC404 C4835EC0 21E49A37 FF260277 FF260E5E ^.&.w.&.7.ôiá^.á.á^.Ò...á^.&..&. 0001A0
6A740247 08260788 26F85EC4 FA5689F8 46890856 88064688 F45689F2 46890257 W..F^.V¶.F..V..F½.V*á^½&..&.G.tj 0001C0
0277FF26 04F84683 F85EC408 C4835ED6 22FA9AF2 76FFF476 FF37FF26 0277FF26 &.w.&.7.v¶.v^.*"ø^.á.á^½.F½.&.w. 0001E0
```

```
Dump of file SATURN:[PCCOMMON.DUMP]INSTALL.EXE;1 on 18-APR-1990 10:27:36.56
File ID (29,26,0)   End of file block 61 / Allocated 64

Virtual block number 49 (00000031), 512 (0200) bytes

FFF476FF 37FF2602 77FF26F8 5EC4903C E8F24601 4004C483 5EF5235A 9A37FF26 &.7.Z#%^.á.a.F.$<.á^%&.w.&.7.v¶. 000000
04C4835F 83235A9A 37FF2602 77FF2604 F84683F8 5EC408C4 835F0822 FA9AF276 v..*"..á.á^%.F%.&.w.&.7.Z#..á. 000020
8826C02A F25EC4B9 75024708 26078826 F85EC4F2 46FF2007 C626F25E C4F24601 .F.á^.Ió..F.á^%&..&.G.u¿á^.ªá&. 000040
5689F846 890C5688 0A4688F4 5689F246 89025788 26078826 125EC407 8826FF47 G.&..á^.&..&.W..F..V¶.F..V..F%.V 000060
9033E800 07C626F2 46FF25E C43F7500 FE7E8345 75024708 26078826 F85EC4FA *á^%&..&.G.uE.-±.u?á^..F.&ó..$3. 000080
2604F846 83F85EC4 08C4835F 9922FA9A F276FFF4 76FF37FF 260277FF 2(*95EC4 á^%&.w.&.7.v¶.v..*"..á.á^%.F%.& 0000A0
7E83C275 02470826 078826F8 5EC4F246 014004C4 835FC523 5A9A37FF 260.'7FF .w.&.7.Z#é_.á.a.F.á^%&..&.G.uó.- 0000C0
9A501E0C E88808C4 835F0222 FA9AF276 FFF476FF 501E0CE8 8800A6E9 0375()FE ±.u.ÕI.¡Ò..P.v¶.v..*"@.á.¡Ò..P. 0000E0
D3048198 0011848A 1EE8F27E C4F62837 7400000C 3E80F246 0104C483 5A00235A Z#.2.á..F..>...t7+-á-.$......Ý.& 000100
D875C008 FE4EFFFE 46884647 05882641 040F2400 11848A47 05882641 040F24F8 %$..A&..G....$..A&..GF.F±.N±.áuÄ 000120
FF8007E8 F27E88FE 4E88F628 078826FE 468AF246 FFF25EC4 38E8F446 8CF27E89 .-..F¶$;á^..F..F±&..+-.N±.~.$.¯. 000140
F4468CF2 7E8990E7 E8001184 8AE87400 0011BC80 0E74C008 49C18846 47058826 &..GF.èl.ât..¥...t$....$Ó..-..F¶ 000160
83EC8855 CB5DE588 5F5EC028 0007C626 F25EC400 07C626F2 46FFF25E 88FE4E89 .N±.^..F.&ó..á^.&ó..+á^_.l)ùW.$. 000180
74000030 02330646 886F75C0 0806C483 503F2C92 9A0876FF 0A76FF50 C03304EC $.3àP.v..v...,?].á..âuo.F.3@=..t 0001A0
52505050 C033CEC6 E9C03300 168A0874 00013042 0E740003 30137400 02304219 .B=..t.=..t.B=..t.¤..3àÓóö3àPPPR 0001C0
FFFF9A00 01004706 C70876FF 0A76FF50 16FC4680 1076FF12 76FF0C76 FF0E76FF .v..v..v..v..F=.P.v..v.ú.G...... 0001E0

Dump of file SATURN:[PCCOMMON.DUMP]INSTALL.EXE;1 on 18-APR-1990 10:27:36.56
File ID (29,26,0)   End of file block 61 / Allocated 64

Virtual block number 50 (00000032), 512 (0200) bytes

7500067E 83FC4688 CE97E903 74C00800 7FE90375 02067E83 00000047 06C70000 ..ú.G....-..u.Õ...ât.Õ.ö.F=.-..u 000000
065E8B60 7E618C9A 084E8802 57880788 065E88EC 8855C850 E588FE46 8AE08A05 ..Å.F±.l)ùW.$.^....W..N...a-'.^. 000020
1CE8F628 FC5E8CFA 4689004E 885606EC 83EC8855 000004CA 5DE58802 57890789 ...W..l)ò...U.$.$.V¡N..F*.^=+-$. 000040
880E86A1 0CFA4683 46017440 04C48361 0837F29A 53060E74 830A47F6 26FA5EC4 á^*&-G..t..S..7.a.á.ât.F.F*.AÑ.. 000060
3D0005BA 0874000A 3000078A 2174C008 90C850E5 885EC688 D876FA46 390E8816 .¡.9F*vÁ.ó^.l)ù..ât|¤..=..t.¤..= 000080
06E3E032 0061801A E99A50FF FF886178 2EEE9A61 3F2D8E9A 5200068A 03740008 ..t.¤..R./.?a.Ý.(a¡..P.Õ..a.2UÐ. 0000A0
065EC4F8 4689FA46 89F24689 F44689C0 285612EC 83EC8855 00C8FAE2 D2D1E001 ¡Á|@â*ù.U.$.$.V+á.F¶.F..F*.F%á^. 0000C0
624951FA 9A0A76FF 0C76FF53 06500002 881C740C 46080A46 882A753A 017F8026 &...:u*.F..F.t.¡..P.S.v..v..*Qlb 0000E0
0007C626 0A5EC407 740C4608 0A46880F E8020646 83000247 C6260A5E C40AC483 .á.á^.&óG...F..$..F..F.t.á^.&ó.. 000100
3CEE4688 078A26FC 5EC431E8 FE5689FC 46890856 88064688 F24689F4 4689C028 +á.F¶.F..F..V..F=.V±$1á^=&...FÝ< 000120
4689C28C C3880A75 2E3F8026 10E8F456 89F24689 40C28CC3 880D755C 3C04742F /t.<\u..ù.óa.F..V¶$.&.?.u..ù.ó.f 000140
C00802C4 83628857 489A5098 1374C00A EE468807 8A26FC5E C4FC46FF FA5689F8 %.V*.F=á^=&...FÝ.ât..P.HW.b.á..â 000160
00813006 4628F246 88307410 46080E46 884674F4 4608F246 8800E8FC 46FFB474 tÇ.F=$i.F..F¶tF.F..F.tO.F.+F.=.. 000180
F05E880A C48362F0 51FA9A0E 76FF1076 FF0676FF 0876FF50 F0468900 8188037E -.¡...FÞP.v..v..v..v..*QÞb.á..^Þ 0001A0
0E5EC407 7410460B 0E46880F E8085689 064689F4 5688F246 880000C6 260E76C4 áv.&ó...F..V¶.F..V.$..F..F.t.á^. 0001C0
88307414 46081246 887272F8 46390856 88064688 7D74FA46 08F84688 0007C626 &ó...F%.F*t).F..V.9F%rr.F..F.tO. 0001E0

Dump of file SATURN:[PCCOMMON.DUMP]INSTALL.EXE;1 on 18-APR-1990 10:27:36.56
File ID (29,26,0)   End of file block 61 / Allocated 64

Virtual block number 51 (00000033), 512 (0200) bytes

51FA9A12 76FF1476 FF0676FF 0876FF50 F0468900 0888037E 00083006 4628F846 F%+F.=..-.¡...FÞP.v..v..v..v..*Q 000000
00043DF8 4628FC46 88797418 46081646 880000C6 261276C4 F05E880A C4836328 (c.á..^Þáv.&ó...F..F.ty.F=+F%=.. 000020
F05E880A C4836362 51FA9A16 76FF1876 FFF876FF FA76FF50 F0468900 0488037E -.¡...FÞP.v*.v%.v..v..*Qbc.á..^Þ 000040
89000888 037E0008 3D064628 FC468830 74144608 12468847 E80000C6 261676C4 áv.&ó..$G.F..F.tO.F=+F.=..-.¡... 000060
00C62612 76C4F05E 880AC483 28C951FA 9A1276FF 1476FF06 76FF0876 FF50F046 FÞP.v..v..v..v..*Qè+.á..^Þáv.&ó. 000080
00780001 08380103 003390C8 5DE5885E 0007C626 165EC407 74184608 16468800 ..F..F.t.á^.&ó..^.l)ù.3...8...x. 0000A0
00000003 59530002 00F30003 18300103 00000002 16000002 00000001 61890002 ...a......Å........0...µ...SY.... 0000C0
00030002 0C120103 008A0001 2F180103 00890001 1FED0103 00050001 181E0103 ..........Ü......../............ 0000E0
00090002 118A0103 00900001 60CE0103 000E0001 29DA0103 00050002 000F0103 ..........Ö)......ö'......¤..... 000100
00880001 5C870105 00870001 58870105 00130002 52E50103 000F0002 11960103 ..........lR......ñ[.......\.... 000120
00000004 181F0103 00040005 23ED0103 000C0004 174F0103 00220001 51980103 ...Q..".. .0........Ù#........... 000140
00110004 15DF0103 00100004 17830103 00270001 18530103 00260001 59AA0103 ..'Y..&...S...'...*........Ô..... 000160
00310001 19850103 00040006 59600103 00080005 23FE0103 000A0005 23C20103 ..ó#.......±#.......mY..........1. 000180
003A0001 58280103 00390001 2C0C0103 002F0002 11E80103 00320001 0EFD0103 ..»...2...$.../...É,..9...+[..:. 0001A0
00410001 02060103 00400001 02340103 003C0001 20180103 00380001 10D00103 ..Å...;.....<...4...a...■...A. 0001C0
00460001 10A70103 00440001 1E8C0103 00430001 12CA0103 00420001 2CFA0103 ..*,..B...ò...C.......D...Ì...F. 0001E0
```

```
Dump of file SATURN:[PCCOMMON.DUMP]INSTALL.EXE;1 on 18-APR-1990 10:2,:36.56
File ID (29,26,0)    End of file block 61 / Allocated 64

Virtual block number 52 (00000034), 512 (0200) bytes

004C0001 10180103 00480001 2CA80103 00480001 0F280103 00470001 0FD00103 ..A...G...+...H...`,..K.......L. 000000
00590001 29FD0103 00510001 0F610103 004D0001 1DE90103 0A340001 0C230005 ..#...4...Ô...M...a...Q...»)..Y. 000020
542D6E75 52205340 00000000 00000000 06C80001 07500005 005C0001 19750103 ..u...\...P...à.........MS Run-T 000040
38383931 20296328 20746867 69727970 6F43202D 20797261 7262694C 20656069 ime Library - Copyright (c) 1988 000060
505C7325 00455845 2E505554 45530011 70726F43 2074666F 736F7263 694D202C , Microsoft Corp..SETUP.EXE.%s\P 000080
776F6C66 7265764F 20726566 66754220 3A524F52 52450073 25207325 5C4E4942 BIN\%s %s.ERROR: Buffer Overflow 0000A0
524F5252 4500203A 2064656B 636F4C20 65766972 44203A52 4F525245 00203A20  : .ERROR: Drive Locked : .ERROR 0000C0
6C61766E 49203A52 4F525245 00203A20 656C646E 61482064 696C6176 6E49203A : Invalid Handle : .ERROR: Inval 0000E0
53206572 6F4D206F 4E203A52 4F525245 00203A20 72657465 6D617261 50206469 id Parameter : .ERROR: No More S 000100
20736F44 20746F4E 203A524F 52524500 203A2073 656C646E 61482068 63726165 earch Handles : .ERROR: Not Dos  000120
203A2064 6E756F46 20746F4E 20687461 50203A52 4F525245 00203A20 68736944 Disk : .ERROR: Path Not Found :  000140
646E6946 736F4420 6D6F7266 2065646F 6320726F 72726520 6E776F6E 6B6E5500 .Unknown error code from DosFind 000160
73252067 6E697970 6F43000A 27732527 00203A20 29287478 654E2F74 73726946 First/Next() : .'%s'..Copying %s 000180
65727275 636F2072 6F727265 20657469 72772041 00732520 6F742020 2020200A .      to %s.A write error ocurre 0001A0
2E207325 206F746E 6920676E 696C6C61 74736E49 00643230 25534942 000A2164 d!..BIS%02d.Installing into %s . 0001C0
61656C50 000A2164 656C6961 66206C6C 6174736E 49002A2E 2A5C3A41 000A2E2E ....A:\*.*.Install failed!..Plea 0001E0

Dump of file SATURN:[PCCOMMON.DUMP]INSTALL.EXE;1 on 18-APR-1990 10:27:36.56
File ID (29,26,0)    End of file block 61 / Allocated 64

Virtual block number 53 (00000035), 512 (0200) bytes

27732527 2064656C 6C656261 6C206873 69642065 68742074 7265736E 69206573 se insert the disk labelled '%s' 000000
6420676E 6F725700 2079656B 20796E61 20737365 7270206E 65687420 646E610A .and then press any key .Wrong d 000020
6F697461 6C6C6174 736E6920 73696854 00002A2E 2A5C0073 25732500 2E687369 isk..%s%s.\*.*..This installatio 000040
63617073 20687369 6420666F 2040756C 252E756C 25207365 72697571 6572206E n requires %lu.%luM of disk spac 000060
6F746365 72696420 65687420 666F2065 6D616E20 65687420 7265746E 45002E65 e..Enter the name of the directo 000080
746E6569 63696666 75736E49 003A6F74 6E69206C 6C617473 6E69206F 74207972 ry to install into:.Insufficient 0000A0
3A632520 65766972 64206E6F 20656C62 616C6961 76612073 69206563 61707320  space is available on drive %c: 0000C0
63206F74 20656C62 616E5500 5C002E6E 6F697461 6C6C6174 736E6920 726F6620  for installation..\.Unable to c 0000E0
65726574 6E652043 5E0A0000 27732527 2079726F 74636572 69642065 74616572 reate directory '%s'...^C entere 000100
616C6C61 74736E69 2074726F 6261206F 74206873 69772075 6F79206F 44202E64 d. Do you wish to abort installa 000120
6261206E 6F697461 6C6C6174 736E4900 0A632500 203F294E 2F592820 6E6F6974 tion (Y/N)? .%c..Installation ab 000140
6C62616E 55007325 5C3A4100 4746432E 4C4C4154 534E4900 0A0A2E64 6574726F orted....INSTALL.CFG.A:\%s.Unabl 000160
0A732520 656C6966 206E6F69 74617275 6769666E 6F63206E 65706F20 6F742065 e to open configuration file %s. 000180
6966206E 6F697461 72756769 666E6F63 20646165 72206F74 20656C62 616E5500 .Unable to read configuration fi 0001A0
6C6C6174 736E695C 73250065 78652E6C 6C617473 6E695C73 25000A73 2520656C le %s..%s\install.exe.%s\install 0001C0
000A0A2E 6C756673 73656363 7573206E 6F697461 6C6C6174 736E4900 6766632E .cfg.Installation successful.... 0001E0

Dump of file SATURN:[PCCOMMON.DUMP]INSTALL.EXE;1 on 18-APR-1990 10:27:36.56
File ID (29,26,0)    End of file block 61 / Allocated 64

Virtual block number 54 (00000036), 512 (0200) bytes

206D6F72 66206574 74656873 69642065 68742065 766F6D65 72206573 61656C50 Please remove the diskette from  000000
63616D20 72756F79 20746F6F 62657220 646E610A 65766972 64203A41 20656874 the A: drive.and reboot your mac 000020
0A000A0A 2E4E414D 48434142 20676E69 6E6E7572 2065726F 66656220 656E6968 hine before running BACHMAN..... 000040
65746F6E 206573': 656C500A 2164656C 69616620 6E6F6974 616C6C61 74736E49 Installation failed!.Please note 000060
7543206E 616D68 ' 61422074 6361746E 6F632064 6E612029 7328726F 72726520  error(s) and contact Bachman Cu 000080
20796E61 20737365 72500A0A 005C0000 0A0A7472 6F707075 53207265 6D6F7473 stomer Support....\...Press any  0000A0
20202020 20202020 20202020 002E2E2E 2065756E 69746E6F 63206F74 2079656B key to continue ....             0000C0
4E4F435C 3A43005C 3A000D73 25000020 20202020 20202020 20202020 20202020                  ..%s..:\.C:\CON 0000E0
4749464E 4F435C3A 43002E2E 2E207325 20676E69 74696445 00535953 2E474946 FIG.SYS.Editing %s ....C:\CONFIG 000100
5359532E 4749464E 4F435C3A 43005349 422E4749 464E4F43 5C3A4300 5349422E .BIS.C:\CONFIG.BIS.C:\CONFIG.SYS 000120
5359532E 4749464E 4F435C3A 43007700 5349422E 4749464E 4F435C3A 43007200 .r.C:\CONFIG.BIS.w.C:\CONFIG.SYS 000140
64657275 63636F20 726F7272 65206E41 0A005359 532E4749 464E4F43 5C3A4300 .C:\CONFIG.SYS..An error occured 000160
49422E47 49464E4F 435C3A43 000A2E73 2520676E 69746964 6520656C 69687720  while editing %s...C:\CONFIG.BI 000180
58250053 49422E47 49464E4F 435C3A43 00535953 2E474946 4E4F435C 3A430053 S.C:\CONFIG.SYS.C:\CONFIG.BIS.%[ 0001A0
54455300 0A73253B 4C4C445C 73253D73 25004854 41504249 4C007325 5D20305E ^= ]%s.LIBPATH.%s=%s\DLL;%s..SET 0001C0
00304854 41504400 4C4C4400 30485441 5042494C 004E4942 50003048 54415000 .PATH=.PBIN.LIBPATH=.DLL.DPATH=. 0001E0
```

```
Dump of file SATURN:[PCCOMMON.DUMP]INSTALL.EXE;1 on 18-APR-1990 10:27:36.56
File ID (29,26,0)   End of file block 61 / Allocated 64

Virtual block number 55 (00000037), 512 (0200) bytes

 5C73253D 48544150 20544553 000A7325 3B73255C 73253D73 25207325 0047534D MSG.%s %s=%s\%s;%s..SET PATH=%s\ 000000
 676E6964 6441000C 0A000A47 53405C73 25304854 41502054 4553000A 4E494250 PBIN..SET PATH=%s\MSG.....Adding 000020
 62616E55 0A002E2E 2E207265 74726174 73206D61 72676F72 70206F74 20732520  %s to program starter .....Unab 000040
 20277325 270A7075 6F726720 60617267 6F727020 65746165 7263206F 7420656C le to create program group.'%s'  000060
 58452E42 5554535F 5C4E4942 505C7325 00415441 445C7325 000A2978 34302528 (%04x)..%s\DATA.%s\PBIN\_STUB.EX 000080
 204E414D 48434142 00003031 2E332074 73796C61 6E41204E 41404843 41420045 E.BACHMAN Analyst 3.10..BACHMAN  0000A0
 61206465 72756363 6F20726F 72726520 6E410A00 30312E33 20747379 6C616E41 Analyst 3.10..An error occured a 0000C0
 65747261 74732060 6172676F 72702065 6874206F 74202773 25272067 6E696464 dding '%s' to the program starte 0000E0
 7265656E 69676E45 6552204E 41404843 41420000 0A0A000A 29783430 25282072 r (%04x)......BACHMAN ReEngineer 000100
 74706D65 74746120 64656C69 61460A0A 00746553 20746375 646F7250 20676E69 ing Product Set...Failed attempt 000120
 6E652072 65747261 74732060 6172676F 72702065 766F6065 72206F74 20676E69 ing to remove program starter en 000140
 49206F6B 63650066 666F206F 68636540 000A2978 34302528 20732509 0A797274 try..%s (%04x)..@echo off.echo I 000160
 002E206F 68636500 2E2E2E20 65736162 61746164 20676E69 7A696C61 6974696E nitializing database ....echo .. 000180
 00405055 206F7420 4E414048 43414220 44492072 65735520 64644120 6F686365 echo Add User ID BACHMAN to UPM. 0001A0
 41544144 5C73253D 48544150 44207465 73006C61 636F6C74 65730065 73756170 pause.setlocal.set DPATH=%s\DATA 0001C0
 63616D70 75002525 48544150 2525384E 4942505C 7325304B 54415020 74657300 .set PATH=%s\PBIN;%%PATH%%.upmac 0001E0

Dump of file SATUR :[PCCOMMON.DUMP]INSTALL.EXE;1 on 18-APR-1990 10:27:36.56
File ID (29,26,0)   End of file block 61 / Allocated 64

Virtual block number 56 (00000038), 512 (0200) bytes

 6F726462 64006D62 64747261 7473004E 41404843 4142206E 6F676F6C 00737463 cts.logon BACHMAN.startdbm.dbdro 000000
 4341423A 43207461 65726362 6400313E 32204C55 4E3E206E 61606863 61622070 p bachman >NUL 2>1.dbcreat C:BAC 000020
 6E696665 64626400 444E422E 4E494645 44424420 646E6264 6E696600 4E414D48 HMAN.findbnd DBDEFIN.BND.dbdefin 000040
 4D20646E 62646E69 66004E41 4D484341 42642D20 4C51532E 4C45444F 4D662D20  -fMODEL.SQL -dBACHMAN.findbnd M 000060
 204C5153 2E54524F 50584541 53662D20 6E696665 64626400 444E422E 4C45444F ODEL.BND.dbdefin -fSAEXPORT.SQL  000080
 42444645 445C4E49 42505C73 25006C61 636F6C64 6E65004E 41404843 4142642D -dBACHMAN.endlocal.%s\PBIN\DEFDB 0000A0
 00000A00 0A732520 65746165 7263206F 7420656C 62616E55 0A007700 444D432E .CMD.w..Unable to create %s..... 0000C0
 08820791 08AE077F 08AA0776 08A60770 08A20750 089E0749 089A072A 08960720  ...*...I...P.Å.p.Î.v.ˆ...Ü...ý. 0000E0
 08D20827 08CE0809 08CA07F5 08C607E3 08C207C8 088E07C2 088A07B4 088607A8 ¨.Ñ.Ç.α.ö./.ù.ô.D.ó.%.ò...ö.'.@. 000100
 00000000 00000892 00001AE9 00000000 00000000 00000000 FFFF085A 08D60839 9.ø.Z...............Õ.......... 000120
 00000000 00000000 00000000 00000000 00000000 00000000 00000000 00000000 ................................ 000140
 00000000 00000000 00000000 00000000 00000000 00000000 00000000 00000000 ................................ 000160
 00000000 00000000 00000000 00000000 00000000 00000000 00000000 00000000 ................................ 000180
 00000000 00000000 00000000 00000000 00000000 00000000 00000000 00000000 ................................ 0001A0
 00000000 00000000 00000000 00000000 00000000 00000000 00000000 00000000 ................................ 0001C0
 00000000 00000000 00000000 00000000 00000000 00000000 00000000 00000000 ................................ 0001E0

Dump of file SATURN:[PCCOMMON.DUMP]INSTALL.EXE;1 on 18-APR-1990 10:27:36.56
File ID (29,26,0)   End of file block 61 / Allocated 64

Virtual block number 57 (00000039), 512 (0200) bytes

 00000000 00000000 00000000 00000000 00000000 00000000 00000000 00000000 ................................ 000000
 00000000 00000000 00000000 00000000 00000000 00000000 00000000 00000000 ................................ 000020
 00000000 00000000 00000000 00000000 00000000 00000000 00000000 00000000 ................................ 000040
 00000000 00000000 00000000 00000000 00000000 00000000 00000000 00000000 ................................ 000060
 00000000 00000000 00000000 00000000 00000000 00000000 00000000 00000000 ................................ 000080
 00000000 00000000 00000000 00000000 00000000 00000000 00000000 00000000 ................................ 0000A0
 00000000 00000000 00000000 00000000 00000000 00000000 00000000 00000000 ................................ 0000C0
 00000000 00000000 00000000 00000000 00000000 00000000 00000000 00000000 ................................ 0000E0
 00000000 00000000 00000000 00000000 00000000 00000000 00000000 00000000 ................................ 000100
 00000000 00000000 00000000 00000000 00000000 00000000 00000000 00000000 ................................ 000120
 00000000 00000000 00000000 00000000 00000000 00000000 00000000 00000000 ................................ 000140
 00000000 00000000 00000000 00000000 00000000 00000000 00000000 00000000 ................................ 000160
 00000000 00000000 00000000 00000000 00000000 00000000 00000000 00000000 ................................ 000180
 00000000 00000000 00000000 00000000 00000000 00000000 00000000 00000000 ................................ 0001A0
 00000000 00000000 00000000 00000000 00000000 00000000 00000000 00000000 ................................ 0001C0
 00000000 00000000 00000000 00000000 00000000 00000000 00000000 00000000 ................................ 0001E0
```

```
Dump of file SATURN:[PCCOMMON.DUMP]INSTALL.EXE;1 on 18-APR-1990 10:27:36.56
File ID (29,26,0)   End of file block 61 / Allocated 64

Virtual block number 58 (0000003A), 512 (0200) bytes

00000000 00000000 00000000 00000000 00000000 00000000 00000000 00000000 ................................ 000000
00000000 00000000 00000000 00000000 00000000 00000000 00000000 00000000 ................................ 000020
00000000 00000000 00000000 00000000 00000000 00000000 00000000 00000000 ................................ 000040
00000000 00000000 00000000 00000000 00000000 00000000 00000000 00000000 ................................ 000060
00000000 00000000 00000000 00000000 00000000 00000000 00000000 00000000 ................................ 000080
00000000 00000000 00000000 00000000 00000000 00000000 00000000 00000000 ................................ 0000A0
00000000 00000000 00000000 00000000 00000000 00000000 00000000 00000000 ................................ 0000C0
00000000 00000000 00000000 00000000 00000000 00000000 00000000 00000000 ................................ 0000E0
00000000 00000000 00000000 00000000 00000000 00000000 00000000 00000000 ................................ 000100
5F454C49 465F435F 08E60000 00000000 00000000 00000000 00000000 00000000 ......................Ì._C_FILE_ 000120
14000000 00000000 00000000 00000000 00000000 00000001 FFFF003D 4F464E49 INFO=........................... 000140
0A0A0A0A 0A0A0A0A 0A0A0A00 00000000 00000000 00000000 00000000 81818100 ................................ 000160
0004005C 005C0000 00000000 00000000 00000000 0000000A 0A0A0A0A 0A0A0A0A .........................\.\... 000180
00000000 00000000 00000102 00000000 00000000 00000001 10E00004 00000056 V....À.......................... 0001A0
00000000 00000000 00000000 00000000 00000000 00000000 00000000 00000202 ................................ 0001C0
00000000 00000000 00000000 00000000 00000000 00000000 00000000 00000000 ................................ 0001E0

Dump of file SATURN:[PCCOMMON.DUMP]INSTALL.EXE;1 on 18-APR-1990 10:27:36.56
File ID (29,26,0)   End of file block 61 / Allocated 64

Virtual block number 59 (0000003B), 512 (0200) bytes

00000000 00000000 00000000 00000000 00000000 00000000 00000000 00000000 ................................ 000000
00000000 00000000 00000000 00000000 00000000 00000000 00000000 00000000 ................................ 000020
00000000 00000000 00000000 00000000 00000000 00000000 00000000 00000000 ................................ 000040
00000000 00000000 00000000 00000000 00000000 00000000 00000000 00000000 ................................ 000060
00000000 00000000 00000000 00000200 00010000 00000000 00000000 00000000 ................................ 000080
00000000 00000000 00000000 00000000 00000000 00000000 00000000 00000000 ................................ 0000A0
00000000 00000000 00000000 00000000 00000000 00000000 00000000 00000000 ................................ 0000C0
00000000 00000000 00000000 00000000 00000000 00000000 00000000 00000000 ................................ 0000E0
00000000 00000000 00000000 00000000 00000000 FFFF08E8 0E320000 00000000 ......2.Ò....................... 000100
00000000 00000000 00000000 00000000 00000000 00000000 00000000 00000000 ................................ 000120
6578652E 64606300 632F0043 4550534D 4F430000 00000000 00000000 00000000 ..............COMSPEC./c.cmd.exe 000140
00000000 00000000 1630FFFF FFFF0000 00000000 606F632E 646E6160 606F6300 .command.com..........0......... 000160
00000000 00000000 00002320 20280029 6C6C756E 2800296C 6C756E28 00000000 ....(null).(null).+- #.......... 000180
2DE20F68 2DE20F64 2DE20F60 2DE2FFFF 2DE20000 20000000 00000000 00000000 ........... ..â-..â-'.â-d.â-h.â- 0001A0
20202020 20202020 20282828 28282020 20202020 20202000 01010000 00000F6C l........      (((((            0001C0
84848484 84848410 10101010 10101010 10101010 10104820 20202020 20202020           H..................... 0001E0

Dump of file SATURN:[PCCOMMON.DUMP]INSTALL.EXE;1 on 18-APR-1990 10:27:36.56
File ID (29,26,0)   End of file block 61 / Allocated 64

Virtual block number 60 (0000003C), 512 (0200) bytes

01010101 01010101 01010101 01010101 81818181 81811010 10101010 10848484 ................................ 000000
02020202 02020202 02020202 02020202 82828282 82821010 10101010 01010101 ................................ 000020
00000000 00000000 00000000 00000000 00000000 00000020 10101010 02020202 ........ ....................... 000040
00000000 00000000 00000000 00000000 00000000 00000000 00000000 00000000 ................................ 000060
00000000 00000000 00000000 00000000 00000000 00000000 00000000 00000000 ................................ 000080
00000000 00000000 00000000 00000000 00000000 00000000 00000000 00000000 ................................ 0000A0
00000000 00005C00 48544150 00657865 2E00606F 632E0000 00000000 00000000 ...........com..exe.PATH.\...... 0000C0
00000000 00000000 00000000 00000000 00000000 00000000 00000000 00000000 ................................ 0000E0
10CCFFFF 0F70611C 00000000 00000000 00000000 00000002 00000000 00000000 ..........................ap...ä. 000100
00003E3E 47534D4E 3C3C10E2 0EB8100E 100C100A 10081006 10041002 100C 9CE ö.Å.@.Å.ø.Ä.Ö.É.ß.¡.â.<<NMSG>>.. 000120
30303652 0003000A 00776F6C 66726576 6F206863 61747320 2D0A0030 30303552 R6000..- stack overflow.....R600 000140
30365200 08000A00 30207962 20656469 76696420 72656765 746E6920 2D0A0033 3..- integer divide by 0.....R60 000160
60756772 6120726F 66206563 61707320 6867756F 6E652074 6F6E202D 0A003830 08..- not enough space for argum 000180
61707320 6867756F 6E652074 6F6E202D 0A003930 30365200 09000A00 73746E65 ents.....R6009..- not enough spa 0001A0
206E7572 00FF000A 0000FC00 0A00746E 65606E6F 7269766E 6520726F 66206563 ce for environment...•......run- 0001C0
20676E69 74616F6C 66202D0A 00323030 36520002 0020726F 72726520 65606974 time error ...R6002..- floating  0001E0
```

```
Dump of file SATURN:[PCCOMMON.DUMP]INSTALL.EXE;1 on 18-APR-1990 10:27:36.56
File ID (29,26,0)   End of file block 61 / Allocated 64

Virtual block number 61 (00000030), 512 (0200) bytes

 756E202D 0A003130 30365200 01000A0D 64656461 6F6C2074 6F6E2074 6E696F70 point not loaded.....R6001..- nu 000000
 00353030 36520065 000A0D74 6E656D6E 67697373 61207265 746E696F 70206C6C ll pointer assignment.....R6005. 000020
 06000A0D 63657865 206E6F20 79726F6D 656D2068 67756F6E 6520746F 6E20200A .- not enough memory on exec.... 000040
 07000A0D 63657865 206E6F20 74616072 6F662064 6162202D 0A003630 30365200 .R6006..- bad format on exec.... 000060
 65786520 6E6F2074 6E656D6E 6F726976 6E652064 6162202D 0A003730 30365200 .R6007..- bad environment on exe 000080
 00000310 E4000200 0000020D 50000200 00000110 CA000200 03FFFFFF 000A0D63 c..........ò.......P.......δ.... 0000A0
 00000000 00000000 00000000 00000000 00000000 00000000 00000000 00000000 ................................ 0000C0
 00000000 00000000 00000000 00000000 00000000 00000000 00000000 00000000 ................................ 0000E0
 00000000 00000000 00000000 00000000 00000000 00000000 00000000 00000000 ................................ 000100
 00000000 00000000 00000000 00000000 00000000 00000000 00000000 00000000 ................................ 000120
 00000000 00000000 00000000 00000000 00000000 00000000 00000000 00000000 ................................ 000140
 00000000 00000000 00000000 00000000 00000000 00000000 00000000 00000000 ................................ 000160
 00000000 00000000 00000000 00000000 00000000 00000000 00000000 00000000 ................................ 000180
 00000000 00000000 00000000 00000000 00000000 00000000 00000000 00000000 ................................ 0001A0
 00000000 00000000 00000000 00000000 00000000 00000000 00000000 00000000 ................................ 0001C0
 00000000 00000000 00000000 00000000 00000000 00000000 00000000 00000000 ................................ 0001E0

File ID (717,16,0)   End of file block 58 / Allocated 60

Virtual block number 1 (00000001), 512 (0200) bytes

 00000000 00000040 00000000 000000B8 0000FFFF 00000004 00000035 01C85A4D MZà.5............|........ə....... 000000
 00000080 00000000 00000000 00000000 00000000 00000000 00000000 00..7000 ................................ 000020
 6F6E6E61 63206D61 72676F72 70207369 685421CD 4C01B821 CD09B400 0EBA  0E ..o..Ç.el¡.LeIThis program canno 000040
 00000000 00000024 0A0D002E 65646F6D 20534F44 206E6920 6E757220 65622074 t be run in DOS mode....$....... 000060
 00100007 00000000 00030000 00000000 00068009 E26858CA 0007068C 0505454E NE..¥...òXhã.................... 000080
 00000000 00000000 00010001 00040000 00000743 00A60086 007C0078 00400037 7.ə.x.|...Ι.C.................. 0000A0
 190E0F00 190E033E 000F0F00 000F033C 0EA40F00 0EA4023D 18A40F00 18A30078 x.È...È.=.È...È.<.......>....... 0000C0
 46534906 01000004 08881EB1 0888069E 1E100F21 1C6E0405 02020E21 00000000 ....!...!.n.!.......Ý........ISF 0000E0
 048E041E 03850344 030C028C 0061004F 00460040 002D0018 00010000 0040524F ORM.......·.ə.F.O.a.....D....... 000100
 64075449 4E49424F 4C474854 45405F0D 626F6C67 6874656D 08000609 05A704A5 Ė.Ι.....methglob._METHGLOBINIT.d 000120
 444D4649 5F0B6C6D 64606669 0654494E 49424F4C 474C4044 5F0C626F 6C676C6D mlglob._DMLGLOBINIT.ifmdml._IFMD 000140
 4C4C414D 454D004D 454D0353 4C4C4143 534F4408 4E49574D 50055449 4E494C4D MLINIT.PMWIN.DOSCALLS.MEM.MEMALL 000160
 55514046 44154052 4F465353 45434F52 50404644 0E4D4644 0348434F 4C42434F OCBLOCK.DFM.DFMPROCESSFORM.DFMQU 000180
 0F504145 48424859 52455551 4D46440E 41544144 52455355 444C4549 46595245 ERYFIELDUSERDATA.DFMQUERYHBHEAP. 0001A0
 514D4644 0F4D5448 59524555 514D4644 0B4A424F 4C4D4448 59524555 514D4644 DFMQUERYHDMLOBJ.DFMQUERYHTM.DFMQ 0001C0
 0C535554 41545354 46494853 59524555 514D4644 13474C44 444E5748 59524555 UERYHWNDDLG.DFMQUERYSHIFTSTATUS. 0001E0

Dump of file SATURN:[PCCOMMON.DUMP.DLL]ISFORM.TMP;1 on 18-APR-1990 10:47:28.98
File ID (717,16,0)   End of file block 58 / Allocated 60

Virtual block number 2 (00000002), 512 (0200) bytes

 46441041 54414452 45535559 52455551 4D464410 4C4F4F54 59524555 514D4644 DFMQUERYTOOL.DFMQUERYUSERDATA.DF 000000
 4D46440F 4E464553 4F4C4354 45534D46 4400444C 45494652 45545349 4745524D MREGISTERFIELD.DFMSETCLOSEFN.DFM 000020
 4D46440D 4E464C4F 52544E4F 43544553 4D46440F 4E46444E 414D4D4F 43544553 SETCOMMANDFN.DFMSETCONTROLFN.DFM 000040
 534D4644 0E4E4645 54414749 56414E54 45534D46 44104A42 4F4C4D44 48544553 SETHDMLOBJ.DFMSETNAVIGATEFN.DFMS 000060
 4644104E 46464C45 53594649 544F4E54 45534D46 44124E46 59464954 4F4E5445 ETNOTIFYFN.DFMSETNOTIFYSELFFN.DF 000080
 46441341 54414452 45535554 45534D46 440E4E46 53475241 4C4F4F54 5445534D MSETTOOLARGSFN.DFMSETUSERDATA.DF 0000A0
 4D455449 44444154 53454E4D 46440E4D 524F4647 4E4F4C45 54414749 56414E4D MNAVIGATELONGFORM.DFMNESTADDITEM 0000C0
 45555154 53454E4D 46441750 554F5247 54494445 4548414D 5453454E 4D464414 .DFMNESTMAKEEDITGROUP.DFMNESTQUE 0000E0
 44184D45 54495952 45555154 53454E4D 46441053 444C4549 4650554F 52475952 RYGROUPFIELDS.DFMNESTQUERYITEM.D 000100
 52545345 4E4D4644 12444554 43454C45 534D4554 49595245 55515453 454E4D46 FMNESTQUERYITEMSELECTED.DFMNESTR 000120
 4E4F4354 49444554 53494C53 5345434F 52504D46 44194D45 54494543 414C5045 EPLACEITEM.DFMPROCESSLISTEDITCON 000140
 4419444E 414D4D4F 43544944 45545349 4C535345 434F5250 4D464419 4C4F5254 TROL.DFMPROCESSLISTEDITCOMMAND.D 000160
 434F5250 4D464419 4C4F5254 4E4F4354 49444554 53454E53 5345434F 52504D46 FMPROCESSNESTEDITCONTROL.DFMPROC 000180
 54545241 54534C4D 44086C6D 6403444E 414D4D4F 43544944 45545345 4E535345 ESSNESTEDITCOMMAND.dml.DMLSTARTT 0001A0
 5445534C 4D440849 54475952 4555514C 4D44084E 5854504F 54534C4D 440A4E58 XN.DMLSTOPTXN.DMLQUERYGTI.DMLSET 0001C0
 44494C4D 44595245 55514C4D 4400314E 4C525952 4555514C 4D440C44 4C454946 FIELD.DMLQUERYRLN1.DMLQUERYDMLID 0001E0

Dump of file SATURN:[PCCOMMON.DUMP.DLL]ISFORM.TMP;1 on 18-APR-1990 10:47:28.98
```

File ID (717,16,0)   End of file block 58 / Allocated 60

Virtual block number 3 (00000003), 512 (0200) bytes

```
4A424F54 43454C45 534C4D44 0F4B4341 424C4C4F 524E5854 504F5453 4C4D4412 .DMLSTOPTXNROLLBACK.DMLSELECTOBJ 000000
53485445 405F0C44 4F485445 40064C4C 41544345 4C455345 444C4D44 0E544345 ECT.DMLDESELECTALL.METHOD._METHS 000020
49454448 5445405F 12455441 49544E41 54534E49 4854454D 5F104753 4D444E45 ENDMSG._METHINSTANTIATE._METHDEI 000040
13524F53 52554354 494E4947 41424C54 55105455 44034554 4149544E 4154534E NSTANTIATE.DUT.UTLBAGINITCURSOR. 000060
550C454B 414D5145 534C5455 0A524F53 52554345 54415245 54494741 424C5455 UTLBAGITERATECURSOR.UTLSEQMAKE.U 000080
45535554 494E494D 524F4641 44124052 4F464144 06454B41 4D4E5551 45534C54 TLSEQUNMAKE.DAFORM.DAFORMINITUSE 0000A0
45444A42 4F094E59 53444441 4A424F09 4E595354 494E494A 424F0A4F 464E4952 RINFO.OBJINITSYN.OBJADDSYN.OBJDE 0000C0
4444414A 424F0944 57485449 4E494A42 4F0A4E59 53504552 4A424F09 4E59534C LSYN.OBJREPSYN.OBJINITKWD.OBJADD 0000E0
4E54494E 494A424F 0844574B 5045524A 424F0944 574B4C45 444A424F 0944574B KWD.OBJDELKWD.OBJREPKWD.OBJINITN 000100
5045524A 424F0A45 544F4E4C 45444A42 4F0A4556 4F4E4444 414A424F 0A45544F OTE.OBJADDNOTE.OBJDELNOTE.OBJREP 000120
454C444E 41485946 49544F4E 454B414D 54554C4D 44165455 4C4D4405 4. 44F4E NOTE.DMLUT.DMLUTMAKENOTIFYHANDLE 000140
52455453 49474552 54554C4D 44125445 53524554 53494745 5254554C 404 1052 R.DMLUTREGISTERSET.DMLUTREGISTER 000160
45525455 4C4D441B 59464954 4F4E5353 45434F52 5054554C 4D441245 5449:257 WRITE.DMLUTPROCESSNOTIFY.DMLUTRE 000180
52455551 49544712 49544703 4554414C 45524E55 4554414C 45525245 54534947 GISTERRELATEUNRELATE.GTI.GTIQUER 0001A0
494E494C 54554D52 46415311 4C54554D 52464153 08525450 41544144 58554159 YAUXDATAPTR.SAFRMUTL.SAFRMUTLINI 0001C0
49455441 4C45524E 55524554 53494745 524C5455 4D524641 5318524F 52524554 TERROR.SAFRMUTLREGISTERUNRELATEI 0001E0
```

Dump of file SATURN:[PCCOMMON.DUMP.DLL]ISFORM.TMP;1 on 18-APR-1990 10:47:28.98
File ID (717,16,0)   End of file block 58 / Allocated 60

Virtual block number 4 (00000004), 512 (0200) bytes

```
54554D52 46415317 584F4254 43454C45 5354494E 494C5455 4D524641 53154D46 FM.SAFRMUTLINITSELECTBOX.SAFRMUT 000000
58455454 494E494C 54554D52 46415310 584F4254 43454C45 53455441 4450554C LUPDATESELECTBOX.SAFRMUTLINITTEX 000020
494E494C 54554D52 46415315 54584554 45544144 50554C54 554D5246 41531254 T.SAFRMUTLUPDATETEXT.SAFRMUTLINI 000040
4E4F4E54 49444545 54414450 554C5455 4D524641 53174C45 444F4D43 4F525054 TPROCMODEL.SAFRMUTLUPDATEEDITNON 000060
54494E49 4C54554D 52464153 15454D41 4E54494E 494C5455 4D524641 53105641 AV.SAFRMUTLINITNAME.SAFRMUTLINIT 000080
46415310 454D414E 45544144 50554C54 554D5246 41531252 45424D55 4E4A424F OBJNUMBER.SAFRMUTLUPDATENAME.SAF 0000A0
0F54494E 494E5953 4C44500A 4E59534C 44500654 53494C54 494E494C 54554D52 RMUTLINITLIST.PDLSYN.PDLSYNINIT. 0000C0
0C545845 54524F52 52454E59 534C4450 0F454552 54444C49 55424E59 534C4450 PDLSYNBUILDTREE.PDLSYNERRORTEXT. 0000E0
534C4450 13535543 4F465445 534E5953 4C44500E 59464954 4F4E4E59 534C4450 PDLSYNNOTIFY.PDLSYNSETFOCUS.PDLS 000100
E8030101 45544952 57534F44 084F4953 03534554 55424952 54544158 49464E59 YNFIXATTRIBUTES.SIO.DOSWRITE...Ò 000120
00006072 6F462065 726F7453 206F666E 49204153 204D5020 322F534F 1A000015 ....OS/2 PM SA Info Store Form.. 000140
00000000 00000000 01504152 5453544F 4F424D52 4F464552 4F54534F 464E4916 .INFOSTOREFORMBOOTSTRAP......... 000160
76FF5016 FA468D07 89260247 89260000 880E5EC4 D88EFFFF 881E5657 00000AC8 à...WV.¡...AÁ^.¡..&.G.&...F*.P.v 000180
037500F8 7E83F846 8910C483 00000075 9A006A0A 76FF0C76 FF271668 0676FF08 ..v.h.'.v...v.j..u....á..F½.-½.u. 0001A0
468DF646 89578088 0003E956 88880006 E903742A FA7E8300 58E9F846 880006E9 Ò...F½Ö[..-**t.Ö..¡¡VÖ..¡.W.F-.F 0001C0
83F84689 10C48300 00FFFF9A 006A0A76 FF0C76FF F676FF06 76FF0876 FF5016FC •.P.v..v..v-.v..v.j.......á..F½. 0001E0
```

Dump of file SATURN:[PCCOMMON.DUMP.DLL]ISFORM.TMP;1 on 18-APR-1990 10:47:28.98
File ID (717,16,0)   End of file block 58 / Allocated 60

Virtual block number 5 (00000005), 512 (0200) bytes

```
00880257 89260789 26FE5688 FC46880E 5EC40016 E9F84688 0006E903 7500F87E -½.u.Ö...F½Ö..á^..F•.V±&..&.W.¡. 000000
46890C46 88E84689 0A4688D8 8E000888 1E565700 001AC8C8 C95F5E1F 0000E900 .Ö...^_èùà...WV.¡...A.F..FÒ.F..F 000020
9A5016F0 4680E76 FF1076FF 0000FFFF 9A5016F8 468DE876 FF0E76FF 1076FFF6 -.v..v..vÒ.F½.P......v..v..FÞ.P. 000040
E8468801 1FE90374 01F67E83 0000011F 9A5016F2 468D0E76 FF1076FF 0000FFFF .....v..v..F.P......--.t.Ö...FÒ 000060
FF9A5016 F2468D0E 76FF1076 FF0000FF FF9A5016 EC468D0E 76FF1076 FF0006E9 Ö•..v..v..Fš.P......v..v..F.P.. 000080
83EA4689 00000167 9A006A00 6A006A00 6A016568 E876FFF2 76FFF476 FF0000FF ....v¶.v.vÒhe.j.j.j.j..g....Fö. 0000A0
FF006A01 6A68E876 FFF276FF F476FF00 85E90163 E90000B8 0009E903 74FFEA7E ~ö.t.Ö..¡..Öc.Ö...v¶.v.vÒhj.j.. 0000C0
5016FC46 800019E9 037401AD E87E81FE 5689FC46 890000FF FF9A006A 006AEA76 vöj.j........F•.V±.-ÒÙ.t.Ö...F•.P 0000E0
FF0037E9 0375FE46 08FC4688 0CC483FF FF00009A EC76FFEE 76FFFC76 FFFE76FF .v±.v•.vŸ.vš......á..F•.F±u.Ö7.. 000100
FF9AEC76 FFEE76FF 000BE903 7400E67E 830000FF FF9A5016 E6468D0E 76FF1076 v..v..FÌ.P......-Ì.t.Ö...vŸ.vš.. 000120
22E90375 01913000 43E90000 FFFF9A01 6AFC76FF FE76FFEC 76FFEE76 FF0000FF ....vŸ.vš.v±.v•j......ÖC.=..u.Ö" 000140
02E90375 01983000 23E9FF00 E9037501 5930FF15 E9037501 48300013 E90376FF .v.Ö..=K.u.Ö..=Y.u.Ö..Ö#.=..u.Ö. 000160
E9E84688 0000E9FE EAE90375 039030FE F2E90375 03883DFE FAE90375 01AD3DFF .*Ù.u.Ö'±=..u.Ö±=..u.Öö±Ö...FÒÖ 000180
FFFF9AF0 76FFF876 FFFA76FF 0676FF08 76FF0A76 FF0C76FF F276FFF4 76FF004C L..v¶.v..v..v..v..v..v'.v½.vÞ... 0001A0
FFFF9AF8 76FFFA76 FF0676FF 0876FF0A 76FF0C76 FFF276FF F476FF00 6CE90000 ..ÖL..v¶.v..v..v..v..v..v'.v½... 0001C0
03750157 300013E9 0376FFCF E9037501 A6300043 E90046E9 00008800 4CE90000 ..ÖL.¡..ÖF.ÖC.=Ì.u.Öu.v.Ö..=W.u. 0001E0
```

Dump of file SATURN:[PCCOMMON.DUMP.DLL]ISFORM.TMP;1 on 18-APR-1990 10:47:28.98

```
File ID (717,16,0)    End of file block 58 / Allocated 60

Virtual block number 6 (00000006), 512 (0200) bytes

 8E3DFFA7 E9037501 AD3DFFAF E9037501 AB3DFFD7 E9FF97E9 03750159 3DFF9FE9 Ō..=Ÿ.u.Ō..Ōʙ.=´.u.ŌÉ.=Ù.u.ŌÏ.=. 000000
 881E5657 00000CC8 000CCAC9 5F5E1FFF 84E9FF74 E9037503 903DFF7C E9037503 .u.Ō|.=..u.Ōt.ŌÇ..^_èò..à...WV.¡ 000020
 1076FF00 0000009A 5016F446 80F876FF 0E76FF10 76FFF846 890A4688 088E0081 Ÿ..Ä.F..F½.v..v..v½.F¶.P.Å....v. 000040
 F8468800 0000F09A 5016FC46 800E76FF 1076FF00 0000E09A 5016FA46 800E76FF .v..Fª.P.Å....v..v..F•.P.Þ....F½ 000060
 FF9AFA76 FFF476FF F676FF06 76FF0876 FF0A76FF 0C76FFFC 76FFFE76 FF004CE9 ŌL..v±.v•.v..v..v..v..v¬.v¶.vª.. 000080
 FF9AF476 FFF676FF 0676FF08 76FF0A76 FF0C76FF FC76FFFE 76FF005C E90000FF ...Ō\..v±.v•.v..v..v..v..v¬.v¶.. 0000A0
 3DFFA4E9 0377015C 3DFFEFE9 0373015A 3D0033E9 0036E900 00B8003C E90000FF ...Ō<.¡..Ō6.Ō3.=Z.s.Ōÿ.=\.w.ŌÉ.= 0000C0
 E9FF84E9 03770393 3DFFCFE9 03730391 3DFFB7E9 037701B0 3DFFDFE9 037301AE Û.s.ŌŌ.=¯.w.Ōñ.=..s.Ōü.=..w.Ō..Ō 0000E0
 5016B046 800876FF 0A76FF08 8E02C088 1E565700 0058C800 0CCAC95F 5E1FFFC4 á..^_èò..àX..WV.¡á..Ä.v..v..F¯.P 000100
 FF9A0676 FFB076FF B276FF00 00010F9A 5016AC46 800B76FF 0A76FF00 0002F99A .ª....v..v..F¯.P......vÿ.v¯.v... 000120
 7523B47E 800000FF FF9A5016 B4468D40 6AF876FF FA76FFFA 5689F846 890000FF ....F½.Vª.vª.v½jä.FÇ.P......~Ç#u 000140
 FFCA8300 000D04C4 83FFFF00 4A9A5016 85468D00 E1E90000 8A000088 0009E903 .Ō..¡..¤..ŌÄ..Fç.P.J....á.....ò. 000160
 76FFB076 FFB276FF 0051E903 74FFF67E 83005AE9 037407F4 7E83F656 89F44689 .F¶.V~.~¶.t.ŌZ..~~.t.Ōö..vÿ.v¯.v 000180
 0000B800 09E9037C 00A87E83 AB468900 00045C9A 006A006A 006A006A 01656806 .he.j.j.j.j..\....F¯.~¯.|.Ō..¡.. 0001A0
 00000138 9A006A00 6AA876FF 006A016A 680676FF B076FFB2 76FF0088 E900008A ¤..Ō...vÿ.v¯.v.hj.j..v´j.j..8... 0001C0
 16FC468D 0019E903 7401AD06 7E81005C E900008A 00008800 09E9FE56 89FC4689 .F•.V±Ō..¡..¤..Ō\..~.Ù.t.Ō...F•. 0001E0

Dump of file SATURN:[PCCOMMON.DUMP.DLL]ISFORM.TMP;1 on 18-APR-1990 10:47:28.98
File ID (717,16,0)    End of file block 58 / Allocated 60

Virtual block number 7 (00000007), 512 (0200) bytes

 0009E903 74FE460B FC46880C C4B3018F 00009AAC 76FFAE76 FFFC76FF FE76FF50 P.v±.v•.vÙ.v¯......á..F•.F±t.Ō.. 000000
 FFFE76FF AA76FF00 00FFFF9A 5016AA46 800876FF 0A76FF00 25E90000 8A000088 ¡..¤..Ō%..v..v..F´.P......v´.v±. 000020
 8E0391B8 1E565700 0000C800 06CAC95F 5E1F0000 E90000FF FF9A006A 006AFC76 v•j.j......Ō...^_èò..à...WV.¡... 000040
 C80006CA C95F5E1F 0000E900 00FFFF9A 009A681E 016A0676 FF0876FF 0A76FFD8 Ä.v..v..v.j..h.......Ō...^_èò..à 000060
 FF0C76FF 0E76FF10 76FF016A 1276FF14 76FF1676 FFD88E04 00B81E56 57000000 ...WV.¡ï..Ä.v..v..v.j..v..v̄..v.. 000080
 07B81E56 57000000 C80012CA C95F5E1F 0000E900 00FFFF9A 0676FF08 76FF0A76 v..v..v......Ō...^_èò..à...WV.¡. 0000A0
 0000C800 06CAC95F 5E1F0000 E90000FF FF9A0C6A 0676FF08 76FF0A76 FFD88E05 ..Ä.v..v..v.j......Ō...^_èò..à.. 0000C0
 C95F5E1F 0000E900 00FFFF9A 006A0676 FF0876FF 0A76FF08 8E053FB8 1E565700 .WV.¡?..Ä.v..v..v.j......Ō...^_è 0000E0
 0E76FF10 76FF006A 1276FF14 76FF1676 FFD88E05 65B81E56 57000000 C80006CA ò..à...WV.¡e..Ä.v..v..v.j..v..v̄. 000100
 57000000 C80012CA C95F5E1F 0000E900 00FFFF9A 0676FF08 76FF0A76 FF0C76FF .v..v..v..v......Ō...^_èò..à...W 000120
 06CAC95F 5E1F0000 E90000FF FF9A046A 0676FF08 76FF0A76 FFD88E05 8BB81E56 V.¡...Ä.v..v..v.j......Ō...^_èò. 000140
 0000E900 0005D39A 056A0676 FF0876FF 0A76FFD8 8E05C388 1E565700 0000C800 .à...WV.¡Ù..Ä.v..v..v.j..Æ..Ō.. 000160
 A19A5016 E6468008 76FF0A76 FFD88E05 E9B81E56 57000076 C80006CA C95F5E1F .^_èò..àv..WV.¡Ō..Ä.v..v..FÌ.P.À 000180
 FF9A5016 FC46800P 76FF0A76 FF000003 B19A5016 E0468D08 76FF0A76 FF000003 ...v..v..FÅ.P.Ÿ....v..v..F•.P.. 0001A0
 168E468D 0676FF0P 76FF0A76 FF000002 E99A5016 EA468D08 76FF0A76 FF0000FF ....v..v..Fô.P.Ō....v..v..v..F.. 0001C0
 006A006A E476FF00 6A014368 01A868E6 76FFE876 FF00E1E4 46C70000 02D99A50 P.\...úFŌÃ..vŌ.vlh´.hC.j..vŌj.j. 0001E0

Dump of file SATURN:[PCCOMMON.DUMP.DLL]ISFORM.TMP;1 on 18-APR-1990 10:47:28.98
File ID (717,16,0)    End of file block 58 / Allocated 60

Virtual block number 8 (00000008), 512 (0200) bytes

 468D0000 042D9A00 6A006A00 6A006A01 6E680676 FFE676FF E876FF00 00069A9A ......vŌ.vl.v.hn.j.j.j.j..-....F 000000
 468912C4 83000000 309A006A FC76FFFE 76FF2713 68E076FF E276FF12 6A5016F8 ½.Pj..vä.vÄh.'.v±.v•j..O....á..F 000020
 015FE900 00FFFF9A 016A0401 68DE76FF E676FFE8 76FF0016 E9037500 DE7E83DE ß.-ß.u.Ō...vŌ.vl.vßh..j......Ō_. 000040
 FF271568 E076FFE2 76FFF876 FFFA76FF F65689F4 46890257 88260788 26F85EC4 á^½£..£.W..F¶.V-.vª.v½.vä.vÄh.⁷. 000060
 011FE900 00B80006 E90374F6 4608F446 8810C483 00000745 9A006AFC 76FFFE76 v±.v•j..E....á..F¶.F-t.Ō..¡..Ō.. 000080
 FFF676FF 55F168E0 76FFE276 FF8A76FF 8C76FF00 00FFFF9A 50168A46 80EA76FF .vō.F..P......v..v..vä.vÄhþU.v-. 0000A0
 76FFE676 FFE876FF 0016E903 7500DE7E 830E4689 10C48300 0007AC9A 006AF476 v¶j..¯....á..Fß.-ß.u.Ō...vŌ.vl.v 0000C0
 8D8A76FF 8C76FF00 00FFFF9A 8A76FF8C 76FF0001 E9000008 049A016A 0401680E ßh..j......Ōi..v..v.......v..v.. 0000E0
 E076FFE2 76FF5016 EC468D00 9246C600 9DE90374 00003D00 00FFFF9A 5016F046 Fþ.P.....=..t.Ō..6F...F$.P.vä.vÄ 000100
 5016E446 80004BE4 46C7DE46 8910C483 000007D7 9A006AF0 76FFF276 FF271068 h.'.v·.vÞj..■....á..FßúFŌK..Fß.P 000120
 468914C4 83000006 879A006A EC76FFEE 76FF2723 68E076FF E276FF50 1692468D .F..P.vä.vÄh#'.vŸ.vš j..ñ....á..F 000140
 0168DE76 FFE676FF E876FF00 0008359A 8A76FF8C 76FF0021 E9037500 DE7E830E ß.-ß.u.Ō!..v..v..5....vŌ.vl.vßh. 000160
 50169246 80006AFF 6A8E76FF 9076FFE6 76FFE876 FF0034E9 000006D9 9A016A04 .j..\...Ō4..vŌ.vl.v..v.j.j..F..P 000180
 1F0000E9 00008800 00FFFF9A 8A76FF8C 76FFFF4B E90000FF FF9AEC76 FFEE76FF .vŸ.vš.....ŌK..v..v......¡..Ō... 0001A0
 061F9A50 1690468D 0676FF08 76FF088E 060F881E 56570000 8CC80006 CAC95F5E ^_èò..à...WV.¡...Ä.v..v..F..P... 0001C0
 3F9A5016 FF7A868D 0676FF08 76FF0000 062F9A50 1684468D 0676FF08 76FF0000 ¯.v..v..F..P./....v..v...z..P.? 0001E0

Dump of file SATURN:[PCCOMMON.DUMP.DLL]ISFORM.TMP;1 on 18-APR-1990 10:47:28.98
```

File ID (717,16,0) End of file block 58 / Allocated 60

Virtual block number 9 (00000009), 512 (0200) bytes

```
168E4680 5016FF78 868D006A 006A5016 82468000 6A006A0A 76FF0C76 FF000006 ....v..v.j.j..F..Pj.j...x..P.F.. 000000
6A5016F4 46800004 07C7260E 5EC40000 FFFF9A00 6A006A00 6A006A00 6A006A50 Pj.j.j.j.j.j......á^.&ú....F¶.Pj 000020
83804689 12C48300 00092A9A 006AFF7A B6FFFF7C B6FF2713 688476FF 8676FF12 ..v..v.h.'.Ñ|..Ñz.j..*....á..F.. 000040
0444E90A C4830996 004E9A12 76FF1476 FF00AC68 1E8076FF 0018E903 7500807E -..u.Õ...v..h¯..v..v..N....á.ÕD. 000060
FF271568 8476FF86 76FFF476 FFF676FF EE5689EC 46890257 88260788 26F45EC4 á^¶&..&.W..F$.VŸ.v-.v¶.v..v.h.'. 000080
FF8676FF 0062E903 74EE460B EC468810 C4830000 09B99A00 6AFF7AB6 FFFF7CB6 Ñ|..Ñz.j..¿....á..F$.FŸt.Õb..v.. 0000A0
468D8476 FF8676FF FF7AB6FF FF7CB6FF 50169E46 8D0000FF FF9A0004 681E8476 v..hå.......F..P.Ñ|..Ñz..v..v..F 0000C0
807E8300 00FFFF9A 8476FF86 76FF8046 8914C483 00000A72 9A006A6C 6A5016EC $.Pjlj..r....á..F..v..v.......~. 0000E0
468D03A6 E90AC483 09DC004E 9A1276FF 1476FF00 F0681E80 76FF0018 E9037500 .u.Õ...v..hÞ..v..v..N.É..á.ÕI..F 000100
12C48300 0009FD9A 006AFF7A B6FFFF7C B6FF2714 688476FF 8676FF0C 6A501688 ..Pj..v..v.h.'.Ñ|..Ñz.j..»....á. 000120
C4830A20 004E9A1A 76FF1C76 FF011268 1E8076FF 0018E903 7500807E 83804689 .F..-..u.Õ...v..h...v..v..N. ..á 000140
0007089A 006A8876 FF8A76FF 27146884 76FF8676 FF076A50 1698468D 0360E90A .Õ'..F..Pj..v..v.h.'.v..v.j..... 000160
004E9A1A 76FF1C76 FF013A68 1E8076FF 0018E903 7500807E 83804689 12C48300 ..á..F..-..u.Õ...v..h:..v..v..N. 000180
0000FFFF 9A1A76FF 1C76FF82 76FFFF78 B6FF9076 FF9276FF 031CE90A C48303F5 %..á.Õ...v..v..Ñx..v..v..v...... 0001A0
76FF8A76 FF015F68 1E016A00 4B9C46C7 0000FFFF 9A5016FC 46800676 FF0876FF .v..v..F•.P.....úF.K.j..h_..v..v 0001C0
00807E83 80468916 C4830000 FFFF9A00 6A576A50 16FF7486 8D8476FF 8676FF88 ..v..v...t..PjWj.......á.¯F..~.. 0001E0
```

Dump of file SATURN:[PCCOMMON.DUMP.DLL]ISFORM.TMP;1 on 18-APR-1990 10:47:28.98
File ID (717,16,0) End of file block 58 / Allocated 60

Virtual block number 10 (0000000A), 512 (0200) bytes

```
FC5EC402 A7E90A[illegible] 830BC900 4E9A1276 FF1476FF 0170681E 8076FF00 18E90375 u.Õ...v..hp..v..v..N.è..á.ÕI.á^= 000000
1FE90375 00807E[illegible] 80468900 00FFFF9A FF74B6FF FF76B6FF 0677FF26 0877FF26 &.w.&.w..Ñv..Ñt.......F..-..u.Õ. 000020
0264E900 00082A9A 01966812 76FF1476 FF8076FF 0677FF26 0877FF26 FC5EC400 .á^=&.w.&.w..v..v..v.h...•...Õd. 000040
16F8468D 006A006A 50169C46 8D1A76FF 1C76FF49 6A0677FF 260877FF 26FC5EC4 á^=&.w.&.w.jI.v..v..F..Pj.j..F%. 000060
8076FF06 77FF2608 77FF26FC 5EC4001F E9037500 807E8380 46890000 FFFF9A50 P......F..~..u.Õ..á^=&.w.&.w..v. 000080
FF260877 FF26FC5E C40000FF 7E86C702 13E90000 08749A01 96681276 FF1476FF .v..v.h...t...Õ..ú.-...á^=&.w.&. 0000A0
26FC5EC4 001FE903 7500807E 83804689 0000FFFF 9A5016F8 4680006A 006A0677 w.j.j..F%.P......F..-..u.Õ..á^=& 0000C0
50169446 8D01C9E9 0000FFFF 9A019668 1276FF14 76FF8076 FF0677FF 260877FF .w.&.w..v..v..v.h.......Õè..F..P 0000E0
FA76FF28 03688476 FF8676FF FF7AB6FF FF7CB6FF EC76FFEE 76FF5016 FF7E868D ..~..P.vŸ.v$.Ñ|..Ñz..v..v.h.(.v' 000100
0191681E 8076FF00 18E90375 00807E83 8046891C C4830000 0CFC9A00 6AF876FF .v%j..•....á..F..-..u.Õ...v..h.. 000120
6AF876FF FA76FF84 76FF8676 FF006A01 73E90AC4 830C0500 4E9A1276 FF1476FF .v..v..N....á.Õs.j..v..v..v'.v%j 000140
FF1476FF 01BC681E 8076FF00 18E90375 00807E83 8046890C C4830000 0C1E9A00 .......á..F..-..u.Õ...v..h¥..v.. 000160
FFFF9A00 6AFF7486 FFFF7686 FF8476FF 8676FF01 37E90AC4 830C4100 4E9A1276 v..N.A..á.Õ7..v..v..Ñv..Ñt.j.... 000180
4E9A1276 FF1476FF 01E2681E 8076FF00 18E90375 00807E83 8046890A C4830000 ...á..F..-..u.Õ...v..hã..v..v..N 0001A0
06819A00 6A006A00 6A006A01 60688E76 FF9076FF 9276FF00 FBE90AC4 830CC800 .à..á.Õ«..v..v..v.h'.j.j.j.j.... 0001C0
76FF9276 FF0058E9 03728C46 39EA4688 8C46FF00 03E90000 8C46C7EA 46890000 ...FõúF...Õ...F..Fõ9F.r.ÕX..v..v 0001E0
```

Dump of file SATURN:[PCCOMMON.DUMP.DLL]ISFORM.TMP;1 on 18-APR-1990 10:47:28.98
File ID (717,16,0) End of file block 58 / Allocated 60

Virtual block number 11 (0000000B), 512 (0200) bytes

```
88804689 0000FFFF 9A5016F0 4680006A 006A006A 006A8C76 FF0A76FF 0C76FF90 ..v..v..v.j.j.j.j..FÞ.P......F.. 000000
FF020968 1E1A76FF 1C76FF00 1BE90374 F2563900 23E90374 F0463996 56889446 F..V.9FÞt.Õ#.9V t.Õ...v..v..h... 000020
8D00489C 46C70007 C6261A5E C4FF9AE9 0074E90C C483001F 004E9A12 76FF1476 v..v..N....á.Õt.Õ..á^.&ó..úF.K.. 000040
00000805 9A006A94 76FF9676 FF272368 8476FF86 76FF1A76 FF1C76FF 50169C46 F..P.v..v..v..v.h#'.v..v.j..f... 000060
F8004E9A 1276FF14 76FF0241 681E8076 FF0018E9 03750080 7E838046 8914C483 .á..F..-..u.Õ...v..hA..v..v..N.% 000080
C7000307 C7260E5E C4025789 26078926 96568894 4688165E C4001DE9 0AC48308 ..á.Õ..á^..F..V.&..&.W.á^.&ú...ú 0000A0
76FF1676 FFD88E08 4EB81E56 5700008E C8C8C95F 5E1F0000 E980468B 00008046 F....F.Õ...^_èùå/..WV.¡N..Ä.v..v 0000C0
76FF1676 FF000008 6E9A5016 9A468D14 76FF1676 FF000008 5E9A5016 A2468D14 ..FÅ.P.^....v..v..F..P.n....v..v 0000E0
6A006A00 6A006A00 6AFF4286 FFFF4486 FF000006 629A5016 FF42868D 1276FF14 ..v...B..P.b....ÑD..ÑB.j.j.j.j.j 000100
C4000008 AE9A006A 006A006A 006A006A 006A5016 A046805O 16FF4686 8D006A00 .j...F..P.F..Pj.j.j.j.j.j..Ù...á 000120
8D006A00 6A006A00 6AFF4286 FFFF4486 FFA276FF A476FF07 8926FF46 868B065E ^...F.&...vÊ.vÅ.ÑD..ÑB.j.j.j.j.. 000140
46805016 FF48868D 00000947 9A026868 1E9A76FF 9C76FF00 00FFFF9A 5016AA46 F¯.P......v..v..hh..G.....H..P.F 000160
08469A14 76FF1676 FFFF4286 FFFF4486 FF0E76FF 1076FF0A 76FF0C76 FF5016A6 ¦.P.v..v..v..v..ÑD..ÑB..v..v..F. 000180
E9000088 00000F11 9A9A76FF 9C76FF00 11E90375 033F8326 0E5EC418 C4830490 ...á.á^.&.?.u.Õ...v..v.......|..Õ 0001A0
44B6FFA2 76FFA476 FF0026E9 037401AE 127E8100 0AE90375 AC4608AA 468801D4 Å..F¯.F¯u.Õ...-.Û.t.Õ&..vÊ.vÅ.ÑD 0001C0
A476FF00 9EE90000 08279AA6 76FFA876 FF5016FF 48868000 6A006AFF 4286FFFF ..ÑB.j.j...H..P.v´.vl.'...Õ...vÊ 0001E0
```

Dump of file SATURN:[PCCOMMON.DUMP.DLL]ISFORM.TMP;1 on 18-APR-1990 10:47:28.98

File ID (717,16,0)   End of file block 58 / Allocated 60

Virtual block number 12 (0000000C), 512 (0200) bytes

```
04C4830A 9500469A 5016AE46 8000000A 3C9A5016 AE468000 806801A6 68A276FF .vÅhÎ.h...FÙ.P.<....FÙ.P.F....á. 000000
A876FF50 16FF4886 80006A94 76FFFF42 B6FFFF44 B6FFA276 FFA476FF 94468948 H.F..vÊ.vÅ.ÑO..Ñ8..v.j...H..P.v´ 000020
006A0030 E90375AC 56390008 E90374AA 4639A856 88A6468B 0000FFFF 9AA676FF .vÎ......FÎ.V´9F´t.Õ..9V¯u.Õ=.j. 000040
E9037500 967E8396 46890CC4 83000008 E29A006A AA76FFAC 76FF9A76 FF9C76FF .v..v..v`.v´j..ã....á..F..~..u.Õ 000060
76FFA476 FF00F8E9 00008800 00FFFF9A 9A76FF9C 76FF0004 07C7260E 5EC40019 ..á^.&ú....v..v......ı..Õ«..vÊ.v 000080
FF0003E9 00009E46 C7FA4689 00000C5E 9A006A00 6A006A00 6A016068 A076FFA2 Å.v.h'.j.j.j.j..^....F*úF...Õ... 0000A0
B6FFFF44 B6FFA276 FFA476FF 94468940 9E468800 80E90372 9E4639FA 46889E46 F..F*9F.r.Õ¯..F.ə.F..vÊ.vÅ.ÑO..Ñ 0000C0
9A76FF9C 76FF9646 8900000C 989A5016 FC468000 6A006A00 6A006A9E 76FFFF42 8..v.j.j.j.j..F•.P......F..v..v. 0000E0
88FFA0E9 0003E903 7500967E 83964689 0000FFFF 9A501698 4680FC76 FFFE76FF .vt.v•.F..P......F..~..u.Õ..Õ... 000100
96468900 000FD79A 50169446 80066AFC 76FFFE76 FF9A76FF 9C76FF00 42E99846 F.Õ8..v..v..vt.v•j..F..P.■....F. 000120
19E99646 890000FF :F9A5016 94468008 6AFC76FF FE76FF9A 76FF9C76 FF0037E9 Õ7..v..v..vt.v•j..F..P......F.Õ. 000140
9C76FFFF 42E9FFE7 E9FFCCE9 0375002B 3DFFB6E9 0375002A 3D0013E9 0016E900 .Õ..Õ..=*.u.ÕÑ.=+.u.Õä.ÕÓ.Õ8..v. 000160
0000C800 12CAC95F 5E1F0000 E9000088 000307C7 260E5EC4 00000979 9A9A76FF .v..y...á^.&ú...ı..Õ...^_èò..à.. 000180
0E980010 9A0A76FF 0C76FF02 88681E00 0207C726 0E5EC4D8 8E0D57B8 1E565700 .WV.¡W..Áá^.&ú....h...v..v...... 0001A0
FF1676FF D88E1025 881E5657 000012C8 0012CAC9 5F5E1F00 00E90000 8808C483 .á.ı..Õ...^_èò..à...WV.¡%..Å.v.. 0001C0
FF1676FF 00000077 9A5016F8 46801476 FF1676FF 00000067 9A5016FC 46801476 v..F•.P.g....v..v..F½.P.w....v.. 0001E0
```

Dump of file SATURN:[PCCOMMON.DUMP.DLL]ISFORM.TMP;1 on 18-APR-1990 10:47:28.98
File ID (717,16,0)   End of file block 58 / Allocated 60

Virtual block number 13 (0000000D), 512 (0200) bytes

```
6A006A00 6AEE76FF F076FFFC 76FFFE76 FF00000D 889A5016 EE468D12 76FF1476 v..v..FŸ.P......vt.v•.vÞ.vŸj.j.j 000000
FFFA76FF 000000F4 9A02A868 1EF876FF FA76FF00 0000E59A 5016F446 80006A00 .j..F¶.P.Ì....v*.v½.h´..¶....v*. 000020
00001004 9AF876FF FA76FFF2 46890AC4 8300000E EF9A006A F476FFF6 76FFF876 v½.v-.v¶j..ÿ....á..F·.v*.v½..... 000040
4E9A0A76 FF0C76FF 020A681E F276FF00 0407C726 0E5EC400 23E90375 00F27E83 .-·.u.Õ#.á^.&ú....v·.hO..v..v..N 000060
12CAC95F 5E1F0000 E9000088 000107C7 260E5EC4 000EE900 00880AC4 83103E00 .>..á.ı..Õ..á^.&ú...ı..Õ...^_èò. 000080
0000E900 0005759A 086A0676 FF0876FF 0A76FFD8 8E105888 1E565700 0000C800 .à...WV.¡X..Ä.v..v..v.j..u...Õ.. 0000A0
76FF086A 1276FF14 76FF1676 FFD88E11 29881E56 57000000 C80006CA C95F5E1F .^_èò..à...WV.¡)..Å.v..v..v.j..v 0000C0
C80012CA C95F5E1F 0000E900 0005A09A 0676FF08 76FF0A76 FF0C76FF 0E76FF10 ..v..v..v..v..v..Ù...Õ...^_èò..à 0000E0
76FF0876 FF000006 4F9A5016 FE468006 76FF0876 FFD88E11 4F881E56 57000006 ...WV.¡O..A.v..v..Ft.P.O....v..v 000100
76FF0876 FF000011 D79A006A 006A006A FFFF68FF FF68FFFF 68FFFF68 039E6806 .h..h..h..h..h..j.j.j..■....v..v 000120
76FF0876 FF000011 F59A006A 006A006A FFFF6812 0368FFFF 6811C868 012C6806 .h,.hù.h..h..h..j.j.j..%....v..v 000140
680676FF 0876FF00 0012159A 006A006A 006A006A 006AFFFF 68FFFF68 01366806 .h6.h..h..j.j.j.j.j.......v..v.h 000160
680676FF 0876FF00 0012359A 006A006A 006AFFFF 68122368 FFFF6812 09680140 ə.h..h..h#.h..j.j.j..5....v..v.h 000180
680676FF 0876FF00 0012519A 006A006A 016AFFFF 68FFFF68 FFFF6812 D7680148 K.h■.h..h..h..j.j.j..Q....v..v.h 0001A0
FF680159 680676FF 0876FF00 00126F9A 0042681E 016A006A 006A006A 006A0157 W.j.j.j.j.j..hB..o....v..v.hY.h. 0001C0
006A006A 015A6806 76FF0876 FF000012 809A0042 681E016A 006A006A FFFF68FF .h..j.j.j..hB.......v..v.hZ.j.j. 0001E0
```

Dump of file SATURN:[PCCOMMON.DUMP.DLL]ISFORM.TMP;1 on 18-APR-199C '0:47:28.98
File ID (717,16,0)   End of file block 58 / Allocated 60

Virtual block number 14 (0000000E), 512 (0200) bytes

```
FF68006A 006A015B 680676FF 0876FF00 0012AB9A 0042681E 006AFFFF 68FFFF68 h..h..j..hB.. ....v..v.h[.j.j.h. 000000
68FFFF68 006A006A 015C6806 76FF0876 FF000012 C99A0042 681E006A FFFF68FF .h..j..hB..è....v..v.h\.j.j.h..h 000020
006A006A FFFF6812 F5680191 680676FF 0876FF00 0012E79A 0042681E 006AFFFF ..j..hB..Ó....v..v.h..h%.h..j.j. 000040
016A006A 006AFFFF 68137168 01986806 76FF0876 FF000013 059A006A 006A016A j.j.j.......v..v.h..hq.h..j.j.j. 000060
B06801AF 6801AE68 01AD6801 A86801A6 68008068 FE76FF00 0013459A 006A006A j.j..E....vth..hÎ.h´.hU.hÛ.hE.h¯ 000080
76FF006A 006A006A 006A006A 01A66806 76FF0876 FF0000FF FF9A5016 FA468001 ..F*.P......v..v.hÎ.j.j.j.j.j..v 0000A0
FFFC76FF 006A006A 006A006A 006A01A8 680676FF 0876FF00 0013639A FA76FFFC •.v*.c....v..v.h´.j.j.j.j.j..v•. 0000C0
FFFC76FF 016A006A 006AFFFF 68139568 01AD6806 76FF0876 FF000013 839AFA76 v*......v..v.hU.h..h..j.j.j..v•. 0000E0
FFFC76FF 006A13B8 68138568 006A006A 01AE6806 76FF0876 FF000013 A39AFA76 v*.È....v..v.hÛ.j.j.hç.h¡.j..v•. 000100
FFFC76FF 006AFFFF 6813D568 006A006A 01AF6806 76FF0876 FF000013 C39AFA76 v*.ú....v..v.hE.j.j.hÎ.h..j..v•. 000120
FFFC76FF 006AFFFF 6813F168 006A006A 01B06806 76FF0876 FF000013 E39AFA76 v*.Ð....v..v.h¯.j.j.hþ.h..j..v•. 000140
006A006A FFFF680E 2068FFFF 6813F768 01B96806 76FF0876 FF000014 039AFA76 v*......v..v.h¿.h%.h..h .h..j.j. 000160
3D9A0058 681E006A 006A006A 006A006A 03866806 76FF0876 FF000014 1F9A006A j.......v..v.h..j.j.j.j.j..hX..= 000180
00145B9A 0058681E 006A006A 006AFFFF 68FFFF68 03886806 76FF0876 FF000014 ....v..v.h..h..h..j.j.j..hX..[.. 0001A0
FF000014 799A0058 681E006A FFFF68FF FF68006A 006A0389 680676FF 0876FF00 ..v..v.h..j.j.h..h..j..hX..y.... 0001C0
0876FF00 0014979A 0058681E 006AFFFF 68FFFF68 006A006A 038A6806 76FF0876 v..v.h..j.j.h..h..j..hX.......v. 0001E0
```

Dump of file SATURN:[PCCOMMON.DUMP.DLL]ISFORM.TMP;1 on 18-APR-1990 10:47:28.98

```
File ID (717,16,0)   End of file block 58 / Allocated 60

Virtual block number 15 (0000000F), 512 (0200) bytes

 76FF0876 FF000014 839A0058 681E006A FFFF68FF FF68006A 006A0388 680676FF .v.h..j.j.h..h..j..hX..*....v..v 000000
 03906806 76FF0876 FF000014 D19A006E 681E016A 006A006A 006A006A 038E6806 .h..j.j.j.j.j..hn..1....v..v.h.. 000020
 006A0391 680676FF 0876FF00 0014EF9A 006E681E 016A006A 006AFFFF 68FFFF68 h..h..j.j.j..hn..ÿ....v..v.h..j. 000040
 006A006A 03926806 76FF0876 FF0000FF FF9A006E 681E006A FFFF68FF FF68006A j.h..h..j..hn.......v..v.h..j.j. 000060
 FF68006A 006AC393 680676FF 0876FF00 0015289A 006E681E 006AFFFF 68FFFF68 h..h..j..hn..+....v..v.h..j.j.h. 000080
 006A155A 68155768 009D6806 76FF0876 FF000015 499A006E 681E006A FFFF68FF .h..j..hn..I....v..v.h..hW.hZ.j. 0000A0
 006A006A 15786815 7568009E 680676FF 0876FF00 0015679A 006A006A 006A006A j.j.j.j..g....v..v.h..hu.hx.j.j. 0000C0
 006A006A 006A1596 68159368 009C6806 76FF0876 FF000015 859A006A 006A006A j.j.j.......v..v.h..h..h..j.j.j. 0000E0
 006A006A 006A006A 15B46815 B16800A0 680676FF 0876FF00 0015A39A 006A006A j.j..È....v..v.h..hÝ.hÇ.j.j.j.j. 000100
 006A006A 006A006A 006A1502 6815CF68 00A16806 76FF0876 FF000015 C19A006A j..ê....v..v.hÀ.hü.h@.j.j.j.j.j. 000120
 B79A006A 006A006A 006A006A FFFF68FF FF68009F 680676FF 0876FF00 0015DF9A .Ô....v..v.h..h..h..j.j.j.j.j..ñ 000140
 9A5016F2 468D0676 FF0876FF D88E11B7 B81E5657 000018C8 CBC95F5E 1F000011 ....^_èùà...WV.j...À.v..v..F·.P. 000160
 06E90375 00E87E83 E8468900 00FFFF9A 5016F846 800A6A5C 6AF276FF 00001197 .....v·j\j..F%.P......FÒ.-Ò.u.Õ. 000180
 EE468D06 76FF0876 FF000004 859A5016 EA468006 76FF0876 FF0276E9 E8468800 ..FÒÕv..v..v..Fõ.P.ç....v..v..FŸ 0001A0
 E90374FE 4608FC46 88000008 7F9A5016 FC468D06 76FF0876 FF000010 789A5016 .P.x....v..v..F•.P......F•.F±t.Õ 0001C0
 10C48300 0016849A 006AFC76 FFFE76FF 271668EE 76FFF076 FF5016EC 468D0000 ...F$.P.vÞ.vYh.'.v±.v•j..Ç....6. 0001E0

Dump of file SATURN:[PCCOMMON.DUMP.DLL]ISFORM.TMP;1 on 18-APR-1990 10:47:28.98
File ID (717,16,0)   End of file block 58 / Allocated 60

Virtual block number 16 (00000010), 512 (0200) bytes

 5016F446 8D006EE9 03742BEC 7E83020B E9E8468B 0006E903 7500E87E 83E84689 .FÒ.-Ò.u.Õ...FÒÕ...-$+t.Õn..F¶.P 000000
 7E83E846 8912C483 000016F0 9A006AFC 76FFFE76 FF271468 EE76FFF0 76FF046A j...vÞ.vYh.'.v±.v•j..Þ....6..FÒ.- 000020
 76FF5016 EC468DFE 5689FC46 89F6568B F4468801 D0E9E846 8B0006E9 037500E8 Ò.u.Õ...FÒÕÀ..F¶.V-.F•.V±.F$.P.v 000040
 037500E8 7E83E846 8910C483 0001728B 9A006AFC 76FFFE76 FF271668 EE76FFF0 Þ.vYh.'.v±.v•j..+....6..FÒ.-Ò.u. 000060
 68EE76FF F076FF02 6A5016F4 468D0043 E903742A EC7E8301 94E9E846 8B0006E9 Õ...FÒÕ...-$*t.ÕC..F¶.Pj..vÞ.vYh 000080
 468B0006 E9037500 E87E83E8 468912C4 83000017 779A006A FC76FFFE [illegible]FF2714 .'.v±.v=j..w....6..FÒ.-Ò.u.Õ...F 0000A0
 468D0054 E9037429 EC7E8300 29EC46C7 FE5689FC 4689F656 8BF4468B 01[illegible]E9E8 ÕÕY..F¶.V-.F•.V±ÚF$)..-$)t.ÕT..F 0000C0
 468912C4 8300000B A69A006A FC76FFFE 76FF2714 68EE76FF F076FF02 6A5G16F4 ¶.Pj..vÞ.vYh.'.v±.v•j..Ì....6..F 0000E0
 21EC46C7 FE5689FC 4689F656 8BF4468B 010DE9E8 468B0006 E9037500 E87E83E8 Ò.-Ò.u.Õ...FÒÕ...F¶.V-.F•.V±ÚF$I 000100
 04C48318 0E117F9A 0676FF08 76FF0000 FFFF9AFC 76FFFE76 FF0676FF 0876FF00 ..v..v..v±.v=.......v..v.......6. 000120
 F876FFFA 76FF0676 FF0876FF 08C48317 EC0C5D9A 0676FF08 76FFF876 FFFA76FF .v*.v%.v..v..].$..6..v..v..v*.v% 000140
 68FFFF68 0676FF08 76FF0000 FFFF9AFF FF6817FD 680676FF 0876FF00 00FFFF9A ......v..v.h».h........v..v.h..h 000160
 30680676 FF0876FF 0000FFFF 9AFFFF68 181F6806 76FF0876 FF0000FF FF9AFFFF ........v..v.h..h........v..v.h0 000180
 0676FF08 76FF0000 FFFF9AFF FF6811C5 680676FF 0876FF00 00FFFF9A FFFF6818 .h........v..v.hé.h........v..v. 0001A0
 76FFF276 FFEA76FF 0000FFFF 9A006A00 6A0676FF 0876FF00 00FFFF9A 006A006A j.j.......v..v.j.j.......võ.v·.v 0001C0
 0000FFFF 9A505200 0605FA56 8BF8468B FC76FFFE 76FFEE76 FFF076FF EE76FFF0 Þ.vY.vÞ.vY.v±.v•.F%.V*...RP..... 0001E0

Dump of file SATURN:[PCCOMMON.DUMP.DLL]ISFORM.TMP;1 on 18-APR-1990 10:47:28.98
File ID (717,16,0)   End of file block 58 / Allocated 60

Virtual block number 17 (00000011), 512 (0200) bytes

 5F5E1F00 00E90000 FFFF9A02 0036FF26 1B8A068E 01006806 76FF0876 FFE84689 .FÒ.v..v.h......&.6.......Õ...^_ 000000
 2C020500 00000117 8B000200 53000616 11020305 E1000112 F8000500 7404CAC9 èÒ.t...%...Å.......S...Ê......., 000020
 EF000500 00000217 CF000201 CF000700 B8020305 96000E05 F9020305 44000E12 ...D...*.......Ê...Ù...Ù.......ý 000040
 8C020305 18000E11 71020303 AA000B12 84020503 D0000B14 8802020B 48000217 ...H.......i.......`...q........ 000060
 33020300 00000411 01000202 58000702 5E020301 55000717 F2020302 CC00080F ...a...·...U...^...X..........3 000080
 F0000204 DC000E11 A5020203 84000B12 C0020503 E7000B14 60020200 D9000716 ...1...m...Ó...à...Ç...É...É...Þ 0000A0
 03020304 DC000E11 A8020502 DA00080E 38020303 48000A07 75020300 00000615 .......u...H...8...Ö...´...É.... 0000C0
 67020305 2E000E05 4F020300 65000718 96020303 F1000B14 C1020201 64000718 ...d...è...þ.......e...O.......g 0000E0
 73020300 7F00040F 30010303 BE000B12 A2020500 E600070A 4C020304 AE000E07 ...Ù...L...Ì...Å.../...O.......s 000100
 E5020200 04000403 D7010305 83000112 0C000504 FF000111 CE000501 E700070F ...Ó...ö...............■.......Ì 000120
 30020506 07000113 74000500 8700040E 8F010305 AE000F18 7C020305 60000E11 ...m...|...Ù...........t.......0 000140
 3F020303 89000118 33000503 FD000B14 E3020203 59000A07 85020303 C8000B14 ...à.......Y...D...»...3.......? 000160
 E8020502 ED000801 D2020300 74000710 88020304 F2000E11 A8020202 72000703 ...r...........t...@...Ù...Ò 000180
 02020301 F8000710 A9020301 77000718 45020300 F7000715 0D020305 60000E11 ...m.......¥...E...w...`...%.... 0001A0
 1F020203 D3000814 52020500 13000403 BF010304 F2000E11 AE020505 B9000F08 ...¿...Û...·...«.......R...Æ.... 0001C0
 8E020503 60000A07 29020302 FD000801 BF020303 8C000815 39020204 08000B15 .......9.......«...»...)...m.... 0001E0

Dump of file SATURN:[PCCOMMON.DUMP.DLL]ISFORM.TMP;1 on 18-APR-1990 10:47:28.98
```

```
File ID (717,16,0)   End of file block 58 / Allocated 60

Virtual block number 18 (00000012), 512 (0200) bytes

D9020301 88000717 E1020301 08000718 54020304 13000815 01020203 DD000E14 ...\...........T.......Å.......\ 000000
F1020303 E7000814 70020500 8A000716 00020311 21000113 F4000505 C9000F0A ...è...¶...!...........p...Ô...þ 000020
5F020200 A9000118 11000502 1100070E C402030C 08000218 00000503 78000A07 ...x...........á...........`..._ 000040
88020301 9700070- C7020301 16000718 25020305 5C000E04 F1020303 9F000812 .......þ...\...X.......ú.......ī 000060
26000503 AA000812 81020203 F1000814 C4020500 99000716 53020302 90000810 .......S.......á...þ.......¯...& 000080
3E020305 B8000112 DA000503 13000916 79020302 88000118 22000505 37000112 ...7...".......y.......Ö...£...> 0000A0
14020305 E6000F0A 81020303 FD000814 E6020502 9C000810 DC020302 24000702 ...$...É.......Ì...»...Ý...Ì.... 0000C0
FA000501 A800070E 76020300 A9000716 43020303 84000812 8D020201 26000718 ...&...§...Ç...C...`...v...¨...* 0000E0
3C020503 BE000812 9F020204 08000815 22020503 20000909 68020311 47000113 ...G...h... ..."...........ƒ...< 000100
98000501 36000717 AE020305 F5000F08 4C020300 85000710 68020303 8C000815 .......h...ç...L...%...Û...6.... 000120
B9020305 83000E05 29020301 8A000713 27020310 50000113 D8000500 4F000113 ...O...Á...P...'...¤...).......¿ 000140
1F020304 05000111 C8000503 C8000814 20020204 13000815 04020502 8300080F ...°...........-...à...à...ſ.... 000160
36020305 44000E12 29020205 0A000E11 39020303 31000910 C8020302 3E000703 ...>...ù...1...9.......)...D...6 000180
62020503 D3000814 4F020205 50000112 06000500 C5000701 A8020301 44000718 ...D...¨...é.......)...O...£...b 0001A0
FF0C76FF D88EFFFF 881E5657 00000AC8 00000000 00000000 00000003 9F000812 .................à...WV.¡...Ä.v.. 0001C0
8DF676FF F876FF00 00FFFF9A 5016F646 8DFA76FF 0000FFFF 9A5016FA 46800A76 v..F*.P......v*.F-.P......v½.v-. 0001E0

Dump of file SATURN:[PCCOMMON.DUMP.DLL]ISFORM.TMP;1 on 18-APR-1990 10:47:28.98
File ID (717,16,0)   End of file block 58 / Allocated 60

Virtual block number 19 (00000013), 512 (0200) bytes

B80006E9 03751056 390008E9 03740E46 39FE5688 FC468800 00FFFF9A 5016FC46 F•.P......F•.V±9F.t.Ô..9V.u.Ô..¡ 000000
57000014 C8C8C95F 5E1F0000 E9FFFF04 D59A012C 68F676FF F876FF00 11E90000 ..Ô...v½.v-h,..f...Ô...^_èùà...W 000020
9A5016EC 468DF676 FF000000 189A5016 F6468D0A 76FF0C76 FFD88E00 08881E56 V.¡...Á.v..v..F-.P......v̄-.F$.P. 000040
9A5016F2 468DEC76 FFEE76FF 00000035 9A5016FC 468DEC76 FFEE76FF 00000025 %....vŸ.vš.F•.P.5....vŸ.vš.F·.P. 000060
83F04689 0000FFFF 9A5016F8 468D0C6A FC76FFFE 76FF0A76 FF0C76FF 0000FFFF .....v..v..v±.v•j..F½.P......Fþ. 000080
88002DE9 0000FFFF 9A040768 03EE68F0 76FFF276 FFF476FF 0017E903 7500F07E -þ.u.Ô...v¶.v·.vþhŸ.h.......Ô-.. 0000A0
76FFEE76 FF0011E9 00008800 06E90375 10563900 08E90374 0E4639FA 5688F846 F½.V*9F.t.Ô..9V.u.Ô..¡..Ô...vŸ.v 0000C0
0C76FFD8 8E007388 1E565700 0010C8C8 C95F5E1F 0000E900 6105379A 014868EC $hK..7.a.Ô...^_èùà...WV.¡s..Á.v. 0000E0
F076FFF2 76FF0000 00909A50 16F0468D FA76FF00 0000839A 5016FA46 8D0A76FF .v..F*.P......v̄*.Fþ.P......v·.vþ 000100
00C89A50 16F6468D 006AFC76 FFFE76FF 0A76FF0C 76FF0000 00A09A50 16FC468D .F•.P......v..v..v±.v•j..F-.P.à. 000120
11E90000 B80006E9 03751056 390008E9 03740E46 39F85688 F64688F4 46890000 ...F¶.F-.V½9F.t.Ô..9V.u.Ô..¡..Ô. 000140
29881E56 5700000A C8C8C95F 5E1F0000 E9011705 5D9A0140 68F076FF F276FF00 ..v·.vþhə..]...Ô...^_èùà...WV.¡) 000160
00000146 9A5016F6 468DFA76 FF000001 399A5016 FA468D0A 76FF0C76 FFD88E01 ..Ä.v..v..F*.P.9....v̄*.F-.P.F... 000180
56390008 E903740E 4639FE56 88FC4688 00000156 9A5016FC 468DF676 FFF876FF .v½.v-.F•.P.V....F•.V±9F.t.Ô..9V 0001A0
E9000088 0006E903 75145639 0008E903 74124639 FE5688FC 4688001C E9037510 .u.Ô...F•.V±9F.t.Ô..9V.u.Ô..¡..Ô 0001C0
881E5657 00001AC8 C8C95F5E 1F0000E9 0000FFFF 9A015968 F676FFF8 76FF0011 ...v½.v-hY......Ô...^_èùà...WV.¡ 0001E0

Dump of file SATURN:[PCCOMMON.DUMP.DLL]ISFORM.TMP;1 on 18-APR-1990 10:47:28.98
File ID (717,16,0)   End of file block 58 / Allocated 60

Virtual block number 20 (00000014), 512 (0200) bytes

0001CC9A 5016E646 8DF276FF 000001BF 9A5016F2 46800A76 FF0C76FF D88E01AF £..Ä.v..v..F·.P.¢....v·.f|.P.ä.. 000000
0000809A 5016EE46 8DE676FF E876FF00 0001DC9A 5016F846 8DE676FF E876FF00 ..vò.v|.F½.P.£....vò.v|.FŸ.P.¯.. 000020
C4830000 FFFF9A00 6AF876FF FA76FF27 13680A76 FF0C76FF 076A5016 FC468000 ..F•.Pj..v..v.h.'.v*.v½j.......á 000040
00EC46C7 F44689F6 46890000 8800A6E9 EA468800 06E90375 00EA7E83 EA468912 ..Fõ.-õ.u.Ô...FõÔ|.¡...F-.F¶úF$. 000060
C1EC5E88 003CE903 75024008 26008826 FC76C402 E3C1EC5E 88EC46FF 0003E900 .Ô...F$.^šèD.áv•&..&.ə.u.Ô<..^šè 000080
C1EC5E88 0019E903 74025039 260022E9 03740039 26105688 0E4688FC 76C402E3 D.áv•.F..V.&9.t.Ô".&9P.t.Ô...^šè 0000A0
76FFFC76 FFFE76FF FFACE900 03E9F656 89F44689 02508826 008826FC 76C402E3 D.áv•&..&.P..F¶.V-Ô..Ô¯..v±.v•.v 0000C0
E90374F6 460BF446 8810C483 0000028A 9A006A0E 76FF1076 FF271568 0A76FF0C ..v.h.'.v..v.j.......á..F¶.F-t.Ô 0000E0
0AC8C8C9 5F5E1F00 00E90000 021C9A01 5968E676 FFE876FF 0011E900 00880006 ..¡..Ô...vÒ.v|hY......Ô...^_èùà. 000100
F6468DFA 76FF0000 '2409A50 16FA468D 0A76FF0C 76FFD88E 0230881E 56570000 ..WV.¡0..Á.v..v..F*.P.ə....v̄*.F- 000120
0E4639FE 5688FC46 88000002 5D9A5016 FC468DF6 76FFF876 FF000002 4D9A5016 .P.M....v½.v-.F•.P.]....F•.V±9F. 000140
03751456 390008E9 03741246 39FE5688 FC468800 1CE90375 10563900 08E90374 t.Ô..9V.u.Ô...F•.V±9F.t.Ô..9V.u. 000160
C8C8C95F 5E1F0000 E9019005 889A0191 68F676FF F876FF00 11E90000 B80006E9 Ô..¡..Ô...v½.v-h...£...Ô...^_èùà 000180
468DF276 FF000003 669A5016 F246800A 76FF0C76 FFD88E03 56881E56 57000014 ...WV.¡V..Á.v..v..F·.P.f....v̄·.F 0001A0
FF046A50 16FC4680 00000383 9A5016F4 468DEC76 FFEE76FF 00000373 9A5016EC $.P.s....vŸ.vš.F¶.P......F•.Pj.. 0001C0
7500F07E 83F04689 12C48300 0004629A 006A0E76 FF1076FF 2713680A 76FF0C76 v..v.h.'.v..v.j..b....á..Fþ.-þ.u 0001E0

Dump of file SATURN:[PCCOMMON.DUMP.DLL]ISFORM.TMP;1 on 18-APR-1990 10:47:28.98
```

File ID (717,16,0)   End of file block 58 / Allocated 60

Virtual block number 21 (00000015), 512 (0200) bytes

```
FC76FFFE 76FFFA56 89FB4689 02578B26 078B26FC 5EC4005C E9F0468B 0006E903 .Ô...FÞÒ\.á^=&..&.W..F½.V°.v±.v= 000000
39FA5688 F8468810 C4830000 03209A00 6A0E76FF 1076FF27 15680A76 FF0C76FF .v..v.h.'.v..v.j.. ....á..F½.V°9 000020
B89A0191 68EC76FF EE76FF00 11E90000 880006E9 0375F656 390008E9 0374F446 F¶t.Ô..9V-u.Ô..¡..Ô...vŸ.všh...£ 000040
FA46800A 76FF0C76 FFD88E03 D7B81E56 5700000A C8CBC95F 5E1F0000 E903C505 .é.Ô...^_èùà...WV.¡=..Ä.v..v..F° 000060
9A5016FC 4680F_76 FFF876FF 000003F4 9A5016F6 4680FA76 FF000003 E79A5016 .P.Ô....v°.F-.P.¶....v½.v-.F=.P. 000080
FE5688FC 4688001C E9037510 56390008 E903740E 4639FE56 8BFC4688 00000404 .....F=.V±9F.t.Ô..9V.u.Ô...F=.V± 0000A0
9A019868 F676FFF8 76FF0011 E9000088 0006E903 75145639 0008E903 74124639 9F.t.Ô..9V.u.Ô..¡..Ô...v½.v-h... 0000C0
46800A76 FF0C76FF D88E04A3 B81E5657 000010C8 CBC95F5E 1F0000E9 049105E1 Å...Ô...^_èùà...WV.¡È..Á.v..v..F 0000E0
5016FC46 8DF076FF F276FF00 0004C09A 5016F046 8DFA76FF 00000483 9A5016FA °.P.°....v°.FÞ.P.á....v·.vÞ.F=.P 000100
04219A00 6A0E76FF 1076FF27 14680A76 FF0C76FF 036A5016 F6468D00 0004D09A .Å....F-.Pj..v..v.h.'.v..v.j..!. 000120
FC4639F8 568BF646 8B002DE9 F4468B00 06E90375 00F47E83 F4468912 C4830000 ...á..F¶.-¶.u.Ô...F¶Ô-..F-.V½9F= 000140
1205E19A 019868F0 76FFF276 FF0011E9 00008800 06E90375 FE563900 08E90374 t.Ô..9V±u.Ô..¡..Ô...v·.vÞh...Å.. 000160
5016F246 800A76FF 0C76FFD8 8E0524B8 1E565700 0014C8CB C95F5E1F 0000E905 .Ô...^_èùà...WV.¡$..Á.v..v..F·.P 000180
05519A50 16FC4680 EC76FFEE 76FF0000 05419A50 16EC4680 F276FF00 0005349A .4....v·.Fš.P.A....vŸ.vš.F=.P.Q. 0001A0
83000005 6E9A006A FC76FFFE 76FF2713 680A76FF 0C76FF12 6A5016F4 46800000 ...F¶.Pj..v..v.h.'.v±.v=j..n.... 0001C0
46890257 8B26078B 26F45EC4 005CE9F0 46880006 E9037500 F07E83F0 468912C4 á..FÞ.-Þ.u.Ô...FÞÒ\.á^¶&..&.W..F 0001E0
```

Dump of file SATURN:[PCCOMMON.DUMP.DLL]ISFORM.TMP;1 on 18-APR-1990 10:47:28.98
File ID (717,16,0)   End of file block 58 / Allocated 60

Virtual block number 22 (00000016), 512 (0200) bytes

```
00000608 9A006AFC 76FFFE76 FF271568 0A76FF0C 76FFF476 FFF676FF FA5689F8 ½.V°.v-.v¶.v..v.h.'.v±.v=j...... 000000
FF0011E9 00008800 06E90375 FA563900 08E90374 F8463910 568B0E46 8B10C483 .á..F..V.9F½t.Ô..9V°u.Ô..¡..Ô... 000020
8E05C188 1E565700 0018C8CB C95F5E1F 0000E905 AF06079A 01AD68EC 76FFEE76 vŸ.všhÙ....£.Ô...^_èùà...WV.¡è.. 000040
76FF0000 05DE9A50 16E8468D EE76FF00 0005D19A 5016EE46 8D0A76FF 0C76FFD8 Ä.v..v..FŸ.P.!....vŸ.FÒ.P.B....v 000060
76FF2713 680A76FF 0C76FF12 6A5016F4 46800000 05EE9A50 16FC468D E876FFEA ô.vÒ.F=.P.Ÿ....F¶.Pj..v..v.h.'.v 000080
007FE9EC 46880006 E9037500 EC7E83EC 468912C4 83000007 189A006A FC76FFFE ±.v=j.......á..Fš.-š.u.Ô...F$Ô.. 0000A0
FF271568 0A76FF0C 76FFF476 FFF676FF FA5689F8 46890257 8B26078B 26F45EC4 á^¶&..&.W..F½.V°.v-.v¶.v..v.h.'. 0000C0
FF271468 0A76FF0C 76FF026A 5016F046 8D10C483 00000738 9A006AFC 76FFFE76 v±.v=j..8....á..FÞ.Pj..v..v.h.'. 0000E0
0008E903 74F84639 F2568BF0 468BEC46 8912C483 0000064C 9A006A0E 76FF1076 v..v.j..L....á..Fš.FÞ.V·9F½t.Ô.. 000100
1F0000E9 067B0607 9A01AD68 E876FFEA 76FF0011 E9000088 0006E903 75FA5639 9V°u.Ô..¡..Ô...võ.vÒhÙ....(.Ô... 000120
0000069D 9A5016FA 46800A76 FF0C76FF D88E0680 B81E5657 000010C8 CBC95F5E ^_èùà...WV.¡...Ä.v..v..F°.P..... 000140
0C76FF00 0006BA9A 5016FC46 8DF076FF F276FF00 0006AA9A 5016F046 8DFA76FF .v°.FÞ.P.¨....v·.vÞ.F=.P.¤....v. 000160
4639F856 8BF6468B F4468900 00016E9A 5016F646 80086AFC 76FFFE76 FF0A76FF .v..v±.v=j..F-.P.n....F¶.F-.V½9F 000180
11219A01 B968F076 FFF276FF 0011E900 00B80006 E9037510 56390008 E903740E .t.Ô..9V.u.Ô..¡..Ô...v·.vÞh¿..!. 0001A0
16FA4680 0A76FF0C 76FFD88E 077CB81E 56570000 0AC8CBC9 5F5E1F00 00E9076A j.Ô...^_èùà...WV.¡|..Ä.v..v..F°. 0001C0
A99A5016 FC468DF6 76FFF876 FF000007 999A5016 F6468DFA 76FF0000 078C9A50 P......v°.F-.P......v½.v-.F=.P.` 0001E0
```

Dump of file SATL N:[PCCOMMON.DUMP.DLL]ISFORM.TMP;1 on 18-APR-1990 10:47:28.98
File ID (717,16,L,   End of file block 58 / Allocated 60

Virtual block number 23 (00000017), 512 (0200) bytes

```
39FE5688 FC468800 1CE90375 10563900 08E90374 0E4639FE 5688FC46 88000007 ....F=.V±9F.t.Ô..9V.u.Ô...F=.V±9 000000
FF9A0388 68F676FF F876FF00 11E90000 880006E9 03751456 390008E9 03741246 F.t.Ô..9V.u.Ô..¡..Ô...v½.v-h.... 000020
F646800A 76FF0C76 FFD88E08 02B81E56 5700001A C8CBC95F 5E1F0000 E90000FF ...Ô...^_èùà...WV.¡...Ä.v..v..F- 000040
9A5016FC 468DE676 FFE876FF 0000081F 9A5016E6 4680F676 FF000008 129A5016 .P......v-.F|.P......vÒ.v|.F=.P. 000060
76FF0C76 FF0F6A50 16EC468D 0000026D 9A5016F2 4680E676 FFE876FF 0000082F /....vÒ.v|.F·.P.m....F&.Pj..v..v 000080
0006E903 7500EA7E 83EA4689 12C48300 0006D79A 006AFC76 FFFE76FF 2713680A .h.'.v±.v=j..a....á..Fõ.-õ.u.Ô.. 0000A0
02E3C1F0 5E8BF046 FF0003E9 0000F046 C7F84689 FA468900 008800A6 E9EA468B .FõÔ!.¡...F°.F½úFÞ..Ô...FÞ.^ÞèÐ. 0000C0
39261056 8B0E4688 EC76C402 E3C1F05E 88003CE9 03750240 08260088 26EC76C4 ávš&..&.ä.u.Ô<..^ÞèÐ.ávš.F..V.&9 0000E0
8902508B 26008B26 EC76C402 E3C1F05E 880019E9 03740250 39260022 E9037400 .t.Ô".&9P.t.Ô...^ÞèÐ.ávš&..&.P.. 000100
0E76FF10 76FF2715 680A76FF 0C76FFEC 76FFEE76 FFFFACE9 0003E9FA 5689F846 F½.V°Ô..Ô˘..vŸ.vš.v..v.h.'.v..v. 000120
76FFE876 FF0011E9 00008800 06E90374 FA4608F8 468810C4 83000008 0D9A006A j..Ÿ....á..F½.F°t.Ô..¡..Ô...vÒ.v 000140
0C76FFD8 8E0883B8 1E565700 000AC8CB C95F5E1F 0000E900 00086F9A 038868E6 |h...o...Ô...^_èùà...WV.¡...Ä.v. 000160
F676FFF8 76FF0000 08A09A50 16F6468D FA76FF00 0008939A 5016FA46 8D0A76FF .v..F°.P......v°.F-.P......v½.v- 000180
001CE903 75105639 0008E903 740E4639 FE5688FC 46880000 08809A50 16FC468D .F=.P.¯....F=.V±9F.t.Ô..9V.u.Ô.. 0001A0
FFF876FF 0011E900 00880006 E9037514 56390008 E9037412 4639FE56 8BFC4688 .F=.V±9F.t.Ô..9V.u.Ô..¡..Ô...v½. 0001C0
76FFD88E 09A9B81E 56570000 1AC8CBC9 5F5E1F00 00E90000 FFFF9A03 9068F676 v-h.......Ô...^_èùà...WV.¡˙..A.v 0001E0
```

Dump of file SATURN:[PCCOMMON.DUMP.DLL]ISFORM.TMP;1 on 18-APR-1990 10:47:28.98

File ID (717,16,0)   End of file block 58 / Allocated 60

Virtual block number 24 (00000018), 512 (0200) bytes

```
76FFE876 FF000009 C69A5016 E64680F6 76FF0000 09B99A50 16F64680 0A76FF0C ..v..F~.P.¿....v~.Fl.P.6....vÒ.v 000000
5016EC46 8D000008 C09A5016 F24680E6 76FFE876 FF000009 D69A5016 FC4680E6 |.F=.P.ø....vÒ.vl.F·.P.à....F$.P 000020
7E83EA46 8912C433 0000081A 9A006AFC 76FFFE76 FF271368 0A76FF0C 76FF086A j..v..v.h.'.v±.v=j.......á..Fõ.- 000040
46FF0003 E90000F0 46C7F846 89FA4689 00008800 A6E9EA46 880006E9 037500EA õ.u.Õ...FõÒl.¡...F°.F½úFÞ..Õ...F 000060
88EC76C4 02E3C1F0 5E88003C E9037502 40082600 8826EC76 C402E3C1 F05E88F0 Þ.^ÞèÐ.ávš&..&.ə.u.Õ<..^ÞèÐ.ávš. 000080
26EC76C4 02E3C1F0 5E880019 E9037402 50392600 22E90374 00392610 56880E46 F..V.&9.t.Õ".&9P.t.Õ...^ÞèÐ.ávš& 0000A0
15680A76 FF0C76FF EC76FFEE 76FFFFAC E90003E9 FA5689F8 46890250 88260088 ..&.P..F½.V°Õ..Õ¯..vŸ.vš.v..v.h. 0000C0
E9000088 0006E903 74FA4608 F8468810 C4830000 09739A00 6A0E76FF 1076FF27 '.v..v.j..s....á..F½.F°t.Õ..¡..Õ 0000E0
881E5657 00000ACA CBC95F5E 1F0000E9 00000A16 9A039068 E676FFE8 76FF0011 ...vÒ.vlh.......Õ...^_èùà...WV.¡ 000100
1076FF00 3AE9037· 0C087E83 0000FFFF 9A5016F8 46800E76 FF1076FF D88E0A2A °..Å.v..v..F½.P......~..t.Õ:..v. 000120
03740C56 390016E9 03740A46 39FE5688 FC468800 000A579A 5016FC46 800E76FF .v..F=.P.W....F=.V±9F.t.Õ..9V.t. 000140
C4000107 C726F85E C4005AE9 00008800 00FFFF9A 039E680E 76FF1076 FF000EE9 Õ...v..v.h.......¡..ÕZ.á^½&ú...á 000160
7E83F646 890000FF FF9A0676 FF0876FF 0A76FF0C 76FF0277 FF260477 FF26F85E ^½&.w.&.w..v..v..v..v.......F~.- 000180
0000FFFF 9A0676FF 0A76FF0C 76FF0677 FF260877 FF26F85E C4001CE9 037400F6 -.t.Õ..á^½&.w.&.w..v..v..v...... 0001A0
881E5657 000006C8 000CCAC9 5F5E1F00 00E9F646 88000007 C726F85E C4F64689 .F-á^½&ú....F-Õ...^_èò..à...WV.¡ 0001C0
26FC5EC4 000107C7 26FC5EC4 00000860 9A5016FC 46800E76 FF1076FF D88E0850 P..Å.v..v..F=.P.'...á^=&ú...á^=& 0001E0
```

Dump of file SATURN:[PCCOMMON.DUMP.DLL]ISFORM.TMP;1 on 18-APR-1990 10:47:28.98
File ID (717,16,0)   End of file block 58 / Allocated 60

Virtual block number 25 (00000019), 512 (0200) bytes

```
000007C7 26FC5EC4 FA468900 0008EC9A 0676FF0A 76FF0C76 FF0677FF 260877FF .w.&.w..v..v..v..$....F°á^=&ú... 000000
800676FF 0876FF08 8E0C1088 1E565700 0006C800 0CCAC95F 5E1F0000 E9FA4688 .F°Õ...^_èò..à...WV.¡....Å.v..v.. 000020
FFFC76FF FE76FF00 00FFFF9A 5016FA46 800676FF 0876FF00 00FFFF9A 5016FE46 F±.P......v..v..F°.P......v±.v=. 000040
6A216A02 77FF2604 ,7FF260A 5EC40000 FFFF9A50 52000205 0C56880A 4688FA76 v°.F..V....RP.....á^.&.w.&.w.j!j 000060
00000CE6 9AFFFF68 0CE06801 6A216A02 77FF2604 77FF260A 5EC40000 FFFF9A0C ......á^.&.w.&.w.j!j.hÅ.h...l... 000080
77FF260A 5EC40000 G0369AFF FF680CF6 68026A1D 6A0277FF 260477FF 260A5EC4 á^.&.w.&.w.j.j.h-.h...6...á^.&.w 0000A0
68076A21 6A0277FF 260477FF 260A5EC4 00000E20 9AFFFF68 00106802 77FF2604 .&.w.h..h... ...á^.&.w.&.w.j!j.h 0000C0
68026A0A 6A0277FF 260477FF 260A5EC4 00000056 9AFFFF68 00306800 19680016 ..h..h0.h...V...á^.&.w.&.w.j.j.h 0000E0
68005368 00506804 6A216A02 77FF2604 77FF260A 5EC40000 00709AFF FF68004A J.h...p...á^.&.w.&.w.j!j.hP.hS.h 000100
9AFFFF68 00846801 6A1F6A02 77FF2604 77FF260A 5EC40000 00909AFF FF68006A j.h.......á^.&.w.&.w.j.j.h..h... 000120
9AFFFF68 00A46800 8068008A 68056A21 6A0277FF 260477FF 260A5EC4 000000AA `...á^.&.w.&.w.j!j.h..h..h£.h... 000140
5EC40000 0E5A9AFF FF6800BE 68016A1F 6A0277FF 260477FF 260A5EC4 000000CA ò...á^.&.w.&.w.j.j.hƒ.h...Z...á^ 000160
5EC40000 0DEA9A00 E168000E 6800C768 00C46803 6A296A02 77FF2604 77FF260A .&.w.&.w.j)j.há.hú.h8.hÅ..õ...á^ 000180
5EC40000 0E0A9AFF FF6800FE 6800E768 00E46804 6A296A02 77FF2604 77FF260A .&.w.&.w.j)j.hÒ.hÒ.h±.h.......á^ 0001A0
5EC40000 0E409AFF FF680E1A 680E0768 0E046803 6A2A6A02 77FF2604 77FF260A .&.w.&.w.j°j.h..h..h..h...ə...á^ 0001C0
6A0277FF 260477FF 260A5EC4 0000FFFF 9AFFFF68 0E346802 77FF2604 77FF260A .&.w.&.w.h4.h.......á^.&.w.&.w.j 0001E0
```

Dump of file SATURN:[PCCOMMON.DUMP.DLL]ISFORM.TMP;1 on 18-APR-1990 10:47:28.98
File ID (717,16,0)   End of file block 58 / Allocated 60

Virtual block number 26 (0000001A), 512 (0200) bytes

```
6A0277FF 260477FF 260A5EC4 00000E7A 9AFFFF68 0E54680E 30680E3A 680F6A21 !j.h:.h=.hT.h...z...á^.&.w.&.w.j 000000
0E746808 6A216A02 77FF2604 77FF260A 5EC40000 0E949AFF FF680E6E 68026A00 .j.hn.h.......á^.&.w.&.w.j!j.ht. 000020
FFFF6802 6A156A02 77FF2604 77FF260A 5EC40000 FFFF9AFF FF680E8E 680E7768 hw.h..h.......á^.&.w.&.w.j.j.h.. 000040
02030000 000107F0 00020028 90C8C95F 5E1F0000 E9000088 0000FFFF 9AFFFF68 h.......¡..Õ...^_èù.(...Þ....... 000060
000203CF 0002006D 0005034E 00020D40 00050000 00020CC6 00020424 000C0C9E ....$...ó.......Ñ...N...m...ü... 000080
020300E6 00070C20 020304AE 000E00E8 0203043B 000C0CCC 02030000 00060C65 e.......ä...;...Ò...Û... ...l... 0000A0
000504C0 000E0CB2 0203044C 000C0CFC 02030068 00020CE3 000503C8 00080995 ....à...D...k...•...L...ý...à... 0000C0
0005045F 000C08C7 0203087B 00020E57 000507FA 00020E37 00050774 00020E1D ....t...7...°...W...(...ú... ... 0000E0
020303F1 000B083C 02030685 00020E01 0005008A 00070C75 02030000 00020CC9 è.......u...............<...β... 000100
02030472 000C001C 020305D9 000F0C41 02030099 00070879 0203040C 000E089D ....É...y.......A...l.......r... 000120
000509A1 00020E71 0005051C 000200A7 0005049B 00020087 00050313 00090A84 ...................Ï.......q...À... 000140
000502A7 00080A3A 02030A22 00020E91 000500A9 00070C85 02030121 00?20CF9 °...!.......`.......".........Ï... 000160
0005039F 00080342 02030085 00070A67 02030228 00020033 000501A7 000. 013 ....Ï...3...(...g...ç...B....... 000180
00000000 00000000 000002BF 000807C1 02030492 00000A47 02030589 0002L C1 è...¿...G.......è...¢........... 0001A0
00000000 00000000 00000500 02000200 01CB0001 881F0200 3E89D88E FFFFB61E .¡...Å.>...¡..ù................. 0001C0
8ED88CFE 880A76C5 1EDE8807 88EC8855 00000000 00000000 00000000 00000000 ................U.š.ª.B.év..±.Å. 0001E0
```

Dump of file SATURN:[PCCOMMON.DUMP.DLL]ISFORM.TMP;1 on 18-APR-1990 10:47:28.98

File ID (717,16,0)    End of file block 58 / Allocated 60

Virtual block nu ner 27 (0000001B), 512 (0200) bytes

88F38BA4 F3C913A5 F3E9D149 A4027401 A8C78806 7EC4D1F7 AEF2FFFF B9C033C0 à3à¿...ÜK1á-..ú´.t.ÉIIÖµÉ.èµÉ.µ. 000000
0E468DFA 568CF846 89EC4680 56570000 16C8000C 7BE9000C 7FE9C85D C28C1FFA *..ò]ùÕ...Õ(..à...WV.F$.F½.V*.F. 000020
26078926 08578926 06478926 08568806 4688420A 47C626F8 5EC4FE56 8CFC4689 .F•.V±á^½&6G.B.F..V.&.G.&.W.&..& 000040
C4F08B0C C48300C3 02449A53 060A76FF 0C76FFFC 76FF167F FF0447C7 26025789 .W.&úG.....v•.v..v..S.D.ú..á..Þá 000060
006A53FA 76FF9-0F EB058826 02478E26 07FF263F 8B26C02A 1278044F FF26F85E ^½&.O.x.*à&.7&..&.G.&..Š...v*Sj. 000080
FA4689E4 2A0B478A 26085EC4 56570000 08C8C8C9 5F5EC688 06C483FF FF00CE9A .ö....á..ó^.èùà...WVá^.&.G.*ð.F* 0000A0
0774830A 47F626F8 46891340 05E0D1C1 03E0D1C8 88F9F700 0C899907 4C2DC38B .ú·L..¿..%*.àiÁ.èiÁ.ä..F½&-G..t. 0000C0
0E74010A 47F62608 5EC49001 2BE9FFFF 88200A4F 8026085E C40F7440 0A47F626 &-G.ät.á^.&.O. ¡..Ö+..á^.&-G..t. 0000E0
F0880447 8926C02B EF0A6780 26020A4F 802690E2 EB000004 47C72620 0A4F8026 &.O. &úG...Šä.&.O..&.g.ý+ä&.G..Þ 000100
81377501 134087F6 060868F9 F7000C89 99074C20 C3884C75 0C0A47F6 26FC7689 .v•&-G..uL.ú·L..¿..%*kA.-.ä..u7. 000120
829AFA76 FF0F75FF FF0A7E81 16750764 087E810E 7401770A 7E810775 0758087E ~.X.u..~.w.t..~.d.u..~...u..v*.ý 000140
1575080A 47F62608 5EC404C4 830CA7E8 0876FF0A 76FF0C75 C00B02C4 8301EA10 .ö..á..äu..v..v.Öl..á.á^.&-G..u. 000160
2606772B 26378826 085E8867 74011340 87F60608 68F9F700 0C899907 4C20C38B .ú·L..¿..%*kA.-.ä..tg.^.&.7&+w.& 000180
5256167E F6080447 89264802 458BF87E 88025789 26078926 40085788 2606478B .G.&.W.ä&..&.W..-½.E.H&.G..--.VR 0001A0
026A0F74 20195187 F6FA5E88 19E8FC46 8908C483 02080F02 9AFA76FF 0677FF26 &.w..v*......á..F•Š..^*-.O. t.j. 0001C0
560001BE 17E80788 2606468A 065FC426 085EC408 C483022B 0EC49A53 006A006A j.j.S.á.+..á.á^.&á_..F.&..Š./..V 0001E0

Dump of file SATURN:[PCCOMMON.DUMP.DLL]ISFORM.TMP;1 on 18-APR-1990 10:47:28.98
File ID (717,16,0)    End of file block 58 / Allocated 60

Virtual block number 28 (0000001C), 512 (0200) bytes

E42A0646 8AFECCE9 0374FC76 39FC4689 08C48300 980F029A FA76FF50 1606468D .F..P.v*......á..F•9v•t.Õä±.F.*ð 000000
A3105688 0E46881C 9C1E8C1C 9AA31CA0 88018110 069A000A 88EC8855 CBC95F5E ^_èùU.š¡...•...¡..£.......F..V.£ 000020
E900001C 9406C700 001C9606 C71C7216 891C70A3 08568806 46881C8C 16891C8A .......F..V.£p...r.ú.....ú.....ð 000040
A31C78A3 1C92A31C 76A31C7A A3C02800 011C9806 C70308E9 037425F6 7E80038D ...~%t.Õ..ú.....+à£±.£v.£..£x.£ 000060
46FF4975 30017F80 260A5EC4 00201E00 06C71C88 A31C6EA3 1C74A31C 8EA31C90 ..£..£t.£n.£..ú....á^.&...Oul.F 000080
9028EB00 001C8E06 C71C7A06 FF007528 3F80260A 5E88903E EB00301E 0006C70A .ú...0.Š>..^.&.?+u...z.ú.....Š(. 0000A0
3F80260A 5EC400EB 1C6E06FF 9014EB1C 8E06FF1A 75001C7A 3E830E75 203F8026 &.? u..>z..u.....Š....n.Š.á^.&.? 0000C0
0C76FFD0 75C00802 C4830978 E80E5098 078A260A 5E880A46 FF1C8806 FFC77520 ·uú.....F..^.&...P.Õx..á..àul.v. 0000E0
A11C8806 FF0C7D00 1C9E3E83 0C56890A 468908C4 8308C7E8 0E1C9E68 1E0A76FF .v..h...Õú..á..F..V..>...).....À 000100
80260A5E C400201E 0006C706 75301E00 3E830074 001C883E 831C9EA3 D8F71C9E ..%A£...>...t..>..Öu.ú.... .á^.&. 000120
0C56890A 468908C4 830878E8 0E1C9868 1E0A76FF 060A46FF 1C9006FF 20752E3F 7.u·.....F....v..h...Ö(..á..F..V. 000140
004E303D 74004630 98078A26 0A5EC41C 900EFF00 011C9806 C70A7D00 1C983E83 .>...).ú.........á^.&...=F.t==N. 000160
4C3F8026 0A5EC409 75001C78 3E830002 1C7806C7 0675006C 302B7400 68304074 tä=h.t+=l.u.ú.x....>x..u.á^.&.7L 000180
00101C78 06C7D8E8 00011C78 06C79002 4EE91C75 003F8026 0A5EC40A 46FF0375 u..F.á^.&.?.u.ÕN..ú.x....ŠÁú.x... 0001A0
08750058 3D057400 47300A74 00453DF8 46899807 8A26C8E8 00081C78 06C7D0E8 ŠÁú.x...Šä&....F½=£.t.=G.t.=X.u. 0001C0
E9037E01 3FE90375 00633D01 91E9037E 78740069 3DF84688 20F84683 1C7606FF ..v..F½ .F½=i.tx-.Õ..=c.u.Õ?.~.Õ 0001E0

Dump of file SATURN:[PCCOMMON.DUMP.DLL]ISFORM.TMP;1 on 18-APR-1990 10:47:28.98
File ID (717,16,0)    End of file block 58 / Allocated 60

Virtual block number 29 (0000001D), 512 (0200) bytes

261C94A1 1FC4261C 8A1EC415 75021C78 3E839001 59E90140 E9037500 2530D152 R.=%.u.Õä.ÕY...>x..u.á...&á.À..& 000000
1C963E83 041C8A06 83078926 1C94A11F C4261C8A 1EC40DE8 00000247 C7¿ 0789 ..&úG...Š.á...&á.À..&........>.. 000020
FF8801AF E9037520 0A47F626 1C701EC4 018DE903 74001C94 3E830170 E905 500 .u.Õp..>....t.Õ§.á.p.&-G, u.Õ£.j. 000040
06FFF2E8 086A90C3 EB02C483 019EE80E 0A6A0000 1C6E06C7 1C9206FF 01ACE9FF .Õ^......ú.n....j..Õ....á.Šù.j.Š... 000060
74011C78 3E830081 E9037508 1C783E83 00041C98 06C71C90 06FF1C76 06FF1C74 t...v......ú.....>x..u.Õ....>x..t 000080
1C9E06C7 0A74001C 883E83FA 46891C9E A128741C 9E0639FA 46891C78 A3C02B7A z+à£x..F*9....t(À...F*.>....t.ú... 0000A0
E80E106A 021C8A06 831C9EA3 C02B027D C0081C9E A1051C9E 2E839090 13E80000 ..Š.........À...ä).+à£.......j..Õ 0000C0
0520FA46 88157400 1C883E83 227400FA 7E8302C4 83048DE8 0E3A6A02 C4830130 0..á.j:.Õ....á...-*.t".>....t..F*-. 0000E0
F1E80E10 6A041C8A 2E830000 1C9E06C7 9007E81C 9EA3C028 027DC008 1C9EA300 .£....á).+à£..Š..ú..........j..Õþ 000100
F4E8016A 90FF39E9 026EE80E 006A90FF 3FE9106A FF10E902 1C8A0683 02C48300 ..á......Õ..j.Õ?..j..Õn.Õ9..j.Š¶ 000120
7C00653D FF0CE903 75006430 90FF21E9 0428E80E 256AFF2A E90349E8 0EF876FF .v½.Õl.Õ*.j%.Õ(.Õl..=d.u.Õ..=e.| 000140
FC468940 0C56880A 46880A4E FF0C5688 0A468809 74001C78 3E830A7E 00673005 .=g.~0.>x..t..F..V..N..F..V.ä.F• 000160
733DFEE0 E9037500 703DFEE4 E9037500 6F30FE80 E9037500 6E30903A EBFE5689 .V±Š:.=n.u.Õ.±=o.u.Õð±=p.u.ÕÁ±=s 000180
C4FC46FF 9034E80A 46FF9081 EBFF79E9 03750078 30FE89E9 03750075 308F7400 .t.=u.u.Õ¿±=x.u.Õy.ŠY..F.Š4..F•á 0001A0
044CE80E 0A76FF0C 76FF500A 4628C388 EC75253C 0474C00A F6468807 8A26FC5E ^•&...F-.ät.<%uš.ú+F.P.v..v..ÕL. 0001C0
C4FC63E9 0374C00A F6468807 8A260A5E C40C5689 0A4689FE 5688FC46 8806C483 .á..F•.V±.F..V.á^.&...F-.ät.Õc•á 0001E0

Dump of file SATURN:[PCCOMMON.DUMP.DLL]ISFORM.TMP;1 on 18-APR-1990 10:47:28.98

```
File ID (717,16,0)   End of file block 58 / Allocated 60

Virtual block number 30 (0000001E), 512 (0200) bytes

C7067400 1C903E83 56570000 12C8CBC9 1C94A1FE 51E90374 200A47F6 261C701E .p.&-G. t.ÕQ±À..èùà...WV.>...t.ú 000000
8A1EC619 75101C78 3E830774 021C783E 831C9206 FF04740A 067E8300 201E0006 ... ..~..t......>x..t..>x..u.ó.. 000020
8A1EC411 74001C02 3E83902C EB041C8A 0683FE56 89FC4689 02578826 0788261C .&..&.W..F=.V±.....$,..>...t.ó.. 000040
1C8A0683 FE5689FC 46899907 88261C8A 1EC40EE8 0000FE46 C7FC4689 0788261C .&...F=úF±..$.ó...&....F=.V±.... 000060
16881C9A A11DFEA3 C0289003 EB064688 0674FE46 08FC4688 0E74001C 6E3E8302 ..>n..t..F=.F±t..F.$..+âE±.À.... 000080
46FFF25E C41D750A 067E8328 7D00FE7E 83317500 1C923E83 F45689F2 46891C9C ...F .V¶.>...u1.~±.)+.-..u.ó^ .F 0000A0
9006E800 01F646C7 FE5689FC 46890AF7 00028308 F7FE5688 FC468820 07C626F2 ·&6.-.F=.V±%À.@.%Ò.F=.V±úF-..$.. 0000C0
C4830731 10A89AFC 76FFFE76 FF501E06 76FFFA5E 8CF84689 1C7C8800 00F646C7 úF-..||..F½.^*.v..P.v±.v=.´.1..ó 0000E0
08F04E89 C8281C98 0E8804C4 83024010 909AF876 FFFA76FF 4574001C 903E830A ..>...tE.v*.v½...M..ó.....+à.NÞ. 000100
49C18847 3005C626 05E8F27E C4F04E88 00001DFE 06C70675 081DFE3E 830D7EC9 è-..>±..u.ú.±....NÞó-·$.&6.0G.èI 000120
08048807 8A26F85E C4F276C5 EE5E8C1C 760E88F0 4E89F446 8CF27E89 F47FC008 .ó.¶.-·.F¶.NÞ..v..^Vév·ó^½&..... 000140
923E83EE 5E8EF45E 8CF27689 E375003F 8026F846 FF46202C 80037C61 3C0774C9 èt.<a|.., F.F½&.?.uD.v·.^¶.^Y.>. 000160
8302FFE8 0E50C028 02E40001 88057500 F67E8308 741C8E06 081C7AA1 1475001C ..u.Àz.....t..-~.u.¡..$.+âP.Ò... 000180
89F84689 1C8C1688 1C8AA100 018E1874 00067E83 56570000 10C8CBC9 5F5E02C4 ó.^_èùà...WV.-...t./..À.......F½. 0001A0
89F84689 02578826 0788261C 8A1EC413 74081C78 3E83008F E9021C8A 066.^456 V*.....Õ...>x..t.ó...&..&.W..F½. 0001C0
0E74081C 783E8304 1C8A0683 FA5E8CF8 4689FC46 89078826 1C8A1EC4 10EBF·56 V*$.ó...&...F=.F½.^*......>x..t. 0001E0

Dump of file SATURN:[PCCOMMON.DUMP.DLL]ISFORM.TMP;1 on 18-APR-1990 10:47:28.98
File ID (717,16,0)   End of file block 58 / Allocated 60

Virtual block number 31 (0000001F), 512 (0200) bytes

F84688FA 5E8CF846 89030188 097500FC 7E83900A EB02FAB8 1575FA46 08F84688 .F½.F*u.¡*.$...-=.u.¡...F½.^*.F½ 000000
8026F246 FFF25EC4 900EE81C 980E881C 741C9036 39F628F4 5689F246 89FA5688 .V*.F·.V¶+-96..t.....$..ó^·.F·&. 000020
83FE2B1C 9E3E88F3 75003F80 26F246FF F25EC446 90EDEB10 7ECE3846 1574003F ?.t.F;o~.$Ú.Fó^·.F·&.?.uµ.>..+±. 000040
1C883E83 06C48301 83E80EF8 76FFFA76 FF5602C4 830159E8 0E570875 001C883E >...u.W.ÒY..ó.V.v*.v½.Ò*..ó..>.. 000060
5689FC46 891C8C16 881C8AA1 000006C8 90C8C95F 5E02C483 013CE80E 57087400 .t.W.Ò<..ó.^_èù.à...À.......F=.V 000080
06C70675 001C903E 83FA4688 C02A9003 EB01B005 7547067E 83067467 067E83FE ±.-.gt..-.Gu.¯.$..*à.F*.>...u.ú. 0000A0
FF1C9836 FF1C7636 FF00011C 9806C706 75001C98 3E830074 00FA7E80 00061C98 .....-*.t..>...u.ú......6v..6... 0000C0
00FA7E80 0EC48307 2C1EFF26 188C068E FC76FFFE 76FF1C9A 36FF1C9C 36FF0676 v..6...6...v±.v=....&.,...ó..-*. 0000E0
6E3E8304 C4830730 1EFF261B 8C068E1C 9A36FF1C 9C36FF14 75001C6E 3E831B74 t..>n..u..6...6......&..0..ó..>n 000100
8304C483 07381EFF 261B8C06 8E1C9A36 FF1C9C36 FF147500 1C983E83 1874001C ..t..>...u..6...6......&..8..ó.. 000120
1EFF261B 8C068EFC 76FFFE76 FF18741C 8E06081C 7AA10000 1DFE06C7 081C8A06 ....ú.±...Àz.....t..v±.v=....&.. 000140
963E8356 000000C8 90C8C901 29E80E50 C02802E8 00018805 74C00804 C483073C <..ó..àt.¡..$.+âP.Ò).èù.à...V.>. 000160
E42A0488 2602478E 2607FF26 37882606 468A1478 044FFF26 1C701EC4 3C75001C ..u<ó.p.&.0.x..F.&.7&..&.G.&..*Ò 000180
1C9406FF 9005E81C 9606FF07 754006C4 830A0900 CE9A0676 FF531C72 36FF10E8 $..ór.S.v...o....ó.àu.....$...... 0001A0
36FF1C72 36FF18E8 507EF608 06768857 75001C96 3E835657 000002C8 90C8C95E ^èù.à...WV.>...uW.v..--P$..6r..6 0001C0
1C701EC4 1E7EC008 4EC6881C 9606FF04 754006C4 830A7100 CE9A1E00 36FF1C70 p..6...ö.q..ó.àu......óN.à-.ó.p. 0001E0

Dump of file SATURN:[PCCOMMON.DUMP.DLL]ISFORM.TMP;1 on 18-APR-1990 10:47:28.98
File ID (717,16,0)   End of file block 58 / Allocated 60

Virtual block number 32 (00000020), 512 (0200) bytes

75001C96 3E8304E8 E42A0588 2602478E 2607FF26 3F88261E 00A00478 044FFF26 &.O.xå...&.?&..&.G.&..*ô$å.>...u 000000
36FF22E8 5E75001C 963E830A 76885657 000002C8 C8C95F5E 1C940601 06468807 ..F.....^_èùà...WV.v..>...u^$".6 000020
0646FF1C 9606FF04 754006C4 830AE300 CE9A5098 078A2606 5EC41C70 36FF1C72 r..6p.ó^.Ï...P.o.D..ó.àu......F. 000040
FF263F88 261C701E C4078A26 065EC4CD 78044FFF 261C701E C42574C0 084EC688 .óN.àt%ó.p.&.O.xeó^.&..ó.p.&.?&. 000060
0CC8C8C9 5F5E1C94 06010A46 88077500 1C963E83 CAE8E42A 05882602 478E2607 .&.G.&..*ôSô.>...u..F.....^_èùà. 000080
F476FF52 1C9E3688 FA4689FC 4689C028 F65689F4 46891C9C 16881C9A A1560000 ..VÀ.......F¶.V-+à.F=.F*.6..R.v¶ 0000A0
1DFE3E83 08E802EE 83057510 1DFE3E83 067628F0 28F84689 04C48307 1C10909A ......ó..F½+Þ+v..>±..u..Y.$..>±. 0000C0
8A26F446 FF127530 1E003E83 1975203F 8026F45E C4227500 1C883E83 4E017508 .u.N.>...u"ó^¶&.?-u..>..0u..F¶&. 0000E0
83187400 1C883E83 077EF608 08743O1E 003E83F8 4EFF02C4 83FE71E8 0E509807 ..P.Òq±.ó..N½.>..0t..-~..>...t.. 000100
75001C88 3E830070 E80EFC46 FF077400 1DFE3E83 0066E80E FA46FF07 7400067E -..t..F*.Òf..>±..t..F=.Òp..>...u 000120
0A74001D FE3E8300 39E80E04 7500FA7E 830A7400 067E8302 C483FE7E E80E5629 )V.Ò-±.ó..-..t..-*.u..Ò9..>±..t. 000140
74001C88 3E8306C4 83FEB5E8 0EF476FF F676FFF8 76FF0040 E80E0475 00FC7E83 .-=.u..Òà..v½.v-.v¶.Òç±.ó..>...t 000160
208803E8 0028B805 74001C7A 3E83C8C9 5E02C483 FE38E80E 5600201E 0006C70E .ú... .V.Ò8±.ó.^èù.>z..t.¡+.$.¡ 000180
74001C76 3E831775 101DFE3E 8302C483 FDC8E80E 306ACB02 C483F002 E80E5000 .P.Ò@».ó.ùj0.Òà».ó..>±..u..>v..t 0001A0
0A5EC400 01FE46C7 56570000 06C8CB02 C483FDAA E80E5000 788803E8 00588805 .¡X.$.¡x.P.Ò´».ó.ùà...WVúF±..ó^. 0001C0
75203F80 260A5EC4 9060E80A 46FF021C 8A068337 88261C8A 1EC41275 2A3F8026 &.7*u.ó...&.7......F.$'.ó^.&.?-u 0001E0

Dump of file SATURN:[PCCOMMON.DUMP.DLL]ISFORM.TMP;1 on 18-APR-1990 10:47:28.98
```

File ID (717,16,0) End of file block 58 / Allocated 60

Virtual block number 33 (00000021), 512 (0200) bytes

```
1C903639 387F393C 3F7C303C FA468807 8A260A5E 88F6280A 46FFFFFF FE46C708 .úF±...F.+-.^.&...F*<0|?<9.;96.. 000000
0302E1C1 CE889805 8A2618 7F 39308026 06E8F888 00301E00 06C70675 3U. `0A75 u.<0u.ú...0..«Š.&.=9..&....öèÅ.. 000020
5EC4F088 EEF7FE46 880C468C 0A7E890F 7D303080 2647F188 30E983C8 03E `1CE öìÅ.à.Õ0.þG&.=0)Õ.-..F..F±¥Ÿ.Þá^ 000040
C4064E8A FE5E8CFC 46890308 88570000 04C8C8C9 5F5E0C56 880A4688 3789.606 .&.7.F..V.^ èúà...W¡...F=.^±.N.6 000060
8CFC7E89 9009ELFE 468CFC7E 89000188 F4750038 26117400 30802647 01E8FC7E -=Š.G&.=.t.&8.u¶¡...-=.F±Š...-=. 000080
50F77409 3CF87420 3CACD833 99C03306 76C51E56 57EC8855 90C8C95F C028FE46 F±+à_èü.U.$WV.év.3à.3U¯< t«<.t¾P 0000A0
D1E3D102 D1E3D1FA 88C88802 D1E3D118 72302C1F 77393CAC 0175283C 0474203C <-t.¯<+u.¯<9w.,0r.ÌDÌ@.ù.*ÌDÌ@ÌDÌ 0000C0
8855C850 5F5E1FDA F7000283 D8F70775 93203C58 0CE80002 83D803D7 13090302 @.\.=.A.@.ŠEX<-.u.¥A.@.¥Õ.^_]ÙW. 0000E0
21E80000 FFFF9A03 0E681E03 10681E19 4AA3E086 580000FF FF9A5016 C48850EC šP.6.P.....X.ÀÈJ..h...h.......ÒI 000100
16FF00FF 6800540E 049A0047 00809A50 C85DE588 00018809 CD11EA9A 0386E800 .ÒÑ..õ.ë.¡...Ì]ùP.¯.G....T.h.... 000120
88071A8E 3174003D 80264701 75003080 267FFFB9 0310068E FF330000 881E0316 ...£..3.....¿..&.=.u.G&.*.t1ƒ... 000140
C00E7241 2CAC1951 8F1FF788 071E061C E8E774AE F2C03308 74CA88A6 F3C88801 Ì.ù¡Ì.òt.3à·ÙtÒŠ.....¥.«Q.¯,Ar.à 000160
072A3E83 00590E04 9A5000FC 88EC8855 00C31FED EBAAC20A 0572412C AC9204E0 Å..¯,Ar..ò`ŠU.ù.U.$¡=.P...Y..>*. 000180
C08ED88E 01698857 56EC8855 CB5DE588 008A0E04 9A5000FF 8807281E FF047400 .t...(.¡..P...¤..Ì]ùW.$VW¡i..Å.à 0001A0
E58B5E5F 96E8E8F7 88AEF2FF FF89C033 970C7496 401074C2 38AD1896 8E065688 .V.ƒ..Ù;òt.ə.t..3à¿...Û.¥$$._^.Ì 0001C0
D1F7AEF2 FFFFB9C0 33FA8892 1F74C008 00CE00D4 9A0676FF 57EC8855 0002CA50 ]ò..U.$W.v..Å.o..àt...*3à¿..¯Ù¼i 0001E0
```

Dump of file SATURN:[PCCOMMON.DUMP.DLL]ISFORM.TMP;1 on 18-APR-1990 10:47:28.98
File ID (717,16,0) End of file block 58 / Allocated 60

Virtual block number 34 (00000022), 512 (0200) bytes

```
06FF0000 04C80002 CA50E588 5F5B0000 FFFF9A50 1651521E 530002BB C4885049 IP.6£..S.RQ.P.....(_.Ì)ò..à..... 000000
68FE5E8C FC468913 4005E001 C103E001 C888F9F7 000C8999 074C2D04 46881862 b..F.-L..¿..¼*.àÌÅ.ÈìÅ.ə..F=.^±h 000020
5EC4080A 4F802611 74000808 57892606 47892604 5EC402C4 830E0E13 A59A0200 ...È....6.6^.&.G.&.W..Åt.&.O..6^ 000040
57892606 47892640 FE5688FC 4688040A 4F802604 5EC49021 E8020002 47C726FC =&úG...$I.6^.&.O...F=.V±ə&.G.&.W 000060
0447C726 02578926 07892608 57882606 47882604 5EC40001 0247C726 FC5EC408 .6^=&úG...6^.&.G.&.W.&..&.W.&úG. 000080
CC8804EC 830478E9 046CE9C0 3300098A 0872194F 1E38065E 88EC8855 C3C90000 ..èÙW.$.^.;.O.r.¤..3àÕl.Õx..$..ä 0000A0
50E588FD 1951A780 91E175C0 855A5900 00FFFF9A 51160C76 FF0876FF 0A76FF53 S.v..v..v..Q.....YZ.àuÅ..ÎQ.».Ì) 0000C0
12742019 5187F604 28E9C033 00098A08 72194F1E 38065E88 0CEC83EC 885500CB ù.U.$.$..^.;.O.r.¤..3àÕ+.-.Q. t. 0000E0
C50A468E FA5E8C66 74801951 87F60000 0EED9A50 16F4468D 51414151 51C93353 S3èQQAAQ.F¶.P.Ú...-.Q..tf.^*.F.é 000100
833875AE F20AB049 E30C4E8B F86689F2 88FA8856 57FCFC46 89FE4689 C0330856 V.3à.F±.F==WV.*.·.f½.N.DI¯.·Ûu;. 000120
28E8F4E2 AA1A74F8 3800740A 3CAC0C4E 880716FA 88D488E2 2800808A DC8802EC $..£¤..+à.Å.*...N.¯<.t.;«t.¯à¶Ò+ 000140
E9FA5E8E 5F5EE1E8 0014E8E2 E8FC46FF 0AB0AA00 1FE80375 FB3800B0 009AE900 .Õ..¯.;«u.Ò..¯¯..F=$àÒ..$Å^_.^*Õ 000160
8051521E 53065E88 1FE3CA28 CF881F06 1E515350 0E651006 9AFFFC88 7AE80093 ..Šz¡=..ø.e.PSQ....ù+ðD..^.Š.RQ. 000180
831FC3FA 88585859 1F07740B 08FE5E01 F45E8811 75C00800 000E2E9A 5016F446 F¶.P......àu..^¶.^±.Ùt..Y(X.*ù.. 0001A0
5E8E26E8 F900208A 03E8001C 8A087500 098A0001 30007400 6D3D1874 C00808C4 6..àt.=m.t.=..¤..u.¤..$.¤ .*$&.^ 0001C0
468806E8 F9C03300 1C8A0EE8 F803751A 3F80085E 880A5E8E 0E744019 5187F6FE ±-.Q.ət..^..^..?.u.½$.¤..3à*$..F 0001E0
```

Dump of file SATURN:[PCCOMMON.DUMP.DLL]ISFORM.TMP;1 on 18-APR-1990 10:47:28.98
File ID (717,16,0) End of file block 58 / Allocated 60

Virtual block number 35 (00000023), 512 (0200) bytes

```
EEE8C188 0475C908 0C4E8803 0FE9C850 E5880472 FA5E8E5F 5EF86688 FC462BFE ±+F=.f½^_.^*r..Ì)ùÕ...N..èu..èŠŸ 000000
01300074 00603017 74C0081F 071E0000 0FC59A50 16F4468D 51521E53 0856C51E .éV.S.RQ¯F¶.P.é........àt.=m.t.=. 000020
DA880A74 40195187 F68775C0 08F44688 C2E80020 8AC7E800 1C8ACC75 00098A00 .¤..uà¤..Šù¤ .Šò.F¶.àuñ-.Q.ət..Õ 000040
F7AEF2FF FF89C033 067EC4D7 88EC8855 00A3E8C0 33001C8A A6E80275 1A3F8026 &.?.u.Š|¤..3àŠÈ.U.$.ä6~.3à¿..·Ù¼ 000060
F883117D 194F1E38 065E88EC 88550442 E9008357 56EC8855 00C850FA 88914901 Ì(..*]ù.U.$VW*.ÒB.U.$.^.;.O.)..« 000080
1E380872 08280C88 5A5900C8 50E588C0 3302E800 01880574 40195187 F60C7C00 .|.-.Q.ət.¡..Š.3à.Ì)ù.YZ.É+Àr.;. 0000A0
04885200 02880746 2EFF5152 FC5CE9C0 33057540 0746A1C8 5152E388 0572074A J.r..DRQÙAF.əu.3àÕ\=RQ..F.£..R.à 0000C0
02300774 00013040 81127558 C0080000 FFFF9A52 16501653 C4885087 1951A780 .ÌQ.ñP.6S.P.R......àXu.Ÿə=..t.=. 0000E0
731B7A1E FFD833C2 8C187E06 C41EE318 7C0E885A 04794819 518F0808 81067500 .u.Ÿ...Q.KyåZ..|.D.6.-..ò3Ù..z.s 000100
1886BF18 868E007C E81886BF 18868E18 7A1EFF00 0388C28C 188206C4 01AEE903 .ÕÙ.6....ô£....z.ƒ..«..Ò|.ƒ..«.. 000120
BF1886BE D88E00DA B8C30000 FFFF9A11 77680E01 6A0B7418 8A3D1886 880073E8 Òs.¡..=..t.j..hw......ù¡Ò..Äƒ..« 000140
BF1886BE 003AE81F 02BF1E02 BEEC8855 00001172 9A006A00 6A036A00 51E8188A ..ÒQ.j.j.j..r...U.$ƒ..«..Ò:.ƒ..« 000160
8A50C033 001AE81 8A8F188A BE0023E8 188A8F18 8A8EEC88 5503E800 31E8188A ..Ò1.Š.U.$ƒ..«..Ò#.ƒ..«..Ò..3àP. 000180
08058804 EF830E73 F738C318 7A1EFF00 028807E3 187C0E88 0000FFFF 9A500646 F.P.......|.D.£....z.ù;¼s..ÿ.... 0001A0
10168800 F0E90375 03103639 FF28F62B 56570000 14C800C3 EEE81DFF F2740245 E.t·..ŠŸù.à...WV+-+.96..u.Òþ.... 0001C0
125E1488 9A071A68 1EF676FF F876FF0C 6AF85689 F64689F2 5689F046 89C02803 .+á.FÞ.V·.F-.V½j..V½.v-.h...¡.^. 0001E0
```

Dump of file SATURN:[PCCOMMON.DUMP.DLL]ISFORM.TMP;1 on 18-APR-1990 10:47:28.98

```
File ID (717,16,0)   End of file block 58 / Allocated 60

Virtual block number 36 (00000024), 512 (0200) bytes

 0CEB47EA 75003F80 26F646FF F65EC400 BCE90376 7FFFFE81 461974C0 0B0AC483 .á..ât.F.±..v.Õ¥.á^-.F-&.?.uõGŠ. 000000
 126D1460 9A046A50 01458D8A 75003F80 26F65E88 F475003F 8026F646 FFF65EC4 á^-.F-&.?.u¶.^-&.?.u¤.E.Pj..'.m. 000020
 6D74EE46 08EC46P8 FE5689FC 468902C4 8312A313 A59A56EE 5689EC46 8904C483 .á..F$.V¥V.É.È..á..F=.V±.F$.F¥tm 000040
 071A681E F076FFF2 76FF0C6A 1B591689 1B57A3EE 5688EC46 886674C2 0BFC4688 .F=.ôtf.F$.V¥ÈW...Y.j..v·.vÞ.h.. 000060
 04EC4683 02578926 07B926FE 5688FC46 88EC5EC4 2C74C008 0AC4830F AA14B89A .¡.`..á..ât,á^$.F=.V±&..&.W..F$. 000080
 8026F046 FFF05EC4 E8E80E74 C00A0788 26FC46FF FC5EC407 8A26F046 FFF05EC4 á^Þ.FÞ&..á^•.F•&...ât.ŠÒá^Þ.FÞ&. 0000A0
 18040203 02021601 FA58E900 028890C8 C95F5EA7 75003F80 26F05EC4 F475003F ?.u¶á^Þ&.?.ul^_èù.¡..ÕX°........ 0000C0
 02430041 02350212 12110010 120F1600 160C0808 070A0C09 0C080C07 09060005 ..........................S.A.C. 0000E0
 0BD702CE 0BA40D84 09820A81 0A801606 09721C70 2060006C 08590057 00530052 R.S.W.Y.l.m p.r...........É.ó.®. 000100
 4DA3CB5D E58899FF FFB80008 E8CB50E5 8899FFFF 88194616 89194DA3 16080000 ....ÈM...F.¡....Í]ùÒ..¡....Í]ùÈM 000120
 728C3C43 0A76243C 0472133C F7E24343 1674073A 2E1B75E4 0A0024B9 12F88B19 .È%.¿$..ðu..:.t.CCã%<.r.<$v.C<¥r 000140
 FE4F8026 0574C308 C08C065E C4EC8855 00C31946 A3980147 8A2E4301 76CA3C04 .<òv.C..G..ÈF.ù.U.$á^..à.ùt.&.O± 000160
 740025E8 08750018 6E3E831E 73FFF130 06468857 5602EC83 EC8855C8 50E58801 ..Í]ùU.$.$.VW.F.=þ.s..>n..u.Ò%.t 000180
 5E5F02C4 83121E15 AA9A0676 FF087500 78E80574 0018E815 750082E8 186EA312 .Èn.Ò..u.Ò..t.Òx.u..v..`....á._^ 0001A0
 B0510E4F 8050501E C033FE5E 89FEE383 43065E88 0776065E 3900F088 C850E588 .Í]ùÈÞ.9^.v..^.C.D±.^±3à.PP.O.Õ¯ 0001C0
 08A30A8E 0574D20B 1B72A31B 701687C2 883874FF FA8308C4 83130917 569A5002 .P.V.\..á..'.t8.ò..p.Èr..®t..OÈ. 0001E0

Dump of file SATURN:[PCCOMMON.DUMP.DLL]ISFORM.TMP;1 on 18-APR-1990 10:47:28.98
File ID (717,16,0)   End of file block 58 / Allocated 60

Virtual block number 37 (00000025), 512 (0200) bytes

 05000AA3 01478D00 02A30000 A3000A88 0C478948 480008A3 C033D88E FE5E8800 ..^±.A3àÈ..HH.G.¡..È..È...G.È... 000000
 C3D98EC1 8CD20801 9AE81872 1E8ED833 064E88C0 8ED88CC3 1FD88C00 06A30000 ..È...Á.ù.Ä.à.N.3Ù..r.Ò...®.ê.lù 000020
 0674FFFF C2F7FA56 89F84689 148D1854 9A0676FF 006A0876 FF006A56 00000AC8 à...Vj..v.j..v..T....F%.V°%ô..t. 000040
 FF006A56 1274D00E FE5689FC 468902C4 8314A613 A59A56F8 7688902F E899C028 +à.$/..v%V.É.Ì..á..F=.V±.Ât.Vj.. 000060
 4E881E56 57EC8855 70CBC95E FE5688FC 46889007 EB08C483 1405180C 9A50FE76 v±P......á.Š...F=.V±^èù.U.$WV..N 000080
 3A26C933 FF448AA6 F30A76C5 FE88C803 D9F7AEF2 C033F788 067EC4D9 8827E30E .D'.\á~..%3à·Ù%).ù.±év.µÌ.D.3è&: 0000A0
 7EC51E08 56880646 880E4E88 00CB50E5 885F5E1F C188D1F7 49490474 0477FF45 E.w.t.II%l.ê.^_.Í]ù..H..F..V..é- 0000C0
 92F788DA F7000283 D8F7AA2D 800A7902 080E750A F9831374 C00A93FC 071E570A .W..•..ât..'.u..®y.¯-¯%U.®.%Ò.%. 0000E0
 4F0588E2 75C308C2 88AA2704 0276393C 3004D387 92F1F793 F1F70274 C008D233 3®.ât.%þ.%þ..Æ.0<9v..'¨.ô.ùuã..O 000100
 074C8856 000006C8 00CB50E5 885E5F1F 58DA8CF2 72C73801 448DFF44 880586AC ¯...D..D.;úr·.ÒX._^.Í]ù.à...V¡L. 000120
 744004C4 8314721B 889A5306 0E74830A 47F626FA 5EC41CEB F628FC5E 8CFA4689 .F°.^=+-Š.á^°&-G.¯t..S...r...á.ât 000140
 D808065E 88EC8855 90C8C95E C688D876 FA463919 3C168819 3AA10CFA 46834601 .F.F°.Á:...<.9F°vÄ.ó^èù.U.$.^..Ù 000160
 750176E8 00058807 1E297500 3F831864 885756EC 8855CB50 E58801FE 4F800474 t..O±..Í]ùU.$VWEd..?.u)..¡..Òv.u 000180
 186A3689 FFFEFE44 C704C683 000104C7 961866A3 1864A3FE 244024EB 99C03305 .3à.$$a$±Èd.Èf..ú....ó.ùO±±..ój. 0001A0
 7788F273 EEF983FE E180FA74 410000E9 C850E588 5E5F0009 E8C08ED8 8C064E88 .N..Á.àO.._^.Í]ùÒÂ.At°.Ã±.°Ys·.w 0001C0
 4489F788 000205C2 03357401 A8ADF003 D0881573 C1384843 7401A8FE 88ADFC02 .•Ü.±´.tCH;ès..Â.ÞÙ´.t5.ô....%.D 0001E0

Dump of file SATURN:[PCCOMMON.DUMP.DLL]ISFORM.TMP;1 on 18-APR-1990 10:47:28.98
File ID (717,16,0)   End of file block 58 / Allocated 60

Virtual block number 38 (00000026), 512 (0200) bytes

 3B1178B9 DA8CC688 FE4CFEF9 0305E805 8948C12B FE4C89F9 030C74FE 88E6E8FE ±Šl.±t..'.L±+èH..Š..°±L±.ó.Ö¿x.; 000000
 F27401A8 ADF003FE 882574FF FE30021B 7606C626 C3027F89 18721E8C 26057401 ìt.&..r....ù&ó.v..=±.t%.±.ÞÙ´.t· 000020
 08084788 E6EBFE44 89F78800 0205C203 E27401A8 ADF00300 888C73C1 3848FE88 .±H;ês¥.Å.ÞÙ´.tã.ô....%.D±Šl.G.. 000040
 88E83788 186E1E8E 260574C7 3B16308F D88C1274 18760EFE 2615E808 8E0474C0 ât..AŠ.&±.v.t..Aα=.;ùt.&..n..7ŠÈ 000060
 4E960574 0010E8FE 4DFE0D74 005FE898 40400124 0074C638 0068E8C0 330677B8 .w.3àÒk.;ót.$.ªª.Ò_.t.±M±Ò..t..N 000080
 7401A8FE 45B851C3 99C03302 47890788 1872A326 0474C138 16918908 8C98E84E N$..Ä¿..;èt.&Èr....G.3à.ùO.E±´.t 0000A0
 D2F70072 C2031572 C603C188 F575EAD1 04761874 1638267F FFBA4141 49C82803 .+àlAA¤..&;.t.v.lõu%.è.ór..òr.%® 0000C0
 03F0B8FE 88571874 0010E851 52C359C0 33E575EA D1D2F708 75000CE8 C628C223 #ò+óÒ..u.%®iõul3àYúRÒÒ..t.W.±.Þ. 0000E0
 00018850 52521ED2 335053C3 5A5958FE 55894AD7 28068806 7789FFFE FE44C7F2 ·ùO±±..W..®+®J.U±XYZùSP3®.RRP¡.. 000100
 000A7E83 065756EC 8855C302 08027458 5A1FFFFA 8308C483 15791756 9A1F0650 P...V.y..á..'..Z(t..®ùU.$VW..~.. 000120
 0074F738 11744807 1836884C E8277200 57E80775 48064688 08568803 188F3875 uß€...V..F.Hu.ÒW.r'$L.6..Ht.;%t. 000140
 21E899FF FF880675 D2080473 0718FE81 04C68334 735E003E E8560E46 89024488 .D..F.VÒ>.^s4.ó..±..s..®u.¡...Š! 000160
 33D38807 18368902 5C891489 E675C085 F9580000 FFFF9A50 C0335016 52C48850 P.áR.P3àP.....['.àul...\..ó...Æ3 000180
 ·DA8B2CE8 F9F27507 18FE8104 C6830C74 024C39F7 880E4E88 C850E588 5E5F07C0 à._^.Í]ù.N..%9L.t..ó..±..u·°$,.Ö 0001A0
 75F73B0E 75C08500 00FFFF9A 51531373 03121E39 0675F73B C18ED388 26721C03 ..r&.Æ.è;%u.9...s.SQ......àuß;%u 0001C0
 D12B0C74 DAF7D788 067EC457 38E30C4E 88EC8855 00C30188 04879203 12168904 .........lù.U.$.N.DBWá-..±%Òt.+ì 0001E0

Dump of file SATURN:[PCCOMMON.DUMP.DLL]ISFORM.TMP;1 on 18-APR-1990 10:47:28.98
```

File ID (717,16,0)   End of file block 58 / Allocated 60

Virtual block number 39 (00000027), 512 (0200) bytes

```
FFC381C3 8C10E3D1 87AAF3C9 13ABF3E9 D1E08A0A 468BD12B D187D103 D3230B1B .U##.I.I+I.F..AIÕ#¨.è#ˆ.ID..ú.ú. 000000
88D8080C 5E880846 88EC8855 CB5D0856 88064688 5FAAF3C9 13ABF3E9 D1C38EFF ..úiÕ#¨.è#ˆ..F..V.}úU.$.F..^..Ã. 000020
E3F70646 88C8030C 66F70646 88C888E3 F70008CA 5DE588E3 F7064688 08750A5E ^.u..F.%D.[]ò..%D.à.F.%f..à.F.%D 000040
0A47F626 5575023C 03240A47 8A26065E C4F62B56 000004C8 0008CA5D E588D103 .I.I]ò..à...V+-á^.&.G.$.<.uU&-G. 000060
2B260788 26065_88 39740113 4087F606 D868F9F7 000C8999 074C2DC3 88157508 .u..ú-L..¿..%*kÃ.-.ã..t9.^.&..&+ 000080
C4831746 0F029A50 E42A0847 8A260677 FF260877 FF265028 7EC00BFC 46890647 G..f=.à-(P&.w.&.w.&.G.*ôP...F..á 0000A0
26078926 08578826 06478826 065EC4FF FFBE200A 4F802606 5EC40874 FC463808 .;f+t.á^.&.O. /..á^.&.G.&.W.&..& 0000C0
005C0005 00270103 00580005 003A0103 000CCBC9 5EC68800 000447C7 26025789 .W.&úG....ó^èù....:....[...'...\. 0000E0
00880005 183F0105 00000006 16C60002 00000004 180C0002 06000010 104E0203 ..N.......É.......ó.......?..... 000100
00260005 17F50103 00220005 17AA0103 00070005 118C0103 00050005 11C40103 ..á...............ˆ..."...%...&. 000120
54206E75 52205340 00000000 00000000 004D0005 110E0103 003A0005 0F2E0103 ......:.......M.........MS Run-T 000140
38383931 20296328 20746867 69727970 6F43202D 20797261 7262694C 20656069 ime Library - Copyright (c) 1988 000160
0000015C 0158015A 01590157 00800011 70726F43 2074666F 736F7263 694D202C , Microsoft Corp....W.Y.Z.[.\... 000180
00800000 000000:0 00000000 0388038A 03890388 0386004B 00000000 00000000 ........K....................... 0001A0
01B001AF 01AE01. · 01A80080 00000000 00000000 00000393 03920391 0390038E ......................`.Ù.Ú.É.¯. 0001C0
6F727245 0065726F 7453206E 6F697461 6D726F66 6E490000 00000000 00000000 ..........Information Store.Erro 0001E0
```

Dump of file SATURN:[PCCOMMON.DUMP.DLL]ISFORM.TMP;1 on 18-APR-1990 10:47:28.98
File ID (717,16,0)   End of file block 58 / Allocated 60

Virtual block number 40 (00000028), 512 (0200) bytes

```
75746375 72747320 65726F74 7320666F 20797265 7571206D 6F726620 64252072 r %d from query of store structu 000000
00657275 74637572 74532065 726F7453 206F666E 49206574 61657243 002E6572 re..Create Info-Store Structure. 000020
63757274 73207369 20657461 69746E61 74736E49 6874654D 20606F72 66206425 %d from MethInstantiate is-struc 000040
636F7250 20534920 666F2079 72657571 20606F72 66206425 20726F72 72450074 t.Error %d from query of IS Proc 000060
666F2079 72657571 20606F72 66206425 20726F72 7245006C 65646F4D 20737365 ess Model.Error %d from query of 000080
00262626 26262048 4E554A20 26262626 26006C65 646F4D20 61746144 20534920  IS Data Model.&&&&& JUNK &&&&&. 0000A0
73736563 6F727020 70606574 20612067 6E697461 65726320 64252072 6F727245 Error %d creating a temp process 0000C0
776F6C66 20612064 6C697562 206F7420 676E6979 72742064 2520726F 72724500 .Error %d trying to build a flow 0000E0
64206F74 20676E69 79727420 64252072 6F727245 002E6572 75746375 72747320  structure..Error %d trying to d 000100
6E697972 74206425 20726F72 7245002E 65657274 204C4450 20612065 74656C65 elete a PDL tree..Error %d tryin 000120
203A726F 72724500 73736563 6F727020 70606574 20657465 6C656420 6F742067 g to delete temp process.Error:  000140
69207369 68742066 6F207265 62606560 20612079 64616572 6C612073 69207325 %s is already a member of this i 000160
676E696E 69617462 6F20726F 72724500 65726F74 73206E6F 69746160 726F666E nformation store.Error obtaining 000180
6F666E49 20646441 00642520 30207463 656A626F 20726F66 20676E69 72747320  string for object = %d.Add Info 0001A0
616C7065 52006574 75626972 74746120 65727574 63757274 73206572 6F74532D -Store structure attribute.Repla 0001C0
65206574 656C6544 002E7465 79206465 746E656D 656C7060 6920746F 6E206563 ce not implemented yet..Delete e 0001E0
```

Dump of file SATURN:[PCCOMMON.DUMP.DLL]ISFORM.TMP;1 on 18-APR-1990 10:47:28.98
File ID (717,16,0)   End of file block 58 / Allocated 60

Virtual block number 41 (00000029), 512 (0200) bytes

```
6920606F 72662065 636E6572 65666572 20657475 62697274 74612D79 7469746E ntity-attribute reference from i 000000
6974656C 65642065 6C696877 20642520 3A726F72 72450065 726F7473 2D6F666E nfo-store.Error: %d while deleti 000020
00000000 23202D2B 00296C6C 756E2800 296C6C75 6E280000 7972746E 6520676E ng entry..(null).(null).+- #.... 000040
00000000 00000000 00000000 00000000 00000000 188C1E10 11A71E10 1E100000 ......I......................... 000060
00000000 00000000 00000000 00000000 00000000 00000000 00000000 00000000 ................................ 000080
00000000 00000000 00000000 00000000 00000000 00000000 00000000 00000000 ................................ 0000A0
00000000 00000000 00000000 00000000 00000000 00000000 00000000 00000000 ................................ 0000C0
00000000 00000000 00000000 00000000 00000000 00000000 00000000 00000000 ................................ 0000E0
00000000 00000000 00000000 00000000 00000000 00000000 00000000 00000000 ................................ 000100
00000000 00000000 00000000 00000000 00000000 00000000 00000000 00000000 ................................ 000120
00000000 00000000 00000000 00000000 00000000 00000000 00000000 00000000 ................................ 000140
00000000 00000000 00000000 00000000 00000000 00000000 00000000 00000000 ................................ 000160
00000000 00000000 00000000 00000000 00000000 00000000 00000000 00000000 ................................ 000180
00000000 00000000 00000000 00000000 00000000 00000000 00000000 00000000 ................................ 0001A0
00000000 00000000 00000000 00000000 00000000 00000000 00000000 00000000 ................................ 0001C0
00000000 00000000 0C)00000 00000000 00000000 00000000 00000000 00000000 ................................ 0001E0
```

Dump of file SATURN:[PCCOMMON.DUMP.DLL]ISFORM.TMP;1 on 18-APR-1990 ?:47:28.98

```
File ID (717,16,0)   End of file block 58 / Allocated 60

Virtual block number 42 (0000002A), 512 (0200) bytes

00000000 00000000 00000000 00000000 00000000 00000000 00000000 00000000 ................................ 000000
00000000 00000000 00000000 00000000 00000000 00000000 00000000 00000000 ................................ 000020
00000000 00000000 00000000 00000000 00000000 00000000 00000000 00000000 ................................ 000040
00000000 00000000 00000000 00000000 00000000 00000000 00000000 00000000 ................................ 000060
00000000 00000000 00000000 00000000 00000000 00000000 00000000 00000000 ................................ 000080
00000000 00000000 00000000 00000000 00000000 00000000 00000000 00000000 ................................ 0000A0
00000000 00000000 00000000 00000000 00000000 00000000 00000000 00000000 ................................ 0000C0
00000000 00000000 00000000 00000000 00000000 00000000 00000000 00000000 ................................ 0000E0
00000000 00000000 00000000 00000000 00000000 00000000 00000000 00000000 ................................ 000100
00000000 00000000 00000000 00000000 00000000 00000000 00000000 00000000 ................................ 000120
00000000 00000000 00000000 00000000 00000000 00000000 00000000 00000000 ................................ 000140
00000000 00000000 00000000 00000000 00000000 00000000 00000000 00000000 ................................ 000160
00000000 00000000 00000000 00000000 00000000 00000000 00000000 00000000 ................................ 000180
00000000 00000000 00000000 00000000 00000000 00000000 00000000 00000000 ................................ 0001A0
00000000 00000000 00000000 00000000 00000000 00000000 00000000 00000000 ................................ 0001C0
00000000 00000000 00000000 00000000 00000000 00000000 00000000 00000000 ................................ 0001E0

Dump of file SATURN:[PCCOMMON.DUMP.DLL]ISFORM.TMP;1 on 18-APR-1990 10:47:28.98
File ID (717,16,0)   End of file block 58 / Allocated 60

Virtual block number 43 (0000002B), 512 (0200) bytes

00000000 00000000 00000000 00000000 00000000 00000000 00000000 00000000 ................................ 000000
00000000 00000000 00000000 00000000 00000000 00000000 00000000 00000000 ................................ 000020
00000000 00000000 00000000 00000000 00000000 00000000 00000000 00000000 ................................ 000040
FFFF12F2 00000000 003D4F46 4E495F45 4C49465F 435F0318 00000000 00000000 ..........C_FILE_INFO=.......... 000060
07540000 0200FFFF FFFF0101 00000000 073A12F2 073612F2 073212F2 072E12F2 ....2..6..:...................1. 000080
02020000 00000000 00000000 01020000 00000000 00000000 0001188A 00000000 ................................ 0000A0
00000000 00000000 00000000 00000000 00000000 00000000 00000000 00000000 ................................ 0000C0
00000000 00000000 00000000 00000000 00000000 00000000 00000000 00000000 ................................ 0000E0
00000000 00000000 00000000 00000000 00000000 00000000 00000000 00000000 ................................ 000100
00000000 00000000 00000000 00000000 00000000 00000000 00000000 00000000 ................................ 000120
00000000 00000000 00000000 00000000 00000000 00000000 00000000 00000000 ................................ 000140
00000000 00000000 00000000 00000000 00000000 00000000 00000000 00000000 ................................ 000160
00000000 00000000 00000000 00000000 00000000 00000000 00000000 00000000 ................................ 000180
00000000 00000000 00000000 00000000 00000000 00000000 00000000 00000000 ................................ 0001A0
00000000 00000000 00000000 00000000 00000000 00000000 00000000 00000000 ................................ 0001C0
00000000 00000000 00000000 00000000 00000000 00000000 00000000 00000000 ................................ 0001E0

Dump of file SATURN:[PCCOMMON.DUMP.DLL]ISFORM.TMP;1 on 18-APR-1990 10:47:28.98
File ID (717,16,0)   End of file block 58 / Allocated 60

Virtual block number 44 (0000002C), 512 (0200) bytes

00000000 00000000 00000000 00000000 00000000 00000000 00000000 00000000 ................................ 000000
00000000 00000000 00000000 00000000 00000000 00000000 00000000 00000000 ................................ 000020
00000000 00000000 00000000 00000000 00000000 00000000 00000000 00000000 ................................ 000040
00000000 00000000 00000000 00000000 00000000 00000000 00000000 00000000 ................................ 000060
00000000 00000000 00000000 00000000 00000000 00000000 00000000 00000000 ................................ 000080
00000000 00000000 00000000 00000000 00000000 00000000 00000000 00000000 ................................ 0000A0
00000000 00000000 00000000 00000000 00000000 00000000 00000000 00000000 ................................ 0000C0
00000000 00000000 00000000 00000000 00000000 00000000 00000000 00000000 ................................ 0000E0
00000000 00000000 00000000 00000000 00000000 00000000 00000000 00000000 ................................ 000100
00000000 00000000 00000000 00000000 00000000 00000000 00000000 00000000 ................................ 000120
00000000 00000000 00000000 00000000 00000000 00000000 00000000 00000000 ................................ 000140
00000000 00000000 00000000 00000000 00000000 00000000 00000000 00000000 ................................ 000160
00000000 00000000 00000000 00000000 00000000 00000000 00000000 00000000 ................................ 000180
00000000 00000000 00000000 00000000 00000000 00000000 00000000 00000000 ................................ 0001A0
00000000 00000000 00000000 00000000 00000000 00000000 00000000 00000000 ................................ 0001C0
00000000 00000000 00000000 00000000 00000000 00000000 00000000 00000000 ................................ 0001E0

Dump of file SATURN:[PCCOMMON.DUMP.DLL]ISFORM.TMP;1 on 18-APR-1990 10:47:28.98
```

```
File ID (717,16,0)    End of file block 58 / Allocated 60

Virtual block number 45 (0000002D), 512 (0200) bytes

 00000000 00000000 00000000 00000000 00000000 00000000 00000000 00000000 ................................ 000000
 00000000 00000000 00000000 00000000 00000000 00000000 00000000 00000000 ................................ 000020
 00000000 00000000 00000000 00000000 00000000 00000000 00000000 00000000 ................................ 000040
 00000000 00000000 00000000 00000000 00000000 00000000 00000000 00000000 ................................ 000060
 00000000 00000000 00000000 00000000 00000000 00000000 00000000 00000000 ................................ 000080
 00000000 00000000 00000000 00000000 00000000 00000000 00000000 00000000 ................................ 0000A0
 00000000 00000000 00000000 00000000 00000000 00000000 00000000 00000000 ................................ 0000C0
 00000000 00000000 00000000 00000000 00000000 00000000 00000000 00000000 ................................ 0000E0
 00000000 00000000 00000000 00000000 00000000 00000000 00000000 00000000 ................................ 000100
 00000000 00000000 00000000 00000000 00000000 00000000 00000000 00000000 ................................ 000120
 00000000 00000000 00000000 00000000 00000000 00000000 00000000 00000000 ................................ 000140
 00000000 00000000 00000000 00000000 00000000 00000000 00000000 00000000 ................................ 000160
 00000000 00000000 00000000 00000000 00000000 00000000 00000000 00000000 ................................ 000180
 00000000 00000000 00000000 00000000 00000000 00000000 00000000 00000000 ................................ 0001A0
 00000000 00000000 00000000 00000000 00000000 00000000 00000000 00000000 ................................ 0001C0
 00000000 00000000 00000000 00000000 00000000 00000000 00000000 00000000 ................................ 0001E0

Dump of file SATURN:[PCCOMMON.DUMP.DLL]ISFORM.TMP;1 on 18-APR-1990 10:47:28.98
File ID (717,16,0)    End of file block 58 / Allocated 60

Virtual block number 46 (0000002E), 512 (0200) bytes

 00000000 00000000 00000000 00000000 00000000 00000000 00000000 00000000 ................................ 000000
 00000000 00000000 00000000 00000000 00000000 00000000 00000000 00000000 ................................ 000020
 00000000 00000000 00000000 00000000 00000000 00000000 00000000 00000000 ................................ 000040
 00000000 00000000 00000000 00000000 00000000 00000000 00000000 00000000 ................................ 000060
 00000000 00000000 00000000 00000000 00000000 00000000 00000000 00000000 ................................ 000080
 00000000 00000000 00000000 00000000 00000000 00000000 00000000 00000000 ................................ 0000A0
 00000000 00000000 00000000 00000000 00000000 00000000 00000000 00000000 ................................ 0000C0
 00000000 00000000 00000000 00000000 00000000 00000000 00000000 00000000 ................................ 0000E0
 00000000 00000000 00000000 00000000 00000000 00000000 00000000 00000000 ................................ 000100
 00000000 00000000 00000000 00000000 00000000 00000000 00000000 00000000 ................................ 000120
 00000000 00000000 00000000 00000000 00000000 00000000 00000000 00000000 ................................ 000140
 00000000 00000000 00000000 00000000 00000000 00000000 00000000 00000000 ................................ 000160
 00000000 00000000 00000000 00000000 00000000 00000000 00000000 00000000 ................................ 000180
 00000000 00000000 00000000 00000000 00000000 00000000 00000000 00000000 ................................ 0001A0
 00000000 00000000 00000000 00000000 00000000 00000000 00000000 00000000 ................................ 0001C0
 00000000 00000000 00000000 00000000 00000000 00000000 00000000 00000000 ................................ 0001E0

Dump of file SATURN:[PCCOMMON.DUMP.DLL]ISFORM.TMP;1 on 18-APR-1990 10:47:28.98
File ID (717,16,0)    End of file block 58 / Allocated 60

Virtual block number 47 (0000002F), 512 (0200) bytes

 00000000 00000000 00000000 00000000 00000000 00000000 00000000 00000000 ................................ 000000
 00000000 00000000 00000000 00000000 00000000 00000000 00000000 00000000 ................................ 000020
 00000000 00000000 00000000 00000000 00000000 00000000 00000000 00000000 ................................ 000040
 00000000 00000000 00000000 00000000 00000000 00000000 00000000 00000000 ................................ 000060
 00000000 00000000 00000000 00000000 00000000 00000000 00000000 00000000 ................................ 000080
 00000000 00000000 00000000 00000000 00000000 00000000 00000000 00000000 ................................ 0000A0
 00000000 00000000 00000000 00000000 00000000 00000000 00000000 00000000 ................................ 0000C0
 00000000 00000000 00000000 00000000 00000000 00000000 00000000 00000000 ................................ 0000E0
 00000000 00000000 00000000 00000000 00000000 00000000 00000000 00000000 ................................ 000100
 00000000 00000000 00000000 00000000 00000000 00000000 00000000 00000000 ................................ 000120
 00000000 00000000 00000000 00000000 00000000 00000000 00000000 00000000 ................................ 000140
 00000000 00000000 00000000 00000000 00000000 00000000 00000000 00000000 ................................ 000160
 00000000 00000000 00000000 00000000 00000000 00000000 00000000 00000000 ................................ 000180
 00000000 00000000 00000000 00000000 00000000 00000000 00000000 00000000 ................................ 0001A0
 00000000 00000000 00000000 00000000 00000000 00000000 00000000 00000000 ................................ 0001C0
 00000000 00000000 00000000 00000000 00000000 00000000 00000000 00000000 ................................ 0001E0

Dump of file SATURN:[PCCOMMON.DUMP.DLL]ISFORM.TMP;1 on 18-APR-1990 10:47:28.98
```

```
File ID (717,16,0)   End of file block 58 / Allocated 60

Virtual block number 48 (00000030), 512 (0200) bytes

00000000 00000000 00000000 00000000 00000000 00000000 00000000 00000000 ................................ 000000
00000000 00000000 00000000 00000000 00000000 00000000 00000000 00000000 ................................ 000020
00000000 00000000 00000000 00000000 00000000 00000000 00000000 00000000 ................................ 000040
00000000 00000000 00000000 00000000 00000000 00000000 00000000 00000000 ................................ 000060
00000000 00000000 00000000 00000000 00000000 00000000 00000000 00000000 ................................ 000080
00000000 00000000 00000000 00000000 00000000 00000000 00000000 00000000 ................................ 0000A0
00000000 00000000 00000000 00000000 00000000 00000000 00000000 00000000 ................................ 0000C0
00000000 00000000 00000000 00000000 00000000 00000000 00000000 00000000 ................................ 0000E0
00000000 00000000 00000000 00000000 00000000 00000000 00000000 00000000 ................................ 000100
00000000 00000000 00000000 00000000 00000000 00000000 00000000 00000000 ................................ 000120
00000000 00000000 00000000 00000000 00000000 00000000 00000000 00000000 ................................ 000140
00000000 00000000 00000000 00000000 00000000 00000000 00000000 00000000 ................................ 000160
00000000 00000000 00000000 00000000 00000000 00000000 00000000 00000000 ................................ 000180
00000000 00000000 00000000 00000000 00000000 00000000 00000000 00000000 ................................ 0001A0
00000000 00000000 00000000 00000000 00000000 00000000 00000000 00000000 ................................ 0001C0
00000000 00000000 00000000 00000000 00000000 00000000 00000000 00000000 ................................ 0001E0

Dump of file SATURN:[PCCOMMON.DUMP.DLL]ISFORM.TMP;1 on 18-APR-1990 10:47:28.98
File ID (717,16,0)   End of file block 58 / Allocated 60

Virtual block number 49 (00000031), 512 (0200) bytes

00000000 00000000 00000000 00000000 00000000 00000000 00000000 00000000 ................................ 000000
00000000 00000000 00000000 00000000 00000000 00000000 00000000 00000000 ................................ 000020
00000000 00000000 00000000 00000000 00000000 00000000 00000000 00000000 ................................ 000040
00000000 00000000 00000000 00000000 00000000 00000000 00000000 00000000 ................................ 000060
00000000 00000000 00000000 02000001 00000000 00000000 00000000 00000000 ................................ 000080
00000000 00000000 00000000 00000000 00000000 00000000 00000000 00000000 ................................ 0000A0
00000000 00000000 00000000 00000000 00000000 00000000 00000000 00000000 ................................ 0000C0
00000000 00000000 00000000 00000000 00000000 00000000 00000000 00000000 ................................ 0000E0
00000000 00000000 00000000 00000000 00000000 00000000 00000000 00000000 ................................ 000100
00000000 00000000 00000000 00000000 00000000 00000000 00000000 00000000 ................................ 000120
00000000 00000000 00000000 00000000 00000000 00000000 00000000 00000000 ................................ 000140
00000000 00000000 00000000 00000000 00000000 00000000 00000000 00000000 ................................ 000160
00000000 00000000 00000000 00000000 00000000 00000000 00000000 00000000 ................................ 000180
00000000 00000000 00000000 00000000 00000000 00000000 00000000 00000000 ................................ 0001A0
00000000 00000000 00000000 00000000 00000000 00000000 00000000 00000000 ................................ 0001C0
00000000 00000000 00000000 00000000 00000000 00000000 00000000 00000000 ................................ 0001E0

Dump of file SATURN:[PCCOMMON.DUMP.DLL]ISFORM.TMP;1 on 18-APR-1990 10:47:28.98
File ID (717,16,0)   End of file block 58 / Allocated 60

Virtual block number 50 (00000032), 512 (0200) bytes

00000000 00000000 00000000 00000000 00000000 00000000 00000000 00000000 ................................ 000000
00000000 00000000 00000000 00000000 00000000 00000000 00000000 00000000 ................................ 000020
00000000 00000000 00000000 00000000 00000000 00000000 00000000 00000000 ................................ 000040
00000000 00000000 00000000 00000000 00000000 00000000 00000000 00000000 ................................ 000060
00000000 00000000 00000000 00000000 00000000 00000000 00000000 00000000 ................................ 000080
00000000 00000000 00000000 00000000 00000000 00000000 00000000 00000000 ................................ 0000A0
00000000 00000000 00000000 00000000 00000000 00000000 00000000 00000000 ................................ 0000C0
00000000 00000000 00000000 00000000 00000000 00000000 00000000 00000000 ................................ 0000E0
00000000 00000000 00000000 00000000 00000000 00000000 00000000 00000000 ................................ 000100
00000000 00000000 00000000 00000000 00000000 00000000 00000000 00000000 ................................ 000120
00000000 00000000 00000000 00000000 00000000 00000000 00000000 00000000 ................................ 000140
00000000 00000000 00000000 00000000 00000000 00000000 00000000 00000000 ................................ 000160
00000000 00000000 00000000 00000000 00000000 00000000 00000000 00000000 ................................ 000180
00000000 00000000 00000000 00000000 00000000 00000000 00000000 00000000 ................................ 0001A0
00000000 00000000 00000000 00000000 00000000 00000000 00000000 00000000 ................................ 0001C0
00000000 00000000 00000000 00000000 00000000 00000000 00000000 00000000 ................................ 0001E0

Dump of file SATURN:[PCCOMMON.DUMP.DLL]ISFORM.TMP;1 on 18-APR-1990 10:47:28.98
```

```
File ID (717,16,0)    End of file block 58 / Allocated 60

Virtual block number 51 (00000033), 512 (0200) bytes

 00000000 00000000 00000000 00000000 00000000 00000000 00000000 00000000 ................................ 000000
 00000000 00000000 00000000 00000000 00000000 00000000 00000000 00000000 ................................ 000020
 00000000 00000000 00000000 00000000 00000000 00000000 00000000 00000000 ................................ 000040
 00000000 00000000 00000000 00000000 00000000 00000000 00000000 00000000 ................................ 000060
 00000000 00000000 00000000 00000000 00000000 00000000 00000000 00000000 ................................ 000080
 00000000 00000000 00000000 00000000 00000000 00000000 00000000 00000000 ................................ 0000A0
 00000000 00000000 00000000 00000000 00000000 00000000 00000000 00000000 ................................ 0000C0
 00000000 00000000 00000000 00000000 00000000 00000000 00000000 00000000 ................................ 0000E0
 00000000 00000000 00000000 00000000 00000000 00000000 00000000 00000000 ................................ 000100
 00000000 00000000 00000000 00000000 00000000 00000000 00000000 00000000 ................................ 000120
 00000000 00000000 00000000 00000000 00000000 00000000 00000000 00000000 ................................ 000140
 00000000 00000000 00000000 00000000 00000000 00000000 00000000 00000000 ................................ 000160
 00000000 00000000 00000000 00000000 00000000 00000000 00000000 00000000 ................................ 000180
 00000000 00000000 00000000 00000000 00000000 00000000 00000000 00000000 ................................ 0001A0
 00000000 00000000 00000000 00000000 00000000 00000000 00000000 00000000 ................................ 0001C0
 00000000 00000000 00000000 00000000 00000000 00000000 00000000 00000000 ................................ 0001E0

Dump of file SATURN:[PCCOMMON.DUMP.DLL]ISFORM.TMP;1 on 18-APR-1990 10:47:28.98
File ID (717,16,0)    End of file block 58 / Allocated 60

Virtual block number 52 (00000034), 512 (0200) bytes

 00000000 00000000 00000000 00000000 00000000 00000000 00000000 00000000 ................................ 000000
 00000000 00000000 00000000 00000000 00000000 00000000 00000000 00000000 ................................ 000020
 00000000 00000000 00000000 00000000 00000000 00000000 00000000 00000000 ................................ 000040
 00000000 00000000 00000000 00000000 00000000 00000000 00000000 00000000 ................................ 000060
 00000001 00000000 00000000 00000000 0000031A 13340000 00000000 00000000 ..........4..................... 000080
 00000000 00000000 00000000 00000000 00000000 00000000 00000000 81818101 ................................ 0000A0
 00000000 00000000 00000000 00000000 00000000 00000000 00000000 00000000 ................................ 0000C0
 00000000 00000000 00000000 00000000 00000000 00000000 00000000 00000000 ................................ 0000E0
 00000000 00000000 00000000 00000000 00000000 00000000 00000000 00000000 ................................ 000100
 00000000 00000000 00000000 00000000 00000000 00000000 00000000 00000000 ................................ 000120
 00000000 00000000 00000000 00000000 00000000 00000000 00000000 00000000 ................................ 000140
 00000000 00000000 00000000 00000000 00000000 00000000 00000000 00000000 ................................ 000160
 00000000 00000000 00000000 00000000 00000000 00000000 00000000 00000000 ................................ 000180
 0A0A0A0A 0A0A0A0A 0A0A0A0A 0A0A0A0A 0A0A0A0A 0A0A0A0A 0A0A0A0A 0A0A0A00 ................................ 0001A0
 0A0A0A0A 0A0A0A0A 0A0A0A0A 0A0A0A0A 0A0A0A0A 0A0A0A0A 0A0A0A0A 0A0A0A0A ................................ 0001C0
 0A0A0A0A 0A0A0A0A 0A0A0A0A 0A0A0A0A 0A0A0A0A 0A0A0A0A 0A0A0A0A 0A0A0A0A ................................ 0001E0

Dump of file SATURN:[PCCOMMON.DUMP.DLL]ISFORM.TMP;1 on 18-APR-1990 10:47:28.98
File ID (717,16,0)    End of file block 58 / Allocated 60

Virtual block number 53 (00000035), 512 (0200) bytes

 0A0A0A0A 0A0A0A0A 0A0A0A0A 0A0A0A0A 0A0A0A0A 0A0A0A0A 0A0A0A0A 0A0A0A0A ................................ 000000
 0A0A0A0A 0A0A0A0A 0A0A0A0A 0A0A0A0A 0A0A0A0A 0A0A0A0A 0A0A0A0A 0A0A0A0A ................................ 000020
 0A0A0A0A 0A0A0A0A 0A0A0A0A 0A0A0A0A 0A0A0A0A 0A0A0A0A 0A0A0A0A 0A0A0A0A ................................ 000040
 0A0A0A0A 0A0A0A0A 0A0A0A0A 0A0A0A0A 0A0A0A0A 0A0A0A0A 0A0A0A0A 0A0A0A0A ................................ 000060
 0A0A0A0A 0A0A0A0A 0A0A0A0A 0A0A0A0A 0A0A0A0A 0A0A0A0A 0A0A0A0A 0A0A0A0A ................................ 000080
 00000000 00000000 00000000 00000000 00000000 00000000 00000000 0000000A ................................ 0000A0
 3C3CFFFF FFFF073E 15580000 00000000 00000000 00000000 00002000 00000000 ..... ................X.>.....<< 0000C0
 00776F6C 66726576 6F206B63 61747320 200A0D30 30303652 00003E3E 4753404E NMSG>>..R6000..- stack overflow. 0000E0
 30207962 20656469 76696420 72656765 746E6920 200A0D33 30303652 0003000A ....R6003..- integer divide by 0 000100
 66206563 61707320 6867756F 6E652074 6F6E2020 0A0D3830 30365200 08000A0D .....R6008..- not enough space f 000120
 6E652074 6F6E2020 0A0D3930 30365200 09000A0D 73746E65 6D756772 6120726F or arguments.....R6009..- not en 000140
 0000FC00 0A0D746E 656D6E6F 7269766E 6520726F 66206563 61707320 6867756F ough space for environment...*.. 000160
 66202D0A 00323030 36520002 0020726F 72726520 656D6974 206E7572 00FF000A ....run-time error ...R6002..- f 000180
 0003FFFF FF000A0D 64656461 6F6C2074 6F6E2074 6E696F70 20676E69 74616F6C loating point not loaded........ 0001A0
 00000000 00000000 00000006 193C0002 00000005 074E0002 00000004 18880002 ..........N.......<............. 0001C0
 00889400 009006F8 00000001 0000003A 00000000 FFFF0001 000E0352 00000888 ....R...........:.......½.....£. 0001E0

Dump of file SATURN:[PCCOMMON.DUMP.DLL]ISFORM.TMP;1 on 18-APR-1990 10:47:28.98
```

```
File ID (717,16,0)   End of file block 58 / Allocated 60

Virtual block number 54 (00000036), 512 (0200) bytes

 02F70005 80010001 16F00005 00050000 00000000 06F9FFFF 01000318 00F8FD74 t»½.......'...........».......%. 000000
 00EC02E8 00078002 000C0703 00000006 00000000 0000FFFF FFFF0120 00080060 '...-.....................Š.&. 000020
 00080060 02090005 80010001 07040012 00050000 00000000 FFFFFFFF 012C0008 ..,......................).'... 000040
 01360008 001E02CD 00078002 000C0717 00000006 00000000 0000FFFF FFFF0137 7.....................ë.....6. 000060
 FFFF0141 00080060 029E0007 80010001 0718000C 00050000 00000000 FFFFFFFF ......................'...A... 000080
 FFFFFFFF 014A0008 0060028A 00078001 00010725 000F0005 00000000 0000FFFF ...........%.......¤.'...J..... 0000A0
 0000FFFF FFFF0156 00080060 025B0005 80010001 07350008 00050000 00000000 ..........5.......[.'...V....... 0000C0
 00000000 FFFFFFFF 01570008 00C1024F 00078002 000C073E 00000006 00000000 ........>.......O.è...W......... 0000E0
 00000000 0000FFFF FFFF0158 00080060 02430005 80010001 073F0009 00050000 ......?.......C.'...X........... 000100
 00030000 00000000 FFFFFFFF 01590030 00C50211 00058000 00000749 00000007 ....I.........é.0.Y............. 000120
 00070003 00000000 0000FFFF FFFF015A 000C0026 023500CE 80020400 074A0003 ..J.....ö.5.&...Z............... 000140
 07560006 00030000 00000000 FFFFFFFF 015B000C 00260223 00CF8002 0000074E N.....ü.#.&...[...............V. 000160
 0001075D 00090005 00000000 0000FFFF FFFF015C 000C0026 021100CF 80020000 ....ü...&...\...............]... 000180
 80000000 07670000 00070000 00000000 FFFFFFFF 01900008 00600201 00058001 ......'...................g..... 0001A0
 00058001 00010768 000A0005 00000000 0000FFFF FFFF0191 003000F0 01CF0005 ..ü.Þ.0...............h....... 0001C0
 01800005 80000000 07730000 00070000 00000000 FFFFFFFF 019A0008 0060018F €.'...................s......... 0001E0

Dump of file SATURN:[PCCOMMON.DUMP.DLL]ISFORM.TMP;1 on 18-APR-1990 10:47:28.98
File ID (717,16,0)   End of file block 58 / Allocated 60

Virtual block number 55 (00000037), 512 (0200) bytes

 00EE0120 00058001 00020774 00180005 00000000 0000FFFF FFFF0198 003000F0 Þ.0.................t....... .Y. 000000
 0008001C 0170000A 80010001 07800006 00050000 00000000 FFFFFFFF 01A40065 e.Ê......................p..... 000020
 01A60008 001E0164 000C8002 000C0794 00000006 00000000 0000FFFF FFFF01A5 Ê.....................d.....Î. 000040
 FFFF01A7 00080060 0170002E 80010001 07950010 00050000 00000000 FFFFFFFF ......................p.'...Ï... 000060
 FFFFFFFF 01A80008 00930164 00308002 000C07A6 00000006 00000000 0000FFFF ............Î.....0.d.....´..... 000080
 0000FFFF FFFF01AC 00080060 0155000A 80010001 07A70013 00050000 00000000 ............Ï.......U.'...¯..... 0000A0
 00000000 FFFFFFFF 01AD0030 00B80124 000C8000 000007BB 00000007 00000000 ........£.......$.£.0.Ü......... 0000C0
 00000000 0000FFFF FFFF01AE 000C0026 014700CB 80020400 07BC0003 00030000 ......¥.....ü.G.&...Ü........... 0000E0
 00030000 00000000 FFFFFFFF 01AF000C 00260135 00CB8002 000007C0 00070003 ....à.....ù.5.&._.€............. 000100
 00110005 00000000 0000FFFF FFFF0180 000C0026 012300CB 80020000 07C80006 ..à.....ù.#.&...¯............... 000120
 07E10008 00050000 00000000 FFFFFFFF 01B80008 00600112 00068001 000107CF ü.........'...¡.................À. 000140
 000C07EA 00000006 00000000 0000FFFF FFFF0385 00080060 00DE0005 80010001 ......8.'..................ô... 000160
 80010001 07EB0008 00050000 00000000 FFFFFFFF 03860008 00C10002 00078002 ....@.è...................Š..... 000180
 00058000 000007F4 00000007 00000000 0000FFFF FFFF0387 00080060 00C60005 ..ô.'..................¶....... 0001A0
 008600CF 80020400 07F50003 00030000 00000000 FFFFFFFF 03880030 00C50094 ..é.0..................%.....ù.Ñ. 0001C0
 002600A6 00D08002 000007F9 00070003 00000000 0000FFFF FFFF0389 000C0026 &.....................'.....À.Î.&. 0001E0

Dump of file SATURN:[PCCOMMON.DUMP.DLL]ISFORM.TMP;1 on 18-APR-1990 10:47:28.98
File ID (717,16,0)   End of file block 58 / Allocated 60

Virtual block number 56 (00000038), 512 (0200) bytes

 000C0026 009400CF 80020000 08010006 00030000 00000000 FFFFFFFF 038A000C ........................ü...&... 000000
 03800008 00600084 000^8001 00010808 00050005 00000000 0000FFFF FFFF0388 ........................'..... 000020
 FFFF038E 000800C1 00780007 8002000C 080E0000 00060000 00000000 FFFFFFFF ....................x.è....... 000040
 FFFFFFFF 038F0008 0060006C 00058001 0001080F 00060005 00000000 000ᵤ ᶠFF ....................l.'......... 000060
 0000FFFF FFFF0390 003000C5 003A0005 80000000 08160000 00070000 0000ᴸ 70 .................:.é.0......... 000080
 00000000 FFFFFFFF 0391000C 0026005E 00CF8002 04000817 00030003 000000J0 ..............ü.^.&............. 0000A0
 00000000 0000FFFF FFFF0392 000C0026 004C00CF 80020000 08180007 00030000 ............ü.L.&............... 0000C0
 00050000 00000000 FFFFFFFF 0393000C 0026003A 00CF8002 00000823 00060003 ....#.....u.:.&................. 0000E0
 00070005 00000000 0000FFFF FFFF0398 002D00EC 00050005 80010002 082A0004 ..*.........&.-................. 000100
 08370007 00050000 00000000 FFFFFFFF 03990008 002D0014 000A8001 0001082F /.........-....................7. 000120
 0001083F 00040005 00000000 0000FFFF FFFF039A 00080028 00090009 80010001 ........(...................?... 000140
 80010001 08440004 00050000 00000000 FFFFFFFF 03980008 0014001F 00388001 ..8.......................D..... 000160
 00898001 00010849 00100005 00000000 0000FFFF FFFF039C 0008001D 001F0078 x.......................I.....¿. 000180
 00140038 80010001 085A0005 00050000 00000000 FFFFFFFF 03900008 001E001F .......................Z.....8... 0001A0
 00360009 00388001 00010860 00050005 00000000 0000FFFF FFFF009C 00080036 6.....................'.....8...6. 0001C0
 00080036 00140078 80010001 08660005 00050000 00000000 FFFFFFFF 009F0008 ....................f.....x...6... 0001E0

Dump of file SATURN:[PCCOMMON.DUMP.DLL]ISFORM.TMP;1 on 18-APR-1990 10:47:28.98
```

File ID (717,16,0)    End of file block 58 / Allocated 60

Virtual block number 57 (00000039), 512 (0200) bytes

```
00A00008 00360009 00788001 0001086C 00050005 00000000 0000FFFF FFFF0090 ................t......x...6..... 000000
FFFF009E 00080036 00140088 80010001 08720005 00050000 00000000 FFFFFFFF ..............r.....j...6....... 000020
FFFFFFFF 00A10008 00360009 00888001 00010878 00050005 00000000 0000FFFF ............x.....j...6...Å..... 000040
0000FFFF FFFF014C 003000F0 02680005 80030007 087E0000 000A0000 00000000 ..........~.......k.Þ.0.ä....... 000060
00000000 FFFFFFFF 0148000A 00EE02AD 00068002 0000087F 00000907 00000000 ................Ü.Ÿ...K......... 000080
00000000 0000FFFF FFFF0189 002400EC 00E80007 80030007 08800000 000A0000 ..............Š.š.$.¿........... 0000A0
60614E00 00000000 FFFFFFFF 039E000A 00360306 00078002 00020881 00060003 ................6.............Nam 0000C0
74706972 63736544 00003A72 65626D75 6E206572 6F747320 6F666E49 00003A65 e:..Info store number:..Descript 0000E0
2A00003A 6D796E6F 6E795300 3A6C6564 6F6D2073 7365636F 72502A00 3A6E6F69 ion:.*Process model:.Synonym:..* 000100
6E492A00 6574656C 65440065 63616C70 65520064 64410000 736D796E 6F6E7953 Synonyms..Add.Replace.Delete.*In 000120
74637572 74732065 726F7453 00007377 6F6C662D 74754F2A 00007377 6F6C662D -flows..*Out-flows..Store struct 000140
626F2073 746E6574 6E6F4300 003A7265 64724F00 73746E65 746E6F63 20657275 ure contents.Order:..Contents ob 000160
00646441 00007374 6E65746E 6F632065 72757463 75727453 2A00003A 7463656A ject:..*Structure contents..Add. 000180
3A657669 7463656A 626F206D 65747379 53006574 656C6544 00656361 6C706552 Replace.Delete.System objective: 0001A0
6563616C 70655200 64644100 00736472 6F777965 4B00003A 64726F77 79654B00 .Keyword:..Keywords..Add.Replace 0001C0
616C7065 52006464 41000073 65746F4E 2A00003A 65746F4E 00657465 6C654400 .Delete.Note:..*Notes..Add.Repla 0001E0
```

Dump of file SATURN:[PCCOMMON.DUMP.DLL]ISFORM.TMP;1 on 18-APR-1990 10:47:28.98
File ID (717,16,0)    End of file block 58 / Allocated 60

Virtual block number 58 (0000003A), 512 (0200) bytes

```
44006465 74616470 55006465 74616572 43006F66 6E490065 74656C65 44006563 ce.Delete.Info.Created.Updated.D 000000
005F5F5F 5F5F006E 6F697461 6D726F66 6E692072 65735500 656D6954 00657461 ate.Time.User information._____. 000020
0000005F 5F5F5F5F 005F5F5F 5F5F005F 5F5F5F5F 005F5F5F 5F5F005F 5F5F5F5F _____._____._____._____._____... 000040
00000000 00000000 00000000 00000000 00000000 00000000 00746365 6C655300 .Select......................... 000060
00000000 00000000 00000000 00000000 00000000 00000000 00000000 00000000 ................................ 000080
00000000 00000000 00000000 00000000 00000000 00000000 00000000 00000000 ................................ 0000A0
00000000 00000000 00000000 00000000 00000000 00000000 00000000 00000000 ................................ 0000C0
00000000 00000000 00000000 00000000 00000000 00000000 00000000 00000000 ................................ 0000E0
00000000 00000000 00000000 00000000 00000000 00000000 00000000 00000000 ................................ 000100
00000000 00000000 00000000 00000000 00000000 00000000 00000000 00000000 ................................ 000120
00000000 00000000 00000000 00000000 00000000 00000000 00000000 00000000 ................................ 000140
00000000 00000000 00000000 00000000 00000000 00000000 00000000 00000000 ................................ 000160
00000000 00000000 00000000 00000000 00000000 00000000 00000000 00000000 ................................ 000180
00000000 00000000 00000000 00000000 00000000 00000000 00000000 00000000 ................................ 0001A0
00000000 00000000 00000000 00000000 00000000 00000000 00000000 00000000 ................................ 0001C0
00000000 00000000 00000000 00000000 00000000 00000000 00000000 00000000 ................................ 0001E0
```

Dump of file SATURN:[PCCOMMON.DUMP.DLL]IECOMMON.TMP;1 on 18-APR-1990 10:46:52.51
File ID (698,35,0)    End of file block 64 / Allocated 64

Virtual block number 1 (00000001), 512 (0200) bytes

```
00000000 00000040 00000000 00000088 0000FFFF 00000004 00000040 01785A4D MZx.@...........j........@....... 000000
00000080 00000000 00000000 00000000 00000000 00000000 00000000 00000000 ................................ 000020
6F6E6E61 63206061 72676F72 70207369 685421CD 4C01B821 CD09B400 0EBA1F0E ..º..Ç.eL!.L!This program canno 000040
00000000 00000024 0A0D0D2E 65646F6D 20534F44 206E6920 6E757220 65622074 t be run in DOS mode....$....... 000060
00050006 00000000 00030000 00000000 00068006 EA9362E5 003102AD 0505454E NE..Ü.1.íb.õ.................... 000080
00000000 00000000 00010000 00040000 0000035E 01770160 00700070 00400010 ..@.p.p.m.w.^................... 0000A0
28800F00 2880015A 00110F00 00110157 00220F00 00220154 11340F00 11340037 7.4...4.T."...".W.......Z..(...( 0000C0
41484549 0A00006E 6F6D6D6F 63656908 42800F01 40CE03E9 02020E01 00000000 ........Õ.oâ..¯B.iecommon...IEHA 0000E0
4C534545 52464549 0A000250 554B4F4F 4C485341 4845490C 0001504F 4F4C4853 SHLOOP...IEHASHLOOKUP...IEFREESL 000100
4E414845 45524645 490C0004 454D414E 5443454A 424F5445 4745490F 0003544F OT...IEGETOBJECTNAME...IEFREEHAN 000120
41484445 4D414E54 45474549 1000064C 4C545845 4E544547 45490B00 05454C44 DLE...IEGETNEXTLL...IEGETNAMEDHA 000140
454E5445 4745490D 00085443 454A424F 5458454E 54454745 490F0007 454C444E NDLE...IEGETNEXTOBJECT...IEGETNE 000160
45490E00 0A454C44 4E414854 4E455252 55435445 47454912 00094953 52415458 XTARSI...IEGETCURRENTHANDLE...IE 000180
4909000C 544F4C53 5458454E 54454745 4900000B 544F4C53 54535249 46544547 GETFIRSTSLOT...IEGETNEXTSLOT...I 0001A0
46544547 45491000 0E4C4C54 53524946 54454745 490C0000 44444148 53414845 EHASHADD...IEGETFIRSTLL...IEGETF 0001C0
4C4C4143 534F4408 00012100 8C002900 0A000100 000F5443 454A424F 54535249 IRSTOBJECT.......)...!...DOSCALL 0001E0
```

Dump of file SATURN:[PCCOMMON.DUMP.DLL]IECOMMON.TMP;1 on 18-APR-1990 10:46:52.51
File ID (698,35,0)    End of file block 64 / Allocated 64

Virtual block number 2 (00000002), 512 (0200) bytes

```
4B434F4C 42454552 464D454D 0C4B434F 4C42434F 4C4C414D 4540D04D 45400353 S.MEM.MEMALLOCBLOCK.MEMFREEBLOCK 000000
454C4552 4741424C 54551352 4F535255 4354494E 49474142 4C545510 54554403 .DUT.UTLBAGINITCURSOR.UTLBAGRELE 000020
54550A52 4F535255 43455441 52455449 4741424C 54551352 4F535255 43455341 ASECURSOR.UTLBAGITERATECURSOR.UT 000040
49444441 5145534C 54550045 4B41404E 55514553 4C54550C 454B414D 5145534C LSEQMAKE.UTLSEQUNMAKE.UTLSEQADDI 000060
514C4D44 00454C44 4E4^484C 45444F4D 59524555 514C4D44 136C6D64 03404554 TEM.dml.DMLQUERYMODELHANDLE.DMLQ 000080
4540414E 544E4952 5044494C 4D445952 4555514C 4D441644 494C4D44 59^?4555 UERYDMLID.DMLQUERYDMLIDPRINTNAME 0000A0
4C52544F 4C535952 4555514C 4D441845 5A495354 4F4C5359 52455551 4C4L ?410 .DMLQUERYSLOTSIZE.DMLQUERYSLOTRL 0000C0
454E4F46 4E494E4C 52544F4C 53595245 55514C4D 44175453 5249464F 464E4 4E NINFOFIRST.DMLQUERYSLOTRLNINFONE 0000E0
534F4408 4F495303 44494C4D 44455059 54544F4C 53595245 55514C4D 44155458 XT.DMLQUERYSLOTTYPEDMLID.SIO.DOS 000100
8D01093C 01108401 0AE9010E C7010E1E 01010F44 41455253 4F440745 54495257 WRITE.DOSREAD......ú..Ô..Ç..<... 000120
690C0000 09B0010C 8F010FA7 010BD701 08200105 FD01001F 010A3A01 07780100 ..x..:.....».. ..■..Ï.....¯....i 000140
26065EC4 D88EFFFF 881E5657 000000C8 00000000 004C4C44 2E6E6F6D 6D6F6365 ecommon.DLL.....à...WV.¡...Äá^.& 000160
00B80847 8926065E C4400447 8B26065E C4000106 47C72606 5EC400E4 E902478B .G.ÕÕ.á^.&úG...á^.&.G.∂á^.&.G.¡. 000180
26065EC4 00CFE900 00B80008 0847C726 065EC400 010647C7 26065EC4 00E7E900 .ÕÕ.á^.&úG...á^.&úG...¡..Õü.á^.& 0001A0
5EC400AD E90000B8 00050847 C726065E C4000106 47C72606 5EC4007F E904478B .G.Õ..á^.&úG...á^.&úG...¡..ÕÜ.á^ 0001C0
C4000106 47C72606 5EC40095 E90000B8 00070847 C726065E C4000106 47C72606 .&úG...á^.&úG...¡..Õ..á^.&úG...á 0001E0
```

Dump of file SATURN:[PCCOMMON.DUMP.DLL]IECOMMON.TMP;1 on 18-APR-1990 10:46:52.51
File ID (698,35,0) End of file block 64 / Allocated 64

Virtual block number 3 (00000003), 512 (0200) bytes

```
5EC40647 8926065E C4E8D104 47882606 5EC4007D E90000B8 000C0847 C726065E ^.&úG...¡..Õ).á^.&.G.ìÕá^.&.G.á^ 000000
E90000B8 00070847 C726065E C40647FF 26065EC4 0007E903 75000104 47F72606 .&%G...u.Õ..á^.&.G.á^.&úG...¡..Õ 000020
7500043D FF82E903 7500023D FF72E903 7700013D FFC2E903 73C00800 22E90049 I.Õ"..ás.Õò.=..w.Õr.=..u.Õ..=..u 000040
E9037500 043DFF2A E9037500 033DFF4A E9037500 0130001B E9FFA7E9 FF92E903 .Õ..ÕI.Õ..=..u.ÕJ.=..u.Õ*.=..u.Õ 000060
B80E5EC4 D88E0008 881E5657 000006C8 CBC95F5E 1F0000E9 98E88800 00E9FF04 ..Õ..¡Õ.Õ...^_èùà...WV.¡...Äá^.¡ 000080
FA468900 00FFFF9A 5016FC46 8D106A1C 6A37FF26 065EC407 89260247 89260000 ..&.G.&..á^.&¯7j.j..F•.P......F* 0000A0
C4025789 26078926 08568806 4688FC5E C40053E9 FA468800 06E90375 00FA7E83 .-*.u.Õ...F*ÕS.á^•.F..V.&..&.W.á 0000C0
5EC40847 89260A47 89260000 88FC5EC4 06578926 04478926 0C56880A 4688FC5E ^•.F..V.&.G.&.W.á^•¡..&.G.&.G.á^ 0000E0
E9FA4688 02578926 078926FE 5688FC46 880E5EC4 0C478926 0E478926 000088FC •¡..&.G.&.G.á^..F•.V±&..&.W..F*Õ 000100
4689EA46 89000088 0000FA46 C7D88E01 28881E56 5700001C C8CBC95F 5E1F0000 ...^_èùà...WV.¡(..ÁúF*..¡...Fõ.F 000120
00FFFF9A 5016F046 8D5016EE 4680E76 FF0C76FF 5016FC46 800676FF 0876FFE8 Õ.v..v..F•.P.v..v..FŸ.P.FÞ.P.... 000140
FF9A5016 F6468D0A 76FF0164 E900008A 00008800 09E90375 00EC7E83 EC468900 ..F$.-$.u.Õ..¡..¤..Õd..v..F-.P.. 000160
80046A1C 6A0A76FF 0142E900 008A0000 880009E9 037500EC 7E83EC46 890000FF ....F$.~$.u.Õ..¡..¤..ÕB..v.j.j.. 000180
8926EE46 8BE45EC4 0071E900 03E90375 00EC7E83 EC468900 0001499A 5016E446 FÕ.P.I....F$.-$.u.Õ..Õq.á^Õ.FŸ&. 0001A0
E476FFE6 76FF006A 006A006A F676FFF8 76FFFA46 FF024789 26F04688 E45EC407 .á^Õ.FÞ&.G..F*.v½.v-j.j.j..vl.vÕ 0001C0
16EE4680 FC76FFFE 76FF0676 FF0876FF 0033E903 75FE4608 FC468800 00FFFF9A ......F•.F±u.Õ3..v..v..v±.v•.FŸ. 0001E0
```

Dump of file SATURN:[PCCOMMON.DUMP.DLL]IECOMMON.TMP;1 on 18-APR-1990 10:46:52.51
File ID (698,35,0) End of file block 64 / Allocated 64

Virtual block number 4 (00000004), 512 (0200) bytes

```
FC4689FE 46890000 B80009E9 037500EC 7E83EC46 890000FF FF9A5016 F0468050 P.FÞ.P......F$.-$.u.Õ..¡...F±.F• 000000
02E0C1FA 46881C6A 0A76FF00 91E90003 E9037400 FA7E83FF 6FE90003 E90003E9 Õ..Õ..Õo..-*.t.Õ..Õ...v.j..F*èÁ. 000020
E8468800 69E90003 E9037500 EC7E83EC 46890000 02359A50 16E84680 50000405 ...P.FÕ.P.S....F$.-$.u.Õ..Õi..FÕ 000040
9A5016F2 4680F676 FFF876FF 0000FFFF 9AF676FF F876FFE6 5689E446 89EA5688 .Võ.FÕ.Vl.v½.v-......v½.v-.F·.P. 000060
02578926 078926E4 5EC40257 88260788 26F25EC4 0029E903 7400003D 0000FFFF ....=..t.Õ).á^·&..&.W.á^Õ&..&.W. 000080
E45EC400 0007C726 E45EC4FF BFE90000 FFFF9AF2 76FFF476 FF0A76FF 04E44683 .FÕ..v..v¶.v·.....Õ¢.á^Õ&ú...á^Õ 0000A0
C8CBC95F 5E1F0000 E9EA5688 E8468800 00FFFF9A F676FFF8 76FF0000 0247C726 &úG....v½.v-......FÕ.VõÕ...^_èùà 0000C0
7E83E846 890000FF FF9A5016 F4468D08 76FF0A76 FFD88E01 BF881E56 57000118 ...WV.¡¢..Á.v..v..F¶.P......FÕ.~ 0000E0
FF9A5016 FE4680F4 76FFF676 FF0876FF 0A76FF02 58E9E846 880006E9 037500E8 Õ.u.Õ...FÕÕ(..v..v..v-.v¶.F±.P.. 000100
89025788 26078826 0C5EC402 33E9E846 880006E9 037500E8 7E83E846 890000FF ....FÕ.-Õ.u.Õ...FÕÕ3.á^.&..&.W.. 000120
5EC40876 FF0A76FF 01F8E903 75003F83 26EA5EC4 0EEA4683 0004E9EC 5689EA46 Fõ.V$Õ...Fõ.á^Õ&.?.u.Õ½..v..v.á^ 000140
CFE90003 E9037500 E87E83E8 46890000 FFFF9A00 FF685016 FEE8868D 37FF26EA õ&.7..Õ±.Ph........FÕ.-Õ.u.Õ..Õü 000160
8BEA4688 5040F246 8B1C6A06 76FFF246 8904C483 045F0070 9A5016FE E8868001 ...Õ±.P.p._..á..F·.v.j..F·∂P.Fõ. 000180
16FEE886 800195E9 0003E903 7500E87E 83E84689 000002DA 9A505200 0205EC56 V$...RP.Õ...FÕ.-Õ.u.Õ..Õ....Õ±. 0001A0
89085788 26064788 26EA5EC4 08C483FF FF00109A 0277FF26 0477FF26 EA5EC450 Pá^Õ&.w.&.w.......á.á^Õ&.G.&.W.. 0001C0
0375003F 8326FA5E C40087E9 0375FC46 0BFA4688 0EFA4683 0004E9FC 5689FA46 F*.V•Õ...F*..F*.F•u.Õñ.á^*&.?.u. 0001E0
```

Dump of file SATURN.[PCCOMMON.DUMP.DLL]IECOMMON.TMP;1 on 18-APR-1990 10:46:52.51
File ID (698,35,0) End of file block 64 / Allocated 64

Virtual block number 5 (00000005), 512 (0200) bytes

```
50520002 05FC5688 FA468B37 FF26FA5E C437FF26 EA5EC408 76FF0A76 FF00ABE9 Ō¨..v..v.á^ō&.7á^*&.7.F*.V=...RP 000000
28E90374 03027F83 26FA5EC4 011CE900 03E90375 00E87E83 E8468900 00FFFF9A ......FÒ.-Ò.u.Ō..Ō..á^*&....t.Ō( 000020
5EC40AC4 83053301 879A0876 FF0A76FF 0676FF37 FF26EA5E C437FF26 FA5EC400 .á^*&.7á^ō&.7.v..v..v..ñ.3..á.á^ 000040
5688FA46 8837FF26 FA5EC437 FF26EA5E C40876FF 0A76FF0C 5789260A 478926FA *&.G.&.W..v..v.á^ō&.7á^*&.7.F*.V 000060
FA76FFFC 76FF0086 E90003E9 037500E8 7E83E846 890000FF FF9A5052 000405FC =...RP......FÒ.-Ò.u.Ō..ŌÑ..v=.v* 000080
E9F05689 EE468C0C 5788260A 478826EA 5EC4FF3A E9E84689 04C483FF FF00009A ......á..FÒŌ:.á^ō&.G.&.W..FŸ.VÞŌ 0000A0
0A76FF00 70E90375 003F8326 EE5EC400 7CE90375 F0460BEE 468808EE 46830004 ...FŸ..FŸ.FÞu.Ō|.á^Ÿ&.?.u.Ōp..v. 0000C0
00E87E83 E8468900 0004819A 5016F846 8D37FF26 EE5EC437 FF26EA5E C40876FF .v.á^ō&.7á^Ÿ&.7.F½.P.Ÿ....FÒ.-Ò. 0000E0
C437FF26 EE5EC400 37E998E8 E846C700 08E90375 02F87E83 0048E900 03E90375 u.Ō..ŌH..-½.u.Ō..úFÒŌ.Ō7.á^Ÿ&.7á 000100
57892604 478926EE 5EC40AC4 8304E901 879A0876 FF0A76FF 0676FF37 FF26EA5E ^ō&.7.v..v..v..ñ.Ō..á.á^Ÿ&.G.&.W 000120
0447C726 0C5EC400 09E90374 00E87E83 FDF8E9FF 75E90008 0247C726 EE5EC406 .á^Ÿ&úG...Ōu.Ō½».-Ò.t.Ō..á^.&úG. 000140
26000088 065EC4D8 8E0377B8 1E565700 000CC8C8 C95F5E1F 0000E9E8 46880001 ...FÒŌ...^ èùà...WV.¡W..Aá^.¡..& 000160
47082607 8826F65E C414F646 830004E9 0605F846 C7262EF6 46C70789 26024789 .G.&..úF-.ĪúF½..Ō...F-.á^-&..&.G 000180
8826F65E C4FFD8E9 0003E900 03E90374 06473926 164688F6 5EC40015 E9037502 .u.Ō..á^-.F.&9G.t.Ō..Ō..ŌA.á^-&. 0001A0
04389A50 16FC4680 0FD6681C 6A1876FF 0111E998 E1880006 E9037402 47082607 .&.G.t.Ō..¡Ã.Ō...v.j.h®..F=.P.8. 0001C0
FC5EC407 89261846 88FC5EC4 00EDE9F4 46880006 E9037500 F47E83F4 46890000 ...F¶.~¶.u.Ō...F¶ŌÙ.á^=.F.&..á^• 0001E0
```

Dump of file SATURN:[PCCOMMON.DUMP.DLL]IECOMMON.TMP;1 on 18-APR-1990 10:46:52.51
File ID (698,35,0)   End of file block 64 / Allocated 64

Virtual block number 6 (00000006), 512 (0200) bytes

```
26F65EC4 06478926 08478926 000088FC 5EC40457 89260247 8926F856 88F64688 .F-.V½&.G.&.W.á^•¡..&.G.&.G.á^-& 000000
26F65EC4 0E77FF26 F65EC408 C48306E0 00109A0E 76FF1076 FF0877FF 260A77FF .w.&.w..v..v....Å..á.á^-&.w.á^-& 000020
FA46FF00 03E90000 FA46C70C C483041A 00829A0A 76FF0C76 FF004268 1E0C77FF .w..hB..v..v..ÿ....á.úF*..Ō...F* 000040
DCE90A40 89260C40 89260000 88FC5EC4 02E6C1FA 76880017 E9037203 F3FA7E81 .-*µ.r.Ō...v*è|.á^•¡..&.ə.&.ə.ŌÉ 000060
1476FF02 77FF2604 77FF26FC 5EC4001F E9037400 047F8326 025FC426 FC5EC4FF .á^•&á_.&....t.Ō..á^•&.w.&.w..v. 000080
FC468806 5EC40013 E9037400 F47E83F4 46890AC4 8305C103 6F9A1876 FF1276FF .v..v..o.è..á..F¶.~¶.t.Ō..á^..F= 0000A0
00E9F446 88000003 3E9AFC76 FFFE76FF 1876FF00 0EE90257 89260789 26FE5688 .V±&..&.W.Ō...v..v±.v=.>....F¶Ō. 0000C0
89260247 89260000 88065EC4 D88E061E 881E5657 000010C8 0014CAC9 5F5E1F00 ..^ èò..à...WV.¡...Aá^.¡..&.G.&. 0000E0
03744010 C4830835 01329A0E 76FF1076 FF004968 1E5016F2 468D5016 F8468D07 ..F%.P.F·.P.hI..v..v..2.5..á.ət. 000100
078826F4 5EC414F4 46830004 E90780F6 46C7262E F446C701 7CE998E0 880006E9 Ō..¡Å.Ō|.úF¶.&úF-..Ō...F¶.á^¶&.. 000120
3926F246 88F45EC4 0021E903 74064739 261A4688 F45EC400 33E90375 02470826 &.G.u.Ō3.á^¶.F.&9G.t.Ō!.á^¶.F·&9 000140
26F45EC4 FF8AE900 03E90003 E903740E 473926F8 4688F45E C40012E9 03740C47 G.t.Ō..á^¶.F½&9G.t.Ō..Ō..Ōo.á^¶& 000160
FF260A77 FF26F45E C41276FF 1476FF01 14E998E1 880006E9 03740247 08260788 ..&.G.t.Ō..¡Å.Ō...v..v.á^¶&.w.&. 000180
0FD6681C 6A1C76FF 00EDE998 E1880006 E9037500 003008C4 8306C000 469A0877 w..F.á..á.=..u.Ō..¡Å.ŌÙ..v.j.h®. 0001A0
88FC5EC4 00C9E9F0 46880006 E9037500 F07E83F0 46890000 066E9A50 16FC4680 .F=.P.n....FÞ.-Þ.u.Ō...FÞŌè.á^•. 0001C0
08478926 000088FC 5EC40457 89260247 8926F656 88F44688 FC5EC407 89261C46 F.&..á^=.F¶.V-&.G.&.W.á^•¡..&.G. 0001E0
```

Dump of file SATURN:[PCCOMMON.DUMP.DLL]IECOMMON.TMP;1 on 18-APR-1990 10:46:52.51
File ID (698,35,0)   End of file block 64 / Allocated 64

Virtual block number 7 (00000007), 512 (0200) bytes

```
03E90000 FA46C702 57892607 89260A5E C41257B8 261047B8 26F45EC4 06478926 &.G.á^¶&.G.&.W.á^.&..&.W.úF*..Ō. 000000
89260C40 89260000 88FC5EC4 02E6C1FA 76880017 E9037203 F3FA7E81 FA46FF00 ..F*.-*µ.r.Ō...v*è|.á^•¡..&.ə.&. 000020
77FF2604 77FF26FC 5EC4001F E9037400 047F8326 025FC426 FC5EC4FF DCE90A40 ə.ŌÉ.á^•&á_.&....t.Ō..á^•&.w.&.w 000040
5EC40013 E90374C^ F07E83F0 46890AC4 83073903 6F9A1C76 FF1676FF 1876FF02 ..v..v..v..o.9..á..FÞ.-Þ.t.Ō..á^ 000060
88000007 679AFC?  FFFE76FF 1C76FF00 0EE90257 89260789 26FE5688 FC468806 ..F=.V±&..&.W.Ō...v..v±.v=.g.... 000080
46890856 88064688 D88E07C1 881E5657 00000AC8 0018CAC9 5F5E1F00 00E9F046 FÞŌ...^ èò..à...WV.¡è..Å.F..V..F 0000A0
C402E6C1 F6768800 2CE90372 03F3F67E 81F646FF 0003E900 00F646C7 FA5689F8 ½.V*úF-ˉ.Ō...F-.--µ.r.Ō,..v-è|.á 0000C0
035D9AFC 76FFFE76 FF0008E9 0375D008 FE5689FC 46890C50 88260A40 8826F85E ^½&.ə.&.P..F=.V±.Åu.Ō...v±.v=.]. 0000E0
0004CAC9 5F5E1F00 00E90000 09289AF8 76FFFA76 FF37FF26 F85EC4FF C7E90000 ..Ōù.á^½&.7.v*.v½.+...Ō...^ èò.. 000100
26025FC4 26FC5EC4 FE5689FC 46891656 88144688 D88E0944 881E5657 000004C8 à...WV.¡D..Å.F..V..F=.V±á^=Īá_.& 000120
8926105E C40788 26 065FC426 FC5EC408 57892606 478926FC 5EC40257 8826078B ..&.W.á^•&.G.&.W.á^=&á_.&..á^ˉ&. 000140
C48307A8 00889A0C 76FF0E76 FF0277FF 260477FF 26065FC4 26FC5EC4 0A76FF07 ..v.á^=&á_.&.w.&.w..v..v.....´..á 000160
0CC48308 FD01209A FC76FFFE 76FF0677 FF260877 FF26FC5E C40676FF 0876FF0A ..v..v.á^ˉ&.w.&.w..v±.v=. .»..á. 000180
89FC4689 16568814 4688D88E 098881E 56570000 04C80012 CAC95F5E 1F0000E9 Ō...^ èò..à...WV.||..Å.F..V..F=. 0001A0
0E064783 26FC5EC4 007AE998 E2880006 E9037408 47082606 478826FC 5EC4FE56 V±á^•Ī.G.&.G.t.Ō..¡ã.Ōz.á^=&.G.. 0001C0
88FC5EC4 0014E903 74003F83 26105EC4 07892610 5EC407B8 26065FC4 26FC5EC4 á^•&á_.&..á^.&..á^.&.?.t.Ō..á^•¡ 0001E0
```

Dump of file SATURN:[PCCOMMON.DUMP.DLL]IECOMMON.TMP;1 on 18-APR-1990 10:46:52.51
File ID (698,35,0)   End of file block 64 / Allocated 64

```
Virtual block number 8 (00000008), 512 (0200) bytes

 FF260477 FF26065F C426FC5E C40A76FF 0042E998 E3880647 89260847 89260000 ..&.G.&.G.¡D.Õ8..v.á^•&á_.&.w.&. 000000
 77FF2608 77FF26FC 5EC40676 FF0876FF 0AC4830A 0C00889A 0C76FF0E 76FF0277 w..v..v.......á..v..v.á^•&.w.&.w 000020
 1E565700 0004C800 12CAC95F 5E1F0000 E90CC483 0A280120 9AFC76FF FE76FF06 ..v±.v•. .+..á.Õ...^_èò..à...WV. 000040
 76FF0876 FF37FF26 FC5EC4FE 5689FC46 89025788 26078826 065EC4D8 8E0A4288 ¡8..Áá^.&..&.W..F•.V±á^•&.7.v..v 000060
 881E4688 D88E0AF1 881E5657 000008C8 0004CAC9 5F5E1F00 00E90000 09A29A06 ..Å...Õ...^_èò..à...WV.¡þ..Å.F.. 000080
 89260847 8926F85E C4085788 26064788 26045FC4 26F85EC4 FA5689F8 46892056 V .F½.V•á^½&á_.&.G.&.W.á^½&.G.&. 0000A0
 880006E9 0374003F 8326FC5E C4000CE9 0375FE46 08FC4688 FE5689FC 46890A57 W..F•.V±.F•.F±u.Õ..á^•&.?.t.Õ..¡ 0000C0
 5EC40789 26165EC4 02478826 FC5EC407 89261A5E C4078826 FC5EC400 58E998E5 [.Õ(.á^•&..á^.&..á^•&.G.á^.&..á^ 0000E0
 C4084788 26FC5EC4 0789260E 5EC40647 8826FC5E C4078926 125EC404 478826FC •&.G.á^.&..á^•&.G.á^.&..á^•&.G.á 000100
 0000E900 00880257 89260789 26065EC4 0C578826 0A478826 FC5EC407 89260A5E ^.&..á^•&.G.&.W.á^.&..&.W.¡..Õ.. 000120
 C4FA5689 F8468920 56881E46 88D88E08 28881E56 57000008 C8001CCA C95F5E1F .^_èò..à...WV.¡(..Å.F..V .F½.V•á 000140
 4788260E 08478326 F85EC400 83E998E4 880006E9 03740A47 08260847 8826F85E ^½&.G.&.G.t.Õ..¡ô.Õ..á^½&.G..&.G 000160
 FC5EC400 58E998E5 880006E9 0374003F 8326FC5E C4FE5689 FC46890A 57882608 .&.W..F•.V±á^•&.?.t.Õ..¡[.Õ(.á^• 000180
 125EC404 478826FC 5EC40789 26165EC4 02478826 FC5EC407 89261A5E C4078826 &..á^.&..á^•&.G.á^.&..á^•&.G.á^. 0001A0
 FC5EC407 89260A5E C4084788 26FC5EC4 0789260E 5EC40647 8826FC5E C4078926 &..á^•&.G.á^.&..á^•&.G.á^.&..á^• 0001C0
 C8001CCA C95F5E1F 0000E900 00880257 89260789 26065EC4 0C578826 0A478826 &.G.&.W.á^.&..&.W.¡..Õ...^_èò..à 0001E0

Dump of file SATUR :[PCCOMMON.DUMP.DLL]IECOMMON.TMP;1 on 18-APR-1990 10:46:52.51
File ID (698,35,0)   End of file block 64 / Allocated 64

Virtual block number 9 (00000009), 512 (0200) bytes

 8826045F C426F85E C4FA5689 F8468914 56881246 88088E08 0F881E56 57000008 ...WV.¡Ô..A.F..V..F½.V•á^½&á_.&. 000000
 E90375FE 4608FC46 88FE5689 FC46890E 5789260C 478926F8 5EC40C57 88260A47 G.&.W.á^½&.G.&.W..F•.V±.F•.F±u.Õ 000020
 0789260E 5EC4078B 26FC5EC4 0034E998 E7880006 E9037400 3F8326FC 5EC4000C ..á^•&.?.t.Õ..¡Õ.Õ4.á^•&..á^.&.. 000040
 89260789 26065EC4 06578826 04478826 FC5EC407 89260A5E C4024788 26FC5EC4 á^•&.G.á^.&..á^•&.G.&.W.á^.&..&. 000060
 56881246 88088E0C 97881E56 57000004 C80010CA C95F5E1F 0000E900 00880257 W.¡..Õ...^_èò..à...WV.¡...Á.F..V 000080
 EA880006 E9037400 3F8326FC 5EC4000C E90375FE 4608FC46 88FE5689 FC468914 ..F•.V±.F•.F±u.Õ..á^•&.?.t.Õ..¡ð 0000A0
 065EC407 89260A5E C4024788 26FC5EC4 0789260E 5EC40788 26FC5EC4 0032E998 .Õ2.á^•&..á^.&..á^•&.G.á^.&..á^. 0000C0
 0008C800 10CAC95F 5E1F0000 E9000088 02578926 07892600 0405FE56 88FC4688 .F•.V±...&..&.W.¡..Õ...^_èò..à.. 0000E0
 0E470826 0C478826 F85EC4FA 5689F846 89145688 12468808 8E002788 1E565700 .WV.¡'..Á.F..V..F½.V•á^½&.G.&.G. 000100
 5689FC46 890E5788 260C4788 26080C47 8326F85E C4005CE9 98E68800 06E90374 t.Õ..¡].Õ\.á^½&.G..&.G.&.W..F•.V 000120
 C4078926 0E5EC407 8826FC5E C40034E9 98E78800 06E90374 003F8326 FC5EC4FE ±á^•&.?.t.Õ..¡Õ.Õ4.á^•&..á^.&..á 000140
 57892607 8926065E C4065788 26044788 26FC5EC4 0789260A 5EC40247 8826FC5E ^•&.G.á^.&..á^•&.G.&.W.á^.&..&.W 000160
 1056880E 46880886 0095881E 56570000 0EC80010 CAC95F5E 1F0000E9 00008802 .¡..Õ...^_èò..à...WV.¡...Á.F..V. 000180
 E6C1F676 88006FE9 037203F3 F67E81F6 46FF0003 E90000F6 46C7FA56 89F84689 .F½.V•úF-¯.Õ...F-.--µ.r.Õo..v-èl 0001A0
 9AFC76FF FE76FF00 4EE90375 D008FE56 89FC4689 0C508826 0A408826 F85EC402 .á^½&.ä.&.P..F•.V±.Åu.ÕN..v±.v•. 0001C0
 26F25EC4 0028E903 7400030D 00000310 9A5016F2 468DFC76 FFFE76FF 00000300 .....v±.v•.F·.P.....=..t.Õ+.á^·& 0001E0

Dump of file SATURN:[PCCOMMON.DUMP.DLL]IECOMMON.TMP;1 on 18-APR-1990 10:46:52.51
File ID (698,35,0)   End of file block 64 / Allocated 64

Virtual block number 10 (0000000A), 512 (0200) bytes

 5EFF0A76 FF0C76FF 37FF26F2 5EC40277 FF260477 FF26F25E C40677FF 260877FF .w.&.w.á^·&.w.&.w.á^·&.7.v..v..^ 000000
 26881E56 57000010 C8000CCA C95F5E1F 0000E900 0088FF84 E9FF8DE9 0EC48306 ..á.Õ§.Õ..¡..Õ...^_èò..à...WV.¡& 000020
 9A0A76FF 0C76FF0E 76FF006A 03F36800 6AFA5689 F8468912 56881046 88D88E0E ..Å.F..V..F½.V•j.hµ.j..v..v..v.. 000040
 88260A40 8826F85E C402E6C1 F4768BF6 5689F446 890A8801 C09A5052 0EF9018C ..•.RP.à.E..F¶.V-.v¶èl.á^½&.ä.&. 000060
 00000E70 9AFC76FF FE76FF00 78E998E9 880006E9 0374D008 FE5689FC 46890C50 P..F•.V±.Åt.Õ..¡Õ.Õ(..v±.v•.p... 000080
 56880A46 88F05EC4 0052E903 74000030 00000E80 9A5016F0 468DFC76 FFFE76FF .v±.v•.FÞ.P.....=..t.ÕR.á^Þ.F..V 0000A0
 26E90374 0739260E 4688F05E C40034E9 03740457 3926003D E9037402 4739260C .&9G.t.Õ=.&9W.t.Õ4.á^Þ.F.&9.t.Õ& 0000C0
 57892607 8926065E C4085788 26064788 26F05EC4 0000FFFF 9AFC76FF FE76FF00 ..v±.v•.....á^Þ&.G.&.W.á^.&..&.W 0000E0
 CF881E56 57000012 C8000ECA C95F5E1F 0000E998 E988FF96 E90009E9 00008802 .¡..Õ..Õ..¡Õ.Õ...^_èò..à...WV.¡ü 000100
 9A0A76FF 0C76FF0E 76FF006A 03F36800 6AFA5689 F8468912 56881046 88D88E0E ..Å.F..V..F½.V•j.hµ.j..v..v..v.. 000120
 88260A40 8826F85E C402E6C1 F4768BF6 5689F446 890EF201 C09A5052 0F09018C ..1.RP.à.·..F¶.V-.v¶èl.á^½&.ä.&. 000140
 0F9A5016 FC468D37 FF26F85E C40039E9 0374FE46 08FC4688 FE5689FC 46890C50 P..F•.V±.F•.F±t.Õ9.á^½&.7.F=.P.. 000160
 4688F85E C402E6C1 F4768800 88E9F246 880006E9 037500F2 7E83F246 89000002 ....F·.~·.u.Õ...F·Õ...v¶èl.á^½.F 000180
 00000856 9A5016EE 468D0A6A 1C6A37FF 26F85EC4 0C508926 0A408926 FE5688FC •.V±&.ä.&.P.á^½&.7j.j..FŸ.P.V... 0001A0
 4688EE5E C4078926 0E4688EE 5EC40048 E9F24688 0006E903 7500F27E 83F24689 .F·.~·.u.Õ...F·ÕK.á^Ÿ.F.&..á^Ÿ.F 0001C0
 FE76FF08 57892606 47892608 56880646 88EE5EC4 04578926 02478926 0C56880A ..V.&.G.&.W.á^Ÿ.F..V.&.G.&.W..v± 0001E0

Dump of file SATURN:[PCCOMMON.DUMP.DLL]IECOMMON.TMP;1 on 18-APR-1990 10:46:52.51
File ID (698,35,0)   End of file block 64 / Allocated 64
```

Virtual block number 11 (0000000B), 512 (0200) bytes

```
5F5E1F00 00E9F246 8BF24689 00000271 9AEE76FF F076FF00 6A006A00 6AFC76FF .v•j.j.j..vÞ.vŸ.q....F·.F·Ô...^  000000
26FC5EC4 FE5689FC 46891056 8B0E4688 D88E0FAF 881E5657 000008C8 000ECAC9 èb..à...WV.¡É..Á.F..V..F•.V±á^•Ï 000020
0375003F 8326F85E C40EF846 830004E9 FA5689F8 46890257 88260788 26025FC4 á .&..&.W..F%.V*Ö...F%.á^½&.?.u. 000040
FF0277FF 260477FF 26F85EC4 0676FF00 22E90374 0739260C 4688F85E C40033E9 Õ3.á^%.F.&9.t.Ö"..v.á^½&.w.&.w.. 000060
C95F5E1F 0000E998 EB88FFB0 E90009E9 0000880A C4830FD2 00889A08 76FF0A76 v..v....•..á.¡..Ö..Ö§.¡$.Ö...^_è 000080
02030000 00041·· 00020071 0003098E 02030000 00010ADA 00020012 90000CCA ò.......Ö...........q.......... 0000A0
0203000E 000210.. 02030000 0006108C 0002007E 000310A0 020300F3 00040297 ....µ.......~...¥.......L....... 0000C0
020300A4 000403AF 02030090 00040387 0203001C 00020812 02030108 00040585 ........................£...Ê... 0000E0
020300C9 00040517 0203003E 00030F78 02030082 000403FE 0203002D 00030F2C ,...·...±...ý...x...>.......è... 000100
00000000 00000000 00000066 0003100F 0203000A 000401ED 02030052 00030F3C <...R...Ù...Ö.......f........... 000120
5F5E1F00 00E90001 880200A3 2606468B 3FE8068E D88EFFFF 881E5657 000000C8 à...WV.¡...Á..Ò?.F.&È..¡..Ö...^_ 000140
1F02C483 FFFF0000 9A57D88E FFFF881E 00000000 00000006 00080002 0001C8C9 èù...............¡...AW......á.. 000160
00000000 00000000 00000000 00000000 06000200 02000000 02000A00 020002C8 ù............................... 000180
8ED88CFE 880A76C5 1EDE88D7 88EC8855 00000000 00000000 00000000 00000000 ................U.$.•.B.év..±.Á. 0001A0
88F388A4 F3C913A5 F3E90149 A4027401 A8C78806 7EC4D1F7 AEF2FFFF B9C033C0 à3à¿..·Ú%iá~..ú´.t.ÉlïÖµÉ.èµÉ.µ. 0001C0
F3F92BD1 F7AEF2FF FFB9C033 0A7EC406 76C51EDE 88D788EC 8855C85D C28C1FFA *..ò]ùU.$.•.B.év.á-.3à¿..·Ú%i+*µ 0001E0
```

Dump of file SATURN:[PCCOMMON.DUMP.DLL]IECOMMON.TMP;1 on 18-APR-1990 10:46:52.51
File ID (698,35,0)   End of file block 64 / Allocated 64

Virtual block number 12 (0000000C), 512 (0200) bytes

```
F7AEF2FF FFB9C033 067EC4D7 88EC8855 00CB50FA 88F3881F FFFF1DC0 180574A6 Ït..â.....µ.*]ù.U.$.•á~.3à¿..·Ú% 000000
0374C00A AC0CE30E 4E880F88 0A76C506 7EC41E56 57EC8855 00CB50FA 88914901 ïl..*]ù.U.$WV.á~.év..Ô.N.D.˜.àt. 000020
568CF846 89EC468D 56570000 16C8CB5D E5885F5E 1FC28CC3 88AAF3C0 32F8E2AA ˜ã½2àµ˜.ù.ò.^ .Ì]ùà...WV.F$.F%.V 000040
08578926 06478926 08568806 4688420A 47C626F8 5EC4FE56 8CFC4689 0E468DFA *.F..F•.V±á^¥Ï6G.B.F..V.&.G.&.W. 000060
C4830127 0F589A53 060A76FF 0C76FFFC 76FF167F FF0447C7 26025789 26078926 &..&.W.&ùG.....v•.v..v..S.X.'..á 000080
76FF900F E8058826 02478E26 07FF263F 8B26C02A 1278044F FF26F85E C4F0880C ..Þá^½&.O.x.*à&.7&..&.G.&..$...v 0000A0
8DFA568C F84689EC 46800000 14C8CBC9 5F5EC68B 06C483FF FF022C9A 006A53FA *Sj........á..ó^ èùà....F$.F%.V*. 0000C0
89260857 89260647 89260856 8806468B 490A47C6 26F85EC4 FE568CFC 46890E46 F..F•.V±á^¥&6G.T.F..V.&.G.&.W.&. 0000E0
FF0C76FF FC76FFFE 76FF0447 8926F85E C404C483 01870070 9A505202 57892607 .&.W.RP.p....á.á^½&.G..v±.v•.v.. 000100
F7064688 08750A5E 88D080B0C 5E880846 88EC8855 90C8C900 FC03A29A 53060A76 v..S.Á.•.èù.U.$.F..^..Á.^.u..F.% 000120
0008CA5D E588D103 E3F70646 88C8030C 66F70646 88C888E3 F70008CA 5DE588E3 D.Ì]ò..%D.à.F.%f..à.F.%D.Ì.Ì]ò.. 000140
45EBD233 C288F1F7 064688F1 F7D23308 46880A4E 881575C0 080C468B 53EC8855 U.$S.F..àu..N..F.3®%þ.F.%þ.ò3®$E 000160
F7910C66 F7C888F3 F7F475C9 08D8D1EA D1D8D1E9 D1064688 0856880A 5E88C888 .à.^..V..F.ÌÖìÙÌòÌÁ.èu¶%µ.à%f..% 000180
DAF70856 18064628 0C5618OA 46280676 06463808 72077708 56380C72 D1030A66 f..ìr.;V.w.r.;F.v.+F..V.+F..V.%Ö 0001A0
C38BFA46 89E42A08 478A2608 5EC45657 000008C8 0008CA5D E5885800 DA8308F7 %Á.Ö.[.Ì]ò..à...WVá^.&.G.*ô.F*.ú 0001C0
F6260774 830A47F6 26F84689 379E05E0 D1C103E0 D1C888F9 F7000CB9 992BAA2D -˜+.¿..%*.àìÁ.èìÁ..7.F½Ï-G..t.&- 0001E0
```

Dump of file SATURN:[PCCOMMON.DUMP.DLL]IECOMMON.TMP;1 on 18-APR-1990 10:46:52.51
File ID (698,35,0)   End of file block 64 / Allocated 64

Virtual block number 13 (0000000D), 512 (0200) bytes

```
80260E74 010A47F6 26085EC4 90012BE9 FFFFB820 0A4F8026 085EC40F 74400A47 G.ât.á^.&.O. ¡..Ö+..á^.&-G..t.&. 000000
7689F088 04478926 C028EF0A 67802602 0A4F8026 90E2EB00 000447C7 26200A4F O. &ùG...$ã.&.O..&.g.y+ô&.G..Þ.v 000020
087E8137 7501379E 87F606D8 68F9F700 0CB9992B AA2DC388 4C750C0A 47F626FC •&-G..uL.ù·´+.¿..%*kÁ.-..7.u7.-. 000040
481EE69A FA76FF0F 75FFFF0A 7E811675 28C2087E 810E7402 D50A7E81 07752886 Ñ+u..-.Í.t..-.ô+u..-...u..v*.Ì.H 000060
C38B1575 080A47F6 26085EC4 04C48318 F9E80876 FF0A76FF 0C75C008 02C48303 ..á..âu..v..v.Ò*..á.á^.&-G..u..ù 000080
47882606 77282637 8826085E 88677401 379E87F6 06D868F9 F7000C89 9928AA2D -˜+.¿..%*kÁ.-..7.tg.^.&.7&+w.&.G 0000A0
FF265256 167EF60B 04478926 4802458B F87E8802 57892607 89264008 57882606 .&.W.â&..&.W..-½.E.H&.G..-~.VR&. 0000C0
006A026A 0F74203D AFL7F6FA 5E8819EB FC468908 C4830366 104E9AFA 76FF0677 w..v*.N.f...á..F•$..^•-.£= t.j.j. 0000E0
46805600 01BE17E8 07882606 468A065F C426085E C408C483 03891010 9A.˜006A j.S......á.á^.&á ..F.&..$.ƒ..V.F 000100
5F5EE42A 06468AFE CCE90374 FC7639FC 468908C4 83016A10 4E9AFA76 FF5G 506 ..P.v*.N.j...á..F=9v•t.Öä±.F.*ô^_ 000120
16894000 A3085688 06468800 0040E206 C7565705 A01F749A 010A88EC 8855C··9 èùU.$¡....t...WVú.ãâ...F..V.ÉÁâ.. 000140
568B0E46 8840FCA3 40D6A340 F6A340F0 A3C02840 EC168C40 EAA3FEF8 868D4002 •â..½±Éòâ..$â+àÉÞâÉ-âÉ•âÉ=â.F..V 000160
2AA387F6 D8889805 25E90375 C00AFEF6 8688078A 260A5EC4 40E61689 40E4A310 .Éòâ..|âá^.&....-±.âu.Ö%...Á-.É* 000180
3F80260A 5E88ED75 082AA387 F6D88898 078A260A 5EC40A46 FF0AFDE8 0E177408 .t..Ò»..F.á^.&....Ä-.É*.uÙ.^.&.? 0001A0
A340F2A3 40CEA340 D8A34106 A3410016 8940FEA3 9940DEA3 C02804C4 E9037425 %t.Öá.+âÉÅâ.É±â...AÉ.AÉAâÉòâÉ·âÉ 0001C0
46FF0010 40DC06C7 0001400A 06C74004 A340E0A3 40EEA340 F4A398F8 468840E8 Òâ.F%.É¶âÉŸâÉÁâÉâàù.Oâ..ú.Éâ...F 0001E0
```

Dump of file SATURN:[PCCOMMON.DUMP.DLL]IECOMMON.TMP;1 on 18-APR-1990 10:46:52.51
File ID (698,35,0)   End of file block 64 / Allocated 64

```
Virtual block number 14 (0000000E), 512 (0200) bytes

 74042AA3 87F6D888 98078A26 0A5E880A 46FF40F4 06FF0775 2A3F8026 0A5E880A ..^.&.7*u...¶a.F..^.&....Á-.È*.t 000000
 264740F2 0E8930E9 83C803E1 D140F20E 0302E1C1 40F20E88 98058A26 0A7E883F ?.-.&.....aèÅ...aìÅ.à.Ò0...aG& 000020
 400806FF 04E840EE 06FF0674 C9080C46 8C0A7E89 0875042A A387F608 8898058A ....Á-.È*.uÁ.-..F..èt...Ÿa$...Áa 000040
 0A5E880A 46FF00'0 400C06C7 900AE809 74004E30 08740046 3D98078A 260A5E88 .^.&...=F.t.=N.t.$..ú.Éa...F..^. 000060
 900AE855 7400703D 6874006C 30007400 68306474 0050303D 74004C30 98078A26 &...=L.t==P.td=h.t.=l.th=p.tU$.. 000080
 98078A26 0A5E884D 74012AA3 87F60888 98078A26 0A5EC40A 46FF0001 400A06C7 ú.0a...F.á^.&....Á-.È*.tM.^.&... 0000A0
 44800674 012AA384 F6187466 FE83F088 98078A26 0A5E880A 46FF9048 E8002005 . .$H..F..^.&....Þ.±ft.-.È*.t..D 0000C0
 90AAE80A 4EFFAFE8 000240DA 06C70875 67FE8305 7465FE83 F088C688 9003E820  $...6.Þ.±et..±gu.ú.0a..$È.N.$^. 0000E0
 5E880A46 FF40E006 FF0085E9 03745BFE 83F08898 078A260A 5EC490ED E80A46FF .F.$Ù.á^.&....Þ.±[t.Õ....Áa.F..^ 000100
 1F0A9A40 EA36FF40 EC36FF50 98F8468A 0100680A 46FFF846 FE06755E 3F80260A .&.?^u.±F½.F.h...F½.P.6$a.6õa... 000120
 8A40EA3E C4088898 078A260A 46FF3275 5D3F8026 0A5EC401 F8768008 C4830642 B..á..v½.á^.&.?]u2.F.&....Äá>õa. 000140
 8826F846 8A40EA3E C4088898 078A261C 745D3F80 260A5EC4 9010E801 8826F846 F½&..$..á^.&.?]t.&....Äá>õa.F½&. 000160
 7469FE83 F088C028 02E80073 88057400 3F802608 75003F80 260A5EC4 0A46FF01 ..F.á^.&.?.uÙ&.?.t.¡s.$.+á.Þ.±it 000180
 FE831475 28FE8305 7420FE83 F08808C2 E80E08F6 E80E0001 40E806C7 009EE903 .Õ..ú.Õa...Ò-..Òö..Þ.±-t..±+u..± 0001A0
 9A564000 36FF4002 36FF40FC 0EFF9016 E8410606 FF40F20E FF400E06 FF047520 -u...Ba..·a...A$....•a.6•a.6Áav. 0001C0
 7478FE83 F088087A E80E4106 06FF3875 30FE83F0 880889E8 0E06C483 067C1C74 t.|..á..Ò...Þ.±0uB...A.Òz..Þ.±xt 0001E0

Dump of file SATURN:[PCCOMMON.DUMP.DLL]IECOMMON.TMP;1 on 18-APR-1990 10:46:52.51
File ID (698,35,0)   End of file block 64 / Allocated 64

Virtual block number 15 (0000000F), 512 (0200) bytes

 C483069A 1C749A56 400036FF 40D236FF 40FC0EFF 9037E800 788E0675 5F''8305 ..±Xu./x.$7...•a.6•a.6Áav.t....à 000000
 8E06C483 02DF1C74 9A564000 36FF4002 36FF40FC 0EFF18E8 006F8E40 D40. 'F06 ...áa/o.$...•a.6•a.6Áav.t.Õ..á.ƒ 000020
 3E8308B0 A7FF2E93 C003023D E9037600 15300063 2DC68802 75E90375 F608L 164 d..-u.Õu..ó-c.=..v.Õ=..à...Ī¯..> 000040
 06FFF2E8 016A0202 E902C483 027EE80E 006A40EE A340F2A3 00018809 750040EE Ÿa.u.¡..È·aÈŸaj..Ò-..á.Õ..j.$·.. 000060
 A34108B8 40FA1689 40F8A340 E6168840 E4A1F6E8 086AEAE8 03ACE80E 0A6A40CE oaj..Ò^.$õj.$-Ãõa..laÈŸa..•a¡.AÈ 000080
 8B26078B 2640F81E C4137510 400C3E83 40E61E8C 40E4A341 02B84104 1E8C4102 .A...A¡.AÈõa..la.>Éa.u.á.Ÿa&..&. 0000A0
 02C48303 57E80E10 6AFE5E8C FC468907 882640F8 1EC400E8 FE5689FC 46890257 W..F•.V±$.á.Ÿa&...F•.^±j..ÒW..á. 0000C0
 8841041E 8C4102A3 410CB840 F60EFF04 750040F4 3E830084 E9037402 400A3E83 .>0a.t.Õ...>¶a.u...-a¡.AÈ.A...A¡ 0000E0
 E80E106A 40FEA341 00A3C028 2A753AFE 83F08807 67E80E40 E61E8C40 E4A34102 .AÈõa..la.Òg..Þ.±:u*+aÈ.AÈ±aj..Ò 000100
 0EFF9090 38E80257 89260789 26410E16 08410CA1 4108168B FC5EC402 C4830312 ...á.á^•...AÀ.A...A&..&.W.$;.... 000120
 F03E8301 61E90374 0040F63E 8306C483 08661C74 9A564000 36FF4002 36FF40FC •a.6•a.6Áav.t.f..á..>-a.t.Õa..>Þ 000140
 06832675 0040F43E 83078926 4108A1FC 5EC49001 81E9FFFF 880157E9 03740040 a.t.ÒW.¡..Õ...á^•Á.A&...>¶a.u&.. 000160
 0240E406 8300E1E9 03741040 DC3E8340 E6168940 E4A340FA 168840F8 A10240F8 ½a.Á½a..•aÈõa..la.>Éa.t.ÕÁ...õa. 000180
 0085E903 74004106 3E839000 C7E940E6 168940E4 A340FA16 8840F8A1 900009E9 Õ1..Á½a..•aÈõa..laÒú...>.A.t.Õ.. 0001A0
 752BFE83 05742DFE 83F08806 9FE80E06 D3E80E00 0140E806 C77E7500 40043E83 .>áa.u-ú.Õa...ÒÆ..Ò...Þ.±-t..±+u 0001C0
 36FF40D2 36FF40FC 0EFF9090 17E84106 06FF40F2 0EFF400E 06FF0475 2DFE8315 ..±-u...Ba..·a...A$.....•a.6•a.6 0001E0

Dump of file SATURN:[PCCOMMON.DUMP.DLL]IECOMMON.TMP;1 on 18-APR-1990 10:46:52.51
File ID (698,35,0)   End of file block 64 / Allocated 64

Virtual block number 16 (00000010), 512 (0200) bytes

 7478FE83 F088065A E80E1A75 30FE83F0 880665E8 0E06C483 08A01C74 9A564000 Áav.t....á..Òe..Þ.±0u..ÒZ..Þ.±xt 000000
 1C749A56 400036FF 400236FF 40FC0EFF 400406FF 19E84106 06FF0675 58FE8305 ..±Xu....A$...áa..•a.6•a.6Áav.t. 000020
 08F308F3 08F308AA 08AA08AA 06E2068E 2CE803CA E80EFE3A E9106A06 C48303A8 ¨..á.j.Õ:±.Òò.$,ƒ.ā.˙.˙.˙.µ.µ.µ. 000040
 40E23E83 081608F3 08F306E2 08F3060A 08F308F3 06EE06EA 060E08F3 08F308F3 µ.µ.µ.B.õ.Ÿ.µ.µ.O.µ.õ.µ.µ....>ãa 000060
 830598E8 0E509807 8A260A5E C4287400 3F80260A 5EC49041 E840F006 FF2A7500 .u*..Þa$A.á^.&.?.t+á^.&...P.Ò... 000080
 F6A1FEA9 E9037500 40F03E83 0A750040 F63E8311 7401FE83 1C74F60B F08802C4 á..Þ.-t..±.t..>-a.u..>Þa.u.Õ`±À- 0000A0
 F43E8300 750040E2 3E830E75 40F60639 4006A10A 46FFFFFF 400606C7 9028E840 a$+.ú.•a...F.Á•a9.-au..>ãa.uÁ.>¶ 0000C0
 C4137510 400C3E83 56570000 0AC8C8C9 5F5E90FA 98E94006 A340F6A1 DA740040 a.tÒÁ-aÈ•aÒ.*.^_èùà...WV.>Éa.u.á 0000E0
 88FE5E8C FC468907 882640E4 1EC400E8 FE5689FC 46890257 8826078B 2640E41E .õa&..&.W..F•.V±$.á.õa&...F•.^±. 000100
 06830575 10400C3E 830240E4 06831175 0040F43E 83F85689 F64689FE 5688FC46 F•.V±.F-.V½.>¶a.u...õa..>Éa.u... 000120
 7E880002 E9037400 40083E83 0550E80E 04750040 E03E8308 7400067E 830240E4 õa..~..t..>Áa.u..ÒP..>Áa.t.Õ0..- 000140
 5EC40875 0040F43E 833974C0 0808F7C0 1801F980 C8880824 2AA3848A 9026E806 .$&...È•$..à.'..á%Á.ât9.>¶a.u.á^ 000160
 3E830974 FF081674 40F08804 DFE80E1F 74C00805 4DE80EFC 46FF0788 26C688FC •.6&...F•.ÒM..ât..ÒÒ..Þat...t1.> 000180
 00067E83 904DE840 E206FF07 75FFFE83 90C4E898 008A2640 EA1EC48F 740040E0 Áa.t•á.õa&...$á..±.u...ãa$M..-.. 0001A0
 18013880 2640EA1E C40F7400 40E03E83 23750040 F23E832A 740040EE 3E834674 tF.>Ÿa.t*.>·a.u#.>Áa.t.á.õa&.8.. 0001C0
 56400036 FF400236 FF40FC0E FF1574C0 08000825 E42A2AA3 848A900A E808F7C0 á%Á$....È**õ%...ât...•a.6•a.6Áav 0001E0

Dump of file SATURN:[PCCOMMON.DUMP.DLL]IECOMMON.TMP;1 on 18-APR-1990 10:46:52.51
File ID (698,35,0)   End of file block 64 / Allocated 64
```

```
Virtual block number 17 (00000011), 512 (0200) bytes

 FF1174F8 56390575 F64639FE 568BFC46 8B217500 40F43E83 06C48308 181C749A .t....á..>¶ə.ul.F•.V±9F-u.9V½t.. 000000
 CE3E8306 76885657 000006C8 CBC95F5E 0007C626 FC5EC407 7400067E 8340F606 .-ə.-..t.6^•&6..^_èùà...VV.v..>ö 000020
 03740040 F43E8300 74004008 3E830452 E80E0475 0040E83E 83013DE9 03740040 ə.t.Ô=..>Òə.u..ÒR¯.>Aə.t..>¶ə.t. 000040
 F88803F6 E80E008B E9037400 40043E83 00C5E903 74004106 3E83019C E901B0E9 Ô¯.Ô...>.A.t.Ôé..>åə.t.ÔE..Ô-..½ 000060
 30889000 98E940F2 0EFF400E 06FF0475 2DFF8300 AEE90374 2BFF8308 742DFF83 ..-t...+t.ÒÙ...-u...Bə..·əÔ...¡0 000080
 74FFFF83 67E8C331 1F529A40 FE68036A 0C7D38FF 834D7508 FE830080 E9F82B00 .+½Ô...±.uM..8).j.h±ə.R.1.Sg...t 0000A0
 0080E903 750040DE 3E8306C4 8308C81C 749A5740 0036FF40 D236FF40 FC0EFF15 ...•ə.6θə.6ÀəV.t.à..á..>Bə.u.Ô¯. 0000C0
 A1807404 2AA385F6 0098E941 00168940 FEA30AF7 00028308 F7410016 8840FEA1 À±ə...A¼A.@.½OE±ə...AÔ..-.È*.t§À 0000E0
 8940FEA3 D2D1E001 4'001613 40FE0603 F875C9FE D2D1E001 02814100 168840FE ±ə...AY.iAi®±èu½..±ə...AiÀi®E±ə. 000100
 080398E8 0EF88803 38E80E40 D406FF41 00161140 FE060199 C78830EF Γ"410016 ..A.ÿ0.ú...±ə...A..åə.Ô;..½.Ô... 000120
 FF46E903 7410FE83 FF64E903 75802AA3 85F6FF6E E90375FF FF83FF76 E9. '75C0 åu.Ôv....u.Ôn.-.È*.u.Ôd..±.t.ÔF. 000140
 5788FF20 E9037502 2AA385F6 20C78303 74012AA3 85F607AE 1F529A40 FE6u146A j.h±ə.R.Ù.-.È*.t..ú -.È*.u.Ô .¡W 000160
 3E830775 0040043E 837C7500 40F43E83 00004100 06C740FE A340FCA1 FF1DE900 .Ô..À•əE±əú..A...>¶ə.u|.>åə.u..> 000180
 900EEBFE 5689FC46 89025788 26078826 40E41EC4 14751040 DC3E835D 740040CE oə.t].>Eə.u.á.Ôə&..&.W..F•.V±S.. 0001A0
 89264100 168840FE A1FC5EC4 14750240 DA3E83FE 5E8CFC46 89078826 40E41EC4 á.Ôə&...F•.^±.>Oə.u.á^•À±ə...A&. 0001C0
 06FF04E8 40F606FF 06750040 CE3E8307 892640FE A1FC5EC4 900AEB02 57892607 .&.W.S..á^•À±ə&...>oə.u...-əS... 0001E0

Dump of file SATURN:[PCCOMMON.DUMP.DLL]IECOMMON.TMP;1 on 18-APR-1990 10:46:52.51
File ID (698,35,0)   End of file block 64 / Allocated 64

Virtual block number 18 (00000012), 512 (0200) bytes

 46C75657 000052C8 90CBC95F 5E0240E4 06830575 1040DC3E 830240E4 068340F4 ¶ə..Ôə..>Eə.u...Ôə.^_èù.àR..WVúF 000000
 89B4468D 9001C4E9 0108E903 740040F4 3E830E74 0040083E 83027DE8 0E0000F6 -...Ò)..>Aə.t..>¶ə.t¯ÔA.Ôá...FÇ. 000020
 1A752DFE 8305742B FE83F08B 0220E80E B05689AE 46890040 05D28CFA 568CF846 F½.V*.@.ə..FÙ.V¯.Ò ..Þ.±+t..±-u. 000040
 901EEBF6 7E8BF08B 01FCE80E 40F20EFF 078826C6 8BF846FF F85EC40B 752DFE83 .±-u.á^½.F½.6&....·ə.Ô•..Þ.--S.. 000060
 E80E56F0 8801D9E8 0EF846FF 078826C6 8BF85EC4 471E73F8 46398056 8BAE4688 .FÙ.V¯9F½s.Gá^½.6&...F½.Ò)..ÞV.Ò 000080
 39805688 AE468845 74C00802 25E80E4D 752EFE83 F67E8907 75C00802 C4830172 r..á..áuø.--.±.uM.Ò%..àtE.FÙ.V¯9 0000A0
 5EC4471E 73F84639 805688AE 46889018 E8078826 C688F846 FFF85EC4 3A73F846 F½s:á^½.F½.6&..S...FÙ.V¯9F½s.Gá^ 0000C0
 7E83F67E 890775C0 0802C483 0120E80E 56F08801 87E80EF8 46FF0788 26C688F8 ½.6&...F½.Ò...ÞV.Ò ..á..àuø.--.- 0000E0
 39805688 AE468873 74C00801 C5E80E78 7545FE83 057465FE 830085E9 037500F6 -.u.Ô...±et..±Eu(.Ôé..àts.FÙ.V¯9 000100
 0E41752B FE830574 2DFE83F0 880141E8 0E078826 C688F846 FFF85EC4 6873F846 F½shá^½.F½.6&...ÒA..Þ.±-t..±+uA. 000120
 26C688F8 46FFF85E C42373F8 46398056 88AE4688 2E752DFE 833974C0 080197E8 Ò...àt9.±-u..FÙ.V¯9F½s#á^½.F½.6& 000140
 F08800F6 E80EF846 FF078826 C688F85E C41073F8 46398056 88AE4688 16E80788 ..S..FÙ.V¯9F½s.á^½.6&...F½.Ô-..Þ 000160
 C4830EC8 1C749A56 400036FF 400236FF 40FC0EFF 0875C008 02C48300 8FE80E56 V.Ò...á..àuA..•ə.6θə.6ÀəV.t.à..á 000180
 40E41EC4 14751040 DC3E8300 07C626F8 5EC45174 00F67E83 68750040 F43E8306 ..>¶ə.uh.--.tQá^½&6...>Eə.u.á.Ôə 0001A0
 B4468DFE 5E8CFC46 89078826 40E41EC4 900EEBFE 5689FC46 89025788 26078826 &..&.W..F•.V±S..á.Ôə&...F•.^±.FÇ 0001C0
 8340F606 FF0AC483 2A901EFF 263FEA06 8E500002 25400AA1 FC76FFFE 76FF5016 .P.v±.v•ÀOə%..P..ö?&...*.á...-ə. 0001E0

Dump of file SATURN:[PCCOMMON.DUMP.DLL]IECOMMON.TMP;1 on 18-APR-1990 10:46:52.51
File ID (698,35,0)   End of file block 64 / Allocated 64

Virtual block number 19 (00000013), 512 (0200) bytes

 5E881874 FF067E83 000000C8 CBC95F5E 0240E406 83057510 400C3E83 0240E406 .Ôə..>Eə.u...Ôə.^_èùà....-..t..^ 000000
 0E560000 02C8CBC9 C0289003 E80001B8 0674C008 00AEE80E 0E74042A A387F606 .-.È*.t..ÒÙ..àt.¡¯.S..+àèùà...V. 000020
 400236FF 40FC0EFF 18E8FFFF B80575FF FE8322EB C0280475 067638F0 880031E8 Ò1..Þ;v.u.+àS".t.u.¡..S...•ə.6θə 000040
 4FFF2640 D01EC440 FC06FF56 90CBC95E 0001B806 C4830EFC 1C749A56 400036FF .6ÀəV.t.•..á.¡..^èù.V..•əá.Àə&.O 000060
 C4830F32 1AF89A53 400236FF 0DE8E42A 048A2602 478E2607 FF2637B8 26117804 .x.&.7&..&.G.&..*ÔS..6θəS.½.2..á 000080
 EB40E206 FF0775FF FE83F375 082AA384 F6F088FF C7E80E56 000002C8 90CB5E04 .^ù.à...V.Òú..Þ-.È*.uw.±.u...àəS 0000A0
 750040EE 3E83C8C9 5E06C483 0A631C74 9A5640D0 36FF4002 36FF40FC 0EFF9016 ....•ə.6θə.6ÀəV.t.c..á.^èù.>Yə.u 0000C0
 749A000A 88EC8855 90CBC02B 90EEEB40 F20EFF07 7E0040F2 3E8310E8 0001B805 .¡..S..>·ə.-...·əSY.+àù.U.&¡...t 0000E0
 08568806 4688412E 1689412C A3105688 0E468841 3E1E8C41 3CA34142 880DFC1F .•.¡BAÈ<A..>A.F..V.È,A...A.F..V. 000100
 C70308E9 037425F6 7E80038D E9000041 3606C700 00413806 C7411416 894112A3 È.A...Aú.8A..ú.6A..Ô...--%t.Ô..ú 000120
 A34110A3 4116A341 30A34132 A3411AA3 4134A341 18A3411C A3C02800 01413A06 .:A..+àÈ.AÈ.AÈ4AÈ.AÈ2AÈOAÈ.AÈ.AÈ 000140
 5E88903E E8003042 A206C70A 46FF4975 30017F80 260A5EC4 002042A2 06C7412A *Aú.ÀB .á^.&...Oul.F.ú.ÀB0.S>..^ 000160
 7500411C 3E830E75 203F8026 9028E800 00413006 C7411C06 FF00752B 3F80260A .&.?+u....Aú.0A..S(.&.? u..>.A.u 000180
 5E880A46 FF412A06 FFC7752D 3F80260A 5EC400E8 411006FF 9014E841 3006FF1A ...0AS.....AS.á^.&.?-uú..*A.F..^ 0001A0
 8308C7E8 0E414068 1E0A76FF 0C76FFDD 75C00802 C4830978 E80E5098 078A260A .&...P.Òx..á..àuï.v..v..həA.Òú.. 0001C0
 00412A3E 834140A3 D8F74140 A1412A06 FF0C7D00 41403E83 0C56890A 468908C4 á..F..V..>əA.)...*AÀəA¼AÈəA.>*A. 0001E0

Dump of file SATURN:[PCCOMMON.DUMP.DLL]IECOMMON.TMP;1 on 18-APR-1990 10:46:52.51
File ID (698,35,0)   End of file block 64 / Allocated 64
```

```
Virtual block number 20 (00000014), 512 (0200) bytes

060A46FF 413206FF 2D752E3F 80260A5E C4002042 A206C706 753042A2 3E830074 t..>ÀBOu.ú.ÀB .á^.&.?.u-..2A.F.. 000000
01413A06 C70A7D00 413A3E83 0C56890A 468908C4 83087BE8 0E413A68 1E0A76FF .v..h:A.Ò(..á..F..V..>:A.).ú.:A. 000020
0675006C 302B7400 68304074 004E3030 74004630 98078A26 0A5EC441 320EFF00 ...2Aá^.&...=f.t==N.tə=h.t+=l.u. 000040
003F8026 0A5EC40A 46FF0375 4C3F8026 0A5EC409 7500411A 3E830002 411A06C7 ú..A...>.A.u.á^.&.?Lu..F.á^.&.?. 000060
8A26C8EB 0008411A 06C7D0EB 0010411A 06C7D8EB 0001411A 06C79002 4EE91C75 u.ÕN..ú..A..ŠÁú..A..ŠÁú..A..ŠA&. 000080
30F84688 20F84683 411806FF 08750058 30057400 47300A74 004530F8 46899807 ...F½=E.t.=G.t.=K.u....A.F½ .F½= 0000A0
59E90140 E9037500 25300152 E9037E01 3FE90375 00633D01 91E9037E 78740069 i.tx-.Õ..=c.u.Õ?.-.ÕR.=X.u.Õə.ÕY 0000C0
1EC400E8 00000247 C7260789 264136A1 1FC42641 2C1EC415 7502411A 3E839001 ...>.A.u.á.,A&á.À6A&..&úG...Š.á. 0000E0
74004136 3E830170 E9037500 41383E83 04412C06 83078926 4136A11F C426412C ,A&á.À6A&....,A..>8A.u.Õp..>6A.t 000100
411006C7 413406FF 01ACE9FF FFB801AF E9037520 0A47F626 41121EC4 01BDE903 .Õ§.á..A&-G. u.ÕÉ.|..Õ¯...4Aú..A 000120
06C74132 06FF4118 06FF4116 06FFF2EB 086A90C3 EB02C483 019EE80E 0A6A0000 ..j..Õ...á.Šú.j.Š·...A...A..2Aú. 000140
400639FA 4689411A A3C02B7A 7401411A 3E830081 E9037508 411A3E83 0004413A :A...>.A.u.Õ...>.A.t±+áÉ.A.F*9.ə 000160
A1054140 2E839090 13E80000 414006C7 0A740041 2A3E83FA 46894140 A1287441 At(ÀəA.F*.>*A.t.ú.əA..Š.....əA.À 000180
83048DE8 0E3A6A02 C4830130 E80E106A 02412C06 834140A3 C028027D C0084140 əA.á).+áÉəA..,A.j..ÕO..á.j:.Õ... 0001A0
40A3C02B 027DC00B 4140A300 052DFA46 88157400 412A3E83 227400FA 7E8302C4 á..~*.t".>*A.t..F*-..ÉəA.á).+áÉə 0001C0
FF10E902 412C0683 02C48300 F1E80E10 6A04412C 2E830000 414006C7 9007EB41 AŠ..ú.əA....,A.j..Õþ..á...,A.Õ.. 0001E0

Dump of file SATURN:[PCCOMMON.DUMP.DLL]IECOMMON.TMP;1 on 18-APR-1990 10:46:52.51
File ID (698,35,0)   End of file block 64 / Allocated 64

Virtual block number 21 (00000015), 512 (0200) bytes

256AFF2A E90349E8 0EF876FF F4E8016A 90FF39E9 026EE80E 006A90FF 3FE9106A j.Õ?..j..Õn.Õ9..j.Š¶.v½.Õl.Õ*.j% 000000
7400411A 3E830A7E 00673005 7C006530 FF0CE903 75006430 90FF21E9 0428E80E .Õ(.Õl..=d.u.Õ..=e.|.=g.-Õ.>.A.t 000020
E9037500 6E3D903A EBFE5689 FC468940 0C56880A 46880A4E FF0C5688 0A468809 ..F..V..N..F..V.ə.F•.V±$:.=n.u.Õ 000040
30FEB9E9 03750075 308F7400 733DFEE0 E9037500 7030FEE4 E9037500 6F30FE80 .±=o.u.ÕÕ±=p.u.ÕÀ±=s.t.=u.u.Õ¿±= 000060
0474C00A F6468807 8A26FC5E C4FC46FF 9034E80A 46FF9081 EBFF79E9 03750078 x.u.Õy.ŠŸ..F.Š4..F•á^•&...F-.át. 000080
0A4689FE 5688FC46 8806C483 044CE80E 0A76FF0C 76FF500A 462BC388 EC75253C <%u&.ú+F.P.v..v..ÕL..á..F•.V±.F. 0000A0
51E90374 200A47F6 2641121E C4FC63E9 0374C00A F6468807 8A260A5E C40C5689 .V.á^.&...F-.át.Õc•á..A&-G. t.ÕQ 0000C0
FF04740A 067E8300 2042A206 C7067400 41323E83 56570000 12C8C8C9 4136A1FE ±À6Aèúà...WV.>2A.t.ú.ÀB ..~..t.. 0000E0
89FC4689 02578826 07882641 2C1EC419 7510411A 3E830774 02411A3E 83413406 .4A.>.A.t..>.A.u.á.,A&..&.W..F•. 000100
0000FE46 C7FC4689 07882641 2C1EC411 74004134 3E83902C E804412C 0683FE56 V±..,A.$,..>4A.t.á.,A&...F•úF±.. 000120
08FC4688 0E740041 103E8302 412C0683 FE5689FC 46899907 8826412C 1EC40EEB $.á.,A&....F•.V±..,A..>.A.t..F•. 000140
41343E83 F45689F2 4689413E 1688413C A142A0A3 C0289003 E8064688 0674FE46 F±t..F.$..+áÉ.BÀ<A..>A.F·.V¶.>4A 000160
F7FE5688 FC46882D 07C626F2 46FFF25E C410750A 067E8328 7D00FE7E 83317500 .u1.-±.)+.-..u.á^·.F·&ó.-.F•.V±% 000180
8CF84689 411E8800 10F646C7 9006E800 01F646C7 FE5689FC 46890AF7 00028308 À.Ø.%Õ.F•.V±úF-..$..úF-..|.A.F½. 0001A0
FFFA76FF 45740041 323E830A C4831445 1EDC9AFC 76FFFE76 FF501E06 76FFFA5E ^*.v..P.v±.v•.É.E..á..>2A.tE.v*. 0001C0
06C70675 0842A03E 83007EC9 08F04E89 C828413A 0E8804C4 830F6100 709AF876 v½.p.a..á...:A+à.NÞ.è~..>.B.u.ú. 0001E0

Dump of file SATURN:[PCCOMMON.DUMP.DLL]IECOMMON.TMP;1 on 18-APR-1990 10:46:52.51
File ID (698,35,0)   End of file block 64 / Allocated 64

Virtual block number 22 (00000016), 512 (0200) bytes

4E89F446 8CF27E89 F47FC008 49C18847 3005C626 05E8F27E C4F04E88 000042A0 .B...NÞá-·Š.&ó.0G.èl.à.¶.~·.F¶.N 000000
FF46202C 80037C61 3C0774C9 08048807 8A26F85E C4F276C5 EE5E8C41 180E88F0 Þ...A.^Ÿév á^½&.....èt.<a|..., F. 000020
74413006 08411CA1 14750041 343E83EE 5E8EF45E 8CF27689 E375003F 8026F846 F½&.?.uD.v·.^¶.^Ÿ.>4A.u.À.A..0At 000040
56570000 10C8C8C9 5F5E02C4 8302FFE8 0E50C02B 02E80001 88057500 F67E8308 ..~-.u.|..Š.+áP.Õ...á.^_èúà...WV 000060
3E83008F E902412C 0683FA56 89F84689 412E1688 412CA100 018E1874 00067E83 .~..t.ƒ..À,A...A.F½.V*.¯,A.Õ...> 000080
89078826 412C1EC4 10E8FA56 89F84689 02578826 07882641 2C1EC413 7408411A .A.t.á.,A&..&.W..F½.V*Š.á.,A&... 0000A0
E82656B8 1575FA46 09F84688 0E740841 1A3E8304 412C0683 FA5E8CF8 4689FC46 F•.F½.^*..,A..>.A.t..F½.F*u.¡V&Š 0000C0
39F628F4 5689F246 89FA568B F84688FA 5E8CF846 89265088 097500FC 7E83900A ...-•.u.¡]&.F½.^*.F½.V*.F·.V¶+-9 0000E0
90EDE810 7ECE3846 1574003F 8026F246 FFF25EC4 900EE841 3A0E881C 74413236 62At...:AŠ..á^·.F·&.?.t.F;ö-.ŠU. 000100
830159E8 0E570875 00412A3E 83FE2841 403E88F3 75003F80 26F246FF F25EC446 Fá^·.F·&.?.uµ.>əA+±.>*A.u.W.ÕY.. 000120
5E02C483 013CE80E 57087400 412A3E83 06C48301 83E80EF8 76FFFA76 FF5602C4 á.V.v*.v½.Õ°..á..>*A.t.W.Õ<..á.^ 000140
7547067E 83067467 067E83FE 5689FC46 89412E16 88412CA1 000006C8 90C8C95F _èú.à...À,A...A.F•.V±.~.gt..~.Gu 000160
3E830074 00FA7E80 0006413A 06C70675 0041323E 83FA4688 C02A9003 E8018005 ¯.Š..*à.F*.>2A.u.ú.:A...-*.t..> 000180
76FF413C 36FF413E 36FF0676 FF413A36 FF411836 FF000141 3A06C706 7500413A :A.u.ú.:A...6.A.6:A.v..6>A.6<A.v 0001A0
3E36FF14 75004110 3E831874 00FA7E80 0EC4832A 881EFF26 3FEC068E FC76FFFE ±.v•..Š?&...*.á..-*.t..>.A.u..6> 0001C0
FF147500 413A3E83 18740041 103E8304 C4832A8C 1EFF263F EC068E41 3C36FF41 A.6<A..Š?&...*.á..>.A.t..>:A.u.. 0001E0

Dump of file SATURN:[PCCOMMON.DUMP.DLL]IECOMMON.TMP;1 on 18-APR-1990 10:46:52.51
File ID (698,35,0)   End of file block 64 / Allocated 64
```

```
Virtual block number 23 (00000017), 512 (0200) bytes

 1CA10000 42A006C7 08412C06 8304C483 2A941EFF 263FEC06 8E413C36 FF413E36 6>A.6<A..š?&...*.á...,A.ú..B..À. 000000
 0001B805 74C00B04 C4832A98 1EFF263F EC068EFC 76FFFE76 FF1B7441 30060B41 A..0At..v±.v=..š?&...*.á..át.¡.. 000020
 044FFF26 41121EC4 3C750041 383E8356 000000C8 90CBC901 29E80E50 C02B02E8 Š.+äP.Ò).èù.à...V.>8A.u<á..A&.O. 000040
 2C9A0676 FF534114 36FF10E8 E42A0488 2602478E 2607FF26 378B2606 468A1478 x..F.&.7&..&.G.&..*ðŠ..6.AS.v..., 000060
 3E835657 000002C8 90CBC95E 413606FF 9005EB41 3806FF07 754006C4 83171D02 ....á.âu...8AŠ....6A^èù.à...WV.> 000080
 83178502 2C9A4¿A2 36FF4112 36FF4114 36FF1BEB 507EF608 06768857 75004138 8A.uW.v..--PŠ..6.A.6.A.6ÅB....... 0000A0
 3F8B2642 A2A0D478 044FFF26 41121EC4 1E7EC008 4EC68841 3806FF04 754006C4 á.âu...8A.6N.ä-.á..A&.O.xå.ÅB&.? 0000C0
 C8C95F5E 41360601 06468807 75004138 3E8304E8 E42A0588 2602478E 2607FF26 &..&.G.&..*ðŠå.>8A.u..F...6A^ èù 0000E0
 078A2606 5EC44112 36FF4114 36FF22E8 5E750041 383E830A 76885657 000002C8 à...WV.v..>8A.u^Š".6.A.6.Aá^.Ï.. 000100
 2641121E C42574C0 084EC68B 0646FF41 3806FF04 754006C4 8317F702 2C9A5098 .P.,.%..á.âu...8A.F..6N.àt%á..A& 000120
 CAE8E42A 05882602 478E2607 FF263F88 2641121E C4078A26 065EC4C0 78044FFF .O.xeá^.&..á..A&.7&..&.G.&..*ðŠò 000140
 4689413E 1688413C A1560000 0CC8CBC9 5F5E4136 06010A46 88077500 41383E83 .>8A.u..F...6A^ èùà...VÀ<A..>A.F 000160
 28F84689 04C48314 3000709A F476FF52 41403688 FA4689FC 4689C028 F65689F4 ¶.V-+ä.F=.F*.6âÃR.v¶.p.0..á..F½+ 000180
 C4227500 412A3E83 4E017508 42A03E83 08E802EE 83057510 42A03E83 06762BF0 Þ+v..>.B.u..Ÿ.Š..>.B.u.N.>*A.u"á 0001A0
 4EFF02C4 83FE71E8 0E509807 8A26F446 FF127530 42A23E83 1975203F 8026F45E ^¶&.?-u..>ÅB0u..F¶&...P.Òq±.á..N 0001C0
 0066E80E FA46FF07 7400067E 831B7400 412A3E83 077EF608 08743042 A23E83F8 ½.>ÅB0t..--..>*A.t..-..t..F*.Òf. 0001E0

Dump of file SATURN:[PCCOMMON.DUMP.DLL]IECOMMON.TMP;1 on 18-APR-1990 10:46:52.51
File ID (698,35,0)   End of file block 64 / Allocated 64

Virtual block number 24 (00000018), 512 (0200) bytes

 067E8302 C483FE·  E80E5629 7500412A 3E830070 E80EFC46 FF077400 42A03E83 .>.B.t..F=.Òp..>*A.u)V.Ò-±.á..~. 000000
 76FF0040 E80E0475 00FC7E83 0A740042 A03E8300 39E80E04 7500FA7E 830A7400 .t..-*.u..Ò9..>.B.t..~=.u..Òâ..v 000020
 FE38E80E 56002042 A206C70E 7400412A 3E8306C4 83FE85E8 0EF476FF F676FFF8 ½.v-.v¶.Òç±.á..>*A.t.ú.ÅB .V.Ò8± 000040
 306AC802 C483FD02 E80E5000 208803E8 002B8805 7400411C 3E83CBC9 5E02C483 .á.^èu.>.A.t.¡+.Š.¡ .P.Ò@».á.ùj0 000060
 E80E5000 788803E8 005B8805 74004118 3E831775 1042A03E 8302C483 F0C8E80E .Òá».á..>.B.u..>.A.t.¡X.Š.¡x.P.Ò 000080
 8826412C 1EC41275 2A3F8026 0A5EC400 01FE46C7 56570000 06C8C802 C483FDAA ¯».á.ùà...WVúF±..á^.&.?*u.á.,A&. 0000A0
 88F62B0A 46FFFFFF FE46C708 752D3F80 260A5EC4 9060EB0A 46FF0241 2C068337 7..,A..F.Š'.á^.&.?-u.úF±...F.+-. 0000C0
 003042A2 06C70675 303C0A75 41323639 387F393C 3F7C303C FA468807 8A260A5E ^.&...F*<0|?<9.;962Au.<0u.ú.ÅB0. 0000E0
 2647F188 30E983C8 03E1D1CE 0302E1C1 CE889805 8A2618 7F 39308026 06EBF888 .«Š.&.=9..&....oèÃ..òìÅ.à.Ò0.þG& 000100
 5F5E0C56 880A4688 37892606 5EC4F088 EEF7FE46 880C468C 0A7E890F 7D30308O .=0)Ò.-..F..F±¼Ÿ.ÞÁ^.&.7.F..V.^  000120
 26117400 30802647 01EBFC7E C4064E8A FE5E8CFC 46892664 88570000 04C8C8C9 èùà...W¡d&.F=.^±.N.á-=Š.G&.=.t.Ï 000140
 50EC8855 90C8C95F C02BFE46 8CFC7E89 9009E8FE 468CFC7E 89000188 F4750038 8.u¶¡...-=.F±Š...-=.F±+à èù.U.ŠP 000160
 E80021E8 0000FFFF 9A266A68 1E266C68 1E30A8A3 E0865800 00FFFF9A 5016C488 .á.P.....X.ÁÈ =.hl&.hj&.¯....ÒI.Ò 000180
 267216FF 00FF681A 121AC29A 1A051A6E 9A50C850 E5880001 8816E120 889A0596 .... Å.¡...|]ùP.n....ö...h....r& 0001A0
 88D1882A 768E3174 00308026 47017500 3080267F FFB9266C 068EFF33 000D881E .£..3...l&¿..&.=.u.G&.=.t1ƒv*.¦. 0001C0
 04E0C00E 72412CAC 30AF8F1F F788071E 061CEBE7 74AEF2C0 330874CA 88A6F3CB ùµ!.òt.3á·ÚtÓŠ.....¼.«£=¯,Ar.äÁ. 0001E0

Dump of file SATURN:[PCCOMMON.DUMP.DLL]IECOMMON.TMP;1 on 18-APR-1990 10:46:52.51
File ID (698,35,0)   End of file block 64 / Allocated 64

Virtual block number 25 (00000019), 512 (0200) bytes

 74002A86 3E831A17 1AC29A50 00FCB8EC 885500C3 1FEDEBAA C20A0572 412CAC92 .¯,Ar..ö`ŠÚ.ú.U.š¡=.P.ö....>.*.t 000000
 5688C08E 088E02C7 885756EC 8855CB5D E5881A78 1AC29A50 00FF882A 841EFF04 ....*¡..P.ö.x..|]ìW.ŠVW¡ú..Á.à.V 000020
 CA5DE588 5E5F96E8 E8F788AE F2FFFFB9 C033970C 74964010 74C23BAD 3FF68E06 .ƒ-7Ú;òt.â.t..3â¿...Ú.¼ŠŠ._^.|]ò 000040
 504901F7 AEF2FFFF 89C033FA 88921F74 C0081A8C 1A929A06 76FF57EC 88550002 ..U.šW.v.......ât...*3â¿..¯Ú¼ì|P 000060
 06468856 000002C8 0002CA5D E5885F5B 0000FFFF 9A501651 521E5300 028BC488 .á£..S.RQ.P.....[_.|]ò..à...V.F. 000080
 74830A47 F626065E C4FE4689 379E05E0 D1C103E0 D1C888F9 F7000CB9 992BAA2D -`+.¿..¼*.àìÅ.èìÅ¯..7.F±á^.&-G..t 0000A0
 90E9EB20 0A4F8026 0874020A 47F62606 5EC40089 E9FFFF88 0674400A 47F62607 .&-G.ât.¡..Ò¿.á^.&-G..t.&.O. ŠÒ. 0000C0
 F9F7000C 89992BAA 20C38821 750C0A47 F626065E 88F82780 FE5E8801 0A4F8026 &.O...^±.'«.^.&-G..ul.ù-`+.¿..¼* 0000E0
 57882606 47882606 5EC412E8 04C48300 79E80676 FF060C75 01379E87 F606D868 kÁ.-..7.u...v.Òy..á.Š.á^.&.G.&.W 000100
 50E42A08 478A2606 77FF2608 77FF2606 5EC40277 FFFE5E88 02578926 07892608 .&..&.W..^±.w.á^.&.w.&.w.&.G.*ðP 000120
 80057400 047F8326 1C75FFFF 300574C0 08044789 26065EC4 08C4831A CC222E9A .."a..á.á^.&.G..ât.=..u.&....t.¯ 000140
 8E2607FF 26378826 044FFF26 90FF55E9 00000447 C7260A47 082610B0 9003E820 Š..¯.&.G.&úG...ÒU..&.O.&.7&..&. 000160
 C888F9F7 000CB999 2BAA2004 46883FC0 06FF0000 04C8C8C9 5EE42A04 8A260247 G.&..*ð^èùà.....á?.F.-`+.¿..¼*.à 000180
 47892604 5EC402C4 8318A323 879A0200 68FE5E8C FC468937 9E05E0D1 C103E0D1 1Á.èìÅ..7.F=.^±h....#È..á.á^.&.G 0001A0
 4F802604 5EC49021 E8020002 47C726FC 5EC4080A 4F802611 74D00808 57892606 .&.W..Át.&.O..á^=&úG...Š!.á^.&.O 0001C0
 47882604 5EC40001 0247C726 FC5EC408 57892606 47892640 FE5688FC 4688040A ...F=.V±â&.G.&.W.á^=&úG...á^.&.G 0001E0

Dump of file SATURN:[PCCOMMON.DUMP.DLL]IECOMMON.TMP;1 on 18-APR-1990 10:46:52.51
File ID (698,35,0)   End of file block 64 / Allocated 64
```

Virtual block number 26 (0000001A), 512 (0200) bytes

```
74FFFE83 06768856 000000C8 C3C90000 0447C726 02578926 07892608 57882606 .&.W.&..&.W.&üG...èùà...V.v..±.t 000000
5EC46FE8 FFFF8805 74020A47 F6260774 800A47F6 26137501 0A47F626 085EC418 .á^.&-G..u.&-G..t.&-G..t.|..Šoá^ 000020
47392602 57882607 8826085E C404C483 FF3AE853 06087508 47082606 47882608 .&.G.&.G.u..SÒ:..á.á^.&..&.W.&9G 000040
26C6881F C4260FFF 260447FF 2607FF26 C9750004 7F83260A 75085739 26107506 .u.&9W.u.&....uè&..&.G.&..&á..6& 000060
F7000CB9 9928AA2D C3881375 400A47F6 26010A4F 8026EFDA 67802608 5EC40788 ..á^.&.g.ÿ&.O..&-G.ðu..ū-¯+.¿..¼ 000080
330009BA 087230AD 1E38065E 88EC8855 C8C95EE4 2AC68804 379E8F80 060868F9 ªkÄ....7..6ªÕ^èùU.š.^.;.Ù=r.¤..3 0000A0
855A5900 00FFFF9A 51160C76 FF0876FF 0A76FF53 CC8804EC 8304CAE9 04BEE9C0 áÕ/.Õò..š..äS.v..v..v..Q.....YZ. 0000C0
00098A08 723DAD1E 38065E88 0CEC83EC 885500C8 50E588FD 30AFA780 91E175C0 áuÄ..Ì€=».[]ù.U.š.š..^.;.Ù=r.¤.. 0000E0
87F60000 10399A50 16F4468D 51414151 51C93353 12742030 AF87F604 7DE9C033 3áÕ).-.£= t.S3èQQAAQ.F¶.P.9...-. 000100
F86689F2 88FA8856 57FCFC46 89FE4689 C0330856 C50A468E FA5E8C66 748030AF £=.tf.^ª.F.éV.3á.F±.F»WV.ª.·.f½ 000120
3CAC0C4E 880716FA 880488E2 280080BA DC8802EC 833875AE F20A8049 E30C4E88 .N.DÌ¯.·Ùu;.š..Ê¤..+š.š.ª...N.¯< 000140
E8FC46FF 0A80AA00 1FE80375 F8380080 009AE900 28E8F4E2 AA1A74F8 3800740A .t.;«t.¯ä¶Ò+.Õ..¯.;«u.Ò..¯¯..F»$ 000160
CF881F06 1E515350 1C151F74 9AFFFC88 7AE80093 E9FA5E8E 5F5EE1E8 0014E8E2 âÒ..ŠÄ^_.^ªÕ..Šz|=..t...PSQ....Ü 000180
08FE5E01 F45E8811 75C00800 001AEC9A 5016F446 8051521E 53065E88 1FE3CA2B +òD..^.Š.RQ.F¶.P.š....âu..^¶.^±. 0001A0
8A087500 098A0001 30007400 60301874 C00808C4 831FC3FA 88585859 1F0774D8 Ùt..Y[X.ªû..Á..ât.=m.t.=..¤..u.¤ 0001C0
F803751A 3F80085E 880A5E8E 0E744030 AF87F6FE 5E8E26E8 F90020BA 03EB001C ..Š.¤ .ªŠ&.^±-.£=ât..^..^..?.u.½ 0001E0
```

Dump of file SATURN:[PCCOMMON.DUMP.DLL]IECOMMON.TMP;1 on 18-APR-1990 10:46:52.51
File ID (698,35,0) End of file block 64 / Allocated 64

Virtual block number 27 (0000001B), 512 (0200) bytes

```
61E9C850 E5880472 FA5E8E5F 5EF86688 FC462BFE 468806E8 F9C03300 1C8A0EE8 Š.¤..3áªŠ..F±+Fe.f½^_.^ªr..[]ùÕa 000000
071E0000 1E119A50 16F4468D 51521E53 0856C51E EEE8C188 0475C908 0C4E8803 ..N..èu..èŠÝ.éV.S.RQ.F¶.P....... 000020
08F44688 C2E80020 8AC7E800 1C8ACC75 00098A00 01300074 00603017 74C0081F ..ât.=m.t.=..¤..uä¤..Šú¤ .Šó.F¶. 000040
56EC8855 00A3E8C0 33001C8A A6E80275 1A3F8026 DA880A74 4030AF87 F68775C0 âuñ-.£=ât..Ò&.?.u.Šl¤..3áŠÉ.U.šV 000060
01880574 4030AF87 F60C7C00 F883117D 30AD1E38 065E88EC 885505F0 E9008357 W°.Òþ.U.š.´.;.Ù=)..«.|.-.£=ât.|. 000080
D8180128 0C74DAF7 D788067E C45738E3 0C4E88EC 885500C8 50E588C0 3302E800 .Š.3á.[]ù.U.š.N.D8Wá-..®¼Òt.+Ì.Ü 0000A0
8EFFFFC3 81C38C10 E30187AA F3C913A8 F3E9D1E0 8A0A4688 01280187 D1030323 #Æ.Ì.Ì+Ì.F..ÄìÕµ¨.èµ¨.ÌD..û.û... 0000C0
084E8802 57880788 065E88EC 8855C850 08568806 46885FAA F3C913A8 F3E901C3 ûÌÕµ¨.èµ¯_.F..V.]ùW.š.^....W..N. 0000E0
28A81E38 08720828 DC885A59 000004CA 5DE58802 57890789 065E881D F6253A9A .:%-..^....W..[]ò...YZ.Ê+Är.;.´+ 000100
A7800488 52000288 28A42EFF 5152FA7C E9C03305 754028A4 A1C85152 E3880572 r..DRQùÀÊ+ðu.3áÕ|ªRQ..Ê+£..R.à.Ì 000120
7500023D 07740001 30408112 7558C008 0000FFFF 9A521650 1653C488 508730AF €=ñP.áS.P.R......áXu.Ýð=..t.=..u 000140
E903733F D81EFFD8 33C28C3F DC06C41E E33FDA0E 885AD479 4830AF8F 08088106 .Ý...£=KyåZ..Õ?D.á.Ê?.ô3Ù..Ä?s.Õ 000160
73E83FE4 BF3FE4BE 007CE83F E4BF3FE4 BE3FD81E FF00038B C28C3FE0 06C401AE Û.á.Ä?.õ£....Ä?/Õ?¢Õ?Ò|./Õ?¢Õ?Òs 000180
3FE8BF3F E48ED88E 1A9888C3 0000FFFF 9A201568 0E016A08 743FE830 3FE48800 .¡Õ?=Ò?t.j..h. .....Û|...Ä/Õ?¢Ò? 0001A0
3FE8BF3F E48E003A E842A48F 42A48EEC 88550000 20109A00 6A006A03 6A0051E8 ÒQ.j.j.j... ..U.š/£B¢£BÒ:./Õ?¢Ò? 0001C0
06468A50 C033001A E83FE8BF 3FE8BE00 23E83FE8 BF3FE8BE EC885503 E80031E8 Ò1.Š.U.š/Ò?¢Ò?Ò#./Ò?¢Ò?Ò..3áP.F. 0001E0
```

Dump of file SATURN:[PCCOMMON.DUMP.DLL]IECOMMON.TMP;1 on 18-APR-1990 10:46:52.51
File ID (698,35,0) End of file block 64 / Allocated 64

Virtual block number 28 (0000001C), 512 (0200) bytes

```
02450805 8804EF83 0E73F73B C33FD81E FF00028B 07E33FDA 0E880000 FFFF9A50 P.......Õ?D.£....Ä?û;¼s..ÿ....E. 000000
28266C16 8800F0E9 0375266C 3639FF28 F6285657 000014C8 00C3EEE8 1DFFF274 t·..ŠÝù.à...WV+-+.96l&u.Òþ...l&+ 000020
C48320FC 249A9A2A 76681EF6 76FFF876 FF0C6AF8 5689F646 89F25689 F04689C0 á.Fþ.V·.F-.V½j..v½.v-.hvª..$• .á 000040
5EC40CE8 47EA7500 3F8026F6 46FFF65E C4008CE9 03767FFF FE814619 74C0080A ..ât.F.±..v.Õ¥.á^-.F-&.?.uõGŠ.á^ 000060
C4832108 24429A04 6A500145 808A7500 3F8026F6 5E88F475 003F8026 F646FFF6 -.F-&.?.u¶.^-&.?.u¤.E.Pj..B$.Ì.á 000080
46886074 EE4608EC 4688FE56 89FC4689 02C48321 4123879A 56EE5689 EC468904 ..Fš.VÝV..#AÌ.á..F•.V±.Fš.FÝtm.F 0000A0
9A9A2A76 681EF076 FFF276FF 0C6A3F87 16893F85 A3EE5688 EC468866 74C208FC •.ôtf.Fš.VÝÈç?..ñ?j..v·.vþ.hvª.. 0000C0
5EC404EC 46830257 89260789 26FE5688 FC4688EC 5EC42C74 C0080AC4 831F6324 $c..á..ât,á^š.F•.V±&..&.W..Fš.á^ 0000E0
003F8026 F046FFF0 5EC4E8EB 0E74C00A 078826FC 46FFFC5E C4078A26 F046FFF0 þ.Fþ&..á^=.F•&...ât.ŠÒá^þ.Fþ&.?. 000100
00051804 02030202 1601F878 E900028B 90C8C95F 5EA77500 3F8026F0 5EC4F475 u¶á^þ&.?.uÌ^_èù.|..Õx½.......... 000120
00520243 00410235 02121211 0010120F 1600160C 0808070A 0C090C08 0C070906 ........................S.A.C.R. 000140
00000807 02CE08A4 00840982 0A810A80 16060972 1C702060 006C0859 00570053 S.W.Y.l.m p.r...........Ê.ö.®... 000160
883DA8A3 C850E588 99FFFF88 0008E8C8 50E58899 FFFF883D A4168930 A8A31608 ..Ê¨=..Ê=|....[]ùÒ..|....[]ùÊ¨=£ 000180
3C04728C 3C430A76 243C0472 133CF7E2 43431674 073A2E18 75E40A00 24892196 .|¿$..ðu..:.t.CCã¼<.r.<$v.C<¥r.< 0001A0
883F733D AD1E3806 5E88C033 08EC83EC 885500C3 30A4A398 01478A2E 430176CA òv.C..G..ÊÊ=û.U.š.š.3á.^.;.Ù=s?. 0001C0
3C3EAF87 8A107408 30AF87F6 087EC40C 4E880233 57457502 30AF87F6 4CE30C4E N.DL-.£=.uEW3ð.N.á-.-.£=.t...£>< 0001E0
```

Dump of file SATURN:[PCCOMMON.DUMP.DLL]IECOMMON.TMP;1 on 18-APR-1990 10:46:52.51
File ID (698,35,0) End of file block 64 / Allocated 64

```
Virtual block number 29 (0000001D), 512 (0200) bytes

 09BA0674 C0085F00 00FFFF9A 5016FA46 80515706 530A3EAF 87C64942 AA08740A .t.'Bl6.£>.S.WO.F'.P......ât.¤. 000000
 0876C507 1E5756FB 30AFA780 CB5DE588 04758030 AF87F6C2 03FA468B FF5EE900 .Õ^..F'.ô-.£=.u..]}ù.Ï£=«V̄W..év. 000020
 AF8F8026 08751A3C 1E74C43A AC0430AF 8F802606 750A3C80 008428E3 C888FE88 .±.àD(Ç..<.u.&..£=.¯:át.<.u.&..£ 000040
 E7740A3C 80077-01 F983CB5D E5885E5F 1F060846 2BC788EA E2470588 05E8023D =.$...Gãõ.ù+F..._^.]}ù.'.t..<.tÔ 000060
 08000022 759A5016 FA468051 5016F946 80531C75 08082474 403DAF87 F626E2EB Sà&-.£=ât$.Ùu.S.F̄'.PQ.F'.P.u"... 000080
 FB9A5016 FA468651 5016F946 805300F9 46C686EB 0AB0FEE7 E95E5F1F 060774C0 ât..._^ÕÕ±¯.ŠÑóF'.S.F'.PQ.F'.P.« 0000A0
 FFFF8853 1C750830 AF87F626 3574010C 7E833674 FFFFFA46 F7DC75C0 08000022 "...âũÉ%F'..t6.~..t5&-.£=.u.S¡.. 0000C0
 3EAF8788 26F9468A FF6FE90F 750AF97E 8000001D 7A9A5016 FC468D50 D8F75050 PP%ÄP.F•.P.z....~'.u.Õo..F'&..£> 0000E0
 80260574 C308C08C 065EC4EC 88550099 EBC5750A F97E80FF 58E90080 02740A3C <.t.¯.Õ[..-'.uéŠ..U.$á^..â.ût.&. 000100
 25E80875 003FCC3E 831E73FF F13D0646 88575602 EC83EC88 55CB5DE5 8801FE4F O±..]}ùU.$.$.VW.F.=þ.s..>ä?.u.Ò% 000120
 02C48320 8C25989A 0676FF08 750078E8 05740018 E8157500 82E83FCC A3127400 .t.Êä?Ò..u.Ò..t.Òx.u..v...X¥ .á. 000140
 0E4F8D50 501EC033 FE5E89FE E3834306 5E880776 065E3900 F08BC85D E5885E5F _^.]}ùEÞ.9^.v..^.C.D±.^±3ä.PP.O. 000160
 0A8E0574 D20B3FD0 A33FCE16 87C28838 74FFFA83 08C48323 8827449A 50028051 Q̄.P.D'£#.á..'.t8.ó..ö?ÈÄ7.Øt..Ö 000180
 0AA30147 800002A3 0000A300 0A880C47 89484800 08A3C033 D88EFE5E 880008A3 Ê...^±.A3ä£..HH.G.|..Ê..Ê...G.Ê. 0001A0
 8EC18CD2 0801A6E8 3FD01E8E DB33064E 88C08ED8 8CC31FD8 8C0006A3 00000500 ....Ê...Á.ù.Á.â.N.3Ù..Å?Ò|..Ø.ė. 0001C0
 FFFFC2F7 FA5689F8 4689246F 018C9A06 76FF006A 0876FF00 6A560000 0AC8C309 \ûà...Vj..v.j..v....o$.F%.V'%ô.. 0001E0

Dump of file SATURN:[PCCOMMON.DUMP.DLL]IECOMMON.TMP;1 on 18-APR-1990 10:46:52.51
File ID (698,35,0)   End of file block 64 / Allocated 64

Virtual block number 30 (0000001E), 512 (0200) bytes

 6A561274 D00BFE56 89FC4689 02C48324 8823879A 56F87688 902FEB99 C02B0674 t.+à.Š/..v½V..#.$.á..F=.V±.Åt.Vj 000000
 1E5657EC 885590CB C95EFE56 88FC4688 9007EB08 C48323E7 1F0A9A50 FE76FF00 ..v±P...Ó#.á.Š...F=.V±^èù.U.$WV. 000020
 C933FF44 8AA6F30A 76C5FE88 C803D9F7 AEF2C033 F788U67E C4D98B27 E30E4E88 .N.D'.\ó-..%3á·Ù%).ù.±év.µÏ.D.3è 000040
 1E08568B 0646880E 4E8800CB 5DE5885F 5E1FC188 D1F74949 04740477 FF453A26 &:E.w.t.]]%i.ê.^_.]}ù..N..F..V.. 000060
 880AF700 D2830BF7 AA20800A 79D2080E 750AF983 1374C00A 93FC071E 570A7EC5 é~.V..•..ât..'.u¯.Øy.¯·¯%Ù.Ø.%Ó. 000080
 88E275C3 08C288AA 27040276 393C3004 038792F1 F793F1F7 0274C008 D23392F7 ¥.3Ø.ât.¥þ.¥þ..Æ.0<9v..'¨.ô.ûuã. 0000A0
 E0D106E3 ED3200CB 5DE5885E 5F1F58DA 8CF272C7 38014480 FF448805 86AC4F05 .O¯...D..D.;úr·.OX._^.]}ù.2ÙD.ÎÁ 0000C0
 830A47F6 26FA5EC4 1CEBF62B FC5E8CFA 46892BAA 88560000 06C800C8 FAE2D2D1 1Øã'ù.à...V¡¨+.F'.^=+-Š.á^'&-G.. 0000E0
 0876FA46 39309A16 883098A1 0CFA4683 46017440 04C48324 5427FA9A 53060E74 t..S.''1$.á.ât.F.F'.Å.=...=9F'vÁ 000100
 3FC28857 56EC8855 CB5DE588 01FE4F80 0474DB08 065E88EC 885590CB C95EC688 .ó^èù.U.š.^..Ùt..O±..]}ùU.$VWEó? 000120
 04C7963F C4A33FC2 A3FE2440 24EB99C0 33057501 76E80005 88071E29 75003F83 .?.u)..|..Òv.u.3à.Š$@$±Èó?Èá?.ú. 000140
 D0E9CB5D E5885E5F 0009E8C0 8ED88C06 4E883FCB 3689FFFE FE44C704 C6830001 ...ó.úD±±..6à?.N..Ä.àÒ.._^.]}ùÒÅ 000160
 F003D088 1573C138 48437401 A8FE88AD FC027788 F273EEF9 83FEE18u ·\744100 .At'.Ä±.'Ÿs·.w.=Ù.±¨.tCH;ès..Å.Þ 000180
 EB058948 C12BFE4C 89F9030C 74FE88E6 EBFE4489 F7880002 05C20335 , 71A8AD Ù´.t5.ô....%.D±Š|.±t..'.L±+èH..Š 0001A0
 023FD406 C626C302 7F893F00 1E8C2605 74D13820 1689DA8C C688FE4C FE.90305 ..'±L±.ó.Ö¿. ;ït.&..Ä?...ûá6.à?. 0001C0
 C203E274 01A8ADF0 03D088BC 73C13848 FE88F274 01A8ADF0 03FE8825 74FFFE3D =±.t%.±.ÞÙ´.t·.±H;ès¥.Å.ÞÙ´.tã.ô 0001E0

Dump of file SATURN:[PCCOMMON.DUMP.DLL]IECOMMON.TMP;1 on 18-APR-1990 10:46:52.51
File ID (698,35,0)   End of file block 64 / Allocated 64

Virtual block number 31 (0000001F), 512 (02J0) bytes

 288FD88C 12743FD4 0EFE2615 E8088E04 74C00808 4788E6E8 FE4489F7 88000205 ....%.D±Š|.G..ât..ÄŠ.&±.å?t..Ae+ 000000
 E89B4040 01240074 C638006B E8C03306 778888EB 37883FCC 1E8E2605 74C73B26 &;út.&..ä?.7Š£.w.3àÒk.;ót.$.ãã.Ò 000020
 07883FD0 A3260474 C13B267F 89D88C98 E84E4E96 05740010 E8FE4DFE 0D74005F _.t.±M±Ò..t..NNŠ..Ä¿.&;èt.&ÈÄ?.. 000040
 EAD10476 3FD2163B 267FFF8A 414149C8 28037401 A8FE4588 51C399C0 33024789 ¯G.3à.ûQ.E±´.t.+àIAAo..&;.Ø?v.Îõ 000060
 59C033E5 75EAD1D2 F7087500 0CE8C628 C22302F7 0072C203 1572C603 C188F575 uÅ.è.ór..õr.%Ø#ô+óÒ..u.%ØÎõu|3àY 000080
 58FE5589 4AD72B06 88067789 FFFEFE44 C7F203F0 88FE8857 18740010 E85152C3 ûRQÒ..t.W.±.Þ.·ûD±±..W..ø+øJ.U±X 0000A0
 745B5A1F FFFA8308 C4832567 27449A1F 06500001 88505252 1ED23350 53C35A59 YZûSP3Ø.RRP¡..P...D'g%.á..',.Z[t 0000C0
 720057E8 07754806 46880856 8826748F 3875000A 7E830657 56EC8855 C3D20802 ..ØûU.$VW..~..uBet&.V..F.Hu.ÒW.r 0000E0
 FE8104C6 8334735E 003EE856 0E468902 44880074 F7381174 482A7436 884CEB27 'ŠL.6t*Ht.;%t..D..F.VÒ>.^s4.6..± 000100
 C085F958 0000FFFF 9A50C033 501652C4 885021EB 99FFFF88 0675D208 04732A74 t*s..Øu.¡...ŠIP.áR.P3àP.....['.â 000120
 0C74024C 39F7880E 4E88CB5D E5885E5F 07C03303 882A7436 89025C89 1489E675 ul...\..6t*.Æ3à._^.]}ù.N..%9L.t. 000140
 1373266E 1E390675 F738C18E D3882672 1C030A88 2CEBF9F2 752A74FE 8104C683 .6..±t*u·'Š,.Ö..F̄&.Æ.ė;%u.9.n&s. 000160
 28560000 04C800C3 D1880487 92266E16 890475F7 380E75C0 850000FF FF9A5153 SQ......âuß;%u...n&....îû.à...V+ 000180
 F9F7000C 89992BAA 20C38815 75080A47 F6265575 023C0324 0A478A26 065EC4F6 -á^.&.G.$.<.ûU&-G..u..û-¨+.¿..%' 0001A0
 0877FF26 50287EC0 08FC4689 06472826 07882606 5E883974 01379E87 F6060868 kÄ.-..7.t9.^.&..&+G..F•.á-(P&.w. 0001C0
 200A4F80 26065EC4 0874FC46 3808C483 27341D4E 9A50E42A 08478A26 0677FF26 &.w.&.G.*ôP.N.4'.á.;F=t.á^.&.O.  0001E0

Dump of file SATURN:[PCCOMMON.DUMP.DLL]IECOMMON.TMP;1 on 18-APR-1990 10:46:52.51
File ID (698,35,0)   End of file block 64 / Allocated 64
```

```
Virtual block number 32 (00000020), 512 (0200) bytes

C8C95EC6 88000004 47C72602 57892607 89260857 88260647 8B26065E C4FFFFBE /..6^.&.G.&.W.&..&.W.&UG....6^èù 000000
00062684 00020000 0004284E 00020007 0001202A 01030005 00012062 01030000 ....b ......* ......N(......Ç&.. 000020
00012348 01030026 000127E3 01030022 00012798 01030088 00011F30 01050000 ....=........'..".. D'..&...K#.. 000040
000119F8 0103012E 0005231F 0203004D 00011FAC 01030125 00051E9A 0203003A :.......%...¯...M....#......%... 000060
54206E75 5220534D 00000000 00000000 00000000 0000005C 000119E5 0103005B [...[...\...............MS Run-T 000080
38383931 20296328 20746867 69727970 6F43202D 20797261 7262694C 20656069 ime Library - Copyright (c) 1988 0000A0
68252E64 68255600 64252E64 25560011 70726F43 2074666F 736F7263 6940202C , Microsoft Corp..V%d.%d.V%hd.%h 0000C0
00000000 00000003 00000000 00000000 00000000 002F0074 73796C61 6E410064 d.Analyst./...................... 0000E0
00000000 00000000 00000002 00000000 00000000 00000000 002C0000 00000000 .....,.......................... 000100
00150000 00000000 00000000 00000000 00000000 00000000 00000000 002D0000 ..-............................. 000120
00000005 00000000 00000000 00000000 00040000 00000000 00000000 00000000 ................................ 000140
00000000 00000002 00000000 00000000 00000000 00000000 00000000 00000000 ................................ 000160
00000000 00000000 00000002 00000000 00000000 00000000 00000000 00000000 ................................ 000180
00020000 00000000 00000000 00000000 00000000 00000000 00000000 00050000 ................................ 0001A0
00000000 00000000 00000000 00000000 00000003 00000000 00000000 00000000 ................................ 0001C0
00000000 00000002 00000000 00000000 00000000 00000004 00000000 00000000 ................................ 0001E0

Dump of file SATURN:[PCCOMMON.DUMP.DLL]IECOMMON.TMP;1 on 18-APR-1990 10:46:52.51
File ID (698,35,0)   End of file block 64 / Allocated 64

Virtual block number 33 (00000021), 512 (0200) bytes

00000000 00000000 00000000 00000000 00000000 00000000 00030000 00000000 ................................ 000000
00040000 00000000 00000000 00000002 00000000 00000000 00000000 00060000 ................................ 000020
00000000 00030000 00000000 00000000 00000005 00000000 00000000 00000000 ................................ 000040
00070000 00000000 000C0000 00000000 00000000 00000000 00000000 00000000 ................................ 000060
00020000 00000000 00000000 00000000 00080000 00000000 000A0000 00000000 ................................ 000080
00000000 00040000 00000000 00000000 00000003 00000000 00000000 00000000 ................................ 0000A0
00000000 00000000 00060000 00000000 00000000 00000005 00000000 00000000 ................................ 0000C0
00000000 00000000 00000000 00080000 00000000 00000000 00000007 00000000 ................................ 0000E0
0000000A 00000000 00000000 00000000 000F0000 00000000 00000000 00000009 ................................ 000100
00000000 0000000E 00000000 00000000 00000000 00000000 00000000 00000000 ................................ 000120
00000011 00000000 00000018 00000000 00000000 00000000 00000000 00000000 ................................ 000140
0000000A 00000000 00000000 00000000 00000017 00000000 00000016 00000000 ................................ 000160
00000000 00000014 00000000 00000000 00000000 00020000 00000000 00000000 ................................ 000180
00000000 00000000 00000006 00000000 00000000 00000000 00030000 00000000 ................................ 0001A0
00080000 00000000 00000000 00000005 00000000 00000000 00000000 00040000 ................................ 0001C0
00000000 00070000 00000000 00000000 0000000C 00000000 00000000 00000000 ................................ 0001E0

Dump of file SATURN:[PCCOMMON.DUMP.DLL]IECOMMON.TMP;1 on 18-APR-1990 10:46:52.51
File ID (698,35,0)   End of file block 64 / Allocated 64

Virtual block number 34 (00000022), 512 (0200) bytes

00000000 00000000 00000000 00000000 00000000 00000000 00000000 00000000 ................................ 000000
00000012 00000000 00000010 00000000 00000017 00000000 00000011 00000000 ................................ 000020
00000000 0000000C 00000002 00000000 00000000 00000000 00000016 00000000 ................................ 000040
00000000 00000006 )0000000 00000004 00000000 00000000 00000000 00030000 ................................ 000060
00000000 00020000 00000000 00000000 00000010 00000000 00000000 00000000 ................................ 000080
00000000 00000000 00040000 00000000 00000000 00000003 00000000 00000000 ................................ 0000A0
00000000 00000000 00000000 00060000 00000000 00000000 00000005 00000000 ................................ 0000C0
0000000A 00000000 00000000 00000000 00090000 00000000 00000000 0000000F ................................ 0000E0
00000000 0000000C 00000000 00000000 00000000 00080000 00000000 00000000 ................................ 000100
00000000 00000000 00000007 00000000 00000000 00000000 00000000 00000000 ................................ 000120
00120000 00000000 00000000 00000000 00000000 00000000 00000000 00080000 ................................ 000140
00160000 00000000 00140000 00000000 00110000 00000000 00170000 00000000 ................................ 000160
0000000E 00000000 00000000 00000000 00000000 00000000 00000000 00000000 ................................ 000180
00000000 00000003 00000000 00000000 00000000 00020000 00000000 00000000 ................................ 0001A0
00000000 00000000 00000006 00000000 00000000 00000000 00050000 00000000 ................................ 0001C0
00100000 00000000 00000000 00000000 00000000 00000000 00000000 000B0000 ................................ 0001E0

Dump of file SATURN:[PCCOMMON.DUMP.DLL]IECOMMON.TMP;1 on 18-APR-1990 10:46:52.51
File ID (698,35,0)   End of file block 64 / Allocated 64
```

Virtual block number 35 (00000023), 512 (0200) bytes

```
00000003 00000000 00000000 00000000 00020000 00000000 00000000 00000000 ................................ 000000
00000000 00000000 00000000 00000000 00000000 00040000 00000000 00000000 ................................ 000020
00000000 00000000 00000005 00000000 00000000 00000000 00020000 00000000 ................................ 000040
00000000 00000000 00000000 00000004 00000000 00000000 00000000 00030000 ................................ 000060
0000000A 00000000 00000007 00000000 00000008 00000000 00000000 00000000 ................................ 000080
00000000 00030000 00000000 00000000 00000004 00000000 00000000 00000000 ................................ 0000A0
00000000 00000000 00060000 00000000 00000000 00000002 00000000 00000000 ................................ 0000C0
00000000 00000000 00000000 00000000 00000000 00000000 00000009 00000000 ................................ 0000E0
0000000B 00000000 00000000 00000000 000A0000 00000000 00000000 0000000E ................................ 000100
00000000 0000000C 00000000 00000000 00000000 00110000 00000000 00000000 ................................ 000120
00000000 00000000 00000000 00000000 00000000 00000000 00160000 00000000 ................................ 000140
00000000 00180000 00000000 00150000 00000000 00120000 00000000 00190000 ................................ 000160
00000000 00000002 00000000 00000000 00000000 00030000 00000000 00000000 ................................ 000180
00000000 00000000 00000002 00000000 00000000 00000000 00000000 00000000 ................................ 0001A0
00060000 00000000 00000000 00000000 00000000 00000000 00000000 00080000 ................................ 0001C0
00150000 00000000 00000000 00000000 00070000 00000000 00090000 00000000 ................................ 0001E0
```

Dump of file SATURN:[PCCOMMON.DUMP.DLL]IECOMMON.TMP;1 on 18-APR-1990 10:46:52.51
File ID (698,35,0)   End of file block 64 / Allocated 64

Virtual block number 36 (00000024), 512 (0200) bytes

```
00000000 00020000 00000000 00000000 00000007 00000000 00000000 00000000 ................................ 000000
00000000 00000000 00080000 00000000 00000000 0000000A 00000000 00000000 ................................ 000020
00000000 00000000 00000000 00180000 00000000 00000000 0000000C 00000000 ................................ 000040
00000009 00000000 00000000 00000000 00000000 00000000 00000000 00000019 ................................ 000060
00000001 00000000 00000000 00000000 0000001A 00000000 00000012 00000000 ................................ 000080
00000000 00000003 00000000 00000000 00000000 00020000 00000000 00000000 ................................ 0000A0
00000000 00000000 00000008 00000000 00000000 00000000 00070000 00000000 ................................ 0000C0
00020000 00000000 00000000 00000001 00000000 00000000 00000000 00000000 ................................ 0000E0
00000000 00070000 00000000 00000000 00000003 00000000 00000000 00000000 ................................ 000100
00000000 00000000 00000000 00000000 00000000 00000008 00000000 00000000 ................................ 000120
00000000 00000000 00000000 00010000 00000000 00000000 00000010 00000000 ................................ 000140
00000003 00000000 00000000 00000000 00090000 00000000 00000000 00000004 ................................ 000160
00000000 0000001C 00000000 00000000 00000000 00060000 00000000 00000000 ................................ 000180
00000000 00000000 00000011 00000000 00000000 00000000 000C0000 00000000 ................................ 0001A0
00080000 00000000 00000000 00000000 00000000 00000000 00000000 001E0000 ................................ 0001C0
000A0000 00000000 00000000 00000000 00160000 00000000 00080000 00000000 ................................ 0001E0
```

Dump of file SATURN:[PCCOMMON.DUMP.DLL]IECOMMON.TMP;1 on 18-APR-1990 10:46:52.51
File ID (698,35,0)   End of file block 64 / Allocated 64

Virtual block number 37 (00000025), 512 (0200) bytes

```
00000000 00030000 00000000 00000000 00000001 00000000 00000000 00000000 ................................ 000000
00000000 00000000 00000000 00000000 00000000 00000008 00000000 00000000 ................................ 000020
0000000C 00000000 00000000 00000000 00000000 00000000 00000007 00000000 ................................ 000040
00000000 00000003 00000000 00000000 00000000 00010000 00000000 00000000 ................................ 000060
00000000 00000000 00000008 00000000 00000000 00000000 00110000 00000000 ................................ 000080
00080000 00000000 00000000 00000000 00000000 00000000 00000000 00000000 ................................ 0000A0
00000000 00000000 000A0000 00000000 00000000 00000000 000F0000 00000000 ................................ 0000C0
00000000 00000000 00000000 00030000 00000000 00000000 00000001 00000000 ................................ 0000E0
0000000B 00000000 00000000 00000000 00090000 00000000 00000000 00000008 ................................ 000100
00000000 00000007 00000000 00000000 00000000 00000000 00000000 00000000 ................................ 000120
00000000 00000001 00000000 00000000 00000000 00000004 00000000 00000000 ................................ 000140
00000000 00000000 00000004 00000000 00000000 00000000 00020000 00000000 ................................ 000160
00020000 00000000 00000000 00000001 00000000 00000000 00000000 00000000 ................................ 000180
00000000 00000000 00000000 00000000 00000005 00000000 00000000 00000000 ................................ 0001A0
00000000 00000000 00020000 00000000 00000000 00000001 00000000 00000000 ................................ 0001C0
00000000 00000000 00000000 00060000 00000000 00000000 00000004 00000000 ................................ 0001E0
```

Dump of file SATURN:[PCCOMMON.DUMP.DLL]IECOMMON.TMP;1 on 18-APR-1990 10:46:52.51
File ID (698,35,0)   End of file block 64 / Allocated 64

Virtual block number 38 (00000026), 512 (0200) bytes

```
00000004 00000000 00000000 00000000 00010000 00000000 00000000 00000000 ................................ 000000
00000000 00000006 00000000 00000000 00000000 00050000 00000000 00000000 ................................ 000020
00000000 0000000C 00000000 00000000 00000000 00000000 00080000 00000000 ................................ 000040
00050000 0000000C 00000000 00000002 00000000 00000000 00000000 00010000 ................................ 000060
00000000 00010000 00000000 00000000 00000000 00000000 00000000 00000000 ................................ 000080
00000000 00000000 00040000 00000000 00000000 00000002 00000000 00000000 ................................ 0000A0
00000000 00000000 00000000 00070000 00000000 00000000 00000006 00000000 ................................ 0000C0
00000001 00000000 00000000 00000000 00000000 00000000 00000000 00000008 ................................ 0000E0
00000000 00000005 00000000 00000000 00000000 00040000 00000000 00000000 ................................ 000100
00000000 00000000 00000009 00000000 00000000 00000000 00080000 00000000 ................................ 000120
00010000 00000000 00000000 00000000 00000000 00000000 00000000 00060000 ................................ 000140
00000000 00020000 00000000 00000000 00000007 00000000 00000000 00000000 ................................ 000160
00000000 00000000 00050000 00000000 00000000 00000003 00000000 00000000 ................................ 000180
00000000 00000000 00000000 00080000 00000000 00000000 0000000A 00000000 ................................ 0001A0
00000001 00000000 00000000 00000000 00000000 00000000 00000000 0000000C ................................ 0001C0
00000000 00000003 00000000 00000000 00000000 00070000 00000000 00000000 ................................ 0001E0
```

Dump of file SATURN:[PCCOMMON.DUMP.DLL]IECOMMON.TMP;1 on 18-APR-1990 10:46:52.51
File ID (698,35,0)   End of file block 64 / Allocated 64

Virtual block number 39 (00000027), 512 (0200) bytes

```
00000000 00000000 0000000A 00000000 00000000 00000000 00050000 00000000 ................................ 000000
000F0000 00000000 00000000 0000000C 00000000 00000000 00000000 00080000 ................................ 000020
00000000 00130000 00000000 00000000 00000010 00000000 00000000 00000000 ................................ 000040
00000000 00000000 00160000 00000000 00000000 00000015 00000000 00000000 ................................ 000060
00000000 00000000 00000000 00000000 00000000 00000000 00000017 00000000 ................................ 000080
00000003 00000000 00000000 00000000 00070000 00000000 00000000 00000001 ................................ 0000A0
00000000 0000000A 00000000 00000000 00000000 00050000 00000000 00000000 ................................ 0000C0
00000000 00000000 0000000C 00000000 00000000 00000000 00080000 00000000 ................................ 0000E0
00140000 00000000 00000000 00000011 00000000 00000000 00000000 00100000 ................................ 000100
00000000 00010000 00000000 00000000 00000000 00000000 00000000 00000000 ................................ 000120
00000000 00000000 00020000 00000000 00000000 00000007 00000000 00000000 ................................ 000140
00000000 00000000 00000000 00050000 00000000 00000000 00000003 00000000 ................................ 000160
0000000C 00000000 00000000 00000000 00080000 00000000 00000000 0000000A ................................ 000180
00000000 0000000F 00000000 00000000 00000000 000E0000 00000000 00000000 ................................ 0001A0
00000000 00000000 00000011 00000000 00000000 00000000 00100000 00000000 ................................ 0001C0
00010000 00000000 00000000 00000000 00000000 00000000 00000000 00120000 ................................ 0001E0
```

Dump of file SATURN:[PCCOMMON.DUMP.DLL]IECOMMON.TMP;1 on 18-APR-1990 10:46:52.51
File ID (698,35,0)   End of file block 64 / Allocated 64

Virtual block number 40 (00000028), 512 (0200) bytes

```
00000000 00020000 00000000 00000000 00000007 00000000 00000000 00000000 ................................ 000000
00000000 00000000 00050000 00000000 00000000 00000003 00000000 00000000 ................................ 000020
00000000 00000000 00000000 00080000 00000000 00000000 0000000A 00000000 ................................ 000040
00000001 00000000 00000000 00000000 00000000 00000000 00000000 0000000C ................................ 000060
00000000 00000002 [illegible] 00000000 00000000 00070000 00000000 00000000 ................................ 000080
00000000 00000000 00000005 00000000 00000000 00000000 00030000 [illegible] ................................ 0000A0
000C0000 00000000 00000000 00000008 00000000 00000000 00000000 [illegible] ................................ 0000C0
00000000 000F0000 00000000 00000000 0000000E 00000000 00000000 [illegible] ................................ 0000E0
00000000 00000000 00110000 00000000 00000000 00000010 00000000 00000000 ................................ 000100
00000000 00000000 00000000 00010000 00000000 00000000 00000000 00000000 ................................ 000120
00000003 00000000 00000000 00000000 00020000 00000000 00000000 00000007 ................................ 000140
00000000 0000000A 00000000 00000000 00000000 00050000 00000000 00000000 ................................ 000160
00000000 00000000 0000000C 00000000 00000000 00000000 00080000 00000000 ................................ 000180
00100000 00000000 00000000 0000000F 00000000 00000000 00000000 000E0000 ................................ 0001A0
00000000 00120000 00000000 00000000 00000011 00000000 00000000 00000000 ................................ 0001C0
00000000 00000000 00010000 00000000 00000000 00000000 00000000 00000000 ................................ 0001E0
```

Dump of file SATURN:[PCCOMMON.DUMP.DLL]IECOMMON.TMP;1 on 18-APR-1990 10:46:52.51
File ID (698,35,0)   End of file block 64 / Allocated 64

Virtual block number 41 (00000029), 512 (0200) bytes

```
00000000 00000000 00000000 00020000 00000000 00000000 00000007 00000000 ................................ 000000
0000000A 00000000 00000000 00000000 00050000 00000000 00000000 00000003 ................................ 000020
00000000 0000000C 00000000 00000000 00000000 000B0000 00000000 00000000 ................................ 000040
00000000 00000000 0000000F 00000000 00000000 00000000 000E0000 00000000 ................................ 000060
00120000 00000000 00000000 00000011 00000000 00000000 00000000 00100000 ................................ 000080
00000000 00010000 00000000 00000000 00000000 00000000 00000000 00000000 ................................ 0000A0
00000000 00000000 00020000 00000000 00000000 00000007 00000000 00000000 ................................ 0000C0
00000000 000000[illegible] 00000000 00050000 00000000 00000000 00000003 00000000 ................................ 0000E0
0000000C 00000000 00000000 00000000 000B0000 00000000 00000000 0000000A ................................ 000100
00000000 0000000F 00000000 00000000 00000000 000E0000 00000000 00000000 ................................ 000120
00000000 00000000 00000001 00000000 00000000 00000000 00000000 00000000 ................................ 000140
00030000 00000000 00000000 00000002 00000000 00000000 00000000 00070000 ................................ 000160
00000000 000A0000 00000000 00000000 00000005 00000000 00000000 00000000 ................................ 000180
00000000 00000000 000C0000 00000000 00000000 0000000B 00000000 00000000 ................................ 0001A0
00000000 00000000 00000000 000F0000 00000000 00000000 0000000E 00000000 ................................ 0001C0
00000012 00000000 00000000 00000000 00110000 00000000 00000000 00000010 ................................ 0001E0
```

Dump of file SATURN:[PCCOMMON.DUMP.DLL]IECOMMON.TMP;1 on 18-APR-1990 10:46:52.51
File ID (698,35,0) End of file block 64 / Allocated 64

Virtual block number 42 (0000002A), 512 (0200) bytes

```
00000000 00000014 00000000 00000000 00000000 00130000 00000000 00000000 ................................ 000000
00000000 00000000 00000001 00000000 00000000 00000000 00000000 00000000 ................................ 000020
00030000 00000000 00000000 00000002 00000000 00000000 00000000 00070000 ................................ 000040
00000000 000A0000 00000000 00000000 00000005 00000000 00000000 00000000 ................................ 000060
00000000 00000000 000C0000 00000000 00000000 0000000B 00000000 00000000 ................................ 000080
00000000 00000000 00000000 000F0000 00000000 00000000 0000000E 00000000 ................................ 0000A0
00000012 00000000 00000000 00000000 00110000 00000000 00000000 00000010 ................................ 0000C0
00000000 00000000 00000000 00000000 00000000 00130000 00000000 00000000 ................................ 0000E0
00000000 00000000 00000007 00000000 00000000 00000000 00010000 00000000 ................................ 000100
00050000 00000000 00000000 00000003 00000000 00000000 00000000 00020000 ................................ 000120
00000000 000B0000 00000000 00000000 0000000A 00000000 00000000 00000000 ................................ 000140
00000000 00000000 000E0000 00000000 00000000 0000000C 00000000 00000000 ................................ 000160
00000000 00000000 00000000 00100000 00000000 00000000 0000000F 00000000 ................................ 000180
00000013 00000000 00000000 00000000 00120000 00000000 00000000 00000011 ................................ 0001A0
00000000 00000000 00000000 00000000 00000000 00140000 00000000 00000000 ................................ 0001C0
00000000 00000000 00000007 00000000 00000000 00000000 00010000 00000000 ................................ 0001E0
```

Dump of file SATURN:[PCCOMMON.DUMP.DLL]IECOMMON.TMP;1 on 18-APR-19[illegible] 10:46:52.51
File ID (698,35,0) End of file block 64 / Allocated 64

Virtual block number 43 (0000002B), 512 (0200) bytes

```
00050000 00000000 00000000 00000003 00000000 00000000 00000000 00020000 ................................ 000000
00000000 000B0000 00000000 00000000 0000000A 00000000 00000000 00000000 ................................ 000020
00000000 00000000 000E0000 00000000 00000000 0000000C 00000000 00000000 ................................ 000040
00000000 00000000 00000000 00100000 00000000 00000000 0000000F 00000000 ................................ 000060
00000013 00000000 00000000 00000000 00120000 00000000 00000000 00000011 ................................ 000080
00000000 00000015 00000000 00000000 00000000 00140000 00000000 00000000 ................................ 0000A0
00000000 00000000 00000017 00000000 00000000 00000000 00160000 00000000 ................................ 0000C0
001A0000 00000000 00000000 00000019 00000000 00000000 00000000 00180000 ................................ 0000E0
00000000 001C0000 00000000 00000000 0000001B 00000000 00000000 00000000 ................................ 000100
00000000 00000000 00010000 00000000 00000000 00000000 00000000 00000000 ................................ 000120
00000000 00000000 00000000 00020000 00000000 00000000 00000007 00000000 ................................ 000140
0000000A 00000000 00000000 00000000 00050000 00000000 00000000 00000003 ................................ 000160
00000000 0000000C 00000000 00000000 00000000 000B0000 00000000 00000000 ................................ 000180
00000000 00000000 0000000F 00000000 00000000 00000000 000E0000 00000000 ................................ 0001A0
00070000 00000000 00000000 00000001 00000000 00000000 00000000 00000000 ................................ 0001C0
00000000 00030000 00000000 00000000 00000002 00000000 00000000 00000000 ................................ 0001E0
```

Dump of file SATURN:[PCCOMMON.DUMP.DLL]IECOMMON.TMP;1 on 18-APR-1990 10:46:52.51
File ID (698,35,0) End of file block 64 / Allocated 64

```
Virtual block number 44 (0000002C), 512 (0200) bytes

00000000 00000000 000A0000 00000000 00000000 00000005 00000000 00000000 ................................ 000000
00000000 00000000 00000000 000C0000 00000000 00000000 00000008 00000000 ................................ 000020
00000000 00000000 00000000 00000000 000F0000 00000000 00000000 0000000E ................................ 000040
00000000 00000007 00000000 00000000 00000000 00010000 00000000 00000000 ................................ 000060
00000000 00000000 00000003 00000000 00000000 00000000 00020000 00000000 ................................ 000080
000B0000 00000000 00000000 0000000A 00000000 00000000 00000000 00050000 ................................ 0000A0
00000000 000E0000 00000000 00000000 0000000C 00000000 00000000 00000000 ................................ 0000C0
00000000 00000000 00C00000 00000000 00000000 0000000F 00000000 00000000 ................................ 0000E0
00000000 00000000 00000000 00070000 00000000 00000000 00000001 00000000 ................................ 000100
00000005 00000000 00000000 00000000 00030000 00000000 00000000 000[illegible]002 ................................ 000120
00000000 00000008 00000000 00000000 00000000 000A0000 00000000 0000[illegible]00 ................................ 000140
00000000 00000000 0000000E 00000000 00000000 00000000 000C0000 00000000 ................................ 000160
00010000 00000000 00000000 00000000 00000000 00000000 00000000 000F0000 ................................ 000180
00000000 00020000 00000000 00000000 00000007 00000000 00000000 00000000 ................................ 0001A0
00000000 00000000 00050000 00000000 00000000 00000003 00000000 00000000 ................................ 0001C0
00000000 00000000 00000000 000B0000 00000000 00000000 0000000A 00000000 ................................ 0001E0

Dump of file SATURN:[PCCOMMON.DUMP.DLL]IECOMMON.TMP;1 on 18-APR-1990 10:46:52.51
File ID (698,35,0)   End of file block 64 / Allocated 64

Virtual block number 45 (0000002D), 512 (0200) bytes

0000000F 00000000 00000000 00000000 000E0000 00000000 00000000 0000000C ................................ 000000
00000000 00000000 00000000 00000000 00000000 00100000 00000000 00000000 ................................ 000020
00000000 00000000 00000007 00000000 00000000 00000000 00010000 00000000 ................................ 000040
00050000 00000000 00000000 00000003 00000000 00000000 00000000 00020000 ................................ 000060
00000000 000B0000 00000000 00000000 0000000A 00000000 00000000 00000000 ................................ 000080
00000000 00000000 000E0000 00000000 00000000 0000000C 00000000 00000000 ................................ 0000A0
00000000 00000000 00000000 00000000 00000000 00000000 0000000F 00000000 ................................ 0000C0
00000002 00000000 00000000 00000000 00070000 00000000 00000000 00000001 ................................ 0000E0
00000000 00000005 00000000 00000000 00000000 00030000 00000000 00000000 ................................ 000100
00000000 00000000 0000000B 00000000 00000000 00000000 000A0000 00000000 ................................ 000120
000F0000 00000000 00000000 0000000E 00000000 00000000 00000000 000C0000 ................................ 000140
00000000 00010000 00000000 00000000 00000000 00000000 00000000 00000000 ................................ 000160
00000000 00000000 00020000 00000000 00000000 00000007 00000000 00000000 ................................ 000180
00000000 00000000 00000000 00050000 00000000 00000000 00000003 00000000 ................................ 0001A0
0000000C 00000000 00000000 00000000 000B0000 00000000 00000000 0000000A ................................ 0001C0
00000000 0000000F 00000000 00000000 00000000 000E0000 00000000 00000000 ................................ 0001E0

Dump of file SATURN:[PCCOMMON.DUMP.DLL]IECOMMON.TMP;1 on 18-APR-1990 10:46:52.51
File ID (698,35,0)   End of file block 64 / Allocated 64

Virtual block number 46 (0000002E), 512 (0200) bytes

00000000 00000000 00000011 00000000 00000000 00000000 00100000 00000000 ................................ 000000
00140000 00000000 00000000 00000013 00000000 00000000 00000000 00120000 ................................ 000020
00000000 00160000 00000000 00000000 00000015 00000000 00000000 00000000 ................................ 000040
00000000 00000000 00190000 00000000 00000000 00000017 00000000 00000000 ................................ 000060
00000000 00000000 00000000 00010000 00000000 00000000 00000000 00000000 ................................ 000080
00000003 00000000 00000000 00000000 00020000 00000000 00000000 00000007 ................................ 0000A0
00000000 0000000A 00000000 00000000 00000000 00050000 00000000 00000000 ................................ 0000C0
00000000 00000000 0000000C 00000000 00000000 00000000 000B0000 00000000 ................................ 0000E0
00100000 00000000 00000000 0000000F 00000000 00000000 00000000 000E0000 ................................ 000100
00000000 00120000 00000000 00000000 00000011 00000000 00000000 00000000 ................................ 000120
00000000 00000000 00010000 00000000 00000000 00000000 00000000 00000000 ................................ 000140
00000000 00000000 00000000 00020000 00000000 00000000 00000007 00000000 ................................ 000160
0000000A 00000000 00000000 00000000 00050000 00000000 00000000 00000003 ................................ 000180
00000000 0000000C 00000000 00000000 00000000 000B0000 00000000 00000000 ................................ 0001A0
00000000 00000000 0000000F 00000000 00000000 00000000 000E0000 00000000 ................................ 0001C0
00000000 00000000 00000000 00000011 00000000 00000000 00000000 00100000 ................................ 0001E0

Dump of file SATURN:[PCCOMMON.DUMP.DLL]IECOMMON.TMP;1 on 18-APR-1990 10:46:52.51
File ID (698,35,0)   End of file block 64 / Allocated 64
```

```
Virtual block number 47 (0000002F), 512 (0200) bytes

00000000 00070000 00000000 00000000 00000001 00000000 00000000 00000000 ................................ 000000
00000000 00000000 00030000 00000000 00000000 00000002 00000000 00000000 ................................ 000020
00000000 00000000 00000000 000A0000 00000000 00000000 00000005 00000000 ................................ 000040
0000000F 00000000 00000000 00000000 000C0000 00000000 00000000 0000000B ................................ 000060
00000000 00000001 00000000 00000000 00000000 00000000 00000000 00000000 ................................ 000080
00000000 00000000 00000002 00000000 00000000 00000000 00070000 00000000 ................................ 0000A0
000A0000 00000000 00000000 00000005 00000000 00000000 00000000 00030000 ................................ 0000C0
00000000 000C0000 00000000 00000000 0000000B 00000000 00000000 00000000 ................................ 0000E0
00000000 00000000 00000000 00000000 00000000 0000000E 00000000 00000000 ................................ 000100
00000000 00000000 00000000 00070000 00000000 00000000 00000001 00000000 ................................ 000120
00000005 00000000 00000000 00000000 00030000 00000000 00000000 00000002 ................................ 000140
00000000 0000000B 00000000 00000000 00000000 000A0000 00000000 00000000 ................................ 000160
00000000 00000000 0000000E 00000000 00000000 00000000 000C0000 00000000 ................................ 000180
00070000 00000000 00000000 00000001 00000000 00000000 00000000 00000000 ................................ 0001A0
00000000 00030000 00000000 00000000 00000002 00000000 00000000 00000000 ................................ 0001C0
00000000 00000000 000A0000 00000000 00000000 00000005 00000000 00000000 ................................ 0001E0

Dump of file SATURN:[PCCOMMON.DUMP.DLL]IECOMMON.TMP;1 on 18-APR-1990 10:46:52.51
File ID (698,35,0)   End of file block 64 / Allocated 64

Virtual block number 48 (00000030), 512 (0200) bytes

00000000 00000000 00000000 000C0000 00000000 00000000 0000000B 00000000 ................................ 000000
00000010 00000000 00000000 00000000 000F0000 00000000 00000000 0000000E ................................ 000020
00000000 00000001 00000000 00000000 00000000 00000000 00000000 00000000 ................................ 000040
00000000 00000000 00000002 00000000 00000000 00000000 00070000 00000000 ................................ 000060
000A0000 00000000 00000000 00000005 00000000 00000000 00000000 00030000 ................................ 000080
00000000 000C0000 00000000 00000000 0000000B 00000000 00000000 00000000 ................................ 0000A0
00000000 00000000 000F0000 00000000 00000000 0000000E 00000000 00000000 ................................ 0000C0
00000000 00000000 00000000 00000000 00000000 00000000 00000010 00000000 ................................ 0000E0
00000002 00000000 00000000 00000000 00070000 00000000 00000000 00000001 ................................ 000100
00000000 00000005 00000000 00000000 00000000 00030000 00000000 00000000 ................................ 000120
00000000 00000000 0000000B 00000000 00000000 00000000 000A0000 00000000 ................................ 000140
00000000 00000000 00000000 0000000E 00000000 00000000 00000000 000C0000 ................................ 000160
00000000 00070000 00000000 00000000 00000001 00000000 00000000 00000000 ................................ 000180
00000000 00000000 00030000 00000000 00000000 00000002 00000000 00000000 ................................ 0001A0
00000000 00000000 00000000 000B0000 00000000 00000000 00000005 00000000 ................................ 0001C0
00000000 00000000 00000000 00000000 000E0000 00000000 00000000 0000000C ................................ 0001E0

Dump of file SATURN:[PCCOMMON.DUMP.DLL]IECOMMON.TMP;1 on 18-APR-1990 10:46:52.51
File ID (698,35,0)   End of file block 64 / Allocated 64

Virtual block number 49 (00000031), 512 (0200) bytes

00000000 00000007 00000000 00000000 00000000 00010000 00000000 00000000 ................................ 000000
00000000 00000000 00000003 00000000 00000000 00000000 00020000 00000000 ................................ 000020
00080000 00000000 00000000 0000000A 00000000 00000000 00000000 00050000 ................................ 000040
00000000 000F0000 00000000 00000000 0000000C 00000000 00000000 00000000 ................................ 000060
00000000 00000000 00000000 00000000 00000000 00000010 00000000 00000000 ................................ 000080
00000000 00000000 00000000 00070000 00000000 00000000 00000001 00000000 ................................ 0000A0
0000000A 000000C0 00000000 00000000 00050000 00000000 00000000 00000003 ................................ 0000C0
00000000 0000000C 00000000 00000000 00000000 00080000 00000000 00000000 ................................ 0000E0
00000000 00000000 00000010 00000000 00000000 00000000 000F0000 00000000 ................................ 000100
002F0000 00000000 00000000 00000000 00000000 00000000 00000000 00130000 ..............................%. 000120
00000000 00122202 00AE22C8 005A0000 00000001 22C4074E 228A0724 00000000 ....$.□"N.é"......Z.à"Ü.@"...... 000140
22FC0104 00000000 00000000 000022EE 00E80000 0000000A 00000000 22E000BE ƒ.Å"..........Ò.Ÿ"............■" 000160
00000000 23180168 00000000 0014230A 01582300 012E0000 00000015 00000000 .............#X..#......h..#.... 000180
00000005 233401E6 232A0192 00000000 00092326 02C4231C 020E0000 00000002 .........#á.&#........*#Ì.4#.... 0001A0
03FC0000 00000003 00000000 235003C4 00000000 000E2342 03942338 02EC0000 ..‡.8#..B#......é.P#..........•. 0001C0
0000237A 057E0000 00000008 236C056E 236204FE 00000000 0004235E 04CE2354 T#ö.^#......±.b#n.l#......-.z#.. 0001E0

Dump of file SATURN:[PCCOMMON.DUMP.DLL]IECOMMON.TMP;1 on 18-APR-1990 10:46:52.51
File ID (698,35,0)   End of file block 64 / Allocated 64
```

Virtual block number 50 (00000032), 512 (0200) bytes

```
00162396 0602238C 061C0000 00000007 238805FC 237E05B6 00000000 00060000 ........Ñ.-#•..#.........#●..#.. 000000
00000000 00172382 07EC23A8 076E0000 0000001D 00000000 23A406FA 00000000 ....•.Ê#..........n.¨#š.ý#...... 000020
23D20884 00000000 00220000 000023CE 08600000 00000018 00000000 23C0080C ..à#..........'.o#...."....Ç.●# 000040
23F80A2E 23EE09CC 00000000 002123EA 098423E0 096E0000 0000001E 23DC094E N.Ê#......n.Å#Ç.õ#!.....ä.Ÿ#..Ÿ# 000060
00000030 000000U0 24140AC8 00000000 00202406 0AA823FC 0A460000 0000001F ......F.•#¨..$ .....à..$....0... 000080
0E100000 00000032 00000000 2430004C 00000000 00310000 00002422 0CCE0000 ..ö."$....1.....L.0$....2....... 0000A0
0000245A 0F6E0000 00000034 00000000 244C0EAA 00000000 00330000 0000243E >$....3.....¨.L$....4.....n.Z$.. 0000C0
00370000 00002476 10A20000 00000036 00000000 24680FEC 00000000 00350000 ..5.....ì.h$....6.....Å.v$....7. 0000E0
00000000 00390000 00002492 122A0000 00000038 00000000 24841166 00000000 ....f..$....8.....*..$....9..... 000100
248C1476 00000000 00380000 000024AE 13A40000 0000003A 00000000 24A012C4 á..$....:.....Ê.Ü$....;.....v.¥$ 000120
00000000 240816A6 00000000 00300000 000024CA 15560000 0000003C 00000000 ....<.....V.ò$....=.....Î.Ä$.... 000140
00000040 00000000 24F417DA 00000000 003F0000 000024E6 17400000 0000003E >.....ã.Ì$....?.....Ö.¶$....ã... 000160
19860000 00000042 00000000 2510190E 00000000 00410000 00002502 18740000 ..t..%....A........%....B.....Ñ. 000180
0000FFFF 1AEA0000 00000044 00000000 252C1A50 00000000 00430000 0000251E .%....C.....P.,%....D.....õ..... 0001A0
00480000 00002556 1CC60000 00000047 00000000 25481C02 00000000 00460000 ..F.......H%....G.....6.V%....H. 0001C0
00000000 004A0000 00002572 1E080000 00000049 00000000 25641D7C 00000000 ....|.d%....I.......r%....J..... 0001E0
```

Dump of file SATURN:[PCCOMMON.DUMP.DLL]IECOMMON.TMP;1 on 18-APR-1990 10:46:52.51
File ID (698,35,0)   End of file block 64 / Allocated 64

Virtual block num' r 51 (00000033), 512 (0200) bytes

```
259C1FC8 00000000 004C0000 0000258E 1F200000 0000004B 00000000 25801E94 ...%....K..... ..%....L.....à..% 000000
00000000 25B820FC 00000000 004E0000 000025AA 20700000 00000040 00000000 ....M.....p ¨%....N.....• ¡%.... 000020
00000029 00000000 25D42214 00000000 00500000 000025C6 217A0000 0000004F O.....z!Ó%....P......"â%....)... 000040
0B7E0000 0000002B 00000000 25F00B38 00000000 002A0000 000025E2 08000000 ....ã%....*.....8.Þ%....+.....~. 000060
0000261A 0C0A0000 00000027 00000000 260C08D2 00000000 00260000 000025FE ±%....&.....●..&....'........&.. 000080
22AE0000 00000000 00000000 00000000 00000000 26300C6C 00000000 00280000 ..(.....l.0&..................Ú" 0000A0
00000000 00000000 00000000 00000000 00000000 000122B6 00520001 00002638 8&....R.Ñ"........................ 0000C0
42800000 00000000 2320202B 00296C6C 756E2800 296C6C75 6E280000 00000000 ......(null).(null).+· #......¯B 0000E0
00000000 00000000 00000000 00000000 00000000 00000000 3FEC4280 20454280 ¯BE ¯Bš?....................... 000100
00000000 00000000 00000000 00000000 00000000 00000000 00000000 00000000 ................................ 000120
00000000 00000000 00000000 00000000 00000000 00000000 00000000 00000000 ................................ 000140
00000000 00000000 00000000 00000000 00000000 00000000 00000000 00000000 ................................ 000160
00000000 00000000 00000000 00000000 00000000 00000000 00000000 00000000 ................................ 000180
00000000 00000000 00000000 00000000 00000000 00000000 00000000 00000000 ................................ 0001A0
00000000 00000000 00000000 00000000 00000000 00000000 00000000 00000000 ................................ 0001C0
00000000 00000000 00000000 00000000 00000000 00000000 00000000 00000000 ................................ 0001E0
```

Dump of file SATURN:[PCCOMMON.DUMP.DLL]IECOMMON.TMP;1 on 18-APR-1990 10:46:52.51
File ID (698,35,0)   End of file block 64 / Allocated 64

Virtual block number 52 (00000034), 512 (0200) bytes

```
00000000 00000000 00000000 00000000 00000000 00000000 00000000 00000000 ................................ 000000
00000000 00000000 00000000 00000000 00000000 00000000 00000000 00000000 ................................ 000020
00000000 00000000 00000000 00000000 00000000 00000000 00000000 00000000 ................................ 000040
00000000 00000000 00000000 00000000 00000000 00000000 00000000 00000000 ................................ 000060
00000000 00000000 00000000 00000000 00000000 00000000 00000000 00000000 ................................ 000080
00000000 00000000 00000000 00000000 00000000 00000000 00000000 00000000 ................................ 0000A0
00000000 00000000 00000000 00000000 00000000 00000000 00000000 00000000 ................................ 0000C0
00000000 00000000 00000000 00000000 00000000 00000000 00000000 00000000 ................................ 0000E0
00000000 00000000 00000000 00000000 00000000 00000000 00000000 00000000 ................................ 000100
00000000 00000000 00000000 00000000 00000000 00000000 00000000 00000000 ................................ 000120
00000000 00000000 00000000 00000000 00000000 00000000 00000000 00000000 ................................ 000140
00000000 00000000 00000000 00000000 00000000 00000000 00000000 00000000 ................................ 000160
00000000 00000000 00000000 00000000 00000000 00000000 00000000 00000000 ................................ 000180
00000000 00000000 00000000 00000000 00000000 00000000 00000000 00000000 ................................ 0001A0
00000000 00000000 00000000 00000000 00000000 00000000 00000000 00000000 ................................ 0001C0
00000000 00000000 00000000 00000000 00000000 00000000 00000000 00000000 ................................ 0001E0
```

Dump of file SATURN:[PCCOMMON.DUMP.DLL]IECOMMON.TMP;1 on 18-APR-1990 10:46:52.51
File ID (698,35,0)   End of file block 64 / Allocated 64

```
Virtual block number 53 (00000035), 512 (0200) bytes

 00000000 00000000 00000000 00000000 00000000 00000000 00000000 00000000 ................................ 000000
 00000000 00000000 00000000 00000000 00000000 00000000 00000000 00000000 ................................ 000020
 00000000 00000000 00000000 00000000 00000000 00000000 00000000 00000000 ................................ 000040
 00000000 00000000 00000000 00000000 00000000 00000000 00000000 00000000 ................................ 000060
 00000000 00000000 00000000 00000000 00000000 00000000 00000000 00000000 ................................ 000080
 00000000 00000000 00000000 00000000 00000000 00000000 00000000 00000000 ................................ 0000A0
 00000000 00000000 00000000 00000000 00000000 00000000 00000000 00000000 ................................ 0000C0
 00000000 00000000 00000000 00000000 00000000 00000000 00000000 00000000 ................................ 0000E0
 2A8A2190 FFFF2 '0 00000000 003D4F46 4E495F45 4C49465F 435F2674 00000000 ....t&_C_FILE_INFO=......I...I.* 000100
 28282828 20202020 20202020 20000101 00000000 2A962190 2A922190 2A8E2190 .I.*.I.*.I.*.......          (((( 000120
 10101010 10101010 10101010 48202020 20202020 20202020 20202020 20202028 (                  H............ 000140
 01010101 01018181 81818181 10101010 10101084 84848484 84848484 84101010 ................................ 000160
 02020202 02028282 82828282 10101010 10100101 01010101 01010101 01010101 ................................ 000180
 00000000 00000000 00000000 00201010 10100202 02020202 02020202 02020202 ................. .............. 0001A0
 00000000 00000000 00000000 00000000 00000000 00000000 00000000 00000000 ................................ 0001C0
 00000000 00000000 00000000 00000000 00000000 00000000 00000000 00000000 ................................ 0001E0

Dump of file SATURN:[PCCOMMON.DUMP.DLL]IECOMMON.TMP;1 on 18-APR-1990 10:46:52.51
File ID (698,35,0)   End of file block 64 / Allocated 64

Virtual block number 54 (00000036), 512 (0200) bytes

 00000000 00000000 00000000 00000000 00000000 00000000 00000000 00000000 ................................ 000000
 00002882 00000200 FFFFFFFF 00000000 00000000 00000000 00000000 00000000 .............................ÿ+.. 000020
 00000202 00000000 00000000 00000102 00000000 00000000 00000001 3FE80000 ..Ò?............................ 000040
 00000000 00000000 00000000 00000000 00000000 00000000 00000000 00000000 ................................ 000060
 00000000 00000000 00000000 00000000 00000000 00000000 00000000 00000000 ................................ 000080
 00000000 00000000 00000000 00000000 00000000 00000000 00000000 00000000 ................................ 0000A0
 00000000 00000000 00000000 00000000 00000000 00000000 00000000 00000000 ................................ 0000C0
 00000000 00000000 00000000 00000000 00000000 00000000 00000000 00000000 ................................ 0000E0
 00000000 00000000 00000000 00000000 00000000 00000000 00000000 00000000 ................................ 000100
 00000000 00000000 00000000 00000000 00000000 00000000 00000000 00000000 ................................ 000120
 00000000 00000000 00000000 00000000 00000000 00000000 00000000 00000000 ................................ 000140
 00000000 00000000 00000000 00000000 00000000 00000000 00000000 00000000 ................................ 000160
 00000000 00000000 00000000 00000000 00000000 00000000 00000000 00000000 ................................ 000180
 00000000 00000000 00000000 00000000 00000000 00000000 00000000 00000000 ................................ 0001A0
 00000000 00000000 00000000 00000000 00000000 00000000 00000000 00000000 ................................ 0001C0
 00000000 00000000 00000000 00000000 00000000 00000000 00000000 00000000 ................................ 0001E0

Dump of file SATURN:[PCCOMMON.DUMP.DLL]IECOMMON.TMP;1 on 18-APR-1990 10:46:52.51
File ID (698,35,0)   End of file block 64 / Allocated 64

Virtual block number 55 (00000037), 512 (0200) bytes

 00000000 00000000 00000000 00000000 00000000 00000000 00000000 00000000 ................................ 000000
 00000000 00000000 00000000 00000000 00000000 00000000 00000000 00000000 ................................ 000020
 00000000 00000000 00000000 00000000 00000000 00000000 00000000 00000000 ................................ 000040
 00000000 00000000 00000000 00000000 00000000 00000000 00000000 00000000 ................................ 000060
 00000000 00000000 00000000 00000000 00000000 00000000 00000000 00000000 ................................ 000080
 00000000 00000000 00000000 00000000 00000000 00000000 00000000 00000000 ................................ 0000A0
 00000000 00000000 00000000 00000000 00000000 00000000 00000000 00000000 ................................ 0000C0
 00000000 00000000 00000000 00000000 00000000 00000000 00000000 00000000 ................................ 0000E0
 00000000 00000000 00000000 00000000 00000000 00000000 00000000 00000000 ................................ 000100
 00000000 00000000 00000000 00000000 00000000 00000000 00000000 00000000 ................................ 000120
 00000000 00000000 00000000 00000000 00000000 00000000 00000000 00000000 ................................ 000140
 00000000 00000000 00000000 00000000 00000000 00000000 00000000 00000000 ................................ 000160
 00000000 00000000 00000000 00000000 00000000 00000000 00000000 00000000 ................................ 000180
 00000000 00000000 00000000 00000000 00000000 00000000 00000000 00000000 ................................ 0001A0
 00000000 00000000 00000000 00000000 00000000 00000000 00000000 00000000 ................................ 0001C0
 00000000 00000000 00000000 00000000 00000000 00000000 00000000 00000000 ................................ 0001E0

Dump of file SATURN:[PCCOMMON.DUMP.DLL]IECOMMON.TMP;1 on 18-APR-1990 10:46:52.51
File ID (698,35,0)   End of file block 64 / Allocated 64
```

```
Virtual block number 56 (00000038), 512 (0200) bytes

00000000 00000000 00000000 00000000 00000000 00000000 00000000 00000000 ................................ 000000
00000000 00000000 00000000 00000000 00000000 00000000 00000000 00000000 ................................ 000020
00000000 00000000 00000000 00000000 00000000 00000000 00000000 00000000 ................................ 000040
00000000 00000000 00000000 00000000 00000000 00000000 00000000 00000000 ................................ 000060
00000000 00000000 00000000 00000000 00000000 00000000 00000000 00000000 ................................ 000080
00000000 00000000 00000000 00000000 00000000 00000000 00000000 00000000 ................................ 0000A0
00000000 00000000 00000000 00000000 00000000 00000000 00000000 00000000 ................................ 0000C0
00000000 00000000 00000000 00000000 00000000 00000000 00000000 00000000 ................................ 0000E0
00000000 00000000 00000000 00000000 00000000 00000000 00000000 00000000 ................................ 000100
00000000 00000000 00000000 00000000 00000000 00000000 00000000 00000000 ................................ 000120
00000000 00000000 00000000 00000000 00000000 00000000 00000000 00000000 ................................ 000140
00000000 00000000 00000000 00000000 00000000 00000000 00000000 00000000 ................................ 000160
00000000 00000000 00000000 00000000 00000000 00000000 00000000 00000000 ................................ 000180
00000000 00000000 00000000 00000000 00000000 00000000 00000000 00000000 ................................ 0001A0
00000000 00000000 00000000 00000000 00000000 00000000 00000000 00000000 ................................ 0001C0
00000000 00000000 00000000 00000000 00000000 00000000 00000000 00000000 ................................ 0001E0

Dump of file SATURN:[PCCOMMON.DUMP.DLL]IECOMMON.TMP;1 on 18-APR-1990 10:46:52.51
File ID (698,35,0)   End of file block 64 / Allocated 64

Virtual block number 57 (00000039), 512 (0200) bytes

00000000 00000000 00000000 00000000 00000000 00000000 00000000 00000000 ................................ 000000
00000000 00000000 00000000 00000000 00000000 00000000 00000000 00000000 ................................ 000020
00000000 00000000 00000000 00000000 00000000 00000000 00000000 00000000 ................................ 000040
00000000 00000000 00000000 00000000 00000000 00000000 00000000 00000000 ................................ 000060
00000000 00000000 00000000 00000000 00000000 00000000 00000000 00000000 ................................ 000080
00000000 00000000 00000000 00000000 00000000 00000000 00000000 00000000 ................................ 0000A0
00000000 00000000 00000000 00000000 00000000 00000000 00000000 00000000 ................................ 0000C0
00000000 00000000 00000000 00000000 00000000 00000000 00000000 00000000 ................................ 0000E0
00000000 00000000 00000000 00000000 00000000 00000000 00000000 00000000 ................................ 000100
00000000 00000000 00000000 00000000 00000000 00000000 00000000 00000000 ................................ 000120
00000000 00000000 00000000 00000000 00000000 00000000 00000000 00000000 ................................ 000140
00000000 00000000 00000000 00000000 00000000 00000000 00000000 00000000 ................................ 000160
00000000 00000000 00000000 00000000 00000000 00000000 00000000 00000000 ................................ 000180
00000000 00000000 00000000 00000000 00000000 00000000 00000000 00000000 ................................ 0001A0
00000000 00000000 00000000 00000000 00000000 00000000 00000000 00000000 ................................ 0001C0
00000000 00000000 00000000 00000000 00000000 00000000 00000000 00000000 ................................ 0001E0

Dump of file SATURN:[PCCOMMON.DUMP.DLL]IECOMMON.TMP;1 on 18-APR-1990 10:46:52.51
File ID (698,35,0)   End of file block 64 / Allocated 64

Virtual block number 58 (0000003A), 512 (0200) bytes

00000000 00000000 00000000 00000000 00000000 00000000 00000000 00000000 ................................ 000000
00000000 00000000 00000000 00000000 00000000 00000000 00000000 00000000 ................................ 000020
00000000 00000000 00000000 00000000 00000000 00000000 00000000 00000000 ................................ 000040
00000000 00000000 00000000 00000000 00000000 00000000 00000000 00000000 ................................ 000060
00000000 00000000 00000000 00000000 00000000 00000000 00000000 00000000 ................................ 000080
00000000 00000000 00000000 00000000 00000000 00000000 00000000 00000000 ................................ 0000A0
00000000 00000000 00000000 00000000 00000000 00000000 00000000 00000000 ................................ 0000C0
00000000 00000000 00000000 00000000 00000000 00000000 00000000 00000000 ................................ 0000E0
00000000 00000000 00000000 00000000 00000000 00000000 00000000 00000000 ................................ 000100
00000000 00000000 00000000 00000000 00000000 00000000 00000000 00000000 ................................ 000120
00000000 00000000 00000000 00000000 00000000 00000000 00000000 00000000 ................................ 000140
00000000 00000000 00000000 00000000 00000000 00000000 00000000 00000000 ................................ 000160
00000000 00000000 00000000 00000000 00000000 00000000 00000000 00000000 ................................ 000180
00000000 00000000 00000000 00000000 00000000 00000000 00000000 00000000 ................................ 0001A0
00000000 00000000 00000000 00000000 00000000 00000000 00000000 00000000 ................................ 0001C0
00000000 00000000 00000000 00000000 00000000 00000000 00000000 00000000 ................................ 0001E0

Dump of file SATURN:[PCCOMMON.DUMP.DLL]IECOMMON.TMP;1 on 18-APR-1990 10:46:52.51
File ID (698,35,0)   End of file block 64 / Allocated 64
```

```
Virtual block number 59 (0000003B), 512 (0200) bytes

 00000000 00000000 00000000 00000000 00000000 00000000 00000000 00000000 ................................ 000000
 00000000 00000000 00000000 00000000 00000000 00000000 00000000 00000000 ................................ 000020
 00000000 00000000 00000000 00000000 00000000 00000000 00000000 00000000 ................................ 000040
 00000000 00000000 00000000 00000000 00000000 00000000 00000000 00000000 ................................ 000060
 00000000 00000000 00000000 00000000 00000000 00000000 00000000 00000000 ................................ 000080
 00000000 00000000 00000000 00000000 00000000 00000000 00000000 00000000 ................................ 0000A0
 00000000 00000000 00000000 00000000 00000000 00000000 00000000 00000000 ................................ 0000C0
 00000000 00000000 00000000 00000000 00000000 00000000 00000000 00000000 ................................ 0000E0
 00000000 00000000 00000000 00000000 00000000 00000000 00000000 00000000 ................................ 000100
 00000000 00000000 00000000 00000000 00000000 00000000 00000000 00000000 ................................ 000120
 00000000 00000000 00000000 00000000 00000000 00000000 00000000 00000000 ................................ 000140
 00000000 00000000 00000000 00000000 00000000 00000000 00000000 00000000 ................................ 000160
 00000000 00000000 00000000 00000000 00000000 00000000 00000000 00000000 ................................ 000180
 00000000 00000000 00000000 00000000 00000000 00000000 00000000 00000000 ................................ 0001A0
 00000000 00000000 00000000 00000000 00000000 00000000 00000000 00000000 ................................ 0001C0
 00000000 00000000 00000000 00000000 00000000 00000000 00000000 00000000 ................................ 0001E0

Dump of file SATURN:[PCCOMMON.DUMP.DLL]IECOMMON.TMP;1 on 18-APR-1990 10:46:52.51
File ID (698,35,0)   End of file block 64 / Allocated 64

Virtual block number 60 (0000003C), 512 (0200) bytes

 00000000 00000000 00000000 00000000 00000000 00000000 00000000 00000000 ................................ 000000
 00000000 00000000 00000000 00000200 00010000 00000000 00000000 00000000 ................................ 000020
 00000000 00000000 00000000 00000000 00000000 00000000 00000000 00000000 ................................ 000040
 00000000 00000000 00000000 00000000 00000000 00000000 00000000 00000000 ................................ 000060
 00000000 00000000 00000000 00000000 00000000 00000000 00000000 00000000 ................................ 000080
 00000000 00000000 00000000 00000000 00000000 00000000 00000000 00000000 ................................ 0000A0
 00000000 00000000 00000000 00000000 00000000 00000000 00000000 00000000 ................................ 0000C0
 00000000 00000000 00000000 00000000 00000000 00000000 00000000 00000000 ................................ 0000E0
 00000000 00000000 00000000 00000000 00000000 00000000 00000000 00000000 ................................ 000100
 00000000 00000000 00000000 00000000 00000000 00000000 00000000 00000000 ................................ 000120
 00000000 00000000 00000000 00000000 00000000 00000000 00000000 00000000 ................................ 000140
 00000000 00000000 00000000 00000000 00000000 00000000 00000000 00000000 ................................ 000160
 00000000 00000000 00000000 00000000 00000000 00000000 00000000 00000000 ................................ 000180
 00000000 00000000 00000000 00000000 00000000 00000000 00000000 00000000 ................................ 0001A0
 00000000 00000000 00000000 00000000 00000000 00000000 00000000 00000000 ................................ 0001C0
 00000000 00000000 00000000 00000000 00000000 00000000 00000000 00000000 ................................ 0001E0

Dump of file SATURN:[PCCOMMON.DUMP.DLL]IECOMMON.TMP;1 on 18-APR-1990 10:46:52.51
File ID (698,35,0)   End of file block 64 / Allocated 64

Virtual block number 61 (0000003D), 512 (0200) bytes

 00000000 00000000 00000000 00000000 00000000 00000000 00000000 00000000 ................................ 000000
 00000000 00000000 00000000 00000000 00000000 00000000 00000000 00000000 ................................ 000020
 00000000 00000000 00000000 00000000 00000000 00000000 00000000 00000000 ................................ 000040
 00000000 00000000 00000000 00000000 00000000 00000000 00000000 00000000 ................................ 000060
 00000000 00000000 00000000 00000000 00000000 00000000 00000000 00000000 ................................ 000080
 00000000 00000000 00000000 00000000 00000000 00000000 00000000 00000000 ................................ 0000A0
 00000000 00000000 00000000 00000000 00000000 00000000 00000000 00000000 ................................ 0000C0
 00000000 00000000 00000000 00000000 00000000 00000000 00000000 00000000 ................................ 0000E0
 00000000 00000000 00000000 00000000 00000000 00000000 00000000 00000000 ................................ 000100
 00000000 00000000 00000000 00000000 00000000 00000000 00000000 00000000 ................................ 000120
 00000000 00000000 00000000 00000000 00000000 00000000 00000000 00000000 ................................ 000140
 00000000 00000000 00000000 00000000 00000000 00000000 00000000 00000000 ................................ 000160
 00000000 00000000 00000000 00000000 00000000 00000000 00000000 00000000 ................................ 000180
 00000000 00000000 00000000 00000000 00000000 00000000 00000000 00000000 ................................ 0001A0
 00000000 00000000 00000000 00000000 00000000 00000000 00000000 00000000 ................................ 0001C0
 00000000 00000000 00000000 00000000 00000000 00000000 00000000 00000000 ................................ 0001E0

Dump of file SATURN:[PCCOMMON.DUMP.DLL]IECOMMON.TMP;1 on 18-APR-1990 10:46:52.51
File ID (698,35,0)   End of file block 64 / Allocated 64
```

```
Virtual block number 62 (0000003E), 512 (0200) bytes

 00000000 00000000 00000000 00000000 00000000 00000000 00000000 00000000 ................................ 000000
 00000000 00000000 00000000 00000000 00000000 00000000 00000000 00000000 ................................ 000020
 00000000 00000000 00000000 00000000 00000000 00000000 00000000 00000000 ................................ 000040
 00000000 00000000 00000000 00000000 00000000 00000000 00000000 00000000 ................................ 000060
 00000000 000000u0 00000000 00000000 00000000 00000000 00000000 00000000 ................................ 000080
 00000000 00000000 00000000 00000000 00000000 00000000 00000000 00000000 ................................ 0000A0
 00000000 00000000 00000000 00000000 00000000 00000000 00000000 00000000 ................................ 0000C0
 00000000 00000000 00000000 00000000 00000000 00000000 00000000 00000000 ................................ 0000E0
 00000000 00000000 00000000 00000000 00000000 00000000 00000000 00000000 ................................ 000100
 00000000 00000000 00000000 00000000 00000000 00000000 00000000 00000000 ................................ 000120
 00000000 00000000 00000000 00000000 00000000 00000000 00000000 00000000 ................................ 000140
 00000000 00000000 00000000 00000000 00000000 00000000 00000000 00000000 ................................ 000160
 00000000 00000000 00000000 00000000 00000000 00000000 00000000 00000000 ................................ 000180
 00000000 00000000 00000000 00000000 00000000 00000000 00000000 00000000 ................................ 0001A0
 00000000 00000000 00000000 00000000 00000000 00000000 00000000 00000000 ................................ 0001C0
 00000000 00000000 00000000 00000000 00000000 00000000 00000000 00000000 ................................ 0001E0

Dump of file SATURN:[PCCOMMON.DUMP.DLL]IECOMMON.TMP;1 on 18-APR-1990 10:46:52.51
File ID (698,35,0)   End of file block 64 / Allocated 64

Virtual block number 63 (0000003F), 512 (0200) bytes

 00000000 00000000 00000000 00000000 00000000 00000000 00000000 00000000 ................................ 000000
 81010000 00010000 00000000 00000000 00000000 26763792 00000000 00000000 .........7v&.................... 000020
 00000000 00000000 00000000 00000000 00000000 00000000 00000000 00008181 ................................ 000040
 00000000 00000000 00000000 00000000 00000000 00000000 00000000 00000000 ................................ 000060
 00000000 00000000 00000000 00000000 00000000 00000000 00000000 00000000 ................................ 000080
 00000000 00000000 00000000 00000000 00000000 00000000 00000000 00000000 ................................ 0000A0
 00000000 00000000 00000000 00000000 00000000 00000000 00000000 00000000 ................................ 0000C0
 00000000 00000000 00000000 00000000 00000000 00000000 00000000 00000000 ................................ 0000E0
 00000000 00000000 00000000 00000000 00000000 00000000 00000000 00000000 ................................ 000100
 0A000000 00000000 00000000 00000000 00000000 00000000 00000000 00000000 ................................ 000120
 0A0A0A0A 0A0A0A0A 0A0A0A0A 0A0A0A0A 0A0A0A0A 0A0A0A0A 0A0A0A0A 0A0A0A0A ................................ 000140
 0A0A0A0A 0A0A0A0A 0A0A0A0A 0A0A0A0A 0A0A0A0A 0A0A0A0A 0A0A0A0A 0A0A0A0A ................................ 000160
 0A0A0A0A 0A0A0A0A 0A0A0A0A 0A0A0A0A 0A0A0A0A 0A0A0A0A 0A0A0A0A 0A0A0A0A ................................ 000180
 0A0A0A0A 0A0A0A0A 0A0A0A0A 0A0A0A0A 0A0A0A0A 0A0A0A0A 0A0A0A0A 0A0A0A0A ................................ 0001A0
 0A0A0A0A 0A0A0A0A 0A0A0A0A 0A0A0A0A 0A0A0A0A 0A0A0A0A 0A0A0A0A 0A0A0A0A ................................ 0001C0
 0A0A0A0A 0A0A0A0- 0A0A0A0A 0A0A0A0A 0A0A0A0A 0A0A0A0A 0A0A0A0A 0A0A0A0A ................................ 0001E0

Dump of file SATURN:[PCCOMMON.DUMP.DLL]IECOMMON.TMP;1 on 18-APR-1990 10:46:52.51
File ID (698,35,0)   End of file block 64 / Allocated 64

Virtual block number 64 (00000040), 512 (0200) bytes

 0A0A0A0A 0A0A0A0A 0A0A0A0A 0A0A0A0A 0A0A0A0A 0A0A0A0A 0A0A0A0A 0A0A0A0A ................................ 000000
 000A0A0A 0A0A0A0A 0A0A0A0A 0A0A0A0A 0A0A0A0A 0A0A0A0A 0A0A0A0A 0A0A0A0A ................................ 000020
 00000000 00000000 00000000 00000000 00000000 00000000 00000000 00000000 ................................ 000040
 3C3C3FEA 253AFFFF 2A9A2546 00000000 00000000 00000000 00000000 20000000 ... ................F%.*..:%ö?<< 000060
 0D776F6C 66726576 6F206B63 61747320 200A0D30 30303652 00003E3E 47534D4E NMSG>>..R6000..- stack overflow. 000080
 30207962 20656469 76696420 72656765 746E6920 200A0D33 30303652 0003000A ....R6003..- integer divide by 0 0000A0
 66206563 61707320 6867756F 6E652074 6F6E2020 0A0D3830 30365200 08000A00 .....R6008..- not enough space f 0000C0
 6E652074 6F6E2020 0A0D3930 30365200 09000A00 73746E65 6D756772 6120726F or arguments.....R6009..- not en 0000E0
 0000FC00 0A00746E 656D6E6F 7269766E 6520726F 66206563 61707320 6867756F ough space for environment...•.. 000100
 6620200A 00323030 36520002 0020726F 72726520 656D6974 206E7572 00FF000A ....run-time error ...R6002..- f 000120
 0003FFFF FF000A0D 64656461 6F6C2074 6F6E2074 6E696F70 20676E69 74616F6C loating point not loaded........ 000140
 00000000 00000000 00000006 309A0002 00000005 2BAC0002 00000004 3FE60002 ..İ?......¯+.......=............ 000160
 00000000 00000000 00000000 00000000 00000000 00000000 00000000 00000000 ................................ 000180
 00000000 00000000 00000000 00000000 00000000 00000000 00000000 00000000 ................................ 0001A0
 00000000 00000000 00000000 00000000 00000000 00000000 00000000 00000000 ................................ 0001C0
 00000000 00000000 00000000 00000000 00000000 00000000 00000000 00000000 ................................ 0001E0
```

```
Dump of file SATURN:[PCCOMMON.DUMP.DLL]CHECKIN.TMP;1 on 18-APR-1990 10:38:40.78
File ID (531,14,0)   End of file block 27 / Allocated 28

Virtual block number 1 (00000001), 512 (0200) bytes

 00000000 00000C40 00000000 00000088 0000FFFF 00000004 00000018 01C25A4D MZò.............|.......ə....... 000000
 00000080 00000000 00000000 00000000 00000000 00000000 00000000 00000000 ................................ 000020
 6F6E6E61 63206061 72676F72 70207369 685421CD 4C01B821 CD09B400 0EBA1F0E ..¤..Ç.el|.LeIThis program canno 000040
 00000000 00000024 0A0D002E 65646F60 20534F44 206E6920 6E757220 65622074 t be run in DOS mode....$....... 000060
 00040004 00000000 00020C8A 00000000 00048009 BEAF74DC 000700C2 0505454E NE..ô...ÈtE/.................... 000080
 00000000 00000000 00010000 00040000 00000149 0087007F 00600060 00400004 ..ə.'.'.....I................... 0000A0
 18000F21 1A3801B7 02000E21 00000000 187A0F00 187A0029 00FA0F00 00FA0015 ..*...*.).z...z.....!...ñ.8.!.Å. 0000C0
 01000001 45534142 41544144 4F544E49 4B434548 43110000 4E494B43 45484307 .CHECKIN...CHECKINTODATABASE.... 0000E0
 4954475F 0E495447 034E4957 4D500553 4C4C4143 534F4408 00002E00 10000A00 .........DOSCALLS.PMWIN.GTI._GTI 000100
 49525753 4F44084F 49530347 534D444E 45534954 470A4C4F 4F544554 41455243 CREATETOOL.GTISENDMSG.SIO.DOSWRI 000120
 681E076A 088EFFFF 881E5657 000188C8 00000000 00000000 00000003 01014554 TE..............à...WV.j...Aj..h 000140
 0054681E 0033E903 75000030 0000FFFF 9A008068 5016FF7E 868D0042 681E004F O..hB...~..Ph.......=..u.Õ3..hT. 000160
 0082681E 5016FF7E 868D006A 006A016A 006A08C4 83008500 109A5016 FF7E868D ..~..P...ç..á.j.j.j.j...~..P.h.. 000180
 FE468D06 76FF0876 FF016A00 6A008468 1E0093E9 0000B800 00FFFF9A 006A006A j.j......j..Õ...hÇ.j.j..v..v..F± 0001A0
 6A006A00 6A006A1D AD68FE76 FFFE7C86 8914C483 0000FFFF 9A0A76FF 616A5016 .Pja.v.......á...|±.v±hÙ.j.j.j.j 0001C0
 FE7E868D 009C681E 0096681E 006A226A 0676FF08 76FF226A 006A0000 FFFF9A00 ......j.j".v..v.j"j..h...h....~± 0001E0

Dump of file SATURN:[PCCOMMON.DUMP.DLL]CHECKIN.TMP;1 on 18-APR-1990 10:38:40.78
File ID (531,14,0)   End of file block 27 / Allocated 28

Virtual block number 2 (00000002), 512 (0200) bytes

 8D006A00 6A5016FE 7E868D04 6A008068 5016FEFE 868D18C4 83FFFF00 109A5016 .P......á...±±.Ph..j...~±.Pj.j.. 000000
 E90000B8 0006E9FF FFB80006 E9037500 00300000 FFFF9A00 A9681E50 16FE7886 .x±.P.h`......=..u.Õ..j..Õ..j..Õ 000020
 000A0103 00000004 00080002 00000002 00390002 00079000 06CAC95F 5E1F0000 ...^_èò.......9...............O. 000040
 00920203 00140003 00780203 00970001 00200103 00880002 00550103 00900001 ......U....... .......x......... 000060
 00000000 00000000 00000000 00000000 00000000 00000000 00000000 00230003 ..#............................. 000080
 420A47C6 26FB5EC4 FE568CFC 46890E46 80FA568C F84689EC 468D5657 000016C8 à...WV.F$.F½.V*.F..F=.V±á^½&6G.B 0000A0
 FFFC76FF 167FFF04 47C72602 57892607 89260857 89260647 89260856 8B064688 .F..V.&.G.&.W.&..&.W.&úG.....v=. 0000C0
 263F8B26 C02A1278 044FFF26 F85EC4F0 880CC483 00850206 9A53060A 76FF0C76 v..v..S......á..Þá^½&.O.x.*à&.?& 0000E0
 CBC95F5E C68B06C4 83FFFF00 909A006A 53FA76FF 900FE805 88260247 8E2607FF ..&.G.&..Š...v*Sj.......á..ó^_èù 000100
 D1C88BF9 F7000CB9 99051B2D C38BFA46 89E42A08 478A2608 5EC45657 000008C8 à...WVá^.&.G.*ð.F*.ù-...¿..¾*¯àî 000120
 0A4F8026 085EC40F 74400A47 F6260774 830A47F6 26F84689 110C05E0 D1C103E0 Å.èîÅ....F½&-G..t.&-G.ət.á^.&.O. 000140
 90E2EB00 000447C7 26200A4F 80260E74 010A47F6 26085EC4 90012BE9 FFFF8B20  j..Õ+..á^.&-G..t.&.O. &úG...Šã. 000160
 182DC38B 4C750C0A 47F626FC 7689F088 04478926 C02BEF0A 67802602 0A4F8026 &.O..&.g.y+à&.G..Þ.v=&-G..uL.ù-. 000180
 810E7401 390A7E81 07750524 087E8137 7501110C 87F60608 6BF9F700 0CB99905 ..¿..¾*kA.-....u7.~.$.u..-.9.t.. 0001A0
 FF0A76FF 0C75C008 02C48301 AC101E9A FA76FF0F 75FFFF0A 7E811675 0530087E -.Õ.u..~...u..v*...¯..á..àu..v.. 0001C0
 06086BF9 F7000CB9 99051B2D C3881575 080A47F6 26085EC4 04C4830C 51E80876 v.ÒQ..á.á^.&-G..u..ù-...¿..¾*kA. 0001E0

Dump of file SATURN:[PCCOMMON.DUMP.DLL]CHECKIN.TMP;1 on 18-APR-1990  0:38:40.78
File ID (531,14,0)   End of file block 27 / Allocated 28

Virtual block number 3 (00000003), 512 (0200) bytes

 57892607 89264008 57882606 47882606 77282637 8826085E 88677401 110C87F6 -....tg.^.&.7&+w.&.G.&.W.ə&..&.W 000000
 C48301CA 0E6E9AFA 76FF0677 FF265256 167EF608 04478926 48024588 F87E8802 ..-½.E.N&.G..-~.VR&.w..v*.n.ò..á 000020
 C408C483 01ED0E30 9A53006A 006A026A 0F742017 1D87F6FA 5E8B19EB FC468908 ..F=Š..^*-... t.j.j.j.S.O.Ù..á.á 000040
 83005A0E 6E9AFA76 FF501606 468D5600 01BE17EB 07882606 468A065F C426085E ^.&á_..F.&..Š./..V.F..P.v*.n.Z.. 000060
 4310429A 000A88EC 8855CBC9 5F5EE42A 06468AFE CCE90374 FC7639FC 468908C4 á..F=9v=t.Òa±.F.*ð^_èùU.$j...B.C 000080
 3AA30856 8B06468B 1A561689 1A54A310 56880E46 8B1A661E 8C1A64A3 1A6A8801 .jj.Ëd...f..F..V.ËT¯..V..F..V.Ë: 0000A0
 6206C703 0BE90374 25F67E80 0380E900 001A5E06 C700001A 6006C71A 3C16891A ...<.ú.'...ú.^...Õ...--%t.Õ..ú.b 0000C0
 1A52A31A 38A31A3E A31A58A3 1A5AA31A 42A31A5C A31A40A3 1A44A3C0 2800011A ...+àËD.Ëə.Ë\.ËB.ËZ.ËX.Ë>.ËB.ËR. 0000E0
 260A5E8B 903EE800 3018CA06 C70A46FF 49753001 7F80260A 5EC40020 18CA06C7 ú.ò. .á^.&...0uI.F.ú.ò.0.$>..^.& 000100
 FF1A7500 1A443E83 0E75203F 80269028 EB00001A 5806C71A 4406FF00 752B3F80 .?+u...D.ú.X...$(.&.? u..>D..u.. 000120
 260A5E8B 0A46FF1A 5206FFC7 75203F80 260A5EC4 00EB1A38 06FF9014 EB1A5806 .X.Š....8.$.á^.&.?-uú..R..F..^.& 000140
 08C48308 C7E80E1A 68681E0A 76FF0C76 FFD075C0 0B02C483 0978E80E 5098078A ...P.Òx..á..àuï.v..v..hh..Òú..á. 000160
 0074001A 523E831A 68A308F7 1A68A11A 5206FF0C 7D001A68 3E830C56 890A4689 .F..V..>h..)...R.Àh.¼AËh..>R..t. 000180
 76FF060A 46FF1A5A 06FF2075 2E3F8026 0A5EC400 2018CA06 C7067530 18CA3E83 .>ò.Ou.ú.ò. .á^.&.?.u-..Z..F...v 0001A0
 FF00011A 6206C70A 7D001A62 3E830C56 890A4689 08C48308 7BE80E1A 62681E0A ..hb..Ò(..á..F..V..>b..).ú.b.... 0001C0
 06C70675 006C3028 7400683D 4074004E 3D3D7400 46309807 8A260A5E C41A5A0E .Z.á^.&...=F.t==N.tə=h.t+=(.u.ú. 0001E0
```

```
Dump of file SATURN:[PCCOMMON.DUMP.DLL]CHECKIN.TMP;1 on 18-APR-1990 10:38:40.78
File ID (531,14,0)   End of file block 27 / Allocated 28

Virtual block number 4 (00000004), 512 (0200) bytes

 1C75003F 80260A5E C40A46FF 03754C3F 80260A5E C4097500 1A423E83 00021A42 B....>B..u.á^.&.?Lu..F.á^.&.?.u. 000000
 98078A26 C8EB0CJ8 1A4206C7 D0EB0010 1A4206C7 D8EB0001 1A4206C7 90024EE9 ÕN..ú.B...ŠÁú.B...ŠÁú.B...Šà&... 000020
 006930F8 468B20F8 46831A40 06FF0875 00583005 74004730 0A740045 30F84689 .F½=E.t.=G.t.*X.u...ə..F½ .F½=i. 000040
 900159E9 0140E903 75002530 0152E903 7E013FE9 03750063 300191E9 037E7874 tx-.Õ..=c.u.Õ?.-.ÕR.=X.u.Õə.ÕY.. 000060
 1A541EC4 00EB0000 0247C726 0789261A 5EA11FC4 261A541E C4157502 1A423E83 .>B..u.á.T.&á.À^.&..&úG...Š.á.T. 000080
 E9037400 1A5E3E83 0170E903 75001A60 3E83041A 54068307 89261A5E A11FC426 &á.À^.&....T...>'..u.Õp..>^..t.Õ 0000A0
 00001A38 06C71A5C 06FF01AC E9FFFF88 01AFE903 75200A47 F6261A3A 1EC40180 §.á.:.&-G. u.Õ€.j..Õ¯...\.ú.B... 0000C0
 1A6206C7 1A5A06FF 1A4006FF 1A3E06FF F2EB086A 90C3EB02 C483019E E80E0A6A j..Õ...á.Šú.j.Š·..>...ə...Z.ú.b. 0000E0
 741A6806 39FA4689 1A42A3C0 287A7401 1A423E83 0081E903 75081A42 3E830004 ...>B..u.Õ...>B..tz+âÈB..F*9.h.t 000100
 1A68A105 1A682E83 909013E8 00001A68 06C70A74 001A523E 83FA4689 1A68A128 (Àh..F*.>R..t.ú.h...Š.....h..Àh. 000120
 02C48304 8DE80E3A 6A02C483 0130E80E 106A021A 5406831A 68A3C028 027DC008 .à).+âÈh...T..j..ÕO..á.j:.Õ...á. 000140
 EB1A68A3 C028027D C0081A68 A300052D FA468815 74001A52 3E832274 00FA7E83 .~*.t".>R..t..F*-..Èh..à).+âÈh.$ 000160
 106AFF10 E9021A54 068302C4 8300F1E8 0E106A04 1A542E83 00001A68 06C79007 ..ú.h.....T..j..Õp..á...T..Õ..j. 000180
 E80E256A FF2AE903 49E80EF8 76FFF4EB 016A90FF 39E9026E E80E006A 90FF3FE9 Õ?..j..Õn.Õ9..j.Š¶.v½.ÕI.Õ*.jX.Õ 0001A0
 88097400 1A423E83 DA7E0067 30057C00 6530FF0C E9037500 64309OFF 21E90428 (.ÕI..=d.u.Õ..=e.|.=g.-O.>B..t.. 0001C0
 FE80E903 75006E30 903AE8FE 5689FC46 89400C56 880A4688 0A4EFF0C 56880A46 F..V..N..F..V.ə.F=.V±Š:.=n.u.Õ.± 0001E0

Dump of file SATURN:[PCCOMMON.DUMP.DLL]CHECKIN.TMP;1 on 18-APR-1990 10:38:40.78
File ID (531,14,0)   End of file block 27 / Allocated 28

Virtual block number 5 (00000005), 512 (0200) bytes

 00783DFE 89E90375 0075308F 74007330 FEE0E903 75007030 FEE4E903 75006F30 *o.u.Õõ±=p.u.ÕÀ±=s.t.=u.u.Õ¿±=x. 000000
 253C0474 C00AF646 88078A26 FC5EC4FC 46FF9034 E80A46FF 9081E8FF 79E90375 u.Õy.ŠY..F.Š4..F=á^=&...F-.ât.<X 000020
 56890A46 89FE5688 FC468806 C483044C E80E0A76 FF0C76FF 500A4628 C388EC75 uŠ.ú+F.P.v..v..ÕL..á..F=.V±.F..V 000040
 A1FE51E9 0374200A 47F6261A 3A1EC4FC 63E90374 C00AF646 88078A26 0A5EC40C .á^.&...F-.ât.Õc=á.:.&-G. t.ÕQ±À 000060
 5C06FF04 740A067E 83002018 CA06C706 74001A5A 3E835657 000012C8 CBC91A5E ^.èúà...WV.>Z..t.ú.ò. ..-..t...\ 000080
 FE5689FC 46890257 88260788 261A541E C4197510 1A423E83 0774021A 423E831A ..>B..t..>B..u.á.T.&..&.W..F=.V± 0000A0
 0EE80000 FE46C7FC 46890788 261A541E C4117400 1A5C3E83 902CE804 1A540683 ..T..Š,..>\..t.á.T.&...F=úF±..Š. 0000C0
 FE4608FC 46880E74 001A383E 83021A54 0683FE56 89FC4689 99078826 1A541EC4 á.T.&....F=.V±..T...>B..t..F=.F± 0000E0
 75001A5C 3E83F456 89F24689 1A66168B 1A64A118 C8A3C028 9003EB06 46880674 t..F.Š..+âÈà.Àd...f..F·.V¶.>\..u 000100
 830BF7FE 568BFC46 882007C6 26F246FF F25EC41D 750A067E 83287000 FE7E8331 1.~±.)+.~..u.á^·.F·&ó.-.F=.V±¼Á. 000120
 FA5E8CF8 46891A46 880000F6 46C79006 E80001F6 46C7FE56 89FC4689 DAF70002 @.¼Õ.F=.V±úF~..Š..úF~..¡F..F%.^* 000140
 F876FFFA 76FF4574 001A5A3E 830AC483 06F31014 9AFC76FF FE76FF50 1E0676FF .v..P.v±.v=...µ..á..>Z..tE.v!.v½ 000160
 1BC806C7 06750818 C83E8300 7EC908F0 4E89C828 1A620E88 04C48302 0F0FFC9A .=....á...b.+à.NÞ.è~..>à..u.ú.à. 000180
 8BF04E89 F4468CF2 7E89F47F C00B49C1 88473005 C62605E8 F27EC4F0 4E880000 ...NÞà-·Š.&ó.0G.èl.á.¶.-·.F¶.NÞ. 0001A0
 F846FF46 202C8003 7C613C07 74C90804 88078A26 F85EC4F2 76C5EE5E 8C1A400E .ə..^Yév·á^½&.....èt.<a|.., F.F½ 0001C0
 830B741A 5806081A 44A11475 001A5C3E 83EE5E8E F45E8CF2 7689E375 003F8026 &.?.uO.v·.^¶.^Y.>\..u.ÀD...X.t.. 0001E0

Dump of file SATURN:[PCCOMMON.DUMP.DLL]CHECKIN.TMP;1 on 18-APR-1990 10:38:40.78
File ID (531,14,0)   End of file block 27 / Allocated 28

Virtual block number 6 (00000006), 512 (0200) bytes

 7E835657 000010C8 C8C95F5E 02C48302 FFE80E50 C02802E8 00018805 7500F67E --.u.¡..Š.+âP.Õ...á.^_èúà...WV.- 000000
 1A423E83 008FE902 1A540683 FA5689F8 46891A56 16881A54 A10001BE 18740006 ..t./..ÀT...V..F½.V*.¯T..Õ...>B. 000020
 FC468907 88261A54 1EC410E8 FA5689F8 46890257 88260788 261A541E C4137408 .t.á.T.&..&.W..F½.V*Š.á.T.&...F= 000040
 900AE800 C6881575 FA4608F8 46880E74 081A423E 83041A54 0683FA5E 8CF84689 .F½.^*..T...>B..t..F½.F*u.¡ó.Š.. 000060
 5A3639F6 28F45689 F24689FA 5688F846 88FA5E8C F8468900 CD880975 00FC7E83 .-=.u.¡è..F½.^*.F½.V*.F·.V¶+-962 000080
 C44690ED E8107ECE 38461574 003F8026 F246FFF2 5EC4900E E81A620E 881C741A .t...b.Š..á^·.F·&.?.t.F;ö~.ŠÚ.Fá 0000A0
 02C48301 59E80E57 0875001A 523E83FE 281A683E 88F37500 3F8026F2 46FFF25E ^·.F·&.?.uµ.>h.+±.>R..u.W.ÕY..á. 0000C0
 C95F5E02 C483013  E80E5708 74001A52 3E8306C4 830183E8 0EF876FF FA76FF56 V.v*.v½.Õ°..á..>R..t.W.Õ<..á.^_è 0000E0
 80057547 067E830o 7467067E 83FE5689 FC46891A 5616881A 54A10000 06C890C8 ù.à...ÀT...V..F=.V±.-.gt..-.Gu.¯ 000100
 1A623E83 007400FA 7E800006 1A6206C7 0675001A 5A3E83FA 4688C02A 9003E801 .Š..*á.F*.>Z..u.ú.b....-*.t..>b. 000120
 FFFE76FF 1A6436FF 1A6636FF 0676FF1A 6236FF1A 4036FF00 011A6206 C7067500 .u.ú.b....6ə..6b..v..6f..6d..v±. 000140
 FF1A6636 FF147500 1A383E83 1B7400FA 7E800EC4 8304F81E FF261956 068EFC76 v=..V.&..½..á..-*.t..>B..u..6f.. 000160
 6636FF14 75001A62 3E831874 001A383E 8304C483 04FC1EFF 26195606 8E1A6436 6d...V.&..=..á..>B..t..>b..u..6f 000180
 081A44A1 00001BC8 06C7081A 54068304 C4830504 1EFF2619 56068E1A 6436FF1A ..6d...V.&.....á...T..ú.à...ÀD.. 0001A0
 02EB0001 880574C0 0804C483 05081EFF 26195606 8EFC76FF FE76FF18 741A5806 .X.t..v±.v=..V.&.....á..ât.¡..Š. 0001C0
 1478044F FF261A3A 1EC43C75 001A603E 83560000 00C890C8 C90129E8 0E50C02B +âP.Õ).èú.à...V.>'..u<á.:.&.O.x. 0001E0
```

Dump of file SATURN:[PCCOMMON.DUMP.DLL]CHECKIN.TMP;1 on 18-APR-1990 10:38:40.78
File ID (531,14,0)   End of file block 27 / Allocated 28

Virtual block number 7 (00000007), 512 (0200) bytes

```
CB00909A 0676FF53 1A3C36FF 10EBE42A 04882602 478E2607 FF2637B8 2606468A .F.&.7&..&.G.&..*ðS..6<.S.v....ù 000000
1A603E83 56570000 02C890CB C95E1A5E 06FF9005 EB1A6006 FF077540 06C48309 ..á.au...'.Š....^.^èù.à...WV.>'. 000020
06C4830A 3300909A 1BCA36FF 1A3A36FF 1A3C36FF 1BEB507E F60B0676 88577500 .uW.v..--PŠ..6<..6:..6ð....3..á. 000040
FF263F8B 261BCAA0 0478044F FF261A3A 1EC41E7E C00B4EC6 8B1A6006 FF047540 au...'..6N.à-.á.:.&.O.xÅ.ð.&.?&. 000060
02C8CBC9 5F5E1A5E 06010646 88077500 1A603E83 D4EBE42A 05882602 478E2607 .&.G.&..*ðŠå.>'..u..F...^.^_èùà. 000080
5098078A 26065EC4 1A3A36FF 1A3C36FF 22EB5E75 001A603E 830A768B 56570000 ..WV.v..>'..u^$".6<..6:.á^.&...P 0000A0
4FFF261A 3A1EC425 74C00B4E C68B0646 FF1A6006 FF047540 06C4830A A500909A ...E..á.au...'..F..6N.ât%á.:.&.O 0000C0
3E83CAEB E42A0588 2602478E 2607FF26 3F8B261A 3A1EC407 8A26065E C4C07804 .xeá^.&..á.:.&.?&..&.G.&..*ðŠð.> 0000E0
89F44689 1A66168B 1A64A156 00000CC8 CBC95F5E 1A5E0601 0A468807 75001A60 '..u..F...^.^_èùà...VÀd...f..F¶. 000100
2BF02BF8 468904C4 8306DE0F FC9AF476 FF521A68 368BFA46 89FC4689 C02BF656 V-+â.F=.F*.6h.R.v¶.=.B..á..F½+Þ+ 000120
F45EC422 75001A52 3E834E01 750818C8 3E8308EB 02EE8305 751018C8 3E830676 v..>à..u..Ÿ.Š..>à..u.N.>R..u"á^¶ 000140
83F84EFF 02C483FE 71E80E50 98078A26 F446FF12 753018CA 3E831975 2D3F8026 &.?-u..>ð.0u..F¶&...P.Òq±.á..N½. 000160
3E830066 E80EFA46 FF077400 067E8318 74001A52 3E83077E F60B0874 3018CA3E >ð.0t..--..>R..t..-..t..F*.Òf..> 000180
7400067E 8302C483 FE7EE80E 56297500 1A523E83 0070E80E FC46FF07 74001BC8 à..t..F=.Òp..>R..u)V.Ò-±.á..-..t 0001A0
FFF876FF 0040E80E 047500FC 7E830A74 0018C83E 830039E8 0E047500 FA7E830A ..-*.u..Ò9..>à..t..-=.u..Òa..v½. 0001C0
C483FE38 E80E5600 2018CA06 C70E7400 1A523E83 06C483FE B5E80EF4 76FFF676 v-.v¶.Òç±.á..>R..t.ú.ð. .V.Ò8±.á 0001E0
```

Dump of file SATURN:[PCCOMMON.DUMP.DLL]CHECKIN.TMP;1 on 18-APR-1990 10:38:40.78
File ID (531,14,0)   End of file block 27 / Allocated 28

Virtual block number 8 (00000008), 512 (0200) bytes

```
EB0E306A CB02C483 FD02E80E 500020B8 03EB002B B8057400 1A443E83 CBC95E02 .^èù.>D..t.¡+.Š.¡ .P.Ò@».á.ùj0.Ò 000000
FDAAE80E 500078B8 03EB0058 B8057400 1A403E83 1775101B C83E8302 C483FDC8 à».á..>à..u..>a..t.¡X.Š.¡x.P.Ò¯» 000020
83378826 1A541EC4 12752A3F 80260A5E C40001FE 46C75657 000006C8 CB02C483 .á.ùà...WVúF±..á^.&.?*u.á.T.&.7. 000040
0A5E88F6 2B0A46FF FFFFFE46 C708752D 3F80260A 5EC49060 EB0A46FF 021A5406 .T...F.Š'.á^.&.?-u.úF±...F.+-.^. 000060
F88B0030 1BCA06C7 0675303C 0A751A5A 3639387F 393C3F7C 303CFA46 88078A26 &...F*<0|?<9.;96Z.u.<0u.ú.ð.0..« 000080
3D802647 F18B30E9 83C803E1 D1CE0302 E1C1CE8B 98058A26 187F3930 802606EB Š.&.=9..&....òeÅ..öiÅ.à.Ò0.þG&.= 0000A0
CBC95F5E 0C5688OA 46883789 26065EC4 F088EEF7 FE4688OC 468C0A7E 890F7D30 0)Ô.-..F..F±¥Ÿ.Þá^.&.7.F..V.^ èù 0000C0
00382611 74003080 264701E8 FC7EC406 4E8AFE5E 8CFC4689 00048857 000004C8 à...W¡à..F=.^±.N.á-=Š.G&.=.t.&8. 0000E0
C48850EC 885590CB C95FC02B FE468CFC 7E899009 EBFE468C FC7E8900 0188F475 u¶¡...-=.F±Š...-=.F±+á_èù.U.$P.á 000100
0386E800 21E80000 FFFF9A00 DA681E00 0C681E17 16A3E086 580000FF FF9A5016 .P.....X.ÀÈ...hÈ..hÒ.......Ò!.ÒÑ. 000120
BB1E00E2 16FF00FF 680CC000 709A0CB3 001C9A50 CB5DE588 00018809 8F11569A .V...¡...|]ùP...*..p.à.h....à..£ 000140
F3CB88D1 8804E68E 31740030 80264701 75003080 267FFFB9 000C068E FF330000 ..3...É.¿..&.=.u.G&.=.t1/|..|.ùµ 000160
AC9204E0 C00E7241 2CAC1710 BF1FF788 071E061C EBE774AE F2C03308 74CA88A6 |.ðt.3à·ÙtÒŠ.....¥.¢..¯,Ar.àÀ..¯ 000180
FF047400 04F63E83 0CC50070 9A5000FC 88EC8855 00C31FED EBAAC20A 0572412C ,Ar..ó¯ŠÙ.Ù.U.$¡=.P.p.é..>-..t.. 0001A0
BE065688 C08ED88E 012B8857 56EC8855 CB5DE588 00260070 9A5000FF B804F41E .¶.¡..P.p.&..|]ùW.$VW¡+..Ä.à.V./ 0001C0
0002CA5D E5885E F 96E8EBF7 88AEF2FF FF89C033 970C7496 401074C2 3BAD1960 '.Ù;ðt.a.t..3á¿..·Ù.¥ŠŠ._^.|]ð.. 0001E0
```

Dump of file SATURN:[PCCOMMON.DUMP.DLL]CHECKIN.TMP;1 on 18-APR-1990 10:38:40.78
File ID (531,14,0)   End of file block 27 / Allocated 28

Virtual block number 9 (00000009), 512 (0200) bytes

```
C48B5049 D1F7AEF2 FFFFB9C0 33FA8892 1F74C008 0D3A0040 9A0676FF 57EC8B55 U.&W.v..a.:..át...*3á¿..·Ù%||P.á 000000
468B192E 06FF0000 04C80002 CA5DE58B 5F5B0000 FFFF9A50 1651521E 530002B8 E..S.RQ.P.....[_.|]ð..à........F 000020
119A0200 68FE5E8C FC468911 0C05E0D1 C103E0D1 C888F9F7 000CB999 05182D04 .-...¿..¥*.àIÁ.ÈIÁ....F=.^±h.... 000040
47C726FC 5EC4080A 4F802611 74D00808 57892606 47892604 5EC402C4 83007A13 .z..á.á^.&.G.&.W..Àt.&.O..á^=&ùG 000060
FC5EC408 57892606 47892640 FE5688FC 4688040A 4F802604 5EC49021 E8020002 ...Š!.á^.&.O...F=.V±a&.G.&.W.á^= 000080
C3C90000 0447C726 02578926 07892608 57882606 47882604 5EC40001 0247C726 &ùG...á^.&.G.&.W.&..&.W.&ùG...èù 0000A0
0A76FF53 CC8B04EC 830478E9 046CE9C0 330009BA 0872171B 1E38065E 88EC8855 U.&.^.;...r.a..3àÒl.Òx..&..äS.v. 0000C0
885500CB 50E58BFD 171DA780 91E175C0 855A5900 00FFFF9A 51160C76 FF0876FF .v..v..Q.....YZ.àuÅ..|..».|]ù.U. 0000E0
51C93353 12742017 1D87F604 2BE9C033 00098A08 7217181E 38065E8B 0CEC83EC &.&..^.;...r.a..3àÒ+.-... t.S3èQ 000100
C0330856 C50A468. FA5E8C66 7480171D 87F60000 0E599A50 16F4468D 51414151 QAAQ.F¶.P.Y...-....tf.^*.F.éV.3à 000120
0C8802EC 833B75AE F20A8049 E30C4E88 F86689F2 88FA8856 57FCFC46 89FE4689 .F±.F==WV.*.·.f½.N.DI¯.·Ùu;.&..É 000140
009AE900 28E8F4E2 AA1A74F8 3B00740A 3CAC0C4E 880716FA 88D488E2 2B00808A a..+ã.å.*...N.¯<.t.;«t.¨ä¶Ò+.Ò.. 000160
7AE80093 E9FA5E8E 5F5EE1E8 0014E8E2 E8FC46FF 0A80AA00 1FE80375 FB3B00B0 ¯.;«u.Ò..¨¯..F=Šàð..ŠÂ^_.^*Ò..Šz 000180
5016F446 8051521E 53065E88 1FE3CA28 CF881F06 1E515350 00D11042 9AFFFC88 ¡=..B.|.PSQ....Ù+ðD..^.Š.RQ.F¶.P 0001A0
C00808C4 831FC3FA 88585859 1F07740B 08FE5E01 F45E8811 75C00800 0000D9A9A ......àu..^¶.^±.Ut..Y{X.*ù..á..à 0001C0
1D87F6FE 5E8E26EB F90020BA 03EB001C BA087500 09BA0001 30007400 603D1874 t.=m.t.=..a..u.a..Š.a .*Š&.^±-.. 0001E0
```

```
Dump of file SATURN:[PCCOMMON.DUMP.DLL]CHECKIN.TMP;1 on 18-APR-1990 10:38:40.78
File ID (531,14,0)   End of file block 27 / Allocated 28

Virtual block number 10 (0000000A), 512 (0200) bytes

 FC4628FE 468806EB F9C03300 1CBA0EEB F803751A 3F80085E 880A5E8E 0E744017 .at..^..^..?.u.%$.¤..3à'$..F±+F= 000000
 0856C51E EEE8C138 0475C908 0C4E8803 0FE9C85D E5880472 FA5E8E5F 5EF8668B .f%^_.^'r..|]ùÔ...N..èu..èSY.év. 000020
 00098A00 01300074 00603017 74C0081F 071E0000 0F319A50 16F4468D 51521E53 S.RQ.F¶.P.1.......èt.=m.t.=..¤.. 000040
 1A3F8026 DA880A74 40171D87 F68775C0 08F4468B C2E80020 8AC7E800 1CBACC75 u¤¤..$ú¤ .$ö.F¶.àuñ-...at..Ö&.7. 000060
 88914901 F7AEF2FF FF89C033 067EC4D7 88EC8855 00A3EBC0 33001C8A A6E80275 u.$I¤..3è$É.U.$.¤ó-.3à¿...ÚÄII.. 000080
 F60C7C00 F883117D 17181E38 065E88EC 88550442 E9008357 56EC8855 00CB50FA '}ù.U.$VW*.Ö8.U.$.^.;...)..«.|.- 0000A0
 05720516 1E380872 0828DC88 5A5900C8 5DE588C0 3302E800 01880574 40171D87 ...at.¡..$.3à.|]ù.Y2.É+Ar.;...r. 0000C0
 1710A780 D48852C^ 02880512 2EFF5152 FC5CE9C0 33057540 0512A1C8 5152E388 .DRQùÀ..au.3àÔ\=RQ....£..R.å.Ï.. 0000E0
 81067500 0230077  00013040 81127558 C0080000 FFFF9A52 16501653 C4885087 ñP.ás.P.R......áXu.Ÿa=..t.=..u.Ÿ 000100
 01AEE903 7319461E FF0833C2 8C194A06 C41EE319 480E885A D4794817 1D8F0808 .....KyåZ..H.D.á.J..ó3Ù..F.s.ÖÙ. 000120
 880073E8 1952BF19 528E007C E81952BF 1952BE19 461EFF00 038BC28C 194E06C4 á.N..óE....F./R.«R.Ò|./R.«R.Ös.¡ 000140
 51E81956 BF19528E D88E0046 88C30000 FFFF9A10 E3680E01 6A087419 563D1952 R.=V.t.j..hD......ù¡F..Ä/R.«V.ÒQ 000160
 31E81956 BF19528E 003AE818 CC8F18CC 8EEC8855 0000100E 9A006A00 6A036A00 .j.j.j..8...U.$/a.«a.Ò:./R.«V.Ò1 000180
 9A500646 8A50C033 001AE819 568F1956 8E0023E8 19568F19 568EEC88 5503E800 .$.U.$/V.«V.Ò#./V.«V.Ò..3àP.F.P. 0001A0
 F2740245 08058804 EF830E73 F738C319 461EFF00 028807E3 19480E88 0000FFFF ......H.D.£....F.ù;%s..ÿ....E.t 0001C0
 89C02800 DC168800 F0E90375 000C3639 FF28F628 56570000 14C800C3 EEE81DFF ..$Yù.À...WV+-+.96É.u.Öþ...É.+â. 0001E0

Dump of file SATURN:[PCCOMMON.DUMP.DLL]CHECKIN.TMP;1 on 18-APR-1990 10:38:40.78
File ID (531,14,0)   End of file block 27 / Allocated 28

Virtual block number 11 (0000000B), 512 (0200) bytes

 080AC483 11CA1424 9A04E668 1EF676FF F876FF0C 6AF85689 F64689F2 5689F046 Fþ.V·.F-.V%j..v%.v-.hI..$.ò..á.. 000000
 FFF65EC4 0CE847EA 75003F80 26F646FF F65EC400 8CE90376 7FFFFE81 461974C0 àt.F.±..v.ÖV.á^-.F-&.?.uöG$.á^-. 000020
 8904C483 11D913CC 9A046A50 01458D8A 75003F80 26F65E88 F475003F 8026F646 F-&.?.u¶.^-&.?.u¤.E.Pj..à.1..á.. 000040
 08FC4688 6D74EE46 08EC4688 FE5689FC 468902C4 83120F13 119A56EE 5689EC46 F$.VYV......á..F=.V±.F$.FYtm.F=. 000060
 1614249A 04E6681E F076FFF2 76FF0C6A 19251689 1923A3EE 568BEC46 886674C2 òtf.F$.VYÈ#...X.j..v·.vþ.hI..$.. 000080
 FFF05EC4 04EC4683 02578926 078926FE 5688FC46 88EC5EC4 2C74C008 0AC4830F ..á..àt,á^$.F=.V±&..&.W..F$.á^þ. 0000A0
 F475003F 8026F046 FFF05EC4 E8E80E74 C00A0788 26FC46FF FC5EC407 8A26F046 Fþ&..á^=.F=&...àt.$Òá^þ.Fþ&.?.u¶ 0000C0
 09060005 18040203 02021601 FA58E900 028890C8 C95F5EA7 75003F80 26F05EC4 á^þ&.?.uI^_èù.¡..ÖX'............ 0000E0
 00530052 02430041 02350212 12110010 120F1600 160C0808 070A0C09 0C080C07 .......................S.A.C.R.S. 000100
 16080000 080702CE 08A40D84 09820A81 0A801606 09721C70 2060006C 08590057 W.Y.l.m p.r...........É.ö.¤..... 000120
 12648817 19A3C850 E58899FF FF880008 E8C85DE5 8899FFFF 88171216 891719A3 É......¡....|]ùÒ..¡....|]ùÈ..£d. 000140
 76CA3C04 728C3C43 0A76243C 0472133C F7E24343 1674073A 2E1875E4 0A002489 ¿$..ôu..:..t.CCã¥<.r.<$v.C<¥r.<òv 000160
 5DE58801 FE4F8026 0574C308 C08C065E C4EC8855 00C31712 A3980147 8A2E4301 .C..G..È..ù.U.$á^..â.ùt.&.O±..|] 000180
 193AA312 740025E8 08750019 3A3E831E 73FFF130 06468857 5602EC83 EC8855C8 ùW.$.$.VW.F.=þ.s..>:..u.ÒX.t.È:. 0001A0
 C85DE588 5E5F02C4 83118A15 169A0676 FF087500 78E80574 0018E815 750082E8 Ò..u.Ò..t.Òx.u..v.......á._^.|]ù 0001C0
 C29A5002 80510E4F 8050501E C033FE5E 89FEE383 43065E88 0776065E 3900F088 Éþ.9^.v..^.C.D±.^±3à.PP.0.Ō.P.ö 0001E0

Dump of file SATURN:[PCCOMMON.DUMP.DLL]CHECKIN.TMP;1 on 18-APR-1990 10:38:40.78
File ID (531,14,0)   End of file block 27 / Allocated 28

Virtual block number 12 (0000000C), 512 (0200) bytes

 FE5E8800 08A3DA8E 0574D208 193EA319 3C1687C2 883874FF FA8308C4 83134516 .E..á..'.t8.ò..<.É>..@t..OÈ...^± 000000
 06A3000D 05000AA3 01478D00 02A30000 A3000A88 0C478948 480008A3 C0330B8E .À3àÈ..HH.G.¡..È..È...G.È.....È. 000020
 00000AC8 C3D98EC1 8CD20801 9AE8193E 1E8EDB33 064E88C0 8ED88CC3 1FD88C00 ..À.ù.A.á.N.3Ù..>.Ò...@.è.Iùà... 000040
 E899C028 0674FFFF C2F7FA56 89F84689 13F917C0 9A0676FF 006A0876 FF006A56 Vj..v.j..v..à.'..F%.V'%ó..t.+à.$ 000060
 9A50FE76 FF006A56 1274000B FE5689FC 468902C4 83141213 119A56F8 768B902F /..v%V......á..F=.V±.Àt.Vj..v±P. 000080
 8827E30E 4E881E56 57EC8855 90C8C95E FE5688FC 46889007 E808C483 13711778 x.q..á.$...F=.V±^èù.U.$WV..N.D'. 0000A0
 0477FF45 3A26C933 FF448AA6 F30A76C5 FE88C803 D9F7AEF2 C033F788 067EC409 Ìá-..%3à·Ú%I.ù.±év.µÌ.D.3è&:E.w. 0000C0
 071E570A 7EC51E08 56880646 880E4E88 00CB50E5 885F5E1F C188D1F7 49490474 t.II%i.ê.^_.|]ù_.N..F..V..é-.W.. 0000E0
 C0080233 92F7880A F7000283 08F7AA20 800A79D2 080E750A F9831374 C00A93FC =..àt..'.u..@y.¯-'%Ù.@.%Ó.%.3@.à 000100
 880586AC 4F0588E2 75C308C2 88AA2704 0276393C 30040387 92F1F793 F1F70274 t.¥þ.¥þ..Æ.0<9v..'`.ó.ùuã..O¯... 000120
 8CFA4689 05188856 000006C8 00C850E5 885E5F1F 580A8CF2 72C73801 4/ROFF44 D..D.;ùr·.OX._^.|]ù.à...V¡...F'. 000140
 46834601 744004C4 83130E17 F49A5306 0E74830A 47F626FA 5EC41CE8 F6¿ °C5E ^=+-$.á^'&-G._t..S.¶.8..á.àt.F.F 000160
 4F800474 08080650E 88EC8855 90C8C95E C6880876 FA463917 08168817 06A1.CFA '.À......9F'vÀ.ó^èù.U.$.^..Ùt..0 000180
 99C03305 750176E8 00058807 1E297500 3F831930 885756EC 8855C85D E58801FE ±...|]ùW.$VW£0..?.u)..¡..Òv.u.3à. 0001A0
 8C064E88 19363689 FFFEFE44 C704C683 000104C7 961932A3 1930A3FE 244024E8 $$a$±È0.£2..ù....ó.ùD±±..66..N.. 0001C0
 88ADFC02 7788F273 EEF983FE E180FA74 410000E9 C850E588 5E5F0009 E8C08ED8 Ä.àÒ.._^.|]ùÒÀ.At'.Ät.'Ys·.w.=Ù. 0001E0
```

Dump of file SATURN:(PCCOMMON.DUMP.DLL)CHECKIN.TMP;1 on 18-APR-1990 10:38:40.78
File ID (531,14 1)   End of file block 27 / Allocated 28

Virtual block number 13 (00000000), 512 (0200) bytes

```
88E6E8FE 4489F788 000205C2 03357401 A8ADF003 00881573 C1384843 7401A8FE ±´.tCH;ês..Å.ÞÙ´.t5.ô....Ä.D±Şl. 000000
260574D1 3810E489 DA8CC688 FE4CFEF9 0305E805 8948C128 FE4C89F9 030C74FE ±t..⁴.L±+èH..Ş..⁴±L±.ô.O¿ô.;ìt.& 000020
3848FE88 F274^1A8 ADF003FE 882574FF FE3D0219 4206C626 C3027F89 193E1E8C ..>....ûĄô.B..=±.t%.±.ÞÙ´.t·.±N; 000040
8E0474C0 08084788 E6E8FE44 89F78800 0205C203 E27401A8 ADF003D0 888C73C1 ès¥.Å.ÞÙ´.tã.ô....Ä.D±Şl.G..ât.. 000060
33067788 88E83788 193A1E8E 260574C7 3815A98F 088C1274 19420EFE 2615E8D8 ÀŞ.&±.8.t..Á¢´.;út.&..:..7ŞE.w.3 000080
8C98E84E 4E960574 001DE8FE 4DFE0D74 005FE898 40400124 0074C638 0068E8C0 àÒk.;ót.$.ⓐⓐ.Ò_.t.±M±Ò..t..NNŠ.. 0000A0
49C82803 7401A8FE 458851C3 99C03302 47890788 193EA326 0474C138 15FD89D8 À¿».;èt.&È>...¯G.3ä.ûQ.E±´.t.+àl 0000C0
C628C223 D2F70072 C2031572 C603C188 F575EAD1 04761940 1638267F FF8A4141 AAo..&;.ⓐ.v.lõuŸ.ê.ór..ór.Ÿ0#ó+ó 0000E0
FE44C7F2 03F088FE 88571874 001DE851 52C359C0 33E575EA D1D2F708 75000CE8 Ò..u.Ÿ0ìõul3àYûRQÒ..t.W.±.Þ.·ûD± 000100
9A1F0650 00018850 52521ED2 335053C3 5A5958FE 55894AD7 28D68806 7789FFFE ±..W..ø+aJ.U±XYZûSP30.RRP¡..P... 000120
E48F3875 000A7E83 065756EC 8855C3D2 08027458 5A1FFFFA 8308C483 14E516C2 ô.Ì..á..⁴..Z[t..0ûU.$VW..~..u8¢ô 000140
89024488 0074F738 11744804 E436884C E8277200 57E80775 48064688 08568800 ..V..F.Hu.ÒW.r'ŞL.6ô.Ht.;Ÿt..D.. 000160
52C48850 21E899F¿ FF880675 D2080473 04E4FE81 04C68334 735E003E E8560E46 F.VÒ>.^s4.ô..±ô.s..0u.¡...ŞIP.áR 000180
5E5F07C0 33038804 E4368902 5C891489 E675C085 F9580000 FFFF9A50 C0335016 .P3àP.....[⁴.àul...\..6ô..Ʃ3ä._^ 0001A0
26721C03 DA882CE¿ F9F27504 E4FE8104 C6830C74 024C39F7 880E4E88 C85DE588 .Ì]ù.N..Ÿ9L.t..ô..±ô.u·⁴Ş,.Ö..F& 0001C0
DE168904 75F738DE 75C08500 00FFFF9A 51531373 000E1E39 0675F738 C18ED388 .Ʃ.è;Ÿu.9.8.s.SQ......àu8;Ÿu...8 0001E0
```

Dump of file SATURN:(PCCOMMON.DUMP.DLL)CHECKIN.TMP;1 on 18-APR-1990 10:38:40.78
File ID (531,14,0)   End of file block 27 / Allocated 28

Virtual block number 14 (0000000E), 512 (0200) bytes

```
D3230818 D12B0C74 DAF7D788 067EC457 38E30C4E 88EC8855 00C3D188 04879200 .....lû.U.$.N.D8W6~..øŸOt.+l.ÛW& 000000
D1C38EFF FFC381C3 8C10E301 87AAF3C9 13A8F3E9 D1E08A0A 4688D128 D187D103 .l.l+l.F..ÀlÒµ .èµ´.lD..û.û...ûl 000020
08750A5E 88D8080C 5E880846 88EC8855 C85D0856 88064688 5FAAF3C9 13A8F3E9 Òµ¨.èµ`_.F..V.]ûU.$.F..^..Ä.^.u. 000040
E588D103 E3F70646 88C8030C 66F70646 88C888E3 F70008CA 5DE588E3 F7064688 .F.ŸD.lÏò..ŸD.à.F.Ÿf..à.F.ŸD.l.l 000060
88157508 0A47F626 5575023C 03240A47 8A26065E C4F62856 000004C8 0008CA5D ]ò..à...V+-á^.&.G.$.<.ωU&-G..u.. 000080
46890647 28260788 26065E88 39740111 0C87F606 0868F9F7 000C8999 05182DC3 û·...¿..Ÿ⁴kÄ.-....t9.^.&..&+G..F 0000A0
FC463808 C4831682 0E6E9A50 E42A0847 8A260677 FF260877 FF265028 7EC008FC •.à-(P&.w.&.w.&.G.*ôP.n.ÿ..á.;F• 0000C0
26025789 26078926 08578826 06478826 065EC4FF FF8E200A 4F802606 5EC40874 t.á^.&.O. ƒ..á^.&.G.&.W.&..&.W.& 0000E0
10F80103 00050001 11300103 00000002 18480002 000CC8C9 5EC68800 000447C7 ûG....ô^èû....H.......O.......Ÿ. 000100
17610103 00220001 17160103 00880001 17A80105 00000004 16320002 00070001 ......2.....................ᴹ...■. 000120
0CA60103 004D0001 107A0103 00320004 0F8A0203 003A0001 0E9A0103 00260001 ..&.......:...ᴅ...2...z...M...Ì. 000140
54206E75 5220534D 00000000 00000000 00000000 005C0001 0C930103 00580001 ..[.......\.............MS Run-T 000160
38383931 20296328 20746867 69727970 6F432020 20797261 7262694C 20656069 ime Library - Copyright (c) 1988 000180
50004558 452E4042 44545241 54530011 70726F43 2074666F 736F7263 6940202C , Microsoft Corp..STARTDBM.EXE.P 0001A0
68746977 206E7572 20656220 796C6E6F 206E6163 206E6968 63656843 00485441 ATH.Checkin can only be run with 0001C0
68432072 6567616E 61406174 6144006E 6F697469 64452064 65646E65 74784520  Extended Edition.DataManager Ch 0001E0
```

Dump of file SATURN:(PCCOMMON.DUMP.DLL)CHECKIN.TMP;1 on 18-APR-1990 10:38:40.78
File ID (531,14,0)   End of file block 27 / Allocated 28

Virtual block number 15 (0000000F), 512 (0200) bytes

```
652E706D 69626400 63256325 73256325 63257325 00504D49 4244006E 696ι5365 eckin.DBIMP.%s%c%c%s%c%c.dbimp.e 000000
756E2800 296C6C75 6E280072 61762E70 6D696264 5F5C706D 745C3A63 0000υ578 xe..c:\tmp\_dbimp.var.(null).(nu 000020
00000000 00000000 195618D0 111318D0 18D00000 00000000 23202D28 00296C6C ll).+- #......Å.Å...Å.V......... 000040
00000000 00000000 00000000 00000000 00000000 00000000 00000000 00000000 ................................ 000060
00000000 00000000 00000000 00000000 00000000 00000000 00000000 00000000 ................................ 000080
00000000 00000000 00000000 00000000 00000000 00000000 00000000 00000000 ................................ 0000A0
00000000 00000000 00000000 00000000 00000000 00000000 00000000 00000000 ................................ 0000C0
00000000 00000000 00000000 00000000 00000000 00000000 00000000 00000000 ................................ 0000E0
00000000 00000000 00000000 00000000 00000000 00000000 00000000 00000000 ................................ 000100
00000000 00000000 00000000 00000000 00000000 00000000 00000000 00000000 ................................ 000120
00000000 00000000 00000000 00000000 00000000 00000000 00000000 00000000 ................................ 000140
00000000 00000000 00000000 00000000 00000000 00000000 00000000 00000000 ................................ 000160
00000000 00000000 00000000 00000000 00000000 00000000 00000000 00000000 ................................ 000180
00000000 00000000 00000000 00000000 00000000 00000000 00000000 00000000 ................................ 0001A0
00000000 00000000 00000000 00000000 00000000 00000000 00000000 00000000 ................................ 0001C0
00000000 00000000 00000000 00000000 00000000 00000000 00000000 00000000 ................................ 0001E0
```

```
Dump of file SATURN:[PCCOMMON.DUMP.DLL]CHECKIN.TMP;1 on 18-APR-1990 10:38:40.78
File ID (531,14,0)   End of file block 27 / Allocated 28

Virtual block number 16 (00000010), 512 (0200) bytes

00000000 00000000 00000000 00000000 00000000 00000000 00000000 00000000 ................................ 000000
00000000 00000000 00000000 00000000 00000000 00000000 00000000 00000000 ................................ 000020
00000000 00000000 00000000 00000000 00000000 00000000 00000000 00000000 ................................ 000040
00000000 00000000 00000000 00000000 00000000 00000000 00000000 00000000 ................................ 000060
00000000 00000000 00000000 00000000 00000000 00000000 00000000 00000000 ................................ 000080
00000000 00000000 00000000 00000000 00000000 00000000 00000000 00000000 ................................ 0000A0
00000000 00000000 00000000 00000000 00000000 00000000 00000000 00000000 ................................ 0000C0
00000000 00000000 00000000 00000000 00000000 00000000 00000000 00000000 ................................ 0000E0
00000000 00000000 00000000 00000000 00000000 00000000 00000000 00000000 ................................ 000100
00000000 00000000 00000000 00000000 00000000 00000000 00000000 00000000 ................................ 000120
00000000 00000000 00000000 00000000 00000000 00000000 00000000 00000000 ................................ 000140
00000000 00000000 00000000 00000000 00000000 00000000 00000000 00000000 ................................ 000160
00000000 00000000 00000000 00000000 00000000 00000000 00000000 00000000 ................................ 000180
00000000 00000000 00000000 00000000 00000000 00000000 00000000 00000000 ................................ 0001A0
00000000 00000000 00000000 00000000 00000000 00000000 00000000 00000000 ................................ 0001C0
00000000 00000000 00000000 00000000 00000000 00000000 00000000 00000000 ................................ 0001E0

Dump of file SATURN:[PCCOMMON.DUMP.DLL]CHECKIN.TMP;1 on 18-APR-1990 10:38:40.78
File ID (531,14,0)   End of file block 27 / Allocated 28

Virtual block number 17 (00000011), 512 (0200) bytes

00000000 00000000 00000000 00000000 00000000 00000000 00000000 00000000 ................................ 000000
00000000 00000000 00000000 00000000 00000000 00000000 00000000 00000000 ................................ 000020
4E495F45 4C49465F 435F00E4 00000000 00000000 00000000 00000000 00000000 ....................δ._C_FILE_IN 000040
00000000 0506125E 0502125E 04FE125E 04FA125E FFFF125E 00000000 00304F46 FO=.....^...^.*.^.±.^..._*...... 000060
01020000 00000000 00000000 0001FFFF 00000000 05200000 0200FFFF FFFF0101 .......... ..................... 000080
00000000 00000000 00000000 00000000 00000000 02020000 00000000 00000000 ................................ 0000A0
00000000 00000000 00000000 00000000 00000000 00000000 00000000 00000000 ................................ 0000C0
00000000 00000000 00000000 00000000 00000000 00000000 00000000 00000000 ................................ 0000E0
00000000 00000000 00000000 00000000 00000000 00000000 00000000 00000000 ................................ 000100
00000000 00000000 00000000 00000000 00000000 00000000 00000000 00000000 ................................ 000120
00000000 00000000 00000000 00000000 00000000 00000000 00000000 00000000 ................................ 000140
00000000 00000000 00000000 00000000 00000000 00000000 00000000 00000000 ................................ 000160
00000000 00000000 00000000 00000000 00000000 00000000 00000000 00000000 ................................ 000180
00000000 00000000 00000000 00000000 00000000 00000000 00000000 00000000 ................................ 0001A0
00000000 00000000 00000000 00000000 00000000 00000000 00000000 00000000 ................................ 0001C0
00000000 00000000 00000000 00000000 00000000 00000000 00000000 00000000 ................................ 0001E0

Dump of file SATURN:[PCCOMMON.DUMP.DLL]CHECKIN.TMP;1 on 18-APR-1990 10:38:40.78
File ID (531,14,0)   End of file block 27 / Allocated 28

Virtual block number 18 (00000012), 512 (0200) bytes

00000000 00000000 00000000 00000000 00000000 00000000 00000000 00000000 ................................ 000000
00000000 00000000 00000000 00000000 00000000 00000000 00000000 00000000 ................................ 000020
00000000 00000000 00000000 00000000 00000000 00000000 00000000 00000000 ................................ 000040
00000000 00000000 00000000 00000000 00000000 00000000 00000000 00000000 ................................ 000060
00000000 00000000 00000000 00000000 00000000 00000000 00000000 00000000 ................................ 000080
00000000 00000000 00000000 00000000 00000000 00000000 00000000 00000000 ................................ 0000A0
00000000 00000000 00000000 00000000 00000000 00000000 00000000 00000000 ................................ 0000C0
00000000 00000000 00000000 00000000 00000000 00000000 00000000 00000000 ................................ 0000E0
00000000 00000000 00000000 00000000 00000000 00000000 00000000 00000000 ................................ 000100
00000000 00000000 00000000 00000000 00000000 00000000 00000000 00000000 ................................ 000120
00000000 00000000 00000000 00000000 00000000 00000000 00000000 00000000 ................................ 000140
00000000 00000000 00000000 00000000 00000000 00000000 00000000 00000000 ................................ 000160
00000000 00000000 00000000 00000000 00000000 00000000 00000000 00000000 ................................ 000180
00000000 00000000 00000000 00000000 00000000 00000000 00000000 00000000 ................................ 0001A0
00000000 00000000 00000000 00000000 00000000 00000000 00000000 00000000 ................................ 0001C0
00000000 00000000 00000000 00000000 00000000 00000000 00000000 00000000 ................................ 0001E0
```

```
Dump of file SATURN:[PCCOMMON.DUMP.DLL]CHECKIN.TMP;1 on 18-APR-1990 10:38:40.78
File ID (531,14,0)   End of file block 27 / Allocated 28

Virtual block number 19 (00000013), 512 (0200) bytes

 00000000 00000000 00000000 00000000 00000000 00000000 00000000 00000000 ................................ 000000
 00000000 00000000 00000000 00000000 00000000 00000000 00000000 00000000 ................................ 000020
 00000000 00000000 00000000 00000000 00000000 00000000 00000000 00000000 ................................ 000040
 00000000 00000000 00000000 00000000 00000000 00000000 00000000 00000000 ................................ 000060
 00000000 00000000 00000000 00000000 00000000 00000000 00000000 00000000 ................................ 000080
 00000000 00000000 00000000 00000000 00000000 00000000 00000000 00000000 ................................ 0000A0
 00000000 00000000 00000000 00000000 00000000 00000000 00000000 00000000 ................................ 0000C0
 00000000 00000000 00000000 00000000 00000000 00000000 00000000 00000000 ................................ 0000E0
 00000000 00000000 00000000 00000000 00000000 00000000 00000000 00000000 ................................ 000100
 00000000 00000000 00000000 00000000 00000000 00000000 00000000 00000000 ................................ 000120
 00000000 00000000 00000000 00000000 00000000 00000000 00000000 00000000 ................................ 000140
 00000000 00000000 00000000 00000000 00000000 00000000 00000000 00000000 ................................ 000160
 00000000 00000000 00000000 00000000 00000000 00000000 00000000 00000000 ................................ 000180
 00000000 00000000 00000000 00000000 00000000 00000000 00000000 00000000 ................................ 0001A0
 00000000 00000000 00000000 00000000 00000000 00000000 00000000 00000000 ................................ 0001C0
 00000000 00000000 00000000 00000000 00000000 00000000 00000000 00000000 ................................ 0001E0

Dump of file SATURN:[PCCOMMON.DUMP.DLL]CHECKIN.TMP;1 on 18-APR-1990 10:38:40.78
File ID (531,14,0)   End of file block 27 / Allocated 28

Virtual block number 20 (00000014), 512 (0200) bytes

 00000000 00000000 00000000 00000000 00000000 00000000 00000000 00000000 ................................ 000000
 00000000 00000000 00000000 00000000 00000000 00000000 00000000 00000000 ................................ 000020
 00000000 00000000 00000000 00000000 00000000 00000000 00000000 00000000 ................................ 000040
 00000000 00000000 00000000 00000000 00000000 00000000 00000000 00000000 ................................ 000060
 00000000 00000000 00000000 00000000 00000000 00000000 00000000 00000000 ................................ 000080
 00000000 00000000 00000000 00000000 00000000 00000000 00000000 00000000 ................................ 0000A0
 00000000 00000000 00000000 00000000 00000000 00000000 00000000 00000000 ................................ 0000C0
 00000000 00000000 00000000 00000000 00000000 00000000 00000000 00000000 ................................ 0000E0
 00000000 00000000 00000000 00000000 00000000 00000000 00000000 00000000 ................................ 000100
 00000000 00000000 00000000 00000000 00000000 00000000 00000000 00000000 ................................ 000120
 00000000 00000000 00000000 00000000 00000000 00000000 00000000 00000000 ................................ 000140
 00000000 00000000 00000000 00000000 00000000 00000000 00000000 00000000 ................................ 000160
 00000000 00000000 00000000 00000000 00000000 00000000 00000000 00000000 ................................ 000180
 00000000 00000000 00000000 00000000 00000000 00000000 00000000 00000000 ................................ 0001A0
 00000000 00000000 00000000 00000000 00000000 00000000 00000000 00000000 ................................ 0001C0
 00000000 00000000 00000000 00000000 00000000 00000000 00000000 00000000 ................................ 0001E0

Dump of file SATURN:[PCCOMMON.DUMP.DLL]CHECKIN.TMP;1 on 18-APR-1990 10:38:40.78
File ID (531,14,0)   End of file block 27 / Allocated 28

Virtual block number 21 (00000015), 512 (0200) bytes

 00000000 00000000 00000000 00000000 00000000 00000000 00000000 00000000 ................................ 000000
 00000000 00000000 00000000 00000000 00000000 00000000 00000000 00000000 ................................ 000020
 00000000 00000000 00000000 00000000 00000000 00000000 00000000 00000000 ................................ 000040
 00000000 00000000 00000000 00000000 00000000 00000000 00000000 00000000 ................................ 000060
 00000000 00000000 00000000 00000000 00000000 00000000 00000000 00000000 ................................ 000080
 00000000 00000000 00000000 00000000 00000000 00000000 00000000 00000000 ................................ 0000A0
 00000000 00000000 00000000 00000000 00000000 00000000 00000000 00000000 ................................ 0000C0
 00000000 00000000 00000000 00000000 00000000 00000000 00000000 00000000 ................................ 0000E0
 00000000 00000000 00000000 00000000 00000000 00000000 00000000 00000000 ................................ 000100
 00000000 00000000 00000000 00000000 00000000 00000000 00000000 00000000 ................................ 000120
 00000000 00000000 00000000 00000000 00000000 00000000 00000000 00000000 ................................ 000140
 00000000 00000000 00000000 00000000 00000000 00000000 00000000 00000000 ................................ 000160
 00000000 00000000 00000000 00000000 00000000 00000000 00000000 00000000 ................................ 000180
 00000000 00000000 00000000 00000000 00000000 00000000 00000000 00000000 ................................ 0001A0
 00000000 00000000 00000000 00000000 00000000 00000000 00000000 00000000 ................................ 0001C0
 00000000 00000000 00000000 00000000 00000000 00000000 00000000 00000000 ................................ 0001E0
```

```
Dump of file SATURN:[PCCOMMON.DUMP.DLL]CHECKIN.TMP;1 on 18-APR-1990 10:38:40.78
File ID (531,14,0)   End of file block 27 / Allocated 28

Virtual block number 22 (00000016), 512 (0200) bytes

00000000 00000000 00000000 00000000 00000000 00000000 00000000 00000000 ................................ 000000
00000000 0000C.J00 00000000 00000000 00000000 00000000 00000000 00000000 ................................ 000020
00000000 00000000 00000000 00000000 00000000 00000000 00000000 00000000 ................................ 000040
00000000 00000000 00000000 00000000 00000000 00000000 00000000 00000000 ................................ 000060
00000000 00000000 00000000 00000000 00000000 00000000 00000000 00000000 ................................ 000080
00000000 00000000 00000000 00000000 00000000 00000000 00000000 00000000 ................................ 0000A0
00000000 00000000 00000000 00000000 00000000 00000000 00000000 00000000 ................................ 0000C0
00000000 00000000 00000000 00000000 00000000 00000000 00000000 00000000 ................................ 0000E0
00000000 00000000 00000000 00000000 00000000 00000000 00000000 00000000 ................................ 000100
00000000 00000000 00000000 00000000 00000000 00000000 00000000 00000000 ................................ 000120
00000000 00000000 00000000 00000000 00000000 00000000 00000000 00000000 ................................ 000140
00000000 00000000 00000000 00000000 00000000 00000000 00000000 00000000 ................................ 000160
00000000 00000000 00000000 00000000 00000000 00000000 00000000 00000000 ................................ 000180
00000000 00000000 00000000 00000000 00000000 00000000 00000000 00000000 ................................ 0001A0
00000000 00000000 00000000 00000000 00000000 00000000 00000000 00000000 ................................ 0001C0
00000000 00000000 00000000 00000000 00000000 00000000 00000000 00000000 ................................ 0001E0

Dump of file SATURN:[PCCOMMON.DUMP.DLL]CHECKIN.TMP;1 on 18-APR-1990 10:38:40.78
File ID (531,14,0)   End of file block 27 / Allocated 28

Virtual block number 23 (00000017), 512 (0200) bytes

00000000 00000000 00000000 00000000 00000000 00000000 00000000 00000000 ................................ 000000
00000000 00000000 00000000 00000000 00000000 00000000 00000000 00000000 ................................ 000020
00000000 0000000^0 00000000 00000000 00000000 00000000 00000000 00000000 ................................ 000040
02000001 000000 ) 00000000 00000000 00000000 00000000 00000000 00000000 ................................ 000060
00000000 00000000 00000000 00000000 00000000 00000000 00000000 00000000 ................................ 000080
00000000 00000000 00000000 00000000 00000000 00000000 00000000 00000000 ................................ 0000A0
00000000 00000000 00000000 00000000 00000000 00000000 00000000 00000000 ................................ 0000C0
00000000 00000000 00000000 00000000 00000000 00000000 00000000 00000000 ................................ 0000E0
00000000 00000000 00000000 00000000 00000000 00000000 00000000 00000000 ................................ 000100
00000000 00000000 00000000 00000000 00000000 00000000 00000000 00000000 ................................ 000120
00000000 00000000 00000000 00000000 00000000 00000000 00000000 00000000 ................................ 000140
00000000 00000000 00000000 00000000 00000000 00000000 00000000 00000000 ................................ 000160
00000000 00000000 00000000 00000000 00000000 00000000 00000000 00000000 ................................ 000180
00000000 00000000 00000000 00000000 00000000 00000000 00000000 00000000 ................................ 0001A0
00000000 00000000 00000000 00000000 00000000 00000000 00000000 00000000 ................................ 0001C0
00000000 00000000 00000000 00000000 00000000 00000000 00000000 00000000 ................................ 0001E0

Dump of file SATURN:[PCCOMMON.DUMP.DLL]CHECKIN.TMP;1 on 18-APR-1990 10:38:40.78
File ID (531,14,0)   End of file block 27 / Allocated 28

Virtual block number 24 (00000018), 512 (0200) bytes

00000000 00000000 00000000 00000000 00000000 00000000 00000000 00000000 ................................ 000000
00000000 00000000 00000000 00000000 00000000 00000000 00000000 00000000 ................................ 000020
00000000 00000000 00000000 00000000 00000000 00000000 00000000 00000000 ................................ 000040
00000000 00000000 00000000 00000000 00000000 00000000 00000000 00000000 ................................ 000060
00000000 00000000 00000000 00000000 00000000 00000000 00000000 00000000 ................................ 000080
00000000 00000000 00000000 00000000 00000000 00000000 00000000 00000000 ................................ 0000A0
00000000 00000000 00000000 00000000 00000000 00000000 00000000 00000000 ................................ 0000C0
00000000 00000000 00000000 00000000 00000000 00000000 00000000 00000000 ................................ 0000E0
00000000 00000000 00000000 00000000 00000000 00000000 00000000 00000000 ................................ 000100
00000000 00000000 00000000 00000000 00000000 00000000 00000000 00000000 ................................ 000120
00000000 00000000 00000000 00000000 00000000 00000000 00000000 00000000 ................................ 000140
00000000 00000000 00000000 00000000 00000000 00000000 00000000 00000000 ................................ 000160
00000000 00000000 00000000 00000000 00000000 00000000 00000000 00000000 ................................ 000180
00000000 00000000 00000000 00000000 00000000 00000000 00000000 00000000 ................................ 0001A0
00000000 00000000 00000000 00000000 00000000 00000000 00000000 00000000 ................................ 0001C0
00000000 00000000 00000000 00000000 00000000 00000000 00000000 00000000 ................................ 0001E0
```

```
Dump of file SATURN:[PCCOMMON.DUMP.DLL]CHECKIN.TMP;1 on 18-APR-1990 10:38:40.78
File ID (531,14,0)   End of file block 27 / Allocated 28

Virtual block number 25 (00000019), 512 (0200) bytes

 00000000 00000000 00000000 00000000 00000000 00000000 00000000 00000000 ................................ 000000
 00000000 00000000 00000000 00000000 00000000 00000000 00000000 00000000 ................................ 000020
 00000000 00000000 00000000 00000000 00000000 00000000 00000000 00000000 ................................ 000040
 00000000 00000000 00000000 00000000 00000000 00000000 00000000 00000000 ................................ 000060
 00000000 00000000 00000000 00000000 00000000 00000000 00000000 00000000 ................................ 000080
 00000000 00000000 00000000 00000000 00000000 00000000 00000000 00000000 ................................ 0000A0
 00000000 00000000 00000000 00000000 00000000 00000000 00000000 00000000 ................................ 0000C0
 00000000 00000000 00000000 00000000 00000000 00000000 00000000 00000000 ................................ 0000E0
 00000000 00000000 00000000 00000000 00000000 00000000 00000000 00000000 ................................ 000100
 00000000 00000000 00000000 00000000 00000000 00000000 00000000 00000000 ................................ 000120
 00000000 00000000 00000000 00000000 00000000 00000000 00000000 00000000 ................................ 000140
 00000000 00000000 00000000 00000000 00000000 00000000 00000000 00000000 ................................ 000160
 00000000 00000000 00000000 00000000 00000000 00000000 00000000 00000000 ................................ 000180
 00000000 00000000 00000000 00000000 00000000 00000000 00000000 00000000 ................................ 0001A0
 00000000 00000000 00000000 00000000 00000000 00000000 00000000 00000000 ................................ 0001C0
 00000000 00000000 00000000 00000000 00000000 00000000 00000000 00000000 ................................ 0001E0

Dump of file SATURN:[PCCOMMON.DUMP.DLL]CHECKIN.TMP;1 on 18-APR-1990 10:38:40.78
File ID (531,14,0)   End of file block 27 / Allocated 28

Virtual block number 26 (0000001A), 512 (0200) bytes

 00000000 00000000 00000000 00000000 00000000 00000000 00000000 00000000 ................................ 000000
 00000000 00000000 00000000 00000000 00000000 00000000 00000000 00000000 ................................ 000020
 00000000 00000000 00000000 00000000 00000000 00000000 00000000 00000000 ................................ 000040
 00000000 000000E6 11000000 00000000 00000000 00000000 00000000 00000000 ........................!....... 000060
 00000000 00000000 00000000 00000000 81818101 00000001 00000000 00000000 ................................ 000080
 00000000 00000000 00000000 00000000 00000000 00000000 00000000 00000000 ................................ 0000A0
 00000000 00000000 00000000 00000000 00000000 00000000 00000000 00000000 ................................ 0000C0
 00000000 00000000 00000000 00000000 00000000 00000000 00000000 00000000 ................................ 0000E0
 00000000 00000000 00000000 00000000 00000000 00000000 00000000 00000000 ................................ 000100
 00000000 00000000 00000000 00000000 00000000 00000000 00000000 00000000 ................................ 000120
 00000000 00000000 00000000 00000000 00000000 00000000 00000000 00000000 ................................ 000140
 00000000 00000000 00000000 00000000 00000000 00000000 00000000 00000000 ................................ 000160
 0A0A0A0A 0A0A0A0A 0A0A0A0A 0A0A0A0A 0A0A0A00 00000000 00000000 00000000 ................................ 000180
 0A0A0A0A 0A0A0A0A 0A0A0A0A 0A0A0A0A 0A0A0A0A 0A0A0A0A 0A0A0A0A 0A0A0A0A ................................ 0001A0
 0A0A0A0A 0A0A0A0A 0A0A0A0A 0A0A0A0A 0A0A0A0A 0A0A0A0A 0A0A0A0A 0A0A0A0A ................................ 0001C0
 0A0A0A0A 0A0A0A0A 0A0A0A0A 0A0A0A0A 0A0A0A0A 0A0A0A0A 0A0A0A0A 0A0A0A0A ................................ 0001E0

Dump of file SATURN:[PCCOMMON.DUMP.DLL]CHECKIN.TMP;1 on 18-APR-1990 10:38:40.78
File ID (531,14,0)   End of file block 27 / Allocated 28

Virtual block number 27 (0000001B), 512 (0200) bytes

 0A0A0A0A 0A0A0A0A 0A0A0A0A 0A0A0A0A 0A0A0A0A 0A0A0A0A 0A0A0A0A 0A0A0A0A ................................ 000000
 0A0A0A0A 0A0A0A0A 0A0A0A0A 0A0A0A0A 0A0A0A0A 0A0A0A0A 0A0A0A0A 0A0A0A0A ................................ 000020
 0A0A0A0A 0A0A0A0A 0A0A0A0A 0A0A0A0A 0A0A0A0A 0A0A0A0A 0A0A0A0A 0A0A0A0A ................................ 000040
 0A0A0A0A 0A0A0A0A 0A0A0A0A 0A0A0A0A 0A0A0A0A 0A0A0A0A 0A0A0A0A 0A0A0A0A ................................ 000060
 00000000 00000000 00000000 00000000 0000000A 0A0A0A0A 0A0A0A0A 0A0A0A0A ................................ 000080
 00000000 00000000 00000000 00002000 00000000 00000000 00000000 00000000 ................. .............. 0000A0
 68636174 7320200A 00303030 36520000 3E3E4753 4D4E3C3C FFFF050A 14C40000 ..Ä.....<<NMSG>>..R6000..- stack 0000C0
 64207265 6765746E 6920200A 00333030 36520003 000A0D77 6F6C6672 65766F20  overflow.....R6003..- integer d 0000E0
 756F6E65 20746F6E 20200A00 38303036 52000800 0A0D3020 79622065 64697669 ivide by 0.....R6008..- not enou 000100
 39303036 52000900 0A0D7374 6E656D75 67726120 726F6620 65636170 73206867 gh space for arguments.....R6009 000120
 6E6F7269 766E6520 726F6620 65636170 73206867 756F6E65 20746F6E 20200A00 ..- not enough space for environ 000140
 00020020 726F7272 65206560 6974206E 757200FF 000A0000 FC000A00 746E6560 ment...=......run-time error ... 000160
 64616F6C 20746F6E 20746E69 6F702067 6E697461 6F6C6620 200A0032 30303652 R6002..- floating point not load 000180
 00041708 00020000 0003051A 00020000 00021954 00020003 FFFFFF00 0A006465 ed..........T................... 0001A0
 00000000 00000000 00000000 00000000 00000000 00000000 00000000 00000000 ................................ 0001C0
 00000000 00000000 00000000 00000000 00000000 00000000 00000000 00000000 ................................ 0001E0
```

```
Dump of file SATURN:[PCCOMMON.DUMP.DLL]DAIMDF.TMP;1 on 18-APR-1990 10:41:20.28
File ID (570,8,0)   End of file block 71 / Allocated 72

Virtual block number 1 (00000001), 512 (0200) bytes

 00000000 00000040 00000000 00000088 0000FFFF 00000004 00000040 018C5A40 MZ¥.a...........|.......a....... 000000
 00000080 00000000 00000000 00000000 00000000 00000000 00000000 00000000 ................................ 000020
 6F6E6E61 63206D61 72676F72 70207369 685421CD 4C018821 C0098400 0EBA1F0E ..¤..Ç.ë||.LëIThis program canno 000040
 00000000 00000024 0A0D002E 65646F6D 20534F44 206E6920 6E757220 65622074 t be run in DOS mode....$....... 000060
 000A0009 00000000 00030000 00000000 00068009 55873098 00070533 0505454E NE..3....0.U.................... 000080
 00000000 00000000 00010003 00040000 000005BA 0082009E 00940088 00400038 8.a.......ý.¤.................. 0000A0
 18FE0F00 18FE04C0 000F0F00 000F048E 12A60F00 12A60380 2E540F00 2E540060 '.T...T...Ì...Ì./.......ā.±...±. 0000C0
 00001EF1 00000821 02141EF1 021407FF 1C000F21 1A6A0656 03980E21 00000000 ....ñ...V.j.ñ.......þ...!.Å.þ.Å. 0000E0
 00010000 0046444D 49414406 00080004 00040005 00030005 0A051E81 0A05082E ....Ý...............DAIMDF..... 000100
 4C414353 4F44084E 49574D50 05000474 0404030F 018300F0 0009002F 00100007 ..../.\.Þ.......t...PMWIN.DOSCAL 000120
 434F4C42 45455246 4D45400C 48434F4C 42434F4C 4C414D45 4D004D45 4D03534C LS.MEM.MEMALLOCBLOCK.MEMFREEBLOC 000140
 4C4D4413 4E585450 4F54534C 4D440A4E 58545452 4154534C 4D44086C 6D640348 K.dml.DMLSTARTTXN.DMLSTOPTXN.DML 000160
 4C4D440D 49544759 52455551 4C4D4408 454C444E 41484C45 444F4D59 52455551 QUERYMODELHANDLE.DMLQUERYGTI.DML 000180
 46544553 4C4D4408 444C4549 46595245 55514C4D 4400544E 554F4359 52455551 QUERYCOUNT.DMLQUERYFIELD.DMLSETF 0001A0
 4D440831 4E4C5259 52455551 4C4D440C 4E4C5259 52455551 4C4D4408 444C4549 IELD.DMLQUERYRLN.DMLQUERYRLN1.DM 0001C0
 4C4D440E 48434142 4C4C4F52 4E585450 4F54534C 4D441254 53494C45 4552464C LFREELIST.DMLSTOPTXNROLLBACK.DML 0001E0

Dump of file SATURN:[PCCOMMON.DUMP.DLL]DAIMDF.TMP;1 on 18-APR-1990 10:41:20.28
File ID (570,8,0)   End of file block 71 / Allocated 72

Virtual block number 2 (00000002), 512 (0200) bytes

 50415441 44585541 59524555 51495447 12495447 034C4C41 5443454C 45534544 DESELECTALL.GTI.GTIQUERYAUXDATAP 000000
 54544145 54414552 434D4144 00544E45 45544145 52434D41 440C6D61 64035254 TR.dam.DAMCREATEENT.DAMCREATEATT 000020
 4C4D4144 0F4D4F44 45544145 52434D41 440C4D49 44455441 4552434D 41440C52 R.DAMCREATEDIM.DAMCREATEDOM.DAML 000040
 454C4544 4D41440D 544E4545 54454C45 44404144 0C544345 4A424F50 55484F4F OOKUPOBJECT.DAMDELETEENT.DAMDELE 000060
 4554454C 45444D41 440E4E49 414D4F44 4554454C 45444D41 440F5254 54414554 TEATTR.DAMDELETEDOMAIN.DAMDELETE 000080
 53494C4D 46440E4D 46440352 5245594E 4154414D 524F464D 41440F4E 454D4944 DIMEN.DAMFORMATANYERR.DFM.DFMLIS 0000A0
 45544345 4C45534D 45544959 52455551 5453494C 4D464418 4D455449 44444154 TADDITEM.DFMLISTQUERYITEMSELECTE 0000C0
 5355444C 45494659 52455551 4D464415 4D524F46 53534543 4F52504D 4''40E44 D.DFMPROCESSFORM.DFMQUERYFIELDUS 0000E0
 44485952 4555514D 46440F50 41454842 48595245 55514D46 440E4154 414/5245 ERDATA.DFMQUERYHBHEAP.DFMQUERYHD 000100
 4C44444E 57485952 4555514D 46440F4D 54485952 4555514D 46440B4A 424F-C4D HLOBJ.DFMQUERYHTM.DFMQUERYHWNDDL 000120
 4F545952 4555514D 46440C53 55544154 53544649 48535952 4555514D 46441347 G.DFMQUERYSHIFTSTATUS.DFMQUERYTO 000140
 46524554 53494745 524D4644 10415441 44524553 55595245 55514D46 44104C4F OL.DFMQUERYUSERDATA.DFMREGISTERF 000160
 444E414D 4D4F4354 45534D46 440F4E46 45534F4C 43544553 4D46440D 444C4549 IELD.DFMSETCLOSEFN.DFMSETCOMMAND 000180
 54414749 56414E54 45534D46 44104E46 4C4F5254 4E4F4354 45534D46 440F4E46 FN.DFMSETCONTROLFN.DFMSETNAVIGAT 0001A0
 54414452 45535554 45534D46 440E4E46 59464954 4F4E5445 534D4644 0E4E4645 EFN.DFMSETNOTIFYFN.DFMSETUSERDAT 0001C0
 53534543 4F52504D 4644194D 524F4647 4E4F4C45 54414749 56414E4D 46441341 A.DFMNAVIGATELONGFORM.DFMPROCESS 0001E0

Dump of file SATURN:[PCCOMMON.DUMP.DLL]DAIMDF.TMP;1 on 18-APR-1990 10:41:20.28
File ID (570,8,0)   End of file block 71 / Allocated 72

Virtual block number 3 (00000003), 512 (0200) bytes

 44455453 494C5353 45434F52 504D4644 194C4F52 544E4F43 54494445 5453494C LISTEDITCONTROL.DFMPROCESSLISTED 000000
 45544345 4C455358 4F425453 494C5952 4555514D 46441744 4E414D4D 4F435449 ITCOMMAND.DFMQUERYLISTBOXSELECTE 000020
 4F464144 0E4F464E 49524553 5554494E 4940524F 46414412 4D524F46 41440644 D.DAFORM.DAFORMINITUSERINFO.DAFO 000040
 41445055 4A424F0F 5443454C 45535449 4E494A42 4F0D454C 54495454 45534D52 RMSETTITLE.OBJINITSELECT.OBJUPDA 000060
 45445449 4E494A42 4F084353 45444554 41445055 4A424F0D 5443454C 45534554 TESELECT.OBJUPDATEDESC.OBJINITDE 000080
 59534C45 444A424F 094E5953 4444414A 424F094E 59535449 4E494A42 4F0A4353 SC.OBJINITSYN.OBJADDSYN.OBJDELSY 0000A0
 4F4E4444 414A424F 0A45544F 4E54494E 494A424F 084E5953 5045524A 424F094E N.OBJREPSYN.OBJINITNOTE.OBJADDNO 0000C0
 5F4D524F 46414413 45544F4E 5045524A 424F0A45 544F4E4C 45444A42 4F0A4554 TE.OBJDELNOTE.OBJREPNOTE.DAFORM_ 0000E0
 424D4444 414A424F 0952424D 54494E49 4A424F0A 42415456 415F4554 41455243 CREATE_AVTAB.OBJINITMBR.OBJADDMB 000100
 4C4D4416 54554C4D 44055242 4D504552 4A424F09 3152424D 4C45444A 424F0A52 R.OBJDELMBR1.OBJREPMBR.DMLUT.DML 000120
 45545349 47455254 554C4D44 1052454C 444E4148 59464954 4F4E454B 414D5455 UTMAKENOTIFYHANDLER.DMLUTREGISTE 000140
 4F525054 554C4D44 12455449 52575245 54534947 45525455 4C4D4412 54455352 RSET.DMLUTREGISTERWRITE.DMLUTPRO 000160
 4E554554 414C4552 52455453 49474552 54554C4D 44185946 49544F4E 53534543 CESSNOTIFY.DMLUTREGISTERRELATEUN 000180
 20322F53 4F260000 27A70301 01455449 5257534F 44084F49 53034554 414C4552 RELATE.SIO.DOSWRITE...Ī'..&OS/2  0001A0
 726F4620 676E6F4C 206C6564 6F4D206E 6F697461 6D726F66 6D492041 44204D50 PM DA Information Model Long For 0001C0
 00000000 00000000 00000000 00000000 01504152 5453544F 4F424D49 0800006D m...IMBOOTSTRAP................. 0001E0
```

```
Dump of file SATURN:[PCCOMMON.DUMP.DLL]DAIMDF.TMP;1 on 18-APR-1990 10:41:20.28
File ID (570,8,0)   End of file block 71 / Allocated 72

Virtual block number 4 (00000004), 512 (0200) bytes

 F6E90374 01E47E83 E446890C 468BE246 890A4688 D88EFFFF B81E5657 00001EC8 à...WV.¡...Ä.F..Fã.F..Fð.-ð.t.ð- 000000
 E9E64688 0006E903 75000030 E6468900 00FFFF9A 5016E846 8D0E76FF 1076FF00 ..v..v..FÒ.P......F|=..u.Ö...F|Ö 000020
 E6468800 06E9u375 000030E6 46890000 FFFF9A50 16F2468D 0E76FF10 76FF010E 8..v..v..F·.P......F|=..u.Ö...F| 000040
 890AC483 FFFF2630 9A0E76FF 1076FFE2 76FF5016 FC468000 63E9E246 8801BDE9 Ö§..FãÖc..F•.P.vã.v..v..=&...á.. 000060
 7401F27E 830028E9 0375FE46 08FC4688 0190E9E6 46880006 E9037500 0030E646 F|=..u.Ö...F|Ö...F•.F±u.Ö(..-·.t 000080
 E6468800 06E90375 000030E6 46890000 FFFF9AE8 76FFEA76 FF001CE9 0003E903 .Ö..Ö...vö.vÒ......F|=..u.Ö...F| 0000A0
 88E90375 00743000 18E90376 FF95E903 7500003D 004BE900 4EE90051 E9015DE9 Ö].ÖQ.ÖN.ÖK.=Å.u.Ö..v.Ö..=t.u.Ö. 0000C0
 75000A30 FF60E903 75000530 FF02E9FF 78E90375 009030FF 80E90375 008630FF .=..u.Ö..=..u.Öx.Ö@.=f.u.Öm.=Ö.u 0000E0
 1076FF00 45E9E246 88FFAFE9 FF55E903 7500EA30 FF5DE903 75000F30 FF65E903 .Öe.=Ö.u.Ö].=ö.u.ÖU.Ö£..FãÖE..v. 000100
 16F8468D E276FF0E 76FF1076 FF00AAE9 00000142 9A5016F4 468DE276 FF0E76FF .v..vã.F¶.P.B...Ö`..v..v..vã.F½. 000120
 E900C1E9 00008800 84E9F656 89F44689 02578826 078826F8 5EC40000 FFFF9A50 P.....á^½&..&.W..F¶.V-Ö..¡..Öè.Ö 000140
 30FF9EE9 03750074 30FFA6E9 03750071 30002BE9 0376FFB3 E9037500 0030007B (.=Å.u.Ö°.v.Ö+.=q.u.Ö[.=t.u.Ö..= 000160
 E9037500 D830FFBF E9FF86E9 037500CE 30FF8EE9 03750090 30FF96E9 0375008E ..u.Ö..*..u.Ö..=ö.u.Ö..Ö«.=Å.u.Ö 000180
 E9037500 DA30FF9F E9FF66E9 03750005 30FF6EE9 03750003 300013E9 0376FF78 (.v.Ö..=£.u.Ön.=f.u.Öf.Ö..=Ö.u.Ö 0001A0
 1076FFFF 7CE9FF59 E9037500 EA30FF48 E9037500 DF30FF53 E9037500 D030FF58 [.=ï.u.ÖS.=Ö.u.ÖK.=ö.u.ÖY.Ö|..v. 0001C0
 F076FF00 00FFFF9A 5016EE46 8D0E76FF 1076FF00 00FFFF9A 5016EC46 "90E76FF .v..F$.P......v..v..FŸ.P......vÞ 0001E0

Dump of file SATURN:[PCCOMMON.DUMP.DLL]DAIMDF.TMP;1 on 18-APR-1990 10:41:20.28
File ID (570,8,0)   End of file block 71 / Allocated 72

Virtual block number 5 (00000005), 512 (0200) bytes

 0000E900 00FFFF9A EC76FFF4 76FFF676 FF0676FF 0876FF0A 76FF0C76 FFEE76FF .vŸ.v..v..v..v..v-.v¶.v$.....Ö.. 000000
 FF0045E9 EC4688EC 46890A46 88088E00 08881E56 57000014 C8000CCA C95F5E1F .^_èò..à...WV.¡...Ä.F..F$.F$ÖE.. 000020
 4680EC76 FF0E76FF 1076FF00 62E90000 02649A50 16F8468D EC76FF0E 76FF1076 v..v..v$.F½.P.d...Öb..v..v..v$.F 000040
 89E90000 88003CE9 FA5689F8 46890257 88260788 26FC5EC4 0000012C 9A5016FC •.P.,...á^•&..&.W..F½.V°Ö<.¡..Ö. 000060
 7700ED30 FFDFE903 7300E830 FFABE903 7700933D FFEFE903 73009130 0033E900 .Ö3.=..s.Öÿ.=..w.Ö¨.=$.s.ÖÖ.=Ú.w 000080
 F2468D0E 76FF1076 FFFFC4E9 FF8BE903 77013A30 FFCFE903 73012C30 FFB1E903 .ÖŸ.=,.s.Öú.=:.w.Ö..Öá..v..v..F· 0000A0
 EE468D0E 76FF1076 FF000001 F99A5016 F4468D0E 76FF1076 FF000001 E99A5016 .P.Ö....v..v..F¶.P.°....v..v..FŸ 0000C0
 FFF876FF FA76FF06 76FF0876 FF0A76FF 0C76FFF4 76FFF676 FF000000 209A5016 .P.-....v-.v¶.v..v..v..v..v°.v½. 0000E0
 0A76FFD8 8E022FB8 1E565700 0004C800 0CCAC95F 5E1F0000 E90000FF FF9AF276 v·.....Ö...^_èò..àá..WV.¡/..Ä.v. 000100
 46890000 FFFF9A06 76FFFF30 B6FFFF32 B6FF0000 02D39A50 16FF3086 8D0876FF .v...0..P.£....Ñ2..Ñ0..v.......F 000120
 09E90375 23FF34BE 800000FF FF9A5016 FF34868D 406AF876 FFFA76FF FA5689F8 ½.V°.v°.v½jð..4..P......ƒ4.#u.Ö. 000140
 8689FFCA 83000000 04C483FF FF00529A 5016FF35 86800009 E90000BA 00008800 .¡..¤..Ö1...5..P.R....á.....ò... 000160
 B6FFFF32 B6FF001C E90374FF FF76BE83 0026E903 7407FF74 BE83FF76 9689FF74 t...v../t..t.Ö£../v..t.Ö...Ñ2..Ñ 000180
 0026E903 7406FF74 BE830039 E90000FF FF9A0080 685016FF 78868006 76FFFF30 0..v...x..Ph.......Ö9../t..t.Ö£. 0001A0
 FF9A5016 FF78868D 00806806 76FFFF30 B6FFFF32 B6FF001C E90374FF FF76BE83 ./v..t.Ö...Ñ2..Ñ0..v.h....x..P.. 0001C0
 0000FFFF 9A5016FF 2E868D08 76FF0A76 FF0054E9 0000BA00 00B80009 E90000FF ...Ö..¡..¤..ÖT..v..v......P..... 0001E0

Dump of file SATURN:[PCCOMMON.DUMP.DLL]DAIMDF.TMP;1 on 18-APR-1990 10:41:20.28
File ID (570,8,0)   End of file block 71 / Allocated 72

Virtual block number 6 (00000006), 512 (0200) bytes

 E9037500 0030FF2C 86890AC4 83007A26 309A0876 FF0A76FF 0676FF50 16FC468D .F=.P.v..v..v..=&z..á...,.=..u.Ö 000000
 0000FFFF 9A5016FF 788680FC 76FFFE76 FFFF2EB6 FF0018E9 0000BA00 00B80009 ..¡..¤..Ö...Ñ...v±.v=..x..P..... 000020
 FF004AE9 03740C08 7E83D88E 0319881E 56570000 0AC80006 CAC95F5E 1F0000E9 Ö...^_èò..à...WV.¡...Ä.-..t.ÖJ.. 000040
 00B9E9F6 46880006 E9037500 0030F646 890000FF FF9A5016 FC468D0E 76FF1076 v..v..F•.P......F-=..u.Ö...F-Ö¿. 000060
 FF9A656A 0E76FF10 76FF0000 E903740C 56390015 E903740A 4639FE56 88FC4688 .F•.V±9F.t.Ö..9V.t.Ö...v..v.je.. 000080
 7500003D F6468900 00FFFF9A 5016F846 8D0E76FF 1076FF00 90E90000 B80000FF ...¡..Ö...v..v..F½.P......F-=..u 0000A0
 76FF1677 FF261877 FF26F85E C4000114 47C726F8 5EC4006F E9F64688 0006E903 .Ö...F-Öo.á^½&úG...á^½&.w.&.w..v 0000C0
 0039E9F6 46880006 E9037500 0030F646 890000FF FF9A0676 FF0876FF 0A76FF0C ..v..v..v.......F-=..u.Ö...F-Ö9. 0000E0
 00A1680E 76FF1076 FF000005 219A00A0 680E76FF 1076FF00 001447C7 26F85EC4 á^½&úG....v..v.h...!....v..v.hÀ. 000100
 000CCAC9 5F5E1F00 00E90000 B80000FF FF9A009F 680E76FF 1076FF00 00052F9A ./....v..v.h.......¡..Ö...^_èò.. 000120
 9A5016F8 46800A76 FF0C76FF 000107C7 26065EC4 D88E0452 B81E5657 00000EC8 à...WV.¡R..Äá^.&ú....v..v..F½.P. 000140
 9A5016F4 46800A76 FF0C76FF 000002C3 9A5016FC 46800A76 FF0C76FF 0000032A °....v..v..F=.P.ù....v..v..F¶.P. 000160
 FFFF9AF4 76FFF676 FFFC76FF 000003FC 9A5016FE 46800A76 FF0C76FF 000004B5 ç....v..v..F±.P.=....v=.v-.v¶... 000180
 56570000 5AC80008 CAC95F5E 1F0000E9 00008800 00E90375 00003DF2 46890000 ...F·=..u.Ö..¡..Ö...^_èò..àZ..WV 0001A0
 0005609A 5016AC46 8D0876FF 0A76FF00 00FFFF9A 0876FF0A 76FFD88E 0548881E .¡H..A.v..v.......v..v̄..F^.P.'.. 0001C0
 02E39A50 16A8468D 0876FF0A 76FF009D E9A64688 0006E903 7500003D A6468900 ..F|=..u.Ö...F|Ö...v..v..F´.P.D. 0001E0
```

```
Dump of file SATURN:[PCCOMMON.DUMP.DLL]DAIMDF.TMP;1 on 18-APR-1990 10:41:20.28
File ID (570,8,0)    End of file block 71 / Allocated 72

Virtual block number 7 (00000007), 512 (0200) bytes

 689A5016 FC468D38 76FF0A76 FF007CE9 A6468800 06E90375 000030A6 46890000 ...Fl=..u.Ô...FlÕ|..v..v..F=.P.k 000000
 FC76FFFE 76FFA876 FFAA76FF 005BE9A6 46880006 E9037500 0030A646 89000004 ....Fl=..u.Ô...FlÕ[..v .v .vt.v= 000020
 AE76FF00 32E9A646 880006E9 03750000 3DA64689 0000FFFF 9A501680 46802F6A j/.F¯.P......Fl=..u.Ô...FlÕ2..vÛ 000040
 8D0676FF AC76FFAE 76FF0000 FFFF9A00 6A006A48 6A006A01 43680676 FFAC76FF .v¯.v.hC.j.jKj.j.......vÛ.v¯.v.. 000060
 05C2881E 56570000 A6C80006 CAC95F5E 1F0000E9 00008800 00FFFF9A 50168046 F¯.P.....|..Ô...^_èò..àl..WV.|ò. 000080
 DD9A5016 FC468D14 76FF1676 FF000407 C7260E5E C4078926 12468806 5EC4D88E .Áá^..F.&..á^.&ú....v..v..F=.P.î 0000A0
 FF60868D 1476FF16 76FF0188 E9FF5E86 880007E9 03750000 3DFF5E86 89000005 .....^.=..u.Ô....^.ÔE..v..v...'. 0000C0
 B6FFFF62 B6FF0197 E9FF5E86 880007E9 03750000 3DFF5E86 89000005 FE9A5016 .P.±.....^.=..u.Ô....^.Ô...Ñb..Ñ 0000E0
 0171E9FF 5E868800 07E90375 000030FF 5E868900 00FFFF9A 5016FF5A 8680FF60 '...Z..P.......^.=..u.Ô....^.Ôq. 000100
 5C86FFFF 60B6FFFF 62B6FF00 00030F9A 5016FF64 86804B6A 6E6AFC76 FFFE76FF .vt.v=jnjK..d..P.Ô....Ñb..Ñ'..Ñ\ 000120
 5E868800 07E90375 000030FF 5E868900 0006489A 50168046 8D2F6AFF 5AB6FFFF ..ÑZ.j/.F¯.P.H.....^.=..u.Ô....^ 000140
 880006E9 03740000 3D08C483 03730010 9A5016FF 64868050 16804680 012DE9FF .Ô-..F¯.P..d..P...s..á.=..t.Ô..| 000160
 9A505207 808A0200 88019668 2E6A0396 36FF2619 86068E00 6A006A01 0CE90000 ..Ô..j.j.....&.6..j.h..|..¤¯.RP. 000180
 00003DFF 5E868900 00FFFF9A 5052FFFF 8A020088 FF60B6FF FF62B6FF 0000FFFF .....Ñb..Ñ'.|..¤..RP.......^.=.. 0001A0
 B6FF00B3 E9FF5E86 88000008 409A0A76 FF0C76FF 019668FF 5EB6FF00 19E90375 u.Ô...Ñ^.h...v..v..M.....^.Ô°..Ñ 0001C0
 30FF5E86 890000FF FF9A5016 FF648680 2F6AFF5A B6FFFF5C B6FFFF60 B6FFFF62 b..Ñ'..Ñ\..ÑZ.j/..d..P.......^.= 0001E0

Dump of file SATURN:[PCCOMMON.DUMP.DLL]DAIMDF.TMP;1 on 18-APR-1990 10:41:20.28
File ID (570,8,0)    End of file block 71 / Allocated 72

Virtual block number 8 (00000008), 512 (0200) bytes

 76FF1676 FF0076E9 FF5E868B 0000FFFF 9AFF60B6 FFFF62B6 FF0014E9 03750000 ..u.Ô...Ñb..Ñ'........^.Ôv..v..v 000000
 FF0019E9 03750000 3DFF5E86 890000FF FF9AFF60 B6FFFF62 B6FF0000 05CD9A14 ..ë....Ñb..Ñ'........^.=..u.Ô... 000020
 A0681476 FF1676FF 0039E9FF 5E868800 00FFFF9A 0A76FF0C 76FF0196 68FF5EB6 Ñ^.h...v..v........^.Ô9..v..v.h. 000040
 05139A00 9F681476 FF1676FF 0000087E 9A00A168 1476FF16 76FF0000 08709A00 ..p....v..v.hÀ..-....v..v.h..... 000060
 881E5657 000062C8 0012CAC9 5F5E1F00 00E9FF5E 86880001 07C7260E 5EC40000 ..á^.&ú.....^.Ô...^_èò..àb..WV.| 000080
 880006E9 03750000 3DA64689 0000068F 9A5016AC 468D0876 FF0A76FF D88E069E ...Á.v..v..F¯.P.e....Fl=..u.Ô... 0000A0
 0006E903 7500003D A6468900 0006E39A 5016A846 8D0876FF 0A76FF01 3EE9A646 FlÕ>..v..v..F .P.D....Fl=..u.Ô.. 0000C0
 06E90375 000030A6 46890000 07099A50 16A2468D A876FFAA 76FF011D E9A6468B .FlÕ...v .v .FÅ.P......Fl=..u.Ô. 0000E0
 890000FF FF9A5016 9E468D18 6AA276FF A476FFA8 76FFAA76 FF00FCE9 A6468800 ..FlÕ=..v .v .vÊ.vÅj..F..P...... 000100
 486A006A 01436800 CE68AC76 FFAE76FF 0003E9A6 46880006 E9037500 0030A646 Fl=..u.Ô...FlÕ&..vÛ.v¯hò.hC.j.jK 000120
 26805EC4 04804683 0004E982 56898046 89A05688 9E468800 0006729A 006A006A j.j..r....F..V..F¯.VýÔ...F¯.á^ & 000140
 B4468002 6A37FF26 0277FF26 805EC4A8 76FFAA76 FF0081E9 03750247 082607B8 ..&.G.u.Ô...v .v á^¯&.w.&.7j..FÇ 000160
 DF9A9E76 FFA076FF A876FFAA 76FF0017 E9037500 0030A646 89000007 409A5016 .P.M....Fl=..u.Ô...v .v .v..v..Ô 000180
 260277FF 26805EC4 50168446 80005868 1EAC76FF AE76FF00 5AE9A646 88000009 ....FlÕZ..vÛ.v¯.hX..FÇ.Pá^¯&.w.& 0001A0
 F99A9E76 FFA076FF A876FFAA 76FF0017 E9037500 0030A646 890000FF FF9A37FF .7......Fl=..u.Ô...v .v .v..v..• 0001C0
 00008800 00FFFF9A 9E76FFA0 76FFA876 FFAA76FF FF6CE900 1AE9A646 88000009 ....FlÕ..Ôl..v .v .v..v......|.. 0001E0

Dump of file SATURN:[PCCOMMON.DUMP.DLL]DAIMDF.TMP;1 on 18-APR-1990 10:41:20.28
File ID (570,8,0)    End of file block 71 / Allocated 72

Virtual block number 9 (00000009), 512 (0200) bytes

 5EC400CE 07C72606 5EC4D88E 08A0881E 56570000 5AC80006 CAC95F5E 1F0000E9 Ô...^_èò..àZ..WV.|...Áá^.&ú.ö.á^ 000000
 06E90375 000030AA 46890000 08809A50 16FC468D 1476FF16 76FF0004 07C7260E .&ú....v..v..F=.P.¯....F =..u.Ô. 000020
 E9037500 0030AA46 89000006 1F9A5016 A6468014 76FF1676 FF0184E9 AA468800 ..F ÔÇ..v..v..Fl.P......F =..u.Ô 000040
 03750000 3DAA4689 000008D1 9A5016AC 468D1476 FF1676FF 0193E9AA 46880006 ...F¯Ô...v..v..F¯.P.i....F =..u. 000060
 80000007 319A5016 80468048 6A005A36 FFFC76FF FE76FF01 72E9AA46 880006E9 Ô...F Ôr..vt.v=.6Z.jK.F¯.P.1.... 000080
 9636FF26 1986068E 006A006A 010FE903 7500003D 04C48307 72003A9A 50168046 F¯.P.:.r..á.=..u.Ô..j.j.....&.6. 0000A0
 520798BA 020088AC 76FFAE76 FF000007 A09A5052 0AD08A02 00880196 68216A03 .jlh..|..¤l.RP......vÛ.v¯|..¤..R 0000C0
 08459A0A 76FF0C76 FF019668 AA76FF00 1AE90375 00003DAA 46890000 07859A50 P.ç....F =..u.Ô...v h...v..v..E. 0000E0
 FFFF9A00 6A5016B0 46805016 A6468DAC 76FFAE76 FF0088E9 00F3E9AA 46880000 ...F Ôµ.Ô|..vÛ.v¯.Fl.P.F¯.Pj.... 000100
 76FF0196 68AA76FF 0000087B 9AAC76FF AE76FF00 22E90375 00003DAA 46890000 ...F =..u.Ô"..vÛ.v¯.(....v h...v 000120
 76FF5016 80468000 58681EFC 76FFFE76 FF00ACE9 AA468800 00088C9A 0A76FF0C ..v.......F Ô¯..vt.v=.hX..F¯.P.v 000140
 FF000008 109AAC76 FFAE76FF 0022E903 7500003D AA468900 0009C39A A676FFA8 ´.vl.ú....F =..u.Ô"..vÛ.v¯...... 000160
 00082F9A AC76FFAE 76FF0065 E9AA468B 00000889 9A0A76FF 0C76FF01 9668AA76 v h...v..v..¿....F Ôe..vÛ.v¯./.. 000180
 AA468800 0007D39A 0A76FF0C 76FF0196 68AA76FF 0017E903 7500003D AA468900 ..F =..u.Ô...v h...v..v..Æ....F  0001A0
 681476FF 1676FF00 U00BE39A 00A06814 76FF1676 FF000307 C7260E5E C40038E9 Ô8.á^.&ú....v..v.h...Ð....v..v.h 0001C0
 CAC95F5E 1F0000E9 AA468800 0008629A 009F6814 76FF1676 FF00000B F19A00A1 À..þ....v..v.h...b....F Ô...^_èò 0001E0
```

Dump of file SATURN:[PCCOMMON.DUMP.DLL]DAINDF.TMP;1 on 18-APR-1990 10:41:20.28
File ID (570,8,0) End of file block 71 / Allocated 72

Virtual block number 10 (0000000A), 512 (0200) bytes

```
FF078926 12468806 5EC40004 07C7260E 5EC4D88E 0A12881E 56570000 02C80012 ..à...WV.¡...Aá^.&ú...á^..F.&... 000000
1121999A 1476FF16 76FFA5F2 00088907 16FC8800 588E16EC 83026A0A 76FF0C76 v..v.j..$./X..•..¿..·E.v..v...!. 000020
1676FF00 0107C726 0E5EC400 38E9FE46 880006E9 03750000 30FE4689 20C48304 ..á .F±=..u.Ö...F±Ö8.á^.&ú....v. 000040
681476FF 1676FF00 000C839A 00A16814 76FF1676 FF00000C 759A00A0 681476FF .v.h...u....v..v.hÀ.......v..v.h 000060
D88E0C0A B81E5657 00000EC8 0012CAC9 5F5E1F00 00E9FE46 88000008 D59A009F ...f....F±Ö...^_èò..à...WV.¡...À 000080
16EC8302 6A5016F2 46800A76 FF0C76FF 000207C7 260E5EC4 00CE07C7 26065EC4 á^.&ú.ö.á^.&ú...v..v..F·.Pj..&. 0000A0
00003DF6 468924C4 830C3F1F E79A1476 FF1676FF A5F20008 890716FC 880058BE ƒX..•..¿..·E.v..v..Ö.?..á$.F-=.. 0000C0
003DF646 8900000A 749A5016 F8468014 76FF1676 FF013CE9 F6468800 06E90375 u.Ö...F-Ö<..v..v..F½.P.t....F-=. 0000E0
30F64689 00000A32 9A5016FC 46801476 FF1676FF 011BE9F6 46880006 E9037500 .u.Ö...F-Ö...v..v..F•.P.2....F-= 000100
88019668 236A0396 36FF2619 86068E00 6A006A00 FAE9F646 880006E9 03750000 ..u.Ö...F-Ö•.j.j.....&.6..j#h..¡ 000120
8900000A E29A5052 0ACA8A02 0088F876 FFFA76FF 00000ACF 9A505200 568A0200 ..¤V.RP.ü....v•.v½¡..¤ò.RP.ã.... 000140
A6E9F646 88000000 B89A0A76 FF0C76FF 019668F6 76FF001A E9037500 003DF646 F-=..u.Ö...v-h...v..v..¡....F-Ö! 000160
0022E903 7500003D F6468900 00FFFF9A F276FFF4 76FFF876 FFFA76FF 006BE900 .Ök..v•.v½.v¶.v·......F-=..u.Ö". 000180
E9F6468B 000000E5 9A0A76FF 0C76FF01 9668F676 FF00000B 349AF876 FFFA76FF .v•.v½.4....v-h...v..v..!....F-Ö 0001A0
76FF0196 68F676FF 0017E903 7500003D F6468900 00089D9A F876FFFA 76FF0065 e..v•.v½......F-=..u.Ö...v-h...v 0001C0
00A06814 76FF1676 FF000107 C7260E5E C40038E9 F6468800 000AFE9A 0A76FF0C ..v..±....F-Ö8.á^.&ú....v..v.h.. 0001E0
```

Dump of file SATURN:[PCCOMMON.DUMP.DLL]DAINDF.TMP;1 on 18-APR-1990 10:41:20.28
File ID (570,8,0) End of file block 71 / Allocated 72

Virtual block number 11 (0000000B), 512 (0200) bytes

```
000C679A 009F6814 76FF1676 FF00000E 1D9A00A1 681476FF 1676FF00 000E0F9A ......v..v.hÀ.......v..v.h...g.. 000000
0876FF0A 76FFD88E 0C9C881E 56570000 62C80012 CAC95F5E 1F0000E9 F6468800 ..F-Ö...^_èò..àb..WV.¡...Ä.v..v. 000020
76FF0A76 FF013EE9 A2468800 06E90375 00003DA2 46890000 0D189A50 16F8468D .F½.P......FÀ=..u.Ö...FÀÖ>..v..v 000040
FFA676FF 011DE9A2 46880006 E9037500 003DA246 8900000C F79A5016 A4468008 ..FÊ.P.%....FÀ=..u.Ö...FÀÖ...v!. 000060
A676FF00 FCE9A246 880006E9 03750000 3DA24689 000008F2 9A50169E 4680A476 vÊ.F..P.·....FÀ=..u.Ö...FÀÖ•..v! 000080
0006E903 7500003D A2468900 0009189A 5016FC46 80136A9E 76FFA076 FFA476FF .vÊ.v..v.j..F•.P......FÀ=..u.Ö.. 0000A0
88000009 459A0C A 006A4B6A 006A0143 68000368 F876FFFA 76FF0003 E9A2468B .FÀÖ£..v•.v½h£.hC.j.jKj.j..E.... 0000C0
81E90375 02470B25 078B26A8 5EC404A8 46830004 E9AA5689 A84689FE 568BFC46 F•.V±.F´.V´Ö...F´.á^´&..&.G.u.Ö. 0000E0
A2468900 0009839A 5016AC46 80026A37 FF260277 FF26A85E C4A476FF A676FF00 ..v!.vÊá^´&.w.&.7j..F˜.P......FÀ 000100
FF005AE9 A2468800 000F759A FC76FFFE 76FFA476 FFA676FF 0017E903 7500003D =..u.Ö...v!.vÊ.v±.v•.u....FÀÖZ.. 000120
A2468900 0008659A 37FF2602 77FF26A8 5EC45016 AC468D00 6E681EF8 76FFFA76 v•.v½.hn..F˜.Pá^´&.w.&.7.e....FÀ 000140
E9001AE9 A2468800 000F8F9A FC76FFFE 76FFA476 FFA676FF 0017E903 7500003D =..u.Ö...v!.vÊ.v±.v•......FÀÖ..Ö 000160
0006CAC9 5F5E1F00 00E90000 88000009 9F9AFC76 FFFE76FF A476FFA6 76FFFF6C !..v!.vÊ.v±.v•.....¡..Ö...^_èò.. 000180
FF1676FF 000407C7 260E5EC4 000307C7 26065EC4 D88E0E36 B81E5657 00005EC8 à^..WV.¡6..Aá^.&ú.£.á^.&ú...v.. 0001A0
1676FF01 C1E9A246 880006E9 03750000 3DA24689 00000E46 9A5016FC 46801476 v..F•.P.F....FÀ=..u.Ö...FÀÖè..v. 0001C0
76FF01A0 E9A2468B 0006E903 7500003D A2468900 000A539A 5016F846 8D1476FF .v..F½.P.S....FÀ=..u.Ö...FÀÖ...v 0001E0
```

Dump of file SATURN:[PCCOMMON.DUMP.DLL]DAINDF.TMP;1 on 18-APR-1990 10:41:20.28
File ID (570,8,0) End of file block 71 / Allocated 72

Virtual block number 12 (0000000C), 512 (0200) bytes

```
FF017FE9 A246880^ 06E90375 00003DA2 46890000 0E679A50 16F0468D 1476FF16 ..v..FÞ.P.g....FÀ=..u.Ö...FÀÖ... 000000
830AA700 3A9A5016 A4468D00 000A9B9A 5016A446 8D486A00 7036FFFC 76FFFE76 v±.v•.6þ.jK.FÊ.P......FÊ.P.:.Ì.. 000020
8A02008B 01966824 6A039636 FF261986 068E006A 006A011C E9037500 003D04C4 á.=..u.Ö..j.j.....&.6..j$h..¡..¤ 000040
3DA24689 0000005B 9A505200 43BA0200 8BF076FF F276FF00 0000489A 50521073 ß.RP.H....v·.vÞ¡..¤C.RP.[....FÀ= 000060
C5E90100 E9A2468B 000010E8 9A0A76FF 0C76FF01 9668A276 FF001AE9 03750000 ..u.Ö...vÀh...v..v..Ö....FÀÖ..Öé 000080
006A5016 F4468D50 16A4468D 5016F846 8D006A00 6A006A00 6AF076FF F276FF00 ..v·.vÞj.j.j.j..F½.P.FÊ.P.F¶.Pj. 0000A0
9668A276 FF000011 1E9AF076 FFF276FF 0022E903 7500003D A2468900 00FFFF9A ......FÀ=..u.Ö"..v·.vÞ......vÀh. 0000C0
16A4468D 006E681E FC76FFFE 76FF00AC E9A2468B 0000112F 9A0A76FF 0C76FF01 ..v..v../....FÀÖ¯..v±.v•.hn..FÊ. 0000E0
00A79AF0 76FFF276 FF0022E9 03750000 3DA24689 00000F59 9AF876FF FA76FF50 P.v•.v½.Y....FÀ=..u.Ö"..v·.vÞ.Ì. 000100
9AF076FF F276FF00 65E9A246 88000011 5C9A0A76 FF0C76FF 019668A2 76FF0000 ...vÀh...v..v..\....FÀÖe..v·.vÞ. 000120
00000077 9A0A76FF 0C76FF01 9668A276 FF0017E9 03750000 3DA24689 00000DC9 è....FÀ=..u.Ö...vÀh...v..v..w... 000140
FF1676FF 00001186 9A00A068 1476FF16 76FF0003 07C7260E 5EC40038 E9A2468B .FÀÖ8.á^.&ú....v..v.h........v.. 000160
5E1F0000 E9A2468B 00000E01 9A009F68 1476FF16 76FF0000 11949A00 A1681476 v.hÀ.......v..v.h........FÀÖ...^ 000180
2612468B 065EC400 0407C726 0E5EC4D8 8E0FA888 1E565700 0002C800 12CAC95F _èò..à...WV.¡´..Aá^.&ú...á^..F.& 0001A0
9A1476FF 1676FFA5 F20008B9 0716FC8B 006EBE16 EC83056A 0A76FF0C 76FF0789 ¯..v..v.j..$./n..•..¿..·E.v..v.. 0001C0
000107C7 260E5EC4 0038E9FE 46880006 E9037500 003DFE46 8920C483 0CD52199 .!!..á .F±=..u.Ö...F±Ö8.á^.&ú... 0001E0
```

Dump of file SATURN:[PCCOMMON.DUMP.DLL]DAIMDF.TMP;1 on 18-APR-1990 10:41:20.28
File ID (570,8,0)   End of file block 71 / Allocated 72

Virtual block nur er 13 (0000000D), 512 (0200) bytes

```
FF1676FF 00001226 9A00A168 1476FF16 76FF0000 12189A00 A0681476 FF1676FF .v..v.h........v..v.hÀ..&....v.. 000000
AD881E56 57000614 C80012CA C95F5E1F 0000E9FE 46880000 11789A00 9F681476 v.h...x....F±Ò...^_èò..à...WV.¡Ù 000020
46800A76 FF0C76FF 000307C7 26065EC4 000207C7 260E5EC4 0000FA46 C7D88E11 ..ÄúF*..á^.&ú...á^.&ú.&..v..v..F 000040
8311E21F E79A1476 FF1676FF A5F2000B B90716FC 88006E8E 16EC8305 6A5016F2 ·.Pj..š./n..=..¿...È.v..v..Ó.ã.. 000060
0A9A5016 EE468014 76FF1676 FF0181E9 EC468800 06E90375 000030EC 468924C4 á$.F$=..u.Ò...FšÒÝ..v..v..FÝ.P.. 000080
9A5016F6 46801476 FF1676FF 0190E9EC 46880006 E9037500 0030EC46 89000010 ....F$=..u.Ò...FšÒ...v..v..F-.P. 0000A0
76FFF476 FFEE76FF F076FF01 6FE9EC46 880006E9 03750000 30EC4689 00000FC8 à....F$=..u.Ò...FšÒo..vÞ.vÝ.v¶.v 0000C0
7E830146 E9EC4688 0006E903 75000030 EC468900 00FFFF9A 5016FC46 80086AF2 ·j..F•.P......F$=..u.Ò...FšÒF..~ 0000E0
068E006A 006A0001 FA46C700 05E90377 00FC7E83 0009E903 7E0013E9 037D00FE ±.).Ò..~.Ò...~•.w.Ò..úF*..j.j.... 000100
88EE76FF F076FF00 0010659A 50521343 8A020088 01966826 6A039636 FF261986 ..&.6..j&h..¡..¤C.RP.e....vÞ.vÝ¡ 000120
0C76FF01 9668EC76 FF001AE9 03750000 30EC4689 00001078 9A505210 608A0200 ..¤'.RP.x....F$=..u.Ò...všh...v. 000140
FFFF9AF2 76FFF476 FFEE76FF F076FF00 68E90006 E9EC4688 000013A5 9A0A76FF .v..È....FšÒ•.Òk..vÞ.vÝ.v¶.v·... 000160
76FF0196 68EC76FF 00001007 9AEE76FF F076FF00 22E90375 000030EC 46890000 ...F$=..u.Ò"..vÞ.vÝ.•....všh...v 000180
000030EC 46890000 11409AEE 76FFF076 FF0095E9 EC468800 0010949A 0A76FF0C ..v.......FšÒ...vÞ.vÝ.ã....F$=.. 0001A0
260E5EC4 0068E9EC 46880000 13649A0A 76FF0C76 FF019668 EC76FF00 17E90375 u.Ò...všh...v..v..d....FšÒh.á^.& 0001C0
0000140A 9A00A168 1476FF16 76FF0000 13FC9A00 A0681476 FF1676FF 000107C7 ú....v..v.h...•....v..v.hÀ...... 0001E0
```

Dump of file SATURN:[PCCOMMON.DUMP.DLL]DAIMDF.TMP;1 on 18-APR-1990 10:41:20.28
File ID (570,8,0)   End of file block 71 / Allocated 72

Virtual block number 14 (0000000E), 512 (0200) bytes

```
000568F6 76FFF876 FF0027E9 037401FA 7E830000 120A9A00 9F681476 FF1676FF .v..v.h........-*.t.Ò'..v½.v-hí. 000000
4688127D 0E2E9A00 D5681476 FF1676FF 00000E08 9A006A00 6A006A00 6A016E68 hn.j.j.j.j..Ù....v..v.hí....)..F 000020
F8468008 76FF0A76 FFD88E12 3FB81E56 57000062 C80012CA C95F5E1F 0000E9EC šÒ...^_èò..àb..WV.¡?..Á.v..v..F½ 000040
46800876 FF0A76FF 013EE9F2 46880006 E9037500 0030F246 89000012 C09A5016 .P.à....F·=..u.Ò...F·Ò>..v..v..F 000060
80F476FF F676FF01 10E9F246 880006E9 03750000 30F24689 0000129F 9A5016F4 ¶.P......F·=..u.Ò...F·Ò...v-.v¶. 000080
F476FFF6 76FF00FC E9F24688 0006E903 75000030 F2468900 000E889A 50169E46 F..P......F·=..u.Ò...F·Ò•..v-.v¶ 0000A0
F2468800 06E90375 000030F2 46890000 0E819A50 16FC468D 176A9E76 FFA076FF .v..v.j..F•.P.Ý....F·=..u.Ò...F· 0000C0
88FC4688 0000142C 9A006A00 6A486A00 6A014368 000868F8 76FFFA76 FF0003E9 Ò&..v*.v½hÄ.hC.j.jKj.j..,....F•. 0000E0
76FF0081 E9037502 47082607 8826A25E C404A246 830004E9 A45689A2 4689FE56 V±.FÅ.VÈÒ...FÅ.á^Å&..&.G.u.Ò...v 000100
000030F2 46890000 0F199A50 16A6468D 026A37FF 260277FF 26A25EC4 F476FFF6 -.v¶á^Å&.w.&.7j..FÌ.P......F·=.. 000120
FFFA76FF 005AE9F2 46880000 15929AFC 76FFFE76 FFF476FF F676FF00 17E90375 u.Ò...v-.v¶.v±.v•......F·ÒZ..v*. 000140
000030F2 46890000 11089A37 FF260277 FF26A25E C45016A6 46800084 681EF876 v½.h...FÌ.Pá^Å&.w.&.7......F·=.. 000160
FFFF6CE9 001AE9F2 46880000 15AC9AFC 76FFFE76 FFF476FF F676FF00 17E90375 u.Ò...v-.v¶.v±.v•.¯....F·Ò..Òl.. 000180
005EC800 06CAC95F 5E1F0000 E9000088 00000F35 9AFC76FF FE76FFF4 76FFF676 v-.v¶.v±.v•.5...¡..Ò...^_èò..à^. 0001A0
8D1476FF 1676FF00 0407C726 0E5EC400 D807C726 065EC4D8 8E1453B8 1E565700 .WV.¡S..Aá^.&ú.Á.á^.&ú....v..v.. 0001C0
1476FF16 76FF01C5 E9F24688 0006E903 75000030 F2468900 0014639A 5016FC46 F•.P.c....F·=..u.Ò...F·Òé..v..v. 0001E0
```

Dump of file SATURN:[PCCOMMON.DUMP.DLL]DAIMDF.TMP;1 on 18-APR-1990 10:41:20.28
File ID (570,8,0)   End of file block 71 / Allocated 72

Virtual block number 15 (0000000F), 512 (0200) bytes

```
76FF1676 FF01A4E9 F2468800 06E90375 000030F2 46890000 14849A50 14F4468D .F¶.P......F·=..u.Ò...F·ÒÈ..v..v 000000
FFFE76FF 0183E9F2 46880006 E9037500 0030F246 8900000F E99A5016 EE4 8014 ..FÝ.P.Ò....F·=..u.Ò...F·Ò...v±. 000020
3D04C483 1030003A 9A5016A2 46800000 10319A50 16A2468D 486A0086 36Fr C76 v•.6..jK.FÅ.P.1....FÅ.P.:.=..6.= 000040
5216908A 02008801 9668276A 039636FF 26198606 8E006A00 6A0120E9 03750000 ..u.Ò .j.j.....&.6..j'h..¡..¤..R 000060
7500003D F2468900 0013489A 50521330 8A020088 F476FFF6 76FF0000 13359A50 P.5....v-.v¶¡..¤0.RP.H....F·=..u 000080
76FF00C9 E90104E9 F2468800 0016FE9A 0A76FF0C 76FF0196 68F276FF 001AE903 .Ò...v·h...v..v..±....F·Ò..Òè..v 0000A0
0030F246 890000FF FF9A006A 5016A246 805016F8 4680EE76 FFF076FF F476FFF6 -.v¶.vÞ.vÝ.F½.P.FÅ.Pj.......F·=. 0000C0
13029A0A 76FF0C76 FF019668 F276FF00 0013949A F476FFF6 76FF0022 E9037500 .u.Ò"..v-.v¶......v·h...v..v..@. 0000E0
15769AF8 76FFFA76 FF5016A2 46800084 681EFC76 FFFE76FF 0087E9F2 46880000 ...F·Òñ..v±.v•.h...FÅ.P.v*.v½.v. 000100
76FF0196 68F276FF 0000176C 9AF476FF F676FF00 22E90375 000030F2 46890000 ...F·=..u.Ò"..v-.v¶.(....v·h...v 000120
000030F2 46890000 13869AF4 76FFF676 FF0070E9 F2468800 00177D9A 0A76FF0C ..v..)....F·Òp..v-.v¶.Ñ....F·=.. 000140
0016819A 0A76FF0C 76FF0196 68F276FF 000016ED 9AF476FF F676FF00 22E90375 u.Ò"..v-.v¶.Ù....v·h...v..v..Ý.. 000160
1676FF00 0017A79A 00A06814 76FF1676 FF000307 C7260E5E C40038E9 F2468800 ..F·Ò8.á^.&ú....v..v.h...Ì....v. 000180
1F0000E9 F2468800 0013EE9A 009F6814 76FF1676 FF000017 859A00A1 681476FF .v.hÀ..ç....v..v.h...Ý....F·Ò... 0001A0
12468806 5EC40004 07C7260E 5EC4D88E 15C5881E 56570000 02C80012 CAC95F5E ^_èò..à...WV.¡é..Äá^.&ú...á^..F. 0001C0
1476FF16 76FFA5F2 00088907 16FC8800 848E16EC 83076A0A 76FF0C76 FF078926 &¯...v..v.j..š./...•..¿...È.v..v. 0001E0
```

Dump of file SATURN:[PCCOMMON.DUMP.DLL]DAIMDF.TMP;1 on 18-APR-1990 10:41:20.28
File ID (570,8,0)   End of file block 71 / Allocated 72

Virtual block number 16 (00000010), 512 (0200) bytes

```
0107C726 0E5EC400 38E9FE46 880006E9 03750000 30FE4689 20C48314 3C21999A ..!<..á .F±=..u.Ô...F±ÔB.á^.&ú.. 000000
1676FF00 0018479A 00A16814 76FF1676 FF000018 399A00A0 681476FF 1676FF00 ..v..v.h...9....v..v.hÀ..G....v. 000020
881E5657 000014L3 0012CAC9 5F5E1F00 00E9FE46 88000017 999A009F 681476FF .v.h........F±Ô...^_èò..à...WV.¡ 000040
8D0A76FF 0C76FF00 D807C726 065EC400 0207C726 0E5EC400 00FA46C7 D88E17CE ö..ÄúF*..á^.&ú...á^.&ú.Ä..v..v.. 000060
18031FE7 9A1476Fr 1676FFA5 F2000889 0716FC88 0084BE16 EC83076A 5016F246 F·.Pj..š.ƒ...•..¿..·Ê.v..v..Ó... 000080
9A5016EE 46801476 FF1676FF 01AEE9EC 46880006 E9037500 0030EC46 8924C483 .á$.F§=..u.Ô...F§ÔÙ..v..v..FŸ.P. 0000A0
5016F646 8D1476FF 1676FF01 8DE9EC46 880006E9 03750000 30EC4689 00001606 .....F§=..u.Ô...F§Ô...v..v..F-.P 0000C0
FFF476FF EE76FFF0 76FF016C E9EC4688 0006E903 75000030 EC468900 0015E59A .Ì....F§=..u.Ô...F§Ôl..vÞ.vŸ.v¶. 0000E0
830143E9 EC468800 06E90375 000030EC 46890000 12E99A50 16FC4680 136AF276 v·j..F•.P.Ô....F§=..u.Ô...F§ÔC.. 000100
8E006A00 6A0001FA 46C70005 E9037700 FC7E8300 09E9037E 0013E903 7D00FE7E ~±.).Ô..-.Ô...-•.w.Ô..úF*..j.j.. 000120
EE76FFF0 76FF0000 16829A50 521964BA 02008801 9668296A 039636FF 26198606 ...&.6..j)h..¦..¤d.RP......vÞ.vŸ 000140
76FF0196 68EC76FF 0017E903 75000030 EC468900 0016959A 5052167D 8A020088 ¦..¤).RP......F§=..u.Ô...všh...v 000160
0000FFFF 9AF276FF F476FFEE 76FFF076 FF0003E9 EC468800 0019C39A 0A76FF0C ..v..ù....F§Ô&..vÞ.vŸ.v¶.v...... 000180
FF0C76FF 019668EC 76FF0000 17349AEE 76FFF076 FF0022E9 03750000 30EC4689 .F§=..u.Ô"..vÞ.vŸ.4....v±h...v.. 0001A0
03750000 30EC4689 00001756 9AEE76FF F076FF00 95E9EC46 88000019 F09A0A76 v..Þ....F§Ò...vÞ.vŸ.V....F§=..u. 0001C0
07C7260E 5EC40068 E9EC4688 00001745 9A0A76FF 0C76FF01 9668EC76 FF0017E9 Ô...všh...v..v..E....F§Ôh.á^.&ú. 0001E0
```

Dump of file SATURN:[PCCOMMON.DUMP.DLL]DAIMDF.TMP;1 on 18-APR-1990 10:41:20.28
File ID (570,8,0)   End of file block 71 / Allocated 72

Virtual block number 17 (00000011), 512 (0200) bytes

```
76FF0000 1A289A00 A1681476 FF1676FF 00001828 9A00A068 1476FF16 76FF0001 ...v..v.h...+....v..v.hÀ..(....v 000000
6E6800DA 68F676FF F876FF00 27E90374 01FA7E83 00001A0C 9A009F68 1476FF16 ..v.h........-*.t.Ô'..v½.v-hÖ.hn 000020
E9EC4688 189E144B 9A000A68 1476FF16 76FF0000 14F89A00 6A006A00 6A006A01 .j.j.j.j..½....v..v.hö..K....F§Ô 000040
5016AC46 800876FF 0A76FF08 8E186088 1E565700 0062C800 12CAC95F 5E1F0000 ...^_èò..áb..WV.¡'..Á.v..v..F¯.P 000060
16A84680 0876FF0A 76FF013E E9A24688 0006E903 75000030 A2468900 0018E19A .Ä..¯.FÅ=..u.Ô...FÅÔ>..v..v..F´. 000080
9E4680A8 76FFAA76 FF011DE9 A2468800 06E90375 000030A2 46890000 18C09A50 P.à....FÅ=..u.Ô...FÅÔ...v´.v´.F. 0000A0
76FFA876 FFAA76FF 00FCE9A2 46880006 E9037500 003DA246 89000014 A59A5016 .P.E....FÅ=..u.Ô...FÅÔ=..v´.v´.v 0000C0
D3E9A246 880006E9 03750000 30A24689 000014CE 9A5016FC 4680166A 9E76FFA0 ..v.j..F•.P.ö....FÅ=..u.Ô...FÅÔ& 0000E0
FE5688FC 46880000 1A4A9A00 6A006A48 6A006A01 43680000 68AC76FF AE76FF00 ..vÙ.v¯hÌ.hC.j.jKj.j..J....F•.V± 000100
FFAA76FF 0081E903 75024708 26078826 A45EC404 A4468300 04E9A656 89A44689 .FÊ.VÌÔ...FÊ.á^Ê&..&.G.u.Ô...v´. 000120
03750000 30A24689 00001536 9A501680 4680026A 37FF2602 77FF26A4 5EC4A876 v´á^Ê&.w.&.7j..F¯.P.6....FÅ=..u. 000140
AC76FFAE 76FF005A E9A24688 00001880 9AFC76FF FE76FFA8 76FFAA76 F.0017E9 Ô...v´.v´.v±.v=.¯....FÅÔZ..vÙ.v¯ 000160
03750000 30A24689 0000171E 9A37FF26 0277FF26 A45EC450 16804680 00??681E .h...F¯.Pá^Ê&.w.&.7......FÅ=..u. 000180
AA76FFFF 6CE9001A E9A24688 00001BCA 9AFC76FF FE76FFA8 76FFAA76 FF0L17E9 Ô...v´.v´.v±.v=.ò....FÅÔ..Ôl..v´ 0001A0
5700005A C80006CA C95F5E1F 0000E900 00880000 15529AFC 76FFFE76 FFAB76FF .v´.v±.v=.R...¦..Ô...^_èò..àZ..W 0001C0
FC4680 14 76FF1676 FF000D07 C726065E C4000407 C7260E5E C4D88E1A 71B81E56 V.¡q..Aá^.&ú...á^.&ú.Ì¯.v..v..F= 0001E0
```

Dump of file SATURN:[PCCOMMON.DUMP.DLL]DAIMDF.TMP;1 on 18-APR-1990 10:41:20.28
File ID (570,8,0)   End of file block 71 / Allocated 72

Virtual block number 18 (00000012), 512 (0200) bytes

```
46801476 FF1676FF 0193E9A6 46880006 E9037500 0030A646 8900001A 819A5016 .P......F¦=..u.Ô...F¦Ô...v..v..F 000000
FFFC76FF FE76FF01 72E9A646 880006E9 03750000 30A64689 00001AA2 9A5016A8 ´.P.Å....F¦=..u.Ô...F¦Ôr..v±.v=. 000020
75000030 04C48316 5A003A9A 5016AC46 8D000016 4E9A5016 AC46804B 6A009C36 6..jK.F¯.P.N....F¯.P.:.Z..á.=..u 000040
569A5052 1C8D8A02 00880196 682A6A03 9636FF26 1986068E 006A006A 010FE903 .Ô..j.j.....&.6..j*h..¦..¤..RP.V 000060
1AE90375 000030A6 46890000 19699A50 5219518A 020088A8 76FFAA76 FF000019 ....v´.v´¦..¤Q.RP.i....F¦=..u.Ô. 000080
76FFAA76 FF0088E9 00F3E9A6 46880000 1CF59A0A 76FF0C76 FF019668 A676FF00 ..v¦h...v..v..¥....F¦Ôµ.Ô¦..v´.v 0000A0
AA76FF00 22E90375 000030A6 46890000 FFFF9A00 6A5016AC 46805016 F84680A8 ´.F½.P.F¯.Pj.......F¦=..u.Ô"..v´ 0000C0
FF00ACE9 A6468800 001D3C9A 0A76FF0C 76FF0196 68A676FF 0000102B 9AA876FF .v´.+....v¦h...v..v..<....F¦Ô´.. 0000E0
75000030 A6468900 0018949A F876FFFA 76FF5016 AC468000 9A681EFC 76FFFE76 v±.v=.h...F¯.P.v*.v½......F¦=..u 000100
00001D69 9A0A76FF 0C76FF01 9668A676 FF000019 829AA876 FFAA76FF 0022E903 .Ô"..v´.v´.ý....v¦h...v..v..i... 000120
68A676FF 0017E903 75000030 A6468900 0019049A A876FFAA 76FF0065 E9A6468B .F¦Ôe..v´.v´.å....F¦=..u.Ô...v¦h 000140
76FF1676 FF000307 C7260E5E C40038E9 A6468800 0019859A 0A76FF0C 76FF0196 ...v..v.......F¦ÔB.á^.&ú....v..v 000160
009F6814 76FF1676 FF00001D A19A00A1 681476FF 1676FF00 001D939A 00A06814 .h........v..v.hÀ..À....v..v.h.. 000180
5EC4D88E 18E3881E 56570000 02C80012 CAC95F5E 1F0000E9 A6468800 001A1A9A ......F¦Ô...^_èò..à...WV.¡D..Äá^ 0001A0
83066A0A 76FF0C76 FF000D07 C726065E C4000407 C7260E5E C4078926 12468806 ..F.&..á^.&ú.¯.á^.&ú.Ì..v..v.j.. 0001C0
30FE4689 20C4831A 5A21999A 1476FF16 76FFA5F2 00088907 16FC8800 9A8E16EC &.ƒ...=..¿..·Ê.v..v...!Z..á .F±= 0001E0
```

Dump of file SATURN:[PCCOMMON.DUMP.DLL]DAIMDF.TMP;1 on 18-APR-1990 10:41:20.28
File ID (570,8,0)   End of file block 71 / Allocated 72

Virtual block number 19 (00000013), 512 (0200) bytes

```
209A00A0 681476FF 1676FF00 0107C726 0E5EC400 38E9FE46 880006E9 03750000 ..u.Õ...F±Õ8.á^.&ú....v..v.h...- 000000
8800001D 859A00?F 68'476FF 1676FF00 001E389A 00A16814 76FF1676 FF00001E ....v..v.hÀ..;....v..v.h........ 000020
000207C7 260E5EC4 D88E1DBA 881E5657 00000EC8 0012CAC9 5F5E1F00 0?F9FE46 F±Õ...^_èò..à...WV.¡¤..Äá^.&ú... 000040
0716FC88 009ABE16 EC83066A 5016F846 800A76FF 0C76FF07 89261246 880 5EC4 á^..F.&...v..v..F½.Pj..$./...•.. 000060
46880006 E9037500 003DF246 8924C483 1DF71FE7 9A1476FF 1676FFA5 F200.889 ¿...É.v..v..Õ.%..á$.F.=..u.Õ...F 000080
880006E9 03750000 3DF24689 00001C24 9A5016F4 468D1476 FF1676FF 013CE9F2 ·Õ<..v..v..F¶.P.$....F.=..u.Õ... 0000A0
0006E903 75000030 F2468900 001C039A 5016FC46 8D1476FF 1676FF01 18E9F246 F·Õ...v..v..F•.P......F.=..u.Õ.. 0000C0
50521F0F BA0200B8 0196682C 6A039636 FF261986 068E006A 006A00FA E9F24688 .F·Õ°.j.j.....&.6..j,h..¡..¤..RP 0000E0
03750000 3DF24689 00001C92 9A50521C 7ABA0200 B8F476FF F676FF00 001C7F9A ......v–.v¶|..¤z.RP......F.=..u. 000100
F676FF00 68E900A6 E9F24688 00001F71 9A0A76FF 0C76FF01 9668F276 FF001AE9 Õ...v·h...v..v..q....F·Õl.Õk..v– 000120
9AF476FF F676FF00 22E90375 00003DF2 46890000 FFFF9AF8 76FFFA76 FFF476FF .v¶.v'.v½......F.=..u.Õ"..v–.v¶. 000140
76FFF676 FF0065E9 F2468800 001F9E9A 0A76FF0C 76FF0196 68F276FF 00001CE4 Õ....v·h...v..v.......F·Õe..v–.v 000160
1CAE9A0A 76FF0C76 FF019668 F276FF00 17E90375 00003DF2 46890000 1D409AF4 ¶.H....F.=..u.Õ...v·h...v..v..Ü. 000180
76FF0000 1FC89A00 A0681476 FF1676FF 000107C7 260E5EC4 0038E9F2 46880000 ...F·Õ8.á^.&ú....v..v.h...à....v 0001A0
0000E9F2 46880000 1E1F9A00 9F681476 FF1676FF 00001FD6 9A00A168 1476FF16 ..v.hÀ..•....v..v.h........F·Õ.. 0001C0
019A5016 FC468006 76FF0876 FFD88E1E 54881E56 570000A6 C80012CA C95F5E1F .^_èò..àI..WV.¡T..Ä.v..v..F•.P.Ì 0001E0
```

Dump of file SATURN:[PCCOMMON.DUMP.DLL]DAIMDF.TMP;1 on 18-APR-1990 10:41:20.28
File ID (570,8,0)   End of file block 71 / Allocated 72

Virtual block number 20 (00000014), 512 (0200) bytes

```
2276FF24 76FF0676 FF0876FF 0180E9A6 46880006 E9037500 0030A646 8900001E ....Fl=..u.Õ...FlÕ...v..v..v$.v" 000000
16F6468D 0676FF08 76FF015E E9A6468B 0006E903 75000030 A6468900 0016279A .'....Fl=..u.Õ...FlÕ^..v..v..F-. 000020
0E76FFFC 76FFFE76 FF0130E9 A6468800 06E90375 00003DA6 46890000 1EB09A50 P.¯....Fl=..u.Õ...FlÕ=..v±.v•.v. 000040
006A006A 0023E903 74FFFA7E 83FA4689 00001816 9A006A00 6A006A00 6A016568 he.j.j.j.j.......F°.–°.t.Õ#.j.j. 000060
FF00F5E9 00018800 0020FE9A 2676FF28 76FF0196 68326A03 9636FF26 1986068E ....&.6..j2h...v(.v&.± ..¡..Õ%.. 000080
4680E76 FFFC76FF FE76FF00 001C4B9A 5016FF5A 8680486A 0C76FFFC 76FFFE76 v±.v•.v.jK..Z..P.K....v±.v•.v..F 0000A0
00003D08 C4831C57 00109A50 16FF5A86 805016AA 46800000 03AF9A4B 6A5016AA ˆ.PjK.€....Fˆ.P..Z..P...W..á.=.. 0000C0
1F019A26 76FF2876 FF019668 336A0396 36FF2619 86068E00 6A006A00 23E90375 u.Õ#.j.j.....&.6..j3h...v(.v&... 0000E0
46C7003E E90013A8 46C70046 E90018A8 46C7002B E920468B 008CE900 01880000 ..¡..Õ...F Õ+.úF´..ÕF.úF´..Õ>.úF 000100
CDE90375 00023D00 23E90026 E90000A8 46C7002E E90017A8 46C70036 E90016A8 ´..Õ6.úF´..Õ..úF´..Õ&.Õ#.=..u.Õë 000120
FFF876FF FFD2E9FF CDE90375 00073DFF CDE90375 00063DFF CDE90375 00053DFF .=..u.Õë.=..u.Õë.=..u.Õe.Õ@..v½. 000140
A6468900 00FFFF9A 2276FF24 76FF006A 006AA876 FF5016FF 5A868020 76FFF676 v–.v ..Z..P.vˆj.j..v$.v"......Fl 000160
1E565700 0242C8CB C95F5E1F 0000E9A6 46880006 E9A6468B 0006E903 75000030 =..u.Õ...FlÕ...FlÕ...^_èùàB..WV. 000180
07E90375 000030FE 0A868900 001FFF9A 5016F646 8D0676FF 0876FF08 8E1FEF88 ¡ÿ..À.v..v..F–.P........±=..u.Õ. 0001A0
75000030 FE0A8689 00002021 9A5016FC 46800676 FF0876FF 02FEE9FE 0A868800 ....±Õ±..v..v..F•.P.l .....±=..u 0001C0
FE0A8689 00002042 9A5016FE 5A868006 76FF0876 FF020BE9 FE0A8688 0007E903 .Õ.....±ÕÜ..v..v...Z±.P.B .....± 0001E0
```

Dump of file SATURN:[PCCOMMON.DUMP.DLL]DAIMDF.TMP;1 on 18-APR-1990 10:41:20.28
File ID (570,8,0)   End of file block 71 / Allocated 72

Virtual block number 21 (00000015), 512 (0200) bytes

```
6A006A00 6A016568 0E76FFF6 76FFF876 FF02B7E9 FE0A8688 0007E903 75000030 =..u.Õ.....±Õñ..v½.v–.v.he.j.j.j 000000
FF261986 068E006A 006A0023 E90374FF FE5EBE83 FE5E8689 0000206C 9A006A00 .j..l ....^±./^±.t.Õ#.j.j.....&. 000020
FFF676FF F876FF02 6DE90001 B8000020 959A2276 FF2476FF 01966832 6A039636 6..j2h...v$.v".. ..¡..Õm..v½.v–. 000040
486A5016 FE0E868D 0E76FFF6 76FFF876 FF000020 819A5016 FD8E868D 486A0C76 v.jK../».P.Ý ...v½.v–.v....±.PjK 000060
06E90374 00003008 C4832008 00109A50 16FD8E86 805016FE 0E868000 0020C69A .6 .....±.P../».P...À .á.=..t.Õ. 000080
13FE0C86 C7005FE9 0002FA46 C70018FE 0C86C700 4AE92046 88021FE9 00008800 .¡..Õ...F ÕJ.ú..±..úF°..Õ_.ú..±. 0000A0
FA46C700 17FE0C86 C70043E9 0002FA46 C70016FE 0C86C700 51E90002 FA46C700 .úF°..ÕQ.ú..±..úF°..ÕC.ú..±..úF° 0000C0
3DFFAEE9 03750002 3D0023E9 0026E9FA 46892046 880000FE 0C86C700 35E90002 ..Õ5.ú..±...F .F°Õ&.Õ#.=..u.ÕÜ.= 0000E0
86FFFE5C 86FFFFCB E9FFC0E9 03750007 3DFFBAE9 03750006 3DFFB4E9 03750005 ..u.ÕÇ.=..u.Õ¤.=..u.Õà.Õù..Ñ\±.Ñ 000100
0A868900 0023B79A 5016FC46 8D006A00 6AFE0C86 FF5016FD BE868020 76FFFE5A Z±.v ../».P.Ñ.±j.j..F•.P.ñ#..... 000120
8E006A00 6A0030E9 0375FE46 08FC4688 0176E9FE 0A868800 07E90375 00003DFE ±=..u.Õ.....±Õv..F•.F±u.Õ=.j.j.. 000140
86805016 FD8E8680 000023F4 9A5016FE 60868001 96682F6A 039636FF 26198606 ...&.6..j/h....'±.P.¶#..../».P.. 000160
FE5AB6FF FE5CB6FF 012EE9FF FFB80CC4 83248400 569A2276 FF2476FF 5016FE60 '±.P.v$.v".V.Ç$.á.¡..Õ...Ñ\±.ÑZ± 000180
3DFE0A86 8900002  799A5016 FC468000 6A006AFE 0CB6FF50 16FE0E86 8D2076FF .v ...±.P.Ñ.±j.j..F•.P.y!.....±= 0001A0
86068E00 6A006A0. A9E90375 FE460BFC 468800F8 E9FE0A86 880007E9 03750000 ..u.Õ.....±Õ½..F•.F±u.Õ`.j.j.... 0001C0
FE5AB6FF FE5CB6FF 0000249B 9A505224 04BA0200 B8019668 316A0396 36FF2619 .&.6..j1h..¡..¤.$RP..$...Ñ\±.ÑZ± 0001E0
```

Dump of file SATURN:[PCCOMMON.DUMP.DLL]DAIMDF.TMP;1 on 18-APR-1990 10:41:20.28
File ID (570,8,0)   End of file block 71 / Allocated 72

Virtual block number 22 (00000016), 512 (0200) bytes

```
00A6E9FE 0A868800 0AE90375 00003DFE 0A868900 001F149A 50521EFC BA0200B8 ¡..ø=.RP........±=..u.Õ.....±Õl. 000000
89000007 F79A5016 FDBE868D FA76FFFC 76FFFE76 FFFE5AB6 FFFE5CB6 FF005CE9 Õ\..Ñ\±.ÑZ±.v±.v=.v°../».P.%.... 000020
FF0067E9 FE0A£688 00001F60 9AFE5AB6 FFFE5CB6 FF0014E9 03750000 3DFE0A86 ..±=..u.Õ...Ñ\±.ÑZ±.'......±Õg.. 000040
E90047E9 FE0A8688 0007E903 7500003D FE0A8689 00001F82 9AFE5AB6 FFFE5CB6 Ñ\±.ÑZ±.........±=..u.Õ.....±ÕG.Õ 000060
80000022 4F9A5016 FE60868D 01966830 6A039636 FF261986 068E006A 006A0030 =.j.j.....&.6..jOh....'±.P.O"... 000080
880007E9 FFFFB80C C4832294 00569A22 76FF2476 FF5016FE 60868050 16FE0E86 ..±.P..'±.P.v$.v".V..".á.¡..Õ... 0000A0
FC468006 76FF0876 FFD88E21 A1881E56 5700000A C8C8C95F 5E1F0000 E9FE0A86 ..±Õ...^_èùà...WV.¡Àl.Ä.v..v..F= 0000C0
46C7007F E90A4688 0140E9F8 46880006 E9037500 003DF846 89000021 F89A5016 .P.%l...F½=..u.Õ...F½Õã..F.Õ..úF 0000E0
FA46C700 17F646C7 00E8E900 05FA46C7 0013F646 C700F5E9 0002FA46 C70018F6 -..úF°..Õ%.úF-..úF°..ÕÒ.úF-..úF° 000100
C700C1E9 0028F646 C7000BFA 46C700CE E90006FA 46C70016 F646C700 DBE90007 ..ÕÙ.úF-..úF°..Õò.úF°..úF-+.Õè.ú 000120
FFFC76FF FE76FF00 A7E90015 FA46C700 33F646C7 0084E900 0AFA46C7 001BF646 F-..úF°..ÕÇ.úF-3.úF°..Õl..v±.v=. 000140
00003D00 83E90086 E90000FA 46C70000 F646C700 C8E90000 1AC39A10 76FF1276 v..v..ú...Õù.úF-..úF°..Õ..Õ..=Ä. 000160
E9037500 743DFFA5 E9037500 713DFFC7 E9037500 6E3D0033 E90376FF 79E90375 u.Õy.v.Õ3.=n.u.Õú.=q.u.ÕE.=t.u.Õ 000180
00D83DFF B0E9FF44 E9037500 CE3DFF9A E9037500 903DFFA2 E9037500 8E3DFF9D ..=..u.ÕÀ.=..u.Õ..=ö.u.ÕO.Õ¯.=Ä. 0001A0
00A3DFF 90E9FF31 E9037500 D53DFF39 E9037500 D33D0013 E90376FF 53E90375 u.ÕS.v.Õ..=Æ.u.Õ9.=(.u.Õ1.Õ..=Õ. 0001C0
FF6DE9FF 35E90375 00EA3DFF 30E90375 00DF3DFF 38E90375 00003DFF 33E90375 u.Õ3.=l.u.Õ8.=Õ.u.ÕO.=õ.u.Õ5.Õm. 0001E0
```

Dump of file SATURN:[PCCOMMON.DUMP.DLL]DAIMDF.TMP;1 on 18-APR-1990 10:41:20.28
File ID (570,8,0)   End of file block 71 / Allocated 72

Virtual block number 23 (00000017), 512 (0200) bytes

```
0023399A 1076FF12 76FF006A 006AF676 FF0C76FF 0E76FFFA 76FFFC76 FFFE76FF .v±.v=.v°.v..v..v-j.j..v..v..9#. 000000
0058C8C8 C95F5E1F 0000E9F8 46880006 E9F84688 0006E903 75000030 F8468900 ..F½=..u.Õ...F½Õ...F½Õ...^_èùàX. 000020
7500003D F6468900 0021B19A 5016F846 8D0676FF 0876FF08 8E240388 1E565700 .WV.¡Æ$.Á.v..v..F½.P.Ÿl...F-=..u 000040
0021D49A 0C76FF0E 76FF0676 FF0876FF 007EE90A 46880138 E9F64688 0006E903 .Õ...F-Õ8..F.Õ-..v..v..v..v..Àl. 000060
89005888 0090E9FE 5E8CFC46 8900D288 00A9E9FE 5E8CFC46 89004288 011EE900 .Õ..¡B..F=.^±Õ`.¡@..F=.^±Õ..¡X.. 000080
0079E9FE 5E8CFC46 890084B8 0085E9FE 5E8CFC46 89006EB8 0091E9FE 5E8CFC46 F=.^±Õ..¡n..F=.^±Õ..¡...F=.^±Õy. 0000A0
89260000 B80C5EC4 0061E9FE 5E8CFC46 890080B8 006DE9FE 5E8CFC46 89009AB8 ¡...F=.^±Õm.¡¯..F=.^±Õa.á^.¡..&. 0000C0
0375006E 3D001BE9 0376FFA6 E9037500 D03D004B E900B7E9 00008807 89260247 G.&..¡..Õñ.ÕK.=Å.u.Õl.v.Õ..=n.u. 0000E0
DA3DFF8A E9037500 D53DFFC2 E9FF7DE9 03750090 3DFF79E9 03750074 3DFF60E9 Õm.=t.u.Õy.=..u.Õ).Õõ.=(.u.Õ..=Õ 000100
FFF876FF FA76FFFF 9FE9FF96 E9037500 EA3DFF92 E9037500 DF3DFF8E E9037500 .u.Õ..=Õ.u.Õ..=õ.u.Õ..Õ...v°.v½. 000120
00030F6 46890000 FFFF9A0C 76FF0E76 FF5016A8 46805016 F4468DFC 76FFFE76 v±.v=.F¶.P.F´.P.v..v......F-=.. 000140
0C76FF0E 76FF0022 E9037402 47082607 88260C5E C40037E9 F6468800 06E90375 u.Õ...F-Õ7.á^.&..&.G.t.Õ"..v..v. 000160
E90000B8 0006E900 09E90EC4 831E8E24 C89A0676 FF0876FF 0A76FF50 16A8468D .F´.P.v..v..v..ù$...á.Õ..Õ..¡..Õ 000180
559A5016 F6468006 76FF0876 FFD88E26 45881E56 57000014 C8C8C95F 5E1F0000 ...^_èùà...WV.¡E&.Ä.v..v..F-.P.U 0001A0
E39A5016 F2468006 76FF0876 FF000005 709A5016 FA468006 76FF0876 FF000026 &...v̄..v..F°.P.p....v..v..F·.P.D 0001C0
880006E9 03750000 3DEC4689 0000FFFF 9A5016EE 468D1A6A 1E6AFA76 FF000024 $...v°j.j..FŸ.P......F$=..u.Õ... 0001E0
```

Dump of file SATURN:[PCCOMMON.DUMP.DLL]DAIMDF.TMP;1 on 18-APR-1990 10:41:20.28
File ID (570,8,0)   End of file block 71 / Allocated 72

Virtual block number 24 (00000018), 512 (0200) bytes

```
FF0876FF 50520('4 05FE5688 FC4688FE 5689FC46 89F05688 EE468800 B8E9EC46 FšÕE..FŸ.VÞ.F=.V±.F=.V±...RP.v.. 000000
76FF08C4 83285ʟ.3 C79A0676 FF0876FF FC76FFFE 76FF08C4 83FFFF0F 4C9A0676 v..L....á..v±.v=.v..v..ú(V(.á..v 000020
0000FFFF 9AFFFF68 28676806 76FF0876 FF0000FF FF9AEE76 FFF076FF 0676FF08 ..v..vÞ.vŸ......v..v.hg(h....... 000040
FFFF9AFF FF682889 680676FF 0876FF00 00FFFF9A FFFF6828 78680676 FF0876FF .v..v.hx(h........v..v.h.(h..... 000060
9AFFFF68 27916806 76FF0876 FF0000FF FF9AFFFF 68289A68 0676FF08 76FF0000 ...v..v.h.(h........v..v.h.'h... 000080
0000E900 00B80000 FFFF9A03 9636FF26 1986068E 086A0676 FF0876FF 0000FFFF .....v..v.j.....&.6.......¡..Õ.. 0000A0
FFFE5689 FC46890C 56880A46 8B088E27 AF881E56 57000004 C80004CA C95F5E1F .^_èò..à...WV.¡E'.Ä.F..V..F=.V±. 0000C0
76FF0000 29199A00 6A006A00 6AFFFF68 FFFF68FF FF68FFFF 68656A06 76FF0876 v.̄v.jeh..h..h..h..j.j.j...)...v 0000E0
0876FF00 0029389A 006A006A 016AFFFF 6829F468 FFFF6829 00686E6A 0676FF08 ..v.jnh.)h..h¶)h..j.j.j..8)...v. 000100
FF0876FF 00002953 9A006A00 6A006AFF FF68FFFF 68FFFF68 FFFF687A 6A0676FF .v.jzh..h..h..h..j.j.j..S)...v.. 000120
68746A06 76FF0876 FF000029 709A0042 681E016A 006A006A 006A006A 716A0676 v.jqj.j.j.j.j..hB..p)...v..v.jth 000140
6A006A01 2C680676 FF0876FF 0000298E 9A004268 1E016A00 6A006AFF FF68FFFF ..h..j.j.j..hB...)...v..v.h,.j.j 000160
68006A00 6A012D68 0676FF08 76FF0000 29AC9A00 42681E00 6AFFFF68 FFFF6800 .h..h..j..hB..¯)...v..v.h-.j.j.h 000180
FFFF6800 6A006A01 2E680676 FF0876FF 000029CA 9A004268 1E006AFF FF68FFFF ..h..j..hB..ò)...v..v.h..j.j.h.. 0001A0
6A006A00 6A006A00 6A00CE68 0676FF08 76FF0000 29E69A00 42681E00 6AFFFF68 h..j..hB..Ì)...v..v.hö.j.j.j.j.j 0001C0
1E016A00 6A006AFF FF682A16 68000068 0676FF08 76FF0000 2A049A00 58681E01 ..hX...*...v..v.hÅ.h.*h..j.j.j.. 0001E0
```

```
Dump of file SATURN:[PCCOMMON.DUMP.DLL]DAIMDF.TMP;1 on 18-APR-1990 10:41:20.28
File ID (570,8,0)   End of file block 71 / Allocated 72

Virtual block number 25 (00000019), 512 (0200) bytes

 58681E00 6AFFFF68 2A346800 6A006A01 2F680676 FF0876FF 00002A22 9A005868 hX..."*...v..v.h/.j.j.h4*h..j..hX 000000
 9A005868 1E006AFF FF682A52 68006A00 6A013068 0676FF08 76FF0000 2A409A00 ..@*...v..v.h0.j.j.hR*h..j..hX.. 000020
 2A7A9A00 58681E00 6AFFFF68 2A886800 6A006A01 31680676 FF0876FF 00002A5E ^*...v..v.h1.j.j.h.*h..j..hX..z* 000040
 76FF0000 2A989A00 6E681E01 6A006A00 6A006A00 6A000368 0676FF08 76FF0000 ...v..v.h£.j.j.j.j.j..hn...*...v 000060
 FF0876FF 00002AB6 9A006E68 1E016A00 6A006AFF FF682AAA 68000568 0676FF08 ..v.hf.h¯*h..j.j.j..hn..Ñ*...v.. 000080
 0676FF08 76FF0000 2AD49A00 6E681E00 6AFFFF68 2AC86800 6A006A01 32680676 v.h2.j.j.hà*h..j..hn..å*...v..v. 0000A0
 34680676 FF0876FF 00002AF2 9A006E68 1E006AFF FF682AE6 68006A00 6A013368 h3.j.j.hl*h..j..hn..·*...v..v.h4 0000C0
 6A000868 0676FF08 76FF0000 2B0E9A00 6E681E00 6AFFFF68 2B1C6800 6A006A01 .j.j.h.+h..j..hn...+...v..v.hÄ.j 0000E0
 FF682B3E 68000A68 0676FF08 76FF0000 2B2C9A00 84681E01 6A006A00 6A006A00 .j.j.j.j..h...,+...v..v.hÖ.h>+h. 000100
 2B5C6800 6A006A01 35680676 FF0876FF 00002B4A 9A008468 1E016A00 6A006AFF .j.j.j..h...J+...v..v.h5.j.j.h\+ 000120
 FF682B7A 68006A00 6A013668 0676FF08 76FF0000 2B689A00 84681E00 6AFFFF68 h..j..h...h+...v..v.h6.j.j.hz+h. 000140
 6AFFFF68 2B806800 6A006A01 37680676 FF0876FF 00002B86 9A008468 1E006AFF .j..h....+...v..v.h7.j.j.h¯+h..j 000160
 9A681E01 6A006A00 6A006A00 6A000068 0676FF08 76FF0000 2BA29A00 84681E00 ..h...Å+...v..v.hï.j.j.j.j.j..h. 000180
 9A009A68 1E016A00 6A006AFF FF682BD2 68000F68 0676FF08 76FF0000 2BC09A00 ..à+...v..v.hÔ.h@+h..j.j.j..h... 0001A0
 FFFF9A00 9A681E01 6AFFFF68 2BF06800 6A006A01 38680676 FF0876FF 00002BDE 8+...v..v.h8.j.j.hÞ+h..j..h..... 0001C0
 00002C1A 9A009A68 1E006AFF FF682B39 68006A00 6A013968 0676FF08 76FF0000 ...v..v.h9.j.j.h9(h..j..h....,.. 0001E0

Dump of file SATURN:[PCCOMMON.DUMP.DLL]DAIMDF.TMP;1 on 18-APR-1990 10:41:20.28
File ID (570,8,0)   End of file block 71 / Allocated 72

Virtual block number 26 (0000001A), 512 (0200) bytes

 5EC40000 2C6E9A00 9A681E00 6AFFFF68 29076800 6A006A01 3A680676 FF0876FF .v..v.h:.j.j.h.)h..j..h...n,..á^ 000000
 078B26FC 5EC40E5F 8C260C47 892600C6 880A5EC4 0A5F8C26 08478926 0080880A .¡¯.&.G.&._.á^.¡ó.&.G.&._.á^=&.. 000020
 006A006A 006A006A 00E86806 76FF0876 FF125789 26104789 260A5EC4 02578826 &.W.á^.&.G¯&.W..v..v.hÒ.j̄.j.j.j. 000040
 FF68FFFF 6800EA68 0676FF08 76FF0000 2C939A50 52000805 0C56880A 4688016A j..F..V....RP.,....v..v.hõ.h..h. 000060
 00E86806 76FF0876 FF00002C 889A5052 0008050C 56880A46 88016A00 6A006AFF .j.j.j..F..V....RP.¡,...v..v.hŠ. 000080
 FF0876FF 00002C00 9A505200 08050C56 880A4688 006AFFFF 68FFFF68 006A006A j.j.h..h..j..F..V....RP.ì,...v.. 0000A0
 0020029A 50520008 050C5688 0A468800 6AFFFF68 FFFF6800 6A006A00 EC680676 v.h$.j.j.h..h..j..F..V....RP..-. 0000C0
 52000805 0C56880A 4688006A FFFF68FF FF68006A 006A00ED 680676FF 0876FF00 ..v..v.hÜ.j.j.h..h..j..F..V....R 0000E0
 2D3C9A00 02681E01 ωA006A00 6A006A00 6A008E68 0676FF08 76FF0000 2D1E9A50 P..-...v..v.h..j.j.j.j.j..h@..<- 000100
 00002D5A 9A000268 1E016A00 6A006AFF FF68FFFF 68009068 0676FF08 76FF0000 ...v..v.h..h..h..j.j.j..h@..Z-.. 000120
 76FF0000 2D789A00 02681E00 6AFFFF68 FFFF6800 6A006A00 91680676 FF0876FF .v..v.h..j.j.h..h..j..h@..x-...v 000140
 FF0876FF 00002D96 9A000268 1E006AFF FF68FFFF 68006A00 6A009268 0676FF08 ..v.h..j.j.h..h..j..h@...-...v.. 000160
 0676FF08 76FF0000 2DB49A00 02681E00 6AFFFF68 FFFF6800 6A006A00 93680676 v.h..j.j.h..h..j..h@..Ç-...v..v. 000180
 9E680676 FF0876FF 00002D02 9A006A00 6A006A00 6A006A20 C56820C2 68009068 h..hò-hé-j.j.j.j.j..@-...v..v.h. 0001A0
 68009C68 0676FF08 76FF0000 2DF09A00 6A006A00 6A006A00 6A2DE368 2DE06800 .hÁ-hD-j.j.j.j.j..Þ-...v..v.h..h 0001C0
 2E1C6800 A0680676 FF0876FF 00002E0E 9A006A00 6A006A00 6A006A2E 01682DFE ±-h..j.j.j.j.j.......v..v.h..h.. 0001E0

Dump of file SATURN:[PCCOMMON.DUMP.DLL]DAIMDF.TMP;1 on 18-APR-1990 10:41:20.28
File ID (570,8,0)   End of file block 71 / Allocated 72

Virtual block number 27 (0000001B), 512 (0200) bytes

 FF68FFFF 6800A168 0676FF08 76FF0000 2E2C9A00 6A006A00 6A006A00 6A2E1F68 h..j.j.j.j.j..,....v..v.hÅ.h..h. 000000
 6A2DA768 2DA46800 9F680676 FF0876FF 00002BFA 9A006A00 6A006A00 6A006AFF .j.j.j.j..*(...v..v.h..hÊ-hÌ-j 000020
 02030000 00012C0E 00020074 90CBC95F 5E1F0000 2BFC9A00 6A006A00 6A006A00 .j.j.j.j..»+...^ èù.t.......... 000040
 010303E5 00082CA5 02020385 000829C1 02050364 00082926 02020154 0006199C ....T...&)..d...ē)......Ē,..Ì.... 000060
 0203006A 0004190A 02031A69 000128B3 00050000 00022825 0002007F 00012224 $".......X(......"+..i.......j... 000080
 01030445 000904EB 02030004 00010353 01030104 000727CF 02030252 0007286D m(..R...ü'..Å...S.......Š...E... 0000A0
 000203EF 00082CEF 0202038F 000829A3 02050087 00012268 01030086 00010685 .......k".......Ē)......ÿ,..ÿ... 0000C0
 02030164 00061F4A 02030000 000523EF 00020370 00082960 02020000 0004238D .#......')..p...ÿ#.......J...d... 0000E0
 02030078 00041B54 02030000 000628CF 00020316 00082E3D 0205020D 00070303 ....Ì...=.......Ü(.......T...x... 000100
 02030013 0001033A 010303FA 00082CCA 02020399 0008202F 02050260 0007288F .(..'.../.......ð,..*...:....... 000120
 02030C02 00012A37 00050000 0001287B 0005037B 00082982 020201E3 0007267D }&..D.....)..(...((......7*...... 000140
 02050385 0008298E 0202009D 00012374 010300F4 0006081E 02030173 00061F30 0...s.......¶...t#......f)...... 000160
 02030A0A 00012A19 00050270 0007287E 02030086 0004243B 020303A5 00082D51 Q-..Ê...;$......-(..p....*...... 000180
 0205038F 000829A0 020202F7 00072281 02030014 000327F0 020301F3 000727DF ð'..g...Þ'......"..%....)...... 0001A0
 00050092 00041AEC 02030311 0001289D 00050101 000610C1 02030380 0008208D .-.. ..ê.......(......š....... 0001C0
 020301FF 000727BF 02030316 00082E3A 02020696 00012910 00050C94 00012A55 U*.......)......:........¢'...... 0001E0
```

Dump of file SATURN:[PCCOMMON.DUMP.DLL]DAIMDF.TMP;1 on 18-APR-1990 10:41:20.28
File ID (570,8,0)   End of file block 71 / Allocated 72

Virtual block number 28 (0000001C), 512 (0200) bytes

```
02030399 0008202C 02020338 000828EB 02050898 000129F7 00050280 000728A0 .(......%)......Š(..8...,-...... 000000
0005010F 00061CCE 02030187 00071D15 020303BB 0008206F 02050022 0003059E ....".o-..E...........ö....... 000020
02030346 00082F F1 020503A5 0008204E 020211A5 00012ACB 00050FA0 00012AAD Ü*......ù*..É...N-..Ë...þ(..F... 000040
020300AB 00041F 0 02030291 0007285C 02030227 0001288C 0005020F 0007004E N........(..'...\(......p..¨... 000060
000503B0 000820BA 02020E2E 00012ABB 00050196 00072756 0203011C 000616D7 ■.......V'.......*.......-..¯... 000080
02030356 0008292F 02050316 00081FBA 02030033 00042409 020310B2 000128F3 µ+..ý....$..3...¤......./)..V... 0000A0
02030338 000828E8 020202A0 0007284B 02031237 00012AE9 000500B7 00042454 T$..ñ...Ô*..7...K(......Ó(..8... 0000C0
02020223 00070590 0203030A 00082C7F 020505BA 0001290A 00050129 0006261D .&..)....)..¤.......Ö.......#... 0000E0
02050540 0001286A 0005003F 00042468 020315BD 00012B41 000503BB 0008206C l-..É...A+..§...h$..?...j(..ə... 000100
02030346 000828EE 020217C6 0001285F 000503E5 00082CA8 02050364 00082929 ))..d...´,..Í..._+..ó...Ÿ(..F... 000120
02030329 00080822 02030230 00070580 020301AF 00072886 020302AF 0007043C <...£...Ñ(..£.......0...".. )... 000140
0005044A 00012859 0005004A 00042566 020300CA 000400AE 02030139 00060091 ....9...Û...ò...f%..J...Y(..J... 000160
02030370 00082963 020503EF 00082CF2 02051E4C 00012C11 0005144B 0001281F .+..K.......L...´,..ÿ...c)..p... 000180
00050338 0008049F 02030356 0008292C 02020146 0006137E 020301BE 0007024E N.../...-...F...,)..V.......B... 0001A0
0203030A 00082C7C 020203FA 00082CCD 02050241 00072E4A 02031858 0001287D )+..X...J...A...è,..*...|,..Ö... 0001C0
00000000 00000000 0000037B 00082985 02051B08 00012B05 000502C3 00070219 ....û...{+..Ü....)..(.......... 0001E0
```

Dump of file SATURN:[PCCOMMON.DUMP.DLL]DAIMDF.TMP;1 on 18-APR-1990 10:41:20.28
File ID (570,8,0)   End of file block 71 / Allocated 72

Virtual block number 29 (0000001D), 512 (0200) bytes

```
3DF84689 0000FFFF 9A5016FA 46800A76 FF0C76FF D88EFFFF 881E5657 00000CC8 à...WV.¡...Á.v..v..F*.P......F½= 000000
00003DF8 46890000 FFFF9A50 16F4468D FA76FF00 68E9F846 880006E9 03750000 ..u.Ö...F½Ök..v*.F¶.P......F½=.. 000020
003DF846 890000FF FF9A5016 FC468DF4 76FFF676 FF004DE9 F8468800 06E90375 u.Ö...F½ÖM..v-.v¶.F•.P......F½=. 000040
E9037510 56390008 E903740E 4639FE56 88FC4688 002CE9F8 46880006 E9037500 .u.Ö...F½Ö,..F•.V±9F.t.Ö..9V.u.Ö 000060
0010C8C8 C95F5E1F 0000E9FF FF058A9A 6E6AF476 FFF676FF 0010E900 00880006 ..¡..Ö...v-.v¶jn.¤...Ö...^_èùà.. 000080
7500003D F4468900 0000189A 5016F646 800A76FF 0C76FFD8 8E000888 1E565700 .WV.¡...Á.v..v..F-.P......F¶=..u 0000A0
E9037500 003DF446 89000000 369A5016 F0468DF6 76FF0094 E9F44688 0006E903 .Ö...F¶Ö...v-.FÞ.P.6....F¶=..u.Ö 0000C0
03750000 3DF44689 00000057 9A5016FC 468DF076 FFF276FF 0076E9F4 46880006 ...F¶Öv..v·.vÞ.F•.P.W....F¶=..u. 0000E0
00FFFF9A 5016F846 8D026AFC 76FFFE76 FF0A76FF 0C76FF00 55E9F446 880006E9 Ö...F¶ÖU..v..v..v±.v•j..F½.P.... 000100
0008E903 740E4639 FA568BF8 4688002C E9F44688 0006E903 7500003D F4468900 ..F¶=..u.Ö...F¶Ö,..F½.V*9F.t.Ö.. 000120
5E1F0000 E90000FF FF9A7A6A F076FFF2 76FF0010 E9000088 0006E903 75105639 9V.u.Ö..¡..Ö...v·.vÞjz.....Ö...^ 000140
89000000 859A5016 FA46800A 76FF0C76 FFD88E00 A5881E56 57000010 C8C8C95F  èùà...WV.¡É..A.v..v..F*.P.ç..... 000160
F0468900 0000039A 5016F246 80FA76FF 00C8E9F0 46880006 E9037500 003DF046 FÞ=..u.Ö...FÞÖu..v*.F·.P.£....FÞ 000180
46890000 00F49A50 16FC468D F276FFF4 76FF00AD E9F04688 0006E903 7500003D =..u.Ö...FÞÖU..v¶.v·.F•.P.¶....F 0001A0
890000FF FF9A5016 F6468DF2 76FFF476 FF008CE9 F0468800 06E90375 00003DF0 Þ=..u.Ö...FÞÖ...v¶.v·.F-.P...... 0001C0
56390008 E903740E 4639FE56 88FC4688 0068E9F0 46880006 E9037500 003DF046 FÞ=..u.Ö...FÞÖk..F•.V±9F.t.Ö..9V 0001E0
```

Dump of file SATURN:[PCCOMMON.DUMP.DLL]DAIMDF.TMP;1 on 18-APR-1990 10:41:20.28
File ID (570,8,0)   End of file block 71 / Allocated 72

Virtual block number 30 (0000001E), 512 (0200) bytes

```
E9000088 0006E903 75145639 0008E903 74124639 FE5688FC 4688001C E9037510 .u.Ö...F•.V±9F.t.Ö..9V.u.Ö..¡..Ö 000000
006A016E 68746AF6 76FFF876 FF0000FF FF9A00E8 681E716A F676FFF8 76FF0039 9..v½.v-jq.hÒ.......v½.v-jthn.j. 000020
C8C95F5E 1F0000E9 0000FFFF 9A746AF2 76FFF476 FF0000FF FF9A006A 006A006A j.j.j.......v¶.v·jt.....Ö...^_èù 000040
3DEC4689 0000017B 9A5016F6 46800A76 FF0C76FF D88E016B 881E5657 000018C8 à...WV.¡k..Á.v..v..F-.P.(....F$= 000060
00003DEC 46890000 01999A50 16E8468D F676FF01 29E9EC46 880006E9 03750000 ..u.Ö...F$Ö)..v-.FÒ.P......F$=.. 000080
003DEC46 89000001 8A9A5016 FC468DE8 76FFEA76 FF0108E9 EC468800 06E90375 u.Ö...F$Ö...vö.vÒ.F•.P.¤....F$=. 0000A0
3DEC4689 000001D8 9A5016F2 468DE876 FFEA76FF 00EAE9EC 46880006 E90 7500 .u.Ö...F$Öö..vö.vÒ.F·.P.Ü....F$= 0000C0
5016F846 8D126AFC 76FFFE76 FF0A76FF 0C76FF00 C9E9EC46 880006E9 0375 000 ..u.Ö...F$Öè..v..v..v±.v•j..F½.P 0000E0
89EE4689 FA568BF8 468800A0 E9EC4688 0006E903 7500003D EC468900 00FFFF9A ......F$=..u.Ö...F$Ö...F½.V*.FŸ. 000100
56880E46 88EE5EC4 0067E903 7502470B 26078826 EE5EC404 EE468300 04E9F056 VÞÖ...FŸ.á^Ÿ&..&.G.u.Ög.á^Ÿ.F..V 000120
AC9AF876 FFFA76FF 0A76FF0C 76FF004A E9037402 57392600 53E90374 07392610 .&9.t.ÖS.&9W.t.ÖJ..v..v..v*.v½.^ 000140
6A016E68 746AF276 FFF476FF 0000022F 9A00E968 1E716AF2 76FFF476 FF000003 ....v¶.v·jq.hÖ../....v¶.v·jthn.j 000160
FFFF86E9 001AE900 0002549A 746AE876 FFEA76FF 00000247 9A006A00 6A006A00 .j.j.j..G....vö.vÒjt.T...Ö..Ö... 000180
57000010 C8C8C95F 5E1F0000 E9000088 0000FFFF 9AF876FF FA76FF0A 76FF0C76 v..v..v*.v½.....¡..Ö...^_èùà...W 0001A0
E9037500 003DF046 89000002 789A5016 FA46800A 76FF0C76 FFD88E02 68881E56 V.¡h..A.v..v..F*.P.x....FÞ=..u.Ö 0001C0
0006E903 7500003D F0468900 0002969A 5016F246 80FA76FF 00CEE9F0 46880006 ...FÞÖo..v*.F·.P......FÞ=..u.Ö.. 0001E0
```

```
Dump of file SATURN:[PCCOMMON.DUMP.DLL]DAIMDF.TMP;1 on 18-APR-1990 10:41:20.28
File ID (570,8,0)   End of file block 71 / Allocated 72

Virtual block number 31 (0000001F), 512 (0200) bytes

 06E90375 000030F0 46890000 02B79A50 16FC4680 F276FFF4 76FF0080 E9F04688 .FÞÕ¯..v¶.v·.F=.P.ñ....FÞ=..u.Õ. 000000
 E9037500 0030FC46 89000002 D89A5016 F6468DF2 76FFF476 FF008FE9 F0468800 ..FÞÕ...v¶.v·.F-.P.Ä....FÞ=..u.Õ 000020
 4688001C E9037510 56390008 E903740E 4639FE56 88FC4688 006EE9F0 46880006 ...FÞÕn..F=.V±9F.t.Õ..9V.u.Õ...F 000040
 F676FFF8 76FF003C E9000088 0006E903 75145639 0008E903 74124639 FE5688FC =.V±9F.t.Õ..9V.u.Õ..¡..Õ<..v½.v- 000060
 006A006A 006A006A 016E6800 0068F676 FFF876FF 00000370 9A00EA68 1E00CE68 hö..hö..p....v½.v-hÅ.hn.j.j.j.j. 000080
 5700000C C8C8C95F 5E1F0000 E9009308 989A0000 68F276FF F476FF00 0003889A ......v¶.v·hÅ......Õ...^_èùà...W 0000A0
 E9037500 0030F846 89000003 D39A5016 FE468D0A 76FF0C76 FFD88E03 C3881E56 V.¡û..Ä.v..v..F±.P.Æ....F½=..u.Õ 0000C0
 0006E903 7500003D F8468900 0003F19A 5016F446 8DFE76FF 007BE9F8 46880006 ...F½Õ(..v±.F¶.P.þ....F½=..u.Õ.. 0000E0
 06E90375 000030F8 46890000 04339A50 16FA4680 F476FFF6 76FF0050 E9F84688 .F½Õ]..v-.v¶.F°.P.3....F½=..u.Õ. 000100
 68FA76FF FC76FF00 0004889A 00E8681E 00CE68FA 76FFFC76 FF003CE9 F8468800 ..F½Õ<..v=.v°hö..hŠ.......v•.v°h 000120
 04B10898 9A000068 F476FFF6 76FF0000 04A19A00 6A006A00 6A006A01 6E680000 Å.hn.j.j.j.j..Å....v-.v¶hÅ....Ÿ. 000140
 9A5016FA 46800A76 FF0C76FF D88E04C3 881E5657 000010C8 C8C95F5E 1F0000E9 Õ...^_èùà...WV.¡û..Ä.v..v..F°.P. 000160
 04F19A50 16F2468D FA76FF00 CEE9F046 880006E9 03750000 30F04689 000004D3 Æ....F̄Þ=..u.Õ...FÞÕö..v°.F·.P.þ. 000180
 129A5016 FC468DF2 76FFF476 FF00B0E9 F0468800 06E90375 000030F0 46890000 ...FÞ=..u.Õ...FÞÕ¯..v¶.v·.F=.P.. 0001A0
 9A5016F6 468DF276 FFF476FF 008FE9F0 46880006 E9037500 0030F046 89000004 ....FÞ=..u.Õ...FÞÕ...v¶.v·.F-.P. 0001C0
 03740E46 39FE5688 FC468800 6EE9F046 880006E9 03750000 30F04689 00000512 .....FÞ=..u.Õ...FÞÕn..F=.V±9F.t. 0001E0

Dump of file SATURN:[PCCOMMON.DUMP.DLL]DAIMDF.TMP;1 on 18-APR-1990 10:41:20.28
File ID (570,8,0)   End of file block 71 / Allocated 72

Virtual block number 32 (00000020), 512 (0200) bytes

 06E90375 14563900 08E90374 124639FE 5688FC46 88001CE9 03751056 3900C8E9 Õ..9V.u.Õ...F=.V±9F.t.Õ..9V.u.Õ. 000000
 68F676FF F876FF00 0005359A 00EC681E 000368F6 76FFF876 FF003CE9 00008800 .¡..Õ<..v½.v-hÆ..hŝ..5....v½.v-h 000020
 055E0E2E 9A000568 F276FFF4 76FF0000 054E9A00 6A006A00 6A006A01 6E680005 ſ.hn.j.j.j.j..N....v¶.v·hſ....^. 000040
 9A5016FA 46800A76 FF0C76FF D88E0570 881E5657 000018C8 C8C95F5E 1F0000E9 Õ...^_èùà...WV.¡p..Ä.v..v..F°.P. 000060
 059E9A50 16EC4680 FA76FF01 2CE9F046 880006E9 03750000 30F04689 00000580 .....F̄Þ=..u.Õ...FÞÕ,..v°.Fŝ.P... 000080
 BF9A5016 FC468DEC 76FFEE76 FF010EE9 F0468800 06E90375 000030F0 46890000 ...FÞ=..u.Õ...FÞÕ...vŸ.vŝ.F=.P.¢ 0000A0
 9A5016F6 468DEC76 FFEE76FF 00EDE9F0 46880006 E9037500 0030F046 89000005 ....FÞ=..u.Õ...FÞÕÚ..vŸ.vŝ.F-.P. 0000C0
 76FFFE76 FF0A76FF 0C76FF00 CCE9F046 880006E9 03750000 30F04689 000005E0 Å....FÞ=..u.Õ...FÞÕä..v..v..v±.v 0000E0
 468800A3 E9F04688 0006E903 7500003D F0468900 0003019A 5016F246 80136AFC •j..F·.P......FÞ=..u.Õ...FÞÕÈ..F 000100
 006AE903 7502470B 26078826 E85EC404 E8468300 04E9EA56 89E84689 F45688F2 ·.v¶.FÕ.VÕÕ...FÕ.á^ÕÆ..&.G.u.Õj. 000120
 0A76FF0C 76FF004D E9037402 57392600 56E90374 07392610 56880E46 88E85EC4 á^Õ.F..V.&9.t.ÕV.&9W.t.ÕM..v..v. 000140
 F876FF00 0006359A 00ED681E 000368F6 76FFF876 FF000007 B79AF276 FFF476FF .v¶.v·.ñ....v½.v-hÆ..hÚ..5....v½ 000160
 9A000568 EC76FFEE 76FF0000 064E9A00 6A006A00 6A006A01 6E680005 68F676FF .v-hſ.hn.j.j.j.j..N....vŸ.vŝhſ.. 000180
 00E90000 88000003 5F9AF276 FFF476FF 0A76FF0C 76FFFF83 E9001AE9 065E0E2E ..^.Õ..Õ...v..v..v¶.v·._...¡..Õ. 0001A0
 06809A50 16FA4680 0A76FF0C 76FFD88E 0670881E 56570000 10C8C8C9 5F5E1F00 ..^_èùà...WV.¡p..Ä.v..v..F°.P... 0001C0
 0000069E 9A5016F2 468DFA76 FF00CEE9 F0468800 06E90375 000030F0 46890000 ...F̄Þ=..u.Õ...FÞÕö..v°.F·.P..... 0001E0

Dump of file SATURN:[PCCOMMON.DUMP.DLL]DAIMDF.TMP;1 on 18-APR-1990 10:41:20.28
File ID (570,8,0)   End of file block 71 / Allocated 72

Virtual block number 33 (00000021), 512 (0200) bytes

 00068F9A 5016FC46 80F276FF F476FF00 80E9F046 880006E9 03750000 30F04689 .FÞ=..u.Õ...FÞÕ¯..v¶.v·.F=.P.¢.. 000000
 06E09A50 16F6468D F276FFF4 76FF008F E9F04688 0006E903 7500003D F0468900 ..FÞ=..u.Õ...FÞÕ...v¶.v·.F-.P.Å. 000020
 08E90374 0E4639FE 5688FC46 88006EE9 F0468800 06E90375 000030F0 46890000 ...FÞ=..u.Õ...FÞÕn..F=.V±9F.t.Õ. 000040
 B80006E9 03751456 390008E9 03741246 39FE5688 FC468800 1CE90375 10563900 .9V.u.Õ...F=.V±9F.t.Õ..9V.u.Õ..¡ 000060
 009068F6 76FFF876 FF000007 799A00EE 681E008E 68F676FF F876FF00 3CE90000 ..Õ<..v½.v-h...hŸ..y.....v½.v-h.. 000080
 00E90000 FFFF9A00 9068F276 FFF476FF 00000792 9A006A00 6A006A00 6A016E68 hn.j.j.j.j.......v¶.v·h.......Õ. 0000A0
 07DE9A50 16F2468D 0A76FF0C 76FFD88E 07CE881E 56570000 18C8C8C9 5F5E1F00 ..^_èùà...WV.¡ö..Ä.v..v..F·.P.B. 0000C0
 000007FC 9A5016E8 468DF276 FF012CE9 EC468800 06E90375 000030EC 46890000 ...Fŝ=..u.Õ...FŝÕ,..v·.FÕ.P.•... 0000E0
 0008109A 5016FC46 8DE876FF EA76FF01 0EE9EC46 880006E9 03750000 30EC4689 .Fŝ=..u.Õ...FŝÕ...vÕ.vÕ.F•.P.... 000100
 083E9A50 16EE468D E876FFEA 76FF00ED E9EC4688 0006E903 7500003D EC468900 ..Fŝ=..u.Õ...FŝÕÚ..vÕ.vÕ.FŸ.P.>. 000120
 6AFC76FF FE76FF0A 76FF0C76 FF00CCE9 EC468800 06E90375 000030EC 46890000 ...Fŝ=..u.Õ...FŝÕä..v..v..v±.v•j 000140
 88F84688 00A3E9EC 46880006 E9037500 0030EC46 89000007 099A5016 F8468022 •.F½.P......Fŝ=..u.Õ...FŝÕÈ..F½. 000160
 5EC4006A E9037502 47082607 8826F45E C404F446 830004E9 F65689F4 4689FA56 V°.F¶.V-Õ...F¶.á^¶Æ..&.G.u.Õj.á^ 000180
 76FF0A76 FF0C76FF 0040E903 74025739 260056E9 03740739 26105688 0E4688F4 ¶.F..V.&9.t.ÕV.&9W.t.ÕM..v..v..v 0001A0
 76FFF076 FF000008 939A00EF 681E008E 68EE76FF F076FF00 000A159A F876FFFA •.v½......vÞ.vŸh...hy.......vÞ.v 0001C0
 088A9A00 9068E876 FFEA76FF 000008AC 9A006A00 6A006A00 6A016E68 009068EE Ÿh..hn.j.j.j.j..¯....vÕ.vÕh...¤. 0001E0
```

```
Dump of file SATURN:[PCCOMMON.DUMP.DLL]DAIMDF.TMP;1 on 18-APR-1990 10:41:20.28
File ID (570,8,0)    End of file block 71 / Allocated 72

Virtual block number 34 (00000022), 512 (0200) bytes

 1F0000E9 00008800 0007679A F876FFFA 76FF0A76 FF0C76FF FF83E900 1AE90000 ..ô..ô...v..v..v*.v½.g...¡..ô... 000000
 0000080E 9A5016FA 468D0A76 FF0C76FF D88E08CE 881E5657 000010C8 CBC95F5E ^ èùà...WV.¡ö..Á.v..v..F*.P.8... 000020
 46890000 08FC9A50 16F2468D FA76FF00 CEE9F046 880006E9 03750000 3DF04689 .Fÿ=..u.ô...FÞÖö..v*.F·.P.=....F 000040
 89000009 109A5016 FC468DF2 76FFF476 FF0080E9 F0468800 06E90375 00003DF0 Þ=..u.ô...FÞô¯..v¶.v·.F•.P...... 000060
 0000093E 9A5016F6 468DF276 FFF476FF 008FE9F0 46880006 E9037500 003DF046 FÞ=..u.ô...FÞô...v¶.v·.F-.P.>... 000080
 390008E9 03740E46 39FE5688 FC468800 6EE9F046 880006E9 03750000 3DF04689 .FÞ=..u.ô...FÞôn..F•.V±9F.t.ô..9 0000A0
 00008800 06E90375 14563900 08E90374 124639FE 5688FC46 88001CE9 03751056 V.u.ô...F•.V±9F.t.ô..9V.u.ô..¡.. 0000C0
 6E6800DA 68F676FF F876FF00 0009079A 00F0681E 000868F6 76FFF876 FF003CE9 ô<..v½.v-hÁ..hÞ..@....v½.v-hö.hn 0000E0
 1F0000E9 07A2144B 9A00DA68 F276FFF4 76FF0000 09F09A00 6A006A00 6A006A01 .j.j.j.j..Þ....v¶.v·hö..K.Á.ô... 000100
 00000A3C 9A5016FA 468D0A76 FF0C76FF D88E0A2C 881E5657 000010C8 CBC95F5E ^ èùà...WV.¡,..Á.v..v..F*.P.<... 000120
 46890000 0A5A9A50 16F0468D FA76FF00 9CE9F446 880006E9 03750000 3DF44689 .F¶=..u.ô...F¶ô...v*.FÞ.P.Z....F 000140
 8900000A 7B9A5016 FC468DF0 76FFF276 FF007EE9 F4468800 06E90375 00003DF4 ¶=..u.ô...F¶ô-..v·.vÞ.F•.P.(.... 000160
 00000A9C 9A5016F6 468DF076 FFF276FF 0050E9F4 46880006 E9037500 003DF446 F¶=..u.ô...F¶ô)..v·.vÞ.F-.P..... 000180
 F19A00F1 681E0008 68F676FF F876FF00 3CE9F446 880006E9 03750000 3DF44689 .F¶=..u.ô...F¶ô<..v½.v-hÁ..hþ..þ 0001A0
 FFF276FF 0000080A 9A006A00 6A006A00 6A016E68 000A68F6 76FFF876 FF00000A ....v½.v-hö.hn.j.j.j.j.......v·. 0001C0
 76FFD88E 082C881E 56570000 10C8C8C9 5F5E1F00 00E9081A 14489A00 DA68F076 vÞhö..K...ô...^_èùà...WV.¡,..Á.v 0001E0

Dump of file SATURN:[PCCOMMON.DUMP.DLL]DAIMDF.TMP;1 on 18-APR-1990 10:41:20.28
File ID (570,8,0)    End of file block 71 / Allocated 72

Virtual block number 35 (00000023), 512 (0200) bytes

 FF00CEE9 F0468800 06E90375 00003DF0 46890000 083C9A50 16FA468D 0A76FF0C ..v..F*.P.<....FÞ=..u.ô...FÞôö.. 000000
 F476FF00 80E9F046 880006E9 03750000 3DF04689 0000085A 9A5016F2 468DFA76 v*.F·.P.Z....FÞ=..u.ô...FÞô¯..v¶ 000020
 76FF008F E9F04688 0006E903 7500003D F0468900 00087B9A 5016FC46 8DF276FF .v·.F•.P.(....FÞ=..u.ô...FÞô...v 000040
 88006EE9 F0468800 06E90375 00003DF0 46890000 089C9A50 16F6468D F276FFF4 ¶.v·.F-.P......FÞ=..u.ô...FÞôn.. 000060
 03741246 39FE5688 FC468800 1CE90375 10563900 08E90374 0E4639FE 5688FC46 F•.V±9F.t.ô..9V.u.ô...F•.V±9F.t. 000080
 8F9A00F2 681E000D 68F676FF F876FF00 3CE90000 880006E9 03751456 390008E9 ô..9V.u.ô..¡..ô<..v½.v-hi..h·..€ 0000A0
 FFF476FF 00000808 9A006A00 6A006A00 6A016E68 000F68F6 76FFF876 FF000008 ....v½.v-hô.hn.j.j.j.j..Ä....v¶. 0000C0
 76FFD88E 08FA881E 56570000 0CC8CBC9 5F5E1F00 00E908E8 1A699A00 DF68F276 v·hô..i.ò.ô...^ èùà...WV.¡*..Á.v 0000E0
 FF007BE9 F8468800 06E90375 00003DF8 46890000 0C0A9A50 16FE468D 0A76FF0C ..v..F±.P......F½=..u.ô...F½ô(.. 000100
 F676FF00 50E9F846 880006E9 03750000 3DF84689 00000C28 9A5016F4 468DFE76 v±.F¶.P.(....F½=..u.ô...F½ô)..v- 000120
 76FF003C E9F84688 0006E903 7500003D F8468900 000C6A9A 5016FA46 8DF476FF .v¶.F*.P.j....F½=..u.ô...F½ô<..v 000140
 006A006A 016E6800 DF68FA76 FFFC76FF 00000C8F 9A00F368 1E000068 FA76FFFC =.v*hi..hµ..€....v=.v*hô.hn.j.j. 000160
 C8C8C95F 5E1F0000 E90CE81A 699A000F 68F476FF F676FF00 000CD89A 006A006A j.j..Á....v~.v¶hô..i.ò.ô...^ èùà 000180
 003DF046 89000000 0A9A5016 FA468D0A 76FF0C76 FFD88E0C FA881E56 57000010 ...WV.¡*..Á.v..v..F*.P......FÞ=. 0001A0
 7500003D F0468900 0000289A 5016F246 8DFA76FF 00CEE9F0 46880006 E9037500 .u.ô...FÞòö..v*.F·.P.(....FÞ=..u 0001C0
 00003DF0 46890000 0C499A50 16FC468D F276FFF4 76FF0080 E9F04688 0006E903 .ô...FÞô¯..v¶.v·.F•.P.I....FÞ=.. 0001E0

Dump of file SATURN:[PCCOMMON.DUMP.DLL]DAIMDF.TMP;1 on 18-APR-1990 10:41:20.28
File ID (570,8,0)    End of file block 71 / Allocated 72

Virtual block number 36 (00000024), 512 (0200) bytes

 003DF046 89000000 499A5016 F6468DF2 76FFF476 FF008FE9 F0468800 06E90375 u.ô...FÞô...v¶.v·.F-.P.I....FÞ=. 000000
 E9037510 56390008 E903740E 4639FE56 88FC4688 006EE9F0 46880006 E9037500 .u.ô...FÞôn..F•.V±9F.t.ô..9V.u.ô 000020
 76FF003C E9000088 0006E903 75145639 0008E903 74124639 FE5688FC 4688001C ...F•.V±9F.t.ô..9V.u.ô..¡..ô<..v 000040
 006A006A 016E6800 EA68F676 FFF876FF 0000006C 9A00F468 1E00E868 F676FFF8 ½.v-hô..h¶..l....v½.v-hõ.hn.j.j. 000060
 C8C8C95F 5E1F0000 E90000FF FF9A00EA 68F276FF F476FF00 0000859A 006A006A j.j.......v¶.v·hõ......ô...^ èùà 000080
 003DF846 89000000 879A5016 FE468D0A 76FF0C76 FFD88E0D A7881E56 5700000C ...WV.¡Ï..Ä.v..v..F±.P.ñ....F½=. 0000A0
 7500003D F8468900 0000D59A 5016F446 8DFE76FF 007BE9F8 46880006 E9037500 .u.ô...F½ô(..v±.F¶.P.{....F½=..u 0000C0
 00003DF8 46890000 0E179A50 16FA468D F476FFF6 76FF005D E9F84688 0006E903 .ô...F½ô]..v-.v¶.F*.P......F½=.. 0000E0
 FC76FF00 000E6C9A 00F5681E 00E868FA 76FFFC76 FF003CE9 F8468800 06E90375 u.ô...F½ô<..v=.v*hô..h‰..l....v= 000100
 9A00EA68 F476FFF6 76FF0000 0E859A00 6A006A00 6A006A01 6E6800EA 68FA76FF .v*hõ.hn.j.j.j.j.......v~.v¶hõ.. 000120
 468D0676 FF0876FF D88E0EA7 881E5657 000008C8 CBC95F5E 1F0000E9 00000E93 ....ô...^ èùà...WV.¡Ï..Ä.v..v..F 000140
 800676FF 0876FF03 27E9F846 880006E9 03750000 3DF84689 0000FFFF 9A5016FE ±.P......F½=..u.ô...F½ô'..v..v.. 000160
 FC76FFFE 76FF0306 E9F84688 0006E903 75000030 F8468900 00FFFF9A 5016FA46 F*.P......F½=..u.ô...F½ô...v±.v= 000180
 46880006 E9037500 003DF846 890000FF FF9A5052 0002050C 56880A46 88FA76FF .v*.F..V....RP......F½=..u.ô...F 0001A0
 46890000 10509AFF FF680FFB 682F6A01 6A0277FF 260477FF 260A5EC4 020CE9F8 ½ôE.á^.&.w.&.w.j.j/h«.h...]....F 0001C0
 FFFF6810 26680277 FF260477 FF260A5E C4028 1E9 F8468800 06E90375 00003DF8 ½=..u.ô...F½ôY.á^.&.w.&.w.h&.h.. 0001E0
```

Dump of file SATURN:[PCCOMMON.DUMP.DLL]DAIMDF.TMP;1 on 18-APR-1990 10:41:20.28
File ID (570,8,0)   End of file block 71 / Allocated 72

Virtual block number 37 (00000025), 512 (0200) bytes

```
77FF2604 77FF260A 5EC4028A E9F84688 0006E903 75000030 F8468900 00FFFF9A ......F½=..u.Õ...F½Õ..á^.&.w.&.w 000000
06E90375 000030F8 46890000 108E9AFF FF681057 68102F68 102C6812 6A016A02 .j.j.h..h/.hW.h........F½=..u.Õ. 000020
0010B99A FFFF6810 8268026A 0A6A0277 FF260477 FF260A5E C40259E9 F8468800 ..F½ÕY.á^.&.w.&.w.j.j.h..h...¿.. 000040
6A016A02 77FF2604 77FF260A 5EC4022E E9F84688 0006E903 75000030 F8468900 ..F½=..u.Õ...F½Õ..á^.&.w.&.w.j.j 000060
F8468800 06E90375 000030F8 46890000 10EA9AFF FF6810B3 68108868 10886818 .h..h..h*.h...õ....F½=..u.Õ...F½ 000080
F8468900 00FFFF9A FFFF6810 0E68026A 026A0277 FF260477 FF260A5E C401F0E9 Õ».á^.&.w.&.w.j.j.h8.h........F½ 0000A0
10E4681A 6A016A02 77FF2604 77FF260A 5EC40102 E9F84688 0006E903 75000030 =..u.Õ...F½Õ@.á^.&.w.&.w.j.j.hõ. 0000C0
C401A1E9 F8468800 06E90375 000030F8 46890000 FFFF9AFF FF68FFFF 6810E768 hÕ.h..h........F½=..u.Õ...F½ÕÀ.á 0000E0
75000030 F8468900 0011719A FFFF6811 3A68026A 056A0277 FF260477 FF260A5E ^.&.w.&.w.j.j.h:.h...q....F½=..u 000100
68114368 11406817 6A016A02 77FF2604 77FF260A 5EC40176 E9F84688 0006E903 .Õ...F½Õv.á^.&.w.&.w.j.j.hâ.hC.h 000120
FF260A5E C40145E9 F8468800 06E90375 000030F8 46890000 11A29AFF FF681168 k.h...Å....F½=..u.Õ...F½ÕE.á^.&. 000140
0006E903 75000030 F8468900 0011CD9A FFFF6811 9668026A 076A0277 FF260477 w.&.w.j.j.h..h...ë....F½=..u.Õ.. 000160
FF6811C7 68119F68 119C6816 6A016A02 77FF2604 77FF260A 5EC4011A E9F84688 .F½Õ..á^.&.w.&.w.j.j.h..h..hú.h. 000180
FF260477 FF260A5E C400E9E9 F8468800 06E90375 000030F8 46890000 11FE9AFF ..±....F½=..u.Õ...F½ÕÕ.á^.&.w.&. 0001A0
E9F84688 0006E903 75000030 F8468900 0012299A FFFF6811 F268026A 066A0277 w.j.j.h..h...)....F½=..u.Õ...F½Õ 0001C0
125A9AFF FF681223 6811F868 11F86828 6A016A02 77FF2604 77FF260A 5EC4008E ƒ.á^.&.w.&.w.j.j+h½.h«.h#.h...Z. 0001E0
```

Dump of file SATURN:[PCCOMMON.DUMP.DLL]DAIMDF.TMP;1 on 18-APR-1990 10:41:20.28
File ID (570,8,0)   End of file block 71 / Allocated 72

Virtual block number 38 (00000026), 512 (0200) bytes

```
086A0277 FF260477 FF260A5E C4008DE9 F8468800 06E90375 000030F8 46890000 ...F½=..u.Õ...F½Õ..á^.&.w.&.w.j. 000000
5EC40062 E9F84688 0006E903 75000030 F8468900 0012859A FFFF6812 4E68046A j.hN.h........F½=..u.Õ...F½Õb.á^ 000020
46890000 10329AFF FF68127F 68125768 12546822 6A016A02 77FF2604 77FF260A .&.w.&.w.j.j"hT.hW.h..h...2....F 000040
D468026A 156A0277 FF260477 FF260A5E C40031E9 F8468800 06E90375 000030F8 ½=..u.Õ...F½Õ1.á^.&.w.&.w.j.j.hå 000060
0000E9F8 46880006 E9F84688 0006E903 75000030 F8468900 000F0A9A FFFF680F .h...Ö....F½=..u.Õ...F½Õ...F½Õ.. 000080
08C60002 12820005 00000005 0ED50203 00000001 00950002 002690CB C95F5E1F .^_èù.&...........f...ÿ.......ó. 0000A0
01D40007 0F640203 00000002 110F0002 007F0001 0F320103 07C60002 12510005 ..Q...ó...2...............d...å. 0000C0
01E30007 00F60203 03DA0008 0F400203 00000006 0F540002 00860001 0F190103 ..........T.......ā...Ö...-...D. 0000E0
03640008 01570203 01630002 10290005 02600002 105A0005 04580009 11460203 ..F...X...Z...'...)...c...W...d. 000100
03700008 0395020C 01F30007 0F850203 06680002 11120005 05680002 10E10005 ..Ä...h.......h.......µ.......p. 000120
01FF0007 0EF60203 08F20002 11990005 0CF20002 11CA0005 00920004 09670203 ..g.......ò...'.......'...-..... 000140
040A0009 0FAF0203 00AB0004 09C50203 00000002 0FD70005 009E0004 01100203 .........■.......é...¨...£..... 000160
009F0002 11F50005 0E9F0002 12260005 00900002 0FFE0005 03990008 09FE0203 ..±.......±.......&.......¥..... 000180
04320009 10010203 04210009 11150203 0A240002 11300005 08240002 116E0005 ..n...$...=...$.......!.......2. 0001A0
00000000 00000000 005E0004 0EB70203 03B80002 10850005 04B80002 10860005 ..Ñ...£.......£...ñ...^......... 0001C0
00000000 00000000 00000500 02000200 01C80001 B81F0396 3E89D88E FFFFB81E .¡...Ä.>...¡..ù................. 0001E0
```

Dump of file SATURN:[PCCOMMON.DUMP.DLL]DAIMDF.TMP;1 on 18-APR-1990 10:41:20.28
File ID (570,8,0)   End of file block 71 / Allocated 72

Virtual block number 39 (00000027), 512 (0200) bytes

```
C0330A7E C40676C5 1EDE88D7 88EC8855 00000000 00000000 00000000 00000000 ................U.ŝ.■.8.év.á~.3à 000000
C4D788EC 885500C8 5DFA88F3 881FFFFF 10C01805 74A6F3F9 2BD1F7AE F2FFFFB9 ¿...ÚKi+ªµ!t..à.....µ.ª]ù.U.ŝ.■á 000020
89EC468D 56570000 16C8000C 7BE900C8 5DFA8891 4901F7AE F2FFFFB9 C033067E -.3à¿...ÚKI|..ª]ù.Õ(..à...WV.Fŝ. 000040
06478926 08568806 4688420A 47C626F8 5EC4FE56 8CFC4689 0E468DFA 568CF846 F½.Vª.F..F■.V±á^½&óG.8.F..V.&.G. 000060
024C9A53 060A76FF 0C76FFFC 76FF167F FF0447C7 26025789 26078926 08578926 &.W.&..&.W.&úG.....v■.v..v..S.L. 000080
E8058826 02478E26 37FF263F 8826C02A 1278044F FF26F85E C4F0880C C48300C8 ù..á..Þá^½&.O.x.ªá&.?&..&.G.&..Ŝ 0000A0
26085EC4 56570000 08C8C8C9 5F5EC688 06C483FF FF00069A 006A53FA 76FF900F ...vªSj..ø....á..ó^_èùà...WVá^.& 0000C0
4689113C 05E0D1C1 03E001C8 88F9F700 0C899905 4820C388 FA4689E4 2A08478A .G.ªÕ.Fª.û-N..¿..¼ª¯àIÀ.èIÀ.<..F 0000E0
5EC49001 28E9FFFF 88200A4F 8026085E C40F7440 0A47F626 0774830A 47F626F8 ½&-G..t.&-G.ât.á^.&.O. ¡..Õ+..á^ 000100
EF0A6780 26020A4F 802690E2 E8000004 47C72620 0A4F8026 0E74010A 47F62608 .&-G..t.&.O. &úG...Ŝã.&.O..&.g.ÿ 000120
060868F9 F7000C89 9905482D C3884C75 0C0A47F6 26FC7689 F0880447 8926C028 +à&.G..Þ.v■&-G..uL.û-N..¿..¼ªkÄ. 000140
FF0A7E81 16750560 087E810E 74017F0A 7E810775 0554087E 81377501 113C87F6 -.<..u7.-.T.u..~...t..-.'.u..~.. 000160
5EC404C4 830CA7E8 0876FF0A 76FF0C75 C00802C4 8301F210 A29AFA76 FF0F75FF .u..vª.Å.·..á..âu..v..v.ÒI..á.á^ 000180
085E8867 7401113C 87F60608 68F9F700 0C899905 4820C388 1575080A 47F62608 .&-G..u..û-N..¿..¼ªkA.-.<..tg.^. 0001A0
89264802 458BF87E 88025789 26078926 40085788 26064788 26067728 26378826 &.7&+w.&.G.&.W.ā&..&.W..-½.E.N&. 0001C0
F6FA5E88 19EBFC46 8908C483 02100F0A 9AFA76FF 0677FF26 5256167E F60B0447 G..-~.VR&.w..vª......á..F■Ŝ..^ª- 0001E0
```

```
Dump of file SATURN:[PCCOMMON.DUMP.DLL]DAIMDF.TMP;1 on 18-APR-1990 10:41:20.28
File ID (570,8,0)   End of file block 71 / Allocated 72

Virtual block number 40 (00000028), 512 (0200) bytes

 2606468A 065FC426 085EC408 C4830233 0ECC9A53 006A006A 026A0F74 20174D87 .M. t.j.j.j.S.ä.3..6.6^.&6_..F.& 000000
 0374FC76 39FC4689 08C48300 A00F0A9A FA76FF50 16064680 5600018E 17EB0788 ..$./..V.F..P.v•......6..F=9v=t. 000020
 981E8C1A 96A3'A9C 88018910 C69A000A 88EC8855 C8C95F5E E42A0646 8AFECCE9 Ôa±.F.*ô^_èüU.$¡...6...|..È..... 000040
 001A9206 C71A6E16 891A6CA3 08568806 46881A88 16891A86 A310568B 0E46881A ..F..V.È.......F..V.Èl...n.ú.... 000060
 72A31A76 A3C02800 011A9406 C7030BE9 037425F6 7E80038D E900001A 9006C700 .ú.....Ô...--Xt.Ô..ú.....+âÈv.Èr 000080
 260A5EC4 00201BFC 06C71A84 A31A6AA3 1A70A31A 8AA31A8C A31A74A3 1A8EA31A .È..Èt.È..È..Èp.Èj.È..ú.=. .6^.& 0000A0
 C71A7606 FF00752B 3F80260A 5E88903E EB00301B FC06C70A 46FF4975 30017F80 ...0ul.F.ú.=.0.$>..^.&.?+u...v.ú 0000C0
 1A6A06FF 9014EB1A 8A06FF1A 75001A76 3E830E75 203F8026 902BEB00 001A8A06 .....$(.&.? u..>v..u.....$....j. 0000E0
 C483097B E80E5098 078A260A 5E880A46 FF1A8406 FFC7752D 3F80260A 5EC400EB $.6^.&.?-uú.....F..^.&...P.Òx..6 000100
 1A9A3E83 0C56890A 468908C4 8308C7E8 0E1A9A68 1E0A76FF 0C76FF00 75C00B02 ..âuI.v..v..h...Òú..6..F..V..>.. 000120
 FC06C706 75301BFC 3E830074 001A843E 831A9AA3 D8F71A9A A11A8406 FF0C7D00 .).....À..%ÀÈ...>...t..>=.0u.ú.= 000140
 83087BE8 0E1A9468 1E0A76FF 060A46FF 1A8C06FF 20752E3F 80260A5E C400201B . .6^.&.?.u-.....F...v..h...Ò(.. 000160
 98078A26 0A5EC41A 8C0EFF00 011A9406 C70A7D00 1A943E83 0C56890A 468908C4 6..F..V..>...).ú.........6^.&... 000180
 75001A74 3E830002 1A7406C7 0675006C 302B7400 68304074 004E3030 74004630 =F.t==N.t@=h.t+=l.u.ú.t....>t..u 0001A0
 00011A74 06C79002 4EE91C75 003F8026 0A5EC40A 46FF0375 4C3F8026 0A5EC409 .6^.&.?Lu..F.6^.&.?.u.ÔN..ú.t... 0001C0
 47300A74 00453DF8 46899807 8A26C8EB 00081A74 06C7D0EB 00101A74 06C7D8EB $Áú.t...$Áü.t...$à&....F½=E.t.=G 0001E0

Dump of file SATURN:[PCCOMMON.DUMP.DLL]DAIMDF.TMP;1 on 18-APR-1990 10:41:20.28
File ID (570,8,0)   End of file block 71 / Allocated 72

Virtual block number 41 (00000029), 512 (0200) bytes

 00633D01 91E9037E 7B740069 30F84688 20F84683 1A7206FF 08750058 30057400 .t.=X.u...r..F½ .F½=i.tx-.Ô..=c. 000000
 861EC415 75021A74 3E839001 59E90140 E9037500 25300152 E9037E01 3FE90375 u.Ô?.-.ÔR.=X.u.Ôâ.ÔY...>t..u.6.. 000020
 83078926 1A90A11F C4261A86 1EC40DEB 00000247 C7260789 261A90A1 1FC4261A .&6.À..&..&úG...$.6...&6.À..&... 000040
 0A47F626 1A6C1EC4 01B0E903 74001A90 3E830170 E9037500 1A923E83 041A8606 .....>...u.Ôp..>...t.Ô§.6.l.&-G. 000060
 EB02C483 019EE80E 0A6A0000 1A6A06C7 1A8E06FF 01ACE9FF FF8801AF E9037520  u.ÔÈ.¡..Ô¯.....ú.j...j..Ò...6.$ 000080
 E9037508 1A743E83 00041A94 06C71A8C 06FF1A72 06FF1A70 06FFF2EB 086A90C3 û.j.$..p...r.....ú......>t..u.Ô 0000A0
 843E83FA 46891A9A A128741A 9A0639FA 46891A74 A3C02B7A 74011A74 3E830081 ...>t..tz+âÈt..F•9...t(À...F•.>. 0000C0
 831A9AA3 C02B027D C00B1A9A A1051A9A 2E839090 13EB0000 1A9A06C7 0A74001A ..t.ú.....$........À...â).+âÈ... 0000E0
 1A843E83 227400FA 7E8302C4 83048DE8 0E3A6A02 C4830130 E80E106A 021A8606 ....j..Ô0..6.j:.Ò...6..-•.t".>.. 000100
 2E830000 1A9A06C7 9007EB1A 9AA3C02B 027DC00B 1A9AA300 052DFA46 8B157400 .t..F•-..È...â).+âÈ..$..ú....... 000120
 026EE80E 006A90FF 3FE9106A FF10E902 1A860683 02C48300 F1E80E10 6A041A86 ...j..Òþ..6......Ô..j.Ô7..j..Òn. 000140
 75006430 90FF21E9 0428E80E 256AFF2A E90349E8 0EF876FF F4EB016A 90FF39E9 Ô9..j.$¶.v½.Òl.Ô*.jX.Ò(.Òl..=d.u 000160
 46880A4E FF0C5688 0A468809 74001A74 3E830A7E 00673005 7C00653D FF0CE903 .Ô..=e.|.=g.-0.>t..t..F..V..N..F 000180
 7030FEE4 E903750ⁿ 6F30FE80 E9037500 6E30903A E8FE5689 FC468940 0C56880A ..V.a.F=.V±$:.=n.u.Ô.±=o.u.Ôô±=p 0001A0
 46FF9081 E8FF79E9 03750078 30FE89E9 03750075 308F7400 7330FEE0 E9037500 .u.ÔÁ±=s.t.=u.u.Ô¿±=x.u.Ôy.$Ÿ..F 0001C0
 76FF500A 462BC38E EC75253C 0474C00A F6468807 8A26FC5E C4FC46FF 9034EB0A .$4..F=6^=&...F-.ât.<%u$.û+F.P.v 0001E0

Dump of file SATURN:[PCCOMMON.DUMP.DLL]DAIMDF.TMP;1 on 18-APR-1990 10:41:20.28
File ID (570,8,0)   End of file block 71 / Allocated 72

Virtual block number 42 (0000002A), 512 (0200) bytes

 F6468807 8A260A5E C40C5689 0A4689FE 5688FC46 8806C483 044CE80E 0A76FF0C ..v..ÒL..6..F=.V±.F..V.6^.&...F- 000000
 56570000 12C8CBC9 1A90A1FE 51E90374 200A47F6 261A6C1E C4FC63E9 0374C00A .ât.Òc=6.l.&-G. t.ÔQ±À..èüà...WV 000020
 3E830774 021A743E 831A8E06 FF04740A 067E8300 201BFC06 C7067400 1A8C3E83 .>...t.ú.=. ..-..t......>t..t..> 000040
 3E83902C EB041A86 0683FE56 89FC4689 02578B26 078B261A 861EC419 75101A74 t..u.6...&..&.W..F=.V±.....$,..> 000060
 46899907 8B261A86 1EC40EEB 0000FE46 C7FC4689 078B261A 861EC411 74001A8E ...t.6...&...F=úF±..$.6...&....F 000080
 C02B9003 EB06468B 0674FE46 0BFC468B 0E74001A 6A3E8302 1A860683 FE5689FC =.V±......>j..t..F=.F±t..F.$..+6 0000A0
 067E832B 7D00FE7E 83317500 1A8E3E83 F45689F2 46891A98 16881A96 A11BFAA3 È•.À.......F·.V¶.>...u1.-±.)+.-. 0000C0
 FE5689FC 46890AF7 00028308 F7FE5688 FC46882D 07C626F2 46FFF25E C410750A .u.6^·.F·&6.-.F=.V±%Á.@.%Ô.F=.V± 0000E0
 76FFFE76 FF501E06 76FFFA5E 8CF84689 1A788800 00F646C7 9006E800 01F646C7 úF-..$..úF-..¦x..F½.^•.v..P.v±.v 000100
 0E8804C4 83025500 3A9AF876 FFFA76FF 4574001A 8C3E830A C4830739 10989AFC =...9..6..>...tE.v•.v½.:.U..6... 000120
 05EBF27E C4F04E88 00001BFA 06C70675 081BFA3E 83007EC9 0BF04E89 C82B1A94 ..+à.Nþ.è~..>•..u.ú.•....Nþ6~·$. 000140
 C4F276C5 EE5E8C1A 720E88F0 4E89F446 8CF27E89 F47FC008 49C18847 3005C626 &6.0G.èl.à.¶.~·.F¶.Nþ..r..^Ÿév·6 000160
 8CF27689 E375003F 8026F846 FF46202C 80037C61 3C0774C9 08048807 8A26F85E ^½&.....èt.<a|.., F.F½&.?.uÐ.v·. 000180
 02E80001 88057500 F67E830B 741A8A06 081A76A1 1475001A 8E3E83EE 5E8EF45E ^¶.^Ÿ.>...u.Àv.....t..—.u.¡..$. 0001A0
 1A86A100 018E1874 00067E83 56570000 10C8CBC9 5F5E02C4 8302FFE8 0E50C02B +àP.Ò...6.^_èüà...WV.-..t./..À.. 0001C0
 078B261A 861EC413 74081A74 3E83008F E9021A86 0683FA56 89F84689 1A88168B .....F½.V•.....Ò...>t..t.6...&.. 0001E0
```

```
Dump of file SATURN:[PCCOMMON.DUMP.DLL]DAINDF.TMP;1 on 18-APR-1990 10:41:20.28
File ID (570,8,0)   End of file block 71 / Allocated 72

Virtual block number 43 (0000002B), 512 (0200) bytes

 1AB60683 FA5E8CF8 4689FC46 89078826 1A861EC4 10E8FA56 89F84689 02578826 &.W..F%.V*$.á...&...F=.F%.^*.... 000000
 8900FD88 097500FC 7E83900A E800F688 1575FA46 08F84688 0E74081A 743E8304 ..>t..t..F%.F*u.¡-.$...-=.u.¡».. 000020
 900EEB1A 940E881C 741A8C36 39F628F4 5689F246 89FA5688 F84688FA 5E8CF846 F%.^*.F%.V*.F·.V¶+-96..t.....$.. 000040
 75003F80 26F246FF F25EC446 90EDEB10 7ECE3846 1574003F 8026F246 FFF25EC4 á^·.F·&.?.t.F;ö-.$Ú.Fá^·.F·&.?.u 000060
 83E80EF8 76FFFA76 FF5602C4 830159E8 0E570875 001A843E 83FE281A 9A3E88F3 µ.>..+±.>...u.W.ÓY..á.V.v*.v%.Ó° 000080
 881A86A1 000006C6 90CBC95F 5E02C483 013CE80E 57087400 1A843E83 06C48301 ..á..>...t.W.Ó<..á.^_èù.à...À... 0000A0
 83FA4688 C02A9003 E801B005 7547067E 83067467 067E83FE 5689FC46 891A8816 ....F=.V±.-.gt..-.Gu¯.$..*á.F*. 0000C0
 FF00011A 9406C706 75001A94 3E830074 00FA7E80 00061A94 06C70675 001A8C3E >...u.ú......-*.t..>...u.ú...... 0000E0
 281EFF26 1988068E FC76FFFE 76FF1A96 36FF1A98 36FF0676 FF1A9436 FF1A7236 6r..6...v..6...6...v±.v=....&..( 000100
 1EFF2619 88068E1A 9636FF1A 9836FF14 75001A6A 3E831874 00FA7E80 0EC48305 ..á..-*.t..>j..u..6...6......&.. 000120
 26198806 8E1A9636 FF1A9836 FF147500 1A943E83 1874001A 6A3E8304 C483052C ,..á..>j..t..>...u..6...6......& 000140
 76FFFE76 FF1B741A 8A060B1A 76A10000 1BFA06C7 081A8606 8304C483 05341EFF ..4..á......ú.*...Àv.....t..v±.v 000160
 90CBC901 29E80E50 C02802E8 00018805 74C00804 C4830538 1EFF2619 88068EFC =....&..8..á..àt.¡..$.+àP.Ó).èù. 000180
 2607FF26 37882606 468A1478 044FFF26 1A6C1EC4 3C75001A 923E8356 000000C8 à...V.>...u<á.l.&.O.x..F.&.7&..& 0001A0
 9206FF07 754006C4 830A1100 069A0676 FF531A6E 36FF10EB E42A0488 2602478E .G.&..*ö$..6n.S.v..ø....á.àu.... 0001C0
 507EF608 06768857 75001A92 3E835657 000002C8 90CBC95E 1A9006FF 9005EB1A .$......^èù.à...WV.>...uW.v..--P 0001E0

Dump of file SATURN:[PCCOMMON.DUMP.DLL]DAINDF.TMP;1 on 18-APR-1990 10:41:20.28
File ID (570,8,0)   End of file block 71 / Allocated 72

Virtual block number 44 (0000002C), 512 (0200) bytes

 4EC6881A 9206FF04 754006C4 830A7900 D69A18FC 36FF1A6C 36FF1A6E 36FF18E8 $..6n..6l..6=..ø.y..á.àu......6N 000000
 E42A0588 2602478E 2607FF26 3F88261B FCA00478 044FFF26 1A6C1EC4 1E7EC008 .à~.á.l.&.O.xà.=.&.?&..&.G.&..*ö 000020
 923E830A 76885657 000002C8 CBC95F5E 1A900601 06468807 75001A92 3E8304EB $à.>...u..F.....^_èùà...WV.v..>. 000040
 754006C4 830AE800 069A5098 078A2606 5EC41A6C 36FF1A6E 36FF22E8 5E75001A ..u^$".6n..6l.á^.Ī...P.ø.$..á.àu 000060
 C4078A26 065EC4C0 78044FFF 261A6C1E C42574C0 084EC688 0646FF1A 9206FF04 ......F..6N.át%á.l.&.O.xeá^.&..á 000080
 06010A46 88077500 1A923E83 CAE8E42A 05882602 478E2607 FF263F88 261A6C1E .l.&.?&..&.G.&..*öŠò.>...u..F... 0000A0
 FA4689FC 4689C028 F65689F4 46891A98 16881A96 A1560000 0CC8CBC9 5F5E1A90 ..^_èùà...VÀ.......F¶.V-+á.F=.F* 0000C0
 83057510 1BFA3E83 06762BF0 28F84689 04C48307 24003A9A F476FF52 1A9A3688 .6.¯R.v¶.:.$..á..F%+Þ+v..>*..u.. 0000E0
 1BFC3E83 1975203F 8026F45E C4227500 1A843E83 4E017508 1BFA3E83 08E802EE Ÿ.$..>*..u.N.>...u"á^¶&.?-u..>=. 000100
 077EF608 08743018 FC3E83F8 4EFF02C4 83FE71E8 0E509807 8A26F446 FF127530 0u..F¶&...P.Óq±.á..N%.>=.0t..--. 000120
 E80EFC46 FF077400 1BFA3E83 0066E80E FA46FF07 7400067E 83187400 1A843E83 .>...t..-..t..F*.Óf..>*..t..F=.Ó 000140
 39E80E04 7500FA7E 830A7400 067E8302 C483FE7E E80E5629 75001A84 3E830070 p..>...u)V.Ó-±.á..-..t..-*.u..Ó9 000160
 83FEB5E8 0EF476FF FE76FFF8 76FF0040 E80E0475 00FC7E83 0A740018 FA3E8300 ..>*..t..-=.u..Óà..v%.v-.v¶.Óç±. 000180
 74001A76 3E83C8C9 5E02C483 FE38E80E 5600201B FC06C70E 74001A84 3E8306C4 á..>...t.ú.=. .V.Ó8±.á.^èù.>v..t 0001A0
 101BFA3E 8302C483 FDC8E80E 306AC802 C483FD02 E80E5000 208803E8 00241805 .¡+.$.¡ .P.Ó@».á.ùj0.Óà».á..>*.. 0001C0
 56570000 06C8C802 C483FDAA E80E5000 788803E8 00588805 74001A72 3E83 775 u..>r..t.¡X.$.¡x.P.Ó¯».á.ùà...WV 0001E0

Dump of file SATURN:[PCCOMMON.DUMP.DLL]DAINDF.TMP;1 on 18-APR-1990 10:41:20.28
File ID (570,8,0)   End of file block 71 / Allocated 72

Virtual block number 45 (0000002D), 512 (0200) bytes

 9060E80A 46FF021A 86068337 88261A86 1EC41275 2A3F8026 0A5EC400 01FE46C7 úF±..á^.&.?*u.á...&.7......F.$'. 000000
 3F7C303C FA468807 8A260A5E 88F6280A 46FFFFFF FE46C708 75203F80 260A5EC4 á^.&.?-u.úF±...F.+-.^.&...F*<0|? 000020
 8A2618 7F 393D8026 06E8FB88 003018FC 06C70675 303C0A75 1A8C3639 387F393C <9.;96..u.<0u.ú.=.0..«$.&.=9..&. 000040
 880C468C 0A7E890F 7D303080 2647F188 30E983C8 03E1D1CE 0302E1C1 CE889805 ...öéÄ..öiÄ.à.Õ0.þG&.=0)Ó.-..F.. 000060
 46890104 88570000 04C8C8C9 5F5E0C56 880A4688 37892606 5EC4F088 EEF7FE46 F±%Ÿ.Þá^.&.7.F..V.^_èùà...W¡...F 000080
 468CFC7E 890001B8 F4750038 26117400 30802647 01E8FC7E C4064E8A FE5E8CFC =.^±.N.á-=$.G&.=.t.Ī8.u¶¡...-=.F 0000A0
 3CACD833 99C03306 76C51E56 57EC8855 90C8C95F C028FE46 8CFC7E89 9009E8FE ±$...-=.F±+à_èù.U.$WV.év.3á.3Ü¯< 0000C0
 88C888D2 01E3D11B 72302C1F 77393CAC 0175283C 04742D3C 50F77409 3CF87420  t«<.t%P<·t.<+u.¯<9w.,0r.1Ð1@.ù. 0000E0
 F700D283 D8F70775 932D3C58 0CE80002 83080307 130903D2 D1E3D102 D1E3D1FA *1Ð1@1Ð1@.1.=.Ä.@.$ÉX<-.u.%Ä.@.% 000100
 0A681E01 0C681E17 46A3E086 580000FF FF9A5016 C48850EC 8855C850 5F5E1FDA Ö.^_}ùU.$P.á.P.....X.ÀÉF..h...h. 000120
 0C9A004F 00889A50 C85DE588 00018809 D511DA9A 039EE800 21E80000 FFFF9A01 ......Ö!.Ö...Ö.f.¡...|]ùP.¡.O... 000140
 80264701 75003D80 267FFF89 010C068E FF330000 881E0112 16FF00FF 68005C0E .\.h.......£..3.....¿..&.=.u.G&. 000160
 8F1FF788 071E061C E8E774AE F2C03308 74CA88A6 F3C888D1 8805168E 31740030 =.t1/...1.ùµ1.ðt.3á·ÙtÓ$.....%.€ 000180
 9A5000FC 88EC8855 00C31FED E8AAC20A 0572412C AC9204E0 C00E7241 2CAC174D M.¯,Ar.àÀ..¯,Ar..ô'$Ú.ú.U.$¡=.P. 0001A0
 56EC8855 C850E588 0DC20E0C 9A5000FF 8805241E FF047400 05263E83 00610E0C ..=..>&..t...$.¡..P...ô..|]ùU.$V 0001C0
 88AEF2FF FF89C033 970C7496 401074C2 38AD1992 8E065688 C08ED88E 01718857 W¡q..Ä.á.V./..Ù;ôt.à.t..3á¿..·Ù. 0001E0
```

```
Dump of file SATURN:[PCCOMMON.DUMP.DLL]DAIMDF.TMP;1 on 18-APR-1990 10:41:20.28
File ID (570,8,0)   End of file block 71 / Allocated 72

Virtual block number 46 (0000002E), 512 (0200) bytes

33FA8892 1F74C008 0006000C 9A0676FF 57EC8855 0002CA50 E5885E5F 96E8E8F7 %$$._^.||ò..U.$W.v..É.ø..ât...*3 000000
CA5DE588 5F580000 FFFF9A50 1651521E 53000288 C4885049 D1F7AEF2 FFFF89C0 å¿..¯Ü%||P.ôE..S.RQ.P.....(_.||ò 000020
3C05E001 C103C001 C888F9F7 000C8999 05482004 4688195E 06FF0000 04C80002 ..à.....^..F.-H..¿..%*.àIÁ.ÈIÁ.< 000040
74D00808 57892606 47892604 5EC402C4 830E1613 959A0200 68FE5E8C FC468911 ..F=.^±h........á.á^.&.G.&.W..Ât 000060
FE5688FC 4688040A 4F802604 5EC49021 E8020002 47C726FC 5EC4080A 4F802611 .&.O..á^=&úG...$I.á^.&.O...F=.V± 000080
07892608 57882606 47882604 5EC40001 0247C726 FC5EC408 57892606 47892640 ä&.G.&.W.á^=&úG...á^.&.G.&.W.&.. 0000A0
0454E9C0 3300098A 0872174B 1E38065E 88EC8855 C3C90000 0447C726 02578926 &.W.&úG...èùU.&.^.;.K.r.ø..3óÖT. 0000C0
91E175C0 855A5900 00FFFF9A 51160C76 FF0876FF 0A76FF53 CC8804EC 830460E9 Ö'..$..äS.v..v..v..Q.....YZ.åuÁ. 0000E0
13E9C033 00098A08 7217481E 38065E88 0CEC83EC 885500C8 50E588FD 174DA780 .ÌM.=.||ù.U.&.&..^.;.K.r.ø..3óÖ. 000100
7480174D 87F60000 0EF59A50 16F4468D 51414151 51C93353 12742017 4D87F604 .-.M. t.S3èQQAAQ.F¶.P.%...-.M..t 000120
E30C4E88 F86689F2 88FA8856 57FCFC46 89FE4689 C0330856 C50A468E FA5E8C66 f.^*.F.éV.3ô.F±.F=üV.*.·.f%.N.D 000140
3800740A 3CAC0C4E 880716FA 88D488E2 2800808A DC8802EC 833875AE F20A8049 |¯.·Ùu;.&..Éø..+ã.å.*._.N.¯<.t.; 000160
0014E8E2 E8FC46FF 0A80AA00 1FE80375 F8380080 009AE900 2BE8F4E2 AA1A74F8 «t.¯ä¶Ö+.Ö..¯.;«u.Ò..¯¯..F=$äÒ.. 000180
1FE3CA28 CF881F06 1E515350 0E6D10C6 9AFFFCB8 7AE80093 E9FA5E8E 5F5EE1E8 $Å^_.^*Ö..Sz¡=..ó.m.PSQ....ü+òD. 0001A0
1F07740B 08FE5E01 F45E8811 75C00800 000E369A 5016F446 8051521E 53065E88 .^.Š.RQ.F¶.P.6....âu..^¶.^±.Ut.. 0001C0
03E8001C 8A087500 098A0001 30007400 60301874 C00808C4 831FC3FA 88585859 Y(X.*ú..á..ât.=m.t.=..ø..u.ø..$. 0001E0

Dump of file SATURN:[PCCOMMON.DUMP.DLL]DAIMDF.TMP;1 on 18-APR-1990 10:41:20.28
File ID (570,8,0)   End of file block 71 / Allocated 72

Virtual block number 47 (0000002F), 512 (0200) bytes

1C8A0EE8 F803751A 3F80085E 880A5E8E 0E744017 4D87F6FE 5E8E26E8 F900208A ø .*$&.^±-.M.ät..^..^..?.u.%$.ø. 000000
0C4E8802 F7E9C85D E5880472 FA5E8E5F 5EF8668B FC462BFE 468806E8 .^C03300 .3à*$..F±+F=.f%^_.^*r..||üÖ%..N. 000020
74C0081F 071E0000 0FCD9A50 16F4468D 51521E53 0856C51E EEEBC188 04.5C908 .èu..éSŸ.éV.S.RQ.F¶.P.ë.......ât 000040
F68775C0 08F4468B C2E80020 8AC7E800 1C8ACC75 00098A00 01300074 006.3017 .=m.t.=..ø..uäø..Süø .Sô.F¶.åuñ- 000060
E9008357 56EC8855 00A3E8C0 33001C8A A6E80275 1A3F8026 DA880A74 40174D87 .M.ät..Ö&.?.u.$|ø..3ó$É.U.&VW*.Ö 000080
3302E800 01880574 40174D87 F60C7C00 F883117D 17481E38 065E88EC 88550442 8.U.&.^.;.K.)..«.|.-.M.ät.¡..$.3 0000A0
33057540 0542A1C8 5152E388 05720546 1E380872 D8280C88 5A5900C8 50E588C0 å.||ù.Y2.É+Ár.;.F.r..DRQùÀ8.äu.3 0000C0
FFFF9A52 16501653 C4885087 174DA780 04885200 02880542 2EFF5152 FC74E9C0 åÖt=RQ..8.E..R.å.ÌM.ñP.óS.P.R... 0000E0
780E885A 04794817 408F0808 81067500 02300774 00013040 81127558 C0080000 ...åXu.Ÿä=..t.=..u.Ÿ...M.KyåZ..x 000100
761EFF00 0388C28C 197E06C4 01AEE903 7319761E FF0833C2 8C197A06 C41EE319 .D.á.z..ó3Ü..v.s.ÖÜ.á.-..óÉ....v 000120
67680E01 6A087419 86301982 880073E8 19828F19 828E007C E81982BF 19828E19 .f..¢..Ö|.f..¢..Òs.¡..=..t.j..hg 000140
00001162 9A006A00 6A036A00 51E81986 8F19828E D88E00E2 88C30000 FFFF9A11 ......Û¡ä..Äf..¢..ÒQ.j.j.j..b... 000160
19868F19 868EEC88 5503E800 31E81986 8F19828E 003AE818 FE8F18FE 8EEC8855 U.$f±.¢±.Ò:.f..¢..Ò1.Š.U.&f..¢.. 000180
028807E3 19780E88 0000FFFF 9A500646 8A50C033 001AE819 868F1986 8E0023E8 Ò#.f..¢..Ò..3äP.F.P.......x.D.£. 0001A0
56570000 14C800C3 EEE81DFF F2740245 08058804 EF830E73 F738C319 761EFF00 ...v.ú;%s..ÿ....E.t·..ŠŸü.à...WV 0001C0
6AF85689 F64689F2 5689F046 89C02801 0C168800 F0E90375 010C3639 FF28F628 +-+.96..u.Öþ.....+á.Fþ.V·.F-.V%j 0001E0

Dump of file SATURN:[PCCOMMON.DUMP.DLL]DAIMDF.TMP;1 on 18-APR-1990 10:41:20.28
File ID (570,8,0)   End of file block 71 / Allocated 72

Virtual block number 48 (00000030), 512 (0200) bytes

8CE90376 7FFFFE81 461974C0 080AC483 124E14A8 9A051668 1EF676FF F876FF0C ..v%.v~.h...´.N..á..ât.F.±..v.ÖŸ 000000
26F65E88 F475003F 8026F646 FFF65EC4 0CE847EA 75003F80 26F646FF F65EC400 .á^-.F-&.?.uôGŠ.á^-.F-&.?.u¶.^-& 000020
83129313 959A56EE 5689EC46 8904C483 125D1450 9A046A50 014580BA 75003F80 .?.uø.E.Pj..P.]..á..F&.VŸV...... 000040
1953A3EE 5688EC46 886674C2 08FC4688 6D74EE46 08EC4688 FE5689FC 468902C4 á..F=.V±.F&.FŸtm.F=.ötf.F&.VŸÈS. 000060
88EC5EC4 2C74C008 0AC4830F 8214A89A 0516681E F076FFF2 76FF0C6A 19551689 ..U.j..v·.vþ.h...´.ý..á..ât,á^$. 000080
26FC46FF FC5EC407 8A26F046 FFF05EC4 04EC4683 02578926 078926FE 5688FC46 F=.V±&..&.W..F$.á^þ.Fþ&..á^=.F=& 0000A0
C95F5EA7 75003F80 26F05EC4 F475003F 8026F046 FFF05EC4 E8E80E74 C00A0788 ...ât.Šóá^þ.Fþ&.?.u¶á^þ&.?.uI^_è 0000C0
160C0808 070A0C09 0C080C07 09060005 18040203 02021601 FA70E900 028890C8 ù.¡..Öpª....................... 0000E0
09721C70 2060006C 08590057 00530052 02430041 02350212 12110010 120F1600 ..........S.A.C.R.S.W.Y.l.m p.r. 000100
8899FFFF 88174216 891749A3 16080000 080702CE 08A40084 09820A81 0A801606 ..........Ê.ó.m.....ÈI...B.¡.... 000120
1674073A 2E1875E4 0A0024B9 12E88817 49A3C850 E58899FF FF880008 E8C850E5 ||ùÒ..¡....||ùÈI.ÉÒ.¿$..ðu..:..t. 000140
00C31742 A3980147 8A2E4301 76CA3C04 728C3C43 0A76243C 0472133C F7E24343 CCä¼<.r.<$v.C<¥r.<òv.C..G..È8.ù. 000160
06468857 5602EC83 EC8855C8 5DE58801 FE4F8026 0574C308 C08C065E C4EC8855 U.&ó^..à.ùt.&.O±..||ùJ.$.$.VW.F. 000180
78E80574 0018E815 750082E8 196AA312 740025E8 08750019 6A3E831E 73FFF13D =þ.s..>j..u.Ò%.t.Èj.Ò..u.Ò..t.Òx 0001A0
43065E88 0776065E 3900F088 C85DE588 5E5F02C4 83120E15 9A9A0676 FF087500 .u..v.......á._^.||ùÈþ.9^.v..^.C 0001C0
883874FF FA8308C4 8313C917 469A5002 80510E4F 8050501E C033FE5E 89FEE383 .D±.^±3à.PP.O.Q¯.P.F.è..á..*.t8. 0001E0
```

```
Dump of file SATURN:[PCCOMMON.DUMP.DLL]DAIMDF.TMP;1 on 18-APR-1990 10:41:20.28
File ID (570,8,0)   End of file block 71 / Allocated 72

Virtual block number 49 (00000031), 512 (0200) bytes

 0C478948 480008A3 C033088E FE5E8800 08A30A8E 05740208 196EA319 6C1687C2 ò..I.Èn..@t..ÖÈ...^±.Ä3àÈ..HH.G. 000000
 064E88C0 8ED88CC3 1FD88C00 06A30000 05000AA3 01478000 02A30000 A3000AB8 ¡..È..È...G.È.....È...Ä.û.Ä.à.N. 000020
 9A0676FF 006A0876 FF006A56 00000AC8 C3098EC1 8CD20801 9AE8196E 1E8ED833 3Ü..n.Ò...@.è.lüà...Vj..v.j..v.. 000040
 83149613 959A56F8 7688902F E899C028 0674FFFF C2F7FA56 89F84689 147D1844 D.)..F%.V*%ô..t.+à.Š/..v%V...... 000060
 46889007 E808C483 13F517FC 9A50FE76 FF006A56 1274D008 FE5689FC 468902C4 Ä..F=.V±.Àt.Vj..v±P.•.%..ó.Š...F 000080
 D9F7AEF2 C033F788 067EC409 8827E30E 4E881E56 57EC8855 90CBC95E FE5688FC •.V±^èù.U.$WV..N.D'.1á~..%3à·Û%1 0000A0
 885F5E1F C188D1F7 49490474 0477FF45 3A26C933 FF448AA6 F30A76C5 FE88C803 .ù.±év.µl.D.3èÂ:E.w.t.IIKI.è.^_. 0000C0
 080E750A F9831374 C00A93FC 071E570A 7EC51E08 56880646 880E4E88 00CB50E5 Í]ù..N..F..V..é~.W..•..àt..*.u.. 0000E0
 3004D387 92F1F793 F1F70274 C0080233 92F788DA F7000283 DBF7AA20 800A7902 @y.¯·`%Ü.@.%Ö.%.3@.àt.%b.%b..Æ.0 000100
 58DA8CF2 72C73801 448DFF44 880586AC 4F0588E2 75C308C2 88AA2704 0276393C <9v..'`.ó.ùuã..O¯...D..D.;úr·.ÖX 000120
 47F626FA 5EC41CE8 F628FC5E 8CFA4689 05488856 000006C8 00CB50E5 885E5F1F ._^.|]ù.à...V¡H..F*.^•+-Š.ó^*&-G 000140
 FA463917 38168817 36A10CFA 46834601 744004C4 83146218 789A5306 0E74830A ..t..S.x.b..á.@t.F.F*.Á6...8.9F* 000160
 885756EC 8855C85D E58801FE 4F800474 D808065E 88EC8855 90CBC95E C688D876 vÀ.ó^èù.U.š.^..Ût..O±..|}ùU.$VWE 000180
 961962A3 1960A3FE 244024EB 99C03305 750176E8 00058807 1E297500 3F831960 '..7.u)..¡..Öv.u.3ä.$$@$±È'.Èb.. 0001A0
 C850E588 5E5F0009 E8C08ED8 8C064E88 19663689 FFFEFE44 C704C683 000104C7 ú....ó.ùD±±..óf..N..A.äÒ.._^.|]ù 0001C0
 D0881573 C1384843 7401A8FE 88ADFC02 7788F273 EEF983FE E180FA74 410000E9 ÕÀ.At*.Ä±.*Ÿs·.w.•Ü.±`.tCH;ès..À 0001E0

Dump of file SATURN:[PCCOMMON.DUMP.DLL]DAIMDF.TMP;1 on 18-APR-1990 10:41:20.28
File ID (570,8,0)   End of file block 71 / Allocated 72

Virtual block number 50 (00000032), 512 (0200) bytes

 8948C128 FE4C89F9 030C74FE 88E6E8FE 4489F788 000205C2 03357401 A8ADF003 .ÞÙ´.tS.ô....%.D±Š|.±t..*.L±+èH. 000000
 7206C626 C3027F89 196E1E8C 26057401 38116889 DA8CC688 FE4CFEF9 0305E805 .Š..*±L±.ó.Ö¿h.;|t.&..n....ù&ó.r 000020
 E27401A8 ADF00300 888C73C1 3848FE88 F27401A8 ADF003FE 882574FF FE300219 ..=±.tX.±.ÞÙ´.t`.±H;ês¥.À.ÞÙ´.tä 000040
 D88C1274 19720EFE 2615E8D8 8E0474C0 08084788 E6E8FE44 89F78800 0205C203 .ô....%.D±Š|.G..ät..ÀŠ.&±.r.t..À 000060
 40400124 0074C638 006BE8C0 3306778B 8BE83788 196A1E8E 260574C7 3816208F €·.;út.&..j..7ŠE.w.3àÖk.;ót.$.@@ 000080
 196EA326 0474C138 16818908 8C98E84E 4E960574 001DE8FE 4DFE0074 005FE898 .Ò_.t.±M±Ò..t..NNŠ..Ä¿..;ét.&Èn. 0000A0
 04761970 1638267F FF8A4141 49C82803 7401A8FE 458851C3 99C03302 47890788 ..¯G.3ä.ùQ.E±`.t.+à|AAp..&;.p.v. 0000C0
 33E575EA D1D2F708 75000CE8 C628C223 02F70072 C2031572 C603C188 F575EAD1 |ôu%.è.ór..ór.%@#ô+6Ò..u.%@|ôu|3 0000E0
 55894AD7 28D68806 7789FFFE FE44C7F2 03F088FE 88571874 001DE851 52C359C0 àYÜRQÒ..t.W.±.Þ.`ùD±±..w..ø+•J.U 000100
 5A1FFFFA 8308C483 15691746 9A1F0650 00018850 52521ED2 335053C3 5A5958FE ±XYZùSP3@.RRP¡..P...F.i..ó..*..Z 000120
 57E80775 48064688 08568801 148F3875 000A7E83 065756EC 8855C302 0802745B [t..@ùU.$VW..~..uß¢...V..F.Hu.ÒW 000140
 04C68334 735E003E E8560E46 89024488 0074F738 11744805 1436884C E8277200 .r'ŠL.6..Ht.;%t..D..F.VÒ>.^s4.6. 000160
 F95B0000 FFFF9A50 C0335016 52C48850 21E899FF FF880675 D2080473 0514FE81 .±..s..@u.¡...Š!P.6R.P3àP.....(* 000180
 024C39F7 880E4E88 CB5DE588 5E5F07C0 33038805 14368902 5C891489 E675C085 .àul...\..6...Æ3à._^.|]ù.N..%9L. 0001A0
 010E1E39 0675F738 C18ED388 26721C03 DA882CEB F9F27505 14FE8104 C6830C74 t..6..±..u·*Š,.Ö..r̄Æ.Æ.è;%u.9... 0001C0
 88EC8855 00C3D188 04879201 0E168904 75F7380E 75C08500 00FFFF9A 51531373 s.SQ......àuß;%u.........|ù.U.š. 0001E0

Dump of file SATURN:[PCCOMMON.DUMP.DLL]DAIMDF.TMP;1 on 18-APR-1990 10:41:20.28
File ID (570,8,0)   End of file block 71 / Allocated 72

Virtual block number 51 (00000033), 512 (0200) bytes

 D1E08A0A 46880128 D187D103 D323081B D1280C74 DAF70788 067EC457 38E30C4E N.D8Wá-...@% Öt.+ì.ÙWÆ.ì.ì+ì.F..Äì 000000
 88064688 5FAAF3C9 13ABF3E9 D1C38EFF FFC381C3 8C10E301 87AAF3C9 13ABF3E9 Öµ¨.èµ`.ìD..û.û...ûìÖµ¨.èµ`.F.. 000020
 F70008CA 5DE588E3 F7064688 08750A5E 8808080C 5E880846 88EC8855 CB5D0856 V.]ùU.š.F..^..Ä.^.u..F.%D.|]ò..% 000040
 C4F62856 000004C? 0008CA5D E5880103 E3F70646 88C8030C 66F70646 88C888E3 D.à.F.%f..à.F.%D.ì.|]ò..à...V+-ó 000060
 D868F9F7 000CB9? 05482DC3 88157508 0A47F626 5575023C 03240A47 8A26065E ^.&.G.$.<.ùU&-G..u..û-H..¿..%*kÄ 000080
 FF260877 FF265028 7EC008FC 46890647 28260788 26065E88 39740111 3C87F606 .-.<..t9.^.&..&+G..F•.â-(P&.w.&. 0000A0
 FF8E200A 4F802606 5EC40874 FC463808 C4831736 0F0A9A50 E42A0847 8A260677 w.&.G.*ÓP...ó..ó.;F•t.ó^.&.O. ƒ. 0000C0
 000CC8C9 5EC68800 000447C7 26025789 26078926 08578826 06478826 065EC4FF .á^.&.G.&.W.&..&.W.&ùG....ó^èù.. 0000E0
 00000006 16860002 00070002 117C0103 00050002 11840103 00000004 18CC0002 ..ä.......Ç........|........Ñ..... 000100
 00880002 182F0105 0478000A 10560203 00260002 17E50103 00220002 179A0103 ......"...|...&...V...x.../..... 000120
 005C0002 002F0103 00580002 00420103 004D0002 10FE0103 003A0002 0F360103 ..6...:...±...M...B...(.../...\. 000140
 6F43202D 20797261 7262694C 20656069 54206E75 52205340 00000000 00000000 ........MS Run-Time Library - Co 000160
 70726F43 2074666F 736F7263 6940202C 38383931 20296328 20746867 69727970 pyright (c) 1988, Microsoft Corp 000180
 012F0000 00CE0048 00000000 00000000 0000012E 0120012C 00740071 00480011 ..K.q.t.,.·............K.ö.Å./. 0001A0
 00000000 00000134 01330132 00050003 00800000 00000000 00000000 01310130 0.1.............Æ.(.2.3.4....... 0001C0
 000F0000 00800000 00000000 00000000 01370136 0135000A 00080080 00000000 ......A.0.5.6.7..............ì.Ô. 0001E0
```

```
Dump of file SATURN:[PCCOMMON.DUMP.DLL]DAIMDF.TMP;1 on 18-APR-1990 10:41:20.28
File ID (570,8,0)   End of file block 71 / Allocated 72

Virtual block number 52 (00000034), 512 (0200) bytes

 00000000 00ED00EC 00E800EA 00E8004B 00000000 00000000 0000013A 01390138 8.9.:...........K.Ò.ò.Š.ë.Ú..... 000000
 00000093 00920091 0090008E 00480000 FFFF0004 0006002B 00080000 00000000 ........+.........K............. 000020
 756E2800 296C6C75 6E280000 00000000 00000000 00000000 00000000 00000000 ......................(null).(nu 000040
 00000000 00000000 19881C00 11971C00 1C000000 00000000 2320202B 00296C6C ll).+- #........................ 000060
 00000000 00000000 00000000 00000000 00000000 00000000 00000000 00000000 ................................ 000080
 00000000 00000000 00000000 00000000 00000000 00000000 00000000 00000000 ................................ 0000A0
 00000000 00000000 00000000 00000000 00000000 00000000 00000000 00000000 ................................ 0000C0
 00000000 00000000 00000000 00000000 00000000 00000000 00000000 00000000 ................................ 0000E0
 00000000 00000000 00000000 00000000 00000000 00000000 00000000 00000000 ................................ 000100
 00000000 00000000 00000000 00000000 00000000 00000000 00000000 00000000 ................................ 000120
 00000000 00000000 00000000 00000000 00000000 00000000 00000000 00000000 ................................ 000140
 00000000 00000000 00000000 00000000 00000000 00000000 00000000 00000000 ................................ 000160
 00000000 00000000 00000000 00000000 00000000 00000000 00000000 00000000 ................................ 000180
 00000000 00000000 00000000 00000000 00000000 00000000 00000000 00000000 ................................ 0001A0
 00000000 00000000 00000000 00000000 00000000 00000000 00000000 00000000 ................................ 0001C0
 00000000 00000000 00000000 00000000 00000000 00000000 00000000 00000000 ................................ 0001E0

Dump of file SATURN:[PCCOMMON.DUMP.DLL]DAIMDF.TMP;1 on 18-APR-1990 10:41:20.28
File ID (570,8,0)   End of file block 71 / Allocated 72

Virtual block number 53 (00000035), 512 (0200) bytes

 00000000 00000000 00000000 00000000 00000000 00000000 00000000 00000000 ................................ 000000
 00000000 00000000 00000000 00000000 00000000 00000000 00000000 00000000 ................................ 000020
 00000000 00000000 00000000 00000000 00000000 00000000 00000000 00000000 ................................ 000040
 00000000 00000000 00000000 00000000 00000000 00000000 00000000 00000000 ................................ 000060
 00000000 00000000 00000000 00000000 00000000 00000000 00000000 00000000 ................................ 000080
 00000000 00000000 00000000 00000000 00000000 00000000 00000000 00000000 ................................ 0000A0
 00000000 00000000 00000000 00000000 00000000 00000000 00000000 00000000 ................................ 0000C0
 00000000 00000000 00000000 00000000 00000000 00000000 00000000 00000000 ................................ 0000E0
 00000000 00000000 00000000 00000000 00000000 00000000 00000000 00000000 ................................ 000100
 00000000 00000000 00000000 00000000 00000000 00000000 00000000 00000000 ................................ 000120
 00000000 00000000 00000000 00000000 00000000 00000000 00000000 00000000 ................................ 000140
 00000000 00000000 00000000 00000000 00000000 00000000 00000000 00000000 ................................ 000160
 00000000 00000000 00000000 00000000 00000000 00000000 00000000 00000000 ................................ 000180
 00000000 00000000 00000000 00000000 00000000 00000000 00000000 00000000 ................................ 0001A0
 00000000 00000000 00000000 00000000 00000000 00000000 00000000 00000000 ................................ 0001C0
 00000000 00000000 00000000 00000000 00000000 00000000 00000000 00000000 ................................ 0001E0

Dump of file SATURN:[PCCOMMON.DUMP.DLL]DAIMDF.TMP;1 on 18-APR-1990 10:41:20.28
File ID (570,8,0)   End of file block 71 / Allocated 72

Virtual block number 54 (00000036), 512 (0200) bytes

 00000000 00000000 00000000 00000000 00000000 00000000 00000000 00000000 ................................ 000000
 00000000 00000000 00000000 00000000 00000000 00000000 00000000 00000000 ................................ 000020
 00000000 00000000 00000000 00000000 00000000 00000000 00000000 00000000 ................................ 000040
 4E495F45 4C49465F 435F0114 00000000 00000000 00000000 00000000 00000000 ......................C_FILE_IN 000060
 00000000 053612E2 053212E2 052E12E2 052A12E2 FFFF12E2 00000000 00304F46 FO=.....â...â.*.â...â.2.â.6..... 000080
 01020000 00000000 00000000 00011986 00000000 05500000 0200FFFF FFFF0101 ..........P..................... 0000A0
 00000000 00000000 00000000 00000000 00000000 02020000 00000000 00000000 ................................ 0000C0
 00000000 00000000 00000000 00000000 00000000 00000000 00000000 00000000 ................................ 0000E0
 00000000 00000000 00000000 00000000 00000000 00000000 00000000 00000000 ................................ 000100
 00000000 00000000 00000000 00000000 00000000 00000000 00000000 00000000 ................................ 000120
 00000000 00000000 00000000 00000000 00000000 00000000 00000000 00000000 ................................ 000140
 00000000 00000000 00000000 00000000 00000000 00000000 00000000 00000000 ................................ 000160
 00000000 00000000 00000000 00000000 00000000 00000000 00000000 00000000 ................................ 000180
 00000000 00000000 00000000 00000000 00000000 00000000 00000000 00000000 ................................ 0001A0
 00000000 00000000 00000000 00000000 00000000 00000000 00000000 00000000 ................................ 0001C0
 00000000 00000000 00000000 00000000 00000000 00000000 00000000 00000000 ................................ 0001E0
```

```
Dump of file SATURN:[PCCOMMON.DUMP.DLL]DAIMDF.TMP;1 on 18-APR-1990 10:41:20.28
File ID (570,8,0)   End of file block 71 / Allocated 72

Virtual block number 55 (00000037), 512 (0200) bytes

 00000000 00000000 00000000 00000000 00000000 00000000 00000000 00000000 ................................ 000000
 00000000 00000000 00000000 00000000 00000000 00000000 00000000 00000000 ................................ 000020
 00000000 00000000 00000000 00000000 00000000 00000000 00000000 00000000 ................................ 000040
 00000000 00000000 00000000 00000000 00000000 00000000 00000000 00000000 ................................ 000060
 00000000 00000000 00000000 00000000 00000000 00000000 00000000 00000000 ................................ 000080
 00000000 00000000 00000000 00000000 00000000 00000000 00000000 00000000 ................................ 0000A0
 00000000 00000000 00000000 00000000 00000000 00000000 00000000 00000000 ................................ 0000C0
 00000000 00000000 00000000 00000000 00000000 00000000 00000000 00000000 ................................ 0000E0
 00000000 00000000 00000000 00000000 00000000 00000000 00000000 00000000 ................................ 000100
 00000000 00000000 00000000 00000000 00000000 00000000 00000000 00000000 ................................ 000120
 00000000 00000000 00000000 00000000 00000000 00000000 00000000 00000000 ................................ 000140
 00000000 00000000 00000000 00000000 00000000 00000000 00000000 00000000 ................................ 000160
 00000000 00000000 00000000 00000000 00000000 00000000 00000000 00000000 ................................ 000180
 00000000 00000000 00000000 00000000 00000000 00000000 00000000 00000000 ................................ 0001A0
 00000000 00000000 00000000 00000000 00000000 00000000 00000000 00000000 ................................ 0001C0
 00000000 00000000 00000000 00000000 00000000 00000000 00000000 00000000 ................................ 0001E0

Dump of file SATURN:[PCCOMMON.DUMP.DLL]DAIMDF.TMP;1 on 18-APR-1990 10:41:20.28
File ID (570,8,0)   End of file block 71 / Allocated 72

Virtual block number 56 (00000038), 512 (0200) bytes

 00000000 00000000 00000000 00000000 00000000 00000000 00000000 00000000 ................................ 000000
 00000000 00000000 00000000 00000000 00000000 00000000 00000000 00000000 ................................ 000020
 00000000 00000000 00000000 00000000 00000000 00000000 00000000 00000000 ................................ 000040
 00000000 00000000 00000000 00000000 00000000 00000000 00000000 00000000 ................................ 000060
 00000000 00000000 00000000 00000000 00000000 00000000 00000000 00000000 ................................ 000080
 00000000 00000000 00000000 00000000 00000000 00000000 00000000 00000000 ................................ 0000A0
 00000000 00000000 00000000 00000000 00000000 00000000 00000000 00000000 ................................ 0000C0
 00000000 00000000 00000000 00000000 00000000 00000000 00000000 00000000 ................................ 0000E0
 00000000 00000000 00000000 00000000 00000000 00000000 00000000 00000000 ................................ 000100
 00000000 00000000 00000000 00000000 00000000 00000000 00000000 00000000 ................................ 000120
 00000000 00000000 00000000 00000000 00000000 00000000 00000000 00000000 ................................ 000140
 00000000 00000000 00000000 00000000 00000000 00000000 00000000 00000000 ................................ 000160
 00000000 00000000 00000000 00000000 00000000 00000000 00000000 00000000 ................................ 000180
 00000000 00000000 00000000 00000000 00000000 00000000 00000000 00000000 ................................ 0001A0
 00000000 00000000 00000000 00000000 00000000 00000000 00000000 00000000 ................................ 0001C0
 00000000 00000000 00000000 00000000 00000000 00000000 00000000 00000000 ................................ 0001E0

Dump of file SATURN:[PCCOMMON.DUMP.DLL]DAIMDF.TMP;1 on 18-APR-1990 10:41:20.28
File ID (570,8,0)   End of file block 71 / Allocated 72

Virtual block number 57 (00000039), 512 (0200) bytes

 00000000 00000000 00000000 00000000 00000000 00000000 00000000 00000000 ................................ 000000
 00000000 00000000 00000000 00000000 00000000 00000000 00000000 00000000 ................................ 000020
 00000000 00000000 00000000 00000000 00000000 00000000 00000000 00000000 ................................ 000040
 00000000 00000000 00000000 00000000 00000000 00000000 00000000 00000000 ................................ 000060
 00000000 00000000 00000000 00000000 00000000 00000000 00000000 00000000 ................................ 000080
 00000000 00000000 00000000 00000000 00000000 00000000 00000000 00000000 ................................ 0000A0
 00000000 00000000 00000000 00000000 00000000 00000000 00000000 00000000 ................................ 0000C0
 00000000 00000000 00000000 00000000 00000000 00000000 00000000 00000000 ................................ 0000E0
 00000000 00000000 00000000 00000000 00000000 00000000 00000000 00000000 ................................ 000100
 00000000 00000000 00000000 00000000 00000000 00000000 00000000 00000000 ................................ 000120
 00000000 00000000 00000000 00000000 00000000 00000000 00000000 00000000 ................................ 000140
 00000000 00000000 00000000 00000000 00000000 00000000 00000000 00000000 ................................ 000160
 00000000 00000000 00000000 00000000 00000000 00000000 00000000 00000000 ................................ 000180
 00000000 00000000 00000000 00000000 00000000 00000000 00000000 00000000 ................................ 0001A0
 00000000 00000000 00000000 00000000 00000000 00000000 00000000 00000000 ................................ 0001C0
 00000000 00000000 00000000 00000000 00000000 00000000 00000000 00000000 ................................ 0001E0
```

```
Dump of file SATURN:[PCCOMMON.DUMP.DLL]DAIMDF.TMP;1 on 18-APR-1990 10:41:20.28
File ID (570,8,0)   End of file block 71 / Allocated 72

Virtual block number 58 (0000003A), 512 (0200) bytes

00000000 00000000 00000000 00000000 00000000 00000000 00000000 00000000 ................................ 000000
00000000 00000000 00000000 00000000 00000000 00000000 00000000 00000000 ................................ 000020
00000000 00000000 00000000 00000000 00000000 00000000 00000000 00000000 ................................ 000040
00000000 00000000 00000000 00000000 00000000 00000000 00000000 00000000 ................................ 000060
00000000 00000000 00000000 00000000 00000000 00000000 00000000 00000000 ................................ 000080
00000000 00000000 00000000 00000000 00000000 00000000 00000000 00000000 ................................ 0000A0
00000000 00000000 00000000 00000000 00000000 00000000 00000000 00000000 ................................ 0000C0
00000000 00000000 00000000 00000000 00000000 00000000 00000000 00000000 ................................ 0000E0
00000000 00000000 00000000 00000000 00000000 00000000 00000000 00000000 ................................ 000100
00000000 00000000 00000000 00000000 00000000 00000000 00000000 00000000 ................................ 000120
00000000 00000000 00000000 00000000 00000000 00000000 00000000 00000000 ................................ 000140
00000000 00000000 00000000 00000000 00000000 00000000 00000000 00000000 ................................ 000160
00000000 00000000 00000000 00000000 00000000 00000000 00000000 00000000 ................................ 000180
00000000 00000000 00000000 00000000 00000000 00000000 00000000 00000000 ................................ 0001A0
00000000 00000000 00000000 00000000 00000000 00000000 00000000 00000000 ................................ 0001C0
00000000 00000000 00000000 00000000 00000000 00000000 00000000 00000000 ................................ 0001E0

Dump of file SATURN:[PCCOMMON.DUMP.DLL]DAIMDF.TMP;1 on 18-APR-1990 10:41:20.28
File ID (570,8,0)   End of file block 71 / Allocated 72

Virtual block number 59 (0000003B), 512 (0200) bytes

00000000 00000000 00000000 00000000 00000000 00000000 00000000 00000000 ................................ 000000
00000000 00000000 00000000 00000000 00000000 00000000 00000000 00000000 ................................ 000020
00000000 00000000 00000000 00000000 00000000 00000000 00000000 00000000 ................................ 000040
00000000 00000000 00000000 00000000 00000000 00000000 00000000 00000000 ................................ 000060
00000000 00000000 00000000 00000000 00000000 00000000 00000000 00000000 ................................ 000080
00000000 00000000 00000000 00000000 00000000 00000000 00000000 00000000 ................................ 0000A0
00000000 00000000 00000000 00000000 00000000 00000000 00000000 00000000 ................................ 0000C0
00000000 00000000 00000000 00000000 00000000 00000000 00000000 00000000 ................................ 0000E0
00000000 00000000 00000000 00000000 00000000 00000000 00000000 00000000 ................................ 000100
00000000 00000000 00000000 00000000 00000000 00000000 00000000 00000000 ................................ 000120
00000000 00000000 00000000 00000000 00000000 00000000 00000000 00000000 ................................ 000140
00000000 00000000 00000000 00000000 00000000 00000000 00000000 00000000 ................................ 000160
00000000 00000000 00000000 00000000 00000000 00000000 00000000 00000000 ................................ 000180
00000000 00000000 00000000 00000000 00000000 00000000 00000000 00000000 ................................ 0001A0
00000000 00000000 00000000 00000000 00000000 00000000 00000000 00000000 ................................ 0001C0
00000000 00000000 00000000 00000000 00000000 00000000 00000000 00000000 ................................ 0001E0

Dump of file SATURN:[PCCOMMON.DUMP.DLL]DAIMDF.TMP;1 on 18-APR-1990 10:41:20.28
File ID (570,8,0)   End of file block 71 / Allocated 72

Virtual block number 60 (0000003C), 512 (0200) bytes

00000000 00000000 00000000 00000000 00000000 00000000 00000000 00000000 ................................ 000000
00000000 00000000 00000000 00000000 00000000 00000000 00000000 00000000 ................................ 000020
00000000 00000000 00000000 00000000 00000000 00000000 00000000 00000000 ................................ 000040
00000000 00000000 00000000 00000000 00000000 00000000 00000000 00000000 ................................ 000060
02000001 00000000 00000000 00000000 00000000 00000000 00000000 00000000 ................................ 000080
00000000 00000000 00000000 00000000 00000000 00000000 00000000 00000000 ................................ 0000A0
00000000 00000000 00000000 00000000 00000000 00000000 00000000 00000000 ................................ 0000C0
00000000 00000000 00000000 00000000 00000000 00000000 00000000 00000000 ................................ 0000E0
00000000 00000000 00000000 00000000 00000000 00000000 00000000 00000000 ................................ 000100
00000000 00000000 00000000 00000000 00000000 00000000 00000000 00000000 ................................ 000120
00000000 00000000 00000000 00000000 00000000 00000000 00000000 00000000 ................................ 000140
00000000 00000000 00000000 00000000 00000000 00000000 00000000 00000000 ................................ 000160
00000000 00000000 00000000 00000000 00000000 00000000 00000000 00000000 ................................ 000180
00000000 00000000 00000000 00000000 00000000 00000000 00000000 00000000 ................................ 0001A0
00000000 00000000 00000000 00000000 00000000 00000000 00000000 00000000 ................................ 0001C0
00000000 00000000 00000000 00000000 00000000 00000000 00000000 00000000 ................................ 0001E0
```

```
Dump of file SATURN:[PCCOMMON.DUMP.DLL]DAIMDF.TMP;1 on 18-APR-1990 10:41:20.28
File ID (570,8,0)   End of file block 71 / Allocated 72

Virtual block number 61 (0000003D), 512 (0200) bytes

00000000 00000000 00000000 00000000 00000000 00000000 00000000 00000000 ................................ 000000
00000000 00000000 00000000 00000000 00000000 00000000 00000000 00000000 ................................ 000020
00000000 00000000 00000000 00000000 00000000 00000000 00000000 00000000 ................................ 000040
00000000 00000000 00000000 00000000 00000000 00000000 00000000 00000000 ................................ 000060
00000000 00000000 00000000 00000000 00000000 00000000 00000000 00000000 ................................ 000080
00000000 00000000 00000000 00000000 00000000 00000000 00000000 00000000 ................................ 0000A0
00000000 00000000 00000000 00000000 00000000 00000000 00000000 00000000 ................................ 0000C0
00000000 00000000 00000000 00000000 00000000 00000000 00000000 00000000 ................................ 0000E0
00000000 00000000 00000000 00000000 00000000 00000000 00000000 00000000 ................................ 000100
00000000 00000000 00000000 00000000 00000000 00000000 00000000 00000000 ................................ 000120
00000000 00000000 00000000 00000000 00000000 00000000 00000000 00000000 ................................ 000140
00000000 00000000 00000000 00000000 00000000 00000000 00000000 00000000 ................................ 000160
00000000 00000000 00000000 00000000 00000000 00000000 00000000 00000000 ................................ 000180
00000000 00000000 00000000 00000000 00000000 00000000 00000000 00000000 ................................ 0001A0
00000000 00000000 00000000 00000000 00000000 00000000 00000000 00000000 ................................ 0001C0
00000000 00000000 00000000 00000000 00000000 00000000 00000000 00000000 ................................ 0001E0

Dump of file SATURN:[PCCOMMON.DUMP.DLL]DAIMDF.TMP;1 on 18-APR-1990 10:41:20.28
File ID (570,8,0)   End of file block 71 / Allocated 72

Virtual block number 62 (0000003E), 512 (0200) bytes

00000000 00000000 00000000 00000000 00000000 00000000 00000000 00000000 ................................ 000000
00000000 00000000 00000000 00000000 00000000 00000000 00000000 00000000 ................................ 000020
00000000 00000000 00000000 00000000 00000000 00000000 00000000 00000000 ................................ 000040
00000000 00000000 00000000 00000000 00000000 00000000 00000000 00000000 ................................ 000060
00000000 00000000 00000000 00000000 00000000 00000000 00000000 00000000 ................................ 000080
00000000 00000000 00000000 00000000 00000000 00000000 00000000 00000000 ................................ 0000A0
00000000 00000000 00000000 00000000 00000000 00000000 00000000 00000000 ................................ 0000C0
00000000 00000000 00000000 00000000 00000000 00000000 00000000 00000000 ................................ 0000E0
00000000 00000000 00000000 00000000 00000000 00000000 00000000 00000000 ................................ 000100
00000000 00000000 00000000 00000000 00000000 00000000 00000000 00000000 ................................ 000120
00000000 00000000 00000000 00000000 00000000 00000000 00000000 00000000 ................................ 000140
00000000 00000000 00000000 00000000 00000000 00000000 00000000 00000000 ................................ 000160
00000000 00000000 00000000 00000000 00000000 00000000 00000000 00000000 ................................ 000180
00000000 00000000 00000000 00000000 00000000 00000000 00000000 00000000 ................................ 0001A0
00000000 00000000 00000000 00000000 00000000 00000000 00000000 00000000 ................................ 0001C0
00000000 00000000 00000000 00000000 00000000 00000000 00000000 00000000 ................................ 0001E0

Dump of file SATURN:[PCCOMMON.DUMP.DLL]DAIMDF.TMP;1 on 18-APR-1990 10:41:20.28
File ID (570,8,0)   End of file block 71 / Allocated 72

Virtual block number 63 (0000003F), 512 (0200) bytes

00000000 00000000 00000000 00000000 00000000 00000000 00000000 00000000 ................................ 000000
00000000 00000000 00000000 00000000 00000000 00000000 00000000 00000000 ................................ 000020
00000000 00000000 00000000 00000000 00000000 00000000 00000000 00000000 ................................ 000040
00000000 00000000 00000000 00000000 00000000 00000000 00000000 00000000 ................................ 000060
00000000 00000116 11300000 00000000 00000000 00000000 00000000 00000000 ....................0........... 000080
00000000 00000000 00000000 00000000 81818101 00000001 00000000 00000000 ................................ 0000A0
00000000 00000000 00000000 00000000 00000000 00000000 00000000 00000000 ................................ 0000C0
00000000 00000000 00000000 00000000 00000000 00000000 00000000 00000000 ................................ 0000E0
00000000 00000000 00000000 00000000 00000000 00000000 00000000 00000000 ................................ 000100
00000000 00000000 00000000 00000000 00000000 00000000 00000000 00000000 ................................ 000120
00000000 00000000 00000000 00000000 00000000 00000000 00000000 00000000 ................................ 000140
00000000 00000000 00000000 00000000 00000000 00000000 00000000 00000000 ................................ 000160
00000000 00000000 00000000 00000000 00000000 00000000 00000000 00000000 ................................ 000180
0A0A0A0A 0A0A0A0A 0A0A0A0A 0A0A0A0A 0A0A0A00 00000000 00000000 00000000 ................................ 0001A0
0A0A0A0A 0A0A0A0A 0A0A0A0A 0A0A0A0A 0A0A0A0A 0A0A0A0A 0A0A0A0A 0A0A0A0A ................................ 0001C0
0A0A0A0A 0A0A0A0A 0A0A0A0A 0A0A0A0A 0A0A0A0A 0A0A0A0A 0A0A0A0A 0A0A0A0A ................................ 0001E0
```

```
Dump of file SATURN:[PCCOMMON.DUMP.DLL]DAIMDF.TMP;1 on 18-APR-1990 10:41:20.28
File ID (570,8,0)   End of file block 71 / Allocated 72

Virtual block number 64 (00000040), 512 (0200) bytes

 0A0A0A0A 0A0A0A0A 0A0A0A0A 0A0A0A0A 0A0A0A0A 0A0A0A0A 0A0A0A0A 0A0A0A0A ................................ 000000
 0A0A0A0A 0A0A0A0A 0A0A0A0A 0A0A0A0A 0A0A0A0A 0A0A0A0A 0A0A0A0A 0A0A0A0A ................................ 000020
 0A0A0A0A 0A0A0A0A 0A0A0A0A 0A0A0A0A 0A0A0A0A 0A0A0A0A 0A0A0A0A 0A0A0A0A ................................ 000040
 0A0A0A0A 0A0A0A0A 0A0A0A0A 0A0A0A0A 0A0A0A0A 0A0A0A0A 0A0A0A0A 0A0A0A0A ................................ 000060
 0A0A0A0A 0A0A0A0A 0A0A0A0A 0A0A0A0A 0A0A0A0A 0A0A0A0A 0A0A0A0A 0A0A0A0A ................................ 000080
 00000000 00000000 00000000 00000000 0000000A 0A0A0A0A 0A0A0A0A 0A0A0A0A ................................ 0000A0
 00000000 00000000 00000000 00002000 00000000 00000000 00000000 00000000 ................ ............... 0000C0
 61747320 200A0030 30303652 00003E3E 47534D4E 3C3CFFFF FFFF053A 15480000 ..H.:.....<<NMSG>>..R6000..- sta 0000E0
 72656765 746E6920 200A0033 30303652 0003000A 0D776F6C 66726576 6F206B63 ck overflow.....R6003..- integer 000100
 6E652074 6F6E2020 0A0D3830 30365200 08000A00 30207962 20656469 76696420  divide by 0.....R6008..- not en 000120
 30365200 09000A00 73746E65 6D756772 6120726F 66206563 61707320 6867756F ough space for arguments.....R60 000140
 7269766E 6520726F 66206563 61707320 6867756F 6E652074 6F6E2020 0A0D3930 09..- not enough space for envir 000160
 0020726F 72726520 656D6974 2D6E7572 00FF000A 0D00FC00 0A0D746E 656D6E6F onment...*......run-time error . 000180
 6F6C2074 6F6E2074 6E696F70 20676E69 74616F6C 6620200A 00323030 36520002 ..R6002..- floating point not lo 0001A0
 054A0002 00000004 19840002 03C60008 00CE0203 0004FFFF FF000A00 64656461 aded..........ö...Ö..........J. 0001C0
 20797469 746E4520 6464411B 00010352 00000000 00000006 17380002 00000005 ......8.........R....Add Entity  0001E0

Dump of file SATURN:[PCCOMMON.DUMP.DLL]DAIMDF.TMP;1 on 18-APR-1990 10:41:20.28
File ID (570,8,0)   End of file block 71 / Allocated 72

Virtual block number 65 (00000041), 512 (0200) bytes

 20797469 746E4520 6563616C 7065521F 0060726F 4620676E 6F4C204D 49206E69 in IM Long Form..Replace Entity  000000
 69207974 69746E45 20657465 6C65441E 0060726F 4620676E 6F4C204D 49206E69 in IM Long Form..Delete Entity i 000020
 6E692065 74756269 72747441 20646441 1E006D72 6F462067 6E6F4C20 4D49206E n IM Long Form..Add Attribute in 000040
 65747562 69727474 41206563 616C7065 5222006D 726F4620 676E6F4C 204D4920  IM Long Form."Replace Attribute 000060
 75626972 74744120 6574656C 65442100 6D726F46 20676E6F 4C204D49 206E6920  in IM Long Form.!Delete Attribu 000080
 69206E69 616D6F44 20646441 1B006D72 6F462067 6E6F4C20 4D49206E 69206574 te in IM Long Form..Add Domain i 0000A0
 69206E69 616D6F44 20656361 6C706552 1F006D72 6F462067 6E6F4C20 4D49206E n IM Long Form..Replace Domain i 0000C0
 6E69206E 6961606F 44206574 656C6544 1E006D72 6F462067 6E6F4C20 4D49206E n IM Long Form..Delete Domain in 0000E0
 206E6920 6E6F6973 6E656D69 44206464 411E006D 726F4620 676E6F4C 204D4920  IM Long Form..Add Dimension in  000100
 206E6F69 736E656D 69442065 63616C70 65522200 6D726F46 20676E6F 4C204D49 IM Long Form."Replace Dimension  000120
 6F69736E 656D6944 20657465 6C654421 0060726F 4620676E 6F4C204D 49206E69 in IM Long Form.!Delete Dimensio 000140
 65686369 6C632067 6E696464 4149006D 726F4620 676E6F4C 204D4920 6E69206E n in IM Long Form.IAdding clicke 000160
 73696C20 7463656C 6573206F 74206D65 74692078 6F622074 73696C20 6E6F2D64 d-on list box item to select lis 000180
 6168431E 006D726F 6620676E 6F6C206C 65646F6D 20617461 64206D6F 72662074 t from data model long form..Cha 0001A0
 656A624F 28006C65 646F4D20 61746144 20666F20 656D616E 20656874 2065676E nge the name of Data Model.(Obje 0001C0
 646F6D20 73696874 206E6920 73747369 78652079 64616572 6C612073 25207463 ct %s already exists in this mod 0001E0

Dump of file SATURN:[PCCOMMON.DUMP.DLL]DAIMDF.TMP;1 on 18-APR-1990 10:41:20.28
File ID (570,8,0)   End of file block 71 / Allocated 72

Virtual block number 66 (00000042), 512 (0200) bytes

 656F6420 73252074 63656A62 4F280352 00000000 00000000 00000000 002E6C65 el..............R.(Object %s doe 000000
 656A624F 28002E6C 65646F6D 20736968 74206E69 20747369 78652074 6F6E2073 s not exist in this model..+Obje 000020
 77656E20 68746977 20646563 616C7065 72206E65 65622073 61682073 25207463 ct %s has been replaced with new 000040
 63656C65 73206E65 65622073 61682074 63656A62 6F206F4E 2F002E65 6D616E20  name../No object has been selec 000060
 72612073 656D614E 30002E6E 6F697461 7265706F 20656874 20726F66 20646574 ted for the operation..0Names ar 000080
 696C2064 6E612079 72746E65 206E6565 77746562 20746E65 72656666 69642065 e different between entry and li 0000A0
 00010001 00010001 00010001 00010001 00010001 00010001 002E786F 62207473 st box.......................... 0000C0
 00981400 00900874 00000001 00000044 00000000 FFFF0001 000E0352 00000A05 ....R...........D.......$....... 0000E0
 03190005 800100 1 08290010 00050000 00000000 0825FFFF 00080335 00FAFFBB £.*.5.....%...........)......... 000100
 0080030E 000580U2 000C083A 00000006 00000000 0000FFFF FFFF0060 00080054 T...m..............:............ 000120
 00080034 02FE0005 80010001 0838000C 00050000 00000000 FFFFFFFF 006E0008 ..n...............;........±.4... 000140
 007A0030 00F002CC 00058003 00070848 0000000A 00000000 0000FFFF FFFF0079 y...............H........a.Þ.0.z. 000160
 FFFF0070 0008002A 028C0005 80010001 08490008 00050000 00000000 FFFFFFFF ..............I.......¥.*...p... 000180
 FFFFFFFF 00710008 00C102B0 00078002 000C0852 00000006 00000000 0000FFFF ............R.........é...q..... 0001A0
 0000FFFF FFFF0073 00080064 02A40005 80010001 08530009 00050000 00000000 ..........S.......Ê.d....s...... 0001C0
 00000000 FFFFFFFF 00740030 00C50272 00058000 00000850 00000007 00000000 ........]........r.É.0.t........ 0001E0
```

```
Dump of file SATURN:[PCCOMMON.DUMP.DLL]DAIMDF.TMP;1 on 18-APR-1990 10:41:20.28
File ID (570,8,0)   End of file block 71 / Allocated 72

Virtual block number 67 (00000043), 512 (0200) bytes

 00000000 0000FFFF FFFF012C 000C0026 029600CF 80020400 085E0003 00030000 ......^.....ü...&...,........... 000000
 00030000 0000000J FFFFFFFF 012D000C 00260284 00CF8002 00000862 00070003 ....b.....ü...&...-............. 000020
 00070005 00000000 0000FFFF FFFF012E 000C0026 027200CF 80020000 086A0006 ..j.....ü.r.&................... 000040
 08790000 00060000 00000000 FFFFFFFF 00CD0008 002C0262 00058001 00010871 q.......b.,...ë...............y. 000060
 0001087A 00090005 00000000 0000FFFF FFFF00CE 000800C1 02560007 8002000C ......V.é...ö...............z... 000080
 80000000 08840000 00070000 00000000 FFFFFFFF 00CF0008 0064024A 00058001 ....J.d...ü..................... 0000A0
 00CF8002 04000885 00030003 00000000 0000FFFF FFFF0000 003000C5 02180005 ....é.0.Å....................ü. 0000C0
 022A00CF 80020000 08890007 00030000 00000000 FFFFFFFF 012F000C 0026023C <.&.../....................ü.*. 0000E0
 00260218 00CF8002 00000891 00060003 00000000 0000FFFF FFFF0130 000C0026 &...0......................ü...&. 000100
 00080050 02080005 80010001 0898000F 00050000 00000000 FFFFFFFF 0131000C ..1.........................P... 000120
 00030008 00C101FC 00078002 000C08A8 00000006 00000000 0000FFFF FFFF0002 ●..............`.......=.ê...£. 000140
 FFFF0004 00080064 01F00005 80010001 08A90010 00050000 00000000 FFFFFFFF ..............`.......Þ.d...Å... 000160
 FFFFFFFF 00050030 00C5018F 00058000 0000088A 00000007 00000000 0000FFFF ............o.......¢.é.0.í..... 000180
 0000FFFF FFFF0132 000C0026 01E300CF 80020400 08880003 00030000 00000000 ..........£.....ü.D.&...2....... 0001A0
 00000000 FFFFFFFF 0133000C 002601D1 00CF8002 000008BF 00070003 00000000 ........¢.....ü.Ì.&...3......... 0001C0
 00000000 0000FFFF FFFF0134 000C0026 018F00CF 80020000 08C70006 00030000 ......ú.....u.¢.&...4........... 0001E0

Dump of file SATURN:[PCCOMMON.DUMP.DLL]DAIMDF.TMP;1 on 18-APR-1990 10:41:20.28
File ID (570,8,0)   End of file block 71 / Allocated 72

Virtual block number 68 (00000044), 512 (0200) bytes

 00060000 0000000C 'FFFFFFF 00070008 002C01AF 00058001 000108CE 00070005 ....o.......£.,...■............. 000000
 00080005 00000000 0000FFFF FFFF0008 000800C1 01A40007 8002000C 08060000 ..●.......Ê.ė...Á............... 000020
 08E00000 00070000 00000000 FFFFFFFF 00090009 00640197 00058001 000108D7 ■.........d...\...............Á. 000040
 040008E1 00030003 00000000 0000FFFF FFFF000A 003000C5 01650005 80000000 ......e.é.0.Ö...............Ã... 000060
 80020000 08E50007 00030000 00000000 FFFFFFFF 0135000C 00260189 00CF8002 ..ü...&...5..............Ì..... 000080
 00CF8002 000008ED 00060003 00000000 0000FFFF FFFF0136 000C0026 017700CF ü.w.&...6..............Ú.....ü. 0000A0
 01550005 80010001 08F4000A 00050000 00000000 FFFFFFFF 0137000C 00260165 e.&...7..............¶.......U. 0000C0
 00C10149 00078002 000C08FF 00000006 00000000 0000FFFF FFFF000C 00080037 7...É.....................I.ė. 0000E0
 00080064 01300005 80010001 09000008 00050000 00000000 FFFFFFFF 00D00008 ..Ï......................=.d... 000100
 000F0030 00C5010C 00058000 0000090C 00000007 00000000 0000FFFF FFFF000E 8........................é.0.Ô. 000120
 FFFF0138 000C0026 013000CF 80020400 09000003 00030000 00000000 FFFFFFFF ..................ü.0.&...8... 000140
 FFFFFFFF 0139000C 0026011E 00CF8002 00000911 00070003 00000000 0000FFFF ..................ü...&...9..... 000160
 0000FFFF FFFF013A 000C0026 010C00CF 80020000 09190006 00030000 00000000 ................ü...&...:....... 000180
 00000000 FFFFFFFF 00E70008 006800FC 00058001 00010920 00140005 00000000 ........ ........=.h...Ô......... 0001A0
 00000000 0000FFFF FFFF00E8 000800C1 00F00007 8002000C 09350000 00060000 ......5.......Þ.ė...Ò........... 0001C0
 00070000 00000000 FFFFFFFF 00E90008 006400E4 00058001 00010936 00150005 ....6.......ð.d...Ô............. 0001E0

Dump of file SATURN:[PCCOMMON.DUMP.DLL]DAIMDF.TMP;1 on 18-APR-1990 10:41:20.28
File ID (570,8,0)   End of file block 71 / Allocated 72

Virtual block number 69 (00000045), 512 (0200) bytes

 00030003 00000000 0000FFFF FFFF00EA 003000C5 00B20005 80000000 094C0000 ..L.......ý.é.0.ð............... 000000
 09510007 00030000 00000000 FFFFFFFF 00EB000C 00260006 00CF8002 0400094D M.....ü.●.&...Š...............Q. 000020
 00000959 00060003 00000000 0000FFFF FFFF00EC 000C0026 00C400CF 80020000 ....ü.á.&...$...............Y... 000040
 80010001 09600008 00050000 00000000 FFFFFFFF 00ED000C 00260082 00CF8002 ..ü.ý.&...Ú..............`..... 000060
 00078002 000C0969 00000006 00000000 0000FFFF FFFF00CA 0008002C 00A20005 ..Å.,...ò..............i....... 000080
 00840005 80010001 096A0005 00050000 00000000 FFFFFFFF 00CB0008 00C10096 ..ė...ü...............j......... 0000A0
 00C10078 00078002 000C0970 00000006 00000000 0000FFFF FFFF008D 00080025 X...................p.......x.ė. 0000C0
 003000C5 003A0005 80000000 09710000 00070000 00000000 FFFFFFFF 008E0008 ..................q.......:.é.0. 0000E0
 0091000C 0026005E 00CF8002 04000972 00030003 00000000 0000FFFF FFFF0090 ................r.....ü.^.&..... 000100
 FFFF0092 000C0026 004C00CF 80020000 09760007 00030000 00000000 FFFFFFFF ..............v.....ü.L.&....... 000120
 FFFFFFFF 0093000C 0026003A 00CF8002 0000097E 00060003 00000000 0000FFFF ............~.....ü.:.&......... 000140
 0000FFFF FFFF0096 002D00F0 00050005 80010002 09850010 00050000 00000000 ..................Þ.-......... 000160
 00000000 FFFFFFFF 00970008 0019001F 00388001 00010996 00040005 00000000 ..............8................ 000180
 00000000 0000FFFF FFFF0098 0008001A 001F0078 80010001 09980004 00050000 .............x................. 0001A0
 00050000 00000000 FFFFFFFF 00990008 001A001F 00888001 000109A0 00040005 ...........¡.................... 0001C0
 00070005 00000000 0000FFFF FFFF009A 00080028 0014000A 80010001 09A50007 ..É.........(.................... 0001E0
```

```
Dump of file SATURN:[PCCOMMON.DUMP.DLL]DAIMDF.TMP;1 on 18-APR-1990 10:41:20.28
File ID (570,8,0)   End of file block 71 / Allocated 72

Virtual block number 70 (00000046), 512 (0200) bytes

 09B5000A 00050000 00000000 FFFFFFFF 00980008 00280009 000A8001 000109AD Ù.........(...................ç. 000000
 000109C0 000A0005 00000000 0000FFFF FFFF009C 00080036 00140038 80010001 ....8...6...................å... 000020
 80010001 09CB000A 00050000 00000000 FFFFFFFF 00900008 00360014 00788001 ..x...6...................ù..... 000040
 00388001 00010906 000A0005 00000000 0000FFFF FFFF009E 00080036 001400B8 ¡...6...................ø.....8. 000060
 00090078 80010001 09E1000A 00050000 00000000 FFFFFFFF 009F0008 00360009 ..6...................Å.....x... 000080
 00360009 00888001 000109EC 000A0005 00000000 0000FFFF FFFF00A0 00080036 6...................å.....¡...6. 0000A0
 0008003E 03290005 80020002 09F70006 00030000 00000000 FFFFFFFF 00A10008 ..Å...............%.......).>... 0000C0
 008F0008 0022006C 00058001 000109FE 00060005 00000000 0000FFFF FFFF0065 e...............±.......l."..... 0000E0
 72637365 4400003A 6560616E 206C6564 6F6D2061 74614400 00000000 FFFFFFFF .........Data model name:..Descr 000100
 64410000 736D796E 6F6E7953 2A00003A 6D796E6F 6E795300 003A6E6F 69747069 iption:..Synonym:..*Synonyms..Ad 000120
 7469746E 452A0( 0 3A797469 746E4500 6574656C 65440065 63616C70 65520064 d.Replace.Delete.Entity:..*Entit 000140
 74746120 65657246 00657465 6C654400 6563616C 70655200 64644100 00736569 ies..Add.Replace.Delete.Free att 000160
 52006464 41000073 65747562 69727474 61206565 72462A00 003A6574 75626972 ribute:..*Free attributes..Add.R 000180
 00736E69 61606F44 2A00003A 6E69616D 6F440065 74656C65 44006563 616C7065 eplace.Delete.Domain:..*Domains. 0001A0
 00003A6E 6F69736E 65606944 00657465 6C654400 6563616C 70655200 64644100 .Add.Replace.Delete.Dimension:.. 0001C0
 00657465 6C654400 6563616C 70655200 64644100 00736E6F 69736E65 6069442A *Dimensions..Add.Replace.Delete. 0001E0

Dump of file SATURN:[PCCOMMON.DUMP.DLL]DAIMDF.TMP;1 on 18-APR-1990 10:41:20.28
File ID (570,8,0)   End of file block 71 / Allocated 72

Virtual block number 71 (00000047), 512 (0200) bytes

 76206465 776F6C6C 412A0000 3A656C62 61742065 756C6176 20646577 6F6C6C41 Allowed value table:..*Allowed v 000000
 00657465 6C654400 6563616C 70655200 64644100 0073656C 62617420 65756C61 alue tables..Add.Replace.Delete. 000020
 65440065 63616C70 65520064 64410000 003A6574 6F4E0000 3A72656E 69666544 Definer:..Note:...Add.Replace.De 000040
 00656069 54006574 6144006E 6F697461 60726F66 6E692072 65735500 6574656C lete.User information.Date.Time. 000060
 005F5F5F 5F5F5F5: 5F5F5F00 64657461 64705500 64657461 65724300 72657355 User.Created.Updated.__________. 000080
 5F5F5F5F 5F5F5F5F 5F5F005F 5F5F5F5F 5F5F5F5F 5F005F5F 5F5F5F5F 5F5F5F5F __________.__________.__________ 0000A0
 4E2A0074 63656C65 53005F5F 5F5F5F5F 5F5F5F5F 005F5F5F 5F5F5F5F 5F5F5F00 .__________.__________.Select.*N 0000C0
 00000000 00000000 00000000 00000000 00000000 00000000 00000000 7365746F otes............................ 0000E0
 00000000 00000000 00000000 00000000 00000000 00000000 00000000 00000000 ................................ 000100
 00000000 00000000 00000000 00000000 00000000 00000000 00000000 00000000 ................................ 000120
 00000000 00000000 00000000 00000000 00000000 00000000 00000000 00000000 ................................ 000140
 00000000 00000000 00000000 00000000 00000000 00000000 00000000 00000000 ................................ 000160
 00000000 00000000 00000000 00000000 00000000 00000000 00000000 00000000 ................................ 000180
 00000000 00000000 00000000 00000000 00000000 00000000 00000000 00000000 ................................ 0001A0
 00000000 00000000 00000000 00000000 00000000 00000000 00000000 00000000 ................................ 0001C0
 00000000 00000000 00000000 00000000 00000000 00000000 00000000 00000000 ................................ 0001E0
```

```
Dump of file SATURN:[PCCOMMON.DUMP.DLL]ADV.TMP;1 on 18-APR-1990 10:36:19.81
File ID (484,12,0`   End of file block 39 / Allocated 40

Virtual block numbr 39 (00000027), 512 (0200) bytes

00000000 00000000 00000000 00000000 00000000 00000000 00706C65 48006C65 el.Help......................... 000000
00000000 00000000 00000000 00000000 00000000 00000000 00000000 00000000 ................................ 000020
00000000 00000000 00000000 00000000 00000000 00000000 00000000 00000000 ................................ 000040
00000000 00000000 00000000 00000000 00000000 00000000 00000000 00000000 ................................ 000060
00000000 00000000 00000000 00000000 00000000 00000000 00000000 00000000 ................................ 000080
00000000 00000000 00000000 00000000 00000000 00000000 00000000 00000000 ................................ 0000A0
00000000 00000000 00000000 00000000 00000000 00000000 00000000 00000000 ................................ 0000C0
00000000 00000000 00000000 00000000 00000000 00000000 00000000 00000000 ................................ 0000E0
00000000 00000000 00000000 00000000 00000000 00000000 00000000 00000000 ................................ 000100
00000000 00000000 00000000 00000000 00000000 00000000 00000000 00000000 ................................ 000120
00000000 00000000 00000000 00000000 00000000 00000000 00000000 00000000 ................................ 000140
00000000 00000000 00000000 00000000 00000000 00000000 00000000 00000000 ................................ 000160
00000000 00000000 00000000 00000000 00000000 00000000 00000000 00000000 ................................ 000180
00000000 00000000 00000000 00000000 00000000 00000000 00000000 00000000 ................................ 0001A0
00000000 00000000 00000000 00000000 00000000 00000000 00000000 00000000 ................................ 0001C0
00000000 00000000 00000000 00000000 00000000 00000000 00000000 00000000 ................................ 0001E0
```

```
Dump of file SATURN:[PCCOMMON.DUMP.DLL]ADV.TMP;1 on 18-APR-1990 10:36:19.81
File ID (484,12,0)   End of file block 39 / Allocated 40

Virtual block number 38 (00000026), 512 (0200) bytes

65206560 6974206E 757200FF 000A0D00 FC000A0D 746E656D 6E6F7269 766E6520  environment...*......run-time e 000000
20746E69 6F702067 6E697461 6F6C6620 200A0032 30303652 00020020 726F7272 rror ...R6002..- floating point  000020
000A0740 0002000? 0009187A 00020003 FFFFFF00 0A006465 64616F6C 20746F6E not loaded..........z.......a... 000040
00000000 FFFF0001 000E0352 00000198 00000000 00000000 0008192E 00020000 ...................R........... 000060
00000000 0160FFFF 012C00AA 00E80000 00001400 00900158 00070001 0000000A ........X.........Ò.¯.,...'..... 000080
00000000 0000FFFF FFFF012E 0008001E 00980005 80010001 01640005 00050000 ......d......................... 0000A0
00050000 00000000 FFFFFFFF 01420010 00980090 00238001 4001016A 00000005 ....j..a..#.......B............. 0000C0
00000007 00000000 0000FFFF FFFF0130 00080026 00800005 80010001 01680007 ..k.........&...0............... 0000E0
01740007 00050000 00000000 FFFFFFFF 01340030 000E0050 00058000 00010173 s.......P.B.0.4...............t. 000100
0000017C 00000007 00000000 0000FFFF FFFF0132 00080026 00400005 80010001 ......a.&...2...............|... 000120
80020000 01700005 00030000 00000000 FFFFFFFF 01360020 000E0020 00058000 .... .B. .6...............)..... 000140
00498002 04000183 00080003 00000000 0000FFFF FFFF0138 000C0026 000A0019 ....&...8.....................I. 000160
000A0079 80020000 018C0006 00030000 00000000 FFFFFFFF 013A000C 0026000A ..&...:.....................y... 000180
0026000A 00A98002 010u0193 00040003 00000000 0000FFFF FFFF013E 000C0026 &...>....................`...&. 0001A0
63656A62 4F00003A 656C7552 00000003 00726F73 69766441 FFFFFFFF 014.?00C ..a.....Advisor.....Rule:..Objec 0001C0
636E6143 0065756E 69746E6F 4300796C 70704100 00736E6F 69746341 0000/?74 ts..Actions..Apply.Continue.Canc 0001E0
```

```
Dump of file SATURN:[PCCOMMON.DUMP.DLL]ADV.TMP;1 on 18-APR-1990 10:36:19.81
File ID (484,12,0)   End of file block 39 / Allocated 40

Virtual block number 37 (00000025), 512 (0200) bytes

00000000 00000000 00000000 00000000 00000000 00000000 00000000 00000000 ................................ 000000
0A0A0A0A 0A0A0A0A 0A0A0A0A 0A000000 00000000 00000000 00000000 00000000 ................................ 000020
0A0A0A0A 0A0A0A0A 0A0A0A0A 0A0A0A0A 0A0A0A0A 0A0A0A0A 0A0A0A0A 0A0A0A0A ................................ 000040
0A0A0A0A 0A0A0A0A 0A0A0A0A 0A0A0A0A 0A0A0A0A 0A0A0A0A 0A0A0A0A 0A0A0A0A ................................ 000060
0A0A0A0A 0A0A0A0A 0A0A0A0A 0A0A0A0A 0A0A0A0A 0A0A0A0A 0A0A0A0A 0A0A0A0A ................................ 000080
0A0A0A0A 0A0A0A0A 0A0A0A0A 0A0A0A0A 0A0A0A0A 0A0A0A0A 0A0A0A0A 0A0A0A0A ................................ 0000A0
0A0A0A0A 0A0A0A0A 0A0A0A0A 0A0A0A0A 0A0A0A0A 0A0A0A0A 0A0A0A0A 0A0A0A0A ................................ 0000C0
0A0A0A0A 0A0A0A0A 0A0A0A0A 0A0A0A0A 0A0A0A0A 0A0A0A0A 0A0A0A0A 0A0A0A0A ................................ 0000E0
0A0A0A0A 0A0A0A0A 0A0A0A0A 0A0A0A0A 0A0A0A0A 0A0A0A0A 0A0A0A0A 0A0A0A0A ................................ 000100
00000000 00000000 00000000 000A0A0A 0A0A0A0A 0A0A0A0A 0A0A0A0A 0A0A0A0A ................................ 000120
00000000 00000000 20000000 00000000 00000000 00000000 00000000 00000000 ......................... ........ 000140
00303030 36520000 3E3E4753 4D4E3C3C FFFFFFFF 073014C4 00000000 00000000 ........6.0.....<<NMSG>>..R6000. 000160
69202D0A 00333030 36520003 000A0077 6F6C6672 65766F20 68636174 7320200A .- stack overflow.....R6003..- i 000180
20200A00 38303036 52000800 0A003020 79622065 64697669 64207265 6765746E nteger divide by 0.....R6008..-  0001A0
0A007374 6E656075 67726120 726F6620 65636170 73206867 756F6E65 20746F6E not enough space for arguments.. 0001C0
726F6620 65636170 73206867 756F6E65 20746F6E 20200A00 39303036 52000900 ...R6009..- not enough space for 0001E0
```

```
Dump of file SATURN:[PCCOMMON.DUMP.DLL]ADV.TMP;1 on 18-APR-1990 10:36:19.81
File ID (484,12,0)   End of file block 39 / Allocated 40

Virtual block number 36 (00000024), 512 (0200) bytes

00000000 00000000 00000000 00000000 00000000 00000000 00000000 00000000 ................................ 000000
00000000 00000000 00000000 00000000 00000000 00000000 00000000 00000000 ................................ 000020
00000000 00000000 00000000 00000000 00000000 00000000 00000000 00000000 ................................ 000040
00000000 00000000 00000000 00000000 00000000 00000000 00000000 00000000 ................................ 000060
00000000 00000000 00000000 00000000 00000000 00000000 00000000 00000000 ................................ 000080
00000000 00000000 00000000 00000000 00000000 00000000 00000000 00000000 ................................ 0000A0
00000000 00000000 00000000 00000000 00000000 00000000 00000000 00000000 ................................ 0000C0
00000000 00000000 00000000 00000000 00000000 00000000 00000000 00000000 ................................ 0000E0
030C1326 00000000 00000000 00000000 00000000 00000000 00000000 00000000 ............................&... 000100
00000000 00000000 00008181 81010000 00010000 00000000 00000000 00000000 ................................ 000120
00000000 00000000 00000000 00000000 00000000 00000000 00000000 00000000 ................................ 000140
00000000 00000000 00000000 00000000 00000000 00000000 00000000 00000000 ................................ 000160
00000000 00000000 00000000 00000000 00000000 00000000 00000000 00000000 ................................ 000180
00000000 00000000 00000000 00000000 00000000 00000000 00000000 00000000 ................................ 0001A0
00000000 00000000 00000000 00000000 00000000 00000000 00000000 00000000 ................................ 0001C0
00000000 00000000 00000000 00000000 00000000 00000000 00000000 00000000 ................................ 0001E0
```

```
Dump of file SATURN:[PCCOMMON.DUMP.DLL]ADV.TMP;1 on 18-APR-1990 10:36:19.81
File ID (484,12,0)   End of file block 39 / Allocated 40

Virtual block number 35 (00000023), 512 (0200) bytes

 00000000 00000000 00000000 00000000 00000000 00000000 00000000 00000000 ................................ 000000
 00000000 00000000 00000000 00000000 00000000 00000000 00000000 00000000 ................................ 000020
 00000000 00000000 00000000 00000000 00000000 00000000 00000000 00000000 ................................ 000040
 00000000 00000000 00000000 00000000 00000000 00000000 00000000 00000000 ................................ 000060
 00000000 00000000 00000000 00000000 00000000 00000000 00000000 00000000 ................................ 000080
 00000000 00000000 00000000 00000000 00000000 00000000 00000000 00000000 ................................ 0000A0
 00000000 00000000 00000000 00000000 00000000 00000000 00000000 00000000 ................................ 0000C0
 00000000 00000000 00000000 00000000 00000000 00000000 00000000 00000000 ................................ 0000E0
 00000000 00000000 00000000 00000000 00000000 00000000 00000000 00000000 ................................ 000100
 00000000 00000000 00000000 00000000 00000000 00000000 00000000 00000000 ................................ 000120
 00000000 00000000 00000000 00000000 00000000 00000000 00000000 00000000 ................................ 000140
 00000000 00000000 00000000 00000000 00000000 00000000 00000000 00000000 ................................ 000160
 00000000 00000000 00000000 00000000 00000000 00000000 00000000 00000000 ................................ 000180
 00000000 00000000 00000000 00000000 00000000 00000000 00000000 00000000 ................................ 0001A0
 00000000 00000000 00000000 00000000 00000000 00000000 00000000 00000000 ................................ 0001C0
 00000000 00000000 00000000 00000000 00000000 00000000 00000000 00000000 ................................ 0001E0
```

```
Dump of file SATURN:[PCCOMMON.DUMP.DLL]ADV.TMP;1 on 18-APR-1990 10:36:19.81
File ID (484,12,0)   End of file block 39 / Allocated 40

Virtual block number 34 (00000022), 512 (0200) bytes

00000000 00000000 u0000000 00000000 00000000 00000000 00000000 00000000 ................................ 000000
00000000 00000000 00000000 00000000 00000000 00000000 00000000 00000000 ................................ 000020
00000000 00000000 0u000000 00000000 00000000 00000000 00000000 00000000 ................................ 000040
00000000 0000000u 00000000 00000000 00000000 00000000 00000000 00000000 ................................ 000060
00000000 00000000 00000000 00000000 00000000 00000000 00000000 00000000 ................................ 000080
00000000 00000000 00000000 00000000 00000000 00000000 00000000 00000000 ................................ 0000A0
00000000 00000000 00000000 00000000 00000000 00000000 00000000 00000000 ................................ 0000C0
00000000 00000000 00000000 00000000 00000000 00000000 00000000 00000000 ................................ 0000E0
00000000 00000000 00000000 00000000 00000000 00000000 00000000 00000000 ................................ 000100
00000000 00000000 00000000 00000000 00000000 00000000 00000000 00000000 ................................ 000120
00000000 00000000 00000000 00000000 00000000 00000000 00000000 00000000 ................................ 000140
00000000 00000000 00000000 00000000 00000000 00000000 00000000 00000000 ................................ 000160
00000000 00000000 00000000 00000000 00000000 00000000 00000000 00000000 ................................ 000180
00000000 00000000 00000000 00000000 00000000 00000000 00000000 00000000 ................................ 0001A0
00000000 00000000 00000000 00000000 00000000 00000000 00000000 00000000 ................................ 0001C0
00000000 00000000 00000000 00000000 00000000 00000000 00000000 00000000 ................................ 0001E0
```

```
Dump of file SATURN:[PCCOMMON.DUMP.DLL]ADV.TMP;1 on 18-APR-1990 10:36:19.81
File ID (484,12,0)   End of file block 39 / Allocated 40

Virtual block number 33 (00000021), 512 (0200) bytes

00000000 00000000 00000000 00000000 00000000 00000000 00000000 00000000 ................................ 000000
00000000 00000000 00000000 00000000 00000000 00000000 00000000 00000000 ................................ 000020
00000000 00000000 00000000 00000000 00000000 00000000 00000000 00000000 ................................ 000040
00000000 00000000 00000000 00000000 00000000 00000000 00000000 00000000 ................................ 000060
00000000 00000000 00000000 00000000 00000000 00000000 00000000 00000000 ................................ 000080
00000000 00000000 00000000 00000000 00000000 00000000 00000000 00000000 ................................ 0000A0
00000000 00000000 00000000 00000000 00000000 00000000 00000000 00000000 ................................ 0000C0
00000000 00000000 00000000 00000000 00000000 00000000 00000000 00000000 ................................ 0000E0
00000000 00000000 00000000 00000000 00000000 00000000 00000000 00000000 ................................ 000100
00000000 00000000 00000000 00000000 00000000 00000000 00000200 00010000 ................................ 000120
00000000 00000000 00000000 00000000 00000000 00000000 00000000 00000000 ................................ 000140
00000000 00000000 00000000 00000000 00000000 00000000 00000000 00000000 ................................ 000160
00000000 00000000 00000000 00000000 00000000 00000000 00000000 00000000 ................................ 000180
00000000 00000000 00000000 00000000 00000000 00000000 00000000 00000000 ................................ 0001A0
00000000 00000000 00000000 00000000 00000000 00000000 00000000 00000000 ................................ 0001C0
00000000 00000000 00000000 00000000 00000000 00000000 00000000 00000000 ................................ 0001E0
```

```
Dump of file SATURN:[PCCOMMON.DUMP.DLL]ADV.TMP;1 on 18-APR-1990 10:36:19.81
File ID (484,12,0)   End of file block 39 / Allocated 40

Virtual block number 32 (00000020), 512 (0200) bytes

 00000000 00000000 00000000 00000000 00000000 00000000 00000000 00000000 ................................ 000000
 00000000 00000000 00000000 00000000 00000000 00000000 00000000 00000000 ................................ 000020
 00000000 00000000 00000000 00000000 00000000 00000000 00000000 00000000 ................................ 000040
 00000000 00000000 00000000 00000000 00000000 00000000 00000000 00000000 ................................ 000060
 00000000 00000000 00000000 00000000 00000000 00000000 00000000 00000000 ................................ 000080
 00000000 00000000 00000000 00000000 00000000 00000000 00000000 00000000 ................................ 0000A0
 00000000 00000000 00000000 00000000 00000000 00000000 00000000 00000000 ................................ 0000C0
 00000000 00000000 00000000 00000000 00000000 00000000 00000000 00000000 ................................ 0000E0
 00000000 00000000 00000000 00000000 00000000 00000000 00000000 00000000 ................................ 000100
 00000000 00000000 00000000 00000000 00000000 00000000 00000000 00000000 ................................ 000120
 00000000 00000000 00000000 00000000 00000000 00000000 00000000 00000000 ................................ 000140
 00000000 00000000 00000000 00000000 00000000 00000000 00000000 00000000 ................................ 000160
 00000000 00000000 00000000 00000000 00000000 00000000 00000000 00000000 ................................ 000180
 00000000 00000000 00000000 00000000 00000000 00000000 00000000 00000000 ................................ 0001A0
 00000000 00000000 00000000 00000000 00000000 00000000 00000000 00000000 ................................ 0001C0
 00000000 00000000 00000000 00000000 00000000 00000000 00000000 00000000 ................................ 0001E0
```

```
Dump of file SATURN:[PCCOMMON.DUMP.DLL]ADV.TMP;1 on 18-APR-1990 10;36:19.81
File ID (484,12,0)   End of file block 39 / Allocated 40

Virtual block number 31 (0000001F), 512 (0200) bytes

00000000 00000000 00000000 00000000 00000000 00000000 00000000 00000000 ................................ 000000
00000000 00000000 00000000 00000000 00000000 00000000 00000000 00000000 ................................ 000020
00000000 00000000 00000000 00000000 00000000 00000000 00000000 00000000 ................................ 000040
00000000 00000000 00000000 00000000 00000000 00000000 00000000 00000000 ................................ 000060
00000000 00000000 00000000 00000000 00000000 00000000 00000000 00000000 ................................ 000080
00000000 00000000 00000000 00000000 00000000 00000000 00000000 00000000 ................................ 0000A0
00000000 00000000 00000000 00000000 00000000 00000000 00000000 00000000 ................................ 0000C0
00000000 00000000 00000000 00000000 00000000 00000000 00000000 00000000 ................................ 0000E0
00000000 00000000 00000000 00000000 00000000 00000000 00000000 00000000 ................................ 000100
00000000 00000000 00000000 00000000 00000000 00000000 00000000 00000000 ................................ 000120
00000000 00000000 00000000 00000000 00000000 00000000 00000000 00000000 ................................ 000140
00000000 00000000 00000000 00000000 00000000 00000000 00000000 00000000 ................................ 000160
00000000 00000000 00000000 00000000 00000000 00000000 00000000 00000000 ................................ 000180
00000000 00000000 00000000 00000000 00000000 00000000 00000000 00000000 ................................ 0001A0
00000000 00000000 00000000 00000000 00000000 00000000 00000000 00000000 ................................ 0001C0
00000000 00000000 00000000 00000000 00000000 00000000 00000000 00000000 ................................ 0001E0
```

```
Dump of file SATURN:[PCCOMMON.DUMP.DLL]ADV.TMP;1 on 18-APR-1990 10:36:19.81
File ID (484,12,0)   End of file block 39 / Allocated 40

Virtual block number 30 (0000001E), 512 (0200) bytes

 00000000 00000000 00000000 00000000 00000000 00000000 00000000 00000000 ................................ 000000
 00000000 00000000 00000000 00000000 00000000 00000000 00000000 00000000 ................................ 000020
 00000000 00000000 00000000 00000000 00000000 00000000 00000000 00000000 ................................ 000040
 00000000 00000000 00000000 00000000 00000000 00000000 00000000 00000000 ................................ 000060
 00000000 00000000 00000000 00000000 00000000 00000000 00000000 00000000 ................................ 000080
 00000000 00000000 00000000 00000000 00000000 00000000 00000000 00000000 ................................ 0000A0
 00000000 00000000 00000000 00000000 00000000 00000000 00000000 00000000 ................................ 0000C0
 00000000 00000000 00000000 00000000 00000000 00000000 00000000 00000000 ................................ 0000E0
 00000000 00000000 00000000 00000000 00000000 00000000 00000000 00000000 ................................ 000100
 00000000 00000000 00000000 00000000 00000000 00000000 00000000 00000000 ................................ 000120
 00000000 00000000 00000000 00000000 00000000 00000000 00000000 00000000 ................................ 000140
 00000000 00000000 00000000 00000000 00000000 00000000 00000000 00000000 ................................ 000160
 00000000 00000000 00000000 00000000 00000000 00000000 00000000 00000000 ................................ 000180
 00000000 00000000 00000000 00000000 00000000 00000000 00000000 00000000 ................................ 0001A0
 00000000 00000000 00000000 00000000 00000000 00000000 00000000 00000000 ................................ 0001C0
 00000000 00000000 00000000 00000000 00000000 00000000 00000000 00000000 ................................ 0001E0
```

```
Dump of file SATURN:[PCCOMMON.DUMP.DLL]ADV.TMP;1 on 18-APR-1990 10:36:19.81
File ID (484,12,0)   End of file block 39 / Allocated 40

Virtual block number 29 (0000001D), 512 (0200) bytes

00000000 00000000 00000000 00000000 00000000 00000000 00000000 00000000 ................................ 000000
00000000 00000000 00000000 00000000 00000000 00000000 00000000 00000000 ................................ 000020
00000000 00000000 00000000 00000000 00000000 00000000 00000000 00000000 ................................ 000040
00000000 00000000 00000000 00000000 00000000 00000000 00000000 00000000 ................................ 000060
00000000 00000000 00000000 00000000 00000000 00000000 00000000 00000000 ................................ 000080
00000000 00000000 00000000 00000000 00000000 00000000 00000000 00000000 ................................ 0000A0
00000000 00000000 00000000 00000000 00000000 00000000 00000000 00000000 ................................ 0000C0
00000000 00000000 00000000 00000000 00000000 00000000 00000000 00000000 ................................ 0000E0
00000000 00000000 00000000 00000000 00000000 00000000 00000000 00000000 ................................ 000100
00000000 00000000 00000000 00000000 00000000 00000000 00000000 00000000 ................................ 000120
00000000 00000000 00000000 00000000 00000000 00000000 00000000 00000000 ................................ 000140
00000000 00000000 00000000 00000000 00000000 00000000 00000000 00000000 ................................ 000160
00000000 00000000 00000000 00000000 00000000 00000000 00000000 00000000 ................................ 000180
00000000 00000000 00000000 00000000 00000000 00000000 00000000 00000000 ................................ 0001A0
00000000 00000000 00000000 00000000 00000000 00000000 00000000 00000000 ................................ 0001C0
00000000 00000000 00000000 00000000 00000000 00000000 00000000 00000000 ................................ 0001E0
```

```
Dump of file SATURN:[PCCOMMON.DUMP.DLL]ADV.TMP;1 on 18-APR-1990 10:36:19:81
File ID (484,12,0)   End of file block 39 / Allocated 40

Virtual block number 28 (0000001C), 512 (0200) bytes

 00000000 00000000 00000000 00000000 00000000 00000000 00000000 00000000 ................................ 000000
 00000000 00000000 00000000 00000000 00000000 00000000 00000000 00000000 ................................ 000020
 00000000 00000000 00000000 00000000 00000000 00000000 00000000 00000000 ................................ 000040
 00000000 00000000 00000000 00000000 00000000 00000000 00000000 00000000 ................................ 000060
 00000000 00000000 00000000 00000000 00000000 00000000 00000000 00000000 ................................ 000080
 00000000 00000000 00000000 00000000 00000000 00000000 00000000 00000000 ................................ 0000A0
 00000000 00000000 00000000 00000000 00000000 00000000 00000000 00000000 ................................ 0000C0
 00000000 00000000 00000000 00000000 00000000 00000000 00000000 00000000 ................................ 0000E0
 00000000 00000000 00000000 00000000 00000000 00000000 00000000 00000000 ................................ 000100
 00000000 00000000 00000000 00000000 00000000 00000000 00000000 00000000 ................................ 000120
 00000000 00000000 00000000 00000000 00000000 00000000 00000000 00000000 ................................ 000140
 00000000 00000000 00000000 00000000 00000000 00000000 00000000 00000000 ................................ 000160
 00000000 00000000 00000000 00000000 00000000 00000000 00000000 00000000 ................................ 000180
 00000000 00000000 00000000 00000000 00000000 00000000 00000000 00000000 ................................ 0001A0
 00000000 00000000 00000000 00000000 00000000 00000000 00000000 00000000 ................................ 0001C0
 00000000 00000000 00000000 00000000 00000000 00000000 00000000 00000000 ................................ 0001E0
```

```
Dump of file SATURN:[PCCOMMON.DUMP.DLL]ADV.TMP;1 on 18-APR-1990 10:36:19.81
File ID (484,12,0)   End of file block 39 / Allocated 40

Virtual block number 27 (0000001B), 512 (0200) bytes

00000000 00000000 00000000 00000000 00000000 00000000 00000000 00000000 ................................ 000000
00000000 00000000 00000000 00000000 00000000 00000000 00000000 00000000 ................................ 000020
00000000 00000000 00000000 00000000 00000000 00000000 00000000 00000000 ................................ 000040
00000000 00000000 00000000 00000000 00000000 00000000 00000000 00000000 ................................ 000060
00000000 00000000 00000000 00000000 00000000 00000000 00000000 00000000 ................................ 000080
00000000 00000000 00000000 00000000 00000000 00000000 00000000 00000000 ................................ 0000A0
00000000 00000000 00000000 00000000 00000000 00000000 00000000 00000000 ................................ 0000C0
465F435F 030A0000 00000000 00000000 00000000 00000000 00000000 00000000 .............................._C_F 0000E0
125E0728 125E0724 125E0720 125EFFFF 125E0000 0000003D 4F464E49 5F454C49 ILE_INFO=.....^...^. .^.$.^.(.*. 000100
00000000 00000001 1B7C0000 00000746 00000200 FFFFFFFF 01010000 0000072C ,...............F.....|......... 000120
00000000 00000000 00000000 00000202 00000000 00000000 00000102 00000000 ................................ 000140
00000000 00000000 00000000 00000000 00000000 00000000 00000000 00000000 ................................ 000160
00000000 00000000 00000000 00000000 00000000 00000000 00000000 00000000 ................................ 000180
00000000 00000000 00000000 00000000 00000000 00000000 00000000 00000000 ................................ 0001A0
00000000 00000000 00000000 00000000 00000000 00000000 00000000 00000000 ................................ 0001C0
00000000 00000000 00000000 00000000 00000000 00000000 00000000 00000000 ................................ 0001E0
```

```
Dump of file SATURN:[PCCOMMON.DUMP.DLL]ADV.TMP;1 on 18-APR-1990 10:36:19.81
File ID (484,12,0)   End of file block 39 / Allocated 40

Virtual block number 26 (0000001A), 512 (0200) bytes

00000000 00000000 00000000 00000000 00000000 00000000 00000000 00000000 ................................ 000000
00000000 00000000 00000000 00000000 00000000 00000000 00000000 00000000 ................................ 000020
00000000 00000000 00000000 00000000 00000000 00000000 00000000 00000000 ................................ 000040
00000000 00000000 00000000 00000000 00000000 00000000 00000000 00000000 ................................ 000060
00000000 00000000 00000000 00000000 00000000 00000000 00000000 00000000 ................................ 000080
00000000 00000000 00000000 00000000 00000000 00000000 00000000 00000000 ................................ 0000A0
00000000 00000000 00000000 00000000 00000000 00000000 00000000 00000000 ................................ 0000C0
00000000 00000000 00000000 00000000 00000000 00000000 00000000 00000000 ................................ 0000E0
00000000 00000000 00000000 00000000 00000000 00000000 00000000 00000000 ................................ 000100
00000000 00000000 00000000 00000000 00000000 00000000 00000000 00000000 ................................ 000120
00000000 00000000 00000000 00000000 00000000 00000000 00000000 00000000 ................................ 000140
00000000 00000000 00000000 00000000 00000000 00000000 00000000 00000000 ................................ 000160
00000000 00000000 00000000 00000000 00000000 00000000 00000000 00000000 ................................ 000180
00000000 00000000 00000000 00000000 00000000 00000000 00000000 00000000 ................................ 0001A0
00000000 00000000 00000000 00000000 00000000 00000000 00000000 00000000 ................................ 0001C0
00000000 00000000 00000000 00000000 00000000 00000000 00000000 00000000 ................................ 0001E0
```

Dump of file SATURN:[PCCOMMON.DUMP.DLL]ADV.TMP;1 on 18-APR-1990 10:36:19.81
File ID (484,12,0)   End of file block 39 / Allocated 40

Virtual block number 25 (00000019), 512 (0200) bytes

```
20686374 69777320 666F2064 6E652066 666F206C 6C654600 632E6A62 6F5C7664 dv\obj.c.fell off end of switch  000000
726F2065 6E6F2054 6E61206E 6F697463 61206E41 00200074 6E656065 74617473 statement. .An action and one or 000020
65746365 6C657320 6562206F 74206465 656E2073 7463656A 626F2065 726F6D20  more objects need to be selecte 000040
6F736976 64410000 2E796C70 7041206E 6120676E 696F6420 65726F66 65622064 d before doing an Apply...Adviso 000060
6F72705C 6A6F7270 5C3A7100 656C6261 6C696176 4120746F 4E00706C 65482072 r Help.Not Available.q:\proj\pro 000080
2E706C65 68745C76 64615C61 6461735C 7473796C 6E615C63 72735C31 3330306A j0031\src\anlyst\sada\adv\thelp. 0000A0
6C756E28 00002152 4F525245 2064656E 72757465 7220786F 6220706C 65480063 c.Help box returned ERROR!..(nul 0000C0
00001B7E 1E001113 1E001E00 00000000 00002320 202B0029 6C6C756E 2800296C l).(null).+- #..............-... 0000E0
00000000 00000000 00000000 00000000 00000000 00000000 00000000 00000000 ................................ 000100
00000000 00000000 00000000 00000000 00000000 00000000 00000000 00000000 ................................ 000120
00000000 00000000 00000000 00000000 00000000 00000000 00000000 00000000 ................................ 000140
00000000 00000000 00000000 00000000 00000000 00000000 00000000 00000000 ................................ 000160
00000000 00000000 00000000 00000000 00000000 00000000 00000000 00000000 ................................ 000180
00000000 00000000 00000000 00000000 00000000 00000000 00000000 00000000 ................................ 0001A0
00000000 00000000 00000000 00000000 00000000 00000000 00000000 00000000 ................................ 0001C0
00000000 00000000 00000000 00000000 00000000 00000000 00000000 00000000 ................................ 0001E0
```

```
Dump of file SATURN:[PCCOMMON.DUMP.DLL]ADV.TMP;1 on 18-APR-1990 10:36:19.81
File ID (484,12,0)   End of file block 39 / Allocated 40

Virtual block number 24 (00000018), 512 (0200) bytes

 38383931 20296328 20746867 69727970 6F432020 20797261 7262694C 20656069 ime Library - Copyright (c) 1988 000000
 4C0A7325 20203A65 6C69460A 73250011 70726F43 2074666F 736F7263 694D202C , Microsoft Corp..Xs.File:  Xs.L 000020
 494E5241 5700726F 73697664 41206E69 20524F52 5245000A 0A752520 3A656E69 ine: Xu...ERROR in Advisor.WARNI 000040
 31333030 6A6F7270 5C6A6F72 705C3A71 00726F73 69766441 206D6F72 6620474E NG from Advisor.q:\proj\proj0031 000060
 6E726157 00632E6C 6974755C 7664615C 61646173 5C747379 6C6E615C 6372735C \src\anlyst\sada\adv\util.c.Warn 000080
 72454268 63746143 0021524F 52524520 64656E72 75746572 20786F62 20676E69 ing box returned ERROR!.CatchBEr 0000A0
 6F4C6E69 57006465 6C696146 206B636F 6C422063 6F6C6C41 00732520 3A726F72 ror: Xs.Alloc Block Failed.WinLo 0000C0
 7220676E 6F4C5577 6F646E69 57746553 6E695700 64656C69 61462067 6C446461 adDlg Failed.WinSetWindowULong r 0000E0
 4D4D4F43 5F4D5720 64657463 65707865 6E550072 6F727265 2064656E 72757465 eturned error.Unexpected WM_COMM 000100
 6F72705C 6A6F7270 5C3A7100 64657669 65636572 20656761 73736560 20444E41 AND message received.q:\proj\pro 000120
 6F727067 6C645C76 64615C61 6461735C 7473796C 6E615C63 72735C31 3330306A j0031\src\anlyst\sada\adv\dlgpro 000140
 5C6A6F72 705C3A71 0065646F 6320726F 72726520 64657669 65636552 00632E63 c.c.Received error code.q:\proj\ 000160
 676C645C 7664615C 61646173 5C747379 6C6E615C 6372735C 31333030 6A6F7270 proj0031\src\anlyst\sada\adv\dlg 000180
 74732068 63746977 7320666F 20646E65 2066666F 206C6C65 4600632E 636F7270 proc.c.Fell off end of switch st 0001A0
 3A71002E 65726966 2073656C 75722065 726F6D20 6F4E0020 00746E65 6D657461 atement. .No more rules fire..q: 0001C0
 615C6164 61735C74 73796C6E 615C6372 735C3133 30306A6F 72705C6A 6F72705C \proj\proj0031\src\anlyst\sada\a 0001E0
```

```
Dump of file SATURN:[PCCOMMON.DUMP.DLL]ADV.TMP;1 on 18-APR-1990 10:36:19.81
File ID (484,12,0)   End of file block 39 / Allocated 40

Virtual block number 23 (00000017), 512 (0200) bytes

 52C48850 21EB99FF FFB80675 D2080473 070AFEB1 04C68334 735E003E E8560E46 F.VÒ>.^s4.ó..±..s..@u.¡...ŠIP.ÄR 000000
 5E5F07C0 33038807 0A368902 5C891489 E675C085 F95B0000 FFFF9A50 C0335016 .P3àP.....[°.àu|...\..ó...Æ3à._^ 000020
 26721C03 0A882CEB F9F27507 0AFE8104 C6830C74 024C39F7 880E4E88 CB5DE588 .[]ù.N..%9L.t..ó..±..u'°$,.O..r& 000040
 04168904 75F7380E 75C08500 00FFFF9A 51531373 03041E39 0675F738 C18ED388 .Æ.é;%u.9...s.SQ......àu8;%u.... 000060
 0323D818 D1280C74 0AF7D788 067EC457 38E30C4E 88EC8855 00C3D188 04879203 .....lù.U.$.N.D8Wá~..■%Ot.+1.ÙWÆ 000080
 D1C38EFF FFC381C3 8C10E301 87AAF3C9 13ABF3E9 D1E08A0A 4688D128 0187D103 .1.1+1.F..ÀiÖµ¨.èµ`.ID..ù.ù...ùî 0000A0
 08750A5E 88D0800C 5E880846 88EC8855 CB5D0856 88064688 5FAAF3C9 13ABF3E9 Õµ¨.èµ`_.F..V.]ùU.$.F..^..Á.^.u. 0000C0
 E5880103 E3F70646 88C8030C 66F70646 88C888E3 F70008CA 50E588E3 F7064688 .F.%D.[]ò..%D.à.F.%f..à.F.%D.1.Î 0000E0
 88157508 0A47F626 5575023C 03240A47 8A26065E C4F62856 000004C8 0008CA5D ]ò..à...V+-á^.&.G.$.<.uU&-G..u.. 000100
 46890647 28260788 26065E88 39740113 3287F606 086BF9F7 000C8999 073E2DC3 ù->..¿..%'kÄ.-.2..t9.^.&..&+G..P 000120
 FC463808 C4831682 0E6E9A50 E42A0847 8A260677 FF260877 FF265028 7EC008FC =.à~(P&.w.&.w.&.G.*ÒP.n.ý..á.;F= 000140
 26025789 26078926 08578826 06478826 065EC4FF FFBE200A 4F802606 5EC40874 t.á^.&.O. ƒ..á^.&.G.&.W.&..&.W.& 000160
 10F80103 00050002 11300103 00580005 0F8A0203 000CC8C9 5EC68800 000447C7 ùG....ó^èù....¤...[...0.......%. 000180
 17610103 00220002 17160103 00000008 16320002 00000009 18480002 00070002 ......H.......2...........".... 0001A0
 0CA60103 004D0002 107A0103 003A0002 0E9A0103 00880002 17AB0105 00260002 ..&...¨...........:...z...M...1. 0001C0
 542D6E75 5220534D 00000000 00000000 00000000 005C0002 0C930103 00580002 ..[.......\.............MS Run-T 0001E0
```

Dump of file SATURN:[PCCOMMON.DUMP.DLL]ADV.TMP;1 on 18-APR-1990 10:36:19.81
File ID (484,12,0)   End of file block 39 / Allocated 40

Virtual block number 22 (00000016), 512 (0200) bytes

```
4F800474 0B0B065E 88EC8855 90C8C95E C6880876 FA463919 2E168819 2CA10CFA •.À.....9F•vA.ó^èù.U.å.^..Ût..0 000000
99C03305 750176E8 00058807 1E297500 3F831856 885756EC 8855C850 E58801FE ±..])ùU.$VWEV..?.u)..¡..Òv.u.3à. 000020
8C064E88 185C368^ FFFEFE44 C704C683 000104C7 961858A3 1856A3FE 244024EB $$a$±ÈV.ÈX..ú....ó.úD±±..6\..N.. 000040
88ADFC02 7788F273 EEF983FE E180FA74 410000E9 CB5DE588 5E5F0009 E8C08ED8 Ä.äò.._^.[]ùÓÅ.At•.Ä±.•Ys·.w.•Ù. 000060
88E6EBFE 4489F788 000205C2 03357401 A8ADF003 D0881573 C1384843 7401A8FE ±˙.tCH;ès..Å.ÞÙ˙.t5.ò....¥.D±Š]. 000080
26057401 3810E489 DA8CC688 FE4CFEF9 0305E805 8948C128 FE4C89F9 030C74FE ±t..•.L±•èH..Š..•±L±.ó.Ö¿ð.;]t.& 0000A0
3848FE88 F27401A8 ADF003FE 882574FF FE300218 6806C626 C3027F89 18641E8C ..d....ù&ó.h..=±.t%.±.ÞÙ˙.t˙.±H; 0000C0
8E0474C0 08084788 E6EBFE44 89F78800 0205C203 E27401A8 ADF00300 888C73C1 ès¥.Å.ÞÙ˙.tã.ò....¥.D±Š].G..åt.. 0000E0
33067788 88EB3788 18601E8E 260574C7 3815A98F D88C1274 18680EFE 2615EBD8 ÄŠ.å±.h.t..Ä¢`.;út.&..'..7Š£.w.3 000100
8C98E84E 4E960574 0010E8FE 4DFE0074 005FE898 40400124 0074C638 0068E8C0 äÒk.;ót.$.aa.ò_.t.±M±Ò..t..NNŠ.. 000120
49C82803 7401A8FE 458851C3 99C03302 47890788 1864A326 0474C138 15FD8908 Ä¿».;èt.&Èd....G.3à.úQ.E±˙.t.•à] 000140
C628C223 02F70072 C2031572 C603C188 F575EAD1 04761866 1638267F FF8A4141 AAo..&;.f.v.ĩõu¥.ê.ór..ór.¥@#ò•ó 000160
FE44C7F2 03F088FE 88571874 001DE851 52C359C0 33E575EA D1D2F708 75000CE8 Ò..u.¥@ĩõu]3àYúRQÒ..t.W.±.Þ.˙úD± 000180
9A1F0650 0001B850 52521ED2 335053C3 5A5958FE 55894AD7 28068806 7789FFFE ±..w..@•@J.U±XYZúSP3@.RRP|..P... 0001A0
0A8F3875 000A7E83 065756EC 8855C302 08027458 5A1FFFFA 8308C483 14E516C2 ô.[..á..•..Z[t..@ùU.$VW..~..uB¢. 0001C0
89024488 0D74F738 11744807 0A3688 4C E8277200 57E80775 48064688 08568803 ..V..F.Hu.ÒW.r'ŠL.6..Ht.;¥t..D.. 0001E0
```

```
Dump of file SATURN:[PCCOMMON.DUMP.DLL]ADV.TMP;1 on 18-APR-1990 10:36:19.81
File ID (484,12,0)   End of file block 39 / Allocated 40

Virtual block number 21 (00000015), 512 (0200) bytes

 5DE58801 FE4F8026 0574C308 C08C065E C4EC8855 00C31938 A3980147 8A2E4301 .C..G..È8.ù.U.$á^..á.ût.&.Oz..|) 000000
 1B60A312 740025:8 08750018 603E831E 73FFF130 06468857 5602EC83 EC8855C8 ùW.á.á.VW.F.=p.s..>'..u.ÒX.t.È'. 000020
 CB5DE588 5E5F02C4 83118A15 169A0676 FF087500 78E80574 0018E815 750082E8 Ò..u.Ò..t.Òx.u..v........á._^.|)ù 000040
 C29A5002 80510E4F 8050501E C033FE5E 89FEE383 43065E88 0776065E 3900F08B £p.9^.v..^.C.Dz.^z3ã.PP.O.Q¯.P.ô 000060
 FE5E8800 08A30A8  05740208 1864A318 621687C2 883874FF FA8308C4 83134516 .E..á..°.t8.ò..b.Èd..@t..OÈ...^z 000080
 06A30000 05000AA; 01478000 02A30000 A3000A88 0C478948 480008A3 C033D88E .À3âÈ..HH.G.|..È..È...G.È.....È. 0000A0
 00000AC8 C3098EC1 8CD20801 9AE81864 1E8ED833 064E88C0 8ED88CC3 1FD88C00 ..Ä.ū.Ä.á.H.3U..d.Ò...@.ê.\úà... 0000C0
 EB99C028 0674FFFF C2F7FA56 89F84689 13F917C0 9A0676FF 006A0876 FF006A56 Vj..v.j..v..â.°..F½.V°%ó..t.+â.Š 0000E0
 9A50FE76 FF006A56 12740008 FE5689FC 468902C4 83141213 119A56F8 7688902F /..vHV......á..F=.Vz.Ât.Vj..vzP. 000100
 8827E30E 4E881E56 57EC8855 90C8C95E FE5688FC 46889007 E808C483 13711778 x.q..á.Š...F=.Vz^èù.U.$WV..N.D'. 000120
 0477FF45 3A26C933 FF448AA6 F30A76C5 FE88C803 D9F7AEF2 C033F788 067EC4D9 \á-..%3â·Ü%).ù.zév.µ|.O.3è&:E.w. 000140
 071E570A 7EC51E08 56880646 880E4E88 00CB5DE5 885F5E1F C188D1F7 49490474 t.II%I.ë.^_.|}ù..N..f..V..é~.W.. 000160
 C00B0233 92F7880A F7000283 D8F7AA2D 800A7902 080E750A F9831374 C00A93FC •..åt..'.u..@y.¯-^%Ü.@.%Ö.%.3@.á 000180
 880586AC 4F0588E2 75C308C2 88AA2704 0276393C 30040387 92F1F793 F1F70274 t.%p.%p..Æ.0<9v..'`.ô.ùuã..O¯... 0001A0
 8CFA4689 073EB856 000006C8 00CB5DE5 885E5F1F 58DA8CF2 72C73801 4480FF44 D..D.;úr·.OX._^.|}ù.à...V|>..F°. 0001C0
 46834601 744004C4 83130E17 F49A5306 0E74830A 47F626FA 5EC41CE8 F628FC5E ^•+-Š.á^°&-G.¯t..S.¶.B..á.@t.F.F 0001E0
```

```
Dump of file SATURN:[PCCOMMON.DUMP.DLL]ADV.TMP;1 on 18-APR-1990 10:36:19.81
File ID (484,12,0)   End of file block 39 / Allocated 40

Virtual block number 20 (00000014), 512 (0200) bytes

31E8187C 8F1B78BE 003AE81D F48F1DF4 8EEC8855 000010DE 9A006A00 6A036A00 .j.j.j..8..:U.$/¶.e¶.Ô:./x.e|.Ô1 000000
9A500646 8A50C033 001AE81B 7CBF187C 8E0023E8 187CBF18 7CBEEC88 5503E800 .Ŝ.U.$/|.e|.Ô#./|.e|.Ô..3àP.F.P. 000020
F2740245 08058804 EF830E73 F73BC318 6C1EFF00 028807E3 186E0E88 0000FFFF ......n.D.É....l.ù;%s..ÿ....E.t· 000040
89C02803 02168800 F0E90375 03023639 FF28F628 56570000 14C800C3 EEEB1DFF ..$Yù.à...WV+-+.96..u.Ðþ.....+à. 000060
080AC483 11CA1424 9A070C68 1EF676FF F876FF0C 6AF85689 F64689F2 5689F046 Fþ.V·.F-.V½j..v¼.v~.h...$.ò..á.. 000080
FFF65EC4 0CE847EA 75003F80 26F646FF F65EC400 8CE90376 7FFFFE81 461974C0 ât.F.±..v.Ö¥.á^-.F-&.?.uõG$.á^-. 0000A0
8904C483 110913CC 9A046A50 0145808A 75003F80 26F65E88 F475003F 8026F646 F-&.?.u¶.^-&.?.uo.E.Pj..ä.l..á.. 0000C0
08FC4688 6D74EE46 U8EC4688 FE5689FC 468902C4 83120F13 119A56EE 5689EC46 F$.VÝV......á..F•.V±.F$.FŸtm.F•. 0000E0
1614249A 070C681E F076FFF2 76FF0C6A 18481689 1849A3EE 5688EC46 886674C2 ôtf.F$.VÝÉI...K.j..v·.vþ.h...$.. 000100
FFF05EC4 04EC4683 02578926 078926FE 5688FC46 88EC5EC4 2C74C008 0AC4830F ..á..ât,á^$.F•.V±&..&.W..F$.á^þ. 000120
F475003F 8026F046 FFF05EC4 E8E80E74 C00A0788 26FC46FF FC5EC407 8A26F046 Fþ&..á^•.F•&...ât.ŜÒá^þ.Fþ&.?.u¶ 000140
09060005 18040203 02021601 FA58E900 028890C8 C95F5EA7 75003F80 26F05EC4 á^þ&.?.uÎ^_èù.¡..ÕX*........... 000160
00530052 02430041 02350212 12110010 120F1600 160C0808 070A0C09 0C080C07 .....................S.A.C.R.S. 000180
16080000 080702CE 08A40084 09820A81 0A801606 09721C70 2060006C 08590057 W.Y.l.m p.r...........É.ö.•..... 0001A0
12648819 3FA3CB5D E58899FF FF880008 E8C85DE5 8899FFFF 88193816 89193FA3 È?...8.¡....Ì]ùÒ..¡....Ì]ùÉ?.Éd. 0001C0
76CA3C04 728C3C43 0A76243C 0472133C F7E24343 1674073A 2E1875E4 0A002489 ¿$..Ôu..:.t.CCã¼<.r.<$v.C<¥r.<òv 0001E0
```

Dump of file SATURN:[PCCOMMON.DUMP.DLL]ADV.IMP;1 on 18-APR-1990 10:36:19.81
File ID (484,12,0)   End of file block 39 / Allocated 40

Virtual block number 19 (00000013), 512 (0200) bytes

7AE80093 E9FA5E8F 5F5EE1E8 0014E8E2 E8FC46FF 0A80AA00 1FE80375 F8380080 ¯.;«u.Ò..´¯..Ť•Šäð..ŠÄ^_.^*Õ..Šz 000000
5016F446 8051521E 53065E88 1FE3CA28 CF881F06 1E515350 00D11042 9AFFFC88 ¡•..8.!.PSQ....ü+ðD..^.Š.RQ.F¶.P 000020
C00808C4 831FC3FA 88585859 1F07740B 08FE5E01 F45E8811 75C00800 00009A9A ......áu..^¶.^±.Üt..Y[X.ªû..á..â 000040
4387F6FE 5E8E26E8 F900208A 03E8001C 8A087500 098A0001 30007400 60301874 t.«m.t.=..¤..u.¤..$.¤ .ªS&.^±-.C 000060
FC4628FE 468806EB F9C03300 1C8A0EE8 F803751A 3F80085E 880A5E8E 0E744019 .ât..^..^..?.u.½S.¤..3á*$..F±+F• 000080
0856C51E EEE8C188 0475C908 0C4E8803 0FE9C85D E5880472 FA5E8E5F 5EF86688 .f½^_.^*r..|]úÕ...N..èu..éŠŸ.éV. 0000A0
00098A00 01300074 006C3017 74C0081F 071E0000 0F319A50 16F44680 51521E53 S.RQ¯F¶.P.1.......ât.=m.t.=..¤.. 0000C0
1A3F8026 DA880A74 40194387 F68775C0 08F44688 C2E80020 8AC7E800 1C8ACC75 uæ¤..Šú¤ .Šó.F¶.áuñ-.C.ât..Öå.?. 0000E0
88914901 F7AEF2FF FF89C033 067EC407 88EC8855 00A3E8C0 33001C8A A6£ß ?75 u.Š|¤..3áŠÉ.U.£.ªé-.3á¿...ÚX||.. 000100
F60C7C00 F883117D 19411E38 065E88EC 88550442 E9008357 56EC8855 00CB5 ʿA ª]ü.U.$VW*.Õ8.U.$.^.;.A.)..«.|.- 000120
0572073C 1E380872 D8280C88 5A5900C8 50E588C0 3302E800 01880574 401943J7 .C.ât.¡..$.3á.|]ù.YZ.É+Ár.;.<.r. 000140
1943A780 04885200 02880738 2EFF5152 FC5CE9C0 33057540 0738A1C8 5152E388 .DRQùÀ8.âu.3áÒ\•RQ..8.£..R.á.ÎC. 000160
81067500 02300774 00013040 81127558 C0080000 FFFF9A52 16501653 C48850B7 ñP.áS.P.R......áXu.Ÿ∂=..t.=..u.Ÿ 000180
01AEE903 731B6C1E FFD833C2 8C1B7006 C41EE31B 6E0E885A 04794B19 438F0808 ...C.KyåZ..n.D.á.p..ó3Ü..l.ß.ÕÜ. 0001A0
880073E8 1878BF1B 788E007C E81B788F 1878BE1B 6C1EFF00 0388C28C 187406C4 á.t..ôÉ....l./x.«x.Ò|./x.«x.Òs.¡ 0001C0
51E81B7C 8F1B788E D88E0046 88C30000 FFFF9A10 E3680E01 6A08741B 7C301878 x.=|.t.j..hD......ú¡F..Ä/x.¢|.ÒQ 0001E0

Dump of file SATURN:[P.COMMON.DUMP.DLL]ADV.TMP;1 on 18-APR-1990 10:36:19.81
File ID (484,12,0)   End of file block 39 / Allocated 40

Virtual block number 18 (00000012), 512 (0200) bytes

```
AC9204E0 C00E7241 2CAC1943 BF1FF788 071E061C E8E774AE F2C03308 74CA88A6 ‡.ôt.3á·ÜtóŠ....̃.%.¢C.¨,Ar.áÀ..¯ 000000
FF047400 071C3E83 0CC50070 9A5000FC 88EC8855 00C31FED E8AAC20A 0572412C ,Ar..ô¯ŠU.ù.U.š¡=.P.p.é..>...t.. 000020
8E065688 C08ED88E 01288857 56EC8855 C85DE588 00260070 9A5000FF 88071A1E ...¡..P.p.&..[]ùU.šVW¡+..Ä.â.V./ 000040
0002CA50 E5885E5r 96E8E8F7 88AEF2FF FF89C033 970C7496 401074C2 38AD1888 ..Ù;ôt.∂.t..3à¿..·Ù.%ŠŠ._^.[]ò.. 000060
C4885049 D1F7AEF2 FFFF89C0 33FA8892 1F74C008 003A0040 9A0676FF 57EC8855 U.šW.v..∂.:..át...*3à¿..¯Ù%IIP.á 000080
46881854 06FF0000 04C80002 CA5DE588 5F580000 FFFF9A50 1651521E 53000288 £..S.RQ.P.....[_.[]ò..à.....T..F 0000A0
119A0200 68FE5E8C FC468913 3205E001 C103E001 C888F9F7 000CB999 073E2004 .->..¿..%ⁱ.àIÀ.ĕIÀ.2..F•.^±h.... 0000C0
47C726FC 5EC4080A 4F802611 74D00808 57892606 47892604 5EC402C4 83007A13 .z..á.á^.&.G.&.W..Àt.&.O..á^=&ùG 0000E0
FC5EC408 57892606 47892640 FE5688FC 4688040A 4F802604 5EC49021 E8020002 ...Š!.á^.&.O...F•.V±ə&.G.&.W.á^• 000100
C3C90000 0447C726 02578926 07892608 57882606 47882604 5EC40001 0247C726 &ùG...á^.&.G.&.W.&..&.W.&ùG...èù 000120
0A76FF53 CC8804EC 830478E9 046CE9C0 3300098A 08721941 1E38065E 88EC8855 U.š.^.;.A.r.¤..3àÖl.Õx..š..äS.v. 000140
885500CB 50E588FD 1943A780 91E175C0 855A5900 00FFFF9A 51160C76 FF0876FF .v..v..Q.....YZ.àuÀ..]C.».[]ù.U. 000160
51C93353 12742019 4387F604 28E9C033 00098A08 7219411E 38065E88 0CEC83EC š.š..^.;.A.r.¤..3àÖ+.-.C. t.S3èQ 000180
C0330856 C50A468E FA5E8C66 74801943 87F60000 0E599A50 16F4468D 51414151 QAAQ.F¶.P.Y...-.C..tf.^ª.F.éV.3à 0001A0
DC8802EC 833875AE F20A8049 E30C4E88 F86689F2 88FA8856 57FCFC46 89FE4689 .F±.F••WV.ª.·.f%.N.DI¯.·Ùu;.š..É 0001C0
009AE900 28E8F4E2 AA1A74F8 3800740A 3CAC0C4E 880716FA 88D488E2 2800808A ¤..+ä.å.ª...N.¯<.t.;«t.¯ã¶Ö+.Ô.. 0001E0
```

Dump of file SATURN:[PCCOMMON.DUMP.DLL]ADV.TMP;1 on 18-APR-1990 10:36:19.81
File ID (484,12,0)   End of file block 39 / Allocated 40

Virtual block number 17 (00000011), 512 (0200) bytes

```
3E830066 E80EFA46 FF077400 067E8318 74001C7A 3E83077E F6080874 301DF23E >·.0t..--..>z..t..-..t..F°.Òf..> 000000
7400067E 8302C483 FE7EE80E 56297500 1C7A3E83 0070E80E FC46FF07 740010F0 Þ..t..F•.Òp..>z..u)V.Ò~z.á..~..t 000020
FFF876FF 0040E80E 047500FC 7E830A74 001DF03E 830039E8 0E047500 FA7E830A ..~°.u..Ò9..>Þ..t..~•.u..Òà..V%. 000040
C483FE38 E80E5600 201DF206 C70E7400 1C7A3E83 06C483FE 85E80EF4 76FFF676 v~.v¶.Òçz.á..>z..t.ú.·. .V.Ò8z.á 000060
E80E306A C802C483 F002E80E 50002088 03E80028 88057400 1C6C3E83 C8C95E02 .^èù.>l..t.¡+.Š.¡ .P.Ò8».á.ùj0.Ò 000080
FDAAE80E 50007888 03E80058 88057400 1C683E83 1775101D F03E8302 C483FDC8 â».á..>Þ..u..>h..t.¡X.Š.¡x.P.Ò¯» 0000A0
83378826 1C7C1EC4 12752A3F 80260A5E C40001FE 46C75657 000006C8 C802C483 .á.ùâ...WVúFz..á^.&.?*u.á.|.&.7. 0000C0
0A5E88F6 280A46FF FFFFFE46 C708752D 3F80260A 5EC49060 E80A46FF 021C7C06 .|...F.Š'.á^.&.?-u.úFz...F.+-.^. 0000E0
F8880030 1DF206C7 0675303C 0A751C82 36393B7F 393C3F7C 303CFA46 88078A26 &...F°<0|?<9.;96..u.<0u.ú.·.0..« 000100
30802647 F18830E9 83C803E1 01CE0302 E1C1CE88 98058A26 187F3930 802606E8 Š.&.»9..&....òèÅ..òlÅ.à.Ò0.þG&.= 000120
CBC95F5E 0C5688DA 46883789 26065EC4 F088EEF7 FE46880C 468C0A7E 890F7D30 0)Ò.~..F..FzKY.Þá^.&.7.F..V.^ èù 000140
00382611 74003080 264701E8 FC7EC406 4E8AFE5E 8CFC4689 02FA8857 000004C8 à...Wj°..F•.^z.N.á-•Š.G&.=.t.Ë8. 000160
C48850EC 885590C8 C95FC028 FE468CFC 7E899009 E8FE468C FC7E8900 0188F475 u¶¡...-•.FzŠ...-•.Fz+à_èù.U.&P.á 000180
0386E800 21E80000 FFFF9A03 00681E03 02681E19 3CA3E086 580000FF FF9A5016 .P.....X.ÅÈ<..h...h.......Òl.ÒÑ. 0001A0
8B1E0308 16FF00FF 680CC000 709A0C83 001C9A50 C85DE588 00018809 8F11569A .V...¡...|]ùP...°..p.à.h.......£ 0001C0
F3C88801 88070C8E 31740030 80264701 75003080 267FFF89 0302068E FF330000 ..3.....¿..&.=.u.G&.=.t1ƒ...1.ùµ 0001E0
```

```
Dump of file SATURN:[PCCOMMON.DUMP.DLL]ADV.TMP;1 on 18-APR-1990 10:36:19.81
File ID (484,12,0)   End of file block 39 / Allocated 40

Virtual block number 16 (00000010), 512 (0200) bytes

8E36FF14 75001C8A 3E831874 001C603E 8304C483 07221EFF 26187E06 8E1C8C36 6....-.&..".....>'..t..>...u..6. 000000
0B1C6CA1 00001DF0 06C7081C 7C068304 C483072A 1EFF2618 7E068E1C 8C36FF1C ..6....-.&..*..6...|..ú.Þ...Àl.. 000020
02E80001 B80574C0 0804C483 072E1EFF 26187E06 8EFC76FF FE76FF18 741C8006 ...t..v..v...-.&.....6..6t.|..$. 000040
1478044F FF261C62 1EC43C75 001C883E 83560000 00C890C8 C90129E8 0E50C02B +6P.Ò).èù.à...V.>...u<6.b.&.O.K. 000060
CB00909A 0676FF53 1C6436FF 10EBE42A 04882602 478E2607 FF263788 2606468A .F.&.7&..&.G.&..*ôS..6d.S.v....ù 000080
1C883E83 56570000 02C890CB C95E1C86 06FF9005 EB1C8806 FF077540 06C48309 ..à.àu....$......^èù.à...WV.>.. 0000A0
06C4830A 3300909A 1DF236FF 1C6236FF 1C6436FF 18EB507E F6080676 88577500 .uW.v..--P$..6d..6b..6·....3..6. 0000C0
FF263F88 261DF2A0 '478044F FF261C62 1EC41E7E C0084EC6 881C8806 FF047540 àu......6N.à-.6.b.&.O.xà.·.&.?&. 0000E0
02C8CBC9 5F5E1C86 06010646 88077500 1C883E83 D4EBE42A 05882602 478E2607 .&.G.&..*ô$&.>...u..F.....^ èùà. 000100
5098078A 26065EC4 1C6236FF 1C6436FF 22E85E75 001C883E 830A7688 56570000 ..WV.v..>...u^$".6d..6b.6^.Ī...P 000120
4FFF261C 621EC425 74C0084E C6880646 FF1C8806 FF047540 06C4830A A500909A ...E..6.àu......F..6N.àtX6.b.&.O 000140
3E83CAE8 E42A0588 2602478E 2607FF26 3F88261C 621EC407 8A26065E C4CD7804 .xe6^.&..6.b.&.?&..&.G.&..*ôSò.> 000160
89F44689 1C8E1688 1C8CA156 00000CC8 C8C95F5E 1C860601 0A468807 75001C88 ...u..F.....^ èùà...VÀ.......F¶. 000180
28F028F8 468904C4 8306DE0F FC9AF476 FF521C90 3688FA46 89FC4689 C02BF656 V-+à.F•.F*.6..R.v¶.•.B..6..FY+Þ+ 0001A0
F45EC422 75001C7A 3E834E01 75081DF0 3E8308E8 02EE8305 75101DF0 3E830676 v..>Þ..u..Y.$..>Þ..u.N.>z..u"6^¶ 0001C0
83F84EFF 02C483FE 71E80E50 98078A26 F446FF12 753010F2 3E831975 203F8026 &.?-u..>·.Ou..F¶&...P.Òqz.6..N½. 0001E0
```

Dump of file SATURN:(PCCOMMON.DUMP.DLL)ADV.TMP;1 on 18-APR-1990 10:36:19.81
File ID (484,12,0)   End of file block 39 / Allocated 40

Virtual block number 15 (0000000F), 512 (0200) bytes

```
1DF006C7 06750810 F03E8300 7EC908F0 4E89C828 1C8A0E88 04C48302 0F0FFC9A .=....á.....+à.Nÿ.è-..>þ..u.ú.þ. 000000
88F04E89 F4468CF2 7E89F47F C00849C1 88473005 C62605E8 F27EC4F0 4E880000 ...Nÿá- $.&ó.0G.èl.à.¶.-'.F¶.Nÿ. 000020
F846FF46 202C8003 7C613C07 74C90804 88078A26 F85EC4F2 76C5EE5E 8C1C680E .h..^Ýév á^½&.....èt.<a|.., F.F½ 000040
8308741C 8006081C 6CA11475 001C843E 83EE5E8E F45E8CF2 7689E375 003F8026 &.?.uD.v .^¶.^Ý.>...u.Àl.....t.. 000060
7E835657 000010C8 C8C95F5E 02C48302 FFE80E50 C02802E8 0001B805 7500F67E --.u.¡..$.+áP.Ò...á.^_èùà...WV.- 000080
1C6A3E83 008FE902 1C7C0683 FA5689F8 46891C7E 16881C7C A10001BE 18740006 ..t.ƒ..À|...~..F½.V°.¯|..Ô...>j. 0000A0
FC468907 88261C7C 1EC410E8 FA5689F8 46890257 88260788 261C7C1E C4137408 .t.á.|.&..&.W..F½.V°$.à.|.&...F• 0000C0
900AE802 ECB81575 FA4608F8 46880E74 081C6A3E 83041C7C 0683FA5E 8CF84689 .F½.^¹..|...>j..t..F½.F°u.¡$.$.. 0000E0
823639F6 28F45689 F24689FA 5688F846 88FA5E8C F8468902 F3880975 00FC7E83 .-=.u.¡µ..F½.^°.F½.V°.F .V¶+-96. 000100
C44690ED E8107ECE 38461574 003F8026 F246FFF2 5EC4900E E81C8A0E 881C741C .t.....$..á^ .F &.?.t.F;ö-.$Ù.Fá 000120
02C48301 59E80E57 0875001C 7A3E83FE 281C903E 88F37500 3F8026F2 46FFF25E ^ .F &.?.uµ.>..+±.>z..u.W.ÒY..á. 000140
C95F5E02 C483013C E80E5708 74001C7A 3E8306C4 830183E8 0EF876FF FA76FF56 V.v°.v½.Ò°..á..>z..t.W.Ò<..á.^_è 000160
80057547 067E8306 7467067E 83FE5689 FC46891C 7E16881C 7CA10000 06C890C8 ù.à...À|...~..F•.V±.~.gt..-.Gu.¯ 000180
1C8A3E83 007400FA 7E800006 1C8A06C7 0675001C 823E83FA 4688C02A 9003E801 .$..°à.F².>...u.ú.....-°.t..>.. 0001A0
FFFE76FF 1C8C36FF 1C8E36FF 0676FF1C 8A36FF1C 6836FF00 011C8A06 C7067500 .u.ú......6h..6...v..6...6...v±. 0001C0
FF1C8E36 FF147500 1C603E83 1B7400FA 7E800EC4 83071E1E FF261B7E 068EFC76 v=..-.&.....á..-°.t..>'..u..6... 0001E0
```

Dump of file SATURN:[PCCOMMON.DUMP.DLL]ADV.TMP;1 on 18-APR-1990 10:36:19.81
File ID (484,12,0)   End of file block 39 / Allocated 40

Virtual block number 14 (0000000E), 512 (0200) bytes

```
106AFF10 E9021C7C 068302C4 8300F1E8 0E106A04 1C7C2E83 00001C90 06C79007 ..ú.......|..j..Ðþ..á...|..Õ..j. 000000
E80E256A FF2AE903 49E80EF8 76FFF4E8 016A90FF 39E9026E E80E006A 90FF3FE9 Ö7..j..Ön.Ö9..j.S¶.v½.Öl.Ö*.j%.Ö 000020
88097400 1C6A3E83 0A7E0067 30057C00 653DFF0C E9037500 643D90FF 21E90428 (.Öl..=d.u.Ö..=e.|.=g.~Ö.>j..t.. 000040
FE80E903 75006E30 903AE8FE 5689FC46 89400C56 880A468B 0A4EFF0C 56880A46 F..V..N..F..V.a.F•.V±S:.=n.u.Ö.± 000060
00783DFE 89E90375 0075308F 74007330 FEE0E903 75007030 FEE4E903 75006F30 =o.u.Öö±=p.u.ÖÄ±=s.t.=u.u.Ö¿±=x. 000080
253C0474 C00AF646 88078A26 FC5EC4FC 46FF9034 EB0A46FF 90B1E8FF 79E90375 u.Öy.$Ÿ..F.$4..F=á^=&...F-.åt.<% 0000A0
56890A46 89FE5688 FC468806 C483044C E80E0A76 FF0C76FF 500A4628 C388EC75 u$.ú+F.P.v..v..ÒL..á..F•.V±.F..V 0000C0
A1FE51E9 0374200A 47F6261C 621EC4FC 63E90374 C00AF646 88078A26 0A5EC40C .á^.&...F-.åt.Öc=á.b.&-G. t.ÖQ±À 0000E0
8406FF04 740A067E 8300201D F206C706 74001C82 3E835657 000012C8 CBC91C86 ..èùà...WV.>...t.ú.·. ..-..t.... 000100
FE5689FC 46890257 88260788 261C7C1E C4197510 1C6A3E83 0774021C 6A3E831C ..>j..t..>j..u.á.|.&..&.W..F•.V± 000120
0EE80000 FE46C7FC 46890788 261C7C1E C4117400 1C843E83 902CE804 1C7C0683 ..|..$,..>...t.á.|.&...F=úF±..$. 000140
FE460BFC 46880E74 001C603E 83021C7C 0683FE56 89FC4689 99078826 1C7⌐1EC4 á.|.&....F•.V±..|...>'..t..F•.F± 000160
75001C84 3E83F456 89F24689 1C8E1688 1C8CA11D F0A3C028 9003E806 4688ı 74 t..F.$..+åÊÞ.À.......F·.V¶.>...u 000180
83D8F7FE 5688FC46 882007C6 26F246FF F25EC41D 750A067E 83287D00 FE7E8..1 1.~±.)+.-..u.á^·.F·&ó.-.F=.V±%Á. 0001A0
FA5E8CF8 46891C6E 880000F6 46C79006 E80001F6 46C7FE56 89FC4689 DAF700U2 @.¼Ö.F•.V±úF-..$..úF-..jn..F½.^* 0001C0
F876FFFA 76FF4574 001C823E 830AC483 06F31014 9AFC76FF FE76FF50 1E0676FF .v..P.v±:v=...µ..á..>...tE.v*.v½ 0001E0
```

Dump of file SATURN:[PCCOMMON.DUMP.DLL]ADV.TMP;1 on 18-APR-1990 10:36:19.81
File ID (484,12,0)   End of file block 39 / Allocated 40

Virtual block number 13 (00000000), 512 (0200) bytes

```
 0D74001C 7A3E831C 90A30BF7 1C90A11C 7A06FF0C 7D001C90 3E830C56 890A4689 .F..V..>...)...z.À..%AÈ...>z..t. 000000
 76FF060A 46FF1C82 06FF2D75 2E3F8026 0A5EC400 2010F206 C7067530 10F23E83 .>·.0u.ú.·. .á^.&.?.u-.....F...v 000020
 FF00011C 8A06C70A 7D001C8A 3E830C56 890A4689 08C48308 7BE80E1C 8A681E0A ..h...Ò(..á..F..V..>...).ú...... 000040
 06C70675 006C302B 7400683D 4074004E 30307400 46309807 8A260A5E C41C820E ...á^.&...=F.t==N.tə=h.t+=l.u.ú. 000060
 1C75003F 80260A5E C40A46FF 03754C3F 80260A5E C4097500 1C6A3E83 00021C6A j....>j..u.á^.&.?Lu..F.á^.&.?.u. 000080
 98078A26 C8E80008 1C6A06C7 D0E80010 1C6A06C7 D8E80001 1C6A06C7 90024EE9 ÒN..ú.j...ŠÁú.j...ŠÁú.j...Šà&... 0000A0
 00693DF8 468820F8 46831C68 06FF0875 00583005 74004730 0A740045 3DF84689 .F½=E.t.=G.t.=X.u...h..F½ .F½=i. 0000C0
 900159E9 0140E903 75002530 0152E903 7E013FE9 03750063 300191E9 037E7874 tx-.Õ..=c.u.Õ?.-.ÕR.=%.u.Õə.ÕY.. 0000E0
 1C7C1EC4 0DE80000 0247C726 0789261C 86A11FC4 261C7C1E C4157502 1C6A3E83 .>j..u.á.|.&á.À..&..&úG...Š.á.|. 000100
 E9037400 1C863E83 0170E903 75001C88 3E83041C 7C068307 89261C86 A11FC426 &á.À..&....|...>...u.Õp..>...t.Õ 000120
 00001C60 06C71C84 06FF01AC E9FFFFB8 01AFE903 75200A47 F6261C62 1EC4018D §.á.b.&-G. u.ÕÈ.¡..Õ^.....ú.'... 000140
 1C8A06C7 1C8206FF 1C6806FF 1C6606FF F2E8086A 90C3E802 C483019E E80E0A6A j..Ò...á.Šú.j.Š·..f...h.....ú... 000160
 741C9006 39FA4689 1C6AA3C0 287A7401 1C6A3E83 0081E903 75081C6A 3E830004 ...>j..u.Õ...>j..tz+àÈj,.F°9...t 000180
 1C90A105 1C902E83 909013E8 00001C90 06C70A74 001C7A3E 83FA4689 1C90A128 (À...F°.>z..t.ú.....Š........À.. 0001A0
 02C48304 80E80E3A 6A02C483 0130E80E 106A021C 7C06831C 90A3C02B 0270C008 .á).+àÈ....|..j..ÒO..á.j:.Ò...á. 0001C0
 EB1C90A3 C02B027D C0081C90 A300052D FA468815 74001C7A 3E832274 00FA7E83 .-°.t".>z..t..F°-..È...á).+àÈ..Š 0001E0
```

```
Dump of file SATURN:[PCCOMMON.DUMP.DLL]ADV.TMP;1 on 18-APR-1990 10:36:19.81
File ID (484,12,0)   End of file block 39 / Allocated 40

Virtual block number 12 (0000000C), 512 (0200) bytes

 3E2DC388 4C750C0A 47F626FC 7689F088 04478926 C02BEF0A 67802602 0A4F8026 &.O..&.g.y+á&.G..p.v=&-G..uL.û-> 000000
 810E7401 390A7E81 0775074A 087E8137 75011332 87F60608 68F9F700 0CB99907 ..¿..%*kA.-.2..u7.-.J.u..~.9.t.. 000020
 FF0A76FF 0C75C00d 02C48301 AC101E9A FA76FF0F 75FFFF0A 7E811675 0756087E -.V.u..~...u..v*...¯..á..àu..v.. 000040
 060868F9 F7000C89 99073E20 C3881575 080A47F6 26085EC4 04C4830C 51E80876 v.ÒQ..á.á^.&-G..u..û->..¿..%*kA. 000060
 57892607 89264008 57882606 47882606 77282637 8826085E 88677401 133287F6 -.2..tg.^.&.7&+w.&.G.&.W.a&..&.W 000080
 C48301CA 0E6E9AFA 76FF0677 FF265256 167EF608 04478926 48024588 F87E8802 ..-½.E.H&.G..-~.VR&.w..v*.n.ò..á 0000A0
 C408C483 01ED0E30 9A53006A 006A026A 0F742019 4387F6FA 5E8819E8 FC468908 ..F=Š..^*-.C. t.j.j.j.S.0.Ú..á.á 0000C0
 83005A0E 6E9AFA76 FF501606 46805600 018E17E8 07882606 468A065F C426085E ^.&á_..F.&..$./..V.F..P.v*.n.Z.. 0000E0
 4310429A 000AB8EC 8855C8C9 5F5EE42A 06468AFE CCE90374 FC7639FC 468908C4 á..F=9v=t.Òä±.F.*ð^_èùU.$¡...B.C 000100
 62A30856 88064688 1C7E1689 1C7CA310 56880E46 881C8E1E 8C1C8CA3 1C928801 .¡..È.......F..V.È|¯...~..F..V.Èb 000120
 8A06C703 08E90374 25F67E80 038DE900 001C8606 C700001C 8806C71C 6416891C ...d.ú.....ù.....Ô...--%t.Ô..ú.. 000140
 1C7AA31C 60A31C66 A31C80A3 1C82A31C 6AA31C84 A31C68A3 1C6CA3C0 2800011C ...+àÈl.Èh.È..Èj.È..È..Èf.È'.Èz. 000160
 260A5E88 903EE800 301DF206 C70A46FF 49753001 7F80260A 5EC40020 1DF206C7 ú.·. .á^.&...0ul.F.ú.·.0.$>..^.& 000180
 FF1A7500 1C6C3E83 0E75203F 80269028 E800001C 8006C71C 6C06FF0D 75283F80 .?+u...l.ú.....$(.&.? u..>l..u.. 0001A0
 260A5E88 0A46FF1C 7A06FFC7 75203F80 260A5EC4 00EB1C60 06FF9014 E81C8006 ...$....'.$.á^.&.?-uú..z..F..^.& 0001C0
 08C48308 C7E80E1C 90681E0A 76FF0C76 FFDD75C0 0802C483 0978E80E 5098078A ...P.Òx..á..àul.v..v..h...Òú..á. 0001E0
```

```
Dump of file SATURN:[PCCOMMON.DUMP.DLL]ADV.TMP;1 on 18-APR-1990 10:36:19.81
File ID (484,12,0)   End of file block 39 / Allocated 40

Virtual block number 11 (0000000B), 512 (0200) bytes

 47892600 0088065E C40046E9 03740038 832619C4 260A7DC4 26067EC4 02E3C10E .èD.á~.&á).&á.&.8.t.ÕF.á^.¡..&.G 000000
 260676C4 02E3C10E 5F882606 5EC40010 57832601 0E478326 065EC412 47892614 .&.G.á^.&.G..&.W..á^.&._.èD.áv.& 000020
 0000E90E 47892610 47892600 0088065E C4000EE9 03740240 0826008B 260A74C4 át.&..&.ä.t.Õ..á^.¡..&.G.&.G.Õ.. 000040
 0000000B 01810002 00880001 006D0103 007F0001 00210103 000390CB C95F5E1F .^_èù.....!.......m............. 000060
 006A028A 681E0297 681E0676 FF0876FF 016A006A D88EFFFF 881E5657 000000C8 è...WV.¡...Áj.j..v..v..h...h..j. 000080
 C483FFFF 00009A02 02681E02 A5681E18 6A0012E9 0374FFFF 300000FF FF9A176A j......=..t.Õ..j..hÉ..h@.......á 0000A0
 02008800 01002301 03000000 01003C00 02000304 CAC95F5E 1F0000E9 0000880A .¡..Õ...^_èò.....<.......#...... 0000C0
 01CB0001 881F0200 3E89088E FFFFB81E 00000000 00000000 00000000 08000800 ................¡...Ä.>...¡..ù. 0000E0
 00000000 00000000 00000000 00000000 00000000 00000000 00000A00 02000200 ................................ 000100
 420A47C6 26F85EC4 FE568CFC 46890E46 8DFA568C F84689EC 46805657 000016C8 è...WV.F&.F%.V".F..F=.V±á^%&6G.B 000120
 FFFC76FF 167FFF04 47C72602 57892607 89260857 89260647 89260856 88064688 .F..V.&.G.&.W.&..&.W.&úG.....v=. 000140
 263F8826 C02A1278 044FFF26 F85EC4F0 880CC483 00850206 9A53060A 76FF0C76 v..v..S......á..Þá^%&.O.x.*á&.?& 000160
 CBC95F5E C68806C4 83FFFF00 909A006A 53FA76FF 900FEB05 88260247 8E2607FF ..&.G.&..$...v"Sj.......á..ó^_èù 000180
 D1C888F9 F7000C89 99073E2D C388FA46 89E42A08 478A2608 5EC45657 000008C8 è...WVá^.&.G.*8.F*,ü->..¿..%*.àÌ 0001A0
 0A4F8026 085EC40F 74400A47 F6260774 830A47F6 26F84689 133205E0 D1C103E0 Á.èÌÁ.2..F%&-G..t.&-G.ät.á^.&.O. 0001C0
 90E2EB00 000447C7 26200A4F 80260E74 010A47F6 26085EC4 90012BE9 FFFFB820  ¡..Õ+..á^.&-G..t.&.O. &úG...$ä. 0001E0
```

```
Dump of file SATURN:[PCCOMMON.DUMP.DLL]ADV.TMP;1 on 18-APR-1990 10:36:19.81
File ID (484,12,0)   End of file block 39 / Allocated 40

Virtual block number 10 (0000000A), 512 (0200) bytes

 88F676C4 02E3C1F4 5E88FEFB E90003E9 0003E903 747FFFFE 7E81000D E90374FF .t.Ô...-±..t.Ô..Ô..Ô«±.^¶èD.áv-¡ 000000
 00020000 000100F9 00020004 CBC95F5E 1F0000E9 00008800 89260240 89260000 ..&.ə.&..¡..Ô..._^_èù....ª....... 000020
 00000000 0000000L 00000000 0008028E 00020000 00060081 00020000 0005013E >............................... 000040
 006A006A FF6A006A 01656801 36680676 FF0876FF D88EFFFF 881E5657 00001AC8 à...WV.j...Ä.v..v.h6.he.j.j.j.j. 000060
 0001099A 006A006A FF6A006A 01656801 34680676 FF0876FF F6468900 0000309A .=....F-.v..v.h4.he.j.j.j.j..... 000080
 0676FF08 76FF016A 006A001E E90374FF F47E8300 09E90375 FFF67E83 F4468900 ..F¶.--.u.Ô...~¶.t.Ô..j.j..v..v. 0000A0
 76C402E3 C10E5F8B 260A5EC4 00FAE900 00FFFF9A 306A006A 023A681E 023C681E .h<..h:.j.j0.....Ôª.á^.&._.èD.áv 0000C0
 0306D1E1 D1FE8BD9 8B147788 26124F8B 260A5EC4 02508B26 008B260A 74C4260A .&át.&..&.P.á^.&.O.&.w..\¯±ÎÄÌø. 0000E0
 4E8B0A57 8B260847 8B26EE5E C4F05689 EE4689C1 0306D1E1 D1D6D1E1 D1F713CB ù.KÌÄÌøÌÄÌø.è.FŸ.VÞá^Ÿ&.G.&.W..N 000100
 89EA4689 08578B26 06478B26 0A5EC4E8 5689E646 89C103E1 D1CB03E1 D1D98BF6 ~.\ÌÄ.ùÌÄ.è.FÌ.VÒá^.&.G.&.W..Fõ. 000120
 6A016A68 01346806 76FF0876 FFFA5689 F8468924 578B2622 478B260A 5EC4EC56 V&á^.&.G"&.W$.F½.Vª.v..v.h4.hj.j 000140
 C4FC76FF FE76FFEA 76FFEC76 FFFE5689 FC468900 00015E9A 006A006A F476FF00 ..v¶j.j..^....F•.V±.v$.vö.v±.v•á 000160
 8926F246 880A5EC4 0010E903 7500F27E 83F24689 025FFF26 E65EC437 FF26EE5E ^Ÿ&.7á^Ì&._..F·.~·.u.Ô..á^..F·&. 000180
 FFFF9A00 6A006AF4 76FF006A 01656801 34680676 FF0876FF 002CE932 508B3247 G2¡P2Ô,..v..v.h4.he.j..v¶j.j.... 0001A0
 1E565700 0000C8C8 C95F5E1F 0000E900 008BFF85 E90374FF F47E83F4 46890000 ...F¶.~¶.t.Ô..¡..Ô...^ èùà...WV. 0001C0
 5F8B2606 5EC40C12 77682606 5EC40014 57832601 12478326 065EC4D8 8E00088B ¡...Äá^.&.G..&.W..á^.&Èw..á^.&._ 0001E0
```

```
Dump of file SATURN:[PCCOMMON.DUMP.DLL]ADV.TMP;1 on 18-APR-1990 10:36:19.81
File ID (484,12,0)   End of file block 39 / Allocated 40

Virtual block number 9 (00000009), 512 (0200) bytes

46890CC4 831A5FFF 26065EC4 0477FF26 065EC4FE 76FFF076 FFF276FF 501( =A46 F*.P.v·.vÞ.v±ó^.&.w.ó^.&._..ó..F 000000
FA468806 5EC40017 E93250B8 32478926 F8468806 5EC40010 E9037500 F87EL3F8 ¾.-¾.u.Ò..ó^..F¾&.G2¡P2Ò..ó^..F* 000020
0179881E 56570000 22C8CBC9 5F5E1F00 00E90000 88245789 26224789 26FC5688 .V=&.G"&.W$¡..Ò...^ èùà"..WV.¡y. 000040
46890857 88260647 8826065E C4F05689 EE468918 57882616 47882606 5EC4088E .Äó^.&.G.&.W..FŸ.VÞã^.&.G.&.W..F 000060
C402E3C1 0E5F8826 065EC4F8 5689F646 89245788 26224788 26065EC4 E85689E6 Ì.VÒó^.&.G"&.W$.F-.V¾ó^.&._.èO.ó 000080
D6D1E1D1 FE88098B 14778826 124F8826 065EC402 50882600 88260A74 C4260676 v.&ót.&..&.P.ó^.&.O.&.w..Ì.±ÌÅÌ* 0000A0
5EC4FA46 8902478B 26EA5EC4 EC5689EA 4689C103 D6D1E1D1 D6D1E1D1 F713C803 .ù.%ÌÅÌ*ÌÅÌ*.è.Fõ.Všó^õ&.G..F*ó^ 0000C0
0375F846 08F6468B E056890E 46890657 88260447 8826EA5E C4E44689 078826EA õ&...Fõó^õ&.G.&.W..F8.VÅ.F-.F¾u. 0000E0
40082600 8826F676 C402E3C1 FC5E8800 00F446C7 FC4689FE 46890000 880126E9 Õ&.¡...F±.F=úF¶...^*èD.óv-&..&.ã 000100
88E676FF E876FF00 40E90001 E246C700 08E90374 F04608EE 468800F0 E9037502 .u.Òþ..FŸ.FÞt.Ò..úFã..Õã..vÒ.vÌ. 000120
F24689EE 5EFF5016 E2468DE4 76FFFA76 FF30FF26 0270FF26 F676C402 E3C1FC5E ^*èD.óv-&.p.&.O.v*.vÒ.Fã.P.^Ÿ.F· 000140
E9037500 E27E8300 86E93250 88324789 26F2468B 065EC400 10E90375 00F27E83 .-·.u.Ò..ó^..F·&.G2¡P2ÒÑ..-ã.u.Ò 000160
DE5EFF50 16E2468D 30FF2602 70FF26F6 76C402E3 C1FC5E88 E676FFE8 76FF0073 s..vÒ.vÌ.^*èD.óv-&.p.&.O.Fã.P.^8 000180
00E27E83 0073E932 50883247 8926F246 88065EC4 0010E903 7500F27E 83F24689 .F·.-·.u.Ò..ó^..F·&.G2¡P2Òs..-ã. 0001A0
8926F676 C402E3C1 F45E8802 50882600 8826F676 C402E3C1 FC5E8800 30E90375 u.ÒÒ..^*èD.óv-&..&.P..^¶èD.óv-&. 0001C0
FC7E8300 FE568301 FC468300 21E90003 E903747F FFF47E81 F446FF02 50892600 .&.P..F¶.-¶..t.Ò..ÒÌ..F*..V±..-* 0001E0
```

```
mp of file SATURN:[PCCOMMON.DUMP.DLL]ADV.TMP;1 on 18-APR-1990 10:36:19.81
le ID (484,12,0)   End of file block 39 / Allocated 40

rtual block number 8 (00000008), 512 (0200) bytes

65EC400 B4E904C4 83FFFF01 299A0676 FF0876FF 00E2E903 7400F67E 830000F6 -...--.t.Õã..v..v..)....á.ÕÇ.á^. 000000
008E903 75024708 26078826 225FC426 065EC400 1BE90375 24470B26 22478826 &.G"&.G$u.Õ..á^.&á_"&..&.G.u.Õ.. 000020
6FA5688 F8468805 5EC404C4 83FFFF01 799A0676 FF0876FF 0065E900 01F646C7 úF-..Õe..v..v..y....á.á^..F½.V*& 000040
3741247 3926FE56 88FC4688 065EC400 3CE90374 10573926 0045E903 740E4739 9G.t.ÕE.&9W.t.Õ<.á^..F=.V±&9G.t. 000060
0008806 5EC40E47 89261047 89260000 88065EC4 0021E903 74145739 26002AE9 Õ*.&9W.t.Õ!.á^.¡..&.G.&.G.á^.¡.. 000080
51E486A 0038E932 5288003E E9325088 0038E900 01F646C7 12478926 14478926 &.G.&.G.úF-..Õ;.¡P2Õ>.¡R2Õ8.jH.h 0000A0
FD0E903 75325030 FF45E903 75C00800 1AE90AC4 83FFFF00 009A0219 681E01EE Ý..h........á.Õ...àu.ÕE.=P2u.ÕÅ. 0000C0
E565700 0002C8CB C95F5E1F 0000E900 0088FF15 E9FFD1E9 FFCEE903 75325230 =R2u.Õö.Õ1.Õ..¡..Õ...^_èùà...WV. 0000E0
30006E9 037500FE 7E83FE46 8904C483 015E0171 9A0676FF 0876FFD8 8E000888 ¡...Á.v..v..q.^..á..F±.-±.u.Õ... 000100
?5F5E1F 0000E9FE 4688FE46 8904C483 00450286 9A0676FF 0876FF00 17E9FE46 F±Õ...v..v....E..á..F±.F±Õ...^ è 000120
:C4F256 89F04689 08578826 06478826 065EC4D8 8E0131B8 1E565700 0010C8C8 ùà...WV.¡1..Áá^.&.G.&.W..Fþ.V·Ï^ 000140
\74C426 0676C402 E3C10E5F 8826065E C4FC5689 FA468924 57882622 47882606 .&.G"&.W$.F*.V=á^.&._.èD.áv.&át. 000160
1D1F713 CB030601 E1D1FE8B D9881477 8826124F 8826065E C402508B 26008826 &..&.P.á^.&.O.&.w..\¯±IÅi=.ù.%iÅ 000180
375FC46 0BFA4688 FE468902 47882 6F4 5EC4F656 89F44689 C103D601 E1D1D601 l=iÅi=.è.F¶.V-á^¶&.G..F±.F*.F=u. 0001A0
:5FFF26 065EC404 77FF2606 5EC4FE76 FFF076FF F276FFFA 76FFFC76 FF003CE9 Õ<..v=.v*.v·.vÞ.v±á^.&.w.á^.&._. 0001C0
)0052E9 32508832 478926F8 4688065E C40010E9 037500F8 7E83F846 890CC483 .á..F½.-½.u.Õ..á^..F½&.G2¡P2ÕR¯.. 0001E0
```

Dump of file SATURN:[PCCOMMON.DUMP.DLL]ADV.TMP;1 on 18-APR-1990 10:36:19.81
File ID (484,12,0) End of file block 39 / Allocated 40

Virtual block number 7 (00000007), 512 (0200) bytes

```
04E9FE56 89FC4689 24578826 22478826 0A5EC400 B5E90375 02470826 07882622 "&..&.G.u.Õç.á^.&.G"&.W$.F•.V±Õ. 000000
0277FF26 FC5EC4>0 16AC4680 008EE903 7502470B 26078826 FC5EC404 FC468300 ..F•.á^•&..&.G.u.Õ...F¯.Pá^•&.w. 000020
0EC48326 5FFF260A 5EC40277 FF26FF56 9EC40677 FF260877 FF260A5E C437FF26 &.7á^.&.w.&.w.á.V.&.w.á^.&._&.á. 000040
FF0876FF 0106E932 50883247 8926AA46 880A5EC4 0010E903 7500AA7E 83AA4689 .F`.-`.u.Õ..á^..F`&.G2¡P2Õ...v.. 000060
76FFFF54 9689FF52 86890000 02789A50 16AC468D FE6A006A 01616801 34680676 v.h4.ha.j.j±.F¯.P.(.....R...T..v 000080
E9000002 979A37FF 260277FF 26FC5EC4 FF5286FF 006A0169 68013468 0676FF08 ..v.h4.hi.j..ÑR.á^•&.w.&.7.....Õ 0000A0
88260A5E C4000003 359A006A 006A006A 006A016E 68013668 0676FF08 76FFFF5F _..v..v.h6.hn.j.j.j.j..5...á^.&. 0000C0
9EC4007E E9037502 47082607 8826225F C4260A5E C40091E9 03752447 08262247 G"&.G$u.Õ..á^.&á_"&..&.G.u.Õ~.á. 0000E0
8826FF4E 9EC406FF 4E868300 05E9FF50 9689FF4E 86890A57 88260847 8826FF56 V.&.G.&.W...N...P.Õ....N..á.N.&. 000100
832E5FFF 260A5EC4 37FF26FF 4E9EC450 16FF5A86 8D0051E9 03750447 08260247 G.&.G.u.ÕQ...Z..Pá.N.&.7á^.&._.. 000120
76FF0024 E932508.. 32478926 AA46880A 5EC40010 E9037500 AA7E83AA 468906C4 á..F`.-`.u.Õ..á^..F`&.G2¡P2Õ$..v 000140
E90000B8 FF99E900 00FFFF9A 5016FF5A 8680FF6A 006A0161 68013668 0676FF08 ..v.h6.ha.j.j...Z..P.....Õ..¡..Õ 000160
0001017F 01030000 000300C5 0002007F 000101A6 01030008 90CBC95F 5E1F0000 ...^_èù.....|........é.......... 000180
00060015 00020000 00050050 00020088 00010080 01030000 0004000C 00020086 ....Ê.......¯.......]........... 0001A0
26065EC4 D88EFFFF 881E5657 00000AC8 00000000 00000000 000800F7 00020000 ....¥...........à...WV.¡...Äá^.& 0001C0
46C7FE56 89FC4689 14578826 12478826 065EC4FA 5689F846 8910578B 260E478B .G.&.W..F½.V*á^.&.G.&.W..F•.V±úF 0001E0
```

Dump of file SATURN:[PCCOMMON.DUMP.DLL]ADV.TMP;1 on 18-APR-1990 10:36:19.81
File ID (484,12,0)   End of file block 39 / Allocated 40

Virtual block number 6 (00000006), 512 (0200) bytes 02340103 00310004 00540203 00260004 00780203 00830001 01490103 0000000B ......I...*...x...&...I...1...4. 000000
00000000 00000000 00000000 005C0001 02380103 00440004 00610203 00580001 ..[...a...D...;...\............. 000020
0A76FF0C 76FF04C; 83FFFF01 799A0A76 FF0C76FF D88EFFFF 881E5657 000000C8 à...WV.¡...Á.v..v..y....é..v..v. 000040
0008881E 56570000 02C8CBC9 5F5E1F00 00E908C4 83FFFF00 369A0676 FF0876FF .v..v..6....é.Õ...^_èúà...WV.¡.. 000060
83FFFF00 009A0A76 FF0C76FF 0096E900 00880006 E9037500 3F83260A 5EC4088E .Ää^.&.?.u.Õ..¡..Õ..v..v........ 000080
5EC40013 E9037524 47082622 4788260A 5EC40076 E9037400 FE7E83FE 468904C4 é..Fz.~z.t.Õv.á^.&.G"&.G$u.Õ..á^ 0000A0
0876FF01 6A006A00 0107C726 0A5EC400 3CE90374 02470826 07882622 5FC4260A .&á_"&..&.G.t.Õ<.á^.&ú...j.j..v. 0000C0
FF0876FF 0A76FF0C 76FF006A 0000FFFF 9A306A00 6A01D868 1E01DA68 1E0676FF .v..hö..hÁ.j.j0.....j..v..v..v.. 0000E0
C4830029 00EF9A06 76FF0876 FF0A76FF 0C76FF00 17E90AC4 83FFFF03 479A0676 v..G....é.Õ...v..v..v..v..ÿ.)..é 000100
88260A5E C4D88E00 3E881E56 5700012A C8CBC95F 5E1F0000 E9FE4688 FE468908 ..Fz.FzÕ...^_èúà*..WV.¡>..Äá^.&. 000120
D9881477 8826124F 88260A5E C4025088 26008826 0A74C426 0A76C402 E3C10E5F _.èO.áv.&át.Ä..&.P.á^.&.O.&.w..\ 000140
FED6868D FF589689 FF568689 C1030601 E1D10601 E1D1F713 CB030601 E1D1FE88 _zlÄl.ù.%iÄl.iÄl.è..V...X...øz 000160
C40010E9 037500AA 7E83AA46 8906C483 2A5FFF26 0A5EC437 FF26FF56 9EC45016 .Pá.V.&.7á^.&._*.á..F^.-^.u.Õ..á 000180
FF9A5016 FED6868D C1426806 76FF0876 FF01D3E9 32508832 478926AA 46880A5E ^..F^&.G2¡P2Õ&_..v..v.hB...øz.P.. 0001A0
6A006A01 6E680134 680676FF 0876FF01 B1E93252 880006E9 03740000 300000FF ...=..t.Õ..¡R2ÕŸ..v..v.h4.hn.j.j 0001C0
5FC4260A 5EC400C8 E?037524 47082622 4788260A 5EC40000 02529A00 6A006A00 .j.j..R...é^.&.G"&.G$u.Õà.á^.&á_ 0001E0

```
Dump of file SATURN:[PCCOMMON.DUMP.DLL]ADV.IMP;1 on 18-APR-1990 10:36:19.81
File ID (484,12,0)   End of file block 39 / Allocated 40

Virtual block number 5 (00000005), 512 (0200) bytes

D88E015F 881E5657 000002C8 CBC95F5E 1F0000E9 0000FFFF 9A505200 00FFFF9A .....RP.....Ô...^_èùà...WV.¡_..Ä 000000
FE7E83FE 468908C4 83FFFF00 009A0676 FF0876FF 0A76FF0C 76FF0008 E90E4688 .F.ÕU..v..v..v..v.......á..Fz.-z 000020
FE76FFFE 468908C4 83024E00 369A0676 FF0876FF 0A76FF0C 76FF0017 E9037400 .t.Õ...v..v..v..v..6.N..á..Fz.vz 000040
6A016A00 6A016A00 6A0085E9 0AC48302 6302E49A 0676FF08 76FF0A76 FF0C76FF .v..v..v..v..Ô.c..á.Õç.j.j.j.j.j 000060
018A0000 9A0676FF 0876FF0A 76FF0C76 FF000002 7C9A5052 00000275 9A006A03 .j..u...RP.|....v..v..v..v...... 000080
016A006A 016A006A 0AC48302 9402E49A 0676FF08 76FF0A76 FF0C76FF 5008C483 .á.P.v..v..v..v..Ô....á.j.j.j.j. 0000A0
76FF0876 FF0A76FF 0C76FF00 6A0059E9 00000177 9A505200 0001709A 006A016A j.j..p...RP.w...ÕY.j..v..v..v..v 0000C0
2BE9002E E904C483 FFFF0051 9A011E68 1E0030E9 0040E90A C483019F 03479A06 ..G....á.Õa.Õ=..h...O....á.Õ..Õ• 0000E0
82E90375 013E30FF 5EE90375 013A30FF 15E90375 013830FF CAE90375 00023000 .=..u.Õò.=8.u.Õ..=:.u.Õ^.=>.u.Õý 000100
D88E01CC 881E5657 000000C8 CBC95F5E 1F0000E9 FFC3E9FF C3E90375 01403DFF .=a.u.Õù.Õù.Õ...^_èùà...WV.¡a..Ä 000120
680030E9 0AC48302 A600009A 0174681E 0145681E 00986800 46E9002F E90E4688 .F.Õ/.ÕF.h...hE..ħt....İ..á.ÕO.h 000140
7332503D FFCAE903 75C00800 1AE90AC4 83030700 009A0187 681E0188 681E009F ...h...hñ.......á.Õ...àu.Õò.=P2s 000160
ECB81E56 57000000 C8C8C95F 5E1F0000 E9FF00E9 FF8DE903 7732523D FFDBE903 .ÕU.=R2w.Õ§.ÕÄ.Õ...^_èùà...WV.¡$ 000180
5F5E1F00 00E90000 FF.'F9A0E 76FF0676 FF0876FF 00000247 C7260A5E C4D88E02 ..Äá^.&úG....v..v..v......Õ...^_ 0001A0
02050002 00000003 021F0002 007E0001 03660103 00000001 031D0002 0.'^FCBC9 èù...............f...~............... 0001C0
034F0002 001F0001 00150103 00000007 00C30002 00000006 01E50002 00C 7004 .......İ........ù...................O. 0001E0
```

Dump of file SATURN:[PCCOMMON.DUMP.OLL]ADV.TMP;1 on 18-APR-1990 10:36:19.81
File ID (484,12,0) End of file block 39 / Allocated 40

Virtual block number 3 (00000003), 512 (0200) bytes

```
03750C46 080A4688 0021E998 E38804C4 83002C00 519A00FD 681E0012 E9037400 .t.Õ...h=..Q.,..á.¡D.Õl..F..F.u. 000000
000ECAC9 5F5E1F?0 00E90000 88025789 26078926 FA5688F8 46880A5E C40010E9 Õ..á^..F½.V'&..&.W.¡..Õ...^_èò.. 000020
E9037520 460B1E46 880037E9 03752846 08264688 088E0008 881E5657 000008C8 à...WV.¡...Ä.F&.F(u.Õ7..F..F u.Õ 000040
03751446 08124688 0016E903 75184608 16468800 21E90375 1C46081A 4688002C ,..F..F.u.Õl..F..F.u.Õ...F..F.u. 000060
C4000FE9 03752446 08224688 0158E998 E0880006 E9037410 46080E46 880008E9 Õ...F..F.t.Õ..¡Ä.ÕX..F".F$u.Õ..á 000080
88F846FF 0003E900 00F846C7 0138E998 E0880006 E9037402 47082607 8826225E ^"&..&.G.t.Õ..¡Ä.Õ8.úF½..Õ...F½. 0000A0
18C42622 76C402E3 C1F85E88 001EE903 75024008 26008826 2276C402 E3C1F85E ^½èD.áv"&..&.@.u.Õ...^½èD.áv"&á. 0000C0
890000FF FF9A006A 2676FF28 76FFFFCA E900FDE9 98E08800 06E90374 003F8326 &.?.t.Õ..¡Ä.Õ».Õò..v(.v&j....... 0000E0
10478926 000088FA 5EC40C57 89260A47 89262456 88224688 FA5EC4FC 5689FA46 F'.V=á^'.F".V$&.G.&.W.á^'¡..&.G. 000100
261A4789 26185688 164688FA 5EC41247 89261447 89260000 88FA5EC4 0E478926 &.G.á^'¡..&.G.&.G.á^'.F..V.&.G.& 000120
89262447 89260000 88FA5EC4 20578926 1E478926 14568812 4688FA5E C41C5789 .W.á^'.F..V.&.G.&.W á^'¡..&.G$&. 000140
2A478926 205688 1E 4688FA5E C4285789 26264789 26105688 0E4688FA 5EC42247 G"á^'.F..V.&.G&&.W(á^'.F..V &.G' 000160
89260C56 880A4688 FA5EC430 5789262E 4789261C 56881A46 88FA5EC4 2C578926 &.W,á^'.F..V.&.G.&.W0á^'.F..V.&. 000180
76FFFA76 FFFC76FF 00010247 C726FA5E C4000032 47C726FA 5EC41857 89261647 G.&.W.á^'&úG2..á^'&úG....v=.v'.v 0001A0
FF9A2676 FF2876FF 000EE903 7400FE7E 83FE4689 08C483FF FF00369A 2676FF28 (.v&.6....á..F±.~±.t.Õ...v(.v&.. 0001C0
0002007A 00010084 0103000A 900024CA C95F5E1F 0000E9FE 4688FE46 890000FF ....F±.F±Õ...^_èò$.........z... 0001E0
```

```
Dump of file SATURN:[PCCOMMON.DUMP.DLL]ADV.TMP;1 on 18-APR-1990 10:36:19.81
File ID (484,12,0)   End of file block 39 / Allocated 40

Virtual block number 4 (00000004), 512 (0200) bytes

 01030000 00040287 00020000 0003006E 0002007C 0001029F 01030000 000100A0 ............|...n............... 000000
 00050014 00030019 02050000 00080108 0002001F 000101B8 0103001E 000100BA ¤.......£....................... 000020
 FF1276FF D88EFFFF 881E5657 000008C8 00000000 00000000 00000000 000.0071 q...............à...WV.|...Ä.v.. 000040
 7F8326FA 5EC40109 E90375FC 4608FA46 8BFC5689 FA468900 00FFFF9A 006A.076 v.j.......F°.V=.F°.F=u.Ö..á^°&.. 000060
 468D1076 FF1276FF 0048E903 750C460B 0A468800 C3E90E46 8800FCE9 03750012 ..u.Ö=..F.Öü..F..F.u.ÖH..v..v..F 000080
 5299F846 881DAE68 FE76FF00 00FFFF9A 5016FE46 80F876FF 0000FFFF 9A5016F8 ½.P......v½.F±.P......v±hÜ..F½.R 0000A0
 08C48300 AC01579A 1076FF12 76FFFA76 FFFC76FF 0000FFFF 9A0A76FF 0C76FF50 P.v..v.......v=.v°.v..v..W.¯..á. 0000C0
 C48300E6 03479A10 76FF1276 FFFA76FF FC76FF00 6A000107 C726FA5E C400A0E9 Ö..á^°&ú...j..v=.v°.v..v..G.Ì..á 0000E0
 7FE90000 BA000088 0068E9FF FF00009A 1076FF12 76FF0096 E900008A 0000B80A .|..¤..Ö...v..v......Ök.|..¤..Ö. 000100
 00BA0000 B80CC483 FFFF01C4 9A1076FF 1276FFFA 76FFFC76 FF0A76FF 0C76FF00 ..v..v..v=.v°.v..v..á....á.|..¤. 000120
 FFC1E903 75002030 FF35E903 7500003D 0033E900 53E90000 BA0000BB 005CE900 .Ö\.|..¤..ÖS.Ö3.=..u.ÖS.= .u.Öè. 000140
 FF98E903 75003B30 FFCCE903 7500303D FF73E903 7500293D FFA2E903 75002230 ="..u.ÖÅ.=).u.Ös.=0.u.Öä.=;.u.Ö.. 000160
 0000E900 00FFFF9A 0676FF08 76FF0A76 FF0C76FF 0E76FF10 76FF1276 FF0000E9 Ö...v..v..v..v..v..v......Ö.. 000180
 9A006A03 6A016A00 6A016A00 6A088E00 08881E56 57000000 C8000ECA C95F5E1F .^_èò..à...WV.|...Äj.j.j.j.j.j.. 0001A0
 5008C483 FFFF0036 9A0676FF 0876FF0A 76FF0C76 FF000001 B89A5052 000001B1 Ÿ.¯.RP.|....v..v..v..v..6....á.P 0001C0
 006A016A 016A006A 016A006A 0AC48300 8802E49A 0676FF08 76FF0A76 FF0C76FF .v..v..v..v..ö....á.j.j.j.j.j.j. 0001E0
```

```
Dump of file SATURN:[PCCOMMON.DUMP.DLL]ADV.TMP;1 on 18-APR-1990 10:36:19.81
File ID (484,12,0)   End of file block 39 / Allocated 40

Virtual block number 2 (00000002), 512 (0200) bytes

 6D657473 7953206E 6F697461 6D726F66 6E49206E 61606863 61422030 39393120  1990 Bachman Information System 000000
 FF0E76FF D88EFFFF 881E5657 00012CC8 00000000 00000000 002E636E 49202C73 s, Inc...........Å...WV.¦...Å.v.. 000020
 6A006A12 C483FFFF 00109A50 16FED486 80004268 1E0676FF 0876FF0A 76FF0C76 v..v..v..v..hB...Å±.P.......Å.j.j 000040
 C95F5E1F 0000E900 00FFFF9A 10406800 6A005A68 1E5016FE 04868001 6A006A01 .j.j...Å±.P.hZ.j.hÐ......Ö...^_è 000060
 6A006B68 1E0676FF 0876FF01 6A006A01 6A006AD8 8E000888 1E565700 0000C8CB ùÅ...WV.¦...Åj.j.j.j..v..v..hk¯j 000080
 83FFFF00 009A00AC 681E0080 681E306A 0012E903 74FFFF30 00000045 9A206A00 .j .E...=..t.Ö..j0.h...h^....... 0000A0
 FF002FE9 03750006 7E83D88E 0059881E 56570001 2CC8CBC9 5F5E1F00 00E90AC4 Å.Ö...^_èùÅ...WV.¦Y..Å.~..u.Ö/.. 0000C0
 0C76FF0E 76FF1076 FF0CC483 00280010 9A5016FE D4868000 C8681E08 76FF0A76 v..v..hÖ...Å±.P...(..Å..v..v..v. 0000E0
 00000001 00090002 0004C8C9 5F5E1F00 00E90AC4 83008000 009A5016 FED4868D ..Å±.P......Å.Ö...^_èù....\..... 000100
 00000000 00000000 00000008 00A20002 00000009 00C20002 00880001 00740103 ..t.......ô.......Å¯............. 000120
 00003D00 00FFFF9A 5016FC46 8D346A1C 6A1276FF D88EFFFF 881E5657 000008C8 Å...WV.¦...Å.v.j.j4.F•.P.....=.. 000140
 C4000007 C726FC5E C400C2E9 9BE18804 C483FFFF 00519A00 08681E00 12E90375 u.Ö...hÅ..Q....Å.¦Å.Òô.Å^•&ú...Å 000160
 26064789 26105688 0E4688FC 5EC40447 89261246 88FC5EC4 00000247 C726FC5E ^•&ÚG...Å^•.F.&.G.Å^•.F..V.&.G.& 000180
 6A012C68 020036FF 761B7C06 8EFFFF68 FFFF6800 6A006A06 76FF0876 FF085789 .W..v..v.j.j.h..h....|.&.6..h,.j 0001A0
 00519A00 EB681E00  2E90374 FA4608F8 4688FA56 89F84689 0000FFFF 9A006A00 .j.......F½.Vª.F½.Fªt.Ö...hŠ..Q. 0001C0
 003D0000 FFFF9AFC /6FFFE76 FF006AF8 76FFFA76 FF004EE9 98E3B804 C48300CD ë..Å.¡D.ÕN..vª.v½j..v±.v•.....=. 0001E0
```

```
Dump of file SATURN:[PCCOMMON.DUMP.DLL]ADV.TMP;1 on 18-APR-1990 10:36:19.81
File ID (484,12,0)   End of file block 39 / Allocated 40

Virtual block number 1 (00000001), 512 (0200) bytes

 00000000 00000040 ^0000000 00000088 0000FFFF 00000004 00000026 005A5A4D MZZ.&...........¡.......ə....... 000000
 00000080 000000u0 00000000 00000000 00000000 00000000 00000000 00000000 ................................ 000020
 6F6E6E61 63206D61 72676F72 70207369 685421CD 4C01B821 CD09B400 0EBA1F0E ..o..Ç.el¡.LeIThis program canno 000040
 00000000 00000024 0A000D2E 65646F60 20534F44 206E6920 6E757220 65622074 t be run in DOS mode....$....... 000060
 0005000C 00000000 00080000 00000000 000B8009 FD1D533F 0011014D 0505454E NE..M...?S.».................... 000080
 00000000 00000000 00010001 00040000 000001DE 00E900DF 00A400A0 0040004C L.ə...É.Ò.Ò.B................... 0000A0
 03480F00 034800A4 03720F00 03720065 02B40F00 02B40034 00E60F00 00E60023 #.Ì...Ì.4.Ç...Ç.e.r...r.É.H...H. 0000C0
 000F0F00 000F014F 004E0F00 004D0148 02060F00 02060126 04640F00 0464000D Ý.d...d.&.......H.M...N.O....... 0000E0
 01981EB1 019804A7 1E000F21 1C60020F 02020E21 00000000 187A0F00 187A0151 Q.z...z.....!...Ò.'.!...Ì...Ý... 000100
 410A0001 524F5349 56444153 5345434F 52505644 41110000 56444103 012C0004 ..,..ADV...ADVPROCESSADVISOR...A 000120
 01000003 4E495752 4F534956 44415445 47564441 10000243 4F525047 4C445644 DVDLGPROC...ADVGETADVISORWIN.... 000140
 454D004D 454D0353 4C4C4143 534F4408 4E49574D 50050000 57002200 10000700 .....".W...PMWIN.DOSCALLS.MEM.ME 000160
 55514954 47124753 4D54534F 50495447 0A495447 034B434F 4C42434F 4C4C414D MALLOCBLOCK.GTI.GTIPOSTMSG.GTIQU 000180
 544E4552 41504C4F 4F545952 45555149 5447124C 4F4F5457 4F444E49 57595245 ERYWINDOWTOOL.GTIQUERYTOOLPARENT 0001A0
 57480000 00000302 01000003 03010100 03020145 54495257 534F4408 4F495303 .SIO.DOSWRITE.................HW 0001C0
 74686769 7279706F 43202963 28207974 696C6974 5520726F 73697664 41204D53 SM Advisor Utility (c) Copyright 0001E0
```

```
Dump of file SATURN:[PCCOMMON.DUMP.DLL]ANALUT.TMP;1 on 18-APR-1990 10:36:38.62
File ID (506,31,0)   End of file block 35 / Allocated 36

Virtual block number 35 (00000023), 512 (0200) bytes

0A0A0A0A 0A0A0A0A 0A0A0A0A 0A0A0A0A 0A0A0A0A 0A0A0A0A 0A0A0A0A 0A0A0A0A ................................ 000000
0A0A0A0A 0A0A0A0A 0A0A0A0A 0A0A0A0A 0A0A0A0A 0A0A0A0A 0A0A0A0A 0A0A0A0A ................................ 000020
0A0A0A0A 0A0A0A0A 0A0A0A0A 0A0A0A0A 0A0A0A0A 0A0A0A0A 0A0A0A0A 0A0A0A0A ................................ 000040
0A0A0A0A 0A0A0A0A 0A0A0A0A 0A0A0A0A 0A0A0A0A 0A0A0A0A 0A0A0A0A 0A0A0A0A ................................ 000060
00000000 00000000 00000000 00000000 000A0A0A 0A0A0A0A 0A0A0A0A 0A0A0A0A ................................ 000080
00000000 00000000 00000000 20000000 00000000 00000000 00000000 00000000 ................................ 0000A0
61747320 200A0030 30303652 00003E3E 4753404E 3C3CFFFF 058C14FA 00000000 ....*.....<<NMSG>>..R6000..- sta 0000C0
72656765 746E6920 200A0033 30303652 0003000A 00776F6C 66726576 6F206863 ck overflow.....R6003..- integer 0000E0
6E652074 6F6E2020 0A003830 30365200 08000A0D 30207962 20656469 76696420  divide by 0.....R6008..- not en 000100
30365200 09000A0D 73746E65 6D756772 6120726F 66206563 61707320 6867756F ough space for arguments.....R60 000120
7269766E 6520726F 66206563 61707320 6867756F 6E652074 6F6E2020 0A0D3930 09..- not enough space for envir 000140
0020726F 72726520 656D6974 206E7572 00FF000A 0D00FC00 0A0D746E 656D6E6F onment...*......run-time error . 000160
6F6C2074 6F6E2074 6E696F70 20676E69 74616F6C 66202D0A 0D323030 36520002 ..R6002..- floating point not lo 000180
178A0002 00000005 059C0002 00000004 19060002 0003FFFF FF000A0D 64656461 aded..........#................. 0001A0
00000000 00000000 00000000 00000000 00000000 00000000 00000000 00000006 ................................ 0001C0
00000000 00000000 00000000 00000000 00000000 00000000 00000000 00000000 .........,...................... 0001E0
```

```
Dump of file SATURN:[PCCOMMON.DUMP.DLL]ANALUT.TMP;1 on 18-APR-1990 10:36:38.62
File ID (506,31,0)   End of file block 35 / Allocated 36

Virtual block number 34 (00000022), 512 (0200) bytes

00000000 00000000 00000000 00000000 00000000 00000000 00000000 00000000 ................................ 000000
00000000 000000C0 00000000 00000000 00000000 00000000 00000000 00000000 ................................ 000020
00000000 00000000 00000000 00000000 00000000 00000000 00000000 00000000 ................................ 000040
00000000 01681182 00000000 00000000 00000000 00000000 00000000 00000000 ..........................h..... 000060
00000000 00000000 00000000 00008181 81010000 00010000 00000000 00000000 ................................ 000080
00000000 00000000 00000000 00000000 00000000 00000000 00000000 00000000 ................................ 0000A0
00000000 00000000 00000000 00000000 00000000 00000000 00000000 00000000 ................................ 0000C0
00000000 00000000 00000000 00000000 00000000 00000000 00000000 00000000 ................................ 0000E0
00000000 00000000 00000000 00000000 00000000 00000000 00000000 00000000 ................................ 000100
00000000 00000000 00000000 00000000 00000000 00000000 00000000 00000000 ................................ 000120
00000000 00000000 00000000 00000000 00000000 00000000 00000000 00000000 ................................ 000140
00000000 00000000 00000000 00000000 00000000 00000000 00000000 00000000 ................................ 000160
00000000 00000000 00000000 00000000 00000000 00000000 00000000 00000000 ................................ 000180
0A0A0A0A 0A0A0A0A 0A0A0A0A 0A0A0A0A 0A000000 00000000 00000000 00000000 ................................ 0001A0
0A0A0A0A 0A0A0A0A 0A0A0A0A 0A0A0A0A 0A0A0A0A 0A0A0A0A 0A0A0A0A 0A0A0A0A ................................ 0001C0
0A0A0A0A 0A0A0A0A 0A0A0A0A 0A0A0A0A 0A0A0A0A 0A0A0A0A 0A0A0A0A 0A0A0A0A ................................ 0001E0
```

```
Dump of file SATURN:[PCCOMMON.DUMP.DLL]ANALUT.TMP;1 on 18-APR-1990 10:36:38.62
File ID (506,31,0)   End of file block 35 / Allocated 36

Virtual block number 33 (00000021), 512 (0200) bytes

 00000000 00000000 00000000 00000000 00000000 00000000 00000000 00000000 ................................ 000000
 00000000 00000000 00000000 00000000 00000000 00000000 00000000 00000000 ................................ 000020
 00000000 00000000 00000000 00000000 00000000 00000000 00000000 00000000 ................................ 000040
 00000000 00000000 00000000 00000000 00000000 00000000 00000000 00000000 ................................ 000060
 00000000 00000000 00000000 00000000 00000000 00000000 00000000 00000000 ................................ 000080
 00000000 00000000 00000000 00000000 00000000 00000000 00000000 00000000 ................................ 0000A0
 00000000 00000000 00000000 00000000 00000000 00000000 00000000 00000000 ................................ 0000C0
 00000000 00000000 00000000 00000000 00000000 00000000 00000000 00000000 ................................ 0000E0
 00000000 00000000 00000000 00000000 00000000 00000000 00000000 00000000 ................................ 000100
 00000000 00000000 00000000 00000000 00000000 00000000 00000000 00000000 ................................ 000120
 00000000 00000000 00000000 00000000 00000000 00000000 00000000 00000000 ................................ 000140
 00000000 00000000 00000000 00000000 00000000 00000000 00000000 00000000 ................................ 000160
 00000000 00000000 00000000 00000000 00000000 00000000 00000000 00000000 ................................ 000180
 00000000 00000000 00000000 00000000 00000000 00000000 00000000 00000000 ................................ 0001A0
 00000000 00000000 00000000 00000000 00000000 00000000 00000000 00000000 ................................ 0001C0
 00000000 00000000 00000000 00000000 00000000 00000000 00000000 00000000 ................................ 0001E0
```

```
Dump of file SATURN:[PCCOMMON.DUMP.DLL]ANALUT.TMP;1 on 18-APR-1990 10:36:38.62
File ID (506,31,0)   End of file block 35 / Allocated 36

Virtual block number 32 (00000020), 512 (0200) bytes

00000000 00000000 00000000 00000000 00000000 00000000 00000000 00000000 ................................ 000000
00000000 00000000 00000000 00000000 00000000 00000000 00000000 00000000 ................................ 000020
00000000 00000000 00000000 00000000 00000000 00000000 00000000 00000000 ................................ 000040
00000000 00000000 00000000 00000000 00000000 00000000 00000000 00000000 ................................ 000060
00000000 00000000 00000000 00000000 00000000 00000000 00000000 00000000 ................................ 000080
00000000 00000000 00000000 00000000 00000000 00000000 00000000 00000000 ................................ 0000A0
00000000 00000000 00000000 00000000 00000000 00000000 00000000 00000000 ................................ 0000C0
00000000 00000000 00000000 00000000 00000000 00000000 00000000 00000000 ................................ 0000E0
00000000 00000000 00000000 00000000 00000000 00000000 00000000 00000000 ................................ 000100
00000000 00000000 00000000 00000000 00000000 00000000 00000000 00000000 ................................ 000120
00000000 00000000 00000000 00000000 00000000 00000000 00000000 00000000 ................................ 000140
00000000 00000000 00000000 00000000 00000000 00000000 00000000 00000000 ................................ 000160
00000000 00000000 00000000 00000000 00000000 00000000 00000000 00000000 ................................ 000180
00000000 00000000 00000000 00000000 00000000 00000000 00000000 00000000 ................................ 0001A0
00000000 00000000 00000000 00000000 00000000 00000000 00000000 00000000 ................................ 0001C0
00000000 00000000 00000000 00000000 00000000 00000000 00000000 00000000 ................................ 0001E0
```

```
Dump of file SATURN:[PCCOMMON.DUMP.DLL]ANALUT.TMP;1 on 18-APR-1990 10:36:38.62
File ID (506,31,0)   End of file block 35 / Allocated 36

Virtual block number 31 (0000001F), 512 (0200) bytes

00000000 00000000 00000000 00000000 00000000 00000000 00000000 00000000 ................................ 000000
00000000 00000000 00000000 00000000 00000000 00000000 00000000 00000000 ................................ 000020
00000000 00000000 00000000 00000000 00000000 00000000 00000000 00000000 ................................ 000040
00010000 00000000 00000000 00000000 00000000 00000000 00000000 00000000 ................................ 000060
00000000 00000000 00000000 00000000 00000000 00000000 00000000 00000200 ................................ 000080
00000000 00000000 00000000 00000000 00000000 00000000 00000000 00000000 ................................ 0000A0
00000000 00000000 00000000 00000000 00000000 00000000 00000000 00000000 ................................ 0000C0
00000000 00000000 00000000 00000000 00000000 00000000 00000000 00000000 ................................ 0000E0
00000000 00000000 00000000 00000000 00000000 00000000 00000000 00000000 ................................ 000100
00000000 00000000 00000000 00000000 00000000 00000000 00000000 00000000 ................................ 000120
00000000 00000000 00000000 00000000 00000000 00000000 00000000 00000000 ................................ 000140
00000000 00000000 00000000 00000000 00000000 00000000 00000000 00000000 ................................ 000160
00000000 00000000 00000000 00000000 00000000 00000000 00000000 00000000 ................................ 000180
00000000 00000000 00000000 00000000 00000000 00000000 00000000 00000000 ................................ 0001A0
00000000 00000000 00000000 00000000 00000000 00000000 00000000 00000000 ................................ 0001C0
00000000 00000000 00000000 00000000 00000000 00000000 00000000 00000000 ................................ 0001E0
```

```
Dump of file SATURN:[PCCOMMON.DUMP.DLL]ANALUT.TMP;1 on 18-APR-1990 10:36:38.62
File ID (506,31,0)   End of file block 35 / Allocated 36

Virtual block number 30 (0000001E), 512 (0200) bytes

00000000 00000000 00000000 00000000 00000000 00000000 00000000 00000000 ................................ 000000
00000000 00000000 00000000 00000000 00000000 00000000 00000000 00000000 ................................ 000020
00000000 00000000 00000000 00000000 00000000 00000000 00000000 00000000 ................................ 000040
00000000 00000000 00000000 00000000 00000000 00000000 00000000 00000000 ................................ 000060
00000000 00000000 00000000 00000000 00000000 00000000 00000000 00000000 ................................ 000080
00000000 00000000 00000000 00000000 00000000 00000000 00000000 00000000 ................................ 0000A0
00000000 00000000 00000000 00000000 00000000 00000000 00000000 00000000 ................................ 0000C0
00000000 00000000 00000000 00000000 00000000 00000000 00000000 00000000 ................................ 0000E0
00000000 00000000 00000000 00000000 00000000 00000000 00000000 00000000 ................................ 000100
00000000 00000000 00000000 00000000 00000000 00000000 00000000 00000000 ................................ 000120
00000000 00000000 00000000 00000000 00000000 00000000 00000000 00000000 ................................ 000140
00000000 00000000 00000000 00000000 00000000 00000000 00000000 00000000 ................................ 000160
00000000 00000000 00000000 00000000 00000000 00000000 00000000 00000000 ................................ 000180
00000000 00000000 00000000 00000000 00000000 00000000 00000000 00000000 ................................ 0001A0
00000000 00000000 00000000 00000000 00000000 00000000 00000000 00000000 ................................ 0001C0
00000000 00000000 00000000 00000000 00000000 00000000 00000000 00000000 ................................ 0001E0
```

```
Dump of file SATURN:[PCCOMMON.DUMP.DLL]ANALUT.TMP;1 on 18-APR-1990 10:36:38.62
File ID (506,31,0)   End of file block 35 / Allocated 36

Virtual block number 29 (0000001D), 512 (0200) bytes

00000000 00000000 00000000 00000000 00000000 00000000 00000000 00000000 ................................ 000000
00000000 00000000 00000000 00000000 00000000 00000000 00000000 00000000 ................................ 000020
00000000 00000000 00000000 00000000 00000000 00000000 00000000 00000000 ................................ 000040
00000000 00000000 00000000 00000000 00000000 00000000 00000000 00000000 ................................ 000060
00000000 00000000 00000000 00000000 00000000 00000000 00000000 00000000 ................................ 000080
00000000 00000000 00000000 00000000 00000000 00000000 00000000 00000000 ................................ 0000A0
00000000 00000000 00000000 00000000 00000000 00000000 00000000 00000000 ................................ 0000C0
00000000 00000000 00000000 00000000 00000000 00000000 00000000 00000000 ................................ 0000E0
00000000 00000000 00000000 00000000 00000000 00000000 00000000 00000000 ................................ 000100
00000000 00000000 00000000 00000000 00000000 00000000 00000000 00000000 ................................ 000120
00000000 00000000 00000000 00000000 00000000 00000000 00000000 00000000 ................................ 000140
00000000 00000000 00000000 00000000 00000000 00000000 00000000 00000000 ................................ 000160
00000000 00000000 00000000 00000000 00000000 00000000 00000000 00000000 ................................ 000180
00000000 00000000 00000000 00000000 00000000 00000000 00000000 00000000 ................................ 0001A0
00000000 00000000 00000000 00000000 00000000 00000000 00000000 00000000 ................................ 0001C0
00000000 00000000 00000000 00000000 00000000 00000000 00000000 00000000 ................................ 0001E0
```

```
mp of file SATURN:[PCCOMMON.DUMP.DLL]ANALUT.TMP;1 on 18-APR-1990 10:36:38.62
le 10 (506,31,0)   End of file block 35 / Allocated 36

rtual block number 28 (0000001C), 512 (0200) bytes

0000000 00000000 00000000 00000000 00000000 00000000 00000000 00000000 ................................ 000000
0000000 00000000 00000000 00000000 00000000 00000000 00000000 00000000 ................................ 000020
0000000 00000000 00000000 00000000 00000000 00000000 00000000 00000000 ................................ 000040
0000000 00000000 00000000 00000000 00000000 00000000 00000000 00000000 ................................ 000060
0000000 00000000 00000000 00000000 00000000 00000000 00000000 00000000 ................................ 000080
0000000 00000000 00000000 00000000 00000000 00000000 00000000 00000000 ................................ 0000A0
0000000 00000000 00000000 00000000 00000000 00000000 00000000 00000000 ................................ 0000C0
0000000 00000000 00000000 00000000 00000000 00000000 00000000 00000000 ................................ 0000E0
0000000 00000000 00000000 00000000 00000000 00000000 00000000 00000000 ................................ 000100
0000000 00000000 00000000 00000000 00000000 00000000 00000000 00000000 ................................ 000120
0000000 00000000 00000000 00000000 00000000 00000000 00000000 00000000 ................................ 000140
0000000 00000000 00000000 00000000 00000000 00000000 00000000 00000000 ................................ 000160
0000000 00000000 00000000 00000000 00000000 00000000 00000000 00000000 ................................ 000180
0000000 00000000 00000000 00000000 00000000 00000000 00000000 00000000 ................................ 0001A0
0000000 00000000 00000000 00000000 00000000 00000000 00000000 00000000 ................................ 0001C0
000000 00000000 00000000 00000000 00000000 00000000 00000000 00000000 ................................ 0001E0
```

```
Dump of file SATURN:[PCCOMMON.DUMP.DLL]ANALUT.TMP;1 on 18-APR-1990 10:36:38.62
File ID (506,31,0)   End of file block 35 / Allocated 36

Virtual block number 27 (0000001B), 512 (0200) bytes

00000000 00000000 00000000 00000000 00000000 00000000 00000000 00000000 ................................ 000000
00000000 00000000 00000000 00000000 00000000 00000000 00000000 00000000 ................................ 000020
00000000 00000000 00000000 00000000 00000000 00000000 00000000 00000000 ................................ 000040
00000000 00000000 00000000 00000000 00000000 00000000 00000000 00000000 ................................ 000060
00000000 00000000 00000000 00000000 00000000 00000000 00000000 00000000 ................................ 000080
00000000 00000000 00000000 00000000 00000000 00000000 00000000 00000000 ................................ 0000A0
00000000 00000000 00000000 00000000 00000000 00000000 00000000 00000000 ................................ 0000C0
00000000 00000000 00000000 00000000 00000000 00000000 00000000 00000000 ................................ 0000E0
00000000 00000000 00000000 00000000 00000000 00000000 00000000 00000000 ................................ 000100
00000000 00000000 00000000 00000000 00000000 00000000 00000000 00000000 ................................ 000120
00000000 00000000 00000000 00000000 00000000 00000000 00000000 00000000 ................................ 000140
00000000 00000000 00000000 00000000 00000000 00000000 00000000 00000000 ................................ 000160
00000000 00000000 00000000 00000000 00000000 00000000 00000000 00000000 ................................ 000180
00000000 00000000 00000000 00000000 00000000 00000000 00000000 00000000 ................................ 0001A0
00000000 00000000 00000000 00000000 00000000 00000000 00000000 00000000 ................................ 0001C0
00000000 00000000 00000000 00000000 00000000 00000000 00000000 00000000 ................................ 0001E0
```

```
Dump of file SATURN:[PCCOMMON.DUMP.DLL]ANALUT.TMP;1 on 18-APR-1990 10:36:38.62
File ID (506,31,0)   End of file block 35 / Allocated 36

Virtual block number 26 (0000001A), 512 (0200) bytes

00000000 00000000 00000000 00000000 00000000 00000000 00000000 00000000 ................................ 000000
00000000 00000000 00000000 00000000 00000000 00000000 00000000 00000000 ................................ 000020
00000000 00000000 00000000 00000000 00000000 00000000 00000000 00000000 ................................ 000040
00000000 00000000 00000000 00000000 00000000 00000000 00000000 00000000 ................................ 000060
00000000 00000000 00000000 00000000 00000000 00000000 00000000 00000000 ................................ 000080
00000000 00000000 00000000 00000000 00000000 00000000 00000000 00000000 ................................ 0000A0
00000000 00000000 00000000 00000000 00000000 00000000 00000000 00000000 ................................ 0000C0
00000000 00000000 00000000 00000000 00000000 00000000 00000000 00000000 ................................ 0000E0
00000000 00000000 00000000 00000000 00000000 00000000 00000000 00000000 ................................ 000100
00000000 00000000 00000000 00000000 00000000 00000000 00000000 00000000 ................................ 000120
00000000 00000000 00000000 00000000 00000000 00000000 00000000 00000000 ................................ 000140
00000000 00000000 00000000 00000000 00000000 00000000 00000000 00000000 ................................ 000160
00000000 00000000 00000000 00000000 00000000 00000000 00000000 00000000 ................................ 000180
00000000 00000000 00000000 00000000 00000000 00000000 00000000 00000000 ................................ 0001A0
00000000 00000000 00000000 00000000 00000000 00000000 00000000 00000000 ................................ 0001C0
00000000 00000000 00000000 00000000 00000000 00000000 00000000 00000000 ................................ 0001E0
```

```
Dump of file SATURN:[PCCOMMON.DUMP.DLL]ANALUT.TMP;1 on 18-APR-1990 10:36:38.62
File ID (506,31,0)   End of file block 35 / Allocated 36

Virtual block number 25 (00000019), 512 (0200) bytes

00000000 00000000 00000000 00000000 00000000 00000000 00000000 00000000 ................................ 000000
00000000 00000000 00000000 00000000 00000000 00000000 00000000 00000000 ................................ 000020
5F454C49 465F435. 01660000 00000000 00000000 00000000 00000000 00000000 ......................f._C_FILE_ 000040
00000588 12940584 12940580 1294057C 1294FFFF 12940000 00000030 4F464E49 INFO=...........|............... 000060
00000000 00000000 00000001 FFFF0000 000005A2 00000200 FFFFFFFF 01010000 ...........A.................... 000080
00000000 00000000 00000000 00000000 00000202 00000000 00000000 00000102 ................................ 0000A0
00000000 00000000 00000000 00000000 00000000 00000000 00000000 00000000 ................................ 0000C0
00000000 00000000 00000000 00000000 00000000 00000000 00000000 00000000 ................................ 0000E0
00000000 00000000 00000000 00000000 00000000 00000000 00000000 00000000 ................................ 000100
00000000 00000000 00000000 00000000 00000000 00000000 00000000 00000000 ................................ 000120
00000000 00000000 00000000 00000000 00000000 00000000 00000000 00000000 ................................ 000140
00000000 00000000 00000000 00000000 00000000 00000000 00000000 00000000 ................................ 000160
00000000 00000000 00000000 00000000 00000000 00000000 00000000 00000000 ................................ 000180
00000000 00000000 00000000 00000000 00000000 00000000 00000000 00000000 ................................ 0001A0
00000000 00000000 00000000 00000000 00000000 00000000 00000000 00000000 ................................ 0001C0
00000000 00000000 00000000 00000000 00000000 00000000 00000000 00000000 ................................ 0001E0
```

```
Dump of file SATURN:[PCCOMMON.DUMP.DLL]ANALUT.TMP;1 on 18-APR-1990 10:36:38.62
File ID (506,31,0)   End of file block 35 / Allocated 36

Virtual block number 23 (00000017), 512 (0200) bytes

 00000000 00000000 00000000 00000000 00000000 00000000 00000000 00000000 ................................ 000000
 2800296C 6C756E28 00000000 00000000 00000000 00000000 00000000 00000000 ........................(null).( 000020
 00000000 000019C8 1C501149 1C501C50 00000000 00002320 2D2B0029 6C6C756E null).+- #......P.P.I.P.Á....... 000040
 00000000 00000000 00000000 00000000 00000000 00000000 00000000 00000000 ................................ 000060
 00000000 00000000 00000000 00000000 00000000 00000000 00000000 00000000 ................................ 000080
 00000000 00000000 00000000 00000000 00000000 00000000 00000000 00000000 ................................ 0000A0
 00000000 00000000 00000000 00000000 00000000 00000000 00000000 00000000 ................................ 0000C0
 00000000 00000000 00000000 00000000 00000000 00000000 00000000 00000000 ................................ 0000E0
 00000000 00000000 00000000 00000000 00000000 00000000 00000000 00000000 ................................ 000100
 00000000 00000000 00000000 00000000 00000000 00000000 00000000 00000000 ................................ 000120
 00000000 00000000 00000000 00000000 00000000 00000000 00000000 00000000 ................................ 000140
 00000000 00000000 00000000 00000000 00000000 00000000 00000000 00000000 ................................ 000160
 00000000 00000000 00000000 00000000 00000000 00000000 00000000 00000000 ................................ 000180
 00000000 00000000 00000000 00000000 00000000 00000000 00000000 00000000 ................................ 0001A0
 00000000 00000000 00000000 00000000 00000000 00000000 00000000 00000000 ................................ 0001C0
 00000000 00000000 00000000 00000000 00000000 00000000 00000000 00000000 ................................ 0001E0
```

```
Dump of file SATURN:[PCCOMMON.DUMP.DLL]ANALUT.TMP;1 on 18-APR-1990 10:36:38.62
File ID (506,31,0)   End of file block 35 / Allocated 36

Virtual block number 24 (00000018), 512 (0200) bytes

00000000 00000000 00000000 00000000 00000000 00000000 00000000 00000000 ................................ 000000
00000000 00000000 00000000 00000000 00000000 00000000 00000000 00000000 ................................ 000020
00000000 00000000 00000000 00000000 00000000 00000000 00000000 00000000 ................................ 000040
00000000 00000000 00000000 00000000 00000000 00000000 00000000 00000000 ................................ 000060
00000000 00000000 00000000 00000000 00000000 00000000 00000000 00000000 ................................ 000080
00000000 00000000 00000000 00000000 00000000 00000000 00000000 00000000 ................................ 0000A0
00000000 00000000 00000000 00000000 00000000 00000000 00000000 00000000 ................................ 0000C0
00000000 00000000 00000000 00000000 00000000 00000000 00000000 00000000 ................................ 0000E0
00000000 00000000 00000000 00000000 00000000 00000000 00000000 00000000 ................................ 000100
00000000 00000000 00000000 00000000 00000000 00000000 00000000 00000000 ................................ 000120
00000000 00000000 00000000 00000000 00000000 00000000 00000000 00000000 ................................ 000140
00000000 00000000 00000000 00000000 00000000 00000000 00000000 00000000 ................................ 000160
00000000 00000000 00000000 00000000 00000000 00000000 00000000 00000000 ................................ 000180
00000000 00000000 00000000 00000000 00000000 00000000 00000000 00000000 ................................ 0001A0
00000000 00000000 00000000 00000000 00000000 00000000 00000000 00000000 ................................ 0001C0
00000000 00000000 00000000 00000000 00000000 00000000 00000000 00000000 ................................ 0001E0
```

```
Dump of file SATURN:[PCCOMMON.DUMP.DLL]ANALUT.TMP;1 on 18-APR-1990 10:36:38.62
File ID (506,31,0)   End of file block 35 / Allocated 36

Virtual block number 22 (00000016), 512 (0200) bytes

F9F7000C 8999059A 2DC38815 75080A47 F6265575 023C0324 0A478A26 065EC4F6 -á^.&.G.$.<.uU&-G..u..ú-...¿..%* 000000
0877FF26 5028"EC0 08FC4689 06472826 07882606 5E883974 01118E87 F606086B kÁ.-....t9.^.&..&+G..F•.à-(P&.w. 000020
200A4F80 26065EC4 0874FC46 3808C483 16E80EBC 9A50E42A 08478A26 0677FF26 &.w.&.G.*ðP.¥.Ò..á.;F•t.á^.&.O.  000040
CBC95EC6 88000004 47C72602 57892607 89260857 88260647 8826065E C4FFFFBE ƒ..á^.&.G.&.W.&..&.W.&úG....ó^èù 000060
00061668 00020000 0004187E 00020007 0001112E 01030005 00011166 0103000C ....f...............~.......h... 000080
00010EE8 01030026 00011797 01030022 0001174C 01030088 000117E1 01050000 ....Å.......L...".......&...Ò... 0000A0
00010CE1 0103005B 00010CF4 01030044 00031008 0203004D 00011080 0103003A :...¯...M.......D...¶...[...Ã... 0000C0
54206E75 52205340 00000000 00000000 00000000 00000000 00000000 0000005C \.......................MS Run-T 0000E0
38383931 20296328 20746867 69727970 6F432020 20797261 7262694C 20656069 ime Library - Copyright (c) 1988 000100
20202020 20202020 20000000 64250011 70726F43 2074666F 736F7263 6940202C , Microsoft Corp..%d...          000120
10101010 10101010 48202020 20202020 20202020 20202020 20202028 28282828 (((((               H........ 000140
01018181 81818181 10101010 10101084 84848484 84848484 84101010 10101010 ................................ 000160
02028282 82828282 10101010 10100101 01010101 01010101 01010101 01010101 ................................ 000180
00000000 00000000 00201010 10100202 02020202 02020202 02020202 02020202 ..................... .......... 0001A0
00000000 00000000 00000000 00000000 00000000 00000000 00000000 00000000 ................................ 0001C0
00000000 00000000 00000000 00000000 00000000 00000000 00000000 00000000 ................................ 0001E0
```

```
Dump of file SATURN:[PCCOMMON.DUMP.DLL]ANALUT.TMP;1 on 18-APR-1990 10:36:38.62
File ID (506,31,0)   End of file block 35 / Allocated 36

Virtual block number 21 (00000015), 512 (0200) bytes

 01240074 C63B0068 E8C03306 77B8B8E8 3780198C 1E8E2605 74C73B15 DFBFD88C .ÄeÔ.;út.&..¥..7Š£.w.3àÒk.;6t.$. 000000
 A3260474 C13B1633 89D88C98 E84E4E96 0574001D E8FE4DFE 0D74005F E8984040 ãa.Ò_.t.±M±Ò..t..NNŠ..Á¿3.;ét.&Ê 000020
 19C21638 267FFF3A 414149C8 28037401 A8FE4588 51C399C0 33024789 078819C0 â...¯G.3ä.úQ.E±´.t.+âIAÅα..&;.ô. 000040
 75EAD1D2 F7087500 0CE8C628 C22302F7 0072C203 1572C603 C188F575 EAD10476 v.Îõu%.è.ór..ór.%@#ô+6Ò..u.%@Îõu 000060
 4AD728D6 88067789 FFFEFE44 C7F203F0 88FE8857 18740010 E85152C3 59C033E5 |3âYúRQÒ..t.W.±.Þ.·úD±±..W..ø+øJ 000080
 FFFA8308 C483151B 16F89A1F 06500001 88505252 1E023350 53C35A59 58FE5589 .U±XYZÙSP3@.RRP¡..P...½....å..°. 0000A0
 07754806 46880856 8801668F 3875000A 7E830657 56EC8855 C3D20802 745B5A1F .Z[t..@úU.$VW..~..u8ef..V..F.Hu. 0000C0
 8334735E 003EE856 0E468902 44880074 F73B1174 48056636 884CE827 720057E8 ÒW.r'ŠL.6f.Ht.;%t..D..F.VÒ>.^s4. 0000E0
 0000FFFF 9A50C033 501652C4 885021E8 99FFFFB8 0675D208 04730566 FE8104C6 ô..±f.s..@u.¡...ŠIP.6R.P3âP..... 000100
 39F7880E 4E88CB5D E5885E5F 07C033D3 88056636 89025C89 1489E675 C085F958 (°.âu]...\..6f..Æ3à._^.])ù.N..%9 000120
 1E390675 F73BC18E D3882672 1C03DA88 2CE8F9F2 750566FE 8104C683 0C74024C L.t..6..±f.u·°$,.Ö..F£.Æ.ê;%u.9. 000140
 885500C3 D1880487 92016016 890475F7 380E75C0 850000FF FF9A5153 13730160 '.s.SQ......âuB;%u...'.....lù.U. 000160
 8A0A4688 D128D187 D1030323 D818D128 0C740AF7 D788067E C45738E3 0C4E88EC $.N.D8W6~..ø%Ot.+Ì.ÛW£.Ì.Ì+Ì.F.. 000180
 46885FAA F3C913AB F3E9D1C3 8EFFFFC3 81C38C10 E3D187AA F3C913AB F3E9D1E0 ÅiÕµ¨.èµ^.ìD..ù.ù...ùìÕµ¨.èµ¨ .F 0001A0
 08CA5DE5 8BE3F706 46880875 0A5E8808 0B0C5E8B 084688EC 8B55CB5D 08568806 ..V.]úU.$.F..^..Á.^.u..F.%D.[]ò. 0001C0
 2B560000 04C80008 CA5DE58B D103E3F7 06468BC8 030C66F7 064688C8 8BE3F700 .%D.à.F.%f..à.F.%D.Ì.[]ò..à...V+ 0001E0
```

```
Dump of file SATURN:[PCCOMMON.DUMP.DLL]ANALUT.TMP;1 on 18-APR-1990 0:36:38.62
File ID (506,31,0)   End of file block 35 / Allocated 36

Virtual block number 20 (00000014), 512 (0200) bytes

9007E808 C48313A7 17AE9A50 FE76FF00 6A561274 D008FE56 89FC4689 02C48314 ..Á..F=.V±.Àt.Vj..v±P.Ü.Ī..Á.$.. 000000
AEF2C033 F78B067E C4D98827 E30E4E88 1E5657EC 885590CB C95EFE56 88FC4688 .F=.V±^èù.U.ÈWV..N.D'.ìá~..%3á·Ù 000020
5E1FC188 D1F74949 04740477 FF453A26 C933FF44 8AA6F30A 76C5FE88 C80309F7 %).ù.±év.µI.D.3è&:E.w.t.II%I.è.^ 000040
750AF983 1374C00A 93FC071E 570A7EC5 1E085688 0646880E 4E8800CB 50E5885F _.I]ù..N..F..V..é~.W..=..àt..*.u 000060
D38792F1 F793F1F7 0274C008 D23392F7 880AF700 D2830BF7 AA2D800A 79D2080E ..@y.¯-¨%Ù.@.%Ó.%.3@.àt.%þ.%þ..Æ 000080
8CF272C7 38014480 FF448805 86AC4F05 88E275C3 08C288AA 27040276 393C3004 .0<9v..'´.ó.ùuã..O¯...D..D.;úr·. 0000A0
26FA5EC4 1CE8F628 FC5E8CFA 4689059A 88560000 06C800C8 5DE5885E 5F1F580A ÖX._^.I]ù.à...Vj...F*.^=+-Š.á^*& 0000C0
39178A16 8B1788A1 0CFA4683 46017440 04C48314 14182A9A 53060E74 830A47F6 -G..t..S.*....á.ât.F.F*.Å......9 0000E0
56EC8855 CB5DE588 01FE4F80 04740808 065E88EC 885590CB C95EC688 D876FA46 F*vÅ.ó^èù.U.&.^..Üt..O±..I]ùU.&V 000100
84A31982 A3FE2440 24E899C0 33057501 76E80005 88071E29 75003F83 19828857 WEÿ..?.u)..|..Òv.u.3á.$$@$±Eý.EÇ 000120
E5885E5F 0009E8C0 8ED88C06 4E881988 3689FFFE FE44C704 C6830001 04C79619 ..ú....ó.úD±±..ó(..N..Á.áÒ.._^.I 000140
1573C138 48437401 A8FE88AD FC0277B8 F273EEF9 83FEE180 FA744100 D0E9CB5D )ùÒÅ.At*.Å±.*Ys·.w.=Ù.±´.tCH;ès. 000160
C128FE4C 89F9030C 74FE88E6 EBFE4489 F7880002 05C20335 7401A8AD F003D088 .Å.ÞÙ´.t5.ó....%.D±Šl.±t..*.L±+è 000180
C626C302 7F8919C0 1E8C2605 74013811 1A890A8C C688FE4C FEF90305 E8058948 H..Š..*±L±.ó.Ó¿..;ìt.&..á....ù&ó 0001A0
01A8ADF0 0300888C 73C13848 FE88F274 01A8ADF0 03FE8825 74FFFE30 0219C406 .á..=±.t%.±.ÞÙ´.t·.±H;èsV.Å.ÞÙ´. 0001C0
127419C4 0EFE2615 E8D88E04 74C00808 4788E6EB FE4489F7 88000205 C203E274 tã.ó....%.D±Šl.G..àt..ÅŠ.&±.á.t. 0001E0
```

Dump of file SATURN:[PCCOMMON.DUMP.DLL]ANALUT.TMP;1 on 18-APR-1990 10:36:38.62
File ID (506,31,0)   End of file block 35 / Allocated 36

Virtual block number 19 (00000013), 512 (0200) bytes

```
5EC42C74 C00B0AC4 830F6414 5A9A0568 681EF076 FFF276FF 0C6A19A7 168919A5 E...Ī.j..v·.vþ.hh..Z.d..á..át,á^ 000000
46FFFC5E C4078A26 F046FFF0 5EC404EC 46830257 89260789 26FE568B FC4688EC $.F•.V±&..&.W..F$.á^þ.Fþ&..á^•.F 000020
5EA77500 3F8026F^ 5EC4F475 003F8026 F046FFF0 5EC4E8EB 0E74C00A 078826FC •&...åt.$Ôá^þ.Fþ&.?.u¶á^þ&.?.uÏ^ 000040
0808070A 0C090C08 0C070906 00051804 02030202 1601FA70 E90002B8 90C8C95F _èù.¡..Õp¹...................... 000060
1C70206D 006C0859 00570053 00520243 00410235 02121211 0010120F 1600160C ............5.A.C.R.S.W.Y.l.m p. 000080
FFFFB817 94168917 98A31608 00000807 02CE08A4 00840982 0A810A80 16060972 r...........Ê.o.■.....È......¡.. 0000A0
073A2E18 75E40A00 2489129A BB1798A3 CB5DE588 99FFFFB8 0008E8C8 5DE58899 ..]]ùÒ..¡....]]ùÈ..È..¿$..ðu..:. 0000C0
1794A398 01478A2E 430176CA 3C0472BC 3C430A76 243C0472 133CF7E2 43431674 t.CCã¼<.r.<$v.C<¥r.<òv.C..G..È.. 0000E0
88575602 EC83EC88 55C85DE5 8801FE4F 80260574 C308C08C 065EC4EC 885500C3 ù.U.$á^..á.ùt.&.O±..]]ùU.$.$.VW. 000100
05740018 E8157500 82E8198C A3127400 25E80875 00198C3E 831E73FF F13D0646 F.=þ.s..>¥..u.Ò%.t.È¥.Ò..u.Ò..t. 000120
5E880776 065E3900 F0B8C85D E588E5E5F 02C48311 C0154C9A 0676FF08 750078E8 Òx.u..v..L.à..á._^.]]ùÈþ.9^.v..^ 000140
74FFFA83 08C48313 7B16F89A 5002B051 0E4F8D50 501EC033 FE5E89FE E3834306 .C.D±.^±3à.PP.O.Ō.P.½.(..á..*.t 000160
89484800 08A3C033 D88EFE5E 880008A3 DA8E0574 02081 9C0 A319BE16 87C28838 8.ò..ƒ.Èà..■t..OÈ...^±.Ä3àÈ..HH. 000180
8BC08ED8 8CC31FD8 8C0006A3 00000500 0AA30147 800002A3 0000A300 0AB80C47 G.¡..È..È...G.È.....È...Ä.ù.Ä.à. 0001A0
76FF006A 0876FF00 6A560000 0AC8C309 8EC18CD2 08019AE8 19C01E8E DB33064E N.3Ù..à.Ò...■.ê.lùà...Vj..v.j..v 0001C0
4813479A 56F87688 902FEB99 C0280674 FFFFC2F7 FA5689F8 4689142F 17F69A06 ..-./..F½.V¹¼ò..t.+à.Š/..v½V.G.H 0001E0
```

```
Dump of file SATURN:[PCCOMMON.DUMP.DLL]ANALUT.TMP;1 on 18-APR-1990 10:36:38.62
File ID (506,31,0)   End of file block 35 / Allocated 36

Virtual block number 18 (00000012), 512 (0200) bytes

835756EC 885500A3 EBC03300 1C8AA6EB 02751A3F 80260A88 0A744017 9F87F687 ñ-...ât..O&.?.u.Š|¤..3áŠÉ.U.ŠVW° 000000
EB0001B8 05744017 9F87F60C 7C00F883 117D179D 1E38065E 88EC8855 0442E900 .Ò8.U.Š.^.;...}..«.|.-...ât.¡..Š 000020
75400594 A1C85152 E3880572 05981E38 08720828 DC885A59 00C850E5 88C03302 .3à.[]ù.YZ.É+Ar.;...r..DRQùÀ..âu 000040
9A521650 1653C488 5087179F A7800488 52000288 05942EFF 5152FC74 E9C03305 .3àÔt•RQ....£..R.å.‡..ñP.áS.P.R. 000060
885A0479 48179F8F 08088106 75000230 07740001 30408112 7558C008 0000FFFF .....áXu.Ÿâ=..t.=..u.Ÿ.....KyÅ2. 000080
FF000388 C28C1900 06C401AE E9037319 C81EFFD8 33C28C19 CC06C41E E319CADE .ò.D.á.ä..ó3Ü..à.s.ÕÜ.á.Å..óÉ... 0000A0
0E016A08 74190830 19048800 73E81904 8F1904BE 007CE819 D4BF1904 BE19C81E .à./å.«å.Ò|./å.«å.Òs.¡å.=Á.t.j.. 0000C0
11149A00 6A006A03 6A0051E8 19088F19 D4BED88E 009488C3 0000FFFF 9A111968 h.......ù¡...Ä/å.«Á.ÒQ.j.j.j.... 0000E0
8F19088E EC8855C3 E80031E8 19088F19 D48E003A E81C4E8F 1C4E8EEC 88550000 ..U.å/N.«N.Ò:./å.«Á.Ò1.Š.U.å/Á.« 000100
07E319CA 0E8800C. FFFF9A50 06468A50 C033001A E819088F 19088E00 23E81908 Ä.ÒW./Á.«Á.Ò..3àP.F.P.......ò.D. 000120
000014C8 00C3EEE8 10FFF274 02450805 8804EF83 0E73F738 C319C81E FF000288 È....à.ù;%s..ÿ....E.t·..ŠŸù.à... 000140
5689F646 89F25689 F04689C0 28015E16 8800F0E9 0375015E 3639FF28 F6285657 WV+-+.96^.u.ÕÞ...^.+â.FÞ.V·.F-.V 000160
03767FFF FE814619 74C0080A C4831200 145A9A05 68681EF6 76FFF876 FF0C6AF8 %j..v½.v-.hh..Z....á..ât.F.±..v. 000180
5E88F475 003F8026 F646FFF6 5EC40CE8 47EA7500 3F8026F6 46FFF65E C4008CE9 ÕV.á^-.F-&.?.uõGŠ.á^-.F-&.?.u¶.^ 0001A0
4513479A 56EE5689 EC468904 C483120F 14029A04 6A500145 808A7500 3F8026F6 -&.?.u¤.E.Pj.......á..FŠ.VŸV.G.E 0001C0
A3EE5688 EC468866 74C208FC 46886074 EE4608EC 4688FE56 89FC4689 02C48312 ..á..F•.V±.FŠ.FŸtm.F•.ótf.FŠ.VŸÈ 0001E0
```

```
Dump of file SATURN::[PCCOMMON.DUMP.DLL]ANALUT.TMP;1 on 18-APR-1990 10:36:38.62
File ID (506,31,0)   End of file block 35 / Allocated 36

Virtual block number 17 (00000011), 512 (0200) bytes

88FC4688 040A4F80 26045EC4 9021E802 000247C7 26FC5EC4 080A4F80 261174D0 Ât.&.O..á^•&úG...$!.á^.&.O...F•. 000000
26085788 26064788 26045EC4 00010247 C726FC5E C4085789 26064789 2640FE56 V±ã&.G.&.W.á^•&úG...á^.&.G.&.W.& 000020
E9C03300 098A0872 17901E38 065E88EC 8855C3C9 00000447 C7260257 89260789 ..&.W.&úG...èÙU.š.^.;...r.¤..3àÕ 000040
75C0855A 590000FF FF9A5116 0C76FF08 76FF0A76 FF53CC88 04EC8304 60E90454 T.Õ'..š..äS.v..v..v..Q.....YZ.âu 000060
C0330009 8A087217 9D1E3806 5E880CEC 83EC8855 00C85DE5 88FD179F A78091E1 Å..Ì..».Í]ù.U.š.š..^.;...r.¤..3â 000080
179F87F6 00000EA7 9A5016F4 46805141 415151C9 33531274 20179F87 F60413E9 Õ..-... t.S3èQQAAQ.F¶.P.Ì...-... 0000A0
4E88F866 89F288FA 885657FC FC4689FE 4689C033 0856C50A 468EFA5E 8C667480 .tf.^'.F.éV.3à.F±.F••WV.'.·.f%.N 0000C0
740A3CAC 0C4E8807 16FA8804 88E22800 808ADC88 02EC833B 75AEF20A 8049E30C .DI¯.·Ùu;.š..É¤..+ã.å.'...N.¯<.t 0000E0
E8E2E8FC 46FF0A80 AA001FE8 0375F838 0080009A E9002BE8 F4E2AA1A 74F8380D .;«t.¯ä¶Ö+.Õ..¯.;«u.Ò..¯¯..F•ŠãÕ 000100
CA2BCF88 1F061E51 53500E1F 10789AFF FC887AE8 0093E9FA 5E8E5F5E E1E80014 ..ŠÅ^ .^'Õ..Šz¡•..x...PSQ....ü+ò 000120
74D808FE 5E01F45E 981175C0 0800000D E89A5016 F4468051 521E5306 5E881FE3 D..^.Š.RQ.F¶.P.Ò....âu..^¶.^±.Üt 000140
001C8A08 7500098A 00013000 74006D30 1874C008 08C4831F C3FA8858 58591F07 ..Y[X.'ù..á..ât.=m.t.=.,¤..u.¤.. 000160
0EE8F803 751A3F80 C55E880A 5E8E0E74 40179F87 F6FE5E8E 26E8F900 208A03E8 $.¤ .'$&.^±-...ât..^..^..7.u.%$. 000180
8802F7E9 C85DE588 0472FA5E 8E5F5EF8 6688FC46 28FE4688 06E8F9C0 33001C8A ¤..3â'Š..F±+F•.f%^_.^'r..Í]üÕ%.. 0001A0
081F071E 00000F7F 9A5016F4 46805152 1E530856 C51EEEE8 C1880475 C9080C4E N..èu..èŠY.éV.S.RQ¯F¶.P......... 0001C0
75C008F4 4688C2E8 00208AC7 E8001C8A CC750009 8A000130 0074006D 301774C0 ât.=m.t.=.·.¤..u8¤..Šú¤ .Šö.F¶.âu 0001E0
```

```
Dump of file SATURN:[PCCOMMON.DUMP.DLL]ANALUT.TMP;1 on 18-APR-1990 10:36:38.62
File ID (506,31,0)   End of file block 35 / Allocated 36

Virtual block number 16 (00000010), 512 (0200) bytes

1ADC3639 387F393C 3F7C303C FA468807 8A260A5E 88F62B0A 46FFFFFF FE46C708 .úF±...F.+-.^.&...F*<0|?<9.;96É. 000000
0302E1C1 CE88'.805 8A26187F 39308026 06E8F888 00301C4C 06C70675 303C0A75 u.<0u.ú.L.0..«$.&.=9..&....òèÁ.. 000020
5EC4F088 EEF7FE46 880C468C 0A7E890F 7D303080 2647F188 30E983C8 03E1D1CE òîÁ.à.Ò0.þG&.=0)Ô.~..F..F±XŸ.Þá^ 000040
C4064E8A FE5E8CFC 46890156 88570000 04C8C8C9 5F5E0C56 880A4688 37892606 .&.7.F..V.^ èùà...W¡V..F=.^±.N.á 000060
8CFC7E89 9009E8FE 468CFC7E 890001B8 F4750038 26117400 30802647 01E8FC7E -•$.G&.=.t.Ë8.u¶¡...~=.F±Š...-=. 000080
1E015E68 1E1798A3 E0865800 00FFFF9A 5016C488 50EC8855 90C8C95F C02BFE46 F±+â_èù.U.$P.á.P.....X.ÂÉ...h^.. 0000A0
00010D6A 9A50C850 E5880001 88090011 8C9A039E E80021E8 0000FFFF 9A015C68 h\......Òl.Ò.....Ï.¡...[]üP.j... 0000C0
47017500 3080267F FFB9015E 068EFF33 0000881E 016416FF 00FF6800 0E008E9A ./...h....d..£..3...^.¿..&.=.u.G 0000E0
F788071E 061CE8E7 74AEF2C0 330874CA 88A6F3C8 88018805 688E3174 00308026 &.=.t1ƒh..1.ùµ1.òt.3à·ÙtÓŠ.....¼ 000100
00FCB8EC 885500C3 1FEDE8AA C20A0572 412CAC92 04E0C00E 72412CAC 179F8F1F .¢..¯,Ar.åÂ..¯,Ar..ò`Šù.ù.U.&¡=. 000120
8855CB5D E5880074 0U8E9A50 00FF8805 761EFF04 74000578 3E830013 008E9A50 P.ƒ....>x..t...v.¡..P.ƒ.t..[]ùW. 000140
F2FFFFB9 C033970C 74964010 74C238AD 19E28E06 5688C08E D88E0179 835756EC $VW¡y..Á.â.V.ƒà.Ù;òt.ā.t..3à¿..· 000160
88921F74 C0080D88 008E9A06 76FF57EC 88550002 CA5DE588 5E5F96E8 EB‹'88AE Û.%$$._^.[]ò..U.&W.v.......ât... 000180
E5885F58 0000FFFF 9A501651 521E5300 0288C488 504901F7 AEF2FFFF 89C033FA *3à¿..¯Ù%1ĮP.áÉ..S.RQ.P.....(_.[ 0001A0
E001C103 E001C888 F9F7000C 8999059A 20044688 198006FF 000004C8 0002CA5D ]ò..à.....¯..F.·...¿..%*.àÌÁ.ĒÌÁ 0001C0
08085789 26064789 26045EC4 02C48300 C813479A 020068FE 5E8CFC46 89118E05 ....F=.^±h...G.à..á.á^.&.G.&.W.. 0001E0
```

```
Dump of file SATURN:[PCCOMMON.DUMP.DLL]ANALUT.TMP;1 on 18-APR-1990 10:36:38.62
File ID (506,31,0)   End of file block 35 / Allocated 36

Virtual block number 15 (0000000F), 512 (0200) bytes

75001AE2 3E8304E8 E42A0588 2602478E 2607FF26 3F88261C 4CA00478 044F.'26 &.O.x&.L.&.?&..&.G.&..*ðŠ&.>ã..u 000000
36FF22EB 5E75001A E23E830A 76885657 000002C8 C8C95F5E 1AE00601 06468.07 ..F...Å.^_èùà...WV.v..>ã..u^$".6 000020
0646FF1A E206FF04 754006C4 830AF300 DE9A5098 078A2606 5EC41ABC 36FF1ABE ƒ..6¥.6^.Ï...P.ß.µ..6.ðu...ã..F. 000040
FF263F88 261ABC1E C4078A26 065EC4CD 78044FFF 261ABC1E C42574C0 084EC688 .6N.àtX6.¥.&.O.xe6^.&..6.¥.&.?&. 000060
0CC8C8C9 5F5E1AE0 06010A46 88077500 1AE23E83 CAEBE42A 05882602 478E2607 .&.G.&..*ðŠò.>ã..u..F...Å.^_èùà. 000080
F476FF52 1AEA3688 FA4689FC 4689C028 F65689F4 46891AE8 16881AE6 A1560000 ..VÀÌ...Ò..F¶.V-+à.F=.F*.6õ.R.v¶ 0000A0
1C4A3E83 08EB02EE 83057510 1C4A3E83 06762BF0 28F84689 04C48307 2C00469A .F.,..6..F½+Þ+v..>J..u..Ÿ.Š..>J. 0000C0
8A26F446 FF127530 1C4C3E83 19752D3F 8026F45E C4227500 1AD43E83 4E017508 .u.N.>&..u"6^¶&.?-u..>L.Ou..F¶&. 0000E0
831B7400 1AD43E83 077EF608 0874301C 4C3E83F8 4EFF02C4 83FE71E8 0E509807 ..P.Òq±.6..N½.>L.Ot..--..>&..t.. 000100
75001AD4 3E830070 E80EFC46 FF077400 1C4A3E83 0066E80E FA46FF07 7400067E ~..t..F*.Òf..>J..t..F=.Òp..>&..u 000120
0A74001C 4A3E8300 39E80E04 7500FA7E 830A7400 067E8302 C483FE7E E80E5629 )V.Ò~±.6..-..t..~*.u..Ò9..>J..t. 000140
74001AD4 3E8306C4 83FEB5E8 0EF476FF F676FFF8 76FF0040 E80E0475 00FC7E83 .-=.u..Òð..v½.v-.v¶.Òç±.6..>&..t 000160
208803E8 002B8805 74001AC6 3E83C8C9 5E02C483 FE38E80E 5600201C 4C06C70E .ú.L. .V.Ò8±.6.^èù.>ó..t.¡+.Š.¡ 000180
74001AC2 3E831775 101C4A3E 8302C483 FDC8E80E 306ACB02 C483FDD2 E80E5000 .P.Ò@».6.ùj0.Òà».6..>J..u..>ô..t 0001A0
0A5EC400 01FE46C7 56570000 06C8CB02 C483FDAA E80E5000 788803EB 00588805 .¡X.Š.¡x.P.Ò¯».6.ùà...WVúF±..6^. 0001C0
752D3F80 260A5EC4 9060E80A 46FF021A D6068337 88261AD6 1EC41275 2A3F8026 &.?*u.6.ø.&.7..ø...F.$'.6^.&.?-u 0001E0
```

```
Dump of file SATURN:[PCCOMMON.DUMP.DLL]ANALUT.TMP;1 on 18-APR-1990 10:36:38.62
File ID (506,31,0)   End of file block 35 / Allocated 36

Virtual block number 14 (0000000E), 512 (0200) bytes

F84688FA 5E8CF846 89014FB8 097500FC 7E83900A E8014888 1575FA46 08F84688 .F%.F*u.¡H.$...-*.u.¡O..F%.^*.F% 000000
8026F246 FFF2*EC4 900EE81A E40E881C 741ADC36 39F628F4 5689F246 89FA5688 .V*.F .V¶+-96É.t...ð.Š..á^ .F &. 000020
83FE281A EA3E88F3 75003F80 26F246FF F25EC446 90EDE810 7ECE3846 1574003F ?.t.F;o-.ŠÙ.Fá^ .F &.?.uµ.>ð.+±. 000040
1AD43E83 06C48301 83E80EF8 76FFFA76 FF5602C4 830159E8 0E570875 001AD43E >å..u.W.ÒY..á.V.v*.v%.Ò*..á..>å. 000060
5689FC46 891AD816 881AD6A1 000006C8 90CBC95F 5E02C483 013CE80E 57087400 .t.W.Ò<..á.^_èù.à...Å*...Ä..F=.V 000080
06C70675 001ADC3E 83FA4688 C02A9003 E801B005 7547067E 83067467 067E83FE ±.~.gt..-.Gu¯.$..*å.F*.>É..u.ú. 0000A0
FF1AE436 FF1AC236 FF00011A E406C706 75001AE4 3E830074 00FA7E80 00061AE4 ð....-*.t..>ð..u.ú.ð....6ó..6ð.. 0000C0
00FA7E80 0EC48305 7A1EFF26 190B068E FC76FFFE 76FF1AE6 36FF1AE8 36FF0676 v..6Ò..6|..v±.v=..Á.&..z..á..-*. 0000E0
8A3E8304 C483057E 1EFF2619 08068E1A E636FF1A E836FF14 75001ABA 3E831B74 t..>¤..u..6Ò..6|...Á.&..~..á..>¤ 000100
8304C483 05861EFF 26190806 8E1AE636 FF1AE836 FF147500 1AE43E83 1B74001A ..t..>ð..u..6Ò..6|...Ä.&.....á.. 000120
1EFF2619 D8068EFC 76FFFE76 FF1B741A DA06081A C6A10000 1C4A06C7 081AD606 .ø..ú.J...Å6...Ö.t..v±.v=..Á.&.. 000140
E23E8356 000000C8 90CBC901 29E80E50 C02B02E8 0001B805 74C00804 C483058A ...á..ât.¡..$.+âP.Ò).èù.à...V.>ã 000160
E42A0488 2602478E 2607FF26 37882606 468A1478 044FFF26 1ABC1EC4 3C75001A ..u<á.¥.&.O.x..F.&.7&..&.G.&..*ð 000180
1AE006FF 9005E81A E206FF07 754006C4 830A1900 DE9A0676 FF531ABE 36FF10E8 $..6/.S.v..ß....á.âu...ã.$....Á. 0001A0
36FF1ABE 36FF1BEB 507EF608 06768857 75001AE2 3E835657 000002C8 90CBC95E ^èù.à...WV.>ã..uW.v..--P$..6/..6 0001C0
1ABC1EC4 1E7EC008 4EC6881A E206FF04 754006C4 830A8100 DE9A1C4C 36FF1ABC ¥..6L..ß....á.âu...ã..6N.à~.á.¥. 0001E0
```

Dump of file SATURN:[PCCOMMON.DUMP.DLL]ANALUT.TMP;1 on 18-APR-1990 10:36:38.62
File ID (506,31,0) End of file block 35 / Allocated 36

Virtual block number 13 (0000000D), 512 (0200) bytes

```
C7067400 1ADC3E83 56570000 12C8CBC9 1AE0A1FE 51E90374 200A47F6 261ABC1E .V.&-G. t.ÕQ±ÀÁ.èùà...WV.>É..t.ú 000000
D61EC419 75101AC4 3E830774 021AC43E 831ADE06 FF04740A 067E8300 201C4C06 .L. ..-..t...B..>á..t..>á..u.á.ø 000020
D61EC411 74001AD5 3E83902C E8041AD6 0683FE56 89FC4689 02578826 0788261A .&..&.W..F=.V±..ø..Š,..>B..t.á.ø 000040
1AD60683 FE5689FC 46899907 88261AD6 1EC40EE8 0000FE46 C7FC4689 0788261A .&...F=úF±..Š.á.ø.&....F=.V±..ø. 000060
16881AE6 A11C4AA3 C0289003 E8064688 0674FE46 08FC4688 0E74001A 8A3E8302 ..>¤..t..F=.F±t..F.Š..+áÈJ.À|... 000080
46FFF25E C41D750A 067E8328 7D00FE7E 83317500 1ADE3E83 F45689F2 46891AE8 Ò..F·.V¶.>B..u1.-±.)+.-..u.á^·.F 0000A0
9006E800 01F646C7 FE5689FC 46890AF7 00028308 F7FE5688 FC468820 07C626F2 ·&ó.-.F=.V±¼Á.ø.¼Ö.F=.V±úF-..Š.. 0000C0
C4830741 104A9AFC 76FFFE76 FF501E06 76FFFA5E 8CF84689 1AC88800 00F646C7 úF-..¡è..F½.^*.v..P.v±.v=.J.A..á 0000E0
08F04E89 C8281AE4 0E8804C4 83025D00 469AF876 FFFA76FF 4574001A DC3E830A ..>É..tE.v*.v½.F.]..á...ð.+à.NÞ. 000100
49C18847 3005C626 05E8F27E C4F04E88 00001C4A 06C70675 081C4A3E 83007EC9 è-..>J..u.ú.J....NÞá-·Š.&ó.0G,ê1 000120
08048807 8A26F85E :4F276C5 EE5E8C1A C20E88F0 4E89F446 8CF27E89 F47FC008 .á.¶.-·.F¶.NÞ..ò..^Ÿév·á^Ÿ&..... 000140
DE3E83EE 5E8EF45E :CF27689 E375003F 8026F846 FF46202C 80037C61 3C0774C9 èt.<a|.., F.FY&.?.uD.v·.^¶.^Ÿ.>B 000160
8302FFE8 0E50C028 02E80001 88057500 F67E8308 741ADA06 081AC6A1 1475001A ..u.Àò...O.t..--.u.¡..Š.+àP.Ò... 000180
89F84689 1AD8168B 1AD6A100 018E1874 00067E83 56570000 10C8CBC9 5F5E02C4 á.^_èùà...WV.-..t./..Àø...Á..F½. 0001A0
89F84689 02578826 0788261A D61EC413 74081AC4 3E83008F E9021AD6 0683FA56 V*._ø..Ò...>á..t.á.ø.&..&.W..F½. 0001C0
0E74081A C43E8304 1AD60683 FA5E8CF8 4689FC46 89078826 1AD61EC4 10E8FA56 V*Š.á.ø.&...F=.F½.^*..ø...>á..t. 0001E0
```

```
Dump of file SATURN:[PCCOMMON.DUMP.DLL]ANALUT.TMP;1 on 18-APR-1990 10:36:38.62
File ID (506,31,0)   End of file block 35 / Allocated 36

Virtual block number 12 (0000000C), 512 (0200) bytes

 261AE0A1 1FC4261A D61EC415 75021AC4 3E839001 59E90140 E9037500 25300152 R.=X.u.ÕΩ.ÕY...>á..u.á.ø.&á.ÀÀ.& 000000
 1AE23E83 041AD6J6 83078926 1AE0A11F C4261AD6 1EC40DEB 00000247 C7260789 ..&úG...Š.á.ø.&á.ÀÀ.&....ø...>ã. 000020
 FFB801AF E9037520 0A47F626 1ABC1EC4 01BDE903 74001AE0 3E830170 E9037500 .u.Õp..>À..t.Õ§.á.¥.&-G. u.ÕE.¡. 000040
 06FFF2EB 086A90C3 EB02C483 019EE80E 0A6A0000 1ABA06C7 1ADE06FF 01ACE9FF .Õ¯...ß.ú.¤...j..Ò...á.Šü.j.Š·.. 000060
 74011AC4 3E830081 E9037508 1AC43E83 00041AE4 06C71ADC 06FF1AC2 06FF1AC0 å...ò...É.ú.Ò....>á..u.Õ...>á..t 000080
 1AEA06C7 0A74001A D43E83FA 46891AEA A128741A EA0639FA 46891AC4 A3C02B7A z+åÉá..F*9.õ.t(Àõ..F*.>å..t.ú.õ. 0000A0
 EB0E106A 021AD606 831AEAA3 C028027D C00B1AEA A1051AEA 2E839090 13EB0000 ..Š.....õ..Àõ..å).+åÉõ...ø..j..Ò 0000C0
 0520FA46 88157400 1AD43E83 227400FA 7E8302C4 83048DE8 0E3A6A02 C4830130 0..å.j:.Ò...á..-*.t".>å..t..F*-. 0000E0
 F1E80E10 6A041AD6 2E830000 1AEA06C7 9007EB1A EAA3C02B 027DC008 1AEAA300 .Éõ..å).+åÉõ.Š..ú.õ.....ø..j..Òþ 000100
 F4EB016A 90FF39E9 026EE80E 006A90FF 3FE9106A FF10E902 1AD60683 02C48300 ..á...ø..Õ..j.Õ?..j..Òn.Õ9..j.Š¶ 000120
 7C006530 FF0CE903 75006430 90FF21E9 0428E80E 256AFF2A E90349E8 0EF876FF .v¼.Õ¦.Õ*.j%.Õ(.Õ¦..=d.u.Õ..=e.| 000140
 FC468940 0C56880A 46880A4E FF0C5688 0A468809 74001AC4 3E830A7E 00673005 .=g.~Õ.>á..t..F..V..N..F..V.∂.F• 000160
 7330FEE0 E9037500 7030FEE4 E9037500 6F30FE80 E9037500 6E30903A EBFE5689 .V±Š:.=n.u.Õ.±=o.u.Õõ±=p.u.ÕÀ±=s 000180
 C4FC46FF 9034EB0A 46FF9081 EBFF79E9 03750078 30FEB9E9 03750075 308F7400 .t.=u.u.Õ¿±=x.u.Õy.Šÿ..F.Š4..F=á 0001A0
 044CE80E 0A76FF0C 76FF500A 4628C388 EC75253C 0474C00A F6468807 8A26FC5E ^=&...F-.åt.<%uå.ú+F.P.v..v..ÕL. 0001C0
 C4FC63E9 0374C00A F6468807 8A260A5E C40C5689 0A4689FE 5688FC46 8806C483 .á..F=.V±.F..V.á^.&...F-.åt.Õc=á 0001E0
```

```
Dump of file SATURN:[PCCOMMON.DUMP.DLL]ANALUT.TMP;1 on 18-APR-1990 10:36:38.62
File ID (506,31,0)   End of file block 35 / Allocated 36

Virtual block number 11 (0000000B), 512 (0200) bytes

E42A0646 8AFECCE9 0374FC76 39FC4689 08C48300 A80EBC9A FA76FF50 1606468D .F..P.v..V.`..á..F=9vet.Öä±.F.*ð 000000
A3105688 0E46881A E81E8C1A E6A31AEC 88019110 789A000A 88EC8855 CBC95F5E ^_èúU.$¡...x...¡$.Èl...Ö..F..V.È 000020
E900001A E006C700 001AE206 C71A8E16 891A8CA3 08568806 46881A08 16891AD6 ø¯..Á..F..V.È¥.../.ú.ã...ú.Á...Ö 000040
A31AC4A3 1ADEA31A C2A31AC6 A3C02800 011AE406 C7030BE9 037425F6 7E80038D ...--%t.Ö..ú.ö...+àÈó.Èó.Èß.Èá.È 000060
46FF4975 30017F80 260A5EC4 00201C4C 06C71AD4 A31A8AA3 1AC0A31A DAA31ADC È.ÈÖ.Èá.Èo.Èå.ú.L. .á^.&...0ul.F 000080
9028E800 001ADA06 C71AC606 FF0D752B 3F80260A 5E88903E E800301C 4C06C70A .ú.L.0.Š>..^.&.?+u...ó.ú.Ö...$(. 0000A0
3F80260A 5EC400EB 1ABA06FF 9014EB1A DA06FF1A 75001AC6 3E830E75 203F8026 &.? u..>ó..u...Ö.Š....a.Š.á^.&.? 0000C0
0C76FFD0 75C00802 C4830978 E80E5098 078A260A 5E880A46 FF1AD406 FFC77520 -uú..å..F..^.&...P.Òx..á..àui.v. 0000E0
A11AD406 FF0C7D00 1AEA3E83 0C56890A 468908C4 8308C7E8 0E1AEA68 1E0A76FF .v..hõ..Òú..á..F..V..>ð..)...å.À 000100
80260A5E C400201C 4C06C706 75301C4C 3E830074 001AD43E 831AEAA3 D8F71AEA ð.%ÁÈõ..>å..t..>L.0u.ú.L. .á^.&. 000120
0C56890A 468908C4 83087BE8 0E1AE468 1E0A76FF 060A46FF 1ADC06FF 2D752E3F ?.u-..É..F...v..hð..Ò(..á..F..V. 000140
004E3030 74004630 98078A26 0A5EC41A DC0EFF00 011AE406 C70A7D00 1AE43E83 .>ð..).ú.ö.....É.á^.&...=F.t==N. 000160
4C3F8026 0A5EC409 75001AC4 3E830002 1AC406C7 0675006C 30287400 68304074 t@=h.t+=l.u.ú.á....>á..u.á^.&.7L 000180
00101AC4 06C7D8EB 000*1AC4 06C79002 4EE91C75 003F8026 0A5EC40A 46FF0375 u..F.á^.&.?.u.ÕN..ú.á...ŠÁú.á... 0001A0
08750058 30057400 47300A74 004530F8 46899807 8A26C8E8 00081AC4 06C?00EB ŠÁú.á...Šà&....F½=E.t.=G.t.=X.u. 0001C0
E9037E01 3FE90375 00633001 91E9037E 78740069 30F84688 20F84683 1AC2 ?FF ..ö..F½ .F½=i.tx~.Ö..=c.u.Ö?.-.ð 0001E0
```

Dump of file SATURN:{PCCOMMON.DUMP.DLL}ANALUT.TMP;1 on 18-APR-1990 10:36:38.62
File ID (506,31,0)   End of file block 35 / Allocated 36

Virtual block number 10 (0000000A), 512 (0200) bytes

C033067E C4D788EC 8855CB5D C28C1FFA 88F388A4 F3C913A5 F3E9D149 A4027401 .t.ÉIIÕµE.èµÊ.µ.ª..ò]ùU.$.mó-.3à 000000
0E468DFA 568CF846 89EC4680 56570000 16C800C8 5DFA8891 4901F7AE F2FFFF89 ¿..·Ü%il..ª]ù.à...WV.F$.F½.Vª.F. 000020
26078926 08578926 06478926 08568806 4688420A 47C626F8 5EC4FE56 8CFC4689 .F•.V±á^½&6G.B.F..V.&.G.&.W.&..& 000040
C4F0880C C4830003 02549A53 060A76FF 0C76FFFC 76FF167F FF0447C7 26025789 .W.&úG.....v•.v..v..S.T.Æ..ó..Þó 000060
006A53FA 76FF900F EB058826 02478E26 07FF263F 8826C02A 1278044F FF26F85E ^½&.O.x.ªà&.?&..&.G.&..$...vªSj. 000080
FA4689E4 2A08478A 26085EC4 56570000 08C8C8C9 5F5EC688 06C483FF FF000E9A .B....ó..ó^_èùà...WVá^.&.G.ªÕ.Fª 0000A0
0774830A 47F626F8 4689118E 05E001C1 03E001C8 88F9F700 0C899905 9A20C388 .û-...¿..¥ª¯àIÁ.èIÁ....F½&-G..t. 0000C0
0E74010A 47F62608 5EC49001 28E9FFFF B8200A4F 8026085E C40F7440 0A47F626 &-G.ðt.ó^.&.O. ¡..Õ+..ó^.&-G..t. 0000E0
F0880447 8926C028 EF0A6780 26020A4F 802690E2 E8000004 47C72620 0A4F8026 &.O. &úG...$ã.&.O..&.g.ÿ+à&.G..Þ 000100
81377501 118E87F6 06D868F9 F7000C89 99059A2D C3884C75 0C0A47F6 26FC7689 .v•&-G..uL.û-...¿..¥ªkÁ.-....u7. 000120
549AFA76 FF0F75FF FF0A7E81 16750582 087E810E 7401870A 7E810775 05A6087E -.Ì.u..-...t..-.ÿ.u..-...u..vª.T 000140
1575080A 47F62608 5EC404C4 830C51E8 0876FF0A 76FF0C75 C00802C4 8301FA10 .ª..ó..àu..v..v.ÕQ..ó.ó^.&-G..u. 000160
2606772B 26378826 085E8867 7401118E 87F60608 68F9F700 0C899905 9A20C388 .û-...¿..¥ªkA.-....tg.^.&.7&+w.& 000180
5256167E F6080447 89264802 4588F87E 88025789 26078926 40085788 26064788 .G.&.W.@&..&.W..-½.E.H&.G..--.VR 0001A0
026A0F74 20179F87 F6FA5E88 19E8FC46 8908C483 02180EBC 9AFA76FF 0677FF26 &.w..vª.¥....ó..F•$..^ª-... t.j. 0001C0
560001BE 17E80788 2606468A 065FC426 085EC408 C4830238 0E7E9A53 006A006A j.j.S.-.;..ó.ó^.&ó_..F.&..$.ƒ..V 0001E0

```
Dump of file SATURN:[PCCOMMON.DUMP.DLL]ANALUT.TMP;1 on 18-APR-1990 10:36:38.62
File ID (506,31,0)   End of file block 35 / Allocated 36

Virtual block number 9 (00000009), 512 (0200) bytes

 E9037524 3F8026FC 5EC4001F E9037526 3F8026FC 5EC40028 E903755F 3F8026FC =&.?_u.Õ+.á^=&.?&u.Õ..á^=&.?$u.Õ 000000
 B80007C6 26FC5EC4 FF7DE926 07C626FC 5EC40007 E9037523 3F8026FC 5EC40013 ..á^=&.?#u.Õ..á^=&ó.&Õ).á^=&ó..¡ 000020
 06468800 00FE46C7 D88E0486 881E5657 00000AC8 0008CAC9 5F5E1F00 00E90000 ..Õ...^_èò..à...WV.¡Ñ..ÁúF±...F. 000040
 5688F646 88FE46FF 000FE9FC 5689FA46 890C5688 0A4688F8 5689F646 89085688 .V..F-.V½.F..V..F°.V•Õ...F±.F-.V 000060
 26FA5EC4 0029E903 7C20FE7E 830032E9 0375003F 8026FA5E C4FA46FF F646FFF8 ½.F-.F°á^°&.?.u.Õ2..~± |.Õ).á^°& 000080
 C626F65E C40007E9 03750800 4787F608 8898078A 26F65EC4 078826F6 5EC4078A ..á^-&..á^-&....Á-.G..u.Õ..á^-&ó 0000A0
 1E565700 0030C800 08CAC95F 5E1F0000 E9000088 0007C626 F65EC4FF B3E95F07 ._Õ°.á^-&ó..¡..Õ...^_èò..à0..WV. 0000C0
 469A5016 D246800A C4830621 005E9A50 16024680 0042681E 0676FF08 8E057488 ¡t..Á.v..hB..F@.P.^.Ī..á..F@.P.F 0000E0
 D04603FE 4688FE46 8904C483 03780046 9A0C76FF 0E76FFD0 468904C4 83063200 .2..á..FÅ.v..v..F.(..á..F±.F±.FÅ 000100
 5689FA46 890E5688 0C4688FE 4629F646 880006E9 037F00F6 7E83F646 8900482D -K..F-.~-...Õ...F-)F±.F..V..F°.V 000120
 037CF846 39FE4688 F846FF00 03E90000 F846C7F4 5689F246 890A5688 084688FC •.F..V..F·.V¶ÚF½..Õ...F½.F±9F½|. 000140
 F476FF50 16024680 FFDDE907 8826F246 FFF25EC4 078A26FA 46FFFA5E C40015E9 Õ..á^°.F°&..á^·.F·&..Õï..F@.P.V¶ 000160
 00000406 A6000200 020ACAC9 5F5E1F00 00E90000 8808C483 06140010 9AF276FF .v·......á.¡..Õ...^_èò.....Ī.... 000180
 01C80001 881F0200 3E89D88E FFFF881E 00000000 00000000 00000606 01000200 ................¡..Á.>...¡..ù. 0001A0
 00000000 00000000 00000000 00000000 00000000 00000000 00000500 02000200 ................................ 0001C0
 A8C78806 7EC4D1F7 AEF2FFFF 89C033C0 8ED88CFE 880A76C5 1EDE88D7 88EC8855 U.&.■.B.év..±.Á.à3ä¿..·Û¼Íá-..ú´ 0001E0
```

```
Dump of file SATURN:[PCCOMMON.DUMP.DLL]ANALUT.TMP;1 on 18-APR-1990 10:36:38.62
File ID (506,31,0)   End of file block 35 / Allocated 36

Virtual block nu ner 8 (00000008), 512 (0200) bytes

FC5EC400 14E90374 5F3F8026 FC5EC400 0CE90375 203F8026 FC5EC400 18E90375 u.Õ..á^=&.?-u.Õ..á^=&.?_t.Õ..á^= 000000
04CAC95F 5E1F0.00 E9FA4688 FF88E900 03E90001 FA46C700 08E90375 5F3F8026 &.?_u.Õ..úF'..Õ..Õ...F'Õ...^_èÐ. 000020
04C48303 8800469A 0676FF08 76FF0000 F446C7D8 8E02C488 1E565700 000EC800 .à...WV.¡á..ÄúF¶...v..v..F....á. 000040
0A468801 0AE90001 880006E9 0375C638 04C48300 3600469A F0880A76 FF0C76FF .v..v..Þ.F.6..á.;6u.Õ..¡..Õ...F. 000060
5EC4F846 FFFC46FF 0006E9FA 5689F846 89085688 064688FE 5689FC46 890C5688 .V..F=.V±.F..V..F½.V'Õ...F=.F½á^ 000080
5EC4FFDA E90003E9 03740738 26FC5EC4 078A26F8 5EC40007 E9037500 3F8026FC =&.?.u.Õ=.á^½&..á^=&8.t.Õ..ÕÕ.á^ 0000A0
75020047 87F6D888 98078A26 FC5EC400 5CE90375 03004787 F6D88898 078A26FC =&....Á-.G..u.Õ\.á^=&....Á-.G..u 0000C0
8898078A 26F85EC4 F6468807 8A26FC5E C40006E9 202C078A 26FC5EC4 0008E903 .Õ..á^=&.., Õ..á^=&...F-á^½&.... 0000E0
8AF24688 078A26F8 5EC40006 E9202C07 8A26F85E C4000BE9 03750200 4787F608 Á-.G..u.Õ..á^½&.., Õ..á^½&...F·. 000100
2D3F8026 FC5EC400 18E90375 203F8026 FC5EC4FF 68E90003 E90374F6 4638F246 F 8F-t.Õ..Õk.á^=&.? u.Õ..á^=&.?- 000120
F85EC400 18E90375 203F8026 F85EC400 27E90374 5F3F8026 FC5EC400 0CE90375 u.Õ..á^=&.?_t.Õ'.á^½&.? u.Õ..á^½ 000140
17E90009 E90001B8 FF20E900 03E90374 5F3F8026 F85EC400 0CE90375 203F8026 &.?-u.Õ..á^½&.?_t.Õ..Õ .¡..Õ..Õ. 000160
0C56880A 46880B8E 0369881E 56570000 08C80008 CAC95F5E 1F0000E9 000088FF .¡..Õ...^_èÐ..à...WV.¡ï..Á.F..V. 000180
8026F85E C4FC46FF F846FF00 06E9FE56 89FC4689 08568806 4688FA56 89F84689 .F½.V'.F..V..F=.V±Õ...F½.F=á^½&. 0001A0
004787F6 D88B9807 8A26FC5E C4078826 FC5EC407 8A26F85E C40071E9 0375003F ?.u.Õq.á^½&..á^=&..á^=&....Á-.G. 0001C0
5EC40037 E903752D 3F8026FC 5EC40043 E9037520 3F8026FC 5EC4004F E9037407 .t.ÕO.á^=&.? u.ÕC.á^=&.?-u.Õ7.á^ 0001E0
```

```
Dump of file SATURN:[PCCOMMON.DUMP.DLL]ANALUT.TMP;1 on 18-APR-1990 10:36:38.62
File ID (506,31,0)   End of file block 35 / Allocated 36

Virtual block number 7 (00000007), 512 (0200) bytes
```

```
 E90003E9 FF3FE907 89260247 89260000 88F65EC4 04F64683 02578926 078926FE ±&..&.W..F-.6^-¦..&.G.&..Ô?.Ô..Ô 000000
 0008C800 08CAC95F 5E1F0000 E9FA4688 9432FA46 C70005E9 037401F4 7E83FF39 9..~¶.t.Ô..úF•2..F•Ô...^ èò..à.. 000020
 87F60888 98078A25 FC5EC4FE 5689FC46 890C5688 0A468808 8E001F88 1E565700 .WV.¦...Ä.F..V..F=.V±6^=Ē....Ä-. 000040
 FC46FF00 06E9FA56 89F84689 08568806 4688FFE7 E9FC46FF 0006E903 75080047 G..u.Ô...F=ÔÔ..F..V..F%.V•Ô...F• 000060
 5EC4FF0F E9078826 F85EC407 8A26FC5E C4000FE9 0375003F 8026FC5E C4F846FF .F%6^=&.?.u.Ô..6^•&..6^½&..ÔÔ.6^ 000080
 E7E9F84E FF0006E9 03750800 4787F608 8898078A 26F85EC4 F84EFF00 07C626F8 ½&6...N%6^½&....Ä-.G..u.Ô...N%ÔÔ 0000A0
 881E5657 000008C8 0008CAC9 5F5E1F00 00E90000 880007C6 26F85EC4 F846FFFF ..F%6^½&6..¦..Ô...^_èò..à...WV.¦ 0000C0
 FF0006E9 FA5689F8 46890856 88064688 FE5689FC 46890C56 880A4688 088E0165 e..Á.F..V..F•.V±.F.¯V..F%.V•Ô... 0000E0
 F85EC407 8826F85E C4078A26 FC5EC400 77E90375 003F8026 FC5EC4F8 46FFFC46 F•.F%6^=&.?.u.Ôw.6^=&..6^½&..6^% 000100
 03750200 4787F608 8898078A 26F85EC4 002AE903 75030047 87F60888 98078A26 &....Ä-.G..u.Ô*.6^½&....Ä-.G..u. 000120
 3F8026F8 5EC40788 26F85EC4 078A26F8 5EC40006 E9202C07 8A26F85E C4000BE9 Ô..6^½&.., Ô..6^½&..6^½&..6^½&.? 000140
 5EC40007 E903745F 3F8026F8 5EC4000C E903752D 3F8026F8 5EC40018 E9037520  u.Ô..6^½&.?-u.Ô..6^½&.?_t.Ô..6^ 000160
 000006C8 0008CAC9 5F5E1F00 00E90000 880007C6 26F85EC4 FF77E95F 07C626F8 ½&6._Ôw.6^½&6..¦..Ô...^_Ēò..à... 000180
 C4FC46FF 0003E9FE 5689FC46 89085688 06468800 00FA46C7 088E0200 881E5657 WV.¦¯..ÁúF•...F..V..F=.V̄±Ô...F•6 0001A0
 5EC40018 E9037503 004787F6 08889807 8A26FC5E C40069E9 0375003F 8026FC5E ^•&.?.u.Ôi.6^=&....Á-.G..u.Ô..6^ 0001C0
 203F8026 FC5EC400 38E90001 FA46C700 08E90375 02004787 F6088898 078A26FC •&....Á-.G..u.Ô..úF•..Ô;.6^•&.?  0001E0
```

```
Dump of file SATURN:[PCCOMMON.DUMP.DLL]ANALUT.TMP;1 on 18-APR-1990 9:36:38.62
File ID (506,31,0)   End of file block 35 / Allocated 36

Virtual block number 6 (00000006), 512 (0200) bytes

F7000283 D8F7FF56 8BF4468B 0010E903 7C00F67E 83FE7689 FC4E8900 DE8301F4 ¶..ß..N=.vt.~-.|.Ö...F¶.V-¾Á.@.¾ 000000
000E8301 F4E981F2 18C82B06 77882604 4F88260E 5EC4F656 8BF4468B 0006E90A öÖ...F¶.V-á^.&.Ö.&.w.+à.·.ö¶..ß. 000020
E9037500 0230FE9D E9037500 01300023 E90056E9 0001B800 2CE9F676 89F44E89 .N¶.v-Ö,.¡..ÖV.Ö#.=..u.Ö.±=..u.Ö 000040
76FF0C76 FF1276FF 1476FFFF D4E9FF5E E9037500 0430FF35 E9037500 0330FF0C ..=..u.Ö5.=..u.Ö^.Öå..v..v..v..v 000060
8B0006E9 EE468800 06E90375 00003DEE 46890000 FFFF9A50 16F0468D 0876FF0A ..v..FÞ.P......FŸ=..u.Ö...FŸÖ... 000080
5C020300 00000606 43000200 00000100 49000200 0610CAC9 5F5E1F00 00E9EE46 FŸÖ...^_èò.....I........C.......\ 0000A0
00000000 34000205 E9020300 28000204 76020300 1C000208 0A020300 0E000206 ..................v...(...Ö...4.... 0000C0
08881E56 57000010 C8CBC95F 5E1F0000 E9004BB8 088EFFFF 881E5657 000000C8 à...WV.¡...Á¡K.Ö...^_èúà...WV.¡. 0000E0
4B3DF046 8904C483 FFFF0046 9A0A76FF 0C76FF00 00FA46C7 0001F446 C7088E00 ..ÄúF¶..úF*...v..v..F....á..FÞ=K 000100
56880646 8B00F8E9 94338800 06E90374 00F07E83 010AE994 30880006 E9037F00 ...Ö..¡0.Ö...~Þ.t.Ö..¡3.Ö«..F..V 000120
46FFFC46 FF0006E9 0000F246 C7FE5689 FC46890C 56880A46 8BF85689 F6468908 ..F-.V½.F..V..F=.V±úF·..Ö...F=.F 000140
C70005E9 03740800 4787F608 8898078A 26FC5EC4 0086E903 7CF24639 F04688F2 ·.FÞ9F·|.ÖÑ.á^=&....Ä~.G..t.Ö..ú 000160
3F8026FC 5EC4FFC1 E90003E9 03750700 4787F608 8898078A 26FC5EC4 0000F446 F¶..á^=&....Ä~.G..u.Ö..Öè.á^=&.? 000180
9AE90003 E903745F 3F8026FC 5EC4000C E903752D 3F8026FC 5EC40018 E9037520  u.Ö..á^=&.?-u.Ö..á^=&.?_t.Ö..Ö. 0001A0
233F8026 FC5EC400 0CE90375 243F8026 FC5EC400 18E90375 263F8026 FC5EC4FF .á^=&.?&u.Ö..á^=&.?$u.Ö.¯á^=&.?# 0001C0
568BFC46 8BF65EC4 0024E903 75F84608 F64688494 31FA46C7 FF73E900 03E90374 t.Ö..Ös.úF*1..F-.F¾u.Ö$.á^-.F=.V 0001E0
```

Dump of file SATURN:[PCCOMMON.DUMP.DLL]ANALUT.TMP;1 on 18-APR-1990 10:36:38.62
File ID (506,31,0)   End of file block 35 / Allocated 36

Virtual block number 5 (00000005), 512 (0200) bytes

```
E6568800 06E90372 E4463800 08E9037D 0013E903 7EE6563B 0E578826 0C478826 &.G.&.W.;V|-.Ô..).Ô..;FÔr.Ô...V| 000000
08E9037E 0013E903 7DFA563B 06578826 04478826 125EC4E6 5689E446 89E4468B .FÔ.FÔ.V|á^.&.G.&.W.;V*).Ô..-.Ô. 000020
FF0876FF FEB8E9C→ FC4683FA 5689F846 89F8468B FA568800 06E90377 F8463800 .;F¾ω.Ô...V*.F½.F½.V*.F=.ÔE±.v.. 000040
125EC402 57892607 8926F656 8BF4468B 125EC400 00FFFF9A F076FFF2 76FF0676 v..v·.vÞ.....á^..F¶.V-&..&.W.á^. 000060
C40E5789 260C4789 26E6568B E446B812 5EC40A57 89260847 8926EC56 8BEA468B .FÔ.V$&.G.&.W.á^..FÔ.V|&.G.&.W.á 000080
57000012 C8C8C95F 5E1F0000 E9E8468B 06578926 04478926 FA5688F8 468B125E ^..F½.V*&.G.&.W..FÒÔ...^_èùà...W 0000A0
000004C0 9A5016F0 46800876 FF0A76FF 0C76FF12 76FF1476 FFD88E04 34B81E56 V.¡4..Ä.v..v..v..v..v..FÞ.P.à... 0000C0
0010E903 7C00F27E 83015BE9 06468801 B4E9EE46 880006E9 03750000 3DEE4689 .FŸ=..u.Ô...FŸÔÇ..F.Ô[..-·.|.Ô.. 0000E0
02778826 0F8B260E 5EC4F256 8BF0468B 0006E90A F7000283 D8F7F256 8BF0468B .FÞ.V·¥Á.●.¥ÒÔ...FÞ.V·á^.&..&.w. 000100
FA5688F8 46880010 E9037C00 FA7E83F2 7689F04E 89000E83 01F4E981 F21BC828 +à.·.Ô¶..B..NÞ.v·.-*.|.Ô...F½.V* 000120
E981F21B C8280277 88260F88 260E5EC4 FA5688F8 46880006 E9DAF700 D28308F7 ¥Á.●.¥ÒÔ...F½.V*á^.&..&.w.+à.·.Ô 000140
01000283 01F4050A 57882608 4788260E 5EC40107 E9FA7689 F84E8900 DE8301F4 ¶..B..N½.v*Ô..á^.&.G.&.W..¶..●.. 000160
C40006E9 FA5611F8 46010002 8301F405 0A578826 08478826 0E5EC4F2 5611F046 FÞ.V·á^.&.G.&.W..¶..●..F½.V*Ô▬.á 000180
5788260C 4788260E 5EC4FE56 11FC4601 00028301 F4050E57 88260C47 88260E5E ^.&.G.&.W..¶..●..F=.V±á^.&.G.&.W 0001A0
F7FE568B FC468800 10E9037C 00FE7E83 00A5E9F6 5611F446 01000283 01F4050E ..¶..●..F¶.V-ÔE..~±.|.Ô...F=.V±¼ 0001C0
E981F21B C8280677 8826044F 88260E5E C4FE568B FC468800 06E9DAF7 000283D8 Á.●.¥ÒÔ...F=.V±á^.&.Ô.&.w.+à.·.Ô 0001E0
```

```
Dump of file SATURN:[PCCOMMON.DUMP.DLL]ANALUT.TMP;1 on 18-APR-1990 10:36:38.62
File ID (506,31,0)   End of file block 35 / Allocated 36

Virtual block number 4 (00000004), 512 (0200) bytes

 B80009E9 03748000 F07E8100 13E90374 00EE7E83 F65689F4 4689F656 88F44688 .F¶.V-.F¶.V-.-Y.t.Õ...-Þ..t.Õ..¡ 000000
 FE7E8100 13E90374 FFFC7E83 F05689EE 4689F056 88EE4688 0006E900 008A0000 ..¤..Õ...FY.VÞ.FY.VÞ.-■.t.Õ...-± 000020
 88065EC4 FE5689FC 4689FE56 88FC4688 0006E900 008A0000 B80009E9 03747FFF ..t.Õ..¡..¤..Õ...F■.V±.F■.V±á^.. 000040
 065EC40A 57892608 478926F6 5688F446 88065EC4 02578926 078926FA 5688F846 F%.V°&..&.W.á^..F¶.V-&.G.&.W.á^. 000060
 88065789 26044789 26FE5688 FC468806 5EC40E57 89260C47 8926F056 88EE4688 .FY.VÞ&.G.&.W.á^..F■.V±&.G.&.W.. 000080
 FFFFB800 01EE46C7 D88E0008 881E5657 00001CC8 000CCAC9 5F5E1F00 00E9F246 F·Õ...^ èò..à...WV.¡...ÄÚFY..¡.. 0000A0
 5689EA46 89E65689 E4468980 008A0000 88F65689 F44689FA 5689F846 897FFFBA ¤...F%.V°.F¶.V-¡..¤...FÕ.V¦.FÕ.V 0000C0
 00003DE8 46890000 FFFF9A50 16F0468D 0E76FF0A 76FF0C76 FF0676FF 0876FFEC &.v..v..v..v..v..FÞ.P......FÒ=.. 0000E0
 470B2607 8826FC5E C4FE5689 FC4689F2 5688F046 8801ABE9 E8468800 06E90375 u.Õ...FÒÕ¨..FÞ.V·.F■.V±á^■&..&.G 000100
 9A1276FF 1476FF10 76FF37FF 260277FF 26FC5EC4 0676FF08 76FF0136 E9037502 .u.Õ6..v..v.á^■&.w.&.7.v..v..v.. 000120
 5EC40048 E9037500 EE7E8301 61E9E846 880006E9 03750000 30E84689 0000FFFF .....FÒ=..u.Õ...FÒÕa..-Y.u.ÕH.á^ 000140
 C4EC5689 EA46890A 57882608 47882612 5EC4F656 89F44689 02578826 07882612 .&..&.W..F¶.V-á^.&.G.&.W..FÕ.V&á 000160
 5689F846 8906578B 2604478B 26125EC4 E65689E4 46890E57 8B260C47 8B26125E ^.&.G.&.V..FÕ.V¦á^.&.G.&.W..F%.V 000180
 F4463800 08E9037E 0013E903 7DF6563B 02578826 07882612 5EC40000 EE46C7FA °ÚFY..á^.&..&.W.;V-).Õ..-.Õ..;F¶ 0001A0
 7EEC563B 0A578826 08478826 125EC4F6 5689F446 89F4468B F6568800 06E90377 w.Õ...V-.F¶.F¶.V-á^.&.G.&.W.;V$- 0001C0
 125EC4EC 5689EA46 89EA468B EC568800 06E90372 EA463B00 08E9037D 0013E903 .Õ..).Õ..;För.Õ...V&.FÕ.FÕ.V&á^. 0001E0
```

Dump of file SATURN:[PCCOMMON.DUMP.DLL]ANALUT.TMP;1 on 18-APR-1990 10:36:38.62
File ID (506,31,0)   End of file block 35 / Allocated 36

Virtual block number 3 (00000003), 512 (0200) bytes

```
468910C4 83027704 2C9A0E76 FF1076FF 0A76FF0C 76FF066A 036A0676 FF0876FF .v..v.j.j..v..v..v..v..,.W..á..F 000000
13E9037D FA563802 57882607 8826065E C40276E9 F2468800 06E90375 00003DF2 ·=..u.Ö...F·Öv.á^.&..&.W.;V*).Ö. 000020
47882606 5EC4FA56 89F84689 F8468BFA 56880006 E90377F8 46380008 E9037E00 .-.Ö..;F½w.Ö...V*.F½.F½.V*á^.&.G 000040
F4468BF6 56880006 E90372F4 46380008 E9037D00 13E9037E F656380A 57882608 .&.W.;V--.Ö..).Ö..;F¶r.Ö...V-.F¶ 000060
46380008 E9037D00 13E9037E F056380E 5788260C 47882606 5EC4F656 89F44689 .F¶.V-á^.&.G.&.W.;VÞ-.Ö..).Ö..;F 000080
FE563806 57882604 47882606 5EC4F056 89EE4689 EE468BF0 56880006 E90372EE Ÿr.Ö...VÞ.FŸ.FŸ.VÞá^.&.G.&.W.;V± 0000A0
76FFFE56 89FC4689 FC468BFE 56880006 E90377FC 46380008 E9037E00 13E9037D ).Ö..-.Ö..;F•w.Ö...V±.F•.F•.V±.v 0000C0
30F24689 10C483FF FF042C9A 0E76FF10 76FF0A76 FF0C76FF 136A036A 0676FF08 ..v.j.j..v..v..v..v..,....á..F·= 0000E0
7E0013E9 037DFA56 38025788 26078826 065EC401 98E9F246 880006E9 03750000 ..u.Ö...F·Ö..á^.&..&.W.;V*).Ö..- 000100
26084788 26065EC4 FA5689F8 4689F846 88FA5688 0006E903 77F84638 0008E903 .Ö..;F½w.Ö...V*.F½.F½.V*á^.&.G.& 000120
4689F446 88F6568P 0006E903 72F44638 0008E903 7D0013E9 037EF656 380A5788 .W.;V--.Ö..).Ö..;F¶r.Ö...V-.F¶.F 000140
72EE4638 0008E90: 7D0013E9 037EF056 380E5788 260C4788 26065EC4 F65689F4 ¶.V-á^.&.G.&.W.;VÞ-.Ö..).Ö..;FŸr 000160
037DFE56 38065788 26044788 26065EC4 F05689EE 4689EE46 88F05688 0006E903 .Ö...VÞ.FŸ.FŸ.VÞá^.&.G.&.W.;V±). 000180
FFF87E83 FE5689FC 4689FC46 88FE5688 0006E903 77FC4638 0008E903 7E0013E9 Ö..-.Ö..;F•w.Ö...V±.F•.F•.V±.-½. 0001A0
4689FA56 88F84688 0006E900 008A0000 880009E9 03747FFF FA7E8100 13E90374 t.Ö...-*..t.Ö..¡..¤..Ö...F½.V*.F 0001C0
0006E900 008A0000 880009E9 03748000 F67E8100 13E90374 00F47E83 FA5689F8 ½.V*.-¶.t.Ö...--..t.Ö..¡..¤..Ö.. 0001E0
```

```
Dump of file SATURN:[PCCOMMON.DUMP.DLL]ANALUT.TMP;1 on 18-APR-1990 10:36:38.62
File ID (506,31,0)   End of file block 35 / Allocated 36

Virtual block number 2 (00000002), 512 (0200) bytes

52455551 4C4D4408 444C4549 46544553 4C4D4408 444C4549 46595245 55514C4D MLQUERYFIELD.DMLSETFIELD.DMLQUER 000000
03020645 544952,7 534F4408 4F495303 5453494C 45455246 4C4D4408 4E4C5259 YRLN.DMLFREELIST.SIO.DOSWRITE... 000020
00000301 0102BC03 02010638 03010101 F8030017 03015D03 03610304 AE03056C l..Û..a..].....%....;....¥...... 000040
00000000 00000000 0000004C 4C442E74 756C616E 610A0000 00000305 F9030202 ...ª.......analut.DLL........... 000060
0088FA56 89F84689 FE5689FC 46897FFF 8AFFFFB8 D88EFFFF 881E5657 000012C8 È...WV.¡...Á¡..¤...F=.V±.F½.Vª¡. 000080
0A76FF0C 76FF036A 036A0676 FF0876FF F65689F4 4689F056 89EE4689 80008A00 .¤...FŸ.VÞ.F¶.V~.v..v.j.j..v..v. 0000A0
C403C6E9 F2468800 06E90375 000030F2 468910C4 83008804 2C9A0E76 FF1076FF .v..v..,.E..á..F·=..u.Ô...F·Ô6.á 0000C0
F65689F4 46890A57 88260847 8826065E C4FA5689 F8468902 578B2607 8B26065E ^.&..&.W..F½.Vªá^.&.G.&.W..F¶.V- 0000E0
89FC4689 06578B26 04478B26 065EC4F0 5689EE46 890E578B 260C478B 26065EC4 á^.&.G.&.W..FŸ.VÞá^.&.G.&.W..F=. 000100
10C48301 99042C9A 0E76FF10 76FF0A76 FF0C76FF 046A036A 0676FF08 76FFFE56 V±.v..v.j.j..v..v..v..v..,....á. 000120
037DFA56 3B02578B 26078B26 065EC403 54E9F246 880006E9 03750000 30F24689 .F·=..u.Ô...F·ÔT.á^.&..&.W.;Vª). 000140
26065EC4 FA5689F8 4689F846 88FA5688 0006E903 77F84638 0008E903 7E0013E9 Ô..~.Ô..;F¥w.Ô...Vª.F½.F½.Vªá^.& 000160
88F65688 0006E903 72F44638 0008E903 7D0013E9 037EF656 380A578B 2608478B .G.&.W.;V--.Ô..).Ô..;F¶r.Ô...V-. 000180
0008E903 7D0013E9 037EF056 380E578B 260C478B 26065EC4 F65689F4 4689F446 F¶.F¶.V-á^.&.G.&.W.;VÞ-.Ô..).Ô.. 0001A0
3B06578B 2604478B 26065EC4 F05689EE 4689EE46 88F05688 0006E903 72EE4638 ;FŸr.Ô...VÞ.FŸ.FŸ.VÞá^.&.G.&.W.; 0001C0
FE5689FC 4689FC46 88FE5688 0006E903 77FC4638 0008E903 7E0013E9 037DFE56 V±).Ô..~.Ô..;F=w.Ô...V±.F=.F=.V± 0001E0
```

```
Dump of file SATURN:[PCCOMMON.DUMP.DLL]ANALUT.TMP;1 on 18-APR-1990 10:36:38.62
File ID (506,31,0)   End of file block 35 / Allocated 36

Virtual block number 1 (00000001), 512 (0200) bytes
```

```
00000000 00000040 00000000 00000088 0000FFFF 00000004 00000023 01C45A4D MZ6.#............¡........a....... 000000
00000080 00000000 00000000 00000000 00000000 00000000 00000000 00000000 ................................ 000020
6F6E6E61 63206061 72676F72 70207369 685421C0 4C01B821 CD09B400 0EBA1F0E ..a..Ç.el¡.LeIThis program canno 000040
00000000 00000024 0A0D0D2E 65646F60 20534F44 206E6920 6E757220 65622074 t be run in DOS mode....$....... 000060
00030006 00000000 00030000 00000800 0006800E D1D22E0D 002D01BD 0505454E NE..§.-...#i.................... 000080
00000000 00000000 00010000 00040000 0000026A 0170016A 00700070 0040000E ..a.p.p.j.p.j................... 0000A0
18800F00 1880011D 000F0F00 000F011B 06880F00 068700AE 082C0F00 08280028 (.+...,.U.ñ...¡................. 0000C0
54554C41 4E411000 0054554C 414E4106 1C500F01 1ABA02AF 02020E01 00000000 ........£.a...P..ANALUT...ANALUT 0000E0
11000231 334F5431 32454D41 4E54554C 414E4110 00013132 4F543133 4540414E NAME31T021...ANALUTNAME21T031... 000100
5453454D 414E5455 4C414E41 14000345 5241504D 4F43454D 414E5455 4C414E41 ANALUTNAMECOMPARE...ANALUTNAMEST 000120
13000545 54414449 4C415645 40414E54 554C414E 41120004 45434150 53504952 RIPSPACE...ANALUTNAMEVALIDATE... 000140
554A4441 54554C41 4E411700 064C4143 494E4F4E 4143454D 414E5455 4C414E41 ANALUTNAMECANONICAL...ANALUTADJU 000160
4F4E4143 454D414E 53495455 4C414E41 15000753 4554414E 4944524F 4F435453 STCOORDINATES...ANALUTISNAMECANO 000180
4E411300 09595241 444E554F 42405054 45475455 4C414E41 1300084C 4143494E NICAL...ANALUTGETPMBOUNDARY...AN 0001A0
4140454D 414E5455 4C414E41 13000A4D 554E444E 45505041 4540414E 54554C41 ALUTNAMEAPPENDNUM...ANALUTNAMEMA 0001C0
44006C6D 6403534C 4C414353 4F440800 0040000A 00010000 08485447 4E454C58 XLENGTH.......a...DOSCALLS.dml.D 0001E0
```

```
Dump of file SATURN:[PCCOMMON.DUMP.DLL]ANFORM.TMP;1 on 18-APR-1990 10:36:51.25
File ID (512,24,0)   End of file block 29 / Allocated 32

Virtual block number 29 (0000001D), 512 (0200) bytes

 FFFF00F5 0008001E 001F0078 80010001 06FD0004 00050000 00000000 FFFFFFFF ..............».....x.......%... 000000
 FFFFFFFF 00F6C008 001E001F 00888001 00010702 00040005 00000000 0000FFFF ..................i.......-..... 000020
 0000FFFF FFFF00F2 00080028 0014000A 80010001 07070007 00050000 00000000 ..................(...·....... 000040
 00000000 FFFFFFFF 00F30008 00280009 000A8001 0001070F 00070005 00000000 ..................(...µ......... 000060
 65646F6D 20617461 442A0000 3A656D61 6E206C65 646F6D20 7473796C 616E4100 .Analyst model name:..*Data mode 000080
 003A6D79 6E6F6E79 5300003A 6E6F6974 70697263 73654400 003A656D 616E206C l name:..Description:..Synonym:. 0000A0
 4B006574 656C6544 00656361 6C706552 00646441 0000736D 796E6F6E 79532A00 .*Synonyms..Add.Replace.Delete.K 0000C0
 44006563 616C7065 52006464 41000073 64726F77 79654B00 003A6472 6F777965 eyword:..Keywords..Add.Replace.D 0000E0
 003A6C65 646F6D20 73736563 6F725000 003A656D 616E656C 69460065 74656C65 elete.Filename:..Process model:. 000100
 65440065 63616C70 65520064 64410000 736C6564 6F6D2073 7365636F 72502A00 .*Process models..Add.Replace.De 000120
 00656361 6C706552 00646441 00007365 746F4E2A 00003A65 746F4E00 6574656C lete.Note:..*Notes..Add.Replace. 000140
 005F5F5F 5F5F5F5F 006E6F69 74616D72 6F666E69 20726573 55006574 656C6544 Delete.User information._______. 000160
 005F5F5F 5F5F5F5F 005F5F5F 5F5F5F5F 005F5F5F 5F5F5F5F 005F5F5F 5F5F5F5F _______._______._______._______. 000180
 55006465 74616572 43007265 73550065 6D695400 65746144 005F5F5F 5F5F5F5F _______.Date.Time.User.Created.U 0001A0
 00000000 00000000 00000000 00000000 00000000 00000000 00006465 74616470 pdated.......................... 0001C0
 00000000 00000000 00000000 00000000 00000000 00000000 00000000 00000000 ................................ 0001E0
```

```
Dump of file SATURN:[PCCOMMON.DUMP.DLL]ANFORM.TMP;1 on 18-APR-1990 10:36:51.25
File ID (512,24,0)   End of file block 29 / Allocated 32

Virtual block number 28 (0000001C), 512 (0200) bytes

 00CC000C 002600A6 00CF8002 00000686 00070003 00000000 0000FFFF FFFF00CD ë.....................ü.!.&...ä. 000000
 FFFF00CB 000C0026 009400CF 80020000 068E0006 00030000 00000000 FFFFFFFF ....................ü...&...ü... 000020
 FFFFFFFF 000B00C3 00600084 00058001 00010695 00050005 00000000 0000FFFF ......................'...Ü..... 000040
 0000FFFF FFFF000A 000800C1 00780007 8002000C 069B0000 00060000 00000000 .................x.ê...Ö........ 000060
 00000000 FFFFFFFF 00090008 0060006C 00058001 0001069C 00060005 00000000 ................(.'...\......... 000080
 00000000 0000FFFF FFFF0008 003000C5 003A0005 80020008 06A30000 00070000 ......È.........:.é.O.Ä......... 0000A0
 00030000 00000000 FFFFFFFF 0007000C 0026005E 00CF8002 040006A4 00030003 ....Ê.....ü.^.&...ш............. 0000C0
 00060003 00000000 0000FFFF FFFF0006 000C0026 004C00CF 80020000 06A80007 ..'.....ü.L.&...ø............... 0000E0
 06B70010 00050000 00000000 FFFFFFFF 0005000C 0026003A 00CF8002 000006B0 ¯.....ü.:.&...f...............ñ. 000100
 000106C8 00070005 00000000 0000FFFF FFFF00F1 002000F0 00050005 80000002 ........Þ.-.þ...............à... 000120
 80010001 06D00007 00050000 00000000 FFFFFFFF 009C0008 00370014 00388001 ..8...7...................À..... 000140
 00888001 000106D8 00070005 00000000 0000FFFF FFFF009D 00080035 00140078 x...5...................Á.....¡. 000160
 00090038 80010001 06E00007 00050000 00000000 FFFFFFFF 009E0008 00370014 ..7...................Â.....8... 000180
 00360009 00788001 000106E8 00070005 00000000 0000FFFF FFFF009F 00080037 7.....................Ò.....x...6. 0001A0
 00080039 000900B8 80010001 06F00007 00050000 00000000 FFFFFFFF 00A00008 ..................Þ.....¡...9... 0001C0
 00F40008 0032001F 00388001 000106F8 00040005 00000000 0000FFFF FFFF00A1 Å.................½.....8...2...¶. 0001E0
```

```
Dump of file SATURN:[PCCOMMON.DUMP.DLL]ANFORM.TMP;1 on 18-APR-1990 10:36:51.25
File ID (512,24,0)   End of file block 29 / Allocated 32

Virtual block number 27 (0000001B), 512 (0200) bytes

000C0026 018A00CF 80020400 061C0003 00030000 00000000 FFFFFFFF 00E00030 0.Å.....................ü...&... 000000
00DE000C 0026C178 00CF8002 00000620 00070003 00000000 0000FFFF FFFF000F Ô................ .....ü.x.&...B. 000020
FFFF000D 000C0026 016600CF 80020000 06280006 00030000 00000000 FFFFFFFF ..................(.....ü.f.&...Ï... 000040
FFFFFFFF 00EA0008 005C0156 00058001 0001062F 00080005 00000000 0000FFFF ............../.......V.\...ð..... 000060
0000FFFF FFFF00EB 000800C1 014A0007 8002000C 06380000 00060000 00000000 ............8.......J.ê...Š....... 000080
00000000 FFFFFFFF 00EC0008 0040013E 00058001 00010639 00080005 00000000 .........9.......>.@...&.......... 0000A0
00000000 0000FFFF FFFF00ED 003000C5 010C0005 80020008 06420000 00070000 .......B.........é.0.Ú............ 0000C0
00030000 00000000 FFFFFFFF 00EE000C 00260130 00CF8002 00000643 00030003 .....C......ü.0.&...Ÿ............. 0000E0
00060003 00000000 0000FFFF FFFF00EF 000C0026 011E00CF 80020000 06470007 ..G......ü...&...ÿ................ 000100
06560009 00050000 00000000 FFFFFFFF 00F0000C 0026010C 00CF8002 0000064F O.....ü...&...Þ.................V. 000120
00010660 00000005 00000000 0000FFFF FFFF00C9 0008003E 00FC0005 80010001 .......•.>...è..................'... 000140
80010001 0661000E 00050000 00000000 FFFFFFFF 00CA000C 00F000EE 00058001 ....Ý.Þ...ð...................a..... 000160
00078002 000C0670 00000006 00000000 0000FFFF FFFF0001 00080056 000E0005 ..B.V...Ì..................p....... 000180
00C60005 80010001 0671000F 00050000 00000000 FFFFFFFF 00D00008 00C10002 Æ.è...Å..................q.......ó. 0001A0
00C50094 00058002 00080681 00000007 00000000 0000FFFF FFFF00CF 0008008C ....ü..........................é. 0001C0
000C0026 00B800CF 80020000 06820003 00030000 00000000 FFFFFFFF 00CE0030 0.ö......................ü.¡.&... 0001E0
```

```
Dump of file SATURN:[PCCOMMON.DUMP.DLL]ANFORM.TMP;1 on 18-APR-1990 10:36:51.25
File ID (512,24,0)   End of file block 29 / Allocated 32

Virtual block number 26 (0000001A), 512 (0200) bytes

000000F0 00EF00EE 00ED00EB 00800000 00000000 00000000 00CB00CC 00CD00CE ö.e.ä.ù.............$.Ù.Ý.ý.þ... 000000
44206567 6E616843 00747379 6C616E41 00747379 6C616E41 00000000 00000000 ........Analyst.Analyst.Change D 000020
7473796C 616E6120 6E612067 6E696464 41006560 616E206C 65646F4D 20617461 ata Model name.Adding an analyst 000040
60616E20 40502065 63616C70 65722072 6F66206E 78742074 72617453 00405020  PM.Start txn for replace PM nam 000060
0001FFFF 00000000 40502074 73796C61 6E61206E 6120676E 6974656C 65440065 e.Deleting an analyst PM........ 000080
00000000 FFFF0001 000E0352 00000717 00000000 00000000 00000005 00CC0002 ..ä.................R........... 0000A0
00000000 05CDFFFF 00C8023B 00FAFFF3 00719400 009005CC 00000001 00000030 0.......ä.....q.µ.'.¿.à...ë..... 0000C0
00000000 0000FFFF FFFF00E8 00080096 022E0005 80010001 05D10013 00050000 .......Ì..............Ò........... 0000E0
00050000 00000000 FFFFFFFF 00E70008 00EC0222 00078002 000C05E5 00000006 ....Ì.......".$...Ò............. 000100
00000006 00000000 0000FFFF FFFF0003 00080060 02100005 80010001 05E60011 ..Ì.........'...Æ............... 000120
05F9000C 00050000 00000000 FFFFFFFF 00040008 00EC0204 00078002 000C05F8 %.........$...å................'. 000140
00270606 0000000A 00000000 0000FFFF FFFF00E6 00080060 01F20005 80000001 ........'...Ì...................'. 000160
80010001 06070008 00050000 00000000 FFFFFFFF 00E5002C 00EC01C2 00078002 ....ò.$..Ì...................... 000180
00078002 000C0610 00000006 00000000 0000FFFF FFFF00E1 00080060 01B00005 ..¯.'...Å....................... 0001A0
01980005 80010001 06110009 00050000 00000000 FFFFFFFF 00E20008 00C101A4 Ê.è...â......................... 0001C0
00C50166 00058002 0008061B 00000007 00000000 0000FFFF FFFF00E3 00080060 '...D......................f.é. 0001E0
```

Dump of file SATURN:[PCCOMMON.DUMP.DLL]ANFORM.TMP;1 on 18-APR-1990 10:36:51.25
File ID (512,24,0)   End of file block 29 / Allocated 32

Virtual block number 27 (0000001B), 512 (0200) bytes

```
000C0026 018A00CF 80020400 061C0003 00030000 00000000 FFFFFFFF 00E00030 0.Å......................ü...&... 000000
000E000C 00260178 00CF8002 00000620 00070003 00000000 0000FFFF FFFF000F Ô...............  .....ü.x.&...8. 000020
FFFF0000 000C0026 016600CF 80020000 06280006 00030000 00000000 FFFFFFFF ...............(.....ü.f.&...Ï... 000040
FFFFFFFF 00EA0008 005C0156 00058001 0001062F 00080005 00000000 0000FFFF ............./.......V.\...ð..... 000060
0000FFFF FFFF00EB 000800C1 014A0007 8002000C 06380000 00060000 00000000 ..........8.......J.ê...Š....... 000080
00000000 FFFFFFFF 00EC0008 0040013E 00058001 00010639 00080005 00000000 ........9.......>.@...$......... 0000A0
00000000 0000FFFF FFFF00E0 003000C5 010C0005 80020008 06420000 00070000 ......B.........é.0.Ù........... 0000C0
00030000 00000000 FFFFFFFF 00EE000C 00260130 00CF8002 00000643 00030003 ....C.....ü.0.&...Ý............. 0000E0
00060003 00000000 0000FFFF FFFF00EF 000C0026 011E00CF 80020000 06470007 ..G.....ü...&...ý............... 000100
06560009 00050000 00000000 FFFFFFFF 00F0000C 0026010C 00CF8002 0000064F O.....ü...&...Þ...............V. 000120
00010660 00000005 00000000 0000FFFF FFFF00C9 0008003E 00FC0005 80010001 ......•.>...è...............'... 000140
80010001 0661000E 00050000 00000000 FFFFFFFF 00CA000C 00F000EE 00058001 ....Ý.Þ...ð..............•...... 000160
00078002 000C0670 00000006 00000000 0000FFFF FFFF00D1 00080056 000E0005 ..8.V...Ì..............p....... 000180
00C60005 80010001 0671000F 00050000 00000000 FFFFFFFF 00000008 00C10002 •.è...Å...............q.......ó. 0001A0
00C50094 00058002 00080681 00000007 00000000 0000FFFF FFFF00CF 0008008C ....ü........................é. 0001C0
000C0026 008800CF 80020000 06820003 00030000 00000000 FFFFFFFF 00CE0030 0.o......................ü.|.&... 0001E0
```

```
Dump of file SATURN:[PCCOMMON.DUMP.DLL]ANFORM.TMP;1 on 18-APR-1990 10:36:51.25
File ID (512,24,0)   End of file block 29 / Allocated 32

Virtual block number 11 (00000008), 512 (0200) bytes

0AFA9A50 16AC468D 1276FF14 76FF1676 FF030CE9 A2468800 0207C726 0E5EC408 .á^.&ú....FÀÕ...v..v..v..F¯.P.*. 000000
C4830000 0E979~A2 76FF0195 680A76FF 0C76FF00 22E90375 00003DA2 46890000 ...FÅ=..u.Õ"..v..v.h...vÅ......á 000020
89000008 7B9A5016 9A468D14 76FF1676 FF02CCE9 A2468800 0207C726 0E5EC408 .á^.&ú....FÀÕä..v..v..F..P.(.... 000040
5EC408C4 8300000E D49AA276 FF019568 0A76FF0C 76FF0022 E9037500 003DA246 FÅ=..u.Õ"..v..v.h...vÅ.å....á.á^ 000060
3DA24689 0000083A 9A5016A4 468D1476 FF1676FF 028FE9A2 46880002 07C7260E .&ú....FÀÕ...v..v..FÉ.P.:....FÅ= 000080
C7260E5E C408C483 00000F43 9AA276FF 0195680A 76FF0C76 FF0022E9 03750000 ..u.Õ"..v..v.h...vÅ.C....á.á^.&ú 0000A0
0BC49A50 16844680 4B6A0277 FF26AC5E C4A876FF AA76FF02 52E9A246 88000207 ....FÀÕR..v`.v´á^¯&.w.jK.FÇ.P.á. 0000C0
FFA676FF 0000FFFF 9A486A50 16FF0286 8D0477FF 26AC5EC4 A876FFAA 76FF0000 ...v`.v´á^¯&.w......PjK......vÌ. 0000E0
FF019568 0A76FF0C 76FF0022 E9037500 003DA246 8900000C 2E9A0094 681EA476 vÊ.h........FÅ=..u.Õ"..v..v.h... 000100
76FFA476 FFA676FF 01E3E9A2 46880002 07C7260E 5EC408C4 8300000F 889AA276 vÅ......á.á^.&ú....FÀÕD..vÌ.vÊ.v 000120
76FF0C76 FF0022E9 03750000 3DA24689 00000C83 9A501680 4680046A 9A76FF9C ..v.j..F¯.P......FÅ=..u.Õ"..v..v 000140
80468801 9EE9A246 88000207 C7260E5E C408C483 00000FF8 9AA276FF 0195680A .h...vÅ.½....á.á^.&ú....FÀÕ...F¯ 000160
5EC4A476 FFA676FF 00C8E903 7502470B 26078826 9E5EC4A0 56899E46 89825688 .Vý.F..V.á^.&..&.G.u.Õù..vÌ.vÊá^ 000180
002DE903 7500003D A2468900 000A349A 5016FF4E 868D026A 37FF2602 77FF269E .&.w.&.7j...N..P.4....FÅ=..u.Õ-. 0001A0
C408C483 00001059 9AA276FF 0195680A 76FF0C76 FF000000 559AA476 FFA676FF .vÌ.vÊ.U....v..v.h...vÅ.Y....á.á 0001C0
003D0000 FFFF9A50 16FF4E86 8D5016FF 0286B001 2EE9A246 88000207 C7260E5E ^.&ú....FÀÕ.......P..N..P.....=. 0001E0
```

```
Dump of file SATURN:[PCCOMMON.DUMP.DLL]ANFORM.TMP;1 on 18-APR-1990 10:36:51.25
File ID (512,24,0)   End of file block 29 / Allocated 32

Virtual block number 10 (0000000A), 512 (0200) bytes

 76FF002F E9037500 003DFF52 86890000 07509A00 7F681EA2 76FFA476 FF0000FF ....vÊ.vÅ.h...}.....R.=..u.Ö/..v 000000
 5EC408C4 8300000C AC9AFF52 86FF0195 680A76FF 0C76FF00 000C9A9A A276FFA4 Ê.vÅ......v..v.h...ÑR..¯....á.á^ 000020
 A6468003 6AFF4AE5 FFFF4CB6 FFA276FF A476FF01 72E9FF52 86880002 07C7260E .&ú.....R.Ör..vÊ.vÅ.ÑL..ÑJ.j..FÏ 000040
 76FF0000 08E59AA2 76FFA476 FF002FE9 03750000 3DFF5286 89000009 EC9A5016 .P.$.....R.=..u.Ö/..vÊ.vÅ.Ï....v 000060
 E9FF5286 88000207 C7260E5E C408C483 00000010 9AFF5286 FF019568 0A76FF0C ..v.h...ÑR.......á.á^.&ú.....R.Ö 000080
 80A276FF A476FF37 FF260277 FF26A65E C4FF4A86 FFFF4CB6 FF501682 46800110 ...Fý.P.ÑL..ÑJ.á^Ï&.w.&.7.vÊ.vÅ. 0000A0
 82468000 40E90375 00003DFF 52868918 C4830000 FFFF9A00 6A756A50 16FF4E86 .N..Pjuj.......á...R.=..u.Öa..Fý 0000C0
 C4000407 C7260E5E C40CC483 000006FD 9AFF5286 FF019568 0A76FF0C 76FF5016 .P.v..v.h...ÑR..».....á.á^.&ú...á 0000E0
 A476FF00 A2E90000 88000008 6C9AA276 FFA476FF 07892606 5EC40247 8826AE5E ^Ü&.G.á^.&...vÊ.vÅ.Ï...¡..ÖÅ..vÊ 000100
 FFAA76FF AC76FF0C 000C459A A276FFA4 76FF0000 0A8E9AA6 76FFA876 FFA276FF .vÅ.v´.vÏ......vÊ.vÅ.E....v¯.v´. 000120
 03750000 3DFF5286 8900000A 659AFF4E 86FFFF50 86FF5016 824680AE 76FFB076 v¯.vÜ.Fý.P.ÑP..ÑN..e.....R.=..u. 000140
 000207C7 260E5EC4 08C48300 000AD59A FF5286FF 0195680A 76FF0C76 FF0024E9 Ö$..v..v.h...ÑR..Ï....á.á^.&ú... 000160
 C09A00A0 681476FF 1676FF00 0008F9A 009F6814 76FF1676 FF0038E9 FF528688 ..R.Ö8..v..v.h...¢....v..v.h...ë 000180
 1F0000E9 00008800 0307C726 0E5EC400 0008F39A 00A16814 76FF1676 FF000000 ....v..v.hÅ..µ...á^.&ú...¡..Ö... 0001A0
 0AB79A50 16A8468D 1476FF16 76FFD88E 0AA7881E 56570000 FEC80012 CAC95F5E ^_èò..à±..WV.¡Ï..Á.v..v..F´.P.ñ. 0001C0
 C4830000 0E5A9AA2 76FF0195 680A76FF 0C76FF00 22E90375 000030A2 46890000 .¯.FÅ=..u.Ö"..v..v.h...vÅ.Z....á 0001E0
```

```
Dump of file SATUK.I:[PCCOMMON.DUMP.DLL]ANFORM.TMP;1 on 18-APR-1990 10:36:51.25
File ID (512,24,0)   End of file block 29 / Allocated 32

Virtual block number 9 (00000009), 512 (0200) bytes

03750000 30EE4689 000005E8 9A50169A 4680026A 37FF2602 77FF26EA 5EC4F076 vpá^õ&.w.&.7j..F..P.Ò....FŸ=..u. 000000
77FF26EA 5EC45u16 9A4680F8 76FFFA76 FFF476FF F676FF00 4FE9EE46 880006E9 Ò...FYÒO..v~.v¶.v'.v½.F..Pá^õ&.w 000020
8CE904EA 4683001E E9EE4688 0006E903 7500003D EE468900 00FFFF9A 37FF2602 .&.7......FŸ=..u.Ò...FYÒ...Fõ.Ò. 000040
C80006CA C95F5E1F 0000E900 00880000 08619AFC 76FFFE76 FFF076FF F276FFFF ..v·.vP.v±.v=.a...j..Ò...^_èò..à 000060
30FF5286 89000009 409A5016 AA468D14 76FF1676 FFD88E09 30881E56 570000B6 Ñ..WV.¦0..Á.v..v..F`.P.a.....R.= 000080
260E5EC4 08C48300 0008189A FF5286FF 0195680A 76FF0C76 FF0024E9 03750000 ..u.Ò$..v..v.h...ÑR........á.á^.& 0000A0
86890000 09A69A50 16AE4680 1276FF14 76FF1676 FF02F4E9 FF528688 000207C7 ú.....R.Ò¶..v..v..v..FÜ.P.¦..... 0000C0
C408C483 00000858 9AFF5286 FF019568 0A76FF0C 76FF0024 E9037500 003DFF52 R.=..u.Ò$..v..v.h...ÑR..X....á.á 0000E0
86890000 09619A50 16A2468D 1476FF16 76FF0281 E9FF5286 88000207 C7260E5E ^.&ú.....R.ÒŸ..v..v..FÅ.P.@...... 000100
C408C483 00000899 9AFF5286 FF019568 0A76FF0C 76FF0024 E9037500 003DFF52 R.=..u.Ò$..v..v.h...ÑR........á.á 000120
89000009 829A5016 FF4A868D 1476FF16 76FF0271 E9FF5286 88000207 C7260E5E ^.&ú.....R.Òq..v..v...J..P...... 000140
08C48300 000C579A FF5286FF 0195680A 76FF0C76 FF0024E9 03750000 3DFF5286 .R.=..u.Ò$..v..v.h...ÑR..W....á. 000160
46804B6A 0277FF26 AE5EC4AA 76FFAC76 FF0230E9 FF528688 000207C7 260E5EC4 á^.&ú.....R.ÒO..v¯.v´á^Û&.w.jK.F 000180
006A006A 006A006A 01606804 77FF26AE 5EC4AA76 FFAC76FF 00000723 9A5016B2 ý.P.#....v¯.v´á^Û&.w.h'.j.j.j.j. 0001A0
4EB6FFFF 50B6FFFE 76FF006A 01696812 76FFAA76 FFAC76FF FE468900 000C029A ......F±.v¯.v´.v.hi.j..v±.ÑP..ÑN 0001C0
FF9A5052 00000607 9A0277FF 26AE5EC4 AA76FFAC 76FF016A 006A0000 09049AFF ..å...j.j:.v¯.v´á^Û&.w......RP.. 0001E0
```

```
Dump of file SATURN:[PCCOMMON.DUMP.DLL]ANFORM.TMP;1 on 18-APR-1990 10:36:51.25
File ID (512,24,0)   End of file block 29 / Allocated 32

Virtual block number 8 (00000008), 512 (0200) bytes

 95680A76 FF0C76FF 5016A246 800046E9 037500F2 7E83FFD8 E9FFD8E9 0375C008 .àu.ÕÜ.ÕA..-·.u.ÕF..FÅ.P.v..v.h. 000000
 F876FFFA 76FFF476 FFF676FF 000207C7 260E5EC4 0CC48300 0008889A F276FF01 ..v·.¡....á.á^.&ú....v-.v¶.v°.v½ 000020
 C4F476FF F676FFCJ 54E900AB E9000088 000008A7 9AF476FF F676FF00 0008DA9A .O....v-.v¶.Ï...¡..Õ¨.ÕÏ..v-.v¶á 000040
 002DE903 75000030 F2468900 00FFFF9A 5016A246 802F6A37 FF260277 FF26F85E ^½&.w.&.7j/.FÅ.P......F·=..u.Õ-. 000060
 C408C483 00000683 9AF276FF 0195680A 76FF0C76 FF0000FF FF9AF476 FFF676FF .v-.v¶......v..v.h...v·.·....á.á 000080
 76FF0000 06289AF8 76FFFA76 FFF476FF F676FF00 54E9F246 88000207 C7260E5E ^.&ú....F·ÕÏ..v-.v¶.v°.v½.+....v 0000A0
 00A06814 76FF1676 FF000009 019A009F 681476FF 1676FF00 00FFFF9A F476FFF6 -.v¶......v..v.h........v..v.h.. 0000C0
 00E90000 88000107 C7260E5E C4000004 3F9A00A1 681476FF 1676FF00 00090F9A ......v..v.hÀ..?...á^.&ú...¡..Õ. 0000E0
 9A5016F4 46800876 FF0A76FF D88E0657 881E5657 000066C8 0012CAC9 5F5E1F00 ..^_èò..àf..WV.¡W..Á.v..v..F¶.P. 000100
 5016F046 800876FF 0A76FF01 43E9EE46 880006E9 03750000 30EE4689 00000667 g....FŸ=..u.Õ...FŸÕC..v..v..Fÿ.P 000120
 16E64680 0876FF0A 76FF0122 E9EE4688 0006E903 75000030 EE468900 0006A49A .Ê....FŸ=..u.Õ...FŸÕ"..v..v..FÌ. 000140
 0676FF08 76FF0A76 FF0:01E9 EE468800 06E90375 000030EE 46890000 06E19A50 P.Å....FŸ=..u.Õ...FŸÕ...v..v..v. 000160
 76FFF676 FF000DE9 EE468800 06E90375 000030EE 46890000 02149A50 16:·'680 .F½.P......FŸ=..u.Õ...FŸÕï..v-.v 000180
 76FFF076 FFF276FF 000005A3 9A006A00 6A006A00 6A016E68 0477FF26 F85E·'F4 ¶á^½&.w.hn.j.j.j.j..È....v·.vÞ.v 0001A0
 97E9EE46 880006E9 03750000 30EE4689 000007A2 9A5016FC 4680046A E676F:58 Õ.vÌj..F=.P.Å....FŸ=..u.Õ...FŸÕ. 0001C0
 FFF276FF 0065E903 7502470B 26078826 EA5EC4EC 5689EA46 89FE5688 FC468800 ..F=.V±.Fõ.Všá^õ&..&.G.u.Õe..v·. 0001E0
```

```
Dump of file SATURN:[PCCOMMON.DUMP.DLL]ANFORM.TMP;1 on 18-APR-1990 10:36:51.25
File ID (512,24,0)   End of file block 29 / Allocated 32

Virtual block number 7 (00000007), 512 (0200) bytes

 050E9A50 16A64E30 0676FFFC 76FFFE76 FF0000FF FF9AF876 FFFA76FF F476FFF6 -.v¶.v'.v½......v±.v=.v..F|.P... 000000
 76FF1676 FFD88E05 27B81E56 5700005E C80006CA C95F5E1F 0000E900 00880000 ..¡..Õ...^_èò..à^..WV.¡'..Á.v..v 000020
 FF019568 0A76FF0C 76FF0022 E9037500 0030F246 89000005 379A5016 FC468014 ..F=.P.7..._F·=..u.Õ"..v..v.h... 000040
 46801476 FF1676FF 0289E9F2 46880002 07C7260E 5EC408C4 83000006 C09AF276 v·.à....á.á^.&ú....F·Õ...v..v..F 000060
 9AF276FF 0195680A 76FF0C76 FF0022E9 03750000 30F24689 00000558 9A5016F4 ¶.P.X....F·=..u.Õ"..v..v.h...v·. 000080
 5016EE46 8D1476FF 1676FF02 4CE9F246 88000207 C7260E5E C408C483 0000030F Õ....á.á^.&ú....F·ÕL..v..v..FŸ.P 0000A0
 0007309A F276FF01 95680A76 FF0C76FF 0022E903 75000030 F2468900 0005799A .y....F·=..u.Õ"..v..v.h...v·.=.. 0000C0
 A246804B 6A1276FF FC76FFFE 76FF020F E9F24688 000207C7 260E5EC4 08C48300 ..á.á^.&ú....F·Õ...v±.v=.v.jK.FÅ 0000E0
 0007799A 981B6801 95680A76 FF0C76FF 0022E903 7400A27E 800000FF FF9A5016 .P......~Å.t.Õ"..v..v.h..h...y.. 000100
 00FFFF9A 0068681E F476FFF6 76FF01CF E90000B8 000207C7 260E5EC4 08C48300 ..á.á^.&ú...¡..Õù..v~.v¶.hh..... 000120
 08C48300 0007BE9A F276FF01 95680A76 FF0C76FF 0022E903 75000030 F2468900 ..F·=..u.Õ"..v..v.h...v·./....á. 000140
 16F84680 036AEE76 FFF076FF F476FFF6 76FF0193 E9F24688 000207C7 260E5EC4 á^.&ú....F·Õ...v~.v¶.vÞ.vŸj..F½. 000160
 08459AF2 76FF0195 680A76FF 0C76FF00 22E90375 000030F2 46890000 05889A50 P.E....F·=..u.Õ"..v..v.h...v·.E. 000180
 00FFFF9A 006A006A 5016A246 80014EE9 F2468800 0207C726 0E5EC408 C4830000 ...á.á^.&ú....F·ÕN..FÅ.Pj.j..... 0001A0
 E99818F2 46C70030 E9981CF2 46C70038 E9981AF2 46C7001E E9F24688 F2468900 ..F·.F·Õ..úF·..Õ8.úF·..Õ0.úF·..Õ 0001C0
 FFD2E903 75943230 FFD2E903 75943130 FFEAE903 75943030 0022E900 25E90028 (.Õ%.Õ".=0.u.Õõ.=1.u.Õ●.=2.u.Õ●. 0001E0
```

```
Dump of file SATURN:[PCCOMMON.DUMP.DLL]ANFORM.TMP;1 on 18-APR-1990 10:36:51.25
File ID (512,24,0)   End of file block 29 / Allocated 32

Virtual block number 6 (00000006), 512 (0200) bytes

4D9A009F 681476FF 1676FF00 38E9FA46 88000207 C7260E5E C408C483 00000368 h....å.å^.&ú....F*Õ8..v..v.h...M 000000
C40000FF FF9A00A1 681476FF 1676FF00 0004589A 00A06814 76FF1676 FF000004 ....v..v.h...[....v..v.hÀ......å 000020
D88E032A 881E56?7 00009CC8 0012CAC9 5F5E1F00 00E90000 88000307 C7260E5E ^.&ú...j..Ö...^_èò..à...WV.j*..Á 000040
77E9F646 880006E9 03750000 3DF64689 00000256 9A5016FC 468D0876 FF0A76FF .v..v..F=.P.V....F-=..u.Ö...F-Öw 000060
E9F6468B 0006E903 75000030 F6468900 0003AB9A 5016F846 8D0876FF 0A76FF00 ..v..v..F½.P......F-=..u.Ö...F-Ö 000080
FFFA76FF 0000007E 9A006A00 6A009068 006A0143 680676FF FC76FFFE 76FF0056 V..v±.v=.v.hC.j.h..j.j..~....v*. 0000A0
76FF001A E9F6468B 0006E903 75000030 F6468900 00FFFF9A 5016FF64 868DF876 v½..d..P......F-=..u.Ö...F-Ö...v 0000C0
C80006CA C95F5E1F 0000E900 00880000 FFFF9A50 16FF6486 800676FF FC76FFFE ±.v=.v...d..P.....j..Ö...^_èò..à 0000E0
003DF246 89000004 8C9A5016 FC468D08 76FF0A76 FFD88E04 7C881E56 5700005E ^..WV.j|..Á.v..v..F=.P......F·=. 000100
3DF24689 000004AD 9A5016F4 468D0876 FF0A76FF 00FCE9F2 46880006 E9037500 .u.Ö...F·Ö=..v..v..F¶.P.Ü....F·= 000120
F2468900 0003989A 5016A246 800876FF 0A76FF00 D8E9F246 880006E9 03750000 ..u.Ö...F·ÖÜ..v..v..FÅ.P......F· 000140
006A486A 006A0143 680676FF FC76FFFE 76FF008A E9F24688 0006E903 75000030 =..u.Ö...F·Öa..v±.v=.v.hC.j.jKj. 000160
890000FF FF9A5016 F8468D03 6AA276FF A476FFF4 76FFF676 FF000004 D89A006A j..Á....v-.v¶.vÊ.vÅj..F½.P...... 000180
37FF2602 77FF26F8 5EC4F476 FFF676FF 0078E9F2 46880006 E9037500 003DF246 F·=..u.Ö...F·Öx..v-.v¶á^½&.w.&.7 0001A0
FE76FF00 48E9F246 880006E9 03750000 3DF24689 000003C3 9A5016A6 468D2F6A j/.F¦.P.û....F·=..u.Ö...F·ÖK..v± 0001C0
76FF0000 FFFF9A37 FF260277 FF26F85E C4006A50 520000FF FF9A0676 FFFC76FF .v=.v......RPj.á^½&.w.&.7......v 0001E0
```

```
Dump of file SATL V:[PCCOMMON.DUMP.DLL]ANFORM.TMP;1 on 18-APR-1990 10:36:51.25
File ID (512,24,0)   End of file block 29 / Allocated 32

Virtual block number 5 (00000005), 512 (0200) bytes

75000030 F2468900 00015A9A 5016F646 800E76FF 1076FF00 B4E9F246 880006E9 Ô...F ÔÇ..v..v..F-.P.Z....F =..u 000000
00003DF2 46890U00 00249A50 16F8468D 0E76FF10 76FF0093 E9F2468B 0006E903 .Ô...F Ô...v..v..F½.P.$....F =.. 000020
FE76FF06 76FF0876 FF0A76FF 0C76FFF8 76FFFA76 FF0072E9 F2468800 06E90375 u.Ô...F Ôr..v'.v½.v..v..v..v..v± 000040
3D001BE9 03760007 3D0046E9 0049E900 0088004F E90000FF FF9AF676 FFFC76FF .v•.v-.....ÔO.¡..ÔI.ÔF.=•.v.Ô..= 000060
E9037300 DD3DFFD4 E9FF4EE9 037700CD 3DFFDFE9 037300CB 3DFF5EE9 03720005 ſ.r.Ô^.=ù.s.ÔÔ.=è.w.ÔN.ÔÅ.=ì.s.Ô 000080
5F5E1FFF B1E9FF28 E9037700 F03DFFBC E9037300 EE3DFF3B E9037700 DF3DFFCC ä.=Ô.w.Ô;.=Ý.s.ÔV.=Þ.w.Ô+.ÔŸ..^_ 0000A0
9A005868 1E026A06 76FF0876 FF0A76FF D88E01F5 B81E5657 000002C8 000CCAC9 èò..à...WV.¡¥..Á.v..v..v.j..hX.. 0000C0
CAC95F5E 1F0000E9 00008800 06E9FE46 880006E9 03750000 3DFE4689 0000FFFF .....F±=..u.Ô...F±Ô..¡..Ô...^_èò 0000E0
FF0E76FF 1076FF02 6A1276FF 1476FF16 76FFD88E 02ECB81E 56570000 56C80006 ..àV..WV.¡$..A.v..v..v.j..v..v.. 000100
76FF0C76 FF0022E9 03750000 3DFA4689 0000FFFF 9A0676FF 0876FF0A 76FF0C76 v..v..v..v.......F'=..u.Ô"..v..v 000120
0E5EC400 F0E9FA46 88000207 C7260E5E C408C483 0000FFFF 9AFA76FF 0195680A .h...v'......á.á^.&ú....F'ÔÞ.á^. 000140
FF0000FF FF9A5016 F6468014 76FF1676 FF000EE9 00008800 06E90374 023F8326 &.?.t.Ô..¡..Ô8..v..v..F-.P...... 000160
AA468D02 6AF676FF F876FFFC 76FFFE76 FF000000 549A5016 FC468014 76FF1676 v..v..F=.P.T....v±.v•.v½.v-j..F` 000180
209AFA76 FF019568 0A76FF0C 76FF0022 E9037500 003DFA46 890000FF FF9A5016 .P......F'=..u.Ô"..v..v.h...v'.  0001A0
46800060 681E1476 FF1676FF 0079E9FA 46880002 07C7260E 5EC408C4 83000004 ....á.á^.&ú....F'Ôy..v..v..h'..F 0001C0
9AFA76FF 0195680A 76FF0C76 FF0022E9 03750000 3DFA4689 0000FFFF 9A5016AA ˜.P......F'=..u.Ô"..v..v.h...v'. 0001E0
```

```
Dump of file SATURN:[PCCOMMON.DUMP.DLL]ANFORM.TMP;1 on 18-APR-1990 10:36:51.25
File ID (512,24,0)   End of file block 29 / Allocated 32

Virtual block number 4 (00000004), 512 (0200) bytes

 E9037401 FA7E8301 ADE9E846 880006E9 03750000 30E84689 0000FFFF 9A5016F2 ..P......FÒ=..u.Ô...FÒÔÙ..~*.t.Ô 000000
 03750000 30E84689 0000FFFF 9A5016EC 46800E76 FF1076FF 00B9E9E6 468B00E2 â..FlÔ¿..v..v..F$.P......FÒ=..u. 000020
 00B29A00 6A006A00 6A006A01 6568E676 FFF276FF F476FF01 7DE9E846 880006E9 Ô...FÒÔ)..v¶.v·.vlhe.j.j.j.j..ý. 000040
 FFF476FF 0062E900 00FFFF9A EC76FFEE 76FF000E E90374FF EA7E83EA 46890000 ...Fô.~ô.t.Ô...vŸ.vš.....Ôb..v¶. 000060
 08FC4688 FE5689FC 46890000 FFFF9A00 6A006AEA 76FF006A 016A68E6 76FFF276 v·.vlhj.j..vôj.j.......F=.V±.F=. 000080
 0008E903 7400E47E 830000FF FF9A5016 E446800E 76FF1076 FF0037E9 0375FE46 F±u.Ô7..v..v..FÔ.P......~ô.t.Ô.. 0000A0
 23E90000 FFFF9A01 6AFC76FF FE76FFEC 76FFEE76 FF000000 959AEC76 FFEE76FF .vŸ.vš......vŸ.vš.v±.v=j......Ô# 0000C0
 27E90375 00ED30FF 2FE90375 00E030FF 37E90375 00D830FF 3FE90375 00CE3000 .=ö.u.Ô?.=Á.u.Ô7.=Á.u.Ô/.=Ú.u.Ô' 0000E0
 E8468900 00FFFF9A 5016F646 80E676FF 0E76FF10 76FF0071 E9E6468B 0000E9FF .Ô...FlÔq..v..v..vl.F-.P......FÒ 000100
 46890000 FFFF9A50 16F04680 0E76FF10 76FF0098 E9E84688 0006E903 75000030 =..u.Ô...FÒÔ...v..v..FÞ.P......F 000120
 76FF0876 FF0A76FF 0C76FFF2 76FFF476 FF0077E9 E8468800 06E90375 000030E8 Ò=..u.Ô...FÒÔw..v¶.v·.v..v..v..v 000140
 0375000A 30004BE9 004EE900 00B80054 E90000FF FF9AF076 FFF676FF F876FF06 ..v%.v-.vÞ.....ÔT.¡..ÔN.ÔK.=Ö.u. 000160
 FF6AE903 7500083D FF72E903 7500003D FF7AE903 7500CE3D 001BE903 76FF87E9 Ô..v.Ô..=ö.u.Ôz.=Á.u.Ôr.=Á.u.Ôj. 000180
 037500ED 30FF4FE9 037500EB 30FF57E9 037500E2 30FF5FE9 037500E0 30FFCFE9 Ôu.=Á.u.Ô_.=ã.u.ÔW.=Š.u.ÔO.=Ú.u. 0001A0
 88F44689 0A4688D8 8E0008B8 1E565700 000EC800 0CCAC95F 5E1FFFAC E9FF47E9 ÔG.Ô^..^_Èò..à...WV.¡...Á.F..F¶. 0001C0
 03750000 3DF24689 00000139 9A5016FC 4680F476 FF0E76FF 1076FF00 92E9F446 F¶Ô...v..v..v¶.F=.P.9....F·=..u. 0001E0
```

```
Dump of file SATURN:[PCCOMMON.DUMP.DLL]ANFORM.TMP;1 on 18-APR-1990 10:36:51.25
File ID (512,24,0)   End of file block 29 / Allocated 32

Virtual block number 3 (00000003), 512 (0200) bytes

 494A424F 0A435345 4454494E 494A424F 08435345 44455441 4450554A 42''0D4F O.OBJUPDATEDESC.OBJINITDESC.OBJI 000000
 45524A42 4F094E59 534C4544 4A424F09 4E595344 44414A42 4F094E59 5354'94E NITSYN.OBJADDSYN.OBJDELSYN.OBJRE 000020
 4C45444A 424F0944 574B4444 414A424F 0944574B 54494E49 4A424F0A 4E595350 PSYN.OBJINITKWD.OBJADDKWD.OBJDEL 000040
 4444414A 424F0A45 544F4E54 494E494A 424F0844 574B5045 524A424F 0944574B KWD.OBJREPKWD.OBJINITNOTE.OBJADD 000060
 5F124D41 53034554 4F4E5045 524A424F 0A45544F 4E4C4544 4A424F0A 45544F4E NOTE.OBJDELNOTE.OBJREPNOTE.SAM._ 000080
 45534854 454D5F0C 444F4854 454D0647 4E495254 53524F52 52455445 474D4153 SAMGETERRORSTRING.METHOD._METHSE 0000A0
 4E494544 4854454D 5F124554 4149544E 4154534E 49485445 4D5F1047 534D444E NDMSG._METHINSTANTIATE._METHDEIN 0000C0
 48594649 544F4E45 48414D54 554C4D44 1654554C 4D440545 54414954 4E415453 STANTIATE.DMLUT.DMLUTMAKENOTIFYH 0000E0
 47455254 554C4D44 12544553 52455453 49474552 54554C4D 44105245 4C444E41 ANDLER.DMLUTREGISTERSET.DMLUTREG 000100
 4D441859 4649544F 4E535345 434F5250 54554C4D 44124554 49525752 45545349 ISTERWRITE.DMLUTPROCESSNOTIFY.DM 000120
 55405246 41530845 54414C45 524E5545 54414C45 52524554 53494745 5254554C LUTREGISTERRELATEUNRELATE.SAFRMU 000140
 54494E49 4C54554D 52464153 10455441 47495641 4E4C5455 4D524641 53104C54 TL.SAFRMUTLNAVIGATE.SAFRMUTLINIT 000160
 4F1D0000 18890301 01454D41 4E455441 4450554C 54554052 46415312 454D414E NAME.SAFRMUTLUPDATENAME...¿....O 000180
 41190000 6D726F46 206C6564 6F4D2074 73796C61 6E412041 53204D50 20322F53 S/2 PM SA Analyst Model Form...A 0001A0
 00000000 00000001 50415254 53544F4F 424D524F 464C4544 4F4D5453 594C414E NALYSTMODELFORMBOOTSTRAP........ 0001C0
 468D0E76 FF1076FF FA46890C 4688E646 890A4688 D88EFFFF 881E5657 00001CC8 ȧ...WV.¡...Ą.F..Fİ.F..Fª.v..v..F 0001E0
```

```
Dump of file SATURN:(PCCOMMON.DUMP.DLL)ANFORM.TMP;1 on 18-APR-1990 10:36:51.25
File ID (512,24,0)   End of file block 29 / Allocated 32

Virtual block number 2 (00000002), 512 (0200) bytes

 114D4554 49444441 5453494C 4D46440E 4D464403 454D414E 454C4946 4C45444F ODELFILENAME.DFM.DFMLISTADDITEM. 000000
 4543414C 50455254 53494C4D 46441240 45544945 54454C45 44545349 4C4D4644 DFMLISTDELETEITEM.DFMLISTREPLACE 000020
 4C454946 59524555 514D4644 154D524F 46535345 434F5250 4D46440E 4D455449 ITEM.DFMPROCESSFORM.DFMQUERYFIEL 000040
 52455551 4D46440F 50414548 42485952 45555140 46440E41 54414452 45535544 DUSERDATA.DFMQUERYHBHEAP.DFMQUER 000060
 4E574859 52455551 4D46440F 4D544859 52455551 4D46440B 4A424F4C 4D444859 YHDMLOBJ.DFMQUERYHTM.DFMQUERYHWN 000080
 52455551 4D464410 53555441 54535446 49485359 52455551 4D464413 474C4444 DDLG.DFMQUERYSHIFTSTATUS.DFMQUER 0000A0
 45534D46 4400444C 45494652 45545349 4745524D 46441041 54414452 45535559 YUSERDATA.DFMREGISTERFIELD.DFMSE 0000C0
 43544553 4D46440F 4E46444E 414D4D4F 43544553 4D46440F 4E464553 4F4C4354 TCLOSEFN.DFMSETCOMMANDFN.DFMSETC 0000E0
 4E544553 4D464410 454C5449 544D524F 46544553 4D46440F 4E464C4F 52544E4F ONTROLFN.DFMSETFORMTITLE.DFMSETN 000100
 54544553 4D464410 4E465946 49544F4E 5445534D 46440E4E 46455441 47495641 AVIGATEFN.DFMSETNOTIFYFN.DFMSETT 000120
 434F5250 4D464419 41544144 52455355 5445534D 46440E4E 46534752 414C4F4F OOLARGSFN.DFMSETUSERDATA.DFMPROC 000140
 53494C53 5345434F 52504D46 44194C4F 52544E4F 43544944 45545349 4C535345 ESSLISTEDITCONTROL.DFMPROCESSLIS 000160
 454C4553 584F4254 53494C59 52455551 4D464417 444E414D 4D4F4354 49444554 TEDITCOMMAND.DFMQUERYLISTBOXSELE 000180
 4E411245 5241504D 4F43454D 414E5455 4C414E41 1154554C 414E4106 44455443 CTED.ANALUT.ANALUTNAMECOMPARE.AN 0001A0
 58554159 52455551 49544712 49544703 45544144 494C4156 454D414E 54554C41 ALUTNAMEVALIDATE.GTI.GTIQUERYAUX 0001C0
 464E4952 45535554 494E494D 524F4641 44124D52 4F464144 06525450 41544144 DATAPTR.DAFORM.DAFORMINITUSERINF 0001E0
```

```
Dump of file SATURN:[PCCOMMON.DUMP.DLL]ANFORM.TMP;1 on 18-APR-1990 10:36:51.25
File ID (512,24,0)   End of file block 29 / Allocated 32

Virtual block number 1 (00000001), 512 (0200) bytes

 00000000 00000040 00000000 00000088 0000FFFF 00000004 0000001A 00985A4D MZ..............¡.......ã....... 000000
 00000080 00000000 00000000 00000000 00000000 00000000 00000000 00000000 ................................ 000020
 6F6E6E61 63206D61 72676F72 70207369 685421CD 4C018821 CD09B400 0EBA1F0E ..¤..Ç.ë|¡.LeÌThis program canno 000040
 00000000 00000024 0A0D002E 65646F60 20534F44 206E6920 6E757220 65622074 t be run in DOS mode....$....... 000060
 000C0006 00000000 00030000 00000000 00048009 4D63FEE6 00070517 0505454E NE......|±cM.................... 000080
 00000000 00000000 00010001 00040000 0000059E 0096007E 00740070 0040003D =.ã.p.t.~....................... 0000A0
 00000F21 00CE031D 000F0F00 000F031B 00840F00 00840231 1A260F00 1A25005E ^.%...&.1.................ö.¦.Å. 0000C0
 00010000 004D524F 464E4106 00C80004 07171E81 0717032B 00020E21 00000000 ....!...+...Ý.....à..ANFORM..... 0000E0
 44156C6D 646D6669 06000443 0303039B 03840201 028A028E 00F60036 0024001E ..$.6.-...¤.!.....£.C...ifmdml.D 000100
 4D004D45 4D034E49 574D5005 45544145 52435245 54464153 5345434F 52504C4D MLPROCESSAFTERCREATE.PMWIN.MEM.M 000120
 4C4D440A 4E585454 52415453 4C4D440B 6C6D6403 4B434F4C 42434F4C 4C414D45 EMALLOCBLOCK.dml.DMLSTARTTXN.DML 000140
 4C454946 595245·5 514C4D44 00495447 59524555 514C4D44 084E5854 504F5453 STOPTXN.DMLQUERYGTI.DMLQUERYFIEL 000160
 4555514C 4D440C.. 4C525952 4555514C 4D440B44 4C454946 5445534C 4D440B44 D.DMLSETFIELD.DMLQUERYRLN.DMLQUE 000180
 4C4F524E 5854504F 54534C4D 44125453 494C4545 52464C4D 440B314E 4C525952 RYRLN1.DMLFREELIST.DMLSTOPTXNROL 0001A0
 51544345 4C45534C 4D441154 43454A42 4F544345 4C45534C 4D440F4B 4341424C LBACK.DMLSELECTOBJECT.DMLSELECTQ 0001C0
 4D595245 55514C4D 44154C4C 41544345 4C455345 444C4D44 0E4E4C52 59524555 UERYRLN.DMLDESELECTALL.DMLQUERYM 0001E0
```

```
Dump of file SATURN:[PCCOMMON.DUMP.DLL]ANALDESK.TMP;1 on 18-APR-1990 10:36:25.56
File ID (485,24,0)   End of file block 102 / Allocated 104

Virtual block number 1 (00000001), 512 (0200) bytes

 00000000 00000040 00000000 000000B8 0000FFFF 00000004 0000005A 01A45A4D MZÉ.Z...........|.......a....... 000000
 00000080 00000CJ0 00000000 00000000 00000000 00000000 00000000 00000000 ................................ 000020
 6F6E6E61 63206061 72676F72 70207369 685421CD 4C01B821 CD09B400 0EBA1F0E ..o..Ç.el|.LëlThis program canno 000040
 00000000 00000024 0A0D0D2E 65646F60 20534F44 206E6920 6E757220 65622074 t be run in DOS mode....$....... 000060
 000C0024 00000000 000D0000 00000000 00108009 0CC4083F 001405AA 0505454E NE..¯.._?ÁÁ.................$... 000080
 00000000 00000000 00010014 00040000 0000063E 020E01F6 01800160 0040002C ,.a.'.¯.-...>................... 0000A0
 1F540F00 1F5403D4 11C80F00 11C802AF 13780F00 1378015F 0E040F00 0E040067 g......._.x...x.£.à...à.á.T...T. 0000C0
 009C0F00 009C0665 01B00F00 01B00646 023E0F00 02300620 038E0F00 038E05E0 Å....... .=...>.F. ... .e....... 0000E0
 000A0F00 000A06C4 00920F00 00920688 02160F00 02160694 01DE0F00 01DE0672 r.B...B.........|.......á.Ö...Ö. 000100
 2DE00F21 2C4A0883 02020E21 00000000 1A440F00 1A440608 000F0F00 000F0606 ø........Ä.D...D.....|.....J,|.Å- 000120
 011B1EB1 011B089C 00ED1EB1 00ED0880 000A1EF1 000A08BC 04201EF1 042008AA J. .þ. .....þ.....Ü.Ÿ.Ü.....Ÿ... 000140
 000A1EB1 000A08CA 00751EB1 007508C2 00801EB1 008008BA 00C01EB1 00C008AE Ú.á.Ÿ.á.o...Ÿ...ó.u.Ÿ.u.ò.Ö.Ÿ.Ö. 000160
 00521EB1 005208FD 00A01EB1 00A008F3 00E31EB1 00E308E4 008E1EB1 008E08D8 Á./.Ÿ./.ô.D.Ÿ.D.µ...Ÿ...».R.Ÿ.R. 000180
 00700EB1 00700C31 01691EB1 01690C1A 00001EB1 00000C0C 00891EB1 00890C03 ....Ÿ.....ï.Ÿ.ï...ï.Ÿ.ï.1.p.Ÿ.p. 0001A0
 02881EB1 02880C7E 01501EB1 01500C68 01361EB1 01360C54 018E1EB1 018E0C38 8./.Ÿ./.T.6.Ÿ.6.h.].Ÿ.].-...Ÿ... 0001C0
 00060005 00050005 00040005 00030005 00020005 00010005 01900003 01900001 ................................ 0001E0

Dump of file SATURN:[PCCOMMON.DUMP.DLL]ANALDESK.TMP;1 on 18-APR-1,^^ 10:36:25.56
File ID (485,24,0)   End of file block 102 / Allocated 104

Virtual block number 2 (00000002), 512 (0200) bytes

 01900008 000F0005 000C0005 000B0005 000A0005 00090005 00080005 00070005 ................................ 000000
 4B534544 1100004B 53454441 44415308 03000004 02580004 04000004 01000004 ..........X......SADADESK...DESK 000020
 0003454C 49464F52 50544547 4B534544 0E00024D 5448454C 49464F52 50544547 GETPROFILEHTM...DESKGETPROFILE.. 000040
 0025001F 00190010 00010000 04434F52 50574F44 4E49574B 53454441 44415312 .SADADESKWINDOWPROC...........X. 000060
 44085249 44525543 51534F44 0A4F4953 0300037D 035E0342 02ED0255 01390061 a.9.U.Ú.B.^.)...SIO.DOSQCURDIR.D 000080
 54414552 434D454D 004D454D 03495047 4D50054E 49574D50 05534C4C 4143534F OSCALLS.PMWIN.PMGPI.MEM.MEMCREAT 0000A0
 4F4C4243 4F4C4C41 4D454D00 50414548 594F5254 5345444D 454D0E50 41454845 EHEAP.MEMDESTROYHEAP.MEMALLOCBLO 0000C0
 4F544554 41455243 4954475F 0E495447 034B434F 4C424545 52464D45 4D0C4B43 CK.MEMFREEBLOCK.GTI._GTICREATETO 0000E0
 54470A43 4F52504C 4F4F5446 45444954 470E4C4F 4F544C4C 49484954 470B4C4F OL.GTIKILLTOOL.GTIDEFTOOLPROC.GT 000100
 4C4F4F54 59524555 51495447 1247534D 444E4553 4954470A 47534D54 534F5049 IPOSTMSG.GTISENDMSG.GTIQUERYTOOL 000120
 59524555 51495447 12574F44 4E49574C 4F4F5454 45534954 4710574F 444E4957 WINDOW.GTISETTOOLWINDOW.GTIQUERY 000140
 54471052 54504154 41445855 41595245 55514954 47124C4F 4F54574F 444E4957 WINDOWTOOL.GTIQUERYAUXDATAPTR.GT 000160
 4C494249 5349564C 4F4F5454 45534954 47145254 50415441 44585541 54455349 ISETAUXDATAPTR.GTISETTOOLVISIBIL 000180
 4C4F4F54 59524555 51495447 13535543 4F464C4F 4F545445 53495447 0F595449 ITY.GTISETTOOLFOCUS.GTIQUERYTOOL 0001A0
 4C45444F 4D4C4D44 0E524944 4C45444F 4D4C4D44 086C6D64 03504F54 4B534544 DESKTOP.dml.DMLMODELDIR.DMLMODEL 0001C0
 004C4544 4F4D5745 4E4C4D44 084C4544 4F4D4E45 504F4C4D 440C454D 414E4552 RENAME.DMLOPENMODEL.DMLNEWMODEL. 0001E0

Dump of file SATURN:[PCCOMMON.DUMP.DLL]ANALDESK.TMP;1 on 18-APR-1990 10:36:25.56
File ID (485,24,0)   End of file block 102 / Allocated 104

Virtual block number 3 (00000003), 512 (0200) bytes

 08534145 5641534C 4D440945 5641534C 4D44074D 54484552 49555143 414C4D44 DMLACQUIREHTM.DMLSAVE.DMLSAVEAS. 000000
 4F4D4545 52464C4D 440C4E58 54504F54 534C4D44 0A4E5854 54524154 534C4D44 DMLSTARTTXN.DMLSTOPTXN.DMLFREEMO 000020
 59524555 514C4D44 12454C44 4E414B4C 45444F4D 59524555 514C4D44 134C4544 DEL.DMLQUERYMODELHANDLE.DMLQUERY 000040
 4C4D4400 454D414E 4C45444F 4D595245 55514C4D 4411454D 414E4E47 49534544 DESIGNNAME.DMLQUERYMODELNAME.DML 000060
 55514C4D 44114F44 45524C4D 44074F44 4E554C4D 4407444C 45494659 52455551 QUERYFIELD.DMLUNDO.DMLREDO.DMLQU 000080
 45544C49 46455649 54434159 52455551 4C4D4414 4D544859 4649544F 4E595245 ERYNOTIFYHTM.DMLQUERYACTIVEFILTE 0000A0
 4E4E4947 4F4C5952 4555514C 4D441145 4C494647 4F4C5952 4555514C 4D440F52 R.DMLQUERYLOGFILE.DMLQUERYLOGINN 0000C0
 52474142 4C545513 524F5352 55435449 4E494741 424C5455 10545544 03454D41 AME.DUT.UTLBAGINITCURSOR.UTLBAGR 0000E0
 524F5352 55434554 41524554 49474142 4C545513 524F5352 55434553 41454C45 ELEASECURSOR.UTLBAGITERATECURSOR 000100
 52514553 4C54550E 454B414D 4E555145 534C5455 0C454B41 4D514553 4C54550A .UTLSEQMAKE.UTLSEQUNMAKE.UTLSEQR 000120
 48535550 5145534C 54550C4C 45545352 49465145 534C5455 004C4545 564F4D45 EMOVEEL.UTLSEQFIRSTEL.UTLSEQPUSH 000140
 0F4C5455 03455441 4552435A 53505455 440C5954 504D4551 45534C54 55084C45 EL.UTLSEQEMPTY.DUTPSZCREATE.UTL. 000160
 550E4547 41535345 4D544547 4C54555F 0E574F44 4E495752 45544E45 434C5455 UTLCENTERWINDOW._UTLGETMESSAGE.U 000180
 4C545513 474C4445 4C494645 5641534C 54550E47 4C44454C 49464B43 49504C54 TLPICKFILEDLG.UTLSAVEFILEDLG.UTL 0001A0
 41455243 53434809 54494E49 53434807 544F4F52 4E414D48 43414259 52455551 QUERYBACHMANROOT.HCSINIT.HCSCREA 0001C0
 5443454A 424F444E 464A424F 17444E46 4A424F06 4554454C 45445343 48094554 TE.HCSDELETE.OBJFND.OBJFNDOBJECT 0001E0
```

Dump of file SATURN:[PCCOMMON.DUMP.DLL]ANALDESK.TMP;1 on 18-APR-1990 10:36:25.56
File ID (485,24,0)   End of file block 102 / Allocated 104

Virtual block number 4 (00000004), 512 (0200) bytes

4F425455 4F424159 414C5053 49440F54 554F4241 05484341 485F5245 444E4946 FINDER_HACK.ABOUT.DISPLAYABOUTBO 000000
4F150000 0CF00301 0'000003 01170306 02087003 01014554 49525753 4F440858 X.DOSWRITE...p............Þ....0 000020
54485345 44414441 53100000 706F7468 73654420 41442F41 53204D50 20322F53 S/2 PM SA/DA Desktop...SADADESKT 000040
0042681E D88EFFFF 881E5657 0002AEC8 00000000 00000000 01434F52 504C4F4F OOLPROC.........âÛ..WV.j...Ä.hB. 000060
80646A00 84680200 36FF262B 60068E00 6A006A08 C483FFFF 00569A50 16D4680 .F8.P.V....á.j.j...'+&.6..hÇ.jd. 000080
0000FF5A 86C7D03F FF5886C7 0000F046 C70813EE 46C70000 FFFF9A50 16FF/686 .v..P.....úFŸ..úFÞ..ú.X.?Âú.Z... 0000A0
76FF016A 006A0000 FFFF9A00 6A006A00 6AFFFF68 FFFF6850 16DE468D 006A006A j.j..F8.Ph..h..j.j.j......j.j..v 0000C0
36FF262B 60068E00 6A006A50 16FF7686 8D5016DE 46805016 FF58868D EE76FFF0 Þ.vŸ..X..P.F8.P..v..Pj.j...'+&.6 0000E0
18E90374 DC4608DA 46880C56 89DA4689 0000FFFF 9A5016FF 5C868001 90680200 ..h....\..P......FÖ.VÉ.FÖ.FÉt.Õ. 000100
16FF6486 80026A07 16E9FF68 868BFF6A 9689FF68 86890000 FFFF9A00 6A006A00 .j.j........h...j...h.Õ..j...d.. 000120
6AFF64B6 FF06F4E9 FD52868B 0007E903 7500FD52 8E83FD52 86890000 FFFF9A50 P.......R».ƒR».u.Õ....R»Õ¶..Ñd.j 000140
9AFF64B6 FF0010E9 037500FD 528E83FD 52868900 0001779A 5016F446 80306A23 #jO.F¶.P.w.....R».ƒR».u.Õ...Ñd.. 000160
C4024789 260A468B F45EC407 8926FF64 868BF45E C406C4E9 FD52868B 0000018E ......R»Õá.á^¶..d.&..á^¶.F.&.G.á 000180
50520004 05F6568B F44688FF 6486FF00 001047C7 26F45EC4 00010847 C726F45E ^¶&úG...á^¶&úG....Ñd..F¶.V-...RP 0001A0
6A236AFF 64B6FF00 00FFFF9A 5052000A 05F6568B F4468800 6A006A00 00FFFF9A .....j.j..F¶.V-...RP......Ñd.j#j 0001C0
01BA9AFF 64B6FF00 10E90375 00FD528E 83FD5286 890000FF FF9A5016 F8468006 ..F½.P.......R».ƒR».u.Õ...Ñd..¤. 0001E0

Dump of file SATURN:[PCCOMMON.DUMP.DLL]ANALDESK.TMP;1 on 18-APR-1990 10:36:25.56
File ID (485,24,0)   End of file block 102 / Allocated 104

Virtual block number 5 (00000005), 512 (0200) bytes

00FD528E 83FD5286 890000FF FF9A0101 685016FE 56868006 46E9FD52 86880000 ....R»ÕF...V±.Ph.........R».ƒR». 000000
01EC00B6 9A5016FE 56868006 1AE9FD52 86880000 02149AFF 64B6FF00 10E90375 u.Õ...Ñd.........R»Õ....V±.P.Ñ.$. 000020
C483022E 00109A50 16FD5486 80004D68 1E0012E9 03755CFD 538A80F0 8804C483 .á..Þ.¤S»\u.Õ...hM...T».P......á 000040
FF0010E9 037500FD 528E83FD 52868900 00FFFF9A 5016FF6C 868D00FF 6C86C608 .ó.l.....l..P.......R».ƒR».u.Õ... 000060
02400056 9A5016FD 54868D50 16FE5686 8D05C0E9 FD52868B 0000FFFF 9AFF64B6 Ñd.........R»Õä...V±.P..T».P.V.â. 000080
16FD5486 8D5016FF 6C868D08 C4830254 00109A50 16FD5486 80004F68 1E08C483 .á..hO...T».P...T..á...l..P..T». 0000A0
16FD5486 8D08C483 02960010 9A5016FD 54868000 58681E08 C4830266 00109A50 P...f..á..hX...T».P.......á...T». 0000C0
54868D50 16FE5686 800026E9 03750000 300000FF FF9A006A 006A5016 F2468D50 P.F·.Pj.j......=..u.Õ&...V±.P..T 0000E0
FF096A08 C4830018 00109A50 16FD5486 8D005D68 1E08C483 02A80056 9A5016FD ».P.V.´..á..h]...T».P......á.j.. 000100
24E90375 00FD528E 83FD5286 890000FF FF9A5016 FF60868D 5016FD54 86800A76 v...T».P..'..P.......R».ƒR».u.Õ$ 000120
206A006A 0071681E 0077681E 016A006A 016A006A FF608689 FF628689 0000B800 .l....b...'.j.j.j.j..hw..hq.j.j 000140
04578926 02478926 FF62968B FF60868B F85EC400 0907C726 F85EC400 00FFFF9A ......á^½&ú...á^½..'...b.&.G.&.W. 000160
1477FF26 1677FF26 F45EC41F A5A5A5DA 8E1EF08B 127F8DFA 568BF846 8BF45EC4 á^¶.F½.V°....Þ..ÓÉÉÉ.á^¶&.w.&.w. 000180
FD528689 0000044A 9A5016F8 4680066A 236AFF64 B6FF0000 FFFF9A50 16FC468D .F=.P......Ñd.j#j..F½.P.J.....R» 0001A0
77FF26F4 5EC40475 E9FD5286 88000004 619AFF64 B6FF0010 E9037500 FD528E83 .ƒR».u.Õ...Ñd..a......R»Õu.á^¶&.w 0001C0
46805016 FD54868D 00000486 9A5016FD 54868005 6AFC76FF FE76FF14 77FF2616 .&.w..v±.v=j...T».P.......T».P.F 0001E0

Dump of file SATURN:[PCCOMMON.DUMP.DLL]ANALDESK.TMP;1 on 18-APR-1990 10:36:25.56
File ID (485,24,0)   End of file block 102 / Allocated 104

Virtual block number 6 (00000006), 512 (0200) bytes

04809A01 01685016 FD54868D 0020E903 7500003D 0000049A 9A006A00 6A5016F2 ·.Pj.j......=..u.Õ ...T».Ph...¯. 000000
8D5016FD 54868D0A 76FF0A6A 08C48304 C100109A 5016FD54 86800098 681E0000 ...h....T».P...ë..á.j..v...T».P. 000020
89FF6286 89000088 0024E903 7500FD52 8E83FD52 86890000 04089A50 16FF6086 .'..P.Ä.....R».ƒR».u.Õ$.j....b.. 000040
26F85EC4 0000050A 9A206A00 6A00AC68 1E008268 1E016A00 6A016A00 6AFF6086 .'.j.j.j.j..hý..h¯.j.j .....á^½& 000060
FA5688F8 4688F45E C4045789 26024789 26FF6296 88FF6086 88F85EC4 000A07C7 ú...á^½..'...b.&.G.&.W.á^¶.F½.V° 000080
86890000 054C9A50 16F8468D 066A236A FF64B6FF 1FA5A5A5 DA8E1EF0 88187F8D ....Þ..ÓÉÉÉ..Ñd.j#j..F½.P.L..... 0000A0
26F45EC4 0373E9FD 52868800 0005639A FF64B6FF 0010E903 7500FD52 8E83FD52 R».ƒR».u.Õ...Ñd..c.....R»Õs.á^¶& 0000C0
5016FD54 86800000 05889A50 16FD5486 8D046AFC 76FFFE76 FF1477FF 261677FF .w.&.w..v±.v=j...T».P.......T».P 0000E0
9A010168 5016FD54 86800020 E9037500 003D0000 059C9A00 6A006A50 16F24680 .F·.Pj.j......=..u.Õ ...T».Ph... 000100
16FD5486 8D0A76FF 0B6A08C4 8305C300 109A5016 FD54868D 0006681E 000005B2 ý....h®...T».P...û..á.j..v...T». 000120
62868900 00880024 E9037500 FD528E83 FD528689 000005DA 9A5016FF 60868D50 P..'..P.Ö.....R».ƒR».u.Õ$.j....b 000140
5EC40000 060C9A20 6A006A00 EA681E00 F0681E01 6A006A01 6A006AFF 608689FF ...'.j.j.j.j..hÞ..hõ.j.j .....á^ 000160
8BF8468B F45EC404 57892602 478926FF 62968BFF 60868BF8 5EC4000B 07C726F8 ½&ú...á^½..'...b.&.G.&.W.á^¶.F½. 000180
0000064E 9A5016 ð 4680066A 236AFF64 B6FF1FA5 A5A5DA8E 1EF08824 7F8DFA56 V°..$.Þ..ÓÉÉÉ..Ñd.j#j..F½.P.N... 0001A0
5EC40271 E9FD52ᴗ 88000006 659AFF64 B6FF0010 E9037500 FD528E83 FD528689 ..R».ƒR».u.Õ...Ñd..e.....R»Õq.á^ 0001C0
FD54868D 0000068A 9A5016FD 54868003 6AFC76FF FE76FF14 77FF2616 77FF26F4 ¶&.w.&.w..v±.v=j...T».P.......T» 0001E0

Dump of file SATURN:[PCCOMMON.DUMP.DLL]ANALDESK.TMP;1 on 18-APR-1990 10:36:25.56
File ID (485,24,0)   End of file block 102 / Allocated 104

Virtual block number 7 (00000007), 512 (0200) bytes

```
01685016 FD5486A0 0020E903 75000030 0000069E 9A006A00 6A5016F2 46805016 .P.F·.Pj.j......=..u.Õ ...T».Ph. 000000
5486800A 76FF0C6A 08C48301 CE00109A 5016FD54 8680011A 681E0000 01A39A01 ..È....h....T».P...ö..á.j..v...T 000020
89000088 0024E903 7500FD52 BE83FD52 86890000 028F9A50 16FF6086 805016FD ».P..'..P.¢.....R».ƒR».u.Õ$.¡... 000040
000002F1 9A206A00 6A012E68 1E013468 1E016A00 6A016A00 6AFF6086 89FF6286 .b...'.j.j.j.j..h4..h..j.j .þ... 000060
4688F45E C4045789 26024789 26FF6296 88FF6086 88F85EC4 000C07C7 26F85EC4 á^¾&ú...á^¾..'...b.&.G.&.W.á^¶.F 000080
00F99A50 16F8468D 066A236A FF64B6FF 1FA5A5A5 DA8E1EF0 881E7F80 FA5688F8 ¾.V¹....Þ..ÕEEE..Ñd.j#j..F¾.P.¹. 0000A0
016FE9FD 52868800 0001109A FF64B6FF 0010E903 7500FD52 BE83FD52 86890000 ....R».ƒR».u.Õ...Ñd........R»Õo. 0000C0
868D0000 FFFF9A50 16FD5486 8D026AFC 76FFFE76 FF1477FF 261677FF 26F45EC4 á^¶&.w.&.w..v±.v»j...T».P....... 0000E0
5016FD54 868D0020 E9037500 003D0000 027B9A00 6A006A50 16F2468D 5016FD54 T».P.F·.Pj.j..(...=..u.Õ ...T».P 000100
8D0A76FF 006A08C4 83038F00 109A5016 FD548680 015B681E 000003AE 9A010168 h...Ù....h[...T».P...¢..á.j..v.. 000120
0088000B E9037500 FD528E83 FD528689 00000306 9A5016FF 60868050 16FD5486 .T».P..'..P.ø.....R».ƒR».u.Õ..¡. 000140
02478926 FF62968B FF60868B F85EC400 0007C726 F85EC4FF 608689FF 62868900 ...b...'.á^¾&ú...á^¾..'...b.&.G. 000160
FFDC76FF 0A76FF1F A5A5A5DA 8E1EF088 2A7F80FA 5688F846 88F45EC4 04578926 &.W.á^¶.F¾.V¹..*.Þ..ÕEEE..v..vÉ. 000180
FF0A76FF 0093E9FD 52868800 07E90375 00FD528E 83FD5286 890000FF FF9ADA76 vÕ.......R».ƒR».u.Õ....R»Õ...v.. 0001A0
FF0070E9 FD52868B 0007E903 7500FD52 BE83FD52 86890000 FFFF9AF4 76FFF676 v-.v¶.......R».ƒR».u.Õ....R»Õp.. 0001C0
C483079F 038E9ADA 76FFDC76 FF01E768 016AFD52 868902C4 83078C00 009A0A76 v.......á...R»j.hÕ..vÉ.vÕ......á 0001E0
```

Dump of file SATURN:[PCCOMMON.DUMP.DLL]ANALDESK.TMP;1 on 18-APR-1990 10:36:25.56
File ID (485,24,0)   End of file block 102 / Allocated 104

Virtual block number 8 (00000008), 512 (0200) bytes

```
9ADA76FF 0C76FF02 2A68016A 08C48307 82038E9A DA76FFDC 76FF01F9 68016A08 .j.h¹..vÉ.vÕ...ý..á.j.h*..vÉ.vÕ. 000000
DA76FFDC 76FF08C4 83FFFFD3 8E9ADA76 FFDC76FF 022C6801 6A08C483 07C5038E ..é..á.j.h,..vÉ.vÕ......á..vÉ.vÕ 000020
0008B81E 56570000 0AC80006 CAC95F5E 1F0000E9 FD52868B 04C483FF FF00779A .w....á...R»Õ...^_èÒ..à...WV.¡.. 000040
E9F6468B 0006E903 7500F67E 83F64689 04C483FF FF03159A 0676FF02 3068D88E .Áh0..v.......á..F-.--.u.Õ...F-Õ 000060
26FC5EC4 0000FFFF 9A5016F8 468D0676 FF0000FF FF9A5016 FC468006 76FF0059 Y..v..F•.P......v..F¾.P.....á^•& 000080
00011047 C726FC5E C4000003 5F9A37FF 26FC5EC4 0000FFFF 9A0A77FF 260C77FF .w.&.w......á^•&.7._....á^•&úG... 0000A0
C8C95F5E 1F0000E· 00008800 00FFFF9A 006A006A 006A006A 2A6AF876 FFFA76FF .v¹.v¾j*j.j.j.j......¡..Õ...^_èù 0000C0
005A0000 9A0A76FF 0C76FF10 76FF0434 E90E468B D88E07EE 881E5657 00001EC8 à...WV.¡Ÿ..Ä.F.Õ4..v..v..v....Z. 0000E0
57882604 47882 6FC 5EC40000 08189A50 16FC468D 1076FF04 50E9E846 88E84689 .FÕ.FÕÞP..v..F•.P.....á^•&.G.&.W 000100
EE468DF2 76FFF476 FF0000FF FF9AF276 FFF476FF 0000E646 C7F45689 F2468906 ..F·.V¶úFÌ...v¶.v·......v¶.v·.FŸ 000120
F476FF00 13E90374 0739260A 4688EE5E C40024E9 03740000 300000FF FF9A5016 .P.....=..t.Õ$.á^Ÿ.F.&9.t.Õ...v¶ 000140
E9000088 0006E903 7400E67E 83FFC4E9 0003E900 01E646C7 0000FFFF 9AF276FF .v·.....úFÌ..Õ..Õá..-Ì.t.Õ..¡..Õ 000160
8826EE5E C40000FF FF9A5016 F6468D01 6A006AEE 76FFF076 FF5016F2 468003D7 ■..F·.P.vÞ.vŸj.j..F-.P.....á^Ÿ&. 000180
027F8326 EE5EC400 0DE90375 0080027F 8126EE5E C40047E9 03750647 08260447 G.&.G.u.ÕG.á^Ÿ&.....u.Õ..á^Ÿ&... 0001A0
26FC5EC4 0000FFFF 9A00B6B7 FF260088 B7FF2604 5FC426EE 5EC4002C E9037425 Xt.Õ,.á^Ÿ&á_.&.ñ¡.&.ñÑ......á^•& 0001C0
FF9AEE76 FFF076FF 37FF26FC 5EC40000 098F9A04 77FF2606 77FF26EE 5EC437FF .7á^Ÿ&.w.&.w......á^•&.7.vÞ.vŸ.. 0001E0
```

Dump of file SATURN:[PCCOMMON.DUMP.DLL]ANALDESK.TMP;1 on 18-APR-1990 10:36:25.56
File ID (485,24,0)   End of file block 102 / Allocated 104

Virtual block number 9 (00000009), 512 (0200) bytes

```
9A5016EA 46800A76 FF0C76FF 0345E900 008802C4 83084D00 009A1076 FF0000FF ....v....M..á.¡..ÕE..v..v..Fõ.P. 000000
689A5016 FC468D10 76FF0323 E9E8468B 0006E903 7500E87E 83E84689 0000FFFF .....FÕ.-Õ.u.Õ...FÕÕ#..v..F=.P.h 000020
46800477 FF260677 ▸F26FC5E C400000A D59A0477 FF260677 FF26FC5E C400000A ...á^=&.w.&.w..f...á^•&.w.&.w..F 000040
5689E246 89065788 26044788 26EE5EC4 0059E903 7400030D 00000AE5 9A5016EE Ÿ.P.Ì...=..t.ÕY.á^Ÿ&.G.&.W..Fã.V 000060
260027E9 03740086 873926EC 5688EA46 88E25EC4 003AE903 75E4460B E24688E4 Õ.Fã.FÕu.Õ:.á^ã.Fõ.V±&9.Ñ.t.Õ'.& 000080
069A0477 FF260677 FF26FC5E C4000100 B487C726 E25EC400 1DE90374 00889739 9.¡.t.Õ..á^ã&ú.Ç...á^•&.w.&.w... 0000A0
00067E83 00000A88 9A5016FC 468D1076 FF028AE9 000088FF 8AE90003 E9000008 ...Õ..Õ..¡..Õ...v..F•.P......-.. 0000C0
C400000B 619A5016 FC468010 76FF0000 E9037400 107F8326 FC5EC400 0DE90375 u.Õï.á^=&....t.ÕÄ..v..F•.P.a...á 0000E0
000008A2 9A5016EE 4680F276 FFF476FF F45689F2 46890657 88260447 8826FC5E ^•&.G.&.W..F·.V¶.v¶.v·.FŸ.P.Å... 000100
76FF0000 E646C700 89E90375 0739260A 4688EE5E C40097E9 0375F046 08EE468B .FŸ.FÞu.Õ..á^Ÿ.F.&9.u.Õ..úFÌ...v 000120
24E90374 00003D00 0008D39A 5016EE46 8DF276FF F476FF00 0008C39A F276FFF4 ¶.v·.ù....v¶.v·.FŸ.P.£...=..t.Õ$ 000140
E90001E6 46C70000 08F49AF2 76FFF476 FF0013E9 03740739 260A468B EE5EC400 .á^Ÿ.F.&9.t.Õ...v¶.v·.¶...úFÌ..Õ 000160
F6468D01 6A006AEE 76FFF076 FF5016F2 46800034 E9037500 E67E83FF C4E90003 ..Õá..-Ì.u.Õ4..F·.P.vÞ.vŸj.j..F- 000180
83088900 009A1076 FF0000FF FF9AEE76 FFF076FF 5016F246 80000009 279A5016 .P.'....F·.P.vÞ.vŸ......v....... 0001A0
0477FF26 0677FF26 FC5EC400 0008A29A 5016FC46 801076FF 0191E900 008802C4 á.¡..Õ...v..F•.P.Å...á^•&.w.&.w. 0001C0
90E902C4 83080400 009A1076 FF000EE9 037500FA 7E830000 FFFF9A50 16FA4680 .F¹.P......-¹.u.Õ...v....à..á.Õ. 0001E0
```

Dump of file SATURN:[PCCOMMON.DUMP.DLL]ANALDESK.TMP;1 on 18-APR-1990 10:36:25.56
File ID (485,24,0)   End of file block 102 / Allocated 104

Virtual block number 10 (0000000A), 512 (0200) bytes

```
 26EE5EC4 003FE90A 46880000 FFFF9A50 16EE468D 0477FF26 0677FF26 FC5EC400 .á^•&.w.&.w..FŸ.P......F.Ö7.á^Ÿ& 000000
 76FF0A47 89260A46 8BEE5EC4 0015E903 750A4739 260A4688 EE5EC400 010847C7 úG...á^Ÿ.F.&9G.u.Õ..á^Ÿ.F.&.G..v 000020
 03760069 3000'6E9 0039E900 000847C7 26EE5EC4 0045E902 C4830775 00009A10 ....u..á.ÕE.á^Ÿ&úG...Õ9.Õ6.=i.v. 000040
 8130FF9E E9037500 6C30FFD6 E9FFA9E9 03750032 30FF81E9 03720068 300013E9 Õ..=h.r.ÕŸ.=2.u.Õ`.Õø.=l.u.Õ..=. 000060
 1076FF00 66E90375 00067E83 00C5E9FF 8BE9FF8E E9037700 8230FFC6 E9037300 .s.Õ6.=..w.Õ..ÕE.Õé..-..u.Õf..v. 000080
 8300000B 769A5016 FA468D04 77FF2606 77FF26FC 5EC40000 09CF9A50 16FC468D .F•.P.ü...á^•&.w.&.w..F•.P.v.... 0000A0
 EE5EC400 000AAC9A 5016EE46 8D0477FF 260677FF 26FC5EC4 002DE903 7400FA7E -•.t.Õ-.á^•&.w.&.w..FŸ.P.¯...á^Ÿ 0000C0
 07FB0315 9A1076FF 0A76FF00 00FFFF9A 006A006A 0A76FF0C 76FF0E76 FF37FF26 &.7.v..v..v.j.j.......v..v.....«. 0000E0
 0000FFFF 9A0676FF 0876FF0A 76FF0C76 FF0E76FF 1076FF00 50E90000 8804C483 .á.¡..ÕP..v..v..v..v..v..v...... 000100
 AE3DFCD6 E9037510 CC3DFBD3 E9037510 053DFBC4 E9037510 033D0033 E90036E9 Õ6.Õ3.=..u.Õá«=..u.Õ&«=ä.u.Õø•=Û 000120
 000CCAC9 5F5E1FFF B0E9FE72 E903751D B33DFF46 E903751D AF3DFD89 E903751D .u.Õ.»=£.u.ÕF.=•.u.Õr±Õ¯..^_èÒ.. 000140
 00329A50 16FE468D 1076FF12 76FF00CE E90E4688 D88E0878 B81E5657 000016C8 à...WV.¡x..Á.F.Õò..v..v..F±¯P.2. 000160
 16FE468D 1076FF12 76FF0006 E900008A 00008802 C483088E 07E69AFE 76FF0000 ...v±.l....á.¡..¤..Õø..v..v..F±. 000180
 008A0000 B80000FF FF9A016A 006A0A76 FF0C76FF 1DAF68FE 76FF0000 FFFF9A50 P......v±h£..v..v.j.j......¡..¤. 0001A0
 76FF008E E90000BA 00008806 C4830999 045A9A10 76FF1276 FF0A76FF 00ABE900 .Õ´..v..v..v..Z....á.¡..¤..Õ...v 0001C0
 468DEA76 FFEC76FF EC5689EA 46890000 FFFF9A50 16EE468D 006A006A 1076FF12 ..v.j.j..FŸ.P......Fõ.Vš.vš.võ.F 0001E0
```

Dump of file SATURN:[PCCOMMON.DUMP.DLL]ANALDESK.TMP;1 on 18-APR-1990 10:36:25.56
File ID (485,24,0)   End of file block 102 / Allocated 104

Virtual block number 11 (0000000B), 512 (0200) bytes

```
 004CE900 008A0000 B80000FF FF9AEA76 FFEC76FF 0000FFFF 9AEC6AFF 6A5016EE Ÿ.Pj.jš......vš.võ.....¡..¤..ÕL. 000000
 0023E900 2FE90000 FFFF9A06 76FF0876 FF0A76FF 0C76FF0E 76FF1076 FF1276FF .v..v..v..v..v..v..v......Õ/.Õ#. 000020
 FF64E903 75003330 FF1AE903 75002930 FF8EE903 7500233D FF4EE903 7500203D • .u.ÕN.=#.u.Õ..=).u.Õ..=3.u.Õd. 000040
 02030000 00010D18 0002002F 90000ECA C95F5E1F 0000E900 008A0000 8BFF8DE9 Õ§.¡..¤..Õ...^_èÒ.../........... 000060
 02030000 00030D60 000200F3 00030086 01030000 00020C8E 000202C7 00080B43 C...ú..........¯Ñ...µ...'....... 000080
 020302D4 00080C4B 02030CF0 00010050 00050158 0007060C 0203000C 00060C36 6...É...É...X...)...Þ...K...Å... 0000A0
 010300EF 00060756 02030003 00030066 0103034A 000A0165 02030259 0008090F Õ...Y...e...J...f.......V...ÿ... 0000C0
 020301EE 00070384 02030354 000A0838 0203008C 0003009C 01030088 00030408 ................8...T.......Ÿ... 0000E0
 0002009D 00030036 01030080 00060CAC 02030000 000C07D3 0002026A 00080A4F O...j...£.......¯.......6....... 000100
 02030000 00100CF8 0002008F 00060047 0203027E 000809F4 02030000 000E06C5 é.......¶...-...G.......½....... 000120
 0203002E 000300A. 0103002D 0003007E 010300AD 00030098 0103020C 00070980 ¯...........Ù...-...-...È....... 000140
 02030292 00080151 02030029 00050002 020300B2 000300C6 0103009A 00060C81 ........6...ý...•...)...Q....... 000160
 02030037 00050843 02030045 00030861 0103004B 00020398 010300A5 00060828 (...È.......K...a...E...C...7... 000180
 020301B5 00070336 020302AA 00080833 02030088 00060733 020301A8 00070968 h...´...3...¡...3...`...6...ç... 0001A0
 020300C9 0006000E 02030289 00080C69 0203032E 00090684 02030046 00050348 H...F...Ç.......i...¿.......è... 0001C0
 8D0676FF D88EFFFF B81E5657 000068C8 00000054 0005097E 02030243 000701FD »...C...-...T...àh..WV.¡...Á.v.. 0001E0
```

Dump of file SATURN:[PCCOMMON.DUMP.DLL]ANALDESK.TMP;1 on 18-APR-1990 10:36:25.56
File ID (485,24,0)   End of file block 102 / Allocated 104

Virtual block number 12 (0000000C), 512 (0200) bytes

```
 50169C46 8D646A08 76FF0200 36FF262B 62068E00 6A006A00 00FFFF9A 50169846 F..P.....j.j...b+&.6...v.jd.F..P 000000
 FF9A206A 006A5016 9C468D01 70681E98 76FF9A76 FF9876FF 9A76FF00 00FFFF9A ......v..v..v..v..hp..F..Pj.j .. 000020
 0000159A 50169846 8D0676FF D88E0008 B81E5657 0000CCC8 C8C95F5E 1F0000FF ....^_èùàä..WV.¡...Á.v..F..P.... 000040
 006A0000 00A69A50 16FF3486 8D646A08 76FF0200 36FF262B 62068E00 6A006A00 .j.j.¯.b+&.6...v.jd..4..P.l...j. 000060
 9876FF9A 76FF0000 00319A50 169C468D 646A0A76 FF020036 FF262B62 068E006A j...b+&.6...v.jd.F..P.1....v..v. 000080
 C8C8C95F 5E1F0000 004F9A20 6A006A50 16FF3486 8D50169C 46809876 FF9A76FF .v..v..F..P..4..Pj.j .O....^_èùà 0000A0
 AA9A5052 000002A3 9A006A03 6A016A00 6A016A00 6AD88E00 60881E56 57000024 $..WV.¡'..Äj.j.j.j.j.j..È...ÑP.¯ 0000C0
 0C56880A 46880E76 FF1076FF 1276FF14 76FF0030 E903750C 46080A46 88000002 ....F..F.u.Õ0..v..v..v..v..F..V. 0000E0
 76FF0022 E90C4689 14C48300 0001469A 0676FF08 76FF5016 FA468D50 52009105 ...RP.F•.P.v..v..F....á..FÉÕ"..v 000100
 0C468910 C4830000 FFFF9A06 76FF0876 FF5016FA 468D0E76 FF1076FF 1276FF14 ..v..v..v..F•.P.v..v.......á..FÊ 000120
 47892600 0088165E C404C483 FFFF0000 9A0676FF 00896800 21E90375 000C7E83 .-É.u.Õl.h¿..v.......á.á^.¡..&.G 000140
 6A236A37 FF26FC5E C40000FF FF9A5016 FC468D06 76FF014D E90C4688 07892602 .&...FÉÕM..v..F•.P.....á^•&.7j#j 000160
 5EC40247 89260846 8BE65EC4 078926FA 4688E65E C40000FF FF9A5016 E646800C ..Fl.P.....á^l.F•&..á^l.F.&.G.á^ 000180
 000A47C7 26E65EC4 00000847 C726E65E C4065789 26044789 260C5688 0A4688E6 l.F..V.&.G.&.W.á^l&úG...á^l&úG.. 0001A0
 E85688E6 4688165E C40000FF FF9AE676 FFE876FF 50520004 05FE5688 FC468800 ..F•.V±...RP.vÒ.vl.....á^..Fl.VÒ 0001C0
 0086E903 74000C7E 830C4689 00000238 9A5016E2 4680FA76 FF025789 26078926 &..&.W..v•.Fã.P.8....FÉ.-É.t.Õ.. 0001E0
```

Dump of file SATURN:[PCCOMMON.DUMP.DLL]ANALDESK.TMP;1 on 18-APR-1990 10:36:25.56
File ID (485,24,0)   End of file block 102 / Allocated 104

Virtual block number 13 (0000000D), 512 (0200) bytes

```
FF0055E9 0000FFrF 9AE276FF E476FF00 58E90846 88007BE9 0375E446 08E2468B .Fã.Fôu.Õ(..F.ÕX..võ.vã.....ÕU.. 000000
16EA468D 50520000 rFFF9A80 0868DE76 FFE076FF 0000006D 9A50160E 46800676 v..FB.P.m....vÅ.vßh.......RP.Fõ. 000020
FF9A036A F676FFF2 76FFEE76 FFEA76FF 006A006A E276FFE4 76FF0000 FFFF9A50 P......võ.vâj.j..võ.vŸ.v·.v-j... 000040
76FF0000 FFFF9A01 6AFA76FF FFABE9FF A0E90375 003C3000 08E9000E E90000FF ...Õ..Õ..=<.u.Õ..Õ¨..vºj.......v 000060
76FF0000 FFFF9A50 520000FF FF9A006A 016A016A 006A016A 006A0000 FFFF9AFA º.....j.j.j.j.j.j.......RP......v 000080
000004C8 CBC95F5E 1F0000E9 00008800 00FFFF9A 006A006A 006A006A 1DAD68FA ºhÙ.j.j.j.j......|..Õ...^_èùà... 0000A0
890000FF FF9A006A 006A5016 FE468D1D 806837FF 26065EC4 088E0007 881E5657 W.¡æ..Äá^.&.7h¯..F±.Pj.j....... 0000C0
0000E900 00880006 E90001B8 0006E903 7400FE7E 830009E9 037400FC 7E83FC46 F=.-=.t.Õ...~±.t.Õ..¡..Õ..¡..Õ.. 0000E0
839A5016 F8468D06 76FF00C8 EC46C7D8 8E020488 1E565700 033EC8CB C95F5E1F .^_èùà>..W.¡å..ÄúFåà..v..F½.P.. 000100
FFEE76FF F076FF00 0003FD9A 5016EE46 8037FF26 F85EC40E 36E90846 88000001 ....F.Õ6.á^½&.7.FŸ.P.»....vÞ.vŸ. 000120
8E83001B E91001E9 0006E903 7402FCD2 8E83FCD2 868906C4 83041915 699A0676 v..i....á...Ø=./Ø=.t.Õ..Õ..Õ.../ 000140
80EE76FF F076FF0F E9E9FCD2 86880007 E9037500 FCD28E83 0011E903 7501FCD2 Ø=.u.Õ.../Ø=.u.Õ....Ø=ÕÕ..vÞ.vŸ. 000160
E8468D0F C5E9FCD2 86880007 E9037500 003DFCD2 86890000 05729A50 16FCC286 .ô=.P.r.....Ø==..u.Õ....Ø=Õé..FÒ 000180
14C48304 6E00CF9A 0676FF00 8068FCC2 86FFFCC4 86FF006A 006A006A 006A5016 .Pj.j.j.j..Ñá=.Ñô=h...v..ü.n..á. 0001A0
78E90000 048F9AEE 76FFF076 FF0F8FE9 FCD2868B 0007E903 7500003D FCD28689 ..Ø==..u.Õ....Ø=Õ...vÞ.vŸ.....Õ( 0001C0
C2868050 16FCD486 80F476FF F676FF00 00FFFF9A 5016F446 8037FF26 F85EC40F .á^½&.7.F¶.P......v~.v¶..å=.P..ô 0001E0
```

Dump of file SATURN:[PCCOMMON.DUMP.DLL]ANALDESK.TMP;1 on 18-APR-1990 10:36:25.56
File ID (485,24,0)   End of file block 102 / Allocated 104

Virtual block number 14 (0000000E), 512 (0200) bytes

```
E90F30E9 0006E903 7402FCD2 8E83FCD2 86890EC4 8304A203 979A0676 FF5016FC =.P.v....Å..á...Ø=./Ø=.t.Õ..Õ=.Õ 000000
E8468D0F 25E9FCD2 86880007 E9037500 FCD28E83 0011E903 7501FCD2 8E83001B .../Ø=.u.Õ.../Ø=.u.Õ....Ø=Õ%..FÒ 000020
050200CF 9A0676FF 256AFCC2 86FFFCC4 86FFF476 FFF676FF 5016FCD4 86805016 .P..å=.P.v~.v¶.Ñá=.Ñô=j%.v..ü... 000040
FF9AF476 FFF676FF 0EEAE9FC 02868800 07E90375 00FCD28E 83FCD286 8914C483 .á...Ø=./Ø=.u.Õ....Ø=Õõ..v~.v¶.. 000060
02FCD28E 83FCD286 8906C483 FFFF0064 9A0676FF 5016FCC2 86800ED6 E90000FF ...Õø...ô=.P.v..d....á...Ø=./Ø=. 000080
880007E9 037500FC 028E8300 11E90375 01FCD28E 83001BE9 0E84E900 06E90374 t.Õ..ÕÇ.Õ.../Ø=.u.Õ.../Ø=.u.Õ... 0000A0
006A006A 006A5016 E8468D00 29E90374 0100B2BF 8326FCC2 9EC40E9C E9FCD286 .Ø=Õ..á.ô=&.¢ý..t.Õ)..FÕ.Pj.j.j. 0000C0
9EC4003F E9FCD286 8914C483 053800CF 9A0676FF 256AFCC2 86FFFCC4 86FF006A j..Ñá=.Ñô=j%.v..ü.;..á...Ø=Õ?.á. 0000E0
86FFFCC4 86FF006A 006A006A 006A5016 E8468D00 2AE90374 0300B2BF 8326FCC2 ô=&.¢ý..t.Õ*..FÕ.Pj.j.j.j..Ñá=.Ñ 000100
028E8300 01FCD286 C70006E9 FCD28689 14C48301 6200CF9A 0676FF00 8068FCC2 ô=h...v..ù.b..á...Ø=Õ..ú.Ø=.../Ø 000120
16E8468D 0477FF26 0677FF26 F85EC40E 08E90E14 E9FCD286 880007E9 03r'00FC =.u.Õ....Ø=Õ..Õ..á^½&.w.&.w..FÕ. 000140
016A006A 016A006A 0008E903 75000084 8F832604 5FC426E8 5EC40000 FFFF^A50 P.....á^Õ&á_.&.¢Ç..u.ÕÜ.j.j.j.j. 000160
FFFF0225 9A0477FF 260677FF 26E85EC4 000005C8 9A505200 0005C49A 006A036A j.j..á...RP¯ù...á^Õ&.w.&.w..%... 000180
FF000000 EF9A5052 000000E8 9A006A01 6A016A00 6A016A00 6AFCD286 8904C483 .á...Ø=j.j.j.j.j.j..Õ...RP.ÿ.... 0001A0
FF260677 FF26E85E C40051E9 037500FC 028E8300 0002009A 5016FD18 86800676 v....».P....../Ø=.u.ÕQ.á^Õ&.w.&. 0001C0
C4830000 FFFF9A04 6A5016FF 20868050 16EC468D 0174681E 0171681E 016A0477 w.j..hq..ht..f§.P.. ..Pj.......á 0001E0
```

Dump of file SATURN:[PCCOMMON.DUMP.DLL]ANALDESK.TMP;1 on 18-APR-1990 10:36:25.56
File ID (485,24,0)   End of file block 102 / Allocated 104

Virtual block number 15 (0000000F), 512 (0200) bytes

```
6A5016FF 20868D01 79681EFD 1886FFFD 1A86FFFD 1886FFFD 1A86FFFC D2868918 ...Ø=.Ñ.».Ñ.».Ñ.».Ñ.».hy... ..Pj 000000
6837FF26 E85EC40D 29E9FCD2 86880007 E9037500 FCD28E83 000000C6 9A206A00 .j .ó..../Ø=.u.Õ....Ø=Õ).á^Õ&.7h 000020
C48303C8 00009A06 76FF0086 68000EE9 0000028D 9A016A00 6A0876FF 006A1DAF £.j..v.j.j..§...Õ..hÑ..v....ù..á 000040
00009A50 16FCF686 80096A06 76FF0000 089C9A50 16FD1886 800676FF 0CF8E904 .Õ%..v....».P......v.j...-=.P... 000060
FCD28E83 FCD28689 0000FFFF 9A5016FC C6868050 16FCF686 800676FF 096AFFFF ..j..v...-=.P..ó=.P.......Ø=./Ø= 000080
890000FF FF9A5016 FC468DFC C686FFFC C886FF0C 85E9FCD2 86880007 E9037500 .u.Õ....Ø=Õç..Ñà=.Ñó=.F=.P...... 0000A0
C686FFFC C886FF00 FE1C86C6 0C8EE9FC 02868800 07E90375 00FCD28E 83FCD286 .Ø=./Ø=.u.Õ....Ø=Õ..ó..±..Ñà=.Ñó 0000C0
E9037500 FCD28E83 FCD28689 0000FFFF 9A5016FE 1C868001 6AFC76FF FE76FFFC =.v±.v=j....±.P.......Ø=./Ø=.u.Õ 0000E0
8491FCD2 8E81FCD2 86890000 FFFF9AFC C686FFFC C886FF0C 59E9FCD2 86880007 ....Ø=ÕY..Ñà=.Ñó=.......Ø=./Ø=.. 000100
000007A3 9A006A00 6A5016F2 46805016 FE1C868D 0C36E9FC 02868800 07E90374 t.Õ....Ø=Õ6....±.P.F·.Pj.j..È... 000120
83FCD286 890000FF FF9A0101 685016FE 1C868000 66E90374 10F246F6 FF1E8689 .....-F·.t.Õf....±.Ph.........Ø=. 000140
FFFF0010 9A5016FE 1C868001 7A681E00 42E900FE 1C86C600 08E90375 00FCD28E /Ø=.u.Õ..ó..±.ÕB..hz....±.P..... 000160
00FF1E8E 83FF1E86 890000FF FF9A006A 006A5016 F2468050 16FE1C86 8D08C483 .á.....±.P.F·.Pj.j............/... 000180
46800477 FF260677 FF26F85E C400FE1C 86C60005 E9037410 F246F600 09E90374 t.Õ..-F·.t.Õ..ó..±.á^½&.w.&.w..F 0001A0
9E8CFCCE 86890182 88002DE9 0082878B 26045FC4 26E85EC4 00000871 9A5016E8 Õ.P.q...á^Õ&á_.&..ý.Õ-.¡....ö=.. 0001C0
16E9FCD0 9E8CFCCE 8689018D 880024E9 FCD09E8C FCCE8689 01878800 32E9FCD0 Å=Õ2.¡....ö=.¯Å=Õ$.¡....ö=..Å=Õ. 0001E0
```

Dump of file SATURN:[PCCOMMON.DUMP.DLL]ANALDESK.TMP;1 on 18-APR-1990 10:36:25.56
File ID (485,24,0)   End of file block 102 / Allocated 104

Virtual block number 16 (00000010), 512 (0200) bytes

```
FFFD1AB6 FF016A00 6AFFDCE9 FFD1E903 75000330 FFCBE903 75000130 0013E900 .Õ..=..u.Õù.=..u.Õ1.Õ€.j.j..Ñ.». 000000
FFFF9A50 16FD1C86 80019168 1E006AFC CEB6FFFC D0B6FF50 16FE1C86 8DFD1886 Ñ.»...±.P.ÑÄ=.Ñö=j..h......».P... 000020
5016E846 800477FF 260677FF 26F85EC4 00E2E900 CAE9FF1E 8688FF1E 86890000 ...........Õò.Õã.á^½&.w.&.w..FÒ.P 000040
868908C4 8305AE02 949A0477 FF260677 FF26E85E C45016FD 1C868000 0003969A .........».Pá^Õ&.w.&.w....Ü..á... 000060
5016FD1C 8680004C E9037500 FCD2BE83 00000509 9A5016FD 18868006 76FFFCD2 Ø=.v.....».P.\..../Ø=.u.ÕL.....».P 000080
8918C483 0000060A 9A046A50 16FF2086 805016EC 4680019F 681E019C 681E016A j..h...h...f§.P.. ..Pj.......á.. 0000A0
6A006A50 16FF2086 8001A468 1EFD1886 FFFD1AB6 FFFD1886 FFFD1AB6 FFFCD286 .Ø=.Ñ.».Ñ.».Ñ.».Ñ.».h€... ..Pj.j 0000C0
1DAF6837 FF26E85E C40A68E9 FCD28688 0007E903 7500FCD2 BE830000 06349A20  .4..../Ø=.u.Õ....Ø=Õk.á^Õ&.7h€. 0000E0
30FFF2E9 03730001 30001BE9 001EE900 21E90000 065C9A01 6A006A08 76FF006A j..v.j.j..\...Õ1.Õ..Õ..=..±.Õ .= 000100
095F0000 9A0676FF 0085680A 27E9FFDF E9FF1EE9 03750003 30FF29E9 03770002 ..w.Õ).=..u.Õ..ÕÕ.Õ'.hç..v...._. 000120
00009A06 76FF0085 680A05E9 04C48309 7000009A 0676FF00 B5680A16 E904C483 .á.Õ..hç..v....p..á.Õ..hç..v.... 000140
26F85EC4 09E0E906 C483FFFF 00009AF8 76FFFA76 FF0676FF 09F4E904 C4830A13 ...á.Õ¶..v..v°.v½.......á.ÕÄ.á^½& 000160
6A0876FF 006A10AF 6837FF26 E85EC400 000A629A 5016E846 800477FF 260677FF .w.&.w..FÒ.P.b...á^Õ&.7h€.j..v.j 000180
D28E83FC D2868904 C483FFFF 00009AF8 76FFFA76 FF0981E9 00000AB2 9A016A00 .j..ÿ...ÕŸ..v°.v½.......á...Ø=./Ø 0001A0
83FFFF00 009AF876 FFFA76FF 0676FF09 8BE90994 E9FCD286 880007E9 037500FC •.u.Õ....Ø=Õ..Õ...v..v°.v½...... 0001C0
0676FF00 85680962 E90968E9 FCD28688 0007E903 7500FCD2 8E83FCD2 868906C4 á...Ø=./Ø=.u.Õ....Ø=Õk.Õb.hç..v. 0001E0
```

Dump of file SATURN:[PCCOMMON.DUMP.DLL]ANALDESK.TMP;1 on 18-APR-1990 10:36:25.56
File ID (485,24,0)   End of file block 102 / Allocated 104

Virtual block number 17 (00000011), 512 (0200) bytes

```
1886FFFD 1AB6FF00 000A4D9A 5016FD18 86800676 FF0951E9 04C48308 5A0C009A ...Z..á.ÕQ..v....».P.M....Ñ.».Ñ. 000000
00067E9A 5016FD18 86800676 FF0929E9 0000FFFF 9A006A00 6A006A00 6A296AFD »j)j.j.j.j......Õ)..v....».P.~.. 000020
1886FFFD 1AB6FF06 76FF0000 0A989A50 16E8468D 0477FF26 0677FF26 F85EC400 .á^½&.w.&.w..FÒ.P......v..Ñ.».Ñ. 000040
77FF26F8 5EC408E2 E90000FF FF9A0086 B7FF2600 8887FF26 045FC426 E85EC4FD »á^Õ&á_.&.ñ¡.&.ñÑ......Õã.á^½&.w 000060
6A006A08 76FF006A 1DAF6837 FF26E85E C4000008 739A5016 E8468004 77FF2606 .&.w..FÒ.P.s...á^Õ&.7h€.j..v.j.j 000080
00FCD2BE 83FCD286 8904C483 0AE80000 9AF876FF FA76FF08 B3E90000 091A9A01 .......Õ°..v°.v½...Õ..á...Ø=./Ø=. 0000A0
D2868904 C48308BE 003F9AF8 76FFFA76 FF088DE9 0896E9FC D2868800 07E90375 u.Õ....Ø=Õ..Õ...v°.v½.?....á...Ø 0000C0
08340008 9AF876FF FA76FF08 67E90870 E9FCD286 880007E9 037500FC D2BE83FC •./Ø=.u.Õ....Ø=Õp.Õg..v°.v½.Ä.4. 0000E0
76FFFA76 FF0841E9 084AE9FC D2868800 07E90375 00FCD2BE 83FCD286 8904C483 .á...Ø=./Ø=.u.Õ....Ø=ÕJ.ÕA..v°.v 000100
18E90824 E9FCD286 880007E9 037500FC D2BE83FC D2868904 C483FFFF 01179AF8 %.......á...Ø=./Ø=.u.Õ....Ø=Õ$.Õ. 000120
E8468004 77FF2606 77FF26F8 5EC4080A E904C483 066C0000 9A0676FF 00856808 .hç..v....l..á.Õ..á^½&.w.&.w..FÒ 000140
FF9A5016 FCCA868D 0086B7FF 26008887 FF26045F C426E85E C4000007 D49A5016 .P.å...á^Õ&á_.&.ñ¡.&.ñÑ...Õ=.P.. 000160
FCCC8608 FCCA8688 07CAE9FC D2868800 07E90375 00FCD2BE 83FCD286 890000FF .....Ø=./Ø=.ū.Õ....Ø=Õò...Õ=..à= 000180
0677FF26 F85EC400 2CE906C4 83094E00 589A0676 FF00EA68 00E86800 14E90374 t.Õ..h$.hö..v..X.N..á.Õ,.á^½&.w. 0001A0
016A006A 0876FF00 6A1DAF68 37FF26E8 5EC40000 0C099A50 16E8468D 0477FF26 &.w..FÒ.P.....á^Õ&.7h€.j..v.j.j. 0001C0
E85EC400 000C889A 5016E846 800477FF 260677FF 26F85EC4 0774E900 000C209A . ...Õt.á^½&.w.&.w..FÒ.P.....á^Õ 0001E0
```

Dump of file SATURN:[PCCOMMON.DUMP.DLL]ANALDESK.TMP;1 on 18-APR-1990 10:36:25.56
File ID (485,24,0)   End of file block 102 / Allocated 104

Virtual block number 18 (00000012), 512 (0200) bytes

```
5016FD18 86800676 FF0745E9 00000CA2 9A016A00 6A0876FF 006A1DAF 6837FF26 &.7h€.j..v.j.j..Å...ÕE..v....».P 000000
FFFD1AB6 FF0E77FF 26F85EC4 006A0019 E9037500 0E7F8326 F85EC400 000CB39A .°...á^½&....u.Õ..j.á^½&.w..Ñ.». 000020
08C4830C D8038E9A FD1886FF FD1AB6FF 0876FF01 6A08C483 0C68038E 9AFD1886 Ñ.»...k..á.j..v..Ñ.».Ñ.»...Ä..á. 000040
C400000C EE9A5016 E8468004 77FF2606 77FF26F8 5EC40E47 89260846 88F85EC4 á^½.F.&.G.á^½&.w.&.w..FÒ.P.Ÿ...á 000060
FD18868D 0676FF06 C3E90000 00059A01 6A006A08 76FF006A 1DAF6837 FF26E85E ^Õ&.7h€.j..v.j.j......Õù..v....» 000080
1AB6FF0E 77FF26F8 5EC4006A 0019E903 75000E7F 8326F85E C4000000 169A5016 .P.....á^½&.....u.Õ..j.á^½&.w..Ñ. 0000A0
00F39A50 16E8468D 0477FF26 0677FF26 F85EC408 C4830028 038E9AFD 1886FFFD ».Ñ.»...(..á.á^½&.w.&.w..FÒ.P.æ. 0000C0
8D0676FF 0660E900 000D609A 016A006A 0876FF00 6A1DAF68 37FF26E8 5EC40000 ..á^Õ&.7h€.j..v.j.j..m...Õ`..v.. 0000E0
F85EC406 C4830093 03EE9AFD 1886FFFD 1AB6FF08 76FF0000 00819A50 16FD1886 ..».P.......v..Ñ.».Ñ.».Ÿ....á.á^½ 000100
00B99A50 16E8468D 0477FF26 0677FF26 F85EC400 0000A49A 0477FF26 0677FF26 &.w.&.w...É.....á^½&.w.&.w..FÒ.P.¿. 000120
0000D89A 016A006A 0876FF00 6A1DAF68 37FF26E8 5EC4001A E9037400 00300000 ..".t.Õ..á^Õ&.7h€.j..v.j.j..Ä.. 000140
FD1886FF FD1AB6FF 0876FF00 000E769A 5016FD18 86800676 FF05F5E9 FFC9E900 .Õè.Õ%..v....».P.v....v..Ñ.».Ñ.» 000160
260677FF 26F85EC4 00000E99 9A0477FF 260677FF 26F85EC4 06C4830E 8803EE9A .Ÿ....á.á^½&.w.&.w.......á^½&.w.& 000180
006A1DAF 6837FF26 E85EC400 1AE90374 00003D00 000EAE9A 5016E846 8D0477FF .w..FÒ.P.Ù...=..t.Õ..á^Õ&.7h€.j. 0001A0
E8468004 77FF2606 77FF26F8 5EC4058A E9FFC9E9 00000E0A 9A016A00 6A0876FF .v.j.j......Õè.Õ..á^½&.w.&.w..FÒ 0001C0
58E90000 0E399A01 6A006A08 76FF006A 1DAF6837 FF26E85E C400000E 229A5016 .P."...á^Õ&.7h€.j..v.j.j..9...Õ( 0001E0
```

```
Dump of file SATURN:[PCCOMMON.DUMP.DLL]ANALDESK.TMP;1 on 18-APR-1990 10:36:25.56
File ID (485,24,0)   End of file block 102 / Allocated 104

Virtual block number 19 (00000013), 512 (0200) bytes

 6A1DAF68 37FF26E8 5EC40000 09909A50 16E8468D 0477FF26 0677FF26 F85EC405 .á^½&.w.&.w..FÒ.P.....á^Ò&.7h£.j 000000
 FF00009A F876FFrA 76FF0876 FF0676FF 052CE900 000ECD9A 016A006A 0876FF00 ..v.j.j..é...Õ,..v..v..v*.v½.... 000020
 8D0676FF 0500E905 09E9FCD2 86880007 E9037500 FCD28E83 FCD28689 08C483FF ..á...@=./@=.u.Õ....@=Õ..Õ...v.. 000040
 F85EC406 C483FFFF 03EE9AFD 1886FFFD 1A86FF08 76FF0000 0A259A50 16FD1886 ..».P.%....v..Ñ.».Ñ.».Ÿ....á.á^½ 000060
 FFFF9A50 16E84680 0477FF26 0677FF26 F85EC400 00FFFF9A 0477FF26 0677FF26 &.w.&.w......á^½&.w.&.w..FÒ.P... 000080
 0009849A 016A006A 0876FF00 6A1DAF68 37FF26E8 5EC4001A E9037400 00300000 ..=..t.Õ..á^Ò&.7h£.j..v.j.j..Ç.. 0000A0
 B6FFFD1A 86FF0228 68006A00 000F639A 5016FD18 86800676 FF0495E9 FFC9E900 .Õè.Õ...v....».P.c...j.h+..Ñ.».Ñ 0000C0
 C408C483 0F77038E 9AFD1886 FFFD1AB6 FF022C68 016A08C4 830F0A03 8E9AFD18 .»......á.j.h,..Ñ.».Ñ.»...w..á.á 0000E0
 9A5016E8 46800477 FF260677 FF26F85E C400000F 909A0477 FF260677 FF26F85E ^½&.w.&.w......á^½&.w.&.w..FÒ.P. 000100
 D19A016A 006A0876 FF006A1D AF6837FF 26E85EC4 001AE903 74000030 00000FB2 ý...=..t.Õ..á^Ò&.7h£.j..v.j.j..ı 000120
 FD1AB6FF 02286801 6A000010 079A5016 FD18868D 0676FF04 13E9FFC9 E900000F ...Õè.Õ...v....».P.....j.h+..Ñ.» 000140
 C4830C56 038E9AFD 1886FFFD 1AB6FF02 2C68006A 08C4830F 8C038E9A FD1886FF .Ñ.»......á.j.h,..Ñ.».Ñ.»...V..á 000160
 16E8468D 0477FF26 0677FF26 F85EC400 0010179A 0477FF26 0677FF26 F85EC408 .á^½&.w.&.w......á^½&.w.&.w..FÒ. 000180
 016A006A 0876FF00 6A1DAF68 37FF26E8 5EC4001A E9037400 00300000 102C9A50 P.,...=..t.Õ..á^Ò&.7h£.j..v.j.j. 0001A0
 FF00B568 0380E904 C4830FF5 00009A06 76FF0085 680391E9 FFC9E900 000BF19A .þ...Õè:Õ..hç..v....%..á.Õ..hç.. 0001C0
 FF26F85E C4000011 459A5016 FD18868D 0676FF03 6FE904C4 83104900 009A0676 v....I..á.Õo..v....».P.E...á^½&. 0001E0

Dump of file SATURN:[PCCOMMON.DUMP.DLL]ANALDESK.TMP;1 on 18-APR-1990 10:36:25.56
File ID (485,24,0)   End of file block 102 / Allocated 104

Virtual block number 20 (00000014), 512 (0200) bytes

 000010AF 9A5016E8 46800477 FF260677 FF26F85E C4000010 9A9A0477 FF260677 w.&.w......á^½&.w.&.w..FÒ.P.£... 000000
 868908C4 8310EF02 CC9AE876 FFEA76FF FD1886FF FD1AB6FF 003EE903 74000030 =..t.Õ>..Ñ.».Ñ.».vÕ.vÒ.ä.ÿ..á... 000020
 FCD28688 0000FFFF 9A0477FF 260677FF 26F85EC4 0017E903 7500FCD2 BE83FCD2 @=./@=.u.Õ..á^½&.w.&.w........@= 000040
 5EC40000 100F9A50 52000010 D89A006A 036A016A 006A016A 006AFFA5 E902FFE9 Õ..ÕE.j.j.j.j.j.j..Á...RP.Õ...á^ 000060
 4E9A5016 E8468D04 77FF2606 77FF26F8 5EC40000 00399A04 77FF2606 77FF26F8 ½&.w.&.w..9...á^½&.w.&.w..FÒ.P.N 000080
 6A016A00 6AFFD3E9 0000FFFF 9A006A37 FF26E85E C40010E9 03740000 3D00000D ...=..t.Õ..á^Ò&.7j......Õ£.j.j.j 0000A0
 0000009A 0676FF00 B5680286 E9000005 9C9A5052 00000595 9A006A01 6A016A00 .j.j.j......RP.....Õ..hç..v..... 0000C0
 009A0676 FF00B568 0264E904 C4831111 00009A06 76FF0085 680275E9 04C48311 ..á.Õu.hç..v.......á.Õd.hç..v... 0000E0
 0676FF00 B5680242 E904C483 11330000 9A0676FF 00B56802 53E904C4 83112200 ."..á.ÕS.hç..v....3..á.Õ@.hç..v. 000100
 1886FFFD 1AB6FF00 000C319A 5016FD18 86800676 FF0231E9 04C48308 C100009A ...è..á.Õ1..v....».P.1....Ñ.».Ñ. 000120
 2D01FDE9 0200E902 03E90000 FFFF9A00 6A006A00 6A505200 0002469A 800868F0 »h...F...RPj.j.j......Õ..Õ..Õ».- 000140
 09450674 05611169 04960339 03F11182 A7FF2E93 C003FFEF E9037600 F43D01A6 ‖.=¶.v.Õÿ..á...‖..þ.9...i.a.t.E. 000160
 11690A1B 11690A0A 09E11169 0988098C 098C1169 09780967 098C1169 09561169 i.V.i...g.x.i.....£.i.Ã...i...i. 000180
 11691169 08510851 11690A8A 0A8A0A8A 0A8A1169 08280805 0ADF0AB9 11690A43 C.i.¿.Õ...+.i.........i.Q.Q.i.i. 0001A0
 0A8A0A8A 0A8A0A8A 0A8A0A8A 11690A8A 0A8A0A8A 0A8A1169 0A8A0A8A 0A8A1169 i.......i.........i............. 0001C0
 0C7A0C7A 11691169 08F80862 11690A8A 0A8A0A8A 0A8A0A8A 11690A8A 0A8A0A8A ......i...........i.b.½.i.i.z.z. 0001E0

Dump of file SATURN:[PCCOMMON.DUMP.DLL]ANALDESK.TMP;1 on 18-APR-1990 10:36:25.56
File ID (485,24,0)   End of file block 102 / Allocated 104

Virtual block number 21 (00000015), 512 (0200) bytes

 000C0D0C 11690077 11690C7A 0C7A0C7A 0C7A0C7A 11690C7A 0C7A0C7A 11690C7A z.i.z.z.z.i.z.z.z.z.z.i.w.i..... 000000
 0DE20DE2 0DE200E  11690CA9 0C270C27 0C270C27 0C270C27 0C270C27 11691169 i.i.'.'.'.'.'.'.'.`.i.ã.ã.ã.ã. 000020
 0E110E11 0E110E11 11690E11 0E111169 0E110E11 0E110E11 116900E2 0DE21169 i.ã.ã.i.........i.....i......... 000040
 0F590ED7 0E6C1169 0E400E40 0E400E40 0E401169 0E110E11 11691169 0E110E11 ....i.i.....i.a.a.a.a.a.i.l.■.Y. 000060
 11691169 11691169 1169113B 112A1119 110810F7 10E61169 0FFD0FEC 0FDB1169 i.Ü.å.».i.Ì.¥.....*.;.i.i.i.i.i. 000080
 11691169 11691169 11691169 11691169 11691169 11691169 11691169 11691169 i.i.i.i.i.i.i.i.i.i.i.i.i.i.i.i. 0000A0
 11691169 11691169 11691169 11691169 11691169 11691169 11691169 11691169 i.i.i.i.i.i.i.i.i.i.i.i.i.i.i.i. 0000C0
 11691169 11691169 11691169 11691169 11691169 11691169 11691169 11691169 i.i.i.i.i.i.i.i.i.i.i.i.i.i.i.i. 0000E0
 11691169 11691169 11691169 11691169 11691169 11691169 11691169 11691169 i.i.i.i.i.i.i.i.i.i.i.i.i.i.i.i. 000100
 11691169 11691169 11691169 11691169 11691169 11691169 11691169 11691169 i.i.i.i.i.i.i.i.i.i.i.i.i.i.i.i. 000120
 E9000088 00E21169 11691169 11691169 11691169 11691169 11691169 11691169 i.i.i.i.i.i.i.i.i.i.i.i.i.ã.¡..Õ 000140
 0006032F 02030000 00020FE4 000202C7 000801E3 02030030 90C8C95F 5E1F0000 ...^ èù.0...Ð...ù...ð......./... 000160
 00060121 02030000 00050889 00020000 00040355 00020000 00030EF5 0002000C È...Ï.......U................!... 000180
 0003026F 01030000 00070AC2 00020259 00080F1B 02030000 00060690 00020065 e...............Y...ó.......o... 0001A0
 000610C4 02030000 000909C4 00020088 000308F2 01030000 000809ED 00020008 ....Ù.......`.......á.......á... 0001C0
 00081068 02030171 000706A4 02030000 000A0E4F 000201EE 00070700 02030074 t.......Y...O.......É...q...h... 0001E0
```

Dump of file SATURN:[PCCOMMON.DUMP.DLL]ANALDESK.TMP;1 on 18-APR-1990 10:36:25.56
File ID (485,24,0)   End of file block 102 / Allocated 104

Virtual block number 22 (00000016), 512 (0200) bytes 00030252 01030100 0006028A 02030000 00080984 00020013 00031155 0103026A j...U......................R... 000000
00080A83 020302F1 00090228 02030000 000E078E 00020090 0003008A 0103001A ....................(...þ....... 000020
00060292 02030000 0010031D 0002008F 00060F4F 0203027E 00080F30 02030365 e...0...~...0................... 000040
00060EE1 02030292 00080345 0203009A 000602EB 02030301 000908C8 02030115 ....à.......Š.......E.......Ä... 000060
000803EA 0203004B 0002074C 0103021E 000708BF 02030030 00030A3C 010300A5 É...<...=...........L...K...õ... 000080
000706CB 0203031F 0009084E 02030383 000C1162 020301A8 00070722 0203029D ....".......b.......N.......ù... 0000A0
00090767 0203005C 0003108A 0103005B 00031083 01030046 00050197 02030185 ç.......F.......[.......\...g... 0000C0
016A006A 088EFFFF 881E5657 000086C8 00000000 00000289 0008080A 0203032E ....Õ...¿.......à...WV.¡...Äj.j. 0000E0
00FFFF9A 5016FC46 8D0676FF 0000FFFF 9A505200 00FFFF9A 006A036A 016A006A j.j.j.j......RP......v..F=.P.... 000100
C70009E9 037500FA 7E830000 FFFF9A50 16FA4680 0477FF26 0677FF26 FC5EC400 .á^=&.w.&.w..F°.P......~°.u.Õ..ú 000120
A05EC400 00FFFF9A 5016A046 8D0477FF 260677FF 26FC5EC4 0093E900 00FF7A86 .z...Õ..á^=&.w.&.w...F..P.....á^. 000140
E90004FF 7A86C700 62E90002 FF7A86C7 0068E900 01FF7A86 C70039E9 0A478826 &.G.Õ9.ú.z...Õk.ú.z...Õb.ú.z...Õ 000160
003BE900 3EE90000 FF7A86C7 0047E900 10FF7A86 C70050E9 0008FF7A 86C70059 Y.ú.z...ÕP.ú.z...ÕG.ú.z...Õ>.Õ;. 000180
FFB9E903 75006930 FFDCE9FF 88E90375 00323000 08E90376 FFE3E903 75006830 =h.u.ÕÜ.v.Õ..=2.u.ÕÉ.ÕÉ.=i.u.Õ¿. 0001A0
46800676 FFFFB9E9 FF8FE903 77008230 FFC4E903 73008130 FFBAE903 75006C30 =l.u.Õ¤.=..s.Õá.=..w.Õ..Õ¿..v..F 0001C0
26FC5EC4 86568984 46890000 FFFF9A80 05689876 FF9A76FF 0000FFFF 9A501698 ..P......v..v.h........FÇ.VÑá^=& 0001E0

Dump of file SATURN:[PCCOMMON.DUMP.DLL]ANALDESK.TMP;1 on 18-APR-1990 10:36:25.56
File ID (485,24,0)   End of file block 102 / Allocated 104

Virtual block number 23 (00000017), 512 (0200) bytes

52E90374 009C7E83 00000847 C726FC5E C40009E9 0375009C 7E839C46 89084788 .G..F..~..u.Õ..á^=&úG....~..t.ÕR 000000
A8878080 7E80189E 5E68003D E9037200 949E7E81 9E46FF00 03E90000 9E46C700 .úF...Õ...F..~...r.Õ=.k^...~..ñ´ 000020
0002288E 46880181 688476FF 8676FF00 1FE90375 00847E83 A5F2000C 89071601 ...¿..´É.~..u.Õ...vÑ.vÇh...F.+@. 000040
7E819E46 FF0003E9 00009E46 C7FFB6E9 000001F6 9A006A00 6A505201 CA830000 ...ò.RPj.j..~...ÕÑ.úF...Õ...F..~ 000060
03740084 7E83A5F2 000C8907 1601A887 8D807E8D 189E5E68 0168E903 7200949E ...r.Õh.k^...~..ñ´...¿..´É.~..t. 000080
2CE90375 804685FF 7A868800 0CE90375 1F807E83 0141E903 75009C7E 830009E9 Õ...~..u.ÕA..~..u.Õ....z..F.u.Õ, 0000A0
505201CA 83000000 D2288446 88018268 8476FF86 76FF0031 E9037500 847E8301 ..~..u.Õ1..vÑ.vÇh...F.+@....ò.RP 0000C0
5688B446 88000EE9 FF7E9689 FF7C8689 AE5688AC 46880000 FFFF9A50 16A4468D .FÉ.P......F¯.VÜ..|...~.Õ...FÇ.V 0000E0
A4468988 46881FA5 F2000889 1F161E07 1688768D 887E8DFF 7E9689FF 7C868986 Ñ..|...~..¬¡.v.......¿..´É..F¡.FÉ 000100
4688AE56 89AC4689 C25688C0 4688AA46 898E4688 A846898C 4688A646 898A4688 .F¤.F|.F¥.F´.F/.F´.Fà.Vó.F¯.VÜ.F 000120
1E046AFF 6AFF7C86 FFFF7EB6 FF003FE9 03750086 7E838256 89804689 C65688C4 á.Vó.F¯.Vý.~..u.Õ?..Ñ~..Ñ|.j.j.. 000140
6A8676FF 036A00 \ FF7CB6FF FF7EB6FF 006A006A 006A006A 006A0200 6801A668 h|.h..j.j.j.j.j..Ñ~..Ñ|.j.j..v.j 000160
8E006A00 6A0039E9 03750082 7E83AE56 89AC4689 0000FFFF 9A006A00 6A006A00 .j.j.j.......F¯.VÜ.~..u.Õ9.j.j.. 000180
68FF7CB6 FFFF7EB6 FF0000FF FF9A5016 CB468032 6A8276FF 020036FF 26286406 .d+&.6...v.j2.Fà.P......Ñ~..Ñ|.h 0001A0
80018068 FF7C86FF FF7EB6FF 0019E900 00017C9A 5016C846 805016A4 46800180 ...FÉ.P.Fà.P.|...Õ...Ñ~..Ñ|.h... 0001C0
0000199A 006A016A 016A006A 016A006A FE8BE900 0002D09A 006A006A 5016A446 FÉ.Pj.j..\...Õ.±j.j.j.j.j.j..... 0001E0

Dump of file SATURN:[PCCOMMON.DUMP.DLL]ANALDESK.TMP;1 on 18-APR-1990 10:36:25.56
File ID (485,24,0)   End of file block 102 / Allocated 104

Virtual block number 24 (00000018), 512 (0200) bytes

FFD88E00 08881E56 57000004 C8C8C95F 5E1F0000 E9000088 00000020 9A505200 .RP. ...¡..Õ...^_èüà...WV.¡...Ä. 000000
76FFFE56 89FC4689 00000102 9A800568 50520000 FFFF9A00 6A056A06 76FF0876 v..v.j.j......RPħ........F=.V±.v 000020
00008800 06E90375 000C7E83 505201CA 8300000D D2280A46 88019268 FC76FFFE ±.v=h...F.+@....ò.RP.~..u.Õ..¡.. 000040
04C8C8C9 5F5E1F00 0002F99A 505200CA 83400000 C0280088 D2284000 880003E9 Õ..¡.ã+@.Å+á..ã.ò.RP.°....^_èüà. 000060
76FFFE56 89FC4689 00000344 9A800568 0676FF08 76FFD88E 032888 1E 56570000 ..WV.¡+..Ä.v..v.h...D....F=¯V±.v 000080
20008800 06E9037; 000C7E83 505201CA 83000000 D2280A46 88019268 FC76FFFE ±.v=h...F.+@....ò.RP.~..u.Õ..¡. 0000A0
06C8C8C9 5F5E1F00 0003859A 505200CA 83200000 C0280088 D2280000 880003E9 Õ..¡..+@.Å+á.. .ò.RP......^_èüà. 0000C0
76FFFE56 89FC4689 000003A4 9A800568 0676FF08 76FFD88E 0396881E 56570000 ..WV.¡...Ä.v..v.h...Ê....F=¯V±.v 0000E0
46890000 03E59A20 0068006A 505201CA 83000000 D2280A46 88019168 FC76FFFE ±.v=h...F.+@....ò.RPj.h. .|....F 000100
038E9A06 76FF0876 FF0A76FF 50200088 0003E900 00880006 E9037500 FA7E83FA °.~°.u.Õ..¡..Õ..¡. P.v..v..v.... 000120
16FA468D 0676FF08 76FFD88E 03F6881E 56570000 1EC8C8C9 5F5E1F08 C483FFFF ...á..^_èüà...WV.¡~..Ä.v..v..F°. 000140
46800477 FF260677 FF26FC5E C4000000 2D9A5016 FC468DFA 76FF0000 FFFF9A50 P......v°.F=.P.·...á^=&.w.&.w..F 000160
880000E6 46C7F446 89F64689 00008800 1FE90375 00F87E83 00000042 9A5016F8 ½.P.B....-½.u.Õ..¡....F-.F¶úF|..¡ 000180
5016F446 8D0477FF 260677FF 26FC5EC4 003AE900 00EA46C7 E24689E4 46890000 ...FÕ.FãúFõ..Õ:.á^=&.w.&.w..F¶.P 0001A0
E45689E2 46890657 88260447 8826F45E C4E64689 0A478826 F45EC400 0000699A .i...á^¶&.G..F|á^¶&.G.&.W..Fã.VÕ 0001C0
05210323 9A0676FF 0876FF01 A568016A 0C02E90A 4688EA46 89084788 26F45EC4 á^¶&.G..Fõ.F.Õ..j.hÉ..v..v..#.!. 0001E0

```
Dump of file SATURN:[PCCOMMON.DUMP.DLL]ANFORM.TMP;1 on 18-APR-1990 10:36:51.25
File ID (512,24,0)   End of file block 29 / Allocated 32

Virtual block number 26 (0000001A), 512 (0200) bytes

 000000F0 00EF00EE 00ED00EB 00800000 00000000 00000000 00CB00CC 00CD00CE ö.ë.ä.ü.............Š.Ü.Ÿ.ÿ.Þ... 000000
 44206567 6E616843 00747379 6C616E41 00747379 6C616E41 00000000 00000000 ........Analyst.Analyst.Change D 000020
 7473796C 616E61:0 6E612067 6E696464 41006560 616E206C 65646F4D 20617461 ata Model name.Adding an analyst 000040
 60616E20 4D502065 63616C70 65722072 6F66206E 78742074 72617453 004D5020  PM.Start txn for replace PM nam 000060
 0001FFFF 00000000 4D502074 73796C61 6E61206E 6120676E 6974656C 65440065 e.Deleting an analyst PM........ 000080
 00000000 FFFF0001 000E0352 00000717 00000000 00000000 00000005 00CC0002 ..ä.................R........... 0000A0
 00000000 05CDFFFF 00C8023B 00FAFFF3 00719400 009005CC 00000001 00000030 0.......ä.....q.µ.'.;.å...ë..... 0000C0
 00000000 0000FFFF FFFF00E8 00080096 022E0005 80010001 05D10013 00050000 ......Ì..............Ò.......... 0000E0
 00050000 00000000 FFFFFFFF 00E70008 00EC0222 00078002 000C05E5 00000006 ....Ì.......".å...Ò............. 000100
 00000006 00000000 0000FFFF FFFF0003 00080060 02100005 80010001 05E60011 ..Ì.........'...Æ............... 000120
 05F9000C 00050000 00000000 FFFFFFFF 00040008 00EC0204 00078002 000C05F8 %.........å...Å...............'. 000140
 00270606 0000000A 00000000 0000FFFF FFFF00E6 00080060 01F20005 80000001 .......·.'...Ì................'. 000160
 80010001 06070008 00050000 00000000 FFFFFFFF 00E5002C 00EC01C2 00078002 ...-.ó.å.,.Ì.................... 000180
 00078002 000C0610 00000006 00000000 0000FFFF FFFF00E1 00080060 01800005 ..¯.'...Å....................... 0001A0
 01980005 80010001 06110009 00050000 00000000 FFFFFFFF 00E20008 00C101A4 Ê.ė...Ä......................... 0001C0
 00C50166 00058002 00080618 00000007 00000000 0000FFFF FFFF00E3 00080060 '...D......................f.é. 0001E0
```

```
Dump of file SATURN:[PCCOMMON.DUMP.DLL]ANFORM.TMP;1 on 18-APR-1990 10:36:51.25
File ID (512,24,0)   End of file block 29 / Allocated 32

Virtual block number 25 (00000019), 512 (0200) bytes

003DF846 89000000 639AFFFF 68002C68 026A006A 0277FF26 0477FF26 0A5EC400 .á^.&.w.&.w.j.j.h,.h...c....F½=. 000000
35680032 68076A2F 6A0277FF 260477FF 260A5EC4 0062E9F8 46880006 E9037500 .u.Ô...F½Ôb.á^.&.w.&.w.j/j.h2.h5 000020
0A5EC400 31E9F846 880006E9 03750000 30F84689 0000FFFF 9AFFFF68 00506800 .h).h........F½=..u.Ô...F½Ô1.á^. 000040
E9037500 003DF846 890000FF FF9AFFFF 68FFFF68 026A156A 0277FF26 0477FF26 &.w.&.w.j.j.h..h........F½=..u.Ô 000060
00020140 00020C25 00050022 90C8C95F 5E1F0000 E90000B8 0006E9F8 46880006 ...F½Ô..|..Ô...^_èù."...%...a... 000080
01030000 00040818 00020162 000509EA 02030000 00020898 00020000 00010AA0 ................ō...b........... 0000A0
02030172 0005084C 02030357 00080987 02030077 00040A34 02030086 00020373 s.......4...w.......W...L...r... 0000C0
020303D9 00080876 02030569 00020CD3 0005017E 00050A08 02030083 00040342 B..........~...Æ...i...v...l... 0000E0
02030305 0008055D 02030000 0002089E 0005077E 0002002F 000502F9 00080381 ....'.../...~...........]....... 000100
0005040E 00020CA8 0005038D 00020C77 000501A2 00050AC2 020303F0 000808A1 À...Þ...ó...Â...w............... 000120
020302A1 00020C4C 0005061D 00020004 00050401 00080C4F 02030993 00020BC9 è.......O...............L...Â... 000140
000503A2 000A0A71 02030051 000409A8 0203032E 00080772 02030414 00080AF7 ¥.......r...........Q...q...Â... 000160
00050427 00080BFD 02030153 00050B28 0203028E 000709C9 02030832 00020060 '...2...è...ƒ...+...S...»...'... 000180
01CB0001 881F0030 3E89D88E FFFFB81E 00000000 00000000 000000BF 00020BF4 ¶...€...............|...Â.>...|..ù. 0001A0
00000000 00000..E 00DF00E0 00E20080 00000000 00000000 00000500 02000200 ..................â.Á.Ô.B.Ï..... 0001C0
00000080 00000000 00000000 00000005 0006000 7 0008000A 00800000 00000000 ........Ö.Á.■.■.Ï.............Á. 0001E0
```

```
Dump of file SATURN:[PCCOMMON.DUMP.DLL]ANFORM.TMP;1 on 18-APR-1990 10:36:51.25
File ID (512,24,0)   End of file block 29 / Allocated 32

Virtual block number 24 (00000018), 512 (0200) bytes

C95F5E1F 0000E9F4 46880000 07C726FC 5EC4FA46 890000FF FF9A0676 FF0876FF .v..v.......F*á^=&ú....F*Õ...^_è 000000
890000FF FF9A501. FE468D06 76FF0876 FFD88E0A 82881E56 57000008 C8000CCA ò..à...WV.ÿ..Á.v..v..Ft.P...... 000020
0000FFFF 9A5016FA 46800676 FF0876FF 023EE9F8 46880006 E9037500 003DF846 F½=..u.Õ...F½Õ>..v..v..F*.P..... 000040
0C56880A 4688FA76 FFFC76FF FE76FF02 1DE9F846 880006E9 03750000 3DF84689 .F½=..u.Õ...F½Õ...vt.v=.vª.F..V. 000060
FF260A5E C401F3E9 F8468800 06E90375 00003DF8 46890000 FFFF9A50 52000205 ...RP......F½=..u.Õ...F½Õµ.á^.&. 000080
0006E903 7500003D F8468900 0008CC9A FFFF6808 C668026A 2F6A0277 FF260477 w.&.w.j/j.hó.h...ä....F½=..u.Õ.. 0000A0
00000C28 9AFFFF68 08F1682F 6A016A02 77FF2604 77FF260A 5EC401C8 E9F84688 .F½Õà.á^.&.w.&.w.j.j/hþ.h...(... 0000C0
046A2F6A 0277FF26 0477FF26 0A5EC401 90E9F846 880006E9 03750000 3DF84689 .F½=..u.Õ...F½Õ..á^.&.w.&.w.j/j. 0000E0
E9F84688 0006E903 75000030 F8468900 000C809A FFFF680C 22680BFA 680BF768 h¥.h*.h".h........F½=..u.Õ...F½Õ 000100
3DF84689 00000CA8 9AFFFF68 0C496802 6A1D6A02 77FF2604 77FF260A 5EC4016C l.á^.&.w.&.w.j.j.hl.h...¨....F½= 000120
FF9AFFFF 680C7468 0277FF26 0477FF26 0A5EC401 41E9F846 880006E9 03750000 ..u.Õ...F½ÕA.á^.&.w.&.w.ht.h.... 000140
6A0277FF 260477FF 260A5EC4 011AE9F8 46880006 E9037500 003DF846 890000FF ....F½=..u.Õ...F½Õ..á^.&.w.&.w.j 000160
880006E9 03750000 3DF84689 00000CDC 9AFFFF68 0CA5680C 7D680C7A 68096A2F /j.hz.h}.hÉ.h...É....F½=..u.Õ... 000180
8900000D 079AFFFF 680CD068 026A0A6A 0277FF26 0477FF26 0A5EC400 E9E9F846 F½ÒÕ.á^.&.w.&.w.j.j.hÅ.h........ 0001A0
68066A2F 6A0277FF 260477FF 260A5EC4 008EE9F8 46880006 E9037500 003DF846 F½=..u.Õ...F½Õ/.á^.&.w.&.w.j/j.h 0001C0
80E9F846 880006E9 03750000 3DF84689 00000038 9AFFFF68 0D01680C D9680CD6 ø.h).h..h...8....F½=..u.Õ...F½Õ. 0001E0
```

Dump of file SATURN:[PCCOMMON.DUMP.DLL]ANFORM.TMP;1 on 18-APR-1990 10:36:51.25
File ID (512,24,0)   End of file block 29 / Allocated 32

Virtual block number 23 (00000017), 512 (0200) bytes

```
3CE90375 02400826 008826F0 76C402E3 C1F45E88 F446FF00 03E90000 F446C7FC =úf¶..Õ...F¶.^¶éD.ávÞ&..&.ã.u.Õ< 000000
19E90374 02503/26 0022E903 74003926 1056880E 4688F076 C402E3C1 F45E8800 ..^¶éD.ávÞ.F..V.&9.t.Õ".&9P.t.Õ. 000020
F276FFFF ACE90003 E9FE5689 FC468902 50882600 8826F076 C402E3C1 F45E8800 ..^¶éD.ávÞ&..&.P..F=.V±Õ..Õ^..v· 000040
08FC4688 10C48300 0007509A 006A0E76 FF1076FF 2715680A 76FF0C76 FFF076FF .vÞ.v..v.h.'.v..v.j..P....á..F=. 000060
5E1F0000 E9000008 269A0008 68EA76FF EC76FF00 11E90000 880006E9 0374FE46 F±t.Õ..¡..Õ...vš.võhÁ..&...Õ...^ 000080
89000008 4A9A5016 F646800A 76FF0C76 FFD88E08 3A881E56 57000018 C8C8C95F  èúà...WV.¡:..Ä.v..v..F~.P.J.... 0000A0
F0468900 0008689A 5016EC46 8DF676FF 00E5E9F0 46880006 E9037500 003DF046 FÞ=..u.Õ...FÞÕÍ..v~.F$.P.h....FÞ 0000C0
46890000 08899A50 16E84680 EC76FFEE 76FF00C7 E9F04688 0006E903 7500003D =..u.Õ...FÞÕú..vŸ.v$.FÒ.P......F 0000E0
89000008 AA9A5016 F2468DEC 76FFEE76 FF00A6E9 F0468800 06E90375 00003DF0 Þ=..u.Õ...FÞÕÍ..vŸ.vš.F·.P.^.... 000100
4680036A E876FFEA 76FF0A76 FF0C76FF 0085E9F0 46880006 E9037500 003DF046 FÞ=..u.Õ...FÞÕ...v..v..võ.vÒj..F 000120
26078826 F85EC400 5CE9F046 880006E9 03750000 3DF04689 00000803 9A5016F8 %.P.Æ....FÞ=..u.Õ...FÞÕ\.é^%&..& 000140
006A0E76 FF1076FF 2715680A 76FF0C76 FFF876FF FA76FFFE 5689FC46 89025788 .W..F•.V±.v¹.v½.v..v.h.'.v..v.j. 000160
00880006 E9037510 56390008 E903740E 4639FE56 88FC4688 10C48300 0009659A .e....á..F=.V±9F.t.Õ..9V.u.Õ..¡. 000180
56570000 06C8C8C9 5F5E1F00 00E90297 051F9A00 D468EC76 FFEE76FF 0011E900 .Õ...vŸ.všhå......Õ...^ èúà...WV 0001A0
06E90375 00003DFA 46890000 FFFF9A50 16FC4680 0E76FF10 76FFD88E 0998881E .¡...Ä.v..v..F•.P......F¹=..u.Õ. 0001C0
0A76FF0C 76FF0277 FF260477 FF26FC5E C4000107 C726FC5E C40035E9 FA468800 ..F¹Õ5.é^•&ú...é^•&.w.&.w..v..v. 0001E0
```

Dump of file SATURN:[PCCOMMON.DUMP.DLL]ANFORM.TMP;1 on 18-APR-1990 10:36:51.25
File ID (512,24,0)   End of file block 29 / Allocated 32

Virtual block number 22 (00000016), 512 (0200) bytes 03740039 26105688 0E4688F0 76C402E3 C1F45E88 003CE903 75024008 26008826 &..&.ə.u.Õ<..^¶èD.&vÞ.F..V.&9.t. 000000
89FC4689 02508826 008826F0 76C402E3 C1F45E88 0019E903 74025039 260022E9 Õ".&9P.t.Õ...^¶èD.&vÞ&..&.P..F=. 000020
9A006A0E 76FF10;6 FF271568 0A76FF0C 76FFF076 FFF276FF FFACE900 03E9FE56 V±Õ..Õ˚..v·.vÞ.v..v.h.'.v..v.j.. 000040
ED68EA76 FFEC76FF 0011E900 00880006 E90374FE 4608FC46 8810C483 00000538 ;....á..F=.F±t.Õ..¡..Õ...vš.võhÙ 000060
0A76FF0C 76FFD88E 0625B81E 56570000 0CC8C8C9 5F5E1F00 00E90000 06119A00 ......Õ...^_èùà...WV.¡%..Ä.v..v. 000080
4680FE76 FF0082E9 F8468800 06E90375 000030F8 46890000 06359A50 16, ¨4680 .F±.P.5....F½=..u.Õ...F½Õ...v±.F 0000A0
80FA76FF FC76FF00 64E9F846 880006E9 03750000 30F84689 00000653 9A50 4FA *.P.S....F½=..u.Õ...F½Õd..v=.v*. 0000C0
F65688F4 46880043 E9F84688 0006E903 7500003D F8468900 0006749A 5016F·46 F¶.P.t....F½=..u.Õ...F½ÕC..F¶.V~ 0000E0
56390008 E9037412 4639F656 88F44688 001CE903 75105639 0008E903 740E4639 9F.t.Õ..9V.u.Õ...F¶.V-9F.t.Õ..9V 000100
5F5E1F00 00E90000 FFFF9A00 0868FA76 FFFC76FF 0011E900 00880006 E9037514 .u.Õ..¡..Õ...v=.v*hÄ......Õ...^ 000120
46890000 07969A50 16FA468D 0A76FF0C 76FFD88E 0786881E 56570000 1AC8C8C9 èùà...WV.¡...Ä.v..v..F*.P......F 000140
30EE4689 000007B4 9A5016EA 4680FA76 FF012FE9 EE468800 06E90375 000030EE Ÿ=..u.Õ...FŸÕ/..v*.Fõ.P.Ç....FŸ= 000160
EE468900 0007D59A 5016E646 80EA76FF EC76FF01 11E9EE46 880006E9 03750000 ..u.Õ...FŸÕ...vš.võ.Fl.P.f....FŸ 000180
46890000 06959A50 16F64680 EA76FFEC 76FF00F0 E9EE4688 0006E903 75000030 =..u.Õ...FŸÕÞ..vš.võ.F-.P......F 0001A0
F0468D07 6AE676FF E876FF0A 76FF0C76 FF00CFE9 EE468800 06E90375 000030EE Ÿ=..u.Õ...FŸÕù..v..v..vÒ.vÏj..FÞ 0001C0
4689FE46 89000088 00A6E9EE 46880006 E9037500 0030EE46 89000006 8E9A5016 .P.ƒ....FŸ=..u.Õ...FŸÕÎ.¡...F±.F 0001E0

```
Dump of file SATURN:[PCCOMMON.DUMP.DLL]ANFORM.TMP;1 on 18-APR-1990 10:36:51.25
File ID (512,24,0)   End of file block 29 / Allocated 32

Virtual block number 21 (00000015), 512 (0200) bytes

 FC76C402 E3C1F05E 880019E9 03740250 39260022 E9037400 39261056 880E4688 .F..V.&9.t.Ō".&9P.t.Ō...^ÞèD.áv= 000000
 680A76FF 0C76F rFC 76FFFE76 FFFFACE9 0003E9FA 5689F846 89025088 26008826 &..&.P..F½.VªŌ..Ō¯..v±.v=.v..v.h 000020
 00008800 06E90374 FA460BF8 468810C4 83000002 739A006A 0E76FF10 76FF2715 .'.v..v.j..s....á..F½.Fªt.Ō..¡.. 000040
 1E565700 000CC8C8 C95F5E1F 0000E900 0004029A 00E068EA 76FFEC76 FF0011E9 Ō...vš.vōhÅ......Ō...^_èüà...WV. 000060
 0006E903 7500003D F8468900 0004269A 5016FE46 800A76FF 0C76FFD8 8E0416B8 ¡...Å.v..v..F±.P.&....F½=..u.Ō.. 000080
 46880006 E9037500 0030F846 89000004 449A5016 FA4680FE 76FF0082 E9F8468B .F½Ō...v±.Fª.P.D....F½=..u.Ō...F 0000A0
 880006E9 03750000 30F84689 00000465 9A5016F4 4680FA76 FFFC76FF 0064E9F8 ½Ōd..v=.vª.F¶.P.e....F½=..u.Ō... 0000C0
 5688F446 88001CE9 03751056 390008E9 03740E46 39F65688 F4468800 43E9F846 F½ŌC..F¶.V-9F.t.Ō..9V.u.Ō...F¶.V 0000E0
 00ED68FA 76FFFC76 FF0011E9 00008800 06E90375 14563900 08E90374 124639F6 -9F.t.Ō..9V.u.Ō..¡..Ō...v=.vªhÚ. 000100
 800A76FF 0C76FFD8 8E0571B8 1E565700 001AC8CB C95F5E1F 0000E900 00FFFF9A .....Ō...^_èüà...WV.¡q..Å.v..v.. 000120
 EA4680FA 76FF012F E9EE4688 0006E903 7500003D EE468900 0005819A 5016FA46 Fª.P......FŸ=..u.Ō...FŸŌ/..vª.Fō 000140
 4680EA76 FFEC76FF 0111E9EE 46880006 E9037500 0030EE46 89000005 9F9A5016 .P......FŸ=..u.Ō...FŸŌ...vš.vō.F 000160
 80EA76FF EC76FF00 F0E9EE46 880006E9 03750000 30EE4689 000005C0 9A5016E6 Ì.P.à....FŸ=..u.Ō...FŸÒÞ..vš.vō. 000180
 0A76FF0C 76FF00CF E9EE4688 0006E903 7500003D EE468900 0004869A 5016F646 F-.P......FŸ=..u.Ō...FŸŌü..v..v. 0001A0
 EE468800 06E90375 00003DEE 46890000 04AF9A50 16F04680 066AE676 FFE876FF .vÒ.v|j..FÞ.P.£....FŸ=..u.Ō...FŸ 0001C0
 F076C402 E3C1F45E 88F446FF 0003E900 00F446C7 FC4689FE 46890000 8800A6E9 ŌÏ.¡...F±.F=úF¶..Ō...F¶.^¶èD.ávÞ 0001E0
```

Dump of file SATURN:[PCCOMMON.DUMP.DLL]ANFORM.TMP;1 on 18-APR-1990 10:36:51.25
File ID (512,24,0)   End of file block 29 / Allocated 32

Virtual block number 20 (00000014), 512 (0200) bytes

F276FF00 78E9F446 880006E9 03750000 3DF44689 00000197 9A5016EC 468DF076 vÞ.Fš.P......F¶=..u.Õ...F¶Õ(..v· 000000
76FF005A E9F44688 0006E903 75000030 F4468900 0001B89A 5016FA46 8DF076FF .vÞ.Fª.P.¡....F¶=..u.Õ...F¶ÕZ..v 000020
39F8568B F64688F4 46890000 FFFF9A50 16F6468D 086AEC76 FFEE76FF 0A76FF0C ..v..vŸ.všj..F-.P......F¶.F-.V½9 000040
681E00E5 68FA76FF FC76FF00 23E90000 880006E9 03751056 390008E9 03740E46 F.t.Õ..9V.u.Õ..¡..Õ#..v=.vªhÌ..h 000060
000AC8C8 C95F5E1F 0000E900 00FFFF9A 00E568F0 76FFF276 FF0000FF FF9A00CA ò.......v·.vÞhÌ......Õ...^_èùà.. 000080
16FA4680 FE76FF00 0002B99A 5016FE46 8D0A76FF 0C76FFD8 8E02A9B8 1E565700 .WV.¡`..Ä.v..v..F±.P.¿....v±.Fª. 0000A0
740E4639 F8568BF6 46880000 02F89A50 16F6468D FA76FFFC 76FF0000 02D79A50 P.■....v•.vª.F-.P.½....F-.V½9F.t 0000C0
E9037514 56390008 E9037412 4639F856 8BF6468B 001CE903 75105639 0008E903 .Õ..9V.u.Õ...F-.V½9F.t.Õ..9V.u.Õ 0000E0
1AC8CBC9 5F5E1F00 00E90000 FFFF9A00 E068FA76 FFFC76FF 0011E900 00880006 ..¡..Õ...v=.vªhÅ......Õ...^_èùà. 000100
00003DEE 46890000 03A59A50 16F6468D 0A76FF0C 76FFD88E 0395B81E 56570000 ..WV.¡...Ä.v..v..F-.P.É....F̄Ÿ=.. 000120
03750000 3DEE4689 000003B2 9A5016EA 468DF676 FF0129E9 EE468800 06E90375 u.Õ...FŸÕ)..v-.Fõ.P.ý....FŸ=..u. 000140
75000030 EE468900 0003C29A 5016E646 8DEA76FF EC76FF01 08E9EE46 880006E9 Õ...FŸÕ...vš.võ.F¦.P.ö....FŸ=..u 000160
00003DEE 46890000 03199A50 16F2468D EA76FFEC 76FF00EA E9EE4688 0006E903 .Õ...FŸÕõ..vš.võ.F·.P......FŸ=.. 000180
E19A5016 FC468009 6AE676FF E876FF0A 76FF0C76 FF00C9E9 EE468800 06E90375 u.Õ...FŸÕè..v..v..vÕ.vÌj..F•.P.Å 0001A0
FF0003E9 0000F046 C7F84689 FA468900 00880009 E9037500 003DEE46 89000001 ....FŸ=..u.Õ..¡...Fª.F½úFÞ..Õ... 0001C0
FC76C402 E3C1F05E 8B003CE9 03750240 0826008B 26FC76C4 02E3C1F0 5E8BF046 FÞ.^ÞèD.áv•&..&.@.u.Õ<..^ÞèD.áv• 0001E0

Dump of file SATURN:[PCCOMMON.DUMP.DLL]ANFORM.TMP;1 on 18-APR-1990 10:36:51.25
File ID (512,24,0)   End of file block 29 / Allocated 32

Virtual block number 19 (00000013), 512 (0200) bytes

```
4688001C E9037510 56390008 E903740E 4639F856 88F64688 00000057 9A5016F6 -.P.W....F-.VY9F.t.Õ..9V.u.Õ...F 000000
FA76FFFC 76FF0011 E9000088 0006E903 75145639 0008E903 74124639 F85688F6 -.VY9F.t.Õ..9V.u.Õ..¡..Õ...v=.v* 000020
FF0C76FF D88E00C7 881E5657 00001AC8 CBC95F5E 1F0000E9 00850928 9A00CE68 hö..(.ç.Õ...^_èüà...WV.¡ú..Ä.v.. 000040
FA76FF01 2FE9EE46 880006E9 03750000 30EE4689 00000007 9A5016FA 46800A76 v..F*.P.■....FŸ=..u.Õ...FŸÕ/..v* 000060
76FFEC76 FF0111E9 EE468800 06E90375 000030EE 46890000 00E49A50 16EA468D .Fõ.P.Õ....FŸ=..u.Õ...FŸÕ...v$.v 000080
FFEC76FF 00F0E9EE 46880006 E9037500 0030EE46 89000000 F49A5016 E6468DEA õ.F|.P.¶....FŸ=..u.Õ...FŸÕÞ..v$. 0000A0
0C76FF00 CFE9EE46 880006E9 03750000 30EE4689 00000078 9A5016F6 468DEA76 võ.F-.P.x....FŸ=..u.Õ...FŸÕü..v. 0000C0
0006E903 75000030 EE468900 00FFFF9A 5016FC46 8D046AE6 76FFE876 FF0A76FF .v..vÕ.v|j..F=.P......FŸ=..u.Õ.. 0000E0
02E3C1F4 5E88F446 FF0003E9 0000F446 C7F04689 F2468900 008800A6 E9EE4688 .FŸÕ!.¡...F·.FÞúF¶..Õ...F¶.^¶èD. 000100
39261056 880E4688 FC76C402 E3C1F45E 88003CE9 03750240 08260088 26FC76C4 áv=£..£.ə.u.Õ<..^¶èD.áv=.F..V.£9 000120
89025088 26008826 FC76C402 E3C1F45E 880019E9 03740250 39260022 E9037400 .t.Õ".£9P.t.Õ...^¶èD.áv=£..£.P.. 000140
0E76FF10 76FF2715 680A76FF 0C76FFFC 76FFFE76 FFFFACE9 0003E9F2 5689F046 FÞ.V·Õ..Õ˜..v±.v=.v..v.h.'.v..v. 000160
76FFEC76 FF0011E9 00008800 06E90374 F24608F0 468810C4 830000FF FF9A006A j.......á..FÞ.F·t.Õ..¡..Õ...v$.v 000180
0C76FFD8 8E014888 1E565700 0014C8CB C95F5E1F 0000E901 3609289A 00CE68EA õho..(.6.Õ...^_èüà...WV.¡H..Ä.v. 0001A0
76FF00BA E9F44688 0006E903 75000030 F4468900 0001589A 5016FE46 8D0A76FF .v..F±.P.X....F¶=..u.Õ...F¶Õ¤..v 0001C0
FFF276FF 009CE9F4 46880006 E9037500 0030F446 89000001 769A5016 F0468DFE ±.FÞ.P.v....F¶=..u.Õ...F¶Õ...v·. 0001E0
```

```
Dump of file SATURN:[PCCOMMON.DUMP.DLL]ANFORM.TMP;1 on 18-APR-1990 10:36:51.25
File ID (512,24,0)   End of file block 29 / Allocated 32

Virtual block number 18 (00000012), 512 (0200) bytes

0202D800 08185E02 05035700 08161002 0502A700 0607D002 03012E00 051A1802 ..........i...Ï........W...^...Á.. 000000
03023300 05193702 0301B300 05186802 03003A00 04130802 03033900 08177802 .x...9........:...k...°...7...3.. 000020
05034300 0817BA02 02114200 01171A00 0500BF00 04143302 03004D00 0212F901 .°...M...3...¢........B...¤...C.. 000040
05024200 05018802 03004600 04138E02 03013D00 05119A02 03036300 08163502 .S...c........=........F........B.. 000060
05034D00 08179902 0201C400 05196802 0302EB00 08153102 050AAA00 02194500 .E...`...1...Š...h...á........M.. 000080
02130100 0119ED00 05000100 0400E702 03064F00 01150E00 05036E00 08167702 .w...n........O...Ó...Ì...Ú...I.. 0000A0
0302F900 08152B02 05037900 08165602 0502D800 08185B02 02035700 08160002 .....W...[...Ä...V...y...+...ª.. 0000C0
03005D00 040FD102 03044C00 0C19C802 02015300 0518D102 03010200 0519AC02 .¯...ø...Ì...S...à...L...Ì...}.. 0000E0
FF0C76FF D88EFFFF 881E5657 000010C8 00000000 00000000 0003AF00 0A0CEA02 .ô...£............à...WV.¡...Á.v.. 000100
FE76FF00 8DE9F846 880006E9 03750000 3DF84689 0000FFFF 9A5016FE 468D0A76 v..F±.P......F½=..u.Ö...F½Ö...v± 000120
76FFF676 FF006FE9 F8468800 06E90375 00003DF8 46890000 FFFF9A50 16F4468D .F¶.P......F½=..u.Ö...F½Öo..v¬.v 000140
FFF676FF 004EE9F8 46880006 E9037500 003DF846 890000FF FF9A5016 F0468DF4 ¶.FÞ.P......F½=..u.Ö...F½ÖN..v¬. 000160
F0468800 2DE9F846 880006E9 03750000 3DF84689 0000FFFF 9A5016FA 468DF476 v¶.Fª.P......F½=..u.Ö...F½Ö-..FÞ 000180
68F476FF F676FF00 11E90000 880006E9 03751056 390008E9 03740E46 39F2568B .V·9F.t.Ö..9V.u.Ö..¡..Ö...v¬.v¶h 0001A0
76FF0C76 FFD88E00 08881E56 5700000A C8C8C95F 5E1F0000 E9FFFF02 E49A00E7 Ö..Ö...Ö...^_èùà...WV.¡...Á.v..v 0001C0
468DFA76 FFFC76FF 00000036 9A5016FA 468DFE76 FF000000 189A5016 FE46800A ..F±.P......v̄±.Fª.P.6....v•.vª.F 0001E0
```

```
Dump of file SATURN:[PCCOMMON.DUMP.DLL]ANFORM.TMP;1 on 18-APR-1990 1L:36:51.25
File ID (512,24,0)   End of file block 29 / Allocated 32

Virtual block number 17 (00000011), 512 (0200) bytes

02025C00 05028702 03036300 08163202 0200E000 0404E902 03006004 CAC95F5E ^_èò.'...Ô...Á...2...c........\.. 000000
0200E600 0116F°00 05030500 08156002 0502E400 0114E500 05000000 01191100 ..........Í...ô...m........'...Í.. 000020
02006800 04103E02 0301E200 05198A02 03016200 0513E902 03000000 02192500 .X.........Ô...b........ã...>...k.. 000040
02007F00 02127701 03036E00 08167402 0201ED00 0119A900 0502E800 08152E02 ......Š...`...Ú...t...n...w....... 000060
03047400 0117DA00 05031000 08159202 0503C000 0A135302 03000000 0418C100 .ê.........S...à.............Ö...t.. 000080
0202D800 08139C02 03008700 02125A01 03007700 040F6C02 03008600 02063E01 .>.........l...w...Z..............Ä.. 0000A0
0501F200 05040402 03017200 05140A02 0302F900 08152802 02037900 08165302 .S...y...(...'.........r.........`.. 0000C0
0300FA00 05007302 03000000 01198700 05027600 050F1802 03031A00 0815D402 .Â..............v.............s...'.. 0000E0
03017E00 0514BE02 03030500 08156A02 02032400 08158302 05001300 0212F201 .`.........'...$...j........ƒ...~.. 000100
02009000 04149502 03032E00 08175602 05001E00 02061A01 03020200 0519CE02 .ö..................V................ 000120
02033900 08177B02 05018E00 05000302 03010900 0512AF02 03031000 08158F02 ...........É.........Æ.........(...9.. 000140
05045000 0C030002 03009C00 04106702 03021300 05194802 03031A00 0815D102 .Ì.........H.........g................]... 000160
03032200 0114EB00 05002800 0318F302 03051F00 01150800 050A9F00 0116D800 .Ä....................£...(...Š...".. 000180
05029500 06101A02 03032400 0815B002 02034300 0817BD02 05011800 0510AA02 .¯.........§...C.......$............ 0001A0
03034D00 08179C02 05044C00 0C19CB02 05022200 0519F002 03092800 0116B300 .•...(...þ...".....Ù...L.........M.. 0001C0
03038800 09117602 0300AF00 0400FA02 03032E00 08175302 02046E00 0C034C02 .L...n...S.........'...E...v....... 0001E0
```

```
Dump of file SATURN:[PCCOMMON.DUMP.DLL]ANFORM.TMP;1 on 18-APR-1990 10:36:51.25
File ID (512,24,0)   End of file block 29 / Allocated 32

Virtual block number 16 (00000010), 512 (0200) bytes

6A17FB68 FFFF6800 9E680676 FF0876FF F8468900 00FFFF9A 006A006A 006A006A j.j.j.j.......F½.v..v.h..h..h=.j 000000
187F6818 7C68009F 680676FF 0876FFF8 46890000 14F49A00 6A006A00 6A006A00 .j.j.j.j..¶....F½.v..v.h..h|.h.. 000020
A068189D 6800A06J 0676FF08 76FFF846 89000018 8C9A006A 006A006A 006A006A j.j.j.j.j.......F½.v..v.h..h..h. 000040
6817F868 00A16806 76FF0876 FFF84689 000018AD 9A006A00 6A006A00 6A006A18 .j.j.j.j.j..Ù....F½.v..v.hÀ.h½.h 000060
1E565700 0008C8C8 C95F5E1F F8468900 00184A9A 006A006A 006A006A 006A183D =.j.j.j.j.j..J....F½.^_èùà...WV. 000080
0006E903 7500003D F8468900 0014D19A 5016FA46 800676FF 0876FFD8 8E14AE88 ¡Ù..Á.v..v..F°.P.Ì....F½=..u.Õ.. 0000A0
E9037500 0030F846 890000FF FF9A5016 FC46800A 6A5C6AFA 76FF0139 E9F84688 .F½Õ9..v°j\j..F=.P......F½=..u.Õ 0000C0
FF0876FF FC76FFFE 76FF04C4 83198414 A69A0676 FF0876FF 0117E9F8 46880006 ...F½Õ...v..v..Ì....á..v±.v=.v.. 0000E0
76FF0876 FF0000FF FF9AFC76 FFFE76FF 0676FF08 76FF08C4 8319420B 139A0676 v....B..á..v..v..v±.v°......v..v 000100
0876FF00 C2E9F846 880006E9 03750000 3DF84689 0000FFFF 9AFFFF68 FFFF6806 .h..h........F½=..u.Õ...F½Õò..v. 000120
0876FF00 A2E9F846 880006E9 03750000 3DF84689 0000FFFF 9A006A00 6A0676FF .v.j.j.......F½=..u.Õ...F½ÕÀ..v. 000140
FF0080E9 F8468800 06E90375 000030F8 46890000 FFFF9AFF FF6819A6 680676FF .v.hÌ.h........F½=..u.Õ...F½Õ... 000160
5EE9F846 880006E9 03750000 30F84689 0000FFFF 9AFFFF68 19EA6806 76FF0876 v..v.hõ.h........F½=..u.Õ...F½Õ^ 000180
F8468800 06E90375 000030F8 46890000 FFFF9AFF FF68FFFF 680676FF 0876FF00 ..v..v.h..h........F½=..u.Õ...F½ 0001A0
880006E9 03750000 30F84689 0000FFFF 9AFFFF68 14E26806 76FF0876 FF003CE9 Õ<..v..v.hã.h........F½=..u.Õ... 0001C0
1F0000E9 0000FFFF 9A000036 FF2600CC 068E00C8 680676FF 0876FF00 1AE9F846 F½Õ...v..v.hà...a.&.6.......Õ... 0001E0
```

```
Dump of file SATURN:[PCCOMMON.DUMP.DLL]ANFORM.TMP;1 on 18-APR-1990 10:36:51.25
File ID (512,24,0)   End of file block 29 / Allocated 32

Virtual block number 15 (0000000F), 512 (0200) bytes

 165F9A00 16681E?0 6AFFFF68 FFFF6800 6A006A00 D7680676 FF0876FF F8468900 ..F½.v..v.h■.j.j.h..h..j..h..._. 000000
 809A0016 681E006A FFFF68FF FF68006A 006A0006 680676FF 0876FFF8 46890000 ...F½.v..v.h●.j.j.h..h..j..h.... 000020
 9A001668 1E006AFF FF68FFFF 68006A00 6A00D568 0676FF08 76FFF846 89000016 ....F½.v..v.hf.j.j.h..h..j..h... 000040
 C09A002C 681E016* 006A006A 006A006A 00D06806 76FF0876 FFF84689 0000169F .....F½.v..v.hÅ.j.j.j.j.j..h,..å 000060
 9A002C68 1E016A0  6A006AFF FF6816D5 6800CE68 0676FF08 76FFF846 89000016 ....F½.v..v.hö.hf.h..j.j.j..h,.. 000080
 002C681E 006AFFFF 6816F668 006A006A 00C06806 76FF0876 FFF84689 000016E1 Å....F½.v..v.hë.j.j.h-.h..j..h,. 0000A0
 2C681E00 6AFFFF68 17176800 6A006A00 CC680676 FF0876FF F8468900 0017029A ......F½.v..v.hä.j.j.h..h..j..h, 0000C0
 681E006A FFFF6817 D768006A 006A00C8 680676FF 0876FFF8 46890000 17239A00 ..#....F½.v..v.hù.j.j.h■.h..j..h 0000E0
 42681E00 6A006A00 6A006A00 6A00E868 0676FF08 76FFF846 89000017 429A002C ,..B....F½.v..v.h$.j.j.j.j.j..hB 000100
 681E006A 006A006A FFFF68FF FF6800ED 680676FF 0876FFF8 46890000 17639A00 ..c....F½.v..v.hÜ.h..h..j.j.j..h 000120
 1E006AFF FF68FFFF 68006A00 6A00EE68 0676FF08 76FFF846 89000017 849A0042 B.......F½.v..v.hŸ.j.j.h..h..j.. 000140
 006AFFFF 68FFFF68 006A006A 00EF6806 76FF0876 FFF84689 000017A5 9A004268 hB..E....F½.v..v.hy.j.j.h..h..j. 000160
 6AFFFF68 FFFF6800 6A006A00 F0680676 FF0876FF F8468900 0017C69A 0042681E .hB..ó....F½.v..v.hP.j.j.h..h..j 000180
 006A006A FFFF68FF FF6800CA 680676FF 0876FFF8 46890000 17E79A00 42681E00 ..hB..Ó....F½.v..v.hò.h..h..j.j. 0001A0
 6A006A18 1C681819 68009C68 0676FF08 76FFF846 89000018 089A006A 006A006A j.j.j.......F½.v..v.h..h..h..j.j 0001C0
 006AFFFF 68183A68 00906806 76FF0876 FFF84689 00001829 9A006A00 6A006A00 .j.j.j..)....F½.v..v.h..h:.h..j. 0001E0
```

```
Dump of file SATURN:[PCCOMMON.DUMP.DLL]ANFORM.TMP;1 on 18-APR-1990 10:36:51.25
File ID (512,24,0)   End of file block 29 / Allocated 32

Virtual block number 14 (0000000E), 512 (0200) bytes

 E9037500 003DF646 890000FF FF9A5016 FC468D04 6AF276FF F476FFF8 76FFFA76 v..v%.v¶.v.j..F..P......F-=..u.Ô 000000
 57882607 8B26FC5E C40017E9 03750247 00260788 26FC5EC4 0057E9F6 46880006 ...F-ÕW.&^.&..&.G.u.Õ..&^.&..&.W 000020
 0088065E C407892. 02478926 0000880A 5EC40000 E9025789 26078926 0A5EC402 .&^.&..&.W.Õ..&^.¡..&.G.&..&^.¡. 000040
 1F0000E9 00008800 0010909A FC76FFFE 76FFF876 FFFA76FF 07892602 47892600 .&.G.&...v'.v%.v±.v......¡..Õ... 000060
 115A9A50 16FA468D 0676FF08 76FFD88E 1309881E 56570000 08C8000C CAC95F5E ^_èò..à...WV.¡\..Ä.v..v..F'.P.Z. 000080
 E7680676 FF0876FF F8468900 0002359A 5016FE46 8D0676FF 0876FFF8 46890000 ...F%.v..v..F±.P.5....F%.v..v.hÔ 0000A0
 76FF0876 FFF84689 00001517 9A006A00 6A006AFF FF681505 68FFFF68 14E86800 .hÒ.h..h..h_.j.j.j.......F%.v..v 0000C0
 76FFF846 89000015 3A9A006A 006A016A FFFF6816 8068FFFF 68150868 00046806 .hâ.h..h..h¯.h..j.j.j..:....F%.v 0000E0
 46890000 15599A00 ^A006A00 6AFFFF68 FFFF68FF FF68FFFF 6800E568 0676FF08 ..v.hî.h..h..h..h..j.j.j..Y....F 000100
 F8468900 00157A9A 0000681E 016A006A 006A006A 006A00E2 680676FF 0876FFF8 %.v..v.hã.j.j.j.j.j..h...z....F% 000120
 46890000 15989A00 0^681E01 6A006A00 6AFFFF68 FFFF6800 E0680676 FF0876FF .v..v.hÁ.h..h..j.j.j..h........F 000140
 89000015 8C9A0000 681E006A FFFF68FF FF68006A 006A000F 680676FF 0876FFF8 %.v..v.hÒ.j.j.h..h..j..h...¥.... 000160
 000015DD 9A000068 1E006AFF FF68FFFF 68006A00 6A000E68 0676FF08 76FFF846 F%.v..v.hß.j.j.h..h..j..h...ï... 000180
 0015FC9A 0000681E 006AFFFF 68FFFF68 006A006A 000D6806 76FF0876 FFF84689 .F%.v..v.hı.j.j.h..h..j..h...•.. 0001A0
 0000161D 9A001668 1E016A00 6A006A00 6A006A00 DA680676 FF0876FF F8468900 ..F%.v..v.hÖ.j.j.j.j.j..h....... 0001C0
 00163E9A 0016681E 016A006A 006AFFFF 68FFFF68 00D86806 76FF0876 FFF84689 .F%.v..v.hÁ.h..h..j.j.j..h...>.. 0001E0
```

Dump of file SATURN:[PCCOMMON.DUMP.DLL]ANFORM.TMP;1 on 18-APR-1990 10:36:51.25
File ID (512,24,0)   End of file block 29 / Allocated 32

Virtual block number 13 (00000000), 512 (0200) bytes

```
88000207 C7260E5E C408C483 000012C8 9AA476FF 0195680A 76FF0C76 FF0022E9 Ô"..v..v.h...vÊ.Ù....á.á^.&ú.... 000000
76FF0000 0EFE9A50 16844680 486A0277 FF26805E C4AC76FF AE76FF01 85E9A446 FÊÒ...vÚ.v¯á^¯&.w.jK.FÇ.P.±....v 000020
76FFA646 89000012 989A006A 006A006A 006A0165 680477FF 26805EC4 AC76FFAE Û.v¯á^¯&.w.he.j.j.j.j.......F].v 000040
89A04689 000008E1 9A006A00 6AA676FF 006A016A 680477FF 26805EC4 AC76FFAE Û.v¯á^¯&.w.hj.j..v]j.j..Ä....F.. 000060
76FF0022 E9037500 0030A446 890000FF FF9A8076 FF8276FF AC76FFAE 76FFA256 VÅ.vÛ.v¯.vý.v¯.......FÊ=..u.Ô"..v 000080
00EAE9A4 46880002 07C7260E 5EC408C4 83000013 2F9AA476 FF019568 0A76FF0C ..v.h...vÊ./....á.á^.&ú....FÊÒõ. 0000A0
AA76FF00 0010F49A 50520000 10E09A02 77FF2680 5EC4AC76 FFAE76FF 016A006A j.j..vÚ.v¯á^¯&.w..Ú...RP.¶....v` 0000C0
10FF9AA8 76FFAA76 FF002DE9 03750000 30A44689 00000F27 9A008268 1EA876FF .v`.hý..'....FÊ=..u.Ô-..v`.v`... 0000E0
46880002 07C7260E 5EC408C4 83000013 729AA476 FF019568 0A76FF0C 76FF0000 ...v..v.h...vÊ.r....á.á^.&ú....F 000100
000030A4 46890AC4 830000FF FF9A006A A076FFA2 76FFA876 FFAA76FF 00[illegible]9A4 ÊÒ...v`.v`.vÅ.v.j.......á..FÊ=.. 000120
0207C726 0E5EC408 C4830000 10C69AA4 76FF0195 680A76FF 0C76FF00 22E9[illegible]375 u.Ô"..v..v.h...vÊ.ó....á.á^.&ú.. 000140
000013AA 9A009F68 1476FF16 76FF0000 131E9AA8 76FFAA76 FF0043E9 A4468300 ..FÊÒC..v`.v`.......v..v.h...`... 000160
260E5EC4 00001100 9A00A168 1476FF16 76FF0000 13889A00 A0681476 FF1676FF .v..v.h...j....v..v.hÅ......á^.& 000180
1076FF08 8E114A88 1E565700 000EC800 12CAC95F 5E1F0000 E9000088 000307C7 ú...j..Ô...^_èò..à...WV.jJ..Å.v. 0001A0
76FF00A1 E9F6468B 0006E903 75000030 F6468900 0012149A 5016F246 8D0E76FF .v..F`.P......F~=..u.Ô...F-ÔÅ..v 0001C0
FF0080E9 F6468800 06E90375 000030F6 46890000 11079A50 16F84680 0E76FF10 ..v..F½.P.■....F~=..u.Ô...F-Ô... 0001E0
```

```
Dump of file SATURN:[PLCOMMON.DUMP.DLL]ANFORM.TMP;1 on 18-APR-1990 10:36:51.25
File ID (512,24,0)   End of file block 29 / Allocated 32

Virtual block number 12 (0000000C), 512 (0200) bytes

08919A50 16844680 026A37FF 260277FF 269E5EC4 A476FFA6 76FF0056 E9037400 .t.ÕV..vÌ.vÊá^.&.w.&.7j..FÇ.P... 000000
08C48300 0000919A A276FF01 95685016 84468000 2CE90375 000030A2 46890000 ...FÅ=..u.Õ,..FÇ.Ph...vÅ......á. 000020
049E4683 0007E9GJ C2E90000 88000207 C7260E5E C4000000 339AA476 FFA676FF .vÌ.vÊ.3...á^.&ú...¡..Õö.Õ...F.. 000040
AC76FFAE 76FFA876 FFAA76FF 0000004A 9AB076FF B276FFA4 76FFA676 FFFF26E9 Õ&..vÌ.vÊ.vý.v¯.J....v´.v´.vÛ.v¯ 000060
680A76FF 0C76FF00 22E90375 000030A2 46890000 FFFF9A00 6A006A50 16844680 .FÇ.Pj.j.......FÅ=..u.Õ"..v..v.h 000080
FF016A00 6A0060E9 A2468800 0207C726 0E5EC408 C4830000 0E1A9AA2 76FF0195 ...vÅ......á.á^.&ú....FÅÕ'.j.j.. 0000A0
E79AA476 FFA676FF 00000C1F 9A505200 000C189A 0277FF26 AC5EC4A8 76FFAA76 v´.v´á^¯&.w......RP......vÌ.vÊ.Õ 0000C0
FF000011 299A00A0 681476FF 1676FF00 0011189A 009F6814 76FF1676 FF00000F ....v..v.h........v..v.h...).... 0000E0
CAC95F5E 1F0000E9 00008800 0307C726 0E5EC400 0000819A 00A16814 76FF1676 v..v.hÀ..ÿ...á^.&ú...¡..Õ...^_èò 000100
46890000 00FE9A50 16AC4680 1476FF16 76FFD88E 0DEE881E 56570000 64C80012 ..ad..WV.¡Ÿ..Ä.v..v..F¯.P.±..¯.f 000120
0E5EC408 C4830000 11869AA4 76FF0195 680A76FF 0C76FF00 22E90375 000030A4 Ê=..u.Õ"..v..v.h...vÊ.Ñ....á.á^. 000140
46890000 0E3E9A50 16804680 1276FF14 76FF1676 FF023FE9 A4468800 0207C726 &ú....FÊÕ?..v..v..v..F¯.P.>....f 000160
0E5EC408 C4830000 11F39AA4 76FF0195 680A76FF 0C76FF00 22E90375 000030A4 Ê=..u.Õ"..v..v.h...vÊ.µ....á.á^. 000180
0030A446 8900000E 889A5016 A8468014 76FF1676 FF01FFE9 A4468800 0207C726 &ú....FÊÕ...v..v..F´.P.¡....FÊ=. 0001A0
07C7260E 5EC408C4 83000012 309AA476 FF019568 0A76FF0C 76FF0022 E9037500 .u.Õ"..v..v.h...vÊ.O....á.á^.&ú. 0001C0
03750000 30A44689 00000E7B 9A50169C 46801476 FF1676FF 01C2E9A4 46880002 ...FÊÕö..v..v..F..P.(....FÊ=..u. 0001E0
```

```
Dump of file SATU~N:[PCCOMMON.DUMP.DLL]ANALDESK.TMP;1 on 18-APR-1990 10:36:25.56
File ID (485,24,(.   End of file block 102 / Allocated 104

Virtual block number 25 (00000019), 512 (0200) bytes

 76FF0876 FF018B68 016A08C4 83053403 239A0676 FF0876FF 01A86801 6A08C483 .á.j.h´..v..v..#.4..á.j.h£..v..v 000000
 8968016A 08C48305 5A03239A 0676FF08 76FF01AF 68016A08 C4830547 03239A06 ..#.G..á.j.h£..v..v..#.Z..á.j.h¿ 000020
 0003E900 01B80006 E90375E4 4608E246 8B08C483 05850323 9A0676FF 0876FF01 ..v..v..#....á..Fã.Fõu.Õ..¡..Õ.. 000040
 01A868E8 76FF08C4 83059903 239A0676 FF0876FF 01AA68E8 76FFE846 89000088 ¡...FÒ.vÒh¯..v..v..#....á..vÒh¨. 000060
 8305C103 239A0676 FF0876FF 01AC68E8 76FF08C4 8305AD03 239A0676 FF0876FF .v..v..#.Ù..á..vÒh¯..v..v..#.é.. 000080
 FF0876FF 01B868E8 76FF08C4 83050503 239A0676 FF0876FF 01AE68E8 76FF08C4 á..vÒhÛ..v..v..#.ſ..á..vÒh¡..v.. 0000A0
 7E8308C4 83060703 239A0676 FF0876FF 01B668E8 76FF08C4 8305E903 239A0676 v..#.Õ..á..vÒhÑ..v..v..#....á..- 0000C0
 6A08AEE9 08C48306 1D03239A 0676FF08 76FF01B3 68E876FF E8468940 C01B01EA ð..áâ.FÒ.vÒh°..v..v..#....á.ðÜ.j 0000E0
 03239A06 76FF0876 FF01A768 016A08C4 83063003 239A0676 FF0876FF 01A66801 .hÎ..v..v..#.0..á.j.hÎ..v..v..#. 000100
 01816801 6A08C483 06590323 9A0676FF 0876FF01 8268016A 0885E908 C4830646 F..á.Õ..j.hý..v..v..#.Y..á.j.hÝ. 000120
 76FF0180 68E876FF E8468940 C01B01EA 7E8308C4 83045003 239A0676 FF0876FF .v..v..#.P..á..~õ..áâ.FÒ.vÒh¯..v 000140
 FF018468 E876FFE8 468940C0 1B01EA7E 83083EE9 08C48306 9803239A 0676FF08 ..v..#....á.Õ>..~õ..áâ.FÒ.vÒhÇ.. 000160
 C483060A 03239A06 76FF0876 FF018568 E876FF08 C48306AC 03239A06 76FF0876 v..v..#.¯..á..vÒhç..v..v..#.Ö..á 000180
 B068E876 FFE84689 00008800 03E90001 B80006E9 0375E446 08E24688 0809E908 .Õ...Fã.Fõu.Õ..¡..Õ..¡...FÒ.vÒh§ 0001A0
 07020323 9A0676FF 0876FF01 BF68E876 FF08C483 06EE0323 9A0676FF 0876FF01 ..v..v..#.Ÿ..á..vÒhe..v..v..#... 0001C0
 0876FF01 C168E876 FF08C483 07160323 9A0676FF 0876FF01 C068E876 FF08C483 .á..vÒhá..v..v..#....á..vÒhé..v. 0001E0

Dump of file SATURN:[PCCOMMON.DUMP.DLL]ANALDESK.TMP;1 on 18-APR-1990 10:36:25.56
File ID (485,24,0)   End of file block 102 / Allocated 104

Virtual block number 26 (0000001A), 512 (0200) bytes

 FF08C483 073E0323 9A0676FF 0876FF01 C268E876 FF08C483 072A0323 9A0676FF .v..#.*..á..vÒhô..v..v..#.>..á.. 000000
 9A0676FF 0876FF01 C568E876 FF08C483 07520323 9A0676FF 0876FF01 C468E876 vÒhá..v..v..#.R..á..vÒhé..v..v.. 000020
 C768E876 FF08C483 077A0323 9A0676FF 0876FF01 C668E876 FF08C483 07660323 #.f..á..vÒhó..v..v..#.z..á..vÒhú 000040
 07A20323 9A0676FF 0876FF01 C968E876 FF08C483 078E0323 9A0676FF 0876FF01 ..v..v..#....á..vÒhè..v..v..#.Å. 000060
 0876FF01 CC68E876 FF08C483 07B60323 9A0676FF 0876FF01 CA68E876 FF08C483 .á..vÒhò..v..v..#.Ñ..á..vÒhä..v. 000080
 76FF01CD 68E876FF E8468940 C01B01EA 7E8309FF E908C483 07D70323 9A0676FF .v..#.■..á.Õ...~õ..áâ.FÒ.vÒhë..v 0000A0
 08C48307 FF03239A 0676FF08 76FF01D1 68E876FF 08C48307 EB03239A 0676FF08 ..v..#.Š..á..vÒhl..v..v..#....á. 0000C0
 0676FF08 76FF01E0 68E876FF 08C48308 1303239A 0676FF08 76FF01D6 68E876FF .vÒh#..v..v..#....á..vÒhÁ..v..v. 0000E0
 76FF0876 FF01CE68 E876FFE8 468940C0 1B01EA7E 8309A2E9 08C48308 3403239A .#.4..á.ÕÅ..~õ..áâ.FÒ.vÒhö..v..v 000100
 E876FF08 C483085C 03239A06 76FF0876 FF01CF68 E876FF08 C4830848 03239A06 ..#.H..á..vÒhü..v..v..#.\..á..vÒ 000120
 76FFE846 8940C01B 01EA7E83 0959E908 C483087D 03239A06 76FF0876 FF01D068 hÅ..v..v..#.)..á.ÕY..~õ..áâ.FÒ.v 000140
 239A0676 FF0876FF 01D368E8 76FF08C4 83089103 239A0676 FF0876FF 01D268E8 Òh#..v..v..#....á..vÒh£..v..v..# 000160
 01D568E8 76FF08C4 83088903 239A0676 FF0876FF 01D468E8 76FF08C4 8308A503 .£..á..vÒhâ..v..v..#.¿..á..vÒhſ. 000180
 D768E876 FFE84689 40C01B01 EA7E8308 FCE908C4 83080A03 239A0676 FF0876FF .v..v..#.Ö..á.Õ=..~õ..áâ.FÒ.vÒh■ 0001A0
 09020323 9A0676FF 0876FF01 D868E876 FF08C483 08EE0323 9A0676FF 0876FF01 ..v..v..#.Ÿ..á..vÒhÁ..v..v..#... 0001C0
 0876FF01 DA68E876 FF08C483 09160323 9A0676FF 0876FF01 D968E876 FF08C483 .á..vÒhl..v..v..#....á..vÒhö..v. 0001E0

Dump of file SATURN:[PCCOMMON.DUMP.DLL]ANALDESK.TMP;1 on 18-APR-1990 10:36:25.56
File ID (485,24,0)   End of file block 102 / Allocated 104

Virtual block number 27 (0000001B), 512 (0200) bytes

 FF08C483 093E0323 9A0676FF 0876FF01 DB68E876 FF08C483 092A0323 9A06.6FF .v..#.*..á..vÒhÜ..v..v..#.>..á.. 000000
 9A0676FF 0876FF01 DC68E876 FF08C483 09520323 9A0676FF 0876FF01 DD68E876 vÒhï..v..v..#.R..á..vÒhÉ..v..v.. 000020
 DE68E876 FF08C483 097A0323 9A0676FF 0876FF01 DF68E876 FF08C483 09660323 #.f..á..vÒhÔ..v..v..#.z..á..vÒhß 000040
 68E876FF E8468940 C01B01EA 7E83083B E908C483 09980323 9A0676FF 0876FF01 ..v..v..#....á.Õ;..~õ..áâ.FÒ.vÒh 000060
 0E03239A 0676FF08 76FF01E2 68E876FF 08C48309 AF03239A 0676FF08 76FF01E1 Å..v..v..#.£..á..vÒhã..v..v..#.. 000080
 76FF01E4 68E876FF 08C48309 D703239A 0676FF08 76FF01E3 68E876FF 08C48305 ..á..vÒhD..v..v..#.■..á..vÒhõ..v 0000A0
 08C4830A 1903239A 0676FF08 76FF01E5 68E876FF 08C48309 EB03239A 0676FF08 ..v..#.Š..á..vÒhÎ..v..v..#....á. 0000C0
 01E868E8 76FFE846 89000088 0003E900 01B80006 E90375E4 4608E246 8807CAE9 Õò..Fã.Fõu.Õ..¡..Õ..¡...FÒ.vÒhò. 0000E0
 830A4E03 239A0676 FF0876FF 01E768E8 76FF08C4 830A2D03 239A0676 FF0876FF .v..v..#.-..á..vÒhÓ..v..v..#.N.. 000100
 0A620323 9A0676FF 0876FF01 EA68E876 FFE84689 40C01B01 EA7E8307 88E908C4 á.Õ...~õ..áâ.FÒ.vÒhõ..v..v..#.b. 000120
 0876FF01 F468E876 FF08C483 0A760323 9A0676FF 0876FF01 F368E876 FF08C483 .á..vÒhµ..v..v..#.v..á..vÒh¶..v. 000140
 FF08C483 0A9E0323 9A0676FF 0876FF01 F568E876 FF08C483 0A8A0323 9A0676FF .v..#....á..vÒh‰..v..v..#....á.. 000160
 9A0676FF 0876FF01 FB68E876 FF08C483 0AB20323 9A0676FF 0876FF01 F968E876 vÒh°..v..v..#.ý..á..vÒh«..v..v.. 000180
 FE68E876 FF08C483 0ADA0323 9A0676FF 0876FF01 FC68E876 FF08C483 0AC60323 #.ó..á..vÒh•..v..v..#.Ö..á..vÒh± 0001A0
 08190323 9A0676FF 0876FF02 0768E876 FF08C483 0AEE0323 9A0676FF 0876FF01 ..v..v..#.Ÿ..á..vÒh...v..v..#... 0001C0
 01F668E8 76FFE846 89000088 0003E900 01B80006 E90375E4 4608E246 8808C483 .á..Fã.Fõu.Õ..¡..Õ..¡...FÒ.vÒh-. 0001E0
```

Dump of file SATURN:[PCCOMMON.DUMP.DLL]ANALDESK.TMP;1 on 18-APR-1990 10:36:25.56
File ID (485,24,0)   End of file block 102 / Allocated 104

Virtual block number 28 (0000001C), 512 (0200) bytes

830B4903 239A0676 FF0876FF 01F768E8 76FF08C4 830B2003 239A0676 FF0876FF .v..v..#.·..á..vÒh%..v..v..#.I.. 000000
016A08C4 830B5C0. 239A0676 FF0876FF 01EB6801 6A011BE9 E6468806 88E908C4 á.Õ...FIÕ..j.hS..v..v..#.\..á.j. 000020
9A0676FF 0876.F01 ED68016A 0128E908 C4830B72 03239A06 76FF0876 FF01EC68 hì..v..v..#.r..á.Õ(.j.hÜ..v..v.. 000040
8D5016F0 468D1D82 6837FF26 F45EC400 00F246C7 0068F046 C708C483 0BBF0323 #.¢..á.úFÞh.úF·..á^¶&.7hý..FÞ.P. 000060
E8468900 00B80003 E90001B8 0006E903 75F24608 F0468B00 000C1E9A 5016EC46 Fì.P......FÞ.F·u.Õ..|..Õ..|...FÒ 000080
FF0876FF 01ED6801 6A00C5E9 08C48308 D503239A 0676FF08 76FF01F1 68E876FF .vÒhþ..v..v..#.ï..á.Õé.j.hÜ..v.. 0000A0
68016A08 C48308FB 03239A06 76FF0876 FF01EF68 016A08C4 8308E803 239A0676 v..#.Õ..á.j.hÿ..v..v..#.«..á.j.h 0000C0
37FF26F4 5EC40000 F246C700 68F046C7 08C4830C 4803239A 0676FF08 76FF01F0 Þ..v..v..#.H..á.úFÞh.úF·..á^¶&.7 0000E0
0001B800 06E90375 F2460BF0 46880000 FFFF9A50 16EC468D 5016F046 8D1D8268 hý..FÞ.P.Fì.P......FÞ.F·u.Õ..|.. 000100
003CE908 C4830CA8 03239A06 76FF0876 FF01F168 E876FFE8 46890000 B80003E9 Õ..|...FÒ.vÒhþ..v..v..#.´..á.Õ<. 000120
DFE9FEF6 E9037500 3230FF61 E9037200 68300013 E9037600 69300036 E90039E9 Õ9.Õó.=i.v.Õ..=h.r.Õa.=2.u.Õ-±ÕÕ 000140
83052EE9 FFC4E9FE 82E90377 008230FF CFE90373 008130FF 4EE90375 006C30FF .=l.u.ÕN.=..s.Õü.=..w.Õý±Õá.Õ... 000160
E876FF08 C4830C8C 03239A06 76FF0876 FF01FF68 E876FFE8 468940C0 1B01EA7E -õ..àa.FÒ.vÒh...v..v..#.¥..á..vÒ 000180
03239A06 76FF0876 FF020168 E876FF08 C4830CD0 03239A06 76FF0876 FF020068 h...v..v..#.À..á..vÒh...v..v..#. 0001A0
FF020368 E876FF08 C4830CF8 03239A06 76FF0876 FF020268 E876FF08 C4830CE4 õ..á..vÒh...v..v..#.½..á..vÒh... 0001C0
C4830D20 03239A06 76FF0876 FF020468 E876FF08 C4830D0C 03239A06 76FF0876 v..v..#....á..vÒh...v..v..#. ..á 0001E0

Dump of file SATURN:[PCCOMMON.DUMP.DLL]ANALDESK.TMP;1 on 18-APR-1990 10:36:25.56
File ID (485,24,0)   End of file block 102 / Allocated 104

Virtual block number 29 (0000001D), 512 (0200) bytes

76FF0876 FF020668 E876FF08 C4830D34 03239A06 76FF0876 FF020568 E876FF08 ..vÒh...v..v..#.4..á..vÒh...v..v 000000
0000B800 03E90001 B80006E9 0375E446 08E2468B 0481E908 C4830677 03239A06 ..#.w..á.Õ...Fã.FÕu.Õ..|..Õ..|.. 000020
0876FF02 0A68E876 FF08C483 0D760323 9A0676FF 0876FF02 0968E876 FFE84689 .FÒ.vÒh...v..v..#.v..á..vÒh...v. 000040
FF08C483 0D9E0323 9A0676FF 0876FF02 0B68E876 FF08C483 0D8A0323 9A0676FF .v..#....á..vÒh...v..v..#....á.. 000060
9A0676FF 0876FF02 0E68E876 FF08C483 0D820323 9A0676FF 0876FF02 0C68E876 vÒh...v..v..#.ý..á..vÒh...v..v.. 000080
7E8303EF E908C483 0DF20323 9A0676FF 0876FF02 0F68E876 FF08C483 0DC60323 #.ó..á..vÒh...v..v..#.·..á.Õy..~ 0000A0
9A0676FF 0876FF02 1B68E876 FFE84689 0000B800 03E90001 B80006E9 037432E6 12t.Õ..|..Õ..|...FÒ.vÒh...v..v.. 0000C0
1968E876 FF08C483 0E1A0323 9A0676FF 0876FF02 1C68E876 FF08C483 0E060323 #....á..vÒh...v..v..#....á..vÒh. 0000E0
00B80003 E90001B8 0006E903 7468E67E 8308C483 0E430323 9A0676FF u.."6FF02 ..v..v..#.C..á..~Ìht.Õ..|..Õ..|. 000100
76FF0222 68E876FF 08C4830E 5703239A 0676FF08 76FF0221 68E876FF E8 '8900 ..FÒ.vÒh!..v..v..#.W..á..vÒh"..v 000120
0006E903 740081E6 7E81000A E9037500 82E67E81 08C4830E 8A03239A 067.FF08 ..v..#....á..~Ì..u.Õ...~Ì..t.Õ.. 000140
FF08C483 0E9E0323 9A0676FF 0876FF02 1368016A E8468900 00B80003 E90001B8 |..Õ..|...FÒj.h...v..v..#....á.. 000160
9A0676FF 0876FF02 1D68E876 FF08C483 0EB20323 9A0676FF 0876FF02 1468E876 vÒh...v..v..#.ý..á..vÒh...v..v.. 000180
4608E246 8B08C483 0EF10323 9A0676FF 0876FF02 1E68E876 FF08C483 0EC60323 #.ó..á..vÒh...v..v..#.þ..á..Fã.F 0001A0
239A0676 FF0876FF 021168E8 76FFE846 89000088 0003E900 01B80006 E90375E4 Õu.Õ..|..Õ..|...FÒ.vÒh...v..v..# 0001C0
021568E8 76FF08C4 830F1903 239A0676 FF0876FF 021268E8 76FF08C4 830F0503 ....á..vÒh...v..v..#....á..vÒh.. 0001E0

Dump of file SATURN:[PCCOMMON.DUMP.DLL]ANALDESK.TMP;1 on 18-APR-1990 10:36:25.56
File ID (485,24,0)   End of file block 102 / Allocated 104

Virtual block number 30 (0000001E), 512 (0200) bytes

830F4103 239A0676 FF0876FF 021A68E8 76FF08C4 830F2003 239A0676 FF0876FF .v..v..#.·..á..vÒh...v..v..#.A.. 000000
75E44608 E2468802 74E908C4 830F6F03 239A0676 FF0876FF 022068E8 76FF08C4 á..vÒh ..v..v..#.o..á.Õt..Fã.FÕu 000020
8303239A 0676FF08 76FF0216 68E876FF E8468900 00B80003 E90001B8 0006E903 .Õ..|..Õ..|...FÒ.vÒh...v..v..#.. 000040
1B01EA7E 830232E9 08C4830F A303239A 0676FF08 76FF0217 68E876FF 08C4830F ..á..vÒh...v..v..#.É..á.Õ2..~õ.. 000060
0876FF02 2568016A 08C4830F B603239A 0676FF08 76FF0224 68016AE8 468940C0 àa.FÒj.h$..v..v..#.Ñ..á.j.h%..v. 000080
016A08C4 830FDC03 239A0676 FF0876FF 02266801 6A08C483 0FC90323 9A0676FF .v..#.è..á.j.h&..v..v..#.É..á.j. 0000A0
0303239A 0676FF08 76FF0228 68016A08 C4830FEF 03239A06 76FF0876 FF022768 h'..v..v..#.ÿ..á.j.h(..v..v..#.. 0000C0
76FF022B 68E876FF 08C48310 1703239A 0676FF08 76FF022A 68E876FF 08C48310 ..á..vÒh*..v..v..#....á..vÒh+..v 0000E0
08C48310 4103239A 0676FF08 76FF022C 68E876FF 08C48310 2B03239A 0676FF08 ..v..#.+..á..vÒh,..v..v..#.A..á. 000100
76FF0876 FF022F68 016A08C4 83105403 239A0676 FF0876FF 022E6801 6A018AE9 Õ..j.h...v..v..#.T..á.j.h/..v..v 000120
E8468900 00B80003 E90001B8 0006E903 75E44608 E2468808 C483107F 03239A06 ..#....á..Fã.FÕu.Õ..|..Õ..|...FÒ 000140
FF0876FF 02326801 6A0136E9 08C48310 9503239A 0676FF08 76FF0230 68E876FF .vÒh0..v..v..#....á.Õ6.j.h2..v.. 000160
68016A08 C483108B 03239A06 76FF0876 FF023368 016A08C4 8310A803 239A0676 v..#.´..á.j.h3..v..v..#.£..á.j.h 000180
10E10323 9A0676FF 0876FF02 3568016A 08C48310 CE03239A 0676FF08 76FF0234 4..v..v..#.ö..á.j.h5..v..v..#.Ã. 0001A0
76FF0876 FF023768 016A08C4 8309C303 239A0676 FF0876FF 02366801 6A08C483 .á.j.h6..v..v..#.ú..á.j.h7..v..v 0001C0
300053E9 0376F878 E9037501 E03000BB E900BEE9 00C1E908 C4830062 03239A06 ..#.b..á.Õè.Õf.ÕE.=Á.u.Õx¾v.ÕS.= 0001E0

Dump of file SATURN:[PCCOMMON.DUMP.DLL]ANALDESK.TMP;1 on 18-APR-1990 10:36:25.56
File ID (485,24,0)   End of file block 102 / Allocated 104

Virtual block number 31 (0000001F), 512 (0200) bytes

```
7501AF3D F4E3E9?3 7501A53D F3DCE903 7501A43D 001BE903 76F568E9 03750183 *.u.Õh%v.Õ..=£.u.Õ€µ=£.u.ÕÕ¶=£.u 000000
3DF6CCE9 037501CD 3DF677E9 037501CC 3DF575E9 0375018C 3DFFC5E9 F504E903 .Õ.%Õé.=¥.u.ÕuÌ=a.u.Õw~=ë.u.Õä-= 000020
3D0023E9 0376F802 E9037502 083DFF9A E9F762E9 03750106 3DF700E9 03750101 ¦.u.Õ.¼=ø.u.Õb¼Õ..=..u.Õ0«v.Õ#.= 000040
E9F800E9 037501FE 3DF9AEE9 037501EA 3DF886E9 037501E9 3DF87CE9 037501E6 ¦.u.Õ|½=Õ.u.ÕÑ½=Õ.u.ÕÙ*=±.u.Õ.«Õ 000060
E9037502 203DFDE1 E9037502 233DFDA7 E9037502 153DFC34 E9037502 103DFF6A j.=..u.Õ4•=..u.ÕI»=#.u.ÕÃ»=-.u.Õ 000080
0006047F 0203000F CBC95F5E 1F0000E9 000088FF 3FE9FECD E9037502 313DFE81 .±=1.u.Õe±Õ?.¡..Õ...^_èü........ 0000A0
00030404 01030006 00030298 010302D4 00080494 02030000 000310F4 0002000C É...¶............Å................ 0000C0
00060895 02030000 00100462 0002009D 000302C3 01030019 0003033A 01030013 ....:.........ú........b........... 0000E0
00030314 01030058 00030300 010300A5 000600F4 02030030 0003042A 0103009A ....*...=...¶...È........[....... 000100
00000000 00000000 00000000 000000C9 00060472 020302B9 000804D1 0203005C \...1...¿...r...è................. 000120
FE5689FC 46890000 FFFF9A0A 76FF0676 FF0876FF D88EFFFF 881E5657 000004C8 à...WV.¡...Ä.v..v..v.......F•.V± 000140
76FF088E 0008881E 56570000 04C8CBC9 5F5E1F00 00FFFF9A 016AFC76 FFFE76FF .v±.v•j.......^_èùå...WV.¡...Ä.v 000160
1F000000 299A006A FC76FFFE 76FFFE56 89FC4689 00000016 9A0A76FF 0676FF08 ..v..v.......F•¯V±.v±.v•j..)....  000180
86800676 FFFDB486 89FDB686 89000088 D88E003A 881E5657 00024CC8 CBC95F5E ^_èùàL..WV.¡:..Ä¡....Ñ»..Ç».v... 0001A0
86800676 FF096AFF FF?0009A 5016FDC0 8680096A 0676FF00 00FFFF9A 5016FDE2 ã».P......v.j...ä».P.....j..v... 0001C0
FD8E8688 0007E903 7500FD8E 8E83FD8E 86890000 FFFF9A50 16EC4680 5^16FDC0 ã».P.F$.P.......ƒ».ƒƒ».u.Õ....ƒ» 0001E0
```

Dump of file SATURN:[PCCOMMON.DUMP.DLL]ANALDESK.TMP;1 on 18-APR-1990 10:36:25.56
File ID (485,24,0)   End of file block 102 / Allocated 104

Virtual block number 32 (00000020), 512 (0200) bytes

```
07E90375 00FD8E8E 83FD8E86 890000FF FF9A5016 FC4680EC 76FFEE76 FF02CFE9 Õù..v¥.v$.F•.P.......ƒ».ƒƒ».u.Õ. 000000
16FEEA86 80016AFC 76FFFE76 FFEC76FF EE76FF00 FEEA86C6 02AAE9FD 8E868800 ...ƒ»Õ¯.6.Õ±..v¥.v$.v±.v•j...Õ±. 000020
76FFEE76 FF0277E9 FD8E8688 0007E903 7500FD8E 8E83FD8E 86890000 FFFF9A50 P.......ƒ».ƒƒ».u.Õ....ƒ»Õw..v¥.v 000040
FEEA8680 0256E9FD 8E868800 07E90374 8491FD8E 8E81FD8E 86890000 FFFF9AEC $.......ƒ».ƒƒ»..t.Õ....ƒ»ÕV...Õ± 000060
FEEA8680 0064E903 7410F846 F6F04689 000001A2 9A006A00 6A5016F8 46805016 .P.F½.Pj.j..Å....FÞ-F½.t.Õd...Õ± 000080
0040E900 FEEA86C6 0008E903 7500FD8E 8E83FD8E 86890000 FFFF9A01 01685016 .Ph.........ƒ».ƒƒ».u.Õ..6.Õ±.Õa. 0000A0
6A006A50 16F84680 5016FEEA 868008C4 83FFFF00 109A5016 FEEA8680 0F88681E .h....Õ±.P......á...Õ±.P.F½.Pj.j 0000C0
00FEEA86 C60005E9 037410F8 46F60009 E9037400 F07E83F0 46890000 FFFF9A00 .......FÞ.~Þ.t.Õ..~F½.t.Õ..6.Õ±. 0000E0
90681E00 6A0F9868 1E5016FE EA8680FD E286FFFD E486FF01 6A006A00 00FA46C7 úF*..j.j..ÑÕ».Ñã»..Õ±.P.h..j..h. 000100
0124E901 95E90002 880112E9 FD8E8688 FD8E8689 0000FFFF 9A5016FD E8868D0F ...Õ».P.......ƒ»..ƒ»Õ..¡..Õ..Õ$. 000120
006A006A 00000235 9A5016F2 4680056A 00A06802 0036FF26 2B66068E 006A006A j.j...f+&.6..hÙ.j..F·.P.5...j.j. 000140
16FDE886 8D2E6A00 00FFFF9A 5016FD88 8680056A 00AC6802 0036FF26 2B66068E ..f+&.6..h¯.j...¡».P.....j...Õ». 000160
B6FF0027 E90375FD 868608FD 848688FD 869689FD 84868906 C483026F 01789A50 P.x.o..á...Ç»..Ñ»..Ç»..Ñ»u.Õ'..Ñ 000180
FDE686C7 0009E903 7400003D 08C48302 A2008C9A 5016FD88 8680FD84 B6FFFD86 Ñ».ÑÇ»..¡».P...Å..á.=..t.Õ..ú.l» 0001A0
9A5016F2 4680FD84 86FFFD86 86FF0026 E90375FD 868608FD 84868800 54E90001 ..ÕT...Ç»..Ñ»u.Õ&..ÑÑ».ÑÇ».F·.P. 0001C0
6A006A00 01FA46C7 0021E900 03FDE686 C70009E9 03740000 3008C483 0180008C .....á.=..t.Õ..ú.l»..ÕI.úF*..j.j 0001E0
```

Dump of file SATURN:[PCCOMMON.DUMP.DLL]ANALDESK.TMP;1 on 18-APR-1990 10:36:25.56
File ID (485,24,0)   End of file block 102 / Allocated 104

Virtual block number 33 (00000021), 512 (0200) bytes

```
01FA46C7 0048E9F0 46890000 02F69A20 6A006A00 6A006A0F 9F681E01 6A006A01 .j.j..h..j.j.j.j .~....FÞÕH.úF*. 000000
0024E9F0 46890000 FFFF9A20 6A006A00 6A006A0F B2681E01 6A006A01 6A006A00 .j.j.j.j..hý.j.j.j.j ......FÞÕ$. 000020
D6E90375 00033DFE E7E90375 000230FF CBE90375 00013000 1BE9008C E9FFFF8B ¡..Õ..Õ..=..u.Õù.=..u.ÕÕ±=..u.Õ» 000040
50520000 03809A00 6A036A01 6A006AFE 93E90375 01FA7E83 FFDCE9FE ±ÕÉ..~*.u.Õ.±j.j.j.j.j.j.j......RP 000060
0CC483FF FF019C9A 0676FF50 16FDE886 8DFDE686 FF0876FF 0A76FF00 0003879A ......v..v..Ñl»..Õ».P.v.......á. 000080
9A006A01 6A016A00 6A016A00 6A001FE9 FDBE868B 0007E903 75000030 FDBE8689 ..ƒ»=..u.Õ.....ƒ»Õ..j.j.j.j.j.j.j.. 0000A0
6C881E56 5700015C C8CBC95F 5E1F0000 E9FDBE86 880000FF FF9A5052 0000FFFF ....RP.......ƒ»Õ...^_èùå\..WV.¡( 0000C0
E8468912 56881046 8800C846 C600FEC7 86C60001 FEC586C7 00FEA486 C6D88E00 ..Ä6.É±.ú.é±..6.ú±.6Fà..F..V..F$ 0000E0
FFE94689 078826FC 5EC40000 FFFF9A50 16FC4680 0676FFEF 46890646 8BED5689 .VÙ.F..Fý.v..F».P......á^»&...FÕ. 000100
2B66068E FFFF68FF FF68F476 FFF676FF 016A006A 00000085 9A5016F4 46800676 v..F¶.P.....j.j..v~.v¶h..h.....f» 000120
9AF876FF FA76FFFA 5689F846 890000FF FF9A5016 FEA4868D 03006802 0036FF26 &.6..h....É±.P......F½.V*.v*.v½. 000140
0004989A 006A036A 016A006A 016A006A 0073E903 7401F27E 83F24689 0000FFFF .....F·.-·.t.Õs.j.j.j.j.j.j.j..... 000160
9A0676FF 5016FEC7 868D5016 FEA4868D 5016A0876 FF0A76FF 0000049F 9A505200 .RP.......v..v.j....É±.P..ú±.P.v.. 000180
0E76FF50 16C8468D 0031E9F2 468B0006 E9037500 0030F246 8910C483 03580132 2.[..á..F·=..u.Õ...F·Õ1..Fà.P.v. 0001A0
419A5052 0000033A 9A006A01 6A016A00 6A016A00 6A08C483 02440056 9A0C76FF .v..V.D..á.j.j.j.j.j.j.j..:...RP.A 0001C0
0000FECA 86C7D88E 039FB81E 56570001 B4C8CBC9 5F5E1F00 00E9F246 88000003 ....F·Õ...^_èùàÇ..WV.¡...Aú.Õ±.. 0001E0
```

```
Dump of file SATURN:[PCCOMMON.DUMP.DLL]ANALDESK.TMP;1 on 18-APR-1990 10:36:25.56
File ID (485,24,0)   End of file block 102 / Allocated 104

Virtual block number 34 (00000022), 512 (0200) bytes

 76FF0000 05749A50 52000005 609A006A 036A016A 006A016A 006A0C84 E90E468B .F.Ö..j.j.j.j.j.j..m...RP.t....v 000000
 FF1276FF 0000FFFF 9A0676FF 0876FF00 6A1076FF 1276FF00 00FFFF9A 1076FF12 ..v.......v..v.j..v..v.......v.. 000020
 43680305 681076FF '276FF00 00052A9A 006A006A 086A006A 01436803 02681076 v.h..hC.j.j.j.j..*....v..v.h..hC 000040
 006A206A 006A0143 68030768 1076FF12 76FF0000 05439A00 6A006A20 '^006A01 .j.j j.j..C....v..v.h..hC.j.j j. 000060
 000005C7 9A006A00 6A206A00 6A014368 03096810 76FF1276 FF000005 5C'A006A j..\....v..v.h..hC.j.j j.j..ú... 000080
 8E006A00 6A08FAE9 00000444 9A505200 0004309A 006A016A 016A006A 016 006A j.j.j.j.j.j..*...RP.D...Ö*.j.j.. 0000A0
 76FF1276 FF016A00 6A000002 189A5016 A0468050 6A008568 020036FF 26286606 .f+&.6..hç.jP.F..P.....j.j..v..v 0000C0
 006A0126 68036A10 76FF1276 FF000002 D29A206A 006A006A 006A5016 A0468010 ..F..Pj.j.j.j .@....v..v.j.h&.j. 0000E0
 FF9A006A 006A016A 006A0126 68016A10 76FF1276 FF000005 DF9A006A 006A006A j.j.j..Ö....v..v.j.h&.j.j.j.j... 000100
 46880877 E90000FF FF9A016A 006A026A 006A206A 1076FF12 76FF0B8F E90000FF ...Ö...v..v.j j.j.j.j......Öw..F 000120
 FE4E9689 FE4C8689 0000FFFF 9A006A10 76FF1276 FFFECE86 890C4688 9C46890A ..F..F...ö±.v..v.j........L±..N± 000140
 1276FF00 69E90003 E9037501 FECEBE83 0000E903 7505FECE 8E830075 E99C4688 .F.Öu../ö±.u.Ö.../ö±.u.Ö..Öi..v. 000160
 FF1076FF 1276FF98 46890000 06789A00 6A006A00 6A006A01 65689C76 FF1076FF .v..v.he.j.j.j.j..(....F..v..v.. 000180
 FF000007 2C9AFE4C 86FFFE4E 86FF5052 21CA8300 0000022B 98468801 68689C76 v.hh..F.+@....òIRP.ÑN±.ÑL±.,.... 0001A0
 03750308 30000BE9 000EE900 0008609A FE4CB6FF FE4EB6FF 03096810 76FF1276 v..v.h...ÑN±.ÑL±.'...Ö..Ö..*..u. 0001C0
 5016FED8 8680216A 03096810 76FF1276 FF0A55E9 0A46880A CCE90000 E9FF83E9 Ö..Ö..Öa..F.ÖU..v..v.h..jl..À±.P 0001E0

Dump of file SATURN:[PCCOMMON.DUMP.DLL]ANALDESK.TMP;1 on 18-APR-1990 10:36:25.56
File ID (485,24,0)   End of file block 102 / Allocated 104

Virtual block number 35 (00000023), 512 (0200) bytes

 00003004 C4830945 11909A50 16FED886 800016E9 03750128 20C58800 0009299A .)....é-(.u.Ö....À±.P...E..á.=.. 000000
 006A0000 08009A20 6A006A00 6A006A0F D3681E00 6A006A01 6A006A00 66E90374 t.Öf.j.j.j.j..h&.j.j.j.j .....j. 000020
 030D6810 76FF1276 FF000008 9C9A5052 00000895 9A030968 1076FF12 76FF016A j..v..v.h.......RP......v..v.h.. 000040
 6A016A00 6A012668 016A1076 FF1276FF 00000744 9A006A00 6A006A00 6A012668 h&.j.j.j.j..D....v..v.j.h&.j.j.j 000060
 FE4E9689 FE4C8689 00000800 9A006A10 76FF1276 FF09DCE9 00000819 9A006A00 .j.......ÖÉ..v..v.j..ï.....L±..N± 000080
 9EC40000 FFFF9A01 47B7FF26 0149B7FF 26FE4C9E C4FFFFFA 46C70000 FECA86C7 ú.ò±..úF*..á.L±&.ñl.&.ñG......á. 0000A0
 FF0040E9 03740000 300000FF FF9A5016 FED4868D 0147B7FF 26014987 FF26FE4C L±&.ñl.&.ñG...à±.P.....=..t.Öa.. 0000C0
 001CE903 7400003D 08C48304 86008C9A FED486FF FED686FF 5016FED8 8680FA46 F*..À±.P.Ñø±.Ñà±......á.=..t.Ö.. 0000E0
 83FF9FE9 0003E900 00FFFF9A 0147B7FF 26014987 FF26FE4C 9EC40001 FECA86C7 ú.ò±..á.L±&.ñl.&.ñG......Ö..Ö... 000100
 9A206A00 6A006A00 6A0FE668 1E1076FF 1276FF01 6A006A00 4FE90374 00FECABE /ò±.t.Öo.j.j..v..v..hl.j.j.j.j . 000120
 1276FF00 0008319A 006A006A 006A006A 01266803 00681076 FF1276FF 00000967 g....v..v.h..h&.j.j.j.j..1....v. 000140
 08681076 FF1276FF 08EFE900 00084E9A 006A006A 016A006A 01266801 6A1076FF .v.j.h&.j.j.j.j..N...Öÿ..v..v.h. 000160
 9A100168 1E030968 1076FF12 76FF0000 08859A00 6A006AFA 76FF006A 01636803 .hc.j..v*j.j..ç....v..v.h...h... 000180
 F2468001 6A006AFE D486FFFE D686FF50 52014705 FE4E9688 FE4C8688 000009C6 ó.....L±..N±.G.RP.Ñø±.Ñà±j.j..F· 0001A0
 00000980 9A505200 0009799A 03096810 76FF1276 FF016A00 6A0000FF FF9A5016 .P.....j.j..v..v.h...y...RP..... 0001C0
 6A1076FF 1276FF00 0008CD9A 006A006A 006A006A 01266803 00681076 FF1276FF .v..v.h..h&.j.j.j.j..ë....v..v.j 0001E0

Dump of file SATURN:[PCCOMMON.DUMP.DLL]ANALDESK.TMP;1 on 18-APR-1990 10:36:25.56
File ID (485,24,0)   End of file block 102 / Allocated 104

Virtual block number 36 (00000024), 512 (0200) bytes

 0006149A 006A1076 FF1276FF 0853E900 0009999A 006A006A 016A006A 01266801 .h&.j.j.j.j......ÖS..v..v.j..... 000000
 00FFFF9A 5016FED0 8680216A 006A0145 B7FF26FE 4C9EC4FE 4E9689FE 4C868900 ...L±..N±á.L±&.ñE.j.jl..À±.P.... 000020
 216A0309 681076FF 1276FF08 81E999FE CC868800 08E90375 000030FE CC868900 ...ä±=..u.Ö....ä±.Ö...v..v.h..jl 000040
 B6FFFED2 B6FF0018 E90375FE 028608FE D0868800 00FFFF9A FED086FF FED2B6FF .Ñø±.ÑÀ±.......À±..ø±u.Ö...Ñø±.Ñ 000060
 006A1003 681E006A 006A016A 006A0066 E9037400 003004C4 8303F711 909AFED0 À±...%..á.=..t.Öf.j.j.j.j..h..j. 000080
 9A505200 0000489A 03096810 76FF1276 FF016A00 6A000005 AF9A206A 006A006A j.j.j .£...j.j..v..v.h...H...RP. 0000A0
 1276FF00 0009819A 006A006A 006A006A 01266803 0C681076 FF1276FF 0000FFFF .....v..v.h..h&.j.j.j.j..Ÿ....v. 0000C0
 09681076 FF1276FF 076FE900 0005119A 006A006A 016A006A 01266801 6A1076FF .v.j.h&.j.j.j.j......Öo..v..v.h. 0000E0
 139A5052 0000070C 9A030968 1076FF12 76FF016A 006A0000 FFFF9A10 13681E03 ..h.......j.j..v..v.h.......RP.. 000100
 86C70108 E90003E9 03740000 3004C483 07830086 9AFED086 FFFED286 FF000007 ....Ñø±.ÑÀ±.Ñ.°..á.=..t.Ö..Ö..ú. 000120
 014987FF 26FE4C9E C4000007 7A9A0147 B7FF2601 4987FF26 FE4C9EC4 0000FECA ò±..á.L±&.ñl.&.ñG..z...á.L±&.ñl. 000140
 FED086FF FED286FF 0090E903 74000030 00000793 9A5016FE D4868D01 47B7FF26 &.ñG...à±.P.....=..t.Ö...Ñø±.ÑÀ± 000160
 2B66068E 006A006A 006DE903 7400003D 08C4830A 8A008C9A FED4B6FF FED686FF .Ñø±.Ñà±......á.=..t.Öm.j.j...f+ 000180
 16A04680 FED086FF FED286FF 00000593 9A5016A0 4680516A 00E56802 0036FF26 &.6..h|.jQ.F..P......Ñø±.ÑÀ±.F.. 0001A0
 6A5016FE 508680·3 76FF1276 FF016A00 6A0CC483 0C5900F8 9A5016FE 50868D50 P..P±.P.½.Y..á.j.j..v..v...P±.Pj 0001C0
 C7000007 D59A01· · B7FF2601 4987FF26 FE4C9EC4 000006FA 9A206A00 6A006A00 .j.j.j .*...á.L±&.ñl.&.ñG..f...ú 0001E0
```

Dump of file SATURN:[PCCOMMON.DUMP.DLL]ANALDESK.TMP;1 on 18-APR-1990 10:36:25.56
File ID (485,24,0)   End of file block 102 / Allocated 104

Virtual block number 37 (00000025), 512 (0200) bytes

006A0161 68030868 1076FF12 76FF0037 E9037400 FECABE83 FF4FE900 01FECA86 .ò±..ÕO../ò±.t.Õ7..v..v.h..he.j. 000000
FED286FF 50520'47 05FE4E96 88FE4C86 88000008 1E9AFED0 B6FFFED2 B6FF006A j..Ñ0±.ÑÂ±.......L±..N±.G.RP.Ñ0± 000020
08369A00 6A006A00 6A006A01 2668030C 681076FF 1276FF00 00FFFF9A FED0B6FF .ÑÂ±......v..v.h..h&.j.j.j.j..6. 000040
6A006A05 EAE90000 06529A00 6A006A01 6A006A01 2668016A 1076FF12 76FF0000 ...v..v.j.h&.j.j.j.j..R...Õõ.j.j 000060
07549A00 6A1076FF 1276FF00 00040A9A 50520000 04D39A00 6A036A01 6A006A01 .j.j.j.j..Æ...RP.Ö....v..v.j..T. 000080
002305FE 4E9688FE 4C868820 6A030268 1076FF12 76FFFE4E 9689FE4C 86890000 ....L±..N±.v..v.h..j ..L±..N±.#. 0000A0
FF00000B 889AFE4C 86FFFE4E 86FF206A 03056810 76FF1276 FF00000B 9B9A5052 RP......v..v.h..j .ÑN±.ÑL±.j.... 0000C0
FE4C9EC4 000008FC 9A505201 2405FE4E 9688FE4C 8688206A 03076810 76FF1276 v..v.h..j ..L±..N±.$.RP.•...6.L± 0000E0
0008E903 75000030 FECC8689 000008FD 9A5016FE D0868021 6A006A01 4587FF26 &.ñE.j.j!..Â±.P.».....a±*..u.Õ.. 000100
000006C1 9AFED086 FFFED286 FF216A03 09681076 FF1276FF 05AEE999 FECC8688 ..a±.ÕÙ..v..v.h..j!.Ñ0±.ÑÂ±.ê... 000120
03E90374 00003D0A C4830C34 128A9A10 76FF1276 FFFE4C86 FFFE4E86 FF030568 h...ÑN±.ÑL±.v..v..¤.4..6.=..t.Õ. 000140
1DE90374 00003D04 C4830C77 11909A50 52012405 FE4E9688 FE4C8688 0503E900 .Õ....L±..N±.$.RP...w..6.=..t.Õ. 000160
076808C4 830CCA00 569A5052 012405FE 4E9688FE 4C8688FE 4C86FFFE 4E86FF00 ..ÑN±.ÑL±..L±..N±.$.RP.V.ò..6.h. 000180
7400003D 0AC4830C B2128A9A 1076FF12 76FF5052 012405FE 4E9688FE 4C868803 ...L±..N±.$.RP.v..v..¤.ý..6.=..t 0001A0
003A9A50 52012405 FE4E9688 FE4C8688 03076810 76FF1276 FF04A0E9 0003E903 .Õ..Õ...v..v.h....L±..N±.$.RP.:. 0001C0
FF0064E9 03740000 3D04C483 06081190 9A505200 2305FE4E 9688FE4C 86880000 ....L±..N±.#.RP...Ä..6.=..t.Õd.. 0001E0

Dump of file SATURN:[PCCOMMON.DUMP.DLL]ANALDESK.TMP;1 on 18-APR-1990 10:36:25.56
File ID (485,24,0)   End of file block 102 / Allocated 104

Virtual block number 38 (00000026), 512 (0200) bytes

FFFE4E86 FF0020E9 0372099A 7E839A46 8904C483 0CF30086 9AFE4CB6 FFFE4EB6 ÑN±.ÑL±.Ñ.µ..6..F..~..r.Õ ..ÑN±. 000000
4EB6FF09 6A0028E9 08C48300 1500569A 50520023 05FE4E96 88FE4C86 88FE4CB6 ÑL±..L±..N±.#.RP.V....6.Õ(.j..ÑN 000020
C626FE4C 9EC40AC4 8309EE00 CE9A5052 002305FE 4E9688FE 4C8688FE 4CB6FFFE ±.ÑL±..L±..N±.#.RP.ö.Y..6.6.L±&6 000040
9EC40000 06919A50 52002305 FE4E9688 FE4C8688 03026810 76FF1276 FF002847 G+..v..v.h....L±..N±.#.RP.....6. 000060
D8868009 6A0148B7 FF26FE4C 9EC40000 03E89A50 16FEFA86 800148B7 FF26FE4C L±&.ñK...ª±.P.Ò...6.L±&.ñK.j...Á 000080
AA9A5016 94468050 16FE0886 800148B7 FF26FE4C 9EC4096A 00970000 9A5016FE ±.P.....j.6.L±&.ñK...Â±.P.F..P.ˆ 0000A0
809476FF 9676FF03 FDE999FE CC868800 08E90375 00FECCBE 83FECC86 89000000 .....a±./a±.u.Õ....a±.Õ»..v..v.. 0000C0
FF03D7E9 99FECCE 880008E9 037500FE CCBE83FE CC868900 0000CF9A 5016FC46 F•.P.ü.....a±./a±.u.Õ....a±.Õ■.. 0000E0
FECCBE83 FECC866, 00000102 9A5016FE FE868001 6AFC76FF FE76FF94 76FF9676 v..v..v±.v=j...±±.P.......a±./a± 000100
CCBE81FE CC868900 0001229A 9476FF96 76FF03A8 E999FECC 86880008 E9037500 .u.Õ....a±.Õˆ..v..v..".....a±./ä 000120
9A006A00 6A5016F6 46805016 FEFE8680 0386E999 FECC8688 0008E903 748491FE ±..t.Õ....a±.Õ....±±.P.F-.Pj.j.. 000140
685016FE FE868000 64E90374 10F646F6 0009E903 74009A7E 839A4689 0000014C L....F..~..t.Õ..-F-.t.Õd...±±.Ph 000160
15681E00 40E900FE FE86C600 08E90375 00FECCBE 83FECC86 89000001 669A0101 ...f.....a±./a±.u.Õ..6.±±.Õa..h. 000180
209A006A 006A5016 F6468050 16FEFE86 8008C483 0EEA0010 9A5016FE FE868D10 ...±±.P...õ..6...±±.P.F-.Pj.j.. 0001A0
FEBE8000 FEFE86C6 0005E903 7410F646 F60009E9 0374009A 7E839A46 8900000E ....F..~..t.Õ..-F-.t.Õ..6.±±../± 0001C0
C6FEFE86 884004F8 468A0000 FFFF9A50 16904680 5016F846 80003AE9 037400FE ±.t.Õ:..F½.P.F..P......F½.ª..±±6 0001E0

Dump of file SATURN:[PCCOMMON.DUMP.DLL]ANALDESK.TMP;1 on 18-APR-1990 10:36:25.56
File ID (485,24,0)   End of file block 102 / Allocated 104

Virtual block number 39 (00000027), 512 (0200) bytes

00FFFF9A 50169E46 805016FF 018680F8 76FF0091 9E46C75C FF0086C6 3AFEFF86 ..±:6...\úF....v½.....P.F..P.... 000000
80101068 1E0012E9 03755CFE FDBA80F0 8804C483 0F080086 9A5016FE FE868D00 ...±±.P.Ñ....6..Þ.¤»±\u.Õ...h... 000020
80506A00 AC680200 36FF2628 66068E00 6A006A08 C4830F3F 00109A50 16FEFE86 .±±.P...?..6.j.j...f+&.6..hˆ.jP. 000040
5200109A 5016FEFE 36805052 002305FE 4E9688FE 4C868800 00101E9A 5016A046 F..P.......L±..N±.#.RP..±±.P...R 000060
5016FEFE 86800302 6808C483 0F8F0010 9A5016FE FE868050 16A04680 08C4830F ..6..F..P..±±.P......6.h....±±.P 000080
885016FE FE868001 AEE90003 E9037400 0030DAC4 830C1412 BA9A1076 FF1276FF .v..v..¤....6.=..t.Õ..ÕÙ...±±.P. 0000A0
F900869A FED086FF FED286FF 08C4830F 9F00569A 50520023 05FE4E96 88FE4C86 .L±..N±.#.RP.V....6..Ñ0±.ÑÂ±.Ñ.• 0000C0
014787FF 26014987 FF26FE4C 9EC40000 FECA86C7 011CE903 75000030 04C4830F ..6.*..u.Õ..ú.ò±..6.L±&.ñl.&.ñG. 0000E0
00300000 0A2C9A50 16FED486 800147B7 FF260149 B7FF26FE 4C9EC400 000A139A .....6.L±&.ñl.&.ñG...â±.P.,...=. 000100
003008C4 83103800 8C9AFED4 B6FFFED6 B6FFFED0 B6FFFED2 B6FF00BB E9037400 .t.ÕE..Ñ0±.ÑÂ±.Ñø±.Ñâ±...8..6.=. 000120
0A709A50 16A04680 516A00E5 68020036 FF262B66 068E006A 006A0098 E9037400 .t.Õ..j.j...f+&.6..hl.jO.F..P.p. 000140
6A006A0C C4830A48 00F89A50 16FE5086 805016A0 4680FED0 B6FFFED2 B6FF0000 ...Ñ0±.ÑÂ±.F..P..P±.P.½.K..á.j.j 000160
1076FF12 76FF0000 0AA89A20 6A006A00 6A006A50 16FE5086 801076FF 1276FF01 ..v..v...P±.Pj.j.j.j .ˊ....v..v. 000180
50520000 09089A03 09681076 FF1276FF 016A006A 00000C9E 9A101F68 1E030968 h...h.......j.j..v..v.h...À...RP 0001A0
24E90001 FECA86C7 00000A88 9A0147B7 FF260149 B7FF26FE 4C9EC400 00090F9A .Õ...á.L±&.ñl.&.ñG..£...ú.ò±..Õ$ 0001C0
FFFED286 FF505201 4705FE4E 9688FE4C 86880079 E90003E9 037500FE CABE83FF ../ò±.u.Õ..Õy...L±..N±.G.RP.Ñ0±. 0001E0

```
Dump of file SATURN:[PCCOMMON.DUMP.DLL]ANALDESK.TMP;1 on 18-APR-1990 10:36:25.56
File ID (485,24,0)   End of file block 102 / Allocated 104

Virtual block number 40 (00000028), 512 (0200) bytes

 000010F7 9A1076FF 1276FF00 0010EC9A 016A1076 FF1276FF 00000805 9AFE0086 ÑÂ±......v..v.j..å....v..v..%... 000000
 26E90029 E90000FF FF9A1076 FF1276FF 0000FFFF 9A026A10 76FF1276 FF0044E9 ÕD..v..v.j.......v..v.....Õ).Õ& 000020
 75030030 F7B8L903 75030C3D FFCFE903 75000230 FA31E903 7500013D 0023E900 .Õ#.=..u.Õ1ª=..u.Õú.=..u.Õ¡%=..u 000040
 9A0676FF 0876FF0A 76FF0C76 FF0E76FF 1076FF12 76FF0048 E9FFD7E9 F588E903 .Õ.%Õ=.ÕK..v..v..v..v..v..v..v.. 000060
 E9037500 2930F421 E9037500 2230F557 E9037500 20300028 E9004FE9 0000FFFF ....Õ0.Õ+.= .u.ÕW%=".u.Õ1¶=).u.Õ 000080
 6A016A01 6A006A01 6A006AFF 85E9F354 E9037500 3B30F494 E9037500 303DF484 .¶=0.u.Õ.¶=;.u.ÕTµÕç.j.j.j.j.j.j 0000A0
 0004C800 0ECAC95F 5E1F0000 E900008A 00008800 0008519A 50520000 084A9A00 ..J...RP.Q...|..¤..Õ...^_èÕ..à.. 0000C0
 0006E903 74003F80 26065EC4 000CE903 7508460B 06468808 8E048688 1E565700 .WV.¡Ñ..Ä.F..F.u.Õ..á^.&.?.t.Õ.. 0000E0
 FF0003E9 0000FC46 C7FE4689 04C4830E 6A00869A 0676FF08 76FF0045 E9000088 ¡..ÕE..v..v..Ñ.j..á..F±úF•..Õ... 000100
 E90001B8 0006E903 75203880 260676C4 FC5E8800 18E90372 FC4639FE 4688FC46 F•.F±9F=r.Õ...^=áv.&.8 u.Õ..¡..Õ 000120
 08064688 D88E11A5 881E5657 000006C8 C8C95F5E 1F0000E9 000088FF DAE90009 ..ÕÕ.¡..Õ...^_èùà...WV.¡E..Ä.F.. 000140
 46C7FE46 8904C483 11CF0086 9A0676FF 0876FF00 88E90000 880006E9 03740846 F.t.Õ..¡..Õ...v..v..Ñ.ü..á..F±úF 000160
 FA468800 8A260676 C4FC5E88 0058E903 72FC4639 FE4688FC 46FF0003 E90000FC •..Õ...F•.F±9F=r.Õ(..^=áv.&...Fª 000180
 E903752D FA7E8000 33E90375 20FA7E80 003CE903 740711CF 87F60888 98FA468A .Fª..Ä~.ü..t.Õ<..~ª u.Õ3..~ª-u.Õ 0001A0
 FA7E8000 0FE90375 24FA7E80 0018E903 7526FA7E 800021E9 03755FFA 7E80002A ª..~ª_u.Õ|..~ª&u.Õ...~ª$u.Õ...~ª 0001C0
 56570000 04C8C‹C9 5F5E1F00 00E90000 88FF97E9 0009E900 01880006 E9037523 #u.Õ..¡..Õ..Õ..¡..Õ...^_èùà...WV 0001E0

Dump of file SATURN:[PCCOMMON.DUMP.DLL]ANALDESK.TMP;1 on 18-APR-1990 10:36:25.56
File ID (485,24,0)   End of file block 102 / Allocated 104

Virtual block number 41 (00000029), 512 (0200) bytes

 00000E7F 9A006A00 6A5016FE 46800A76 FF0C76FF 026DE90E 4688088E 1218881E .¡...Ä.F.Õm..v..v..F±.Pj.j...... 000000
 9A206A00 6A006A00 6A10216B 1E0676FF 0876FF01 6A006A00 A0E9FC46 88FC4689 .F•.F•Õ..j.j..v..v..hI.j.j.j.j . 000020
 00008800 0010819A 50520000 107A9A0E 76FF0676 FF0876FF 016A006A 00001056 V...j.j..v..v..v..z...RP.....¡.. 000040
 0009E900 03E90375 D00806C4 83123601 789A0A76 FF0C76FF 206A0075 E90241E9 ÕA.Õu.¡ .v..v..x.6..á..Äu.Õ..Õ.. 000060
 9A206A00 6A006A00 6A102F68 1E0676FF 0876FF01 6A006A00 52E9021E E90001B8 ¡..Õ..ÕR.j.j..v..v..h/.j.j.j.j . 000080
 00008800 0013FA9A 50520000 13F39A0E 76FF0676 FF0876FF 016A006A 000013E1 Å...j.¡..v..v..v..µ...RP.ª...¡.. 0000A0
 76FF01C6 E9FFAEE9 FF8EE903 7500023D FF59E903 75C00800 12E90015 E901E1E9 ÕÅ.Õ..Õ...áu.ÕY.=..u.Õ..ÕÜ.Õ6..v 0000C0
 83141611 909A0A76 FF0C76FF 0016E903 7400003D 04C48313 8012109A 0A76FF0C ..v....§..á.=..t.Õ...v..v....... 0000E0
 206A006A 006A006A 1041681E 0676FF08 76FF016A 006A003A E9037400 003D04C4 á.=..t.Õ:.j.j..v..v..hA.j.j.j.j 000100
 00880000 14539A50 52000014 4C9A0E76 FF0676FF 0876FF01 6A006A00 00143A9A .:...j.j..v..v..v..L...RP.S...¡. 000120
 03750000 3D04C483 0F691210 9A0A76FF 0C76FF01 57E9015A E90001B8 0160E900 .Õ'.¡..ÕZ.ÕW..v..v....i..á.=..u. 000140
 006A0000 13009A20 6A006A00 6A006A10 59681E06 76FF0876 FF016A00 6A003AE9 Õ:.j.j..v..v..hY.j.j.j.j .....j. 000160
 0001B801 07E90000 B8000013 199A5052 00001312 9A0E76FF 0676FF08 76FF016A j..v..v..v......RP.....¡..Õ..¡.. 000180
 FF0C76FF 0016E903 7400003D 04C48314 8512109A 0A76FF0C 76FF00FE E90101E9 Õ..Õ±..v..v.......á.=..t.Õ...v.. 0001A0
 1074681E 0676FF08 76FF016A 006A003D E9037400 003D04C4 8313A711 909A0A76 v....I..á.=..t.Õ=.j.j..v..v..ht. 0001C0
 52000015 109A0E76 FF0676FF 0876FF01 6A006A00 0014FE9A 206A006A 006A006A j.j.j.j .±...j.j..v..v..v......R 0001E0

Dump of file SATURN:[PCCOMMON.DUMP.DLL]ANALDESK.TMP;1 on 18-APR-1990 10:36:25.56
File ID (485,24,0)   End of file block 102 / Allocated 104

Virtual block number 42 (0000002A), 512 (0200) bytes

 3D06C483 04620000 9A0A76FF 0C76FF01 6A0095E9 0098E900 00880000 15179A50 P.....¡..Õ..Õ..j..v..v....b..á.= 000000
 13609A20 6A006A00 6A006A10 87681E06 76FF0876 FF016A00 6A003DE9 03740001 ..t.Õ=.j.j..v..v..h..j.j.j.j .'. 000020
 43E90000 88000013 799A5052 00001372 9A0E76FF 0676FF08 76FF016A 006A0000 ..j.j..v..v..v..r...RP.y...¡..ÕC 000040
 88E90375 026C3D00 2BE9002E E90031E9 00008800 37E9003A E90001B8 0040E900 .Õa.¡..Õ:.Õ7.¡..Õ1.Õ..Õ+.=l.u.Õ. 000060
 ACE90375 03093DFE 45E90375 030730FF 15E90375 03053DFD 83E90375 03023DFD »=..u.Õ.»=..u.Õ..=..u.ÕE±=..u.Õ˜ 000080
 00FEC786 C60003FE C586C7D8 8E12C288 1E565700 0160C8CB C95F5E1F FFC9E9FE ±Õè..^_èùà'..WV.¡ô..Äú.é±..ó.ú±. 0000A0
 FFF676FF 016A006A 0000004E 9A5016F4 46800676 FFEF4689 06468800 FEA486C6 ó.Ê±..F̄..Fÿ.v..F¶.P.N...j.j..v~. 0000C0
 89000004 0F9A5016 FEA4868D 02586802 0036FF26 2B66068E FFFF6814 6F68F476 v¶ho.h....f+&.6..hX...Ê±.P...... 0000E0
 88FE5689 FC468900 00FFFF9A 006A006A 0015E903 74FA460B F84688FA 5689F846 F½.Vª.F½.Fªt.Õ..j.j.......F•.V±. 000100
 9A006A03 6A016A00 6A016A00 6AF24689 00000420 9AF876FF FA76FF00 AEE9FC46 F•ÕÙ..vª.v½. ....F·j.j.j.j.j.j.. 000120
 83133101 EC9A5016 FEA4868D 0061E903 7401F27E 83000016 899A5052 00001682 ....RP......~·.t.Õa...Ê±.P.å.1.. 000140
 C48314DA 01329A06 76FF5016 FEC7868D 5016FEA4 868D036A 5016FEA0 868004C4 á.....±.Pj...Ê±.P..ú±.P.v..2.Õ..á 000160
 9AFEA086 FFFEA286 FF501608 46800041 E9F24688 0006E903 75000030 F2468910 ..F·=..u.Õ...F·ÕA..F..P.ÑÂ±.Ñ.±. 000180
 6A016A01 6A006A01 6A006A00 1EE9F246 880006E9 03750000 30F24689 000010C4 á....F·=..u.Õ...F·Õ..j.j.j.j.j.j 0001A0
 881E5657 000246C8 CBC95F5E 1F0000E9 F2468800 0011899A 50520000 11829A00 ......RP......F·Õ...^_èùàF..WV.¡ 0001C0
 006A1076 FF1276FF FD8C9689 FD8A8689 08568806 46880519 E90E4688 D88E1571 q..Ä.F.Õ...F..V...¤».¥».v..v.j. 0001E0
```

```
Dump of file SATURN:[PCCOMMON.DUMP.DLL]ANALDESK.TMP;1 on 18-APR-1990 10:36:25.56
File ID (485,24,0)   End of file block 102 / Allocated 104

Virtual block number 43 (0000002B), 512 (0200) bytes

 50520000 172F9A30 6A036A01 6A006A01 6A006A00 0004F89A FDBAB6FF FDBCB6FF .Ñ¥».Ñ¤».%...j.j.j.j.j.j../...RP 000000
 206A006A 01436802 5C681076 FF1276FF 000004E5 9A1076FF 1276FF00 0017369A .6....v..v..l....v..v.hl.hC.j.j  000020
 0AEB9A00 6A006A08 6A006A01 43680271 681076FF 1276FF00 00171E9A 006A006A j.j.......v..v.hq.hC.j.j.j.j..Š. 000040
 6A006A04 A9E90000 ,6079A50 52000016 009A006A 016A016A 006A016A 006A0000 ..j.j.j.j.j.j......RP.....Õ`.j.j 000060
 1276FF01 6A006A00 000F259A 5016A646 8D506A00 B5680200 36FF262B 66068E00 ...f+&.6..hç.jP.Fl.P.X...j.j..v. 000080
 206A1076 FF1276FF 046EE900 0014A99A 206A006A 006A006A 5016A646 8D1076FF .v..Fl.Pj.j.j.j .`...Õn..v..v.j  0000A0
 5E9A006A 1076FF12 76FF03F7 E90A468B 0456E900 0005F79A 016A006A 026A006A j.j.j.j..%...ÕV..F.Õ%..v..v.j..^ 0000C0
 0018869A 5016FDBE 868D216A 026C6810 76FF1276 FFFDBC96 89FDBA86 8900000B .....¤»..¥».v..v.hl.jl../».P.... 0000E0
 76FF1276 FF016A00 6A0037E9 03740000 3D04C483 186E0086 9A5016FD BE868D00 .../».P.Ñ.n..á.=..t.Õ7.j.j..v..v 000100
 9A026C68 1076FF12 76FF016A 006A0000 183D9A20 6A006A10 9C681E10 AB681E10 ..h¨..h..j.j .=...j.j..v..v.hl.. 000120
 013D06C4 83163C00 009A5016 F0BE868D 036A0392 E9000018 569A5052 0000184F O...RP.V...Õ..j.../».P...<..á.=. 000140
 0017719A 206A006A 10C8681E 100A681E 1076FF12 76FF016A 006A0037 E9037400 .t.Õ7.j.j..v..v..hÕ..hù.j.j .q.. 000160
 BE868D03 43E90000 14C29A50 52000014 BB9A026C 681076FF 1276FF01 6A006A00 .j.j..v..v.hl..É...RP.ô...ÕC.../ 000180
 8D009168 02716810 76FF1276 FF08C483 18930056 9AFDBAB6 FFFDBCB6 FF5016FD ».P.Ñ¥».Ñ¤».V....á..v..v.hq.h... 0001A0
 003DE903 7400003D 04C48318 AE00869A 5016FF12 868D0000 08839A50 16FF1286 ....P.........P.Ñ.Ù..á.=..t.Õ=. 0001C0
 16FF1286 8D5016FD BE868D09 6A08C483 18C40272 9A5016FF 12868000 6A009168 h..j......P.r.á..á.j.../».P..... 0001E0

Dump of file SATURN:[PCCOMMON.DUMP.DLL]ANALDESK.TMP;1 on 18-APR-1990 10:36:25.56
File ID (485,24,0)   End of file block 102 / Allocated 104

Virtual block number 44 (0000002C), 512 (0200) bytes

 12868D00 0010689A 5016FF12 868D0271 681076FF 1276FF0A C48318F3 02149A50 P...µ..á..v..v.hq......P.h...... 000000
 2866068E 006A006A 08C48319 2900569A 50520023 05FDBC96 8BFDBA86 8B5016FF ..P..¤»..¥».#.RP.V.)..á.j.j...f+ 000020
 BC9688FD BA868850 16A64680 00001755 9A5016A6 4680506A 00AD6802 0036FF26 &.6..hÙ.jP.Fl.P.U....Fl.P..¤»..¥ 000040
 15949A50 16FE0486 8D014BB7 FF26FDBA 9EC408C4 831A4B00 109A5052 002305FD ».#.RP...K..á.á.¤»&.ñK....±.P... 000060
 FF26FDBA 9EC4096A 0D660000 9A5016FD E2868D09 6A014BB7 FF26FDBA 9EC40000 ..á.¤»&.ñK.j...ã».P...f.j.á.¤»&. 000080
 E9037500 FDE0BE83 FDE08689 0000007F 9A5016FF 0E868D50 16FDE286 8D014BB7 ñK...ã».P.....P.......Å».ƒÅ».u.Õ 0000A0
 FDE08689 000000A5 9A5016FC 4680FF0E B6FFFF10 B6FF0265 E999FDE0 86880008 ....Å».Õe..Ñ...Ñ...F=.P.É.....Å» 0000C0
 FFFF0EB6 FFFF10B6 FF00FE08 86C60230 E999FDE0 86880008 E9037500 FDE0BE83 .ƒÅ».u.Õ....Å».Õ=.ó..±..Ñ...Ñ... 0000E0
 0008E903 7500FDE0 BE83FDE0 86890000 00049A50 16FE0886 8D016AFC 76FFFE76 v±.v•j....±.P.å.....Å».ƒÅ».u.Õ.. 000100
 748491FD E0BE81FD E0868900 0000F59A FF0EB6FF FF10B6FF 0207E999 FDE0868B ..Å».Õ...Ñ...Ñ...%.....Å».ƒÅ»..t 000120
 00001A60 9A006A00 6A5016F8 46805016 FE08868D 01E3E999 FDE0868B GU.?E903 .Õ....Å».ÕD....±.P.F½.Pj.j..`... 000140
 681EFDE0 86890000 0E439A01 01685016 FE08868D 0092E903 7410F846 F6A'?689 .FÉ-F½.t.Õ.....±.Ph...C.....Å».h 000160
 9A006A00 6A5016F8 46805016 FE08868D 08C4831A C700109A 5016FE08 868D.0F1 þ....±.P...ú..á....±.P.F½.Pj.j.. 000180
 037410F8 46F60009 E9037400 A47E8300 12E90374 00FDE0BE 83A44689 000012DC É....FÉ.ƒÅ».t.Õ...-É.t.Õ..-F½.t. 0001A0
 FE0986C6 FE08868B 4004FA46 8A00000E 829A5016 FF0A868D 5016FA46 8D003BE9 Õ;..F*.P.....P.ý....F*.ə...±ó..± 0001C0
 868D0000 0EDD9A50 16A4468D 5016FE08 868DFA76 FF0101A4 46C75CFE 0A86C63A :ó..±\úFÊ...v*....±.P.FÊ.P.ì..... 0001E0

Dump of file SATURN:[PCCOMMON.DUMP.DLL]ANALDESK.TMP;1 on 18-APR-1990 10:36:25.56
File ID (485,24,0)   End of file block 102 / Allocated 104

Virtual block number 45 (0000002D), 512 (0200) bytes

 FE08868D 10F9681E 0012E903 755CFE07 BAB0F08B 04C4831A E500869A 5016FE08 .±.P.Ñ.l..á..þ.¤.±\u.Õ...h*....± 000000
 00109A50 16FE0886 8D505200 2305FDBC 9688FDBA 868B08C4 831B0000 109A5016 .P......á...¤»..¥».#.RP...±.P... 000020
 7400003D 0AC48315 A3128A9A 1076FF12 76FF5016 FE08868D 026C6808 C4831610 ...á.hl....±.P.v..v..¤.É..á.=..t 000040
 8317CA00 569A5052 002305FD 8C9688FD BA868850 16FE0886 8D0079E9 0003E903 .Õ..Õy....±.P..¤»..¥».#.RP.V.ò.. 000060
 00008A00 00880000 187A9A10 76FF1276 FF00001B 6F9A016A 1076FF12 76FF08C4 á..v..v.j..o....v..v..z...j..¤.. 000080
 00880000 100C9A10 76FF1276 FF000010 D19A006A 1076FF12 76FF003A E9008CE9 Õ..Õ:..v..v.j..i....v..v..É...j. 0000A0
 FFE7E9FF C9E90375 00023DFC 01E90375 00013D00 13E90016 E90068E9 0000BA00 .¤..Õh.Õ..Õ..=..u.Õ.•=..u.Õè.ÕÕ. 0000C0
 002FE900 0011409A 0676FF08 76FF0A76 FF0C76FF 0E76FF10 76FF1276 FF0043E9 ÕC..v..v..v..v..v..v..v..ə...Õ/. 0000E0
 0375003B 3DFB90E9 03750029 3DFB6AE9 03750022 3DFBC5E9 03750020 3D0023E9 Õ#.= .u.Õé«=".u.Õj«=).u.Õ.«=;.u. 000100
 16A0881E 56570000 4EC8000E CAC95F5E 1F0000E9 00008A00 008BFF8D E9FAC7E9 Õú*Õ§.¡..¤..Õ...^_èò..àN..WV.¡.. 000120
 46C608C4 831C9300 569A5016 B8468D50 52009105 02578B26 078B2608 5EC4D88E .Aá^.&..&.W....RP‾F¡.P.V....á.óF 000140
 1768B476 FFB676FF 016A006A 0000193E 9A501684 46800676 FF0000FA 46C700D9 ).úF*...v..FÇ.P.>...j.j..vÑ.vÇh. 000160
 FE5689FC 46890000 15BB9A50 16884680 04006802 0036FF26 2B66068E FFFF6818 .h....f+&.6..h...F¡.P.É....F=.V± 000180
 1688468D 0035E9B2 46880006 E9037500 003D8246 89000015 EC9AFC76 FFFE76FF .v±.v•.š....Fý=..u.Õ...fýÕ5..F¡. 0001A0
 0E76FF50 1609468D 08C4831C A600569A 50520091 05025788 26078826 085EC450 Pá^.&..&.W....RP.V.l..á..F).P.v. 0001C0
 18FEB81E 56570000 56C8C8C9 5F5E1F00 00E98246 8808C483 183D0056 9A0C76FF .v..V.=..á..FýÕ...^_èùàV..WV.¡±. 0001E0
```

Dump of file SATURN:[PCCOMMON.DUMP.DLL]ANALDESK.TMP;1 on 18-APR-1990 10:36:25.56
File ID (485,24,0)   End of file block 102 / Allocated 104

Virtual block number 46 (0000002E), 512 (0200) bytes 00001068 9A505200 0010649A 006A036A 016A006A 016A006A 022CE90E 4688088E .Ä.F.Õ,.j.j.j.j.j..d...RP.k... 000000
76FF0000 16C99A06 76FF0876 FF006A10 76FF1276 FF000016 EC9A1076 FF1276FF .v..v..å....v..v.j..v..v..è....v 000020
04046810 76FF1276 FF00001D 2C9A006A 006A206A 006A0143 68040268 1076FF12 ..v.h..hC.j.j j.j..,....v..v.h.. 000040
AA468900 0010cF9A 006A1076 FF1276FF 00001705 9A006A00 6A206A00 6A014368 hC.j.j j.j.......v..v.j..ÿ....F 000060
6A016A00 6A016A00 6A000018 D99AAA76 FFAC76FF 04026810 76FF1276 FFAC5689 .V¯.v..v.h...v˜.v˙.\...j.j.j.j.j 000080
68020036 FF262866 068E006A 006A01AD E900001D E29A5052 00001D0B 9A006A01 .j..Ü...RP.â...ÕÜ.j.j...f+&.6..h 0000A0
6A006A50 16AE4680 1076FF12 76FF016A 006A0000 1E479A50 16AE4680 506A0085 ç.jP.FÜ.P.G...j.j..v..v..FÜ.Pj.j 0000C0
17899A01 6A006A02 6A006A20 6A1076FF 1276FF01 72E90000 1E639A20 6A006A00 .j.j .c...Õr..v..v.j j.j.j.j.... 0000E0
52000016 DA9A006A 036A016A 006A016A 006A00F0 E90A4688 0157E901 5AE90000 ..ÕZ.ÕW..F.Õp.j.j.j.j.j.j..Õ...R 000100
681076FF 1276FFAC 5689AA46 89000017 9F9A006A 1076FF12 76FF0000 16E19A50 P.Ä....v..v.j.......F˙.V¯.v..v.h 000120
9A505200 2105AC56 88AA4688 000017BD 9A505200 2105AC56 88AA4688 206A0404 ..j .F˙.V¯.I.RP.§....F˙.V¯.I.RP. 000140
6A00E368 020036FF 26286606 8E006A00 6A003BE9 03740000 3004C483 1C190086 Ñ....á.=..t.Õ;.j.j...f+&.6..hD.j 000160
006A006A 006A5016 AE468D10 76FF1276 FF016A00 6A000019 109A5016 AE468050 P.FÜ.P.....j.j..v..v..FÜ.Pj.j.j. 000180
1CDC9A50 5200001C D59A006A 016A016A 006A016A 006A0067 E9000017 EE9A206A j .Ÿ...Õg.j.j.j.j.j.j..f...RP.É. 0001A0
1276FF00 34E90000 1EB19A10 76FF1276 FF00001E A69A016A 1076FF12 76FF0000 ...v..v.j..Ï....v..v..Ÿ...Õ4..v. 0001C0
01300013 E90016E9 0019E900 0018569A 1076FF12 76FF0000 1B4B9A02 6A1076FF .v.j..K....v..v..V...Õ..Õ..Õ..=. 0001E0

Dump of file SATURN:[PCCOMMON.DUMP.DLL]ANALDESK.TMP;1 on 18-APR-1990 10:36:25.56
File ID (485,24,0)   End of file block 102 / Allocated 104

Virtual block number 47 (0000002F), 512 (0200) bytes

0C76FF0E 76FF1076 FF1276FF 004BE9FF E7E9FFCF E9037500 023DFF08 E9(¯7500 .u.Õ..=..u.Õu.ÕÕ.ÕK..v..v..v..v. 000000
7500223D FECCE903 7500203D 002BE900 37E90000 18B99A06 76FF0876 FF0A76FF .v..v..v..¿...Õ7.Õ+.= .u.Õ¤±=".u 000020
B8FFB5E9 FDACE903 7500383D FEB1E903 7500303D FEA1E903 7500293D FE6EE903 .Õn±=).u.ÕÁ±=0.u.ÕY±=;.u.Õ¯»Õç.¡ 000040
46800676 FFD88E1C BEB81E56 57000004 C8000ECA C95F5E1F 0000E900 00BA0000 ..¤..Õ...^_èò..à...WV.¡ƒ..Ä.v..F 000060
010302C7 00081660 0203002D 90CBC95F 5E1F0000 E9000088 00001C30 9A5016FC ▪.P.0...¡.¯Õ...^_èù.-...'...ú... 000080
01030000 00041C3F 00020005 00011ABA 0203000C 00060302 020300F3 000315D5 (...µ...▪...É...ō........?....... 0000A0
0103007E 00031E88 0103007C 00031C67 01030000 00051819 0002007A 00031C56 V...z...........g...|........-... 0000C0
01030259 00080FC1 02031698 000415A6 00050000 00061956 0002007F 00031D13 ........V.......Ï........è...Y... 0000E0
010302E0 000808D0 02030007 00031E96 01030087 00031E10 01030086 00031053 S.........................Å...Å... 000100
02030171 00071970 020301EE 000719CE 02030088 00031DA6 01030008 00030058 [.......Ï........ö...Ÿ...p...q... 000120
01030090 00031D8A 010304AE 000403FA 00050013 00031800 0103026A 00081094 ....j...........▪...Ü............ 000140
02030000 000E1E22 0002001F 00031D39 01031CB6 00041C42 0005001E 00031CFA ▪........B...Ñ...9........"....... 000160
02030083 00031EEA 01030000 00101F37 0002027E 00080FDA 020302F1 00091CE7 Ó...þ...Ö...-...7........ö...▪... 000180
01030048 00021A1C 01030048 00021A8F 01030310 000901E8 020300A5 00061F44 D...E...Ò..............H........K... 0001A0
020302AA 00080883 0203004D 00031807 010301A8 000719F1 02030045 00031D8E /...E...þ...´........M........˜... 0001C0
0000032E 00091A36 0203005C 00031E7E 01030058 00031E77 010301B5 00071998 ....ç...w...[...-...\...6....... 0001E0

Dump of file SATURN:[PCCOMMON.DUMP.DLL]ANALDESK.TMP;1 on 18-APR-1990 10:36:25.56
File ID (485,24,0)   End of file block 102 / Allocated 104

Virtual block number 48 (00000030), 512 (0200) bytes 00000060 9A5016DE 468D016A 0A76FF00 000A46C7 D88EFFFF 881E5657 000026C8 à&..WV.¡...ÄúFÕ...v.j..F8.P.'... 000000
5016DE46 800676FF 0876FF00 20E90374 000A7E83 0057E903 74000C7E 830C4689 .FÉ.-É.t.ÕW..~Õ.t.Õ ..v..v..F8.P 000020
9A5016DE 4680006A 0A76FF00 01DA46C7 0005E903 74000030 08C483FF FF01A69A .Ï....á.=..t.Õ..úFÕ...v.j..F8.P. 000040
0009E90C 46880006 E9037584 900C7E81 0010E903 75000C7E 830C4689 0000FFFF .....FÉ.-É.u.Õ...-É..u.Õ...FÉÕ.. 000060
FC468D06 76FFD88E 0008881E 56570000 0AC8CBC9 5F5E1F00 00E90A46 8BFFA0E9 Õ...FÕÕ...^_èùà...WV.¡...Ä.v..F▪ 000080
FFFF9A50 16F6468D 008A6823 6AFA76FF FA468907 8826FC5E C40000FF FF9A5016 .P.....á^▪&¯...F▪.v▪j#hσ..F-.P... 0000A0
76FF0A76 FF08C483 00EA0056 9A505200 9105F856 88F64688 0C76FF0E 76FF0000 ...v..v..F-.V½...RP.V.ö..á..v..v 0000C0
87C726F6 5EC40082 87892610 468BF65E C408C483 00430056 9AF676FF F876FF08 ..v½.v-.V.C..á.á^-.F.&..ý.á^-&ú. 0000E0
F8568BF6 4688165E C4008897 89260086 87892614 56881246 88F65EC4 00000084 Ç...á^-.F..V.&..Ñ.&..¡.á^..F-.V½ 000100
76FFD88E 0096881E 56570000 0AC8CBC9 5F5E1F00 00E90000 88025789 26078926 &..&.W.¡..Õ...^_èùà...WV.¡...Ä.v 000120
000030F6 46890000 FFFF9A50 16F84680 0C76FF0E 76FF0876 FF0A76FF 0676FF10 ..v..v..v..v..v¯.F½.P......F-=.. 000140
0C76FF0E 76FF1076 FFF876FF FA76FF12 76FF1476 FF002CE9 F6468800 06E90375 u.Õ...F-Õ,..v..v..v▪.v½.v..v..v. 000160
00002CC8 CBC95F5E 1F0000E9 F6468814 C483FFFF 008E9A06 76FF0876 FF0A76FF .v..v..v.......á..F-Õ...^_èùà,.. 000180
46890000 FFFF9A50 16FC4680 0876FF0A 76FF0676 FF0C76FF 088E013A 881E5657 WV.¡:..Ä.v..v..v..v..F▪.P......F 0001A0
9A5016D6 46805016 DA4680FC 76FFFE76 FF0051E9 04468800 06E90375 00003004 á=..u.Õ...FâÕo..v±.v▪.FO.P.F▪.P. 0001C0
76FFFE76 FF0E76FF 1076FF00 28E9D446 880006E9 03750000 30D44689 0000FFFF .....Fá=..u.Õ...FâÕ+..v..v..v±.v 0001E0

```
Dump of file SATURN:[PCCOMMON.DUMP.DLL]ANALDESK.TMP;1 on 18-APR-1990 10:36:25.56
File ID (485,24,0)   End of file block 102 / Allocated 104

Virtual block number 49 (00000031), 512 (0200) bytes

 0000E900 008814C4 83018C00 8E9A0676 FF0876FF 0A76FF50 160A468D 0C76FFFC •.v..FÖ.P.v..v..v.......á.¡..Õ.. 000000
 681E0086 B7FF26J0 8887FF26 065EC4D8 8E01A488 1E565700 0002C8CB C95F5E1F .^_èùà...WV.¡Ê..Ää^.&.ñ¡.&.ñÑ..h 000020
 008887FF 26065EC4 0037E9FE 46880006 E9037500 003DFE46 890000FF FF9A10FC •.......F±=..u.Õ...F±Ö7.á^.&.ñ¡. 000040
 C40000FF FF9A0086 87FF2600 8887FF26 065EC4FE 46890000 FFFF9A00 8687FF26 &.ñÑ.......F±á^.&.ñ¡.&.ñÑ......á 000060
 D88E022D 881E5657 000002C8 C8C95F5E 1F0000E9 FE468800 00008487 C726065E ^.&ú.Ç....F±Õ...^_èùà...WV.¡-..Ä 000080
 06E90375 00003DFE 46890000 02439A11 09681E00 8687FF26 008887FF 26065EC4 á^.&.ñ¡.&.ñÑ..h...C....F±=..u.Õ. 0000A0
 890000FF FF9A0A76 FF0C76FF 008687FF 26008887 FF26065E C4003DE9 FE468800 ..F±Õ=.á^.&.ñ¡.&.ñÑ..v..v....... 0000C0
 46880000 008487C7 26065EC4 0000027B 9A008687 FF260088 87FF2606 5EC4FE46 F±á^.&.ñ¡.&.ñÑ..(...á^.&ú.Ç....F 0000E0
 87FF2600 8887FF26 065EC4D8 8E029C88 1E565700 0002C8CB C95F5E1F 0000E9FE ±Õ...^_èùà...WV.¡...Ää^.&.ñ¡.&.ñ 000100
 26065EC4 004CE9FE 46880006 E9037500 003DFE46 89000002 829A1124 681E0086 Ñ..h$..ý....F±=..u.Õ...F±ÕL.á^.& 000120
 26008887 FF26065E C4FE4689 0000FFFF 9A0A76FF 0C76FF00 8687FF26 008887FF .ñ¡.&.ñÑ..v..v........F±á^.&.ñ¡.& 000140
 83000600 569A5052 00910508 56880646 880A76FF 0C76FF00 0002F09A 008687FF .ñÑ..Þ....v..v..F..V....RP.V.ø.. 000160
 000C0006 00A30203 01490007 03500203 000E90C8 C95F5E1F 0000E900 008808C4 á.¡..Õ...^_èù.....P...I...È...É. 000180
 01650007 01560203 010C0007 01E00203 00000005 02150002 01580007 018A0203 ..o...X...........À...É...V...e. 0001A0
 00000010 03110002 01870007 020B0203 0000000E 037D0002 017F0007 02660203 ..f........)........Ù............. 0001C0
 013D0007 001C0203 00460005 008E0203 01900007 03650203 01910007 03270203 ..'.......e......./...F.......=. 0001E0

Dump of file SATURN:[PCCOMMON.DUMP.DLL]ANALDESK.TMP;1 on 18-APR-1990 10:36:25.56
File ID (485,24,0)   End of file block 102 / Allocated 104

Virtual block number 50 (00000032), 512 (0200) bytes

 16F6468D F476FF00 00FFFF9A 5016F446 800C76FF D88EFFFF 881E5657 00000CC8 à...WV.¡...Ä.v..F¶.P......√¶.F-. 000000
 A5DA8E1E 0716F088 FA7E8000 1205F856 88F64688 008EE90A 46880000 FFFF9A50 P......F.Õ...F-.V½....~ª.Þ....ÕE 000020
 0085E91F A5A5A5DA 8E1E0716 F088FA7E 80001805 F85688F6 4688009F E91FA5A5 ÈE.Õ...F-.V½....~ª.Þ....ÕEEE.Õ.. 000040
 F85688F6 4688006B E91FA5A5 A5DA8E1E 0716F088 FA7E8000 2405F856 88F64688 .F-.V½.$..-ª.Þ....ÕEEE.Õk..F-.V½ 000060
 FA7E8000 2A05F856 88F64688 0051E91F A5A5A5DA 8E1E0716 F088FA7E 80001E05 ....-ª.Þ....ÕEEE.ÕQ..F-.V½.*..-ª 000080
 E9037500 0930002B E9002EE9 005CE99E 59880037 E91FA5A5 A5DA8E1E 0716F088 .Þ....ÕEEE.Õ7.¡Y.Õ\.Õ..Õ+.=..u.Õ 0000A0
 E9037500 003DFFA0 E9037500 0C3DFF8E E9037500 083DFF7C E9037500 0A3DFF6A j.=..u.Õ|.=..u.Õ..=..u.Õ..=..u.Õ 0000C0
 00FFFF9A 0676FF08 76FFFC76 FFFE76FF 001AE903 75FE4608 FC4688FF C9E9FFB2 ý.Õè..F•.F±u.Õ...v±.v•.v..v..... 0000E0
 08881E56 5700000C C80008CA C95F5E1F 0000E99E 58880006 E90009E9 00008800 .¡..Õ..Õ..¡X.Õ...^_èò..à...WV.¡. 000100
 0E468800 0000229A 5016F646 8DF476FF 00000015 9A5016F4 46801076 FFD88E00 ..Ä.v..F¶.P......√¶.F-.P."....F. 000120
 F6468800 9FE91FA5 A5A5DA8E 1E0716F0 88FA7E8D 001205F8 5688F646 88008EE9 Õ...F-.V½....-ª.Þ....ÕEEE.Õ...F- 000140
 002405F8 5688F646 880085E9 1FA5A5A5 DA8E1E07 16F088FA 7E800018 05F85688 .V½....-ª.Þ....ÕEEE.Õ...F-.V½.$. 000160
 16F088FA 7E80001E 05F85688 F6468800 68E91FA5 A5A5DA8E 1E0716F0 88FA7E8D .-ª.Þ....ÕEEE.Õk..F-.V½....-ª.Þ. 000180
 A5A5DA8E 1E0716F0 88FA7E8D 002A05F8 5688F646 880051E9 1FA5A5A5 DA8E1E07 ...ÕEEE.ÕQ..F-.V½.*..-ª.Þ....ÕEE 0001A0
 7CE90375 000A3DFF 6AE90375 00093000 28E9002E E9006CE9 9E598800 37E91FA5 Ê.Õ7.¡Y.Õl.Õ..Õ+.=..u.Õj.=..u.Õ| 0001C0
 08FC4688 FFC9E9FF 82E90375 00003DFF A0E90375 000C3DFF 8EE90375 000B3DFF .=..u.Õ..=..u.Õ..=..u.Õý.Õè..F•. 0001E0

Dump of file SATURN:[PCCOMMON.DUMP.DLL]ANALDESK.TMP;1 on 18-APR-1990 10:36:25.56
File ID (485,24,0)   End of file block 102 / Allocated 104

Virtual block number 51 (00000033), 512 (0200) bytes

 5688FC46 88065EC4 000000F0 9A0A76FF 0C76FFFC 76FFFE76 FF002AE9 0375FE46 F±u.Õ*..v±.v•.v..v..»...á^..F•.V 000000
 0300040C CAC95F5  1F0000E9 9E588800 06E90009 E9000088 02578926 078926FE ±&..&.W.¡..Õ..Õ..¡X.Õ...^_èò.... 000020
 00012500 06012C0¿ 03000000 10011F00 02000C00 06013902 0301C900 07021402 .....è...9...É...............%.. 000040
 00FFFF9A 5016FC46 800477FF 260677FF 26065EC4 D88EFFFF 881E5657 000004C8 à...WV.¡...Äá^.&.w.&.w..F•.P.... 000060
 C8C8C95F 5E1F0000 E90000FF FF9A0086 87FF2600 8887FF26 045FC426 FC5EC400 .á^•&á_.&.ñ¡.&.ñÑ......Õ...^_èùà 000080
 FFFF9A50 16F6468D 1134681E 01006850 16FEF686 80088E00 08881E56 5700010C ...WV.¡...Ä..-±.Ph...h4..F-.P̄... 0000A0
 00FFFF9A 5016FC46 8D113068 1EF676FF 0063E900 01880006 E9037500 00300000 ..=..u.Õ..¡..Õc..v-.h=..F•.P.... 0000C0
 FF260677 FF26065E C4003CE9 00018800 0000C89A F676FF00 0EE90375 00003D00 .=..u.Õ...v-.à...¡..Õ<.á^.&.w.&. 0000E0
 FC5EFF00 8687FF26 008887FF 26045FC4 26F85EC4 0000001D 9A5016F8 46800477 w..F½.P.....á^½&á_.&.ñ¡.&.ñÑ..^• 000100
 881E5657 000004C8 CBC95F5E 1F0000E9 FEF48688 0000FFFF 9AF676FF FEF48689 ..¶±.v-.......¶±Õ...^_èùà...WV.¡ 000120
 045FC426 FC5EC400 0000A89A 5016FC46 8D0477FF 260677FF 26065EC4 D88E0047 G..Ää^.&.w.&.w..F•.P.˜...á^•&á_. 000140
 E0881E56 5700010C C8C8C95F 5E1F0000 E90000FF FF9A0086 87FF2600 8887FF26 &.ñ¡.&.ñÑ......Õ...^_èùà...WV.¡Ä 000160
 E9037500 003D0000 005E9A50 16F6468D 114C681E 01006850 16FEF686 80088E00 ..Ä..-±.Ph...hL..F-.P̄.^...=..u.Õ 000180
 0EE90375 00003D00 00007D9A 5016FC46 80115568 1EF676FF 0063E900 01880006 ..¡..Õc..v-.hU..F•.P.)...=..u.Õ. 0001A0
 9A5016F8 46800477 FF260677 FF26065E C4003CE9 00018800 0001A09A F676FF00 ..v-.....¡..Õ<.á^.&.w.&.w..F½.P. 0001C0
 9AF676FF FEF48689 FC5EFF00 8687FF26 008887FF 26045FC4 26F85EC4 000000F5 %...á^½&á_.&.ñ¡.&.ñÑ..^•..¶±.v-. 0001E0
```

```
Dump of file SATURN:[PCCOMMON.DUMP.DLL]ANALDESK.TMP;1 on 18-APR-1990 10:36:25.56
File ID (485,24,0)   End of file block 102 / Allocated 104

Virtual block number 52 (00000034), 512 (0200) bytes

00020136 010301FC 00070033 02030007 CBC95F5E 1F0000E9 FEF48688 0000008D ......¶±Õ...^_èù....3...•...6... 000000
0010011F 0002002E 00020165 01030020 00020155 01030204 00070108 0203002C ,...........U...-...e........... 000020
FEF6868D D88EFFFF B81E5657 00010CC8 00000000 00000289 00080180 02030000 ........¿.......à...WV.¡...Ã..-± 000040
65E90001 880006E9 03750000 300000FF FF9A5016 FA468D11 64681E01 00685016 .Ph...hd..F•.P.....=..u.Õ..¡..Õe 000060
00889AFA 76FF000E E9037500 00300000 FFFF9A50 16F64680 116C681E FA76FF00 ..v•.hl..F-.P.....=..u.Õ...v•... 000080
0A76FF00 00FFFF9A 5016FC46 8D0477FF 260677FF 26065EC4 003EE900 01880000 ..¡..Õ>.á^.&.w.&.w..F•.P......v. 0000A0
880000FF FF9AFA76 FFFEF486 89F65EFF 50520091 05065788 26044788 26FC5EC4 á^•&.G.&.W....RP.^-..¶±.v•...... 0000C0
01030020 0002003E 0103002C 0002001F 01030005 90CBC95F 5E1F0000 E9FEF486 .¶±Õ...^_èù........,...>...-... 0000E0
00000000 00000000 00000289 00080069 02030000 00100008 0002002E 0002004E N...............i...¿........... 000100
16F64680 0477FF26 0677FF26 065EC400 C8FA46C7 D88EFFFF B81E5657 0001D4C8 àå..WV.¡...ÀúF•à.á^.&.w.&.w..F-. 000120
00FFFF9A 5016FC46 8D0086B7 FF260088 87FF2604 5FC426F6 5EC40000 FFFF9A50 P.....á^-&á_.&.ñ¡.&.ñÑ..F•.P.... 000140
FFFF9A11 A2681E11 7E681E01 00685016 FE2C868D 00F6E903 74FE4608 FC468800 ..F•.F±t.Õ-....±.Ph...h-..hÅ.... 000160
0000969A 11A8681E 1182681E 11A236FF 0169E900 01880006 E9037500 00300000 ..=..u.Õ..¡..Õi..6Å..h...h´..... 000180
E9037500 00300000 FFFF9A11 A4681E11 8C681E11 A236FF00 19E90374 00003000 .=..t.Õ...6Å..h...hÊ......=..u.Õ 0001A0
87FF2600 8887FF26 045FC426 F65EC401 28E90001 880000FF FF9A11A2 36FF000F ...6Å......¡..Õ(.á^-&á_.&.ñ¡.&.ñ 0001C0
95681E00 6A00FEE9 FF2C8688 0007E903 7500FF2C BE83FF2C 868911A8 1EFF0086 Ñ...´....,..f,..u.Õ....,.Õ±.j..h. 0001E0

Dump of file SATURN:[PCCOMMON.DUMP.DLL]ANALDESK.TMP;1 on 18-APR-1990 10:36:25.56
File ID (485,24,0)   End of file block 102 / Allocated 104

Virtual block number 53 (00000035), 512 (0200) bytes

BE83FF2C 868914C4 830000FF FF9A016A 5016FF2E 868D5016 FA468011 96681E11 ..h...F•.P.....Pj.......á.....,f 000000
00B687FF 2600B8B7 FF26045F C426F65E C400CAE9 FF2C8688 0007E903 7500FF2C ,..u.Õ.....,Õò.á^-&á_.&.ñ¡.&.ñÑ. 000020
E9009AE9 FF2C8688 0007E903 7500FF2C BE83FF2C 868911A4 1EFF5016 FF2E868D .....P..Ê...,..f,..u.Õ....,.Õ..Õ 000040
C4830000 00F39A02 6A5016FF 2E868050 16FA468D 119C681E 1198681E 006A0097 ..j..h...h...F•.P.....Pj..µ....á 000060
87FF2604 5FC426F6 5EC40063 E9FF2C86 880007E9 037500FF 2CBE83FF 2C868914 ......f,..u.Õ.....,Õc.á^-&á_.&.ñ 000080
880007E9 037500FF 2CBE83FF 2C868911 A41EFF50 16FF2E86 8D0086B7 FF260088 ¡.&.ñÑ......P..Ê......f,..u.Õ... 0000A0
83FF2C86 8911A81E FF00B687 FF260088 87FF2604 5FC426F6 5EC40033 E9FF2C86 .,.Õ3.á^-&á_.&.ñ¡.&.ñÑ...´...,.. 0000C0
0007CBC9 5F5E1F00 0000A79A 11A236FF 0009E9FF 2C868800 07E90375 00FF2CBE f,..u.Õ....,.Õ...6Å..Ï....^_èù.. 0000E0
00000010 00080002 002E0002 01050103 00200002 00700103 002C0002 005E0103 ..^.......)....-...(............ 000100
00000000 00000000 02B90008 00220203 02330007 00300203 03010009 015A0203 ..Z.......=...3...".....¿......... 000120
9A5016FE FA868011 AC681E01 00685016 FEFC868D D88EFFFF B81E5657 000110C8 à...WV.¡...Á..•±.Ph...h¯...•±.P. 000140
9A5016FC 46801. 0 681EFEFA B6FF010F E90001B8 0006E903 75000030 0000FFFF ....=..u.Õ..¡..ÕÕ..Ñ•±.h¯..F•.P. 000160
86890000 B801B6c? 0001B800 0001949A FEFAB6FF 000FE903 75000030 0000FFFF ....=..u.Õ...Ñ•±.....¡..ÕÑ.¡.... 000180
FEF08680 1477FF26 1677FF26 065EC409 6A0C76FF 00F8E90A 4688FEF0 8689FEF2 ·±..Þ±.F.Õ½..v.j.á^.&.w.&.w...Þ± 0001A0
0C76FF00 F2E9FEF8 9689FEF6 86890014 05085688 064688FE F48689FC 5EFF5016 .P.^•..¶±.F..V......-±..½±Õ·..v. 0001C0
08568806 4688FEF4 8689FC5E FF5016FE F08680 1A 77FF261C 77FF2606 5EC40A6A j.á^.&.w.&.w...Þ±.P.^•..¶±.F..V. 0001E0

Dump of file SATURN:[PCCOMMON.DUMP.DLL]ANALDESK.TMP;1 on 18-APR-1990 10:36:25.56
File ID (485,24,0)   End of file block 102 / Allocated 104

Virtual block number 54 (00000036), 512 (0200) bytes

868D2077 FF262277 FF26065E C40C6A0C 76FF00C1 E9FEF896 89FEF686 89001A05 .....-±..½±Õè..v.j.á^.&.w"&.w .. 000000
FF0090E9 FEF89689 FEF68689 00200508 56880646 88FEF486 89FC5EFF 5016FEF0 Þ±.P.^•..¶±.F..V.. ...-±..½±Õ... 000020
8806468B FEF48689 FC5EFF50 16FEF086 8D2677FF 262877FF 26065EC4 086A0C76 v.j.á^.&.w(&.w&..Þ±.P.^•..¶±.F.. 000040
2C77FF26 2E77FF26 065EC400 6A0C76FF 005FE9FE F89689FE F6868900 26050856 V..&...-±..½±Õ_..v.j.á^.&.w.&.w, 000060
2EE9FEF8 9689FEF6 8689002C 05085688 064688FE F48689FC 5EFF5016 FEF08680 ..Þ±.P.^•..¶±.F..V..,...-±..½±Õ. 000080
75022730 FF52E90_ 75022630 FF29E903 75022530 FF00E903 75022430 0028E900 .Õ+.=$.u.Õ..=%.u.Õ).=&.u.ÕR.=’.u 0000A0
E9037500 FEF48E83 0000FFFF 9AFEFAB6 FF0000E9 FFA4E903 75022830 FF78E903 .Õ(.=(.u.ÕÊ.Õ...Ñ•±....../¶±.u.Õ 0000C0
9688FEF0 8688FEF6 9EC40055 E90375FE F28608FE F0868800 68E9FEF4 86880007 ....¶±Õh...Þ±..·±u.ÕU.á.-±..Þ±.. 0000E0
FF9A37FF 260277FF 26FEF69E C40038E9 03750257 39260009 E9037407 3926FEF2 ·±&9.t.Õ..&9W.u.Õ8.á.-±&.w.&.7.. 000100
FEF0868B FEF69EC4 0019E9FE F4868800 07E90375 00FEF48E 83FEF486 890000FF .....¶±./¶±.u.Õ....¶±Õ..á.-±..Þ± 000120
002C0002 00200103 0005CBC9 5F5E1F00 00E90000 88025789 26078926 FEF2968B ..·±&..&.W.¡..Õ...^_èù.... ....,. 000140
01A80007 01DF0203 00000010 00080002 002E0002 00510103 00200002 00400103 ..a...·...Q................Õ...´. 000160
FF9A5016 FE468D11 BA681E01 00685016 FEFE868D D88EFFFF B81E5657 00010AC8 à...WV.¡...Á..±±.Ph...ho..F±.P.. 000180
FF9A5016 FEFA868D 11BE681E FE76FF00 58E90001 880006E9 03750000 300000FF ...=..u.Õ..¡..Õ[..v±.h/...•±.P.. 0001A0
FEF68680 0A76FF00 33E90001 88000000 829AFE76 FF000EE9 03750000 300000FF ...=..u.Õ...v±.....¡..Õ3..v...-± 0001C0
76FFFEFA 9EFF0A77 FF260C77 FF26065E C4FEF686 FFFEF886 FF0000FF FF9A5016 .P......Ñ½±.Ñ-±á^.&.w.&.w...•±.v 0001E0
```

```
Dump of file SATURN:[PCCOMMON.DUMP.DLL]ANALDESK.TMP;1 on 18-APR-1990 10:36:25.56
File ID (485,24,0)   End of file block 102 / Allocated 104

Virtual block number 55 (00000037), 512 (0200) bytes

 003F0103 002C000? 001F0103 000590CB C95F5E1F 0000E900 00880000 FFFF9AFE ±.....¡..Õ...^_èù..............?. 000000
 00000000 00A50006 00630203 00000010 00080002 002E0002 004F0103 002D0002 ..¯...O...............c...Ê..... 000020
 74D00BFF 2A9689F! 28868900 00FFFF9A 016A006A D88EFFFF 881E5657 000008C8 ÀÀ..WV.¡...Áj.j........(...*..Àt 000040
 FFFF9A50 16FF308c 30000068 006AFF28 B6FFFF2A B6FF0048 E9000088 0006E903 .Õ..¡..ÕH..Ñ*..Ñ(.j.hÀ...O..P... 000060
 9689FF2C 86890000 FFFF9A26 6A016A00 6A0000FF FF9AFF28 B6FFFF2A B6FF0000 ...Ñ*..Ñ(......j.j.j&........,... 000080
 08881E56 5700000A C8C8C95F 5E1F0000 E9FF2C86 03FF7C86 03E001A0 4688FF2E ...F.ÌÀ..|...,.Õ...^_èùà...WV.|. 0000A0
 89000000 569A156A 016A006A FC5689FA 46890000 00989A14 6A016A00 6AD88E00 ..Äj.j.j.......F*.V•j.j.j..V.... 0000C0
 88FA76FF FE76FF00 6A006A00 6A0676FF 0876FFFE 4689FFFF 00009AF8 5689F646 F-.V½......F±.v..v.j.j.j..v±.v*. 0000E0
 00CA0103 000790CB C95F5E1F 0000E900 00880000 FFFF9A08 036850FE 4628F646 F-+F±Ph.......¡..Õ...^_èù.....ò. 000100
 007F0002 009F0004 003E0103 0000000C 00A80002 00950003 008A0103 00080003 ..............¨.......>......... 000120
 00000000 00000000 00000000 002C0003 00480103 00280003 00110103 00000010 ...........+...K................ 000140
 00000000 00000000 00000F00 02000200 01C80001 881F0200 3E89088E FFFF881E .¡...Á.>...¡..ù................. 000160
 FFFFB9C0 33067EC4 1EDE88D7 88EC8855 00000000 00000000 00000000 00000000 ................U.š.■.B.é-.3à¿.. 000180
 01C6F706 4688FE87 08468ED8 8EC08CF9 28D1F7AE F2FFFFB9 0A7EC4FF 7580AEF2 ·Ù.u.é~.¿...Ü%ì+*.à.Á.F..±.F.%ó. 0001A0
 76C51EDE 88D788EC 8855C850 C28C1FFA 88F388A4 F3C913A5 F3E9D149 A4027400 .t.ÉlìÕµÉ.èµÉ.µ.*..ô]ùU.š.■.B.év 0001C0
 13A5F3E9 D149A402 7401A8C7 88067EC4 D1F7AEF2 FFFFB9C0 33C08ED8 8CFE880A ..±.Á.à3à¿...Ü%ìé-..ú´.t.ÉlìÕµÉ. 0001E0

Dump of file SATURN:[PCCOMMON.DUMP.DLL]ANALDESK.TMP;1 on 18-APR-1990 10:36:25.56
File ID (485,24,0)   End of file block 102 / Allocated 104

Virtual block number 56 (00000038), 512 (0200) bytes

 F2FFFFB9 C0330A7E C40676C5 1EDE88D7 88EC8855 CB5DC28C 1FFA88F3 88A4F3C9 èµÉ.µ.*..ô]ùU.š.■.B.év.é-.3à¿... 000000
 C033067E C4078EEC 885500CB 5DFA88F3 881FFFFF 1DC01805 74A6F3F9 28D1F7AE Ü%ì+*µ!t..à.....µ.*]ù.U.š.■é-.3à 000020
 E30E4E88 DF880A76 C5067EC4 1E5657EC 885500CB 5DFA8891 49D1F7AE F2FFFFB9 ¿...Ü%ì]..*]ù.U.šWV.é-.év..Ô.N.D 000040
 46805657 000016C8 CB5DE588 5F5E1FC2 8CC388AA F3C032F8 E2AA0374 C00AAC0C .¯.àt.¨ã½2àµ¨.ù.ô.^_.!]ùà...WV.F 000060
 89260856 88064688 420A47C6 26F85EC4 FE568CFC 46890E46 8DFA568C F84689EC š.F%.V*.F..F•.V±é^%Ë6G.B.F..V.&. 000080
 9A53060A 76FF0C76 FFFC76FF 167FFF04 47C72602 57892607 89260857 89260647 G.&.W.&..&.W.&úG.....v•.v..v..S. 0000A0
 88260247 8E2607FF 263F8826 C02A1278 044FFF26 F85EC4F0 880CC483 01600430 0.m..é..Þé^%&.O.x.*à&.7&..&.G.&. 0000C0
 88067EC4 57EC8855 C8C95F5E C68806C4 83FFFF02 8A9A006A 53FA76FF 900FE805 .Š...v*Sj..□....é..ó^_èùU.šWé-.. 0000E0
 C28CC78B C78EFF33 04740538 264FAEF2 F8880A46 8AD9F741 AEF2FFFF 89C033DF Ô3à¿...ÜA%l.F..«·ÜO&8¯t.3..ú.ú.ô 000100
 74E03A43 278A26AC 2D74C00A FFB0065E C40A76C5 1ED688EC 885500CB 5DE5885F _.!]ù.U.š.ø.év.á^.¯..àt-¯&.'C:Àt 000120
 74C43A41 04C10220 E180C91A 1A3C412C E0864104 C10220E1 80C91A1A 3C412CF3 ¤,A<..è.Ä .è.A.Å,A<..è.Ä .è.A:àt 000140
 1A3C612C 1174C00A 078AD388 065EC5D9 8CEC8855 00C85DF2 881F98FF 1CC01AD3 Æ.à.....·)ù.U.š.lé^..Æ...àt.,a<. 000160
 C556571E 4EE30E4E 88EC8855 C850D98E DA8C92EF 75C00A07 8A4307B8 41040473 s..A..C...àuÿ..Ö.)]ùU.š.N.DN.WVé 000180
 C203C323 0818C228 02F7D688 C203C323 D818C228 D2F7D788 48C18806 7EC40A76 v.é-..èH.ø%@+ô.Ü#ù.ô.ø%@+ô.Ü#ù.ô 0001A0
 C08CC775 FF080888E FFFF05D8 8C0775F6 0818E391 A4F3C913 A5F3E9D1 C12B9140 @.+èìÕµÉ.èµÉ.D..-u..Á....Á..uù.â 0001C0
 D788067E C45738E3 0C4E88EC 8855C85D 08568806 46881F5F 5E8EEBC0 8E025605 .V..âŠƒ^_..F..V.]ùU.š.N.D8Wé-..■ 0001E0

Dump of file SATURN:[PCCOMMON.DUMP.DLL]ANALDESK.TMP;1 on 18-APR-1990 10:36:25.56
File ID (485,24,0)   End of file block 102 / Allocated 104

Virtual block number 57 (00000039), 512 (0200) bytes

 E3D187AA F3C913A8 F3E9D1E0 8A0A4688 D128D187 D1030323 D818D128 0C74DAF7 %Õt.+ì.ÜWÆ.ì.ì+ì.F..ÀìÕµ¨.èµ¨.ìD 000000
 56570000 08C8CB5D 08568806 46885FAA F3C913A8 F3E9D1C3 8E0261C3 81C38C10 ..ù.ùa..ùìÕµ¨.èµ¨_.F..V.]ùà...WV 000020
 05E001C1 03E001C8 88F9F700 0C899917 222DC388 FA4689E4 2A08478A 26085EC4 é^.&.G.*ð.F*.ü-"._¿..%*.àìÁ.èìÁ. 000040
 28E9FFFF 88200A4F 8026085E C40F7440 0A47F626 0774830A 47F626F8 46892316 .#.F%&-G..t.&-G.ât.é^.&.O. ¡..Õ+ 000060
 26020A4F 802690E2 E8000004 47C72620 0A4F8026 0E74010A 47F62608 5EC49001 ..é^.&-G..t.&.O. &úG...Šã.&.O..& 000080
 F7000CB9 9917222D C3884C75 0C0A47F6 26FC7689 F0880447 8926C028 EF.''4780 .g.ÿ+ã&.G..Þ.v•&-G..uL.ú-"..¿..% 0000A0
 1675173A 087E810E 7403630A 7E810775 172E087E 81377501 231687F6 06D8 9F9 *kÀ.-..#.u7.-...u..-.c.t..-.:.u. 0000C0
 830C51E8 0876FF0A 76FF0C75 C00802C4 83030612 309AFA76 FF0F75FF FF0A7; B1 .-...u..v*.0.ø..é..âu..v..v.ÒQ.. 0000E0
 74012316 87F606D8 68F9F700 0C899917 222DC388 1575080A 47F62608 5EC404C4 á.é^.&-G..u..ü-"..¿..%*kÀ.-..#.t 000100
 4588F87E 88025789 26078926 40085788 26064788 2606772B 26378826 085E8867 g.^.&.7&+w.&.G.&.W.ä&..&.W..-%.E 000120
 19E8FC46 8908C483 03F41098 9AFA76FF 0677FF26 5256167E F6080447 89264802 .H&.G..--.VR&.w..v*...¶..é..F•Š. 000140
 065FC426 085EC408 C4830417 105A9A53 006A006A 026A0F74 20292787 F6FA5E88 .^*-.') t.j.j.j.S.Z....é.é^.&é_. 000160
 39FC4689 08C48301 4210989A FA76FF50 1606468D 560001BE 17E80788 2606468A .F.&..Š.ƒ..V.F..P.v*...B..é..F•9 000180
 76A32C7C 88036012 549A000A 88EC8855 C8C95F5E E42A0646 8AFECCE9 0374FC76 v•t.Õä±.F.*ð^_èùU.š¡...T.m.¡|,Év 0001A0
 C72C4E16 892C4CA3 08568806 46882C68 16892C66 A3105688 0E46882C 781E8C2C ,..x,.F..V.Èf¯..h,.F..V.ÈL,..N,ú 0001C0
 A3C02800 012C7406 C7030BE9 037425F6 7E80038D E900002C 7006C700 002C7206 .r,..ú.p,..ð...--%t.ð..ú.t,..+àÉ 0001E0
```

```
Dump of file SATURN:[PCCOMMON.DUMP.DLL]ANALDESK.TMP;1 on 18-APR-1990 10:36:25.56
File ID (485,24,0)   End of file block 102 / Allocated 104

Virtual block number 58 (0000003A), 512 (0200) bytes

00202D0C 06C72C64 A32C4AA3 2C50A32C 6AA32C6C A32C54A3 2C6EA32C 52A32C56 V,ÈR,Èn,ÈT,Èl,Èj,ÈP,ÈJ,Èd,ú.É- . 000000
FF00752B 3F80260A 5E88903E EB00302D DC06C70A 46FF4975 30017F80 260A5EC4 á^.&...0ul.F.ú.É-0.Š>..^.&.?+u.. 000020
9014EB2C 6A06FF1A 75002C56 3E830E75 203F8026 9028EB00 002C6A06 C72C5606 .V,ú.j,..Š(.&.? u..>V,.u...j,Š.. 000040
EB0E5098 078A260A 5EB80A46 FF2C6406 FFC77520 3F80260A 5EC400EB 2C4A06FF ..J,Š.á^.&.?-uú..d,.F..^.&...P.Ò 000060
0C56890A 468908C4 8308C7E8 0E2C7A68 1E0A76FF 0C76FFD0 75C00802 C4830978 x..á..áuì.v..v..hz,.Òú..á..F..V. 000080
75302D0C 3E83007' 002C643E 832C7AA3 D8F72C7A A12C6406 FF0C7D00 2C7A3E83 .>z,.)...d,Àz,%ÁÈz,.>d,.t..>É-0u 0000A0
0E2C7468 1E0A76FF 060A46FF 2C6C06FF 2D752E3F 80260A5E C4002020 DC06C706 .ú.È- .á^.&.?.u-..l,.F...v..ht,. 0000C0
0A5EC42C 6C0EFF00 012C7406 C70A7D00 2C743E83 0C56890A 468908C4 83087BE8 Ò(..á..F..V..>t,.).ú.t,....l,á^. 0000E0
3E830002 2C5406C7 0675006C 302B7400 68304074 004E3030 74004630 98078A26 &...=F.t==N.t@=h.t+=l.u.ú.T,...> 000100
06C79002 4EE91C75 003F8026 0A5EC40A 46FF0375 4C3F8026 0A5EC409 75002C54 T,.u.á^.&.?Lu..F.á^.&.?.u.ÒN..ú. 000120
004530F8 46899807 8A26C8EB 00082C54 06C7D0EB 00102C54 06C7D8EB 00012C54 T,..ŠÀú.T,..ŠÀú.T,..Š&&....F½=E. 000140
91E9037E 78740069 30F8468B 20F84683 2C5206FF 08750058 30057400 47300A74 t.=G.t.=X.u...R,.F½ .F½=i.tx~.Õ. 000160
75022C54 3E839001 59E90140 E9037500 25300152 E9037E01 3FE90375 00633001 .*c.u.Õ?.-.ÕR.=X.u.Õ@.ÕY...>T,.u 000180
2C70A11F C4262C66 1EC400EB 00000247 C7260789 262C70A1 1FC4262C 661EC415 .á.f,&á.Àp,&..&úG...Š.á.f,&á.Àp, 0001A0
2C4C1EC4 01B0E903 74002C70 3E830170 E9037500 2C723E83 042C6606 83078926 &....f,..>r,.u.Õp..>p,.t.Õ§.á.L, 0001C0
019EE80E 0A6A0000 2C4A06C7 2C6E06FF 01ACE9FF FFB801AF E9037520 0A47F626 &-G. u.ÕE.¡..Õ¯...n,ú.J,..j..Ò.. 0001E0

Dump of file SATURN:[PCCOMMON.DUMP.DLL]ANALDESK.TMP;1 on 18-APR-1990 10:36:25.56
File ID (485,24,0)   End of file block 102 / Allocated 104

Virtual block number 59 (0000003B), 512 (0200) bytes

2C543E83 00042C74 06C72C6C 06FF2C52 06FF2C50 06FFF2EB 086A90C3 EB02C483 .á.Šú.j.Š-..P,..R,..l,ú.t,...>T, 000000
46892C7A A128742C 7A0639FA 46892C54 A3C02B7A 74012C54 3E830081 E9037508 .u.Õ...>T,.tz+àÈT,.F*9.z,t(Àz,.F 000020
C02B027D C00B2C7A A1052C7A 2E839090 13E80000 2C7A06C7 0A74002C 643E83FA *.>d,.t.ú.z,..Š.....z,.Àz,.à).+à 000040
227400FA 7E8302C4 83048DE8 0E3A6A02 C4830130 E80E106A 022C6606 832C7AA3 Èz,..f,.j..ÒÒ..á.j:.Ò...á..-*.t" 000060
2C7A06C7 9007EB2C 7AA3C02B 027DC00B 2C7AA300 052DFA46 88157400 2C643E83 .>d,.t..F*-..Èz,.à).+àÈz,Š..ú.z, 000080
006A90FF 3FE9106A FF10E902 2C660683 02C48300 F1E80E10 6A042C66 2E830000 ....f,.j..Òp..á...f,.Õ..j.Õ?..j. 0000A0
90FF21E9 0428E80E 256AFF2A E90349E8 0EF876FF F4E8016A 90FF39E9 026EE80E .Òn.Õ9..j.Š¶.v½.Òl.Õ*.j%.Ò(.Òl.. 0000C0
FF0C5688 0A468809 74002C54 3E83DA7E 00673005 7C006530 FF0CE903 75006430 =d.u.Õ..=e.|.=g.-Õ.>T,.t..F..V.. 0000E0
E9037500 6F30FE80 E9037500 6E30903A EBFE5689 FC468940 0C56880A 46880A4E N..F..V.@.F=.V±Š:.=n.u.Õ.±=o.u.Õ 000100
EBFF79E9 0375007B 30FEB9E9 03750075 308F7400 7330FEE0 E9037500 7030FEE4 Õ±=p.u.ÕÀ±=s.t.=u.u.Õ¿±=x.u.Õy.Š 000120
462BC38B EC75253C 0474C00A F6468807 8A26FC5E C4FC46FF 9034E80A 46FF9081 Ÿ..F.Š4..F=á^=&...F-.àt.<%uŠ.ú+F 000140
8A260A5E C40C5689 0A4689FE 568BFC46 8806C483 044CE80E 0A76FF0C 76FF500A ,P.v..v..ÒL..á..F=.V±.F..V.á^.&. 000160
12C8CBC9 2C70A1FE 51E90374 200A47F6 262C4C1E C4FC63E9 0374C00A F6468807 ..F-.àt.Õc=á.L,&-G. t.ÒQ±Àp,èùà. 000180
022C543E 832C6E06 F,94740A 067E8300 20200C06 C7067400 2C6C3E83 56570000 ..WV.>l,.t.ú.É- ..-..t...n,.>T,. 0001A0
EB042C66 0683FE56 89FC4689 02578826 078B262C 661EC419 75102C54 3:"30774 t..>T,.u.á.f,&..&.W..F=.V±..f,.Š 0001C0
8B262C66 1EC40EEB 0000FE46 C7FC4689 078B262C 661EC411 74002C6E 3EB 902C ,..>n,.t.á.f,&...F=úF±..Š.á.f,&. 0001E0

Dump of file SATURN:[PCCOMMON.DUMP.DLL]ANALDESK.TMP;1 on 18-APR-1990 10:36:25.56
File ID (485,24,0)   End of file block 102 / Allocated 104

Virtual block number 60 (0000003C), 512 (0200) bytes

EB06468B 0674FE46 08FC468B 0E74002C 4A3E8302 2C660683 FE5689FC 46899907 ...F=.V±..f,..>J,.t..F=.F±t..F.Š 000000
7D00FE7E 83317500 2C6E3E83 F45689F2 46892C78 16882C76 A12D0AA3 C02B9003 ..+àÈÖ-Àv,..x,.F .V¶.>n,.u1.-±.) 000020
46890AF7 00D2830B F7FE568B FC46882D 07C626F2 46FFF25E C41D750A 067E832B +.-..u.á^..F &ó.-.F=.V±ÅÀ.@.%Ö.F 000040
FF501E06 76FFFA5E 8CF84689 2C58B800 00F646C7 9006EB00 01F646C7 FE5689FC =.V±úF-..Š..úF-..¡X,.F½.^*.v..P. 000060
83043900 869AF876 FFFA76FF 4574002C 6C3E830A C4830910 12269AFC 76FFFE76 v±.v=.&....á..>l,.tE.v*.v½.Ñ.9.. 000080
C4F04E8B 00002D0A 06C70675 082D0A3E 83007EC9 08F04E89 C82B2C74 0E8804C4 á...t,+à.NÞ.è~..>Ö-.u.ú.Ö-...NÞá 0000A0
EE5E8C2C 520E88F0 4E89F446 8CF27E89 F47FC008 49C18847 3005C626 05E8F27E --Š.&ó.0G.èl.à.¶.~..F¶.NÞ..R,.^Ÿ 0000C0
E375003F 8026F846 FF46202C 80037C61 3C0774C9 08048807 8A26F85E C4F276C5 év á^½&.....èt.<a|.., F.F½&.?.uÐ 0000E0
88057500 F67E8308 742C6A06 082C56A1 1475002C 6E3E83EE 5E8EF45E 8CF27689 .v .^¶.^Ÿ.>n,.u.ÀV,..j,t..—.u.| 000100
01BE1874 00067E83 56570000 10C8CBC9 5F5E02C4 8302FFE8 0E50C02B 02E80001 ..Š.+áP.Ò...á.^_èùà...WV.-..t.ƒ. 000120
661EC413 74082C54 3E83008F E9022C66 0683FA56 89F84689 2C6816BB 2C66A100 .Àf,..h,.F½.V*.¯f,.Õ...>T,.t.á.f 000140
FA5E8CF8 4689FC46 89078826 2C661EC4 10EBFA56 89F84689 02578826 078B262C ,&..&.W..F½.V*Š.á.f,&...F=.F½.^* 000160
097500FC 7E83900A EB120088 1575FA46 08F8468B 0E74082C 543E8304 2C660683 ..f,..>T,.t..F½.F*u.¡À.Š...-=.u. 000180
740EBB1C 742C6C36 39F62BF4 5689F246 89FA568B F8468BFA 5E8CF846 89120788 ¡=..F½.^*.F½.V*.F .V¶+-96l,t...t 0001A0
26F246FF F25EC446 90EDEB10 7ECE3B46 1574003F 8026F246 FFF25EC4 900EEB2C ,Š..á^ .F &.?.t.F;ö-.ŠÚ.Fá^ .F & 0001C0
76FFFA76 FF5602C4 830159E8 0E570875 002C643E 83FE2B2C 7A3E88F3 75003F80 .?.uµ.>z,+±.>d,.u.W.ÒY..á.V.v*.v 0001E0
```

Dump of file SATURN:[PCCOMMON.DUMP.DLL]ANALDESK.TMP;1 on 18-APR-1990 10:36:25.56
File ID (485,24,0)   End of file block 102 / Allocated 104

Virtual block number 61 (0000003D), 512 (0200) bytes

```
 000006C8 90CBC95F 5E02C483 013CE80E 57087400 2C643E83 06C48301 83E80EF8 ½.Ò°..á..>d,.t.W.Ò<..á.^_èù.à... 000000
 C02A9003 E8018005 7547067E 83067467 067E83FE 5689FC46 892C6816 882C66A1 Àf,..h,.F=.V±.-.gt..-.Gu.¯.Š..*à 000020
 7406C706 75002C74 3E830074 00FA7E80 00062C74 06C70675 002C6C3E 83FA4688 .F*.>l,.u.ú.t,...-*.t..>t,.u.ú.t 000040
 2B68068E FC76FFFE 76FF2C76 36FF2C78 36FF0676 FF2C7436 FF2C5236 FF00012C ,...6R,.6t,.v..6x,.6v,.v±.v=..h+ 000060
 68068E2C 7636FF2C 7836FF14 75002C4A 3E831874 00FA7E80 0EC48317 021EFF26 &.....á..-*.t..>J,.u..6x,.6v,..h 000080
 8E2C7636 FF2C7836 FF147500 2C743E83 1874002C 4A3E8304 C4831706 1EFF2628 +&.....á..>J,.t..>t,.u..6x,.6v,. 0000A0
 FF18742C 6A06082C 56A10000 20DA06C7 082C6606 8304C483 170E1EFF 262B6806 .h+&.....á...f,.ú.Ò-..ÀV,..j,t.. 0000C0
 29E80E50 C02B02EB 00018805 74C00804 C4831712 1EFF262B 68068EFC 76r¨FE76 v±.v=..h+&.....á..ât.|..Š.+âP.Ò) 0000E0
 37882606 468A1478 044FFF26 2C4C1EC4 3C75002C 723E8356 000000C8 90C.¨901 .èù.à...V.>r,.u<á.L,&.O.x..F.&.7 000100
 754006C4 8308F502 8A9A0676 FF532C4E 36FF10EB E42A0488 2602478E 2607¨F26 &..&.G.&..*ðŠ..6N,S.v..¤.%..á.@u 000120
 06768857 75002C72 3E835657 000002C8 90C8C95E 2C7006FF 9005E82C 7206FF07 ...r,Š....p,^èù.à...WV.>r,.uW.v. 000140
 7206FF04 754006C4 830C5002 8A9A20DC 36FF2C4C 36FF2C4E 36FF18EB 507EF608 .--PŠ..6N,.6L,.6É-.¤.]..á.@u...r 000160
 2602478E 2607FF26 3F88262D DCA00478 044FFF26 2C4C1EC4 1E7EC008 4EC6882C ,.6N.à-.á.L,&.O.xâ.É-&.?&..&.G.& 000180
 76885657 000002C8 CBC95F5E 2C700601 06468807 75002C72 3E8304E8 E42A0588 ..*ðŠâ.>r,.u..F...p,^_èùà...WV.v 0001A0
 830CCF02 8A9A5098 078A2606 5EC42C4C 36FF2C4E 36FF22EB 5E75002C 723E830A ..>r,.u^Š".6N,.6L,á^.Ž...P.¤.ü.. 0001C0
 065EC4CD 78044FFF 262C4C1E C42574C0 084EC688 0646FF2C 7206FF04 754006C4 á.@u...r,.F..6N.ât%á.L,&.O.xéá^. 0001E0
```

Dump of file SATURN:[PCCOMMON.DUMP.DLL]ANALDESK.TMP;1 on 18-APR-1990 10:36:25.56
File ID (485,24,0)   End of file block 102 / Allocated 104

Virtual block number 62 (0000003E), 512 (0200) bytes

```
 88077500 2C723E83 CAE8E42A 05882602 478E2607 FF263F88 262C4C1E C4078A26 &..á.L,&.?&..&.G.&..*ðŠð.>r,.u.. 000000
 4689C02B F65689F4 46892C78 16882C76 A1560000 0CC8C8C9 5F5E2C70 06010A46 F...p,^_èùà...VÀv,..x,.F¶.V-+à.F 000020
 20DA3E83 06762BF0 2BF84689 04C48309 0800869A F476FF52 2C7A3688 FA4689FC =.F*.6z,R.v¶.Ñ....á..F½+Þ+v..>Ò- 000040
 19752D3F 8026F45E C4227500 2C643E83 4E017508 20DA3E83 08E802EE 83057510 .u..Ÿ.Š..>Ò-.u.N.>d,.u"á^¶&.?-u. 000060
 08743020 DC3E83F8 4EFF02C4 83FE71E8 0E509807 8A26F446 FF127530 20DC3E83 .>É-0u..F¶&...P.Òq±.á..N½.>É-0t. 000080
 FF077400 20DA3E83 0066E80E FA46FF07 7400067E 83187400 2C643E83 077EF608 .--..>d,.t..-..t..F*.Òf..>Ò-.t.. 0000A0
 7500FA7E 830A7400 067E8302 C483FE7E E80E5629 75002C64 3E830070 E80EFC46 F=.Òp..>d,.u)V.Ò-±.á..-..t..-*.u 0000C0
 0EF476FF F676FFF8 76FF0040 E80E0475 00FC7E83 0A740020 DA3E8300 39E80E04 ..Ò9..>Ò-.t..-=.u..Ò@..v½.v-.v¶. 0000E0
 3E83C8C9 5E02C483 FE38E80E 5600202D 0C06C70E 74002C64 3E8306C4 83FE85E8 Òç±.á..>d,.t.ú.É- .V.Ò8±.á.^èù.> 000100
 8302C483 FDC8E80E 306AC802 C483F0D2 E80E5000 208803E8 00288805 74002C56 V,.t.¡+.Š.¡ .P.Ò0».á.ùj0.Òà».á.. 000120
 06C8C802 C483FDAA E80E5000 788803E8 00588805 74002C52 3E831775 1020DA3E >Ò-.u..>R,.t.¡X.Š.¡x.P.Ò`».á.ùà. 000140
 46FF022C 66068337 88262C66 1EC41275 2A3F8026 0A5EC400 01FE46C7 56570000 ..WVúF±..á^.&.?*u.á.f,&.7..f,..F 000160
 FA468807 8A260A5E 88F6280A 46FFFFFF FE46C708 75203F80 260A5EC4 9060E80A .Š'.á^.&.?-u.úF±...F.+-.^.&...F* 000180
 39308026 06E8F888 0030200C 06C70675 303C0A75 2C6C3639 387F393C 3F7C303C <0|?<9.;96l,u.<0u.ú.É-0..«Š.&.=9 0001A0
 0A7E890F 7D303080 2647F188 30E983C8 03E1D1CE 0302E1C1 CE889805 8A26187F ..&....òéÀ..òÎÀ.à.Ò0.þG&.=0)Ò.-. 0001C0
 88570000 04C8C8C9 5F5E0C56 880A4688 37892606 5EC4F088 EEF7FE46 880C468C .F..F±%Ÿ.Þá^.&.7.F..V.^_èùà...W¡ 0001E0
```

Dump of file SATURN:[PCCOMMON.DUMP.DLL]ANALDESK.TMP;1 on 18-APR-1990 10:36:25.56
File ID (485,24,0)   End of file block 102 / Allocated 104

Virtual block number 63 (0000003F), 512 (0200) bytes

```
 890001B8 F4750038 26117400 30802647 01E8FC7E C4064E8A FE5E8CFC 4689120E 8..F=.^±.N.á-=Š.G&.=.t.&8.u¶|... 000000
 00FFFF9A 5016C488 50EC8855 90C8C95F C028FE46 8CFC7E89 9009E8FE 468CFC7E -=.F±Š...-=.F±+à_èù.U.$P.á.P.... 000020
 88088913 689A039E E80021E8 0000FFFF 9A12E468 1E12E668 1E2920A3 E0865800 .X.ÀÈ ).hl..hÒ.¯....Òl.Ò...h.¿.¡ 000040
 068EFF33 00008B1E 12EC16FF 00FF680E EA0F9A9A 0ED00F46 9A50C85D E5880001 ...|)ùP.F.Ï....ò.h....$..£..3... 000060
 330874CA 88A6F3C8 88018816 F08E3174 00308026 47017500 3080267F FF8912E6 |.¿..&.=.u.G&.=.t1/Þ..1.ùµ!.òt.3 000080
 C20A0572 412CAC92 04E0C00E 72412CAC 2927BF1F F788071E 061CE8E7 74AEF2C0 à·ÙtÓŠ.....%.«')¯,Ar.âÀ..¯,Ar..ò 0000A0
 00FF8816 FE1EFF04 74001700 3E830EEF 0F9A9A50 00FC88EC 885500C3 1FEDE8AA ¯ŠÚ.ú.U.$¡=.P...ÿ..>...t...±.¡.. 0000C0
 74C238AD 2872BE06 5688C08E D88E0355 885756EC 8855C85D E5880F50 0F9A9A50 P...P..|)ùW.$VW¡U..Ä.â.V./r+Ù;òt 0000E0
 76FF57EC 88550002 CA5DE588 5E5F96E8 E8F788AE F2FFFFB9 C033970C 74964010 .@.t..3ä¿..Û.%Š$._^.|]ò..U.$W.v 000100
 521E5300 028BC488 504901F7 AEF2FFFF 89C033FA 88921F74 C0080F64 0F6A9A06 ..j.d..ât...*3ä¿..¯Ü%||P.áE..S.R 000120
 89991722 20044688 283806FF 000004C8 0002CA5D E5885F58 0000FFFF 9A501651 Q.P.....[_.|)ò..à.....8+.F.-"..¿ 000140
 02C4830F A415239A 020068FE 5E8CFC46 89231605 E0D1C103 E001C888 F9F7000C ..%*.âiÀ.ÈiÀ..#.F=.^±h...#.Ê..á. 000160
 9021E802 000247C7 26FC5EC4 080A4F80 26117400 08085789 26064789 26045EC4 á^.&.G.&.W..Àt.&.O..á^=&úG...Šl. 000180
 00010247 C726FC5E C4085789 26064789 2640FE56 88FC4688 040A4F80 26045EC4 á^.&.O...F=.V±@&.G.&.W.á^=&úG... 0001A0
 065E88EC 8855C3C9 00000447 C7260257 89260789 26085788 26064788 26045EC4 á^.&.G.&.W.&..&.W.&úG...èúU.$.^. 0001C0
 0C76FF08 76FF0A76 FF53CC88 04EC8304 60E90454 E9C03300 098A0872 29251E38 ;.%)r.¤..3âÒ1.Ò'..Š..âS.v..v..v. 0001E0
```

```
Dump of file SATURN:[PCCOMMON.DUMP.DLL]ANALDESK.TMP;1 on 18-APR-19 '0 10:36:25.56
File ID (485,24,0)   End of file block 102 / Allocated 104

Virtual block number 64 (00000040), 512 (0200) bytes

 5E880CEC 83EC8855 00C85DE5 88FD2927 A78091E1 75C0855A 590000FF FF9A5116 .0.....YZ.áuÃ..Ï')».Í]ù.U.å.å..^ 000000
 46805141 415151C9 33531274 20292787 F60413E9 C0330009 BA087229 251E3806 .;.%)r.¤..3äÕ..-.') t.S3èQQAAQ.F 000020
 FC4689FE 4689^033 0856C50A 468EFA5E 8C667480 292787F6 00001083 9A5016F4 ¶.P.....-.').tf.^ª.F.éV.3à.F±.F= 000040
 88E22800 808ADC88 02ECB338 75AEF20A 8049E30C 4E88F866 89F288FA 885657FC =WV.ª.·.f%.N.DI¯.·Úu;.å..É¤..+ã. 000060
 0375F838 0080009A E90028E8 F4E2AA1A 74F83800 740A3CAC 0C4E8807 16FA88D4 å.ª...N.¯<.t.;«t.¯à¶Ò+.Õ..¯.;«u. 000080
 12549AFF FC887AE8 0093E9FA 5E8E5F5E E1E80014 E8E2E8FC 46FF0A80 AA001FE8 Ò..¯¯..F=ŠàÒ..ŠÅ^_.^ªÕ..Šz|=..T. 0000A0
 0800000F C49A5016 F4468051 521E5306 5E881FE3 CA28CF88 1F061E51 53500FF8 «.PSQ....ü+ðÒ..^.Š.RQ.F¶.P.á.... 0000C0
 74006D30 1874C008 08C4831F C3FA8858 58591F07 74080BFE 5E01F45E 881175C0 àu..^¶.^±.Üt..Y(X.ªú..á..ât.=m.t 0000E0
 5E8E0E74 40292787 F6FE5E8E 26E8F900 208A03E8 001C8A08 7500098A 00013000 .=..¤..u.¤..$.¤ .ª$&.^±-.')ât..^ 000100
 8E5F5EF8 6688FC46 28FE4688 06E8F9C0 33001C8A 0EE8F803 751A3F80 085E880A ..^..?.u.%$.¤..3áª$..F±+F=.f%^_. 000120
 46805152 1E530856 C51EEEE8 C1880475 C9080C4E 8802F7E9 C85DE588 0472FA5E ^ªr..Í]ùÒ%..N..èu..é$Y.éV.S.RQ¯F 000140
 E8001C8A CC750009 8A000130 00740060 301774C0 081F071E 0000115B 9A5016F4 ¶.P.[.......ât.=m.t.=..¤..uä¤..$ 000160
 1CBAA6E8 02751A3F 80260A88 0A744029 2787F687 75C008F4 4688C2E8 00208AC7 ú¤ .Šô.F¶.áuñ-.')ât..Ö&.?.u.$|¤. 000180
 7C00F883 11702925 1E38065E 88EC8855 0442E900 835756EC 885500A3 E8C03300 .3áŠÉ.U.ŠVW°.ÖB.U.å.^.;.%))..«.| 0001A0
 17201E38 08720828 0C885A59 00C85DE5 88C03302 E80001B8 05744029 2787F60C .-.')ât.¡..Š.3á.Í]ù.YZ.É+Ár.;. . 0001C0
 A780048B 52000288 171C2EFF 5152FC74 E9C03305 7540171C A1C85152 E3880572 r..DRQùÀ..âu.3áÕt=RQ....É..R.å.Ï 0001E0

Dump of file SATURN:[PCCOMMON.DUMP.DLL]ANALDESK.TMP;1 on 18-APR-1990 10:36:25.56
File ID (485,24,0)   End of file block 102 / Allocated 104

Virtual block number 65 (00000041), 512 (0200) bytes

 75000230 07740001 30408112 7558C008 0000FFFF 9A521650 1653C488 50872927 ')ñP.áS.P.R......âXu.Ÿâ=..t.=..u 000000
 E9037328 501EFFD8 33C28C28 5406C41E E328520E 885AD479 4829278F 08088106 .Ÿ...')KyåZ..R+D.á.T+.ô3Ü..P+s.Õ 000020
 73E8285C 8F285CBE 007CE828 5CBF285C 8E28501E FF00038B C28C2858 06C401AE Û.á.X+.ôÉ....P+/\+«\+Ò|./\+«\+Òs 000040
 28608F28 5CBED88E 0F7088C3 0000FFFF 9A12F568 0E016A08 7428603D 285C8800 .¡\+='+t.j..h%......ù|p..Á/\+«'+ 000060
 28608F28 5CBE003A E8200E8F 200E8EEC 88550000 12F09A00 6A006A03 6A0051E8 ÒQ.j.j.j..Þ...U.å/8·«8·Ò:./\+«'+ 000080
 06468A50 C033001A E828608F 28608E00 23E82860 8F28608E EC885503 E80031E8 Ò1.Š.U.å/'+«'+Ò#./'+«'+Ò..3âP.F. 0000A0
 02450805 8804EF83 0E73F738 C328501E FF0002B8 07E32852 0E880000 FFFF9A50 P.......R+D.£....P+ü;%s..ÿ....E. 0000C0
 2812E616 8800F0E9 037512E6 3639FF28 F6285657 000014C8 00C3EEEB 1DFFF274 t·..ŠYù.à...WV+-+.96Ì.u.ÕÞ...Ì.+ 0000E0
 C483130C 16369A16 F0681EF6 76FFF876 FF0C6AF8 5689F646 89F25689 F04689C0 å.FÞ.V·.F-.V%j..v%.v-.hÞ..6.É..á 000100
 5EC40CE8 47EA7500 3F8026F6 46FFF65E C4008CE9 03767FFF FE814619 74C0080A ..ât.F.±..v.Õ¥.á^-.F-&.?.uõGŠ.á^ 000120
 C48313E8 150E9A04 6A500145 8D8A7500 3F8026F6 5E88F475 003F8026 F646FFF6 -.F-&.?.u¶.^-&.?.u¤.E.Pj..8.Š..á 000140
 46886074 EE4608EC 4688FE56 89FC4689 02C48314 2115239A 56EE5689 EC468904 ..F$.VŸV.#.|..á..F=.V±.F$.FŸtm.F 000160
 369A16F0 681EF076 FFF276FF 0C6A282F 16892820 A3EE5688 EC468866 74C208FC =.ôtf.F$.VŸÉ-+../+j..v·.vÞ.hÞ..6 000180
 5EC404EC 46830257 89260789 26FE5688 FC4688EC 5EC42C74 C0080AC4 83114016 .â..á..ât,á^$.F=.V±&..&.W..F$.á^ 0001A0
 003F8026 F046FFF0 5EC4E8E8 0E74C00A 078826FC 46FFFC5E C4078A26 F046FFF0 Þ.FÞ&..á^=.F=&...ât.ŠÒá^Þ.FÞ&.?. 0001C0
 00051804 02030202 1601FA70 E90002B8 90C8C95F 5EA77500 3F8026F0 5EC4F475 u¶á^Þ&.?.uÌ^_èù.¡..Õpª......... 0001E0

Dump of file SATURN:[PCCOMMON.DUMP.DLL]ANALDESK.TMP;1 on 18-APR-1990 10:36:25.56
File ID (485,24,0)   End of file block 102 / Allocated 104

Virtual block number 66 (00000042), 512 (0200) bytes

 00520243 00410235 02121211 0D10120F 1600160C 0808070A 0C090C08 0C070906 .........................5.A.C.R. 000000
 00000807 02CE08A4 00840982 0A810A80 16060972 1C70206D 006C0859 00570053 S.W.Y.(.m p.r............É.ö.@... 000020
 8B2923A3 C85DE588 99FFFF88 0008E8C8 5DE58899 FFFF8829 1C168929 23A31608 ..É#)...)|....Í]ùÒ..|....Í]ùÉ#)É 000040
 3C04728C 3C430A76 243C0472 133CF7E2 43431674 073A2E18 75E40A00 24891476 v.¿$..Ðu..:.t.CCã%<.r.<$v.C<¥r.< 000060
 8801FE4F 80260574 C308C08C 065EC4EC 885500C3 291CA398 01478A2E 430176CA ðv.C..G..É.)û.U.åá^..á.ût.å.O±.. 000080
 A3127400 25E80^5 0028443E 831E73FF F1300646 88575602 EC83EC88 55C850E5 Í]ùW.å.å.VW.F.=Þ.@..>D+.u.ÒX.t.É 0000A0
 E5885E5F 02C48.,3 9C17289A 0676FF08 750078E8 05740018 E8157500 82E82844 D+Ò..u.Ò..t.Òx.u..v..(....á._^.Ì 0000C0
 50028051 0E4F8D50 501EC033 FE5E89FE E3834306 5E880776 065E3900 F088C85D ]ùÉÞ.9^.v..^.C.D±.^±3à.PP.Q.Q¯.P 0000E0
 880008A3 DA8E0574 02082848 A3284616 87C28838 74FFFA83 08C48315 5718D49A .å.W..á..ª.t8.ô..F+ÈH+.@t..ÖÉ... 000100
 00000500 0AA30147 8D0002A3 0000A300 0A880C47 89484800 08A3C033 088EFE5E ^±.Ã3âÉ..HH.G.¡..É..É...G.É..... 000120
 0AC8C309 8EC18CD2 08019AE8 28481E8E D833064E 88C08ED8 8CC31F08 8C0006A3 É...Ã.û.Ã.á.N.3Ü..H+Ò...@.è.1ùà. 000140
 C0280674 FFFFC2F7 FA5689F8 46891608 198A9A06 76FF006A 0876FF00 6A560000 ..Vj..v.j..v.......F%.VªXô..t.+á 000160
 FE76FF00 6A561274 0008FE56 89FC4689 02C48316 2415239A 56F87688 902FE899 .Š/..v%V.#.$..á..F=.V±.Ât.Vj..v± 000180
 E30E4E88 1E5657EC 885590C8 C95EFE56 88FC4688 9007E808 C4831583 02729A50 P.r....á.Š...F=.V±^èù.U.ŠWV..N.D 0001A0
 FF453A26 C933FF44 8AA6F30A 76C5FE88 C80309F7 AEF2C033 F788067E C4D98827 '.\á-..%3ä·Ü%Ì.ù.±év.µÌ.D.3èå:E. 0001C0
 570A7EC5 1E085688 0646880E 4E8800C8 5DE5885F 5E1FC188 D1F74949 04740477 w.t.ÌÌ%Ì.é.^_.Í]ù..N..F..V..É~.W 0001E0
```

```
Dump of file SATURN:[PCCOMMON.DUMP.DLL]ANALDESK.TMP;1 on 18-APR-1990 10:36:25.56
File ID (485,24,0)   End of file block 102 / Allocated 104

Virtual block number 67 (00000043), 512 (0200) bytes

 D23392F7 88DAF700 02830BF7 AA2DB00A 79D2080E 750AF983 1374C00A 93FC071E ..•..ât..•.u..@y.¯-`XÜ.@.XÖ.X.3@ 000000
 86AC4F05 88E275C3 0BC288AA 27040276 393C3004 D38792F1 F793F1F7 0274C008 .ât.Xb.Xb..Æ.0<9v..'`.ô.úuã..O¯. 000020
 46891722 88560000 06C800CB 5DE5885E 5F1F58DA 8CF272C7 3801448D FF448805 ..D..D.;úr`.OX._^.[]ù.à...V|"..F 000040
 46017440 04C48315 F0198E9A 53060E74 830A47F6 26FA5EC4 1CEBF62B FC5E8CFA •.^•+-Š.é^•&-G..t..S./.Þ..é.@t.F 000060
 0474D808 065E88EC 885590C8 C95EC688 0876FA46 39291216 882910A1 0CFA4683 .F•.À.)...)9F•vÁ.6^èù.U.š.^..Üt. 000080
 33057501 76E80005 88071E29 75003F83 2B3A8857 56EC8855 C85DE588 01FE4F80 .O±..[]ìω.$VWE:+.7.u)..|..Òv.u.3 0000A0
 4E882840 3689FFFE FE44C704 C6830001 04C7962B 3CA32B3A A3FE2440 24E899C0 è.$$@$±È:+Ê<+.ú....ó.úD±±..6@+.N 0000C0
 FC02778B F273EEF9 83FEE180 FA744100 D0E9CB5D E5885E5F 0009E8C0 8ED88C06 ..Á.àÒ.._^.[]ùÕÃ.At•.Ä±.•Ys`.w.• 0000E0
 E8FE4489 F7880002 05C20335 7401A8AD F0030088 1573C13B 48437401 A8FE88AD Ù.±`.tCH;ès..Ã.ÞÜ`.t5.ð....X.D±Š 000100
 74D13812 F6B9DA8C C688FE4C FEF90305 E8058948 C12BFE4C 89F9030C 74FE8BE6 Ì.±t..•.L±+èH..Š..•±L±.6.Ö¿-.;ìt 000120
 FE88F274 01A8ADF0 03FE8825 74FFFE3D 02284C06 C626C302 7F892848 1E8C2605 .&..H+...Ü&Ó.L+.=±.tX.±.ÞÜ`.t`.± 000140
 74C00808 4788E6EB FE4489F7 88000205 C203E274 01A8ADF0 03D0888C 73C13848 N;ès¥.Ã.ÞÜ`.tã.ò....X.D±Š[.G..ât 000160
 778888EB 37882844 1E8E2605 74C73817 888FD88C 127428AC 0EFE2615 EBD88E04 ..ÁŠ.&±.L+t..Ä¢E.;út.&..D+.7ŠE.w 000180
 E84E4E96 0574001D E8FE4DFE 0074005F E8984040 01240074 C63B006B E8C03306 .3àÒk.;ót.$.@@.Ò_.t.±M±Ò..t..NNŠ 0001A0
 28037401 A8FE4588 51C399C0 33024789 07882848 A3260474 C138180F 89D88C98 ..Ä¿..;èt.&ÈH+..¯G.3à.úQ.E±`.t.+ 0001C0
 C22302F7 0072C203 1572C603 C188F575 EAD10476 284A163B 267FFF8A 414149C8 àIAA¤..&;.J+v.ïõuX.è.ór..ôr.X@#ò 0001E0

Dump of file SATURN:[PCCOMMON.DUMP.DLL]ANALDESK.TMP;1 on 18-APR-1990 10:36:25.56
File ID (485,24,0)   End of file block 102 / Allocated 104

Virtual block num er 68 (00000044), 512 (0200) bytes

 C7F203F0 88FE8857 1874001D E85152C3 59C033E5 75EAD1D2 F7087500 0CE8C628 +6Ò..u.X@iõul3àYÚRQÒ..t.W.±.Þ.`ú 000000
 06500001 88505252 1ED23350 53C35A59 58FE5589 4AD72806 88067789 FFFEFE44 D±±..w..@+@J.U±XYZúSP3@.RRP¡..P. 000020
 3875000A 7E830657 56EC8855 C3D20802 74585A1F FFFA8308 C48316F7 18D49A1F ..Å.X..á..•..Z[t..@úW.ŠVW..-..u@ 000040
 44880074 F7381174 4816EE36 884CE827 720057E8 07754806 46880856 8812EE8F ¢Ÿ..V..F.Hu.ÒW.r'ŠL.6Ÿ.Ht.;Xt..D 000060
 885021EB 99FFFF88 0675D208 047316EE FE8104C6 8334735E 003EE856 0E468902 ..F.VÒ>.^s4.6..±Ÿ.s..@u.|...ŠIP. 000080
 07C03303 8816EE36 89025C89 1489E675 C085F95B 0000FFFF 9A50C033 501652C4 ÁR.P3àP.....[•.àul...\..6Ÿ..Æ3à. 0000A0
 1C03DA88 2CEBF9F2 7516EEFE 8104C683 0C74024C 39F7880E 4E88C85D E5885E5F _^.[]ù.N..X9L.t..6..±Ÿ.u`•Š,_Ö.. 0000C0
 890475F7 38DE75C0 850000FF FF9A5153 137312E8 1E390675 F738C18E D3882672 r&.Æ.è;Xu.9.Ò.s.SQ......àuÅ;Xu.. 0000E0
 88E3F706 46880875 0A5E8808 080C5E88 08468BEC 885500C3 D1880487 9212E816 .Ò.....ìù.U.š.F..^..Ä.^.u..F.XD. 000100
 04C80008 CA5DE588 D103E3F7 064688C8 030C66F7 064688C8 88E3F700 08CA5DE5 []ò..XD.à.F.Xf..à.F.XD.ì.[]ò..à. 000120
 89991722 20C38815 75080A47 F6265575 023C0324 0A478A26 065EC4F6 28560000 ..V+-á^.&.G.$.<,ωU&-G..u..ü-"..¿ 000140
 50287EC0 08FC4689 06472826 07882606 5E883974 01231687 F6060868 F9F7000C ..X•kÄ.-..#.t9.^.&..&+G..F•.â-(P 000160
 26065EC4 0874FC46 3808C483 18C41098 9A50E42A 08478A26 0677FF26 0877FF26 &.w.&.w.&.G.*ÒP...á..á.;F•t.á^.& 000180
 88000004 47C72602 57892607 89260857 88260647 8826065E C4FFFFBE 200A4F80 .O. ƒ..á^.&.G.&.W.&..&.W.&ùG.... 0001A0
 01030393 000111E4 02030007 0002130A 01030005 00021342 0103000C CBC95EC6 ó^èù....B...............ð....... 0001C0
 01050000 00101844 00020000 000E1A12 00020026 00021973 01030022 00021928 (...".. s...&...........D....... 0001E0

Dump of file SATURN:[PCCOMMON.DUMP.DLL]ANALDESK.TMP;1 on 18-APR-1990 10:36:25.56
File ID (485,24,0)   End of file block 102 / Allocated 104

Virtual block number 69 (00000045), 512 (0200) bytes

 01030058 00020ED0 0103004D 0002128C 0103003A 000210C4 01030088 000202A5 É.......á...:.......M...Ä...[... 000000
 54206E75 5220534D 00000000 00000000 00000000 00000000 0000005C 00020EBD §...\...................MS Run-T 000020
 38383931 20296328 20746867 69727970 6F432020 20797261 7262694C 20656069 ime Library - Copyright (c) 1988 000040
 50005C00 68736544 2041442F 41530011 70726F43 2074666F 736F7263 694D202C , Microsoft Corp..SA/DA Desk.\.P 000060
 7275702E 6E616068 6361625C 656C6966 6F727000 5255502E 005C454C 49464F52 ROFILE\..PUR.profile\bachman.pur 000080
 70207265 73752074 6C756166 65642064 616F6C20 74276E61 4300524F 52524500 .ERROR.Can't load default user p 0000A0
 4F525245 00727070 2E6E6160 68636162 5C656C69 666F7270 002E656C 69666F72 rofile..profile\bachman.ppr.ERRO 0000C0
 6F727020 7265746E 69727020 746C7561 66656420 64616F6C 2074276E 61430052 R.Can't load default printer pro 0000E0
 00524F52 52450060 70702E6E 61606863 61625C65 6C69666F 7270002E 656C6966 file..profile\bachman.ppm.ERROR. 000100
 6C65646F 60207373 65636F72 7020746C 75616665 64206461 6F6C2074 276E6143 Can't load default process model 000120
 52450060 64702E6E 61606863 61625C65 6C69666F 7270002E 656C6966 6F727020  profile..profile\bachman.pdm.ER 000140
 65646F6D 20617461 6420746C 75616665 64206461 6F6C2074 276E6143 00524F52 ROR.Can't load default data mode 000160
 00003264 702E6E61 60686361 625C656C 69666F72 70002E65 6C69666F 7270206C l profile..profile\bachman.pd2.. 000180
 2A2E2A00 3242442E 2A004E41 2E2A0053 4E474953 45440000 68736564 00732500 .Xs.desk..DESIGNS.*.AN.*.DB2.*.* 0001A0
 01A40000 0001001F 00000000 00687365 64007325 006C6564 6F6D2065 76615300 .Save model.Xs.desk...........Ê. 0001C0
 01A50000 0011FFFF 01A501A4 0002001F 00000000 00000000 01A40000 0011FFFF ......Ê.............Ê.Ê.......Ê. 0001E0
```

```
Dump of file SATURN:[PCCOMMON.DUMP.DLL]ANALDESK.TMP;1 on 18-APR-1990 10:36:25.56
File ID (485,24,0)   End of file block 102 / Allocated 104

Virtual block number 70 (00000046), 512 (0200) bytes

 00000000 00000000 01A60000 0001FFFF 000001A5 0003001F 00000000 00000000 ............É.........I......... 000000
 000001A4 0005001F 00000000 00000000 01A70000 0001FFFF 000001A5 00040001 ....É.........I..............É... 000020
 00000000 0004FFFF 000001A4 0000001F 00000000 00000000 01A80000 0001FFFF .....................É.......... 000040
 00000000 00000000 01AA0000 0001FFFF 000001A4 0006001F 00000000 00000000 ............É................... 000060
 000001A4 00080001 00000000 00000000 01A80000 0001FFFF 000001A4 0007001F ....É........................É... 000080
 00000000 0004FFFF 000001A4 0000001F 00000000 00000000 01AC0000 0001FFFF .....................É.......... 0000A0
 00000000 0000^00 01AE0000 0001FFFF 000001A4 00090001 00000000 00000000 ............É.........Ú......... 0000C0
 000001AF 00080. F 00000000 00000000 01AF0000 0011FFFF 01AF01A4 000A001F ....É.É.......É..............É... 0000E0
 01B10000 0001FFFF 000001AF 000C0001 00000000 00000000 01B00000 0001FFFF .....................É.........Ý. 000100
 00000000 00000000 01B20000 0001FFFF 000001AF 0000001F 00000000 00000000 ............É.........ý......... 000120
 000001B3 000F001F 00000000 00000000 01B30000 0011FFFF 01B301A4 000E001F ....É.•.......•..............•... 000140
 01B50000 0001FFFF 000001B3 0010001F 00000000 00000000 01B40000 0001FFFF ......Ç..............•.........ç. 000160
 00000000 00000000 01B60000 0001FFFF 000001A4 0011001F 00000000 00000000 ............É.........Ñ......... 000180
 000001A4 0012001F 00000000 00000000 00000000 0004FFFF 000001A4 0000001F ....É........................É... 0001A0
 01B90000 0001FFFF 000001A4 00130001 00000000 00000000 01B80000 0001FFFF ......¡..............É.........¿. 0001C0
 00000000 00000000 00000000 0004FFFF 000001A4 0000001F 00000000 00000000 ............É................... 0001E0

Dump of file SATURN:[PCCOMMON.DUMP.DLL]ANALDESK.TMP;1 on 18-APR-1990 10:36:25.56
File ID (485,24,0)   End of file block 102 / Allocated 104

Virtual block number 71 (00000047), 512 (0200) bytes

 01BC0000 0015001F 00000000 00000000 01BB0000 0001FFFF 000001A4 0014001F ....É.........É...............¥. 000000
 01BD0000 0001FFFF 000001BC 0016001F 00000000 00000000 01BC0000 0011FFFF ......¥..............¥.........§. 000020
 00000000 00000000 00000000 0004FFFF 000001BC 0000001F 00000000 00000000 .............¥.................. 000040
 000001BC 00180000 00000000 00000000 01BF0000 0001FFFF 000001BC 00170000 ....¥.........«...............¥... 000060
 01C10000 0001FFFF 000001BC 00190000 00000000 00000000 01C00000 0001FFFF ......à..............¥.........è. 000080
 00000000 00000000 01C20000 0001FFFF 000001BC 001A0000 00000000 00000000 .............¥.........ò........ 0000A0
 000001BC 001B001F 00000000 00000000 00000000 0004FFFF 000001BC 00000000 ....¥.........................¥... 0000C0
 01C50000 0001FFFF 000001BC 001C0001 00000000 00000000 01C40000 0001FFFF ......á..............¥.........é. 0000E0
 00000000 00000000 01C60000 0001FFFF 000001BC 001D0001 00000000 00000000 .............¥.........ó........ 000100
 000001BC 00000001 00000000 00000000 01C70000 0001FFFF 000001BC 001E001F ....¥.........ú...............¥... 000120
 01C90000 0001FFFF 000001BC 001F0001 00000000 00000000 00000000 0004FFFF .....................¥.........è. 000140
 00000000 00000000 01CA0000 0001FFFF 000001BC 00200001 00000000 00000000 .............¥.........ò........ 000160
 01CC01BC 00210001 00000000 00000000 00000000 0004FFFF 000001BC 00000001 ....¥......................!.¥.à. 000180
 01CD0000 0011FFFF 01CD01CC 0022001F 00000000 00000000 01CC0000 0011FFFF ......à............".à.è.......è. 0001A0
 00000000 00000000 01CE0000 0001FFFF 000001CD 0023001F 00000000 00000000 ...........#.è.........ö........ 0001C0
 000001CD 0025001F 00000000 00000000 01CF0000 0001FFFF 000001CD 0024001F ..$.è.........ü............%.è... 0001E0

Dump of file SATURN:[PCCOMMON.DUMP.DLL]ANALDESK.TMP;1 on 18-APR-1990 10:36:25.56
File ID (485,24,0)   End of file block 102 / Allocated 104

Virtual block number 72 (00000048), 512 (0200) bytes

 01D10000 0011FFFF 01D101CC 00260001 00000000 00000000 01D00000 0001FFFF ......Ä.............&.ä.Ì.......Ì. 000000
 00000000 00000000 01D20000 0001FFFF 000001D1 0027001F 00000000 00000000 ..........'.Ì.........Ò......... 000020
 000001D1 0029001F 00000000 00000000 01D30000 0001FFFF 000001D1 0028001F ..(.Ì.........Ó...........).Ì... 000040
 01D50000 0001FFFF 000001D1 002A001F 00000000 00000000 01D40000 0001FFFF ......Å..............*.Ì.........Ì. 000060
 00000000 00000000 01D60000 0011FFFF 01D601CC 00280001 00000000 00000000 ..........+.ä.Ö.......Ö......... 000080
 000001D6 002D001F 00000000 00000000 01D70000 0001FFFF 000001D6 002C001F ..,.Ö.........×............-.Ö... 0000A0
 01D90000 0001FFFF 000001D6 002E001F 00000000 00000000 01D80000 0001FFFF ......Ä..............Ö.........\. 0000C0
 00000000 00000000 01DA0000 0001FFFF 000001D6 002F001F 00000000 00000000 ........../.Ö.........Ö......... 0000E0
 000001D6 0032001F 0.000000 00000000 01DB0000 0001FFFF 000001D6 0030001F ..0.Ö.........Û...........2.Ö... 000100
 01DC0000 0001FFFF 000001D6 0031001F 00000000 00000000 01DD0000 C..1FFFF ......Ì..............1.Ö.........É. 000120
 00000000 00000000 01DF0000 0001FFFF 000001D6 0034001F 00000000 00. .0000 ..........4.Ö.........Ô......... 000140
 01E001CC 0035001F 00000000 00000000 01DE0000 0001FFFF 000001D6 0033.01F ..3.Ö.........Þ...........5.ä.À. 000160
 01E10000 0001FFFF 000001E0 0036001F 00000000 00000000 01E00000 0011FFFF ......Á..............6.À.........À. 000180
 00000000 00000000 01E20000 0001FFFF 000001E0 0037001F 00000000 00000000 ..........7.À.........â......... 0001A0
 000001E0 0039001F 00000000 00000000 01E30000 0001FFFF 000001E0 0038001F ..8.À.........D...........9.À... 0001C0
 01E50000 0001FFFF 000001E0 003A001F 00000000 00000000 01E40000 0001FFFF ......ð..............:.À.........Ì. 0001E0
```

```
Dump of file SATURN:[PCCOMMON.DUMP.DLL]ANALDESK.TMP;1 on 18-APR-1990 10:36:25.56
File ID (485,24,0)   End of file block 102 / Allocated 104

Virtual block number 73 (00000049), 512 (0200) bytes

00000000 00000C00 01E60000 0011FFFF 01E60000 003C001F 00000000 00000000 ..........<...!.......!......... 000000
000001E6 003E001F 00000000 00000000 01E70000 0001FFFF 000001E6 003D001F ..=.|.........ô...........>.|... 000020
01E90000 0011FFFF 01E90000 0046001F 00000000 00000000 01E80000 0001FFFF ......ô...........F...ô.......ô. 000040
00000000 00000000 01EA0000 0011FFFF 01EA01E9 0047001F 00000000 00000000 ..........G.ô.ô.......ô......... 000060
000001EA 00490001 00000000 00000000 01EB0000 0001FFFF 000001EA 00480001 ..N.ô.........Š...........I.ô... 000080
01ED0000 0001FFFF 000001EA 004A001E 00000000 00000000 01EC0000 0001FFFF ......&...........J.ô.........Ü. 0000A0
00000000 00000000 00000000 0004FFFF 000001EA 0000001E 00000000 00000000 ............ô................... 0000C0
000001EA 004C001C 00000000 00000000 01EF0000 0001FFFF 000001EA 004B001C ..K.ô.........ÿ...........L.ô... 0000E0
01F10000 0001FFFF 000001EA 004D001E 00000000 00000000 01F00000 0001FFFF ......Þ...........M.ô.........þ. 000100
00000000 00000000 00000000 0004FFFF 000001E9 00000007 00000000 00000000 ............ô................... 000120
000001E9 004F0007 00000000 00000000 01F30000 0001FFFF 000001E9 004E0007 ..N.ô.........#...........O.ô... 000140
01F50000 0001FFFF 000001E9 00500007 00000000 00000000 01F40000 0001FFFF ......¶...........P.ô.........¥. 000160
00000000 00000000 01F60000 0001FFFF 000001E9 0051000C 00000000 00000000 ..........a.ô.........-......... 000180
000001E9 0000001F 00000000 00000000 01F70000 0001FFFF 000001E9 00520000 ..R.ô.........¥.............ô... 0001A0
01F90000 0001FFFF 000001E9 00530001 00000000 00000000 00000000 0004FFFF ..................S.ô.........'. 0001C0
00000000 00000000 00000000 0004FFFF 000001E9 00000001 00000000 00000000 ............ô................... 0001E0

Dump of file SATURN:[PCCOMMON.DUMP.DLL]ANALDESK.TMP;1 on 18-APR-1990 10:36:25.56
File ID (485,24,0)   End of file block 102 / Allocated 104

Virtual block number 74 (0000004A), 512 (0200) bytes

000001E9 0055001F 00U00000 00000000 01FB0000 0001FFFF 000001E9 0054001F ..T.ô.........«...........U.ô... 000000
00000000 0004FFFF 000001E9 0000001F 00000000 00000000 01FC0000 0U0'FFFF ......■...........ô............. 000020
00000000 00000000 01FE0000 0011FFFF 01FE01E9 0056001F 00000000 000C^000 ..........V.ô.±.......±......... 000040
000001FE 0058001F 00000000 00000000 01FF0000 0001FFFF 000001FE 0057C01F ..W.±.....................X.±... 000060
02010000 0001FFFF 000001FE 0059001F 00000000 00000000 02000000 0001FFFF ..................Y.±........... 000080
00000000 00000000 02020000 0001FFFF 000001FE 005A001F 00000000 00000000 ..........Z.±................... 0000A0
000001FE 005C001F 00000000 00000000 02030000 0001FFFF 000001FE 005B001F ..[.±.....................\.±... 0000C0
02050000 0001FFFF 000001FE 005D001F 00000000 00000000 02040000 0001FFFF ..................].±........... 0000E0
00000000 00000000 02060000 0001FFFF 000001FE 005E001F 00000000 00000000 ..........^.±................... 000100
02080000 0064001F 00000000 00000000 02070000 0001FFFF 000001E9 005F001F .._.ô.....................d..... 000120
02090000 0001FFFF 00000208 00650001 00000000 00000000 02080000 0011FFFF ..................e............. 000140
00000000 00000000 020A0000 0001FFFF 00000208 00660001 00000000 00000000 ..........f..................... 000160
00000208 00680001 00000000 00000000 020B0000 0001FFFF 00000208 00670001 ..g.......................h..... 000180
00000000 0004FFFF 00000208 00000001 00000000 00000000 020C0000 0001FFFF ................................ 0001A0
00000000 00000000 020E0000 0001FFFF 00000208 00690002 00000000 00000000 ..........i..................... 0001C0
02100000 006E001F 00000000 00000000 020F0000 0001FFFF 00000208 006A0001 ..j.......................n..... 0001E0

Dump of file SATURN:[PCCOMMON.DUMP.DLL]ANALDESK.TMP;1 on 18-APR-1990 10:36:25.56
File ID (485,24,0)   End of file block 102 / Allocated 104

Virtual block number 75 (0000004B), 512 (0200) bytes

02110000 0001FFFF 00000210 006F001E 00000000 00000000 02100000 0011FFFF ..................o............. 000000
00000000 00000000 02120000 0001FFFF 00000210 0070001E 00000000 00000000 ..........p..................... 000020
00000210 00720001 00000000 00000000 02130000 0001FFFF 00000210 00710001 ..q.......................r..... 000040
02150000 0011FFFF 02150210 0073001F 00000000 00000000 02140000 0001FFFF ..................s............. 000060
00000000 00000000 02160000 0001FFFF 00000215 0074001F 00000000 00000000 ..........t..................... 000080
00000210 0000001F 00000000 00000000 02170000 0001FFFF 00000215 0075001F ..u............................. 0000A0
02190000 0001FFFF 00000210 0076001F 00000000 00000000 00000000 0004FFFF ..................v............. 0000C0
00000000 00000000 021A0000 0001FFFF 00000210 0077001F 00000000 00000000 ..........w..................... 0000E0
00000210 00790002 00000000 00000000 02180000 0001FFFF 00000210 00780002 ..x.......................y..... 000100
021D0000 0001FFFF 00000210 007A0001 00000000 00000000 021C0000 0001FFFF ..................z............. 000120
00000000 00000000 021E0000 0001FFFF 00000210 007B0001 00000000 00000000 ..........(..................... 000140
02200210 007C001F 00000000 00000000 00000000 0004FFFF 00000210 0000001F ..........................|..... 000160
02210000 0001FFFF 00000220 007D001F 00000000 00000000 02200000 0011FFFF ..................)...........!. 000180
00000000 00000000 02220000 0001FFFF 00000220 007E001F 00000000 00000000 ..........-.........."......... 0001A0
00000223 0083001F 00000000 00000000 02230000 0011FFFF 02230000 0082001F ......#.......#.............#... 0001C0
02250000 0001FFFF 00000223 0084001F 00000000 00000000 02240000 0001FFFF ......$.............#........%. 0001E0
```

```
Dump of file SATURN:[PCCOMMON.DUMP.DLL]ANALDESK.TMP;1 on 18-APR-1990 10:36:25.56
File ID (485,24,0)   End of file block 102 / Allocated 104

Virtual block number 76 (0000004C), 512 (0200) bytes

00000000 00000000 02260000 0001FFFF 00000223 0085001F 00000000 00000000 ............#.........&......... 000000
00000223 00870001 00000000 00000000 02270000 0001FFFF 00000223 0086001F ....#.........'.............#... 000020
00000000 0004FFFF 00000223 00000001 00000000 00000000 02280000 0001FFFF ......(.............#........... 000040
00000000 00000000 022A0000 0001FFFF 00000223 00880001 00000000 00000000 ............#.........*......... 000060
00000223 008A0001 00000000 00000000 022B0000 0001FFFF 00000223 00890001 ....#.........+.............#... 000080
02200000 0011FFFF 022D0000 0096001F 00000000 00000000 022C0000 0001FFFF ......,...................-....-. 0000A0
00000000 00000000 022E0000 0001FFFF 0000022D 00970001 00000000 00000000 ............-................... 0000C0
0000022D 0099001F 00000000 00000000 022F0000 0001FFFF 0000022D 00980001 ....-........./.............-... 0000E0
02310000 0011FFFF 02310000 00A0001F 00000000 00000000 02300000 0001FFFF ......0...............1.......1. 000100
00000000 00000000 02320000 0001FFFF 00000231 00A1001F 00000000 00000000 ..........À.1.........2......... 000120
00000231 00A3001F 03000000 00000000 02330000 0001FFFF 00000231 00A2001F ..À.1.........3...........È.1... 000140
02350000 0001FFFF 00000231 00A4001F 00000000 00000000 02340000 .001FFFF ......4...........È.1.........5. 000160
00000000 00000000 02360000 0001FFFF 00000231 00A5001F 00000000 00..0000 ..........È.1.........6......... 000180
00534E47 49534544 00000000 00000000 02370000 0001FFFF 00000231 00A6.01F ..Ì.1.........7.........DESIGNS. 0001A0
6E6F6973 6E657478 65206C61 67656C6C 49002A2E 2A006C65 646F6D20 6E65704F Open model.*.*.Illegal extension 0001C0
69662067 6E697473 69786520 6E612065 736F6F68 63207473 756D2075 6F59002E ..You must choose an existing fi 0001E0

Dump of file SATURN:[PCCOMMON.DUMP.DLL]ANALDESK.TMP;1 on 18-APR-1990 10:36:25.56
File ID (485,24,0)   End of file block 102 / Allocated 104

Virtual block number 77 (0000004D), 512 (0200) bytes

73736563 6F727020 6F4E002E 6574656C 6564206F 7420676E 6968746F 4E00656C le.Nothing to delete..No process 000000
6461206F 7420676E 6968746F 4E000000 6574656C 6564206F 74206C65 646F6D20  model to delete...Nothing to ad 000020
4900656C 69662067 6E697473 69784500 00005C00 534E4749 53454400 00002E64 d....DESIGNS.\...Existing file.I 000040
6F6D2061 74616420 6C616765 6C6C4900 656D616E 20656C69 66206C61 67656C6C llegal file name.Illegal data mo 000060
6E206C65 646F6D20 73736563 6F727020 6C616765 6C6C4900 656D616E 206C6564 del name.Illegal process model n 000080
726C6120 6C65646F 4D006560 616E206C 65646F6D 206C6167 656C6C49 00656D61 ame.Illegal model name.Model alr 0000A0
7361656C 50006E67 69736564 20324244 2077654E 00737473 69786520 79646165 eady exists.New DB2 design.Pleas 0000C0
44207765 4E002E65 6D616E20 6E676973 65642065 6874206E 69206C6C 69662065 e fill in the design name..New D 0000E0
2E737473 69786520 79646165 726C6120 6E676973 6544006E 67697365 64203242 B2 design.Design already exists. 000100
20676E69 76615300 6C65646F 6D20676E 69766153 00005C00 534E4749 53454400 .DESIGNS.\..Saving model.Saving  000120
646F6D20 676E696D 616E6552 00656D61 6E207765 6E206874 6977206C 65646F6D model with new name.Renaming mod 000140
474F4C52 00474F4C 4F444E55 57454956 4C4D4400 57454956 474F4C55 00006C65 el..ULOGVIEW.DMLVIEWUNDOLOG.RLOG 000160
43454843 004E494B 43454843 00474F4C 4F444552 57454956 4C4D4400 57454956 VIEW.DMLVIEWREDOLOG.CHECKIN.CHEC 000180
57474F4C 00454C47 474F5447 4F4C0047 4F4C0045 53414241 5441444F 544E494B KINTODATABASE.LOG.LOGTOGGLE.LOGW 0001A0
004F5250 00000000 00000000 00000000 6B736564 00006B73 65640000 45544952 RITE..desk..desk............PRO. 0001C0
20000000 4E454552 4353544E 49525053 43480053 43480000 54524154 534F5250 PROSTART..HCS.HCSPRINTSCREEN...  0001E0

Dump of file SATURN:[PCCOMMON.DUMP.DLL]ANALDESK.TMP;1 on 18-APR-1990 10:36:25.56
File ID (485,24,0)   End of file block 102 / Allocated 104

Virtual block number 78 (0000004E), 512 (0200) bytes

48202020 20202020 20202020 20202020 20202028 28282828 20202020 20202020         (((((                 H 000000
10101010 10101084 84848484 84848484 84101010 10101010 10101010 10101010 ................................ 000020
10101010 10100101 01010101 01010101 01010101 01010101 01018181 81818181 ................................ 000040
00201010 10100202 02020202 02020202 02020202 02020202 02028282 82828282 ................................ 000060
00000000 00000000 00000000 00000000 00000000 00000000 00000000 00000000 ................................ 000080
00000000 00000000 00000000 00000000 00000000 00000000 00000000 00000000 ................................ 0000A0
00000000 00000000 00000000 00000000 00000000 00000000 00000000 00000000 ................................ 0000C0
00000000 00000000 00000000 00000000 00000000 00000000 00000000 00000000 ................................ 0000E0
2DE01325 2DE02DE0 00000000 00002320 2D2B0029 6C6C756E 2800296C 6C756E28 (null).(null).+- #......À-À-%.À- 000100
00000000 00000000 00000000 00000000 00000000 00000000 00000000 00002B68 h+.............................. 000120
00000000 00000000 00000000 00000000 00000000 00000000 00000000 00000000 ................................ 000140
00000000 00000000 00000000 00000000 00000000 00000000 00000000 00000000 ................................ 000160
00000000 00000000 00000000 00000000 00000000 00000000 00000000 00000000 ................................ 000180
00000000 00000000 00000000 00000000 00000000 00000000 00000000 00000000 ................................ 0001A0
00000000 00000000 00000000 00000000 00000000 00000000 00000000 00000000 ................................ 0001C0
00000000 00000000 00000000 00000000 00000000 00000000 00000000 00000000 ................................ 0001E0
```

```
Dump of file SATURN:[PCCOMMON.DUMP.DLL]ANALDESK.TMP;1 on 18-APR-1990 10:36:25.56
File ID (485,24,0)    End of file block 102 / Allocated 104

Virtual block number 79 (0000004F), 512 (0200) bytes

00000000 00000000 00000000 00000000 00000000 00000000 00000000 00000000 ................................ 000000
00000000 00000000 00000000 00000000 00000000 00000000 00000000 00000000 ................................ 000020
00000000 00000000 00000000 00000000 00000000 00000000 00000000 00000000 ................................ 000040
00000000 00000000 00000000 00000000 00000000 00000000 00000000 00000000 ................................ 000060
00000000 00000000 00000000 00000000 00000000 00000000 00000000 00000000 ................................ 000080
00000000 00000000 00000000 00000000 00000000 00000000 00000000 00000000 ................................ 0000A0
00000000 00000000 00000000 00000000 00000000 00000000 00000000 00000000 ................................ 0000C0
00000000 00000000 00000000 00000000 00000000 00000000 00000000 00000000 ................................ 0000E0
00000000 00000000 00000000 00000000 00000000 00000000 00000000 00000000 ................................ 000100
00000000 00000000 00000000 00000000 00000000 00000000 00000000 00000000 ................................ 000120
00000000 00000000 00000000 00000000 00000000 00000000 00000000 00000000 ................................ 000140
00000000 00000000 00000000 00000000 00000000 00000000 00000000 00000000 ................................ 000160
00000000 00000000 00000000 00000000 00000000 00000000 00000000 00000000 ................................ 000180
00000000 00000000 00000000 00000000 00000000 00000000 00000000 00000000 ................................ 0001A0
00000000 00000000 00000000 00000000 00000000 00000000 00000000 00000000 ................................ 0001C0
00000000 00000000 00000000 00000000 00000000 00000000 00000000 00000000 ................................ 0001E0

Dump of file SATURN:[PCCOMMON.DUMP.DLL]ANALDESK.TMP;1 on 18-APR-1990 10:36:25.56
File ID (485,24,0)    End of file block 102 / Allocated 104

Virtual block number 80 (00000050), 512 (0200) bytes

00000000 00000000 00000000 00000000 00000000 00000000 00000000 00000000 ................................ 000000
00000000 00000000 00000000 00000000 00000000 00000000 00000000 00000000 ................................ 000020
00000000 00000000 00000000 00000000 00000000 00000000 00000000 00000000 ................................ 000040
00000000 00000000 00000000 00000000 00000000 00000000 00000000 00000000 ................................ 000060
00000000 00000000 00000000 00000000 00000000 00000000 00000000 00000000 ................................ 000080
00000000 00000000 00000000 00000000 00000000 00000000 00000000 00000000 ................................ 0000A0
00000000 00000000 00000000 00000000 00000000 00000000 00000000 00000000 ................................ 0000C0
00000000 00000000 00000000 00000000 00000000 00000000 00000000 00000000 ................................ 0000E0
12EE0000 00000000 00000000 00000000 00000000 00000000 00000000 00000000 ..............................Y. 000100
14701708 14701704 1470FFFF 14700000 0000003D 4F464E49 5F454C49 465F435F _C_FILE_INFO=.....p...p...p...p. 000120
00000001 28660000 0000172A 00000200 FFFFFFFF 01010000 00001710 1470170C ..p...............*.....f+.... 000140
00000000 00000000 00000202 00000000 00000000 00000102 00000000 00000000 ................................ 000160
00000000 00000000 00000000 00000000 00000000 00000000 00000000 00000000 ................................ 000180
00000000 00000000 00000000 00000000 00000000 00000000 00000000 00000000 ................................ 0001A0
00000000 00000000 00000000 00000000 00000000 00000000 00000000 00000000 ................................ 0001C0
00000000 00000000 00000000 00000000 00000000 00000000 00000000 00000000 ................................ 0001E0

Dump of file SATURN:[PCCOMMON.DUMP.DLL]ANALDESK.TMP;1 on 18-APR-1990 10:36:25.56
File ID (485,24,0)    End of file block 102 / Allocated 104

Virtual block number 81 (00000051), 512 (0200) bytes

00000000 00000000 00000000 00000000 00000000 00000000 00000000 00000000 ................................ 000000
00000000 00000000 00000000 00000000 00000000 00000000 00000000 00000000 ................................ 000020
00000000 00000000 00000000 00000000 00000000 00000000 00000000 00000000 ................................ 000040
00000000 00000000 00000000 00000000 00000000 00000000 00000000 00000000 ................................ 000060
00000000 00000000 00000000 00000000 00000000 00000000 00000000 00000000 ................................ 000080
00000000 00000000 00000000 00000000 00000000 00000000 00000000 00000000 ................................ 0000A0
00000000 00000000 00000000 00000000 00000000 00000000 00000000 00000000 ................................ 0000C0
00000000 00000000 00000000 00000000 00000000 00000000 00000000 00000000 ................................ 0000E0
00000000 00000000 00000000 00000000 00000000 00000000 00000000 00000000 ................................ 000100
00000000 00000000 00000000 00000000 00000000 00000000 00000000 00000000 ................................ 000120
00000000 00000000 00000000 00000000 00000000 00000000 00000000 00000000 ................................ 000140
00000000 00000000 00000000 00000000 00000000 00000000 00000000 00000000 ................................ 000160
00000000 00000000 00000000 00000000 00000000 00000000 00000000 00000000 ................................ 000180
00000000 00000000 00000000 00000000 00000000 00000000 00000000 00000000 ................................ 0001A0
00000000 00000000 00000000 00000000 00000000 00000000 00000000 00000000 ................................ 0001C0
00000000 00000000 00000000 00000000 00000000 00000000 00000000 00000000 ................................ 0001E0
```

```
Dump of file SATURN:[PCCOMMON.DUMP.DLL]ANALDESK.TMP;1 on 18-APR-1990 10:36:25.56
File ID (485,24,0)   End of file block 102 / Allocated 104

Virtual block number 82 (00000052), 512 (0200) bytes

00000000 00000000 00000000 00000000 00000000 00000000 00000000 00000000 ................................ 000000
00000000 00000000 00000000 00000000 00000000 00000000 00000000 00000000 ................................ 000020
00000000 00000000 00000000 00000000 00000000 00000000 00000000 00000000 ................................ 000040
00000000 00000000 00000000 00000000 00000000 00000000 00000000 00000000 ................................ 000060
00000000 00000000 00000000 00000000 00000000 00000000 00000000 00000000 ................................ 000080
00000000 00000000 00000000 00000000 00000000 00000000 00000000 00000000 ................................ 0000A0
00000000 00000000 00000000 00000000 00000000 00000000 00000000 00000000 ................................ 0000C0
00000000 00000000 00000000 00000000 00000000 00000000 00000000 00000000 ................................ 0000E0
00000000 00000000 00000000 00000000 00000000 00000000 00000000 00000000 ................................ 000100
00000000 00000000 00000000 00000000 00000000 00000000 00000000 00000000 ................................ 000120
00000000 00000000 00000000 00000000 00000000 00000000 00000000 00000000 ................................ 000140
00000000 00000000 00000000 00000000 00000000 00000000 00000000 00000000 ................................ 000160
00000000 00000000 00000000 00000000 00000000 00000000 00000000 00000000 ................................ 000180
00000000 00000000 00000000 00000000 00000000 00000000 00000000 00000000 ................................ 0001A0
00000000 00000000 00000000 00000000 00000000 00000000 00000000 00000000 ................................ 0001C0
00000000 00000000 00000000 00000000 00000000 00000000 00000000 00000000 ................................ 0001E0

Dump of file SATURN:[PCCOMMON.DUMP.DLL]ANALDESK.TMP;1 on 18-APR-1990 10:36:25.56
File ID (485,24,0)   End of file block 102 / Allocated 104

Virtual block number 83 (00000053), 512 (0200) bytes

00000000 00000000 00000000 00000000 00000000 00000000 00000000 00000000 ................................ 000000
00000000 00000000 00000000 00000000 00000000 00000000 00000000 00000000 ................................ 000020
00000000 00000000 00000000 00000000 00000000 00000000 00000000 00000000 ................................ 000040
00000000 00000000 00000000 00000000 00000000 00000000 00000000 00000000 ................................ 000060
00000000 00000000 00000000 00000000 00000000 00000000 00000000 00000000 ................................ 000080
00000000 00000000 00000000 00000000 00000000 00000000 00000000 00000000 ................................ 0000A0
00000000 00000000 00000000 00000000 00000000 00000000 00000000 00000000 ................................ 0000C0
00000000 00000000 00000000 00000000 00000000 00000000 00000000 00000000 ................................ 0000E0
00000000 00000000 00000000 00000000 00000000 00000000 00000000 00000000 ................................ 000100
00000000 00000000 00000000 00000000 00000000 00000000 00000000 00000000 ................................ 000120
00000000 00000000 00000000 00000000 00000000 00000000 00000000 00000000 ................................ 000140
00000000 00000000 00000000 00000000 00000000 00000000 00000000 00000000 ................................ 000160
00000000 00000000 00000000 00000000 00000000 00000000 00000000 00000000 ................................ 000180
00000000 00000000 00000000 00000000 00000000 00000000 00000000 00000000 ................................ 0001A0
00000000 00000000 00000000 00000000 00000000 00000000 00000000 00000000 ................................ 0001C0
00000000 00000000 00000000 00000000 00000000 00000000 00000000 00000000 ................................ 0001E0

Dump of file SATURN:[PCCOMMON.DUMP.DLL]ANALDESK.TMP;1 on 18-APR-1990 10:36:25.56
File ID (485,24,0)   End of file block 102 / Allocated 104

Virtual block number 84 (00000054), 512 (0200) bytes

00000000 00000000 00000000 00000000 00000000 00000000 00000000 00000000 ................................ 000000
00000000 00000000 00000000 00000000 00000000 00000000 00000000 00000000 ................................ 000020
00000000 00000000 00000000 00000000 00000000 00000000 00000000 00000000 ................................ 000040
00000000 00000000 00000000 00000000 00000000 00000000 00000000 00000000 ................................ 000060
00000000 00000000 00000000 00000000 00000000 00000000 00000000 00000000 ................................ 000080
00000000 00000000 00000000 00000000 00000000 00000000 00000000 00000000 ................................ 0000A0
00000000 00000000 00000000 00000000 00000000 00000000 00000000 00000000 ................................ 0000C0
00000000 00000000 00000000 00000000 00000000 00000000 00000000 00000000 ................................ 0000E0
00000000 00000000 00000000 00000000 00000000 00000000 00000000 00000000 ................................ 000100
00000000 00000000 00000000 00000000 00000000 00000000 00000000 00000000 ................................ 000120
00000000 00000000 00000000 00000000 00000000 00000000 00000000 00000000 ................................ 000140
00000000 00000000 00000000 00000000 00000000 00000000 00000000 00000000 ................................ 000160
00000000 00000000 00000000 00000000 00000000 00000000 00000000 00000000 ................................ 000180
00000000 00000000 00000000 00000000 00000000 00000000 00000000 00000000 ................................ 0001A0
00000000 00000000 00000000 00000000 00000000 00000000 00000000 00000000 ................................ 0001C0
00000000 00000000 00000000 00000000 00000000 00000000 00000000 00000000 ................................ 0001E0
```

```
Dump of file SATURN:[PCCOMMON.DUMP.DLL]ANALDESK.TMP;1 on 18-APR-1990 10:36:25.56
File ID (485,24,0)   End of file block 102 / Allocated 104

Virtual block number 85 (00000055), 512 (0200) bytes

00000000 00000000 00000000 00000000 00000000 00000000 00000000 00000000 ................................ 000000
00000000 00000000 00000000 00000000 00000000 00000000 00000000 00000000 ................................ 000020
00000000 00000000 00000000 00000000 00000000 00000000 00000000 00000000 ................................ 000040
00000000 00000000 00000000 00000000 00000000 00000000 00000000 00000000 ................................ 000060
00000000 00000000 00000000 00000000 00000000 00000000 00000000 00000000 ................................ 000080
00000000 00000000 00000000 00000000 00000000 00000000 00000000 00000000 ................................ 0000A0
00000000 00000000 00000000 00000000 00000000 00000000 00000000 00000000 ................................ 0000C0
00000000 00000000 00000000 00000000 00000000 00000000 00000000 00000000 ................................ 0000E0
00000000 00000000 00000000 00000000 00000000 00000000 00000000 00000000 ................................ 000100
00000000 00000000 00000000 00000000 00000000 00000000 00000000 00000000 ................................ 000120
00000000 00000000 00000000 00000000 00000000 00000000 00000000 00000000 ................................ 000140
00000000 00000000 00000000 00000000 00000000 00000000 00000000 00000000 ................................ 000160
00000000 00000000 00000000 00000000 00000000 00000000 00000000 00000000 ................................ 000180
00000000 00000000 00000000 00000000 00000000 00000000 00000000 00000000 ................................ 0001A0
00000000 00000000 00000000 00000000 00000000 00000000 00000000 00000000 ................................ 0001C0
00000000 00000000 00000000 00000000 00000000 00000000 00000000 00000000 ................................ 0001E0

Dump of file SATURN:[PCCOMMON.DUMP.DLL]ANALDESK.TMP;1 on 18-APR-1990 10:36:25.56
File ID (485,24,0)   End of file block 102 / Allocated 104

Virtual block number 86 (00000056), 512 (0200) bytes

00000000 00000000 00000000 00000000 00000000 00000000 00000000 00000000 ................................ 000000
00000000 00000000 00000000 00000000 00000000 00000000 00000000 00000000 ................................ 000020
00000000 00000000 00000000 00000000 00000000 00000000 00000000 00000000 ................................ 000040
00000000 00000000 00000000 00000000 00000000 00000000 00000000 00000000 ................................ 000060
00000000 00000000 00000000 00000000 00000000 00000000 00000000 00000000 ................................ 000080
00000000 00000000 00000000 00000000 00000000 00000000 00000000 00000000 ................................ 0000A0
00000000 00000000 00000000 00000000 00000000 00000000 00000000 00000000 ................................ 0000C0
00000000 00000000 00000000 00000000 00000000 00000000 00000000 00000000 ................................ 0000E0
00000000 00000000 00000000 00000000 00000000 00000000 00000000 00000000 ................................ 000100
00000000 00000000 00000000 00000000 00000000 00000000 00000000 00000000 ................................ 000120
00000000 00000000 00000000 00000000 00000000 00000200 00010000 00000000 ................................ 000140
00000000 00000000 00000000 00000000 00000000 00000000 00000000 00000000 ................................ 000160
00000000 00000000 00000000 00000000 00000000 00000000 00000000 00000000 ................................ 000180
00000000 00000000 00000000 00000000 00000000 00000000 00000000 00000000 ................................ 0001A0
00000000 00000000 00000000 00000000 00000000 00000000 00000000 00000000 ................................ 0001C0
00000000 00000000 00000000 00000000 00000000 00000000 00000000 00000000 ................................ 0001E0

Dump of file SATURN:[PCCOMMON.DUMP.DLL]ANALDESK.TMP;1 on 18-APR-1990 10:36:25.56
File ID (485,24,0)   End of file block 102 / Allocated 104

Virtual block number 87 (00000057), 512 (0200) bytes

00000000 00000000 00000000 00000000 00000000 00000000 00000000 00000000 ................................ 000000
00000000 00000000 00000000 00000000 00000000 00000000 00000000 00000000 ................................ 000020
00000000 00000000 00000000 00000000 00000000 00000000 00000000 00000000 ................................ 000040
00000000 00000000 00000000 00000000 00000000 00000000 00000000 00000000 ................................ 000060
00000000 00000000 00000000 00000000 00000000 00000000 00000000 00000000 ................................ 000080
00000000 00000000 00000000 00000000 00000000 00000000 00000000 00000000 ................................ 0000A0
00000000 00000000 00000000 00000000 00000000 00000000 00000000 00000000 ................................ 0000C0
00000000 00000000 00000000 00000000 00000000 00000000 00000000 00000000 ................................ 0000E0
00000000 00000000 00000000 00000000 00000000 00000000 00000000 00000000 ................................ 000100
00000000 00000000 00000000 00000000 00000000 00000000 00000000 00000000 ................................ 000120
00000000 00000000 00000000 00000000 00000000 00000000 00000000 00000000 ................................ 000140
00000000 00000000 00000000 00000000 00000000 00000000 00000000 00000000 ................................ 000160
00000000 00000000 00000000 00000000 00000000 00000000 00000000 00000000 ................................ 000180
00000000 00000000 00000000 00000000 00000000 00000000 00000000 00000000 ................................ 0001A0
00000000 00000000 00000000 00000000 00000000 00000000 00000000 00000000 ................................ 0001C0
00000000 00000000 00000000 00000000 00000000 00000000 00000000 00000000 ................................ 0001E0
```

```
Dump of file SATURN:[PCCOMMON.DUMP.DLL]ANALDESK.TMP;1 on 18-APR-1990 10:36:25.56
File ID (485,24,0)   End of file block 102 / Allocated 104

Virtual block number 88 (00000058), 512 (0200) bytes

00000000 00000000 00000000 00000000 00000000 00000000 00000000 00000000 ................................ 000000
00000000 00000000 00000000 00000000 00000000 00000000 00000000 00000000 ................................ 000020
00000000 00000000 00000000 00000000 00000000 00000000 00000000 00000000 ................................ 000040
00000000 00000000 00000000 00000000 00000000 00000000 00000000 00000000 ................................ 000060
00000000 00000000 00000000 00000000 00000000 00000000 00000000 00000000 ................................ 000080
00000000 00000000 00000000 00000000 00000000 00000000 00000000 00000000 ................................ 0000A0
00000000 00000000 00000000 00000000 00000000 00000000 00000000 00000000 ................................ 0000C0
00000000 00000000 00000000 00000000 00000000 00000000 00000000 00000000 ................................ 0000E0
00000000 00000000 00000000 00000000 00000000 00000000 00000000 00000000 ................................ 000100
00000000 00000000 00000000 00000000 00000000 00000000 00000000 00000000 ................................ 000120
00000000 00000000 00000000 00000000 00000000 00000000 00000000 00000000 ................................ 000140
00000000 00000000 00000000 00000000 00000000 00000000 00000000 00000000 ................................ 000160
00000000 00000000 00000000 00000000 00000000 00000000 00000000 00000000 ................................ 000180
00000000 00000000 00000000 00000000 00000000 00000000 00000000 00000000 ................................ 0001A0
00000000 00000000 00000000 00000000 00000000 00000000 00000000 00000000 ................................ 0001C0
00000000 00000000 00000000 00000000 00000000 00000000 00000000 00000000 ................................ 0001E0

Dump of file SATURN:[PCCOMMON.DUMP.DLL]ANALDESK.TMP;1 on 18-APR-1990 10:36:25.56
File ID (485,24,0)   End of file block 102 / Allocated 104

Virtual block number 89 (00000059), 512 (0200) bytes

00000000 00000000 00000000 00000000 00000000 00000000 00000000 00000000 ................................ 000000
00000000 00000000 00000000 00000000 00000000 00000000 00000000 00000000 ................................ 000020
00000000 00000000 00000000 00000000 00000000 00000000 00000000 00000000 ................................ 000040
00000000 00000000 00000000 00000000 00000000 00000000 00000000 00000000 ................................ 000060
00000000 00000000 00000000 00000000 00000000 00000000 00000000 00000000 ................................ 000080
00000000 00000000 00000000 00000000 00000000 00000000 00000000 00000000 ................................ 0000A0
00000000 00000000 00000000 00000000 00000000 00000000 00000000 00000000 ................................ 0000C0
00000000 00000000 00000000 00000000 00000000 00000000 00000000 00000000 ................................ 0000E0
00000000 00000000 00000000 00000000 00000000 00000000 00000000 00000000 ................................ 000100
00000000 00000000 00000000 00000000 00000000 00000000 00000000 00000000 ................................ 000120
00000000 00008181 81010000 00010000 00000000 00000000 00000000 12F0230A .#p............................. 000140
00000000 00000000 00000000 00000000 00000000 00000000 00000000 00000000 ................................ 000160
00000000 00000000 00000000 00000000 00000000 00000000 00000000 00000000 ................................ 000180
00000000 00000000 00000000 00000000 00000000 00000000 00000000 00000000 ................................ 0001A0
00000000 00000000 00000000 00000000 00000000 00000000 00000000 00000000 ................................ 0001C0
00000000 00000000 00000000 00000000 00000000 00000000 00000000 00000000 ................................ 0001E0

Dump of file SATURN:[PCCOMMON.DUMP.DLL]ANALDESK.TMP;1 on 18-APR-1990 10:36:25.56
File ID (485,24,0)   End of file block 102 / Allocated 104

Virtual block number 90 (0000005A), 512 (0200) bytes

00000000 00000000 00000000 00000000 00000000 00000000 00000000 00000000 ................................ 000000
00000000 00000000 00000000 00000000 00000000 00000000 00000000 00000000 ................................ 000020
0A0A0A0A 0A0A0A0A 0A000000 00000000 00000000 00000000 00000000 00000000 ................................ 000040
0A0A0A0A 0A0A0A0A 0A0A0A0A 0A0A0A0A 0A0A0A0A 0A0A0A0A 0A0A0A0A 0A0A0A0A ................................ 000060
0A0A0A0A 0A0A0A0A 0A0A0A0A 0A0A0A0A 0A0A0A0A 0A0A0A0A 0A0A0A0A 0A0A0A0A ................................ 000080
0A0A0A0A 0A0A0A0A 0A0A0A0A 0A0A0A0A 0A0A0A0A 0A0A0A0A 0A0A0A0A 0A0A0A0A ................................ 0000A0
0A0A0A0A 0A0A0A0A 0A0A0A0A 0A0A0A0A 0A0A0A0A 0A0A0A0A 0A0A0A0A 0A0A0A0A ................................ 0000C0
0A0A0A0A 0A0A0A0A 0A0A0A0A 0A0A0A0A 0A0A0A0A 0A0A0A0A 0A0A0A0A 0A0A0A0A ................................ 0000E0
0A0A0A0A 0A0A0A0A 0A0A0A0A 0A0A0A0A 0A0A0A0A 0A0A0A0A 0A0A0A0A 0A0A0A0A ................................ 000100
0A0A0A0A 0A0A0A0A 0A0A0A0A 0A0A0A0A 0A0A0A0A 0A0A0A0A 0A0A0A0A 0A0A0A0A ................................ 000120
0A0A0A0A 0A0A0A0A 0A0A0A0A 0A0A0A0A 0A0A0A0A 0A0A0A0A 0A0A0A0A 0A0A0A0A ................................ 000140
00000000 00000000 000A0A0A 0A0A0A0A 0A0A0A0A 0A0A0A0A 0A0A0A0A 0A0A0A0A ................................ 000160
00000000 20000000 00000000 00000000 00000000 00000000 00000000 00000000 ............................ .... 000180
47534D4E 3C3CFFFF 2B642B62 2B60FFFF 17141606 00000000 00000000 00000000 ............#.....'+b+d+..<<NMSG 0001A0
0003000A 00776F6C 66726576 6F206B63 61747320 200A0030 30303652 00003E3E >>..R6000..- stack overflow..... 0001C0
08000A00 30207962 20656469 76696420 72656765 746E6920 200A0033 30303652 R6003..- integer divide by 0.... 0001E0
6120726F 66206563 61707320 6867756F 6E652074 6F6E2020 0A0D3830 30365200 .R6008..- not enough space for a 0001E0
```

```
Dump of file SATURN:[PCCOMMON.DUMP.DLL]ANALDESK.TMP;1 on 18-APR-1990 10:36:25.56
File ID (485,24,0)   End of file block 102 / Allocated 104

Virtual block number 91 (0000005B), 512 (0200) bytes

6867756F 6E6520?4 6F6E2020 0A003930 30365200 09000A00 73746E65 6D756772 rguments.....R6009..- not enough 000000
00FF000A 0000FC00 0A00746E 65606E6F 7269766E 6520726F 66206563 61707320  space for environment...•...... 000020
74616F6C 6620200A 00323030 36520002 0020726F 72726520 65606974 206E7572 run-time error ...R6002..- float 000040
285E0002 0003FFFF FF000A00 64656461 6F6C2074 6F6E2074 6E696F70 20676E69 ing point not loaded.........^+ 000060
00000000 00000000 00000000 00000010 29120002 0000000F 17240002 0000000E ......$........)................ 000080
FFFFFF00 00000001 00010040 00200000 000C0000 00200010 00100000 01204349 IC ....... ....... .@.......... 0000A0
FCFFFF3F FCFFFF3F FCFFFF3F FCFFFF3F FCFFFF3F F8FFFF1F 00000000 00000000 ...........½?..•?..•?..•?..•?..• 0000C0
7CD5AB3E 7C8A513E 7C25A43E 7C724E3E 7CFC3F3E 7CFFFF3E FCFFFF3F FCFFFF3F ?..•?..•>..|>?•|>Nr|>ÊX|>Q.|> ¨|| 0000E0
FCFFFF3F FCFFFF3F FCFFFF3F 7CFFFF3E 7CFC3F3E 7C724E3E 7C25A43E 7C8A513E >Q.|>ÊX|>Nr|>?•|>..|?..•?..•?..• 000100
00000000 00000000 F8FFFF1F FCFFFF3F FCFFFF3F FCFFFF3F FCFFFF3F FCFFFF3F ?..•?..•?..•?..•?..•...½........ 000120
00000000 00000000 00000000 00000000 00000000 00000000 00000000 00000000 ................................ 000140
00C00300 00800100 00000000 00000000 00000000 00000000 00000000 00000000 ..............................â. 000160
00000000 00000000 00000000 00000000 00000000 00000000 00000000 00800100 ................................ 000180
00000000 00000000 00000000 00000000 00000000 00000000 00000000 00000000 ................................ 0001A0
FFE7FFFF FFFFCFFF FFE7FF0F C0FFCFFF FFE7FF07 80FFCFFF FFE7FFE3 1FFFCFFF .ü..D.Ó..ü....Ó..ü.â..Ó..ü....Ó. 0001C0
FF3FFF7F FCFFF9FF FF9FFFFF FEFFF3FF FFCFFFFF FFFFE7FF FFE7FFFF FFFFCFFF .ü....Ó..Ó....ü..µ.±.....ª.•..?. 0001E0

Dump of file SATURN:[PCCOMMON.DUMP.DLL]ANALDESK.TMP;1 on 18-APR-1990 10:36:25.56
File ID (485,24,0)   End of file block 102 / Allocated 104

Virtual block number 92 (0000005C), 512 (0200) bytes

FFFFF37F FC9FFFFF FFFFF93F F83FFFFF FFFFFC1F F07FFEFF FF7FFE3F F8FFFCFF .•.½?±...±.Þ.•....?½?ª.....•.µ.. 000000
FF83FF7F FCFFFFFF FFFF1F00 00F0FFFF FFFF0F00 00E0FFFF FFFFE77F FCCFFFFF ..ü•.Ó....Á.......Þ........•.... 000020
7FFEF93F F93F9FFF 7FFEFC7F FC7FC0FF FF7CFE7F FCFFE0FF FF01FF7F FCFFFFFF ...•.....Á.•.±|..â.•.•±...?ª?ª±. 000040
FFFC1FF0 1FF09FFF 7FFECFE7 CFE73FFF 7FFEE7CF E7CF3FFF 7FFEF39F F39F3FFF .?.µ.µ±..?ÚÓÚÓ±..?ÓÚÓÚ±...Þ.Þ.•. 000060
FFFFFFFF FFFFFFFF FFFFFFFF FFFFFFFF FFFFFFFF FFFFEFFF FFF93FF8 3FF8CFFF .ü½?½?ª..ÿ...................... 000080
FFFFFFFF FFFFFFFF FFFFFFFF FFFFFFFF FFFFFFFF FFFFFFFF FFFFFFFF FFFFFFFF ................................ 0000A0
00000000 00000000 00000000 00000000 00000000 00000000 00000000 00000000 ................................ 0000C0
00000000 00000000 00000000 00000000 00000000 00000000 00000000 00000000 ................................ 0000E0
00000000 00000000 00000000 00000000 00000000 00000000 00000000 00000000 ................................ 000100
00000000 00000000 00000000 00000000 00000000 00000000 00000000 00000000 ................................ 000120
00000000 00000000 00000000 00000000 00000000 00000000 00000000 00000000 ................................ 000140
00000000 00000000 00000000 00000000 00000000 00000000 00000000 00000000 ................................ 000160
00000000 00000000 00000000 00000000 00000000 00000000 00000000 00000000 ................................ 000180
00000000 00000000 00000000 00000000 00000000 00000000 00000000 00000000 ................................ 0001A0
00000000 00000000 00000000 00000000 00000000 00000000 00000000 00000000 ................................ 0001C0
00000000 00000000 00000000 00000000 00000000 00000000 00000000 00000000 ................................ 0001E0

Dump of file SATURN:[PCCOMMON.DUMP.DLL]ANALDESK.TMP;1 on 18-APR-1990 10:36:25.56
File ID (485,24,0)   End of file block 102 / Allocated 104

Virtual block number 93 (0000005D), 512 (0200) bytes

00000000 00000000 00000000 00000000 00000000 00000000 00000000 00000000 ................................ 000000
00000000 00000000 00000000 00000000 00000000 00000000 00000000 00000000 ................................ 000020
00000000 00000000 00000000 00000000 00000000 00000000 00000000 00000000 ................................ 000040
00000000 00000000 00000000 00000000 00000000 00000000 00000000 00000000 ................................ 000060
00000000 00000000 00000000 00000000 00000000 00000000 00000000 00000000 ................................ 000080
00000000 00000000 00000000 00000000 00000000 00000000 00000000 00000000 ................................ 0000A0
77654E7E 0500656C 69467E06 00010352 00000000 00000000 00040352 0000000A ....R...........R....-File..-New 0000C0
6E676973 656420?? 42447E0F 002E2E2E 6C65646F 6D207473 796C616E 417E1200 ..-Analyst model.....-DB2 design 0000E0
6C727443 0965764 537E0000 4F2B6C72 7443092E 2E2E6E65 704F7E10 002E2E2E .....-Open....Ctrl+O..-Save.Ctrl 000100
42207473 6F502820 74726576 7E655211 002E2E2E 73617E20 65766153 0C00532B +S..Save -as.....Re-vert (Post B 000120
0C00746E 6972507E 07002942 2074736F 5028202E 2E2E656D 616E6552 7E140029 )..-Rename... (Post B)..-Print.. 000140
1C002942 2074736F 5028202E 2E2E656C 69467E12 002E2E2E 6D617267 6169447E -Diagram.....-File... (Post B).. 000160
6972500F 006E6565 72635374 6E697250 2B6C7274 43092E2E 2E6E6565 7263537E -Screen....Ctrl+PrintScreen..Pri 000180
00000000 2E2E2E74 756F7961 6C206567 61507E10 00736E6F 6974706F 20747E6E n-t options..-Page layout....... 0001A0
43092E2E 2E676F4C 7E0F002E 2E2E7265 746E6972 70206567 6E616843 7E130352 R..-Change printer.....-Log....C 0001C0
202E2E2E 74756F20 6B636568 437E1700 6E697E20 6B636568 430A004C 2B6C7274 trl+L..Check -in..-Check out...  0001E0
```

```
Dump of file SATURN:[PCCOMMON.DUMP.DLL]ANALDESK.TMP;1 on 18-APR-1990 10:36:25.56
File ID (485,24,0)   End of file block 102 / Allocated 104

Virtual block number 94 (0000005E), 512 (0200) bytes

 7E110074 6964457E 0600582B 6C727443 09746978 7E450000 29422074 736F5028 (Post B)..E-xit.Ctrl+X..-Edit..- 000000
 73686361 422B746C 41096F64 6E557E14 0037462B 6C727443 092E2E2E 646E6946 Find....Ctrl+F7..-Undo.Alt+Backs 000020
 2B746669 6853096F 6465527E 0F002E2E 2E676F6C 206F646E 7E550000 65636170 pace..U-ndo log.....-Redo.Shift+ 000040
 50282079 706F437E 1800747E 75430500 2E2E2E67 6F6C206F 64657E52 00003846 F8..R-edo log.....Cu-t..-Copy (P 000060
 29422074 736F5028 20657473 61507E1A 00736E49 2B6C7274 43092942 2074736F ost B).Ctrl+Ins..-Paste (Post B) 000080
 68531000 6C65442B 74666968 53097261 656C7E43 1100736E 492B7466 69685309 .Shift+Ins..C-lear.Shift+Del..Sh 0000A0
 00000000 00002942 2074736F 5028202E 2E2E7473 696C2074 63656C65 7320776F ow select list... (Post B)...... 0000C0
 54060029 42207473 6F502820 2E2E2E64 72616F62 70696C63 20776F68 53180352 R..Show clipboard... (Post B)..T 0000E0
 65487E0B 00726569 7275437E 08002965 63694E28 20746E6F 467E0000 74787E65 e-xt..-Font (Nice)..-Curier..-He 000100
 50282065 6C797453 7E10006E 61606F72 20736560 69547E00 00616369 7465766C lvetica..-Times roman..-Style (P 000120
 0063696C 6174497E 0800646C 6F427E06 006C6160 726F4E7E 08002942 2074736F ost B)..-Normal..-Bold..-Italic. 000140
 42207473 6F502820 6E6F6974 61636966 69747375 4A7E1800 65686972 74537E08 .-Strike..-Justification (Post B 000160
 00706F54 7E050074 68676952 7E070074 66654C7E 06007265 746E6543 7E080029 )..-Center..-Left..-Right..-Top. 000180
 746F6220 74667E65 4C000070 6F742074 66657E4C 0A00606F 74746F42 7E080352 R..-Bottom..L-eft top..Le-ft bot 0001A0
 0000606F 74746F62 20746867 7E69520E 00706F74 20746867 697E5208 00606F74 tom..R-ight top..Ri-ght bottom.. 0001C0
 00367E31 0400327E 31040030 7E310400 387E0300 29656369 4E282065 7A7E6953 Si-ze (Nice)..-8..1-0..1-2..1-6. 0001E0

Dump of file SATURN:[PCCOMMON.DUMP.DLL]ANALDESK.TMP;1 on 18-APR-1990 10:36:25.56
File ID (485,24,0)   End of file block 102 / Allocated 104

Virtual block number 95 (0000005F), 512 (0200) bytes

 0001002E 2E2E6560 6F537E09 006C6C41 7E050077 6569567E 06000100 38317E04 .-18....-View..-All..-Some...... 000000
 69642077 654E7E00 00606172 67616944 7E090001 00010001 00010001 00010352 R..............-Diagram..-New di 000020
 457E0500 2E6C6552 7E203242 440A002E 73796850 7E203242 44080060 61726761 agram..DB2 -Phys...DB2 -Rel...-E 000040
 727E206E 69206E67 696C410E 004C4450 7E050044 467E0400 4446447E 0500522D -R..-DFD..-FD..-PDL..Align in -r 000060
 00000000 00000000 00000000 6E6D756C 6F637E20 6E69206E 67696C41 1100776F ow..Align in -column............ 000080
 00726562 7E6D756E 65520A00 657A6973 20657A69 64726164 6E617453 7E120352 R..-Standardize size..Renum-ber. 0000A0
 74736F50 28206574 74656C61 507E1200 6C656261 6C20776F 6C662070 616E5310 .Snap flow label..-Palette (Post 0000C0
 1400606F 6F5A7E06 00646E75 6F627E20 64697247 0C006469 72477E06 00294220  B)..-Grid..Grid -bound..-Zoom.. 0000E0
 20202020 20202020 20327E12 00202020 20202020 20202020 20202020 2020317E -1 ---------------..-2 -------- 000100
 20202020 20347E0E 00202020 20202020 20202020 2020337E 10002020 20202020 -------..-3 -----------..-4 ---- 000120
 08002020 20202020 20367E0A 00202020 20202020 2020357E 0C002020 20202020 -------..-5 --------..-6 ------.. 000140
 00000000 00000065 606F4809 7469467E 0A002020 20387E06 00202020 2020377E -7 ----..-8 --..-Fit.Home....... 000160
 29422074 736F5028 2060726F 467E0F00 6D7E726F 46060001 00010001 00010352 R.........For-m..-Form (Post B) 000180
 74706F7E 20646C65 69462300 29422074 736F5028 20657461 6C706065 547E1300 ..-Template (Post B).#Field -opt 0001A0
 67697661 4E7E1C00 4F28746C 41092965 6C626172 69736544 282E2E2E 736E6F69 ions...(Desirable).Alt+O..-Navig 0001C0
 61206574 61657243 7E1C004E 2B746C41 09294220 74736F50 28202E2E 2E657461 ate... (Post B).Alt+N..-Create a 0001E0

Dump of file SAT'RN:[PCCOMMON.DUMP.DLL]ANALDESK.TMP;1 on 18-APR-1990 10:36:25.56
File ID (485,24,.)   End of file block 102 / Allocated 104

Virtual block number 96 (00000060), 512 (0200) bytes

 77656976 20657461 6572437E 1000412B 6C727443 092E2E2E 65747562 69727474 ttribute....Ctrl+A..-Create view 000000
 0000002E 2E2E7472 6F706D49 7E080073 6B736154 7E070001 00010001 002E2E2E ...........-Tasks..-Import...... 000020
 6E65477E 00002E2E 2E657275 74706143 7E0C002E 2E2E7472 6F707845 7E080352 R..-Export.....-Capture.....-Gen 000040
 2E2E2E6C 65646F6D 20617461 447E0F00 65677265 4D7E0700 2E2E2E65 74617265 erate.....-Merge..-Data model... 000060
 092E2E2E 6E676973 65447E12 002E2E2E 6C65646F 6D207373 65636F72 507E1200 ..-Process model.....-Design.... 000080
 4E7E0E00 542B6C72 7443092E 2E2E6D72 6F66736E 6172547E 1500442B 6C727443 Ctrl+D..-Transform....Ctrl+T..-N 0000A0
 0C002E2E 2E656C75 72207373 656E6973 75427E12 002E2E2E 657A696C 616D726F ormalize.....-Business rule..... 0000C0
 726F7065 527E0900 2E2E2E65 73726576 7E65520C 002E2E2E 64726177 726F467E -Forward.....Re-verse.....-Repor 0000E0
 74726F70 6552204D 414C7E20 4C445010 0074726F 70655220 4C44507E 0C007374 ts..-PDL Report..PDL -LAN Report 000100
 00656C69 666F7250 7E090001 00010352 00000000 00000000 00000000 00000100 ................R......-Profile. 000120
 6F6D2061 7461447E 0F002E2E 2E726574 6E697250 7E0C002E 2E2E7265 73557E09 .-User.....-Printer.....-Data mo 000140
 20327E42 440F002F 2E2E6C65 646F6D20 73736563 6F727E50 12002E2E 2E6C6564 del.....P-rocess model.....DB-2  000160
 6C61756E 614D7E17 00736C65 62616C20 776F6853 7E00002E 2E2E6E67 69736564 design.....-Show labels..-Manual 000180
 746E6520 6563616C 70206F74 75417E15 00736569 7469746E 65206563 616C7020  place entities..-Auto place ent 0001A0
 7E080001 00010001 00010001 00010352 00010001 00010001 00010073 65697469 ities...........R..............- 0001C0
 656C6954 7E0F0029 42207473 6F502820 65646163 7361437E 1200776F 646E6957 Window..-Cascade (Post B)..-Tile 0001E0
```

```
Dump of file SATURN:[PCCOMMON.DUMP.DLL]ANALDESK.TMP;1 on 18-APR-1990 10:36:25.56
File ID (485,24,0)   End of file block 102 / Allocated 104

Virtual block number 97 (00000061), 512 (0200) bytes

 00010001 000100G1 0001006C 6C612065 736F6C7E 43080029 42207473 6F502820  (Post B)..C-lose all........... 000000
 20706C65 487E1200 706C6548 7E060352 00000000 00000000 00000000 00000001 ................R..~Help..~Help  000020
 0E002E2E 2E706C65 68206465 646E6574 78457E12 002E2E2E 706C6568 20726F66 for help.....~Extended help..... 000040
 7E00002E 2E2E7865 646E697E 20706C65 480F002E 2E2E706C 65682073 796548 7E -Keys help.....Help ~index.....~ 000060
 2E2A0500 01000100 01002E2E 2E74756F 62417E0A 002E2E2E 6C616972 6F747554 Tutorial.....~About...........*. 000080
 00000000 00000000 01000100 3242442E 05004E41 2E040052 41562E2A 06004E41 AN..*.VAR...AN...DB2............ 0000A0
 43414220 20206C61 69746E65 6469666E 6F43202A 2A310001 00010001 00010352 R.........1** Confidential   BAC 0000C0
 746F4E13 002A2A20 6C616974 6E656469 666E6F43 20202030 312E3320 4E414048 HMAN 3.10   Confidential **..Not 0000E0
 6220746F 6E207361 68206C65 646F4D1C 0021656C 62616C69 61766120 74657920  yet available!..Model has not b 000100
 20732520 6C65646ι 40440047 4E494E52 41570800 64656966 69646F6D 206E6565 een modified..WARNING.DModel %s  000120
 2E646576 61732074 6F6E2064 6E612064 65696669 646F6020 6E656562 20736168 has been modified and not saved. 000140
 6F727245 15003F65 756E6974 6E6F6320 6F742074 6E617720 756F7920 6F442020   Do you want to continue?..Erro 000160
 00000000 01000100 01000100 01000100 726F7469 64652067 6E696E65 706F2072 r opening editor................ 000180
 64206E69 20747369 78652074 6F6E2073 656F6420 73252065 6C694627 00010352 R...'File %s does not exist in d 0001A0
 73206562 20747375 6020656D 616E2065 6C69461C 00732520 79726F74 63657269 irectory %s..File name must be s 0001C0
 65707320 65622074 7375602O 656D616E 206C6564 6F4D1D00 64656966 69636570 pecified..Model name must be spe 0001E0

Dump of file SATURN:[PCCOMMON.DUMP.DLL]ANALDESK.TMP;1 on 18-APR-1990 10:36:25.56
File ID (485,24,0)   End of file block 102 / Allocated 104

Virtual block number 98 (00000062), 512 (0200) bytes

 15007374 73697865 20796461 65726C61 20732520 656C6946 17006465 69666963 cified..File %s already exists.. 000000
 75602073 2520656C 69462E00 73747369 78652079 64616572 6C612073 25204D50 PM %s already exists..File %s mu 000020
 746E6574 78652073 2520726F 20732520 61207265 68746965 20657661 68207473 st have either a %s or %s extent 000040
 73206562 20747375 50206C65 646F6020 6E6F6974 616D726F 666E4924 006E6F69 ion.$Information model must be s 000060
 60207373 65636F72 5020656E 6F207473 61656C20 74412D00 64656966 69636570 pecified.-At least one Process m 000080
 616E204D 50206F4E :C006465 69666963 65707320 65622074 73756020 6C65646F odel must be specified..No PM na 0000A0
 4E22006C 6C612077 65695609 00796C70 7041206F 74206465 7265746E 6520656D me entered to Apply..View all."N 0000C0
 2E646569 6C707061 20796C74 6E657272 75632065 72612073 7265746C 6966206F o filters are currently applied. 0000E0
 01AA0073 001101A8 006F0011 03520012 00000000 00000000 01000100 01000100 .................R...o.´...s.˙. 000100
 0022018D 00260012 02348020 0002018B 00780011 01B6006C 001101B2 00190012 ....ý...l.Ñ...x.£... .4...&.§.". 000120
 00140002 01C7001B 000A01C6 001A000A 01C5001A 001201C1 0027000A 01BF0005 ..ɇ...'.è.....é.....ó.....ú..... 000140
 021A0074 00110219 00640011 020E0061 0011020C 004E0021 020B004F 00210207 ..t.O...l.N.....a.....d.....t... 000160
 00279400 00900176 00040001 00000008 00000000 FFFF0001 000E0352 000001BE ƒ...R...................v.....'. 000180
 00890005 80000001 017F000A 00050000 00000000 017BFFFF 01000099 00CE0010 ..ö.......(..................... 0001A0
 00500089 00408002 000C018A 00040006 00000000 0000FFFF FFFF0101 00080030 0.........................M...P. 0001C0
 00080036 007F0005 80010001 018F000A 00050000 00000000 FFFFFFFF 01020008 ............................6... 0001E0

Dump of file SATURN:[PCCOMMON.DUMP.DLL]ANALDESK.TMP;1 on 18-APR-1990 10:36:25.56
File ID (485,24,0)   End of file block 102 / Allocated 104

Virtual block number 99 (00000063), 512 (0200) bytes

 01040008 0078007F 00488001 0001019A 00000005 00000000 0000FFFF FFFF0103 ........................K...x..... 000000
 FFFF0105 00080018 00750005 80010001 01980005 00050000 00000000 FFFFFFFF ........................u......... 000020
 FFFFFFFF 01060050 00540023 00058002 000001A1 00000007 00000000 0000FFFF ............Å.......#.T.P....... 000040
 0000FFFF FFFF0107 00080032 00750074 80010001 01A20008 00050000 00000000 ..........Å.....t.u.2........... 000060
 00000000 FFFFFFFF 01080050 00540023 00748002 000001AE 00000007 00000000 ........Û.....t.#.T.P........... 000080
 00000000 0000FFFF FFFF0001 000C0026 000A0027 80030400 01AF0002 00030000 ......£.....'...&............... 0000A0
 00030000 00000000 FFFFFFFF 0002000C 0026000A 00578002 000001B2 00060003 ....ý.....W...&................. 0000C0
 46000000 03006E65 704FFFFF FFFF0109 000C0026 000A0087 80020100 01B90004 ..¿.........&.........Open.....F 0000E0
 73656C69 4600003A 79726F74 63657269 44004E41 2E2A003A 6560616E 20656C69 ile name:.*.AN.Directory:..Files 000100
 00000070 6C654800 6C65636E 61430048 4F000073 6569726F 74636572 69440000 ..Directories..OK.Cancel.Help... 000120
 006E9400 009000FE 000C0001 00000007 00000000 FFFF0001 000E0352 00000136 6...R.....................t.....n. 000140
 0030000C 80010001 01uF000A 00050000 00000000 0108FFFF 04000054 00C60050 P.6.T..........................=. 000160
 004F002A 000C8001 0001011A 000A0005 00000000 0000FFFF FFFF0401 0.˜8004A J..........................*.O. 000180
 000A0062 00380059 8002000C 01250000 00060000 00000000 FFFFFFFF 040.ˀ008 ..................%.....Y.;.b... 0001A0
 0404000A 00620027 00598002 000C0126 00000006 00000000 0000FFFF FFFF\402 ..................&.....Y.'.b.... 0001C0
 FFFF0001 000C0026 000A0020 80030400 01270002 00030000 00000000 FFFFFFFF ..............'..... ...&....... 0001E0
```

```
Dump of file SATURN:[PCCOMMON.DUMP.DLL]ANALDESK.TMP;1 on 18-APR-1990 10:36:25.56
File ID (485,24,0)   End of file block 102 / Allocated 104

Virtual block r mber 100 (00000064), 512 (0200) bytes

 FFFFFFFF 0002000C 0026000A 00508002 0000012A 00060003 00000000 0000FFFF ............*.....P...&......... 000000
 6552FFFF FFFF0405 000C0026 000A0080 80020100 01310004 00030000 00000000 ..........1.........&.........Re 000020
 6F602077 654E003A 6C65646F 6D20646C 4F000000 03006C65 646F6D20 6560616E name model.....Old model:.New mo 000040
 00000000 0000L000 00000070 6C654800 6C65636E 6143004B 4F000000 3A6C6564 del:...OK.Cancel.Help........... 000060
 00071400 0090011C 000E0001 00000008 00000000 FFFF0001 000E0352 0000015D ]...R........................... 000080
 00350005 80010001 012F000A 00050000 00000000 012BFFFF 0258004A 008C0023 #.V.J.X...+.........../.......5. 0000A0
 00500036 00488002 0008013A 00000006 00000000 0000FFFF FFFF0264 0008002F /...d..............:.....K.6.P. 0000C0
 00080017 0033009E 80010001 01380004 00050000 00000000 FFFFFFFF 02710008 ..q..............;.......3...... 0000E0
 02620008 003E0020 00058001 00010140 000C0005 00000000 0000FFFF FFFF0263 c...............@....... .>...b. 000100
 FFFF026C 00080050 0022004B 8002000C 014D0000 00060000 00000000 FFFFFFFF ..............M.....K.".P...l... 000120
 FFFFFFFF 0001000C 00260005 001A8003 0400014E 00020003 00000000 0000FFFF ............N.........&......... 000140
 0000FFFF FFFF0002 000C0026 0005004A 80020000 01510006 00030000 00000000 ..........Q....J...&............ 000160
 2077654E FFFFFFFF 028A000C 00260005 007A8002 01000158 00040003 00000000 ........X.....z...&.........New  000180
 00324244 2E00003A 6560616E 20656C69 46000000 03006E67 69736564 20324244 DB2 design.....File name:...DB2. 0001A0
 00000000 706C654d 006C6563 6E614300 4B4F0000 3A656D61 6E206E67 69736544 Design name:..OK.Cancel.Help.... 0001C0
 00609400 0090020C 00110001 00000010 00000000 FFFF0001 000E0352 00000288 ....R.........................'. 0001E0

Dump of file SATURN:[PCCOMMON.DUMP.DLL]ANALDESK.TMP;1 on 18-APR-1990 10:36:25.56
File ID (485,24,0)   End of file block 102 / Allocated 104

Virtual block number 101 (00000065), 512 (0200) bytes

 00AF0005 80010001 0222000A 00050000 00000000 021EFFFF 030000C8 00C8000A ..à.à................."......£. 000000
 00500082 005C8002 000C022D 00000006 00000000 0000FFFF FFFF0301 00080032 2...................-.....\.ý.P. 000020
 00080014 00AF00AF 80000001 022E0003 00050000 00000000 FFFFFFFF 03020008 .......................£.£..... 000040
 03040008 00500098 00058000 00010232 00080005 00000000 0000FFFF FFFF0303 ...............2.........P..... 000060
 FFFF0305 00080050 0090005C 8002000C 023E0000 00060000 00000000 FFFFFFFF ..............>.....\...P....... 000080
 FFFFFFFF 03060008 00500087 00058000 0001023F 00080005 00000000 0000FFFF ............?.........P......... 0000A0
 0000FFFF FFFF0307 00080050 0089005C 8002000C 02480000 00060000 00000000 ..............K.....\...P........ 0000C0
 00000000 FFFFFFFF 03080008 00500073 00058000 0001024C 000E0005 00000000 ........L.......s.P............. 0000E0
 00000000 0000FFFF FFFF0309 00080050 0075005C 8002000C 025B0000 00060000 ......[.....\.u.P............... 000100
 00030000 00000000 FFFFFFFF 030C000D 00260044 009A8002 0000025C 00040003 ....\.......D.&................. 000120
 000E0005 00000000 0000FFFF FFFF030D 00000026 002F009A 80020000 02610007 ..a......./.&................... 000140
 02780000 00070000 00000000 FFFFFFFF 030A0008 00500063 00058000 00010269 i.......c.P....................x. 000160
 04000279 00020003 00000000 0000FFFF FFFF030B 0040008A 00220005 80020008 ......"...a.................y... 000180
 80020000 027C0006 00030000 00000000 FFFFFFFF 0001000C 0026000A 00218003 ..!...&....................|.... 0001A0
 00818002 01000283 00040003 00000000 0000FFFF FFFF0002 000C0026 000A0051 Q...&........................... 0001C0
 0003006C 65646F60 20747379 6C616E41 2077654E FFFFFFFF 0003000C 0026000A ..&.........New Analyst model... 0001E0

Dump of file SATURN:[PCCOMMON.DUMP.DLL]ANALDESK.TMP;1 on 18-APR-1990 10:36:25.56
File ID (485,24,0)   End of file block 102 / Allocated 104

Virtual block number 102 (00000066), 512 (0200) bytes

 4400003A 6560616E 206C6564 6F4D004E 412E0000 3A656D61 6E20656C 6^/60000 ..File name:...AN.Model name:..D 000000
 6464417E 00003A6C 65646F6D 20737365 636F7250 00003A6C 65646F6D 206 7461 ata model:..Process model:..-Add 000020
 636E6143 00484F00 00736C65 646F6D20 73736563 6F725000 6574656C 6544.E00 .-Delete.Process models..OK.Canc 000040
 00000000 00000000 00000000 00000000 00000000 00000000 00706C65 48006C65 el.Help......................... 000060
 00000000 00000000 00000000 00000000 00000000 00000000 00000000 00000000 ................................ 000080
 00000000 00000000 00000000 00000000 00000000 00000000 00000000 00000000 ................................ 0000A0
 00000000 00000000 00000000 00000000 00000000 00000000 00000000 00000000 ................................ 0000C0
 00000000 00000000 00000000 00000000 00000000 00000000 00000000 00000000 ................................ 0000E0
 00000000 00000000 00000000 00000000 00000000 00000000 00000000 00000000 ................................ 000100
 00000000 00000000 00000000 00000000 00000000 00000000 00000000 00000000 ................................ 000120
 00000000 00000000 00000000 00000000 00000000 00000000 00000000 00000000 ................................ 000140
 00000000 00000000 00000000 00000000 00000000 00000000 00000000 00000000 ................................ 000160
 00000000 00000000 00000000 00000000 00000000 00000000 00000000 00000000 ................................ 000180
 00000000 00000000 00000000 00000000 00000000 00000000 00000000 00000000 ................................ 0001A0
 00000000 00000000 00000000 00000000 00000000 00000000 00000000 00000000 ................................ 0001C0
 00000000 00000000 00000000 00000000 00000000 00000000 00000000 00000000 ................................ 0001E0
```

```
Dump of file SATURN:[PCCOMMON.DUMP.DLL]APBSORT.TMP;1 on 18-APR-1990 10:36:55.87
File ID (513,19,0)    End of file block 2 / Allocated 4

Virtual block number 1 (00000001), 512 (0200) bytes

00000000 00000040 00000000 00000088 0000FFFF 00090004 00000002 00625A4D MZb.............|.......a....... 000000
00000080 00000000 00000000 00000000 00000000 00000000 00000000 00000000 ................................ 000020
6F6E6E61 63206061 72676F72 70207369 685421CD 4C018821 CD098400 0E8A1F0E ..¤..Ç.ëI¡.LëIThis program canno 000040
00000000 00000024 0A0D0D2E 65646F60 20534F44 206E6920 6E757220 65622074 t be run in DOS mode....$....... 000060
00000002 00000000 00000000 00000400 0002800A 44210SE2 00070060 0505454E NE..m...ãI!D.................... 000080
00000000 00000000 00010000 00040000 000000F4 00600060 00500050 00400019 ..a.P.P.m.m.¶................... 0000A0
4F534250 410F0000 74726F73 62706107 00020E01 00000000 01480F00 01480011 ..H...H..........apbsort...APBSO 0000C0
880A4688 D88EFFFF 881E5657 000014C8 00000000 00015941 5252414A 424F5452 RTOBJARRAY...........DA Sort Fun 0000E0
47082607 8826F85E C4EC46FF 04F84683 0007E900 00EC46C7 FA5689F8 46890C56 ctionality......à...WV.|...Á.F.. 000100
F9F799F4 46880002 89000CE9 F44689F8 D1C22899 EC4688FF E7E90003 E9037502 V..F½.V°úFš..Õ...F½..Fšá^½&..&.G 000120
037CF246 39EC4688 F246FF00 03E9F246 89F44688 000EE903 7F00F47E 83F44689 .u.Õ..ÕÕ..Fš.+õi½.F¶Õ..¿...F¶.½ª 000140
468000A6 E9037D00 F07Eb3F0 4629F446 880006E9 F04689F4 4628F246 8800C4E9 .F¶.-¶...Õ8..F¶.F·Õ...F·.Fš9F·|. 000160
260A76C4 02E3C1F0 5E8B30FF 260270FF 260A76C4 02E3C1F4 5E03F05E 885.^4F6 Õá..F·+F¶.FÞÕ...F¶)FÞ.~Þ.).ÕI..F 000180
EE468800 06E90375 00003OEE 468910C4 83065EFF 0E76FF10 76FF30FF 26027.^F -.P.^Þ.^¶èD.áv.&.p.&.0.^ÞèD.áv.& 0001A0
8902508B 26008826 0A76C402 E3C1F05E 880055E9 0003E903 7E00F67E 830060.9 .p.&.0.v..v..^..á..FŸ=..u.Õ...FŸ 0001C0
                                                                        Õm..--.-.Õ..ÕU..^ÞèD.áv.&..&.P.. 0001E0

Dump of file SATURN:[PCCOMMON.DUMP.DLL]APBSORT.TMP;1 on 18-APR-1990 10:36:55.87
File ID (513,19,0)    End of file block 2 / Allocated 4

Virtual block number 2 (00000002), 512 (0200) bytes

76C402E3 C1F05E8B 02508826 0088260A 76C402E3 C1F45E03 F05E88FE 5689FC46 F=.V±.^Þ.^¶èD.áv.&..&.P..^ÞèD.áv 000000
50892600 8926FE56 88FC4688 0A76C402 E3C1F45E 03F05E88 02508926 0089260A .&..&.P..^Þ.^¶èD.áv..F=.V±&..&.P 000020
00020008 00020001 90000CCA C95F5E1F 0000E900 0088FF00 E9FF2EE9 FF48E902 .ÕK.Õ..Õ..¡..Õ...^_èò........... 000040
00000000 00000000 00000000 00000000 00000000 00000000 00000000 00000000 ................................ 000060
00000000 00000000 00000000 00000000 00000000 00000000 00000000 00000000 ................................ 000080
00000000 00000000 00000000 00000000 00000000 00000000 00000000 00000000 ................................ 0000A0
00000000 00000000 00000000 00000000 00000000 00000000 00000000 00000000 ................................ 0000C0
00000000 00000000 00000000 00000000 00000000 00000000 00000000 00000000 ................................ 0000E0
00000000 00000000 00000000 00000000 00000000 00000000 00000000 00000000 ................................ 000100
00000000 00000000 00000000 00000000 00000000 00000000 00000000 00000000 ................................ 000120
00000000 00000000 00000000 00000000 00000000 00000000 00000000 00000000 ................................ 000140
00000000 00000000 00000000 00000000 00000000 00000000 00000000 00000000 ................................ 000160
00000000 00000000 00000000 00000000 00000000 00000000 00000000 00000000 ................................ 000180
00000000 00000000 00000000 00000000 00000000 00000000 00000000 00000000 ................................ 0001A0
00000000 00000000 00000000 00000000 00000000 00000000 00000000 00000000 ................................ 0001C0
00000000 00000000 00000000 00000000 00000000 00000000 00000000 00000000 ................................ 0001E0
```

Dump of file SATURN:[PCCOMMON.DUMP.DLL]ANALYST.TMP;1 on 18-APR-1990 10:36:43.91
File ID (511,16,0)   End of file block 53 / Allocated 56

Virtual block number 1 (00000001), 512 (0200) bytes

```
00000000 00000040 00000000 00000088 0000FFFF 00000004 00000034 00365A40 MZ6.4...........|.......a....... 000000
00000080 00000000 00000000 00000000 00000000 00000000 00000000 00000000 ................................ 000020
6F6E6E61 63206061 72676F72 70207369 685421CD 4C01B821 CD09B400 0EBA1F0E ..¤..Ç.ë|.LëIThis program canno 000040
00000000 00000024 0A0D0D2E 65646F60 20534F44 206E6920 6E757220 65622074 t be run in DOS mode....$....... 000060
000E0008 00000000 00030000 00000000 00068009 7EE9967A 000A042F 0505454E NE../...z.Ö~.................... 000080
00000000 00000000 00010002 00040000 000004B9 00C000A4 00880080 0040002A *.a.....Ê.à.¿................... 0000A0
1A7A0F00 1A7A0316 000F0F00 000F0314 02EA0F00 02EA02DC 26640F00 2664004F O.d&..d&Ê.ö...ö...........z...z. 0000C0
00C11EB1 00C10678 01201EF1 01200666 18900F21 19FC04C4 020A0E21 00000000 ....|...á.=.|...f. .þ. .x.è.Ÿ.è. 0000E0
4F525044 4E575453 594C414E 410E0000 5453594C 414E4107 00010005 03200001 .. ......ANALYST...ANALYSTWNDPRO 000100
036202E8 020302CC 02C802B7 022C0218 01200045 00160000 00070001 00000243 C...........E.-...,.ñ.à.ä.Æ.Š.b. 000120
52434D45 4D0D4D45 4D03534C 4C414353 4F440849 50474D50 054E4957 4D500500 ..PMWIN.PMGPI.DOSCALLS.MEM.MEMCR 000140
434F4C4C 414D454D 00504145 48594F52 54534544 4D454D0E 50414548 45544145 EATEHEAP.MEMDESTROYHEAP.MEMALLOC 000160
4C4C494B 4954470B 4C4F4F54 45544145 52434954 475F0E49 5447034B 434F4C42 BLOCK.GTI._GTICREATETOOL.GTIKILL 000180
470A4753 4D54534F 50495447 0A434F52 504C4F4F 54464544 4954470E 4C4F4F54 TOOL.GTIDEFTOOLPROC.GTIPOSTMSG.G 0001A0
49544710 574F444E 49574C4F 4F545952 45555149 54471247 534D444E 45534954 TISENDMSG.GTIQUERYTOOLWINDOW.GTI 0001C0
4C4F4F54 574F444E 49575952 45555149 54471257 4F444E49 574C4F4F 54544553 SETTOOLWINDOW.GTIQUERYWINDOWTOOL 0001E0
```

Dump of file SATURN:[PCCOMMON.DUMP.DLL]ANALYST.TMP;1 on 18-APR-1990 10:36:43.91
File ID (511,16,0)   End of file block 53 / Allocated 56

Virtual block number 2 (00000002), 512 (0200) bytes

```
54414458 55415445 53495447 10525450 41544144 58554159 52455551 49544712 .GTIQUERYAUXDATAPTR.GTISETAUXDAT 000000
54455349 54470F59 54494C49 42495349 564C4F4F 54544553 49544714 52545041 APTR.GTISETTOOLVISIBILITY.GTISET 000020
55514954 47124550 59544C4F 4F545952 45555149 54471053 55434F46 4C4F4F54 TOOLFOCUS.GTIQUERYTOOLTYPE.GTIQU 000040
084D5448 45524955 5143414C 4D440D6C 60640354 4E455241 504C4F4F 54595245 ERYTOOLPARENT.dml.DMLACQUIREHTM. 000060
4F4D4545 52464C4 440C4E58 54504F54 534C4D44 0A4E5854 54524154 534C4D44 DMLSTARTTXN.DMLSTOPTXN.DMLFREEMO 000080
59524555 514C4D44 0D454C44 4E41484C 45444F4D 59524555 514C4D44 134C4544 DEL.DMLQUERYMODELHANDLE.DMLQUERY 0000A0
4D440C4E 4C525952 4555514C 4D440B44 4C454946 5445534C 4D440B44 4C454946 FIELD.DMLSETFIELD.DMLQUERYRLN.DM 0000C0
5453494C 45455246 4C4D440B 4554414C 45524C4D 4409314E 4C525952 4555514C LQUERYRLN1.DMLRELATE.DMLFREELIST 0000E0
544C4946 4C4D440F 45544145 52434C4D 44094449 4C4D4459 52455551 4C4D440D .DMLQUERYDMLID.DMLCREATE.DMLFILT 000100
494C5443 454C4553 44455245 44524F59 52455551 4C4D4419 45474E41 48435245 ERCHANGE.DMLQUERYORDEREDSELECTLI 000120
4C54550F 4C545503 5453494C 5443454C 45534C4C 41595245 55514C4D 44155453 ST.DMLQUERYALLSELECTLIST.UTL.UTL 000140
4F535255 4354494E 49474142 4C545510 54554403 574F444E 49575245 544E4543 CENTERWINDOW.DUT.UTLBAGINITCURSO 000160
52455449 4741424C 54551352 4F535255 43455341 454C4552 4741424C 54551352 R.UTLBAGRELEASECURSOR.UTLBAGITER 000180
564F4D45 52514553 4C54550E 4548414D 5145534C 54550A52 4F535255 43455441 ATECURSOR.UTLSEQMAKE.UTLSEQREMOV 0001A0
550C4C45 54535249 46514553 4C54550D 4C455453 414C5145 534C5455 0C4C4545 EEL.UTLSEQLASTEL.UTLSEQFIRSTEL.U 0001C0
444D4144 0C606164 03595450 4D455145 534C5455 0B4C4548 53555051 45534C54 TLSEQPUSHEL.UTLSEQEMPTY.dam.DAMD 0001E0
```

Dump of file SATURN:[PCCOMMON.DUMP.DLL]ANALYST.TMP;1 on 18-APR-1990 10:36:43.91
File ID (511,16,0)   End of file block 53 / Allocated 56

Virtual block numb.r 3 (00000003), 512 (0200) bytes

```
4854454D 5F10444F 4854454D 06504C45 48414406 4D415303 4A424F45 54454C45 ELETEOBJ.SAM.DAHELP.METHOD._METH 000000
4649544F 4E454B41 4D54554C 4D441654 554C4D44 05455441 49544E41 54534E49 INSTANTIATE.DMLUT.DMLUTMAKENOTIF 000020
4C4D4410 45544145 52435245 54534947 45525455 4C4D4413 52454C44 4E414859 YHANDLER.DMLUTREGISTERCREATE.DML 000040
59464954 4F4E5353 45434F52 5054554C 4D441254 45535245 54534947 45525455 UTREGISTERSET.DMLUTPROCESSNOTIFY 000060
41445855 41595245 55515455 4C4D4411 41544144 58554154 45535455 4C4D440F .DMLUTSETAUXDATA.DMLUTQUERYAUXDA 000080
5020322F 534F1400 00180403 06E70301 02455449 5257534F 44084F49 53034154 TA.SIO.DOSWRITE...Ö.......OS/2 P 0000A0
434F5250 4C4F4F54 5453594C 414E410F 00004543 4150534B 524F5720 4144204D M DA WORKSPACE...ANALYSTTOOLPROC 0000C0
8680026A D88EFFFF 881E5657 0001FCC8 00000000 00000000 00000000 00000001 ................à•..WV.|...Äj... 0000E0
86FF0682 E9FE1286 880007E9 037500FE 128E83FE 12868900 00FFFF9A 5016FE70 p±.P........±./.±.u.Ö.....±Öý..Ñ 000100
FF0010E9 037500FE 128E83FE 12868900 00FFFF9A 5016FC46 80025A68 256AFE70 p±j%hZ..F•.P........±./.±.u.Ö... 000120
4688FC77 FF26FE77 FF26065E C4040646 830681E9 FE128688 000000C7 9AFE7086 Ñp±.ú......±Ö...F..á^.&.w±&.w=.F 000140
FE578B26 FC478826 065EC404 06468308 C48300F5 00569A50 52000405 FE568BFC =.V±...RP.V.%..á..F..á^.&.G•&.W± 000160
52009C05 FE568BFC 46885052 000405FE 568BFC46 880A76FF 016AF656 89F44689 .F¶.V-j..v..F•.V±...RP.F•.V±...R 000180
E9FE1286 880000FF FF9AFE70 86FF0010 E9037500 003DFE12 86890000 FFFF9A50 P........±=..u.Ö...Ñp±........±Ö 0001A0
FE148680 FC77FF26 FE77FF26 065EC404 06468302 3EE90375 F6460BF4 4688060E ...F¶.F-u.Ö>..F..á^.&.w±&.w•...± 0001C0
50520050 05FE5688 FC468850 52000405 FE568BFC 468808C4 83011300 569A5016 .P.V....á..F•.V±...RP.F•.V±.P.RP 0001E0
```

```
Dump of file SATURN:[PCCOMMON.DUMP.DLL]ANALYST.TMP;1 on 18-APR-1990 10:36:43.91
File ID (511,16,0)   End of file block 53 / Allocated 56

Virtual block number 4 (00000004), 512 (0200) bytes

 89000003 2E9A5016 F8468000 9CB7FF26 009EB7FF 26FC5EC4 08C483FF FF00569A .V....á.á^=&.ñ..&.ñ...F%.P...... 000000
 1E009CB7 FF26009E B7FF26FC 5EC4059E E9FE1286 880007E9 03750000 30FE1286 ..±=..u.Õ.....±Õ..á^=&.ñ..&.ñ... 000020
 FF26FC5E C40575E9 FE128688 0007E903 7500003D FE128689 0000FFFF 9A004268 hB.........±=..u.Õ.....±Õu.á^=&. 000040
 3DFE1286 89000002 129A5016 FE14868D 2F6AF876 FFFA76FF 009CB7FF 26009EB7 ñ..&.ñ...v°.v½j/...±.P........±= 000060
 0530E9FE 12868800 0001E49A 009CB7FF 26009EB7 FF26FC5E C40019E9 03750000 ..u.Õ..á^=&.ñ..&.ñ...Õ......±Õ0. 000080
 003DFE12 86890000 FFFF9A50 16FE0686 8D2F6A00 9CB7FF26 009EB7FF 26FC5EC4 á^=&.ñ..&.ñ..j/...±.P........±=. 0000A0
 C404F1E9 FE128688 00000267 9A009CB7 FF26009E B7FF26FC 5EC40019 E9037500 .u.Õ..á^=&.ñ..&.ñ...g......±Õþ.á 0000C0
 52005005 FE568BFC 4688026A FE0686FF FE0886FF 009CB7FF 26009EB7 FF26FC5E ^=&.ñ..&.ñ...Ñ.±.Ñ.±j..F•.V±.P.R 0000E0
 9EB7FF26 FC5EC404 B7E9FE12 86880007 E9037500 003DFE12 86890000 FFFF9A50 P........±=..u.Õ.....±Õñ.á^=&.ñ. 000100
 12868900 00FFFF9A 2D6AF876 FFFA76FF 036AFE06 B6FFFE08 86FF009C B7FF2600 .&.ñ...Ñ.±.Ñ.±j..v°.v½j-........ 000120
 E9FE1286 88000002 E59A009C B7FF2600 9EB7FF26 FC5EC400 19E90375 00003DFE ±=..u.Õ..á^=&.ñ..&.ñ...|......±Õ 000140
 00300000 FFFF9A50 16FE6486 8DF476FF F676FF00 00FFFF9A F476FFF6 76FF046E n..v¬.v¶......v¬.v¶..d±.P.....=. 000160
 26FC5EC4 F876FFFA 76FFFE06 B6FFFE08 B6FFFE64 B6FFFE66 B6FF005D E9037400 .t.Õ]..Ñf±.Ñd±.Ñ.±.Ñ.±.v°.v½á^=& 000180
 30FE1286 8918C483 0000FFFF 9A006A75 6A5016FE 0A868000 9CB7FF26 009EB7FF .ñ..&.ñ.....±.Pjuj.......á....±= 0001A0
 03F0E9FE 1286P 00 0003019A 009CB7FF 26009EB7 FF26FC5E C40019E9 03750000 ..u.Õ..á^=&.ñ..&.ñ..........±Õþ. 0001C0
 07E90375 00003DFE 12868900 00FFFF9A 009CB7FF 26009EB7 FF26FC5E C4FF8AE9 Õ..á^=&.ñ..&.ñ..........±=..u.Õ. 0001E0
```

```
Dump of file SATURN:[PCCOMMON.DUMP.DLL]ANALYST.TMP;1 on 18-APR-1990 10:36:43.91
File ID (511,16,0)   End of file block 53 / Allocated 56

Virtual block number 5 (00000005), 512 (0200) bytes

 FFFF9A50 16F8468D 009CB7FF 26009EB7 FF26FC5E C40097E9 03C8E9FE 12868800 ....±Õà.Õ..á^=&.ñ..&.ñ...F%.P... 000000
 87FF2600 9EB7FF26 FC5EC403 9BE9FE12 86880007 E9037500 003DFE12 86890000 .....±=..u.Õ.....±Õ..á^=&.ñ..&.ñ 000020
 07E90375 00003DFE 12868900 00FFFF9A 5016FE06 8680206A F876FFFA 76FF009C ...v°.v½j-...±.P.........±=..u.Õ. 000040
 88026AFE 0686FFFE 0886FF00 9CB7FF26 009EB7FF 26FC5EC4 0368E9FE 12868800 ....±Õh.á^=&.ñ..&.ñ...Ñ.±.Ñ.±j.. 000060
 E9FE1286 880007E9 03750000 30FE1286 890000FF FF9A5052 005005FE 5688FC46 F•.V±.P.RP.........±=..u.Õ.....±Õ 000080
 000100A6 87C726FC 5EC40247 8926FE70 8688FC5E C4078926 0A4688FC 5EC4032E ..á^=.F.&..á^=..p±&.G.á^=&ú.|... 0000A0
 A005FE56 88FC4688 FE70B6FF 00000254 87C726FC 5EC40000 00A887C7 26FC5EC4 á^=&ú.¨...á^=&ú.T....Ñp±.F•.V±.. 0000C0
 009CB7FF 26009EB7 FF26FC5E C4505202 5605FE56 88FC4688 0000FFFF 9A505200 .RP......F•.V±.V.RPá^=&.ñ..&.ñ.. 0000E0
 E9FE1286 880007E9 03750000 30FE1286 890AC483 FFFF0000 9A0277FF 26FC5EC4 á^=&.w.......á....±=..u.Õ.....±Õ 000100
 FE76FF0A 76FF0000 FFFF9AFC 76FFFE76 FF0256B7 FF260258 B7FF26FC 5EC402AE Ü.á^=&.ñX.&.ñV..v±.v•......v..v± 000120
 9A5016FE 7A868046 6A016A02 0436FF26 1912068E 006A006A 0000FFFF 9AFC76FF .v•.....j.j.....&.6..j.jF..z±.P. 000140
 FEC6868D 0CC48304 9500E09A 5016FEC6 8680005D 681E5016 FE7A868D 0000FFFF .......z±.P.h]...ó±.P.À....á...ó± 000160
 005005FE 5688FC46 88FE0486 FFFE0486 8908F700 462D04C4 83048800 8C9A5016 .P...£..á.-F.¥A...±.Ñ.±.F•.V±.P. 000180
 83007C00 569A5016 FF0E868D 0063681E 0AC48304 CD00A49A 5016FEC6 86805052 RP..ó±.P.£.ë..á..hc......P.V.|.. 0001A0
 8680006A 006A0000 FE6E86C7 503BFE6C 86C70000 FE1086C7 0811FE0E B6C708C4 á.ú..±..ú..±..ú.l±;Pú.n±..j.j... 0001C0
 0EB6FFFE 10B6FF01 6A006A00 00FFFF9A 006A006A 006AFFFF 68FFFF68 5016FF0E ...Ph..h..j.j.j......j.j..Ñ.±.Ñ. 0001E0
```

```
Dump of file SATURN:[PCCOMMON.DUMP.DLL]ANALYST.TMP;1 on 18-APR-1990 10:36:43.91
File ID (511,16,0)   End of file block 53 / Allocated 56

Virtual block number 6 (00000006), 512 (0200) bytes

 020436FF 26191206 8E006A00 6A5016FE C686805O 16FF0E86 8D5016FE 6C8680FE ±..l±.P.....P..ó±.Pj.j.....&.6.. 000000
 0374FE74 8608FE72 8688FE74 9689FE72 86890000 FFFF9A50 16FE6086 8D032068 h ...'±.P.......r±..t±..r±..t±t. 000020
 FFFE74B6 FF0175E9 FE768688 FE789689 FE768689 0000FFFF 9A006A00 6A0018E9 Õ..j.j........v±..x±..v±Õu..Ñt±. 000040
 FE72B6FF FE74B6FF 006A006A 006A006A 056A8000 68006A00 6A076AFF 6AFE7286 Ñr±j.j.j.j.h..j.j.j.j.j..Ñt±.Ñr± 000060
 00FFFF9A 006A006A 006A006A 0A6A5052 0000FFFF 9A800468 FE72B6FF FE74B6FF .Ñt±.Ñr±h.......RPj.j.j.j.j..... 000080
 B6FFFE6A 9689FE68 86890000 FFFF9AFE C2B6FFFE C4B6FFFE C49689FE C2868900 ...ó±..á±.Ñá±.Ñó±.......h±..j±.Ñ 0000A0
 96568894 46881914 068E0000 FFFF9A50 16FF2486 8D000068 006AFE68 B6FFFE6A j±.Ñh±j.hÅ...$..P..........F..V. 0000C0
 FEC4B6FF 0000FFFF 9AFE6886 FFFE6A86 FF020216 89260200 A3268656 1B84462B +F..V.&£..&.....Ñj±.Ñh±......Ñá± 0000E0
 B6FF0000 FFFF9A00 6A006A02 0036FF26 020236FF 26191406 8E016C68 FEC2B6FF .Ñó±hl.....&.6..&.6..j.j.......Ñ 000100
 B6FF0208 16892602 06A32619 16068E00 00FFFF9A FFFF6804 F568FE72 B6FFFE74 t±.Ñr±h¥.h...........&£..&.....Ñ 000120
 FE72B6FF FE74B6FF 0A76FF00 00062A9A 006A006A 006A006A 426AFE72 B6FFFE74 t±.Ñr±jBj.j.j.j..*....v..Ñt±.Ñr± 000140
 FE128688 00000689 9AFE70B6 FF0010E9 037500FE 12BE83FE 12868900 00FFFF9A .........±.ƒ.±.u.Õ...Ñp±.¿......± 000160
 7500FE12 BE83FE12 86890000 FFFF9A50 5200A405 FE5688FC 46880A76 FF004DE9 ÕM..v..F•.V±.£.RP........±.ƒ.±.u 000180
 B6FFFE62 B6FFFC76 FFFE76FF 001CE9FE 12868800 0000549A FE70B6FF 0010E903 .Õ...Ñp±.T......±Õ...v±.v•.Ñb±.Ñ 0001A0
 08881E56 57000392 C80006CA C95F5E1F 0000E900 008808C4 83063721 AA9AFE60 '±.¨17..á.¡..Õ...^_èò..à...WV.¡. 0001C0
 3C868906 0500009A CA76FF0C 76FF1076 FF13FEE9 00008813 A1E90E46 88D88E00 ..A.F.ÕA.¡..Õ±..v..v..v....f...< 0001E0
```

```
Dump of file SATURN:[PCCOMMON.DUMP.DLL]ANALYST.TMP;1 on 18-APR-1990 10:36:43.91
File ID (511,16,0)   End of file block 53 / Allocated 56

Virtual block number 7 (00000007), 512 (0200) bytes

 0000FFFF 9A505200 00FFFF9A 006A036A 016A006A 016A006A 13E5E9FD 3C8688FD »..<»Ől.j.j.j.j.j.j......RP..... 000000
 FFFE1AB6 FF000UFF FF9A5016 FE188680 1076FF00 00FFFF9A 5016F246 801076FF .v..F .P......v....±.P......Ñ.±. 000020
 16FF1486 80FD3E86 FFFD4086 FFFD4096 89FD3E86 89000005 9C9A8008 68FE1886 Ñ.±h.........>»..ã».Ñã».Ñ>»..... 000040
 FFFD4886 FFFD4896 89FD4686 89000005 C29AFD3E B6FFFD40 B6FF0000 FFFF9A50 P......Ñã».Ñ>».ô.....F»..H».ÑH». 000060
 00000608 9AFD4686 FFFD4886 FF000005 E29A5016 FE448680 00006800 6AF04686 ÑF»j.hÅ...D±.P.ã....ÑH».ÑF»..... 000080
 C4048702 0C9A5052 FF169618 FF148628 FF1E9688 FF1C8688 FEA886FF FEAA86FF .Ñ¯±.Ñ`±........+.......RP.....á 0000A0
 5EC40040 E9037203 FE1E8E83 FE1E86FF 0004E900 00FE1E86 C7024287 8926F25E ^ &..B.ú..±..Õ.....±.ƒ.±.r.Õã.á^ 0000C0
 52024405 F4568BF2 460302E0 C1FE1E86 880242B7 FF26F25E C4256A02 77FF26F2 ·&.w.jXá^ &.ñB....±èÅ..F .V¶.D.R 0000E0
 BE83FFB2 E91202E9 F03C8688 0007E903 7500FD3C BE83FD3C 86890000 00309A50 P.*.....<».ƒ<».u.Õ....<»Õ0.Õý..ƒ 000100
 5EC400AE 87892600 2605FF14 8688F25E C412BEE9 FD3C8688 0007E903 7500FD3C <».u.Õ....<»Õƒ.á^ .....&.&..Ü.á^ 000120
 50520000 07259A00 6A016A01 6A006A01 6A006A00 B0878926 002405FF 188688F2 ·.....$.&..¯.j.j.j.j.j.j..%...RP 000140
 C48308E3 1CE79A10 76FF326A 006A006A 006A006A 016A5016 FA468D00 00072C9A .,....F*.Pj.j.j.j.j.j2.v..Õ.D..á 000160
 505299FA 46885052 00A005F4 5688F246 880016E9 037400FD 3CBE83FD 3C868912 ...<».ƒ<».t.Õ...F .V¶...RP.F*.RP 000180
 3C868900 000128 9A 5016FC6E 8680009C B7FF2600 9EB7FF26 F25EC400 0009969A .....á^ &.ñ..&.ñ....n=.P.+.....< 0001A0
 C4120EE9 FD3C8688 04C48309 27214A9A 1076FF05 6A0014E9 037500FD 3CBE83FD ».ƒ<».u.Õ..j...v..J!'..á...<»Õ..á 0001C0
 00FFFF9A 5016FE20 8680266A FC6E86FF FC7086FF 009CB7FF 26009EB7 FF26F25E ^ &.ñ..&.ñ...Ñp=.Ñn=j&.. ±.P.... 0001E0

Dump of file SATURN:[PCCOMMON.DUMP.DLL]ANALYST.TMP;1 on 18-APR-1990 10:36:43.91
File ID (511,16,0)   End of file block 53 / Allocated 56

Virtual block number 8 (00000008), 512 (0200) bytes

 FD3C8688 04C48309 71214A9A 1076FF05 6A0014E9 037500FD 3CBE83FD 3C868900 ...<».ƒ<».u.Õ..j..v..J!q..á...<» 000000
 03750247 08260788 26FE349E C4FE3696 89FE3486 89FE2296 88FE2086 8B11CAE9 Õò... ±.."±..4±..6±á.4±&..&.G.u. 000020
 E79A1076 FF696A37 FF260277 FF26FE34 9EC4006A 006A016A 5016FA46 800096E9 Õ...F*.Pj.j.j.á.4±&.w.&.7ji.v..Õ 000040
 88505200 A005F456 88F24688 0016E903 7400FD3C BE83FD3C 868912C4 8309881C .¡..á...<».ƒ<».t.Õ...F .V¶...RP. 000060
 37FF2602 77FF26FE 349EC400 6A006A01 6A5016FA 46800000 09009A50 5299FA46 F*.RP.ï....F*.Pj.j.j.á.4±&.w.&.7 000080
 5688F246 880016E9 037400FD 3CBE83FD 3C868912 C4830A19 1CE79A10 76FF6C6A jl.v..Õ....á...<».ƒ<».t.Õ...F .V 0000A0
 9EB7FF26 F25EC4FF 5AE904FE 34868300 00FFFF9A 505299FA 46885052 00A005F4 ¶...RP.F*.RP.......4±.Õ2.á^ &.ñ. 0000C0
 14E90375 00FD3CBE 83FD3C86 890000FF FF9AFE20 86FFFE22 86FF009C 87FF2600 .&.ñ...Ñ"±.Ñ ±.......<».ƒ<».u.Õ. 0000E0
 52991046 8810AE68 1076FF10 D8E9FD3C 868804C4 83070821 4A9A1076 F[illegible]56A00 .j..v..J!...á...<»ÕÅ..v.hÜ..F..R 000100
 F25EC400 000A8D9A 5016F246 801076FF 108DE900 00880000 08519A01 6A[illegible]A50 Pj.j..Q...¡..Õ§..v..F .P.....á^  000120
 0676FF08 76FF0A76 FF0C76FF 0256B7FF 26025887 FF26F25E C4000100 A88[illegible]726 &ú.´...á^ &.ñX.&.ñV..v..v..v..v. 000140
 0007399A 5016F246 801076FF 01AEE903 7500067E 831082E9 00008800 00FFFF9A .....¡..Õ...−..u.ÕÜ..v..F .P.9.. 000160
 87C726F2 5EC40089 E903740A 46391046 88009AE9 03750000 A68F8326 F25EC400 .á^ &.¢Ì..u.Õ...F.9F.t.Õ..á^ &ú. 000180
 FF24BE83 00000877 9A5016FF 24868000 A087FF26 00A2B7FF 26F25EC4 000000A6 Ì...á^ &.ñÅ.&.ñ....$..P.w..../$. 0001A0
 FE288680 00A087FF 2600A287 FF26F25E C40051E9 1021E900 00880009 E9037500 .u.Õ..¡..Õ!.Õa.á^ &.ñÅ.&.ñ....(± 0001C0
 8680016A 006AFE28 86FFFE2A 86FF5052 00A005F4 5688F246 880000FF FF9A5016 .P......F .V¶...RP.Ñ*±.Ñ(±j.j... 0001E0

Dump of file SATURN:[PCCOMMON.DUMP.DLL]ANALYST.TMP;1 on 18-APR-1990 10:36:43.91
File ID (511,16,0)   End of file block 53 / Allocated 56

Virtual block number 9 (00000009), 512 (0200) bytes

 0C56890A 4689FE2A 9688FE28 86880000 FFFF9AFE 2886FF00 00FFFF9A 5016FE3E >±.P......Ñ(±.......(±..*±.F..V. 000000
 0676FF08 76FF5052 99104688 10AE6800 A4B7FF26 F25EC40F C4E90000 880006E9 Õ..¡..Õá.á^ &.ñÊ.hÜ..F..RP.v..v. 000020
 00A0B7FF 2600A2B7 FF26F25E C40000FF FF9A5016 FD42868D 0A76FF00 00FFFF9A ......v...B».P.....á^ &.ñÅ.&.ñ.. 000040
 505200A0 05F45688 F2468800 36E90375 00FF24BE 830000FF FF9A5016 FF24868D ..$..P....../$..u.Õ6..F .V¶...RP 000060
 0876FF50 5299FD42 86881083 6800A4B7 FF26F25E C400000C 119A0A76 FF0C76FF .v..v......á^ &.ñÊ.h*...B».RP.v. 000080
 989A5016 FE28868D 00A0B7FF 2600A2B7 FF26F25E C40077E9 00000C2E 9A0676FF .v......Õw.á^ &.ñÅ.&.ñ....(±.P.. 0000A0
 0A76FF0C 76FF5052 00A005F4 5688F246 880053E9 0375FE28 86390A46 8800000C ....F.9.(±u.ÕS..F .V¶...RP.v..v. 0000C0
 0A76FF0C 76FF5052 00A005F4 5688F246 8800000B 159A5016 FE3E868D 016A006A j.j...>±.P......F .V¶...RP.v..v. 0000E0
 0EAE9A06 76FF0876 FF505299 FD428688 10836800 A4B7FF26 F25EC400 0008819A .Ÿ...á^ &.ñÊ.h*...B».RP.v..v..Û. 000100
 B7FF2600 A287FF26 F25EC400 000CCD9A 5016F246 8D1076FF 0EC5E900 00880000 ..¡..Õé..v..F .P.ë...á^ &.ñÅ.&.ñ 000120
 47892600 00880A5E C4001DE9 037500FF 248E8300 0000C39A 5016FF24 868000A0 ....$..P.ú..../$..u.Õ..á^.¡..&.G 000140
 A087FF26 00A287FF 26F25EC4 0030E907 89260247 89260000 88065EC4 07892602 .&..á^.¡..&.G.&..Õ0.á^ &.ñÅ.&.ñ. 000160
 9A0676FF 0876FF0A 76FF0C76 FF0E76FF FE2886FF 000000E5 9A5016FE 28868000 ...(±.P.Ì....Ñ(±.v..v..v..v..v.. 000180
 0000AB9A 5016F246 8D1076FF 00000747 9A5016EE 468D1076 FF0E46E9 000000FB «...Õf..v..FŸ.P.G....v..F .P.¨.. 0001A0
 5016FE42 868008C4 8307C000 569A5052 008205F4 5688F246 880A76FF 0C76FF00 ..v..v..F .V¶.ý.RP.V.e..á...B±.P 0001C0
 0254B7FF 26025487 FF26F25E C40242B7 FF26F25E C4505202 4405F456 88F24688 .F .V¶.D.RPá^ &.ñB.á^ &..T.&.ñT. 0001E0
```

Dump of file SATURN:[PCCOMMON.DUMP.DLL]ANALYST.TMP;1 on 18-APR-1990 10:36:43.91
File ID (511,16,0)   End of file block 53 / Allocated 56

Virtual block number 10 (0000000A), 512 (0200) bytes

```
FE1E86FF 0004E900 00FE1E86 C710C483 0E2F24DA 9A505200 B205F456 8BF2468B .F·.V¶.ý.RP.O$/..á.ú..±..Õ.....± 000000
6A016168 50520000 00799A0A 6AEE76FF F076FF00 58E90372 FE1E8639 FE42868B ..B±9..±r.ÕX..vÞ.vÝj..y...RPha.j 000020
FE388689 000C308E 9A024480 FF260246 B0FF26F2 5EC402E6 C1FE1E86 8BFF6A00 .j..Ñ.±èl.á^·&.¯F.&.¯D........B± 000040
06619A00 6A006A50 5299FE38 86880162 68505200 0007579A 0A6AEE76 FFF076FF .vÞ.vÝj..W...RPhb...B±.RPj.j..a. 000060
C400000A 499A5016 F2468D10 76FFFD44 86890A46 880062E9 000088FF 97E90000 ..Õ..|..Õb..F...D».v..F·.P.Ì...á 000080
2EE90374 00FF248E 8300000E 5B9A5016 FF248680 00A0B7FF 2600A2B7 FF26F25E ^·&.ñÅ.&.ñ....$..P.[..../$..t.Õ. 0000A0
0E76FFFE 2886FF00 000E7D9A 5016FE28 868000A0 87FF2600 A2B7FF26 F25EC400 .á^·&.ñÅ.&.ñ....(±.P.)....Ñ(±.v. 0000C0
0CEDE900 00880006 E9037408 46080646 880000FF FF9A006A 006A0A76 FF0C76FF .v..v.j.j.......F..F.t.Õ..|..ÕÙ. 0000E0
3F214A9A 1076FF03 6A0CD6E9 00008800 0000A887 C726F25E C407FDE9 FD44868B ..D»Õ».á^·&ú.´...|..Õ■.j..v..J!? 000100
2600A2B7 FF26F25E C40948E9 04C4830E D9214A9A 1076FF03 6A0958E9 04C4830E ..á.ÕX.j..v..J!)..á.ÕH.á^·&.ñÅ.& 000120
A2B7FF26 F25EC400 4CE90374 00FF248E 8300000A C89A5016 FF248680 00A0B7FF .ñ....$..P.à..../$..t.ÕL.á^·&.ñÅ 000140
0000085F 9A5016FD 428680FE 2886FF00 00FFFF9A 5016FE28 868000A0 87FF2600 .&.ñ....(±.P......Ñ(±..B».P._... 000160
0A369A06 76FF0876 FF0A76FF 0C76FF0E 76FFFE28 B6FF001B E9037468 FD42BE83 ./B»ht.Õ...Ñ(±.v..v..v..v..v.̄6. 000180
066A006A 006AFD4E 9689FD4C 8689009E 978B2600 9C878B26 F25EC408 DAE90000 ..Õo.á^·&....&......L»..N»j.j.j. 0001A0
FD3C868B 0007E903 7500FD3C BE83FD3C 86890AC4 83088C1F 5C9AF276 FFF476FF .v¶.v·.\....á...<».ƒ<».u.Õ....<» 0001C0
83FD3C86 890000FF FF9A5016 FE3A8680 009CB7FF 26009EB7 FF26F25E C40C0AE9 Õ..á^·&.ñ..&.ñ....:±.P.......<». 0001E0
```

Dump of file SATURN.[PCCOMMON.DUMP.DLL]ANALYST.TMP;1 on 18-APR-1990 10:36:43.91
File ID (511,16,0)   End of file block 53 / Allocated 56

Virtual block number 11 (0000000B), 512 (0200) bytes

```
DC9AFD4C B6FFFD4E B6FF04C4 830FB921 4A9A1076 FF056A00 21E90375 00FD3CBE ƒ<».u.Õ!.j..v..J!¿..á..ÑN».ÑL».É 000000
0B26078B 26F65EC4 F85689F6 4689FE3C 9688FE3A 86880BC3 E9FD3C86 8800000F .....<»ÕÙ...:±..<±.F-.V½á^-&..&. 000020
9A5016FE 26868037 FF260277 FF26F65E C4FD4C86 FFFD4EB6 FF0097E9 03750247 G.u.Õ...ÑN».ÑL»á^-&.w.&.7..&±.P. 000040
FD4EB6FF 001BE903 7400FE26 BE830025 E9037400 FD3CBE83 FD3C8689 0000FFFF ......<».ƒ<».t.ÕX..ƒ&±.t.Õ...ÑN» 000060
36E90375 00FD3CBE 83FD3C86 890000FF FF9A37FF 260277FF 26F65EC4 FD4CB6FF .ÑL»á^-&.w.&.7.......<».ƒ<».u.Õ6 000080
FF9AFE3A B6FFFE3C B6FFFD4C B6FFFD4E B6FF04C4 83101921 4A9A1076 FF056A00 .j..v..J!...á..ÑN».ÑL».Ñ<±.Ñ:±.. 0000A0
B6FFFF5A E904F646 830B16E9 FD3C868B 00001027 9AFD4CB6 FFFD4EB6 FF00000F ....ÑN».ÑL».´.....<»Õ...F-.ÕZ..Ñ 0000C0
00E90375 00FD3CBE 83FD3C86 89000009 FF9AFE3A B6FFFE3C B6FFFD4C B6FFFD4E N».ÑL».Ñ<±.Ñ:±.......<».ƒ<».u.Õ. 0000E0
83FD3C86 89000001 A59AFD4C B6FFFD4E B6FF04C4 83104121 4A9A1076 FF056A00 .j..v..J!A..á..ÑN».ÑL».É.....<». 000100
073FE90A B0E9FD3C 868804C4 83107C21 4A9A1076 FF056A00 14E90375 00FD3CBE ƒ<».u.Õ..j..v..J!|..á...<»Õ¯.Õ7. 000120
7500FD3C BE83FD3C 86890000 FFFF9A00 6A006A00 9CB7FF26 009EB7FF 26F25EC4 á^·&.ñ..&.ñ..j.j........<».ƒ<».u 000140
5016FA46 8D0704E9 0A75E9FD 3C868B04 C48310A2 214A9A10 76FF056A 0014E903 .Õ..j..v..J!À..á...<»Õu.Õ...F*.P 000160
6A5016FA 468006E5 E912C483 10C11CE7 9A1076FF 446A016A 006A006A 006A006A j.j.j.j.j.jD.v..Õ.è..á.ÕI..F*.Pj 000180
006A5016 FA468006 C6E912C4 8310E01C E79A1076 FF606A01 6A006A00 6A006A00 .j.j.j.j.j`.v..Õ.À..á.Õ6..F*.Pj. 0001A0
6A006A50 16FA468D 06A7E912 C48310FF 1CE79A10 76FF616A 016A006A 006A006A j.j.j.j.ja.v..Õ....á.ÕI..F*.Pj.j 0001C0
006A006A 5016FA46 8D0688E9 12C48311 1E1CE79A 1076FF34 6A006A00 6A006A00 .j.j.j.j4.v..Õ....á.Õ...F*.Pj.j. 0001E0
```

Dump of file SATURN:[PCCOMMON.DUMP.DLL]ANALYST.TMP;1 on 18-APR-1990 10:36:43.91
File ID (511,16,0)   End of file block 53 / Allocated 56

Virtual block number 12 (0000000C), 512 (0200) bytes

```
6A006A00 6A5016FA 46800669 E912C483 11301CE7 9A1076FF 5B6A006A 006A006A j.j.j.j[.v..Õ.=..á.Õi..F*.Pj.j.j 000000
FF26F25E C40000FC 72B6C706 4AE912C4 8311C91C E79A1076 FF316A00 6A006A00 .j.j.j1.v..Õ.è..á.ÕJ.ú.r■..á^·&. 000020
5016FE28 868000A0 B7FF2600 A2B7FF26 F25EC400 0002799A 00A0B7FF 2600A2B7 ñÅ.&.ñ...y...á^·&.ñÅ.&.ñ....(±.P 000040
2600A2B7 FF26F25E C40015E9 037500FC 728E8300 ABE90374 00003D00 00028A9A .....=..t.Õ¨../r■.u.Õ..á^·&.ñÅ.& 000060
E9FD4286 8800000E 8C9A5016 FD42868D FE2886FF 008CE900 00FFFF9A 00A0B7FF .ñ.......Õ...Ñ(±..B».P.......B»Õ 000080
86C712C4 830D1E1C E79A1076 FF476A00 6A006A00 6A006A00 6A5016FA 46800050 P..F*.Pj.j.j.j.j.jG.v..Õ....á.ú. 0000A0
12421CE7 9A1076FF 5E6A006A 006A006A 006A006A 5016FA46 8D004EE9 0001FC72 r■..ÕN..F*.Pj.j.j.j.j.j^.v..Õ.B. 0000C0
E9037D00 683DFFA8 E9037500 32300023 E90026E9 0029E900 01FC7286 C712C483 .á.ú.r■..Õ).Õ&.Õ#.=2.u.Õ´.=h.).Õ 0000E0
5016FA46 8D0564E9 FF35E9FF D7E9FFB5 E9037500 6C30FFBD E9037F00 6930FFEA õ.=i...Õ§.=l.u.Õç.Õ■.Õ5.Õd..F*.P 000100
B7FF26F2 5EC40545 E912C483 12601CE7 9A1076FF 306A006A 006A006A 006A006A j.j.j.j.j.j=.v..Õ.m..á.ÕE.á^·&.ñ 000120
8312A621 4A9A1076 FF036A05 2AE9FD3C 86890000 FFFF9A02 6A009CB7 FF26009E ..&.ñ..j........<»Õ*.j..v..J!Ì.. 000140
0000FFFF 9A5016F6 4680016A 006A009C B7FF2600 9EB7FF26 F25EC405 1AE904C4 á.Õ..á^·&.ñ..&.ñ..j.j..F-.P..... 000160
E9FD3C86 8B04C483 12F0214A 9A1076FF 056A0014 E9037500 FD3CBE83 FD3C8689 ..<».ƒ<».u.Õ..j..v..J!P..á...<»Õ 000180
FF009CB7 FF26009E B7FF26F2 5EC4FE56 89FC4689 02578B26 078B26F6 5EC4084B K.á^-&..&.W..F■.V±á^·&.ñ..&.ñ... 0001A0
214A9A10 76FF056A 0014E903 7500FD3C BE83FD3C 86890000 0FCF9AF6 76FFF876 v½.v~.ü.....<■.ƒ<».u.Õ..j..v..J! 0001C0
26009EB7 FF26F25E C40039E9 0374FE46 0BFC4688 0801E9FD 3C868804 C4831334 4..á...<»Õ...F■.F±t.Õ9.á^·&.ñ..& 0001E0
```

Dump of file SATURN:[PCCOMMON.DUMP.DLL]ANALYST.TMP;1 on 18-APR-1990 10:36:43.91
File ID (511,16,0)   End of file block 53 / Allocated 56

Virtual block number 13 (00000000), 512 (0200) bytes

```
76FF056A 0014E903 7500FD3C BE83FD3C 86890000 08C99A50 16FC468D 009CB7FF .ñ...F».P.è.....<».ƒ<».u.Õ..j..v 000000
FE76FF00 9CB7F'26 009EB7FF 26F25EC4 07BDE9FD 3C868B04 C4831374 214A9A10 ..Jlt..á...<»Õ§.á^·&.ñ..&.ñ...v± 000020
76FF056A 0014E903 7500FD3C BE83FD3C 86890000 FFFF9A50 16FD4A86 8DFC76FF .v»..J».P.......<».ƒ<».u.Õ..j..v 000040
FE76FFFD 4AB6FF00 6A006A50 16FA468D 077DE9FD 3C868B04 C4831398 214A9A10 ..Jl...á...<»Õ)..F'.Pj.j..ÑJ».v± 000060
04C48313 BB214A9A 1076FF03 6A03ECE9 12C48313 AB1CE79A 1076FF1E 6AFC76FF .v»j..v..Õ.¨..á.Õ§.j..v..JlÉ..á. 000080
04C48313 EA214A9A 1076FF03 6A03CCE9 04C48313 CB214A9A 1076FF03 6A03DCE9 ÕÉ.j..v..Jlù..á.Õä.j..v..Jlõ..á. 0000A0
E912C483 14091CE7 9A1076FF 466A056A 006A006A 006A006A 5016FA46 8D038CE9 Õ¥..F'.Pj.j.j.j.j.jF.v..Õ....á.Õ 0000C0
7EE912C4 83148D1C E79A1076 FF326A00 6A006A00 6A006A00 6A5016FA 46800390 ...F'.Pj.j.j.j.j.j2.v..Õ....á.Õ~ 0000E0
C70069FE 3086C700 0014A99A 5016FE28 868000A0 B7FF2600 A2B7FF26 F25EC403 .á^·&.ñÅ.&.ñ....(±.P.˙...ú.0±i.ú 000100
30868800 000CB09A 5016FE2C 86805016 FE30868D 10B268FE 2886FF00 00FE3286 .2±...Ñ(±hý...0±.P..,±.P.¯.....0 000120
46800024 E9037500 FE32BE83 000AE903 7469FE30 BE830038 E90375FE 328608FE ±..2±u.Õ8../0±it.Õ.../2±.u.Õ$..F 000140
830F211C E79A1076 FF696AFE 3086FFFE 3286FFFE 2C86FFFE 2E86FF00 6A5016FA '.Pj..Ñ.±.Ñ,±.Ñ2±.Ñ0±ji.v..Õ.l.. 000160
3086C700 000BCF9A 5016FE28 868000A0 B7FF2600 A2B7FF26 F25EC402 FAE912C4 á.Õ'.á^·&.ñÅ.&.ñ....(±.P.ü...ú.0 000180
0015519A 5016FE2C 86805016 FE30868D 10B268FE 2886FF00 00FE3286 C7006CFE ±l.ú.2±...Ñ(±hý...0±.P..,±.P.Q.. 0001A0
E9037500 FE32BE83 000AE903 746CFE30 BE830038 E90375FE 328608FE 30868800 ...0±..2±u.Õ8../0±lt.Õ.../2±.u.Õ 0001C0
E79A1076 FF6C6AFE 3086FFFE 3286FFFE 2C86FFFE 2E86FF00 6A5016FA 46800024 $..F'.Pj..Ñ.±.Ñ,±.Ñ2±.Ñ0±jl.v..Õ 0001E0
```

Dump of file SATURN:[PCCOMMON.DUMP.DLL]ANALYST.TMP;1 on 18-APR-1990 10:36:43.91
File ID (511,16,0)   End of file block 53 / Allocated 56

Virtual block number 14 (0000000E), 512 (0200) bytes

```
0015D39A 5016FE28 868000A0 B7FF2600 A2B7FF26 F25EC402 76E912C4 8315951C ....á.Õv.á^·&.ñÅ.&.ñ....(±.P.Æ.. 000000
5016FE2C 86805016 FE30868D 10B268FE 2886FF00 00FE3286 C70068FE 3086C700 .ú.0±h.ú.2±...Ñ(±hý...0±.P..,±.P 000020
FE32BE83 000AE903 7468FE30 BE830038 E90375FE 328608FE 30868800 0014499A .I.....0±..2±u.Õ8../0±ht.Õ.../2± 000040
FF686AFE 3086FFFE 3286FFFE 2C86FFFE 2E86FF00 6A5016FA 46800024 E9037500 .u.Õ$..F'.Pj..Ñ.±.Ñ,±.Ñ2±.Ñ0±jh. 000060
5016FF24 868000A0 B7FF2600 A2B7FF26 F25EC401 F2E912C4 8311EE1C E79A1076 v..Õ.Ÿ..á.Õ·.á^·&.ñÅ.&.ñ....$..P 000080
FE28868D 00A0B7FF 2600A2B7 FF26F25E C40030E9 037400FF 248E8300 000C599A .Y..../$..t.Õ0.á^·&.ñÅ.&.ñ....(± 0000A0
E9000016 0A9A0676 FF0876FF 0A76FF0C 76FF0E76 FFFE2886 FF000014 259A5016 .P.%....Ñ(±.v..v..v..v..v......Õ 0000C0
7EE90000 08B49A06 76FF0876 FF0A76FF 0C76FF0E 76FF00A4 B7FF26F2 5EC40190 ..á^·&.ñÉ..v..v..v..v..v..Ç...Õ~ 0000E0
2E93C003 FFC6E903 76004C30 01AA2000 ADE90376 FF81E903 7501F930 0178E901 .Õ(.=¹.u.Õ..v.ÕÙ.·˙.»L.v.Õõ..á.. 000100
15F215F2 15901590 15F215F2 15F21590 15F215F2 15F215F2 0E170E17 1634A7FF .Ì4............................. 000120
0E470E37 0E270E47 15F215F2 15F215F2 15F215F2 15F215F2 15F215F2 15F215F2 .......................G.'.7.G. 000140
15901 5F2 15901590 15901590 15F21590 15901590 15F215F2 15F215F2 15F215F2 ................................ 000160
105015F2 15901590 15901590 159015F2 15901590 15901590 15901590 15901590 ..............................P. 000180
12301590 15901590 159015F2 15191495 141115F2 13F215F2 15F215F2 15F2108B ..............................=. 0001A0
159016EE A7FF2E93 C003FF0C E9037600 163001FB 2D0041E9 0376F9F3 E9037502 .u.Õµ'v.ÕA.·«.=..v.Õ...â...ÌŸ... 0001C0
138313A3 127515F2 15901590 15901590 15901590 15901590 159015F2 15F21590 ..........................u.É.°. 0001E0
```

Dump of file SATURN:[PCCOMMON.DUMP.DLL]ANALYST.TMP;1 on 18-APR-1990 10:36:43.91
File ID (511,16,0)   End of file block 53 / Allocated 56

Virtual block number 15 (0000000F), 512 (0200) bytes

```
87E90375 021630D( 23E90376 FB07E903 750218 3D 10AA15F2 15F21303 15F213C3 û.·.Æ.·.·.˙.=..u.Õ.«v.Õ#.=..u.Õñ 000000
75022030 FEA6E9F9 FCE90375 021A30F9 E5E90375 021930F9 CEE90375 021730F9 '=..u.Õö'=..u.Õl'=..u.Õ»'Õl±= .u 000020
77022230 FE86E903 73022130 FEBEE9FA E9E90375 021C3000 08E90376 FB11E903 .Õ.«v.Õ..=..u.ÕÕ'Õ.±=!.s.Õ.±=".w 000040
B8FE63E9 FAE9E903 75029A30 FE19E903 77022C30 FE76E903 73022A30 FE29E903 .Õ)±=*.s.Õv±=,.w.Õ.±=..u.ÕÕ'Õc±¦ 000060
C400A297 882600A0 878826F2 5EC40000 17C59A50 16F2468D 1076FF03 68E90000 ..Õh..v..F·.P.é...á^·&....&..Å.á 000080
FD428689 0A468800 00183A9A 5016F246 801076FF 0341E902 57892607 89260A5E ^.&..&.W.ÕA..v..F·.P.:....F...B» 0000A0
4286FFFC 76FFFE76 FF006A00 6A016A50 16FA468D FE5689FC 46890856 88064688 .F..V..F=.V±.F'.Pj.j.j..v±.v».ÑB 0000C0
E9FD3C86 880007E9 03750000 3DFD3C86 8912C483 15111CE7 9A37FF26 F25EC4FD »á^·&.7.Õ....á...<»=..u.Õ....<»Õ 0000E0
01FE2486 C702D2E9 00000897 9A505299 FA468850 5200A005 F45688F2 468802E8 $..F·.V¶...RP.F'.RP.....Õ0.ú.$±. 000100
26F25EC4 00000CC0 9A5016FE 18868010 76FF0000 19759A50 16F2468D 1076FF00 ..v..F·.P.u....v....±.P.â...á^·& 000120
FD508680 00C86807 6A020436 FF261912 068E006A 006A0098 E9037500 00A8BF83 .¢´..u.Õ..j.j.....&.6..j.hà...P» 000140
9A5016FC 74868000 C868086A 020436FF 26191206 8E006A00 6A000018 909A5016 .P.....j.j.....&.6..j.hà...t=.P. 000160
0CE500E0 9A5016FF 26868050 16FC7486 80505200 0405F456 88F24688 00000470 p....F·.V¶...RP..t•.P..&..P.Å.Ì. 000180
11680321 685016FD 50868050 16FF2686 80FE1886 FFFE1AB6 FF016A00 6A0CC4B3 .á.j.j..Ñ.±.Ñ.±..&..P..P».Phl.h. 0001A0
E9000088 000007C7 260A5EC4 000EE903 7501FE1C BE83FE1C 86890000 FFFF9A11 .........±.ƒ.±.u.Õ..á^.&ú...¦..Õ 0001C0
A0B7FF26 00A2B7FF 26F25EC4 00001987 9A00A0B7 FF2600A2 B7FF26F2 5EC4020B ..á^·&.ñÅ.&.ñ.......á^·&.ñÅ.&.ñ. 0001E0
```

```
Dump of file SATURN:[PCCOMMON.DUMP.DLL]ANALYST.TMP;1 on 18-APR-1990 10:36:43.91
File ID (511,16,0)   End of file block 53 / Allocated 56

Virtual block number 16 (00000010), 512 (0200) bytes

 16FE2486 8D1D8068 FE2886FF 0038E903 7400003D 0000199F 9A5016FE 28868000 ...(±.P.....=..t.Õ8..Ñ(±h¯...$±. 000000
 A0B7FF26 00A2B7FF 26F25EC4 0015E903 7400FE24 8E830000 14CD9A00 6A006A50 Pj.j..ë..../$±.t.Õ..á^·&.ñÅ.&.ñ. 000020
 8D1076FF 0191F900 00880789 26FE2486 880A5EC4 FFA8E900 03E90000 11959A00 ......Õ..Õ´.á^...$±&..|..Õ...v.. 000040
 FF26F25E C4000011 599A00A0 87FF2600 A2B7FF26 F25EC400 000C419A 5016F246 F·.P.A...á^·&.ñÅ.&.ñ...Y...á^·&. 000060
 6AFE2886 FF000EE9 03740000 30000011 719A5016 FE288680 00A0B7FF 2600A2B7 ñÅ.&.ñ....(±.P.q...=..t.Õ...Ñ(±j 000080
 FF26F25E C40000FF FF9A009C B7FF2600 9EB7FF26 F25EC4FF D2E90000 FFFF9A01 ......Õ#.á^·&.ñ..&.ñ.......á^·&. 0000A0
 F4568BF2 46880000 179E9A50 16F24680 1076FF01 20E90000 88000006 889A0277 w......|..Õ ..v..F·.P......F·.V¶ 0000C0
 B7FF26F2 5EC40000 0BFB9A50 16FE3E86 80016A00 6A0A76FF 0C76FF50 5200A005 ...RP.v..v.j.j...>±.P.«...á^·&.ñ 0000E0
 FD4286C7 0009E903 7500FF24 8E830000 15B19A50 16FF2486 8000A0B7 FF2600A2 Å.&.ñ....$..P.Ÿ..../$..u.Õ..ú.B» 000100
 2886FF00 00152D9A 5016FE28 868000A0 B7FF2600 A2B7FF26 F25EC400 27E90000 ..Õ'.á^·&.ñÅ.&.ñ....(±.P.-....Ñ( 000120
 006A5052 99FD4286 881D8368 00A4B7FF 26F25EC4 000011A7 9A5016FD 42868DFE ±..B».P.Ì...á^·&.ñÊ.h°...B».RPj. 000140
 9A0676FF 0876FF0A 76FF0C76 FF0E76FF 1076FF00 80E90000 88000015 E89A006A j..Š...|..Õ...v..v..v..v..v..v.. 000160
 30EC4AE9 03751001 30002BE9 0376EC76 E903751D AD300063 E90066E9 0000FFFF ....Õf.Õc.=Ü.u.Õv§v.Õ+.*..u.ÕJ$= 000180
 E9EF71E9 037510CC 30FF16E9 03751005 30FEADE9 03751004 30EC48E9 03751003 ..u.ÕH$=..u.ÕÜ±=..u.Õ..=ä.u.Õqÿõ 0001A0
 7D0C380C 87182800 980A7B1A E5A7FF2E 93C003FF A0E90376 0008301D AE2DFFAB ¨.·Ü.=..v.Õ...á...Ïl.(...+.ñ.8.) 0001C0
 D88E06EF 881E5657 000028C8 000CCAC9 5F5E1F17 BC1A7D17 951A7D1A 7D1A7D1A .).).)...).¥..^_èò..à(..WV.¡ÿ..Ä 0001E0

Dump of file SATURN:[PCCOMMON.DUMP.DLL]ANALYST.TMP;1 on 18-APR-1990 10:36:43.91
File ID (511,16,0)   End of file block 53 / Allocated 56

Virtual block number 17 (00000011), 512 (0200) bytes

 00186F9A 5016E446 8D1076FF 1276FF00 39E90375 0C46080A 468801A7 E90E4688 .F.ÕÏ..F..F.u.Õ9..v..v..FÕ.P.o.. 000000
 FF505299 E446881D AE6800A4 87FF26FC 5EC40000 18FE9A50 16FC468D E476FF00 ..vÕ.F=.P.±...á^=&.ñÊ.hÜ..FÕ.RP. 000020
 F19A5016 E4468D10 76FF1276 FF017DE9 00008A00 00880000 1A739A0A 76FF0C76 v..v..s...|..¤..Õ)..v..v..FÕ.P.þ 000040
 000AE903 7500E27E 83000019 369A006A 006A5016 E2468D1D 8068E476 FF000018 ....vÕh¯..Fä.Pj.j..6....~â.u.Õ.. 000060
 E6468D00 6A006A10 76FF1276 FF0130E9 00008A00 00880000 19829A00 6AE476FF .vÕj..ÿ...|..¤..Õ=..v..v.j.j..Fl 000080
 00FFFF9A EC6AFF6A 5016E646 8D0E76FF E076FFE0 56890E46 890000FF FF9A5016 .P......FÕ.VÅ.vÅ.vÕ.Fl.Pj.j&.... 0000A0
 5016E446 8D1076FF 1276FF00 F8E90000 8A000088 0000FFFF 9ADE76FF E076FF00 ..vÅ.vÕ.....|..¤..Õ«..v..v..FÕ.P 0000C0
 8D009CB7 FF260^^E 87FF26FC 5EC40000 19E69A50 16FC468D E476FF00 00FFFF9A ......vÕ.F=.P.l...á^=&.ñ..&.ñ... 0000E0
 C4831C6A 214A9· ·4 76FF056A 0014E903 7500003D DC468900 00131A9A 5016F646 F-.P......FÉ=..u.Õ..j..vÕ.Jlj..á 000100
 08468D2D 6AF676FF F876FF00 9C87FF26 009E87FF 26FC5EC4 00A8E999 DC468804 ..FÉ.Õ´.á^=&.ñ..&.ñ...Vh.v-j·.FÄ 000120
 8804C483 1C8F214A 9AE476FF 056A0014 E9037500 003DDC46 89000003 619A5016 .P.a....FÉ=..u.Õ..j..vÕ.Jl...á.. 000140
 FA1CE79A E476FF1E 6AD876FF DA76FF00 6A006A00 6A5016FA 4680006A E9990C46 FÉ.Õj..F°.Pj.j.j..vO.vÁj..vÕ.Õ.° 000160
 FF0876FF 0A76FF0C 76FF0E76 FF1076FF 1276FF00 43E90000 8A000088 12C48317 ..á.|..¤..ÕC..v..v..v..v..v..v.. 000180
 00293DFE D6E90375 00233DFE 51E90375 000D3000 23E90026 E90000FF FF9A0676 v......Õ&.Õ#.=..u.ÕQ±=#.u.Õ@±=). 0001A0
 0C881E56 57000028 C8000ECA C95F5E1F FF8DE9FF 08E90375 00733DFE 8EE90375 u.Õ.±=s.u.Õ..Õ§..^_èò..à(..WV.¡. 0001C0
 46800676 FF000008 719A5052 0000086A 9A006A03 6A016A00 6A016A00 6AD88E18 ..Áj.j.j.j.j.j..j.¯.RP.q....v..F 0001E0

Dump of file SATURN:[PCCOMMON.DUMP.DLL]ANALYST.TMP;1 on 18-APR-1990 10:36:43.91
File ID (511,16,0)   End of file block 53 / Allocated 56

Virtual block number 18 (00000012), 512 (0200) bytes

 52000405 FE5688FC 46880A76 FF0C76FF 0E76FF10 76FF016A 0000183A 9A5016FC =.P.:...j..v..v..v..v..F=.V±...R 000000
 0013E903 75000C7E 830C4689 16C48300 00FFFF9A 0676FF08 76FF5016 FA468050 P.F°.P.v..v.......á..FÉ.-É.u.Õ.. 000020
 00001848 9A5016£J 468DFA76 FF01F4E9 DC468804 C4831C2C 214A9A06 76FF046A j..v..Jl...á..FÉÕ¶..v°.FÁ.P.H... 000040
 9A501608 46800676 FF0184E9 0375E246 08E04688 018FE903 74000C7E 830C4689 .FÉ.-É.t.Õ...FÁ.Fâu.Õ...v..FÁ.P. 000060
 46880000 07729A5u 16EA4680 50520000 0D469A80 08680876 FF0A76FF 00001D6C l....vÖ.vÁh...F...RP.FÕ.P.r....F 000080
 FF00A9E9 0846880E 4689E646 28F64688 E44689F2 4688E646 89EE4688 E84689EA õ.FÕ.FŸ.Fl.F·.FÕ.F-+Fl.FB.F.Õ`.. 0000A0
 E476FFE6 76FFE876 FF006A00 6AE076FF E276FF01 2EE90000 FFFF9AE0 76FFE276 vä.vÅ.....Õ...vä.vÁj.j..vÕ.vl.vÕ 0000C0
 E276FF00 0018839A 006A006A 006A006A 1D8668FA 76FF0000 1E279A03 6ADE76FF .vBj..'....v°hÑ.j.j.j.j.......vä 0000E0
 7400127E 8300001E 4E9A0403 68DE76FF E476FFE6 76FFE876 FF006A00 6AE076FF .vÁj.j..vÕ.vl.vÕ.vBh...N....-..t 000100
 1E6E9A10 00680E76 FFE476FF E676FFE8 76FF006A 006AE076 FFE276FF 001EE903 .Õ...vä.vÁj.j..vÕ.vl.vÕ.vBh...n. 000120
 FFFF9A03 6ADE76FF E476FFE6 76FFE876 FF006A00 6AE076FF E276FF00 86E90000 ..ÕÑ..vä.vÁj.j..vÕ.vl.vÕ.vBj.... 000140
 E9037EFF 42E90375 00313000 33E9037E FF4FE903 7500303D 0093E900 96E90000 ..Õ..Õ..==.u.ÕO.~.Õ3.=1.u.Õ8.-.Õ 000160
 00363DFF A8E9037D 00343DFF 38E90375 00323DFF B8E9FF35 E9037500 1E300008 ..=..u.ÕS.Õ¡.=2.u.Õ8.=4.).Õ´.=6. 000180
 00463DFF 02E90375 00443000 18E9037E FF0FE903 75005E3D FF90E9FF 1AE9037F ..Õ..Õ..=^.u.Õ..-.Õ..=D.u.Õ..=F. 0001A0
 FEDFE903 7F006130 FF6DE903 7D00603D FF75E9FE F2E9037F 00473DFF 80E9037D ).Õ..=G...Õ·±Õu.=`.).Õm.=a...ÕÕ± 0001C0
 016AFA76 FFFF4AE9 FED5E903 75006C3D FEDDE903 7F00693D FF5DE903 7D00683D =h.).Õ).=i...ÕÏ±=l.u.ÕÏ±ÕJ..v°j. 0001E0
```

```
Dump of file SATURN:[PCCOMMON.DUMP.DLL]ANALYST.TMP;1 on 18-APR-1990 10:36:43.91
File ID (511,16,0)   End of file block 53 / Allocated 56

Virtual block number 19 (00000013), 512 (0200) bytes

 50520000 1D009A. 6A016A01 6A006A01 6A006A00 00081E9A FA76FF00 00FFFF9A ......v*.....j.j.j.j.j......RP 000000
 8926FA46 88145EC4 00001856 9A006A00 6A006A00 6A1DA068 FA76FF00 0010079A ......v*hU.j.j.j.j..V...á^..F*&. 000020
 1912068E 006A006A D88E1CEF 881E5657 000192C8 CBC95F5E 1F0000E9 00008807 .¡..Õ...^_èúà...WV.¡ÿ..Äj.j..... 000040
 10E90375 0E46080C 46880000 18739A50 16FF3886 8D00C868 0A76FF02 0436FF26 &.6...v.h§...8..P.s....F..F.u.Õ. 000060
 86800014 E90CC483 1F8000E0 9A5016FE 70868050 16FF3886 8D0C76FF 0E76FF00 ..v..v...8..P..p±.P.Å.§..á.Õ.... 000080
 8D009C87 FF26009E 87FF2606 5EC408C4 8318AE00 569A5016 FE708680 5016FF38 8..P..p±.P.V.Û..á.á^.&.ñ..&.ñ... 0000A0
 4A9A37FF 26065EC4 056A0010 E9037500 0030FE6E 86890000 01549A50 16FE7086 .p±.P.T.....n±=..u.Õ..j.á^.&.7.J 0000C0
 76FF088E 1F64881E 56570000 08C8C8C9 5F5E1F00 00E9FE6E 868804C4 83105821 ¦X..á...n±Õ...^_èúà...WV.¡d..Ä.v 0000E0
 8D0096E9 F8468800 06E90375 00003DF8 46890000 FFFF9A50 16FA4680 0676FF08 ..v..F*.P......F½=..u.Õ...F½Õ... 000100
 12C48320 931CE79A 37FF26FA 5EC4696A 0E76FF10 76FF006A 006A016A 5016FE46 F±.Pj.j.j..v..v.jiá^*&.7.Õ.. .á. 000120
 99FE4688 505200A0 05FC5688 FA468800 64E9F846 880006E9 03750000 30F84689 .F½=..u.Õ...F½Õd..F*.V•...RP.F±. 000140
 37FF26FA 5EC46C6A 0E76FF10 76FF006A 006A016A 5016FE46 8D000020 889A5052 RP.E ...F±.Pj.j.j..v..v.jlá^*&.7 000160
 05FC5688 FA468800 1CE9F846 880006E9 03750000 30F84689 12C4831F F11CE79A .Õ.þ..á..F½=..u.Õ...F½Õ...F*.V•. 000180
 56570000 08C8C8C9 5F5E1F00 00E90000 88000018 249A5052 99FE4688 505200A0 ..RP.F±.RP.$...¡..Õ...^_èúà...WV 0001A0
 06E90375 00003DF8 46890000 201A9A50 16FA4680 0676FF08 76FF088E 200A881E .¡. .Å.v..v..F*.P.. ...F½=..u.Õ. 0001C0
 37FF26FA 5EC4326A 0E76FF10 76FF006A 006A016A 5016FE46 8D004EE9 F8468800 ..F½ÕN..F±.Pj.j.j..v..v.j2á^*&.7 0001E0

Dump of file SATURN:[PCCOMMON.DUMP.DLL]ANALYST.TMP;1 on 18-APR-1990 10:36:43.91
File ID (511,16,0)   End of file block 53 / Allocated 56

Virtual block number 20 (00000014), 512 (0200) bytes

 05FC5688 FA468800 1CE9F846 880006E9 03750000 30F84689 12C48320 481CE79A .Õ.K .á..F½=..u.Õ...F½Õ...F*.V•. 000000
 56570000 CCC8C8C9 5F5E1F00 00E90000 88000020 739A5052 99FE4688 505200A0 ..RP.F±.RP.s ..¡..Õ...^_èúàä..WV 000020
 0436FF26 1912068E 006A006A 00001090 9A5016FF 34868006 76FF088E 2002881E .¡● .Å.v...4..P.....j.j.....&.6. 000040
 86FFFF36 86FFFF34 86FFFF36 86FF0000 1F829A50 16FF3886 8D00C868 0876FF02 ..v.hà...8..P......Ñ6..Ñ4..Ñ6..Ñ 000060
 56570000 F0C8C8C9 5F5E1F00 0018029A 206A006A 5016FF38 86800068 681EFF34 4..hk...8..Pj.j .●....^_èúàÞ..WV 000080
 1486FFFF 1686FFFF 169689FF 14868900 00077F9A 0676FF08 76FF088E 2152881E .¡R!.Å.v..v...............Ñ...Ñ. 0000A0
 FF1C8689 000021F8 9A1A6A01 6A006A00 00079F9A 5016FF2C 86800000 68006AFF .j.hÅ......P.....j.j.j..«!...... 0000C0
 FFFF9A27 6A016A00 6AFF1A96 89FF1886 89000022 0E9A186A 016A006A FF1E9689 ....j.j.j...".........j.j.j'... 0000E0
 C9FED2D1 E0010011 E9037500 F98004B1 92568890 4688FF2A 9689FF28 86890000 ....(...*..F..V.Ÿ..*.u.Õ..ìÂì●±è 000100
 18860302 D1E0019E 56889C46 88FF1296 89FF1086 89FFEFE9 0003E903 7500F980 .*.u.Õ..Õÿ.........F..V.ìÂì●... 000120
 037500F9 800281FF 1E9688FF 1C8688FE 5689FC46 89000283 000205FF 1A9613FF .........●..F=.V±........Ÿ..*.u. 000140
 FF248689 FF129613 FF108603 FFEFE900 03E90375 00F980C9 FED2D1E0 D10011E9 Õ..ìÂì●±è.*.u.Õ..Õÿ..........$. 000160
 8689FE56 13FC4603 FF2A9613 FF288603 D2D1E0D1 FF1A9688 FF188688 FF269689 ..&.........ìÂì●..(...*..F=.V±.. 000180
 86FF00AC 878926FF 2086880A 5EC400AA 878926FF 2486880A 5EC4FF22 9689FF20  ...".á^...$.&..¯.á^.... .&..¯..Ñ 0001A0
 E90E4688 D88E2182 881E5657 000004C8 C8C95F5E 1F000007 AC9AFF14 86FFFF16 ...Ñ...¯....^_èúà...WV.¡ÿ!.Ä.F.Õ 0001C0
 1EFF2619 16068E06 76FF0876 FF0A76FF 0C76FF59 6A1076FF 1276FF00 6FE90057 W.Õo..v..v.jY¯v..v..v..v.....&.. 0001E0

Dump of file SATURN:[PCCOMMON.DUMP.DLL]ANALYST.TMP;1 on 18-APR-1990 10:36:43.91
'File ID (511,16,0)   End of file block 53 / Allocated 56

Virtual block number 21 (00000015), 512 (0200) bytes

 FF0C76FF 0676FF08 76FF003E E90062E9 99FE4688 FE468940 FC4688FC 46890206 ...F•.F•ə.F±.F±.Õb.Õ>..v..v..v.. 000000
 A1E90375 00303000 1E59001E E90042E9 0CC48321 13238C9A 1076FF12 76FF0A76 v..v..v...#.!.á.Õ8.Õ..Õ..=0.u.ÕÂ 000020
 0C76FF0E 76FF1076 FF1276FF 0000E9FF 94E90375 005930FF CDE90375 004130FF .=A.u.Õë.=Y.u.Õ..Õ...v..v..v..v. 000040
 00001AC8 000ECAC9 5F5E1F00 00E90206 1EFF2619 16068E06 76FF0876 FF..76FF .v..v..v.....&....Õ...^_èò..à... 000060
 FF0C76FF 416A0676 FF0876FF E85689E6 46890C56 880A4688 D88E22E8 881..657 WV.¡Õ".Ä.F..V..F¦.VÕ.v..¯v.jA.v.. 000080
 5688E646 0312FE46 68FE4689 FC468902 061EFF26 1916068E 0E76FF10 76FFuA76 v..v..v.....&.....F=.F±kF±..F¦.V 0000A0
 C726E676 C412FE5E 68FE4EFF 1FA5F200 09890A8E 1E0716F0 88EA7E80 00122DE8 Õ-...~õ.Þ....Õ¿..·Ê..N±k^±.áv¦&ú 0000C0
 88261914 068E1FA6 020C9A02 0036FF26 020236FF 26191406 8E036A00 6A000800 ...j.j.....&.6..&.6.....¦.....&. 0000E0
 04408926 EE4688E6 5EC412FE 7668024B 8926E65E C412FE76 68C803E1 D102000E ...ìÂ.àkv±.á^¦&.H.kv±.á^¦.FŸ&.ə. 000100
 12FE7668 06408926 F04688E6 5EC412FE 76680840 8926F246 88E65EC4 12FE7668 kv±.á^¦.F·&.ə.kv±.á^¦.FÞ&.ə.kv±. 000120
 C412FE76 6800001D 9E9A0A6A 0676FF08 76FF0A40 89260C40 89260000 88E65EC4 á^¦¡..&.ə.&.ə..v..v.j......kv±.á 000140
 891F161E EA768038 8DE676C4 12FE5E68 FC46FFFE 46FF1050 89260E40 8926E65E ^¦&.ə.&.P..F±.F=k^±.áv¦.8.võ...¿ 000160
 C412FE76 68F44003 26E65EC4 12FE7668 F0408826 E65EC412 FE76681F A5F20009 ..·Ê.kv±.á^¦&.əÞkv±.á^¦&.ə¶kv±.á 000180
 FC468802 402926E6 5EC412FE 766848F0 408826E6 5EC412FE 76680640 8926E65E ^¦&.ə.kv±.á^¦&.əÞHkv±.á^¦&)ə..F• 0001A0
 76FF0876 FF0000EE 46C7088E 2394881E 56570000 16C8C8C9 5F5E1F00 00E9022B +●Õ...^_èúà...WV.¡.#.ÄúFŸ...v..v 0001C0
 0AC48325 3500E09A 5016F046 8D006C68 1E0A76FF FE468904 C483250B 008C9A06 .....%.ã..F±.v..hl..FÞ.P.Å.5%.á. 0001E0
```

Dump of file SATURN:[PCCOMMON.DUMP.DLL]ANALYST.TMP;1 on 18-APR-1990 10:36:43.91
File ID (511,16,0)   End of file block 53 / Allocated 56

Virtual block number 22 (00000016), 512 (0200) bytes

```
260270FF 260E76C4 02E3C1EE 5E885016 F0468D00 07C6261F C4260E5E C4F84689 .F½á^.&á.&á...FÞ.P.^ŸèD.áv.&.p.& 000000
89EA4689 08C48325 7901609A 0676FF08 76FF0072 681E08C4 83254700 109A30FF .0...GX.á..hr..v..v..'.yX.á..Fõ. 000020
260E76C4 02E3C1EE 5E88000D E9037203 EE7E8300 E6E90375 EC460BEA 4688EC56 V$.Fõ.F$u.ÕI..~Ÿ.r.ÕI..^ŸèD.áv.& 000040
8904C483 2607J08C 9AEA76FF EC76FFFE 468904C4 83258A00 8C9A30FF 260270FF .p.&.0....X.á..F±.v$.võ....&.á.. 000060
0003E900 00FA46^7 EE46FF00 4BE90373 C13B08E9 830C4E88 FC4603FE 4688FC46 F•.F±.F•.N..Õ.;ês.ÕK..FŸúF•..Õ.. 000080
C626FA76 8818C426 0E76C402 E3C1EE5E 880016E9 0373FA46 3B40F846 8BFA46FF .F•.FY@;F•s.Õ...^ŸèD.áv.&á..v•&ó 0000A0
0050E900 0240C62^ D88B30C4 260E76C4 02E3C1EE 5E88C388 F85E88FF DBE92000 . ÕÜ..^½.ú.^ŸèD.áv.&óD.Á&ó@..ÕP.. 0000C0
FFEC76FF 08C48326 2500109A 30FF2602 70FF260E 76C402E3 C1EE5E88 0074681E .ht..^ŸèD.áv.&.p.&.0...X&.á..v$. 0000E0
006A0076 681E08C4 83263500 109A30FF 260270FF 260E76C4 02E3C1EE 5E88EA76 võ.^ŸèD.áv.&.p.&.0...S&.á..hv.j. 000100
5EC4000A E90374EC 4608EA46 88FF0FE9 EC5689EA 468908C4 83240801 609A006A j..'..$.á..Fõ.V$Õ...Fõ.F$t.Õ..á^ 000120
020322E0 0001063A 0005004D 90C8C95F 5E1F0000 E90000B8 07892640 EE468812 ..FŸ@&..¡..Õ...^_èù.M...:...Á".. 000140
02030000 0001233B 000202BB 00090F9F 02030241 00081952 02030058 00051896 ....X...R...A.......£...;#...... 000160
02030003 00010501 010301D8 00061062 02030000 0002041A 00020156 000619C7 ú...V...........b...Á........... 000180
01030000 000424F4 00020006 000105AD 010300E4 00051F11 02030064 00051A90 ....d.......ô...Ù.......¶$...... 0001A0
0203008C 0001053A 01030088 000121A1 01030163 00061C15 02030008 00011DF6 -...........c...ÀI.......:...... 0001C0
010301E8 0006128C 02030000 000624E2 0002032D 00000A71 02030255 00081918 ....U...q...`...ã$..........Ò... 0001E0
```

Dump of file SATURN:[PCCOMMON.DUMP.DLL]ANALYST.TMP;1 on 18-APR-1990 10:36:43.91
File ID (511,16,0)   End of file block 53 / Allocated 56

Virtual block number 23 (00000017), 512 (0200) bytes

```
010300F9 00051F19 02030095 000121E8 01030073 00051F44 02030013 00012467 g$......D...s...ÒI...........•... 000000
02030090 0001217E 010302CC 0008125A 02031804 000104F8 0005001A 000110AA `.......½.......Z...ä...-I...... 000020
01030269 000803F4 02030340 00000446 02030177 0006039B 0203007E 00051E09 ....~........w...F...@...¶...i... 000040
02030109 00051A58 02030089 00052160 0203009F 000221D0 01030025 0001063D =...X...ï!.......'!......X....... 000060
02030274 00081A06 0203002C 000122D7 01030028 000121BD 01030202 00060F07 ........§!..+...#"..,.........t... 000080
0203002E 00011BD8 0103002D 00011B83 010300AD 00011BCD 01030185 00060187 ........ë...Ü...•...¯...Ä....... 0000A0
02030082 00011CB3 0103001A 00040015 020302DA 000C02C4 02030350 000020E2 â ..P...á...Ö............•...ý... 0000C0
0103009C 00050671 02030283 00080AF3 0203011A 000506A2 02030191 00060900 ........Å.......µ........q....... 0000E0
01030290 00081A49 0203019D 00061C53 02030028 000419D3 0203003D 00010068 h...=...Æ...(...S........I....... 000100
02030037 00040812 020300AD 0005182D 0203021C 00071D06 02030001 000A0F70 p.......•.......-...Ù........7... 000120
01030058 00011F2A 01030131 00060082 0203029E 0008213B 020301AA 00060249 I...`...;!.......ý...1...*...[... 000140
020302A8 00081A1E 020300C0 00051014 020301B4 000612D6 0203005C 00011F31 1...\...•...Ç........å.......... 000160
02030049 00051D3D C20301C0 0006135A 02030230 00081900 0203013F 00061F06 •...?.......Õ...Z...â...=...I... 000180
000001CE 000601C6 020300F3 00010558 01030003 00050454 0203014B .^60F2F /...K...T...Æ...X...µ...ó...ö... 0001A0
0000FFFF 9A0C76FF 0E76FF08 76FF0A76 FF0676FF D88EFFFF B81E5657 00( '02C8 à...WV.¡...A.v..v..v..v..v...... 0001C0
0066681D 6A37FF26 0277FF26 0C5EC400 80E9FE46 880006E9 03750000 30F£'689 .F±=..u.Õ...F±Õ..á^.&.w.&.7j.hf. 0001E0
```

Dump of file SATURN:[PCCOMMON.DUMP.DLL]ANALYST.TMP;1 on 18-APR-1990 10:36:43.91
File ID (511,16,0)   End of file block 53 / Allocated 56

Virtual block number 24 (00000018), 512 (0200) bytes

```
0277FF26 0C5EC400 58E9FE46 880006E9 03750000 3DFE4689 0000006C 9AFFFF68 h...l....F±=..u.Õ...F±ÕX.á^.&.w. 000000
30E9FE46 880006E9 03750000 3DFE4689 0000FFFF 9AFFFF68 00906801 6A37FF26 &.7j.h..h........F±=..u.Õ...F±Õ0 000020
00003DFE 46890000 FFFF9AFF FF68FFFF 68026A2F 6A37FF26 0277FF26 0C5EC400 .á^.&.w.&.7j/j.h..h........F±=.. 000040
0008881E 56570000 06C8C8C9 5F5E1F00 00E90000 880006E9 FE468800 06E90375 u.Õ...F±Õ..¡..Õ...^_èùà...WV.¡.. 000060
FA468800 06E90375 00003DFA 46890000 FFFF9A50 16FC468D 0676FF08 76FF088E .Á.v..v..F•.P......F•=..u.Õ...F• 000080
003DFA46 89000001 209A0E76 FF1076FF 696A006A 1DB96837 FF26FC5E C4005BE9 ÕX.á^•&.7h¿.j.ji.v..v.. ....F•=. 0000A0
9A0E76FF 1076FF6C 6A006A1D 896837FF 26FC5EC4 002FE9FA 46880006 E9037500 .u.Õ...F•Õ/.á^•&.7h¿.j.jl.v..v.. 0000C0
C8C95F5E 1F0000E9 00008800 06E9FA46 880006E9 03750000 30FA4689 0000FFFF .....F•=..u.Õ...F•Õ..¡..Õ...^_èù 0000E0
30F84689 000000CE 9A5016FA 46800676 FF0876FF D88E008E 881E5657 000008C8 à...WV.¡f..Á.v..v..F•.P.ö....F½= 000100
326A0E76 FF1076FF 006A006A 016A5016 FE468D00 4EE9F846 880006E9 03750000 ..u.Õ...F½ÕN..F±.Pj.j.j..v..v.j2 000120
88001CE9 F8468800 06E90375 00003DF8 468912C4 83FFFF1C E79A37FF 26FA5EC4 á^•&.7.Ò....á..F½=..u.Õ...F½Õ... 000140
C8C95F5E 1F0000E9 00008800 00FFFF9A 505299FE 46885052 00A005FC 5688FA46 F•.V•...RP.F±.RP.....¡..Õ...^_èù 000160
FF1C8689 00000158 9A5016FC 46800676 FF0876FF D88E0148 881E5657 0000E6C8 àI..WV.¡H..Á.v..v..F•.P.X....... 000180
FC468802 6A0E76FF 1076FF0A 76FF0C76 FF00F6E9 FF1C8688 0007E903 7500003D =..u.Õ......Õ-..v..v..v..v.j..F• 0001A0
00C5E9FF 1C868800 07E90375 00003DFF 1C868900 00FFFF9A 50520050 05FE5688 .V±.P.RP.........=..u.Õ......Õé. 0001C0
1C868800 07E90375 00003DFF 1C868900 00FFFF9A 5016FF1E 868D37FF 26FC5EC4 á^•&.7.....P.........=..u.Õ..... 0001E0
```

```
Dump of file SATURN:[PCCOMMON.DUMP.DLL]ANALYST.TMP;1 on 18-APR-1990 10:36:43.91
File ID (511,16,0)   End of file block 53 / Allocated 56

Virtual block number 25 (00000019), 512 (0200) bytes

0000FFFF 9A5016FF 22868046 6A016A02 0436FF26 1918068E 006A006A 00A1E9FF .ôA.j.j.....&.6..j.jF..".P..... 000000
A4008C9A 5016B446 8D0CC483 027F00E0 9A5016B4 46800078 681E5016 FF22868D .."..P.hx..FÇ.P.Ä....á..FÇ.P...È 000020
16B4468D 50520050 05FE5688 FC4688FF 1AB6FFFF 1A868908 F700462D 04C48302 ..á.-F.%Á.....Ñ...F=.V±.P.RP.FÇ. 000040
0030FF1C 86890000 FF.F9AFC 76FFFE76 FF37FF26 FC5EC40A C483FFFF 00A49A50 P.È....á.á^=&.7.v±.v=.........=. 000060
880000FF FF9A5016 B4468DFF 1EB6FFFF 2086FF00 18E9FF1C 86880007 E^^37500 .u.Ô......Ô...Ñ ..Ñ...FÇ.P.....| 000080
00960203 01400002 00690005 01C00002 00930005 0012C8C9 5F5E1F00 00E.9000 ..Ô...^_èù........á...i...a..... 0000A0
01C80002 00000004 02720002 00000002 003E0002 00000001 01890002 031C.000 ..............>........r.......à. 0000C0
02090203 00900001 025C0103 00730005 00F70203 00100001 02D80103 00000006 ......Ù........%...s...\......... 0000E0
01810203 02F10000 001C0203 03500000 01080203 00890005 02200203 01770006 ..w...-........Ä...P.......þ...Ÿ. 000100
00000000 00030005 02860203 00860002 00410005 03080000 00440203 029E0008 ......D........A...Ñ...Ñ...Æ..... 000120
00000000 00000000 00000500 02000200 01C80001 881F0204 3E89088E FFFF881E .¡...Á.>...¡..ù.................. 000140
FFFF89C0 33067EC4 1EDE88D7 88EC8855 00000000 00000000 00000000 00000000 ...............U.$.a.B.á-.3ä¿.. 000160
01C6F706 4688FE87 08468ED8 8EC08CF9 28D1F7AE F2FFFF89 0A7EC4FF 7580AEF2 ·Ù.u.á-.¿...ÙK|+'.á.Á.F..±.F.%ó. 000180
76C51EDE 88D788EC 8855C85D C28C1FFA 88F388A4 F3C913A5 F3E9D149 A4027400 .t.Él|ÕµÉ.èµÉ.µ.'..ô]ùU.$.a.B.év 0001A0
13A5F3E9 D149A402 7401A8C7 88067EC4 D1F7AEF2 FFFF89C0 33C08ED8 8CFE880A ..±.Á.ä3ä¿.. ÙK|á-..ú´.t.Él|ÕµÉ. 0001C0
88914901 F7AEF2FF FF89C033 067EC4D7 88EC8855 C85DC28C 1FFA88F3 88A4F3C9 èµÉ.µ.'..ô]ùU.$.aó-.3ä¿.. ÙK|l.. 0001E0

Dump of file SATURN:[PCCOMMON.DUMP.DLL]ANALYST.TMP;1 on 18-APR-1990 10:36:43.91
File ID (511,16,0)   End of file block 53 / Allocated 56

Virtual block number 26 (0000001A), 512 (0200) bytes

88DF880A 7EC406F7 884FAEF2 FFFFB9C0 33D78806 7EC41E56 57EC8855 00C850FA "]ù.U.$WV.á-..a3ä¿.. ÙO.%.á-..Ô. 000000
00C8505F 5E1FC28C C288AAA4 F3071F06 F388FE88 D9F70E4E 2B410175 AEF20E4E N.·Ùu.A+N.%1.±.µ...µÉ´.ô.ô.^ ]ù. 000020
420A47C6 26F85EC4 FE568CFC 46890E46 8DFA568C F84689EC 46805657 000016C8 à...WV.F$.F%.V'.F..F=.V±á^%&ZG.B 000040
FFFC76FF 167FFF04 47C72602 57892607 89260857 89260647 89260856 88064688 .F..V.&.G.&.W.&..&.W.&ùG.....v=. 000060
263F8826 C02A1278 044FFF26 F85EC4F0 880CC483 0155041E 9A53060A 76FF0C76 v..v..S...U..á..Þá^%&.O.x.*à&.?& 000080
C8C95F5E C68806C4 83FFFF02 A89A006A 53FA76FF 900FEB05 88260247 8E2607FF ..&.G.&..Š...v'Sj.. ....á..ó^ èù 0000A0
1474C00A AC0A76C5 071EABF3 E07E8DC0 33001089 07160788 DE8820EC 83EC8855 U.$.$ .B.m..¿..3à.-Äµ ..év.¯.Ãt. 0000C0
36C52605 75C60808 8C0676C5 E7EBE043 08EFD303 81E00207 E18001B0 C888F888 .%.à¯..Ã.0ÁÝ.Æy.CÁSÔév..Ã.óu.&é6 0000E0
07E18001 80C888F8 8848E808 8E00801E 8C26007E 3689264E 0F7500FF 25AC007E -.¯%..u.N&.6-.&.....ÃSH.%.à¯..Ã. 000100
FF448D05 7500FF25 AC00801E 8C26007E A326FF44 8D0775E0 4322EFD3 0381E002 0ÁÝ.Æy"CÁum.D.&È-.&....¯%..u..D. 000120
88007E06 872696FF 6488E174 E04322EF 03038 1E0 D207E180 0180C888 F88818E8 $..%.à¯..Ã.0ÁÝ.Æy"CÁtÃ.d..&..-.. 000140
F7065688 47117DC0 08084688 FF335356 57EC8855 00C850E5 881F060A 8CFA88F3 µ.'.Ô...[]ù.U.$WVS3..F..à).G.V.% 000160
46890000 10DAF7D8 F70A5688 47117DC0 080C4688 06568908 46890000 10DAF7D8 Á%Ô....F..V..F..à).G.V.%Á%Ô....F 000180
88D88838 E8D388F1 F7064688 D888F1F7 02330846 880A4E88 1575C008 0A56890C ..V..àu..N..F.30%þ.Á.F.%þ.ÆSB.Á. 0001A0
F70A4688 910C66F7 F088F1F7 F4750808 D8D1EAD1 D9D1E8D1 06468808 5688OA4E N..V..F.ìSilìöìÁ.Ùu¶%þ.Þ%f...F.% 0001C0
58000A83 D8F7DAF7 07754F96 D2334E01 76064638 06720777 0856380C 72D103E6 |.ir.;V.w.r.;F.v.N30.Ou.%O%Á.O.[ 0001E0

Dump of file SATURN:[PCCOMMON.DUMP.DLL]ANALYST.TMP;1 on 18-APR-1990 10:36:43.91
File ID (511,16,0)   End of file block 53 / Allocated 56

Virtual block number 27 (0000001B), 512 (0200) bytes

9904D420 C388FA46 89E42A08 478A2608 5EC45657 000008C8 0008CA5D E5885F5E ^_.[]ò..à...WVá^.&.G.*ô.F'.ú-à.. 000000
74400A47 F6260774 830A47F6 26F84689 10C805E0 D1C103E0 D1C888F9 F7000C89 ¿..%'.àlÁ.èlÁ.à..F%&-G..t.&-G.ǝt 000020
26200A4F 80260E74 010A47F6 26085EC4 900128E9 FFFFB820 0A4F8026 085EC40F .á^.&.O. ¡..Ô+..á^.&-G..t.&.O. & 000040
47F626FC 7689F088 04478926 C028EF0A 67802602 0A4F8026 90E2EB00 000447C7 úG...Šã.&.O..&.g.ÿ+à&.G..þ.v=&-G 000060
077504E0 087E8137 750110C8 87F606D8 68F9F700 0C899904 D42DC388 4C750C0A ..uL.ù-à..¿..%'kÁ.-.à..u7.-.Á.u. 000080
02C48303 C4121E9A FA76FF0F 75FFFF0A 7E811675 04EC087E 810E7403 510A7E81 .-.Q.t..-.$.u..-...u..v'...á..á. 0000A0
99040420 C3881575 080A47F6 26085EC4 04C4830C 51E80876 FF0A76FF 0C75C008 .àu..v..v.ÒQ..á.á^.&-G..u..ú-à.. 0000C0
57882606 47882606 77282637 8826085E 88677401 10C887F6 060868F9 F7000C89 ¿..%'kÁ.-.à..tg.^.&.7&+w.&.G.&.W 0000E0
76FF0677 FF265256 167EF608 04478926 48024588 F87E8802 57892607 89264008 .ǝ&..&.W..-%.E.H&.G..-~.VR&.w..v 000100
9A53006A 006A026A 0F742016 D987F6FA 5E8819E8 FC468908 C48303E2 10869AFA '...ã..á..f=$..^'-.}. t.j.j.j.S. 000120
FF501606 46805600 01BE17E8 07882606 468A065F C426085E C408C483 04051048 H....á.á^.&á_..F.&..Š.ƒ..V.F..P. 000140
8855C8C9 5F5EE42A 06468AFE CCE90374 FC7639FC 468908C4 83012A10 869AFA76 v'...*..á..F=9v=t.Ôä±.F.*ô^_èùU. 000160
1A1A1689 1A18A310 56880E46 881A2A1E 8C1A28A3 1A2E8803 5812429A 000A88EC $¡...B.[.¡..È(...*..F..V.È...... 000180
25F67E80 0380E900 001A2206 C700001A 2406C71A 00168919 FEA30856 88064688 .F..V.È±.....ú.$...ú."...Ô...--% 0001A0
A31A1CA3 1A1EA31A 06A31A20 A31A04A3 1A08A3C0 2800011A 2606C703 08E90374 t.Ô..ù.&...+àÈ..È..È .È..È..È..È 0001C0
301B8E06 C70A46· 49753001 7F80260A 5EC40020 188E06C7 1A16A319 FCA31A02 ..È=.È..ù... .á^.&...0ul.F.ú...0 0001E0
```

```
Dump of file SATURN:[PCCOMMON.DUMP.DLL]ANALYST.TMP;1 on 18-APR-1990 10:36:43.91
File ID (511,16,0)   End of file block 53 / Allocated 56

Virtual block number 28 (0000001C), 512 (0200) bytes

 0E75203F 80269028 EB00001A 1C06C71A 0806FF0D 752B3F80 260A5E8B 903EEB00 .Š>..^.&.?+u.....ú.....Š(.&.? u. 000000
 1606FFC7 752D3F80 260A5EC4 00EB19FC 06FF9014 EB1A1C06 FF1A7500 1A083E83 .>...u.....Š....•.Š.á^.&.?-uú... 000020
 2C681E0A 76FF0C76 FFD075C0 0802C483 0978E80E 5098078A 260A5E8B 0A46FF1A ..F..^.&...P.Òx..á..àuî.v..v..h, 000040
 2CA30BF7 1A2CA11A 1606FF0C 7D001A2C 3E830C56 890A4689 08C48308 C7E80E1A ..Òú..á..F..V..>,..).....Å,.¥ÅÈ, 000060
 06FF2D75 2E3F8026 0A5EC400 2018BE06 C7067530 1B8E3E83 0074001A 163E831A ..>...t..>..Ou.ú... .á^.&.?.u-.. 000080
 7D001A26 3E830C56 890A4689 08C48308 7BE80E1A 26681E0A 76FF060A 46FF1A1E ...F...v..h&..Ò(..á..F..V..>&..) 0000A0
 7400683D 4074004E 303D7400 46309807 8A260A5E C41A1E0E FF00011A 2606C70A .ú.&........á^.&...=F.t==N.tà=h.t 0000C0
 C40A46FF 03754C3F 80260A5E C4097500 1A063E83 00021A06 06C70675 006C3D28 +=l.u.ú......>...u.á^.&.?Lu..F.á 0000E0
 1A0606C7 D0EB0010 1A0606C7 D8EB0001 1A0606C7 90024EE9 1C75003F 80260A5E ^.&.7.u.ÒN..ú.....ŠÅú.....ŠÅú... 000100
 46831A04 06FF0875 00583005 7400473D 0A740045 3DF84689 98078A26 C8EB0008 ..Šà&....F%=E.t.=G.t.=X.u......F 000120
 7500253D 0152E903 7E013FE9 03750063 300191E9 037E7874 00693DF8 468820F8 % .F%=i.tx-.Õ..=c.u.Õ?.-.ÕR.=%.u 000140
 0247C726 0789261A 22A11FC4 261A181E C4157502 1A063E83 900159E9 0140E903 .Òà.ÒY...>...u.á...&á.À".&..&úG. 000160
 0170E903 75001A24 3E83041A 18068307 89261A22 A11FC426 1A181EC4 00EB0000 ..Š.á...&á.À".&........>$..u.Õp. 000180
 06FF01AC E9FFFFB8 01AFE903 75200A47 F62619FE 1EC401BD E9037400 1A223E83 .>"..t.Ò§.á.±.&-G. u.Ò€.j..Õ¯... 0001A0
 1A0406FF 1A0206FF F2EB086A 90C3EB02 C483019E E80E0A6A 000019FC 06C71A20  .ú.•...j..Ò...á.Šù.j.Š ........ 0001C0
 1A06A3C0 2B7A7401 1A063E83 0081E903 75081A06 3E830004 1A2606C7 1A1E06FF ....ú.&....>...u.Õ...>...tz+àÈ.. 0001E0

Dump of file SATURN:[PCCOMMON.DUMP.DLL]ANALYST.TMP;1 on 18-APR-1990 10:36:43.91
File ID (511,16,0)   End of file block 53 / Allocated 56

Virtual block number 29 (0000001D), 512 (0200) bytes

 909013EB 00001A2C 06C70A74 001A163E 83FA4689 1A2CA128 741A2C06 39FA4689 .F*9...t(À,..F*.>...t.ú.,...Š... 000000
 6A02C483 0130E80E 106A021A 1806831A 2CA3C02B 027DC00B 1A2CA105 1A2C2E83 ......À,..à).+àÈ,......j..ÒO..á.j 000020
 C00B1A2C A300052D FA46B815 74001A16 3E832274 00FA7E83 02C48304 8DEB0E3A :.Ò...á..-*.t".>...t..F*-..È,..á 000040
 068302C4 8300F1EB 0E106A04 1A182E83 00001A2C 06C79007 EB1A2CA3 C028027D ).+àÈ,.Š..ú.........j..Òþ..á... 000060
 49E80EF8 76FFF4EB 016A90FF 39E9026E E80E006A 90FF3FE9 106AFF10 E9021A18 ...Õ..j.Õ?..j..Òn.Ò9..j.Š¶.v½.Òl 000080
 DA7E0067 30057C00 6530FF0C E9037500 643D90FF 21E90428 E80E256A FF2AE903 .Õ*.j%.Ò(.Òl..=d.u.Õ..=e.|.=g.-Õ 0000A0
 903AEBFE 5689FC46 89400C56 880A4688 0A4EFF0C 56880A46 88097400 1A063E83 .>...t..F..V..N..F..V.à.F•.V±Š:. 0000C0
 0075308F 7400733D FEE0E903 7500703D FEE4E903 75006F3D FE80E903 75006E3D =n.u.Õ.±=o.u.ÕÕ±=p.u.ÕÅ±=s.t.=u. 0000E0
 88078A26 FC5EC4FC 46FF9034 EB0A46FF 90B1EBFF 79E90375 00783DFE B9E90375 u.Õ¿±=x.u.Õy.ŠÝ..F.Š4..F•á^•&... 000100
 FC468806 C483044C E80E0A76 FF0C76FF 500A4628 C38BEC75 253C0474 C00AF646 F-.àt.<%uš.ù+F.P.v..v..ÒL..á..F• 000120
 47F62619 FE1EC4FC 63E90374 C00AF646 88078A26 0A5EC40C 56890A46 89FE568B .V±.F..V.á^.&...F-.àt.Òc•á.±.&-G 000140
 8300201B 8E06C706 74001A1E 3E835657 000012C8 CBC91A22 A1FE51E9 0374200A . t.ÒO±À".èùà...WV.>...t.ú... .. 000160
 8B26078B 261A181E C4197510 1A063E83 0774021A 063E831A 2006FF04 740A067E ~..t... ..>...t..>...u.á...&..&. 000180
 4689078B 261A181E C4117400 1A203E83 902CEB04 1A180683 FE5689FC 46890257 W..F•.V±.....Š,..> ..t.á...&...F 0001A0
 0019FC3E 83021A18 0683FE56 89FC4689 99078B26 1A181EC4 0EEB0000 FE46C7FC •úF±..Š.á...&....F•.V±......>•.. 0001C0
 89F24689 1A2A168B 1A28A11B 8CA3C02B 9003EB06 46880674 FE460BFC 46880E74 t..F•.F±t..F.Š..+àÈ..À(...*..F·. 0001E0

Dump of file SATURN:[PCCOMMON.DUMP.DLL]ANALYST.TMP;1 on 18-APR-1990 10:36:43.91
File ID (511,16,0)   End of file block 53 / Allocated 56

Virtual block number 30 (0000001E), 512 (0200) bytes

 8B2007C6 26F246FF F25EC41D 750A067E 832B7D00 FE7E8331 75001A20 3E83F456 V¶.> ..u1.-±.)+.-..u.á^·.F·&6.-. 000000
 B80000F6 46C79006 EB0001F6 46C7FE56 89FC4689 DAF70002 8308F7FE 5688FC46 F•.V±%Å.•.%Ò.F•.V±úF-..Š..úF-..¡ 000020
 001A1E3E 830AC483 09081214 9AFC76FF FE76FF50 1E0676FF FA5E8CF8 46891A0A ...F%.^*.v..P.v±.v•......á..>... 000040
 8C3E8300 7EC906 0 4E89C82B 1A260E8B 04C48304 27008C9A F876FFFA 76FF4574 tE.v*.v½...'..á...&.+à.NÞ.è-..>. 000060
 7E89F47F C00B49C1 88473005 C62605EB F27EC4F0 4E880000 1B8C06C7 0675081B ..u.ú......NÞá-·Š.&6.OG.è!.à.¶.- 000080
 7C613C07 74C90B04 88078A26 F85EC4F2 76C5EE5E 8C1A040E 8BF04E89 F4468CF2 ·.F¶.NÞ.....^Ýév·á^¥&.....èt.<a| 0000A0
 08A11475 001A203E 83EE5E8E F45E8CF2 7689E375 003F8026 F846FF46 202C8003 .., F.F¥&.?.uD.v·.^¶.^Ý.> ..u.À. 0000C0
 CBC95F5E 02C48302 FFE80E50 C02B02EB 0001B805 7500F67E 8308741A 1C060B1A .....t..--.u.¡..Š.+àP.Ò...á.^_èù 0000E0
 1A180683 FA5689F8 46891A1A 16881A18 A100018E 18740006 7E835657 000010C8 à...WV.-..t./..À.......F%.V*.... 000100
 1EC410EB FA5689F8 46890257 8B26078B 261A181E C4137408 1A063E83 008FE902 .Ò...>...t.á...&..&.W..F%.V*Š.á. 000120
 FA460BF8 46880E74 081A063E 83041A18 0683FA5E 8CF84689 FC468907 8B261A18 ..&...F•.F%.^*......>...t..F%.F* 000140
 F24689FA 5688F846 88FA5E8C F8468900 89880975 00FC7E83 900AEB00 82881575 u.¡..Š...-•.u.¡...F%.^*.F%.V*.F· 000160
 3B461574 003F8026 F246FFF2 5EC4900E EB1A260E 881C741A 1E3639F6 28F45689 .V¶+-96..t...&.Š..á^·.F·&.?.t.F; 000180
 0875001A 163E83FE 2B1A2C3E 88F37500 3F8026F2 46FFF25E C44690ED EB107ECE ö-.ŠU.Fá^·.F·&.7.u¤.>,.+±.>...u. 0001A0
 E80E5708 74001A16 3E8306C4 83018E8 0EF876FF FA76FF56 02C48301 59E80E57 W.ÒY..á.V.v*.v½.Ò°..á..>...t.W.Ò 0001C0
 7467067E 83FE5689 FC46891A 1A16881A 18A10000 06C890C8 C95F5E02 C483013C <..á.^_èù.à...À.......F•.V±.-.gt 0001E0
```

```
Dump of file SATURN:[PCCOMMON.DUMP.DLL]ANALYST.TMP;1 on 18-APR-1990 10:36:43.91
File ID (511,16,0)   End of file block 53 / Allocated 56

Virtual block number 31 (0000001F), 512 (0200) bytes

 7E800006 1A2606C7 0675001A 1E3E83FA 4688C02A 9003EB01 80057547 067E8306 ..-.Gu.¯.Š..*á.F*.>...u.ú.&....- 000000
 1A2A36FF 0676F.1A 2636FF1A 0436FF00 011A2606 C7067500 1A263E83 007400FA *.t..>&..u.ú.&....6...6&..v..6*. 000020
 19FC3E83 187400FA 7E800EC4 8304B41E FF26191A 068EFC76 FFFE76FF 1A2836FF .6(..v±.v=....&..Ç..á..-*.t..>=. 000040
 3E831B74 0019FC3E 8304C483 04881EFF 26191A06 8E1A2836 FF1A2A36 FF147500 .u..6*..6(.....&..¡..á..>=..t..> 000060
 06C7081A 18068304 C48304C0 1EFF2619 1A068E1A 2836FF1A 2A36FF14 75001A26 &..u..6*..6(.....&..á..á......ú. 000080
 0804C483 04C41EFF 26191A06 8EFC76FF FE76FF18 741A1C06 081A08A1 0000188C ....Å......t..v±.v=....&..á..á.. 0000A0
 1EC43C75 001A243E 83560000 00C890CB C90129E8 0E50C028 02E80001 880574C0 át.¡..Š.+áP.Ò).èù.à...V.>$..u<á. 0000C0
 1A0036FF 10E8E42A 04882602 478E2607 FF26378B 2606468A 1478044F FF2619FE ±.&.O.x..F.&.7&..&.G.&..*ðŠ..6.. 0000E0
 02C890CB C95E1A22 06FF9005 E81A2406 FF077540 06C48308 E302A89A 0676FF53 Š.v..´.D..á.âu...$.Š....".^èù.à. 000100
 188E36FF 19FE36FF 1A0036FF 18E8507E F6080676 88577500 1A243E83 56570000 ..WV.>$..uW.v..--PŠ..6...6±..6.. 000120
 D478044F FF2619FE 1EC41E7E C0084EC6 881A2406 FF047540 06C4830C 4802A89A .´K..á.âu...$..6N.á-.á.±.&.O.xá 000140
 06010646 88077500 1A243E83 D4E8E42A 05882602 478E2607 FF263F88 26188EA0 ...&.?&..&.G.&..*ðŠá.>$..u..F... 000160
 19FE36FF 1A0036FF 22E85E75 001A243E 830A7688 56570000 02C8C8C9 5F5E1A22 ".^ èùà...WV.v..>$..u^Š".6...6±. 000180
 74C0084E C6880646 FF1A2406 FF047540 06C4830C 8002A89A 5098078A 26065EC4 á^.Ĕ...P.´.§..á.âu...$..F..6N.át 0001A0
 2602478E 2607FF26 3F882619 FE1EC407 8A26065E C4CD7804 4FFF2619 FE1EC425 %á.±.&.O.xeá^.&..á.±.&.?&..&.G.& 0001C0
 1A28A156 00000CC8 C8C95F5E 1A220601 0A468807 75001A24 3E83CAE8 E42A0588 ..*ðŠò.>$..u..F...".^_èùà...VÀ(. 0001E0

Dump of file SATU.N:[PCCOMMON.DUMP.DLL]ANALYST.TMP;1 on 18-APR-1990 10:36:43.91
File ID (511,16,0)   End of file block 53 / Allocated 56

Virtual block number 32 (00000020), 512 (0200) bytes

 8308F600 8C9AF476 FF521A2C 3688FA46 89FC4689 C028F656 89F44689 1A2A1688 ..*..F¶.V-+á.F=.F*.6,.R.v¶...-.. 000000
 3E834E01 7508188C 3E8308E8 02EE8305 7510188C 3E830676 28F028F8 468904C4 á..F½+Þ+v..>...u..¥.Š..>...u.N.> 000020
 71E80E50 98078A26 F446FF12 7530188E 3E831975 203F8026 F45EC422 75001A16 ...u"á^¶&.?-u..>..Ou..F¶&...P.Òq 000040
 FF077400 067E831B 74001A16 3E83077E F60B0874 30188E3E 83F84EFF 02C483FE ±.á..N½.>..Ot..--..>...t..-..t.. 000060
 FE7EE80E 56297500 1A163E83 0070E80E FC46FF07 7400188C 3E830066 E80EFA46 F*.Òf..>...t..f=.Òp..>...u)V.Ò-± 000080
 047500FC 7E830A74 00188C3E 830039E8 0E047500 FA7E830A 7400067E 8302C483 .á..-...t..-*.u..Ò9..>...t..-=.u. 0000A0
 20188E06 C70E7400 1A163E83 06C483FE B5E80EF4 76FFF676 FFF876FF 0040E80E .Òa..v½.v-.v¶.Òç±.á..>...t.ú... 0000C0
 F0D2E80E 50002088 03E80028 88057400 1A083E83 C8C95E02 C483FE38 E80E5600 .V.Ò8±.á.^èù.>...t.¡+.Š.¡ .P.Ò8» 0000E0
 03E80058 88057400 1A043E83 1775101B 8C3E8302 C483FDC8 E80E306A C802C483 .á.ùj0.Òà».á..>...u..>...t.¡X.Š. 000100
 12752A3F 80260A5E C40001FE 46C75657 000006C8 C802C483 FDAAE80E 50007888 ¡x.P.Ò´».á.ùà...WVúF±..á^.&.?*u. 000120
 FFFFFE46 C708752C 3F80260A 5EC49060 E80A46FF 021A1806 83378826 1A181EC4 á...&.7......F.Š'.á^.&.?-u.úF±.. 000140
 0675303C 0A751A1E 3639387F 393C3F7C 303CFA46 88078A26 0A5E88F6 280A46FF .F.+-.^.&...F*<0|?<9.;96..u.<Ou. 000160
 83C803E1 D1CE0302 E1C1CE88 98058A26 187F3930 802606E8 F8880030 188E06C7 ú...0..«Š.&.=9..&....öèÃ..öîÃ.à. 000180
 46883789 26065EC4 F088EEF7 FE46880C 468C0A7E 890F7D30 30802647 F18830E9 Õ0.þG&.=0)Ô.~..F..F±¼Ÿ.Þá^.&.7.F 0001A0
 264701EB FC7EC406 4E8AFE5E 8CFC4689 00908857 000004C8 C8C95F5E 0C56880A ..V.^ èùà...W¡...F=.^±.N.á-=Š.G& 0001C0
 C95FC028 FE468CFC 7E899009 E8FE468C FC7E8900 0188F475 00382611 74003080 .=.t.Ĭ8.u¶¡...-=.F±Š...-=.F±+à_è 0001E0

Dump of file SATURN:[PCCOMMON.DUMP.DLL]ANALYST.TMP;1 on 18-APR-1990 10:36:43.91
File ID (511,16,0)   End of file block 53 / Allocated 56

Virtual block number 33 (00000021), 512 (0200) bytes

 FFFF9A00 96681E00 98681E16 D2A3E086 580000FF FF9A5016 C48850EC 885590CB ù.U.šP.á.P.....X.ÀÈ@..h...h..... 000000
 680ED80F 889A0ECB 0F349A50 CB5DE588 00018808 A713569A 039EE800 21E80000 ..Ò!.Ò...V.Ĭ.¡...Ì)ùP.4.ù....Ä.h 000020
 3174003D 80264701 75003080 267FFFB9 0098068E FF330000 881E009E 16FF00FF .......£..3....¿..&.=.u.G&.=.t1 000040
 2CAC1609 8F1FF788 071E061C E8E774AE F2C03308 74CA88A6 F3C888D1 8804A28E ƒÀ..ì.ù¡Ì.òt.3à·ÙtÓŠ.....¥.€Ì.¯, 000060
 0ED00F88 9A5000FC 88EC8855 00C31FED E8AAC20A 0572412C AC9204E0 C00E7241 Ar.àÁ..¯,Ar..ô´ŠÙ.û.U.š¡=.P...ï. 000080
 03438857 56EC8855 C85DE588 0F3E0F88 9A5000FF B804B01E FF047400 04B23E83 .>ý..t...¯.¡..P...>..Ì)ùJ.šVW¡C. 0000A0
 96E8E8F7 88AEF2FF FF89C033 970C7496 401074C2 38AD1924 8E065688 C08ED88E .Ä.ä.V./$.Ù;òt.â.t..3à¿..·Û.%ŠŠ. 0000C0
 FFFF89C0 33FA8892 1F74C008 0F520F58 9A0676FF 57EC8855 0002CA5D E5885E5F _^.Ì]ò..U.šW.v..X.R..át...*3à¿.. 0000E0
 04C80002 CA5DE58B 5F580000 FFFF9A50 1651521E 53000288 C4885049 D1F7AEF2 ¯ÙÄ¡¡P.á£..S.RQ.P.....[_.Ì]ò..à. 000100
 FC468910 C805E0D1 C103E0D1 C888F9F7 000C8999 04D42004 468818EA 06FF0000 ....õ..F.·Â..¿..¥*.àîÂ.ĕîÂ.à..F= 000120
 4F802611 74D00808 57892606 47892604 5EC402C4 830F9215 119A0200 68FE5E8C .^±h........á.á^.&.G.&.W...Àt.&.O 000140
 47892640 FE5688FC 4688040A 4F802604 5EC49021 E8020002 47C726FC 5EC4080A ..á^=&ùG...Š!.á^.&.O...F=.V±â&.G 000160
 02578926 07892608 57882606 47882604 5EC40001 0247C726 FC5EC408 57892606 .&.W.á^=&ùG...á^.&.G.&.W.&..&.W. 000180
 830460E9 0454E9C0 3300098A 08721607 1E38065E 88EC8855 C3C90000 0447C726 &ùG...èùU.š.^.;.=.r.o..3àÕT.Õ'.. 0001A0
 1609A780 91E175C0 855A5900 00FFFF9A 51160C76 FF0876FF 0A76FF53 CC8804EC š..aS.v..v..v..Q.....YZ.âuÂ..Ĭ\. 0001C0
 D987F604 13E9C033 00098A08 7216071E 38065E88 0CEC83EC 885500C8 5DE588FD ».Ì]ù.U.š.š..^.;.=.r.o..3àÕ..-.\ 0001E0
```

Dump of file SATURN:[PCCOMMON.DUMP.DLL]ANALYST.TMP;1 on 18-APR-1990 10:36:43.91
File ID (511,16,0)    End of file block 53 / Allocated 56

Virtual block number 34 (00000022), 512 (0200) bytes

```
FA5E8C66 74801609 87F60000 10719A50 16F4468D 51414151 51C93353 12742016  . t.S3èQQAAQ.F¶.P.q...-.\..tf.^* 000000
F20AB049 E30C4E88 F86689F2 8BFA8856 57FCFC46 89FE4689 C0330856 C50A468E  .F.éV.3à.F±.F==WV.*.·.f%.N.DI¯.· 000020
AA1A74FB 3B0D740A 3CAC0C4E 880716FA 88D48BE2 2B00808A DC8802EC 833B75AE  Ûu;.ä..£¤..+ã.à.*..N.¯<.t.;«t.^ 000040
5F5EE1EB 0014E8E2 EBFC46FF 0AB0AA00 1FE80375 FB3B00B0 009AE900 2BE8F4E2  ã¶ô+.ô..¯.;«u.ô..¯..F«$äô..$Ã^_ 000060
53065E88 1FE3C 28 CF881F06 1E515350 0FE91242 9AFFFCBB 7AE80093 E9FA5E8E  .^*ô..Š±¡=..B.ô.PSQ....ü+ôD..^.Š 000080
88585859 1F077~J8 0BFE5E01 F45E8811 75C00800 000F829A 5016F446 8D51521E  .RQ.F¶.P.ÿ....äu..^¶.^±.Ût..Y[X. 0000A0
F90020BA 03E8001C 8A087500 09BA0001 3000 7400 6D301874 C00808C4 831FC3FA  *ù..á..ât.=m.t.*..¤..u.¤..Š.¤ .* 0000C0
F9C03300 1C8A0EEB F803751A 3F80085E 880A5E8E 0E744016 D987F6FE 5E8E26EB  Š&.^±-.\.ât..^..^..?.u.%Š.¤..3á* 0000E0
0475C908 0C4E8802 F7E9C850 E5880472 FA5E8E5F 5EF86688 FC462BFE 468806EB  Š..F±+F=.f%^_.^*r..]]üô%..N..èu. 000100
00603017 74C00B1F 071E0000 11499A50 16F4468D 51521E53 0856C51E EEE8C188  .èŠY.éV.S.RQ.F¶.P.|.......ât.=m. 000120
40160987 F68775C0 08F44688 C2E80020 8AC7E800 1C8ACC75 00098A00 01300074  t.*..¤..uøo..Šúo .Šô.F¶.äuñ-.\.ä 000140
88550442 E9008357 56EC8855 00A3E8C0 33001C8A A6E80275 1A3F8026 DA880A74  t..Ô&.?.u.Šîo..3äŠÉ.U.ŠVW*.Ô8.U. 000160
50E588C0 3302E800 01880574 40160987 F60C7C00 F883117D 16D71E38 065E88EC  &.^.;.m.)..«.|.-.\.ât.;..Š.3à.[] 000180
FC74E9C0 33057540 04CEA1C8 5152E388 057204D2 1E3B0872 0B2B0C88 5A5900C8  ù.YZ.É+Ar.;.Ø.r..DRQüÀo.äu.3äÔt* 0001A0
C0080000 FFFF9A52 16501653 C4885087 1609A780 D4885200 02880 4CE 2EFF5152  RQ..ö.É..R.á.]].ñP.áS.P.R......á 0001C0
C41EE319 040E885A D4794816 D98F0808 81067500 02300774 00013040 81127558  Xu.Ÿä=..t.=..u.Ÿ...\.KyÅZ....D.á 0001E0
```

Dump of file SATURN:[PCCOMMON.DUMP.DLL]ANALYST.TMP;1 on 18-APR-1990 10:36:43.91
File ID (511,16,0)    End of file block 53 / Allocated 56

Virtual block nu.ber 35 (00000023), 512 (0200) bytes

```
190E8E19 021EFF03 038BC28C 190A06C4 01AEE903 7319021E FFD833C2 8C190606  ....ô3U....s.ôÜ.á....ô£......ƒ.. 000000
FFFF9A12 E3680E01 6A087419 1230190E 880073E8 190E8F19 0E8E007C E8190E8F  ¢..ô|.ƒ..¢..ôs.j..*..t.j..hD.... 000020
8EEC8855 000012DE 9A006A00 6A036A00 51E81912 8F190E8E D88E0F5E 88C30000  ..Ûi¯..Áƒ..¢..ôa.j.j.j..B...U.&ƒ 000040
8E0023E8 19128F19 128EEC88 5503E800 31E81912 8F190E8E 003AE818 908F1890  ..¢..ô:.ƒ..¢..ô1.Š.U.&ƒ..¢..ô#.ƒ 000060
021EFF00 028807E3 19040E88 0000FFFF 9A500646 8A50C033 001AE819 128F1912  ..¢..ô..3äP.F.P.........D.£..... 000080
FF28F628 56570000 14C800C3 EEEB1DFF F2740245 08058804 EF830E73 F738C319  .ü;%s..ÿ.....E.t·..ŠŸü.à...WV+-+. 0000A0
F876FF0C 6AF85689 F64689F2 5689F046 89C02800 98168800 F0E90375 00983639  96..u.ôÞ.....+ä.FÞ.V·.F-.V%j..v% 0000C0
F65EC400 8CE90376 7FFFFE81 461974C0 080AC483 13CA1624 9A04A268 1EF676FF  .v¬.hÁ..Š.ô..á..ât.F.±...v.ôV.á^- 0000E0
75003F80 26F65E88 F475003F 8026F646 FFF65EC4 0CE847EA 75003F80 26F646FF  .F-&.?.uôGŠ.á^-.F-&.?.u¶.^-&.?.u 000100
468902C4 83140F15 119A56EE 5689EC46 8904C483 130915CC 9A046A50 014580BA  ¤.E.Pj..ä.\..á..FŠ.VŸV.......á..F 000120
18E11689 180FA3EE 5688EC46 886674C2 08FC4688 6074EE46 08EC4688 FE5689FC  =.V±.FŠ.FŸtm.F=.ôtf.FŠ.VŸÉÔ...Å. 000140
5688FC46 88EC5EC4 2C74C008 0AC48311 2E16249A 04A2681E F076FFF2 76FF0C6A  j..v·.vÞ.hÁ..Š....á..ât,á^Š.F=.V 000160
C00A0788 26FC46FF FC5EC407 8A26F046 FFF05EC4 04EC4683 02578926 078926FE  ±&..&.W..FŠ.á^Þ.FÞ&..á^=.F=&...á 000180
028890C8 C95F5EA7 75003F80 26F05EC4 F475003F 8026F046 FFF05EC4 E8E80E74  t.Šôá^Þ.FÞ&.?.u¶á^Þ&.?.uI^_èü.¡. 0001A0
120F1600 160C0808 070A0C09 0C080C07 09060005 18040203 02021601 FA70E900  .ôp*............................ 0001C0
0A801606 09721C70 2060006C 08590057 00530052 02430041 02350212 12110010  ......S.A.C.R.S.W.Y.(.m p.r..... 0001E0
```

Dump of file SATURN:[PCCOMMON.DUMP.DLL]ANALYST.TMP;1 on 18-APR-1990 10:36:43.91
File ID (511,16,0)    End of file block 53 / Allocated 56

Virtual block number 36 (00000024), 512 (0200) bytes

```
E8C85DE5 8899FFFF 8816CE16 891605A3 16080000 080702CE 08A40084 09820A81  ......É.ö.m.....É(...ö.¡....[]üô 000000
F7E24343 1674073A 2E1875E4 0A002489 14648816 05A3C850 E58899FF FF880008  ..¡.....[]üÉ(.Éd.¿$..ôu..:.t.CCä% 000020
C4EC8855 00C316CE A3980147 8A2E4301 76CA3C04 728C3C43 0A76243C 0472133C  <.r.<$v.C<¥r.<ôv.C..G..Éo.ù.U.&á 000040
73FFF130 06468857 5602EC83 EC8855C8 50E58801 FE4F8026 0574C308 C08C065E  ^..á.ût.&.O±..[]üU.&.&.VW.F.=þ.s 000060
FF087500 78E80574 0018E815 750082E8 18F6A312 740025E8 08750018 F63E831E  ..>-..u.ô%.t.É-.ô..u.ô..t.ôx.u.. 000080
89FEE383 43065E88 0776065E 3900F088 C85DE588 5E5F02C4 83138A17 169A0676  v.......á. ^.[]üÉÞ.9^.v..^.C.D±. 0000A0
F81687C2 883874FF FA8308C4 83154518 C29A5002 80510E4F 8D50501E C033FE5E  ^±3á.PP.O.Õ¯.P.ô.É..á..*.tß.ô..% 0000C0
A3000A88 0C478948 480008A3 C033088E FE5E8800 08A30A8E 05740208 .. AA318  .É*..Øt..ôÉ...^±.Å3äÉ..HH.G.¡..É 0000E0
1E8E0833 064E88C0 8ED88CC3 1FD88C00 06A30000 05000AA3 01478000 02. 0000  ..É...G.É.....É...Å.û.Å.á.N.3Ü.. 000100
15F919C0 9A0676FF 006A0876 FF006A56 00000AC8 C3098EC1 8CD20801 9AE 18FA  *.ô...Ø.è.]ûà...Vj..v.j..v..á.*. 000120
468902C4 83161215 119A56F8 7688902F E899C028 0674FFFF C2F7FA56 89F84689  .F%.V*Kô..t.+á.Š/..V%V......á..F 000140
FE568BFC 46889007 E808C483 15711978 9A50FE76 FF006A56 1274000B FE5689FC  =.V±.Ât.Vj..v±P.x.q..á.Š...F=.V± 000160
FE88C803 D9F7AEF2 C033F788 067EC4D9 8827E30E 4E881E56 57EC8855 90CBC95E  ^èü.U.ŠWV..N.D'.\á-..%3ä·Ü%\.ù.± 000180
00C85DE5 885F5E1F C18801F7 49490474 0477FF45 3A26C933 FF448AA6 F30A76C5  év.µ].D.3è&:E.w.t.]]%].è.^_.[]ù. 0001A0
800A79D2 080E750A F9831374 C00A93FC 071E570A 7EC51E08 56880646 880E4E88  .N..F..V..é-.W..=..ât..*.u..Øy.¯ 0001C0
0276393C 30040387 92F1F793 F1F70274 C0080233 92F788DA F7000283 DBF7AA2D  -¯%Ü.Ø.%Ô.%.3Ø.ât.%þ.%þ..Æ.0<9v. 0001E0
```

```
Dump of file SATURN:[PCCOMMON.DUMP.DLL]ANALYST.TMP;1 on 18-APR-1990 10:36:43.91
File ID (511,16,0)   End of file block 53 / Allocated 56

Virtual block number 37 (00000025), 512 (0200) bytes

 885E5F1F 58DA8CF2 72C73801 448DFF44 880586AC 4F0588E2 75C308C2 88AA2704 .'^.ô.ùuã..O¨...D..D.;úr·.ÖX._^. 000000
 0E74830A 47F626FA 5EC41CEB F62BFC5E 8CFA4689 04D48856 000006C8 00C850E5 ¦)ù.à...V¡å..F*.^•+-Š.á^*&-G..t. 000020
 C6880876 FA463916 C4168816 C2A10CFA 46834601 744004C4 8315DE19 F49A5306 .S.¶.8..á.ät.F.F*.Àõ...á.9F*vÄ.6 000040
 3F8318EC 8857S6EC 8855C85D E58801FE 4F800474 D808065E 88EC8855 90C8C95E ^èù.U.š.^..Ut..O±..Ì]ùU.ŠVWEŠ..? 000060
 000104C7 9618EEA3 18ECA3FE 244024E8 99C03305 750176E8 00058807 1E297500 .u)..¡..Õv.u.3à.Š$@$±Eš.ÈY..ú... 000080
 410000E9 C85DE588 5E5F0009 E8C08ED8 8C064E88 18F23689 FFFEFE44 C704C683 .ô.ùD±±..6·..N..Ä.âÖ.._^.Ì]ùÕÅ.A 0000A0
 A8ADF003 D0881573 C1384843 7401A8FE 88ADFC02 7788F273 EEF983FE E180FA74 t*.Ä±.*Ÿs·.w.•Ü.±´.tCH;ès..Å.ÞÙ´ 0000C0
 0305E805 8948C128 FE4C89F9 030C74FE 88E6E8FE 4489F788 000205C2 03357401 .t5.ô....%.D±Š¦.±t..*.L±+èH..Š.. 0000E0
 FE300218 FE06C626 C3027F89 18FA1E8C 26057401 3812E489 DA8CC688 FE4CFEF9 *±L±.6.Õ¿ô.;¦t.&..*....ú&6.±..=± 000100
 0205C203 E27401A8 ADF00300 888C73C1 3848FE88 F27401A8 ADF003FE 882574FF .t%.±.ÞÙ´.t´.±H;ès¥.Å.ÞÙ´.tã.ô.. 000120
 3817A98F D88C1274 18FE0EFE 2615E808 8E0474C0 08084788 E6E8FE44 89F78800 ..%.D±Š¦.G..àt..ÅŠ.&±.±.t..Äe`.; 000140
 005FE898 40400124 0074C638 0068E8C0 33067788 88E83788 18F61E8E 260574C7 út.&..-..7ŠE.w.3àÒk.;ót.$.ãã.Ò_. 000160
 47890788 18FAA326 0474C138 17FD8908 8C98E84E 4E960574 001DE8FE 4DFE0074 t.±M±Ò..t..NNŠ..Ä¿».;èt.ÆÈ*....G 000180
 F575EAD1 047618FC 1638267F FFBA4141 49C82803 7401A8FE 458851C3 99C03302 .3à.ùQ.E±´.t.+à¦AAn..&;.•.v.îõu% 0001A0
 52C359C0 33E575EA D1D2F708 75000CE8 C628C223 D2F70072 C2031572 C603C188 .è.ór..ôr.%@#ò+6Ò..u.%@îõu¦3àYùR 0001C0
 5A5958FE 55894AD7 28068806 7789FFFE FE44C7F2 03F088FE 88571874 001DE851 Òõ..t.W.±.Þ.·ùD±±..W..ø+øJ.U±XYZ 0001E0

Dump of file SATURN:[PCCOMMON.DUMP.DLL]ANALYST.TMP;1 on 18-APR-1990 10:36:43.91
File ID (511,16,0)   End of file block 53 / Allocated 56

Virtual block number 33 (00000026), 512 (0200) bytes

 0802745B 5A1FFFFA 8308C483 16E518C2 9A1F0650 00018850 52521E02 335ι 3C3 ùSP3@.RRP¡..P...ô.Ì..á..*..Z[t.. 000000
 E8277200 57E80775 48064688 08568800 A08F3875 000A7E83 065756EC 8855ι.02 @ùW.ŠVW..~..uB¢...V..F.Hu.ÒW.r'Š 000020
 04A0FE81 04C68334 735E003E E8560E46 89024488 0074F738 11744804 A036884C L.6..Ht.;%t..D..F.VÒ>.^s4.6..±.. 000040
 E675C085 F958D000 FFFF9A50 C0335016 52C48850 21E899FF FF880675 D2080473 s..@u.¡...ŠIP.áR.P3àP.....[*.àu¦ 000060
 C6830C74 024C39F7 880E4E88 C85DE588 5E5F07C0 33038804 A0368902 5C891489 ...\..6...Æ3á._^.Ì]ù.N..%9L.t..6 000080
 51531373 009A1E39 0675F738 C18ED388 26721C03 DA882CEB F9F27504 A0FE8104 ..±..u·*Š,.Ö..rÆ.Æ.ê;%u.9...s.SQ 0000A0
 38E30C4E 88EC8855 00C3D188 04879200 9A168904 75F738DE 75C08500 00FFFF9A ......àuß;%u.........îù.U.Š.N.D8 0000C0
 13ABF3E9 D1E08A0A 4688D128 D1870103 03230818 D1280C74 DAF7D788 067EC457 Wá~..ø%Öt.+Ì.ÙWÆ.Ì.Ì+Ì.F..ÅìÕµ¨. 0000E0
 C8500856 88064688 5FAAF3C9 13ABF3E9 D1C38EFF FFC381C3 8C10E301 87AAF3C9 èµ^.ÌD..ù.ù...ùìÕµ¨.èµ¨_.F...V.]ù 000100
 88C888E3 F70008CA 5DE588E3 F7064688 08750A5E 88D8080C 5E880846 88EC8855 U.Š.F..^..Ä.^.u..F.%D.Ì]ò..%D.à. 000120
 8A26065E C4F62856 000004C8 0008CA5D E5880103 E3F70646 88C8030C 66F70646 F.%f..à.F.%D.Ì.Ì]ò..à...V+-á^.&. 000140
 C887F606 D868F9F7 000C8999 04042DC3 88157508 0A47F626 5575023C 03240A47 G.$.<.ùU&-G..u..û-à..¿..%*kA.-.à 000160
 8A260677 FF260877 FF265028 7EC008FC 46890647 28260788 26065E88 39740110 ..t9.^.&..&+G..F•.à~(P&.w.&.w.&. 000180
 065EC4FF FFBE200A 4F802606 5EC40874 FC463808 C4831882 10869A50 E42A0847 G.*ðP...ÿ..á.;F•t.á^.&.O. ƒ..á^. 0001A0
 1A480002 000CC8C9 5EC68800 000447C7 26025789 26078926 08578826 06478826 &.G.&.W.&..&.W.&úG....6^èù....H. 0001C0
 19160103 00070003 12F80103 00050003 13300103 00000006 18320002 00000004 ......2.......0.......%......... 0001E0

Dump of file SATURN:[PCCOMMON.DUMP.DLL]ANALYST.TMP;1 on 18-APR-1990 10:36:43.91
File ID (511,16,0)   End of file block 53 / Allocated 56

Virtual block number 39 (00000027), 512 (0200) bytes

 127A0103 0366000E 11D20203 003A0003 10820103 00260003 19610103 00220003 .."...a...&...ý...:...@...f...z. 000000
 00000000 005C0003 0EAB0103 00580003 0EBE0103 00880003 19A80105 004D0003 ..M...¨......./...(...¨...\..... 000020
 6F432020 20797261 7262694C 20656069 542D6E75 5220534D 00000000 00000000 ........MS Run-Time Library - Co 000040
 70726F43 2074666F 736F7263 694D202C 38383931 20296328 20746867 69727970 pyright (c) 1988, Microsoft Corp 000060
 3A732500 5453594C 414E4120 6F742073 40502064 6E61204D 4420686E 694C0011 ..Link DM and PMs to ANALYST.%s: 000080
 00000020 203A7325 00200020 00200020 202E6425 00007473 796C616E 41002020   .Analyst..%d.  . . . .%s:  ... 0000A0
 13131890 18900000 00000000 2320202B 00296C6C 756E2800 296C6C75 6E280000 ..(null).(null).+- #........... 0000C0
 00000000 00000000 00000000 00000000 00000000 00000000 00000000 191A1890 ................................ 0000E0
 00000000 00000000 00000000 00000000 00000000 00000000 00000000 00000000 ................................ 000100
 00000000 00000000 00000000 00000000 00000000 00000000 00000000 00000000 ................................ 000120
 00000000 00000000 00000000 00000000 00000000 00000000 00000000 00000000 ................................ 000140
 00000000 00000000 00000000 00000000 00000000 00000000 00000000 00000000 ................................ 000160
 00000000 00000000 00000000 00000000 00000000 00000000 00000000 00000000 ................................ 000180
 00000000 00000000 00000000 00000000 00000000 00000000 00000000 00000000 ................................ 0001A0
 00000000 00000000 00000000 00000000 00000000 00000000 00000000 00000000 ................................ 0001C0
 00000000 00000000 00000000 00000000 00000000 00000000 00000000 00000000 ................................ 0001E0
```

```
Dump of file SATURN:[PCCOMMON.DUMP.DLL]ANALYST.TMP;1 on 18-APR-1990 10:36:43.91
File ID (511,16,0)   End of file block 53 / Allocated 56

Virtual block number 40 (00000028), 512 (0200) bytes

00000000 00000000 00000000 00000000 00000000 00000000 00000000 00000000 ................................ 000000
00000000 00000000 00000000 00000000 00000000 00000000 00000000 00000000 ................................ 000020
00000000 00000000 00000000 00000000 00000000 00000000 00000000 00000000 ................................ 000040
00000000 00000000 00000000 00000000 00000000 00000000 00000000 00000000 ................................ 000060
00000000 00000000 00000000 00000000 00000000 00000000 00000000 00000000 ................................ 000080
00000000 00000000 00000000 00000000 00000000 00000000 00000000 00000000 ................................ 0000A0
00000000 00000000 00000000 00000000 00000000 00000000 00000000 00000000 ................................ 0000C0
00000000 00000000 00000000 00000000 00000000 00000000 00000000 00000000 ................................ 0000E0
00000000 00000000 00000000 00000000 00000000 00000000 00000000 00000000 ................................ 000100
00000000 00000000 00000000 00000000 00000000 00000000 00000000 00000000 ................................ 000120
00000000 00000000 00000000 00000000 00000000 00000000 00000000 00000000 ................................ 000140
00000000 00000000 00000000 00000000 00000000 00000000 00000000 00000000 ................................ 000160
00000000 00000000 00000000 00000000 00000000 00000000 00000000 00000000 ................................ 000180
00000000 00000000 00000000 00000000 00000000 00000000 00000000 00000000 ................................ 0001A0
00000000 00000000 00000000 00000000 00000000 00000000 00000000 00000000 ................................ 0001C0
00000000 00000000 00000000 00000000 00000000 00000000 00000000 00000000 ................................ 0001E0

Dump of file SATURN:[PCCOMMON.DUMP.DLL]ANALYST.TMP;1 on 18-APR-1990 10:36:43.91
File ID (511,16,0)   End of file block 53 / Allocated 56

Virtual block number 41 (00000029), 512 (0200) bytes

00000000 00000000 00000000 00000000 00000000 00000000 00000000 00000000 ................................ 000000
00000000 00000000 00000000 00000000 00000000 00000000 00000000 00000000 ................................ 000020
00000000 00000000 00000000 00000000 00000000 00000000 00000000 00000000 ................................ 000040
00000000 00000000 00000000 00000000 00000000 00000000 00000000 00000000 ................................ 000060
00000000 00000000 00000000 00000000 00000000 00000000 00000000 00000000 ................................ 000080
00000000 00000000 00000000 00000000 00000000 00000000 00000000 00000000 ................................ 0000A0
00000000 00000000 00000000 00000000 00000000 00000000 00000000 00000000 ................................ 0000C0
04BA145E 04B6145E FFFF145E 00000000 00304F46 4E495F45 4C49465F 435F00A0 .._C_FILE_INFO=.....^...^.Ñ.^.¤. 0000E0
00011918 00000000 04DC0000 0200FFFF FFFF0101 00000000 04C2145E 04BE145E ^.7.*.ò..............É......... 000100
00000000 00000000 02020000 00000000 00000000 01020000 00000000 00000000 ................................ 000120
00000000 00000000 00000000 00000000 00000000 00000000 00000000 00000000 ................................ 000140
00000000 00000000 00000000 00000000 00000000 00000000 00000000 00000000 ................................ 000160
00000000 00000000 00000000 00000000 00000000 00000000 00000000 00000000 ................................ 000180
00000000 00000000 00000000 00000000 00000000 00000000 00000000 00000000 ................................ 0001A0
00000000 00000000 00000000 00000000 00000000 00000000 00000000 00000000 ................................ 0001C0
00000000 00000000 00000000 00000000 00000000 00000000 00000000 00000000 ................................ 0001E0

Dump of file SATURN:[PCCOMMON.DUMP.DLL]ANALYST.TMP;1 on 18-APR-1990 10:36:43.91
File ID (511,16,0)   End of file block 53 / Allocated 56

Virtual block number 42 (0000002A), 512 (0200) bytes

00000000 00000000 00000000 00000000 00000000 00000000 00000000 00000000 ................................ 000000
00000000 00000000 00000000 00000000 00000000 00000000 00000000 00000000 ................................ 000020
00000000 00000000 00000000 00000000 00000000 00000000 00000000 00000000 ................................ 000040
00000000 00000000 00000000 00000000 00000000 00000000 00000000 00000000 ................................ 000060
00000000 00000000 00000000 00000000 00000000 00000000 00000000 00000000 ................................ 000080
00000000 00000000 00000000 00000000 00000000 00000000 00000000 00000000 ................................ 0000A0
00000000 00000000 00000000 00000000 00000000 00000000 00000000 00000000 ................................ 0000C0
00000000 00000000 00000000 00000000 00000000 00000000 00000000 00000000 ................................ 0000E0
00000000 00000000 00000000 00000000 00000000 00000000 00000000 00000000 ................................ 000100
00000000 00000000 00000000 00000000 00000000 00000000 00000000 00000000 ................................ 000120
00000000 00000000 00000000 00000000 00000000 00000000 00000000 00000000 ................................ 000140
00000000 00000000 00000000 00000000 00000000 00000000 00000000 00000000 ................................ 000160
00000000 00000000 00000000 00000000 00000000 00000000 00000000 00000000 ................................ 000180
00000000 00000000 00000000 00000000 00000000 00000000 00000000 00000000 ................................ 0001A0
00000000 00000000 00000000 00000000 00000000 00000000 00000000 00000000 ................................ 0001C0
00000000 00000000 00000000 00000000 00000000 00000000 00000000 00000000 ................................ 0001E0
```

```
Dump of file SATURN:[PCCOMMON.DUMP.DLL]ANALYST.TMP;1 on 18-APR-1990 10:36:43.91
File ID (511,16,0)   End of file block 53 / Allocated 56

Virtual block number 43 (0000002B), 512 (0200) bytes

00000000 00000000 00000000 00000000 00000000 00000000 00000000 00000000 ................................ 000000
00000000 00000000 00000000 00000000 00000000 00000000 00000000 00000000 ................................ 000020
00000000 00000000 00000000 00000000 00000000 00000000 00000000 00000000 ................................ 000040
00000000 00000000 00000000 00000000 00000000 00000000 00000000 00000000 ................................ 000060
00000000 00000000 00000000 00000000 00000000 00000000 00000000 00000000 ................................ 000080
00000000 00000000 00000000 00000000 00000000 00000000 00000000 00000000 ................................ 0000A0
00000000 00000000 00000000 00000000 00000000 00000000 00000000 00000000 ................................ 0000C0
00000000 00000000 00000000 00000000 00000000 00000000 00000000 00000000 ................................ 0000E0
00000000 00000000 00000000 00000000 00000000 00000000 00000000 00000000 ................................ 000100
00000000 00000000 00000000 00000000 00000000 00000000 00000000 00000000 ................................ 000120
00000000 00000000 00000000 00000000 00000000 00000000 00000000 00000000 ................................ 000140
00000000 00000000 00000000 00000000 00000000 00000000 00000000 00000000 ................................ 000160
00000000 00000000 00000000 00000000 00000000 00000000 00000000 00000000 ................................ 000180
00000000 00000000 00000000 00000000 00000000 00000000 00000000 00000000 ................................ 0001A0
00000000 00000000 00000000 00000000 00000000 00000000 00000000 00000000 ................................ 0001C0
00000000 00000000 00000000 00000000 00000000 00000000 00000000 00000000 ................................ 0001E0

Dump of file SATURN:[PCCOMMON.DUMP.DLL]ANALYST.TMP;1 on 18-APR-1990 10:36:43.91
File ID (511,16,0)   End of file block 53 / Allocated 56

Virtual block number 44 (0000002C), 512 (0200) bytes

00000000 00000000 00000000 00000000 00000000 00000000 00000000 00000000 ................................ 000000
00000000 00000000 00000000 00000000 00000000 00000000 00000000 00000000 ................................ 000020
00000000 00000000 00000000 00000000 00000000 00000000 00000000 00000000 ................................ 000040
00000000 00000000 00000000 00000000 00000000 00000000 00000000 00000000 ................................ 000060
00000000 00000000 00000000 00000000 00000000 00000000 00000000 00000000 ................................ 000080
00000000 00000000 00000000 00000000 00000000 00000000 00000000 00000000 ................................ 0000A0
00000000 00000000 00000000 00000000 00000000 00000000 00000000 00000000 ................................ 0000C0
00000000 00000000 00000000 00000000 00000000 00000000 00000000 00000000 ................................ 0000E0
00000000 00000000 00000000 00000000 00000000 00000000 00000000 00000000 ................................ 000100
00000000 00000000 00000000 00000000 00000000 00000000 00000000 00000000 ................................ 000120
00000000 00000000 00000000 00000000 00000000 00000000 00000000 00000000 ................................ 000140
00000000 00000000 00000000 00000000 00000000 00000000 00000000 00000000 ................................ 000160
00000000 00000000 00000000 00000000 00000000 00000000 00000000 00000000 ................................ 000180
00000000 00000000 00000000 00000000 00000000 00000000 00000000 00000000 ................................ 0001A0
00000000 00000000 00000000 00000000 00000000 00000000 00000000 00000000 ................................ 0001C0
00000000 00000000 00000000 00000000 00000000 00000000 00000000 00000000 ................................ 0001E0

Dump of file SATURN:[PCCOMMON.DUMP.DLL]ANALYST.TMP;1 on 18-APR-1990 10:36:43.91
File ID (511,16,0)   End of file block 53 / Allocated 56

Virtual block number 45 (0000002D), 512 (0200) bytes

00000000 00000000 00000000 00000000 00000000 00000000 00000000 00000000 ................................ 000000
00000000 00000000 00000000 00000000 00000000 00000000 00000000 00000000 ................................ 000020
00000000 00000000 00000000 00000000 00000000 00000000 00000000 00000000 ................................ 000040
00000000 00000000 00000000 00000000 00000000 00000000 00000000 00000000 ................................ 000060
00000000 00000000 00000000 00000000 00000000 00000000 00000000 00000000 ................................ 000080
00000000 00000000 00000000 00000000 00000000 00000000 00000000 00000000 ................................ 0000A0
00000000 00000000 00000000 00000000 00000000 00000000 00000000 00000000 ................................ 0000C0
00000000 00000000 00000000 00000000 00000000 00000000 00000000 00000000 ................................ 0000E0
00000000 00000000 00000000 00000000 00000000 00000000 00000000 00000000 ................................ 000100
00000000 00000000 00000000 00000000 00000000 00000000 00000000 00000000 ................................ 000120
00000000 00000000 00000000 00000000 00000000 00000000 00000000 00000000 ................................ 000140
00000000 00000000 00000000 00000000 00000000 00000000 00000000 00000000 ................................ 000160
00000000 00000000 00000000 00000000 00000000 00000000 00000000 00000000 ................................ 000180
00000000 00000000 00000000 00000000 00000000 00000000 00000000 00000000 ................................ 0001A0
00000000 00000000 00000000 00000000 00000000 00000000 00000000 00000000 ................................ 0001C0
00000000 00000000 00000000 00000000 00000000 00000000 00000000 00000000 ................................ 0001E0
```

```
Dump of file SATURN:[PCCOMMON.DUMP.DLL]ANALYST.TMP;1 on 18-APR-1990 10:36:43.91
File ID (511,16,0)   End of file block 53 / Allocated 56

Virtual block number 46 (0000002E), 512 (0200) bytes

00000000 00000000 00000000 00000000 00000000 00000000 00000000 00000000 ................................ 000000
00000000 00000000 00000000 00000000 00000000 00000000 00000000 00000000 ................................ 000020
00000000 00000000 00000000 00000000 00000000 00000000 00000000 00000000 ................................ 000040
00000000 00000000 00000000 00000000 00000000 00000000 00000000 00000000 ................................ 000060
00000000 00000000 00000000 00000000 00000000 00000000 00000000 00000000 ................................ 000080
00000000 00000000 00000000 00000000 00000000 00000000 00000000 00000000 ................................ 0000A0
00000000 00000000 00000000 00000000 00000000 00000000 00000000 00000000 ................................ 0000C0
00000000 00000000 00000000 00000000 00000000 00000000 00000000 00000000 ................................ 0000E0
00000000 00000000 00000000 00000000 00000000 00000000 00000000 00000000 ................................ 000100
00000000 00000000 00000000 00000000 00000000 00000000 00000000 00000000 ................................ 000120
00000000 00000000 00000000 00000000 00000000 00000000 00000000 00000000 ................................ 000140
00000000 00000000 00000000 00000000 00000000 00000000 00000000 00000000 ................................ 000160
00000000 00000000 00000000 00000000 00000000 00000000 00000000 00000000 ................................ 000180
00000000 00000000 00000000 00000000 00000000 00000000 00000000 00000000 ................................ 0001A0
00000000 00000000 00000000 00000000 00000000 00000000 00000000 00000000 ................................ 0001C0
00000000 00000000 00000000 00000000 00000000 00000000 00000000 00000000 ................................ 0001E0

Dump of file SATURN:[PCCOMMON.DUMP.DLL]ANALYST.TMP;1 on 18-APR-1990 10:36:43.91
File ID (511,16,0)   End of file block 53 / Allocated 56

Virtual block number 47 (0000002F), 512 (0200) bytes

00000000 00000000 00000000 00000000 00000000 00000000 00000000 00000000 ................................ 000000
00000000 00000000 00000000 00000000 00000000 00000000 00000000 00000000 ................................ 000020
00000000 00000000 00000000 00000000 00000000 00000000 00000000 00000000 ................................ 000040
00000000 00000000 00000000 00000000 00000000 00000000 00000000 00000000 ................................ 000060
00000000 00000000 00000000 00000000 00000000 00000000 00000000 00000000 ................................ 000080
00000000 00000000 00000000 00000000 00000000 00000000 00000000 00000000 ................................ 0000A0
00000000 00000000 00000000 00000000 00000000 00000000 00000000 00000000 ................................ 0000C0
00000000 00000000 00000000 00000000 00000000 00000000 00000000 00000000 ................................ 0000E0
00000000 00000000 00000000 00000000 00000000 02000001 00000000 00000000 ................................ 000100
00000000 00000000 00000000 00000000 00000000 00000000 00000000 00000000 ................................ 000120
00000000 00000000 00000000 00000000 00000000 00000000 00000000 00000000 ................................ 000140
00000000 00000000 00000000 00000000 00000000 00000000 00000000 00000000 ................................ 000160
00000000 00000000 00000000 00000000 00000000 00000000 00000000 00000000 ................................ 000180
00000000 00000000 00000000 00000000 00000000 00000000 00000000 00000000 ................................ 0001A0
00000000 00000000 00000000 00000000 00000000 00000000 00000000 00000000 ................................ 0001C0
00000000 00000000 00000000 00000000 00000000 00000000 00000000 00000000 ................................ 0001E0

Dump of file SATURN:[PCCOMMON.DUMP.DLL]ANALYST.TMP;1 on 18-APR-1990 10:36:43.91
File ID (511,16,0)   End of file block 53 / Allocated 56

Virtual block number 48 (00000030), 512 (0200) bytes

00000000 00000000 00000000 00000000 00000000 00000000 00000000 00000000 ................................ 000000
00000000 00000000 00000000 00000000 00000000 00000000 00000000 00000000 ................................ 000020
00000000 00000000 00000000 00000000 00000000 00000000 00000000 00000000 ................................ 000040
00000000 00000000 00000000 00000000 00000000 00000000 00000000 00000000 ................................ 000060
00000000 00000000 00000000 00000000 00000000 00000000 00000000 00000000 ................................ 000080
00000000 00000000 00000000 00000000 00000000 00000000 00000000 00000000 ................................ 0000A0
00000000 00000000 00000000 00000000 00000000 00000000 00000000 00000000 ................................ 0000C0
00000000 00000000 00000000 00000000 00000000 00000000 00000000 00000000 ................................ 0000E0
00000000 00000000 00000000 00000000 00000000 00000000 00000000 00000000 ................................ 000100
00000000 00000000 00000000 00000000 00000000 00000000 00000000 00000000 ................................ 000120
00000000 00000000 00000000 00000000 00000000 00000000 00000000 00000000 ................................ 000140
00000000 00000000 00000000 00000000 00000000 00000000 00000000 00000000 ................................ 000160
00000000 00000000 00000000 00000000 00000000 00000000 00000000 00000000 ................................ 000180
00000000 00000000 00000000 00000000 00000000 00000000 00000000 00000000 ................................ 0001A0
00000000 00000000 00000000 00000000 00000000 00000000 00000000 00000000 ................................ 0001C0
00000000 00000000 00000000 00000000 00000000 00000000 00000000 00000000 ................................ 0001E0
```

```
Dump of file SATURN:[PCCOMMON.DUMP.DLL]ANALYST.TMP;1 on 18-APR-1990 10:36:43.91
File ID (511,16,0)   End of file block 53 / Allocated 56

Virtual block number 49 (00000031), 512 (0200) bytes

 00000000 00000000 00000000 00000000 00000000 00000000 00000000 00000000 ................................ 000000
 00000000 00000000 00000000 00000000 00000000 00000000 00000000 00000000 ................................ 000020
 00000000 00000000 00000000 00000000 00000000 00000000 00000000 00000000 ................................ 000040
 00000000 00000000 00000000 00000000 00000000 00000000 00000000 00000000 ................................ 000060
 00000000 00000000 00000000 00000000 00000000 00000000 00000000 00000000 ................................ 000080
 00000000 00000000 00000000 00000000 00000000 00000000 00000000 00000000 ................................ 0000A0
 00000000 00000000 00000000 00000000 00000000 00000000 00000000 00000000 ................................ 0000C0
 00000000 00000000 00000000 00000000 00000000 00000000 00000000 00000000 ................................ 0000E0
 00000000 00000000 00000000 00000000 00000000 00000000 00000000 00000000 ................................ 000100
 00000000 00000000 00000000 00000000 00000000 00000000 00000000 00000000 ................................ 000120
 00000000 00000000 00000000 00000000 00000000 00000000 00000000 00000000 ................................ 000140
 00000000 00000000 00000000 00000000 00000000 00000000 00000000 00000000 ................................ 000160
 00000000 00000000 00000000 00000000 00000000 00000000 00000000 00000000 ................................ 000180
 00000000 00000000 00000000 00000000 00000000 00000000 00000000 00000000 ................................ 0001A0
 00000000 00000000 00000000 00000000 00000000 00000000 00000000 00000000 ................................ 0001C0
 00000000 00000000 00000000 00000000 00000000 00000000 00000000 00000000 ................................ 0001E0

Dump of file SATURN:[PCCOMMON.DUMP.DLL]ANALYST.TMP;1 on 18-APR-1990 10:36:43.91
File ID (511,16,0)   End of file block 53 / Allocated 56

Virtual block number 50 (00000032), 512 (0200) bytes

 00000000 00000000 00000000 00000000 00000000 00000000 00000000 00000000 ................................ 000000
 00000000 00000000 00000000 00000000 00000000 00000000 00000000 00000000 ................................ 000020
 00000000 00000000 00000000 00000000 00000000 00000000 00000000 00000000 ................................ 000040
 00000000 00000000 00000000 00000000 00000000 00000000 00000000 00000000 ................................ 000060
 00000000 00000000 00000000 00000000 00000000 00000000 00000000 00000000 ................................ 000080
 00000000 00000000 00000000 00000000 00000000 00000000 00000000 00000000 ................................ 0000A0
 00000000 00000000 00000000 00000000 00000000 00000000 00000000 00000000 ................................ 0000C0
 00000000 00000000 00000000 00000000 00000000 00000000 00000000 00000000 ................................ 0000E0
 00000000 81818101 00000001 00000000 00000000 00000000 000000A2 108C0000 ..¥.Å........................... 000100
 00000000 00000000 00000000 00000000 00000000 00000000 00000000 00000000 ................................ 000120
 00000000 00000000 00000000 00000000 00000000 00000000 00000000 00000000 ................................ 000140
 00000000 00000000 00000000 00000000 00000000 00000000 00000000 00000000 ................................ 000160
 00000000 00000000 00000000 00000000 00000000 00000000 00000000 00000000 ................................ 000180
 00000000 00000000 00000000 00000000 00000000 00000000 00000000 00000000 ................................ 0001A0
 00000000 00000000 00000000 00000000 00000000 00000000 00000000 00000000 ................................ 0001C0
 00000000 00000000 00000000 00000000 00000000 00000000 00000000 00000000 ................................ 0001E0

Dump of file SATURN:[PCCOMMON.DUMP.DLL]ANALYST.TMP;1 on 18-APR-1990 `:36:43.91
File ID (511,16,0)   End of file block 53 / Allocated 56

Virtual block number 51 (00000033), 512 (0200) bytes

 0A0A0A0A 0A0A0A00 00000000 00000000 00000000 00000000 00000000 00000000 ................................ 000000
 0A0A0A0A 0A0A0A0A 0A0A0A0A 0A0A0A0A 0A0A0A0A 0A0A0A0A 0A0A0A0A 0A0A0A0A ................................ 000020
 0A0A0A0A 0A0A0A0A 0A0A0A0A 0A0A0A0A 0A0A0A0A 0A0A0A0A 0A0A0A0A 0A0A0A0A ................................ 000040
 0A0A0A0A 0A0A0A0A 0A0A0A0A 0A0A0A0A 0A0A0A0A 0A0A0A0A 0A0A0A0A 0A0A0A0A ................................ 000060
 0A0A0A0A 0A0A0A0A 0A0A0A0A 0A0A0A0A 0A0A0A0A 0A0A0A0A 0A0A0A0A 0A0A0A0A ................................ 000080
 0A0A0A0A 0A0A0A0A 0A0A0A0A 0A0A0A0A 0A0A0A0A 0A0A0A0A 0A0A0A0A 0A0A0A0A ................................ 0000A0
 0A0A0A0A 0A0A0A0A 0A0A0A0A 0A0A0A0A 0A0A0A0A 0A0A0A0A 0A0A0A0A 0A0A0A0A ................................ 0000C0
 0A0A0A0A 0A0A0A0A 0A0A0A0A 0A0A0A0A 0A0A0A0A 0A0A0A0A 0A0A0A0A 0A0A0A0A ................................ 0000E0
 00000000 0000000A 0A0A0A0A 0A0A0A0A 0A0A0A0A 0A0A0A0A 0A0A0A0A 0A0A0A0A ................................ 000100
 00002000 00000000 00000000 00000000 00000000 00000000 00000000 00000000 .............................. .. 000120
 4D4E3C3C FFFF1916 19141912 FFFF04C6 16C40000 00000000 00000000 00000000 ..............Ä.Ö..........<<NM 000140
 000A0077 6F6C6672 65766F20 6B636174 7320200A 00303030 36520000 3E3E4753 SG>>..R6000..- stack overflow... 000160
 0A0D3020 79622065 64697669 64207265 6765746E 6920200A 00333030 36520003 ..R6003..- integer divide by 0.. 000180
 726F6620 65636170 73206867 756F6E65 20746F6E 20200A0D 38303036 52000800 ...R6008..- not enough space for 0001A0
 756F6E65 20746F6E 20200A0D 39303036 52000900 0A007374 6E656D75 67726120  arguments.....R6009..- not enou 0001C0
 000A0D00 FC000A0D 746E656D 6E6F7269 766E6520 726F6620 65636170 73206867 gh space for environment...=.... 0001E0
```

```
Dump of file SATURN:[PCCOMMON.DUMP.DLL]ANALYST.TMP;1 on 18-APR-1990 10:36:43.91
File ID (511,16,0)   End of file block 53 / Allocated 56

Virtual block number 52 (00000034), 512 (0200) bytes

6F6C6620 200A0032 30303652 00020020 726F7272 65206560 6974206E 757200FF ..run-time error ...R6002..· flo 000000
00020003 FFFFFF00 0A0D6465 64616F6C 20746F6E 20746E69 6F702067 6E697461 ating point not loaded.......... 000020
00000000 00000000 00000000 000616C4 00020000 000504D6 00020000 00041910 ........ø.......á............... 000040
FFFFFF00 00000001 00010040 00200000 000C0000 00200010 00100000 01204349 IC ....... ....... .@........... 000060
00000000 00000000 00000000 00000000 00000000 00000000 00000000 00000000 ................................ 000080
00000000 00F8FF01 00000000 00F8FF07 00000000 00000000 00000000 00000000 ..................½.......½..... 0000A0
00000000 00000000 00000000 00000000 00000000 00F81F00 00000000 00F87F00 ..½.......½..................... 0000C0
00000000 00000000 00000000 00000000 00000000 00000000 00000000 00000000 ................................ 0000E0
070000F0 070000E0 070000C0 FFFFFFFF FFFFFFFF FFFFFFFF FFFFFFFF FFFFFFFF ....................â...Â...Þ... 000100
070000FE 070000FE 070000F8 070000F8 070000E0 070000FE 070000FC 070000F8 ½...ª...±...Â...½...½...±...±... 000120
07F8FFFF 07F0FFFF 07E0FFFF 07C0FFFF 0700E0FF 0700E0FF 070080FF 070080FF .........Â...Â....â...Â...Þ...½. 000140
FFFFFFFF FFFFFFFF E7FFFFFF C7FFFFFF 87FFFFFF 07FFFFFF 07FEFFFF 07FCFFFF ..ª...±.............ú...Ó....... 000160
6C62616C 69617661 20746579 20746F4E 13000100 7473796C 616E4108 00010352 R....Analyst....Not yet availabl 000180
73657262 20646142 15006C6F 6F742067 6E696E65 706F2072 6F727245 13002165 el..Error opening tool..Bad bres 0001A0
6A626F20 64657463 656C6573 20726165 6C431700 4C4D4420 606F7266 20746C75 ult from DML..Clear selected obj 0001C0
6E656562 20736168 20732520 6C65646F 4D440047 4E494E52 41570800 73746365 ects..WARNING.DModel %s has been 0001E0

Dump of file SATURN:[PCCOMMON.DUMP.DLL]ANALYST.TMP;1 on 18-APR-1990 10:36:43.91
File ID (511,16,0)   End of file block 53 / Allocated 56

Virtual block number 53 (00000035), 512 (0200) bytes

756F7920 6F442020 2E646576 61732074 6F6E2064 6E612064 65696669 646F6020 modified and not saved.  Do you 000000
01000100 01000100 01000100 01003F65 756E6974 6E6F6320 6F742074 6E617720 want to continue?............... 000020
00000000 00000000 00000000 00000000 00000000 00000000 00000000 00000000 ................................ 000040
00000000 00000000 00000000 00000000 00000000 00000000 00000000 0..`0000 ................................ 000060
00000000 00000000 00000000 00000000 00000000 00000000 00000000 000.`000 ................................ 000080
00000000 00000000 00000000 00000000 00000000 00000000 00000000 0000.000 ................................ 0000A0
00000000 00000000 00000000 00000000 00000000 00000000 00000000 00000000 ................................ 0000C0
00000000 00000000 00000000 00000000 00000000 00000000 00000000 00000000 ................................ 0000E0
00000000 00000000 00000000 00000000 00000000 00000000 00000000 00000000 ................................ 000100
00000000 00000000 00000000 00000000 00000000 00000000 00000000 00000000 ................................ 000120
00000000 00000000 00000000 00000000 00000000 00000000 00000000 00000000 ................................ 000140
00000000 00000000 00000000 00000000 00000000 00000000 00000000 00000000 ................................ 000160
00000000 00000000 00000000 00000000 00000000 00000000 00000000 00000000 ................................ 000180
00000000 00000000 00000000 00000000 00000000 00000000 00000000 00000000 ................................ 0001A0
00000000 00000000 00000000 00000000 00000000 00000000 00000000 00000000 ................................ 0001C0
00000000 00000000 00000000 00000000 00000000 00000000 00000000 00000000 ................................ 0001E0
```

```
Dump of file SATURN:[PCCOMMON.DUMP.DLL]DAD.TMP;1 on 18-APR-1990 1u.`9:03.08
File ID (551,9,0)   End of file block 267 / Allocated 268

Virtual block number 1 (00000001), 512 (0200) bytes

 00000000 00000040 00000000 00000088 0000FFFF 00000004 000000E9 00F85A4D MZ%.Ô...........|.......a....... 000000
 00000080 00000000 00000000 00000000 00000000 00000000 00000000 00000000 ................................ 000020
 6F6E6E61 63206061 72676F72 70207369 685421CD 4C01B821 CD09B400 0E8A1F0E ..o..Ç.el|.LeIThis program canno 000040
 00000000 00000024 0A000D2E 65646F6D 20534F44 206E6920 6E757220 65622074 t be run in DOS mode....$....... 000060
 00100029 00000000 00000000 00000000 00108009 0690F39E 000A0F28 0505454E NE..(....µ...................)... 000080
 00000000 00000000 00010019 00040000 00000FB2 02200200 01EC0188 00400023 #.a...å... .ý.................... 0000A0
 24140F00 241403E3 051A0F00 051A0388 06680F00 06680315 1F440F00 1F4300FE ±.C...D...h...h.........D..$...$ 0000C0
 0E2E0F00 0E2E00E8 0EC60F00 0EC60CEE 02500F00 024F0CC1 641A0F00 641A0636 6..d...dè.O...P.Ÿ.6...6.Ò....... 0000E0
 1FC00F00 1FBF17C8 33820F00 33811479 4F4E0F00 4F4E0F65 08EA0F00 08EA0ED0 Å.ð...ð.e.NO..NOy..3...3à.e...Â. 000100
 1C100F21 1A6E1B7A 02020E21 00000000 19980F00 1998190A 000F0F00 000F1908 Å.......Ö...........!...z.n.!... 000120
 01201EF1 01201F88 01201EF1 01201FA9 01201EF1 01201F97 27381EF1 27381023 #.8'þ.8'.. .þ. . . .þ. .£. .þ. . 000140
 01201EF1 01202003 01201EF1 01201FF1 01201EF1 01201FDF 01201EF1 01201FCD ë. .þ. .Ô. .þ. .þ. .þ. ..  .þ. . 000160
 01201EF1 0120204B 01201EF1 01202039 01201EF1 01202027 01201EF1 01202015 .  .þ. .'  .þ. .9  .þ. .K  .þ. . 000180
 00C01EB1 00C02087 00D91EB1 00D92079 009A1EB1 009A206F 01201EF1 0120205D ]   .þ. .o ..Ÿ...y ].Ÿ.].. â.Ÿ.â. 0001A0
 022C1EB1 022C2089 00811EB1 008120AD 01601EB1 01602097 00311EB1 00312093 . 1.Ÿ.1.. '.Ÿ.'.U Ÿ.Ÿ.Ÿ.¿ ,.Ÿ.,. 0001C0
 00C71EB1 00C72123 01D71EB1 01D72105 00FE1EB1 00FE20F5 018C1EB1 018C200C É ..Ÿ...¾ ±.Ÿ.±..|■.Ÿ.■.#Iú.Ÿ.ú. 0001E0

Dump of file SATURN:[PCCOMMON.DUMP.DLL]DAD.TMP;1 on 18-APR-1990 10:40:03.08
File ID (551,9,0)   End of file block 267 / Allocated 268

Virtual block number 2 (00000002), 512 (0200) bytes

 032E0001 032D0001 032C0001 032B0001 032A0001 03840001 01B71EB1 01B72130 0Iñ.Ÿ.ñ.......*...+...,...-..... 000000
 038E0003 03350001 03340001 03330001 03320001 03310001 03300001 032F0001 ../...0...1...2...3...4...5..... 000020
 00040005 00030005 00020005 00010005 03920003 03910003 03900003 038F0003 ................................ 000040
 00000243 4F525044 4E574441 440A0000 44414403 03860004 00060005 00050005 .............DAD...DADWNDPROC... 000060
 0CF80CE1 0C8D0C7E 0C380A8E 0A3C05E1 03E4031C 0279023D 00320010 00070001 ......2.=.y...Ô.Å.<...8.-.§.Å.«. 000080
 45404E4F 4954504F 4C545500 4C545503 534C4C41 43534F44 084E4957 40500500 ..PMWIN.DOSCALLS.UTL.UTLOPTIONME 0000A0
 52495551 43414C4D 440D6C60 6403574F 444E4957 5245544E 45434C54 550F554E NU.UTLCENTERWINDOW.dml.DMLACQUIR 0000C0
 4D440A4E 5854574F 52524F42 4C4D440C 4E585454 52415453 4C4D4408 4D544845 ENTM.DMLSTARTTXN.DMLBORROWTXN.DM 0000E0
 4F4D5952 4555514C 4D44134C 45444F4D 45455246 4C4D440C 4E585450 4F54534C LSTOPTXN.DMLFREEMODEL.DMLQUERYMO 000100
 59524555 514C4044 00544E55 4F435952 4555514C 4D440045 4C444E41 484C4544 DELHANDLE.DMLQUERYCOUNT.DMLQUERY 000120
 4D440C4E 4C525952 4555514C 4D440844 4C454946 5445534C 4D440844 4C454946 FIELD.DMLSETFIELD.DMLQUERYRLN.DM 000140
 4552454C 504D4953 4C4D440F 4554414C 45524C4D 4409314E 4C525952 4555514C LQUERYRLN1.DMLRELATE.DMLSIMPLERE 000160
 414C4552 4E55454C 504D4953 4C4D4411 4554414C 45524E55 4C4D4408 4554414C LATE.DMLUNRELATE.DMLSIMPLEUNRELA 000180
 4C4D4409 44494C4D 44595245 55514C4D 44005453 494C4545 52464C4D 44084554 TE.DMLFREELIST.DMLQUERYDMLID.DML 0001A0
 4C4D440C 54584554 44414552 4C4D4408 4554454C 45444C4D 44094554 41455243 CREATE.DMLDELETE.DMLREADTEXT.DML 0001C0
 4C4D4415 45474E41 48435458 454E5952 4555514C 4D441254 58455445 54495257 WRITETEXT.DMLQUERYNEXTCHANGE.DML 0001E0

Dump of file SATURN:[PCCOMMON.DUMP.DLL]DAD.TMP;1 on 18-APR-1990 10:40:03.08
File ID (551,9,0)   End of file block 267 / Allocated 268

Virtual block number 3 (00000003), 512 (0200) bytes

 45544952 57595245 55514C4D 4418 4F46 4E494547 4E414843 54455359 52455551 QUERYSETCHANGEINFO.DMLQUERYWRITE 000000
 41484345 54414C45 52595245 55514C4D 44184F46 4E494547 4E414843 54584554 TEXTCHANGEINFO.DMLQUERYRELATECHA 000020
 4E494547 4E414843 4554414C 45524E55 59524555 514C4D44 1A4F464E 4945474E NGEINFO.DMLQUERYUNRELATECHANGEIN 000040
 4F544345 4C45534C 4D440F4B 4341424C 4C4F524E 5854504F 54534C4D 44124F46 FO.DMLSTOPTXNROLLBACK.DMLSELECTO 000060
 4C45534C 4D441345 54415453 5443454C 45535952 4555514C 4D441354 43454A42 BJECT.DMLQUERYSELECTSTATE.DMLSEL 000080
 4C455344 4552454/ 524F5952 4555514C 4D441954 4E554F43 59524555 51544345 ECTQUERYCOUNT.DMLQUERYORDEREDSEL 0000A0
 45400354 53494C5  43454C45 534C4C41 59524555 514C4D44 15545349 4C544345 ECTLIST.DMLQUERYALLSELECTLIST.ME 0000C0
 4D005041 4548594F 52545345 444D454D 0E504145 48455441 45524340 454D0D4D M.MEMCREATEHEAP.MEMDESTROYHEAP.M 0000E0
 54470849 5447034B 434F4C42 45455246 4D45400C 4B434F4C 42434F4C 4C414D45 EMALLOCBLOCK.MEMFREEBLOCK.GTI.GT 000100
 54534F50 4954470A 434F5250 4C4F4F54 46454449 54470E4C 4F4F544C 4C494B49 IKILLTOOL.GTIDEFTOOLPROC.GTIPOST 000120
 4F444E49 574C4F4F 54595245 55514954 47124753 4D444E45 53495447 0A47534D MSG.GTISENDMSG.GTIQUERYTOOLWINDO 000140
 4F444E49 57595245 55514954 4712574F 444E4957 4C4F4F54 54455349 54471057 W.GTISETTOOLWINDOW.GTIQUERYWINDO 000160
 41544553 49544710 52545041 54414458 55415952 45555149 5447124C 4F4F5457 WTOOL.GTIQUERYAUXDATAPTR.GTISETA 000180
 54554403 544E4552 41504C4F 4F545952 45555149 54471252 54504154 41445855 UXDATAPTR.GTIQUERYTOOLPARENT.DUT 0001A0
 43455341 454C4552 4741424C 54551352 4F535255 4354494E 49474142 4C545510 .UTLBAGINITCURSOR.UTLBAGRELEASEC 0001C0
 5145534C 54550A52 4F535255 43455441 52455449 4741424C 54551352 4F535255 URSOR.UTLBAGITERATECURSOR.UTLSEQ 0001E0
```

```
Dump of file SATURN:[PCCOMMON.DUMP.DLL]DAD.TMP;1 on 18-APR-1990 10:40:03.08
File ID (551,9,0)    End of file block 267 / Allocated 268

Virtual block number 4 (00000004), 512 (0200) bytes

550E4854 474E454C 5145534C 54550C45 4B414D4E 55514553 4C54550C 454B414D MAKE.UTLSEQUNMAKE.UTLSEQLENGTH.U 000000
534C5455 0C4C4554 53524946 5145534C 5455004C 4545564F 4D455251 45534C54 TLSEQREMOVEEL.UTLSEQFIRSTEL.UTLS 000020
5954504D 45514553 4C545508 4C45504F 50514553 4C545508 4C454853 55505145 EQPUSHEL.UTLSEQPOPEL.UTLSEQEMPTY 000040
5A535054 55440A59 504F435A 53505455 440A594F 52545345 445A5350 54554400 .DUTPSZDESTROY.DUTPSZCOPY.DUTPSZ 000060
4F525453 45445450 5048530C 45544145 52435450 50485308 50485303 455A4953 SIZE.SHP.SHPPTCREATE.SHPPTDESTRO 000080
5048530C 594F5254 53454458 4F425048 53004554 41455243 584F4250 48530C59 Y.SHPBOXCREATE.SHPBOXDESTROY.SHP 0000A0
52494350 48531045 54414552 43454C43 52494350 48530F52 45544E45 43584F42 BOXCENTER.SHPCIRCLECREATE.SHPCIR 0000C0
12524554 4E454359 52455551 454C4352 49435048 5314594F 52545345 44454C43 CLEDESTROY.SHPCIRCLEQUERYCENTER. 0000E0
43544553 454C4352 49435048 53125355 49444152 54455345 4C435249 43504853 SHPCIRCLESETRADIUS.SHPCIRCLESETC 000100
53454450 4F524454 5048530F 45544145 5243504F 52445450 48530E52 45544E45 ENTER.SHPTDROPCREATE.SHPTDROPDES 000120
504F5244 54504853 0F545054 52415453 54455350 4F524454 50485312 594F5254 TROY.SHPTDROPSETSTARTPT.SHPTDROP 000140
52445450 48531053 55494441 52544553 504F5244 54504853 11455341 42544553 SETBASE.SHPTDROPSETRADIUS.SHPTDR 000160
44545048 53135453 554A5445 53504F52 44545048 530F454C 474E4154 4553504F OPSETANGLE.SHPTDROPSETJUST.SHPTD 000180
53135254 54415445 53504F52 44545048 530F5453 49444D49 52545445 53504F52 ROPSETTRIMDIST.SHPTDROPSETATTR.S 0001A0
45544145 52434254 58545048 53004D49 44574F52 52415445 53504F52 44545048 HPTDROPSETARROWDIM.SHPTXTBCREATE 0001C0
45545845 59524555 51425458 54504853 12594F52 54534544 42545854 5048530E .SHPTXTBDESTROY.SHPTXTBQUERYEXTE 0001E0

Dump of file SATURN:[PCCOMMON.DUMP.DLL]DAD.TMP;1 on 18-APR-1990 10:40:03.08
File ID (551,9,0)    End of file block 267 / Allocated 268

Virtual block number 5 (00000005), 512 (0200) bytes

53425458 54504853 .2584F42 444E554F 42595245 55514254 58545048 5314544E NT.SHPTXTBQUERYBOUNDBOX.SHPTXTBS 000000
54504853 0E544847 49454854 45534254 58545048 5310584F 42444E55 4F425445 ETBOUNDBOX.SHPTXTBSETHEIGHT.SHPT 000020
48531345 43414654 4E4F4654 45534254 58545048 53125453 554A5445 53425458 XTBSETJUST.SHPTXTBSETFONTFACE.SH 000040
45545942 54455342 54585450 48530F45 4C595453 544E4F46 54455342 54585450 PTXTBSETFONTSTYLE.SHPTXTBSETBYTE 000060
0E45444F 4D434F53 53415445 53445242 0F455441 45524344 52420944 52420353 S.BRD.BRDCREATE.BRDSETASSOCMODE. 000080
41525453 4E4F4345 43524F46 4E454452 4215544E 45545845 59524555 51445242 BRDQUERYEXTENT.BRDENFORCECONSTRA 0000A0
4554454C 45444145 52414452 42004554 41455243 41455241 4452420D 53544E49 INTS.BRDAREACREATE.BRDAREADELETE 0000C0
4212544E 45545845 54455341 45524144 52421043 4F535341 41455241 4452420C .BRDAREAASSOC.BRDAREASETEXTENT.B 0000E0
53555952 45555141 45524144 52421454 4E455458 45595245 55514145 52414452 RDAREAQUERYEXTENT.BRDAREAQUERYUS 000100
4E4F4344 5242004F 464E4952 45535554 45534145 52414452 42124F46 4E495245 ERINFO.BRDAREASETUSERINFO.BRDCON 000120
5445534E 4E4F4344 52420045 54454C45 444E4E4F 43445242 00455441 4552434E NCREATE.BRDCONNDELETE.BRDCONNSET 000140
45534E4E 4F434452 4215544E 45545845 59524555 514E4E4F 43445242 12404944 DIM.BRDCONNQUERYEXTENT.BRDCONNSE 000160
52420045 44495359 52455551 4E4E4F43 44524210 53554944 41524553 554F4054 THOUSERADIUS.BRDCONNQUERYSIDE.BR 000180
42145450 524F4843 4E415445 534E4E4F 43445242 12435241 5445534E 4E4F4344 DCONNSETARC.BRDCONNSETANCHORPT.B 0001A0
53555445 534E4E4F 43445242 12545052 4F48434E 41595245 55514E4E 4F434452 RDCONNQUERYANCHORPT.BRDCONNSETUS 0001C0
52445242 0E4F464E 49524553 55595245 55514E4E 4F434452 42144F46 4E495245 ERINFO.BRDCONNQUERYUSERINFO.BRDR 0001E0

Dump of file SATURN:[PCCOMMON.DUMP.DLL]DAD.TMP;1 on 18-APR-1990 10:40:03.08
File ID (551,9,0)    End of file block 267 / Allocated 268

Virtual block number 6 (00000006), 512 (0200) bytes

554F5244 52420045 54454C45 44455455 4F524452 420E4554 41455243 4554554F OUTECREATE.BRDROUTEDELETE.BRDROU 000000
52445242 154F464E 49524553 55544553 4554554F 52445242 13434F53 53414554 TEASSOC.BRDROUTESETUSERINFO.BRDR 000020
43595245 55514554 554F5244 5242124F 464E4952 45535559 52455551 4554554F OUTEQUERYUSERINFO.BRDROUTEQUERYC 000040
44444145 54554F52 4452420D 54505952 45555145 54554F52 4452420F 544E554F OUNT.BRDROUTEQUERYPT.BRDROUTEADD 000060
4D455245 54554F52 44524210 54504543 414C5045 52455455 4F524452 42115450 PT.BRDROUTEREPLACEPT.BRDROUTEREM 000080
45534554 554F5244 52420F52 54544154 45534554 554F5244 52420F54 5045564F OVEPT.BRDROUTESETATTR.BRDROUTESE 0000A0
554F5244 5242154D 4944574F 52524154 45534554 554F5244 5242134D 49525454 TTRIM.BRDROUTESETARROWDIM.BRDROU 0000C0
54584559 52455551 4554554F 52445242 13404944 444E4F4D 41494454 45534554 TESETDIAMONDDIM.BRDROUTEQUERYEXT 0000E0
4F524452 41455444 52421145 54414552 43544847 49415254 53445242 11544E45 ENT.BRDSTRAIGHTCREATE.BRDTEARDRO 000100
41455444 52421045 54454C45 44504F52 44524145 54445242 11455441 45.`4350 PCREATE.BRDTEARDROPDELETE.BRDTEA 000120
4E455458 45595245 5551504F 52445241 45544452 4216434F 53534150 4F5. 452 RDROPASSOC.BRDTEARDROPQUERYEXTEN 000140
52414554 44524218 4F464E49 52455355 54455350 4F524452 41455444 52421:54 T.BRDTEARDROPSETUSERINFO.BRDTEAR 000160
45544145 52434C45 42414C44 52420E4F 464E4952 45535559 52455551 504F5244 DROPQUERYUSERINFO.BRDLABELCREATE 000180
52421143 4F535341 4C454241 4C445242 00455445 4C45444C 4542414C 4452420E .BRDLABELDELETE.BRDLABELASSOC.BR 0001A0
54584559 52455551 4C454241 4C445242 13544E45 54584554 45534C45 42414C44 DLABELSETEXTENT.BRDLABELQUERYEXT 0001C0
4C454241 4C445242 154F464E 49524553 55544553 4C454241 4C445242 13544E45 ENT.BRDLABELSETUSERINFO.BRDLABEL 0001E0
```

```
Dump of file SAI ?N:[PCCOMMON.DUMP.DLL]DAD.TMP;1 on 18-APR-1990 10:40:03.08
File ID (551,9,0)   End of file block 267 / Allocated 268

Virtual block number 7 (00000007), 512 (0200) bytes

 11524544 524F4843 52414553 54455344 5242114F 464E4952 45535559 52455551 QUERYUSERINFO.BRDSETSEARCHORDER. 000000
 53544345 4A424F44 4E494644 52421654 50544154 43454A42 4F444E49 46445242 BRDFINDOBJECTATPT.BRDFINDOBJECTS 000020
 4E494644 52421u54 58454E59 52455551 444E4946 44524210 4E4F4947 45524E49 INREGION.BRDFINDQUERYNEXT.BRDFIN 000040
 554F5259 42524145 4E454E49 4D524554 45444452 4217444E 454E4F49 47455244 DREGIONEND.BRDDETERMINENEARBYROU 000060
 47414552 41544553 4452420E 4554554F 52425553 54524553 4E494452 42114554 TE.BRDINSERTSUBROUTE.BRDSETAREAG 000080
 524F5454 5050414E 53445242 14444952 47455455 4F525445 53445242 0F444952 RID.BRDSETROUTEGRID.BRDSNAPPTTOR 0000A0
 444F4D03 44495247 41455241 4F545450 50414E53 44524213 44495247 4554554F OUTEGRID.BRDSNAPPTTOAREAGRID.MOD 0000C0
 4F4D4D47 44084853 55504544 4F4D4D47 44084554 41455243 45444F4D 4D47440D .DGMMODECREATE.DGMMODEPUSH.DGMMO 0000E0
 4D4D4744 1254434E 55464553 554F4D54 45534544 4F4D4D47 44144C4C 55504544 DEPULL.DGMMODESETMOUSEFUNCT.DGMM 000100
 4D47440A 45544145 52434D47 44094D47 44035443 4E554659 45485445 5345444F ODESETKEYFUNCT.DGM.DGMCREATE.DGM 000120
 4645524D 47440A53 45444F4D 52455355 5241454C 434D4744 11594F52 54534544 DESTROY.DGMCLEARUSERMODES.DGMREF 000140
 41524741 4944574; 52444D47 440E584F 42485345 52464552 4D47440D 48534552 RESH.DGMREFRESHBOX.DGMDRAWDIAGRA 000160
 44004554 554C4F53 4241404F 4F5A4D47 440F4D4F 4F5A5055 5445534D 47440C4D M.DGMSETUPZOOM.DGMZOOMABSOLUTE.D 000180
 47440A58 4F425449 464D4744 09544946 4D474406 4E46544E 49415054 45534D47 GMSETPAINTFN.DGMFIT.DGMFITBOX.DG 0001A0
 45545741 52444D47 440F454C 43524943 57415244 4D47440D 584F4257 4152444D MDRAWBOX.DGMDRAWCIRCLE.DGMDRAWTE 0001C0
 454E4E4F 43574152 444D4744 10455455 4F525741 52444D47 440C504F 52445241 ARDROP.DGMDRAWROUTE.DGMDRAWCONNE 0001E0

Dump of file SATURN:[PCCOMMON.DUMP.DLL]DAD.TMP;1 on 18-APR-1990 10:40:03.08
File ID (551,9,0)   End of file block 267 / Allocated 268

Virtual block number 8 (00000008), 512 (0200) bytes

 52544D47 440E474E 49525453 4445444F 4C505845 57415244 4D474415 524F5443 CTOR.DGMDRAWEXPLODEDSTRING.DGMTR 000000
 45534D47 44094F46 4E495245 53555952 4555514D 47441054 504D524F 46534E41 ANSFORMPT.DGMQUERYUSERINFO.DGMSE 000020
 440E4F46 4E495245 53555445 53404744 0E54494E 55544553 4D47440A 4E455054 TPEN.DGMSETUNIT.DGMSETUSERINFO.D 000040
 41485950 4F434452 41485952 4555514D 47441652 54504553 554F4D54 45534D47 GMSETMOUSEPTR.DGMQUERYHARDCOPYHA 000060
 4D474413 444E554F 42444952 4759504F 43445241 48544553 4D474417 454C444E MDLE.DGMSETHARDCOPYGRIDBOUND.DGM 000080
 44455458 45544853 494E4946 4D474411 59414C50 53494454 58455459 52455551 QUERYTEXTDISPLAY.DGMFINISHTEXTED 0000A0
 53434814 53434803 54494445 4B434F4C 42545845 54545241 54534D47 44155449 IT.DGMSTARTTEXTBLOCKEDIT.HCS.HCS 0000C0
 59414C45 47415054 534F5053 43481152 45544E49 52504547 4E414843 54534F50 POSTCHANGEPRINTER.HCSPOSTPAGELAY 0000E0
 64034D41 52474149 44544E49 52505343 480F4449 52475445 53534348 0A54554F OUT.HCSSETGRID.HCSPRINTDIAGRAM.d 000100
 52434D41 44155945 48595241 4D495250 4E494445 53555445 53504D41 44176061 am.DAMPSETUSEDINPRIMARYKEY.DAMCR 000120
 4450064A 424F4554 454C4544 4D41440C 50494853 4E4F4954 414C4552 45544145 EATERELATIONSHIP.DAMDELETEOBJ.PD 000140
 43414C50 544E4554 45474D44 500E5841 4D544553 50544547 4D445000 4241544D MTAB.PDMGETPSETMAX.PDMGETENTPLAC 000160
 084F4953 03455441 45524359 5449544E 45484354 41421174 726F6873 61640745 E.dashort.BATCHENTITYCREATE.SIO. 000180
 64452060 61726761 69442041 44110000 1E080304 3F030102 45544952 57534F44 DOSWRITE...?.......DA Diagram Ed 0001A0
 00000000 00000000 00000000 0001434F 52504C4F 4F544441 44080000 726F7469 itor...DADTOOLPROC.............. 0001C0
 4689FE46 890000B8 0000FEB2 86C70000 FEA286C7 D88EFFFF 881E5657 000166C8 àf..WV.¡...Aú.Â±..ú.ý±..¡...F±.F 0001E0

Dump of file SATURN:[PCCOMMON.DUMP.DLL]DAD.TMP;1 on 18-APR-1990 10:40:03.08
File ID (551,9,0)   End of file block 267 / Allocated 268

Virtual block number 9 (00000009), 512 (0200) bytes

 0088FEAE 8689FEB0 86890000 8B944689 96468900 00889846 899A4689 0000BbFC «¡...F..F.¡...F..F.¡....¯±..Û±¡. 000000
 FEB2868D 026A0000 FEA886C7 FEA48689 FEA68689 000088FE 9A8689FE 9C868900 ....±...±¡....Í±..Ê±ú.´±..¡...ý± 000020
 46803F6A 326AFEB2 86FF0326 E90003E9 03750000 30FEA286 890000FF FF9A5016 .P.......Â±=..u.Ö..Ö&..Ñý±j2j?.F 000040
 8926FEB2 8688FC5E C40305E9 0003E903 75000030 FEA28689 00000108 9A5016FC «.P.Ä......Â±=..u.Ö..Ö..á^«..ý±&. 000060
 26000088 FC5EC404 47892606 47892600 0088FC5E C4024789 260A4688 FC5EC407 .á^«.F.&.G.á^«¡..&.G.&.G.á^«¡..& 000080
 26354789 26000088 FC5EC42F 47892631 47892600 0088FC5E C4284789 26204789 .G-&.G+á^«¡..&.G1&.G/á^«¡..&.G5& 0000A0
 FC77FF26 FE77FF26 065EC404 06468338 4789263D 47892600 0088FC5E C4334789 .G3á^«¡..&.G=&.G;.F..á^.&.w±&.w« 0000C0
 00FFFF9A FC76FFFE 76FF0A76 FF08C483 FFFF0010 9A505200 0A05FE56 88FC4688 .F«.V±...RP.......á..v..v±.v«.... 0000E0
 FF9A5052 000805FE 5688FC46 880A76FF 026CE900 03E90375 00003DFE A2868900 ...Â±=..u.Ö..Öl..v..F«.V±...RP... 000100
 52003705 FE5688FC 4688FE82 B6FF024A E90003E9 03750000 30FEA286 890000FF .....Â±=..u.Ö..ÖJ..Ñý±.F«.V±.7.R 000120
 FE5688FC 46880A76 FF016A02 27E90003 E9037500 0030FEA2 86890000 FFFF9A50 P.......Â±=..u.Ö..Ö'.j...v..F«.V± 000140
 03E90375 00003DFE A2868900 00FFFF9A 50520020 05FE5688 FC468850 52000A05 ...RP.F«.V±.+.RP.......Â±=..u.Ö. 000160
 0030FEA2 86890000 FFFF9A50 16FE9A86 8D2B77FF 262077FF 26FC5EC4 01F8E900 .Ö%.á^«&.w-&.w+....±.P.......Â±=. 000180
 FEA28689 0000FFFF 9A501698 46800136 68326AFE 8286FF01 03E90003 E9037500 .u.Ö..Ö€..Ñý±j2h6..F..P........Â± 0001A0
 4688FC5E C4025789 26078926 FE5688FC 4688985E C401B1E9 0003E903 75000030 =..u.Ö..ÖÝ.á^..F«.V±&..&.W.á^«.F 0001C0
 26868D6E 6A076A02 0036FF26 1980068E 006A006A 30578926 38478926 9A568898 ..V.&.G;&.W=j.j.....&.6..j.jn..& 0001E0
```

```
Dump of file SATURN:[PCCOMMON.DUMP.DLL]DAD.TMP;1 on 18-APR-1990 10:40:03.08
File ID (551,9,0)   End of file block 267 / Allocated 268

Virtual block number 10 (0000000A), 512 (0200) bytes

 9C46802F 6AFE9A76 FFFE9CB6 FF2B77FF 262D77FF 26FC5EC4 0000FFFF 9A5016FF ..P.....á^=&.w-&.w+.Ñ.±.Ñ.±j/.F. 000000
 16FF2686 8050169C 46800146 E90003E9 03750000 3DFEA286 890000FF FF9A5016 .P.......Å±=..u.Õ..ÕF..F..P..&.. 000020
 0E00109A 5016E846 80004A68 1E10C483 027F0088 9A5016FE B8868000 42681E50 P.hB...¡±.P......á..hJ..FÒ.P.... 000040
 006A006A 0000FEAC 86C750FB FEAA86C7 0000FEA0 86C70801 FE9E86C7 08C48301 ..á.ú..±..ú..±..ú.¯±«Pú.¯±..j.j. 000060
 FFFEA086 FF016A00 6A0000FF FF9A046A 046A0200 68FFFF68 FFFF6850 16E84680 .FÒ.Ph..h..h..j.j......j.j..Ñ.±. 000080
 36FF2619 80068E00 6A200068 5016FE88 86805016 E8468050 16FEAA86 8DFE9E86 Ñ.±..¯±.P.FÒ.P..¡±.Ph. j.....&.6 0000A0
 14E90374 96460894 46889656 89944689 0000FFFF 9A5016FE AE868D03 84680200 ..h....Û±.P......F..V..F..F.t.Õ. 0000C0
 FF9A9476 FF9676FF 0A76FF00 87E9FEB6 9689FEB4 86890000 FFFF9A00 6A006A00 .j.j........Ç±..Ñ±Õ...v..v..v... 0000E0
 478926FE 80968BFE AE868BFC 5EC4006A E90003E9 03750000 3DFEA286 890000FF .....Å±=..u.Õ..Õj.á^=..Û±..¯±&.G 000100
 00003DFE A286890A C483FFFF 02FB9AFC 76FFFE76 FF286A00 6A006A06 57892604 .&.W.j.j.j(.v±.v=.«....á...Å±=.. 000120
 FF9676FF FE9AB6FF FE^CB6FF FC76FFFE 76FF0001 FEA886C7 0034E900 03E90375 u.Õ..Õ4.ú.´±...v±.v=.Ñ.±.Ñ.±.v.. 000140
 FEA88E83 0000E900 03E90375 00003DFE A28689FF FF00009A 5016FEA4 86^D9476 v...Ê±.P.......Å±=..u.Õ..Õ.../´± 000160
 7500FEA2 8E83FEA2 86890000 FFFF9A28 77FF262D 77FF26FC 5EC40014 E9U. 500 .u.Õ..á^=&.w-&.w+.......Å±./Å±.u 000180
 E903750A 470B2608 478B26FE A49EC400 22E90375 FEA6860B FEA4868B 0060. 03 .Õm...Ê±..Ì±u.Õ" á.Ê±&.G.&.G.u.Õ 0001A0
 5EC40020 E90375FE 4608FC46 880000FF FF9A0877 FF260A77 FF26FEA4 9EC40u11 ..á.Ê±&:w.&.w.......F=.F±u.Õ .á^ 0001C0
 8E830000 FFFF9A2B 77FF262D 77FF26FC 5EC40010 E903752D 47082628 478B26FC =&.G+&.G-u.Õ..á^=&.w-&.w+....../ 0001E0

Dump of file SATURN:[PCCOMMON.DUMP.DLL]DAD.TMP;1 on 18-APR-1990 10:40:03.08
File ID (551,9,0)   End of file block 267 / Allocated 268

Virtual block number 11 (0000000B), 512 (0200) bytes

 C80006CA C95F5E1F 0000E9FE A2868800 00FFFF9A FE8286FF 0009E903 7500FE82 ý±.u.Õ...Ñý±.......Å±Õ...^_èò..à 000000
 89D44689 000088F0 4689F246 89000088 00009A46 C7D88E00 08881E56 57000066 f..WV.¡...ÁúF...¡...F·.FÞ¡...Fà. 000020
 00880000 E846C700 008246C7 F44689F6 46890000 888E4689 C0468900 00880246 F0¡...Fâ.F/¡...F-.F¶úFý..úFÒ..¡. 000040
 89CC4689 000088C6 4689C846 89000088 F84689FA 46890000 88AC4689 AE468900 ..FÛ.F¯¡...F°.F½¡...Fà.Fó¡...Fä. 000060
 EE46C7D6 46890846 89000088 88468B9A 46890000 88844689 86468900 0088CA46 Fò¡...FÑ.FÇ¡...Fo.F¡¡...FÅ.F=úF¥ 000080
 89E64689 000088CE 46890046 89000088 0000DA46 C7EA4689 EC468900 00880000 ..¡...F£.FõúFÖ..¡...FÅ.Fö¡...F¦. 0000A0
 4688C246 89C44689 00008800 028046C7 00008C46 C7FC4689 FE468900 008BE446 Fò¡...F±.F=úF¥..úF¯..¡...Fá.Fó.F 0000C0
 E0E99A46 889A4689 02A60000 9A0A76FF 0C76FF10 76FF18F7 E9000088 1896E90E .Õ..¡..Õ¼..v..v..v....¦..F..F.ÕÁ 0000E0
 FF18C2E9 9A468800 06E90375 0000309A 46890000 FFFF9A50 16F04680 1076FF18 ..v..FÞ.P......F.=..u.Õ...F.Õò.. 000100
 D476FF18 A4E99A46 880006E9 03750000 309A4689 0000FFFF 9A501602 46801076 v..F0.P......F.=..u.Õ...F.ÕÊ..vå 000120
 FFC076FF 50520033 05F2568B F04688C0 5689BE46 890000FF FF9A8008 68D276FF .v0h........Ff.Vâ.FÞ.V·.3.RP.vâ. 000140
 0768006A 1DAF6810 76FF186B E99A4688 9A46890A C483FFFF 00009A10 76FFBE76 vf.v.......á..F..F.Õk..v.h£.j.h. 000160
 9A468900 0006119A 5016F046 8D1076FF 1851E900 00880000 FFFF9A01 6A006A02 .j.j......¡..ÕQ..v..FÞ.P......F. 000180
 C4262F5F C426F05E C40011E9 03750008 7E831833 E99A4688 0006E903 75000030 =..u.Õ...F.Õ3..-..u.Õ..á^Þ&á_/&á 0001A0
 E99A4688 9A468906 C483FFFF 00009A10 76FF0A76 FF0C76FF 00010647 C7260C5F _.&úG....v..v..v.......á..F.¯F.Õ 0001C0
 0006E903 75000030 9A468900 0006F89A 5016F046 8D1076FF 17F9E900 008817FF ¯.¡..Õ°..v..FÞ.P.½....F.=..u.Õ.. 0001E0

Dump of file SATURN:[PCCOMMON.DUMP.DLL]DAD.TMP;1 on 18-APR-1990 10:40:03.08
File ID (551,9,0)   End of file block 267 / Allocated 268

Virtual block number 12 (0000000C), 512 (0200) bytes

 00003D9A 46890AC4 83068E02 FB9AF076 FFF276FF 4A6A006A 006A17DB E99A4688 .F.ÕU.j.j.jJ.v·.vÞ.«./..á..F.=.. 000000
 26845EC4 8656898A 46893157 88262F47 8826F05E C41786E9 9A468800 06E90375 u.Õ...F.ÕÑ.á^Þ&.G/&.W1.FÇ.VÑá^Ç& 000020
 2A9AB476 FF8676FF 000EE903 74009A7E 839A4689 FFFF0000 9A0877FF 260A77FF .w.&.w.......F..~..t.Õ...vÑ.vÇ.* 000040
 845EC49A 4689038B 048A9AB4 76FF8676 FF000EE9 0374009A 7E839A46 89069807 ....F..~..t.Õ...vÑ.vÇ.o....F.á^Ç 000060
 06E40000 9AB476FF 8676FF9A 76FF526A 9A468900 00FFFF9A 0877FF26 0A77FF26 &.w.&.w.......F.jR.v..vÑ.vÇ...ô. 000080
 76FF8676 FF9A76FF 506A9A46 89000003 829A2877 FF262D77 FF26F05E C408C483 .á.á^Þ&.w-&.w+.ÿ....F.jP.v..vÑ.v 0000A0
 309A4689 0000052A 9A5016F0 46801076 FF1712E9 00008808 C4830776 00009AB4 Ç...v..á.¡..Õ...v..FÞ.P.*....F.= 0000C0
 5EC48656 89844689 31578826 2F478826 F05EC416 F4E99A46 880006E9 03750000 ..u.Õ...F.Õ¶.á^Þ&.G/&.W1.FÇ.VÑá^ 0000E0
 4688E846 8908468B 00010447 C726065E C4D85689 D646890E 5788260C 47882684 Ç&.G.&.W..F0.VÁá^0&úG....F..FÒ.F 000100
 50168246 80F476FF F676FF28 77FF262D 77FF26F0 5EC4F656 89F44689 0C5688DA ..V..F¶.V-á^Þ&.w-&.w+.v-.v¶.Fý.P 000120
 03750000 3008C483 07F10000 9AB476FF 8676FF9A 76FF506A 9A468900 00FFFF9A ......F.jP.v..vÑ.vÇ...þ..á.=..u. 000140
 77FF26F0 5EC4F476 FFF676FF 5016AC46 80029AE9 82468816 78E99A46 880006E9 Õ...F.Õx..FýÕ...F¯.P.v-.v¶á^Þ&.w 000160
 5EC40065 E9037500 E87E8300 9BE90375 0000300C C483086C 00009A2F 77FF2631 1&.w/...l..á.=..u.Õ...-Õ.u.Õe.á^ 000180
 0000FFFF 9A50160C 46801477 FF261677 FF26AC5E C40058E9 03740030 7F8326AC ¯&..0.t.ÕX.á^¯&.w.&.w..FÊ.P..... 0001A0
 46880006 E9037500 003D08C4 83035400 009AB476 FF8676FF 9A76FF52 6A9A4689 .F.jR.v..vÑ.vÇ...T..á.=..u.Õ...F 0001C0
 9A46890C C4830848 030A9AD6 76FFD876 FFAC76FF AE76FF50 160C4680 15FDE99A .Õ»..FÉ.P.vÚ.v¯.vÁ.v0...H..á..F. 0001E0
```

```
Dump of file SATURN:[PCCOMMON.DUMP.DLL]DAD.TMP;1 on 18-APR-1990 10:40:03.08
File ID (551,9,0)   End of file block 267 / Allocated 268

Virtual block number 13 (0000000D), 512 (0200) bytes

 FFAC76FF AE76FF00 17E90375 00307F83 26AC5EC4 0024E903 7400E87E 830 ^DE9 Ô-..-Ô.t.Ô$.á^¯&..0.u.Ô...vÔ.v¯. 000000
 5EC4F476 FFF67^FF 5016F846 8D01F9E9 9A468908 C483089E 06A89AD6 76FFL876 vÄ.vø.´....á..F.Ô'..F½.P.v-.v¶á^ 000020
 E9037500 E87E8300 50E90375 0000300C C48308F2 009C9A2F 77FF2631 77FF26F0 ÞB.w1&.w/...´..á.=..u.Ô]..-Ô.u.Ô 000040
 08CE0428 9AD676FF 0876FFF8 76FFFA76 FF001AE9 03740027 7F8326F8 5EC40027 '.á^½&..'.t.Ô...v'.v½.vÄ.vø.(.ö. 000060
 FF0017E9 03750027 7F8326F8 5EC40024 E9037400 E87E8300 20E99A46 8908C483 .á..F.Ô-..-Ô.t.Ô$.á^½&..'.u.Ô... 000080
 76FF5016 C6468001 73E99A46 8908C483 09240784 9AD676FF 0876FFF8 76FFFA76 v'.v½.vÄ.vø...$..á..F.Ôs..Fö.P.v 0000A0
 83005DE9 03750000 3D0CC483 FFFF0138 9A2F77FF 263177FF 26F05EC4 F476FFF6 -.v¶á^Þ&.w1&.w/.8....á.=..u.Ô].. 0000C0
 76FFD876 FFC676FF C876FF00 1AE90374 00247F83 26C65EC4 0027E903 7500E87E -Ô.u.Ô'.á^6&..$.t.Ô...vå.vö.vÄ.v 0000E0
 00247F83 26C65EC4 0024E903 7400E87E 83002DE9 9A468908 C483FFFF 04E09AD6 ø.Å....á..F.Ô-..-Ô.t.Ô$.á^6&..$. 000100
 8D00EDE9 9A468908 C48309E8 083C9AD6 76FFD876 FFC676FF C876FF00 17E90375 u.Ô...vå.vö.vÄ.vø.<.Ô..á..F.ÔÜ.. 000120
 0000300C C48307A8 01049A2F 77FF2631 77FF26F0 5EC4F476 FFF676FF 5016CA46 Fò.P.v-.v¶á^Þ&.w1&.w/.Å.´..á.=.. 000140
 FF26CA5E C40058E9 03740046 7F8326CA 5EC40065 E9037500 E87E8300 98E90375 u.Ô...-Ô.u.Ôe.á^ò&..F.t.ÔX.á^ò&. 000160
 009AB476 FFB676FF 9A76FF52 6A9A4689 000007DC 9A5016DC 468D2C77 FF262E77 w.&.w,.FÉ.P.É....F.jR.v..vÑ.vÇ.. 000180
 FFCA76FF CC76FF50 16DC468D 142DE99A 46880006 E9037500 003D08C4 8308E000 .Ü..á.=..u.Ô...F.Ô-..FÉ.P.vë.vò. 0001A0
 26CA5EC4 0024E903 7400E87E 83002DE9 9A46890C C4830A18 05989AD6 76FFD876 vÄ.vø......á..F.Ô-..-Ô.t.Ô$.á^ò& 0001C0
 9A468908 C4830818 08F49AD6 76FFD876 FFCA76FF CC76FF00 17E90375 00467F83 ..F.u.Ô...vë.vò.vÄ.vø.¶....á..F. 0001E0

Dump of file SATURN:[PCCOMMON.DUMP.DLL]DAD.TMP;1 on 18-APR-1990 10:40:03.08
File ID (551,9,0)   End of file block 267 / Allocated 268

Virtual block number 14 (0000000E), 512 (0200) bytes

 98E90375 00043DFE 1AE90375 00033DFD 5EE90375 00023D00 23E90026 E90029E9 Ô).Ô&.Ô#.=..u.Ô^»=..u.Ô.±=..u.Ô. 000000
 00880A5E C413A6E9 9A468800 000447C7 26D65EC4 FFD7E9FF 16E90375 00123DFE ±=..u.Ô..Ôm.á^ø&üG....F.Ôl.á^.¡. 000020
 468D1076 FF1386E9 00008807 89260247 89260000 B8065EC4 07892602 47892600 .&.G.&..á^.¡..&.G.&..¡..Ô...v..F 000040
 0877FF26 F05EC413 68E99A46 880006E9 03750000 3D9A4689 00000ADD 9A5016F0 Þ.P.Ì....F.=..u.Ô...F.Ôh.á^Þ&.w. 000060
 880006E9 03750000 3D9A4689 0000FFFF 9A0676FF 0876FF0A 76FF0C76 FF0E76FF .v..v..v..v..v.......F.=..u.Ô... 000080
 00082D9A 5016F046 8D1076FF 004AE903 7500067E 831336E9 00008813 3CE99A46 F.Ô<.¡..Ô6..-..u.ÔJ..v..FÞ.P.-.. 0000A0
 9910468B 10AE6808 77FF26F0 5EC4130F E99A468B 0006E903 75000030 9A468900 ..F.=..u.Ô...F.Ô..á^Þ&.w.hÙ..F.. 0000C0
 008812E3 E99A468B 0006E903 75000030 9A468900 0005A69A 0676FF08 76FF5052 RP.v..v..Ì....F.=..u.Ô...F.ÔD.¡. 0000E0
 E99A468B 0006E903 75000030 9A468900 0005B99A 5016F046 8D1076FF 120DE900 .Ôì..v..FÞ.P.¿....F.=..u.Ô...F.Ô 000100
 46890E57 88260C47 8826845E C4865689 84468931 5788262F 478826F0 5EC412BF ¢.á^Þ&.G/&.W1.FÇ.VÑá^Ç&.G.&.W..F 000120
 76FFBA76 FFEE4689 0A46888A 56898846 890A5788 26084788 26845EC4 D8568906 ø.VÄá^Ç&.G.&.W..F¡.Vn.F..FŸ.vn.v 000140
 E9037408 46080646 88126AE9 9A468800 06E90375 0000309A 4689066A 00009A88 ¡...j..F.=..u.Ô...F.Ôj..F..F.t.Ô 000160
 00309A46 8900000C 679A5016 D2468D10 76FF0F5E E9EE4688 1259E900 00880006 ..¡..ÔY..FÝÔ^..v..Fø.P.g....F.=. 000180
 6A9A4689 0000FFFF 9A5016CE 46808876 FF8A76FF 1235E99A 46880006 E9037500 .u.Ô...F.Ô5..vn.v¡.Fo.P......F.j 0001A0
 1201E99A 46880006 E9037500 003D08C4 830C3200 009AB476 FFB676FF 9A76FF52 R.v..vÑ.vÇ...2..á.=..u.Ô...F.Ô.. 0001C0
 00FFFF9A CE76FF00 76FFB876 FFBA76FF 006A006A FFFF68FF FF68D276 FFD476FF .vå.vøh..h..j.j..vn.v¡.vÄ.vö.... 0001E0

Dump of file SATURN:[PCCOMMON.DUMP.DLL]DAD.TMP;1 on 18-APR-1990 10:40:03.08
File ID (551,9,0)   End of file block 267 / Allocated 268

Virtual block number 15 (0000000F), 512 (0200) bytes

 880006E9 03750000 3D08C483 06350000 9AB476FF B676FF9A 76FF526A 9A468900 ..F.jR.v..vÑ.vÇ...5..á.=..u.Ô... 000000
 76FF0C47 8926065E C4D8F7C0 18010C7F 8326065E C41186E9 00008811 8CE99A46 F.Ô¥.¡..ÔÑ.á^ø&.....á¼Äá^ø&.G..v 000020
 FFBA76FF 1185E99A 46880006 E9037500 003D9A46 89000005 489A5016 D2468D10 ..Fø.P.H....F.=..u.Ô...F.Ô...vn. 000040
 830CD900 009AB476 FFB676FF 9A76FF52 6A9A4689 00000068 9A5016CE 468D8876 v¡.Fö.P.k....F.jR.v..vÑ.vÇ...l.. 000060
 26065EC4 CE76FFD0 76FFD276 FFD476FF 1151E99A 46880006 E9037500 003D08C4 á.=..u.Ô...F.ÔQ..vå.vø.vÄ.vöá^ø& 000080
 003D08C4 830D2800 009AB476 FFB676FF 9A76FF52 6A9A4689 0000FFFF 9A0C77FF .w.......F.jR.v..vÑ.vÇ...(..á.=. 0000A0
 5EC4D8F7 C01B010E 7F8326D6 5EC4110F E9000088 1115E99A 46880006 E9037500 .u.Ô...F.Ô..¡..Ô..á^ø&.....á¼Äá^ 0000C0
 FF9A76FF 526A9A46 890000FF FF9A0E77 FF26D65E C48876FF BA76FF0E 47892606 ø&.G..vn.v¡á^ø&.w.......F.jR.v.. 0000E0
 C0E90000 8810C6E9 9A468800 06E90375 00003D08 C4830D80 00009AB4 76FFB676 vÑ.vÇ......á.=..u.Ô...F.Ô6.¡..Ôä 000100
 FF10A2E9 9A4688^^ 06E90375 0000309A 46890000 00079A50 16D2468D 1076FF10 ..v..Fø.P.ø....F.=..u.Ô...F.ÔÅ.. 000120
 00009AB4 76FFB6  FF9A76FF 526A9A46 89000000 F89A5016 CE468D88 76FFBA76 vn.v¡.Fö.P.½....F.jR.v..vÑ.vÇ... 000140
 9ACE76FF D076FFD2 76FFD476 FF106EE9 9A468800 06E90375 00003D08 C48300B5 ç..á.=..u.Ô...F.Ôn..vå.vø.vÄ.vö. 000160
 E9037500 003D08C4 830E0000 009AB476 FFB676FF 9A76FF52 6A9A4689 0000FFFF .....F.jR.v..vÑ.vÇ......á.=..u.Ô 000180
 00309A46 89000008 879A5016 D2468D10 76FF1033 E9000088 1039E99A 46880006 ...F.Ô9.¡..Ô3..v..Fø.P.ñ....F.=. 0001A0
 6A9A4689 000008D8 9A5016CE 468D8876 FFBA76FF 1015E99A 46880006 E9037500 .u.Ô...F.Ô...vn.v¡.Fö.P.Ä....F.j 0001C0
 0FE1E99A 46880006 E9037500 003D08C4 830E4200 009AB476 FFB676FF 9A76FF52 R.v..vÑ.vÇ...B..á.=..u.Ô...F.ÔÄ. 0001E0
```

```
Dump of file SATURN:[PCCOMMON.DUMP.DLL]DAD.TMP;1 on 18-APR-1990 10:4 :03.08
File ID (551,9,0)   End of file block 267 / Allocated 268

Virtual block number 16 (00000010), 512 (0200) bytes

 9AB476FF B676FF9A 76FF526A 9A468900 00FFFF9A CE76FFD0 76FFD276 FFD476FF .vÅ.v@.vÅ.vö......F.jR.v..vÑ.vÇ. 000000
 FF26F05E C40FA6E9 0000B80F ACE99A46 B80006E9 03750000 3008C483 0E8E0000 .....á.=..u.Õ...F.Õ¯.¡..Õ!.á^Þ&. 000020
 9A468900 000FC49A 5016EA46 80186A04 77FF2606 77FF2684 5EC42B77 FF262D77 w-&.w+á^Ç&.w.&.w.j..Fõ.P.á....F. 000040
 60E99A46 B80006E9 03750000 3008C483 0ECD0000 9AB476FF B676FF9A 76FF506A jP.v..vÑ.vÇ...ë..á.=..u.Õ...F.Õ' 000060
 006A0F43 E90000B8 0006E903 7202EA7E 830009E9 037D0014 E9037E00 EC7E830F ..-&.~.Õ..}.Õ...~õ.r.Õ..¡..ÕC.j. 000080
 9A468B00 06E90375 0000309A 46890AC4 830F2E02 FB9AF076 FFF276FF 296A006A j.j).v·.vÞ.«....á..F.=..u.Õ...F. 0000A0
 76FFEE76 FF00000F 839A5052 00000F7C 9A006A03 6A016A00 6A016A00 6A0F1EE9 Õ..j.j.j.j.j.j..|...RP......vŸ.v 0000C0
 68B476FF B676FF50 169C468D 50160A46 8D9A4689 06C4830F 201F5F9A B476FFB6 Ñ.vÇ._. ..á..F..FÕ.P.F..P.vÑ.vÇh 0000E0
 76FFB676 FF9A76FF 526A9A46 8914C483 0F4404A7 9AB876FF BA76FFFF FF68FFFF ..h..¯vo.v¡.Ï.D..á..F.jR.v..vÑ.v 000100
 76FF506A 9A468900 0006CF9A 2B77FF26 2D77FF26 F05EC408 C4830F6A 00009AB4 Ç...j..á.á^Þ&.w-&.w+.ü....F.jP.v 000120
 0000FFFF 9A006A01 6A016A00 6A016A00 6A08C483 0FD90000 9AB476FF B676FF9A ..vÑ.vÇ...\..á.j.j.j.j.j.j...... 000140
 0000FFFF 9A50169C 4680B876 FFBA76FF 0010E903 75000A7E 830000FF FF9A5052 RP......~Õ.u.Õ...vo.v¡.F..P..... 000160
 4680186A 0477FF26 0677FF26 B45EC42B 77FF262D 77FF26F0 5EC40E5B E90000B8 ¡..Õ[.á^Þ&.w-&.w+á^Ç&.w.&.w.j..F 000180
 003D08C4 8309C100 009AB476 FFB676FF 9A76FF50 6A9A4689 0000FFFF 9A5016EA õ.P......F.jP.v..vÑ.vÇ...ê..á.=. 0001A0
 6A006A0E 04E90000 B80006E9 0374EC46 0BEA4688 0E15E99A 46880006 E9037500 .u.Õ...F.Õ...Fõ.F$t.Õ..¡..Õ..j.j 0001C0
 E99A4688 0006E903 7500003D 9A46890A C483106A 02FB9AF0 76FFF276 FF2A6A00 .j*.v·.vÞ.«.j..á..F.=..u.Õ...F.Õ 0001E0

Dump of file SATURN:[PCCOMMON.DUMP.DLL]DAD.TMP;1 on 18-APR-1990 10:40:03.08
File ID (551,9,0)   End of file block 267 / Allocated 268

Virtual block number 17 (00000011), 512 (0200) bytes

 B476FFB6 76FF0000 108F9A50 52000010 B89A006A 036A016A 006A016A 006A00DF Õ.j.j.j.j.j.j..¡...RP.¢....vÑ.vÇ 000000
 23680F07 68B476FF B676FF50 169C4680 50160A46 8D9A4689 04C48310 5C1ECE9A .ö.\..á..F..FÕ.P.F..P.vÑ.vÇh..h# 000020
 00009AB4 76FFB676 FF9A76FF 526A9A46 8914C483 108004A7 9AB876FF BA76FF0F ..vo.v¡.Ï....á..F.jR.v..vÑ.vÇ... 000040
 B676FF9A 76FF506A 9A468900 000F559A 2B77FF26 2D77FF26 F05EC408 C48310A6 Ï..á.á^Þ&.w-&.w+.U....F.jP.v..vÑ 000060
 F79A5052 00000EF0 9A006A01 6A016A00 6A016A00 6A08C483 11000000 9AB476FF .vÇ......á.j.j.j.j.j.j..Þ...RP.% 000080
 E90000B8 00000F9C 9A50169C 468DB876 FFBA76FF 0010E903 75000A7E 8300000E ....~Õ.u.Õ...vo.v¡.F..P.....¡..Õ 0000A0
 00009AB4 76FFB676 FF9A76FF 526A9A46 89000011 149A016A B876FFBA 76FF001F ...vo.v¡j.......F.jR.v..vÑ.vÇ... 0000C0
 9A76FF52 6A9A4689 0000113D 9A036AB8 76FFBA76 FF0CF6E9 9A468808 C4831129 )..á..F.Õ-..vo.v¡j..=....F.jR.v. 0000E0
 0011669A 056A8876 FFBA76FF 0CCDE99A 468808C4 83115200 009AB476 FFB676FF .vÑ.vÇ...R..á..F.Õë..vo.v¡j..f.. 000100
 BA76FF0C A4E99A46 8808C483 117B0000 9AB476FF B676FF9A 76FF526A 9A468900 ..F.jR.v..vÑ.vÇ...(..á..F.ÕE..vo 000120
 08C48311 A400009A B476FFB6 76FF9A76 FF526A9A 46890000 118F9A07 6AB876FF .v¡j.......F.jR.v..vÑ.vÇ...Ê..á. 000140
 76FFB676 FF9A76FF 526A9A46 89000011 B89A096A B876FFBA 76FF0C7B E99A4688 .F.Õ(..vo.v¡j..¡....F.jR.v..vÑ.v 000160
 6A9A4689 000011E1 9A0B6AB8 76FFBA76 FF0C52E9 9A468808 C48311CD 00009AB4 Ç...e..á..F.ÕR..vo.v¡j..Å....F.j 000180
 006AB876 FFBA76FF 0C29E99A 468808C4 8311F600 009AB476 FFB676FF 9A76FF52 R.v..vÑ.vÇ...-..á..F.Õ)..vo.v¡j. 0001A0
 00E99A46 8808C483 121F0000 9AB476FF B676FF9A 76FF526A 9A468900 00120A9A ......F.jR.v..vÑ.vÇ......á..F.Õ. 0001C0
 4600009A B476FFB6 76FF9A76 FF526A9A 46890000 FFFF9A0E 6AB876FF BA76FF0C ..vo.v¡j.......F.jR.v..vÑ.vÇ...F 0001E0

Dump of file SATURN:[PCCOMMON.DUMP.DLL]DAD.TMP;1 on 18-APR-1990 10:40:03.08
File ID (551,9,0)   End of file block 267 / Allocated 268

Virtual block number 18 (00000012), 512 (0200) bytes

 B676FF9A 76FF526A 9A468900 0006A99A B876FFBA 76FF0B07 E99A4688 08C48312 ..á..F.Õ©..vo.v¡.¨....F.jR.v..vÑ 000000
 01259AF0 76FFF276 FF0A6A00 6A006A0B B0E99A46 8808C483 12600000 9AB476FF .vÇ...'..á..F.Õ¯.j.j.j..v·.vÞ.%. 000020
 76FF1047 89260065E C408F7C0 1B01107F 8326065E C40B96E9 0000B80A C48312A4 É..á.¡..Õ..á^ø&.....ÕXÁá^ø&.G..v 000040
 76FFF276 FF0A6A00 6A006A0B 6CE90000 B80B72E9 0000B800 00FFFF9A B876FFBA o.v¡.....¡..Õr.¡..Õl.j.j.j..v·.v 000060
 06C48312 D500009> B476FFB6 76FFEE76 FF0B52E9 0000B80A C4830C9D 01259AF0 Þ.%....á.¡..ÕR..vŸ.vÑ.vÇ...f..á. 000080
 0B21E99A 46B89A4 B9FFFF04 D79AEE76 FFB476FF B676FF08 38E99A46 B89A4689 .F..F.ÕB..vÑ.vÇ.vŸ.■....F..F.Õ!. 0000A0
 EE76FFB4 76FFB676 FF0B0AE9 9A46889A 46891303 05769AEE 76FFB476 FFB676FF .vÑ.vÇ.vŸ.v....F..F.Õ...vÑ.vÇ.vŸ 0000C0
 B89A4689 133114F1 9AEE76FF B476FFB6 76FF0AF3 E99A4688 9A468913 1A00119A ......F..F.Õ¤..vÑ.vÇ.vŸ.þ.1..F.. 0000E0
 FFBA76FF 0AC5E99A 46889A46 8913A017 4F9AEE76 FFB476FF B676FF0A 0CE99A46 F.ÕÉ..vÑ.vÇ.vŸ.O....F..F.Õé..vo. 000100
 009AB476 FFB676FF 9A76FF52 6A9A4689 0000FFFF 9A501680 468D286A 006AB876 v¡j.j(.F¯.P......F.jR.v..vÑ.vÇ.. 000120
 6A006A00 17E90375 00807E83 0A8DE99A 46880006 E9037500 003D08C4 83138C00 ....á.=..u.Õ...F.Õ...-¯.u.Õ..¥.j 000140
 1A939AEE 76FFB476 FFB676FF 0011E90A C48313D5 01259AF0 76FFF276 FF436A00 .jC.v·.vÞ.%.f..á.Õ...vÑ.vÇ.vŸ... 000160
 9A5016FC 4680016A 006A2B77 FF262D77 FF26F05E C40A56E9 9A46889A 468912B8 É..F..F.ÕV.á^Þ&.w-&.w+j.j..F•.P. 000180
 E9037400 003D08C4 83144400 009AB476 FFB676FF 9A76FF50 6A9A4689 000014A6 Ï....F.jP.v..vÑ.vÇ...D..á.=..t.Õ 0001A0
 0277FF26 FC5EC450 16F8468D 0871E900 03E90374 02470826 078826FC 5EC4000F ..á^=&..&.G.t.Õ..Õq..F½.Pá^=&.w. 0001C0
 187F8326 F85EC400 75E90375 0000300C C48314F2 009C9AB4 76FFB676 FF37FF26 &.7.vÑ.vÇ...·..á.=..u.Õu.á^¥&... 0001E0
```

```
Dump of file SATURN:(PCCOMMON.DUMP.DLL)DAD.TMP;1 on 18-APR-1990 10:40:03.08
File ID (551,9,0)   End of file block 267 / Allocated 268

Virtual block number 19 (00000013), 512 (0200) bytes

 FF260277 FF26845E C43C6A0A 77FF260C 77FF260A 5FC426F8 5EC40068 E9037500 .u.Õh.á^½&á_.&.w.&.w.j<á^Ç&.w.&. 000000
 76FF006A 00018C46 C7080EE9 0003E903 7500003D 9A46890A C48314B8 02FB9A37 7.«.£..á..F.=..u.Õ..Õ..úF¥..j..v 000020
 F876FFFA 76FF0"E8 E90003E9 03750000 309A4689 06C48315 4D2E439A F876FFFA *.v½.C.N..á..F.=..u.Õ..ÕS..v*.v½ 000040
 016A006A 2877FF26 2077FF26 F05EC407 D4E908C4 83156F09 2A9AB876 FFBA76FF .vo.v|.".o..á.Õ&.á^Þ&.w-&.w+j.j. 000060
 08C48315 2A00009A 8476FFB6 76FF9A76 FF506A9A 46890000 161C9A50 16FC468D .F=.P......F.jP.v..vÑ.vÇ...*..á. 000080
 C45016F8 46800788 E90003E9 03740247 08260788 26FC5EC4 000FE903 7400003D =..t.Õ..á^=&..&.G.t.Õ..Õ...F½.Pá 0000A0
 C40075E9 03750000 300CC483 0978009C 9AB476FF B676FF37 FF260277 FF26FC5E ^=&.w.&.7.vÑ.vÇ...x..á.=..u.Õu.á 0000C0
 B45EC438 6A0A77FF 260C77FF 260A5FC4 26F85EC4 0068E903 7400187F 8326F85E ^½&....t.Õh.á^½&á_.&.w.&.w.j;á^Ç 0000E0
 8C46C707 28E90003 E9037500 00309A46 890AC483 163102FB 9A37FF26 0277FF26 &.w.&.7.«.1..á..F.=..u.Õ..Õ(.úF¥ 000100
 0705E900 03E90375 0000309A 468906C4 8310432E 439AF876 FFFA76FF 016A0001 ..j..v*.v½.C.C..á..F.=..u.Õ..Õ.. 000120
 00003547 C726065E C406EEE9 08C483FF FF092A9A B876FFBA 76FFF876 FFFA76FF .v*.v½.vo.v|.*....á.ÕY.á^ø&úG5.. 000140
 0015CD9A 00838 7FF 26008587 FF26065E C4B876FF BA76FF00 003747C7 26065EC4 á^ø&úG7...vo.v|á^ø&.ñ..&.ñ...ë.. 000160
 C4B876FF BA76FF00 013747C7 26065EC4 00003547 C726065E C4085AE9 00008800 .|..ÕZ.á^ø&úG5..á^ø&úG7...vo.v|á 000180
 00013547 C726065E C4082AE9 00008800 0015FD9A 00838 7FF 26008587 FF26065E ^ø&.ñ..&.ñ...»...|..Õ*.á^ø&úG5.. 0001A0
 00FFFF9A 00838 7FF 26008587 FF26065E C4B876FF BA76FF00 013747C7 26065EC4 á^ø&úG7...vo.v|á^ø&.ñ..&.ñ...... 0001C0
 0000FFFF 9A5016FC 4680016A 006A2877 FF262077 FF26F05E C407FAE9 00008800 .|..Õ*.á^Þ&.w-&.w+j.j..F=.P..... 0001E0

Dump of file SATURN:(PCCOMMON.DUMP.DLL)DAD.TMP;1 on 18-APR-1990 10:40:03.08
File ID (551,9,0)   End of file block 267 / Allocated 268

Virtual block number 20 (00000014), 512 (0200) bytes

 5EC4000F E9037400 003008C4 83100C00 009AB476 FFB676FF 9A76FF50 6A9A4689 .F.jP.v..vÑ.vÇ......á.=..t.Õ..á^ 000000
 FF37FF26 0277FF26 FC5EC450 16FB4680 0615E900 03E90374 02470826 078826FC =&..&.G.t.Õ..Õ...F½.Pá^=&.w.&.7. 000020
 E9037549 1A7F8026 F85EC400 C6E90375 0000300C C483179F 009C9AB4 76FFB676 vÑ.vÇ......á.=..u.Õ6.á^½&...!u.Õ 000040
 526A9A46 89000017 CE9A5016 E4468D00 6A006A23 77FF2625 77FF26F8 5EC40089 ¿.á^½&.wX&.w#j.j..FÕ.P.ö....F.jR 000060
 00E67E83 05A9E900 03E90375 00003008 C48316F1 00009AB4 76FFB676 FF9A76FF .v..vÑ.vÇ...þ..á.=..u.Õ..Õ`..-|. 000080
 FF260C77 FF260A5F C426F85E C40068E9 037701E4 7E830009 E9037E00 76E9037D ).Õv.-.Õ...-ö.w.Õh.á^½&á_.&.w.&. 0000A0
 03E90375 0000309A 46890AC4 83176802 FB9A37FF 260277FF 26845EC4 306A0A77 w.j=á^Ç&.w.&.7.«.h..á..F.=..u.Õ. 0000C0
 7500003D 9A468906 C4831848 2FB39AF8 76FFFA76 FF496A00 018C46C7 0561E900 .Õa.úF¥..j!.v*.v½.*/K..á..F.=..u 0000E0
 5EC40527 E908C483 186A092A 9AB876FF BA76FFF8 76FFFA76 FF053EE9 0003E903 .Õ..Õ>..v*.v½.vo.v|.*.j..á.Õ'.á^ 000100
 FF9A76FF 506A9A46 89000018 879A5016 FC468D01 6A006A28 77FF2620 77FF26F0 Þ&.w-&.w+j.j..F=.P......F.jP.v.. 000120
 74024708 26078826 FC5EC400 0FE90374 00003008 C48317E3 00009AB4 76FFB676 vÑ.vÇ...D..á.=..t.Õ..á^=&..&.G.t 000140
 03009C9A B476FFB6 76FF37FF 260277FF 26FC5EC4 5016F846 8D040EE9 0003E903 .Õ..Õ8..F½.Pá^=&.w.&.7.vÑ.vÇ...£ 000160
 2577FF26 F85EC400 86E90375 5B1A7F80 26F85EC4 00C3E903 7500003D 0CC48318 ..á.=..u.Õü.á^½&...Xu.ÕÑ.á^½&.w% 000180
 B476FFB6 76FF9A76 FF526A9A 46890000 19029A50 16E4468D 006A006A 2377FF26 &.w#j.j..FÕ.P......F.jR.v..vÑ.vÇ 0001A0
 09E9037E 0073E9( 7D00E67E 830472E9 0003E903 7500003D 08C48318 2800009A ...(..á.=..u.Õ..Õr..-|.).Õs.-.Õ. 0001C0
 FF26845E C43E6A0A 77FF260C 77FF260A 5FC426F8 5EC40065 E9037701 E47E8300 ..-ö.w.Õe.á^½&á_.&.w.&.w.j>á^Ç&. 0001E0

Dump of file SATURN:(PCCOMMON.DUMP.DLL)DAD.TMP;1 on 18-APR-1990 10:40:03.08
File ID (551,9,0)   End of file block 267 / Allocated 268

Virtual block number 21 (00000015), 512 (0200) bytes

 0001BC46 C7042AE9 0003E903 7500003D 9A46890A C483189C 02FB9A37 FF260277 w.&.7.«....á..F.=..u.Õ..Õ*.úF¥.. 000000
 76FFFA76 FF040AE9 0003E903 7500003D 06C48319 7F2FB39A F876FFFA 76FF586A jX.v*.v½.*/...á.=..u.Õ..Õ...v*.v 000020
 6A006A2B 77FF2620 77FF26F0 5EC403F3 E908C483 19A1092A 9AB876FF BA76FFF8 ½.vo.v|.*.À..á.Õµ.á^Þ&.w-&.w+j.j 000040
 C4831917 00009AB4 76FFB676 FF9A76FF 506A9A46 89000019 BE9A5016 FC468001 ..F=.P.ƒ....F.jP.v..vÑ.vÇ......á 000060
 5016F846 8003AAE9 0003E903 74024708 26078826 FC5EC400 0FE90374 00003008 .=..t.Õ..á^=&..&.G.t.Õ..Õ`..F½.P 000080
 00C6E903 7500003D 0CC48314 0C009C9A B476FFB6 76FF37FF 260277FF 26FC5EC4 á^=&.w.&.7.vÑ.vÇ......á.=..u.Õ6. 0000A0
 16E4468D 006A006A 2377FF26 2577FF26 F85EC400 89E90375 411A7F80 26F85EC4 á^½&...Au.Õ¿.á^½&.wX&.w#j.j..FÕ. 0000C0
 7500003D 08C48319 5C00009A B476FFB6 76FF9A76 FF526A9A 46890000 FFFF9A50 P......F.jR.v..vÑ.vÇ...\..á.=..u 0000E0
 5EC40068 E9037701 E47E8300 09E9037E 0076E903 7D00E67E 83033EE9 0003E903 .Õ..Õ>..-|.).Õv.~.Õ...-ö.w.Õh.á^ 000100
 C4831903 02FB9A37 FF260277 FF26845E C43F6A0A 77FF260C 77FF260A 5FC426F8 ½&á_.&.w.&.w.j?á^Ç&.w.&.7.«.£..á 000120
 672FB39A F876FFFA 76FF416A 0001BC46 C702F6E9 0003E903 7500003D 9A46890A ..F.=..u.Õ..Õ-.úF¥..jA.v*.v½.*/g 000140
 2A9AB876 FFBA76FF F876FFFA 76FF02D3 E90003E9 03750000 309A4689 06C48314 ..á..F.=..u.Õ..Õ£..v*.v½.vo.v|.* 000160
 13C09A50 16FC468D 016A006A 2B77FF26 2077FF26 F05EC402 BCE908C4 83148909 ....á.Õ¥.á^Þ&.w-&.w+j.j..F=.P.á. 000180
 000FE903 7400003D 08C48313 6100009A B476FFB6 76FF9A76 FF506A9A 46890000 ...F.jP.v..vÑ.vÇ...a..á.=..t.Õ.. 0001A0
 FF260277 FF26FC5E C45016C6 46800273 E90003E9 03740247 08260788 26FC5EC4 á^=&..&.G.t.Õ..Õs..FÕ.Pá^=&.w.&. 0001C0
 88264147 8826065E C40038E9 03750000 300CC483 16680138 9AB476FF B676FF37 7.vÑ.vÇ.8.h..á.=..u.Õ8.á^ø&.GA&. 0001E0
```

```
Dump of file SATURN:[PCCOMMON.DUMP.DLL]DAD.TMP;1 on 18-APR-1990 10:40:03.08
File ID (551,9,0)   End of file block 267 / Allocated 268

Virtual block number 25 (00000019), 512 (0200) bytes

 83020302 00000417 53020300 00000808 84000203 71000716 97020300 00000A17 ...........q...........S.......* 000000
 0A02050C 5100C000 A0020300 00000C1A E0000201 0E000407 61020302 7D00061E ...)...a........Å...........Q.... 000020
 43020300 2E00011E F5010300 2D00011E 00010300 AD00011E EA01030A D200080C ...8...õ...Ù...Å...-...¥.......C 000040
 180103C2 89000610 90020303 09000601 3F020300 00000E02 6E000200 97000402 .......n.......?................ 000060
 C402034E 02000A10 5F000500 0000101E 10000208 E4000800 13020300 8200011F ...ý.......ð..........._....N..é 000080
 A002030C 6E000C0C 1D020302 9800061E 7302030A EE000810 E802030C 63000C0C ...c...Š...Ÿ...s...........n.... 0000A0
 AC020303 2000071C FE020300 36000401 91020308 FC00081A 62020302 A300061E ...È...b...=.......6...±... ...¯ 0000C0
 31020300 58000110 2F010300 5900011D 28010302 AE00060D 4A020304 1C000809 .......J...Ü...+...Y.../...[...1 0000E0
 42020302 C1000603 1F020302 41000500 63020300 5C000110 36010308 0C000812 .......6...\...c...A.......è...B 000100
 13020300 5D00041C 7D020300 F3000103 06010302 4F00051D 7302030A 9C00081D .......s...O.......µ...}...].... 000120
 006A006A D88EFFFF 881E5657 0000C2C8 0000000A D200080C 07020203 4500071D ...E.......Ø....àô..WV.j...Äj.j. 000140
 16D8468D 004E681E 0000FFFF 9A5016FF 6486806E 6A086A02 0036FF26 1982068E ....&.6..j.jn..d..P......hN..FÄ. 000160
 00FF5686 C71101FF 5486C700 00FF4E86 C70090FF 4C86C708 C483FFFF 00109A50 P......é.ú.L...ú.N...ú.T...ü.V.. 000180
 76FF0A76 FF0000FF FF9A006A 046A006A FFFF68FF FF68501C D8468D00 6A006A00 .j.j..FÄ.Ph..h..j.j.j.......v..v 0001A0
 068E006A 006A5016 FF64868D 50160846 805016FF 54868DFF 4C86FFFF 4EB6FF08 ..ÅN..ÅL...T..P.FÄ.P..d..Pj.j... 0001C0
 6A006AFF 529689FF 50868900 00FFFF9A 5016FF3E 86800385 58020036 FF261982 ..&.6..h....>..P.......P...R.j.j 0001E0

Dump of file SATURN:[PCCOMMON.DUMP.DLL]DAD.TMP;1 on 18-APR-1990 10:40:03.08
File ID (551,9,0)   End of file block 267 / Allocated 268

Virtual block number 26 (0000001A), 512 (0200) bytes

 449689FF 42868900 00FFFF9A 276A016A 006AD656 89D44689 000000C5 9A266A01 .j&.é....Få.Vej.j.j'.......B...D 000000
 F44689D2 D1E0D1D6 5688D446 88F04689 F2468900 0088EC46 89EE4689 000088FF .j...FŸ.F$|...F·.FÞ.Få.VeÌÀ10.F¶ 000020
 5689F846 89D2D1E0 D1D313C1 03D2D1E0 D1DA88C8 88FF4496 88FF4286 88F65689 .V-..B...D..à.ÒÌÀ10.è.£ìÀ10.F%.V 000040
 5618EC46 28F65688 F4468800 00FFFF9A 006A5016 EC4680FF 5086FFFF 5286FFFA *.ÅR..ÅP..F$.Pj.......F¶.V~+F$.V 000060
 0A76FFFF 5A9689FF 588689F2 5618F046 28FA5626 F84688FF 629689FF 608689EE Ÿ..'...b..F%.V*+FÞ.V·..X...Z..v. 000080
 28F84688 EC76FF00 6A006AFF 5086FFFF 5286FF00 00D1AD9A 5016EC46 8D0876FF .v..F$.P.Ù....ÅR..ÅP.j.j..v$.F%+ 0000A0
 FFFF9A01 6AFF5086 FFFF5286 FF0000FF FF9A036A FF5886FF FF6086FF 50FF5886 .X.P.Å'..ÅX.j.......ÅR..ÅP.j.... 0000C0
 00FFFF9A 5016EC46 8DFF3E86 FFFF4086 FF0000FF FF9A5016 FC468D06 76FF0000 ...v..F=.P......Åa..Å>..F$.P.... 0000E0
 588689FF 44961BFF 428628FA 5688F846 88FF6296 89FF6086 89EE5688 EC468800 ..F$.VŸ..'...b..F%.V*+.B...D...X 000100
 00E7E903 7E0335D2 7E810246 FF0003E9 032AD246 C70001FF 4686C7FF 5A9689FF ...Z.ú.F...úF@*.Õ...F@.~@5.~.Õô. 000120
 FC5EC4FF 4A9689FF 48868900 00FFFF9A D276FF02 0036FF26 1982068E 016A006A j.j.....&.6...v@.......H...J.é^= 000140
 FF5C9EC4 078926D2 4688FF5C 9EC40000 FFFF9A50 16FF5C86 80106A32 6A37FF26 &.7j2j...\..P.....é.\..F@&..é.\. 000160
 C4064789 26D44688 FF5C9EC4 04478926 FF588688 FF5C9EC4 02478926 FF608688 ..'.&.G.é.\...X.&.G.é.\..Fé&.G.é 000180
 C40C5789 260A4789 26FF4A96 88FF4886 88FF5C9E C4084789 26FF4286 88FF5C9E .\...B.&.G.é.\...H...J.&.G.&.W.é 0001A0
 00FFFF9A FF5C86FF FF5E86FF 50520037 05FE5688 FC468800 000E47C7 26FF5C9E .\.&úG....F=.V±.7.RP.Å^..Å\..... 0001C0
 449688FF 428688FF 629689FF 608689EE 5688EC46 880027E9 037402FF 468E8300 ../F..t.Õ'..F$.VŸ..'...b...B...D 0001E0

Dump of file SATURN:[PCCOMMON.DUMP.DLL]DAD.TMP;1 on 18-APR-1990 10:40:03.08
File ID (551,9,0)   End of file block 267 / Allocated 268

Virtual block number 27 (0000001B), 512 (0200) bytes

 FF629611 FF608601 D65688D4 46880012 E90001FF 4686C7FF 5A9619FF 588629FF .).X...Z.ú.F...Õ...Få.Ve..'...b. 000000
 1F0000E9 00008802 57892607 8926FF40 9688FF3E 86880C5E C4FF0CE9 FF4686FF ..F.Õ..é^...>...a.&..&.W.j..Õ... 000020
 38E90375 0C46080A 46880292 E90E4688 D88E0008 881E5657 00002AC8 CBC95F5E ^_èùà*..WV.j...Ä.F.Õ...F..F.u.Õ8 000040
 5EC40000 01989A50 16FC468D D676FF00 00FFFF9A 50160646 8D1076FF *?76FF00 ..v..v..Fe.P......ve.F=.P.....é^ 000060
 FF1076FF 1276FF00 00FFFF9A 0A76FF0C 76FF5052 9906468B 1DAE6808 ? *F26FC e&.w.hÙ..Fe.RP.v..v.......v..v.. 000080
 006A056A 1076FF12 76FF025D E9000005 719A0676 FF0876FF 0A76FF0C 76.F0E76 v..v..v..v..v..q...Õ]..v..v.j.j. 0000A0
 E25689E0 46890000 FFFF9A00 6A056AD8 76FFDA76 FFDA5689 D8468900 0003869A ......FÅ.VÖ.vÖ.vÄj.j.......FÅ.Vã 0000C0
 1276FF02 16E90000 FFFF9A06 76FF0876 FF0A76FF 0C76FF0E 76FFE076 FFE276FF .vã.vÅ.v..v..v..v..v......Õ...v. 0000E0
 EC4680DC 76FFDE76 FFDE5689 DC468900 00FFFF9A 5016EC46 80006A00 6A1076FF .v.j.j..F$.P......FÉ.V8.v8.vÉ.F$ 000100
 46800676 FF000004 7F9A5016 D6468D10 76FF1276 FF0000FF FF9AEC6A FF6A5016 .Pj.j$......v..v..Fe.P......ve.F 000120
 263977FF 26FC5EC4 0000049C 9A3777FF 263977FF 26FC5EC4 0000048C 9A5016FC e.P.....é^e&.w9&.w7.....é^e&.w9& 000140
 FF26E45E C4DC76FF DE76FF00 2EE90374 00003000 0004B19A 5016E446 8D3777FF .w7.FÕ.P.Ÿ...=..t.Õ...v8.vÉé^Õ&. 000160
 0000FFFF 9A0E77FF 26E45EC4 0A77FF26 0C77FF26 E45EC404 77FF26E4 5EC40277 w.á^Õ&.w.é^Õ&.w.&.w.é^Õ&.w...... 000180
 0C4688EA 46890A46 88015CE9 00008A00 00880000 FFFF9ADC 76FFDE76 FFFF85E9 Õç..v8.vÉ.....j..□..Õ\..F..Fõ.F. 0001A0
 0000032A 9A5016FC 46800676 FF000003 1D9A5016 D6468D10 76FF1276 FFE84689 .FÕ.v..v..Fe.P......ve.F=.P.*... 0001C0
 5016E446 8D3777FF 263977FF 26FC5EC4 0000FFFF 9A3777FF 263977FF 26FC5EC4 é^e&.w9&.w7.....é^e&.w9&.w7.FÕ.P 0001E0
```

```
Dump of file SATURN:[PCCOMMON.DUMP.DLL]DAD.TMP;1 on 18-APR-1990 10:40:03.08
File ID (551,9,0)   End of file block 267 / Allocated 268

Virtual block number 25 (00000019), 512 (0200) bytes

83020302 0D000417 53020300 00000808 84000203 71000716 97020300 00000A17 ..........q...........S.......* 000000
0A02050C 51000C0D A0020300 00000C1A E0000201 0E000407 61020302 7D00061E ...)...a.......Å...........a.... 000020
43020300 2E00011E F5010300 2D00011E D0010300 AD00011E EA01030A 0200080C ...@...õ...Ù...Å...-...%.......C 000040
18010302 8900061D 90020303 09000601 3F020300 00000E02 6E000200 97000402 .......n.......?................ 000060
C402034E 02000A10 5F000500 0000101E 10000208 E400080D 13020300 8200011F ...ý.......ð..........._....N..á 000080
A002030C 6E000C0C 10020302 9800061E 7302030A EE000810 EB02030C 63000C0C ...c...Š...Ÿ...s...........n.... 0000A0
AC020303 2000071C FE020300 36000401 91020308 FC000B1A 62020302 A300061E ...È...b...ø.......6...±... ...¯ 0000C0
31020300 5B000110 2F010300 5900011D 2B010302 AE000600 4A020304 1C000809 .......J...Û...+...Y.../...[...1 0000E0
42020302 C1000603 1F020302 41000500 63020300 5C000110 36010308 0C000812 .......6...\...c...A.......é...B 000100
13020300 5D00041C 7D020300 F3000103 06010302 4F000510 7302030A 9C00081D .......s...O.......µ...)...].... 000120
006A006A D88EFFFF B81E5657 0000C2C8 0000000A D200080C 07020203 4500071D ...E.......@....àô..WV.¡...Äj.j. 000140
16D84680 004E681E 0000FFFF 9A5016FF 64868D6E 6A086A02 0036FF26 1982068E ....&.6..j.jn..d..P......hN..FÁ. 000160
00FF5686 C71101FF 5486C700 00FF4E86 C70090FF 4C86C708 C483FFFF 00109A50 P......á.ú.L...ú.N...ú.T...ú.V.. 000180
76FF0A76 FF0000FF FF9A006A 046A006A FFFF68FF FF685016 D8468D00 6A006A00 .j.j..FÄ.Ph..h..j.j.j.......v..v 0001A0
068E006A 006A5016 FF64868D 5016D846 8D5016FF 54868DFF 4C86FFFF 4E86FF08 ..ÑN..ÑL...T..P.FÁ.P..d..Pj.j... 0001C0
6A006AFF 529689FF 50868900 00FFFF9A 5016FF3E 86800385 68020036 FF261982 ..&.6..h....>..P.......P...R.j.j 0001E0

Dump of file SATURN:[PCCOMMON.DUMP.DLL]DAD.TMP;1 on 18-APR-1990 10:40:03.08
File ID (551,9,0)   End of file block 267 / Allocated 268

Virtual block number 26 (0000001A), 512 (0200) bytes

449689FF 42868900 00FFFF9A 276A016A 006AD656 89D44689 000000C5 9A266A01 .j&.é....Få.Vøj.j.j'.......B...D 000000
F44689D2 D1E0D1D6 5688D446 88F04689 F2468900 0088EC46 89EE4689 000088FF .¡...FŸ.F&¡...F .FÞ.Få.VøîÅÎ@.F¶ 000020
5689F846 89D201E0 D1D313C1 030201E0 D1DA88C8 88FF4496 88FF4286 88F65689 .V-..B...D..à.ÒîÅÎ@.é.ÆîÅÎ@.F½.V 000040
561BEC46 2BF65688 F4468800 00FFFF9A 006A5016 EC468DFF 5086FFFF 5286FFFA *.ÑR..ÑP..F&.Pj.......F¶.V-+F&.V 000060
0A76FFFF 5A9689FF 588689F2 561BF046 2BFA5688 F84688FF 629689FF 608689EE Ÿ..'...b..F½.V°+FÞ.V..X...Z..v. 000080
2BF84688 EC76FF00 6A006AFF 5086FFFF 5286FF00 0001AD9A 5016EC46 8D0876FF .v..F&.P.Ù....ÑR..ÑP.j.j..v&.F½+ 0000A0
FFFF9A01 6AFF5086 FFFF5286 FF0000FF FF9A036A FF5886FF FF6086FF 50FF5886 .X.P.Ñ'..ÑX.j.......ÑR..ÑP.j.... 0000C0
00FFFF9A 5016EC46 8DFF3E86 FFFF4086 FF0000FF FF9A5016 FC468D06 76FF0000 ...v..F•.P......Ñ@..Ñ>..F&.P.... 0000E0
588689FF 44961BFF 42862BFA 5688F846 88FF6296 89FF6086 89EE5688 EC468800 ..F&.VŸ..'...b..F½.V°+.B...D...X 000100
00E7E903 7E0335D2 7E81D246 FF0003E9 032AD246 C70001FF 4686C7FF 5A9689FF ...Z.ú.F...úF@*.Ò...F@.-@5.-.ÕÓ. 000120
FC5EC4FF 4A9689FF 48868900 00FFFF9A D276FF02 0036FF26 1982068E 016A006A j.j.....&.6...v@.......H...J.á^= 000140
FF5C9EC4 07892602 4688FF5C 9EC40000 FFFF9A50 16FF5C86 8D106A32 6A37FF26 &.7j2j...\..P.....á.\..F@&..á.\. 000160
C4064789 26D44688 FF C9EC4 04478926 FF588688 FF5C9EC4 02478926 FF608688 ..'.&.G.á.\...X.&.G.á.\..FÁ&.G.á 000180
C40C5789 260A4789 26FF4A96 88FF4886 88FF5C9E C4084789 26FF4286 86F 5C9E .\...B.&.G.á.\...H...J.&.G.&.W.á 0001A0
00FFFF9A FF5C86FF FF5E86FF 50520037 05FE5688 FC468800 000E47C7 26FF C9E .\.&úG....F•.V±.7.RP.Ñ^..Ñ\..... 0001C0
449688FF 428688FF 629689FF 608689EE 5688EC46 880027E9 037402FF 46BE8 00 ../f..t.Ò'..F&.VŸ..'...b...B...D 0001E0

Dump of file SATURN:[PCCOMMON.DUMP.DLL]DAD.TMP;1 on 18-APR-1990 10:40:03.08
File ID (551,9,0)   End of file block 267 / Allocated 268

Virtual block number 27 (0000001B), 512 (0200) bytes

FF629611 FF608601 D65688D4 46880012 E90001FF 4686C7FF 5A9619FF 588629FF .).X...Z.ú.F...Õ...Få.Vø..'...b. 000000
1F0000E9 00008802 57892607 8926FF40 9688FF3E 86880C5E C4FF0CE9 FF4686FF ..F.Õ..á^...>...a.&..&.W.¡..Õ... 000020
38E90375 0C46080A 46880292 E90E4688 D88E0008 881E5657 00002AC8 C8C95F5E ^_èùà*..WV.¡...Ä.F.Õ...F..F.u.ÕB 000040
5EC40000 01989A50 16FC4680 D676FF00 00FFFF9A 50160646 8D1076FF 1276FF00 ..v..v..Fø.P......vø.F•.P.....á^ 000060
FF1076FF 1276FF00 00FFFF9A 0A76FF0C 76FF5052 9906468B 10AE6808 77FF26FC •&.w.hÛ..Fø.RP.v..v.......v..v.. 000080
006A056A 1076FF12 76FF025D E9000005 719A0676 FF0876FF 0A76FF0C 76FF0E76 v..v..v..v..v..q...Õ]..v..v.j.j. 0000A0
E25689E0 46890000 FFFF9A00 6A056AD8 76FFDA76 FFDA5689 D8468900 0003869A ......FÄ.VÖ.vÖ.vÄj.j.......FÄ.Vä 0000C0
1276FF02 16E90000 FFFF9A06 76FF0876 FF0A76FF 0C76FF0E 76FFE076 FFE276FF .vä.vÅ.v..v..v..v..v......Õ...v. 0000E0
EC468D0C 76FFDE76 FFDE5689 DC468900 00FFFF9A 5016EC46 8D006A00 6A1076FF .v.j.j..F&.P......FÉ.VB.vB.vÉ.F& 000100
46800676 FF000004 7F9A5016 D6468010 76FF1276 FF0000FF FF9AEC6A FF6A5016 .Pj.j&......v..v..Fø.P......vø.F 000120
263977FF 26FC5EC4 0000049C 9A3777FF 263977FF 26FC5EC4 0000048C 9A5016FC •.P.....á^•&.w9&.w7.....á^•&.w9& 000140
FF26E45E C4DC76FF DE76FF00 2EE90374 00003000 0004819A 5016E446 8D3777FF .w7.Fõ.P.Ý...=..t.Õ...vB.vÉá^Õ&. 000160
0000FFFF 9A0E77FF 26E45EC4 0A77FF26 0C77FF26 E45EC404 77FF26E4 5EC40277 w.á^Õ&.w.á^Õ&.w.&.w.á^Õ&.w...... 000180
0C4688EA 46890A46 88015CE9 00008A00 00880000 FFFF9ADC 76FFDE76 FFFFB5E9 Õç..vB.vÉ.....¡..¤..Õ\..F..Fõ.F. 0001A0
0000032A 9A5016FC 46800676 FF000003 109A5016 D6468D10 76FF1276 FFE84689 .FÕ.v..v..Fø.P......vø.F•.P.*... 0001C0
5016E446 8D3777FF 263977FF 26FC5EC4 0000FFFF 9A3777FF 263977FF 26FC5EC4 á^•&.w9&.w7.....á^•&.w9&.w7.Fõ.P 0001E0
```

Dump of file SATURN:[PCCOMMON.DUMP.DLL]DAD.TMP;1 on 18-APR-1990 10:40:03.08
File ID (551,9,0)   End of file block 267 / Allocated 268

Virtual block number 28 (0000001C), 512 (0200) bytes

```
88E45EC4 008CE903 7E024739 26EA4688 E45EC400 9EE90374 00003000 00FFFF9A .....=..t.Õ..á^Õ.FÕ&9G.-.Õ..á^Õ. 000000
67E9037D EA463806 470326E4 5EC40247 8826E45E C4007DE9 037E0447 3926E846 FÕ&9G.-.Õ).á^Õ&.G.á^Õ&.G.;FÕ).Õg 000020
74020E7F 8326E45E C40051E9 037DE846 38084703 26E45EC4 04478826 E45EC400 .á^Õ&.G.á^Õ&.G.;FÕ).ÕQ.á^Õ&....t 000040
76FF0017 E9000005 419A006A 006A37FF 26006AE4 5EC41DAF 68D676FF 001AE903 .Õ...vahÉ.á^Õj.&.7j.j..A...Õ...v 000060
3777FF26 3977FF26 FC5FC400 0003459A 016A006A 37FF2600 6AE45EC4 1DAF6806 ahÉ.á^Õj.&.7j.j..E...á^=&.w9&.w7 000080
0676FF08 76FF0A76 FF0C76FF 0E76FF10 76FF1276 FFFF45E9 0003E900 00FFFF9A .....Õ..ÕE..v..v..v..v..v..v..v. 0000A0
FFFF9A06 76FF0876 FF0A76FF 0C76FF0E 76FF1076 FF1276FF 004BE900 000>.E9A .....ÕK..v..v..v..v..v..v..v.... 0000C0
FDB6E903 75004B30 FE05E903 7500233D FD66E903 75000030 002BE900 2EE9C 90 ..Õ..Õ+.=..u.Õf»=#.u.Õ.±=K.u.ÕÑ» 0000E0
56570000 14C8000E CAC95F5E 1FFFB5E9 FDA6E903 75007A30 FEAFE903 75007130 =q.u.Õ€±=z.u.Õ1»Õç..^_èò..à...WV 000100
77FF2639 77FF2606 5EC40000 04049A37 77FF2639 77FF2606 5EC4088E 02FCB81E .|=..Äá^.&.w9&.w7.....á^.&.w9&.w 000120
48E90374 0739260A 468BEC5E C40059E9 03740000 30000004 199A5016 EC468037 7.F$.P.....=..t.ÕY.á^$.F.&9.t.ÕH 000140
C4000001 599A5016 F0468033 77FF2635 77FF2606 5EC40002 0E47C726 EC5EC400 .á^$&ùG...á^.&.w5&.w3.FÞ.P.Y...á 000160
77FF2639 77FF2606 5EC40000 FFFF9A00 6A5016F0 46803377 FF263577 FF26065E ^.&.w5&.w3.FÞ.Pj......á^.&.w9&.w 000180
000603E7 0203001D 90CBC95F 5E1F0000 E90000B8 FF8AE900 03E90000 05519A37 7.Q...Õ..Õ..|..Õ...^_èù.....Õ... 0001A0
0001017F 01030003 00010067 01030000 0002005B 0002025E 0005021E 02030202 ▮.......^...[.......g........... 0001C0
00010121 01030000 0001018E 010302E5 000603F4 0203008C 000100A1 01030008 ....À.......¶...|............|... 0001E0
```

Dump of file SATURN:[PCCOMMON.DUMP.DLL]DAD.TMP;1 on 18-APR-1990 10:40:03.08
File ID (551,9,0)   End of file block 267 / Allocated 268

Virtual block number 29 (0000001D), 512 (0200) bytes

```
00010024 0103001A 0001062B 01030019 00010371 01030095 00010084 0103008F ....Ç.......q.......+.......$... 000000
0001045A 0103002D 000103BD 010300AD 00010307 010302F4 0002005E 00050090 ....^...¶...▪...Ù...§...-...Z... 000020
0001035F 010300B1 0001044C 01030000 000E0034 0002002F 00010642 0103002E ....B.../...4.......L...Ý..._... 000040
0007028D 02030298 00060527 0203003D 000103A6 01030000 00100502 00020082 ý...▮.......|...=...'.......... 000060
000705F7 02030331 00070652 02030057 00010201 01030320 000705E2 02030398 ....ã... .......W...R...1...¥... 000080
000A7E83 D88EFFFF 881E5657 000484C8 00000000 00000000 00000000 00000345 É...............àÇ..WV.j...Á.-.. 0000A0
FF9A5016 FDA8868D 0258680C 76FF0200 36FF2619 84068E00 6A006A00 69E90375 u.Õi.j.j.....&.6...v.hX...´».P.. 0000C0
1FC42606 5EC40AC4 83FFFF00 889A5016 FB50868D 5016FDA8 868D0A76 FF0000FF ....v...´».P..P«.P......á.á^.&á. 0000E0
8D005A68 1EFB4C86 FFFB4EB6 FF016A00 6A0000FF FF9A5016 FB4C868D 0277FF26 &.w...L«.P.....j.j..ÑN«.ÑL«.hZ.. 000100
1E565700 04B4C8C8 C95F5E1F 0000E90A 46880000 FFFF9A20 6A006A50 16FB5086 .P«.Pj.j ......F.Õ...^_èùàÇ..WV. 000120
2F9A5016 FDA8868D 0258680A 76FF0200 36FF2619 84068E00 6A006AD8 8E0008B8 |...Äj.j.....&.6...v.hX̄...´».P./ 000140
5016FB50 868D5016 FDA8868D 0C76FF0E 76FF0010 E903750E 46080C46 88000000 ....F..F.u.Õ...v..v...´».P..P«.P 000160
C408C483 00450010 9A5016FB 50868050 16FDA886 8D0014E9 0CC48300 EA00889A ...õ..á.Õ....´».P..P«.P...E..á.á 000180
58681EFB 4CB6FFFB 4EB6FF01 6A006A00 00005B9A 5016FB4C 868D0277 FF26065E ^.&.w...L«.P.[...j.j..ÑN«.ÑL«.h[ 0001A0
8E0091B8 1E565700 04B4C8C8 C95F5E1F 0000007A 9A206A00 6A5016FB 50868D00 ...P«.Pj.j .z....^_èùàÇ..WV.j... 0001C0
88000000 AF9A5016 FDA8868D 0258680A 76FF0200 36FF2619 84068E00 6A006AD8 Äj.j.....&.6...v.hX̄...´».P.É.... 0001E0
```

Dump of file SATURN:[PCCOMMON.DUMP.DLL]DAD.TMP;1 on 18-APR-1990 10:40:03.08
File ID (551,9,0)   End of file block 267 / Allocated 268

Virtual block number 30 (0000001E), 512 (0200) bytes

```
8600889A 5016FB50 868D5016 FDA8868D 0C76FF0E 76FF001D E903750E 46080C46 F..F.u.Õ...v..v...´».P..P«.P.... 000000
FF26065E C408C483 00030010 9A5016FB 50868D50 16FDA886 8D0014E9 0CC48301 ..á.Õ....´».P..P«.P...Æ..á.á^.&. 000020
50868000 5C681EFB 4CB6FFFB 4EB6FF01 6A006A00 0000F09A 5016FB4C 868D0277 w...L«.P.»...j.j..ÑN«.ÑL«.h\...P 000040
6A006AD8 8E012D88 1E565700 04B6C8C8 C95F5E1F 0000011C 9A306A00 6A5016FB «.Pj.jD......^_èùàÑ..WV.j-..Äj.j 000060
46080C46 8B000001 4B9A5016 FDA8868D 0258680A 76FF0200 36FF2619 84068E00 .....&.6...v.hX̄...´».P.K....F..F 000080
0CC48302 2200889A 5016FB50 868D5016 FDA88680 0C76FF0E 76FF001D E903750E .u.Õ...v..v...´».P..P«.P...".á. 0000A0
868D0277 FF26065E C408C483 016F0010 9A5016FB 50868050 16FDA886 8D0014E9 Õ....´».P..P«.P...o..á.á^.&.w... 0000C0
6A5016FB 50868D00 50681EFB 4AB6FFFB 4CB6FF01 6A006A00 0001999A 5016FB4A J«.P.....j.j..ÑL«.ÑJ«.h}...P«.Pj 0000E0
E90000B8 0003E900 01B80006 E9037401 FB4EBE83 FB4E8689 000001B8 9A116A00 .j..|.....N«./N«.t.Õ..j..Õ..j..Õ 000100
020036FF 26198406 8E006A00 6AD88E01 C9881E56 570004B0 CBCBC95F 5E1F0000 ...^_èùà¯..WV.jè..Äj.j.....&.6.. 000120
FF0E76FF 001DE903 750E4608 0C468800 0001E79A 5016FDA8 868D0258 680A76FF .v.hX̄...´».P.Õ....F..F.u.Õ...v.. 000140
805016FD A8868D00 14E90CC4 83020800 889A5016 FB50868D 5016FDA8 868D0C76 v...´».P..P«.P...Ä..á.Õ....´».P. 000160
6A006A50 16FB5086 8D10B168 0877FF26 065EC408 C483020B 00109A50 16FB5086 .P«.P......á.á^.&.w.hÝ...P«.Pj.j 000180
26198406 8E006A00 6AD88E02 7FB81E56 570004B2 CBCBC95F 5E1F0000 FFFF9A00 .......^_èùàý..WV.j...Äj.j.....& 0001A0
001DE903 750E4608 0C468800 0002909A 5016FDA8 868D0258 680A76FF 020036FF .6...v.hX̄...´».P......F..F.u.Õ.. 0001C0
A8868000 14E90CC4 83035C00 889A5016 FB50868D 5016FDA8 868D0C76 FF0E76FF .v..v...´».P..P«.P...\..á.Õ....´ 0001E0
```

```
Dump of file SATURN:[PCCOMMON.DUMP.DLL]DAD.TMP;1 on 18-APR-1990 10:40:03.08
File ID (551,9,0)   End of file block 267 / Allocated 268

Virtual block number 31 (0000001F), 512 (0200) bytes

FB50868D 2877FF26 2D77FF26 065EC408 C48302C1 00109A50 16FB5086 8D5016FD ».P..P«.P...é..á.á^.&.w-&.w+..P« 000000
9A0676FF 0876FF08 6A006A00 6A0014E9 03750000 3DFB4E86 890000FF FF9A5016 .P.......N«=..u.Õ..j.j.j..v..v.. 000020
C4D88E03 03881L56 570004B2 C8CBC95F 5E1F0000 E9FB4E86 880AC483 FFFF0125 %....á...N«Õ...^_èùåÿ..WV.¡...Äá 000040
C4262F5F C426065E C40015E9 03750A47 08260847 88260C5F C4262F5F C426065E ^.&á_/&á_.&.G.&.G.u.Õ..á^.&á_/&á 000060
FF020036 FF261984 068E006A 006A00C0 E9000088 0006E903 7500067F 83260C5F _.&....u.Õ..¡..Õà.j.j.....&.Õ... 000080
76FF0E76 FF001DE9 03750E46 080C4688 00000321 9A5016FD A8868D02 58680A76 v.hX...`».P.¡....F..F.u.Õ...v..v 0000A0
86805016 FDA8868D 0014E90C C4830437 00889A50 16FB5086 8D5016FD A8868D0C ...`».P..P«.P...7..á.Õ....`».P.. 0000C0
065EC450 16FB5086 8D2B77FF 262D77FF 26065EC4 08C48303 4500109A 5016FB50 P«.P...E..á.á^.&.w-&.w+..P«.Pá^. 0000E0
14E90375 000030FB 4E868900 00FFFF9A 0877FF26 0A77FF26 0C5FC426 2F5FC426 &á_/&á_.&.w.&.w........N«=..u.Õ. 000100
0C5FC426 2F5FC426 065EC40A C4830392 01259A06 76FF0876 FF086A00 6A006A00 .j.j.j..v..v..%....á.á^.&á_/&á_. 000120
AB881E56 57000002 C8CBC95F 5E1F0000 E9FB4E86 88084789 260A4789 26000088 ¡..&.G.&.G...N«Õ...^_èùà...WV.¡ 000140
0000050A 9A505200 0005039A 006A036A 016A006A 016A006A 0000FE46 C7D88E03 ..ÄùF±..j.j.j.j.j.j......RP..... 000160
FF9A1676 FF1876FF 1276FF14 76FF0E76 FF1076FF 0A76FF0C 76FF0676 FF0876FF .v..v..v..v..v..v..v..v..v..v... 000180
46880000 FFFF9A50 520000FF FF9A006A 016A016A 006A016A 006AFE46 890000FF ....F±j.j.j.j.j.j.......RP......F 0001A0
03FC0103 00880001 02540103 00000003 04800002 000C90C8 C95F5E1F 0000E9FE ±Õ...^_èù..............Î........ 0001C0
04EF0203 02A30006 02F20203 00000010 04AF0002 0000000E 04200002 00900001 ...... ........£........`...É...ÿ. 0001E0

Dump of file SATURN:[PCCOMMON.DUMP.DLL]DAD.TMP;1 on 18-APR-1990 10:40:03.08
File ID (551,9,0)   End of file block 267 / Allocated 268

Virtual block number 32 (00000020), 512 (0200) bytes

04CC0103 00440004 03730203 00580001 04C50103 02AE0006 02350203 060E0009 ......S...Û...é...[...s...D...ä. 000000
FDC286C7 D88EFFFF 881E5657 00023EC8 00000000 00500004 04610203 005C0001 ..\...a...P.....à>..WV.¡...Äú.ô» 000020
D88689FD DA868900 0088FDCC 8689FDCE 86890000 88F84689 FA468900 00880000 ..¡...Fª.F½¡....ö»..ä»¡....Ö»..Ä 000040
46890000 88FC4689 FE468900 00880000 FDF286C7 FDC48689 FDC68689 000088FD »¡....ó»..á»ú.`»..¡...F±.F=¡...F 000060
0000FDD2 86C70000 F446C700 00FDD086 C7FDF686 89FDF886 89000088 F04689F2 `.Fb¡....½»..-»ú.Å»..úF¶..ú.@».. 000080
FDF086C7 FDEC8689 FDEE8689 000088FD D48689F0 D6868900 00880000 FDC886C7 ú.à»..¡....ø»..å»¡....Ý»..£»ú.Þ» 0000A0
0000FFFF 9A5016F8 46800676 FF0000FD F486C700 00F646C7 0000FDCA 86C70000 ..ú.ò»..úF-..ú.¶»...v..F%.P..... 0000C0
86893157 88262F47 8826F85E C4065FE9 FDC28688 0007E903 75000030 FDC28689 ..ó»=..u.Õ....ó»Õ_.á^½&.G/&.W1.. 0000E0
5FC426FD CC9EC4FD DA9689FD D886892D 57882628 478826F8 5EC4FDCE 9689FDCC à»..Õ»á^½&.G+&.W-..Ä»..Ö»á.ä»&á_ 000100
CC9EC40A 57892608 4789260A 56880846 880C5FC4 26FDCC9E C4000104 47C7260C .&úG...á.ä»&á_..F..V.&.G.&.W.á.ã 000120
B6FFFDC2 B6FF526A FDC28689 0000FFFF 9A5016FD DC868D08 77FF260A 77FF26FD »&.w.&.w...É».P.......ô»jR.Ñö».Ñ 000140
0374FDDE 8608FDDC 86880041 E9037400 003D08C4 8301C700 009AFDCC B6FFFDCE ö».Ña»...ù..á.=..t.ÕA...É»..B»t. 000160
E8868B00 13E90374 FDE68608 FDE48688 0020E903 74FDE286 08FDE086 88002DE9 Õ-...Å»..ã»t.Õ ...ô»..Ì»t.Õ....Ò 000180
6A006A08 76FF0A76 FFFDF086 89000088 0003E900 01880006 E90374FD EA8608FD »..ô»t.Õ..¡..Õ..¡....Þ».v..v.j.j 0001A0
03748490 FDC28E81 FDC28689 0000FFFF 9A5016FD F2868D50 16FDC486 8D016AFF .j...á».P..`».P.......ô».ƒó»..t. 0001C0
75000030 08C48302 1700009A FDCCB6FF FDCEB6FF FDC2B6FF 506A04E9 E90003E9 Õ..ÕÕ.jP.Ñö».Ño».Ña»......á.=..u 0001E0

Dump of file SATURN:[PCCOMMON.DUMP.DLL]DAD.TMP;1 on 18-APR-1990 10:40:03.08
File ID (551,9,0)   End of file block 267 / Allocated 268

Virtual block number 33 (00000021), 512 (0200) bytes

FFFDC686 FF0382E9 FDF2868B 0406E903 75FDC686 08FDC486 8804C8E9 0003E903 .Õ..Õà...á»..ó»u.Õ....`»Õ...Ñó». 000000
FDCEB6FF FDC2B6FF 506AFDC2 86890000 FFFF9A50 16F4468D 5016FC46 8DFDC486 Ñá».F».P.F¶.P.......ô»jP.Ñö».Ñö» 000020
FFFDD886 FFFDDAB6 FF0369E9 0003E903 75000030 08C48302 5500009A FDCCB6FF .Ñä»...U..á.=..u.Õ..Õi..ÑÖ».ÑÄ». 000040
B6FFFDCE B6FFFDC2 B6FF506A FDC28689 0000031C 9A5016FD 00868DFC 76FFFE76 v±.v=..Å».P.......ô»jP.Ñó».Ñö».Ñ 000060
D086FFF4 76FF501 F6468003 2BE90003 E9037500 003D08C4 8302F700 009AFDCC à»...¥..á.=..u.Õ..Õ+..F-.P.v¶.ÑÄ 000080
03750000 3DFDC286 8910C483 FFFF0727 9AFDCCB6 FFFDCEB6 FFFC76FF FE76FFFD ».v±.v=.Ñö».Ñä».'....á...ó»=..u. 0000A0
B80003E9 00018800 06E90375 00FDCABE 83000AE9 037400F6 7E8302FA E90003E9 Õ..Õº..--.t.Õ...ƒò».u.Õ..¡..Õ..¡ 0000C0
16FD0286 8D5016F0 468DFDC4 B6FFFDC6 B6FF0202 E90000F6 46C7FDCA 86890000 ....ò»úF-..Õ@..Ñó».Ñá».Fb.P..@». 0000E0
FDCEB6FF FDC2B6FF 506AFDC2 86890000 FFFF9A50 16FDC886 8D5016FD F6868050 P..-».P..à».P.......ô»jP.Ñó».Ñö» 000100
FFFDD886 FFFDDAB6 FF0289E9 0003E903 75000030 08C48303 3500009A FDCCB6FF .Ñä»...5..á.=..u.Õ..Õ...ÑÖ».ÑÄ». 000120
B6FFFDCE B6FFFDC2 B6FF506A FDC28689 0000FFFF 9A5016FD D08680F0 76FFF276 v`.vÞ..Å».P.......ô»jP.Ñó».Ñö».Ñ 000140
B6FFFDC8 B6FF5016 F6468002 4BE90003 E9037500 003D08C4 83FFFF00 009AFDCC à»......á.=..u.Õ..ÕK..F-.P.Ñà».Ñ 000160
5C16AA9A FDCCB6FF FDCEB6FF F076FFF2 76FFFDF6 B6FFFDF8 B6FFFD00 B6FFFD02 @».ÑÄ».Ñ½».Ñ-».v`.vÞ.Ño».Ñä».¨.\ 000180
FDCABE83 000AE903 7400F67E 830200E9 0003E903 75000030 FDC28689 16C48304 ..á...ó»=..u.Õ..Õ...~-.t.Õ...ƒò» 0001A0
FFFDC686 FF01E5E9 0000F646 C7FDCA86 89000088 0003E900 01880006 E9037500 .u.Õ..¡..Õ..¡....ò»úF-..Õ¡..Ñó». 0001C0
890000FF FF9A5016 FDC88680 5016FDF6 86805016 FD02868D 5016F046 8DFDC486 Ñá».Fb.P..@».P..-».P..à».P...... 0001E0
```

```
Dump of file SATURN:[PCCOMMON.DUMP.DLL]DAD.TMP;1 on 18-APR-1990 10:40:03.08
File ID (551,9,0)   End of file block 267 / Allocated 268

Virtual block number 34 (00000022), 512 (0200) bytes

 03E90375 00003D08 C4830422 00009AFD CCB6FFFD CEB6FFFD C2B6FF50 6AFDC286 .ô»jP.Ñô».Ñö».Ñä»..."..á.=..u.Õ. 000000
 C2868900 00023C7A 5016FD00 8680F076 FFF276FF FD08B6FF FDDAB6FF 019CE900 .Õ...ÑÖ».ÑÁ».v·.vÞ..Á».P.<.....ô 000020
 E90003E9 03750000 3008C483 04C00000 9AFDCCB6 FFFDCEB6 FFFDC2B6 FF506AFD »jP.Ñô».Ñö».Ñä»...â..á.=..u.Õ..Õ 000040
 76FFF276 FFFDF6B6 FFFDF8B6 FFFD00B6 FFFD02B6 FFFDC8B6 FF5016F6 468D015E ^..F-.P.Ñà».Ñø».ÑÀ».Ñ½».Ñ-».v·.v 000060
 0120E900 03E90375 00003DFD C2868916 C4830282 1F3F9AFD CCB6FFFD CEB6FFF0 Þ.Ñö».Ñä».?....â...ô»=..u.Õ..Õ . 000080
 FDCA8689 00008800 03E90001 880006E9 037500FD CABE8300 0AE90374 00F67E83 .—.t.Õ.../ô».u.Õ..¡..Õ..¡....ð» 0000A0
 6AFDC286 890000FF FF9A5016 FD048680 FDC4B6FF FDC6B6FF 00F8E900 00F646C7 úF-..Õ%..Ñó».Ñá»..Á».P.......ô»j 0000C0
 00C0E900 03E90375 00003D08 C4830529 00009AFD CCB6FFFD CEB6FFFD C2B6FF50 P.Ñô».Ñó».Ñä»...)..á.=..u.Õ..Õå. 0000E0
 00300CC4 83FFFF01 D49AFDCC B6FFFDCE B6FFFD04 B6FFFD06 B6FF5016 FDEC8680 ..ŝ».P.Ñø».ÑÀ».Ñö».Ñä».Å....á.=. 000100
 9A5016FD FA868001 F568F004 B6FFFDD6 B6FFFDD8 B6FFFDDA B6FF006E E9037500 .u.Õn..ÑÖ».ÑÁ».Ñø».ÑÂ»h%...ª».P. 000120
 003008C4 8305D700 009AFDCC B6FFFDCE B6FFFDC2 B6FF506A FDC28689 0000FFFF ......ô»jP.Ñô».Ñö».Ñä»...■..á.=. 000140
 8908C483 06094096 9AFDECB6 FFFDEEB6 FF5016FD FA868000 57E90003 E9037500 .u.Õ..ÕW...ª».P.ÑŸ».Ñš»..@...á.. 000160
 00043000 23E90026 E90029E9 0001FDCA 86C70032 E90003E9 03750000 30FDC286 .ô»=..u.Õ..Õ2.ú.ð»..Õ).Õ£.Õ#.=.. 000180
 FFD7E9FF 0BE90375 00203DFC 66E90375 00103DFE 2EE90375 00083DFD 49E90375 u.Õl»=..u.Õ.±=..u.Õf»= .u.Õ..Õ■. 0001A0
 C2868900 0001A09A 5016FDF2 86805016 FDC48680 006AFF6A 006A0876 FF0A76FF .v..v.j.j.j...á».P..·».P.......ô 0001C0
 FDCEB6FF FDC2B6FF 506A0021 E9037584 9DFDC2BE 81002CE9 037500FD C2BE83FD ».ƒô».u.Õ,..ƒô»..u.Õl.jP.Ñô».Ñö» 0001E0

Dump of file SATURN:[PCCOMMON.DUMP.DLL]DAD.TMP;1 on 18-APR-1990 10:40:03.08
File ID (551,9,0)   End of file block 267 / Allocated 268

Virtual block number 35 (00000023), 512 (0200) bytes

 7500FDCA 8E83FBED E90003E9 0003E903 7500003D 08C48306 1000009A FDCCB6FF .Ñä»......á.=..u.Õ..Õ..ÕÚ«.ƒô».u 000000
 9EC4FFFF 68FFFF68 FDCCB6FF FDCEB6FF 5016FDDC 86805016 FDF48680 00ABE903 .Õ¨...¶».P..É».P.Ñö».Ñä»h..h..á. 000020
 FDCEB6FF FDC2B6FF 526AFDC2 868914C4 83063704 A79A0877 FF260A77 FF26FDCC ä»&.w.&.w..Ī.7..á...ô»jR.Ñô».Ñö» 000040
 FF260A77 FF26FDCC 9EC4002E E9037500 FDF08E83 08C48306 6C00009A FDCCB6FF .Ñä»...l..á../Þ».u.Õ..á.ä»&.w.&. 000060
 C483069A 00009AFD CCB6FFFD CEB6FFFD C2B6FF52 6AFDC286 890000FF FF9A0877 w........ô»jR.Ñô».Ñö».Ñä»......á 000080
 FFFDC2B6 FF526AFD C2868900 00FFFF9A 0877FF26 0A77FF26 FDCC9EC4 002BE908 .Õ÷.á.ä»&.w.&.w........õ»jR.Ñô». 0000A0
 CC9EC400 000447C7 260C5FC4 26FDCC9E C408C483 01390000 9AFDCCB6 FFFDCEB6 Ñö».Ñä»...9..á.á.ä»&á_.&úG...á.ä 0000C0
 0039E903 740A4708 260847B8 260C5FC4 26FDCC9E C4000006 47C7260C 5FC426FD »&á_.&úG...á.ä»&á_.&.Ḡ.&.G.t.Õ9. 0000E0
 9AFDCCB6 FFFDCEB6 FFFDC2B6 FF506AFD C2868900 00FFFF9A FDD8B6FF FDDAB6FF .ÑÖ».ÑÁ»........õ»jP.Ñô».Ñö».Ñä». 000100
 5FC426FD CC9EC400 13E9001C E9FDC286 880007E9 03750000 3008C483 03E40000 ..ð..á.=..u.Õ....ö»Õ..Õ..á.ä»&á_ 000120
 08881E56 5700019A C8C8C95F 5E1F0000 E90000B8 08478926 0A478926 0000880C .¡..&.G.&.G.¡..Õ...^_èùà...WV.¡. 000140
 88FF5A86 89FF5C86 890000B8 FEC68689 FEE88689 00008800 00FE8A86 C7D88E00 ..Áú.¤±..¡....à±..ó±¡....\...2.¡ 000160
 00B8FEDE 8689FEE0 86890000 B8F44689 F6468900 00B8FEC0 8689FEC2 86890000 ....ó±..ä±¡...F-.F¶¡....Á±..B±¡. 000180
 89DE4689 0000B8FE 848689FE B6868900 00B800FE C486C6FE E68689FE E8868900 ...Õ±..Ì±ó.á±.¡....Ñ±..Ç±¡...FB. 0001A0
 8689FEBE 86890000 B80000FE 8286C700 00FEB886 C7D44689 D6468900 00B8DC46 FÉ¡...Fø.Fåú.¡±..ú.ý±..¡..../±.. 0001C0
 890000B8 000BFEEA 66C7FEDA 8689FEDC 86890000 B8E04689 E2468900 00B8FEBC ¥±¡...Fã.FÁ¡....É±..Õ±ú.õ±..¡... 0001E0

Dump of file SATURN:[PCCOMMON.DUMP.DLL]DAD.TMP;1 on 18-APR-1990 10:40:03.08
File ID (551,9,0)   End of file block 267 / Allocated 268

Virtual block number 36 (00000024), 512 (0200) bytes

 86892057 88262847 88261FC4 26065EC4 FEE28689 FEE48689 0000B8D8 46890A46 FÖ.FÁ¡....õ±..ã±á^.&á.&.G+&.W-.. 000000
 0A76FF0C 76FFFEC6 86FFFEC8 86FF00D5 E9104688 0E6CE90E 468BFEC8 9689FEC6 ó±..Á±.F.Õl..F.Õf..Ñà±.Ñó±.v..v. 000020
 009A0676 FF0876FF FEBA86FF 506AFEBA 86890000 FFFF9A50 16FE6686 8D1076FF .v...f±.P.......¤±jP.Ñ¤±.v..v... 000040
 8D0277FF 261FC426 065EC40E 60E9FEBA 86880007 E9037500 003D08C4 83086000 .m..á.=..u.Õ....¤±Õ`.á^.&á.&.w.. 000060
 8306F200 009A0676 FF0876FF FEBA86FF 4E6AFEBA 86890000 FFFF9A50 16FF5A86 .Z..P.......¤±jN.Ñ¤±.v..v....·.. 000080
 076A0200 36FF2619 86068E00 6A006A0E 24E9FEBA 86880007 E9037500 003D08C4 á.=..u.Õ....¤±Õ$.j.j.....&.6..j. 0000A0
 EC868D00 5E681E50 16FF5E86 8D5016FE 66868D00 00FFFF9A 5016FF5E 868D6E6A jn..^..P.......f±.P..^..P.h^...š 0000C0
 11E90000 FFFF9A50 16FEEC86 8DFF5AB6 FFFF5C86 FF10C483 FFFF0088 9A5016FE ±.P......á..Ñ\..Ñ2...š±.P.....Õ. 0000E0
 16FEC086 8D0196E9 10468800 8AE9FFEF E9FF23E9 0375002F 3D0008E9 000EE900 .Õ..Õ..=/.u.Õ#.Õÿ.Õ¤..F.Õ....à±. 000100
 125EC400 CEE90375 0000300C C48304E9 00009A06 76FF0876 FF0A76FF 0C76FF50 P.v..v..v..v....Õ..á.=..u.Õö.á^. 000120
 0000081A 9A5016E4 468D1076 FF0A76FF 0C76FFFE C6B6FFFE C8B6FF00 0107C726 &ú....Ñà±.Ñó±.v..v..v..FÕ.P..... 000140
 0007E903 7500003D 08C48308 3100009A 0676FF08 76FFFEBA B6FF506A FEBA8689 ..¤±jP.Ñ¤±.v..v....1..á.=..u.Õ.. 000160
 89FECE86 89EA568B E84688FE CC9689FE CA8689E6 568BE446 88004EE9 FEBA868B ..¤±ÕN..FÕ.Vl..ð±..ã±.FÕ.VÕ..ö±. 000180
 8DFED896 89FED686 89F2568B F04688FE D49689FE 028689EE 568BEC46 88FED096 .Á±.Fš.VŸ..ø±..å±.FÞ.V·..ø±..Ä±. 0001A0
 07E90375 00003DFE BA868908 C48309C3 128F9AFE C0B6FFFE C2B6FF50 16FECA86 .ð±.P.Ñó±.Ñä±.¢.û..á...¤±=..u.Õ. 0001C0
 7500003D FEBA8689 04C48305 4A0F639A FEC0B6FF FEC2B6FF 0CEDE9FE 8A868B00 ...¤±ÕÚ..Ñó±.Ñâ±.c.J..á...¤±=..u 0001E0
```

```
Dump of file SATURN:[PCCOMMON.DUMP.DLL]DAD.TMP;1 on 18-APR-1990 10:40:03.08
File ID (551,9,0)   End of file block 267 / Allocated 268

Virtual block number 37 (00000025), 512 (0200) bytes

 0676FF08 76FF0A76 FF0C76FF 5016FEC0 86800086 E90CCAE9 FEBA8688 0007E903 .Ö....¤±Öb.ÖR...â±.P.v..v..v..v. 000000
 FEC686FF FEC884FF 000107C7 26125EC4 0078E903 75000030 0CC4830A B100009A ...Ÿ..é.=..u.Öx.é^.&ú....Ñà±.Ñó± 000020
 76FFFEBA B6FF5U6A FEBA8689 00000ADD 9A5016FE 66868D10 76FF0A76 FF0C76FF .v..v..v...f±.P.Ì.....¤±jP.Ñ¤±.v 000040
 16FE6686 8D0C5AE9 FEBA8688 0007E903 75000030 08C4830A F400009A 0676FF08 ..v....¶..é.=..u.Ö....¤±ÖZ...f±. 000060
 07E90375 000030:: BA868908 C483082E 40969A0A 77FF260C 77FF26FE C09EC450 Pé.â±&.w.&.w...ã...é...¤±=..u.Ö. 000080
 5AE90375 000A30:: 55E90375 00023000 13E90016 E90019E9 0C2DE9FE BA868800 ...¤±Ö-.Ö..Ö..Ö..=..u.ÖU.=..u.ÖZ 0000A0
 9C9A0676 FF0876FF 0A76FF0C 76FF5016 F4468D03 27E91046 880C08E9 FFE7E9FE ±ÖÖ.Ö...F.Ö'..F¶.P.v..v..v..v... 0000C0
 76FFFEC6 B6FFFEC8 B6FF0001 07C72612 5EC40088 E9037500 00300CC4 830B5D00 .]..é.=..u.Ö..é^.&ú....Ñà±.Ñó±.v 0000E0
 76FF0876 FFFEBA86 FF506AFE BA868900 0008899A 5016F846 801076FF 0A76FF0C ..v..v..F%.P.......¤±jP.Ñ¤±.v..v 000100
 4689FA56 88F84688 0B90E9FE BA868800 07E90375 00003008 C48308A0 00009A06 .......é.=..u.Ö....¤±Ö...F%.V°.F 000120
 0BDA2830 9AF476FF F676FF50 16CC4680 D25689D0 4689FE56 88FC4688 CE5689CC ä.Vö.F=.V±.FÅ.V0.Fä.P.v-.v¶.=+Ö. 000140
 76FF5016 F4468D02 A6E9085F E9FEBA86 880007E9 03750000 30FEBA86 8908C483 .é...¤±=..u.Ö....¤±Ö_.Ö1..F¶.P.v 000160
 07C72612 5EC40088 E9037500 00300CC4 830C0900 9C9A0676 FF0876FF 0A76FF0C ..v..v..v.......é.=..u.Ö..é^.&ú. 000180
 BA868900 000C369A 5016F846 801076FF 0A76FF0C 76FFFEC6 B6FFFEC8 86FF0001 ...Ñà±.Ñó±.v..v..v..F%.P.6.....¤ 0001A0
 BA868800 07E90375 00003008 C4830C40 00009A06 76FF0876 FFFEBA86 FF506AFE ±jP.Ñ¤±.v..v....M..é.=..u.Ö....¤ 0001C0
 16CC4680 D25689D0 4689FE56 88FC4688 CE5689CC 4689FA56 88F84688 0AF1E9FE ±Öp..F%.V°.Fä.Vö.F=.V±.FÅ.V0.Fä. 0001E0
```

```
Dump of file SATURN:[PCCOMMON.DUMP.DLL]DAD.TMP;1 on 18-APR-1990 10:40:03.08
File ID (551,9,0)   End of file block 267 / Allocated 268

Virtual block number 38 (00000026), 512 (0200) bytes

 E9FEBA86 880007E9 03750000 30FEBA86 8908C483 0C752888 9AF476FF F676FF50 P.v-.v¶.¡(u..é...¤±=..u.Ö....¤±Ö 000000
 00300CC4 830CA400 9C9A0676 FF0876FF 0A76FF0C 76FF5016 F4468001 FAE90AB3 ^.Ö°..F¶.P.v..v..v..v....É..é.=. 000020
 801076FF 0A76FF0C 76FFFEC6 B6FFFEC8 B6FF0001 07C72612 5EC40077 E9037500 .u.Öw.é^.&ú....Ñà±.Ñó±.v..v..v.. 000040
 830CE800 009A0676 FF0876FF FEBAB6FF 506AFEBA 86890000 0CD19A50 16FE6686 .f±.P.l.....¤±jP.Ñ¤±.v..v....Ö.. 000060
 FF260C77 FF26F45E C45016FE 6686800A 44E9FEBA 86880007 E9037500 003D08C4 é.=..u.Ö....¤±ÖD...f±.Pé^¶&.w.&. 000080
 015FE90A 18E9FEBA 86880007 E9037500 0030FEBA 868908C4 83008840 969A0A77 w...ã...é...¤±=..u.Ö....¤±Ö..Ö . 0000A0
 72E90375 0000300C C483003A 009C9A06 76FF0876 FF0A76FF 0C76FF50 16F44680 .F¶.P.v..v..v..v....:..é.=..u.Ör 0000C0
 5016FEC4 86801076 FF0A76FF 0C76FFFE C686FFFE C886FF00 0107C726 125EC400 .é^.&ú....Ñà±.Ñó±.v..v..v...â±.P 0000E0
 00003008 C4830943 00009A06 76FF0876 FFFEBA86 FF506AFE BA868900 00092C9A .,.....¤±jP.Ñ¤±.v..v....C..é.=.. 000100
 06C48309 A02EE29A F476FFF6 76FF5098 FEC4868A 09A9E9FE BA868800 07E90375 u.Ö....¤±Ö`...â±.P.v-.v¶.ã....é. 000120
 76FF0C76 FF5016F4 468D00C9 E90982E9 FEBA8688 0007E903 75000030 FEBA8689 ..¤±=..u.Ö....¤±Ö..Öè..F¶.P.v..v 000140
 FF000107 C726125E C40074E9 03750000 300CC483 0900009C 9A0676FF 0876FF0A ..v..v.......é.=..u.Öt.é^.&ú.... 000160
 6AFEBA86 8900000E 3A9A5016 FEB48680 1076FF0A 76FF0C76 FFFEC686 FFFEC886 Ñà±.Ñó±.v..v..v...Ç±.P.:.....¤±j 000180
 E9FEBA86 880007E9 03750000 3008C483 0E510000 9A0676FF 0876FFFE BAB6FF50 P.Ñ¤±.v..v....Q..é.=..u.Ö....¤±Ö 0001A0
 03E90001 B80006E9 037700FE B4BE8300 0AE9037E 0015E903 7D00FEB6 BE830913 .../Ñ±.).Ö..-.Ö.../Ç±.w.Ö..¡..Ö. 0001C0
 75000330 FE29E903 75000230 002BE900 2EE90031 E9184789 26F45EC4 00008800 .¡..é^¶&.G.Ö1.Ö..Ö+.=..u.Ö)±=..u 0001E0
```

```
Dump of file SATURN:[PCCOMMON.DUMP.DLL]DAD.TMP;1 on 18-APR-1990 10:40:03.08
File ID (551,9,0)   End of file block 267 / Allocated 268

Virtual block number 39 (00000027), 512 (0200) bytes

 E9FFCFE9 FD5DE903 75000830 FCB9E903 75000930 FEB4E903 75000630 FF52E903 .ÖR.=..u.ÖÇ±=..u.Ö¿==..u.Ö)»Öü.Ö 000000
 830F4601 389A0676 FF0876FF 0A76FF0C 76FF5016 FEDE868D 0278E910 468808AD Ü..F.Öx...â±.P.v..v..v..v..8.F.. 000020
 0A76FF0C 76FFFEC6 B6FFFEC8 B6FF0001 07C72612 5EC40114 E9037500 00300CC4 é.=..u.Ö..é^.&ú....Ñà±.Ñó±.v..v. 000040
 009A0676 FF0876FF FEBAB6FF 506AFEBA 86890000 0F739A50 16FEB486 8D1076FF .v...Ç±.P.s.....¤±jP.Ñ¤±.v..v... 000060
 7E0015E9 037D00FE B6BE8308 40E9FEBA 86880007 E9037500 003008C4 830EC600 .é..é.=..u.Ö....¤±Öã../Ñ±.).Ö..~ 000080
 26FEDE9E C4FEB886 89000088 0003E900 01880006 E9037701 FEB4BE83 000AE903 .Ö.../Ç±.w.Ö..¡..Ö..¡....¡±é.â±& 0000A0
 E89AFEB8 B6FF006A 1E77FF26 1A77FF26 FEDE9EC4 0041E903 751A4708 261847B8 .G.&.G.u.ÖA.é.â±&.w.&.w.j..Ñ¡±.Ö 0000C0
 03750000 3008C483 0F1A0000 9A0676FF 0876FFFE BAB6FF52 6AFEBA86 E??0000F .....¤±jR.Ñ¤±.v..v.......é.=..u. 0000E0
 9EC40040 E9037522 47082620 47B826FE DE9EC400 51E907CB E9FEBA86 880.07E9 Ö....¤±Öü.ÖQ.é.â±&.G &.G"u.Öã.é. 000100
 BAB6FF52 6AFEBA86 89000010 3C9AFEB8 B6FF016A 006A2077 FF262277 FF26.EDE â±&.w"&.w j.j..Ñ¡±.<.....¤±jR.Ñ¤ 000120
 52E90777 E9FEBA86 880007E9 03750000 3008C483 0F8A0000 9A0676FF 0876FFFE ±.v..v.......é.=..u.Ö....¤±Öw.ÖR 000140
 03750000 300CC483 10E50138 9A0676FF 0876FF0A 76FF0C76 FF5016FE DE868D01 ...â±.P.v..v..v..v..8.Ì..é.=..u. 000160
 FEB48680 1076FF0A 76FF0C76 FFFEC686 FFFEC886 FF000107 C726125E C40114E9 Ö..é^.&ú....Ñà±.Ñó±.v..v..v...Ç± 000180
 3008C483 0FFF0000 9A0676FF 0876FFFE BAB6FF50 6AFEBA86 8900000A 209A5016 .P. .....¤±jP.Ñ¤±.v..v.......é.= 0001A0
 B4BE8300 0AE9037E 0015E903 7D00FEB6 BE830707 E9FEBA86 880007E9 03750000 ..u.Ö....¤±Ö.../Ñ±.).Ö..-.Ö.../Ç 0001C0
 1A470826 18478826 FEDE9EC4 FEB88689 00008800 03E90001 B80006E9 037701FE ±.w.Ö..¡..Ö..¡....¡±é.â±&.G.&.G. 0001E0
```

```
Dump of file SATURN:[PCCOMMON.DUMP.DLL]DAD.TMP;1 on 18-APR-1990 10:40:03.08
File ID (551,9,0)   End of file block 267 / Allocated 268

Virtual block number 40 (00000028), 512 (0200) bytes

 FEBA8689 0000FFFF 9AFE8886 FF006A18 77FF261A 77FF26FE DE9EC400 41E90375 u.ÕA.á.B±&.w.&.w.j..Ñ¡±.......¤± 000000
 FEBA8688 0007E903 75000030 08C48310 5300009A 0676FF08 76FFFEBA B6FF526A jR.Ñ¤±.v..v....S..á.=..u.Õ....¤± 000020
 262277FF 26FEDE9E C40040E9 03752247 08262047 8826FEDE 9EC40051 E90692E9 Õ..Õ¤.á.B±&.G &.G"u.Õ¤.á.B±&.w"& 000040
 0676FF08 76FFFEBA B6FF526A FEBA8689 0000FFFF 9AFE8886 FF006A00 6A2077FF .w j.j..Ñ¡±.......¤±jR.Ñ¤±.v..v. 000060
 0013E900 16E90019 E9063EE9 FEBA8688 0007E903 7500003D 08C48310 8A00009A ...¤..á.=..u.Õ....¤±Õ>.Õ..Õ..Õ.. 000080
 FEC886FF 02D5E910 46880619 E9FFE7E9 FEB1E903 7500063D FD80E903 7500033D =..u.Õ.»=..u.ÕY±ÕÕ.Õ...F.Õf..Ñà± 0000A0
 BAB6FF50 6AFEBA86 890000FF FF9A5016 FEBC868D 036A0A76 FF0C76FF FEC686FF .Ñó±.v..v.j...¥±.P.......¤±jP.Ñ¤ 0000C0
 86800507 E9FEBA86 880007E9 03750000 3008C483 0A370000 9A0676FF 0876FFFE ±.v..v....7..á.=..u.Õ....¤±Õ«... 0000E0
 E9037500 00300CC4 8309F301 389A0676 FF0876FF FEBC86FF FEBE86FF 5016FEDE B±.P.Ñ/±.Ñ¥±.v..v..B.µ..á.=..u.Õ 000100
 16E04680 0C6AFEBC 86FFFEBE B6FFFEC6 B6FFFEC8 B6FF0001 07C72612 5EC40266 f.á^.&ú....Ñà±.Ñó±.Ñ/±.Ñ¥±j..FÅ. 000120
 003D08C4 83007E00 009A0676 FF0876FF FEBA86FF 506AFEBA 86890000 FFFF9A50 P.......¤±jP.Ñ¤±.v..v....-..á.=. 000140
 FF9A5016 0C468020 77FF2622 77FF26FE DE9EC405 68E9FEBA 86880007 E9037500 .u.Õ....¤±Õh.á.B±&.w"&.w .FÉ.P.. 000160
 880C4688 00468902 46890000 88CC4689 CE468900 0088052B E9FEBA86 880007E9 .....¤±jR.Ñ¤±.v..v....'..á.=..u. 000180
 00022DE2 5688E046 8800FEDC 968301FE DA868300 0AE9FEDC 9689FEDA 86890E56 Õ....¤±Õ+.j...Fö.Fä¡...F●.FÅ.FÉ. 0001A0
 FF26FEDE 9EC40046 E90377FE DA863800 09E9037E 0054E903 7DFEDC96 38000A83 V8..O±..É±Õ....Õ±...É±..FÅ.Vã-.. 0001C0
                                                                          .Õ.;.É±).ÕT.-.Õ..;.Õ±w.ÕF.á.B±&. 0001E0

Dump of file SATURN:[PCCOMMON.DUMP.DLL]DAD.TMP;1 on 18-APR-1990 10:40:03.08
File ID (551,9,0)   End of file block 267 / Allocated 268

Virtual block number 41 (00000029), 512 (0200) bytes

 FEBA86FF 526AFEBA 86890000 FFFF9A50 16CC468D 016A016A 006A2077 FF262277 w"&.w j.j.j..Fä.P.......¤±jR.Ñ¤± 000000
 FF80E904 98E9FEBA 86880007 E9037500 003D08C4 83127800 009A0676 FF0876FF .v..v....x..á.=..u.Õ....¤±Õ..Õ.. 000020
 56880C46 8800FEDC 968301FE DA868300 0AE9FEDC 9689FEDA 8689E256 88E04588 .FÅ.Vã..Õ±..É±Õ....Õ±...É±..FÉ.V 000040
 9EC40041 E90377FE DA863800 09E9037E 004FE903 7DFEDC96 38000283 0002050E B....●.;.É±).ÕÕ.-.Õ..;.Õ±w.ÕA.á. 000060
 FFFEBAB6 FF526AFE BA868900 00FFFF9A 006A016A 006A2077 FF262277 FF26FEDE B±&.w"&.w j.j.j.........¤±jR.Ñ¤±. 000080
 FFFF92E9 0419E9FE BA868800 07E90375 00003008 C483128C 00009A06 76FF0876 v..v....¥..á.=..u.Õ....¤±Õ..Õ... 0000A0
 FF506AFE BA868900 0012E79A 50160446 80046A0A 76FF0C76 FFFEC686 FFFEC886 Ñà±.Ñó±.v..v.j..FÅ.P.Ó.....¤±jP. 0000C0
 030SE9FE BA868800 07E90375 00003008 C48312FE 00009A06 76FF0876 FFFEBAB6 Ñ¤±.v..v....±..á.=..u.Õ....¤±Õf. 0000E0
 6AFEBA86 89000013 B69A5016 F8468010 76FF0A76 FF0C76FF FEC686FF FEC886FF .Ñà±.Ñó±.v..v..v..F½.P.Ñ.....¤±j 000100
 E9FEBA86 880007E9 03750000 3008C483 13CD0000 9A0676FF 0876FFFE BAB6FF50 P.Ñ¤±.v..v....ë..á.=..u.Õ....¤±Õ 000120
 D476FF06 76FFD256 89004689 FE5688FC 4688CE56 89CC4689 FA5688F8 46880393 ...F½.V'.Fä.Vö.F=.V±.FÅ.V●.v●.vå 000140
 07E90375 000030FE BA86890C C483142A 36309AFE DEB6FFFE E0B6FF50 16CC4680 .Fà.P.ÑÅ±.ÑB±.06*..á...¤±=..u.Õ. 000160
 880330E9 FFEFE9FD 23E90375 00023000 08E9000E E90011E9 0340E9FE BA868800 ...¤±ÕM.Õ..Õ..Õ..=..u.Õ#»Õÿ.ÕÕ.. 000180
 300CC483 145A01D4 9A0676FF 0876FF0A 76FF0C76 FF5016FE E6868001 60E91046 F.Õm...ì±.P.v..v..v..v..å.Z..á.= 0001A0
 1076FF0A 76FF0C76 FFFEC686 FFFEC886 FF000107 C726125E C400ABE9 03750000 ..u.Õ¨.á^.&ú....Ñà±.Ñó±.v..v..v. 0001C0
 83149E00 009A0676 FF0876FF FEBAB6FF 506AFEBA 86890000 14879A50 16E4468D .FÕ.P.......¤±jP.Ñ¤±.v..v....... 0001E0

Dump of file SATURN:[PCCOMMON.DUMP.DLL]DAD.TMP;1 on 18-APR-1990 10:40:03.08
File ID (551,9,0)   End of file block 267 / Allocated 268

Virtual block number 42 (0000002A), 512 (0200) bytes

 88FECC96 89FECA86 89E65688 E4468802 C4E9FEBA 86880007 E9037500 003D08C4 á.=..u.Õ....¤±Õá..FÕ.VÌ..Õ±..ä±. 000000
 5688F046 88FED496 89FED286 89EE5688 EC4688FE D09689FE CE8689EA 5688E846 FÕ.Võ..ö±..Å±.F§.VŸ..●±..å±.FÞ.V 000020
 8908C483 14C1447A 9AFEE686 FFFEE886 FF5016FE CA8680FE D89689FE D68689F2 ·..●±..Ä±..ò±.P.ÑÕ±.Ñì±.zÕé..á.. 000040
 76FF0C76 FF5016FE E6868000 80E90263 E9FEBA86 880007E9 03750000 30FEBA86 .¤±=..u.Õ....¤±Õc.Õ¯...ì±.P.v..v 000060
 FF000107 C726125E C40072E9 03750000 300CC483 0E0001D4 9A0676FF 0876FF0A ..v..v..å....á.=..u.Õr.á^.&ú.... 000080
 6AFEBA86 89000000 679A5016 FEEA868D 1076FF0A 76FF0C76 FFFEC686 FFFEC886 Ñà±.Ñó±.v..v..v...õ±.P.g.....¤±j 0000A0
 E9FEBA86 880007E9 03750000 3008C483 11290000 9A0676FF 0876FFFE BAB6FF50 P.Ñ¤±.v..v....)..á.=..u.Õ....¤±Õ 0000C0
 E9037500 0030FEBA 868906C4 830A6048 009AFEE6 86FFFEE8 86FFFEEA 86FF01F3 µ..Ñõ±.ÑÕ±.Ñì±..H'..á...¤±=..u.Õ 0000E0
 E9037500 0530FE88 E9037500 04300013 E90016E9 0019E901 CCE9FEBA 86880007 ....¤±Õä.Õ..Õ..Õ..=..u.Õ.±=..u.Õ 000100
 801076FF 0A76FF0C 76FFFEC6 B6FFFEC8 B6FF0156 E9104688 01A7E9FF E7E9FF53 S.ÕÕ.ÕI..F.ÕV..Ñà±.Ñó±.v..v..v.. 000120
 83158600 009A0676 FF0876FF FEBAB6FF 506AFEBA 86890000 12A59A50 16FEC486 .á±.P.E.....¤±jP.Ñ¤±.v..v....... 000140
 03E90001 880006E9 037459FE C48E8001 64E9FEBA 86880007 E9037500 003D08C4 á.=..u.Õ....¤±Õd../á±Yt.Õ..¡..Õ. 000160
 FF9A5016 FEE2868D 096A0A76 FF0C76FF FEC686FF FEC886FF FEB28689 00008800 .¡....ÿ±.Ñà±.Ñó±.v..v.j...ä±.P.. 000180
 03750000 3008C483 11660000 9A0676FF 0876FFFE BAB6FF50 6AFEBA86 890000FF .....¤±jP.Ñ¤±.v..v....f..á.=..u. 0001A0
 03750247 08260788 26085EC4 DA568908 4689FEE4 9688FEE2 8688006A E90003E9 Õ..Õj...ä±..Õ±.FÄ.VÕá^Ä&..&.G.u. 0001C0
 0CC48313 8A009C9A 0676FF08 76FF37FF 260277FF 26085EC4 5016F446 80004DE9 ÕM..F¶.Pá^Ä&.w.&.7.v..v.......á. 0001E0
```

Dump of file SATURN:[PCCOMMON.DUMP.DLL]DAD.TMP;1 on 18-APR-1990 10:40:03.08
File ID (551,9,0) End of file block 267 / Allocated 268

Virtual block number 43 (0000002B), 512 (0200) bytes

```
003DFEBA 868906C4 83134030 379AF476 FFF676FF FEB2B6FF 0021E903 75000030 =..u.Ô1..Ãý±.v-.v¶.70a..á...¤±=. 000000
C8B6FF00 2DE90375 FEE48608 FEE28688 FFA4E904 D8468300 07E90003 E9037500 .u.Ô..Ô...FÁ.ÔÉ...â±..Ô±u.Ô-..Ãà 000020
FF0876FF FEBA86FF 506AFEBA 86890000 FFFF9AFE E2B6FFFE E4B6FFFE C6B6FFFE ±.Ãô±.Ãô±.Ãâ±.......¤±jP.Ã¤±.v.. 000040
0EE90011 E9005AE9 FEBA868B 0007E903 7500FEBA BE8308C4 83152000 009A0676 v....-..á../ƒ¤±.u.Ô....¤±ÔZ.Ô..Ô. 000060
03760011 3000012D 0037E900 3AE9003D E9FFEFE9 FEA2E903 75000430 0008E900 .Ô..=..u.ÔÁ±Ôÿ.Ô=.Ô:.Ô7.-..=..v. 000080
62166214 F8108616 62166216 6200F20A 9708E507 FC1678A7 FF2E93C0 03FFEFE9 Ôÿ..á...Ì(.=.Ì...'.b.b.b...½.b.b 0000A0
56570000 2AC8CBC9 5F5E1F00 00E90000 88136F16 62166216 62166216 62166216 .b.b.b.b.b.b.o.¡..Ô...^_èùÂ°..WV 0000C0
000088EC 4689EE46 89000088 DA46890C 46890000 880000D8 46C7D88E 072F881E .¡/..ÄúFÁ..¡...FÉ.FÔ¡...FŸ.F$¡.. 0000E0
4689E246 89000088 F44689F6 46890000 88F84689 FA468900 0088FC46 89FE4689 .F±.F=¡...F°.F½¡...F-.F¶¡...Fã.F 000100
00DE46C6 E84689EA 46890000 88E44689 E6468900 0088F046 89F24689 00007888E0 Á¡...F·.FÞ¡...FÌ.FÔ¡...FÕ.FÒ6FB. 000120
FF0876FF 0E76FF10 76FF5016 DA468000 C2E91446 8807E6E9 12468800 000646C7 úF=...F.ÔÌ..F.Ôò..FÔ.P.v..v..v.. 000140
FF50160A 46800001 07C72618 5EC40032 E9037400 00300CC4 83178800 009A0676 v.......á.=..t.Ô2.á^.&ú....FÔ.P. 000160
46880006 E9037500 0030D846 890CC483 FFFF085F 9A0E76FF 1076FF06 76FF0876 v..v..v..v.._....á..FÁ=..u.Ô...F 000180
0CC48315 C801D49A 0676FF08 76FF0E76 FF1076FF 5016E846 8D007FE9 07C6E908 ÄÔ6.Ô...FÔ.P.v..v..v..v..Å.ü..á. 0001A0
6A006A00 6A006A00 6A006A50 16E84680 000107C7 26185EC4 0042E903 74000030 =..t.Ô8.á^.&ú....FÔ.Pj.j.j.j.j.j 0001C0
75000030 D846891C C483183C 41849A0E 76FF1076 FF006A00 6A0676FF 0876FF00 ..v..v.j.j..v..v...A<..á..FÁ=..u 0001E0
```

Dump of file SATURN:[PCCOMMON.DUMP.DLL]DAD.TMP;1 on 18-APR-1990 10:40:03.08
File ID (551,9,0) End of file block 267 / Allocated 268

Virtual block number 44 (0000002C), 512 (0200) bytes

```
03750018 30FF8CE9 03750015 300013E9 0016E900 19E90760 E9D84688 0006E903 .Ô...FÄÔ'.Ô..Ô..Ô..=..u.Ô..=..u. 000000
0676FF08 76FF0A76 FF0C76FF 5016DA46 8D01EDE9 14468807 38E9FFE7 E9FF2EE9 Ô..Ôô.Ô;..F.ÔÚ..FÔ.P.v..v..v..v. 000020
0876FF50 160A468D 000107C7 26185EC4 0032E903 7400003D 0CC48318 6900009A ...i..á.=..t.Ô2.á^.&ú....FÔ.P.v. 000040
E9D84688 0006E903 75000030 D846890C C4831883 085F9A0A 76FF0C76 FF0676FF .v..v..v.._.°..á..FÁ=..u.Ô...FÄÔ 000060
0030DCC4 83188A00 9C9A0676 FF0876FF 0E76FF10 76FF5016 FC468001 8AE906E8 Ô.Ôα..F=.P.v..v..v..v.......á.=. 000080
3D0CC483 18E00000 9A0676FF 0876FF0A 76FF0C76 FF50160A 46800053 E9037400 .t.ÔS..FÔ.P.v..v..v..v....Á..á.= 0000A0
0E76FF10 76FFDA76 FFDC76FF 5016FC46 8D000107 C726185E C40032E9 03750000 ..u.Ô2.á^.&ú....F=.P.vÉ.vÔ.v..v. 0000C0
160A468D 0143E906 71E9D846 880006E9 03750000 30D84689 0CC4831A 76173F9A .?.v..á..FÁ=..u.Ô...FÄÔq.ÔC..FÔ. 0000E0
EC468D00 69E90375 0000300C C4831901 00009A06 76FF0876 FF0A76FF 0C76FF50 P.v..v..v..v.......á.=..u.Ôi..F$ 000100
5EC40048 E9037500 0030DCC4 83196000 009A0676 FF0876FF 0E76FF10 76FF5016 .P.v..v..v..v....m..á.=..u.ÔH.á^ 000120
0107C726 185EC400 20E90375 26573926 0009E903 74244739 26EE5688 EC46880A Ô.F$.VY&9G$t.Ô..&9W&u.Ô-.á^.&ú.. 000140
0006E903 75000030 D8468908 C48319CD 1A9E9ADA 76FFDC76 FFEC76FF EE76FF00 ..vŸ.v$.vÉ.vO...ë..á..FÁ=..u.Ô.. 000160
83198E00 009A0676 FF0876FF 0A76FF0C 76FF5016 EC468000 86E905E4 E9D84688 .FÄÔÔ.ÔÑ..F$.P.v..v..v..v....... 000180
1A2C0000 9A0676FF 0876FF0E 76FF1076 FF50160A 46800069 E9037500 0030DCC4 á.=..u.Ôi..FO.P.v..v..v..v...... 0001A0
57392600 09E90374 24473926 EE5688EC 46880A5E C40048E9 03750000 300CC483 .á.=..u.ÔH.á^O.F$.VY&9G$t.Ô..&9W 0001C0
8315E51A 9E9ADA76 FFDC76FF EC76FFEE 76FF0001 07C72618 5EC4002D E9037526 &u.Ô-.á^.&ú....vŸ.v$.vÉ.vO...Ì.. 0001E0
```

Dump of file SATURN:[PCCOMMON.DUMP.DLL]DAD.TMP;1 on 18-APR-1990 10:40:03.08
File ID (551,9,0) End of file block 267 / Allocated 268

Virtual block number 45 (0000002D), 512 (0200) bytes

```
75000F30 0023E900 26E90029 E90557E9 D8468800 06E90375 00003D08 468908C4 á..FÁ=..u.Ô...FÄÔW.Ô).Ô&.Ô#.=..u 000000
E9FFD7E9 FF4DE903 75001430 FE51E903 75001230 FE03E903 75001030 FED8E903 .ÔÁ±=..u.Ô.±=..u.Ô¤±=..u.ÔM.Ô=.Ô 000020
C4831A4D 009C9A06 76FF0876 FF0A76FF 0C76FF50 16FC4680 0233E914 46880522 "..F.Ô3..F=.P.v..v..v..v....M..á 000040
831AA300 009A0676 FF0876FF 0E76FF10 76FF5016 DA468D00 53E90374 0000300C .=..t.ÔS..FÔ.P.v..v..v..v....È.. 000060
0C76FFDA 76FFDC76 FF5016FC 46800001 07C72618 5EC40032 E9037500 0030DCC4 á.=..u.Ô2.á^.&ú....F=.P.vÉ.vÔ.v. 000080
8D01D7E9 04AEE9D8 46880006 E9037500 0030D846 890CC483 175E173F 9A0A76FF .v..?.^..á..FÁ=..u.Ô...FÄÔÙ.Ô=.. 0000A0
0102E903 74000030 0CC4831B 4C01389A 0676FF08 76FF0E76 FF1076FF 5016E046 FÁ.P.v..v..v..v..8.L..á.=..t.Ô.. 0000C0
00001B10 9A5016F0 46800D6A 0E76FF10 76FF2B77 FF262D77 FF261FC4 26065EC4 á^.&á.&.w-&.w+.v..v.j..FÞ.P..... 0000E0
46880006 E9037500 003D08C4 83182500 009A0676 FF0876FF D876FF50 6AD84689 .FÄjP.vÄ.v..v....%..á.=..u.Ô...F 000100
9A5016E4 46800E6A 0E76FF10 76FF2B77 FF262D77 FF261FC4 26065EC4 0446E9D8 ÄÔF.á^.&á.&.w-&.w+.v..v.j..FÔ.P. 000120
E9037500 003D08C4 83163500 009A0676 FF0876FF D876FF50 6AD84689 000010A3 È....FÄjP.vÄ.v..v....5..á.=..u.Ô 000140
C4831735 009C9A06 76FF0876 FFF076FF F276FF50 16F84680 0402E9D8 46880006 ...FÄÔ...F½.P.v·.vÞ.v..v....5..á 000160
8318C900 9C9A0676 FF0876FF E476FFE6 76FF5016 F4468D00 59E90375 0000300C .=..u.ÔY..F¶.P.vÌ.vÔ.v..v....è.. 000180
FA76FFF4 76FFF676 FF5016E0 46800001 07C72618 5EC40038 E9037500 0030DCC4 á.=..u.Ô8.á^.&ú....FÁ.P.v-.v¶.v° 0001A0
E9D84688 0006E903 75000030 D8468910 C48317C4 25859A0E 76FF1076 FFF876FF .v½.v..v...%á..á..FÁ=..u.Ô...FÄÔ 0001C0
003D0CC4 83181300 9C9A0676 FF0876FF 0A76FF0C 76FF5016 FC468000 81E90388 ..ÔŸ..F=.P.v..v..v..v.......á.=. 0001E0
```

Dump of file SATURN:[PCCOMMON.DUMP.DLL]DAD.TMP;1 on 18-APR-1990 10:40:03.08
File ID (551,9,0)   End of file block 267 / Allocated 268

Virtual block number 46 (0000002E), 512 (0200) bytes

FF0C76FF 2B77FF26 2077FF26 1FC42606 5EC40001 07C72618 5EC4006C E9037500 .u.Ōl.ó^.&ú...ó^.&ó.&.w-&.w+.v.. 000000
831AE100 009A0676 FF0876FF D876FF53 6AD84689 0000FFFF 9A501606 46800A76 v..F◘.P......FÄjS.vÄ.v..v....Ä.. 000020
C4831ECE 30379AFC 76FFFE76 FFD676FF 031AE9D8 46880006 E9037500 003D08C4 ó.=..u.Ō...FÄŌ...v◘.v±.v=.70ö..ó 000040
03750010 3D0018E9 001EE900 21E902F8 E9D8468B 0006E903 7500003D D8468906 ..FÄ=..u.Ō...FÄŌ½.Ōl.Ō..Ō..=..u. 000060
8D012CE9 1446880 2 CBE9FFDF E9FE2CE9 03750013 3DFF5AE9 03750012 3DFDC5E9 Ōé»=..u.ŌZ.=..u.Ō,±ŌŌ.Ōú..F.Ō... 000080
0102E903 7400003D 0CC4831D 2C01389A 0676FF08 76FF0A76 FF0C76FF 5016E046 FÄ.P.v..v..v..v..B.,..ó.=..t.Ō.. 0000A0
00001CF0 9A5016F0 4680006A 0A76FF0C 76FF2B77 FF262D77 FF261FC4 26065EC4 ó^.&ó.&.w-&.w+.v..v.j..FÞ.P.Þ... 0000C0
46880006 E9037500 003D08C4 831D0500 009A0676 FF0876FF D876FF50 6AD84689 .FÄjP.vÄ.v..v.......ó.=..u.Ō...F 0000E0
9A5016E4 46800E6A 0A76FF0C 76FF2B77 FF262D77 FF261FC4 26065EC4 0266E9D8 ÄŌf.ó^.&ó.&.w-&.w+.v..v.j..FŌ.P. 000100
E9037500 003D08C4 831E9A00 009A0676 FF0876FF D876FF50 6AD84689 00001ACC ◘....FÄjP.vÄ.v..v.......ó.=..u.Ō 000120
C483104D 009C9A06 76FF0876 FFF076FF F276FF50 16F8468D 0222E9D8 46880006 ...FÄŌ"..F½.P.v .vÞ.v..v....M..ó 000140
831DC800 9C9A0676 FF0876FF E476FFE6 76FF5016 F4468000 59E90375 0000300C .=..u.ŌY..F¶.P.vl.vŌ.v..v....ù.. 000160
FA76FFF4 76FFF676 FF5016E0 46800001 07C72618 5EC40038 E9037500 00300CC4 ó.=..u.Ō8.ó^.&ú....FÄ.P.v-.v¶.v' 000180
E9D8468B 0006E903 7500003D D8468910 C4831E00 25859A0A 76FF0C76 FFF876FF .v½.v..v...%...ó..FÄ=..u.Ō...FÄŌ 0001A0
83E9FFE7 E9FEC4E9 0377000E 3DFFF2E9 03730000 300013E9 0016E900 19E901A8 ´.Ō..Ō..Ō..=..s.Ō .=..w.Ōó±ŌŌ.Ō. 0001C0
0CC4831E 5401D49A 0676FF08 76FF0A76 FF0C76FF 5016E846 800075E9 14468801 ..F.Ōu..FŌ.P.v..v..v..v..å.T..ó. 0001E0

Dump of file SATURN:[PCCOMMON.DUMP.DLL]DAD.TMP;1 on 18-APR-1990 10:40:03.08
File ID (551,9,0)   End of file block 267 / Allocated 268

Virtual block number 47 (0000002F), 512 (0200) bytes

006A5016 E8468000 0107C726 185EC400 42E90374 15167E83 0048E903 7400003D =..t.ŌK..~..t.Ō8.ó^.&ú....FŌ.Pj. 000000
83189C41 849A0A76 FF0C76FF 006A006A 0676FF08 76FF006A 006A006A 006A006A j.j.j.j.j..v..v.j.j..v..v...A... 000020
7500033D 0008E900 0EE90011 E90117E9 D8468800 06E90375 00003DD8 46891CC4 ó..FÄ=..u.Ō...FÄŌ..Ō..Ō..Ō..=..u 000040
76FF0876 FF0E76FF 1076FF50 16FC468D 00ADE914 468800FA E9FFEFE9 FF83E903 .Ō..Ōy.Ō'..F.Ōu..F◘.P.v..v..v..v 000060
261FC426 065EC400 0107C726 185EC400 83E90375 00003D0C C483186D 009C9A06 ....m..ó.=..u.Ō..ó^.&ú...ó^.&ó.& 000080
76FF506A 08468900 0015169A 50160E46 8D046A0A 76FF0C76 FF2B77FF 262D77FF .w-&.w+.v..v.j..F8.P......FÄjP.v 0000A0
DE7E8000 8DE9D846 8B0006E9 03750000 3D08C483 1C0D0000 9A0676FF 0876FFD8 Á.v..v.......ó.=..u.Ō...FÄŌ...-B 0000C0
19403037 9AFC76FF FE76FFD6 76FFD646 89000088 0003E900 01880006 E9037459 Yt.Ō..¡..Ō..¡...F◘.v◘.v±.v=.70∂. 0000E0
00093000 0BE9000E E90011E9 0056E9D8 46880006 E9037500 003D0846 8906C483 .ó..FÄ=..u.Ō...FÄŌV.Ō..Ō..Ō..=.. 000100
E8E90375 00023DF8 12E90375 00013D00 33E90036 E90039E9 FFEFE9FF 48E90375 u.ŌK.Ōy.Ō9.Ō6.Ō3.=..u.Ō.½=..u.ŌŌ 000120
80E90375 00123DFF 11E90375 00093DFD 48E90375 00043DFA F9E90375 00033DF8 ½=..u.Ō''=..u.ŌH»=..u.Ō..=..u.Ō. 000140
0000EA46 C7D88E16 B2B81E56 57000016 C8C8C95F 5E1F0000 E90000B8 FFC7E9FE ±Ōú.¡..Ō...^_èùà...WV.¡ý..ÁúFõ.. 000160
46890000 B8FC4685 FE468900 0088F846 89FA4689 00008BEC 4689EE46 89000088 ¡...FŸ.Fš¡...F'.F½¡...F±.F◘¡...F 000180
76FF5016 EC468000 7AE91446 880452E9 124688F4 4689F646 89000088 F04689F2 '.FÞ¡...F-.F¶.F.ŌR..F.Ōz..Fš.P.v 0001A0
EC76FFEE 76FF0016 E9037500 003D0CC4 831F0700 009A0676 FF0876FF 0E76FF10 ..v..v..v....◘..ó.=..u.Ō...vŸ.vš 0001C0
76FF0E76 FF1076FF 5016F446 800053E9 000107C7 26185EC4 04C4831F ED14379A .7.Ù..ó.ó^.&ú...ŌS..F¶.P.v..v..v 0001E0

Dump of file SATURN:[PCCOMMON.DUMP.DLL]DAD.TMP;1 on 18-APR-1990 10:40:03.08
File ID (551,9,0)   End of file block 267 / Allocated 268

Virtual block number 48 (00000030), 512 (0200) bytes

83204953 E79AF476 FFF676FF 0016E903 7500003D 0CC48320 3301D49A 0676FF08 ..v..å.3 .ó.=..u.Ō...v-.v¶.ÓSI . 000000
03750018 3DFFB8E9 03750015 300013E9 0016E900 19E90001 07C72618 5EC404C4 ó.ó^.&ú...Ō..Ō..Ō..=..u.Ō¡.=..u. 000020
0676FF08 76FF0A76 FF0C76FF 5016EC46 8D0190E9 14468803 EFE9FFE7 E9FF76E9 Ōv.ŌŌ.Ōy..F.Ō...Fš.P.v..v..v..v. 000040
5EC404C4 83208314 379AEC76 FFEE76FF 0016E903 7500003D 0CC48320 6000009A ...m .ó.=..u.Ō...vŸ.vš.7.. .ó.ó^ 000060
8320A700 9C9A0676 FF0876FF 0E76FF10 76FF5016 FC468001 79E90001 07C72618 .&ú...Ōy..F◘.P.v..v..v..v....Ĩ . 000080
000107C7 26185EC4 04C48322 0523559A FC76FFFE 76FF0016 E9037500 003D0CC4 ó.=..u.Ō...v±.v◘.U#.".ó.ó^.&ú... 0000A0
7500003D 0CC48320 .800009A 0676FF08 76FF0A76 FF0C76FF 5016EC46 8D013FE9 Ō?..Fš.P.v..v..v..v...à .ó.=..u 0000C0
0000300C C4832132 00009A06 76FF0876 FF0E76FF 1076FF50 16F8468D 0067E903 .Ōg..F½.P.v..v..v..v....21.ó.=.. 0000E0
002BE903 74265739 260034E9 03742447 3926FA56 8BF8468B EC5EC400 46E90375 u.ŌF.ó^š.F½.V'&9G$t.Ō4.&9W&t.Ō+. 000100
00003DEA 468908C4 8321901A 9E9AEC76 FFEE76FF 006A006A 000107C7 26185EC4 ó^.&ú...j.j..vŸ.vš....!.ó..Fõ=.. 000120
9A0676FF 0876FF0A 76FF0C76 FF5016F8 46800084 E902F3E9 EA468800 06E90375 u.Ō...FõŌµ.ŌÇ..F½.P.v..v..v..v.. 000140
0676FF08 76FF0E76 FF1076FF 5016EC46 800067E9 03750000 3D0CC483 21530000 ..S!.ó.=..u.Ōg..Fš.P.v..v..v..v. 000160
E9037424 473926FA 568BF846 8BEC5EC4 0046E903 7500003D 0CC48321 EF00009A ...ÿ!.ó.=..u.ŌF.ó^š.F½.V'&9G$t.Ō 000180
1A9E9AEC 76FFEE76 FF006A00 6A000107 C726185E C4002BE9 03742657 39260034 4.&9W&t.Ō+.ó^.&ú...j.j..vŸ.vš... 0001A0
3D0023E9 0026E900 29E90268 E9EA468B 0006E903 7500003D EA468908 C4832278 (".ó..Fõ=..u.Ō...FõŌh.Ō).Ō&.Ō#.= 0001C0
E9FF4FE9 03750014 3DFE92E9 03750012 3DFE60E9 03750010 3DFEDCE9 0375000F ..u.ŌÉ±=..u.Ō'±=..u.Ō.±=..u.ŌŌ.Ō 0001E0

Dump of file SATURN:[PCCOMMON.DUMP.DLL]DAD.TMP;1 on 18-APR-1990 10:40:03.08
File ID (551,9,0)   End of file block 267 / Allocated 268

Virtual block number 49 (00000031), 512 (0200) bytes

```
29009C9A 0676FF08 76FF0A76 FF0C76FF 5016FC46 800086E9 14468802 33E9FFD7 ■.Õ3..F.ÕÑ..F=.P.v..v..v..v....) 000000
07C72618 5EC404C4 83223F23 559AFC76 FFFE76FF 0016E903 75000030 0CC48322 ".á.=..u.Õ...v±.v=.U#?".á.á^.&ú. 000020
00300CC4 83226.01 389A0676 FF0876FF 0E76FF10 76FF5016 F0468000 97E90001 ..Õ...Fÿ.P.v..v..v..v..Ð.c".á.=. 000040
800050E9 000107C7 26185EC4 04C4831D 7C3FA39A F076FFF2 76FF0016 E9037500 .u.Õ...v·.vÞ.È?|..á.á^.&ú...Õ].. 000060
0018E903 75000030 0CC4831C 83009C9A 0676FF08 76FF0A76 FF0C76FF 5016FC46 F=.P.v..v..v..v.......á.=..u.Õ.. 000080
18E9001E E90021E9 000107C7 26185EC4 06C4831C 2C30379A FC76FFFE 76FF006A j..v±.v=.70,..á.á^.&ú...Õ1.Õ..Õ. 0000A0
880159E9 FF0FE9FF 6CE90375 00133DFF AEE90375 00123DFF 42E90375 00103000 .=..u.Õ®.=..u.ÕÚ.=..u.Õl.ÕÕ.ÕY.. 0000C0
00300CC4 83232501 389A0676 FF0876FF 0A76FF0C 76FF5016 F0468000 40E91446 F.Õ@..Fÿ.P.v..v..v..v..Ð.%#.á.=. 0000E0
E90019E9 000107C7 26185EC4 04C48323 443FA39A F076FFF2 76FF0016 E9037500 .u.Õ...v·.vÞ.È?D#.á.á^.&ú...Õ..Õ 000100
49E91446 8800FDE9 FFE7E9FF 80E90377 000E30FF F2E90373 00003000 13E90016 ..Õ..=..s.Õ·.=..w.Õ¯.ÕÕ.Õ»..F.ÕI 000120
E9037500 00300CC4 83238201 D49A0676 FF0876FF 0A76FF0C 76FF5016 F4468000 ..F¶.P.v..v..v..v..Å..#.á.=..u.Õ 000140
0107C726 185EC404 C4831F83 53E79AF4 76FFF676 FF0016E9 03741516 7E83001F ...–..t.Õ...v–.v¶.ÕS°..á.á^.&ú.. 000160
46800053 E914468B 00A0E9FF EFE9FFAF E9037500 03300008 E9000EE9 0011E900 .Õ..Õ..Õ..=..u.Õ£.Õÿ.Õ...F.ÕS..F 000180
C40029E9 03750000 300CC483 1F90009C 9A0676FF 0876FF0E 76FF1076 FF5016FC ●.P.v..v..v..v.......á.=..u.Õ).á 0001A0
E9037500 0030EA46 8906C483 21053037 9AFC76FF FE76FF00 6A000107 C726185E ^.&ú...j..v±.v=.70.!.á..Fõ=..u.Õ 0001C0
E90039E9 FFEFE9FF A5E90375 00093000 08E9000E E90011E9 0056E9EA 46880006 ...FõÕV.Õ..Õ..Õ..=..u.ÕE.Õÿ.Õ9.Õ 0001E0
```

Dump of file SATURN:[PCCOMMON.DUMP.DLL]DAD.TMP;1 on 18-APR-1990 10:40:03.08
File ID (551,9,0)   End of file block 267 / Allocated 268

Virtual block number 50 (00000032), 512 (0200) bytes

```
00043DFD E8E9037· 00033DFC 34E90375 00023DFB A6E90375 00013D00 33E90036 6.Õ3.=..u.Õ1«=..u.Õ4==..u.ÕÕ»=.. 000000
5E1F0000 E90000b6 FFC7E9FF 06E90375 00123DFF 68E90375 00093DFE 8AE90375 u.Õα±=..u.Õk.=..u.Õ..Õú.¡..Õ...^ 000020
02030A89 00080681 02030000 0004036F 00020000 00031CC1 00020022 90C8C95F  èù."...ë........o...........¿... 000040
02030010 000108CA 010302E5 000600AC 02030000 000522DF 00020172 000404A7 Ī...r...Ô"......¯...Ī...ð....... 000060
00020090 00010899 01030000 000922C9 00020102 0004161E 020307D4 000911E2 â...Å...........è"............... 000080
0203018E 0004020E 0203010E 00040409 02030089 00041112 02030000 000A23A2 Å#......................â....... 0000A0
00050000 00101F47 000207F4 00091261 02030000 000E0886 00020097 00041E85 ........Ñ........■...¶...G....... 0000C0
02030805 00090F03 020301A7 000403C8 020305FF 00090120 02034E02 000A060C .....N.. ........ù...Ī........... 0000E0
02030080 00041CAC 02030081 0004156F 02030130 00040510 0203050E 00080EAF £...........O...o...Ÿ...¯...§... 000100
02030C82 000D18F8 02030149 000405A9 0203080C 00080653 020302AE 00060856 V...Ù...S.......`...I...½....... 000120
00000000 00000000 00000050 000406D9 0203015C 000401FE 02030781 0009114F O...Ÿ...±...\...\...]........... 000140
88024689 D4468900 00880000 DA46C700 000046C7 D88EFFFF 881E5657 000030C8 àO..WV.¡...AúFÅ..úFO..¡...FÅ.F●¡ 000160
76FFDA46 89078826 125EC407 89260247 89260000 88065EC4 D6468908 46890000 ...FÅ.F●á^.¡..&.G.&..á^.&...FÕ.v 000180
0453E900 46880006 E9037500 00300046 890000FF FF9A5016 D2468D24 6A326ADA Õj2j$.F●.P......FÅ=..u.Õ...FÅÕS. 0001A0
57892607 89261456 88124688 D25EC431 5789262F 47892604 5688D246 88125EC4 á^..F●.V&&.G/&.W1á^●.F..V.&..&.W 0001C0
08478926 0A478926 00008802 5EC40657 89260447 89261056 880E4688 D25EC402 .á^●.F..V.&.G.&.W.á^●¡..&.G.&.G. 0001E0
```

Dump of file SATURN:[PCCOMMON.DUMP.DLL]DAD.TMP;1 on 18-APR-1990 10:40:03.08
File ID (551,9,0)   End of file block 267 / Allocated 268

Virtual block number 51 (00000033), 512 (0200) bytes

```
88DA76FF 10478926 12478926 00008802 5EC40C47 89260E47 89260000 88025EC4 á^●¡..&.G.&.G.á^●¡..&.G.&.G..vÕ. 000000
00009AD2 76FFD476 FFD076FF 526AD046 89000001 029A5052 00140504 5688D246 F●.VÅ...RP......FÅjR.vÅ.vÅ.v●... 000020
52001805 D4568802 46880A76 FF03C0E9 00468800 06E90375 00003008 C4830117 ...á.=..u.Õ...FÅÕá..vÕ.F●.VÅ...R 000040
75000030 08C48301 4E00009A D276FFD4 76FFD076 FF526AD0 46890000 01399A50 P.9....FÅjR.vÅ.vÅ.v●...N..á.=..u 000060
D0468900 0001709A 5052001C 05045688 D24688DA 76FF0389 E9004688 0006E903 .Õ...FÅÕ...vÕ.F●.VÅ...RP.p....FÅ 000080
52E90046 880006E9 03750000 3008C483 01850000 9AD276FF D476FFD0 76FF526A jR.vÅ.vÅ.v●......á.=..u.Õ...FÅÕR 0000A0
FFD476FF D076FF52 6AD04689 0000FFFF 9A505200 20050456 88D24688 DA76FF03 ..vÕ.F●.VÅ. .RP......FÅjR.vÅ.vÅ. 0000C0
FF0C76FF 006A006A 0318E900 46880006 E9037500 003008C4 8301CE00 009AD276 v●...ö..á.=..u.Õ...FÅÕ..j.j..v.. 0000E0
0A578926 08478926 D85688D6 46880 25E C4D04689 0000FFFF 9A5016D6 46800A76 v..F●.P......FÅá^●.F●.VÅ&.G.&.W. 000100
D2E90046 880006E9 03750000 3008C483 02030000 9AD276FF D476FFD0 76FF526A jR.vÅ.vÅ.v●......á.=..u.Õ...FÅÕ● 000120
D276FFD4 76FFD076 FF526AD0 46890000 FFFF9AD2 76FFD476 FFD676FF D876FF02 ..vÅ.v●.vÅ.v●......FÅjR.vÅ.vÅ.v● 000140
FF9A016A D676FFD8 76FF029D E9004688 0006E903 75000030 08C48302 3400009A ...4..á.=..u.Õ...FÅÕ...vÅ.v●j... 000160
06E90375 00003008 C4830265 00009AD2 76FFD476 FFD076FF 526AD046 890000FF ....FÅjR.vÅ.vÅ.v●...e..á.=..u.Õ. 000180
FFD476FF D076FF52 6AD04689 0000FFFF 9A026AD6 76FFD876 FF026CE9 D0468800 ..FÅÕl..vÅ.v●j.......FÅjR.vÅ.vÅ. 0001A0
116AD676 FFD876FF 023BE900 46880006 E9037500 003008C4 83029A00 009AD276 v●......á.=..u.Õ...FÅÕ;..vÅ.v●j. 0001C0
3008C483 02CF0000 9AD276FF D476FFD0 76FF526A D0468900 00FFFF9A 0066681E .hf.......FÅjR.vÅ.vÅ.v●...ü..á.= 0001E0
```

```
Dump of file SATURN:[PCCOMMON.DUMP.DLL]DAD.TMP;1 on 18-APR-1990 10:40:03.08
File ID (551,9,0)   End of file block 267 / Allocated 268

Virtual block number 52 (00000034), 512 (0200) bytes

 46890000 FFFF9AFF FF68FFFF 68D676FF D876FF02 06E9D046 880006E9 03750000 ..u.Õ...FÀÕ...vÀ.vøh..h........F 000000
 E9D04688 0006E903 7500003D 08C483FF FF00009A D276FFD4 76FFD076 FF526AD0 ÀjR.vÀ.vå.vø......á.=..u.Õ...FÀÕ 000020
 0000E646 C70118E4 46C70000 E246C700 C8E046C7 0000DE46 C701900C 46C701D1 Ì.úFÉ..úFß..úFÀà.úFâ..úFõ..úFÌ.. 000040
 46C70000 F246C700 78F046C7 0000EE46 C70078EC 46C70000 EA46C701 18E846C7 úFÒ..úFõ..úFèx.úFŸ..úFÞx.úF·..úF 000060
 FFD876FF 0000FE46 C70013FC 46C70000 FA46C700 A0F846C7 0000F646 C70078F4 ¶x.úF-..úF½..úFª..úF=..úF±...vÀ. 000080
 9600009A D276FFD4 76FFD076 FF526AD0 46890000 FFFF9A50 160C468D 016AD676 vøj..FÉ.P......FÀjR.vÀ.vå.vø.... 0000A0
 146A006A 146A006A D676FF08 76FF0141 E9D04688 0006E903 7500003D 08C48303 ..á.=..u.Õ...FÀÕA..vÀ.vøj.j.j.j. 0000C0
 03750000 3D08C483 03CD0000 9AD276FF D476FFD0 76FF526A D0468900 00FFFF9A ......FÀjR.vÀ.vå.vø...è..á.=..u. 0000E0
 6AD04689 0000FFFF 9A146A00 6A146A00 6AD676FF D876FFD1 0AE9D046 880006E9 Õ...FÀÕ...vÀ.vøj.j.j.j.......FÀj 000100
 0003E9D0 46880006 E9037500 003D08C4 8303FE00 009AD276 FFD476FF D076FF52 R.vÀ.vå.vø...±..á.=..u.Õ...FÀÕ£. 000120
 00E00000 9AD276FF D476FFD0 76FF526A D0468900 00FFFF9A 006A0676 FFD876FF .vÀ.vøj.......FÀjR.vÀ.vå.vø...À. 000140
 FFD476FF 5052000C 05D45688 D2468800 A2E9D046 880006E9 03750000 3D08C483 .á.=..u.Õ...FÀÕÀ..Fø.Vå...RP.vå. 000160
 56880246 880078E9 D0468800 06E90375 00003D00 468908C4 83044F56 989AD276 vø..VO..á..FÀ=..u.Õ...FÀÕx..Fø.V 000180
 880006E9 03750000 3D004689 08C48304 6E628A9A D276FFD4 76FF5052 001005D4 å...RP.vå.vø.¤bn..á..FÀ=..u.Õ... 0001A0
 32E9D046 880006E9 03750000 3D004689 FFFF048A 9AD276FF D476FF00 4EE9D046 FÀÕN..vå.vø.¤....FÀ=..u.Õ...FÀÕ2 0001C0
 065EC400 16E9D046 880006E9 03750000 3D004689 FFFF055C 9AD676FF D876FF00 ..vÀ.vø.\....FÀ=..u.Õ...FÀÕ..á^. 0001E0
```

```
Dump of file SATURN:[PCCOMMON.DUMP.DLL]DAD.TMP;1 on 18-APR-1990 10:40:03.08
File ID (551,9,0)   End of file block 267 / Allocated 268

Virtual block number 53 (00000035), 512 (0200) bytes

 56570000 30C80010 CAC95F5E 1F0000E9 0000B802 57892607 89260456 88D24688 .Fø.V&&..&.W.¡..Õ...^_èò..à0..WV 000000
 0000B8D0 46890246 890000B8 F24689F4 46890000 B8000008 46C7D88E 0008881E .¡...ÀúFÀ..¡...F¶.F·¡...Fø.FÀ¡.. 000020
 0000B8EE 4689F046 890000B8 0000FA46 C7EA4689 EC468900 00B8FC46 89FE4689 .F±.F=¡...F§.FöúFª..¡...FÞ.FŸ¡.. 000040
 F246892D 5788262B 4788261F C426065E C4F64689 F8468900 00B80446 89064689 .F=.FÀ¡...F½.F-á^.&á.&.G+&.W-.F· 000060
 000005DA 9A5016FC 4680186A 0477FF26 0677FF26 065EC4F2 76FFF476 FFF45689 .V¶.v¶.v·á^.&.w.&.w.j..F=.P.Ö... 000080
 58E90003 E9037500 003D08C4 8305AA00 009A0676 FF0876FF D876FF50 6AD84689 .FÀjP.vÀ.v..v....`..á.=..u.Õ..ÕX 0000A0
 16EA468D 0045E903 7502470B 26078B26 D05EC4D2 56890046 89FE5688 FC468801 ..F=.V±.FÀ.Vøá^À&..&.G.u.ÕE..Fõ. 0000C0
 76FF506A D846890C C4830425 085F9A37 FF260277 FF26D05E C40676FF 0876FF50 P.v..v.á^À&.w.&.7._.X..á..FÀjP.v 0000E0
 ACE904D0 468300FF E9^003E9 03750000 3D08C483 05EF0000 9A0676FF 0876FFD8 À.v..v....ÿ..á.=..ū.Õ..Õ...FÀ.Õ^ 000100
 46890000 FFFF9A50 16D4468D 156A0477 FF260677 FF26065E C4F276FF F4?4FFFF ..v¶.v·á^.&.w.&.w.j..Få.P......F 000120
 8800BAE9 0003E903 75000030 08C48303 5F00009A 0676FF08 76FFD876 FF5??AD8 ÀjP.vÀ.v..v.......á.=..u.Õ..Õa.. 000140
 6A5016F6 46800055 E9037502 470B2607 8B26EE5E C4F05689 EE4689D6 5688??46 Få.Vø.FŸ.VÞá^Ÿ&¯.&.G.u.ÕU..F-.Pj 000160
 9A37FF26 0277FF26 EE5EC400 6A006A06 76FF0876 FF006A00 6A006A00 6A006A00 .j.j.j.j.j..v..v.j.j.á^Ÿ&.w.&.7. 000180
 00003008 C4830693 00009A06 76FF0876 FFD876FF 506AD846 891CC483 05944184 .A...á..FÀjP.vÀ.v..v.......á.=.. 0001A0
 680676FF 0876FF50 160A468D 5016FA46 8DFF9CE9 04EE4683 0051E900 03E90375 u.Õ..ÕQ..FŸ.Õ...Fª.P.FÕ.P.v..v.h 0001C0
 D876FF52 6AD84689 14C48306 A904A79A 0877FF26 0A77FF26 065EC4FF FF68FFFF ..h..á^.&.w.&.w..Ì.`..á..FÀjR.vÀ 0001E0
```

```
Dump of file SATURN:[PCCOMMON.DUMP.DLL]DAD.TMP;1 on 18-APR-1990 10:40:03.08
File ID (551,9,0)   End of file block 267 / Allocated 268

Virtual block number 54 (00000036), 512 (0200) bytes

 75FE4608 FC468800 00E90003 E9037500 003D08C4 83055100 009A0676 FF0876FF .v..v....Q..á.=..u.Õ..Õ...F=.F±u 000000
 0876FFD8 76FF506A D8468900 0007039A FC76FFFE 76FFF276 FFF476FF 0027E903 .Õ'..v¶.v·.v±.v=......FÀjP.vÀ.v. 000020
 FFD676FF F276FFF4 76FF0027 E9037506 460BD446 8808C483 07180000 9A0676FF .v.......á..Få.Føu.Õ'..v¶.v·.vø. 000040
 D8468808 C4830658 00009A06 76FF0876 FFD876FF 506AD846 890000FF FF9AD476 vå......FÀjP.vÀ.v..v....X..á..FÀ 000060
 88F04689 F2468900 00B8D88E 04C2881E 56570000 10C80004 CAC95F5E 1F0000E9 Õ...^_èò..à...WV.¡ô..À¡...F·.FÞ¡ 000080
 77FF2606 5EC4F846 89FA4689 000088F4 4689F646 89000088 FC4689FE 46890000 ...F±.F=¡...F-.F¶¡...Fª.F½á^.&.w 0000A0
 30000007 B99A5D16 F0468D14 77FF2616 77FF2606 5EC40000 07A49A14 77FF2616 .&.w..Ê...á^.&.w.&.w..FÞ.P.¿...= 0000C0
 261A77FF 26065EC4 FFD2E904 C48307CE 14379AF0 76FFF276 FF0011E9 03740000 ..t.Õ...v·.vÞ.7.ö..á.Õø.á^.&.w.& 0000E0
 00003D00 0007F79A 5016FC46 8D1877FF 261A77FF 26065EC4 000007E2 9A1877FF .w..ã...á^.&.w.&.w..F=.P.¥...=.. 000100
 77FF261E 77FF2606 5EC4FFD2 E904C483 080C2355 9AFC76FF FE76FF00 11E90374 t.Õ...v±.v=.U#...á.Õø.á^.&.w.&.w 000120
 03740000 3D000008 359A5016 F4468D1C 77FF261E 77FF2606 5EC40000 08209A1C .. ...á^.&.w.&.w..F¶.P.5...=..t. 000140
 9A2077FF 262277FF 26065EC4 FFD2E904 C483084A 3FA39AF4 76FFF676 FF0011E9 Õ...v-.v¶.È?J..á.Õø.á^.&.w"&.w . 000160
 11E90374 00003D00 00FFFF9A 5016F846 8D2077FF 262277FF 26065EC4 0000FFFF ....á^.&.w"&.w .F½.P.....=..t.Õ. 000180
 C80004CA C95F5E1F 0000E900 00B8FFD2 E904C483 064253E7 9AF876FF FA76FF00 ..vª.v½.ÓSB..á.Õø.¡..Õ...^_èò..à 0001A0
 00B88446 89864689 0000B800 00C046C7 0000AA46 C7D88E07 32881E56 570000A6 Ì..WV.¡2..ÀúF`..úFà..¡...FÑ.FÇ¡. 0001C0
 89AE4689 000088E0 4689E246 89000088 B846898A 46890000 B8804689 B2468900 ..Fý.F ¡...Fα.F¡¡...Fã.FÀ¡...FÜ. 0001E0
```

Dump of file SATURN:[PCCOMMON.DUMP.DLL]DAD.TMP;1 on 18-APR-1990 10:40:03.08
File ID (551,9,0)   End of file block 267 / Allocated 268

Virtual block number 55 (00000037), 512 (0200) bytes

```
89004689 0000888C 46898E46 89000088 00000A46 C7F84689 FA468900 0088AC46 F¯¡...F°.F½úFÖ..¡...F/.F¥¡...FÅ. 000000
88E44689 E6468900 0088C246 89C44689 000088FF 5A8689FF 5C868900 0088CE46 Fö¡....\...Z.¡...Fâ.Fò¡...Fl.Fõ¡ 000020
FE468900 0088C646 89C84689 0000880C 46890E46 89000088 CA4689CC 46890000 ...Fë.Fò¡...Fâ.FÉ¡...Fà.Fó¡...F± 000040
260A5EC4 C0468907 88261FC4 260A5EC4 07892602 47892600 00880E5E C4FC4689 .F•â^.¡..&.G.&..â^.&â.&...Fââ^.& 000060
0000489A 50168046 80326A32 6AC076FF 86568984 46892057 88262847 88261FC4 â.&.G+&.W-.FÇ.VÑ.vàj2j2.F¯.P.K.. 000080
E90003E9 03750000 3008C483 0A020000 9A0A76FF 0C76FFAA 76FF4F6A AA468900 ..F˙jO.v˙.v..v.......â.=..u.Õ..Õ 0000A0
4688805E C4045789 26024789 260C5688 0A468880 5EC40001 07C72680 5EC40779 y.â^¯&ú...â^¯.F..V.&.G.&.W.â^¯.F 0000C0
47C72680 5EC40A47 89260C47 89260000 88805EC4 08578926 06478926 08568806 ..V.&.G.&.W.â^¯¡..&.G.&.G.â^¯&úG 0000E0
C4144789 26164789 26000088 805EC410 47892612 47892600 0088805E C400000E ...â^¯¡..&.G.&.G.â^¯¡..&.G.&.G.â 000100
56880A46 88244789 26264789 26000088 805EC418 4789261A 47892600 0088805E ^¯¡..&.G.&.G.â^¯¡..&.G&&.G$.F..V 000120
9A0A76FF 0C76FFAA 76FF526A AA468900 00FFFF9A 8076FFB2 76FF5052 0014050C ....RP.vý.v¯......F˙jR.v˙.v..v.. 000140
5052001C 05825688 804688C0 76FF06C9 E90003E9 03750000 3008C483 0A360000 ..6..â.=..u.Õ..Õè..vâ.F¯.Vý...RP 000160
03750000 3008C483 0A6A0000 9A0A76FF 0C76FFAA 76FF526A AA468900 00FFFF9A ......F˙jR.v˙.v..v....j..â.=..u. 000180
76FF526A AA468900 000B619A 50520020 05825688 804688C0 76FF0695 E90003E9 Õ..Õ...vâ.F¯.Vý. .RP.a....F˙jR.v 0001A0
804688C0 76FF0661 E90003E9 03750000 3008C483 0A9E0000 9A0A76FF 0C76FFAA ˙.v..v.......â.=..u.Õ..Õa..vâ.F¯ 0001C0
0AD20000 9A0A76FF 0C76FFAA 76FF526A AA468900 000A809A 50520028 05825688 .Vý.(.RP.§....F˙jR.v˙.v..v....@. 0001E0
```

Dump of file SATURN:[PCCOMMON.DUMP.DLL]DAD.TMP;1 on 18-APR-1990 10:40:03.08
File ID (551,9,0)   End of file block 267 / Allocated 268

Virtual block number 56 (00000038), 512 (0200) bytes

```
0000C89A 5052002C 05825688 804688C0 76FF062D E90003E9 03750000 3008C483 .â.=..u.Õ..Õ-..vâ.F¯.Vý.,.RP.ù.. 000000
E90003E9 03750000 3008C483 080F0000 9A0A76FF 0C76FFAA 76FF526A AA468900 ..F˙jR.v˙.v..v.......â.=..u.Õ..Õ 000020
46890000 FFFF9A50 52003005 82568880 46880676 FF0876FF 8476FF86 76FF05F9 •..vÑ.vÇ.v..v..F¯.Vý.0.RP......F 000040
FF058CE9 0003E903 75000030 08C48308 4800009A 0A76FF0C 76FFAA76 FF506AAA ˙jP.v˙.v..v....H..â.=..u.Õ..Õ¥.. 000060
FFAA76FF 506AAA46 890000FF FF9A5016 E846800A 6A0676FF 0876FF84 76FF8676 vÑ.vÇ.v..v.j..FÒ.P......F˙jP.v˙. 000080
50168846 80C076FF 0583E900 03E90375 00003008 C4830887 00009A0A 76FF0C76 v..v.......â.=..u.Õ..Õ...vâ.F¡.P 0000A0
76FFAA76 FF526A16 57892614 4789268A 56888846 88805EC4 AA468900 00FFFF9A ......F˙â^¯.F¡.V¤&.G.&.W.jR.v˙.v 0000C0
EA5688E8 4688885E C40544E9 0003E903 75000030 08C4830C 8900009A 0A76FF0C ..v.......â.=..u.Õ..ÕO.â^¡.FÒ.Vð 0000E0
5688F046 88885EC4 06578926 04478926 EE5688EC 4688885E C4025789 26078926 &..&.W.â^¡.F&.V¥&.G.&.W.â^¡.FÞ.V 000100
07882688 5EC40E57 89260C47 8926F656 88F44688 885EC40A 57892608 478926F2 ·&.G.&.W.â^¡.F¶.V-&.G.&.W.â^¡&.. 000120
08478826 885EC400 44E90374 06470826 04478826 885EC400 54E90374 0A470826 &.G.t.ÕT.â^¡&.G.&.G.t.ÕD.â^¡&.G. 000140
76FF0001 DA46C700 24E90374 0E470826 0C478826 885EC400 34E90374 0A470826 &.G.t.Õ4.â^¡&.G.&.G.t.Õ$.úFO...v 000160
885EC401 28E904A1 E90003E9 03750000 30AA4689 04C48306 8010E99A 8076FF82 ý.v¯.Õ....â..F˙=..u.Õ..ÕÀ.Õ+.â^¡ 000180
5EC40856 89064689 06578826 04478826 885EC404 56890246 8902578B 26078826 &..&.W..F@.Vââ^¡&.G.&.W..F•.VÁâ^ 0001A0
AA76FF52 6AAA4689 0000FFFF 9A5016D2 46805016 D2468008 77FF260A 77FF260A .&.w.&.w..F@.P.F@.P......F˙jR.v˙ 0001C0
08478826 885EC404 42E90003 E9037500 003008C4 8306E600 009A0A76 FF0C76FF .v..v....l..â.=..u.Õ..ÕB.â^¡&.G. 0001E0
```

Dump of file SATURN:[PCCOMMON.DUMP.DLL]DAD.TMP;1 on 18-APR-1990 10:40:03.08
File ID (551,9,0)   End of file block 267 / Allocated 268

Virtual block number 57 (00000039), 512 (0200) bytes

```
C40E5788 260C4788 26885EC4 E25689E0 46890257 18260728 26885EC4 0A578826 &.W.â^¡&+.&.W..FÅ.Vãâ^¡&.G.&.W.â 000000
2A9AE076 FFE276FF 146A006A 146A006A AE5689AC 46890657 18260447 2826885E ^¡&+G.&.W..F¯.VÜj.j.j.j..vã.vÅ.* 000020
2A9AAC76 FFAE76FF 146A006A 146A006A E25689E0 46890001 01C69A50 520CE801 .Ó.RP.ó....FÅ.Vãj.j.j.j..vÜ.v¯.* 000040
02578926 07892604 5688D246 88885EC4 AE5689AC 4689FFFF 01C69A50 52000801 ...RP.ó....F¯.VÜâ^¡.F@.V&&..&.W. 000060
5613E046 03025788 26078826 885EC406 57892604 47892608 56880646 88885EC4 â^¡.F•.VÄ&.G.&.W.â^¡&..&.W..FÅ.V 000080
885EC4AE 5613AC46 03065788 26044788 26885EC4 0A578926 08478926 885EC4E2 ââ^¡&.G.&.W.â^¡&.G.&.W..F¯.VÜâ^¡ 0000A0
FF9A5016 F8468D88 76FF8A76 FF0877FF 260A77FF 260A5EC4 0E578926 0C478926 &.G.&.W.â^.&.w.&.w..vo.v¡.F½.P.. 0000C0
FF0C76FF AA76FF52 6A1A5789 26184789 26FA5688 F8468880 5EC4AA46 890000FF ....F˙â^¯.F½.V°&.G.&.W.jR.v˙.v.. 0000E0
6A006A00 6AF876FF FA76FF03 26E90003 E9037500 003008C4 83000700 009A0A76 v....■..â.=..u.Õ..Õ&..v°.v½j.j.j 000100
7500003D 08C4830E 0900009A 0A76FF0C 76FFAA76 FF526AAA 46890000 FFFF9A01 .......F˙jR.v˙.v..v.......â.=..u 000120
AA76FF52 6AAA4689 0000FFFF 9A8076FF 8276FFF8 76FFFA76 FF02F4E9 0003E903 .Õ..Õ¶..v°.v½.vý.v¯......F˙jR.v˙ 000140
FF8476FF 8676FF02 C2E90003 E9037500 003008C4 830E4200 009A0A76 FF0C76FF .v..v....B..â.=..u.Õ..Õö..vÑ.vÇ. 000160
9A0A76FF 0C76FFAA 76FF506A AA468900 00FFFF9A 5016BC46 800F6A06 76FF0876 v..v.j..F¥.P......F˙jP.v˙.v..v.. 000180
0C76FFBC 76FF8E76 FF5016CE 46800289 E90003E9 03750000 3008C483 0F110000 .....â.=..u.Õ..Õ...Fö.P.v/.v¥.v. 0001A0
9A8076FF 8276FFCE 76FF0076 FF0075E9 03750000 300CC483 0F550000 9A0A76FF .v....U..â.=..u.Õu..vÅ.vö.vý.v¯. 0001C0
5EC4004A E9037500 DA7E8302 46E90003 E9037500 003DAA46 8908C483 0ED51A9E ..J..â..F˙=..u.Õ..ÕF..-Õ.u.ÕJ.â^ 0001E0
```

```
Dump of file SATURN:[PCCOMMON.DUMP.DLL]DAD.TMP;1 on 18-APR-1990 10:40:03.08
File ID (551,9,0)    End of file block 267 / Allocated 268

Virtual block number 58 (0000003A), 512 (0200) bytes

57882604 47882614 5FC426CE 5EC4D456 89D24689 02578826 07882614 5FC426CE ö&6_.&..&.W..F@.V&6^ö&6_.&.G.&.W 000000
000030AA 468908C4 830F7312 199AB076 FFB276FF 5016D246 80D85689 D6468906 ..F@.VÁ.F@.P.vý.v¯...s..6..F`=.. 000020
0000053C 9A5016C2 4680146A 0676FF08 76FFB476 FFB676FF 01F3E900 03E90375 u.Ö..Ö«..vÑ.vÇ.v..v.j..Fò.P.<... 000040
8AE90003 E9037500 003D08C4 83100C00 009A0A76 FF0C76FF AA76FF50 6AAA4689 .F`jP.v`.v..v.......6.=..u.Ö..Ö¤ 000060
FF5A868D 00A6E903 75024708 26078826 E45EC4E6 5689E446 89C45688 C2468801 ..Fö.V6.Fö.V|6^ö&..&.G.u.Ö!...Z. 000080
E9037500 0030DCC4 83FFFF00 009A0A76 FF0C76FF 37FF2602 77FF26E4 5FF45016 .P6^ö&.w.&.7.v..v.......6.=..u.Ö 0000A0
03750000 30AA4689 08C4830F C81A9E9A FF5AB6FF FF5CB6FF B076FFB2 76FF0079 y..vý.v¯.Ñ\..ÑZ....à..6..F`=..u. 0000C0
D2468902 57882607 8826145F C426805E C4004CE9 0375000A 7E830155 E900C3E9 Ö..ÖU..~Ö.u.ÖL.6^¯&6_.&..&.W..F@ 0000E0
5CB6FF50 16D2468D D8568906 46890657 88260447 8826145F C426805E C4D45689 .V&6^¯&6_.&.G.&.W..F@.VÁ.F@.P.Ñ\ 000100
E904E446 830100E9 0003E903 7500003D AA468908 C4830C27 12199AFF 5AB6FFFF ..ÑZ....¯..6..F`=..u.Ö..Ö...Fö.Ö 000120
506AAA46 8900000B 339A5016 FF5E868D 026A0676 FF0876FF B476FFB6 76FFFF4B K..vÑ.vÇ.v..v.j...^..P.3....F`jP 000140
16CA468D 008FE900 03E90375 00003008 C4830952 00009A0A 76FF0C76 FFAA76FF .v`.v..v....R..6.=..u.Ö..Ö¢..Fò. 000160
9A006A00 6A5016FF 5E86800A 76FF0C76 FFB076FF B276FF00 6A006A00 6A006A50 Pj.j.j.j..vý.v¯.v..v...^..Pj.j.. 000180
76FF0876 FFB476FF B676FF00 86E90003 E9037500 0030AA46 891CC483 07904184 .A...6..F`=..u.Ö..Ö...vÑ.vÇ.v..v 0001A0
00A50000 9A0A76FF 0C76FFAA 76FF506A AA468900 000EFC9A 5016C646 80126A06 .j..Fó.P.•....F`jP.v`.v..v....É. 0001C0
0788260C 5EC40E56 890C4689 C85688C6 4688004D E90003E9 03750000 3008C483 .6.=..u.Ö..ÖM..Fó.Và.FÉ.VBÁ^É&.. 0001E0
```

```
Dump of file SATURN:[PCCOMMON.DUMP.DLL]DAD.TMP;1 on 18-APR-1990 10:40:03.08
File ID (551,9,0)    End of file block 267 / Allocated 268

Virtual block number 59 (0000003B), 512 (0200) bytes

3F9A37FF 260277FF 260C5EC4 8076FFB2 76FF5016 FC468D00 32E90375 02470826 &.G.u.Ö2..F•.P.vý.v¯6^É&.w.&.7.? 000000
7400AA7E 83FFBFE9 04DC4683 0007E900 03E90375 000030AA 46890CC4 83104217 .B..6..F`=..u.Ö..Ö...FÉ.Ö¢..-`.t 000020
B0468800 19E90375 00AA7E83 02578926 07892682 56888046 880E5EC4 0010E903 .Ö..6^..F¯.Vý&..&.W..-`.u.Ö...F¯ 000040
27E90375 C44608C2 468804C4 8310C114 379AB076 FFB276FF 000EE903 75B24608 .Fýu.Ö...vý.v¯.7.è..6..Fò.F6u.Ö' 000060
0A76FF0C 76FFAA76 FF506AAA 46890000 11609AC2 76FFC476 FFB476FF B676FF00 ..vÑ.vÇ.v6.vó.'....F`jP.v`.v..v. 000080
9AC676FF C876FFB4 76FFB676 FF0027E9 0375C846 0BC6468B 08C48311 7500009A ...u..6..Fó.Fàu.Ö'..vÑ.vÇ.và.vó. 0000A0
0000E9AA 468808C4 83107E00 009A0A76 FF0C76FF AA76FF50 6AAA4689 00000601 |....F`jP.v`.v..v....~..6..F`Ö.. 0000C0
C7F64689 F8468900 00880000 F446C7D8 8E0867B8 1E565700 000CC8C8 C95F5E1F .^_èùà...WV.ig..ÁúF¶..|...F½.F-ú 0000E0
47882606 5EC40789 26024789 26000088 0A5EC4FC 4689FE46 89000088 0000FA46 F•¯..|...F±.F•6^.|..&.G.&..6^.&.G 000100
468D326A 326AFA76 FFFA4689 0788261F C426F65E C4F85689 F6468904 57882602 .&.W..F-.V½6^-&6.&...F•.v•j2j2.F 000120
003008C4 83123000 009AF676 FFF876FF F476FF4F 6AF44689 0000093D 9A5016FC •.P.=....F¶jO.v¶.v½.v-...0..6.=. 000140
89000009 ED9AFC76 FFFE76FF 50520014 05F85688 F6468801 E8E90003 E9037500 .u.Ö..ÖÖ..F-.V½...RP.v±.v•.Ú.... 000160
0181E900 03E90375 00003008 C4831310 00009AF6 76FFF876 FFF476FF 526AF446 F¶jR.v¶.v½.v-......6.=..u.Ö..ÖŸ. 000180
26000088 FC5EC404 57892602 478926F8 5688F646 88FC5EC4 000107C7 26FC5EC4 6^•&ú...6^•.F-.V½&.G.&.W.6^•|..& 0001A0
5EC40001 0E47C726 FC5EC40A 4789260C 47892600 0088FC5E C4064789 26084789 .G.&.G.6^•|..&.G.&.G.6^•&úG...6^ 0001C0
FC5EC414 47892616 47892600 0088FC5E C4125789 26104789 26085688 064688FC •.F..V.&.G.&.W.6^•|..&.G.&.G.6^• 0001E0
```

```
Dump of file SATURN:[PCCOMMON.DUMP.DLL]DAD.TMP;1 on 18-APR-1990 10:40:03.08
File ID (551,9,0)    End of file block 267 / Allocated 268

Virtual block number 60°(0000003C), 512 (0200) bytes

26000088 FC5EC41C 4789261E 47892600 0088FC5E C4184789 261A4789 26000088 |..&.G.&.G.6^•|..&.G.&.G.6^•|..& 000000
5EC42847 89262A47 89260000 88FC5EC4 00003047 C726FC5E C4244789 26264789 .G&&.G$6^•&úG0..6^•|..&.G•&.G(6^ 000020
89000013 2F9A5052 002005FE 5688FC46 88FA76FF 2C478926 2E478926 000088FC •|..&.G.&.G,.v•.F•.V±. .RP./.... 000040
00D1E900 03E90375 00003008 C4831344 00009AF6 76FFF876 FFF476FF 526AF446 F¶jR.v¶.v½.v-...D..6.=..u.Ö..Öi. 000060
76FFF876 FFF476FF 526AF446 8900000A 559A5052 001405FE 5688FC46 88FA76FF .v•.F•.V±...RP.U....F¶jR.v¶.v½.v 000080
C416578B 2614478B 26065EC4 009DE900 03E90375 00003008 C4831143 00009AF6 -...C..6.=..u.Ö..Ö..6^.&.G.&.W.6 0000A0
5EC40877 FF260A77 FF26F65E C41FA5F2 0008890A 8E1EF088 F888145F C426FC5E ^•&6_..•.b..Ö¿...É.6^-&.w.&.w.6^ 0000C0
76FF526A F4468900 00007F9A 50520018 05FE5688 FC468814 77FF2616 77FF26FC •&.w.&.w..F•.V±...RP......F¶jR.v 0000E0
77FF26FC 5EC40037 E90003E9 03750000 3008C483 13E10000 9AF676FF F876FFF4 ¶.v½.v-...Å..6.=..u.Ö..Ö7.6^•&.w 000100
009AF676 FFF876FF F476FF52 6AF44689 000000F4 9AFC76FF FE76FF18 77FF261A .&.w..v±.v•.¶....F¶jR.v¶.v½.v-.. 000120
FC46880A 5EC40010 E9037400 F47E8300 00E90003 E9037500 003008C4 8311F900 .•..6.=..u.Ö..Ö...-¶.t.Ö..6^..F• 000140
76FF000E E90375FE 4608FC46 880019E9 037500F4 7E830257 89260789 26FE5688 .V±&..&.W..-¶.u.Ö...F•.F±u.Ö...v 000160
80881E56 57000014 C8C8C95F 5E1F0000 E9F44688 04C48311 1114379A FC76FFFE ±.v•.7....6..F¶Ö...^_èùà...WV.|. 000180
88FC4689 FE468900 00880000 F646C7F2 4689F446 89000088 0000F046 C7D88E11 ..ÁúFP..|...F¶.F úF-..|...F±.F•| 0001A0
89F24689 04578826 02478826 065EC4F8 4689FA46 89000088 EC4689EE 46890000 ...FŸ.F$|...F•.F½6^.&.G.&.W..F`. 0001C0
5EC40064 E903752E 4708262C 47882606 5EC4F646 89078826 1FC426F2 5EC4F456 V¶6^`&6.&...F-6^.&.G,&.G.u.Öd.6^ 0001E0
```

```
Dump of file SATURN:[PCCOMMON.DUMP.DLL]DAD.TMP;1 on 18-APR-1990 10:40:03.08
File ID (551,9,0)   End of file block 267 / Allocated 268

Virtual block number 61 (0000003D), 512 (0200) bytes

 339A5016 FC46802C 77FF262E 77FF2606 5EC40000 151E9A2C 77FF262E 77FF2606 .&.w.&.w,.....á^.&.w.&.w,.F=.P.3 000000
 26065EC4 FFD2F90E 47892610 47892600 0088FC5E C40011E9 03740000 30000015 ...=..t.Ö..á^=¡..&.G.&.G.Öθ.á^.& 000020
 83157C00 009AF276 FFF476FF F076FF52 6AF04689 00001567 9A2C77FF 262E77FF .w.&.w,.g....FÞjR.vÞ.v¶.v·...|.. 000040
 07669A28 77FF262A 77FF2606 5EC4006F E903752A 4708262B 47882606 5EC408C4 á.á^.&.G(&.G*u.Öo.á^.&.w*&.w(.f. 000060
 C4001CE9 03740000 30000007 7B9A5016 EC468D28 77FF262A 77FF2606 5EC40000 ..á^.&.w*&.w(.F$.P.(...=..t.Ö..á 000080
 FF26065E C4FFC7E9 08C48315 9E1A9E9A EC76FFEE 76FF2477 FF262677 FF26065E ^.&.w&&.w$.v¥.v$......á.Öü.á^.&. 0000A0
 C48315F7 00009AF2 76FFF476 FFF076FF 526AF046 890000FF FF9A2877 FF262A77 w*&.w(.......FÞjR.vÞ.v¶.v·...%..á 0000C0
 0EB21A9E 9A0676FF 0876FF00 6A006A00 12E90375 26470826 24478826 065EC408 .á^.&.G$&.G&u.Ö..j.j..v..v...... 0000E0
 E79A0A77 FF260C77 FF26065E C40013E9 03750C47 08260A47 8826065E C408C483 .á.á^.&.G.&.G.u.Ö..á^.&.w.&.w..Ö 000100
 1677FF26 065EC4F6 76FF0026 E9037516 47082614 47882606 5EC404C4 83142753 $'..á.á^.&.G.&.G.u.Ö&..v-á^.&.w. 000120
 26065EC4 08C48316 2000009A F276FFF4 76FFF076 FF526A00 0016519A 1477FF26 &.w..Q...jR.vÞ.v¶.v·...·..á.á^.& 000140
 6A0000FF FF9A1C77 FF261E77 FF26065E C4F676FF 0026E903 751E4708 261C4788 .G.&.G.u.Ö&..v-á^.&.w.&.w......j 000160
 E9037522 47082620 47882606 5EC408C4 83166300 009AF276 FFF476FF F076FF52 R.vÞ.v¶.v·...c..á.á^.&.G &.G"u.Ö 000180
 F276FFF4 76FFF076 FF526A00 00FFFF9A 2077FF26 2277FF26 065EC4F6 76FF0026 &..v-á^.&.w"&.w .....jR.vÞ.v¶.v· 0001A0
 261A77FF 26065EC4 0025E903 751A4708 26184788 26065EC4 08C48316 9800009A ......á.á^.&.G.&.G.u.Ö%.á^.&.w.& 0001C0
 F2468808 C48316CD 00009AF2 76FFF476 FFF076FF 526A0000 FFFF9A00 6A1877FF .w.j......jR.vÞ.v¶.v·...ë..á..F· 0001E0

Dump of file SATURN:[PCCOMMON.DUMP.DLL]DAD.TMP;1 on 18-APR-1990 10:40:03.08
File ID (551,9,0)   End of file block 267 / Allocated 268

Virtual block number 62 (0000003E), 512 (0200) bytes

 6AF04689 0000FFFF 9A5016F8 4680016A 006A0676 FF0876FF 50520014 05F45688 .V¶...RP.v..v.j.j..F%.P......FÞj 000000
 0000FFFF 9A0676FF 0876FFF6 76FF08C4 8316F100 009AF276 FFF476FF F076FF52 R.vÞ.v¶.v·...þ..á..v-.v..v...... 000020
 47082608 478826F2 5EC408C4 8313AA00 009AF276 FFF476FF F076FF4F 6AF04689 .FÞjO.vÞ.v¶.v·...¯..á.á^·&.G.&.G 000040
 77FF2612 77FF26F2 5EC4001E E9037512 47082610 478826F2 5EC4002E E903750A .u.Ö..á^·&.G.&.G.u.Ö..á^·&.w.&.w 000060
 C8CBC95F 5E1F0000 E9000088 08C48302 840B6A9A 0877FF26 0A77FF26 F25EC410 .á^·&.w.&.w..j.Ç..á.¡..Ö...^_èùà 000080
 00B80000 CB46C7BC 4689BE46 89000088 00008646 C7D88E14 3FB81E56 570000A2 Å..WV.¡?..ÁúFÑ..¡...Ff.F¥úFà¯..¡. 0000A0
 00008849 CE46C6EC 4689EE46 89000088 F44689F6 46890000 88C44689 C6468900 ..Fó.Fá¡...F-.F¶¡...FŸ.F&óFöl¡.. 0000C0
 46898A46 89000088 D44689D6 46890000 88D04689 D2468900 0088C046 89C24689 .Fò.Fâ¡...Fθ.FÂ¡...Fø.Få¡...Fo.F 0000E0
 00B80C46 89DE4689 000088CA 4689CC46 89000088 FF5E8689 FF608689 00008888 ¡¡....`...^.¡...Fä.Fò¡...Fθ.FÉ¡. 000100
 02478826 0A5EC4E8 4689EA46 89000088 F04689F2 46890000 88D84689 0A468900 ..FÖ.FÄ¡...F·.FÞ¡...Fõ.FÒá^.&.G. 000120
 2B478826 1FC4268C 5EC4C846 89078826 1FC4268C 5EC48E56 898C4689 04578826 &.W..F¥.V/á^¥&á.&...Fàá^¥&á.&.G+ 000140
 4F6AB646 89000011 E49A5016 F4468D29 6A326AC8 76FFC656 89C44689 2D578826 &.W-.Fá.Vó.vàj2j).F¶.P.Ö....FÑjO 000160
 26F45EC4 06D2E900 03E90375 00003008 C48318F0 00009ABC 76FFBE76 FFB676FF .vÑ.v/.v¥...Þ..á.=..u.Ö..Öθ.á^¶& 000180
 89260856 88064688 F45EC404 57892602 4789268E 56888C46 88F45EC4 000207C7 ú...á^¶.F¥.V/&.G.&.W.á^¶.F..V.&. 0001A0
 4789260C 56880A46 88F45EC4 0A478926 0C478926 000088F4 5EC40857 89260647 G.&.W.á^¶¡..&.G.&.G.á^¶.F..V.&.G 0001C0
 26F45EC4 14478926 16478926 000088F4 5EC40000 1247C726 F45EC410 5789260E .&.W.á^¶&úG...á^¶¡..&.G.&.G.á^¶& 0001E0

Dump of file SATURN:[PCCOMMON.DUMP.DLL]DAD.TMP;1 on 18-APR-1990 10:40:03.08
File ID (551,9,0)   End of file block 267 / Allocated 268

Virtual block number 63 (0000003F), 512 (0200) bytes

 0088F45E C41B4789 261D4789 26000088 F45EC449 1A47C626 F45EC400 001847C7 ùG...á^¶&6G.1á^¶¡..&.G.&.G.á^¶¡. 000000
 89000019 129AF476 FFF676FF 50520018 05BE5688 8C46881F 47892621 47892600 .&.GI&.G..F¥.V/...RP.v-.v¶...... 000020
 060EE900 03E90375 00003008 C4831927 00009ABC 76FFBE76 FFB676FF 526AB646 FÑjR.vÑ.v/.v¥...'..á.=..u.Ö..Ö.. 000040
 76FFB676 FF526AB6 46890000 121B9AF4 76FFF676 FF505200 2C050C56 880A468B .F..V...RP.v-.v¶......FÑjR.vÑ.v 000060
 F6568BF4 4688C6 5 FF05D7E9 0003E903 75000030 08C48319 5B00009A BC76FFBE /.v¥....(..á.=..u.Ö..Öm..vá.F¶.V- 000080
 08C48319 980000VA BC76FFBE 76FFB676 FF526AB6 46890000 0A899A50 52002305 .#.RP......FÑjR.vÑ.v/.v¥......á. 0000A0
 002705F6 5688F446 880676FF 0876FFC4 76FFC676 FF05A3E9 0003E903 75000030 =..u.Ö..ÖÈ..vó.vá.v..v..F¶.V-.'. 0000C0
 00003008 C48319D1 00009ABC 76FFBE76 FFB676FF 506AB646 8900000A FA9A5052 RP.°....FÑjP.vÑ.v/.v¥...1..á.=.. 0000E0
 00000FF7 9A5016F8 4680096A 0676FF08 76FFC476 FFC676FF 0566E900 03E90375 u.Ö..Öf..vó.vá.v..v..j..F%.P.%... 000100
 2DE90003 E9037500 003008C4 8314FD00 009ABC76 FFBE76FF B676FF50 6AB64689 .FÑjP.vÑ.v/.v¥...=..á.=..u.Ö..Ö- 000120
 0A77FF26 BC5EC4E6 5689E446 89FE5688 FC4688E2 5689E046 89FA5688 F8468805 ..F%.V°.FÁ.Vä.F=.Vz.Fô.V|á^¥&.w. 000140
 76FFBE76 FFB676FF 526AB646 890000FF FF9A5016 E0468D50 16E0468D 0877FF26 &.w..FÁ.P.FÁ.P......FÑjR.vÑ.v/.v 000160
 9AF476FF F676FF50 16E0468D 040AE900 03E90375 00003008 C4831AD1 00009ABC ¥...1...á.=..u.Ö..ÖÖ..FÁ.P.v-.v¶. 000180
 0374E046 39FA5688 F8468804 89E90003 E9037500 00308646 8908C483 1A8F0867 g....á..FÑ=..u.Ö..Ö¿..F%.V°9FÁt. 0001A0
 21E90375 E6563900 08E90374 E44639FE 5688FC46 880016E9 0374E256 39001EE9 Ö..9Vät.Ö...F=.V±9Fôt.Ö..9V|u.Öt 0001C0
 E90003E9 03750000 3D864689 08C4831D 182C079A F476FFF6 76FF5016 E0468D00 ..FÁ.P.v-.v¶..,...á..FÑ=..u.Ö..Ö 0001E0
```

```
Dump of file SATURN:[PCCOMMON.DUMP.DLL]DAD.TMP;1 on 18-APR-1990 10:40:03.08
File ID (551,9,0)   End of file block 267 / Allocated 268

Virtual block number 64 (00000040), 512 (0200) bytes

 261B4789 26C2568B C0468BF4 5EC4B646 890000FF FF9A5016 C0468DC8 76FF046C l..và.Fà.P......FÑá^¶.Fà.Vô&.G.& 000000
 2DE90003 E9037500 003D08C4 83180200 009ABC76 FFBE76FF B676FF52 6A105789 .W.jR.vÑ.vf.v¥......á.=..u.Õ..Õ- 000020
 9ABC76FF BE76FFB6 76FF526A B6468900 00FFFF9A 5016E046 8DC076FF C276FF04 ..vô.vá.FÁ.P......FÑjR.vÑ.vf.v¥. 000040
 00FFFF9A 146A006A C076FFC2 76FF03FC E90003E9 03750000 3D08C483 1B320000 ..2..á.=..u.Õ..Õ=..vô.vâj.j..... 000060
 E90003E9 03750000 3D08C483 1B840000 9ABC76FF BE76FFB6 76FF526A B6468900 ..FÑjR.vÑ.vf.v¥......á.=..u.Õ..Õ 000080
 FFFF9A50 16D0468D 1877FF26 1A77FF26 0A5EC408 77FF260A 77FF268C 5EC403CC ä.á^¥&.w.&.w.á^.&.w.&.w..FÁ.P... 0000A0
 76FFBE76 FFB676FF 526A2157 89261F47 89260256 8B00468B F45EC4B6 46890000 ...FÑá^¶.FÁ.V@&.G.&.W!jR.vÑ.vf.v 0000C0
 0000FF64 86C70078 FF6286C7 037AE900 03E90375 00003D08 C4831BCE 00009ABC ¥...õ..á.=..u.Õ..Õz.ú.b.x.û.d... 0000E0
 B6468900 00FFFF9A 5016FF62 86800076 FFD276FF 0000FF68 86C70078 FF6686C7 ú.f.x.ú.h....v@.vÅ..b..P......FÑ 000100
 76FF0330 E90003E9 03750000 3D08C483 1BFF0000 9ABC76FF BE76FFB6 76FF526A jR.vÑ.vf.v¥......á.=..u.Õ..Õ0..v 000120
 3100009A BC76FFBE 76FFB676 FF526AB6 46890000 FFFF9A50 16E0468D D076FFD2 @.vÅ.FÁ.P......FÑjR.vÑ.vf.v¥...1 000140
 C000FFFF 9AF476FF F676FFD0 76FFD276 FF02FFE9 0003E903 7500003D 08C4831C ..á.=..u.Õ..Õ...v@.vÅ.v¬.v¶..... 000160
 CDE90003 E9037500 003D08C4 831C6100 009ABC76 FFBE76FF B676FF52 6AB64689 .FÑjR.vÑ.vf.v¥...a..á.=..u.Õ..Õë 000180
 C009ABC76 FFBE76FF B676FF52 6AB64689 0000FFFF 9A146A00 6AD076FF D276FF02 ..v@.vÅj.j.......FÑjR.vÑ.vf.v¥.. 0001A0
 E0036A06 76FF0876 FFC476FF C676FF02 9DE90003 E9037500 003D08C4 831C9A00 ....á.=..u.Õ..Õ...vó.vá.v..v.j.. 0001C0
 3D08C483 1CFA0000 9ABC76FF BE76FFB6 76FF506A B6468900 001CE59A 5016EC46 F&.P.Í....FÑjP.vÑ.vf.v¥...ª..á.= 0001E0

Dump of file SATURN:[PCCOMMON.DUMP.DLL]DAD.TMP;1 on 18-APR-1990 10:40:03.08
File ID (551,9,0)   End of file block 267 / Allocated 268

Virtual block number 65 (00000041), 512 (0200) bytes

 06E90377 00EC7E83 0009E903 7E0014E9 037D00EE 7E830264 E90003E9 03750000 ..u.Õ..Õd..~¥.).Õ..~.Õ...~ã.w.Õ. 000000
 E0066A06 76FF0876 FFC476FF C676FF18 478926F4 5EC40000 B80003E9 0001B800 .|..Õ..|..á^¶&.G..vó.vá.v..v.j.. 000020
 3D08C483 1D550000 9ABC76FF BE76FFB6 76FF506A B6468900 001D409A 5016CE46 Fö.P.@....FÑjP.vÑ.vf.v¥...U..á.= 000040
 E6468906 C4831553 2EE29AF4 76FFF676 FF5098CE 468A0204 E90003E9 03750000 ..u.Õ..Õ...Fö.P.v¬.v¶.â.S..á..FÑ 000060
 9A5016FF 6A868002 6A0676FF 0876FFC4 76FFC676 FF01E3E9 0003E903 7500003D =..u.Õ..ÕD..vó.vá.v..v.j...j..P. 000080
 E9037500 003D08C4 83182C00 009ABC76 FFBE76FF B676FF50 6AB64689 000019BC ¥....FÑjP.vÑ.vf.v¥.......á.=..u.Õ 0000A0
 868D8C76 FFBE76FF 006A006A F476FFF6 76FF006A 006A5016 D4468D01 A9E90003 ..Õ`..Fá.Pj.j..v¬.v¶j.j..vf.v¥.. 0000C0
 76FFD170 E90003E9 03750000 30B64689 1CC4831E F441849A 006A006A 5016FF6A j..Pj.j...A¶..á..FÑ=..u.Õ..Õp..v 0000E0
 FFB676FF 506AB646 89000010 699A5016 FF5E868D 136A0676 FF0876FF C476FFC6 ó.vá.v..v.j...^..P.i....FÑjP.vÑ. 000100
 FF609688 FF5E8688 0136E900 03E90375 00003008 C4831E22 00009ABC 76FFBE76 vf.v¥..."..á.=..u.Õ..Õ6...^...`. 000120
 FF26885E C4C476FF C676FF01 19E90375 02470826 078B2688 5EC48A56 89884689 .F|.Vná^|&..&.G.u.Õ...vó.vàá^|&. 000140
 9ABC76FF BE76FFB6 76FF506A B6468900 001E4A9A 50160C46 80D06A37 FF260277 w.&.7j..FÉ.P.J....FÑjP.vÑ.vf.v¥. 000160
 260277FF 26885EC4 C476FFC6 76FF000C E90003E9 03750000 3D08C483 1E5F0000 .. ..á.=..u.Õ..ÕÉ..vó.vàá^|&.w.& 000180
 2400009A BC76FFBE 76FFB676 FF506AB6 46890000 0E2D9A50 1608468D 0E6A37FF .7j..FÄ.P.-....FÑjP.vÑ.vf.v¥...$ 0001A0
 BC76FFBE 76FFDC76 FFDE76FF 5016F046 8D009FE9 0003E903 7500003D 08C4831A ..á.=..u.Õ..Õ...Fb.P.vß.vÉ.vf.v¥ 0001C0
 76FFBE76 FFD876FF DA76FF50 16E8468D 0077E903 75000030 0CC4831E A4009C9A ...Ê..á.=..u.Õw..FÒ.P.vÖ.vÅ.vf.v 0001E0

Dump of file SATURN:[PCCOMMON.DUMP.DLL]DAD.TMP;1 on 18-APR-1990 10:40:03.08
File ID (551,9,0)   End of file block 267 / Allocated 268

Virtual block number 66 (00000042), 512 (0200) bytes

 37FF2602 77FF2688 5EC45016 CA468D00 56E90375 0000300C C4831EC9 009C9ABC ¥...è..á.=..u.ÕV..Fò.Pá^|&.w.&.7 000000
 76FFEA76 FF5016CA 46800031 E9037400 003D0CC4 830E6601 389ABC76 FFBE76FF .vf.v¥.8.f..á.=..t.Õ1..Fò.P.vô.v 000020
 75000030 86468910 C48315C1 25859A37 FF260277 FF26885E C4F076FF F276FFE8 Ò.v·.vÞá^|&.w.&.7..%è..á..FÑ=..u 000040
 F6568BF4 46880E5E C40010E9 03740086 7E83FED8 E904B846 830007E9 0003E903 .Õ..Õ...F|.ÕÄ±.~Ñ.t.Õ..á^..F¶.V- 000060
 76FFF676 FF000EE9 0375F646 08F4468B 0019E903 7500867E 83025789 26078926 &..&.W..-Ñ.u.Õ...F¶.F-u.Õ...v¬.v 000080
 FF6086FF C476FFC6 76FF0029 E90375FF 60860BFF 5E868804 C483108B 23559AF4 ¶.U#...á...^...`.u.Õ)..vó.vá.Ñ'. 0000A0
 8808C483 1DC80000 9ABC76FF BE76FFB6 76FF506A B6468900 00112E9A FF5E86FF .Ñ^.......FÑjP.vÑ.vf.v¥...à..á.. 0000C0
 46890000 B80000E4 46C7D88E 1747B81E 56570000 1CC8CBC9 5F5E1F00 00E98646 FÑÕ...^_èúà...WV.|G..ÄúFÕ..|...F 0000E0
 46890000 B8EA4689 EC468900 008BF446 89F64689 00008800 00EE46C7 E64689E8 Ò.F|úFŸ¯..|...F-.F¶|...F&.FÕ|...F 000100
 89E64689 04578826 02478826 065EC407 89260247 89260000 880A5EC4 F04689F2 ·.FÞá^.|..&.G.&..á^.&.G.&.W..F|. 000120
 89000018 179A5016 F4468D29 6A326AEE 76FFEE46 89078826 1FC426E6 5EC4E856 VÒá^|&á.&...FŸ.vŸj2j).F¶.P...... 000140
 02EFE900 03E90375 00003D08 C4831F7A 00009AE6 76FFE876 FFE476FF 4F6AE446 FÕjO.vÕ.vÒ.v|...z..á.=..u.Õ..Õÿ. 000160
 26000088 F45EC404 57892602 478926E8 568BE646 8BF45EC4 000207C7 26F45EC4 á^¶&ú...á^¶.F|.VÒ&.G.&.W.á^¶|..& 000180
 10578826 0E478826 065EC40A 4789260C 47892600 0088F45E C4064789 26084789 .G.&.G.á^¶|..&.G.&.G.á^.&.G.&.W. 0001A0
 47892608 56880646 8BF45EC4 00011247 C726F45E C4105789 260E4789 26F45EC4 á^¶&.G.&.W.á^¶&úG...á^¶.F..V.&.G 0001C0
 478826F4 5EC41A47 8A26065E C4184789 26F45EC4 18478826 065EC416 57892614 .&.W.á^.&.G.á^¶&.G.á^.&.G.á^¶&.G 0001E0
```

```
Dump of file SATURN:[PCCOMMON.DUMP.DLL]DAD.TMP;1 on 18-APR-1990 10:40:03.08
File ID (551,9,0)   End of file block 267 / Allocated 268

Virtual block number 67 (00000043), 512 (0200) bytes

 F45EC41F 47892671 47892600 0088F45E C4184789 26104789 26000088 F45EC41A .á^¶¡..&.G.&.G.á^¶¡..&.G!&.G.á^¶ 000000
 FF505200 1805E8 4 88E64688 00002747 C726F45E C4234789 26254789 26000088 ¡..&.G%&.G#á^¶&úG'...F!.VÒ...RP. 000020
 08C48321 3A000J9A E676FFE8 76FFE476 FF526AE4 46890000 18089AF4 76FFF676 v~.v¶.Ù....FõjR.vô.vÒ.vl...:!.á. 000040
 4688F45E C4E44689 00001AA8 9A5016EA 4680EE76 FF0204E9 0003E903 75000030 =..u.Ô..Ô...v¥.Fõ.P.¨....Fôá^¶.F 000060
 3008C483 21700000 9AE676FF E876FFE4 76FF526A 1D578926 18478926 EC5688EA õ.V&&.G.&.W.jR.vô.vÒ.vl...pl.á.= 000080
 890000FF FF9A5016 F8468018 77FF2610 77FF2606 5EC401C5 E90003E9 03750000 ..u.Ô..Ôé.á^.&.w.&.w..F½.P...... 0000A0
 018FE900 03E90375 00003008 C48321A0 00009AE6 76FFE876 FFE476FF 526AE446 FõjR.vô.vÒ.vl....!.á.=..u.Ô..Ô.. 0000C0
 00009AE6 76FFE876 FFE476FF 526AE446 8900001B 1D9A146A 006AEA76 FFEC76FF .v&.vôj.j.......FõjR.vô.vÒ.vl... 0000E0
 00001AED 9A5016F8 4680EA76 FFEC76FF 015FE900 03E90375 00003008 C48321D1 !!.á.=..u.Ô.._Ô..v&.vô.F½.P.Ú... 000100
 2EE90003 E9037500 003008C4 83222700 009AE676 FFE876FF E476FF52 6AE44689 .FõjR.vô.vÒ.vl¯..'".á.=..u.Ô..Ô. 000120
 5016F046 801877FF 261A77FF 260E5FC4 26065EC4 0877FF26 0A77FF26 E65EC401 .á^!&.w.&.w.á^.&á_.&.w.&.w..FÞ.P 000140
 76FFE476 FF526A21 5789261F 478926F2 5688F046 88F45EC4 E4468900 00185E9A .^....Fõá^¶.FÞ.V·Ï.G.&.W!jR.vô.v 000160
 F84680F0 76FFF276 FF0008E9 0003E903 75000030 08C48322 5800009A E676FFE8 Ô.vl...X".á.=..u.Ô..ÔÄ..v·.vÞ.F½ 000180
 00003008 C483228A 00009AE6 76FFE876 FFE476FF 526AE446 8900001B EA9A5016 .P.õ....FõjR.vô.vÒ.vl....".á.=.. 0001A0
 76FF526A E4468900 001C1C9A F476FFF6 76FFF076 FFF276FF 00A7E900 03E90375 u.Ô..ÔÏ..v·.vÞ.v~.v¶......FõjR.v 0001C0
 C70078F8 46C70075 E90003E9 03750000 3008C483 22CF0000 9AE676FF E876FFE4 õ.vÒ.vl...ü".á.=..u.Ô..Ôu.úF½x.ú 0001E0
```

```
Dump of file SATURN:[PCCOMMON.DUMP.DLL]DAD.TMP;1 on 18-APR-1990 10:40:03.08
File ID (551,9,0)   End of file block 267 / Allocated 268

Virtual block number 68 (00000044), 512 (0200) bytes

 46890000 18899A50 16F84680 F076FFF2 76FF0000 FE46C700 78FC46C7 0000FA46 F°..úF=x.úF±...v·.vÞ.F½.P.¿....F 000000
 FF0030E9 0003E903 75000030 08C48322 FF00009A E676FFE8 76FFE476 FF526AE4 õjR.vô.vÒ.vl....".½.=..u.Ô..Ô0.. 000020
 1000009A E676FFE8 76FFE476 FF526AE4 46890000 1C4C9A14 6A006AF0 76FFF276 v·.vÞj.j..L....FõjR.vô.vÒ.vl.... 000040
 5688F446 880A5EC4 0010E903 7400E47E 830000E9 0003E903 75000030 08C48320  .á.=..u.Ô..Ô...-ô.t.Ô..á^..F¶.V 000060
 FFF676FF 000EE903 75F64608 F4468800 19E90375 00E47E83 02578926 078926F6 -&..&.W..-ô.u.Ô...F¶.F-u.Ô...v-. 000080
 8E1F9288 1E565700 0010C8C8 C95F5E1F 0000E9E4 468804C4 831F4423 559AF476 v¶.UMD..á..Fõõ...^_èuà...VV.¡... 0000A0
 000088F8 4689FA46 89000088 0000F646 C7F24689 F4468900 00880000 F046C708 ÀúFÞ..¡...F¶.F·úF-¯..¡...F°.F½¡.. 0000C0
 0788261F C426F25E C4F45689 F2468904 57882602 47882606 5EC4FC46 89FE4689 .F±.F=á^.&.G.&.W..F·.V¶á^·&á.&.. 0000E0
 AA9A2377 FF262577 FF26065E C40090E9 03752547 08262347 8826065E C4F64689 .F-á^.&.G#&.G%u.Ô..á^.&.w%&.w#.¨ 000100
 0030E903 74000030 0000148F 9A5016F8 46802377 FF262577 FF26065E C4000014 ...á^.&.w%&.w#.F½.P.¢...=..t.Ô=. 000120
 0088F85E C40011E9 03740C57 3926001A E903740A 47392608 56880646 88F85EC4 á^½.F..V.&9G.t.Ô..&9W.t.Ô..á^½¡. 000140
 065EC4FF A6E90E47 89261047 89260000 88F85EC4 000EE90A 4789260C 47892600 .&.G.&.G.Ô..á^½¡..&.G.&.G.Ô!.á^. 000160
 24770000 9AF276FF F476FFF0 76FF526A F0468900 0014E89A 2377FF26 2577FF26 &.w%&.w#.Ô....FÞjR.vÞ.v¶.v·...w$ 000180
 77FF2610 77FF2606 5EC4F676 FF0029E9 03751047 08261847 8826065E C408C483 .á.á^.&.G.&.G.u.Ô)..v-á^.&.w.&.w 0001A0
 26065EC4 08C48324 AF00009A F276FFF4 76FFF076 FF526AF0 46890000 FFFF9A18 .......FÞjR.vÞ.v¶.v·...£$.á.á^.& 0001C0
 46890000 FFFF9A00 6A1F77FF 262177FF 26065EC4 0028E903 75214708 261F4788 .G.&.G!u.Ô(.á^.&.w!&.w.j.......F 0001E0
```

```
Dump of file SATURN:[PCCOMMON.DUMP.DLL]DAD.TMP;1 on 18-APR-1990 10:40:03.08
File ID (551,9,0)   End of file block 267 / Allocated 268

Virtual block number 69 (00000045), 512 (0200) bytes

 750C4708 260A4788 26065EC4 08C48325 0700009A F276FFF4 76FFF076 FF526AF0 ÞjR.vÞ.v¶.v·....%.á.á^.&.G.&.G.u 000000
 001805F4 5688F246 8804C483 234553E7 9A0A77FF 260C77FF 26065EC4 0013E903 .Ô..á^.&.w.&.w..ÔSE#.á..F·.V¶... 000020
 76FFF076 FF526AF0 46890000 253C9A50 16FC4680 016A006A 0676FF08 76FF5052 RP.v..v.j.j..F=.P.<%...FÞjR.vÞ.v 000040
 26065EC4 003AE903 75104708 260E4788 26065EC4 08C48325 5100009A F276FFF4 ¶.v·...Q%.á.á^.&.G.&.G.u.Ô:.á^.& 000060
 00001688 9A5016FC 4680016A 006A0676 FF0876FF 5052002C 05105788 26u`4788 .G.&.W..,.RP.v..v.j.j..F=.P.¡... 000080
 9A0676FF 0876FFF6 76FF0BC4 83257500 009AF276 FFF476FF F076FF52 6AFL 689 .FÞjR.vÞ.v¶.v·...u%.á..v~.v..v.. 0000A0
 0000E900 008808C4 8320F800 009AF276 FFF476FF F076FF4F 6AF04689 0000¡60C É....FÞjO.vÞ.v¶.v·...« .á.¡..Ô.. 0000C0
 C7C24689 C4468900 00880000 BC46C708 8E235088 1E565700 004EC8CB C95F5E1F .^_èùàN..VV.¡]#.ÀúF¥..¡...Fá.Fôú 0000E0
 88044689 06468900 00880046 89024689 000088C6 4689C846 89000088 0000CE46 Fö¯.¡...Fà.Fó¡...F®.FÅ¡...F=.Fà¡ 000100
 C7EA4689 EC468900 00880008 0846C7CA 4689CC46 89000088 F24689F4 46890000 ...F¶.F·¡...Fà.FòúFÄ..¡...F&.Fõú 000120
 89000088 EE4689F0 46890000 880000F6 46C70000 8446C700 008246C7 00008646 FÑ..úFý..úFÇ..úF-..¡...FÞ.F¥¡... 000140
 E64689E8 46890000 88E24689 E4468900 00888846 898A4689 0000888E 4689C046 Fà.F/¡...FD.F¡¡...FÔ.Fã¡...FÔ.F! 000160
 5EC4C456 89C24689 04578826 02478826 0A5EC407 89260247 89260000 88125EC4 á^.¡..&.G.&..á^.&.G.&.W..Fô.Váá^ 000180
 76FFC856 89C64689 20578826 28478826 1FC426C2 5EC4CE46 89078826 1FC426C2 ò&á.&...Foá^ò&á.&.G+&.W-.Fô.Và.v 0001A0
 00009AC2 76FFC476 FF8C76FF 4F6A8C46 8900001F F89A5016 D0468026 6A326ACE öj2j&.FÅ.P.«....F¥jO.v¥.vá.vö... 0001C0
 5688C246 88D05EC4 000307C7 26D05EC4 0C66E900 03E90375 00003008 C483243E >$.á.=..u.Ô..Ôf.á^Å&ú...á^Å.Fô.V 0001E0
```

```
Dump of file SATURN:[PCCOMMON.DUMP.DLL]DAD.TMP;1 on 18-APR-1990 10:40:03.08
File ID (551,9,0)   End of file block 267 / Allocated 268

Virtual block number 70 (00000046), 512 (0200) bytes

 0A4688D0 5EC40857 89260647 89260856 88064688 005EC404 57892602 478926C4 6&.G.&.W.6^Å.F..V.&.G.&.W.6^Å.F. 000000
 26005EC4 10578926 0E478926 105688OE 4688005E C40C5789 260A4789 260C5688 .V.&.G.&.W.6^Å.F..V.&.G.&.W.6^Å& 000020
 4789261A 47892600 0088005E C4144789 26164789 26000088 D05EC400 001247C7 úG...6^Å¡..&.G.&.G.6^Å¡..&.G.&.G 000040
 C2468820 47892622 47892600 0088D05E C41C4789 261E4789 26000088 D05EC418 .6^Å¡..&.G.&.G.6^Å¡..&.G"&.G .Fô 000060
 76FFC476 FFBC76FF 526ABC46 89000027 669AD076 FFD276FF 5052001C 05C45688 .V6...RP.v0.vÅ.f'...F¥jR.v¥.v6.v 000080
 FF505200 23050C56 880A4688 0BA2E900 03E90375 00003008 C483277B 00009AC2 ô...('.6.=..u.Ô..ÔÅ..F..V..#.RP. 0000A0
 08C48327 C800009A C276FFC4 76FFBC76 FF526ABC 46890000 27B39AD0 76FFD276 v0.vÅ."'...F¥jR.v¥.v6.vô...Å'.6. 0000C0
 37E90375 0C563900 08E90374 0A463910 56880E46 880868E9 0003E903 75000030 =..u.Ô..Ôk..F..V.9F.t.Ô..9V.u.Ô7 0000E0
 FFBC76FF 526ABC46 89000020 E69AD076 FFD276FF 50520023 05105688 0E468800 ..F..V..#.RP.v0.vÅ.| ...F¥jR.v¥. 000100
 76FFC676 FFC876FF 081EE900 03E90375 00003008 C4832805 00009AC2 76FFC476 v6.vô....(.6.=..u.Ô..Ô...và.v6.v 000120
 FFC476FF BC76FF50 6ABC4689 00001983 9A505200 24050256 88004688 0676FF08 ..v..FÅ.V0.$.RP......F¥jP.v¥.v6. 000140
 03740A46 39105688 0E46880A E1E90003 E9037500 003008C4 83285400 009AC276 vô...T(.6.=..u.Ô..ÔÅ..F..V.9F.t. 000160
 FF9A5016 EE46800C 6A0676FF 0876FFC6 76FFC876 FF03E5E9 03750C56 390008E9 Ô..9V.u.Ô|..và.v6.v..v.j..F¥.P.. 000180
 03E90375 00003D08 C48328BE 00009AC2 76FFC476 FFBC76FF 506ABC46 890000FF ....F¥jP.v¥.v6.vô...f(.6.=..u.Ô. 0001A0
 7E830009 E9037D00 8AE9037E 00E87E83 E85689E6 4689F056 88EE4688 0A92E900 .Ô...F¥.VÞ.F|.VÔ.-Ô.-.Ô..).Ô...- 0001C0
 C48C4689 0000FFFF 9A501604 46800877 FF260A77 FF26C25E C4007CE9 037602E6 |.v.Ô|.6^ô&.w.&.w..Få.P......F¥6 0001E0

Dump of file SATURN:[PCCOMMON.DUMP.DLL]DAD.TMP;1 on 18-APR-1990 10:40:03.08
File ID (551,9,0)   End of file block 267 / Allocated 268

Virtual block number 71 (00000047), 512 (0200) bytes

 28F00000 9AC276FF C476FFBC 76FF526A 22578926 20478926 D65688D4 4688D05E ^Å.Få.V0&.G &.W"jR.v¥.v6.vô...Þ( 000000
 89000029 6E9AD076 FFD276FF D476FFD6 76FF0A28 E90003E9 03750000 3008C483 .6.=..u.Ô..Ô(..v0.vå.v0.vÅ.n)... 000020
 09F6E900 03E90375 00003008 C4832951 00009AC2 76FFC476 FFBC76FF 526ABC46 F¥jR.v¥.v6.vô...Q).6.=..u.Ô..Ô-. 000040
 77FF26C2 5EC4027D E9037702 E67E8300 09E9037E 0288E903 7D00E87E 830294E9 Ô...~Ô.).Ô..-.Ô...-|.w.Ô).6^ô&.w 000060
 26204789 26065688 D4468BD0 5EC48C46 890000FF FF9A5016 D4468D08 77FF260A .&.w..Få.P......F¥6^Å.Få.V0&.G & 000080
 95E90003 E9037500 003008C4 83298300 009AC276 FFC476FF BC76FF52 6A225789 .W"jR.v¥.v6.vô....).6.=..u.Ô..Ô. 0000A0
 C276FFC4 76FFBC76 FF526ABC 46890000 FFFF9AD0 76FFD276 FFD476FF D676FF09 ..v0.vå.v0.vÅ......F¥jR.v¥.v6.vô 0000C0
 890000B8 DA46890C 46890000 B80963E9 0003E903 75000030 08C48329 FC00009A ...•).6.=..u.Ô..Ôc.|...fÉ.FÖ|... 0000E0
 E85688E6 468800E4 568301E2 46830008 E90000E4 46C70002 E246C7DE 4689E046 FÅ.FBúFã..úFÔ..Ô...Fã..VÔ..F|.VÔ 000100
 6A016A00 6AD476FF D676FF00 3AE90372 E2463900 08E9037D 0047E903 7EE45639 9VÔ-.ÔG.).Ô..9Fãr.Ô:..v0.vàj.j.j 000120
 C4832A38 00009AC2 76FFC476 FFBC76FF 526ABC46 890000FF FF9A5016 DA468001 ..FÔ.P......F¥jR.v¥.v6.vô...8*.6 000140
 8846800C 6A0676FF 0876FFC6 76FFC876 FFFFA3E9 08EAE900 03E90375 00003008 .=..u.Ô..Ôò.ÔÉ..và.v6.v..v.j..F| 000160
 00003008 C4832680 00009AC2 76FFC476 FFBC76FF 506ABC46 8900001D B39A5016 .P.*....F¥jP.v¥.v6.vô....&.6.=.. 000180
 03750247 08260788 268E5EC4 C056898E 46898A56 88884688 08AEE900 03E90375 u.Ô..ÔÙ..F|.Va.F/.V66^/&..&.G.u. 0001A0
 8900002A DF9A5016 E2468004 6A37FF26 0277FF26 BE5EC4C6 76FFC876 FF0134E9 Ô4..và.v66^/&.w.&.7j..Fã.P.Ô*... 0001C0
 0856E900 03E90375 00003008 C4832AF4 00009AC2 76FFC476 FFBC76FF 506ABC46 F¥jP.v¥.v6.vô...¶*.6.=..u.Ô..ÔV. 0001E0

Dump of file SATURN:[PCCOMMON.DUMP.DLL]DAD.TMP;1 on 18-APR-1990 10:40:03.08
File ID (551,9,0)   End of file block 267 / Allocated 268

Virtual block number 72 (00000048), 512 (0200) bytes

 380008E9 0374E246 3800DA83 000120E8 5688E646 8800E5E9 0375E446 08E24688 .Fã.FÔu.Ô|..F|.VÔ-...Ô.;Fãt.Ô..; 000000
 859A5016 F8468D02 6A37FF26 0277FF26 BE5EC4C6 76FFC876 FF00C9E9 0375E456 VÔu.Ôè..và.v66^/&.w.&.7j..F%.P.. 000020
 03E90375 00003008 C4832847 00009AC2 76FFC476 FFBC76FF 506ABC46 8900001C ....F¥jP.v¥.v6.vô...G+.6.=..u.Ô. 000040
 26C25EC4 E056890E 4689FE56 88FC4688 0C56890A 4689FA56 88F84688 07F2E900 .Ô·..F%.V*.FÖ.VÉ.F•.V±.FB.VÅ6^ô& 000060
 76FFBC76 FF526ABC 46890000 1A0F9A50 16DA468D 50160A46 8D0877FF 260A77FF .w.&.w..FÖ.P.FÖ.P......F¥jR.v¥.v 000080
 E476FFD4 76FFD676 FF079FE9 0003E903 75000030 08C4832B 8000009A C276FFC4 6.vô....+.6.=..u.Ô..Ô...v0.vå.vô 0000A0
 00009AC2 76FFC476 FFBC76FF 526ABC46 890000FF FF9A5016 DA468D00 6AE276FF .vãj..FÖ.P......F¥jR.v¥.v6.vô... 0000C0
 0A5EC404 76FFD676 FFFEB0E9 048E4683 0766E900 03E90375 00003008 C4832BC2 ô+.6.=..u.Ô..Ôf..F/.Ô§±.v0.vå6^. 0000E0
 9AC276FF C476FFBC 76FF526A 8C468900 0028E89A 006AFF6A 1F77FF26 2177FF26 &.wl&.w.j.j..Ô+...F¥jR.v¥.v6.vô. 000100
 262177FF 260E5EC4 D476FFD6 76FF0724 E90003E9 03750000 3008C483 28FD0000 ..»+.6.=..u.Ô..Ô$..v0.vå6^.&.wl& 000120
 832C3F00 009AC276 FFC476FF 8C76FF52 6ABC4689 0000FFFF 9A016AFF 6A1F77FF .w.j.j.......F¥jR.v¥.v6.vô...?,. 000140
 8C468900 00FFFF9A 5016F246 8DCE76FF 0251E906 E9E90003 E9037500 003008C4 6.=..u.Ô..ÔÔ.Ôo..vö.F·.P......F¥ 000160
 7500009A C276FFC4 76FFBC76 FF526A1A 57892618 478926F4 5688F246 88D05EC4 6^Å.F·.V¶&.G.&.W.jR.v¥.v6.vô...u 000180
 9A50160A 468D1B77 FF261D77 FF260A5E C406A7E9 0003E903 75000030 08C4832C ,.6.=..u.Ô..Ô|.6^.&.w.&.w..FÖ.P. 0001A0
 E9037500 003008C4 832CA600 009AC276 FFC476FF BC76FF52 6ABC4689 0000215B (|...F¥jR.v¥.v6.vô...|,.6.=..u.Ô 0001C0
 C476FFBC 76FF526A BC468900 00FFFF9A 50160A46 8DF276FF F476FF06 71E90003 ..Ôq..v¶.v·.FÖ.P......F¥jR.v¥.v6 0001E0
```

Dump of file SATURN:[PCCOMMON.DUMP.DLL]DAD.TMP;1 on 18-APR-1990 10:40:03.08
File ID (551,9,0)   End of file block 267 / Allocated 268

Virtual block number 73 (00000049), 512 (0200) bytes

```
006A006A F276FFF4 76FF0640 E90003E9 03750000 3008C483 2CD60000 9AC276FF .vô...ø,.á.=..u.Ô..Ôa..v¶.v·j.j. 000000
03750000 3008C483 2D060000 9AC276FF C476FFBC 76FF526A BC468900 00FFFF9A ......F¥jR.v¥.vá.vô....-.á.=..u. 000020
C476FFBC 76FF5?6A BC468900 00FFFF9A 286A006A F276FFF4 76FF0610 E90003E9 Ô..Ô...v¶.v·j.j(......F¥jR.v¥.vá 000040
FF9A1E6A F276FFF4 76FF05E0 E90003E9 03750000 3008C483 2D340000 9AC276FF .vô...4·.á.=..u.Ô..ÔÀ..v¶.v·j... 000060
03E90375 00003008 C4832D6A 00009AC2 76FFC476 FFBC76FF 526ABC46 890000FF ....F¥jR.v¥.vá.vô...j-.á.=..u.Ô. 000080
76FF526A BC468900 00FFFF9A 50160846 8D1F77FF 262177FF 260A5EC4 [illegible] .Ôÿ.á^.&.wl&.w..FÄ.P......F¥jR.v 0000A0
F276FFF4 76FF057C E90003E9 03750000 3008C483 2D990000 9AC276FF C476FFBC ¥.vá.vô....-.á.=..u.Ô..Ô|..v¶.v· 0000C0
003D08C4 832DE600 009AC276 FFC476FF BC76FF52 6ABC4689 0000FFFF 9AD876FF .vÀ......F¥jR.v¥.vá.vô...l-.á.=. 0000E0
9A5016CA 4680F276 FFF476FF 0877FF26 0A77FF26 C25EC405 4DE90003 E9037500 .u.Ô..ÔM.á^ô&.w.&.w..v¶.v·.Fò.P. 000100
C476FFBC 76FF526A 1E578926 1C478926 CC568BCA 4688D05E C4BC4689 0000FFFF .....F¥á^À.Fò.Vä&.G.&.W.jR.v¥.vá 000120
FFD276FF CA76FFCC 76FF0500 E90003E9 03750000 3008C483 27440000 9AC276FF .vô...D'.á.=..u.Ô..Ô...vä.vò.vø. 000140
00003008 C4832E51 00009AC2 76FFC476 FFBC76FF 526ABC46 890000FF FF9AD076 vÀ......F¥jR.v¥.vá.vô...Q..á.=.. 000160
0000FFFF 9AFF6A1F 77FF2621 77FF260A 5EC4CA76 FFCC76FF 04CEE900 03E90375 u.Ô..Ôö..vä.vòá^.&.wl&.w.j...... 000180
95E90003 E9037500 003D08C4 832E8A00 009AC276 FFC476FF BC76FF52 6ABC4689 .F¥jR.v¥.vá.vô......á.=..u.Ô..Ô. 0001A0
76FF506A BC468900 002ED19A 5016EA46 80066A06 76FF0876 FFC676FF C876FF04 ..và.vô.v..v.j..Fõ P.l....F¥jP.v 0001C0
037D00EC 7E83045C E90003E9 03750000 3008C483 2EE60000 9AC276FF C476FFBC ¥.vá.vô...l..á.=..u.Ô..Ô\..~$.). 0001E0
```

Dump of file SATURN:[PCCOMMON.DUMP.DLL]DAD.TMP;1 on 18-APR-1990 10:40:03.08
File ID (551,9,0)   End of file block 267 / Allocated 268

Virtual block number 74 (0000004A), 512 (0200) bytes

```
C876FFB6 46890000 B80003E9 00018800 06E90377 01EA7E83 0009E903 7E0014E9 Ô..~.Ô...~ô.w.Ô..j..Ô..j...FÑ.và 000000
C476FFBC 76FF506A BC468900 002A7B9A 5016EA46 80036A06 76FF0876 FFC676FF .vô.v..v.j..Fõ.P.(*...F¥jP.v¥.vá 000020
7E0014E9 037D00EC 7E830400 E90003E9 03750000 3008C483 2F450000 9AC276FF .vô...E/.á.=..u.Ô..Ô...~$.).Ô..~ 000040
C4C676FF C876FFB2 46890000 B80003E9 00018800 06E90377 01EA7E83 0009E903 .Ô...~ô.w.Ô..j..Ô..j...Fý.và.vóá 000060
FFC476FF BC76FF53 6ABC4689 00002F6C 9A501684 46800677 FF260877 FF260A5E ^.&.w.&.w..FÇ.P.l/...F¥jS.v¥.vá. 000080
FF260E5E C4C676FF C876FF03 A1E90003 E9037500 003D08C4 832F8100 009AC276 vô..../.á.=..u.Ô..ÔÀ..và.vóá^.&. 0000A0
009AC276 FFC476FF BC76FF53 6ABC4689 0000FFFF 9A5016F6 46800677 FF260877 w.&.w..F~.P......F¥jS.v¥.vá.vô.. 0000C0
E1E90375 1A470826 18478826 D05EC403 65E90003 E9037500 003D08C4 832FC500 .é/.á.=..u.Ô..Ôe.á^À&.G.&.G.u.ÔÀ 0000E0
FFC476FF BC76FF52 6ABC4689 0000FFFF 9A146A00 6A286A00 6AF276FF F476FF00 ..v¶.v·j.j(j.j.......F¥jR.v¥.vá. 000100
9A146A00 6AF276FF F476FF03 21E90003 E9037500 003D08C4 832FF500 009AC276 vô...%/.á.=..u.Ô..Ôl..v¶.v·j.j.. 000120
E9037500 003D08C4 83302500 009AC276 FFC476FF BC76FF52 6ABC4689 0000FFFF .....F¥jR.v¥.vá.vô...%0.á.=..u.Ô 000140
FFC476FF BC76FF52 6ABC4689 0000305A 9A016A02 6AF276FF F476FF02 F1E90003 ..Ôp..v¶.v·j.j..Z0...F¥jR.v¥.vá. 000160
B67E8300 6AF276FF F476FF02 C1E90003 E9037500 003D08C4 83306F00 009AC276 vô...o0.á.=..u.Ô..Ôë..v¶.v·j..~Ñ 000180
46890000 FFFF9A50 00008800 03E90001 B80006E9 03750082 7E830009 E9037400 .t.Ô...~ý.u.Ô..j..Ô..j..P......F 0001A0
E90277E9 0003E903 75000030 08C48330 A800009A C276FFC4 76FFBC76 FF526ABC ¥jR.v¥.vá.vô...´0.á.=..u.Ô..Ôw.Ô 0001C0
FF8C76FF 526ABC46 89000030 C99A146A 006A286A 006A006A D476FFD6 76FF0274 t..vø.vâj.j.j(j.j..è0...F¥jR.v¥. 0001E0
```

Dump of file SATURN:[PCCOMMON.DUMP.DLL]DAD.TMP;1 on 18-APR-1990 10:40:03.08
File ID (551,9,0)   End of file block 267 / Allocated 268

Virtual block number 75 (0000004B), 512 (0200) bytes

```
016AD476 FFD676FF 023EE900 03E90375 00003008 C48330DE 00009AC2 76FFC476 vá.vô...80.á.=..u.Ô..Ô>..vø.vâj. 000000
31180000 9AC276FF C476FFBC 76FF526A BC468900 00FFFF9A 146A006A 286A006A j.j(j.j.......F¥jR.v¥.vá.vô....1 000020
006A146A 006A286A 006A006A D476FFD6 76FF0208 E90003E9 03750000 3008C483 .á.=..u.Ô..Ô...vø.vâj.j.j(j.j.j. 000040
00003008 C4833152 00009AC2 76FFC476 FFBC76FF 526ABC46 89000031 3D9A0F6A j..=1...F¥jR.v¥.vá.vô...R1.á.=.. 000060
00FFFF9A 0F6A006A 146A006A 286A006A 016AD476 FFD676FF 01CEE900 03E90375 u.Ô..Ôö..vø.vâj.j.j(j.j.j.j..... 000080
E90003E9 03750000 3008C483 31840000 9AC276FF C476FFBC 76FF526A BC468900 ..F¥jR.v¥.vá.vô....1.á.=..u.Ô..Ô 0000A0
76FFC476 FFBC76FF 526ABC46 89000031 A19A146A 006A006A D476FFD6 76FF0194 ...vø.vâj.j.j..À1...F¥jR.v¥.vá.v 0000C0
146A006A 016AD476 FFD676FF 0162E900 03E90375 00003008 C4832A90 00009AC2 ô....*.á.=..u.Ô..Ôb..vø.vâj.j.j. 0000E0
03750000 3008C483 2E180000 9AC276FF C476FFBC 76FF526A BC468900 00FFFF9A ......F¥jR.v¥.vá.vô......á.=..u. 000100
FFBC76FF 526ABC46 89000032 059A016A 006A026A D476FFD6 76FF0130 E90003E9 Ô..Ô0..vø.vâj.j.j....2...F¥jR.v¥. 000120
026AD476 FFD676FF 00FEE900 03E90375 00003008 C483321A 00009AC2 76FFC476 vá.vô....2.á.=..u.Ô..Ôz..vø.vâj. 000140
3D08C483 32400000 9AC276FF C476FFBC 76FF526A BC468900 0032389A 016A016A j.j..82...F¥jR.v¥.vá.vô...M2.á.= 000160
6ABC4689 0000326B 9AB676FF 006A006A D476FFD6 76FF00CC E90003E9 03750000 ..u.Ô..Ôø..vø.vâj.j..vÑ.k2...F¥j 000180
D676FF00 99E90003 E9037500 003D08C4 83328000 009AC276 FFC476FF BC76FF52 R.v¥.vá.vô....2.á.=..u.Ô..Ô...vø 0001A0
00009AC2 76FFC476 FFBC76FF 526ABC46 89000032 9E9AB276 FF016AD0 6AD476FF .vâj.j..vý..2...F¥jR.v¥.vá.vô... 0001C0
32D19AB4 76FF006A 016AD476 FFD676FF 0066E900 03E90375 00003008 C48332B3 "2.á.=..u.Ô..Ôf..vø.vâj.j..vÇ.12 0001E0
```

```
Dump of file SATURN:[PCCOMMON.DUMP.DLL]DAD.TMP;1 on 18-APR-1990 10:40:03.08
File ID (551,9,0)   End of file block 267 / Allocated 268

Virtual block number 76 (0000004C), 512 (0200) bytes

 0003E903 7500003D 08C48332 E600009A C276FFC4 76FF8C76 FF526ABC 46890000 ...F¥jR.v¥.vá.vô...Ì2.á.=..u.Õ.. 000000
 C476FFBC 76FF526A BC468900 00FFFF9A F676FF01 6A016AD4 76FF0676 FF0033E9 Õ3..vø.vâj.j..v-......F¥jR.v¥.vá 000020
 C40010E9 0374008C 7E830000 E90003E9 03750000 3008C483 31860000 9AC276FF .vô...Ñ1.á.=..u.Õ..Õ...-¥.t.Õ..á 000040
 0375D246 08D0468B 0019E903 75008C7E 83025789 26078926 02568BD0 4688125E ^..FÅ.VøÆ..&.W..-¥.u.Õ...FÅ.Føu. 000060
 FFC876FF 0027E903 758A460B 88468804 C4832402 3FA39AD0 76FFD276 FF000EE9 Õ...vø.vÅ.È?ø$.á..F¦.Fou.Õ'..vÀ. 000080
 31E80000 9AC276FF C476FFBC 76FF506A BC468900 001F659A B876FF8A 76FFC676 vó.vo.v¦.e....F¥jP.v¥.vá.vô...Õ1 0000A0
 B80000C6 46C7088E 258D881E 56570000 3EC8CBC9 5F5E1F00 00E98C46 8808C483 .á..F¥Õ...^_èùà>..WV.¦.%.ÄúFó..¦ 0000C0
 F6468900 008BCC46 89CE4689 00008BE0 4689E246 8900008B D84689DA 46890000 ...FÖ.FÄ¦...Fã.FÅ¦...Fö.Fä¦...F- 0000E0
 008BD446 89D64689 00008BDC 4689DE46 8900008B F04689F2 46890000 8BF44689 .F¶¦...F·.FÞ¦...FB.FÉ¦...Fø.Få¦. 000100
 46C70000 D246C7C2 4689C446 8900008B EC4689EE 46890000 8BC84689 CA468900 ..Fò.Fà¦...FŸ.Fš¦...Fá.FóúFø..úF 000120
 56890846 890E578B 260C478B 26065EC4 07892602 47892600 00881A5E C4000000 Å..á^.¦..&.G.&..á^.&.G.&.W..FÅ.V 000140
 26384788 261FC426 065EC4CE 5689CC46 89205788 26284788 261FC426 065EC4DA Óá^.&á.&.G+&.W-.Fä.Voá^.&á.&.G;& 000160
 4788260E 5EC4F656 89F44689 08578826 06478826 0A5EC4E2 5689E046 89305788 .W=.FÅ.Vãá^.&.G.&.W..F¶.V-á^.&.G 000180
 57882606 47882612 5EC4000E E9037514 46081246 88F25689 F0468908 57882606 .&.W..FÞ.V·.F..F.u.Õ..á^.&.G.&.W 0001A0
 8826165E C4000EE9 0375l846 0816468B DE56890C 46890000 8A000088 0006E908 .Õ..¦..¤...FÉ.VB.F..F.u.Õ..á^.&. 0001C0
 0C77FF26 0A5FC426 0A5EC4D6 5689D446 8900008A 00008800 06E90857 88260647 G.&.W.Õ..¦..¤...FÅ.Vøá^.&á_.&.w. 0001E0

Dump of file SATURN:[PCCOMMON.DUMP.DLL]DAD.TMP;1 on 18-APR-1990 10:40:03.08
File ID (551,9,0)   End of file block 267 / Allocated 268

Virtual block number 77 (0000004D), 512 (0200) bytes

 FF260A5F C4260E5E C408C483 34040010 9A505200 0405E256 88E0468B 0A77FF26 &.w..FÅ.Vã...RP...á4.á.á^.&á_.&. 000000
 FFCC76FF CE76FF08 C4830CE1 00109A50 52005005 E2568BE0 46880A77 FF260C77 w.&.w..FÅ.Vã.P.RP...Å..á..vö.vä. 000020
 50520050 05E2568B E0468B50 16D4468D 5016DC46 8DF076FF F276FFF4 76FFF676 v-.v¶.v·.vÞ.FÉ.P.Få.P.FÅ.Vã.P.RP 000040
 FFC676FF 536AC646 890000FF FF9A016A 5016C846 80505200 0405E256 88E0468B .FÅ.Vã...RP.Fà.Pj.......FójS.vó. 000060
 4680CC76 FFCE76FF 061EE900 03E90375 00003008 C4833559 00009A06 76FF0876 v..v....Y5.á.=..u.Õ..Õ...vö.vä.F 000080
 003008C4 83358400 009A0676 FF0876FF C676FF51 6AC64689 0000FFFF 9A5016C2 ò.P......FójQ.vó.v..v....Ç5.á.=. 0000A0
 B80006E9 C45688C2 46880009 E9037500 357F8326 D85EC405 EDE90003 E9037500 .u.Õ..ÕÚ.á^Æ&..5.u.Õ...Fö.Vöõ..¡ 0000C0
 FA9A5016 EC468D06 6AC876FF CA76FFCC 76FFCE76 FFEE5689 EC468900 00BA0001 ..¤...Fš.VŸ.vö.vä.vò.vàj..Fš.P.° 0000E0
 03E90375 000030D0 C483360F 00009A06 76FF0876 FFC676FF 506AC646 89000035 5...FójP.vó.v..v.....6.á.=..u.Õ. 000100
 00008A00 01880006 E9C4568B C2468800 09E90375 00377F83 26085EC4 0592E900 .Õ..á^Æ&..7.u.Õ...Fò.Vöõ..¦..¤.. 000120
 46890000 FFFF9A50 16EC468D 036AC876 FFCA76FF CC76FFCE 76FFEE56 89EC4689 .Fš.VŸ.vö.vä.vò.vàj..Fš.P......F 000140
 FF0537E9 0003E903 7500003D 08C48333 5E00009A 0676FF08 76FFC676 FF506AC6 ójP.vó.v..v....^3.á.=..u.Õ..Õ7.. 000160
 C6468900 0036789A 5052009C 05E2568B E0468802 6ADC76FF DE76FFCC 76FFCE76 vo.vä.vB.vÉj..FÅ.Vã...RP.x6...Fó 000180
 76FF04F8 E90003E9 03750000 3008C483 36800000 9A0676FF 0876FFC6 76FF506A jP.vó.v..v.....6.á.=..u.Õ..Õ%..v 0001A0
 6AC64689 00002E75 9A505200 E805E256 88E0468B 026AD476 FFD676FF CC76FFCE ö.vä.vø.vàj..FÅ.Vã.Ò.RP.u....Fój 0001C0
 E05EC404 89E90003 E9037500 003008C4 83371E00 009A0676 FF0876FF C676FF50 P.vó.v..v.....7.á.=..u.Õ..Õ¿.á^Å 0001E0

Dump of file SATURN:[PCCOMMON.DUMP.DLL]DAD.TMP;1 on 18-APR-1990 10:40:03.08
File ID (551,9,0)   End of file block 267 / Allocated 268

Virtual block number 78 (0000004E), 512 (0200) bytes

 0496E900 03E90375 000030C6 4689FFFF 00009AE0 76FFE276 FF000001 3487C726 &ú.4....vã.vÅ......Fó=..u.Õ..Õ.. 000000
 FFDE76FF CC76FFCE 76FF0480 E90001C6 46C70008 E9037500 01348F83 26E05EC4 á^Æ&.«4..u.Õ..úFó..Õ...vö.vä.vB. 000020
 0AE90375 8EC7C67E 01C64689 00003779 9A505200 9C05E256 88E0468B 026ADC76 vÉj..FÅ.Vã...RP.y7...Fó.~óú.u.Õ. 000040
 374F01C1 9A37FF26 0277FF26 065EC445 6A006A00 6A0036E9 03748EC0 C67E8100 ..-óà.t.Õ6.j.j.jEá^.&.w.&.7.è.07 000060
 1EE90418 E90001C6 46C70008 E9FEECE9 0000C646 C70008E9 03750000 300AC483 .á.=..u.Õ..úFó..Õš±Õ..úFó..Õ..Õ. 000080
 FF03F7E9 0003E903 7500003D 08C48337 A700009A 0676FF08 76FFC676 FF506A00 .jP.vó.v..v....Ì7.á.=..u.Õ..Õ%.. 0000A0
 C6468900 00359F9A 505200E8 05E2568B E0468B02 6AD476FF D676FFCC 76FFCE76 vö.vä.vø.vàj..FÅ.Vã.Ò.RP..5...Fó 0000C0
 77FF2606 5EC4456A 006A006A 0036E903 748EC0C6 7E81000A E903758E C7C67E81 .~óú.u.Õ...-óà.t.Õ6.j.j.jEá^.&.w 0000E0
 C70008E9 FE63E900 00C646C7 0008E903 7500003D 0AC48337 D801C19A 37FF2602 .&.7.è.Á7.á.=..u.Õ..úFó..Õc±Õ..ú 000100
 00003008 C483387F 00009A06 76FF0876 FFC676FF 506A001E E9038FE9 0001C646 Fó..Õ..Õ..jP.vó.v..v.....8.á.=.. 000120
 FF260C77 FF260A5F C426125E C40059E9 03751446 0812468B 036EE900 03E90375 u.Õ..Õn..F..F.u.ÕY.á^.&á_.&.w.&. 000140
 E0468800 2CE90375 00003008 C48334B2 00469A50 52009C05 E2568BE0 46880A77 w..FÅ.Vã...RP.F.ý4.á.=..ū.Õ,..FÅ 000160
 0030C646 8908C483 1A4242F6 9A0A77FF 260C77FF 26125EC4 5052009C 05E2568B .Vã...RPá^.&.w.&.w..-BB..á..Fó=. 000180
 1677FF26 0E5EC400 39E90374 002C7F83 26085EC4 0132E903 00E90003 E9037500 .u.Õ..Õ..Õ2.á^Æ&..,.t.Õ9.á^.&.w. 0001A0
 2800009A 0676FF08 76FFC676 FF526AC6 46890000 FFFF9A50 16E4468D 1477FF26 &.w..Fö.P......FójR.vó.v..v....( 0001C0
 0038E903 740A4639 105688OE 4688006F E902C7E9 0003E903 7500003D 08C48335 5.á.=..u.Õ..Õú.Õo..F..V.9F.t.Õ8. 0001E0
```

```
Dump of file SATURN:[PCCOMMON.DUMP.DLL]DAD.TMP;1 on 18-APR-1990 10:40:03.08
File ID (551,9,0)   End of file block 267 / Allocated 268

Virtual block number 79 (0000004F), 512 (0200) bytes

46894357 88264147 8826085E C40025E9 03741846 08164688 0030E903 740C5639 9V.t.ÕO..F..F.t.Õ%.á^Ä&.GA&.WC.F 000000
261C5FC4 260A5FC4 0029E9EA 5689E846 89475788 26454788 26D85EC4 E65689E4 ð.V|á^Ä&.GE&.WG.FÖ.VõÕ).á^.&á_.& 000020
5689E846 89065788 26044788 261C5FC4 260A5EC4 E65689E4 46890257 88260788 ..&.W..FÖ.V|á^.&á_.&.G.&.W..FÕ.V 000040
FFCC76FF CE76FFFE 5689FC46 89EA5688 E84688FA 5689F846 89E65688 E44688EA ö.FÖ.V|.F%.Vº.FÖ.V̄õ.F•.V±.vö.vë. 000060
9A0676FF 0876FFC6 76FF506A C6468900 003A7D9A 5016F846 8D096ADC 76FFDE76 v8.vÉj..F%.P.):...FójP.vó.v..v.. 000080
DE76FF0A 76FF0C76 FF501612 46800204 E90003E9 03750000 3D08C483 3A150000 ...:.á.=..u.Õ..Õ...F..P.v..v..v8 0000A0
46880001 D246C701 DDE90003 E9037500 0030C646 890CC483 3A86173F 9ADC76FF .vÉ.?.Ñ:.á..Fó•..u.Õ..Õï.úF@...F 0000C0
E805E256 88E04688 0A77FF26 0C77FF26 0A5FC426 165EC400 59E90375 18460816 ..F.u.ÕY.á^.&á_.&.w.&.w..FÁ.Vã.Ò 0000E0
5EC45052 00E805E2 5688E046 88002CE9 03750000 3D08C483 38100046 9A505200 .RP.F..8.á.=..ū.Õ,..FÁ.Vã.Ò.RPá^ 000100
E90177E9 0003E903 7500003D C6468908 C4833AF3 42F69A0A 77FF260C 77FF2616 .&.w.&.w..-Bµ:.á..Fó=..u.Õ..Õw.Õ 000120
9A5016E4 46801477 FF261677 FF260A5E C40039E9 0374002E 7F832608 5EC400EC &.á^Ä&....t.Õ9.á^.&.w.&.w..FÕ.P. 000140
E9037500 003D08C4 833A9200 009A0676 FF0876FF C676FF52 6AC64689 0000386A jÕ...FójR.vó.v..v.....:.á.=..u.Õ 000160
260E5EC4 E65689E4 46890257 88260788 261C5FC4 260E5EC4 0029E901 31E90003 ..Õ1.Õ).á^.&á_.&..&.W..FÕ.V|á^.& 000180
E84688FA 5689F846 89E65688 E44688EA 5689E846 89065788 26044788 261C5FC4 á_.&.G.&.W..FÕ.Võ.FÕ.V|.F%.Vº.FÖ 0001A0
0036F09A 5016F846 8D096AD4 76FFD676 FFCC76FF CE76FFFE 5689FC46 89EA5688 .V̄õ.F•.V±.vö.vë.vø.vÕj..F%.P.Þó. 0001C0
E90003E9 03750000 3D08C483 364E0000 9A0676FF 0876FFC6 76FF506A C6468900 ..FójP.vó.v..v....Nó.á.=..u.Õ..Õ 0001E0

Dump of file SAT‹ ?N:[PCCOMMON.DUMP.DLL]DAD.TMP;1 on 18-APR-1990 10:40:03.08
File ID (551,9,0)   End of file block 267 / Allocated 268

Virtual block number 80 (00000050), 512 (0200) bytes

0030C646 890CC483 3B43173F 9AD476FF D676FF0E 76FF1076 FF501616 46800084 Ç..F..P.v..v..vø.vå.?.C;.á..Fó=. 000000
8326165E C4002BE9 03740035 7F832608 5EC40001 0046C700 8DE90003 E9037500 .u.Õ..Õ..úFÁ..á^Ä&..5.t.Õ+.á^.&. 000020
03750000 3DC64689 06C48338 362E439A 1676FF18 76FF016A 001EE903 7400187F ...t.Õ..j..v..v..C.68.á..Fó=..u. 000040
0CC4831E 8301389A 0676FF08 76FFC876 FFCA76FF 1A76FF1C 76FF0050 E90003E9 Õ..ÕP..v..v..vÒ.và.v..v..8....á. 000060
C876FFCA 76FF1276 FF1476FF 1676FF18 76FF1A76 FF1C76FF 002EE903 7400003D =..t.Õ...v..v..v..v..v..v..vÒ.và 000080
830017E9 037500C6 7E830000 E90003E9 03750000 3DC64689 10C48333 2C25859A ..%,3.á..Fó=..u.Õ..Õ...~ó.u.Õ... 0000A0
830017E9 037500C6 7E8304C4 833B9123 559A1276 FF1476FF 000EE903 7500027E -@.u.Õ...v..v..U#.;.á..~ó.u.Õ... 0000C0
C95F5E1F 0000E9C6 468804C4 83396623 559A1676 FF1876FF 000EE903 7500007E -Å.u.Õ...v..v..U#f9.á..FóÕ..._è 0000E0
0000EA46 C7E24689 E4468900 00880000 E046C7D8 8E337688 1E565700 0024C8C8 ùå$..WV.¡v3.ÁúFÁ..¡...FÕ.FàúFõ.. 000100
46890000 88EC4689 EE468900 0088F046 89F24689 000088DC 46890E46 89000088 ¡...F8.FÉ¡...F·.FÞ¡...FŸ.F$¡...F 000120
47882606 5EC40789 26024789 26000088 165EC4F4 4689F646 89000088 E64689E8 Õ.F|¡...F~.F¶á^.¡..&.G.&..á^.&.G 000140
08262047 8826065E C4EA4689 0788261F C426E25E C4E45689 E2468904 57882602 .&.W..Fä.Vóá^ã&á.&...Fõá^.&.G &. 000160
46890000 26689A50 160C4680 266A326A EA76FF03 71E90000 880006E9 03742247 G"t.Õ..¡..Õq..võj2j&.FÉ.P.k&...F 000180
C402FEE9 0003E903 75000030 08C4833D 1600009A E276FFE4 76FFE076 FF4F6AE0 ÅjO.vÅ.vÕ.vā....±.á.=..u.Õ..Õ±.á 0001A0
89260000 880C5EC4 04578926 02478926 E45688E2 46880C5E C4000307 C7260C5E ^É&ú...á^É.Fä.VÕ&.G.&.W.á^É¡..&. 0001C0
89261047 89260000 880C5EC4 0A478926 0C478926 000088DC 5EC40647 89260847 G.&.G.á^É¡..&.G.&.G.á^É¡..&.G.&. 0001E0

Dump of file SATURN:[PCCOMMON.DUMP.DLL]DAD.TMP;1 on 18-APR-1990 10:40:03.08
File ID (551,9,0)   End of file block 267 / Allocated 268

Virtual block number 81 (00000051), 512 (0200) bytes

880C5EC4 16578926 14478926 08568806 46880C5E C4000112 47C7260C 5EC40E47 G.á^É&úG...á^É.F..V.&.G.&.W.á^É¡ 000000
89260000 880C5EC4 1C478926 1E478926 000088DC 5EC41847 89261A47 89260000 ..&.G.&.G.á^É¡..&.G.&.G.á^É¡..&. 000020
DC76FFDE 76FF5052 001C05E4 5688E246 88000024 47C7260C 5EC42047 89262247 G"&.G á^É&úG$...Fä.VÕ...RP.v8.vÉ 000040
03750000 3D08C483 3D5D0000 9AE276FF E476FFE0 76FF526A E0468900 00272F9A ./'...FÅjR.vÅ.vÕ.vā...]=.á.=..u. 000060
5EC4E046 89000029 2B9A5016 E6468D08 77FF260A 77FF26E2 5EC40237 E90003E9 Õ..Õ7.á^ã&.w.&.w..F|.P.+)...FÁá^ 000080
83308F00 009AE276 FFE476FF E076FF52 6A225789 26204789 26E85688 E64688DC É.F|.VÕ&.G &.W"jR.vÅ.vÕ.vā....=. 0000A0
46890000 28089ADC 76FFDE76 FFE676FF E876FF01 F0E90003 E9037500 003D08C4 á.=..u.Õ..ÕÞ..vÕ.v|.v8.vÉ.Ú(...F 0000C0
C4018EE9 0003E903 75000030 08C4833D D100009A E276FFE4 76FFE076 FF526AE0 ÅjR.vÅ.vÕ.vā...]=.á.=..u.Õ..Õ/.á 0000E0
0000FFFF 9A5016F4 4680EC76 FFEE76FF EE5689EC 46892257 88262047 8826065E ^.&.G &.W".F&.VŸ.vŸ.v&.F¶.P..... 000100
7CE90003 E9037500 003D08C4 833E1800 009AE276 FFE476FF E076FF52 6AE04689 .FÅjR.vÅ.vÕ.vā....>.á.=..u.Õ..Õ| 000120
FF006A00 6A006AE6 76FFE876 FF0073E9 03740010 7E83007C E9037401 0E7E8301 ..~..t.Õ|..~..t.Õs..vÕ.v|j.j.j.. 000140
08C4833E 5300009A E276FFE4 76FFE076 FF526AE0 46890000 3E3E9A12 76FF1476 v..v..>>...FÅjR.vÅ.vÕ.vā...S>.á. 000160
3EE99A12 76FF1476 FF006A01 6A006AE6 76FFE876 FF0132E9 0003E903 75000030 =..u.Õ..Õ2..vÕ.v|j.j.j..v..v..Õ> 000180
0003E903 75000030 08C4833E AE00009A E276FFE4 76FFE076 FF526AE0 46890000 ...FÅjR.vÅ.vÕ.vā...Ú>.á.=..u.Õ.. 0001A0
F2563900 08E90374 F0463910 56880E46 88F04689 F2468900 008800F7 E900FAE9 Õº.Õ%.¡...F·.FÞ.F..V.9FÞt.Õ..9V· 0001C0
E0468900 00FFFF9A 5016F846 8D006A0A 76FF0C76 FFEC76FF EE76FF00 08E90375 u.ÕÁ..vŸ.v$.v..v.j..F%.P......FÁ 0001E0
```

Dump of file SATURN:[PCCOMMON.DUMP.DLL]DAD.TMP;1 on 18-APR-1990 10:40:03.08
File ID (551,9,0)   End of file block 267 / Allocated 268

Virtual block number 82 (00000052), 512 (0200) bytes

```
7E83009F E90003E9 03750000 3008C483 3EFE0000 9AE276FF E476FFE0 76FF526A jR.vÀ.vð.vã...±>.á.=..u.Õ..Õ...~ 000000
76FFF276 FFE676FF E876FF00 3CE90372 02F07E83 0009E903 7D004AE9 037E00F2 ·.-.ÕJ.).Õ...~Þ.r.Õ<..vÕ.vl.v·.v 000020
3F3A0000 9AE276FF E476FFE0 76FF526A E0468900 0028689A 5016F846 80006AF0 Þj..F%.P.k+...FÀjR.vÀ.vð.vã...:? 000040
80006AF0 76FFF276 FFE676FF E876FF00 39E9004F E90003E9 03750000 3008C483 .á.=..u.Õ..Õ0.Õ9..vÕ.vl.v·.vÞj.. 000060
3008C483 39420000 ?AE276FF E476FFE0 76FF526A E0468900 0029E79A 5016F846 F%.P.Ó)...FÀjR.vÀ.vð.vã...B9.á.= 000080
E07E83FF 12E900F2 568301F0 4683000C 5683010A 46830013 E90003E9 03750000 ..u.Õ..Õ...F...V...FÞ..V·.Õ...~À 0000A0
880019E9 037500E0 7?830257 89260789 260E5688 DC468816 5EC40010 E9037400 .t.Õ..á^..FÉ.V8&..&.W..~À.u.Õ... 0000C0
5E1F0000 E9E04688 04C4833B 713FA39A DC76FFDE 76FF000E E90375DE 460BDC46 FÉ.F8u.Õ...v8.vÊ.È?q;.á..FÀÕ...^ 0000E0
00008800 00FA46C7 F64689F8 46890000 88088E38 A9881E56 5700000C C8C8C95F _èüà...WV.¡`;.Ä¡...F%.F-úF°..¡.. 000100
0788261F C426F65E C4F85689 F6468904 57882602 47882606 5EC4FC46 89FE4689 .F±.F•á^.&.G.&.W..F-.V%á^-&á.&.. 000120
006A2077 FF262277 FF26065E C4002BE9 03752247 08262047 8826065E C4FA4689 .F°á^.&.G &.G"u.Õ(.á^.&.w"&.w j. 000140
8826065E C408C483 404F0000 9AF676FF F876FFF4 76FF526A F4468900 00FFFF9A ......F¶jR.v¶.v%.v~...Oã.á.á^.&. 000160
46890000 FFFF9AFA 76FF1877 FF261A77 FF26065E C40029E9 03751A47 08261847 G.&.G.u.Õ).á^.&.w.&.w..v°......F 000180
751E470B 261C4788 26065EC4 08C48340 8700009A F676FFF8 76FFF476 FF526AF4 ¶jR.v¶.v%.v~....ã.á.á^.&.G.&.G.u 0001A0
76FFF476 FF526AF4 46890000 FFFF9A00 6A1C77FF 261E77FF 26065EC4 0028E903 .Õ(.á^.&.w.&.w.j.......F¶jR.v¶.v 0001C0
6A006A06 76FF0876 FF505200 1C05F856 88F64688 08C48340 BC00009A F676FFF8 %.v~...¥ã.á..F-.V%...RP.v..v.j.j 0001E0
```

Dump of file SATURN:[PCCOMMON.DUMP.DLL]DAD.TMP;1 on 18-APR-1990 10:40:03.08
File ID (551,9,0)   End of file block 267 / Allocated 268

Virtual block number 83 (00000053), 512 (0200) bytes

```
C4834106 00009AF6 76FFF876 FFF476FF 526AF446 89000040 F19A5016 FC468D01 ..F=.P.þã...F¶jR.v¶.v%.v~....A.á 000000
52002305 0C578826 0A478826 065EC400 3AE90375 0C470826 0A478826 065EC408 .á^.&.G.&.G.u.Õ:.á^.&.G.&.W..#.R 000020
F876FFF4 76FF526A F4468900 0041389A 5016FC46 80016A00 6A0676FF 0876FF50 P.v..v.j.j..F=.P.;A...F¶jR.v¶.v% 000040
8826065E C4003AE9 03751047 08260E47 8826065E C408C483 41500000 9AF676FF .v~...PA.á.á^.&.G.&.G.u.Õ:.á^.&. 000060
89000024 F29A5016 FC468001 6A006A06 76FF0876 FF505200 23051057 88260E47 G.&.W..#.RP.v..v.j.j..F=.P.·$... 000080
609A0676 FF0876FF FA76FF08 C4834174 00009AF6 76FFF876 FFF476FF 526AF446 F¶jR.v¶.v%.v~...tA.á..v°.v..v..' 0000A0
1F0000E9 00008808 C4833C4F 00009AF6 76FFF876 FFF476FF 4F6AF446 89000025 %...F¶jO.v¶.v%.v~...O<.á.¡..Õ... 0000C0
89000088 0000FD06 86C70000 FD8886C7 D88E3FA8 881E5657 000248C8 CBC95F5E ^_èüàH..WV.¡ 7.ÄÜ.¡»..ú.ø»..¡... 0000E0
000088FD 8E8689FD C0868900 0088FDC2 8689FDC4 86890000 88FD0C86 89FDDE86 .ß»..É»¡....á»..ô»¡....â»..ƒ»¡.. 000100
0088FDD8 8689FDDA 86890000 88FD8A86 89FD8C86 89000088 FDEA8689 FDEC8689 ..$»..ö»¡....¥»..œ»¡....Ö»..Ä»¡. 000120
1FC4260E 5EC40789 26024789 26000088 1E5EC400 08FDE086 C7E44689 E6468900 ..F!.F8ú.Ä»..á^.¡..&.G.&..á^.&á. 000140
064688FD C49689FD C286892D 57882628 4788261F C4260E5E C4FD0686 89078826 &....ø»á^.&á.&.G+&.W-..ö»..á».F. 000160
46880011 E9037418 460B1646 88001CE9 03741446 08124688 0027E903 7408460B .F.t.Õ'..F..F.t.Õ...F..F.t.Õ...F 000180
3C3A9A50 16FDDC86 804A6A32 6AFDD686 FF0C50E9 00008800 06E90374 1C??081A ..F.t.Õ..¡..ÕP..Ñø»j2jJ..É».P.:< 0001A0
E9037500 003008C4 83439700 009A0E76 FF1076FF FD8886FF 4F6AFD88 868900?00 ....¡»jO.Ñ¡».v..v.....C.á.=..u.Õ 0001C0
04578926 02478926 1056880E 4688FDDC 9EC40005 07C726FD DC9EC408 D0E900?3 ..ÕÀ.á.É»&ú...á.É».F..V.&.G.&.W. 0001E0
```

Dump of file SATURN:[PCCOMMON.DUMP.DLL]DAD.TMP;1 on 18-APR-1990 10:40:03.08
File ID (551,9,0)   End of file block 267 / Allocated 268

Virtual block number 84 (00000054), 512 (0200) bytes

```
0E478926 14568812 4688FDDC 9EC40857 89260647 89260856 8806468B FDDC9EC4 á.É».F..V.&.G.&.W.á.É».F..V.&.G. 000000
00001647 C726FDDC 9EC41457 89261247 89261856 8B16468B FDDC9EC4 10578926 &.W.á.É».F..V.&.G.&.W.á.É»&úG... 000020
9EC41C47 89261E47 89260000 88FDDC9E C4184789 261A4789 26000088 FDDC9EC4 á.É»¡..&.G.&.G.á.É»¡..&.G.&.G.á. 000040
FDDC9EC4 24478926 26478926 000088FD DC9EC420 47892622 47892600 0088FDDC É»¡..&.G"&.G á.É»¡..&.G&&.G$á.É» 000060
C400003E 47C726FD DC9EC400 003C47C7 26FDDC9E C4304789 26324789 26000088 ¡..&.G2&.G0á.É»&úG<..á.É»&úG>..á 000080
4647C726 FDDC9EC4 42478926 44478926 000088FD DC9EC400 004047C7 26FDDC9E .É»&úGã..á.É»¡..&.GD&.GBá.É»&úGF 0000A0
9AFDDC86 FFFDDE86 FF505200 20051056 880E4688 00014847 C726FDDC 9EC40000 ..á.É»&úGH...F..V.. .RP.ÑB».ÑÉ». 0000C0
7500003D 08C48343 E100009A 0E76FF10 76FFFDB8 86FF526A FD888689 00003D01 .=....¡»jR.Ñ¡».v..v....ÃC.á.=..u 0000E0
0676FF08 76FFFDC2 86FFFDC4 86FF0049 E9037508 46080646 880AAEE9 0003E903 .Õ..ÕÜ..F..F.u.ÕI..Ñá».Ñô».v..v. 000100
009A0E76 FF1076FF FD8886FF 506AFD88 86890000 FFFF9A50 16FDEE86 8D01F568 h%...Ÿ».P.......¡»jP.Ñ¡».v..v... 000120
FFFDD686 FF0C568C 0A4689FD EE86800A 64E90003 E9037500 003008C4 83442A00 .*D.á.=..u.Õ..Õd...Ÿ».F..V..Ñø». 000140
8886FF52 6AFD8886 890000FF FF9A5052 000A05FD DE9688FD DC86880A 76FF0C76 v..v...É»..ß»...RP.......¡»jR.Ñ¡ 000160
8688FD06 86FF0A18 E90003E9 03750000 3008C483 44630000 9A0E76FF 1076FFFD ».v..v....cD.á.=..u.Õ..Õ...Ñø».. 000180
0E76FF10 76FFFDB8 86FF526A FD888689 0000448E 9A505200 2805FD0E 9688FDDC É»..ß».(.RP./D....¡»jR.Ñ¡».v..v. 0001A0
05FDDE96 88FD0C86 88FD0686 FF09E2E9 0003E903 7500003D 08C48344 9C00009A ....D.á.=..u.Õ..Õã..Ñø»..É»..ß». 0001C0
C48344D5 00009A0E 76FF1076 FFFDB886 FF526AFD 88868900 0044F79A 5052002C ,.RP.%D....¡»jR.Ñ¡».v..v....ÍD.á 0001E0
```

```
Dump of file SATURN:[PCCOMMON.DUMP.DLL]DAD.TMP;1 on 18-APR-1990 10:40:03.08
File ID (551,9,0)   End of file block 267 / Allocated 268

Virtual block number 85 (00000055), 512 (0200) bytes

 0A219A50 52003805 FD0E9688 FD0C8688 FD06B6FF 09A9E900 03E90375 00003008 .=..u.Õ..Õ`..Ñø»..É»..ß».ß.RP.ǃ. 000000
 E9037500 003008C4 83450E00 009A0E76 FF1076FF FD88B6FF 526AFD88 86890000 ....¡»jR.Ñ¡».v..v.....E.á.=..u.Õ 000020
 6AFD8886 89000012 F89A5052 003405FD DE9688FD DC8688FD D686FF09 70E90003 ..Õp..Ñø»..É»..ß».4.RP.«.....¡»j 000040
 46880937 E9000ЗE9 03750000 3008C483 455C0000 9A0E76FF 1076FFFD 8886FF52 R.Ñ¡».v..v....\E.á.=..u.Õ..Õ7..F 000060
 05FD0E96 88FD0C86 880676FF 0876FFFD C286FFFD C486FF00 43E90375 08460806 ..F.u.ÕC..Ñá».Ñö».v..v...É»..ß». 000080
 C48345C5 00009A0E 76FF1076 FFFD8886 FF506AFD 88868900 0027F09A 50520046 F.RP.Þ'....¡»jP.Ñ¡».v..v....éE.á 0000A0
 282447C7 26FD0C9E C4023EE9 03750846 08064688 08E9E900 03E90375 00003008 .=..u.Õ..ÕÕ..F..F.u.Õ>.á.É»&ÚG$( 0000C0
 FFFDC286 FFFDC486 FF000044 47C72601 F54247C7 26FD0C9E C4000026 47C72600 .&ÚG&..á.É»&ÚGB%.&ÚGD...Ñá».Ñö». 0000E0
 FF1076FF FD8886FF 506AFD88 86890000 36399A50 16FDE086 80056A06 76FF0876 v..v.j...Á».P.96....¡»jP.Ñ¡».v.. 000100
 478926FD E08688FD DC9EC408 80E90003 E9037500 003008C4 83401600 009A0E76 v.....ã.á.=..u.Õ..Õ..á.É»..Á»&.G 000120
 6AFD8886 89000045 AE9A5016 E8468004 6A0676FF 0876FFFD C286FFFD C486FF3C <.Ñá».Ñö».v..v.j..FÒ.P.ÜE....¡»j 000140
 86800837 E90003E9 03750000 3008C483 468F0000 9A0E76FF 1076FFFD 8886FF50 P.Ñ¡».v..v....¢F.á.=..u.Õ..Õ7... 000160
 5688EC46 881A5EC4 02578926 078926EA 5688E846 881A5EC4 1C568C1A 4689FDC6 ó».F..V.á^..FÒ.VõĿ..&.W.á^..F$.V 000180
 F446881A 5EC40A57 89260847 8926F256 88F04688 1A5EC406 57892604 478926EE Ÿ&.G.&.W.á^..FÞ.V·&.G.&.W.á^..F¶ 0001A0
 1A5EC4FD E49689FD E2868902 57882607 88261A5E C40E5789 260C4789 26F65688 .V-&.G.&.W.á^.&..&.W...ã»..Õ»á^. 0001C0
 16FDE286 800877FF 260A77FF 260E5EC4 FDE89689 FDE68689 06578826 04478826 &.G.&.W...|»..Õ»á^.&.w.&.w...ã». 0001E0

Dump of file SATURN:[PCCOMMON.DUMP.DLL]DAD.TMP;1 on 18-APR-1990 10:40:03.08
File ID (551,9,0)   End of file block 267 / Allocated 268

Virtual block number 86 (00000056), 512 (0200) bytes

 9800009A 0E76FF10 76FFFD88 B6FF526A FD888689 00000C74 9A5016FD E286AD50 P..ã».P.t.....¡»jR.Ñ¡».v..v..... 000000
 0728261A 5EC40A57 88260847 88261A5E C407B6E9 0003E903 7500003D 08C48348 H.á.=..u.Õ..Õ..á^.&.G.&.W.á^.&+. 000020
 18260447 28261A5E C40E5788 260C4788 261A5EC4 FDEC9689 FDEA8689 02571826 &.W...õ»..$»á^.&.G.&.W.á^.&+G.&. 000040
 52472401 2A9AFDEA B6FFFDEC B6FF146A 006A146A 006AFD8C 9689FD8A 86890657 W...□»..Ÿ»j.j.j.j..Ñ$».Ñõ».*.$GR 000060
 2A9AFD8A 86FFFD8C B6FF146A 006A146A 006AFDEC 9689FDEA 86894741 01C69A50 P.ó.AG..õ»..$»j.j.j.j..ÑŸ».Ñ□».* 000080
 078926FD E49688FD E286881A 5EC4FD8C 9689FD8A 868939A6 01C69A50 52474801 .HGRP.ó.Ì9..□»..Ÿ»á^...ã»..õ»&.. 0000A0
 57882607 88261A5E C4065789 26044789 26FDE896 88FDE686 881A5EC4 02578926 &.W.á^...|»..Õ»&.G.&.W.á^.&..&.W 0000C0
 03065788 26044788 261A5EC4 0A578926 08478926 1A5EC4FD EC9613FD EA860302 ...õ»..$»á^.&.G.&.W.á^.&.G.&.W.. 0000E0
 0036E903 75144608 12468800 ADE90E57 89260C47 89261A5E C4FD8C96 13FD8A86 .□»..Ÿ»á^.&.G.&.W.ÕÜ..F..F.u.Õ6. 000100
 47C72600 282447C7 26FD0C9E C40C5789 260A4789 26FD0E96 88FD0C86 88125EC4 á^...É»..ß»&.G.&.W.á.É»&ÚG$(.&ÚG 000120
 36E90375 18460816 4688006C E9000044 47C72600 4C4247C7 26FD0C9E C4000026 &..á.É»&ÚGBL.&ÚGD..Õl..F..F.u.Õ6 000140
 C726001E 2447C726 FD0C9EC4 0C578926 0A478926 FD0E9688 FD0C8688 165EC400 .á^...É»..ß»&.G.&.W.á.É»&ÚG$..&ú 000160
 E903751C 46081A46 880028E9 00004447 C726004C 4247C726 FD0C9EC4 00002647 G&..á.É»&ÚGBL.&ÚGD..Õ+..F..F.u.Õ 000180
 4447C726 01F54247 C726FD0C 9EC40000 2647C726 00282447 C726FD0C 9EC40020  .á.É»&ÚG$(.&ÚG&..á.É»&ÚGB%.&ÚGD 0001A0
 C09688FD 8E8688FD DC9EC4FD 88868900 00FFFF9A 5016FD8E 868DFD06 B6FF0000 ...Ñø»..ƒ».P.......¡»á.É»..ƒ»..ã 0001C0
 00003008 C48348DF 00009A0E 76FF1076 FFFD8886 FF526A32 57892630 478926FD »&.GO&.W2jR.Ñ¡».v..v....ÕH.á.=.. 0001E0

Dump of file SATURN:[PCCOMMON.DUMP.DLL]DAD.TMP;1 on 18-APR-1990 10:40:03.08
File ID (551,9,0)   End of file block 267 / Allocated 268

Virtual block number 87 (00000057), 512 (0200) bytes

 26FD0C9E C4FD8E86 FFFDC086 FF0877FF 260A77FF 260E5EC4 05ADE900 03E90375 u.Õ..ÕÜ.á^.&.w.&.w..Ñá».Ñƒ»á.É»& 000000
 1700009A 0E76FF10 76FFFD88 B6FF526A FD888689 0000FFFF 9A2477FF 262677FF .w&&.w$.......¡»jR.Ñ¡».v..v..... 000020
 9A3C77FF 26FD0C9E C4FD8E86 FFFDC086 FF0566E9 0003E903 7500003D 08C48349 I.á.=..u.Õ..Õf..Ñá».Ñƒ»á.É»&.w<. 000040
 7500003D 08C48349 4F00009A 0E76FF10 76FFFD88 B6FF526A FD888689 0000FFFF ......¡»jR.Ñ¡».v..v....OI.á.=..u 000060
 FD888689 0000FFFF 9A3E77FF 26FD0C9E C4FD8E86 FFFDC086 FF052EE9 0003E903 .Õ..Õ...Ñá».Ñƒ»á.É»&.w>.......¡» 000080
 FF04F6E9 0003E903 7500003D 08C48342 7500009A 0E76FF10 76FFFD88 B6FF526A jR.Ñ¡».v..v....uB.á.=..u.Õ..Õ-.. 0000A0
 76FFFD88 B6FF526A FD888689 0000FFFF 9A4077FF 26FD0C9E C4FD8E86 FFFDC086 Ñá».Ñƒ»á.É»&.w@.......¡»jR.Ñ¡».v 0000C0
 FF260A77 FF260E5E C4048EE9 0003E903 7500003D 08C48349 CE00009A 0E76FF10 ..v....ol.á.=..u.Õ..Õƒ.á^.&.w.&. 0000E0
 6AFD8886 890000FF FF9A0A77 FF260C77 FF26FD0C 9EC4FD8E 86FFFDC0 B6FF0877 w..Ñá».Ñƒ»á.É»&.w.&.w........¡»j 000100
 46880477 E90003E9 03750000 3008C483 460E0000 9A0E76FF 1076FFFD 8886FF52 R.Ñ¡».v..v.....F.á.=..u.Õ..Õw..F 000120
 03750000 30FD8886 8904C483 48400F63 9A1276FF 1476FF00 20E90375 14460812 ..F.u.Õ ..v..v..c.@K.á...¡»=..u. 000140
 FF0877FF 260A77FF 260E5EC4 0169E903 7518460B 16468801 A4E9044F E90003E9 Õ..ÕO.ÕE..F..F.u.Õi.á^.&.w.&.w.. 000160
 B6FF526A FD888689 0000FFFF 9A2C77FF 262E77FF 26FD0C9E C4FD8E86 FFFDC086 Ñá».Ñƒ»á.É»&.w.&.w,.......¡»jR.Ñ 000180
 26FD0C9E C403FAE9 0003E903 7500003D 08C4834A F100009A 0E76FF10 76FFFD88 ¡».v..v....þJ.á.=..u.Õ..Õ°.á.É»& 0001A0
 C426FD0C 9EC40257 18260728 262C5FC4 26FD0C9E C40A5788 26084788 262C5FC4 á_,&.G.&.W.á.É»&á_,&+.&.W.á.É»&á 0001C0
 5FC426FD DC9EC40E 5788260C 4788262C 5FC426FD DC9EC402 57892607 8926285F _(&..&.W.á.É»&á_,Ï.G.&.W.á.É»&á_ 0001E0
```

```
Dump of file SATURN:[PCCOMMON.DUMP.DLL]DAD.TMP;1 on 18-APR-1990 10:40:03.08
File ID (551,9,0)   End of file block 267 / Allocated 268

Virtual block number 91 (0000005B), 512 (0200) bytes

 6AE44689 0000FFFF 9AE676FF E876FFEA 76FFEC76 FF0027E9 0375E846 08E64688 .Fl.Fòu.Ö'..v&.vö.vö.vl......Föj 000000
 000CC8C8 C95F5F1F 0000E9E4 468B08C4 834F1000 009A0676 FF0876FF E476FF50 P.vö.v..v.....0.á..Föö...^_èùà.. 000020
 89000088 0000FE46 C7FA4689 FC468900 00880000 F446C7D8 8E4EACB8 1E565700 .WV.¡~N.ÄüF¶..¡...F=.F*üF±..¡... 000040
 FA468904 57882602 47882606 5EC40789 26024789 26000088 0A5EC4F6 4689F846 F½.F-á^.¡..&.G.&..á^.&.G.&.W..F* 000060
 0000425E 9A5016F6 468D4A6A 326AFE76 FFFE4689 0788261F C426FA5E C4FC5689 .V=á^*&á.&...F±.v±j2jJ.F-.P.^B.. 000080
 40E90003 E9037500 003008C4 83528C00 009AFA76 FFFC76FF F476FF4F 6AF44689 .F¶jO.v¶.v=.v*....R.á.=..u.Ö..Öa 0000A0
 C4045789 26024789 26F65EC4 04578826 02478826 065EC400 0507C726 F65EC402 .á^-&ú...á^.&.G.&.W.á^-&.G.&.W.á 0000C0
 0088F65E C40A4789 260C4789 26000088 F65EC406 47892608 47892600 0088F65E ^-¡..&.G.&.G.á^-¡..&.G.&.G.á^-¡. 0000E0
 00011647 C726F65E C4124789 26144789 26000088 F65EC40E 47892610 47892600 .&.G.&.G.á^-¡..&.G.&.G.á^-&úG... 000100
 C41C4789 261E4789 26000088 F65EC41A 57892618 47892608 56880646 88F65EC4 á^-.F..V.&.G.&.W.á^-¡..&.G.&.G.á 000120
 0088F65E C4244789 26264789 26000088 F65EC420 47892622 47892600 0088F65E ^-¡..&.G"&.G á^-¡..&.G&&.G$á^-¡. 000140
 47892600 0088F65E C4384789 263A4789 26000088 F65EC428 4789262A 47892600 .&.G*&.G(á^-¡..&.G:&.G8á^-¡..&.G 000160
 00004047 C726F65E C400003E 47C726F6 5EC40000 3C47C726 F65EC430 47892632 2&.G0á^-&úG<..á^-&úG>..á^-&úG@.. 000180
 00014847 C726F65E C4000046 47C726F6 5EC44247 89264447 89260000 B8F65EC4 á^-¡..&.GD&.GBá^-&úGF..á^-&úGH.. 0001A0
 526AF446 89000043 809AF676 FFF876FF 50520020 05045788 26024788 26065EC4 á^.&.G.&.W.. .RP.v½.v-..C...F¶jR 0001C0
 88FE76FF 0105E900 03E90375 00003008 C48352C0 00009AFA 76FFFC76 FFF476FF .v¶.v=.v*...àR.á.=..u.Ö..Ö...v±. 0001E0

Dump of file SATURN:[PCCOMMON.DUMP.DLL]DAD.TMP;1 on 18-APR-1990 10:40:03.08
File ID (551,9,0)   End of file block 267 / Allocated 268

Virtual block number 92 (0000005C), 512 (0200) bytes

 00009AFA 76FFFC76 FFF476FF 526AF446 89000052 DF9A5052 002C05F8 5688F646 F-.V½.,.RP.ÖR...F¶jR.v¶.v=.v*... 000000
 859A5052 003405F8 5688F646 88FE76FF 0001E900 03E90375 00003008 C48352F4 ¶R.á.=..u.Ö..Öl..v±.F-.V½.4.RP.. 000020
 03E90375 00003008 C483535A 00009AFA 76FFFC76 FFF476FF 526AF446 89000044 D...F¶jR.v¶.v=.v*...ZS.á.=..u.Ö. 000040
 000889DA 8E1EF088 F8882C5F C426F65E C42E5788 262C4788 26065EC4 0090E900 .Ö..á^.&.G.&.W.á^-&á_.«.Þ..Ö¿.. 000060
 05F85688 F646882C 77FF262E 77FF26F6 5EC40877 FF260A77 FF26FA5E C41FA5F2 ·E.á^*&.w.&.w.á^-&.w.&.w,.F-.V½. 000080
 3008C483 53910000 9AFA76FF FC76FFF4 76FF526A F4468900 0048069A 50520020  .RP.æK...F¶jR.v¶.v=.v*....S.á.= 0000A0
 00004C5F 9AF676FF F876FF20 77FF2622 77FF26F6 5EC40037 E90003E9 03750000 ..u.Ö..Ö7.á^-&.w"&.w .v½.v-._L.. 0000C0
 00E90003 E9037500 003008C4 8350CD00 009AFA76 FFFC76FF F476FF52 6AF44689 .F¶jR.v¶.v=.v*...èP.á.=..u.Ö.Ö. 0000E0
 037500F4 7E830257 89260789 26F85688 F646880A 5EC40010 E9037400 F47E8300 ..~¶.t.Ö..á^..F-.V½&..&.W..~¶.u. 000100
 E9000088 04C48350 8453E79A F676FFF8 76FF000E E90375F8 4608F646 880019E9 Ö...F-.F½u.Ö...v½.v-.ÖS.P.á.¡..Ö 000120
 4689F846 89000088 0000F446 C7D88E50 E5881E56 5700000C C8C8C95F 5E1F0000 ...^_èùà...WV.¡lP.ÄüF¶..¡...F½.F 000140
 F85689F6 46890457 88260247 8826065E C4FC4689 FE468900 00880000 FA46C7F6 -üF*..¡...F±.F=á^.&.G.&.W..F-.V½ 000160
 26065EC4 0012E9C. 7510470B 260E4788 26065EC4 FA468907 88261FC4 26F65EC4 á^-&á.&...F*á^.&.G.&.G.u.Ö..á^.& 000180
 5EC40012 E9037514 47082612 47882606 5EC40A47 89260C47 89260000 880E5FC4 á .¡..&.G.&.G.á^.&.G.&.G.u.Ö..á^ 0001A0
 0029E903 750C4708 260A4788 26065EC4 0A478926 0C478926 00008812 5FC42606 .&á .¡..&.G.&.G.á^.&.G.&.G.u.Ö). 0001C0
 76FFF876 FFF476FF 526AF446 890000FF FF9A0A77 FF260C77 FF26065E C4FA76FF .v*Z^.&.w.&.w.......F¶jR.v¶.v½.v 0001E0

Dump of file SATURN:[PCCOMMON.DUMP.DLL]DAD.TMP;1 on 18-APR-1990 10:40:03.08
File ID (551,9,0)   End of file block 267 / Allocated 268

Virtual block number 93 (0000005D), 512 (0200) bytes

 26065EC4 FA76FF00 29E90375 36470826 34478826 065EC408 C483540D 00009AF6 -...¶T.á.á^.&.G4&.G6u.Ö)..v*á^.& 000000
 83551600 009AF676 FFF876FF F476FF52 6AF44689 00005573 9A3477FF 263677FF .wó&.w4.sU...F¶jR.v¶.v½.v-....U. 000020
 3877FF26 3A77FF26 065EC4FA 76FF0029 E903753A 47082638 47882606 5EC408C4 á.á^.&.G8&.G:u.Ö)..v*á^.&.w:&.w8 000040
 8826065E C408C483 554F0000 9AF676FF F876FFF4 76FF526A F4468900 00553A9A .:U...F¶jR.v¶.v½.v-...OU.á.á^.&. 000060
 46890000 16189A28 77FF262A 77FF2606 5EC4FA76 FF0029E9 03752A47 08262847 G(&.G*u.Ö)..v*á^.&.w*&.w(......F 000080
 752E4708 262C4788 26065EC4 08C48355 8800009A F676FFF8 76FFF476 FF526AF4 ¶jR.v¶.v½.v-....U.á.á^.&.G,&.G.u 0000A0
 FFF476FF 526AF446 89000015 E59A2C77 FF262E77 FF26065E C4FA76FF 0029E903 .Ö)..v*á^.&.w.&.w,.l....F¶jR.v¶. 0000C0
 FA76FF00 29E90375 32470826 30478826 065EC408 C48355C1 00009AF6 76FFF876 v½.v-...èU.á.á^.&.G0&.G2u.Ö)..v* 0000E0
 009AF676 FFF876FF F476FF52 6AF44689 0000FFFF 9A3077FF 263277FF 26065EC4 á^.&.w2&.w0......F¶jR.v¶.v½.v-.. 000100
 77FF2622 77FF2606 5EC40026 E9037522 47082620 47882606 5EC408C4 8355F700 .XU.á.á^.&.G &.G"u.Ö&.á^.&.w"&.w 000120
 26065EC4 08C48356 2F00009A F676FFF8 76FFF476 FF526AF4 46890000 FFFF9A20  ......F¶jR.v¶.v½.v-.../V.á.á^.& 000140
 46890000 16869A00 6A1C77FF 261E77FF 26065EC4 0028E903 751E4708 261C4788 .G.&.G.u.Ö(.á^.&.w.&.w.j.......F 000160
 FF505200 2005F856 88F64688 08C48356 6400009A F676FFF8 76FFF476 FF526AF4 ¶jR.v¶.v½.v-...dV.á..F-.V½. .RP. 000180
 76FFF876 FFF476FF 526AF446 89000040 A79A5016 FC468001 6A006A06 76FF0876 v..v.j.j..F•.P.la...F¶jR.v¶.v½.v 0001A0
 FFF476FF 4F6AF446 89000041 5F9A0676 FF0876FF FA76FF08 C4835688 00009AF6 -....V.á..v*.v..v.._A...F¶jO.v¶. 0001C0
 881E5657 00000CC8 CBC95F5E 1F0000E9 00008808 C4835151 00009AF6 76FFF876 v½.v-...QQ.á.¡..Ö...^_èùà...WV.¡ 0001E0
```

```
Dump of file SATURN:[PCCOMMON.DUMP.DLL]DAD.TMP;1 on 18-APR-1990 10:40:03.08
File ID (551,9,0)   End of file block 267 / Allocated 268

Virtual block number 88 (00000058), 512 (0200) bytes

 261FC426 0E5EC406 57892604 47892628 5FC426FD DC9EC406 57182604 4728262C ,&+G.&.W.6.É»&6_(&.G.&.W.6^.&6.& 000000
 86890000 45F79A50 16F8468D 086A0677 FF260877 FF26165E C42877FF 262077FF .w-&.w+6^.&.w.&.w.j..F%.P.XE.... 000020
 54E90003 E9037500 003008C4 834C0100 009A0E76 FF1076FF FDB886FF 506AFD88 ¡»jP.Ñ¡».v..v.....L.6.=..u.Õ..ÕT 000040
 E28688FD E89689FD E68689FE 5688FC46 88FDE496 89FDE286 89FA5688 F8468803 ..F%.V°..ã»..ö».F•.V±..Ì»..Ò»..ã 000060
 26C29A16 76FF1876 FF0020E9 0374FDEB 8608FDE6 86880020 E90374FD E48608FD =..Õ»t.Õ-...Ì»..Õ»t.Õ ..v..v..ô& 000080
 1876FF50 16FDE286 800023E9 0301E900 03E90375 00003DFD 88868904 C4834866 fK.6...¡»=..u.Õ..Õ..Õ#...ã».P.v. 0000A0
 1A468800 30E9020B E90003E9 03750000 30FD8886 8908C483 48992888 9A1676FF .v..¡(.K.6...¡»=..u.Õ..ÕU.ÕO..F. 0000C0
 868908C4 8339CC44 7A9AFD0C B6FFFD0E B6FF1A76 FF1C76FF 0025E903 751C4608 .F.u.Õ%..v..v..Ñ8».ÑÉ».zDä9.6... 0000E0
 260A77FF 260E5EC4 0001E903 75144608 12468802 A8E90003 E9037500 0030FD88 ¡»=..u.Õ..Õ´..F..F.u.Õ1.6^.&.w.& 000100
 9EC4FD88 86890000 4C829A50 16FD0886 8D2C77FF 262E77FF 26FDDC9E C40877FF .w.6.É»&.w.&.w,..Ä».P.ýL....¡»6. 000120
 009A0E76 FF1076FF FDB886FF 526A2257 89262047 8926FD0A 9688FD08 8688FD0C É»..Ä»..Õ»&.G &.W"jR.Ñ¡».v..v... 000140
 FF26125E C4016AFD D8B6FFFD DAB6FF02 44E90003 E9037500 003008C4 834C3E00 .>L.6.=..u.Õ..ÕO..ÑO».ÑÁ»j.6^.&. 000160
 4C760000 9A0E76FF 1076FFFD B8B6FF52 6AFD8886 8900004D 039A1877 FF261A77 w.&.w...M....¡»jR.Ñ¡».v..v....vL 000180
 389AFD0C B6FFFD0E B6FFFD08 B6FFFD0A B6FF0207 E90003E9 03750000 3008C483 .6.=..u.Õ..Õ...ÑO».ÑÁ».Ñ8».ÑÉ».; 0001A0
 03750000 3008C483 4CDD0000 9A0E76FF 1076FFFD B8B6FF52 6AFD8886 8900004D M....¡»jR.Ñ¡».v..v....ïL.6.=..u. 0001C0
 C40877FF 260A77FF 260E5EC4 0001E903 75184608 16468801 A1E901CF E90003E9 Õ..ÕU.ÕÀ..F..F.u.Õ1.6^.&.w.&.w.6 0001E0

Dump of file SATURN:[PCCOMMON.DUMP.DLL]DAD.TMP;1 on 18-APR-1990 10:40:03.08
File ID (551,9,0)   End of file block 267 / Allocated 268

Virtual block number 89 (00000059), 512 (0200) bytes

 8688FDDC 9EC4FD88 86890000 FFFF9A50 16FD0886 8D2C77FF 262E77FF 26FDDC9E .É»&.w.&.w,..Ä».P.......¡»6.É».. 000000
 834D1A00 009A0E76 FF1076FF FDB886FF 526A2257 89262047 8926FD0A 9688FD08 Ä»..Õ»&.G &.W"jR.Ñ¡».v..v.....M. 000020
 FF262177 FF26165E C4026AFD D8B6FFFD DAB6FF01 68E90003 E9037500 003008C4 6.=..u.Õ..Õh..ÑO».ÑÁ»j.6^.&.wI&. 000040
 3008C483 40520000 9A0E76FF 1076FFFD B8B6FF52 6AFD8886 890000FF FF9A1F77 w........¡»jR.Ñ¡».v..v....RM.6.= 000060
 890000FF FF9AFD0C B6FFFD0E B6FFFD08 B6FFFD0A B6FF0128 E90003E9 03750000 ..u.Õ..Õ+..ÑO».ÑÁ».Ñ8».ÑÉ»...... 000080
 E90003E9 03750000 3008C483 49870000 9A0E76FF 1076FFFD B8B6FF52 6AFD8886 .¡»jR.Ñ¡».v..v.....I.6.=..u.Õ..Õ 0000A0
 76FF1C76 FF0877FF 260A77FF 260E5EC4 008AE903 751C4608 1A468800 C5E900F3 µ.Õé..F..F.u.Õo.6^.&.w.&.w..v..v 0000C0
 5789261C 478926E6 5688E446 88FD0C9E C4FD8886 89000013 959A5016 E44680D1A ..FÕ.P.......¡»6.É».FÕ.VÌ&.G.&.W 0000E0
 0095E900 03E90375 00003008 C48340E4 00009A0E 76FF1076 FFFD8886 FF526A1E .jR.Ñ¡».v..v....ÕM.6.=..u.Õ..Õ.. 000100
 76FF1076 FFFD8886 FF526AFD 88868900 0000C29A 016A006A 006AE476 FFE676FF .vl.vÕj.j.j..ò.....¡»jR.Ñ¡».v..v 000120
 B6FFFD0E B6FFE476 FFE676FF 0061E900 03E90375 00003008 C4834A48 00009A0E ....KJ.6.=..u.Õ..Õa..vl.vÕ_Ñ8».Ñ 000140
 3008C483 4D800000 9A0E76FF 1076FFFD B8B6FF52 6AFD8886 89000013 CC9AFD0C É».ä.....¡»jR.Ñ¡».v..v....¯M.6.= 000160
 7A9AFD0C B6FFFD0E B6FF2C77 FF262E77 FF26FD0C 9EC40028 E90003E9 03750000 ..u.Õ..Õ+.6.É»&.w.&.w,.Ñ8».ÑÉ».z 000180
 C40012E9 037400FD 888E8300 00E90003 E9037500 0030FD88 868908C4 8349F244 Ð·I.6...¡»=..u.Õ..Õ.../¡».t.Õ..6 0001A0
 08FD0C86 88001DE9 037500FD 888E8302 57892607 8926FDDE 9688FD0C 86881E5E ^...É»..B»&..&.W../¡».u.Õ....É». 0001C0
 1F0000E9 FD888688 04C4833F 9353E79A FDDCB6FF FDDEB6FF 0010E903 75FDDE86 .8»u.Õ...Ñ8».ÑÉ».ÕS.7.6...¡»Õ... 0001E0

Dump of file SATURN:[PCCOMMON.DUMP.DLL]DAD.TMP;1 on 18-APR-1990 10:40:03.08
File ID (551,9,0)   End of file block 267 / Allocated 268

Virtual block number 90 (0000005A), 512 (0200) bytes

 0088EA46 89EC4689 00008800 00E446C7 D88E418C 881E5657 00001CC8 C8C95F5E ^_èùà...WV.¡.A.ÁüFÕ..¡...F$.Fõ¡. 000000
 261FC426 065EC407 89260247 89260000 880E5EC4 0008EE46 C7E64689 E8468900 ..FÕ.FlúFŸ..6^.¡..&.G.&..6^.&6.& 000020
 890000FF FF9A501C E6468D12 6AEA76FF EC76FFEC 5689EA46 8920578B 26284788 .G+&.W-.Fõ.V$.v$.võj..Fl.P...... 000040
 0177E900 03E90375 J0003D08 C4834F51 00009A06 76FF0876 FFE476FF 506AE446 FõjP.võ.v..v....OO.6.=..u.Õ..Õw. 000060
 0000FFFF 9A156A04 77FF2606 77FF2606 5EC4036A E676FFE8 76FFEA76 FFEC76FF .v$.võ.vò.vlj.6^.&.w.&.w.j...... 000080
 36E90003 E9037500 003008C4 834F9500 009A0676 FF0876FF E476FF50 6AE44689 .FõjP.võ.v..v.....O.6.=..u.Õ..Õ6 0000A0
 9A00EE68 1E504004 C4834710 00709A00 EF681EE6 76FFE876 FFEA76FF EC76FF01 ..v$.võ.vò.vl.hÿ..p..G.6.@P.hŸ.. 0000C0
 E9037500 003008C4 83501100 009A0676 FF0876FF E476FF50 6AE44689 0000FFFF .....FõjP.võ.v..v.....P.6.=..u.Õ 0000E0
 06578826 04478826 0A5EC4F2 5689F046 89025788 26078826 0A5EC400 F2E90003 ..Õ·.6^.&..&.W..FÞ.V·6^.&.G.&.W. 000100
 88260C47 88260A5E C4FA5689 F846890A 57882608 4788260A 5EC4F656 89F44689 .F¶.V-6^.&.G.&.W..F%.V*6^.&.G.&. 000120
 0000503A 9A5016F0 4680046A E676FFE8 76FFEA76 FFEC76FF FE5689FC 46890E57 W..F=.V±.v$.võ.vò.vlj..FÞ.P.:P.. 000140
 76E90003 E9037500 003008C4 83504F00 009A0676 FF0876FF E476FF50 6AE44689 .FõjP.võ.v..v....OP.6.=..u.Õ..Õv 000160
 46890000 39209A50 16EE468D 056AE676 FFE876FF EA76FFEC 76FF0000 EE46C700 .úFŸ...v$.võ.vò.vlj..FŸ.P.-9...F 000180
 FF0038E9 0003E903 75000030 08C4834E 1A00009A 0676FF08 76FFE476 FF506AE4 õjP.võ.v..v.....N.6.=..u.Õ..Õ8.. 0001A0
 76FFE876 FF006A00 6A0676FF 0876FF00 6A006A00 6A006A00 6A006A0E 76FF1076 v..v.j.j.j.j.j.j..v..v.j.j..vÕ.v 0001C0
 0032E903 7500E47E 830000E9 0003E903 7500003D E446891C C4834E93 41849AE6 I..A.N.6..FÕ=..u.Õ..Õ...-õ.u.Õ2. 0001E0
```

```
Dump of file SATURN:[PCCOMMON.DUMP.DLL]DAD.TMP;1 on 18-APR-1990 10:40:03.08
File ID (551,9,0)    End of file block 267 / Allocated 268

Virtual block number 94 (0000005E), 512 (0200) bytes

F44689F6 46890000 88FC4689 FE468900 00880000 FA46C700 00F846C7 D88E53EF ÿS.ÀúF½..úF°..|...F±.F•|...F-.F¶ 000000
9F68326A FA76FFFA 46890788 261FC426 065EC407 89260247 89260000 880A5EC4 á^.|..&.G.&..á^.&á.&...F°.v°|2h. 000020
C48354A4 00009A06 76FF0876 FFF876FF 4F6AF846 89000051 3C9A5016 FC468000 ..F•.P.<Q...F½jO.v½.v...v....ÉT.á 000040
26FC5EC4 02578924 07892608 56880646 88FC5EC4 08BAE900 03E90375 00003008 .=..u.Õ..Õ..á^•.F..V.&..&.W.á^•& 000060
26FC5EC4 0847892C 0A478926 000088FC 5EC40000 0647C726 FC5EC400 000447C7 úG...á^•&úG...á^•|..&.G.&.G.á^•& 000080
00011247 C726FC5E C4000110 47C726FC 5EC40000 0E47C726 FC5EC400 000C47C7 úG...á^•&úG...á^•&úG...á^•&úG... 0000A0
47892600 0088FC5E C41C4789 261E4789 26000088 FC5EC400 004947C7 26FC5EC4 á^•&úGI..á^•|..&.G.&.G.á^•|..&.G 0000C0
4789262A 47892600 0088FC5E C4244789 26264789 26000088 FC5EC420 47892622 "&.G á^•|..&.G&&.G$á^•|..&.G*&.G 0000E0
FF0876FF F876FF52 6AF84689 000057E4 9A505200 1805FE56 88FC4688 FA76FF28 (.v°.F•.V±...RP.ðW...F½jR.v½.v.. 000100
1405FE56 88FC4688 FA76FF0A C1E90003 E9037500 003D08C4 8357F900 009A0676 v....°W.á.=..u.Õ..Õè..v°.F•.V±.. 000120
003D08C4 83582000 009A0676 FF0876FF F876FF52 6AF84689 00001946 9A505200 .RP.F....F½jR.v½.v..v.....-X.á.=. 000140
6AF84689 000052A8 9A505200 3105FE56 88FC4688 FA76FF0A 8DE90003 E9037500 .u.Õ..Õ...v°.F•.V±.1.RP.¨R...F½j 000160
FA76FF0A 59E90003 E9037500 003D08C4 83585800 009A0676 FF0876FF F876FF52 R.v½.v...v....[X.á.=..u.Õ..ÕY..v° 000180
08C48359 1F00009A 0676FF08 76FFF876 FF526AF8 46890000 590A9A50 16F4468D .F¶.P..Y...F½jR.v½.v..v.....Y.á. 0001A0
76FF0000 58809A5A A3685887 68006AF4 76FFF676 FF0A2BE9 0003E903 7500003D =..u.Õ..Õ+..v-.v¶j.h.XhÉZ..X...v 0001C0
9AFFFF68 58AD6808 6AF476FF F676FF00 0058A09A FFFF6858 9A68076A F476FFF6 -.v¶j.h.Xh....X...v-.v¶j.hÜXh... 0001E0

Dump of file SATURN:[PCCOMMON.DUMP.DLL]DAD.TMP;1 on 18-APR-1990 10:40:03.08
File ID (551,9,0)    End of file block 267 / Allocated 268

Virtual block number 95 (0000005F), 512 (0200) bytes

68096AF4 76FFF676 FF000058 C69AFFFF 6858C068 056AF476 FFF676FF 00005883 °X...v-.v¶j.hàXh...ÓX...v-.v¶j.h 000000
F676FF00 00593E9A FFFF6858 E6680A6A F476FFF6 76FF0000 58D99AFF FF6858D3 &Xh...]X...v-.v¶j.h]Xh...>Y...v- 000020
5789264B 478926F6 5688F446 88FC5EC4 00005964 9A596168 59386801 6AF476FF .v¶j.h8YhaY.dY..á^•.F¶.V-&.GK&.W 000040
9700009A 0676FF08 76FFF876 FF526AF8 46890000 59829A50 16F4468D FA76FF40 M.v°.F¶.P..Y...F½jR.v½.v..v..... 000060
59519AFF FF68594B 68006AF4 76FFF676 FF0967E9 0003E903 7500003D 08C48359 Y.á.=..u.Õ..Õg..v-.v¶j.hKYh...QY 000080
59806801 6AF476FF F676FF00 0059869A FFFF6859 5E68026A F476FFF6 76FF0000 ...v-.v¶j.h^Yh...ÑY...v-.v¶j.h¯Y 0000A0
16F4468D FA76FF51 5789264F 478926F6 5688F446 88FC5EC4 0000590C 9A590968 h)Y.ÉY..á^•.F¶.V-&.GO&.WQ.v°.F¶. 0000C0
7500003D 08C4835A 0F00009A 0676FF08 76FFF876 FF526AF8 46890000 59FA9A50 P.°Y...F½jR.v½.v..v.....Z.á.=..u 0000E0
F476FFF6 76FF0000 59C99AFF FF6859C3 68006AF4 76FFF676 FF08EFE9 0003E903 .Õ..Õy..v-.v¶j.hùYh...èY...v-.v¶ 000100
00005A54 9A5A5168 5A286801 6AF476FF F676FF00 005A2E9A 5A3E6859 D668026A j.h•Yh>Z..Z...v-.v¶j.h(ZhQZ.TZ.. 000120
46890000 5A729A50 16F4468D FA76FF55 57892653 478926F6 5688F446 88FC5EC4 á^•.F¶.V-&.GS&.WU.v°.F¶.P.rZ...F 000140
FF0877E9 0003E903 7500003D 08C4835A 8700009A 0676FF08 76FFF876 FF526AF8 ½jR.v½.v..v.....Z.á.=..u.Õ..Õw.. 000160
FFFF685A 4E68026A F476FFF6 76FF0000 5A419AFF FF685A38 68006AF4 76FFF676 v-..v¶j.h;Zh...AZ...v-.v¶j.hNZh.. 000180
5688F446 88FC5EC4 0000FFFF 9AFFFF68 5AA06801 6AF476FF F676FF00 005AA69A .¦Z...v-.v¶j.h.Zh........á^•.F¶.V 0001A0
76FFF876 FF526AF8 46890000 FFFF9A50 16F4468D FA76FF59 57892657 478926F6 -&.GW&.WY.v°.F¶.P.......F½jR.v½.v 0001C0
68006AF4 76FFF676 FF07FFE9 0003E903 7500003D 08C48356 FC00009A 0676FF08 ..v.....•V.á.=..u.Õ..Õ....v-.v¶j.h 0001E0

Dump of file SATURN:[PCCOMMON.DUMP.DLL]DAD.TMP;1 on 18-APR-1990 10:40:03.08
File ID (551,9,0)    End of file block 267 / Allocated 268

Virtual block number 96 (00000060), 512 (0200) bytes

F676FF00 005ACC9A 588A685A C668076A F476FFF6 76FF0000 FFFF9AFF FF68048A ..h.........v-.v¶j.hóZh.X.àZ...v- 000000
449A5806 685AEC68 0A6AF476 FFF676FF 00005ADF 9A589068 5AD96808 6AF476FF .v¶j.hìZh.X.ÕZ...v-.v¶j.hšZh•X.D 000020
26F6568B F44688FC 5EC40000 5B6A9A5B 67685B3E 68016AF4 76FFF676 FF00005B [...v-.v¶j.h>[hg[.j[..á^•.F¶.V-& 000040
FF0876FF F876FF52 6AF84689 00005B88 9A5016F4 468DFA76 FF615789 265F4789 .G_&.Wa.v°.F¶.P...[....F½jR.v½.v.. 000060
5B516800 6AF476FF F676FF07 61E90003 E9037500 003D08C4 83589000 009A0676 v.....[.á.=..u.Õ..Õa..v-.v¶j.hQ[ 000080
76FFF676 FF00005B BC7AFFFF 68586468 026AF476 FFF676FF 00005857 9AFFFF68 h...W[...v-.v¶j.hd[h...¥[...v-.v 0000A0
FF655789 26634789 26F6568B F44688FC 5EC40000 5BE29A5B DF685BB6 6..¶6AF4 ¶j.hÑ[hÕ[.â[..á^•.F¶.V-&.Gc&.We. 0000C0
835C1500 009A0676 FF0876FF F876FF52 6AF84689 00005C00 9A5016F4 468D7A76 v°.F¶.P..\...F½jR.v½.v..v.....\. 0000E0
00005BCF 9AFFFF68 5BC96800 6AF476FF F676FF06 E9E90003 E9037500 003D08C4 á.=..u.Õ..ÕÕ..v-.v¶j.hè[h...ü[.. 000100
57685C2E 68016AF4 76FFF676 FF00005C 349AFFFF 68580C68 026AF476 FFF676FF .v-.v¶j.hÉ[h...4\...v-.v¶j.h.\hW 000120
9A5016F4 468DFA76 FF695789 26674789 26F6568B F44688FC 5EC40000 5C5A9A5C \.Z\..á^•.F¶.V-&.Gg&.Wi.v°.F¶.P. 000140
E9037500 003D08C4 835C8D00 009A0676 FF0876FF F876FF52 6AF84689 00005C78 x\...F½jR.v½.v..v.....\.á.=..u.Õ 000160
026AF476 FFF676FF 00005C47 9AFFFF68 5C416800 6AF476FF F676FF06 71E90003 ..Õq..v-.v¶j.hA\h...G\...v-.v¶j. 000180
5EC40000 5CD29A5C CF685CA6 68016AF4 76FFF676 FF00005C AC9AFFFF 685C5468 hT\h...¯\...v-.v¶j.hÏ\hù\.Ø\..á^ 0001A0
6AF84689 00005CF0 9A5016F4 468DFA76 FF605789 26684789 26F6568B F44688FC •.F¶.V-&.Gk&.Wm.v°.F¶.P.Þ\...F½j 0001C0
F676FF05 F9E90003 E9037500 003D08C4 83500500 009A0676 FF0876FF F876FF52 R.v½.v..v.....].á.=..u.Õ..Õ°..v- 0001E0
```

```
Dump of file SATURN:[PCCOMMON.DUMP.DLL]DAD.TMP;1 on 18-APR-1990 10:40:03.08
File ID (551,9,0)   End of file block 267 / Allocated 268

Virtual block number 97 (00000061), 512 (0200) bytes

 249A5034 685CCC68 026AF476 FFF676FF 00005CBF 9AFFFF68 5CB96800 6AF476FF .v¶j.h¿\h...¢\...v-.v¶j.hè\h4].$ 000000
 26F65688 F44688FC 5EC40000 504A9A5D 4768501E 68016AF4 76FFF676 FF00005D ]...v-.v¶j.h.]hG].J]..á^=.F¶.V-& 000020
 FF0876FF F876FF52 6AF84689 00005D68 9A5016F4 468DFA76 FF715789 266F4789 .Go&.Wq.v°.F¶.P.h]...F%jR.v%.v.. 000040
 5D316800 6AF476FF F676FF05 81E90003 E9037500 003D08C4 835D7D00 009A0676 v....)].á.=..u.Õ..Õ...v-.v¶j.h1] 000060
 76FFF676 FF00005D 9C9AFFFF 685D4468 026AF476 FFF676FF 00005037 9AFFFF68 h...7]...v-.v¶j.hD]h....]...v-.v 000080
 FF755789 26734789 26F65688 F44688FC 5EC40000 5DC29A50 8F685D96 68016AF4 ¶j.h.]h¢).ó]..á^=.F¶.V-&.Gs&.Wu. 0000A0
 8350F500 009A0676 FF0876FF F876FF52 6AF84689 00005DE0 9A5016F4 468DFA76 v°.F¶.P.Å]...F%jR.v%.v..v....%]. 0000C0
 00005DAF 9AFFFF68 5DA96800 6AF476FF F676FF05 09E90003 E9037500 003D08C4 á.=..u.Õ..Õ...v-.v¶j.h`]h...€].. 0000E0
 E9685E0E 68016AF4 76FFF676 FF00005E 149A59C6 685D8C68 026AF476 FFF676FF .v-.v¶j.h¥]hóY..^...v-.v¶j.h.^hÕ 000100
 9A5016F4 468DFA76 FF5D5789 26584789 26F65688 F44688FC 5EC40000 58EC9A58 X.ìX..á^=.F¶.V-&.G[&.W].v°.F¶.P. 000120
 E9037500 003D08C4 8357C500 009A0676 FF0876FF F876FF52 6AF84689 00005846 FX...F%jR.v%.v..v....éW.á.=..u.Õ 000140
 046AF476 FFF676FF 00005E27 9A593B68 5E216800 6AF476FF F676FF04 91E90003 ..Õ...v-.v¶j.h!^h;Y.'^...v-.v¶j. 000160
 5EC40000 5E829A5E AF685E86 68016AF4 76FFF676 FF000058 7A9AFFFF 68587468 htXh...zX...v-.v¶j.h.^hE^.ý^..á^ 000180
 6AF84689 00005ED0 9A5016F4 468DFA76 FF795789 26774789 26F65688 F44688FC •.F¶.V-&.Gw&.Wy.v°.F¶.P.Å^...F%j 0001A0
 F676FF04 19E90003 E9037500 003D08C4 835EE500 009A0676 FF0876FF F876FF52 R.v%.v..v....[^.á.=..u.Õ..Õ...v- 0001C0
 049AFFFF 685F1168 016AF476 FFF676FF 00005E9F 9A5F0168 5EAC6800 6AF476FF .v¶j.h`^h._..^...v-.v¶j.h._h.... 0001E0

Dump of file SATURN:[PCCOMMON.DUMP.DLL]DAD.TMP;1 on 18-APR-1990 10:40:03.08
File ID (551,9,0)   End of file block 267 / Allocated 268

Virtual block number 98 (00000062), 512 (0200) bytes

 26F65688 F44688FC 5EC40000 5F2A9A5F 27685EFE 68016AF4 76FFF676 FF00005F _...v-.v¶j.hþ^h'_.*_..á^=.F¶.V-& 000000
 FF0876FF F876FF52 6AF84689 00005F49 9A5016F4 468DFA76 FF705789 26784789 .G(&.W).v°.F¶.P.I_...F%jR.v%.v.. 000020
 5F246800 6AF476FF F676FF03 A1E90003 E9037500 003D08C4 835F5E00 009A0676 v....^_.á.=..u.Õ..ÕÀ..v-.v¶j.h$_ 000040
 76FFF676 FF00005F 7D9AFFFF 685F8A68 016AF476 FFF676FF 00005F17 9A5F7A68 hz_.._...v-.v¶j.h._h...}_...v-.v 000060
 00819789 267F4789 26F65688 F44688FC 5EC40000 5FA39A5F A0685F77 68016AF4 ¶j.hw_h._.£_..á^=.F¶.V-&.G.&.... 000080
 5FD80000 9A0676FF 0876FFF8 76FF526A F8468900 005FC39A 5016F446 8DFA76FF .v°.F¶.P.Ù_...F%jR.v%.v..v....Ä_ 0000A0
 005F909A 5FF4685F 9D68006A F476FFF6 76FF0328 E90003E9 03750000 3D08C483 .á.=..u.Õ..Õ(..v-.v¶j.h._h¶_..._ 0000C0
 685FF168 016AF476 FFF676FF 00005FF7 9AFFFF68 60046801 6AF476FF F676FF00 ..v-.v¶j.h.`h...%_...v-.v¶j.hþ_h 0000E0
 F4468DFA 76FF0085 97892600 83878926 F65688F4 4688FC5E C4000060 1D9A601A .`..`..á^=.F¶.V-&....&.....v°.F¶ 000100
 00003D08 C4836052 00009A06 76FF0876 FFF876FF 526AF846 89000060 309A5016 .P.=`...F%jR.v%.v..v....R`.á.=.. 000120
 76FFF676 FF000060 0A9A60E8 68601768 006AF476 FFF676FF 02AEE900 03E90375 u.Õ..ÕÙ..v-.v¶j.h.`hÕ`..`...v-.v 000140
 0060979A 60946860 9168016A F476FFF6 76FF0000 60719AFF FF686068 68016AF4 ¶j.hk`h...q`...v-.v¶j.h.`h.`..`. 000160
 0060879A 5016F446 8DFA76FF 00899789 26008787 8926F656 88F44688 FC5EC400 .á^=.F¶.V-&....&.....v°.F¶.P.ñ`. 000180
 E90003E9 03750000 3D08C483 60CC0000 9A0676FF 0876FFF8 76FF526A F8468900 ..F%jR.v%.v..v....ä`.á.=..u.Õ..Õ 0001A0
 60F86801 6AF476FF F676FF00 0060849A FFFF6860 7E68006A F476FFF6 76FF0234 4..v-.v¶j.h-`h....`...v-.v¶j.h%` 0001C0
 4688FC5E C4000061 119A610E 6860E568 016AF476 FFF676FF 000060E8 9AFFFF68 h...Š`...v-.v¶j.h[`h.a..a..á^=.F 0001E0

Dump of file SATURN:[PCCOMMON.DUMP.DLL]DAD.TMP;1 on 18-APR-1990 10: 0:03.08
File ID (551,9,0)   End of file block 267 / Allocated 268

Virtual block number 99 (00000063), 512 (0200) bytes

 526AF846 89000061 319A5016 F4468DFA 76FF0080 97892600 88878926 F65688F4 ¶.V-&....&.....v°.F¶.P.1a...F%jR 000000
 FFF676FF 018AE900 03E90375 00003D08 C4836146 00009A06 76FF0876 FFF876FF .v%.v..v....Fa.á.=..u.Õ..Õa..v-. 000020
 61659AFF FF686172 68016AF4 76FFF676 FF000060 FE9A6162 68610868 006AF476 v¶j.h.ahba.þ`...v-.v¶j.hrah...ea 000040
 8926F656 88F44688 FC5EC400 00618B9A 61886861 5F68016A F476FFF6 76FF0000 ...v-.v¶j.h_ah.a..a..á^=.F¶.V-&. 000060
 0876FFF8 76FF526A F8468900 0061AB9A 5016F446 8DFA76FF 00919789 26008F87 ...&.....v°.F¶.P.¨a...F%jR.v%.v. 000080
 8568006A F476FFF6 76FF0140 E90003E9 03750000 3D08C483 58250000 9A0676FF .v....X[.á.=..u.Õ..Õa..v-.v¶j.h. 0000A0
 FFF676FF 00005AB9 9AFFFF68 FFFF6801 6AF476FF F676FF00 0061789A 58776861 ahwX.xa...v-.v¶j.h..h...¿Z...v-. 0000C0
 97892600 93878926 F65688F4 4688FC5E C400005A F29A5AEF 685A8368 016AF476 v¶j.h°ZhýZ..Z..á^=.F¶.V-&....&.. 0000E0
 00009A06 76FF0876 FFF876FF 526AF846 8900005B 109A5016 F4468DFA 76FF0095 ...v°.F¶.P..[...F%jR.v%.v..v.... 000100
 F29A6256 6861FF68 006AF476 FFF676FF 00C6E900 03E90375 00003D08 C483623A :b.á.=..u.Õ..Õ6..v-.v¶j.h.ahVb.· 000120
 5368016A F476FFF6 76FF0000 62599AFF FF686266 68016AF4 76FFF676 FF000061 a...v-.v¶j.hfbh...Yb...v-.v¶j.hS 000140
 8DFA76FF 00999789 26009787 8926F656 88F44688 FC5EC400 00627F9A 627C6862 bh|b..b..á^=.F¶.V-&....&.....v°. 000160
 3D08C483 5E600000 9A0676FF 0876FFF8 76FF526A F8468900 005E589A 5016F446 F¶.P.X^...F%jR.v%.v..v....m^.á.= 000180
 F676FF00 00626C9A 5E896862 7968006A F476FFF6 76FF004C E90003E9 03750000 ..u.Õ..ÕL..v-.v¶j.hybh.^.lb...v- 0001A0
 3A9A5E37 685E3468 016AF476 FFF676FF 00005E8C 9AFFFF68 5E996801 6AF476FF .v¶j.h.^h....^...v-.v¶j.h4^h7^.: 0001C0
 C40010E9 037400F8 7E830090 97892600 98878926 F65688F4 4688FC5E C400005E ^..á^=.F¶.V-&....&.....-%.t.Õ..é 0001E0
```

```
Dump of file SATURN:[PCCOMMON.DUMP.DLL]DAD.TMP;1 on 18-APR-1990 10:40:03.08
File ID (551,9,0)   End of file block 267 / Allocated 268

Virtual block number 100 (00000064), 512 (0200) bytes

 56570000 08C8CBC9 5F5E1F00 00E9F846 88025789 26078926 FE5688FC 46880A5E ^..F•.V±&..&.W..F½Ö...^_èùà...WV 000000
 26000088 0A5EC4FA 4689FC46 89000088 0000FE46 C70000F8 46C7088E 56A0881E .|.V.ÄúF½..úF±..|...F•.F•á^.|..& 000020
 E79A5016 FA468010 6A326AFE 76FFFE46 89078826 1FC42606 5EC40789 26024789 .G.&..á^.&á.&...F±.v±j2j..F•.P.Ö 000040
 03E90375 00003008 C483636A 00009A06 76FF0876 FFF876FF 4F6AF846 89000056 V...F½jO.v½.v..v....jc.á.=..u.Ö. 000060
 FA5EC404 57892602 47892608 56880646 88FA5EC4 000407C7 26FA5EC4 0001E900 .Ö1.á^•&ú...á^•.F..V.&.G.&.W.á^• 000080
 76FF526A F8468900 0063899A 5052000A 05FC5688 FA4688FE 76FF0000 0E47C726 &úG....v±.F•.V•...RP..c...F½jR.v 0000A0
 FA4688FE 76FF007B E90003E9 03750000 3008C483 639E0000 9A0676FF 0876FFF8 ½.v..v.....c.á.=..u.Ö..Ö(..v±.F• 0000C0
 61C00000 9A0676FF 0876FFF8 76FF526A F8468900 0058189A 50520006 05FC5688 .V•...RP..X...F½jR.v½.v..v....âa 0000E0
 C4078926 02478926 00008806 5FC426FA 5EC40047 E90003E9 03750000 30uo^483 .á.=..u.Ö..ÖG.á^•&á_.|..&.G.&..á 000100
 260A4789 26000088 065FC426 FA5EC404 47892606 47892600 0088065F C426.\5E ^•&á_.|..&.G.&.G.á^•&á_.|..&.G.& 000120
 5EC40010 E9037400 F87E830C 4789260E 47892600 0088065F C426FA5E C4084789 .G.á*•&á_.|..&.G.&.G..¬½.t.Ö..á^ 000140
 55AC0203 009190CB C95F5E1F 0000E9F8 46880257 89260789 26FC5688 FA46880A ..F•.V•&..&.W..F½Ö...^_èù.....¯U 000160
 62FF0203 01E50004 45450203 0C9A0000 35130203 08390009 31030203 05400008 ..a....1..9....5......ÉE..Í....b 000180
 61750005 04C70008 2CF10203 08AF0008 01EE0203 03CE0007 44130203 025E0005 ..^....D..ö...Ý...£...þ,..ú...ua 0001A0
 2C600203 08C10009 2E030203 05A80008 610C0005 06400009 40CD0203 1887000C ......eM..a...Éa..´.......ê...', 0001C0
 4A340203 07C40009 3E990203 00000003 63140002 09430009 537C0203 044A0008 ..J...|S.̈.C....c.......>..á...4J 0001E0

Dump of file SATURN:[PCCOMMON.DUMP.DLL]DAD.TMP;1 on 18-APR-1990 10:40:03.08
File ID (551,9,0)   End of file block 267 / Allocated 268

Virtual block number 101 (00000065), 512 (0200) bytes

 49870203 03590007 57800203 3080000B 5E110005 0A40000A 62250203 054F0008 ..O...%b..a....^..¯0..¯W..Y...ñI 000000
 36800002 2534000B 58540005 026C0005 56730203 00000005 53070002 05010008 ..I...aS......sV..I...T(..4X..¯6 000020
 24290203 00000007 172F0002 29BA000B 5C440005 04090008 2D1F0203 00000006 .......-..\...D\..n)../.......)$ 000040
 21880203 06060009 22EA0203 081C000C 5F800005 07040009 3F250203 03640007 ..d...X?..Å.............Õ"..•....! 000060
 4E410002 00000009 38180002 07580009 30370203 01020004 33490203 045F0008 .._...I3......7=..[....;.....AN 000080
 20840203 00890004 283F0203 2CC8000B 5CA90005 03E80008 444C0203 0000000A ......LD..Ò...`\..à,..?(.......· 0000A0
 61090002 08630009 28980203 1C4A000B 59830005 07E20009 3E060203 04EA0008 ..ô....>..ã...•Y..J....(..c...la 0000C0
 40010203 04720008 218C0203 0000000C 61EC0002 05E50009 034A0203 0000000B ......J...Í...ša.......¥I..r....a 0000E0
 55010203 3153000B 594E0005 0082000C 60070005 0902000B 5AC90005 076A0009 ..j...è2..•.....'..ÿ...NY..S1...U 000100
 61EF0005 0F34000C 606E0005 0CC4000E 35440203 06EC0009 20550203 03F40008 ..¶...U-..ś...D5..á...n'..4...ÿa 000120
 03E90203 0A66000A 61DF0203 037E0007 564F0203 26050008 58890005 1834000C ..4...¿(..f&..OV..~...Ôa..f...Ô. 000140
 53450203 0AE1000B 02850203 0000000E 4F740002 00970004 4ADA0203 05EF0009 ..ÿ...ÖJ.......tO..........Ã...ES 000160
 2DC00203 011C0004 4EF80203 09F40009 03880203 04FA0008 2FE00203 08F10009 ..þ...Å/..•...|...¶...«N......à- 000180
 28AD0203 04010008 63550203 00000010 62C20002 155E0008 58800005 08750009 ..u...¯X..^...öb......Uc......Ù+ 0001A0
 5F140005 2F62000B 50210005 4E02000A 06830005 2161000B 5A280005 07790009 ..y...+Z..a!.......N..!]..b/... 0001C0
 55E20203 01260004 50880203 00A50004 4FFC0203 04850008 2C190203 06C2000C ..ô....,......•O..Ē...¡P..&...âÜ 0001E0

Dump of file SATURN:[PCCOMMON.DUMP.DLL]DAD.TMP;1 on 18-APR-1990 10:40:03.08
File ID (551,9,0)   End of file block 267 / Allocated 268

Virtual block number 102 (00000066), 512 (0200) bytes

 62050203 0A030009 03810203 186A000B 5ADC0005 058A0008 48C80203 09000009 ......àH......ÉZ..j............b 000000
 30100203 040E0008 54C80203 06860009 4E030203 08050009 31D30203 0A78000A ..(...Æ1........N......àT.......0 000020
 2A230203 01300004 43CA0203 08870009 40720203 07870009 307A0203 050E0008 ......z=......ra......ðC..0...#* 000040
 028A0203 04940008 403A0203 07080009 22430203 03980007 52770203 00810004 ..Ý...wR......C"......:a......¤. 000060
 28320203 03200007 238F0203 1F57000C 62690005 090F0009 4C270203 0AFE0008 ..±...'L......ib..W...e#.. ...2+ 000080
 58CC0005 013C0004 4F800203 041C0008 3A000203 05980008 49000203 0A130009 .......I.......:........O..<...ä[ 0000A0
 58410005 28FD000B 5C310005 08150009 316F0203 00BD0004 1E000203 277C000B ..|'.......§...o1......1\..»(..A[ 0000C0
 02870005 15DF000C 60FB0005 10DE000C 60810005 051E0008 2F800203 247D000B ..)$..¯/........'..B...«'..Ö...ñ. 0000E0
 2C910203 1E01000B 5DAC0005 08990009 2E3C0203 06990009 22010203 00000007 ......"......<........¯].......,  000100
 01A80203 04290008 21140203 3308000B 5E240005 2E050008 5CBC0005 04A40008 ..É...¥\......$^...3...!..)....`. 000120
 40870203 00CA0004 4F3C0203 05AA0008 49380203 0C82000D 2F300203 0A920008 ......0/......8I..¯...<O..ð....M 000140
 46A80203 06A70009 249A0203 230E000B 50990005 08250009 30930203 06240009 ..$....0..%....]...#...$..Ï...´F 000160
 5AB60005 1793000B 58C30005 05320008 48600203 089A0008 021F0203 0A280009 ..(...........mH..2...ûX......ÑZ 000180
 308C0203 04390008 24620203 03C00007 548F0203 04870008 2CC10203 07940008 ......è,..ñ....T..à...b$..9...¥= 0001A0
 23040203 08A40008 02500203 07330009 22750203 06320009 561A0203 07810009 ..Ý....V..2...u"..3...P...É...Å# 0001C0
 5E9C0005 0510000B 62020005 05BD0008 49700203 06850009 228A0203 03450007 ..E...¤"..ç...pI..§....b.......^ 0001E0
```

Dump of file SATURN:[PCCOMMON.DUMP.DLL]DAD.TMP;1 on 18-APR-1990 1υ:'0:03.08
File ID (551,9,0)   End of file block 267 / Allocated 268

Virtual block number 103 (00000067), 512 (0200) bytes

```
016A006A D88EFFFF 881E5657 000006C8 00000000 00000000 00000000 037F000C ................à...WV.j...Äj.j. 000000
03866802 0036FF26 1988068E FFFF68FF FF680477 FF260677 FF261FC4 26065EC4 á^.&á.&.w.&.w.h..h......&.6..h.. 000020
0000FFFF 9A006.00 6A0015E9 0374FFFA 7E83FA46 890000FF FF9A0676 FF0876FF .v..v.......F¹.~¹.t.Õ..j.j...... 000040
5F5E1F00 00E90000 88013487 8926FA46 88065EC4 0011E9FC 4688FE56 89FC4689 .F=.V±.F=Õ..á^..F¹&..4.j..Õ...^_ 000060
00FFFF9A 1076FF12 76FF0180 E90E4688 D88E0008 881E5657 000004C8 0004CAC9 èò..à...WV.j...Ä.F.Õ¯..v..v..... 000080
0000FFFF 9AFC76FF FE76FF00 6A1076FF 1276FFFE 5689FC46 89085688 06468800 ..F..V..F=.V±.v..v.j..v±.v=..... 0000A0
681076FF 1276FF00 0000DE9A 50520004 05FE5688 FC468801 97681076 FF1276FF .v..v.h...F=.V±...RP.8....v..v.h 0000C0
006A0143 68019568 1076FF12 76FF0000 01299A50 52005005 FE5688FC 46880196 ...F=.V±.P.RP.)....v..v.h..hC.j. 0000E0
9A006A00 6A4B6A00 6A014368 01946810 76FF1276 FF000001 109A006A 006A486A jKj.j.......v..v.h..hC.j.jKj.j.. 000100
1276FF00 0001429A 5052009C 05FE5688 FC468801 95681076 FF1276FF 0000FFFF .....v..v.h...F=.V±...RP.8....v. 000120
8800FAE9 0000BA00 00880000 FFFF9A50 5200E805 FE5688FC 46880194 681076FF .v.h...F=.V±.Ò.RP.....j..¤..Õ¹.. 000140
01C79A00 6A1076FF 1276FF00 A8E90000 01879A01 6A1076FF 1276FF00 90E90A46 F.Õ...v..v.j..ñ...Õ´..v..v.j..ú. 000160
AA9A5052 009C05FE 5688FC46 88486A01 95681076 FF1276FF FE5689FC 46890000 ...F=.V±.v..v.h..jK.F=.V±...RP.` 000180
76FF0000 FFFF9A50 5200E805 FE5688FC 46884B6A 01946810 76FF1276 FF000001 ....v..v.h..jK.F=.V±.Ò.RP......v 0001A0
5689FC46 890000FF FF9A006A 1076FF12 76FF004F E90000FF FF9A006A 1076FF12 ..v.j......ÕO..v..v.j.......F=.V 0001C0
E9001EE9 0021E90A C483FFFF 01259A37 FF260277 FF26FC5E C40A6A00 6A006AFE ±j.j.j.á^=&.w.&.7.%....á.Õ!.Õ..Õ 0001E0
```

Dump of file SATURN:[PCCOMMON.DUMP.DLL]DAD.TMP;1 on 18-APR-1990 10:40:03.08
File ID (551,9,0)   End of file block 267 / Allocated 268

Virtual block number 104 (00000068), 512 (0200) bytes

```
000088FF 0FE9FF48 E9037501 9330FFBC E9037501 9230FF68 E9037501 91300018 ..=..u.Õk.=..u.Õ¥.=..u.ÕK.ÕÕ.j.. 000000
0000FFFF 9A0676FF 0876FF0A 76FF0C76 FF0E76FF 1076FF12 76FF0033 E900008A ¤..Õ3..v..v..v..v..v..v..v...... 000020
0E0ECAC9 5F5E1FFF CDE9FE40 E9037500 3830FF11 E9037500 20300013 E90016E9 Õ..Õ..= .u.Õ..=;.u.Õä±Õe..^_èò.. 000040
00000301 E4000200 7F000100 F7010300 7E000101 5E010300 7D000100 37010300 ...7...)...^...~...%.......Õ.... 000060
1E000100 AC010300 00000600 1F000200 87000101 8F010300 86000100 C5010300 ...é.........................¯.... 000080
83000102 2C010300 22000300 80020300 74000600 22000500 1F000101 6E010300 ...n.......".. .t.......".....,...° 0000A0
00000000 00000000 00000000 00000000 F3000100 4C010300 00001000 7C000200 ...|.......L...µ................ 0000C0
E2468900 0088E846 89EA4689 00008800 00DE46C7 D88EFFFF 881E5657 000022C8 à"..WV.j...ÄúF8..j...Fõ.FÕj...Fã 0000E0
6AF84689 FA468900 00880000 FE46C7E4 4689E646 89000088 0000FC46 C7E04689 .FÄúF=..j...F|.FõúF±..j...F¹.F%j 000100
E8468D0A 76FF0C76 FF000002 899A5052 00000282 9A006A03 6A016A00 6A016A00 .j.j.j.j.j......RP......v..v..FÕ 000120
0002F446 C70003F2 46C70004 F046C700 05EE46C7 0001EC46 C70000FF FF9A5016 .P.....úF&..úF¥..úFÞ..úF·..úF¶.. 000140
EA76FFDE 76FF526A DE468900 0002589A 5016EC46 800A76FF 0C76FF00 06F646C7 úF-...v..v..F&.P.[....F8jR.v8.võ 000160
5016E046 8DFF6AFF 6A0676FF 0876FF0A 76FF0C76 FF08C483 00060000 9AE876FF .vÒ...ø..á..v..v..v..v.j.j..FÄ.P 000180
76FFE276 FF08C483 01030000 9AE876FF EA76FFDE 76FF526A DE468900 00FFFF9A ......F8jR.v8.võ.vÒ......á..vä.v 0001A0
E876FFEA 76FFDE76 FF526ADE 46890000 010A9A50 16E4468D 5016FC46 80016AE0 Åj..F=.P.Fõ.P.O....F8jR.v8.võ.vÒ 0001C0
E676FF50 16FE468D 5016F846 8D00E4E9 0375E646 08E44688 08C48301 EF00009A ...ÿ..á..Fõ.F|u.Õõ..F%.P.F±.P.v| 0001E0
```

Dump of file SATURN:[PCCOMMON.DUMP.DLL]DAD.TMP;1 on 18-APR-1990 10:40:03.08
File ID (551,9,0)   End of file block 267 / Allocated 268

Virtual block number 105 (00000069), 512 (0200) bytes

```
E9FE4688 FFCCE900 03E90375 0000300E 46890EC4 83FFFF02 709AFC76 FFE476FF .võ.v=.p....á..F8=..u.Õ..Õä..F±Õ 000000
FFF876FF FA76FF00 6EE908C4 83016806 539A0A76 FF0C76FF F876FFFA 76FF0062 b..v¹.v%.v..v..S.h..á.Õn..v¹.v%. 000020
9605859A 0A76FF0C 76FFF876 FFFA76FF 0057E908 C483017F 04089A0A 76FF0C76 v..v.......á.ÕW..v¹.v%.v..v..... 000040
26E90029 E908C483 022C029A 9A0A76FF 0C76FFF8 76FFFA76 FF0040E9 08C48301 ..á.Õä..v¹.v%.v..v....,..á.Õ).Õ& 000060
75000530 FFB4E903 75000330 FFA5E903 75000230 FFD8E903 75000130 0023E900 .Õ#.=..u.ÕÜ.=..u.ÕE.=..u.ÕÇ.=..u 000080
46890000 FFFF9A50 16E4468D 5016FC46 8D006AE0 76FFE276 FFFFD7E9 FF7EE903 .Õ-.Õä..vã.vÅj..F=.P.Fõ.P......F 0000A0
FFFF9AE0 76FFE27 FFFF11E9 08C48302 1300009A E876FFEA 76FFDE76 FF526ADE 8jR.v8.võ.vÒ......á.Õ...vã.vÅ... 0000C0
261277FF 26E85EC4 08C48302 7000009A E876FFEA 76FFDE76 FF526ADE 46890000 ...F8jR.v8.võ.vÒ...p..á.á^Õ&.w.& 0000E0
0003F046 C70002EE 46C70006 EC46C708 C483FFFF 07FD9A0A 76FF0C76 FF1077FF .w..v..v..».....á.úF&..úF¥..úFÞ.. 000100
890000FF FF9A5016 EC468D0A 76FF0C76 FF0001F6 46C70005 F446C700 04F246C7 úF·..úF¶..úF-...v..v..F&.P...... 000120
6A016A01 6A006A01 6A006A08 C483FFFF 00009AE8 76FFEA76 FFDE76FF 526ADE46 F8jR.v8.võ.vÒ......á.j.j.j.j.j.j 000140
56570000 14C80008 CAC95F5E 1F0000E9 00008800 00FFFF9A 50520000 FFFF9A00 ......RP.....j..Õ...^_èò..à...WV 000160
75000E7F 83260A5E C4EE5689 EC468916 57882614 4788260A 5EC4D88E 0008881E .j...Äá^.&.G.&.W..F&.VŸá^.&.....u 000180
6A026AEC 76FFEE76 FF0676FF 0876FF00 0002EF9A 026A0676 FF0876FF 0032E903 .Õ2..v..v.j..ÿ....v..v..vŸ.v&j.j 0001A0
02578826 078826EC 5EC40107 E90000FF FF9A016A 0676FF08 76FF0000 03589A01 ..[....v..v.j......Õ..á^&&..&.W. 0001C0
F4468900 DA83000A 20065788 26044788 26EC5EC4 F25689F0 46890002 83000A05 ....ø..FÞ.V·á^&&.G.&.W.-....Õ..F¶ 0001E0
```

```
Dump of file SATURN:[PCCOMMON.DUMP.DLL]DAD.TMP;1 on 18-APR-1990 10:40:03.08
File ID (551,9,0)   End of file block 267 / Allocated 268

Virtual block number 106 (0000006A), 512 (0200) bytes

478826EC 5EC4FA56 89F84689 00028300 0A050A57 88260847 8826EC5E C4F65689 .V-6^$&.G.&.W.....@..F%.V*6^$&.G 000000
C4000003 BF9A006A 0C6A5016 F0468006 76FF0876 FFFE5689 FC468906 57882604 .&.W..F=.V±.v..v..FÞ.Pj.j..¢...6 000020
5689F446 89065788 26044788 26EC5EC4 F25689F0 46890A57 88260847 8826EC5E ^$&.G.&.W..FÞ.V 6^$&.G.&.W..F¶.V 000040
260C4788 26EC5EC4 FA5689F8 46890002 83000A05 0A578826 08478826 EC5EC4F6 -6^$&.G.&.W.....@..F%.V*6^$&.G.& 000060
E19A006A 0C6A5016 F0468006 76FF0876 FFFE5689 FC468900 DA83000A 2D0E5788 .W.-...D..F=.V±.v..v..FÞ.Pj.j..Ā 000080
126A086A EC76FFEE 76FF0676 FF0876FF 0018E903 7500307F 83260A5E C4000003 ...6^.&..0.u.Õ...v..v..vŸ.v$j.j. 0000A0
00008800 00FFFF9A 096A006A EC76FFEE 76FF0676 FF0876FF 0015E900 0003F99A .*...Õ...v..v..vŸ.v$j.j......i.. 0000C0
89105788 26184788 260A5EC4 D88E02A2 881E5657 000004C8 CBC95F5E 1F0000E9 Õ...^_èùà...WV.|Á..Á6^.&.G.&.W.. 0000E0
FF000004 509A026A 0676FF08 76FF0032 E9037500 127F8326 0A5EC4FE 5689FC46 F=.V±Ā^.&....u.Õ2..v..v.j..].... 000100
00049F9A 016A0676 FF0876FF 0000048F 9A016A03 6AFC76FF FE76FF06 76FF0876 v..v..v±.v•j.j.......v..v.j..... 000120
76FF0018 E9037500 187F8326 0A5EC400 86E90375 00277F83 260A5EC4 0116E900 .Õ..6^.&..'.u.Õ..6^.&....u.Õ...v 000140
C19A036A 0676FF08 76FF002F E9000004 B49A006A 0A6AFC76 FFFE76FF 0676FF08 ..v..v±.v•j.j..Ç...Õ/..v..v.j..é 000160
016A0676 FF0876FF 00000406 9A006A0A 6AFC76FF FE76FF06 76FF0876 FF000004 ....v..v..v±.v•j.j..#....v..v.j. 000180
0676FF08 76FF0000 05159A06 6A086AFC 76FFFE76 FF0676FF 0876FF00 0005259A .%....v..v..v±.v•j.j.......v..v. 0001A0
7500187F 83260A5E C40083E9 00000576 9A036A00 6A1F77FF 262177FF 260A5EC4 6^.&.wl&.w.j.j..v...Õ..6^.&....u 0001C0
FF0876FF 0044E900 00053A9A 006A0A6A FC76FFFE 76FF0676 FF0876FF 0018E903 .Õ...v..v..v±.v•j.j..:...ÕD..v.. 0001E0
```

```
Dump of file SATURN:[PCCOMMON.DUMP.DLL]DAD.TMP;1 on 18-APR-1990 10:40:03.08
File ID (551,9,0)   End of file block 267 / Allocated 268

Virtual block number 107 (0000006B), 512 (0200) bytes

76FF0000 055C9A00 6A0A6AFC 76FFFE76 FF0676FF 0876FF00 0005479A 036A0676 v.j..G....v..v..v±.v•j.j..\....v 000000
0000FFFF 9A036A00 6AFC76FF FE76FF06 76FF0876 FF000002 CD9A016A 0676FF08 ..v.j..è....v..v..v±.v•j.j...... 000020
0000E900 00B80000 FFFF9A03 6A006A1F 77FF2621 77FF260A 5EC40676 FF0876FF .v..v.6^.&.wl&.w.j.j......i..Õ.. 000040
89FC4689 22578826 20478826 0A5EC4D8 8E041088 1E565700 0004C8CB C95F5E1F .^_èùà...WV.|...Á6^.&.G &.W".F=. 000060
261E77FF 260A5EC4 0676FF08 76FF001D E903751E 4708261C 4788260A 5EC4FE56 V±Ā^.&.G.&.G.u.Õ...v..v.6^.&.w.& 000080
FF0876FF 0032E903 7500127F 83260A5E C40079E9 0000FFFF 9A036A00 6A1C77FF .w.j.j......Õy.6^.&....u.Õ2..v.. 0000A0
76FF0000 062C9A01 6A026AFC 76FFFE76 FF0676FF 0876FF00 0004389A 026A0676 v.j..;....v..v..v±.v•j.j........v 0000C0
76FF0876 FF0018E9 03750024 7F83260A 5EC4003A E9000005 E59A016A 0676FF08 ..v.j..|...Õ:.6^.&..$.u.Õ...v..v 0000E0
6AFC76FF FE76FF06 76FF0876 FF0015E9 00000644 9A066A08 6AFC76FF FE76FF06 ..v±.v•j.j..D...Õ...v..v..v±.v•j 000100
C4088E05 80881E56 57000000 C8CBC95F 5E1F0000 E90000B8 0000FFFF 9A036A00 .j......i..Õ...^_èùà...WV.i...Áá 000120
6A0B6A2C 77FF262E 77FF260A 5EC40676 FF0876FF 001AE903 7500467F 83260A5E ^.&..F.u.Õ...v..v̄.6^.&.w.&.w,j.j 000140
000006C3 9A026A06 76FF0876 FF0037E9 03750016 7F83260A 5EC40000 06869A00 ..Ñ...6^.&....u.Õ7..v..v.j..ü... 000160
0676FF08 76FF0000 07EE9A01 6A066A2C 77FF262E 77FF260A 5EC40676 FF0876FF .v..v.6^.&.w.&.w,j.j..Ÿ....v..v. 000180
5FC4260A 5EC40059 E9037514 47082612 4788260A 5EC40128 E9000006 079A016A j......Õ(.6^.&.G.&.G.u.ÕY.6^.&á_ 0001A0
0A77FF26 0C77FF26 0A5EC406 76FF0876 FF0044E9 03750010 7F83260C 5FC42602 .&á .&....u.ÕD..v..v.6^.&.w.&.w̄ 0001C0
0A5EC43C 77FF260A 5EC42C77 FF262E77 FF260A5E C42477FF 262677FF 260A5EC4 6^.Ī.w&&.w$6^.&.w.&.w,6^.&.w<6^. 0001E0
```

```
Dump of file SATURN:[PCCOMMON.DUMP.DLL]DAD.TMP;1 on 18-APR-1990 10:40:03.08
File ID (551,9,0)   End of file block 267 / Allocated 268

Virtual block number 108 (0000006C), 512 (0200) bytes

03751047 08260E47 88260A5E C4008FE9 00000780 9A4077FF 260A5EC4 3E77FF26 &.w>6^.&.wə.....Õ¢.6^.&.G.&.G.u. 000000
C42477FF 262677FF 260A5EC4 0A77FF26 0C77FF26 0A5EC406 76FF0876 FF0044E9 ÕD..v..v.6^.&.w.&.w.6^.&.w&&.w$á 000020
9A4077FF 260A5EC4 3E77FF26 0A5EC43C 77FF260A 5EC42C77 FF262E77 FF260A5E ^.&.w.&.w,6^.&.w<6^.&.w>6^.&.wə. 000040
0A5EC406 76FF0876 FF005BE9 03741447 08261247 88260A5E C40068E9 000007D4 &...Õk.6^.&.G.&.G.t.Õ[..v..v.6^. 000060
5EC42C77 FF262E77 FF260A5E C42477FF 262677FF 260A5EC4 0A77FF26 0C77FF26 &.w.&.w.6^.&.w&&.w$6^.&.w.&.w,6^ 000080
5EC40676 FF0876FF 0000FFFF 9A4077FF 260A5EC4 3E77FF26 0A5EC43C 77FF260A .&.w<6^.&.w>6^.&.wə......v..v.6^ 0000A0
0000C8CB C95F5E1F 0000E900 00B80000 02E29A06 6A066A2C 77FF262E 77FF260A .&.w.&.w,j.j..ā...|..Õ...^_èùà.. 0000C0
5EC40041 E9037400 497F8326 0C5FC426 025FC426 0A5EC4D8 8E0658B8 1E565700 .WV.|[..Áá^.&á_.&á_.&..I.t.ÕA.6^ 0000E0
5EC40676 FF0876FF 0000085B 9A026A06 76FF0876 FF0034E9 0375000E 7F83260A .&....u.Õ4..v..v.j..[....v..v.6^ 000100
88000006 9C9A016A 0676FF08 76FF0000 06829A01 6A036A06 77FF2608 77FF260A .&.w.&.w.j.j........v..v.j......| 000120
A19A026A 0676FF08 76FF088E 0805881E 56570000 00C8CBC9 5F5E1F00 00E90000 ..Õ...^_èùà...WV.|...Ä.v..v.j..Ā 000140
016A0676 FF0876FF 0000084E 9A016A03 6A0A76FF 0C76FF06 76FF0876 FF000008 ....v..v..v..v.j.j..N....v..v.j. 000160
00EE46C7 D88E0872 881E5657 000012C8 CBC95F5E 1F0000E9 00008800 0008349A .4...|..Õ...^_èùà...WV.|r..ÄùFŸ. 000180
16F04680 1877FF26 1A77FF26 0A5EC400 4EE90375 1A470826 18478826 0A5EC400 .6^.&.G.&.G.u.ÕN.6^.&.w.&.w..FÞ. 0001A0
C48300A6 00009A02 77FF2604 77FF260A 5EC4EE76 FF526AEE 46890000 FFFF9A50 P......FŸjR.vŸ6^.&.w.&.w....Ī..á 0001C0
B80000FF FF9A5016 F0468006 76FF0876 FF0016E9 EE468800 06E90375 00003D08 .=..u.Õ...FŸÕ...v..v..FÞ.P.....| 0001E0
```

```
Dump of file SATURN:[PCCOMMON.DUMP.DLL]DAD.TMP;1 on 18-APR-1990 10:40:03.08
File ID (551,9,0)   End of file block 267 / Allocated 268

Virtual block number 109 (00000060), 512 (0200) bytes

 8B260A5E C40000EE 46C7D88E 088B881E 56570000 12C8C8C9 5F5E1F00 00E90000 ..Ô...^_èùà...WV.¡¡..ÄúFŸ..á^.&. 000000
 0000FFFF 9A5016F0 468D1F77 FF262177 FF260A5E C4004EE9 03752147 08261F47 G.&.G!u.ÕN.á^.&.w!&.w..FÞ.P..... 000020
 03750000 3Du8C483 08FC0000 9A0277FF 260477FF 260A5EC4 EE76FF52 6AEE4689 .FŸjR.vŸá^.&.w.&.w....=..á.=..u. 000040
 1F0000E9 00008800 00091B9A 5016F046 8D0676FF 0876FF00 16E9EE46 8B0006E9 Ô...FŸÔ...v..v..FÞ.P.....¦..Ô... 000060
 22470B26 20478B26 0A5EC400 00EE46C7 D88E0932 881E5657 000012C8 CBC95F5E ^_èùà...WV.¡2..ÄúFŸ..á^.&.G &.G" 000080
 6AEE4689 0000FFFF 9A5016F0 468D036A 2077FF26 2277FF26 0A5EC400 53E90375 u.ÕS.á^.&.w"&.w j..FÞ.P......FŸj 0000A0
 8B0006E9 03750000 3D08C483 0A550000 9A0277FF 260477FF 260A5EC4 EE76FF52 R.vŸá^.&.w.&.w....U..á.=..u.Ô... 0000C0
 261C4788 260:5EC4 0060E900 000A749A 5016F046 8D0676FF 0876FF00 79E9EE46 FŸÔy..v..v..FÞ.P.t...Ô'.á^.&.G.& 0000E0
 890000FF FF9A.016 F0468D03 6A1C77FF 261E77FF 260A5EC4 0050E903 751E4708 .G.u.ÕP.á^.&.w.&.w.j..FÞ.P...... 000100
 E9037500 003008C4 83097600 009A0277 FF260477 FF260A5E C4EE76FF 526AEE46 FŸjR.vŸá^.&.w.&.w....v..á.=..u.Ô 000120
 5E1F0000 E9000088 00000995 9A5016F0 468D0676 FF0876FF 0016E9EE 46880006 ...FŸÔ...v..v..FÞ.P.....¦..Ô...^ 000140
 751E4708 261C4788 260A5EC4 0000EE46 C7D88E09 ACB81E56 57000012 C8C8C95F _èùà...WV.¡^..ÄúFŸ..á^.&.G.&.G.u 000160
 76FF526A EE468900 0008E29A 5016F046 8D1C77FF 261E77FF 260A5EC4 0057E903 .ÕW.á^.&.w.&.w..FÞ.P.ã....FŸjR.v 000180
 E9EE4688 0006E903 75000030 08C48308 3600009A 0277FF26 0477FF26 0A5EC4EE Ÿá^.&.w.&.w....6..á.=..u.Ô...FŸÔ 0001A0
 8B260A5E C40064E9 0000085B 9A2C77FF 262E77FF 260A5EC4 0676FF08 76FF0083 ...v..v.á^.&.w.&.w,.[...Ôd.á^.&. 0001C0
 0000FFFF 9A5016F0 468D2077 FF262277 FF260A5E C40054E9 03752247 08262047 G &.G"u.ÕT.á^.&.w"&.w .FÞ.P..... 0001E0

Dump of file SATURN:[PCCOMMON.DUMP.DLL]DAD.TMP;1 on 18-APR-1990 10:40:03.08
File ID (551,9,0)   End of file block 267 / Allocated 268

Virtual block number 110 (0000006E), 512 (0200) bytes

 03750000 3D08C483 09F20000 9A0277FF 260477FF 260A5EC4 EE76FF52 6AEE4689 .FŸjR.vŸá^.&.w.&.w.......á.=..u. 000000
 8800000A 119A::77 FF262E77 FF260A5E C40676FF 0876FF00 1CE9EE46 880006E9 Ô...FŸÔ...v..v.á^.&.w.&.w,.....¡ 000020
 76FF0C76 FF0000FE 46C7D88E 0A8BB81E 56570000 02C8C8C9 5F5E1F00 00E90000 ..Ô...^_èùà...WV.¡...AúF±...v..v 000040
 77FF260A 5EC40.77 FF260877 FF260A5E C408C483 0BA807F0 9A0676FF 0876FF0A ..v..v..». ..á.á^.&.w.&.w.á^.&.w 000060
 5EC40079 E9FE4688 0006E903 75000030 FE468908 C4830C2C 0C3C9A02 77FF2604 .&.w..<.,..á..F±=..u.Ô...F±Ôy.á^ 000080
 06470B26 04478B26 065FC426 0A5EC400 3CE90374 02470B26 07882606 5FC4260A .&á_.&..&.G.t.Ô<.á^.&á_.&.G.&.G. 0000A0
 065FC426 0A5EC400 14E90374 0A470B26 08478B26 065FC426 0A5EC400 28E90374 t.Õ(.á^.&á_.&.G.&.G.t.Ô..á^.&á_. 0000C0
 0C76FF0E 4789260A 5EC40000 880003E9 00018800 06E90375 0E470B26 0C478B26 &.G.&.G.u.Ô..¦..Ô..¦..á^.&.G..v. 0000E0
 00002CC8 C8C95F5E 1F0000E9 00008808 C4830151 07FD9A06 76FF0876 FF0A76FF .v..v..v..».Q..á.¦..Ô...^_èùà,.. 000100
 5689EC46 8900008A 0000880A 5EC40000 0646C700 7BD446C7 D88E0872 881E5657 WV.¡r..ÄúFâx.úF»..á^.¦..¤...F&.V 000120
 C4065789 26044789 26E65689 E4468900 008A0000 880A5EC4 02578926 078926EE Ÿ&..&.W.á^.¦..¤...Fô.V¦&.G.&.W.á 000140
 8900008A 0000880A 5EC40A57 89260847 8926FE56 89FC4689 00008A00 00880A5E ^.¦..¤...F».V±&.G.&.W.á^.¦..¤... 000160
 77FF2616 77FF2606 5EC4E846 89EA4689 0000880E 5789260C 478926FA 5689F846 F%.V"&.G.&.W.¦...Fô.FÔá^.&.w.&.w 000180
 03740000 3D0000FF FF9A5016 D8468014 77FF2616 77FF2606 5EC40000 FFFF9A14 ......á^.&.w.&.w..FÅ.P.....=..t. 0001A0
 26145FC4 26085EC4 00EA5683 01E84683 016EE903 7500307F 8326085E C4017EE9 Ô~.á^A&..0.u.Ôn..FÒ..Vô.á^A&á_.& 0001C0
 57882604 47882614 5FC42608 5EC4E256 89E04689 D6561804 46280257 88260788 ..&.W.+Fâ.V».FÅ.Vâá^A&á_.&.G.Ï.W 0001E0

Dump of file SATURN:[PCCOMMON.DUMP.DLL]DAD.TMP;1 on 18-APR-1990 10:40:03.08
File ID (551,9,0)   End of file block 267 / Allocated 268

Virtual block number 111 (0000006F), 512 (0200) bytes

 13044603 0A578B26 08478B26 145FC426 D85EC4DE 56890C46 8906561B D4462B06 .+Fâ.V».FÉ.Vâá^A&á_.&.G.&.W..Fâ. 000000
 F0468906 56130446 030E5788 260C4788 26145FC4 26085EC4 F65689F4 46890656 V».F¶.V-á^A&á_.&.G.&.W..Fâ.V».FÞ 000020
 74FE4608 FC468800 49E90374 E6460BE4 46880054 E90374EE 4608EC46 88F25689 .V·.F&.FŸt.ÕT..Fô.F¦t.Ô¦..F=.F±t 000040
 5688DC46 88EE5689 EC4689E2 5688E046 880033E9 0374FA46 08F84688 003EE903 .Ô>..F%.F"t.Õ3..FÅ.Vâ.F&.VŸ.FÉ.V 000060
 E9FA5689 F84689F2 5688F046 88FE5689 FC4689F6 5688F446 88E65689 E44689DE ê.Fô.V¦.F¶.V-.F=.V±.FÞ.V·.F%.V"Ô 000080
 E0468800 0CE90377 EC463900 08E9037E 0019E903 7DEE5639 E25688E0 4688009C ...FÅ.Vâ9VŸ).Ô..-.Ô..9F&w.Ô...FÅ 0000A0
 77E44639 0008E903 7E0019E9 037DE656 39DE5688 0C4688EE 5689EC46 89E25688 .Vâ.F&.VŸ.FÉ.Vê9V¦).Ô..-.Ô..9FÔw 0000C0
 037D0019 E9037EFE 5639F656 88F44688 E65689E4 46890E56 880C4688 000CE903 .Ô...FÉ.Vê.Fô.V¦.F¶.V-9V±~.Ô..). 0000E0
 FA5639F2 5688F046 88FE5689 FC4689F6 5688F446 88000CE9 0372FC46 390008E9 Ô..9F»r.Ô...F¶.V-.F=.V±.FÞ.V·9V" 000100
 65E9FA56 89F84689 F25688F0 4688000C E90372F8 46390008 E9037D00 19E9037E -.Ô..).Ô..9F%r.Ô...FÞ.V·.F%.V"Ôe 000120
 5688EC46 880A5EC4 0043E903 7701E87E 830009E9 037E0051 E9037DGu "A7E83FE ±.~ô.).ÔQ.~.Ô...-Ô.w.ÔC.á^..F&.V 000140
 88FC4688 0A5EC406 57892604 478926E6 5688E446 880A5EC4 02578926 '78926EE Ÿ&..&.W.á^..Fô.V¦&.G.&.W.á^..F». 000160
 00E90000 880E5789 260C4789 26FA5688 F84688 0A 5EC40A57 89260847 8'.26FE56 V±&.G.&.W.á^..F%.V"&.G.&.W.¦..Ô. 000180
 06C30009 095C0203 09B90009 01FE0203 0828000B 04500203 001AC8C9 5F5E1F00 ..^_èù....P...(...±...¿...\...ú. 0001A0
 00000007 088A0002 084F0009 09D80203 0836000B 05C80203 00000003 0ACF0002 ..ü.......à...ó...Å...Ö......... 0001C0
 065E0009 0A850203 00000009 01290002 0846000B 05FA0203 0AC4000B 0AF40203 ..¶...á...'...F...).......ç...^. 0001E0
```

```
Dump of file SATURN:[PCCOMMON.DUMP.DLL]DAD.TMP;1 on 18-APR-1990 10:40:03.08
File ID (551,9,0)   End of file block 267 / Allocated 268

Virtual block number 112 (00000070), 512 (0200) bytes

00000010 0C440002 08640008 072C0203 096D0009 00910203 08530008 04F00203 ..Þ...S.......m...,...d...D..... 000000
00580001 004C01J3 08890008 00630203 09910009 00C10203 03200007 0CC20203 ..ô... ...è.......c.......L...[. 000020
08AA0009 0A380203 089A0008 087F0203 09A80009 00EE0203 005C0001 00530103 ..S...\...Ÿ...`...........;...¯. 000040
00000000 00000000 03450007 0CD70203 092F0009 081C0203 08100008 08940203 ............../...■...E......... 000060
5EC40045 E9037500 307F8326 0A5EC400 00FE46C7 D88EFFFF 881E5657 000002C8 à...WV.¡...ÄúF±..ó^.&..0.u.ÕE.ó^ 000080
261C5FC4 260A5EC4 02578826 0788260E 5EC40032 E903751E 4708261C 4788260A .&.G.&.G.u.Õ2.ó^.&..&.W.ó^.&ó_.& 0000A0
06578926 04478926 1C5FC426 0A5EC406 57882604 4788260E 5EC40257 89260789 ..&.W.ó^.&.G.&.W.ó^.&ó_.&.G.&¯W. 0000C0
FE46890C C483FFFF 030A9A06 76FF0876 FF0A76FF 0C76FF0E 76FF1076 FF001DE9 Õ...v..v..v..v..v..v¯......ó..F± 0000E0
260A5EC4 0000FE46 C7D88E00 08881E56 57000002 C8C8C95F 5E1F0000 E9FE4688 .F±Õ...^_èùà...WV.¡...ÄúF±..ó^.& 000100
FE468908 C4830078 04289A06 76FF0876 FF0A76FF 0C76FF00 17E90374 00277F83 ..'.t.Õ.¯.v..v..v..v..(.x..ó..F± 000120
260A5EC4 0000FE46 C7D88E00 93881E56 57000002 C8C8C95F 5E1F0000 E9FE4688 .F±Õ...^_èùà...WV.¡...ÄúF±..ó^.& 000140
FE468908 C4830088 04E09A06 76FF0876 FF0A76FF 0C76FF00 17E90374 00247F83 ..$.t.Õ.¯.v..v..v..v..Å.¡..ó..F± 000160
260A5EC4 0000FE46 C7D88E00 D3881E56 57000002 C8C8C95F 5E1F0000 E9FE4688 .F±Õ...^_èùà...WV.¡Æ..ÄúF±..ó^.& 000180
26078826 0E5EC400 32E90375 3A470826 38478826 0A5EC400 45E90375 00467F83 ..F.u.ÕE¯.ó^.&.G8&.G:u.Õ2.ó^.&..& 0001A0
260A5EC4 06578826 04478826 0E5EC402 57892607 8926385F C4260A5E C4025788 .W.ó^.&ó_8&..&.W.ó^.&.G.&.W.ó^.& 0001C0
0676FF08 76FF0A76 FF0C76FF 0E76FF10 76FF001D E9065789 26044789 26385FC4 ó_8&.G.&¯W.Õ...v..v..v..v..v..v. 0001E0

Dump of file SATURN:[PCCOMMON.DUMP.DLL]DAD.TMP;1 on 18-APR-1990 10:40:03.08
File ID (551,9,0)   End of file block 267 / Allocated 268

Virtual block number 113 (00000071), 512 (0200) bytes

0113881E 56570000 02C8C8C9 5F5E1F00 00E9FE46 88FE4689 0CC48300 F805989A ...%..ó..F±.F±Õ...^_èùà...WV.¡.. 000000
0676FF08 76FF0A76 FF0C76FF 001AE903 7500307F 83260A5E C40000FE 46C7D88E .ÄúF±..ó^.&..0.u.Õ.¯.v..v..v..v. 000020
0676FF08 76FF0A76 FF0C76FF 0E76FF10 76FF001D E9FE4689 08C48301 E306A89A .¨.D..ó..F±Õ...v..v..v..v..v..v. 000040
019E881E 56570000 02C8C8C9 5F5E1F00 00E9FE46 88FE4689 0CC48301 83^30A9A ......ó..F±.F±Õ...^_èùà...WV.¡.. 000060
0676FF08 76FF0A76 FF0C76FF 001AE903 7500277F 83260A5E C40000FE 46C7D88E .ÄúF±..ó^.&..'.u.Õ.¯.v..v..v..v. 000080
8301C304 289A0676 FF0876FF 0A76FF0C 76FF0017 E9FE4689 08C48302 3D078.9A ...=..ó..F±Õ...v..v..v..v..(.ü.. 0000A0
00FE46C7 D88E01FE 881E5657 000002C8 C8C95F5E 1F0000E9 FE4688FE 468908C4 ó..F±.F±Õ...^_èùà...WV.¡±..ÄúF±. 0000C0
83029708 3C9A0676 FF0876FF 0A76FF0C 76FF001A E9037500 247F8326 0A5EC400 .ó^.&..$.u.Õ.¯.v..v..v..v..<.... 0000E0
88FE4689 08C48302 2304E09A 0676FF08 76FF0A76 FF0C76FF 0017E9FE 468908C4 ó..F±Õ...v..v..v..v..Å.#..ó..F±. 000100
83260A5E C40000FE 46C7D88E 0258881E 56570000 02C8C8C9 5F5E1F00 00E9FE46 F±Õ...^_èùà...WV.¡X..ÄúF±..ó^.&. 000120
E9FE4689 08C48302 F708F49A 0676FF08 76FF0A76 FF0C76FF 001AE903 7500467F .F.u.Õ.¯.v..v..v..v..¶.%..ó..F±Õ 000140
88FE4689 0CC48302 7D05989A 0676FF08 76FF0A76 FF0C76FF 0E76FF10 76FF001D ...v..v..v..v..v..v....)..ó..F±. 000160
46890000 880000FA 46C7D88E 0282881E 56570000 06C8C8C9 5F5E1F00 00E9FE46 F±Õ...^_èùà...WV.¡ý..ÄúF•..¡...F 000180
44E90374 00047F83 26065EC4 FE5689FC 46890257 88260788 26065EC4 FC4689FE ±.F=ó^.Ï..&.W..F=.V±ó^.&....t.ÕD 0001A0
00FFFF9A 016A0677 FF260877 FF260A5E C42877FF 262077FF 261FC426 FC5EC400 .ó^=&ó.&.w-&.w+ó^.&.w.&.w.j..... 0001C0
880006E9 03750000 3008C483 FFFF0000 9AFC76FF FE76FFFA 76FF506A FA468900 ..F•jP.v•.v±.v=......ó.=..u.Õ... 0001E0

Dump of file SATURN:[PCCOMMON.DUMP.DLL]DAD.TMP;1 on 18-APR-1990 10:40:03.08
File ID (551,9,0)   End of file block 267 / Allocated 268

Virtual block number 114 (00000072), 512 (0200) bytes

C4025788 26078826 0E5EC400 32E90375 1E470826 1C478826 0A5EC400 9EE9FA46 F•Õ..ó^.&.G.&.G.u.Õ2.ó^.&..&.W.ó 000000
261C5FC4 260A5EC4 06578826 04478826 0E5EC402 57892607 89261C5F C4260A5E ^.&ó_.&..&.W.ó^.&.G.&.W.ó^.&ó_.& 000020
0C76FF00 013047C7 260A5EC4 0049E903 7400307F 83260A5E C4065789 26044789 .G.&¯W.ó^.&..0.t.ÕI.ó^.&úG0..¯v. 000040
261FC426 065EC408 C4830418 08809A08 77FF260A 77FF261F C426065E C40A76FF .v.ó^.&ó.&.w.&.w..¯....ó.ó^.&ó.& 000060
00008808 C483FFFF 086A9A08 77FF260A 77FF261F C426065E C41077FF 261277FF .w.&.w.ó^.&ó.&.w.&.w..j....ó.¡.. 000080
89FE4689 00008800 00FA46C7 D88E0312 881E5657 000006C8 C8C95F5E 1F0000E9 Õ...^_èùà...WV.¡...ÄúF•..¡...F±. 0000A0
C40044E9 03740004 7F832606 5EC4FE56 89FC4689 02578826 07882606 5EC4FC46 F=ó^.Ï..&.W..F=.V±ó^.&....t.ÕD.ó 0000C0
89000003 5D9A016A 0677FF26 0877FF26 0A5EC428 77FF262D 77FF261F C426FC5E ^=&ó.&.w-&.w+ó^.&.w.&.w.j..]..... 0000E0
FA468800 06E90375 00003D08 C4830372 00009AFC 76FFFE76 FFFA76FF 506AFA46 F•jP.v•.v±.v=...r..ó.=..u.Õ...F• 000100
C40A76FF 0C76FF00 012747C7 260A5EC4 0025E903 7400277F 83260A5E C40038E9 Õ8.ó^.&..'.t.Õ%.ó^.&úG'...v..v.ó 000120
C8C95F5E 1F0000E9 00008808 C48303F4 092A9A08 77FF260A 77FF261F C426065E ^.&ó.&.w.&.w..*.¶..ó.¡..Õ...^_èù 000140
07882606 5EC4FC46 89FE4689 00008800 00FA46C7 D88E0430 881E5657 000006C8 à...WV.¡0..ÄúF•..¡...F±.F=ó^.Ï.. 000160
77FF261F C426FC5E C40044E9 03740004 7F832606 5EC4FE56 89FC4689 02578826 &.W..F=.V±ó^.&....t.ÕD.ó^=&ó.&.w 000180
FFFA76FF 506AFA46 89000004 789A016A 0677FF26 0877FF26 0A5EC428 77FF262D -&.w+ó^.&.w.&.w.j..(....F•jP.v•. 0001A0
83260A5E C40038E9 FA468800 06E90375 00003008 C4830490 00009AFC 76FFFE76 v±.v=......ó.=..u.Õ...F•Õ8.ó^.&. 0001C0
77FF261F C426065E C40A76FF 0C76FF00 012447C7 260A5EC4 0025E903 7400247F .$.t.Õ%.ó^.&úG$...v..v.ó^.&ó.&.w 0001E0
```

```
Dump of file SATURN:[PCCOMMON.DUMP.DLL]DAD.TMP;1 on 18-APR-1990 10:40:03.08
File ID (551,9,0)   End of file block 267 / Allocated 268

Virtual block number 115 (00000073), 512 (0200) bytes

 881E5657 000006C8 CBC95F5E 1F0000E9 00008808 C4830400 09A49A08 77FF260A .&.w..Ê.Å..á.¡..Õ...^_èùà...WV.¡ 000000
 89FC4689 02578826 07882606 5EC4FC46 89FE4689 00008800 00FA46C7 D88E04E8 Õ..ÄúF*..¡...Fż.F=á^.Ī..&.W..F=. 000020
 00047F83 26065EC4 00C8E900 00880006 E9037408 47082606 4788260A 5EC4FE56 Vżá^.&.G.&.G.t.Õ..¡..Õù.á^.&.... 000040
 016A0677 FF260877 FF260A5E C42877FF 262D77FF 261FC426 FC5EC400 44E90374 t.ÕD.á^=&á.&.w-&.w+á^.&.w.&.w.j. 000060
 03750000 3D08C483 05480000 9AFC76FF FE76FFFA 76FF506A FA468900 0005339A .3....F*jP.v*.vż.v=...H..á.=..u. 000080
 26078826 0E5EC400 32E90375 3A470826 3B478826 0A5EC400 7AE9FA46 880006E9 Õ...F*Õz.á^.&.G8&.G:u.Õ2.á^.&..& 0000A0
 260A5EC4 06578826 04478826 0E5EC402 57892607 8926385F C4260A5E C4025788 .W.á^.&á_8&..&.W.á^.&.G.&.W.á^.& 0000C0
 014647C7 260A5EC4 0025E903 7400467F 83260A5E C4065789 26044789 26385FC4 á_8&.G.&.W.á^.&..F.t.Õ%.á^.&úGF. 0000E0
 00008808 C4830588 0A839A08 77FF260A 77FF261F C426065E C40A76FF 0C76FF00 ..v..v.á^.&á.&.w.&.w.......á.¡.. 000100
 89FE4689 00008800 00FA46C7 D88E05A0 881E5657 000006C8 CBC95F5E 1F0000E9 Õ...^_èùà...WV.¡...ÄúF*..¡...Fż. 000120
 C40044E9 03740004 71832606 5EC4FE56 89FC4689 02578826 07882606 5EC4FC46 F=á^.Ī..&.W..F=.Vżá^.&....t.ÕD.á 000140
 89000006 019A006A 0677FF26 0877FF26 0A5EC428 77FF262D 77FF261F C.?6FC5E ^=&á.&.w-&.w+á^.&.w.&.w.j....... 000160
 FA468800 06E90375 00003008 C4830616 00009AFC 76FFFE76 FFFA76FF 506 FA46 F*jP.v*.vż.v=......á.=..u.Õ...F* 000180
 C40A76FF 0C76FF00 003047C7 260A5EC4 0049E903 7500307F 83260A5E C4005CE9 Õ\.á^.&..0.u.Õ].á^.&úG0...v..v.á 0001A0
 261277FF 261FC426 065EC408 C4830774 08809A08 77FF260A 77FF261F C426065E ^.&á.&.w.&.w..¯.t..á.á^.&á.&.w.& 0001C0
 1F0000E9 00008808 C4830698 086A9A08 77FF260A 77FF261F C426065E C41077FF .w.á^.&á.&.w.&.w..j....á.¡..Õ... 0001E0

Dump of file SATURN:[PCCOMMON.DUMP.DLL]DAD.TMP;1 on 18-APR-1990 10:40:03.08
File ID (551,9,0)   End of file block 267 / Allocated 268

Virtual block number 116 (00000074), 512 (0200) bytes

 5EC4FC46 89FE4689 00008800 00FA46C7 D88E0680 881E5657 000006C8 CBC95F5E ^_èùà...WV.¡¯..ÄúF*..¡...Fż.F=á^ 000000
 C426FC5E C40044E9 03740004 7F832606 5EC4FE56 89FC4689 02578826 07882606 .Ī..&.W..F=.Vżá^.&....t.ÕD.á^=&á 000020
 506AFA46 89000006 FB9A006A 0677FF26 0877FF26 0A5EC428 77FF262D 77FF261F .&.w-&.w+á^.&.w.&.w.j..«....F*jP 000040
 C40038E9 FA468800 06E90375 00003008 C4830710 00009AFC 76FFFE76 FFFA76FF .v*.vż.v=......á.=..u.Õ...F*Õ8.á 000060
 C426065E C40A76FF 0C76FF00 002747C7 260A5EC4 0025E903 7500277F 83260A5E ^.&..'.u.Õ%.á^.&úG'...v..v.á^.&á 000080
 000006C8 CBC95F5E 1F0000E9 00008808 C4830750 092A9A08 77FF260A 77FF261F .&.w.&.w..*.P..á.¡..Õ...^_èùà... 0000A0
 02578826 07882606 5EC4FC46 89FE4689 00008800 00FA46C7 D88E078C 881E5657 WV.¡...ÄúF*..¡...Fż.F=á^.Ī..&.W. 0000C0
 77FF262D 77FF261F C426FC5E C40044E9 03740004 7F832606 5EC4FE56 89FC4689 .F=.Vżá^.&....t.ÕD.á^=&á.&.w-&.w 0000E0
 76FFFE76 FFFA76FF 506AFA46 89000007 D79A006A 0677FF26 0877FF26 0A5EC428 +á^.&.w.&.w.j..=....F*jP.v*.vż.v 000100
 7500247F 83260A5E C40038E9 FA468800 06E90375 00003008 C48307EC 00009AFC =...$..á.=..u.Õ...F*Õ8.á^.&..$.u 000120
 77FF260A 77FF261F C426065E C40A76FF 0C76FF00 002447C7 260A5EC4 0025E903 .Õ%.á^.&úG$...v..v.á^.&á.&.w.&.w 000140
 D88E0844 881E5657 000006C8 CBC95F5E 1F0000E9 00008808 C483082C 09A49A08 ..Ê.,..á.¡..Õ...^_èùà...WV.¡D..Ä 000160
 5EC4FE56 89FC4689 02578826 07882606 5EC4FC46 89FE4689 00008800 00FA46C7 úF*..¡...Fż.F=á^.Ī..&.W..F=.Vżá^ 000180
 44E90374 00047F83 26065EC4 0089E900 00880006 E9037408 47082606 4788260A .&.G.&.G.t.Õ..¡..Õ..á^.&....t.ÕD 0001A0
 00088F9A 006A0677 FF260877 FF260A5E C42877FF 262D77FF 261FC426 FC5EC400 .á^=&á.&.w-&.w+á^.&.w.&.w.j..... 0001C0
 880006E9 03750000 3D08C483 08A40000 9AFC76FF FE76FFFA 76FF506A FA468900 ..F*jP.v*.vż.v=...Ê..á.=..u.Õ... 0001E0

Dump of file SATURN:[PCCOMMON.DUMP.DLL]DAD.TMP;1 on 18-APR-1990 10:40:03.08
File ID (551,9,0)   End of file block 267 / Allocated 268

Virtual block number 117 (00000075), 512 (0200) bytes

 76FF0C76 FF000046 47C7260A 5EC40025 E9037500 467F8326 0A5EC400 38E9FA46 F*Õ8.á^.&..F.u.Õ%.á^.&úGF...v..v 000000
 5F5E1F00 00E90000 8808C483 08E40A83 9A0877FF 260A77FF 261FC426 065EC40A .á^.&á.&.w.&.w....õ..á.¡..Õ...^_ 000020
 89000088 E84689EA 46890000 880000DC 46C7D88E 08FC881E 56570000 24C8CBC9 èùà$..WV.¡=..ÄúFÉ..¡...Fõ.FÒ¡... 000040
 89000088 E44689E6 46890000 880001E2 46C7F446 89F64689 000088F8 4689FA46 F*.F%¡...F-.F¶úFã..¡...FÌ.FÒ¡... 000060
 F04689F2 46890000 88EC4689 EE468900 0088FC46 89FE4689 0000880E 4689E046 FÁ.FB¡...Fż.F=¡...FŸ.F&¡...F·.FÞ 000080
 46892057 88262847 88261FC4 26E45EC4 E65689E4 46890257 8826078B 26065EC4 á^.&..&.W..FÕ.V¦á^Õ&á.&.G+&.W-.F 0000A0
 FFE676FF DC76FF50 6ADC4689 0000FFFF 9A5016F4 468DE876 FFEA76FF EA5689E8 Õ.Võ.võ.vÒ.F¶.P......FÉjP.vÉ.vl. 0000C0
 5689F846 89F65688 F4468803 7CE90003 E9037500 003008C4 830A8800 009AE476 võ...Ê..á.=..u.Õ..Õ|..F¶.V-.F%.V 0000E0
 37FF2602 77FF26F8 5EC4E876 FFEA76FF 0361E903 75024708 26078826 F85EC4FA *á^%&..&.G.u.Õa..võ.vÒá^%&.w.&.7 000100
 08C48308 3100009A E476FFE6 76FFDC76 FF506ADC 46890000 FFFF9A50 16E2468D .Fã.P......FÉjP.vÉ.vl.võ...1..á. 000120
 37FF2602 77FF26F8 5EC45016 DE468D02 F6E9E246 880326E9 0003E903 7500003D =..u.Õ..Õ&..FãÕ-..F8.Pá^%&.w.&.7 000140
 740E4639 0C56880A 4688004E E9037500 003D0CC4 83089700 009AE476 FFE676FF .vl.võ......á.=..u.ÕN..F..V.9F8t 000160
 08C48308 C906A89A 0676FF08 76FFDE76 FFE076FF 0035E903 75E05639 0008E903 .Õ..9VÀu.Õ5..vÁ.v8.v..v..¯.è..á. 000180
 80E90003 E9037500 003008C4 83086C00 009AE476 FFE676FF DC76FF50 6ADC4689 .FÉjP.vÉ.vl.võ...l..á.=..u.Õ..Õ¯ 0001A0
 506ADC46 89000009 509A006A 37FF2602 77FF26F8 5EC4E876 FFEA76FF 0038E902 .Õ8..võ.vÒá^%&.w.&.7j..]....FÉjP 0001C0
 800268E9 0275E900 03E90375 00003008 C4830972 00009AE4 76FFE676 FFDC76FF .vÉ.vl.võ...r..á.=..u.Õ..Õu.Õk.. 0001E0
```

Dump of file SATURN:[PCCOMMON.DUMP.DLL]DAD.TMP;1 on 18-APR-1990 10:40:03.08
File ID (551,9,0)   End of file block 267 / Allocated 268

Virtual block number 118 (00000076), 512 (0200) bytes

```
75000030 0CC483FF FF009C9A E476FFE6 76FF37FF 260277FF 26F85EC4 5016FC46 F=.Pá^½&.w.&.7.vl.vð......á.=..u 000000
FC76FFFE 76FF0035 E90375FE 56390008 E90374FC 46390C56 880A4688 004EE903 .ÕN..F..V.9F=t.Õ..9V±u.Õ5..v±.v= 000020
1A00009A E476FFE6 76FFDC76 FF506ADC 468908C4 83020707 849A0676 FF0876FF .v..v....■..á..FÉjP.vÉ.vl.vð.... 000040
260277FF 26F85EC4 E876FFEA 76FF0038 E90202E9 0003E903 7500003D 08C4830C ..á.=..u.Õ..Õ..Õ8..vð.vÕá^½&.w.& 000060
3008C483 0C8D0000 9AE476FF E676FFDC 76FF506A 0C468900 000CB39A 006A37FF .7j..•....FÉjP.vÉ.vl.vð......á.= 000080
FFE676FF 37FF2602 77FF26F8 5EC45016 EC468D01 80E901C7 E90003E9 03750000 ..u.Õ..Õú.Õ§..F&.Pá^½&.w.&.7.vl. 0000A0
0008E903 74EC4639 0C56880A 4688004E E9037500 00300CC4 830CF301 389AE476 vð.8.µ..á.=..u.ÕN..F..V.9F$t.Õ.. 0000C0
6ADC4689 08C48300 25083C9A 0676FF08 76FFEC76 FFEE76FF 0035E903 75EE5639 9V¥u.Õ5..v¥.v$.v..v..<.X..á..FÉj 0000E0
0038E901 54E90003 E9037500 003008C4 830CC800 009AE476 FFE676FF 0C76FF50 P.vÉ.vl.vð...á..á.=..u.Õ..ÕT.Õ8. 000100
FFDC76FF 506ADC46 89000000 619A006A 37FF2602 77FF26F8 5EC4E876 FFEA76FF .vð.vÕá^½&.w.&.7j..■....FÉjP.vÉ. 000120
5016F046 8D010FE9 0119E900 03E90375 00003008 C4830038 00009AE4 76FFE676 vl.vð...;..á.=..u.Õ..Õ..Õ...Fþ.P 000140
004EE903 75000030 0CC4830A E901049A E476FFE6 76FF37FF 260277FF 26F85EC4 á^½&.w.&.7.vl.vð.á.Õ..á.=..u.ÕN. 000160
FF0876FF F076FFF2 76FF0035 E90375F2 56390008 E90374F0 46390C56 880A4688 .F..V.9Fþt.Õ..9V·u.Õ5..v·.vþ.v.. 000180
08C48300 7600009A E476FFE6 76FFDC76 FF506ADC 468908C4 830B1808 F49A0676 v..¶....á..FÉjP.vÉ.vl.vð...v..á. 0001A0
006A37FF 260277FF 26F85EC4 E876FFEA 76FF0038 E900A6E9 0003E903 7500003D =..u.Õ..Õl.Õ8..vð.vÕá^½&.w.&.7j. 0001C0
03750000 3008C483 00B10000 9AE476FF E676FFDC 76FF506A DC468900 000D9C9A ......FÉjP.vÉ.vl.vð...Ý..á.=..u. 0001E0
```

Dump of file SATURN:[PCCOMMON.DUMP.DLL]DAD.TMP;1 on 18-APR-1990 10:40:03.08
File ID (551,9,0)   End of file block 267 / Allocated 268

Virtual block number 119 (00000077), 512 (0200) bytes

```
00000857 9A006A37 FF260277 FF26F85E C4E876FF EA76FF00 61E9006B E90003E9 Õ..Õk.Õa..vð.vÕá^½&.w.&.7j..W... 000000
30E90003 E9037500 003008C4 830A6500 009AE476 FFE676FF 0C76FF50 6ADC4689 .FÉjP.vÉ.vl.vð...e..á.=..u.Õ..Õ0 000020
30FE4EE9 03750004 30FDA8E9 03750003 30FD02E9 03750002 300023E9 0026E900 .Õ&.ÕW.=..u.Õ.»=..u.Õ »=..u.ÕN±= 000040
FFEA76FF 0027E903 75F64608 F4468BFC 90E904F8 4683FF9F E9FEF4E9 03750012 ..u.Õ¶±Õ...F½.Õ.■.F¶.F-u.Õ'..vð. 000060
080F0000 9AE476FF E676FFDC 76FF506A DC468900 00FFFF9A F476FFF6 76FFE876 vÕ.v-.v¶......FÉjP.vÉ.vl.vð...Õ. 000080
00000007 09B20002 00000003 0E1E0002 0009CBC9 5F5E1F00 00E90C46 8808C483 .á..FÉÕ...^_èù............Ý..... 0000A0
010E0004 0AA60203 00000009 0C450002 01020004 0E090203 00000008 0C770002 ..w...............E........Ì..... 0000C0
00000000 00000000 01D50004 0C050203 02270004 0A500203 00000010 09CA0002 ..ò.......P...'........Ê......... 0000E0
5EC40789 26024789 26000088 0E5EC400 00FA46C7 D88EFFFF 881E5657 000006C8 à...WV.¡...ÀúF•..á^.¡..&.G.&..á^ 000100
FF9A5016 FC468D14 77FF2616 77FF2606 5EC40000 FFFF9A14 77FF2616 77FF2606 .&.w.&.w......á^.&.w.&.w..F=.P.. 000120
57392600 31E90374 06473926 0C56880A 4688FC5E C40046E9 03740000 300000FF ...=..t.ÕF.á^=.F..V.&9G.t.Õ1.&9W 000140
FF26065E C40001FA 46C70257 89260789 26FE5688 FC46880E 5EC40028 E9037408 .t.Õ(.á^..F=.V±&..&.W.úF•..á^.&. 000160
000006C8 CBC95F5E 1F0000E9 FA4688FF 90E90003 E90000FF FF9A1477 FF261677 w.&.w......Õ..Õ...F•Õ...^_èùà... 000180
77FF2606 5EC40789 26024789 26000088 0E5EC400 00FA46C7 D88E0008 881E5657 WV.¡...ÀúF•..á^.¡..&.G.&.¯á^.&.w 0001A0
30000000 3F9A5016 FC468D18 77FF261A 77FF2606 5EC40000 002A9A18 77FF261A .&.w..*...á^.&.w.&.w..F=.P.?...= 0001C0
E9037408 57392600 31E90374 06473926 0C56880A 4688FC5E C40046E9 03740000 ..t.ÕF.á^•.F..V.&9G.t.Õ1.&9W.t.Õ 0001E0
```

Dump of file SATURN:[PCCOMMON.DUMP.DLL]DAD.TMP;1 on 18-APR-1990 10:40:03.08
File ID (551,9,0)   End of file block 267 / Allocated 268

Virtual block number 120 (00000078), 512 (0200) bytes

```
FF261A77 FF26065E C40001FA 46C70257 89260789 26FE5688 FC46880E 5EC40028 (.á^..F=.V±&..&.W.úF•..á^.&.w.&. 000000
881E5657 000006C8 CBC95F5E 1F0000E9 FA4688FF 90E90003 E9000000 879A1877 w......Õ..Õ...F•Õ...^_èùà...WV.¡ 000020
77FF261E 77FF2606 5EC40789 26024789 26000088 0E5EC400 00FA46C7 D88E00A4 Ê..ÀúF•..á^.¡..&.G.&..á^.&.w.&.w 000040
03740000 30000000 089A5016 FC468D1C 77FF261E 77FF2606 5EC40000 00C69A1C ..ó...á^.&.w.&.w..F=.P.Ü...=..t. 000060
5EC40028 E9037408 57392600 31E90374 06473926 0C56880A 4688FC5E C40046E9 ÕF.á^=.F..V.&9G.t.Õ1.&9W.t.Õ(.á^ 000080
239A1C77 FF261E77 FF26065E C40001FA 46C70257 89260789 26FE5688 FC46880E ..F=.V±&..&.W.úF•..á^.&.w.&.w..# 0000A0
D88E0140 881E5657 000006C8 CBC95F5E 1F0000E9 FA4688FF 90E90003 E9000001 ...Õ..Õ...F•Õ...^_èùà...WV.¡ə..Ä 0000C0
01629A20 77FF2622 77FF2606 5EC40789 26024789 26000088 0E5EC400 00FA46C7 úF•..á^.¡..&.G.&.¯á^.&.w"&.w .b. 0000E0
C40046E9 03740000 30000001 779A5016 FC468020 77FF2622 77FF2606 5EC40000 ..á^.&.w"&.w .F=.P.w...=..t.ÕF.á 000100
FC46880E 5EC40028 E9037408 57392600 31E90374 06473926 0C56880A 4688FC5E ^=.F..V.&9G.t.Õ1.&9W.t.Õ(.á^..F= 000120
E9000001 8F9A2077 FF262277 FF26065E C40001FA 46C70257 89260789 26FE5688 .V±&..&.W.úF•..á^.&.w"&.w .¢...Õ 000140
00F846C7 D88E010C 881E5657 000008C8 CBC95F5E 1F0000E9 FA4688FF 90E90003 ..Õ...F•Õ...^_èùà...WV.¡É..ÀúF½. 000160
5016FA46 8D0876FF 0A76FF00 CEE90646 88FA4689 FC468900 00880000 FE46C700 .úF±..¡...F=.F•.F.Õö..v..v..F•.P 000180
0A76FF00 C5E9FE46 89078826 FA5EC400 09E90374 00F87E83 F8468900 00FFFF9A ......F½.-½.t.Õ..á^•&...F±Õé..v. 0001A0
89078826 FA5EC400 09E90374 00F87E83 F8468900 00FFFF9A 5016FA46 8D0876FF .v..F•.P......F½.-½.t.Õ..á^•&... 0001C0
09E90374 00F87E83 F8468900 00FFFF9A 5016FA46 8D0876FF 0A76FF00 90E9FE46 F±Õ...v..v..F•.P......F½.-½.t.Õ. 0001E0
```

```
Dump of file SATURN:[PCCOMMON.DUMP.DLL]DAD.TMP;1 on 18-APR-1990 10:40:03.08
File ID (551,9,0)   End of file block 267 / Allocated 268

Virtual block number 121 (00000079), 512 (0200) bytes

F8468900 00FFFF9A 5016FA46 8D0876FF 0A76FF00 75E9FE46 89078826 FA5EC400 .6^*&...F±Õu..v..v..F*.P......F% 000000
5016FA46 8D0876FF 0A76FF00 4DE9FE46 89078826 FA5EC400 09E90374 00F87E83 .~%.t.Õ..6^*&...F±ÕM..v..v..F*.P 000020
0022E900 25E9FE46 89078826 FA5EC400 09E90374 00F87E83 F8468900 00FFFF9A ......F%.~%.t.Õ..6^*&...F±Õ%.Õ". 000040
030002E5 02E502BD 03350376 A7FF2E93 C003FFEF E9037600 05300001 2D001FE9 Õ..-..=..v.Õy..å...Iv.5.§.I.I... 000060
26FC5688 FA468810 5EC40010 E9037512 46081046 88002FE9 037400F8 7E830295 ...~%.t.Õ/..F..F.u.Õ..6^..F*.V•& 000080
0000E9F8 46880789 26FE4688 0C5EC400 09E90375 0E46080C 46880257 89260789 ..&.W..F..F.u.Õ..6^..F±&...F%Õ.. 0000A0
46890000 880000FE 46C70000 F846C7D8 8E027888 1E565700 0008C8C8 C95F5E1F .^_èùà...WV.|x..ÀúF%..úF±..|...F 0000C0
E9037518 46081646 88000007 C726125E C40008E9 03751446 08124688 FA4689FC •.F*.F..F.u.Õ..6^.&ú....F..F.u.Õ 0000E0
0A76FF0C 76FF0877 FF260A77 FF26065E C4078926 02478926 00008816 5EC4000D ..6^.|..&.G.&..6^.&.w.&.w..v..v. 000100
FF2876FF 2276FF24 76FF1E76 FF2076FF 5016FA46 8D5016FE 46800E76 FF1076FF .v..v..F±.P.F*.P.v .v..v$.v".v(. 000120
76FF0876 FFF876FF 526AF846 890000FF FF9A1A76 FF1C76FF 2A76FF2C 76FF2676 v&.v,.v*.v..v.......F%jR.v%.v..v 000140
E90375FC 4608FA46 880088E9 F8468800 06E90375 00003008 C483FFFF 00009A06 .......6.=..u.Õ...F%ÕE..F*.F•u.Õ 000160
890EC483 040C0270 9AFE76FF FA76FFFC 76FF1276 FF1476FF 1676FF18 76FF0023 #..v..v..v..v..v•.v*.v±.p.É..6.. 000180
E903751C 46081A46 880075E9 0374FF10 7E83007E E90374FF 0E7E8300 87E9F846 F%Õ...~..t.Õ~..~..t.Õu..F..F.u.Õ 0001A0
C483FFFF 05379A10 77FF2612 77FF2606 5EC40A76 FF0C76FF 1A76FF1C 76FF006A j..v..v..v..v.6^.&.w.&.w..7....6 0001C0
7514460B 12468800 33E90375 083F8326 1A5EC400 3FE90374 00F87E83 F846890C ..F%.~%.t.Õ?.6^.&.?.u.Õ3..F..F.u 0001E0

Dump of file SATURN:[PCCOMMON.DUMP.DLL]DAD.TMP;1 on 18-APR-1990 10:40:03.08
File ID (551,9,0)   End of file block 267 / Allocated 268

Virtual block number 122 (0000007A), 512 (0200) bytes

88261047 8826065E C40015E9 03751846 08164688 000407C7 26125EC4 0008E903 .Õ..6^.&ú....F..F.u.Õ..6^.&.G.&. 000000
CD881E56 5700001C C8C8C95F 5E1F0000 E9F84688 02578926 07892616 5EC41257 W.6^.&..&.W..F%Õ...^_èùà...WV.|è 000020
0A5EC4EE 5689EC 5 89025788 26078826 0A5EC400 00E646C7 0013E446 C7D88E03 ..ÀúFÕ..úFI..6^.&..&.W..F±.VY6^. 000040
89F44689 025788.. 07882606 5FC42606 5EC4EA56 89E84689 06578826 04478826 &.G.&.W..FÕ.Võ6^.&6_.&..&.W..F¶. 000060
8826065F C426065E C4F25689 F0468906 57882604 47882606 5FC42606 5EC4F656 V~6^.&6_.&.G.&.W..FÞ.V·6^.&6_.&. 000080
5689F846 890E5788 260C4788 26065FC4 26065EC4 FE5689FC 46890A57 88260847 G.&.W..F•.V±6^.&6_.&.G.&.W..F%.V 0000A0
E90374FE 4608FC46 880021E9 0374F246 08F04688 002CE903 74F6460B F44688FA *.F¶.F~t.Õ...FÞ.F·t.ÕI..F•.F±t.Õ 0000C0
4628F656 88F44688 02E7E900 0807C726 0E5EC400 08E90374 FA4608F8 46880016 ...F%.F*t.Õ..6^.&ú...ÕÕ..F¶.V~+F 0000E0
03F65688 F4468800 C6E90372 EC463800 08E9037D 0003E903 7EEE5638 E65618E4 Õ.VI;VY~.Õ(.).Õ..;F&r.Õ6..F¶.V~. 000100
F25688F0 468800A5 E90377EC 46380008 E9037E00 82E9037D EE5638E6 5613E446 FÕ.VI;VY).Õy.~.Õ..;F&w.ÕE..FÞ.V· 000120
5688F046 88002CE9 0372E846 380008E9 037D0039 E9037EEA 5638E656 18E44628 +FÕ.VI;Võ~.Õ9.).Õ..;FÕr.Õ...FÞ.V 000140
260E5EC4 0008E903 77E84638 0008E903 7E0018E9 037DEA56 38E65613 E44603F2 ·.FÕ.VI;Võ).Õ..~.Õ..;FÕw.Õ..6^.& 000160
0008E903 7D0039E9 037EEA56 38E6561B E44628FA 5688F846 880055E9 000507C7 ú...ÕU..F%.V*+FÕ.VI;Võ~.Õ9.).Õ.. 000180
08E9037E 0018E903 7DEA5638 E65613E4 4603FA56 88F84688 002CE903 72E8463B ;FÕr.Õ...F%.V*.FÕ.VI;Võ).Õ..~.Õ. 0001A0
880200E9 000407C7 260E5EC4 0008E900 0607C726 0E5EC400 08E90377 E8463800 .;FÕw.Õ..6^.&ú...Õ..6^.&ú...Õ... 0001C0
00C6E903 72EC463B 0008E903 7D0003E9 037EEE56 38E65618 E44628FE 5688FC46 F•.V±+FÕ.VI;VY~.Õ(.).Õ..;F&r.Õ6. 0001E0

Dump of file SATURN:[PCCOMMON.DUMP.DLL]DAD.TMP;1 on 18-APR-1990 10:40:03.08
File ID (551,9,0)   End of file block 267 / Allocated 268

Virtual block numb^r 123 (0000007B), 512 (0200) bytes

A5E90377 EC463800 08E9037E 0082E903 7DEE5638 E65613E4 4603FE56 88FC4688 .F•.V±.FÕ.VI;VY).Õy.~.Õ..;F&w.ÕE 000000
E90372E8 46380008 E9037D00 39E9037E EA5638E6 5618E446 28F25688 F0468800 ..FÞ.V·+FÕ.VI;Võ~.Õ9.).Õ..;FÕr.Õ 000020
0377E846 380008E9 037E0018 E9037DEA 5638E656 13E44603 F25688F0 4688002C ...FÞ.V·.FÕ.VI;Võ).Õ..~.Õ..;FÕw. 000040
E9037EEA 5638E656 18E44628 FA5688F8 46880055 E9000907 C7260E5E C40008E9 Õ..6^.&ú...ÕU..F%.V*+FÕ.VI;Võ~.Õ 000060
037DEA56 38E65613 E44603FA 5688F846 88002CE9 0372E846 380008E9 037D0039 9.).Õ..;FÕr.Õ...F%.V*.FÕ.VI;Võ). 000080
C7260E5E C40008E9 000A07C7 260E5EC4 0008E903 77E84638 0008E903 7E0018E9 Õ..~.Õ..;FÕw.Õ..6^.&ú...Õ..6^.&ú 0000A0
380008E9 037D0039 E9037EEA 5638E656 18E44628 F25688F0 46880119 E9000807 ...Õ...FÞ.V·+FÕ.VI;Võ~.Õ9.).Õ..; 0000C0
0008E903 7E0018E9 037DEA56 38E65613 E44603F2 5688F046 88002CE9 0372E846 FÕr.Õ...FÞ.V·.FÕ.VI;Võ).Õ..~.Õ.. 0000E0
38E6561B E44628FA 5688F846 8800CCE9 000107C7 260E5EC4 0008E903 77E84638 ;FÕw.Õ..6^.&ú...Õä..F%.V*+FÕ.VI; 000100
E65613E4 4603FA56 88F84688 002CE903 72E84638 0008E903 7D0039E9 037EEA56 Võ~.Õ9.).Õ..;FÕr.Õ...F%.V*.FÕ.VI 000120
007FE900 0207C726 0E5EC400 08E90377 E8463800 08E9037E 0018E903 7DEA5638 ;Võ).Õ..~.Õ..;FÕw.Õ..6^.&ú...Õ.. 000140
5688F046 88005CE9 0377EC46 390008E9 037E0069 E9037DEE 5639F656 88F44688 .F¶.V~9VY).Õi.~.Õ..9F&w.Õ\..FÞ.V 000160
7EEE5639 FE5688FC 46880041 E90377E8 46390008 E9037E00 4EE9037D EA5639F2 ·9Võ).ÕN.~.Õ..9FÕw.ÕA..F•.V±9VY~ 000180
7D0018E9 037EEA56 39FA5688 F8468800 26E90372 EC463900 08E9037D 0033E903 .Õ3.).Õ..9F&r.Õ&..F%.V*9Võ~.Õ..) 0001A0
88000807 C7260E5E C40008E9 000007C7 260E5EC4 0008E903 72E84639 0008E903 .Õ..9FÕr.Õ..6^.&ú...Õ..6^.&ú...| 0001C0
02A10203 07460009 02C90203 00000003 04640002 000CCBC9 5F5E1F00 00E90000 ..Õ...^_èù....d.......è...F...À. 0001E0
```

Dump of file SAT ?N:[PCCOMMON.DUMP.DLL]DAD.TMP;1 on 18-APR-1990 10:40:03.08
File ID (551,9,0)   End of file block 267 / Allocated 268

Virtual block number 124 (0000007C), 512 (0200) bytes

```
053F0002 06710009 03410203 00000009 049A0002 08D80009 03190203 09570009 ..W.......Ä...........A...q...?. 000000
025B0203 079B0009 02F10203 03200007 01FE0203 097F0009 044F0203 00000010 ......O.......±... ...þ.......[. 000020
89000088 D88EFFFF 881E5657 000004C8 00000000 03450007 02130203 03310007 ..1.......E.....à...WV.¡...Ä¡... 000040
88FE5688 FC468810 5EC4FE56 89FC4689 16578826 14478826 065EC4FC 4689FE46 F±.F=á^.&.G.&.W..F=.V±á^..F=.V±. 000060
01902D0A 57882608 478826FC 5EC40483 E90E4688 1FA5F200 0889DA8E 1EF088F8 «.Þ..Ö¿...E..F.Ö..á^=&.G.&.W.-.. 000080
26FC5EC4 001EE903 72073826 0008E903 7D0028E9 037E0257 38260A5E C4000A83 .Ö.á^.&;W.-.Ö+.).Ö..&;.r.Ö..á^=& 0000A0
0788260A 5EC40014 E9025789 26078926 105EC400 0A830190 2D0A5788 26084788 .G.&.W.-...Ö.á^.&..&.W.Ö..á^.&.. 0000C0
D2830190 05025788 26078826 FC5EC404 48E90257 89260789 26105EC4 02578826 &.W.á^.&..&.W.ÖK.á^=&..&.W.....@ 0000E0
078826FC 5EC4001E E9037707 38260008 E9037E00 28E9037D 02573826 0A5EC400 .á^.&;W.).Ö+.-.Ö..&;.w.Ö..á^=&.. 000100
88260788 260A5EC4 0015E90A 57892608 47892610 5EC40002 83019005 02578826 &.W.....@.á^.&.G.&.W.Ö..á^.&..&. 000120
DA8300C8 2D0E5788 260C4788 26FC5EC4 03ECE90A 57892608 47892610 5EC40257 W.á^.&.G.&.W.Ö$.á^=&.G.&.W.-à..Ö 000140
8826FC5E C4001FE9 03720447 38260009 E9037D00 2DE9037E 06573826 0A5EC400 .á^.&;W.-.Ö-.).Ö..&;G.r.Ö..á^=&. 000160
4788260A 5EC40016 E9065789 26044789 26105EC4 000A8300 C82D0E57 88260C47 G.&.W.-à..Ö.á^.&.G.&.W.Ö..á^.&.G 000180
C8050657 88260447 8826FC5E C40389E9 06578926 04478926 105EC406 57882604 .&.W.á^.&.G.&.W.Ö..á^=&.G.&.W..à 0001A0
5EC4001F E9037704 47382600 09E9037E 002DE903 7D065738 260A5EC4 00028300 ..@.á^.&;W.).Ö-.-.Ö..&;G.w.Ö..á^ 0001C0
0A5EC400 16E90E57 89260C47 8926105E C4000283 00C80506 57882604 478826FC =&.G.&.W..à..@.á^.&.G.&.W.Ö..á^. 0001E0
```

Dump of file SATURN:[PCCOMMON.DUMP.DLL]DAD.TMP;1 on 18-APR-1990 10:40:03.08
File ID (551,9,0)   End of file block 267 / Allocated 268

Virtual block number 125 (0000007D), 512 (0200) bytes

```
57882608 478826FC 5EC40326 E90E5789 260C4789 26105EC4 06578826 04478826 &.G.&.W.á^.&.G.&.W.Ö&.á^=&.G.&.W 000000
001EE903 72073826 0008E903 7D0028E9 037E0257 38260A5E C4000A83 01902D0A .-...Ö.á^.&;W.-.Ö+.).Ö..&;.r.Ö.. 000020
5EC40014 E9025789 26078926 105EC400 0A830190 2D0A5788 26084788 26FC5EC4 á^=&.G.&.W.-...Ö.á^.&..&.W.Ö..á^ 000040
00C82D0E 5788260C 478826FC 5EC40257 89260789 26105EC4 02578826 0788260A .&..&.W.á^.&..&.W.á^=&.G.&.W.-à. 000060
FC5EC400 1FE90372 04473826 0009E903 7D002DE9 037E0657 38260A5E C4000A83 .Ö.á^.&;W.-.Ö-.).Ö..&;G.r.Ö..á^= 000080
260A5EC4 0016E906 57892604 47892610 5EC4000A 8300C82D 0E578826 0C478826 &.G.&.W.-à..Ö.á^.&.G.&.W.Ö..á^.& 0000A0
0A578826 08478826 FC5EC402 67E90657 89260447 8926105E C4065788 26044788 .G.&.W.á^.&.G.&.W.Ög.á^=&.G.&.W. 0000C0
C4001EE9 03720738 260008E9 037D0028 E9037E02 5738260A 5EC4000A 8301902D -...Ö.á^.&;W.-.Ö+.).Ö..&;.r.Ö..á 0000E0
0A5EC400 14E90257 89260789 26105EC4 000A8301 902D0A57 88260847 8826FC5E ^=&.G.&.W.-...Ö.á^.&..&.W.Ö..á^. 000100
8300C805 06578826 04478826 FC5EC402 57892607 8926105E C4025788 26078826 &..&.W.á^.&..&.W.á^=&.G.&.W..à.. 000120
26FC5EC4 001FE903 77044738 260009E9 037E002D E9037D06 5738260A 5EC40002 @.á^.&;W.).Ö-.-.Ö..&;G.w.Ö..á^=& 000140
88260A5E C40016E9 0E578926 0C478926 105EC400 028300C8 05065788 26044788 .G.&.W..à..@.á^.&.G.&.W.Ö..á^.&. 000160
90050257 88260788 26FC5EC4 01A8E90E 5789260C 47892610 5EC40657 88260447 G.&.W.á^.&.G.&.W.Ö´.á^=&..&.W... 000180
FC5EC400 1EE90377 07382600 08E9037E 0028E903 7D025738 260A5EC4 00028301 ..@.á^.&;W.).Ö+.-.Ö..&;.w.Ö..á^= 0001A0
88260A5E C40015E9 0A578926 08478926 105EC400 02830190 05025788 26078826 &..&.W.....@.á^.&.G.&.W.Ö..á^.&. 0001C0
DA8300C8 2D0E5788 260C4788 26FC5EC4 0A578926 08478926 105EC402 57882607 .&.W.á^.&.G.&.W.á^=&.G.&.W.-à..Ö 0001E0
```

Dump of file SATURN:[PCCOMMON.DUMP.DLL]DAD.TMP;1 on 18-APR-1990 10:40:03.08
File ID (551,9,0)   E~d of file block 267 / Allocated 268

Virtual block number 126 (0000007E), 512 (0200) bytes

```
8826FC5E C4001FE9 03720447 38260009 E9037D00 2DE9037E 06573826 0A5EC400 .á^.&;W.-.Ö-.).Ö..&;G.r.Ö..á^=&. 000000
4788260A 5EC40016 E9065789 26044789 26105EC4 000A8300 C82D0E57 88260C47 G.&.W.-à..Ö.á^.&.G.&.W.Ö..á^.&.G 000020
01900502 57882607 8826FC5E C400E9E9 06578926 04478926 105EC406 57882604 .&.W.á^.&.G.&.W.ÖÖ.á^=&..&.W.... 000040
26FC5EC4 001EE903 77073826 0008E903 7E0028E9 037D0257 38260A5E C4000283 .@.á^.&;W.).Ö+.-.Ö..&;.w.Ö..á^=& 000060
0788260A 5EC40015 E90A5789 26084789 26105EC4 00028301 90050257 88260788 ..&.W.....@.á^.&.G.&.W.Ö..á^.&.. 000080
00028300 C8050657 88260447 8826FC5E C40A5789 26084789 26105EC4 02578826 &.W.á^.&.G.&.W.á^=&.G.&.W..à..@. 0000A0
478826FC 5EC4001F E9037704 47382600 09E9037E 002DE903 7D065738 260A5EC4 á^.&;W.).Ö-.-.Ö..&;G.w.Ö..á^=&.G 0000C0
04478826 0A5EC400 16E90E57 89260C47 8926105E C4000283 00C80506 57882604 .&.W..à..@.á^.&.G.&.W.Ö..á^.&.G. 0000E0
001CE903 7600093D 00012D00 27E9002A E90E5789 260C4789 26105EC4 06578826 &.W.á^.&.G.&.W.Ö*.Ö'.-..=..v.Ö.. 000100
E9000088 04030344 00A104EC 028501C6 004204EC 01630100 04D8A7FF 2E93C003 .à...ΤÁ...c.$.B.6...$.À.D...¡..Ö 000120
26065EC4 FC4689FE 46890000 88D88E00 08881E56 57000004 C8C8C95F 5E1F0000 ...^_èùà...WV.¡...Ä¡...F±.F=á^.& 000140
0008890A 8E1EF088 F888FE56 88FC4688 105EC4FE 5689FC46 892E5788 262C4788 .G,&.W..F=.V±á^..F=.V±.«.Þ..Ö¿.. 000160
5738260A 5EC4000A 8301182D 0A578826 08478826 FC5EC404 83E90E46 881FA5F2 ·E..F.Ö..á^=&.G.&.W.-...Ö.á^.&;W 000180
182D0A57 88260847 8826FC5E C4001EE9 03720738 260008E9 037D0028 E9037E02 .-.Ö+.).Ö..&;.r.Ö..á^=&.G.&.W.-. 0001A0
8926105E C4025788 26078826 0A5EC400 14E90257 89260789 26105EC4 000A8301 ..Ö.á^.&..&.W.Ö..á^.&..&.W.á^.&. 0001C0
7D025738 260A5EC4 00028301 18050257 88260788 26FC5EC4 0448E902 57892607 .&.W.ÖK.á^=&..&.W.....@.á^.&;W.) 0001E0
```

```
Dump of file SATURN:[PCCOMMON.DUMP.DLL]DAD.TMP;1 on 18-APR-1990 10:40:03.08
File ID (551,9,0)   End of file block 267 / Allocated 268

Virtual block number 127 (0000007F), 512 (0200) bytes

 D2830118 05025788 26078826 FC5EC400 1EE90377 07382600 08E9037E 002BE903 .Ö+.-.Ö..&;.w.Ö..á^=&..&.W.....@ 000000
 08478926 105EC402 57882607 88260A5E C40015E9 0A578926 08478926 105EC400 .á^.&.G.&.W.Ö..á^.&..&.W.á^.&.G. 000020
 7E065738 260A5EC4 000A8301 18200E57 88260C47 8826FC5E C403ECE9 0A578926 &.W.Ö&.á^=&.G.&.W.-...Ö.á^.&;W.- 000040
 011820OE 5788260C 478826FC 5EC4001F E9037204 47382600 09E9037D 002DE903 .Ö-.).Ö..&;G.r.Ö..á^=&.G.&.W.-.. 000060
 26105EC4 06578826 04478826 0A5EC400 16E90657 89260447 8926105E C4000A83 .Ö.á^.&.G.&.W.Ö..á^.&.G.&.W.á^.& 000080
 38260A5E C4000283 01180506 57882604 478826FC 5EC40389 E9065789 26044789 .G.&.W.Ö..á^=&.G.&.W.....@.á^.&; 0000A0
 06578826 04478826 FC5EC400 1FE90377 04473826 0009E903 7E002DE9 037D0657 W.).Ö-.-.Ö..&;G.w.Ö..á^=&.G.&.W. 0000C0
 C4065788 26044788 260A5EC4 0016E90E 5789260C 47892610 5EC40002 83011805 ....@.á^.&.G.&.W.Ö..á^.&.G.&.W.á 0000E0
 5EC4000A 8301182D 0A578826 08478826 FC5EC403 26E90E57 89260C47 8926105E ^.&.G.&.W.Ö&.á^=&.G.&.W.-...Ö.á^ 000100
 88260847 8826FC5E C4001EE9 03720738 260008E9 037D0028 E9037E02 5738260A .&;W.-.Ö+.).Ö..&;.r.Ö..á^=&.G.&. 000120
 C4025788 26078826 0A5EC400 14E90257 89260789 26105EC4 000A8301 18200A57 W.-...Ö.á^.&..&.W.Ö..á^.&..&.W.á 000140
 5738260A 5EC4000A 8301182D 0E578826 0C478826 FC5EC402 57892607 8926105E ^.&..&.W.á^=&.G.&.W.-...Ö.á^.&;W 000160
 200E5788 260C4788 26FC5EC4 001FE903 72044738 260009E9 037D002D E9037E06 .-.Ö-.).Ö..&;G.r.Ö..á^=&.G.&.W.- 000180
 5EC40657 88260447 88260A5E C40016E9 06578926 04478926 105EC400 DA830118 ...Ö.á^.&.G.&.W.Ö..á^.&.G.&.W.á^ 0001A0
 0A5EC400 DA830118 200A5788 26084788 26FC5EC4 0267E906 57892604 47892610 .&.G.&.W.Ög.á^=&.G.&.W.-...Ö.á^. 0001C0
 57882608 478826FC 5EC4001E E9037207 38260008 E9037D00 28E9037E 02573826 &;W.-.Ö+.).Ö..&;.r.Ö..á^=&.G.&.W 0001E0

Dump of file SATURN:[PCCOMMON.DUMP.DLL]DAD.TMP;1 on 18-APR-1990 10:40:03.08
File ID (551,9,0)   End of file block 267 / Allocated 268

Virtual block number 128 (00000080), 512 (0200) bytes

 5EC40257 88260788 260A5EC4 0014E902 57892607 8926105E C4000A83 0118200A .-...Ö.á^.&..&.W.Ö..á^.&..&.W.á^ 000000
 06573826 0A5EC400 02830118 05065788 26044788 26FC5EC4 02578926 07892610 .&..&.W.á^=&.G.&.W.....@.á^.&;W. 000020
 18050657 88260447 8826FC5E C4001FE9 03770447 38260009 E9037E00 2DE9037D ).Ö-.-.Ö..&;G.w.Ö..á^=&.G.&.W... 000040
 105EC406 57882604 4788260A 5EC40016 E90E5789 260C4789 26105EC4 00028301 ..@.á^.&.G.&.W.Ö..á^.&.G.&.W.á^. 000060
 38260A5E C4000283 01180502 57882607 8826FC5E C401A8E9 0E578926 0C478926 &.G.&.W.Ö`.á^=&..&.W.....@.á^.&; 000080
 18050257 88260788 26FC5EC4 001EE903 77073826 0008E903 7E002BE9 037D0257 W.).Ö+.-.Ö..&;.w.Ö..á^=&..&.W... 0000A0
 26105EC4 02578826 0788260A 5EC40015 E90A5789 26084789 26105EC4 00028301 ..@.á^.&.G.&.W.Ö..á^.&..&.W.á^.& 0000C0
 7E06573B 260A5EC4 000A8301 18200E57 88260C47 8826FC5E C40A5789 26C34789 .G.&.W.á^=&.G.&.W.-...Ö.á^.&;W.- 0000E0
 0118200E 5788260C 478826FC 5EC4001F E9037204 47382600 09E9037D 0020E903 .Ö-.).Ö..&;G.r.Ö..á^=&.G.&.W.-.. 000100
 26105EC4 06578826 04478826 0A5EC400 16E90657 89260447 8926105E C4000A83 .Ö.á^.&.G.&.W.Ö..á^.&.G.&.W.á^.& 000120
 5738260A 5EC40002 83011805 02578826 078826FC 5EC400E9 E9065789 26044789 .G.&.W.ÖÖ.á^=&..&.W.....@.á^.&;W 000140
 01180502 57882607 8826FC5E C4001EE9 03770738 260008E9 037E0028 E9037D02 .).Ö+.-.Ö..&;.w.Ö..á^=&..&.W.... 000160
 8926105E C4025788 26078826 0A5EC400 15E90A57 89260847 8926105E C4000283 .@.á^.&.G.&.W.Ö..á^.&..&.W.á^.&. 000180
 037D0657 38260A5E C4000283 01180506 57882604 478826FC 5EC40A57 89260847 G.&.W.á^=&.G.&.W.....@.á^.&;W.). 0001A0
 83011805 06578826 04478826 FC5EC400 1FE90377 04473826 0009E903 7E002DE9 Ö-.-.Ö..&;G.w.Ö..á^=&.G.&.W..... 0001C0
 8926105E C4065788 26044788 260A5EC4 0016E90E 5789260C 47892610 5EC40002 @.á^.&.G.&.W.Ö..á^.&.G.&.W.á^.&. 0001E0

Dump of file SATURN:[PCCOMMON.DUMP.DLL]DAD.TMP;1 on 18-APR-1990 10:40:03.08
File ID (551,9,0)   End of file block 267 / Allocated 268

Virtual block number 129 (00000081), 512 (0200) bytes

 F709CFA7 FF2E93C0 03001CE9 03760009 3D00012D 0027E900 2AE90E57 89260C47 G.&.W.Ö°.Ö'.-..=..v.Ö...á...Iü.% 000000
 00C8CBC9 5F5E1F00 00E90000 8808FA08 38059809 E3077C06 80053909 E3065A05 .Z.Ö.9.§.|.Ö...;.°.¡..Ö...^_èüà. 000020
 89DA8E1E F088F888 105EC408 57882606 5EC4088E 04FF881E 56570000 ..WV.¡...Aá^.&.G.&.W.á^..«.5..Ö¿ 000040
 E9025789 26078926 105EC402 57882607 88260A5E C4011AE9 0E4688 1F A5F20008 ..·E..F.Ö..á^.&..&.W.á^.&..&.W.Ö 000060
 88260A5E C40111E9 06578926 04478926 105EC406 57882604 4788260A 5EC4012A °.á^.&.G.&.W.á^.&.G.&.W.Ö..á^.&. 000080
 5EC40657 88260447 88260A5E C400F9E9 0A578926 08478926 105EC402 57882607 .&.W.á^.&.G.&.W.Ö°.á^.&.G.&.W.á^ 0000A0
 02578926 07892610 5EC40257 88260788 260A5EC4 00E0E90E 5789260C 47892610 .&.G.&.W.ÖA.á^.&..&.W.á^.&..&.W. 0000C0
 26078826 0A5EC400 83E90657 89260447 8926105E C4065788 26044788 260A5EC4 á^.&.G.&.W.á^.&.G.&.W.Ö°.á^.&..& 0000E0
 260C4789 26105EC4 06578826 04478826 0A5EC402 57892607 8926105E C4025788 .W.á^.&..&.W.á^.&.G.&.W.á^.&.G.& 000100
 88260A5E C40A5789 26084789 26105EC4 02578826 0788260A 5EC40086 E90E5789 .W.Ö..á^.&..&.W.á^.&.G.&.W.á^.&. 000120
 5EC40257 88260788 260A5EC4 0058E906 57892604 47892610 5EC40657 88260447 G.&.W.á^.&.G.&.W.Öx.á^.&..&.W.á^ 000140
 E90E5789 260C4789 26105EC4 06578826 04478826 0A5EC40A 57892608 47892610 .&.G.&.W.á^.&.G.&.W.á^.&.G.&.W.Ö 000160
 0A18085C 0A630A32 0848A7FF 2E93C003 001CE903 76000930 00012000 27E9002A °.Ö'.-..=..v.Ö...á...IH.2.c.\... 000180
 F6881E56 5700002C C8C8C95F 5E1F0000 E9000088 08040A06 0A48085C 0AA90A7C |.`.\.K.@...¡..Ö...^_èüà...WV.¡- 0001A0
 260A5EC4 EE5689EC 46890257 88260788 260A5EC4 E44689E6 46890000 88088E09 ..A¡...Fì.Föá^.&..&.Ü..Fâ.VVá^.& 0001C0
 5EC4E656 89E44689 10578826 0E478826 065EC4EA 5689E846 89065788 26044788 .G.&.W..FÖ.Vöá^.&.G.&.W..FÖ.VIá^ 0001E0
```

Dump of file SATURN:[PCCOMMON.DUMP.DLL]DAD.TMP;1 on 18-APR-1990 10:40:03.08
File ID (551,9,0)   End of file block 267 / Allocated 268

Virtual block number 130 (00000082), 512 (0200) bytes

```
57882604 47882614 5FC426E4 5EC4FA56 89F84689 02578826 07882614 5FC4`6E4 Ô&_.&..&.W..F%.V'á^Ô&_.&.G.&.W 000000
26E45EC4 DE5689UC 46890A57 88260847 8826145F C426E45E C4F25689 F0468X06 ..FÞ.V á^Ô& .&.G.&.W..FÉ.V8á^Ô& 000020
7D001CE9 037EEE56 39FA5688 F8468806 56890446 890E5788 260C4788 26145FC4 á .&.G.&.W..FÅ.V∎.F%.V'9VŸ-.Ö..) 000040
5688DC46 880027E9 EE5689EC 4689FA56 88F84688 000FE903 72EC4639 0008E903 .Ö..9F$r.Ö...F%.V'.F$.VŸÖ'..FÉ.V 000060
89EC4689 DE5688DC 4688000C E90377EC 46390008 E9037E00 19E9037D EE56390E 89VŸ).Ö..-.Ö..9F$w.Ö...FÉ.V8.F$. 000080
F0468800 0FE90372 E8463900 08E9037D 001CE903 7EEA5639 F25688F0 4688EE56 VŸ.FÞ.V 9Võ~.Ö..).Ö..9FÒr.Ö...FÞ 0000A0
390008E9 037E0019 E9037DEA 56390656 88D44688 0027E9EA 5689E846 89F25688 .V .FÒ.VõÖ'..F$.V∎9Võ).Ö..~.Ö..9 0000C0
58E9037D EE5639FA 5688F846 88EA5689 E8468906 56880446 88000CE9 0377E846 FÒw.Ö...F$.V∎.FÒ.Võ.F%.V'9VŸ).ÖX 0000E0
EB01089A 5052FA56 18F8462B EE5688EC 46880148 E90377EC 46390008 E9037E01 .~.Ö..9F$w.ÖK..F$.VŸ+F%.V'RP...$ 000100
04C48300 0701089A 50520E56 18DC462B EE5688EC 4688FE56 89FC4689 04C4830C ..á..F∎.Vz.F$.VŸ+FÉ.V8RP......á. 000120
89F44689 04C48300 2301089A 5052F256 18F0462B EA5688E8 4688E256 89E04689 .FÅ.Vã.FÒ.Võ+FÞ.V RP...#..á..F¶. 000140
468BDA56 89D84689 04C483FF FF01089A 50520656 18D4462B EA5688E8 4688F656 V~.FÒ.Võ+F$.V∎RP......á..FÄ.VÖ.F 000160
39F6568B F4468800 45E90372 FC463900 08E9037D 0052E903 7EFE5639 E25688E0 Å.Vä9Vz-.ÖR.).Ö..9F∎r.ÖE..F¶.V~9 000180
E9037EFE 56390A56 88D84688 002AE903 72FC4639 0008E903 7D0037E9 037EFE56 Vz~.Ö7.).Ö..9F∎r.Ö*..FÄ.VÖ9Vz-.Ö 0001A0
4688007B E9EE5689 EC4689FA 5688F846 88000FE9 0372FC46 390008E9 037D001C ..).Ö..9F∎r.Ö...F%.V'.F$.VŸÖ(..F 0001C0
390A5688 D8468800 2AE90372 F4463900 08E9037D 0037E903 7EF65639 E25688E0 Å.Vä9V--.Ö7.).Ö..9F¶r.Ö*..FÄ.VÖ9 0001E0
```

Dump of file SATURN:[PCCOMMON.DUMP.DLL]DAD.TMP;1 on 18-APR-1990 10:40:03.08
File ID (551,9,0)   End of file block 267 / Allocated 268

Virtual block number 131 (00000083), 512 (0200) bytes

```
EA5689E8 4689F256 88F04688 000FE903 72F44639 0008E903 7D001CE9 037EF656 V--.Ö..).Ö..9F¶r.Ö...FÞ.V .FÒ.Võ 000000
4688000F E90372E0 46390008 E9037D00 1CE9037E E256390A 56880846 880036E9 Ö6..FÄ.VÖ9Vä~.Ö..).Ö..9FÄr.Ö...F 000020
88EC4688 0A5EC4EA 5689E846 89065688 04468800 0CE9EE56 89EC4689 DE56880C É.V8.F$.VŸÖ...FÅ.V∎.FÒ.Võá^..F$. 000040
0000E900 00880657 89260447 8926EA56 88E84688 0A5EC402 57892607 8926EE56 VŸ&..&.W.á^..FÒ.Võ&.G.&.W.¡..Ö.. 000060
28260E5E C402578B 26078826 065EC408 8E086F88 1E565700 0000C8C8 C95F5E1F .^_èùà...WV.¡o..Äá^.&..&.W.á^.&+ 000080
472B260E 5EC40657 88260447 8826065E C4025789 26078926 0A5EC402 57182607 .&.W.á^.&..&.W.á^.&.G.&.W.á^.&+G 0000A0
28260E5E C40A5788 26084788 26065EC4 06578926 04478926 0A5EC406 57182604 .&.W.á^.&.G.&.W.á^.&.G.&.W.á^.&+ 0000C0
28260E5E C40E5788 260C4788 26065EC4 0A578926 08478926 0A5EC402 57182607 .&.W.á^.&.G.&.W.á^.&.G.&.W.á^.&+ 0000E0
000000C8 C8C95F5E 1F0000E9 0000880E 5789260C 4789260A 5EC40657 18260447 G.&.W.á^.&.G.&.W.¡..Ö...^_èùà... 000100
26065EC4 02571326 0703260E 5EC40257 88260788 260A5EC4 D88E0E3D 881E5657 WV.¡=..Äá^.&..&.W.á^.&..&.W.á^.& 000120
26065EC4 06571326 04470326 0E5EC406 57882604 4788260A 5EC40257 89260789 ..&.W.á^.&.G.&.W.á^.&.G.&.W.á^.& 000140
26065EC4 02571326 0703260E 5EC40A57 88260847 88260A5E C4065789 26044789 .G.&.W.á^.&.G.&.W.á^.&..&.W.á^.& 000160
065EC406 57132604 4703260E 5EC40E57 88260C47 88260A5E C40A5789 26084789 .G.&.W.á^.&.G.&.W.á^.&.G.&.W.á^. 000180
C7D88E0E D4881E56 57000014 C8C8C95F 5E1F0000 E9000088 0E578926 0C478926 &.G.&.W.¡..Ö...^_èùà...WV.¡&..Äú 0001A0
145FC426 065EC401 55E90375 0C470826 0A478826 065EC400 01FE46C7 0000EC46 F$..úFz..á^.&.G.Ī.G.u.ÖU.á^.&á_. 0001C0
88260447 8826145F C426065E C4F05689 EE468900 D2830014 05025788 26078826 &..&.W.....∎..FŸ.VÞá^.&á_.&.G.Ī. 0001E0
```

Dump of file SATURN:[PCCOMMON.DUMP.DLL]DAD.TMP;1 on 18-APR-1990 10:40:03.08
File ID (551,9,0)   End of file block 267 / Allocated 268

Virtual block number 132 (00000084), 512 (0200) bytes

```
0014200A 57882608 47882614 5FC42606 5EC4F456 89F24689 00028300 14050657 W.....∎..F .V¶á^.&á_.&.G.&.W.-.. 000000
4689000A 8300142D 0E578826 0C478826 145FC426 065EC4F8 5689F646 89000A83 .Ö..F-.V%á^.&á_.&.G.&.W.-....Ö..F 000020
30EC4689 08C48310 85447A9A 0A77FF26 0C77FF26 065EC450 16EE4680 FC5689FA *.V∎.FŸ.Pá^.&.W.&.W..zD....á..F$= 000040
FFFF9A50 16FE4680 2877FF26 2A77FF26 065EC400 C7E9EC46 880006E9 03750000 ..u.Ö...F$Öú.á^.&.w*&.W(.Fz.P... 000060
00003008 C483FFFF 00009A02 77FF2604 77FF2606 5EC4EC76 FF526AEC 46890000 ...F$jR.v$á^.&.W.&.W.......á.=.. 000080
003C7F83 260A5FC4 26065EC4 003AE903 7500FE7E 830089E9 EC468800 06E90375 u.Ö...F$Ö...~z.u.Ö:.á^.&á_.&..<. 0000A0
00003DEC 468906C4 8310C848 009A0A77 FF260C77 FF26065E C4006A00 29E90375 u.Ö).j.á^.&.w.&.w...Hà..á..F$=.. 0000C0
83260A5F C426065E C40037E9 037400FE 7E830040 E90049E9 EC468800 06E90375 u.Ö...F$Ö1.Öa..~z.t.Ö7.á^.&á_.&. 0000E0
EC468906 C483FFFF 48009A0A 77FF260C 77FF2606 5EC4026A 0026E903 75023C7F .<.u.Ö&.j.á^.&.w.&.w...H...á..F$ 000100
1E565700 0032C8C* C95F5E1F 0000E900 00880006 E9EC4688 0006E903 75000030 =..u.Ö...F$Ö..¡..Ö...^_èùà2..WV. 000120
26065EC4 F44689F. 46890000 88E04689 E2468900 00880000 DE46C708 8E0F6888 ¡k..ÄúFB..¡...Fà.FÄ¡...F-.F¶á^.& 000140
FF260A77 FF26E05E C40000F6 46C702A8 F446C7E2 5689E046 89045788 26024788 .G.&.W...FÄ.VäúF¶ .úF-..á^Ä&.w.&. 000160
83104800 009AE076 FFE276FF DE76FF52 6ADE4689 0000FFFF 9A5016CE 468D0877 w..Fö.P......F8jR.v8.vä.vÅ...H.. 000180
89F84689 F65618F4 46280056 88CE4688 0084E90E 46880006 E9037500 003D08C4 á.=..u.Ö...FÞÖÇ..Fö.VÅ+F¶.V-.F%. 0001A0
468D5016 F8468008 77FF260A 77FF26E0 5EC4FE56 89FC4689 D4568802 4688FA56 V'.F∎.VÅ.F∎.Vzá^Ä&.w.&.w..F%.P.F 0001C0
003D08C4 83114000 009AE076 FFE276FF DE76FF52 6ADE4689 0000FFFF 9A5016F8 %.P......F8jR.v8.vä.vÅ...H..á.=. 0001E0
```

Dump of file SATURN:[PCCOMMON.DUMP.DLL]DAD.TMP;1 on 18-APR-1990 10:40:03.08
File ID (551,9,0) End of file block 267 / Allocated 268

Virtual block number 133 (00000085), 512 (0200) bytes

```
4689FE56 88FC4688 E65689E4 4689FA56 88F84688 0058E9DE 46880006 E9037500 .u.Ö...F8ÖX..F%.V°.F8.V|.F•.V±.F 000000
8300C805 EA5689E8 4688EE56 89EC4689 00D28301 9005E656 88E44688 EA5689E8 Ö.Vö.FÖ.V|....@..F&.VŸ.FÖ.Vö.à.. 000020
4688DE46 8908C483 1007138C 9A0676FF 0876FF50 16E4468D F25689F0 46890002 @..FÞ.V·.FÖ.P.v..v.......á..F@.F 000040
0788260A 5EC40000 EE46C7D8 8E10F188 1E565700 0012C8C8 C95F5E1F 0000E90E 8Ö...^_èùà...WV.íÞ..ÄúFŸ..á^.&.. 000060
C426065E C4F65689 F4468906 57882604 4788260A 5EC4F256 89F04689 02578826 &.W..FÞ.V·á^.&.G.&.W..F¶.V-á^.&á 000080
4689F256 13F04603 02571826 07282614 5FC42606 5EC40A57 88260847 8826145F .&.G.&.W.á^.&á_.&+.&.W..FÞ.V·.F 0000A0
18260447 2826145F C426065E C40E5788 260C4788 26145FC4 26065EC4 FA5689F8 %.V°á^.&á_.&.G.Ï.W.á^.&á_.&+G.&. 0000C0
C4831206 138C9A06 76FF0876 FF5016F0 468DFE56 89FC4689 F65613F4 46030657 W..F¶.V-.F•.V±.FÞ.P.v..v.......á 0000E0
0000FE46 C7D88E12 21881E56 57000002 C8C8C95F 5E1F0000 E9EE4688 EE468908 ..FŸ.FYÖ...^_èùà...WV.í|..ÄúF±.. 000100
47882606 5EC41FA5 F2000889 DA8E1EF0 88F8880C 56880A46 88145FC4 26065EC4 á^.&á_..F..V_.=.Þ..Ö¿..·E.á^.&.G 000120
0000FFFF 9A0A76FF 0C76FF18 77FF261A 77FF2606 5EC4003F E903751A 47082618 .&.G.ū.Ö?.á^.&.w.&.w..v..v...... 000140
03750000 3008C483 11A90000 9A0277FF 260477FF 26065EC4 FE76FF52 6AFE4689 .F±jR.v±á^.&.w.&.w....`..á.*..u. 000160
5FC42602 5FC42606 5EC4003B E9037500 307F8326 065EC400 4EE9FE46 880006E9 Ö...F±ÖN.á^.&..0.u.Ö;.á^.&á_.&á_ 000180
5FC42606 5EC41077 FF261277 FF26025F C426065E C40026E9 0375000E 7F832610 .&....u.Ö&.á^.&á_.&.w.&.w.á^.&á_ 0001A0
00008EC8 C8C95F5E 1F0000E9 00008808 C483FFFF 086A9A08 77FF260A 77FF2602 .&.w.&.w.;j....á¯|..Ö...^_èùà... 0001C0
88D44689 D6468900 0088E446 89E64689 00008800 00CE46C7 D88E12C7 881E5657 WV.|ú..ÄúFö..|...F|.FÖ|...F•.Fà| 0001E0
```

Dump of file SATURN:[PCCOMMON.DUMP.DLL]DAD.TMP;1 on 18-APR-1990 10:40:03.08
File ID (551,9,0) End of file block 267 / Allocated 268

Virtual block number 134 (00000086), 512 (0200) bytes

```
46890457 88260247 8826065E C4FF7686 89FF7886 89000088 D846890A 46890000 ...FÖ.FÄ|....x...v.á^.&.G.&.W..F 000000
26064788 26065EC4 DA5689D8 46892D57 88262847 88261FC4 26045EC4 D6568904 &.Vøá^&&á.&.G+&.W-.FÄ.VÖá^.&.G.& 000020
26E45EC4 E65689E4 46891657 88261447 8826065E C4FF7896 89FF7686 89085788 .W...v...x.á^.&.G.&.W..FÖ.V|á^Ö& 000040
E45EC4EA 5689E846 89065788 26044788 26E45EC4 EE5689EC 46890257 88260788 ..&.W..F&.VŸá^Ö&.G.&.W..FÖ.Vöá^Ö 000060
C4CC5689 CA46890E 5788260C 478826E4 5EC4D256 89004689 0A578826 08478826 &.G.&.W..FÄ.Vøá^Ö&.G.&.W..Fö.Vøá 000080
FF728689 06578826 04478826 0A5EC4FF 7C9689FF 7A868902 57882607 88260A5E ^.&..&.W...z...|.á^.&.G.&.W...r. 0000A0
0E578826 0C478826 0A5EC4E2 5689E046 890A5788 26084788 260A5EC4 FF749689 ..t.á^.&.G.&.W..FÄ.Väá^.&.G.&.W. 0000C0
46880044 E90374FF 7C963900 4DE90374 FF7A8639 EE5688EC 46880E56 89DC4689 .FÉ.V8.F&.VŸ9.z.t.ÖM.9.|.t.ÖD..F 0000E0
74E04639 D25688D0 4688002C E90374FF 74963900 35E90374 FF728639 EA5688E8 Ö.Vö9.r.t.Ö5.9.t.t.Ö,..FÄ.Vø9FÄt 000100
E90375DE 56390008 E90374DC 4639CC56 88CA4688 0016E903 74E25639 001EE903 .Ö..9Vät.Ö...Fö.Vä9FÉt.Ö..9V8u.Ö 000120
CE468900 00FFFF9A 5016FF7E 8680026A FF7686FF FF7886FF D876FFDA 76FF0141 A..vÖ.vÄ.Ñx..Ñv.j...~..P......Fö 000140
08E9CE46 880006E9 03750000 3008C483 15460000 9AD476FF D676FFCE 76FF506A jP.vö.vø.vå...F..á.=..u.Ö...FöÖ. 000160
0030CE46 890AC483 15CC03A3 9A37FF26 0277FF26 D45EC42C 6A5016FF 7E868001 ...~..Pj,á^ô&.w.&.7.É.ë..á..Fö=. 000180
7A868800 72E90374 00067F83 260C5FC4 26D45EC4 000DE9CE 46880006 E9037500 .u.Ö...FöÖ|.á^ô&á_.&....t.Ör...z 0001A0
89E25688 E04688F6 5689F446 89FF7496 88FF7286 88F25689 F04689FF 7C9688FF ...|..FÞ.V·..r...t..F¶.V-.FÄ.Vä. 0001C0
6AFF7686 FFFF7886 FFD876FF DA76FFFE 5689FC46 890E5688 DC4688FA 5689F846 F%.V°.FÉ.V8.F•.V±.vÖ.vÄ.Ñx..Ñv.j 0001E0
```

Dump of file SATURN:[PCCOMMON.DUMP.DLL]DAD.TMP;1 on 18-APR-1990 10:40:03.08
File ID (551,9,0) End of file block 267 / Allocated 268

Virtual block number 135 (00000087), 512 (0200) bytes

```
C4831326 00009AD4 76FFD676 FFCE76FF 506ACE46 890000FF FF9A5016 F0468D0A ..FÞ.P......FöjP.vö.vø.vå...&..á 000000
161012BF 9A0676FF 0876FF0A 76FF0C76 FF005AE9 CE468800 06E90375 00003008 .=..u.Ö...FöÖZ..v..v..v..v..¢... 000020
750C4708 260A4788 26065EC4 0035E9CE 46880006 E9037500 0030CE46 8908C483 .á..Fö=..u.Ö...FöÖ5.á^.&.G.&.G.u 000040
CE468800 06E90375 000030CE 468904C4 8312AC0F 639A0676 FF0876FF 001FE903 .Ö...v..v..c.¯..á..Fö=..u.Ö...Fö 000060
B80000FA 46C7D88E 1394B81E 56570000 06C8C8C9 5F5E1F00 00E90000 B80006E9 Ö..|..Ö...^_èùà...WV.|...ÄúF°..| 000080
26078826 0C5EC4FE 5689FC46 89165788 26144788 26065EC4 FC4689FE 46890000 ...F±.F=á^.Ï.G.&.W..F=.V±á^.&..& 0000A0
26044701 26FC5EC4 06578826 04478826 0C5EC402 57112607 0126FC5E C4025788 .W.á^=&..&.W.á^.&.G.&.W.á^=&.G.& 0000C0
0C478826 0C5EC40A 57112608 470126FC 5EC40A57 88260847 88260C5E C4065711 .W.á^.&.G.&.W.á^•&.G.&.W.á^.&.G. 0000E0
072826FC 5EC40A57 88260847 8826FC5E C40E5711 260C4701 26FC5EC4 0E578826 &.W.á^•&.G.&.W.á^•&.G.&.W.á^•&+. 000100
E9037504 0A7E8300 54E90372 01903000 08E9037D 0061E903 7E00FA83 02571826 &.W..•.~.Öø.).Ö..=..r.ÖT..~..u.Ö 000120
2D0A5788 26084788 26FC5EC4 001EE903 74050A7E 830009E9 0375060A 7E830012 ...~..u.Ö...~..t.Ö..á^•&.G.&.W.- 000140
83019005 02578826 078826FC 5EC4001B E9025789 26078926 FC5EC400 DA830190 ...Ö.á^•&..&.W.Ö..á^•&..&.W..... 000160
2604472B 26FC5EC4 0E578826 0C478826 FC5EC40A 57892608 478926FC 5EC400D2 @.á^=&.G.&.W.á^•&.G.&.W.á^=&+G.& 000180
12E90375 010A7E83 0056E903 7200C830 0008E903 7D0063E9 037E00FA 8306571B .W..•.~.Öc.).Ö..=à.r.ÖV..~..u.Ö. 0001A0
C820DE57 88260C47 8826FC5E C4001FE9 0374090A 7E830009 E9037505 0A7E8300 ..~..u.Ö...~..t.Ö..á^•&.G.&.W.-à 0001C0
00C80506 57882604 478826FC 5EC4001C E9065789 26044789 26FC5EC4 000A8300 ..Ö.á^=&.G.&.W.Ö..á^=&.G.&.W..à. 0001E0
```

```
Dump of file SATURN:[PCCOMMON.DUMP.DLL]DAD.TMP;1 on 18-APR-1990 10:40:03.08
File ID (551,9,0)   End of file block 267 / Allocated 268

Virtual block number 136 (00000088), 512 (0200) bytes

 5EC4003F E90375iA 47082618 47882606 5EC40E57 89260C47 8926FC5E C400D283 .@.á^=&.G.&.W.á^.&.G.&.G.u.Õ?.á^ 000000
 26065EC4 FA76FF52 6AFA4689 0000130C 9AFC76FF FE76FF18 77FF261A 77FF2606 .&.w.&.w..v±.v•......F•jR.v•á^.& 000020
 00008800 06E9FA4( 880006E9 03750000 3D08C483 151E0000 9A0277FF 260477FF .w.&.w.......á.=..u.Õ...F•Õ..¡.. 000040
 000088F8 4689FA46 39000088 D88E1646 881E5657 000008C8 CBC95F5E 1F0000E9 Õ...^_èùà...WV.¡F..Ä¡...F•.F½¡.. 000060
 88262047 8826065E C4FA5689 F8468916 57882614 47882606 5EC4FC46 89FE4689 .F±.F=á^.&.G.&.W..F½.V•á^.&.G &. 000080
 26FC5EC4 02571826 0728260A 5EC40257 88260788 26F85EC4 FE5689FC 46892257 W".F=.V±á^½&..&.W.á^.&+.&.W.á^=& 0000A0
 26FC5EC4 06571826 04472826 0A5EC406 57882604 478826F8 5EC40257 89260789 ..&.W.á^½&.G.&.W.á^.&+G.&.W.á^=& 0000C0
 26FC5EC4 02571826 0728260A 5EC40A57 88260847 88260A5E C4065789 26044789 .G.&.W.á^.&.G.&.W.á^.&+.&.W.á^=& 0000E0
 FC5EC406 57182604 4728260A 5EC40E57 88260C47 88260A5E C40A5789 26084789 .G.&.W.á^.&.G.&.W.á^.&+G.&.W.á^= 000100
 C7D88E18 20881E56 57000012 C8CBC95F 5E1F0000 E9000088 0E578926 0C478926 &.G.&.W.¡..Õ...^_èùà...WV.¡ ..Äú 000120
 88F04689 F2468900 0088FC46 89FE4689 000088F4 4689F646 89000088 0000EE46 FŸ..¡...F-.F¶¡...Fš.F=¡...F·.FÞ¡ 000140
 08478826 F45EC4F6 5689F446 89165788 26144788 26065EC4 F84689FA 46890000 ...F•.F½á^.&.G.&.W..F¶.V-á^¶&.G. 000160
 C40E5788 260C4788 26F45EC4 F25689F0 46890257 18260728 26F45EC4 0A578826 &.W.á^¶&+.&.W..FÞ.V·á^¶&.G.&.W.á 000180
 5689FC46 89225788 26204788 26065EC4 FA5689F8 46890657 18260447 2826F45E ^¶&+G.&.W..F½.V•á^.&.G &.W".F=.V 0001A0
 57882608 4788260A 5EC437FF 260277FF 26FC5EC4 0877FF26 0A77FF26 FC5EC4FE ±á^=&.w.&.w.á^=&.w.&.7á^.&.G.&.W 0001C0
 26070326 0A5EC419 EE012A9A 505219A7 01C69A50 5202571B 26072826 0A5EC40A .á^.&+.&.W.RP.ó.T.RP.*.Ÿ.á^.&..& 0001E0

Dump of file SATURN:[PCCOMMON.DUMP.DLL]DAD.TMP;1 on 18-APR-1990 10:40:03.08
File ID (551,9,0)   End of file block 267 / Allocated 268

Virtual block number 137 (00000089), 512 (0200) bytes

 260677FF 26FC5EC4 0C77FF26 0E77FF26 FC5EC402 57892607 8926F45E C4025713 .W.á^¶&..&.W.á^=&.w.&.w.á^=&.w.& 000000
 19F501C6 9A505206 57182604 4728260A 5EC40E57 88260C47 88260A5E C40477FF .w.á^.&.G.&.W.á^.&+G.&.W.RP.ó.%. 000020
 F45EC406 57892604 478926F4 5EC40657 13260447 03260A5E C40CCF01 2A9A5052 RP.*.u.á^.&.G.&.W.á^¶&.G.&.W.á^¶ 000040
 26044788 26F45EC4 0A578926 08478926 F45EC4F2 5613F046 03025788 26078826 &..&.W..FÞ.V·á^¶&.G.&.W.á^¶&.G.& 000060
 751A4708 26184788 26065EC4 0E578926 0C478926 F45EC4FA 5613F846 03065788 .W..F½.V•á^¶&.G.&.W.á^.&.G.&.G.u 000080
 FF526AEE 46890000 17E09AF4 76FFF676 FF1877FF 261A77FF 26065EC4 003FE903 .Õ?.á^.&.w.&.w...v-.v¶.Å....FŸjR. 0000A0
 EE468800 06E90375 00003008 C48317FA 00009A02 77FF2604 77FF2606 5EC4EE76 vŸá^.&.w.&.w....•..á.=..u.Õ...FŸ 0000C0
 880000F6 46C7D88E 18E8881E 56570000 0AC8C8C9 5F5E1F00 00E90000 880006E9 Õ..¡..Õ...^_èùà...WV.¡Š..ÄúF-..¡ 0000E0
 89F84689 04578826 02478826 065EC4FC 4689FE46 89000088 F84689FA 46890000 ...F•.F½¡...F±.F=á^.&.G.&.W..F½. 000100
 00008800 06E90374 26573926 000FE903 74244739 260C5688 0A468806 5EC4FA56 V•á^..F..V.&9G$t.Õ..&9W&t.Õ..¡.. 000120
 28052657 88262447 8826065E C40084E9 03752647 08262447 8826065E C401F7E9 Õ%.á^.&.G$&.G&u.ÕÇ.á^.&.G$&.W&.( 000140
 FFF676FF 526AF646 890000FF FF9A5016 FC468001 6A006A06 76FF0876 FF505200 .RP.v..v.j.j..F=.P......F-jR.v-. 000160
 FF26065E C4019FE9 F6468800 06E90375 00003008 C48318?D 00009AF8 76FFFA76 v•.v½...)..á.=..u.Õ...F-Õ..á^.&. 000180
 6AF64689 000018C9 9A006A18 77FF261A 77FF2624 5FC42606 5EC41877 FF261A77 w.&.w.á^.&á_$&.w.&.w.j..è....F-j 0001A0
 015AE9F6 46880006 E9037500 003D08C4 83180E00 009AF876 FFFA76FF F676FF52 R.v-.v•.v½...8..á.=..u.Õ...F-ÕZ. 0001C0
 46880006 E9037500 0030F646 8904C483 1C800F63 9A2477FF 262677FF 26065EC4 á^.&.w&&.w$.c....á..F-=..u.Õ...F 0001E0

Dump of file SATURN:[PCCOMMON.DUMP.DLL]DAD.TMP;1 on 18-APR-1990 10:40:03.08
File ID (551,9,0)   End of file block 267 / Allocated 268

Virtual block number 138 (0000008A), 512 (0200) bytes

 F6468900 001C4F9A 006A006A 006A1877 FF261A77 FF26065E C4003AE9 0136E9F6 -Õ6.Õ:.á^.&.w.&.w.j.j.j..O....F- 000000
 F9E9F646 880006E9 03750000 3D08C483 1C230000 9AF876FF FA76FFF6 76FF526A jR.v-.v•.v½...#..á.=..u.Õ...F-Õ• 000020
 FFFF9A06 76FF0876 FF505200 28050C56 880A4688 009DE903 750C4608 0A468800 ..F..F.u.Õ...F..V..(.RP.v..v.... 000040
 0006E903 7500003D 08C4831C 6400009A F876FFFA 76FFF676 FF526AF6 46890000 ...F-jR.v-.v•.v½...d..á.=..u.Õ.. 000060
 A89A016A 1877FF26 1A77FF26 0A5EC418 77FF261A 77FF2606 5EC40084 E9F64688 .F-ÕÇ.á^.&.w.&.w.á^.&.w.&.w.j..¨ 000080
 06E90375 00003008 C4831CC0 00009AF8 76FFFA76 FFF676FF 526AF646 89??001C ....F-jR.v-.v•.v½...å..á.=..u.Õ. 0000A0
 0006E903 7500003D F6468904 C48315EE 0F639A0A 76FF0C76 FF0073E9 F646?900 ..F-Õs..v..v..c.Ÿ..á..F-=..u.Õ.. 0000C0
 890000FF FF9A016A 006A006A 1877FF26 1A77FF26 065EC400 3AE90054 E9F64?88 .F-ÕT.Õ:.á^.&.w.&.w.j.j.j....... 0000E0
 F6468800 06E90375 00003008 C4831A80 00009AF8 76FFFA76 FFF676FF 526AF646 F-jR.v-.v•.v½......á.=..u.Õ...F- 000100
 C8CBC95F 5E1F0000 E9000088 26578926 24478926 0C5688OA 4688065E C40017E9 Õ..á^..F..V.&.G$&.W&¡..Õ...^_èùà 000120
 89FE4689 000088F8 4689FA46 89000088 0000F646 C7D88E1A A6881E56 5700000A ...WV.¡Ï..ÄúF-..¡...F•.F½¡..¯F±. 000140
 00008800 06E90374 26573926 000FE903 74244739 260C5688 0A468806 5EC4FC46 F=á^..F..V.&9G$t.Õ..&9W&t.Õ..¡.. 000160
 88262847 88261FC4 26F85EC4 FA5689F8 46890457 88260247 8826065E C40117E9 Õ..á^.&.G.&.W..F½.V•á^½&á.&.G+&. 000180
 5EC4FC76 FFFE76FF 0071E903 75264708 26244788 26065EC4 FE5689FC 46892D57 W-.F=.V±á^.&.G$&.G&u.Õq..v±.v=á^ 0001A0
 00FFFF9A 146A0677 FF260877 FF26245F C426065E C40F6A06 77FF2608 77FF2606 .&.w.&.w.j.á^.&á_$&.w.&.w.j..... 0001C0
 880006E9 03750000 3D08C483 1E1A0000 9AF876FF FA76FFF6 76FF506A F6468900 ..F-jP.v-.v•.v½¯.....á.=..u.Õ... 0001E0
```

```
. Dump of file SATURN:[PCCOMMON.DUMP.DLL]DAD.TMP;1 on 18-APR-1990 10:40:03.08
File ID (551,9,0)   End of file block 267 / Allocated 268

Virtual block number 139 (0000008B), 512 (0200) bytes

 03750000 30F64689 04C4831E 3C1E4F9A 2477FF26 2677FF26 065EC400 95E9F646 F-Ō..á^.&.w&&.w$.O.<..á..F-=..u. 000000
 77FF2606 5EC4FF76 FFFE76FF 0049E903 750C460B 0A468800 71E9F646 880006E9 Ō...F-Ōq..F..F.u.ŌI..vz.v=á^.&.w 000020
 76FF506A F6468900 00FFFF9A 146A0677 FF260877 FF260A5E C40F6A06 77FF2608 .&.w.j.á^.&.w.&.w.j.......F-jP.v 000040
 0C76FF00 10E9F646 880006E9 03750000 3008C483 1B380000 9AF876FF FA76FFF6 -.v*.v½...8..á.=..u.Ō...F-Ō...v. 000060
 C8C8C95F 5E1F0000 E9F64688 F6468908 C4831B9E 1A9E9A06 76FF0876 FF0A76FF .v..v..v.......á..F-.F-Ō...^_èùà 000080
 46890257 88260788 26145FC4 26065EC4 0000EE46 C7D88E1C F7B81E56 57000012 ...WV.¡¼..ÄúFŸ..á^.&á_.&..&.Ū..F 0000A0
 05F25688 F04688F6 5689F446 89065788 26044788 26145FC4 26065EC4 F25689F0 Þ.V.á^.&á_.&.G.&.W..F¶.V-.FÞ.V.. 0000C0
 F04680FE 5689FC4. 89000283 00C805F6 5688F446 88FA5689 F8468900 02830190 ...●..F½.V*.F¶.V-.à..●..F=.Vz.FÞ 0000E0
 06C8C8C9 5F5E1F00 00E9EE46 88EE4689 08C4831D C3138C9A 0676FF08 76FF5016 .P.v..v....ù..á..FŸ.FŸŌ...^_èùà. 000100
 261677FF 26065EC4 FC4689FE 46890000 880000FA 46C7D88E 1E57B81E 56570000 ..WV.¡W..ÄúF*..¡...Fz.F=á^.Ē.w.& 000120
 00003000 00FFFF9A 5016FC46 8D1477FF 261677FF 26065EC4 0000FFFF 9A1477FF .w......á^.&.w.&.w..F=.P.....*.. 000140
 04C4831E 8B1E4F9A FC76FFFE 76FF002F E9037500 307F8326 FC5EC400 3FE90374 t.Ō7.á^=&..0.u.Ō/..vz.v=.O.£..á. 000160
 09E9FA46 880000FF FF9A1477 FF261677 FF26065E C40016E9 03750000 3DFA4689 .F*=..u.Ō..á^.&.w.&.w.......F*Ō. 000180
 00000646 C7D88E1E D6881E56 5700002E C8C8C95F 5E1F0000 E9000088 FFA4E900 .ŌE.¡..Ō...^_èùà...WV.¡●..ÄúF●.. 0001A0
 46890000 88EC4689 EE468900 0088FC46 89FE4689 000088E4 4689E646 89000088 ¡...FÌ.FŌ¡...Fz.F●¡...FŸ.F$¡...F 0001C0
 88E04689 E2468900 0088DC46 89DE4689 000088F8 4689FA46 89000088 E84689EA ō.FŌ¡...F*.F½¡...FB.FÉ¡...Fā.FÁ¡ 0001E0

Dump of file SATURN:[PCCOMMON.DUMP.DLL]DAD.TMP;1 on 18-APR-1990 10:40:03.08
File ID (551,9,0)   End of file block 267 / Allocated 268

Virtual block number 140 (0000008C), 512 (0200) bytes

 9A5016E4 468037FF 261FC426 065EC402 46890446 89000088 D84689DA 46890000 ...FŌ.FÁ¡...Få.F●á^.&á.&.7.FŌ.P. 000000
 E9037500 003008C4 83205900 009A0676 FF0876FF 0676FF52 6AD64689 00002093 . ...F●jR.v●.v..v....Y .á.=..u.Ō 000020
 5EC40000 210F9A14 77FF2616 77FF2606 5EC4E846 89EA4689 00008804 E8E90003 ..ŌŌ.¡...Fō.FŌá^.&.w.&.w...!..á^ 000040
 83260C5E C40059E9 03740000 30000021 1F9A5016 0C468014 77FF2616 77FF2606 .&.w.&.w..FÉ.P..!..=..t.ŌY.á^É&. 000060
 D676FF52 6AD64689 000022A1 9ADC76FF DE76FF50 16E4468D 0049E903 7500307F .0.u.ŌI..FŌ.P.vB.vÉ.À"...F●jR.v● 000080
 77FF2616 77FF2606 5EC40013 E9037500 003008C4 8320A800 009A0676 FF0876FF .v..v....´ .á.=..u.Ō..á^.&.w.&.w 0000A0
 FC468037 FF261FC4 26065EC4 FF8AE900 EA568301 E8468304 64E90000 1F479A14 ..G...Ōd..FŌ..Vō.Ō..á^.&á.&.7.F● 0000C0
 00003008 C48320F8 00009A06 76FF0876 FF0676FF 526AD646 890000FF FF9A5016 .P......F●jR.v●.v..v....½ .á.=.. 0000E0
 390008E9 0374EC46 39EA568B E84688EC 4689EE46 89000088 0425E900 03E90375 u.Ō..Ō%.¡...FŸ.F$.FŌ.Vō9F&t.Ō..9 000100
 FF0676FF 526AD646 89000022 009A5016 E04680E4 76FFE676 FF01FAE9 0375EE56 VŸu.Ō*..vÌ.vō.FÁ.P.Ì"...F●jR.v●. 000120
 F49AE476 FFE676FF 0305E900 03E90375 00003008 C4832285 00009A06 76FF0876 v..v.....".á.=..u.Ō..ŌI..vÌ.vŌ.¶ 000140
 01F30A7E 810130E9 03740000 3000001F 099A5016 0C4680E4 76FFE676 FF00001E ....vÌ.vŌ.FÉ.P.....=..t.ŌO..-.µ. 000160
 037E0257 3926145F C4260C5E C4025788 26078826 145FC426 E05EC400 8DE90374 t.Ō..á^Á&á_.&..&.W.á^É&á_.&9W.-. 000180
 5EC40257 88260788 26145FC4 26E05EC4 0053E903 76073926 0008E903 7D0060E9 Ō'.).Ō..&9.v.ŌS.á^Á&á_.&..&.W.á^ 0001A0
 47882614 5FC426E0 5EC4003C E9037402 57392600 45E90374 07392614 5FC4260C É&á_.&9.t.ŌE.&9W.t.Ō<.á^Á&á_.&.G 0001C0
 03770447 39260009 E9037E00 1DE9037D 06573926 145FC426 DC5EC406 57882604 .&.Ū.á^É&á_.&9W.).Ō..-.Ō..&9G.w. 0001E0

Dump of file SATURN:[PCCOMMON.DUMP.DLL]DAD.TMP;1 on 18-APR-1990 10:··:03.08
File ID (551,9,0)   End of file block 267 / Allocated 268

Virtual block number 141 (0000008D), 512 (0200) bytes

 26E05EC4 008CE903 7401F40A 7E810096 E9E25689 E04689DE 56880C46 88000FE9 Ō...FÉ.VB.FÁ.VāŌ...-.¶.t.Ō..á^Á& 000000
 0009E903 7D0061E9 037E0657 3926145F C4260C5E C4065788 26044788 26145FC4 á .&.G.&.W.á^É&á .&9W.-.Ōa.).Ō.. 000020
 26145FC4 260C5EC4 06578826 04478826 145FC426 E05EC400 53E90376 04473926 &9G.v.ŌS.á^Á&á_.Ē.G.&.W.á^É&á_.& 000040
 C4025788 26078826 145FC426 E05EC400 37E90374 06573926 0040E903 74044739 9G.t.Ōa.&9W.t.Ō7.á^Á&á_.&..&.Ū.á 000060
 880C4688 000CE903 77073926 0008E903 7E0019E9 037D0257 3926145F C4260C5E ^É&á .&9W.).Ō..-.Ō..&9.w.Ō...FÉ. 000080
 9A5016F8 4680016A 006AE076 FFE276FF 5016E446 8DFE88E9 E25689E0 46890E56 VB.FĀ.VāŌ¡z.FŌ.P.vā.vÁj.j..F½.P. 0000A0
 E9037500 003008C4 83228600 009A0676 FF0876FF 0676FF52 6AD64689 00001823 #....F●jR.v●.v..v....Ñ".á.=..u.Ō 0000C0
 0876FFD6 76FF526A D6468900 001C0E9A E076FFE2 76FF5016 FC468002 48E90003 ..ŌH..F=.P.vā.vÁ......F●jR.v●.v. 0000E0
 F0E900EE 568301EC 46830217 E90003E9 03750000 3008C483 22F20000 9A0676FF .v.....".á.=..u.Ō..Ō...F&..VŸ.ŌÞ 000100
 9A0676FF 0876FFD6 76FF526A D6468900 00FFFF9A 50160C46 8DFC76FF FE76FFFD ».vz.v=.FÉ.P......F●jR.v●.v..v.. 000120
 5EC4E256 89E04689 DE5688DC 468801D8 E90003E9 03750000 3008C483 1DA20000 ..Å..á.=..u.Ō..ŌU..FÉ.VB.FÁ.Vāá^ 000140
 57882604 47882614 5FC4260C 5EC4F256 89F04689 02578826 07882614 5FC4260C É&á .&..&.W..FÞ.V.á^É&á_.&.G.&.W 000160
 C4260C5E C40A5689 D8468902 57882607 8826145F C4260C5E C4F65689 F4468906 ..F¶.V-á^É&á_.&..&.W..FĀ.VOá^É&á 000180
 76FFFE76 FF000020 0A9AFC76 FFFE76FF D4568902 46890657 88260447 8826145F _.&.G.&.W..FŌ.Vå.vz.v=.. ...vz.v 0001A0
 DC5EC400 70E90374 01F30A7E 81015AE9 03740000 30000020 1F9A5016 DC4680FC =.FÉ.P.. ..=..t.Ōz..-.µ.t.Ōp.á^É 0001C0
 26145FC4 26E05EC4 0017E903 74265739 260020E9 03742447 3926E256 88E04688 .FÁ.Vā&9G$t.Ō .&9W&t.Ō..á^Á&á_.& 0001E0
```

```
Dump of file SATURN:[PCCOMMON.DUMP.DLL]DAD.TMP;1 on 18-APR-1990 10:40:03.08
File ID (551,9,0)   End of file block 267 / Allocated 268

Virtual block number 142 (0000008E), 512 (0200) bytes

 F0468902 57882607 8826145F C4260C5E C40038E9 F25689F0 46890257 88260788 ..&.W..FÞ.V·Ō;.á^É&á_.&..&.W..FÞ 000000
 4688000C E90372.0 46390008 E9037D00 19E9037E F256390A 56880846 88F25689 .V·.FÁ.VÖ9V·~.Ō..).Ō¯.9FÞr.Ō...F 000020
 260021E9 03742447 3926E256 88E04688 DC5EC400 6FE9F256 89F04689 DA568808 Á.VÖ.FÞ.V·Ōo.á^É.FÁ.Vā&9G$t.Ō!.& 000040
 003CE9F6 5689F446 89065788 26044788 26145FC4 26E05EC4 0018E903 74265739 9W&t.Ō..á^Á&á_.&.G.&.W..F¶.V-Ō<. 000060
 037EF656 39045688 D24688F6 5689F446 89065788 26044788 26145FC4 260C5EC4 á^É&á_.&.G.&.W̄..F¶.V-.F●.VÅ9V--. 000080
 16F04680 F65689F4 46890456 88D24688 000CE903 72F44639 0008E903 7D0019E9 Ō..).Ō..9F¶r.Ō...F●.VÅ.F¶.V-.FÞ. 0000A0
 FC76FFFE 76FF000E E9037500 0030D646 8908C483 1F281219 9ADC76FF DE76FF50 P.vB.vÉ...+..á..F●=..u.Ō...v±.v● 0000C0
 D8468900 02830118 050A5788 26084788 26145FC4 260C5EC4 0045E900 0020729A .r ..ŌE.á^É&á_.&.G.&.W.....●..FÄ 0000E0
 46880456 89024689 00028301 18050E57 88260C47 8826145F C4260C5E C40A5689 .VÖá^É&á_.&.G̅.&.W.....●..F●.VÅ.F 000100
 189AE476 FFE676FF 0021E903 75E64608 E44688FE 8EE9E256 89E04689 DE56880C É.VB.FÁ.V̄äŌ.±.FŌ.F!u.Ō!..v!.vŌ.. 000120
 75FE4608 FC468808 C4832530 00009A06 76FF0876 FFD676FF 526A0646 89000025 %...F●jR.v●.v..v....Ō%.á..F=.F±u 000140
 00009A06 76FF0876 FFD676FF 526AD646 890000FF FF9AFC76 FFFE76FF 0021E903 .Ō!..v±.v=......F●jR.v●.v..v.... 000160
 00EE46C7 D88E1F67 881E5657 000012C8 C8C95F5E 1F0000E9 D6468808 C4831FE5 Í..á..F●Ō...^_èüÅ...WV.¡g..ÄúFŸ. 000180
 8900008B FC4689FE 46890000 88F04689 F2468900 008BF446 89F64689 00008800 .¡...F-.F¶¡..¯F·.FÞ¡...F±.F=¡... 0001A0
 1677FF26 065EC4F6 5689F446 89205788 26284788 261FC426 065EC4F8 4689FA46 F●.F%á^.&á.&.G+&.W-.F¶.V-á^.&.w. 0001C0
 00300000 23779A50 16F04680 1477FF26 1677FF26 065EC400 0023679A 1477FF26 &.w..g#..á^.&.w.&.w..FÞ.P.w#..=. 0001E0

Dump of file SATURN:[PCCOMMON.DUMP.DLL]DAD.TMP;1 on 18-APR-1990 10:40:03.08
File ID (551,9,0)   End of file block 267 / Allocated 268

Virtual block number 143 (0000008F), 512 (0200) bytes

 FF9A5016 F846800F 6A0677FF 260877FF 26F05EC4 F476FFF6 76FF00E8 E9037400 .t.ŌŌ..v-.v¶á^Þ&.w.&.w.j..F%.P.. 000000
 03E90375 00003008 C4832504 00009A06 76FF0876 FFEE76FF 506AEE46 890000FF ....FŸjP.vŸ.v..v.....%.á.=..u.Ō. 000020
 0676FF08 76FFF876 FFFA76FF 5016FC46 800061E9 0375FA46 08F84688 00AAE900 .Ō˙..F%.F●u.Ō●..F●.P.v●.v%.v..v. 000040
 E9037424 473926FE 5688FC46 88F05EC4 0040E903 75000030 0CC483FF FF00009A ......á.=..u.Ōä.á^Þ.F●.V±&9G$t.Ō 000060
 8908C483 26881A9E 9AF076FF F276FFFC 76FFFE76 FF0025E9 03752657 3926^009 ..&9W&u.Ō%..v±.v●.v·.vÞ....&.á.. 000080
 8826F05E C40030E9 0374FA46 08F84688 0038E900 41E90003 E9037500 0030E?46 FŸ=..u.Ō..ŌA.Ō;..F%.F●t.ŌŌ.á^Þ&. 0000A0
 EE468908 C483247A 1A9E9AF0 76FFF276 FF006A00 6A0020E9 03752647 08262447 G$&.G&u.Ō .j.j..v·.vÞ...z$.á..FŸ 0000C0
 FF261677 FF26065E C40010E9 037500EE 7E83FEF8 E90003E9 0003E903 75000030 =..u.Ō..Ō..Ō«±.~Ÿ.u.Ō..á^.&.w.&. 0000E0
 46C7088E 2548881E 56570000 1CC8C8C9 5F5E1F00 00E9EE46 88000024 919A1477 w...$...FŸŌ...^_èüÅ...WV.¡H%.ÄúF 000100
 FE468900 00880008 F246C7EE 4689F046 89000088 EA4689EC 46890000 880000E4 Ō..¡...F$.FŌ¡..¯FÞ.FŸúF·..¡...F± 000120
 26065EC4 0010E903 75214708 261F4788 26065EC4 E64689E8 46890000 88FC4689 .F●¡...FŌ.FÌá^.&.G.&.Glu.Ō..á^.& 000140
 EA468904 57882602 47882606 5EC40191 E9000088 0006E903 740C4708 260A4788 .G.&.G.t.Ō..¡..Ō..á^.&.G.&.W..Fō 000160
 FFFF9A50 16F44680 1F77FF26 2177FF26 065EC400 00F046C7 0008EE46 C7EC5689 .VšúFŸ..úFÞ..á^.&.wI&.w..F¶.P... 000180
 0006E903 75000030 08C48327 9C00009A EA76FFEC 76FFE476 FF526AE4 46890000 ...FŌjR.vŌ.vš.vō....'.á.=..u.Ō.. 0001A0
 526AE446 890000FF FF9A5016 F24680 1F 77FF2621 77FF2606 5EC40130 E9E44688 .FŌŌ=.á^.&.wI&.w..F·.P......FŌjR 0001C0
 C40104E9 E4468800 06E90375 00003008 C48325E4 00009AEA 76FFEC76 FFE476FF .vŌ.vš.vō...Ō%.á.=..u.Ō...FŌŌ..á 0001E0

Dump of file SATURN:[PCCOMMON.DUMP.DLL]DAD.TMP;1 on 18-APR-1990 10:40:03.08
File ID (551,9,0)   End of file block 267 / Allocated 268

Virtual block number 144 (00000090), 512 (0200) bytes

 C4260A5F C426065E C4FE5689 FC468902 57882607 8826285F C4260A5F C426065E ^.&á_.&á_(&..&.W..F=.V±á^.&á_.&á 000000
 13EE4603 FE5688FC 4688008A E9F2468B E85689E6 46890657 88260447 8826285F _(&.G̅.&.W̅..F!.VÒ.F·Ō...F=.V±̄.FŸ. 000020
 F44601F0 5688EE46 880090E9 FA5611F8 4601F056 88EE4688 F65619F4 4629F056 V̄Þ)F¶.V-.FŸ.VÞ.F%.V●Ō...FŸ.VÞ.F¶ 000040
 4601F056 88EE4688 006FE9FA 5619F846 29F05613 EE4603E8 5688E646 88F65611 .V-.F!.VÒ.FŸ.VÞ)F%.V●Ōo..FŸ.VÞ.F 000060
 29F05613 EE4603FE 5688FC46 880054E9 FA5611F8 4601F056 88EE4688 F65611F4 ¶.V-.FŸ.VÞ.F%.V●ŌT..F=.V±.FŸ.VÞ) 000080
 0027E900 2AE9002D E9FA5619 F84629F0 5613EE46 03E8568B E64688F6 5619F446 F¶.V-.F!.VÒ.FŸ.VÞ)F%.V●Ō-.Ō●.Ō'. 0000A0
 6A282828 4327E628 6A282828 432883A7 FF2E93C0 03FFEFE9 03760009 3000012D -..=..v.Ōy..à...Ï.(C(((j(!'C(((j 0000C0
 E44688E4 468908C4 83264A29 639A0676 FF0876FF 5016F446 8D282828 43280728 (.(C((((.F¶.P.v..v..c)J&.á..FŌ.FŌ 0000E0
 0A4788 26 065EC400 00EE46C7 D88E26CA 881E5657 000012C8 CBC95F5E 1F0000E9 Ō...^_èüÅ...WV.¡Ō&.ÄúFŸ..á^.&.G. 000100
 C4F25689 F0468902 57882607 88260A5E C4007FE9 00008800 06E90374 0C470826 &.G.t̄.Ō..¡..Ō..á^.&..&.W..FÞ.V·á 000120
 88260788 26285FC4 260A5FC4 26065EC4 F65689F4 46890657 88260447 88260A5E ^.&.G.&.W..F¶.V-á^.&á_.&á_(&..&. 000140
 57882604 47882628 5FC4260A 5FC42606 5EC4FA56 89F84689 F25613F0 46030257 W..FÞ.V·.F%.V●á^.&á_.Ï&á_(Ï.G.&.W 000160
 447A9A0A 77FF260C 77FF2606 5EC45016 F0468DFE 5689FC46 89F65613 F4460306 ..F¶.V-.F●.V±.FÞ.Pá̄^.&.w̄.&.w..zD 000180
 C7D88E28 C0881E56 57000066 C8C8C95F 5E1F0000 E9EE4688 EE468908 C48328A5 É(.á..FŸ.FŸŌ...^_èüàf..WV.¡à(.Áú 0001A0
 88F04689 F2468900 008BEC46 89EE4689 000088E8 4689EA46 89000088 0000E646 F!..¡...FŌ.FŌ¡..¯FŸ.F$¡...F·.FÞ¡ 0001C0
 260A5FC4 26065EC4 0059E903 750C4708 260A4788 26065EC4 F44689F6 46890000 ...F-.F¶á^.&.G.&.G.u.ŌY.á^.&á_.& 0001E0
```

Dump of file SATURN:[PCCOMMON.DUMP.DLL]DAD.TMP;1 on 18-APR-1990 10:40:03.08
File ID (551,9,0)   End of file block 267 / Allocated 268

Virtual block number 145 (00000091), 512 (0200) bytes

```
E9037407 39260A5E C402578B 26078826 EC5EC4EE 5689EC46 892E578B 262C478B .G,&.W..F&.V¥á^&&..&.W.á^.&9.t.Ö 000000
E9037404 47392A0A 5EC40657 8B260447 8826EC5E C40026E9 03740257 3926002F /.&9W.t.Ö&.á^&&.G.&.W.á^.&9G.t.Ö 000020
89E84689 04578826 02478826 065EC401 37E90000 880006E9 03740657 3926000F ..&9W.t.Ö..¡..Ö7.á^.&.G.&.W..FÒ. 000040
F4468902 578B2607 8826E85E C4F25689 F046890E 578B260C 478B26E8 5EC4EA56 Võá^Ö&.G.&.W..FÞ.V·á^Ö&..&.W..F¶ 000060
50169A46 8D026A06 77FF2608 77FF2606 5EC42877 FF262077 FF26F45E C4F65689 .V-á^¶&.w-&.w+á^.&.w.&.w.j..F..P 000080
03750000 3008C483 2A890000 9AE876FF EA76FFE6 76FF506A E6468900 0015099A ......FljP.vl.võ.vò....*.á.=..u. 0000A0
46890AC4 83280803 A39AF476 FFF676FF 2F6A5016 9A468000 8FE9E646 880006E9 Ö...FlÖ¢..F..Pj/.v-.v¶.Ê..+.á..F 0000C0
7400067F 83260C5F C4262F5F C426F45E C40099E9 E6468800 06E90375 000030E6 l=..u.Ö...FlÖ..á^¶&á_/&á_.&....t 0000E0
8906578B 2604478B 260A5EC4 FA5689F8 46890257 8B26078B 260A5EC4 0067E903 .Ög.á^.&..&.W..F%.V°Ā^.&.G.&.W.. 000100
F8468D08 6A0677FF 260877FF 26065EC4 2877FF26 2077FF26 F45EC4FE 5689FC46 F=.V±á^¶&.w-&.w+á^.&.w.&.w.j..F% 000120
00003008 C4832763 0r009AE8 76FFEA76 FFE676FF 506AE646 89000015 879A5016 .P.ñ....FljP.vl.võ.vò...c'.á.=.. 000140
8908C483 29502888 9A0676FF 0876FF0A 76FF0C76 FF001DE9 E6468800 06E90375 u.Ö...FlÖ...v..v..v..v..¡(P).á.. 000160
5EC40000 FE46C7D8 8E296888 1E565700 0002C8C8 C95F5E1F 0000E9E6 4683E646 Fl.FlÖ...^_èüà...WV.¡k).ÄúF±..á^ 000180
9A0A76FF 0C76FF1F 77FF2621 77FF2606 5EC4004F E9037521 4708261F 4786?606 .&.G.&.Glu.Öo.á^.&.wl&.w..v..v.. 0001A0
26065EC4 FE76FF52 6A007BE9 00008800 06E90374 8E09FE7E 81FE4689 0000FFFF .....F±.~±..t.Ö..¡..Ö(.jR.v±á^.& 0001C0
065EC400 55E9FE46 880006E9 03750000 3008C483 28E90000 9A0277FF 260477FF .w.&.w....Ö+.á.=..u.Ö...F±ÖU.á^. 0001E0
```

Dump of file SATURN:[PCCOMMON.DUMP.DLL]DAD.TMP;1 on 18-APR-1990 10:40:03.08
File ID (551,9,0)   End of file block 267 / Allocated 268

Virtual block number 146 (00000092), 512 (0200) bytes

```
FF9A0A76 FF0C76FF 1B77FF26 1D77FF26 065EC400 3FE90375 1D470826 1B478826 &.G.&.G.u.Ö?.á^.&.w.&.w..v..v... 000000
003D08C4 832A6600 009A0277 FF260477 FF26065E C4FE76FF 526AFE46 890000FF ....F±jR.v±á^.&.w.&.w....f*.á.=. 000020
45881E56 5700006A C8C8C95F 5E1F0000 E9000088 0006E9FE 46880006 E9037500 .u.Ö...F±Ö..¡..Ö...^_èüàj..WV.¡E 000040
F6468900 0088E846 89EA4689 000088E4 4689E646 89000088 0000E246 C7D88E28 +.ÄúFã..¡...Fl.FÖ¡...FÖ.FÒ¡...F- 000060
751D470B 261B478B 26065EC4 E65689E4 46890457 8B260247 8826065E C4F44689 .F¶á^.&.G.&.W..FÖ.Vlá^.&.G.&.G.u 000080
76FF526A E2468900 00FFFF9A 5016EC46 8D1B77FF 261D77FF 26065EC4 0074E903 .Öt.á^.&.w.&.w..F&.P......FãjR.v 0000A0
0A5EC401 B1E9E246 880006E9 03750000 3008C483 2D400000 9AE476FF E676FFE2 ã.vl.vö...M-.á.=..u.Ö...FãÖÝ.á^. 0000C0
F25688F0 46880A5E C40021E9 03740257 3926002A E9037407 3926EE56 8BEC4688 .F&.V¥&9.t.Ö*.&9W.t.Öl.á^..FÞ.V· 0000E0
262177FF 26065EC4 0176E900 00880006 E9037406 57392600 0FE90374 04473926 &9G.t.Ö..&9W.t.Ö..¡..Öv.á^.&.wl& 000100
4DE90000 880006E9 03748E09 E27E81E2 46890000 2B709A0A 76FF0C76 FF1F77FF .w..v..v..p+...Fã.~ã..t.Ö..¡..ÖM 000120
07882602 5FC42606 5EC4EA56 89E84689 0E578826 0C478826 025FC426 065EC401 .á^.&á_.&.G.&.W..FÖ.Võá^.&á_.&.. 000140
0677FF26 0877FF26 065EC428 77FF2620 77FF26F4 5EC4F656 89F44689 02578826 &.W..F¶.V-á^¶&.w-&.w+á^.&.w.&.w. 000160
832D7000 009AE476 FFE676FF E276FF50 6AE24689 00002A51 9A501696 4680026A j..F..P.Q*...FãjP.vã.vl.vö...p-. 000180
03A39AF4 76FFF676 FF2E6A50 16964680 000EE9E2 46880006 E9037500 003008C4 á.=..u.Ö...FãÖ8..F..Pj..v-.v¶.Ê. 0001A0
5FC4262F 5FC426F4 5EC40088 E9E24688 0006E903 7500003D E246890A C4832B9A .+.á..Fã=..u.Ö...FãÖ¡.á^¶&á_/&á_ 0001C0
88260A5E C4FA5689 F8468902 578B2607 88260A5E C40067E9 03740006 7F83260C .&....t.Ög.á^.&..&.W..F%.V°Ā^.&. 0001E0
```

Dump of file SATURN:[PCCOMMON.DUMP.DLL]DAD.TMP;1 on 18-APR-1990 10:40:03.08
File ID (551,9,0)   End of file block 267 / Allocated 268

Virtual block number 147 (00000093), 512 (0200) bytes

```
FF260877 FF26065E C42877FF 262D77FF 26F45EC4 FE5689FC 46890657 8B260447 G.&.W..F=.V±á^¶&.w-&.w+á^.&.w.&. 000000
7A00009A E476FFE6 76FFE276 FF506AE2 46890000 2AF39A50 16F8468D 096A0677 w.j..F%.P.µ*...FäjP.vä.vl.vö...z 000020
309A0676 FF0876FF 0A76FF0C 76FF003C E9E2468B 0006E903 7500003D 08C4832C ,.á.=..u.Ö...Fäö<..v..v..v..v..= 000040
26C29A06 76FF0876 FF0017E9 E2468B00 06E90375 000030E2 468908C4 832E3028 +0..á..Fä=..u.Ö...Fäö...v...v..ö& 000060
C7D88E2C 0F881E56 57000006 C8CBC95F 5E1F0000 E9E2468B E2468904 C4832B2A *+.á..Fä.Fäö...^_èüà...WV.¡..,.Äú 000080
880006E9 00008A00 01880009 E9037500 0A7E83FC 4689FE46 89000088 0000FA46 F*..¡...F±.F«.-.u.Ö..¡..¤..Ö..¡ 0000A0
065EC428 77FF2620 77FF261F C426025F C426065E C4FE5689 FC468900 008A0000 ..¤...F=.V±á^.&á .&á.&.w-&.w+á^. 0000C0
26065EC4 FA76FF50 6AFA4689 00002D0A 9A5016FC 468D036A 0677FF26 0877FF26 &.w.&.w.j..F=.P.Ö-...F*jP.v*á^.& 0000E0
065EC400 10E9FA46 880006E9 03750000 3008C483 2DEF0000 9A0277FF 260477FF .w.&.w....ÿ-.á.=..u.Ö...F*Ö..á^. 000100
46C7D88E 2E4B881E 56570000 02C8C8C9 5F5E1F00 00E90000 88184789 260A4688 .F.&.G.¡..Ö...^_èüà...WV.¡K..ÄúF 000120
E9FE4689 00002F20 9A006A1F 77FF2621 77FF2606 5EC40063 E99B0A46 8A0000FE ±...F..Öc.á^.&.wl&.w.j.. /...F±Ö 000140
77FF2606 5EC4004E E9FE4689 00002F38 9A016A1F 77FF2621 77FF2606 5EC40066 f.á^.&.wl&.w.j..8/...F±ÖN.á^.&.w 000160
9A006A1F 77FF2621 77FF2606 5EC40036 E9FE4689 00002F50 9A026A1F 77FF2621 1&.w.j..P/...F±Ö6.á^.&.wl&.w.j.. 000180
005830FF 8DE90375 004930FF C5E90375 00413000 18E9001E E9FE4689 0000FFFF .....F±Ö..Ö..=A.u.Öé.=I.u.Ö..=X. 0001A0
08C4832E 8A00009A 0277FF26 0477FF26 065EC4FE 76FF526A FFCAE9FF 9DE90375 u.Ö..Öò.jR.v±á^.&.w.&.w.....¤..á. 0001C0
5E1F0000 E9000088 1A478826 0A468A06 5EC40010 E9FE4688 0006E903 75000030 =..u.Ö...F±Ö..á^..F.&.G.¡..Ö...^ 0001E0
```

```
Dump of file SATURN:[PCCOMMON.DUMP.DLL]DAD.TMP;1 on 18-APR-1990 10:40:03.08
File ID (551,9,0)   End of file block 267 / Allocated 268

Virtual block number 148 (00000094), 512 (0200) bytes

 FF261FC4 26025FF4 26065EC4 0000FE46 C7D88E2E EA881E56 57000002 C8C8C95F _èùà...WV.¡ô..ÄúF±..ó^.&ó_.&ó.&. 000000
 FE468900 002EA09A 50160A46 80066A06 77FF2608 77FF2606 5EC42877 FF262D77 w-&.w+ó^.&.w.&.w.j..F..P......F± 000020
 0006E903 75000030 08C4832F 8800009A 0277FF26 0477FF26 065EC4FE 76FF506A jP.v±ó^.&.w.&.w...../.ó.=..u.Ô.. 000040
 E9FE4688 FE468906 C4832E11 2EE29A06 76FF0876 FF50980A 468A001C E9FE4688 .F±Ô...F..P.v..v..ã....ó..F±.F±Ô 000060
 4689FE46 89000088 0000FA46 C7D88E2F 88881E56 57000006 C8C8C95F 5E1F0000 ...^ èùà...WV.¡E/.ÄúF*..¡...F±.F 000080
 16FC468D 2377FF26 2577FF26 065EC400 0025959A 2377FF26 2577FF26 065EC4FC =ó^.Ï.w%&.w#..%..ó^.&.w%&.w#.F=. 0000A0
 5EC40088 E9037522 47082620 478826FC 5EC40098 E9037400 00300000 25AA9A50 P.´%..=..t.Ô..ó^=&.G &.G"u.Ô..ó^ 0000C0
 2277FF26 FC5EC400 1DE90374 0C573926 0026E903 740A4739 26085688 064688FC =.F..V.&9G.t.Ô&.&9W.t.Ô..ó^=&.w" 0000E0
 77FF2622 77FF26FC 5EC4001A E9FA4689 0000FFFF 9A0A76FF 006A016A 2077FF26 &.w j.j..v.......F*Ô..ó^=&.w"&.w 000100
 0277FF26 0477FF26 065EC4FA 76FF526A FA468900 00308C9A 0A76FF01 6A016A20  j.j..v..¥0...F*jR.v*ó^.&.w.&.w. 000120
 00002683 9A2377FF 262577FF 26065EC4 0016E903 75000030 08C48330 0300009A ....0.ó.=..u.Ô..ó^.&.w%&.w#.°&.. 000140
 D88E303F 881E5657 000036C8 C8C95F5E 1F0000E9 000088FF 48E90009 E9FA4688 .F*Ô..ÔH.¡..Ô...^_èùàó..WV.¡?0.Å 000160
 F84689FA 46890000 88F04689 F2468900 00880046 89024689 00008800 00CE46C7 úFö..¡...F0.FÅ¡...F·.FÞ¡...F*.F½ 000180
 46890000 88CA4689 CC468900 0088DC46 89DE4689 000088F4 4689F646 89000088 ¡...F-.F¶¡...F8.FÉ¡...Fä.Fò¡...F 0001A0
 C4025689 D0468904 57882602 478826F8 5EC40000 DE46C700 140C46C7 FC4689FE ±.F=úFÉ..úF8..ó^½&.G.&.W..FÅ.V8ó 0001C0
 5689F446 89105788 260E4788 26065EC4 FA5689F8 46890C57 88260A47 8826065E ^.&.G.&.W..F½.V*ó^.&.G.&.W..F¶.V 0001E0

Dump of file SATURN:[PCCOMMON.DUMP.DLL]DAD.TMP;1 on 18-APR-1990 10:40:03.08
File ID (551,9,0)   End of file block 267 / Allocated 268

Virtual block number 149 (00000095), 512 (0200) bytes

 76FFCE76 FF526ACE 46890000 FFFF9A50 16F0468D 2077FF26 2277FF26 065EC4F6 -ó^.&.w"&.w .FÞ.P......FöjR.vö.v 000000
 478826F4 5EC40363 E9CE4688 0006E903 75000030 08C48332 4200009A D076FFD2 0.vÅ...82.ó.=..u.Ô...FoÔc.ó^¶&.G 000020
 037402F0 7E830330 E9037510 57392600 09E90374 0E473926 F85EC410 5788260E .&.W.ó^½&9G.t.Ô..&9W.u.Ô=..~Þ.t. 000040
 0032669A 5016E846 801877FF 261D77FF 26F85EC4 0328E903 7400F27E 830334E9 Ô4..-·.t.Ô+.ó^½&.w.&.w..FÒ.P.f2. 000060
 880006E9 03750000 3008C483 32780000 9AD076FF D276FFCE 76FF526A CE468900 ..FöjR.vo.v0.vÅ...(2.ó.=..u.Ô... 000080
 FF526ACE 46890000 2C659A50 16E0468D 1877FF26 1D77FF26 F45EC402 F8E9CE46 FöÔ½.ó^¶&.w.&.w..FÅ.P.e,...FöjR. 0000A0
 4688028F E9CE4688 0006E903 75000030 08C48330 F300009A D076FFD2 76FFCE76 vö.v0.vÅ...µ0.ó.=..u.Ô...FoÔ¢..F 0000C0
 89FC4689 E65618E4 4628EE56 88EC4688 CC5689CA 4689E256 18E0462B EA5688E8 Ô.Võ+FÅ.Vã.Fò.Vä.F$.VŸ+FÔ.V|.F*. 0000E0
 037EDE56 3804C483 34120108 9ACA76FF CC76FF01 41E90375 CC4608CA 4688FE56 V±.Fò.Fäu.ÔA..vä.vò....4.ó.;V8-. 000100
 88EC4688 D65689D4 4689E256 88E04688 011EE903 72DC4638 0008E903 70012BE9 Ô+.).Ô..;FÉr.Ô...FÅ.Vã.Få.V¤.F$. 000120
 0030CE46 8908C483 33560867 9AF876FF FA76FF50 1604468D DA568908 4689EE56 VŸ.FÅ.VO.Få.P.v*.v½.g.V3.ó..Fö=. 000140
 E90374E2 56390045 E90374E0 46390656 88D44688 0231E9CE 46880006 E9037500 .u.Ô...FoÔ1..Få.V¤9FÅt.ÔE.9Vãt.Ô 000160
 FA76FF50 1604468D 0027E903 74EE5639 002FE903 74EC4639 DA5688D8 4688003D =..FÅ.VO9F$t.Ô/.9VŸt.Ô'..Få.P.v* 000180
 88008CE9 01E1E9CE 46880006 E9037500 0030CE46 8908C483 33952C07 9AF876FF .V½..,.3.ó..Fö=..u.Ô...FoÔÅ.Ô... 0001A0
 FFF676FF 50160446 80DA5689 D84689E6 5688E446 88065689 D44689EA 5688E846 FÒ.Võ.Få.V¤.FÔ.V|.FÅ.VÖ.Få.P.v-. 0001C0
 5688D446 8801A2ES CE468800 06E90375 000030CE 468908C4 8333E508 679AF476 v¶.g.[3.ó..Fo=..u.Ô...FöÔÅ..Få.V 0001E0

Dump of file SATURN:[PCCOMMON.DUMP.DLL]DAD.TMP;1 on 18-APR-1990 10:40:03.08
File ID (551,9,0)   End of file block 267 / Allocated 268

Virtual block number 150 (00000096), 512 (0200) bytes

 39002CE9 0374E446 390A5688 D8468800 3AE90374 EA563900 42E90374 E84639D6 ¤9FÔt.Ô8.9Võt.Ô:..FÅ.VÖ9FÔt.Ô,.9 000000
 00003DCE 468908C4 8334522C 079AF476 FFF676FF 50160446 8D0024E9 0374E656 V|t.Ô$..Få.P.v-.v¶..,R4.ó..Fö=.. 000020
 9AFC76FF FE76FF01 3EE90375 FE4608FC 46880149 E90152E9 CE468800 06E90375 u.Ô...FoÔR.Ô|..F=.F±u.Ô>..v±.v¤. 000040
 88E84688 0118E903 72DC4638 0008E903 7D0128E9 037EDE56 3804C483 19A00108 .....ó.;V8-.Ô(.).Ô..;FÉr.Ô...FÒ. 000060
 9AF876FF FA76FF50 16D4468D DA5689D8 4689E656 88E44688 D6568904 4689EA56 Võ.Få.V¤.FÔ.V|.FÅ.VÖ.Få.P.v*.v½. 000080
 46390656 88D44688 00E5E9CE 46880006 E9037500 0030CE46 8908C483 30240867 g.$0.ó..Fö=..u.Ô...FöÔ|..Få.V¤9F 0000A0
 74E65639 002FE903 74E44639 DA5688D8 4688003D E90374EA 56390045 E90374E8 Ôt.ÔE.9Võt.Ô=..FÅ.VÖ9FÔt.Ô/.9V|t 0000C0
 E9037500 003DCE46 8908C483 34E12C07 9AF876FF FA76FF50 1604468D 0027E903 .Ô'..Få.P.v*.v½..,Ä4.ó..Fö=..u.Ô 0000E0
 D84689EE 5688EC46 88D65689 D44689E2 5688E046 88008CE9 0095E9CE 46880006 ...FöÔ..Ô...FÅ.Vã.Få.V¤.F$.VŸ.FÅ 000100
 06E90375 00003DCE 468908C4 83353108 679AF476 FFF676FF 50160446 80DA5689 .VÖ.Få.P.v-.v¶.g.15.ó..Fö=..u.Ô. 000120
 D8468800 3AE90374 E2563900 42E90374 E04639D6 56880446 880056E9 CE468800 ..FöÔV..Få.V¤9FÅt.Ô8.9Vãt.Ô:..FÅ 000140
 079AF476 FFF676FF 50160446 800024E9 0374EE56 39002CE9 0374EC46 390A5688 .VÖ9F$t.Ô,.9VŸt.Ô$..Få.P.v-.v¶.. 000160
 5F5E1F00 00E90000 880006E9 CE468800 06E90375 000030CE 468908C4 8333062C ,.3.ó..Fö=..u.Ô...FöÔ..¡..Ô...^  000180
 261A77FF 26065EC4 0008FE46 C70000FC 46C7D88E 312C881E 56570000 04C8C8C9 èùà...WV.¡,1.ÄúF=..úF±..ó^.&.w.Ï 0001A0
 77FF2604 77FF2606 5EC4FC76 FF526AFC 46890000 FFFF9A0A 76FF0C76 FF1877FF .w..v..v.......F=jR.v=ó^.&.w.&.w 0001C0
 FF260A5F C426065E C40084E9 FC468800 06E90375 00003008 C48335D6 00009A02 ....¤5.ó.=..u.Ô...F=Ô..ó^.&á_.&. 0001E0
```

```
Dump of file SATURN:[PCCOMMON.DUMP.DLL]DAD.TMP;1 on 18-APR-1990 10:40:03.08
File ID (551,9,0)   End of file block 267 / Allocated 268

Virtual block number 151 (00000097), 512 (0200) bytes

 260477FF 26065EC4 FC76FF52 6AFC4689 00002787 9A5016FE 468D1F77 FF262177 wI&.w..F±.P..'...F•jR.v•á^.&.w.& 000000
 1A77FF26 065EC400 42E9FC46 880006E9 03750000 3D08C483 36120000 9A0277FF .w.....6.á.=..u.Õ...F•Õ8.á^.&.w. 000020
 9A0277FF 260477FF 26065EC4 FC76FF52 6AFC4689 0000FFFF 9AFE76FF 1877FF26 &.w..v±......F•jR.v•á^.&.w.&.w.. 000040
 CBC95F5E 1F0000E9 00008800 06E9FC46 880006E9 03750000 3008C483 31D70000 ..•1.á.=..u.Õ...F•Õ..|..Õ...^_èù 000060
 7F832606 5EC4FC46 89FE4689 00008800 00FA46C7 D88E355A 881E5657 000006C8 à...WV.|25.ÁüF•..|...F±.F•á^.Ì.. 000080
 6AFA4689 000031C2 9A5016FC 468D2077 FF262277 FF26065E C4007CE9 03740012 ..t.Õ|.á^.&.w"&.w .F=.P.ó1...F•j 0000A0
 880006E9 03750000 3008C483 37070000 9A0277FF 260477FF 26065EC4 FA76FF52 R.v•á^.&.w.&.w.....7.á.=..u.Õ... 0000C0
 88FC4688 0021E903 77000E7E 830009E9 037E002F E9037D00 107E8300 88E9FA46 F•Õ...~..).Õ/.-.Õ...~..w.Õ1..F•. 0000E0
 0000B800 06E90376 0E463800 08E9037D 0013E903 7E105638 000A8300 012DFE56 V±-...Õ.;V.-.Õ..).Õ..;F.v.Õ..|.. 000100
 00FFFF9A 0A76FF0C 76FF006A 0E76FF10 76FF2077 FF262277 FF26065E C4004DE9 ÕM.á^.&.w"&.w .v..v.j..v..v..... 000120
 75000030 08C48335 9400009A 0277FF26 0477FF26 065EC4FA 76FF526A FA468900 ..F•jR.v•á^.&.w.&.w.....5.á.=..u 000140
 8E36388B 1E565700 0026C8C8 C95F5E1F 0000E900 00880006 E9FA4688 0006E903 .Õ...F•Õ..|..Õ...^_èùà&..WV.|86. 000160
 4689EA46 89000088 E44689E6 46890000 880C4689 DE468900 00880000 0A46C7D8 ÁüFÕ..|...Fã.FÉ|...F|.FÕ|...Fõ.F 000180
 46892257 88262047 8826065E C4FC4689 FE468900 008BE046 89E24689 000088E8 Õ|...Fã.FÁ|...F±.F•á^.&.G &.W".F 0001A0
 E9037400 127F8326 065EC40E 56890C46 89045788 26024788 26065EC4 E65689E4 õ.VÌá^.&.G.&.W..FÉ.V8á^.&....t.Õ 0001C0
 FFDA76FF 526ADA46 89000036 689A5016 FC468D20 77FF2622 77FF2606 5EC40070 p.á^.&.w"&.w .F•.P.h6...FÕjR.vÕ. 0001E0

Dump of file SATURN:[PCCOMMON.DUMP.DLL]DAD.TMP;1 on 18-APR-1990 10:40:03.08
File ID (551,9,0)   End of file block 267 / Allocated 268

Virtual block number 152 (00000098), 512 (0200) bytes

 460B0E46 8802A9E9 DA468800 06E90375 00003008 C4833682 00009ADC 76FFDE76 v8.vÉ....6.á.=..u.Õ...FÖÕ`..F..F 000000
 C13B000B 8301E9*3 FE5E88FC 4E88000D2 83000105 1056880E 46880026 E9037510 .u.Õ&..F..V.....•..N•.^±.Õ..Ü.;è 000020
 006A0E76 FF1076.. E476FFE6 76FF0272 E90000B8 0006E903 74D33800 0DE90374 t.Õ..;Ãt.Õ..|..Õr..vÌ.vð.v..v.j. 000040
 08C48338 6F00009A DC76FFDE 76FFDA76 FF526ADA 46890000 385A9A50 16F4468D .F¶.P.28...FÕjR.vÖ.v8.vÉ...o8.á. 000060
 00D28300 01051056 880E4688 E476FFE6 76FF0236 E9DA4688 0006E903 75000030 =..u.Õ...FÖÕ6..vÌ.vð.F..V.....•. 000080
 1700009A DC76FFDE 76FFDA76 FF526ADA 46890000 FFFF9A50 16EC4680 006A5052 RPj..F$.P......FÕjR.vÖ.v8.vÉ.... 0000A0
 4788260C 5FC42602 5FC42606 5EC401F2 E9DA4688 0006E903 75000030 08C4833A :.á.=..u.Õ...FÖÕ .á^.&á_.&á_.&.G 0000C0
 46894757 88264547 88260C5F C426025F C426065E C4EA5689 E8468943 57882641 A&.WC.FÕ.Võá^.&á_.&á_.&¯GE&¯WG.F 0000E0
 0375E246 08E0468B 0008E903 74EA4608 E8468800 9DE90375 00127E83 E25689E0 Á.Vã.-..u.Õ...FÕ¯FÕt¯Õ...FÁ.Fãu. 000100
 0372E846 380008E9 037D0013 E9037EEA 56380657 88260447 88260A5E C40062E9 Õb.á^.&.G.&.W.;Võ-.Õ..).Õ..;FÕr. 000120
 38065788 26044788 260A5EC4 06578926 04478926 0A5EC4E8 4688EA56 880006E9 Õ...Võ.FÕá^.&.G.&.W.á^.&.G.&.W.; 000140
 4789260A 5EC4E046 88E25688 0006E903 77E04638 0008E903 7E0013E9 037DE256 Vã).Õ..-.Õ..;FÁw.Õ...Vã.FÁá^.&.G 000160
 57882604 4788260A 5EC4FA56 89F84689 06578826 04478826 0A5EC406 57892604 .&.W.á^.&.G.&.W..F½.V•á^.&.G.&.W 000180
 005EE903 75E24608 E0468800 08E90374 EA4608E8 46880094 E9F25689 F0468906 ..Fþ.V·Õ...FÕ.FÕt.Õ...FÁ.Fãu.Õ^. 0001A0
 880006E9 0372E846 380008E9 037D0013 E9037EEA 56380257 88260788 260A5EC4 á^.&..&.W.;Võ-.Õ..).Õ..;FÕr.Õ... 0001C0
 13E9037D E2563802 57882607 88260A5E C4025789 26078926 0A5EC4E8 4688EA56 Võ.FÕá^.&..&.W.á^.&..&.W.;Vã).Õ. 0001E0

Dump of file SATUPN:[PCCOMMON.DUMP.DLL]DAD.TMP;1 on 18-APR-1990 10:40:03.08
File ID (551,9,0)   End of file block 267 / Allocated 268

Virtual block number 153 (00000099), 512 (0200) bytes

 5EC40257 89260789 260A5EC4 E0468BE2 56880006 E90377E0 46380008 E9037E00 .-.Õ..;FÁw.Õ...Vã.FÁá^.&..&.W.á^ 000000
 76FFEE56 89EC4689 02578826 0788260A 5EC4F656 89F44689 02578826 0788260A .&..&.W..F¶.V-á^.&..&.W..Fã.VŸ.v 000020
 76FFDA76 FF526ADA 46890000 3A469A50 16F4468D 006A0E76 FF1076FF E476FFE6 Ì.vð.v..v.Ì..F¶.P.F:...FÕjR.vÖ.v 000040
 E476FFE6 76FF004A E9DA4688 0006E903 75000030 08C4833A 5B00009A DC76FFDE ã.vÉ...[:.á.=..u.Õ...FÖÕJ..vÌ.vð 000060
 FF526ADA 46890000 36ED9A50 16EC4680 006A5052 00D28300 01051056 880E4688 .F..V......•.RPj..Fã.P.Ü6...FÕjR. 000080
 00880006 E9DA4688 0006E903 75000030 08C48337 8800009A DC76FFDE 76FFDA76 vÖ.vð.vÉ...|7.á.=..u.Õ...FÖÕ..|. 0000A0
 0A468900 00880000 CA46C7D8 8E372D88 1E565700 003AC8C8 C95F5E1F 0000E900 .Õ...^_èùð:..WV.|-7.ÁüFð..|...FÕ 0000C0
 0088CC46 89CE4689 00008BE0 4689E246 89000088 DC4689DE 46890000 88D84689 .FÁ|...Fã.FÉ|...Fã.FÁ|...Fö.Fã|. 0000E0
 89024689 00008BF0 4689F246 89000088 E44689E6 46890000 88F44689 F6468900 ..F-.F¶|...F|.FÕ|...F·.Fþ|...Fã. 000100
 89045788 26024788 26065EC4 C64689C8 46890000 88D44689 D6468900 00880046 FÁ|...Fø.FÁ|...Fã.FÕá^.&.G.&.W.. 000120
 20478826 065EC4DE 5689DC46 89205788 26284788 261FC426 085EC4DA 56890846 FÁ.VÕá^ÁÁá.&.G+&.W-.FÉ.V8á^.&.G 000140
 460BE046 88CE5689 CC468908 57882606 47882606 5EC4E256 89E04689 22578826 &.W".FÁ.Vãá^.&.G.&.W..Fã.Vö.FÁ.F 000160
 00008800 06E90375 00067F83 260C5FC4 26085EC4 0555E900 00880006 E90374E2 ãt.Õ..|..ÕU.á^Ááá_.&....u.Õ...|.. 000180
 506ACA46 890000FF FF9A5016 F4468D0C 6ACC76FF CE76FFDC 76FFDE76 FF053EE9 Õ>..v8.vÉ.vo.vãj..F¶.P......FÕjP 0001A0
 FF0502E9 CA468800 06E90375 00003008 C483382B 00009AD8 76FFDA76 FFCA76FF .vÕ.vÖ.vÁ...+8.á.=..u.Õ...FÖÕ... 0001C0
 00009AD8 76FFDA76 FFCA76FF 526ACA46 89000037 A39A5016 F0468DE0 76FFE276 vã.vÁ.Fþ.P.È7...FþjR.vÕ.vÖ.vÁ... 0001E0
```

Dump of file SATURN:[PCCOMMON.DUMP.DLL]DAD.TMP;1 on 18-APR-1990 10:40:03.08
File ID (551,9,0)   End of file block 267 / Allocated 268

Virtual block number 154 (0000009A), 512 (0200) bytes

```
A1E9037D F6563912 5688F046 8804CEE9 CA468800 06E90375 00003008 C48338F5 %;.á.=..u.Ő...Fòőö..FÞ.V·9V-).ŐÄ 000000
260277FF 26025FC4 26065EC4 406A006A 006A0194 E90377F4 46390008 E9037E01 .~.Ő..9F¶w.Ő..j.j.j@á^.&á_.&.w.& 000020
76FFDE76 FF0486E9 CA468800 06E90375 000030CA 46890AC4 833C3403 A39A37FF .7.Ê.4<.á..Fò=..u.Ő...FòŐ...vB.v 000040
76FFDA76 FFCA76FF 506ACA46 8900003E 849A5016 C6468D0C 6ACC76FF CE76FFDC Ê.vö.väj..Fó.P.Ç>...FòjP.vò.vŐ.v 000060
D65689D4 4689C856 88C64688 0415E900 03E90375 00003008 C4833C8C 00009AD8 Ä....<.á.=..u.Ő..Ő...Fó.Vå.Få.Vø 000080
6A37FF26 0277FF26 D45EC4DC 76FFDE76 FF0005E9 03750247 08260788 26045EC4 á^å&..&.G.u.Ől..vB.vÉá^å&.w.&.7j 0000A0
C4833CE7 00009AD8 76FFDA76 FFCA76FF 506ACA46 8900003F 0C9A5016 E4468D04 ..FŐ.P..?...FòjP.vò.vŐ.vÄ...Ő<.á 0000C0
390008E9 037E0083 E9037DE6 5639F256 88F04688 0380E900 03E90375 00003008 .=..u.Ő..Ő§..FÞ.V·9V|).Ő..-.Ő..9 0000E0
6A37FF26 0277FF26 D45EC40C 6ACC76FF CE76FFDC 76FFDE76 FF0076E9 0373E446 Fős.Őv..vB.vÉ.vö.väj.á^å&.w.&.7j 000100
7500003D 08C4833D 1D00009A D876FFDA 76FFCA76 FF506ACA 46890000 FFFF9A03 .......FòjP.vò.vŐ.vÄ....=.á.=..u 000120
6ACA4689 0000FFFF 9A37FF26 0277FF26 D45EC4DC 76FFDE76 FF0362E9 0003E903 .Ő..Őb..vB.vÉá^å&.w.&.7......Fòj 000140
D4468303 2CE90003 E9037500 003D08C4 83305F00 009AD876 FFDA76FF CA76FF50 P.vò.vŐ.vÄ..._=.á.=..u.Ő..Ő,..Få 000160
4689C846 89000088 CA468900 00FFFF9A C676FFC8 76FFDC76 FFDE76FF FF1CE904 .Ő...vB.vÉ.vå.vó......Fòj...Få.F 000180
E902EAE9 0003E903 7500003D 08C4833D A400009A D876FFDA 76FFCA76 FF506AC6 ójP.vò.vŐ.vÄ...Ê=.á.=..u.Ő..Őö.Ő 0001A0
6A006A01 13E90372 F4463900 08E9037D 0120E903 7EF65639 F25688F0 4688012E ...FÞ.V 9V-~.Ő .).Ő..9F¶r.Ő..j.j 0001C0
7500003D CA46890A C4833E0F 03A39A37 FF260277 FF26025F C426065E C4406A00 .j@á^.&á_.&.w.&.7.Ê..>.á..Fò=..u 0001E0
```

Dump of file SATURN:[PCCOMMON.DUMP.DLL]DAD.TMP;1 on 18-APR-1990 10:40:03.08
File ID (551,9,0)   End of file block 267 / Allocated 268

Virtual block number 155 (0000009B), 512 (0200) bytes

```
E6568301 E4468300 08E9E656 89E44689 F65688F4 46880207 E9CA4688 0006E903 .Ő...FòŐ■..F¶.V-.FŐ.VlŐ...FŐ..Vl 000000
FFDE76FF 0084E903 72E44639 0008E903 7D00C1E9 037EE656 39F25688 F0468800 ..FÞ.V 9V|-.Őè.).Ő..9FŐr.ŐÇ..vB. 000020
4800009A D876FFDA 76FFCA76 FF506ACA 46890000 FFFF9A50 16004680 086ADC76 vÉj..FÄ.P......FòjP.vò.vŐ.vÄ...K 000040
046AD076 FFD276FF DC76FFDE 76FF026F E9CA4688 0006E903 7500003D 08C4833E >.á.=..u.Ő...FòŐo..vB.vÉ.vø.vÄj. 000060
08C4833E 8A00009A D876FFDA 76FFCA76 FF506ACA 46890000 2FE99A50 16E44680 .FŐ.P.Ő/...FòjP.vò.vŐ.vÄ....>.á. 000080
FFD276FF 0C6ACC76 FFCE76FF DC76FFDE 76FF0233 E9CA4688 0006E903 7500003D =..u.Ő...FòŐ3..vB.vÉ.vö.väj..vø. 0000A0
3D08C483 3EC90000 9AD876FF DA76FFCA 76FF506A CA468900 00FFFF9A 036AD076 vÄj.......FòjP.vò.vŐ.vÄ...è>.á.= 0000C0
46800C6A CC76FFCE 76FFDC76 FFDE76FF FF29E901 F4E9CA46 880006E9 03750000 ..u.Ő...FòŐ¶.Ő)..vB.vÉ.vö.väj..F 0000E0
003D08C4 833F2100 009AD876 FFDA76FF CA76FF50 6ACA4689 0000FFFF 9A5016C6 ó.P......FòjP.vò.vŐ.vÄ...!7.á.=. 000100
7502470B 26078826 D45EC4D6 56890446 89C85688 C6468801 80E90003 E9037500 .u.Ő..Ő...Fó.Vå.Få.Vøá^å&..&.G.u 000120
00002D38 9A5016E4 4680046A 37FF2602 77FF2604 5EC4DC76 FFDE76FF 0165E903 .Őe..vB.vÉá^å&.w.&.7j..FŐ.P.8-.. 000140
28E90003 E9037500 003D08C4 83387C00 009AD876 FFDA76FF CA76FF50 6ACA4689 .FòjP.vò.vŐ.vÄ...|;.á.=..u.Ő..Ő( 000160
76FF526A CA468900 0038169A 5016E846 8D006AE4 76FFE676 FFE076FF E276FF01 ..vã.vÄ.vl.vŐj..FŐ.P..8...FòjR.v 000180
DC76FFDE 76FF00EF E90003E9 03750000 3D08C483 38800000 9AD876FF DA76FFCA ò.vŐ.vÄ...¯;.á.=..u.Ő..Őy..vB.vÉ 0001A0
76FFCA76 FF506ACA 46890000 3C779A50 16F84680 026A37FF 260277FF 26045EC4 á^å&.w.&.7j..F½.P.w<...FòjP.vò.v 0001C0
E84639FA 5688F846 880082E9 0003E903 7500003D 08C4833F EA00009A D876FFDA Ő.vÄ...ő?.á.=..u.Ő..Őy..F½.V*9FŐ 0001E0
```

Dump of file SATURN:[P^COMMON.DUMP.DLL]DAD.TMP;1 on 18-APR-1990 10:40:03.08
File ID (551,9,0)   End of file block 267 / Allocated 268

Virtual block number 156 (0000009C), 512 (0200) bytes

```
0375EE56 390008E9 0374EC46 39FE5688 FC468800 16E90374 EA563900 1EE90374 t.Ő..9Vőt.Ő...F•.V±9F§t.Ő..9VŸu. 000000
890AC483 404203A3 9A37FF26 0277FF26 025FC426 065EC440 6A006A00 6A007FE9 Ő..j.j.j@á^.&á_.&.w.&.7.Ê.B@.á.. 000020
89EE5688 EC4688FA 5689F846 89EA5688 E8468800 5CE90003 E9037500 003DCA46 Fò=..u.Ő..Ő\..FŐ.VŐ.F½.V*.F§.VŸ. 000040
003E369A 5016F846 80026A37 FF260277 FF26045E C4DC76FF DE76FFFE 5689FC46 F•.V±.vB.vÉá^å&.w.&.7j..F½.P.6>. 000060
E90003E9 03750000 3D08C483 3F5A0000 9AD876FF DA76FFCA 76FF506A CA468900 ..FòjP.vò.vŐ.vÄ...Z?.á.=..u.Ő..Ő 000080
C676FFC8 76FFDC76 FFDE76FF 0027E903 75C84608 C64688FE 8CE904D4 46830007 ...Få.Ő.±.Fó.Fàu.Ő'..vB.vÉ.vå.vó 0000A0
00E9CA46 8808C483 3F970000 9AD876FF DA76FFCA 76FF506A CA468900 003D419A .A=...FòjP.vò.vŐ.vÄ....?.á..FòŐ. 0000C0
E24689E4 46890000 880000E0 46C7D88E 3A81881E 56570000 20C8C8C9 5F5E1F00 ..^_èùà ..WV.|.:.ÄúFÄ..|...FŐ.Fã 0000E0
89078826 1FC426E2 5EC4E456 89E24689 04578826 02478826 065EC400 00F646C7 úF-¯.á^.&.G.&.W..Fã.VŐá^ã&á.&... 000100
0A77FF26 0C77FF26 065EC4F6 76FF0037 E903750C 4708260A 47882606 5EC4F646 F-á^.&.G.&.G.u.Ő7..v-á^.&.w.&.w. 000120
03750000 3D08C483 41430000 9AE276FF E476FFE0 76FF526A E0468900 00FFFF9A ......FÄjR.vÄ.vŐ.vã...CA.á.=..u. 000140
FFFF9A50 52000A05 08568806 46880A76 FF0C76FF F676FF01 D8E9E046 880006E9 Ő...FÄŐÄ..v-.v..v..F..V....RP... 000160
0006E903 7500003D 08C48341 9800009A E276FFE4 76FFE076 FF526AE0 46890000 ...FÄjR.vÄ.vŐ.vã....A.á.=..u.Ő.. 000180
77FF260A 77FF26E2 5EC40185 E9037532 47082630 47882606 5EC40198 E9E04688 .FÄŐ..á^.&.G0&.G2u.Ő..á^ã&.w.&.w 0001A0
FFE076FF 526AE046 890000FF FF9A0A76 FF0C76FF 3077FF26 3277FF26 065EC408 .á^.&.w2&.w0.v..v.......FÄjR.vÄ. 0001C0
8826065E C40146E9 E0468800 06E90375 00003008 C4834223 00009AE2 76FFE476 vŐ.vã...#B.á.=..u.Ő...FÄŐF.á^.&. 0001E0
```

```
Dump of file SATURN:[PCCOMMON.DUMP.DLL]DAD.TMP;1 on 18-APR-1990 10:40:03.08
File ID (551,9,0)   End of file block 267 / Allocated 268

Virtual block number 157 (0000009D), 512 (0200) bytes

 468904C4 8342E30F 639A0E77 FF261077 FF26065E C40027E9 03751047 08260E47 G.&.G.u.Ö'.á^.&.w.&.w..c.08.á..F 000000
 E9037514 47082612 47882606 5EC40109 E90112E9 E0468800 06E90375 00003DE0 Á=..u.Ö...FÁÖ..Ö..á^.&.G.&.G.u.Ö 000020
 FFFF9A50 16E64o8D 3077FF26 3277FF26 065EC408 77FF260A 77FF26E2 5EC400F9 ª.á^ã&.w.&.w.á^.&.w2&.w0.Fì.P... 000040
 0006E903 75000030 08C48342 9600009A E276FFE4 76FFE076 FF526AE0 46890000 ...FÁjR.vÁ.vö.vã....B.á.=..u.Ö.. 000060
 02578926 078926E8 561BE646 28F05688 EE468828 5FC42606 5EC40088 E9E04688 .FÁÖE.á^.&á_(.FŸ.Vÿ+Fì.VÖ&..&.W. 000080
 FF26065E C4065789 26044789 26EC5618 EA462BF4 5688F246 88285FC4 26065EC4 á^.&á_(.F·.V¶+Fö.V$&.G.&.W.á^.&. 0000A0
 260477FF 26065EC4 E076FF52 6AE04689 0000FFFF 9A5016E6 46803077 FF263277 w2&.wÖ.Fì.P......FÁjR.vÁá^.&.w.& 0000C0
 89E85688 E6468800 48E9E046 880006E9 03750000 3D08C483 40860000 9A0277FF .w.....ä.á.=..u.Ö...FÁÖH..Fì.VÖ. 0000E0
 FE5689FC 46890657 18260447 2826285F C426065E C4F45688 F24688FA 5689F846 F½.V°.F·.V¶á^.&á_(&+G.&.W..F=.V± 000100
 00E90000 88E04689 08C48334 A228889A 1277FF26 1477FF26 065EC450 16F8468D .F½.Pá^.&.w.&.w._¡(Á4.á..FÁ¡..Ö. 000120
 F84689FA 46890000 880000F6 46C7D88E 409E881E 56570000 0AC8CBC9 5F5E1F00 ..^_èùà...WV.¡.ä.ÁúF-..¡...F°.F½ 000140
 1FC426F8 5EC4FA56 89F84689 04578826 02478826 065EC4FC 4689FE46 89000088 ¡..Ŧ±.F•á^.&.G.&.W..F½.V°á^¼&á. 000160
 76FF0053 E9037508 47082606 47882606 5EC4FE56 89FC4689 2D578826 28478826 &.G+&.W-.F=.V±á^.&.G.&.G.u.ÖS..v 000180
 FF504004 C48332C6 00709A0A 76FF0C76 FF0677FF 260877FF 26065EC4 FC76FFFE ±.v=á^.&.w.&.w..v..v..p.ó2.á.äP. 0001A0
 08C48343 E400009A F876FFFA 76FFF676 FF506AF6 46890000 FFFF9A0A 76FF0C76 v..v.......F~jP.v~.v°.v½...ÖC.á. 0001C0
 49E90375 10470826 0E478826 065EC400 87E90007 E9F64688 0006E903 75000030 =..u.Ö...F~Ö=.Öñ.á^.&.G.&.G.u.Öl 0001E0

Dump of file SATURN:[PCCOMMON.DUMP.DLL]DAD.TMP;1 on 18-APR-1990 10:40:03.08
File ID (551,9,0)   End of file block 267 / Allocated 268

Virtual block number 158 (0000009E), 512 (0200) bytes

 289A0A76 FF0C76FF 026A0677 FF260877 FF260E5F C426065E C4FC76FF FE76FF00 ..v±.v=á^.&á_.&.w.&.w.j..v..v..( 000000
 06E90375 00003D08 C4834445 00009AF8 76FFFA76 FFF676FF 506AF646 89000044 D...F~jP.v~.v°.v½...ED.á.=..u.Ö. 000020
 FC76FFFE 76FF004E E9037514 47082612 47882606 5EC4005E E9007EE9 F6468800 ..F-Ö~.Ö^.á^.&.G.&.G.u.ÖN..v±.v= 000040
 30F64689 0000402D 9A0A76FF 0C76FF02 6A0677FF 260877FF 26125FC4 26065EC4 á^.&á_.&.w.&.w.j..v..v..ä...F-= 000060
 E9037500 003D08C4 83410600 009AF876 FFFA76FF F676FF50 6A0021E9 03750000 ..u.ÖĪ.jP.v~.v°.v½....A.á.=..u.Ö 000080
 88F64689 08C48341 C940969A 0676FF08 76FF0A76 FF0C76FF 001DE9F6 46880006 ...F-Ö...v..v..v..v...äèA.á..F-. 0000A0
 C426065E C40000EE 46C7D88E 42FE881E 56570000 12C8C8C9 5F5E1F00 00E9F646 F-Ö...^_èùà...WV.¡±8.ÁúFŸ..á^.&á 0000C0
 32470826 30478826 065EC41F A5F20008 890A8E1E F088F888 0C56880A 4..92C5F _..F..V_.«.Þ..Ö¿..·Ë.á^.&.GÖ&.G2 0000E0
 526AEE46 890000FF FF9A0A76 FF0C76FF 3077FF26 3277FF26 065EC400 3FE"0375 ū.Ö?.á^.&.w2&.wÖ.v..v.......FŸjR 000100
 46880006 E9037500 003D08C4 83453000 009A0277 FF260477 FF26065E C4EE"6FF .vŸá^.&.w.&.w....0E.á.=..u.Ö...F 000120
 FF1C77FF 261E77FF 26065EC4 0042E903 751E4708 261C4788 26065EC4 0155E9EE ŸÖU.á^.&.G.&.G.u.Ö8.á^.&.w.&.w.. 000140
 00009A02 77FF2604 77FF2606 5EC4EE76 FF526AEE 46890000 1A669A0A 76FF0C76 v..v..f....FŸjR.vŸá^.&.w.&.w.... 000160
 47082620 47882606 5EC400FD E90106E9 EE468800 06E90375 00003D08 C48345B0 ¯E.á.=..u.Ö...FŸÖ..Ö».á^.&.G &.G 000180
 47082630 47882606 5EC4009E E9037510 4708260E 47882606 5EC400ED E9037522 "u.ÖÙ.á^.&.G.&.G.u.Ö..á^.&.GÖ&.G 0001A0
 3077FF26 3277FF26 065EC408 77FF260A 77FF2602 5FC42606 5EC4008E E9037532 2u.Ö..á^.&á_.&.w.&.w.á^.&.w2&.w0 0001C0
 00009A02 77FF2604 77FF2606 5EC4EE76 FF526AEE 46890000 420E9A50 16F0468D .FÞ.P..8...ŦŸjR.vŸá^.&.w.&.w.... 0001E0

Dump of file SATURN:[PCCOMMON.DUMP.DLL]DAD.TMP;1 on 18-APR-1990 10:40:03.08
File ID (551,9,0)   End of file block 267 / Allocated 268

Virtual block number 159 (0000009F), 512 (0200) bytes

 468D2077 FF262277 FF26065E C40086E9 EE468800 06E90375 00003D08 C48345EE ŸE.á.=..u.Ö...FŸÖ..á^.&.w"&.w .F 000000
 46300000 9A0277FF 260477FF 26065EC4 EE76FF52 6AEE4689 00004616 9A5016F0 Þ.P..F...FŸjR.vŸá^.&.w.&.w....0F 000020
 FF2077FF 262277FF 26065EC4 003FE900 48E9EE46 880006E9 03750000 3D08C483 .á.=..u.Ö...FŸÖH.Ö?.á^.&.w"&.w . 000040
 00009A02 77FF2604 77FF2606 5EC4EE76 FF526AEE 46890000 FFFF9A0A 76FF0C76 v..v.......FŸjR.vŸá^.&.w.&.w.... 000060
 16C8CBC9 5F5E1F00 00E90000 880006E9 EE468800 06E90375 00003D08 C4834388 .C.á.=..u.Ö...FŸÖ..¡..Ö...^_èùà. 000080
 262C4788 26065EC4 EC4689EE 46890000 880000EA 46C7D88E 44828B1E 56570000 ..WV.¡.D.ÁúFö..¡...FŸ.F±á^.Ī.G.& 0000A0
 3926006F E9037407 3926EC5E C4025788 26078826 0A5EC4EE 5689EC46 892E5788 .W..F&.VŸá^.&..&.W.á^$&9.t.Öo.&9 0000C0
 3926004F E9037404 473926EC 5EC40657 88260447 88260A5E C40066E9 03740257 W.t.Öf.á^.&.G.&.W.á^$&9G.t.ÖO.&9 0000E0
 3926002F E9037408 473926EC 5EC40A57 88260847 88260A5E C40046E9 03740657 W.t.ÖF.á^.&.G.&.W.á^$&9G.t.Ö/.&9 000100
 3926000F E903740C 473926EC 5EC40E57 88260C47 88260A5E C40026E9 03740A57 W.t.Ö&.á^.&.G.&.W.á^$&9G.t.Ö..&9 000120
 065EC400 DEE90375 08470826 06478826 065EC401 08E90000 880006E9 03740E57 W.t.Ö..¡..Ö..á^.&.G.&.G.u.Ö8.á^. 000140
 0AC48347 D803A39A 37FF2602 77FF2602 5FC42606 5EC4326A 0A77FF26 0C77FF26 &.w.&.w.¡2á^.&á_.&.w.&.7.Ë.ÄG.á. 000160
 067F8326 0C5FC426 025FC426 065EC400 C7E9EA46 880006E9 03750000 3DEA4689 .Fö=..u.Ö...FöÖÙ.á^.&á_.&á_.&... 000180
 57882604 4788260A 5EC4F256 89F04689 02578826 0788260A 5EC40095 E9037400 .t.Ö..á^.&..&.W..FÞ.V·ã^.&¯G.&.W 0001A0
 260C4788 260A5EC4 FA5689FB 46890A57 88260847 88260A5E C4F65689 F4468906 ..F¶.V-á^.&.G.&.W..F½.V°á^.&.G.& 0001C0
 FF26065E C42B77FF 262D77FF 261FC426 025FC426 065EC4FE 5689FC46 890E5788 .W..F=.V±á^.&á_.&á.&.w-&.w+á^.&. 0001E0
```

```
Dump of file SATURN:[PCCOMMON.DUMP.DLL]DAD.TMP;1 on 18-APR-1990 10:40:03.08
File ID (551,9,0)   End of file block 267 / Allocated 268

Virtual block number 160 (000000A0), 512 (0200) bytes

 77FF2606 5EC4EA76 FF506AEA 46890000 43CF9A50 16F0468D 046A0677 FF26^877 w.&.w.j..FÞ.P.ÜC...FõjP.võá^.&.w 000000
 76FF0C76 FF001DE9 EA468800 06E90375 00003D08 C48344E1 00009A02 77FF2604 .&.w....ÄD.á.=..u.Õ...FõÕ...v..v 000020
 0002C8CB C95F5E1F 0000E9EA 4688EA46 8908C483 4467447A 9A0676FF 0876FF0A ..v..v..zDgD.á..Fõ.FõÕ...^ èùà.. 000040
 03753247 08263047 8826065E C43C4789 260A4688 065EC4D8 8E465688 1E565700 .WV.¡VF.Äá^..F.&.G<á^.&.GOÆ.G2u. 000060
 5EC4FE76 FF526AFE 46890000 FFFF9A0A 76FF3077 FF263277 FF26065E C4003CE9 Õ<.á^.&.w2&.w0.v.......F±jR.v±á^ 000080
 880006E9 FE468800 06E90375 00003D08 C483472B 00009A02 77FF2604 77FF2606 .&.w.&.w....+G.á.=..u.Õ...F±Õ..¡ 0000A0
 4688065E C40000FE 46C7D88E 4815881E 56570000 02C8C8C9 5F5E1F00 00E90000 ..Õ...^ èùà...WV.¡.H.ÄúF±..á^..F 0000C0
 0058E903 7508470B 26064788 26065EC4 0082E900 00880006 E903743C 4739260A .&9G<t.Õ..¡..Õ..á^.&.G.&.G.u.ÕX. 0000E0
 88056A06 77FF2608 77FF2606 5EC42877 FF262D77 FF261FC4 26025FC4 26065EC4 á^.&á_.&á.&.w-&.w+á^.&.w.&.w.j.. 000100
 FF260477 FF26065E C4FE76FF 506AFE46 89000047 8E9A5052 003C0508 56880646 F..V..<.RP./G...F±jP.v±á^.&.w.&. 000120
 76FF0876 FF0A76FF 001AE9FE 46880006 E9037500 003D08C4 83485C00 009A0277 w....\H.á.=..u.Õ...F±Õ...v..v..v 000140
 82881E56 57000030 C8C8C95F 5E1F0000 E9FE4688 FE468906 C48347FA 48009A06 ...H°G.á..F±.F±Õ...^_èùàO..WV.¡. 000160
 880000E2 46C7F046 89F24689 000088E8 4689EA46 89000088 00000046 C7D88E48 H.ÄúFÅ..¡...Fõ.FÕ¡...F·.FÞúFã..¡ 000180
 0000FA46 C7FC4689 FE468900 00880000 F446C700 00F646C7 EC4689EE 46890000 ...FŸ.F$úF-..úF¶..¡...F±.F=úF°.. 0001A0
 89E84689 2D578826 28478826 1FC4260A 5EC40000 F846C7E4 4689E646 89000088 ¡...F¦.FõúF½..á^.&á.&.G+&.W-.FÕ. 0001C0
 FF260C77 FF26F05E C4F25689 F046892A 5788262B 4788260C 5FC4260A 5EC4EA56 Võá^.&á_.&.G(&.W*.FÞ.V·á^Þ&.w.&. 0001E0

Dump of file SATURN:[PCCOMMON.DUMP.DLL]DAD.TMP;1 on 18-APR-1990 10:40:03.08
File ID (551,9,0)   End of file block 267 / Allocated 268

Virtual block number 161 (000000A1), 512 (0200) bytes

 03E90375 00003DD0 46890AC4 8348F502 FB9A37FF 260277FF 260A5EC4 416A0A77 w.jAá^.&.w.&.7.«.%H.á..FÅ=..u.Õ. 000000
 76FF526A 00468900 00FFFF9A 5016EC46 801276FF 1476FF00 01E246C7 034EE900 .ÕN.úFã...v..v..F$.P......FÅjR.v 000020
 EE4608EC 46880318 E90003E9 03750000 3D08C483 4A5A0000 9A0A76FF 0C76FFD0 Å.v..v....ZJ.á.=..u.Õ..Õ...F$.FŸ 000040
 FFFF53E7 9AF076FF F276FF00 30E90375 08470826 06478826 F05EC400 A3E90374 t.ÕÈ.á^Þ&.G.&.G.u.Õ=..v·.vÞ.ÓS.. 000060
 76FF536A 00468900 00FFFF9A 0677FF26 0877FF26 F05EC4E8 76FFEA76 FF04C483 .á..võ.vÕá^Þ&.w.&.w.......FÅjS.v 000080
 E9037510 4708260E 478826F0 5EC40053 E908C483 4A850000 9A0A76FF 0C76FFD0 Å.v..v.....J.á.ÕS.á^Þ&.G.&.G.u.Õ 0000A0
 F05EC400 28E90AC4 834A8000 899A37FF 260277FF 260A5EC4 466A006A 006A0018 ..j.j.jFá^.&.w.&.7...¯J.á.Õ(.á^Þ 0000C0
 00899A37 FF260277 FF260A5E C4476A00 6A006A00 18E90375 14470826 12478826 &.G.&.G.u.Õ..j.j.jGá^.&.w.&.7... 0000E0
 26124788 26F05EC4 0010E903 7410470B 260E4788 26F05EC4 026AE90A C4834878 xK.á.Õj.á^Þ&.G.&.G.t.Õ..á^Þ&.G.& 000100
 260E5FC4 26F05EC4 0027E903 7510470B 260E478B 26F05EC4 010AE903 7514470B .G.u.Õ..á^Þ&.G.&.G.u.Õ'.á^Þ&á_.& 000120
 C40024E9 0046F446 C70048F6 46C70002 FA46C7FE 5689FC46 89085788 26064788 .G.&.W..F=.V±úF°..úF-H.úF¶F.Õ$.á 000140
 46C70049 F646C700 02FA46C7 FE5689FC 46890857 88260647 8826125F C426F05E ^Þ&á_.&.G.&.W..F•.V±úF°..úF-I.úF 000160
 D0468900 0048D89A 1276FF14 76FFFA76 FFFC76FF FE76FFE8 76FFEA76 FF0047F4 ¶G..võ.vÕ.v±.v•.v°.v..v..ÜH...FÅ 000180
 FF260A5E C4F676FF 006A006A 0021E903 748EC0D0 7E81000A E90375BE C7D07E81 .-Åú.u.Õ...-Åà.t.Õ¦.j.j..v-á^.&. 0001A0
 810014E9 03759431 D07E8101 90E90000 D046C70A C48348B7 00899A37 FF260277 w.&.7...ñK.á.úFÅ..Õ...-Å1.u.Õ... 0001C0
 77FF260A 5EC4F476 FF006A00 6A0021E9 03749433 D07E8100 0AE90375 9432D07E -Å2.u.Õ...-Å3.t.Õ¦.j.j..v¶á^.&.w 0001E0

Dump of file SATURN:[PCCOMMON.DUMP.DLL]DAD.TMP;1 on 18-APR-1990 10:40:03.08
File ID (551,9,0)   End of file block 267 / Allocated 268

Virtual block number 162 (000000A2), 512 (0200) bytes

 9A0A76FF 0C76FFD0 76FF506A 015EE900 000046C7 0AC4834B D200899A 37FF2602 .&.7...ØK.á.úFÅ..Õ^.jP.vÅ.v..v.. 000000
 E4468932 57882630 478826F0 5EC40140 E90003E9 03750000 3D08C483 4C180000 ...L.á.=..u.Õ..Õ@.á^Þ&.GO&.W2.Fõ 000020
 FF526AD0 46890000 FFFF9A16 76FF1876 FFE476FF E676FF06 76FF0876 FFE65689 .V¦.v..v..v¦.võ.v..v.......FÅjR. 000040
 76FFE676 FF00F7E9 0003E903 7500003D 08C4834C 4A00009A 0A76FF0C 76FFD076 vÅ.v..v....JL.á.=..u.Õ..ÕK..v¦.v 000060
 3D08C483 4C790000 9A0A76FF 0C76FFD0 76FF526A D0468900 00FFFF9A 1A76FFE4 Õ.v.......FÅjR.vÅ.v..v....yL.á.= 000080
 D076FF52 6AD04689 0000FFFF 9A1C76FF E476FFE6 76FF00C8 E90003E9 03750000 ..u.Õ..Õà..v¦.võ.v.......FÅjR.vÅ 0000A0
 88164688 F05EC400 99E90003 E9037500 003D08C4 8349C100 009A0A76 FF0C76FF .v..v....ê¦.á.=..u.Õ..Õ..á^Þ.F.. 0000C0
 5EC44047 89261C46 88F05EC4 3E478926 1A4688F0 5EC42657 89262447 89261856 V.&.G$&.W&á^Þ.F.&.G>á^Þ.F.&.G@á^ 0000E0
 06C4834C E0487A9A F076FFF2 76FF2276 FF445789 26424789 26265688 24468BF0 Þ.F$.V&&.GB&.WD.v".v·.vÞ.zHÜL.á. 000100
 83491446 4E9AF076 FFF276FF 1E76FF20 76FF0044 E90003E9 03750000 3D004689 .FÅ=..u.Õ..ÕD..v .v..v·.vÞ.NF.I. 000120
 C842F69A F076FFF  76FF1276 FF1476FF 0022E900 03E90375 00003D00 468908C4 á..FÅ=..u.Õ..Õ"..v..v..v·.vÞ.-Bù 000140
 C4260A5E C4000148 47C726F0 5EC40000 E90003E9 03750000 3D004689 08C4834C L.á..FÅ=..u.Õ..Õ..á^Þ&úGN..á^.&á 000160
 037500E2 7E832847 89262A47 89260000 880C5FC4 260A5EC4 00003547 C7260C5F  .&úG5..á^.&á_.¡..&.G*&.G(.~ã.u. 000180
 9A0676FF 0876FFFF FF684D0F 680A76FF 0C76FF50 1602468D 5016F846 800099E9 Õ...F½.P.FØ.P¯v..v.h.Mh...v..v.. 0001A0
 F87E8308 C4834DD6 00009A0A 76FF0C76 FFD076FF 526AD046 8914C483 4D8804A7 Ì..M.á..FÅjR.vÅ.v..v....ØM.á..-½ 0001C0
 FF0876FF F076FFF2 76FF0000 FFFF9A50 16D2468D 0676FF08 76FF0010 E9037500 .u.Õ...v..v..FØ.P......v·.vÞ.v.. 0001E0
```

```
Dump of file SATURN:[PCCOMMON.DUMP.DLL]DAD.TMP;1 on 18-APR-1990 10:40:03.08
File ID (551,9,0)   End of file block 267 / Allocated 268

Virtual block number 163 (000000A3), 512 (0200) bytes

 0C76FFD0 76FF506A D0468900 00FFFF9A EB76FFEA 76FF08C4 83137C0A 839A0676 v....|..ó..võ.vò......FÀjP.vÀ.v. 000000
 FF0876FF 000BE900 14E90046 880006E9 03750000 3D08C483 49FA0000 9A0A76FF .v....*I.é.=..u.Õ...FÀÕ..Õ...v.. 000020
 46C7D88E 492F681E 56570000 10C8C8C9 5F5E1F00 00E90000 B80000FF FF9A0676 v......|..Õ...^_èùà...WV.|/I.ÀúF 000040
 E90000B8 0006E903 7412460B 104688F2 4689F446 89000088 0000FE46 C70000F0 Þ..úF±..|...F¶.F..F..F.t.Õ..|..Õ 000060
 F046890E C4832613 02709A06 76FF0876 FF0A76FF 5016FE46 8D5016F2 46800116 ...F..P.F±.P.v..v..v..p..&.ó..FÞ 000080
 7410470B 260E4788 26F25EC4 00BBE9FE 468800EA E9F04688 0006E903 75000030 =..u.Õ...FÞÕõ..F±ÕE.ó^.&.G.&.G.t 0000A0
 F276FFF4 76FF1076 FF1276FF 0017E903 74144708 26124788 26F25EC4 0027E903 .Õ'.ó^.&.G.&.G.t.Õ...v..v..v¶.v. 0000C0
 46890000 274E9A50 16F6468D 0876FF0A 76FF00A4 E9F04689 08C4834E E0464E9A .NFÀN.ó..FÞÕE..v..v..F-.P.N'...F 0000E0
 E9F04688 0006E903 7500003D 08C4834D 7200009A 1476FF16 76FFF076 FF526AF0 ÞjR.vÞ.v..v....rM.ó.=..u.Õ...FÞÕ 000100
 76FFF476 FF0057E9 F0468908 C4834EF4 2C079AF2 76FFF476 FF5016F6 46800076 v..F-.P.v¶.v...,¶N.ó..FÞÕW..v¶.v 000120
 4D64138C 9AF276FF F476FF10 76FF1276 FF0043E9 F0468904 C4834F0E 3A799AF2 ..y:.O.ó..FÞÕC..v..v..v¶.v....dM 000140
 3DFF6FE9 03750002 3DFFD8E9 03750001 3D0023E9 0026E900 29E9F046 8908C483 .ó..FÞÕ).Õ&.Õ#.=..u.ÕA.=..u.Õo.= 000160
 003E90C8 C95F5E1F 0000E9F0 4688FFD7 E9FF25E9 03750005 3DFFB4E9 03750003 ..u.ÕÇ.=..u.Õ%.Õ..FÞÕ...^_èù.>. 000180
 044A0008 32200203 06400009 18680203 03CE0007 412E0203 00E40004 1D8D0203 ......ð....A..ö...h...ä...-2..J. 0001A0
 00F00004 3CD20203 054F0008 45960203 07C40009 3F450203 00000003 4EBF0002 ..«N......E?..ó....E..O...®<..Þ. 0001C0
 0AB90008 4DF30203 03D90007 49E50203 05D10008 41830203 03590007 1FD00203 ..Å...Y....A..Ì...Íl..Ì...µM..¿. 0001E0

Dump of file SATURN:[PCCOMMON.DUMP.DLL]DAD.TMP;1 on 18-APR-1990 10:40:03.08
File ID (551,9,0)   End of file block 267 / Allocated 268

Virtual block number 164 (000000A4), 512 (0200) bytes

 00000007 4DB50002 0CB00000 4A450203 06400009 45160203 00000005 4A2E0002 ...J.......E..M...EJ..¯...çM.... 000000
 05620008 427C0203 01020004 40710203 0AC40008 4DA20203 03640007 24EF0203 ..ý$..d...ÀM..ó...qä......|B..b. 000020
 04EA0008 35F80203 00890004 3B670203 0000000A 4E930002 00000009 4E480002 ..HN........N......g;.......½5..õ. 000040
 037E0007 22700203 06EC0009 35BC0203 04720008 2BCF0203 07E20009 3A020203 ...:..â...ü+..r...¥5..å...p"..~. 000060
 011C0004 30FA0203 0000000E 43680002 05770008 44C70203 00970004 3F820203 ...?......úO..w...hC......°=.... 000080
 03BD0007 20E30203 00A50004 4B490203 4E02000A 4D670005 00000010 4E0A0002 ...N......gM...N..IK..É...D .... 0000A0
 05BA0008 4C060203 05FF0009 11380203 01260004 30080203 06FD0009 2F080203 .../..»....=..&...8.........L.... 0000C0
 07080009 2CDA0203 039B0007 20440203 00B10004 3C1F0203 08050009 30090203 ..10.......<..Ý...D ......Ö,.... 0000E0
 00B00004 25CF0203 013C0004 43760203 059B0008 48420203 03200007 305D0203 ..]0.. ...BH......vC..<...ü%..§. 000100
 03310007 310C0203 071E0009 4EAA0203 091D0009 45040203 04A40008 357A0203 ..z5..É...åE......¯N.......1..1. 000120
 0A280009 11940203 03B40007 102E0203 05AA0008 4C350203 00CA0004 1E050203 ......ò...5L..¯.......Ç.......(. 000140
 03450007 30720203 07B10009 38980203 03C00007 40F10203 00040004 3E750203 ..u>..å...þä..å....;..Y...r0..E. 000160
 00C246C7 D88EFFFF B81E5657 000042C8 005D0004 4DC10203 05BD0008 4C640203 ..dL..§...èM..).àB..WV.|...ÁúFò. 000180
 00008BD8 4689DA46 89000088 EA4689EC 46890000 B80000E6 46C70000 EE46C700 .úFY..úFÌ..|...Fê.Fõ|...FÖ.FÁ|.. 0001A0
 0000B800 00E846C7 D4468906 46890000 888E4689 C0468900 0088E046 89E24689 .Fã.FÁ|...Fà.F/|...F®.FàúFÒ..|.. 0001C0
 8826085E C40000FF FF9A5016 D8468006 76FF0876 FF0000E4 46C7DC46 89DE4689 .Fß.FÉúFõ...v..v..FÁ.P.....ó^Á&. 0001E0

Dump of file SATURN:[PCCOMMON.DUMP.DLL]DAD.TMP;1 on 18-APR-1990 10:40:03.08
File ID (551,9,0)   End of file block 267 / Allocated 268

Virtual block number 165 (000000A5), 512 (0200) bytes

 5EC400F5 E90018E8 46C700D3 E9494788 26E05EC4 E25689E0 46890E57 88260C47 G.&.W..FÁ.Vãó^Á&.GIÕ€.úFÒ..Õ%.ó^ 000000
 0768006A 1DAF6802 77FF261F C426085E C4001BE9 03750035 7F83260C 5FC42608 Á&ó_.&..5.u.Õ..ó^Á&ó.&.w.h€.j.h. 000020
 1DE846C7 0087E900 1CE846C7 0001EE46 C70001E6 46C70000 FFFF9A01 6A006A02 .j.Ĵ......úFÌ..úFŸ..úFÒ..Õñ.úFÒ. 000040
 21E846C7 0097E900 20E846C7 009FE900 1FE846C7 00A7E900 1EE846C7 00AFE900 .Õ€.úFÒ..ÕÌ.úFÒ..Õ..úFÒ .Õ..úFÒI 000060
 25E846C7 0077E900 24E846C7 007FE900 23E846C7 0087E900 22E846C7 008FE900 .Õ..úFÒ".Õ..úFÒ#.Õ..úFÒ$.Õw.úFÒ% 000080
 0000FFFF 9A0676FF 0876FF00 21E90375 00357F83 260C5FC4 26085EC4 006FE900 .Õo.ó^Á&ó_.&..5.u.Õ!..v..v...... 0000A0
 46C70035 E90026E8 46C708C4 83FFFF00 009AD876 FFDA76FF C276FF52 6AC24689 .FÒjR.vÒ.ṼÕ.vÁ......ó.úFÒ&.Õ5.úF 0000C0
 CC008E00 86014E01 69A7FF2E 93C003FF EDE90376 000C3000 2AE9002D E90000E8 Ò..Õ-.Õ*.=..v.ÕÙ..å...Ìi.N.....ä 0000E0
 4789261E 47892600 00BBE05E C4011401 0C010400 FC00F400 EC00E400 DC00D400 .å.É.Õ.&.¶.=........ó^Á|..&.G.&.G 000100
 168E468D 1477FF26 1677FF26 E05EC400 00FFFF9A 1477FF26 1677FF26 E05EC41C .ó^Á&.w.&.w.......ó^Á&.w.&.w..Ff. 000120
 76FFD876 FFDA76FF 50160446 8D0001E6 46C70059 E9037400 00300000 FFFF9A50 P.....=..t.ÕY.úFÌ...Få.P.vÕ.vÁ.v 000140
 8E76FFC0 76FF5052 001405E2 5688E046 88C24689 0CC48302 66085F9A 8E76FFC0 å.vf._.f..ó..Fò.FÁ.Vã...RP.vå.vf 000160
 9800009A DB76FFDA 76FFC276 FF526AC2 46890000 02869A50 16EA468D 016A006A j.j..Fò.P......FòjR.vò.vÕ.vÁ.... 000180
 FF261A77 FF26E05E C4000004 659A1877 FF261A77 FF26E05E C4FF8AE9 08C48302 ..ó.Õ..ó^Á&.w.&.w..e...ó^Á&.w.&. 0001A0
 FFD476FF D676FF00 01E646C7 005FE903 74000030 0000047D 9A501604 46801877 w..FÅ.P.)...=..t.Õ_.úFÌ...v®.vå. 0001C0
 5688E046 8804C483 02DF1437 9AD476FF D676FF08 C48302CC 029A9A06 76FF0876 v..v....ä..ó..v®.vǏ.7.Õ..ó..FÁ.V 0001E0
```

```
Dump of file SATURN:[PCCOMMON.DUMP.DLL]DAD.TMP;1 on 18-APR-1990 10:40:03.08
File ID (551,9,0)   End of file block 267 / Allocated 268

Virtual block number 166 (000000A6), 512 (0200) bytes

 FF526AC2 46890000 FFFF9A50 16EA468D 016A006A D476FFD6 76FF5052 001805E2 ã...RP.v■.våj.j..Fõ.P......FójR. 000000
 03752247 082620↓7 8826E05E C4FF84E9 08C48303 AC00009A D876FFDA 76FFC276 vó.vÖ.vÄ...¯..á.Õ..á^Äå.G å.G"u. 000020
 C483031B 04089A06 76FF0876 FF2077FF 262277FF 26E05EC4 0001E646 C7003FE9 Õ?.úFl..á^Äå.w"å.w .v..v.......á 000040
 89262247 89260000 88E05EC4 04C48303 2E23559A 2077FF26 2277FF26 E05EC408 .á^Äå.w"å.w .U#...á.á^Ä¡..å.G"å. 000060
 FF262677 FF26E05E C40001E6 46C7003F E9037526 47082624 47882 6E0 5EC42047 G á^Äå.G$å.Gåu.Õ?.úFl..á^Äå.wåå. 000080
 037D3FA3 9A2477FF 262677FF 26E05EC4 08C48303 6A05859A 0676FF08 76FF2477 w$.v..v....j..á.á^Äå.wåå.w$.È?). 0000A0
 3FE90375 2A470826 28478826 E05EC424 47892626 47892600 0088E05E C404C483 .á.á^Ä¡..å.Gåå.G$á^Äå.G(å.G*u.Õ? 0000C0
 C408C483 FFFF0653 9A0676FF 0876FF28 77FF262A 77FF26E0 5EC40001 E646C700 .úFl..á^Äå.w*å.w(.v..v..S....á.á 0000E0
 28478926 2A478926 000088E0 5EC404C4 83FFFF53 E79A2877 FF262A77 FF26E05E ^Äå.w*å.w(.ÓS...á.á^Ä¡..å.G*å.G( 000100
 C48303E7 00009AD8 76FFDA76 FFC276FF 526AC246 890000FF FF9A0676 FF0876FF .v..v.......FójR.vó.vÖ.vÄ...Ó..á 000120
 C4468050 16E44680 0053E903 7500E67E 83C24689 FFFF055C 9A0676FF 0876FF08 ..v..v..\....Fó.-l.u.ÕS..Fõ.P.Fá 000140
 6AC24689 14C4830  FD04A79A 0676FF08 76FFFFFF 68FFFF68 0876FFDA 76FF5016 .P.vÖ.vÄh..h...v..v..l.».á..Fój 000160
 76FF0876 FF0010EV 037500E4 7E8308C4 83044800 009AD876 FFDA76FF C276FF52 R.vó.vÖ.vÄ...H..á..-õ.u.Õ...v..v 000180
 FF262D77 FF261FC4 26D85EC4 0029E903 7500EE7E 830000FF FF9A5016 C4468D06 ..Fá.P......~Ÿ.u.Õ).á^Äåá.å.w-å. 0001A0
 E87E8308 C48304FE 00009AD8 76FFDA76 FFC276FF 506AC246 890000FF FF9A2B77 w+......FójP.vó.vÖ.vÄ...±..á..-Ô 0001C0
 261FC426 D85EC400 0001909A 3777FF26 3977FF26 1FC42608 5EC4008A E9037500 .u.Õ□.á^Äåá.å.w9å.w7.....á^Äåá.å 0001E0

Dump of file SATURN:[PCCOMMON.DUMP.DLL]DAD.TMP;1 on 18-APR-1990 10:40:03.08
File ID (551,9,0)   End of file block 267 / Allocated 268

Virtual block number 167 (000000A7), 512 (0200) bytes

 0E7F8326 DC5EC400 61E90374 00003000 0001B29A 50160C46 803777FF 263977FF .w9å.w7.Fè.P.ý...=..t.Õ■.á^Èå... 000000
 F0468D33 77FF2635 77FF261F C426085E C400000E 47C7260C 5EC40051 E9037500 .u.ÕQ.á^ÈåúG...á^Äåá.å.w5å.w3.FÞ 000020
 00FFFF9A 006A5016 F0468D33 77FF2635 77FF261F C426085E C40000FF FF9A5016 .P.....á^Äåá.å.w5å.w3.FÞ.Pj..... 000040
 76FF006A 006AFF7F E90003E9 0000FFFF 9A3777FF 263977FF 261FC426 D85EC400 .á^Äåá.å.w9å.w7.....Õ..Õ..j.j..v 000060
 00004947 C7260C5F C426085E C40AC483 01410277 9A37FF26 0277FF26 D85EC4E8 Òá^Äå.w.å.7.w.A..á.á^Äåá_.åúGI.. 000080
 E9037540 0646F6D8 3E0008B8 1E565700 0000C800 04CAC95F 5E1F0000 E90000B8 ¡..Õ...^_èò..à...WV.¡...Ã-F.âu.Õ 0000A0
 880006E9 0009E900 008803BA 00009A0A 76FF0C76 FF0014E9 03740F08 7E83001D ...~..t.Õ...v..v....□.¡..Õ..Õ..¡ 0000C0
 4689FE46 89000088 ↓88E0525 881E5657 000004C8 000CCAC9 5F5E1F00 00E90001 ..Õ...^_èò..à...WV.¡X..Ä¡...F±.F 0000E0
 FF260C5F C426FC5E C40676FF 0876FF00 0000679A 5016FC46 8D0676FF 0876FFFC ■.v..v.¯F■.P.g....v..v.á^■åá_.å. 000100
 881E5657 000020C8 0004CAC9 5F5E1F00 00E90000 880000FF FF9A4B77 FF264D77 wMå.wK.....¡..Õ...^_èò..à ..W̄V.¡ 000120
 89000088 0000F246 C70000F0 46C7E246 89E44689 00008800 00E046C7 D88E0564 d..ÄúFÄ..¡...Fõ.FâúF̄Þ..úF·..¡... 000140
 0E76FF00 00F446C7 0000FE46 C7EC4689 EE468900 00880008 E646C7E8 4689EA46 Fõ.FÕúFl..¡...FŸ.FšúF±..úF¶...v. 000160
 16F6468D 5016EC46 8D5016FE 468D5016 F4468D00 00057D9A 5016E246 800C76FF .v..Fã.P.)....F¶.P.F±.P.Fš.P.F-. 000180
 E276FFE4 76FF0876 FF0A76FF FF6AFF6A 5016F246 805016E8 468D5016 E6468D50 P.Fl.P.FÒ.P.F·.Pj.j..v..v..vó.vã 0001A0
 E9037405 F27E8301 44E90000 880006E9 03750000 30E04689 28C483FF FF03C59A .é....á(.FÄ=..u.Õ..¡..ÕO..~·.t.Õ 0001C0
 88260E47 8826E85E C40001F2 46C70016 E9037510 4708260E 478826E8 5EC40026 å.á^Òå.G.å.G.u.Ò..úF·..á^Òå.G.å. 0001E0

Dump of file SATURN:[PCCOMMON.DUMP.DLL]DAD.TMP;1 on 18-APR-1990 10:40:03.08
File ID (551,9,0)   End of file block 267 / Allocated 268

Virtual block number 168 (000000A8), 512 (0200) bytes

 16E90375 14470826 12478826 E85EC400 26E90374 05F27E83 EA5689E8 46891057 W..FÒ.Võ.~·.t.Õå.á^Òå.G.å.G.u.Õ. 000000
 E6468800 97E9F246 88EA5689 E8468914 57882612 478826E8 5EC40002 F246C700 .úF·..á^Òå.G.å.W..FÒ.Võ.F·Õ...Fl 000020
 0005F046 C70035E9 0006F046 C7003DE9 0007F046 C70045E9 0008F046 C70026E9 Õå.úFÞ..ÕE.úFÞ..Õ=.úFÞ..Õ5.úFÞ.. 000040
 06830683 06ECA7FF 2E93C003 FFEFE903 7600093D 00012D00 27E9002A E9002DE9 Õ-.Õ*.Õ'.-..=..v.Õÿ..å...Ìš.*.*. 000060
 7500FE7E 830056E9 0004F046 C7005EE9 06C306CB 06880603 06C806C3 068806D3 Æ.E.ù.ù.Æ.E.ù.ù.Õ^.úFÞ..ÕV..~±.u 000080
 F47E8300 0EE90008 F046C700 08E90374 01F47E83 001FE900 04F046C7 0008E903 .Õ..úFÞ..Õ...~¶.t.Õ..úFÞ..Õ...~¶ 0000A0
 03FFEFE9 03760004 3000012D 001DE900 20E90023 E90007F0 46C70005 E9037402 .t.Õ..úFÞ..Õ#.Õ .Õ..-..=..v.Õÿ.. 0000C0
 00FFFF9A 006AF076 FF0C76FF 0E76FF06 AD06AD07 08070306 AD0757A7 FF2E93C0 å...ÌW.Ù.....Ù.Ù..v..v..vÞj..... 0000E0
 5F5E1F00 00E90000 8808C483 020F0000 9AE276FF E476FFE0 76FF526A E0468900 ..FÄjR.vÄ.võ.vä......á.¡..Õ...^_ 000100
 0088F246 89F44689 00008800 00F046C7 D88E0580 881E5657 000010C8 000ECAC9 èò..à...WV.¡¯..ÄúFÞ..¡...F¶.F·¡. 000120
 5016F246 800C76FF 0E76FFFA 4689FC46 89000088 0000FE46 C7F64689 F8468900 ..F%.F-úF±..¡...F■.F*.v..v..F·.P 000140
 006A006A 006A006A 006AF856 89F64689 0E578826 0C478826 F25EC400 0005F99A .'...á^·å.G.å.W..F-.V½j.j.j.j.j. 000160
 76FF0876 FF0A76FF FF6AFF6A 5016FE46 8D5016FA 468D006A 006A006A 006A006A j.j.j.j.j..F*.P.F±.Pj.j..v..v..v 000180
 FE7E8301 9EE90000 880006E9 03750000 30F04689 28C48306 3303C59A F276FFF4 ¶.v·.é.3..á(.FÞ=..u.Õ..¡..Õ...~± 0001A0
 8826FA5E C40001FE 46C70016 E9037510 4708260E 478826FA 5EC40026 E¥u ̄7405 .t.Õå.á^*å.G.å.G.u.Õ..úF±..á^*å. 0001C0
 76FFF876 FFFA76FF FC76FF00 25E90374 080646F6 FC5689FA 46891057 8826 ̄47 G.å.W..F*.V■-F..t.ÕX..v■.v*.v½.v 0001E0
```

```
Dump of file SATURN:[PCCOMMON.DUMP.DLL]DAD.TMP;1 on 18-APR-1990 10:40:03.08
File ID (551,9,0)   End of file block 267 / Allocated 268

Virtual block nu ber 169 (000000A9), 512 (0200) bytes

 0112E9FE 46880141 E9000088 0006E903 75000030 F0468908 C48308AE 09C29AF6 -.ô.Û..á..Fÿ=..u.Õ..¡..ÕA..F±Õ.. 000000
 08CE0196 9AF674FF F876FFFA 76FFFC76 FF0876FF 0A76FF00 20E90375 080646F6 -F..u.Õ ..v..v..v=.v°.v½.v-...ö. 000020
 08F10000 9AF676FF F876FFFA 76FFFC76 FF0876FF 0A76FF00 1DE9F046 890CC483 .á..FÿÕ...v..v..v=.v°.v½.v-...þ. 000040
 F69AF676 FFF876FF FA76FFFC 76FF001A E9037508 0646F600 ECE9F046 890CC483 .á..FÿÕ£.-F..u.Õ...v=.v°.v½.v-.- 000060
 08C48309 2E00889A F676FFF8 76FFFA76 FFFC76FF 0017E9F0 468908C4 83090801 ....á..FÿÕ...v=.v°.v½.v-......á. 000080
 09480250 9AF676FF F876FFFA 76FFFC76 FF001AE9 03750806 46F600AF E9F04689 .FÿÕ£.-F..u.Õ...v=.v°.v½.v-.P.H. 0000A0
 F0468908 C4830971 00C89AF6 76FFF876 FFFA76FF FC76FF00 17E9F046 8908C483 .á..FÿÕ...v=.v°.v½.v-.ù.q..á..Fÿ 0000C0
 AA9AF676 FFF876FF FA76FFFC 76FF0876 FF0A76FF 0020E903 75080646 F60072E9 Õr.-F..u.Õ ..v..v..v=.v°.v½.v-.` 0000E0
 0B9AF676 FFF876FF FA76FFFC 76FF0876 FF0A76FF 001DE9F0 46890CC4 83099102 ....á..FÿÕ...v..v..v=.v°.v½.v-.. 000100
 E9037500 0230FEE6 E9037500 01300023 E90026E9 0029E9F0 46890CC4 83FFFF01 ....á..FÿÕ).Õ&.Õ#.=..u.Õ|±=..u.Õ 000120
 CAC95F5E 1F0000E9 000088FF D7E9FF91 E9037500 0530FF5C E9037500 0330FF27 '.=..u.Õ\.=..u.Õ..Õ=.¡..Õ...^_èò 000140
 89000088 AC4689AE 46890000 88000096 46C7D88E 079C881E 56570000 70C8000E ..àp..WV.¡...ÀúF...¡...FÛ.F¯¡... 000160
 4689E846 89000088 00080846 C7E24689 E4468900 00880000 EA46C7DA 46890C46 FÉ.FOúFõ..¡...Fõ.FàúFÀ..¡...FÒ.F 000180
 00008800 46890246 89000088 9C46899E 46890000 880000F0 46C70000 FA46C7E6 ÌúF°..úFÞ..¡...F..F.¡...F®.FÀ¡.. 0001A0
 46899446 89000088 DE4689E0 46890000 88FC4689 FE468900 0088A046 89A24689 .FÀ.F.¡...F±.F=¡...FÀ.F8¡...F..F 0001C0
 89000088 84468986 46890000 88984689 9A468900 0088A446 89A64689 00008892 .¡...FÏ.FÉ¡...F..F.¡...FÑ.FÇ¡... 0001E0

Dump of file SATURN:[PCCOMMON.DUMP.DLL]DAD.TMP;1 on 18-APR-1990 10:40:03.08
File ID (551,9,0)   End of file block 267 / Allocated 268

Virtual block number 170 (000000AA), 512 (0200) bytes

 D19A5016 AC468D0C 76FF0E76 FF000090 46C7CC46 89CE4689 000088EC 4689EE46 FY.F&¡...Fö.FàúF....v..v..F¯.P.Ì 000000
 46805016 FA468D50 16F0468D DC56890A 46890E57 88260C47 8826AC5E C4000007 ...á^¯&.G.&.W..FÖ.VÉ.FÞ.P.F°.P.F 000020
 76FF0A76 FFFF6AFF 6A5016EA 46805016 E2468050 16084680 5016F246 805016E6 Ì.P.F .P.FÀ.P.Fã.P.Fõ.Pj.j..v..v 000040
 0A67E996 46880006 E9037500 00309646 8928C483 081703C5 9AAC76FF AE76FF08 ..vÛ.v^.é....á(.F.=..u.Õ...F.Õg. 000060
 5EC40001 EA46C700 1BE90375 10470826 0E478826 E25EC400 28E90374 05EA7E83 .~õ.t.Õ+.á^ã&.G.&.G.u.Õ..úFõ..á^ 000080
 E476FF00 25E90374 080646F6 00000846 C7E45689 E2468910 5788260E 478826E2 ã&.G.&.W..Fã.VõúFÀ..-F..t.ÕX..vÕ 0000A0
 E9000088 0006E903 75000030 96468908 C4830C1F 09C29ADA 76FFDC76 FFE276FF .vã.vÉ.vÖ.ô....á..F.=..u.Õ..¡..Õ 0000C0
 88468906 57882604 47882608 5EC4C656 89C44689 02578826 07882608 5EC40A05 ..á^.&..&.W..Fá.Vóá^.&.G.&.W..F¡ 0000E0
 DA5EC402 57892607 8926C656 88C44688 315FC426 DA5EC409 A6E9EA46 888A5689 .V¤.FõÕÌ.á^Ö&á_1.Fá.Vó&..&.W.á^Õ 000100
 26C65688 C4468831 5FC4260A 5EC40657 89260447 89268A56 88884688 315FC426 &á_1.F¡.V¤&.G.&.W.á^Ö&á_1.Fá.Vó& 000120
 260A5EC4 0E578926 0C478926 8A568888 4688315F C4260A5E C40A5789 26084789 .G.&.W.á^Ö&á_1.F¡.V¤&.G.&.W.á^Ö& 000140
 51578826 4F478826 DA5EC408 C4830C9D 086A9A0C 76FF0E76 FF3177FF 263377FF .w3&.w1.v..v..j....á.á^Ö&.GÖ&.WØ 000160
 0876FF0A 76FF0947 E9000000 009A9876 FF9A76FF 0C76FF0E 76FF9A56 89984689 .F..V..v..v..v..v......ÕG..v..v. 000180
 880006E9 03750000 30964689 0CC48308 7401089A DA76FFDC 76FFE276 FFE476FF .vÕ.vã.vÉ.vO...t..á..F.=..u.Õ..¡ 0001A0
 03750000 30964689 08C48301 D7500D9A E276FFE4 76FF5016 A4468009 22E90000 ..Õ"..FÉ.P.vÕ.vã.ìP=..á..F.=..u. 0001C0
 77FF26A4 5EC43477 FF263677 FF26A45E C40876FF 0A76FF08 FEE90000 880006E9 Õ..¡..Õ±..v..v.á^É&.wó&.wá^É&.w 0001E0

Dump of file SATURN:[PCCOMMON.DUMP.DLL]DAD.TMP;1 on 18-APR-1990 10:40:03.08
File ID (551,9,0)   End of file block 267 / Allocated 268

Virtual block number 171 (000000AB), 512 (0200) bytes

 76FF2A57 89262847 8926A656 88A44688 DA5EC40C C4830309 0E359A2C 7"<F262E .&.w,.5.)..á.á^Õ.FÉ.VÌ&.G(&.W°.v 000000
 E9037414 47082612 478826E2 5EC408C4 83025806 539A0C76 FF0E76FF A47 "FFA6 Ì.vÉ.v..v..S.X..á.á^ã&.G.&.G.t.Õ 000020
 5EC42C47 89260846 880A5EC4 001EE903 7500087E 830027E9 03750808 7E83¿030 0..-Ã.u.Õ'..-Ã.u.Õ..á^Õ.FÃ&.G,á^ 000040
 98468971 5788266F 4788260A 5EC40011 E99A5689 98468975 57882673 4788260A Õ&.Gs&.Wu.F..V.Õ..á^Õ&.Go&.Wq.F. 000060
 88261047 8826AC5E C4084AE9 00000597 9A9876FF 9A76FF0C 76FF0E76 FF9A5689 .V..v..v..v..v......ÕJ.á^¯&.G.&. 000080
 D846880A 5EC40114 E9037500 D87E8301 1DE90374 04EA7E83 9E56899C 46891257 W..F..V..~õ.t.Õ...~Ã.u.Õ..á^Õ.FÃ 0000A0
 1477FF26 1677FF26 AC5EC402 56890046 891A5788 26184788 260A5EC4 2C478926 &.G,á^Õ&.G.&.W..FÀ.Vóá^¯&.w.&.w. 0000C0
 E9037400 00300000 0DF69A50 16A0468D 1477FF26 1677FF26 AC5EC400 0000E69A .Ì...á^¯&.w.&.w..F..P.-...=..t.Õ 0000E0
 830EFC11 859AA076 FFA276FF 5016FC46 800050E9 03750030 7F8326A0 5EC40060 m.á^.&..0.u.Õ]..F=.P.vÀ.v....=.. 000100
 00008800 000F189A 1477FF26 1677FF26 AC5EC400 16E90375 00003096 468908C4 á..F.=..u.Õ..á^¯&.w.&.w......¡.. 000120
 76FF0677 FF260877 FF269C5E C400000F 2E9AFC76 FFFE76FF 50160046 8007A4E9 ÕÉ..FÀ.P.v±.v=.....á^.&.w.&.w..v 000140
 D076FFD2 76FF0000 0EC09AD0 76FFD276 FFFF76E9 08C4830E 9E18189A FC76FFFE ±.v=......á.Õv..v®.vÀ.á....v®.vÀ 000160
 9A9A0C76 FF0E76FF FC76FFFE 76FF0017 E9037400 00300000 0ED59A50 16FC4680 .F=.P.Ì...=..t.Õ...v±.v=.v..v... 000180
 0C76FF0E 76FF9A56 89984689 50578826 58478826 DA5EC4FF 01E908C4 830F8202 .ý..á.ÕÌ.á^Õ&.G[&.W].F..V..v..v. 0001A0
 E476FF08 76FF0A76 FF002BE9 037401EA 7E8301CE E9000010 089A9876 FF9A76FF .v..v......Õö..~õ.t.Õ+..v..v..vÕ 0001C0
 E9000088 0006E903 75000030 9646890C C483101E 00009ADA 76FFDC76 FFE276FF .vã.vÉ.vÖ......á..F.=..u.Õ..¡..Õ 0001E0
```

Dump of file SATURN:[PCCOMMON.DUMP.DLL]DAD.TMP;1 on 18-APR-1990 10:40:03.08
File ID (551,9,0)   End of file block 267 / Allocated 268

Virtual block number 172 (000000AC), 512 (0200) bytes

```
0A77FF26 0C77FF26 9C5EC408 76FF0A76 FF0024E9 0375000E 7F83269C 5EC406E5 |.á^.&....u.Ö$..v..v.á^.&.w.&.w. 000000
46891A57 88261847 88260A5E C40CC483 0F780E35 9A0677FF 260877FF 269C5EC4 á^.&.w.&.w..5.x..á.á^Ö&.G.&.W..F 000020
8D1477FF 261677FF 26AC5EC4 00000F87 9A1477FF 261677FF 26AC5EC4 025689D0 Å.V@á^^&.w.&.w......á^^&.w.&.w.. 000040
468D008F E9037500 307F8326 A05EC400 9FE90374 00003D00 000F979A 5016A046 F..P.....=..t.Ö..á^.&..0.u.Ö...F 000060
26AC5EC4 0016E903 7500003D 96468908 C4831042 11859AA0 76FFA276 FF5016FC =.P.vÅ.v....8..á..F.=..u.Ö..á^^& 000080
FFFF9AFC 76FFFE76 FF5016D0 468D0635 E9000088 000004E0 9A1477FF 261677FF .w.&.w..Å...|..ÖS..FÅ.P.v±.v=... 0000A0
568BFC46 8BDA5EC4 0011E903 74A25639 0019E903 74A04639 E4568BE2 46880000 ...Fã.VÖ9F.t.Ö..9VÅt.Ö..á^Ö.F=.V 0000C0
77FF26FC 5EC42077 FF262277 FF26FC5E C40876FF 0A76FF1E 5789261C 478926FE ±&.G.&.W..v..v.á^=&.w"&.w á^=&.w 0000E0
76FFD276 FF000002 239AD076 FFD276FF FF44E90C C4830C78 0E359A14 77FF2616 .&.w..5.x..á.ÖD..v@.vÅ.#....v@.v 000100
9A0C76FF 0E76FFFC 76FFFE76 FF0017E9 03740000 3D000002 389A5016 FC468DD0 Å.F=.P.8...=..t.Ö...v±.v=.v..v.. 000120
8BDA5EC4 001EE903 7500087E 830027E9 037401EA 7E83FFD1 E908C483 1078029A ..x..á.Ö1..-ö.t.Ö'..-Å.u.Ö..á^Ö. 000140
4788260A 5EC40011 E99A5689 98468959 57882657 4788260A 5EC42C47 89260846 FA&.G,á^Ö&.GW&.WY.F..V.Ö..á^Ö&.G 000160
FF0542E9 00001098 9A9876FF 9A76FF0C 76FF0E76 FF9A5689 98468955 57882653 S&.WU.F..V..v..v..v..v......Ö8.. 000180
00880006 E9037500 00309646 8908C483 10800088 9ADA76FF DC76FFE2 76FFE476 vÖ.vã.vÉ.vÖ...§..á..F.=..u.Ö..|. 0001A0
E9037500 00309646 8908C483 0C431F8A 9AE276FF E476FF50 160E468D 0523E900 .Ö#..F8.P.vÖ.vã...C..á..F.=..u.Ö 0001C0
FFDE76FF E076FF22 57892620 478926E0 5688DE46 88DA5EC4 04FFE900 00^80006 ..|..Ö..á^Ö.F8.VÅ&.G &.W".vÅ.v8. 0001E0
```

Dump of file SATURN:[PCCOMMON.DUMP.DLL]DAD.TMP;1 on 18-APR-1990 10:4U·03.08
File ID (551,9,0)   End of file block 267 / Allocated 268

Virtual block number 173 (000000AD), 512 (0200) bytes

```
76FF9A56 89984689 65578826 63478826 DA5EC408 C48308E0 04089A0C 76FF0E76 v..v....Å..á.á^Ö&.Gc&.We.F..V..v 000000
76FFCE56 89CC4689 E45688E2 468804AF E900000C 039A9876 FF9A76FF 0C76FF0E ..v..v..v......Ö€..Fã.VÖ.Fã.Vö.v 000020
00008800 06E90375 00003096 468908C4 83083C00 CB9ADA76 FFDC76FF CC76FFCE ö.vã.vÉ.vÖ.ù.<..á..F.=..u.Ö..|.. 000040
06E90374 01F07E83 042EE903 7500F07E 830437E9 0003E903 7500FA7E 830484E9 Ö...-*.u.Ö..Ö7..-Þ.u.Ö...-Þ.t.Ö. 000060
5EC43857 89263947 8926E856 88E6468B DA5EC490 46890000 880003E9 00018800 .|..Ö..|...F.á^Ö.F|.VÖ&.G9&.W;á^ 000080
96468900 00FFFF9A 5016EC46 8D2077FF 262277FF 26CC5EC4 35478926 9046880A Ö.F.&.G5á^ã&.w"&.w .F$.P......F. 0000A0
06E90000 880006E9 03750000 3008C483 07820000 9AAC76FF AE76FF96 76FF526A jR.v..vÜ.v^......á.=..u.Ö..|..Ö. 0000C0
006A0876 FF0A76FF 50169246 8D0163E9 037400EE 7E83016C E9037402 EC7E8304 ..-$.t.Öl..-Ÿ.t.Öc..F..P.v..v.j. 0000E0
06E90375 00003096 468914C4 8312EF38 A19ACC76 FFCE76FF E676FFE8 76FF026A j..vÖ.vl.vö.vã.Å;ÿ..á..F.=..u.Ö. 000100
0E5FC426 0A5FC426 CC5EC430 4789263F 47892600 0088DA5E C403C0E9 00008800 .|..Öá.á^Ö|..&.G?&.G=á^ã&á .&á . 000120
88260447 8826845E C4000EE9 03750090 7E838656 89844689 16578826 14478826 &.G.&.W..FÇ.VÑ.-..u.Ö..á^Ç&.G.&. 000140
5EC4000E E9037500 907E83CA 5689C846 89025788 26078826 845EC400 0AE90657 W.Ö..á^Ç&..&.W..Fà.Vò.-..u.Ö..á^ 000160
CC5EC482 56898046 890A5788 26084788 26845EC4 0008E90E 5788260C 47882684 Ç&.G.&.W.Ö..á^Ç&.G.&.W..F¯.Vÿá^ã 000180
C4000EE9 03750090 7E838656 89844689 16578826 14478826 0E5FC426 0E5FC426 &á .&á .&.G.&.W..FÇ.VÑ.-..u.Ö..á 0001A0
907E838E 56898C46 89025788 26078826 845EC400 0AE90657 88260447 8826845E ^Ç&.G.&.W.Ö..á^Ç&..&.W..F¥.V/.-. 0001C0
890A5788 26084788 26845EC4 0008E90E 5788260C 47882684 5EC4000E E9037500 .u.Ö..á^Ç&.G.&.W.Ö..á^Ç&.G.&.W.. 0001E0
```

Dump of file SATURN:[PCCOMMON.DUMP.DLL]DAD.TMP;1 on 18-APR-1990 10:40:03.08
File ID (551,9,0)   End of file block 267 / Allocated 268

Virtual block number 174 (000000AE), 512 (0200) bytes

```
0006E903 728C4638 0008E903 7D0013E9 037E8E56 38CA5688 C8468BAA 5689A846 F´.V^.Fà.Vò;V/-.Ö..).Ö..;F¥r.Ö.. 000000
380008E9 037E0013 E9037DAA 56388256 88804688 D6568904 46898C46 888E5688 .V/.F¥.Fà.V@.F¯.Vÿ;V^).Ö..-.Ö..; 000020
ADE90374 E84608E6 468801E7 E9C25689 C04689A8 4688AA56 880006E9 0377A846 F´w.Ö...V^.F´.Fà.VòÖÖ..F|.FÖt.ÖU 000040
C038A19A CC76FFCE 76FFE676 FFE876FF 036A006A 0876FF0A 76FF5016 92468000 ..F..P.v..v.j.j..vÖ.v|.vö.vã.Å;á 000060
263F4789 26000088 DA5EC402 52E90000 880006E9 03750000 30964689 14C48313 ..á..F.=..u.Ö..|..ÖR.á^Ö|..&.G?& 000080
00907E83 86568984 46891657 88261447 88260E5F C4260A5F C426CC5E C4304789 .G=á^ã&á .&á .&.G.&.W..FÇ.VÑ.-.. 0000A0
D4468902 57882607 8826845E C4000AE9 06578826 04478826 845EC400 0EE90375 u.Ö..á^Ç&.G.&.W.Ö..á^Ç&..&.W..FÅ 0000C0
47882684 5EC40008 E90E5788 260C4788 26845EC4 000EE903 7500907E 83065689 .V@.-..u.Ö..á^Ç&.G.&.W.Ö..á^Ç&.G 0000E0
E90374E6 4638000A 8300022D EE5688EC 4688012F E9C25689 C046890A 57882608 .&.W..Fã.VòÖ/..F$.VŸ-...Ö.;F|t.Ö 000100
2DE85688 E6468803 6A006A08 76FF0A76 FF501692 46800086 E90374E8 5638008E ƒ.;VÖt.ÖÑ..F..P.v..v.j.j..F|.VÖ- 000120
0006E903 7500003D 96468914 C4831476 38A19ACC 76FFCE76 FF505200 0A830001 ...Ö.RP.vö.vã.Å;v..á..F.=..u.Ö.. 000140
0E5FC426 0E5FC426 CC5EC400 003F47C7 26000130 47C7260A 5EC40181 E9000088 |..Ö..á^Ö&úG=..&úG?..á^ã&á .&á . 000160
88260447 8826845E C4000EE9 03750090 7E838656 89844689 16578826 14478826 &.G.&.W..FÇ.VÑ.-..u.Ö..á^Ç&.G.&. 000180
5EC4000E E9037500 907E8306 56890446 89025788 26078826 845EC400 0AE90657 W.Ö..á^Ç&..&.W..Fà.V@.-..u.Ö..á^ 0001A0
005DE9C2 5689C046 890A5788 26084788 26845EC4 0008E90E 5788260C 47882684 Ç&.G.&.W.Ö..á^Ç&.G.&.W..Fà.VòÖ). 0001C0
CE76FF50 52000A83 00012DE8 5688E646 88046A00 6A0876FF 0A76FF50 1692468D .F..P.v..v.j.j..F|.VÖ-...Ö.RP.vö 0001E0
```

```
Dump of file SATURN:[PCCOMMON.DUMP.DLL]DAD.TMP;1 on 18-APR-1990 10:40:03.08
File ID (551,9,0)   End of file block 267 / Allocated 268

Virtual block number 175 (000000AF), 512 (0200) bytes

 260A5EC4 00CBE900 0L880006 E9037500 00309646 8914C483 008D38A1 9ACC76FF .vä.Å;...é..F.=..u.Õ..¡..Õü.é^Õ& 000000
 DA5EC4C0 4689C?46 89000088 D44689D6 46890000 B800003F 47C72600 C"%047C7 úG=..&ÚG7..¡...Fø.Fé¡...Fô.Féé^Ö 000020
 C4475789 26454789 26C25688 C04688DA 5EC44357 89264147 89260656 88C 4688 .Fé.Vø&.GA&.WCé^Ö.Fé.VÖ&.GE&.WGé 000040
 1105859A 0C76FF0E 76FF9276 FF9476FF 26578926 24478926 94568892 4688DA5E ^Ö.F...V.&.G$&.W&.v..v..v..v..... 000060
 76FF9A76 FF0C76FF 0E76FF9A 56899846 89605788 26684788 260A5EC4 08C4830E ..é.é^Ö&.Gk&.Wm.F..V..v..v..v..v 000080
 023DF7D9 E9037500 013DF653 E90375C0 080032E9 0035E900 38E90000 0E379A98 ..7...Õ8.Õ5.Õ2..àu.ÕS-=..u.Õ1%=. 0000A0
 C8E9F68C E9037500 053DF7C1 E9037500 043DF864 E9037500 033DFAD9 E9037500 .u.Õ1°=..u.Õd«=..u.Õè%=..u.ÕŸ-Õà 0000C0
 B80000E4 46C7D88E 09DA881E 56570000 1CC8000E CAC95F5E 1F0000E9 000088FF .¡..Õ...^_èò..à...WV.¡Ö..ÄúFõ..¡ 0000E0
 B80000EA 46C7F846 89FA4689 000088EC 4689EE46 89000088 E64689E8 46890000 ...FÒ.F|¡...FŸ.F$¡...F°.F%úFõ..¡ 000100
 0C76FF0E 76FFF046 89F24689 000088FC 4689FE46 89000088 F44689F6 46890000 ...F-.F¶¡...F±.Fø¡...F·.FÞ.v..v. 000120
 76FFEE56 89EC4689 20578826 28478826 1FC426E6 5EC40000 0A8F9A50 16E64680 .F|.P.....é^|&é.&.G+&.W-.F$.VŸ.v 000140
 E676FFE8 76FFE476 FF506AE4 46890000 FFFF9A50 16F84680 016A006A EC76FFEE Ÿ.v$j.j..F%.P......FÒjP.vÒ.vÒ.v| 000160
 E9037502 47082607 8826F85E C40151E9 0003E903 75000030 08C48316 3000009A ...=..é.=..u.Õ..ÕQ.é^%&..&.G.u.Õ 000180
 6AE44689 0000FFFF 9A5016EA 468D37FF 260277FF 26F85EC4 EC76FFEE 76FF0127 '..vŸ.v$é^%&.w.&.7.Fõ.P......FÒj 0001A0
 EA468801 07E90003 E9037500 003D08C4 83168000 009AE676 FFE876FF E476FF50 P.vÒ.vÒ.v|......é.=..u.Õ..Õ...Fõ 0001C0
 890000FF FF9A5016 F4468000 6A37FF26 0277FF26 F85EC4EC 76FFEE76 FF0003E9 Õ&..vŸ.v$é^%&.w.&.7j..F¶.P...... 0001E0

Dump of file SATURN:[PCCOMMON.DUMP.DLL]DAD.TMP;1 on 18-APR-1990 10:40:03.08
File ID (551,9,0)   End of file block 267 / Allocated 268

Virtual block number 176 (000000B0), 512 (0200) bytes

 00C4E900 03E90375 00003008 C483113E 00009AE6 76FFE876 FFE476FF 506AE446 FÒjP.vÒ.vÒ.v|...>..é.=..u.Õ..Õé. 000000
 2AE90375 00003D0C C48316F9 009C9AE6 76FFE876 FFF476FF F676FF50 16FC4680 .F=.P.v-.v¶.vÒ.v|...'..é.=..u.Õ" 000020
 00003DE4 468908C4 830E5C00 889A0C77 FF260E77 FF26E65E C4FC76FF FE76FF00 ..v±.v=é^|&.w.&.w....\..é..FÒ=.. 000040
 37FF2602 77FF26F8 5EC45016 F0468D00 58E90076 E90003E9 007CE900 03E90375 u.Õ..Õ|.Õ..Õv.ÕX..FÞ.Pé^%&.w.&.7 000060
 FFF276FF 0C76FF0E 76FF0017 E9037500 003D0CC4 830ADA01 D49AE676 FFE876FF .vÒ.v|.à.Ö..é.=..u.Õ...v..v..v·. 000080
 1230FF25 E9037500 043D0013 E90016E9 0034E9FF FF1CE79A 0876FF0A 76FFF076 vÞ.v..v..Õ...Õ4.Õ..Õ..=..u.Õ%.=. 0000A0
 9A016A00 6A020968 006A1DAF 680877FF 261FC426 E65EC4FF E7E9FFA8 E9037500 .u.Õ¨.ÕÕ.é^|&é.&.w.h€.j.h..j.j.. 0000C0
 0000FFFF 9AF876FF FA76FFEC 76FFEE76 FF0027E9 0375FA46 08F84688 00000086 Å....F%.F°u.Õ'..vŸ.v$.v°.v%..... 0000E0
 C95F5E1F 0000E900 008808C4 8315F300 009AE676 FFE876FF E476FF50 6AE44689 .FÒjP.vÒ.vÒ.v|...µ..é.¡..Õ...^_è 000100
 000088DC 46890E46 89000088 0000DA46 C7D88E15 66881E56 57000028 C8000ECA ò..à(..WV.¡f..ÁúFÖ..¡...F8.FÉ¡.. 000120
 D846C7E0 4689E246 89000088 F24689F4 46890000 880000F6 46C7EE46 89F04689 .FÞ.FŸúF-..¡...F¶.F·¡...Fä.FÄúFÄ 000140
 88260C47 88260C5E C4000015 869A5016 DC46800C 76FF0E76 FF0008EC 46C7FFFF ..úF$...v..v..FÉ.P.Å...é^É&.G.&. 000160
 F2468D50 16EC4680 006A006A 006A006A 006A006A 006A006A F05689EE 46890E57 W..FŸ.VÞj.j.j.j.j.j.j.j..F$.P.F· 000180
 8928C483 16A403C5 9ADC76FF DE76FF08 76FF0A76 FFFF6AFF 6A5016F6 46805016 .P.F-.Pj.j..v..v..v8.vÉ.é.Ê..é(. 0001A0
 0E478826 F25EC400 28E90374 05F67E83 0323E900 00880006 E9037500 003DDA46 FÒ=..u.Õ..¡..Õ#..--.t.Õ+.é^ &.G. 0001C0
 C7F45689 F2468910 5788260E 478826F2 5EC40001 F646C700 1BE90375 10470826 &.G.u.Õ..úF-..é^ &.G.&.W..F·.V¶ú 0001E0

Dump of file SATURN:[PCCOMMON.DUMP.DLL]DAD.TMP;1 on 18-APR-1990 10:40:03.08
File ID (551,9,0)   End of file block 267 / Allocated 268

Virtual block number 177 (000000B1), 512 (0200) bytes

 C48316C5 09C29AEE 76FFF076 FFF276FF F476FF00 25E90374 080646F6 0000EC46 F$..-F..t.Õ%..v¶.v·.vÞ.vŸ.ò.é..é 000000
 26EE5EC4 02578826 07882608 5EC402C1 E9000088 0006E903 7500003D DA468908 ..FÖ=..u.Õ..¡..Õè.é^.&..&.W.é^Ÿ& 000020
 EE5EC447 57892645 478926EE 5EC40657 88260447 8826085E C4435789 26414789 .GA&.WCé^.&.G.&.W.é^Ÿ&.GE&.WGé^Ÿ 000040
 00FFFF9A 5016E446 8D0876FF 0A76FF01 6A026A0C 76FF0E76 FF2C4789 26EC4688 .F$&.G,.v..v.j.j..v..v..FÕ.P.... 000060
 B80006E9 03750000 3008C483 19570000 9ADC76FF DE76FFDA 76FF526A DA468900 ..FÖjR.vÖ.v8.vÉ...W..é.=..u.Õ..¡ 000080
 D846C7FE 5689FC46 89EA5688 E84688FA 5689F846 89E65688 E4468802 4EE90000 ..ÕN..FÕ.V|.F%.V°.FÕ.VÕ.F=.V±úFÄ 0000A0
 76FFDA76 FF4E6ADA 46890000 FFFF9A50 16E04680 0277FF26 1FC4260C 5EC4FFFF ..é^É&é.&.w..FÅ.P......FÖjN.vÖ.v 0000C0
 019EE9F6 468801F9 E9000088 0006E903 7500003D 08C48317 8100009A DC76FFDE 8.vÉ......é.=..u.Õ..¡..Õ°..F-Õ.. 0000E0
 001A009A 50160846 805016F8 46800200 36FF2619 8A068E03 8E68E076 FFE276FF .vâ.vÅh......&.6...F%.P.FÁ.P.... 000100
 B80006E9 03750000 3008C483 1A150000 9ADC76FF DE76FFDA 76FF526A DA468900 ..FÖjR.vÖ.v8.vÉ......é.=..u.Õ..¡ 000120
 831A3A00 009AEE76 FFF076FF F276FFF4 76FF0876 FF0A76FF 0180E901 AEE90000 ..ÕÜ.Õ...v..v..v¶.v·.vÞ.vŸ...:.. 000140
 198A068E 038F68E0 76FFE276 FF0180E9 00008800 06E90375 0000300A 46890CC4 é..FÖ=..u.Õ..¡..Õ...vâ.vÁh...... 000160
 FFDE76FF DA76FF?2 6ADA4689 00001A6D 9A501608 46805016 F8468002 0036FF26 &.6...F%.P.FÄ.P.m....FÖjR.vÖ.v8. 000180
 76FFF476 FF0100E? 013BE900 00880006 E9037500 003008C4 831A8200 009ADC76 vÉ......é.=..u.Õ..¡..Õ;.Õ...v¶.v 0001A0
 0113E900 00880006 E9037500 003DDA46 8908C483 1AA70088 9AEE76FF F076FFF2 ·.vÞ.vŸ...Ï..é..FÖ=..u.Õ..¡..Õ.. 0001C0
 001ADA9A 50160846 805016F8 46800200 36FF2619 8A068E03 9068E076 FFE276FF .vâ.vÅh......&.6...F%.P.FÄ.P.Ö.. 0001E0
```

```
Dump of file SATURN:[PCCOMMON.DUMP.DLL]DAD.TMP;1 on 18-APR-1990 10:40:03.08
File ID (551,9,0)   End of file block 267 / Allocated 268

Virtual block number 178 (000000B2), 512 (0200) bytes

 B80006E9 03750000 3D08C483 1AEF0000 9ADC76FF DE76FFDA 76FF526A 0A468900 ..FÖjR.vÖ.vB.vÉ...ÿ..á.=..u.Ö..| 000000
 3D0A4689 08C483'8 8C00CB9A EE76FFF0 76FFF276 FFF476FF 00A0E900 CEE90000 ..Öo.Ö...v¶.v..vP.vŸ.ü....á..FÖ= 000020
 8D020036 FF26198A 068E0391 68E076FF E276FF00 A6E90000 B80006E9 03750000 ..u.Ö..|..Öl..vā.vÁh......&.6... 000040
 0200009A DC76FFDE 76FFDA76 FF526ADA 46890000 FFFF9A50 16084680 5016F846 F½.P.FÄ.P......FÖjR.vÖ.vB.vÉ.... 000060
 C008002A E9002DE9 0030E900 33E90061 E9000088 0006E903 75000030 08C48319 ..á.=..u.Ö..|..Öa.Ö3.Ö0.Ö-.Ö*..á 000080
 000530FF 6BE90375 000330FF 06E90375 00023DFE 9BE90375 00013DFE 5BE90375 u.Ö[±=..u.Ö.±=..u.Ö..=..u.Ök.=.. 0000A0
 46881DAF 680277FF 261FC426 DC5EC400 1CE90375 FFD87E83 FFD0E9FF D0E90375 u.ÖÅ.ÖÅ..~Å.u.Ö..á^É&á.&.w.hÉ..F 0000C0
 56570000 08C8000E CAC95F5E 1F0000E9 0000B800 0017509A 016A006A 50529908 Å.RPj.j..P...|..Ö...^_èò..à...WV 0000E0
 46800C76 FF0E76FF FC4689FE 46890000 B8F84689 FA468900 00B8D88E 179BB81E .|...Å|...F°.F½|...F±.F=.v..v..F 000100
 26078B26 085EC4FE 5689FC46 890E578B 260C478B 26F85EC4 000017E3 9A5016F8 ½.P.D...á^½&.G.&.W..F=.V±á^.&..& 000120
 26FC5EC4 06578B26 04478B26 085EC402 57892607 8926315F C426FC5E C402578B .W.á^=&á_1&..&.W.á^.&.G.&.W.á^=& 000140
 08478926 315FC426 FC5EC402 578B2607 8B26085E C4065789 26044789 26315FC4 á_1&.G.&.W.á^.&..&.W.á^=&á_1&.G. 000160
 5EC40E57 89260C47 8926315F C426FC5E C406578B 2604478B 26085EC4 0A578926 &.W.á^.&.G.&.W.á^=&á_1&.G.&.W.á^ 000180
 FC5EC40C 76FF0E76 FF08C483 14EF086A 9A0C76FF 0E76FF31 77FF2633 77FF26FC =&.w3&.w1.v..v..j.ÿ..á..v..v.á^= 0001A0
 56570000 0EC8000E CAC95F5E 1F0000E9 0000B800 0015129A 7777FF26 7977FF26 &.wy&.ww.....|..Ö...^_èò..à...WV 0001C0
 0000B8F4 4689F646 89000088 F84689FA 46890000 B80000F2 46C7D88E 1B72B81E .|r..ÁúF...|...F°.F½|...F-.F¶|.. 0001E0

Dump of file SATURN:[PCCOMMON.DUMP.DLL]DAD.TMP;1 on 18-APR-1990 10:40:03.08
File ID (551,9,0)   End of file block 267 / Allocated 268

Virtual block number 179 (000000B3), 512 (0200) bytes

 0E76FF00 00FFFF9A 0876FF0A 76FF0876 FF0A76FF 0C76FF0E 76FFFC46 89FE4689 .F±.F=.v..v..v..v..v..v.......v. 000000
 5EC4F656 89F44689 12578B26 10478B26 F85EC400 001B949A 5016F846 8D0C76FF .v..F½.P.....á^½&.G.&.W..F¶.V-á^ 000020
 FF08C483 1D3707FD 9A0C76FF 0E76FFF4 76FFF676 FF0038E9 0375000E 7F8326F4 ¶&....u.Ö8..v~.v¶.v..v..».7..á.. 000040
 1D5B0ECC 9A0677FF 260877FF 26F45EC4 0A77FF26 0C77FF26 F45EC408 76FF0A76 v..v.á^¶&.w.&.w.á^¶&.w.&.w..ä.[. 000060
 FF260C5F C426F85E C400001D B89A1877 FF261A77 FF260C5F C426F85E C40CC483 .á.á^½&á_.&.w.&.w..|...á^½&á_.&. 000080
 76FFFC76 FFFE76FF 006CE903 7400003D 00001DD1 9A5016FC 46801877 FF261A77 w.&.w..F=.P.Ñ...=..t.Öl..v±.v=.v 0000A0
 FC5EC420 77FF2622 77FF26FC 5EC40876 FF0A76FF 08C4831D A3029A9A 0C76FF0E ..v....É..á..v..v.á^=&.w"&.w á^= 0000C0
 FF26FC5E C41877FF 261A77FF 26FC5EC4 0CC4830D D70ECC9A 1477FF26 1677FF26 &.w.&.w..à.=..á.á^=&.w.&.w.á^=&. 0000E0
 C48319A2 00009AF8 76FFFA76 FFF276FF 526AF246 890000FF FF9A1477 FF261677 w.&.w.......F jR.v .v°.v½...Å..á 000100
 260C5FC4 26F85EC4 08C4831D EC07FD9A 0C76FF0E 76FFF476 FFF676FF FF73E908 .Ös..v~.v¶.v..v..».$..á.á^½&á_.& 000120
 5016FC46 8D1877FF 261A77FF 260C5FC4 26F85EC4 00000D51 9A1877FF 261A77FF .w.&.w..Q...á^½&á_.&.w.&.w..F=.P 000140
 C4831C22 029A9A0C 76FF0E76 FFFC76FF FE76FF00 17E90374 00003D00 0000669A .f...=..t.Ö...v±.v=.v..v....".. á 000160
 CC46C7D8 8E1C52B8 1E565700 0036C800 0ECAC95F 5E1F0000 E9000088 FFC8E908 .Öà.|..Ö...^_èò..à6..WV.jR..ÁúFä 000180
 00B80000 F646C700 00CA46C7 E84689EA 46890000 B8E44689 E6468900 00B80000 ..|...F|.FÖ|...FÖ.FÖúFò..úF-..|. 0001A0
 B9E24689 0000B8FC 4689FE46 890000B8 EC4689EE 46890000 B8F24689 F4468900 ..F¶.F |...FŸ.F$|...F±.F=|...Fã. 0001C0
 5016E446 8D0C76FF 0E76FF00 00F046C7 F84689FA 46890000 B80000CE 46C7E046 FÁúFo..|...F°.F½úFÞ...v..v..FÖ.P 0001E0

Dump of file SATURN:[PCCOMMON.DUMP.DLL]DAD.TMP;1 on 18-APR-1990 10:40:03.08
File ID (551,9,0)   End of file block 267 / Allocated 268

Virtual block number 180 (000000B4), 512 (0200) bytes

 CA468949 478B26E8 5EC4EA56 89E84689 0E578B26 0C478B26 E45EC400 001C999A .....á^Ö&.G.&.W..FÖ.Vöá^Ö&.GI.Fò 000000
 006A006A 006A006A 006A006A 006A006A 006A0001 CE46C700 69E90374 01CA7E83 .-ò.t.Öi.úFo..j.j.j.j.j.j.j.j.j. 000020
 2A03C59A E476FFE6 76FF0876 FF0A76FF 016A006A 5016F646 8D5016F2 4680006A j..F .P.F-.Pj.j..v..v..vl.vÖ.é.* 000040
 0E7F8326 F25EC400 19E90374 01F67E83 0022E903 7400CC7E 83CC4689 28C48318 ..á(.Fa.~ä.t.Ö"..~~.t.Ö..á^ &... 000060
 EC5EC400 12E90375 EE4608EC 4688EE56 89EC4689 F4568BF2 4688000C E9037400 .t.Ö...F .V¶.F£.VŸ.F$.FŸu.Ö..á^$ 000080
 5EC4426A 006A006A 001EE903 7500CE7E 830000CE 46C70005 E9037500 307F8326 &..0.u.Ö..úFo...~ö.u.Ö..j.j.jBá^ 0000A0
 26E45EC4 206A006A 006A0018 E9CC4689 0AC4831F 5902FB9A 37FF2602 77FF26E4 Ö&.w.&.7.«.Y..á..FäÖ..j.j.j-á^Ö& 0000C0
 0010039A 1877FF26 1A77FF26 E85EC4CC 46890AC4 831D8C02 FB9A37FF 260277FF .w.&.7.«....á..Fäá^Ö&.w.&.w..... 0000E0
 5EC400CA E9037400 003D0000 1D1C9A50 16FC4680 1877FF26 1A77FF26 E85EC400 .á^Ö&.w.&.w..F=.P.....=..t.Öò.á^ 000100
 262447B8 26E05EC4 0057E903 7400CC7E 83E25689 E0468912 57882610 478B26FC =&.G.&.W..FÁ.Vä.-ä.t.ÖW.á^Á&.G$& 000120
 1677FF26 FC5EC400 36E90374 00307F83 26245FC4 26E05EC4 0011E903 7526470B .G&u.Ö..á^Á&á_$&..0.t.Ö6.á^=&.w. 000140
 76FFEE76 FF0014E9 037500CE 7E8308C4 831FFA13 8C9AE076 FFE276FF 1477FF26 &.w..vä.vÁ...¶..á..-ö.u.Ö...vŸ.v 000160
 FC76FFFE 76FF5052 001805EA 5688E846 8808C483 20AF1CEF 9AE076FF E276FFEC $.vä.vÁ.ÿ.€ .á..FÖ.VÖ...RP.v±.v= 000180
 0017E903 741C4739 26FE568B FC4688E8 5EC40000 01FA9A50 16F84680 016A006A j.j..F½.P.°...á^Ö.F=.V±&9G.t.Ö.. 0001A0
 14379AFC 76FFFE76 FF1C4789 261E4789 26000088 E85EC400 0EE90374 1E573926 &9W.t.Ö..á^Ö|..&.G.&.G..v±.v=.7. 0001C0
 261C478B 26E85EC4 002DE903 751E470B 261C478B 26E85EC4 FF19E904 C4832090 . .á.Ö..á^Ö&.G.&.G.u.Ö-.á^Ö&.G.& 0001E0
```

```
Dump of file SATURN:[PCCOMMON.DUMP.DLL]DAD.TMP;1 on 18-APR-1990 10:40:03.08
File ID (551,9,0)   End of file block 267 / Allocated 268

Virtual block number 181 (000000B5), 512 (0200) bytes

 14379AFC 76FFFE76 FF1C4789 261E4789 26000088 E85EC4FE 5689FC46 891E5788 .W..F=.V±á^ò¡..&.G.&.G..v±.v=.7. 000000
 EE68E476 FFE67AFF 50160046 8D5016F0 4680007F E9037400 CC7E8304 C4831181 ...á..~ä.t.Ö...Fÿ.P.FÅ.P.vl.vöhŸ 000020
 E476FFE6 76FFCC76 FF526ACC 468914C4 83200304 A79A0C76 FF0E76FF 030C681C .hÉ..v..v..Ì.Æ .á..FäjR.vä.vl.vö 000040
 0004179A 50160046 800C76FF 0E76FF00 10E90375 00F07E83 08C48321 1500009A ....Ì.á..~Þ.u.Ö...v..v..FÅ.P.... 000060
 FFE676FF CC76FF50 6ACC4689 00000433 9A2B77FF 262D77FF 261FC426 E45EC400 .á^Ö&á.&.w-&.w+.3....FäjP.vä.vl. 000080
 76FF0C76 FF0E76FF 0000FFFF 9A0C76FF 0E76FF00 0BE908C4 831F3B00 009AE476 vÖ...;..á.Ö...v..v.......v..v..v 0000A0
 CD09C29A E876FFEA 76FF006A 006A0012 E9037401 CA7E8300 00FFFF9A 1076FF12 ..v.......~ò.t.Ö..j.j..vö.vÖ.ö.ë 0000C0
 E446C7D8 8E1E09B8 1E565700 001CC800 0ECAC95F 5E1F0000 E9000088 08C48319 ..á.¡..Ö...^_èò..à...WV.¡...ÄúFö 0000E0
 FF0C76FF 0E76FFFC 4689FE46 89000088 0008FA46 C7E64689 E8468900 00880000 ..¡...FÒ.FÌúF°..¡...F±.F=.v..v.. 000100
 00001E71 9A5016E6 46800C76 FF0E76FF 00001C89 9A0876FF 0A76FF08 76FF0A76 v..v..v..v.......v..v..FÌ.P.q... 000120
 FC46891E 5788261C 4788260C 5FC426E6 5EC4FA46 892C4788 260C5FC4 26E65EC4 á^Ì&á_.&.G,.F°á^Ì&á_.&.G.&.W..F= 000140
 890EC483 22AD0000 9AFC76FF FE76FF08 76FF0A76 FFFA76FF 5016EA46 8DFE5689 .V±.FÕ.P.v°.v..v..v±.v=...Ü".á.. 000160
 46290257 88260788 26145FC4 26FC5EC4 0107E900 00880006 E9037500 003DE446 Fö=..u.Ö..¡..Ö..á^=&á .&..&.W.)F 000180
 145FC426 FC5EC4F0 5619EE46 29065788 26044788 26145FC4 26FC5EC4 EC5619EA ö.V±á^=&á .&.G.&.W.)FŸ.VÞá^=&á . 0001A0
 F646290E 578826·` 47882614 5FC426FC 5EC4F456 19F24629 0A578826 08478826 &.G.&.W.)F .V¶á^=&á .&.G.&.W.)F- 0001C0
 FF260C5F C426E65E C4000022 C59A1877 FF261A77 FF260C5F C426E65E C4F85619 .V½á^Ì&á_.&.w.&.w..Z"..á^Ì&á_.&. 0001E0

Dump of file SATURN:[PCCOMMON.DUMP.DLL]DAD.TMP;1 on 18-APR-1990 10:40:03.08
File ID (551,9,0)   End of file block 267 / Allocated 268

Virtual block number 182 (000000B6), 512 (0200) bytes

 76FFFC76 FFFE76FF 002DE903 7400003D 000022DE 9A5016FC 468D1877 FF261A77 w.&.w..F=.P.8"..=..t.Ö-..v±.v=.v 000000
 831FDD16 3E9AFC76 FFFE76FF FA76FF50 16EA468D 08C48322 F9029A9A 0C76FF0E ..v....°".á..Fö.P.v°.v±.v=.>.Ì.. 000020
 0C5FC426 E65EC400 001F6D9A 1877FF26 1A77FF26 0C5FC426 E65EC4FF 82E90AC4 á.Öy.á^Ì&á_.&.w.&.w..m...á^Ì&á_. 000040
 FC76FFFE 76FF0017 E9037400 003D0000 1F829A50 16FC468D 1877FF26 1A77FF26 &.w.&.w..F=.P.....=..t.Ö...v±.v= 000060
 0CC8000E CAC95F5E 1F0000E9 000088FF C8E908C4 831CCA02 9A9A0C76 FF0E76FF .v..v....ò..á.Öà.¡..Ö...^_èò..à. 000080
 89000088 F44689F6 46890000 88F84689 FA468900 0088088E 2169881E 56570000 ..WV.¡ìÌ.Ä¡...F°.F½¡...F-¯F¶¡... 0000A0
 FF0E76FF 0000219C 9A0876FF 0A76FF08 76FF0A76 FF0C76FF 0E76FFFC 4689FE46 F±.F=.v..v..v..v..v..v...Ì...v.. 0000C0
 F676FFF6 5689F446 89125788 26104788 26F85EC4 000021AC 9A5016F8 468D0C76 v..F½.P.¯Ì..á^½&.G.&.W..F¶.V-.v- 0000E0
 26F85EC4 0677FF26 0877FF26 F45EC408 C48323EF 07FD9A0C 76FF0E76 FFF476FF .v¶.v..v..».yW.á.á^¶&.w.&.w.á^½& 000100
 C426F85E C40EC483 240809EE 9AF476FF F676FF08 76FF0A76 FF2C77FF 260C5FC4 á_.&.w,.v..v..v-.v¶.Ÿ..$.á.á^½&á 000120
 468D1877 FF261A77 FF260C5F C426F85E C4000024 349A1877 FF261A77 FF260C5F _¯&.w.&.w..4$..á^½&á_.&.w.&.w..F 000140
 1F029A9A 0C76FF0E 76FFFC76 FFFE76FF 0030E903 7400003D 0000244D 9A5016FC =.P.M$..=..t.Ö0..v±.v=.v..v..... 000160
 FFAFE908 C48321EA 18E39AFC 76FFFE76 FF0677FF 260877FF 26F45EC4 08C48324 $.á.á^¶&.w.&.w..v±.v=.D.öl.á.ÖÉ. 000180
 261A77FF 260C5FC4 26F85EC4 08C48324 6807FD9A 0C76FF0E 76FFF476 FFF676FF .v-.v¶.v..v..».h$.á.á^½&á .&.w.& 0001A0
 00227C9A 5016FC46 8D1877FF 261A77FF 260C5FC4 26F85EC4 00002263 9A1877FF .w..c"..á^½&á_.&.w.&.w..F=.P.|". 0001C0
 FFC8E908 C4832297 029A9A0C 76FF0E76 FFFC76FF FE76FF00 17E90374 00003000 .=..t.Ö...v±.v=.v..v.....".á.Öà. 0001E0

Dump of file SATURN:[PCCOMMON.DUMP.DLL]DAD.TMP;1 on 18-APR-1990 10:40:03.08
File ID (551,9,0)   End of file block 267 / Allocated 268

Virtual block number 183 (000000B7), 512 (0200) bytes

 89FA4689 00008808 8E231688 1E565700 0008C800 0ECAC95F 5E1F0000 E9000088 ¡..Ö...^_èò..à...WV.¡.#.Á¡...F°. 000000
 FFFF9A08 76FF0A76 FF0876FF 0A76FF0C 76FF0E76 FFFC4689 FE468900 0088F846 F½¡...F±¯F=.v..v..v..v..v..v.... 000020
 57882620 4788260C 5FC426F8 5EC40000 23589A50 16F8468D 0C76FF0E 76FF0000 ...v..v..F½.P.X#..á^½&á .&.G &.W 000040
 76FF0A76 FF08C483 25220408 9A0C76FF 0E76FFFC 76FFFE76 FFFE5689 FC468922 ".F=.V±.v±.v=.v..v...."X.á..v..v 000060
 23A62830 9AFC76FF FE76FF08 76FF0A76 FF08C483 250E0867 9AFC76FF FE76FF08 ..v±.v=.g..X.á..v..v..v±.v=.=+Ì# 000080
 5F5E1F00 00E90000 8808C483 237C0408 9A0C76FF 0E76FFFC 76FFFE76 FF08C483 .á..v±.v=.v..v....|#.á.¡..Ö...^_ 0000A0
 0088E646 89E84689 00008800 000446C7 D88E2485 881E5657 00002CC8 000ECAC9 èò..à,..WV.¡.$.ÄúFá..¡...FÒ.FÌ¡¯ 0000C0
 76FF0000 FA46C7FC 4689FE46 89000088 EE4689F0 46890000 88EA4689 EC468900 ..F&.Fö¡...FÞ.FŸ|...F±.F=úF°...v 0000E0
 C4EC5689 EA46890E 5788260C 478826E6 5EC40000 248E9A50 16E6468D 0C76FF0E ..v..FÌ.P./$..á^Ì&.G.&.W..Fö.V±á 000100
 5689FC46 89165788 26144788 26EE5EC4 F05689EE 46892257 88262047 8826EA5E ^ö&.G &.W".FŸ.VÞá^Ÿ&.G.&.W..F=.V 000120
 4C02F89A 37FF2602 77FF26E6 5EC42E6A 0A77FF26 0C77FF26 0A5FC426 FC5EC4FE ±á^=&á .&.w.&.w.j.á^Ì&.w.&.7.«.L 000140
 00047E83 0000FFFF 9A5016F2 468D1877 FF261D77 FF26EE5E C4044689 0AC48326 &.á..FĂá^Ÿ&.w.&.w..F·.P......~&. 000160
 559AEE76 FFF076FF 08C48326 3E2C079A FC76FFFE 76FF5016 F2468D00 13E90374 t.Ö...F·.P.v±.v=..,>&.á..vÞ.vŸ.U 000180
 FA468D00 7FE90374 00D47E83 20478926 22478926 000088EA 5EC404C4 83205023 #P .á.á^ö¡..&.G"&.G .~&.t.Ö...F° 0001A0
 C4832662 04A79A0C 76FF0E76 FF208268 24FA68E6 76FFE876 FF501606 46805016 .P.F=.P.vÖ.vlh°$hý .v..v..Ì.b&.á 0001C0
 0010E903 7500FA7E 8308C483 26A40000 9AE676FF E876FFD4 76FF526A D4468914 ..FäjR.vå.vÖ.vl...£&.á..-°.u.Ö.. 0001E0
```

Dump of file SATURN:[PCCOMMON.DUMP.DLL]DAD.TMP;1 on 18-APR-1990 10:40:03.08
File ID (551,9,0)   End of file block 267 / Allocated 268

Virtual block number 184 (000000B8), 512 (0200) bytes

```
009A2B77 FF262D77 FF261FC4 26E65EC4 000020ED 9A5016D6 468D0C76 FF0E76FF .v..v..Fø.P.Ù ..á^I&á.&.w-&.w+.. 000000
FF0E76FF 000BE9U8 C4832080 00009AE6 76FFE876 FFD476FF 506A0446 89000021 ‡...FâjP.vâ.vÒ.v|...§ .á.Õ...v.. 000020
5E1F0000 E9000088 00002135 9A1076FF 1276FF0C 76FF0E76 FF000021 249A0C76 v..$!...v..v..v..v..5!..¡..Õ...^ 000040
FA468900 0088FC46 69FE4689 00008808 8E253CB8 1E565700 0008C800 0ECAC95F _èò..à...WV.¡<%.Ä|...F±.F=¡...F* 000060
0C76FF0E 76FF0000 24AE9A08 76FF0A76 FF0876FF 0A76FF0C 76FF0E76 FFF84689 _F½.v..v..v..v..v..v..Ü$...v..v. 000080
FFFA5689 F8468926 57882624 4788260C 5FC426FC 5EC40000 257A9A50 16FC468D .F=.P.z%..á^=&á_.&.G$&.W&.F½.V*. 0000A0
FA76FF08 76FF0A76 FF016A00 6A08C483 276A0585 9A0C76FF 0E76FFF8 76FFFA76 v*.v½.v..v....j'.á.j.j..v..v..v* 0000C0
B808C483 24E60585 9A0C76FF 0E76FFF8 76FFFA76 FF0CC483 26033630 9AF876FF .v½.06.&.á..v*.v½.v..v....|$.á.| 0000E0
00008800 00E846C7 088E260D 881E5657 00001CC8 000ECAC9 5F5E1F00 00E90000 ..Õ...^_èò..à...WV.¡I&.ÁúFÒ..|.. 000100
0876FF0A 76FF0C76 FF0E76FF 0000FE46 C7E44689 E6468900 0088FA46 89FC4689 .F=.F*|¯..F|.FôúF±...v..v..v..v. 000120
6A006A00 6A000027 169A5016 FA468D0C 76FF0E76 FF000027 069A0876 FF0A76FF .v..v...'...v..v..F*.P..'..j.j.j 000140
4788260C 5FC426FA 5EC4E846 890AC483 287402F8 9A37FF26 0277FF26 FA5EC430 0á^*&.w.&.7.«.t(.á..FÒá^*&á_.&.G 000160
263877FF 260C5FC4 26FA5EC4 0028E903 7400E87E 83E65689 E4468926 57882624 $&.W&.FÕ.V|.-Õ.t.Õ(.á^*&á_.Ï.w;& 000180
FFE676FF 0CC48328 6636309A 1477FF26 1677FF26 E45EC408 76FF0A76 FF3977FF .w9.v..v.á^Õ&.w.&.w..06f(¯á..v|. 0001A0
00E87E83 24478926 26478926 0000880C 5FC426FA 5EC404C4 8326113F A39AE476 vÕ.È7.&.á.á^*&á_.¡..&.G&&.G$.-Õ. 0001C0
76FF0E76 FF264168 275668FA 76FFFC76 FF5016EA 46805016 FE468000 7FE90374 t.Õ...F±.P.Fõ.P¯v=.v*hV'hA&.v..v 0001E0
```

Dump of file SATURN:[PCCOMMON.DUMP.DLL]DAD.TMP;1 on 18-APR-1990 10:40:03.08
File ID (551,9,0)   End of file block 267 / Allocated 268

Virtual block number 185 (000000B9), 512 (0200) bytes

```
8308C483 28CC0000 9AFA76FF FC76FFE8 76FF526A E8468914 C483288A 04A79A0C ..Ï..(.á..FÒjR.vÒ.v=.v*...ä(.á.. 000000
FF261FC4 26FA5EC4 0000267C 9A5016EA 468D0C76 FF0E76FF 0010E903 7500FE7E -±.u.Õ...v..v..Fõ.P.|&..á^*&á.&. 000020
C48325CF 00009AFA 76FFFC76 FFE876FF 506AE846 89000026 8F9A2877 FF262D77 w-&.w+..&...FÒjP.vÒ.v=.v*...üX.á 000040
000026C4 9A1076FF 1276FF0C 76FF0E76 FF000026 839A0C76 FF0E76FF 000BE908 .Õ...v..v..*&...v..v..v..v..á&.. 000060
89FE4689 00008808 8E2784B8 1E565700 0008C800 0ECAC95F 5E1F0000 E9000088 ¡..Õ...^_èò..à...WV.¡.'.Ä|...F±. 000080
27879A08 76FF0A76 FF0876FF 0A76FF0C 76FF0E76 FFF84689 FA468900 0088FC46 F=¡...F*¯F½.v..v..v..v..v..v..ñ' 0000A0
57882624 4788260C 5FC426FC 5EC40000 27C79A50 16FC468D 0C76FF0E 76FF0000 ...v..v..F=.P.ú'..á^=&á_.&.G$&.W 0000C0
C426FC5E C408C483 29A80585 9A0C76FF 0E76FFF8 76FFFA76 FFFA5689 F8468926 &.F½.V*.v*.v½.v..v....¯).á.á^=&á 0000E0
76FFFA76 FF0876FF 0A76FF30 77FF263F 77FF260C 5FC426FC 5EC43577 FF260C5F _.&.w5á^=&á_.&.w7&.w=.v..v..v*.v 000100
00008808 C483273E 05859A0C 76FF0E76 FFF876FF FA76FF0E C4832827 37259AF8 ¥.X7'(.á..v¯.v½.v..v....>'.á.|.. 000120
46890000 88000000 46C7088E 2905881E 56570000 34C8000E CAC95F5E 1F0[illegible]0E9 Õ...^_èò..à4..WV.¡.).ÁúFÅ..|...F 000140
88E64689 E8468900 0088CC46 89CE4689 000088EA 4689EC46 89000088 E246[illegible]E4 Õ.Fã¡...F$.Fõ¡...Fö.Fã¡...FÒ.F|¡ 000160
FF0A76FF 0C76FF0E 76FF0000 EE46C7FC 4689FE46 89000088 F04689F2 46890000 ...F·.FÞ¡...F±.F=úFŸ...v..v..v.. 000180
6A006A00 00293E9A 5016E246 800C76FF 0E76FF00 00292E9A 0876FF0A 76FF0876 v..v..v...)...v..v..Fã.P.>)..j.j 0001A0
260C4788 26E25EC4 D046890A C4832C3F 02F89A37 FF260277 FF26E25E C4316A00 .j1á^ã&.w.&.7.«.?,.á..FÅá^ã&.G.& 0001C0
478826CC 5EC4CE56 89CC4689 26578826 24478826 EA5EC4EC 5689EA46 890E5788 .W..Fõ.V$á^õ&.G$&.W&.Fã.Voá^ã&.G 0001E0
```

Dump of file SATURN:[PCCOMMON.DUMP.DLL]DAD.TMP;1 on 18-APR-1990 10:40:03.08
File ID (551,9,0)   End of file block 267 / Allocated 268

Virtual block number 186 (000000BA), 512 (0200) bytes

```
00007E83 F25689F0 46893857 88263947 8826EA5E C4E85689 E6468916 57882614 .&.W..F|.VÒá^õ&.G9&.W;.FÞ.V·.~Å. 000000
77FF26E6 5EC41FA5 A5A5A5DA 8E1E0716 F088F47E 800A5688 08468801 4AE90374 t.ÕJ..F..V..~¶.Þ....ÕÉÉÉÉ.á^I&.w 000020
63E90374 00FE7E83 006CE903 7402FC7E 83000011 299A5016 FC468D20 77FF2622 "&.w .Fø.P.)....~ø.t.Õl..-±.t.Õc 000040
5EC45016 F4468D08 C4832AFC 08679A0A 77FF260C 77FF26E6 5EC45016 F4468D00 ..F¶.Pá^I&.w.&.w..g.=*.á..F¶.Pá^ 000060
77FF2610 77FF26E6 5EC45016 F4468D08 C4832814 2C079A0A 77FF260C 77FF26E6 I&.w.&.w...,.+.á..F¶.Pá^I&.w.&.w 000080
C4832852 2C079A0E 77FF2610 77FF26E6 5EC45016 F4468D08 C483282C 08679A0E ..g.,+.á..F¶.Pá^I&.w.&.w...,R+.á 0000A0
9A0A77FF 260C77FF 26E65EC4 5016F446 800033E9 0374F246 08F04688 008AE908 .Õ...FÞ.F t.Õ3..F¶.Pá^I&.w.&.w.. 0000C0
E908C483 28A12C07 9A0A77FF 260C77FF 26E65EC4 5016F446 8008C483 286A0867 g.j+.á..F¶.Pá^I&.w.&.w...,Å+.á.Õ 0000E0
468D0030 E90374F2 56380038 E90374F0 4638000A 8300022D FE5688FC 4688004C L..Fø.V±·...Õ.;FÞt.Õ8.;V·t.Õ0..F 000100
FF26E65E C45016F4 468008C4 83288908 679A0E77 FF261077 FF26E65E C45016F4 ¶.Pá^I&.w.&.w..g.¿+.á..F¶.Pá^I&. 000120
76FF0A76 FFF076FF F276FF35 77FF26EA 5EC408C4 8328DA2C 079A0E77 FF261077 w.&.w...,Õ+.á.á^õ&.w5.v·.vÞ.v..v 000140
EA5EC404 C4832835 3FA39ACC 76FFCE76 FF0EC483 2C313725 9AE676FF E876FF08 ..vÕ.v|.X71,.á..vö.vã.È75(.á.á^õ 000160
26000088 EA5EC441 47892643 47892600 0088EA5E C4244789 26264789 26000088 ¡..&.G&&.G$á^õ¡..&.GC&.GAá^õ¡..& 000180
E276FFE4 76FF5016 D2468D50 16EE468D 007FE903 7400007E 83454789 26474789 .GG&.GE.~Å.t.Õ...FŸ.P.Fø.P.vÕ.vã 0001A0
FFE476FF D076FF52 6AD04689 14C4832C 5504A79A 0C76FF0E 76FF2869 68299468 h.)hi(.v..v..Ï.U,.á..FÅjR.vÅ.vÕ. 0001C0
A49A5016 D2468D0C 76FF0E76 FF0010E9 037500EE 7E8308C4 832C9700 009AE276 vã....,.á..~Ÿ.u.Õ...v..v..Fø.P.Ê 0001E0
```

```
Dump of file SATURN:[PCCOMMON.DUMP.DLL]DAD.TMP;1 on 18-APR-1990 10:40:03.08
File ID (551,9,0)   End of file block 267 / Allocated 268

Virtual block number 187 (000000BB), 512 (0200) bytes

 76FFD076 FF506AD0 46890000 28879A28 77FF262D 77FF261F C426E25E C4000028 (..á^ã&á.&.w-&.w+.ñ(...FÅjP.vÅ.v 000000
 0C76FF0E 76FF0000 28D89A0C 76FF0E76 FF0008E9 08C48327 DE00009A E276FFE4 ð.vä...ß'.á.Ö...v..v..Ü(...v..v. 000020
 881E5657 00000AC8 000ECAC9 5F5E1F00 00E90000 88000028 EC9A1076 FF1276FF .v..v..é(..¡..Ö...^_èò..à...WV.¡ 000040
 76FF0E76 FFF84689 FA468900 0088FC46 89FE4689 00008800 00F646C7 D88E29C2 ö).ÁúF-..¡...F±.F•¡...F'.F½.v..v 000060
 2A299A50 16FC468D 0C76FF0E 76FF0000 23489A08 76FF0A76 FF0876FF 0A76FF0C ..v..v..v..v..H#...v..v..F•.P.)* 000080
 0E76FFF8 76FFFA76 FFFA5689 F846892A 57882628 478B260C 5FC426FC 5EC40000 ..á^•&á_.&.G(&.W*.F½.V'.v'.v½.v. 0000A0
 26F85EC4 3477FF26 3677FF26 F85EC408 76FF0A76 FF08C483 29660653 9A0C76FF .v..S.f).á..v..v.á^½&.wá&.wá^½& 0000C0
 C40034E9 03752247 0B262047 8B26F85E C40CC483 2AE40ECC 9A2C77FF 262E77FF .w.&.w,.ä.ð*.á.á^½&.G &.G"u.Ö4.á 0000E0
 FF526AF6 46890000 FFFF9A2C 77FF262E 77FF26F8 5EC42077 FF262277 FF26F85E ^½&.w"&.w á^½&.w.&.w,......F-jR. 000100
 03751E47 0B261C47 8B26F85E C40041E9 08C4832D DF00009A FC76FFFE 76FFF676 v-.v±.v•...Ô-.á.ÔA.á^½&.G.&.G.u. 000120
 46890000 1D779A2C 77FF262E 77FF26F8 5EC41C77 FF261E77 FF26F85E C40031E9 Ö1.á^½&.w.&.w.á^½&.w.&.w,.w....F 000140
 0C76FF0E 76FFF876 FFFA76FF 08C4832A 4000009A FC76FFFE 76FFF676 FF526AF6 -jR.v-.v±.v•...ã*.á..v'.v½.v..v. 000160
 8E2CD088 1E565700 001CC800 0ECAC95F 5E1F0000 E9000088 08C4832D 3606539A .S.ó-.á.¡..Ö...^_èò..à...WV.¡Å,. 000180
 0E76FF00 00FE46C7 F64689F8 46890000 88FA4689 FC468900 00880000 E446C7D8 ÁúFõ..¡...F•.F'¡...F½.F-úF±...v. 0001A0
 89F64689 2A578826 28478826 0C5FC426 FA5EC400 0020D0E9A 5016FA46 8D0C76FF .v..F'.P.:-..á^'&á_.&.G(&.W*.F-. 0001C0
 02F89A37 FF260277 FF26FA5E C4326A0A 77FF260C 77FF2618 5FC426F6 5EC4F856 V½á^-&á_.&.w.&.w.jZá^'&.w.&.7.«. 0001E0

Dump of file SATURN:[PCCOMMON.DUMP.DLL]DAD.TMP;1 on 18-APR-1990 10:40:03.08
File ID (551,9,0)   End of file block 267 / Allocated 268

Virtual block number 188 (000000BC), 512 (0200) bytes

 26F65EC4 2C77FF26 2E77FF26 F65EC400 1EE90374 00E47E83 E446B90A C4B32EE7 Ô..á..Fõ.-õ.t.Ö..á^-&.w.&.w,á^-& 000000
 FA5EC404 C48328E8 53E79AF6 76FFF876 FF08C483 2ED9464E 9A1877FF 261A77FF .w.&.w..NF)..á..v½.v-.ÖSÖ+.á.á^' 000020
 E6468D50 16FE468D 007CE903 7400E47E 83284789 262A4789 26000088 0C5FC426 &á_.¡..&.G*&.G(.-õ.t.Ö|..F±.P.F] 000040
 6AE44689 14C4832E FD04A79A 0C76FF0E 76FF2C34 682D5A68 FA76FFFC 76FF5016 .P.v•.v'hZ-h4,.v..v..Ï.w..á..Fõj 000060
 76FF0E76 FF0010E9 037500FE 7E8308C4 832F3F00 009AFA76 FFFC76FF E476FF52 R.võ.v•.v'...?/.á..~±.u.Ö...v..v 000080
 46890000 2C829A2B 77FF262D 77FF261F C426FA5E C400002C 6F9A5016 E6468D0C ..F|.P.o,..á^'&á.&.w-&.w+..,...F 0000A0
 1076FF12 76FF0C76 FF0E76FF 08C4832D 9800009A FA76FFFC 76FFE476 FF506AE4 õjP.võ.v•.v'....-.á..v..v..v..v. 0000C0
 46C7D88E 2E0D881E 56570000 0CC8000E CAC95F5E 1F0000E9 00008800 002C879A .ñ,..¡..Ö...^_èò..à...WV.¡...ÁúF 0000E0
 0C76FF0E 76FFF646 89F84689 00008800 08FE46C7 FA4689FC 46890000 880000F4 ¶..¡...F•.F'úF±..¡...F½.F-.v..v. 000100
 002E399A 5016FA46 8D0C76FF 0E76FF00 002CFE9A 0876FF0A 76FF0876 FF0A76FF .v..v..v..v..±,...v..v..F'.P.9.. 000120
 46892A57 8B262847 8B260C5F C426FA5E C4FE4689 2C478826 0C5FC426 FA5EC400 .á^'&á_.&.G,.F±á^'&á_.&.G(&.W*.F 000140
 262E77FF 26F65EC4 08C48330 9E06539A 0C76FF0E 76FFF676 FFF876FF F85689F6 -.V½.v½.v-.v..v..S..Ö.á.á^-&.w.& 000160
 478B26F6 5EC40EC4 832E9A04 F79AF676 FFF876FF 0876FF0A 76FFFE76 FF2C77FF .w,.v±.v..v..v½.v-.%....á.á^-&.G 000180
 2C77FF26 2E77FF26 F65EC420 77FF2622 77FF26F6 5EC40034 E9037522 47082620  &.G"u.Ö4.á^-&.w"&.w á^-&.w.&.w, 0001A0
 5EC40041 E908C483 308A0000 9AFA76FF FC76FFF4 76FF526A F4468900 0020869A ..·...F¶jR.v¶.v•.v'....0.á.ÖA.á^ 0001C0
 2E77FF26 F65EC41C 77FF261E 77FF26F6 5EC40031 E903751E 4708261C 478826F6 -&.G.&.G.u.Ö1.á^-&.w.&.w.á^-&.w. 0001E0

Dump of file SATURN:[PCCOMMON.DUMP.DLL]DAD.TMP;1 on 18-APR-1990 10:40:03.08
File ID (551,9,0)   End of file block 267 / Allocated 268

Virtual block number 189 (000000BD), 512 (0200) bytes

 FF08C483 2E700000 9AFA76FF FC76FFF4 76FF526A F4468900 0020CA9A 2C77FF26 &.w,.ò-...F¶jR.v¶.v•.v'...p..á.. 000000
 000ECAC9 5F5E1F00 00E90000 8808C483 2DF30653 9A0C76FF 0E76FFF6 76FFF876 v½.v-.v..v..S.µ-.á.¡..Ö...^_èò.. 000020
 76FFF846 89FA4689 000088FC 4689FE46 89000088 D88E2F6A 881E5657 000008C8 à...WV.¡j/.Ä¡...F±.F•¡...F'.F½.v 000040
 F8468933 57882631 4788260C 5FC426FC 5EC40000 2FAD9A50 16FC468D 0C76FF0E ..v..F•.P.Ù/..á^•&á_.&.G1&.W3.F½ 000060
 57882607 8B26085E C408C483 3141086A 9A0C76FF 0E76FFF8 76FFFA76 FFFA5689 .V'.v'.v½.v..v..j.AÏ.á.á^.&..&.W 000080
 89260C47 8926F85E C4065788 26044788 26085EC4 0A578926 08478926 F85EC402 .á^½&.G.&.W.á^.&.G.&.W.á^½&.G.&. 0000A0
 C95F5E1F 0000E900 008808C4 832FE308 6A9A0C76 FF0E76FF F876FFFA 76FF0E57 W..v'.v½.v..v..j.D/.á.¡..Ö...^_è 0000C0
 000088F4 4689F646 89000088 0000EA46 C7D88E30 88881E56 5700001A C8000ECA ò..à...WV.¡¡0.ÁúFõ..¡...F-.F¶¡.. 0000E0
 FE46C7F0 4689F246 89000088 0000FC46 C7EC4689 EE468900 0088E646 89E84689 .Fò.F|¡...FŸ.F±úF•..¡...F·.FÞúF± 000100
 C426F45E C4000030 DA9A5016 F4468D0C 76FF0E76 FFF84689 FA468900 00880000 ..¡...F'.F½.v..v..F¶.P.Ö0..á^¶&á 000120
 02086A9A 0C76FF0E 76FFE676 FFE876FF E85689E6 46893357 88263147 88260C5F _.&.G1&.W3.F|.VÒ.vÒ.v|.v..v..j.. 000140
 46890000 FFFF9A50 16EC468D 016A006A E676FFE8 76FF0C76 FF0E76FF 08C48331 Ï.á..v..v..vÒ.v|j.j..F&.P......F 000160
 E9000088 0006E903 7500003D 08C48332 3A00009A F476FFF6 76FFEA76 FF526AEA õjR.võ.v-.v¶...:2.á.=..u.Ö..¡..Ö 000180
 76FF526A EA468900 0032AC9A 5016F046 8D5016FC 468D016A EC76FFEE 76FF00EF ÿ..vŸ.v&j..F•.P.FÞ.P.¯2...FõjR.v 0001A0
 8D5016F8 468D007F E90375F2 460BF046 8808C483 32C10000 9AF476FF F676FFEA ö.v-.v¶...è2.á..FÞ.F·u.Ö...F½.P. 0001C0
 28E90374 00EA7E83 EA46890E C4831ECF 02709AFC 76FFF076 FFF276FF 5016FE46 F±.P.v·.vÞ.v•.p.u..á..Fõ.-õ.t.Ö( 0001E0
```

```
Dump of file SATURN:[PCCOMMON.DUMP.DLL]DAD.TMP;1 on 18-APR-1990 10:40:03.08
File ID (551,9,0)   End of file block 267 / Allocated 268

Virtual block number 190 (000000BE), 512 (0200) bytes

 77FF260E 77FF26"4 5EC4F876 FFFA76FF 0876FF0A 76FF001F E9037401 FE7E8300 ..-±.t.Õ...v..v..vª.v¼á^¶&.w.&.w 000000
 0000FFFF 9A5016F0 468D5016 FC468000 6AEC76FF EE76FF0C C483214F 00009A0C ....Ol.á..vŸ.vŠj..F•.P.FÞ.P..... 000020
 9AEC76FF EE76FFFF 76E908C4 8332E500 009AF476 FFF676FF EA76FF52 6AEA4689 .FõjR.võ.v~.v¶...Î2.á.Õv..vŸ.v$. 000040
 0C76FF0E 76FF08C4 83304600 009AF476 FFF676FF EA76FF52 6AEA4689 0000FFFF .....FõjR.võ.v-.v¶...F0.á..v..v. 000060
 B81E5657 000006C8 000ECAC9 5F5E1F00 00E90000 B800002F 519A1076 FF1276FF .v..v..Q/..¡..Õ...^_èò..à...WV.¡ 000080
 31A79A50 16FC468D 0C76FF0E 76FFFC46 89FE4689 0000B800 00FA46C7 D88E315B [1.ÄúFª..¡...F±.F•.v̄..v..F•.P.Ï1 0000A0
 46890000 FFFF9A02 6A3177FF 263377FF 260C5FC4 26FC5EC4 0C76FF0E 76FF0000 ...v..v.á^•&á_.&.w3&.w1j.......F 0000C0
 1076FF12 76FF0C76 FF0E76FF 08C48331 FF00009A FC76FFFE 76FFFA76 FF526AFA ªjR.vª.v±.v•....1.á..v..v..v..v. 0000E0
 0825E802 03098900 0932D002 03002C0E CAC95F5E 1F0000E9 0000B800 0032F79A .¼2..¡..Õ...^_èò.,...Â2..¿...ÕX. 000100
 09307502 03000000 052EA800 020AB900 0B2CA602 03000000 03335F00 02044A00 .J..._3......Ī,..¿...´.......u0. 000120
 0A1C3902 03000000 0731CF00 020AC400 0B2F1702 0308BE00 08076002 03064D00 .M...m̄...ƒ..../..á...ü1......9.. 000140
 09326000 02010200 04176C02 03001A00 0104B301 03000000 08329400 020A4E00 .N....2......•.......l.......'2. 000160
 03198D02 03000000 08054400 020A5A00 0A337102 03000000 0A300500 02000000 ......0......q3..Z...D.......... 000180
 07201A02 03000000 0C171800 02010E00 04162802 03020000 04150E02 03001400 .....B.......(.............. . 0001A0
 06185902 034E0200 0A2EDC00 05000000 10331000 02002F00 0104CD01 03037E00 .~...e.../....3......Ê....N..Y.. 0001C0
 0931EA02 03032000 07238802 03039800 070DBF02 03087A00 0B18ED02 03029800 .....Ù...z...¢.......E#.. ...ô1. 0001E0

Dump of file SATURN:[PCCOMMON.DUMP.DLL]DAD.TMP;1 on 18-APR-1990 10:40:03.08
File ID (551,9,0)   End of file block 267 / Allocated 268

Virtual block number 191 (000000BF), 512 (0200) bytes

 0B332E02 0302AE00 06194202 03008000 04166802 030A1300 092A1902 03099100 ......*......k...§...B...Û....3. 000000
 0B334A02 03033100 0700A902 030C1000 08012C02 03091D00 09303102 03088900 .....10.......,.......`...1...J3. 000020
 07230402 03078100 092A8802 0309A800 09322502 030A2800 092F9002 03081300 ......./..(...%2..´...£*..Ý...å#. 000040
 00000000 00000000 00000000 000AA700 08039702 03005000 042F2A02 03034500 .E...*/..].......Ï.............. 000060
 C6FC4689 FE468900 00880000 E646C700 00E846C7 D88EFFFF B81E5657 00001AC8 à...WV.¡...ÁúFÒ..úFÎ..¡...F±.F•ó 000080
 FF260E77 FF26065E C4006A00 6AFE5689 FC468902 578B2607 8B26065E C441FA46 FªAá^.&..&.W..F•.V±j.j.á^.&.w.&. 0000A0
 FF26065E C401C2E9 E8468800 06E90375 000030E8 468908C4 83FFFF09 C29A0C77 w..ô....á..FÒ=..u.Õ...FÒÕó.á^.&. 0000C0
 009A0676 FF0876FF E876FF52 6AE84689 0000FFFF 9A5016EA 468D0877 FF260A77 w.&.w..Fõ.P......FÒjR.vÒ.v..v... 0000E0
 8B0027E9 0374EC46 0BEA468B 0189E9E8 46880006 E9037500 003D08C4 8300E300 .D..á.=..u.Õ...FÒÕ...Fõ.F$t.Õ'.. 000100
 0006E903 74F8460B F6468800 11E90374 F4460BF2 4688001C E90374F0 460BEE46 FŸ.FÞt.Õ...F·.F¶t.Õ...F-.F½t.Õ.. 000120
 FC76FFFE 76FF386A 006A006A 35478926 0C5FC426 065EC400 00880003 E90001B8 ¡..Õ..¡..á^.&á_.&.G5j.j.j8.v±.v• 000140
 FF0F6A00 6A006A01 24E9E846 880006E9 03750000 3DE84689 0AC48301 0802FB9A .«....á..FÒ=..ū.Õ...FÒÕ$.j.j.j.. 000160
 5EC406C4 83FFFF05 CA9AFC76 FFFE76FF 0A76FF0A C4830161 02779AFC 76FFFE76 v±.v•.w.a..á..v..v±.v•.ò....á.á^ 000180
 26065EC4 37FF26FC 5EC42B77 FF262D77 FF26FC5E C4000249 47C7260C 5FC42606 .&á_.&úGI..á^•&.w·&.w+á^•&.7á^.& 0001A0
 009A0676 FF0876FF E876FF53 6AE84689 0000FFFF 9A1477FF 261677FF 260C5FC4 á_.Ī.w.&.w.......FÒjS.vÒ.v..v... 0001C0
 8904C483 FFFF2540 9A0676FF 0876FF00 52E90003 E9037500 003D08C4 8301B300 .ª..á.=..u.Õ..ÕR..v..v..ãX...á.. 0001E0

Dump of file SATURN:[PCCOMMON.DUMP.DLL]DAD.TMP;1 on 18-APR-1990 10:40:03.08
File ID (551,9,0)   End of file block 267 / Allocated 268

Virtual block number 192 (000000C0), 512 (0200) bytes

 FFFF9A50 16FA468. 2877FF26 2D77FF26 FC5EC400 36E90003 E9037500 003DE846 FÒ=..u.Õ..Õ6.á^•&.w·&.w+.Fª.P... 000000
 0003E903 75000030 08C483FF FF00009A 0676FF08 76FFE876 FF516AE8 46890000 ...FÒjQ.vÒ.v..v.......á.=..u.Õ.. 000020
 0877FF26 0A77FF26 065EC400 31E90374 41FA7E80 0009E903 7400E87E 830000E9 Õ...-Õ.t.Õ...-ªAt.Õ1.á^.&.w.&.w. 000040
 E8468BE8 4689E646 880003E9 E8468800 06E90375 00E87E83 E64689FF FF00009A ......FÎ.~Õ.u.Õ...FÒÕ...FÎ.FÒ.FÒ 000060
 5F5E1F00 00E9E846 8BE84689 04C483FF FF02229A 0676FF08 76FF0011 E9001AE9 Õ..Õ...v..v..".....á..FÒ.FÒÕ...^_ 000080
 890000B8 FA4689FC 46890000 B80000F4 46C7D88E 0008B81E 56570000 10C8C8C9 èúà...WV.¡...ÄúF¶..¡...F•.Fª¡... 0000A0
 88261447 8B260C5F C426065E C4F64689 F8468900 00880001 FE46C7F0 4689F246 F·.FÞúF±..¡...F½.F-á^.&á_.&.G.&. 0000C0
 F476FF52 6AF44689 0000FFFF 9A5016FE 468DFA76 FFFC76FF FC5689FA 46891657 W..Fª.V•.v•.vª.F±.P......F¶jR.v¶ 0000E0
 FF260A77 FF26065E C40019E9 037500FE 7E8308C4 83020000 009A0676 FF0876FF .v..v....Å..á..-±.u.Õ..á^.&.w.&. 000100
 890000FF FF9A5016 F0468050 16FA468D 00CAE9F4 468BF446 8901E300 009A0877 w....D..F¶.F¶Õò..Fª.P.FÞ.P...... 000120
 0876FF00 0EE90375 00003D08 C483033B 00009A06 76FF0876 FFF476FF 526AF446 F¶jR.v¶.v..v....;..á.=..u.Õ...v. 000140
 FF085F9A F076FFF2 76FF0676 FF0876FF 5016F646 8004C483 03180222 9A0676FF .v..".....á..F-.P.v..v..v·.vÞ_.. 000160
 F65EC404 C483020F 02229A06 76FF0876 FF000EE9 03750000 3DF44689 0CC483FF ..á..F¶=..u.Õ...v..v..".....á.Ī^- 000180
 0AC48300 8102779A 37FF2602 77FF2606 5EC42C6A 0A77FF26 0C77FF26 0A5FC426 &á_.&.w.&.w.j,á^.&.w.&.7.w.....á. 0001A0
 0877FF26 0A77FF26 065EC41E 5789261C 478926F8 568BF646 8B0C5FC4 26065EC4 á^_&á_..F-.V½&.G.&.W.á^.&.w.&.w. 0001C0
 C8CBC95F 5E1F0000 E9000088 0000FFFF 9A7B77FF 267D77FF 260C5FC4 26065EC4 á^.&á_.&.w)&.w(.....¡..Õ...^_èùà 0001E0
```

```
Dump of file SATURN:[PCCOMMON.DUMP.DLL]DAD.TMP;1 on 18-APR-1990 10:40:03.08
File ID (551,9,0)   End of file block 267 / Allocated 268

Virtual block number 193 (000000C1), 512 (0200) bytes

 76FF0000 FE46C7EA 4689EC46 89000088 0000D846 C7D88E02 2A881E56 57000028 (..WV.|°..ÄúFÄ..|...F&.FõúF±...v 000000
 8326085E C400C25F 832600C8 2F812608 5EC40000 FFFF9A50 16EA468D 0C76FF0E ..v..Fõ.P.....á^.&./à.&._..á^.&. 000020
 C40000FF FF9A0876 FF0A76FF 0876FF0A 76FF0C76 FF0E76FF 00065F83 2664046F o.d&. ...v..v..v..v..v..v......á 000040
 F45689F2 46890657 88260447 8826085E C4F05689 EE468902 57882607 8826085E ^.&..Ï.W..FŸ.VÞá^.&.G.&.W..F·.V¶ 000060
 468900D2 8300C805 F45688F2 4688F856 89F64689 00D28301 9005F056 88EE4688 .FŸ.VÞ....@..F~.V½.F·.V¶.à..@..F 000080
 08C48304 66138C9A 1C77FF26 1E77FF26 0C5FC426 EA5EC450 16EE468D FC5689FA ª.V•.FŸ.Pá^õ&á_.&.w.&.w....f..á. 0000A0
 FF50160A 468D5016 FE468D1C 4789261E 47892600 00880C5F C426EA5E C4D84689 .FÄá^õ&á_.|..&.G.&.G..F±.P.FÖ.P. 0000C0
 76FF526A D8468914 C483048A 04A79A0C 76FF0E76 FFFFFF68 017A68EA 76FFEC76 v&.võhz.ħ...v..v..Ì....á..FÄjR.v 0000E0
 468D0C76 FF0E76FF 0010E903 7500FE7E 8308C483 02890000 9AEA76FF EC76FFD8 Ä.v&.võ......á..~±.u.Ô...v..v..F 000100
 9AEA76FF EC76FF00 00FFFF9A 1076FF12 76FF0C76 FF0E76FF 0000FFFF 9A50160A Ö.P......v..v..v..v.......v&.võ. 000120
 87881E56 57000002 C8000ECA C95F5E1F 0000E900 00880846 8904C483 02E60222 ª.Ì..á..FÄ|..Ô...^_èò..à...WV.|. 000140
 8908C483 004509C2 9A0C77FF 260E77FF 26085EC4 006A006A 0000FE46 C7D88E03 ..ÄúF±..j.j.á^.&.w.&.w...ó.E..á.. 000160
 05CA9A37 FF260277 FF26085E C40676FF 005FE9FE 46880006 E9037500 0030FE46 F±=..u.Ô...F±Ô_..v.á^.&.w.&.7.ò. 000180
 085EC40A C4830474 02779A37 FF260277 FF26085E C40E6A00 6A006A06 C4830119 ...á.j.j.j.á^.Ï.w.&.7.w.t..á.á^. 0001A0
 6177FF26 0C5FC426 085EC408 77FF260A 77FF2608 5EC40001 4947C726 0C5FC426 &á_.&úGI..á^.&.w.&.w.á^.&á_.&.w• 0001C0
 04DF881E 56570000 06C80006 CAC95F5E 1F0000E9 00008800 0003709A 5F77FF26 &.w_.p...|..Ô...^_èò..à...W̄V.|Ô. 0001E0

Dump of file SATURN:[PCCOMMON.DUMP.DLL]DAD.TMP;1 on 18-APR-1990 10:40:03.08
File ID (551,9,0)   End of file block 267 / Allocated 268

Virtual block number 194 (000000C2), 512 (0200) bytes

 FFFE76FF 006A006A FE5689FC 46890E57 88260C47 8826085E C40000FA 46C7D88E .ÄúF°..á^.&.G.&.W..F•.V±j.j..v±. 000000
 5EC40676 FF0100E9 FA468800 06E90375 000030FA 468908C4 8304FA09 C29AFC76 v•.ò.°..á..F°=..u.Ô...F°Ô...v.á^ 000020
 26085EC4 106A006A 006A00A8 E9064688 06C48305 2005CA9A 37FF2602 77FF2608 .&.w.&.7.ò. ..á..F.Ô´.j.j.j.á^.& 000040
 00003547 C726FC5E C4000349 47C726FC 5EC40AC4 83061F02 779A37FF 260277FF .w.&.7.w....á.á^•&úGI..á^•&úG5.. 000060
 3802779A 37FF2602 77FF2608 5EC4116A 006A006A 008DE900 003747C7 26FC5EC4 á^•&úG7..Ô..j.j.j.á^.&.w.&.7.w.8 000080
 E9000137 47C726FC 5EC40000 3547C726 FC5EC400 044947C7 26FC5EC4 0AC48305 ..á.á^•&úGI..á^•&úG5..á^•&úG7..Ô 0000A0
 47C726FC 5EC40AC4 8305E902 779A37FF 260277FF 26085EC4 126A006A 006A0057 W.j.j.j.á^.&.w.&.7.w.Ô..á.á^•&úG 0000C0
 2C3D0018 E9001EE9 0021E900 013747C7 26FC5EC4 00013547 C726FC5E C4000549 I..á^•&úG5..á^•&úG7..Ô!.Ô..Ô..=, 0000E0
 0A77FF26 085EC4FF DFE9FFAC E9037503 2E30FF7E E9037503 2030FF50 E9037503 .u.ÔP.=-.u.Ô~.=..u.Ô¯.ÔÔ.á^.&.w. 000100
 CAC95F5E 1F000C?9 00008800 0005659A 7F77FF26 00818 7FF 26FC5EC4 0877FF26 &.w.á^•&.ñ..&.w..e...|..Ô...^_èò 000120
 89000088 F04689?2 46890000 880000EE 46C7D88E 057E881E 56570000 12C80006 ..à...WV.|-..ÄúFŸ..|...F·.FÞ|... 000140
 468D0C76 FF0E76FF 0008F446 C7FA4689 FC468900 00880000 FE46C7F6 4689F846 F½.F-úF±..|...F•.F°úF¶...v..v..F 000160
 6A006A00 6A006AF8 5689F646 890E5788 260C4788 26F05EC4 000003AA 9A5016F0 Þ.P.ˆ...á^Þ&.G.&.W..F-.V½j.j.j.j 000180
 FF0A76FF 036A006A 5016FE46 8D5016FA 468D5016 F4468D00 6A006A00 6A006A00 .j.j.j.j..F¶.P.F°.P.F±.Pj.j..v.. 0001A0
 B4E90000 B80006E9 03750000 3DEE4689 28C483FF FF03C59A F076FFF2 76FF0876 v..v·.vÞ.é....á(.FŸ=..u.Ô..|..ÔÇ 0001C0
 C48307C8 00009AF6 76FFF876 FFFA76FF FC76FF08 76FF0A76 FF0095E9 FE468800 ..F±Ô...v..v..v•.v°.v½.v-...à..á 0001E0

Dump of file SATURN:[PCCOMMON.DUMP.DLL]DAD.TMP;1 on 18-APR-1990 10:40:03.08
File ID (551,9,0)   End of file block 267 / Allocated 268

Virtual block number 195 (000000C3), 512 (0200) bytes

 C40C76FF 0E76FF2C 478926F4 4688F65E C40080E9 0003E903 75000030 EE46890C ..FŸ=..u.Ô..Ô..á^-.F¶&.G,.v..v.á 000000
 77FF26F0 5EC4FA76 FFFC76FF 005BE900 0007EF9A 008387FF 26008587 FF26F65E ^-&.ñ..&.ñ...ÿ...Ô[..v•.v°á^Þ&.w 000020
 76FF0E76 FF0034E9 0003E903 75000030 EE468908 C48305A5 00889A0C 77FF260E .&.w....Ê..á..FŸ=..u.Ô..Ô4..v..v 000040
 7500013D 0013E900 16E90019 E9000006 819A0083 87FF2600 8587FF26 F65EC40C .á^-&.ñ..&.ñ...Ÿ...Ô..Ô..Ô..=..u 000060
 000034C8 000ECAC9 5F5E1F00 00E90000 88FFE7E9 FFA8E903 7500023D FF63E903 .Ôc.=..u.Ô´.ÔÔ.|..Ô...^_èò..à4.. 000080
 C7EC4689 EE468900 0088E246 89E44689 00008800 00CC46C7 D88E06CA 881E5657 WV.|ò..ÄúFä..|...FÔ.Fä|...FŸ.F&ú 0000A0
 46890000 88FC4689 FE468900 00880000 EA46C7F2 4689F446 89000088 0000F646 F-..|...F¶.F·úFõ..|...F±.F•|...F 0000C0
 76FF0E76 FF0000F0 46C7E646 89E84689 000088F8 4689FA46 89000088 CE468900 Å.Fö|...F°.F½|...FÔ.F|úFÞ...v..v 0000E0
 006A006A EE5689EC 46890E57 88260C47 8826E25E C4000007 049A5016 E24680OC ..Fã.P.....á^ã&.G.&.W..F&.VŸj.j. 000100
 FF036A00 6A5016F6 468D5016 F2468D50 16EA468D 006A006A 006A006A 006A006A j.j.j.j.j.j..Fõ.P.F·.P.F-.Pj.j.. 000120
 00880006 E9037500 0030CC46 8928C483 074803C5 9AE276FF E476FF08 76FF0A76 v..v..vö.vä.é.K..á(.Fä=..u.Ô..|. 000140
 0000FFFF 9A5016FC 4680016A 006A2877 FF262D77 FF261FC4 26E25EC4 0426E900 .Ô&.á^ä&á.&.w-&.w+j.j..F•.P..... 000160
 4688002A E9037500 003D08C4 8309C000 009AE276 FFE476FF CC76FF50 6ACC4689 .FäjP.vä.vö.vä...à..á.=..u.Ô°..F 000180
 09A89AFC 76FFFE76 FF2877FF 262D77FF 261FC426 E25EC400 19E90375 FE4608FC •.F±u.Ô..á^ä&á.&.w-&.w+.v±.v•.¨. 0001A0
 00009AE2 76FFE476 FF37FF26 0277FF26 FC5EC450 16CE468D 03C2E900 00880000 ..|..Ôò..Fö.Pá^•&.w.&.7.vö.vä... 0001C0
 FFE476FF 37FF2602 77FF26FC 5EC45016 F8468D00 20E90374 0000300C C4830985 ...á.=..t.Ô ..F½.Pá^•&.w.&.7.vö. 0001E0
```

```
Dump of file SATURN:[PCCOMMON.DUMP.DLL]DAD.TMP;1 on 18-APR-1990 10:40:03.08
File ID (551,9,0)   End of file block 267 / Allocated 268

Virtual block number 196 (000000C4), 512 (0200) bytes

 2D77FF26 1FC426E2 5EC4F846 89FA4689 0000B800 09E90CC4 8308CE00 9C9AE276 vã...ö..á.Õ..¡...F°.F½á^ã&á.&.w- 000000
 00009AE2 76FFE47: FFCC76FF 506ACC46 890000FF FF9AFC76 FFFE76FF 2877FF26 &.w+.v±.v•......FäjP.vä.vÕ.vã... 000020
 5EC4002E E90375D. 4608CE46 8B0337E9 0000B800 06E90375 00003008 C4830A78 x..á.=..u.Õ..¡..Õ7..Fö.FÂu.Õ..á^ 000040
 5EC40657 8B260447 8B26085E C4435789 26414789 26EC5EC4 02578826 07882608 .&..&.W.á^$&.GA&.WCá^.&.G.&.W.á^ 000060
 8B260E47 8B26F85E C40011E9 0375FA46 08F84688 001CE947 57892645 478926EC ã&.GE&.WGÕ...F½.F°u.Õ..á^½&.G.&. 000080
 77FF26E2 5EC4F276 FFF476FF 0876FF0A 76FF02C3 E9F64688 D05689CE 46891057 W..Fö.VÂ.F-Õú..v..v..v¶.v·á^ã&.w 0000A0
 4688EC5E C402A9E9 0003E903 75000030 CC46890C C4830B86 00009A0C 77FF260E .&.w.......á..Fa=..u.Õ..Õ˙.á^&.F 0000C0
 CC46890A C4830ADF 02F89A37 FF260277 FF26E25E C4396A00 6A006A2E 478926EA õ&.G.j.j.j9á^ã&.w.&.7.«.Õ..á..Fä 0000E0
 F276FFF4 76FFF876 FFFA76FF 006A006A 5016E646 8D0279E9 0003E903 75000030 =..u.Õ..Õy..Fl.Pj.j..v°.v½.v¶.v· 000100
 005BE903 7400CC7E 83CC4689 18C4830C 09336E9A E276FFE4 76FFCE76 FFD076FF .vÂ.vö.vÕ.vã.n3...á..Fä.-ä.t.Õ[. 000120
 F504A79A 0C76FF0E 76FF0C2E 680C2868 E276FFE4 76FF5016 D2468050 16F0468D .FÞ.P.F@.P.vÕ.väh+.h...v..v..Ï.¾ 000140
 E9037400 003008C4 83085E00 009AE276 FFE476FF CC76FF52 6ACC4689 14C4830A ..á..FäjR.vä.vÕ.vã...^..á.=..t.Õ 000160
 7500CC7E 8300000C 719A5016 D246800C 76FF0E76 FF0010E9 037500F0 7E830019 ...-Þ.u.Õ...v..v..F@.P.q....-ä.u 000180
 1FC426E2 5EC40029 E900000C 8D9A2B77 FF262D77 FF261FC4 26E25EC4 0016E903 .Õ..á^ãÀá.&.w-&.w+.....Õ).á^ãÀá. 0001A0
 0BCB0000 9AE276FF E476FFCC 76FF506A CC468900 00FFFF9A 2B77FF26 2D77FF26 &.w-&.w+......FäjP.vä.vÕ.vã...ù. 0001C0
 260E77FF 26E25EC4 006A006A 000004B5 9A1076FF 1276FF0C 76FF0E76 FF08C483 .á..v..v..v..v..ç...j.j.á^ã&.w.& 0001E0

Dump of file SATURN:[PCCOMMON.DUMP.DLL]DAD.TMP;1 on 18-APR-1990 10:40:03.08
File ID (551,9,0)   End of file block 267 / Allocated 268

Virtual block number 197 (000000C5), 512 (0200) bytes

 FF260E77 FF26E25E C4F276FF F476FF01 73E9CC46 8908C483 08A509C2 9A0C77FF .w..ö.Ê..á..FaÕs..v¶.v·á^ã&.w.&. 000000
 5EC4396A 006A006A 014CE900 03E90375 00003DCC 468908C4 83077C00 8B9A0C77 w....|..á..Fa=..u.Õ..ÕL.j.j.j9á^ 000020
 46800126 E90003E9 03750000 3DCC4689 0AC4830C 3902FB9A 37FF2602 77FF26E2 ã&.w.&.7.«.9..á..Fä=..u.Õ..Õ&..F 000040
 CE76FF00 76FF0E77 FF261077 FF26F25E C4F876FF FA76FFF2 76FFF476 FF5016E6 l.P.v¶.v·.v°.v½á^·&.w.&.w..vÂ.vö 000060
 805016F0 4680005B E9037400 CC7E83CC 468918C4 8302FF33 6E9AE276 FFE476FF .vÕ.vã.n3...á..Fä.-ä.t.Õ[..FÞ.P. 000080
 468914C4 830C4F04 A79A0C76 FF0E76FF 04696804 3868E276 FFE476FF 5016D246 F@.P.vÕ.väh;.hi..v..v..Ï.O..á..F 0000A0
 00F07E83 0019E903 7400003D 08C48306 5500009A E276FFE4 76FFCC76 FF526ACC äjR.vä.vÕ.vä...U..á.=..t.Õ...-Þ. 0000C0
 5EC40016 E9037500 CC7E8300 0004A49A 5016D246 8D0C76FF 0E76FF00 10E90375 u.Õ...v..v..F@.P.Ê....-ä.u.Õ..á^ 0000E0
 FF262D77 FF261FC4 26E25EC4 0029E900 00FFFF9A 2B77FF26 2D77FF26 1FC426E2 ã&á.&.w-&.w+.....Õ).á^ã&á.&.w-&. 000100
 0E76FF08 C4830911 00009AE2 76FFE476 FFCC76FF 506ACC46 89000008 499A2B77 w+.I....FäjP.va.vÕ.vã......Â..v. 000120
 09C29A0C 77FF260E 77FF26E2 5EC4006A 006A0000 08709A10 76FF1276 FF0C76FF .v..v..v..p...j.j.á^ã&.w.&.w..ö. 000140
 90E90375 00023DFD 35E90375 00013D00 13E90016 E90019E9 CC468908 C4830A48 H..Â..FaÕ..Õ..Õ..=..u.Õ5»=..u.Õ. 000160
 FE46C7D8 8E0824B8 1E565700 0002C800 0ECAC95F 5E1F0000 E90000B8 FFE7E9FE ±ÕÕ.¡..Õ...^_èõ..à...WV.¡$..ÄúF± 000180
 7500003D FE468908 C4830CE0 09C29A0C 77FF260E 77FF2608 5EC4006A 006A0000 ..j.j.á^.&.w.&.w..ö.Â..á..F±=..u 0001A0
 6A06C483 05CB05CA 9A37FF26 0277FF26 085EC406 76FF0061 E9FE4688 0006E903 .Õ...F±Õa..v.á^.&.w.&.7.ò.ù..á.j 0001C0
 C7260C5F C426085E C40AC483 0CB80277 9A37FF26 0277FF26 085EC413 6A006A00 .j.j.á^.&.w.&.7.w.¡..á.á^.&á_.&ú 0001E0

Dump of file SATURN:[PCCOMMON.DUMP.DLL]DAD.TMP;1 on 18-APR-1990 10:40:03.08
File ID (551,9,0)   End of file block 267 / Allocated 268

Virtual block number 198 (000000C6), 512 (0200) bytes

 0087B7FF 26008987 FF260C5F C426085E C40877FF 260A77FF 26085EC4 00064947 GI..á^.&.w.&.w.á^.&á_.&.ñ..&.ñ.. 000000
 46C7D88E 0019B81E 56570000 20C80006 CAC95F5E 1F0000E9 00008800 0007AD9A .Ù...¡..Õ...^_èõ..à ¯.WV.¡...ÄúF 000020
 0088EA46 89EC4689 000088EE 4689F046 890000B8 E64689E8 46890000 880000E4 õ..¡...FÕ.Fl¡¯..FÞ.FŸ¡...F$.Fõ¡. 000040
 5016E646 8D0C76FF 0E,6FF00 00F646C7 F24689F4 46890000 88E04689 E2468900 ..Fã.FÂ¡...F¶.F·úF-...v..v..Fl.P 000060
 805016F6 468D006A 006AF056 89EE4689 0E578826 0C478826 E65EC400 0.:.7879A .....á^l&.G.&.W..FŸ.VÞj.j..F-.P. 000080
 0876FF0A 76FF0C6A 006A006A 006A5016 EA468000 6A006A50 16F8468D 501.:246 F·.P.F½.Pj.j..Fõ.Pj.j.j.j..v..v. 0000A0
 8800CEE9 00008800 06E90375 00003DE4 468928C4 83096003 C59AE676 FFE87.5FF .vÕ.vl.é.'..á(.FÕ=..u.Õ..¡..Õö.. 0000C0
 468908C4 83003400 CB9AEE76 FFF076FF EA76FFEC 76FF0080 E90375EC 4608EA46 Fõ.F$u.Õ§..v$.võ.vÞ.vŸ.ù.4..á..F 0000E0
 6A006A01 6A006A50 16F8468D 5016E046 8D009EE9 00008800 06E90375 00003DE4 õ=..u.Õ..¡..Õ...FÂ.P.F½.Pj.j.j.j 000100
 0060E900 00B80006 E9037500 003DE446 8914C483 0AAF3BA1 9AEA76FF EC76FF01 ..v$.võ.À;£..á..FÕ=..u.Õ..¡..Õm. 000120
 89263947 8926F456 8BF2468B EE5EC426 57892624 478926E2 5688E046 8BEE5EC4 á^Ÿ.FÂ.Vã&.G$&.W&á^Ÿ.F·.V¶&.G9&. 000140
 76FFE276 FF354789 26F6468B EE5EC400 003F47C7 26000130 47C726EE 5EC43857 W;á^Ÿ&úG=..&úG7..á^Ÿ.F-&.G5.vã.v 000160
 B7FF2600 8D87FF26 EE5EC40C 76FF0E76 FF08C483 FFFF0585 9A0C76FF 0E76FFE0 Â.v..v.......á..v..v.á^Ÿ&.ñ..&.ñ 000180
 D88E008A 881E5657 00001EC8 000ECAC9 5F5E1F00 00E90000 B8000000 A19A008B ...Â...¡..Õ...^_èõ..à...WV.¡¤..Â 0001A0
 F44689F6 46890000 88EA4689 EC468900 008BF046 89F24689 00008800 00EE46C7 úFŸ..¡...F·.FÞ¡¯..F$.Fõ¡...F-.F¶ 0001C0
 76FF0876 FF0A76FF 0C76FF0E 76FFE246 89E44689 000088E6 4689E846 89000088 ¡...FÕ.Fl¡...FÕ.Fã.v..v..v..v..v 0001E0
```

```
Dump of file SATURN:[PCCOMMON.DUMP.DLL]DAD.TMP;1 on 18-APR-1990 10:40:03.08
File ID (551,9,0)   End of file block 267 / Allocated 268

Virtual block number 199 (000000C7), 512 (0200) bytes

 0C5FC426 F05EC400 000E019A 5016F046 800C76FF 0E76FF00 00FFFF9A 0876FF0A ..v.......v..v..FÞ.P.....á^Þ&á_. 000000
 F446893F 57882630 4788260C 5FC426F0 5EC4EC56 89EA4689 26578826 24478826 &.G$&.W&.Fö.V$á^Þ&á_.&.G=&.W?.F¶ 000020
 4680006A 5052000A 83000120 F65688F4 46882077 FF262277 FF26EA5E C4F65689 .V-á^ö&.w"&.w .F¶.V-·...Ö.RPj..F 000040
 003008C4 83007200 009AF076 FFF276FF EE76FF52 6AEE4689 0000FFFF 9A5016F8 %.P......FÝjR.vÝ.v·.vÞ...r..á.=. 000060
 089A5052 FA5618F8 46280257 88260788 26085EC4 00C8E900 00880006 E9037500 .u.Ö..¡..Öú.á^.&..&.W.+F%.V*RP.. 000080
 9A5052FE 5618FC46 28065788 26044788 26085EC4 E85689E6 468904C4 83104201 .8..á..Fl.VÒá^.&.G.&.W.+F•.V±RP. 0000A0
 0008E903 7E0021E9 037DE856 39E45688 E24688E4 5689E246 8904C483 FFFF0108 .....á..Fã.VÕ.Fã.VÕ9VÒ).Ö|.-.Ö.. 0000C0
 88085EC4 0010E906 57892604 478926FE 5688FC46 88085EC4 0014E903 77E64639 9F|w.Ö..á^..F•.V±&.G.&.W.Ö..á^.. 0000E0
 08C48310 CC05859A 0C76FF0E 76FFEA76 FFEC76FF 02578926 078926FA 5688F846 F%.V*&..&.W..v$.vö.v..v....ä..á. 000100
 EC76FFEE 46890CC4 830AD136 309AEA76 FFEC76FF 0876FF0A 76FFF476 FFF676FF .v-.v¶.v..v..v$.vö.06l..á..FÝ.v$ 000120
 5AC8000E CAC95F5E 1F0000E9 00008808 C4830F0A 05859A0C 76FF0E76 FFEA76FF .vö.v..v.......á.¡..Ö...^_èb..àZ 000140
 46890C46 890000B8 C44689C6 46890000 88000082 46C7088E 0F3CB81E 56570000 ..WV.¡<..ÁúFý..¡...Fö.Fá¡...FÉ.F 000160
 890000B8 F24689F4 46890000 88AE4689 80468900 0088C846 89CA4689 000088DA Ö¡...Fò.Fà¡...F .FÜ¡...F¶.F·¡... 000180
 E246C700 00F046C7 0000F646 C7CE4689 00468900 00880000 CC46C7D6 46890846 FÂ.FæúFæ..¡...FÂ.FöúF-..úFÞ..úFã 0001A0
 800C76FF 0E76FF00 000F859A 0876FF0A 76FF0876 FF0A76FF 0C76FF0E 76FF0000 ...v..v..v..v..v..v.......v..v.. 0001C0
 4788260A 5EC40C56 890A4689 0E578826 0C478826 C45EC400 000F959A 5016C446 Fá.P.....á^á&.G.&.W..FÖ.VÉá^Ö&.G 0001E0

Dump of file SATURN:[PCCOMMON.DUMP.DLL]DAD.TMP;1 on 18-APR-1990 10:40:03.08
File ID (551,9,0)   End of file block 267 / Allocated 268

Virtual block number 200 (000000C8), 512 (0200) bytes

 26AE5EC4 805689AE 46892657 88262447 88260A5E C4E65689 E446893F 57882630 =&.W?.FÖ.V|á^Ö&.G$&.W&.FÜ.V¯á^Ü& 000000
 5EC4CA56 89C84689 16578826 14478826 AE5EC4F4 5689F246 89225788 26204788 .G &.W".F·.V¶á^Ü&.G.&.W..Fà.Vòá^ 000020
 DA830001 2DE65688 E44688F2 76FFF476 FF085689 06468922 57882620 478826C8 À&.G &.W".F•.VÁ.v¶.v·.FÖ.V|-...Ö 000040
 00009AC4 76FFC676 FF8276FF 526A8246 8900000F E49A5016 E8468000 6A505200 .RPj..FÒ.P.ö....FýjR.vý.vó.vá... 000060
 E8462802 57882607 8826085E C4020 7E9 00008800 06E90375 00003008 C48312CE ö..á.=..u.Ö..¡..Ö=.á^.&..&.W.+FÒ 000080
 46280657 88260447 8826085E C4AC5689 AA468904 C4831249 01089A50 52EA5618 .VöRP...|..á..F¯.V¯á^.&.G.&.W.+F 0000A0
 E9037DAC 5639A856 88A64688 A85689A6 468904C4 83102101 089A5052 EE5618EC &.VÝRP...!..á..F!.V´.F!.V´9V¯).Ö 0000C0
 06578926 04478926 EE5688EC 4688085E C40014E9 0377AA46 390008E9 037E0021 !.-.Ö..9F¯w.Ö..á^..F$.VÝ&.G.&.W. 0000E0
 8D0876FF 0A76FF06 76FF0876 FF025789 26078926 EA5688E8 4688085E C40010E9 Ö..á^..FÖ.VÖ&..&.W..vÁ.v•.v..v.. 000100
 82468900 00FFFF9A 5016F846 80501602 46805016 F0468050 16CE4680 5016CC46 Fë.P.Fö.P.FÞ.P.F0.P.F%.P......Fý 000120
 09E90000 880006E9 03750000 3008C483 13270000 9AC476FF C676FF82 76FF526A jR.vý.vó.vá...'..á.=..u.Ö..¡..Ö. 000140
 10853630 9AAE76FF 8076FF50 16F84680 E476FFE6 76FF0160 E9037500 CC7E8302 ..-ä.u.Öm..v!.vÖ.F%.P.v¯.vÜ.06ç. 000160
 77FF26C4 5EC4406A 0^6A006A 01D6E900 00880006 E9037500 00308246 890CC483 .á..Fý=..u.Ö..¡..Ö•.j.j.jàá^á&.w 000180
 DA5EC401 ADE90000 880006E9 03750000 30824689 0AC48313 8C02F89A 37FF2602 .&.7.«....á..Fý=..u.Ö..¡..ÖU.á^Ö 0001A0
 76FF0676 FF0876FF F6468935 4788260A 5EC4E056 890E4689 38578826 39· 78826 &.G9&.W;.F8.VÁá^Ö&.G5.F-.vÁ.v•.v 0001C0
 526A8246 890000FF FF9AF076 FFF676FF D276FFD4 76FFDE76 FFE076FF F27u:FF4 ¶.v·.vÁ.v8.vå.v0.v-.vÞ......FýjR 0001E0

Dump of file SATURN:[PCCOMMON.DUMP.DLL]DAD.TMP;1 on 18-APR-1990 10:40:03.08
File ID (551,9,0)   End of file block 267 / Allocated 268

Virtual block number 201 (000000C9), 512 (0200) bytes

 C404C483 0EAA3FA3 9AAE76FF 8076FF08 C4830FF9 00009AC4 76FFC676 FF8276FF .vý.vó.vá...•..á..v¯.vÜ.È?¯..á.á 000000
 148068C4 76FFC676 FF5016B4 46805016 E2468024 47892626 47892600 00880A5E ^Ö¡..&.G&&.G$.Fã.P.FÇ.P.vó.váh.. 000020
 9AC476FF C676FF82 76FF526A 82468914 C48313E2 04A79A0C 76FF0E76 FF0AD468 hå..v..v..!.à..á..FýjR.vý.vó.vá. 000040
 00000817 9A5016B4 46800C76 FF0E76FF 0010E903 7500E27E 8308C483 14240000 ..$..á..-â.u.Ö...v..v..FÇ.P..... 000060
 76FFC676 FF8276FF 506A8246 8900000C A39A2877 FF262077 FF261FC4 26C45EC4 á^á&á.&.w-&.w+.È....FýjP.vý.vó.v 000080
 5EC4006A 006A0000 0CCA9A10 76FF1276 FF0C76FF 0E76FF08 C48314CE 00009AC4 á...ö..á..v..v..v..v..ò...j.j.á^ 0000A0
 0E76FFAE 76FF8076 FF0080E9 82468908 C4830E79 09C29A0C 77FF260E 77FF26C4 á&.w.&.w..ö.y..á..FýÖ...v¯.vÜ.v. 0000C0
 36309AAE 76FF8076 FF0876FF 0A76FFE4 76FFE676 FF08C483 14970585 9A0C76FF .v.......á..v|.vÖ.v..v..v¯.vÜ.06 0000E0
 01E44683 08C48310 9805859A 0C76FF0E 76FFAE76 FF8076FF 8246890C C48312FE ±..á..Fý.v¯.vÜ.v..v.......á..FÖ. 000100
 82468900 00FFFF9A 0876FF0A 76FF006A E476FFE6 76FFF276 FFF476FF 00E65683 .V|..v¶.v·.v|.vöj..v..v.......Fý 000120
 30478926 E65688E4 4688DA5E C408C483 12000000 9AC476FF C676FF82 76FF526A jR.vý.vó.vá......á.á^Ö.FÖ.V|&.G= 000140
 FA46C708 8E10E688 1E565700 0006C800 0ECAC95F 5E1F0000 E90000B8 3F578926 &.W?¡..Ö...^_èb..à...WV.¡|..ÁúF* 000160
 006A006A FE5689FC 46890E57 88260C47 8826085E C4FC4689 FE468900 00880000 ..¡...F±.F•á^.&.G.&.W..F•.V±j.j. 000180
 FF0099E9 FA468800 06E90375 00003DFA 468908C4 83144C09 C29AFC76 FFFE76FF .v±.v•.ô.L..á..F*=..u.Ö...F*Ö... 0001A0
 006A0020 E9037403 30067E81 06C48300 5A05CA9A 37FF2602 77FF2608 5EC40676 v.á^.&.w.&.7.ò.Z..á..-.0.t.Ö-.j. 0001C0
 C4000749 47C726FC 5EC40AC4 83159E02 779A37FF 260277FF 26085EC4 146A006A j.j.á^.&.w.&.7.w....á.á^=&úG|..á 0001E0
```

```
Dump of file SATURN:[PCCOMMON.DUMP.DLL]DAD.TMP;1 on 18-APR-1990 10:40:03.08
File ID (551,9,0)   End of file block 267 / Allocated 268

Virtual block number 205 (000000CD), 512 (0200) bytes

006A006A 006A006A 006A006A 006A006A 006A006A 0000188F 9A5016E2 468D0C76 v..Fã.P.e...j.j.j.j.j.j.j.j.j.j. 000000
8318F303 C594E276 FFE476FF 0876FF0A 76FF216A 006A5016 FE468D50 ¡FA468D .F*.P.F±.Pj.j!.v..v..vð.vã.é.µ.. 000020
FF0E76FF 0028E903 7405FE7E 83010DE9 00008800 06E90375 00003DE0 4.3928C4 á(.FÁ=..u.Ö..¡..Ö...~±.t.Ö+..v.. 000040
00880006 E9037500 0030E046 891CC71C E79A0876 FF0A76FF FA76FFFC 76FF0C76 v..v«.v*.v..v..Ö.ú..FÁ=..u.Ö..¡. 000060
890AC483 180102F8 9A37FF26 0277FF26 E25EC43A 6A006A00 6A000E39 000CE900 .ÖÉ.Ö£.j.j.j:á^ã&.w.&.7.«....á.. 000080
E85689E6 46890257 88260788 26085EC4 0080E900 00880006 E9037500 0030E046 FÁ=..u.Ö..¡..Ö¯.á^.&..&.W..F¦.VÒ 0000A0
F2468906 57882604 47882608 5EC4F056 89EE4689 00028301 1805E856 88E64688 .F¦.VÒ....Ø..FŸ.VÞá^.&.G.&.W..F· 0000C0
FF5016E6 46805016 F6468DEC 5689EA46 89000A83 01182DF4 5688F246 88F45689 .V¶.F·.V¶-...Ö..Fõ.Vê.F-.P.F¦.P. 0000E0
559A2B77 FF262D77 FF261FC4 26E25EC4 E046890C C483139A 4EA49AE2 76FFE476 vð.vã.ÉN...á..FÁá^ã&á.&.w-&.w+.U 000100
76FFF676 FFF876FF 0C76FF0E 76FF002E E90000B8 0006E903 7500E07E 8300001A ....~Á.u.Ö..¡..Ö...v..v..v½.v~.v 000120
0000E900 00880006 E9000088 0006E903 75000030 E046J904 C21CE79A 0876FF0A ..v..Ö.ö..FÁ=..u.Ö..¡..Ö..¡..Ö.. 000140
0A5EC400 02EE46C7 0000EC46 C7D88E18 3CB81E56 57000014 C8000ECA C95F5E1F .^_èò..à...WV.|<..ÁúF§..úFŸ..á^. 000160
00FFFF9A 5016EE46 8D1E6A00 6A0E76FF 1076FF01 08E90375 14470826 12478826 &.Ḡ.&.G.u.Ö...v..v.j.j..FŸ.P.... 000180
75000030 08C48310 6A00009A 0277FF26 0477FF26 0A5EC4EC 76FF526A EC468900 ..F&jR.v&á^.&.w.&.w....j..á.=..u 0001A0
025FC426 0A5EC444 6A006A00 6A0022E9 037500EE 7E830206 E9EC4688 0006E903 .Ö...F&Ö...~Ÿ.u.Ö".j.j.jDá^.&á_. 0001C0
3077FF26 3277FF26 0A5EC401 D8E90000 880AC483 10A00125 9A37FF26 0277FF26 &.w.&.7.%....á.¡..ÒÚ.á^.&.w2&.w̄O 0001E0

Dump of file SATURN:[PCCOMMON.DUMP.DLL]DAD.TMP;1 on 18-APR-1990 10:40:03.08
File ID (551,9,0)   End of file block 267 / Allocated 26

Virtual block number 206 (000000CE), 512 (0200) bytes

00009A02 77FF2604 77FF260A 5EC4EC76 FF526AEC 46890000 FFFF9A50 16F0468D .FÞ.P......F&jR.v&á^.&.w.&.w.... 000000
89000A83 01182DFE 5688FC46 88019DE9 EC468800 06E90375 00003008 C4831C1A ...á.=..u.Ö...F&Ö...F=.V±-...Ö.. 000020
FF263277 FF260A5E C4FA5689 F8468900 D2830118 05F25688 F04638F6 5689F446 F¶.V-.FÞ.V·....Ø..F½.V*á^.&.w2&. 000040
9A0277FF 260477FF 260A5EC4 EC76FF52 6AEC4689 0000FFFF 9A5016F0 46803077 w0.FÞ.P......F&jR.v&á^.&.w.&.w.. 000060
006A0E76 FF1076FF 0068E901 38E9EC46 880006E9 03750000 3008C483 1E420000 ..Ø..á.=..u.Ö...F&Ö;.Öh..v..v.j. 000080
9A0277FF 260477FF 260A5EC4 EC76FF52 6AEC4689 00001C1D 9A5016EE 46802B6A j(.FŸ.P......F&jR.v&á^.&.w.&.w.. 0000A0
006A0022 E9037500 EE7E8300 F8E9EC46 88000SE9 03750000 3008C483 1E750000 ..u..á.=..u.Ö...F&Ö«..~Ÿ.u.Ö".j. 0000C0
0000E900 00880AC4 831F3701 259A37FF 260277FF 26025FC4 260A5EC4 436A006A j.jCá^.&á_.&.w.&.7.%.7..á.¡..ÖÅ. 0000E0
C4000013 FC9A2C77 FF262E77 FF260A5E C40E76FF 1076FF00 004847C7 260A5EC4 á^.&úGH...v..v.á^.&.w.&.w,.=...á 000100
5EC40E76 FF1076FF 2A578926 28478926 0C56880A 46880C5F C426025F C4260A5E ^.&á_.&á_..F..V.&.G(&.W*.v..v.á^ 000120
26025FC4 260A5EC4 00001823 9A009887 FF260090 87FF260C 5FC42602 5FC4260A .&á_&á_&.ñ..&.ñ...#...á^.&á_.& 000140
77FF260A 5EC40277 FF260477 FF260A5E C40E76FF 1076FF00 013547C7 260C5FC4 á_.ĪúGS_..v..v.á^.&.w.&.w.á^.Ī.w 000160
00FFFF9A FFFF681A 3E680676 FF0876FF 4277FF26 4477FF26 0A5EC430 77FF2632 2Ī.wOá^.&.wD&.wB.v..v.h>.h...... 000180
75000030 08C48310 3700009A 0277FF26 0477FF26 0A5EC4EC 76FF526A EC468900 ..F&jR.v&á^.&.w.&.w....7..á.=..u 0001A0
EF881E56 57000006 C8000CCA C95F5E1F 0000E900 00880006 E9EC4688 0006E903 .Ö...F&Ö..¡..Ö...^_èò..à...WV.¡Ÿ 0001C0
00188B9A 5016FC46 800C76FF 0E76FFFC 4689FE46 89000088 0000FA46 C7088E1C ..ÁúF*..¡...F±.F=.V..v..F=.P.... 0001E0

Dump of file SATURN:[PCCOMMON.DUMP.DLL]DAD.TMP;1 on 18-APR-1990 10:40:03.08
File ID (551,9,0)   End of file block 267 / Allocated 268

Virtual block number 207 (000000CF), 512 (0200) bytes

FA468900 00FFFF9A 0C76FF0E 76FF0000 14369A10 76FF1276 FF0C76FF 0E76FF00 ..v..v..v..v..6....v..v.......F* 000000
260ECAC9 5F5E1F00 00E90000 8808C483 1E020000 9AFC76FF FE76FFFA 76FF526A jR.v*.v±.v=......á.|..Ö...^_èò.& 000020
CA000912 89020307 C4000911 E8020300 0000031F AE000200 0000021A DC000200 ...É.......Û......Š...á...¿...ò 000040
D4000914 89020300 0000071A 7E00020A C400081E 98020300 0000051C 88000209 ..............á...~.......¿...Å 000060
6200081D 86020301 02000409 3E020300 0000081A B600020A 4E000A1E 04020307 ...Å...N...Ñ.......>..........b 000080
5A000A1F 8E020303 71000719 40020300 00000A1F 17000200 0000091B BD000205 ...§................ã...q.......Z 0000A0
00000C1B F1000202 0D000408 FC020300 00000802 A5000209 E2000913 7702030A ...w...ã...É.......•.......Þ.... 0000C0
D2000E01 9E020300 0000101F 5F000200 00000E12 28000205 7700081D E8020300 ...Ò...w...(......._..........● 0000E0
13000911 5502030B FC00081E 28020305 FF000900 6C02034E 02000A13 C100050C ...è....N..l.......(...=...U.... 000100
C200040B 3302030B 8900081F 7D02030C E9000F01 4C020303 A8000702 BB02030A ...É.......L...Ò...}.......3...ó 000120
2800091B 78020303 B4000702 7402030C 1000081F 99020349 27000A1F 1A000501 .......'l...........t...Ç...x...( 000140
00000000 0000^000 00000000 00000000 5D00041C 9F02030C 2200081F 1D02030A ........"........]............... 000160
00000000 0000 '00 00000F00 02000200 01C80001 B81F0200 3E89088E FFFFB81E .¡...À.>...¡..ù.................. 000180
8ED88CFE 880A76C5 1EDE8807 88EC8855 00000000 00000000 00000000 00000000 .................U.&.m.B.év..±.Á. 0001A0
88F388A4 F3C913A5 F3E9D149 A4027401 A8C78806 7EC401F7 AEF2FFFF 89C033C0 à3à¿..·Ú¼ìá~..ú¨.t.É¦ìÒµÉ.èµÉ.µ. 0001C0
F3F928D1 F7AEF2FF FFB9C033 0A7EC406 76C51EDE 88D788EC 8855C85D C28C1FFA *..ô)¡ÚJ.š.m.B.év.á~.3à¿..·Ú¼I+*µ 0001E0
```

Dump of file SATURN:[PCCOMMON.DUMP.DLL]DAD.TMP;1 on 18-APR-1990 10:40:03.08
File ID (551,9,0)   End of file block 267 / Allocated 268

Virtual block number 205 (000000CD), 512 (0200) bytes

```
006A006A 006A006A 006A006A 006A006A 006A006A 000018BF 9A5016E2 46B00C76 v..Fã.P.¢...j.j.j.j.j.j.j.j.j.j. 000000
8318F303 C59AE276 FFE476FF 0876FF0A 76FF216A 006A5016 FE468D50 16FA468D .Fª.P.F±.Pj.j!.v..v..vö.vå.é.µ.. 000020
FF0E76FF 002BE903 7405FE7E 83010DE9 0000B800 06E90375 00003DE0 468928C4 Ä(.FÅ=..u.Ö..¡..Õ...~±.t.Ö+..v.. 000040
00B80006 E9037500 003DE046 891CC71C E79A0876 FF0A76FF FA76FFFC 76FF0C76 v..v=.vª.v..v..Ö.ü..FÅ=..u.Ö..¡. 000060
890AC483 1B0102FB 9A37FF26 0277FF26 E25EC43A 6A006A00 6A00D3E9 00DCE900 .ÕÉ.ÕÆ.j.j.j:á^ã&.w.&.7.«....á.. 000080
E85689E6 46890257 8B26078B 26085EC4 0080E900 00B80006 E9037500 003DE046 FÅ=..u.Ö..¡..Õ¯.á^.&..&.W..F!.Vö 0000A0
F2468906 57882604 47882608 5EC4F056 89EE4689 00D28301 1B05E856 8BE6468B .F!.VÖ....@..FŸ.VÞá^.&.G.&.W..F· 0000C0
FF5016E6 46805016 F6468DEC 5689EA46 89000A83 011820F4 568BF246 8BF45689 .V¶.F·.V¶-...Ö..Fõ.Vê.F-.P.F!.P. 0000E0
559A2877 FF262D77 FF261FC4 26E25EC4 E046890C C483139A 4EA49AE2 76FFE476 vö.vã.ÉN...á..FÅá^ãáá.&.w·&.w+.U 000100
76FFF676 FFF876FF 0C76FF0E 76FF002E E90000B8 0006E903 7500E07E 8300001A ....~Å.u.Ö..¡..Õ...v..v..v½.v¬.v 000120
0000E900 00B80006 E90000B8 0006E903 75000030 E0468904 C21CE79A 0876FF0A ..v..Ö.ô..FÅ=..u.Õ..¡..Ö..¡..Õ.. 000140
0A5EC400 02EE46C7 0000EC46 C7D88E1B 3CB81E56 57000014 C8000ECA C95F5E1F .^_èò..à...WV.¡<..ÁúFš..úFŸ..á^. 000160
00FFFF9A 5016EE46 8D1E6A00 6A0E76FF 1076FF01 08E90375 14470B26 12478B26 &.G.&.G.u.Õ...v..v.j.j..FŸ.P.... 000180
75000030 08C4831D 6A00009A 0277FF26 0477FF26 0A5EC4EC 76FF526A EC468900 ..F&jR.vŝá^.&.w.&.w....j..á.=..u 0001A0
025FC426 0A5EC444 6A006A00 6A0022E9 037500EE 7E830206 E9EC468B 0006E903 .Õ...FšÕ.:.-Ÿ.u.Õ".j.j.jDá^.&á_. 0001C0
3077FF26 3277FF26 0A5EC401 DBE90000 B80AC483 1DA00125 9A37FF26 0277FF26 &.w.&.7.X....á.¡..ÕÜ.á^.&.w2&.wÖ 0001E0
```

Dump of file SATURN:[PCCOMMON.DUMP.DLL]DAD.TMP;1 on 18-APR-1990 10:40:03.08
File ID (551,9,0)   End of file block 267 / Allocated 268

Virtual block number 206 (000000CE), 512 (0200) bytes

```
00009A02 77FF2604 77FF260A 5EC4EC76 FF526AEC 46890000 FFFF9A50 16F0468D .Fþ.P......F&jR.vŝá^.&.w.&.w.... 000000
89000A83 011820FE 5688FC46 8B0190E9 EC468800 06E90375 00003008 C4831C1A ...á.=..u.Õ...F&Õ...F=.V±·...Ö.. 000020
FF263277 FF260A5E C4FA5689 F8468900 D2830118 05F2568B F04688F6 5689F446 F¶.V~.Fþ.V·....@..F½.Vªá^.&.w2&. 000040
9A0277FF 260477FF 260A5EC4 EC76FF52 6AEC4689 0000FFFF 9A5016F0 46803077 wÕ.Fþ.P......F&jR.v&á^.&.w.&.w.. 000060
006A0E76 FF1076FF 0068E901 3BE9EC46 880006E9 03750000 3D08C483 1E420000 ..B..á.=..u.Õ...F&Õ;.Õh..v..v.j. 000080
9A0277FF 260477FF 260A5EC4 EC76FF52 6AEC4689 00001D1D 9A5016EE 4680286A j(.FŸ.P......F$jR.v&á^.&.w.&.w.. 0000A0
006A0022 E9037500 EE7E8300 FBE9EC46 880006E9 03750000 3008C483 1E750000 ..u..á.=..u.Õ...F$Õ«..~Ÿ.u.Õ".j. 0000C0
0000E900 00B80AC4 831F3701 259A37FF 260277FF 26025FC4 260A5EC4 436A006A j.jCá^.&á_.&.w.&.7.X.7..á.¡..ÕÅ. 0000E0
C4000013 FC9A2C77 FF262E77 FF260A5E C40E76FF 1076FF00 004847C7 260A5EC4 á^.&úGH...v..v.á^.&.w.&.w,.=...á 000100
5EC40E76 FF1076FF 2A578926 28478926 0C5688OA 46880C5F C426025F C4260A5E ^.&á_.&á_..F..V.&.G(&.W".v..v.á^ 000120
26025FC4 260A5EC4 00001823 9A0098B7 FF260090 87FF260C 5FC42602 5FC4260A .&á_&á_.&.ñ..&.ñ...#...á^.&á_.& 000140
77FF260A 5EC40277 FF260477 FF260A5E C40E76FF 1076FF00 013547C7 260C5FC4 á_.&úG5_...v..v.á^.&.w.&.w.á^.&.w 000160
00FFFF9A FFFF681A 3E680676 FF0876FF 4277FF26 4477FF26 0A5EC430 77FF2632 2&.wÕá^.&.wÕ&.wB.v..v.h>.h...... 000180
75000030 08C4831D 3700009A 0277FF26 0477FF26 0A5EC4EC 76FF526A EC468900 ..F&jR.vŝá^.&.w.&.w....7..á.=..u 0001A0
EFB81E56 57000006 C8000CCA C95F5E1F 0000E900 00B80006 E9EC4688 0006E903 .Õ...F&Õ..¡..Õ...^_èò..à...WV.¡ÿ 0001C0
001B889A 5016FC46 8D0C76FF 0E76FFFC 4689FE46 89000088 0000FA46 C7D88E1C ..ÄúFª..¡...F±.F=.v..v..F=.P.... 0001E0
```

Dump of file SATURN:[PCCOMMON.DUMP.DLL]DAD.TMP;1 on 18-APR-1990 10:40:03.08
File ID (551,9,0)   End of file block 267 / Allocated 268

Virtual block number 207 (000000CF), 512 (0200) bytes

```
FA468900 00FFFF9A 0C76FF0E 76FF0000 14369A10 76FF1276 FF0C76FF 0E76FF00 ..v..v..v..v..6....v..v.......Fª 000000
260ECAC9 5F5E1F00 00E90000 B808C483 1E020000 9AFC76FF FE76FFFA 76FF526A jR.vª.v±.v=......á.¡..Õ...^_èò.& 000020
CA000912 B9020307 C4000911 E8020300 0000031F AE000200 0000021A 0C000200 ...É.......Ù.......Š...á...¿...ò 000040
D4000914 B9020300 0000071A 7E00020A C400081E 9B020300 0000051C 88000209 ...............á...¬.......¿...Å 000060
6200081D 86020301 02000409 3E020300 0000081A B600020A 4E000A1E D4020307 ...Å...N...Ñ.......>..........b 000080
5A000A1F 8E020303 71000719 40020300 00000A1F 17000200 0000091B BD000205 ...§...............@...q.......Z 0000A0
00000C1B F1000202 00000408 FC020300 00000802 A5000209 E2000913 7702030A ...w...ã...É.......•.......þ.... 0000C0
D2000E01 9E020300 0000101F 5F000200 00000E12 28000205 7700081D E8020300 ...Ò...w...(......._..........@ 0000E0
13000911 55020308 FC00081E 28020305 FF000900 6C02034E 02000A13 C100050C ...è....N..(.......(...•...U.... 000100
C2000408 33020308 8900081F 7D02030C E9000F01 4C020303 A8000702 B802030A ...É...´...L...Õ...).......3...ó 000120
2800091B 78020303 B4000702 7402030C 1000081F 99020349 27000A1F 1A000501 .......'l..........t...Ç...x...( 000140
00000000 00000000 00000000 00000000 5D00041C 9F02030C 2200081F 1D02030A ......."......]................ 000160
00000000 00000000 00000F00 02000200 01C80001 B81F0200 3E89D88E FFFFB81E .¡...Ä.>...¡..Ù................ 000180
8ED88CFE 880A76C5 1EDE8807 88EC8855 00000000 00000000 00000000 00000000 ................U.&.m.B.év..±.Ä. 0001A0
88F388A4 F3C913A5 F3E9D149 A4027401 A8C78806 7EC401F7 AEF2FFFF B9C033C0 á3á¿...Ú¼Ié~..ú´.t.É1IÕµÉ.èµÉ.µ. 0001C0
F3F928D1 F7AEF2FF FFB9C033 0A7EC406 76C51EDE 880788EC 8855CB5D C28C1FFA ª..õ]ÜÜ.š.m.B.év.á~.3á¿...Ú¼l+ªµ 0001E0
```

Dump of file SATURN:[PCCOMMON.DUMP.DLL]DAD.TMP;1 on 18-APR-1990 10:40:03.08
File ID (551,9,0) End of file block 267 / Allocated 268

Virtual block number 208 (00000000), 512 (0200) bytes

```
F7AEF2FF FFB9C033 067EC4D7 8BEC8B55 00CB5DFA 8BF3881F FFFF1DC0 1B0574A6 It..å.....µ.ª]ù.U.$.mó-.3â¿..·Ü% 000000
FE568CFC 46890E46 8DFA568C F84689EC 468D5657 000016C8 00CB5DFA 889149D1 II..ª]ù.å...WV.F$.F%.Vª.F..F=.Vz 000020
47C72602 57892607 89260857 89260647 89260856 88064688 420A47C6 26F85EC4 á^¥&6G.B.F..V.&.G.&.W.&..&.W.&úG 000040
044FFF26 F85EC4F0 880CC483 00FD0370 9A53060A 76FF0C76 FFFC76FF 167FFF04 .....v=.v..v..S.p.».á..Þá^¥&.O. 000060
83FFFF01 FA9A006A 53FA76FF 900FEB05 88260247 8E2607FF 263F8826 C02A1278 x.*á&.7&..&.G.&..Š...vªSj..ª.... 000080
08568806 46880DE8 08568806 4688087C 00087E83 000000C8 CBC95F5E C68806C4 á..ó^ èúå....~..|..F..V.Š..F..V. 0000A0
F7D8F706 56884711 7DC00808 4688FF33 535657EC 885590C8 C9DAF700 D283D8F7 ¥Á.Ø.¥Öèú.U.$WVS3..F..å).G.V.¥Ä¥ 0000C0
890C4689 00001DDA F7D8F70A 56884711 7DC0080C 46880656 89084689 00001DDA Ö....F..V..F..å).G.V.¥Ä¥Ö....F.. 0000E0
0A4E88D8 8838E8D3 88F1F706 4688D888 F1F7D233 0846880A 4E881575 C0080A56 V..åu..N..F.3Ø¼þ.Ä.F.¼þ.ÆŠ8.Ä.N. 000100
03E6F70A 4688910C 66F7F088 F1F7F475 D808D8D1 EAD109D1 E8D10646 88085688 .V..F.ÍŠÌÌÌðÍÄ.Ùu¶¼þ.Þ%f...F.%Ì. 000120
5F5E5800 DA83D8F7 DAF70775 4F960233 4E017606 46380672 07770856 380C72D1 Ir.;V.w.r.;F.v.N3Ø.Ou.%Ö%Ä.Ö.[^_ 000140
08CA5DE5 88E3F706 46880875 0A5E8808 080C5E88 084688EC 88550008 CA5DE588 .Ì]ò..U.$.F..^..Ä.^.u..F.%D.Ì]ò¯ 000160
56570000 08C80008 CA5DE588 D103E3F7 064688C8 030C66F7 064688C8 88E3F700 .%D.å.F.%f..å.F.%D.Ì.Ì]ò..å...WV 000180
05E0D1C1 03E0D1C8 88F9F700 0CB99905 4220C388 FA4689E4 2A08478A 26085EC4 á^.&.G.*ð.Fª.û-B..¿..%ª.åìÁ.èìÁ. 0001A0
2BE9FFFF 88200A4! 9026085E C40F7440 0A47F626 0774830A 47F626F8 46891136 6..F¥&-G..t.&-G.@t.á^.&.O. |..Õ+ 0001C0
26020A4F 802690E2 E8000004 47C72620 0A4F8026 0E74010A 47F62608 5EC49001 ..á^.&-G..t.&.O. &úG...Šã.&.O..& 0001E0
```

Dump of file SATURN:[PCCOMMON.DUMP.DLL]DAD.TMP;1 on 18-APR-1990 10:40:03.08
File ID (551,9,0) End of file block 267 / Allocated 268

Virtual block number 209 (00000001), 512 (0200) bytes

```
F7000CB9 9905422D C3884C75 0C0A47F6 26FC7689 F0880447 8926C028 EF0A6780 .g.ÿ+á&.G..Þ.v=&-G..uL.û-B..¿..% 000000
1675055A 087E810E 7402A30A 7E810775 054E087E 81377501 113687F6 060868F9 ªkÄ.-.6..u7.-.N.u..-.È.t..-.Z.u. 000020
830C51E8 0876FF0A 76FF0C75 C00802C4 83031611 709AFA76 FF0F75FF FF0A7E81 .~...u..vª.p....á..åu..v..v.ÒQ.. 000040
74011136 87F606D8 68F9F700 0C899905 4220C388 1575080A 47F62608 5EC404C4 á.á^.&-G..u..û-B..¿..%ªkÄ.-.6..t 000060
4588F87E 88025789 26078926 40085788 26064788 2606772B 26378826 085E8867 g.^.&.7&+w.&.G.&.W.@&..&.W..-%.E 000080
19E8FC46 8908C483 03340FD8 9AFA76FF 0677FF26 5256167E F6080447 89264802 .H&.G..--.VR&.w..vª.Ä.4..á..F=Š. 0000A0
065FC426 085EC408 C4830357 0F9A9A53 006A006A 026A0F74 20174787 F6FA5E8B .^ª-.G. t.j.j.j.S...W..á.á^.&á_. 0000C0
39FC4689 08C48300 D20FD89A FA76FF50 16064680 560001BE 17EB0788 2606468A .F.&..Š./..V.F..P.vª.Ä.Ø..á..F=9 0000E0
9AA31AA0 8802AD11 Y49A000A 88EC8855 CBC95F5E E42A0646 8AFECCE9 0374FC76 v=t.Õät.F.*ð^_èúÙ.$|.....Ù.|..È. 000100
C71A7216 891A70A3 08568806 46881A8C 16891A8A A3105688 0E46881A 9C1E8C1A ......F..V.È.......F..V.Èp...r.ú 000120
A3C02800 011A9806 C70308E9 037425F6 7E80038D E900001A 9406C700 001A9606 .....ú.....Ö...~-%t.Ö..ú.....+åÈ 000140
00201C00 06C71A88 A31A6EA3 1A74A31A 8EA31A90 A31A78A3 1A92A31A 76A31A7A z.Èv.È..Èx.È..È..Èt.Èn.È..ú.... . 000160
FF00752B 3F80260A 5E88903E EB00301C 0006C70A 46FF4975 30017F80 260A5EC4 á^.&...Oul.F.ú...O.Š>..^.&.?+u.. 000180
9014EB1A 8E06FF1A 75001A7A 3E830E75 203F8026 9028EB00 001A8E06 C71A7A06 .z.ú.....Š(.&.? u..>z..u.....Š.. 0001A0
E80E5098 078A260A 5E880A46 FF1A8806 FFC7752D 3F80260A 5EC400EB 1A6E06FF ..n.Š.á^.&.?-uú.....F..^.&...P.Ò 0001C0
0C56890A 468908C4 8308C7E8 0E1A9E68 1E0A76FF 0C76FFDD 75C00802 C4830978 x..á..âul.v..v..h...Òú..á..F..V. 0001E0
```

Dump of file SATURN:[PCCOMMON.DUMP.DLL]DAD.TMP;1 on 18-APR-1990 10:40:03.08
File ID (551,9,0) End of file block 267 / Allocated 268

Virtual block number 210 (00000002), 512 (0200) bytes

```
75301C00 3E830074 001A883E 831A9EA3 D8F71A9E A11A8806 FF0C7D00 1A9E3E83 .>...).....Á..¼AÈ...>...t..>..0u 000000
0E1A9868 1E0A76FF 060A46FF 1A9006FF 2D752E3F 80260A5E C400201C 0006C706 .ú... .á^.&.?.u-.....F...v..h... 000020
0A5EC41A 900EFF00 011A9806 C70A7D00 1A983E83 0C56890A 468908C4 83087BE8 Õ(..á..F..V..>...).ú.........á^. 000040
3E830002 1A7B06C7 0675006C 3D287400 68304074 004E3030 74004630 98078A26 &...=F.t==N.t@=h.t÷=l.u.ú.x....> 000060
06C79002 4EE91C75 003F8026 0A5EC40A 46FF0375 4C3F8026 0A5EC409 75001A78 x..u.á^.&.?Lu..F.á^.&.?.u.ÕN..ú. 000080
004530F8 46899807 8A26C8EB 00081A78 06C7D0E8 00101A78 06C7D8E8 00011A78 x...ŠÁú.x...ŠÁú.x...Šà&....F½=E. 0000A0
91E9037E 78740069 3DF84688 20F84683 1A7606FF 08750058 30057400 47300A74 t.=G.t.=X.u...v..F½ .F½=i.tx-.Õ. 0000C0
75021A78 3E839001 59E90140 E9037500 25300152 E9037E01 3FE90375 00633001 .=c.u.Õ?.-ÕR.=%.u.Õã.ÕY...>x..u 0000E0
1A94A11F C4261A8A 1EC400E8 00000247 C7260789 261A94A1 1FC4261A 8A1EC415 .á...&á.À..&.&úG...Š.á...&á.À.. 000100
1A701EC4 018DE903 74001A94 3E830170 E9037500 1A963E83 041A8A06 83078926 &........>...u.Õp..>...t.Õ§.á.p. 000120
019EE80E 0A6A0000 1A6E06C7 1A9206FF 01ACE9FF FF8801AF E9037520 0A47F626 &-G. u.Õ€.j..Õ`.....ú.n...j..Õ.. 000140
1A783E83 00041A98 06C71A90 06FF1A76 06FF1A74 06FFF2EB 086A90C3 EB02C483 .á.Šú.j.Š`..t....v.....ú.......>x. 000160
46891A9E A128741A 9E0639FA 46891A78 A3C02B7A 74011A78 3E830081 E9037508 .u.Õ...>x..tz+àÈx..F¹9...t(À...F 000180
C02B027D C0081A9E A1051A9E 2E839090 13E80000 1A9E06C7 0A74001A 883E83FA ¹.>...t.ú.....Š.......À...à).+á 0001A0
227400FA 7E8302C4 83048DE8 0E3A6A02 C4830130 E80E106A 021A8A06 831A9EA3 È.......j..ÕO..á.j:.Õ...á..-¹.t" 0001C0
1A9E06C7 9007E81A 9E£3C02B 027DC008 1A9EA300 052DFA46 88157400 1A883E83 .>...t..F¹-..È...á).+àÈ..Š..ú... 0001E0
```

```
Dump of file SATURN:[PCCOMMON.DUMP.DLL]DAD.TMP;1 on 18-APR-1990 10:40:03.08
File ID (551,9,0)   End of file block 267 / Allocated 268

Virtual block number 211 (00000003), 512 (0200) bytes

006A90FF 3FE9106A FF10E902 1A8A0683 02C48300 F1E80E10 6A041A8A 2E830000 .......j..Òþ..á......Õ..j.Õ7..j. 000000
90FF21E9 0428EE E 256AFF2A E90349E8 0EF876FF F4E8016A 90FF39E9 026EE80E .Òn.Ò9..j.Š¶.v½.Õl.Õ°.j¾.Õ(.Õl.. 000020
FF0C5688 0A468d0? 74001A78 3E830A7E 00673005 7C00653D FF0CE903 7500643D =d.u.Õ..=e.|.=g.-Õ.>x..t..F..V.. 000040
E9037500 6F3DFE80 E9037500 6E30903A E8FE5689 FC468940 0C56880A 46880A4E N..F..V.a.F•.V±$:.=n.u.Õ.±=o.u.Õ 000060
E8FF79E9 03750078 30FEB9E9 03750075 308F7400 7330FEE0 E9037500 7030FEE4 Õ±=p.u.ÕÂ±=s.t.=u.u.Õ¿±=x.u.Õy.$ 000080
4628C388 EC75253C 0474C00A F6468807 8A26FC5E C4FC46FF 9034E80A 46FF9081 Ý..F.Š4..F=á^=&...F-.àt.<%u$.ü+F 0000A0
8A260A5E C40C5689 0A4689FE 5688FC46 8806C483 044CE80E 0A76FF0C 76FF500A .P.v..v..ÒL..á..F•.V±.F..V.á^.&. 0000C0
12C8CBC9 1A94A1FE 51E90374 200A47F6 261A701E C4FC63E9 0374C00A F6468807 ..F-.àt.Õc=á.p.&-G. t.ÕQ±À..èüà. 0000E0
021A783E 831A9206 FF04740A 067E8300 201C0006 C7067400 1A903E83 56570000 ..WV.>...t.ú... ..-..t......>x.. 000100
E8041A8A 0683FE56 89FC4689 02578826 0788261A 8A1EC419 75101A78 3E830774 t..>x..u.á...&..&.W..F=.V±.....$ 000120
88261A8A 1EC40EEB 0000FE46 C7FC4689 0788261A 8A1EC411 74001A92 3E83902C ,..>...t.á...&...F=úF±..Š.á...&. 000140
E8064688 0674FE46 08FC4688 0E74001A 6E3E8302 1A8A0683 FE5689FC 46899907 ...F•.V±......>n..t..F=.F±t..F.$ 000160
7D00FE7E 83317500 1A923E83 F45689F2 46891A9C 16881A9A A11BFEA3 C0289003 ..+áÉ±.À.......F·.V¶.>...u1.-±.) 000180
4689DAF7 00D28308 F7FE5688 FC46882D 07C626F2 46FFF25E C410750A 067E8328 +.-..u.á^·.F·&6.-.F=.V±¼A.@.¼Õ.F 0001A0
FF501E06 76FFFA5E 8CF84689 1A7C8800 00F646C7 9006E800 01F646C7 FE5689FC =.V±úF-..Š..úF-..¦|..F½.^*.v..P. 0001C0
83037900 709AF876 FFFA76FF 4574001A 903E830A C483085D 11669AFC 76FFFE76 v±.v=.f.]..á..>...tE.v*.v½.p.y.. 0001E0

Dump of file SATU..N:[PCCOMMON.DUMP.DLL]DAD.TMP;1 on 18-APR-1990 10:40:03.08
File ID (551,9,0)   End of file block 267 / Allocated 268

Virtual block number 212 (00000004), 512 (0200) bytes

C4F04E88 00001BFE 06C70675 081BFE3E 830D7EC9 08F04E89 C8281A98 0E8804C4 á.....+à.NÞ.è-..>±..u.ú.±....NÞá 000000
EE5E8C1A 760E88F0 4E89F446 8CF27E89 F47FC008 49C18847 3005C626 05E8F27E -·Š.&6.0G.èl.á.¶.-·.F¶.NÞ..v..^Ÿ 000020
E375003F 8026F846 FF46202C 80037C61 3C0774C9 08048807 8A26F85E C4F276C5 év·á^Ÿ&.....èt.<a|.., F.FŸ&.7.uÐ 000040
88057500 F67E8308 741A8E06 081A7AA1 1475001A 923E83EE 5E8EF45E 8CF27689 .v·.^¶.^Ÿ.>...u.Àz.....t..--.u.¡ 000060
018E1874 00067E83 56570000 10C8CBC9 5F5E02C4 8302FFE8 0E50C028 02E80001 ..Š.+áP.Õ...á.^_èüà...WV.-..t.ƒ. 000080
8A1EC413 74081A78 3E83008F E9021A8A 0683FA56 89F84689 1A8C1688 1A8AA100 .À.......F½.V*_....Õ...>x..t.á.. 0000A0
FA5E8CF8 4689FC46 89078826 1A8A1EC4 10E8FA56 89F84689 02578826 0788261A .&..&.W..F½.V*Š.á...&...F•.F½.^* 0000C0
097500FC 7E83900A E800F088 1575FA46 08F84688 0E74081A 783E8304 1A8A0683 ......>x..t..F½.F*u.¡Þ.Š...-•.u. 0000E0
980E881C 741A9036 39F628F4 5689F246 89FA5688 F84688FA 5E8CF846 8900F788 ¡¼..F½.^*.F½.V*.F·.V¶+-96..t.... 000100
26F246FF F25EC446 90EDE810 7ECE3846 1574003F 8026F246 FFF25EC4 900EE81A .Š..á^·.F·&.?.t.F;ö-.ŠU.Fá^·.F·& 000120
76FFFA76 FF5602C4 830159E8 0E570875 001A883E 83FE281A 9E3E88F3 75003F80 .?.uµ.>..+±.>...u.W.ÕY..á.V.v*.v 000140
000006C8 90C8C95F 5E02C483 013CE80E 57087400 1A883E83 06C48301 83E80EF8 ½.Õ°..á..>...t.W.Õ<..á.^_èù.à... 000160
C02A9003 E8018005 7547067E 83067467 067E83FE 5689FC46 891A8C16 881A8AA1 À.......F=.V±.-.gt..-.Gu.¯.Š..*á 000180
9806C706 75001A98 3E830074 00FA7E80 00061A98 06C70675 001A903E 83FA4688 .F*.>...u.ú......-*.t..>...u.ú.. 0001A0
198C068E FC76FFFE 76FF1A9A 36FF1A9C 36FF0676 FF1A9836 FF1A7636 FF00011A ....6v..6...v..6...6...v±.v=.... 0001C0
8C068E1A 9A36FF1A 9C36FF14 75001A6E 3E831874 00FA7E80 0EC48305 221EFF26 &..".6..-*.t..>n..u..6...6..... 0001E0

Dump of file SATURN:[PCCOMMON.DUMP.DLL]DAD.TMP;1 on 18-APR-1990 10:40:03.08
File ID (551,9,0)   End of file block 267 / Allocated 268

Virtual block number 213 (00000005), 512 (0200) bytes

8E1A9A36 FF1A9C36 FF147500 1A983E83 18740001A 6E3E8304 C4830526 1EFF2619 .&..&..á..>n..t..>...u..6...6... 000000
FF1B741A 8E06081A 7AA10000 18FE06C7 081A8A06 8304C483 052E1EFF 26198C06 ...&.....á......ú.±...Àz.....t.. 000020
29E80E50 C02802E8 00018805 74C00804 C4830532 1EFF2619 8C068EFC 76FFFE76 v±.v=....&..2..á..àt.¡..Š.+áP.Õ) 000040
37882606 468A1478 044FFF26 1A701EC4 3C75001A 963E8356 000000C8 90C8C901 .èù.à...V.>...u<á.p.&.O.x..F.&.7 000060
754006C4 83083501 FA9A0676 FF531A72 36FF10E8 E42A0488 2602478E 26L FF26 &..&.G.&..*ÕŠ..6r.S.v..*.S..á.àu 000080
06768857 75001A96 3E835657 000002C8 90C8C95E 1A9406FF 9005E81A 960C F07 .....Š......^èü.à...WV.>...uW.v. 0000A0
9606FF04 754006C4 83089001 FA9A1C00 36FF1A70 36FF1A72 36FF18E8 507EF608 .-~PŠ..6r..6p..6...*....á.àu.... 0000C0
2602478E 2607FF26 3F88261C 00A00478 044FFF26 1A701EC4 1E7EC008 4EC6881A ..6N.à~.á.p.&.O.xà...&.7&..&.G.& 0000E0
76885657 000002C8 CBC95F5E 1A940601 06468807 75001A96 3E83D4E8 E42A0588 ..*ÕŠà.>...u..F.....^_èüà...WV.v 000100
830C0F01 FA9A5098 078A2606 5EC41A70 36FF1A72 36FF22E8 5E75001A 963E830A ..>...u^Š".6r..6p.á^.Ē...P.*.... 000120
065EC4C0 78044FFF 261A701E C42574C0 084EC688 0646FF1A 9606FF04 754006C4 á.àu......F..6N.àt%á.p.&.O.xèá^. 000140
88077500 1A963E83 CAEBE42A 05882602 478E2607 FF263F88 261A701E C4078A26 &..á.p.&.7&..&.G.&..*ÕŠò.>...u.. 000160
4689C028 F65689F4 46891A9C 16881A9A A1560000 0CC8CBC9 5F5E1A94 06010A46 F.....^_èüà...VÀ.......F¶.V-+à.F 000180
18FE3E83 067628F0 28F84689 04C48308 4800709A F476FF52 1A9E3688 FA4689FC •.F*.6._R.v¶.p.H..á..F½+Þ+v..>±. 0001A0
197520 3F 8026F45E C4227500 1A883E83 4E017508 18FE3E83 08E802EE 83057510 .u..Ÿ.Š..>±..u.N.>...u"á^¶&.?-u. 0001C0
0874301C 003E83F8 4EFF02C4 83FE71E8 0E509807 8A26F446 FF127530 1C003E83 .>..Ou..F¶&...P.Òq±.á..N½.>..Ot. 0001E0
```

```
Dump of file SATURN:[PCCOMMON.DUMP.DLL]DAD.TMP;1 on 18-APR-1990 10:40:03.08
File ID (551,9,0)   End of file block 267 / Allocated 268

Virtual block number 214 (00000006), 512 (0200) bytes

 FF077400 1BFE3E83 0066E80E FA46FF07 7400067E 83187400 1A883E83 077EF608 .--..>...t..-..t..F*.Òf..>±..t.. 000000
 7500FA7E 830A7400 067E8302 C483FE7E E80E5629 75001A88 3E830070 E80EFC46 F•.Òp..>...u)V.Ò-±.á..-..t..-*.u 000020
 0EF476FF F676FFF8 76FF0040 E80E0475 00FC7E83 0A74001B FE3E8300 39E80E04 ..Ò9..>±..t..-•.u..Òã..v½.v-.v¶. 000040
 3E83C8C9 5E02C483 FE38E80E 5600201C 0006C70E 74001A88 3E8306C4 83FE85E8 Òç±.á..>...t.ú... .V.Ò8±.á.^èù.> 000060
 8302C483 FDC8E80E 306AC802 C483FDD2 E80E5000 208803E8 00288805 74001A7A z..t.¡+.Š.¡ .P.Ò@».á.ùj0.Òà».á.. 000080
 06C8C802 C483FDAA E80E5000 788803E8 00588805 74001A76 3E831775 101BFE3E >±..u..>v..t.¡X.Š.¡x.P.Ò¯».á.ùà. 0000A0
 46FF021A 8A068337 88261A8A 1EC41275 2A3F8026 0A5EC400 01FE46C7 56570000 ..WVúF±..á^.&.?*u.á...&.7......F 0000C0
 FA468807 8A260A5E 88F6280A 46FFFFFF FE46C708 75203F80 260A5EC4 9060E80A .Š'.á^.&.?-u.úF±...F.+-.^.&...F* 0000E0
 39308026 06E8F888 00301C00 06C70675 303C0A75 1A903639 387F393C 3F7C303C <0|?<9.;96..u.<0u.ú...0..«Š.&.=9 000100
 0A7E890F 7D303080 2647F188 30E983C8 03E1D1CE 0302E1C1 CE889805 8A26187F ..&....öèÅ..ö1Å.à.Ò0.þG&.=0)Ò.-. 000120
 88570000 04C8C8C9 5F5E0C56 880A4688 37892606 5EC4F088 EEF7FE46 880C468C .F..F±¥Y.þá^.&.7.F..V.^ èùà...W¡ 000140
 89000188 F4750038 26117400 30802647 01E8FC7E C4064E8A FE5E8CFC 468900FE ±..F•.^±.N.á-•Š.G&.=.t.Ï8.u¶¡... 000160
 00FFFF9A 5016C488 50EC8855 90C8C95F C028FE46 8CFC7E89 9009E8FE 468CFC7E ~•.F±Š...-•.F±+â_èù.U.$P.á.P.... 000180
 880AF912 A89A039E E80021E8 0000FFFF 9A010468 1E010668 1E1740A3 E0865800 .X.Àèã..h...h.......Ò1.Ò...´.*.¡ 0001A0
 068EFF33 0000881E 010C16FF 00FF680E 2A0EDA9A 0E1D0E86 9A50C85D E5880001 ...Í}ùP......Ò.*.h.......£..3... 0001C0
 330874CA 88A6F3C8 88018805 108E3174 00308026 47017500 3080267F FF890106 ..¿..&.=.u.G&.=.t1/...Í.ùµÍ.Òt.3 0001E0

Dump of file SATURN:[PCCOMMON.DUMP.DLL]DAD.TMP;1 on 18-APR-1990 10:40:03.08
File ID (551,9,0)   End of file block 267 / Allocated 268

Virtual block number 215 (00000007), 512 (0200) bytes

 C20A0572 412CAC92 04E0C00E 72412CAC 1747BF1F F788071E 061CE8E7 74AEF2C0 â·ÙtÓŠ.....¥.«G.¯,Ar.ãÅ..¯,Ar..ô 000000
 00FF8805 1E1EFF04 74000520 3E830E2F 0EDA9A50 00FC88EC 885500C3 1FEDE8AA ¨ŠÙ.ú.U.$¡•.P.Ö./..> ..t.....|.. 000020
 74C238AD 19968E06 5688C08E D88E0295 885756EC 8855C850 E5880E90 0EDA9A50 P.Ö....Í}ùU.$VW¡...Å.à.V./..Ù;òt 000040
 76FF57EC 88550002 CA5DE588 5E5F96E8 E8F788AE F2FFFF89 C033970C 74964010 .ã.t..3ã¿..Ù.¥ŠŠ._^.Í}ò..U.$W.v 000060
 521E5300 0288C488 504901F7 AEF2FFFF 89C033FA 88921F74 C0080EA4 0EAA9A06 ..´.£..ãt...*3ã¿..¯Ù¾ÍIP.á£..S.R 000080
 89990542 20044688 195806FF 000004C8 0002CA5D E5885F58 0000FFFF 9A501651 Q.P.....[_.Í}ò..à.....X..F.-B..¿ 0000A0
 02C4830E E414639A 020068FE 5E8CFC46 89113605 E001C103 E001C888 F9F7000C ..¾*.àÍÅ.ëiÅ.6..F•.^±h...c.Ò..á. 0000C0
 9021E802 000247C7 26FC5EC4 080A4F80 261174D0 08085789 26064789 26045EC4 á^.&.G.&.W..Åt.&.O..á^•&úG...$Í. 0000E0
 00010247 C726FC5E C4085789 26064789 2640FE56 88FC4688 040A4F80 26045EC4 á^.&.O...F•.V±ã&.G.&.W.á^•&úG... 000100
 065E88EC 8855C3C9 00000447 C7260257 89260789 2608578B 2606478B 26045EC4 á^.&.G.&.W.&..&.W.&úG...èùU.&.^. 000120
 0C76FF08 76FF0A76 FF53CC88 04EC8304 60E90454 E9C03300 098A0872 17451E38 ;.E.r.o..3àÒT.Ò'..&..äS.v..v..v. 000140
 5E880CEC 83EC8855 00C850E5 88FD1747 A78091E1 75C0855A 590000FF FF9A5116 .Q.....YZ.áuÅ..ÍG.».Í}ù.U.&.&..^ 000160
 46805141 415151C9 33531274 20174787 F60413E9 C0330009 8A087217 451E3806 .;.E.r.o..3àÒ..-.G. t.S3èOOAAQ.F 000180
 FC4689FE 4689C033 0856C50A 468EFA5E 8C667480 174787F6 00000FC3 9A5016F4 ¶.P.û...-.G..tf_^*.F.éV.3ã.F±.F• 0001A0
 88E22800 808ADC88 02EC833B 75AEF20A 8049E30C 4E88F866 89F288FA 885657FC •WV.*. .f½.N.DI¯.·Ûu;.&..Éo..+ã. 0001C0
 0375F838 00800009A E9002BE8 F4E2AA1A 74F83800 740A3CAC 0C4E8807 16FA88D4 Å.*...N.¯<.t.;«t.¨ã¶Ò+.Ò..¯.;«u. 0001E0

Dump of file SATURN:[PCCOMMON.DUMP.DLL]DAD.TMP;1 on 18-APR-1990 10:40:03.08
File ID (551,9,0)   End of file block 267 / Allocated 268

Virtual block number 216 (00000008), 512 (0200) bytes

 11949AFF FC887AEB 0093E9FA 5E8E5F5E E1E80014 E8E2E8FC 46FF0A80 AA001FE8 Ò..´¯..F•ŠãÒ..ŠÅ^_.^*Ö..Šz¡•.... 000000
 0800000F 049A5016 F4468051 521E5306 5E881FE3 CA28CF88 1F061E51 53500F38 ;.PSQ....u+òD..^.Š.RQ.F¶.P...... 000020
 74006030 1874C008 08C4831F C3FA8858 58591F07 740808FE 5E01F45E 881175C0 àu..^¶.^±.Ut..Y(X.*û..á..àt.=m.t 000040
 5E8E0E74 40174787 F6FE5E8E 26E8F900 208A03E8 001C8A08 7500098A 00013000 .=..o..u.o..Š.o .*Š&.^±-.G.ãt..^ 000060
 8E5F5EF8 6688FC46 28FE4688 06E8F9C0 33001C8A 0EE8F803 751A3F80 085E880A ..^..?.u.½Š.o..3ã*Š..F±+F•.f½^_. 000080
 46805152 1E530856 C51EEEE8 C1880475 C9080C4E 8802F7E9 C85DE588 0472FA5E ^*r..Í}ùÒ%..N..èu..éŠY.éV.S.RQ¯F 0000A0
 E8001C8A CC750009 8A000130 0074006D 301774C0 081F071E 00001098 9A5016F4 ¶.P.........ât.=m.t.=..o..uão..Š 0000C0
 1C8AA6E8 02751A3F 80260A88 0A744017 4787F687 75C008F4 4688C2E8 0020BAC7 ùo .Šò.F¶.àuñ-.G.ãt..Ò&.?.u.ŠÍo. 0000E0
 7C00F883 117D1745 1E38065E 88EC8855 0442E900 835756EC 885500A3 E8C03300 .3àŠÈ.U.$VW*.Ò8.U.&.^.;.E.)..«.| 000100
 05401E38 0872D828 DC885A59 00C850E5 88C03302 E80001B8 05744017 4787F60C .-.G.ãt.¡..Š.3ã.Í}ù.YZ.É+År.;.ã. 000120
 A7800488 5200028B 053C2EFF 5152FC74 E9C03305 7540053C A1C85152 E3880572 r..DRQÙÅ<.ãu.3àÒt•RQ..<.£..R.å.Í 000140
 75000230 07740001 30408112 7558C008 0000FFFF 9A521650 1653C488 50871747 G.ñP.áS.P.R......ãXu.Ýã=..t.=..u 000160
 E9037319 701EFFD8 33C28C19 7406C41E E319720E 885A0479 4B17478F 08088106 .Ý...G.KyÅZ..r.D.á.t..ò3Ù..p.s.Ö 000180
 73E8197C 8F197C8E 007CE819 7C8F197C 8E19701E FF000388 C28C1978 06C401AE Û.á.x..öÉ....p./|.¢|.Ò|./|.¢|.Òs 0001A0
 19808F19 7C8ED88E 0E8088C3 0000FFFF 9A123568 0E016A08 74198030 197C8800 .¡|.=..t.j..h5......û¡¨..Å/|.¢.. 0001C0
 19808F19 7C8E003A E81C028F 1C028EEC 88550000 12309A00 6A006A03 6A0051E8 ÒQ.j.j.j..0...U.Š/..«..Ò:./|.¢.. 0001E0
```

```
Dump of file SATURN:[PCCOMMON.DUMP.DLL]DAD.TMP;1 on 18-APR-1990 10:40:03.08
File ID (551,9,0)   End of file block 267 / Allocated 268

Virtual block number 217 (000000D9), 512 (0200) bytes

 06468A50 C033001A E819B08F 19808E00 23E81980 8F19808E EC885503 E80031E8 Ò1.$.U.è/..¢..Ò#./..¢..Ò..3ÀP.F. 000000
 02450805 8804EF83 0E73F738 C319701E FF00028B 07E31972 0E880000 FFFF9A50 P.......r.D.£....p.û;%s..ÿ....E. 000020
 28010616 8800F0E9 03750106 3639FF28 F6285657 000014C8 00C3EEEB 1DFFF274 t...$Yù.à...WV+-+.96..u.Òb.....+ 000040
 C483131C 15769A05 10681EF6 76FFF876 FF0C6AF8 5689F646 89F25689 F04689C0 à.Fb.V.F-.V%j..v%.v-.h...v....à 000060
 5EC40CE8 47EA7500 3C8026F6 46FFF65E C400BCE9 03767FFF FE814619 74C0080A ..àt.F.±..v.ÒV.à^-.F-&.?.uõG$.à^ 000080
 C483132B 151E9A04 6A500145 808A7500 3F8026F6 5E88F475 003F8026 F^46FFF6 -.F-&.?.u¶.^-&.?.uo.E.Pj....+..à 0000A0
 46886074 EE460BEC 4688FE56 89FC4689 02C48313 6114639A 56EE5689 EC468904 ..F&.VÝV.c.a..à..F=.V±.F&.FÝtm.F 0000C0
 769A0510 681EF076 FFF276FF 0C6A194F 1689194D A3EE5688 EC468866 74C..BFC •.ðtf.F&.VÝEH...O.j..v..vb.h...v 0000E0
 5EC404EC 46830257 89260789 26FE5688 FC4688EC 5EC42C74 C0080AC4 83108015 ....à..àt,à^&.F•.V±&..&.W..F&.à^ 000100
 003F8026 F046FFF0 5EC4E8E8 0E74C00A 078826FC 46FFFC5E C4078A26 F046FFF0 b.Fb&..à^•.F•&...àt.$Òà^b.Fb&.?. 000120
 00051804 02030202 1601FA70 E90002B8 90C8C95F 5EA77500 3F8026F0 5EC4F475 u¶à^b&.?.uÏ^_èù.¡..Òp*......... 000140
 00520243 00410235 02121211 0010120F 1600160C 0808070A 0C090C08 0C070906 ........................5.A.C.R. 000160
 00000807 02CE08A4 00840982 0A810A80 16060972 1C70206D 006C0859 00570053 S.W.Y.l.m p.r...........Ê.ö.•... 000180
 881743A3 CB50E588 99FFFF88 0008E8C8 50E58899 FFFF8817 3C168917 43A31608 ..ÈC...<.¡....[]ùÒ..¡....[]ùÈC.£ 0001A0
 3C04728C 3C430A76 243C0472 133CF7E2 43431674 073A2E18 75E40A00 24891386 Å.¿$..ðu..:.t.CCã%<.r.<$v.C<¥r.< 0001C0
 8801FE4F 80260574 C308C08C 065EC4EC 885500C3 173CA398 01478A2E 430176CA òv.C..G..È<.ü.U.&à^..à.ût.&.O±.. 0001E0

Dump of file SATURN:[PCCOMMON.DUMP.DLL]DAD.TMP;1 on 18-APR-1990 10:40:03.08
File ID (551,9,0)   End of file block 267 / Allocated 268

Virtual block number 218 (000000DA), 512 (0200) bytes

 A3127400 25E80875 0019643E 831E73FF F1300646 88575602 EC83EC88 55C85DE5 []ùW.&.&.VW.F.=b.s..>d..u.Ò%.t.È 000000
 E5885E5F 02C48312 DC16689A 0676FF08 750078E8 05740018 E8157500 82E81964 d.Ò..u.Ò..t.Òx.u..v..h.È..à._^.[ 000020
 50028051 0E4F8050 501EC033 FE5E89FE E3834306 5E880776 065E3900 F08BC850 ]ùÈb.9^.v..^.C.D±.^±3à.PP.O.Q¯.P 000040
 880008A3 DA8E0574 D2081968 A3196616 87C28838 74FFFA83 08C48314 9718149A ......à..*.t8.Ò..f.Èh..•t..ÖÈ... 000060
 00000500 0AA30147 8D0002A3 0000A300 0A880C47 89484800 08A3C033 D88EFE5E ^±.Ã3àÈ..HH.G.¡..È..È...G.È..... 000080
 0AC8C309 8EC18C02 08019AE8 19681E8E 0833064E 88C08ED8 8CC31F08 8C0006A3 È...Ã.ü.Ã.à.N.3Ü..h.Ò...•.è.Ïùà. 0000A0
 C0280674 FFFFC2F7 FA5689F8 4689154B 01C69A06 76FF006A 0876FF00 6A560000 ..Vj..v.j..v..ó.K..F%.V*%ó..t.+à 0000C0
 FE76FF00 6A561274 D008FE56 89FC4689 02C48315 6414639A 56F87688 902FE899 .$/..v%V.c.d..à..F•.V±.Àt.Vj..v± 0000E0
 E30E4E88 1E5657EC 885590C8 C95EFE56 88FC4688 9007E808 C48314C3 18CA9A50 P.Ò.ü..à.$...F•.V±^èù.U.&VV..N.D 000100
 FF453A26 C933FF44 8AA6F30A 76C5FE88 C80309F7 AEF2C033 F788067E C4D98827 '.[à-..%3à·Ü%].ü.±èv.µ[.D.3è&:E. 000120
 570A7EC5 1E085688 0646880E 4E8800C8 50E5885F 5E1FC188 01F74949 04740477 w.t.II%[.è.^_.[]ù..N..F..V..è-.W 000140
 D23392F7 880AF700 D28308F7 AA2D800A 79D2080E 750AF983 1374C00A 93FC071E ..•..àt..*.u¯.•y.¯-¯%Ü.•.%Ö.%.3• 000160
 86AC4F05 88E275C3 08C288AA 27040276 393C3004 D38792F1 F793F1F7 0274C008 .àt.%b.%b..Æ.0<9v..'¯.ó.ùuà..0¯. 000180
 46890542 88560000 06C800C8 50E5885E 5F1F580A 8CF272C7 38014480 FF448805 ..D..D.;ùr·.OX._^.[]ù.à...V¡B..F 0001A0
 46017440 04C48315 3019129A 53060E74 830A47F6 26FA5EC4 1CE8F628 FC5E8CFA *.^•+-$.à^*&-G.¯t..S...O..à.ât.F 0001C0
 04740808 065E88EC 885590C8 C95EC688 D876FA46 39173216 881730A1 0CFA4683 .F*.ÀO...2.9F*vÄ.ó^èù.U.&.^..Üt. 0001E0

Dump of file SATURN:[PCCOMMON.DUMP.DLL]DAD.TMP;1 on 18-APR-1990 10:40:03.08
File ID (551,9,0)   End of file block 267 / Allocated 268

Virtual block number 219 (000000DB), 512 (0200) bytes

 33057501 76E80005 88071E29 75003F83 195A8857 56EC8855 CB5DE588 01FE4F80 .O±..[]ùW.&VWÉZ..?.u)..¡..Òv.u.3 000000
 4E881960 3689FFFE FE44C704 C6830001 04C79619 5CA3195A A3FE2440 24E899C0 à.$$à$±ÈZ.È\..ú....ó.ùD±±..6'..N 000020
 FC027788 F273EEF9 83FEE180 FA744100 D0E9C850 E5885E5F 0009E8C0 8ED88C06 ..Ã.àÒ.._^.[]ùÒÃ.At*.Ã±.*¥s·.w.• 000040
 EBFE4489 F7880002 05C20335 7401A8AD F0030088 1573C138 48437401 A8FE88AD Ù.±¯.tCH;ès..Ã.bÙ´.t5.ó....%.D±$ 000060
 74D13812 3689DA8C C688FE4C FEF90305 E8058948 C128FE4C 89F9030C 74FE88E6 ].±t..*.L±+èH..$..*±L±.ó.Ò¿6.;]t 000080
 FE88F274 01A8ADF0 03FE8825 74FFFE30 02196C06 C626C302 7F891968 1E8C2605 .&..h....ù&ó.l..=±.t%.±.bÙ´.t·.± 0000A0
 74C00808 4788E6E8 FE4489F7 88000205 C203E274 01A8ADF0 03008888C 73C13848 H;ès¥.Ã.bÙ´.tã.ó....%.D±$].G..àt 0000C0
 77888BEB 37881964 1E8E2605 74C73816 F88FD88C 1274196C 0EFE2615 E8D88E04 ..Ã$.&±.l.t..Ã¢«.;út.&..d..7$È.w 0000E0
 EB4E4E96 0574001D E8FE40FE 0D74005F E8984040 01240D74 C638006B E8C03306 .3àÒk.;ót.$.ââ.Ò_.t.±M±Ò..t..NN$ 000100
 28037401 A8FE4588 51C399C0 33024789 07881968 A3260474 C13B174F B9088C98 ..Ã¿O.;èt.&Èh....G.3à.ùQ.E±´.t.+ 000120
 C22302F7 0072C203 1572C603 C188F575 EAD10476 196A1638 267FFF8A 414149C8 à[AAo..&;.j.v.]õu%.è.ór..ór.%•#ó 000140
 C7F203F0 88FE8857 18740010 E85152C3 59C033E5 75EAD1D2 F7087500 0CE8C628 +óÒ..u.%•ìõu]3àYÚRQÒ..t.W.±.P.·ú 000160
 06500001 88505252 1ED23350 53C35A59 58FE5589 4AD72806 88067789 FFFEFE44 D±±..w..•+•J.U±XYZúSP3•.RRP¡..P. 000180
 3875000A 7E830657 56EC8855 C3020802 74585A1F FFFA8308 C4831637 18149A1F ....7..ó..*..Z(t..•ùU.&VW..¬..u8 0001A0
 44880074 F7381174 48050E36 884CE827 720057E8 07754806 46880856 88010E8F ¢...V..F.Hu.ÒW.r'$L.6..Ht.;%t..D 0001C0
 885021E8 99FFFF88 0675D208 0473050E FE8104C6 8334735E 003EE856 0E468902 ..F.VÒ>.^s4.ó..±..s..•u.¡...$!P. 0001E0
```

```
Dump of file SATURN:[PCCOMMON.DUMP.DLL]DAD.TMP;1 on 18-APR-1990 10:40:03.08
File ID (551,9,0)   End of file block 267 / Allocated 268

Virtual block number 220 (0000000C), 512 (0200) bytes

07C03303 88050E36 89025C89 1489E675 C085F958 0000FFFF 9A50C033 501652C4 âR.P3àP.....(*.âul...\..6...Æ3â. 000000
1C030A88 2CEBF9F¿ 75050EFE 8104C683 0C74024C 39F7880E 4E88CB5D E5885E5F _^.Ì]ù.N..¼9L.t..6..±..u·ºS,.ö.. 000020
890475F7 380E75C0 850000FF FF9A5153 13730108 1E390675 F738C18E D3882672 ¯Ê.Æ.è;¼u.9...s.SQ......âuß;¼u.. 000040
D8180128 0C740AF7 D788067E C45738E3 0C4E88EC 885500C3 D1880487 92010816 .......lù.U.$.N.DØWâ-..æ¼Öt.+1.Û 000060
8EFFFFC3 81C38C10 E30187AA F3C913A8 F3E901E0 8A0A4688 D1280187 D1030323 #Æ.Ì.Ì+Ì.F..ÀiÒµ¨.èµ´.ÌD..ù.ù... 000080
0A478A26 065EC4F6 28560000 04C8C850 08568806 46885FAA F3C913A8 F3E901C3 ùÌÒµ¨.èµ´_.F..V.]ùâ...V+-á^.Ê.G. 0000A0
01113687 F606D868 F9F7000C 89990542 20C38815 75080A47 F6265575 023C0324 $.<.uUÊ-G¯.u..ù-B..¿..¼ºkÄ.-.6.. 0000C0
08478A26 0677FF26 0877FF26 50287EC0 08FC4689 06472826 07882606 5E883974 t9.^.Ê..Ê+G..F=.á-(PÊ.w.Ê.w.Ê.G. 0000E0
8826065E C4FFFF8E 200A4F80 26065EC4 0874FC46 3808C483 18040FD8 9A50E42A *ðP.Ä....á.;F=t.á^.Ê.O. ƒ..á^.Ê. 000100
00021282 0103000C C8C95EC6 88000004 47C72602 57892607 89260857 88260647 G.Ê.W.Ê..Ê.W.ÊúG....ó^èù........ 000120
000E1966 00020026 000218B3 01030022 00021868 01030007 0002124A 01030005 ....J.......h...".......Ê...f... 000140
000211CC 0103003A 00021004 01030088 000218FD 01050000 00101784 00020000 ..............»...........:...ë... 000160
00000000 00000CFF 00101124 0203005C 000200FD 0103005B 00020E10 0103004D M.......[...»...\...$........... 000180
6F43202D 20797261 7262694C 20656D69 54206E75 5220534D 00000000 00000000 ........MS Run-Time Library - Co 0001A0
70726F43 2074666F 736F7263 694D202C 38383931 20296328 20746867 69727970 pyright (c) 1988, Microsoft Corp 0001C0
73250000 00000000 65747465 6C615064 61440064 61440073 2520203A 73250011 ..%s:  %s.Dad.DadPalette......%s 0001E0

Dump of file SATURN:[PCCOMMON.DUMP.DLL]DAD.TMP;1 on 18-APR-1990 10:40:03.08
File ID (551,9,0)   End of file block 267 / Allocated 268

Virtual block number 221 (0000000D), 512 (0200) bytes

5E353FE2 04189374 8C6A3FE8 00000000 00003FF0 00000000 00000073 2520203A :  %s.......b?......ð?j¥t...ã?5^ 000000
1AA03FC6 C8843958 10623FCE 56041893 748C3FD4 39581062 40D33FD8 020C498A ¤I..Ù?ÆMb.X9â?¥t...Vö?b.X9Çà6?.. 000020
2F1B3FAC AC083126 E9793FB3 33333333 33333F89 99999999 999A3FC1 0624D02F /ì$.ê?......¿?333333°?yÒ&1.¯¯?./ 000040
84393F92 6E97804F DF3B3F98 93748C6A 7EFA3FA0 624D02F1 A9FC3FA5 8106240D ì$..Ê?=`þØMb.?¹-j¥t..?;Õ0..n.?9Ç 000060
20280029 6C6C756E 2800296C 6C756E28 00003F84 7AE147AE 147B3F8A 9FBE76C8 âv/..?(.ÚGÄz.?..(null).(null).+· 000080
00000000 00000000 00000000 0000198C 1C101265 1C101C10 00000000 00002320  #..........e.................... 0000A0
00000000 00000000 00000000 00000000 00000000 00000000 00000000 00000000 ................................ 0000C0
00000000 00000000 00000000 00000000 00000000 00000000 00000000 00000000 ................................ 0000E0
00000000 00000000 00000000 00000000 00000000 00000000 00000000 00000000 ................................ 000100
00000000 00000000 )0000000 00000000 00000000 00000000 00000000 00000000 ................................ 000120
00000000 00000000 .0000000 00000000 00000000 00000000 00000000 00000000 ................................ 000140
00000000 00000000 00000000 00000000 00000000 00000000 00000000 00000000 ................................ 000160
00000000 00000000 00000000 00000000 00000000 00000000 00000000 00000000 ................................ 000180
00000000 00000000 00000000 00000000 00000000 00000000 00000000 00000000 ................................ 0001A0
00000000 00000000 00000000 00000000 00000000 00000000 00000000 00000000 ................................ 0001C0
00000000 00000000 00000000 00000000 00000000 00000000 00000000 00000000 ................................ 0001E0

Dump of file SATURN:[PCCOMMON.DUMP.DLL]DAD.TMP;1 on 18-APR-1990 10:40:03.08
File ID (551,9,0)   End of file block 267 / Allocated 268

Virtual block number 222 (0000000E), 512 (0200) bytes

00000000 00000000 00000000 00000000 00000000 00000000 00000000 00000000 ................................ 000000
00000000 00000000 00000000 00000000 00000000 00000000 00000000 00000000 ................................ 000020
00000000 00000000 00000000 00000000 00000000 00000000 00000000 00000000 ................................ 000040
00000000 00000000 r0000000 00000000 00000000 00000000 00000000 00000000 ................................ 000060
00000000 00000000 00000000 00000000 00000000 00000000 00000000 00000000 ................................ 000080
00000000 00000000 0.000000 00000000 00000000 00000000 00000000 00000000 ................................ 0000A0
00000000 00000000 00000000 00000000 00000000 00000000 00000000 00000000 ................................ 0000C0
00000000 00000000 00000000 00000000 00000000 00000000 00000000 00000000 ................................ 0000E0
00000000 00000000 00000000 00000000 00000000 00000000 00000000 00000000 ................................ 000100
00000000 00000000 00000000 00000000 00000000 00000000 00000000 00000000 ................................ 000120
00000000 00000000 00000000 00000000 00000000 00000000 00000000 00000000 ................................ 000140
00000000 00000000 00000000 00000000 00000000 00000000 00000000 00000000 ................................ 000160
00000000 00000000 00000000 00000000 00000000 00000000 00000000 00000000 ................................ 000180
00000000 00000000 00000000 00000000 00000000 00000000 00000000 00000000 ................................ 0001A0
00000000 00000000 00000000 00000000 00000000 00000000 00000000 00000000 ................................ 0001C0
00000000 00000000 00000000 00000000 00000000 00000000 00000000 00000000 ................................ 0001E0
```

```
Dump of file SATURN:[PCCOMMON.DUMP.DLL]DAD.TMP;1 on 18-APR-1990 10:40:03.08
File ID (551,9,0)    End of file block 267 / Allocated 268

Virtual block number 223 (000000DF), 512 (0200) bytes

00000000 00000000 00000000 00000000 00000000 00000000 00000000 00000000 ................................ 000000
00000000 00000000 00000000 00000000 00000000 00000000 00000000 00000000 ................................ 000020
00000000 00000000 00000000 00000000 00000000 00000000 00000000 00000000 ................................ 000040
00000000 00000000 00000000 00000000 00000000 00000000 00000000 00000000 ................................ 000060
00000000 00000000 00000000 00000000 00000000 00000000 00000000 00000000 ................................ 000080
0000003D 4F464E49 5F454C49 465F435F 010E0000 00000000 00000000 00000000 .................C_FILE_INFO=... 0000A0
FFFFFFFF 01010000 00000530 13B0052C 13B00528 13B00524 13B0FFFF 13B00000 ........S...(...,...0........... 0000C0
00000000 00000102 00000000 00000000 00000001 19BA0000 0000054A 00000200 ....J........................... 0000E0
00000000 00000000 00000000 00000000 00000000 00000000 00000202 00000000 ................................ 000100
00000000 00000000 00000000 00000000 00000000 00000000 00000000 00000000 ................................ 000120
00000000 00000000 00000000 00000000 00000000 00000000 00000000 00000000 ................................ 000140
00000000 00000000 00000000 00000000 00000000 00000000 00000000 00000000 ................................ 000160
00000000 00000000 00000000 00000000 00000000 00000000 00000000 00000000 ................................ 000180
00000000 00000000 00000000 00000000 00000000 00000000 00000000 00000000 ................................ 0001A0
00000000 00000000 00000000 00000000 00000000 00000000 00000000 00000000 ................................ 0001C0
00000000 00000000 00000000 00000000 00000000 00000000 00000000 00000000 ................................ 0001E0

Dump of file SATURN:[PCCOMMON.DUMP.DLL]DAD.TMP;1 on 18-APR-1990 10:40:03.08
File ID (551,9,0)    End of file block 267 / Allocated 268

Virtual block number 224 (000000E0), 512 (0200) bytes

00000000 00000000 00000000 00000000 00000000 00000000 00000000 00000000 ................................ 000000
00000000 00000000 00000000 00000000 00000000 00000000 00000000 00000000 ................................ 000020
00000000 00000000 00000000 00000000 00000000 00000000 00000000 00000000 ................................ 000040
00000000 00000000 00000000 00000000 00000000 00000000 00000000 00000000 ................................ 000060
00000000 00000000 00000000 00000000 00000000 00000000 00000000 00000000 ................................ 000080
00000000 00000000 00000000 00000000 00000000 00000000 00000000 00000000 ................................ 0000A0
00000000 00000000 00000000 00000000 00000000 00000000 00000000 00000000 ................................ 0000C0
00000000 00000000 00000000 00000000 00000000 00000000 00000000 00000000 ................................ 0000E0
00000000 00000000 00000000 00000000 00000000 00000000 00000000 00000000 ................................ 000100
00000000 00000000 00000000 00000000 00000000 00000000 00000000 00000000 ................................ 000120
00000000 00000000 00000000 00000000 00000000 00000000 00000000 00000000 ................................ 000140
00000000 00000000 00000000 00000000 00000000 00000000 00000000 00000000 ................................ 000160
00000000 00000000 00000000 00000000 00000000 00000000 00000000 00000000 ................................ 000180
00000000 00000000 00000000 00000000 00000000 00000000 00000000 00000000 ................................ 0001A0
00000000 00000000 00000000 00000000 00000000 00000000 00000000 00000000 ................................ 0001C0
00000000 00000000 00000000 00000000 00000000 00000000 00000000 00000000 ................................ 0001E0

Dump of file SATURN:[PCCOMMON.DUMP.DLL]DAD.TMP;1 on 18-APR-1990 10:40:03.08
File ID (551,9,0)    End of file block 267 / Allocated 268

Virtual block number 225 (000000E1), 512 (0200) bytes

00000000 00000000 00000000 00000000 00000000 00000000 00000000 00000000 ................................ 000000
00000000 00000000 00000000 00000000 00000000 00000000 00000000 00000000 ................................ 000020
00000000 00000000 00000000 00000000 00000000 00000000 00000000 00000000 ................................ 000040
00000000 00000000 00000000 00000000 00000000 00000000 00000000 00000000 ................................ 000060
00000000 00000000 00000000 00000000 00000000 00000000 00000000 00000000 ................................ 000080
00000000 00000000 00000000 00000000 00000000 00000000 00000000 00000000 ................................ 0000A0
00000000 00000000 00000000 00000000 00000000 00000000 00000000 00000000 ................................ 0000C0
00000000 00000000 00000000 00000000 00000000 00000000 00000000 00000000 ................................ 0000E0
00000000 00000000 00000000 00000000 00000000 00000000 00000000 00000000 ................................ 000100
00000000 00000000 00000000 00000000 00000000 00000000 00000000 00000000 ................................ 000120
00000000 00000000 00000000 00000000 00000000 00000000 00000000 00000000 ................................ 000140
00000000 00000000 00000000 00000000 00000000 00000000 00000000 00000000 ................................ 000160
00000000 00000000 00000000 00000000 00000000 00000000 00000000 00000000 ................................ 000180
00000000 00000000 00000000 00000000 00000000 00000000 00000000 00000000 ................................ 0001A0
00000000 00000000 00000000 00000000 00000000 00000000 00000000 00000000 ................................ 0001C0
00000000 00000000 00000000 00000000 00000000 00000000 00000000 00000000 ................................ 0001E0
```

```
Dump of file SATURN:[PCCOMMON.DUMP.DLL]DAD.TMP;1 on 18-APR-1990 10:40:03.08
File ID (551,9,0)   End of file block 267 / Allocated 268

Virtual block number 226 (000000E2), 512 (0200) bytes

00000000 00000000 00000000 00000000 00000000 00000000 00000000 00000000 ................................ 000000
00000000 00000000 00000000 00000000 00000000 00000000 00000000 00000000 ................................ 000020
00000000 00000000 00000000 00000000 00000000 00000000 00000000 00000000 ................................ 000040
00000000 00000000 00000000 00000000 00000000 00000000 00000000 00000000 ................................ 000060
00000000 00000000 00000000 00000000 00000000 00000000 00000000 00000000 ................................ 000080
00000000 00000000 00000000 00000000 00000000 00000000 00000000 00000000 ................................ 0000A0
00000000 00000000 00000000 00000000 00000000 00000000 00000000 00000000 ................................ 0000C0
00000000 00000000 00000000 00000000 00000000 00000000 00000000 00000000 ................................ 0000E0
00000000 00000000 00000000 00000000 00000000 00000000 00000000 00000000 ................................ 000100
00000000 00000000 00000000 00000000 00000000 00000000 00000000 00000000 ................................ 000120
00000000 00000000 00000000 00000000 00000000 00000000 00000000 00000000 ................................ 000140
00000000 00000000 00000000 00000000 00000000 00000000 00000000 00000000 ................................ 000160
00000000 00000000 00000000 00000000 00000000 00000000 00000000 00000000 ................................ 000180
00000000 00000000 00000000 00000000 00000000 00000000 00000000 00000000 ................................ 0001A0
00000000 00000000 00000000 00000000 00000000 00000000 00000000 00000000 ................................ 0001C0
00000000 00000000 00000000 00000000 00000000 00000000 00000000 00000000 ................................ 0001E0

Dump of file SATURN:[PCCOMMON.DUMP.DLL]DAD.TMP;1 on 18-APR-1990 10:40:03.08
File ID (551,9,0)   End of file block 267 / Allocated 268

Virtual block number 227 (000000E3), 512 (0200) bytes

00000000 00000000 00000000 00000000 00000000 00000000 00000000 00000000 ................................ 000000
00000000 00000000 00000000 00000000 00000000 00000000 00000000 00000000 ................................ 000020
00000000 00000000 00000000 00000000 00000000 00000000 00000000 00000000 ................................ 000040
00000000 00000000 00000000 00000000 00000000 00000000 00000000 00000000 ................................ 000060
00000000 00000000 00000000 00000000 00000000 00000000 00000000 00000000 ................................ 000080
00000000 00000000 00000000 00000000 00000000 00000000 00000000 00000000 ................................ 0000A0
00000000 00000000 00000000 00000000 00000000 00000000 00000000 00000000 ................................ 0000C0
00000000 00000000 00000000 00000000 00000000 00000000 00000000 00000000 ................................ 0000E0
00000000 00000000 00000000 00000000 00000000 00000000 00000000 00000000 ................................ 000100
00000000 00000000 00000000 00000000 00000000 00000000 00000000 00000000 ................................ 000120
00000000 00000000 00000000 00000000 00000000 00000000 00000000 00000000 ................................ 000140
00000000 00000000 00000000 00000000 00000000 00000000 00000000 00000000 ................................ 000160
00000000 00000000 00000000 00000000 00000000 00000000 00000000 00000000 ................................ 000180
00000000 00000000 00000000 00000000 00000000 00000000 00000000 00000000 ................................ 0001A0
00000000 00000000 00000000 00000000 00000000 00000000 00000000 00000000 ................................ 0001C0
00000000 00000000 00000000 00000000 00000000 00000000 00000000 00000000 ................................ 0001E0

Dump of file SATURN:[PCCOMMON.DUMP.DLL]DAD.TMP;1 on 18-APR-1990 10:40:03.08
File ID (551,9,0)   End of file block 267 / Allocated 268

Virtual block number 228 (000000E4), 512 (0200) bytes

00000000 00000000 00000000 00000000 00000000 00000000 00000000 00000000 ................................ 000000
00000000 00000000 00000000 00000000 00000000 00000000 00000000 00000000 ................................ 000020
00000000 00000000 00000000 00000000 00000000 00000000 00000000 00000000 ................................ 000040
00000000 00000000 00000000 00000000 00000000 00000000 00000000 00000000 ................................ 000060
00000000 00000000 00000000 00000000 00000000 00000000 00000000 00000000 ................................ 000080
00000000 00000000 00000000 00000000 00000000 00000000 00000000 00000000 ................................ 0000A0
00000000 00000000 00000000 00000000 00000000 00000000 00000000 00000000 ................................ 0000C0
00000000 00000000 00000000 00000000 00000000 00000000 00000000 00000000 ................................ 0000E0
00000000 00000000 00000000 00000000 00000000 00000000 00000000 00000000 ................................ 000100
00000000 00000000 00000000 00000000 00000000 00000000 00000000 00000000 ................................ 000120
00000000 00000000 00000000 00000000 00000000 00000000 00000000 00000000 ................................ 000140
00000000 00000000 00000000 00000000 00000000 00000000 00000000 00000000 ................................ 000160
00000000 00000000 00000000 00000000 00000000 00000000 00000000 00000000 ................................ 000180
00000000 00000000 00000000 00000000 00000000 00000000 00000000 00000000 ................................ 0001A0
00000000 00000000 00000000 00000000 00000000 00000000 00000000 00000000 ................................ 0001C0
00000000 00000000 00000000 00000000 00000000 00000000 00000000 00000000 ................................ 0001E0
```

```
Dump of file SATURN:[PCCOMMON.DUMP.DLL]DAD.TMP;1 on 18-APR-1990 10:40:03.08
File ID (551,9,0)   End of file block 267 / Allocated 268

Virtual block number 229 (000000E5), 512 (0200) bytes

00000000 00000000 00000000 00000000 00000000 00000000 00000000 00000000 ................................ 000000
00000000 00000000 00000000 00000000 00000000 00000000 00000000 00000000 ................................ 000020
00000000 00000000 00000000 00000000 00000000 00000000 00000000 00000000 ................................ 000040
00000000 00000000 00000000 00000000 00000000 00000000 00000000 00000000 ................................ 000060
00000000 00000000 00000000 00000000 00000000 00000000 00000000 00000000 ................................ 000080
00000000 00000000 00000000 00000000 00000000 00000000 00000000 00000000 ................................ 0000A0
00000000 00000200 00010000 00000000 00000000 00000000 00000000 00000000 ................................ 0000C0
00000000 00000000 00000000 00000000 00000000 00000000 00000000 00000000 ................................ 0000E0
00000000 00000000 00000000 00000000 00000000 00000000 00000000 00000000 ................................ 000100
00000000 00000000 00000000 00000000 00000000 00000000 00000000 00000000 ................................ 000120
00000000 00000000 00000000 00000000 00000000 00000000 00000000 00000000 ................................ 000140
00000000 00000000 00000000 00000000 00000000 00000000 00000000 00000000 ................................ 000160
00000000 00000000 00000000 00000000 00000000 00000000 00000000 00000000 ................................ 000180
00000000 00000000 00000000 00000000 00000000 00000000 00000000 00000000 ................................ 0001A0
00000000 00000000 00000000 00000000 00000000 00000000 00000000 00000000 ................................ 0001C0
00000000 00000000 00000000 00000000 00000000 00000000 00000000 00000000 ................................ 0001E0

Dump of file SATURN:[PCCOMMON.DUMP.DLL]DAD.TMP;1 on 18-APR-1990 10:40:03.08
File ID (551,9,0)   End of file block 267 / Allocated 268

Virtual block number 230 (000000E6), 512 (0200) bytes

00000000 00000000 00000000 00000000 00000000 00000000 00000000 00000000 ................................ 000000
00000000 00000000 00000000 00000000 00000000 00000000 00000000 00000000 ................................ 000020
00000000 00000000 00000000 00000000 00000000 00000000 00000000 00000000 ................................ 000040
00000000 00000000 00000000 00000000 00000000 00000000 00000000 00000000 ................................ 000060
00000000 00000000 00000000 00000000 00000000 00000000 00000000 00000000 ................................ 000080
00000000 00000000 00000000 00000000 00000000 00000000 00000000 00000000 ................................ 0000A0
00000000 00000000 00000000 00000000 00000000 00000000 00000000 00000000 ................................ 0000C0
00000000 00000000 00000000 00000000 00000000 00000000 00000000 00000000 ................................ 0000E0
00000000 00000000 00000000 00000000 00000000 00000000 00000000 00000000 ................................ 000100
00000000 00000000 00000000 00000000 00000000 00000000 00000000 00000000 ................................ 000120
00000000 00000000 00000000 00000000 00000000 00000000 00000000 00000000 ................................ 000140
00000000 00000000 00000000 00000000 00000000 00000000 00000000 00000000 ................................ 000160
00000000 00000000 00000000 00000000 00000000 00000000 00000000 00000000 ................................ 000180
00000000 00000000 00000000 00000000 00000000 00000000 00000000 00000000 ................................ 0001A0
00000000 00000000 00000000 00000000 00000000 00000000 00000000 00000000 ................................ 0001C0
00000000 00000000 00000000 00000000 00000000 00000000 00000000 00000000 ................................ 0001E0

Dump of file SATURN:[PCCOMMON.DUMP.DLL]DAD.TMP;1 on 18-APR-1990 10:40:03.08
File ID (551,9,0)   End of file block 267 / Allocated 268

Virtual block number 231 (000000E7), 512 (0200) bytes

00000000 00000000 00000000 00000000 00000000 00000000 00000000 00000000 ................................ 000000
00000000 00000000 00000000 00000000 00000000 00000000 00000000 00000000 ................................ 000020
00000000 00000000 00000000 00000000 00000000 00000000 00000000 00000000 ................................ 000040
00000000 00000000 00000000 00000000 00000000 00000000 00000000 00000000 ................................ 000060
00000000 00000000 00000000 00000000 00000000 00000000 00000000 00000000 ................................ 000080
00000000 00000000 00000000 00000000 00000000 00000000 00000000 00000000 ................................ 0000A0
00000000 00000000 00000000 00000000 00000000 00000000 00000000 00000000 ................................ 0000C0
00000000 00000000 00000000 00000000 00000000 00000000 00000000 00000000 ................................ 0000E0
00000000 00000000 00000000 00000000 00000000 00000000 00000000 00000000 ................................ 000100
00000000 00000000 00000000 00000000 00000000 00000000 00000000 00000000 ................................ 000120
00000000 00000000 00000000 00000000 00000000 00000000 00000000 00000000 ................................ 000140
00000000 00000000 00000000 00000000 00000000 00000000 00000000 00000000 ................................ 000160
00000000 00000000 00000000 00000000 00000000 00000000 00000000 00000000 ................................ 000180
00000000 00000000 00000000 00000000 00000000 00000000 00000000 00000000 ................................ 0001A0
00000000 00000000 00000000 00000000 00000000 00000000 00000000 00000000 ................................ 0001C0
00000000 00000000 00000000 00000000 00000000 00000000 00000000 00000000 ................................ 0001E0
```

```
Dump of file SATURN:[PCCOMMON.DUMP.DLL]DAD.TMP;1 on 18-APR-1990 10:40:03.08
File ID (551,9,0)   End of file block 267 / Allocated 268

Virtual block number 232 (000000E8), 512 (0200) bytes

00000000 00000000 00000000 00000000 00000000 00000000 00000000 00000000 ................................ 000000
00000000 00000000 00000000 00000000 00000000 00000000 00000000 00000000 ................................ 000020
00000000 00000000 00000000 00000000 00000000 00000000 00000000 00000000 ................................ 000040
00000000 00000000 00000000 00000000 00000000 00000000 00000000 00000000 ................................ 000060
00000000 00000000 00000000 00000000 00000000 00000000 00000000 00000000 ................................ 000080
00000000 00000000 00000000 00000000 00000000 00000000 00000000 00000000 ................................ 0000A0
00000000 00000000 00000000 0110112A 00000000 00000000 00000000 00000000 ...............*................ 0000C0
00000000 00000000 00000000 00000000 00000000 00008181 81010000 00010000 ................................ 0000E0
00000000 00000000 00000000 00000000 00000000 00000000 00000000 00000000 ................................ 000100
00000000 00000000 00000000 00000000 00000000 00000000 00000000 00000000 ................................ 000120
00000000 00000000 00000000 00000000 00000000 00000000 00000000 00000000 ................................ 000140
00000000 00000000 00000000 00000000 00000000 00000000 00000000 00000000 ................................ 000160
00000000 00000000 00000000 00000000 00000000 00000000 00000000 00000000 ................................ 000180
00000000 00000000 00000000 00000000 00000000 00000000 00000000 00000000 ................................ 0001A0
00000000 00000000 00000000 00000000 00000000 00000000 00000000 00000000 ................................ 0001C0
0A0A0A0A 0A0A0A0A 0A0A0A0A 0A0A0A0A 0A0A0A0A 0A0A0A0A 0A000000 00000000 ................................ 0001E0

Dump of file SATURN:[PCCOMMON.DUMP.DLL]DAD.TMP;1 on 18-APR-1990 10:40:03.08
File ID (551,9,0)   End of file block 267 / Allocated 268

Virtual block number 233 (000000E9), 512 (0200) bytes

0A0A0A0A 0A0A0A0A 0A0A0A0A 0A0A0A0A 0A0A0A0A 0A0A0A0A 0A0A0A0A 0A0A0A0A ................................ 000000
0A0A0A0A 0A0A0A0A 0A0A0A0A 0A0A0A0A 0A0A0A0A 0A0A0A0A 0A0A0A0A 0A0A0A0A ................................ 000020
0A0A0A0A 0A0A0A0A 0A0A0A0A 0A0A0A0A 0A0A0A0A 0A0A0A0A 0A0A0A0A 0A0A0A0A ................................ 000040
0A0A0A0A 0A0A0A0A 0A0A0A0A 0A0A0A0A 0A0A0A0A 0A0A0A0A 0A0A0A0A 0A0A0A0A ................................ 000060
0A0A0A0A 0A0A0A0A 0A0A0A0A 0A0A0A0A 0A0A0A0A 0A0A0A0A 0A0A0A0A 0A0A0A0A ................................ 000080
0A0A0A0A 0A0A0A0A 0A0A0A0A 0A0A0A0A 0A0A0A0A 0A0A0A0A 0A0A0A0A 0A0A0A0A ................................ 0000A0
0A0A0A0A 0A0A0A0A 0A0A0A0A 0A0A0A0A 0A0A0A0A 0A0A0A0A 0A0A0A0A 0A0A0A0A ................................ 0000C0
00000000 00000000 00000000 00000000 00000000 00000000 000A0A0A 0A0A0A0A ................................ 0000E0
05341616 00000000 00000000 00000000 00000000 20000000 00000000 00000000 ...............................4. 000100
2D0A0D30 30303652 00003E3E 4753404E 3C3CFFFF 19881986 19841982 1980FFFF ..............<<NMSG>>..R6000..- 000120
746E6920 200A0D33 30303652 0003000A 0D776F6C 66726576 6F206863 61747320  stack overflow.....R6003..- int 000140
6F6E202D 0A0D3830 30365200 08000A0D 30207962 20656469 76696420 72656765 eger divide by 0.....R6008..- no 000160
09000A0D 73746E65 6D756772 6120726F 66206563 61707320 6867756F 6E652074 t enough space for arguments.... 000180
6520726F 66206563 61707320 6867756F 6E652074 6F6E202D 0A0D3930 30365200 .R6009..- not enough space for e 0001A0
72726520 656D6974 2D6E7572 00FF000A 0000FC00 0A0D746E 656D6E6F 7269766E nvironment...*......run-time err 0001C0
6F6E2074 6E696F70 20676E69 74616F6C 66202D0A 0D323030 36520002 0020726F or ...R6002..- floating point no 0001E0

Dump of file SATURN:[PCCOMMON.DUMP.DLL]DAD.TMP;1 on 18-APR-1990 10:40:03.08
File ID (551,9,0)   End of file block 267 / Allocated 268

Virtual block number 234 (000000EA), 512 (0200) bytes

0000000F 05440002 0000000E 197E0002 0003FFFF FF000A0D 64656461 6F6C2074 t loaded.........-.......D..... 000000
49430000 00000000 00780000 00284142 00000000 00000000 00000010 17320002 ..2.............BA(...x.......CI 000020
4943FFFF FF000000 00010001 00800040 0000000C 00000438 00200020 0000001A .... . .8.......a.............CI 000040
00FFFFFF FF000000 00040001 00400040 0000000C 00000838 00200020 0000001A .... . .8.......a.a............. 000060
80008000 80008080 00000000 80404040 FFFF0000 FFFF00FF 00FF00FF FF000000 ................aaa............. 000080
00100010 0000001A 494301E0 02800000 00F00000 00284142 C0C0C078 34000080 ...4xàààBA(...Þ.....À.CI........ 0000A0
00100010 0000001A 4943FFFF FF000000 00010001 00400020 0000000C 00001038 8....... .a...........CI........ 0000C0
00FF00FF FF000000 00FFFFFF FF000000 00040001 00200020 0000000C 00001138 8....... . ...................... 0000E0
C0C0C078 34000080 80008000 80008080 00000000 80404040 FFFF0000 FFFF00FF ........aaa.................4xààà 000100
0000000C 00001338 00200020 0000001A 49430300 04000000 00000000 00284142 BA(...........CI.... . .8....... 000120
0000000C 00001738 00200020 0000001A 4943FFFF FF000000 00010001 00800040 a.............CI.... . .8....... 000140
FF000000 4080FFFF FFCECECE 99999966 66663131 31000000 00080001 00400040 a.a........111fff...ööö....a.... 000160
FFFFFFFF FFFFFFFF 0000FFFF FF00FF8D F3E5E4FF FFD68BAF D4CF8CE8 BBFFFFBF «..ÈÒ¥üåÉ¡æ..ôÌµ§............... 000180
FFFFFFFF FFFFFFFF FFFFFFFF FFFFFFFF FFFFFFFF FFFFFFFF FFFFFFFF FFFFFFFF ................................ 0001A0
FFFFFFFF FFFFFFFF FFFFFFFF FFFFFFFF FFFFFFFF FFFFFFFF FFFFFFFF FFFFFFFF ................................ 0001C0
FFFFFFFF FFFFFFFF FFFFFFFF FFFFFFFF FFFFFFFF FFFFFFFF FFFFFFFF FFFFFFFF ................................ 0001E0
```

```
Dump of file SATURN:[PCCOMMON.DUMP.DLL]DAD.TMP;1 on 18-APR-1990 10:40:03.08
File ID (551,9,0)   End of file block 267 / Allocated 268

Virtual block number 235 (000000EB), 512 (0200) bytes

FFFFFFFF FFFFFFFF FFFFFFFF FFFFFFFF FFFFFFFF FFFFFFFF FFFFFFFF FFFFFFFF ................................ 000000
FFFFFFFF FFFFFFFF FFFFFFFF FFFFFFFF FFFFFFFF FFFFFFFF FFFFFFFF FFFFFFFF ................................ 000020
FFFFFFFF FFFFF.FF FFFFFFFF FFFFFFFF FFFFFFFF FFFFFFFF FFFFFFFF FFFFFFFF ................................ 000040
FFFFFFFF FFFFFFFF FFFFFFFF FFFFFFFF FFFFFFFF FFFFFFFF FFFFFFFF FFFFFFFF ................................ 000060
FFFFFFFF FFFFFFFF FFFFFFFF FFFFFFFF FFFFFFFF FFFFFFFF FFFFFFFF FFFFFFFF ................................ 000080
FFFFFFFF FFFFFFFF FFFFFFFF FFFFFFFF FFFFFFFF FFFFFFFF FFFFFFFF FFFFFFFF ................................ 0000A0
FFFFFFFF FFFFFFFF FFFFFFFF FFFFFFFF FFFFFFFF FFFFFFFF FFFFFFFF FFFFFFFF ................................ 0000C0
FFFFFFFF FFFFFFFF FFFFFFFF FFFFFFFF FFFFFFFF FFFFFFFF FFFFFFFF FFFFFFFF ................................ 0000E0
FFFFFFFF FFFFFFFF FFFFFFFF FFFFFFFF FFFFFFFF FFFFFFFF FFFFFFFF FFFFFFFF ................................ 000100
FFFFFFFF FFFFFFFF FFFFFFFF FFFFFFFF FFFFFFFF FFFFFFFF FFFFFFFF FFFFFFFF ................................ 000120
FFFFFFFF FFFFFFFF FFFFFFFF FFFFFFFF FFFFFFFF FFFFFFFF FFFFFFFF FFFFFFFF ................................ 000140
FFFFFFFF FFFFFFFF FFFFFFFF FFFFFFFF FFFFFFFF FFFFFFFF FFFFFFFF FFFFFFFF ................................ 000160
FFFFFFFF FFFFFFFF FFFFFFFF FFFFFFFF FFFFFFFF FFFFFFFF FFFFFFFF FFFFFFFF ................................ 000180
FFFFFFFF FFFFFFFF FFFFFFFF FFFFFFFF FFFFFFFF FFFFFFFF FFFFFFFF FFFFFFFF ................................ 0001A0
FFFFFFFF FFFFFFFF FFFFFFFF FFFFFFFF FFFFFFFF FFFFFFFF FFFFFFFF FFFFFFFF ................................ 0001C0
FFFFFFFF FFFFFFFF FFFFFFFF FFFFFFFF FFFFFFFF FFFFFFFF FFFFFFFF FFFFFFFF ................................ 0001E0

Dump of file SATURN:[PCCOMMON.DUMP.DLL]DAD.TMP;1 on 18-APR-1990 10:40:03.08
File ID (551,9,0)   End of file block 267 / Allocated 268

Virtual block number 236 (000000EC), 512 (0200) bytes

FFFFFFFF FFFFFFFF FFFFFFFF FFFFFFFF FFFFFFFF FFFFFFFF FFFFFFFF FFFFFFFF ................................ 000000
FFFFFFFF FFFFFFFF FFFFFFFF FFFFFFFF FFFFFFFF FFFFFFFF FFFFFFFF FFFFFFFF ................................ 000020
FFFFFFFF FFFFFFFF FFFFFFFF FFFFFFFF FFFFFFFF FFFFFFFF FFFFFFFF FFFFFFFF ................................ 000040
00000000 00000000 00000000 00000000 00000000 00000000 FFFFFFFF FFFFFFFF ................................ 000060
00000000 00000000 00000000 00000000 00000000 00000000 00000000 00000000 ................................ 000080
00000000 00000000 00000000 00000000 00000000 00000000 00000000 00000000 ................................ 0000A0
00000000 00000000 00000000 00000000 00000000 00000000 00000000 00000000 ................................ 0000C0
00000000 00000000 00000000 00000000 00000000 00000000 00000000 00000000 ................................ 0000E0
00000000 00000000 00000000 00000000 00000000 00000000 00000000 00000000 ................................ 000100
00000000 00000000 00000000 00000000 00000000 00000000 00000000 00000000 ................................ 000120
00000000 00000000 00000000 00000000 00000000 00000000 00000000 00000000 ................................ 000140
00000000 00000000 00000000 00000000 00000000 00000000 00000000 00000000 ................................ 000160
00000000 00000000 00000000 00000000 00000000 00000000 00000000 00000000 ................................ 000180
00000000 00000000 00000000 00000000 00000000 00000000 00000000 00000000 ................................ 0001A0
00000000 00000000 00000000 00000000 00000000 00000000 00000000 00000000 ................................ 0001C0
00000000 00000000 00000000 00000000 00000000 00000000 00000000 00000000 ................................ 0001E0

Dump of file SATURN:[PCCOMMON.DUMP.DLL]DAD.TMP;1 on 18-APR-1990 10:40:03.08
File ID (551,9,0)   End of file block 267 / Allocated 268

Virtual block number 237 (000000ED), 512 (0200) bytes

00000000 00000000 00000000 00000000 00000000 00000000 00000000 00000000 ................................ 000000
00000000 00000000 00000000 00000000 00000000 00000000 00000000 00000000 ................................ 000020
00000000 00000000 00000000 00000000 00000000 00000000 00000000 00000000 ................................ 000040
FFFF0300 00C0FFFF FFFF0300 00F8FFFF FFFF0300 00F8FFFF 00000000 00000000 ..........½.......½.......â..... 000060
FFFF0300 00C0FFFF FFFF0300 00C0FFFF FFFF0300 00C0FFFF FFFF0300 00C0FFFF ..â.......â.......â.......â..... 000080
FFFF0300 00C0FFFF FFFF0300 00C0FFFF FFFF0300 00C0FFFF FFFF0300 00C0FFFF ..â.......â.......â.......â..... 0000A0
FFFF0300 00C0FFFF FFFF0300 00C0FFFF FFFF0300 00C0FFFF FFFF0300 00C0FFFF ..â.......â.......â.......â..... 0000C0
FFFF0F08 40C0FFFF FFFF0F00 00C0FFFF FFFF0300 00C0FFFF FFFF0300 00C0FFFF ..â.......â.......â.......â@.... 0000E0
FFFFFF0F C0FFFFFF FFFFFF0F C0FFFFFF FFFFFF0F C0FFFFFF FFFF0F08 40C0FFFF ..â@......â.......â.......â..... 000100
FFFFFFFF FCFFFFFF FFFFFFFF FCFFFFFF FFFFFF3F F0FFFFFF FFFFFF1F E0FFFFFF ...Â.......Þ?.......•.......•.... 000120
FFFFFFFF FCFFFFFF FFFFFFFF FCFFFFFF FFFFFFFF FCFFFFFF FFFFFFFF FCFFFFFF ...•.......•.......•.......•.... 000140
FFFFFF1F E0FFFFFF FFFFFF3F F0FFFFFF FFFFFFFF FCFFFFFF FFFFFFFF FCFFFFFF ...•.......•.......Þ?......Â.... 000160
FFFF0308 40C0FFFF FFFF0308 40F8FFFF FFFF0308 40F8FFFF FFFFFF0F C0FFFFFF ...â......½@......½@......â@.... 000180
FFFF0300 00C0FFFF FFFF0300 00C0FFFF FFFF0300 00C0FFFF FFFF0308 40C0FFFF ..â@......â.......â.......â..... 0001A0
FFFF0300 00C0FFFF FFFF0300 00C0FFFF FFFF0300 00C0FFFF FFFF0300 00C0FFFF ..â.......â.......â.......â..... 0001C0
FFFF0300 00C0FFFF FFFF0300 00C0FFFF FFFF0300 00C0FFFF FFFF0300 00C0FFFF ..â.......â.......â.......â..... 0001E0
```

```
Dump of file SATURN:[PCCOMMON.DUMP.DLL]DAD.TMP;1 on 18-APR-1990 10:40:03.08
File ID (551,9,0)   End of file block 267 / Allocated 268

Virtual block number 238 (000000EE), 512 (0200) bytes

 FFFF0F00 00C0FFFF FFFF0F00 00C0FFFF FFFF0300 00C0FFFF FFFF0300 00C0FFFF ..à.......à.......à.......à..... 000000
 FFFFFFFF FFFFFFFF FFFFFFFF FFFFFFFF FFFFFFFF FFFFFFFF FFFF0F00 00C0FFFF ..à............................. 000020
 FFFFFFFF FFFFFFFF FFFFFFFF FFFFFFFF FFFFFFFF FFFFFFFF FFFFFFFF FFFFFFFF ................................ 000040
 00111111 11111111 11111111 11010000 00000000 00000000 FFFFFFFF FFFFFFFF ................................ 000060
 00111111 1111111  11111111 11010000 00000000 00000000 00000000 00000000 ................................ 000080
 00111111 1111111, 11111111 11111100 00000000 00000000 00000000 00000000 ................................ 0000A0
 00111111 11111111 11111111 11111100 00000000 00000000 00000000 00000000 ................................ 0000C0
 00111155 55555555 55555555 55551100 00000000 00000000 00000000 00000000 ..................UUUUUUUUUUU... 0000E0
 00111155 55555555 55555555 55551100 00000000 00000000 00000000 00000000 ..................UUUUUUUUUUU... 000100
 00111155 55555555 55555555 55551100 00000000 00000000 00000000 00000000 ..................UUUUUUUUUUU... 000120
 00111155 55555555 55555555 55551100 00000000 00000000 00000000 00000000 ..................UUUUUUUUUUU... 000140
 00111155 55555555 55555555 55551100 00000000 00000000 00000000 00000000 ..................UUUUUUUUUUU... 000160
 00111155 55555555 55555555 55551100 00000000 00000000 00000000 00000000 ..................UUUUUUUUUUU... 000180
 00111155 55555555 55555555 55551100 00000000 00000000 00000000 00000000 ..................UUUUUUUUUUU... 0001A0
 00111155 55555555 55555555 55551100 00000000 00000000 00000000 00000000 ..................UUUUUUUUUUU... 0001C0
 00111155 55555555 55555555 55551100 00000000 00000000 00000000 00000000 ..................UUUUUUUUUUU... 0001E0

Dump of file SATURN:[PCCOMMON.DUMP.DLL]DAD.TMP;1 on 18-APR-1990 10:40:03.08
File ID (551,9,0)   End of file block 267 / Allocated 268

Virtual block numb·r 239 (000000EF), 512 (0200) bytes

 00111155 55555555 55555555 55551100 00000000 00000000 00000000 00000000 ..................UUUUUUUUUUU... 000000
 00111155 55555555 55555555 55551100 00000000 00000000 00000000 00000000 ..................UUUUUUUUUUU... 000020
 00111155 55555512 11215555 55551100 00000000 00000000 00000000 00000000 ..................UUUU!..UUUU... 000040
 00111155 55551511 11115155 55551100 00000000 00000000 00000000 00000000 ..................UUUQ....UUU... 000060
 00001155 55551211 11112155 55551100 00000000 00000000 00000000 00000000 ..................UUU!....UUU... 000080
 00001111 11011111 11111110 11111100 00000000 00000000 00000000 00000000 ................................ 0000A0
 00001111 11011111 11111110 11111100 00000000 00000000 00000000 00000000 ................................ 0000C0
 00000000 00001111 11111100 00000000 00000000 00000000 00000000 00000000 ................................ 0000E0
 00000000 00001111 11111100 00000000 00000000 00000000 00000000 00000000 ................................ 000100
 00000000 00001211 11112100 00000000 00000000 00000000 00000000 00000000 ......................!......... 000120
 00000000 00001011 11110100 00000000 00000000 00000000 00000000 00000000 ................................ 000140
 00000000 00000012 11210000 00000000 00000000 00000000 00000000 00000000 .......................!........ 000160
 00000000 00000000 22000000 00000000 00000000 00000000 00000000 00000000 ........................"....... 000180
 00000000 00000000 22000000 00000000 00000000 00000000 00000000 00000000 ........................"....... 0001A0
 00000000 00000000 22000000 00000000 00000000 00000000 00000000 00000000 ........................"....... 0001C0
 00000000 00000000 22000000 00000000 00000000 00000000 00000000 00000000 ........................"....... 0001E0

Dump of file SATURN:[PCCOMMON.DUMP.DLL]DAD.TMP;1 on 18-APR-1990 10:40:03.08
File ID (551,9,0)   End of file block 267 / Allocated 268

Virtual block number 240 (000000F0), 512 (0200) bytes

 00000000 00000000 22000000 00000000 00000000 00000000 00000000 00000000 ........................"....... 000000
 00000000 00000000 22000000 00000000 00000000 00000000 00000000 00000000 ........................"....... 000020
 00000000 00000000 22000000 00000000 00000000 00000000 00000000 00000000 ........................"....... 000040
 00000000 00000000 22000000 00000000 00000000 00000000 00000000 00000000 ........................"....... 000060
 00000000 00000012 11210000 00000000 00000000 00000000 00000000 00000000 .......................!........ 000080
 00000000 00001011 11110100 00000000 00000000 00000000 00000000 00000000 ................................ 0000A0
 00000000 00001231 55.32100 00000000 00000000 00000000 00000000 00000000 ......................!.U1....... 0000C0
 00111111 11011153 55351110 11010000 00000000 00000000 00000000 0u.^0000 .......................5US....... 0000E0
 00111111 11011155 55551110 11010000 00000000 00000000 00000000 000.'000 .......................UUU....... 000100
 00111111 11011155 55551110 11111100 00000000 00000000 00000000 0000L300 .......................UUU....... 000120
 00111111 11011153 55351110 11111100 00000000 00000000 00000000 00000000 .......................5US....... 000140
 00111155 55551231 55132155 55551100 00000000 00000000 00000000 00000000 ..................UUU!.U1.UUU... 000160
 00111155 55551511 11115155 55551100 00000000 00000000 00000000 00000000 ..................UUUQ....UUU... 000180
 00111155 55555512 11215555 55551100 00000000 00000000 00000000 00000000 ..................UUUU!..UUUU... 0001A0
 00111155 55555555 55555555 55551100 00000000 00000000 00000000 00000000 ..................UUUUUUUUUUU... 0001C0
 00111155 55555555 55555555 55551100 00000000 00000000 00000000 00000000 ..................UUUUUUUUUUU... 0001E0
```

```
Dump of file SATURN:[PCCOMMON.DUMP.DLL]DAD.TMP;1 on 18-APR-1990 10:40:03.08
File ID (551,9,0)   End of file block 267 / Allocated 268

Virtual block number 241 (000000F1), 512 (0200) bytes

 00111155 55555555 55555555 55551100 00000000 00000000 00000000 00000000 ..................UUUUUUUUUUU... 000000
 00111155 55555555 55555555 55551100 00000000 00000000 00000000 00000000 ..................UUUUUUUUUUU... 000020
 00111155 55555555 55555555 55551100 00000000 00000000 00000000 00000000 ..................UUUUUUUUUUU... 000040
 00111155 55555555 55555555 55551100 00000000 00000000 00000000 00000000 ..................UUUUUUUUUUU... 000060
 00111155 55555555 55555555 55551100 00000000 00000000 00000000 00000000 ..................UUUUUUUUUUU... 000080
 00111155 55555555 55555555 55551100 00000000 00000000 00000000 00000000 ..................UUUUUUUUUUU... 0000A0
 00111155 55555555 55555555 55551100 00000000 00000000 00000000 00000000 ..................UUUUUUUUUUU... 0000C0
 00111155 55555555 55555555 55551100 00000000 00000000 00000000 00000000 ..................UUUUUUUUUUU... 0000E0
 00001155 55555555 55555555 55551100 00000000 00000000 00000000 00000000 ..................UUUUUUUUUUU... 000100
 00001111 11111111 11111111 11111100 00000000 00000000 00000000 00000000 ................................ 000120
 00001111 11111111 11111111 11111100 00000000 00000000 00000000 00000000 ................................ 000140
 00000000 00000000 00000000 00000000 00000000 00000000 00000000 00000000 ................................ 000160
 00000000 00000000 00000000 00000000 00000000 00000000 00000000 00000000 ................................ 000180
 00000000 00000000 00000000 00000000 00000000 00000000 00000000 00000000 ................................ 0001A0
 00000000 00000000 00000000 00000000 00000000 00000000 00000000 00000000 ................................ 0001C0
 00000000 00000000 00000000 00000000 00000000 00000000 00000000 00000000 ................................ 0001E0

Dump of file SATURN:[PCCOMMON.DUMP.DLL]DAD.TMP;1 on 18-APR-1990 10:40:03.08
File ID (551,9,0)   End of file block 267 / Allocated 268

Virtual block number 242 (000000F2), 512 (0200) bytes

 00000000 00000000 00000000 00000000 00000000 00000000 00000000 00000000 ................................ 000000
 00000000 00000000 00000000 00000000 00000000 00000000 00000000 00000000 ................................ 000020
 00000000 00000000 00000000 00000000 00000000 00000000 00000000 00000000 ................................ 000040
 00000000 00000000 00000000 00000000 00000000 00000000 00000000 00000000 ................................ 000060
 00000000 00000000 00000000 00000000 00000000 00000000 00000000 00000000 ................................ 000080
 00000000 00000000 00000000 00000000 00000000 00000000 00000000 00000000 ................................ 0000A0
 00000000 00000000 00000000 00000000 00000000 00000000 00000000 00000000 ................................ 0000C0
 FF0180FF FF0180FF FF0180FF FF0180FF FF0180FF FF01C0FF 00000000 00000000 .........â...................... 0000E0
 FFFFFEFF FF7FFCFF FF3FF8FF FF3FF8FF FF0380FF FF0180FF FF0180FF FF0180FF .................½?..½?..=...±.. 000100
 FF0180FF FF0180FF FF0180FF FF01C0FF FF3FF8FF FF7FFCFF FFFFFEFF FFFFFEFF .±...±...=...½?..â.............. 000120
 FFFFFFFF FFFFFFFF FF0380FF FF0180FF FF0180FF FF0180FF FF0180FF FF0180FF ................................ 000140
 88888808 00000000 00000000 80888888 88888800 00000000 FFFFFFFF FFFFFFFF ................................ 000160
 11111108 00000000 00000000 80181111 11111108 00000000 00000000 80888888 ................................ 000180
 11111108 00000000 00000000 80181111 11111108 00000000 00000000 80181111 ................................ 0001A0
 11111108 00000000 0^000000 80181111 11111108 00000000 00000000 80181111 ................................ 0001C0
 88F88808 00000000 00000000 80181181 88111108 00000000 00000000 80181111 ..............................½. 0001E0

Dump of file SATURN:[PCCOMMON.DUMP.DLL]DAD.TMP;1 on 18-APR-1990 10:.1:03.08
File ID (551,9,0)   End of file block 267 / Allocated 268

Virtual block number 243 (000000F3), 512 (0200) bytes

 88080000 00000000 00000000 00000088 88080000 00000000 00000000 0088F888 .½.............................. 000000
 08000000 00000000 00000000 00000080 88000000 00000000 00000000 00000088 ................................ 000020
 08000000 00000000 00000000 00000000 08000000 00000000 00000000 00000000 ................................ 000040
 11080000 00000000 00000000 00000080 88000000 00000000 00000000 00000000 ................................ 000060
 11888808 00000000 00000000 80888818 11888800 00000000 00000000 00000018 ................................ 000080
 11111108 00000000 00000000 80181181 88111108 00000000 00000000 80888818 ................................ 0000A0
 11111108 00000000 00000000 80181111 11111108 00000000 00000000 80181111 ................................ 0000C0
 11111108 00000000 00000000 80181111 11111108 00000000 00000000 80181111 ................................ 0000E0
 88888808 00000000 00000000 80181111 11111108 00000000 00000000 80181111 ................................ 000100
 00000000 00000000 00000000 00000000 00000000 00000000 00000000 00888888 ................................ 000120
 00000000 00000000 00000000 00000000 00000000 00000000 00000000 00000000 ................................ 000140
 00000000 00000000 00000000 00000000 00000000 00000000 00000000 00000000 ................................ 000160
 00000000 00000000 00000000 00000000 00000000 00000000 00000000 00000000 ................................ 000180
 00000000 00000000 00000000 00000000 00000000 00000000 00000000 00000000 ................................ 0001A0
 00000000 00000000 00000000 00000000 00000000 00000000 00000000 00000000 ................................ 0001C0
 00000000 00000000 00000000 00000000 00000000 00000000 00000000 00000000 ................................ 0001E0
```

```
Dump of file SATURN:[PCCOMMON.DUMP.DLL]DAD.TMP;1 on 18-APR-1990 10:40:03.08
File ID (551,9,0)    End of file block 267 / Allocated 268

Virtual block number 244 (000000F4), 512 (0200) bytes

00000000 00000000 00000000 00000000 00000000 00000000 00000000 00000000 ................................ 000000
00000000 00000000 00000000 00000000 00000000 00000000 00000000 00000000 ................................ 000020
00000000 00000000 00000000 00000000 00000000 00000000 00000000 00000000 ................................ 000040
00000000 00000000 00000000 00000000 00000000 00000000 00000000 00000000 ................................ 000060
00000000 00000000 00000000 00000000 00000000 00000000 00000000 00000000 ................................ 000080
00000000 00000000 00000000 00000000 00000000 00000000 00000000 00000000 ................................ 0000A0
00000000 00000000 00000000 00000000 00000000 00000000 00000000 00000000 ................................ 0000C0
00000000 00000000 00000000 00000000 00000000 00000000 00000000 00000000 ................................ 0000E0
00000000 00000000 00000000 00000000 00000000 00000000 00000000 00000000 ................................ 000100
00000000 00000000 00000000 00000000 00000000 00000000 00000000 00000000 ................................ 000120
00000000 00000000 00000000 00000000 00000000 00000000 00000000 00000000 ................................ 000140
FFFF0300 00C0FFFF FFFF0300 00F8FFFF FFFF0300 00F8FFFF 00000000 00000000 ..........½.......½.......â..... 000160
FFFF0300 00C0FFFF FFFF0300 00C0FFFF FFFF0300 00C0FFFF FFFF0300 00C0FFFF ..â.......â.......â.......â..... 000180
FFFF0300 00C0FFFF FFFF0300 00C0FFFF FFFF0300 00C0FFFF FFFF0300 00C0FFFF ..â.......â.......â.......â..... 0001A0
FFFF0300 00C0FFFF FFFF0300 00C0FFFF FFFF0300 00C0FFFF FFFF0300 00C0FFFF ..â.......â.......â.......â..... 0001C0
FFFF0F00 00C0FFFF FFFF0F00 00C0FFFF FFFF0300 00C0FFFF FFFF0300 00C0FFFF ..â.......â.......â.......â..... 0001E0

Dump of file SATURN:[PCCOMMON.DUMP.DLL]DAD.TMP;1 on 18-APR-1990 10:40:03.08
File ID (551,9,0)    End of file block 267 / Allocated 268

Virtual block number 245 (000000F5), 512 (0200) bytes

FFFFFF0F C0FFFFFF FFFFFF0F C0FFFFFF FFFFFF0F C0FFFFFF FFFF0F00 00C0FFFF ..â.......â.......â.......â.... 000000
FFFFFFFF FCFFFFFF FFFFFFFF FCFFFFFF FFFFFF3F F0FFFFFF FFFFFF1F E0FFFFFF ...À.......þ?.......■.......■.... 000020
FFFFFFFF FCFFFFFF FFFFFFFF FCFFFFFF FFFFFFFF FCFFFFFF FFFFFFFF FCFFFFFF ...■.......■.......■.......■.... 000040
FFFFFF1F E0FFFFFF FFFFFF3F F0FFFFFF FFFFFFFF FCFFFFFF FFFFFFFF FCFFFFFF ...■.......■.......þ?......À.... 000060
FFFF0300 00C0FFFF FFFF0300 00F8FFFF FFFF0300 00F8FFFF FFFFFF0F C0FFFFFF ..â.......½.......½.......â..... 000080
FFFF0300 00C0FFFF FFFF0300 00C0FFFF FFFF0300 00C0FFFF FFFF0300 00C0FFFF ..â.......â.......â.......â..... 0000A0
FFFF0300 00C0FFFF FFFF0300 00C0FFFF FFFF0300 00C0FFFF FFFF0300 00C0FFFF ..â.......â.......â.......â..... 0000C0
FFFF0300 00C0FFFF FFFF0300 00C0FFFF FFFF0300 00C0FFFF FFFF0300 00C0FFFF ..â.......â.......â.......â..... 0000E0
FFFF0F00 00C0FFFF FFFF0F00 00C0FFFF FFFF0300 00C0FFFF FFFF0300 00C0FFFF ..â.......â.......â.......â..... 000100
FFFFFFFF FFFFFFFF FFFFFFFF FFFFFFFF FFFFFFFF FFFFFFFF FFFF0F00 00C0FFFF ..â............................. 000120
FFFFFFFF FFFFFFFF FFFFFFFF FFFFFFFF FFFFFFFF FFFFFFFF FFFFFFFF FFFFFFFF ................................ 000140
01010100 00000000 00000000 00000000 00000000 00000000 FFFFFFFF FFFFFFFF ................................ 000160
00000000 00000000 00000101 01010101 01010101 01010101 01010101 01010101 ................................ 000180
01010100 00000000 00000000 00000000 00000000 00000000 00000000 00000000 ................................ 0001A0
00000000 00000000 00000101 01010101 01010101 01010101 01010101 01010101 ................................ 0001C0
01010101 01010000 00000000 00000000 00000000 00000000 00000000 00000000 ................................ 0001E0

Dump of file SATURN:[PCCOMMON.DUMP.DLL]DAD.TMP;1 on 18-APR-1990 10:40:03.08
File ID (551,9,0)    End of file block 267 / Allocated 268

Virtual block number 246 (000000F6), 512 (0200) bytes

00000000 00000000 00000101 01010101 01010101 01010101 01010101 01010101 ................................ 000000
01010101 01010000 00000000 00000000 00000000 00000000 00000000 00000000 ................................ 000020
00000000 00000000 00000101 01010101 01010101 01010101 01010101 01010101 ................................ 000040
05050505 01010000 00000000 00000000 00000000 00000000 00000000 00000000 ................................ 000060
00000000 00000000 00000101 01010505 05050505 05050505 05050505 05050505 ................................ 000080
05050505 01010000 00000000 00000000 00000000 00000000 00000000 00000000 ................................ 0000A0
00000000 00000000 00000101 01010505 05050505 05050505 05050505 05050505 ................................ 0000C0
05050505 01010000 00000000 00000000 00000000 00000000 00000000 00000000 ................................ 0000E0
00000000 00000000 00000101 01010505 05050505 05050505 05050505 05050505 ................................ 000100
05050505 01010000 00000000 00000000 00000000 00000000 00000000 00000000 ................................ 000120
00000000 00000000 00000101 01010505 05050505 05050505 05050505 05050505 ................................ 000140
05050505 01010000 00000000 00000000 00000000 00000000 00000000 00000000 ................................ 000160
00000000 00000000 00000101 01010505 05050505 05050505 05050505 05050505 ................................ 000180
05050505 01010000 00000000 00000000 00000000 00000000 00000000 00000000 ................................ 0001A0
00000000 00000000 00000101 01010505 05050505 05050505 05050505 05050505 ................................ 0001C0
05050505 01010000 00000000 00000000 00000000 00000000 00000000 00000000 ................................ 0001E0
```

```
Dump of file SATURN:[PCCOMMON.DUMP.DLL]DAD.TMP;1 on 18-APR-1990 10:40:03.08
File ID (551,9,0)   End of file block 267 / Allocated 268

Virtual block number 247 (000000F7), 512 (0200) bytes

00000000 00000000 00000101 01010505 05050505 05050505 05050505 05050505 ................................ 000000
05050505 01010000 00000000 00000000 00000000 00000000 00000000 00000000 ................................ 000020
00000000 00000000 00000101 01010505 05050505 05050505 05050505 05050505 ................................ 000040
05050505 01010000 00000000 00000000 00000000 00000000 00000000 00000000 ................................ 000060
00000000 00000000 00000101 01010505 05050505 05050505 05050505 05050505 ................................ 000080
05050505 01010000 00000000 00000000 00000000 00000000 00000000 00000000 ................................ 0000A0
00000000 00000000 00000101 01010505 05050505 05050505 05050505 05050505 ................................ 0000C0
05050505 01010000 00000000 00000000 00000000 00000000 00000000 00000000 ................................ 0000E0
00000000 00000000 00000101 01010505 05050505 05050505 05050505 05050505 ................................ 000100
05050505 01010000 00000000 00000000 00000000 00000000 00000000 00000000 ................................ 000120
00000000 00000000 00000101 01010505 05050505 05050201 01010102 05050505 ................................ 000140
05050505 01010000 00000000 00000000 00000000 00000000 00000000 00000000 ................................ 000160
00000000 00000000 00000101 01010505 05050505 05010101 01010101 01050505 ................................ 000180
05050505 01010000 00000000 00000000 00000000 00000000 00000000 00000000 ................................ 0001A0
00000000 00000000 00000000 01010505 05050505 02010101 01010101 01020505 ................................ 0001C0
01010101 01010000 00000000 00000000 00000000 00000000 00000000 00000000 ................................ 0001E0

Dump of file SATURN:[PCCOMMON.DUMP.DLL]DAD.TMP;1 on 18-APR-1990 10:40:03.08
File ID (551,9,0)   End of file block 267 / Allocated 268

Virtual block number 248 (000000F8), 512 (0200) bytes

00000000 00000000 00000000 01010101 01010103 01010101 01010101 01010301 ................................ 000000
01010101 01010000 00000000 00000000 00000000 00000000 00000000 00000000 ................................ 000020
00000000 00000000 00000000 01010101 01010103 01010101 01010101 01010301 ................................ 000040
00000000 00000000 00000000 00000000 00000000 00000000 00000000 00000000 ................................ 000060
00000000 00000000 00000000 00000000 00000000 01010101 01010101 01010000 ................................ 000080
00000000 00000000 00000000 00000000 00000000 00000000 00000000 00000000 ................................ 0000A0
00000000 00000000 00000000 00000000 00000000 01010101 01010101 01010000 ................................ 0000C0
00000000 00000000 00000000 00000000 00000000 00000000 00000000 00000000 ................................ 0000E0
00000000 00000000 00000000 00000000 00000000 02010101 01010101 01020000 ................................ 000100
00000000 00000000 00000000 00000000 00000000 00000000 00000000 00000000 ................................ 000120
00000000 00000000 00000000 00000000 00000000 00010101 01010101 01000000 ................................ 000140
00000000 00000000 00000000 00000000 00000000 00000000 00000000 00000000 ................................ 000160
00000000 00000000 00000000 00000000 00000000 00000201 01010102 00000000 ................................ 000180
00000000 00000000 00000000 00000000 00000000 00000000 00000000 00000000 ................................ 0001A0
00000000 00000000 00000000 00000000 00000000 00000000 02020000 00000000 ................................ 0001C0
00000000 00000000 00000000 00000000 00000000 00000000 00000000 00000000 ................................ 0001E0

Dump of file SATURN:[PCCOMMON.DUMP.DLL]DAD.TMP;1 on 18-APR-1990 10:40:03.08
File ID (551,9,0)   End of file block 267 / Allocated 268

Virtual block number 249 (000000F9), 512 (0200) bytes

00000000 00000000 00000000 00000000 00000000 00000000 02020000 00000000 ................................ 000000
00000000 00000000 00000000 00000000 00000000 00000000 00000000 00000000 ................................ 000020
00000000 00000000 00000000 00000000 00000000 00000000 02020000 00000000 ................................ 000040
00000000 00000000 00000000 00000000 00000000 00000000 00000000 00000000 ................................ 000060
00000000 00000000 00000000 00000000 00000000 00000000 02020000 00000000 ................................ 000080
00000000 00000000 00000000 00000000 00000000 00000000 00000000 00000000 ................................ 0000A0
00000000 00000000 00000000 00000000 00000000 00000000 02020000 00000000 ................................ 0000C0
00000000 00000000 00000000 00000000 00000000 00000000 00000000 00000000 ................................ 0000E0
00000000 00000000 00000000 00000000 00000000 00000000 02020000 00000000 ................................ 000100
00000000 00000000 00000000 00000000 00000000 00000000 00000000 00000000 ................................ 000120
00000000 00000000 00000000 00000000 00000000 00000000 02020000 00000000 ................................ 000140
00000000 00000000 00000000 00000000 00000000 00000000 00000000 00000000 ................................ 000160
00000000 00000000 00000000 00000000 00000000 00000000 02020000 00000000 ................................ 000180
00000000 00000000 00000000 00000000 00000000 00000000 00000000 00000000 ................................ 0001A0
00000000 00000000 00000000 00000000 00000000 00000201 01010102 00000000 ................................ 0001C0
00000000 00000000 00000000 00000000 00000000 00000000 00000000 00000000 ................................ 0001E0
```

```
Dump of file SATURN:[PCCOMMON.DUMP.DLL]DAD.TMP;1 on 18-APR-1990 10:40:03.08
File ID (551,9,0)    End of file block 267 / Allocated 268

Virtual block number 250 (000000FA), 512 (0200) bytes

00000000 00000000 00000000 00000000 00000000 00010101 01010101 01000000 ................................ 000000
00000000 00000000 00000000 00000000 00000000 00000000 00000000 00000000 ................................ 000020
00000000 00000000 00000000 00000000 00000000 02010103 05050301 01020000 ................................ 000040
01010100 00000000 00000000 00000000 00000000 00000000 00000000 00000000 ................................ 000060
00000000 00000000 00000101 01010101 01010103 01010305 05050503 01010301 ................................ 000080
01010100 00000000 00000000 00000000 00000000 00000000 00000000 00000000 ................................ 0000A0
00000000 00000000 00000101 01010101 01010103 01010505 05050505 01010301 ................................ 0000C0
01010101 01010000 00000000 00000000 00000000 00000000 00000000 00000000 ................................ 0000E0
00000000 00000000 00000101 01010101 01010103 01010505 05050505 01010301 ................................ 000100
01010101 01010000 00000000 00000000 00000000 00000000 00000000 00000000 ................................ 000120
00000000 00000000 00000101 01010101 01010103 01010305 05050503 01010301 ................................ 000140
05050505 01010000 00000000 00000000 00000000 00000000 00000000 00000000 ................................ 000160
00000000 00000000 00000101 01010505 05050505 02010103 05050301 01020505 ................................ 000180
05050505 01010000 00000000 00000000 00000000 00000000 00000000 00000000 ................................ 0001A0
00000000 00000000 00000101 01010505 05050505 05010101 01010101 01050505 ................................ 0001C0
05050505 01010000 00000000 00000000 00000000 00000000 00000000 00000000 ................................ 0001E0

Dump of file SATURN:[PCCOMMON.DUMP.DLL]DAD.TMP;1 on 18-APR-1990 10:40:03.08
File ID (551,9,0)    End of file block 267 / Allocated 268

Virtual block number 251 (000000FB), 512 (0200) bytes

00000000 00000000 00000101 01010505 05050505 05050201 01010102 05050505 ................................ 000000
05050505 01010000 00000000 00000000 00000000 00000000 00000000 00000000 ................................ 000020
00000000 00000000 00000101 01010505 05050505 05050505 05050505 05050505 ................................ 000040
05050505 01010000 00000000 00000000 00000000 00000000 00000000 00000000 ................................ 000060
00000000 00000000 00000101 01010505 05050505 05050505 05050505 05050505 ................................ 000080
05050505 01010000 00000000 00000000 00000000 00000000 00000000 00000000 ................................ 0000A0
00000000 00000000 00000101 01010505 05050505 05050505 05050505 05050505 ................................ 0000C0
05050505 01010000 00000000 00000000 00000000 00000000 00000000 00000000 ................................ 0000E0
00000000 00000000 00000101 01010505 05050505 05050505 05050505 05050505 ................................ 000100
05050505 01010000 00000000 00000000 00000000 00000000 00000000 00000000 ................................ 000120
00000000 00000000 00000101 01010505 05050505 05050505 05050505 05050505 ................................ 000140
05050505 01010000 00000000 00000000 00000000 00000000 00000000 00000000 ................................ 000160
00000000 00000000 00000101 01010505 05050505 05050505 05050505 05050505 ................................ 000180
05050505 01010000 00000000 00000000 00000000 00000000 00000000 00000000 ................................ 0001A0
00000000 00000000 00000101 01010505 05050505 05050505 05050505 05050505 ................................ 0001C0
05050505 01010000 00000000 00000000 00000000 00000000 00000000 00000000 ................................ 0001E0

Dump of file SATURN:[PCCOMMON.DUMP.DLL]DAD.TMP;1 on 18-APR-1990 10:40:03.08
File ID (551,9,0)    End of file block 267 / Allocated 268

Virtual block number 252 (000000FC), 512 (0200) bytes

00000000 00000000 00000101 01010505 05050505 05050505 05050505 05050505 ................................ 000000
05050505 01010000 00000000 00000000 00000000 00000000 00000000 00000000 ................................ 000020
00000000 00000000 00000101 01010505 05050505 05050505 05050505 05050505 ................................ 000040
05050505 01010000 00000000 00000000 00000000 00000000 00000000 00000000 ................................ 000060
00000000 00000000 00000101 01010505 05050505 05050505 05050505 05050505 ................................ 000080
05050505 01010000 00000000 00000000 00000000 00000000 00000000 00000000 ................................ 0000A0
00000000 00000000 00000000 01010505 05050505 05050505 05050505 05050505 ................................ 0000C0
01010101 01010000 00000000 00000000 00000000 00000000 00000000 00000000 ................................ 0000E0
00000000 00000000 00000000 01010101 01010101 01010101 01010101 01010101 ................................ 000100
01010101 01010000 00000000 00000000 00000000 00000000 00000000 00000000 ................................ 000120
00000000 00000000 00000000 01010101 01010101 01010101 01010101 01010101 ................................ 000140
00000000 00000000 00000000 00000000 00000000 00000000 00000000 00000000 ................................ 000160
00000000 00000000 00000000 00000000 00000000 00000000 00000000 00000000 ................................ 000180
00000000 00000000 00000000 00000000 00000000 00000000 00000000 00000000 ................................ 0001A0
00000000 00000000 00000000 00000000 00000000 00000000 00000000 00000000 ................................ 0001C0
00000000 00000000 00000000 00000000 00000000 00000000 00000000 00000000 ................................ 0001E0
```

```
Dump of file SATURN:[PCCOMMON.DUMP.DLL]DAD.TMP;1 on 18-APR-1990 10:40:03.08
File ID (551,9,0)    End of file block 267 / Allocated 268

Virtual block number 253 (000000FD), 512 (0200) bytes

00000000 00000000 00000000 00000000 00000000 00000000 00000000 00000000 ................................ 000000
00000000 00000000 00000000 00000000 00000000 00000000 00000000 00000000 ................................ 000020
00000000 00000000 00000000 00000000 00000000 00000000 00000000 00000000 ................................ 000040
00000000 00000000 00000000 00000000 00000000 00000000 00000000 00000000 ................................ 000060
00000000 00000000 00000000 00000000 00000000 00000000 00000000 00000000 ................................ 000080
00000000 00000000 00000000 00000000 00000000 00000000 00000000 00000000 ................................ 0000A0
00000000 00000000 00000000 00000000 00000000 00000000 00000000 00000000 ................................ 0000C0
00000000 0000C‥0 00000000 00000000 00000000 00000000 00000000 00000000 ................................ 0000E0
00000000 0000G‥0 00000000 00000000 00000000 00000000 00000000 00000000 ................................ 000100
00000000 00000000 00000000 00000000 00000000 00000000 00000000 00000000 ................................ 000120
00000000 00000000 00000000 00000000 00000000 00000000 00000000 00000000 ................................ 000140
000C0000 00200010 00100000 01204349 00000000 00000000 00000000 00000000 ................IC ....... ..... 000160
00000000 00000000 00000000 00000000 FFFFFF00 00000001 00010040 00200000 .. .@............................ 000180
00000000 00000000 00000000 00000000 00000000 00000000 00000000 00000000 ................................ 0001A0
00000000 00000000 00000000 00000000 00000000 00000000 00000000 00000000 ................................ 0001C0
00000000 00000000 00000000 00000000 00000000 00000000 00000000 00000000 ................................ 0001E0

Dump of file SATURN:[PCCOMMON.DUMP.DLL]DAD.TMP;1 on 18-APR-1990 10:40:03.08
File ID (551,9,0)    End of file block 267 / Allocated 268

Virtual block number 254 (000000FE), 512 (0200) bytes

FCFFFF3F FCFFFF3F 00000000 00000000 00000000 00000000 00000000 00000000 ........................?..■?..■ 000000
CCFFFF33 0C000030 0C000030 FCFFFF3F FCFFFF3F FCFFFF3F FCFFFF3F FCFFFF3F ?..■?..■?..■?..■?..■0...0...3..ä 000020
CCFFFF33 CC800133 CC800133 CC9C3933 CC9C3933 CC800133 CC800133 CCFFFF33 3..ä3..ä3..ä39.ä39.ä3..ä3..ä3..ä 000040
FCFFFF3F FCFFFF3F FCFFFF3F FCFFFF3F FCFFFF3F 0C000030 0C000030 CCFFFF33 3..ä0...0...?..■?..■?..■?..■?..■ 000060
000C0000 00200010 00100000 01204349 00000000 00000000 FCFFFF3F FCFFFF3F ?..■?..■.........IC ....... ..... 000080
00000000 00000000 00000000 00000000 FFFFFF00 00000001 00010040 00200000 .. .@............................ 0000A0
00000000 00000000 00000000 00000000 00000000 00000000 00000000 00000000 ................................ 0000C0
00000000 00000000 00000000 00000000 00000000 00000000 00000000 00000000 ................................ 0000E0
00000000 00000000 00000000 00000000 00000000 00000000 00000000 00000000 ................................ 000100
FCFFFF3F FCFFFF3F 00000000 00000000 00000000 00000000 00000000 00000000 ........................?..■?..■ 000120
CCFFFF33 0C000030 0C000030 FCFFFF3F FCFFFF3F FCFFFF3F FCFFFF3F FCFFFF3F ?..■?..■?..■?..■?..■0...0...3..ä 000140
CCFFFF33 CCFFFF33 CCFFFF33 CCFFFF33 CCFFFF33 CCFFFF33 CCFFFF33 CCFFFF33 3..ä3..ä3..ä3..ä3..ä3..ä3..ä3..ä 000160
FCFFFF3F FCFFFF3F FCFFFF3F FCFFFF3F FCFFFF3F 0C000030 0C000030 CCFFFF33 3..ä0...0...?..■?..■?..■?..■?..■ 000180
000C0000 00200010 00100000 01204349 00000000 00000000 FCFFFF3F FCFFFF3F ?..■?..■.........IC ....... ..... 0001A0
00000000 00000000 00000000 00000000 FFFFFF00 00000001 00010040 00200000 .. .@............................ 0001C0
00000000 00000000 00000000 00000000 00000000 00000000 00000000 00000000 ................................ 0001E0

Dump of file SATURN:[PCCOMMON.DUMP.DLL]DAD.TMP;1 on 18-APR-1990 10:40:03.08
File ID (551,9,0)    End of file block 267 / Allocated 268

Virtual block number 255 (000000FF), 512 (0200) bytes

00000000 00000000 00000003 00008007 00008007 00000003 00000000 00000000 ................................ 000000
00000000 00000000 00000000 00000000 00000000 00000000 00000000 00000000 ................................ 000020
FCFFFF3F FCFFFF3F 00000000 00000000 00000000 00000000 00000000 00000000 ........................?..■?..■ 000040
FCFFFF3F FCFFFF3F FCFFFF3F FCFFFF3F FCFFFF3F FCFFFF3F FCFFFF3F FCFFFF3F ?..■?..■?..■?..■?..■?..■?..■?..■ 000060
1CFE7F38 0CFC3F30 04F81F20 04000020 04000020 04F81F20 0CFC3F30 1CFE7F38 8.±.0?■. .½. ... ... .½.0?■.8.±. 000080
FCFFFF3F FCFFFF3F FCFFFF3F FCFFFF3F FCFFFF3F FCFFFF3F FCFFFF3F FCFFFF3F ?..■?..■?..■?..■?..■?..■?..■?..■ 0000A0
000C0000 00200010 00100000 01204349 00000000 00000000 FCFFFF3F FCFFFF3F ?..■?..■.........IC ....... ..... 0000C0
00000000 00000000 00000000 00000000 FFFFFF00 00000001 00010040 00200000 .. .@............................ 0000E0
00000000 00000000 00000000 00000000 00000000 00000000 00000000 00000000 ................................ 000100
00000000 00000000 0C300003 00008007 00008007 00000003 00000000 00000000 ................................ 000120
00000000 00000000 00000000 00000000 00000000 00000000 00000000 C‥‥0000 ................................ 000140
FCFFFF3F FCFFFF3F 00000000 00000000 00000000 00000000 00000000 00C 0000 ........................?..■?..■ 000160
FCFFFF3F FCFFFF3F FCFFFF3F FCFFFF3F FCFFFF3F FCFFFF3F FCFFFF3F FCF‥F3F ?..■?..■?..■?..■?..■?..■?..■?..■ 000180
1CBE7F38 0C9C3F30 04881F20 04000020 04000020 04881F20 0C9C3F30 1CBE7F38 8./.0?.. ... ... ... ...0?..8./. 0001A0
FCFFFF3F FCFFFF3F FCFFFF3F FCFFFF3F FCFFFF3F FCFFFF3F FCFFFF3F FCFFFF3F ?..■?..■?..■?..■?..■?..■?..■?..■ 0001C0
000C0000 00200010 00100000 01204349 00000000 00000000 FCFFFF3F FCFFFF3F ?..■?..■.........IC ....... ..... 0001E0
```

```
Dump of file SATURN:[PCCOMMON.DUMP.DLL]DAD.TMP;1 on 18-APR-1990 10:40:03.08
File ID (551,9,0)    End of file block 267 / Allocated 268

Virtual block number 256 (00000100), 512 (0200) bytes

00000000 00000000 00000000 00000000 FFFFFF00 00000001 00010040 00200000 .. .a........................... 000000
00000000 00000000 00000000 00000000 00000000 00000000 00000000 00000000 ................................ 000020
00000000 00000000 C0000003 E0018007 E0018007 C0000003 00000000 00000000 ...........à...À...À...à........ 000040
00000000 00000000 00000000 00000000 00000000 00000000 00000000 00000000 ................................ 000060
FCFFFF3F FCFFFF3F 00000000 00000000 00000000 00000000 00000000 00000000 ........................?..▪?..▪ 000080
FCFFFF3F FCFFFF3F FCFFFF3F FCFFFF3F FCFFFF3F FCFFFF3F FCFFFF3F FCFFFF3F ?..▪?..▪?..▪?..▪?..▪?..▪?..▪?..▪ 0000A0
1C8E7D38 0C9C3930 04881120 04000020 04000020 04881120 0C9C3930 1C8E7D38 8}ƒ.09.. ... ... ... ...09..8}ƒ. 0000C0
FCFFFF3F FCFFFF3F FCFFFF3F FCFFFF3F FCFFFF3F FCFFFF3F FCFFFF3F FCFFFF3F ?..▪?..▪?..▪?..▪?..▪?..▪?..▪?..▪ 0000E0
000C0000 00200010 00100000 01204349 00000000 00000000 FCFFFF3F FCFFFF3F ?..▪?..▪........IC ....... ..... 000100
00000000 00000000 00000000 00000000 FFFFFF00 00000001 00010040 00200000 .. .a........................... 000120
00000000 00000000 80010000 C0030000 C0030000 80010000 00000000 00000000 ...............à...à............ 000140
00000000 00000000 00000000 00000000 00000000 00000000 00000000 00000000 ................................ 000160
00000000 00000000 00008001 0000C003 0000C003 00008001 00000000 00000000 ..............à...à............. 000180
FCFFFF3F FCFFFF3F 00000000 00000000 00000000 00000000 00000000 00000000 ........................?..▪?..▪ 0001A0
3CFC9F3F 1CF89F3F 0CF09F3F 0C00803F 0C00803F 0CF0FF3F 1CF8FF3F 3CFCFF3F ?.▪<?.½.?.Þ.?...?...?.Þ.?.½.?.▪< 0001C0
FCFCFF3F FCFCFF3F FC00803F FC00803F FCFF9F3F FCFF9F3F FCFF9F3F FCFF9F3F ?..▪?..▪?..▪?..▪?..▪?..▪?.▪▪?.▪▪ 0001E0

Dump of file SATURN:[PCCOMMON.DUMP.DLL]DAD.TMP;1 on 18-APR-1990 10:40:03.08
File ID (551,9,0)    End of file block 267 / Allocated 268

Virtual block number 257 (00000101), 512 (0200) bytes

FCFF3F3C FCFF1F38 FCFF0F30 FC000030 FC000030 FCFC0F30 FCFC1F38 FCFC3F3C <?▪▪8.▪▪0.▪▪0..▪0..▪0..▪8..▪<?.▪ 000000
000C0000 00200010 00100000 01204349 00000000 00000000 FCFFFF3F FCFFFF3F ?..▪?..▪........IC ....... ..... 000020
00000000 00000000 00000000 00000000 FFFFFF00 00000001 00010040 00200000 .. .a........................... 000040
00000000 00000000 00000000 00000000 00000000 00000000 00000000 00000000 ................................ 000060
00000000 00000000 00000000 00000000 00000000 00000000 00000000 00000000 ................................ 000080
00000000 00000000 00000000 00000000 00000000 00000000 00000000 00000000 ................................ 0000A0
FCFFFF3F FCFFFF3F 00000000 00000000 00000000 00000000 00000000 00000000 ........................?..▪?..▪ 0000C0
FCFFFF3F FCFFFF3F FCFFFF3F FCFFFF3F FCFFFF3F FCFFFF3F FCFFFF3F FCFFFF3F ?..▪?..▪?..▪?..▪?..▪?..▪?..▪?..▪ 0000E0
FC3FFC3F FC1FF83F FC0FF03F FC0FF03F FC0FF03F FC0FF03F FC1FF83F FC3FFC3F ?▪?▪?½.▪?Þ.▪?Þ.▪?Þ.▪?Þ.▪?½.▪?▪?▪ 000100
FCFFFF3F FCFFFF3F FCFFFF3F FCFFFF3F FCFFFF3F FCFFFF3F FCFFFF3F FCFFFF3F ?..▪?..▪?..▪?..▪?..▪?..▪?..▪?..▪ 000120
000C0000 00200010 00100000 01204349 00000000 00000000 FCFFFF3F FCFFFF3F ?..▪?..▪........IC ....... ..... 000140
00000000 00000000 00000000 00000000 FFFFFF00 00000001 00010040 00200000 .. .a........................... 000160
00000000 00000000 00000000 00000000 00000000 00000000 00000000 00000000 ................................ 000180
00000000 00000000 00800100 00C00300 00C00300 00800100 00000000 00000000 ..............à...à............. 0001A0
00000000 00000000 00000000 00000000 00000000 00000000 00000000 00000000 ................................ 0001C0
FCFFFF3F FCFFFF3F 00000000 00000000 00000000 00000000 00000000 00000000 ........................?..▪?..▪ 0001E0

Dump of file SATURN:[PCCOMMON.DUMP.DLL]DAD.TMP;1 on 18-APR-1990 10:40:03.08
File ID (551,9,0)    End of file block 267 / Allocated 268

Virtual block number 258 (00000102), 512 (0200) bytes

FCFFFF3F FCFFFF3F FCFFFF3F FCFFFF3F FCFFFF3F FCFFFF3F FCFFFF3F FCFFFF3F ?..▪?..▪?..▪?..▪?..▪?..▪?..▪?..▪ 000000
FC3FFC3F FC1FF83F FC0FF03F FC0FF03F FC0FF03F FC0FF03F FC1FF83F FC3FFC3F ?▪?▪?½.▪?Þ.▪?Þ.▪?Þ.▪?Þ.▪?½.▪?▪?▪ 000020
FCFFFF3F FCFFFF3F FCFFFF3F FCFFFF3F FCFFFF3F FCFFFF3F FCFFFF3F FCFFFF3F ?..▪?..▪?..▪?..▪?..▪?..▪?..▪?..▪ 000040
000C0000 00200010 00100000 01204349 00000000 00000000 FCFFFF3F FCFFFF3F ?..▪?..▪........IC ....... ..... 000060
00000000 00000000 00000000 00000000 FFFFFF00 00000001 00010040 00200000 .. .a........................... 000080
00000000 00000000 00000000 00000000 00000000 00000000 00000000 00000000 ................................ 0000A0
00000000 00000000 00000000 00000000 00000000 00000000 00000000 00000000 ................................ 0000C0
FCFFFF3F FCFFFF3F 00000000 00000000 00000000 00000000 00000000 00000000 ................................ 0000E0
FC3FF83F FC0FFE3F FC83FF3F FCE0FF3F FCF8FF3F FCFEFF3F FCFFFF3F FCFFFF3F ........................?..▪?..▪ 000100
FC3FF83F FCFFE03F FCFF833F FCFF0F3E FCFF3F3C FCFF0F3E FCFF833F FCFFE03F ?..▪?..▪?±▪?½▪?Â▪?..▪?±.▪?½?▪ 000120
FCFFFF3F FCFFFF3F FCFFFF3F FCFEFF3F FCF8FF3F FCE0FF3F FC83FF3F FC0FFE3F ?Â.▪?..▪>..▪<?.▪>..▪?..▪?Â.▪?½?▪ 000140
000C0000 00200010 00100000 01204349 00000000 00000000 FCFFFF3F FCFFFF3F ?±.▪?..▪?.Â▪?.½▪?.±▪?..▪?..▪?..▪ 000160
00000000 00000000 00000000 00000000 FFFFFF00 00000001 00010040 00200000 ?..▪?..▪........IC ....... ..... 000180
00000000 00000000 00000000 00000000 00000000 00000000 00000000 00000000 .. .a........................... 0001A0
00000000 00000000 00000000 00000000 00000000 00000000 00000000 00000000 ................................ 0001C0
00000000 00000000 00000000 00000000 00000000 00000000 00000000 00000000 ................................ 0001E0
```

```
Dump of file SATURN:[PCCOMMON.DUMP.DLL]DAD.TMP;1 on 18-APR-1990 10:40:03.08
File ID (551,9,0)    End of file block 267 / Allocated 268

Virtual block number 259 (00000103), 512 (0200) bytes

00000000 00000000 00000000 00000000 00000000 00000000 00000000 00000000 ................................ 000000
FCFFFF3F FCFFFF3F 00000000 00000000 00000000 00000000 00000000 00000000 ........................?..=?..= 000020
FC3FF83F FC0FFE3F FC83FF3F FCE0FF3F FCF8FF3F FCFEFF3F FCFFFF3F FCFFFF3F ?..=?..=?.±=?.½=?.Â=?..=?±.=?½?= 000040
FC3FF83F FC7FE03F FC3F823F FC3F0F3E FC3F3F3C FC3F0F3E FC3F823F FC7FE03F ?Â.=?.?=>.?=<??=>.?=?.?=?Â.=?½?= 000060
FCFFFF3F FCFFFF3F FCFFFF3F FCFEFF3F FCF8FF3F FCE0FF3F FC83FF3F FC0FFE3F ?±.=?..=?.Â=?.½=?.±=?..=?..=?..= 000080
000C0000 00200010 00100000 01204349 00000000 00000000 FCFFFF3F FCFFFF3F ?..=?..=........IC ....... ..... 0000A0
00000000 00000000 00000000 00000000 FFFFFF00 00000001 00010040 00200000 .. .à............................ 0000C0
00000000 00000000 00000000 00000000 00000000 00000000 00000000 00000000 ................................ 0000E0
00000000 00000000 00000000 00000000 00000000 00000000 00000000 00000000 ................................ 000100
00000000 00000000 00000000 00000000 00000000 00000000 00000000 00000000 ................................ 000120
FCFFFF3F FCFFFF3F 00000000 00000000 00000000 00000000 00000000 00000000 ........................?..=?..= 000140
FC23F83F FC07FE3F FCJ3FF3F FCE0FF3F FCF8FF3F FCFEFF3F FCFFFF3F FCFFFF3F ?..=?..=?.±=?.½=?.Â=?..=?±.=?½#= 000160
FC23F83F FC71E03F FC39823F FC390F3E FC393F3C FC390F3E FC39823F F.¯¹E03F ?Âq=?.9=>.9=<?9=>.9=?.9=?Âq=?½#= 000180
FCFFFF3F FCFFFF3F FCFFFF3F FCFEFF3F FCF8FF3F FCE0FF3F FC83FF3F FC0.¨E3F ?±.=?..=?.Â=?.½=?.±=?..=?..=?..= 0001A0
000C0000 00200010 00100000 01204349 00000000 00000000 FCFFFF3F FCFFF°3F ?..=?..=........IC ....... ..... 0001C0
00000000 00000000 00000000 00000000 FFFFFF00 00000001 00010040 00200000 .. .à............................ 0001E0

Dump of file SATURN:[PCCOMMON.DUMP.DLL]DAD.TMP;1 on 18-APR-1990 10:40:03.08
File ID (551,9,0)    End of file block 267 / Allocated 268

Virtual block number 260 (00000104), 512 (0200) bytes

00000000 00000000 00000000 00000000 00000000 00000000 00000000 00000000 ................................ 000000
00000000 00000000 00000000 00000000 00000000 00000000 00000000 00000000 ................................ 000020
00000000 00000000 00000000 00000000 00000000 00000000 00000000 00000000 ................................ 000040
FCFFFF3F FCFFFF3F 00000000 00000000 00000000 00000000 00000000 00000000 ........................?..=?..= 000060
0404E427 0C0EE427 FCFFFF3F FCFFFF3F FCFFFF3F FCFFFF3F FCFFFF3F FCFFFF3F ?..=?..=?..=?..=?..=?..=.='ð..'ð.. 000080
E4E43C3C FCE41C38 FC049C39 FC0C8C31 FCE40C30 FCE40C30 E4E4C423 E4E4C423 #ðððð#ðððð.ð=0.ð=1..=9..=8.ð=<<ðð 0000A0
FCFFFF3F FCFFFF3F FCFFFF3F FCFFFF3F 0C0E7C3E 04047C3E E4E43C3C <<ðð>|..>|..?..=?..=?..=?..=?..= 0000C0
00000000 00110001 00040352 0000009A 00000000 00000000 FCFFFF3F FCFFFF3F ?..=?..=...........R........... 0000E0
2E797469 746E657E 20657461 65724303 51000000 01000700 04035200 00008900 .....R.........Q.Create ~entity. 000100
40000004 0068636F 6C627E20 74786574 20657461 65724303 58000000 01002E2E ......[.Create text ~block....à 000120
2E2E6E67 69736544 7E021900 00000100 2E2E2E64 6E69467E 01BD0000 0001FFFF ......§.~Find..........~Design.. 000140
726F4E7E 021B0000 0001002E 2E2E6D72 6F66736E 6172547E 021A0000 0001002E ........~Transform..........~Nor 000160
00000000 00110001 00040352 00000009 00000000 0000002E 2E2E657A 696C6160 malize..........).R........... 000180
2E797469 746E657E 20657461 65724303 28000000 01000800 04035200 0000C800 .à...R.........+.Create ~entity. 0001A0
3A317E20 70696873 6E6F6974 616C6572 20657461 65724303 52000000 01002E2E .......R.Create relationship ~1: 0001C0
4D7E3A31 20706968 736E6F69 74616C65 72206574 61657243 03530000 00010031 1.....S.Create relationship 1:~M 0001E0

Dump of file SATURN:[PCCOMMON.DUMP.DLL]DAD.TMP;1 on 18-APR-1990 10:40:03.08
File ID (551,9,0)    End of file block 267 / Allocated 268

Virtual block number 261 (00000105), 512 (0200) bytes

004D3A7E 4D207069 68736E6F 6974616C 65722065 74616572 43035400 00000100 .....T.Create relationship M~:M. 000000
01F40000 00010077 6F727E20 6E69206E 67696C41 01F30000 0001FFFF 40000004 ...à......µ.Align in ~row.....¶. 000020
64726164 6E617453 7E01F500 00000100 6E6D756C 6F637E20 6E69206E 67696C41 Align in ~column.....%.~Standard 000040
00000000 00110001 00040352 000000C0 00000000 00000000 657A6973 20657A69 ize size........à...R........... 000060
6E6F6974 616C6572 20657461 65724303 52000000 01000900 04035200 0000AF00 .£...R..........R.Create relation 000080
736E6F69 74616C65 72206574 61657243 03530000 00010031 3A317E20 70696873 ship ~1:1.....S.Create relations 0000A0
68736E6F 6974616C 65722065 74616572 43035400 00000100 407E3A31 20706968 hip 1:~M.....T.Create relationsh 0000C0
0001006C 616E6F69 74704F7E 03570000 0001FFFF 40000004 004D3A7E 40207069 ip M~:M....à......W.~Optional... 0000E0
03590000 00010052 4F497E03 58000000 01007972 6F746164 6E614D7E 03560000 ..V.~Mandatory.....X.~IOR.....Y. 000100
00000000 00110001 00040352 00000031 00444E41 7E035A00 00000100 524F587E ~XOR.....Z.~AND.1...R........... 000120
6574756F 72657220 6C61756E 614D7E03 55000000 01000100 04035200 00002000 . ...R..........U.~Manual reroute 000140
00000000 00110001 00040352 00000160 00000000 00000000 00000000 00000000 ...............`...R........... 000160
0000003D 00656361 66206570 79547E01 CD000000 11000300 04035200 00014F00 .O...R.........ë.~Type face.=... 000180
69547E01 D0000000 01006163 69746576 6C65487E 01CF0000 00010003 00040352 R.........ü.~Helvetica.....Ã.~Ti 0001A0
7E01D100 00001100 72656972 756F437E 01CE0000 0001006E 61606F72 20736560 mes roman.....ö.~Courier.....ì.~ 0001C0
0001006C 6160726F 4E7E0102 00000001 00040004 03520000 00430065 6C797453 Style.C...R.........@.~Normal... 0001E0
```

```
Dump of file SATURN:[PCCOMMON.DUMP.DLL]DAD.TMP;1 on 18-APR-1990 10:40:03.08
File ID (551,9,0)    End of file block 267 / Allocated 268

Virtual block number 262 (00000106), 512 (0200) bytes

537E01D5 000000C1 0063696C 6174497E 01D40000 00010064 6C6F427E 01D30000 ..Ã.~Bold.....Ã.~Italic.....Ì.~S 000000
0092006E 6F697461 63696669 7473754A 7E010600 00001100 74756F65 68697274 trikeout.....@.~Justification... 000020
66654C7E 01D80000 00010072 65746E65 437E01D7 00000001 00090004 03520000 ..R..........@.~Center.....Ã.~Lef 000040
01D80000 00010070 6F547E01 DA000000 01007468 6769527E 01D90000 00010074 t.....Ì.~Right.....Õ.~Top.....Ù. 000060
654C01DC 00000001 00706F74 20746665 7E4C01D0 00000001 00606F74 746F427E ~Bottom.....Ì.L~eft top.....É.Le 000080
00000001 00706F74 20746867 697E5201 DF000000 0100606F 74746F62 2074667E ~ft bottom.....Õ.R~ight top..... 0000A0
00010001 00010001 00010001 00010352 00606F74 746F6220 7468677E 695201DE ß.Ri~ght bottom.R............... 0000C0
65706F20 726F7272 45130065 7474656C 61500800 60617267 61696420 522D450C .E-R diagram..Palette..Error ope 0000E0
431A0021 656C6261 6C696176 61207465 7920746F 4E13006C 6F6F7420 676E696E ning tool..Not yet available!..C 000100
6E452500 01000100 4C404420 68746977 20746361 736E6172 7420746F 6E206E61 an not transact with DML.....%En 000120
646F6020 79686372 61726569 68206570 79742065 74616572 6320676E 69726574 tering create type hierarchy mod 000140
2E65646F 60207974 69746E65 20657461 65726320 676E6972 65746E45 1D002E65 e...Entering create entity mode. 000160
61657263 20676E69 7265746E 45270352 00000000 00000000 00000000 00000000 ................R.'Entering crea 000180
7265746E 4527002E 65646F60 20313A31 20706968 736E6F69 74616C65 72206574 te relationship 1:1 mode..'Enter 0001A0
65646F6D 204D3A31 20706968 736E6F69 74616C65 72206574 61657263 20676E69 ing create relationship 1:M mode 0001C0
20706968 736E6F69 74616C65 72206574 61657263 20676E69 7265746E 4527002E ..'Entering create relationship  0001E0

Dump of file SATURN:[PCCOMMON.DUMP.DLL]DAD.TMP;1 on 18-APR-1990 10:40:03.08
File ID (551,9,0)    End of file block 267 / Allocated 268

Virtual block number 263 (00000107), 512 (0200) bytes

756F7265 72206C61 756E616D 20676E69 7265746E 451E002E 65646F6D 204D3A4D M:M mode...Entering manual rerou 000000
65737020 79726F74 61646E61 6D20676E 69726574 6E451E00 2E65646F 6D206574 te mode...Entering mandatory pse 000020
20746573 70206C61 6E6F6974 706F2067 6E697265 746E451D 002E6564 6F6D2074 t mode...Entering optional pset  000040
616C6572 2078656C 70606F63 20524F49 20676E69 7265746E 4528002E 65646F6D mode..(Entering IOR complex rela 000060
606F6320 524F5820 676E6972 65746E45 28002E65 646F6D20 70696873 6E6F6974 tionship mode..(Entering XOR com 000080
6E697265 746E4528 002E6564 6F6D2070 6968736E 6F697461 6C657220 78656C70 plex relationship mode..(Enterin 0000A0
2E65646F 6D207069 68736E6F 6974616C 65722078 656C706D 6F632044 4E412067 g AND complex relationship mode. 0000C0
646F6D20 68636F6C 62207478 65742065 74616572 6320676E 69726574 6E452100 .!Entering create text block mod 0000E0
72617265 69682065 70797420 65746165 72632067 6E697661 654C2400 01002E65 e....$Leaving create type hierar 000100
79746974 6E652065 74616572 6320676E 69766165 4C1C002E 65646F6D 20796863 chy mode...Leaving create entity 000120
736E6F69 74616C65 72206574 61657263 20676E69 7661654C 26002E65 646F6D20  mode..&Leaving create relations 000140
65722065 74616572 6320676E 69766165 4C26002E 65646F6D 20313A31 20706968 hip 1:1 mode..&Leaving create re 000160
72632067 6E697661 654C2600 2E65646F 6D204D3A 31207069 68736E6F 6974616C lationship 1:M mode..&Leaving cr 000180
00000000 002E6564 6F6D204D 3A4D2070 6968736E 6F697461 6C657220 65746165 eate relationship M:M mode...... 0001A0
002E6564 6F6D2065 74756F72 6572206C 61756E61 6D20676E 69766165 4C1D0352 R..Leaving manual reroute mode.. 0001C0
4C1C002E 65646F6D 20746573 70207972 6F746164 6E616D20 676E6976 61654C1D .Leaving mandatory pset mode...L 0001E0

Dump of file SATURN:[PCCOMMON.DUMP.DLL]DAD.TMP;1 on 18-APR-1990 10:40:03.08
File ID (551,9,0)    End of file block 267 / Allocated 268

Virtual block number 264 (00000108), 512 (0200) bytes

7661654C 27002E65 646F6D20 74657370 206C616E 6F697470 6F20676E 69766165 eaving optional pset mode..'Leav 000000
646F6D20 70696873 6E6F6974 616C6572 2078656C 70606F63 20524F49 20676E69 ing IOR complex relationship mod 000020
6E6F6974 616C6572 2078656C 70606F63 20524F58 20676E69 7661654C 27002E65 e..'Leaving XOR complex relation 000040
2078656C 70606F63 20444E41 20676E69 7661654C 27002E65 646F6D20 70696873 ship mode..'Leaving AND complex  000060
61657263 20676E69 7661654C 20002E65 646F6D20 70696873 6E6F6974 616C6572 relationship mode.. Leaving crea 000080
69642065 74616572 430F0001 002E6564 6F6D2068 636F6C62 20747865 74206574 te text block mode.....Create di 0000A0
69647261 646E6174 53180073 65697469 746E6520 6E67696C 410F0060 61726761 agram..Align entities..Standardi 0000C0
7473756A 20747865 74206567 6E616843 1A00657A 69732079 7469746E 6520657A ze entity size..Change text just 0000E0
65766F4D 0E007325 20797469 746E6520 6563616C 5010006E 6F697461 63696669 ification..Place entity %s..Move 000100
73702065 766F4D13 00732520 74657370 2065766F 4D000073 65697469 746E6520  entities..Move pset %s..Move ps 000120
65762065 74756F72 2065766F 4D120352 00000000 00732520 6C656261 6C207465 et label %s.....R..Move route ve 000140
74206576 6F4D1300 7C6E656D 67657320 6574756F 72206576 6F4D1300 78657472 rtex..Move route segment..Move t 000160
65206574 61657243 10000100 01000100 01000100 73252068 636F6C62 20747865 ext block %s............Create e 000180
72431200 70696873 6E6F6974 616C6572 20657461 65724314 00736569 7469746E ntities..Create relationship..Cr 0001A0
20732520 74657370 2065676E 6168431C 0068636F 6C622074 78657420 65746165 eate text block..Change pset %s  0001C0
206F7420 73252074 65737020 65676E61 68431B00 79726F74 61646E61 6D206F74 to mandatory..Change pset %s to  0001E0
```

```
Dump of file SATURN:[PCCOMMON.DUMP.DLL]DAD.TMP;1 on 18-APR-1990 10:40:03.08
File ID (551,9,0)   End of file block 267 / Allocated 268

Virtual block number 265 (00000109), 512 (0200) bytes

 00524F49 206F7420 73252074 65737020 65676E61 68431600 6C616E6F 6974706F optional..Change pset %s to IOR. 000000
 70206567 6E616843 1600524F 58206F74 20732520 74657370 2065676E 61684316 .Change pset %s to XOR..Change p 000020
 00656E69 6C206574 756F7265 52000352 00000044 4E41206F 74207325 20746573 set %s to AND...R..Reroute line. 000040
 69682065 70797420 79666964 6F4D1600 68636F6C 6220747B 65742074 69644510 .Edit text block..Modify type hi 000060
 6520726F 66206C6C 61607320 6F6F7420 73692074 78655439 00796863 72617265 erarchy.9Text is too small for e 000080
 656C6163 7320606F 6F7A2072 65677261 6C206120 79725420 202E676E 69746964 diting.  Try a larger zoom scale 0000A0
 616E2074 65737020 726F6620 6C6C6160 73206F6F 74207369 20747B65 5443002E ..CText is too small for pset na 0000C0
 7320606F 6F7A2072 65677261 6C206120 79725420 202E676E 69746964 65206560 me editing.  Try a larger zoom s 0000E0
 2E646573 75206560 616E2074 65737020 65746163 696C7075 4448002E 656C6163 cale..KDuplicate pset name used. 000100
 20676E69 74616572 63207972 74657220 6F742074 6E617720 756F7920 6F442020   Do you want to retry creating  000120
 7469746E 65206C61 67656C6C 4915003F 70696873 6E6F6974 616C6572 20656874 the relationship?..Illegal entit 000140
 70754417 002E6560 616E2074 65737020 6C616765 6C6C4913 002E6560 616E2079 y name...Illegal pset name...Dup 000160
 70206574 6163696C 70754415 002E6560 616E2079 7469746E 65206574 6163696C licate entity name...Duplicate p 000180
 2065736E 6F707365 72206061 72676169 64205220 451F002E 6560616E 20746573 set name...E-R diagram response  0001A0
 20726F72 72652064 65766965 63655229 00010001 00010072 65746C69 66206F74 to filter.......)Received error  0001C0
 69656365 522C0064 2520203A 60657473 79732049 5447206D 6F726620 65646F63 code from GTI system:  %d.,Recei 0001E0

Dump of file SATURN:[PCCOMMON.DUMP.DLL]DAD.TMP;1 on 18-APR-1990 10:40:03.08
File ID (551,9,0)   End of file block 267 / Allocated 268

Virtual block number 266 (0000010A), 512 (0200) bytes

 65747379 73207972 6F6D656D 206D6F72 66206564 6F632072 6F727265 20646576 ved error code from memory syste 000000
 6F727265 20646576 69656365 52290352 00000000 00000000 00006425 20203A60 m:  %d..........R.)Received erro 000020
 6365522D 00642520 203A6D65 74737973 204C4D44 206D6F72 66206564 6F632072 r code from DML system:  %d.-Rec 000040
 79732065 6C69666C 7270206D 6F726620 65646F63 20726F72 72652064 65766965 eived error code from profile sy 000060
 66206564 6F632072 6F727265 20646576 69656365 52290064 2520203A 60657473 stem:  %d.)Received error code f 000080
 72652064 65766965 6365522A 00642520 203A6D65 74737973 204D4744 206D6F72 rom DGM system:  %d.*Received er 0000A0
 01006425 20203A60 65747379 73206174 6560206D 6F726620 65646F63 20726F72 ror code from meta system:  %d.. 0000C0
 00000000 00000000 00000100 01000100 01000100 01000100 01000100 01000100 ................................ 0000E0
 00001400 0090013A 00130001 00000009 00000000 FFFF0001 000E0352 000001B7 ñ...R.....................:....... 000100
 00340005 80010001 01520000 00050000 00000000 014EFFFF 03860046 010E0000 ....F.....N...........R.......4. 000120
 005A0034 00488001 00010160 00180005 00000000 0000FFFF FFFF0198 0008003C <..................'.....K.4.Z. 000140
 0008005A 003400AF 80010001 01790018 00050000 00000000 FFFFFFFF 01970008 ..................y.....£.4.Z... 000160
 01900008 003C0020 00058001 04010192 00080005 00000000 0000FFFF FFFF0196 ..................... .<..... 000180
 FFFF0195 000C005A 00200048 8002000C 019E0004 00060000 00000000 FFFFFFFF ...................K. .Z....... 0001A0
 FFFFFFFF 0194000C 005A0020 00AF8002 000C01A3 00040006 00000000 0000FFFF ............È.....£. .Z......... 0001C0
 0000FFFF FFFF0191 000C0026 000A0044 80020400 01A80002 00030000 00000000 ..........´.....D...&.......... 0001E0

Dump of file SATURN:[PCCOMMON.DUMP.DLL]DAD.TMP;1 on 18-APR-1990 10:40:03.08
File ID (551,9,0)   End of file block 267 / Allocated 268

Virtual block number 267 (0000010B), 512 (0200) bytes

 00000000 FFFFFFFF 0193000C 0026000A 00748002 000001AB 00060003 00000000 ........¨.....t...&............. 000000
 65746165 7243FFFF FFFF0192 000C0026 000A00A4 80020100 01820004 00030000 ......ý.....È...&........Create 000020
 003A7365 6D616E20 79746974 6E450000 00030070 6968736E 6F697461 6C657220  relationship.....Entity names:. 000040
 5F5F5F5F 5F5F5F00 5F5F5F5F 5F5F5F5F 5F5F5F5F 5F5F5F5F 5F5F5F5F 5F5F5F5F _______________________.________ 000060
 6554003A 73656D61 6E207465 7350005F 5F5F5F5F 5F5F5F5F 5F5F5F5F 5F5F5F5F _________________.Pset names:.Te 000080
 00000000 00000000 4300706C 6548006C 65636E61 43004B4F 00747865 5400747B xt.Text.OK.Cancel.Help.C........ 0000A0
 00000000 00000000 00000000 00000000 00000000 00000000 00000000 00000000 ................................ 0000C0
 00000000 00000000 00000000 00000000 00000000 00000000 00000000 00000000 ................................ 0000E0
 00000000 00000000 00000000 00000000 00000000 00000000 00000000 00000000 ................................ 000100
 00000000 00000000 00000000 00000000 00000000 00000000 00000000 00000000 ................................ 000120
 00000000 00000000 00000000 00000000 00000000 00000000 00000000 00000000 ................................ 000140
 00000000 00000000 00000000 00000000 00000000 00000000 00000000 00000000 ................................ 000160
 00000000 00000000 00000000 00000000 00000000 00000000 00000000 00000000 ................................ 000180
 00000000 00000000 00000000 00000000 00000000 00000000 00000000 00000000 ................................ 0001A0
 00000000 00000000 00000000 00000000 00000000 00000000 00000000 00000000 ................................ 0001C0
 00000000 00000000 00000000 00000000 00000000 00000000 00000000 00000000 ................................ 0001E0
```

```
Dump of file SATUkk:[PCCOMMON.DUMP.DLL]APPBASE.TMP;1 on 18-APR-1990 10:36:57.38
File ID (518,15,0)   End of file block 10 / Allocated 12

Virtual block number 1 (00000001), 512 (0200) bytes

00000000 00000040 00000000 00000088 0000FFFF 00000004 0000000A 005C5A4D MZ\.............¡.......a....... 000000
00000080 00000000 00000000 00000000 00000000 00000000 00000000 00000000 ................................ 000020
6F6E6E61 63206061 72676F72 70207369 685421CD 4C01B821 CD09B400 0EBA1F0E ..¤..Ç.e!¡.L!This program canno 000040
00000000 00000024 0A0D0D2E 65646F60 20534F44 206E6920 6E757220 65622074 t be run in DOS mode....$....... 000060
00010002 00000000 00000000 00001000 0002800A 5E24254B 0025019D 0505454E NE....%.K%$^.................... 000080
00000000 00000000 00010000 00040000 00000242 01420140 00500050 00400023 #.a.P.P.a.B.B................... 0000A0
4E554D41 44080000 45534142 50504107 0A680E01 00000000 0FA20F00 0FA20027 '.Â...Â.......h..APPBASE...DAMUN 0000C0
54455346 464F444E 41454C42 41545443 454A424F 42504117 00014554 414C4552 RELATE...APBOBJECTTABLEANDOFFSET 0000E0
46424250 410F0003 54455346 464F4449 4C4D4454 5245564E 4F434250 41150002 ...APBCONVERTDMLIDOFFSET...APBBF 000100
45495452 45504F52 504A424F 54494E49 42504114 0004444C 45494654 4553524F ORSETFIELD...APBINITOBJPROPERTIE 000120
4E494250 41160006 53454954 5245504F 52504E4C 5254494E 49425041 14000553 S...APBINITRLNPROPERTIES...APBIN 000140
4C45524E 5554494E 49425041 16000753 45495452 45504F52 50444C45 49465449 ITFIELDPROPERTIES...APBINITUNREL 000160
46544553 4D41440B C0094554 414C4552 4D414409 00085345 49545245 504F5250 PROPERTIES...DAMRELATE...DAMSETF 000180
00000B54 45534646 4F444E41 454C4241 5444494C 4D444250 4116000A 444C4549 IELD...APBDMLIDTABLEANDOFFSET... 0001A0
4C454946 5445534C 4D440B44 4C454946 59524555 514C4D44 006C6D64 03000001 ....dml.DMLQUERYFIELD.DMLSETFIEL 0001C0
4C45524E 554C4D44 0B455441 4C45524C 4D44094E 4C525952 4555514C 4D440B44 D.DMLQUERYRLN.DMLRELATE.DMLUNREL 0001E0
```

```
Dump of file SATURN:[PCCOMMON.DUMP.DLL]APPBASE.TMP;1 on 18-APR-1990 10:36:57.38
File ID (518,15,0)   End of file block 10 / Allocated 12

Virtual block number 2 (00000002), 512 (0200) bytes

03010844 494C4D44 59524555 514C4D44 00545349 4C454552 464C4D44 08455· 1 ATE.DMLFREELIST.DMLQUERYDMLID... 000000
0052030C 9103007C 03020003 00AE0301 8A030387 03060003 04560300 00030E»' ......V..ï.....¤..Ù.....|.....R. 000020
696E6168 63654D20 676E6972 69462074 6E696172 74736E6F 43204D41 441F0000 ...DAM Constraint-Firing Mechani 000040
FF1476FF 088EFFFF 881E5657 000004C8 00000000 00000000 00000000 00006D73 sm..............à...WV.¡...Á.v.. 000060
46880006 E9037500 FC7E83FC 46890000 FFFF9A50 16FE468D 0E76FF10 76FF1276 v..v..v..F±.P......F•.~•.u.Õ...F 000080
CAC95F5E 1F0000E9 FFFF0052 9A0676FF 0876FF0A 76FF0C76 FFFE76FF 0017E9FC •Õ...v±.v..v..v..v..R...Õ...^_èò 0000A0
83FE4689 008A0456 9A0676FF 0876FF0E 76FFD88E 0008881E 56570000 02C80010 ..à...WV.¡...Á.v..v..v..V....F±. 0000C0
8906C483 00460674 9A0E76FF 0A76FF0C 76FF0029 E9FE4688 0006E903 7500FE7E ~±.u.Õ...F±Õ)..v..v..v..t.F..é.. 0000E0
0CC8000A CAC95F5E 1F0000E9 00008800 06E9FE46 880006E9 037500FE 7E83FE46 F±.~±.u.Õ...F±Õ..¡..Õ...^_èò..à. 000100
68F84689 006A0052 9A5016FE 46805016 F4468028 76FFD88E 005A881E 56570000 ..WV.¡Z..Á.v(.F¶.P.F±.P.R.j..F½k 000120
24468BFA 76C405E3 C1265E88 FC5689FA 46890E50 88260C40 8826F45E C418FE76 v±.á^¶&.ə.&.P..F°.V•.^&éD.áv°.F$ 000140
05E6C126 76880450 89260240 89262256 88204688 FA5EC405 E6C12676 88008926 &...v&èl.á^°.F .V"&.ə.&.P..v&èl. 000160
50892608 4089261C 56881A46 88FA5EC4 05E6C126 76880640 89261E46 88FA5EC4 á^°.F.&.ə..v&èl.á^°.F..V.&.ə.&.P 000180
5EC405E6 C1267688 0E508926 0C408926 18568816 4688FA5E C405E6C1 2676880A ..v&èl.á^°.F..V.&.ə.&.P..v&èl.á^ 0001A0
88145089 26124089 26125688 104688FA 5EC405E6 C1267688 10408926 144688FA °.F.&.ə..v&èl.á^°.F..V.&.ə.&.P.. 0001C0
88FA5EC4 05E6C126 76881850 89261640 89260E56 880C4688 FA5EC405 E6C12676 v&èl.á^°.F..V.&.ə.&.P..v&èl.á^°. 0001E0
```

```
Dump of file SATURN:[PCCOMMON.DUMP.DLL]APPBASE.TMP;1 on 18-APR-1990 10:36:57.38
File ID (518,15,0)   End of file block 10 / Allocated 12

Virtual block number 3 (00000003), 512 (0200) bytes

0000881E 5089261C 40892608 56880646 88FA5EC4 05E6C126 76881A40 89260A46 F.&.a..v&èl.á^'.F..V.&.a.&.P.¡.. 000000
FF2476FF 2676FF28 76FFD88E 0086881E 56570000 00C80024 CAC95F5E 1F0000E9 Ô...^_èò$.à...WV.¡Ñ..Ä.v(.v&.v$. 000020
0E76FF10 76FF1276 FF1476FF 1676FF18 76FF1A76 FF1C76FF 1E76FF20 76FF2276 v".v .v..v..v..v..v..v..v..v..v. 000040
0000C800 24CAC'.5F 5E1F0000 E900CA02 609A006A 0676FF08 76FF0A76 FF0C76FF .v..v..v..v.j..'.ò.Ô...^_èò$.à.. 000060
76FF1C76 FF1E76FF 2076FF22 76FF2476 FF2676FF 2876FFD8 8E01C288 1E565700 .WV.¡ò..Ä.v(.v&.v$.v".v .v..v..v 000080
6A0676FF 0876FF0A 76FF0C76 FF0E76FF 1076FF12 76FF1476 FF1676FF 1876FF1A ..v..v..v..v..v..v..v..v..v..v.j 0000A0
8D2A76FF D88E0215 881E5657 00000CC8 0024CAC9 5F5E1F00 00E90201 02609A01 ..'...Ô...^_èò$.à...WV.¡...Ä.v*. 0000C0
5EC418FE 76680012 E9037500 067E83FC 46890254 00529A50 16FE4680 5016F846 F%.P.F±.P.R.T..F=.-..u.Ô..kv±.á^ 0000E0
5689F446 89125088 26104088 26F85EC4 18FE7668 000FE916 50882614 408826F8 ½&.a.&.P.Ô..kv±.á^½&.a.&.P..F¶.V 000100
26245688 22468BF4 5EC405E6 C1287688 00892626 4688F476 C405E3C1 285E88F6 -.^(éO.áv¶.F&&...v(él.á^¶.F".V$& 000120
F45EC405 E6C12876 88064089 26204688 F45EC405 E6C12876 88045089 26024089 .a.&.P..v(èl.á^¶.F &.a..v(èl.á^¶ 000140
4089261A 56881846 88F45EC4 05E6C128 76880A50 89260840 89261E56 881C4688 .F..V.&.a.&.P..v(èl.á^¶.F..V.&.a 000160
4688F45E C405E6C1 28768810 40892616 4688F45E C405E6C1 2876880E 5089260C .&.P..v(èl.á^¶.F.&.a..v(èl.á^¶.F 000180
26164089 26105688 0E4688F4 5EC405E6 C1287688 14508926 12408926 14568812 ..V.&.a.&.P..v(èl.á^¶.F..V.&.a.& 0001A0
88084688 F45EC405 E6C12876 881A4089 260C4688 F45EC405 E6C12876 88185089 .P..v(èl.á^¶.F.&.a..v(èl.á^¶.F.. 0001C0
68881E56 57000008 C80026CA C95F5E1F 0000E900 00881E50 89261C40 89260A56 V.&.a.&.P.¡..Ô...^_èò&.à...WV.¡h 0001E0
```

```
Dump of file SATURN:[PCCOMMON.DUMP.DLL]APPBASE.TMP;1 on 18-APR-1990 10:36:57.38
File ID (518,15,0)   End of file block 10 / Allocated 12

Virtual block number 4 (00000004), 512 (0200) bytes

 06E90375 00FC7E83 FC468902 7C00529A 5016FE46 8D5016F8 468D1E76 FFD88E02 ..Ä.v..F½.P.F±.P.R.|..F▪.~▪.u.Õ. 000000
 18FE7668 0E50892ͻ 0C408926 1C56881A 4688F85E C418FE76 680098E9 FC468800 ..F▪Õ..kv±.á^½.F..V.&.a.&.P.kv±. 000020
 89261456 88124688 F85EC418 FE766812 50892610 40892618 56881646 88F85EC4 á^½.F..V.&.a.&.P.kv±.á^½.F..V.&. 000040
 4089260E 4688F85E C418FE76 68008926 104688F8 76C418FE 5E681650 89261440 a.&.P.k^±.áv½.F.&..kv±.á^½.F.&.a 000060
 FE766806 4089260A 4688F85E C418FE76 68044089 260C4688 F85EC418 FE766802 .kv±.á^½.F.&.a.kv±.á^½.F.&.a.kv± 000080
 1F0000E9 0000880A 40892606 4688F85E C418FE76 68084089 26084688 F85EC418 .á^½.F.&.a.kv±.á^½.F.&.a.¡..Õ... 0000A0
 721D0A7E 830019E9 0377000A 7E83088E 038F881E 56570000 00C8001A CAC95F5E ^_èò..à...WV.¡...Ä.~..w.Õ...~..r 0000C0
 0A7E8300 1CE90377 000A7E83 0028E900 00880789 26480A46 88065EC4 0010E903 .Õ..á^..F.H&..¡..Õ+..~..w.Õ...~. 0000E0
 1F0000E9 8F828800 06E90009 E9000088 07892648 0A468806 5EC40013 E9037252 Rr.Õ..á^..F.H&..¡..Õ..Õ..¡..Õ... 000100
 FF0003E9 0000FE46 C70000FC 46C7D88E 045E881E 56570000 04C80006 CAC95F5E ^_èò..à...WV.¡^..ÄúF▪..úF±..Õ... 000120
 FF0E76FF 1076FF12 76FF1476 FF1676FF 1876FF00 39E9037C FE463906 4688FE46 F±.F.9F±|.Õ9..v..v..v..v..v..v.. 000140
 FC468800 06E90375 00FC7E83 FC46890E C48318FF 260876C4 02E3C1FE 5E880C76 v..^±èÐ.áv.&...á..F▪.~▪.u.Õ...F▪ 000160
 FC46C7D8 8E048E88 'E565700 0004C8C8 C95F5E1F 0000E9FC 4688FF89 E90009E9 Õ..Õ¿..F▪Õ...^_èùà...WV.¡ƒ..ÄúF▪ 000180
 76FF1876 FF1A76FF 003CE903 7CFE4639 064688FE 46FF0003 E90000FE 46C70000 ..úF±..Õ...F±.F̄.9F±|.Õ<..v..v..v 0001A0
 8910C483 18FF2608 76C402E3 C1FE5E88 0C76FF0E 76FF1076 FF1276FF 1476FF16 ..v..v..v..v..v..^±èÐ.áv.&...á.. 0001C0
 C8C8C95F 5E1F0000 E9FC4688 FF86E900 09E9FC46 880006E9 037500FC 7E83FC46 F▪.~▪.u.Õ...F▪Õ..ÕÑ..F▪Õ...^_èùà 0001E0
```

```
Dump of file SATURN:[PCCOMMON.DUMP.DLL]APPBASE.TMP;1 on 18-APR-1990 10:36:57.38
File ID (518,15,0)   End of file block 10 / Allocated 12

Virtual block num*r 5 (00000005), 512 (0200) bytes

 46390646 88FE46FF 0003E900 00FE46C7 0000FC46 C7D88E05 29881E56 57000004 ...WV.¡)..ÀúF=..úF±..Õ...F±.F.9F 000000
 76FF0E76 FF1076FF 1276FF14 76FF1676 FF1876FF 1A76FF1C 76FF003F E9037CFE ±|.Õ?..v..v..v..v..v..v..v..v..v 000020
 E9FC4688 0006E9J3 7500FC7E 83FC4689 12C48318 FF260876 C402E3C1 FE5E880C ..^±èD.áv.&...á..F=.-=.u.Õ...F=Õ 000040
 00FC46C7 D88E0597 881E5657 000004C8 CBC95F5E 1F0000E9 FC4688FF 83E90009 ..Õ"..F=Õ...^_èùà...WV.¡...ÀúF=. 000060
 1A76FF1C 76FF1E76 FF0042E9 037CFE46 39064688 FE46FF00 03E90000 FE46C700 .úF±..Õ...F±.F̄.9F±|.Õ8..v..v..v. 000080
 FF260876 C402E3C1 FE5E880C 76FF0E76 FF1076FF 1276FF14 76FF1676 FF1876FF .v..v..v..v..v..v..v..^±èD.áv.&. 0000A0
 1F0000E9 FC4688FF 80E90009 E9FC4688 0006E903 7500FC7E 83FC4689 14C48318 ..á..F=.-=.u.Õ...F=Õ..Õ¯..F=Õ... 0000C0
 E903721D 067E8300 20E90377 00067E83 D88E0608 881E5657 000000C8 CBC95F5E ^_èùà...WV.¡...Ä.~..w.Õ ..~..r.Õ 0000E0
 E9037700 067E8300 2FE90032 E90000B8 06C70247 C72602B8 07C72608 5EC40017 ..¯á^.&ú.¡.&úG.ú.¡..Õ2.Õ/..~..w.Õ 000100
 E90009E9 00008806 7C0247C7 26028807 C726085E C40017E9 03725206 7E830020  ..~.Rr.Õ..á^.&ú.¡.&úG.|.¡..Õ..Õ 000120
 FF1076FF 1276FF08 8E069E88 1E565700 000CC8CB C95F5E1F 0000E98F 80880006 ..¡..Õ...^_èùà...WV.¡...Ä.v..v.. 000140
 0006E903 7500F87E 83F84689 08600000 9A5016FE 46805016 F446800C 76FF0E76 v..v..F¶.P.̄F±.P...'..F½.-½.u.Õ.. 000160
 4608FA46 88FC5689 FA46890E 5088260C 408826F4 5EC418FE 76680167 E9F84688 .F½Õg.kv±.á^¶&.ə.&.P..F'.V=.F'.F 000180
 7688003E E9037500 388326FA 76C405E3 C10A5E88 0141E900 00880006 E90374FC =t.Õ..¡..ÕA..^.èD.áv'&.8.u.Õ>..v 0001A0
 05E6C10A 76880676 FF0876FF 0028E903 75044008 26024088 26FA5EC4 05E6C10A .è|.á^'&.ə.&.ə.u.Õ(..v..v..v.è|. 0001C0
 C10A7688 00F1E9F8 46880006 E9037500 F87E83F8 468904C4 830258FF 26FA5EC4 á^'&.X..á..F½.~½.u.Õ...F½Õþ..v.è 0001E0
```

```
Dump of file SATURN:[PCCOMMON.DUMP.DLL]APPBASE.TMP;1 on 18-APR-1990 10:36:57.38
File ID (518,15,0)   End of file block 10 / Allocated 12

Virtual block number 6 (00000006), 512 (0200) bytes

 0A400826 08408826 FA5EC405 E6C10A76 88003EE9 03750006 788326FA 5EC405E6 |.á^*&.x..u.õ>..v.èl.á^*&.a.&.a. 000000
 7E83F846 8904C483 0858FF26 FA5EC405 E6C10A76 880676FF 0876FF00 28E90375 u.Õ(..v..v..v.èl.á^*&.X..á..F%.- 000020
 03750E40 08260C40 8826FA5E C405E6C1 0A768800 A0E9F846 880006E9 037500F8 %.u.Õ...F%Õ...v.èl.á^*&.a.&.a.u. 000040
 5EC405E6 C10A7688 1076FF12 76FF0C76 FF0E76FF 0A76FF06 76FF0876 FF0037E9 Õ7..v..v..v..v..v..v..v..v.èl.á^ 000060
 0676FF08 76FF0053 E9F8468B 0006E903 7500F87E 83F84689 0EC4830C 58FF26FA *&.X..á..F%.-%.u.Õ...F%ÕS..v..v. 000080
 1270FF26 1470FF26 FA5EC405 E6C10A76 881076FF 1276FF0C 76FF0E76 FF0A76FF .v..v..v..v..v..v.èl.á^*&.p.&.p. 0000A0
 06E90375 00F87E83 F8468914 C48303A3 04869A10 70FF26FA 5EC405E6 C10A7688 .v.èl.á^*&.p..Ñ.È..á..F%.-%.u.Õ. 0000C0
 D88E06E5 881E5657 00000CC8 000ECAC9 5F5E1F00 00E9F846 880006E9 F8468800 ..F%Õ...F%Õ...^_èò..à...WV.¡|..Á 0000E0
 7E83FC46 89070200 009A5016 FE468050 16F84680 1076FF12 76FF1476 FF1676FF .v..v..v..v..F%.P.F±.P......F•.- 000100
 408826F8 5EC418FE 76680012 E9037500 067E8301 88E9FC46 880006E9 037500FC •.u.Õ...F=Õ...~..u.Õ..kv±.á^%&.a 000120
 F44688F6 5689F446 89125088 26104088 26F85EC4 18FE7668 000FE916 50882614 .&.P.Õ..kv±.á^%&.a.&.P..F¶.V-.F¶ 000140
 003EE903 75003883 26F476C4 05E3C10E 5E880147 E9000088 0006E903 74F6460B .F-t.Õ..¡..ÕG..^.èD.áv¶&.8.u.Õ>. 000160
 C10E7688 0A76FF0C 76FF0028 E9037504 40082602 408826F4 5EC405E6 C10E7688 .v.èl.á^¶&.a.&.a.u.Õ(..v..v..v.è 000180
 768800F7 E9FC4688 0006E903 7500FC7E 83FC4689 04C48302 58FF26F4 5EC405E6 |.á^¶&.X..á..F•.-•.u.Õ...F=Õ%..v 0001A0
 08260840 8826F45E C405E6C1 0E768800 3EE90375 00067883 26F45EC4 05E6C10E .èl.á^¶&.x..u.Õ>..v.èl.á^¶&.a.&. 0001C0
 FC468904 C4830858 FF26F45E C405E6C1 0E76880A 76FF0C76 FF0028E9 03750A40 a.u.Õ(..v..v..v.èl.á^¶&.X..á..F• 0001E0
```

```
Dump of file SATURN:[PCCOMMON.DUMP_DLL]APPBASE.TMP;1 on 18-APR-1990 10:36:57.38
File ID (518,15,0)   End of file block 10 / Allocated 12

Virtual block number 7 (00000007), 512 (0200) bytes

0E400826 0C408826 F45EC405 E6C10E76 8800A6E9 FC468800 06E90375 00FC7E83 .~•.u.Ô...F•Ô!..v.èl.á^¶&.a.&.a. 000000
0E768814 76FF1676 FF1076FF 1276FF0E 76FF0A76 FF0C76FF 0876FF00 3AE90375 u.Ô:..v..v..v..v..v..v..v..v..v. 000020
FF0056E9 FC4688J0 06E90375 00FC7E83 FC468910 C4B30C58 FF26F45E C405E6C1 èl.á^¶&.X..á..F•.~•.u.Ô...F•ÔV.. 000040
F45EC405 E6C10E76 881476FF 1676FF10 76FF1276 FF0E76FF 0A76FF0C 76F· ]876 v..v..v..v..v..v..v..v..v.èl.á^¶ 000060
FC468916 C4B308A9 05219A10 70FF26F4 5EC405E6 C10E7688 1270FF26 1470. ⁼26 &.p.&.p..v.èl.á^¶&.p..!.`..á..F• 000080
00000CC8 0012CAC9 5F5E1F00 00E9FC46 880006E9 FC468800 06E90375 00FC7E83 .~•.u.Ô...F•Ô...F•Ô...^_èò..à... 0000A0
009A5016 FE468050 16F44680 1076FF12 76FF1476 FF1676FF D88E088C B81E5657 WV.¡...Á.v..v..v..v..F¶¯P.F±.P.. 0000C0
0C408826 F45EC418 FE766800 D2E9F846 880006E9 037500F8 7E83F846 89083A00 .:..F½.-½.u.Ô...F½Ô•.kv±.á^¶&.a. 0000E0
E6C10E76 8800ACE9 00008800 06E90374 FC4608FA 4688FC56 89FA4689 0E508826 &.P..F•.V•.F•.F•t.Ô..¡..Ô¯..v.èl 000100
0E76FF0A 76FF0C76 FF0676FF 0876FF00 30E90375 18400826 16408826 FA5EC405 .á^•&.a.&.a.u.Ô=..v..v..v..v..v. 000120
83F84689 12C48316 58FF26FA 5EC405E6 C10E7688 1476FF16 76FF1076 FF1276FF .v..v..v..v..v.èl.á^•&.X..á..F½. 000140
1276FF0E 76FF0A76 FF0C76FF 0676FF08 76FF0059 E9F84688 0006E903 7500F87E ~½.u.Ô...F½ÔY..v..v..v..v..v..v. 000160
05E6C10E 76881C70 FF261E70 FF26FA5E C405E6C1 0E768814 76FF1676 FF1076FF .v..v..v..v.èl.á^•&.p.&.p..v.èl. 000180
06E9F846 880006E9 037500F8 7E83F846 8918C483 0A28058F 9A1A70FF 26FA5EC4 á^•&.p....(..á..F½.-½.u.Ô...F½Ô. 0001A0
1876FF1A 76FF088E 0A54881E 56570000 0CC80012 CAC95F5E 1F0000E9 F8468800 ..F½Ô...^_èò..à...WV.¡T..Ä.v..v. 0001C0
06E90375 00FC7E83 FC46890C 6000009A 5016FE46 805016F8 46801476 FF1676FF .v..v..F½¯P.F±.P...m..F•.~•.u.Ô. 0001E0
```

```
Dump of file SATURN:[PCCOMMON.DUMP.DLL]APPBASE.TMP;1 on 18-APR-1990 10:36:57.38
File ID (518,15,0)   End of file block 10 / Allocated 12

Virtual block number 8 (00000008), 512 (0200) bytes

 E9165088 2614408? 26F85EC4 18FE7668 0012E903 7500067E 8300F3E9 FC468800 ..F=Öµ..-..u.Ö..kvs.á^½&.ã.&.P.Ö 000000
 E90374F6 4608F446 8BF65689 F4468912 50882610 408826F8 5EC418FE 7668000F ..kvs.á^½&.ã.&.P..F¶.V-.F¶.F-t.Ö 000020
 76FF0040 E9037518 40082616 408826F4 5EC405E6 C1127688 0082E900 00880006 ..¡..Öÿ..v.èl.á^¶&.ã.&.ã.u.Öã..v 000040
 C1127688 1876FF1A 76FF1476 FF1676FF 1276FF0E 76FF1076 FF0C76FF 0876FF0A ..v..v..v..v..v..v..v..v..v..v.è 000060
 76FF005C E9FC4688 0006E903 7500FC7E 83FC4689 14C48316 58FF26F4 5EC405E6 l.á^¶&.X..á..F=.-=.u.Ö...F=Ö\..v 000080
 C1127688 1876FF1A 76FF1476 FF1676FF 1276FF0E 76FF1076 FF0C76FF 0876FF0A ..v..v..v..v..v..v..v..v..v..v.è 0000A0
 830A7106 009A1A70 FF26F45E C405E6C1 1276881C 70FF261E 70FF26F4 5EC405E6 l.á^¶&.p.&.p..v.èl.á^¶&.p....q.. 0000C0
 16CAC95F 5E1F0000 E9FC4688 0006E9FC 46880006 E9037500 FC7E83FC 46891AC4 á..F=.-=.u.Ö...F=Ö...F=Ö...^_èò. 0000E0
 46805016 9446800C 76FF0E76 FF1076FF 1276FFD8 8E086688 1E565700 006CC800 .àl..WV.¡f..Á.v..v..v..v..F..P.F 000100
 1076FF12 76FF00AB E9984688 0006E903 7500987E 83984689 0CE20000 9A5016FE ±.P...ã..F..-..u.Ö...F.Ö..v..v. 000120
 0006E903 7500987E 83984689 088306DD 9A0676FF 0876FF0A 76FF0C76 FF0E76FF .v..v..v..v..v..Ì....F..-..u.Ö.. 000140
 890000FF FF9A5016 9A46800A 76FF0C76 FF0E76FF 1076FF12 76FF007F E998468B .F.Ö...v..v..v..v..v..F..P...... 000160
 0A76FF0C 76FF0E76 FF1076FF 1276FF00 54E99846 880006E9 03750098 7E839846 F..-..u.Ö...F.ÖT..v..v..v..v..v. 000180
 1276FF00 28E99846 880006E9 03750098 7E839846 890000FF FF9A0676 FF0876FF .v..v.......F..-..u.Ö...F.Ö(..v. 0001A0
 8B984689 0CB60A4C 9A50169A 46800676 FF0876FF 0A76FF0C 76FF0E76 FF1076FF .v..v..v..v..v..v..F..P.L.Ñ..F.. 0001C0
 76FF1276 FF1476FF 088E0C99 881E5657 00000CC8 000ECAC9 5F5E1F00 00E99846 F.Ö...^_èò..à...WV.¡...Á.v..v..v 0001E0
```

```
Dump of file SATURN:[PCCOMMON.DUMP.DLL]APPBASE.TMP;1 on 18-APR-1990 10:36:57.38
File ID (518,15,0)   End of file block 10 / Allocated 12

Virtual block number 9 (00000009), 512 (0200) bytes

880006E9 037500F8 7E83F846 89000200 009A5016 FE468D50 16F4468D 0E76FF10 ..v..F¶.P.F±.P...Ø..F½.-½.u.Ö... 000000
9A006A06 76FF0876 FF0A76FF 0C76FF0E 76FF1076 FF1276FF 1476FF00 DBE9F846 F½ÖU..v..v..v..v..v..v..v..v.j.. 000020
FF1076FF 1276FF14 76FF00AA E9F8468B 0006E903 7500F87E 83F84689 0E740884 ..t..F½.~½.u.Ö...F½Ö`..v..v..v.. 000040
7FE9F846 880006E9 037500F8 7E83F846 890000FF FF9A5016 FA46800C 76FF0E76 v..v..F'.P......F½.~½.u.Ö...F½Ö. 000060
46890000 FFFF9A06 76FF0876 FF0A76FF 0C76FF0E 76FF1076 FF1276FF 1476FF00 ..v..v..v..v..v..v..v..v.......F 000080
3FE9F846 8800000E 869AFA76 FFFC76FF 1276FF14 76FF0017 E9037500 F87E83F8 ½.-½.u.Ö...v..v..v=.v'......F½Ö? 0000A0
6AFA76FF FC76FF06 76FF0876 FF0A76FF 0C76FF0E 76FF1076 FF1276FF 1476FF00 ..v..v..v..v..v..v..v..v..v=.v'j 0000C0
0000E9F8 46880000 FFFF9AFA 76FFFC76 FF1276FF 1476FFF8 4689006A 085E9A00 ..^.j..F½.v..v..v=.v'......F½Ö.. 0000E0
800E76FF 1076FF12 76FF1476 FFD88E0D 84881E56 5700000C C80010CA C95F5E1F .^_èò..à...WV.j...Ä.v..v..v..v.. 000100
00CAE9F8 46880006 E9037500 F87E83F8 46890EED 00009A50 16FE468D 5016F446 F¶.P.F±.P...Ü..F½.~½.u.Ö...F½Öò. 000120
890F7E08 849A016A 0676FF08 76FF0A76 FF0C76FF 0E76FF10 76FF1276 FF1476FF .v..v..v..v..v..v..v..v.j.....~.. 000140
0C76FF0E 76FF1076 FF1276FF 1476FF00 99E9F846 880006E9 037500F8 7E83F846 F½.~½.u.Ö...F½Ö...v..v..v..v..v. 000160
FF1476FF 006EE98F 83880006 E9037500 F87E83F8 46890000 0DFB9A50 16FA468D .F'.P.«....F½.-½.u.Ö..j..Ön..v.. 000180
00F87E83 F8468900 00FFFF9A 0676FF08 76FF0A76 FF0C76FF 0E76FF10 76FF1276 v..v..v..v..v..v..v.......F½.-½. 0001A0
0876FF0A 76FF0C76 FF0E76FF 1076FF12 76FF1476 FF003FE9 F8468800 06E90375 u.Ö...F½Ö?..v..v..v..v..v..v..v. 0001C0
9AFA76FF FC76FF1  76FF1476 FFF84689 00A1085E 9A016AFA 76FFFC76 FF0676FF .v..v=.v'j..^.À..F½.v..v..v=.v'. 0001E0
```

```
Dump of file SATURN:[PCCOMMON.DUMP.DLL]APPBASE.TMP;1 on 18-APR-1990 10:36:57.38
File ID (518,15,0)   End of file block 10 / Allocated 12

Virtual block number 10 (0000000A), 512 (0200) bytes

 0E9F0002 00000001 0EBC0002 00099000 10CAC95F 5E1F0000 E9F84688 00000E47 G....F%Õ...^_èò.......¥......... 000000
 0E2A0203 001F00C1 0F160203 00130001 00370203 00050001 00080203 00000002 ...............7...............*. 000020
 00000000 004D0001 001E0203 00410001 0F900203 00350001 0F450203 00280001 ..+...E...5.......A.......M..... 000040
 00000000 00000000 00000000 00000000 00000000 00000000 00000000 00000000 ................................ 000060
 00000000 00000000 00000000 00000000 00000000 00000000 00000000 00000000 ................................ 000080
 00000000 00000000 00000000 00000000 00000000 00000000 00000000 00000000 ................................ 0000A0
 00000000 00000000 00000000 00000000 00000000 00000000 00000000 00000000 ................................ 0000C0
 00000000 00000000 00000000 00000000 00000000 00000000 00000000 00000000 ................................ 0000E0
 00000000 00000000 00000000 00000000 00000000 00000000 00000000 00000000 ................................ 000100
 00000000 00000000 00000000 00000000 00000000 00000000 00000000 00000000 ................................ 000120
 00000000 00000000 00000000 00000000 00000000 00000000 00000000 00000000 ................................ 000140
 00000000 00000000 00000000 00000000 00000000 00000000 00000000 00000000 ................................ 000160
 00000000 00000000 00000000 00000000 00000000 00000000 00000000 00000000 ................................ 000180
 00000000 00000000 00000000 00000000 00000000 00000000 00000000 00000000 .........,...................... 0001A0
 00000000 00000000 00000000 00000000 00000000 00000000 00000000 00000000 ................................ 0001C0
 00000000 00000000 00000000 00000000 00000000 00000000 00000000 00000000 ................................ 0001E0
```

Dump of file SATURN:[PCCOMMON.DUMP.DLL]BRDPLOW.TMP;1 on 18-APR-1990 10:38:06.00
File ID (528,44,0)   End of file block 272 / Allocated 272

Virtual block number 1 (00000001), 512 (0200) bytes

```
00000000 00000C40 00000000 00000088 0000FFFF 00000004 00000110 01135A4D MZ..............|.......a....... 000000
00000080 00000000 00000000 00000000 00000000 00000000 00000000 00000000 ................................ 000020
6F6E6E61 63206061 72676F72 70207369 685421CD 4C01B821 CD09B400 0E8A1F0E ..¤..Ç.el|.LeIThis program canno 000040
00000000 00000024 0A0D0D2E 65646F6D 20534F44 206E6920 6E757220 65622074 t be run in DOS mode....$....... 000060
00070019 00000000 00172ADA 00000000 00198009 DA896983 024C0075 0505454E NE..u.L..i.Ö........Ö*.......... 000080
00000000 00000000 00010000 00040000 00001041 0AA10A93 01080108 00400048 H.a.......À.A................... 0000A0
18640F00 18640462 0F860F00 0F860363 16CE0F00 16CE01F0 00E60F00 00E60109 ..|...|.b.ö...ö.c.......b.d...d. 0000C0
08FC0F00 08FC0804 071E0F00 071E078C 02C80F00 02C8075C 12B40F00 12B40622 ".Ç...Ç.\.à...à...........•...•. 0000E0
05000F00 05000C41 0EEE0F00 0EEE0B4F 0A4E0F00 0A4E0AA7 1DA40F00 1DA408C8 à.Ê...Ê.I.N...N.O.Ÿ...Ÿ.A....... 000100
071C0F00 071C11A4 125C0F00 125C107B 11020F00 11020F67 2C7A0F00 2C7A0C97 ..z,..z,g.......(.\...\.É....... 000120
0AD80F00 0AD717E5 06C00F00 06C01773 31A60F00 31A6144F 233E0F00 233E1218 ..>#..>#O.||..||s.à...à.|.▪...Á. 000140
02000E21 00000000 42920F00 429218 1F 06640F00 06641AB4 21760F00 21761895 ..v!..v!Ç.d...d....B...B....!... 000160
00014544 4F4D434F 53534154 45534452 420F0000 44524203 2BB00F21 2A091F4F O..°!.¯+.BRD...BRDSETASSOCMODE.. 000180
4C485952 45555145 54554F52 44524212 00025241 454C4345 434E4546 44524200 .BRDFENCECLEAR...BRDROUTEQUERYHL 0001A0
52414554 44524218 00044449 52474145 52415952 45555144 52421000 03454E49 INE...BRDQUERYAREAGRID...BRDTEAR 0001C0
45545845 59524555 51445242 0E00054F 464E4952 45535559 52455551 504F5244 DROPQUERYUSERINFO...BRDQUERYEXTE 0001E0
```

Dump of file SATURN:[PCCOMMON.DUMP.DLL]BRDPLOW.TMP;1 on 18-APR-1990 10:38:06.00
File ID (528,44,0)   End of file block 272 / Allocated 272

Virtual block number 2 (00000002), 512 (0200) bytes

```
4F525445 53414552 41445242 13000743 4F535341 4E4E4F43 4452420C 0006544E NT...BRDCONNASSOC...BRDAREASETRO 000000
55494441 52455355 4F4D5952 4555514E 4E4F4344 52421700 08545349 44444E55 UNDDIST...BRDCONNQUERYMOUSERADIU 000020
4F524452 4213000A 4F464E49 52455355 59524555 51414552 41445242 14000953 S...BRDAREAQUERYUSERINFO...BRDRO 000040
4543414C 50455245 54554F52 44524211 0008544E 45545845 59524555 51455455 UTEQUERYEXTENT...BRDROUTEREPLACE 000060
43445242 12000044 49524745 54554F52 4F545450 50414E53 44524214 000C5450 PT...BRDSNAPPTTOROUTEGRID...BRDC 000080
5241454C 43534945 434E4546 4452420F 000E4F46 4E495245 53555445 534E4E4F ONNSETUSERINFO...BRDFENCEISCLEAR 0000A0
44524212 00104554 554F5259 42524145 4E454E49 4D524554 45444452 4217000F ...BRDDETERMINENEARBYROUTE...BRD 0000C0
49535952 4555514E 4E4F4344 52421000 11545245 564E4F43 54484749 41525453 STRAIGHTCONVERT...BRDCONNQUERYSI 0000E0
534E4E4F 43445242 10001341 45524159 52455551 4E4E4F43 44524210 00124544 DE...BRDCONNQUERYAREA...BRDCONNS 000100
0015544E 45545845 59524555 514C4542 414C4452 42130014 544E4554 58455445 ETEXTENT...BRDLABELQUERYEXTENT.. 000120
52455551 4554554F 52445242 15001645 44495354 46494853 41455241 44524210 .BRDAREASHIFTSIDE...BRDROUTEQUER 000140
53445242 13001843 4F535341 4554554F 52445242 0000174F 464E4952 45535559 YUSERINFO...BRDROUTEASSOC...BRDS 000160
42595245 55514543 4E454644 52421800 1945434E 41545349 44455455 4F525445 ETROUTEDISTANCE...BRDFENCEQUERYB 000180
44524211 001B4554 41455243 4E4E4F43 44524200 001A5453 49444B43 4150584F OXPACKDIST...BRDCONNCREATE...BRD 0001A0
554F5259 52455551 41455241 44524215 001C544E 554F4359 52455551 444E4946 FINDQUERYCOUNT...BRDAREAQUERYROU 0001C0
52421500 1E544E55 4F435952 45555145 54554F52 44524212 001D5453 4944444E NDDIST...BRDROUTEQUERYCOUNT...BR 0001E0
```

Dump of file SATURN:[PCCOMMON.DUMP.DLL]BRDPLOW.TMP;1 on 18-APR-1990 10:38:06.00
File ID (528,44,0)   End of file block 272 / Allocated 272

Virtual block number 3 (00000003), 512 (0200) bytes

```
55514543 4E4546-4 52421300 1F53544E 49415254 534E4F43 4543524F 464E4544 DENFORCECONSTRAINTS...BRDFENCEQU 000000
49474552 4E495354 43454A42 4F444E49 46445242 16002054 4E455458 45595245 ERYEXTENT ..BRDFINDOBJECTSINREGI 000020
44524219 00225355 49444152 4553554F 4D544553 4E4E4F43 44524215 00214E4F ONI..BRDCONNSETMOUSERADIUS"..BRD 000040
4542414C 44524215 00235354 4F4C5354 48474941 52545359 52455551 4E4E4F43 CONNQUERYSTRAIGHTSLOTS#..BRDLABE 000060
0025434F 5353414C 4542414C 4452420D 00244F46 4E495245 53555952 4555514C LQUERYUSERINFO$..BRDLABELASSOCX. 000080
45555144 52420C00 26504F52 44544859 52455551 504F5244 52414554 44524216 .BRDTEARDROPQUERYHTDROP&..BRDQUE 0000A0
4452420F 0028434F 53534944 504F5244 52414554 44524211 00274550 59545952 RYTYPE'..BRDTEARDROPDISSOC(..BRD 0000C0
4215002A 544E4952 5045434E 45464452 42000029 4D495254 54455345 54554F52 ROUTESETTRIM)..BRDFENCEPRINT*..B 0000E0
45444E4E 4F434452 4200002B 4D494444 4E4F4D41 49445445 53455455 4F524452 RDROUTESETDIAMONDDIM+..BRDCONNDE 000100
45555144 52421100 20545845 4E595245 5551444E 49464452 4210002C 4554454C LETE,..BRDFINDQUERYNEXT-..BRDQUE 000120
2F504145 48595245 55514543 4E454644 52421100 2E45444F 4D434F53 53415952 RYASSOCMODE...BRDFENCEQUERYHEAP/ 000140
43595245 55514554 554F5244 52421100 30435241 5445534E 4E4F4344 52420000 ..BRDCONNSETARC0..BRDROUTEQUERYC 000160
55514E4E 4F434452 42120032 45544145 52434554 554F5244 52420E00 314E4E4F ONN1..BRDROUTECREATE2..BRDCONNQU 000180
42110034 434F5353 41504F52 44524145 54445242 10003354 4E455458 45595245 ERYEXTENT3..BRDTEARDROPASSOC4..B 0001A0
54454C45 44455455 4F524452 420E0035 45544145 52435448 47494152 54534452 RDSTRAIGHTCREATE5..BRDROUTEDELET 0001C0
54505952 45555145 54554F52 4452420F 0037594F 52545345 44445242 0A003645 E6..BRDDESTROY7..BRDROUTEQUERYPT 0001E0
```

```
Dump of file SATURN:[PCCOMMON.DUMP.DLL]BRDPLOW.TMP;1 on 18-APR-1990 10:38:06.00
File ID (528,44,0)   End of file block 272 / Allocated 272

Virtual block number 4 (00000004), 512 (0200) bytes

 5145434E 45464452 421A0039 53544F4C 53595245 55514E4E 4F434452 42110038 8..BRDCONNQUERYSLOTS9..BRDFENCEQ 000000
 434F5353 414145?2 41445242 0C003A54 5349444B 43415045 434E4546 59524555 UERYFENCEPACKDIST:..BRDAREAASSOC 000020
 55514545 434E454. 44524200 003C4554 554F5250 554E4145 4C434452 420F003B ;..BRDCLEANUPROUTE<..BRDFENCEEQU 000040
 4F524452 41455444 52421600 3E454449 53544553 4E4E4F43 4452420E 00304C41 AL=..BRDCONNSETSIDE>..BRDTEARDRO 000060
 42150040 40494454 45534E4E 4F434452 4200003F 4F464E49 52455355 54455350 PSETUSERINFO?..BRDCONNSETDIM@..B 000080
 424F444E 49464452 42110041 45434E41 54534944 4554554F 52595245 55514452 RDQUERYROUTEDISTANCEA..BRDFINDOB 0000A0
 41445242 12004345 54414552 434C4542 414C4452 420E0042 54505441 5443454A JECTATPTB..BRDLABELCREATEC..BRDA 0000C0
 11004559 504F4345 434E4546 4452420C 00444F46 4E495245 53555445 53414552 REASETUSERINFOD..BRDFENCECOPYE.. 0000E0
 59524555 514E4E4F 43445242 14004644 49524745 54554F52 59524555 51445242 BRDQUERYROUTEGRIDF..BRDCONNQUERY 000100
 46445242 10004844 49524741 45524154 45534452 420E0047 4F464E49 52455355 USERINFOG..BRDSETAREAGRIDH..BRDF 000120
 13004A45 54454C45 444C4542 414C4452 420E0049 444E454E 4F494745 52444E49 INDREGIONENDI..BRDLABELDELETEJ.. 000140
 45555141 45524144 52421200 48444952 47414552 414F5454 5050414E 53445242 BRDSNAPPTTOAREAGRIDK..BRDAREAQUE 000160
 4211004D 52545441 59524555 51455455 4F524452 4211004C 45444953 54505952 RYPTSIDEL..BRDROUTEQUERYATTRM..B 000180
 59524555 51455455 4F524452 4217004E 4554554F 52595245 55514E4E 4F434452 RDCONNQUERYROUTEN..BRDROUTEQUERY 0001A0
 584F4246 49434C41 43455245 434E4546 4452421A 004F4D49 44444E4F 4D414944 DIAMONDDIMO..BRDFENCERECALCIFBOX 0001C0
 0F005154 4E455241 50595245 55514C45 42414C44 52421300 50444556 4F4D4552 REMOVEDP..BRDLABELQUERYPARENTQ.. 0001E0

Dump of file SATURN:[PCCOMMON.DUMP.DLL]BRDPLOW.TMP;1 on 18-APR-1990 10:38:06.00
File ID (528,44,0)   End of file block 272 / Allocated 272

Virtual block number 5 (00000005), 512 (0200) bytes

 45564F4D 45524554 554F5244 52421000 52525454 41544553 4554554F 52445242 BRDROUTESETATTRR..BRDROUTEREMOVE 000000
 45524144 52421000 54545052 4F48434E 41544553 4E4E4F43 44524212 00535450 PTS..BRDCONNSETANCHORPTT..BRDARE 000020
 00564554 554F5242 55535452 45534E49 44524211 0055544E 45545845 54455341 ASETEXTENTU..BRDINSERTSUBROUTEV. 000040
 0E005845 564F4D4C 4542414C 4452420C 00575450 44444145 54554F52 4452420D .BRDROUTEADDPTW..BRDLABELMOVEX.. 000060
 4E494C59 504F4345 54554F52 44524210 0059584F 42444441 45434E45 46445242 BRDFENCEADDBOXY..BRDROUTECOPYLIN 000080
 504F5244 52414554 44524211 005B4554 41455243 45434E45 46445242 0E005A45 EZ..BRDFENCECREATE[..BRDTEARDROP 0000A0
 0F005D54 50524F48 434E4159 52455551 4E4E4F43 44524214 005C4554 41455243 CREATE\..BRDCONNQUERYANCHORPT].. 0000C0
 49524745 54554F52 54455344 52420F00 5E455059 544A424F 59524555 51445242 BRDQUERYOBJTYPE^..BRDSETROUTEGRI 0000E0
 59524555 514E4E4F 43445242 0F006045 54414552 43414552 41445242 00005F44 D_..BRDAREACREATE`..BRDCONNQUERY 000100
 554F5244 52420E00 62544E45 54584554 45534C45 42414C44 52421100 61435241 ARCa..BRDLABELSETEXTENTb..BRDROU 000120
 554F5244 52421100 6445564F 4D45434E 45464452 420C0063 434F5353 49444554 TEDISSOCc..BRDFENCEMOVEd..BRDROU 000140
 45464649 434C4143 45524543 4E454644 52421C00 65404952 54595245 55514554 TEQUERYTRIMe..BRDFENCERECALCIFFE 000160
 4F524454 48544553 504F5244 52414554 44524214 00664445 564F4D45 5245434E NCEREMOVEDf..BRDTEARDROPSETHTDRO 000180
 52445242 1300684D 4944574F 52524159 52455551 4554554F 52445242 15006750 Pg..BRDROUTEQUERYARROWDIMh..BRDR 0001A0
 45535554 45534554 554F5244 52421300 69404944 574F5252 41544553 4554554F OUTESETARROWDIMi..BRDROUTESETUSE 0001C0
 44504F52 44524145 54445242 11006845 54414552 43445242 09006A4F 464E4952 RINFOj..BRDCREATEk..BRDTEARDROPD 0001E0

Dump of file SATURN:[PCCOMMON.DUMP.DLL]BRDPLOW.TMP;1 on 18-APR-1990 10:38:06.00
File ID (528,44,0)   End of file block 272 / Allocated 272

Virtual block number 6 (00000006), 512 (0200) bytes

 45535445 53445242 1100604S 54454C45 44414552 41445242 00006C45 54454C45 ELETEl..BRDAREADELETEm..BRDSETSE 000000
 42414C44 52420E00 6F45564F 4D414552 41445242 0B006E52 4544524F 48435241 ARCHORDERn..BRDAREAMOVEo..BRDLAB 000020
 4E455458 45595245 5551504F 52445241 45544452 42160070 434F5353 49444C45 ELDISSOCp..BRDTEARDROPQUERYEXTEN 000040
 45464452 420F0072 4E4:4F43 59524555 51504F52 44524145 54445242 14007154 Tq..BRDTEARDROPQUERYCONNr..BRDFE 000060
 420C0074 40494459 52455551 4E4E4F43 4452420F 0073594F 52545345 44'5434E NCEDESTROYs..BRDCONNQUERYDIMt..B 000080
 544E4554 58455952 45555141 45524144 52421200 75455455 4F52444E 4946 452 RDFINDROUTEu..BRDAREAQUERYEXTENT 0000A0
 45534C45 42414C44 52421300 774E4E4F 43595245 55514145 52414452 4210u176 v..BRDAREAQUERYCONNw..BRDLABELSE 0000C0
 42110079 45434E45 46444441 45434E45 46445242 1000784F 464E4952 45535554 TUSERINFOx..BRDFENCEADDFENCEy..B 0000E0
 C702B902 32002F00 10000700 0100007A 45505954 59524555 51455455 4F524452 RDROUTEQUERYTYPEz......../.2.¿.ú 000100
 4C42434F 4C4C414D 4540004D 45400353 4C4C4143 534F4408 4E49574D 50050002 ...PMWIN.DOSCALLS.MEM.MEMALLOCBL 000120
 45544154 4F525450 50485300 50485303 48434F4C 42454552 46404540 0C48434F OCK.MEMFREEBLOCK.SHP.SHPPTROTATE 000140
 44495359 52455551 584F4250 48530F58 4F425345 53534F52 43584F42 50485310 .SHPBOXCROSSESBOX.SHPBOXQUERYSID 000160
 530C594F 52545345 44454E49 4C504853 0E455441 45524345 4E494C50 48530045 E.SHPLINECREATE.SHPLINEDESTROY.S 000180
 5048530F 54504543 414C5045 52454E49 4C504853 10545044 4441454E 494C5048 HPLINEADDPT.SHPLINEREPLACEPT.SHP 0001A0
 530E544E 554F4359 52455551 454E494C 50485311 54504556 4F404552 454E494C LINEREMOVEPT.SHPLINEQUERYCOUNT.S 0001C0
 544E4554 58455952 45555145 4E494C50 48531254 50595245 5551454E 494C5048 HPLINEQUERYPT.SHPLINEQUERYEXTENT 0001E0
```

```
Dump of file SATURN:[PCCOMMON.DUMP.DLL]BRDPLOW.TMP;1 on 18-APR-1990 10:38:06.00
File ID (528,44,0)   End of file block 272 / Allocated 272

Virtual block number 7 (00000007), 512 (0200) bytes

 49444D49 52545445 53454E49 4C504853 12525454 41544553 454E494C 5048530E .SHPLINESETATTR.SHPLINESETTRIMDI 000000
 59524555 51454E49 4C504853 14525454 41595245 5551454E 494C5048 53105453 ST.SHPLINEQUERYATTR.SHPLINEQUERY 000020
 54494E49 454E494C 50485311 59504F43 454E494C 50485308 54534944 4D495254 TRIMDIST.SHPLINECOPY.SHPLINEINIT 000040
 4E494C50 48531254 50545845 4E595245 5551454E 494C5048 53125450 5458454E NEXTPT.SHPLINEQUERYNEXTPT.SHPLIN 000060
 4944574F 52524159 52455551 454E494C 50485314 4D494457 4F525241 54455345 ESETARROWDIM.SHPLINEQUERYARROWDI 000080
 5551454E 494C5048 53164D49 44444E4F 4D414944 54455345 4E494C50 4853144D M.SHPLINESETDIAMONDDIM.SHPLINEQU 0000A0
 5310584F 4253455s 534F5243 47455350 4853104D 4944444E 4F4D4149 44595245 ERYDIAMONDDIM.SHPSEGCROSSESBOX.S 0000C0
 45535245 544E4958 4F424745 53504853 18474553 53455353 4F524347 45535048 HPSEGCROSSESSEG.SHPSEGBOXINTERSE 0000E0
 54504853 13545054 52415453 54455350 4F524454 50485312 5354504E 4F495443 CTIONPTS.SHPTDROPSETSTARTPT.SHPT 000100
 13545355 4A544553 504F5244 54504853 0F535549 44415259 52455551 504F5244 DROPQUERYRADIUS.SHPTDROPSETJUST. 000120
 59524555 51404744 15404744 03544E45 54584559 52455551 504F5244 54504853 SHPTDROPQUERYEXTENT.DGM.DGMQUERY 000140
 4E454554 554F5245 52594252 41454E40 47441354 4E455458 45404152 47414944 DIAGRAMEXTENT.DGMNEARBYREROUTEEN 000160
 50414548 59524555 51404744 0C455455 4F524255 53545245 534E494D 47441144 D.DGMINSERTSUBROUTE.DGMQUERYHEAP 000180
 08525450 4553554F 4D595245 55514D47 44104452 414F4259 52455551 4D474400 .DGMQUERYBOARD.DGMQUERYMOUSEPTR. 0001A0
 44094742 44035254 50455355 4F4D5445 534D4744 0E445241 4F425445 534D4744 DGMSETBOARD.DGMSETMOUSEPTR.DBG.D 0001C0
 01036E03 0E01035C 03010145 54495257 534F4408 4F495303 54524553 53414742 BGASSERT.SIO.DOSWRITE...\....n.. 0001E0

Dump of file SATURN:[PCCOMMON.DUMP.DLL]BRDPLOW.TMP;1 on 18-APR-1990 10:38:06.00
File ID (528,44,0)   End of file block 272 / Allocated 272

Virtual block number 8 (00000008), 512 (0200) bytes

 0303010C C3030201 02FF0303 01041103 01010403 03070101 26031001 05340305 ..4....&....................û.... 000000
 000103EF 030E010E 19030301 04000310 0107E403 0CAD0305 0205C103 02010A17 .....è....ù..ð..............ÿ... 000020
 03050210 28030201 08470308 01060803 0E87030A 96030303 005A0306 0106D103 .1....Z...............G....+.... 000040
 05010E39 03020105 22030001 00000303 0100F403 0E010202 03100102 820304EB $.......ô....¶.........."....9... 000060
 0306C003 08020505 0309E003 03020311 03000104 70030E01 04E30301 01061C03 ......D....p.........À.......à.. 000080
 08E70305 010F9203 0E010A71 03050103 02030701 03030301 01047903 07010487 .....y..............q.........Ó. 0000A0
 0003000E 0305020A D7030301 0430030E 01038703 0101055F 03000101 65030301 ...e...._....ñ....0....■........ 0000C0
 0106A703 050101C7 03010101 74030501 00000306 01021203 0701064B 03030100 ....K..............t....ú....Î.. 0000E0
 0307010A 54030301 0256030E 01000003 12010340 0302010C 89030E01 04C40303 ..Å....¿....ä..........V....T.... 000100
 0158030E 01060003 02010000 03080100 00030001 03840310 01054603 03010302 ●....F..........................[. 000120
 11010594 03100104 04030801 061C0300 01009503 10010E4A 03030102 45031001 ...E....J....................... 000140
 9A030502 09710308 01080703 0E010C4A 0305010E C4030301 0A000305 01010C03 .É..........Å....J..........q..... 000160
 030E0108 8C030801 07280305 01075403 00010633 0302010C 46030301 08F00309 ..Þ....F....3....T....+......... 000180
 01840310 01094F03 0°0100CF 03030100 00030701 0000030E 01057D03 050107FB «....)..............ü....O....Ç. 0001A0
 0E010ACE 03050105 22030E01 03830305 0106FD03 08010819 03030100 0^^30201 ...............»....°....".....ö... 0001C0
 03020101 26030701 00000301 0104AE03 082D0308 8A030503 04400307 01U·2703 .'....ä.......-..Û.........&.... 0001E0

Dump of file SATURN:[PCCOMMON.DUMP.DLL]BRDPLOW.TMP;1 on 18-APR-1990 10:38:06.00
File ID (528,44,0)   End of file block 272 / Allocated 272

Virtual block number 9 (00000009), 512 (0200) bytes

 030100AF 030E0105 170304B6 03070205 A4030801 0F1C0302 01087303 00010205 .....s..........£....ñ........£... 000000
 00008503 05010681 030E0106 8F030801 0E7D030B 87030202 00000313 0105C403 .Ä..........ñ..)................. 000020
 20746867 69727970 6F432029 63282060 65747379 73627553 20647261 6F424400 .DBoard Subsystem (c) Copyright  000040
 73606574 73795320 6E6F6974 6160726F 666E4920 6E616068 63614220 39383931 1989 Bachman Information Systems 000060
 080C4688 088EFFFF 881E5657 00000AC8 00000000 00000000 00002E63 6E49202C , Inc............à...WV.¡...Ä.F.. 000080
 76FF0192 E98DF388 06750846 08064688 087F020A 7E830E7C 010A7E83 14740E46 F.t..-..|..-.....F..F.u.¡µ.Õ...v 0000A0
 FA76FF00 00FFFF9A 5016FA46 800C76FF 0E76FF00 0001889A 006A006A 0C76FF0E ..v.j.j..¡....v..v..F°.P......v° 0000C0
 42BEFB88 F65EC401 57E98DF2 880674C0 08000001 5B9A5016 F6468000 8E680E6A j.h...F-.P.[....àt.¡·.ÕW.á^-.«ƒB 0000E0
 4688FA76 FF7375C0 08009C00 009A5052 000805C2 8CC388FA 76FFA5F2 0047B900 .¿G.·É.v°.û.ô...RP......áus.v°.F 000100
 50520010 05F85688 F64688FA 76FF5C75 C00B00B3 00009A50 52000C05 F85688F6 -.V½...RP...°..âu\.v°.F-.V½...RP 000120
 2E75C008 00E10000 9A505200 1405F856 88F64688 FA76FF45 75C00800 CA00009A ...ò..âuE.v°.F-.V½...RP...Ä..âu. 000140
 F85688F6 4688FA76 FF1775C0 0800F800 009A5052 001805F8 5688F646 88FA76FF .v°.F-.V½...RP...½..âu..v°.F-.V½ 000160
 E980F288 00000160 9AF676FF F876FFFA 76FF1474 C008FFFF 00009A50 52001C05 ...RP......ât..v°.v½.v-.■...¡·.Õ 000180
 88F65EC4 04578926 02478926 0E56880C 4688F65E C4078926 0A4688F6 5EC400AE Û.á^-.F.&..á^-.F..V.&.G.&.W.á^-. 0001A0
 FA76FF1F A5F20012 890A8E1E F088327F 80085688 064688F6 5EC40647 8926FA46 F°&.G.á^-.F..V...2.Þ..Ö¿...E..v° 0001C0
 00FFFF9A F676FFF8 76FFFA76 FF1374C0 080000FF FF9A5016 FC468000 9A680E6A j.h...F•.P......ât..v°.v½.v-.... 0001E0
```

```
Dump of file SATURN:[PCCOMMON.DUMP.DLL]BRDPLOW.TMP;1 on 18-APR-1990 10:38:06.00
File ID (528,44,0)    End of file block 272 / Allocated 272

Virtual block number 10 (0000000A), 512 (0200) bytes

F8568BF6 46881FA5 F2004DB9 088E1E00 D08EF888 000888FC 5EC44AEB 8DF28800 .¡·.$J6^•¡...«/Å...Å¿M.·E..F-.V% 000000
76FF0E76 FF008697 89260084 878926FE 5688FC46 88F65EC4 04578926 02478926 &.G.&.W.6^-.F•.V±&.....&.....v..v 000020
8E017A88 1E000006 C8000ACA C95F5E1F 00E8C028 0000FFFF 9AF676FF F876FF0C ..v%.v-.....+àŠ..^_èò..à....¡z.. 000040
46890647 8826FA5E C400BDE9 8DF98806 75C208FC 5689FA46 89085688 06468808 Å.F..V..F•.V•.6u.¡¯.Õ§.6^•&.G..F 000060
00689A0C 77FF260E 77FF26FA 5EC46475 C0080210 00689A08 77FF260A 77FF26FE ±&.w.&.w..h....àud6^•&.w.&.w..h. 000080
77FF26FA 5EC43C75 C0090238 00689A14 77FF2616 77FF26FA 5EC45075 C0080224 $..àuP6^•&.w.&.w..h.8..àu<6^•&.w 0000A0
C0080260 00689A18 77FF261A 77FF26FA 5EC42875 C008024C 00689A10 77FF2612 .&.w..h.L..àu(6^•&.w.&.w..h.'..à 0000C0
5EC4FE76 FF39EB8D F2880574 C0080085 00689A1C 77FF261E 77FF26FA 5EC4:475 u.6^•&.w.&.w..h....àt.¡·.$9.v±6^ 0000E0
FFFC76FF FE76FF1B EB8DF288 0574C008 00000293 9A0084B7 FF260086 B7FF26FA •&.ñ..&.ñ........àt.¡·.Š..v±.v•. 000100
CD881E00 0008C800 04CAC91F 00E8C028 04E88DF2 880574C0 08000001 089AFA76 v•......àt.¡·.Š.+àŠ..èò..à....¡ë 000120
FF0A76FF 32E88DF3 88057E02 067E8306 7C01067E 830C740A 46080846 88D88E01 ..Ä.F..F.t..-..|..-..-.¡µ.$2.v.. 000140
EB8DF988 0575D008 FA5689F8 4689FE56 88FC4688 0000FFFF 9A5016FC 46800876 v..F•.P......F•.V±.F%.V•.Åu.¡•.Š 000160
0A468808 8E02AF88 1E000008 C80006CA C91F00EB C0280789 26064688 FC5EC400 .6^•.F.&..+àŠ..èò..à....¡£..Å.F. 000180
02D89A50 16FC468D 0A76FF0C 76FF35E8 8DF38805 75084608 06468808 740C4608 .F.t..F..F.u.¡µ.$5.v..v..F•.P.Ä. 0001A0
065EC407 8826F85E C410E88D F9880575 D008FA56 89F84689 FE5688FC 46880000 ...F•.V±.F%.V•.Åu.¡•.Š.6^%&..6^. 0001C0
7E830C74 0A460808 46880888E 0309881E 000008C8 0008CAC9 1F00E8C0 28078926 &..+àŠ..èò..à....¡...Ä.F..F.t..~ 0001E0

Dump of file SATURN:[PCCOMMON.DUMP.DLL]BRDPLOW.TMP;1 on 18-APR-1990 10:38:06.00
File ID (528,44,0)    End of file block 272 / Allocated 272

Virtual block number 11 (0000000B), 512 (0200) bytes

88000003 2E9A5016 FC468008 76FF0A76 FF33E88D F388057E 01067E83 067C0006 ..|..~..~.¡µ.$3.v..v..F•.P...... 000000
C0287647 89260646 88F85EC4 0EE88DF9 88057500 08FA5689 F84689FE 5688FC46 F•.V±.F%.V•.Åu.¡•.Š.6^%.F.&.Gv+à 000020
75084608 06468808 740C4608 0A468808 8E036288 1E000008 C80006CA C91F00E8 Š..èò..à....¡b..Ä.F..F.t..F..F.u 000040
89F84689 FE5688FC 46880000 03889A50 16FC468D 0A76FF0C 76FF36E8 8DF38805 .¡µ.Š6.v..v..F•.P......F•.V±.F%. 000060
08CAC91F 00E8C028 07892606 5EC47647 8826F85E C411E88D F9880575 D008FA56 V•.Åu.¡•.Š.6^%&.Gv6^.&..+àŠ..èò. 000080
08460806 46880874 0C46080A 46880000 F646C7D8 8E038D88 1E565700 000AC800 .à...WV.¡§..ÄúF-...F..F.t..F..F. 0000A0
4689FE56 88FC4688 000003E2 9A5016FC 46800A76 FF0C76FF 00A4E98D F3880675 u.¡µ.ÕÉ..v..v..F•.P.ã....F•.V±.F 0000C0
C4016A50 52002205 FA5688F8 46885016 F6468D7F E88DF988 0575D008 FA5689F8 %.V•.Åu.¡•.$..F-.P.F%.V•.".RPj.6 0000E0
187400F6 7E8352E8 8DF18805 74C0080E C48305CC E80E0877 FF260A77 FF26F85E ^%&.w.&.w..Öä..6..àt.¡þ.ŠR.--.t. 000100
C028065E C42DE81F A5F20008 890A8E1E F088F888 002205FA 5688F846 88065EC4 6^..F%.V•."..«.Þ..Õ¿..·E.$-6^.+à 000120
065EC408 4789260A 47892606 5EC40447 89260647 8926065E C4078926 02478926 &.G.&..6^.&.G.&.G.6^.&.G.&.G.6^. 000140
88088E04 19881E56 5700004E C80008CA C95F5E1F 00E8C028 0C478926 0E478926 &.G.&.G.+àŠ..^_èò..àN..WV.¡...Ä. 000160
F8468800 0004449A 5016F846 8D1676FF 1876FF04 4BE98DF3 88067518 46081646 F..F.u.¡µ.ÕK..v..v..F%.P.D....F% 000180
17E9C028 0575023F 8326DE5E C40425E9 8DF98806 75D008E0 56890E46 89FA5688 .V•.F8.VÅ.Åu.¡•.ÕX.6^8&.?.u.+àÕ. 0001A0
006A026A 1676FF18 76FF0000 FFFF9A50 16E6468D 50168E46 8D1676FF 1876FF04 ..v..v..Ff.P.Fî.P......v..v.j.j. 0001C0
890A5788 26084788 260E5EC4 E45689E2 46890032 05E05688 DE468800 00FFFF9A ......F8.VÅ.2..Fã.V06^8&.G.&.W.. 0001E0

Dump of file SATURN:[PCCOMMON.DUMP.DLL]BRDPLOW.TMP;1 on 18-APR-1990 10:38:06.00
File ID (528,44,0)    End of file block 272 / Allocated 272

Virtual block number 12 (0000000C), 512 (0200) bytes

880A4689 C02802E8 00018805 74084608 06468800 740C4608 0A4688FE 5689FC46 F•.V±.F..F.t..F..F.t.¡..Š.+à.FÖ. 000000
16C0468D 00000846 C7C65689 C4468910 56880E46 88C25689 C0468914 56881246 F..V..Fà.Vò.F..V..F6.VÓúFÄ...Fà. 000020
FE76FFE2 76FFE476 FF50160C 46805016 E8468000 6A08C483 FFFF0216 9A530650 P.S......6.j..FÒ.P.FÉ.P.vÒ.vã.v± 000040
76FFE476 FF006A04 C483FFFF 04CF9A0E 76FFE076 FF12C483 FFFF02C6 9AFC76FF .v•.6....6..vÅ.vñ.ü....6.j..vÒ.v 000060
83FFFF05 C89AFC76 FFFE76FF 5016C046 8D0AC483 FFFF0000 9AFC76FF FE76FFE2 ã.v±.v•......6..Fà.P.v±.v•.à.... 000080
88265076 01207F83 26077F66 7C00227F 8326E25E C402D3E9 0375000B 7E8308C4 6..~Å.u.Õ«.6^ã&..".|f..&.. .v]&. 0000A0
4688825E C484568C 824689C8 46808856 89864689 000A8300 01202257 88262047 G &.W"-...Ö..FÑ.V¡.Fà.Fý.VÇ6^ý.F 0000C0
88864688 825EC406 57192604 47292688 56888646 88825EC4 02571926 07292686 Ñ&).&.W.6^ý.FÑ.V¡&)G.&.W.6^ý.FÑ. 0000E0
F8880A5E C40E5711 260C4701 26885688 86468882 5EC40A57 11260847 01268856 V¡&.G.&.W.6^ý.FÑ.V¡&.G.&.W.6^..« 000100
8A468900 5E05E056 880E4688 000107C7 26065EC4 1FA5F200 08891F16 1EC8768D .và...¿..·E.6^.&ú....F8.VÅ.^..F¤ 000120
0277FF26 825EC437 FF260277 FF268A5E C4845689 8246890C 56880A46 888C5689 .V¥.F..V..Fý.VÇ6^¤&.w.&.76^ý&.w. 000140
57882607 8826825E C40C74C0 08C02802 E8000188 0575000B 07030130 9A37FF26 &.7.0....Åu.¡..Š.+à.àt.6^ý&..&.W 000160
06C79A07 1002C39A 8A5EC407 0802C39A 825EC437 FF260277 FF268A5E C444E802 .$D6^¤&.w.&.76^ý.û...6^¤.û....ú. 000180
073504A6 9A072E02 569AD888 08C48307 29078E9A 071F03EF 9ADC8808 EC83071A ...&..É.ÿ..../.)..6..Ä.V....Î.5. 0001A0
26825EC4 0477FF26 0677FF26 8A5EC402 57892607 8926825E C4075A00 FC9A5052 RP.•.Z.6^ý&..&.W.6^¤&.w.&.w.6^ý& 0001C0
8826825E C40D74C0 08C02802 E8000188 0575000B 07810130 9A0477FF 260677FF .w.&.w..0....Åu.¡..Š.+à.àt.6^ý&. 0001E0
```

```
Dump of file SATURN:[PCCOMMON.DUMP.DLL]BRDPLOW.TMP;1 on 18-APR-1990 10:38:06.00
File ID (528,44,0)   End of file block 272 / Allocated 272

Virtual block number 13 (0000000D), 512 (0200) bytes

 C79A0791 02C39A04 5F8D8A5E C4078C02 C39A045F 8D825EC4 4BE80657 88260447 G.&.W.ŠKá^ý._..ù...á^¤._..û....ú 000000
 C104A69A 07AF0256 9AD88808 C48307AA 078E9A07 A003EF9A DC8808EC 83079806 ....š..É.ÿ.-.-ƒ.¯..á..Ä.V.£..Ì.è 000020
 46880657 89260447 8926825E C407F400 FC9A0477 FF260677 FF268A5E C4505207 .RPá^¤&.w.&.w..=.¶.á^ý&.G.&.W..F 000040
 FF260277 FF26825E C437FF26 0277FF26 8A5EC484 56898246 89000805 0C56880A ..V.....Fý.VÇá^¤&.w.&.7á^ý&.w.&. 000060
 E802578B 26078826 825EC40C 74C008C0 2802E800 01880575 D0080821 01309A37 7.0.!..Âu.¡..Š.+à.ât.á^ý&..&.W.Š 000080
 083806C7 9A082E02 C39ABA5E C4082902 C39AB25E C437FF26 0277FF26 8A5EC444 Dá^¤&.w.&.7á^ý.ù.).á^¤.ù....ú.8. 0000A0
 50520853 04A69A08 4C02569A D88808C4 83084707 CE9A083D 03EF9ADC 8808EC83 .š..É.ÿ.=..ö.G..á..Ä.V.L..Ì.S.RP 0000C0
 77FF2682 5EC40477 FF260677 FF268A5E C4025789 26078926 825EC408 7800FC9A .=.x.á^ý&..&.W.á^¤&.w.&.w.á^ý&.w 0000E0
 04478826 825EC400 74C008C0 2802E800 01880575 D008089F 01309A04 77FF2606 .&.w..O....Âu.¡..Š.+à.ât.á^ý&.G. 000100
 8906C79A 08AF02C3 9A045F8D 8A5EC408 AA02C39A 045F80B2 5EC448E8 06578826 &.W.ŠKá^ý._..ù.`.á^¤._..ù.£..ú.¿ 000120
 5208DF04 A69A08CD 02569AD8 8808C483 08C807CE 9A088E03 EF9ADC88 08EC8308 ..š..É.ÿ.ƒ¯..ö.à..á..Ā¯V.ë..Ì.Ô.R 000140
 468845E8 06578926 04478926 825EC4FF FF00FC9A 0477FF26 0677FF26 8A5EC450 Pá^¤&.w.&.w..=...á^ý&.G.&.W.ŠE.F 000160
 0A5EC404 47892606 4789260A 5EC40789 26024789 26C0280A 5EC42D74 0C46080A ..F.t-á^.+á&.G.&..á^.&.G.&.G.á^. 000180
 C726065E C4087408 46080646 880C4789 260E4789 260A5EC4 08478926 0A478926 &.G.&.G.á^.&.G.&.G..F..F.t.á^.&ú 0001A0
 C80014CA C95F5E1F 00E8C028 00000551 9AE676FF BE76FF16 76FF1876 FF000007 ....v..v..v/.vÌ.Q...+áŠ..^_èò..à 0001C0
 7408460B 06468815 7508460B 06468808 740C4608 0A4688D8 8E04E888 1E000002 ....¡Š..Ä.F..F.t..F..F.u..F̄..F.t 0001E0

Dump of file SATURN:[PCCOMMON.DUMP.DLL]BRDPLOW.TMP;1 on 18-APR-1990 10:38:06.00
File ID (528,44,0)   End of file block 272 / Allocated 272

Virtual block number 14 (0000000E), 512 (0200) bytes

 027F0007 30077CC0 08FE4689 0788260A 5EC420EB 8DF38800 0007C726 065EC408 .á^.&ú...¡µ.Š á^.&...F±.á|.=.... 000000
 C4088E09 55881E56 57000000 C80008CA C91F00EB C0280789 26065EC4 C02802EB Š.+áá^.&..+áŠ..èò..à...WV.¡U..Äá 000020
 5EC41FA5 F2000889 DA8E1EF0 88F8880C 56880A46 880E5EC4 2075003F 8326065E ^.&.7.u á^..F..V..«.Þ..Ö¿..·É.á^ 000040
 CBC95F5E 1F08C483 032CE80E 0A76FF0C 76FF0E76 FF1076FF 13E80001 07C72606 .&ú...Š..v..v..v..v..Ò,..á..^_èù 000060
 800676FF 0876FF0A 1709C29A 006A006A 0676FF08 76FFD88E 09A8881E 000008C8 à....¡¨..Ä.v..v.j.j..ó....v..v̄.. 000080
 050A76FF 0C76FFFE 5689FC46 89FA5688 F8468826 75C00801 FC0A589A 5016F846 F½.P.X.▪..àu&.F½.V¹.F▪.V±.v..v.. 0000A0
 56570000 34C8C8C9 1F00E8C0 28C6E80C C483FF65 E8DE0E76 FF1076FF 5052000C ..RP.v..v..Òe..á.Šó+áŠ..èùá4..WV 0000C0
 5016E846 800676FF 0876FF0A 7309C29A 006A006A 0676FF08 76FFD88E 09F6881E .¡~..Ä.v..v.j.j..ó.s..v..v..FÒ.P 0000E0
 263E4788 26045EC4 D65689D4 4689EA56 88E84688 028FE903 74C0080A A90A589A .X.`..ât.Ö...FÒ.Võ.Fá.V▪á^á&.G>& 000100
 7C00E27E 830A0700 F09A5016 E0468050 DE76FF37 74D008DE 56890C46 8940578B .W∂.FÉ.VB.Ât7.vBP.FÀ.P.Þ....-à.| 000120
 79E80EDC 76FFDE76 FF006A0C 76FF0E76 FF1076FF 1276FF18 7400E07E 83067F23 #...-Â.t..v..v..v..v.j..vB.vÉ.Ðy 000140
 0008890A 8E1E0716 F088F07E 80001605 D65688D4 46885174 000A7E83 0EC483FF ..á..-..tQ.Fá.V▪....-Þ.Þ....Ö¿.. 000160
 8305FC46 8300F65E 8305F46E 8300FA56 8305F846 8300F25E 8305F06E 831FA5F2 ·É..nÞ..^·..F½..V¹..n¶..^-..F▪.. 000180
 76FF1276 FF0CC483 FE7BE80E 1076FF12 76FF5016 F04680DC 76FF0E76 FF00FE56 V±..v..v..FÞ.P.v..v..Ò(±.á..v..v 0001A0
 4477FF26 D45EC40C C483FEAA E80E6677 FF266877 FF26D45E C40C76FF 0E76FF10 ..v..v.á^á&.wh&.wf.Ò`±.á.á^á&.wD 0001C0
 0A589A50 16D8468D 4277FF26 4477FF26 D45EC408 7009C29A 006A006A 4277FF26 &.wBj.j..ó.p.á^á&.wD&.wB.FA.P.X. 0001E0

Dump of file SATURN:[PCCOMMON.DUMP.DLL]BRDPLOW.TMP;1 on 18-APR-1990 10:38:06.00
File ID (528,44,0)   End of file block 272 / Allocated 272

Virtual block number 15 (0000000F), 512 (0200) bytes

 76FF0E76 FF187400 0A7E8302 56890046 890A5688 08468801 8FE90374 C00808D3 £..ât.Ò...FÀ.VÖ.FÀ.V∅.-..t..v..v 000000
 C40C76FF 0E76FF10 76FF1276 FF0CC483 FE03E80E 1076FF12 76FF5052 0036050C ..ó.RP.v..v..Ò.±.á..v..v..v..v.á 000020
 006A006A 4877FF26 4A77FF26 D05EC40C C483FE32 E80E5077 FF265277 FF26005E ^Â&.wR&.wP.Ò2±.á.á^Â&.wJ&.wHj.j. 000040
 14E90374 C0080A63 0A589A50 16E4468D 4877FF26 4A77FF26 D05EC408 E809C29A .ô.Ò.á^Â&.wJ&.wH.FÒ.P.X.c..ât.Ò. 000060
 FF26CC5E C4CE5689 CC468902 57882607 8826E45E C400F1E9 06478826 E45EC401 .á^ô&.G.Ôþ.á^ô&..&.W..Fä.Voá^ä&. 000080
 1276FF50 16F046F  0C76FF0E 76FF0000 FFFF9A50 16F0468D 016A0677 FF260877 w.&.w.j..FÞ.P......v..v..FÞ.P.v. 0000A0
 77FF2628 77FF26CC 5EC40C76 FF0E76FF 1076FF12 76FF0CC4 83FD6CE8 0E1076FF .v..Òl».á..v..v..v..v.á^ä&.w(&.w 0000C0
 FF26EC5E C4EE5689 EC468902 57882607 8826E45E C400A7E9 0CC483FD 98E80E26 &.Ò.».á.ÒÌ.á^ô&..&.W..F&.VŸá^&&. 0000E0
 1276FF50 16F0468D 0C76FF0E 76FF0000 FFFF9A50 16F0468D 016A0677 FF260877 w.&.w.j..FÞ.P......v..v..FÞ.P.v. 000100
 77FF2626 77FF26EC 5EC40C76 FF0E76FF 1076FF12 76FF0CC4 83FD0CE8 0E1076FF .v..Ò.».á..v..v..v..v.á^&&.w&&.w 000120
 1076FF12 76FFCE56 89CC4689 02578826 078826E4 5EC448E8 0CC483FD 38E80E24 $.Ò;».á.ŠHá^ô&..&.W..Fä.Vö.v..v. 000140
 0375C00B 16E818E8 0CC483FD 08E80E26 77FF2628 77FF26CC 5EC40C76 FF0E76FF .v..v.á^ä&.w(&.w&.Ò.».á.Š.Š..àu. 000160
 1F00E8C0 28FD5AE9 FE55E9FE D0E900E8 FF58E903 7500023D C2740001 3DFF08E9 Ò..=..tô=..u.Ò[.Š.ÒÂ±ÒU±ÒZ»+áŠ.. 000180
 7C025739 260A5EC4 02578826 07882606 5EC4D88E 0A52881E 000000C8 CBC95F5E ^_èùà....¡R..Äá^.&..&.W.á^.&9W.| 0001A0
 26065EC4 02578926 0789260A 5EC40257 88260788 26065EC4 14760739 26057F18 .¯.&9.v.á^.&..&.W.á^.&..&.W.á^.& 0001C0
 26044788 26065EC4 16760447 3926067F 1E7C0657 39260A5E C4065788 26044788 .G.&.W.á^.&9W.|...&9G.v.á^.&.G.& 0001E0
```

```
Dump of file SATURN:[PCCOMMON.DUMP.DLL]BRDPLOW.TMP;1 on 18-APR-1990 10:38:06.00
File ID (528,44,0)   End of file block 272 / Allocated 272

Virtual block number 16 (00000010), 512 (0200) bytes

 0A573926 0A5EC4C4 57B82608 47B82606 5EC40657 89260447 89260A5E C4065788 .W.á^.&.G.&.W.á^.&.G.&.W.á^.&9W. 000000
 0A578926 08478926 0A5EC40A 57B82608 47B82606 5EC41673 08473926 067C1E7F ..|.&9G.s.á^.&.G.&.W.á^.&.G.&.W. 000020
 26065EC4 16730C47 3926067C 1E7F0E57 39260A5E C40E5788 260C4788 26065EC4 á^.&.G.&.W.á^.&9W...|.&9G.s.á^.& 000040
 02720005 00490203 001190C8 C91F0E57 89260C47 89260A5E C40E5788 260C4788 .G.&.W.á^.&.G.&.W..èu.....I...r. 000060
 00140003 005B0203 0000000A 06000002 027F0005 05090203 00000009 05060002 ..#......................[..... 000080
 021E0004 0C7E0203 00220003 027C0203 02800005 05420203 0000000C 05B60002 ..B.......B.......|...".....~..... 0000A0
 00000015 05FA0002 02AA0005 09400203 00000014 085B0002 029E0005 00390203 ..9.......[.......@...`...*..... 0000C0
 00CC0004 0C1E0203 00000019 001A0002 00000017 06D60002 00000016 05E40002 ..Ö.......#....................ä. 0000E0
 08064688 08740C46 080A4688 10741046 080E4688 D88EFFFF B81E5657 00002AC8 à*..WV.|...Ä.F..F.t..F..F.t..F.. 000100
 16FC468D 0E76FF10 76FF0789 26024789 26C02806 5EC40104 E980F388 06750846 F.u.|¤.Öà.á^.+á&.G.&...v..v..F•. 000120
 26E45EC4 01A2E980 F1880675 D008E656 89E44689 FE568BFC 46880000 FFFF9A50 P......F•.V±.FÖ.V|.Äu.|Þ.ÖÄ.á^Ö& 000140
 017EE980 F2880674 C0080000 FFFF9A50 160E468D 009A680E 6A50E246 89064788 .G..FäPj.h...F8.P......åt.|·.Õ~. 000160
 C0080083 00009A50 52003E05 C28CC388 E276FFA5 F2004D89 0000BEF8 88DE5EC4 á^8.«fÄ.¿M.·É.vâ.û.ô.>.RP...*..å 000180
 88DE4688 E276FF17 75C00800 CA00009A 50520042 05E05688 DE4688E2 76FF2E75 u..vâ.F8.VÄ.B.RP...ð..åu..vâ.FB. 0001A0
 07880000 FFFF9ADE 76FFE076 FFE276FF 1474C008 FFFF0000 9A505200 6605E056 VÄ.f.RP......åt..vâ.vÄ.v8.....|. 0001C0
 F65688F4 46881FA5 F2000889 DA8E1E07 16F088EC 7E800C56 880A4688 011AE98E .Õ...F..V..~$.Þ....Õ¿..·É..F¶.V~ 0001E0

Dump of file SATURN:[PCCOMMON.DUMP.DLL]BRDPLOW.TMP;1 on 18-APR-1990 10:38:06.00
File ID (528,44,0;   End of file block 272 / Allocated 272

Virtual block number 17 (00000011), 512 (0200) bytes

 4689F656 88F44688 DC56890A 4689EE56 88EC4688 2476EC46 39057F28 7CEE5639 9VŸ|+..9F$v$.F$.VŸ.FÖ.VÉ;F¶.V~.F 000000
 F0463905 7F2B7CF2 5639FA56 88F84688 F65689F4 46890C56 880A4688 EE5689EC &.VŸ.FÖ.VÉ.F¶.V~.F%.V•9V·|+..9FÞ 000020
 D85688D6 4688F256 89F04689 FA5688F8 46880856 89D64689 F25688F0 46882476 v$.FÞ.V·.F•.VÄ.F%.V•.FÞ.V·.F•.VÄ 000040
 EC768D06 7F80DE5E C4045789 26024789 26E65688 E44688DE 5EC4FA56 89F84689 .F%.V•á^8.FÖ.V|&.G.&.W.á^8....v& 000060
 7F80DE5E C41FA5F2 0008891F 161EEC76 8D167F80 DE5EC41F A5F20008 891F161E ...¿..·É.á^8....v&...¿..·É.á^8.. 000080
 1677FF26 E45EC4EA 5689E846 89E05688 DE46881F A5F20008 891F161E EC768D26 &.v&...¿..·É..F8.VÄ.FÖ.Võá^Ö&.w. 0000A0
 DE76FFE0 76FFE276 FF1374C0 08009C02 909A5052 006A016A 006A006A 1477FF26 &.w.j.j.j.j.RP......åt..vâ.vÄ.v8 0000C0
 5E1F00E8 C0280257 89260789 26EA5688 E8468806 5EC414E8 8E078800 0000DA9A .Ö...|..Š.á^..FÖ.VÖ&..&.W.+åŠ..^ 0000E0
 08468801 1EE980F3 8806750A 46080846 88088E00 08881E00 0014C800 0CCAC95F _èò..à....|...Ä.F..F.u.|¤.Õ...F. 000100
 3F8326FC 5EC4FE56 89FC4689 04578826 02478826 F85EC4FA 5689F846 890A5688 ¯V..F%.V•á^%&.G.&.W..F•.V±á^•&.? 000120
 0001008C 87C726F8 5EC400E5 E906C483 103BE80E F876FFFA 76FF0676 FF137502 .u..v..v•.v%.Ò;..á.Õ|.á^%&ú..... 000140
 F85EC402 9009C29A 006A006A 6677FF26 6877FF26 F85EC400 81E90375 00067E83 .~..u.ÕŸ.á^%&.wh&.wfj.j...ô...á^% 000160
 FF04049A EC76FFEE ~6FF0075 C0080285 0A589A50 16EC468D 6677FF26 6877FF26 &.wh&.wf.F$.P.X.ç..åu..vŸ.v$.... 000180
 FF264477 FF26F85E C402CA09 C29A006A 006A4277 FF264477 FF26F85E C4DAE8FF .ŠOá^%&.wO&.wBj.j..ó.ò.á^%&.wO&. 0001A0
 C408E8FF FF01659A 016AF076 FFF276FF 0F75C008 02F10A58 9A5016F0 46804277 w8.FÞ.P.X.þ..åu..v·.vÞj...e...ŠAå 0001C0
 46803E77 FF264077 FF26F85E C4030609 C29A006A 006A3E77 FF264077 FF26F85E ^%&.wO&.w>j.j..ô...á^%&.wO&.w>.F 0001E0

Dump of file SATURN:[PCCOMMON.DUMP.DLL]BRDPLOW.TMP;1 on 18-APR-1990 10:38:06.00
File ID (528,44,0)   End of file block 272 / Allocated 272

Virtual block number 18 (00000012), 512 (0200) bytes

 0876FF0A 76FFD9E8 FEEDE80E 016AF476 FFF676FF 0E75C008 01D10A58 9A5016F4 ¶.P.X.I..åu..v~.v¶j..ÒÜ±$).v..v. 000000
 0006CAC9 1F00E8C0 2804E88E 07880574 C00808C4 83FFFF04 4A9AFC76 FFFE76FF .v±.v•.J.....á..åt.|..Š.+åŠ..èò.. 000020
 46890E56 880C4688 0264E980 F3880675 0E46080C 4688088E 02088B1E 00001CC8 à....|...Ä.F..F.u.|¤.Õd..F..V..F 000040
 89C02818 750A4608 084688FA 5689F846 89045788 26024788 26F45EC4 F65689F4 ¶.V~á^¶&.G.&.W..F%.V•.F..F.u.+å. 000060
 46890A56 88084688 1DE8F256 89F04689 0A578826 08478826 F85EC4FC 4689FE46 F±.F•á^%&.G.&.W..FÞ.V·Š..F..V..F 000080
 5EC4000F E9037500 067E83F2 5689F046 89405788 263E4788 26FC5EC4 FE5689FC •.V±á^•&.G>&.W@.FÞ.V·.~..u.ÕÖ.á^ 0000A0
 C429740A 46080846 8801E5E9 8E008806 7400008C 8F832608 75000090 8F8326F4 ¶&.¢...u.&.¢...t.|..Õ|..F..F.t)á 0000C0
 C00808C4 83FFFF16 469A0C76 FF0E76FF 0876FF0A 76FF1875 00008C8F 8326FC5E ^•&.¢...u..v..v..v..v..F....á..á 0000E0
 7802909A 0C76FF0E 76FF006A 016A006A 006AF076 FFF276FF 0184E98E 00880674 t.|..ÒÇ..v·.vÞj.j.j.j..v..v....( 000100
 26F45EC4 3C578926 3A478926 0A568808 4688F45E C40191E9 8E078806 74C00802 ..åt.|..Õ..á^¶.F..V.&.G:&.W<á^¶& 000120
 091E9A50 16EC468D 0C76FF0E 76FF1477 FF261677 FF26F85E C4385789 26364789 .G6&.W8á^%&.w.&.w..v..v..F&.P... 000140
 6AEC76FF EÉ76FF14 77FF2616 77FF26F8 5EC41874 FFEE7E83 0675FFEC 7E830484 ...~&.u..~Ÿ.t.á^%&.u.&.w..vŸ.v&j 000160
 F45EC401 18E90001 009487C7 26F45EC4 00010090 87C726F4 5EC4041F 05D09A00 ..Å...á^¶&ü.....á^¶&ú.....Õ..á^¶ 000180
 9A5016E8 46800C76 FF0E76FF F076FFF2 76FF010E E98E0088 06750000 908F8326 &.¢...u.|..Õ...v·.vÞ.v..v..FÖ.P. 0001A0
 FFEA76FF F076FFF2 76FF00E6 E98E0788 0675FFEA 7E830C75 FFE87E83 04E7091E ..Ó..~Ò.u..~ō.u.|..Õ|..v·.vÞ.vō. 0001C0
 006A3E77 FF264077 FF26F45E C47E7501 767F8326 F85EC405 0505D09A 006AE876 vÒj..Å...á^%&..v.u~á^¶&.wO&.w>j. 0001E0
```

Dump of file SATURN:[PCCOMMON.DUMP.DLL]BRDPLOW.TMP;1 on 18-APR-1990 10:38:06.00
File ID (528,44,0)   End of file block 272 / Allocated 272

Virtual block number 19 (00000013), 512 (0200) bytes

5175C008 05390A58 9A5016E4 46803E77 FF264077 FF26F45E C4051A09 C29A006A j..ô...á^¶&.wà&.w>.Fô.P.X.9..âuA 000000
75FFE87E 83056309 1E9A5016 E8468DE4 76FFE676 FF3E77FF 264077FF 26F45EC4 á^¶&.wà&.w>.vl.vô.FÒ.P...c..~Ò.u 000020
E476FFE6 76FF006A 016A006A 006AF076 FFF276FF 70E88E07 B80575FF EA7E8308 ..~ö.u.¡..$p.v .vÞj.j.j.j..vl.vô 000040
C43C5789 263A4789 2699C028 F45EC496 E8000100 9487C726 E45EC405 A3029D9A ...È.á^ô&ú.....Š.á^¶+à.&.G:&.W<á 000060
0C76FF0E 76FF5001 6A505014 77FF2616 77FF26F8 5EC43857 89263647 8926F45E ^¶&.G6&.W8á^½&.w.&.w.PPj.P.v..v. 000080
0ACAC91F 00EBC028 00000090 87C726F4 5EC40EE8 8E078805 74C00804 6002909A ...'..àt.¡..Š.á^¶&ú.....+àŠ..èò. 0000A0
1BE88DF3 B80575 1 460B0646 8808740C 460B0A46 88D88E03 46881E00 0000C800 .à....¡F..Á.F..F.t..F..F.u.¡µ.Š. 0000C0
0008CAC9 1F00EB.. 2B025789 26078926 065EC400 88978B26 00868788 260A5EC4 á^.&....&....á^.&..&.W.+àŠ..èò.. 0000E0
08568806 46880A5E C417E880 F3880575 0C4608OA 4688D88E 05C7881E 000000C8 à....¡ú..Á.F..F.u.¡µ.Š.á^..F..V. 000100
88D88E06 06881E56 57000052 C80008CA C91F00E8 C02B0088 97892600 86878926 &....&....+àŠ..èò..àR..WV.¡...Á. 000120
5689CA46 890C5688 0A468805 58E98DF3 B8067508 460B0646 8808740C 460B0A46 F..F.t..F..F.u.¡µ.Ò(..F..V..Fò.V 000140
16F088EC 7E800856 88064688 0543E80E 50160A76 FF52E056 8CDE4689 CE4680CC ä.Fö.F8.VÁR.v..P.ÒC..F..V..~š.Þ. 000160
57392602 57882607 8826FC5E C4FE568C FC4689EC 468D1FA5 F2000889 DA8E1E07 ...Ö¿...È..Fš.F=.V±á^=&..&.W.&9W 000180
0A578826 08478826 84568982 46890257 88260788 262D7308 47392606 7C357F0A ..5|.&9G.s-&..&.W..Fÿ.VÇ&.G.&.W. 0001A0
260C4788 26FC5EC4 0A578926 08478926 84568882 4688FC5E C4025789 26078926 &..&.W.á^=.Fÿ.VÇ&.G.&.W.á^=&.G.& 0001C0
26805689 AE468906 57882604 4788262F 76044739 26067F37 7C065739 260E5788 .W.&9W.|7..&9G.v/&.G.&.W..FÛ.V‾& 0001E0

Dump of file SATURN:[PCCOMMON.DUMP.DLL]BRDPLOW.TMP;1 on 18-APR-1990 10:38:06.00
File ID (528,44,0)   End of file block 272 / Allocated 272

Virtual block number 20 (00000014), 512 (0200) bytes

0E578926 0C478926 805688AE 4688FC5E C4065789 26044789 260E5788 260C4788 .G.&.W.&.G.&.W.á^=.FÛ.V‾&.G.&.W. 000000
26084788 26FC5EC4 53750257 39265975 0739260E 5EC40257 88260788 26FC5EC4 á^=&..&.W.á^8&9.uY&9W.uSá^=&.G.& 000020
DE5EC406 57882604 478826FC 5EC43975 0A573926 3F750847 39260E5E C40A5788 .W.á^8&9G.u?&9W.u9á^=&.G.&.W.á^8 000040
08750C47 39260E5E C40E5788 260C4788 26FC5EC4 1F750657 39262575 04473926 &9G.uX&9W.u.á^=&.G.&.W.á^8&9G.u. 000060
FF0D149A 0676FF08 76FF5052 002605CC 5688CA46 880425E9 C02B0575 0E573926 &9W.u.+àÒX..Fò.Vä.&.RP.v..v..... 000080
77882608 4F8826FC 5EC40257 1B260728 260A5788 26084788 260E5EC4 08C483FF ..á.á^8&.G.&.W.&+.&.W.á^=&.O.&.w 0000A0
0739260E 5EC40257 88260788 26009CE9 0375D638 0775C138 02771826 0F2B260A .&+.&.w.;éu.;øu.Õ..&..&.W.á^8&9. 0000C0
5EC40A57 18260847 2B260E5E C40A5788 26084788 26FC5EC4 3A750257 39264075 uà&9W.u:á^=&.G.&.W.á^8&+G.&.W.á^ 0000E0
0A578926 08478926 FC5EC40A 57882608 4788260E 5EC40080 9711267E 470126CA ò&.G-&....á^8&.G.&.W.á^=&.G.&.W. 000100
26FC5EC4 33750A57 39263975 08473926 DE5EC40A 57882608 478826FC 5EC44DE8 ŠMá^=&.G.&.W.á^8&9G.u9&9W.u3á^=& 000120
88260E5E C4785711 26764701 26CA5EC4 02571826 07282600 5EC40257 88260788 ..&.W.á^8&+.&.W.á^ò&.Gv&.Wxá^8&. 000140
18260447 2B260E57 88260C47 88260E5E C4025789 26078926 FC5EC402 57882607 .&.W.á^=&..&.W.á^8&.G.&.W.&+G.&. 000160
00A3E903 75063807 75C13806 77182604 4F28260E 7788260C 4F8826FC 5EC40657 W.á^=&.O.&.w.&+O.&.w.;éu.;øu.ÒÈ. 000180
88260C47 8826FC5E C4387506 57392641 75044739 260E5EC4 06578826 04478826 &.G.&.V.á^8&9G.uA&9W.u;á^=&.G.&. 0001A0
4788260E 5EC40084 97112600 82870126 CA5EC40E 5718260C 4728260E 5EC40E57 W.á^8&+G.&.W.á^ò&....&....á^8&.G 0001C0
DE5EC40E 5788260C 478826FC 5EC451E8 0E578926 0C478926 FC5EC40E 5788260C .&.W.á^=&.G.&.W.ŠQá^=&.G.&.W.á^8 0001E0

Dump of file SATURN:[PCCOMMON.DUMP.DLL]BRDPLOW.TMP;1 on 18-APR-1990 10:38:06.00
File ID (528,44,0)   End of file block 272 / Allocated 272

Virtual block number 21 (00000015), 512 (0200) bytes 18260447 2826DE5E C4065788 26044788 26FC5EC4 37750E57 39263075 0C473926 &9G.u=&9W.u7á^=&.G.&.W.á^8&+G.&. 000000
26044789 26FC5EC4 06578826 04478826 DE5EC47C 5711267A 470126CA 5EC40657 W.á^ò&.Gz&.W|á^8&.G.&.W.á^=&.G.& 000020
09820060 9A505202 57132607 03260A57 88260847 8826DE5E C4026A00 6A065789 .W.j.j.á^8&.G.&.W.&..&.W.RP.'... 000040
9A50520E 5713260C 47032606 57882604 4788260E 5EC4026A 006A8856 89864689 .FÑ.V¡j.j.á^8&.G.&.W.&.G.&.W.RP. 000060
02571326 0703260A 57882608 478826FC 5EC4026A 006A8C56 898A4689 09A50060 '.È..Fa.V¥j.j.á^=&.G.&.W.&..&.W. 000080
0C470326 06578826 04478826 FC5EC402 6A006AE6 5689E446 8909C900 609A5052 RP.'.è..Fô.V|j.j.á^=&.G.&.W.&.G. 0000A0
8E468988 56188646 28E65688 E44688EA 5689E846 89FFFF00 609A5052 0E571326 &.W.RP.'....FÒ.Vö.Fô.Vl+FÑ.V¡.Fƒ 0000C0
C2468807 75C0460B 8E4688C4 5689C246 898C5618 8A4628EA 5688E846 88C05689 .Vä.FÒ.Vö+Fa.V¥.Fô.Vá.Fƒ.Fâu..Fô 0000E0
26070126 C05688BE 46[illegible]BC65E C4C85689 C6468900 6E05CC56 88CA4688 7374C208 .ôts.Fò.Vä.n..Fó.Vàá^ó.Fƒ.Vá&..& 000100
070126C0 56888E46 88DE5EC4 06571126 04470126 C45688C2 4688C65E C4[illegible]5711 .W.á^ó.Fô.Vá&.G.&.W.á^8.Fƒ.Vá&.. 000120
0126C056 888E4688 DE5EC406 57112604 470126C4 5688C246 88DE5EC4 025[illegible]126 &.W.á^8.Fô.Vá&.G.&.W.á^8.Fƒ.Vá&. 000140
57882607 8826FC5E C40E5711 260C4701 26C45688 C24688DE 5EC40A57 1126[illegible]47 G.&.W.á^8.Fô.Vá&.G.&.W.á^=&..&.W 000160
4739260E 5EC40A57 88260847 8826FC5E C4517502 57392657 75073926 DE5EC402 .á^8&9.uW&9W.uQá^=&.G.&.W.á^8&9G 000180
57392623 75044739 260E5EC4 06578826 04478826 FC5EC437 750A5739 263D7508 .u=&9W.u7á^=&.G.&.W.á^8&9G.uW&9W 0001A0
00C2E903 750E5739 2609750C 4739260E 5EC40E57 88260C47 8826FC5E C41D7506 .u.á^=&.G.&.W.á^8&9G.u.&9W.u.Òò. 0001C0
26078826 FC5EC400 8EE9E246 8800AFE9 037C04E2 7E83E246 FF03E800 00E246C7 úFâ..Š..Fã.~ã.|.ÒÈ..FãÒ..á^=&..& 0001E0

```
Dump of file SATURN:[PCCOMMON.DUMP.DLL]BRDPLOW.TMP;1 on 18-APR-1990 10:38:06.00
File ID (528,44,0)   End of file block 272 / Allocated 272

Virtual block number 22 (00000016), 512 (0200) bytes

 8826FC5E C40084E9 78571126 76470126 CA5EC402 571B2607 2826DE5E C4025788 .W.á^B&+.&.W.á^ò&.Gv&.WxÕ..á^=&. 000000
 5EC461EB 7C571126 7A470126 CA5EC406 571B2604 472B26DE 5EC40657 88260447 G.&.W.á^B&+G.&.W.á^ò&.Gz&.W|Šaá^ 000020
 00809711 267E4701 26CA5EC4 0A571B26 08472B26 DE5EC40A 57882608 478826FC •&.G.&.W.á^B&+G.&.W.á^ò&.G-&.... 000040
 00828701 26CA5EC4 0E571B26 0C472B26 DE5EC40E 5788260C 478826FC 5EC43DEB Š=á^•&.G.&.W.á^B&+G.&.W.á^ò&.... 000060
 E900EBA1 7400033D FF61E903 7500023D D2740001 309074C0 0818EB00 84971126 &....Š..àt.=..tØ=..u.Òa.=..tÀŠ.Ô 000080
 38881E56 57000008 C80008CA C95F5E1F 00EBC028 00010094 87C726CA 5EC4FF45 E.á^ò&ú.....+àŠ..^_èò..à...WV.¡; 0000A0
 D8E98DF3 88067508 46080646 880874C2 08FE5689 FC46890C 56880A46 88D88E06 ..Ä.F..V..F•.Vx.ôt..F..F.u.¡µ.ÔÛ 0000C0
 478826FC 5EC41FA5 F2000889 DA8E1EF0 88F88800 1605FE56 88FC4688 065EC400 .á^..F•.Vx....«.Þ..Ö¿..·É.á^•&.G 0000E0
 47012606 5EC47C57 88267A47 8826FC5E C4025711 26070126 065EC478 57882676 v&.Wxá^.&..&.W.á^•&.Gz&.W|á^.&.G 000100
 26FC5EC4 0A571126 08470126 065EC400 80978826 7E478826 FC5EC406 57112604 .&.W.á^•&.G~&....á^.&.G.&.W.á^•& 000120
 F8468900 6E05FE56 88FC4688 0E571126 0C470126 065EC400 84978826 00828788 ....&....á^.&.G.&.W..F•.Vx.n..F½ 000140
 88260447 8826F85E C4025711 26070126 065EC402 57882607 8826F85E C4FA5689 .V•á^½&..&.W.á^.&..&.W.á^½&.G.&. 000160
 11260847 0126065E C4025788 26078826 F85EC406 57112604 47012606 5EC40657 W.á^.&.G.&.W.á^½&..&.W.á^.&.G.&. 000180
 C95F5E1F 00E8C028 0E571126 0C470126 065EC406 57882604 478826F8 5EC40A57 W.á^½&.G.&.W.á^.&.G.&.W.+àŠ..^_è 0001A0
 065EC411 74084608 06468819 740C4608 0A4688D8 8E088F88 1E00000C C80008CA ò..à....¡¢..Ä.F..F.t..F..F.t.á^. 0001C0
 FA5689F8 46890C56 880A4688 0140E98D F388067D 00067F83 26077C00 027F8326 &....|.&....).¡µ.Ôa..F..V..F½.V• 0001E0

Dump of file SATURN:[PCCOMMON.DUMP.DLL]BRDPLOW.TMP;1 on 18-APR-1990 10:38:06.00
File ID (528,44,0)   End of file block 272 / Allocated 272

Virtual block number 23 (00000017), 512 (0200) bytes

 5689F446 89005E05 C28CC388 FE5689FC 4689005E 05045788 26024788 26F85EC4 á^½&.G.&.W..^..F•.Vx.û.ò.^..F¶.V 000000
 01880575 D0080065 01309A37 FF260277 FF26065E C437FF26 0277FF26 FC[illegible]4F6 -á^•&.w.&.7á^.&.w.&.7.0.e..Àu.¡. 000020
 C437FF26 0277FF26 FC5EC444 E8025788 26078826 065EC40C 74C008C0 2802[illegible]300 .Š.+à.àt.á^.&..&.W.ŠDá^•&.w.&.7á 000040
 CE9A0D81 03EF9ADC 8808EC83 007C06C7 9A007202 C39AFC5E C4006002 C39A0[illegible]5E ^..û.m.á^•.û.r..û.|..&..É.ÿ....ö 000060
 26078926 F45EC400 8C00FC9A 50520097 04A69A0D 9002569A D88808C4 83008807 ....á..Ä.V....Ì...RP.•.¥.á^¶&..& 000080
 D0080DE3 01309A04 77FF2606 77FF2606 5EC40477 FF260677 FF26FC5E C4025789 .W.á^•&.w.&.w.á^.&.w.&.w..0.D..Å 0000A0
 045F8006 5EC448E8 06578826 04478826 065EC400 74C008C0 2802E800 01880575 u.¡..Š.+à.àt.á^.&.G.&.W.Šká^.._. 0000C0
 9A0E0203 EF9ADC88 08EC830D FD06C79A 0DF302C3 9A045F8D FC5EC400 EE02C39A .û.Ÿ.á^•._..û.µ..û.»..&..É.ÿ.... 0000E0
 0477FF26 0677FF26 FC5EC450 520E2304 A69A0E11 02569AD8 8808C483 0E0C07CE ö....á..Ä.V....Ì.#.RPá^•&.w.&.w. 000100
 1E565700 0000C800 08CAC91F 00EBC028 06578926 04478926 F45EC409 5E00FC9A .•.^.á^¶&.G.&.W.+àŠ..èò..à...WV. 000120
 0A468806 5EC41CE8 80F38805 75084608 06468808 740C4608 0A4688D8 8E0CC988 ¡è..Á.F..F.t..F..F.u.¡µ.Š.á^..F. 000140
 0004C800 08CAC95F 5E1F00E8 C02B1FA5 A5A5A50A 8E1EF088 F888005E 050C5688 .V..^..«.Þ..ÖEEEE.+àŠ..^_èò..à.. 000160
 88057508 46080646 880874C2 08FE5689 FC46890E 56880C46 88088E0E 41881E00 ..¡A..Ä.F..V..F•.Vx.ôt..F..F.u.¡ 000180
 5A478926 5C478926 FC5EC40D 740A4639 07892602 478926C0 28065EC4 73E88DF3 µ.Šsá^.+à&.G.&..9F.t.á^•&.G\&.GZ 0001A0
 37E88DFF 8805725A 47392606 7F0D7C5C 57392658 57882656 478826FC 5EC41EE8 Š.á^•&.GV&.WX&9W\|...&9GZr.¡..Š7 0001C0
 FF006A00 5C578326 015A4783 265A77FF 265C77FF 264277FF 264477FF 26FC5EC4 á^•&.wD&.wB&.w\&.wZ&.GZ.&.W\.j.. 0001E0

Dump of file SATURN:[PCCOMMON.DUMP.DLL]BRDPLOW.TMP;1 on 18-APR-1990 10:38:06.00
File ID (528,44,0)   End of file block 272 / Allocated 272

Virtual block number 24 (00000018), 512 (0200) bytes

 000018C8 000ACAC9 1F00EBC0 2804E88D FF880574 C00804C2 08689A06 76FF0876 v..v..k.ô..àt.¡..Š.+àŠ..èò..à... 000000
 5EC400E6 E98DF388 06750846 08064688 08740C46 080A4688 D88E0E83 881E5657 WV.¡...Ä.F..F.t..F..F.u.¡µ.ÔÌ.á^ 000020
 890C5688 0A468800 C8E9C028 05750647 08260447 88260F75 02470826 07882606 .&..&.G.u.&.G.&.G.u.+àÕü..F..V.. 000040
 88260788 2608468E 1FA5F200 0889DA8E 1E0716F0 88F07E8D 001605EE 5689EC46 F$.VŸ....~Þ.Þ....Ö¿..·É..F.&..&. 000060
 F8460102 57882607 8826F656 11F44601 06578826 04478826 F25611F0 46010257 W..FÞ.V·&.G.&.W..F¶.V-&..&.W..F½ 000080
 16F04680 50520026 05EE5688 EC4688FE 5611FC46 01065788 26044788 26FA5611 .V•&.G.&.W..F•.Vx.F$.VŸ.&.RP.FÞ. 0000A0
 88260788 26065EC4 EA5689E8 4689006E 05EE5688 EC468808 C483079F 00149A50 P......á..F$.VŸ.n..FÒ.Võá^.&..&. 0000C0
 11260447 0126E85E C4065788 26044788 26065EC4 02571126 070126E8 5EC40257 W.á^Ò&..&.W.á^.&.G.&.W.á^Ò&.G.&. 0000E0
 00010094 87C726EC 5EC404C4 830375E8 0E530609 7500008E 8F8326EC 5EC40657 W.á^$&.¢...u..S.Òu..á.á^$&ú..... 000100
 0A7E830C 740E4608 0C4688D8 8E0F2488 1E000004 C80008CA C95F5E1F 00EBC028 +àŠ..^_èò..à....¡$..Ä.F..F.t..-. 000120
 880C4688 009FE9C0 28057508 46080646 8800ACE9 8DF38806 7E0A0A7E 83067C00 .|..-.¯-.¡µ.Ô¯..F..F.u.+àÕ...F.. 000140
 59E87857 11267647 01260856 88064688 FC5EC456 E80A4688 FE5689FC 46890E56 V..F•.Vx.F.ŠVá^•.F..V.&.Gv&.WxŠY 000160
 47012608 56880646 88FC5EC4 45E80080 9711267E 47012608 56880646 88FC5EC4 á^•.F..V.&.G~&....ŠEá^•.F..V.&.G 000180
 E880F388 1DE80084 97112600 82870126 08568806 4688FC5E C432E87C 5711267A z&.W|Š2á^•.F..V.&....&....Š.¡µ.Š 0001A0
 8E8F8326 FC5EC4E3 E8A97400 08309874 0004300A 7400023D CC740001 3D16E83A :Š.=..tä=..tO=..t.=..t`ŠDá^•&.¢. 0001C0
 000ACAC9 1F00EBC0 28000100 9487C726 FC5EC404 C483029E E80E5306 09750000 ..u..S.Ò...á.á^•&ú.....+àŠ..èò.. 0001E0
```

```
Dump of file SATURN:[PCCOMMON.DUMP.DLL]BRDPLOW.TMP;1 on 18-APR-1990 10:38:06.00
File ID (528,44,0)   End of file block 272 / Allocated 272

Virtual block number 25 (00000019), 512 (0200) bytes

 46890856 88064688 0170E980 F3880675 08460806 4688088E 1031881E 000014C8 å....¡1..Ä.F..F.u.¡µ.ðp..F..V..F 000000
 1076FF2A 740C4608 0A4688F2 5689F046 89045788 26024788 26065EC4 FE5689FC •.V±á^.&.G.&.W..Fp.V·.F..F.t*.v. 000020
 9A016AFC 76FFF:76 FF008A87 FF265052 000605C2 8CC3880A 76FF0C76 FF0E76FF .v..v..v..ù.ô...RP&.ñ...v±.v=j.. 000040
 FF26065E C4118E09 C29A006A 006A6677 FF266877 FF26065E C414C483 03290000 ..)..á.á^.&.wh&.wfj.j..ô...á^.&. 000060
 E8029F05 A49AF476 FFF676FF 0075C008 11830A58 9A5016F4 46806677 FF266877 wh&.wf.F¶.P.X.°..âu..v~.v¶.É...$ 000080
 4277FF26 4477FF26 065EC411 C809C29A 006A006A 4277FF26 4477FF26 065EC4DA Õá^.&.wD&.wBj.j..ô.à.á^.&.wD&.wB 0000A0
 D802FF9A 006AFC76 FFFE76FF F876FFFA 76FF1575 C0080F08 0A589A50 16F8468D .F%.P.X....âu..v°.v%.v±.v=j....Û 0000C0
 77FF26F0 5EC4F146 E80E006A 3677FF26 3877FF26 065EC4FC 76FFFE76 FFD2E802 .$0.v±.v•á^.&.w8&.w6j..ÒFþá^Þ&.w 0000E0
 74FFEE7E 830675FF EC7E8312 37091E9A 5016EC46 8DFC76FF FE76FF14 77FF2616 .&.w..v±.v•.F&.P...7..~$.u..~Ÿ.t 000100
 4077FF26 065EC411 7905D09A 006AEC76 FFEE76FF 1477FF26 1677FF26 F05EC418 .á^Þ&.w.&.w..vŸ.v$j..Å.y.á^.&.wâ 000120
 6877FF26 065EC412 6700689A 4277FF26 4477FF26 065EC412 5700689A 3L.7FF26 &.w>.h.W.á^.&.wD&.wB.h.g.á^.&.wh 000140
 880574C0 08000001 E19A0676 FF0876FF 0677FF26 F05EC412 1300689A 667/FF26 &.wf.h...á^Þ&.w..v..v..Å....ât.¡ 000160
 8DF38806 75084608 06468808 8E110688 1E00000C C8C8C91F 00E8C02B 04E8CDF2 ·.$.+â$..èùà....¡...Ä.F..F.u.¡µ. 000180
 120309C2 9A006A00 6A6677FF 266877FF 26065EC4 00C2E903 75000A7E 8300E2E9 Ôâ..−..u.Ôô.á^.&.wh&.wfj.j..ô.Æ. 0001A0
 6A006A00 6A006A18 75C00813 030A589A 5016F446 806677FF 266877FF 26065EC4 á^.&.wh&.wf.F¶.P.X....âu.j.j.j.j 0001C0
 006A006A 4277FF26 4477FF26 065EC4CF E80CC483 119009CF 9AF476FF F676FF00 ..v~.v¶.ü....á.$uá^.&.wD&.wBj.j. 0001E0

Dump of file SATURN:[PCCOMMON.DUMP.DLL]BRDPLOW.TMP;1 on 18-APR-1990 10:38:06.00
File ID (528,44,0)   End of file block 272 / Allocated 272

Virtual block number 26 (0000001A), 512 (0200) bytes

 016A1275 C0081342 0A589A50 16F8468D 4277FF26 4477FF26 065EC413 1809C29A .ô...á^.&.wD&.wB.F%.P.X.B..âu.j. 000000
 9A006A00 6A3E77FF 264077FF 26065EC4 D5E806C4 83FFFF02 179AF876 FFFA76FF .v°.v%......á.$1á^.&.wâ&.w>j.j.. 000020
 FF016A11 75C00812 470A589A 5016FC46 803E77FF 264077FF 26065EC4 135709C2 ô.W.á^.&.wâ&.w>.F•.P.X.G..âu.j.. 000040
 FD80E80E 0676FF08 76FF006A 006A006A 006AD6E8 06C483FF 22E80EFC 76FFFE76 v±.v•.Ö"..á.$•j.j.j.j..v..v..Ô.» 000060
 28047400 008E8F83 26065EC4 D88E1291 881E5657 00000CC8 C8C91F00 E80CC483 .á.$..èùà...WV.¡...Äá^.&.e...t.+ 000080
 FFF676FF 13CA09C2 9A006A00 6A5052F6 5689F446 89445788 26424788 2674E8C0 â$t&.GB&.WD.F¶.V-RPj.j..ô.ò..v~. 0000A0
 05F85EC4 FA5689F8 4689FE56 88FC4688 3975C008 128E0A58 9A5016FC 4680F476 v¶.F•.P.X./..âu9.F=.V±.F%.V°á^%. 0000C0
 8E1EF088 267F8D00 3605C28C C388F85E C41FA5A5 A5A5DA8E 1EF0881E 7F8D0016 ......Þ..ÔÈÈÈÈ.á^%.ū.ô.6...&.Þ.. 0000E0
 000032C8 C8C95F5E 1F00E8C0 28000100 8E87C726 065EC483 E81FA5F2 000889DA Ô¿..·È.$°á^.&ú.....+â$..^ èùà2.. 000100
 880A4688 020FE98D F3880675 0C46080A 46880874 08460806 4688088E 1390881E .¡...Ä.F..F.t..F..F.u.¡µ.Ô...F.. 000120
 CE468944 57882642 47882606 5EC4E246 89464788 26065EC4 D85689D6 46890C56 V..F•.VÄá^•&.GF.Fâá^.&.GB&.WD.Fö 000140
 4689F846 89C02814 8900F09A 5016E846 8DCE76FF 52F24689 F44689C0 28D05689 .VÄ+à.F¶.F·R.vö.FÒ.P.Þ.¿.+à.F%.F 000160
 0372F646 39087C00 D1E9037E F85639EA 5688E846 8800F856 8301F646 8308E8F6 -$..F-..V%..FÒ.Vö9V%-.Ôî.|.9F-r. 000180
 56880A46 88158308 689A5016 EE468000 6AF676FF F876FFCE 76FFD076 FF00C7E9 Ôú..vÅ.vö.v%.v-j..FŸ.P.k....F..V 0001A0
 DE5EC4E0 56890E46 89F05688 EE468801 7AE98DF1 880675F0 56390875 EE46390C .9FŸu.9VÞu.¡þ.Ôz..FŸ.VÞ.F8.VÄá^B 0001C0
 C388D456 89D24689 001605D8 56880646 886675EC 4639E246 88EC4689 46478826 &.GF.F$.Fâ9F$uf.F•.VA....F0.VÅ.ù 0001E0

Dump of file SATURN:[PCCOMMON.DUMP.DLL]BRDPLOW.TMP;1 on 18-APR-1990 10:38:06.00
File ID (528,44,0)   End of file block 272 / Allocated 272

Virtual block number 27 (0000001B), 512 (0200) bytes

 57882607 88260A5E C41E7502 E27E8306 7401E27E 830C5689 DA468900 1605C28C .ô....FÖ.VÉ.~ã.t..~ã.u.á^Ö&..&.W 000000
 06578826 04478826 DA5EC41E E837E802 77073926 057C097F 02573926 D25EC402 .á^•&9W...|.&9.w.$7$.á^Ö&.G.&.W. 000020
 8308E802 7EEC4639 E246880A E817E802 77044739 26067C0A 7F065739 26025EC4 á^•&9W...|.&9G.w.$.$..Fã9F$~.$.. 000040
 0A76FF0C 76FF006A 006AF276 FFF476FF CE76FF00 76FFFF19 E900F456 8301F246 F·..V¶.Ô...vÅ.vö.v¶.v·j.j..v..v. 000060
 4683FC5E C412E8FE 5689FC46 89004605 08568806 46880004 FA46C715 DD0290 9A ...Ì.úF°...F..V..F..F•.V±$.á^•.F 000080
 4689F446 89C028E2 E80274C0 0BFA4EFF FA4688FF FF0247C7 26FFFF07 C72604FC •.&ú...&úG....F°.N°.ât.$ã+à.F¶.F 0000A0
 FF15ED09 C29A006A 006ACE76 FFD076FF E65689E4 46890046 05085688 064688F2 ·.F..V..F..FÒ.V|.vÅ.vöj.j..ô.Ù.. 0000C0
 C4E05689 DE4689F0 5688EE46 885475C0 08138A0A 589A5016 EE4680CE 76FFD076 vÅ.vö.FŸ.P.X.¤..âuÏ.FŸ.VÞ.F8.VÄá 0000E0
 FE5689FC 4689E656 88E44603 02E0C101 6A8788E3 D1D888EC 46894647 88260E5E ^B&.GF.F$.ÄÌD..j.ëÅ..FÒ.V|.F•.V± 000100
 F2468302 57892607 8926F456 88F24688 0075FF02 7F832614 75FF3F83 26FC5EC4 á^•&.?.u.&....u..F·.V¶&..&.W..F· 000120
 08740846 08064688 D88E1422 881E0000 08C8C8C9 1F00E8C0 2898E800 F4568301 ..V¶.$.+â$..èùà....¡"..Ä.F..F.t. 000140
 5052FA56 89F84689 44578826 42478826 065EC45E E880F388 05750C46 080A4688 .F..F.u.¡µ.$^á^.&.GB&.WD.F%.V°RP 000160
 E88E07B8 0575FFFE 7E830875 FFFC7E83 1682091E 9A5016FC 46800A76 FF0C76FF .v..v..F•.P...ý..−=.u..−±.u.¡..$ 000180
 0676FF08 76FF0A76 FF0C76FF 14770500 9A006AFC 76FFFE76 FFF876FF FA76FF2A °.v°.v%.v±.v=j..Å.w..v..v..v..v. 0001A0
 00000003 11DF0002 00000001 0FC40002 000CC8C9 1F00E8C0 2808C483 FD58E80E .ÒX».á.+â$..èù....á.......Ô..... 0001C0
 027F0005 00420203 00000009 03F90002 00000008 12EA0002 00000004 13290002 ..).......ô.......°.......B..... 0001E0
```

Dump of file SATURN:[PCCOMMON.DUMP.DLL]BRDPLOW.TMP;1 on 18-APR-1990 10:38:06.00
File ID (528,44,0)   End of file block 272 / Allocated 272

Virtual block number 28 (0000001C), 512 (0200) bytes

```
00000014 168E0002 00220003 12770203 0000000C 11620002 00140003 00720203 ..r.......b.......w...".......... 000000
080E468B 088EFFFF 881E5657 000014C8 00000019 16540002 00000017 00380002 ..8.......T.....à...WV.¡...Ä.F.. 000020
76FF0789 26024789 26C02B06 5EC4013C E98DF3B8 06750846 08064688 08741046 F.t..F..F.u.¡µ.Ö<.á^.+áá.G.&...v 000040
F1B80675 D008F656 89F44689 FE5688FC 46880000 FFFF9A50 16FC468D 0E76FF10 ..v..F•.P......F=.V±.F¶.V-.Åu.¡þ 000060
74C00800 00FFFF9A 5016EC46 8D6E6A0E 6A50F246 89064788 26F45EC4 010AE98D .Õ..á^¶&.G..F·Pj.jn.F&.P......ät 000080
A5F20037 89018ABE FB88EC5E C4FA5689 F84689EE 5688EC46 8800E7E9 8DF28806 .¡·.ÕÕ..F&.VŸ.F%.V•á^&.«f..¿7.·E 0000A0
C600009A 50520048 05EE5688 EC468BF2 76FF0457 89260247 8926F656 88F44688 .F¶.V-&.G.&.W..v·.F&.VŸ.H.RP...ó 0000C0
8BF276FF 1775C008 00000000 9A505200 4C05EE56 88EC4688 F276FF2E 75C00800 ..åu..v·.F&.VŸ.L.RP...!..åu..v·. 0000E0
0001419A EC76FFEE 76FFF276 FF1374C0 08011A00 009A5052 005005EE 5688EC46 F&.VŸ.P.RP......ät..v·.vŸ.v&.A.. 000100
6A016A00 6A006A14 77FF2616 77FF26F4 5EC42075 0C46080A 468868E8 8DF28800 .¡·.Sh.F..F.u á^¶&.w.&.w.j.j.j.j 000120
01CFE80E 016A0A76 FF0C76FF F876FFFA 76FF12E8 FFFF0290 9AF876FF FA76FF00 ..v•.v%.....Š..v•.v%.v..v..j..Öü. 000140
F8468806 5EC414EB F0468800 00FFFF9A EC76FFEE 76FFF276 FF1374C0 08F04689 .Fþ.ät..v·.vŸ.v&......FþŠ.á^..F% 000160
8B088E00 08881E00 0014C800 0CCAC95F 5E1F00EB C0280257 89260789 26FA5688 .V•&..&.W.+àŠ..^_èò..à....¡...Ä. 000180
02478B26 F45EC4F6 5689F446 890A5688 08468801 7DE98DF3 8806750A 46080846 F..F.u.¡µ.Õ)..F..V..F¶.V-á^¶&.G. 0001A0
FF02179A F476FFF6 76FF0676 FF147502 3F8326FC 5EC4FE56 89FC4689 04578826 &.W..F•.V±á^=&.?.u..v..v-.v¶.... 0001C0
009487C7 26F85EC4 FA5689F8 46890857 88260647 8826F45E C40143E9 06C483FF ..á.ÕC.á^¶&.G.&.W..F%.V•á^%&ú... 0001E0
```

Dump of file SATURN:[PCCOMMON.DUMP.DLL]BRDPLOW.TMP;1 on 18-APR-1990 10:38:06.00
File ID (528,44,0)   End of file block 272 / Allocated 272

Virtual block number 29 (0000001D), 512 (0200) bytes

```
6A5077FF 265277FF 26F45EC4 00F5E903 7500067E 83000164 47C726F4 5EC40001 ..á^¶&üGd...~..u.Õ%.á^¶&.wR&.wPj 000000
75C00802 300A589A 5016EC46 8D5077FF 265277FF 26F45EC4 020809C2 9A006A00 .j..ô...á^¶&.wR&.wP.F&.P.X.0..åu 000020
09C29A00 6A006A4C 77FF264E 77FF26F4 5EC40AE8 FFFF0404 9AEC76FF EE76FF0D ..vŸ.v&.....ŠÖá^¶&.wN&.wLj.j..ô. 000040
8326F05E C41C75C0 0802790A 589A5016 F04680C4 77FF264E 77FF26F4 5EC40245 E.á^¶&.wN&.wL.Fþ.P.X.y..åu.á^þ&. 000060
FF264A77 FF26F45E C4C8E802 AE01749A 016A37FF 260277FF 2608E802 7401067F ...t.ŠU&.w.&.7j..t.Ü.Šuá^¶&.wJ&. 000080
00AF0A58 9A5016F0 46804877 FF264A77 FF26F45E C4028E09 C29A006A 006A4877 wHj.j..ô...á^¶&.wJ&.wH.Fþ.P.X.£. 0000A0
FFFF0174 9A016A37 FF260277 FF26F05E C438EB2A E8064788 26F05EC4 4575C008 .åuEá^þ&.G.Š*ŠBá^þ&.w.&.7j..t... 0000C0
C0740001 300474C0 0810EB12 EBFFFF01 269A016A 37FF2602 77FF26F0 5EC425E8 Š%á^þ&.w.&.7j..&...Š.Š..ätÅ=..të 0000E0
74C00808 C483FFFF 044A9AFC 76FFFE76 FF0876FF 0A76FFA2 E800E8D0 74000230 =..t¥Š.ŠÅ.v..v..v±.v=.J....á..åt 000100
750E460B 0C468808 8E0168B8 1E000018 C80006CA C91F00EB C02804EB 8E078805 .¡..Š.+àŠ..èò..à....¡k..Ä.F..F.u 000120
46890457 88260247 8826F45E C4F65689 F446890E 56880C46 8801A8E9 8DF38806 .¡µ.Õ`..F..V..F¶.V-á^¶&.G.&.W..F 000140
8DF38806 75000BFA 5689F846 890A5688 08468800 C9E90375 00067E83 FE5689FC •.V±.-..u.Öè..F..V..F%.V•.Åu.¡µ. 000160
8826F45E C40154E9 8E008806 7400008C 8F8326F8 5EC40875 00647F83 26016CE9 Öl.&..d.u.á^%&.€...t.¡..ÖT.á^¶&. 000180
800C76FF 0E76FF14 77FF2616 77FF26FC 5EC40141 E98E0088 06740847 08260647 G.&.G.t.¡..ÖA.á^=&.w.&.w..v..v.. 0001A0
1477FF26 1677FF26 FC5EC418 74FFF27E 830675FF F07E8303 88091E9A 5016F046 Fþ.P...£..-þ.u..-·.t.á^=&.w.&.w. 0001C0
006A006A 006A006A 4277FF26 4477FF26 F85EC401 F605009A 006AF076 FFF276FF .v·.vþj..Å.-.á^%&.wD&.wBj.j.j.j. 0001E0
```

Dump of file SATURN:[PCCOMMON.DUMP.DLL]BRDPLOW.TMP;1 on 18-APR-1990 10:38:06.00
File ID (528,44,0)   End of file block 272 / Allocated 272

Virtual block number 30 (0000001E), 512 (0200) bytes

```
57832601 56478326 F85EC400 DAE98E00 880674C0 08039702 9D9A0C76 FF0E76FF .v..v.......ät.¡..ÕÕ.á^%&.GV.&.W 000000
57882606 47882 6F4 5EC400AC E9085789 26064789 260A5688 08468BF4 5EC40058 X.á^¶.F..V.&.G.&.W.Õ¯.á^¶&.G.&.W 000020
89E84689 44578826 42478826 F85EC400 9EE98E00 8806750D 08FA5689 F8468908 ..F%.V•.Åu.¡..Õ..á^%&.GB&.WD.FÒ. 000040
0575FFEE 7E830875 FFEC7E83 0466091E 9A5016EC 46800C76 FF0E76FF 5052EA56 VõRP.v..v..F$.P...f..-&.u..-Ÿ.u. 000060
E88E0088 0574C008 04800500 9A006AEC 76FFEE76 FFE876FF EA76FF6A E88E0088 ¡..Šj.vö.vÒ.vŸ.v$j..Å....åt.¡..Š 000080
08030902 9D9A0C76 FF0E76FF 006A016A 006A006A 1477FF26 1677FF26 FC5EC44E Ná^=&.w.&.w.j.j.j.j..v..v....\.. 0000A0
89260847 8926C028 F45EC400 585F8326 01566F83 26F85EC4 27E88E07 880574C0 åt.¡..Š'á^%&.oV.&._X.á^¶+áá.G.&. 0000C0
4688D88E 0305881E 000004C8 000ACAC9 1F00EBC0 28000166 47C726F4 5EC40647 G.á^¶&üGf..+àŠ..èò..à....¡...Ä.F 0000E0
C4FE5689 FC46890C 5688 0A46 8810E880 F3880575 08460806 46880874 0C46080A ..F.t..F..F.u.¡µ.Š..F..V..F•.V±á 000100
88088E04 CA881E00 0004C800 08CAC91F 00E8C028 07892606 5EC40A47 8826FC5E ^=&.G.á^.&..+àŠ..èò..à....¡ò..Ä. 000120
FE5689FC 46890C56 880A4688 10E880F3 88057508 46080646 8808740C 46080A46 F..F.t..F..F.u.¡µ.Š..F..V..F•.V± 000140
D88E0508 881E0000 04C80008 CAC91F00 E8C02807 8926065E C40C4788 26FC5EC4 á^=&.G.á^.&..+àŠ..èò..à....¡...Ä 000160
5689FC46 890C5688 0A46885A E880F388 05750846 08064688 08740C46 080A4688 .F..F.t..F..F.u.¡µ.ŠZ.F..V..F=.V 000180
478926FC 5EC40257 88260788 26127400 3F832606 7F1A7C00 027F8326 065EC4FE ±á^.&....|...&.?.t.&..&.W.á^=&.G 0001A0
06578826 04478826 13740004 7F832607 7F1C7C00 067F8326 065EC410 5789260E .&.W.á^.&....|...&....t.&.G.&.W. 0001C0
D88E054C 881E5657 000000C8 0008CAC9 1F00E8C0 28145789 26124789 26FC5EC4 á^=&.G.&.W.+àŠ..èò..à...WV.¡L..Ä 0001E0
```

Dump of file SATURN:[PCCOMMON.DUMP.DLL]BRDPLOW.TMP;1 on 18-APR-1990 10:38:06.00
File ID (528,44,0)   End of file block 272 / Allocated 272

Virtual block number 31 (0000001F), 512 (0200) bytes

```
0E050C56 880A4688 065EC41C E88DF388 05750846 08064688 08740C46 080A4688 .F..F.t..F..F.u.|µ.Š.ó^..F..V... 000000
881E5657 000000C8 0008CAC9 5F5E1F00 EBC02B1F A5A5A5A5 DA8E1EF0 88F88800 ..«.Þ..ÒÉÉÉÉ.+âŠ..^_èò..â...WV.¡ 000020
88064688 0A5EC418 E88DF388 05750846 08064688 08740C46 080A4688 D88E05CC ä..Ä.F..F.t..F..F.u.|µ.Š.ó^..F.. 000040
57000028 C8000dCA C95F5E1F 00EBC02B 1FA5F200 08890A8E 1EF08836 7F8D0856 V...6.Þ..Ò¿...É.+âŠ..^_èò..à(..W 000060
0A468803 6CE98DF3 88067508 46080646 8808740C 46080A46 88D88E06 10881E56 V.|...Ä.F..F.t..F..F.u.|µ.Öl..F. 000080
88003605 EE5688EC 4688065E C404C483 01AF00FE 9A5052EE 5689EC46 890C5688 .V..F$.VŸRP.±.£..ó.ó^..F$.VŸ.6.. 0000A0
7CD20BF6 5689F446 895A5788 26584788 26EC5EC4 1FA5F200 08890A8E 1EF088F8 «.Þ..Ò¿...É.ó^$&.GX&.WZ.F¶.V-.ø| 0000C0
462B0257 88260788 26D85EC4 DA568908 46890016 05C28CC3 887174C0 08047F77 w...âtq.û.ô....FÁ.VÖó^Å&..&.W.+F 0000E0
8826E256 89E04689 F6561BF4 462B0657 88260447 8826DE56 890C4689 F6561BF4 ¶.V-.FÉ.V8&.G.&.W.+F¶.V-.FÁ.Vä&. 000100
89F65613 F4460306 57882604 478826E6 5689E446 89F65613 F4460302 57882607 .&.W..F¶.V-.FÒ.V|&.G.&.W..F¶.V-. 000120
26024788 26EC5EC4 08C483FF FF0D149A 50160C46 800676FF 0876FFEA 5689E846 FÒ.VÕ.v..v..FÉ.P......ó.ó^$&.G.& 000140
FE5689FC 4689000A 83000120 54578826 52478826 F85EC4FA 5689F846 89045788 .W..F½.V¹ó^½&.GR&.WT·...Ö..F=.V± 000160
4688065E C4065719 26044729 26FE5688 FC468806 5EC40257 19260729 26065EC4 ó^.&).&.W.ó^..F=.V±&)G.&.W.ó^..F 000180
F846880E 5711260C 470126FE 5688FC46 88065EC4 0A571126 08470126 FE5688FC =.V±&.G.&.W.ó^..F=.V±&.G.&.W..F½ 0001A0
260277FF 26F05EC4 DA568908 46890856 88064688 F25689F0 4689005E 05FA5688 .V¹.^..FÞ.V·.F..V..FÁ.VÖó^Þ&.w.& 0001C0
0C74C008 C02B02E8 00018805 75000807 EC01309A 37FF2602 77FF2608 5EC437FF .7ó^Å&.w.&.7.0.$..Åu.|..Š.+ä.ât. 0001E0
```

Dump of file SATURN:[PCCOMMON.DUMP.DLL]BRDPLOW.TMP;1 on 18-APR-1990 10:38:06.00
File ID (528,44,0)   End of file block 272 / Allocated 272

Virtual block number 32 (00000020), 512 (0200) bytes

```
5EC407F4 02C39AD8 5EC437FF 260277FF 26F05EC4 44E80257 88260788 26D85EC4 ó^Å&..&.W.$Dó^Þ&.w.&.7ó^Ä.û.¶.ó^ 000000
9AD88808 C48308.' 07BE9A08 0803EF9A DC8808EC 83080306 C79A07F9 02C39AF0 Þ.û.¹..ú....$..É.ÿ....ƒ....ó..Ä. 000020
77FF26F0 5EC4025/ 89260789 26D85EC4 084300FC 9A505208 1E04A69A 08170256 V....Î...RP.•.C.ó^Ä&..&.W.ó^Þ&.w 000040
C02B02E8 00018805 75000808 6A01309A 0477FF26 0677FF26 D85EC404 77FF2606 .&.w.ó^Å&.w.&.w..0.j..Åu.|..Š.+å 000060
8DF05EC4 087502C3 9A045F8D D85EC448 E8065788 26044788 26D85EC4 0074C008 .ât.ó^Å&.G.&.W.$Kó^Ä._..û.u.ó^Þ. 000080
D88808C4 83089307 BE9A0889 03EF9ADC 8808EC83 088406C7 9A087A02 C39A045F _..û.z..ú....$..É.ÿ...ƒ....ó..Ä 0000A0
26D85EC4 080000FC 9A0477FF 260677FF 26F05EC4 505208AA 04A69A08 9802569A ¯V....Î.ˆ.RPó^Þ&.w.&.w..•.Ï.ó^Å& 0000C0
37FF2602 77FF26F0 5EC4DA56 89084689 00080508 56880646 88065789 26044789 .G.&.W..F..V.....FÁ.VÖó^Þ&.w.&.7 0000E0
5EC40C74 C008C02B 02E80001 88057500 08090A01 309A37FF 260277FF 26D85EC4 ó^Å&.w.&.7.0....Åu.|..Š.+å.ât.ó^ 000100
9AF05EC4 091202C3 9AD85EC4 37FF2602 77FF26F0 5EC444E8 02578826 07882608 Å&..&.W.$Dó^Þ&.w.&.7ó^Ä.û...ó^Þ. 000120
02569AD8 8808C483 093007CE 9A092603 EF9ADC88 08EC8309 2106C79A 091702C3 û....ú.Ï..$..É.ÿ.&..ö.0..ó..Ä.V. 000140
260677FF 26F05EC4 02578926 07892608 5EC40961 00FC9A50 52093C04 A69A0935 5..Î.<.RP.•.a.ó^Å&..&.W.ó^Þ&.w.& 000160
C008C02B 02E80001 88057500 08098801 309A0477 FF260677 FF26085E C40477FF .w.ó^Å&.w.&.w..0....Åu.|..Š.+å.å 000180
045F8DF0 5EC40993 02C39A04 5F8D085E C448E806 57882604 47882608 5EC40074 t.ó^Å&.G.&.W.$Kó^Ä._...û...ó^Þ._. 0001A0
569AD888 08C48309 B107CE9A 09A703EF 9ADC8808 EC8309A2 06C79A09 9802C39A .û....ú.Å..$..É.ÿ.Ï..ö.Ý..ó..Ä.V 0001C0
47892608 5EC4FFFF 00FC9A04 77FF2606 77FF26F0 5EC45052 09C804A6 9A098602 .Ñ..Î.à.RPó^Þ&.w.&.w..•...ó^Å&.G 0001E0
```

Dump of file SATURN:[PCCOMMON.DUMP.DLL]BRDPLOW.TMP;1 on 18-APR-1990 10:38:06.00
File ID (528,44,0)   End of file block 272 / Allocated 272

Virtual block number 33 (00000021), 512 (0200) bytes

```
0C46080A 4688D88E 0653881E 000000C8 0008CAC9 5F5E1F00 E8C02806 57892604 .&.W.+âŠ..^ èò..à....¡S..Ä.F..F. 000000
C02B5A57 89265847 89260856 88064688 0A5EC415 E88DF388 05700008 7E830674 t..-..).|µ.Š.ó^..F..V.&.GX&.WZ+å 000020
75084608 06468808 740C4608 0A4688D8 8E09E688 1E000000 C80008CA C91F00EB Š..èò..à....|Î..Ä.F..F.t..F..F.u 000040
1F00EBC0 28025789 26078926 065EC45A 57882658 4788260A 5EC419EB 8DF38805 .|µ.Š.ó^.&.GX&.WZó^.&..&.W.+âŠ.. 000060
08067E83 17740406 7E831874 0A460808 4688088E 0A1D881E 000000C8 0008CAC9 èò..à....|...Ä.F..F.t..~..t..~.. 000080
E8C02846 47892606 4688085E C40EE88D F3880574 02067E83 08740106 7E831174 t..~..t..~..t.|µ.Š.ó^..F.&.GF+âŠ 0000A0
05750846 08064688 08740C46 080A4688 D88E0A5A 881E0000 04C80006 CAC91F00 ..èò..à....|Z..Ä.F..F.t..F..F.u. 0000C0
C02B0789 26065EC4 46478826 FC5EC4FE 5689FC46 890C5688 0A46881D E88DF388 |µ.Š..F..V..F=.V±ó^=&.GFó^.&..+å 0000E0
83067C00 067E830C 740A4608 084688D8 8E0A9C88 1E000004 C80008CA C91F00EB Š..èò..à....|...Ä.F..F.t..-..|.. 000100
5C478926 064688FC 5EC4FE56 89FC4689 0A568808 46881AEB 8DF38805 7E02067E -..-.|µ.Š..F..V..F=.V±ó^=.F.&.G\ 000120
46080646 8808740C 46080A46 88D88E0A D0881E00 0004C800 06CAC91F 00E8C02B +âŠ..èò..à....|Ï..Ä.F..F.t..F..F 000140
8926065E C45C4788 26FC5EC4 FE5689FC 46890C56 880A4688 1DE88DF3 88057508 .u.|µ.Š..F..V..F=.V±ó^=&.G\ó^.&. 000160
E98DF388 06750846 08064688 D88E081F 881E0000 08C80008 CAC91F00 E8C02807 .+âŠ..èò..à....|...Ä.F..F.u.|µ.Õ 000180
26FC5EC4 78578826 76478826 065EC4FE 5689FC46 89001605 08568806 46880001 Î..F..V.....F=.V±ó^.&.Gv&.Wxó^=& 0001A0
26065EC4 06571126 04470126 FC5EC47C 5788267A 47882606 5EC40257 11260701 ..&.W.ó^.&.Gz&.W|ó^=&.G.&.W.ó^.& 0001C0
00849788 26008287 8826065E C40A5711 26084701 26FC5EC4 00809788 267E4788 .G-&....ó^=&.G.&.W.ó^.&....&.... 0001E0
```

Dump of file SATURN:[PCCOMMON.DUMP.DLL]BRDPLOW.TMP;1 on 18-APR-1990 10:38:06.00
File ID (528,44,0)   End of file block 272 / Allocated 272

Virtual block number 34 (00000022), 512 (0200) bytes

078826F8 5EC4FA5; 89F84689 006E0508 56880646 880E5711 260C4701 26FC5EC4 á^•&.G.&.W..F..V..n..F½.Vªá^½&.. 000000
04470126 FC5EC406 57882604 478826F8 5EC40257 11260701 26FC5EC4 02578826 &.W.á^•&..&.W.á^½&.G.&.W.á^•&.G. 000020
04478826 F85EC40A 57112608 470126FC 5EC40257 88260788 26F85EC4 06571126 &.W.á^½&..&.W.á^•&.G.&.W.á^½&.G. 000040
0860881E 56570000 1EC8CBC9 1F00E8C0 280E5711 260C4701 26FC5EC4 06578826 &.W.á^•&.G.&.W.+äŠ..èúà...WV.¡'. 000060
46890C56 880A4688 0160E98D F3880675 08460806 46880874 0C46080A 4688D88E .Ä.F..F.t..F..F.u.¡µ.Õ'..F..V..F 000080
FC468908 57882606 478826EA 5689E846 89045788 26024788 26E25EC4 E45689E2 ã.Vôá^ã&.G.&.W..FÒ.Vô&.G.&.W..F= 0000A0
25751647 3926E25E C4025788 26078826 065EC401 28E98E08 880675C2 08FE5689 .V±.ôu.¡..Õ+.á^.&..&.W.á^ã&9G.uX 0000C0
05751C57 39260875 1A473926 E25EC406 57882604 47882606 5EC41F75 18573926 &9W.u.Å^.&.G.&.W.á^ã&9G.u.&9W.u. 0000E0
1FA5A5A5 A5DA8E1E :0881E7F 80001605 C28CC388 2E750066 7F832600 F3E9C028 +äÕµ.&..f.u..ü.ô.......Þ..ÖEEEE. 000100
E45688E2 468818E8 1FA5F200 08890A8E 1EF08826 7F800036 05C28CC3 88E25EC4 á^ã.ú.ô.6...&.Þ..Ö¿..·É.Š..Fã.Vô 000120
7E800016 05FE5688 F:468808 C4830723 00149A50 52003605 E2468850 52002605 .&.RP.Fã.6.RP...#..á..F=.V±....- 000140
0876FF00 6A006A04 C483FE14 E80EFC76 FF521FA5 F2000889 DA8E1E07 16F088EC &.Þ....Ö¿..·É.R.v•.Ò.±.á.j.j..v. 000160
1F161EEC 768D167F 8DFC5EC4 E646890C C48300AD 08879AE2 76FFE476 FF0676FF .v..vô.vä...Ü..á..F¦á^•....v$... 000180
164E9AFC 76FFFE76 FF0A76FF 0C76FF47 E88E0988 057400E6 7E831FA5 F2000889 ¿.. É..-¦.t.¡..ŠG.v..v..v±.v•.N. 0001A0
83067E00 FE9A5306 0A7D010A 7F8326E2 5EC42AE8 8E088805 74C00808 C483FFFF ...á..ãt.¡..Š*á^ã&....}..S.±.-.. 0001C0
C80008CA C95F5E1F 00E8C028 00016647 C726E25E C4000168 47C726E2 5EC404C4 à.á^ã&úGh..á^ã&úGf..+äŠ..^_èò..à 0001E0

Dump of file SATURN:[PCCOMMON.DUMP.DLL]BRDPLOW.TMP;1 on 18-APR-1990 10:38:06.00
File ID (528,44,0)   End of file block 272 / Allocated 272

Virtual block number 35 (00000023), 512 (0200) bytes

22E88DF3 88057508 46080646 8808740C 46080A46 88088E0C 4E881E56 57000004 ...WV.¡N..Ä.F..F.t..F..F.u.¡µ.Š" 000000
C0281FA5 A5A5A5DA 8E1EF088 F8880016 05065EC4 FE5689FC 46890C56 880A4688 .F..V..F=.V±á^.....«.Þ..ÖEEEE.+ä 000020
15E88DF3 8805750C 46080A46 88088E00 D7881E00 0000C800 08CAC95F 5E1F00E8 Š..^_èò..à....¡µ..Ä.F..F.u.¡µ.Š. 000040
881E0000 00C80008 CAC91F00 E8C02860 5789265E 47892608 56880646 880A5EC4 á^..F..V.&.G^&.W'+äŠ..èò..à....¡ 000060
5E478826 0A5EC419 E88DF388 05750846 08064688 08740C46 080A4688 D88E0E1F ...Ä.F..F.t..F..F.u.¡µ.Š.á^.&.G^ 000080
8E0E5088 1E000000 C80008CA C91F00E8 C0280257 89260789 26065EC4 60578826 &.W'á^.&..&.W.+äŠ..èò..à....¡P.. 0000A0
57882606 4788260A 5EC419E8 8DF38805 75084608 06468808 740C4608 0A468808 Ä.F..F.t..F..F.u.¡µ.Š.á^.&.G.&.W 0000C0
4688D88E 0E8D881E 000008C8 0008CAC9 1F00E8C0 28025789 26078926 065EC408 .á^.&..&.W.+äŠ..èò..à....¡...Á.F 0000E0
08064688 08740C46 080A4688 10741046 080E4688 187C0012 7E831E74 16460814 ..F.t..-..|..F..F.t..F..F.t..F.. 000100
46880003 07C7260A 5EC40789 26024789 26C0280E 5EC40086 E98DF388 06750846 F.u.¡µ.Õ..á^.+ä&.G.&..á^.&ú....F 000120
264A77FF 2655E88D F388057F 0A473926 124688F8 5EC4FA56 89F84689 16568814 ..V..F½.Vªá^½.F.&9G...¡µ.ŠU&.wJ& 000140
5EC432E8 8DF18805 74C00804 4208689A 5016FC46 8D006A50 52991246 884877FF .wH.F...RPj..F=.P.k.B..ât.¡Þ.Š2á^ 000160
C4078926 0A5EC406 478826FC 5EC40257 89260789 260E5EC4 02578826 078826FC •&..&.W.á^.&..&.W.á^•&.G.á^.&..á 000180
00000001 00200002 00009000 12CAC91F 00E8C028 07892606 5EC40447 8826FC5E ^•&.G.á^.&..+äŠ..èò........ ..... 0001A0
00000007 02C10002 00000005 02630002 00000004 005C0002 00000002 00900002 ..........\.......c.......ê..... 0001C0
0000000C 02E80002 00140003 00690203 027F0005 003A0203 00000008 021A0002 ..........:.......i.......Ò..... 0001E0

Dump of file SATURN:[PCCOMMON.DUMP.DLL]BRDPLOW.TMP;1 on 18-APR-199. 10:38:06.00
File ID (528,44,0)   End of file block 272 / Allocated 272

Virtual block number 36 (00000024), 512 (0200) bytes 00000019 0ECA0002 00000017 078F0002 00000014 0F430002 00220003 00ED0203 ..Ú...ª...C.......¢.......ò..... 000000
46890856 88064688 01FCE98D F3880675 08460806 4688D88E FFFFB81E 000022C8 à"...¡...Ä.F..F.u.¡µ.Õ»..F..V..F 000020
1076FF25 740C4608 0A4688E8 5689E646 89045788 26024788 26065EC4 F05689EE Ÿ.vÞá^.&.G.&.W..F¦.VÒ.F..F.tX.v. 000040
83FFFF00 009A026A 53526277 FF265052 003605C2 8CC3880A 76FF0C76 FF0E76FF .v..v..v..ú.ö.6.RP&.wbRSj........ 000060
77FF2652 77FF2606 5EC40089 09C29A00 6A006A50 77FF2652 77FF2606 5EC414C4 á.á^.&.wR&.wPj.j..ô...á^.&.wR&.w 000080
02F646C7 DAEBFFFF 05A49AEA 76FFEC76 FF0075C0 0800E00A 589A5016 EA468D50 P.Fõ.P.X.Å..ãu..v$.vö.Ê...ŠÖúF-. 0000A0
894A5788 2648478B 26065EC4 11EBFE56 89FC4689 4E578826 4C478826 065EC400 .á^.&.GL&.WN.F».V±Š.á^.&.GH&.WJ. 0000C0
00F09A50 16E2468D FC76FFFE 76FF0092 E90375C0 08F64EFF F6468BFE 5689FC46 F».V±.F-.N-.ãu.Õ....v±.v».Fã.P.Þ. 0000E0
7C627FF4 5639E456 88E24688 00F45683 01F24683 08E8F246 89F44689 C028011C ..+ã.F¶.F`Š..F`..V¶..Fã.V0ºV¶.b| 000100
5EC4FFFF 08689A50 16F8468D 006AF276 FFF476FF FC76FFFE 76FF5873 F2463905 .9F`s[.v±.v».v¶.v`j..F½.P.k...á^ 000120
26F85EC4 23E8FFFF 03839A04 77FF2637 FF260277 FF26F85E C428E806 478826F8 ½&.G.Š(á^½&.w.&.7&.w..°...Š#ø^½& 000140
E800E8DF 74000230 CF7E0001 300C7CC0 0810E812 E8FFFF03 029A37FF 260277FF .w.&.7.....Š.Š..à|.=..-ü=..tÕŠ.Š 000160
0674C008 FFFF02FF 9A006A06 77FF2608 77FF2606 5EC4EE76 FFF076FF FF50E988 .ðP..vÞ.vŸá^.&.w.&.w.j.......ät. 000180
C3091E9A 5016DE46 8DEE76FF F076FF14 77FF2616 77FF26E6 5EC4008E E98E0088 ¡..Õ..á^¦&.w.&.w..vÞ.vŸ.Fß.P....ú 0001A0
006ADE76 FFE076FF 1477FF26 1677FF26 E65EC418 74FFE07E 830675FF DE7E8301 ¡..-ß.u..-Å.t.á^¦&.w.&.w..vÅ.vßj. 0001C0
4C77FF26 4E77FF26 065EC401 E300689A 4877FF26 4A77FF26 065EC400 7405009A .Å.t.á^.&.wJ&.wH.h.D.á^.&.wN&.wL 0001E0

Dump of file SATURN:[PCCOMMON.DUMP.DLL]BRDPLOW.TMP;1 on 18-APR-1990 10:38:06.00
File ID (528,44,0)   End of file block 272 / Allocated 272

Virtual block number 37 (00000025), 512 (0200) bytes

```
FF0876FF 0677FF26 E65EC401 9F00689A 5077FF26 5277FF26 065EC401 F300689A .h.µ.á^.&.wR&.wP.h...á^|&.w..v.. 000000
8E000688 1E000008 C8CBC91F 00EBC02B 04EB8DF2 880574C0 080000FF FF9A0676 v.......ât.¡·.Š.+âŠ..èùà....¡... 000020
265277FF 26065EC4 0109E903 75000A7E 830129E9 8DF38806 75084608 06468808 Ä.F..F.u.¡µ.Õ)..~..u.Õ..á^.&.wR& 000040
8F0A589A 5016F846 805077FF 265277FF 26065EC4 025F09C2 9A006A00 6A5077FF .wPj.j..ô._.á^.&.wR&.wP.F½.P.X.. 000060
065EC4CF E80CC483 009809CF 9AF876FF FA76FF00 6A006A00 6A006A18 75C00802 ..âu.j.j.j.j..v*.v½.ü....á.Šüá^. 000080
16FC468D 4C77FF26 4E77FF26 065EC402 A409C29A 006A006A 4C77FF26 4E77FF26 &.wN&.wLj.j..ö.Ê.á^.&.wN&.wL.F•. 0000A0
9A37FF26 0277FF26 016ADBEB 02740106 7F8326FC 5EC41F75 C00802D8 0A589A50 P.X.Ü..âu.á^•&....t.ŠÜj.&.w.&.7. 0000C0
065EC402 F009C29A 006A006A 4877FF26 4A77FF26 065EC4C8 EB06C483 03100F6C l....á.Šàá^.&.wJ&.wHj.j..ô.Þ.á^. 0000E0
EB30EB06 478826FC 5EC44875 C00801D3 0A589A50 16FC468D 4877FF26 4A77FF26 &.wJ&.wH.F•.P.X.&..âuKá^•&.G.ŠOŠ 000100
0277FF26 FC5EC401 6A28E806 C4830138 0F6C9A37 FF260277 FF26FC5E C4016A3E >j.á^•&.w.&.7.l.8..á.Š(j.á^•&.w. 000120
E800EBDA 74000230 C7740001 30CE74C0 0810EB12 E806C483 014906A1 9A37FF26 &.7.À.1..á.Š.Š..âtö=..tú=..tÖŠ.Š 000140
1E00000C C8CBC91F 00EB0CC4 83FCADE8 0E0676FF 0876FF00 6A006A00 6A006A9C .j.j.j.j..v..v..ÒÜ=.á.Š..èùà.... 000160
46890457 88260247 8826065E C4010BE9 8DF38806 75084608 06468808 8E021D88 ¡...Á.F..F.u.¡µ.Õ..á^.&.G.&.W..F 000180
0C76FF50 1610468D FE5689FC 46894E57 88264C47 88263275 010E7E83 F65689F4 ¶.V-.-..u2&.GL&.WN.F•.V±.F..P.v. 0001A0
00107E83 2AEB00C4 E98E07B8 0675FF10 7E830CC4 8316EFE8 0EFC76FF 520A76FF .v.R.v=.Òÿ..á..-..u.¡..Õá.Š*.-.. 0001C0
4A578826 48478826 065EC400 A9E98DF3 88067D10 4638480A 47882606 5EC4007C |.á^.&.G.H;F.).¡µ.Õ`.á^.&.GH&.WJ 0001E0
```

Dump of file SATURN:[PCCOMMON.DUMP.DLL]BRDPLOW.TMP;1 on 18-APR-1990 10:38:06.00
File ID (528,44,0)   End of file block 272 / Allocated 272

Virtual block number 38 (00000026), 512 (0200) bytes

```
C0080418 08689A50 16F8468D 006A5052 99104688 FC76FFFE 76FFFE56 89FC4689 .F•.V±.v±.v•.F..RPj..F½.P.k....â 000000
07880574 C008024A 05D09A00 6A505299 104688FC 76FFFE76 FF77E88E 07880574 t.¡..Šw.v±.v•.F..RPj..Á.J..ât.¡. 000020
7E8340EB 8DF28805 74C00800 0002039A F876FFFA 76FF0677 FF26F45E C458EB8E .Š[á^¶&.w..v*.v½......ât.¡·.Šª.- 000040
7F832606 5EC42074 00127E83 0A4FFF26 065EC42D EB0C4FFF 26065EC4 0975010E ..u.á^.&.O.Š·á^.&.O..-..t á^.&.. 000060
C91F00EB C02804C4 830987E8 0E0676FF 0876FF04 C4830CFF E80E5306 097E000A ..~..S.Ò...á..v..v..Ò...á.+âŠ..è 000080
7E830674 01067E83 0L740806 7E831274 04067E83 D88E0361 881E5600 0002C8CB ùà...V.¡a..Á.~..t..~..t..~..t..- 0000A0
080A4688 18750208 7E830674 01087E83 0C740808 7E831274 04087E83 3C750206 ..u0.~..t..~..t..~..t..~..u..F.. 0000C0
0788260E 5EC40107 E98DF388 06751446 08124688 08741046 080E4688 10740C46 F.t..F..F.t..F..F.u.¡µ.Õ..á^.&.. 0000E0
04470126 125EC406 57882604 4788260E 5EC40257 11260701 26125EC4 02578826 &.W.á^.&..&.W.á^.&.G.&.W.á^.&.G. 000100
89022880 8803E6C1 02108488 E6010676 88E30102 109F88E3 D1085E88 06571126 &.W..^.1D....1D.v.1|.Ç..è|...(.. 000120
E6D10676 88E30102 109F88E3 D1085E88 009EE9FE 468803E8 08F7047D C008FE46 F±.á).¼ÁŠ..F±Õ...^.1D....1D.v.1| 000140
1276FF14 76FF0A76 FF0C76FF 5008F7FE 46881974 00024888 8303E6C1 02108488 .Ç..è|..¡H..t..F±¼ÁP.v..v..v..v. 000160
087E8360 E80000FF FF9A1276 FF1476FF 0A76FF0C 76FFFE76 FF16E800 0005779A .w...Š..v±.v..v..v..v.....Š'.-. 000180
D106571B 26044728 26125EC4 06578826 04478826 0A5EC424 7502087E 83067401 .t..-..uŠá^.&.G.&.W.á^.&+G.&.W.î 0001A0
57182607 2B26125E C4025788 26078826 0A5EC41F E8065711 26044701 26020E10 Àî@&.G.&.W.Š.á^.&..&.W.á^.&+.&.W 0001C0
E8C02800 E8A27400 B430FF5A E9037500 5A300FEB 02571126 07012602 D1E00102 .1Àî@&..&.W.Š.=Z.u.ÕZ.=Ç.tÁŠ.+âŠ 0001E0
```

Dump of file SATURN:[PCCOMMON.DUMP.DLL]BRDPLOW.TMP;1 on 18-APR-1990 10:38:06.00
File ID (528,44,0)   End of file block 272 / Allocated 272

Virtual block number 39 (00000027), 512 (0200) bytes

```
7E831274 040A7E83 40740846 08064688 D88E0488 881E5600 0010C8C8 C95E1F00 ..^èùà...V.¡...Á.F..F.tª.-..t..- 000000
010C7E83 0C74080C 7E831274 040C7E83 2875020A 7E830674 010A7E83 0C74080A ..t..-..t..~..u(.~..t..~..t..~.. 000020
5E880120 E98DF388 06751446 08124688 08741046 080E4688 1075020C 7E830674 t..~..u..F..F.t..F..F.u.¡µ.Õ ..^ 000040
00FA46C7 F8468902 28808803 E6C10210 8488E601 0A7688E3 0102109F 88E3D10C .1D....1D.v.1|.Ç..è|...(..F¼úF*. 000060
5EC4FE56 89FC4689 08568806 460303E0 C1FA4688 587D02FA 7E83FA46 FF03E800 .Š..F*.-*.)X.F*èÁ..F..V..F•.V±á^ 000080
FC5EC406 57882604 47882612 5EC40257 11260701 26FC5EC4 02578826 07882612 .&..&.W.á^•&..&.W.á^.&.G.&.W.á^• 0000A0
05619AFC 76FFFE76 FF0E76FF 1076FFF8 76FF1474 00F87E83 06571126 04470126 &.G.&.W..-½.t..v½.v..v..v±.v•.ø. 0000C0
26067C35 7F0A5739 26025788 26078826 065EC400 8DE90375 00F87E83 9FE80000 ..Š..-½.u.Õ..á^.&..&.W.&9W..5|.& 0000E0
57892607 89260A57 88260847 8826F656 89F44689 02578826 0788262D 73084739 9G.s-&..&.W..F¶.V-&.G.&.W.&..&.W 000100
5739260E 5788260C 47882606 5EC40A57 89260847 8926F656 88F44688 065EC402 .á^..F¶.V-&.G.&.W.á^.&.G.&.W.&9W 000120
5788260C 478826F2 5689F046 89065788 26044788 262F7604 47392606 7F377C06 .|7..&9G.v/&.G.&.W..FÞ.V·&.G.&.W 000140
5E1F00E8 C028OE57 89260C47 8926F256 88F04688 065EC406 57892604 4789260E .&.G.&.W.á^..FÞ.V·&.G.&.W.+âŠ..^ 000160
DA8E1EF0 881E7F8D 001605C2 8CC38806 5EC4088E 05EC881E 56570000 12C8CBC9 èùà...WV.¡&..Àá^..û.ó.......Þ..Ö 000180
F246C71F A5F20008 890A8E1E F088267F 80003605 C28CC388 065EC41F A5A5A5A5 EEEE.á^..û.ó.6...&.Þ..Ö¿...Ê.úF· 0001A0
4E578826 4C478826 065EC411 E8FE5689 FC46894A 57882648 47882606 5EC40002 ..á^.&.GH&.WJ.F•.V±Š.á^.&.GL&.WN 0001C0
09C29A00 6A006AFC 76FFFE76 FF00A8E9 0375C008 F24EFFF2 4688FE56 89FC4689 .F•.V±.F·.N·.âu.Õ¨..v±.v•j.j..ó. 0001E0
```

```
Dump of file SATURN:[PCCOMMON.DUMP.DLL]BRDPLOW.TMP;1 on 18-APR-1990 10:38:06.00
File ID (528,44,0)   End of file block 272 / Allocated 272

Virtual block number 40 (00000028), 512 (0200) bytes

 06478826 F45EC400 82E90374 C00803FC 0A589A50 16F4468D FC76FFFE 76FF07F0 Þ..v±.v•.F¶.P.X.•..åt.Õ..á^¶&.G. 000000
 05016A06 77FF2608 77FF26EE 5EC4F056 89EE4689 02578826 078826F4 5EC466E8 $fá^¶&..&.W..FŸ.VÞá^Ÿ&.w.&.w.j.. 000020
 46890257 88260788 26F45EC4 44E850E8 8E028805 74C00800 00FFFF9A 50520016 ..RP......åt.¡..ŠPŠDá^¶&..&.W..F 000040
 880574C0 080000FF FF9A5052 00140501 6A0677FF 260877FF 26F85EC4 FA5689F8 ℅.V*á^½&.w.&.w.j....RP......åt.¡ 000060
 C028FF37 E9FF67E9 00E88E74 00023091 7E000130 0C7CC008 10E812E8 1EE88E02 ..Š.Š.Š..å|.=..-.=..t/Š.Õg.Õ7.+å 000080
 60E980F3 88067508 46080646 88D88E07 6A881E56 57000046 C8C8C95F 5E1F00E8 Š..^_èüåF..WV.¡j..Ä.F..F.u.¡µ.Õ' 0000A0
 740C4608 0A4688CC 568CCA46 89C2468D C05689BE 46890016 05085688 06468804 ..F..V.....Ff.Vå.Fõ.Fõ.Vä.F..F.t 0000C0
 268E5EC4 06568804 46881FA5 A5A5A5DA 8E1E0716 F088D47E 8D0C5688 0A468841 A.F..V..-å.Þ....ÕEEEE..Få.V¤á^/& 0000E0
 C85689C6 46890657 18260447 28260A56 88084688 C45689C2 46890257 18260728 +.&.W..Fõ.Vá.FÄ.VÕ&+G.&.W..Fõ.Vå 000100
 C41FA5A5 A5A5DA8E 1E0716F0 88C27E80 1056880E 46884174 CC4608CA 46884FE8 $O.Fõ.FätA.F..V..-õ.Þ....ÕEEEE.å 000120
 C6460306 57882604 47882606 56890446 89C45613 C2460302 57882607 8826BE5E ^/&..&.W..Fõ.Vá.Få.V¤&.G.&.W..Fõ 000140
 4788260F 7502470B 26078826 CA5EC403 80E980F3 8806E8DA 56890846 89C85613 .Vå.FÄ.VÕŠ.¡µ.Õ¯.á^õ&..&.G.u.&.G 000160
 46890857 88260647 8826CE46 89464788 26065EC4 0395E9C0 28057506 47082604 .&.G.u.+äÕ..á^.&.GF.Fo&.G.&.W..F 000180
 09880675 08DE7E83 0000FFFF 9A50160E 46805016 D4468D50 52001605 E65689E4 ô.V¦...RP.Få.P.F8.P.......-8.u.¡. 0001A0
 000E7E83 2E7402DE 7E833474 010E7E83 3A7408DE 7E834074 040E7E83 035DE98E .Õ]..-8.tâ.-8.t:.-8.t4.-8.t..-8. 0001C0
 E8CE4688 0575CE46 38000325 E42ADE46 8A0074CE 4638000C 25E42ADE 468A2874 t(.F8*õ%..;Föt..F8*õ%..;Föu..FöŠ 0001E0

Dump of file SATURN:[PCCOMMON.DUMP.DLL]BRDPLOW.TMP;1 on 18-APR-1990 10:38:06.00
File ID (528,44,0)   End of file block 272 / Allocated 272

Virtual block number 41 (00000029), 512 (0200) bytes

 080AC483 0ED2E80E E476FFE6 76FFDE76 FF501604 46800E46 89000325 DE468806 ..F8%...F8.Få.P.v8.v¦.võ.Õ8..á.. 000000
 D8468802 57892607 8926CA5E C4025718 26072826 8E5EC406 56880446 883674C0 åtõ.Få.V¤á^/&+.&.W.á^õ&..&.W..FÄ 000020
 4C478826 065EC406 57892604 478926CA 5EC40657 18260447 28268E5E C40A5688 .VÕá^/&+G.&.W.á^õ&.G.&.W.á^.&.GL 000040
 08E8E046 89E24689 C0280A93 00F09A50 16004680 5052FE56 89FC4689 4E578826 &.WN.F•.V±RP.FÅ.P.Þ...+å.Fã.FÅŠ. 000060
 FE76FF7A 73E04639 057C0081 E9037EE2 56390256 88D04688 00E25683 01E04683 .FÅ..Vã..FÅ.V@9Vã-.Õ..|.9FÅsz.v± 000080
 E8027401 067F8326 E85EC408 1208689A 5016E846 8D006AE0 76FFE276 FFFC76FF .v•.vã.vÅj..FÕ.P.k...á^Õ&.....t.Š 0000A0
 77FF268A 5EC406C4 83087710 A19A016A 50528C56 898A4689 02578826 0788268F ¢&..&.W..Fo.V¥RPj..Å.w..á.á^¤&.w 0000C0
 087F80E8 5EC40000 08D89A50 16D4468D 0477FF26 E85EC400 6A006A06 77FF2608 .&.w.j.j.á^Õ&.w...Få.P.Ä...á^Õ... 0000E0
 88264847 8826065E C4FF69E9 00013847 C7268A5E C41FA5A5 A5A51F16 1ED4768D .vå...EEEE.á^¤&úG8..Õ¦.á^.&.GH&. 000100
 468308E8 E04689E2 4689C028 085400F0 9A501600 46805052 FE5689FC 46894A57 WJ.F•.V±RP.FÅ.P.Þ.Ţ.+å.Fã.FÅŠ..F 000120
 76FF0149 E90372E0 4639087C 0153E903 7EE25639 D2568800 468800E2 568301E0 Å..Vã..FÅ.V@9Vã-.ÕS.|.9FÅr.Õ¦..v 000140
 0113E906 478826E8 5EC407E0 08689A50 16E8468D 006AE076 FFE276FF FC76FFFE ±.v•.vã.vÅj..FÕ.P.k.Å.á^Õ&.G.Õ.. 000160
 88E84688 06C4830C 0810A19A 006A5052 8C56898A 46890257 88260788 26E85EC4 á^Õ&..&.W..Fo.V¥RPj..Å....á..FÕ. 000180
 26E85EC4 EE5689EC 46890857 88260647 88268A5E C4F25689 F0468900 0805EA56 Võ....FÞ.V·á^¤&.G.&.W..Fè.VŸá^Õ& 0001A0
 C0E80ECE 76FFDE76 FF501604 468DCA76 FFCC76FF F076FFF2 76FFDC46 89044788 .G..FÉ.v·.vÞ.vã.võ.Få.P.v8.vö.Õå 0001C0
 268A5EC4 0000FFFF 9AF076FF F276FFDC 76FF006A 006AEC76 FFEE76FF 10C483F8 ℅.á..vŸ.v$j.j..vÉ.v·.vÞ.....á^¤& 0001E0

Dump of file SATURN:[PCCOMMON.DUMP.DLL]BRDPLOW.TMP;1 on 18-APR-1990 10:38:06.00
File ID (528,44,0)   End of file block 272 / Allocated 272

Virtual block number 42 (0000002A), 512 (0200) bytes

 5689F446 89025788 26078826 E85EC400 93E90001 3647C726 8A5EC400 013847C7 úG8..á^¤&úG6..Õ..á^Õ&..&.W..F¶.V 000000
 4688FA56 89F84689 08578826 06478826 F45EC406 C48302C2 10A19A02 6A5052F6 -RPj..Å.õ..á.á^¶&.G.&.W..F℅.V*.F 000020
 CE76FFDE 76FF5016 D4468DCA 76FFCC76 FF5052F2 5689F046 89000805 EA5688E8 Õ.Võ....FÞ.V·RP.vã.võ.Få.P.v8.vö 000040
 76FFF876 FFFA76FF 0000FFFF 9AF076FF F276FFF8 76FFFA76 FF10C483 F830E80E .Õ=℅.á..v*.v℅.v·.vÞ......v*.v℅.v 000060
 E9037500 0230FEE6 E90375C0 0811E813 E8000130 47C726F4 5EC40000 FFFF9ADE å.....á^¶&úG0..Š.Š..åu.Õ¦±=..u.Õ 000080
 4680CA76 FFCC76FF 2174000C 7F832607 75000A7F 8326065E C4FE97E9 00E8FF6F o.Š.Õ.±á^.&....u.&....t¦.vã.võ.F 0000A0
 80167F80 065EC410 C483F92F E80E5052 003605C2 8CC388CE 76FFDE76 FF501604 å.P.v8.vö.ú.õ.6.RP.Õ/*.á.á^..... 0000C0
 065EC400 016647C7 26065EC4 46478926 DE468806 5EC41FA5 A5A5A51F 161ED476 vå...EEEE.á^..F8&.GFá^.&úGf..á^. 0000E0
 E8C02804 C4830104 C80E0676 FF0876FF 00010092 87C726E4 5EC40001 6847C726 &úGh..á^Õ&ú......v..v..Õ...á.+åŠ 000100
 F3880675 08460806 46880000 F246C7D8 8E088F88 1E560000 16C8C8C9 5F5E1F00 ..^_èüå...V.¡...ÅúF·...F..F.u.¡µ 000120
 468308E8 F44689F6 4689C028 007400F0 9A5016EE 46800676 FF0876FF 0006E980 .Õ¤-.v..v..FŸ.P.Þ.t.+å.F-.F¶Š..F 000140
 76FF0098 E90372F4 4639087C 00A2E903 7EF65639 F05688EE 468800F6 568301F4 ¶..V-..FŸ.VÞ9V--.ÕÅ.|.9F¶r.Õ...v 000160
 C461E806 478826F8 5EC40A54 08689A50 16F8468D 006AF476 FFF676FF 0676FF08 ..v..v-.v¶j..F℅.P.k.¦.á^½&.G.Šaá 000180
 50E8FFFF 1240C726 EA5EC4E6 D1047788 26EC5689 EA468902 57882607 8826F85E ^½&..&.W..Fõ.VŠ&.w.¦¦á^õ&úâ...ŠP 0001A0
 12408926 F2468BEA 5EC4E601 04778826 EC5689EA 46890257 88260788 26F85EC4 á^½&..&.W..Fõ.VŠ&.w.¦¦á^õ.F·&.â. 0001C0
 10E812E8 0E478926 F2468BFC 5EC4FE56 89FC4689 02578826 078826F8 5EC42EEB Š.á^½&..&.W..F•.V±á^•.F·&.G.Š.Š. 0001E0
```

Dump of file SATURN:[PCCOMMON.DUMP.DLL]BRDPLOW.TMP;1 on 18-APR-1990 10:38:06.00
File ID (528,44,0) End of file block 272 / Allocated 272

Virtual block number 43 (0000002B), 512 (0200) bytes

```
28C8C8C9 5E1F00E8 C028FF48 E9F246FF 00E8D474 00023D96 7400013D 8C74C008 .âtV=..t.=..tåŠ..F·ÖH.+åŠ..^èùà( 000000
05C28CC3 88F45689 F2468904 57882602 47882606 5EC4D88E 000D881E 56570000 ..WV.¡...Äé^.&.G.&.W..F·.V¶.û.ô. 000020
46890A47 8826E756 89E04689 001605C3 88E44689 46478826 FE5689FC 46890036 ó..F•.V±&.GF.Fô.û....FÅ.Vä&.G..F 000040
000E05C2 8CC38800 89E9037C 01F67E83 F05689EE 4689005E 05F4568B F24688F6 -.F·.V¶.^..FŸ.Vÿ.—.|.Ô...û.ô... 000060
4AE8E446 881FA5A5 A5A5DA8E 1E0716F0 88E67E8D E25688E0 46880E56 89DC4689 .FÉ.V8.FÅ.Vâ.-Ì.Þ....ÖÉÉÉ..FôŠJ 000080
46290657 88260447 88260C5E C44DE8EC 5611EA46 01065788 26044788 260C5EC4 á^É&.G.&.W..Fõ.V±ŠMá^É&.G.&.W.)F 0000A0
88260788 260C5EC4 28E8E856 11E64601 02578826 07882600 5EC43AEB EC5619EA ô.V±Š:á^É&..&.W..FÌ.VÒŠ(á^É&..&. 0000C0
00E8C874 000830DF 74000430 AC740002 30C47400 013D16E8 E85619E6 46290257 W.)FÌ.VÒŠ.=..tá=..t¯=..tÔ=..tàŠ. 0000E0
F8468800 3208689A 5016F846 8D006A00 6A006A48 77FF264A 77FF2606 5EC433E8 Š3á^.&.wJ&.wHj.j.j..F%.P.k.2..F% 000100
E9037C02 0A7F8326 065EC41F A5A5A5A5 DA8E1E07 16F088E6 7E8D0008 05FA568B .V⁰....-Ì.Þ....ÖÉÉÉ.á^.&....|.Õ 000120
18260728 26EE5EC4 02578826 078826E0 5EC46675 02E47E83 067401E4 7E83000C É..-ô.t..-ô.ufá^Å&..&.W.á^Y&+.&. 000140
89260447 8926FC5E C4065788 26044788 26E05EC4 02578926 078926FC 5EC40257 W.á^•&..&.W.á^Å&.G.&.W.á^•&.G.&. 000160
57892608 478926FC 5EC40257 13260703 26EE5EC4 02578826 078826E0 5EC40657 W.á^Å&..&.W.á^Y&..&.W.á^•&.G.&.W 000180
5EC40257 88260788 26E05EC4 67E80E57 89260C47 8926EC56 88EA4688 FC5EC40A .á^•.Fõ.V±&.G.&.W.Šgá^Å&..&.W.á^ 0001A0
5EC40657 18260447 2826EE5E C4065788 26044788 26E05EC4 02578926 078926FC •&..&.W.á^Å&.G.&.W.á^Y&+G.&.W.á^ 0001C0
478826E0 5EC40A57 89260847 8926E856 88E64688 FC5EC406 57892604 478926FC •&.G.&.W.á^•.FÌ.VÒ&.G.&.W.á^Å&.G 0001E0
```

Dump of file SATURN:[PCCOMMON.DUMP.DLL]BRDPLOW.TMP;1 on 18-APR-1990 10:38:06.00
File ID (528,44,0) End of file block 272 / Allocated 272

Virtual block number 44 (0000002C), 512 (0200) bytes

```
5EC40005 E90E5789 260C4789 26FC5EC4 06571326 04470326 EE5EC406 57882604 .&.W.á^Y&.G.&.W.á^•&.G.&.W.ÕÍ.á^ 000000
05FA5688 F846880E F808689A 5016F846 8D016A00 6A006A48 77FF264A 77FF2606 .&.wJ&.wHj.j.j..F%.P.k.«..F%.V⁰. 000020
078926E8 5688E646 88FC5EC4 537502E4 7E830674 01E47E83 DE56890C 46890008 ...FÉ.V8.-ô.t..-ô.uSá^•.FÌ.VÒ&.. 000040
0788260C 5EC40657 89260447 8926FC5E C4065788 26044788 26E05EC4 02578926 &.W.á^Å&.G.&.W.á^•&.G.&.W.á^É&.. 000060
478926FC 5EC40657 88260447 88260C5E C40A5789 26084789 26FC5EC4 02578826 &.W.á^•&.G.&.W.á^É&.G.&.W.á^•&.G 000080
88260C5E C4025789 26078926 FC5EC402 57882607 8826E05E C44CE80E 5789260C .&.W.ŠLá^Å&..&.W.á^•&..&.W.á^É&. 0000A0
89260847 8926E856 88E64688 FC5EC406 57892604 478926FC 5EC40657 88260447 G.&.W.á^•&.G.&.W.á^•.FÌ.VÒ&.G.&. 0000C0
57392602 57882607 8826FC5E C40E5789 260C4789 26EC5688 EA4688FC 5EC40A57 W.á^•.Fõ.V±&.G.&.W.á^•&..&.W.&9W 0000E0
0A578826 08478826 DE56890C 46890257 88260788 262D7308 47392606 7C357F0A ..5|.&9G.s-&..&.W..FÉ.V8&.G.&.W. 000100
260C4788 26FC5EC4 0A578926 08478926 DE56880C 4688FC5E C4025789 26078926 &..&.W.á^•.FÉ.V8&.G.&.W.á^•&.G.& 000120
260A5689 D8468906 57882604 4788262F 76044739 26067F37 7C065739 260E5788 .W.&9W.|7..&9G.v/&.G.&.W..FÅ.VÖ& 000140
0E578926 0C478926 DA568808 4688FC5E C4065789 26044789 260E5788 260C4788 .G.&.W.&.G.&.W.á^•.FÅ.VÖ&.G.&.W. 000160
C388C446 89464788 26065EC4 D88E0E06 881E5600 0048C8C8 C95F5E1F 00E8C028 +åŠ..^_èùàH..V.¡...Äé^.&.GF.Fé.û 000180
5E050457 88260247 8826C256 89C04689 000E05C3 888E5689 8C468900 1605C28C .ô....FŸ.V/.û....Fé.Vô&.G.&.W..^ 0001A0
3E00F09A 5016C646 805052FE 5689FC46 894A5788 26484788 26CC5689 CA468900 ..Fò.Va&.GH&.WJ.F•.V±RP.Fó.P.Þ.> 0001C0
56890846 89020160 01025788 26078826 CA5EC41C 7502C47E 83067401 C47E8312 ..-é.t..-é.u.á^ò&..&.W.ÌÁÌ0.FÅ.V 0001E0
```

Dump of file SATUP'I:[PCCOMMON.DUMP.DLL]BRDPLOW.TMP;1 on 18-APR-1990 10:38:06.00
File ID (528,44,0, End of file block 272 / Allocated 272

Virtual block number 45 (0000002D), 512 (0200) bytes

```
4689DA56 89084689 D2D1E0D1 06578826 04478826 CA5EC418 E8D65689 D44689DA Ö.Få.VøŠ.á^ò&.G.&.W.ÌÁÌ0.FÅ.VÖ.F 000000
7FE25639 C85688C6 468800E2 568301E0 468308E8 E04689E2 4689C02B D65689D4 Å.Vø+á.Fä.FÅŠ..FÅ..Vã..Fó.Và9Vä. 000020
1436086B 9A5016E8 468D006A E076FFE2 76FFFC76 FFFE76FF 7373E046 39057C7A z|.9FÅss.v±.v•.vã.vÅj..FÒ.P.k.ó. 000040
0877FF26 F45EC4F6 5689F446 89025788 26078826 C2E80274 02067F83 26E85EC4 á^ò&....t.Šò&..&.W..F¶.V-á^¶&.w. 000060
7F197CD6 563BDA56 13084603 D05688CE 46880000 FFFF9A50 16CE468D 0677FF26 &.w..Fö.P......Fö.VÅ.FÅ.VÖ;Vø|.. 000080
FF026A00 6AFF73E9 D6568904 46890A56 13084603 D05688CE 46881276 D446380S .;Fåv..Fö.VÅ.FÄ.VÖ.Få.VøÖs.j.j.. 0000A0
C4009AE9 037402C4 7E830974 01C47E83 DE56890C 46891202 00609AC6 76FFC876 vå.vó.'.0..FÉ.V8.-á.t..-á.t.Ô..á 0000C0
08C02802 E80001B8 0575D008 12F80130 9AD476FF D676FF37 FF260277 FF26CA5E ^ò&.w.&.7.vø.vå.0.«..Åu.¡..Š.+å. 0000E0
CA5EC413 03028F9A D45E8D37 FF260277 FF26CA5E C444E806 56880446 880874C0 åt..Få.VøŠDá^ò&.w.&.7.^å.¢...á^ò 000100
569AD888 08C48313 2107CE9A 131703EF 9ADC8808 EC831312 06C79A13 0802C39A .û....ú....&..É.ÿ....ö.I..á..Ä.V 000120
00FC9ADC 76FFDE76 FF505206 56890446 89134000 FC9A5052 132D04A6 9A132602 .&..Ì.·.RP.•.ä..Få.VøRP.v8.vÉ.•. 000140
0677FF26 CA5EC400 9DE9E676 89E44E89 F218C828 02778826 0F88268C 5EC4136D m.á^Y&..&.w.+à.·.Nô.vÌÕ..á^ò&.w. 000160
46880874 C008C028 02E80001 88057500 08138C01 309AD476 FFD676FF 0477FF26 &.w..vø.vå.0....Åu.¡..Š.+ä.ât..F 000180
EC8313A6 06C79A13 9C02C39A 045F8DCA 5EC41397 028F9AD4 5E8D48E8 D65688D4 å.VøŠH.^å.¢...á^ò._..û....ú.Ì..å 0001A0
5EC45052 13CC04A6 9A138A02 569AD888 08C48313 8507CE9A 13A803EF 9ADC8808 ..É.ÿ.¨..ö.ç..á..Ä¯V.¤..Ì.ä.RPá^ 0001C0
FF00FC9A DC76FFDE 76FF5052 D6568904 4689130F 00FC9A04 77FF2606 77FF26CA ò&.w.&.w..•.Ô..Få.VøRP.v8.vÉ.•.. 0001E0
```

Dump of file SATURN:[PCCOMMON.DUMP.DLL]BRDPLOW.TMP;1 on 18-APR-1990 10:38:06.00
File ID (528,44,0)   End of file block 272 / Allocated 272

Virtual block number 46 (0000002E), 512 (0200) bytes

```
08EBE046 89E24689 C02BE676 89E44E89 F218C828 06778826 044F8826 BC5EC4FF .á^¥&.O.&.W.+à.·.NÕ.vl+à.Fã.FÅS. 000000
0250E903 72E04639 087C0267 E9037EE2 5639C856 88C64688 00E25683 01E04683 .FÅ..Vã..Fó.Và9Vã-.Õg.|.9FÅr.Õ]. 000020
0805EA56 88E84688 10170868 9A5016E8 4680006A E076FFE2 76FFFC76 FFFE76FF .v±.v=.vã.vÅj..FÒ.P.k....FÒ.Võ.. 000040
BC5EC402 57892607 8926E656 88E44688 F05EC400 CCE9C446 88F25689 F0468900 ..FÞ.V·.Fáõa.á^Þ.Fõ.Vl&..&.W.á^¥ 000060
B4E90657 89260447 8926F05E C4065713 26044703 26C05EC4 06578826 04478826 &.G.&.W.á^á&.G.&.W.á^Þ&.G.&.W.ÕÇ 000080
26C05EC4 06578826 04478826 BC5EC402 57892607 8926E656 88E44688 F05EC400 .á^Þ.Fõ.Vl&..&.W.á^¥&.G.&.W.á^á& 0000A0
C4025788 26078826 BC5EC400 80E90657 89260447 8926F05E C406571B 26044728 +G.&.W.á^Þ&.G.&.W.Õ..á^¥&..&.W.á 0000C0
04478926 E6568BE4 4688F05E C4025789 26078926 F05EC402 57132607 0326C05E ^á&..&.W.á^Þ&..&.W.á^Þ.Fõ.Vl&.G. 0000E0
078926F0 5EC40257 18260728 26C05EC4 02578826 0788268C 5EC44FE8 06578926 &.W.Sóá^¥&..&.W.á^á&+.&.W.á^Þ&.. 000100
60E90375 00013D1C ≡B1EE806 57892604 478926E6 5688E446 88F05EC4 02578926 &.W.á^Þ.Fõ.Vl&.G.&.W.Š.Š.=..u.Õ' 000120
C4000BE9 06478826 E85EC400 E8827400 08308874 000430FF 24E90375 000230FF .=..u.Õ$.=..t|=..t.Š.á^Õ&.G.ÕU.á 000140
EE5689EC 46890857 88260647 8826885E C48A5689 88468902 57882607 8826E85E ^Õ&..&.W..F|.Voá^|&.G.&.W..F&.VŸ 000160
EC76FFEE 76FF06C4 830A8510 A19A006A 8876FF8A 76FFD246 89044788 26E85EC4 á^Õ&.G..F@.vo.v|j..À.ç..á..vŸ.v& 000180
408926E0 4688885E C4E60102 76880000 0AD69AF0 76FFF276 FFD276FF 006A006A j.j..v@.v·.vÞ.@....v@Ílá^|.FÅ&.a 0001A0
89025788 26078826 E85EC473 E8000136 47C72688 5EC40001 3847C726 885EC412 .á^|&úG8..á^|&úG6..Ssá^Õ&..&.W.. 0001C0
8316E010 A19A026A 5306FA56 89F84689 08578826 06478826 F45EC4F6 5689F446 F¶.V-á^¶&.G.&.W..F%.V'.Sj..À.Ú.. 0001E0
```

Dump of file SATURN:[PCCOMMON.DUMP.DLL]BRDPLOW.TMP;1 on 18-APR-1990 10:38:06.00
File ID (528,44,0)   End of file block 272 / Allocated 272

Virtual block number 47 (0000002F), 512 (0200) bytes

```
4677FF26 065EC4F8 76FFFA76 FF00000C 549AF076 FFF276FF F876FFFA 76FF06C4 á..v'.v½.v·.vÞ.T....v'.v½á^.&.wF 000000
1EE90375 C00B0EEB 00013047 C726F45E C40E4789 26E04688 F45EC400 000C629A .b...á^¶.FÅ&.G.á^¶&úGO..$..àu.Õ. 000020
02E80001 88057500 0812A801 309AC676 FFC876FF 026A006A 00E88F74 00023DFF .=..t.$.j.j..và.vó.0.´..Åu.|..$. 000040
88D4468B 1275E256 3B1775E0 4638000A 8300012D 0E5688DC 46882874 C00BC02B +à.àt(.FÉ.V8·...Õ.;FÅu.;Vãu..Fà. 000060
065EC4FD 83E9E656 11E44601 D6568804 46880CEB E65611E4 4601D2D1 E0D10656 V@lÅl@.Fõ.VlS..Fà.V@.Fõ.VlÕ.»á^. 000080
89E24689 C02B1604 00F09A50 16C6468D 5052FE56 89FC4689 4E578826 4C478826 &.GL&.WN.F=.V±RP.Fó.P.Þ.à.+à.Fã. 0000A0
76FF3F73 E0463905 7C467FE2 5639C856 88C64688 00E25683 01E04683 08EBE046 FÅS..FÅ..Vã..Fó.Và9Vã.F|.9FÅs7.v 0000C0
02578826 078826E8 5EC411BF 08689A50 16E8468D 006AE076 FFE276FF FC76FFFE ±.v=.vã.vÅj..FÒ.P.k.¢.á^Õ&..&.W. 0000E0
E8C02BA7 E8000138 47C72688 5EC406C4 83157510 A19A016A 5052BA56 89884689 .F|.V□RPj..À.u..á.á^|&úG8..ŠT+àŠ 000100
740C4608 0A468820 7408460B 06468808 8E117088 1E565700 0016C8C8 C95E1F00 ..^èúà...WV.|p..Ä.F..F.t .F..F.t 000120
C4018AE9 8DF38806 7401107E 830C7400 107E830C 7F020E7E 83127C00 0E7E8318 ..~..|..~.....~..t..~..t.|¤.Õ..á 000140
7E83067F 124639FA 468814E8 00001246 C7077FFF 127E83FA 46890A47 8826065E ^.&.G..F'.~....úF...Š..F'9F....~ 000160
00667F83 26F85689 F6468904 57882602 47882606 5EC4015F E98E0A88 0675010E ..u.|..Õ_.á^.&.G.&.W..F~.V½&..f. 000180
0E6A0677 FF26F65E C41FA5F2 0008890A 8E1EF088 267F8000 3605C28C C3881575 u..ü.ò.6...&.Þ..Õ¿..·E.á^-&.w.j. 0001A0
260C5688 0A4688FC 5EC40113 E98DF288 0674C008 0000FFFF 9A5016FC 4680106A j..F=.P......àt.|·.Õ..á^=.F..V.& 0001C0
0E4688FC 5EC40447 8926FC5E C4104688 03E8C028 0475020E 7E830257 89260789 ..&.W..~..u.+àŠ..F.á^=&.G.á^=.F. 0001E0
```

Dump of file SATURN:[PCCOMMON.DUMP.DLL]BRDPLOW.TMP;1 on 18-APR-1990 10:38:06.00
File ID (528,44,0)   End of file block 272 / Allocated 272

Virtual block number 48 (00000030), 512 (0200) bytes

```
77FF264E 77FF2606 5EC4F056 89EE4689 0C56880A 46887F75 010E7E83 06478926 &.G..~..u..F..V..FŸ.VÞá^.&.wN&.w 000000
56880646 880C47FF 26065EC4 16980290 9AFC76FF FE76FF00 6A016A00 6A006A4C Lj.j.j.j..v±.v=.....á^.&.G..F..V 000020
8E9A5052 1076FF00 6A006A06 77FF2608 77FF26EE 5EC4EC56 89EA4689 00160508 .....Fõ.Všá^Ÿ&.w.&.w.j.j..v.RP.. 000040
1EF08808 7F80EC56 88EA4688 FC5EC4FF FF1240C7 26EE5EC4 E6D11076 88000015 ....v.||á^Ÿ&úa...á^=.Fõ.V&....Þ. 000060
76FF006A 006A5052 99124688 4877FF26 4A77FF26 065EC434 E81FA5A5 A5A5DA8E .ÕEEEE.Š4á^.&.wJ&.wH.F..RPj.j..v 000080
0876FF04 C483F8CF E80E0676 FF0876FF 0A47FF26 065EC418 1202909A FC76FFFE ±.v=.....á^.&.G..v...v..ÕU½.á..v. 0000A0
C726F25E C4F45689 F2468908 57882606 47882606 5EC404C4 83F557E8 0E0676FF .v..ÕV½.á.á^.&.G.&.W..F·.V¶á^·&ú 0000C0
08460806 4688D88E 1700B81E 56570000 1CC8C8C9 5F5E1F00 E8C02800 01009287 .....+àŠ..^_èúà...WV.|...Ä.F..F. 0000E0
0E46080C 46880875 020A7E83 0674010A 7E830C74 080A7E83 1274040A 7E832074 t .~..t..~..t..~..t..~..u..F..F. 000100
1D7F0002 7F8326EC 5EC4EE56 89EC4689 005E0508 56880646 88018EE9 C0280575 u.+àÕ...F..V..^..F&.VŸá^&&...... 000120
0C468801 58E9C028 05750004 7F832607 7C0E7F00 067F8326 1575003F 8326067C |.&.7.u.&......|.&....u.+àÕX..F. 000140
F088F07E 80001605 08568806 46881FA5 A5A5A50A 8E1E0716 F088E47E 8F^F5688 .V..~ð.Þ....ÕEEEE..F..V.....~Þ.Þ 000160
57882604 478826F2 5611F046 01025788 26078826 EE468E1F A5F20008 890/.3E1E ..Õ¿..·E..FŸ&..&.W..FÞ.V·&.G.&.W 000180
19FC4629 06578826 04478826 FA5619F8 46290257 88260788 26F65611 F446.:06 ..F¶.V-&..&.W.)F½.V'&.G.&.W.)F=. 0001A0
0C5EC44A 74003F83 26067F52 7C00027F 83265975 020A7E83 0674010A 7E83F£56 V±.~..t..~..uY&....|R..&.?.tJá^. 0001C0
02578926 078926F2 5688F046 880F7307 3926057C 167F0257 3926F256 88F04688 .FÞ.V·&9W...|.&9.s..FÞ.V·&..&.W. 0001E0
```

```
Dump of file SATURN:[PCCOMMON.DUMP.DLL]BRDPLOW.TMP;1 on 18-APR-1990 10:38:06.00
File ID (528,44,0)   End of file block 272 / Allocated 272

Virtual block number 49 (00000031), 512 (0200) bytes

 8926FA56 88F84688 00760739 26057F14 7C025739 26FA5688 F84688OC 5EC423EB  000000
 F44688OC 5EC44C74 00047F83 26077F55 7C00067F 8326EC5E C45FEB02 57892607  000020
 EB065789 26044789 26F65688 F4468810 73044739 26067C18 7F065739 26F65688  000040
 8926FE56 88FC4688 0E760447 3926067F 167C0657 3926FE56 88FC4688 0C5EC425  000060
 EA5688E8 46881275 02573926 18750739 26E65688 E44688OC 5EC40657 89260447  000080
 881E0000 0CC8C8C9 5F5E1F00 EBC02802 EB000188 05740657 39260675 04473926  0000A0
 260E5EC4 08741046 080E4688 16751046 080E4688 08740846 08064688 D88E1806  0000C0
 147F00FE 7E8318 2E 00F09A50 16FC468D 0676FF08 76FF0096 E98DF388 FFFF07C7  0000E0
 468308EB F44689F6 4689C028 6CE8C028 FFFF07C7 260E5EC4 0C7301FC 7E83067C  000100
 76FF0676 FF0876FF 3C73F446 39057C43 7FF65639 FE5688FC 468800F6 568301F4  000120
 39261475 0739260C 56880A46 88F85EC4 18870868 9A5016F8 4680006A F476FFF6  000140
 00EBC028 FFFF07C7 260E5EC4 AAEB0EE8 00018807 8926F446 880E5EC4 0E750257  000160
 02030000 000515D0 00020000 0003017A 000201E7 00041 5EF 02030012 90CBC91F  000180
 0203008A 0004183F 02030000 00080276 00020000 00070326 000201FA 0004126A  0001A0
 02030022 00030431 02030000 000C005D 0002020E 00041601 02030014 000317A8  0001C0
 00020000 00171635 00020033 0004068E 02030000 00141AD8 0002021E 00040857  0001E0

Dump of file SATURN:[PCCOMMON.DUMP.DLL]BRDPLOW.TMP;1 on 18-APR-1990 10:38:06.00
File ID (528,44,0)   End of file block 272 / Allocated 272

Virtual block number 50 (00000032), 512 (0200) bytes

 00000000 00000000 00000050 00040994 020300CC 00040825 02030000 00191AA0  000000
 E98DF388 06750846 08064688 08740C46 080A4688 D88EFFFF 881E5657 00001AC8  000020
 46880000 FFFF9A50 16FC468D 0A76FF0C 76FF0789 26024789 26C02806 5EC40148  000040
 6A50F246 89064788 26F45EC4 0119E98D F1880675 0008F656 89F44689 FE5688FC  000060
 8902688E F888E65E C400F6E9 8DF28806 74C00800 00FFFF9A 5016E646 803E6A0E  000080
 FFE876FF F276FF14 74C00800 CC00009A 50520026 05C28CC3 88F276FF A5F2001F  0000A0
 5EC42474 C0080000 FFFF9A50 16F8468D F276FF00 C0E98E02 88000000 D89AE676  0000C0
 E98E0288 0000FFFF 9AE676FF E876FFF2 76FF0157 00689A26 77FF2628 77FF26E6  0000E0
 159A5016 EA468050 5050F876 FFFA76FF EE4689F0 4689EA46 89EC4689 C02B0088  000100
 88F44688 E65EC400 00FFFF9A 5016EA46 8D016A00 6A006AF8 76FFFA76 FF000001  000120
 FF26F45E C4085789 26064789 26FA5688 F84688E6 5EC40457 89260247 8926F656  000140
 88E64688 065EC4FF FF02909A E676FFE8 76FF006A 016A006A 006A1477 FF261677  000160
 88D88E00 08881E56 000012C8 0008CAC9 5F5E1F00 E8C02802 57892607 8926E856  000180
 02478826 F45EC4F6 5689F446 890A5688 08468800 EFE98DF3 8806750A 46080846  0001A0
 00ACE80E F476FFF6 76FF0676 FF137502 3F8326F8 5EC4FA56 89F84689 04578826  0001C0
 262877FF 26F45EC4 0083E903 7500067E 83000134 47C726F4 5EC40086 E906C483  0001E0

Dump of file SATURN:[PCCOMMON.DUMP.DLL]BRDPLOW.TMP;1 on 18-APR-1990 10:38:06.00
File ID (528,44,0)   End of file block 272 / Allocated 272

Virtual block number 51 (00000033), 512 (0200) bytes

 930A589A 5016FC46 8D2677FF 262877FF 26F45EC4 01FF09C2 9A006A00 6A2C77FF  000000
 01EE7E83 EE46FF03 EB0000EE 46C7DAEB FFFF0404 9AFC76FF FE76FF00 75C0C900  000020
 F276FF1C 74D008F2 5689F046 890C5088 260A4088 26F45EC4 02E6C1EE 7688397F  000040
 76FF0A76 FF8EEBFF FF01659A 006AF076 FFF276FF 0074C008 04C4830F 6AE80E50  000060
 CAC95E1F 00EBC028 04E88E07 880574C0 0808C483 FFFF044A 9AF876FF FA76FF08  000080
 067E830C 740C4608 0A468814 74104608 0E468808 8E017888 1E560000 14C80006  0000A0
 56880A46 88F25689 F0468910 56880E46 8800FEE9 8DF38806 7401067E 830C7400  0000C0
 89000A05 C28CC388 FA5689F8 46890457 88260247 8826F05E C4F65689 F446890C  0000E0
 26FC76C4 02E3C106 5E881275 00647F83 26F45EC4 1C750034 7F8326FE 5689FC46  000100
 0089260C 56880A46 88FC76C4 02E3C106 5E88009F E98E0088 06740240 08260088  000120
 76FF1076 FF500001 8803E8C0 28047503 3F8326F0 5EC40676 FF0876FF 02508926  000140
 261677FF 26F85EC4 55E88E00 880574C0 080EC483 FFFF1705 9AF476FF F676FF0E  000160
 C41874FF EE7E8306 75FFEC7E 83039509 1E9A5016 EC46800E 76FF1076 FF1477FF  000180
 00016647 C726F45E C401EA05 D09A006A EC76FFEE 76FF1477 FF261677 FF26F85E  0001A0
 46880888E 0289881E 5600000C C8000CCA C95E1F00 EBC02800 013847C7 26F05EC4  0001C0
 46890A56 88084688 0000E980 F3880674 01067E83 0C740006 7E830C74 0A460808  0001E0
```

```
Dump of file SATURN:[PCCOMMON.DUMP.DLL]BRDPLOW.TMP;1 on 18-APR-1990 10:38:06.00
File ID (528,44,0)   End of file block 272 / Allocated 272

Virtual block number 52 (00000034), 512 (0200) bytes

 1205F446 03E0D106 4688FA56 89F84689 000A05F4 460302E0 C1064688 F65689F4 ¶.V-.F.èÁ..F¶....F½.Vº.F.¦Á.F¶.. 000000
 87E98E00 B8FFFFJ7 C726FC5E C40E7502 47082607 8826F85E C4FE5689 FC468900 ..F=.V±á^½&..&.G.u.á^=&ú...|..Ö. 000020
 0876FF0A 76FF5000 018803E8 C02B0475 033F8326 F45EC437 FF26FC5E C4016A00 .j.á^=&.7á^¶&.?.u.+àS.|..P.v..v. 000040
 1801067E 8340E88E 00880574 C0080EC4 83034A03 5B9A37FF 260277FF 26F85EC4 á^½&.w.&.7.(.J..á..àt.|..ŠM.-... 000060
 6A1477FF 261677FF 26025FC4 261F750C 4008260A 408826F4 5EC402E6 C10EF7F6 -¼8é|.á^¶&.ä.&.ä.u.&á_.&.w.&.w.j 000080
 5EC40789 26024789 26C028F8 5EC40371 02909A08 76FF0A76 FF006A01 6A006A00 .j.j.j..v..v....q.á^¼+à&.G.&..á^ 0000A0
 05750C46 080A4688 088E038A 881E0000 04C80006 CAC95E1F 00E8FFFF 07C726FC =&ú...Š..^èò..à....|¤..Ä.F..F.u. 0000C0
 89262E47 89260856 88064688 FC5EC4FE 5689FC46 890C5688 0A468821 E88DF388 |µ.Š!.F..V..F=.V±á^=.F..V.&.G.&. 0000E0
 06468808 740C4608 0A4688D8 8E04B4B8 1E000004 C80008CA C91F00E8 C02B3057 W0+àS..èò..à....|Ç..Ä.F..F.t..F. 000100
 5788262E 478826FC 5EC4FE56 89FC4689 0C56880A 468825E8 8DF38805 75084608 .F.u.|µ.Š%.F..V..F=.V±á^=&.G.&.W 000120
 4688088E 04F1B81E 000004C8 0008CAC9 1F00E8C0 28025789 26078926 065EC430 0á^.&..&.W.+àS..èò..à....|þ..Ä.F 000140
 C4FE5689 FC46890C 56880A46 8825E88D F3880575 08460806 46880874 0C46080A ..F.t..F..F.u.|µ.Š%.F..V..F=.V±á 000160
 0010C800 08CAC91F 00E8C028 02578926 07892606 5EC40857 88260647 8826FC5E ^=&.G.&.W.á^.&..&.W.+àS..èò..à.. 000180
 880A4688 7BE880F3 88L57508 46080646 8808740C 46080A46 88D88E05 3A881E00 ..|:..Ä.F..F.t..F..F.u.|µ.Š(.F.. 0001A0
 C0080000 FFFF9A06 76FF0876 FF0677FF 260877FF 26F05EC4 F25689F0 4C??0C56 V..Fþ.V·á^þ&.w.&.w..v..v.......á 0001C0
 F876FF0A 76FF0C76 FF3C7F01 F87E83F8 46FF03E8 0000F846 C750E88E 028b?574 t.|..ŠPúF½..Š..F½.-½..<.v..v..v½ 0001E0

Dump of file SATURN:[PCCOMMON.DUMP.DLL]BRDPLOW.TMP;1 on 18-APR-1990 10:38:06.00
File ID (528,44,0)   End of file block 272 / Allocated 272

Virtual block number 53 (00000035), 512 (0200) bytes

 0676FF08 76FFF656 89F44689 FC5688FA 46880720 E80E5016 FE468050 16FA4680 .Fº.P.F±.P.Ò ..Fº.V=.F¶.V-.v..v. 000000
 000006C8 0008CAC9 1F00E8C0 2888E800 0000FF9A 50520016 05F876FF 006A006A j.j..v½...RP.....ŠE+àS..èò..à... 000020
 5EC40C74 08460806 46881975 08460806 46880874 0C46080A 4688D88E 0583881E .|...Ä.F..F.t..F..F.u..F..F.t.á^ 000040
 00043016 7400033D FE468907 88260A5E C453E880 F3880789 26024789 26C02806 .+à&.G.&..|µ.ŠSá^.&...F±=..t.=.. 000060
 C4FC5689 FA46890C 56880A46 882FE88D F5880789 26024789 26C02806 5EC41174 t.á^.+à&.G.&..|¾.Š/.F..V..Fº.V=á 000080
 C02804E8 8E028805 74C00800 00FFFF9A 0676FF08 76FF0677 FF260877 FF26FA5E ^º&.w.&.w..v..v.......àt.|..Š.+à 0000A0
 83147C00 0E7E831A 74124608 10468808 8E0622B8 1E000006 C80008CA C91F00E8 Š..èò..à....|"..Ä.F..F.t..-..|.. 0000C0
 46890788 26105EC4 4EE880F3 88057508 46080646 88087501 0A7E8306 74000A7E -..t..-..u..F..F.u.|µ.ŠNá^.&...F 0000E0
 77FF26FA 5EC4FC56 89FA4689 C28CC388 36E880F5 88057400 04300A74 000330FE ±=..t.=..t.|¾.Š6.û.ò.Fº.V=á^º&.w 000100
 8E028805 74C00800 00FFFF9A 0676FF08 76FF0A76 FF0C76FF 0E76FF06 77FF2608 .&.w..v..v..v..v..v.......àt.|.. 000120
 0E7E831A 74124608 10468808 8E06AD88 1E000006 C8000ECA C91F00E8 C02804E8 Š.+àS..èò..à....|Ù..Ä.F..F.t..-. 000140
 105EC400 82E980F3 88067508 46080646 88087501 0A7E8306 74000A7E 83147C00 .|..-..t..-..u..F..F.u.|µ.Õ..á^. 000160
 C4FC5689 FA4689C2 8CC3886A E880F588 05740004 300A7400 0330FE46 89078826 &...F±=..t.=..t.|¾.Šj.û.ò.Fº.V=á 000180
 C483084A E80E5306 0C76FF0E 76FF0A76 FF016A52 E88E0C88 0575043F 8326FA5E ^º&.?.u.|..ŠRj..v..v..v..S.ÒJ..á 0001A0
 76FF0A76 FF0C76FF 0E76FF06 77FF2608 77FF26FA 5EC435E8 8DF38805 75C0080C ..àu.|µ.ŠSá^º&.w.&.w..v..v..v..v 0001C0
 1F00E8C0 28000138 47C726FA 5EC400E8 8E028805 74C00800 0006009A 0676FF08 ..v.......àt.|..Š.á^º&úG8..+àS.. 0001E0

Dump of file SATURN:[PCCOMMON.DUMP.DLL]BRDPLOW.TMP;1 on 18-APR-1990 10:38:06.00
File ID (528,44,0)   End of file block 272 / Allocated 272

Virtual block number 54 (00000036), 512 (0200) bytes

 000A7E83 147C000E 7E831A74 12460810 4688088E 0731881E 000012C8 000ECAC9 èò..à....|1..Ä.F..F.t..-..|..-.. 000000
 30FA4689 07882610 5EC40005 E980F388 06750846 08064688 0875010A 7E830674 t..-..u..F..F.u.|µ.Õf.á^.&...Fº= 000020
 043F8326 EE5EC4F0 5689EE46 89C28CC3 8800BCE9 8DF58806 74000430 08740003 ..t.=..t.|¾.Õ¥..û.ò.F¥.Vþá^¥&.?. 000040
 0675C008 0CC48307 8FE80E53 060C76FF 0E76FF0A 76FF006A 00A3E98E 00880675 u.|..ÖÈ.j..v..v..v..S.Ò...á..àu. 000060
 FF0C76FF 0E76FF50 52FE5689 FC468908 57882606 478826EE 5EC40085 E980F388 |µ.Ö..á^¥&.G.&.W..F=.V±RP.v..v.. 000080
 3926F456 88F24688 065EC456 E88E0288 0574C008 00000715 9A5016F2 46800A76 v..F..P......àt.|..Švá^..F..V¶&9 0000A0
 FF2CE8C0 28047506 5739260A 75044739 26F85688 F6468816 75025739 261C7507 .u.&9W.u..F-.V¼&9G.u.&9W.u.+àS,. 0000C0
 5EC400E8 8E028805 74C00800 00FFFF9A 53060A76 FF0C76FF 0E76FFFC 76FFFE76 v±.v=.v..v..v..S......àt.|..Š.á^ 0000E0
 0E46080C 4688088E 07EA881E 000006C8 000ECAC9 1F00E8C0 28000138 47C726EE ¥&úG8..+àS..èò..à....|ð..Ä.F..F. 000100
 89078826 0C5EC47C E880F388 05740106 7E830874 00067E83 0C7C000A 7E831274 t..-..|..-..t..-..t.|µ.Š|á^.&... 000120
 8326FA5E C4FC5689 FA4689C2 8CC38864 E880F588 05740004 300A7400 0330FE46 F±=..t.=..t.|¾.Šd.û.ò.Fº.V=á^º&. 000140
 75C0080C C483068E E80E5306 0876FF0A 76FF0676 FF006A4C E88E0E88 0575043F ?.u.|..ŠLj..v..v..v..S.Ò...á..àu 000160
 080000FF FF9A0676 FF0876FF 0A76FF06 77FF2608 77FF26FA 5EC42FE8 8DF38805 .|µ.Š/á^º&.w.&.w..v..v..v....... 000180
 881E0000 04C8000A CAC91F00 E8C02800 013847C7 26FA5EC4 00E88E02 880574C0 àt.|..Š.á^º&úG8..+àS..èò..à....| 0001A0
 7E830874 00087E83 0C7F020A 7E83127C 000A7E83 18740E46 080C4688 088E08F6 -..Ä.F..F.t..-..|..-.......-..t..- 0001C0
 0677FF26 0877FF26 FC5EC4FE 5689FC46 890E5688 0C468832 E88DF388 05740108 ..t.|µ.Š2.F..V..F=.V±á^=&.w.&.w. 0001E0
```

Dump of file SATURN:[PCCOMMON.DUMP.DLL]BRDPLOW.TMP;1 on 18-APR-1990 10:38:06.00
File ID (528,44,0) End of file block 272 / Allocated 272

Virtual block number 55 (00000037), 512 (0200) bytes

```
000ACAC9 1F00EBC0 2B04EB8E 02B80574 C00B0000 FFFF9A06 76FF0876 F::A76FF .v..v..v.......ât.¡..Š.+âŠ..èò.. 000000
7E83147F 020C7E83 1A7C000C 7E832074 1046080E 4688D88E 09A0881E 00G'04C8 â....¡...Ä.F..F.t .-..|..-.....- 000020
FC468910 5688OF46 8835EB8D F3B80575 08460806 46880875 010A7E83 0674'00A ..t..-..u..F..F.u.¡µ.$5.F..V..F= 000040
080000FF FF9A0676 FF0876FF 0A76FF0C 76FF0677 FF260877 FF26FC5E C4FE5689 .V±á^=&.w.&.w..v..v..v..v....... 000060
46080C46 88D88E0A 06881E00 0004C800 0CCAC91F 00EBC02B 04E88E02 B80574C0 ât.¡..Š.+âŠ..èò..à....¡...Ä.F..F 000080
0E56880C 46882FEB 80F38805 7D00087E 83067501 0A7E8306 74000A7E 8312740E .t..-..t..-..u..-..).¡µ.$/.F..V. 0000A0
0574C008 0000FFFF 9A0676FF 0876FF06 77FF2608 77FF26FC 5EC4FE56 89FC4689 .F=.V±á^=&.w.&.w..v..v.......ât. 0000C0
14740E46 080C4688 D88E0A77 881E0000 04C8000A CAC91F00 EBC02B04 EB8E0288 ¡..Š.+âŠ..èò..à....¡w..Á.F..F.t. 0000E0
890E5688 0C46882F EB8DF3B8 05750846 08064688 0875010A 7E830674 000A7E83 .-..t..-..u..F..F.u.¡µ.$/.F..V.. 000100
880574C0 080000FF FF9A0676 FF0876FF 0677FF26 0877FF26 FC5EC4FE 5689FC46 F=.V±á^=&.w.&.w..v..v.......ât.¡ 000120
830C7412 46081046 88D88E0A D4881E00 0004C800 0ACAC91F 00EBC02B 04EB8E02 ..Š.+âŠ..èò..à....¡Â..Ä.F..F.t.. 000140
26FC5EC4 FE5689FC 46891256 88104688 35EB8DF3 B8057401 0E7E8308 74000E7E -..t..-..t.¡µ.$5.F..V..F=.V±á^=& 000160
EB8E0288 0574C008 0000FFFF 9A0676FF 0876FF0A 76FF0C76 FF0677FF 260877FF .w.&.w..v..v..v..v.......ât.¡..Š 000180
000E7E83 0C741246 08104688 D88E0833 881E0000 04C8000E CAC91F00 EBC02B04 .+âŠ..èò..à....¡3..Ä.F..F.t..-.. 0001A0
0877FF26 FC5EC4FE 5689FC46 89125688 10468835 EB8DF3B8 0574010E 7E830874 t..-..t.¡µ.$5.F..V..F=.V±á^=&.w. 0001C0
C02B04EB 8E02B805 74C00800 00FFFF9A 0676FF08 76FF0A76 FF0C76FF 0677FF26 &.w..v..v..v..v.......ât.¡..Š.+â 0001E0
```

Dump of file SATURN:[PCCOMMON.DUMP.DLL]BRDPLOW.TMP;1 on 18-APR-1990 10:38:06.00
File ID (528,44,0) End of file block 272 / Allocated 272

Virtual block number 56 (00000038), 512 (0200) bytes

```
83087400 127E830C 74164608 144688D8 8E089088 1E000004 C8000ECA C91F00E8 Š..èò..à....¡...Ä.F..F.t..-..t.. 000000
77FF2608 77FF26FC 5EC4FE56 89FC4689 16568814 468838E8 8DF38805 7401127E -..t.¡µ.Š;.F..V..F=.V±á^=&.w.&.w 000020
EB8E0288 0574C008 0000FFFF 9A0676FF 0876FF0A 76FF0C76 FF0E76FF 1076FF06 ..v..v..v..v..v..v.......ât.¡..Š 000040
00127E83 0C741646 08144688 D88E08ED 881E0000 04C80012 CAC91F00 E8C02B04 .+âŠ..èò..à....¡Ù..Ä.F..F.t..-.. 000060
0877FF26 FC5EC4FE 5689FC46 89165688 14468838 EB8DF388 05740112 7E830874 t..-..t.¡µ.Š;.F..V..F=.V±á^=&.w. 000080
880574C0 080000FF FF9A0676 FF0876FF 0A76FF0C 76FF0E76 FF1076FF 0677FF26 &.w..v..v..v..v..v..v.......ât.¡ 0000A0
8808740E 46080C46 88D88E0C 50881E00 0004C800 12CAC91F 00E8C02B 04EB8E02 ..Š.+âŠ..èò..à....¡P..Ä.F..F.t.. 0000C0
46C7057F 000A7E83 FE5689FC 46890E56 880C4688 30EB8DF3 88057508 46080646 F..F.u.¡µ.Š=.F..V..F=.V±.-....úF 0000E0
0574C008 0000FFFF 9A0676FF 0876FF0A 76FF0677 FF260877 FF26FC5E C400010A ...á^=&.w.&.w..v..v..v.......ât. 000100
74124608 104688D8 8E0CB388 1E560000 04C8000A CAC91F00 E8C02B04 EB8E0288 ¡..Š.+âŠ..èò..à...V.¡°..Ä.F..F.t 000120
12568810 468845EB 8DF38805 750C4608 0A468808 75010E7E 83067400 0E7E8314 ..-..t..-..u..F..F.u.¡µ.ŠE.F..V. 000140
57892607 89260A5E C40C5088 260A4088 26FC5EC4 02E6C10E 768BFE56 89FC4689 .F=.V±.v.èl.á^=&.ª.&.P.á^.&..&.W 000160
1F00E8C0 28078926 065EC412 408826FC 5EC4E601 0E768812 7408460B 06468B02 ..F..F.t..v.ìlá^=&.ª.á^.&..+âŠ.. 000180
88057508 46080646 8808740C 46080A46 88D88E0D 15881E00 0006C800 0ECAC95E ^èò..à....¡...Ä.F..F.t..F..F.u.¡ 0001A0
880A4688 22E80002 07C72606 5EC40A75 00053DFE 4689078B 260A5EC4 3EEB8DF3 µ.Š>á^.&...F±=..u.á^.&ú...Š".F.. 0001C0
C02B0789 26065EC4 00018803 E8C02B04 75033F83 26FA5EC4 FC5689FA 46890C56 V..F°.V=á^°&.?.u.+âŠ.¡..á^.&..+â 0001E0
```

Dump of file SATURN:[PCCOMMON.DUMP.DLL]BRDPLOW.TMP;1 on 18-APR-1990 10:38:06.00
File ID (528,44,0) End of file block 272 / Allocated 272

Virtual block number 57 (00000039), 512 (0200) bytes

```
0168E98D F3880675 08460806 4688D88E 0D88881E 5600001E C80008CA C91F00EB Š..èò..à...V.¡...Á.F..F.u.¡µ.Õh. 000000
46080A46 88FC5689 FA4689C2 8CC388F4 5689F246 8904578B 2602478B 26065EC4 á^.&.G.&.W..F .V¶.ú.ô.F°.V=.F..F 000020
0C76FF0E 76FF1076 FF00000C F89A5016 E2468001 6A0677FF 260877FF 2649740C .t|&.w.&.w.j..Fã.P.½....v..v..v. 000040
03EB0003 88057503 3F8326FA 76FFFC76 FF3277FF 26065EC4 5016E246 800A76FF .v..Fã.Pá^.&.w2.v=.v°&.?.u.¡..Š. 000060
C1FE7688 227F01FE 7E83FE46 FF03EB00 00FE46C7 14C48302 6A00009A 50000488 ¡..P...j..á.úF±..Š..F±.-±..".v±ê 000080
5EC4D5EB F517E80E FE76FFFA 76FFFC76 FF0D740C 4008260A 40882606 5EC402E6 |.á^.&.ª.&.ª.t..v=.v°.v±.Ò.%Š!á^ 0000A0
830675FF E27E830E D8091E9A 5016E246 80FA76FF FC76FF14 77FF2616 77FF26F2 ·&.w.&.w..v=.v°.Fã.P...Ü..-ã.u.. 0000C0
065EC404 9005D09A 006AE276 FFE476FF 1477FF26 1677FF26 F25EC418 74FFE47E -ô.t.á^·&.w.&.w..vô.vãj..Å...á^. 0000E0
77FF2628 77FF2606 5EC472E8 8E028805 74C00800 00FFFF9A 0677FF26 0877FF26 &.w.&.w.......ât.¡..Šrá^.&.w(&.w 000100
080F3E0A 589A5016 F6468D26 77FF2628 77FF2606 5EC40F1D 09C29A00 6A006A26 &j.j..ô...á^.&.w(&.w&.F-.P.X.>.. 000120
0EB70068 9A2677FF 262877FF 26065EC4 DAEB020E 05A49AF6 76FFF876 FF0075C0 âu..v½.v-.Ê...ŠÖá^.&.w(&.w&.h.ñ. 000140
B80574C0 0B0000\ ) A39A0676 FF0876FF 0677FF26 F25EC41F EB8DF2B8 0574C008 .ât.¡·.Š.á^·&.w..v..v..Ê....ât.¡ 000160
F3B80575 0846080ó 4688D88E 00EEB81E 000004C8 C8C95E1F 00EBC02B 04EB8DF2 ·.Š.+âŠ..^èùà....¡Ÿ..Ä.F..F.u.¡µ 000180
065EC40F 8009C29A 006A006A 2677FF26 2877FF26 065EC445 74000A7E 8362EB8D .Šb.-..tEá^.&.w(&.w&j.j..ô.¯.á^. 0001A0
76FF006A 006A006A 006A1875 C00B0F08 0A589A50 16FC468D 2677FF26 2877FF26 &.w(&.w&.F=.P.X....âu.j.j.j.j..v 0001C0
FE07E80E 0676FF08 76FF006A 006A006A 006ACFE8 0CC4830F 2C09CF9A FC76FFFE ±.v=.ù.,..á.Šüj.j.j.j..v..v..Ò.± 0001E0
```

```
Dump of file SATURN:[PCCOMMON.DUMP.DLL]BRDPLOW.TMP;1 on 18-APR-1990 10:38:06.00
File ID (528,44,0)   End of file block 272 / Allocated 272

Virtual block number 58 (0000003A), 512 (0200) bytes

 7C000E7E 830C7408 46080646 88D88E0F 72881E56 000008C8 CBC91F00 EB0CC483 .6.S..èùà...V.¡r..Ä.F..F.t..~..| 000000
 0006919A 5016FC46 8D0677FF 260877FF 26065EC4 0091E9C0 2B057E01 0E7E8306 ..~..~.+àÕ..6^.&.w.&.w..F•.P.... 000020
 FC46880C EB0C5688 0A468808 75000E7E 8300FE5E 8301FC6E 83087500 107E8300 ..~..u..n=..^±..~..u..F..V.S..F• 000040
 0A408826 065EC402 E6C10E76 881975C2 08FA5689 F846890C 56180A46 28FE5688 .V±+F..V..F%.V°.ðu..v.èl.6^.&.ə. 000060
 010E7E83 1C75FA56 392175F8 4639FE56 88FC4688 2CE833E8 C0280474 0C400826 &.ə.t.+àS3S,.F•.V±9F%uI9V°u..~.. 000080
 C95E1F00 E8000188 05E8C028 04740C40 08260A40 8B26065E C402E6C1 DEF7F618 .-%8èl.6^.&.ə.&.ə.t.+àS.¡..S..^è 0000A0
 C4EE5689 EC46890A 56880846 88000DE9 06468808 8E0FEF88 1E565700 0014C8C8 ùà...WV.¡ÿ..Ä.F.Öï..F..V..F&.VŸ6 0000C0
 00CAE98E 02880674 C0080000 0E339A50 16F04680 016A0677 FF260877 FF26EC5E ^$&.w.&.w.j..Fþ.P.3....àt.¡..Öò. 0000E0
 3847C726 EC5EC41F A5F20008 891F161E F0768016 7F8D1A75 00387F83 26EC5EC4 6^$&..8.u.....vþ...¿..·E.6^$&úG8 000100
 880087E9 08C483FF FF00149A 5016F046 80505200 1605EE56 88EC4688 18E80001 ..S..F&.VŸ...RP.Fþ.P......6.Õ... 000120
 FFFF9A50 16F04680 016A0677 FF260877 FF26EC5E C4EE5689 EC46890A 56880846 F..V..F&.VŸ6^$&.w.&.w.j..Fþ.P... 000140
 08891F16 1EF07680 147F8D1A 7500307F 8326EC5E C45FE88E 02880574 C0080000 ...àt.¡..S_6^$&..0.u.....vþ...¿. 000160
 9A5016F0 46805052 001405EE 5688EC46 8818E800 013047C7 26EC5EC4 1FA5F200 .·E.6^$&úGÕ..S..F$.VŸ...RP.Fþ.P. 000180
 7500023D FF17E903 7F000130 F57CC008 16E81CEB 8E03881D E808C483 11170014 .....6.S.¡..S.S..à|%=....Õ..=..u 0001A0
 5EC40002 F646C7D8 8E10A988 1E00001A C8C8C95F 5E1F00E8 C028E3EB FF78E903 .Õ(.SD+àS..^_èùà....¡`..ÄúF-..6^ 0001C0
 89F24689 4E578826 4C478826 065EC411 E8F45689 F246894A 57882648 47882606 .&.GH&.WJ.F ¯V¶S.6^.&.GL&.WN.F·. 0001E0

Dump of file SATURN:[PCCOMMON.DUMP.DLL]BRDPLOW.TMP;1 on 18-APR-1990 10:38:06.00
File ID (528,44,0)   End of file block 272 / Allocated 272

Virtual block number 59 (0000003B), 512 (0200) bytes

 83124900 F09A5016 EA4680F2 76FFF476 FF008DE9 0375C008 F64EFFF6 468BF456 V¶.F-.N-.àu.Õ§..v¶.v·.Fõ.P.þ.I.. 000000
 F0568301 EE468308 EBEE4689 F04689C0 2BC2E802 7301EA7E 83067C0A 7F00EC7E ~S...|..-ō.s.Sõ+à.Fþ.FŸS..FŸ..Vþ 000020
 6AEE76FF F076FFF2 76FFF476 FF7673EE 4639057C 7D7FF056 39EC5688 EA468800 ..Fõ.VS9Vþ.)|.9FŸsv.v¶.v·.vþ.vŸj 000040
 46890257 88260788 '6F85EC4 42E80647 8826F85E C40F9808 689A5016 F8468000 ..F%.P.k...6^%&.G.S86^%&..&.W..F 000060
 46890257 88260788 <6F85EC4 32E83FE8 C0280475 00347F83 26E65EC4 E85689E6 |.V06^|&..4.u.+àS?S26^%&..&.W..F 000080
 3D857E00 01300C7C C00810E8 12E81FE8 C0280475 002E7F83 26FC5EC4 FE5689FC =.V±6^•&....u.+àS.S.S..à|.=..~ç= 0000A0
 00020060 00040086 0203001C CBC91F00 E8000188 FF25E9FF 70E900E8 D0740002 ..tÀS.Öp.Õ%.¡..S..èù....Ñ...`... 0000C0
 020300EE 00040A88 02030000 00030257 00020168 000408D1 02030000 00011182 ........1...k...W.......¡...Ÿ... 0000E0
 02030000 00080FC7 0002007D 000407C5 02030000 0004044D 0002006E 00040EE9 Õ...n...M.......é...)...ú....... 000100
 0203008A 00040801 0203027F 0005003A 02030101 00040A58 02030180 00040C34 4.......(.......:.......1....... 000120
 02030195 00040C97 02030112 00040817 02030000 000C0E67 00020014 00030069 i.......g....................... 000140
 02030127 0004058A 0203021E 0004113E 02030098 0004097B 02030022 00030F57 W...".....(.......>.......□...'... 000160
 02030000 001911B5 00020080 00040888 02030000 001411F0 000200A8 00041010 ....'...».............§...ç....... 000180
 00000000 00000000 0000000F 000409EA 02030158 00040874 020300CC 000410D2 ●...ä...t...X...õ...Ô........... 0001A0
 FF36E880 F3880575 08460806 46880874 0C46080A 4688088E FFFF881E 000004C8 à....¡...Á.F..F.t..F..F.u.¡µ.S6. 0001C0
 26078826 065EC41C E88E0888 0574C008 FFFF0000 9A0676FF 0876FF0A 76FF0C76 v..v..v..v.......àt.¡..S.6^.&..& 0001E0

Dump of file SATURN:[PCCOMMON.DUMP.DLL]BRDPLOW.TMP;1 on 18-APR-1990 10:38:06.00
File ID (528,44,0)   End of file block 272 / Allocated 272

Virtual block number 60 (0000003C), 512 (0200) bytes

 1E560000 16C80008 CAC91F00 E8C02800 0407C726 FC5EC4FE 5689FC46 89025788 .W..F•.V±6^•&ú...+àS..èò..à...V. 000000
 88064688 0007E980 F3880674 033F8326 065EC409 74084608 06468808 8E000688 ¡...Ä.F..F.t.6^.&.?.t.¡µ.Õ=..F.. 000020
 5016F446 805052FE 5689FC46 89085788 26064788 26EA5EC4 EC5689EA 46890856 V..Fõ.VS6^õ&.G.&.W..F•.V±RP.F¶.P 000040
 20F65688 F4468800 FA568301 F8468308 E80000FA 46C70001 F846C700 00FFFF9A .....úF%..úF°..S..F%..V°..F¶.V-- 000060
 9A006AF8 76FFFA76 FFFC76FF FE76FF15 76F8463B 057F1C7C FA563800 DA830001 ...Ö.;V°|...;F%v..v±.v=.v°.V%j.. 000080
 26EA5EC4 02E6C1F2 7688517F 01F27E83 F246FF03 E80000F2 46C7C8E8 0000FFFF ....SúúF·..S..F·.-·..Q.v·èl.6^õ& 0000A0
 0676FF08 76FF006A 1270FF26 E6D1F276 88016AF0 5689EE46 890C5088 260A4088 .ə.&.P..FŸ.Vþj..v·I|&.p.j..v..v. 0000C0
 17059AEE 76FFF076 FF0676FF 0876FF01 6AF276FF FF6A0EC4 83014003 589A5052 RP.[.ə..6.j..v·j..v..v..vþ.vŸ... 0000E0
 881E5600 000AC800 04CAC95E 1F00E8C0 28000407 C726EA5E C4A6E80E C483FFFF ...6.S|6^õ&ú...+àS..^èò..à...V.¡ 000100
 5EC4F856 89F64689 08568806 46880087 E980F388 06750846 08064688 D88E0061 ●..Ä.F..F.u.¡µ.Õ...F..V..F-.V%6^ 000120
 C1FE7688 517F01FE 7E83FE46 FF03E800 00FE46C7 60E880F3 88057404 3F8326F6 -&.7.t.¡µ.SmúF±..S..F±.-±..Q.v±è 000140
 016A1270 FF26E601 FE768801 6AFC5689 FA46890C 5088260A 408826F6 5EC402E6 |.6^-&.ə.&.P..F°.V=j..v±I|&.p.j. 000160
 FC76FF06 76FF0876 FF006AFE 76FFFF6A 0EC48301 E6035B9A 50520676 FF0876FF .v..v.RP.[.|..6.j..v±j..v..v..v= 000180
 0016C8C8 C95E1F00 E8C02800 0307C726 F65EC4A6 E80EC483 01251705 9AFA76FF .v°...X..6.S|6^-&ú...+àS..^èùà.. 0001A0
 F246FF03 E80000F2 46C700AD E980F388 06750846 08064688 D88E0160 881E5600 .V.¡'..Ä.F..F.u.¡µ.ÕU.úF·..S..F· 0001C0
 EA5EC4EC 5689EA46 890C5088 260A4088 26065EC4 02E6C1F2 76882A7F 01F27E83 .-·..*.v·èl.6^.&.ə.&.P..Fõ.VS6^õ 0001E0
```

```
Dump of file SATURN:[PCCOMMON.DUMP.DLL]BRDPLOW.TMP;1 on 18-APR-1990 10:38:06.00
File ID (528,44,0)   End of file block 272 / Allocated 272

Virtual block number 61 (0000003D), 512 (0200) bytes

5F7F01F2 7E83F246 FF03E800 00F246C7 CDE8F652 89F44289 08578826 06478826 &.G.&.W..B¶.R-ŠeúF..Š..F.-.. 000000
E6C1F288 F9F70002 899940F2 4688F056 89EE4689 F65288F4 428802E6 C1F27688 .v.è!..B¶.R-.FŸ.VÞ.F.ə.¿..X•..èT 000020
0A75FC46 39F05688 EE468828 74FE4608 FC4688FE 5689FC46 89F65288 F4428802 ..B¶.R-.F•.V±.F•.F±(.FŸ.VÞ9F•u. 000040
2B98E8D0 EBFE5689 FC468938 57882636 478826FC 5EC419E8 00018805 75FE5639 9V±u.¡..Š.á^•&.G6&.W8.F•.V±ŠÅŠ.+ 000060
000400E0 02030000 0005002E 00020000 000401C8 00020005 90CBC95E 1F00E8C0 åŠ..^èù.....ù...............Å... 000080
00000000 00000000 00000000 00000000 00190204 000200A8 000400A1 0203009B ....Å........................... 0000A0
E98DF388 06750846 08064688 08741046 080E4688 D88EFFFF 881E5657 000012C8 à...WV.¡...Ä.F..F.t..F..F.u.¡µ.Ô 0000C0
46880000 FFFF9A50 16FC468D 0E76FF10 76FF0789 26024789 26C02806 5EC400FD ».á^.+å&.G.&...v..v..F•.P......F 0000E0
6A50F246 89064788 26F45EC4 00CBE98D F1880675 D008F656 89F44689 FE5688FC •.V±.F¶.V-.Åu.¡þ.Õù.á^¶&.G..F.Pj 000100
8902A68E F888F85E C400A8E9 8DF28806 74C00800 00FFFF9A 5016F846 80366A0E .j6.F%.P......ât.¡..Õ.á^%.«ƒ!.¿ 000120
FFFA76FF F276FF13 74C00800 F200009A 50520024 05C28CC3 88F276FF A5F20018 ...Ê.v..ú.ô.$.RP......ât..v..v•. 000140
F85EC404 57892602 478926F6 5688F446 88F85EC4 73E88E07 88000001 029AF876 v%.....¡..Šsá^%.F¶.V-&.G.&.W.á^% 000160
77FF26F4 5EC4F056 89EE4689 FA5688F8 46880857 89260647 89260C56 880A4688 .F..V.&.G.&.W...F%.V•.FŸ.VÞá^¶&.w 000180
76FFFA76 FFF276FF 1374C008 FFFF029D 9A505200 6A016A00 6A006A14 77FF2616 .&.w.j.j.j.j.RP......ât..v..v•.v 0001A0
1F00E8C0 2802571 ' 26078926 F05688EE 4688065E C414E88E 07880000 FFFF9AF8 %......¡..Š.á^..FŸ.VÞ&..&.W.+åŠ.. 0001C0
468800CF E98DF388 06750A46 08084688 D88E0008 881E0000 10C8000C CAC95F5E ^_èò..à.....¡...Á.F..F.u.¡µ.Õù..F 0001E0

Dump of file SATURN:[PCCOMMON.DUMP.DLL]BRDPLOW.TMP;1 on 18-APR-1990 10:38:06.00
File ID (528,44,0)   End of file block 272 / Allocated 272

Virtual block number 62 (0000003E), 512 (0200) bytes

8326F45E C4F65689 F4468904 57882602 478826FC 5EC4FE56 89FC4689 0A568808 ..V..F•.V±á^•&.G.&.W..F¶.V-á^¶&. 000000
00012E47 C726FC5E C40096E9 06C48305 30E80EFC 76FFFE76 FF0676FF 1375023F ?.u..v..v±.v•.ÒO..á.Ô..á^•&úG... 000020
77FF26FC 5EC401AD 09C29A00 6A006A24 77FF2626 77FF26FC 5EC46674 00067E83 .~..tfá^•&.w&&.w$j.j..ô.Ù.á^•&.w 000040
DAE8FFFF 04049AF8 76FFFA76 FF0D75C0 0800930A 589A5016 F8468024 77FF2626 &&.w$.F%.P.X....àu..v•.v%.....ŠÖ 000060
FF0D74C0 0804C483 FFFF11AF 9A5052F2 5689F046 890C5788 260A4788 26FC5EC4 á^•&.G.&.W..FÞ.V.RP.£....á..ât.. 000080
08C483FF FF044A9A F476FFF6 76FF0876 FF0A76FF FFFF0165 9A006AF0 76FFF276 v..vÞj..e....v..v..v-.v¶.J....á. 0000A0
080C4688 D88E012C 881E0000 10C80006 CAC91F00 E8C02804 E88E0788 0574C008 .ât.¡..Š.+åŠ..èò..à.....¡...Ä.F.. 0000C0
5EC4FE56 89FC4689 0E56880C 468800C8 E98DF388 06750A46 08084688 08740E46 F.t..F..F.u.¡µ.Õù..F..V..F•.V±á^ 0000E0
002E7F83 26F65689 F446890A 56880846 88FA5689 F8468904 57882602 478826FC •&.G.&.W..F%.V•.F..V..F¶.V-&.... 000100
88FC5EC4 0081E98E 00880674 00647F83 26F45EC4 0A750C47 08260A47 88261475 u.&.G.&.G.u.á^¶&..d.t.¡..Õ..á^•. 000120
F476FFF6 76FF0C76 :F0E76FF 026A006A 0676FF0C 5789260A 4789260A 56880846 F..V.&.G.&.W..v.j.j..v..v..v-.v¶ 000140
•FF0E76FF 1477FF26 1677FF26 F85EC44C E88E0088 0574C008 0EC483FF FF17059A ......á..ât.¡..ŠLá^½&.w.&.w..v.. 000160
261677FF 26F85EC4 1874FFF2 7E830675 FFF07E83 02EE091E 9A5016F0 46800C76 v..FÞ.P...Ÿ..-Þ.u..-..t.á^½&.w.& 000180
CAC91F00 E8C02800 013047C7 26FC5EC4 01980500 9A006AF0 76FFF276 FF1477FF .w..v..vÞj..Å...á^•&úG0..+åŠ..èò 0001A0
08568806 46880083 E98DF388 06750846 08064688 D88E0218 881E0000 0CC8000A ..à.....¡...A.F..F.u.¡µ.Õ*..F..V. 0001C0
8CE98E00 88067500 08FA5689 F846890C 5788260A 478826FC 5EC4FE56 89FC4689 .F•.V±á^•&.G.&.W..F%.V•.Åu.¡..Õ. 0001E0

Dump of file SATURN:[PCCOMMON.DUMP.DLL]BRDPLOW.TMP;1 on 18-APR-1990 10:38:06.00
File ID (528,44,0)   End of file block 272 / Allocated 272

Virtual block number 63 (0000003F), 512 (0200) bytes

74C0080E C48302A3 03589AF8 76FFFA76 FF0676FF 0876FF02 6A0E77FF 26016A00 .j.&.w.j..v..v..v•.v%.[.Ê..á..ât 000000
0876FF00 6A016A00 6A006A14 77FF2616 77FF2602 5FC426FC 5EC467E8 8E018805 .¡..Šgá^•&á_.&.w.&.w.j.j.j.j..v. 000020
89F44689 08578826 06478826 F85EC43C E88E0788 0574C008 02CA0290 9A0676FF .v....ò..ât.¡..Š<á^½&.G.&.W..F¶. 000040
5EC40001 3047C726 FC5EC400 016647C7 26F85EC4 00010094 87C726F4 5EC4F656 V-á^¶&ú.....á^½&úGf..á^•&úG0..á^ 000060
080A4688 D88E0308 881E0000 00C80004 CAC91F00 E80A4789 260C4789 26C02BFC •+å&.G.&.G.Š..èò..à.....¡...Ä.F.. 000080
C91F00E8 C02B1257 89261047 89260856 88064688 0A5EC415 E88DF388 05750C46 F.u.¡µ.Š.á^..F..V.&.G.&.W.+åŠ..è 0000A0
8DF38805 75084608 06468808 740C4608 0A4688D8 8E030888 1E000000 C80008CA ò..à.....¡Ä..Ä.F..F.t..F..F.u.¡µ. 0000C0
0008CAC9 1F00E8C0 28025789 26078926 065EC412 57882610 4788260A 5EC419E8 Š.á^.&.G.&.W.á^.&..&.W.+åŠ..èò.. 0000E0
C415E88D F3880575 08460806 46880874 0C46080A 4688D88E 0409881E 000000C8 à.....¡...Ä.F..F.t..F..F.u.¡µ.Š.á 000100
46881E00 0000C800 08CAC91F 00E8C028 08578926 06478926 08568806 46880A5E ^..F..V.&.G.&.W.+åŠ..èò..à.....¡F 000120
26064788 260A5EC4 19E88DF3 88057508 46080646 8808740C 46080A46 88D88E04 ..Ä.F..F.t..F..F.u.¡µ.Š.á^.&.G.& 000140
D88E047F 881E0000 04C80008 CAC91F00 E8C02802 57892607 8926065E C4085788 .W.á^.&..&.W.+åŠ..èò..à.....¡...Ä 000160
5689FC46 890E5688 0C468830 E88DF388 05750846 08064688 08740E46 080C4688 .F..F.t..F..F.u.¡µ.Š=.F..V..F•.V 000180
0676FF08 76FF0A76 FF0677FF 260877FF 26FC5EC4 00010A46 C7057D00 0A7E83FE ±.~..).úF...á^•&.w.&.w..v..v..v. 0001A0
8E048C88 1E000004 C8000ACA C91F00E8 C02804E8 8E048805 74C00800 00FFFF9A ......ât.¡..Š.+åŠ..èò..à.....¡Ÿ.. 0001C0
89FC4689 1056880E 46883AE8 8DF38805 750C4608 0A468808 74104608 0E4688D8 Ä.F..F.t..F..F.u.¡µ.Š:.F..V..F•. 0001E0
```

```
Dump of file SATURN:[PCCOMMON.DUMP.DLL]BRDPLOW.TMP;1 on 18-APR-1990 10:38:06.00
File ID (528,44,0)   End of file block 272 / Allocated 272

Virtual block number 64 (00000040), 512 (0200) bytes

 C4007408 4608064F 88025789 26078926 0A5EC40C 5788260A 478826FC 5EC4FE56 V±á^ø&.G.&.W.á^.&..&.W..F..F.t.á 000000
 8B088E05 1D881E00 001CC800 0CCAC91F 00E8C028 07892606 5EC40E47 8826FC5E ^=&.G.á^.&..+åS..èò..à....|...Ä. 000020
 C388FA56 89F84689 04578826 02478826 065EC401 11E98DF3 88067508 46080646 F..F.u.|µ.Ö..á^.&.G.&.W..F½.V".ú 000040
 9A5016E4 4680016A 0677FF26 0877FF26 3C740C46 080A4688 F65689F4 4689C28C .ô.F¶.V-.F..F.t<&.w.&.w.j..Fô.P. 000060
 FFF676FF 2C77FF26 065EC450 16E4468D 0A76FF0C 76FF0E76 FF1076FF 00000501 .....v..v..v..v..Fô.Pá^.&.w,.v-. 000080
 061309C2 9A006A00 6A2477FF 262677FF 26065EC4 14C48301 F800009A 056AF476 v¶j....«..á.á^.&.w&&.w$j.j..ô... 0000A0
 9AFC76FF FE76FF0D 75C00803 860A589A 5016FC46 8D2477FF 262677FF 26065EC4 á^.&.w&&.w$.F•.P.X....àu..v±.v•. 0000C0
 76FFF676 FF1477FF 261677FF 26F85EC4 FCD2E80E F476FFF6 76FFDAE8 018C05A4 Ê.¥.SÖ.v-.v¶.Ö0•á^¥&.w.&.w..v-.v 0000E0
 FF261677 FF26F85E C41874FF E67E8306 75FFE47E 83066D09 1E9A5016 E44680F4 ¶.Fô.P...m..-ô.u..-Ì.t.á^¥&.w.&. 000100
 C4064900 689A2477 FF262677 FF26065E C405FE05 D09A006A E476FFE6 76FF1477 w..vÌ.vôj..Ä.±.á^.&.w&&.w$.h.Ì.á 000120
 C91F00EB C02804EB 8DF28805 74C00800 0000A39A 0676FF08 76FF0677 FF26F85E ^¥&.w..v..v..Ê....ât.¡·.Š.+åS..è 000140
 5EC44574 000A7E83 62E88DF3 88057508 46080646 88D88E05 7BB81E00 0004C8CB ùà....¡(..Ä.F..F.u.|µ.Šb.~..tEá^ 000160
 FC468D24 77FF2626 77FF2606 5EC406E5 09C29A00 6A006A24 77FF2626 77FF2606 .&.w&&.w$j.j..ô.Ì.á^.&.w&&.w$.F• 000180
 C4830622 09CF9AFC 76FFFE76 FF006A00 6A006A00 6A1875C0 08067D0A 589A5016 .P.X.)..àu.j.j.j.j..v±.v•.ü."..á 0001A0
 000890C8 C91F00EB 0CC483FE 60E80E06 76FF0876 FF006A00 6A006A00 6ACFEB0C .Šùj.j.j.j..v..v..Ö'±.á.Š..èù... 0001C0
 00000008 06FC0002 00000005 01D60002 00000004 03580002 00000003 01EA0002 ..ö.......X.......•.......•..... 0001E0

Dump of file SATURN:[PCCOMMON.DUMP.DLL]BRDPLOW.TMP;1 on 18-APR-1990 10:38:06.00
File ID (528,44,0)   End of file block 272 / Allocated 272

Virtual block number 65 (00000041), 512 (0200) bytes

 00220003 06800203 0000000C 05E70002 00140003 00690203 027F0005 003A0203 ..:.......Ì.......Ö...........". 000000
 00000000 00000000 00000019 06A70002 00000014 06000002 021E0004 05C00203 ..à.......Å.......Ì............. 000020
 08064688 08740C46 080A4688 10741046 080E4688 D88EFFFF 881E5657 000032C8 à2..WV.¡...Ä.F..F.t..F..F.t..F.. 000040
 FA5688F8 46880000 FFFF9A50 16F8468D 0E76FF10 76FF03D3 E98DF388 06750846 F.u.|µ.Ö&..v..v..F½.P......F½.V" 000060
 803C6A0E 6A500A46 89064788 260C5EC4 03ADE98D F1880675 D008DE56 890C4689 .FÉ.VB.Àu.|þ.ÖÜ.á^É&.G..FÖPj.j<. 000080
 A5F2001E 89020C8E F888FC5E C4038AE9 80F28806 74C00800 00FFFF9A 5016FC46 F=.P......ât.¡·.Ö..á^•.=/É.¿..·É 0000A0
 89005605 DE5688DC 46881FA5 F2000889 DA8E1E07 16F088E8 7E800C56 880A4688 .F..V..-Ö.Þ....Ö¿..·É..FÉ.VB.V.. 0000C0
 260277FF 26065EC4 37FF2602 77FF26E4 5EC40856 8C064689 E84680E6 5689E446 FÖ.VÌ.FÖ.F•.VÄá^Ö&.w.&.7á^ø&.w.& 0000E0
 02578826 07882606 5EC40C74 C008C028 02E80001 88057500 0800F201 309A37FF .7.0.·..Àu.¡..Š.+á.ât.á^ø&..&.W. 000100
 0806C79A 00FF02C3 9AE45EC4 00FA02C3 9AD65EC4 37FF2602 77FF26E4 5E...4DEB ŠMá^Ö&.w.&.7á^ø.Û.".á^ô.Û....ú.. 000120
 569AD888 08C48301 2107BE9A 011703EF 9ADC8808 EC830112 06999A28 161E..01 ....(......&..É.ÿ..../.Ì..á..Ä.V 000140
 0677FF26 E45EC402 57892607 8926065E C4015200 FC9A5052 012004A6 9A012.02 .&..Ì.-.RP.•.R.á^ø&..&.W.á^Ö&.w. 000160
 08C02802 E8000188 0575D008 01790130 9A0477FF 260677FF 26065EC4 0477FF26 &.w.á^ø&.w.&.w..O.y..Àu.¡..Š.+á. 000180
 5F8DE45E C4018402 C39A045F 8DD65EC4 54E80657 88260447 8826065E C40074C0 ât.á^ø&.G.&.W.ŠTá^ø._..Û...á^ô._ 0001A0
 8E9A01A1 03EF9ADC 8808EC83 019C0699 9A28161E 8D019206 C79A0189 02C39A04 ..û....ú......(......&..É.ÿ.À..7 0001C0
 9A0477FF 260677FF 26E45EC4 505201C2 04A69A01 8002569A D88808C4 8301A807 .¨..á..Ä.V.¯..Ì.ö.RPá^Ö&.w.&.w.. 0001E0

Dump of file SATURN:[PCCOMMON.DUMP.DLL]BRDPLOW.TMP;1 on 18-APR-1990 10:38:06.00
File ID (528,44,0)   End of file block 272 / Allocated 272

Virtual block number 66 (00000042), 512 (0200) bytes

 260277FF 26E45EC4 D8568CD6 4689F046 8D065789 26044789 26065EC4 01EF00FC •.ÿ.á^ø&.G.&.W..FÞ.F•.VÄá^Ö&.w.& 000000
 0C74C008 C02802E8 0001B805 75000802 1C01309A 37FF2602 77FF2606 5EC437FF .7á^ø&.w.&.7.0....Àu.¡..Š.+á.ât. 000020
 5EC40224 02C39AD6 5EC437FF 260277FF 26E45EC4 4DE80257 88260788 26065EC4 á^ø&..&.W.ŠMá^Ö&.w.&.7á^ø.Û.$.á^ 000040
 8E9A0241 03EF9ADC 8808EC83 023C0699 9A28161E 80023206 C79A0229 02C39AE4 ô.Û.)..ú.2....(...<..&..É.ÿ.A../ 000060
 26078926 D65EC402 7C00FC9A 50520257 04A69A02 5002569A D88808C4 83024807 .K..á..Ä.V.P..Ì.W.RP.•.|.á^ø&..& 000080
 D00802A3 01309A04 77FF2606 77FF2606 5EC40477 FF260677 FF26E45E C4025789 .W.á^Ö&.w.&.w.á^ø&.w.&.w..O.È..Å 0000A0
 045F8DD6 5EC454E8 06578826 04478826 065EC400 74C008C0 2802E800 01880575 u.¡..Š.+á.ât.á^ø&.G.&.W.ŠTá^ø._. 0000C0
 EC8302C6 06999A28 161E8002 8C06C79A 028302C3 9A045F8D E45EC402 AE02C39A .û.Û.á^ô._..û.^..û.¥....(...ó..& 0000E0
 5EC45052 02EC04A6 9A020A02 569AD888 08C48302 D507BE9A 02C803EF 9ADC8808 ..É.ÿ.û..7.Ì..á..Ä.V.Ö..Ì.&.RPá^ 000100
 39F25688 F0468806 57892604 47892606 5EC4FFFF 00FC9A04 77FF2606 77FF26E4 Ö&.w.&.w..•....á^ø&.G.&.W..FÞ.V·9 000120
 E84689F2 5688F046 88045689 024689EA 5688E846 882476E8 4639057F 287CEA56 Vò|+..9FÖv$.FÖ.Vö.F•.Vå.FÞ.V·.FÖ 000140
 76EC4639 057F287C EE5639F6 5688F446 88F25689 F0468904 56880246 88EA5689 .Vö.F•.Vå.FÞ.V·.F¶.V-9VŸ|+..9F±v 000160
 89005688 CE4688EE 5689EC46 89F65688 F4468800 5689CE46 89EE5688 EC468824 $.F±.VŸ.Fö.VÅ.F¶.V-.F±.VŸ.Fö.VÅ. 000180
 1EE8768D 1C7F80FC 5EC40457 89260247 89260E56 880C4688 FC5EC4F6 5689F446 F¶.V-á^•.FÉ.VB&.G.&.W.á^•....vÖ. 0001A0
 FE5688FC 46881FA5 F2000889 1F161EE8 76800C7F 8DFC5EC4 1FA5F200 08891F16 ..¿..·É.á^•....vÖ...¿..·É..F•.V± 0001C0
 FFFF0290 9A505200 6A016A00 6A006A14 77FF2616 77FF260C 5EC4E256 89E04689 .FÅ.Vàá^É&.w.&.w.j.j.j.j.RP..... 0001E0
```

```
Dump of file SATURN:[PCCOMMON.DUMP.DLL]BRDPLOW.TMP;1 on 18-APR-1990 10:38:06.00
File ID (528,44,0)   End of file block 272 / Allocated 272

Virtual block number 67 (00000043), 512 (0200) bytes

 00013047 C726FC5E C426E88E 07B80000 FFFF9AFC 76FFFE76 FFDA76FF 1374C00B .åt..vÖ.v±.v=.....¦..S&á^=&úG0.. 000000
 5F5E1F00 E8C02B02 57892607 8926E256 8BE0468B 065EC400 013447C7 26FC5EC4 á^=&úG4..á^..FÁ.Vã&..&.W.+âS..^  000020
 568B0646 8B67E38D F3B80575 08460806 468BD88E 0008881E 000008C8 000CCAC9 èò..à....¦...Á.F..F.u.¦µ.Sg.F..V 000040
 75023F83 26F85EC4 FA5689F8 46890457 88260247 8826FC5E C4FE5689 FC468908 ..F=.V±á^=&.G.&.W..F½.V°á^½&.?.u 000060
 76FF0676 FF0876FF 2AEB0CC4 83057CE8 0EFC76FF FE76FF00 6A006A00 6A006A17 .j.j.j.j..v±.v=.Ò|..á.S*.v..v..v 000080
 C02B0001 3247C726 FC5EC400 E88E07B8 0574C00B 08C483FF FF044A9A F876FFFA °.v½.J....á..åt.¦..S.á^=&úG2..+â 0000A0
 83147C00 0A7E831A 740E460B 0C468BD8 8E040A88 1E000012 C80004CA C91F00EB S..èò..à....¦...Á.F..F.t..~..|.. 0000C0
 890E568B 0C468800 E6E98DF3 88067506 0A7E8306 7408460B 0646880E 7F070A7E ~.....F..F.t..~..u.¦µ.Ò!..F..V.. 0000E0
 16F2468D 00C3E98E 00880674 000A7F83 26077500 327F8326 FC5EC4FE 5689FC46 F=.V±á^=&..2.u.&....t.¦..Òü..F.. 000100
 830675C0 0B12C483 05A2E80E 0A76FF06 76FF0876 FF5016F8 46805016 F4468D50 P.F¶.P.F½.P.v..v..v..ÒÅ..á..âu.. 000120
 9A0C76FF 0E76FF00 6A016A00 6A006AF8 76FFFA76 FF0094E9 8E008806 7400F27E ~..t.¦..Õ...v°.v½j.j.j.j..v..v.. 000140
 260A468B FC5EC400 02578326 01078326 F45EC472 E88E07B8 0574C00B 03BE029D ../..åt.¦..Srá^¶&...&.W..á^=.F.& 000160
 261677FF 26025FC4 26FC5EC4 08578926 06478926 08568806 468BFC5E C40A4789 .G.á^=.F..V.&.G.&.W.á^=&á_.&.w.& 000180
 C41C74FF F07E8306 75FFEE7E 83059909 1E9A5016 EE46800C 76FF0E76 FF1477FF .w..v..v..FY.P......~Y.u.~Þ.t.á 0001A0
 1F00E8C0 28052205 D09A006A EE76FFF0 76FF1477 FF261677 FF26025F C426FC5E ^=&á_.&.w.&.w..vÞ.vYj..Å.".+âS.. 0001C0
 8B06468B 00CEE98D F3B80675 08460806 468BD88E 048D881E 000010C8 000ACAC9 èò..Å....¦...Á.F..F.u.¦µ.Òo..F.. 0001E0

Dump of file SATURN:[PCCOMMON.DUMP.DLL]BRDPLOW.TMP;1 on 18-APR-1990 10:38:06.00
File ID (528,44,0)   End of file block 272 / Allocated 272

Virtual block number 68 (00000044), 512 (0200) bytes

 5016F046 80006A00 6A0083E9 C02B0575 000A7F83 26FC5EC4 FE5689FC 46890856 V..F=.V±á^=&....u.+âÕ°.j.j..FÞ.P 000000
 76FFF876 FFFA76FF 12C48304 A5E80E0A 77FF2606 77FF2608 77FF2650 16F8468D .F½.P&.w.&.w.&.w..ÒE..á..v°.v½.v 000020
 FF6BE88E 01B80575 FFF67E83 0B75FFF4 7E830630 091E9A50 16F4468D 0676FF08 ..v..F¶.P...O..-¶.u..--.u.¦..Sk. 000040
 8326F05E C44FE88E 07B80574 C00B0667 05D09A00 6AF476FF F676FFF8 76FFFA76 v°.v½.v-.v¶j..Å.g..åt.¦..SOá^Þ&. 000060
 76FF006A 016A006A 006A1477 FF261677 FF26025F C426FC5E C400025F 8326012F /.&._..á^=&á_.&.w.&.w.j.j.j.j..v 000080
 C02BFC5E C400000A 47C726FC 5EC418EB 8E07B805 74C00B05 7102909A 0676FF08 ..v....q..åt.¦..S.á^=&úG...á^=+â 0000A0
 750C460B 0A468BD8 8E05AA88 1E000000 C80004CA C91F00EB 06478926 08478926 &.G.&.G.S..èò..à....¦...Å.F..F.u 0000C0
 0008CAC9 1F00E8C0 2B2E5789 262C4789 26085688 0646880A 5EC415EB 8DF38805 .¦µ.S.á^..F..V.&.G,&.W.+âS..èò.. 0000E0
 C419E88D F3B80575 08460806 46880874 0C46080A 4688D88E 0695881E 000000C8 à....¦...Á.F..F.t..F..F.u.¦µ.S.á 000100
 001CC800 08CAC91F 00E8C02B 02578926 07892606 5EC42E57 88262C47 88260A5E ^.&.G,&.W.á^.&..&.W.+âS..èò..à.. 000120
 880121E9 80F38806 75084608 06468808 740C460B 0A468808 8E06C688 1E565700 .WV.¦ó..Å.F..F.t..F..F.u.¦µ.Ò!.. 000140
 A5F20008 B9DA8E1E 0716F088 EC7E8008 56880646 88FE5689 FC46890C 56880A46 F..V..F=.V±.F..V..~&.Þ....Ò¿...E 000160
 88EA5689 E84689EE 5688EC46 882476EC 4639057F 2B7CEE56 39F65688 F446881F ..F¶.V-9VY|+..9F&v$.F&.VY.FÒ.Võ. 000180
 F25639FA 5688F846 88F65689 F44689EA 5688E846 88EE5689 EC4689F6 5688F446 F¶.V-.F&.VY.FÒ.Võ.F¶.V-.F½.V°9V. 0001A0
 5689F046 89FA5688 F84688E6 5689E446 89F25688 F0468824 76F04639 057F2B7C |+..9FÞv$.FÞ.V..FÒ.V|.F½.V°.FÞ.V 0001C0
 7F8D000C 05C28CC3 881E7500 367F8326 FC5EC4FA 5689F846 89E65688 E44688F2 ..FÒ.V|.F½.V°á^=&..6.u..û.ó..... 0001E0

Dump of file SATURN:[PCCOMMON.DUMP.DLL]BRDPLOW.TMP;1 on 18-APR-1990 10:38:06.00
File ID (528,44,0)   End of file block 272 / Allocated 272

Virtual block number 69 (00000045), 512 (0200) bytes

 3926EE56 8BEC468B FC5EC400 013647C7 26FC5EC4 1FA5F200 0889DA8E 1EF0881C ..Þ..Ò¿...E.á^=&úG6..á^=.F&.VY&9 000000
 8BF0468B 28751657 39262E75 14473926 F65688F4 46883A75 0E573926 40750C47 G.u@&9W.u:.F¶.V-&9G.u.&9W.u(.FÞ. 000020
 04751A57 39260A75 18473926 FA5688F8 46881675 12573926 1C751047 3926F256 V.&9G.u.&9W.u..F½.V°&9G.u.&9W.u. 000040
 00E8C02B 00013447 C726FC5E C41FA5F2 0008891F 161EEC76 8D0C7F8D 1CE8C02B +âS.....v&...¿...E.á^=&úG4..+âS. 000060
 46080646 8808740C 46080A46 88D88E07 05881E56 57000000 C80008CA C95F5E1F .^_èò..à...WV.¦...Å.F..F.t..F..F 000080
 A5F20008 B9DA8E1E F08BF888 000C050C 56880A46 88065EC4 1DE880F3 88057508 .u.¦µ.S.á^..F..V.....=.Þ..Ò¿...E 0000A0
 08740C46 080A468B D88E084F 881E5657 000008C8 0008CAC9 5F5E1F00 E8C02B1F .+âS..^_èò..à...WV.¦O..Å.F..F.t. 0000C0
 08260447 88260F75 02470826 07882606 5EC4008C E98DF388 06750846 0806468B .F..F.u.¦µ.Ò¥.á^.&..&.G.u.&.G.&. 0000E0
 051A7500 367F8326 FC5EC4FE 5689FC46 890C5688 0A468800 A1E9C02B 05750647 G.u.+âÒÅ..F..V..F=.V±á^=&..6.u.. 000100
 05FE568B FC468800 013647C7 26FC5EC4 1FA5F200 0889DA8E 1EF0881C 7F8D000C ......Þ..Ò¿...E.á^=&úG6...F=.V±. 000120
 26065EC4 02571126 070126F8 5EC40257 88260788 26065EC4 FA5689F8 4689000C ...F½.V°á^.&..&.W.á^½&..&.W.á^.& 000140
 26F85EC4 02578826 07882606 5EC40657 11260447 0126F85E C4065788 26044788 .G.&.W.á^½&.G.&.W.á^.&..&.W.á^½& 000160
 FC5EC40E 5711260C 470126F8 5EC40657 88260447 8826065E C40A5711 26084701 .G.&.W.á^.&.G.&.W.á^½&.G.&.W.á^= 000180
 46080E46 88D88E08 94881E00 0004C800 08CAC95F 5E1F00EB C02B0001 3447C726 &úG4..+âS..^_èò..à....¦...Å.F..F 0001A0
 46891056 880E468B 32E880F3 88057508 46080646 8808740C 46080A46 88107410 .t..F..F.t..F..F.u.¦µ.S2.F..V..F 0001C0
 26065EC4 08578826 06478826 FC5EC407 89260A5E C40A4788 26FC5EC4 FE5689FC =.V±á^=&.G.á^.&..á^=&.G.&.W.á^.& 0001E0
```

```
Dump of file SATURN:[PCCOMMON.DUMP.DLL]BRDPLOW.TMP;1 on 18-APR-1990 10:38:06.00
File ID (528,44,0)   End of file block 272 / Allocated 272

Virtual block number 70 (00000046), 512 (0200) bytes

 7508460B 064688F8 8E0977B8 1E00000C C8000CCA C91F00EB C0280257 89260789 ..&.W.+åS..èò..à....¡w..Ä.F..F.u 000000
 89FC4689 C28CC388 FA5689F8 46890457 88260247 8826065E C40080E9 80F38806 .¡µ.Õ¯.á^.&.G.&.W..F%.Vª.ú.ô.F=. 000020
 77FF2650 52000C05 C3880A76 FF0C76FF 0E76FF10 76FF2574 0C46080A 4688FE56 V±.F..F.tX.v..v..v..v..ú...RP&.w 000040
 1677FF26 F85EC4FB 68E80EFC 76FFFE76 FF14C483 04670000 9A066AFC 76FF5230 OR.v=j....g..á..v±.v=.Ók«á^Y&.w. 000060
 1874FFF6 7E830675 FFF47E83 0A76091E 9A5016F4 4680FC76 FFFE76FF 1477FF26 &.w..v±.v=.F¶.P...v..~¶.u..—.t. 000080
 FF0677FF 26F85EC4 060C0500 9A006AF4 76FFF676 FF1477FF 261677FF 26F85EC4 á^Y&.w.&.w..v~.v¶j..Å...á^Y&.w.. 0000A0
 881E0000 04C8C8C9 1F00E8C0 2804E88D F2880574 C0080000 03CE9A06 76FF0876 v..v..ö....ât.¡`.S.+åS..èúà....¡ 0000C0
 5EC40E74 16460814 4688FE56 89FC4689 0A568808 46880131 E9064688 D88E0905 (..Ä.F.Ö1..F..V..F=.V±.F..F.t.á^ 0000E0
 57892607 89260C5E C46857B8 26664788 26FC5EC4 07892614 5EC4008C 87882 6FC =&....á^.&..á^=&.Gf&.Whá^.&..&.W 000100
 FC46890A 56880846 8800FEE9 02578926 07892600 6A05FE56 88FC4688 105EC402 .á^..F=.V±.j.&..&.W.Ö±..F..V..F= 000120
 26504788 26FC5EC4 07892614 5EC46447 8826FC5E C4007416 46081446 88FE5689 .V±.F..F.t.á^=&.Gdá^.&..á^=&.GP& 000140
 02578926 07892600 5405FE56 88FC4688 105EC402 57892607 89260C5E C4525788 .WRá^.&..&.W.á^..F=.V±.T.&..&.W. 000160
 5EC43447 8826FC5E C4007416 46081446 88FE5689 FC46890A 56880846 880082E9 Öÿ..F..V..F=.V±.F..F.t.á^=&.G4á^ 000180
 88FC4688 105EC402 57892607 89260C5E C4285788 26264788 26FC5EC4 07892614 .&..á^=&.G&&.W(á^.&..&.W.á^..F=. 0001A0
 16460814 4688FE56 89FC4689 0A568808 468867E8 02578926 07892600 2A05FE56 V±.*.&..&.W.Sg.F..V..F=.V±.F..F. 0001C0
 0789260C 5EC42657 88262447 8826FC5E C4078926 145EC42E 478826FC 5EC40074 t.á^=&.G.á^.&..á^=&.G$&.W&á^.&.. 0001E0

Dump of file SATURN:[PCCOMMON.DUMP.DLL]BRDPLOW.TMP;1 on 18-APR-1990 10:38:06.00
File ID (528,44,0)   End of file block 272 / Allocated 272

Virtual block number 71 (00000047), 512 (0200) bytes

 04300001 2D1AEB1C E8025789 26078926 002805FE 5688FC46 88105EC4 02578926 &.W.á^..F=.V±.(.&..&.W.S.S.-..=. 000000
 02030007 C8C91F00 EBC02808 8E084308 430AF70A AA0BEBA7 FF2E93C0 03127700 .w..à...ÎS.`.¥.C.C...+åS..èù.... 000020
 00020022 00030A86 02030000 000C0A2A 00020014 00030065 0203027F 00050036 6.......e.......*.............". 000040
 00000000 00000000 00000000 00190AA0 00020000 001700C5 00020000 00140A52 R.......é......................... 000060
 080E4688 10740C46 080A4688 18740846 08064688 D88EFFFF 881E5657 000056C8 àV..WV.¡...Ä.F..F.t..F..F.t..F.. 000080
 E98DF388 000007C7 26125EC4 08741446 08124688 16751446 08124688 08741046 F.t..F..F.u..F..F.t.á^.&ú...¡µ.Ö 0000A0
 367301BC 7E83067C 3E7F008E 7E83000B 00F09A50 168C4680 0676FF08 76FF027F ...v..v..F¥.P.Þ.Ü..-ƒ..>|..-¥.s6 0000C0
 89260A47 89260E5E C4044789 26064789 260E5EC4 07892602 478926C0 280E5EC4 á^.+â&.G.&..á^.&.G.&.G.á^.&.G.&. 0000E0
 AC4689C0 280000AE 46C7022B E9078926 125EC40C 4789260E 4789260E 5EC40847 G.á^.&.G.&.G.á^.&..Ö+.úFÜ..+á.F^ 000100
 AA463908 7C0085E9 037EAC56 398E5688 8C468800 AC568301 AA468308 EBAA4689 .F^S..F^..V¯..F¥.V/9V¯~.Öç.|.9F¯ 000120
 CC4688FF FF08689A 5016CC46 80006AAA 76FFAC76 FF0676FF 0876FF00 ABE90372 r.Ö¨..v..v..v¯.v¨j..Fä.P.k....Fä 000140
 831603E8 0E8076FF 52501600 4680CA56 89C84689 0016058 2 56898046 89CE5688 .Vö.F¯.Vý....Fà.Vò.FÅ.PR.v¯.Ö... 000160
 80CA5688 C846881F A5F20008 891F161E 07160076 80F07E8D 407500AE 7E8308C4 á..-Ü.uä.~Þ.vÅ.....¿...É..Fà.Vò. 000180
 005E0504 57882602 47882680 5EC40001 AE46C71F A5F20008 890A8E1E F088E07E ~Å.Þ..Ö¿...É.úFÜ..á^¯&.G.&.W..^. 0001A0
 5016F046 8008C483 01680014 9AC876FF CA76FF50 16E0468D 25E88656 89844689 .FÇ.VÑS%.FÅ.P.vò.và...h..á..FÞ.P 0001C0
 46890201 E0010257 88260788 26845EC4 FF35E908 C483FFFF 00149A50 1600468D .FÅ.P......á.ÖS.á^Ç&..&.W.ÌÅì@.F 0001E0

Dump of file SATURN:[PCCOMMON.DUMP.DLL]BRDPLOW.TMP;1 on 18-APR-1990 10:38:06.00
File ID (528,44,0)   End of file block 272 / Allocated 272

Virtual block number 72 (00000048), 512 (0200) bytes

 18F0462B E25688E0 4688C256 89C04689 D2D1E001 06578826 04478826 C65689C4 á.Vó&.G.&.W.ÌÅì@.Fâ.Vô.FÅ.Vã+FÞ. 000000
 381277B8 26104F88 260A5EC4 E25688E0 4688BA56 89884689 C65613C4 4603F256 V`.Fá.Vó.F¡.Va.FÅ.Vãá^.&.O.&.w.; 000020
 88025789 26078926 0E5EC4D6 18C12888 4E888A76 88067388 4E38057C 0D7F8A76 va..|.;N¡s..va.N¡+è.øá^.&..&.W.. 000040
 0A5EC4E6 5688E446 888A5689 884689C2 5613C046 03F6561B F44628E6 5688E446 Fö.V|+F¶.V-.Fá.Vö.F¡.Va.Fö.V¦á^. 000060
 5EC4D61B C12B884E 888A7688 0673884E 38057C0D 7F8A763B 16778826 144F8826 &.O.&.w.;va..|.;N¡s..va.N¡+è.øá^ 000080
 56898846 89C65613 C44603EA 5618E846 28FA5688 F8468806 57892604 4789260E .&.G.&.W..F%.Vª+FÖ.Võ.Fá.Vó.F¡.V 0000A0
 4603B846 888A568B 06738846 38057C0D 7F8A563B 1A578826 18478826 0A5EC48A øá^.&.G.&.W.;Va..|.;F¡s..Va.F¡.F 0000C0
 5613C046 03EE561B EC462BFE 5688FC46 880A5789 26084789 260E5EC4 EA5613E8 Ö.Vðá^.&.G.&.W..F=.V±+F&.VŸ.Fá.V 0000E0
 56880673 88463805 7C0D7FBA 56381E57 88261C47 88260A5E C48A5689 884689C2 ô.F¡.Vøá^.&.G.&.W.;Va..|.;F¡s..V 000100
 EBC02800 0107C726 125EC40E 5789260C 4789260E 5EC4EE56 13EC4603 8846888A ¤.F¡.F&.VŸá^.&.G.&.W.á^.&ú...+åS 000120
 035800F0 9A5016F8 46800676 FF0876FF D88E0008 881E0000 10C8C8C9 5F5E1F00 ..^_èúà....¡...Ä.v..v..F%.P.Þ.[. 000140
 47892612 5EC40789 26024789 26C02812 5EC43373 01F87E83 067C387F 00FA7E83 .-ª..;|..~%.s3á^.+â&.G.&..á^.&.G 000160
 89260E5E C40C4789 260E4789 26125EC4 08478926 0A478926 125EC404 47892606 .&.G.á^.&.G.&.G.á^.&.G.&.G.á^.&. 000180
 057C5E7F F25639FA 5688F846 8800F256 8301F046 8308E8F0 4689F246 89C02807 .+ä.F`.FÞS..FÞ..V`..F%.Vª9V`.^|. 0001A0
 FC468803 06086B9A 5016FC46 80006AF0 76FFF276 FF0676FF 0876FF57 73F04639 9FÞsW.v..v..v`.vÞj..F=.P.k.ø..F= 0001C0
 00948F83 26F45EC4 08C48300 DFE80E50 520A76FF 0C76FFF6 5689F446 89FE5688 .V±.F¶.V-.v..v.RP.ÒÖ..á.á^¶&.¢.. 0001E0
```

```
Dump of file SATURN:[PCCOMMON.DUMP.DLL]BRDPLOW.TMP;1 on 18-APR-1990 10:38:06.00
File ID (528,44,0)   End of file block 272 / Allocated 272

Virtual block number 73 (00000049), 512 (0200) bytes

 4689C028 8FEB0096 878926F4 5EC4C028 02EB0001 B8057400 0092BF83 26087500 .u.&.¢...t.¡..$.+àá^¶&....$.+â.F 000000
 7273F046 39057C79 7FF25639 FA568BF8 468B00F2 568301F0 468308EB F04689F2 ·.FÞ$..FÞ..V·..F%.V³9V·.y|.9FÞsr 000020
 4689FE56 88FC4388 0050086B 9A5016FC 468D006A F076FFF2 76FF0676 FF0876FF .v..v..v·.vÞj..F•.P.k.P..F•.V±.F 000040
 9AEB0E50 520676FF 0876FF0A 76FF0C76 FF407400 0096BF83 26F45EC4 F65689F4 ¶.V-á^¶&.¢...tâ.v..v..v..v.RP.Ò. 000060
 1C739A06 76FF0876 FFF476FF F676FF02 6A0A76FF 0C76FF16 76FF016A 0CC4830A ..á.j..v..v..v.j..v~.v¶.v..v..s. 000080
 76FF1276 FF1476FF 0E76FF10 76FFFF74 E9000000 9687C726 F45EC412 C483FFFF ...á.á^¶&ú.....Òt..v..v..v..v..v 0000A0
 4688088E 02CCB81E 00001EC8 CBC91F10 C483FBB2 E80E0676 FF0876FF 0A76FF0C ..v..v..v..Òý«.á..èùà....¡ä..Ä.F 0000C0
 EA5689E8 46894057 88263E47 8826E45E C40000E2 46C7E656 89E44689 08568806 ..V..Fõ.V|úfã..á^ò&.G>&.Wâ.FÒ.Võ 0000E0
 16EC468D 016A1F74 00FC7E83 067F277C 00FE7E83 020E00F0 9A5016FC 46805052 RP.F•.P.Þ.8..−±.|'...−•.t.j..F$. 000100
 76FF5016 EC468012 C483FE10 E80EE876 FFEA76FF 0A76FF0C 76FF5016 E2468050 P.Fâ.P.v..v..võ.vÒ.Ò.±.á..Fé.P.v 000120
 8304E80C 819AE476 FFE676FF 0EC48300 7FE80EE4 76FFE676 FF0A76FF 0C76FFE2 ã.v..v..v|.võ.Ò...á..v|.võ...$.. 000140
 0EE476FF 52505200 6E05E656 88E44688 04C483FF FF00009A E476FFE6 76FF04C4 á..v|.võ......á..Fõ.V|.n.RPR.võ. 000160
 5EC47247 89267447 8926E45E C46E4789 26704789 26C028E4 5EC408C4 8306C8E8 Òù..á.á^ò+à&.Gp&.Gná^ò&.Gt&.Grá^ 000180
 7E478926 00808789 26E45EC4 7A478926 7C478926 E45EC476 47892678 478926E4 ò&.Gx&.Gvá^ò&.G|&.Gzá^ò&....&.G− 0001A0
 08568806 4688D88E 045AB81E 00001CC8 CBC91F00 82878926 00848789 26E45EC4 á^ò&....&.....èùà....¡Z..Ä.F..V. 0001C0
 78578826 76478826 065EC4F6 5689F446 89001605 064688F2 5689F046 89000605 ....FÞ.V·.F.....F¶.V-á^.&.Gv&.Wx 0001E0

Dump of file SATURN:[PCCOMMON.DUMP.DLL]BRDPLOW.TMP;1 on 18-APR-1990 10:38:06.00
File ID (528,44,0)   End of file block 272 / Allocated 272

Virtual block number 74 (0000004A), 512 (0200) bytes

 06571126 04470126 F45EC47C 5788267A 47882606 5EC40257 11260701 26F45EC4 á^¶&..&.W.á^.&.Gz&.W|á^¶&.G.&.W. 000000
 26008287 8826065E C40A5711 26084701 26F45EC4 00809788 267E4788 26065EC4 á^.&.G-&....á^¶&.G.&.W.á^.&....& 000020
 76FF1276 FFF476FF F676FF14 74000E7E 830E5711 260C4701 26F45EC4 00849788 ....á^¶&.G.&.W..~..t..v−.v¶.v..v 000040
 57882604 478826FE 5689FC46 89025788 26078826 0A5EC408 C4830156 00149A10 ....V..á.á^.&..&.W..F•.V±&.G.&.W 000060
 057C1C7F FE563802 57182607 28260A57 88260847 8826F45E C4EE5689 EC468906 ..F&.VŸá^¶&.G.&.W.&+.&.W.;V±..|. 000080
 478826F4 5EC40A57 89260847 8926FE56 13FC4603 02578826 07882615 73FC4638 ;F•s.&..&.W..F•.V±&.G.&.W.á^¶&.G 0000A0
 57882604 47882616 73EC4638 057C1D7F EE563806 57182604 4728260E 5788260C .&.W.&+G.&.W.;VŸ..|.;Fés.&.G.&.W 0000C0
 F8468900 56050457 88260247 8826065E C40E5789 260C4789 26EE5613 EC460306 ..Fé.VŸ&.G.&.W.á^.&.G.&.W..V..F% 0000E0
 260277FF 26F85E.. EA5689E8 4689F656 88F44688 023CE903 75000E7E 83FA5689 .V³.−..u.Õ<..F¶.V−.FÒ.Võá^½&.w.& 000100
 0C74C008 C02802.. 00018805 75D00806 DC01309A 37FF2602 77FF26E8 5EC437FF .7á^ò&.w.&.7.0.É..Åu.¡..$.+â.ât. 000120
 5EC406E4 02C39AE8 5EC437FF 260277FF 26F85EC4 44E80257 88260788 26E85EC4 á^ò&..&.W.$Dá^½&.w.&.7á^ò.ù.õ.á^ 000140
 9AD88808 C4830702 07BE9A06 F803EF9A DC8808EC 8306F306 C79A06E9 02C39AF8 %.ù.Õ..ù.µ..š..É.ÿ.%../....á..Ä. 000160
 77FF26F8 5EC40257 89260789 26E85EC4 073300FC 9A505207 0E04A69A 07070256 V....|...RP.•.3.á^ò&..&.W.á^½&.w 000180
 C02802EB 00018805 75D00807 5A01309A 0477FF26 0677FF26 E85EC404 77FF2606 .&.w.á^ò&.w.&.w..0.Z..Åu.¡..$.+ã 0001A0
 80F85EC4 076502C3 9A045F8D E85EC448 E8065788 26044788 26E85EC4 0074C008 .ât.á^ò&.G.&.W.ŠKá^Ò._..ù.e.á^%. 0001C0
 D88808C4 83078307 8E9A0779 03EF9ADC 8808EC83 077406C7 9A076A02 C39A045F _..û.j..ù.t..š..É.ÿ.ÿ..ƒ....á..Ä 0001E0

Dump of file SATURN:[PCCOMMON.DUMP.DLL]BRDPLOW.TMP;1 on 18-APR-1990 10:38:06.00
File ID (528,44,0)   End of file block 272 / Allocated 272

Virtual block number 75 (0000004B), 512 (0200) bytes

 26E85EC4 07CD00FC 9A0477FF 260677FF 26F85EC4 5052079A 04A69A07 8802569A .V....|...RPá^½&.w.&.w..•.ë.á^ò& 000000
 37FF2602 77FF26F8 5EC4EA56 89E84689 000805F6 568BF446 88065789 26044789 .G.&.W..F¶.V−....FÒ.Võá^½&.w.&.7 000020
 5EC40C74 C008C02E 02EB0001 B8057500 0807FA01 309A37FF 260277FF 26E85EC4 á^ò&.w.&.7.0.°..Åu.¡..$.+â.ât.á^ 000040
 9AF85EC4 080202C3 9AE85EC4 37FF2602 77FF26F8 5EC444EB 02578826 078826E8 ò&..&.W.$Dá^½&.w.&.7á^ò.û...á^%. 000060
 02569AD8 8808C483 082007CE 9A081603 EF9ADC88 08EC8308 1106C79A 080702C3 û....ú....$..É.ÿ....ö. ..á..Ä.V. 000080
 260677FF 26F85EC4 02578926 078926E8 5EC40851 00FC9A50 52082C04 A69A0825 %..|...RP.•.Q.á^ò&..&.W.á^½&.w.& 0000A0
 C008C028 02EB0001 B8057500 08087801 309A0477 FF260677 FF26E85E C40477FF .w.á^ò&.w.&.w..0.x..Åu.¡..$.+â.á 0000C0
 045F80F8 5EC40883 02C39A04 5F8DE85E C448E806 57882604 478826E8 5EC40074 t.á^ò&.G.&.W.ŠKá^Ò._..û...á^%._. 0000E0
 569AD888 08C48308 A107CE9A 089703EF 9ADC8808 EC830892 06C79A08 8802C39A .û....ú....$..É.ÿ....ö.À..á..Ä.V 000100
 478926E8 5EC4FFFF 00FC9A04 77FF2606 77FF26F8 5EC45052 088804A6 9A08A602 .|..¡.RPá^½&.w.&.w..•...á^ò&.G 000120
 5EC437FF 260277FF 26F85EC4 E65689E4 4689F656 88F44688 025DE906 57892604 .&.W.Ò]..F¶.V−.FÒ.V|á^½&.w.&.7á^ 000140
 26E45EC4 0C74C008 C02802EB 00018805 75D00809 1801309A 37FF2602 77FF26E4 ò&.w.&.7.0....Åu.¡..$.+â.ât.á^ò& 000160
 02C39AF8 5EC40920 02C39AE4 5EC437FF 260277FF 26F85EC4 4DEB0257 88260788 ..&.W.$Má^½&.w.&.7á^ò.û. .á^%.û. 000180
 83094707 8E9A0930 03EF9ADC 8808EC83 09380699 9A281E1E 8D092E06 C79A0925 %..ú......(...8..å..É.ÿ.=../.G.. 0001A0
 C4025789 26078926 E45EC409 7800FC9A 50520953 04A69A09 4C02569A 088808C4 á..Ä.V.L..|.S.RP.•.x.á^ò&..&.W.á 0001C0
 01880575 D008099F 01309A04 77FF2606 77FF26E4 5EC40477 FF260677 FF26F85E ^½&.w.&.w.á^ò&.w.&.w..0....Åu.¡. 0001E0
```

```
Dump of file SATURN:[PCCOMMON.DUMP.DLL]BRDPLOW.TMP;1 on 18-APR-1990 10:38:06.00
File ID (528,44,0)   End of file block 272 / Allocated 272

Virtual block number 76 (0000004C), 512 (0200) bytes

 AA02C39A 045F8DF4 5EC454EB 06578826 04478826 E45EC40D 74C008C0 2B02EB00 .$.+â.ât.á^ô&.G.&.W.$Tá^ô._..û.^ 000000
 9ADC8808 EC830F ? 06999A28 1E1E8D09 8806C79A 09AF02C3 9A045F8D F85EC409 .á^%. ..û.£..ú.¡....(...ô..å..É. 000020
 77FF26F8 5EC45052 09E804A6 9A090602 569AD888 08C48309 D107BE9A 09C703EF ÿ.ú..7.1..á..Ä.V.ø..Ï.Ô.RPá^¥&.w 000040
 46890008 05F65688 F4468806 57892604 478926E4 5EC40A1B 00FC9A04 77FF2606 .&.w..•...á^ô&.G.&.W..F¶.V-....F 000060
 75D00B0A 4801309A 37FF2602 77FF26E4 5EC437FF 260277FF 26F85EC4 E65689E4 ô.VIá^¥&.w.&.7á^ô&.w.&.7.0.H..Åu 000080
 260277FF 26F85EC4 40EB0257 88260788 26E45EC4 0C74C008 C02B02EB 00018805 .¡..$.+â.ât.á^ô&..&.W.$Há^¥&.w.& 0000A0
 0A680699 9A2B1E1E 8D0A5E06 C79A0A55 02C39AF8 5EC40A50 02C39AE4 5EC437FF .7á^ô.û.P.á^%.û.U..ú.^....(...h. 0000C0
 50520A83 04A69A0A 7C02569A D88808C4 830A7707 BE9A0A60 03EF9ADC 8808EC83 .å..É.ÿ.m..ƒ.w..á..Ä.V.|..Ï...RP 0000E0
 77FF26E4 5EC40477 FF260677 FF26F85E C4025789 26078926 E45EC40A A800FC9A .•.´.á^ô&..&.W.á^¥&.w.&.w.á^ô&.w 000100
 04478826 E45EC40D 74C008C0 2B02EB00 01880575 D0080ACF 01309A04 77FF2606 .&.w..0.û..Åu.¡..$.+â.ât.á^ô&.G. 000120
 E806C79A 0ADF02C3 9A045F8D F85EC40A DA02C39A 045F8DE4 5EC454EB 06578826 &.W.$Tá^ô._..û.Ô.á^%. ..û.Ô..ú.Ô 000140
 569AD888 08C4830B 0107BE9A 0AF703EF 9ADC8808 EC830AF2 06999A28 1E1E8D0A ....(.....$..É.ÿ.¥..7....á..Ä.V 000160
 478926E4 5EC406AF 00FC9A04 77FF2606 77FF26F8 5EC45052 081804A6 9A080602 ....Ï...RPá^¥&.w.&.w..•.£.á^ô&.G 000180
 073926F0 5EC40257 88260788 26F45EC4 68750000 8ABF8326 065EC406 57892604 .&.W.á^.&.¢...uhá^¶&..&.W.á^Þ&9. 0001A0
 0A573926 3C750847 3926F05E C40A5788 26084788 26F45EC4 50750257 39265675 uV&9W.uPá^¶&.G.&.W.á^Þ&9G.u<&9W. 0001C0
 26F45EC4 1C750657 39262275 04473926 F05EC406 57882604 478826F4 5EC43675 u6á^¶&.G.&.W.á^Þ&9G.u"&9W.u.á^¶& 0001E0

Dump of file SATURN:[PCCOMMON.DUMP.DLL]BRDPLOW.TMP;1 on 18-APR-1990 10:38:06.00
File ID (528,44,0)   End of file block 272 / Allocated 272

Virtual block number 77 (0000004D), 512 (0200) bytes

 009487C7 26065EC4 33E80275 0E573926 08750C47 3926F05E C40E5788 260C4788 .G.&.W.á^Þ&9G.u.&9W.u.$3á^.&ú... 000000
 76FFF276 FFF476FF F676FF16 7400567F 8326077F 1F7C0058 7F832606 5EC40001 ..á^.&..X.|...&..V.t..v~.v¶.v·.v 000020
 08460806 4688D88E 0556881E 56570000 34C8CBC9 1F0CC483 04D00902 9A5306F0 Þ.S.Ø.Ï..á..èùå4..WV.|V..Ä.F..F. 000040
 A5A5A5DA 8E1E0716 F088D07E 8D0C5688 0A468802 A9E90375 0C46080A 46880874 ¢..F..F.u.Ô`..F..V..-Å.Þ....ÔEEE 000060
 C4F65689 F4468900 56050457 88260247 8826065E C4DA568C 08468900 468D1FA5 E..FÅ.FÅ.VÖá^.&.G.&.W..V..F¶.V-á 000080
 E8000188 0575D008 0C630130 9A37FF26 0277FF26 085EC437 FF260277 FF26F45E ^¶&.w.&.7á^Å&.w.&.7.0.c..Åu.¡..$ 0000A0
 085EC437 FF260277 FF26F45E C440E802 57882607 8826085E C40C74C0 08C02B02 .+â.ât.á^Å&..&.W.$Há^¶&.w.&.7á^Å 0000C0
 0C8808EC 830C8306 999A2B1E 1E8D0C79 06C79A0C 7002C39A F45EC40C 6802C39A .û.k.á^¶.û.p..ú.y....(......å..É 0000E0
 0CC300FC 9A50520C 9E04A69A 0C970256 9AD88808 C4830C92 07BE9A0C 8803EF9A .ÿ..../....á..Ä.V....Ï...RP.•.û. 000100
 0477FF26 0677FF26 085EC404 77FF2606 77FF26F4 5EC40257 89260789 26085EC4 á^Å&..&.W.á^¶&.w.&.w.á^Å&.w.&.w. 000120
 E8065788 26044788 26085EC4 0074C008 C02B02E8 00018805 75D0080C EA01309A .0.ô..Åu.¡..$.+â.ât.á^Å&.G.&.W.$ 000140
 281E1E8D 000306C7 9A0CFA02 C39A045F 80F45EC4 0CF502C3 9A045F8D 085EC454 Tá^Å._..û.¥.á^¶._..û.ª..ú......( 000160
 A69A0021 02569AD8 8808C483 001C07BE 9A001203 EF9ADC88 08EC8300 0D06999A ......$..É.ÿ....7....á..Ä.V.¡..Ï 000180
 06578926 04478926 085EC408 E800FC9A 0477FF26 0677FF26 F45EC450 52003304 .3.RPá^¶&.w.&.w..•.$.á^Å&.G.&.W. 0001A0
 05085688 06468801 30E90375 06470826 04478826 00750247 08260788 26085EC4 á^Å&..&.G.u.&.G.&.G.u.Ô=..F..V.. 0001C0
 5688D446 88F05EC4 02571126 07012602 5688D046 88F05EC4 F25689F0 46890016 ...FÞ.V·á^Þ.FÅ.VØ&..&.W.á^Þ.FÅ.V 0001E0

Dump of file SATURN:[PCCOMMON.DUMP.DLL]BRDPLOW.TMP;1 on 18-APR-1990 10:38:06.00
File ID (528,44,0)   End of file block 272 / Allocated 272

Virtual block number 78 (0000004E), 512 (0200) bytes

 D44688F0 5EC40A57 11260847 01260256 88D04688 F05EC406 57112604 47012606 ø&.G.&.W.á^Þ.FÅ.VØ&.G.&.W.á^Þ.FÅ 000000
 44578826 42478826 065EC400 01009487 C726065E C40E5711 260C4701 26065688 .Vø&.G.&.W.á^.&ú.....á^.&.GB&.WD 000020
 01F84683 08E8F846 89:A4689 C0280E0C 00F09A50 160C468D 5052CE56 89CC4689 .Fä.VòRP.FÉ.P.Þ...+â.F•.F%$..F%. 000040
 FFFA76FF CC76FFCE 76FF3273 F8463905 7C397FFA 56390E56 88DC4688 0C¯•5683 .V•..FÉ.V89V•.9|.9F½s2.vö.vä.v•. 000060
 879AE476 FFE676FF 006A006A D876FFDA 76FF0E43 08689A50 16E4468D 006^876 v½j..Fô.P.k.C..vÖ.vÅj.j..vl.vô.. 000080
 5016FC46 8D5052EE 5689EC46 89405788 263E4788 26065EC4 84E80CC4 83FF•<08 ....á.$Çá^.&.G>&.WØ.F£.VŸRP.F=.P 0000A0
 E25639FE 5688FC46 8800E256 8301E046 8308E8E0 4689E246 89C0280E 7F00F09A .Þ...+â.Fâ.FÅ$..FÅ..Vä..F=.V±9Vä 0000C0
 8A08689A 5016E846 8D006AE0 76FFE276 FFEC76FF EE76FF2D 73E04639 057C347F .4|.9FÅs-.vŸ.v$.vä.vÅj..FÔ.P.k.. 0000E0
 1E000016 C8C8C95F 5E1F89E8 08C483FD 30E80EE8 76FFEA76 FFD876FF DA76FF04 ..vÖ.vÅ.vô.vÔ.Ô=».á.$¿.^_èùà.... 000100
 F87E8306 7C087F00 FA7E830F 0A00F09A 5016F846 800A76FF 0C76FFD8 8E080688 ¡ø..Å.v..v..F½.P.Þ....-•...|..-½ 000120
 568301FC 468308E8 FC4689FE 4689C028 00010098 87C72606 5EC400AF E9037301 .±.ÔÉ.á^.&ú.....+â.F±.F=$..F=..V 000140
 FC76FFFE 76FF0A76 FF0C76FF 7773FC46 39057C7E 7FFE5639 FA5688F8 468800FE ±..F½.V•9V±.-|.9F=sw.v..v..v±.v= 000160
 00988F83 26EE5EC4 F05689EE 4689EC56 88EA4688 0DD00868 9A5016EA 468D006A j..Fõ.P.k.Å..Fõ.V$.FŸ.VÞá^Ÿ&.¢.. 000180
 83040FE8 0E0676FF 0876FF53 520E76FF 1076FF50 16F6468D 5016F246 8D457500 .uÉ.F·.P.F-.P.v..v.RS.v..v..Ô... 0001A0
 76FFF076 FF0A76FF 0C76FF0E 76FF1076 FFF676FF F276FFF4 76FF2274 C00814C4 á..ât".v¶.v·.v~.v..v..v..v..vÞ.v 0001C0
 0EA1881E 00001CC8 CBC91F00 00009887 C726065E C4FF6FE9 12C48300 13E80EEE Ÿ.Ô...á.Ôo.á^.&ú......èùà....¡Å. 0001E0
```

```
Dump of file SATURN:[PCCOMMON.DUMP.DLL]BRDPLOW.TMP;1 on 18-APR-1990 10:38:06.00
File ID (528,44,0)   End of file block 272 / Allocated 272

Virtual block number 79 (0000004F), 512 (0200) bytes

 884BEB12 4688EC46 89EE4689 E84689EA 4689C028 00010098 87C72606 5EC4D88E .Äá^.&ú.....+á.Fõ.FÒ.FŸ.F&.F.$K. 000000
 EA5689E8 46891656 88144688 4CEBEA56 89E84689 DAF700D2 830BF716 56881446 F..V.¥Ä.@.¥Ö.FÒ.VõŠL.F..V..FÒ.Võ 000020
 EC468916 56881446 8829EBEE 5689EC46 89DAF700 D28308F7 16568814 46883EEB $>.F..V.¥Ä.@.¥Ö.F&.VŸ$).F..V..F& 000040
 E5EB8674 000830A6 74000430 E3740002 30D37400 013016E8 000DE918 EBEE5689 .VŸ$.Õ1.$.=..t&=..tD=..t1=..tÑ$1 000060
 00F09A50 16F84680 0A76FF0C 76FF08C4 83F8BFE8 0E0676FF 0876FF50 16E84680 .FÒ.P.v..v..Ò«.á..v..v..F½.P.Þ. 000080
 7C7C7FFE 5639FA56 88F84688 00FE5683 01FC4683 08E8FC46 89FE4689 C028105C \.+á.F±.F•$..F•..V±..F½.V°9V±.|| 0000A0
 46880E83 08689A50 16E44680 006AFC76 FFFE76FF 0A76FF0C 76FF7573 FC463905 .9F•su.v..v..v±.v•j..Fõ.P.k.°..F 0000C0
 1076FF12 76FF5016 F4468043 75000098 8F8326F0 5EC4F256 89F04689 E65688E4 õ.V|.FÞ.V á^Þ&.¢...uC.F¶.P.v..v. 0000E0
 FF1276FF F476FFF6 76FF2274 C00B12C4 830509E8 0E0676FF 0876FF53 520E76FF .v.RS.v..v..Ò...á..át".v-.v¶.v.. 000100
 C726065E C4FF71E9 12C483FE C3E80EF0 76FFF276 FF0A76FF 0C76FF0E 76FF1076 v..v..v..v..v .vÞ.Òú±.á.Õq.á^.&ú 000120
 5689CA46 89001605 08568806 46880888 0F7EB81E 00003AC8 CBC91F00 00009887 ......èúà:...¡-..Ä.F..V.....Fò.V 000140
 830603E8 0E0676FF 0876FF50 16EE4680 C85689C6 46890016 050C5688 0A4688CC ä.F..V.....Fó.Và.FŸ.P.v..v..Ò... 000160
 890A5788 26084788 260E5EC4 08C48305 F1E80E0A 76FF0C76 FF50160A 468008C4 á..FÕ.P.v..v..Òþ..á.á^.&.G.&.W.. 000180
 5E050457 88260247 8826065E C4D45689 D246890E 5788260C 47882608 56890646 F•.VÄ&.G.&.W..F@.Vàá^.&.G.&.W..^ 0001A0
 01C3E9FE 468801ED E9037C04 FE7E83FE 46FF03E8 0000FE46 C7D05689 CE468900 ..Fo.VÄúF±..$..F±.~±.|.ÕÚ..F±ÕÚ. 0001C0
 26070326 CA5EC40A 57182608 472826C6 5EC4D2D1 E0D10257 88260788 26CE5EC4 á^ö&..&.W.1Ä1@á^ó&+G.&.W.á^ò&..& 0001E0

Dump of file SATURN:[PCCOMMON.DUMP.DLL]BRDPLOW.TMP;1 on 18-APR-1990 10:38:06.00
File ID (528,44,0)   End of file block 272 / Allocated 272

Virtual block number 80 (00000050), 512 (0200) bytes

 007FEC56 38D85688 064688EC 5689EA46 89E45613 E24603F0 5618EE46 28025713 .W.+FŸ.VÞ.Fã.Võ.Fõ.V&.F@.VÄ;V&.. 000000
 18260728 26CA5EC4 0A571326 08470326 C65EC4EA 4688EC56 880673EA 463B057C |.;Fõs..V&.Fõá^ó&.G.&.W.á^ò&+.&. 000020
 CA5EC4D2 D1E0D102 57882607 8826CE5E C40175E9 02578926 07892612 5EC40257 W.á^.&..&.W.Õu.á^ö&..&.W.1Ä1@á^ò 000040
 46890C56 18DA4628 F85613F6 46030257 13260703 26C65EC4 0A571826 08472826 &+G.&.W.á^ó&..&.W..F-.V½+FÖ.VÉ.F 000060
 26CA5EC4 EA4688EC 56880673 EA463805 7C0D7FEC 563B0856 88D64688 EC5689EA õ.V&.F@.VÄ;V&..|.;Fõs..V&.Fõá^ò& 000080
 C40105E9 06578926 04478926 125EC402 57182607 2826C65E C40A5713 26084703 .G.&.W.á^ó&+.&.W.á^.&.G.&.W.Õ..á 0000A0
 0C472826 C65EC406 57132604 470326CA 5EC4D201 E0D10657 88260447 8826CE5E ^ö&.G.&.W.1Ä1@á^ò&.G.&.W.á^ó&+G. 0000C0
 7FEC5638 D45688D2 4688EC56 89EA4689 E85613E6 4603F456 18F24628 0E571826 &.W.+F .V¶.F|.VÒ.Fõ.V&.F@.Vå;V&. 0000E0
 57182604 472826CA 5EC40E57 13260C47 0326EA46 88EC5688 0673EA46 38057C00 .|.;Fõs..V&.Fõ&.G.&.W.á^ò&+G.&.W 000100
 5EC4D201 E0D10657 89260447 8826CE5E C40095E9 0A578926 08478926 125EC406 .á^.&.G.&.W.Õ..á^ö&.G.&.W.1Ä1@á^ 000120
 E05618DE 4628FC56 13FA4603 06571326 04470326 C65EC40E 5718260C 472826CA ò&+G.&.W.á^ó&.G.&.W..F°.V•+F@.VÄ 000140
 5EC4EA46 88EC5688 0673EA46 38057C00 7FEC5638 D45688D2 4688EC56 89EA4689 .Fõ.V&.F@.Vå;V&..|.;Fõs..V&.Fõá^ 000160
 E80E5789 260C4789 26125EC4 06571826 04472826 C65EC40E 5713260C 470326CA ò&.G.&.W.á^ó&+G.&.W.á^.&.G.&.W.$ 000180
 E9037500 033DFF05 E9037500 023DFE90 E9037500 013DFE36 E90375C0 08213823 #$1.áu.Õó±=..u.Õ.±=..u.Õ..=..u.Õ 0001A0
 74084608 064688D8 8E10CE88 1E560000 20C8CBC9 1F00EBC0 28FE07E9 00EBFF6D m.$.Õ.±+á$..èúà ..V.¡ö..Ä.F..F.t 0001C0
 75184608 16468808 74144608 12468810 7410460B 0E468818 740C460B 0A468820  .F..F.t..F..F.t..F..F.t..F..F.u 0001E0

Dump of file SATURN:[PCCOMMON.DUMP.DLL]BRDPLOW.TMP;1 on 18-APR-1990 10:38:06.00
File ID (528,44,0)   End of file block 272 / Allocated 272

Virtual block number 81 (00000051), 512 (0200) bytes

 27E80E06 76FF0876 FF0A76FF 0C76FF0E 76FF1076 FF5016F0 4680020E E9C02805 .+áÕ...FÞ.P.v..v..v..v..v..v..Õ' 000000
 8DE9037D 00F67E83 01C6E903 7500F07E 83097F01 D1E9037D 00F27E83 10C483FD ».á..~.).Õ1....~Þ.u.Õó..~-.).Õ§ 000020
 019EE903 7500F87E 83097F01 A9E9037D 00FA7E83 0182E903 7500F47E 83097F01 ....~¶.u.Õý..~°.).Õ`....~½.u.Õ.. 000040
 89F25688 F0468800 04E446C7 018AE903 7500FC7E 83097F01 95E9037D 00FE7E83 .~±.).Õ.....~•.u.Õ..úFõ...FÞ.V.. 000060
 5288F042 8802E6C1 EE76883E 7D04EE7E 83EE46FF 03E80001 EE46C7E8 5689E646 F|.VÒúFŸ..$..FŸ.~Ÿ.)>.vŸè|..BÞ.R 000080
 8788E301 EE5E8818 73E04639 057C1F7F E25639E8 5688E646 88E25689 E04689F2 .FÄ.Vã.F|.VÒ9Vã..|.9FÄs..^Ÿ1D.. 0000A0
 56050457 88260247 8826065E C489EBE8 5689E646 89E25688 E0468BE4 46890318 ...Fõ.FÄ.Vã.F|.VÒ$¿á^.&.G.&.W..V 0000C0
 E876FF37 FF260277 FF26EA5E C4727508 E47E8306 7404E47E 83EC5689 EA468900 ..Fõ.V&.~ô.t..~ô.urá^õ&.w.&.7.vÒ 0000E0
 C444E8E8 5688E646 880874C0 08C02802 E80001B8 0575D008 14AF0130 9AE676FF .v|.0.£..Äu.¡..$.+à.ât..F|.VÒ$Dá 000100
 EC8314C6 06C79A14 8C02C39A EA5EC414 87028F9A E65E8D37 FF260277 FF26EA5E ^õ&.w.&.7.^|.¢.ñ.á^ô.ù.V..ú.ó..& 000120
 FC9A5052 14E104A6 9A14DA02 569AD888 08C48314 0507CE9A 14C803EF 9ADC8808 ..É.ÿ.ù..ö.1..á..Ä.V.Ö..|.Ä.RP.• 000140
 88057500 08151801 309AE676 FFE876FF 0477FF26 0677FF26 EA5EC475 EB14F900 .°.$uá^õ&.w.&.w..vÒ.v|.0....Äu.¡ 000160
 045F8DEA 5EC41523 028F9AE6 5E8048EB E85688E6 46880874 C00BC028 02E80001 ..$.+á.ât..F|.VÒ$H.^|.¢.#.á^ô._. 000180
 569AD888 08C48315 4107CE9A 153703EF 9ADC8808 EC831532 06C79A15 2802C39A .ù.(..ú.2..&..É.ÿ.7..ö.A..á..Ä.V 0001A0
 E85689E6 46890C36 00FC9A04 77FF2606 77FF26EA 5EC45052 155804A6 9A154602 .F..|.X.RPá^õ&.w.&.w..•.6..F|.VÒ 0001C0
 5EC416E8 0001B802 57892607 8926E856 88E64688 165EC407 8926E446 88125EC4 á^..Fõ&..á^..F|.VÒ&..&.W.¡..$.á^ 0001E0
```

```
Dump of file SATURN:[PCCOMMON.DUMP.DLL]BRDPLOW.TMP;1 on 18-APR-1990 10:38:06.00
File ID (528,44,0)   End of file block 272 / Allocated 272

Virtual block number 82 (00000052), 512 (0200) bytes

55B81E56 000010C8 CBC95E1F 00E80789 26024789 26C02B16 5EC40008 07C72612 .&ú...á^.+à&.G.&..Š..^èùà...V.¡U 000000
46081446 88087410 46080E46 8810740C 46080A46 88187408 46080646 88D88E13 ..Ä.F..F.t..F..F.t..F..F.t..F..F 000020
E80E0676 FF0876FF 0A76FF0C 76FF0E76 FF1076FF 5016F046 8D7BEBC0 28047516 .u.+àŠ(.FÞ.P.v..v..v..v..v..v..Ò 000040
7400F47E 83067F45 7C00r67E 83487400 F07E8306 7F537C00 F27E8310 C483FAE6 Ì*.á..-·.|S...-Þ.tK.--.|E...-¶.t 000060
125E8821 7400FC7E 83067F29 7C00FE7E 832F7400 F87E8306 7F377C00 FA7c.^30 =.-*.|7...-½.t/.-±.|)...-•.t!.^. 000080
C02804EB 00018802 57892607 8926145E C4F25288 F0428802 E6C10320 B788E.`1 1D.ñ .èÌ..BÞ.R·á^.&..&.W.|..Š.+á 0000A0
46390856 88064688 34740C46 080A4688 D88E159F 881E0000 04C8CBC9 5E1F00L9 Š..^èùà....|...Ä.F..F.t4.F..V.9F 0000C0
3A478826 FC5EC4FE 5689FC46 890C5688 0A468823 E8000188 05750C56 390A750A .u.9V.u.|..Š#.F..V..F=.V±á^=&.G: 0000E0
06468808 8E164C88 1E000002 C8C8C91F 00E8C02B C4E80C56 890A4689 3C578826 &.W<.F..V.Šá+àŠ..èùà....|L..Ä.F. 000100
08568806 468845E8 8DF38805 75104608 0E468808 740C4608 0A468810 74084608 .F.t..F..F.t..F..F.u.|µ.ŠE.F..V. 000120
C7260E5E C40C7508 FE7E8300 00FFFF9A 5016FE46 8D0A76FF 0C76FF50 52001605 ...RP.v..v..F±.P......-±.u.á^.&ú 000140
1F00EBC0 28078926 0E5EC401 F8878826 2826068E E3D1FE5E 8818EBC0 28000807 ...+àŠ..^±1D..&(&..½.á^.&..+àŠ.. 000160
F3880675 0C46080A 46880874 08460806 4688088E 1699881E 56570000 2CC8C8C9 èùà,..WV.|...Á.F..F.t..F..F.u.|µ 000180
065EC41F A5F20008 B9DA8E1E F088F888 00160508 56880646 880A5EC4 030AE98D .Ö..á^..F..V.....«.Þ..Ö¿..·E.á^. 0001A0
8826F656 8CF44689 E4468D02 D9E9C02B 05730156 7F832607 7C0E7F00 587F8326 &..X...|.&..V.s.+àÖ)..FÕ.F¶.V-&. 0001C0
FC4689FE 4689C028 17B200F0 9A50160C 46805052 DA5689D8 46894457 88264247 GB&.WD.FÁ.VORP.FÉ.P.Þ.ÿ.+á.F±.F= 0001E0

Dump of file SATURN:[PCCOMMON.DUMP.DLL]BRDPLOW.TMP;1 on 18-APR-1990 10:38:06.00
File ID (528,44,0)   End of file block 272 / Allocated 272

Virtual block number 83 (00000053), 512 (0200) bytes

FFDA76FF 4173FC46 39057C48 7FFE5639 DE56880C 468800FE 568301FC 468308E8 Š..F=..V±..FÉ.V89V±.H|.9F=sA.vÖ. 000000
F876FFFA 76FFF476 FFF676FF 1020086B 9A5016F8 468D006A FC76FFFE 76FFD876 vÁ.v±.v=j..F½.P.k. ..v-.v¶.v*.v½ 000020
065EC4A5 E808C483 05E40014 9AF476FF F676FF0A 76FF0C76 FF08C483 026FE80E .Òo..á..v..v..v-.v¶...Ö..á.ŠEá^. 000040
E05EC4D6 56890446 890C5688 0A4688E2 5689E046 89005E05 04578826 02478826 &.G.&.W..^..FÁ.Vå.F..V..Få.V=á^Á 000060
2802E800 01880575 D0081841 01309A37 FF260277 FF26D45E C437FF26 0277FF26 &.w.&.7á^á&.w.&.7.0.A..Áu.|..Š.+ 000080
C39AD45E C437FF26 0277FF26 E05EC444 E8025788 26078826 D45EC40C 74C008C0 à.àt.á^á&..&.W.ŠDá^Á&.w.&.7á^à.ù 0000A0
83186707 8E9A1850 03EF9ADC 8808EC83 185806C7 9A184E02 C39AE05E C4184902 .I.á^Á.Û.N..ú.X..&..É.ÿ.]..ƒ.g.. 0000C0
C4025789 26078926 D45EC418 9800FC9A 50521873 04A69A18 6C02569A D88808C4 á..Ä.V.l...|.s.RP.=...á^á&..&.W.á 0000E0
01880575 D008188F 01309A04 77FF2606 77FF2604 5EC40477 FF260677 FF26E05E ^Á&.w.&.w.á^á&.w.&.w...0.¢..Áu.|. 000100
CA02C39A 045F8D04 5EC448E8 06578826 04478826 D45EC400 74C008C0 2802E800 .Š.+à.àt.á^á&.G.&.W.ŠKá^à._..ù.ò 000120
18E807BE 9A180E03 EF9ADC88 08EC8318 D906C79A 18CF02C3 9A045F8D E05EC418 .á^Á._..ù.ü..ú.\..&..É.ÿ.B..ƒ.Ò. 000140
3200FC9A 0477FF26 0677FF26 E05EC450 5218FF04 A69A18ED 02569AD8 8808C483 .á..Á.V.Ù..Ì...RPá^Á&.w.&.w..=.2 000160
FF26E05E C4D65689 D4468900 08050C56 880A4688 06578926 04478926 D45EC419 .á^á&.G.&.W..F..V.....Få.V=á^Á&. 000180
08C02802 E8000188 0575000B 195F0130 9A37FF26 0277FF26 D45EC437 FF260277 w.&.7á^á&.w.&.7.0. ..Áu.|..Š.+à. 0001A0
6702C39A D45EC437 FF260277 FF26E05E C444E802 57882607 8826D45E C40C74C0 àt.á^á&..&.W.ŠDá^ÁĪ.w.&.7á^à.ù.g 0001C0
08C48319 8507CE9A 197B03EF 9ADC8808 EC831976 06C79A19 6C02C39A E05EC419 .á^Á.ú.l..ú.v..Š..É.ÿ.(..ö....á. 0001E0

Dump of file SATURN:[PCCOMMON.DUMP.DLL]BRDPLOW.TMP;1 on 18-APR-1990 10:38:06.00
File ID (528,44,0)   End of file block 272 / Allocated 272

Virtual block number 84 (00000054), 512 (0200) bytes

E05EC402 57892607 8926045E C4198600 FC9A5052 199104A6 9A198A02 569AD888 .Ä.V....Ì...RP.=.Ñ.á^á&..&.W.á^Á 000000
E8000188 0575D008 19000130 9A0477FF 260677FF 26D45EC4 0477FF26 0677FF26 &.w.&.w.á^á&.w.&.w..0.Ì..Áu.|..Š 000020
C419E802 C39A045F 8DD45EC4 48E80657 88260447 8826045E C40074C0 08C02802 .+à.àt.á^á&.G.&.W.ŠKá^à._..ù.Ò.á 000040
C4831A06 07CE9A19 FC03EF9A DC8808EC 8319F706 C79A19ED 02C39A04 5F80E05E ^Á._..ù.Ú..ú.%..Š..É.ÿ.=..ö....á 000060
C4148600 FC9A0477 FF260677 FF26E05E C450521A 1004A69A 1A080256 9AD88808 ..Ä.V....Ì...RPá^Á&.w.&.w..=...á 000080
C7D88E17 0A881E56 57000032 C8C8C95F 5E1F00E8 C0280657 89260447 8926045E ^Á&.G.&.W.+àŠ..^ èùà2..WV.|...Äù 0000A0
0676FF08 76FF0344 E980F388 06750C46 080A4688 08740846 08064688 0000EE46 FŸ...F..F.t..F..F.u.|µ.ÕO..v..v. 0000C0
A5F20008 B9DA8E1E F088F888 00360508 56880646 880A5EC4 04C4830E 2100FE9A .±.|..á.á^..F..V..ó..«.Þ..Ö¿..·Ê 0000E0
4680FE56 89FC4689 4A578826 48478826 030EE9C0 28057D01 0A7F8326 065EC41F .á^.&....).+àÖ..&.GH&.WJ.F=.V±.F 000100
8308E8F0 4689F246 89C0281A EF00F09A 50160246 80FC76FF 52E8568C E6468906 ø.FÌ.VÒR.v•.F@.P.Þ.ÿ.+á.F·.FÞŠ.. 000120
FFFC76FF FE76FF68 73F04639 057C727F F2563904 56880246 8800F256 8301F046 FÞ..V·..F@.VÀ9V·.r|.9FÞsk.v±.v=. 000140
07B826C2 E8027402 067F8326 F45EC417 7608689A 5016F446 8D006AF0 76FFF276 v·.vÞj..F¶.P.k.v.á^¶&....t.Šó&.. 000160
FFFF9AE6 76FFE876 FF016A06 77FF2608 77FF26F8 5EC4FA56 89F84689 02578826 &.W..F½.V*á^½&.w.&.w.j..vÒ.vÌ... 000180
01EE46C7 057500EE 7E8308C4 83170600 149AE676 FFE876FF 0A76FF0C 76FF0000 ...v..v..vÒ.vÌ...•..á..-Ÿ.u.úFŸ. 0001A0
5689EA46 89005E05 ^4578826 02478826 065EC402 4DE90375 00EE7E83 FF78E900 .Ö(..-Ÿ.u.ÕM.á^.&.G.&.W..^..Fõ.V 0001C0
FF260277 FF26CE5E ·437FF26 0277FF26 EA5EC400 5689CE46 890C5688 0A4688EC &.F..V..Fo.VÀá^ó&.w.&.7á^ó&.w.&. 0001E0
```

```
Dump of file SATURN:[PCCOMMON.DUMP.DLL]BRDPLOW.TMP;1 on 18-APR-1990 10:38:06.00
File ID (528,44,0)   End of file block 272 / Allocated 272

Virtual block number 85 (00000055), 512 (0200) bytes

 EB02578B 26078826 CE5EC40C 74C008C0 2802E800 01880575 D00B1BB1 01309A37 7.0.Ÿ..Åu.¡..Š.+á.ât.á^ö&..&.W.$ 000000
 18C806C7 9A18BE02 C39AEA5E C4188902 C39ACE5E C437FF26 0277FF26 EA5EC444 Dá^ö&.w.&.7á^ö.ú.¿.á^õ.ú./..ú.à. 000020
 50521BE3 04A69A:B DC02569A 088808C4 831B0707 BE9A1BC0 03EF9ADC 8808EC83 .&..Ê.ÿ.è../.■..á..Ä.V.Ê..Ì.D.RP 000040
 77FF26CE 5EC40477 FF260677 FF26EA5E C4025789 26078926 CE5EC41C 0800FC9A .■...á^ö&..&.W.á^õ&.w.&.w.á^o&.w 000060
 04478826 CE5EC400 74C008C0 2802E800 01880575 D00B1C2F 01309A04 77FF2606 .&.w..0./..Åu.¡..Š.+á.ât.á^ö&.G. 000080
 4906C79A 1C3F02C3 9A045F8D EA5EC41C 3A02C39A 045F8DCE 5EC448EB 06578826 &.W.Šká^ö._..ú.:.á^õ._..ú.7..ú.| 0000A0
 521C6F04 A69A1C5D 02569AD8 8808C483 1C58078E 9A1C4E03 EF9ADC88 08EC831C ..&..Ê.ÿ.N../.X..á..Ä.V.]..Ì.o.R 0000C0
 880A4688 06578926 04478926 CE5EC41C A200FC9A 0477FF26 0677FF26 EA5EC450 Pá^ö&.w.&.w..■.Å.á^o&.G.&.W..F.. 0000E0
 9A37FF26 0277FF26 CE5EC437 FF260277 FF26EA5E C4D05689 CE468900 08050C56 V.....Fo.VÅá^ö&.w.&.7á^o&.w.&.7. 000100
 C444EB02 57882607 8826CE5E C40C74C0 08C02802 E80001B8 0575D008 1CCF0130 0.ü..Åu.¡..Š.+á.ât.á^ö&..&.W.ŠDá 000120
 EC831CE6 06C79A1C DC02C39A EA5EC41C D702C39A CE5EC437 FF260277 FF26EA5E ^õ&.w.&.7á^ö.ú.■.á^õ.ú.É..ú.Ì..& 000140
 FC9A5052 100104A6 9A1CFA02 569AD888 08C4831C F507CE9A 1CEB03EF 9ADC8808 ..Ê.ÿ.Š..ö.%..á..Ä.V.*..Ì...RP.■ 000160
 260677FF 26CE5EC4 0477FF26 0677FF26 EA5EC402 57892607 8926CE5E C41D2600 .&.á^o&..&.W.á^õ&.w.&.w.á^o&.w.& 000180
 88260447 8826CE5E C40074C0 08C02802 E80001B8 0575D008 1D4D0130 9A0477FF .w..0.M..Åu.¡..Š.+á.ât.á^o&.G.&. 0001A0
 83106706 C79A1D5D 02C39A04 5F8DEA5E C41D5802 C39A045F 8DCE5EC4 48EB0657 W.Šká^ö._..ú.X.á^õ._..ú.]..ú.g.. 0001C0
 C450521D 8D04A69A 1D7B0256 9AD88808 C4831D76 07CE9A1D 6C03EF9A DC8808EC &..Ê.ÿ.l..ö.v..á..Ä.V.(..Ì...RPá 0001E0

Dump of file SATURN:[PCCOMMON.DUMP.DLL]BRDPLOW.TMP;1 on 18-APR-1990 10:38:06.00
File ID (528,44,0)   End of file block 272 / Allocated 272

Virtual block number 86 (00000056), 512 (0200) bytes

 5E1F00EB C0280657 89260447 8926CE5E C4181400 FC9A0477 FF260677 FF26EA5E ^õ&.w.&.w..■...á^ö&.G.&.W.+âŠ..^ 000000
 02030000 000808C6 00020000 00041A63 00020000 00011831 00020009 90CBC95F _èù.....1.......c.......ó....... 000020
 00020000 00171884 00020000 00150420 00020000 00141A83 0002021E 000418 1E ........*....... ................ 000040
 26105EC4 D88EFFFF 881E5657 000004C8 00000050 00041601 02030000 00191A38 ;.......1...P...à...WV.¡...Äá^.& 000060
 0E7E832C 740018 7F 8326FE56 89FC4689 000805C2 8CC38800 8DE90375 001A7F83 ....u.Õ...û.ô....F■.V±&....t,.-. 000080
 9A0A76FF 0C76FFFC 76FFFE76 FF08C483 00520014 9A0676FF 0876FF50 52107500 .u.RP.v..v....R..á..v±.v■.v..v.. 0000A0
 890A8E1E F088F888 0C56880A 4688FC5E C4187400 0E7E834D EB08C483 00980014 .....á.ŠM.-..t.á^■.F..V..«.Þ..Ö¿ 0000C0
 FF53061F A5F20008 890A8E1E F088F888 08568806 4688FC5E C426EB1F A5F20008 ...Ê.Š&á^■.F..V..«.Þ..Ö¿...Ê..S. 0000E0
 C8C8C95F 5E1F00EB C0280001 1847C726 105EC408 C483FFFF 0D149A0A 76FF0C76 v..v........á.á^.&úG...+âŠ..^ èùà 000100
 C41875D0 08FE5689 FC468902 57882607 8826145E C4D88E00 08881E56 5700[illegible]014 ...WV.¡...Äá^.&..&.W..F■.V±.Ïu.á 000120
 EC7E8D10 56880E46 886AEB1F A5F20008 890A8E1E F088F888 10568B0E 46880A5E ^..F..V..«.Þ..Ö¿...Ê.Šj.F..V..-& 000140
 05740012 7E835052 0477FF26 0677FF26 145EC41F A5F20008 890A8E1E 0716F088 .Þ....Ö¿...Ê.á^.&.w.&.w.RP.-..t. 000160
 C412C483 FC5EFF37 FF26065E C40676FF 0876FF50 520C5688 0A468806 E899C028 +á.Š..F..V.RP.v..v.á^.&.7.^■.á.á 000180
 A5F20008 891F161E EC7680FB 880E5EC4 1FA5F200 08891F16 1EEC768D F8880A5E ^..«.vš...¿...Ê.á^..«.vš...¿...Ê 0001A0
 080A4688 08740846 08064688 D88E0087 881E0000 12C8CBC9 5F5E1F00 EBC02B1F .+âŠ..^ èùà....¡ñ..Ä.F..F.t..F.. 0001C0
 800676FF 0876FF01 9709C29A 006A006A 0676FF08 76FF00AF E98DF388 06750C46 F.u.¡µ.ÕÉ..v..v.j.j..ô....v..v.. 0001E0

Dump of file SATURN:[PCCOMMON.DUMP.DLL]BRDPLOW.TMP;1 on 18-APR-1990 10:38:06.00
File ID (528,44,0)   End of file block 272 / Allocated 272

Virtual block number 87 (00000057), 512 (0200) bytes

 26FC5EC4 FE5689FC 4689F056 88EE4688 0085E903 74C008FF FF0A589A 5016EE46 FŸ.P.X....ât.Õ...FŸ.VÞ.F■.V±á^■& 000000
 FA5689F8 4689000C 05C388F4 5689F246 89001C05 C28CC388 D1EB0275 00347F83 ..4.u.Šî.û.ô....F·.V¶.û....F%.V* 000020
 0C76FF0E C483FE16 E80EF276 FF52F876 FF52500A 76FF0C76 FFF64689 30478826 &.GO.F-.v..v.PR.V%R.v·.Ò.±.á..v. 000040
 6A12C483 FEA3E80E E76FFF0 76FFF276 FFF476FF F876FFFA 76FFF676 FF0A76FF .v..v-.v*.v%.v¶.v·.vÞ.vŸ.ÒÉ±.á.j 000060
 000032C8 CBC91F00 EBC02BFF 64E90AC4 830597E8 0E066AEE 76FFF076 FF006[illegible]00 .j..vÞ.vŸj..Ò...á.Õd.+âŠ..èùà2.. 000080
 890E468D 01D9E980 F3880675 0C46080A 46880874 08460806 46880 88E 016088 1E .¡'..Ä.F..F.t..F..F.u.¡µ.Õ1..F8. 0000A0
 065EC411 EBFE5689 FC46894A 57882648 47882606 5EC40002 F246C7F0 568CEE46 FŸ.VÞúF·..á^.&.GH&.WJ.F■.V±Š.á^. 0000C0
 76FFFE76 FF0196E9 0375C008 F24EFFF2 4688FE56 89FC4689 4E578826 4C478826 &.GL&.WN.F■.V±.F·.N·.âu.Õ...v±.v 0000E0
 60E90374 C00801 87 0A589A50 16F4468D FC76FFFE 76FF02A8 09C29A00 6A006AFC ■j.j..ö.·..v±.v■.F¶.P.X....ât.Õm 000100
 4688000A E9064688 DA5689D8 46890257 88260788 26064689 06478826 F45EC401 .á^¶&.G..F■&..&.W..FÁ.VÖ.F■ÕÖ..F 000120
 0C76FF15 74002A7F 8326077F 1E7C002C 7F8326CE 5EC4D056 89CE4689 DA5688D8 Å.VÖ.Fö.VÅá^o&...|...&..*.t..v. 000140
 88268CE8 02750038 7F8326CE 5EC408C4 83FE58E8 0E2677FF 262877FF 260A76FF .v.&.w(&.w&.Õ[±.á.á^o&..8.u.Š.&. 000160
 FFF076FF 016A0677 FF260877 FF260456 89024689 001605C2 8CC388DC 46893247 G2.FÉ.û.ô....F0.VÅ&.w.&.w.j..vÞ. 000180
 1E7C002A 7F8326F8 5EC4FA56 89F84689 DA5688D8 46880081 E90000FF FF9AEE76 vŸ.....Õ...FÁ.VO.F%.V*á^%&..*.|. 0001A0
 5EC408C4 83FDEFE8 0E2477FF 262677FF 260A76FF 0C76FF15 7400287F 8326077F ..&..(.t..v..v.&.w&&.w$.Õy».á.á^ 0001C0
 26045689 D2468900 1405C28C C388DC46 892C4788 26FF1FE9 03750030 7F8326F8 ¥&..0.u.Õ..&.G,.FÉ.û.ô....F0.VÅ& 0001E0
```

```
Dump of file SATURN:[PCCOMMON.DUMP.DLL]BRDPLOW.TMP;1 on 18-APR-1990 10:38:06.00
File ID (528,44,0)   End of file block 272 / Allocated 272

Virtual block number 88 (00000058), 512 (0200) bytes

 7F000130 0F7CC00B 13EB15EB 0000FFFF 9AEE76FF F076FF01 6A0677FF 260877FF .w.&.w.j..vÞ.vŸ.....Š.Š..å|.=... 000000
 D276FFD4 76FFEE76 FFF076FF DC76FF0A 76FF0C76 FF00EB81 7400023D FF1AE903 .Ô..=..t.Š..v..v..vÉ.vÞ.vŸ.vå.vø 000020
 FFDA76FF D276FFD4 76FFEE76 FFF076FF DC76FF0A 76FF0C76 FF0EC483 FC2CE80E .Ò,ø.á..v..v..vÉ.vÞ.vŸ.vå.vø.vÖ. 000040
 03EB0005 B8057502 D67E8308 76FFDA76 FFEE76FF F076FF12 C483FCB9 E80ED876 vÄ.Ò¿ø.á..vÞ.vŸ.vÖ.vÄ.-ø.u.¡..Š. 000060
 B81E5657 000042C8 CBC91F00 EBC02BFE 4CE9FE7C E90AC483 039EE80E 50000388 ¡..P.Ò...á.Ò|±ÖL±+äŠ..èüàB..WV.¡ 000080
 08568806 46880179 E980F388 06750C46 080A4688 08740846 08064688 D88E0232 2..Ä.F..F.t..F..F.u.¡µ.Öy..F..V. 0000A0
 8E1EF088 F07E8D00 36050646 881FA5F2 000889DA 8E1E0716 F088DC7E 8D002605 .&..-É.Þ....Ö¿..·É..F..6..-Þ.Þ.. 0000C0
 7F00CFE9 037DD20B DA568908 46895A57 88265847 8826065E C41FA5F2 0008890A Ö¿..·É.á^.&.GX&.WZ.FÄ.VÖ.ø).Öü.. 0000E0
 ADE9037C 02C27E83 C246FF03 EBC24689 40C01801 627F8326 00C6E903 75C00807 ..åu.Ö6.&..b..åa.FöŠ..Fö.-ô.|.Öü 000100
 27EBC056 898E4689 001E0508 56880646 8806568C 0446890C 468036E8 C2468800 ..FöŠ6.FÉ.Få.Vø.F..V.....Ff.VäŠ' 000120
 C674C00B 0BEB00E8 C056898E 46890016 05085688 064688D6 568CD446 89F0468D .FÞ.Få.Vø.F..V.....Ff.VäŠ.Š..åt6 000140
 478826C6 5689C446 890A5618 D8462B02 57882607 88268E5E C400EBDB 74000130 =..tÜŠ.á^/&..&.W.+FÄ.VÖ.Fá.Vö&.G 000160
 46890A56 13084603 02578826 078826CA 5689C846 890A5618 D8462806 57882604 .&.W.+FÄ.VÖ.Fà.Vö&..&.W..FÄ.VÖ.F 000180
 46800476 FFD676FF D2568900 46890A56 13084603 06578826 04478826 CE5689CC ä.Vö&.G.&.W..FÄ.VÖ.FÄ.Vø.vø.vå.F 0001A0
 DA76FF0C 76FFEE56 89EC4689 08568806 4688FF47 E908C483 003E0014 9A5016C4 á.P...>..á.ÖG..F..V..F&.VŸ.v..v. 0001C0
 5EC40A76 FF0C76FF 0EC483FA 7BE80E50 160C468D 5016F046 806277FF 26065EC4 á^.&.wb.FÞ.P.FÉ.P.Ö(ª.á..v..v.á^ 0001E0

Dump of file SATURN:[PCCOMMON.DUMP.DLL]BRDPLOW.TMP;1 on 18-APR-1990 10:38:06.00
File ID (528,44,0)   End of file block 272 / Allocated 272

Virtual block number 89 (00000059), 512 (0200) bytes

 006A006A 12C483F8 06E80EEC 76FFEE76 FF5016DC 468D5016 F0468D62 77FF2606 .&.wb.FÞ.P.FÉ.P.vŸ.v&.Ö.=.á.j.j. 000000
 0430881E 00002AC8 CBC95F5E 1F00E8C0 280AC483 01FAE80E 026AEC76 FFEE76FF .vŸ.v&j..Öª..á.+äŠ..^_èüàª...¡Ö. 000020
 006A0676 FF0876FF 01C8E980 F3880675 0C46080A 46880874 08460806 4688D88E .Ä.F..F.t..F..F.u.¡µ.Öü..v..v.j. 000040
 468801A1 E90374C0 0806350A 589A5016 FC468006 76FF0876 FF060509 C29A006A j..ô....v..v..Fø.P.X.5..åt.ÖÄ..F 000060
 F8468050 52F65689 F4468940 5788263E 478826EC 5EC4EE56 89EC4689 FE5688FC ø.Vz.F&.VŸá^&&.G>&.Wa.F¶.V-RP.F% 000080
 76FFF676 FF0A76FF 0C76FF13 7400F87E 83067F18 7C00FA7E 83029800 F09A5016 .P.Þ....-ª.|.....-%.t..v..v..v-.v 0000A0
 76FF0C76 FF157400 6A7F8326 077F1E7C 006C7F83 26EC5EC4 08C483FF 73E80EF4 ¶.Ös..á.á^&&..l.|...&..j.t..v..v 0000C0
 C388008C E9037500 0094BF83 26EC5EC4 08C483FA D0E80E66 77FF2668 77FF260A .&.wh&.wf.Öiª.á.á^&&.¢...u.Ö...û 0000E0
 5689E046 89001605 C388DC56 890A4689 002605C3 88D85689 D6468900 0605C28C .ô....Fø.VÄ.û.&..FÖ.VÉ.ü.....FÄ.V 000100
 FF0A76FF 0C76FF08 C4830556 00149AE0 76FF52DA 76FF52DE 4689008A 878826E2 &&.....FBR.vÖR.vÄ...V..á..v..v.. 000120
 76FFDE76 FF0A76FF 0C76FF0E C483F91E E80ED676 FFD876FF DA76FFDC 76FFDE76 v8.vÉ.vÖ.vÄ.vø.Ö.ª.á..v..v..v8.v 000140
 76FFFE76 FF006A00 6A12C483 F9ABE80E FC76FFFE 76FFD676 FFD876FF E076FFE2 ä.vÄ.vÄ.vø.vz.v=.Ö¨ª.á.j.j..vz.v 000160
 6A006A50 52E65689 E4468944 57882642 478826EC 5EC40AC4 83009FE8 0E016AFC =j..Ö...á.á^&&.GB&.WD.FÖ.V|RPj.j 000180
 F25688F0 46886275 C00805F5 0A589A50 16F0468D E476FFE6 76FF0744 09C29A00 ..ô.D..v|.vÖ.FÞ.P.X.%..åub.FÞ.V· 0001A0
 260A76FF 0C76FF15 7400547F 8326077F 1E7C0056 7F8326E8 5EC4EA56 89E84689 .FÖ.Vöá^Ö&..V.|...&..T.t..v..v.& 0001C0
 53060A76 FF0C76FF 0F740066 7F8326E8 5EC408C4 83F90FE8 0E5077FF 265277FF .wR&.wP.ÖÖª.á.á^Ö&..f.t..v..v..S 0001E0

Dump of file SATURN:[PCCOMMON.DUMP.DLL]BRDPLOW.TMP;1 on 18-APR-1990 10:38:06.00
File ID (528,44,0)   End of file block 272 / Allocated 272

Virtual block number 90 (0000005A), 512 (0200) bytes

 28FE48E9 8AEB08C4 83FA85E8 0EE876FF EA76FF0A 76FF0C76 FF08C483 FC94E80E .Ò.ø.á..v..v..võ.vÒ.Ò.ª.á.Š.ÖHz+ 000000
 067C0006 7E830C74 0A460808 4688088E 05CE881E 56570000 08C8C8C9 1F00E8C0 äŠ..èüà...WV.¡ö..Ä.F..F.t..-..|. 000020
 5EC4FA56 89F84689 0A568808 46880246 E9064688 026CE980 F388067E 07067E83 .-..-.¡µ.Öl..F.ÖF..F..V..F%.Vªá^ 000040
 26F85EC4 00000098 87C726F8 5EC40000 009687C7 26F85EC4 0000008A 87C726F8 %&ú.....á^%&ú.....á^%&ú.....á^%& 000060
 478826F8 5EC40000 009287C7 26F85EC4 0000008E 87C726F8 5EC40000 009487C7 ú.....á^%&ú.....á^%&ú.....á^%&.G 000080
 8DF85EC4 FE5689FC 46890016 05FA5688 F8468838 57892636 4789263C 5788263A :&.W<&.G6&.W8.F%.Vª....F=.Vzá^%. 0000A0
 08890A8E 1EF08826 7F8DFE56 88FC4688 F85EC41F A5F20008 890A8E1E F088067F ...Þ..Ö¿..·É.á^%.F=.Vz..&.Þ..Ö¿. 0000C0
 26F85EC4 72478926 74478926 F85EC46E 47892670 478926C0 28F85EC4 1FA5F200 .·É.á^%+á&.Gp&.Gná^%&.Gt&.Grá^%& 0000E0
 5EC47E47 89260080 878926F8 5EC47A47 89267C47 8926F85E C4764789 26784789 .Gx&.Gvá^%&.G|&.Gzá^%&....&.G-á^ 000100
 47C726F8 5EC4FA56 89F84689 0A568808 46880186 E9008287 89260084 878926F8 %&....&....Ö...F..V..F%.Vªá^%&úG 000120
 5EC40000 6647C726 F85EC400 006C47C7 26F85EC4 00006A47 C726F85E C4000062 b..á^%&úGj..á^%&úGl..á^%&úGf..á^ 000140
 C41FA5F2 0008890A 8E1EF088 267F8D00 3605C28C C388F85E C4000068 47C726F8 %&úGh..á^%.û.ô.6...&.Þ..Ö¿..·É.á 000160
 890A5688 08468801 18E91FA5 A5A5A5DA 8E1EF088 1E7F8D00 1605C28C C388F85E ^%.û.ô.......Þ..ÖEEEE.Ö...F..V.. 000180
 00003C47 C726F85E C400003A 47C726F8 5EC40000 3247C726 F85EC4FA 5689F846 F%.Vªá^%&úG2..á^%&úG:..á^%&úG<.. 0001A0
 0C4688F8 5EC41774 0E46080C 46880000 3647C726 F85EC400 003847C7 26F85EC4 á^%&úG8..á^%&úG6...F..F.t.á^%.F. 0001C0
 FA5689F8 46890A56 8808468B 00C0E91F A5F20008 890A8E1E F08B167F 800E5688 .V.....Þ..Ö¿..·É.Öá..F..V..F%.Vª 0001E0
```

Dump of file SATURN:[PCCOMMON.DUMP.DLL]BRDPLOW.TMP;1 on 18-APR-1990 10:38:06.00
File ID (528,44,0)   End of file block 272 / Allocated 272

Virtual block number 91 (0000005B), 512 (0200) bytes

C726F85E C4000034 47C726F8 5EC40000 3247C726 F85EC400 002C47C7 26F85EC4 á^½&úG,..á^½&úG2..á^½&úG4..á^½&ú 000000
0008B9DA 8E1EF08B 147FB00E 56880C46 8BF85EC4 17740E46 0B0C468B 00003047 GO...F..F.t.á^½.F..V.....Þ..Ö¿.. 000020
47C726F8 5EC40?00 3047C726 F85EC4FA 5689F846 890A568B 0846886F EB1FA5F2 ·Ê.Šo.F..V..F½.V°á^½&úG0..á^½&úG 000040
5EC40000 3647C726 F85EC400 003447C7 26F85EC4 00003A47 C726F85E C4000038 8..á^½&úG:..á^½&úG4..á^½&úG6..á^ 000060
14770005 3000012D 1CEB1FA5 F20008B9 DABE1EF0 8B1C7F8D 000C05C2 8CC38BF8 ½.ù.ò.......Þ..Ö¿..·Ê.$.-..=..w. 000080
000590CB C95F5E1F 00EBC02B 09050984 09290929 08BE07E2 0A38A7FF 2E93C003 .å...]8.ã./.).)...[.+äŠ..^_èù... 0000A0
00000019 07BE0002 00000014 07340002 021E0004 03A00203 00000001 06C40002 ..å...............4........7..... 0000C0
46080646 8BD88EFF FFB81E56 00000AC8 00000000 00000000 00CC0004 03330203 ..3...ä..........à...V.¡...Ä.F..F 0000E0
46FF03EB 0000FE46 C7F85689 F6468900 46050856 8B06468B 58E88DF3 B8057508 .u.¡µ.$X.F..V..F..F-.V½úF±..$..F 000100
FFFF3DFC 5689FA46 89025088 26008826 F676C402 E3C1FE5E 8B357D04 FE7E83FE ±.-±.)S.^±èO.åv-&..&.P..F°.V==.. 000120
00EBC02B C2EB08C4 83000DE8 0E0676FF 0876FFFA 76FFFC76 FF1374FF FA830575 u..°.t..v=.v°.v..v..Ò...å.Šö+äŠ. 000140
EB80F3B8 057D000C 7E830674 08460806 4688D88E 0007B81E 00000AC8 CBC95E1F .^èùà....¡...Á.F..F.t..-..).¡µ.$ 000160
C00BFFFF 08689A50 16FC468D 006A0A76 FF0C76FF 4277FF26 4477FF26 065EC46E ná^.&.wO&.wB.v..v.j..F=.P.k....å 000180
50006AFA 46894647 8B26F65E C4F85689 F64689FE 5688FC46 8848E88E 07B80574 t.¡..$H.F=.V±.F-.V½á^-&.GF.F°j.P 0001A0
76FF0676 FF0876FF FA76FF0A 76FF0C76 FF0CC483 039AE80E 0676FF08 76FF5352 RS.v..v..Ò...å..v..v..v°.v..v..v 0001C0
5EC4D88E 007AB81E 56570000 50C8CBC9 1F00EBC0 2B0EC483 000AE80E F676FFF8 ½.v-.Ò...å.+äŠ..èùàP..WV.¡z..Äá^ 0001E0

Dump of file SATURN:[PCCOMMON.DUMP.DLL]BRDPLOW.TMP;1 on 18-APR-1990 10:38:06.00
File ID (528,44,0)   End of file block 272 / Allocated 272

Virtual block number 92 (0000005C), 512 (0200) bytes

26FA5689 F8468900 1605C28C C38D0656 89D44689 005E0504 57882602 4788260A .&.G.&.W..^..Få.V=.û.ô....F½.V°& 000000
16D2568C D04689C0 468DEE56 8CEC4689 DC468D82 56898046 89445788 26424788 .GB&.WD.F¯.Vý.FÊ.F&.VŸ.Få.FÅ.V0. 000020
FF0C76FF 0676FF08 76FF0E76 FF016A08 C48301FB 1A339A06 76FF0876 FFEC76FF .v&.v..v..3.«..å.j..v..v..v..v.. 000040
05125688 10468801 D300F09A 50168C46 8D8076FF 8276FF0C C4830300 E80E0A76 v..Ò...å..vý.v¯.F¥.P.Þ.£..F..V.. 000060
037EF656 398E5688 8C468800 F6568301 F4468308 E8F65689 F4468900 D2830001 ...0..F¶.V-Š..F¶..V-..F¥.V/9V--. 000080
5016D846 8D006AF4 76FFF676 FFB076FF 8276FF01 6EE90372 F4463908 7C0178E9 Õx.|.9F¶r.Õn..vý.v¯.v-.v¶j..FÁ.P 0000A0
0138E903 74464739 260E4688 FC5EC4FE 5689FC46 890A5688 D8468800 AC0869A .k.¯..FÁ.VÖ.F=.V±á^=.F.£9GFt.Õ;. 0000C0
02578826 07882604 5EC40096 E90E4688 08C48302 E91A339A 53060076 FFD276FF .v0.vÅ.S.3.Õ..å..F.Õ..á^å&..&.W. 0000E0
08F25689 F0468902 57182607 2826005E C40A5713 26084703 26EC5EC4 D2D1E0D1 1Á10á^$&.G.&.W.á^Å&+.&.W..FÞ.V·. 000100
C466E8B8 46898A46 89C028B6 56898446 89F2568B F046B814 74C00804 7F1A7CD2 0|....ât..FÞ.V·.FÇ.VÑ+å.F¤.F¡Šfá 000120
04472B26 D05EC40E 5713260C 470326EC 5EC4D2D1 E0D10657 88260447 8826D45E ^Å&.G.&.W.1Á10á^$&.G.&.W.á^Å&+G. 000140
88F0468B 84468986 4689C028 1474C008 047F1A7C D208F256 89F04689 06571826 &.W..FÞ.V·.0|....ât.+å.FÑ.FÇ.FÞ. 000160
083DA174 00043OFF 50E9037F 00023014 7C000130 19EB1BEB 8A5689B8 4689F256 V·.F¡.V¤Š.Š.=..|.=....Õ].=..tÅ=. 000180
FFFE76FF 006A006A 50168446 8D287400 F07E8306 7F337C00 F27E8300 EB9C7400 .t.Š..-·.|3...-Þ.t+.FÇ.Pj.j..v±. 0001A0
016A08C4 83FFFF1A 339AFC76 FFFE76FF D076FFD2 76FF0CC4 83FFFF08 879AFC76 v=......å..v0.vÅ.v±.v=.3....å.j. 0001C0
89064689 FE5688FC 46880CC4 830173E8 0E0A76FF 0C76FFFC 76FFFE76 FF0E76FF .v..v±.v=.v..v..Õs..å..F=.V±.F.. 0001E0

Dump of file SATU.N:[PCCOMMON.DUMP.DLL]BRDPLOW.TMP;1 on 18-APR-1990 10:38:06.00
File ID (528,44,0)   End of file block 272 / Allocated 272

Virtual block number 93 (0000005D), 512 (0200) bytes

CBC95F5E 1FFE72E9 1FA5F200 08890A8E 1EF088FB 88D2568B D04688EC 5EC40856 V.á^&.FÅ.V0.«.Þ..Ö¿...Ê.Ôr±.^_èù 000000
0674010A 7E83FE56 89FC4689 00160508 56880646 88D88E01 0A881E56 00000CC8 à...V.¡...Ä.F..V.....F=.V±.-..t. 000020
2B26FC5E C40E568B 0C468800 00FA46C7 0002F846 C762EB10 46887475 020A7E83 .-..ut.F.ŠbúF½..úF°...F..V.á^=&+ 000040
C70003F8 46C73EEB 02578926 0789260E 56880C46 88F65689 F4468902 57182607 .&.W..F¶.V-.F..V.&..&.W.Š>úF½..ú 000060
56880C46 88F65689 F446890A 57182608 472B26FC 5EC40E56 880C468B 0000FA46 F°...F..V.á^=&+G.&.W..F¶.V-.F..V 000080
2B62EB10 46B872EB 00EBC474 0001309A 74C0080B EB0DEB0A 57892608 4789260E .&.G.&.W.Š.Š..ât.=..tåŠ.Šr.F.Šb+ 0000A0
4688F656 89F44689 06571B26 04472B26 FC5EC40E 56880C46 88F84689 FA4689C0 å.F°.F½.F..V.á^=&+G.&.W..F¶.V-.F 0000C0
5EC40E56 880C468B 0000FA46 C70001F8 46C73EEB 06578926 04478926 0E56880C ..V.&.G.&.W.Š>úF½..úF°...F..V.á^ 0000E0
EB0DEB0E 5789260C 4789260E 56880C46 88F65689 F446890E 5718260C 472B26FC =&+G.&.W..F¶.V-.F..V.&.G.&.W.Š.Š 000100
26065EC4 02E6C1F8 76880001 009487C7 26065EC4 00EBC474 0001309A 74C0080B ..ât.=..tåŠ.á^.&ú......V½ê!.á^.& 000120
8306E8E8 0E5306FF 76FFFA76 FFF476FF F676FF15 74FF4878 83260775 FF467883 .xF.u.&.xH.t..v-.v¶.v°.v½.S.ÒÒ.. 000140
46890056 0504578B 2602478B 26065EC4 D88E0337 881E0000 2AC8CBC9 5E1F0CC4 å..^èùà°...¡7..Äá^.&.G.&.W..V..F 000160
FF0C76FF 5016F256 8CF04689 E0468DFA 5689F846 89001605 C28CC38B F65689F4 ¶.V-.ù.ò....F½.V°.FÅ.FÞ.V·.P.v.. 000180
57882608 47882 6F0 5EC4017D E90E4688 0381E910 468808C4 83015C1A 339A0A76 v..3.\..á..F.Õ...F.Õ).á^Þ&.G.&.W 0001A0
260277FF 26F45EC4 DC56890A 46890A57 88260847 8826F85E C4085689 D646890A ..F0.VAá^½&.G.&.W..FÖ.VÉá^¶&.w.& 0001C0
88D6468B 0874C008 C02B02EB 00018805 75000805 2401309A D676FFD8 76FF37FF .7.vÁ.v0.O.$..Åu.¡..Š.+å.ât..F0. 0001E0

```
Dump of file SATURN:[PCCOMMON.DUMP.DLL]BRDPLOW.TMP;1 on 18-APR-1990 10:38:06.00
File ID (528,44,0)   End of file block 272 / Allocated 272

Virtual block number 94 (0000005E), 512 (0200) bytes

                                                                         VÄSDá^¶&.w.&.7.^ø.¢...á^¶.û.1..û 000000
C79A0531 02C39AF4 5EC4052C 02BF9AD6 5EBD37FF 260277FF 26F45EC4 44EBD856 .;..&..É.ÿ.ə..ö.J..á..Ä.V.O..Î.V 000020
5604A69A 054F0256 9AD88808 C483054A 07CE9A05 4003EF9A DC8808EC 83053806 .RP.=.ñ..F=.V±.FÖ.VÉ9F=u.9V±u.á^ 000040
5EC41075 FE563915 75FC4639 DC5688DA 4688FE56 89FC4689 058700FC 9A505205 ¶&..&.W..F=.V±ÕÄ.á^Þ&.G.&.W..Fø. 000060
89064689 0E578826 0C478826 F05EC400 E1E9FE56 11FC4601 02578826 078826F4 VÄá^½&.G.&.W..FÖ.VÉá^¶&.w.&.w..v 000080
76FF0477 FF260677 FF26F45E C4DC5689 DA46890E 5788260C 478826F8 5EC40856 Ä.vø.O.ø..Äu.¡..Š.+à.åt..Fø.VÄŠH 0000A0
48E80856 88064688 0874C008 C02802E8 0001B805 75000805 D601309A D676FFD8 .^ø.¢.Ä.á^¶._..û.Î..ú.Þ..&..É.ÿ. 0000C0
03EF9ADC 8808EC83 05F006C7 9A05E602 C39A045F 8DF45EC4 05E1028F 9AD65E8D %..ö....á..Ä¯V....Î...RPá^¶&.w.& 0000E0
260677FF 26F45EC4 50520616 04A69A06 0402569A D88808C4 8305FF07 CE9A05F5 .w..•....F=.V±.FÖ.VÉ9F=u.9V±u.á^ 000100
5EC41175 FE56391. 75FC4639 0C5688DA 4688FE56 89FC4689 FFFF00FC 9A0477FF ¶&.G.&.W..F=.V±$1Š.=..|.=....Õv± 000120
FE76E903 7F00023ʟ 1A7C0001 301FEB21 EBFE5611 FC460106 57882604 478826F4 =..u.Õ).=..u.Õ1.Š..FÖ.VÉ9V±|...9 000140
39057F0C 7CFE5639 DC5688DA 468800EB FF21E903 75000830 FF29E903 75000430 F=v.¡..Š.+à.FBÕ1..F.Õ(.á^Þ&..&.W 000160
57882607 8826F05E C4017BE9 0E468801 D1E90E46 89C02802 EB000188 0576FC46 ..Fø.VÄá^½&..&.W..FÖ.VÉá^¶&.w.&. 000180
FF260277 FF26F45E C4DC5689 DA468902 57882607 8826F85E C4085689 D6468902 7.vÄ.vø.O.D..Äu.¡..Š.+à.åt..Fø.V 0001A0
5688D646 880874C0 08C02802 EB000188 0575D008 06E30130 9AD676FF D876FF37 ÄŠDá^¶&.w.&.7.^ø.¢.Š.á^¶.û.Þ..û. 0001C0
06C79A06 F002C39A F45EC406 EB028F9A D65E8D37 FF260277 FF26F45E C444EBD8 •..&..É.ÿ..../....á..Ä.V....Î... 0001E0
071504A6 9A070E02 569AD888 08C48307 0907BE9A 06FF03EF 9ADC8808 EC8306FA

Dump of file SATURN:[PCCOMMON.DUMP.DLL]BRDPLOW.TMP;1 on 18-APR-1990 10:38:06.00
File ID (528,44,0)   End of file block 272 / Allocated 272

Virtual block number 95 (0000005F), 512 (0200) bytes

                                                                         RP.=.v..F=.V±.FÖ.VÉ9F=u.9V±u.á^¶ 000000
F45EC410 75FE5639 1575FC46 39DC5688 DA4688FE 5689FC46 89077600 FC9A5052 &..&.W.)F=.V±ÕÄ.á^Þ&.G.&.W..Fø.V 000020
56890646 89065788 26044788 26F05EC4 00E1E9FE 5619FC46 29025788 26078826 Äá^½&.G.&.W..FÖ.VÉá^¶&.w.&.w..vÄ 000040
D876FF04 77FF2606 77FF26F4 5EC40C56 890A4689 06578826 04478826 F85EC4D8 .vø.O....Äu.¡..Š.+à.åt..Fø.VÄŠH. 000060
8D48E8D8 5688D646 880874C0 08C02802 EB000188 05750008 07950130 9AD676FF ^ø.¢...á^¶._..ú.É..ú.É..&..É.ÿ.Ç 000080
8403EF9A DC8808EC F307AF06 C79A07A5 02C39A04 5F8DF45E C407A002 8F9AD65E ../.ƒ..á..Ä.V.ü..Î.1.RPá^¶&.w.&. 0000A0
FF260677 FF26F45E C4505207 D504A69A 07C30256 9AD88808 C48307BE 07BE9A07 w..=.«..F=.V±.FÖ.VÉ9F=u.9V±u.á^¶ 0000C0
F45EC411 75FE5639 1675FC46 39DC5688 DA4688FE 5689FC46 8904F800 FC9A0477 &.G.&.W.)F=.V±$1Š.=..|.=....Õx±= 0000E0
30FE78E9 037F0002 3D1A7C00 013D1FEB 21EBFE56 19FC4629 06578826 04478826 ..u.Õ).=..u.Õ1.Š..FÖ.VÉ9V±..|.9F 000100
4639057C 0C7FFE56 39DC5688 DA468800 EBFF21E9 03750008 3DFF29E9 03750004 •s.¡..Š.+à.FB$.Š..åu.Õ9±=..u.Õp= 000120
FC70E903 75000130 FE39E903 75C00811 EB13EBDE 4689C028 02E80001 B80573FC Š..~B.t..v..v±.vø.v..v..v..Òò•.á 000140
C483FAC2 E80E0676 FF0876FF 0E76FFFC 76FFFE76 FF1076FF 197400DE 7E8300EB .+åŠ..èùà....¡|..Ä.F..F.t..F..F. 000160
0C46080A 46881074 08460806 4688088E 047C881E 000012C8 C8C91F00 EBC0280C t..F..F.u.+àÕ0.á^.&.GF.F·.û.ò... 000180
001605C2 8CC388F2 46894647 8826065E C40130E9 C0280575 1046080E 46880874 .FŸ.VÞ&.G.&.W..F½.Vª.^..F¶.V-&.. 0001A0
7F8326F6 5689F446 89005E05 FA5689F8 46890857 88260647 8826F056 89EE4689 f.t.&..F.uvá^.&..&.W.á^¶&..&.W.. 0001C0
89025713 26070326 F45EC402 57882607 88260A5E C4767502 467F8326 07740146 F=.V±á^Ÿ&9W.|7..&9.rOá^.&.G.&.W. 0001E0
0A578826 08478826 0A5EC430 72073926 057F377C 02573926 EE5EC4FE 5689FC46

Dump of file SATURN:[PCCOMMON.DUMP.DLL]BRDPLOW.TMP;1 on 18-APR-1990 10:38:06.00
File ID (528,44,0)   End of file block 272 / Allocated 272

Virtual block number 96 (00000060), 512 (0200) bytes

                                                                         á^¶&+.&.W..F=.V±á^Ÿ&9W...|.&9.w. 000000
05770739 26057C0C 7F025739 26EE5EC4 FE5689FC 46890257 1826072B 26F45EC4 +àÕ...F=.V±á^Ÿ&+.&.W.á^.&..&.W.$ 000020
E8025711 26070126 0E5EC402 57182607 2B26EE5E C4FE5688 FC468800 9AE9C02B z±^.&.G.&.W.á^¶&.G.&.W..F=.V±á^Ÿ 000040
EE5EC4FE 5689FC46 89065713 26044703 26F45EC4 06578826 04478826 0A5EC47A &9W.|9..&9G.r1á^.&.G.&.W.á^¶&+G. 000060
04472826 F45EC40E 5788260C 4788260A 5EC43172 04473926 067F397C 06573926 &.W..F=.V±á^Ÿ&9W...|.&9G.w.+àŠ . 000080
8820EBC0 28047704 47392606 7C0C7F06 573926EE 5EC4FE56 89FC4689 06571826 F=.V±á^Ÿ&+G.&.W.á^.&.G.&.W.+àŠ.. 0000A0
1F00EBC0 28065711 26044701 260E5EC4 06571826 04472826 EE5EC4FE 5688FC46 èùà....|-..Ä.F..F.t..F..F.t..F.. 0000C0
080E4688 08740C46 080A4688 10740846 08064688 D88E087E 881E0000 1CC8C8C9 F.u.¡м.Õz.á^.&.GB&.WD.FÕ.VÎRP.F¶ 0000E0
F4468D50 52E65689 E4468944 57882642 47882606 5EC4015A E98DF388 06751046 .P.Þ.W.+ò.F±.F=Š..F=..V±..F¶.V-9 000100
39F65688 F4468800 FE568301 FC468308 EBFC4689 FE4689C0 280A5700 F09A5016 V±-.Õ..|.9F=r.Õ...v|.vÕ.v±.vej.. 000120
8D006AFC 76FFFE76 FFE476FF E676FF01 0FE90372 FC463908 7C0119E9 037EFE56 F½.P.k....F½.Vª.FÖ.Võ+á..FÞ.V·.F 000140
4689F256 89F04689 99C02BEA 5689E846 89FA5688 F8468801 8708689A 5016F846 &.VŸá^Õ&.GFŠxá^.&.G.&.W.á^.&+G.& 000160
260C472B 260A5EC4 0E578826 0C478826 0E5EC478 E8464788 26E85EC4 EE.. 89EC .W..FÞ.V·Šsá^.&.G.&.W.á^.&+G.&.W 000180
57182604 472B260A 5EC40657 88260447 88260E5E C473EBF2 5611F046 010E  71B ..FÞ.V·ŠUá^.&.G.&.W.á^.&+G.&.W.. 0001A0
010A5718 2608472B 260A5EC4 0A578826 08478826 0E5EC455 EBF25611 F0460 06 F&.VŸŠ7á^.&..&.W.á^.&+.&.W..F&.V 0001C0
5611EC46 01025718 26072B26 0A5EC402 57882607 88260E5E C437EBEE 5611EC46 ŸŠ.Š.=..tÀ=..u.Õ(.=..tÀ=..tÙŠ..F 0001E0
468000E8 AD740008 30007400 0430FF78 E9037500 023DA174 00013019 EB1BEBEE
```

```
Dump of file SATURN:[PCCOMMON.DUMP.DLL]BRDPLOW.TMP;1 on 18-APR-1990 10:38:06.00
File ID (528,44, )   End of file block 272 / Allocated 272

Virtual block number 97 (00000061), 512 (0200) bytes

 46880875 EE4608EC 46880CC4 83FD55E8 0EE876FF EA76FF0E 76FF1076 FF5016EC &.P.v..v..võ.vÒ.ÒU».á..F&.FŸu..F 000000
 FED1E90C C48302D5 08879AE8 76FFEA76 FF006A00 6A5016EC 468D1774 F24608F0 Þ.F·t..F&.Pj.j..võ.vÒ...f..á.Òl± 000020
 0A7C000C 7E831774 08460806 4688D88E 09D8881E 5600001E C8C8C91F 00E8C028 +áŠ..èùà...V.¡Á..Ä.F..F.t..-..|. 000040
 0A768800 F0E9C028 05751046 080E4688 00FDE98D F3880676 030A7E83 067F0E7C |....-..v.¡µ.Ò»..F..F.u.+éÒÞ..v. 000060
 C0280575 FFFA830A 75FFFF30 FE5689FC 46894850 88264640 8826065E C402E6C1 èl.á^.&.ƏF&.PH.F=.V±=..u..ª.u.+á 000080
 EA4689F0 5689EE46 8999C028 F2468901 82878826 2828068E E3010A5E 8800CAE9 Õò..^.1D..((&.....F·+á..FŸ.VÞ.Fõ 0000A0
 0E46880C EBF05689 EE468910 56880E46 880E7502 F27E8306 7401F27E 83EC5689 .V&.~·.t..~·.u..F..V..FŸ.VÞŠ..F. 0000C0
 16F4468D 5052E456 89E24689 44578826 42478826 065EC4EC 5689EA46 8910568B .V..Fõ.V&á^.&.GB&.WD.Fã.VÕRP.F¶. 0000E0
 FC463905 7C4E7FFE 5639F656 88F44688 00FE5683 01FC4683 08EB0C48 00F09A50 P.Þ.N.Š..F•..V±..F¶.V-9V±.N|.9F• 000100
 FA5688F8 46880A15 08689A50 16F8468D 006AFC76 FFFE76FF E276FFE4 76FF4773 ±G.võ.vã.v±.v•j..F½.P.k....F½.Vª 000120
 9A530600 6A006A50 16EA468D 15E80274 46473926 F24688E6 5EC4E856 89E64689 .Fl.VÒá^l.F·&9GFt.Š..Fõ.Pj.j..S. 000140
 46080646 88D88E08 5E881E00 002CC8C8 C95E1F00 E8C02B9F E80CC483 08480887 ..H..á.Š.+áŠ..^èùà,...¡^..Ä.F..F 000160
 39E9C028 05730154 7F832607 7C0E7F00 587F8326 065EC402 51E98DF3 88067508 .u.¡µ.ÒQ.á^.&..X...|.&..V.s.+éÒ9 000180
 44578826 42478826 E65689E4 4689005E 05EA5689 E8468904 57882602 47882602 .&.G.&.W..FÒ.Võ.^..Fõ.Vl&.GB&.WD 0001A0
 89C02800 2000F09A 5016E046 8D0476FF 52FA568C F84689F0 46800656 89044689 .Fâ.V•.FÞ.F½.VªR.vâ.FÁ.P.Þ.-.+á. 0001C0
 39087C01 D9E9037E FE5639E2 5688E046 8800FE56 8301FC46 8308E8FC 4689FE46 F±.F•Š..F=..V±..FÁ.Vã9V±~.Òl.|.9 0001E0
```

```
Dump of file SATURN:[PCCOMMON.DUMP.DLL]BRDPLOW.TMP;1 on 18-APR-1990 10:38:06.00
File ID (528,44,0)   End of file block 272 / Allocated 272

Virtual block number 98 (00000062), 512 (0200) bytes

 880C1408 689A5016 EC468D00 6AFC76FF FE76FFD4 76FF0676 FF01CFE9 0372FC46 F•r.Òü..v•.vâ.v±.v•j..F&.P.k.... 000000
 C388A9E8 02750062 7F832609 7500687F 83260C5E C4DE5689 DC4689EE 5688EC46 F&.VŸ.FÉ.Vèá^É&..h.u.&..b.u.Š`.û 000020
 9A37FF26 0277FF26 D85EC437 FF260277 FF26E45E C4DA5689 D8468900 1605C28C .ô....FÁ.VÒá^Ò&.w.&.7á^Á&.w.&.7. 000040
 C440E802 57882607 8826085E C40C74C0 D8C02802 E80001B8 0575000B 0D9F0130 0....Âu.¡..Š.+á.át.á^Á&..&.W.ŠMá 000060
 1E8D00B5 06C79A0D AC02C39A E45EC40D A702C39A D85EC437 FF260277 FF26E45E ^Ò&.w.&.7á^Á.û.Ï.á^ô.û.¯..û.ç... 000080
 0D030256 9AD88808 C48300CE 07BE9A00 C403EF9A DC8808EC 83008F06 999A282A *(...¢..&..É.ÿ.á../.ö..á..Ä.V.Æ. 0000A0
 77FF2606 77FF26E4 5EC40257 89260789 26F85EC4 0DFF00FC 9A505200 DA04A69A .Ï.Ö.RP.•...á^½&..&.W.á^Ò&.w.&.w 0000C0
 0D74C008 C02802E8 00018805 7500080E 2601309A 0477FF26 0677FF26 D85EC404 .á^Á&.w.&.w..0.&..Âu.¡..Š.+á.át. 0000E0
 C39A045F 8DE45EC4 0E3102C3 9A045F8D D85EC454 E8065788 26044788 26085EC4 á^Á&.G.&.W.ŠTá^Ä._..û.1.á^ô._..û 000100
 0E5807BE 9A0E4E03 EF9ADC88 08EC830E 4906999A 282A1E8D 0E3F06C7 9A0E3602 .ó..û.?...*(...l.¯&..É.ÿ.N..7.X. 000120
 BA00FC9A 0477FF26 0677FF26 E45EC450 520E6F04 A69A0E5D 02569AD8 8808C483 .á..Á.V.}..Ï.o.RPá^Ò&.w.&.w..•.¤ 000140
 39262075 07392608 5EC40257 88260788 26F85EC4 06578926 04478926 F85EC406 .á^½&.G.&.W.á^½&..&.W.á^Á&9.u &9 000160
 006A2C74 06573926 06750447 3926085E C4065788 26044788 26F85EC4 1A750257 W.u.á^½&.G.&.W.á^Á&9G.u.&9W.t,j. 000180
 FF0876FF EC76FFEE 76FF0CC4 830C7208 879ADC76 FFDE76FF F876FFFA 76FF006A j..vª.v½.vB.vÉ...r..á..vŸ.v&.v.. 0001A0
 000690CB C91F00EB C02BFE11 E9000068 47C7260C 5EC408C4 83FFFF16 4E9A0676 v..N....á.á^É&úGh..Ò.±+áŠ..èù... 0001C0
 00000014 0CEB0002 00000009 04B50002 00000004 0EC10002 00000002 0ED50002 ..l.......ê.......ç.......Š..... 0001E0
```

```
Dump of file SATURN:[PCCOMMON.DUMP.DLL]BRDPLOW.TMP;1 on 18-APR-1990 10:38:06.00
File ID (528,44,0)   End of file block 272 / Allocated 272

Virtual block number 99 (00000063), 512 (0200) bytes

 00067E83 D88EFFFF B81E5657 000014C8 00000019 0C870002 00000017 007 0002 ..r.............à...WV.¡...Ä.-.. 000000
 000C7E83 40E80275 14460812 46880874 1046080E 46881074 0A460808 4686 874 t..F..F.t..F..F.t..F..F.u.ŠM.-.. 000020
 006A1676 FF1876FF 1FA5F200 0889DA8E 1E0716F0 88F07E8D 1056880E 46881675 u..F..V..-Þ.Þ....Ò¿...È..v..v.j. 000040
 0876FF0A 76FF5052 D28CEE56 8CEC4689 F04680D0 EB99C028 0574000C 7E83006A j..~..t.+â.Š..FÞ.F&.VŸ.@RP.v..v. 000060
 7F83260A 5EC4088E 0008881E 56570000 04C8C8C9 5F5E1F12 C483125E FF0676FF .v..^..á..^ èùà...WV.¡...Äá^.&.. 000080
 76FF5052 12740018 7F8326FE 5689FC46 89000805 C28CC388 49E8C028 0475001A ..u.+âŠl.ü.Ò....F=.V±&....t.RP.v 0000A0
 0889DA8E 1EF088F8 88085688 064688FC 5EC41FE8 08C483FF FF00149A 0676FF08 ..v.......á.Š.á^=.F..V..«.Þ..Ò¿. 0000C0
 8E008688 1E560000 32C8CBC9 5F5E1F00 E8C02800 011847C7 260A5EC4 1FA5F200 .·È.á^.&úG...+âŠ..^ èùà2..V.¡... 0000E0
 88064688 000BE907 8826065E C4FE568C FC4689EC 4680E656 8CE44689 D44680D8 Ä.Fá.Fõ.Vl.F&.F=.V±Ï^.&..ÒU..F.. 000100
 0000FFFF 9AE476FF E676FF01 6A0677FF 260877FF 26CE5EC4 D05689CE 46890856 V..Fö.VÁá^ö&.w.&.w.j..vl.võ..... 000120
 5088260A 408826CE 5EC402E6 C1D27688 407F01D2 7E830246 FF03E800 000246C7 úF@..Š..F@.~@..ə.v@èl.á^ö&.ə.&.P 000140
 E476FFE6 76FFFFFF 06489AFC 76FFFE76 FF50EA76 FF2374D0 08EA5689 E846890C ..FÒ.Võ.Ât#.võP.v±.v=.K....vl.võ 000160
 5EC4D056 89CE4689 08568806 468879E8 87E808C4 83008700 149AFC76 FFFE76FF .v±.v•...ñ..á.Šñ$y.F..V..Fö.VÁá^ 000180
 5788260A 478826CE 5EC40000 FFFF9AE4 76FFE676 FF016A06 77FF2608 77FF26CE ö&.w.&.w.j..vl.võ.....á^ö&.G.&.W 0001A0
 E476FFE6 76FF0168 06489AFC 76FFFE76 FF50EA76 FF2374D0 08EA5689 E846890C ..FÒ.Võ.Ât#.võP.v±.v•.K.h..vl.võ 0001C0
 7F00043D F47C0003 3D14E82D E88E0388 1BE808C4 83017900 149AFC76 FFFE76FF .v±.v•...y..á.Š.¡..Š·Š.=..|¶=... 0001E0
```

```
Dump of file SATURN:[PCCOMMON.DUMP.DLL]BRDPLOW.TMP;1 on 18-APR-1990 10:38:06.00
File ID (528,44,0)   End of file block 272 / Allocated 272

Virtual block number 100 (00000064), 512 (0200) bytes

C02B08C4 83FE73F8 0EE476FF E676FF0A 76FF0C76 FFE5E889 74000530 FF18E903 .Õ..=..t.$l.v..v..vl.vð.Ðs±.á.+à 000000
05750C46 080A4688 08740846 08064688 D88E00ED 881E0000 48C8C8C9 5E1F00EB $..^èùàH...¡Ú..Ä.F..F.t..F..F.u. 000020
E0468906 578B2604 478B26C6 5689C446 89025788 26078826 0A5EC402 12E9C02B +àÕ..á^.&..&.W..Fá.Vô&.G.&.W..FÁ 000040
FF027D09 C29A006A 006A5052 DE5689DC 46891A57 88261847 8826065E C4E25689 .Vãá^.&.G.&.W..FÉ.VBRPj.j..ð.).. 000060
88017EE9 078B268C 5EC401A6 E90374C0 08FFFF0A 589A5016 8C4680DC 76FFDE76 v8.vÉ.F¥.P.X....åt.Ðl.á^¥&..Ô-.. 000080
FF0C76FF 2C740000 8C8F8326 C85EC4CA 5689C846 89E65689 E44689BE 5688BC46 F¥.V/.Fô.Vl.Fà.Vôá^à&.¢...t,.v.. 0000A0
E476FFE6 76FFC476 FFC676FF E076FFE2 76FF08C4 83FDC3E8 0E505200 16050A76 v....RP.Ðù».á..vã.vÁ.vó.vá.vl.vð 0000C0
C05EC4C2 5689C046 89DA5689 D84689BE 5688BC46 88014EE9 0CC483FF FF11009A ......á.ÕN..F¥.V/.FÄ.VÖ.Fá.Vôá^à 0000E0
E80E5016 EC46800A 76FF0C76 FF01C806 4B9A5016 EC468050 52387400 647F8326 &..d.t8RP.Fâ.P.K.à..v..v..Fâ.P.Õ 000100
E90CC483 FFFF0000 9AD876FF DA76FFC4 76FFC676 FFE076FF E276FF08 C483FD6C l».á..vã.vÁ.vó.vá.vÖ.vÄ......á.Õ 000120
76FF2974 00347F83 26885EC4 8A568988 46890656 89D44689 8E5688BC 468800F7 %..F¥.V/.Fâ.V».F¦.Vôá^¦&..4.t).v 000140
9ABC76FF 8E76FFC4 76FFC676 FFE076FF E276FF08 C483FD8C E80E5052 0A76FF0C ..v.RP.Ò.».á..vã.vÁ.vó.vá.v/.v¥. 000160
26E85EC4 EA5689E8 4689CE56 89CC4689 8E5688BC 468800AF E90CC483 FF°FF00E7 Ó....á.ÕÉ..F¥.V/.Fá.Vö.FÒ.Vôá^Ò& 000180
76FFC676 FFE076FF E276FF08 C483FD44 E80E5052 0A76FF0C 76FF2974 002E^F83 ....t).v..v.RP.ÒD».á..vã.vÁ.vó.v 0001A0
FC46890Z 56890046 898E5688 8C468868 E80CC483 FFFF0575 9ABC76FF 8E76F C4 á.v/.v¥.u....á.Sh.F¥.V/.FÁ.V0.F» 0001C0
FF08C483 FC92E80E 5052000C 050A76FF 0C76FF2C 7400327F 8326FC5E C4FE5689 .V±á^»&..2.t,.v..v....RP.Ò.».á.. 0001E0

Dump of file SATURN:[PCCOMMON.DUMP.DLL]BRDPLOW.TMP;1 on 18-APR-1990 10:38:06.00
File ID (528,44,0)   End of file block 272 / Allocated 272

Virtual block number 101 (00000065), 512 (0200) bytes

00012D1C EB1EEB0C C483FFFF 09CF9ABC 76FFBE76 FFC476FF C676FFE0 76FFE276 vã.vÁ.vó.vá.v/.v¥.Ü....á.$.$.-.. 000000
FFDE76FF FE43E903 C1037A03 32033202 DB028F04 1DA7FF2E 93C00314 77000530 »..w..â...l....Û.2.2.z.è.ÕC±.vB. 000020
1E560000 10C8CBC9 1F00EBC0 2BE9EB02 75C00802 6D05D09A 016A006A 006ADC76 vÉj.j.j..Ã.m..âu.$Õ+à$..èùà...V. 000040
8B26065E C40091E9 8DF38806 750C4606 0A468808 74084608 06468808 8E021C88 ¡...Å.F..F.t..F..F.u.¡µ.Õ..á^.&. 000060
76FF52FA 4689FC46 89C028FE 46890788 260A5EC4 F85689F6 46891A57 88261847 G.&.W..F-.V½á^.&...F±+â.F».F°R.v 000080
26F05EC4 2875C00B 04ED0A58 9A5016F0 468DF676 FFF876FF 04A609C2 9A5050F6 -PP.ô.Ï..v½.v-.Fþ.P.X.Ú..âu(á^Þ& 0000A0
568301FA 46830AE8 027D0338 87390338 848BE601 F08BE301 FE5E88F4 46890788 ...F¶.^±lD.þll..8.9.8.).$..F°..V 0000C0
08043B02 909A0A76 FF0C76FF 016A006A FA76FFFC 76FFF676 FFF876FF C4EB00FC ».$á.v½.v-.v».v°j.j..v..v....;.. 0000E0
000202D3 00020000 00010109 00020008 CBC95E1F 00EBC02B 04EB8E07 880574C0 ât.¡..$.+â$..^èù....l.......ê... 000100
0007038A 00020000 00050372 00020000 0004032A 00020000 00030301 00020000 ............*........r.......¤... 000120
00190451 00020000 00140496 0002021E 000401A2 02030000 00080404 00020000 ............Ä................Q... 000140
082A4688 088EFFFF 881E5657 00003EC8 00000000 000000CC 0004012C 02030000 ........ë........â>..WV.¡...Á.F*. 000160
2A76FF2C 76FF02E0 E98DF388 06752046 081E4688 08742846 08264688 10742C46 F,t..F&.F(t..F..F u.¡µ.ÕÁ..v,.v* 000180
028AE980 F1880675 0008E656 89E44689 FA5688F8 46880000 FFFF9A50 16F84680 .F½.P......F½.V°.Fô.Vl.Âu.¡þ.Ðo. 0001A0
265EC400 00FFFF9A 5016E846 8D2A76FF 2C76FFA5 F2000EB9 07160348 8EC27E8D .-ô/H...¿...È.v,.v*.FÒ.P.....á^& 0001C0
7C347F02 573926F2 5688F046 88407207 3926057F 477C0257 3926EA56 88E84688 .FÒ.Vô&9W.|G..&9.rª.Fþ.V·&9W..4| 0001E0

Dump of file SATURN:[PCCOMMON.DUMP.DLL]BRDPLOW.TMP;1 on 18-APR-1990 10:38:06.00
File ID (528,44,0)   End of file block 272 / Allocated 272

Virtual block number 102 (00000066), 512 (0200) bytes

F6568BF4 46881972 04473926 067F217C 06573926 EE5688EC 46882D77 07392605 .&9.w-.F$.V¥&9W.||..&9G.r..F¶.V- 000000
88E44688 0186E903 75C008C0 2802EB00 01880577 04473926 067C007F 06573926 &9W...|.&9G.w.¡..$.+á.âu.ÕÑ..Fô. 000020
06DE46C7 FE5689FC 46890A57 88260847 8826E45E C4E25689 E0468900 7805E656 Vl.x..FÁ.Vãá^Ò&.G.&.W..F».V±ÚF8. 000040
22468801 36E90788 26E05EC4 0171E903 75C008DE 4EFFDE46 8802E046 8304E800 .$..FÁ..F8.N8.âu.Õq.á^Å&..Õó..F" 000060
FC76FFFE 76FF2676 FF2876FF 5016C246 8D1F7400 08036A16 23036806 23245688 .V$#.h.#.j..Åt..Fô.P.v(.v&.v±.v» 000080
08036E16 23036C06 23245688 22468801 31E90144 E90374C0 080CC483 0CDAE80E .ÒÒ..á..ât.ÒD.Õ1..F".V$#.l.#.n.. 0000A0
E90374C0 080CC483 0FD4E80E FC76FFFE 76FF2676 FF2876FF 5016C246 8D1F7400 Åt..Fô.P.v(.v&.v±.v».ÕÅ..á..ât.Õ 0000C0
FF2876FF 5016C246 8D1F7400 08037216 23037006 23245688 22468800 FDE90110 ..Õ»..F".V$#.p.#.r..Åt..Fô.P.v(. 0000E0
23245688 22468800 C9E9000C E90374C0 080CC483 11ACE80E FC76FFFE 76FF2676 v&.v±.v».Õ¯..á..ât.ÕÉ.Õè..F".V$# 000100
1284E80E FC76FFFE 76FF2676 FF2876FF 5016C246 8D1F7400 08037616 23037406 .t.#.v..Åt..Fô.P.v(.v&.v±.v».ÕÇ. 000120
8D1E74D0 08037A16 23037806 23245688 22468800 95E900A8 E90374C0 080CC483 .á..ât.Õ´.Õ...F".V$#.x.#.z..Åt.. 000140
8B63E875 E80274C0 080CC483 138CE80E FC76FFFE 76FF2676 FF2876FF 5016C246 Fô.P.v(.v&.v±.v».Õ¥..á..ât.$u$c. 000160
FFFE76FF 2676FF28 76FF5016 C2468D1E 74D00803 7E162303 7C062324 56882246 F".V$#.|.#.-..Åt..Fô.P.v(.v&.v±. 000180
03750002 30FEC2E9 03750001 3D2FE831 E843EB02 74C0080C C4831680 E80EFC76 v».Õ...â..ât.$C$1$/=..u.Õó±=..u. 0001A0
9F740006 30FF72E9 03750005 3DFF46E9 03750004 30FF1AE9 03750003 3DFEEEE9 ÕY±=..u.Õ..=..u.ÕF.=..u.Õr.=..t. 0001C0
46081A46 88078926 C246881E 5EC4A5F2 000E8907 1603488E C27E8DFE 7EE900EB $.Õ-±.-ó/H...¿...Éá^..Fô&...F..F 0001E0
```

```
Dump of file SATURN:[PCCOMMON.DUMP.DLL]BRDPLOW.TMP;1 on 18-APR-1990 10:38:06.00
File ID (528,44,0)   End of file block 272 / Allocated 272

Virtual block number 103 (00000067), 512 (0200) bytes

F8B8165E C4107418 46081646 88025789 26078926 C65688C4 46881A5E C4¡^741C .t.á^..Fá.Vó&..&.W..F..F.t.á^..« 000000
26078926 D25688D0 4688125E C4107414 46081246 881FA5A5 A5A51F16 1ECL^680 .vÀ...ÉÉÉÉ..F..F.t.á^..FÅ.V6&..& 000020
880A5EC4 09740C46 080A4688 07892604 46880E5E C4097410 46080E46 88025789 .W..F..F.t.á^..FÅ&...F..F.t.á^.. 000040
28CAC95F 5E1F00E8 C0280789 260C4688 065EC409 74084608 06468807 89260646 F¤&...F..F.t.á^..FÉ&..+áŠ..^_èò( 000060
06468808 74104608 0E468810 74144608 12468808 8E000888 1E565700 0026C800 .å&..WV.¡...Ä.F..F.t..F..F.t..F. 000080
C401CCE9 80F38807 89260247 8926C028 065EC40C 74084608 0646881A 75084608 .F.u..F..F.t.á^.+å&.G.&..¡µ.Öë.á 0000A0
5688FC46 88000000 369A5016 FC468D12 76FF1476 FF078926 02478926 C028065E ^.+å&.G.&...v..v..F•.P.6....F•.V 0000C0
106A0E6A 50F24689 06478826 F45EC401 9AE98DF1 88067500 08F65689 F44689FE ±.F¶.V-.Åu.¡Þ.Õ..á^¶&.G..F·Pj.j. 0000E0
0168E98D F2880789 26024789 26C02806 5EC41274 C0080000 FFFF9A50 16F84680 .F½.P......åt.á^.+å&.G.&..¡·.Ök. 000100
006A016A 006A006A 0C77FF26 0E77FF26 F45EC4A5 F2000889 039ABEF8 88F85EC4 á^½.«ƒ..¿..·Éá^¶&.w.&.w.j.j.j.j. 000120
8E078800 00FFFF9A F876FFFA 76FFF276 FF1474C0 08042C02 909AF876 FFFA76FF .v•.v½...,..åt..v·.v•.v½.....¡.. 000140
4688F85E C4084789 260A4789 26F85EC4 04478926 06478926 C028F85E C40128E9 Õ(.á^½+å&.G.&.G.á^½&.G.&.G.á^½.F 000160
C008FFFF 00009A50 52000C05 FA5688F8 4688F276 FF025789 26078926 F65688F4 ¶.V-&..&.W..v·.F½.V•...RP......å 000180
8800CCE9 8E078801 03E80EF8 76FFFA76 FF0C4789 260E4789 26C028F8 5EC41D74 t.á^½+å&.G.&.G..v•.v½.Ö&.¡..Öë.. 0001A0
2B7CE456 39EC5688 EA46881F A5F20008 B9DA8E1E 0716F088 E27E8010 56880E46 F..V..-ã.Þ....Ö¿..·É..Fõ.V§9Vö|+ 0001C0
88E45689 E24689EC 5688EA46 88E05689 DE4689E4 5688E246 882476E2 4639057F ..9FãvŠ.Fã.Vö.FB.VÀ.Fõ.Vê.Fã.Vö. 0001E0

Dump of file SATURN:[PCCOMMON.DUMP.DLL]BRDPLOW.TMP;1 on 18-APR-1990 10:38:06.00
File ID (528,44,0)   End of file block 272 / Allocated 272

Virtual block number 104 (00000068), 512 (0200) bytes

E6468824 76E64639 057F2B7C E85639F0 5688EE46 88EC5689 EA4689E0 5688DE46 FB.VÀ.Fõ.Vê.FŸ.VÞ9VÒ|+..9F¦vŠ.F¦ 000000
5689EE46 890C5688 DA4688E8 5689E646 89F05688 EE46880C 56890A46 89E85688 .VÒ.FÖ.VÉ.FŸ.VÞ.F¦.VÒ.FÖ.VÉ.FŸ.V 000020
D0E80EF8 76FFFA76 FF5016E2 46800877 FF260A77 FF26F45E C40A76FF 0C76FFF0 Þ.v..v.á^¶&.w.&.w..Fã.P.v•.v½.Ò¦ 000040
FA5688F8 4688065E C414E88E 0688011A E80EF876 FFFA76FF 0F74C008 10C48325 ¥.å..åt..v•.v½.Ö..¡..Š.á^..F½.V• 000060
080A4688 D88E0319 881E0000 00C80010 CAC95F5E 1F00E8C0 28025789 26078926 &..&.W.+åŠ..^_èò..à....¡...Ä.F.. 000080
26065EC4 06578826 04478826 0A5EC419 E88DF388 05750846 08064688 08740C46 F.t..F..F.u.¡µ.Š.á^.&.G.&.W.á^.& 0000A0
75124608 10468808 8E052888 1E000008 C80008CA C91F00E8 C0280257 89260789 ..&.W.+åŠ..èò..à....¡(..Ä.F..F.u 0000C0
8926C028 FC5EC400 74000E7E 83FE5689 FC468912 56881046 8800A0E9 80F38806 .¡µ.Õ...F..V..F•.V±.~..t.á^•+å&. 0000E0
C4167208 47392606 7F1E7C0A 57392606 57882604 478826FC 5EC40847 89260A47 G.&.G.á^•&.G.&.W.&9W.|...&9G.r.á 000100
0C77FF26 0E77FF26 FC5EC452 E8078926 02478926 C028065E C4000007 C7260A5E ^.&ú...á^.+å&.G.&..ŠRá^•&.w.&.w. 000120
C0080309 08689A50 16F8468D 006A000A 57832601 08478326 0877FF26 0A77FF26 &.w.&.w.&.G..&.W..j..F½.P.k.)..á 000140
26078926 FA5688F8 4688065E C4078926 0A5EC407 8826F85E C420E88E 06880574 t.¡..Š á^½&..á^.&..á^..F½.V•&..& 000160
C0280575 08460806 4688088E 0565881E 000010C8 000ECAC9 1F00E8C0 28025789 .W.+åŠ..èò..à....¡e..Ä.F..F.u.+á 000180
C4F25689 F0468902 57882607 8826F45E C4F65689 F4468908 56880646 880099E9 Õ...F..V..F¶.V-á^¶&..&.W..FÞ.V·á 0001A0
091E9A50 16F8468D F476FFF6 76FF5052 FE5689FC 46890E57 88260C47 8826F05E ^Þ&.G.&.W..F•.V±RP.v~.v¶.F½.P... 0001C0
D09A006A F876FFFA 76FFFC76 FFFE76FF 1376FFF8 7E83067F 187CFFFA 7E830691 ...-•.|....-½.v..v±.v•.v•.v½j..À 0001E0

Dump of file SATURN:[PCCOMMON.DUMP.DLL]BRDPLOW.TMP;1 on 18-APR-1990 10:38:06.00
File ID (528,44,0)   End of file block 272 / Allocated 272

Virtual block number 105 (00000069), 512 (0200) bytes

F05EC405 EC00689A 0C77FF26 0E77FF26 0D740E47 08260C47 8826F45E C406AB05 .¨.á^¶&.G.&.G.t.&.w.&.w..h.à.á^Þ 000000
04CAC91F 00E8C028 04E88DF2 880574C0 08000003 E99AF476 FFF676FF 0677FF26 &.w..v~.v¶.Õ....åt.¡·.Š.+åŠ..èò. 000020
46892056 881E4688 67E88DF3 88057520 46081E46 88D88E06 22881E00 0006C800 .à....¡"..Ä.F..F u.¡µ.Šg.F..V .F 000040
76FF0677 FF260877 FF26FA5E C40277FF 260477FF 26025FC4 26FA5EC4 FC5689FA •.V•á^•&á_.&.w.&.w.á^•&.w.&.w..v 000060
FF0876FF 0A76FF0C 76FF0E76 FF1076FF 1276FF14 76FF1676 FF1876FF 1A76FF1C ..v..v..v..v..v..v..v..v..v..v.. 000080
1F00E8C0 2B04E88E 06880000 07C72616 5EC40D74 C008FE46 890000FF FF9A0676 v.......F±.åt.á^.&ú...¡..Š.+åŠ.. 0000A0
F3880675 14460812 46880874 18460816 4688088E 06078B1E 00001AC8 001CCAC9 èò..à....¡•..Ä.F..F.t..F..F.u.¡µ 0000C0
04FA7E83 067403FA 7E83EE46 89078826 125EC4FA 46890788 26165EC4 00FAE98D .Õ•.á^.&...F•á^.&...FŸ.~•.t..~•. 0000E0
EC5689EA 46891856 88164688 00CAE98D F5880674 04EE7E83 0C7403EE 7E830C75 u..~Ÿ.t..~Ÿ.t.¡¾.Õò..F..V..Fõ.V& 000100
478826F8 5689F646 89045788 26024788 26EA5EC4 F45689F2 46891456 88124688 .F..V..F·.V¶á^õ&.G.&.W..F-.V½&.G 000120
F65EC400 00FFFF9A 50520016 05C28CC3 88016A50 52FE5689 FC468908 57882606 .&.W..F•.V±RPj..û.õ...RP.....á^~ 000140
FF0E76FF 1076FFC 77FF2608 77FF26F2 5EC4FC76 FFFE76FF 0277FF26 0477FF26 &.w.&.w..v±.v•á^·&.w.&.w..v..v.. 000160
26EA5EC4 42E88E03 880574C0 08F04689 0000FFFF 9A0676FF 0876FF0A 76FF0C76 v..v..v..v.......FÞ.åt.¡..ŠBá^õ& 000180
E67E8306 7F167C00 E87E8300 00FFFF9A 5016E646 8DFC76FF FE76FF2C 75043F83 .?.u,.v±.v•.f¦.P......-Õ.|....~¦ 0001A0
C91F00E8 C0280001 3847C726 EA5EC404 C483FFFF 01599A16 76FF1876 FF0E7602 .v..v..v..Y....é.á^õ&úG8..+åŠ..è 0001C0
46880000 03679A50 16FC4680 0A76FF0C 76FF088E 075A881E 5600000A C80014CA ò..à...V.¡Z..À.v..v..F•.P.g....F 0001E0
```

```
Dump of file SATURN:[PCCOMMON.DUMP.DLL]BRDPLOW.TMP;1 on 18-APR-1990 10:38:06.00
File ID (528,44,0)   End of file block 272 / Allocated 272

Virtual block number 106 (0000006A), 512 (0200) bytes

 F67E83F6 46FF03EB 0000F646 C728EB8D F9B80575 D00BFA56 89F84689 FE5688FC  ..V..F..V..Au.|..S(uF-..S..F-.-  000000
 08CAC95E 1F00EBC0 28E3EB78 408926F8 5EC4008B 26065EC4 E6D1F676 88147D06  .)..v-||.^.&..&^.&.ax.D+.S..^e..  000020
 ADE98DF3 88067510 46080E46 88087408 46080646 880B8E08 7AB81E00 0018C800  .a....|.......F..F.t..F..F.u.|..U  000040
 16F84680 5052FE56 89FC4689 08578826 06478826 065EC400 0007C726 0E5EC400  .&^.&u...&^.&.G.&.W..F..V.RP.F.  000060
 6EEBC02B 04750C56 3B09750A 4638000A 8300012D FA5688F8 46880000 08419A50  P.A....F..V.-...O.;F.u.;V.u.+aSn  000080
 4688FC76 FFFE76FF 00000964 9A5016F0 468D006A 0A76FF0C 76FFFC76 FFFE76FF  .v..v..v..v.|..FP.P.d....v..v..F  0000A0
 4639EE56 88EC4688 0000FFFF 9A5016E8 468D006A 505200D2 83000105 0C56880A  ..V......RP|..FO.P......F..V.9F  0000C0
 F256390D 75F04639 EA5688E8 468818EB 000107C7 260E5EC4 0A75F656 390F75F4  .u.9V-u.&^.&u...S..FO.V.9F.u.9V.  0000E0
 06468808 8E08D7B8 1E565700 0028C8C8 C91F00EB C0280002 07C7260E 5EC40875  u.&^.&u...+aS..euA(..WV.|...A.F.  000100
 89EC468D EA568CEB 4689E046 8D0446E9 8DF38806 750C4608 0A468808 74084608  .F.t..F..F.u.|..OF..FA.FO.VO.F.  000120
 00060846 C71FA5F2 0008890A 8E1E0716 F088EC7E 8D085688 064688FE 568CFC46  F..V..F..V..-..P....O...E.uFA..  000140
 19260847 29260A56 88084688 FC5EC400 02578326 06078326 FC5EC400 00DA46C7  uFO..&^.&...&.W..&^..FA.VO&)G.&.  000160
 0C472926 0A568808 4688FC5E C4065711 26044701 260A5688 084688FC 5EC40A57  W.&^..FA.VO&.G.&.W.&^..FA.VO&)G.  000180
 88265272 07392605 7F597C02 5739260A 5EC40257 88260788 26FC5EC4 0E571926  &.W.&^.&..&.W.&^.&9W.|Y..&9.rR&.  0001A0
 5EC40657 88260447 88263A72 08473926 067F427C 0A573926 FC5EC402 57882607  .&.W.&^.&9W.|B..&9G.r:&.G.&.W.&^  0001C0
 5739260A 5EC40E57 88260C47 8826FC5E C4217204 47392606 7F297C06 5739260A  .&9W.|)..&9G.r|&^.&.G.&.W.&^.&9W  0001E0

Dump of file SATURN:[PCCOMMON.DUMP.DLL]BRDPLOW.TMP;1 on 18-APR-1990 10:38:06.00
File ID (528,44,0)   End of file block 272 / Allocated 272

Virtual block number 107 (0000006B), 512 (0200) bytes

 00000E46 C7035EE9 C0280574 C008C028 02EB0001 88057704 47392606 7C0D7F06  ...|.&9G.w.|..S.+a.at.+aO^.uFB..  000000
 06468802 08E90C46 89038A87 88E3D10E 5E880346 E9037C08 DE7E830E 46FF03EB  S..FB.-B.|.OF..^B1D.....FEO...F.  000020
 89025788 2607882  065EC402 17E91FA5 A5A5A5DA 8E1E0716 F088E07E 8D085688  .V..-A.P....OEEEE.O..&^.&..&.W..  000040
 80000805 085688O. 468801F6 E9E65689 E446890E 5788260C 478826E2 5689E046  FA.Va&.G.&.W..FO.VIO-..F..V.....  000060
 89E04689 0A578826 08478826 065EC401 D8E91FA5 A5A5A5DA 8E1E0716 F088E07E  ~A.P....OEEEE.OU.&^.&.G.&.W..FA.  000080
 00052D02 57882607 8826065E C4018 9E9 E65689E4 46890657 88260447 8826E256  Va&.G.&.W..FO.VIO.&^.&..&.W.-..  0000A0
 26044789 26FC5EC4 06578826 04478826 065EC402 57892607 8926FC5E C4000A83  .O.&^.&..&.W.&^.&.G.&.W.&^.&.G.&  0000C0
 5EC40A57 89260847 8926FC5E C4000283 00050502 57882607 8826065E C4065789  .W.&^.&..&.W.....@.&^.&.G.&.W.&^  0000E0
 88260847 8826065E C40155E9 0E578926 0C478926 FC5EC40E 5788260C 47882606  .&.G.&.W.&^.&.G.&.W.OU.&^.&.G.&.  000100
 FC5EC406 57882604 47882606 5EC40257 89260789 26FC5EC4 00DA8300 05200A57  W.-...O.&^.&..&.W.&^.&.G.&.W.&^.  000120
 08478926 FC5EC400 D2830005 050A5788 26084788 26065EC4 06578926 04478926  &.G.&.W.&^.&.G.&.W.....@.&^.&.G.  000140
 065EC400 EFE90E57 89260C47 8926FC5E C40E5788 260C4788 26065EC4 0A578926  &.W.&^.&.G.&.W.&^.&.G.&.W.Oy.&^.  000160
 83000520 0E578826 0C478826 065EC402 57892607 8926FC5E C4025788 26078826  &..&.W.&^.&..&.W.&^.&.G.&.W.-...  000180
 26084789 26FC5EC4 0A578826 08478826 065EC406 57892604 478926FC 5EC4000A  O.&^.&.G.&.W.&^.&.G.&.W.&^.&.G.&  0001A0
 E90E5789 260C4789 26FC5EC4 00028300 05050E57 88260C47 8826065E C40A5789  .W.&^.&.G.&.W.....@.&^.&.G.&.W.O  0001C0
 57882604 47882606 5EC40257 89260789 26FC5EC4 02578826 07882606 5EC4008A  ..&^.&..&.W.&^.&..&.W.&^.&.G.&.W  0001E0

Dump of file SATURN:[PCCOMMON.DUMP.DLL]BRDPLOW.TMP;1 on 18-APR-1990 10:38:06.00
File ID (528,44,0)   End of file block 272 / Allocated 272

Virtual block numbe- 108 (0000006C), 512 (0200) bytes

 FC5EC40A 57882608 47882606 5EC40657 89260447 8926FC5E C4000A83 00052D06  .-...O.&^.&.G.&.W.&^.&.G.&.W.&^.  000000
 0C478926 FC5EC400 02830005 05065788 26044788 26065EC4 0A578926 08478926  &.G.&.W.&^.&.G.&.W.....@.&^.&.G.  000020
 08430CFC 0C0D0C72 0CE8A7FF 2E93C003 1C770009 3000012D 24EB26EB 0E578926  &.W.S&S-..=..w..a...IO.r....C.  000040
 7401DC7E 837F7408 0C7E8300 85E90375 040C7E83 08060821 08A70CFC 0AE50ACD  e.|..I.|....-E.u.O...-E.t..-E.t  000060
 FC5EC400 DA830005 2D025788 26078826 E85EC460 74000C7E 83737402 0C7E8379  y.-E.ts.-E.tm&^O&..&.W.-...O.&^.  000080
 89260847 8926FC5E C4000283 00050502 57882607 8826E85E C4025789 26078926  &..&.W.&^O&..&.W.....@.&^.&.G.&.  0000A0
 5EC40657 89260447 8926FC5E C4000A83 00052D06 57882604 478826E8 5EC40A57  W.&^O&.G.&.W.-...O.&^.&.G.&.W.&^  0000C0
 078826FC 5EC40E57 89260C47 8926FC5E C4000283 00050506 57882604 478826E8  O&.G.&.W.....@.&^.&.G.&.W.&^.&..  0000E0
 3926FC5E C4025788 26078826 52720739 26057F59 7C025739 260A5EC4 02578826  &.W.&^.&9W.|Y..&9.rR&..&.W.&^.&9  000100
 26067F29 7C065739 260A5EC4 06578826 04478826 3A720847 3926067F 427C0A57  W.|B..&9G.r:&.G.&.W.&^.&9W.|)..&  000120
 77044739 26067C00 7F065739 260A5EC4 0E578826 0C478826 FC5EC421 72044739  9G.r|&^.&.G.&.W.&^.&9W...|.&9G.w  000140
 24C8CBC9 5F5E1F00 E8000888 FCAEE908 E8DC4688 0574C008 C02802E8 00018805  .|..S.+a.at..FES.OU.|..S..^_euAS  000160
 09C29A00 6A006A06 76FF0876 FFFE568C FC4689EC 468D008E 09A9881E 56570000  ..WV.|`..A.F&.F..V..v..v.j.]..O.  000180
 89EA5688 E8468801 58E90374 C0080E70 0A589A50 16E84680 0676FF08 76FF0E40  a..v..v..FO.P.X.p..at.OX..FO.VO.  0001A0
 00F09A50 16E4468D 5052E256 89E04689 40578826 3E478826 DC5EC4DE 56890C46  FE.VB&^E&.G>&.WQ.FA.VaRP.FO.P.P.  0001C0
 FFE276FF 0A76FF0C 76FF0E76 FF1076FF 237400E4 7E83067F 287C00E6 7E830670  p..-|.|+...~O.t#.v..v..v..v..va.  0001E0
```

```
Dump of file SATURN:[PCCOMMON.DUMP.DLL]BRDPLOW.TMP;1 on 18-APR-1990 10:38:06.00
File ID (528,44,0)   End of file block 272 / Allocated 272

Virtual block number 109 (0000006D), 512 (0200) bytes

 88EC7E8D 001605DE 5688DC46 880102E9 00018806 74C0080C C483FF78 E80EE076 vÀ.Òx..á..ât.¡..Ö...FÉ.V8....-&. 000000
 05084783 26FC5EC4 00025F83 26052F83 26FC5EC4 1FA5F200 0889DA8E 1E0716F0 Þ....Ö¿...É.á^=&./.&...á^=&.G.. 000020
 C4000E57 832600C 478326FC 5EC40006 5F832605 046F8326 FC5EC400 0A578326 &.W..á^=&.o..&._..á^=Ē.G..&.W..á 000040
 02578826 07882652 72073926 057F597C 02573926 0A5EC402 57882607 8826FC5E ^=&..&.W.á^.&9W.|Y..&9.rR&..&.W. 000060
 06573926 0A5EC406 57882604 4788263A 72084739 26067F42 7C0A5739 26FC5EC4 á^=&9W.|B..&9G.r:&.G.&.W.á^.&9W. 000080
 067C0D7F 06573926 0A5EC40E 5788260C 478826FC 5EC42172 04473926 067F297C |)..&9G.rlá^=&.G.&.W.á^.&9W...|. 0000A0
 88E84688 0E5EC400 0107C726 0E5EC430 74C008C0 2802E800 01880577 04473926 &9G.w.¡..Š.+â.ât=á^.&ú...á^..FÒ. 0000C0
 83FA12E8 0E505200 16050E56 88DC4688 0A76FF0C 76FF0457 89260247 8926EA56 Võ&.G.&.W..v..v..FÉ.V8...RP.Ò.*. 0000E0
 56570000 1EC8CBC9 5F5E1F00 EBC02BFE 91E907E8 0001881A 4789260E 5EC408C4 á.á^.&.G.¡..Š.Ö.±+âŠ..^_èùà...WV 000100
 C4025788 26078826 FC5EC4FE 5689FC46 89003605 08568806 4688D88E 0E16881E .¡...Ä.F..V..6..F=.V±á^=&..&.W.á 000120
 7F427C0A 573926FC 5EC40257 88260788 26527207 3926057F 597C0257 39260A5E ^.&9W.|Y..&9.rR&..&.W.á^=&9W.|B. 000140
 21720447 3926067F 297C0657 39260A5E C4065788 26044788 263A7208 47392606 .&9G.r:&.G.&.W.á^.&9W.|)..&9G.rl 000160
 E8000188 057704.* 3926067C 007F0657 39260A5E C40E5788 260C4788 26FC5EC4 á^=&.G.&.W.á^.&9W...|.&9G.w.¡..Š 000180
 E90370D2 08F8568V F646895A 57882658 47882606 5EC4000F E90374C0 08C02802 .+â.ât.Öð.á^.&.GX&.WZ.F-.V½.Ø).Ö 0001A0
 88260788 26F25EC4 F45689F2 46890016 05C28CC3 8800BAE9 0375C008 077F00C3 ù....âu.Öα..ù.ó....F.V¶á^.&..&. 0001C0
 0A5EC406 57882604 478826F2 5EC4E856 89E64689 02571826 07282260A 5EC40257 W.á^.&+.&.W..Fl.VÒá^.&.G.&.W.á^. 0001E0

Dump of file SATURN:[PCCOMMON.DUMP.DLL]BRDPLOW.TMP;1 on 18-APR-1990 10:38:06.00
File ID (528,44,0)   End of file block 272 / Allocated 272

Virtual block number 110 (0000006E), 512 (0200) bytes

 C29A1081 028F9AE6 5E8D10AC 028F9AE6 5E8DE456 89E24689 06571826 04472826 &+G.&.W..Fã.VÖ.^l.¢.¯..^l.¢.Ý..ò 000000
 08EC8310 D506019A 10C806C2 9A10C602 BF9AE25E 8D10C102 BF9AE25E 8D108906 .¿..^ã.¢.ê..^ã.¢.ó..ò.ù..l.l..&. 000020
 5E8D1FA5 A5A5A50A 8E1E0716 F088EA7E 8D08C483 FFFF0785 9A100A03 EF9ADC88 .Ê.ÿ.Ö..ç....á..-ð.Þ....ÖEEEE..^ 000040
 08FA4689 C02802EB 00018805 7210A406 D69A1101 028F9AF6 5E8D10FC 02329AEA ð.2.=..^~.¢....ø.Ê.r.¡..Š.+â.F*. 000060
 89260247 89260856 88064688 0E5EC400 0207C726 0E5EC41E E8C02804 E80274C0 ât.Š.+âŠ.á^.&ú...á^..F..V.&.G.&. 000080
 006A006A 0676FF08 76FFD88E 0F82881E 000018C8 CBC95F5E 1F00E800 01880457 W.¡..Š..^_èùà....¡ý..Ä.v..v.j.j. 0000A0
 88FC4688 0080E905 74C00811 930A589A 5016FC46 800676FF 0876FF11 6309C29A .ô.c..v..v..F=.P.X....ât.Ö¯..F=. 0000C0
 5016F846 805052F6 5689F446 89405788 263E4788 26EC5EC4 EE5689EC 4689FE56 V±.F&.VÝá^&&.G>&.WΩ.F¶.V-RP.F½.P 0000E0
 FF0A76FF 0C76FF0E 76FF1076 FF227400 F87E8306 7F2A7C00 FA7E830E 3000F09A .Þ.0..-*.|*...-½.t".v..v..v..v.. 000100
 44578826 42478826 EC5EC458 E8000188 0574C008 0CC483FF 83E80EF4 76FFF676 v-.v¶.Ö...á..ât.¡..Š[á^&&.GB&.WD 000120
 530A589A 5016F046 8DE876FF EA76FF11 EF09C29A 006A006A 5052EA56 89E84689 .FÖ.VõRPj.j..ó.ÿ..vð.vÒ.FÞ.P.X.S 000140
 C00B0CC4 83F09FE8 0EF076FF F276FF0A 76FF0C76 FF0E76FF 1076FF24 75C00811 ..âu$.v..v..v..v..v..vÞ.Ö.=.á..â 000160
 83088E11 42881E56 5700001A C8C8C91F 00E8C028 FF39E9C8 E809E800 01880574 t.¡..Š.Šâð9.+âŠ..èùà...WV.¡B..Ä. 000180
 E9C02805 7500127E 83087501 0A7E830C 7400107E 83067500 0A7E8318 74020A7E -..t..~..u..~..t..~..u..~..u.+âÖ 0001A0
 F0468050 16F4468D 5016EC46 805016F6 46800C76 FF0E76FF 0676FF08 76FF00F1 Þ..v..v..v..v..F-.P.Fš.P.F¶.P.FÞ 0001C0
 145EC400 86E9C028 057500F6 7E830675 C008EA46 89F456E8 0E5016F8 46805016 .P.F½.P.ÖV¶.Fõ.âu..—.u.+âÖÑ.á^. 0001E0

Dump of file SATURN:[PCCOMMON.DUMP.DLL]BRDPLOW.TMP;1 on 18-APR-1990 10:38:06.00
File ID (528,44,0)   End of file block 272 / Allocated 272

Virtual block number 111 (0000006F), 512 (0200) bytes

 E85688E6 46881776 FFFF3D05 7F1E7CFF FA83E856 89E64689 18578826 16478826 &.G.&.W..Fl.VÒ.*.|...=..v..Fl.VÒ 000000
 07892603 84848BE6 D10A7688 145EC400 82E9C028 0572EC46 39057F0C 7CEE5639 9VÝ|...9F&r.+âÖ..á^..v.ll....&.. 000020
 A5A5A51F 161EF876 8D067F8D 145EC404 57892602 47892608 56880646 88145EC4 á^..F..V.&.G.&.W.á^.....v½...ÉÉÉ 000040
 F47E8312 478926F4 4688145E C4105789 260E4789 26F25688 F0468814 5EC41FA5 Ê.á^..FÞ.V.&.G.&.W.á^..F¶&.G..-¶ 000060
 52F25688 F0468806 EB99C028 05740012 7E835052 00140516 56881446 88287500 .u+.F..V....RP.-..t.+â.Š..FÞ.V.R 000080
 12288B1E 000022C8 CBC95F5E 1F00E800 01880CC4 83F596E8 0E0676FF 0876FF50 P.v..v..Ö.%.á.¡..Š..^_èùà"...¡+. 0000A0
 16FC468D 0676FF08 76FF1374 09C29A00 6A006A06 76FF0876 FF0000EE 46C7D88E .ÄúFÝ...v..v.j.j..ó.t¯.v..v..F=. 0000C0
 3E478826 E65EC4E8 5689E646 89FE5688 FC468800 FFE90374 C00813A4 0A589A50 P.X.É..ât.Ö...F=.V±.Fl.VÒá^l&.G> 0000E0
 7E83067F 2A7C00F6 7E8313F0 00F09A50 16F4468D 5052F256 89F04689 40578826 &.WΩ.FÞ.V.RP.F¶.P.Þ.Þ..—.|*...~ 000100
 74C0080C C483FF7E E80EF076 FFF276FF 0A76FF0C 76FF0E76 FF1076FF 227400F4 ¶.t".v..v..v..v..v..vÞ.Ö~..á..ât 000120
 09C29A00 6A006A50 52E05689 DE468944 57882642 478826E6 5EC40001 EE46C705 .úFÝ..á^l&.GB&.WD.F8.VÁRPj.j..ó. 000140
 89E24689 EC5688EA 46887375 C0081424 0A589A50 16EA468D DE76FFE0 76FF1400 ...vÀ.v8.Fõ.P.X.$..âus.Fõ.V&.Fã. 000160
 77FF264A 77FF26E2 5EC41439 09C29A00 6A006A48 77FF264A 77FF26E2 5EC4E456 VÖá^ã&.wJ&.wHj.j..ó.9.á^ã&.wJ&.w 000180
 6A0E76FF 1076FF28 7500047F 8326F85E C43775C0 0811DF0A 589A5016 F8468D48 H.F½.P.X.Ö..âu7á^¥&....u+.v..v.j 0001A0
 C70574C0 0812C483 FD8BE80E 37FF2602 77FF2606 77FF260A 76FF0C76 FF016A00 .j..v..v.&.w.&.w.&.7.ÖE».á..ât.ú 0001C0
 46C7D88E 134E881E 000022C8 CBC91F00 EBEE4688 FEEAE9FF 79E980EB 0U. EE46 FÝ..Š¯Öy.Öõ±.FÝŠ..èùà"...¡N..ÄúF 0001E0
```

```
Dump of file SATURN:[PCCOMMON.DUMP.DLL]BRDPLOW.TMP;1 on 18-APR-1990 10:38:06.00
File ID (528,44,0)   End of file block 272 / Allocated 272

Virtual block number 112 (00000070), 512 (0200) bytes

0A589A50 16FC468D 0.76FF08 76FF1480 09C29A00 6A006A06 76FF0876 FF0000EE Ÿ...v..v.j.j..ô.¯..v..v..F▪.P.X. 000000
40578826 3E478826 E65EC4E8 5689E646 89FE5688 FC468800 FFE90374 C00814E0 Å..åt.Õ...F▪.V±.F|.VÕá^|&.G>&.Wa 000020
227400F4 7E83067F 2A7C00F6 7E831364 00F09A50 16F4468D 5052F256 89F04689 .Fþ.V·RP.F¶.P.þ.d..—.|*...-¶.t" 000040
EE46C705 74C0080C C483FF7E E80EF076 FFF276FF 0A76FF0C 76FF0E76 FF1076FF .v..v..v..v..v·.vþ.Ö—..á..åt.úFŸ 000060
76FF153C 09C29A00 6A006A50 52E05689 DE468944 57882642 478826E6 5EC40001 ..á^|&.GB&.WD.FB.VÃRPj.j..ô.<..v 000080
5EC4E456 89E24689 EC5688EA 46887375 C0081560 0A589A50 16EA468D DE76FFE0 Å.vB.Fô.P.X.`..åus.Fô.V&.Fã.VÕá^ 0000A0
F84680 4C 77FF264E 77FF26E2 5EC41575 09C29A00 6A006A4C 77FF264E 77FF26E2 ã&.wN&.wLj.j..ô.u.á^ã&.wN&.wL.F% 0000C0
FF006A01 6A0E76FF 1076FF28 7500047F 8326F85E C43775C0 0814A00A 589A5016 .P.X....åu7á^½&....u+.v..v.j.j.. 0000E0
0001EE46 C70574C0 0812C483 FC7FE80E 37FF2602 77FF2606 77FF260A 76FF0C76 v..v.&.w.&.w.&.7.Õ.=.á..åt.úFŸ.. 000100
0676FF08 76FFD88E 148A881E 000034C8 C8C91F00 E8EE4688 FEEAE9FF 79E980E8 $¯Õy.Õõ±.FŸŠ..èüå4...|...Ä.v..v. 000120
0177E903 74C00816 170A589A 5016EC46 800676FF 0876FF15 E709C29A 006A006A j.j..ô.Õ..v..v..F&.P.X....åt.Õw. 000140
805052E2 5689E046 8940578B 263E4788 26045EC4 D65689D4 4689EE56 88EC4688 .F&.VŸ.Fá.V▪á^ã&.G>&.Wa.FÃ.VãRP. 000160
0C76FF0E 76FF1076 FF237400 E47E8306 7F287C00 E67E8316 6400F09A 5016E446 Fô.P.þ.d..-|.|+...-ô.t#.v..v..v. 000180
47882604 5EC40121 E90001B8 0674C008 0CC483FF 83E80EE0 76FFE276 FF0A76FF .v..vã.vÅ.Õ...á..åt.|..Õl.á^ã&.G 0001A0
160C468D CC76FFCE 76FF1674 09C29A00 6A006A50 52CE5689 CC468944 57882642 B&.WD.F▪.VÕRPj.j..ô.t..vô.vã.FÉ. 0001C0
4A77FF26 D05EC402 56890046 890E5688 DC468800 E7E90374 C008169B 0A589A50 P.X....åt.ÕÕ..FÉ.VB.FÅ.VÕá^Å&.WJ 0001E0

Dump of file SATURN:[PCCOMMON.DUMP.DLL]BRDPLOW.TMP;1 on 18-APR-1990 10:38:06.00
File ID (528,44,0)   End of file block 272 / Allocated 272

Virtual block number 113 (00000071), 512 (0200) bytes

0A589A50 16E8468D 4877FF26 4A77FF26 D05EC416 8009C29A 006A006A 4877FF26 &.wHj.j..ô.¯.á^Å&.WJ&.WH.FÕ.P.X. 000000
89084689 02578826 07882608 E8027402 067F8326 E85EC400 A8E90374 C008152C ,..åt.Õ`.á^Õ&....t.ŠÅ&..&.W..FÅ. 000020
7F477C02 573926F2 5688F046 880A5EC4 FFFF0486 9A5016F0 4680016A 50520A56 VÕRPj..Fþ.P.Ñ...á^..Fþ.V·&9W.|G. 000040
26F6568B F446882D 77073926 057C347F 02573926 FA5688F8 46884072 07392605 .&9.rã.F%.V±&9W..4|.&9.w-.F¶.V-& 000060
77044739 26067C00 7F065739 26FE5688 FC468819 72044739 26067F21 7C065739 9W.||..&9G.r..F▪.V±&9W...|.&9G.w 000080
5EC40257 88260788 26E85EC4 000507C7 260E5EC4 2274C008 C02802E8 00018805 .|..$.+ã.åt"á^.&ú...á^Õ&..&.W.á^ 0000A0
1CC8CBC9 1F00E8C0 28FE72E9 FF02E9FF 3CE900E8 00018804 57892602 4789260E .&.G.&.W.|..$.Õ<.Õ..Õr±+å$..èüå. 0000C0
09C29A00 6A006A06 76FF0876 FFFA568C F84689E8 4680088E 15C6881E 565.^000 ..WV.|Õ..Å.FÕ.F%.V'.v..v.j.j..ô. 0000E0
89E6568B E4468801 04E90374 C00815D7 0A589A50 16E4468D 0676FF08 76FF: 40 ..v..v..FÕ.P.X.▪..åt.Õ...FÕ.Vl. 000100
26052F83 26F85EC4 1FA5F200 08890A8E 1E0716F0 88E87E80 000C05FE 5689FC:6 F▪.V±....—Õ.þ....Õ¿..·E.á^½&./.& 000120
5EC40006 5F832605 046F8326 F85EC400 0A578326 05084783 26F85EC4 00025F83 ...á^½&.G..&.W..á^½&.o..&._..á^ 000140
057F597C 02573926 0A5EC402 57882607 8826F85E C4000E57 8326050C 478326F8 ½&.G..&.W..á^½&..&.W.á^.&9W.|Y.. 000160
4788263A 72084739 26067F42 7C0A5739 26F85EC4 02578826 07882652 72073926 &9.rR&..&.W.á^½&9W.|B..&9G.r:&.G 000180
5788260C 478826F8 5EC42172 04473926 067F297C 06573926 0A5EC406 57882604 .&.W.á^.&9W.|)..&9G.r!á^½&.G.&.W 0001A0
0E5EC430 74C008C0 2802E800 01880577 04473926 067C007F 06573926 0A5EC40E .á^.&9W...|.&9G.w.|..$.+ã.åt=á^. 0001C0
88FC4688 0A76FF0C 76FF0457 89260247 8926E656 88E44688 0E5EC400 0607C726 &ú...á^..FÕ.V|&.G.&.W..v..v..F▪. 0001E0

Dump of file SATURN:[PCCOMMON.DUMP.DLL]BRDPLOW.TMP;1 on 18-APR-1990 10:38:06.00
File ID (528,44,0)   End of file block 272 / Allocated 272

Virtual block number 114 (00000072), 512 (0200) bytes

EBC028FE E5E907E8 0001881A 4789260E 5EC408C4 83F106E8 0E505200 0C05FE56 V±...RP.Õ.þ.á.á^.&.G.|..$.Õl±+å$ 000000
FF180009 C29A006A 006A0676 FF0876FF D88E1776 881E0000 32C8CBC9 5F5E1F00 ..^_èüå2...|v..Å.v..v.j.j..ô.l.. 000020
89DA4689 F25688F0 4688010E E90374C0 0819000A 589A5016 F0468D06 76FF0876 v..v..Fþ.P.X....åt.ÕB..Fþ.V·.FÕ. 000040
83196000 F09A5016 E6468050 52E45689 E2468940 5788263E 4788260A 5EC40C56 VÉá^Õ&.G>&.Wa.Fã.VÕRP.F|.P.þ.`.. 000060
0EE276FF E476FF0A 76FF0C76 FF0E76FF 1076FF23 7400E67E 83067F28 7C00E87E -Õ.|+...-|.t#.v..v..v..v..vÕ.vã. 000080
5689CE46 8944578B 2642478B 260A5EC4 0188E900 01880674 C0080CC4 83FF83E8 Õ...á..åt.|..Õ..á^Õ&.GB&.WD.Fö.V 0000A0
DE468042 77FF2644 77FF260A 5EC41975 09C29A00 6A006A42 77FF2644 77FF26D0 Å&.wD&.wBj.j..ô.u.á^Õ&.wD&.wB.FB 0000C0
0E76FF10 76FFD856 89D64689 E05688DE 4688011C E90374C0 0819F50A 589A5016 .P.X.%..åt.Õ...FB.VÅ.F▪.VÃ.v..v. 0000E0
E90001B8 0674C008 0CC483F0 C9E80E50 77FF2652 77FF26D6 5EC40A76 FF0C76FF .v..v.á^▪&.wR&.wP.Õè».á..åt.|..Õ 000100
47882606 5EC411E8 FE5689FC 46894A57 88264847 8826065E C40002EA 46C70116 ..úFõ..á^▪&.GH&.WJ.F▪.V±$.á^▪&.G 000120
006AFC76 FFFE76FF 00AFE903 75C008EA 4EFFEA46 88FE5689 FC46894E 5788264C L&.WN.F▪.V±.Fõ.Nõ.åu.ÕÉ..v±.v▪j. 000140
5EC40086 E90374C0 0817900A 589A5016 EC468DFC 76FFFE76 FF1A0509 C29A006A j..õ....v±.v▪.Fš.P.X....åt.Õ..á^ 000160
88262647 88260 25E C4045689 02468902 57882607 8826EC5E C448E806 478826EC $&.G.ŠHá^$&..&.W..FØ.Vãá^Ø&.G&&. 000180
478826F4 5EC4F656 89F44689 02578826 078826EC 5EC435E8 FA5689F8 46892857 W(.F%.V'$Sá^$&..&.W..F¶.V-á^¶&.G 0001A0
FF00E8CD 74000230 AF7E0001 3D0C7CC0 0810E812 E8FA5689 F8468926 57882624 $&.W&.F%.V'$.$..å|.=..-£*..tè$.. 0001C0
E80001B8 0574C008 0CC483FC E9E80EF8 76FFFA76 FF0A76FF 0C76FF0E 76FF1076 v..v..v..v..v'.v%.Õõ▪.á..åt.|..$ 0001E0
```

Dump of file SATURN:[PCCOMMON.DUMP.DLL]BRDPLOW.TMP;1 on 18-APR-1990 10:38:06.00
File ID (528,44,0)   End of file block 272 / Allocated 272

Virtual block number 115 (00000073), 512 (0200) bytes

```
77FF2668 77FF260A 5EC40A76 FF0C76FF 0E76FF10 76FFFEC8 E9FF33E9 FF63E937 70c.Õ3.Õâ±.v..v..v..v.á^Õ&.wh&.w 000000
57000026 C8C8C91F 00E8C028 FE08E907 E80001B8 0574C008 0CC483FC B9E80E66 f.Õ¿=.á..ât.¡...Š.Õ.±+âŠ..èüâ&..W 000020
087F070E 7E830E7C 000E7E83 14740846 08064688 0000E646 C7D88E18 8C881E56 V.¡¥..ÄúF|...F..F.t..~..|..~.... 000040
52E45689 E2468916 57882614 47882606 5EC4035D E98DF388 06751246 08104688 .F..F.u.¡µ.Õ].á^.&.G.&.W..Fã.VõR 000060
25E90374 C0081BCD 0A589A50 160A468D E276FFE4 76FF1828 09C29A00 6A006A50 Pj.j..ô.(..vô.vã.FÖ.P.X.ë..ât.ÕX 000080
1605E056 89DE4689 0C5688DA 468802DF E90314E9 03740739 260E4688 DA5EC403 .á^Õ.F.&9.t.Õ..ÕÕ..FÖ.VÉ.F8.VÁ.. 0000A0
2F8326F8 5EC4FA56 8CF84689 E8468D1F A5F20008 890A8E1E 0716F088 E87E8D00 ..-Õ.Þ....Õ¿..·É..FÖ.F½.V'á^½&./ 0000C0
00065F83 2605046F 8326F85E C4000A57 83260508 478326F8 5EC40002 5F832605 .&. ..á^½&.G..&.W..á^½&.o..&. .. 0000E0
597C0257 39260A5E C4025788 26078826 F85EC400 0E578326 050C4783 26F85EC4 á^½&.G..&.W..á^½&..&.W.á^.&9W.¯|Y 000100
263A7208 47392606 7F427C0A 573926F8 5EC40257 88260788 26527207 3926057F ..&9.rR&..&.W.á^½&9W.|B..&9G.r:& 000120
260C4788 26F85EC4 21720447 3926067F 297C0657 39260A5E C4065788 26044788 .G.&.W.á^.&9W.|)..&9G.r|á^½&.G.& 000140
C43E74C0 08C02802 E80001B8 05770447 3926067C 007F0657 39260A5E C40E5788 .W.á^.&9W...|.&9G.w.¡..Š.+â.ât>á 000160
46880A76 FF0C76FF 04578926 02478926 0C5688DA 4688105E C4000107 C726105E ^.&ú...á^..FÖ.VÉ&.G.&.W..v..v..F 000180
0203E902 0EE90001 881A4789 26105EC4 08C483ED 64E80E50 52001605 E05688DE 8.VÁ...RP.ÕdÜ.á.á^.&.G.¡..Õ..Õ.. 0001A0
00018806 74C0080C C4A3F344 E80EDA76 FF0C76FF 0A76FF0C 76FF1076 FF1276FF .v..v..v..v..vÉ.vÖ.Õ0µ.á..ât.¡.. 0001C0
E80EDA76 FF0C76FF 006A0A76 FF0C76FF 016A006A 1076FF12 76FF01DD E901E8E9 ÕÕ.Õï..v..v.j.j..v..v.j..vÉ.vÖ.Õ 0001E0
```

Dump of file SATURN:[PCCOMMON.DUMP.DLL]BRDPLOW.TMP;1 on 18-APR-1990 ?:38:06.00
File ID (528,44,0)   End of file block 272 / Allocated 272

Virtual block number 116 (00000074), 512 (0200) bytes

```
76FF0C76 FF006A01 6A1076FF 1276FF01 82E90001 E646C705 74C00812 C483F591 .%.á..ât.úF|..Õý..v..v.j.j..v..v 000000
89E8468D 0187E900 01E646C7 0574C008 12C483F5 66E80EDA 76FFDC76 FF016A0A .j..vÉ.vÕ.Õf%.á..ât.úF|..Õ...FÕ. 000020
5EC40257 88260788 26F85EC4 16DE0486 9A501601 6ADA76FF DC76FFFA 568CF846 F½.V'.vÉ.vÕj..P.Ñ.8.á^½&..&.W.á^ 000040
067F427C 0A573926 F85EC402 57882607 88265272 07392605 7F597C02 5739260A .&9W.|Y..&9.rR&..&.W.á^½&9W.|B.. 000060
C4217204 47392606 7F297C06 5739260A 5EC40657 88260447 88263A72 08473926 &9G.r:&.G.&.W.á^.&9W.|)..&9G.r|á 000080
02E80001 88057704 47392606 7C0D7F06 5739260A 5EC40E57 88260C47 8826F85E ^½&.G.&.W.á^.&9W...|.&9G.w.¡..Š. 0000A0
88045789 26024789 260C5688 DA468810 5EC40005 07C72610 5EC41F74 C008C028 +â.ât.á^.&ú...á^..FÖ.VÉ&.G.&.W.¡ 0000C0
F85EC4FA 5689F846 89000C05 FE5689FC 46890C56 880A4688 00D8E900 E6E90001 ..Õ].ÕÜ..FÖ.VÉ.F•.V±....F½.V'á^½ 0000E0
5EC40257 88260788 26527207 3926057F 597C0257 39260A5E C4025788 26078826 &..&.W.á^.&9W.|Y..&9.rR&..&.W.á^ 000100
297C0657 39260A5E C4065788 26044788 263A7208 47392606 7F427C0A 573926F8 ½&9W.|8..&9G.r:&.G.&.W.á^.&9W.|) 000120
3926067C 007F0657 39260A5E C40E5788 260C4788 26F85EC4 21720447 3926067F ..&9G.r|á^½&.G.&.W.á^.&9W...|.&9 000140
0C5688DA 4688105E C4000607 C726105E C41E74C0 08C02802 E80001B8 05770447 G.w.¡..Š.+â.ât.á^.&ú...á^..FÖ.VÉ 000160
1FE90375 00023DFD 19E90375 00013032 E834E83E E80001B8 04578926 02478926 &.G.&.W.¡..Š>$4$2=..u.Õ.»=..u.Õ. 000180
27E90375 00063DFE 83E90375 00053DFE 60E90375 00043DFE 3DE90375 00033DFE ±=..u.Õ=±=..u.Õ'±=..u.Õ.±=..u.Õ' 0001A0
77FF2606 5EC4D88E 1AD3881E 000000C8 C8C95F5E 1F00E8E6 4688FCC4 E900E8FF .Š.Õá•.F|Š..^_èüâ....¡&..Äá^.&.w 0001C0
E88E0688 0574C008 1818029D 9A0C76FF 0E76FF01 6A016A00 6A006A0C 77FF260E .&.w.j.j.j.j.¯v..v.......ât.¡..Š 0001E0
```

Dump of file SATURN:[PCCOMMON.DUMP.DLL]BRDPLOW.TMP;1 on 18-APR-1990 10:38:06.00
File ID (528,44,0)   End of file block 272 / Allocated 272

Virtual block number 117 (00000075), 512 (0200) bytes

```
FFD88E1E 66881E00 0014C8C8 C91F00E8 C0280006 57832601 04478326 065EC411 .á^.&.G..&.W..+âŠ..èüâ....¡f..Ä. 000000
C0081EFC 0A589A50 16F8468D 0E76FF10 76FF1ECC 09C29A00 6A006A0E 76FF1076 v..v.j.j..ô.ä..v..v..F½.P.X.•..â 000020
89F04689 40578826 3E478826 EC5EC4EE 5689EC46 89FA5688 F8468800 EAE90374 t.Õð..F½.V'.F&.V¥á^&&.G>&.W@.FÞ. 000040
FFF276FF 197400F4 7E83067F 217C00F6 7E831E86 00F09A50 16F4468D 5052F256 V·RP.F¶.P.Þ....—.|!...~¶.t..v·. 000060
46890016 05EE5688 EC46880C C483FF83 E80E0676 FF0876FF 0A76FF0C 76FFF076 vÞ.v..v..v..v..Õ...á..F&.V¥....F 000080
26527208 47392606 7F5A7C0A 5739260A 5EC40257 88260788 26FC5EC4 FE5689FC •.V±á^•&..&.W.á^.&9W.|Z..&9G.rR& 0000A0
88260C47 88260A5E C43A7208 47392606 7F427C0A 573926FC 5EC40257 88260788 ..&.W.á^•&9W.|B..&9G.r:á^.&.G.&. 0000C0
39260A5E C40E5788 260C4788 261E7704 47392606 7C267F06 573926FC 5EC40E57 W.á^•&9W..&|.&9G.w.&.G.&.W.á^.&9 0000E0
FF016AF8 76FFFA76 FF1574C0 08C02802 E80001B8 05770447 3926067C 007F0657 W...|.&9G.w.¡..Š.+â.ât..v'.v½j.. 000100
D88E1EA8 881E0000 28C8C8C9 1F00E8C0 28FEFFE9 0AC483FE A7E80E06 76FF0876 v..v..Õ]±.á.Õ.±+âŠ..èüâ(...¡¨..Ä 000120
46800E76 FF1076FF 1FF609C2 9A006A00 6A0E76FF 1076FFFE 568CFC46 89EC468D .F&.F=.V±.v..v.j.j..ô.~..v..v..F 000140
88260B5E C40A5689 D84689EA 5688E846 88011FE9 0374C008 20260A58 9A5016E8 Õ.P.X.& .ât.Õ...FÕ.Võ.FÁ.VÕá^Ä&. 000160
067F217C 00E67E83 206100F0 9A5016E4 46805052 E25689E0 46894057 88263E47 G>&.W@.FÁ.VãRP.FÕ.P.Þ.a .~|.|!.. 000180
C40CC483 FF7AE80E 0676FF08 76FF0A76 FF0C76FF E076FFE2 76FF1974 00E47E83 .~Õ.t..vã.vÁ.v..v..v..v..Õz..á.á 0001A0
46804277 FF264477 FF26085E C4207609 C29A006A 006A4277 FF264477 FF26085E ^Ä&.wÕ&.wBj.j..ô.v á^Ä&.wÕ&.wB.F 0001C0
FFFF0648 9AFC76FF FE76FF0C 76FFDE76 FF009CE9 0374C008 1E8C0A58 9A5016DC É.P.X.¥..ât.Õ...v8.vÉ.v±.v=.K... 0001E0
```

```
Dump of file SATURN:[PCCOMMON.DUMP.DLL]BRDPLOW.TMP;1 on 18-APR-1990 10:38:06.00
File ID (528,44,0)   End of file block 272 / Allocated 272

Virtual block number 118 (00000076), 512 (0200) bytes

 88260788 26527208 47392606 7F5A7C0A 5739260A 5EC40257 88260788 26FC5EC4 á^=&..&.W.á^.&9W.|Z..&9G.rR&..&. 000000
 5EC40E57 88260C47 88260A5E C43A7208 47392606 7F427C0A 573926FC 5EC40257 W.á^=&9W.|B..&9G.r:á^.&.G.&.W.á^ 000020
 007F0657 39260A5E C40E5788 260C4788 261E7704 47392606 7C267F06 573926FC =&9W..&|.&9G.w.&.G.&.W.á^.&9W... 000040
 76FF0876 FF026ADC 76FFDE76 FF1574C0 08C02802 E80001B8 05770447 3926067C |.&9G.w.|..Š.+á.át..vB.vÉj..v..v 000060
 FFD88E1F CCB81E00 0032C8C8 C91F00E8 C028FECA E9FF48E9 0AC483FD 48E80E06 ..ÒK=.á.ÒH.Òò±+áŠ..èùá2...|ä..Ä. 000080
 C008217C 0A589A50 16EC4680 0E76FF10 76FF214C 09C29A00 6A006A0E 76FF1076 v..v.j.j..ò.L!.v..v..Fâ.P.X.|!.â 0000A0
 89E04689 40578826 3E478826 D65EC408 56890646 89EE5688 EC468801 7DE90374 t.Ò)..Fâ.VŸ.F=.VÁá^=&.G>&.W@.FÁ. 0000C0
 FFE276FF 197400E4 7E83067F 217C00E6 7E8321B7 00F09A50 16E44680 5052E256 VâRP.FÒ.P.Þ.ñ!.-!.|!...-ò.t..vâ. 0000E0
 4277FF26 4477FF26 D65EC40C C483FF83 E80E0676 FF0876FF 0A76FF0C 76FFE076 vÁ.v..v..v..v..Ò...á.á^=&.wÒ&.wB 000100
 C00821F3 0A589A50 160C4680 4277FF26 4477FF26 D65EC421 CC09C29A 006A006A j.j..ò.äIá^=&.wÒ&.wB.FÉ.P.X.µ!.â 000120
 006A006A 4877FF26 4A77FF26 D25EC4D4 56890246 89DE5688 DC468800 FAE90374 t.Ò*..FÉ.VB.F0.VÁá^0&.wJ&.wHj.j. 000140
 88E90374 C00B1FE6 0A589A50 16E84680 4877FF26 4A77FF26 D25EC422 0809C29A .ò..=á^0&.wJ&.wH.FÒ.P.X.!..át.Ò£ 000160
 89025788 26078826 CDE80274 C0080A46 89064788 26087401 047F8326 E85EC400 .á^Ò&....t.&.G..FÒ.át.Šeå..&.W.. 000180
 880A5EC4 000007E9 9A5016F0 4680016A 0677FF26 0877FF26 CE5EC400 5689CE46 Fö.VÁá^ò&.w.&.w.j..FÞ.P.Ò...á^.. 0001A0
 7C347F02 573926FA 5688F846 88407208 47392606 7F487C0A 573926F2 5688F046 FÞ.V·&9W.|H..&9G.rä.F½.V°&9W..4| 0001C0
 FE5688FC 46881972 0C473926 067F217C 0E573926 F65688F4 46882077 07392605 .&9.w-.F¶.V-&9W.|!..&9G.r..F=.V± 0001E0

Dump of file SATURN:[PCCOMMON.DUMP.DLL]BRDPLOW.TMP;1 on 18-APR-1990 10:38:06.00
File ID (528,44,0)   End of file block 272 / Allocated 272

Virtual block number 119 (00000077), 512 (0200) bytes

 0277FF26 E85EC420 74C008C0 2802E800 01880577 04473926 067C007F 06573926 &9W...|.&9G.w.|..Š.+á.át á^Ò&.w. 000000
 E9FEEAE9 FF29E90A C483F89A E80E0676 FF0876FF 03848 7FF E3D10A5E 8837FF26 &.7.^ÒlD.ñ...v..v..Ò.«.á.Ò).Òò±Ò 000020
 09C29A00 6A006A0E 76FF1076 FF088E21 28881E00 0032C8C8 C91F00E8 C028FE6C l±+áŠ..èùá2...|+!.Ä.v..v.j.j..ó. 000040
 89EE5688 EC468801 7EE90374 C0082330 0A589A50 16EC4680 0E76FF10 76FF2300 .#.v..v..F&.P.X.0#.át.Ò-..F&.VŸ. 000060
 00F09A50 16E44680 5052E256 89E04689 40578826 3E478826 D65EC408 56890646 F=.VÁá^=&.G>&.W@.FÁ.VâRP.FÒ.P.Þ. 000080
 FF0876FF 0A76FF0C 76FFE076 FFE276FF 197400E4 7E83067F 217C00E6 7E832368 k#.-!.|!...-ò.t..vâ.vÁ.v..v..v.. 0000A0
 D65EC423 8009C29A 006A006A 4277FF26 4477FF26 D65EC40C C483FF83 E80E0676 v..Ò...á.á^=&.wÒ&.wBj.j..ó..#á^= 0000C0
 890E5688 DC468800 F8E90374 C00823A7 0A589A50 160C4680 4277FF26 4477FF26 &.wÒ&.wB.FÉ.P.X.Ï#.át.Ò«..FÉ.VB. 0000E0
 4E77FF26 D25EC423 8C09C29A 006A006A 4C77FF26 4E77FF26 D25EC4D4 56890246 F0.Vâá^0&.wN&.wLj.j..ò.V#á^0&.wN 000100
 260C7401 047F8326 E85EC400 8CE90374 C008213C 0A589A50 16E84680 4C77FF26 &.wL.FÒ.P.X.<!.át.ÒV.á^Ò&....t.& 000120
 77FF26CE 5EC4D056 89CE4689 02578826 078826CC E8027400 0130DA46 89064788 .G..FÖ=..t.Šä&..&.W..Fö.VÁá^ö&.w 000140
 487C0A57 3926F256 88F04688 0A5EC400 0022489A 5016F046 80016A06 77FF2608 .&.w.j..FÞ.P.H"..á^..FÞ.V·&9W.|H 000160
 5688F446 88207707 3926057C 347F0257 3926FA56 88F84688 40720847 3926067F ..&9G.rä.F½.V°&9W..4|.&9.w-.F¶.V 000180
 47392606 7C007F06 573926FE 5688FC46 8819720C 47392606 7F217C0E 573926F6 -&9W.|!..&9G.r..F=.V±&9W...|.&9G 0001A0
 8487FFE3 010A5E88 37FF2602 77FF26E8 5EC42074 C008C028 02E80001 88057704 .w.|..Š.+á.át á^Ò&.w.&.7.^ÒlD.ñ. 0001C0
 30C8C8C9 1F00E8C0 28FE68E9 FEE9E9FF 28E90AC4 83F9E5E8 0E0676FF 0876FF03 ..v..v..Ò!•.á.Ò(.Òò±Òk±+áŠ..èùá0 0001E0

Dump of file SATURN:[PCCOMMON.DUMP.DLL]BRDPLOW.TMP;1 on 18-APR-1990 10:38:06.00
File ID (528,44,0). End of file block 272 / Allocated 272

Virtual block number 120 (00000078), 512 (0200) bytes

 248E09C2 9A006A00 6A0E76FF 1076FFFE 568CFC46 89EC4680 D88E220F 881E0000 ...¡Ô".Ä.F$.F•.V±.v..v.j.j..ò./$ 000000
 D44689EA 5688E846 880171E9 0374C008 22F00A58 9A5016E8 4680E076 FF1076FF .v..v..FÒ.P.X.Þ".át.Òq..FÒ.Vö.FÁ 000020
 252900F0 9A5016E0 46805052 DE56890C 46894057 88263E47 8826045E C4065689 .V=á^Á&.G>&.W@.FÉ.VBRP.FÁ.P.Þ.)% 000040
 0676FF08 76FF0A76 FF0C76FF DC76FFDE 76FF1974 00E07E83 067F217C 00E27E83 .-â.|!...-Á.t..vB.vÉ.v..v..v..v. 000060
 FF26045E C4253E09 C29A006A 006A4277 FF264477 FF26045E C40CC483 FF7AE80E .Òz..á.á^Á&.wÒ&.wBj.j..ò.>%á^Á&. 000080
 D046890A 5688D846 8800EEE9 0374C008 25650A58 9A501608 46804277 FF264477 wÒ&.wB.FÁ.P.X.e%.át.ÒŸ..FÄ.VÖ.FÁ 0000A0
 FF264A77 FF26005E C4257A09 C29A006A 006A4877 FF264A77 FF26005E C4025689 .V0á^Á&.wJ&.wHj.j..ò.z%á^Á&.wJ&. 0000C0
 2608E802 7402067F 8326E45E C400AFE9 0374C008 24AE0A58 9A5016E4 46804877 wH.FÒ.P.X.Û$.át.Ò£.á^Ò&....t.ŠÁ& 0000E0
 0A5EC402 57882607 8826FC5E C41CE204 869AFC76 FFFE76FF 016A37FF 260277FF .w.&.7j..v±.v=.Ñ.â.á^=&..&.W.á^. 000100
 067F427C 0A573926 FC5EC402 57882607 88265272 08473926 067F5A7C 0A573926 &9W.|Z..&9G.rR&..&.W.á^=&9W.|B.. 000120
 04473926 067C267F 06573926 FC5EC40E 5788260C 4788260A 5EC43A72 08473926 &9G.r:á^.&.G.&.W.á^=&9W..&|.&9G. 000140
 02E80001 88057704 47392606 7C007F06 5739260A 5EC40E57 88260C47 88261E77 w.&.G.&.W.á^.&9W...|.&9G.w.|..Š. 000160
 E90AC483 F834E80E 0676FF08 76FF056A 37FF2602 77FF26E4 5EC41974 C008C028 +á.át.á^Ò&.w.&.7j..v..v..Ò4½.á.Ò 000180
 6A0676FF 0876FF08 oE2494B8 1E00000C C8C8C91F 00E8C028 FE78E9FE F6E9FF35 5.Ò-±Òx±+áŠ..èùá....¡.$.Ä.v..v.j 0001A0
 8800A0E9 0374C008 24EE0A58 9A5016F4 46800676 FF0876FF 266609C2 9A006A00 .j..ò.f&.v..v..F¶.P.X.Ÿ$.át.Ò... 0001C0
 5EC40257 88260788 26F85EC4 FA5689F8 4689000C 05FE5689 FC4689F6 5688F446 F¶.V-.F•.V±....F½.V°á^½&..&.W.á^ 0001E0
```

```
Dump of file SATURN:[PCCOMMON.DUMP.DLL]BRDPLOW.TMP;1 on 18-APR-1990 10:38:06.00
File ID (528,44,0)   End of file block 272 / Allocated 272

Virtual block number 121 (00000079), 512 (0200) bytes

 7F427C0A 573926F8 5EC40257 88260788 26527208 47392606 7F5A7C0A 5739260A .&9W.|Z..&9G.rR&..&.W.á^%&9W.|B. 000000
 47392606 7C267F06 573926F8 5EC40E57 88260C47 88260A5E C43A7208 47392606 .&9G.r:á^.&.G.&.W.á^%&9W..&|.&9G 000020
 E8000188 05770-47 3926067C 007F0657 39260A5E C40E5788 260C4788 261E7704 .w.&.G.&.W.á^.&9W...|.&9G.w.|..Š 000040
 28FF49E9 0AC483F7 57E80E0E 76FF1076 FF066AF4 76FFF676 FF1574C0 08C02802 .+á.át..v-.v¶j..v..v..ÒWK.á.Ó1.+ 000060
 FF273009 C29A006A 006A0E76 FF1076FF D88E2645 881E0000 28C8C8C9 1F00E8C0 áŠ..èùà(...¡E&.Ä.v..v.j.j..ò.=‘. 000080
 89E04689 F65688F4 46880105 E90374C0 0827600A 589A5016 F44680DE 76FF1076 v..v..F¶.P.X.m‘.át.Ó1..F¶.V-.FÁ. 0000A0
 8327A800 F09A5016 EC468050 52EA5689 E8468940 5788263E 478826E0 5EC4E256 Vãá^Á&.G>&.WQ.FÒ.VÒRP.F&.P.Þ.´‘. 0000C0
 0E0676FF 0876FF0A 76FF0C76 FFE876FF EA76FF19 7400EC7E 83067F21 7C00EE7E ~Ÿ.|I...-&.t..vô.vÒ.v..v..v..v.. 0000E0
 77FF26E0 5EC427B0 09C29A00 6A006A42 77FF2644 77FF26E0 5EC40CC4 83FF83E8 Ò...á.á^Á&.wO&.wBj.j..ò.§‘á^Á&.w 000100
 890C4689 E65688E4 46880134 E90374C0 0828020A 589A5016 E4468042 77FF2644 D&.wB.FÒ.P.X..(.át.Ó4..FÒ.VI.FÉ. 000120
 0CC483FE 52E80E50 77FF2652 77FF260C 5EC40A76 FF0C76FF 0676FF08 76FFDE56 V8.v..v..v..v.á^É&.wR&.wP.ÒR±.á. 000140
 804C77FF 264E77FF 260C5EC4 281709C2 9A006A00 6A4C77FF 264E77FF 260C5EC4 á^É&.wN&.wLj.j..ò..(á^É&.wN&.wL. 000160
 0876FFDA 56890846 89025788 26078826 F05EC430 75C00828 5F0A589A 5016F046 FÞ.P.X._(.áuOá^Þ&..&.W..FÁ.VÒ.v. 000180
 DC5EC487 E80CC483 FDF7E80E 2677FF26 2877FF26 D85EC40A 76FF0C76 FF0676FF .v..v..v.á^Á&.w(&.w&.Ò%».á.Šñá^É 0001A0
 16F04680 4877FF26 4A77FF26 DC5EC428 7409C29A 006A006A 4877FF26 4A77FF26 &.wJ&.wHj.j..ò.t(á^É&.wJ&.wH.FÞ. 0001C0
 89025788 26078826 F05EC40C E848E806 478826F0 5EC47D75 C0082656 0A589A50 P.X.V&.áu)á^Þ&.G.ŠHŠÉá^Þ&..&.W.. 0001E0

Dump of file SATURN:[PCCOMMON.DUMP.DLL]BRDPLOW.TMP;1 on 18-APR-1990 10:38:06.00
File ID (528,44,0)   End of file block 272 / Allocated 272

Virtual block number 122 (0000007A), 512 (0200) bytes

 88260788 26F05EC4 33E8FE56 89FC4689 28578826 26478826 D85EC4DA 56890846 FÁ.VÒá^Á&.G&&.W(.F•.V±Š3á^Þ&..&. 000000
 3D8674C0 0810E8FE 5689FC46 89265788 26244788 26F85EC4 FA5689F8 46890257 W..F%.V•á^%&.G$&.W&.F•.V±Š..átÑ= 000020
 4EE80EFC 76FFFE76 FF0A76FF 0C76FF06 76FF0876 FFD0E8CF 7400023D AF740001 ..t€=..tüŠ..v..v..v..v..v±.v=.ÒN 000040
 77FF2668 77FF26E0 5EC40A76 FF0C76FF 0676FF08 76FFFE80 E9FF6AE9 0CC483FD ».á.Òj.Ò¯±.v..v..v..v.á^Á&.wh&.w 000060
 08064688 D88E271C 881E0000 22C8C8C9 1F00E8C0 28FE14E9 0CC483FD 2AE80E66 f.Ò*».á.Ò.±+áŠ..èùà"...|.‘.Ä.F.. 000080
 8826065E C4FE568C FC4689EC 46800189 E98DF388 06751046 080E4688 08740846 F.t..F..F.u.|µ.Ò...F&.F•.V±á^.&. 0000A0
 006A5052 E85689F‘ 46891657 88261447 8826E25E C4E45689 E2468902 57882607 .&.W..Fã.VÒá^ã&.G.&.W..FI.VÒRPj. 0000C0
 5EC40139 E90374(  08272D0A 589A5016 DE4680E6 76FFE876 FF298509 C29A006A j..ò..).vÒ.vI.F8.P.X.-‘.át.Ò9.á^ 0000E0
 8AE90375 D0080C56 230A4623 03669788 03648788 02E3C108 88EA4689 0788260E B&...Fõ.ÁèÐ...d...f.#F.#V..Åu.Ò. 000100
 003605E0 56880E46 8874E8FE 5689FC46 89001605 E05688DE 468869E8 EA468800 ..FõŠi.F8.VÁ....F•.V±Št.F8.VÁ.6. 000120
 000023FD 9AFC76FF FE76FF01 6A0677FF 260877FF 260E5EC4 63E8FE56 89FC4689 .F•.V±Šcá^8&.w.&.w.j..v±.v•.»#.. 000140
 880E4688 2FE80000 FFFF9AFC 76FFFE76 FF016A06 77FF2608 77FF260E 5EC449E8 Š1á^8&.w.&.w.j..v±.v=.....Š/.F8. 000160
 862A2FA7 FF2E93C0 03147700 05300001 2D1CE81E E8FE5689 FC468900 0C05E056 VÁ....F•.V±Š.Š.·..=..w..á...|/*Ñ 000180
 067F5A7C 0A573926 0E5EC402 57882607 8826FC5E C42A0C29 F2290829 D829C729 )ú)Ä)Á)·).*á^=&..&.W.á^.&9W.|Z.. 0001A0
 5EC43A72 08473926 067F427C 0A573926 FC5EC402 57882607 88265272 08473926 &9G.rR&..&.W.á^=&9W.|B..&9G.r:á^ 0001C0
 88260C47 88261E77 04473926 067C267F 06573926 FC5EC40E 5788260C 4788260E .&.G.&.W.á^=&9W..&|.&9G.w.&.G.&. 0001E0

Dump of file SATURN:[PCCOMMON.DUMP.DLL]BRDPLOW.TMP;1 on 18-APR-1990 10:38:06.00
File ID (528,44,0)   End of file block 272 / Allocated 272

Virtual block number 123 (0000007B), 512 (0200) bytes

 76FF1674 C008C028 02E80001 88057704 47392606 7C007F06 5739260E 5EC40E57 W.á^.&9W...|.&9G.w.|..Š.+á.át..v 000000
 0AC8C8C9 1F00E8C0 28FE80E9 0AC483F3 9FE80E06 76FF0876 FFEA76FF DE76FFE0 Á.v8.vò.v..v..Ò.µ.á.Ó¯±+áŠ..èùà. 000020
 5689F846 89007805 FE5689FC 46890257 88260788 26065EC4 088E2928 881E0000 ...¡().Áá^.&..&.W..F•.V±.x..F%.V 000040
 078826F8 5EC4014F E9037C00 063DF646 FFF64688 02F84683 04E80000 F646C7FA ªúF-..Š..F%..F-.F-=..|.ÒO.á^%&.. 000060
 76FF0C76 FF0E76FF 1076FF19 74D00803 6A162303 68062314 56881246 880114E9 Ò...F..V.#.h.#.j..Åt..v..v..v..v 000080
 08036E16 23036C06 23145688 12468801 15E90CC4 83F36AE8 0E0676FF 0876FF0A ..v..v..Òjµ.á.Ò...F..V.#.l.#.n.. 0000A0
 8800E7E9 0CC483F4 5DE80E06 76FF0876 FF0A76FF 0C76FF0E 76FF1076 FF1974D0 Åt..v..v..v..v..v..v..Ò]¶.á.ÒÒ.. 0000C0
 0876FF0A 76FF0C76 FF0E76FF 1076FF19 74D00803 72162303 70062314 56881246 F..V.#.p.#.r..Åt..v..v..v..v..v. 0000E0
 FF1974D0 08037616 23037406 23145688 12468800 89E90CC4 83F58EE8 0E0676FF .v..Ò.%.á.Ò¿..F..V.#.t.#.v..Åt.. 000100
 56881246 880088E9 0CC483F7 14E80E06 76FF0876 FF0A76FF 0C76FF0E 76FF1076 v..v..v..v..v..v..Ò.%.á.Ò...F..V 000120
 0E0676FF 0876FF0A 76FF0C76 FF0E76FF 1076FF19 74D00803 7A162303 78062314 .#.x.#.z..Åt..v..v..v..v..v..v.. 000140
 0E76FF10 76FF1974 0008037E 1623037C 06231456 88124688 5EE80CC4 83F898E8 Ò.%.á.Š^.F..V.#.|.#.~..Åt..v..v. 000160
 3DFEE4E9 03750001 302FE831 E80CC483 FAF6E80E 0676FF08 76FF0A76 FF0C76FF .v..v..v..v..Ò-•.á.Š1Š/=..u.ÒÒ±= 000180
 3DFF7CE9 03750005 3DFF56E9 03750004 3DFF30E9 03750003 3DFF0AE9 03750002 ..u.Ò..=..u.ÒO.=..u.ÒV.=..u.Ò|.= 0001A0
 83FC83E8 0E0676FF 0876FF12 76FF1476 FF0A76FF 0C76FFFE 9FE900E8 A4740006 ..tÉŠ.Ò.±.v..v..v..v..v..v..Ò'•. 0001C0
 085C0002 00000003.208E0002 02600005 081C0203 001090C8 C91F00E8 C02B0CC4 á.+áŠ..èù........‘.... ......\. 0001E0
```

Dump of file SATURN:[PCCOMMON.DUMP.DLL]BRDPLOW.TMP;1 on 18-APR-1990 10:38:06.00
File ID (528,44,0)   End of file block 272 / Allocated 272

Virtual block number 124 (0000007C), 512 (0200) bytes

```
06880203 001400U, 03960203 027F0005 088A0203 00000007 25A10002 00000006 ......ÀX.......................E. 000000
10F40002 00000314 29750002 00A80004 09120203 021E0004 2A060203 00220003 ..".....*...............u)......¶. 000020
29EC0203 00000019 2AD40002 02360005 00690203 008D0004 09440203 00000017 ......D...§...i...6...Å*......&) 000040
0E6A0A76 FFD88EFF FF881E56 00000AC8 00000000 024C0005 07330203 00CC0004 ..ä...3...L.....à...V.|...Ä.v.j. 000060
C4078926 0A4688F6 5EC40083 E98DF288 0674C008 0000FFFF 9A5016F6 468D246A j$.F-.P......ât.|.Ö..á^-.F.&..á 000080
0A76FF50 16FA468D 457D04FE 7E83FE46 FF03E800 00FE46C7 00012247 C726F65E ^-&uG"..úF±..$..F±.-±.)E.F*.P.v. 0000A0
FC5688FA 4688F65E C402E6C1 FE768848 E88DF288 0574C008 06C483FF FF02379A .7....á..ât.|.$H.v±èl.á^-.F*.V= 0000C0
06468882 E8124089 26144089 26C028F6 5EC402E6 C1FE7688 04508926 02408926 &.a.&.P..v±èl.á^-+á&.a.&.a.$ý.F. 0000E0
C80006CA C95E1F00 E8C02802 57892607 8926F856 88F64688 065EC410 74084608 .F.t.á^..F-.V%&..&.W.+áS..^èb..à 000100
F4468908 56880646 88008FE9 8DF58806 75084608 064688D8 8E0007B8 1E000010 ....|...Ä.F..F.u.|%.Ö...F..V..F¶ 000120
7D04FC7E 83FC46FF 03E80000 FC46C700 0007C726 FE468907 8826F45E C4F65689 .V-á^¶&...F±&ú...úF•..$..F=.-•.) 000140
02578826 078826F0 5EC4F256 89F04689 000205F6 5688F446 0302E0C1 FC4688 4A J.F=èÀ..F¶.V-....FÞ.V.á^Þ&..&.W. 000160
06C48300 5302819A FE76FFF8 76FFFA76 FF078926 02478926 C028FA56 89F84689 .F%.V*+á&.G.&...v*.v%.v±...S..á. 000180
8DF28805 74C00800 00FFFF9A F476FFF6 76FFFE76 FFADE81D E88DF288 0574C008 .ât.|.S.$Ü.v±.v-.v¶......ât.|.. 0001A0
8806750C 46080A46 88088E00 85881E56 57000014 C80004CA C91F00E8 C02804E8 $.+áS..èb..à...WV.|Ç..Ä.F..F.u.| 0001C0
80246A0E 6A50F64C 89078826 EC5EC4EE 5689EC46 890C5688 0A468800 DAE98DF5 %.ÖÖ..F..V..F&.VYá^$&...F-Pj.j$. 0001E0
```

Dump of file SATURN:[PCCOMMON.DUMP.DLL]BRDPLOW.TMP;1 on 18-APR-1990 10:38:06.00
File ID (528,44,0)   End of file block 272 / Allocated 272

Virtual block number 125 (0000007D), 512 (0200) bytes

```
F47E83F4 46FF03E8 0000F446 C700ACE9 8DF28806 74C00800 0000189A 5016FC46 F•.P......ât.|.Ö¯.úF¶..$..F¶.-¶ 000000
525016F8 468DF256 89F04689 04508826 02408826 EC5EC402 E6C1F476 88697D04 .)i.v¶èl.á^&&.a.&.P..FÞ.V..F%.PR 000020
FC5EC402 E7C1F47E 8868E880 F2880574 C0080AC4 83012802 A09AF676 FFF076FF .vÞ.v-...+..á..ât.|..$h.-¶èÖ.á^• 000040
C4145088 26124088 26EC5EC4 02E6C1F4 76880451 89260241 8926FA56 88F84688 .F%.V*&.A.&.Q..v¶èl.á^&&.a.&.P.á 000060
26FC5EC4 22478826 EC5EC407 8926F646 88FC5EC4 8EE81450 89261240 8926FC5E ^•&.a.&.P.$.á^•.F-&..á^&&.G"á^•& 000080
1F00E8C0 28025789 26078926 FE5688FC 4688065E C4107408 46080646 88224789 .G".F..F.t.á^..F•.V±&..&.W.+áS.. 0000A0
8800F9E9 8DF58806 75104608 0E468808 8E016388 1E560000 0CC80008 CAC95F5E ^_èb..à...V.|c..Ä.F..F.u.|%.Ö*.. 0000C0
890C5688 0A468800 DFE98DF5 8806750C 46080A46 88FC5689 FA468910 56880E46 F¯.V..F*.V•.F..F.u.|%.ÖÖ..F..V.. 0000E0
E90000F4 46C70874 22473926 FA5EC422 478826F6 5EC40001 F446C7F8 5689F646 F-.V%úF¶..á^-&.G"á^*&9G"t.úF¶..Ö 000100
04FE7E83 327400F4 7E83FE46 FF03E800 00FE46C7 0097E903 7400227F 832600A1 À.&..".t.Ö..úF±..$..F±.-¶.t2.-±. 000120
14503926 06751240 3926FA5E C4145088 26124088 26F65EC4 02E6C1FE 76882C7D ),.v±èl.á^-&.a.&.P.á^*&9a.u.&9P. 000140
7E834574 00F47E83 FE46FF03 E80000FE 46C7C5E8 F44689C0 2802E800 01880574 t.|..$.+á.F¶$éúF±..$..F±.-¶.tE.- 000160
70FF26FA 5EC40270 FF260470 FF26F65E C45016F4 468D02E6 C1FE7688 3F7D04FE ±.)?.v±èl..F¶.Pá^-&.p.&.p.á^*&.p 000180
00FFFF9A 00EF6803 8A681E03 E3681E10 74C0080C C48301D9 038E9A02 70FF2604 .&.p....l..á..ât..hD..ha.hÿ..... 0001A0
06C8000C CAC95E1F 00E8C028 078926F4 4688065E C4097408 46080646 88B2E800 .$ý.F..F.t.á^..F¶&..+áS..^èb..à. 0001C0
89FA4689 08568806 468863E8 8DF58805 75084608 06468808 8E025D88 1E560000 ..V.|)..Ä.F..F.u.|%.$c.F..V..F*. 0001E0
```

Dump of file SATURN:[PCCOMMON.DUMP.DLL]BRDPLOW.TMP;1 on 18-APR-1990 10:38:06.00
File ID (528,44,0)   End of file block 272 / Allocated 272

Virtual block number 126 (0000007E), 512 (0200) bytes

```
260470FF 26FA5EC4 02E6C1FE 76883A7D 04FE7E83 FE46FF03 E80000FE 46C7FC56 V=úF±..$..F±.-±.):.v±èl.á^*&.p.& 000000
FA5EC402 E6C1FE76 8822E880 F2880574 C00806C4 83033804 679A37FF 240270FF .p.&.7.g.8..á..ât.|..$".v±èl.á^* 000020
C80004CA C95E1F00 E8C02800 012247C7 26FA5EC4 80E81240 89261440 89c4C028 +á&.a.&.a.$§á^*&uG"..+áS..^èb..à 000040
89FC4689 0C56880A 468825E8 8DF58805 750C4608 0A468808 8E037588 1E0L 004 ....|u..Ä.F..F.u.|%.$%.F..V..F•. 000060
0008CAC9 1F00E8C0 28078926 065EC422 478826FC 5EC40D74 08460806 4688FE56 V±.F..F.t.á^•&.G"á^.&..+áS..èb.. 000080
FC46890C 56880A46 8824E880 F5880575 0C46080A 4688D88E 03F5881E 000004C8 à....|%..Ä.F..F.u.|%.$$.F..V..F• 0000A0
0008CAC9 1F00E8C0 28078926 065EC407 8826FC5E C40C7408 46080646 88FE5689 .V±.F..F.t.á^•&..á^.&..+áS..èb.. 0000C0
46891056 880E4688 0095E980 F5880675 1046080E 4688D88E 0436881E 000006C8 à....|6..Ä.F..F.u.|%.Ö...F..V..F 0000E0
46880A5E C409740C 46080A46 88FA4689 08F7C018 01227F83 26FC5EC4 FE5689FC •.V±á^•&..".*ÄXÄ.F*.F..F.t.á^..F 000100
065EC414 57882612 478826FC 5EC45774 08460806 46885F74 00FA7E83 078926FA *&...~*.t_.F..F.tWá^•&.G.&.W.á^. 000120
FC5EC406 57892604 47892606 5EC41857 88261647 8826FC5E C4025789 26078926 &..&.W.á^=&.G.&.W.á^.&.G.&.W.á^• 000140
5EC42057 88261E47 8826FC5E C40A5789 26084789 26065EC4 1C578826 1A478826 &.G.&.W.á^.&.G.&.W.á^•&.G.&.W á^ 000160
4688D88E 0476881E 56570000 0CC8000C CAC91F00 E8C0280E 5789260C 47892606 .&.G.&.W.+áS..èb..à...WV.|v..Ä.F 000180
00227F83 26FC5EC4 FE5689FC 46890C56 880A4688 013EE980 F5880675 0C46080A ..F.u.|%.Ö>..F..V..F=.V±á^•&..". 0001A0
F84688FE 468E1FA5 A5A5A5DA 8E1E0716 F088F47E 80085688 06468801 21E90374 t.Öl..F..V..-¶.Þ....ÖEEEE..F±.F% 0001C0
05C80516 9A0677FF 260877FF 26FC5EC4 5016F446 8D185711 26164701 26FA5688 .V*&.G.&.W..F¶.Pá^=&.w.&.w....Ù. 0001E0
```

```
Dump of file SATURN:[PCCOMMON.DUMP.DLL]BRDPLOW.TMP;1 on 18-APR-1990 10:38:06.00
File ID (528,44,0)   End of file block 272 / Allocated 272

Virtual block number 127 (0000007F), 512 (0200) bytes

 FA568BF8 4688FC5E C4000005 E09A0179 6803E968 1E041268 1E1074C0 0808C483 .á..ât..h...hõ.hy..Å...á^•.F%.V• 000000
 08C48303 8905169A 0E77FF26 1077FF26 FC5EC450 16F4468D 20571126 1E470126 &.G.&.W .F¶.Pá^•&.w.&.w....¿..á. 000020
 89065788 260447Ua 26065EC4 00000340 9A017D68 0418681E 0441681E 1074C008 .ât..hA..h..h)..M...á^.&.G.&.W.. 000040
 F4468014 57112612 470126FC 5EC4FA56 89F84689 02578826 078826F6 5689F446 F¶.V-&..&.W..F%.V•á^•&.G.&.W..F¶ 000060
 47681E04 70681E1u 74C00808 C483065D 05169A02 77FF2604 77FF26FC 5EC45016 .Pá^•&.w.&.w....]..á..ât..hp..hG 000080
 C45016F4 46801C57 11261A47 0126FA56 88F8468B FC5EC400 0006729A 01856804 .h...r...á^•.F%.V•&.G.&.W..F¶.Pá 0000A0
 89680476 681E049F 681E1074 C00808C4 83058E05 169A0A77 FF260C77 FF26FC5E ^•&.w.&.w.......á..át..h...hv.h. 0000C0
 080A468B D88E052A 881E5600 0012C800 08CAC95F 5E1F00EB C02B0000 05A39A01 ..É...+âŠ..^_èò..à...V.¡*..Ã.F.. 0000E0
 F5B80675 08460806 4688F856 89F64689 0C56880A 4688015B E980F5B8 06750C46 F.u.¡%.Õ(..F..V..F-.V%.F..F.u.¡% 000100
 FA46C701 24E90374 00227F83 26FC5EC4 FE5689FC 46890856 88064688 0141E98D .ÕA..F..V..F•.V±á^•&..".t.Õ$.úF• 000120
 26FC5EC4 03B2B7FF E301FA5E 8802E6C1 FA76883C 7D04FA7E 83FA46FF 03E80000 ..Š..F*.-*.)<.v•èl..^*1D.ñý.á^•& 000140
 74C0080C C4830620 0AFD9A37 FF260270 FF260470 FF26F65E C40270FF 260470FF .p.&.p.á^-&.p.&.p.&.7.». ..á..ât 000160
 478926F6 5EC42247 8826FC5E C43F7400 227F8326 F65EC488 E8000EE9 8DF28806 .¡·.Õ8.ŠEá^-&..".t7á^•&.G"á^-&.G 000180
 88261240 8826FC5E C402E6C1 FA76881E 7D04FA7E 83FA46FF 03E80000 FA46C722 "úF*..Š.:F*.-*.)..v•èl.á^•&.ə.&. 0001A0
 04FA7E83 FA46FF03 E80000FA 46C7008F E9D9E814 50892612 408926F6 5EC41450 P.á^-&.ə.&.P.$1Õ..úF*..Š..F*.-*. 0001C0
 12408826 F65EC4F4 5689F246 89145088 26124088 26FC5EC4 02E6C1FA 76887F7D )..v•èl.á^•&.ə.&.P..F·.V¶á^-&.ə. 0001E0

Dump of file SATURN:[PCCOMMON.DUMP.DLL]BRDPLOW.TMP;1 on 18-APR-1990 10:38:06.00
File ID (528,44,0)   End of file block 272 / Allocated 272

Virtual block number 128 (00000080), 512 (0200) bytes

 F2463905 7F187CF4 56391F74 0003828F 83E3D1FA 5E88F056 89EE4689 14508826 &.P..FŸ.Vp.^*1D.eý..t.9V¶|...9F· 000000
 1E7FF456 39F0568B EE468829 E8145089 26124089 26F4568B F2468BF6 5E881176 v..^-.F·.V¶&.ə.&.P.$).FŸ.Vp9V¶.. 000020
 78E91450 89261240 8926F456 88F2468B F65EC402 E6C1FA76 881773F2 4639057C |.9F·s..v•èl.á^-.F·.V¶&.ə.&.P.Õx 000040
 F5B80675 0C46080A 4688088E 0688881E 56000016 C80008CA C95E1F00 EBC02BFF .+âŠ..^èò..à...V.¡...Ã.F..F.u.¡% 000060
 037C04F6 7E83F646 FF03E800 00F646C7 F05689EE 46890C56 880A468B 020DE98D .Õ...F..V..FŸ.VpúF-..Š..F-.—.|. 000080
 FA5689F8 46890657 88260447 8826065E C400CDE9 03AA8788 E3D1F65E 8801DAE9 ÕÕ..^-1D..˙.Õë.á^.&.G.&.W..F%.V• 0000A0
 5EC4008D E9F45689 F2468902 57882607 8826FE56 89FC4689 0E578826 0C478826 &.G.&.W..F•.V±&..&.W..F·.V¶Õ§.á^ 0000C0
 04478826 FE5689FC 46890A57 88260847 8826FA56 89F84689 02578826 07882606 .&..&.W..F%.V•&.G.&.W..F•.V±&.G. 0000E0
 8826FA56 89F84689 06578826 04478826 065EC400 8EE9F456 89F24689 06578826 &.W..F·.V¶Õ..á^.&.G.&.W..F%.V•&. 000100
 26065EC4 5FE8F456 89F24689 0A578826 08478826 FE5689FC 46890E57 88260C47 G.&.W..F•.V±&.G.&.W..F·.V¶$_á^.& 000120
 88260C47 8826FE56 89FC4689 0A578826 08478826 FA5689F8 46890257 88260788 ..&.W..F%.V•&.G.&.W..F•.V±&.G.&. 000140
 7500013D 1FE80000 06359A01 F56804A5 681E04CE 681E31E8 F45689F2 4ú90E57 W..F·.V¶$1.hö..hE.h%..5...Š.=..u 000160
 76FFF476 FFCFE8FF 74E90375 00083DFF 1EE90375 000430B3 7400023D FF:\E903 .Õz.=..t*=..u.Õ..=..u.Õt.Šü.v¶.v 000180
 26EE5EC4 02E6C1F6 76880382 87FFE3D1 F65E88F8 76FFFA76 FFFC76FF FE7cFFF2 ·.v±.v•.v•.v%.^-1D.ñý..v-èl.á^Ÿ& 0001A0
 26EE5EC4 0085E98D F2880674 C00814C4 83070805 A19A37FF 260270FF 260470FF .p.&.p.&.7.Å....á..ât.¡·.Õç.á^Ÿ& 0001C0
 D1F65E88 7EE81450 89261240 8926F456 88F2468B 02E6C1F6 76881674 00227F83 ..".t..v-èl..F·.V¶&.ə.&.P.Š-.^-1 0001E0

Dump of file SATURN:[PCCOMMON.DUMP.DLL]BRDPLOW.TMP;1 on 18-APR-1990 10:38:06.00
File ID (528,44,0)   End of file block 272 / Allocated 272

Virtual block number 129 (00000081), 512 (0200) bytes

 EA5EC4EC 5689EA46 89001205 F0568BEE 460302E0 C1F6468B 3A740003 B2BF83E3 D.eý..t:.F-èÃ..FŸ.Vp....Fõ.V±á^õ 000000
 02578926 078926F4 568BF246 880D7307 3926057C 147F0257 3926F456 88F2468B .F·.V¶&9W...|.&9.s..F·.V¶&..&.W. 000020
 F4568BF2 4688EA5E C4EC5689 EA468900 1205F056 88EE4603 02E0C1F6 46883BEB Š8.F-èÃ..FŸ.Vp....Fõ.V±á^õ.F·.V¶ 000040
 EE5EC4FE 1AE90257 89260789 26F4568B F246880D 76073926 057F147C 02573926 &9W.|...&9.v..F·.V¶&..&.W.Õ.±á^Ÿ 000060
 0802B81E 5600000E C80008CA C95E1F00 EBC02B00 002247C7 26067400 227F8326 &..".t.&úG"..+âŠ..^èò..à...V.¡.. 000080
 080A468B F45689F2 46891056 880E4688 00C1E98D F5B80675 1046080E 4688088E .Ã.F..F.u.¡%.Õè..F..V..F·.V¶.F.. 0000A0
 07740022 7F8326F8 5EC4FA56 89F84689 0C56880A 468800A7 E98DF588 06750C46 F.u.¡%.ÕÏ..F..V..F%.V•á^%&..".t. 0000C0
 C1F6768B 607D04F6 7E83F646 FF03E800 00F646C7 0000FE46 C775E800 00FE46C7 úF±..ŠuúF±..úF-..Š..F-.-—.)'.v-è 0000E0
 FF26F25E C40270FF 260470FF 26F85EC4 03B2B7FF E301F65E 885016FC 468D02E6 Ì..F•.P.^-1D.ñý.á^%&.p.&.p.á^·&. 000100
 09069A02 36680404 681E04FD 681E1074 C0080EC4 83095D0C E79A0270 FF260470 p.&.p..Õ.]..á..ât..h»..hå.hó.... 000120
 08064688 97E80001 FE46C705 7502FC7E 8308E824 E88E1188 077503FC 7E830000 ...-=.u.¡..$$$..-•.u.úF±..Š..F.. 000140
 0A2E881E 56000014 C8000CCA C95E1F00 E8C02807 8926FE46 88065EC4 09740846 F.t.á^..F±&..+âŠ..^èò..à...V.¡.. 000160
 00F446C7 EE5689EC 46891056 880E4688 0193E980 F5B80675 1046080E 4688088E .Ã.F..F.u.¡%.Õ...F..V..F£.VŸúF¶. 000180
 88260A5E C400CDE9 03AA8788 E301F45E 880170E9 037C04F4 7E83F446 FF03E800 .Š..F¶.-¶.|.Õp..^¶1D..˙.Õë.á^.&. 0001A0
 57882607 8826FE56 89FC4689 0E578826 0C478826 FA5689F8 46890657 88260447 G.&.W..F%.V•&.G.&.W..F•.V±&..&.W 0001C0
 88260847 8826FA56 89F84689 02578826 0788260A 5EC400BD E9F25689 F0468902 ..Fp.V·Õ§.á^.&..&.W..F%.V•&.G.&. 0001E0
```

```
Dump of file SATURN:[PCCOMMON.DUMP.DLL]BRDPLOW.TMP;1 on 18-APR-1990 10:38:06.00
File ID (528,44,0)   End of file block 272 / Allocated 272

Virtual block number 130 (00000082), 512 (0200) bytes

04478826 0A5EC400 8EE9F256 89F04689 06578826 04478826 FE5689FC 46890A57 W..F=.V±&.G.&.W..Fþ.V·Ö..á^.&.G. 000000
0A578826 08478826 FE5689FC 46890E57 88260C47 8826FA56 89F84689 06578826 &.W..F½.V°&.G.&.W..F=.V±&.G.&.W. 000020
0A578826 08478826 FA5689F8 46890257 88260788 260A5EC4 5FE8F256 89F04689 .Fþ.V·Š_á^.&..&.W..F½.V°&.G.&.W. 000040
72680503 681E052C 681E31E8 F25689F0 46890E57 88260C47 8826FE56 89I.'689 .F=.V±&¯G.&.W..Fþ.V·$1.h,..h..hr 000060
000830FF 1EE90375 00043083 74000230 FF5AE903 75000130 1FE80000 0C80> 02 ......$.=..u.ÖZ.×..t°=..u.Ö..=.. 000080
5E88F876 FFFA76FF FC76FFFE 76FFF076 FFF276FF 5016F646 8DCFE8FF 74E903'5 u.Öt.Šü.F-.P.v·.vþ.v±.v=.v°.v½.^ 0000A0
16C4830A 8908AA9A 0270FF26 0470FF26 EC5EC402 E6C1F476 88038287 FFE301F4 ¶ID.ñý..v¶èl.á^&&.p.&.p..¯.¿..á. 0000C0
EB24EB8E 11880775 03F67E83 00000ACE 9A027668 0532681E 0558681E 1074C008 .át..h[..h2.hv..ö....¬¯.u.¡..$S$ 0000E0
28FE84E9 07892606 5EC4C028 02E80001 88057502 F67E8313 74084608 06468818 ..F..F.t..¬¯.u.|..$.+áá^.&..Ö.±+ 000100
1EE980F5 88067512 46081046 88D88E08 0E881E00 0012C800 0CCAC95E 1F00E8C0 á$..^èò..à....¡...Ã.F..F.u.¡%.Ö. 000120
56880A46 880104E9 8DF58806 750C4608 0A4688F0 5689EE46 89125688 10468801 ..F..V..FŸ.Vþ.F..F.u.¡%.Ö...F..V 000140
F4468904 57882602 478826EE 5EC40000 F246C700 ACE90E46 88FA5689 F846890C ..F½.V°.F.Ö¯.úF·..á^Y&.G.&.W..F¶ 000160
26EE5EC4 0000F246 C7009EE9 FE5689FC 46890C57 88260A47 8826F85E C4F65689 .V-á^½&.G.&.W..F=.V±Ö..úF·..á^Y& 000180
75E8FE56 89FC4689 10578826 0E478826 F85EC4F6 5689F446 89085788 26064788 .G.&.W..F¶.V-á^½&.G.&.W..F=.V±$u 0001A0
57882602 478826F8 5EC4F656 89F44689 0C578826 0A478826 EE5EC400 01F246C7 úF·..á^Y&.G.&.W..F¶.V-á^½&.G.&.W 0001C0
C4F65689 F4468910 5788260E 478826EE 5EC40001 F246C74C E8FE5689 FC468904 ..F=.V±ŠLúF·..á^Y&.G.&.W..F¶.V-á 0001E0

Dump of file SATURN:[PCCOMMON.DUMP.DLL]BRDPLOW.TMP;1 on 18-APR-1990 10:38:06.00
File ID (528,44,0)   End of file block 272 / Allocated 272

Virtual block number 131 (00000083), 512 (0200) bytes

76E90375 0001301C E848E88D F38823E8 FE5689FC 46890857 88260647 8826F85E ^½&.G.&.W..F=.V±Š#¡µ.$H$.=..u.Öv 000000
76FFFE76 FF0676FF 0876FFD0 E8807400 0830FF3F E9037500 043DC374 000230FF .=..tû=..u.Ö?.=..t.$Ï.v..v..v±.v 000020
1F00E8C0 2804E88E 10880574 C0080EC4 830C680F 509AF476 FFF676FF F276FFFC •.v·.v¬.v¶.].k..á..ât.¡..$.+á$.. 000040
88104688 0181E98D F5880675 12460810 46880888 0C8F881E 000016C8 000ECAC9 èò..à....¡¢..Ã.F..F.u.¡%.Ö...F.. 000060
46890457 88260247 8826EA5E C40000EE 46C7011A E90E4688 EC5689EA 46891256 V..Fõ.V$.F.Ö..úFŸ..á^ö&.G.&.W..F 000080
FC46890E 5788260C 478826FA 5689F846 89065788 26044788 260A5EC4 F25689F0 Þ.V·á^.&.G.&.W..F½.V°&.G.&.W..F= 0000A0
06478826 EA5EC400 00EE46C7 00F3E9F6 5689F446 890A5788 26084788 26FE5689 .V±&.G.&.W..F¶.V-Öµ.úFŸ..á^ö&.G. 0000C0
88260847 8826FA56 89F84689 02578826 0788260A 5EC4F256 89F04689 08578826 &.W..Fþ.V·á^.&..&.W..F½.V°&.G.&. 0000E0
5EC40001 EE46C700 AEE9F656 89F44689 0E578826 0C478826 FE5689FC 46890A57 W..F=.V±&.G.&.W..F¶.V-ÖÜ.úFŸ..á^ 000100
FA5689F8 46890657 88260447 88260A5E C4F25689 F046890C 5788260A 478826EA ö&.G.&.W..Fþ.V·á^.&.G.&.W..F½.V° 000120
EE46C76A E8F65689 F4468902 57882607 8826FE56 89FC4689 0E578826 0C478826 &.G.&.W..F=.V±&..&.W..F¶.V-ŠjúFŸ 000140
F8468902 57882607 88260A5E C4F25689 F0468910 5788260E 478826EA 5EC40001 ..á^ö&.G.&.W..Fþ.V·á^.&..&.W..F½ 000160
E8F65689 F4468906 57882604 478826FE 5689FC46 890A5788 26084788 26FA5689 .V°&.G.&.W..F=.V±&.G.&.W..F¶.V-$ 000180
000830FE 01E90375 000430A8 74000230 FF24E903 75000130 1FE857E8 8DF38826 &¡µ.$W$.=..u.Ö$.=..t¨=..u.Öi±=.. 0001A0
FFF876FF FA76FFFC 76FFFE76 FFF476FF F676FF06 76FF0876 FFDAE8FF 54E90375 u.ÖT.ŠÖ.v..v..v¬.v¶.v±.v=.v°.v½. 0001C0
CAC91F00 E8C02804 E88E1088 0574C008 16C48300 DD0DE69A F076FFF2 76FFEE76 vŸ.v·.vþ.Ì.ï..á..ât.¡..$.+á$..èò 0001E0

Dump of file SATURN:[PCCOMMON.DUMP.DLL]BRDPLOW.TMP;1 on 18-APR-1990 10:38:06.00
File ID (528,44,0)   End of file block 272 / Allocated 272

Virtual block number 132 (00000084), 512 (0200) bytes

0C56880A 46880152 E980F588 06750C46 080A4688 D88E0DFA 881E0000 04C8000E ..à....¡°..Ã.F..F.u.¡%.ÖR..F..V. 000000
61681E0A 76FF0C76 FF085E8C 06468908 64880975 08460806 4688FE56 89FC4689 .F=.V±.F..F.u.¡d..F..^..v..v..ha 000020
0876FF05 6C681E14 7400227F 8326FC5E C40CC483 0FF60010 9A0676FF 0876FF05 ..v..v....¬..á.á^=&..".t..hl..v. 000040
1A77FF26 1C77FF26 1E77FF26 2077FF26 FC5EC435 E808C483 10200010 9A0676FF .v....¯..à.$5á^=&.w &.w.&.w.&.w. 000060
83103F00 109A0676 FF0876FF 0583681E 1277FF26 1477FF26 1677FF26 1877FF26 &.w.&.w.&.w.&.w..h...v..v....?.. 000080
26FC5EC4 006A0676 FF0876FF 08C48310 6C00109A 0676FF08 76FF05A8 681E18C4 á..h´..v..v....l..á..v..v.j.á^=& 0000A0
C4831099 00109A06 76FF0876 FF05B668 1E0AC483 10871150 9A0277FF 260477FF .w.&.w..P....á..hÑ..v..v.......á 0000C0
05C4681E 0AC48310 8411509A 0677FF26 0877FF26 FC5EC400 6A0676FF 0876FF08 ..v..v.j.á^=&.w.&.w..P.Ç..á..há. 0000E0
77FF260C 77FF26FC 5EC4016A 0676FF08 76FF08C4 8310C600 109A0676 FF0876FF .v..v....ó..á..v..v.j.á^=&.w.&.w 000100
76FF0876 FF08C483 10F30010 9A0676FF 0876FF05 D2681E0A C48310E1 11509A0A ..P.Ã..á..h@..v..v....µ..á..v..v 000120
0676FF08 76FF05E0 681E0AC4 830F7811 509A0E77 FF261077 FF26FC5E C4016A06 .j.á^=&.w.&.w..P.(..á..hÂ..v..v. 000140
01450203 00140003 01950203 00069000 08CAC91F 00E8C028 08C483FF FF00109A ......á.+â$..èò...............E. 000160
0C120203 00000019 0F980002 00000017 0F0A0002 0000000F 105A0002 00220003 .."...Z.......Ö................. 000180
6A0E6A06 76FFD88F FFFF881E 000004C8 00000000 00000000 00000000 02800006 ..§.............à....¡...Ã.v.j.j 0001A0
07892602 478926C( 28FC5EC4 45E80001 880574C0 080000FF FF9A5016 FC4680DE ..F=.P......ât.¡..ŠEá^=+á&.G.&.. 0001C0
0846880A 4789260C 478926FC 5EC40847 8926FC5E C4044789 26064789 26FC5EC4 á^=&.G.&.G.á^=&.G.á^=&.G.&.G..F. 0001E0
```

Dump of file SATURN:[PCCOMMON.DUMP.DLL]BRDPLOW.TMP;1 on 18-APR-1990 10:38:06.00
File ID (528,44,0)   End of file block 272 / Allocated 272

Virtual block number 133 (00000085), 512 (0200) bytes

```
000000C8 CBC91F00 EBC02B02 57892607 8926FE56 8BFC468B 085EC410 740A460B .F.t.á^..F=.V±&..&.W.+âŠ..èùà... 000000
00FFFF9A 0876FF0A 76FF0676 FF0A4789 260C4789 26C02B08 5EC4D88E 0006881E .¡...Ää^.+ä&.G.&.G..v..v..v..... 000020
56880846 88D88F00 72881E00 0008C8C8 C91F00EB C02B04EB 00018805 74C00800 ..ät.¡..Š.+äŠ..èùà....¡r..Ä.F..V 000040
08F8468B FA5689F8 46890C57 88260A47 8826FC5E C46674C2 08FE5689 FC46890A ..F=.V±.ôtfá^=&.G.&.W..F½.V°.F½. 000060
89FA568B F846883C EB0001B8 0574C008 06C483FF 8FE80E06 76FF5306 3474FA46 F°t4.S.v..Ò....á..ät.¡..Š<.F½.V°. 000080
76FFFC76 FFFE76FF C4EBFA56 89F84689 0C578826 0A478826 FC5EC4FE 5689FC46 F=.V±á^=&.G.&.W..F½.V°Šá.v±.v=.v 0000A0
00A7881E 00000CC8 CBC91F00 EBC02B04 EB0001B8 0574C008 06C483FF 57E80E06 ..ÒW..á..ät.¡..Š.+äŠ..èùà....¡Ï. 0000C0
0C460B0A 46880000 01909A00 BA6805E2 681E060A 681E1075 08460806 46880B8E .Ä.F..F.u..h...hã.ho.......F..F. 0000E0
5EC42674 08563905 75064639 0C56880A 46880C56 890A4689 08568806 46880C75 u..F..V..F..V..F..V.9F.u.9V.t&á^ 000100
9A008E68 061A681E 0642681E 10760739 26057F17 7C025739 2610568B 0E46880A ..F..V.&9W.|...&9.v..hB..h..hf.. 000120
260A478B 260A5EC4 FA5689F8 46890C56 880A468B FC4689FE 4689C02B 0000FFFF ....+á.F±.F=.F..V..F½.V°á^.&.G.& 000140
08F4468B F65689F4 46890C57 88260A47 8826F45E C411EBF6 5689F446 890C578B .W..F¶.V-Š.á^¶&.G.&.W..F¶.V-.F¶. 000160
FA568BF8 46880E76 07392605 7F157C02 57392610 56880E46 88F45EC4 3074F646 F-t0á^¶.F..V.&9W.|...&9.v..F½.V° 000180
88F8468B 0C75FE46 08FC468B B7EBFA56 89F84689 C28CC38B 0CEBFE56 89FC4689 .F=.V±Š..ù.ó.F½.V°Šñ.F=.F±u..F½. 0001A0
02578926 078926FE 5688FC46 88125EC4 10741446 0812468B FE5689FC 4689FA56 V°.F=.V±.F..F.t.á^..F=.V±&..&.W. 0001C0
06C483FD 83E80E06 76FF5016 FC468D08 8E012EB8 1E000004 CBCBC91F 00EBC02B +äŠ..èùà....¡...Ä.F=.P.v..Ò°».á. 0001E0
```

Dump of file SATURN:[PCCOMMON.DUMP.DLL]BRDPLOW.TMP;1 on 18-APR-1990 10:38:06.00
File ID (528,44,0)   End of file block 272 / Allocated 272

Virtual block number 134 (00000086), 512 (0200) bytes

```
FC468B08 5EC41074 0A460B08 46880001 0847C726 FC5EC425 EB0001B8 0574C008 .ät.¡..Š%á^=&úG....F..F.t.á^..F= 000000
76FF0A76 FFD88E02 3D881E00 0000C8CB C91F00EB C02B0257 89260789 26FE568B .V±&..&.W.+äŠ..èùà....¡=..Ä.v..v 000020
89FA4689 C02BD88E 0287881E 000010C8 CBC91F00 EB06C483 FE09E80E 0676FF08 ..v..Ò.±.á.Š..èùà....¡...Ä+á.F°. 000040
5788260A 47882 6F4 5EC411EB F65689F4 46890A56 8808468B F04689F2 4689F846 F½.F·.FÞ.F..V..F¶.V-Š.á^¶&.G.&.W 000060
C483FD12 E80E0676 FF5016FC 46800080 E90375F6 4608F446 88F65689 F446890C ..F¶.V-.F¶.F-u.Ò...F=.P.v..Ò.».á 000080
C4025789 26078926 FC5EC402 57882607 8826F45E C40090E9 00018806 74C00806 ..ät.¡..Ò..á^¶&..&.W.á^=&..&.W.á 0000A0
26FC5EC4 08478826 F45EC406 57892604 478926FC 5EC40657 88260447 8826F45E ^¶&.G.&.W.á^=&.G.&.W.á^¶&.G.á^=& 0000C0
C41174F2 4608F046 88FA5689 F84689FE 5688FC46 880C75FA 4608F846 88084789 .G..F½.F°u..F=.V±.F½.V°.FÞ.F·t.á 0000E0
88FF57E9 F25689F0 4689FE56 88FC4688 0C578926 0A478926 FE5688FC 468BF05E ^Þ.F=.V±&.G.&.W..F=.V±.FÞ.V·ÒW.. 000100
08C8CBC9 1F00EBC0 28025789 26078926 FA5688F8 46880C5E C410740E 46080C46 F..F.t.á^..F½.V°&..&.W.+äŠ..èùà. 000120
FA5689F8 46890C56 880A4688 FE5689FC 46890856 88064688 088E02A6 881E0000 ...¡Í..Ä.F..V..F=.V±.F..V..F½.V° 000140
46890C57 88260A47 8826F85E C4FE5689 FC46890C 5788260A 478826FC 5EC422EB Š"á^=&.G.&.W..F=.V±á^½&.G.&.W..F 000160
390575FC 4639FA56 88F8468B 5774FA46 08F8468B 5F74FE46 08FC468B FA5689F8 ½.V°.F=.F±t_.F½.F°tW.F½.V°9F=u.9 000180
26F85EC4 2A750257 39263075 073926FC 5EC40257 8826078B 26F85EC4 4274FE56 V±tBá^½&..&.W.á^=&9.uÒ&9W.u°á^½& 0001A0
FC5EC408 478826F8 5EC41075 06573926 16750447 3926FC5E C406578B 2604478B .G.&.W.á^=&9G.u.&9W.u.á^½&.G.á^= 0001C0
56390A75 FC4639FA 5688F846 881D7410 46080E46 88FF77E9 03E80274 08473926 &9G.t.Š.Õw..F..F.t..F½.V°9F=u.9V 0001E0
```

Dump of file SATURN:[PCCOMMON.DUMP.DLL]BRDPLOW.TMP;1 on 18-APR-1990 10:38:06.00
File ID (528,44,0)   End of file block 272 / Allocated 272

Virtual block number 135 (00000087), 512 (0200) bytes

```
8E0394B8 1E000000 C8CBC91F 00EBC02B 0789260E 5EC4C02B 02EB0001 B80575FE ±u.¡..Š.+äá^.&..+âŠ..èùà....¡... 000000
0A478826 085EC40. 0004C99A 01666806 75681E06 90681E10 750A4608 084688D8 Ä.F..F.u..h...hu.hf..è...á^.&.G. 000020
EB0001B8 0574C00B 06C483FB FCE80E06 76FF0A77 FF260C77 FF261874 0C470B26 &.G.t.&.w.&.w..v..Ò=«.á..ät.¡..Š 000040
085EC400 0004E69A 01606806 AD681E06 D5681E10 74024708 26078B26 085EC462 bá^.&..&.G.t..hí..hÙ.hm..Ï...á^. 000060
7F832608 5EC40000 05009A01 6E6806EB 681E0713 681E1074 06470B26 04478826 &.G.&.G.t..h...h$.hn......á^.&.. 000080
4789260C 478926C0 28085EC4 00000146 9A016F68 072A681E 0752681E 10750008 ..u..hR..h*.ho..F...á^.+ä&.G.&.G 0000A0
075F681E 0787681E 10750846 0806468B 088E046D 881E0000 04C8CBC9 1F00EB0A .Š..èùà....¡m..Ä.F..F.u..h...h . 0000C0
8826FC5E C411E8FE 5689FC46 890C578B 260A478B 26065EC4 00000485 9A01876B h.......á^.&.G.&.W..F=.V±Š.á^=Ï. 0000E0
5EC40257 8826078B 260A5EC4 3674FE46 08FC468B FE5689FC 46890C57 88260A47 G.&.W..F=.V±.F=.F±t6á^.&..&.W.á^ 000100
FC5EC406 57882604 4788260A 5EC41675 00087F83 26FC5EC4 02571126 070126FC =&..&.W.á^=&....u.á^.&.G.&.W.á^= 000120
46080846 88D88E05 1C881E00 0016C8CB C91F00EB C02B81EB 06571126 04470126 &.G.&.W.ŠÝ+äŠ..èùà....¡...Ä.F..F 000140
057F177C 10563914 56881246 88000005 E19A0180 68079768 1E078F68 1E10750A .u..h¢..h..h¯..Ä....F..V.9V.|... 000160
0E76FF10 76FF5016 EA468000 0005349A 01816807 CF681E07 F7681E10 720E4639 9F.r..h¥..hú.hÝ..4....Fõ.P.v..v. 000180
FFEC76FF 1276FF14 76FF5016 F0468010 C483FB2A E80E0876 FF0A76FF 006A006A j.j..v..v..Ò*«.á..FÞ.P.v..v..vš. 0001A0
88147400 0C7E833D 7500087F 8326EA5E C410C483 FB0CE80E 0876FF0A 76FFEA76 võ.v..v..Ò.«.á.á^õ&....u=.~..t.. 0001C0
88164688 0262E903 74000C7E 83237204 47392606 7F287C06 57392618 56881646 F..V.&9W.|+..&9G.r#.~..t.Òb..F.. 0001E0
```

```
Dump of file SATURN:[PCCOMMON.DUMP.DLL]BRDPLOW.TMP;1 on 18-APR-1990 10:38:06.00
File ID (528,44,0)   End of file block 272 / Allocated 272

Virtual block number 136 (00000088), 512 (0200) bytes

08750838 0A5688OP 46880248 E9037704 47392609 7F0253E9 037D0657 39261856 V.&9W.).ÕS...&9G.w.ÕN..F..V.;Äu. 000000
E9037402 57392600 CBE90374 07392610 56880E46 88EA5EC4 00DCE903 75EC5639 9V&u.Õ€.á^õ.F..V.&9.t.Õù.&9W.t.Õ 000020
0E0676FF 5016FC46 800090E9 0374EC56 390098E9 0374083B F25688F0 468800C2 õ..FÞ.V·;Ät.Õ..9V$t.Õ...F=.P.v.. 000040
8926FC5E C40C5788 260A4788 26EA5EC4 043AE900 01880674 C00806C4 83F94DEB ÕM*.á..ât.|..Õ:.á^õ&.G.&.W.á^=&. 000060
14568812 4688FC5E C40C5789 260A4789 26FE5688 FC4688EA 5EC40C57 89260A47 G.&.W.á^õ.F=.V±&.G.&.W.á^=.F..V. 000080
EA5EC406 57892604 478926FC 5EC40657 88260447 8826EA5E C4025789 26078926 &..&.W.á^õ&.G.&.W.á^=&.G.&.W.á^õ 0000A0
26EA5EC4 06578926 04478926 18568816 4688EA5E C4084789 26FC5EC4 08478826 &.G.á^=&.G.á^õ.F..V.&.G.&.W.á^õ& 0000C0
000847C7 26EA5EC4 06578926 04478926 18568816 4688EA5E C41AE800 000847C7 úG...$.á^õ.F..V.&.G.&.W.á^õ&úG.. 0000E0
FF5016FC 46800007 E90374EC 5639000F E90374EA 4639F256 88F04688 015AE900 .õZ..FÞ.V·9Fõt.ÕÕ.9V$t.Õ=..F=.P. 000100
5EC40C57 88260A47 8826EA5E C40377E9 00018806 74C00806 C483F88A E80E0676 v..Õ.%.á..ât.|..Õw.á^õ&.G.&.W.á^ 000120
124688FC 5EC40C57 89260A47 8926FE56 88FC4688 EA5EC40C 5789260A 478926FC =&.G.&.W.á^õ.F=.V±&.G.&.W.á^=.F. 000140
06578926 04478926 FC5EC406 57882604 478826EA 5EC40257 89260789 26145688 .V.&..&.W.á^õ&.G.&.W.á^=&.G.&.W. 000160
74C00806 C483F816 E80E0676 FF5016FC 46800847 8926FC5E C4084788 26EA5EC4 á^õ&.G.á^=&.G..F=.P.v..Õ.%.á..ât 000180
EA5EC40C 5789260A 478926FC 5EC40C57 88260A47 8826EA5E C40303E9 00018806 .|..Õ..á^õ&.G.&.W.á^=&.G.&.W.á^õ 0001A0
5EC40257 89260789 '6105688 0E4688FC 5EC40C57 89260A47 8926FE56 88FC4688 .F=.V±&.G.&.W.á^=.F..V.&..&.W.á^ 0001C0
06C483F7 83E80E06 .6FF5016 FC46806D E8065789 26044789 26185688 164688FC =.F..V.&.G.&.W.Šm.F=.P.v..Õ°%.á. 0001E0
```

```
Dump of file SATURN:[PCCOMMON.DUMP.DLL]BRDPLOW.TMP;1 on 18-APR-1990 10:38:06.00
File ID (528,44,0)   End of file block 272 / Allocated 272

Virtual block number 137 (00000089), 512 (0200) bytes

0C578926 0A478926 FC5EC40C 5788260A 478826EA 5EC402A0 E9000188 0674C008 .ât.|..Õ..á^õ&.G.&.W.á^=&.G.&.W. 000000
57892607 89261056 880E4688 FC5EC40C 5789260A 478926FE 5688FC46 88EA5EC4 á^õ.F=.V±&.G.&.W.á^=.F..V.&..&.W 000020
4688EC56 89EA4689 FE5688FC 46880657 89260447 89261856 88164688 FC5EC402 .á^=.F..V.&.G.&.W..F=.V±.Fõ.V&.F 000040
74000C7E 83307500 087F8326 F05EC402 35E90375 EC563908 75EA4639 F25688F0 Þ.V·9Fõu.9V$u.ÕS.á^Þ&....u=.~..t 000060
468800C8 E9037400 0C7E8323 72044739 26067F28 7C065739 26185688 16468814 ..F..V.&9W.|+..&9G.r#.~..t.Õà..F 000080
39261456 88124688 00AEE903 77044739 26097F00 89E9037D 06573926 18568816 ..V.&9W.).Õ¿...&9G.w.ÕÜ..F..V.&9 0000A0
880674C0 0806C483 F6D8E80E 0676FF50 16FC468D 009AE903 75025739 26097507 .u.&9W.u.Õ...F=.P.v..ÕÃ-.á..ât.| 0000C0
4688F05E C40C5789 260A4789 26FC5EC4 0C578826 0A478826 F05EC401 C5E90001 ..Õé.á^Þ&.G.&.W.á^=&.G.&.W.á^Þ.F 0000E0
26F05EC4 02578926 07892614 56881246 88FC5EC4 0C578926 0A478926 FE5688FC =.V±&.G.&.W.á^=.F..V.&..&.W.á^Þ& 000100
08478926 FC5EC408 478826F0 5EC40657 89260447 8926FC5E C4065788 26044788 .G.&.W.á^=&.G.&.W.á^Þ&.G.á^=&.G. 000120
FE5688FC 46880000 0P47C726 F05EC406 57892604 47892618 56881646 88F05EC4 á^Þ.F..V.&.G.&.W.á^Þ&úG....F=.V± 000140
0A478826 F45EC411 E8F65689 F446890C 5788260A 478826EA 5EC4F256 89F04689 .FÞ.V·á^õ&.G.&.W..F¶.V-Š.á^¶&.G. 000160
F6563907 75F44639 F25688F0 46886A74 F6460BF4 4688F656 89F44689 0C578826 &.W..F¶.V-.F¶.F-tj.FÞ.V·9F¶u.9V- 000180
227C0657 39261856 88164688 1474000C 7E833475 00087F83 26F45EC4 58E80275 u.ŠXá^¶&....u4.~..t..F..V.&9W.|" 0001A0
04473926 067F1F7C 06573926 18568816 46882875 000C7E83 1A720447 3926067F ..&9G.r..~..u+.F..V.&9W.|...&9G. 0001C0
88EA4688 FF7DE900 000847C7 26F45EC4 06578926 04478926 18568816 46881776 v..F..V.&.G.&.W.á^¶&úG...Õ)..Fõ. 0001E0
```

```
Dump of file SATURN:[PCCOMMON.DUMP.DLL]BRDPLOW.TMP;1 on 18-APR-1990 10:38:06.00
File ID (528,44,0)   End of file block 272 / Allocated 272

Virtual block number 138 (0000008A), 512 (0200) bytes

39F25688 F04688F6 5689F446 890C5788 260A4788 26F85EC4 FA5689F8 4689EC56 V$.F%.V*á^¼&.G.&.W..F¶.V-.FÞ.V·9 000000
7F8326F4 5EC45275 00087F83 26EE4689 C02802E8 00018805 75F65639 0A75F446 F¶u.9V-u.|..Š.+á.FY&....uRá^¶&.. 000020
8826F45E C4317506 57392637 75044739 26F85EC4 06578826 04478826 48750008 ..uH&.G.&.W.á^¼&9G.u7&9W.u1á^¶&. 000040
C483F59E E80E0676 FFF476FF F676FF0C 5789260A 478926F8 5EC40C57 88260A47 G.&.W.á^¼&.G.&.W..v~.v¶.v..Õ.%.á 000060
EE7E83FA 5689F846 890C5788 260A4788 26F85EC4 11E820E8 00018805 74C00806 ..ât.|..Š Š.á^¼&.G.&.W..F%.V*.~Y 000080
1E10750A 46080846 88D88E05 A7881E00 0004C8C8 C91F00E8 C028FF62 E9037500 .u.Õb.+áŠ..èùà....|Ì..Ä.F..F.u.. 0000A0
68083E68 1E086668 1E10750E 46080C46 88000008 339A022F 6807FF68 1E082768 h'..h..h/..3....F..F.u..hf..h>.h 0000C0
0C578826 0A478826 FC5EC411 E8FE5689 FC46890E 56880C46 88000005 8F9A0230 0..¢....F..V..F=.V±Š.á^=&.G.&.W. 0000E0
0477FF26 0677FF26 39750008 7F8326FC 5EC44574 FE4608FC 4688FE56 89FC4689 .F=.V±.F=.F±tEá^=&....u9&.w.&.w. 000100
76FF0876 FF0A76FF 1076FF37 FF260277 FF26FC5E C437FF26 0277FF26 0A5FC426 &á_.&.w.&.7á^=&.w.&.7.v..v..v..v 000120
881E0000 0EC8C8C9 1F00E8C0 28A2E806 E80001B8 0574C008 14C483FA 0CE80E06 ..Õ.*.á..ât.|..Š.ŠÄ+áŠ..èùà....| 000140
88104688 000008EA 9A025768 0879681E 08A1681E 10750846 08064688 D88E0803 ...Ä.F..F.u..hÀ..hy.hW..õ....F.. 000160
46800000 08189A02 58680881 681E0809 681E1072 0C463905 7F177C0E 56391256 V.9V.|...9F.r..h1..hÝ.hX.......F 000180
885016F8 46800C4 83F521E8 0E0676FF 0876FF00 6A006A0C 76FF0E76 FF5016F2 ·.P.v..v.j.j..v..v..ÕI%.á..F%.P. 0001A0
10C483F4 F8E80E06 76FF0876 FFF276FF F476FF50 52000A83 00012012 56881046 F..V.-...Õ.RP.v¶.v·.v..v..Õ«¶.á. 0001C0
46890C57 88260A47 8826FC5E C411E8FE 5689FC46 89F45688 F2468800 01F646C7 úF-...F·.V¶.F=.V±Š.á^=&.G.&.W..F 0001E0
```

```
Dump of file SATURN:[PCCOMMON.DUMP.DLL]BRDPLOW.TMP;1 on 18-APR-1990 10:38:06.00
File ID (528,44,0)    End of file block 272 / Allocated 272

Virtual block number 139 (0000008B), 512 (0200) bytes

 88144688 1474000A 7E833475 00087F83 26FC5EC4 7374FE46 08FC4688 FE5689FC ..Vz.F..Fzts..&....u4.-..t..F.. 000000
 06573926 16568814 46881875 000A7E83 1A720447 3926067F 227C0657 39261656 V.&9V.|"..&9G.r..-..u..F..V.&9V. 000020
 08750447 39261656 88144688 FC5EC42E EB0003F6 46C70776 04473926 067F0F7C |...&9G.v.uF-..S.&^..F..V.&9G.u. 000040
 88FF74E9 03E8027. FE563907 750838FA 5688F846 880002F6 46C70575 06573926 &9V.u.uF-...F%.V";Au.9Vzu.S.Ot.. 000060
 8E088088 1E0000C. C8C8C91F 00E8C028 078926F6 4688185E C409741A 46081846 F..F.t.&^..F-&..+aS..euA....|-.. 000080
 750C4608 0A468800 0000109A 02826808 E1681E09 09681E10 75084608 06468808 A.F..F.u..h...hA.h........F..F.u 0000A0
 5EC41375 0C470826 0A478826 065EC400 0008C89A 02836809 19681E09 41681E10 ..hA..h..h...a...&^.&.G.&.G.u.&^ 0000C0
 89FC4689 0C56880A 46880001 FA46C700 A2E90001 8806750C 4708260A 4788260A .&.G.&.G.u.|..OA.uF"...F..V..F.. 0000E0
 FC5EC461 74FE4608 FC4688FE 5689FC46 890C5788 260A4788 26FC5EC4 11E8FE56 VzS.A^.&.G.&.W..F..Vz.F..Fzte&^. 000100
 C437FF26 0277FF26 0A5FC426 0477FF26 0677FF26 5016F846 8D557500 087F8326 &....uU.F%.P&.w.&.w.&&_.&.w.&.7& 000120
 00018805 74C00816 C483FE04 E80E0676 FF0876FF 0E76FF37 FF260277 FF26FC5E ^.&.w.&.7.v..v..v..O.z.&..&t.|.. 000140
 468886E8 0002FA46 C7057502 F87E8308 E80FE800 03FA46C7 097503F8 7E8331E8 $1.-%.u.uF"..S.S..-%.u.uF"..S..F 000160
 D88E0CED 881E0000 16C8C8C9 1F00E8C0 28078926 FA468810 5EC40974 12460810 ..F.t.&^..F"&..+aS..euA....|U..A 000180
 56391256 88104688 00000E26 9A028668 0952681E 097A681E 10750846 08064688 .F..F.u..hz..hR.hN..&....F..V.9V 0001A0
 FF5016EA 46800000 00059A02 8768098A 681E0982 681E1072 0C463905 7F177C0E .|...9F.r..hy..h..hn.......Fo.P. 0001C0
 56881046 885016F2 468010C4 83F2E5E8 0E0676FF 0876FF00 6A006A0C 76FF0E76 v..v.j.j..v..v..Ol..&..F..P.F..V 0001E0
```

```
Dump of file SATURN:[PCCOMMON.DUMP.DLL]BRDPLOW.TMP;1 on 18-APR-1990 10:38:06.00
File ID (528,44,0)    End of file block 272 / Allocated 272

Virtual block number 140 (0000008C), 512 (0200) bytes

 00FE46C7 10C483F2 8FE80E06 76FF0876 FFEA76FF EC76FF50 52000A83 00012D12 .-...O.RP.v&.vo.v..v..Oe..&.uFz. 000000
 F85689F6 46890C57 88260A47 8826F65E C411E8F8 5689F646 89EC5688 EA468800 ..Fo.V&.F-.V%S.&^-&.G.&.W..F-.V% 000020
 0001FE46 C7187500 FE7E8379 7500087F 8326F65E C40098E9 0375F846 08F64688 .F-.F%u.O..&^-&....uy.-z.u.uFz.. 000040
 46280657 88260447 882658E8 F05689EE 46891656 1814462B 06578826 04478826 &.G.&.W.+F..V...FY.VbSX&.G.&.W.+F 000060
 FA463905 7F137CFC 5639F056 88EE4688 2074000A 7E83FC56 89FA4689 16561814 ..V..F".V..-..t .FY.Vb9V.|...9F" 000080
 FA463905 7C137FFC 5639F056 88EE4688 1EE8F056 89EE4689 FC5688FA 46880C76 v..F".V..FY.VbS..FY.Vb9V...|.9F" 0000A0
 03E80275 F8563907 75F64639 F45688F2 4688F056 89EE4689 FC5688FA 46880C73 s..F".V..FY.Vb.F..V¶9F-u.9V%u.S. 0000C0
 26F05688 EE468818 5EC41074 1A460818 46881CE8 00018805 7500FE7E 83FF4CE9 OL..-z.u.|..S..F..F.t.&^..FY.Vb& 0000E0
 1E107508 46080646 88088E00 EC881E00 001AC8C8 C91F00E8 C0280257 89260789 ..&.W.+aS..euA....|&..A.F..F.u.. 000100
 6809F268 1E0A1A68 1E10750E 46080C46 8800000F 939A02F7 68098A68 1E09E268 h&..hn.h%.......F..F.u..h...h..h 000120
 46890E56 880C4688 F05689EE 46890856 88064688 0000FE46 C700000E 049A02F8 %......uFz...F..V..FY.Vb.F..V..F 000140
 0C578826 0A478826 EA5EC4F8 5689F646 890C5788 260A4788 26EE5EC4 EC5689EA o.V&&^Y&.G.&.W..F-.V%&^o&.G.&.W. 000160
 26EE5EC4 013AE903 75F44608 F2468801 45E90375 F84608F6 4688F456 89F24689 .F..V¶.F-.F%u.OE..F..F¶u.O:.&^Y& 000180
 02578826 078826F2 5EC400C9 E9037400 087F8326 EA5EC400 D6E90374 00087F83 ....t.Oe.&^o&....t.Oe.&^.&..&.W. 0001A0
 02578826 078826F6 5EC400A9 E9037207 3926087C 0083E903 7E025739 26EE5EC4 &^Y&9W.-.O".|.&9.r.O..&^-&..&.W. 0001C0
 01FE46C7 237500FE 7E830089 E9037207 3926087C 0093E903 7E025739 26EA5EC4 &^o&9W.-.O..|.&9.r.O...-z.u#uFz. 0001E0
```

```
Dump of file SATURN:[PCCOMMON.DUMP.DLL]BRDPLOW.TMP;1 on 18-APR-1990 10:38:06.00
File ID (528,44,0)    End of file block 272 / Allocated 272

Virtual block number 141 (0000008D), 512 (0200) bytes

 C460E8E8 5689E646 89065718 26044728 26EA5EC4 06578826 04478826 EE5EC400 .&^Y&.G.&.W.&^o&+G.&.W..F|.VoS'& 000000
 74000A7E 83FC5689 FA468906 57182604 472826EA 5EC40657 88260447 8826EE5E ^Y&.G.&.W.&^o&+G.&.W..F".V..-..t 000020
 E8E85689 E64689FC 5688FA46 880C76FA 4639057F 137CFC56 39E85688 E6468820 .F|.Vo9V.|...9F"v..F".V..F|.VoS 000040
 C4E85689 E64689FC 5688FA46 880C73FA 4639057C 137FFC56 39E85688 E646881E ..F|.Vo9V...|.9F"s..F".V..F|.Vo& 000060
 EE4689C2 8CC3881D 73073926 057C247F 02573926 F65EC402 57882607 8826F25E ^.&..&.W.&^-&9W..$|.&9.s..u.o.FY 000080
 89EA4689 F45688F2 46C31DE8 F85689F6 46890C57 88260A47 8826EE5E C4F05689 .Vb&^Y&.G.&.W..F-.V%S..F..V¶.Fo. 0000A0
 E80001B8 057500FE 7E83FE80 E9F45689 F246890C 5788260A 478826EA 5E..FC56 V&&^o&.G.&.W..F..V¶O-z.-z.u.|..S 0000C0
 C8C91F00 E8C02802 57892607 8926E856 88E64688 105EC410 74124608 1046.11C ..F..F.t.&^..F|.VO&..&.W.+aS..eu 0000E0
 0A56681E 10750008 7F832606 5EC40A74 08460806 4688D88E 0F63881E 00000..8 a....|c..A.F..F.t.&^.&....u..hV. 000100
 0A7E830E 5E8C0C46 89086488 09750E46 080C4688 00000F78 9A033768 0A2E681E .h..h7..(....F..F.u.|d..F..^..-. 000120
 5EC40AC4 8311F100 109A0C76 FF0E76FF 0A79681E 50002888 03E8002D 88057400 .t.|-.S.|+.P.hy..v..v....b..&.&^ 000140
 89FC4689 0C578826 0A478826 FC5EC411 E8FE5689 FC46890C 5788260A 47882606 .&.G.&.W..F..VzS.&^.&.G.&.W..F.. 000160
 109A0C76 FF0E76FF 0A87681E 37FF2602 77FF26FC 5EC46974 FE4608FC 4688FE56 Vz.F..Fzti&^.&.w.&.7.h...v..v... 000180
 1E500028 8803E800 20880574 000A7E83 23740008 7F8326FC 5EC40CC4 83121C00 ....&.&^.&....t#.-..t.|-.S.|+.P. 0001A0
 681E0477 FF260677 FF26FC5E C41DE80A C483123B 00109A0C 76FF0E76 FF0A8F68 h...v..v....;..&.S.&^.&.w.&.w..h 0001C0
 00109A0C 76FF0E76 FF0A9868 1EFF7EE9 0CC48312 5000109A 0C76FF0E 76FF0A95 ...v..v....P..&.O-..h...v..v.... 0001E0
```

```
Dump of file SATURN:[PCCOMMON.DUMP.DLL]BRDPLOW.TMP;1 on 18-APR-1990 10:38:06.00
File ID (528,44,0)   End of file block 272 / Allocated 272

Virtual block number 142 (0000008E), 512 (0200) bytes

00020022 00030080 02030014 00030017 02030005 CBC91F00 EBC02B08 C483FFFF ...å.+åŠ..èù................*... 000000
00000000 00000000 00000280 00061178 02030000 00191156 00020000 001711A9 `.......V.......x...§........... 000020
26001456 47C72606 5EC47CEB C02B0475 08460806 4688088E FFFF881E 000000C8 å....|...Ä.F..F.u.+åŠ|å^.&úGV..& 000040
47C72600 055E47C7 26065EC4 00005C47 C7260014 5A47C726 065EC400 005847C7 úGX..å^.&úGZ..&úG\..å^.&úG^..&úG 000060
006847C7 26000F66 47C72606 5EC40000 6447C726 00056247 C726065E C4000060 `..å^.&úGb..&úGd..å^.&úGf..&úGh. 000080
C4000070 47C72600 146E47C7 26065EC4 00006C47 C726000F 6A47C726 065EC400 .å^.&úGj..&úGl..å^.&úGn..&úGp..å 0000A0
88088E00 06881E00 000CC8C8 C91F00EB C02B0000 7447C726 00147247 C726065E ^.&úGr..&úGt..+åŠ..èùå....|...Ä. 0000C0
067E8306 7C007F00 087E830E 74000A7E 83067F16 7C000C7E 831C7410 46080E46 F..F.t..~..|....~..t..~....|..~. 0000E0
4689FE56 88FC4688 0000FFFF 9A5016FC 46800E76 FF1076FF 59E880F3 88057500 .u.|æ.ŠY.v..v..F•.P......F•.V±.F 000100
88F85EC4 FA5689F8 46890056 05F65688 F4468834 E880F988 0575000B F65689F4 ¶.V-.Äu.|•.Š4.F¶.V-.V..F½.V•å^½. 000120
EBC02806 57892604 47892608 56880646 88F85EC4 02578926 0789260C 56880A46 F..V.&..&.W.å^½.F..V.&.G.&.W.+åŠ 000140
1076FF72 E880F388 05751046 080E4688 088E0098 881E0000 0CC8000C CAC91F00 ..èò..à....|...Ä.F..F.u.|æ.Šr.v. 000160
80F98805 75D008F6 5689F446 89FE5688 FC468800 0000049A 5016FC46 800E76FF .v..F•.P.à....F•.V±.F¶.V-.Äu.|•. 000180
04478826 F85EC415 74084608 06468BFA 5689F846 89005605 F6568BF4 468840EB ŠM.F¶.V-.V..F½.V•.F..F.t.å^½&.G. 0001A0
57882604 478826F8 5EC41574 0C460B0A 46880257 892607B9 26065EC4 06578826 &.W.å^.&..&.W..F..F.t.å^½&.G.&.W 0001C0
4688088E 012C881E 00000CC8 000CCAC9 1F00EBC0 2B025789 26078926 0A5EC406 .å^.&..&.W.+åŠ..èò..à....|,..Ä.F 0001E0

Dump of file SATURN:[PCCOMMON.DUMP.DLL]BRDPLOW.TMP;1 on 18-APR-1990 10:38:06.00
File ID (528,44,0)   End of file block 272 / Allocated 272

Virtual block number 143 (0000008F), 512 (0200) bytes

000A7E83 067C007F 000C7E83 0E740006 7E83067F 167C0008 7E831C74 1046080E ..F.t..~..|....~..t..~....|..~.. 000000
F84689FE 5688FC46 88000001 499A5016 FC4680DE 76FF1076 FF59E880 F3880575 u.|æ.ŠY.v..v..F•.P.I....F•.V±.F½ 000020
4688F45E C4F65689 F4468900 5E05FA56 88F84688 34E880F9 88057500 08FA5689 .V•.Äu.|•.Š4.F½.V•.^..F¶.V-å^¶.F 000040
00E8C02B 06578926 04478926 08568806 4688F45E C4025789 26078926 0C56880A ..V.&..&.W.å^¶.F..V.&.G.&.W.+åŠ. 000060
FF1076FF 71E880F3 88057510 46080E46 880888E01 8A881E00 000CC800 0CCAC91F .èò..à....|o..Ä.F..F.u.|æ.Šq.v.. 000080
E880F988 0575000B FA5689F8 4689FE56 88FC4688 000001F3 9A5016FC 46800E76 v..F•.P.æ....F•.V±.F½.V•.Äu.|•.Š 0000A0
26044788 26F45EC4 15740C46 080A4688 F65689F4 4689005E 05FA5688 F846884C L.F½.V•.^..F¶.V-.F..F.t.å^¶&.G.& 0000C0
C4025788 26078826 F45EC414 74084608 06468802 57892607 89260A5E C4065788 .W.å^.&..&.W..F..F.t.å^¶&..&.W.å 0000E0
4688088E 0248881E 56570000 08C8000C CAC91F00 EBC02B02 57892607 8926065E ^.&..&.W.+åŠ..èò..à...WV.|K..Ä.F 000100
88FC4688 00000268 9A5016FC 46800E76 FF1076FF 0091E980 F3880675 1046080E ..F.u.|æ.Ö...v..v..F•.P.h....F•. 000120
027F8326 0A5EC42C 740C4608 0A46886C E880F988 0575000B FA5689F8 4689FE56 V±.F½.V•.Äu.|•.Šl.F..F.t,å^.&... 000140
DA8E1EF0 88667F80 0C56880A 4688F85E C44EE880 F388057D 00067F83 26077C00 .|.&....).|æ.ŠNå^½.F..V...f.Þ..Ö 000160
F388057D 00067F83 26077C00 027F8326 065EC42C 74084608 0646881F A5A5A5A5 ÈÈÈÈ..F..F.t,å^.&....|.&....).|æ 000180
5F5E1F00 E8C0281F A5A5A5A5 DA8E1EF0 886E7F80 08568806 4688F85E C41AE880 .Š.å^½.F..V...n.Þ..ÖÈÈÈÈ.+åŠ..^_ 0001A0
1076FF69 E880F388 05751046 080E4688 088E02DA 881E5657 000008C8 000CCAC9 èò..à...WV.|Ö..Ä.F..F.u.|æ.Ši.v. 0001C0
80F98805 75D008FA 5689F846 89FE5688 FC468800 0002F89A 5016FC46 800E76FF .v..F•.P.½....F•.V±.F½.V•.Äu.|•. 0001E0

Dump of file SATURN:[PCCOMMON.DUMP.DLL]BRDPLOW.TMP;1 on 18-APR-1990 10:38:06.00
File ID (528,44,0)   End of file block 272 / Allocated 272

Virtual block number 144 (00000090), 512 (0200) bytes

A5A5A5DA 8E1EF088 F8880066 05FA5688 F846880A 5EC41874 0C46080A 468844EB ŠD.F..F.t.å^..F½.V•.f..«.Þ..ÖÈÈÈ 000000
A5A5A5DA 8E1EF088 F888006E 05FA5688 F8468806 5EC41874 08460806 46881FA5 È..F..F.t.å^..F½.V•.n..«.Þ..ÖÈÈÈ 000020
88107410 46080E46 88088E03 8C881E00 000CC800 0CCAC95F 5E1F00EB C02B1FA5 È.+åŠ..^_èò..à....|...Ä.F..F.t.. 000040
5016FC46 800E76FF 1076FF01 5AE980F3 88067508 46080646 8808740C 46080A46 F..F.t..F..F.u.|æ.ÖZ..v..v..F•.P 000060
5688F846 880134E9 80F98806 75D008FA 5689F846 89FE5688 FC468800 0003A99A .`....F•.V±.F½.V•.Äu.|•.Ö4..F½.V 000080
309A37FF 260277FF 260A5EC4 37FF2602 77FF26F4 5EC4F656 89F44689 005E05FA •.^..F¶.V-å^¶&.w.&.7å^.&.w.&.7.0 0000A0
5EC44DEB 02578B26 0788260A 5EC40C74 C008C02B 02E80001 88057500 0804AE01 .Û..Äu.|..Š.+å.åt.å^.&..&.W.ŠMå^ 0000C0
321E8004 C406C79A 048802C3 9AF45EC4 048602C3 9A0A5EC4 37FF2602 77FF26F4 ¶&.w.&.7å^..û.Ñ.å^¶.Û.È..ú.å...2 0000E0
9A04E202 569AD888 08C48304 DD078E9A 040303EF 9ADC8808 EC8304CE 06999A28 (...ö..$..É.ÿ.&../.Ì..å..Ä.V.ä.. 000100
0477FF26 0677FF26 F45EC402 57892607 8926065E C4050E00 FC9A5052 04E904A6 Ì.Ö.RP.•...å^.&..&.W.å^¶&.w.&.w. 000120
C40074C0 08C02802 E80001B8 0575000B 05350130 9A0477FF 260677FF 260A5EC4 å^.&.w.&.w..0.5..Äu.|..Š.+å.åt.å 000140
02C39A04 5F80F45E C4054002 C39A045F 800A5EC4 54E80657 88260447 88260A5E ^.&.G.&.W.ŠTå^.._..û.ä.å^¶....û. 000160
83056707 8E9A0550 03EF9ADC 8808EC83 05580699 9A28321E 80054E06 C79A0545 É..ú.N...2(...X..$..É.ÿ.]..7.g.. 000180
FFFF00FC 9A0477FF 260677FF 26F45EC4 5052057E 04A69A05 6C02569A 088808C4 å..Ä.V.Ì..Ì.~.RPå^¶&.w.&.w..•... 0001A0
4688088E 0413881E 00000CC8 000CCAC9 1F00EBC0 2B065789 26044789 26065EC4 å^.&.G.&.W.+åŠ..èò..à....|...Ä.F 0001C0
FF1076FF 015AE980 F3880675 08460806 46880874 0C46080A 46881074 1046080E ..F.t..F..F.t..F..F.u.|æ.ÖZ..v.. 0001E0
```

```
Dump of file SATURN:[PCCOMMON.DUMP.DLL]BRDPLOW.TMP;1 on 18-APR-1990 10:38:06.00
File ID (528,44,0)   End of file block 272 / Allocated 272

Virtual block number 145 (00000091), 512 (0200) bytes

 E98DF988 06750008 F65689F4 4689FE56 88FC4688 00000441 9A5016FC 4680DE76 v..F•.P.A....F•.V±.F¶.V-.Åu.¡ª.Õ 000000
 FF260A5E C437FF26 0277FF26 F85EC4FA 5689F846 89005605 F65688F4 46880134 4..F¶.V-.V..F½.Vª&^½&.w.&.7&^.&. 000020
 26078826 0A5EC40C 74C008C0 2802E800 01880575 D0080635 01309A37 FF260277 w.&.7.0.5..Åu.¡..Š.+à.åt.&^.&..& 000040
 9A064202 C39AF85E C4063002 C39A0A5E C437FF26 0277FF26 F85EC44D EB025788 .W.$M&^½&.w.&.7&^..û.=.&^½.û.B.. 000060
 8808C483 0664078E 9A065A03 EF9ADC88 08EC8306 5506999A 28321E8D 064806C7 ú.K...2(...U..&..É.ÿ.2../.d..&.. 000080
 26F85EC4 02578926 07892606 5EC40695 00FC9A50 52067004 A69A0669 02569AD8 Ä.V.i..Ì.p.RP.•...&^.&..&.W.&^½& 0000A0
 02E80001 88057500 0806BC01 309A0477 FF260677 FF260A5E C40477FF 260677FF .w.&.w.&^.&.w.&.w..0.¥..Åu.¡..Š. 0000C0
 5EC406C7 02C39A04 5F800A5E C454E806 57882604 4788260A 5EC40074 C00..C028 +à.åt.&^.&.G.&.W.$Ť&^.. ..û.ú.&^ 0000E0
 E403EF9A DC8808EC 83060F06 999A2832 1E800605 06C79A06 CC02C39A 045F8DF8 ½. ..û.ü..ú.ſ...2(...Ô.¯&..É.ÿ.ô 000100
 FF260677 FF26F85E C4505207 0504A69A 06F30256 9AD88808 C48306EE 07BE9A06 ..7.Y..&..Ä.V.µ..Ì...RP&^½&.w.&. 000120
 02030003 90000CCA C91F00E8 C0280657 89260447 8926065E C4048100 FC9A0477 w..•...&^.&.G.&.W.+àŠ..èò....... 000140
 00000000 00000000 00000000 0019059A 00020000 00170608 0002027F 000505C8 à............................... 000160
 7E832074 0E46080C 4688287C 01087E83 2E7C0106 7E83088E FFFF881E 000002C8 à....¡...Å.-..|..-..|(.F..F.t .- 000180
 F3880675 12460810 46880875 020A7E83 0674010A 7E830C74 080A7E83 1274040A ..t..+..t..-..t..-..u..F..F.u.¡µ 0001A0
 26105EC4 0A578826 08478826 0C5EC401 65E90A46 88FE4689 40084688 0195E98D .Ô...F.∂.F±.F.Ôe.&^.&.G.&.W.&^.& 0001C0
 4728260E 5788260C 4788260C 5EC45052 99FE4688 50529906 46880257 89260789 ..&.W..F..RP.F±.RP&^.&.G.&.W.&+G 0001E0

Dump of file SATURN:[PCCOMMON.DUMP.DLL]BRDPLOW.TMP;1 on 18-APR-1990 10:38:06.00
File ID (528,44,0)   End of file block 272 / Allocated 272

Virtual block number 146 (00000092), 512 (0200) bytes

 5EC40657 13260447 03260C5E C400E400 FC9A5052 00910060 9A505206 57182604 .&.W.RP.'...RP.•.ô.&^.&.G.&.W.&^ 000000
 02578926 07892610 5EC40257 88260788 260C5EC4 0129E906 57892604 47892610 .&.G.&.W.Õ).&^.&..&.W.&^.&..&.W. 000020
 52065718 26044728 260E5788 260C4788 260C5EC4 505299FE 46885052 99064688 .F..RP.F±.RP&^.&.G.&.W.&+G.&.W.R 000040
 26044789 26105EC4 06571326 04470326 0C5EC401 2900FC9A 505200E8 00609A50 P.'.$.RP.•.).&^.&.G.&.W.&^.&.G.& 000060
 0728260A 57882608 4788260C 5EC45052 99FE4688 50529906 468800CF E9065789 .W.Ôü..F..RP.F±.RP&^.&.G.&.W.&+. 000080
 26105EC4 02571326 0703260C 5EC40181 00FC9A50 52013000 609A5052 02571826 &.W.RP.'.0.RP.•...&^.&..&.W.&^.& 0000A0
 468877EB 06578926 04478926 105EC40E 5788260C 4788260C 5EC40257 89260789 ..&.W.&^.&.G.&.W.&^.&.G.&.W.Šw.F 0000C0
 609A5052 02571826 0728260A 57882608 4788260C 5EC45052 99FE4688 50529906 ..RP.F±.RP&^.&.G.&.W.&+.&.W.RP.' 0000E0
 5EC40257 89260789 26105EC4 02571326 0703260C 5EC4FFFF 00FC9A50 52018800 ...RP.•...&^.&..&.W.&^.&..&.W.&^ 000100
 03750002 30A37400 01301FE8 06578926 04478926 105EC406 57882604 4788260C .&.G.&.W.&^.&.G.&.W.Š.=..tÊ=..u. 000120
 000032C8 CBC91F00 E8C02800 EBFE7EE9 03750008 30FEE1E9 03750004 30FF43E9 ÔC.=..u.ÔÅ±=..u.Ô-±Š.+àŠ..èûà2.. 000140
 18741446 08124688 20742446 08224688 28742846 08264688 088E0006 881E5657 WV.¡...Ä.F&.F(t(.F".F$t .F..F.t. 000160
 4688033B E98DF388 06750846 08064688 08740C46 080A4688 10741046 080E4688 .F..F.t..F..F.t..F..F.u.¡µ.Õ;..F 000180
 89184688 E65689E4 46890016 05245688 224688E2 5689E046 89001605 28568826 &.V(....FÅ.Vä.F".V$....FÔ.VÌ.F.. 0001A0
 46081E46 880092E9 03742856 39009AE9 03742646 39224688 0E468916 4688DC46 FÉ.F..F&.F"9F&t.Ô..9V(t.Ô...F..F 0001C0
 0C46890E 46890002 88087508 167E8311 7508187E 8339751C 46081A46 88417520  uA.F..F.u9.-..u..-..u.¡...F&.FÉ 0001E0

Dump of file SATURN:[PCCOMMON.DUMP.DLL]BRDPLOW.TMP;1 on 18-APR-1990 10:38:06.00
File ID (528,44,0)   End of file block 272 / Allocated 272

Virtual block number 147 (00000093), 512 (0200) bytes

 89DE4689 18468809 750B167E 830FE8DC 46890E46 89164688 08750818 7E8320EB Š .-..u..F..F&.FÉŠ..-..u..F..F&. 000000
 18468916 4688DA46 89184688 36741C46 081A4688 3E752046 081E4688 46E8DC46 FÉŠF.F..F u>.F..F.t&.F..FÔ.F..F. 000020
 46882056 891E4689 1C56881A 46880856 89064689 2056881E 46881646 89DA4688 .FÔ.F..F..V .F•.VÅ.F..V..F..V .F 000040
 FFDA46C7 011EE903 740B167E 83097408 187E8301 2DE91C56 891A4689 D85688D6 •.VÅ.F..V.Ô-..-..t..-..t.Ô..úFÔ. 000060
 26078826 E45EC476 EBFE4688 00C6E903 7C04FE7E 83FE46FF 03E80000 FE46C7FF .úF±..Š..F±.-±.|.ÔÔ..F±Švà^Ô&..& 000080
 02578826 0788260E 5EC46EE8 D05689CE 46890A57 18260847 2826E05E C4025788 .W.&^Å&+G.&.W..Fö.VÅŠnà^Å&..&.W. 0000A0
 5EC40657 88260447 8826E45E C451E8D0 5689CE46 890A5718 2608472B 26E45EC4 &^Ô&+G.&.W..Fö.VÅŠQà^Ô&.G.&.W.&^ 0000C0
 26E45EC4 06578826 04478826 E05EC433 E8D05689 CE46890E 5718260C 472826E0 Å&+G.&.W..Fö.VÅŠ3à^Å&.G.&.W.&^Ô& 0000E0
 00033086 74000230 9E740001 308674C0 0815E8D0 5689CE46 890E5718 260C4728 +G.&.W..Fö.VÅŠ..àt.•..t.=..tÑ=.. 000100
 057C197F 00563904 56880246 88127C00 0A7E83FF 58E9037D 00007E83 00E8CF74 tüŠ..-Å.).Ô(..-Ô.|..F•.VÅ9VÅ..|. 000120
 14750818 7E83FF2E E9DA4689 FE468804 56890246 89005688 CE468812 73CE4639 9Fos..Fö.VÅ.F•.VÅ.F±.FÔÔ..-..u. 000140
 14750816 7E830C46 89184688 03E80A9E 878802E3 C1DA5E88 0C752046 081E4688 .F..F u..^ÔèÔ.....Š..F..FÉ.-..u. 000160
 C70000FE 46C7DE46 89164688 03E80AA0 878802E3 C1DA5E88 0C751C46 081A4688 .F..F.u..^ÔèÔ.....Š..F..FßúF±..ú 000180
 06E82056 881E4688 087500FE 7E8300F1 E9037C02 FE7E83FE 46FF03E8 0000E846 FÔ..Š..F±.-±.|.Ôþ..-±.u..F..V Š. 0001A0
 56391975 26463924 56882246 880081E9 0374C208 FC5689FA 46891C56 881A4688 .F..V..Fª.V•.ôt.Ô...F".V$9F&u.9V 0001C0
 EA428003 E6C1FE76 88DE4689 DC468806 750B167E 830C7420 46081E46 88147528 (u..F..F t..-..u..FÉ.F&.v±èÌ..&ô 0001E0
```

```
Dump of file SATURN:[PCCOMMON.DUMP.DLL]BRDPLOW.TMP;1 on 18-APR-1990 10:38:06.00
File ID (528,44,0)   End of file block 272 / Allocated 272

Virtual block number 148 (00000094), 512 (0200) bytes

75264639 24568822 4688DC72 FFE6D1FE 7688E072 FFE272FF 02E6C1FE 76885016 .P.vsèl..rã.rÅ.vsll.rÉ.F".V$9F&u 000000
FF087528 56390075 26463924 56882246 88500001 8803E800 02880575 2856390A .9V(u.|..$.|..P.F".V$9F&u.9V(u.. 000020
E072FFE2 72FF02E6 C1FE7688 4CE80EC4 83F831E8 0E500001 8803EBE8 4688E846 FÒ.FÒ$.|..P.Ó1«.á.$L.vsèl..rã.rÅ 000040
05750BDC 7A83E6D1 FE768800 00FFFF9A 5016DC42 8DE6D1FE 7688FA76 FFFC76FF .v=.v*.vsll.BÉ.P......vsll.zÉ.u. 000060
1FA5A5A5 A5DABE1E 0716F088 EA7A8DFC 5688FA46 8803E6C1 FE768854 EB8DF388 |µ.$T.vsèl..F*.V=.zõ.Þ....ÖEEEE. 000080
1F161EEA 768DF888 125EC407 8926DE46 88065EC4 0789260C 46880A5E C4FF03E9 Ö..á^..FÉ&..á^..F8&..á^..=.võ... 0000A0
0024CAC9 5F5E1F00 EBC02B1F A5A5A5A5 1F161EF2 768DF888 0E5EC41F A5A5A5A5 ÈÈÈÈ.á^..«.v`...EEEE.+å$..^_èò$. 0000C0
6A006A50 52FA5689 F8468906 57882604 4788260A 5EC4088E 01E4881E 000008C8 à....|Ö..Äá^.&.G.&.W..F%.V*ÑPj.j 0000E0
FE5688FC 46881775 C008FFFF 0A589A50 16FC4680 F876FFFA 76FF0594 09C29A00 ..Ö....v*.vh.F=.P.X....áu..F=.Vs 000100
B81E5657 000004C8 C8C91F00 EBC028D5 EB06EB00 01880575 0856390A 75064639 9F.u.9V.u.|..$.$|+å$..èùà...WV.| 000120
8789260A 4688065E C4008C97 8926008A 8789260E 56880C46 88065EC4 D88E0566 f..Äá^..F..V.&....&....á^..F.&.. 000140
7F8D1256 88104688 FC5EC4FE 5689FC46 89008697 88260084 87882606 5EC40088 ..á^.&....&.....F=.Vsá^=.F..V... 000160
D88E05C0 881E0000 1CC8C8C9 5F5E1F00 E80001B8 1FA5F200 0889DA8E 1EF08816 ..Þ..Ö¿..`E.|..$..^_èùà....|à..Ä 000180
46D0A76 FF0C76FF 064609C2 9A006A00 6A0A76FF 0C76FFFE 568CFC46 89EC468D .F&.F=.Vs.v..v.j.j..Ö.F..v..v..F 0001A0
5052FC76 FFFE76FF E65689E4 4689EA56 88E84688 6D75C008 05840A58 9A5016E8 Ò.P.X....àum.FÒ.VÒ.FÒ.Vl.vs.v=RP 0001C0
FE76FF0E 76FF1076 FF1276FF 1476FF16 76FF1876 FF1A76FF 08C483FF FF1A339A .3....á..v..v..v..v..v..v..v..vs 0001E0

Dump of file SATURN:[PCCOMMON.DUMP.DLL]BRDPLOW.TMP;1 on 18-APR-1990 10:38:06.00
File ID (528,44,0)   End of file block 272 / Allocated 272

Virtual block number 149 (00000095), 512 (0200) bytes

E876FFEA 76FFFC76 FFFE76FF 2274C008 16C48300 33E80E06 76FF0876 FFFC76FF .v=.v..v..Ö3..á..àt".vs.v=.vÕ.vÒ 000000
C8C91F00 EBC02BFF 7FE907E8 0EC483FF 07E80E02 77FF2604 77FF26E4 5EC4026A j.á^Ö&.w.&.w..Ò...á.$.Ö..+å$..èü 000020
39260A5E C40657B8 26044788 26105EC4 03C1E90E 4688D88E 061CB81E 00000EC8 à....|...Ä.F.Öè.á^.&.G.&.W.á^.&9 000040
26072826 185EC402 57882607 882600C5 E9037704 47392609 7F0000E9 037D0657 W.).ÖÅ...&9G.w.Öé.&..&.W.á^.&+.& 000060
C40098E9 0372073B 26087C00 A2E9037E 02573826 105EC400 D2830001 0502571B .W.....@.á^.&;W.-.ÖÅ.|.&;.r.Ö..á 000080
573B2610 5EC400DA 83000120 02571326 07032618 5EC40A57 88260847 88260A5E ^.&.G.&.W.á^.&..&.W.-...Ö.á^.&;W 0000A0
39260A5E C4FA5689 F8468906 57882604 47882614 5EC46D76 07382605 7F747C02 .|t..&;.vmá^.&.G.&.W..F%.V*á^.&9 0000C0
47392606 7C0D7F06 573926FA 5688F846 88105EC4 1C760447 3926067F 247C0657 W.|$..&9G.v.á^..F%.V*&9W...|.&9G 0000E0
04478826 0A5EC416 EBFA5688 F8468808 74C008F2 4689C028 02E80001 88057304 .s.|..$.+á.F·.àt..F%.V*$.á^.&.G. 000100
C402F4E9 037FE9CC 2805E8F6 5689F446 8906571B 2604472B 26185EC4 06578826 &.W.á^.&+G.&.W..F¶.V-$.+áÖ..Ö¶.á 000120
C5E90372 0C473926 997C00D0 E9037E0E 5739260A 5EC40657 88260447 8826105E ^.&.G.&.W.á^.&9W.-.ÖÅ.|.&9G.r.Öé 000140
7E02573B 26105EC4 00028300 01050257 1826072B 26185EC4 02578826 07882600 .&..&.W.á^.&+.&.W.....@.á^.&;W.- 000160
26070326 185EC40A 57882608 4788260A 5EC40098 E9037207 3826087C 00A2E903 .ÖÅ.|.&;.r.Ö..á^.&.G.&.W.á^.&..& 000180
04478826 145EC46D 76073826 057F747C 02573826 105EC400 DA830001 20025713 .W.-...Ö.á^.&;W.|t..&;.vmá^.&.G. 0001A0
4688105E C41C730C 47392606 7C247F0E 5739260A 5EC4FA56 89F84689 06578826 &.W..F%.V*á^.&9W..$|.&9G.s.á^..F 0001C0
0874C008 F24689C0 2802E800 01880576 04473926 067F0D7C 06573926 FA5688F8 %.V*&9W.|...&9G.v.|..$.+á.F·.àt. 0001E0

Dump of file SATURN:[PCCOMMON.DUMP.DLL]BRDPLOW.TMP;1 on 18-APR-1990 10:38:06.00
File ID (528,44,0)   End of file block 272 / Allocated 272

Virtual block number 150 (00000096), 512 (0200) bytes

46890657 13260447 0326185E C40E5788 260C4788 260A5EC4 16EBFA56 88F8468B .F%.V*$.á^.&.G.&.W.á^.&.G.&.W..F 000000
7D025739 260A5EC4 02578826 07882610 5EC40205 E90290E9 C02805E8 F65689F4 ¶.V-$.+áÖ..Ö..á^.&..&.W.á^.&9W.) 000020
57182604 47282618 5EC40657 88260447 882600C5 E9037707 3926087F 00CFE903 .Öü...&9.w.Öé.&.G.&.W.á^.&+G.&.W 000040
5EC40095 E9037204 47382609 7C00A0E9 037E0657 3826105E C4000283 00010506 .....@.á^.&;W.-.Ö..|.&;G.r.Ö..á^ 000060
57382610 5EC400DA 83000120 06571326 04470326 185EC40E 5788260C 4788260A .&.G.&.W.á^.&.G.&.W.-...Ö.á^.&;W 000080
39260A5E C4FA5689 F9468902 57882607 8826145E C4687604 47382606 7F707C06 .|p..&;G.vhá^.&..&.W..F%.V*á^.&9 0000A0
73073926 057C0C7F 02573926 FA5688F8 4688105E C4187607 3926057F 227C0257 W.|".&9.v.á^..F%.V*&9W...|.&9.s 0000C0
57882607 88260A5E C414E8FA 5688F846 880874C0 08F24689 C02802E8 00018805 .|..$.+á.F·.àt..F%.V*$.á^.&..&.W 0000E0
8826105E C40118E9 01A3E9C0 2805E8F6 5689F446 8902571B 26072826 185EC402 .á^.&+.&.W..F¶.V-$.+áÖ.Ö..á^.&. 000100
04478826 00C7E903 72084739 26097C00 D2E9037E 0A573926 0A5EC402 57882607 .&.W.á^.&9W.-.Öá.|.&9G.r.Öü.&.G. 000120
A2E9037E 06573826 105EC400 D2830001 05065718 2604472B 26185EC4 06578826 &.W.á^.&+G.&.W.....@.á^.&;W.-.ÖÅ 000140
13260447 0326185E C40E5788 260C4788 260A5EC4 0097E903 72044738 26097C00 .|.&;G.r.Ö..á^.&.G.&.W.á^.&.G.&. 000160
26078826 145EC46A 76044738 26067F72 7C065738 26105EC4 000A8300 01200657 W.-...Ö.á^.&;W.|r..&;G.vjá^.&..& 000180
F8468810 5EC41873 08473926 067C237F 0A573926 0A5EC4FA 5689F846 89025788 .W..F%.V*á^.&9W..#|.&9G.s.á^..F% 0001A0
46880874 C008F246 89C02802 E8000188 05760739 26057F0C 7C025739 26FA5688 .V*&9W.|...&9.v.|..$.+à.F·.àt..F 0001C0
5689F446 89025713 26070326 185EC40A 57882608 4788260A 5EC415E8 FA5688F8 %.V*$.á^.&.G.&.W.á^.&..&.W..F¶.V 0001E0
```

```
Dump of file SATURN:[PCCOMMON.DUMP.DLL]BRDPLOW.TMP;1 on 18-APR-1990 10:38:06.00
File ID (528,44,0)   End of file block 272 / Allocated 272

Virtual block number 151 (00000097), 512 (0200) bytes

 2FE90375 00023DFD 26E90375 00013022 EB00ACE9 C02829EB 0083E9C0 2805EBF6 -$.+åÖ°.$)+åÖ¯.$"=..u.Ö&»=..u.Ö/ 000000
 46891457 88261247 8826065E C4D7EBFD FDE90375 00083DFE F2E90375 00043DFC •=..u.Ö ±=..u.Ö»=$øá^.&.G.&.W..F 000020
 F65639FE 568BF.46 88127508 0E7E8306 74020E7E 833C7500 0E7F8326 FE5689FC •.V±&....u<.~..t..~..u..F•.V±9V- 000040
 377CF656 39FE568B FC468842 75040E7E 83067401 0E7E831E 72F44639 057F257C |%..9F¶r..~..t..~..uB.F•.V±9V-|7 000060
 8926F246 88065EC4 14578926 12478926 F6568BF4 4688065E C43076F4 4639057F ..9F¶vÖá^..F¶.V-&.G.&.W.á^..F·&. 000080
 2CC8CBC9 1F00E8C0 2804E800 01880000 0E47C726 0674000E 7F832606 5EC41047 G.á^.&....t.&üG...¡..$.+å$..èüà, 0000A0
 89084689 005E05DE 56890C46 8918578B 2616478B 260C5EC4 D88E06C6 881E0000 ...¡6..Äá^.&.G.&.W..FÉ.V8.^..FÄ. 0000C0
 0676FF08 76FF0888 09C29A00 6A006A06 76FF0876 FFF6568C F44689E4 4680DA56 VÖ.F8.F¶.V-.v..v.j.j..ö....v..v. 0000E0
 0E76FFD6 56890446 89FA568B F8468801 22E90374 C0080C26 0A589A50 16F8468D .F%.P.X.&..ât.Ö"..F%.V°.Få.Vø.v. 000100
 26077F4E 7C0058 7F 8326D45E C400ADE9 0375C008 08C483F9 B7E80E50 520C76FF .v.RP.Öñ°.á..âu.ÖÜ.á^â&..X.|N..& 000120
 264477FF 260A76FF 1076FF12 76FF1476 FF1676FF D876FFDA 76FF4574 00567F83 ..V.tE.vÖ.vÅ.v..v..v..v..v.&.wÖ& 000140
 86978826 0084878B 260C5EC4 1774C008 16C483FA 29E80E0C 76FF0E76 FF4277FF .wB.v..v..Ö)°.á..ât.á^É&....&... 000160
 468D5052 E25689E0 46894057 88263E47 8826045E C4025789 26078926 185EC400 .á^.&..&.W.á^â&.G>&.Wø.FÅ.VãRP.F 000180
 FF1676FF 1876FF1A 76FF2874 00FC7E83 067F307C 00FE7E83 063600F0 9A5016FC •.P.Þ.6..~±.|0...~•.t(.v..v..v.. 0001A0
 50EB16C4 83FEE3E8 0EE076FF E276FF0A 78FF0C76 FF0E76FF 1076FF12 76FF1476 v..v..v..v..v..v..vã.vÅ.ÖD±.á.$P 0001C0
 1476FF16 76FF0876 FFDA76FF 08C48306 6317029A D476FFD6 76FFF476 FFF676FF .v~.v¶.vø.vå...c..á..vÖ.vÄ.v..v. 0001E0

Dump of file SATURN:[PCCOMMON.DUMP.DLL]BRDPLOW.TMP;1 on 18-APR-1990 10:38:06.00
File ID (528,44,0)   End of file block 272 / Allocated 272

Virtual block nur er 152 (00000098), 512 (0200) bytes

 1074C008 16C483FA 27E80E0C 76FF0E76 FFF476FF F676FF0A 76FF1076 FF1276FF .v..v..v..v~.v¶.v..v..Ö'°.á..ât. 000000
 56570000 18C8C8C9 1F00E8C0 28FEC7E9 02578926 078926FA 568BF846 88185EC4 á^..F%.V°&..&.W.Öü±+å$..èüà...WV 000020
 06740106 7E830C74 08067E83 12740406 7E83FC46 89FE4689 C028088E 0844881E .¡D..Ä+á.F±.F•.~..t..~..t..~..t. 000040
 46881074 12460810 46881874 0E46080C 46882074 0A460808 46882875 02067E83 .~..u(.F..F.t .F..F.t..F..F.t..F 000060
 8918578B 2616478B 26085EC4 01E4E98D F3880675 1A460818 46880874 16460814 ..F.t..F..F.u.|µ.Öð.á^.&.G.&.W.. 000080
 46890257 8826078B 26085EC4 00001047 C726085E C40001DE 47C726F6 5689F446 F¶.V-&üG...á^.&üG...á^.&..&.W..F 0000A0
 8826F85E C408E80A 57882608 478826F4 5EC40075 C208FA56 89F84689 F25689F0 Þ.V·.F%.V°.ðu.á^¶&.G.&.W.$.á^%&. 0000C0
 0A76FF0C 76FF0E76 FF1076FF 1276FF50 16FC468D EE5689EC 46894057 88263E47 G>&.Wø.F&.VŸ.F•.P.v..v..v..v..v. 0000E0
 8E1EF088 F8880E56 880C4688 145EC416 C483FD80 E80EEC76 FF520676 FF0876FF .v..v.R.v&.Ö¯».á.á^..F..V..«.Þ.. 000100
 88260447 8826145E C4008DE9 06468800 E1E90374 FE4608FC 46881FA5 A5A5A5DA ÖEEEE..F•.F±t.ÖÅ..F.Ö§.á^.&.G.&. 000120
 8926145E C406578B 2604478B 26137604 47392606 7F187C06 57392610 5EC40657 W.á^.&9W.|...&9G.v.&.G.&.W.á^.&. 000140
 26067C1B 7F065739 26105EC4 06578826 04478826 145EC400 A7E90657 89260447 G.&.W.ÖI.á^.&.G.&.W.á^.&9W...|.& 000160
 07882614 5EC476EB 06578926 04478926 145EC406 57882604 47882613 73044739 9G.s.&.G.&.W.á^.&.G.&.W.$vá^.&.. 000180
 8926145E C402578B 26078826 11760739 26057F18 7C025739 26105EC4 02578826 &.W.á^.&9W.|...&9.v.&..&.W.á^.&. 0001A0
 73073926 057C187F 02573926 105EC402 57882607 8826145E C449E802 57892607 .&.W.$Iá^.&..&.W.á^.&9W...|.&9.s 0001C0
 75000230 FF60E903 7500013D 1CE80257 89260789 26145EC4 02578826 07882611 .&..&.W.á^.&..&.W.$.=..u.Öm.=..u 0001E0

Dump of file SATURN:[PCCOMMON.DUMP.DLL]BRDPLOW.TMP;1 on 18-APR-1990 10:38:06.00
File ID (528,44,0)   End of file block 272 / Allocated 272

Virtual block number 153 (00000099), 512 (0200) bytes

 E8468914 57882612 47882608 5EC452E8 00E88C74 0008308E 7400043D FF33E903 .Ö3.=..t/=..t.$.$Rá^.&.G.&.W..FÒ 000000
 E8025789 26078926 EA5688E8 4688145E C4127508 067E8306 7404067E 83EA5689 .Võ.-..t..-..u.á^..FÒ.VÕ&..&.W.$ 000020
 4689C028 08740010 7F832608 5EC40657 89260447 8926EA56 88E8468B 145EC411 .á^..FÒ.VÕ&.G.&.W.á^.&....t.+á.F 000040
 0014C8CB C95F5E1F 00E8C028 02578926 078926FE 568BFC46 88185EC4 FC4689FE ±.F•á^..F•.V±&..&.W.+å$..^_èüà.. 000060
 FC468900 1605F856 89F64689 0086978B 26008487 8826065E C4088E0C C2881E00 ..¡6..Äá^.&....&.....F-.V%¯...F• 000080
 F05689EE 4689008C 97882600 8A878826 F45689F2 4689005E 05C28CC3 88FE5689 .V±.ú.6.^..F·.V¶&....&.....FŸ.VÞ 0000A0
 7E83EC46 89C02802 E8000188 05750002 30057400 0130FA46 8946478B 26EE5EC4 á^Y&.GF.F°=..t.=..u.¡..$.+á.F&.- 0000C0
 C40087E9 FA468800 84E90375 EC4638C0 2802E800 01880575 020A7E83 0674010A ..t..-..u.¡..$.+á;F&u.ÖÇ..F°Ö..á 0000E0
 06578926 04478926 0C5EC406 57132604 470326F2 5EC40E57 88260C47 8826FC5E ^•&.G.&.W.á^·&.G.&.W.á^.&.G.&.W. 000100
 26044789 260C5EC4 06571826 04472826 F25EC406 57882604 478826FC 5EC47DE8 $)á^•&.G.&.W.á^·&+G.&.W.á^.&.G.& 000120
 0789260C 5EC40257 13260703 26F25EC4 0A578826 08478826 FC5EC45A E8065789 .W.$Zá^•&.G.&.W.á^·&..&.W.á^.&.. 000140
 0789260C 5EC40257 18260728 26F25EC4 02578826 078826FC 5EC439EB 02578926 &.W.$9á^•&..&.W.á^·&+.&.W.á^.&.. 000160
 C400EBA8 7400083D CE740004 3DFF6CE9 03750002 30977400 013019EB 02578926 &.W.$.=..t.=..u.Öl.=..tö=..t´$.á 000180
 5EC4088E 0F03881E 000016C8 CBC91F00 EBC02804 E8000188 078926FA 4688105E ^..F°&..¡..$.+å$..èüà....¡...Äá^ 0001A0
 F45689F2 46890457 88260247 8826EA5E C4EC5689 EA468922 57882620 4788260C .&.G &.W".Fõ.V&á^õ&.G.&.W..F·.V¶ 0001C0
 46891057 88260E47 8826EA5E C4FE5689 FC468900 86978826 0084878B 26F25EC4 á^·&....&.....F•.V±á^õ&.G.&.W..F 0001E0
```

```
Dump of file SATURN:[PCCOMMON.DUMP.DLL]BRDPLOW.TMP;1 on 18-APR-1990 10:38:06.00
File ID (528,44,0)   End of file block 272 / Allocated 272

Virtual block number 154 (0000009A), 512 (0200) bytes

88337408 573926F6 75064739 26EE5EC4 FA5689F8 46890856 8806468B F05689EE Y.VÞ.F..V..F½.V¹6^Ÿ&9G.u.&9W.t3. 000000
F05688EE 46881475 0200888F 8326F25E C41F75FA 56392475 F84639FE 5688FC46 F=.V±9F¼u&9V¹u.6^·&.¢...u..FŸ.VÞ 000020
26145EC4 F6468946 478826EE 5EC440E8 C0280474 008C9739 26077500 8A873926 &9...u.&9...t.+åŠM6^Ÿ&.GF.F-6^.& 000040
C40657B8 26044788 26145EC4 1A740257 39260675 07392610 5EC40257 882607B8 ..&.W.6^.&9.u.&9W.t.6^.&.G.&.W.6 000060
1F00EBC0 2804EB00 01880574 0A4639F6 46880075 06573926 13750447 3926105E ^.&9G.u.&9W.u..F-9F.t.|..$.+åŠ.. 000080
0674010A 7E830C74 J80A7E83 1274040A 7E83088E 103AB81E 56570000 2CC8C8C9 èùà,..WV.¡:..Ä.~..t..~..t..~..t. 0000A0
46881874 12460810 46882074 08460806 46882874 0E46080C 46883075 020A7E83 .~..u0.F..F.t(.F..F.t .F..F.t..F 0000C0
5EC40874 22460820 46881675 22460820 46880874 1A460818 46881074 16460814 ..F.t..F..F.t..F .F"u..F .F"t.6^ 0000E0
EB5EC4EA 5689E846 89185788 26164788 260C5EC4 02CCE980 F3880000 07C72620  &ú...|µ.Öë.6^.&.G.&.W..FÒ.Vô6^Ò 000100
56881046 88185EC4 000007C7 26205EC4 FE5689FC 46890086 97882600 84878826 &....&.....F=.V±6^ &ú...6^..F..V 000120
2A750646 39FE5688 FC468800 0007C726 205EC41F A5A5A5A5 DA8E1EF0 88F88812 ..«.Þ..ÖEEEE.6^ &ú....F=.V±9F.u" 000140
C483FCFF E80EE876 FFEA76FF 0A76FF18 76FF1A76 FF1C76FF 1E76FF25 75085639 9V.uX.v..v..v..v..v..võ.vÒ.Ò.=.6 000160
89085688 064688E6 5689E446 89005E05 EA5688E8 4688024E E9C02805 74C0080E ..èt.+åÖN..FÒ.Võ.^..FÒ.VÌ.F..V.. 000180
1605E256 88E0468B 1874C008 08C483F3 2FE80E50 520C76FF 0E76FFE2 5689E046 FÅ.Vå.v..v.RP.Ö/µ.6..èt..FÅ.Vã.. 0001A0
029AE076 FFE276FF 5016EC46 8D13E81F A5F20008 89DA8E1E 0716F088 EC7E8000 ..~&.Þ....Ö¿..·E.$..F$.P.vã.vÅ.. 0001C0
76FFE276 FF0A76FF 0C76FF0E 76FF1876 FF1A76FF 1476FF16 76FF08C4 830C6F17 .o..6..v..v..v..v..v..v..v..vã.v 0001E0

Dump of file SATURN:[PCCOMMON.DUMP.DLL]BRDPLOW.TMP;1 on 18-APR-1990 10:38:06.00
File ID (528,44,0)   End of file block 272 / Allocated 272

Virtual block number 155 (0000009B), 512 (0200) bytes

83067404 0A7E8301 8FE9C02B 000107C7 26205EC4 0D74C008 12C483FD AFE80EE0 Å.Ö€».6..Åt.6^ &ú...+åÖ¢..~..t.. 000000
4E2B0677 8826044F 88260657 1B260447 2B26145E C4FA5688 F8468875 75080A7E ~..uu.F½.V¹6^.&+G.&.W.&.O.&.w.+N 000020
C4FA5613 F8460306 57882604 478826E4 5EC42673 C138047C 2C7F0638 F27618F0 Þ.v·;ø..|.;ès&6^Ö&.G.&.W..F½.V¹6 000040
472B26E4 5EC4F256 88F0468B 24E80002 07C7261C 5EC40657 89260447 8926185E ^.&.G.&.W.6^.&ú...$$.FÞ.V·6^Ö&+G 000060
F6568BF4 46886DEB 000107C7 261C5EC4 06578926 04478926 185EC406 57182604 .&.W.6^.&.G.&.W.6^.&ú...Şm.F¶.V- 000080
73C13B04 7C2A7F06 38EE7618 EC4E2802 7788260F 88260257 18260728 26145EC4 6^.&+.&.W.&..&.w.+NŠ.vŸ;ø.*|.;ès 0000A0
C7261C5E C4025789 26078926 185EC4F6 5613F446 03025788 26078826 E45EC424 $6^Ö&..&.W..F¶.V-6^.&..&.W.6^.&ú 0000C0
C4025789 26078926 185EC402 57182607 2B26E45E C4EE5688 EC468822 E8000807 ...$".F&.VŸ6^Ö&+.&.W.6^.&..&.W.6 0000E0
5EC40257 882607B8 26145EC4 00C0E903 75000C7F 83260C5E C4000407 C7261C5E ^.&ú...6^.&....u.Öà.6^.&..&.W.6^ 000100
04472B26 185EC406 57882604 47882614 5EC40656 89044689 02571826 07282618 .&+.&.W..F&.Vø6^.&.G.&.W.6^.&+G. 000120
04750008 7E83067C 0C7F000A 7E8342EB 0788261C 5EC4DA56 89084689 06571826 &.W..FÅ.VÖ6^.&..$8.-Ö...|..~Å.u. 000140
04750004 7E83067C 0C7F0006 7E8338EB 68E8C02B 047C000A 7E8344EB 74E8C02B +åŠt$D.-Ö.|.+åŠh$8.-ø...|..~å.u. 000160
04308474 000230C0 74000130 16E818EB 48E8C02B 047C0006 7E8324EB 54E8C02B +åŠT$$.-ø.|.+åŠH$.$.=..tê=..tÇ=. 000180
76FF1A76 FF1476FF 1676FF18 76FF1A76 FF50160C 468000EB CA740008 30E37400 .tD=..tòŠ..FÉ.P.v..v..v..v..v..v 0001A0
0008C8C8 C95F5E1F 00E8C02B 16C483F8 69E80E37 FF261C5E C40C76FF 0E?c?F18 ..v..v.6^.&.7.Öi½.6.+åŠ..^_èùà.. 0001C0
88067510 46080E46 8808740C 46080A46 88107408 46080646 88088E11 2A88 ?00 ..|*..Ä.F..F.t..F..F.t..F..F.u.| 0001E0

Dump of file SATURN:[PCCOMMON.DUMP.DLL]BRDPLOW.TMP;1 on 18-APR-1990 10:38:06.00
File ID (528,44,0)   End of file block 272 / Allocated 272

Virtual block number 156 (0000009C), 512 (0200) bytes

263647B8 26FC5EC4 11E8FE56 89FC4689 38578826 36478826 065EC400 8EE980F3 µ.Ö..6^.&.G6&.W8.F=.V±$.6^=&.G6& 000000
89F84689 38578826 36478826 0A5EC454 74FE4608 FC4688FE 5689FC46 893857B8 .W8.F=.V±.F=.F±tT6^.&.G6&.W8.F½. 000020
F8468826 74FA4608 F84688FA 5689F846 893857B8 263647B8 26F85EC4 11E8FA56 V¹$.6^½&.G6&.W8.F½.V¹.F½.F¹t&.F½ 000040
E8C02802 57892607 8926FE56 88FC4688 0E5EC414 75FE5639 1975FC46 39FA5688 .V¹9F=u.9V±u.6^..F=.V±&..&.W.+åŠ 000060
D88E1463 881E0000 06C8C8C9 1F00E807 89260247 8926C02B 0E5EC493 E8C1E812 .Şé$.Å^.+å&.G.&..$..èùà....¡c..Ä 000080
88FE5689 FC46890C 56880A46 880CE8FE 5689FC46 89085688 06468800 02FA46C7 úF¹...F..V..F=.V±$..F..V..F=.V±. 0000A0
FE5689FC 46893857 88263647 8826FC5E C4117500 167E8355 74C008FA 4EFFFA46 F¹.N¹.åtU.~..u.6^=&.G6&.W8.F=.V± 0000C0
76FF006A 016A006A 006A1276 FF1476FF 2C74FE56 390575FC 46391056 880E4688 .F..V.9F=u.9V±t,.v..v.j.j.j.j..v 0000E0
C02895E8 C4E8FE56 89FC4689 38578826 36478826 FC5EC408 7802909A FC76FFFE ±.v=...x.6^=&.G6&.W8.F=.V±ŠåŠ.+å 000100
8808740C 46080A46 88107408 46080646 88088E15 1C881E00 0002C8C8 C91F00E8 $..èùà....|...Ä.F..F.t..F..F.t.. 000120
530653E8 80F58805 75184708 26164788 260E5EC4 65E880F3 88057510 46080E46 F..F.u.|µ.Şeå^.&.G.&.G.u.|½.$S.S 000140
C41276FF 35E80274 C008FE46 890CC483 FE6DE80E 0676FF08 76FF0A76 FF0C76FF .v..v..v..v..Òm±.6..F±.åt.$5.v.6 000160
F5E80E06 76FF0876 FF0A76FF 0C76FF37 FF260277 FF260477 FF260677 FF260E5E ^.&.w.&.w.&.w.&.7.v..v..v..v..ÒK 000180
4688D88E 15A8881E 000008C8 C8C91F00 E8C02804 E80274C0 08FE4689 12C483FE ±.6..F±.åt.$.+åŠ..èùà....|·..Ä.F 0001A0
46890A57 88260847 8826065E C457E880 F3880575 0C46080A 46880874 08460806 ..F.t..F..F.u.|µ.ŠW6^.&.G.&.W..F 0001C0
76FFFE76 FF168909 C29A006A 006AFC76 FFFE76FF 3EE8C02B 04750008 FE5689FC =.V±.Åu.+åŠ>.v±.v=j.j..ö....v±.v 0001E0
```

Dump of file SATURN:[PCCOMMON.DUMP.DLL]BRDPLOW.TMP;1 on 18-APR-1990 10:38:06.00
File ID (528,44,0)   End of file block 272 / Allocated 272

Virtual block number 157 (0000009D), 512 (0200) bytes

```
B80575FA 56390A75 F846390C 56880A46 881775C0 0815870A 589A5016 F8468DFC •.F%.P.X....åu..F..V.9F%u.9V°u.| 000000
6A0A76FF 0C76FFD8 8E163A88 1E565700 0042C8C8 C91F00E8 C02805E8 06E80001 ..Š.Ší+äŠ..èüàB..WV.¡:..Ä.v..v.j 000020
FF00FDE9 0374C008 16790A58 9A5016CC 46800A76 FF0C76FF 160609C2 9A006A00 .j..ó.ø..v..v..Fä.P.X.y..ât.Õ».. 000040
4689CE56 88CC4688 D0E80274 C00808C4 83FF45E8 0E0676FF 0876FFCC 76FFCE76 vö.vä.v..v..ÒE..á..ât.ŠÀ.Fä.Vö.F 000060
1F161E07 16F0768D E07E8D08 C4831261 1A339AC8 76FF5250 16F0468D CA5689C8 à.Vò.Fþ.PR.và.3.ø..á..-Å.vþ..... 000080
04478826 C45689C2 4689000A 8300012D 02578826 0788260E 5EC41FA5 F2000889 ¿...Ë.á^.&..&.W.-...Ö..Fô.Vá&.G. 0000A0
11E84601 E25619E0 4629C456 88C24688 C05689BE 4689000A 8300012D 06578826 &.W.-...Ö..Ff.Và.Fò.Vá)FÁ.Vã.FÒ. 0000C0
16F088D0 7E8D1456 88124688 EE5611EC 4601E656 19E44629 C05688BE 4688EA56 Võ.Ff.Và)FÒ.VÌ.F&.VŸ.F..V..-Å.þ. 0000E0
46805016 0046801F A5A5A5A5 DA8E1EF0 88087E8D 0008051F A5A5A5A5 DA8E1E07 ...ÖEEEE.....~Ä.þ..ÖEEEE..FÄ.P.F 000100
CE76FF50 16F0468D 217400C6 7E830000 FFFF9A50 16C6468D 5016E046 80501608 Ä.P.FÄ.P.Fó.P......-ó.t!.Fþ.P.vö 000120
00E8C02B FEECE907 E80EC483 EDE4E80E 0277FF26 0477FF26 C85EC402 6ACC76FF .väj.á^à&.w.&.w..ÒõÚ.á.Š.Õš±+äŠ. 000140
26078826 125EC40C 7408460B 06468808 8E1685B8 1E565700 003AC8C8 C95F5E1F .^_èüà:..WV.¡ç..Ä.F..F.t.á^.&..& 000160
26164788 26FA5689 F8468918 57882616 4788260A 5EC401B9 E9C02805 74024708 .G‾t.+äÕ¿.á^.&.G.&.W..F%.V°&.G.& 000180
76FF0876 FF184909 C29A006A 006A0676 FF0876FF F65689F4 4689005E 05185788 .W..^..F¶.V-.v..v.j.j..ó.I..v..v 0001A0
76FFF256 89F04689 FE5688FC 46880160 E90374C0 0816C60A 589A5016 FC468D06 ..F•.P.X.ó..ât.Õm..F•.V±.Fþ.V·.v 0001C0
83FE2EE8 0E0A76FF 0C76FF42 77FF2644 77FF26F0 5EC4F476 FFF676FF 0E76FF10 ..v..v—.v¶á^þ&.wO&.wB.v..v..Ò.±. 0001E0
```

Dump of file SATURN:[PCCOMMON.DUMP.DLL]BRDPLOW.TMP;1 on 18-APR-1990 10:38:06.00
File ID (528,44,0)   End of file block 272 / Allocated 272

Virtual block number 158 (0000009E), 512 (0200) bytes

```
E9C02802 57892607 8V26125E C4008697 88260084 8788826F8 5EC41C74 C00810C4 á..ât.á^%&....&....á^.&..&.W.+äÕ 000000
FF1276FF 1476FF27 74C00808 C483ECAE E80EFC76 FFFE76FF 0A76FF0C 7L '0121 I..v..v..v±.v•.ÒÚ&.á..ât'.v..v.. 000020
000CE910 C483FF08 E80E3E77 FF264077 FF26F05E C40A76FF 0C76FF0E 76F 1076 v..v..v..v.á^þ&.wô&.w>.Ò...á.ÕÉ. 000040
F2568BF0 4688FF41 E90374C0 0808C483 FD44E80E 0A76FF0C 76FFFC76 FFFE.'6FF .v±.v•.v..v..ÒD».á..ât.ÕA..Fþ.V· 000060
00012002 57882607 8826F45E C41FA5F2 0008890A 8E1E0716 F088E07E 80001605 ....-Å.þ....Ö¿..·Ë.á^¶&..&.W.-.. 000080
CA4688C8 5689C646 89000A83 00012006 57882604 478826CC 5689CA46 89000A83 .Ö..Fò.Va&.G.&.W.-...Ö..Fó.Và.Fò 0000A0
5611EC46 01E65619 E44629C8 5688C646 88EA5611 E84601E2 5619E046 29CC5688 .Vä)FÁ.Vã.FÒ.Võ.Fó.Và)FÒ.VÌ.F&.V 0000C0
8E1EF088 D07E8000 08051FA5 A5A5A5DA 8E1E0716 F088087E 80105688 0E4688EE Ÿ.F..V..-Å.þ....ÖEEEE.....~Å.þ.. 0000E0
83000017 AE9A5016 CE468D50 16E0468D 50160046 80501608 46801FA5 A5A5A5DA ÖEEEE..FÄ.P.FÄ.P.FÄ.P.Fö.P.Û.... 000100
28FE7CE9 07E8C028 02578926 078926FE 5688FC46 88125EC4 FE93E903 7500CE7E -ö.u.Õ.±á^..F•.V±&..&.W.+äŠ.Õ|±+ 000120
0C46080A 46881074 08460806 4688D88E 17ED881E 000010C8 CBC95F5E 1F00E8C0 äŠ..^_èüà....¡Ü..Ä.F..F.t..F..F. 000140
F3880789 26024789 26C0280E 5EC40C74 1046080E 46881975 1046080E 46880874 ŧ..F.‾F.u..F..F.t.á^.+ä&.G.&..¡µ 000160
FA5689F8 46891857 88261647 8826065E C4078926 02478926 C0280E5E C471E88D .Šqá^.+ä&.G.&..á^.&.G.&.W..F%.V° 000180
88260847 8826F85E C40075C2 08FE5689 FC4689F6 5689F446 89025788 26078826 &..&.W..F¶.V-.F•.V±.òu.á^%&.G.&. 0001A0
76FF0C76 FF0E76FF 1076FFF2 5689F046 89405788 263E4788 26FC5EC4 08E80A57 W.Š.á^•&.G>&.W@.Fþ.V·.v..v..v..v 0001C0
8E19CE88 1E000020 C8C8C91F 00E8C02B 10C483FD 78E80E50 520676FF 0876FF0A ..v..v.RP.Òx».á.+äŠ..èüà ...¡ö.. 0001E0
```

Dump of file SATURN:[PCCOMMON.DUMP.DLL]BRDPLOW.TMP;1 on 18-APR-1990 10:38:06.00
File ID (528,44,0)   End of file block 272 / Allocated 272

Virtual block number 159 (0000009F), 512 (0200) bytes

```
800676FF 0876FF1A A709C29A 006A006A 0676FF08 76FFFE56 8CFC4689 EC468D08 Ä.F&.F•.V±.v..v.j.j..ô.Ï..v..v.. 000000
101A339A E876FFEA 76FFFC76 FFFE76FF 00FCE903 74C00818 390A589A 5016E846 FÒ.P.X.9..ât.Õ•..v±.v•.võ.vÒ.3.. 000020
88260447 8826E656 89E44689 00DA8300 012D0257 8826078B 260A5EC4 08C48317 ..á.á^.&..&.W.-...Ö..FÒ.VÌ&.G.&. 000040
5EC40257 19260729 26E6568B E4468BFC 5EC4E256 89E04689 000A8300 012D0657 W.-...Ö..FÁ.Väá^•.FÒ.V|&).&.W.á^ 000060
06571926 04472926 E2568BE0 468BFC5E C40A5711 26084701 26E6568B E4468BFC •.FÒ.VÌ&.G.&.W.á^•.FÁ.Vã&)G.&.W. 000080
3926FC5E C402578B 26078826 0E5EC40E 5711260C 470126E2 568BE046 8BFC5EC4 á^•.FÁ.Vä&.G.&.W.á^.&..&.W.á^•&9 0000A0
3926067F 427C0A57 39260E5E C402578B 26078826 52720847 3926067F 5A7C0A57 W.|Z..&9G.rR&..&.W.á^.&9W.|B..&9 0000C0
1E770447 3926067C 267F0657 39260E5E C40E578B 260C478B 26FC5EC4 3A720847 G.r:á^•&.G.&.W.á^.&9W..&|.&9G.w. 0000E0
C02802E8 0001B805 77044739 26067C0D 7F065739 26FC5EC4 0E578B26 0C478826 &.G.&.W.á^•&9W...|.&9G.w.¡..Š.+ä 000100
8808BE1A 7D881E56 57000024 C8C8C91F 00E8C02B FEEDE907 E80001B8 0574C008 .ât.¡..Š.ÕÚ±+äŠ..èüàŠ..WV.¡)..Ä. 000120
26164788 260A5EC4 019AE9C0 28057402 47082607 8826125E C40C7408 46080646 F..F.t.á^.&..&.G.t.+äÕ..á^.&.G.& 000140
76FF0876 FF1C0909 C29A006A 006A0676 FF0876FF EA5689E8 4689005E 0518578B .W..^..FÒ.Võ.v..v.j.j..ô....v..v 000160
76FFE656 89E44689 FE568BFC 4688015C E90374C0 081A970A 589A5016 FC468D06 ..F•.P.X....ât.Õ\..F•.V±.FÒ.VÌ.v 000180
1574C008 0CC483FE 3EE80E42 77FF2644 77FF26E4 5EC4E876 FFEA76FF 0E76FF10 ..v..võ.vÒá^ð&.wO&.wB.Ò>±.á..ât. 0001A0
76FFFE76 FF0A76FF 0C76FF01 10E9C02B 02578926 078926FE 568BFC46 8B125EC4 á^..F•.V±&..&.W.+äÕ...v..v..v±.v 0001C0
5EC40A76 FF0C76FF 0E76FF10 76FF1276 FF1476FF 2774C008 08C483E8 FBE80EFC •.Õ«Õ.á..ât'.v..v..v..v..v..v.á^ 0001E0
```

```
Dump of file SATURN:[PCCOMMON.DUMP.DLL]BRDPLOW.TMP;1 on 18-APR-1990 1.:38:06.00
File ID (528,44,0)   End of file block 272 / Allocated 272

Virtual block number 160 (000000A0), 512 (0200) bytes

8BEC7E8D 001605E6 5688E446 8800D8E9 10C483FF 26E80E3E 77FF2640 77FF26E4 ö&.w&&.w>.ö&..6.öÄ..FÖ.V|....~&. 000000
89E04689 000A8303 01200257 88260788 26E85EC4 1FA5F200 08B90A8E 1E0716F0 Þ....Ö¿..`Ê.6^ò&..&.W.-...Ö..FÅ. 000020
19EC4629 E25688E0 4688DE56 89DC4689 000A8300 01200657 88260447 8826E256 Vâ&.G.&.W.-...Ö..FÉ.VB.FÁ.Vâ)Fâ. 000040
F446880E 5EC4FA56 11F84601 F25619F0 46290E56 88DC4688 F65611F4 4601EE56 VŸ.F¶.V-.FÉ.VB)FÞ.V`.F%.V*6^..F¶ 000060
3926067F 357C0A57 3926EE56 88EC4688 41770739 26057C48 7F025739 26F65688 .V-&9W..H|.&9.wA.Fâ.VŸ&9W.|5..&9 000080
3926F256 88F04688 19770447 3926067C 217F0657 3926FA56 88F84688 20720847 G.r-.F%.V*&9W..||.&9G.w..FÞ.V·&9 0000A0
FE5688FC 4688125E C41474C0 08C02802 E8000188 05720C47 3926067F 0D7C0E57 W.|...&9G.r.|..$.+â.ât.6^..F=.V± 0000C0
8E188888 1E000010 C8C8C95F 5E1F00E8 C028FE8D E907E8C0 28025789 26078926 &..&.W.+âS.Ö.±+âS..^_èùà....|É.. 0000E0
74104608 0E468819 75104608 0E468808 740C4608 0A468810 74084608 06468808 Ä.F..F.t..F..F.t..F..F.u..F..F.t 000100
5EC40789 26024789 26C0280E 5EC471E8 8DF38807 89260247 8926C028 0E5EC40C .6^.+â&.G.&..|µ.$qâ^.+â&.G.&..6^ 000120
89FC4689 F65689F4 46890257 88260788 26FA5689 F8468918 57882616 47882606 .&.G.&.W..F%.V*&..&.W..F¶.V-.F=. 000140
46894057 88263E47 8826FC5E C408E80A 57882608 478826F8 5EC40075 C208FE56 V±.öu.6^%&.G.&.W.$.6^=&.G>&.W@.F 000160
2810C483 FD97E80E 50520676 FF0876FF 0A76FF0C 76FF0E76 FF1076FF F25689F0 Þ.V`.v..v..v..v..v..v.RP.Ö.».6.+ 000180
6A0676FF 0876FFFE 568CFC46 89EC4680 D88E1D7D 881E0000 18C8C8C9 1F00E8C0 âS..èùà....|)..Ä.Fâ.F=.V±.v..v.j 0001A0
FFFE76FF 4475C008 18F90A58 9A5016E8 46800676 FF0876FF 1E5609C2 9A006A00 .j..ö.V..v..v..FÖ.P.X.*..àuÐ.V±. 0001C0
FF1676FF 1876FF1A 76FF1C76 FF1E76FF 08C4831A 8F1A339A E876FFEA 76FFFC76 v=.vö.vÖ.3.€..6..v..v..v..v..v.. 0001E0

Dump of file SATURN:[PCCOMMON.DUMP.DLL]BRDPLOW.TMP;1 on 18-APR-1990 10:38:06.00
File ID (528,44,0)   End of file block 272 / Allocated 272

Virtual block number 161 (000000A1), 512 (0200) bytes

A8E81AC4 83000CE8 0EFC76FF FE76FF0A 76FF0C76 FF0E76FF 1076FF12 76FF1476 v..v..v..v..v..v..v±.v=.Ö...6.$` 000000
16568814 4688065E C401E2E9 0E4688D8 8E1E2C88 1E000000 C8C8C91F 00E8C028 +âS..èùà....|...Ä.F.Öâ.6^..F..V. 000020
77073926 057C537F 02573926 1A568818 46885F72 08473926 067F677C 0A573926 &9W.|g..&9G.r_.F..V.&9W..S|.&9.w 000040
C4025788 26078826 1C5EC438 760C4739 26067F40 7C0E5739 26125688 1046884C L.F..V.&9W.|a..&9G.v8â^.&..&.W.6 000060
26044728 260A5EC4 06578826 04478826 10770447 3926067C 257F0657 3926065E ^.&9W..X|.&9G.w.&.G.&.W.6^.&+G.& 000080
7F677C0A 57392616 56881446 88065EC4 0188E902 57892607 89261C5E C4065718 .W.6^.&..&.W.Ö..6^..F..V.&9W.|g. 0000A0
12568810 46884C77 07392605 7C537F02 5739261A 56881846 885F7208 47392606 .&9G.r_.F..V.&9W..S|.&9.wL.F..V. 0000C0
7C0E5739 26065EC4 02578826 0788261C 5EC43873 04473926 067C407F 06573926 &9W..a]|.&9G.s8â^.&..&.W.6^.&9W.| 0000E0
261C5EC4 06571326 04470326 0A5EC40E 5788260C 4788261D 720C4739 26067F25 %..&9G.r.&.G.&.W.6^.&.G.&.W.6^.& 000100
50720C47 3926067F 657C0E57 39261656 88144688 065EC401 12E90257 89260789 ..&.W.Ö..6^..F..V.&9W.|e..&9G.r] 000120
307C0A57 39261256 88104688 49770447 3926067C 517F0657 39261A56 88184688 .F..V.&9W..Q|.&9G.wI.F..V.&9W.|= 000140
07392605 7C227F02 57392606 5EC40257 88260788 261C5EC4 35760847 3926067F ..&9G.v5â^.&..&.W.6^.&9W.."|.&9. 000160
0098E902 57892607 89261C5E C4025718 26072826 0A5EC402 57882607 88261877 w.&..&.W.6^.&+.&.W.6^.&..&.W.Ö.. 000180
5739261A 56881846 885E720C 47392606 7F667C0E 57392616 56881446 88065EC4 6^..F..V.&9W.|f..&9G.r^.F..V.&9W 0001A0
5EC43773 07392605 7C3E7F02 57392612 56881046 884A7704 47392606 7C527F06 ..R|.&9G.wJ.F..V.&9W..>|.&9.s76^ 0001C0
57882608 4788261C 72084739 26067F24 7C0A5739 26065EC4 02578826 0788261C .&..&.W.6^.&9W.|$..&9G.r.&.G.&.W 0001E0

Dump of file SATURN:[PCCOMMON.DUMP.DLL]BRDPLOW.TMP;1 on 18-APR-1990 10:38:06.00
File ID (528,44,0)   End of file block 272 / Allocated 272

Virtual block number 162 (000000A2), 512 (0200) bytes

8FE90375 00013022 E824E802 57892607 89261C5E C4025713 26070326 0A5EC40A .6^.&..&.W.6^.&..&.W.$$$"=..u.Ö. 000000
1F00E8C0 2800E8FE F0E90375 000830FF 6FE90375 00043DFE 0EE90375 000230FE ±=..u.Ö.±=..u.Öo.=..u.ÖÞ±$.+â$.. 000020
FFE9C028 05751E46 081C4688 08740846 08064688 D88E1EAD 881E0000 0CC8C8C9 èùà....|Ü..Ä.F..F.t..F..F.u.+âÖ. 000040
9A006A00 6A0676FF 0876FFFA 5689F846 89005E05 18578826 16478826 0A5EC400 .6^.&.G.&.W..^..F%.V*.v..v.j.j.. 000060
5688FC46 8800C1E9 0374C008 1E460A58 9A5016FC 46800676 FF0876FF 211209C2 Ö..|.v..v..F=.P.X.F..ât.Öè..F=.V 000080
FF1076FF 1276FF14 76FF1676 FF1876FF 1A76FF1C 76FF1E76 FFF65689 F44689FE ±.F¶.V-.v..v..v..v..v..v..v..v.. 0000A0
0A76FF0C 76FF1AC4 83FCCFE8 0E4277FF 264477FF 26F45EC4 F876FFFA 76FF0E76 v..v*.Vh6^¶&.wD&.w8.Öü=.6..v..v. 0000C0
1676FF18 76FF1A76 FF1C76FF 1E76FF35 74C00808 C483E3F6 E80EFC76 FFFE76FF .v±.v=.Ö-D.6..ât5.v..v..v..v..v. 0000E0
21E80E3E 77FF2640 77FF26F4 5EC40A76 FF0C76FF 0E76FF10 76FF1276 FF1476FF .v..v..v..v..v..v.6^¶&.w&&.w>.Ö| 000100
76FF1076 FF1276FF 1476FF16 76FF1876 FF1A76FF 1C76FF1E 76FF33E8 1AC483FF ..6.$3.v..v..v..v..v..v..v..v..v 000120
00E8C028 FF28E91A C483FC01 E80E5052 001605F6 5688F446 88F876FF FA76FF0E ..v*.Vh.F¶.V-...RP.Ö|=.6.Ö(.+â$. 000140
74080A7E 83127404 0A7E8320 74084608 06468808 8E20C888 1E000018 C8C8C91F .èùà....|à .Ä.F..F.t .-..t..-..t 000160
185EC410 741A4608 1846881E 751A4608 18468808 75020A7E 83067401 0A7E830C ..-..t..-..u..F..F.u..F..F.t.6^. 000180
057F287C 12563916 56881446 880107E9 8DF38802 57892607 89260E56 880C4688 .F..V.&..&.W.|µ.Ö...F..V.9V.|+.. 0001A0
E8468812 56891046 89165688 144688EA 5689E846 89125688 10468824 76104639 9F.v$.F..V..FÖ.Vö.F..V..F..V..FÖ 0001C0
00018806 E83FFF8A FFFF8808 75080A7E 83067402 0A7E8316 56891446 89EA5688 .Vö.F..V..-..t..-..u.|..α.?$.|.. 0001E0
```

```
Dump of file SATURN:[PCCOMMON.DUMP.DLL]BRDPLOW.TMP;1 on 18-APR-1990 10:38:06.00
File ID (528,44,0)   End of file block 272 / Allocated 272

Virtual block number 163 (000000A3), 512 (0200) bytes

 46891857 88261647 8826065E C4025789 26078926 185EC4FE 5689FC46 89C0008A ¤.å.F=.V±á^.&..&.W.á^.&.G.&.W..F 000000
 8826F45E C40075C2 08FA5689 F84689EE 5689EC46 89025788 26078826 F65689F4 ¶.V-&..&.W..F&.VŸ.F½.V°.ôu.á^¶&. 000020
 FF1876FF 1A76FFr2 5689F046 89405788 263E4788 26F85EC4 08E80A57 88260847 G.&.W.Š.á^Y&.G>&.WΩ.Fþ.V·.v..v.. 000040
 FDC2E80E 50520676 FF0876FF 0A76FF0C 76FF0E76 FF1076FF 1276FF14 76FF1676 v..v..v..v..v..v..v..v..v.RP.Ðð» 000060
 0789260E 56880C46 88177502 5739261D 75073926 FE5688FC 4688185E C41AC483 .á.á^..F=.V±&9.u.&9W.u..F..V.&.. 000080
 000690C8 C91F00E8 C0280001 07C7261C 5EC408E8 000007C7 261C5EC4 02578926 &.W.á^.&ú...Š.á^.&ú...+âŠ..èù... 0000A0
 00000017 008A0002 00000014 21020002 01AC0004 19980203 00000009 1E680002 ..k...........¯....!............ 0000C0
 0000BA46 C7D88EFF FFB81E56 000052C8 00500004 04F10203 00000019 21E90002 ..Ðl......þ...P.àR..V.¡...Áúf¤.. 0000E0
 47882682 5EC48456 89824689 08568806 4688020F E98DF388 06750846 0806468B .F..F.u.¡µ.Ô...F..V..Fý.VÇá^ý&.G 000100
 BC468904 57882602 478826C0 46890647 8826C25E C4C45689 C2468904 57882602 .&.W..Fó.Vèá^ó&.G..Fá&.G.&.W..F¥ 000120
 C076FFF2 568CF046 89C8468D FE5689FC 46890857 88260647 8826825E C48E5689 .Vƒá^ý&.G.&.W..F=.V±.Fà.Fþ.V·.vå 000140
 D24689C0 28000004 46C7CE56 89CC4689 805688AE 46880227 00009A50 16AE468D .FÜ.P...'..FÜ.V¯.Fä.VoúFå..+å.F● 000160
 4689C046 88E45689 E246898E 56888C46 88E05689 DE4689C4 5688C246 88D04689 .FÅ.Fô.V6.F8.VÅ.F¥.Vƒ.Fā.Vð.Fé.F 000180
 03E80000 C646C7EE 5689EC46 89FE5688 FC4688EA 5689E846 89085688 064688E6 İ.F..V..FÒ.Vö.F•.V±.F&.VŸúFó..Š. 0001A0
 B8568986 46890C50 88260A40 8826825E C402E6C1 C676882A 7F01C67E 83C646FF .Fó.-ó..*.vóel.á^ý&.ə.&.P..FŘ.V¡ 0001C0
 76FFFA76 FFF076FF F276FF00 6ACDE8F6 5289F442 89085788 26064788 26865EC4 á^Ř&.G.&.W..8¶.R-Šej..v·.vÞ.v°.v 0001E0

Dump of file SATURN:[PCCOMMON.DUMP.DLL]BRDPLOW.TMP;1 on 18-APR-1990 10:38:06.00
File ID (528,44,0)   End of file block 272 / Allocated 272

Virtual block number 164 (000000A4), 512 (0200) bytes

 008A46C7 04C4832E FFE80E82 76FF8476 FF0EC483 FFFF15A5 9AF476FF F676FFF8 ½.v-.v¶.E....á..vÇ.vý.Ò...á.úF¤. 000000
 8E76FFFC 76FFFE76 FF006A00 6A006A00 6A000FE9 037C0064 308A46FF BA468800 ..F¤.F¤=d.|.ÒÒ.j.j.j.j..v±.v=.vƒ 000020
 FFFC76FF FE76FF00 6A006A00 6A006A00 8AE90374 C00B10C4 83038E48 0EBC76FF .v¥.ÒÇ..á..ât.Ò¤.j.j.j.j..v±.v=. 000040
 76FFFE76 FF006A00 6A006A00 6A0098E9 0374C008 10C48305 14E80EBC 76FF8E76 vƒ.v¥.Ò...á..ât.Ò..j.j.j.j..v±.v 000060
 FC76FFFE 76FF006A 006A006A 006A7975 C00B10C4 830887E8 0EBC76FF BE76FFFC =.vƒ.v¥.Ò...á..âuyj.j.j.j..v±.v= 000080
 0EFC76FF FE76FFF0 76FFF276 FF016A5A 75C00810 C4830C35 E80EBC76 FFBE76FF .vƒ.v¥.Ò5..á..âuZj..v·.vÞ.v±.v=. 0000A0
 080AC483 20EEE80E FC76FFFE 76FFF076 FFF276FF 006A4175 C0080AC4 832107E8 Ò.l.á..âuAj..v·.vÞ.v±.v=.ÒŸ .á.. 0000C0
 FC76FFFE 76FF1175 C00808C4 830F6AE8 0EC276FF C476FFFC 76FFFE76 FF2875C0 âu(.v±.v=.vá.vö.Òj..á..âu..v±.v= 0000E0
 C95E1F00 E8C028FF FF00689A AE76FFB0 76FFFF13 E90374C0 0804C483 2338E80E .Ò8#.á..ât.Ö...v¯.vÜ.h...+âŠ..^è 000100
 065EC402 03E98DF3 88067508 46080646 88D88E00 07881E56 57000086 C80004CA ò..à...WV.¡...Ä.F..F.u.¡µ.Ö..á^. 000120
 0A050856 88064688 98468906 4788269A 5EC49C56 899A4689 04578826 02478826 &.G.&.W..F..V.á^.&.G..F..F..V... 000140
 A05EC402 E6C19E76 88487F01 9E7E839E 46FF03E8 00009E46 C7A25689 A0468900 ..F..VÅúF...Š..F..~...K.v.èl.á^. 000160
 5EC4E652 89E44289 08578826 06478826 8E5EC490 56898E46 89025088 26008826 &..&.P..F..V.á^.&.G.&.W..8ð.R|á^ 000180
 0000FFFF 9A50160^ 438D03E7 C19E7E88 9E76FF00 6A006A06 77FF2608 77FF2606 .&.w.&.w.j.j..v..~.èÒ..CÅ.P..... 0001A0
 8D087F8D 1FA5A5A' A51F161E D0768DF8 888A5EC4 8C568C8A 4689FF7A 868DACE8 Š¯..z..F..V.á^..«.vÅ...ÉÉÉÉ..... 0001C0
 02E6C1E2 76883F7D 02E27E83 E246FF03 E80000E2 46C71FA5 A5A5A51F 161ED876 vÅ...ÉÉÉÉ.úFä..Š..Fä.-ã.)?.vâèl. 0001E0

Dump of file SATURN:[PCCOMMON.DUMP.DLL]BRDPLOW.TMP;1 on 18-APR-1990 10:38:06.00
File ID (528,44,0)   End of file block 272 / Allocated 272

Virtual block number 165 (000000A5), 512 (0200) bytes

 16F0468D 50169246 80505200 16058A76 FF8C76FF 96568994 4689E652 88E44288 .8ð.R|.F..V..v..v....RP.F..P.Fþ. 000000
 8CCC4689 A4468D88 E80109E9 00018806 7E01927E 830000FF FF9A5016 F8468D50 P.F½.P......-..-.¡..Ò..Š¡.FÊ.Fä. 000020
 9A505200 0805CE56 88CC4688 9876FF00 7800009A 50520004 05D28C98 76FFCE56 Vö.v..●...RP...x..v..Fä.Vö...RP. 000040
 04578826 02478826 9A5EC48C 56898A46 899C5688 9A468800 00B046C7 03FC0000 ..=.úF¯...F..V..F¤.V¥á^.&.G.&.W. 000060
 FFCE76FF 016AC846 89CA4689 C44689C6 4689C028 C2468998 4688C056 898E4689 .Fƒ.Vä.F..Fó+à.Fó.Fá.Fð.Fàj..vö. 000080
 9E46FF03 E800009E 46C70EC4 83041415 A59AE476 FFE676FF E876FFEA 76FFCC76 vä.vð.vÒ.vl.vð.E....á.úF...Š..F. 0000A0
 C402E3C1 9E5E8800 6A016A00 6A006A08 77FF260A 77FF26CC 5EC42A7F 019E7E83 .-...*á^ä&.w.&.w.j.j.j.j..^.èÒ.á 0000C0
 76FFCE76 FF8A76FF 8C76FF50 16EC468D CDE80439 02909A30 FF260270 FF26A076 v.&.p.&.0...9.Šè.F&.P.v..v..vö.v 0000E0
 FF26CC5E C4E04689 C02802E8 00018805 74EE4608 EC46880C C483011A 19C89ACC ä.à....á..F&.FŸt.¡..Š.+à.FÅá^ä&. 000100
 00E8E046 88035F00 689A0877 FF260A77 FF26CC5E C4044900 689A0477 FF260677 w.&.w..h.!.á^ä&.w.&.w..h._..FÅŠ. 000120
 080A4688 08740846 08064688 0000F646 C7D88E02 38881E00 000AC8C8 C95F5E1F .^_èùà....¡;..ÄúF-...F..F¯t..F.. 000140
 C4FA5689 F8468904 57882602 47882602 5FC42606 5EC4008E E98DF388 06750C46 F.ū.¡µ.Ö..á^.&á_.&.G.&.W..F½.V°á 000160
 6A006A00 6A597D00 643DF646 FFF64688 FE5689FC 46890857 88260647 8826065E ^.&.G.&.W..F•.V±.F-.F-=d.)Yj.j.j 000180
 006A006A 006A3875 C00810C4 830048E8 0EF876FF FA76FFFC 76FFFE76 FF006A00 .j..v±.v=.v°.v½.ÒH..á..âu8j.j.j. 0001A0
 76FF0C76 FF016A19 75C00810 C48301A8 E80EF876 FFFA76FF FC76FFFE 76FF006A j..v±.v=.v°.v½.Ò¨..á..âu.j..v..v 0001C0
 57000028 C8C8C91F 00E8C028 9CE80274 C0080AC4 832927E8 0EFC76FF FE76FF0A ..v±.v=.Ò').á..ât.Š.+âŠ..èùà(..W 0001E0
```

5071

5,146,591

5072

```
Dump of file SATURN:[PCCOMMON.DUMP.DLL]BRDPLOW.TMP;1 on 18-APR-1990 10:38:06.00
File ID (528,44,0)   End of file block 272 / Allocated 272

Virtual block number 166 (000000A6), 512 (0200) bytes

0C76FF01 5BE980F? B806750C 46080A46 88087408 46080646 88088E04 58881E56 V.|[..Ä.F..F.t..F..F.u.|µ.Ö[..v. 000000
0138E9C0 28057303 F87E8306 7C007F00 FA7E8300 00FFFF9A 5016F846 8D0A76FF .v..F%.P......-ª...|..-%.s.+å08. 000020
5016006A 006A006A 0A76FF0C 76FFEA56 8CE84689 E04680F6 568CF446 89EC468D .Fâ.F¶.V-.FÄ.FÖ.Võ.v..v.j.j.j..P 000040
A5DA8E1E F088F888 EA5688E8 4688F45E C40000FE 46C70001 FC46C700 0002CC9A .ë...úF=..úFz..å^¶.FÖ.Võ.«.Þ..ÖE 000060
F45EC400 FE568301 FC46831D EB0000FF FF9A016A 006A0A76 FF0C76FF 1FA5A5A5 EEE..v..v.j.j......Š..F=..Vz.å^¶ 000080
FF9AE876 FFEA76FF 0A76FF0C 76FF1FA5 A5A5A50A 8E1EF088 F888EA56 88E84688 .FÖ.Võ.«.Þ..ÖEEEE..v..v..võ.vÖ.. 0000A0
02573926 20750739 ?6F45EC4 02578826 078826E8 5EC400AA E90374C0 080000FF ....åt.Ö¯.å^Ö&..&.W.å^¶&9.u &9W. 0000C0
468897E8 02740657 39260675 04473926 F45EC406 57882604 478826E8 5EC41A75 u.å^Ö&.G.&.W.å^¶&9G.u.&9W.t.Š..F 0000E0
080E4688 00FE5E83 01FC6E83 0875FE56 380075FC 463B000A 83000120 FA5688F8 %.V*-...Ö.;F=u.;Vzu..n=..^z..F.. 000100
FF5016D8 46801276 FF1476FF 1FA5A5A5 A51F161E 0716EC76 80087E80 35741046 F.t5.-Ä.vå.....EEEE..v..v..FÄ.P. 000120
FF0A76FF 0C76FF16 C4830E5E FF0676FF 0876FF0A 76FF0C76 FF016AFC 76FFFE76 vz.v=j..v..v..v..v..^..å..v..v.. 000140
0030C8CB C95F5E1F 00EBC02B FF21E907 EB0001B8 0000FFFF 9A006AFC 76FFFE76 vz.v=j......|..Š.Ö|.+åŠ..^_èüå0. 000160
76FF014C E9C02B05 750C4608 0A468808 74084608 064688D8 8E0513B8 1E565700 .WV.|...Ä.F..F.t..F..F.u.+ãÖL..v 000180
29E9C02B 057303F8 7E83067C 007F00FA 7E830000 05399A50 16F8468D 0A76FF0C ..v..F%.P.9....-ª...|..-%.s.+åÖ) 0001A0
6A006A0A 76FF0C76 FF000006 F99A5016 E0468D00 6A006A00 6A0A76FF 0C76FF01 ..v..v.j.j.j..FÄ.P.ª....v..v.j.j 0001C0
6A006A0A 76FF0C76 FF0000FE 46C70002 FC46C700 0005719A 5016E846 80006A01 .j..FÖ.P.q...úF=..úFz...v..v.j.j 0001E0

Dump of file SATURN:[PCCOMMON.DUMP.DLL]BRDPLOW.TMP;1 on 18-APR-1990 10:38:06.00
File ID (528,44,0)   End of file block 272 / Allocated 272

Virtual block number 167 (000000A7), 512 (0200) bytes

000005CF 9A5016F0 46800A76 FF0C76FF 00FE5683 01FC4683 08E80000 059F9A02 ......Š..F=..Vz..v..v..Fþ.P.ü... 000000
830080E8 0E5016E0 46805016 E8468050 16F04680 50160846 8D008FE9 0374C008 .åt.Ö¢..FÄ.P.Fþ.P.FÖ.P.FÄ.P.Ö¯.. 000020
6576FFFF 06069A07 6C02329A D85E8007 6702569A 283A1E80 C0E80274 C00810C4 å..åt.Šå..:(.V.g..^Ä.2.l..ø...ve 000040
46801276 FF1476FF 1FA5A5A5 A51F161E 0716E876 80007E80 30741046 080E4688 .f..F.t=.~Å.vÖ.....EEEE..v..v..F 000060
FF0676FF 0876FF0A 76FF0C76 FF016A50 52000A83 000120FE 5688FC46 88501600 Å.P.F=.Vz-...Ö.RPj..v..v..v..v.. 000080
00000678 9A006A50 52000A83 000120FE 5688FC46 880A76FF 0C76FF16 C4830E5E ^..å..v..v..F=.Vz-...Ö.RPj..x... 0000A0
A5A51F16 1EF07680 E87E801F A5A5A5A5 1F161E07 16E87680 E07E8025 E80001B8 |..Š%.-Å.vÖ.....EEEE..~Ö.vþ...EE 0000C0
08460806 46880888E 0695881E 56000044 CBCBC95F 5E1F00EB C02BFF22 E91FA5A5 EE.Õ".+åŠ..^_èüåD..V.|...Ä.F..F. 0000E0
01EEE980 F3880675 14460812 46880874 1046080E 46881074 0C46080A 46881874 t..F..F.t..F..F.t..F..F.u.|µ.ÖY. 000100
26044788 260A5EC4 1A750257 39262075 07392606 5EC40257 88260788 260A5EC4 å^.&..&.W.å^.&9.u &9W.u.å^.&.G.& 000120
260A5EC4 02578826 0788260E 5EC43274 06573926 06750447 3926065E C4065788 .W.å^.&9G.u.&9W.t2å^.&..&.W.å^.& 000140
39260C75 04473926 0A5EC406 57882604 4788260E 5EC42075 02573926 26750739 9.u&&9W.u å^.&.G.&.W.å^.&9G.u.&9 000160
56890257 18260728 260A5EC4 02578826 07882606 5EC40184 E980F388 06750657 W.u.|µ.Ö..å^.&..&.W.å^.&+.&.W..V 000180
C4065788 26044788 26065EC4 08E603EF 9AE85E80 08C202BF 9ABC5E80 8C46898E ƒ.F¥.^¥.¢.ö..^Ö.ÿ.|.å^.&.G.&.W.å 0001A0
091003EF 9AD05E80 08EE028F 9ABC5E80 8C46898E 56890657 18260447 28260A5E ^.&+G.&.W..V/.F¥.^¥.¢.Y..^Å.ÿ... 0001C0
02BF9ABC 5E80BC46 898E5689 02571826 0728260A 5EC40257 88260788 260E5EC4 å^.&..&.W.å^.&+.&.W..V/.F¥.^¥.¢. 0001E0

Dump of file SATURN:[PCCOMMON.DUMP.DLL]BRDPLOW.TMP;1 on 18-APR-1990 10:38:06.00
File ID (528,44,0) ` End of file block 272 / Allocated 272

Virtual block number 168 (000000A8), 512 (0200) bytes

06571B26 04472B26 0A5EC406 57882604 4788260E 5EC4093C 03EF9AD8 5E800918 ...^Å.ÿ.<.å^.&.G.&.W.å^.&+G.&.W. 000000
5E800954 02329AE8 5E80094C 03EF9AC0 5E800944 028F9ABC 5E80BC46 898E5689 .V/.F¥.^¥.¢.D..^å.ÿ.L..^Ö.2.T..^ 000020
EF9AF85E 80097106 D19A0969 06429AC0 5E800964 02329AD0 5E80095C 06429AD8 Å.B.\..^Å.2.d..^å.B.i..l.q..^%.ÿ 000040
429AD05E 80099102 329AD05E 80098906 429AE85E 80098102 329AE85E 80097903 .y..^Ö.2....^Ö.B....^Å.2....^Å.B 000060
09860642 9AD85E80 09AE0232 9AD85E80 09A603EF 9AE05E80 099E0601 9A099606 ....1....^Å.y.l..^Å.2.Û..^Å.B.Ñ. 000080
421E8009 D403EF9A C85E8009 C806D19A 09C30642 9AC05E80 098E0232 9AC05E80 .^å.2./..^å.B.ú..l.ú..^å.ÿ.å...B 0000A0
D69A09F1 03079AF0 5E8009EC 06429AC8 5E8009E4 02329AE0 5E80090C 02569A28 (.V.É..^Å.2.ð..^å.B.š..^Þ.■.þ..ø 0000C0
065A9AF0 5E800A10 064?9AF8 5E800A08 02329AF8 5E8024E8 8DF78805 750A0006 ...u.|%.Š$.^%.2....^%.B....^Þ.Z. 0000E0
46880888E 0806881E 56570000 1CC8C8C9 5E1F00E8 C02B075F 03F79A12 5EF40A18 ..å^..%._.+åŠ..^èüå...WV.|...Ä.F 000100
9A5016F6 46800A76 FF0C76FF 018EE980 F3880675 0C46080A 46880874 0846 306 ..F.t..F..F.u.|µ.Ö/..v..v..F-.P. 000120
6A006A0A 76FF0C76 FF0198E9 C0280573 03F67E83 067C007F 00F87E83 00000 9A ¤....-%...|..-.s.+åÖ...v..v.j.j 000140
1E0716EE 7680E67E 800000FE 46C70001 FC46C700 0006E39A 5016EE46 80006AU0 .j..FY.P.D...úF=..úFz...-l.vY... 000160
00FE5683 01FC4683 18E80000 07129A01 6A006A0A 76FF0C76 FF1FA5A5 A5A51F16 ..EEEE..v..v.j.j......Š..F=..Vz. 000180
0000072C 9A5016EE 46800A76 FF0C76FF 1FA5A5A5 A51F161E 0716EE76 80E67E80 .-l.vY.....EEEE..v..v..FY.P.,... 0001A0
F64688FA 4689C028 02E80001 88057400 FE7E8306 7501FC7E 830127E9 0374C008 .åt.Ö'..-=.u..~z.t.|..Š.+å.Fª.F- 0001C0
76FF50E4 4689C028 02E80001 880574FE 56380575 FC463800 DA830001 20F85688 .V%·...Ö.;F=u.;Vzt.|..Š.+å.FöP.v 0001E0
```

```
Dump of file SATURN:[PCCOMMON.DUMP.DLL]BRDPLOW.TMP;1 on 18-APR-1990 10:38:06.00
File ID (528,44,0)   End of file block 272 / Allocated 272

Virtual block number 169 (000000A9), 512 (0200) bytes

 7510460B 0E4688FF 7FE90375 C0080CC4 8300E8E8 0E5016E6 468D5016 EE468DFA *.FY.P.F|.P.ÒÒ..á..âu.Õ...F..F.u 000000
 0008659A 5016E646 8D006A50 52000A83 00012DFE 5688FC46 880A76FF 0C76FF38 ;.v..v..F=.V±-...Ö.RPj..F|.P.e.. 000020
 FF1476FF 008AE?00 0008859A 5016EE46 8D006AFC 76FFFE76 FF0A76FF 0C76FF00 ..v..v..v±.v=j..FY.P.ç...Õ...v.. 000040
 0876FF0A 76FF0C76 FF026A50 52000A83 00012DFE 5688FC46 885016E6 468D1276 v..F|.P.F=.V±-...Ö.RPj..v..v..v. 000060
 8D006A50 52000A83 00012DFE 5688FC46 880A76FF 0C76FF16 C4830E5E FF0676FF .v..^..á..v..v..F=.V±-...Ö.RPj.. 000080
 FF0C76FF 026AFC76 FFFE76FF 5016EE46 8D1276FF 1476FF00 00FFFF9A 5016E646 F|.P......v..v..FY.P.v±.v=j..v.. 0000A0
 16EE468D 006AFC76 FFFE76FF 0A76FF0C 76FF16C4 830E5EFF 0676FF08 76FF0A76 v..v..v..^..á..v..v..v±.v=j..FY. 0000C0
 8E0A2AB8 1E000010 C8CBC95F 5E1F00EB C028FEAA E907E800 01880000 0B4D9A50 P.M...¡..Š.Õ¯±+âŠ..^_èùà....¡*.. 0000E0
 89F84689 0C56880A 4688F656 89F44689 000405FE 5689FC46 89085688 06468808 Ä.F..V..F=.V±....F¶.V̄-.F..V..F%. 000100
 FE76FFF4 76FFF676 FFF876FF 5250520E 76FF1076 FFF25689 F0468900 0405FA56 V*....FÞ.V·.v..v.RPR.v%.v~.v¶.v± 000120
 F076FFF2 76FFF876 FFFA76FF 0E76FF10 76FF2975 C00814C4 83003CE8 0EFC76FF .v=.Ò<..á..âu).v..v..v*.v%.v·.vÞ 000140
 00E8C028 02E80001 980574C0 0814C483 0013E80E F476FFF6 76FFFC76 FFFE76FF .v±.v=.v~.v¶.Ò...á..ât.¡..Š.+âŠ. 000160
 5718260? 2826065E C4025788 26078826 0E5EC408 8E0C0D88 1E00000C C8CBC91F .èùà....¡...Aá^.&..&.W.á^.&+.&.W 000180
 5689F846 8902571B 26072826 0A5EC402 57882607 8826125E C4FE5689 FC468902 ..F=.V±á^.&..&.W.á^.&+.&.W..F%.V 0001A0
 7D00FA7E 8300FDE9 03750018 7E830975 00167E83 010CE903 75FE460B FC4688FA *.F=.F±u.Õ...~..u..~..u.Õ»..~*.) 0001C0
 00FE7E83 F65689F4 4689FA56 88F84688 06E8DAF7 00D2830B F7FA5688 F846880F ..F%.V*%A.@.%OŠ..F%.V*.F¶.V-.-±. 0001E0

Dump of file SATURN:[PCCOMMON.DUMP.DLL]BRDPLOW.TMP;1 on 18-APR-1990 10:38:06.00
File ID (528,44,0)   End of file block 272 / Allocated 272

Virtual block number 170 (000000AA), 512 (0200) bytes

 D1D2D1E0 D1DA88C8 88FE5688 FC468806 E8DAF700 D2830BF7 FE5688FC 46880F7D )..F=.V±%A.@.%OŠ..F=.V±.â.ÐÌÁÌ@Ì 000000
 0E5EC400 9BE90372 F4463808 7C00A5E9 037EF656 380201E0 D1D313C1 0302D1E0 ÁÌ@.é.ÆÌÁÌ@;V--.ÕE.|.;F¶r.Õ..á^. 000020
 07882613 7400187E 83197307 3926057C 207F0257 3926065E C4025788 26078826 &..&.W.á^.&9W.. |.&9.s..-..t.&.. 000040
 5739260E 5EC40257 88260788 26065EC4 63E80257 89260789 260E5EC4 02578826 &.W.á^.&..&.W.Šcá^.&..&.W.á^.&9W 000060
 57892607 8926065E C4025788 26078826 13740016 7E831973 07392605 7C207F02 .. |.&9.s..-..t.&..&.W.á^.&..&.W 000080
 C414E802 57892607 89260E5E C4025788 26078826 065EC416 7400187E 8330E802 .Š0.-..t.á^.&..&.W.á^.&..&.W.Š.á 0000A0
 C8CBC91F 00E8C028 04E80001 88025789 26078926 065EC402 57882607 88260E5E ^.&..&.W.á^.&..&.W.¡..Š.+âŠ..èùà 0000C0
 7F00027E 8300000A 509A5016 D0468D0A 76FF0C76 FFD88E0C 99881E56 5700005E ^..WV.¡...Á.v..v..FÅ.P.P....-@.. 0000E0
 9A5016B0 468D006A 006A006A 0A76FF0C 76FF0193 E9C02805 7304D07E 83067C0D .|..-Å.s.+âÕ...v..v.j.j.j..F¯.P. 000100
 022DD256 88004688 00065683 01D44683 08E80000 0646C700 01D446C7 00000E7A z...úFå..úF@..Š..Få..V@..FÅ.V@-. 000120
 FFD676FF 0A76FF0C 76FF0147 E90377D4 4638087F 0151E903 7D065638 000A8300 ..Ö.;V@).ÕQ...;Fåw.ÕG..v..v..v@. 000140
 1FA5A5A5 A51F161E 07168076 8DF888E8 46800000 0EBC9A50 16884680 006AD476 vâj..F¡.P.¥....FÕ.%.v¯.....ÉÉÉÉ. 000160
 83000105 D65688D4 46880A76 FF0C76FF 1FA5A5A5 A51F161E 887680F8 88F04680 .FÞ.%.v¡...ÉÉÉÉ..v..v..Få.V@.... 000180
 89AC4689 00028300 02050656 88044688 00000F08 9A5016C0 4680006A 50520002 @.RPj..Få.P......Få.V@....@..F¯. 0001A0
 72AC4639 087C00B0 E9037EAE 56390256 88004688 00AE5683 01AC4683 08EBAE56 VÙŠ..F¯..VÙ..FÅ.V@9VÙ-.Õ¯.|.9F¯r 0001C0
 88084680 00000A79 9A5016C8 4680006A AC76FFAE 76FF0A76 FF0C76FF 00A6E903 .Õ|..v..v..vÙ.v˜j..Få.P.y....FÄ. 0001E0

Dump of file SATURN:[PCCOMMON.DUMP.DLL]BRDPLOW.TMP;1 on 18-APR-1990 10:38:06.00
File ID (528,44,0)   End of file block 272 / Allocated 272

Virtual block number 171 (000000AB), 512 (0200) bytes

 468D1FA5 A5A5A51F 161EC876 8DF888E0 46801FA5 A5A5A51F 161E0716 C0768DF8 %.vâ.....ÉÉÉÉ..FÅ.%.vâ...ÉÉÉÉ..F 000000
 00AA7E83 0000FFFF 9A5016F8 46805016 A2468050 16AA4680 50160846 8D5016E8 Ö.P.FÅ.P.F´.P.FÅ.P.F%.P......-¯. 000020
 FFD476FF D676FFAC 76FFAE76 FF5016A2 46800E76 FF1076FF 1276FF14 76FF357E -Š.v..v..v..v..FÅ.P.vÙ.v¯.v@.vå. 000040
 1E0716C8 7680C07E 8D2AE800 01881CC4 830037E8 0E0676FF 0876FF0A 76FF0C76 v..v..v..v..Õ7..á.¡..Š*.-â.vâ... 000060
 E8C028FE 93E91FA5 A5A5A51F 161E0716 88768080 7E80FF3A E91FA5A5 A5A51F16 ..ÉÉÉÉ.Õ:..-¯.v¡.....ÉÉÉÉ.Õ.±+âŠ 000080
 006A0E76 FF1076FF 0A76FF0C 76FFD88E 00F7B81E 56570000 24C8CBC9 5F5E1F00 ..^_èùâ$..WV.¡%..Ä.v..v..v..v.j. 0000A0
 108F9A50 16E8468D 006A1276 FF1476FF 0A76FF0C 76FF0000 0E309A50 16F2468D .F·¯P.O....v..v..v..v.j..FÕ.P.¢. 0000C0
 04473926 F85688F6 46881775 02573926 10750739 26F45688 F2468816 5EC40000 ..á^..F·.V¶&9.u.&9W.u..F-.V%&9G. 0000E0
 5739261D 75073926 EA5688E8 4688FA46 89C02802 E8000188 05750657 392608?5 u.&9W.u.¡..Š.+â.F*.FÕ.VÕ&9.u.&9W 000100
 83F04689 C02802E8 00018805 75065739 26087504 473926EE 5688EC46 88177502 .u..Fé.VY&9G.u.&9W.u.¡..Š.+â.FÞ. 000120
 057400F0 7E83FE56 89FC4689 1056130E 460399C0 2803E899 00018806 7400FA7E -*.t.¡...Š.+â..F..V..F=.V±.-Þ.t. 000140
 83E65688 E44688E6 5E89E44E 89DA18C8 28145E88 124E8899 00018804 E899C028 +á.Š.¡....N..^.+â.Õ.NÕ.^Ì.FÕ.V|. 000160
 76FF0C76 FF30741C 46081A46 885A72FC 4638057F 617CFE56 3800E65E 8301E46E nÕ..^Ì.;V±|a..;F=rZ.F..F.t=.v..v 000180
 76FF5016 0C468D1E 76FF2076 FF00000F D69A5016 DC468000 6AFC76FF FE76FF0A ..v±.v=j..FÉ.P.@....v .v..FÉ.P.v 0001A0
 76FF0A76 FF0C76FF 16C4831A 5EFF0676 FF0876FF 0A76FF0C 76FF016A FC76FFFE ±.v=j..v..v..v..v..^..á..v..v..v 0001C0
 741C460B 1A46885B 7500F07E 83617500 FA7E838C E8000007 CC9A006A FC76FFFE ±.v=j..ä...Š..-*.ua.-Þ.u[.F..F.t 0001E0
```

Dump of file SATURN:[PCCOMMON.DUMP.DLL]BRDPLOW.TMP;1 on 18-APR-1990 10:38:06.00
File ID (528,44,0)   End of file block 272 / Allocated 272

Virtual block number 172 (000000AC), 512 (0200) bytes

```
160C468D 1E76FF20 76FF1FA5 A5A5A50A 8E1E0716 F088DC7E 8D18568B 1646883A :.F..V..-É.Þ....ÖEEEE..v .v..FÊ. 000000
76FF0C76 FF16C483 1A5EFF06 76FF0876 FF0A76FF 0C76FF00 6A0E76FF 1076FF50 P.v..v.j..v..v..v..v..^..á..v..v 000020
001AC8C8 C95F5E1F 00EBC02B 0000FFFF 9A1676FF 1876FF00 6A0E76FF 1076FF0A ..v..v.j..v..v......+åS..^_èùå.. 000040
E98DF388 06750C46 080A4688 08740846 08064688 0000FE46 C7D88E0F 8E881E00 ..ı/..ÄúF±...F..f.t..F..F.ū.ı#.Ö 000060
0A76FF0C 76FFFC56 8CFA4689 F2468DE8 5689E646 89005E05 08568806 46880236 6..F..V..^..Fl.VÒ.F·.F*.V=.v..v. 000080
EE46C701 FBE9C02B 057303EA 7E83067C 007F00EC 7E830000 0E079A50 16EA468D .Fõ.P.......-å...|..-õ.s.+åÖ«.úFŸ 0000A0
00F05683 01EE4683 08E80000 0AA29A01 6A006A0A 76FF0C76 FF0000F0 46C70001 ..úFÞ...v..v.j.j..Å...Š..FŸ..VÞ. 0000C0
76FF01B5 E90373EE 4638087F 018FE903 7DF05638 000A8300 0220EC56 88EA4688 .Fõ.V$-...Ö.;VÞ).Õe...;FŸs.Õç..v 0000E0
37FF2602 77FF26E6 5EC4019D E90374C0 0800000A CC9AFA76 FFFC76FF 0A76FF0C ..v..v=.v'.a....åt.Ö..á^l&.w.&.7 000100
5EC42074 C008C02B 02E30001 B8057500 08126701 309A37FF 260277FF 26FA5EC4 á^*&.w.&.7.0.g..Åu.|..Š.+å.åt-á^ 000120
00018805 75D00812 9201309A 0477FF26 0677FF26 FA5EC404 77FF2606 77^^26E6 l&.w.&.w.á^*&.w.&.w..0....Åu.|.. 000140
9A37FF26 0277FF26 FA5EC437 FF260277 FF26E65E C40145E9 0374C008 C02B^^2EB Š.+å.åt.ÕE.á^l&.w.&.7á^*&.w.&.7. 000160
C44DEB02 57882607 8826FA5E C40C74C0 08C02802 E80001B8 0575D008 128F0'30 0.¢..Åu.|..Š.+å.åt.á^*&..&.W.ŠMå 000180
1E8D1205 06C79A12 CC02C39A E65EC412 C702C39A FA5EC437 FF260277 FF26E65E ^l&.w.&.7á^*.ū.ú.á^l.ú.ä..ú.f... 0001A0
12F30256 9AD88808 C48312EE 07BE9A12 E403EF9A DC8808EC 83120F06 999A284A J(...Ö..š..É.ÿ.ö../.Ÿ..å..Ä.V.µ. 0001C0
77FF2606 77FF26E6 5EC40257 89260789 26FA5EC4 131F00FC 9A505212 FA04A69A .l.*.RP.«...á^*&..&.W.á^l&.w.&.w 0001E0
```

Dump of file SATURN:[PCCOMMON.DUMP.DLL]BRDPLOW.TMP;1 on 18-APR-1990 10:38:06.00
File ID (528,44,0)   End of file block 272 / Allocated 272

Virtual block number 173 (000000AD), 512 (0200) bytes

```
0074C008 C02B02EB 00018805 75D00813 4601309A 0477FF26 0677FF26 FA5EC404 .á^*&.w.&.w..0.F..Åu.|..Š.+å.åt. 000000
C39A045F 8DE65EC4 135102C3 9A045F8D FA5EC454 EB065788 26044788 26FA5EC4 á^*&.G.&.W.ŠTá^*._..ú.Q.á^l._..ú 000020
137807BE 9A136E03 EF9ADC88 08EC8313 6906999A 284A1E8D 135F06C7 9A135602 .V..ú.....J(...l..š..É.ÿ.n..7.x. 000040
BA00FC9A 0477FF26 0677FF26 E65EC450 52138F04 A69A137D 02569A08 8808C483 .á..Ä.V.)..l...RPá^l&.w.&.w..».¤ 000060
FA76FFFC 76FF006A EE76FFF0 76FF0A76 FF0C76FF 06578926 04478926 FA5EC408 .á^*&.G.&.W..v..v..vÞ.vŸj..v«.v' 000080
5700000A C8C8C91F 00EBFE46 88FE25E9 0001FE46 C7057500 FE7E8300 0008F29A .·....-±.u.úF±..Õ%±.F±Š..èùå...W 0000A0
88087414 46081246 88107410 46080E46 88187408 46080646 88088E11 73881E56 V.|s..Ä.F..F.t..F..F.t..F..F.t.. 0000C0
02578826 07882606 5EC40093 E9037500 167E8301 F0E980F3 8806751A 46081846 F..F.u.|#.ÕÞ..-..u.Ö..á^.&..&.W. 0000E0
5EC40257 88260788 2670E800 04FE46C7 07770739 26057C0E 7F025739 260A5EC4 á^.&9W...|.&9.w.úF±..Sp&..&.W.á^ 000100
5EC40657 88260447 882651EB 0008FE46 C7077708 47392606 7C0F7F0A 57392606 .&9W...|.&9G.w.úF±..ŠQ&.G.&.W.á^ 000120
5788260C 47882606 5EC431EB 0001FE46 C7077704 47392606 7C0F7F06 5739260A .&9W...|.&9G.w.úF±..Š1á^.&.G.&.W 000140
0807C726 185EC40E E80002FE 46C70772 04473926 067F0F7C 06573926 0A5EC40E .á^.&9W.|...&9G.r.úF±..Š.á^.&ú.. 000160
830000FF FF9A5016 FE468D0A 76FF0C76 FF0676FF 0876FF68 E80156E9 8DF18800 .ıþ.ÕV.Šk.v..v..v..v..F±.P...... 000180
83357408 FE7E833B 7404FE7E 83012AE9 8DF18800 0807C726 185EC40E 7508FE7E -±.u.á^.&ú...ıþ.Ö*..-±.t;.-±.tS. 0001A0
5739260E 75073926 0E5EC402 57882607 8826125E C4297402 FE7E832F 7401FE7E -±.t/.-±.t)á^.&..&.W.á^.&9.u.&9W 0001C0
0086E907 8926185E C4FE4688 FE468900 0C25FE46 8806E800 0325FE46 88087502 .u..F±X..Š..F±X...F±.F±á^.&..Ö.. 0001E0
```

Dump of file SATURN:[PCCOMMON.DUMP.DLL]BRDPLOW.TMP;1 on 18-APR-1990 10:38:06.00
File ID (528,44,0)   End of file block 272 / Allocated 272

Virtual block number 174 (000000AE), 512 (0200) bytes

```
BCE9C02B 05760447 3926067F 007C0657 39260E5E C4065788 26044788 26125EC4 á^.&.G.&.W.á^.&9W.|...&9G.v.+åÖŸ 000000
28057304 47392606 7C007F06 5739260E 5EC40657 88260447 8826125E C47CE800 .Š|á^.&.G.&.W.á^.&9W...|.&9G.s.+ 000020
04760739 26057F08 7C025739 260E5EC4 02578826 07882612 5EC459E8 0099E9C0 åÖ..ŠYá^.&..&.W.á^.&9W.|...&9.v. 000040
04730739 26057C08 7F025739 260E5EC4 02578826 07882612 5EC439E8 79E8C02B +åŠyŠ9á^.&..&.W.á^.&9W...|.&9.s. 000060
8800E8A9 7400083D CE740004 30FF60E9 03750002 30987400 013019E8 59E8C02B +åŠYŠ.=..t.=..u.Öm.=..tö=..t`Š.. 000080
88F88814 56881246 880E5EC4 1FA5A5A5 A5DA8E1E 0716F088 F67E8D10 56880E46 F..V..--.Þ....ÖEEEE.á^..F..V..«. 0000A0
5F5E1F00 E8C02B1F A5A5A5A5 1F161EF6 768DF888 125EC41F A5A5A5A5 DA8E1EF0 Þ..ÖEEEE.á^..«.v-...EEEE.+åŠ..^_ 0000C0
4788268E 5EC4C056 898E4689 08568806 4688D88E 1303881E 56570000 56C8C8C9 èùåV..WV.|Æ..Ä.F..V..Ff.Våá^/&.Ḡ 0000E0
F088E27E 8DFA5689 F8468900 1605C28C C388C456 89C24689 005E0504 57882602 .&.W..^..Fò.Vá.û.ô....F%.V'.-ã.Þ 000100
DA830001 2D025788 26078826 C25EC44E 7400127E 831FA5F2 0008890A 8E1E0716 ....Ö¿..É..-..tNá^ô&..&.W.·...Ö 000120
56888046 88AE5689 AC468900 DA830001 2D065788 26044788 26825689 80468900 ..F¯.Vÿ&.G.&.W.·...Ö..F¯.VÜ.F¯.V 000140
80F05611 EE4601E8 5619E646 29AE5688 AC4688EC 5611EA46 01E45619 E24629B2 ÿ)Fã.VÒ.Fõ.V$.F¯.VÜ)Fl.VÒ.FŸ.VÞ. 000160
89844689 22568820 46880000 F646C7D0 568CCE46 89C6468D E0568CDE 46890246 F®.FB.VÀ.F6.Fö.VÀúF-...F .V".FÇ. 000180
C1F64688 03C3E903 7C02F67E 83865689 84468926 56882446 88F646FF 0FE88656 VÑŠ..F-.FŠ.V&.FÇ.VÑ.--.|.Õü..F-ê 0001A0
46890250 88260088 261476C4 02E3C1F6 5E88DC56 890A4689 1056880E 460303E0 Å..F..V..FÖ.VÊ.^-èO.áv.&..&.P..F 0001C0
880A76FF 0C76FF00 0017269A DE76FFE0 76FF006A 50520A76 FF0C76FF F45689F2 ·.V¶.v..v.RPj..vÅ.vB.&....v..v.. 0001E0
```

```
Dump of file SATURN:[PCCOMMON.DUMP.DLL]BRDPLOW.TMP;1 on 18-APR-1990 10:38:06.00
File ID (528,44,0)   End of file block 272 / Allocated 272

Virtual block number 178 (000000B2), 512 (0200) bytes

1A76C4E3 D1FA5E88 000013B1 9AF276FF F476FF00 6AF676FF F876FF0A 76FF0C76 v..v..v½.v-j..v¶.v·.Ý....^"1Dáv. 000000
08460806 4688D88L 1A9F881E 000018C8 C8C95E1F 00E8C028 FDE2E900 0100C726 &ú...Õä»+àŠ..^èùà....|...Ä.F..F. 000020
18460816 46881874 14460812 46882074 1046080E 46882874 0C46080A 46883074 t0.F..F.t(.F..F.t .F..F.t..F..F. 000040
EE468050 16F6468D 0167E98D F3880675 2046081E 46880874 1C46081A 46881074 t..F..F.t..F..F u.|µ.Õg..F-.P.FŸ 000060
FF0876FF 1276FF14 76FF2276 FF1676FF 1876FF1E 76FF2076 FF5016EC 46805016 .P.F&.P.v .v..v..v..v".v..v..v.. 000080
0000FFFF 9A5016E8 46801E77 FF260E5E C422C483 F836E80E 0A76FF0C 76FF0676 v..v..v..Õ6½.á"á^.&.w..FÒ.P..... 0000A0
016A006A E876FFEA 76FF0000 1DF89A50 16EE468D 006A006A 006AE876 FFEA76FF .vô.vÒj.j.j..FŸ.P.½....vô.vÒj.j. 0000C0
5016F646 8D5016EE 46805016 EC468D50 16FE468D 00001E68 9A5016F6 4680006A j..F-.P.h....F±.P.F&.P.FŸ.P.F-.P 0000E0
00FE7E83 1EC48303 C111229A 0A76FF0C 76FFEC76 FF0E76FF 1076FF50 16EE468D .FŸ.P.v..v..v&.v..v..".è..á..-±. 000100
390775FA 4639F456 88F24688 1275F856 391775F6 4639F056 88EE4688 74E80274 t.Št.FŸ.VÞ9F-u.9V½u..F·.V¶9F"u.9 000120
04EC7E83 00001EA4 9A5016EE 4680016A 016A006A E876FFEA 76FF52E8 0275FC56 V»u.ŠR.vô.vÒj.j.j..FŸ.P.È....-&. 000140
89EE4689 F85688F6 46880CE8 F45689F2 4689FC56 88FA4688 0E7508EC 7E830674 t..-&.u..F".V».F·.V¶Š..F-.V½.FŸ. 000160
261C77FF 260E5EC4 00001CAF 9A5016EE 4680016A 016A006A E876FFEA 76FFF056 VÞ.vô.vÒj.j.j..FŸ.P.È...á^.&.w.& 000180
77FF2606 77FF2637 FF260277 FF26165E C4E876FF EA76FF06 76FF0876 FF1A77FF .w..v..v..vô.vÒá^.&.w.&.7&.w.&.w 0001A0
1F00E8C0 280000FF FF9AE876 FFEA76FF 0000FFFF 9A0277FF 2637FF26 1A5EC404 .á^.&.7&.w.......vô.vÒ.....+àŠ.. 0001C0
F07E8000 1605EE56 89EC4689 08568806 46880888 1D46881E 56570000 30C8CBC9 èùàO..WV.|F..Ä.F..V..F&.VŸ....-Þ 0001E0

Dump of file SATURN:[PCCOMMON.DUMP.DLL]BRDPLOW.TMP;1 on 18-APR-1990 10:38:06.00
File ID (528,44,0)   End of file block 272 / Allocated 272

Virtual block number 179 (000000B3), 512 (0200) bytes

5E050457 88260247 8826EC5E C4627400 0E7E831F A5F20008 890A8E1E 0716F088 .Þ....Õ¿..·È..-..tbá^$&.G.&.W..^ 000000
47882606 56890446 19000A83 00012002 57882607 8826085E C40A5689 08468900 ..FÄ.VÕá^Ä&..&.W.-...Õ..FÅ.V«&.G 000020
F84601F2 5619F046 ¿9065688 04468802 56890046 89000A83 00012006 57882604 .&.W.-...Õ..FÄ.V®.FÅ.V®)FÞ.V·.F½ 000040
F8880C5E 880A5688 DC468DFE 5611FC46 01F65619 F44629D2 56880046 88FA5611 .V".FÅ.V®)F¶.V-.F».V±.FÉ.V..^..½ 000060
46801FA5 A5A5A508 8E1EF288 F88808C2 83E4468D 1FA5A5A5 A5D88E1E 0716F288 .·....ÜEEEE..FÕ.Õ..½.·..ÜEEEE..F 000080
9A505200 08051656 88144688 1476FF16 76FF1076 FF1276FF 5016F046 8050160C É.P.FÞ.P.v..v..v..v..F..V....RP. 0000A0
89078826 205EC408 8E1EFA88 1E565700 003EC8C8 C95F5E1F 00E8C028 00000337 7...+àŠ..^_èùà>..WV.|"..Äá^ &... 0000C0
83FEE3E8 0E0676FF 0876FF0E 76FF1076 FF1676FF 5016FC46 8D5016EC 468DEA46 FÕ.F&.P.F».P.v..v..v..v..v..ÕD±. 0000E0
02578826 0788260E 5EC40137 E9037402 FC7E8302 88E9C028 057D01FC 7E8312C4 á..-».).+àÕ|..-».t.Õ7.á^.&..&.W. 000100
045689D2 4689F256 18F0462B 06578826 04478826 D8568906 4689EE56 18EC462B +F&.VŸ.F«.VÄ&.G.&.W.+FÞ.V·.F®.Vá 000120
D25E8D20 73028F9A 025E8D20 6806C29A 206302BF 9AD65E8D 205E02BF 9AD65E8D .^«.¢.^ .^«.¢.c .ô.k .^®.¢.s .^® 000140
C48319E0 07859A20 8C03EF9A DC8808EC 83208706 019A207D 06C29A20 78028F9A .¢.x .ô.) .|.. .&..É.ÿ.. .ç.Å..á 000160
F6561BF4 46280257 88260788 260E5EC4 1FA5A5A5 A50A8E1E 0716F088 E27E8008 ..-&.Þ....ÕEEEE.á^.&..&.W.+F¶.V- 000180
028F9ACE 5E80CC56 89CA4689 FA561BF8 46280657 88260447 88260056 89CE4689 .Fö.VÄ&.G.&.W.+F½.V".FÒ.V«.^ó.¢. 0001A0
9A20F202 8F9ACA5E 8020ED02 8F9ACA5E 8020E506 C29A200D 028F9ACE 5E802008 Ä .^ò.¢.Ï .ô.| .^ò.¢.Ù .^ò.¢.· . 0001C0
F088DA7E 8008C483 205607B5 9A210603 EF9ADC88 08EC8321 0106019A 20F706C2 ô.% .|..|.&..É.ÿ..|.ç.V .á..-Õ.Þ 0001E0

Dump of file SATURN:[PCCOMMON.DUMP.DLL]BRDPLOW.TMP;1 on 18-APR-1990 10:38:06.00
File ID (528,44,0)   End of file block 272 / Allocated 272

Virtual block number 180 (000000B4), 512 (0200) bytes

73200006 069A2120 02329ADA 5E8D2128 02329AE2 5E801FA5 A5A5A5DA 8E1E0716 ....ÕEEEE..^ã.2.(!.^Õ.2.-!.ø.Å s 000000
801FA5A5 A5A51F16 1EF4768D EC7E801F A5A5A5A5 1F161E07 16EC768D C27E802C ,.-ô.v&.....EEEE..-&.v¶...EEEE.. 000020
8948FC46 88009BE9 037F0002 30FC4603 EA46881F A5A5A5A5 1F161EC2 7680F47E -¶.vÕ...EEEE..FÕ.F»=....Õ...F»H. 000040
26084788 260E5EC4 1FA5A5A5 A51F161E EC728008 7F8003E6 C1F08812 5EC4FE46 F±á^..Þè|.....r&...EEEE.á^.&.G.& 000060
E6C1FE76 880E5788 260C4788 261D75EE 52392275 EC423903 E6C1FE76 880A5788 .W..v±è|.9B&u"9RŸu.&.G.&.W..v±è| 000080
C4127501 FE7E8302 4789261C 5EC4C028 02E80001 880575F2 52390A75 F0423903 .9BÞu.9R·u.|..Š.+àá^.&.G..-±.u.á 0000A0
185EC400 DA830001 200C5688 0A46880C E80C5688 0A468808 7400027F 83261C5E ^.&....t..F..V.Š..F..V.-...Õ.á^. 0000C0
EA46FF06 E80000FE 46C700C2 E90002EA 46C7057D 02EA7E83 06578926 04478926 &.G.&.W..-ô.).úFÕ..Õò.úF±..Š..FÕ 0000E0
80398012 7EC403E3 C1EA5E88 03E6C1FE 768800AA E9037CFE 4639FC46 88FE46FF .F±.F»9F±|.Õ¯..v±è|..^õèD.á-..9. 000100
260E76C4 03E3C1EA 5E88EE52 88EC4288 03E6C1FE 76881FA5 A5A5A51F 161EEC72 r&...EEEE..v±è|..B&.RŸ.^õèD.áv.& 000120
260E5E88 03E6C1EA 7688F252 88F04288 03E6C1FE 76882675 02503926 2C750039 9.u,&9P.u&.v±è|..BÞ.R·.võè|..^.& 000140
FE7E8300 89261C76 C4E301EA 5E88C028 02E80001 88057506 50392608 75044039 9ã.u.&9P.u.|..Š.+à.^õ1Dáv.&...-± 000160
200C5688 0A46880C E80C5688 0A468808 74003883 261C76C4 E301EA5E 88167501 .u..^õ1Dáv.&.8.t..F..V.Š..F..V.- 000180
8926EA46 88205EC4 FF45E902 50892600 89261876 C402E3C1 EA5E8800 DA830001 ...Õ..^õèD.áv.&..&.P.ÕE.á^ .FÕ&. 0001A0
46080646 880000CE 46C7088E 1FE5881E 56570000 58C8C8C9 5F5E1F00 E8C02807 .+àŠ..^_èùàX..WV.|Ï..ÄúFö...F..F 0001C0
00001B6A 9A5016E0 46800676 FF0876FF 0247E9C0 2805750C 46080A46 88087408 .t..F..F̄.u.+àÕG..v..v..FÁ.P.j... 0001E0
```

```
Dump of file SATURN:[PCCOMMON.DUMP.DLL]BRDPLOW.TMP;1 on 18-APR-1990 10:38:06.00
File ID (528,44,0)   End of file block 272 / Allocated 272

Virtual block number 175 (000000AF), 512 (0200) bytes

 8B50168C 46800000 0FEE9ACE 76FFD076 FF006A50 5200D283 000105F4 568BF246 F·.V¶....θ.RPj..vÅ.vö.Ÿ....F¥.P. 000000
 16E2468D DA76FFDC 76FFDE76 FFE076FF CE76FFD0 76FF30FF 261876C4 E301F65E ^-ÌDáv.&.0.vÅ.vö.vÅ.vB.vÉ.vÖ.Fâ. 000020
 8B0C568B DA468684 5EC41874 00388326 1876C4E3 D1F65E8B 16C483FC 76E80E50 P.Öv•.á..^-ÌDáv.&.8.t.á^Ç.FÖ.VÉ. 000040
 04473926 DE5EC406 57882604 47882ECE 5EC402C0 E91FA5A5 A5A50ABE 1EF088FB «.Þ..ÖEEEE.Öá.á^ö&.G.&.W.á^B&9G. 000060
 57392601 0EE90374 0739260E 5EC40257 8B26078B 26CE5EC4 1E740657 39260675 u.&9W.t.á^ö&..&.W.á^B&9.t.Ö..&9W 000080
 02578926 07892684 5EC40257 8B26078B 260A5EC4 000DE98C 46880105 E9037402 .t.Ö...F¥ÖÌ.á^Ö&..&.W.á^Ç&..&.W. 0000A0
 57892604 47892684 5EC40657 13260447 0326C25E C40E578B 260C478B 26F85EC4 á^Y&.G.&.W.á^ö&.G.&.W.á^Ç&.G.&.W 0000C0
 2604478B 26F85EC4 02578926 07892684 5EC40257 8B26078B 260A5EC4 00C4E906 .Öá.á^Ö&..&.W.á^Ç&..&.W.á^Y&.G.& 0000E0
 26F85EC4 008CE906 57892604 47892684 5EC40657 18260447 2B26C25E C406578B .W.á^ö&+G.&.W.á^Ç&.G.&.W.Ö..á^Y& 000100
 8B260A5E C4025789 26078926 845EC402 57132607 0326C25E C40A578B 2608478B .G.&.W.á^ö&..&.W.á^Ç&..&.W.á^Ö&. 000120
 C25EC402 57882607 8826F85E C455E806 57892604 47892684 5EC40657 8B260447 G.&.W.á^Ç&.G.&.W.ŠUá^Y&..&.W.á^ö 000140
 26845EC4 06578826 04478826 DA5EC402 57892607 8926845E C402571B 26072B26 &+.&.W.á^Ç&..&.W.á^Ö&.G.&.W.á^Ç& 000160
 0830B574 000430FF 13E90375 00023DFF 53E90375 0001301F EB065789 26044789 .G.&.W.$.=..u.ÖS.=..u.Ö..=..tç=. 000180
 47882 6C2 5EC4008C E9037402 8C7E8309 74018C7E 830183E9 00EBFF76 E9037500 .u.Öv.$.Ö...-¥.t..-¥.t.Ö¥.á^ö&.G 0001A0
 5EC48A56 89B84689 DAF7000 2 830BF700 75018C7E 838A5689 88468906 57882604 .&.W..F¦.Vα.-¥.u.XÄ.θ.XÖ.F¦.Vαá^ 0001C0
 260E5EC4 8876FF8A 76FF5052 065718 26 04472826 DA5EC406 57882604 4788260E 8&.G.&.W.á^Ö&+G.&.W.RP.vα.v¦á^B& 0001E0

Dump of file SATURN:[PCCOMMON.DUMP.DLL]BRDPLOW.TMP;1 on 18-APR-1990 10:38:06.00
File ID (528,44,0)   End of file block 272 / Allocated 272

Virtual block number 176 (000000B0), 512 (0200) bytes

 46891230 00609A50 52192C00 FC9A5052 02571826 072826DA 5EC40257 8826078B ..&.W.á^Ö&+.&.W.RP.•.,.RP.'.=..F 000000
 7E830257 89260789 26845EC4 FE5613FC 46030257 8B26078B 260A5EC4 FE5689FC •.V±á^Ö&..&.W..F•.V±á^Ç&..&.W..- 000020
 8B260447 8826F85E C411E8BA 56138846 030E578B 260C478B 26F85EC4 1375028C ¥.u.á^Y&.G.&.W..F¦.VαŠ.á^Y&.G.&. 000040
 02578826 078826C2 5EC40088 E9065789 26044789 26845EC4 8A5613B8 46030657 W..F¦.Vαá^Ç&.G.&.W.Ö¦.á^ö&..&.W. 000060
 26078826 DE5EC48A 56898846 890AF700 D2830BF7 0D75048C 7E838A56 89884689 .F¦.Vα.-¥.u.XÄ.θ.XÖ.F¦.Vαá^B&..& 000080
 06578826 04478826 DE5EC488 76FF8A76 FF505202 57182607 2B260A5E C402578B .W.á^Ö&+.&.W.RP.vα.v¦á^B&.G.&.W. 0000A0
 83FE5689 FC468919 2500609A 505219E7 00FC9A50 5206571B 2604472B 260A5EC4 á^Ö&+G.&.W.RP.•.Ö.RP.'.X..F•.V±. 0000C0
 8826078B 26F85EC4 10E88A56 13884603 0A578826 08478826 F85EC413 75088C7E -¥.u.á^Y&.G.&.W..F¦.VαŠ.á^Y&..&. 0000E0
 FC460306 57882604 4788260A 5EC40257 89260789 26845EC4 8A5613B8 46030257 W..F¦.Vαá^Ç&..&.W.á^Ö&.G.&.W..F• 000100
 468A11E8 C0280475 038C46F6 487500F6 7E830657 89260447 8926845E C4FE5613 .V±á^Ç&.G.&.W..—.uH-F¥.u.+âŠ..F 000120
 8A11E8C0 2804750C 8C46F6AA 46890003 250001B8 03E80002 88057501 3C03248C ¥$.<.u.¦..Š.¦..X...F`-F¥.u.+âŠ.. 000140
 28FC25E9 0789261C 5EC4AA46 08000C25 00048803 E8000888 0575043C 0C248C46 F¥$.<.u.¦..Š.¦..X...F`á^.&..ÖX•+ 000160
 46080E46 88207408 46080646 88D88E15 FA881E56 00001CC8 C8C95F5E 1F00E8C0 āŠ..^_èùà...V.¦ª..Ä.F..F.t .F..F 000180
 68E98DF3 8806751C 46081A46 88087418 46081646 88107414 46081246 88187410 .t..F..F.t..F..F.t..F..F.u.¦µ.Ök 0001A0
 89E64689 08568806 46880256 E9C02805 7500027F 83260C75 003F8326 165EC402 .á^.&.?.u.&....u.+àÖV..F..V..F¦. 0001C0
 FC468900 1605C28C C388EC56 89EA4689 005E0504 57882602 478826E6 5EC4E856 VÖá^¦&.G.&.W..^..Fõ.V$.ú.ô....F• 0001E0

Dump of file SATURN:[PCCOMMON.DUMP.DLL]BRDPLOW.TMP;1 on 18-APR-1990 10:38:06.00
File ID (528,44,0)   End of file block 272 / Allocated 272

Virtual block number 177 (000000B1), 512 (0200) bytes

 83261676 C4E3D1FA 5E880212 E9037C02 FA7E83FA 46FF03EB 0000FA46 C7FE5689 .V±úF•..Š..F•.-•.|.Ö...^•ÌDáv.&. 000000
 76C402E3 C1FA5E8B F45689F2 46891056 880E4603 03E0C1FA 4688E4EB 02750038 ß.u.ŠÖ.F•éÅ..F..V..F·.V¶.^•éD.áv 000020
 5EC40000 11869A50 16EE468D 0A76FF0C 76FFF856 89F64689 02508826 00882612 .&..&.P..F-.V½.v..v..FŸ.P.Ñ...á^ 000040
 07882661 E80004E4 46C70775 02573926 0D750739 26F25EC4 02578826 078826FC =&..&.W.á^·&9.u.&9W.u.úFÖ..Šo&.. 000060
 8B260447 882644EB 0008E446 C707750A 57392600 75084739 26FC5EC4 02578826 &.W.á^=&9G.u.&9W.u.úFÖ..ŠD&.G.&. 000080
 260C478B 26FC5EC4 26E80001 E446C707 75065739 26007504 473926F2 5EC40657 W.á^·&9G.u.&9W.u.úFÖ..Š&á^=&.G.& 0000A0
 4688000B E446C705 E80002E4 46C70775 06573926 0D750447 3926F25E C40E578B .W.á^·&9G.u.&9W.u.úFÖ..Š.úFÖ...F 0000C0
 478926F2 5EC40657 13260447 0326EA5E C40E578B 260C478B 26FC5EC4 0087E9E4 öÖ..á^=&.G.&.W.á^ö&.G.&.W.á^·&.G 0000E0
 F25EC406 5718261 472B26EA 5EC40657 8B260447 8826FC5E C47DE806 57892604 .&.W.$)á^=&.G.&.W.á^ö&+G.&.W.á^· 000100
 C4025713 26070326 EA5EC40A 57882608 478826FC 5EC45AEB 06578926 04478926 &.G.&.W.$zá^=&.G.&.W.á^ö&..&.W.á 000120
 C402571B 26072826 EA5EC402 57882607 8826FC5E C439EB02 57892607 8926F25E ^·&..&.W.$9á^=&..&.W.á^ö&+.&.W.á 000140
 000830CE 74000430 FF6CE903 75000230 97740001 3019EB02 57892607 8926F25E ^·&..&.W.$.=..t.=..u.Öl.=..tö=.. 000160
 099AF276 FFF476FF 006A016A 006A0A76 FF0C76FF 4475F846 08F6468B 00EBA874 t`$..F-.F½D.v..v.j.j.j..v¶.v·.. 000180
 E6C1FA76 8B137500 FA7E8300 02508326 01008326 1276C402 E3C1FA5E 8B00001D ....^•éO.áv.&...&.P...-•.u..v•è| 0001A0
 75F64638 000A8300 0120F056 88EE468B 48E80006 50832601 04408326 125EC402 .á^.&.a..&.P..ŠH.FŸ.Vþ-...Ö.;F-u 0001C0
 FF19EB00 0011609A F276FFF4 76FF016A 016A006A 0A76FF0C 76FF1975 F856381E .;V½u..v..v.j.j.j..v¶.v·.'...Š.. 0001E0
```

Dump of file SATURN:[PCCOMMON.DUMP.DLL]BRDPLOW.TMP;1 on 18-APR-1990 10:38:06.00
File ID (528,44,0)   End of file block 272 / Allocated 272

Virtual block number 181 (000000B5), 512 (0200) bytes

```
46891857 88261647 88260A5E C40224E9 C0280573 02E07E83 067C007F 00E27E83 .-ã...|..-Å.s.+àÖ$.á^.&.G.&.W..F 000000
C3881E77 FF260A5E C4FE5689 FC468900 86978826 00848788 26885EC4 8A568988 ¡.V□á^¡&....&.....F•.V±á^.&.w..ù 000020
500676FF 0876FF.8 4689FA46 89C02800 008C46C7 24AD0000 9A505200 0805C28C .ô...RP...Ü$úF¥..+å.F*.F½.v..v.P 000040
161E0716 08768000 7E800000 F246C700 01F046C7 00001705 9A501608 46805050 PP.FÄ.P.....úFÞ..úF·...~Å.vÄ.... 000060
8000F256 8301F046 8318E800 0011E29A 016A006A 0676FF08 76FF1FA5 A5A5A51F .ÉÉÉÉ..v..v.j.j..ã...Š..FÞ..V·.. 000080
08000012 189A5016 08468006 76FF0876 FF1FA5A5 A5A51F16 1E071608 7680007E ~Å.vÄ.....ÉÉÉÉ..v..v..FÄ.P...... 0000A0
1FA5A5A5 A51F161E 07160076 80F888A8 46804075 FA4608F8 46880087 E90374C0 åt.Ö...F½.F¹uM.F´.½.vÄ.....ÉÉÉÉ. 0000C0
0A76FF0C 76FF5016 A8468050 16F84680 1FA5A5A5 A51F161E 087680F8 88804680 .F¯.½.vÄ...ÉÉÉÉ..F½.P.F´.P.v..v. 0000E0
50168C46 80FF7CE9 35E8027E 018C7E83 0875FA46 08F84688 0CC4831E 2719C89A .å.'..å..F½.F¹u..-¥.-.$5Ö|..F¥.P 000100
FA76FFF0 76FFF27‹ FF501600 46805016 BE46800E 76FF5016 E4468050 16EC4680 .Få.P.FÖ.P.v..Fƒ.P.FÅ.P.v·.vÞ.v* 000120
0085E903 75FA46C· F846884D E8027E01 8C7E83FF 4AE91EC4 83F886E8 0EF876FF .v½.Ö.«.á.ÖJ..-¥.-.$M.F½.F¹u.Öç. 000140
56391475 F84639FE 5688FC46 88006A01 6A006A00 6A0877FF 260A77FF 260A5EC4 á^.&.w.&.w.j.j.j.j..F•.V±9F¥u.9V 000160
E9037202 909A5052 FA5688F8 468806E8 008C9788 26008A87 8826885E C40F75FA *u.á^¡&....&....$..F½.V*RP...r.Ö 000180
46805016 F4468027 74EE4639 0575EC46 3931750E 4639F446 89F64689 C028FEAA ˝±+å.F-.F¶9F.u19F&u.9F¥t'.F¶.P.F 0001A0
18C483F5 A8E80EF8 76FFFA76 FF0676FF 0876FF50 168E4680 5016E446 805016EC &.P.FÖ.P:Fƒ.P.v..v..v*.v½.Ö¨%.á. 0001C0
FA76FF0A 76FF0C76 FF50168E 46805016 E4468050 16EC4680 5016F446 800E76FF .v..F¶.P.F&.P.FÖ.P.Fƒ.P.v..v..v* 0001E0
```

Dump of file SATURN:[PCCOMMON.DUMP.DLL]BRDPLOW.TMP;1 on 18-APR-1990 10:38:06.00
File ID (528,44,0)   End of file block 272 / Allocated 272

Virtual block number 182 (000000B6), 512 (0200) bytes

```
0877FF26 0A77FF26 0A5EC400 01CE46C7 1EC483F8 23E80E06 76FF0876 FFF876FF .v½.v..v..Ò#½.á.úFö..á^.&.w.&.w. 000000
00002CC8 CBC95F5E 1F00E8CE 46880847 89260A47 8926C028 0A5EC423 5A00689A .h.Z#á^.+ã&.G.&.G..FöŠ..^_èùà,.. 000020
5016F846 800676FF 0876FF01 87E9C028 05750846 08064688 D88E22E2 881E5657 WV.¡ã".Ä.F..F.u.+åÖ...v..v̄..F½.P 000040
006A0676 FF0876FF 0164E9C0 28057302 F87E8306 7C007F00 FA7E8300 00230C9A ..#...~*...|..-½.s.+åÖd..v..v.j. 000060
9A5016F0 4680006A 006A006A 0676FF08 76FF0000 25809A50 16E04680 016A006A j.j..FÅ.P.¯%...v..v.j.j.j..FÞ.P. 000080
76FF1FA5 A5A5A51F 161E0716 F07680E8 7E800000 FE46C700 01FC46C7 00002378 x#..úF•..úF±...~Ò.vÞ.....ÉÉÉÉ..v 0000A0
1E0716F0 7680E87E 8000FE56 8301FC46 8318E800 0023A19A 016A006A 0676FF08 ..v.j.j..À#..Š..F•..V±..-Ò.vÞ... 0000C0
4688000A E90374C0 08000023 C89A5016 F0468006 76FF0876 FF1FA5A5 A5A51F16 ..ÉÉÉÉ..v..v..FÞ.P.ù#...åt.ÖÖ..F 0000E0
AFE80275 F2563907 75F04639 EA5688E8 46881074 F6563905 75F44639 EE5688EC &.V¥9F¶u.9V-t..FÖ.Vö9FÞu.9V·u.$€ 000100
46880CE8 E65618E4 4628EE56 88EC4688 0E7D0208 EE5618EC 4628E656 88E44688 .FÖ.V|+F&.V¥.@)..F&.V¥+FÖ.V|Š..F 000120
0E7D0808 D6568904 4689EA5E 18E84E28 E25E88E0 4E88EE56 18EC4628 E65688E4 Ö.V|+F&.V¥.NÁ.^ã+NÒ.^ö.Få.Vø.Ù). 000140
7C217FD6 5638EA56 18E8462B E25688E0 46880CE8 E25618E0 4628EA56 88E84688 .FÖ.Vö+FÅ.VãŠ..FÅ.Vã+FÖ.Vö;Vø.¡| 000160
18E80E56 890C4689 EE5688EC 46880A56 89084689 F25688F0 46881A73 D4463805 .;Fås..FÞ.V·.FÄ.VÖ.F&.V¥.FÉ.V8$. 000180
76FF0676 FF0876FF 0E56890C 4689F656 88F44688 DA568908 4689EA56 88E84688 .FÖ.Vö.FÄ.VÖ.F¶.V-.FÉ.V8.v..v..v 0001A0
C95F5E1F 00E8C028 FEF7E907 E80001B8 00001DE2 9A501608 4680006A FC76FFFE ±.v•j..FÄ.P.ã...¡..Š.Ö¼±+åŠ..^_è 0001C0
88260447 8826145E C42E7502 0E7E8306 74010E7E 83088E25 54881E00 0026C8CB ùà&...¡T%.Á.-..t..~..u.á^.&.G.Ī. 0001E0
```

Dump of file SATURN:[PCCOMMON.DUMP.DLL]BRDPLOW.TMP;1 on 18-APR-1990 10:38:06.00
File ID (528,44,0)   End of file block 272 / Allocated 272

Virtual block number 183 (000000B7), 512 (0200) bytes

```
F846890A 57882608 47882 6FE 5689FC46 89025788 26078826 DC56890A 46890657 W..FÖ.V€&..&.W..F•.V±&.G.&.W..F½ 000000
FC468906 57882604 4788260C 56890A46 89025788 26078826 145EC42C EBFA5689 .V*Š,á^.&..&.W..FÖ.V€&.G.&.W..F• 000020
76FFFA76 FF5016F4 46805016 DE4680FA 5689F846 890E5788 260C4788 26FE5689 .V±&.G.&.W..F½.V*.F8.P.F¶.P.v*.v 000040
7E831AC4 83241321 E39A0A76 FF0C76FF 0E76FFDA 76FFDC76 FFFC76FF FE76FFF8 ½.v±.v•.vÉ.vÖ.v..v..v..DI.$.á..~ 000060
880676FF 0876FF03 A0E9C028 0575F656 390A75F4 46390C56 880A4688 1574000E 8.t..FÖ.VÉ9F¶u.9V-u.+åÖ...v..v.. 000080
880676FF 0876FF00 0027E59A 5016E046 80006A50 52000A83 00022012 56881046 F..V.·...Ö.RPj..FÄ.P.Í'...v..v.. 0000A0
880229E9 0E468800 00259A9A 5016E846 80006A50 52000283 00010512 56881046 F..V.....@.RPj..FÒ.P..%...F.Ö).. 0000C0
4639057C 0C7FEE56 390C5688 DA468817 77E44639 057C1E7F E656390C 56880A46 FÖ.VÉ9V|..|.9FÖw..FÖ.VÉ9V¥..|.9F 0000E0
EE5688EC 46880E77 E4463905 7C157FE6 56390C56 880A4688 0331E9C0 280577EC åw.+åÖ1..FÖ.VÉ9V|..|.9FÖw..F&.V¥ 000100
E65688E4 46880E77 EC463905 7C157FEE 56390C56 880A4688 3EE8F256 89F04689 .FÞ.V·$>.FÖ.VÉ9V¥..|.9F&w..FÖ.V| 000120
EC4688EE 56880676 EC463805 7F007CEE 5638E656 88E44688 1EE8F256 89F04689 .FÞ.V·Š..FÖ.V|;V¥|...;F&v..V¥.F& 000140
56880A46 881772E4 4639057F 1E7CE656 390C5688 DA468801 C1E9F256 89F04689 .FÞ.V·Öé..FÖ.VÉ9V||...9FÖr..FÖ.V 000160
39057F15 7CE65639 DC56880A 468802A7 E9C02805 72EC4639 057F0C7C EE5639DC É9V¥|...9F&r.+åÖ|..FÖ.VÉ9V||...9 000180
39057F15 7CEE5639 DC56880A 46883EE8 F25689F0 4689EE56 88EC4688 0E72‹ 446 FÖr..F&.V¥.FÞ.V·$>.FÖ.VÉ9V¥|...9 0001A0
38057C00 7FEE5638 E65688E4 46881EE8 F25689F0 4689E656 88E44688 0E72L·46 F&r..FÖ.V|.FÞ.V·Š..FÖ.V|;V¥..|.; 0001C0
057C1E7F E256390C 56880A46 880137E9 F25689F0 4689EC46 88EE5688 0673EC46 F&s..V¥.F&.FÞ.V·Ö7..FÖ.VÉ9Vã..|. 0001E0
```

Dump of file SATURN:[PCCOMMON.DUMP.DLL]BRDPLOW.TMP;1 on 18-APR-1990 10:38:06.00
File ID (528,44,0)   End of file block 272 / Allocated 272

Virtual block number 184 (000000B8), 512 (0200) bytes

88DA4688 021DE9C0 280577E8 4639057C 0C7FEA56 39DC5688 0A468817 77E04639 9FÅw..FÖ.VÉ9Vö..|.9FÖw.+âÖ...FÖ. 000000
88DA4688 3EEBF256 89F04689 EA5688E8 46880E77 E0463905 7C157FE2 5639DC56 VÉ9Vâ..|.9FÅw..FÖ.Vö.FÞ.V·$>.FÖ. 000020
88E04688 1EEBF256 89F04689 E25688E0 46880E77 E8463905 7C157FEA 5639DC56 VÉ9Vâ..|.9FÖw..FÅ.Vâ.FÞ.V·$..FÅ. 000040
0A468800 ADE9F256 89F04689 E84688EA 56880676 E8463805 7FOD7CEA 5638E256 Vâ;Vö|...;FÖv..Vö.FÖ.FÞ.V·ÖÜ..FÖ 000060
72E84639 057F0C7C EA5639DC 56880A46 881772E0 4639057F 1E7CE256 39DC5688 .VÉ9Vâ|...9FÅr..FÖ.VÉ9Vö|...9FÖr 000080
4689EA56 88E84688 0E72E046 39057F15 7CE25639 DC56880A 46880193 E9C02805 .+âÖ...FÖ.VÉ9Vâ|...9FÅr..FÖ.Vö.F 0000A0
4689E256 88E04688 0E72E846 39057F15 7CEA5639 DC56880A 46883EE8 F25689F0 Þ.V·$>.FÖ.VÉ9Vö|...9FÖr..FÅ.Vâ.F 0000C0
4689E846 88EA5688 0673E846 38057C00 7FEA5638 E25688E0 46881EE8 F25689F0 Þ.V·$..FÅ.Vâ;Vö..|.;FÖs..Vö.FÖ.F 0000E0
FF50E903 75000430 FDC7E903 7500023D FE59E903 7500013D 22E824E8 F25689F0 Þ.V·$$$"=..u.ÕY±=..u.Õú»=..u.Õ]. 000100
137FF256 39F65688 F4468842 E80E4688 5F74000E 7E8300E8 FECBE903 75000830 =..u.Õü±$..-8.t .F.$8.F¶.V-9V·.. 000120
137CF256 39F65688 F4468838 E8F65689 F44689F2 5688F046 880C73F0 4639057C |.9FÞs..FÞ.V·.F¶.V-$8.F¶.V-9V·|. 000140
74000230 D9740001 3D16E818 E8F65689 F44689F2 5688F046 880C76F0 4639057F ..9FÞv..FÞ.V·.F¶.V-$.$.=..t)=..t 000160
56880A46 88F65689 F44689F2 5688F046 880CE800 E8AA7400 083DCF74 00043D84 Ç=..tÜ=..t`$.$..FÞ.V·.F¶.V-.FÖ.V 000180
88145EC4 1E75020E 7E830674 010E7E83 0089E9C0 280575F6 56390A75 F44639DC É9F¶u.9V-u.+âÖ..-..t..-..u.â^.. 0001A0
F4468814 5EC418E8 06578926 04478926 145EC40E 5789260C 478926F6 5688F446 F¶.V-&.G.&.W.â^.&.G.&.W.$.â^..F¶ 0001C0
56881046 880676FF 0876FF02 57892607 8926145E C40A5789 26084789 26F65688 .V-&.G.&.W.â^.&...&.W..v..v..F..V 0001E0

Dump of file SATURN:[PCCOMMON.DUMP.DLL]BRDPLOW.TMP;1 on 18-APR-1990 10:38:06.00
File ID (528,44,0)   End of file block 272 / Allocated 272

Virtual block number 185 (000000B9), 512 (0200) bytes

FF1276FF 0676FF08 76FF0000 28409A14 76FF1676 FF006A50 52000A83 00012012 .-...Ö.RPj..v..v..ä+....v..v..v.. 000000
000040C8 C8C91F00 E8000188 00001D24 9A505200 08051656 88144688 006A1076 v.j...F...V....RP.$....i...$..èùàä.. 000020
14468808 740C4608 0A468810 74084608 06468800 01F246C7 088E26F7 881E5657 WV.¡¾â.ÅüF...F..F..t..F..F..t..F. 000040
6A505200 02830001 0517568 10468806 76FF0876 FF02A2E9 8DF38806 75164608 .F.u.¡æ.ÖÅ..v..v..F..V.....Ø.RPj 000060
16F088D4 7E8D1656 88144688 000DE903 7500187E 83000027 C59A5016 F4/48D00 ..F¶.P.é'...-..u.Õï..F..V..-â.Þ. 000080
0E7E8306 74010E7E 831FA5A5 A5A51F16 1EF4768D E47E8D1F A5A5A5A5 DA8E·E07 ...ÖEEEE..-Ö.v¶...EEEE..-..t..-. 0000A0
E8E25689 E04689FA 5688F846 88DE5689 DC468902 57882607 8826145E C41E7502 .u.â^.&..&..&.W...FÉ.V8.F%.V².FÅ.Vâ$ 0000C0
46C7E256 89E04689 06578826 04478826 145EC4DE 5689DC46 89F65688 F446881D ..F¶.V-.FÉ.V8â^.&.G.&.W...FÅ.VâüF 0000E0
88C4468D 5274C008 F04EFFF0 468808EC 468304E8 EE568CEC 46890446 800002F0 Þ...Fâ.Fâ.VY$..Fâ..FÞ.NÞ.âtR.Fâ. 000100
D88E1EF2 88F88808 C283CC46 801FA5A5 A5A5D88E 1E0716F2 88F888EE 5E88EC56 Vâ.^Y.%.·....ÜEEEE..Fâ.Ö..%.·..Ü 000120
FC46880C C4832789 19C89A0A 76FF0C76 FF5016C4 46805016 FC46801F A5A5A5A5 EEEE..F=.P.Fâ.P.v..v..â..'.â..F= 000140
07882614 5EC4C656 8CC44689 D4468D01 08E9A0E8 02E80000 F246C707 74FE4608 .F±t.üF·..$.$.Ö...Fâ.Fâ.Vöâ^.&.. 000160
04478926 C45EC406 57882604 47882614 5EC40257 89260789 26C45EC4 02578826 &.W.â^â&..&.W.â^.&.G.&.W.â^â&.G. 000180
8926FA56 88F84688 C45EC40A 57892608 478926F6 5688F446 88C45EC4 06578926 &.W.â^â.F¶.V-&.G.&.W.â^â.F%.V²&. 0001A0
88262073 08473926 067C357F 0A573926 02578826 078826C4 5EC40E57 89260C47 G.&.W.â^â&..&.W.&9W..5|.&9G.±-&. 0001C0
EC4688C4 5EC40257 89260789 260A5788 26084788 26EE5689 EC468902 57882607 .&.W..F$.VY&.G.&.W.&...&.W.â^â.F$ 0001E0

Dump of file SATURN:[PCCOMMON.DUMP.DLL]BRDPLOW.TMP;1 on 18-APR-1990 10:38:06.00
File ID (528,44,0)   End of file block 272 / Allocated 272

Virtual block number 186 (000000BA), 512 (0200) bytes 3926067F 377C0657 39260E57 88260C47 8826C45E C40A5789 26084789 26EE5688 .VY&.G.&.W.â^â&.G.&.W.&9W.|7..&9 000000
89260447 89260E57 88260C47 8826C256 89C04689 06578826 04478826 2F760447 G.v/&.G.&.W..Fâ.Vö&.G.&.W.&.G.&. 000020
76FFC476 FFC676FF 5016FC46 8D0E5789 260C4789 26C25688 C04688C4 5EC40657 W.â^â.Fâ.Vö&.G.&.W..F=.P.vö.vâ.v 000040
836A7400 F27E8300 00F246C7 0574FE46 08FC4688 0CC4832C 6810779A 0A76FF0C ..v..w.h,.â..F=.F±t.üF·...-·.tj. 000060
5EC410E8 06578926 04478926 FA5688F8 4688145E C4137502 0E7E8306 74010E7E -..t..-..u.â^..F%.V²&.G.&.W.$.â^ 000080
000A8300 01201256 88104688 0676FF08 76FF0257 89260789 26F65688 F4468814 ..F¶.V-&..&.W..v..v..F..V.-..Ö. 0000A0
10F79A00 6A1076FF 1276FF06 76FF0876 FF000028 229A1476 FF1676FF 006A5052 RPj..v..v..'"+....v..v..v..v.j..%. 0000C0
76FF0A76 FFOC76FF 0E76FF10 76FF1276 FF1476FF 1676FF24 E826E800 01880000 ..¡..$â$$.v..v..v..v..v..v..v..v 0000E0
46880888E.2854881E 56570000 2AC8C8C9 5F5E1F00 E812C483 F8D9E80E 0676FF08 ..v..Ö1%.â.$..^.èùâ"..WV.¡T+.Å.F 000100
719A5016 F6468006 76FF0876 FF01E0E9 C0280575 0C46080A 46880874 08460806 ..F.t..F...F.u.+âÖÅ..v..v..F-.P.q 000120
006A006A 0676FF08 76FF0180 E9C02805 7304F67E 83067C00 7F00F87E 83000025 %...-%...|..-..s.+âÖ$..v..v..j.j. 000140
2F469A50 16EE4680 006A016A 006A0676 FF0876FF 00002E8E 9A50160E 46800016A j..F8.P.......v..v.j.j.j..FY.P.F/ 000160
FF0876FF 1FA5A5A5 A51F161E 0716EE76 8DE67E8D 0000FE46 C70002FC 46C70000 ..üF=..üF±...-Ì.vY.....EEEE..v.. 000180
1F161E07 16EE768D E67E8D00 FE568301 FC468318 E8000025 D99A026A 006A0676 v.j.j..1%..$..F=..V±..-Ì.vY..... 0001A0
0373FC46 38087F01 36E9037D FE563800 DA830002 20F85688 F64688 1F A5A5A5A5 EEEE..F-.V%-...Ö.;V±).Ö6...;F=s. 0001C0
EC5688EA 46880115 E90374C0 08000026 039A5016 EE468006 76FF0876 FF012CE9 Ö,...v..v..FY.P..&...ât.Ö...FÖ.V$ 0001E0

Dump of file SATURN:[PCCOMMON.DUMP.DLL]BRDPLOW.TMP;1 on 18-APR-1990 10:38:06.00
File ID (528,44,0)   End of file block 272 / Allocated 272

Virtual block number 187 (000000BB), 512 (0200) bytes

0676FF08 76FF2275 EC563927 75EA4639 E4568BE2 46886175 F4563966 75F24639 9F uf9V¶ue.Fâ.Vö9Fõu'9Vâu".v..v. 000000
8D067E8D 10EB0000 2F879A50 16D6468D 006A5052 00D28300 0105FE56 8BFC468B .F•.V±....●.RPj..F●.P.ñ/..Š..~●. 000020
02B80576 DA463V05 7F0C7CDC 5639EC56 8BEA468B 1FA5A5A5 A51F161E 07160E76 vB.....EEEE..Fõ.V±9VÉ|...9FÕv.¡. 000040
568BDE46 8B6175F0 56396675 EE4639E8 568BE646 8B74EBFA 46890001 8803E800 .Š.¡...F¹Št.F|.VÒ9FŸu!9VÞue.FB.V 000060
6A505200 D2830001 05FE568B FC468806 76FF0876 FF2275E8 56392775 E64639E0 Å9F|u'9VÒu".v..v..F•.V±....●.RPj 000080
E6468B1F A5A5A5A5 1F161E07 16DE768D D67E8D10 EB00002B 979A5016 D6468D00 ..F●.P..+..Š..~●.vB.....EEEE..F| 0000A0
FFFECEE9 03EBFA46 890004B8 03EB0008 8B0576D6 4639057F 0C7CD856 39E8568B .VÒ9VÄ|...9F●v.¡..Š.¡...F¹Š.Öö±. 0000C0
FB3CE80E 0676FF08 76FF0A76 FF0C76FF FA76FFFC 76FFFE76 FF5016E6 468D0E76 v..F|.P.v±.v•.v°.v..v..v..v..Ò<« 0000E0
2AB81E56 000036C8 CBC95F5E 1F00EBC0 2BFE9EE9 07EB0001 B80574C0 0B14C483 .á..Åt.¡..Š.Õ.±+âŠ..^_èùá6..V.¡* 000100
89FC4689 08578B26 06478B26 065EC401 60E98DF3 B8067508 460B0646 8BD8BE2E ..Ä.F..F.u.¡µ.Õ'.á^.&.G.&.W..F•. 000120
04578B26 02478B26 E4568CE2 46890246 8DEA5689 EB468900 0A05C28C C38BFE56 V±.û.ô....FÕ.Võ.F●.Fã.VÕ&.G.&.W. 000140
C1E65E8B 0111E903 7E01E67E 83E646FF 03E80000 E646C7D0 5689CE46 89005E05 .^..Fò.VÄúF|..Š..F|.-|.-.Õ...^|è 000160
83FFFF1A 339A5052 E276FFE4 76FFCC56 89CA4689 02508B26 008B26E8 76C402E3 D.ávÕ&..&.P..Fò.Vã.vô.vãRP.3.... 000180
6AFC76FF FE76FF00 00300C9A 5016EC46 8DE676FF 006A006A FC76FFFE 76FF08C4 á..v±.v•j.j..v|.F&.P.EO...v±.v•j 0001A0
04478B26 CE5EC464 EB46478B 26CA5EC4 00002E7B 9A5016F4 468DE676 FFu¡6A00 .j..v|.F¶.P.x...á^õ&.GFŠdá^õ&.G. 0001C0
26044728 26CE5EC4 D8568B06 468B61EB F25689F0 4689E056 13DE4603 06578B26 &.W..FB.VÂ.FÞ.V·Šo.F●.VÂá^õ&+G.& 0001E0

Dump of file SATURN:[PCCOMMON.DUMP.DLL]BRDPLOW.TMP;1 on 18-APR-1990 10:38:06.00
File ID (528,44,0)   End of file block 272 / Allocated 272

Virtual block number 188 (000000BC), 512 (0200) bytes

5689EC46 89DC5613 DA460302 57882607 8826CE5E C448E8F2 5689F046 8906571B .W..FÞ.V·ŠHá^õ&..&.W..FÕ.VÉ.F&.V 000000
00013D16 EB18EBEE 5689EC46 8902571B 26072B26 CE5EC4D4 5688D246 8B30EBEE ŸŠ0.F●.Vãá^õ&+.&.W..F&.VŸŠ.Š.=.. 000020
56391575 F44639EE 568BEC46 8B00EB8A 7400083D D7740004 3D927400 023D8074 t¯=..t.=..t●=..toŠ..F&.VŸ9F¶u.9V 000040
E676FF01 6A006AFC 76FFFE76 FF1774FA 56390575 F84639F2 568BF046 8B1075F6 -u..FÞ.V·9F%u.9V°t..v±.v•j.j..v| 000060
00600004 1DCC0203 001290C8 C95E1F00 EBC02BFE E3E90000 26DC9A50 16EC468D .F&.P.É&..ÕD±+âŠ..^èù.....ë...'. 000080
00000009 30AD0002 007D0004 31960203 006E0004 1EE70203 02600005 1EDC0203 ..É...'...Õ...n....1..)...ÙÕ.... 0000A0
00AB0004 2E4F0203 00000011 20770002 009B0004 2DEE0203 008A0004 2D0B0203 ..Ú-.......Ÿ-.......w-......O...¨. 0000C0
00BD0004 30C50203 00000017 21200002 01330004 2EB70203 00000014 25330002 ..3%......ñ...3... !......éO..§. 0000E0
01CE0004 1FD00203 01450004 2EFF0203 00000019 302F0002 018D0004 0F480203 ..H...§.../0..........E...Å...ö. 000100
46080646 8BD8BEFF FF881E56 000006C8 00000000 00000000 00500004 14AB0203 ..¨...P..........à...V.¡...Ä.F...F 000120
7E83FE46 FF03EB00 00FE46C7 FC5689FA 46890856 88064688 43EB8DF3 B8057508 .u.¡µ.ŠC.F..V..F°.V•úF±..Š..F±.- 000140
5EC4DDEB 0FEB8E03 8805750C 400B260A 408B26FA 5EC402E6 C1FE768B 1A7F01FE ±....v±è|.á^°&.ä.&.ä.u.¡..Š.Š|á^ 000160
8E46C7D8 8E0007B8 1E565700 007EC800 04CAC95E 1F00E8C0 28000136 47C726FA °&úG6..+âŠ..^èò..à-..WV.¡...ÄúF. 000180
065EC403 30E98DF3 88067508 470B2606 47882606 5EC40074 08460806 46880000 ...F..F.t.á^.&.G.&.G.u.¡µ.ÕO.á^. 0001A0
DC568BDA 46880000 FFFF9A50 160A468D 5052F256 89F04689 08578B26 06478B26 &.G.&.W..FÞ.V·RP.FÕ.P......FÕ.VÉ 0001C0
9A006A01 6A006AF0 76FFF276 FF1D7600 0230057F 247CD208 000C5E83 01DA6E83 .nÕ..^É..●|$..*..v..v·.vÞj.j.j.. 0001E0

Dump of file SATURN:[PCCOMMON.DUMP.DLL]BRDPLOW.TMP;1 on 18-APR-1990 10:38:06.00
File ID (528,44,0)   End of file block 272 / Allocated 272

Virtual block number 189 (000000BD), 512 (0200) bytes

C79A5689 98468900 0A050856 88064688 CAE802DF E98E0288 0674C008 0000FFFF .....ât.¡..ÕÕ.Šò.F...V.....F..V.ú 000000
88260088 26985EC4 02E6C19C 76880088 E9037E01 9C7E839C 46FF03E8 00009C46 F...Š..F..~..~..Õ....v.él.á^.&..&. 000020
89E45289 E2428908 57882606 4788268A 5EC48C56 898A4689 84528982 42890250 P..B..R..F..V.á^.&.G.&.W..Bã.RÕ. 000040
76FF006A 006AF076 FFF276FF E0568CDE 4689CA43 8D03E7C1 9C7E88EE 5689EC46 F&.VŸ.~.éÕ..Cõ.F8.VÂ.v·.vÞj.j..v 000060
830253E8 0EEC76FF EE76FF46 77FF268A 5EC4DE76 FFE076FF 0000FFFF 9A50169C ..P......vÂ.v8á^.&.wF.vŸ.vâ.ÕS.. 000080
825EC4FF 69E90000 02E29ADE 76FFE076 FF9C76FF 016A006A F076FFF2 76FF0AC4 á..v·.vÞj.j..v..vÂ.v8.ã...Õi.á^. 0000A0
568CC646 899E4680 96468906 47882692 5EC49456 89924689 04578826 02478826 &.G.&.W..F..V.á^.&.G..F..F..F6.V 0000C0
89844689 94568892 4688A646 89A84689 C028FFFF 00009A50 16A2468D 9676FFC8 à.v..FÂ.P.....+à.F´.Fl.F..V..FÇ. 0000E0
46880001 AA46C78C 46899646 888A5689 88468904 57882602 47882692 5EC48656 VÑ6^.&.G.&.W..F¡.Vo.F..FÑúF´...F 000100
76FFC676 FFC876FF 006AC456 89C24689 F25688F0 4688C056 898E4689 08568806 ..V..Ff.Vâ.FÞ.V·.Fõ.Vâj..vâ.vó.v 000120
EE4689C0 28FE568C FC4689F4 46800EC4 83028215 A59AE276 FFE476FF E676FFE8 Õ.vl.vó.vâ.É....á..F¶.F•.V±+á.FŸ 000140
E9037C00 64308E46 FF8E4688 08C48303 C0E80E50 16CA468D 50169046 8DEC4689 .Fâ.F..P.Fõ.P.Õâ..á..F..F.=d.|.Õ 000160
16D2468D 5016CA46 805016EC 468D1FA5 A5A5A51F 161E0716 CA768DF4 7E800128 (..~¶.vò.....EEEE..Fâ.P.Fõ.P.Fø. 000180
D24639CC 568BCA46 8816C483 03190CBA 9A9076FF C676FFC8 76FF5016 CA468D50 P.Fõ.P.vâ.vó.v..¤....á..Fõ.Va9Fø 0001A0
CA468BFC 5EC400D0 E90375D8 56390875 D6463900 568BCE46 88137504 56391875 u.9Vâu..Fõ.VÂ9Fæu.9VÂu.ÕÂ.á^•.Fõ 0001C0
16740657 39260675 04473926 D05688CE 46881275 02573926 18750739 26CC5688 .Vá&9.u.&9W.u..Fõ.VÂ&9G.u.&9W.t. 0001E0

Dump of file SATURN:[PCCOMMON.DUMP.DLL]BRDPLOW.TMP;1 on 18-APR-1990 10:38:06.00
File ID (528,44,0) End of file block 272 / Allocated 272

Virtual block number 190 (000000BE), 512 (0200) bytes

```
46807074 EE4608E. 46800000 FFFF9A50 16CA468D 016A026A 006AF076 FFF276FF .v·.vÞj.j.j..Fò.P......F$.FŸtp.F 000000
9076FFC6 76FFC876 FF5016CA 468D5016 D2468D50 16CA468D 50169046 8D5016EA ò.P.F..P.Fò.P.F@.P.Fò.P.và.vó.v. 000020
75024639 CC568BCA 468854EB 027400EA 7E831EC4 83FFFF11 229AEC76 FFEE76FF .vŸ.v$."....á..-ð.t.ŠT.Fò.Vä9F@u 000040
006AF076 FFF276FF 32E80275 D8563907 75D64639 D0568BCE 46881275 D4563917 .9Vâu..Fö.VÄ9F@u.9VÄu.Š2.v·.vÞj. 000060
9076FF50 16CA468D 5016D246 80501690 468D0000 01869A50 16CA468D 016A026A j.j..Fò.P......F..P.F@.P.Fò.P.v. 000080
0AAE681E 0ABE681E 016A006A 016A006A 1A7C648E 7E83FECA E90EC483 0116E80E .Ò...á.Òb±.-.d|.j.j.j.j..h/..hÖ. 0000A0
76FF08C4 83FFFF04 559A0676 FF0876FF C676FFC8 76FF0000 FFFF9A10 4068006A j.hà.......và.vó.v..v..U....á..v 0000C0
26065EC4 D88E0069 881E0000 14C8C8C9 5F5E1F00 E8C02801 8C00689A A276FFA4 Ë.vÄ.h.Ÿ.+âŠ..^ èüà....||..Äá^.& 0000E0
8808C483 FFFF1702 9A530650 16F0468D EE5689EC 4689005E 05045788 26024788 .G.&.W..^..F$.VŸ.FÞ.P.S......á.. 000100
73E80257 89260789 260C5EC4 02571826 072826EC 5EC4F256 88F04688 76E80A46 F.Šv.FÞ.V·á^$&+.&.W.á^.&..&.W.Ša 000120
88F44688 57E80257 89260789 260C5EC4 FA5613F8 46030257 88260788 26EC5EC4 á^$&..&.W..F½.V°á^.&..&.W.ŠW.F¶. 000140
478826EC 5EC439E8 06578926 04478926 0C5EC406 57182604 472826EC 5EC4F656 V-á^$&+G.&.W.á^.&.G.&.W.Š9á^$&.G 000160
30807400 013019E8 18E80657 89260447 89260C5E C4FE5613 FC460306 57882604 .&.W..F•.V±á^.&.G.&.W.Š.Š.=..t§= 000180
881E0000 0EC8C8C9 1F00E8C0 2800E88F 74000830 FF78E903 75000430 D6740002 ..t@=..u.Õx.=..t.Š.+âŠ..èüà....| 0001A0
5EC4FC56 89FA4689 02571826 07282608 5EC40257 88260788 260C5EC4 D88E03C8 à..Äá^.&..&.W.á^.&+.&.W..F°.V•á^ 0001C0
D8F7097D D208F856 89F64689 06571826 04472826 085EC406 57882604 4788260C .&.G.&.W.á^.&+G.&.W..F-.V½.@).%A 0001E0
```

Dump of file SATURN:[PCCOMMON.DUMP.DLL]BRDPLOW.TMP;1 on 18-APR-1990 10:38:06.00
File ID (528,44,0) End of file block 272 / Allocated 272

Virtual block number 191 (000000BF), 512 (0200) bytes

```
F7FC5688 FA46880F 7D00FC7E 83F45689 F24689F8 5688F646 8806E8DA F7000283 .@.%ÒŠ..F-.V½.F·.V¶.-•.)..F°.V•% 000000
057D00FC 7E831376 F2463805 7F1A7CF4 5638FC56 88FA4688 06E8DAF7 00028308 Ä.@.%ÒŠ..F°.V•;V¶|...;F·v..-•.). 000020
4688FE46 890002B8 03E80001 B8057D00 F87E8311 EBFE4689 00088803 E80004B8 |..Š.|...F±Š..-½.).|..Š.|...F±.F 000040
01B803EB 00028805 75013C03 2406468A 11E8C028 04750306 46F65274 FE463906 .9F±tR-F..u.+âŠ..F.$.<.u.|..Š.|. 000060
8803E800 08880575 043C0C24 06468A11 E8C02804 750C0646 F6F24689 00032500 .%...F·-F..u.+âŠ..F.$.<.u.|..Š.| 000080
46880F7D 00F87E83 72E80789 26FE4688 105EC408 74FE4638 F2460800 0C250004 ..%...F·;F±t.á^..F±&..Šr.-½.)..F 0000A0
880F7D00 FC7E83F4 5689F246 89F85688 F6468806 E8DAF700 D28308F7 F85688F6 -.V½Ä.@.%ÒŠ..F-.V½.F·.V¶.-•.).. 0000C0
1676F246 38057F1D 7CF45638 FC5688FA 468806E8 DAF700D2 8308F7FC 5688FA46 F°.V•%Ä.@.%ÒŠ..F°.V•;V¶|...;F·v. 0000E0
E80004B8 057D00FC 7E8314EB 07892610 5EC40002 8803E800 01880570 00F87E83 .-½.).|..Š.|..á^.&..Š..-•.).|..Š 000100
46080646 88D88E04 90881E00 000CC8C8 C91F00E8 C0280789 26105EC4 00088803 .|..á^.&..+âŠ..èüà....|...Ä.F..F 000120
26072826 0A578826 08478826 065EC400 9CE980F3 8806750C 46080A46 88087408 .t..F..F.u.|µ.Ö..á^.&.G.&.W.&+.& 000140
08FA5689 F8468906 57182604 4728260E 5788260C 478826FE 5689FC46 89025718 .W..F•.V±&.G.&.W.&+G.&.W..F½.V°. 000160
46880F7D 00FE7E83 F65689F4 4689FA56 88F84688 06E8DAF7 00028308 F7097D02 @).%Ä.@.%ÒŠ..F½.V°.F¶.V-.-±.)..F 000180
831676F4 4638057F 1D7CF656 38FE5688 FC468806 E8DAF700 D28308F7 FE5688FC •.V±%Ä.@.%ÒŠ..F•.V±;V-|...;F¶v.. 0001A0
03E80001 B8057D00 FA7E8314 E8078926 0A5EC400 088803E8 00048805 7D00FE7E -±.).|..Š.|..á^.&..Š..-°.).|..Š. 0001C0
0004035A 02030088 00010396 0103000A C8C91F00 E8C02807 89260A5E C4000288 |..á^.&..+âŠ..èù............Z... 0001E0
```

Dump of file SATURN:[PCCOMMON.DUMP.DLL]BRDPLOW.TMP;1 on 18-APR-1990 10:38:06.00
File ID (528,44,0) End of file block 272 / Allocated 272

Virtual block number 192 (000000C0), 512 (0200) bytes

```
001203A9 00020000 0011021D 00020098 000400D0 02030000 000903EA 0002007D )...õ........Ä.................. 000000
00190607 0002008D 00040154 02030000 001403B7 000200AB 000400A6 02030000 ....Ï.......ñ.......T...§........ 000020
000A7E83 088EFFFF 881E5657 000004C8 00000000 00000000 00000000 00000000 .................à...WV.|...Ä.-.. 000040
0000FFFF 9A5016FC 468D126A 056A0A76 FF42E88E 15880575 08460806 46880874 t..F..F.u.|..ŠB.v.j.j..F•.P..... 000060
065EC404 4789260A 4688A5F2 0009890A DCBEF888 FC5EC428 E88E1488 0574C008 .ât.|..Š(á^•.«/Ê.¿..·Ê.F.&.G.á^. 000080
0008881E 00000EC8 0006CAC9 5F5E1F00 E8C02802 57892607 8926FE56 88FC4688 .F•.V±&..&.W.+âŠ..^_èò..à....|.. 0000A0
46890447 8826FA5E C464E88E 15880575 C208FC56 89FA4689 08568806 4688D88E .Ä.F..V..F°.V•.õu.|..Šdá^*&.G..F 0000C0
88260847 8826F25E C42974F4 4608F246 88F45689 F2468908 57882606 478826FE ±&.G.&.W..F·.V¶.F·.F¶t)á^·&.G.&. 0000E0
CFE8F456 89F24689 F85688F6 46880000 000A9A53 06FE76FF F85689F6 46890A57 W..F-.V½.v±.S.Ö....F-.V½.F·.V¶Šü 000100
0004CAC9 1F00E8C0 2804E88E 14880574 C0080000 FFFF9AFA 76FFFC76 FFFE76FF .v±.v•.v°......ât.|..Š.+âŠ..èò.. 000120
08460806 46880874 C208FE56 89FC4689 0C56880A 4688D88E 006E881E 000004C8 à....|n..Ä.F..V..F•.V±.ôt..F..F. 000140
8826FC5E C418E88E 15880789 26024789 26C02806 5EC40C74 08460806 46881975 u..F..F.t.á^.+â&.G.&..|..Š.á^=&. 000160
881E5657 000004C8 0008CAC9 1F00E8C0 28025789 26078926 065EC402 57882607 .&.W.á^.&..&.W.+âŠ..èò..à...WV.| 000180
002C9A50 16FC468D 0C6A056A 0676FF47 E88E1588 05750A46 08084688 D88E00F6 -..Ä.F..F.u.|..ŠG.v.j.j..F•.P.,. 0001A0
890AD08E F888FC5E C421E88E 14880789 26024789 26C02808 5EC41174 C0080000 ...ât.á^.+â&.G.&..|..Š|á^•.«/Ä.¿ 0001C0
0008C8C8 C95F5E1F 00E8C028 02578926 078926FE 5688FC46 88085EC4 A5F20006 ..·Êá^..F•.V±&..&.W.+âŠ..^_èüà.. 0001E0
```

```
Dump of file SATURN:[PCCOMMON.DUMP.DLL]BRDPLOW.TMP;1 on 18-APR-1990 10:38:06.00
File ID (528,44,0)   End of file block 272 / Allocated 272

Virtual block number 193 (000000C1), 512 (0200) bytes

 20025788 26078826 065EC400 05E98E15 88067508 46080646 88088E01 50881E00 ..¡P..Ä.F..F.u.¡..Õf.á^.&..&.W.- 000000
 0A463805 7F497C0C 5638FFFF 00609A50 52026A00 6AFE5689 FC468900 DA830001 ...Õ..F=.V±j.j.RP.`...;V.|I..;F. 000020
 0A578826 08478E26 F85EC411 E8FA5689 F8468908 57882606 47882606 5EC44272 rBá^.&.G.&.W..F½.V¹Š.á^½&.G.&.W. 000040
 0274D008 000C5E83 010A6E83 0C56880A 46881474 FA4608F8 4688FA56 89F84689 .F½.V¹.F½.F¹t..F..V..n...^...Ät. 000060
 5788260A 47882606 5EC40C56 890A4689 0C56180A 4628FE56 88FC4688 52E8D3E8 ŠÆŠR.F=.V±+F..V..F..V.á^.&.G.&.W 000080
 FA4608F8 4688FA56 89F84689 06578826 04478826 F85EC411 E8FA5689 F846890C ..F½.V¹Š.á^½&.G.&.W..F½.V¹.F½.F¹ 0000A0
 26FA5688 F846880E 5EC4D3E8 0274D008 000C5E83 010A6E83 0C56880A 46881474 t..F..V..n...^...Ät.ŠÆá^..F½.V¹& 0000C0
 F4468914 56881246 88088E01 83881E00 0014C8C8 C91F00E8 C0280257 89260789 ..&.W.+äŠ..èùà....¡ª..Ä.F..V..F¶ 0000E0
 26078826 F45EC402 40E98E15 88067E01 0C7E8306 7C000C7E 830C74C2 08F65689 .V-.õt..~..|..~..~.¡..ÕM.á^¶&..& 000100
 25E98E15 8806760E 4639057F 007C1056 390C7C00 107E83FE 5689FC46 89025788 .W..F=.V±.~..|.9V.|...9F.v.¡..Õ% 000120
 08578826 06478826 F45EC447 7400FC7E 83067F4F 7C00FE7E 83557400 0A7E8302 ..~..tU.~±.|O...~=.tGá^¶&.G.&.W. 000140
 74EE4608 EC4688EE 5689EC46 890A5788 26084788 26EC5EC4 11E8EE56 89EC4689 .F§.VŸŠ.á^§&.G.&.W..F§.VŸ.F§.FŸt 000160
 00FE7E83 CCE801CC E9C02805 75025739 26087507 39260856 8806468B EC5EC418 .á^&.F..V.&9.u.&9W.u.+äÕä.Šä.~±. 000180
 74C00806 C483FDDE E80E0477 FF26F45E C45016EC 46805C73 01FC7E83 067C647F .d|..-=.s\.F§.Pá^¶&.w..Õ8».á..ät 0001A0
 26064789 26F45EC4 0C578926 0A478926 EE5688EC 4688F45E C4019FE9 8E148806 .¡..Õ..á^¶.F§.VŸ&.G.&.W.á^¶&.G.& 0001C0
 57892607 89260856 8806468B EC5EC400 000247C7 26000107 C726F45E C4085789 .W.á^¶&ú...&úG...á^§.F..V.&..&.W 0001E0

Dump of file SATURN:[PCCOMMON.DUMP.DLL]BRDPLOW.TMP;1 on 18-APR-1990 10:38:06.00
File ID (528,44,0)   End of file block 272 / Allocated 272

Virtual block number 194 (000000C2), 512 (0200) bytes

 8E148806 74C00806 C483FD82 E80E0477 FF26F45E C45016F8 46800160 E9C02802 .+äÕ'..F½.Pá^¶&.w..Õ.».á..ät.¡.. 000000
 E8105688 0E468808 75000C7E 83025789 26078926 08568806 4688F85E C40143E9 ÕC.á^½.F..V.&..&.W..~..u..F..V.Š 000020
 88260647 8826F45E C44175C2 08F25689 F0468910 56180E46 28FE5688 FC46880C ..F=.V±+F..V..FÞ.V .õuAá^¶&.G.&. 000040
 04478926 FA5688F8 4688EC5E C40A5789 26084789 26F85EC4 EE5689EC 46890857 W..F§.VŸá^½&.G.&.W.á^§.F½.V¹&.G. 000060
 4639FE56 88FC4688 008EE908 57892606 478926FA 5688F846 88F45EC4 06578926 &.W.á^¶.F½.V¹&.G.&.W.Õf..F=.V±9F 000080
 04478926 F85EC4E  5689EC46 890C5788 260A4788 26F45EC4 4075F256 394575F0 ÞuE9V·uØá^¶&.G.&.W..F§.VŸá^½&.G. 0000A0
 8926FA56 88F8468B F45EC40A 57892608 478926FA 5688F846 88EC5EC4 06578926 &.W.á^§.F½.V¹&.G.&.W.á^¶.F½.V¹&. 0000C0
 0CC483FD 00E80EF4 76FFF676 FFF076FF F276FF50 16EC4680 6EE80C57 89260A47 G.&.W.Šn.F§.P.v·.vÞ.v─.v¶.Õ.».á. 0000E0
 C4065789 26044789 26F85EC4 06578826 04478826 EC5EC450 E88E1388 0574C008 .ät.¡..Š]á^§&.G.&.W.á^½&.G.&.W.á 000100
 478926FA 5688F846 88045FC4 26EC5EC4 0A578926 08478926 EE5688EC 4688F85E ^½.F§.VŸ&.G.&.W.á^§&á_..F½.V¹&.G 000120
 57832601 078326F4 5EC40657 89260447 8926FA56 88F84688 EC5EC40A 57892608 .&.W.á^§.F½.V¹&.G.&.W.á^¶&...&.W 000140
 5689FC46 890E5688 0C468808 8E02A388 1E000004 C80010CA C91F00E8 C0280002 ..+äŠ..èò..à....¡È..Ä.F..V..F=.V 000160
 006A006A 0C76FF0E 76FF18E8 8E158805 7E010A7E 83067C00 0A7E830C 74C208FE ±.õt..─..|..─..─.¡..Š..v..v.j.j. 000180
 088E0521 881E0000 06C8000A CAC91F00 E8FD3EE8 0E0676FF 0876FF00 6A0A76FF .v.j..v..v..Õ>»Š..èò..à....¡!..Ä 0001A0
 E88E1588 057E010A 7E83067C 000A7E83 0C74C208 FE5689FC 46890E56 880C4688 .F..V..F=.V±.õt..─..|..─..─.¡..Š 0001C0
 0288E80E 0676FF08 76FF0A76 FF006A00 6A0C76FF 0E76FF20 74084608 0646883A :.F..F.t .v..v.j.j..v..v..v..ÕE. 0001E0

Dump of file SATURN:[PCCOMMON.DUMP.DLL]BRDPLOW.TMP;1 on 18-APR-1990 10:38:06.00
File ID (528,44,0)   End of file block 272 / Allocated 272

Virtual block number 195 (000000C3), 512 (0200) bytes

 000ACAC9 1F00E800 07E80E01 6A006A00 6A0C76FF 0E76FF12 E80274C0 08FA4689 .F¹.ät.Š..v..v.j.j.j..Õ..Š..èò.. 000000
 7F8326FC 5EC43074 :208FE56 89FC4689 0E56880C 4688D88E 056C881E 00000CC8 à....¡l..Ä.F..V..F=.V±.õt=á^=&.. 000020
 38000A83 00012002 57882607 8826257C 000A7E83 2872013F 8326067F 337C0002 ..|3..&.?.r+.-..|X&..&.W.-...Õ.; 000040
 FC5EC401 92E98E15 88067E01 067E8306 7C00067E 830C7208 4638057F 137C0A56 V.|...;F.r..-..|..-..-.¡..Õ..á^= 000060
 260477FF 260174E9 8E158806 740A4608 0846884E 7500027F 83265575 013F8326 &.?.uU&....uN.F..F.t.¡..Õt.&.w.& 000080
 26084789 26C028FC 5EC40159 E98E1488 0674C008 000007A2 9A0677FF 260877FF .w.&.w..Å....ät.¡..ÕY.á^=+ä&.G.& 0000A0
 7500067E 830134E9 07892602 478926FC 5EC40A47 89260C47 8926FC5E C4064789 .G.á^=&.G.&.G.á^=&.G.&..Õ4..-..u 0000C0
 89000A83 0001200A 56180846 28025788 26078826 FC5EC416 E80A5688 08468808 ..F..V.Š.á^=&..&.W.+F..V.-...Õ.. 0000E0
 478826F4 5EC4F656 89F44689 08578826 06478826 FC5EC438 75C208FA 5689F846 F½.V¹.õu;á^=&.G.&.W..F¶.V-á^¶&.G 000100
 47892606 478926C0 28065FC4 26FC5EC4 08578926 06478926 FC5EC40A 57882608 .&.W.á^=&.G.&.W.á^=&á .+ä&.G.&.G 000120
 88263775 FA5638 3C 75F84638 000A8300 01200257 88260788 26FC5EC4 00A0E904 .Õ..á^=&..&.W.-...Õ.;F½u<;V¹u7&. 000140
 89260A47 8926FC5E C4065788 26044788 26F45EC4 F65689F4 46890C57 88260A47 G.&.W..F¶.V-á^¶&.G.&.W.á^=&.G.&. 000160
 F876FFFA 76FF5016 F44680 4F E8084789 260A4789 26C0280A 5FC426FC 5EC40C57 W.á^=&á .+ä&.G.&.G.ŠO.F¶.P.v¹.v½ 000180
 57882608 478826F4 5EC459E8 8E138805 74C0080C C483FA53 E80EFC76 FFFE76FF .v±.v=.ÕS¹.á..ät.¡..ŠYá^¶&.G.&.W 0001A0
 04478926 085FC426 06578826 04478826 F45EC40A 57892608 47892604 5FC4260A .&á_.&.G.&.W.á^¶&.G.&.W.&á_.&.G. 0001C0
 C410E88E 14880574 C0080000 008E9AF4 76FFF676 FF0477FF 26FC5EC4 06578926 &.W.á^=&.w..v─.v¶./....ät.¡..Š.á 0001E0
```

```
Dump of file SATURN:[PCCOMMON.DUMP.DLL]BRDPLOW.TMP;1 on 18-APR-1990 10:38:06.00
File ID (528,44,0)   End of file block 272 / Allocated 272

Virtual block numb.  196 (000000C4), 512 (0200) bytes

4688D08E 05D6881E 000008C8 000ACAC9 1F00E8C0 2800025F 8326012F 8326FC5E ^=&./.&....+åS..èò..à....|#..Ä.F 000000
01200257 8826078J 26FC5EC4 287C000E 7E832E74 C208FE56 89FC4689 12568810 ..V..F=.Vz.ôt..~..|(á^=&..&.W.-. 000020
E88E1588 057E010A 7E83067C 000A7E83 0C720C46 38057F13 7C0E5638 000A8300 ..Ö.;V.|...;F.r..~..|..~..~.|..$ 000040
46280257 88260788 26FC5EC4 16E80E56 880C4688 0875000A 7E835016 F8468055 U.F%.P.~..u..F..V.$.á^=&..&.W.+F 000060
8E138805 74C0080C C483F967 E80EFC76 FFFE76FF 5052000A 83000120 0E56180C ..V.~...Ö.RP.vz.v=.Òg*.á..ât.|.. 000080
1E000008 C8000ECA C91F00E8 C0280257 89260789 26085688 064688F8 5EC414E8 $.á^%.F..V.&..&.W.+åS..èò..à.... 0000A0
8826FC5E C4307C00 0E7E8336 74C208FE 5689FC46 89125688 10468808 8E07CA88 |ò..Ä.F..V..F=.Vz.ôtó.~..|0á^=&. 0000C0
0A7E830E 7C000A7E 8314720C 4638057F 187C0E56 3800DA83 00012002 57882607 .&.W.~...Ö.;V.|...;F.r..~..|..~. 0000E0
56880C46 88087500 0A7E8350 16F84680 59E88E15 88057508 46080646 88087F01 ....F..F.u.|..$Y.F%.P.~..u..F..V 000100
76FFFE76 FF505200 0A830001 200E5618 0C462802 57882607 8826FC5E C416E80E .$.á^=&..&.W.+F..V.~...Ö.RP.vz.v 000120
8926065E C4025788 26078826 F85EC418 E88E1388 0574C008 0CC483F8 88E80EFC =.Ò|%.á..ât.|..$.á^%&..&.W.á^.&. 000140
46891056 880E4688 088E0871 881E0000 0CC8000E CAC91F00 E8C02802 57892607 .&.W.+åS..èò..à....|q..Ä.F..V..F 000160
F85EC4FC 4689FE46 89C02878 E88E1588 05750846 08064688 0874C208 FA5689F8 %.V*.ôt.:F..F.u.|..$x+à.Fz.F=á^% 000180
5689F446 890A5788 ?6084788 26F45EC4 19E8F656 89F44689 08578826 06478826 &.G.&.W..F¶.V-$.á^¶&.G.&.W..F¶.V 0001A0
261A7507 39260C56 880A4688 F45EC42A 74F64608 F4468800 FE568301 FC4683F6 -.F=..Vz..F¶.F-t*á^¶.F..V.&9.u.& 0001C0
C726065E C485E814 E^C02802 57892607 8926FE56 88FC4688 065EC414 75025739 9W.u.á^..F=.Vz&..&.W.+åS.$çá^.&ú 0001E0

Dump of file SATURN:[PCCOMMON.DUMP.DLL]BRDPLOW.TMP;1 on 18-APR-1990 10:38:06.00
File ID (528,44,0)   End of file block 272 / Allocated 272

Virtual block number 197 (000000C5), 512 (0200) bytes

880A4688 D88E0924 881E0000 08C8000C CAC91F00 E8C028FF FF0247C7 26FFFF07 ...&úG...+åS..èò..à....|$..Ä.F.. 000000
167F0257 39260856 88064688 FC5EC472 E88E1588 0575C208 FE5689FC 46890C56 V..F=.Vz.òu.|..$rá^=.F..V.&9W... 000020
57882606 478826FC 5EC44DEB 8E15880E 47892610 478926C0 280F7707 3926057C |.&9.w.+å&.G.&.G.|..$Mâ^=&.G.&.W 000040
08568806 4688FA56 89F84689 0A578826 08478826 F85EC411 E8FA5689 F8468908 ..F%.V*$.á^¥&.G.&.W..F%.V*.F..V. 000060
28105789 260E4789 26FA5688 F84688FC 5EC408E8 02740008 00085E83 01066E83 .n...^...Ät.$Uá^=.F%.V*&.G.&.W.+ 000080
C208FE56 89FC4689 0C56880A 4688088E 09C8881E 000008C8 0008CAC9 1F00E8C0 å$..èò..à....|à..Ä.F..V..F=.Vz.ô 0000A0
FA5689F8 46891057 88260E47 8826FC5E C454E88E 15880575 08460806 46880874 t..F..F.u.|..$Tá^=&.G.&.W..F%.V* 0000C0
C4025788 26078826 F85EC42E E88E1688 07892602 478926C0 28065EC4 11750008 .Äu.á^.+å&.G.&..|..$.á^¥&..&.W.á 0000E0
28105789 260E4789 26FC5EC4 0A578826 08478826 F85EC402 57892607 8926065E ^.&..&.W.á^¥&.G.&.W.á^=&.G.&.W.+ 000100
00001701 E4000200 22000306 58020300 14000301 6E020300 0408CAC9 1F00E8C0 å$..èò.....n.......X...*...ô.... 000120
0676FF08 76FFD88E FFFF881E 000038C8 00000000 00000000 0000190A 5E000200 ...^............à8...|...Ä.v..v. 000140
88E84688 00F25683 01F04683 08E8F046 89F24689 C028005A 00F09A50 16E84680 .FÒ.P.Þ.Z.+à.F..FÞ$..FÞ..V..FÒ. 000160
F076FFF2 76FF0676 FF0876FF 016CE903 72F04639 087C0176 E9037EF2 5639EA56 Vä9V.~.Òv.|.9FÞr.Òl..v..v..v..vÞ 000180
5EC40656 89044689 02568900 4689FA56 88F84688 00800868 9A5016F8 4680006A j..F%.P.k....F%.V*.FÄ.V0.Fà.Vmá^ 0001A0
FF26045E C40A76FF 0C76FF01 6AFE5689 FC46890A 57882608 47882602 5FC42604 &&&_.&.G.&.W..F=.Vzj..v..v.á^&&. 0001C0
00F09A50 16084680 4277FF26 4477FF26 D45EC40A C483FF66 E80E3E77 FF264077 w@&.w>.Òf..á.á^&&.wÒ&.w8.FÄ.P.Þ. 0001E0

Dump of file SATURN:[PCCOMMON.DUMP.DLL]BRDPLOW.TMP;1 on 18-APR-1990 10:38:06.00
File ID (528,44,0)   End of file block 272 / Allocated 272

Virtual block number 198 (000000C6), 512 (0200) bytes

E9037EDE 56390A56 88084688 000E5683 01DC4683 08E8DC46 890E4689 C02^^0F7 %.+à.F8.FE$..FE..V8..FÄ.VÖ9V8~.Ö 000000
80006ADC 76FFDE76 FF4277FF 264477FF 26045EC4 0001E903 720C4639 087CL ^8 Ü.|.9FEr.Ö1.á^&&.wÒ&.w8.v8.vEj.. 000020
4877FF26 4A77FF26 CC5EC4CE 5689CC46 89E65688 E4468801 1808689A 5016E4 6 FÖ.P.k....FÖ.V|.Fä.Vöá^&&.wJ&.wH 000040
88E04688 00EE5683 01EC4683 08E8EC46 89EE4689 C0280159 00F09A50 16E0468D .FÄ.P.Þ.Y.+à.FŸ.F$$..F&..VŸ..FÄ. 000060
6AEC76FF EE76FF48 77FF264A 77FF26CC 5EC46C73 EC463905 7C737FEE 5639E256 Vä9VŸ.s|.9F&slá^&&.wJ&.wH.vŸ.v&j 000080
46890257 88260788 2680E802 7400067F 8326F45E C4FFFF08 689A5016 F4468000 ..F¶.P.k...á^¶&....t.$$&..&.W..F 0000A0
FFFC76FF FE76FF1E 750C5739 2624750A 473926E6 5688E446 88C85EC4 CA5689C8 à.Vòá^à.FÖ.V|&9G.u&&9W.u..vz.v=. 0000C0
FE74E9FF 0FE9FF7A E912C483 000FE80E 0676FF08 76FF5306 0A76FF0C 76FF0E76 v..v..v..S.v..v..Ö...á.Öz.Ö..Ötz 0000E0
0C56890A 46890857 88260647 88260A5E C4D88E00 06881E56 5700003E C8C8C91F .èüà>..WV.|...Äá^.&.G.&.W..FÖ.VE 000100
468800FE 568301FC 468308E8 FC4689FE 4689C028 0000FFFF 9A5016E6 46805052 RP.F|.P.....+à.Fz.F=$..F=..Vz..F 000120
FFDC76FF 0118E903 77FC4638 087F0125 E9037DFE 5638000A 83000120 E85688E6 |.VÖ-...Ö.;Vz).ÖX...;Few.Ö...vE. 000140
FE5688FC 4688DA76 FFDC76FF 00000240 9A50160E 4680006A FC76FFFE 76FFDA76 vÖ.vz.v=j..F8.P.ä....vE.vÖ.F=.Vz 000160
391A750E 46390456 88024688 0000FFFF 9A501602 4680006A 50520002 83000105 ....0.RPj..F0.P......F0.VÄ9F8u.9 000180
39045688 02468831 E8FF7FE9 0575E456 390A75E2 46390856 88064688 1575E056 VÄu..F=.VA9Fäu.9VÖu.Ö..$1.F0.VÄ9 0001A0
0775E456 390C75E2 46390856 88064688 1AE80000 FA46C707 75E05639 0C75DE46 F8u.9VÄu.úF*..$..F=.VÄ9Fäu.9VÖu. 0001C0
88CA4680 1FA5A5A5 A51F161E 0716DE76 80F888C2 4680FF4C E903E800 01FA46C7 úF*..$.ÖL..Fò.%.v8.....EEEE..Fò. 0001E0
```

Dump of file SATURN:[PCCOMMON.DUMP.DLL]BRDPLOW.TMP;1 on 18-APR-1990 10:38:06.00
File ID (528,44,0)   End of file block 272 / Allocated 272

Virtual block number 199 (000000C7), 512 (0200) bytes

```
76FF1276 FF1FA5F2 0008B91F 161EC276 8DEA7E8D 1FA5A5A5 A51F161E D2768DF8 %.v●...EEEE..-õ.vô...¿..`É..v..v 000000
E80E0676 FF0876FF 6A76FF0C 76FF5016 C2468DFC 76FFFE76 FFFA76FF 0E76FF10 ..v..v'.v±.v=.Fô.P.v..v..v..v..Ò 000020
16EA4680 FC76FFFE 76FFFA76 FF0E76FF 1076FF00 6A297400 127E8318 C483003A :..á..-..t)j..v..v..v'.v±.v=.Fõ. 000040
000034C8 CBC95F5E 1FFEBFE9 18C48300 08E80E14 76FF1676 FF0A76FF 0C76FF50 P.v..v..v..v..Ò...á.Ö«±.^ èùà4.. 000060
08EBF446 89F64689 C02B0386 00F09A50 16EC4680 0676FF08 76FFD88E 018B881E .¡£..Ä.v..v..F$.P.Þ...+á.F-.F¶$. 000080
0161E903 72F44639 087C0168 E9037EF6 5639EE56 88EC4688 00F65683 01F44683 .F¶..V-..F$.VŸ9V--.Ök.|.9F¶r.Öa. 0000A0
4689FE56 88FC4688 03AD0868 9A5016FC 468D006A F476FFF6 76FF0676 FF0876FF .v..v..v-.v¶j..F=.P.k.U..F=.V±.F 0000C0
2B03F400 F09A5016 DC468D42 77FF2644 77FF2608 5EC4DA56 89D84689 D6568904 å.V=.FÄ.VÖá^Ä&.wÖ&.wB.FÉ.P.Þ.¶.+ 0000E0
7C00FFE9 037EE256 390E568B DC468800 E2568301 E0468308 EBE04689 E24689C0 å.Fã.FÅŠ..FÅ..Vã..FÉ.VB9Vã-.Ö..| 000100
16E8468D 006AE076 FFE276FF 4277FF26 4477FF26 D85EC400 F5E90372 E0463908 .9FÅr.Ö%.á^Ä&.wÖ&.wB.vã.vÅj..FÖ. 000120
E4468048 77FF264A 77FF2600 5EC40256 89D04689 EA5688E8 46880018 08689A50 P.k....FÖ.Võ.FÅ.VBá^Ä&.wJ&.wH.Fõ 000140
39E6568B E4468800 F2568301 F0468308 EBF04689 F24689C0 2B045C00 F09A5016 .P.Þ.\.+á.F`.FÞŠ..FÞ..V`..Fõ.V|9 000160
FFF276FF 4877FF26 4A77FF26 D05EC400 8AE90372 F0463908 7C0094E9 037EF256 V`-.Ö..|.9FÞr.Ö..á^Ä&.wJ&.wH.v`. 000180
57882607 882687EB 02740006 7F8326F8 5EC40344 08689A50 16F84680 006AF076 vÞj..F%.P.k.D.á^Y&....t.Šñ&..&.W 0001A0
FF1C76FF 3C750C57 39264275 0A473926 EA5688E8 4688CC5E C4CE5689 CC468902 ..Fä.Vöá^a.FÒ.Võ&9G.uB&9W.u<.v.. 0001C0
FF0876FF 0A76FF0C 76FF5306 0E76FF10 76FF1276 FF1476FF 1676FF18 76FF1A76 v..v..v..v..v..v..v..S.v..v..v.. 0001E0
```

Dump of file SATURN:[PCCOMMON.DUMP.DLL]BRDPLOW.TMP;1 on 18-APR-1990 10:38:06.00
File ID (528,44,0)   End of file block 272 / Allocated 272

Virtual block number 200 (000000C8), 512 (0200) bytes

```
7FE9FEE8 E9FF56E9 20C48300 34E80E02 77FF2604 77FF2602 5FC42608 5EC40676 v.á^Ä&á_.&.w.&.w..Ö4..á ÖV.ÖS±Ö. 000000
0E0676FF 0876FF0A 76FF0C76 FF0E76FF 1076FF16 76FF1876 FF1A76FF 1C76FFFE ±.v..v..v..v..v..v..v..v..v..v.. 000020
08578826 06478826 125EC408 8E0332B8 1E565700 0030C8C8 C91F14C4 830894E8 Ò...á..èùàO..WV.¡2..Äá^.&.G.&.W. 000040
01FC4683 08EBFC46 89FE4689 C02B0000 01D89A50 16E84680 50520E56 89DC4689 .FÉ.VBRP.FÒ.P.Á...+á.F±.F=Š..F=. 000060
E90377FC 4638087F 010CE903 7DFE5638 000A8300 012DEA56 88E8468B 00FE5683 .V±..FÒ.Võ-...Ö.;V±).Ö....;F=w.Ö 000080
FE563907 75FC4639 1C56881A 46881275 14563917 75124639 1056880E 46880102 ...F..V.9f.u.9V.u..F..V.9F=u.9V± 0000A0
FFDE76FF 000005A8 9A5016E0 468D006A FC76FFFE 76FFDC76 FFDE76FF 88E80275 u.Š¡.vB.vÉ.v±.v=j..FÅ.P.´....vB. 0000C0
011E7E83 00000220 9A501600 468D006A 50520002 83000105 FE5688FC 4688DC76 vÉ.F=.V±....●.RPj..FÅ.P. ....-.. 0000E0
56880046 880086E9 0374001E 7E831974 E6563905 75E44639 D65688D4 46[illegible]1075 u..Få.V=9Fôu.9V|t..-..t.Ö...FÅ.V 000100
F446801F A5A5A5A5 1F161E07 16E0768D F888EC46 8D7675E2 56397875 E046[illegible]02 ●9FÅu(9Vâuv.F$.%.vÅ.....EEEE..F¶ 000120
1676FF18 76FF5016 EC468D50 16D84680 1E76FF1F A5A5A5A5 1F161ED0 7680F[illegible]88 .%.vÅ...EEEE..v..FÄ.P.F$.P.v..v. 000140
DA76FF1E 76FF2076 FF2276FF 2476FF30 74C00812 C483003F E80E0676 FF0876FF .v..v..Ö?..á..àtO.v$.v".v .v..vÖ 000160
C4830092 E80E0A76 FF0C76FF 1276FF14 76FF5016 EC468DFC 76FFFE76 FFD876FF .vÄ.v±.v=.F$.P.v..v..v..v..Ö...á 000180
8D0E76FF 1076FF0A 76FF0C76 FFD88E05 01881E00 001AC8CB C95F5E1F FED8E91C .ÖÄ±.^ èùà....¡...Ä.v..v..v..v.. 0001A0
8D0676FF 0876FF50 7502E67E 830000FF FF9A5016 EC468D50 16F44680 5016E646 F|.P.F¶.P.F$.P......-Ì.uP.v..v.. 0001C0
26078926 EA5688E8 4688125E C426E816 4688FFFF 02459A50 16E84680 5016FC46 F=.P.FÒ.P.E....F.Š&á^..FÒ.Võ&..& 0001E0
```

Dump of file SATURN:[PCCOMMON.DUMP.DLL]BRDPLOW.TMP;1 on 18-APR-1990 10:38:06.00
File ID (528,44,0)   End of file block 272 / Allocated 272

Virtual block number 201 (000000C9), 512 (0200) bytes

```
000130E8 74C00808 EB0DEB02 57892607 8926FE56 88FC4688 125EC41F EB025789 .W.Š.á^..F=.V±&..&.W.Š.Š..átÒ=.. 000000
000446C7 D88E065F B81E5657 000056C8 CBC91F00 EBC02B04 EB0001B8 00E80174 t1Š.¡..Š.+âŠ..èùàV..WV.¡_..ÁúFå. 000020
9A5016C4 468D5016 FC468D02 77FF2604 77FF2602 5FC4260A 5EC40000 B646C700 .úFÑ..á^.&á .&.w.&.w..F=.P.Fá.P. 000040
02459A50 16C04680 5016F846 8D0277FF 260477FF 26025FC4 260A5EC4 07300126 &.0.á^.&á .Ï.w.&.w..F%.P.Fà.P.E. 000060
147E8324 7501127E 83000005 1E9A5016 F4468006 77FF2608 77FF260A 5EC4069C ..á^.&.w.Ï.w..F¶.P......~..uá.-. 000080
EB0001B6 46C7AC56 89AA4689 D2568900 46890C57 88260A47 88260A5E C41E7500 .u.á^.&.G.&.W..FÅ.V●.F`.V¯úFÑ..$ 0000A0
75033B20 75C13B00 D88301E9 83F65E88 F44E8800 02830002 05145688 1246883C <.F..V.....●..N¶.^-.Ö..Ü.;èu ;&u 0000C0
1A468800 01B646C7 AC5689AA 46890256 89D04689 10578826 0E478826 0A5EC41C .á^.&.G.&.W..FÅ.V●.F`.V¯úFÑ...F. 0000E0
56131646 03065788 26044788 268A5689 B8468902 57882607 88260E5E C401F3E9 Öμ.á^.&..&.W..F¡.Vα&.G.&.W..F..V 000100
1646030E 5788260C 4788260C 5689DA46 890A5788 26084788 268E5689 BC468918 ..F¥.V/&.G.&.W..FÖ.VÉ&.G.&.W..F. 000120
C8468908 57882606 478826AA 5EC4009B E9037500 B67E83E0 5689DE46 89185613 .V..FB.VÅ.-Ñ.u.Ö..á^`&.G.&.W..Fà 000140
01E84683 00E65683 01E44683 08C48309 1817029A C876FF52 5016E446 8DCA5689 .Vò.FÖ.PR.vá......á..FÖ..V|..FÒ. 000160
46805016 DA468D50 16884680 00F25E83 01F06E83 00EE5E83 01EC6E83 00EA5683 .Vö..nś..^Y..nÞ..^`..F¡.P.FÖ.P.F 000180
56390C75 C44639C2 5688C046 88387400 CC7E8300 0009529A 5016CC46 8D5016E4 ö.P.Fa.P.R....~a.t8.Fà.Vò9Fáu.9V 0001A0
098700FC 9A505299 E2468BC4 76FFC676 FF0001E2 46C705EB 0004E246 C70775C6 óu.úFã..Š.úFã...vó.vá.Fã.RP.=... 0001C0
260E5EC4 0108E980 5689AE46 89185688 1646880C EB000104 46C78056 89AE4689 .FÛ.V¯úFå..Š..F..V..FÛ.V¯Ö..á^.& 0001E0
```

```
Dump of file SATURN:[PCCOMMON.DUMP.DLL]BRDPLOW.TMP;1 on 18-APR-1990 10:38:06.00
File ID (528,44,0)   End of file block 272 / Allocated 272

Virtual block number 202 (000000CA), 512 (0200) bytes

 BE56898C 46890657 88260447 88268A56 89884689 18561316 46030257 88260788 ..&.W..F..V..F¡.Vo&.G.&.W..F¥.V/ 000000
 890E4689 0E578826 0C478826 DC56890A 46891856 13164603 0A578826 084[illegible]926 &.G.&.W..F..V..FÖ.VÉ&.G.&.W..F8. 000020
 16E4468D CA5689C8 46890857 88260647 8826AA5E C40098E9 03750086 7E83[illegible]56 VÁ.-8.u.Ö..á^`&.G.&.W..Fà.Vò.F8. 000040
 EC6E8300 EA568301 E8468300 E6568301 E4468308 C483FFFF 17029AC8 76FF52`0 PR.và......á..F8..V]..FÒ..Vð..n8 000060
 16CC468D 5016E446 8050160A 468D5016 88468000 F25E8301 F06E8300 EE5E8301 ..^Y..nÞ..^...F¡.P.FÖ.P.F8.P.Fä. 000080
 04E246C7 0775FE56 390C75FC 4639FA56 88F8468B 387400CC 7E830000 FFFF9A50 P......~ä.t8.F%.V¹9F=u.9V±U.ÚFã. 0000A0
 C7805689 AE4689FF FF00FC9A 505299E2 4688FC76 FFFE76FF 0001E246 C705E800 .$.úFã...v±.v=.Fã.RP.=....FÙ.V¯ú 0000C0
 00013DFE FFE90375 C00811E8 13E88056 89AE4689 18568816 46880CE8 00010446 Fã..$..F..V..FÙ.V¯$.$..äu.Ö.±=.. 0000E0
 1276FF14 76FF0677 FF260877 FF260A5E C4107414 46081246 8800E8FD FEE90375 u.Ö±»$..F..F.t.á^.&.w.&.w..v..v. 000100
 E983F65E 88F44E88 00028300 01051456 88124688 0000FFFF 9A501688 4680006A j..F¡.P......F..V.....Ø..N¶.^-.Ö 000120
 00010514 56881246 880677FF 260877FF 260A5EC4 25740338 0475C138 00088301 ..Ü.;èu.;ÆtXá^.&.w.&.w..F..V.... 000140
 80F8880E 5EC40001 3847C726 0A5EC400 0009089A 50160A46 80006A50 52000283 .Ø.RPj..FÖ.P.Ä...á^.&úG8..á^..«. 000160
 260A4788 260A5EC4 1FA5A5A5 A51F161E 0A768008 7F801FA5 A5A5A51F 161E8876 v¡...EEEE.....vÖ...EEEE.á^.&.G.& 000180
 E80E2076 FF501688 46805306 50521A76 FF845689 82468908 56890646 890C5788 .W..F=.VÁ.Fý.VÇ.v.RP.S.F¡.P.v .Ò 0001A0
 83F65E88 F44E8800 02830001 05145688 12468820 74144608 12468810 C4830202 Ø..á..F..F.t .F..V.....Ø..N¶.^-. 0001C0
 01CE46C7 05E80000 CE46C707 75144608 12468843 75033847 75C13800 08830 1E9 Ö..Ü.;èuG;ÆuC.F..F.u.úFö..$.úFö. 0001E0

Dump of file SATURN:[PCCOMMON.DUMP.DLL]BRDPLOW.TMP;1 on 18-APR-1990 10:38:06.00
File ID (528,44,0)   End of file block 272 / Allocated 272

Virtual block number 203 (000000CB), 512 (0200) bytes

 0C76FFCE 76FF1A76 FF501688 46801C76 FF1E76FF 2076FFAE 76FFB076 FF006A00 .j..v¯.vÛ.v .v..v..F¡.P.v..vö.v. 000000
 FF2076FF AA76FFAC 76FF3074 00047E83 1CC48303 CCE80E06 76FF0876 FF0A76FF .v..v..v..Öä..á..-á.tÖ.v¯.v`.v . 000020
 0E0676FF 0876FF06 77FF2608 77FF26AA 5EC4AE76 FF8076FF 1A76FF1C 76FF1E76 v..v..v..v¯.vÛá^`&.w.&.w..v..v.. 000040
 76FF0E76 FF1076FF 1276FF14 76FF1A76 FF1C76FF 1E76FF20 76FF18C4 830886E8 ÖÑ..á..v .v..v..v..v..v..v..v..v 000060
 8E06E888 1E560000 32C8C8C9 5F5E1F18 C483F7EE E80E0676 FF0876FF 0A76FF0C ..v..v..v..ÖY¼.á..^ èùâ2..V.¡Ö.. 000080
 5EC4D456 89024689 EE5689EC 46890C50 88260A40 8826065E C402E6C1 12768808 Á.v.èl.á^.&.ə.&.P..F&.V¥.F8.Vâá^ 0000A0
 00F09A50 16E8468D 4877FF26 4A77FF26 01C0E903 7F000130 E646890A 47882602 Ø&.G..Fl=....Öä.&.wJ&.wH.FÖ.P.Þ. 0000C0
 E9037EF2 5639EA56 88E84688 00F25683 01F04683 08E8F046 89F24689 C0280807 ■.+á.F .FÞ$..FÞ..V ..FÒ.Vö9V -.Ö 0000E0
 80006AF0 76FFF276 FF4877FF 264A77FF 26025EC4 0184E903 72F04639 087C018E ..|.9FÞr.Ö..á^Ø&.wJ&.wH.V .vÞj.. 000100
 89CE4689 02578826 07882687 E8027400 067F8326 FC5EC404 1508689A 5016FC46 F=.P.k...á^=&....t.$ñ&..&.W..Fö. 000120
 77FF26CE 5EC43875 00127E83 98E80275 00563907 75CE4639 08568806 46880056 VÁ.F..V.9Föu.9VÁu.$..-..uBá^o&.w 000140
 0677FF26 0877FF26 CE5EC400 000C3C9A 5016F446 80006A00 6A006A06 77FF2608 .&.w.j.j.j..F¶.P.<...á^o&.w.&.w. 000160
 0C76FF06 77FF2608 77FF26CE 5EC442E8 00000C58 9A50160E 4680006A 016A006A j.j.j..F8.P.[...$Bá^o&.w.&.w..v. 000180
 0C56880A 46880677 FF260877 FF26CE5E C400000C 809A5016 F4468000 6A0A76FF .v.j..F¶.P.....á^o&.w.&.w..F..V. 0001A0
 E45688E2 468800A5 E9144688 00000588 9A50160E 4680006A 5052000A 83000120 -...Ö.RPj..F8.P......F.ÖE..Fã.VÖ 0001C0
 57882604 4788260E 5EC40856 89064689 E05688DE 46884075 FA563945 75F84639 9F¾uE9V¹uŵ.F8.VÁ.F=.VÁá^.&.G.&.W 0001E0

Dump of file SATURN:[PCCOMMON.DUMP.DLL]BRDPLOW.TMP;1 on 18-APR-1990 10:38:06.00
File ID (528,44,0)   End of file block 272 / Allocated 272

Virtual block number 204 (000000CC), 512 (0200) bytes

 006A0A76 FF0C76FF 0677FF26 0877FF26 CE5EC4DC 56890A46 89E45613 E2460306 ..Fã.VÖ.FÖ.VÉá^o&.w.&.w..v..v.j. 000000
 260E5EC4 3F75F656 394475F4 4639E056 880E4688 61E80000 00279A50 16064680 .F=.P.'...$a.F8.VÁ9F¶uD9V-u?á^.& 000020
 5EC4DC56 890A4689 E45688E2 46880856 89064689 E056130E 46030257 88260788 ..&.W..F8.VÁ.F=.VÁ.Fã.VÖ.FÖ.VÉá^ 000040
 080EE810 E800000A 109A5016 06468000 6A0A76FF 0C76FF06 77FF2608 77FF26CE o&.w.&.w..v..v.j..F=.P.....$.$.. 000060
 7E83088E 0840881E 000028C8 C8C95E1F FE5CE900 E8FF4FE9 03750001 30A974C0 àt`=..u.ÖÖ.$.Ö\±.^èùâ(...¡M..Ä.- 000080
 5EC4E256 89E04689 F65689F4 46890857 88260647 8826105E C4014FE9 03750006 ..u.ÖÖ.á^.&.G.&.W..F¶.V-.FÁ.Vãá^ 0000A0
 E65689E4 46891057 88260E47 88260C5E C4F25689 F0468938 57882636 478826E0 Á&.G6&.W8.FÞ.V á^.&.G.&.W..F8.V] 0000C0
 D85EC4DA 56890846 89EE5689 EC468908 57882606 478826FC 5EC4FE56 89FC4689 .F=.V±á^=&.G.&.W..F$.V¥.FÁ.VÖá^Ä 0000E0
 46880008 E90374F2 563900E0 E90374F0 4639EA56 89E84689 38578826 36478826 &.G6&.W8.FÖ.Vö9FÞt.ÖÁ.9V t.ÖÁ..F 000100
 44732247 3926067C 4C7F2457 3926F05E C4065788 26044788 26085EC4 00C4E914 .Ö6.á^.&.G.&.W.á^Þ&9V$.L|.&9G"sD 000120
 5EC40E60 02459A50 160C4680 5016F846 800277FF 260477FF 26025FC4 26E05EC4 á^Â&á .&.w.&.w..F%.P.FÉ.P.E.m.á^ 000140
 87C726F0 5EC42457 *9262247 8926F05E C4DE5613 0C460306 57882604 47882608 .&.G.Ē.W..FÉ.V8á^Þ&.G"&.W$á^Þ&ú. 000160
 731E4739 26067C48 *205739 26F05EC4 02578826 07882608 5EC470E8 00010096 ....$pá^.&..&.W.á^Þ&9W .K|.&9G.s 000180
 C4071202 459A5016 0C468050 16F8468D 0277FF26 0477FF26 025FC426 E05EC443 Cá^Â&á .&.w.&.w..F%.P.FÉ.P.E...á 0001A0
 87C726F0 5EC42057 89261E47 8926F05E C4FA5613 F8460302 57882607 8826085E ^.&..&¯W..F%.V¹á^Þ&.G.&.W á^Þ&ú. 0001C0
 881E5600 0022C8C8 C91F00E8 FF30E903 75000130 9A74C008 0EE810EB 00010096 ....$.$..ât.=..u.ÖÖ.$..èùâ"..V.¡ 0001E0
```

```
Dump of file SATURN:[PCCOMMON.DUMP.DLL]BRDPLOW.TMP;1 on 18-APR-1990 10:38:06.00
File ID (528,44,0)   End of file block 272 / Allocated 272

Virtual block number 205 (000000CD), 512 (0200) bytes

FA5689F8 46890C50 88260A40 88260A5E C402E6C1 0E768800 00F646C7 D88E004A J..ÄúF-...v.èl.á^.&.a.&.P..F%.V* 000000
E65EC400 CDE91046 88F45689 F2468908 57882606 478826E6 5EC4E856 89E64689 .Fl.Vòá^l&.G.&.W..F·.V¶.F.Õë.á^l 000020
1A473926 E65EC4J6 57882604 47882612 5EC41A75 08467F83 26077404 467F8326 &..F.t.&..F.u.á^.&.G.&.W.á^l&9G. 000040
88261647 8826F056 89EE4689 1E56881C 46883374 00207E83 06751C57 39260C75 u.&9W.u..- .t3.F..V..FŸ.VÞ&.G.&. 000060
01F646C7 E45689E2 46891E56 131C4603 1C578826 1A478826 E056890E 46891857 W..F8.VÁ&.G.&.W..F..V..Fã.VòúF-. 000080
5EC40257 88260788 26125EC4 19750246 7F832607 7401467F 8326E65E C475E800 .Šuá^l&..F.t.&..F.u.á^.&..&.W.á^ 0000A0
26EC5689 EA46891E 56881C46 88337400 207E8306 75185739 260C7516 473926E6 l&9G.u.&9W.u..~ .t3.F..V..Fõ.V§& 0000C0
5689E246 891C5788 261A4788 26E05689 DE46891E 56131C46 03185788 26164788 .G.&.W..F..V..F8.VÁ&.G.&.W..Fã.V 0000E0
82E90375 00F67E83 00E8FF27 E9037500 01309574 C0080EE8 10E80001 F646C7E4 ðúF-..Š.Š..ât.=..u.Õ'.Š..—.u.Õý 000100
F856E80E 0A76FF0C 76FF016A 006A5016 EA4680DE 76FF1076 FF1E7500 0E7E8300 ..~..u..v..v..Fõ.Pj.j..v..v..ÒV« 000120
0E76FF10 76FF0000 07439A50 16FC4680 0677FF26 0877FF26 0A5EC438 E810C483 .á.Š;á^.&.w.&.w..F=.P.C....v..v. 000140
10C483F8 19E80E0A 76FF0C76 FF505200 DA830001 2DFE5688 FC468850 16EA468D .Fõ.P.F=.Vz-...Ó.RP.v..v..Ò.«.á. 000160
88260647 8826E65E C40CC483 FFFF0887 9AE676FF E876FF50 160E4680 006A006A j.j..F8.P.vÒ.vl......á.á^l&.G.&. 000180
1076FF16 76FF1876 FF1A76FF 006A04C4 83FFFF00 009A5052 F45689F2 46890857 W..F·.V¶RP......á.j..v..v..v..v. 0001A0
8E0E8088 1E000018 C8C8C95E 1F12C483 08F3E80E 0676FF08 76FFF276 FFF476FF .v¶.v·.v..v..Òµ..á..^èùà....¡¯.. 0001C0
8301F446 8308E8F4 4689F646 89C02808 9000F09A 5016F046 800676FF 0876FF08 Ä.v..v..FÞ.P.Þ...+á.F-.F¶Š..F¶.. 0001E0

Dump of file SATURN:[PCCOMMON.DUMP.DLL]BRDPLOW.TMP;1 on 18-APR-1990 10:38:06.00
File ID (528,44,0)   End of file block 272 / Allocated 272

Virtual block number 206 (000000CE), 512 (0200) bytes

76FF0876 FF008FE9 0372F446 39087C00 99E9037E F65639F2 5688F046 8800F656 V-..FÞ.V·9V--.Õ..|.9F¶r.Õ...v..v 000000
C4EE5689 EC4689FE 5688FC46 88109F08 689A5016 FC468000 6AF476FF F676FF06 ..v~.v¶j..F=.P.k....F=.Vz.F&.VŸá 000020
46801276 FF1876FF E84689EA 4689C028 EA5689E8 46890C57 88260A47 88260A5E ^.&.G.&.W..FÒ.Võ+á.Fõ.FÒ.v..v..F 000040
FFEA76FF 2874C008 14C48300 38E80EEC 76FFEE76 FF53060E 76FF1076 FF5016F8 %.P.v..v..S.vŸ.v&.Ò8..á..ât+.võ. 000060
0676FF08 76FFEC76 FFEE76FF F876FFFA 76FF1276 FF1476FF 1676FF18 76FFE876 vÒ.v..v..v..v..v*.v%.vŸ.v&.v..v. 000080
8D105688 0E468808 8E1080B8 1E565700 003CC8C8 C91FFF51 E918C483 0575E80E .Òu..á.ÕQ..èùà<..WV.¡...Ä.F..V.. 0000A0
46801FA5 A5A5A50A 8E1EF088 C47E8D00 08051FA5 A5A5A50A 8E1E0716 F088F87E -%.Þ....ÕEEEE.....-á.Þ..ÕEEEE..F 0000C0
89005E05 04578826 02478826 065EC408 C483081F 17029A06 76FF0876 FF5016D2 ®.P.v..v.......á.á^.&.G.&.W..^.. 0000E0
01E44683 10C48302 7EE80E53 06CC76FF 52501602 46805016 E4468DCE 5689CC46 Fa.Vö.FÕ.P.F®.PR.vä.S.Ò~..á..FÒ. 000100
16F8468D 00F25E83 01F06E83 00EE5E83 01EC6E83 00EA5683 01E84683 00E65683 .Vl..FÒ..Võ..n&..^Ÿ..nÞ..^·..F%. 000120
0122E9C0 28057500 D07E8300 0008599A 50160046 8D5016E4 46805016 C4468050 P.Fá.P.FÕ.P.FÅ.P.Y....-Å.u.+àÕ". 000140
FF0103E9 C0280574 C0080AC4 830326E8 0E0A76FF 0C76FF06 76FF0876 FF1876FF .v..v..v..v..v..Ò&..á..ât.+àÕ... 000160
C0280574 C0080EC4 8300F0E8 0E0A76FF 0C76FF0E 76FF1076 FF5016E4 46801676 v..FÕ.P.v..v..v..v..ÒÞ..á..ât.+à 000180
C8468800 82E91646 88F65689 F4468900 56050457 88260247 8826065E C4000FE9 ÕÒ.á^.&.G.&.W..V..F¶.V~.F.Õý..Fà 0001A0
F45EC406 57882604 478826CC 5EC40080 E9C02805 74FE5639 0575FC46 39CA5688 .Vò9F=u.9Vzt.+àÕ¯.á^a&.G.&.W.á^¶ 0001C0
FF265052 99E24688 0001E246 C705E800 04E246C7 07750657 39260075 04473926 &9G.u.&9W.u.úFã..Š.úFã...Fã.RP&. 0001E0

Dump of file SATURN:[PCCOMMON.DUMP.DLL]BRDPLOW.TMP;1 on 18-APR-1990 10:38:06.00
File ID (528,44,0)   End of file block 272 / Allocated 272

Virtual block number 207 (000000CF), 512 (0200) bytes

F84639C6 5688C44u 8866E802 57892607 8926125E C4130F00 FC9A0477 FF260677 w.&.w..=...á^.&..&.W.Šf.Fá.V69F% 000000
5739260D 75073926 F45EC402 57882607 8826CC5E C457E8C0 280474FA 56390575 u.9V*t.+âŠWá^a&..&.W.á^¶&9.u.&9W 000020
8E00FC9A 37FF2602 77FF2650 5299E246 880001E2 46C705E8 0004E246 C7077502 .u.úFã..Š.úFã...Fõ.RP&.w.&.7.=.. 000040
00018800 E8FF42E9 03750001 30A474C0 080EE810 E8025789 26078926 125EC408 .á^.&..&.W.Š.Š..âtÊ=..u.Õ8.Š.¡.. 000060
46FF03E8 0000EE46 C70000E8 46C7D88E 1165881E 5600001C C8C8C95F 5E1F00E8 Š..^_èùà...V.¡e..ÄúFÒ..úFŸ..Š..F 000080
5689E446 890C5088 260A4088 26065EC4 02E6C1EE 768800E5 E9037C02 EE7E83EE Ÿ.-Ÿ¯|.Õl..vŸèl.á^.&.a.&.P..FÕ.V 0000A0
16EA468D 50520036 05E65688 E44688 0A 76FF0C76 FF04C483 104200FE 9A5052E6 lRP.±.8..á..v..v..FÕ.Vl.6.RP.FÕ. 0000C0
3926FE56 88FC4688 0A5EC460 E8124688 0000FFFF 9A5016F0 46805016 F8468050 P.F%.P.FÞ.P......F.Š'á^..F=.V±&9 0000E0
46C70575 06573926 08750447 39260E57 88260C47 88261975 06573926 1F750447 G.u.&9W.u.&.G.&.W.&9G.u.&9W.u.úF 000100
02578826 07882618 75025739 261E7507 3926FA56 88F84688 0A5EC438 E80001E8 Ò..Š;á^..F%.V*&9.u.&9W.u.&..&.W. 000120
00E89774 00013DCC 74C00808 E80DE800 01E846C7 05750A57 39260875 08473926 &9G.u.&9W.u.úFÒ..Š.Š..âtä=..t.Š. 000140
00FFFF9A 5016EC46 8D505200 3605E656 88E44688 0E76FF10 76FF2674 00E87E83 .-Ò.t&.v..v..FÕ.Vl.6.RP.F&.P.... 000160
3E881E56 57000002 C8C8C95E 1F00E8C0 28FF0FE9 07E80001 88057400 EC7E8300 ..-&.t.¡..Š.Õ..+äŠ..^èùà...WV.¡> 000180
03E80000 FE46C71F A5F20008 890A8E1E F088F888 105688 0E 4688125E C4D88E13 ..Äá^..F..V..«.Þ..Õ¿..·Ê.úF±..Š. 0001A0
260082E9 0374FF46 78832606 5EC402E6 C1FE7688 00C8E903 7C04FE7E 83FE46FF .F±.-±.|.Õà..v±èl.á^.&.xF.t.Õý.& 0001C0
4728260A 5EC40657 98260447 88260E5E C4008AE9 FE468800 A8E90374 FF487883 .xH.t.Õ'..F±Õ..á^.&.G.&.W.á^.&+G 0001E0
```

```
Dump of file SATURN:[PCCOMMON.DUMP.DLL]BRDPLOW.TMP;1 on 18-APR-1990 10:38:06.00
File ID (528,44,0)   End of file block 272 / Allocated 272

Virtual block number 208 (00000000), 512 (0200) bytes

0A5EC40E 5788260C 4788260E 5EC47FE8 06578926 04478926 125EC406 57182604 .&.W.6^.&.G.&.W.$.6^.&.G.&.W.6^. 000000
C4025788 26078826 0E5EC45C E80E5789 260C4789 26125EC4 06571326 04470326 &.G.&.W.6^.&.G.&.W.$\6^.&..&.W.6 000020
0A578826 08478826 0E5EC43C E8025789 26078926 125EC402 57182607 28260A5E ^.&+.&.W.6^.&..&.W.$<6^.&.G.&.W. 000040
FF6FE903 75C00818 E81AE80A 57892608 47892612 5EC40257 13260703 260A5EC4 6^.&..&.W.6^.&.G.&.W.$.$..&u.Õo. 000060
4FB81E00 0026C8C8 C95F5E1F FF2CE900 E8C67400 033DA874 00023080 74000130 *..t.=..t¨=..tó$.Õ,..^ èùà&...¡0 000080
DC5689DA 4689EA56 89E84689 0C578826 0A478826 065EC47D 74000E7E 83088E14 ..Ä.~..t}6^.&.G.&.W..FÕ.Vð.FÕ.VÉ 0000A0
35E90001 8806750C 56390875 0A4639EE 5689EC46 89085788 26064788 260A5EC4 6^Õ&.G.&.W..F&.VŸ9F.u.9V.u.¡..Õ5 0000C0
E05688DE 46882974 E04608DE 4688E056 890E4689 38578826 36478826 0A5EC401 .6^.&.G6&.W8.F8.VÅ.F8.FÅt).F8.VÅ 0000E0
5689DE46 89385788 26364788 260E5EC4 0106E900 01880675 0C563908 750A4639 9F.u.9V.u.¡..Õ..6^8&.G6&.W8.F8.V 000100
89105788 260E4788 26EA5689 E846890C 5788260A 47882606 5EC400EC E9CFE8E0 ÅŠùÕ&.6^.&.G.&.W..FÕ.VÕ&.G.&.W.. 000120
DA5EC4FA 5689F846 89E65688 E446880C 56890A46 89EA5688 E84688E6 5689E446 FÕ.V¦.FÕ.Vð.FÕ.VÉ.FÕ.V¦.F%.V*6^Õ 000140
C4FE5689 FC468908 57882606 478826F8 5EC4EE56 89EC4689 08578826 06478826 &.G.&.W..F&.VŸ6^%&.G.&.W..F*.V±6 000160
E80000E2 46C7E056 890E4689 C28CC388 F65689F4 46893857 88263647 8826EC5E ^±&.G6&.W8.F¶.V-.ù.ð.F8.VÁùFã..$ 000180
5689F446 89385788 26364788 26FC5EC4 E056890E 4689FE56 88FC4688 E246FF20  .Fã.F*.V±.F8.VÅ6^*&.G6&.W8.F¶.V 0001A0
F64608F4 4688F656 89F44689 38578826 36478826 F45EC411 E8487002 E27E83F6 -.-ã.)K$.6^¶&.G6&.W8.F¶.V-.F¶.F- 0001C0
00018805 750C5639 0A750A46 39F25689 F0468938 57882636 4788260E 5EC42E74 t.6^8&.G6&.W8.FÞ.V·9F.u.9V.u.¡.. 0001E0

Dump of file SATURN:[PCCOMMON.DUMP.DLL]BRDPLOW.TMP;1 on 18-APR-1990 10:38:06.00
File ID (528,44,0)   End of file block 272 / Allocated 272

Virtual block number 209 (00000001), 512 (0200) bytes

1E565700 002CC8C8 C91F00E8 C0288FE8 89E8E056 890E4689 F25688F0 468814E8 $..FÞ.V·.F8.VÅ$¿$.+à$..èùà,..WV. 000000
26C02804 5EC40656 89044689 006E05FA 5689F846 890C5688 0A468808 8E154F88 ¡O..Ä.F..V..F%.V*.n..FÅ.Vø6^à+à& 000020
26105688 0E4688D4 5EC427E8 12468804 47892606 47892604 5EC40789 26024789 .G.&..6^à&.G.&.G..F.$'6^à.F..V.& 000040
74C00808 E800E802 57892607 89261056 880E4688 D45EC41F E8065789 26044789 .G.&.W.$.6^à.F..V.&..&.W.$.$..àt 000060
F088DC7E 80000605 0C56880A 46880001 009487C7 260A5EC4 00E80074 00013DE8 Õ=..tÅ$.6^.&ú......F..V.....-É.Þ 000080
A5F20008 890A8E1E F088067F 80001605 C3880A5E C41FA5F2 000889DA 8E1E0716 ....Õ¿..·E.6^..ù.......Þ..Õ¿..·E 0000A0
76FF0876 FF1476FF 1676FF08 C483179A 04549AF8 76FFFA76 FF1476FF 1676FF1F ..v..v..v*.v%.T....6..v..v..v..v 0000C0
A5F20008 891F161E ¿C768006 7F8D0A5E C40CC483 119C0E98 9A0A76FF 0C76FF06 ..v..v.......6.6^.....vÉ...¿..·É 0000E0
FF0A76FF 0C76FF0E 76FF1076 FF1276FF 1A76FF1C 76FF1476 FF1676FF 1876FF1F ..v..v..v..v..v..v..v..v..v..v.. 000100
0A76FF0C 76FF1276 FF1476FF 1676FF18 76FF006A 18C48300 E4E80E06 76FF0876 v..v..Õð..å.j..v..v..v..v..v..v. 000120
89FC4689 0A578826 08478826 025FC426 0A5EC412 C4830479 E80E0676 FF0876FF .v..v..Õy..å.6^.&6_.&.G.&.W..F*. 000140
E80E5052 0A76FF0C 76FF1276 FF1476FF 1676FF18 76FF006A 20740018 7E83FE56 V±.-..t j..v..v..v..v..v..v.RP.Õ 000160
F04689F2 4689C028 188200F0 9A5016EC 4680FC76 FFFE76FF 0080E912 C4830441 A..å.Õ...v±.v*.F&.P.Þ...+à.F·.FÞ 000180
FFFE76FF 4C73F046 39057C53 7FF25639 EE5688EC 468800F2 568301F0 468308E8 $..FÞ..V·..F&.VŸ9V·.S|.9FÞsL.v±. 0001A0
DA5689D8 4689F656 88F44688 10E10868 9A5016F4 4680006A F076FFF2 76FFFC76 v*.v·.vÞj..F¶.P.k.Ä..F¶.V-.FÅ.VÕ 0001C0
0E3E77FF 264077FF 26085EC4 0A76FF0C 76FF1276 FF1476FF 1676FF18 76FF006A j..v..v..v..v..v..v.6^Å&.wÕ&.w>. 0001E0

Dump of file SATURN:[PCCOMMON.DUMP.DLL]BRDPLOW.TMP;1 on 18-APR-1990 10:38:06.00
File ID (528,44,0)   End of file block 272 / Allocated 272

Virtual block number 210 (00000002), 512 (0200) bytes

FF264477 FF260A5E C4D88E16 D1881E00 0022C8C8 C95F5E1F 9AE812C4 8303C0E8 Õ6..6.$..^_èùà"...¡1..Ä6^.&.wÕ&. 000000
46880OEE 568301EC 468308E8 EC4689EE 4689C028 192100F0 9A5016E8 46804277 w8.FÕ.P.Þ.Ï.+à.FŸ.F&$..F&..VŸ..F 000020
77FF2644 77FF260A 5EC400E1 E90372EC 4639087C 00E8E903 7EEE5639 EA5688E8 Õ.Vð9VŸ-.Õ$.|.9F&r.ÕÄ.6^.&.wÕ&.w 000040
88E45689 E24689FA 5688F846 88195408 689A5016 F8468000 6AEC76FF EE76FF42 8.vŸ.v&j..F%.P.k.T..F%.V*.Fã.Vð. 000060
16F04680 4877FF26 4A77FF26 E25EC4A5 E80275E4 56390775 E2463916 56881446 F..V.9Fãu.9VÕu.$Eà^ã&.wJ&.wH.FÞ. 000080
5639F256 88F0468B 00F65683 01F44683 08E8F446 89F64689 C0281995 00F09A50 P.Þ...+à.F-.F¶$..F¶..V-..FÞ.V·9V 0000A0
FC468000 6AF476FF F676FF48 77FF264A 77FF26E2 5EC46A73 F4463905 7C717FF6 -.q|.9F¶sjá^ã&.wJ&.wH.v-.v¶j..F* 0000C0
E056890E 46890257 88260788 2680E802 7400067F 8326FC5E C4184608 689A5016 .P.k.F.á^*&....t.$$&..&.W..F8.VÅ 0000E0
76FFDE76 FF52500E 76FF1076 FF1876FF 1A76FF12 76FF1C76 FFE64689 04478826 &.G..F¦.v..v..v..v..v..v.PR.v8.v 000100
56570000 44C8C8C9 1FFEFFE9 FF7CE91A C483000C E80E0676 FF0876FF E276FFE4 Õ.vã.v..v..Õ...å.Õ|.Õ.±.èùàD..WV 000120
F0468012 76FF006A 006A0677 FF260877 FF260E5E C40000E4 46C7D88E 18C3881E .¡û..ÄúFÕ..6^.&.w.&.w.j.j..v..FÞ 000140
829A5016 D4468D12 76FF016A 006A0677 FF260877 FF260E5E C400001A 2F9A5016 .P./...á^.&.w.&.w.j.j..v..Få.P.ý 000160
260A5EC4 E25689E0 46891656 88144688 DC46890E 4689C028 7AE81C46 88000018 ....F.$z+à.F8.FÉ.F..V..FÅ.Vãá^.& 000180
E446C705 74F65639 0575F446 390A5688 08468815 7502467F 83260774 01467F83 ..F.t.&..F.u..FÅ.VÕ9F¶u.9V-t.úFÕ 0001A0
04467F83 260A5EC4 E04489E2 4689C028 DE56890C 46891656 88144688 4CE80001 ..$L.F..V..FÉ.V8+à.Fã.FÅá^.&..F. 0001C0
10E80001 E446C705 74F25639 0575F046 3906568B D4468815 7508467F 83760774 t.&..F.u..Få.Vø9FÞu.9V·t.úFÕ..$. 0001E0
```

Dump of file SATURN:[PCCOMMON.DUMP.DLL]BRDPLOW.TMP;1 on 18-APR-1990 10:38:06.00
File ID (528,44,0)   End of file block 272 / Allocated 272

Virtual block number 211 (000000D3), 512 (0200) bytes

89CC4689 DE5613LL 46030656 88D44688 00E8FF7A E9037500 0130BE74 C0080EE8 Š..ât/=..u.Õz.Š..FÅ.V@.FÉ.V8.Fä. 000000
8D0677FF 260877FF 260E5EC4 D25689D0 4689E256 13E04603 DA5688D8 4688CE56 Vö.FÅ.VÖ.FÅ.Vä.FÅ.V@á^.&.w.&.w.. 000020
C726E800 00FE46C7 0001FC46 C70000E6 46C72CE8 12468800 0010069A 5016F846 F%.P......F.Š,úF|..úF=..úF±..Š&ú 000040
013DD074 C0080BE8 00E8FE56 89FC4689 000A8300 032DFA56 88F84688 0001E646 F|...F%.V*-...Ö..F=.V±Š.Š..âtÅ=. 000060
76FF1E76 FF1476FF 1676FF01 6A327703 F87E8306 7C3A7F00 FA7E8300 E8DC7400 .tÉŠ..-*..:|..-%.w2j..v..v..v..v 000080
83F33AE8 DE0676FF 0876FF0E 76FF1076 FFE676FF 1C76FF50 16CC468D 1876FF1A ..v..Fä.P.v..v|.v..v..v..v..Ö:µ. 0000A0
0018E69A 5016CC46 8D1276FF 016A006A 0677FF26 0877FF26 0E5EC400 F9E91CC4 á.Ö*.á^.&.w.&.w.j.j..v..Fä.P.|.. 0000C0
16E8468D 1276FF02 6A006A06 77FF2608 77FF260E 5EC40004 E9037500 E47E8300 ..-ð.u.Öå.á^.&.w.&.w.j.j..v..FÒ. 0000E0
5EC4EE56 11EC4601 E25688E0 4688EA56 11E84601 DE5688DC 46880000 0C219A50 P.|....FÉ.V8.FÒ.Vð.FÅ.Vå.F&.VŸá^ 000100
8D4AE812 46880000 0CD69A50 16E8468D 1276FF02 6A006A06 77FF2608 77FF260E .&.w.&.w.j.j..v..FÒ.P.@....F.ŠJ. 000120
A5A5A5A5 1F161EE8 768DF888 C4468D1F A5A5A5A5 1F161E07 16CC768D F8888C46 F¥.%.vä.....ÉÉÉÉ..Fá.%.vÒ...ÉÉÉÉ 000140
1F161ECC 768DF888 C4468D1F A5A5A5A5 1F161E07 16E8768D F8888C46 8D31E81F .Š1.F¥.%.vÒ.....ÉÉÉÉ..Fá.%.vä... 000160
1C76FF18 76FF1A76 FF1E76FF 00E8D174 00013082 74C00808 E800E81F A5A5A5A5 ÉÉÉÉ.Š.Š..âtý=..t|Š..v..v..v..v. 000180
5E1F18C4 83E6C1E8 0E0676FF 0876FF0E 76FF1076 FF50168C 468DFC76 FFFE76FF .v±.v•.F¥.P.v..v..v..v..Öè|.á..^ 0001A0
89C02B1C CD00F09A 5016EC46 8D0676FF 0876FFD8 8E19F288 1E000034 C8CBC95F _èúå4...¡..Ä.v..v..F$.P.Þ.ë.+á. 0001C0
39087C01 6AE9037E F65639EE 5688EC46 8800F656 8301F446 8308E8F4 4689F646 F̄-.F¶$..F¶..V-..F&.VŸ9V--.Öj.|.9 0001E0

Dump of file SATURN:[PCCOMMON.DUMP.DLL]BRDPLOW.TMP;1 on 18-APR-1990 10:38:06.00
File ID (528,44,0)   End of file block 272 / Allocated 272

Virtual block number 212 (000000D4), 512 (0200) bytes

881CF408 689A5016 FC468D00 6AF476FF F676FF06 76FF0876 FF0160E9 0372F446 F¶r.Ö'..v..v..v-.v¶j..F=.P.k.¶.. 000000
16DC468D 4277FF26 4477FF26 085EC4DA 5689D846 89D65689 D44689FE 5688FC46 F=.V±.FÅ.V@.FÄ.VÖá^Ä&.wÕ&.w8.FÉ. 000020
5639DE56 88DC4688 00E25683 01E04683 08E8E046 89E24689 C02B18DA 00F09A50 P.Þ.Ö.+á.Fä.FÅŠ..FÅ..Vä..FÉ.V89V 000040
76FFE276 FF4277FF 264477FF 26085EC4 00F4E903 72E04639 087C00FE E9037EE2 ä-.Ö±.|.9FÅr.Ö¶.á^Ä&.wÕ&.w8.vä.v 000060
4A77FF26 D05EC4D2 5689D046 89EA5688 E8468810 5C08689A 5016E846 80006AE0 Åj..FÒ.P.k.\..FÒ.Vð.FÅ.V@á^Ä&.wJ 000080
00F25683 01F04683 08E8F046 89F24689 C02B10A3 00F09A50 16E4468D 4877FF26 &.wH.Fð.P.Þ.È.+á.F..FÞŠ..FÞ..V.. 0000A0
264A77FF 26005EC4 0089E903 72F04639 087C0093 E9037EF2 5639E656 88E44688 .Fð.V|9V.-.Ö..|.9FÞr.Ö..á^Ä&.wJ& 0000C0
8326F85E C40E7400 167E831C 8808689A 5016F846 80006AF0 76FFF276 FF4877FF .wH.v..vÞj..F%.P.k....-..t.á^%&. 0000E0
89025788 26078826 F85EC4A3 E8027400 067F8326 F85EC40C E881E802 7502067F ...u.ŠÝŠ.á^%&....t.ŠÉá^%&..&.W.. 000100
1476FF16 76FF2475 0C573926 2A750A47 3926EA56 88E84688 CC5EC4CE 5689CC46 Fä.Vöá^ä.FÒ.Vöå9G.u*&9W.u$.v..v. 000120
57E916C4 83000FE8 0E0676FF 0876FF53 060A76FF 0C76FF0E 76FF1076 FF1276FF .v..v..v..v..v..S.v..v..Ö...á.ÖW 000140
88260A5E C400000C 46C7D88E 1C79881E 56570000 34C8C8C9 1FFE80E9 FEECE9FF .Ö±Ö.±.èúå4..WV.¡y..ÄúFÉ..á^.&. 000160
FC4689FE 4689C028 00001AF5 9A5016F6 468D5052 F45689F2 46890857 88260647 G.&.W..F..V¶RP.F-.P.%...+á.F±.F= 000180
087F0138 E9037DFE 5638000A 8300012D F8568BF6 468800FE 568301FC 468308EB Š..F=..V±..F-.V%-...Ö.;V±).Ö8... 0001A0
00001EAC 9A5016EA 468D006A FC76FFFE 76FFF276 FFF476FF 012EE903 77FC4638 ;F=w.Ö...v¶.v..v±.v=j..Fõ.P.¯... 0001C0
00001A13 9A50160E 468D006A 50520002 83000105 FE5688FC 4688F276 FFF476FF .v¶.v..F=.V±....@.RPj..F8.P..... 0001E0

Dump of file SATURN:[PCCOMMON.DUMP.DLL]BRDPLOW.TMP;1 on 18-APR-1990 10:38:06.00
File ID (528,44,0)   End of file block 272 / Allocated 272

Virtual block number 213 (000000D5), 512 (0200) bytes

88E24688 1575EC56 391A75EA 4639E056 880E4688 58740012 7E835E74 01127E83 .~..t^.~..tX.F8.VÅ9Fõu.9V&u..Fä. 000000
75EC5639 0C75EA46 39L05688 DE468831 E8FF73E9 0575F056 390A75EE 4639E456 Vö9FŸu.9VÞu.Ös.Š1.F8.VÅ9Fõu.9V&u 000020
E903E800 01FA46C7 0775F056 390C75EE 4639E456 88E24688 1AE80000 FA·'C707 .úF*..Š..Fä.Vö9FŸu.9VÞu.úF*..Š.Ö 000040
88D4468D 1FA5A5A5 A51F161E 0716EA76 8DF888CC 468DFA46 89124688 06E6 °40 ä.Š..F..F*.Fä.%.vð.....ÉÉÉÉ..FÅ. 000060
8D5016E6 468DFA76 FF1876FF 5016DC46 8D1A76FF 1FA5A5A5 A51F161E DE76&'F8 %.v8...ÉÉÉÉ..v..FÉ.P.v..v*.F|.P. 000080
76FF1876 FF3074C0 081AC483 0047E80E 0E76FF10 76FF0A76 FF0C76FF 5016CC46 Fä.P.v..v..v..v..ÖG..á..ât0.v..v 0000A0
76FF0A76 FF0C76FF 5016CC46 8DFC76FF FE76FFE6 76FFE876 FFFA76FF 1476FF16 ..v..v*.vÖ.v|.v±.v=.Fä.P.v..v..v 0000C0
57000036 C8CBC95F 5E1FFEAC E903E802 7400DC7E 831CC483 E748E80E 0676FF08 ..v..ÖHÖ.á..-É.t.Š.Ö¯±.^ èúåá..W 0000E0
8D000805 1FA5A5A5 A50A8E1E 0716F088 F87E8010 56880E46 88D88E1E 22881E56 V.¡"..Ä.F..V..-%.Þ....ÖÉÉÉ..... 000100
C408C483 17801702 9A0676FF 0876FF50 16084680 1FA5A5A5 A5DA8E1E F088CA7E -ð.Þ..ÖÉÉÉÉ..FÅ.P.v..v.......á.á 000120
76FF5250 16D8468D 5016E846 80D65689 D4468900 5E050457 88260247 8826065E ^.&.G.&.W..^..Få.V@.FÒ.P.FÅ.PR.v 000140
5E8301F0 6E8300EE 568301EC 468300EA 568301E8 468310C4 83F430E8 0E5306D4 á.S.ÖÖ¶.á..FÒ..Vð..F&..VŸ..nÞ..^ 000160
019A5016 D2468D50 16E8468D 5016CA46 8D5016F8 468D00F6 5E8301F4 6E8300F2 ..n¶..^-..F%.P.Fò.P.FÒ.P.F@.P.. 000180
013847C7 260A5EC4 00013647 C7260A5E C41F7400 D27E8325 74001E7E 83000012 ....-..tX.-@.t.á^.&úG6..á^.&úG8. 0001A0
FF0876FF 1876FF00 E7E9C028 05750002 7E8300F2 E9C02800 0107C726 1A5EC400 .á^.&ú...+åÖ..-@.u.+åÖÖ..v..v.. 0001C0
5016E846 801676FF 00C8E9C0 280574C0 080AC483 F4ADE80E 0A76FF0C 76FF0676 v..v..v..ÖÙ¶.á..ât.+åÖå..v..FÒ.P 0001E0

```
Dump of file SATURN:[PCCOMMON.DUMP.DLL]BRDPLOW.TMP;1 on 18-APR-1990 10:38:06.00
File ID (528,44,0)   End of file block 272 / Allocated 272

Virtual block number 214 (000000D6), 512 (0200) bytes

 26065EC4 00A4E9C0 280574C0 080EC483 F277E80E 0A76FF0C 76FF0E76 FF1076FF .v..v..v..v..Ow..&..&t.+&OE.&^.& 000000
 0575FC46 39D0568C CE468878 EB164688 06568904 4689005E 05045788 26024788 .G.&.W..^..F&.V=.F.Sx.Fo.VA9F=u. 000020
 03065718 2604472B 260E5EC4 06578826 04478826 D45EC477 EBC02B04 74FE5639 9V:t.+&Sw&^&&.G.&.W.&^.&+G.&.W.. 000040
 74FA5639 0575F846 39CC5688 CA46884A EB025789 26078926 125EC4E6 5613E446 Fo.V|&^.&..&.W.SJ.Fo.V&9F%u.9V*t 000060
 C4E25613 E0460302 571B2607 2B260E5E C4025788 26078826 045EC438 EBC02B04 .+&S;&^&&..&.W.&^.&+.&.W..FA.V&& 000080
 00EB0001 B800EBFF 7CE90375 000130C0 74C00B0E EB10EB02 57892607 8926125E ^.&..&.W.S.S..&t&=..u.O|.S.|..S. 0000A0
 008A0004 188D0203 00000009 1FEA0002 00000004 13760002 000E90CB C95F5E1F .^ &u.....v.......o............. 0000C0
 01AC0004 204F0203 00A80004 1E440203 00000010 0E0C0002 00000008 105D0002 ..T...............D...."...0 ..". 0000E0
 01BD0004 067F0203 00B00004 1EBC0203 00000017 12B90002 00000014 1D3B0002 ..;.......¿.............§.......$. 000100
 00000000 00000000 01CE0004 139C0203 00000019 1FB30002 003F0004 142D0203 ..-...?...".............o......... 000120
 00F246C7 F05689EE 46890457 8B260247 8826065E C4D88EFF FF881E56 00001EC8 &...V.|...A&^.&.G.&.W..FY.VpuF.. 000140
 0C508826 0A408826 065EC402 E6C1F276 88008AE9 037E01F2 7E83F246 FF03EB00 .S..F.-..-.Oo..v.el.&^.&.a.&.P. 000160
 F09A5016 EA468D50 52FA5689 FB46894A 57882648 47882 6E6 5EC4E856 89E64689 .Fl.Vo&^l&.GH&.WJ.F%.V*RP.Fo.P.p 000180
 667FF656 39EC5688 EA468800 F6568301 F4468308 EBF44689 F64689C0 28009000 ...+a.F-.F¶S..F¶..V-..Fo.V&9V-.f 0001A0
 C4000008 689A5016 FC468000 6AF476FF F676FFF8 76FFFA76 FF5F73F4 4639057C |.9F¶s_.v*.v%.v-.V¶j..F=.P.k.A.& 0001C0
 261E77FF 26EE5EC4 E45689E2 46890257 88260788 26C2EB02 7400067F 8326FC5E ^=&....t.So&..&.W..Fa.Vo&^Y&.w.& 0001E0

Dump of file SATURN:[PCCOMMON.DUMP.DLL]BRDPLOW.TMP;1 on 18-APR-1990 10:38:06.00
File ID (528,44,0)   End of file block 272 / Allocated 272

Virtual block number 215 (000000D7), 512 (0200) bytes

 C726E25E C4000138 47C726E2 5EC4FFFF 02909A50 52016A01 6A006A00 6A1C77FF .w.j.j.j.j.RP.....&^&&UG8..&^&&u 000000
 8B064688 D88E0007 881E5600 001AC8CB C95E1F00 EBC028FF 3AE987EB 00013647 G6..$.O:.+aS..^eu&...V.|...A.F.. 000020
 C70152E9 0A4688FE 5689FC46 89045788 26024788 26F85EC4 FA5689F8 46890856 V..F%.V*&^Y&.G.&.W..F=.V:.F.OR.u 000040
 0C508826 0A408826 F85EC402 E6C1F276 88347F01 F27E83F2 46FF03EB 0000F246 F...S..F.-..4.v.el.&^Y&.a.&.P. 000060
 5289E642 89F65688 F4468802 E6C1F276 880134E9 C02B0575 D00BF656 89F44689 .F¶.V-.Au.+&O4..v.el..F¶.V-.Bl.R 000080
 7F000A7F 8326E65E C40099E9 03750038 7F83260A 7500327F 8326F85E C4C3EBE8 OSu&^Y&..2.u.&..8.u.O..&^l&..... 0000A0
 9AF876FF FA76FF24 7F010C7F 832628 7F 000A7F83 26EA5EC4 357F010C 7F83263C <&.....5&^o&.....+&.....$.v*.v%. 0000C0
 0876FF53 74C00B04 C48301C6 01FD9AF8 76FFFA76 FF1275C0 0804C483 FFFF0233 3....&..&u..v*.v%.».6..&..&tS.v. 0000E0
 E6C1F276 88237F01 F27E83F2 46FF03EB 0000F246 C704C483 FFFF0159 9A0676FF .v..Y....&.uF..S..F.-...#.v.el 000100
 76FFD4EB 04C483FF FF00009A 5052F056 89EE4689 08578826 06478826 E65AC402 .&Z|&.G.&.W..FY.VpRP.......&.S&.v 000120
 26FC5EC4 29740036 7F8326F8 5EC46DEB 73EB0001 B804C483 FDF8E80E F876FFFA *.v%.O%».&.|..SsSm&^Y&..6.t)&^=& 000140
 47C726F8 5EC40268 02909AF8 76FFFA76 FF016A01 6A006A00 6A1C77FF 261E77FF .w.&.w.j.j.j.j..v*.v%...k.&^Y&uG 000160
 016A006A 006A1C77 FF261E77 FF26FC5E C41E7400 387F8326 F85EC428 EB000138 8..S(&^Y&..8.t.&^=&.w.&.w.j.j.j. 000180
 2800E8FE A2E90375 00013090 74C00B0E EB10EB00 6102909A 0676FF08 76FF016A j..v..v....a.S.S..&t.=..u.OA:S.+ 0001A0
 C700B3E9 8DF38806 75084608 06468808 8E00F888 1E000014 C8CBC95E 1F00EBC0 &S..^eu&....|%..A.F..F.u.|&.O*.u 0001C0
 88264C47 8826065E C411EBFE 5689FC46 894A5788 26484788 26065EC4 0002F646 F-..&^.&.GH&.WJ.F=.V:S.&^.&.GL&. 0001E0

Dump of file SATURN:[PCCOMMON.DUMP.DLL]BRDPLOW.TMP;1 on 18-APR-1990 10:38:06.00
File ID (528,44,0)   End of file block 272 / Allocated 272

Virtual block number 216 (000000D8), 512 (0200) bytes

 00F09A50 16EC468D FC76FFFE 76FF7C74 C00BF64E FFF64688 FE5689FC 46894E57 WN.F=.V:.F-.N-.&t|.v:.v=.F&.P.p. 000000
 7C4C7FF4 5639EE56 8BEC4688 00F45683 01F24683 08EBF246 89F44689 C02B031C ..+a.F¶.F.S..F...V¶..F&.VY9V¶.L| 000020
 5EC4023B 08689A50 16F8468D 006AF276 FFF476FF FC76FFFE 76FF4573 F2463905 .9F sE.v:.v=.V¶.v.|..F%.P.k.8.&^ 000040
 06C483FD B4E80E37 FF260277 FF26F076 FFB0E802 75000230 F0468906 478826F8 Y&.G..Fp=..u.S§.vp&.w.&.7.OÇ=.&. 000060
 88D88E02 80B81E00 0030C8C8 C91F00E8 C028FF69 E9A1EB09 EB0001B8 0574C00B .&t.|..S.SAOi.+aS..eu&0...|...A. 000080
 89C02803 B000F09A 5016F046 8D0676FF 0876FF01 5FE98DF3 88067508 46080646 F..F.u.|&.O_..v..v..Fp.P.p.S.+a. 0000A0
 39087C01 28E9037E DA5639F2 5688F046 88000A56 83010846 8308E808 46890A46 FO.FAS..FA..VO..Fp.V.9VO-.O+.|.9 0000C0
 8803E608 689A5016 F8468000 6AD876FF DA76FF06 76FF0876 FF0121E9 03720846 FAr.Ol..v..v..vO.vAj..F%.P.k.|.. 0000E0
 46805052 EE5689EC 46894057 8B263E47 8826E05E C4E25689 E04689FA 5688F846 F%.V*.FA.V&&^A&.G>&.W@.F&.VYRP.F 000100
 FF55E80E EC76FFEE 76FF0074 00FC7E83 067F157C 00FE7E83 041E00F0 9A5016FC =.P.p....-:.|....-=.t..vY.v&.OU. 000120
 045000F0 9A5016DC 46805052 D2568900 46894457 88264247 8826E05E C404C483 .&.&^A&.GB&.WO.FA.V@RP.FE.P.p.]. 000140
 0085E903 7EF65639 DE56880C 468800F6 568301F4 468308EB F44689F6 4689C028 +a.F-.F¶S..F¶..V-..FE.V89V--.O.. 000160
 8802E008 689A5016 E4468000 6AF476FF F676FFD0 76FFD276 FF7E73F4 4639057C |.9F¶s-.v@.vA.v-.v¶j..Fo.P.k.A.. 000180
 8301E86E 83EA5688 E8468800 00EA46C7 0064E846 C7D65689 D44689E6 5688E446 Fo.V|.Fa.VmuFOd.uFo...FO.Vo.nO.. 0001A0
 227F00EA 7E830BE8 0274C008 04C483FD F6E80ED4 76FFD676 FF137400 0800EA5E ^o..At..v=.va.O-».&..&t.SU.-o..* 0001C0
 FFFF9A10 4068006A 0AEE681E 0807681E 016A006A 016A006A 1A7500E8 7E83067C |..-O.u.j.j.j.j..h...hY.j.ha.... 0001E0
```

Dump of file SATURN:[PCCOMMON.DUMP.DLL]BRDPLOW.TMP;1 on 18-APR-1990 10:38:06.00
File ID (528,44,0) End of file block 272 / Allocated 272

Virtual block number 217 (00000009), 512 (0200) bytes

```
08460806 4688088E 0358881E 56000022 C8CBC91F 00EBC02B FEBFE9FF 65E90000 ..Õe.Õ¢±+åS..èùà"..V.¡(..Å.F..F. 000000
47882606 5EC404C4 83FE5EE8 0E0877FF 260A77FF 26065EC4 0178E980 F3880675 u.¡µ.Õx.á^.&.w.&.w..Õ^±.á.á^.&.G 000020
83067C00 7F00F27E 83053700 F09A5016 F0468050 52FE5689 FC46891E 5788261C .&.W..F=.V±RP.FÞ.P.Þ.7..~`...|.. 000040
8DFC76FF FE76FF05 47C?C29A 006A006A FC76FFFE 76FF0136 E9C02805 7301F07E -Þ.s.+åÕ6..v±.v=j.j..ô.G..v±.v=. 000060
26EC5EC4 EE5689EC 4689F656 88F44688 00F5E903 74C00803 7B0A589A 50'^F446 F¶.P.X.(..åt.ÕX..F¶.V-.F&.VŸá^&& 000080
F476FFF6 76FF08EB 04C483FF FF00619A 53060C74 00367F83 2602E802 740› F83 .7.t.Š0&..6.t..S.a....á.Š..v-.v¶ 0000A0
037402F8 7E830000 FFFF9A50 16F84680 0677FF26 0877FF26 EC5EC401 A200·9A ...Å.á^&&.w.&.w..F%.P......-½.t. 0000C0
C1E67688 347F01E6 7E83E646 FF03E800 00E646C7 0096E903 7400FA7E 83009FE9 Õ...-*.t.Õ..úf|..Š..f|.-|..4.vlè 0000E0
C1E67688 0084E9C0 28057500 08EA5689 E846890C 5088260A 408826EC 5EC402E6 |.á^&&.a.&.P..FÕ.Võ.Åu.+åÕ...vlè 000100
427D0002 3D0C4703 260A4788 260E5EC4 C3EBE052 890E4289 EA5688E8 468802E6 |..FÕ.Võ.B8.RÅSùá^8&.G.&.G.=..)B 000120
C00B04C4 83058302 339AEC76 FFEE76FF 327D0002 3D0C4703 260A4788 26E25EC4 á^å&.G.&.G.=..)2.vŸ.v$.3....á..â 000140
E9018400 5A9AF476 FFF676FF 0E75C008 04C48306 3001FD9A EC76FFEE 76FF2075 u .vŸ.v$.».=..á..âu..v-.v¶.Z.Ç.Õ 000160
00EBC02B E9E80275 C00B0515 05009A01 6A006A00 6AFC76FF FE76FFFE F4E9FEF7 %±Õ¶±.v±.v=j.j.j..Å....âu.ŠÕ+åŠ. 000180
00020000 000801F7 00020000 0006062B 00020088 0001048E 01030008 CBC95E1F .^èù....ƒ.......+.......¥....... 0001A0
00020000 00140654 00020000 00130573 000200A8 00040596 02030000 00120619 ...................s.......T....... 0001C0
00000000 00000000 00000000 00000000 00000000 00000000 00000000 001904D6 ø............................... 0001E0
```

Dump of file SATURN:[PCCOMMON.DUMP.DLL]BRDPLOW.TMP;1 on 18-APR-1990 10:38:06.00
File ID (528,44,0) End of file block 272 / Allocated 272

Virtual block number 218 (0000000A), 512 (0200) bytes

```
FFF08804 C4830044 08349A06 76FF0876 FFFC568C FA46890E 46805657 000008C8 à...WV.F..F*.V=.v..v..4.D..á..Þ. 000000
76FF0876 FFF8880C C4830055 09AE9A06 76FF0876 FF0A76FF 0C76FFFA 76FFFC76 v=.v*.v..v..v..v..Ù.U..á..%.v..v 000020
471170C0 08084688 FF335356 57EC8855 CBC95F5E C78806C4 83FFFF09 0A9A5606 .V......á..ú^_èùJ.$WVS3..F..á).G 000040
1DDAF7D8 F70A5688 471170C0 080C4688 06568908 46890000 1DDAF7D8 F7065688 .V.%ÀŸÕ....F..V..F..â).G.V.%ÀŸÕ. 000060
E8D388F1 F7064688 D888F1F7 D2330846 880A4E88 1575C008 0A56890C 46890000 ...F..V..âu..N..F.30%Þ.Å.F.%Þ.ÆŠ 000080
910C66F7 F088F1F7 F475D808 D8D1EAD1 0901E8D1 06468808 56880A4E 88D88838 8.Å.N..V..F.|Š|||õ|Å.Ùu¶%Þ.Þ%f.. 0000A0
08F7DAF7 07754F96 D2334E01 76064638 06720777 08563B0C 72D103E6 F70A4688 .F.%|.|r.;V.w.r.;F.v.N30.Ou.%Õ%Å 0000C0
F7064688 08750A5E 8808080C 5E880846 88EC8855 0008CA5D E5885F5E 5B000A83 .Õ.[^_.||õ..U.$.F..^..Å.^.u..F.% 0000E0
0008CA5D E588D103 E3F70646 88C8030C 66F70646 88C888E3 F70008CA 5DE588E3 D.||õ¯.%D.à.F.%f..à.F.%D.|.||õ.. 000100
88065689 08468900 001DDAF7 D8F70656 8847117D C0080846 88FF3357 53EC8855 U.$SW3..F..â).G.V.%À%Õ....F..V.. 000120
0846880A 4E881875 C0080A56 890C4689 00001DDA F7D8F70A 5688107D C0080C46 F..â)..V.%À%Õ....F..V..âu..N..F. 000140
D1E80106 46880856 880A4E88 088848EB 43794FD2 33C288F1 F7064688 F1F7D233 30%Þ.F.%Þ.õ30OyCŠH.Å.N..V..F.|Š| 000160
38087207 7708563B 0C72D103 0A66F791 0C66F7C8 88F1F7F4 75D808D8 D1EAD1D9 ||õ|Å.Ùu¶%Þ.à%f..%f..|r.;V.w.r.; 000180
CA5DE588 5B5F000A 8308F7DA F707794F 08561B06 46280C56 180A4628 06760646 F.v.+F..V.+F..V.Oy.%Õ%Å.Õ._[.||õ 0001A0
1E88F388 5756C08E D08CC85E 5FA5F300 0A891066 8F0818BE C08E088C 57560008 ..VW.Å.à/..¢f.¿..µE_^ù.Å.âVW.µ.. 0001C0
1F7A1E88 F3885756 16E8F388 D98EA5A5 FCD88EC1 8ED98CC0 8CF8880C C3831F7A z..ü..«.à.|.è.Å=EE.T.µŠ.VW.µ..z. 0001E0
```

Dump of file SATURN:[PCCOMMON.DUMP.DLL]BRDPLOW.TMP;1 on 18-APR-1990 10:38:06.00
File ID (528,44,0) End of file block 272 / Allocated 272

Virtual block number 219 (0000000B), 512 (0200) bytes

```
5F03FE47 C6FC7789 1F7A1E89 4E741F66 F881F388 A5A5FCC1 8ED98CF8 880CC383 .û..«.|.è=ÉÉ.µ.«f.tN..z..w=6G±.  000000
A5A5A5A5 FCD88EC1 8ED98CC0 8CF8880C C3831F7A 1E88F388 5756C08E D08CC85E ^ù.Å.âVW.µ..z..û..«.â.|.è.Å=ÉÉÉÉ 000020
F881F388 A5A5A5A5 FCC18ED9 8CF8880C C3831F7A 1E88F388 575618E8 F388D98E .|.µŠ.VW.µ..z..û..«.|.è=ÉÉÉÉ.µ.« 000040
8CD88C57 5604E8D0 8C575611 C8E9C85E 5FFC7789 07FE47C6 1F7A1E89 0E741F66 f.t...z.6G±..w=_^ùÕù.VW.ÅŠ.VW.Å. 000060
66F881A5 A5027403 3CA5A5FE 4588ADF8 880CC383 1F7A1E88 F388FCD8 8EC18ED9 |.è.Å=.µ..z..ù.¯«Ù.E±ÉÉ<.t.ÉÉ.«f 000080
C08ED08C 14E80257 88260788 26C08ED0 8CC85E5F D98EFC5F 891F7A1E 89CF741F .tü..z.._=.|_^ù.Å.â&..&.W.Š..Å.â 0000A0
DAF7D8F7 07798024 C78AD088 DA885756 99078803 E8025788 07880AE8 99078826 &...Š...¯W.Š¯...VW.Õ.Å.ú$.y.%ÙNÕ 0000C0
0F7500FF 80C18ED9 8CFC7D89 1F7A3E89 1C741F66 FF810CC7 831F7A3E 88000883 .Ù..>z..ú...f.t..>z..)=.|.è...u. 0000E0
1A48E8F8 880833C8 88876080 5507FE45 C6FF63E9 C85E5F16 ECE89E84 03FE45C6 6E±.Ç.ÕŠ._^ùÕc.6E±.U§'..ù3U.«ÕK. 000100
7A3E8981 741F66FF 810CC783 FE458AFC 75881F7A 3E88C08E D88C5756 C85E5F5D ]_^ùVW.Å.Å.>z..u=.E±.ú...f.tŸ.>z 000120
1F66FF81 0CC7831F 7A3E8857 56C85E5F A5A50274 033CA5A5 FCFE4588 FC7D891F ..¯)=.E±=ÉÉ<.t.ÉÉ_^ùVW.>z..ú...f. 000140
8ED88C02 E8D08CC8 5E5FA8A8 FCC033C0 8ED88C03 FE45C6FC 7D891F7A 3E898C74 t..>z..)=6E±..Å.ã3â=  ^ù.ÅŠ..Å. 000160
1E88FCF8 885756C0 8ED88C02 E8D08C11 E80C1F7A 06831F7A 1E88FCF8 885756C0 âVW.«=..z...z..Š..ÅŠ..Å.âVW.«=.. 000180
0EE857FC 77881D88 268955C8 5E5F0C1F 7A2E83A5 A5FC7788 007503FE 7F801F7A z...±.u..w=ÉÉ..z..._^ùU.&...w=WÕ. 0001A0
8C11E80C 1F7A0683 1F7A1E88 FCF88857 56C08ED8 8C02E8D0 8CE4E85D DE885F11 . .8|ŠÕ.ÅŠ..Å.âVW.«=..z...z..Š.. 0001C0
7A2E83A5 A5A5A5FC 77880F75 07FE7F80 1F7A1E88 FCF88857 56C08ED8 8C02E8D0 ÅŠ..Å.âVW.«=..z...±.u..w=ÉÉÉÉ..z 0001E0
```

Dump of file SATURN:[PCCOMMON.DUMP.DLL]BRDPLOW.TMP;1 on 18-APR-1990 10:38:06.00
File ID (528,44,0)   End of file block 272 / Allocated 272

Virtual block number 220 (000000DC), 512 (0200) bytes

```
1F7A1E88 FB885756 C08ED88C 02E8D08C E9E8DF87 F7882672 E8DF87C8 5E5F0C1F .._^ù.ÔÔr&.%.ÔSÔ.ÅS..Å.åVW.«..z. 000000
1F7A2E83 FE478AF3 881F7A1E 88F88857 56C08ED8 8C02E8D0 8C10E80C 1F7A0683 ..z..S..ÅS..Å.åVW.«..z..µ.Gz..z. 000020
DF9A48E8 15FE8A15 F98850E8 15D58A15 C888CB5E 5FA5A502 74033CA5 A5A8FC0C .•¨ÈÈ<.t.ÈÈ_^ù|ù.¤í.$P|•.¤z.$N.Ô 000040
E811F2E8 900AE811 A4E89010 E811A5E8 36E80486 8A048088 08482688 9F002804 .(...&H.|..¤..$6ÔÈ.$..ÔÈ.$..Ô·.$ 000060
08482688 9F047104 DF9AC30A F7000283 08F70773 589E0848 268A5011 87E89004 ..Ôñ.P.&H..Xz.%Å.@.%Ôù.Ô.q...&H. 000080
7488030A 7C801F7A 36890CEE 831F7A36 88515310 88268955 57560492 8A048C88 |..¤..VWU.&..SQ.6z..Ÿ..6z..|...t 0000A0
F8801375 7F01F6FF 32FE5D8A 1F7A3E88 57C85E5F 50585902 FF02E800 FF047508 .u..ÅS..@Y[]_^ìW.>z..]±2.-..u..« 0000C0
7A3E8857 C8F9C8E4 0803755F 8001F6F8 7480FF41 F6C85F08 75F0FF41 F6087403 .t.-A.Þu._ù-Ã..t½-.._u..öù¹ìW.>z 0000E0
803180FF 320875F7 38FC7588 FE5D8A1F 7A3E8857 56C85F7F 2180FF32 FE5D8A1F ..]±2..!.¯ùVW.>z..]±.u=;%u.2..1. 000100
A880F480 ADA5A5C8 5E5FA880 F480AD08 7503F880 A5FCC18E D98CFC7D 89C85E5F _^ù.)=.1.Ë•È.«.u.Ù.¶.¨_^ùÈÈÙ.¶.¨ 000120
8ED08C57 5676E800 0888F388 575604E8 24FEE857 5602E8C0 8ED08C57 56C85E5F ¯^ùVW.Å.åS.VWÒ±$S.VW.µ|..$vVW.Å. 000140
24CEE857 5602E8C0 8ED08C57 565EE800 0488F388 575604E8 24E6E857 5602E8C0 ÃS.VWÒ|$S.VW.µ|..$^VW.Å.åS.VWÒo$ 000160
1488F388 575604E8 2486E857 5602E8C0 8ED08C57 5646E800 0C88F388 575604E8 $.VW.µ|..$FVW.Å.åS.VWÒÑ$S.VW.µ|. 000180
8ED08C57 5616E800 1088F388 575604E8 249EE857 5602E8C0 8ED08C57 562EE800 .$.VW.Å.åS.VWÒ.$S.VW.µ|..$.VW.Å. 0001A0
7407FE7D 80C18ED9 8C1F7A3E 88D88800 0088F388 575604E8 2486E857 5602E8C0 åS.VWÒ.$S.VW.µ|...Å.>z..1.è.)±.t 0001C0
1F7A3E88 F7882491 E81DFC8F 02C383C8 5E5F5D08 2C97FF1D 88268955 FC7D8710 ..)=U.&....,.]_^ù.ù.¢•.Ô.$.%.>z. 0001E0
```

Dump of file SATURN:[PCCOMMON.DUMP.DLL]BRDPLOW.TMP;1 on 18-APR-1990 10:38:06.00
File ID (528,44,0)   End of file block 272 / Allocated 272

Virtual block number 221 (000000DD), 512 (0200) bytes

```
C08ED08C 575676E8 000A88F3 88575604 E82455E8 575602E8 C08ED08C 57560FE8 $ÔVW.Å.åS.VWÒU$S.VW.µ|..$vVW.Å.å 000000
E82425E8 575602E8 C08ED08C 57565EE8 000688F3 88575604 E82430E8 575602E8 $.VWÒ=$S.VW.µ|..$^VW.Å.åS.VWÒ%$S 000020
001688F3 88575604 E82400E8 575602E8 C08ED08C 575646E8 000E88F3 88575604 .VW.µ|..$FVW.Å.åS.VWÒ.$S.VW.µ|.. 000040
C08ED08C 575616E8 001288F3 88575604 E823F5E8 575602E8 C08ED08C 57562EE8 $.VW.Å.åS.VWÒ%#$.VW.µ|..$.VW.Å.å 000060
057407FE 7D80C18E D98C1F7A 3E88D888 000288F3 88575604 E82300E8 575602E8 $.VWÒ1#$.VW.µ|...Å.>z..1.è.)±.t. 000080
E8001488 12E80010 8817E800 0C881CE8 00088821 E8000488 FF39E95E 23D8E856 VÒÁ#^Ô9.È..$1È..$.È..$.È..$.È..$ 0000A0
287407F2 7D803974 07FE7D80 1F7A3E88 57560018 8803E800 1C8808E8 00008800 .È..$.È..$.È..VW.>z..)±.t(9.)·.t+ 0000C0
89553E73 18F8832F 31CF883 087D88FC 7D89FC75 88C08ED8 8C1F7A3E 890CEF83 .ÿ..>z..Å.å.u•.)•.)..«.ß/.«.ß>U. 0000E0
890CEF83 C47407F2 7D8002C3 83C0E823 6BE802C3 83C85E5F 50082C97 FF1D8826 &....,.]_^ù.ù.Ôk#Së.ù..)·.tá.ÿ.. 000100
1F7A2E83 C85E5F5D 082897FF 1D882689 550C1F7A 2E83F787 8FE82356 E81F7A3E >z.ÔV#Se.%..z..U.&....(.]_^ù..z. 000120
D0F88AE3 D0E300C8 9E5E5FE0 0AE4D0E8 01410025 9F5D082C 97FF1D88 2689550C .U.&....,.].%.AlÒÅÔ.Å_^.ùÃDÅD.«Å 000140
87AD0005 89F82BFE 884E4E1F 7A3688FC C08ED88C 5756000C 8803E8FF 320F02E7 Ô.Ô2.$.È..VW.Å.å•.6z.ÑN.±+«¿..Ù. 000160
5F220DE8 037407FE 7D801F7A 3E885756 EC8855C8 5E5FF4E2 47471D88 FE448905 ..D±..GGã¶_^ìW.$VW.>z..)±.t.Ôi"_ 000180
8855C85D E5885E5F 001BE8C0 325756EC 88551A3E E922E88A 0848B8C8 5DE5885E ^.|]ùÈK.¤$"Ô>.U.$VW2èÔ.._^.|]ìW. 0001A0
A536A536 23968F06 7680071E FCC85DE5 885E5F80 23903680 0008E880 805756EC $VW¯.Ô...6.#._^.|]ù•...v.¢.#6È6È 0001C0
18798007 44F60F30 E8551F7A 36892396 BE1F7A36 FFFF4430 36FF4530 A536A536 6È6ÈDÈ.6ÔÔ..6z.ƒ.#.6z.UÔ=.-D..y. 0001E0
```

Dump of file SATURN:[PCCOMMON.DUMP.DLL]BRDPLOW.TMP;1 on 18-APR-1990 10:38:06.00
File ID (528,44,0)   End of file block 272 / Allocated 272

Virtual block number 222 (000000DE), 512 (0200) bytes

```
1F7A068F 5D13FAE8 08508F06 7423968E C08ED88E 58108CE8 1E071606 7E80555D ]U.~....Ô¥.X.Å.åƒ.#t.¢P.Ô•.]..z. 000000
0000FE46 C7077508 5C387E81 0E750864 067E8125 8E06FF56 000004C8 C30A8C96 ..Ôùà...V..ƒ%.~.d.u..~.\.u.úFz.. 000020
88157500 0A47F626 065EC400 01FE46C7 2475FFFF 087E8128 75087006 7E8113E8 $..~.p.u+.~...u$úFz..á^.&-G..u.. 000040
02E6C1FE 76889090 7E.8C028 06740117 4C87F606 D868F9F7 000C8999 085820C3 û-X..¿..%¹kÅ.-.L..t.+åS-...vzèl. 000060
88057400 08025489 048902C4 8309472E FD9A0200 68147502 44080488 1D4AC681 .6J....D.u.h...».G..á....T..Åtl. 000080
C1FE7688 065EC4FC 4689174C 05E0D1C1 03E0D1C8 88F9F700 0C899908 58200646 F.-X..¿..%¹.àlÅ.èlÅ.L..F•á^..vzè 0000A0
89020088 FC768802 57892607 89260857 89260647 89261D4C 94881D4A 848802E6 l...J...L.&.G.&.W.&..&.W..v•|... 0000C0
46880000 04C890C8 C95E0001 88020A4F 8026065E 881107C6 0E880447 89260244 D.&.G..8ó...^.&.O..|..^èù.à....F 0000E0
7400067E 83FE5E8C FC468917 4C05E0D1 C103E0D1 C888F9F7 000C8999 08582008 .-X..¿..%¹.àlÅ.èlÅ.L..F•.^z.-..t 000100
5C74C008 02C48309 59312A9A 50E42A08 478A2608 5EC47274 1007F626 FC5EC451 Qá^•&-..trá^.&.G.*ôP.*1Y..á..åt\ 000120
C028085E C4000002 47C72600 07C626FC 5EC404C4 8309982E 629A0876 FF0A76FF .v..v..b....á.á^•&ó..&úG...á^.+å 000140
8A26085E C4217410 07F626FC 5EC42AE8 08578926 06478926 02578926 07892699 .&..&.W.&.G.&.W.$*á^•&-..tlá^.&. 000160
8855C8C9 04A92E62 9A0876FF 0A76FF08 74C00802 C48309AA 312A9A50 E42A0847 G.*ôP.*1¨..á..àt..v..v..b.¨.èùW. 000180
2A281689 2A26A310 56880E46 882A381E 8C2A36A3 2A3C8808 A133FC9A 000A88EC &|...•3À.¡<*È6*..8*.F..V.È£*..(* 0001A0
25F67E80 0380E900 002A3006 C700002A 3206C72A 0E16892A 0CA30856 88064688 .F..V.È.*...*ú.2*..ú.0*..Ô...~% 0001C0
A32A2AA3 2A2CA32A 14A32A2E A32A12A3 2A16A3C0 2800012A 3406C703 08E90374 t.Ô..ú.4*..+àÈ.*È.*È.*È.*È,*È**È 0001E0
```

```
Dump of file SATURN:[PCCOMMON.DUMP.DLL]BRDPLOW.TMP;1 on 18-APR-1990 10:38:06.00
File ID (528,44,0)   End of file block 272 / Allocated 272

Virtual block number 223 (000000DF), 512 (0200) bytes

 302B9C06 C70A46FF 49753001 7F80260A 5EC40020 2B9C06C7 2A24A32A 0AA32A10 .*£.*£$*ú..+ .á^.&...0uI.F.ú..+0 000000
 0E75203F 80269028 E800002A 2A06C72A 1606FF00 75283F80 260A5E88 903EE800 .$>..^.&.?+u....*ú.**..$(.&.? u. 000020
 2406FFC7 75203F8J 260A5EC4 00E82A0A 06FF9014 E82A2A06 FF1A7500 2A163E83 .>.*.u...**$.....*$.á^.&.?-uú..$ 000040
 3A681E0A 76FF0C76 FFD075C0 0802C483 0978E80E 5098078A 260A5E88 0A46FF2A *.F..^.&...P.Òx..á..áuÍ.v..v..h: 000060
 3AA308F7 2A3AA12A 2406FF0C 7D002A3A 3E830C56 890A4689 08C48308 C7E80E2A *.Òü..á..F..V..>:*.)...$*À:*¼ÀÈ: 000080
 06FF2D75 2E3F8026 0A5EC400 2028 9C06 C7067530 2B9C3E83 0074002A 243E832A *.>$*.t..>.+0u.ú..+ .á^.&.?.u-.. 0000A0
 7D002A34 3E830C56 890A4689 08C48308 7BE80E2A 34681E0A 76FF060A 46FF2A2C ,*.F...v..h4*.Ò(..á..F..V..>4*.) 0000C0
 7400683D 4074004E 3D307400 46309807 8A260A5E C42A2C0E FF00012A 3406C70A .ú.4*....,*á^.&...=f.t==N.t@=h.t 0000E0
 C40A46FF 03754C3F 80260A5E C4097500 2A143E83 00022A14 06C70675 006C302B +=l.u.ú..*...>.*.u.á^.&.?Lu..F.á 000100
 2A1406C7 00E80010 2A1406C7 08E80001 2A1406C7 90024EE9 1C75003F 80260A5E ^.&.?.u.ÕN..ú..*..$Àú..*..$Àú..* 000120
 46832A12 06FF0875 00583005 74004730 0A740045 3DF84689 98078A26 C8E80008 ..$à&....F½=E.t.=G.t.=X.u....*.F 000140
 75002530 0152E903 7E013FE9 03750063 300191E9 037E7874 00693DF8 468820F8 ½ .F½=i.tx-.Õ..=c.u.Õ?.-.ÕR.=%.u 000160
 0247C726 0789262A 30A11FC4 262A261E C4157502 2A143E83 900159E9 0140E903 .Õ@.ÕY...>.*.u.á.&*&á.À0*&..&úG. 000180
 0170E903 75002A32 3E83042A 26068307 89262A30 A11FC426 2A261EC4 00E80000 ..$.á.&*&á.À0*&....&*..>2*.u.Õp. 0001A0
 06FF01AC E9FFFF88 01AFE903 75200A47 F6262A0C 1EC40180 E9037400 2A303E83 .>0*.t.Õ§.á..*&-G. u.ÕE.¡..Õ¯... 0001C0
 2A1206FF 2A1006FF F2E8086A 90C3E802 C483019E E80E0A6A 00002A0A 06C72A2E .*ú..*..j..Ò...á.$ü.j.$·...*...* 0001E0

Dump of file SATUR- [PCCOMMON.DUMP.DLL]BRDPLOW.TMP;1 on 18-APR-1990 10:38:06.00
File ID (528,44,0)   End of file block 272 / Allocated 272

Virtual block number 224 (000000E0), 512 (0200) bytes

 2A14A3C0 287A7401 2A143E83 0081E903 75082A14 3E830004 2A3406C7 2A2C06FF ..,*ú.4*...>.*.u.Õ...>.*.tz+áÈ.* 000000
 909013EB 00002A3A 06C70A74 002A243E 83FA4689 2A3AA128 742A3A06 39FA4689 .F*9.:*t(À:*.F*.>$*.t.ú.:*..$... 000020
 6A02C483 0130E80E 106A022A 2606832A 3AA3C028 027DC008 2A3AA105 2A3A2E83 ..:*.À:*.á).+áÈ:*..&*.j..Ò0..á.j 000040
 C00B2A3A A300052D FA468815 74002A24 3E832274 00FA7E83 02C48304 8DE80E3A :.Ò...á..-*.t".>$*.t..F*-..È:*.á 000060
 068302C4 8300F1E8 0E106A04 2A262E83 00002A3A 06C79007 EB2A3AA3 C028027D ).+áÈ:*$..ú.:*....&*.j..Òþ..á... 000080
 49E80EF8 76FFF4E8 016A90FF 39E9026E E80E006A 90FF3FE9 106AFF10 E9022A26 &*.Õ..j.Õ?..j..Õn.Õ9..j.$¶.v½.Õl 0000A0
 0A7E0067 3D057C00 6530FF0C E9037500 643090FF 21E90428 E80E256A FF2AE903 .Õ*.j%.Õ(.Õl..=d.u.Õ..=e.|.=g.-Õ 0000C0
 903AE8FE 5689FC46 89400C56 880A4688 0A4EFF0C 56880A46 88097400 2A143E83 .>.*.t..F..V..N..F..V.ª.F•.V±$:. 0000E0
 0075308F 74007330 FEE0E903 7500703D FEE4E903 75006F30 FE80E903 75006E30 =n.u.Õ.±=o.u.ÕÕ±=p.u.ÕÀ±=±.t.=u. 000100
 88078A26 FC5EC4FC 46FF9034 E80A46FF 9081E8FF 79E90375 007830FE 89E90375 u.Õ¿±=x.u.Õy.$Ÿ..F.$4..F=á^=&... 000120
 FC468806 C483044C E80E0A76 FF0C76FF 500A4628 C388EC75 253C0474 C00AF646 F-.át.<%u$.ú+F.P.v..v..ÕL..á..F• 000140
 47F6262A 0C1EC4FC 63E90374 C00AF646 88078A26 0A5EC40C 56890A46 89FE5688 .V±.F..V.á^.&...F-.át.Õc•á..*&-G 000160
 83002028 9C06C706 74002A2C 3E835657 000012C8 C8C92A30 A1FE51E9 0374200A . t.ÕO±À0*èüà...WV.>,*.t.ú..+ .. 000180
 88260788 262A261E C4197510 2A143E83 0774022A 143E832A 2E06FF04 740A067E -..t....*.>.*.t..>.*.u.á.&*&..&. 0001A0
 46890788 262A261E C4117400 2A2E3E83 902CE804 2A260683 FE5689FC 46890257 W..F•.V±..&*.$,..>.*.t.á.&*&...F 0001C0
 002A0A3E 83022A26 0683FE56 89FC4689 99078826 2A261EC4 0EE80000 FE46C7FC •úF±..$.á.&*&....F•.V±..&*..>.*. 0001E0

Dump of file SATURN:[PCCOMMON.DUMP.DLL]BRDPLOW.TMP;1 on 18-APR-1990 10:38:06.00
File ID (528,44,0)   End of file block 272 / Allocated 272

Virtual block number 225 (000000E1), 512 (0200) bytes

 89F24689 2A381688 2A36A128 9AA3C028 9003E806 46880674 FE4608FC 46880E74 t..F•.F±t..F.$..+áÈ.+À6*..8*.F·. 000000
 882D07C6 26F246FF F25EC410 750A067E 83287D00 FE7E8331 75002A2E 3E83F456 V¶.>.*.uI.-±.)+.-..u.á^·.F·&6.-. 000020
 880000F6 46C79006 E80001F6 46C7FE56 89FC4689 DAF70002 8308F7FE 5688FC46 F•.V±¼À.@.¼Õ.F•.V±úF-..$..úF-..¡ 000040
 002A2C3E 830AC483 0E9B3120 9AFC76FF FE76FF50 1E0676FF FA5E8CF8 46892A18 .*.F½.^*.v..P.v±.v•. 1...á..>,*. 000060
 9A3E8300 7EC908F0 4E89C828 2A340E88 04C48309 872FEE9A F876FFFA 76FF4574 tE.v*.v½.Ÿ/ñ..á...4*+à.Nÿ.è-..>. 000080
 7E89F47F C00849C1 88473005 C62605EB F27EC4F0 4E880000 2B9A06C7 0675082B +.u.ú..+...NÞá-·$.&6.0G.èl.á.¶.- 0000A0
 7C613C07 74C90804 88078A26 F85EC4F2 76C5EE5E 8C2A120E 88F04E89 F4468CF2 ·.F¶.NÞ...*.^Ÿév·á^Y&.....èt.<@| 0000C0
 16A11475 002A2E3E 83EE5E8E F45E8CF2 7689E375 003F8026 F846FF46 202C8003 .., F.F½&.7.uÐ.v·.^¶.^Ÿ.>.*.u.À. 0000E0
 C8C95F5E 02C48302 FFE80E50 C02802EB 00018805 7500F67E 8308742A 2A06082A *..**t..—.u.¡..$.+áP.Ò...á.^_èù 000100
 2A260683 FA5689F8 46892A28 16882A26 A10001BE 18740006 7E835657 000010C8 à...WV.-..t./..À£*..(*.F½.V*.¯&* 000120
 1EC410E8 FA5689F8 46890257 88260788 262A261E C4137408 2A143E83 008FE902 .Õ...>.*.t.á.&*&..&.W..F½.V*$.á. 000140
 FA4608F8 46880E74 082A143E 83042A26 0683FA5E 8CF84689 FC468907 88262A26 &*&...F•.F½.^*..&*..>.*.t..F½.F* 000160
 F24689FA 5688F846 88FA5E8C F846891D 59880975 00FC7E83 900AE810 52881575 u.¡R.$...~•.u.¡Y..F½.^*.F½.V*.F· 000180
 38461574 003F8026 F246FFF2 5EC4900E E82A340E 881C742A 2C3639F6 28F45689 .V¶+-96,*t...4*$..á^·.F·&.7.t.F; 0001A0
 0875002A 243E83FE 282A3A3E 88F37500 3F8026F2 46FFF25E C44690ED E8107ECE ö~.$U.Fá^··.F·&.7.uµ.>:*+±.>$*.u. 0001C0
 E80E5708 74002A24 3E8306C4 8301B3E8 0EF876FF FA76FF56 02C48301 59E80E57 W.ÒY..á.V.v*.v½.Ò*..á..>$*.t.W.Ò 0001E0
```

```
Dump of file SATURN:[PCCOMMON.DUMP.DLL]BRDPLOW.TMP;1 on 18-APR-1990 10:38:06.00
File ID (528,44,0)   End of file block 272 / Allocated 272

Virtual block number 226 (000000E2), 512 (0200) bytes

7467067E 83FE568? FC46892A 2816882A 26A10000 06C890C8 C95F5E02 C483013C <..á.^_èù.à...Å£*..(*.F•.V±.-.gt 000000
7E800006 2A3406C7 0675002A 2C3E83FA 4688C02A 9003E801 80057547 067E8306 ..~.Gu. .Š..*à.F*.>,*.u.ú.4*...- 000020
2A3836FF 0676FF2A 3436FF2A 1236FF00 012A3406 C7067500 2A343E83 007400FA *.t..>4*.u.ú.4*...6.*.64*.v..68* 000040
2A0A3E83 1B7400FA ,E800EC4 831D661E FF262852 068EFC76 FFFE76FF 2A3636FF .66*.v±.v•..R(&..f..á..-*.t..>.* 000060
3E831874 002A0A3E 8304C483 106A1EFF 26285206 8E2A3636 FF2A3836 FF147500 .u..68*.66*..R(&..j..á..>.*.t..> 000080
06C7082A 26068304 C4831D72 1EFF2628 52068E2A 3636FF2A 3836FF14 75002A34 4*.u..68*.66*..R(&..r..á...&*.ú. 0000A0
0B04C483 1D761EFF 26285206 8EFC76FF FE76FF18 742A2A06 0B2A16A1 0000289A .+..Å.*..**t..v±.v•..R(&..v..á.. 0000C0
1EC43C75 002A323E 83560000 00C890C8 C90129E8 0E50C028 02EB0001 B80574C0 ât.|..Š.+âP.Ò).èù.à...V.>2*.u<á. 0000E0
2A0E36FF 10EBE42A 04882602 478E2607 FF263788 2606468A 1478044F FF262A0C .*&.O.x..F.&.7&..&.G.&..*ðŠ..6.* 000100
02C890C8 C95E2A30 06FF9005 EB2A3206 FF077540 06C48311 732CEC9A 0676FF53 S.v..&,s..á.âu...2*Š....0*^èù.à. 000120
2B9C36FF 2A0C36FF 2A0E36FF 1BEB507E F6080676 88577500 2A323E83 56570000 ..WV.>2*.uW.v..--PŠ..6.*.6.*.6.+ 000140
D478044F FF262A0C 1EC41E7E C0084EC6 882A3206 FF047540 06C48311 0B2CEC9A .&,Ù..á.âu...2*.6N.á~.á..*&.O.xà 000160
06010646 88077500 2A323E83 D4EBE42A 05882602 478E2607 FF263F88 26289CA0 ..+&.?&..&.G.&..*ðŠ&.>2*.u..F... 000180
2A0C36FF 2A0E36FF 22EB5E75 002A323E 830A7688 56570000 02C8CBC9 5F5E2A30 0*^ èùà...WV.v..>2*.u^Š".6.*.6.* 0001A0
74C0084E C6880646 FF2A3206 FF047540 06C48312 4D2CEC9A 5098078A 26065EC4 á^.Ë...P.&,M..á.âu...2*.F..6N.át 0001C0
2602478E 2607FF26 3F88262A 0C1EC407 8A26065E C4CD7804 4FFF262A 0C1EC425 Xá..*&.O.xèá^.&..á..*&.?&..&.G.& 0001E0

Dump of file SATURN:[PCCOMMON.DUMP.DLL]BRDPLOW.TMP;1 on 18-APR-1990 10:38:06.00
File ID (528,44,0)   End of file block 272 / Allocated 272

Virtual block number 227 (000000E3), 512 (0200) bytes

2A36A156 00000CC8 CBC95F5E 2A300601 0A468807 75002A32 3E83CAEB E42A0588 ..*ðŠò.>2*.u..F...0*^ èùà...VÀ6* 000000
830E862F EE9AF476 FF522A3A 3688FA46 89FC4689 C028F656 89F44689 2A381688 ..8*.F¶.V-+á.F•.F*.6:ªR.v¶.Y/... 000020
3E834E01 75082B9A 3E8308EB 02EE8305 75102B9A 3E830676 2BF02BF8 468904C4 á..F½•Þ+v..>.+.u..Y.Š..>.+.u.N.> 000040
71E80E50 98078A26 F446FF12 75302B9C 3E831975 203F8026 F45EC422 75002A24 $*.u"á^¶&.7-u..>.+0u..F¶&...P.Òq 000060
FF077400 067E8318 74002A24 3E83077E F6080074 302B9C3E 83FB4EFF 02C483FE ±.á..N½.>.+0t..-~..>$*.t..~..t.. 000080
FE7EE80E 56297500 2A243E83 0070E80E FC46FF07 7400289A 3E830066 E80EFA46 F*.Òf..>.+.t..F•.Òp..>$*.u)V.Ò~± 0000A0
047500FC 7E830A74 00289A3E 830039E8 0E047500 FA7E830A 7400067E 8302C483 .á..-..t..-*.u..Ò9..>.+.t..~•.u. 0000C0
20289C06 C70E7400 2A243E83 06C483FE 85E80EF4 76FFF676 FFF876FF 0040E80E .Òâ..vñ.v-.v¶.Òç±.á..>$*.t.ú..+ 0000E0
FD02E80E 50002088 03E8002B 88057400 2A163E83 CBC95E02 C483FE38 E80E5600 .V.Ò8±.á.^èù.>.*.t.¡+.Š.¡ .P.Ò0» 000100
03E80058 88057400 2A123E83 17751028 9A3E8302 C483FDC8 E80E306A C802C483 .á.ùjÒ.Òà».á..>.+.u..>.*.t.¡X.Š. 000120
12752A3F 80260A5E C40001FE 46C75657 000006C8 C802C483 FDAAE80E 50007888 ¡x.P.Ò^».á.ùà...WVúF±..á^.&.?*u. 000140
FFFFFE46 C708752D 3F80260A 5EC49060 E80A46FF 022A2606 83378826 2A761EC4 á.&*&.7..&*..F.$'.á^.&.7-u.úF±.. 000160
0675303C 0A752A2C 36393B7F 393C3F7C 303CFA46 88078A26 0A5E88F6 2B0A46FF .F.+-.^.&...F*<0|?<9.;96,*u.<0u. 000180
83C803E1 01CE0302 E1C1CE88 98058A26 1B7F3930 802606E8 FB880030 2B9C0??7 ú..+0..«Š.&.=9..&....öèÅ..öÌÅ.à. 0001A0
46883789 26065EC4 F088EEF7 FE46880C 468C0A7E 89DF7D30 30802647 F18830E9 Ò0.þG&.=0)Ó.-..F..F±¥Y.Þá^.&.7.F 0001C0
264701E8 FC7EC406 4E8AFE5E 8CFC4689 1D608857 000004C8 CBC95F5E 0C56880A ..V.^_èùà...Wj'..F•.^±.N.á~•Š.G& 0001E0

Dump of file SATURN:[PCCOMMON.DUMP.DLL]BRDPLOW.TMP;1 on 18-APR-1990 10:38:06.00
File ID (528,44,0)   End of file block 272 / Allocated 272

Virtual block number 228 (000000E4), 512 (0200) bytes

C95FC028 FE468CFC 7E899009 EBFE468C FC7E8900 01B8F475 00382611 74003080 .=.t.&8.u¶|...-•.F±Š...-•.F±+á è 000000
08EB81B0 31301D84 06C712E8 83B03330 1D8406C7 1CE88480 34301D84 06C790CB ù.ú...04¯.Š.ú...03¯.Š.ú...01¯.Š. 000020
A3E42A32 311D8406 C706758C 3C1DF81E FF047400 1DFA3E83 8A803031 1D8406C7 ú...10¯..>*..t...½.<.u.ú...12*ÒË 000040
9A50FFE4 051D86A1 147D2C86 9A5000FD 88147532 609A1D80 8811372C 5C9A1086 ...\,7.£...'2u.¡».P.Ñ,).À...Ò.P. 000060
29747F80 C2F7C033 0254880C 8BFC1F7A 3E88C314 922C029A 1D8636FF 14862C86 Ñ,...6.......ú.>z.•...T.3à¾ò..t) 000080
02458900 0005C738 00C2818F E6800801 D901FAD1 08D10901 FAD10801 D9D1FAD1 ¹*¹¹¹ÄÌ*¹¹¹ÄÌ*¹¹¹Ä.Ì..Ò.Bú....E. 0000A0
8AF08AAD D48AC80A ADC888AD FC1F7A3E 8BEAEBD0 8AC888C3 F7880655 89044089 .M..U..¾ú.à.ÅŠò.>z.•Ù.àÙ.à.àÙ.Þ. 0000C0
25E922EC 8AF90A80 8101CA80 0374CD0A D301E201 D301E201 D301E201 F88AADDC ÉÙ.¾ÌâÌÆÌâÌÆÌâÌÆ.ët..Ò.Ý..*.á"Ò% 0000E0
01C68010 7401C6F6 15720777 D13AE001 E0D1E0D1 38723800 20307747 E0307FF0 Þ.=ÀGw=-.8r;ÌÀÌÀÌÀ:Ìw.r.-ó.t..ó. 000100
89C68AE3 8A024589 E50AC70A 7FE78016 74C00817 747F8030 00800508 73000383 .Æ.s....=..t..àt..Ô..ú.Ì.E..D.ó. 000120
0B0B33D0 8B1DE8C3 8800880A 88D233C3 F7880245 89058 9C0 33FED8E9 C3F78805 ..¾úÒÙ±3à...E..¾ú3Ø.Ò.Å.úŠ..À3Ù. 000140
74E99EB4 8024C48A 0008830A F7D8F707 79C008C3 8800880A 8B11E80A F7157902 Øy.¾ÒŠ..Ò.Å.ú.ày.¾ÙÑÒ.Ù..áŠ.Ç.Òt 000160
79C008C3 88C8880A 8811E809 F71579C9 080833C8 8810E8C3 88C8880A 88D23304 .3Ø.Ò.à.úŠ..à3Ù.èy.¾¹Š..Ò.à.ú.ày 000180
08E8002B E800E800 3AE807B5 E9856080 D233FF33 8024C48A 00088309 F7D8F707 .¾Ù¾).Ù..áŠ.3.3ØŠ',Òç.Ò:.Š.Ò+.Š. 0001A0
EB0050E8 08E8003E E800E800 9CE8C3C8 01677500 D283C0D1 0026E803 E80035E8 ÒS.Š.Ò&.Ìà.Ø.ugÌàúÒ..Š.Ò>.Š.Ò).Š 0001C0
79FF08C9 330041E8 03E8007B E808E800 2CE800E8 002CE8C3 4E75D208 0039E803 .Ò9..ØuÑúÒ,.Š.Ò,.Š.Ò(.Š.ÒA.3è..y 0001E0
```

Dump of file SATURN:[PCCOMMON.DUMP.DLL]BRDPLOW.TMP;1 on 18-APR-1990 10:38:06.00
File ID (528,44,0)   End of file block 272 / Allocated 272

Virtual block number 229 (000000E5), 512 (0200) bytes

```
001CE803 EB0056E8 C3CAD121 75000183 C2010001 83000283 F508F7D2 F7D1F700 .%1%®%Ä%.®..1.1ó.1.ul1òûõV.$.Ò.. 000000
D60A92AD 00A4E9FD E9E9C301 72000283 C3130B13 F581F980 CD0AE822 01B50B33 3Üç."Ò.e.*.%.Ü.ü.®.r.ûÕõ»ÕÉ.Ü..® 000020
74C90BE9 D1E901L9 D1E9D17F E58010CE 80F1220F B6F98808 EE8391AD 91AD93AD Ù.Ù.Ù..Y..*Ñ."þ.ö..1.1ö1ö1ö1ö.èt 000040
EE83C186 ACC88AAD F88AACDA 8AD2332F EB25E983 CA7F20F9 83787203 FEE981D8 Ä.Ö±.rx.* .ò.ÕX$/3®.Õ¯.¥Ü.à¯.é.Ÿ 000060
20E98399 7F20F983 47727EE9 804D74C9 080C00F9 D1D0E4D0 7FE183F9 88E98A04 ..Õ.*.Ä.ÄõÄ1*ÄÉ.ètM.Õ-rG.* ...Õ 000080
EB08E980 F632E68A C48AF88A DF8AD30A 01E28002 D0F501FA 801A7C08 F98009F7 %1.*.|..*.%Ä®.ã..Æ.Õ.%.á.12-.Õ.$ 0000A0
F9C3C388 D08BCA8A F3E20002 80DAD008 D10801EE D0000A80 01B201FA 8015E3E1 ÄD..*.ÿ..Õ.ÄŸ1Ä1ÜÄÕ.®.ã.ò.Ä.ûü* 0000C0
8810EF83 067C031F 7A368801 31E807B0 0068E8FD 35E9C300 88C03300 D1800081 Ÿ..1.3à.ÄûÕ5»Õh.¯.Õ1..6z..|..ÿ.. 0000E0
031F7A36 88010BE8 03800087 E8FD0FE9 C3FE8806 7C89E073 7FF0FA81 7FE68007 ®.1..*þ.6Ä.|..±ûÕ.»Õ..¯.Õ...6z.. 000100
EF831F7A 3688001E E8C3FE88 027C890F 737F80FA 817FE680 D7880080 EF81027C |..ÿ...®.1..*..sÕ.|..±ûÕ...6z..ÿ 000120
8CC08C1F 7A3E88FC C3FE8802 7C010080 EF811F7A 36880053 E8C3FE88 067C0110 ..|..±ûÕS..6z..ÿ...|..±ü®.>z..ê. 000140
F0E78306 4C89CA0A 0FE183F9 88064C88 00108A1F 7A3688C0 8EA5A5A5 A5C18ED9 ).èÉÉÉ.à.6z.¤...L..*.Ä..ò.L..Õþ 000160
3E88FC00 82E93FEB D9F7047D 0433E981 E9D1E9D1 E9D1E9D1 0035887F E580CF88 .ü.1.¡5.1ö1ö1ö1ö.Õ3.).%1$7Õ..®.> 000180
024C89CA 0A7FE183 F988024C 8800808A 1F7A3688 C08EA5A5 C18ED98C C08C1F7A z..ã.).èÉÉ.à.6z.¤...L..*.Ä..ò.L. 0001A0
81147CEF 88C83B09 F7487D00 96E981ED 32CD8AE1 D1001888 7FE580CF 8880E783 .Õ..ü.1.¡..1Ä.e2Ü.Õ..)H%1;à.ÿ|.. 0001C0
0082F501 FA80147C 08F980D2 33EA2880 00E581EF 88C8880A 74C83BFA 088000E7 Õ...*;àt..à.ÿ.1..+õ3®.*.|..*.%ÿ. 0001E0
```

Dump of file SATURN:[PCCOMMON.DUMP.DLL]BRDPLOW.TMP;1 on 18-APR-1990 10:38:06.00
File ID (528,44,0)   End of file block 272 / Allocated 272

Virtual block number 230 (000000E6), 512 (0200) bytes

```
33C32C88 E822EE8A D7C18A1D 8A880CE3 348AE7E8 4608E980 0004C614 0A00C?80 .®...ó...Õ.FSÕ.4D.£...è®.Ÿ"Õ.,û3 000000
01B281FA 80D30ADE 22D70AFA E2D7D0EA D106E3E1 8AEF8A00 0188C334 8AD18LC9 è.1.4ûE...ÿ.ÄD.1õÄ®ã*.®"8.Æ.*.ÿ. 000020
FAE20014 804606E3 3488F202 CE28C803 981F7A0E 88E2D3CC 8AFD8802 74000A80 .Ö.t..».®Æã..z...à+ö.·.4D.F...ã* 000040
E1747F80 A9025D88 26024488 C3E4007F CC80F8C8 E9C3F5D3 D14C747F 80C3F7C3 ûKû..tL1Æ%ûÕà«.ä.ÄÕû.D.&.].`..tÄ 000060
930B73E0 D1E3D1D5 78EF32EC 8AD87403 F77F80C3 F7D3F7E2 74D0F77F 80A9D0F7 %Ä`..%ÄtãXÆ%û..%ÆtÄ.&2ÿx11D1Äs.. 000080
75E9C3F5 D3D15E74 7FF0C3F7 C3053826 04880575 C3380A8E C18ED98C C28CF787 .%.Õ.).é.Õ;ûu...&;.ûXûþ.t^1Æ%ûÕu 0000A0
C3F7D3F7 E27400F7 7FF0A9D0 F7E1747F F0A9065D 88260644 88C3E400 7FCC80F8 «.à.ÄÕû.D.&.].`þ.tÄ%Ä`þ.%ÄtãXÆ%û 0000C0
75C3380A 8EC18ED9 8CC28CF7 87930873 E0D1E3D1 D578EF32 EC8AD874 D3F77FF0 þ.%ÆtÄ.&2ÿx11D1Äs...%.Õ.).é.Õ;ûu 0000E0
F4800245 88F787C3 05382604 88057502 453B2602 44880E75 04453B26 04448817 ..D.&;E.u..D.&;E.u...&;.û.%.E..¶ 000100
00CE81FF 00E78101 7488FF7C 88024C88 80CF8000 82358A01 50880245 8803E880 .Š..E..]..5ÿ..ü..L..|..t..Õ...ö. 000120
D0497718 FC80DCF6 E52A91FA 87F38705 73EC3A58 74E40A65 74ED0AC0 D1C1D180 .1è1à.Üte.Õt(:&s..µ.*.*|-É.®.w1Ä 000140
7210E980 D8330388 01C88003 74D20812 7C0EF980 55E30085 CD8A91D9 D0E8D0C9 èÄÕÄ1..èç.DU.*.|..®t..ù..Æ3Ü.Õ.r 000160
E2012374 177708E9 80FD8ADF 8AF38AD6 8A01CE80 0374D20A 287E05F9 803E741D .t>.*.-+.®t..ö..®.µ.Õ.».Õ.w.t#1ã 000180
E2DAD1E8 D120CA80 03743FC2 F60097E9 E8D0C188 07880E88 19E8F875 C1FED301 1Æ±èu%$..8.®.èÄÕÕ..-õ?t..ò 1$1Õã 0001A0
41E94575 FFFC80C4 FEDAD1D8 D150730E 13070314 70E00020 CA800374 3FC2F6FA *-õ?t..ò ÄÄp..®.8sP1Üiõ±á.®.uÉÕÄ 0001C0
DA876A76 10EC800B 75D80800 F6000383 F50AF7D3 F70A73DE 880788F3 18FA28FA *+*.µ.®.8s.%Æ%Õ%.Æ.-Ä.Üu..$.vj.Õ 0001E0
```

Dump of file SATURN:[PCCOMMON.DUMP.DLL]BRDPLOW.TMP;1 on 18-APR-1990 10:38:06.00
File ID (528,44,0)   End of file block 272 / Allocated 272

Virtual block number 231 (000000E7), 512 (0200) bytes

```
D1E2D14B 74CCFE0A 78FF0AD2 32F28ADE 8AF88A58 7608EC80 0F75FF0A 64740B08 .Ütd..u..$.v[.«.8.·20..x.±ätK1ã1 000000
73000383 01C6800F 7401C6F6 14720777 80FA8001 7CE90374 0010923E 80F671D3 Æq-.>...t.Õ|..*.w.r.-ó.t..ó..Æ.® 000020
8A024589 1F7A3E88 C70A7FE7 80802417 747F80A9 0801E000 3A74FFFC 80C4FE07 .±ó.®.t:ÄÄ1Ä`..t.$..Õ..ú.>z..E.. 000040
C3F78805 89024589 1F7A3E88 C033017E E9037400 10923E80 C3F78805 89C68AE3 D.ó...%û.>...t.Õ-.3ó.>z..E....%û 000060
883D88CB 74ED0AD9 D0E1D102 4D88D674 E40AD800 E0019634 88ADFCF9 90E9E679 ÿ1Õ.*«Ü.4.1ÄÄÄ.Õt®.M.1ÄÄ).Ütù.«. 000080
80C98080 CB80EF8A FF3250CD 74FFFC80 80C48003 70E5027F ED8080EC 80C13208 Ä2è.$..Ü..|pÆ.ó..®.tèP2..ÿ.ù..è. 0000A0
58FA1308 03E6F7C1 88FA8800 D2830803 E7F7C588 509FC008 DA88E7F7 C688E888 .$.ó%Õ.Õ.á.P.é%Õ.Ä.®..*.è%|.Ä.*X 0000C0
FEFF69E9 0A75E40A 0301E201 0878FF0A 58930388 C703E1F6 C58801C8 8003749E .t..ù..é-Ä.ú.Æ.X..x.1ã1Æ.Õu.Õi.± 0000E0
74E40A5C 74ED0AD8 D0E00102 44880900 E101024D 88F787FF 1AE9AD74 FFFC80C4 á.®.tüÕ...%.M.1ÄÄ).D.1ÄÄÄ.Üt\.Õt 000100
208A015D 88FF78E9 0375FFFC 8080C480 FF78E903 71E52A7F ED8081EC 80C13208 Ü2è.$..ù.*|q.Õ(..ó..®.u.Õx..]..- 000120
0180CE80 C032248A 01548850 10923E02 D901E801 08740010 923E8080 CF80C932 2è.u..>...t.1$11.>..P.T..$2à.ö.1 000140
10730338 F880E9FF 76E90D88 01CA8003 740688C2 080011E8 EE88001A E8D8D1EA õ1ÄÕ...ŸÕ...ó.®t..ò..1Õv.Õ¯%;Æs. 000160
FFFFBEC3 F9730313 C1034E07 730788FA 1808F7E1 F7C688FA 8815E3C0 3396F3F7 %µ.3àÕ..*.ó%Ä%Ä.*.®s.N.è.Æs*ûf.. 000180
74E40A3C 77EC3A0E ED800774 ED0A1D94 2E8A001D 9206C6C3 ED73C188 D003C128 +ê.Ä.èsÜûó.........Üt..Ü.:$w<.Õt 0001A0
53501D99 1F7A06C7 585B5AFE 4EE8DB32 02335253 501D951F 7A06C71F 7A36FF38 8.6z.ú.z...PSR3®2ÜÕN±Z[Xú.z...PS 0001C0
7A06C71F 7A36FF1D 92A20233 D833C033 FE33E91F 7A068F58 585AFE0F E8FF3252 R2.Õ.±Z[X..z.Õ3±3ã3Ü3®Ä...6z.ú.z 0001E0
```

```
Dump of file SATURN:[PCCOMMON.DUMP.DLL]BRDPLOW.TMP;1 on 18-APR-1990 10:38:06.00
File ID (528,44,0)   End of file block 272 / Allocated 272

Virtual block number 232 (000000E8), 512 (0200) bytes

F7B810E8 8000F581 066D88F7 87D3EB1D 97A31D95 A3C033FE 1AE85253 501D991F ...PSRÖ.±3àÉ..È..$£.%.m..%..$..% 000000
D1064488 FC066D88 C3FE881F 7A3688A8 E60A80E6 807FE480 ADA5A5A5 1F7A3E88 .>z.EEEÜ.Ö..Ì..Ì¨.6z..±ü.m.e.D.1 000020
D8F7C528 C274C008 D68695F7 870977E8 38E0E583 D274FFE0 250AD0E0 D1DED0E5 ÌA®ÌÀÀÖXÀ.t@.ÌÀ;Öw..%..ø.àtö+éXÀ 000040
91AD92C0 32E08AAC F888E086 C0D1C0D1 C0015700 D1E20000 D1E6D089 7706A030 =..w¿ÀÌÌÌÀ®ÌÌwÌàÌàÌà.À.%¯.Àzà.Ü. 000060
330888C8 88018801 C9800374 D208187C 0EFF8363 74FF0810 CC800FE4 80AD93AD Ü.Ü.Ö..à...tc...|..@t..è..1.Ù.À3 000080
DF8AE88A CD8AF18A D68A01CE 80037402 0A287C06 FF832372 4874E777 10EF83C0 à.ÿ.wÖtHr#...|+.@t..ö..ø.þ.ë.$.Ö 0000A0
743FC2F6 CF8716E8 F57547D0 01D30101 D1E2D123 740F7708 EF83E432 C48AF88A .%.àzö.ÿ.w.t@ÌàÌÌÌ£ÌÀGuÀ$..ü-ö?t 0000C0
E5D13870 E5D120CA 8003743F C2F6975E CF87F6E2 DAD10F01 D8D1E8D1 20CA8003 ..ò ÌÖÌÜÌÖÌÖå-.Ü^.-ö?t..ò ÌÌp;ÌÌ 0000E0
00C7F7FE 13589E58 1000CE81 0FFFE681 05748850 9F50035C 13014C13 34020800 ÀÀ.4.L..\.P.P.t..Ì...ö..X.X.±Xú. 000100
2AD0F6D8 D0E50100 88E9F6EC E90375E0 F08320C5 830AD1D9 D1D8D10F 01137420 t.ÌÖÌÜÌÌÌÖ.é .»Àu.Ö$-Ö..ÌÌÀÀ-À* 000120
D3F7D7F7 D0F6F633 1373FE18 9E1000CE 810FFFE6 819F0574 88035C18 014C1834 4.L..\..t...Ì...ö....±s.3--À%øX£ 000140
744E4076 0200ED81 1375E0C7 F61875FF 0800048E FCFE130E 13CE13F5 DAF7D1F7 %Ì%Ö%.ö.B.±•/....u.-úÀu..Ü..vàNt 000160
DD8AF88A C78AE08A 97277601 00E08118 751FE0C7 F7E4E8D2 33CA88D9 88F88830 =.«.\.ò3@$ö%úÀ.u..Ü..v'..À.ú.«.Ì 000180
65EBEBEB 07D10301 D1D1E2D1 717420ED 83127510 00C7F797 0082F28A CE8AE98A .Ö.ö. ÿ..Xú..u..Ü tqiàÌÌÌ£Ì=$$$e 0001A0
D3830001 8301C680 1A7401C6 F61F7207 7780FA80 0385E903 74001DAA 3E80FC90 .•.>¨..t.Ö...•.w.r.-ö.t..ó..Ì..£ 0001C0
D10FE780 8024DE87 1F7A3E88 F7883074 E0FD8320 C5830874 2000C7F7 00D78300 ..ø.Xú. t..é .»ÀtO.%.>z..ß$..Ö.Ì 0001E0

Dump of file SATURN:[PCCOMMON.DUMP.DLL]BRDPLOW.TMP;1 on 18-APR-1990 10:38:06.00
File ID (528,44,0)   End of file block 272 / Allocated 272

Virtual block number 233 (000000E9), 512 (0200) bytes

C3F78805 EF83ABC6 88ABC188 AAC68A05 5D880645 89C70AC5 08C032E0 862274ED Út".À2à.é.ú.E..Ì..ó¨.é¨.ó¨.ÿ..Xú 000000
FCC3FE88 ABABABAB F7881F7A 3E88C033 0377E903 74001DAA 3E80FCF5 FDE90379 y.Ö»X•.>¨..t.Öw.3à.>z..X¨¨¨¨.±ü• 000020
7FE0E981 80002DE1 D1E0D100 747FF0E1 81D13306 4D880874 7FF025D0 88064488 .D..ÀXÞ.tÜ.M.3Ì.Àþ.tÀÌÀÌÀ-...ÖÀ. 000040
C7F7D8D0 E5D15001 CA800374 0181E850 D8D1E600 8674FFE0 30800005 8C70C103 .épÿ...=À.tÑÀÌÌÀPÖ..t..ò.ÌÌÌÀÀXú 000060
F58CE9FF 24E98874 E0FD8320 C58393E8 0A75ED08 D7D10301 D1D1E2D1 0E751000 ..u.ÌàÌÌÌ£Ì=.Üu.$..é .»Àt.Ö$.Ö.% 000080
81802020 E1D1E0D1 98747FF0 25003306 4488EF74 7FF0E181 D1880640 88FCF787 .X=.M..Ì.Àþ.tÿ.D.3ÀXþ.t.ÌÀÌÀ- .. 0000A0
E480AD92 AD93ADC9 32E88AAC 5008D1E6 D09874FF E0308000 059870C1 287FE0E9 ÖÀ.+èp....=À.t.ÀÌÌÀP¯.Ö2èÜ.Ü.Ü.Ö 0000C0
0005C6FC A44746A5 A5A810CC 800FE480 ADFD10A8 8F05C683 F7885092 10CC800F ..ä..P.X.ó.é¨.=Ü.Ö..ä.¨EEFGÊ=6.. 0000E0
D8D1ADA8 D8D1ADED D1A810AA 2602E8D1 E888ADF7 881DA88F FD1F7400 1DAA3E80 .>¨..t.w€¨..Xú.ÖÌÖ.&¨.¨ÌÜÜÌÀ ÜÌÀ 000100
C3080033 E8570037 E857003B E857003F E8090108 D1D8D1EA D158FCA8 D8D1ADA8 ¨ÜÌÀ¨=XÌÖÌÀÌÜÌÌÖ?.WÖ;.WÖ7.WÖ3..ú 000120
EFD10AD1 D9D10801 EFD108CA 80037407 C2F601CA 8003745F 58590788 C208C108 .é.ò.øY[ t..ò.-ó.t..ò.ÌÿÌÜÌÌÌÖÌÿ 000140
3B0475D2 085C7306 3BFF3310 A83688FF 08E90AD1 D9D10801 EFD10AD1 D9D10801 ÌÜÌÌÌÖÌÿÌÜÌÌÌÖÖ...ó¨.3.¨;ø$\.@u.; 000160
E7F70674 C0081DA4 A150F288 E7F70474 C0081DA2 A1F588ED 339752F6 F73877F0 Þw;%-R.3Ü.XÀÀ..àt.XÖ.¨PÀE..àt.XÖ 000180
919295E8 18500018 CE18DAF7 5A9200D2 83E803E7 F70874C0 081DA6A1 EA13F003 .Þ.ðÀÌ..àt.XÖ.Ö.@..ZXÖ.o.Ì].Ö... 0001A0
1DA41E18 1DA20E28 4FC3ED73 1DA81613 1DA60613 1DA41E13 1DA20E03 4F137393 .s.O..À...É...Ì...¨.sÜÜÖ+.À...É. 0001C0
9EA3100C 0F24E432 0644BAC9 E8F51DA2 1688C213 1DA61E13 1DA40E03 1DA6061B ..Ì...É...Ì..ó..À.X$è.D.2ß$...É. 0001E0

Dump of file SATURN:[PCCOMMON.DUMP.DLL]BRDPLOW.TMP;1 on 18-APR-1990 10:38:06.00
File ID (528,44,0)   End of file block 272 / Allocated 272

Virtual block number 234 (000000EA), 512 (0200) bytes

0488CA88 E888E1F7 08E30088 911AE30C 88E88808 331DA0A3 100C0F24 06458A1D ..E.$...É..3Ü.$..D....D.XÀ.Ö.ò.. 000000
03E2F708 74D20815 880E74C0 0802448B ED33550A 13C803E2 F70674D2 08025588 .U..@t.Xã.à.ÖU3Ü.D..àt....@t.Xã. 000020
88C933EA 13D803E2  7067402 08025588 0074C008 02448850 C1085805 D10A13C8 à.ÖÌÌX.èP.D..àt..U..@t.Xã.À.ö3è. 000040
74D20815 880F74C0 03044488 D1D1EA13 D803E2F7 08740208 04558B0F 74C00804 ..àt..U..@t.Xã.À.öÌÌ.D..àt....@t 000060
C0080588 CA13E803 1DA026F7 0874C008 048850C3 08580001 83EA1308 03E2F709 .Xã.À.ö.Ì.X.úP...àt.X£...Ö.ò...à 000080
CA13E803 E2F70874 D2080455 880F74C0 08024488 D833CA13 E8031D9E 26F70874 t.X£...Ö.ò3Ü.D..àt..U..@t.Xã.Ö.ò 0000A0
08024588 ED335500 D383CA13 E803E2F7 09740208 02558810 74C00804 44880301 Ì£.D..àt..U..@t.Xã.Ö.ò.£.U3Ü.E.. 0000C0
74C00804 4488DA13 C8031DA0 26F70874 C0080244 88DA13C8 031D9E26 F70874C0 àt.X£...à.Ö.D..àt.X£...à.Ö.D..àt 0000E0
C0080445 88EA1308 031DA026 F7044488 D5D1DA13 C803E2F7 08740208 04558B1A ..U..@t.Xã.à.ÖÌÌ.D.X£...À.ö.E..à 000100
D1E2D107 D1D3D1D1 D1E2D15A 97C5031D A026F61D 9EA0EA13 D8031D9E 26F70874 t.X£...À.ö...-£...é.ZÌàÌÌÌ£Ì=ÌàÌ 000120
EE810874 F6081DA8 3688001D AA06C6C3 F6085ED7 D1D3D1D1 D1E2D107 D1D3D1D1 ÌÌ£Ì=ÌàÌÌÌ£Ì=^.-üó.¨...ó¨..-t..ÿ 000140
D233C933 D8335755 53525150 1DAD1F7A 06C71F7A 36FF4C74 ED085077 F53804C0 à.;XwP.ÜtL.6z.ú.z.Ü.PQRSUW3Ü3è3@ 000160
58595A58 5D5FF801 E8FF3357 55535251 501D851F 7A06C758 595A5850 5FFC3EE8 Ö>=_][ZYXú.z.ç.PQRSUW3.ÖÌ«_][ZYX 000180
1D851F7A 06C71F7A 36FF1DAA A2FF33ED 33083302 33C933C0 33FC1AE9 1F7A068F ..z.Ö.=3à3è3@3Ü3Ü3.À¨..6z.ú.z.ç. 0001A0
8F0E7680 071EFC57 56EC8855 C6E8ABAB ABABC033 1DAD8FF8 F8E85755 53525150 PQRSUWÖ¥=«Ü.3à¨¨¨¨$6U.$VW=...v.¢ 0001C0
A536A536 A5361DC4 8F067680 071EFC57 56EC8855 08E8A536 A536A536 A5361DCC ä.6E6E6E6E$.U.$VW=...v.¢6.6E6E6E 0001E0
```

```
Dump of file SATURN:[PCCOMMON.DUMP.DLL]BRDPLOW.TMP;1 on 18-APR-1990 10:38:06.00
File ID (528,44,0)   End of file block 272 / Allocated 272

Virtual block number 235 (000000EB), 512 (0200) bytes

D4880872 1F7A068F 585002FF 55531004 1F7A06C7 1F7A36FF 10CC8F1D C4BEA536 6E/6.«ä..6z.ú.z.å.SU.@][..z.r.¡å 000000
C6057503 0230001D E806C61D C21E8C1D C01E89C8 8AC933C8 5DE5885E 5FDA8C10 ..Ö_^.[]ü3è.à..à...ö.6.$..=..u.6 000020
E88E0381 17E8ABA8 ABABC033 1874033C 0C74073C 127403FC 8010048F 011DE806 .$..«å..«.t.<.t.<.t.3ä      $.Y./Ò 000040
C59A501D 8EB81EF1 881D8E0E 89A5A5A5 A526E88E 07E88010 D80E80A5 A5A5A526 &EEEE..Ü..$./Ò&EEEE../..þ.¡/.P.é 000060
239EA398 22800272 031D8E3E 83077500 1DE83E80 21809475 C00804C4 83149832 2...á..åu.¯1.>$..u..>/..r.¯".E.# 000080
2C869A56 22C23260 9A1DE888 22913260 9A481DC0 1E881874 F60B1DDA 8488E6D1 1I.ÇÖ..-t...à.K.'2."£Ö..'2ö"V.Ñ, 0000A0
88270A8F FCC3F8FE 88A8F300 0489C033 FE881F7A 3688C3F9 050188FF 59E922CA ð"ÖY.¡..'ü.6z..±3å¿..µ¨.±Ý¼ù=«.'. 0000C0
D1D1D1E2 01560154 88034C88 055C8A3F E0200778 FFF025E1 747FF0A9 F88A0644 D..%`Þ.tÅ%Þ.x=-Å?.\..L..T.Vïäiii 0000E0
05F8D10A D109D1E8 D1001005 097410A8 80CF8003 D1D1D1E2 D1030101 D1E20103 ÆiäiiiÆiäiiiÆ.ü.´.t....i$iiiÖi%. 000100
330388FF FFBD0373 EA035708 8DE3F7AF 81885236 EBF90372 FEF88306 45893FE0 Å?.E..«±r.'$6R¡ÝE%D$ÅW.ôs.§...Æ3 000120
88D088F5 F758F088 F5F7C188 D3880001 E813F9F5 F7C188D3 88D001E8 03F5F7C0 å¥%.Öii.Æ.è¥%'.Öii.Æ.è¥%.Þ¥%%.i. 000140
06450800 D1D301E1 D1D001D3 D1E1D1D0 D1D301E1 D1D001D3 D1E1D1C0 330E03C8 à.B3äiÄiÆiÄiÄiÆiÄiÄiÆiÄiÄiÆiÄ.E. 000160
04EC83EC 885500C3 F8100660 83F8A5E8 5FFB13E8 575E0000 05C7024D 89045D89 .]..M.ú...^WÖ.« ÖE½.m..½ú.U.±.&. 000180
5E8807E8 00200598 078A2606 5E880C74 0125C187 F6D88898 078A2606 5EC45657 WVá^.&....Ä-.èX.t..^.&....  .$..^ 0001A0
08468C06 7E89F275 0425C187 F6D88898 058A2647 F8881674 00653098 078A2606 .&...=e.t..«G&....Ä-.èX.u·.-..F. 0001C0
F7880788 26C688F8 8898078A 26065E88 2E07C626 0646FFF0 8898078A 26065EC4 á^.&....Þ.F.&6...^.&....½.6&...½ 0001E0
```

```
Dump of file SATURN:[PCCOMMON.DUMP.DLL]BRDPLOW.TMP;1 on 18-APR-1990 10:38:06.00
File ID (528,44,0)   End of file block 272 / Allocated 272

Virtual block number 236 (000000EC), 512 (0200) bytes

80269008 E8067EC4 565706EC 83EC8855 C850E588 5F5EFC7E 89E975C0 0A0646FF .F..åuÖ.~=^_.[]üU.±.&.WVé-.$..&. 000000
E8067E88 6774003F 80260646 FFDF8808 468C067E 89F37500 30802647 07742E30 =.t.G&.=.uµ.-..F..Ö.F.&.?.tg.-.$ 000020
FFC28CC7 8808468C 067E89ED 75003080 26470774 45308026 00746530 8026900E ..&.=et.&.=Et.G&.=.uÜ.-..F..ú.6. 000040
3F80260F 8808468C 067E89F9 74303080 264F9002 E8067E88 FE5689FC 4689064E N..F=.V±.-.$..O&.=0t'.-..F..Ö&.? 000060
FE5E8CFC 7689F275 C00A0788 26AC065E C40646FF FC76C5FA 5E8C064E FF03752E .u..N..^'év=.F.á^.¯&...åu·.v=.^± 000080
D69A2401 02369A06 5EC424CC 02569A28 541E80EC 885590C8 5DE5885F 5EFA5E8E .^'^_.[]ü.U.±..T(.V.ä$á^..6.1$.ø 0000A0
FF0E76FF 24740006 7E835657 08EC83EC 8855C85D C028C850 0001B805 7224F506 .%$r.¡..]ü+å]üU.±.&.WV.-..t$.v.. 0000C0
90C85DE5 885F5E1F A5A5A5A5 DA8E1EF0 88F88808 5EC404C4 83251930 069A0C76 v...0.X.é.á^..«.Þ..ÖEEEE.^ .[]ü. 0000E0
F85E801F A5A5A5A5 DA8E1E07 16F088F8 7E8004C4 83253330 069A0C76 FF0E76FF .v..v...03X.á..-½.Þ....ÖEEEE..^½ 000100
1DF23E80 56570AEC 83EC8855 90C850E5 885F5E25 AF03A99A 085EC425 3802569A .V.;%á^..`.£X^_.[]ü.U.±.&.WV.>·. 000120
C02802E8 0001B805 752D3F83 26F85EC4 FA5689F8 468928A0 1688289E A1477400 .tGÅ.+...+.F½.V'á^½&.?-u.¡..$.+å 000140
76FFFE76 FF50C02E 9003E800 0188067E 000E7E83 FE5689FC 46890C56 880A4603 .F..V..F=.V±.-..~.¡..$..+äP.v±.v 000160
ED327A9A 37FF2602 77FF2604 77FF2606 77FF2606 5EC458E8 06C48304 5DE80EFC =.Ö]..á.$Xá^.&.w.&.w.&.w.&.7.z2Ü 000180
5EC4C028 02E80001 88057E00 0E7E8350 400E4688 5052FA56 89F84689 08C48325 X.á..F½.V'RP.F.@P.-..-.¡..$.+åá^ 0001A0
83264730 5C9A5052 0C56880A 4603C703 C02802E8 0001B805 752D3F83 26F888F8 ½.½&.?-u.¡..$.+á.ú.F..V.RP.\OG&. 0001C0
07C626FC 46FFFC5E C40A752D 3F8326F8 5EC4FE56 89FC4689 0C56880A 46880AC4 á..F..V..F=.V±á^½&.?-u.á^=.F=&6. 0001E0
```

```
Dump of file SATURN:[PCCOMMON.DUMP.DLL]BRDPLOW.TMP;1 on 18-APR-1990 10:38:06.00
File ID (528,44,0)   End of file block 272 / Allocated 272

Virtual block number 237 (000000ED), 512 (0200) bytes

501E1DEC 882E07C6 26FC5E88 FC46FF07 88260147 8A26FC5E C4147E00 0E7E832D ·.-..-.á^=&.G.&...F=.^=&6..¡&..P 000000
89FC4689 08C48327 812F889A 5052FE56 88FC4603 0E460308 F7C01801 1DF23E80 .>·...å%Å.F..F=.V±RP.¡/.'.á..F=. 000020
C45E7430 3F802606 5FC426F8 5EC4FC46 FF4507C6 26FC5EC4 07740010 7E83FE56 V±.-..t.á^=&6.E.F=á^½&á_.&.?0t^á 000040
157C64FE 83FC46FF 2007C626 FC5EC4F0 8808F708 7DF608F0 88480247 8826F85E ^½&.G.H.Þ.-}.%Ä.Þá^=&6.¯.F=.±d|. 000060
99C68815 7C0AFE83 FC46FFF2 88F9F799 C6880700 26FC5EC4 F9F70064 8999C688 .6.¿d.%'á^=&...6.%'.·.F=.±.|..6. 000080
0A468807 0026C688 FC5EC4FC 46FFF288 F9F799C6 88070026 FC5EC4F9 F7000A89 ¿..%'á^=&...6.%'.·.F=á^=.6&...F. 0000A0
76FF0C76 FF0E76FF 1076FF01 1DF206C6 04EC83EC 885590C8 5DE5885F 5E0C5688 .V.^_.[]ü.U.±.&.6.·...v..v..v..v 0000C0
12EC83EC 8855C850 E588001D F206C6FE 5689FC46 89FE49E8 0E0676FF 0876FF0A ..v..v..Öl±.F=.V±6.·....[]üU.±.&. 0000E0
752D3F83 26F45EC4 F65689F4 468928A0 1688289E A1517400 1DF23E80 00F246C6 6F·..>·..tQÅ.+...+.F¶.V-á^¶&.?-u 000100
03FC4688 6A750E46 391DF4A1 FE5689FC 46890C56 880A4603 C02802E8 0001B805 .¡..$.+á.F..V..F=.V±Å¶.9F.uj.F=. 000120
26065EC4 4AE80007 C626EE5E 883007C6 26EE46FF EE5EC4F0 5689EE46 891DF406 .¶..FY.VÞá^Y.FY&6.0.^Y&6..$Já^.& 000140
5EC45052 F65689F4 468908C4 83278132 7A9A37FF 260277FF 260477FF 260677FF .w.&.w.&.w.&.7.z2Y'.á..F¶.V-RPá^ 000160
5C9A5052 0C56880A 4603C028 02E80001 88057520 3F832650 0E460302 47882 6F4 ¶&.G..F.P&.?-u.¡..$.+á.F..V.RP.\ 000180
46FFFC5E C40A752D 3F8326F4 5EC4FE56 89FC4689 0C56880A 46880AC4 8322D030 0Å".á..F..V..F=.V±á^¶&.?-u.á^=.F 0001A0
06C48302 05E80EFC 76FFFE76 FF500001 881D7F00 027F8326 F45EC42D 07C626FC =&6.·á^¶&......¡..P.v±.v=.Ö...á. 0001C0
50000188 687E000E 7E83FC46 01024788 26F45EC4 0AE83007 C626FC46 FFFC5EC4 á^=.F=&6.0$.á^¶&.G..F=.-..-h¡..P 0001E0
```

```
Dump of file SATURN:[PCCOMMON.DUMP.DLL]BRDPLOW.TMP;1 on 18-APR-1990 10:38:06.00
File ID (528,44,0)   End of file block 272 / Allocated 272

Virtual block number 238 (000000EE), 512 (0200) bytes

 7D00027F 8326F45E C42E07C6 26FC46FF FC5EC406 C4B301D8 E80EFC76 FFFE76FF .v±.v•.ÒÁ..á.á^•.F•&ó..á^¶&....) 000000
 46890E46 88037E0L 463BD8F7 02478826 0EE8D8F7 02478826 0874001D F23E8043 C.>·..t.&.G.¥ÀS.&.G.¥Â;F.-..F..F 000020
 C832189A FC76FFFE 76FF5000 30880E76 FF06C483 0196E80E FC76FFFE 76FF500E .P.v±.v•.Ò...á..v.¡0.P.v±.v•..2à 000040
 FF0C76FF 0E76FF01 1DF206C6 04EC83EC 8855C850 E5880C56 880A4688 08C48328 (.á..F..V..[]ùU.$.$.ó.·...v..v.. 000060
 83EC8855 90CB5DE5 ·B001DF2 06C6FE56 89FC4689 FE6EE80E 0676FF08 76FF0A76 v..v..v..Òn±.F•.V±ó.·...[]ù.U.$. 000080
 289EA308 C4832904 _27A9A37 FF260277 FF260477 FF260677 FF26065E C45606EC $.Vá^.&.w.&.w.&.w.&.7.z2.).á.È.+ 0000A0
 4603C028 9003E800 01880675 2D3F8326 10F4A348 02478826 289E1EC4 28A01689 ...+á..+&.G.HE¶.&.?-u.¡..$..+á.F 0000C0
 77882628 9E1EC40A C4832A04 305C9A50 520E76FF 5306FE56 89FC4689 0C56880A ..V..F•.V±.S.v.RP.\0.*.á.á..+&.w 0000E0
 7F0E4639 C688077C FCFE831D F436891D F6A2C02A 02E80180 047D10F4 36394E02 .N96¶.).¯.S.*àÂ-..6¶..±•|..69F.. 000100
 90C85DE5 885E0CC4 83F093E8 0E0676FF 0876FF0A 76FF0C76 FF0E76FF 1076FF1F ..v..v..v..v..v..v..Ò.».á.^.[]ù. 000120
 FC5EC4FA 5E8EFE5E 8CFC7689 F97500FF 7C8046FC 76C5FA5E 8C1E7400 1DF63E80 .>-..t..^*évoF.|..u°.v•.^±.^*á^• 000140
 C850E588 5E0AC483 FEF6E80E 0676FF08 76FF0A76 FF0C76FF 0E76FF00 FE47C626 &óG±..v..v..v..v..v..Ò-±.á.^.[]ù 000160
 76FF0876 FF0A76FF 0C76FF10 76FF1276 FF197545 0E7E8306 74650E7E 83EC8855 U.$.~.et..~.Eu..v..v..v..v..v..v 000180
 39E80E06 76FF0876 FF0A76FF 0C76FF10 76FF1875 660E7E83 9035E8F8 8FE80E06 ..Ò.«$S..~.fu..v..v..v..v..v..Ò9 0001A0
 5D0CC483 FEC0E80E 0676FF08 76FF0A76 FF0C76FF 1076FF12 76FFC850 0AC483FD ».á.]ù.v..v..v..v..v..v..Òä±.á.] 0001C0
 76FF0876 FF504004 C4832A1F 2FEE9A06 76FF0876 FF297400 0A7E83EC 885590C8 ù.U.$.-..t).v..v..Ÿ/.*.á.∂P.v..v 0001E0

Dump of file SATURN:[PCCOMMON.DUMP.DLL]BRDPLOW.TMP;1 on 18-APR-1990 10:38:06.00
File ID (528,44,0)   End of file block 272 / Allocated 272

Virtual block number 239 (000000EF), 512 (0200) bytes

 1EEC8855 4590D88C C888C85D 0AC48324 C4314E9A 50520856 88064603 0A468806 ..F..F..V.RP.N1á$.á.]ù.à.Ã.EU.$. 000000
 1FE58802 ED83F810 FA16891D F80E8908 E81E0A1F 7A06C708 74127703 F883088E .Ä.«.w.t.ú.z...Š...%...*.%.Ú..Ì. 000020
 D98EA5A5 FCD88EC1 8ED98CC0 8C1DFC8F F388C8F3 F60C831E 0A2D1F7A A1C84050 ]MùÁz.-..*.-µù.µ¢=..à.\.è.Á=ÈÈ.\ 000040
 89FC7588 C31DFC8E D98EA5A5 A5A5FCD8 8EC18ED9 8CC08C1D FC8FF388 C31DFC8E ƒ=.ù.µ¢•..à.\.è.Á=ÈÈÈÈ.\/•.ù.u•. 000060
 D109D1FA D1058925 747F80C2 F7025488 0C88C033 FCFC7588 03E807FE 45C6FC7D )=óE±.Š..u••3à...T.%ô..t%..|°|\| 000080
 0589C306 55893800 C2818FE6 80044089 02458908 D109D1FA D108D1D9 D1FAD108 Á|°|\|Ä|°|\|Ä.E..M..Ì..ô.8.U.ù.. 0000A0
 7E681E23 A2A3E086 580000FF FF9A5016 C48850EC 8855C306 45890445 89024589 .E..E..E.ùU.$P.á.P.....X.ÁÈÂ#.h- 0000C0
 2C5C9A50 C850E588 00018828 6F34209A 006CE800 21E80000 FFFF9A1F 7C681E1F ..h|......Òl.Òl.. 4o(¡...[]ùP.\, 0000E0
 75003080 267FFF89 1F7E068E FF33000D 881E1F84 16FF00FF 6828102C 869A2803 .+.Ñ,.+h.......£..3...-.¿..&.=.u 000100
 071E061C E8E774AE F2C03308 74CA88A6 F3C888D1 8823888E 31740030 80264701 .G&.=.t1/.#.1.ùµ|.òt.3à·ÙtôŠ.... 000120
 5200028B 00C31FED EBAAC20A 0572412C AC9204E0 C00E7241 2CAC23A9 8F1FF788 .%.¢`#¯,Ar.àÂ..¯,Ar..ô¯ŠÙ.ú.È..R 000140
 07740001 3D408112 755BC008 0000FFFF 9A521650 1653C488 508723A9 A7800488 .à.Ì`#ñP.áS.P.R......àXu.Ÿ∂=..t. 000160
 061EFFD8 33C28C28 0A06C41E E328080E 885AD479 4823A98F 08088106 75000230 =..u.Ý...`#KyÂZ...(D.á..(.ò3Ù... 000180
 BF27FC8E 007CE828 128F2812 8E28061E FF0003B8 C28C280E 06C400CA E9037328 (s.Õb.á..(.òÉ.....(ƒ.(¢.(Ò|.ƒ•'¢ 0001A0
 128ED88E 08478BC3 0000FFFF 9A28E968 0E016A08 7428163D 28128800 73E82804 .(Òs.¡.(=.(t.j..hÕ+.....ù¡G..Áƒ. 0001C0
 128E003A E828AABF 2BAA8EEC 88550000 28E49A00 6A006A03 6A0051E8 28168F28 (¢.(ÒQ.j.j.j..Õ+..U.$ƒ`+¢`+Ò:.ƒ. 0001E0

Dump of file SATURN:[PCCOMMON.DUMP.DLL]BRDPLOW.TMP;1 on 18-APR-1990 10:38:06.00
File ID (528,44,0)   End of file block 272 / Allocated 272

Virtual block number 240 (000000F0), 512 (0200) bytes

 C033001A E828168F 28168E00 23E82816 8F28168E EC885503 E80031E8 28168F28 (¢.(Ò1.Š.U.$ƒ.(¢.(Ò#.ƒ.(¢.(Ò..3à 000000
 8804EF83 0E73F738 C328061E FF00028B 07E32808 0E880000 FFFF9A50 06468A50 P.F.P........(D.£.....(ù;%s..ÿ.. 000020
 FF047400 258C3E83 28152C86 9A5000FC 88EC8855 00C3EEE8 1DFFF274 02450805 ..E.t·..$Yù.U.$¡=.P.Ñ,.+.>V%.t.. 000040
 D88E28EA 885756EC 8855FE86 E900028B C850E588 2C662C86 9A5000FF 88258A1E .α%¡..P.Ñ,f,.[]ù¡..Ò.±U.$VW¡ó+.À 000060
 5E5F96EB EBF788AE F2FFFFB9 C033970C 74964010 74C238AD 28648E06 5688C08E .á.V./d(ù;òt.∂.t..3à¿..·Û.%Š$._^ 000080
 AEF2FFFF B9C033FA 8B921F74 C0082C7A 2C869A06 76FF57EC 88550002 CA5DE588 .[]ò..U.$W.v...,z,.ât...*3à¿..¯Ù 0000A0
 000008C8 0002CA5D E588'F58 0000FFFF 9A501651 521E5300 0288C488 504901F7 %||P.áÈ..S.RQ.P.....[_.[]ò..à... 0000C0
 D1C103E0 D1C888F9 F7000C89 99085820 C388FA46 89E42A08 478A2608 5EC4 '57 WVá^.&.G.*ô.F°.ù-X..¿..%°.àlÁ.èl 0000E0
 FFFF8820 0A4F8026 085EC40F 74400A47 F6260774 830A47F6 26F84689 174C0? ? Á.L..F%&-G..t.&-G.∂t.á^.&.O. |.. 000100
 0A4F8026 90E2E800 000447C7 26200A4F 80260E74 010A47F6 26085EC4 900128E` Õ+..á^.&-G..t.&.O. &ùG...Šà.&.O. 000120
 0C89990B 5820C388 4C750C0A 47F626FC 7689F088 04478926 C02BEF0A 67802602 .&.g.ÿ+à&.G..Þ.v•&-G..uL.ù-X..¿. 000140
 08700876 810E742D 950A7E81 07750864 087E8137 7501174C 87F60608 68F9F700 .%*kÁ.-.L..u7.~.d.u..~..·t..-.p. 000160
 87E80876 FF0A76FF 0C75C008 02C4832E 08312A9A FA76FF0F 752C8C0A 7E811675 u..~..,u..v°.*1...á..âu..v..v.Òñ 000180
 174C87F6 06D868F9 F7000C89 99085820 C3881575 080A47F6 26085EC4 04C48307 ..á.á^.&-G..u.;ù-X..¿..%*kÁ.-.L. 0001A0
 F87E8802 57892607 89264008 57882606 47882606 77282637 8826085E 88677401 .tg.^.&.7&+w.&.G.&.W.∂&..&.W..-% 0001C0
 FC468908 C4832E26 36309AFA 76FF0677 FF265256 167EF608 04478926 48024588 .E.H&.G..~~.VR&.w..v°.06&..á..F• 0001E0
```

Dump of file SATURN:[PCCOMMON.DUMP.DLL]BRDPLOW.TMP;1 on 18-APR-1990 10:38:06.00
File ID (528,44,0) End of file block 272 / Allocated 272

Virtual block number 241 (000000F1), 512 (0200) bytes

```
C426085E C408C483 2E4935F2 9A53006A 006A026A 0F742023 A987F6FA 5E8819E8 $..^*-.`# t.j.j.j.S.`5[..6.6^.&6 000000
468908C4 832CC036 309AFA76 FF501606 468D5600 018E17E8 07882606 468A065F _..F.&..$./..V.F..P.v*.06a,.6..F 000020
0A478A26 065EC4F6 28560000 04C8C8C9 5F5EE42A 06468AFE CCE90374 FC7639FC =9v=t.Õä±.F.*ô^_èùà...V+-6^.&.G. 000040
01174C87 F606086B F9F7000C B9990858 20C38815 75080A47 F6265575 023C0324 $.<.uU&-G..u..û-X..¿..%*kÄ.-.L.. 000060
08478A26 0677FF26 0877FF26 50287EC0 08FC4689 06472826 07882606 5E883974 t9.^.&..&+G..F•.â~(P&.w.&.w.&.G. 000080
8826065E C4FFFFBE 200A4F80 26065EC4 0874FC46 3808C483 2D9F3630 9A50E42A *ôP.06.-.6.;F=t.6^.&.O. ƒ..6^.&. 0000A0
C08C065E C4EC8855 ~8C95EC6 88000004 47C72602 57892607 89260857 88260647 G.&.W.&..&.W.&ûG....ô^èùU.&6^..â 0000C0
2A3E831E 73FFF13D 06468857 5602EC83 EC8855C8 5DE58801 FE4F8026 0574C308 .ût.&.O±..!]ùU.&.&.VU.F.=þ.s..>* 0000E0
D09A0676 FF087500 79E80574 0018E815 750082E8 272AA312 740025E8 08750027 '.u.ÒX.t.È*'Ò..u.Ò..t.Òx.u..v..À 000100
C033FE5E 89FEE383 43065E88 0776065E 3900F088 C850E588 5E5F02C4 832E8637 7Ñ..6._^.!]ùEÞ.9^.v..^.C.D±.^±3à 000120
272EA327 2C1687C2 883874FF FA8308C4 832F3139 D49A5002 80510E4F 8D50501E .PP.O.Õ¯.P.Å91/.6..*.t8.ô..,'È.' 000140
02A30000 A3000A88 0C47894B 480008A3 C033D88E FE5E8800 08A30A8E 0574D208 .@t..ÒÈ...^±.A3âÈ..HH.G.j..È..È. 000160
68E8272E 1E8ED833 064E88C0 8ED88CC3 1F088C00 06A30000 05000AA3 01478D00 ..G.È.....È...Ä.û.Ä.â.N.3Ü...'Òh 000180
AEF2FFFF 89C033C0 8ED88CFE 880A76C5 1EDE88D7 88EC8855 C3098EC1 8CD20808 ..@.é.\ùU.&.ø.8.év..±.Ä.â3â¿..`Û 0001A0
8855C85D C28C1FFA 88F388A4 F3C913A5 F3E9D149 A4027401 A8C78806 7EC4D1F7 %16-..û`.t.È|iÔµÈ.èµÈ.µ.*..ô]ùU. 0001C0
E8067EC4 56570000 00C800C8 5DFA8891 49D1F7AE F2FFFF89 C033067E C4D788EC $.øá~.3â¿..`ÙÄ||..*]ù.à...WVá-.$ 0001E0
```

Dump of file SATURN:[PCCOMMON.DUMP.DLL]BRDPLOW.TMP;1 on 18-APR-1990 10:38:06.00
File ID (528,44,0) End of file block 272 / Allocated 272

Virtual block number 242 (000000F2), 512 (0200) bytes

```
3C2FEE9A 5706006A 006A0846 8C067E89 F2750825 C187F6D8 8898058A 26479002 ..G&....Ä-.êX.u`.-..F.j.j..W.Y/< 000000
A5A5DA8E 1E071EF0 882BA28F 0008050A C4832F50 3B6E9A57 0876FF50 04C48330 0.6.P.v.W.n;]/.6....¢Å+.Þ....ÒÈÈ 000020
5EC4FA56 89F84689 08568806 46885657 00000AC8 CBC95F5E DA8C28A2 881FA5A5 ÈÈ.¡Å+.Ò^_èùà...WV.F..V..F%.V*6^ 000040
882E7E00 0A7E8330 07C626F8 46FFF85E C4FE5689 FC468908 57882606 4788260C .&.G.&.W.¯F•.V±6^%.F%&6.0.-..-.. 000060
E2460488 30809003 E8078A26 FC46FF09 74003F80 26FC5EC4 F876C5F6 5E8C0A4E N..^-év%6^•&.?.t..F•&..$..¯0..Fâ 000080
3F8026FC 5EC4287C 000A7E83 0007C626 F85EC40A 4E89F65E 8EFA5E8C F87689E7 Ô.v%.^*.^-.N.6^%&6...-..|(6^•&.? 0000A0
26DF88FA 468CF87E 89F57439 3080264F 3005C626 9006E8F8 7EC4F84E FF1F7C35 5|..N%6-%$..&6.00&.=9t%.-%.F*.O& 0000C0
76FF5250 52400856 88064688 15E80247 FF260C5E C4097531 3F802606 5EC407FE ±.6^.&.?1u.6^.&.G.$..F..V.@RPR.v 0000E0
065E88EC 885509BA E9008357 56EC8855 000090C8 C95F5E08 C483302F 2F889A06 ..¡//0.&.^_èù...U.&VW*.Òo.U.&.^. 000100
885500C8 5DE588C0 3302E800 01880574 4023A987 F60C7C00 F883117D 23A71E38 ;.!#)..«.|¯-.`#@t.¡..$.3â.!]ù.U. 000120
0E4E8831 143AC69A 5706561E 067EC40A 76C55657 1E0085E9 0375C908 0E4E88EC &.N..èu.Òç..WVév.6~..V.W.6:.1.N. 000140
318305C0 8C0773F9 03D88EFF FF05D88C 0773F103 49507300 DA83C128 5778D208 .@xW+ê.O.sPI.þs..Ä....Ä.*s..â..1 000160
E391FCA4 F3FDC128 9140C603 C3230818 C628C703 C3230818 C72848C1 8841C08E .âA.èH+ú.Ù#ú.ú+ô.Ù#ú.ôa.+ê»µÈ•.D 000180
D78848C1 88C8E8C0 8E318920 C08CD175 FFFF8308 8E318E2D D88C0775 FFFE835C \.±.u..Ä-.1.Ä...u|.â-¿1.âSâ.èH.■ 0001A0
C913A5F3 E901C128 9143C203 C3230818 C228D2F7 D688C203 C3230818 C228D2F7 %@+ô.Ù#ú.ô.■%@+ô.Ù#ú.ôa.+èiÔµÈ.è 0001C0
1F5F5E8E E8C08E31 FC05C08C C775FF08 D88E31C5 05D88C07 75F60818 E3^`44F3 µÈ.D..-u..Ä.é1.Ä..uú.â.•1.âS/^_. 0001E0
```

Dump of file SATURN:[PCCOMMON.DUMP.DLL]BRDPLOW.TMP;1 on 18-APR-1990 1‿:38:06.00
File ID (528,44,0) End of file block 272 / Allocated 272

Virtual block number 243 (000000F3), 512 (0200) bytes

```
D3230818 D1280C74 DAF7D788 067EC457 38E30C4E 88EC8855 C85D0856 88064688 .F..V.]ùU.&.N.D8Wá-..■XÒt.+|.Ù#± 000000
D1C38E32 07C381C3 8C10E3D1 87AAF3C9 13A8F3E9 D1E08A0A 4688D128 D187D103 .1.1+1.F..ÄiÔµ`.èµ`.1D..û.û.2.û1 000020
521E5100 02890C88 5301578D E42A078A C85D0856 88064688 5FAAF3C9 13A8F3E9 Òµ`.èµ`_.F..V.]ù..*ô.W.S.È¿..Q.R 000040
A536A536 A53626CC 8F06768D C08ED88C FC5756EC 8855C858 00002CE0 9A531650 P.S.Å,..¯[ùU.$VW•.Ä.â.v.¢a&6È6È6È 000060
0255891D 89FF3226 C28FAA91 A4F39198 ACC88826 D48F5D09 8AE85526 CC8EA536 6È/a&UÒ□.]¢â&.à¯..µÈ.`¢ô&2....U. 000080
06C6C85D E588C033 EC8855C8 5DE5885E 5FC7880A 8C085D8C 26D40645 C7044D89 .M.ùÈ.â&.}..Ö.ú_^.!]ùU.$3â.!]ù6. 0000A0
E9270A8F 1F7A3688 E930E927 0A8F1F7A 3688E96A E9270A8F 1F7A3688 C80126F0 Þ&.ù.6z.¢.'Òjô.ôz.¢.'Ô=Ô.6z.¢.'Ô 0000C0
E8A2E927 0A8E1F7A 3E88E91F E9270A8E 1F7A3E88 E886E927 0A8F1F7A 3688E85D ]$.6z.¢.'ÒÑ$.>z.ƒ.'Ô.Ô.>z.ƒ.'ÒÂ$ 0000E0
1F7A3E88 270A8EC3 0875F738 1F7A3E88 C3585FA8 A8A8A81F 7A3E88FC C0335750 PW3â•.>z.``````_Xû.>z.;%u.ûƒ.'.>z. 000100
83A5A5A5 A52712BF C308EE83 A5A5A5A5 270A8F1F 7A3688C3 1F7A3688 A5A5A5A5 ÈÈÈÈ.6z.û.6z.¢.'ÈÈÈÈ.Ÿ.ù¢.'ÈÈÈÈ. 000120
8804E827 0A8EE0FF 34FF0274 FF0474FF 0674FF58 1F7A3688 04E8270A 8EC308EE Ÿ.ûƒ.'$..6z.X.t..t..t..4.Äƒ.'$.. 000140
91ADF388 A5A5A5A5 270A8F1F 7A3688E0 FF06448F 04448F02 448F048F 581F7A36 6z.X...D..D..D..Ä.6z.¢.'ÈÈÈÈ.µÙ. 000160
5EEAA0E8 270A8F1F 7A368856 511CE3A5 A5A5A51F 7A3E8817 E851ED32 0579C908 .èy.2ÙQ$..>z.ÈÈÈÈD.QV.6z.¢.'Ò.õ^ 000180
28747FF0 25E88A06 4488C3F7 881F7A3E 88E4E208 C683595E E890E81F 7A3E8856 V.>z.Ô.Ô^Y.6.âô.>z..%û.D..Ò%Þ.t+ 0001A0
10CD8008 F7D88898 E800E800 E8004107 E180C88A E8D30481 23770370 3D3FC02D -â?=p.w#Y.&Ò.â.Ä.AÄÒÄÒÄÒ..Ä%Ù.ë. 0001C0
A1C85152 E3880572 271E1E38 08720828 DC885A59 C3066C88 E0020640 8A066C86 .|..ã.@Ä.|.ûYZ.È+Ar.;..'r..DRQùÀ 0001E0
```

Dump of file SATURN:[PCCOMMON.DUMP.DLL]BRDPLOW.TMP;1 on 18-APR-1990 10:38:06.00
File ID (528,44,0)   End of file block 272 / Allocated 272

Virtual block number 244 (000000F4), 512 (0200) bytes

```
03751F7E 3639FF2L F62b5657 000014C8 271A2EFF 5152F6F2 E9C03305 7540271A .'âu.3äÕ·-RQ...'à...WV+-+.96~.u. 000000
88681EF6 76FFF876 FF0C6AF8 5689F646 89F25689 F04689C0 281F7E16 88C. ^0E9 Õþ...-.+à.Fþ.V·.F-.V%j..v%.v~.h. 000020
3F8026F6 46FFF65E C4008CE9 03767FFF FE814619 74C0080A C4833494 3A8AS ?3 #..:.4.á..ât.F.±..v.Õ¥.á^-.F-&.? 000040
6A500145 8D8A7500 3F8026F6 5E88F475 003F8026 F646FFF6 5EC40CEB 47EA75 '0 .uõG$.á^-.F-&.?.u¶.^-&.?.u□.E.Pj 000060
4688FE56 89FC4689 02C48334 092EFD9A 56EE5689 EC468904 C48334A3 397C9A04 ..|9É4.á..F$.VŸV.».14.á..F=.V±.F 000080
FFF276FF 0C6A25B1 168925AF A3EE5688 EC468866 74C208FC 46886074 EE4608EC &.ŸYtm.F=.ðtf.F$.VŸÉÉX..ŸXj..v·. 0000A0
89260789 26FE5688 FC4688EC 5EC42C74 C0080AC4 8331683A 8A9A2388 681EF076 vÞ.h.#..:k1.á..ât,á^&.F=.V±&..&. 0000C0
5EC4E8E8 0E74C00A 078826FC 46FFFC5E C4078A26 F046FFF0 5EC404EC 46830257 W..F$.á^Þ.FÞ&..á^=.F=&...ât.$Õá^ 0000E0
08588856 000006C8 90C8C95F 5EA77500 3F8026F0 5EC4F475 003F8026 F046FFF0 Þ.FÞ&.?.u¶á^Þ&.?.uÎ^_èù.à...V¦X. 000100
744004C4 8334542E 629A5306 0E74830A 47F626FA 5EC41CEB F628FC5E 8CFA4689 .F'.^=+-$.á^'&-G..t..S.b.T4.á.ât 000120
258E06FF 000004C8 90C8C95E C6880876 FA46391D 4816881D 46A10CFA 46834601 .F.F'.ÂF...H.9F'vÀ.ó^èù.à...../X 000140
020068FE 5E8CFC46 89174C05 E001C103 E001C888 F9F7000C 89990858 2004468B .F.·X..¿..X'.àiÀ.êiÀ.L..F=.^±h.. 000160
26FC5EC4 080A4F80 261174D0 08085789 26064789 26045EC4 02C48335 492EFD9A .».15.á.á^.&.G.&.W..Ât.&.O..á^=& 000180
C4085789 26064789 2640FE56 88FC4688 040A4F80 26045EC4 9021E802 000247C7 úG...$1.á^.&.O...F=.V±@&.G.&.W.á 0001A0
00000447 C7260257 89260789 26085788 26064788 26045EC4 00010247 C726FC5E ^=&úG...á^.&.G.&.W.&..&.W.&úG... 0001C0
FF53CC88 04EC8307 A6E9079A E9C03300 098A0872 23A71E38 065E88EC 8855C3C9 èúU.&.^.;.I#r.□..3äÕ..Õl..&..äS. 0001E0
```

Dump of file SATURN:[PCCOMMON.DUMP.DLL]BRDPLOW.TMP;1 on 18-APR-1990 10:38:06.00
File ID (528,44,0)   End of file block 272 / Allocated 272

Virtual block number 245 (000000F5), 512 (0200) bytes

```
00CB5DE5 88FD23A9 A78091E1 75C0855A 590000FF FF9A5116 0C76FF08 76FF0A76 v..v..v..Q.....YZ.àuÅ..]`#».[]ù. 000000
33531274 2023A987 F60759E9 C0330009 8A087223 A71E3806 5E880CEC 83EC8855 U.&.&..^.;.I#r.□..3äÕY.-.`# t.S3 000020
0856C50A 468EFA5E 8C667480 23A987F6 0003618 9A5016F4 46805141 415151C9 èQQAAQ.F¶.P..6..-.`#.tf.^'.F.éV. 000040
02EC833B 75AEF20A 8049E30C 4E88F866 89F288FA 885657FC FC4689FE 4689C033 3à.F±.F==WV.'.·.f%.N.DI¯.·Úu;.&. 000060
E90028E8 F4E2AA1A 74F83800 740A3CAC 0C4E8807 16FA8804 88E22800 808ADC88 .É□..+ã.à.'...N.¯<.t.;«t.¯ä¶Õ+.Õ 000080
0093E9FA 5E8E5F5E E1E80014 E8E2E8FC 46FF0A80 AA001FE8 0375F838 0080009A ..¯.;«u.Õ..·¯..F=$äÕ..$Å^_.^'Õ.. 0000A0
F4468051 521E5306 5E881FE3 CA28CF88 1F061E51 53503593 33FC9AFF FC887AE8 $z|=..=3.5PSQ....ü+ðÕ..^.$.RQ.F¶ 0000C0
08C4831F C3FA8858 58591F07 74D808FE 5E01F45E 881175C0 08000032 749A5016 .P.t2...àu..^¶.^±.Ut..Y(X.'ù..á. 0000E0
F6FE5E8E 26E8F900 208A03E8 001C8A08 7500098A 00013000 74006030 1874C008 .ât.=m.t.*..□..u.□..$.□ .'$&.^±- 000100
28FE4688 06E8F9C0 33001C8A 0EE8F803 751A3F80 085E880A 5E8E0E74 4023A987 .`#ät..^..^..?.u.%$.□..3à'$..F±+ 000120
C51EEEE8 C1880475 C9080C4E 880630E9 C85DE588 0472FA5E 8E5F5EF8 6688FC46 F=.f%^_.^'r..[]úÕ=..N..èu..é$Y.é 000140
8A00013D 00740060 3D1774C0 081F071E 000036F3 9A5016F4 46805152 1E530856 V.S.RQ.F¶.P.µ6......ât.=m.t.*..□ 000160
80260A88 0A744023 A987F687 75C008F4 4688C2E8 0020BAC7 E8001C8A CC750009 ..uäo..$ú□ .$õ.F¶.àu¬-.`#ät..Õ&. 000180
C850E588 01FE4F80 04740808 065E88EC 885500A3 E8C03300 1C8AA6E8 02751A3F ?.u.$[□..3ä$È.U.&.^..Ut..O±..[]ù 0001A0
A3FE2440 24E899C0 33057501 76E80005 88071E29 75003F83 27208857 56EC8855 U.$VWE '.?.u)..¦..Õv.u.3à.$$ä$±È 0001C0
0009E8C0 8ED88C06 4E882726 3689FFFE FE44C704 C6830001 04C79627 22A32720 'Ê"'.ú....ó.úD±±..6&'.N..Å.àÕ.. 0001E0
```

Dump of file SATURN:[PCCOMMON.DUMP.DLL]BRDPLOW.TMP;1 on 18-APR-1990 10:38:06.00
File ID (528,44,0)   End of file block 272 / Allocated 272

Virtual block number 246 (000000F6), 512 (0200) bytes

```
48437401 A8FE88AD FC027788 F273EEF9 83FEE180 FA744100 D0E9CB5D E5885E5F _^.[]úÕÅ.At'.Å±.'Vs·.w.=Ù.±´.tCH 000000
89F9030C 74FE88E6 E8FE4489 F7880002 05C20335 7401A8AD F0030088 1573C138 ¯ès..Å.ÞÙ´.t5.ò....%.D±$[.±t..'. 000020
7F89272E 1E8C2605 74D13820 87890A8C C688FE4C FEF90305 E8058948 C128FE4C L±+èH..$..'±L±.6.Õ¿.-;!t.&...'.. 000040
0300888C 73C13848 FE88F274 01A8ADF0 03FE8825 74FFFE30 02273206 C626C302 .ú&ó.2'.=±.t%.±.ÞÙ´.t·.±H;és¥.Å. 000060
0EFE2615 E8D88E04 74C00808 4788E6E8 FE4489F7 88000205 C203E274 01A8ADF0 ÞÙ´.tã.ó....%.D±$[.G..ât..Å$.&±. 000080
C6380068 E8C03306 778888E8 3788272A 1E8E2605 74C73838 638FD88C 12742732 2't..Äec8;út.&..*'.7$£.w.3äÕk.;6 0000A0
C1383887 89088C98 E84E4E96 0574001D E8FE40FE 0074005F E8984040 01240074 t.$.ää.Õ_.t.±M±Õ..t..NN$..Ä¿ñ8;é 0000C0
267FFF8A 414149C8 28037401 A8FE4588 51C399C0 33024789 0788272E A3260474 t.&È.'...G.3à.úQ.E±´.t.+àIAA□..& 0000E0
F7087500 0CE8C628 C22302F7 0072C203 1572C603 C188F575 EAD10476 27301638 ;.O'v.lõu%.è.ór..ór.%Ø#ò+6Õ..u.% 000100
88067789 FFFEFE44 C7F203F0 88FE8857 1874001D E85152C3 59C033E5 75EAD1D2 ØIõul3äYúRQÕ..t.W.±.Þ.·úD±±..w.. 000120
C48336D8 39D49A1F 06500001 88505252 1ED23350 53C35A59 58FE5589 4AD72806 =+=J.U±XYZúSP3Ø.RRP¡..P...å9Å6.à 000140
39A900FC 9A0676FF 006A0876 FF006A56 00000AC8 C3020802 74585A1F FFFA8308 ..'..Z[t..Øúà...Vj..v.j..v..=.¯9 000160
468902C4 8339C22E 09A56F8 7688902F E899C028 0674FFFF C2F7FA56 89F84689 .F%.V'%ò..t.+à.$/..v%V.».ó9.á..F 000180
FE5688FC 46889007 E808C483 396C3218 9A50FE76 FF006A56 1274000B FE5689FC =.V±.Ât.Vj..v±P..2[9.á.$...F=.V± 0001A0
720057E8 07754806 46880856 881F868F 3875000A 7E830657 56EC8855 90C8C95E ^èù.U.$VW..-..uß«...V..F.Hu.ÕW.r 0001C0
FE8104C6 8334735E 003EE856 0E468902 44880074 F73B1174 48238636 884CEB27 '$L.6.#Ht.;%t..D..F.VÕ>.^s4.ó..± 0001E0
```

```
Dump of file SATURN:[PCCOMMON.DUMP.DLL]BRDPLOW.TMP;1 on 18-APR-1990 10:38:06.00
File ID (528,44,0)   End of file block 272 / Allocated 272

Virtual block number 247 (000000F7), 512 (0200) bytes

 C085F958 0000FFFF 9A50C033 501652C4 885021EB 99FFFF88 0675D208 04732386 .#s..@u.|...$IP.AR.P3AP..,..[*.A 000000
 0C74024C 39F7880E 4E88CB5D E5885E5F 07C03303 88238636 89025C89 1489E675 ul...\..6.#.E3A._^.]U.N..%9L.t. 000020
 13731F80 1E390675 F738C18E D3882672 1C030A88 2CEBF9F2 752386FE 8104C683 .6..s.#u.*S,.O..r&.E.e;%u.9...s. 000040
 1E5657EC 885500C3 01880487 921F8016 890475F7 380E75C0 850000FF FF9A5153 SQ......Au8;%u.........IU.U.$WV. 000060
 C933FF44 8AA6F30A 76C5FE88 C80309F7 AEF2C033 F788067E C4D98827 E30E4E88 .N.D'.\6~..%3A UA).U.sev.u|.D.3e 000080
 88085688 06468BEC 885500C8 5DE5885F 5E1FC188 01F74949 04740477 FF453A26 &:E.w.t.II%I.e.^_.]U.U.$.F..V.. 0000A0
 7EC51E08 568B0646 880E4E88 0008CA5D E588031B 0A4628EB D3EAD3FF FFB90C5E ^.¿..EOA$+F..E.[]O...N..F..V..e- 0000C0
 92F7880A F7000283 D8F7AA20 800A7902 080E750A F9831374 C00A93FC 071E570A .W..*..At..*.u..0y.¯-`%U.0.%O.%. 0000E0
 4F0588E2 75C308C2 88AA2704 0276393C 30040387 92F1F793 F1F70274 C0080233 30.At.%p.%p..E.0<9v..'`.6.uuA..0 000100
 56880833 5756EC8E 55C850E5 885E5F1F 580A8CF2 72C73801 4480FF44 880586AC ¯...D..D.;ur .OX._^.]uU.$VW3U.V 000120
 8855C85D E5885E5F 08940C9 8005730A 76380027 C906C600 28E80127 C906C60E .6.e'.O(.6.e'.;v.s..ea.._^.]uU. 000140
 40810676 64F9830A 4E88C08E D88CFCC8 5DE5885E 5F0006E8 0E5E88D2 335756EC $VW30.^.O.._^.]u*.A.a.N..*dv.Ya 000160
 273C8F06 4E010C46 88067689 27468E0A 4E880B8E A4F32746 8F0676C5 27EBF633 3-S'ev.eF'uE.A.N./F'.v..F..N.e<' 000180
 5653C30A 8CC78806 50890445 89027589 00892734 8F0A7603 06762850 0283E855 UO..]+v..v.e4'...u..E..]..u.OuSV 0001A0
 2E048802 E88302EE 83000589 0AC3830A C6831675 C43A8080 2509478A 2E09648A .d...G.%..:6u..6..u.¿...Y..S.... 0001C0
 F4E20FD1 DDD1DAD1 D8D1E8D1 000589FF 33AD93AD 92AD95AD 56C35B5E F3E10738 ;.Au^[UVU.U.U.U3.¿..IOIUIOIIIOa¶ 0001E0

Dump of file SATURN:[PCCOMMON.DUMP.DLL]BRDPLOW.TMP;1 on 18-APR-1990 10:38:06.00
File ID (528,44,0)   End of file block 272 / Allocated 272

Virtual block number 248 (000000F8), 512 (0200) bytes

 FFFC66C3 08448906 5C890454 89026C89 3C895E03 FE2D0801 F5000130 D0D1E301 IDIA=..%IU.s.^.<.l..T..\..D.uf=. 000000
 400088C0 33300144 C60104C6 27B68EFF FDCCCCCC CCCCCCCC CD0000FF FFFFFFFF .......eaaaaaaa».fN'6..6D.03a.Aa 000020
 7FF0C1F7 20837F07 6480064C 885EA5F3 00048957 27AA8FFC C08ED88C 06C30758 [.u..A.a*e`'W¿..uE^.L..d..* %eP. 000040
 108AC888 3FFE05AD *88A8874 80A8AC27 818EFF33 FF78E853 20830279 C9080674 t..ey.*-SO(.3./Y'¯`.tE.%U.s?.Aa. 000060
 8EDFF757 13430F81 12F4E981 FA13C803 E7F69A80 0713C803 E4F64080 91E2F740 W%a. M-8.A.e¯.-O.A.*.O¶..OC.W%O/ 000080
 93AD92AD 95AD97AD 575F0442 E83C37B8 57470972 5FFF13E8 3C2D8805 B9E827AA `'O¿.E-<O.. r.GWE7<O8._WU.U.U.U. 0000A0
 13E91303 9AD68156 C480F4E2 DCD0OED1 D0D1DAD1 E8D10CE3 C033F788 D9F791AD U.%\.%3aD.ISIOIIIBAEa¶.AV.e...O. 0000C0
 D1E40000 D0030102 D1D5D106 D1E4D050 56555253 51C03200 108927B7 BFD91301 1.\en'¿..2aOSRUVPAOIeIIIeI£AAAOI 0000E0
 D5D106D1 E4D00014 D91359D1 1359E913 59F11359 E50259D0 D0030102 D1D5D106 eIIIeI£AAY.IY.bY.OY.IY.)..AOIeII 000100
 5A0001B8 0C8827B6 BE12C183 FCAEF3FD 3080494F 8DE259AA 3004D000 D3010201 IeI£AA.O`YaSOI¯O»uUe.e./N'..|..Z 000120
 120F1600 160C0808 070A0C09 0C080C07 09060005 18040203 02021601 00C3075B [.u.............................. 000140
 0A801606 09721C70 2060006C 08590057 00530052 02430041 02350212 12110010 ......S.A.C.R.S.W.Y.l.m p.r..... 000160
 E8CB5DE5 8B99FFFF 88239E16 8923A5A3 16080000 080702CE 08A40084 09820A81 ......E.6.e.....EE#...#i.....I]UO 000180
 F7E24343 1674073A 2E1875E4 0A0024B9 30548823 A5A3CB5D E58899FF FFB80008 ..|.....I]UEE#ET=¿$..Ou..:.t.CCa% 0001A0
 8030C980 58C3239E A3980147 8A2E4301 76CA3C04 728C3C43 0A76243C 0472133C <.r.<$v.C<Vr.<Ov.C..G..E.#UX.e0. 0001C0
 0205E8F8 88E17202 0CE80833 27D61E89 00ACE908 330185E8 EF88FF33 D78840C9 ea.a3..yO..3UO¯...e'3UO..rA.%O.. 0001E0

Dump of file SATURN:[PCCOMMON.DUMP.DLL]BRDPLOW.TMP;1 on 18-APR-1990 10:38:06.00
File ID (528,44,0)   End of file block 272 / Allocated 272

Virtual block number 249 (000000F9), 512 (0200) bytes

 F803588E 72D888C5 03C475D2 0827D62E F7C388EA 88F88827 0626F7C7 8850E072 rAP.uX&e'.%.O.uX.e'.@uA.e.Ar/X.% 000000
 D0A327D2 A3C03327 DA168927 08A327CE 0E89CE03 27CC3E89 FCB5E8D8 73000383 .E.sASc=.>a'.o..o'EA'..O'3aE0'EA 000020
 1C74443C 4E417401 FDE80833 00E7E89F 75080880 CD800375 01ADE891 27D4A327 'EA'.OU.u..e..Uu.OO.3UO».tAN<Dt. 000040
 C70EC980 03EB0402 C9814E27 7502742D 3C06742B 3C317400 27C93E80 1274453C <Et..>e'.t1<+t.<-t.u'N.e..S..e.u 000060
 27D83E88 DBF70275 9E5840C9 80037502 C5F60088 E8509F01 6CE84600 0027D806 .A'..FOl..PO..-e.u..eaX.u.%U.>A' 000080
 0190FF81 27DA3E28 047510C5 F627D43E 03F80330 C9800374 1872C1F7 0675FF0B ..u.%er.t..e0.«.>A'-e.u.+>O'.... 0000A0
 DE1E8827 0CA13875 5E5901AC E80027EA 06C627CC 3E880394 E827E0BE 5156507F .PVQ/A'O...>a'6.O'.O¯.Y^uBAE'..B 0000C0
 03760727 023E8380 07408004 747FF006 45F70003 83F508F7 03F71374 80C5F627 '-e.t.%E%A%.E.%E.P.t..M...>0'.v. 0000E0
 E4E80A27 D606C63F FF88C301 C980C302 CD800375 0027D23E 8327EA2E 8A08C980 .e...O'.>0'.u..e.u.e.uE.?6.e'.OO 000100
 88EF88FF 33C30FE8 DE780803 E301E301 C303E301 02CD80ED 770CCCF8 81177200 .r..«a.wU.e.ID.uIDID.AxBSOu3..y. 000120
 88E8E572 1999FF81 00078300 05830003 83000358 008AE850 28720006 E8D788OF O.eOe.r(PO..X.A.E..f..e.....rIOE 000140
 F6177480 C7F61675 27D40608 C508C788 EEE827D4 06FF01CA 800374C0 0A007200 .r..at..O...A'SY.u.e..A'u.-u.t.- 000160
 C78827DE 1E8927DC 168920C9 8010C980 06E80575 D2080975 8000F881 0F7[illegible]0C5 e.t..«..u..@u.S..e..e ..E'..B'.u 000180
 E8480678 FF0B0040 88F1E827 040EFF00 25E80973 1999FF81 1C74C208 C30B[illegible]08 .e.u.ot.....s.OX...A'Sp|a...x.HO 0001A0
 08E8000E E8C28853 5557C35E A892A896 A895A893 A89227E0 8FF78856 F6EB0[illegible]A *.S-V.%eA'.........^uAUS.OO..O. 0001C0
 283C0674 203C0874 005EE8C3 D7D1D5D1 D301E2D1 F81358E8 13580813 58000300 ..AX.AX.OX.%IaI£IIIeuO^.t.<-t.<+ 0001E0
```

```
Dump of file SATURN:[PCCOMMON.DUMP.DLL]BRDPLOW.TMP;1 on 18-APR-1990 10:38:06.00
File ID (528,44,0)   End of file block 272 / Allocated 272

Virtual block number 250 (000000FA), 512 (0200) bytes

740037E8 1DEB397D 27D6063A 072C027E 093C4572 302C4A74 004EE8C3 4E460175 u.FNüÒN.tJ,0rE<.-.,.:.#')9$.Ò7.t 000000
C3E43227 0206FF08 CD8027D4 0EFF0E74 10C5F626 77093C2A 72302C20 742E3C33 3<.t ,0r*<.w&-é.t...å'.ë...@'2öü 000020
C83E80AC 237327CE 3638C3F9 4EC9EB10 CD8027D0 06FF0975 10C5F6F4 EB20CD80 .ë $¶-é.u...Å'.è.ŠèN*ü;6ö's#".>à 000040
32C35F24 02777A3C 0672613C E274003C E6740A3C EA74093C EE74203C 10740027 '.t.< tÝ<.tö<.t]<.tâ<ar.<zw.$ û2 000060
DFD1E8D1 E7D13E78 03FE05AD 4974C208 C108C508 F888AD95 AD91AD92 AD57C3C0 àÚAÙ.Ù.Ù.Ù.%.é.è.ðtÏÙ.±.x>1ó1ó1ó 000080
13F58001 FA81F633 D30AD922 43F075C8 FED70000 D1D7D105 D1D101E2 D100058B £..1àl1111m1ÀÂm±ùUÞC").Æ3-.*..%. 0000A0
88C03301 27EA0E80 0FE80007 80F57FF0 300E74FF F0A90007 80C613FE 13EE13CE ö.Ÿ.±.ó.m.`Þ.t.=Þ.%.m.Š...ð'.3à. 0000C0
FD880008 8927ECBD C3FF0A06 45890475 89026089 00895FF7 88F888E8 88C888D8 Ä.à.Ò.%.%_...m..u..E...ü§å'¿...» 0000E0
C8889804 0408F6C4 2AC42AE0 22C72800 04880007 8F084401 0847882E A8F3C033 3àµ¨..G..D̄.¢..|..+ü"Â*6*6-Ä....à 000100
56833E02 56113E00 46013E27 F72E0488 06C683F7 28F10308 C3830F28 D9285653 SV+)+Ô.ü..þ+¥.ó....%'>.F.>.V.>.V 000120
0AC808AD C808AD91 ADF5870E ED838C75 4F02C583 585EE6E2 02C38302 EE830004 ...Ÿ..ü.âl^[.é.Ou¥.Ù..%Ù.Ù.àÙ.à. 000140
8D0001D3 01D1D107 D1E2D108 4CFF0078 C008F588 AD93AD91 AD97ADD1 0A92ADCD eÙ..1Ù.Ù.Ù.Ù.%.àx..L.1ãlalïïÆïÂ§ 000160
3C89C508 CDD1086C 01D5D1C5 13DD13CD 13FD13F5 8001FA81 ED33D508 EF230001 ..#y.(3Ù.*..%.».ë.ì.éíí.l.le.é.< 000180
00000007 C8000000 00000000 0004A000 00000000 0000C306 4489045C 89024C89 .L..\..D.ù.................à.... 0001A0
28708S9E 00368E18 C98F0400 0000001B 8E8C2000 00000000 000E9C40 00000000 ....ä........ ¥/......éè..6..çp+ 0001C0
E8F890F9 DE8E01AA 938A47C9 80E98CE0 0005C278 1F49FFCF A6D5006B 9DC5ADA8 ¨Ùé.k.ílù.l.xöî.Å.Ô.èGa.¯..B'.«$ 0001E0

Dump of file SATURN:[PCCOMMON.DUMP.DLL]BRDPLOW.TMP;1 on 18-APR-1990 10:38:06.00
File ID (528,44,0)   End of file block 272 / Allocated 272

Virtual block number 251 (000000FB), 512 (0200) bytes

01B71758 E219652C FFFAA3D7 0A3D70A3 D70AFFFD CCCCCCCC CCCCCCCD 0353AA7E -¨S.eàààààà»..æEp=.æE*.,e.ãX.ñ1 000000
FF96CF81 1EAD4539 94BAFFC8 E69594BE C440E158 FFE6A8CC 77118461 CEFDFFF3 µ.»öa..wa¨|.(ÄMá/..lù.¤.9EÙ.Ýü.. 000020
8ABBFCAE CD314325 637A193A FE57DDD0 467C648C E4A1FF2C A87FEA27 A539E9A5 ÈÒ9E'ð.´,.ÀÒ¥d|FÄÍW±:.zcXC1âÜ«E¤ 000040
E8585FFE 78E85753 F573E°D1 0D74FF08 0AC3830A E8830FF7 4214BB05 79FF0841 A..y.È.B%Ô.$..ù...t.ïys%SWÒ(±_[$ 000060
3A280103 00070002 28FE0103 00050002 2C360103 02C80007 377C0203 0000C3EC ¢ù....|7..ù...6,......±+......(: 000080
365C0103 00880002 32480105 00870002 3AD30105 00260002 3A730103 0022..02 ..".....s:..&...Æ:.......K2......\6 0000A0
2AF60103 00000019 38EC0002 00400002 28800103 00000017 398E0002 003A00.. ..:.....9.......+..M...$8.......-" 0000C0
54206E75 5220534D 00000000 00000000 00000000 005C0002 2AE30103 005B000. ..(...D*..\.............MS Run-T 0000E0
38383931 20296328 20746867 69727970 6F432020 20797261 7262694C 20656069 ime Library - Copyright (c) 1988 000100
00000000 00000000 00000000 00010011 70726F43 2074666F 736F7263 694D202C , Microsoft Corp................ 000120
00000000 00000000 00000000 00000000 00000000 00000000 00000000 00000000 ................................ 000140
00000000 00000000 00000000 00000000 00000000 00000000 00000000 00000000 ................................ 000160
0000000F 0000000F 00000005 00000005 00000014 00000014 00000001 00000000 ................................ 000180
00000000 00000000 00000001 00050004 00030002 00060001 00000014 00000014 ................................ 0001A0
00000000 00000000 00000000 00000000 00000000 00000000 00000000 00000001 ................................ 0001C0
00000000 00000000 00000000 00000000 00000000 00000000 00000000 00000000 ................................ 0001E0

Dump of file SATURN:[PCCOMMON.DUMP.DLL]BRDPLOW.TMP;1 on 18-APR-1990 10:38:06.00
File ID (528,44,0)   End of file block 272 / Allocated 272

Virtual block number 252 (000000FC), 512 (0200) bytes

00000000 00000000 0000FFFF FFFFFFFF FFFFFFFF FFFFFFFF FFFF0000 00000000 ................................ 000000
00000000 00000000 00000000 00000000 00000000 00000000 00000000 00000000 ................................ 000020
00010000 FFFF0000 00000001 00000000 00000000 00010000 00000000 00000000 ................................ 000040
00000000 00020008 00040002 0001FFFF FFFFFFFF 0003FFFF FFFFFFFF 0002FFFF ................................ 000060
00000000 00000000 00000000 00000000 00000000 00000000 00000000 00000000 ................................ 000080
00000000 00000000 00000000 00000000 00000000 00000000 00000000 00000000 ................................ 0000A0
00000001 00000000 00000000 00040000 00000000 00000000 00000000 00000008 ................................ 0000C0
00080008 00080008 00080004 00040004 00080002 00010008 00000000 00000001 ................................ 0000E0
005AFFA6 00840000 00000000 00000003 00000000 00000002 00000001 00000000 ............................Ç.Ì.Z. 000100
00000001 00000000 00000084 005AFFA6 00840000 FFA6005A FFA6005A 00000084 Ç...Z.Ì.Z.Ì...Ç.Ì.Z.Ç.......... 000120
00000000 00000003 00000000 00010000 00000000 00000001 00010000 00000000 ................................ 000140
00000000 00000000 00000000 00000000 0000FFFF FFFF0000 00000000 00000000 ................................ 000160
00000000 00000000 00050000 00000001 00000000 00010000 00000000 00000000 ................................ 000180
00000000 00000000 00000000 00000000 00000000 00000000 0000FFFF 00000000 ................................ 0001A0
00000000 00000000 00000000 00000000 00000006 00000000 00010000 00010000 ................................ 0001C0
00000001 00000000 00000000 00000000 00000000 00000000 00000000 00000000 ................................ 0001E0
```

```
Dump of file SATURN:[PCCOMMON.DUMP.DLL]BRDPLOW.TMP;1 on 18-APR-1990 10:38:06.00
File ID (528,44,0)    End of file block 272 / Allocated 272

Virtual block number 253 (000000FD), 512 (0200) bytes

00000000 00000000 00000003 00020000 00020001 00080004 00000000 00000000 ................................ 000000
00000000 00000000 FFFF0000 00010003 00020004 0005FFFF 00000000 00000001 ................................ 000020
00000002 00000001 00000000 000BFFFF FFFF0000 0000FFFF FFFF0000 00000000 ................................ 000040
000A0006 00050005 00040003 FFFFFFFF 00000020 00000010 00000008 00000004 ................................ 000060
00080001 00040000 00000000 00000000 00000000 00000001 00080002 00040009 ................................ 000080
775C6372 735C3133 30306A6F 72705C6A 6F72705C 3A710001 00010000 00000002 ..........q:\proj\proj0031\src\w 0000A0
6A6F7270 5C3A7100 45534C41 4600632E 65636E65 665C776F 6C706472 625C6D73 sm\brdplow\fence.c.FALSE.q:\proj 0000C0
2E65636E 65665C77 6F6C7064 72625C6D 73775C63 72735C31 3330306A 6F72705C \proj0031\src\wsm\brdplow\fence. 0000E0
6073775C 6372735C 31333030 6A6F7270 5C6A6F72 705C3A71 0045534C 41460063 c.FALSE.q:\proj\proj0031\src\wsm 000100
705C6A6F 72705C3A 71004553 4C414600 632E6563 6E65665C 776F6C70 6472625C \brdplow\fence.c.FALSE.q:\proj\p 000120
00632E65 636E6566 5C776F6C 70647262 5C6D7377 5C637273 5C313330 306A6F72 roj0031\src\wsm\brdplow\fence.c. 000140
625C6D73 775C6372 735C3133 30306A6F 72705C6A 6F72705C 3A710045 534C4146 FALSE.q:\proj\proj0031\src\wsm\b 000160
6F72705C 6A6F7270 5C3A7100 45534C41 4600632E 65636E65 665C776F 6C706472 rdplow\fence.c.FALSE.q:\proj\pro 000180
41460063 2E65636E 65665C77 6F6C7064 72625C6D 73775C63 72735C31 3330306A j0031\src\wsm\brdplow\fence.c.FA 0001A0
6472625C 6073775C 6372735C 31333030 6A6F7270 5C6A6F72 705C3A71 004.~34C LSE.q:\proj\proj0031\src\wsm\brd 0001C0
306A6F72 705C6A6F 72705C3A 71004553 4C414600 632E6563 6E65665C 776F6.70 plow\fence.c.FALSE.q:\proj\proj0 0001E0

Dump of file SATURN:[PCCOMMON.DUMP.DLL]BRDPLOW.TMP;1 on 18-APR-1990 10:38:06.00
File ID (528,44,0)    End of file block 272 / Allocated 272

Virtual block number 254 (000000FE), 512 (0200) bytes

534C4146 00632E65 636E6566 5C776F6C 70647262 5C6D7377 5C637273 5C313330 031\src\wsm\brdplow\fence.c.FALS 000000
6C706472 625C6D73 775C6372 735C3133 30306A6F 72705C6A 6F72705C 3A710045 E.q:\proj\proj0031\src\wsm\brdpl 000020
45202D20 00786C25 2065636E 65460A00 45534C41 4600632E 65636E65 665C776F ow\fence.c.FALSE..Fence %lx. - E 000040
20736920 746E6574 7845202D 20006465 6E696665 646E5520 73692074 6E657478 xtent is Undefined. - Extent is  000060
66654C20 2020200A 00646C25 20646C25 202C646C 2520646C 25202959 58595828 (XYXY) %ld %ld, %ld %ld..    Lef 000080
203A7468 67695220 2020200A 00203A6D 6F74746F 42202020 200A0020 20203A74 t:  ..    Bottom: ..    Right:  0000A0
30306A6F 72705C6A 6F72705C 3A71000A 00202020 203A706F 54202020 200A0020 ..    Top:    ...q:\proj\proj00 0000C0
20737473 6F700063 2E74736F 705C776F 6C706472 625C6D73 775C6372 735C3133 31\src\wsm\brdplow\post.c.posts  0000E0
775C6372 735C3133 30306A6F 72705C6A 6F72705C 3A71004C 4C554E20 4C51454E NEQL NULL.q:\proj\proj0031\src\w 000100
6F707020 4C514520 7374736F 70280063 2E74736F 705C776F 6C706472 625C6D73 sm\brdplow\post.c.(posts EQL ppo 000120
45783E20 74726174 5374736F 70702030 3E207828 20524F20 29747261 74537473 stStart) OR (x >= ppostStart->xE 000140
72625C6D 73775C63 72735C31 3330306A 6F72705C 6A6F7270 5C3A7100 29656764 dge).q:\proj\proj0031\src\wsm\br 000160
5C3A7100 4C4C554E 204C5145 4E207374 736F7000 632E7473 6F705C77 6F6C7064 dplow\post.c.posts NEQL NULL.q:\ 000180
6F705C77 6F6C7064 72625C6D 73775C63 72735C31 3330306A 6F72705C 6A6F7270 proj\proj0031\src\wsm\brdplow\po 0001A0
72705C3A 71004C4C 554E204C 51452065 67644578 3E2D7374 736F7000 632E7473 st.c.posts->xEdge EQL NULL.q:\pr 0001C0
74736F70 5C776F6C 70647262 5C6D7377 5C637273 5C313330 306A6F72 705C6A6F oj\proj0031\src\wsm\brdplow\post 0001E0

Dump of file SATURN:[PCCOMMON.DUMP.DLL]BRDPLOW.TMP;1 on 18-APR-1990 10:38:06.00
File ID (528,44,0)    End of file block 272 / Allocated 272

Virtual block number 255 (000000FF), 512 (0200) bytes

6F72705C 3A71004C 4C554E20 4C514520 65756C61 56793E2D 7374736F 7000632E .c.posts->yValue EQL NULL.q:\pro 000000
2E74736F 705C776F 6C706472 625C6D73 775C6372 735C3133 30306A6F 72705C6A j\proj0031\src\wsm\brdplow\post. 000020
5C313330 306A6F72 705C6A6F 72705C3A 7100666E 4959663E 2D737473 6F700063 c.posts->fYInf.q:\proj\proj0031\ 000040
51454E20 7374736F 7000632E 74736F70 5C776F6C 70647262 5C6D7377 5C637273 src\wsm\brdplow\post.c.posts NEQ 000060
5C6D7377 5C637273 5C313330 306A6F72 705C6A6F 72705C3A 71004C4C 554E204C L NULL.q:\proj\proj0031\src\wsm\ 000080
71004C4C 554E204C 51454E20 7374736F 7000632E 74736F70 5C776F6C 70647262 brdplow\post.c.posts NEQL NULL.q 0000A0
5C776F6C 70647262 5C6D7377 5C637273 5C313330 306A6F72 705C6A6F 72705C3A :\proj\proj0031\src\wsm\brdplow\ 0000C0
5C313330 306A6F72 705C6A6F 72705C3A 71004878 203C204C 7800632E 74736F70 post.c.xL < xH.q:\proj\proj0031\ 0000E0
6C6C6F43 7374736F 7000632E 74736F70 5C776F6C 70647262 5C6D7377 5C637273 src\wsm\brdplow\post.c.postsColl 000100
735C3133 30306A6F 72705C6A 6F72705C 3A71004C 4C554E20 4C51454E 20746365 ect NEQL NULL.q:\proj\proj0031\s 000120
4E206464 41737473 6F700063 2E74736F 705C776F 6C706472 625C6D73 775C6372 rc\wsm\brdplow\post.c.postsAdd N 000140
73775C63 72735C31 3330306A 6F72705C 6A6F7270 5C3A7100 4C4C554E 204C5145 EQL NULL.q:\proj\proj0031\src\ws 000160
4C4C554E 204C5145 4E207374 736F7000 632E7473 6F705C77 6F6C7064 72625C6D m\brdplow\post.c.posts NEQL NULL 000180
6F6C7064 72625C6D 73775C63 72735C31 3330306A 6F72705C 6A6F7270 5C3A7100 .q:\proj\proj0031\src\wsm\brdplo 0001A0
3330306A 6F72705C 6A6F7270 5C3A7100 4878203C 204C7800 632E7473 6F705C77 w\post.c.xL < xH.q:\proj\proj003 0001C0
4E207374 736F7000 632E7473 6F705C77 6F6C7064 72625C6D 73775C63 72735C31 1\src\wsm\brdplow\post.c.posts N 0001E0
```

```
Dump of file SATURN:[PCCOMMON.DUMP.DLL]BRDPLOW.TMP;1 on 18-APR-1990 10:38:06.00
File ID (528,44,0)    End of file block 272 / Allocated 272

Virtual block number 256 (00000100), 512 (0200) bytes

73775C63 72735C31 3330306A 6F72705C 6A6F7270 5C3A7100 4C4C554E 204C5145 EQL NULL.q:\proj\proj0031\src\ws 000000
4C554E20 4C51454E 20327374 736F7000 632E7473 6F705C77 6F6C7064 72625C6D m\brdplow\post.c.posts2 NEQL NUL 000020
6C706472 625C6D73 775C6372 735C3133 30306A6F 72705C6A 6F72705C 3A71004C L.q:\proj\proj0031\src\wsm\brdpl 000040
6F72705C 3A71004C 4C554E20 4C51454E 20737473 6F700063 2E74736F 705C776F ow\post.c.posts NEQL NULL.q:\pro 000060
2E74736F 705C776F 6C706472 625C6D73 775C6372 735C3133 30306A6F 72705C6A j\proj0031\src\wsm\brdplow\post. 000080
775C6372 735C3133 30306A6F 72705C6A 6F72705C 3A710048 78203C20 4C780063 c.xL < xH.q:\proj\proj0031\src\w 0000A0
4C554E20 4C51454E 20737473 6F700063 2E74736F 705C776F 6C706472 625C6D73 sm\brdplow\post.c.posts NEQL NUL 0000C0
6C706472 625C6D73 775C6372 735C3133 30306A6F 72705C6A 6F72705C 3A71004C L.q:\proj\proj0031\src\wsm\brdpl 0000E0
3A71004C 4C554E20 4C51454E 20686361 50737473 6F700063 2E74736F 705C776F ow\post.c.postsPack NEQL NULL.q: 000100
705C776F 6C706472 625C6D73 775C6372 735C3133 30306A6F 72705C6A 6F72705C \proj\proj0031\src\wsm\brdplow\p 000120
74736F70 20444E41 20294C4C 554E204C 51454E20 7374736F 70280063 2E74736F ost.c.(posts NEQL NULL) AND post 000140
2500202C 646C2520 28002920 69632520 2C692020 28205800 666E4959 663E2073 s->fYInf.[ ( -i, %ci ).( %ld, .% 000160
47440002 00010001 00020008 00040004 00080050 20002920 646C2500 29206963 ci ).%ld ). ]..................DG 000180
00002170 6F6F6C20 7373656C 646E6520 6E490065 74756F52 20646E69 46203A4D M: Find Route.In endless loop!.. 0001A0
47440000 00000000 00000000 00000000 00000000 00000000 00000000 00000000 ..............................DG 0001C0
73656C64 6E65206E 49007374 6E696172 74736E6F 43206563 726F666E 45203A4D M: Enforce Constraints.In endles 0001E0

Dump of file SATURN:[PCCOMMON.DUMP.DLL]BRDPLOW.TMP;1 on 18-APR-1990 10:38:06.00
File ID (528,44,0)    End of file block 272 / Allocated 272

Virtual block number 257 (00000101), 512 (0200) bytes

1C481933 0B26248A 0B2223AA 0B1E24DE 0B1A2420 FFFF2990 0021706F 6F6C2073 s loop!..).. $..8$_.`#".¤$&.3.H. 000000
00747271 73040000 18D71884 1E801819 1E821818 1E4F1A95 1C231929 1C25192B +.%.).#...O...ÿ...¯...■....sqrt. 000020
01020000 00000000 00000000 0001FFFF 00000000 0B600000 3FF00000 00000000 ......b?..`....................... 000040
00000000 00000000 00000000 00000000 00000000 02020000 00000000 00000000 ................................ 000060
00000000 00000000 00000000 00000000 00000000 00000000 00000000 00000000 ................................ 000080
00000000 00000000 00000000 00000000 00000000 00000000 00000000 00000000 ................................ 0000A0
00000000 00000000 00000000 00000000 00000000 00000000 00000000 00000000 ................................ 0000C0
00000000 00000000 00000000 00000000 00000000 00000000 00000000 00000000 ................................ 0000E0
00000000 00000000 00000000 00000000 00000000 00000000 00000000 00000000 ................................ 000100
00000000 00000000 00000000 00000000 00000000 00000000 00000000 00000000 ................................ 000120
00000000 00000000 00000000 00000000 00000000 00000000 00000000 00000000 ................................ 000140
00000000 00000000 00000000 00000000 00000000 00000000 00000000 00000000 ................................ 000160
00000000 00000000 00000000 00000000 00000000 00000000 00000000 00000000 ................................ 000180
00000000 00000000 00000000 00000000 00000000 00000000 00000000 00000000 ................................ 0001A0
00000000 00000000 00000000 00000000 00000000 00000000 00000000 00000000 ................................ 0001C0
00000000 00000000 00000000 00000000 00000000 00000000 00000000 00000000 ................................ 0001E0

Dump of file SATURN:[PCCOMMON.DUMP.DLL]BRDPLOW.TMP;1 on 18-APR-1990 10:38:06.00
File ID (528,44,0)    End of file block 272 / Allocated 272

Virtual block number 258 (00000102), 512 (0200) bytes

00000000 00000000 00000000 00000000 00000000 00000000 00000000 00000000 ................................ 000000
00000000 00000000 00000000 00000000 00000000 00000000 00000000 00000000 ................................ 000020
00000000 00000000 00000000 00000000 00000000 00000000 00000000 00000000 ................................ 000040
00000000 00000000 00000000 00000000 00000000 00000000 00000000 00000000 ................................ 000060
00000000 00000000 00000000 00000000 00000000 00000000 00000000 00000000 ................................ 000080
00000000 00000000 00000000 00000000 00000000 00000000 00000000 00000000 ................................ 0000A0
00000000 00000000 00000000 00000000 00000000 00000000 00000000 00000000 ................................ 0000C0
00000000 00000000 00000000 00000000 00000000 00000000 00000000 00000000 ................................ 0000E0
00000000 00000000 00000000 00000000 00000000 00000000 00000000 00000000 ................................ 000100
00000000 00000000 00000000 00000000 00000000 00000000 00000000 00000000 ................................ 000120
00000000 00000000 00000000 00000000 00000000 00000000 00000000 00000000 ................................ 000140
00000000 00000000 00000000 00000000 00000000 00000000 00000000 00000000 ................................ 000160
00000000 00000000 0:000000 00000000 00000000 00000000 00000000 00000000 ................................ 000180
00000000 00000000 00000000 00000000 00000000 00000000 00000000 00000000 ................................ 0001A0
00000000 00000000 00J00000 00000000 00000000 00000000 00000000 00000000 ................................ 0001C0
00000000 00000000 00000000 00000000 00000000 00000000 00000000 00000000 ................................ 0001E0
```

```
Dump of file SATURN:[PCCOMMON.DUMP.DLL]BRDPLOW.TMP;1 on 18-APR-1990 10:38:06.00
File ID (528,44,0)   End of file block 272 / Allocated 272

Virtual block number 259 (00000103), 512 (0200) bytes

00000000 00000000 00000000 00000000 00000000 00000000 00000000 00000000 ................................ 000000
00000000 00000000 00000000 00000000 00000000 00000000 00000000 00000000 ................................ 000020
00000000 00000000 00000000 00000000 00000000 00000000 00000000 00000000 ................................ 000040
00000000 00000000 00000000 00000000 00000000 00000000 00000000 00000000 ................................ 000060
00000000 00000000 00000000 00000000 00000000 00000000 00000000 00000000 ................................ 000080
00000000 00000000 00000000 00000000 00000000 00000000 00000000 00000000 ................................ 0000A0
00000000 00000000 00000000 00000000 00000000 00000000 00000000 00000000 ................................ 0000C0
00000000 00000000 00000000 00000000 00000000 00000000 00000000 00000000 ................................ 0000E0
00000000 00000000 00000000 00000000 00000000 00000000 00000000 00000000 ................................ 000100
00000000 00000000 00000000 00000000 00000000 00000000 00000000 00000000 ................................ 000120
00000000 00000000 00000000 00000000 00000000 00000000 00000000 00000000 ................................ 000140
00000000 00000000 00000000 00000000 00000000 00000000 00000000 00000000 ................................ 000160
00000000 00000000 00000000 00000000 00000000 00000000 00000000 00000000 ................................ 000180
00000000 00000000 00000000 00000000 00000000 00000000 00000000 00000000 ................................ 0001A0
00000000 00000000 00000000 00000000 00000000 00000000 00000000 00000000 ................................ 0001C0
00000000 00000000 00000000 00000000 00000000 00000000 00000000 00000000 ................................ 0001E0

Dump of file SATURN:[PCCOMMON.DUMP.DLL]BRDPLOW.TMP;1 on 18-APR-1990 10:38:06.00
File ID (528,44,0)   End of file block 272 / Allocated 272

Virtual block number 260 (00000104), 512 (0200) bytes

00000000 00000000 00000000 00000000 00000000 00000000 00000000 00000000 ................................ 000000
00000000 00000000 00000000 00000000 00000000 00000000 00000000 00000000 ................................ 000020
00000000 00000000 00000000 00000000 00000000 00000000 00000000 00000000 ................................ 000040
00000000 00000000 00000000 00000000 00000000 00000000 00000000 00000000 ................................ 000060
00000000 00000000 00000000 00000000 00000000 00000000 00000000 00000000 ................................ 000080
00000000 00000000 00000000 00000000 00000000 00000000 00000000 00000000 ................................ 0000A0
00000000 00000000 00000000 00000000 00000000 00000000 00000000 00000000 ................................ 0000C0
00000000 00000000 00000000 00000000 00000000 00000000 00000000 00000000 ................................ 0000E0
00000000 00000000 00000000 00000000 00000000 00000000 00000000 00000000 ................................ 000100
00000000 00000000 00000000 00000000 00000000 00000000 00000000 00000000 ................................ 000120
00000000 00000000 00000000 00000000 00000000 00000000 00000000 00000000 ................................ 000140
00000000 00000000 00000000 00000000 00000000 00000000 00000000 00000000 ................................ 000160
00000000 00000000 00000000 00000000 00000000 00000000 00000000 00000000 ................................ 000180
00000000 00000000 00000000 00000000 00000000 00000000 00000000 00000000 ................................ 0001A0
00000000 00000000 00000000 00000000 00000000 00000000 00000000 00000000 ................................ 0001C0
00000000 00000000 00000000 00000000 00000000 00000000 00000000 00000000 ................................ 0001E0

Dump of file SATURN:[PCCOMMON.DUMP.DLL]BRDPLOW.TMP;1 on 18-APR-1990 10:38:06.00
File ID (528,44,0)   End of file block 272 / Allocated 272

Virtual block number 261 (00000105), 512 (0200) bytes

00000000 00000000 00000000 00000000 00000000 00000000 00000000 00000000 ................................ 000000
00000000 00000000 00000000 00000000 00000000 00000000 00000000 00000000 ................................ 000020
00000000 00000000 00000000 00000000 00000000 00000000 00000000 00000000 ................................ 000040
00000000 00000000 00000000 00000000 00000000 00000000 00000000 00000000 ................................ 000060
00000000 00000000 00000000 00000000 00000000 00000000 00000000 00000000 ................................ 000080
00000000 00000000 00000000 00000000 00000000 00000000 00000000 00000000 ................................ 0000A0
00000000 00000000 00000000 00000000 00000000 00000000 00000000 00000000 ................................ 0000C0
00000000 00000000 00000000 00000000 00000000 00000000 00000000 00000000 ................................ 0000E0
00000000 00000000 00000000 00000000 00000000 00000000 00000000 00000000 ................................ 000100
00000000 00000000 00000000 00000000 00000000 00000000 00000000 00000000 ................................ 000120
00000000 00000000 00000000 00000000 00000000 00000000 00000000 00000000 ................................ 000140
00000000 00000000 00000000 00000000 00000000 00000000 00000000 00000000 ................................ 000160
00000000 00000000 00000000 00000000 00000000 00000000 00000000 00000000 ................................ 000180
00000000 00000000 00000000 00000000 00000000 00000000 00000000 00000000 ................................ 0001A0
00000000 00000000 00000000 00000000 00000000 00000000 00000000 00000000 ................................ 0001C0
00000000 00000000 00000000 00000000 00000000 00000000 00000000 00000000 ................................ 0001E0
```

```
Dump of file SATURN:[PCCOMMON.DUMP.DLL]BRDPLOW.TMP;1 on 18-APR-1990 10:38:06.00
File ID (528,44,0)   End of file block 272 / Allocated 272

Virtual block number 262 (00000106), 512 (0200) bytes

00000000 00000000 00000000 00000000 00000000 00000000 00000000 00000000 ................................ 000000
00000000 00000000 00000000 00000000 00000000 00000000 00000000 00000000 ................................ 000020
00000000 00000000 00000000 00000000 00000000 00000000 00000000 00000000 ................................ 000040
00000000 00000000 00000000 00000000 00000000 00000000 00000000 00000000 ................................ 000060
00000000 00000000 00000000 00000000 00000000 00000000 00000000 00000000 ................................ 000080
00000000 00000000 00000000 00000000 00000000 00000000 00000000 00000000 ................................ 0000A0
00000000 00000000 00000000 00000000 00000000 00000000 00000000 00000000 ................................ 0000C0
00000000 00000000 00000000 00000000 00000000 00000000 00000000 00000000 ................................ 0000E0
00000000 00000000 00000000 00000000 00000000 00000000 00000000 00000000 ................................ 000100
00000000 00000000 00000000 00000000 00000000 00000000 00000000 00000000 ................................ 000120
00000000 00000000 00000000 00000000 00000000 00000000 00000000 00000000 ................................ 000140
00000000 00000000 00000000 00000000 00000000 00000000 00000000 00000000 ................................ 000160
00000000 00000000 00000000 00000000 00000000 00000000 00000000 00000000 ................................ 000180
00000000 00000000 00000000 00000000 00000000 00000000 00000000 00000000 ................................ 0001A0
00000000 00000000 00000000 00000000 00000000 00000000 00000000 00000000 ................................ 0001C0
00000000 00000000 00000000 00000000 00000000 00000000 00000000 00000000 ................................ 0001E0

Dump of file SATURN:[PCCOMMON.DUMP.DLL]BRDPLOW.TMP;1 on 18-APR-1990 10:38:06.00
File ID (528,44,0)   End of file block 272 / Allocated 272

Virtual block number 263 (00000107), 512 (0200) bytes

00000000 00000000 00000000 00000000 00000000 00000000 00000000 00000000 ................................ 000000
02000001 00000000 00000000 00000000 00000000 00000000 00000000 00000000 ................................ 000020
00000000 00000000 00000000 00000000 00000000 00000000 00000000 00000000 ................................ 000040
00000000 00000000 00000000 00000000 00000000 00000000 00000000 00000000 ................................ 000060
00000000 00000000 00000000 00000000 00000000 00000000 00000000 00000000 ................................ 000080
00000000 00000000 00000000 00000000 00000000 00000000 00000000 00000000 ................................ 0000A0
00000000 00000000 00000000 00000000 00000000 00000000 00000000 00000000 ................................ 0000C0
00000000 00000000 00000000 00000000 00000000 00000000 00000000 00000000 ................................ 0000E0
00000000 00000000 00000000 00000000 00000000 00000000 00000000 00000000 ................................ 000100
00000000 00000000 00000000 00000000 00000000 00000000 00000000 00000000 ................................ 000120
00000000 00000000 00000000 00000000 00000000 00000000 00000000 00000000 ................................ 000140
00000000 00000000 00000000 00000000 00000000 00000000 00000000 00000000 ................................ 000160
00000000 00000000 00000000 00000000 00000000 00000000 00000000 00000000 ................................ 000180
00000000 00000000 00000000 00000000 00000000 00000000 00000000 00000000 ................................ 0001A0
00000000 00000000 00000000 00000000 00000000 00000000 00000000 00000000 ................................ 0001C0
00000000 00000000 00000000 00000000 00000000 00000000 00000000 00000000 ................................ 0001E0

Dump of file SATURN:[PCCOMMON.DUMP.DLL]BRDPLOW.TMP;1 on 18-APR-1990 10:38:06.00
File ID (528,44,0)   End of file block 272 / Allocated 272

Virtual block number 264 (00000108), 512 (0200) bytes

00000000 00000000 00000000 00000000 00000000 00000000 00000000 00000000 ................................ 000000
00000000 00000000 00000000 00000000 00000000 00000000 00000000 00000000 ................................ 000020
00000000 00000000 00000000 00000000 00000000 00000000 00000000 00000000 ................................ 000040
00000000 00000000 00000000 00000000 00000000 00000000 00000000 00000000 ................................ 000060
00000000 00000000 00000000 00000000 00000000 00000000 00000000 00000000 ................................ 000080
00000000 00000000 00000000 00000000 00000000 00000000 00000000 00000000 ................................ 0000A0
00000000 00000000 00000000 00000000 00000000 00000000 00000000 00000000 ................................ 0000C0
00000000 00000000 00000000 00000000 00000000 00000000 00000000 00000000 ................................ 0000E0
00000000 00000000 00000000 00000000 00000000 00000000 00000000 00000000 ................................ 000100
00000000 00000000 00000000 00000000 00000000 00000000 00000000 00000000 ................................ 000120
00000000 00000000 00000000 00000000 00000000 00000000 00000000 00000000 ................................ 000140
00000000 00000000 00000000 00000000 00000000 00000000 00000000 00000000 ................................ 000160
00000000 00000000 00000000 00000000 00000000 00000000 00000000 00000000 ................................ 000180
00000000 00000000 00000000 00000000 00000000 00000000 00000000 00000000 ................................ 0001A0
00000000 00000000 00000000 00000000 00000000 00000000 00000000 00000000 ................................ 0001C0
00000000 00000000 00000000 00000000 00000000 00000000 00000000 00000000 ................................ 0001E0
```

```
Dump of file SATURN:[PCCOMMON.DUMP.DLL]BRDPLOW.TMP;1 on 18-APR-1990 10:38:06.00
File ID (528,44,0)   End of file block 272 / Allocated 272

Virtual block number 265 (00000109), 512 (0200) bytes

 00000000 00000000 00000000 00000000 00000000 00000000 00000000 00000000 ................................ 000000
 00000000 00000000 00000000 00000000 00000000 00000000 00000000 00000000 ................................ 000020
 00000000 00000000 00000000 00000000 00000000 00000000 00000000 00000000 ................................ 000040
 00000000 00000000 00000000 00000000 00000000 00000000 00000000 00000000 ................................ 000060
 00000000 00000000 00000000 00000000 00000000 00000000 00000000 00000000 ................................ 000080
 00000000 00000000 00000000 00000000 00000000 00000000 00000000 00000000 ................................ 0000A0
 00000000 00000000 00000000 00000000 00000000 00000000 00000000 00000000 ................................ 0000C0
 00000000 00000000 00000000 00000000 00000000 00000000 00000000 00000000 ................................ 0000E0
 00000000 00000000 00000000 00000000 00000000 00000000 00000000 00000000 ................................ 000100
 00000000 00000000 00000000 00000000 00000000 00000000 00000000 00000000 ................................ 000120
 00000000 00000000 00000000 00000000 00000000 00000000 00000000 00000000 ................................ 000140
 00000000 00000000 00000000 00000000 00000000 00000000 00000000 00000000 ................................ 000160
 00000000 00000000 00000000 00000000 00000000 00000000 00000000 00000000 ................................ 000180
 00000000 00000000 00000000 00000000 00000000 00000000 00000000 00000000 ................................ 0001A0
 00000000 00000000 00000000 00000000 00000000 00000000 00000000 00000000 ................................ 0001C0
 00000000 00000000 00000000 00000000 00000000 00000000 00000000 00000000 ................................ 0001E0

Dump of file SATURN:[PCCOMMON.DUMP.DLL]BRDPLOW.TMP;1 on 18-APR-1990 10:38:06.00
File ID (528,44,0)   End of file block 272 / Allocated 272

Virtual block number 266 (0000010A), 512 (0200) bytes

 00000000 00000000 00000000 00000000 00000000 00000000 00000000 00000000 ................................ 000000
 00000000 00002828 17400000 00000000 00000000 00000000 00000000 00000000 ......................@.((...... 000020
 2C801D68 2C8027FE 2C800000 2320202B 00296C6C 756E2800 296C6C75 6E280000 ..(null).(null).+· #...,±'.,h... 000040
 E0F0F8FC FEFF0000 00007878 31364D05 01010000 00001074 2C801070 2C80106C l..,p..,t........M61xx.....±•½pÅ 000060
 00000000 00000000 00000000 00000000 00000000 00000000 00000000 000080C0 à............................... 000080
 00000000 00000000 00000000 00000000 00000000 00000000 00000000 00000000 ................................ 0000A0
 30302865 00203A02 0000007A 00000000 00790078 00000000 00000000 00000000 ............x.y.....z....: .e+00 0000C0
 00000000 00000000 00000000 00000000 00000000 00000000 00000000 00000030 0............................... 0000E0
 00000000 00000000 00000000 00000000 00000000 00000000 00000000 00000000 ................................ 000100
 00000000 00000000 00000000 00000000 00000000 00000000 00000000 00000000 ................................ 000120
 00000000 00000000 00000000 00000000 00000000 00000000 00000000 00000000 ................................ 000140
 00000000 00000000 00000000 00000000 00000000 00000000 00000000 00000000 ................................ 000160
 00000000 00000000 00000000 00000000 00000000 00000000 00000000 00000000 ................................ 000180
 00000000 00000000 00000000 00000000 00000000 00000000 00000000 00000000 ................................ 0001A0
 00000000 00000000 00000000 00000000 00000000 00000000 00000000 00000000 ................................ 0001C0
 00000000 00000000 00000000 00000000 00000000 00000000 00000000 00000000 ................................ 0001E0

Dump of file SATURN:[PCCOMMON.DUMP.DLL]BRDPLOW.TMP;1 on 18-APR-1990 10:38:06.00
File ID (528,44,0)   End of file block 272 / Allocated 272

Virtual block number 267 (0000010B), 512 (0200) bytes

 00000000 00000000 00000000 00000000 00000000 00000000 00000000 00000000 ................................ 000000
 00000000 00000000 00000000 00000000 00000000 00000000 00000000 00000000 ................................ 000020
 00000000 00000000 00000000 00000000 00000000 00000000 00000000 00000000 ................................ 000040
 00000000 00002852 2B802C19 2B802BB0 00000000 1E0A0000 00000000 00000000 ...............¯+¯+.,¯+R(...... 000060
 00000000 00000000 00000000 00000000 00000000 00000000 00000000 00000000 ................................ 000080
 00000000 00000000 00000000 00000000 00000000 00000000 00000000 00000000 ................................ 0000A0
 00000000 00000000 00000000 00000000 00000000 00000000 00000000 00000000 ................................ 0000C0
 00000000 00000000 00000000 00000000 00000000 00000000 00000000 00000000 ................................ 0000E0
 00000000 00000000 00000000 00000000 00000000 00000000 00000000 00000000 ................................ 000100
 00000000 00000000 00000000 00000000 00000000 00000000 00000000 00000000 ................................ 000120
 00000000 00000000 00000000 00000000 00000000 00000000 00000000 00000000 ................................ 000140
 00000000 00000000 00000000 00000000 00000000 00000000 00000000 00000000 ................................ 000160
 00000000 00000000 00000000 00000000 00000000 00000000 00000000 00000000 ................................ 000180
 00000000 00000000 00000000 00000000 00000000 00000000 00000000 00000000 ................................ 0001A0
 00000000 00000000 00000000 00000000 00000000 00000000 00000000 00000000 ................................ 0001C0
 00000000 00000000 00000000 00000000 00000000 00000000 00000000 00000000 ................................ 0001E0
```

```
Dump of file SATURN:[PCCOMMON.DUMP.DLL]BRDPLOW.TMP;1 on 18-APR-1990 10:38:06.00
File ID (528,44,0)    End of file block 272 / Allocated 272

Virtual block number 268 (0000010C), 512 (0200) bytes

00000000 00000000 00000000 00000000 00000000 00000000 00000000 00000000 ................................ 000000
00000000 00000000 00000000 00000000 00000000 00000000 00000000 00000000 ................................ 000020
00000000 00000000 00000000 00000000 00000000 00000000 00000000 00000000 ................................ 000040
00000000 00000000 00000000 00000000 00000000 00000000 00000000 00000000 ................................ 000060
00000000 00000000 00000000 00000000 00000000 00000000 00000000 00000000 ................................ 000080
00000000 00000000 00000000 00000000 00000000 00000000 00000000 00000000 ................................ 0000A0
00000000 00000000 00000000 00000000 00000000 00000000 00000000 00000000 ................................ 0000C0
00000000 00000000 00000000 00000000 00000000 00000000 00000000 00000000 ................................ 0000E0
00000000 00000000 00000000 00000000 00000000 00000000 00000000 00000000 ................................ 000100
00000000 00000000 00000000 00000000 00000000 00000000 00000000 00000000 ................................ 000120
00000000 00000000 00000000 00000000 00000000 00000000 00000000 00000000 ................................ 000140
00000000 00000000 00000000 00000000 00000000 00000000 00000000 00000000 ................................ 000160
00000000 00000000 00000000 00000000 00000000 00000000 00000000 00000000 ................................ 000180
00000000 00000000 00000000 00000000 00000000 00000000 00000000 00000000 ................................ 0001A0
00000000 00000000 00000000 00000000 00000000 00000000 00000000 00000000 ................................ 0001C0
00000000 00000000 00000000 00000000 00000000 00000000 00000000 00000000 ................................ 0001E0

Dump of file SATURN:[PCCOMMON.DUMP.DLL]BRDPLOW.TMP;1 on 18-APR-1990 10:38:06.00
File ID (528,44,0)    End of file block 272 / Allocated 272

Virtual block number 269 (0000010D), 512 (0200) bytes

00000000 00000000 00000000 00000000 00000000 00000000 00000000 00000000 ................................ 000000
00000000 00000000 00000000 00000000 00000000 00000000 00000000 00000000 ................................ 000020
00000000 00000000 00000000 00000000 00000000 00000000 00000000 00000000 ................................ 000040
5F454C49 465F435F 1F860000 00000000 00000000 00000000 00000000 00000000 ........................_C_FILE_ 000060
00000000 81818101 00000001 00000000 00000000 00000000 00000030 4F464E49 INFO=........................... 000080
00000000 00000000 00000000 00000000 00000000 00000000 00000000 00000000 ................................ 0000A0
00000000 00000000 00000000 00000000 00000000 00000000 00000000 00000000 ................................ 0000C0
00000000 00000000 00000000 00000000 00000000 00000000 00000000 00000000 ................................ 0000E0
00000000 00000000 00000000 00000000 00000000 00000000 00000000 00000000 ................................ 000100
00000000 00000000 00000000 00000000 00000000 00000000 00000000 00000000 ................................ 000120
00000000 00000000 00000000 00000000 00000000 00000000 00000000 00000000 ................................ 000140
00000000 00000000 00000000 00000000 00000000 00000000 00000000 00000000 ................................ 000160
00000000 00000000 00000000 00000000 00000000 00000000 00000000 00000000 ................................ 000180
0A0A0A0A 0A0A0A00 00000000 00000000 00000000 00000000 00000000 00000000 ................................ 0001A0
0A0A0A0A 0A0A0A0A 0A0A0A0A 0A0A0A0A 0A0A0A0A 0A0A0A0A 0A0A0A0A 0A0A0A0A ................................ 0001C0
0A0A0A0A 0A0A0A0A 0A0A0A0A 0A0A0A0A 0A0A0A0A 0A0A0A0A 0A0A0A0A 0A0A0A0A ................................ 0001E0

Dump of file SATURN:[PCCOMMON.DUMP.DLL]BRDPLOW.TMP;1 on 18-APR-1990 10:38:06.00
File ID (528,44,0)    End of file block 272 / Allocated 272

Virtual block number 270 (0000010E), 512 (0200) bytes

0A0A0A0A 0A0A0A0A 0A0A0A0A 0A0A0A0A 0A0A0A0A 0A0A0A0A 0A0A0A0A 0A0A0A0A ................................ 000000
0A0A0A0A 0A0A0A0A 0A0A0A0A 0A0A0A0A 0A0A0A0A 0A0A0A0A 0A0A0A0A 0A0A0A0A ................................ 000020
0A0A0A0A 0A0A0A0A 0A0A0A0A 0A0A0A0A 0A0A0A0A 0A0A0A0A 0A0A0A0A 0A0A0A0A ................................ 000040
0A0A0A0A 0A0A0A0A 0A0A0A0A 0A0A0A0A 0A0A0A0A 0A0A0A0A 0A0A0A0A 0A0A0A0A ................................ 000060
00000000 0000000A 0A0A0A0A 0A0A0A0A 0A0A0A0A 0A0A0A0A 0A0A0A0A 0A0A0A0A ................................ 000080
20282828 28282020 20202020 20202000 00000000 00000000 00000000 00000000 .................          ((((( 0000A0
10101010 10101010 10101010 10104820 20202020 20202020 20202020 20202020                 H............... 0000C0
01010101 01010101 81818181 81811010 10101010 10848484 84848484 84848410 ................................ 0000E0
02020202 02020202 82828282 82821010 10101010 01010101 01010101 01010101 ................................ 000100
00000000 00000000 00000000 00000020 10101010 02020202 02020202 02020202 ................................ 000120
00000000 00000000 00000000 00000000 00000000 00000000 00000000 00000000 ................................ 000140
00000000 00000000 00000000 00000000 00000000 00000000 00000000 00000000 ................................ 000160
00000000 00000000 00000000 00000000 00000000 00000000 00000000 00000000 ................................ 000180
00000000 00000000 00000000 00000000 00000000 00000000 00000000 00000000 ................................ 0001A0
7FEFFFFF FFFFFFFF 00000000 00000000 00000000 00000000 00000000 00000000 ..............................ÿ. 0001C0
00000000 00004000 00000000 00003FF0 00000000 00003FE0 00000000 00000000 ........À?......Þ?.......@...... 0001E0
```

Dump of file SATURN:[PCCOMMON.DUMP.DLL]BRDPLOW.TMP;1 on 18-APR-1990 10:38:06.00
File ID (528,44,0)   End of file block 272 / Allocated 272

Virtual block number 271 (0000010F), 512 (0200) bytes

```
00000000 00000000 00000000 00000000 0200FFFF FFFF0000 00000000 00000000 ................................ 000000
00000000 00000000 00000000 00000000 00000000 00000000 00000000 00002000 . .............................. 000020
00000000 00000000 00000000 00000000 00000000 00000000 00000000 00000000 ................................ 000040
00000000 00000000 00000000 00000000 00000000 00000000 00000000 00000000 ................................ 000060
00000000 00000000 00000000 00000000 00000000 00000000 00000000 00000000 ................................ 000080
00000000 00000000 00000000 00000000 00000000 00000000 00000000 00000000 ................................ 0000A0
00000000 00000000 00000000 00000000 00000000 00000000 00000000 00000000 ................................ 0000C0
14630000 00001D78 2A260000 281432CE 082A01D2 00000000 00000000 00000000 ............@.*.ö2.(..&*x.....c. 0000E0
00000000 00002826 FFFF3FE0 00000000 00003FE0 00000000 00002810 35282808 .((5.(......Å?......Å?..&(...... 000100
00000000 00000000 00000000 00003FEE 66666666 66663FE0 00000000 00003FE0 Å?......Å?ffffffŸ?.............. 000120
202D0A0D 48544140 203A00FD 3E3E4753 4D4E3C3C 00000000 00000000 1D483FE0 Å?H.........<<NMSG>>».: MATH..-  000140
64696C61 766E6900 6500203A 726F7272 6520746E 696F702D 676E6974 616F6C66 floating-point error: .e.invalid 000160
000A0077 6F6C6672 65766F00 68000A00 30207962 20656469 76696400 67000A00 ...g.divide by 0...h.overflow... 000180
20796C74 6963696C 70786500 70000A0D 776F6C66 7265766F 20686361 7473006E n.stack overflow...p.explicitly  0001A0
53007900 0A0D726F 72726520 4E49414D 4F440078 000A0064 65746172 656E6567 generated...x.DOMAIN error...y.S 0001C0
36520000 000A0072 6F727265 2053534F 4C54007A 000A0072 6F727265 20474E49 ING error...z.TLOSS error.....R6 0001E0
```

Dump of file SATURN:[PCCOMMON.DUMP.DLL]BRDPLOW.TMP;1 on 18-APR-1990 10:38:06.00
File ID (528,44,0)   End of file block 272 / Allocated 272

Virtual block number 272 (00000110), 512 (0200) bytes

```
0D333030 36520003 000A0077 6F6C6672 65766F20 68636174 7320200A 0D303030 000..- stack overflow.....R6003. 000000
38303036 52000800 0A0D3020 79622065 64697669 64207265 6765746E 6920200A .- integer divide by 0.....R6008 000020
6E656D75 67726120 726F6620 65636170 73206867 756F6E65 20746F6E 20200A0D ..- not enough space for argumen 000040
65636170 73206867 756F6E65 20746F6E 202D0A0D 39303036 52000900 0A0D7374 ts.....R6009..- not enough space 000060
6974206E 757200FF 000A0000 FC000A0D 746E656D 6E6F7269 766E6520 726F6620  for environment...•......run-ti 000080
6F702067 6E697461 6F6C6620 200A0032 30303652 00020020 726F7272 6520656D me error ...R6002..- floating po 0000A0
00000000 00000000 00000000 00FFFF00 0A006465 64616F6C 20746F6E 20746E69 int not loaded.................. 0000C0
17280200 020003FF 00000000 00000000 00000000 00000000 00000000 00000000 .............................(. 0000E0
00000000 00000000 00000000 00000000 191F8800 02000000 18085A00 02000000 .....Z.......................... 000100
00000000 00000000 00000000 00000000 00000000 00000000 00000000 00000000 ................................ 000120
00000000 00000000 00000000 00000000 00000000 00000000 00000000 00000000 ................................ 000140
00000000 00000000 00000000 00000000 00000000 00000000 00000000 00000000 ................................ 000160
00000000 00000000 00000000 00000000 00000000 00000000 00000000 00000000 ................................ 000180
00000000 00000000 00000000 00000000 00000000 00000000 00000000 00000000 ................................ 0001A0
00000000 00000000 00000000 00000000 00000000 00000000 00000000 00000000 ................................ 0001C0
00000000 00000000 00000000 00000000 00000000 00000000 00000000 00000000 ................................ 0001E0
```

```
Dump of file SATURN:[PCCOMMON.DUMP.DLL]BRDNOPL.TMP;1 on 18-APR-1990 10:37:32.99
File ID (520,34,0)   End of file block 272 / Allocated 272

Virtual block number 1 (00000001), 512 (0200) bytes

00000000 00000040 00000000 000000B8 0000FFFF 00000004 00000110 00E35A4D MZD.............!.......a....... 000000
00000080 00000000 00000000 00000000 00000000 00000000 00000000 00000000 ................................ 000020
6F6E6E61 63206D61 72676F72 70207369 685421CD 4C01B821 CD09B400 0EBA1F0E ..a..Ç.ël¡.LèlThis program canno 000040
00000000 00000024 0A0D0D2E 65646F6D 20534F44 206E6920 6E757220 65622074 t be run in DOS mode....$....... 000060
00070019 00000000 00172ADA 00000000 00198009 324A5261 024C0075 0505454E NE..u.L.aRJ2........Ö*.......... 000080
00000000 00000000 00010000 00040000 00001041 0AA10A93 01080108 00400048 H.a.......À.A................... 0000A0
18640F00 18640461 0F860F00 0F860362 16CE0F00 16CE01EF 0D000F00 0D000109 ..À...À.ÿ.ö...ö.b.......a.d...d. 0000C0
0BFC0F00 0BFC0803 071E0F00 071E0788 02C80F00 02C8075B 12B40F00 12B40621 I.Ç...Ç.[.à...à............*...*. 0000E0
05000F00 05000C3E 0EEE0F00 0EEE0B4C 0A4E0F00 0A4E0AA4 1D820F00 1D8208C7 ú.......Ê.N...N.L.Ÿ...Ÿ.>....... 000100
071C0F00 071C11A1 125C0F00 125C1078 11020F00 11020F64 2C7A0F00 2C7A0C94 ..z...z.d.......x.\...\.À....... 000120
0AD80F00 0AD717E2 06C00F00 06C01770 31A60F00 31A6144C 233E0F00 233E1215 ..>#..>#L.I1..I1p.à...à.ä.a...Ä. 000140
02000E21 00000000 42920F00 429218IC 06640F00 06641AB1 21760F00 21761892 ..vi..viŸ.d...d....B...B....!... 000160
00014544 4F4D434F  534154 45534452 420F0000 44524203 2BB00F21 2A091F4C L..*!.¯+.BRD...BRDSETASSOCMODE.. 000180
4C485952 45555145 . 554F52 44524212 00025241 454C4345 434E4546 44524200 .BRDFENCECLEAR...BRDROUTEQUERYHL 0001A0
52414554 44524218 00044449 52474145 52415952 45555144 52421000 03454E49 INE...BRDQUERYAREAGRID...BRDTEAR 0001C0
45545845 59524555 51445242 0E00054F 464E4952 45535559 52455551 504F5244 DROPQUERYUSERINFO...BRDQUERYEXTE 0001E0

Dump of file SATURN:[PCCOMMON.DUMP.DLL]BRDNOPL.TMP;1 on 18-APR-1990 10:37:32.99
File ID (520,34,0)   End of file block 272 / Allocated 272

Virtual block number 2 (00000002), 512 (0200) bytes

4F525445 53414552 41445242 13000743 4F535341 4E4E4F43 4452420C 0006544E NT...BRDCONNASSOC...BRDAREASETRO 000000
55494441 52455355 4F4D5952 4555514E 4E4F4344 52421700 08545349 44444E55 UNDDIST...BRDCONNQUERYMOUSERADIU 000020
4F524452 4213000A 4F464E49 52455355 59524555 51414552 41445242 14000953 S...BRDAREAQUERYUSERINFO...BRDRO 000040
4543414C 50455245 54554F52 44524211 0008544E 45545845 59524555 51455455 UTEQUERYEXTENT...BRDROUTEREPLACE 000060
43445242 12000044 49524745 54554F52 4F545450 50414E53 44524214 000C5450 PT...BRDSNAPPTTOROUTEGRID...BRDC 000080
5241454C 43534945 434E4546 4452420F 000E4F46 4E495245 53555445 534E4E4F ONNSETUSERINFO...BRDFENCEISCLEAR 0000A0
44524212 00104554 5⁴4F5259 42524145 4E454E49 4D524554 45444452 4217000F ...BRDDETERMINENEARBYROUTE...BRD 0000C0
49535952 4555514E 4E4F4344 52421000 11545245 564E4F43 54484749 41525453 STRAIGHTCONVERT...BRDCONNQUERYSI 0000E0
534E4E4F 43445242 10?01341 45524159 52455551 4E4E4F43 44524210 00124544 DE...BRDCONNQUERYAREA...BRDCONNS 000100
0015544E 45545845 59524555 514C4542 414C4452 42130014 544E4554 58455445 ETEXTENT...BRDLABELQUERYEXTENT.. 000120
52455551 4554554F 52445242 15001645 44495354 46494853 41455241 44524210 .BRDAREASHIFTSIDE...BRDROUTEQUER 000140
53445242 13001843 4F535341 4554554F 52445242 0000174F 464E4952 45535559 YUSERINFO...BRDROUTEASSOC...BRDS 000160
42595245 55514543 4E454644 52421800 1945434E 41545349 44455455 4F525445 ETROUTEDISTANCE...BRDFENCEQUERYB 000180
44524211 00184554 41455243 4E4E4F43 44524200 001A5453 49444843 4150584F OXPACKDIST...BRDCONNCREATE...BRD 0001A0
554F5259 52455551 41455241 44524215 001C544E 554F4359 52455551 444E4946 FINDQUERYCOUNT...BRDAREAQUERYROU 0001C0
52421500 1E544E55 4F435952 45555145 54554F52 44524212 00105453 4944444E NDDIST...BRDROUTEQUERYCOUNT...BR 0001E0

Dump of file SATURN:[PCCOMMON.DUMP.DLL]BRDNOPL.TMP;1 on 18-APR-1990 10:37:32.99
File ID (520,34,0)   End of file block 272 / Allocated 272

Virtual block number 3 (00000003), 512 (0200) bytes

55514543 4E454644 52421300 1F53544E 49415254 534E4F43 4543524F 464E4544 DENFORCECONSTRAINTS...BRDFENCEQU 000000
49474552 4E495354 43454A42 4F444E49 46445242 16002054 4E455458 45595245 ERYEXTENT ..BRDFINDOBJECTSINREGI 000020
44524219 00225355 49444152 4553554F 4D544553 4E4E4F43 44524215 00214E4F ONI..BRDCONNSETMOUSERADIUS"..BRD 000040
4542414C 44524215 00235354 4F4C5354 48474941 52545359 52455551 4E4E4F43 CONNQUERYSTRAIGHTSLOTS#..BRDLABE 000060
0025434F 5353414C 4542414C 44524200 00244F46 4E495245 53555952 4555514C LQUERYUSERINFO$..BRDLABELASSOC%. 000080
45555144 52420C00 26504F52 44544B59 52455551 504F5244 52414554 44524216 .BRDTEARDROPQUERYHTDROP&..BRDQUE 0000A0
4452420F 0028434F 53534944 504F5244 52414554 44524211 00274550 59545952 RYTYPE'..BRDTEARDROPDISSOC(..BRD 0000C0
4215002A 544E4952 5045434E 45464452 42000029 4D495254 54455345 54554F52 ROUTESETTRIM)..BRDFENCEPRINT*..B 0000E0
45444E4E 4F434452 4200002B 4D494444 4E4F4D41 49445445 53455455 4F524452 RDROUTESETDIAMONDDIM+..BRDCONNDE 000100
45555144 52421100 20545845 4E595245 5551444E 49464452 4210002C 4554454C LETE,..BRDFINDQUERYNEXT-..BRDQUE 000120
2F504145 48595245 55514543 4E454644 52421100 2E45444F 4D434F53 53415952 RYASSOCMODE...BRDFENCEQUERYHEAP/ 000140
43595245 55514554 554F5244 52421100 30435241 5445534E 4E4F4344 52420000 ..BRDCONNSETARC0..BRDROUTEQUERYC 000160
55514E4E 4F434452 42120032 45544145 52434554 554F5244 52420E00 314E4E4F ONN1..BRDROUTECREATE2..BRDCONNQU 000180
42110034 434F5353 41504F52 44524145 54445242 10003354 4E455458 45595245 ERYEXTENT3..BRDTEARDROPASSOC4..B 0001A0
54454C45 44455455 4F524452 420E0035 45544145 52435448 47494152 54534452 RDSTRAIGHTCREATE5..BRDROUTEDELET 0001C0
54505952 45555145 54554F52 4452420F 0037594F 52545345 44445242 0A0?3645 E6..BRDDESTROY7..BRDROUTEQUERYPT 0001E0
```

```
Dump of file SATURN:[PCCOMMON.DUMP.DLL]BRDNOPL.TMP;1 on 18-APR-1990 10:37:32.99
File ID (520,34,0)   End of file block 272 / Allocated 272

Virtual block number 4 (00000004), 512 (0200) bytes

 5145434E 45464454 421A0039 53544F4C 53595245 55514E4E 4F434452 42110038 8..BRDCONNQUERYSLOTS9..BRDFENCEQ 000000
 434F5353 41414552 41445242 0C003A54 5349444B 43415045 434E4546 59524555 UERYFENCEPACKDIST:..BRDAREAASSOC 000020
 55514545 434E4546 44524200 003C4554 554F5250 554E4145 4C434452 420F003B ;..BRDCLEANUPROUTE<..BRDFENCEEQU 000040
 4F524452 41455444 52421600 3E454449 53544553 4E4E4F43 4452420E 00304C41 AL=..BRDCONNSETSIDE>..BRDTEARDRO 000060
 42150040 4D494454 45534E4E 4F434452 420D003F 4F464E49 52455355 54455350 PSETUSERINFO?..BRDCONNSETDIMa..B 000080
 424F444E 49464452 42110041 45434E41 54534944 4554554F 52595245 55514452 RDQUERYROUTEDISTANCEA..BRDFINDOB 0000A0
 41445242 12004345 54414552 434C4542 414C4452 420E0042 54505441 5443454A JECTATPTB..BRDLABELCREATEC..BRDA 0000C0
 11004559 504F4345 434E4546 4452420C 00444F46 4E495245 53555445 53414552 REASETUSERINFOD..BRDFENCECOPYE.. 0000E0
 59524555 514E4E4F 43445242 14004644 49524745 54554F52 59524555 51445242 BRDQUERYROUTEGRIDF..BRDCONNQUERY 000100
 46445242 10004844 49524741 45524154 45534452 420E0047 4F464E49 52455355 USERINFOG..BRDSETAREAGRIDH..BRDF 000120
 13004A45 54454C45 444C4542 414C4452 420E0049 444E454E 4F494745 52444E49 INDREGIONENDI..BRDLABELDELETEJ.. 000140
 45555141 45524144 52421200 4B444952 47414552 414F5454 5050414E 53445242 BRDSNAPPTTOAREAGRIDK..BRDAREAQUE 000160
 4211004D 52545441 59524555 51455455 4F524452 4211004C 45444953 54505952 RYPTSIDEL..BRDROUTEQUERYATTRM..B 000180
 59524555 51455455 4F524452 4217004E 4554554F 52595245 55514E4E 4F434452 RDCONNQUERYROUTEN..BRDROUTEQUERY 0001A0
 584F4246 49434C41 43455245 434E4546 4452421A 004F4D49 44444E4F 4D414944 DIAMONDDIMO..BRDFENCERECALCIFBOX 0001C0
 0F005154 4E455241 50595245 55514C45 42414C44 52421300 50444556 4F4D4552 REMOVEDP..BRDLABELQUERYPARENTQ.. 0001E0

Dump of file SATURN:[PCCOMMON.DUMP.DLL]BRDNOPL.TMP;1 on 18-APR-1990 10:37:32.99
File ID (520,34,0)   End of file block 272 / Allocated 272

Virtual block number 5 (00000005), 512 (0200) bytes

 45564F4D 45524554 554F5244 52421000 52525454 41544553 4554554F 52445242 BRDROUTESETATTRR..BRDROUTEREMOVE 000000
 45524144 52421000 54545052 4F48434E 41544553 4E4E4F43 44524212 00535450 PTS..BRDCONNSETANCHORPTT..BRDARE 000020
 00564554 554F5242 55535452 45534E49 44524211 0055544E 45545845 54455341 ASETEXTENTU..BRDINSERTSUBROUTEV. 000040
 0E005845 564F4D4C 4542414C 4452420C 00575450 44444145 54554F52 44524200 .BRDROUTEADDPTW..BRDLABELMOVEX.. 000060
 4E494C59 504F4345 54554F52 44524210 0059584F 42444441 45434E45 46445242 BRDFENCEADDBOXY..BRDROUTECOPYLIN 000080
 504F5244 52414554 44524211 005B4554 41455243 45434E45 46445242 0E005A45 EZ..BRDFENCECREATE[..BRDTEARDROP 0000A0
 0F005D54 50524F48 434E4159 52455551 4E4E4F43 44524214 005C4554 41455243 CREATE\..BRDCONNQUERYANCHORPT].. 0000C0
 49524745 54554F52 54455344 52420F00 5E455059 544A424F 59524555 51445242 BRDQUERYOBJTYPE^..BRDSETROUTEGRI 0000E0
 59524555 514E4E4F 43445242 0F006045 54414552 43414552 41445242 00005F44 D_..BRDAREACREATE`..BRDCONNQUERY 000100
 554F5244 52420E00 62544E45 54584554 45534C45 42414C44 52421100 61435241 ARCa..BRDLABELSETEXTENTb..BRDROU 000120
 554F5244 52421100 6445564F 4D45434E 45464452 420C0063 434F5353 49444554 TEDISSOCc..BRDFENCEMOVEd..BRDROU 000140
 45464649 434C4143 45524543 4E454644 52421C00 654D4952 54595245 55514554 TEQUERYTRIMe..BRDFENCERECALCIFFE 000160
 4F524454 48544553 504F5244 52414554 44524214 00664445 564F4D45 5245434E NCEREMOVEDf..BRDTEARDROPSETHTDRO 000180
 52445242 1300684D 4944574F 52524159 52455551 4554554F 52445242 15006750 Pg..BRDROUTEQUERYARROWDIMh..BRDR 0001A0
 45535554 45534554 554F5244 52421300 694D4944 574F5252 41544553 4554554F OUTESETARROWDIMi..BRDROUTESETUSE 0001C0
 44504F52 44524145 54445242 11006845 54414552 43445242 09006A4F 464E4952 RINFOj..BRDCREATEk..BRDTEARDROPD 0001E0

Dump of file SATURN:[PCCOMMON.DUMP.DLL]BRDNOPL.TMP;1 on 18-APR-1990 10:37:32.99
File ID (520,34,0)   End of file block 272 / Allocated 272

Virtual block number 6 (00000006), 512 (0200) bytes

 45535445 53445242 11006D45 54454C45 44414552 41445242 0D006C45 54454C45 ELETEl..BRDAREADELETEm..BRDSETSE 000000
 42414C44 52420E00 6F45564F 4D414552 41445242 0B006E52 4544524F 48435241 ARCHORDERn..BRDAREAMOVEo..BRDLAB 000020
 4E455458 45595245 5551504F 52445241 45544452 42160070 434F5353 49444C45 ELDISSOCp..BRDTEARDROPQUERYEXTEN 000040
 45464452 420F0072 4E4E4F43 59524555 51504F52 44524145 54445242 14C??154 Tq..BRDTEARDROPQUERYCONNr..BRDFE 000060
 420C0074 4D494459 52455551 4E4E4F43 4452420F 0073594F 52545345 44454 4E NCEDESTROYs..BRDCONNQUERYDIMt..B 000080
 544E4554 58455952 45555141 45524144 52421200 75455455 4F52444E 494644.2 RDFINDROUTEu..BRDAREAQUERYEXTENT 0000A0
 45534C45 42414C44 52421300 774E4E4F 43595245 55514145 52414452 42100076 v..BRDAREAQUERYCONNw..BRDLABELSE 0000C0
 42110079 45434E45 46444441 45434E45 46445242 1000784F 464E4952 45535554 TUSERINFOx..BRDFENCEADDFENCEy..B 0000E0
 C7028902 32002F00 10000700 0100007A 45505954 59524555 51455455 4F524452 RDROUTEQUERYTYPEz......../.2.¿.ú 000100
 4C42434F 4C4C4140 454D004D 454D0353 4C4C4143 534F4408 4E49574D 50050002 ...PMWIN.DOSCALLS.MEM.MEMALLOCBL 000120
 45544154 4F525450 50485308 50485303 4B434F4C 42454552 464D454D 0C4B434F OCK.MEMFREEBLOCK.SHP.SHPPTROTATE 000140
 44495359 52455551 584F4250 48530F58 4F425345 53534F52 43584F42 50485310 .SHPBOXCROSSESBOX.SHPBOXQUERYSID 000160
 530C594F 52545345 44454E49 4C504853 0E455441 45524345 4E494C50 48530045 E.SHPLINECREATE.SHPLINEDESTROY.S 000180
 5048530F 54504543 414C5045 52454E49 4C504853 10545044 4441454E 494C5048 HPLINEADDPT.SHPLINEREPLACEPT.SHP 0001A0
 530E544E 554F4359 52455551 454E494C 50485311 54504556 4F4D4552 454E494C LINEREMOVEPT.SHPLINEQUERYCOUNT.S 0001C0
 544E4554 58455952 45555145 4E494C50 48531254 50595245 5551454E 494C5048 HPLINEQUERYPT.SHPLINEQUERYEXTENT 0001E0
```

```
Dump of file SATURN:[PCCOMMON.DUMP.DLL]BRDNOPL.TMP;1 on 18-APR-1990 10:37:32.99
File ID (520,34,0)   End of file block 272 / Allocated 272

Virtual block number 7 (00000007), 512 (0200) bytes

49444D49 52545445 53454E49 4C504853 12525454 41544553 454E494C 5048530E .SHPLINESETATTR.SHPLINESETTRIMDI 000000
59524555 51454E49 4C504853 14525454 41595245 5551454E 494C5048 53105453 ST.SHPLINEQUERYATTR.SHPLINEQUERY 000020
54494E49 454E494C 50485311 59504F43 454E494C 50485308 54534944 4D495254 TRIMDIST.SHPLINECOPY.SHPLINEINIT 000040
4E494C50 48531254 50545845 4E595245 5551454E 494C5048 53125450 5458454E NEXTPT.SHPLINEQUERYNEXTPT.SHPLIN 000060
4944574F 52524159 52455551 454E494C 50485314 4D494457 4F525241 54455345 ESETARROWDIM.SHPLINEQUERYARROWDI 000080
5551454E 494C5048 53164D49 44444E4F 4D414944 54455345 4E494C50 4853144D M.SHPLINESETDIAMONDDIM.SHPLINEQU 0000A0
5310584F 42534553 534F5243 47455350 4853104D 4944444E 4F4D4149 44595245 ERYDIAMONDDIM.SHPSEGCROSSESBOX.S 0000C0
45535245 544E4958 4F424745 53504853 18474553 53455353 4F524347 45535048 HPSEGCROSSESSEG.SHPSEGBOXINTERSE 0000E0
54504853 13545054 52415453 54455350 4F524454 50485312 5354504E 4F495443 CTIONPTS.SHPTDROPSETSTARTPT.SHPT 000100
13545355 4A544553 504F5244 54504853 0F535549 44415259 52455551 504F5244 DROPQUERYRADIUS.SHPTDROPSETJUST. 000120
59524555 514D4744 154D4744 03544E45 54584559 52455551 504F5244 54504853 SHPTDROPQUERYEXTENT.DGM.DGMQUERY 000140
4E454554 554F5245 52594252 41454E4D 47441354 4E455458 454D4152 47414944 DIAGRAMEXTENT.DGMNEARBYREROUTEEN 000160
50414548 59524555 514D4744 0C455455 4F524255 53545245 534E4940 47441144 D.DGMINSERTSUBROUTE.DGMQUERYHEAP 000180
0B525450 4553554F 4D595245 55514D47 44104452 414F4259 52455551 4D474400 .DGMQUERYBOARD.DGMQUERYMOUSEPTR. 0001A0
44094742 44035254 50455355 4F4D5445 53404744 0E445241 4F425445 53404744 DGMSETBOARD.DGMSETMOUSEPTR.DBG.D 0001C0
01036E03 0E01035C 03010145 54495257 534F4408 4F495303 54524553 53414742 BGASSERT.SIO.DOSWRITE...\....n.. 0001E0

Dump of file SATURN:[P.COMMON.DUMP.DLL]BRDNOPL.TMP;1 on 18-APR-1990 10:37:32.99
File ID (520,34,0)   End of file block 272 / Allocated 272

Virtual block number 8 (00000008), 512 (0200) bytes

0303010C C3030201 02FF0303 01041103 01010403 03070101 26031001 05340305 ..4....&....................Ü.... 000000
000103EF 030E010E 19030301 04000310 0107E403 0CA00305 0205C103 02010A17 .....è....Ü..ô..............ÿ... 000020
03050210 28030201 08470308 01060803 0E87030A 96030303 005A0306 01060103 .!....Z..............G....+.... 000040
05010E39 03020105 22030001 00000303 010DF403 0E0102D2 03100102 820304EB $.......@....¶.........."....9... 000060
0306C003 08020505 0309E003 03020311 03000104 70030E01 04E30301 01061C03 ......D....p.........À.......à.. 000080
08E70305 010F9203 0E010A71 03050103 02030701 03030301 01047903 07010487 .....y..............q..........Ó. 0000A0
0003000E 0305020A 07030301 0430030E 01038703 0101055F 03000101 65030301 ...e...._....ñ....0....■........ 0000C0
0106A703 050101C7 03010101 74030501 00000306 01021203 0701064B 03030100 ....K...............t....ú....Ï.. 0000E0
0307010A 54030301 0256030E 01000003 12010340 0302010C 89030E01 04C40303 ..à....¿....@.........V....T..... 000100
0158030E 01060003 02010000 03080100 00030001 03840310 01054603 03010302 @....F..........................[. 000120
11010594 03100104 04030801 061C0300 01009503 10010E4A 03030102 45031001 ...E....J......................... 000140
9A030502 09710308 01080703 0E010C4A 0305010E C4030301 0A000305 01010C03 .É.........é....J..........q..... 000160
030E0108 8C030801 07280305 01075403 00010633 0302010C 46030301 08F00309 ..Þ....F....3....T....+.......... 000180
01840310 01093903 010100CF 03030100 00030701 0000030E 01057003 050107FB «....)..............ü....9....Ç. 0001A0
0E010ACE 03050105 22030E01 03830305 0106F003 08010819 03030100 00030201 ...............».....°....".....ö... 0001C0
03020101 26030701 00000301 0104AE03 08200308 8A030503 04400307 010A2703 .'....@.......¨..Ù.........&.... 0001E0

Dump of file SATURN:[PCCOMMON.DUMP.DLL]BRDNOPL.TMP;1 on 18-APR-1990 10:37:32.99
File ID (520,34,0)   End of file block 272 / Allocated 272

Virtual block number 9 (00000009), 512 (0200) bytes

030100AF 030E0105 17030486 03070205 A4030801 0F1C0302 01087303 0D010205 .....s..........£....Ñ.......£... 000000
00008503 05010681 030E0106 8F030801 0E700308 87030202 00000313 0105C403 .á.........ñ..)................... 000020
20746867 69727970 6F432029 63282060 65747379 73627553 20647261 6F424400 .DBoard Subsystem (c) Copyright  000040
73606574 73795320 6E6F6974 6160726F 666E4920 6E616068 63614220 39383931 1989 Bachman Information Systems 000060
080C4688 D88EFFFF 881E5657 00000AC8 00000000 00000000 00002E63 6E49202C , Inc...........à...WV.|...Ã.F.. 000080
76FF0192 E980F388 06750846 08064688 087F020A 7E830E7C 010A7E83 14740E46 F.t..~..|..~.....F..F.u.|ß.Ö...v 0000A0
FA76FF00 00FFFF9A 5016FA46 8D0C76FF 0E76FF00 0001B89A 006A006A 0C76FF0E ..v.j.j..j....v..v..F".P......v" 0000C0
428EF888 F65EC401 57E980F2 B80674C0 08000001 5B9A5016 F6468000 8E680E6A j.h...F~.P.[....ât.|·.ÖW.á^~.«/B 0000E0
4688FA76 FF7375C0 08009C00 009A5052 000805C2 8CC388FA 76FFA5F2 00478900 .¿G.·Ê.v".ú.ô...RP......âus.v".F 000100
50520010 05F85688 F64688FA 76FF5C75 C0080083 00009A50 52000C05 F85688F6 -.V½...RP...°..âu\.v".F~.V½...RP 000120
2E75C008 00E10000 9A505200 1405F856 88F64688 FA76FF45 75C00800 CA00009A ...ò..âuE.v".F~.V½...RP...Ã..âu. 000140
F85688F6 4688FA76 FF1775C0 0800F800 009A5052 001805F8 5688F646 88FA76FF .v".F~.V½...RP...½..âu..v".F~.V½ 000160
E980F288 00000160 9AF676FF F876FFFA 76FF1474 C008FFFF 00009A50 52001C05 ...RP......ât..v".v½.v~.m...|·.Ö 000180
88F65EC4 04578926 02478926 0E56880C 4688F65E C4078926 0A4688F6 5EC400AE Û.á^~.F.&..á^~.F..V.&.G.&.W.á^~. 0001A0
FA76FF1F A5F20012 890A8E1E F088327F 8D085688 06468BF6 5EC40647 8926FA46 F"&.G.á^~.F..V...2.Þ..Ö¿..·Ê..v" 0001C0
00FFFF9A F676FFF8 76FFFA76 FF1374C0 080000FF FF9A5016 FC468000 9A680E6A j.h...F=.P......ât..v".v½.v~.... 0001E0
```

```
Dump of file SATURN:[PCCOMMON.DUMP.DLL]BRDNOPL.TMP;1 on 18-APR-1990 10:37:32.99
File ID (520,34,0)   End of file block 272 / Allocated 272

Virtual block number 10 (0000000A), 512 (0200) bytes

 F8568BF6 46881FA5 F2004D89 D88E1E00 D08EFB88 000888FC 5EC44AEB 8DF28800 .¡·.$J6^•¡...«/Å...Å¿M.·E..F-.V½ 000000
 76FF0E76 FF008697 89260084 878926FE 5688FC46 88F65EC4 04578926 02478926 &.G.&.W.6^-.F•.V±&....&.....v..v 000020
 8E017A88 1E0000U6 C8000ACA C95F5E1F 00E8C028 0000FFFF 9AF676FF F876FF0C ..V½.v-.....•åS..^_èò..à....¡z.. 000040
 46890647 8826FA5E C4U08DE9 8DF98806 75C208FC 5689FA46 89085688 06468BD8 Å.F..V..F'.V•.ôu.¡Ŧ.Ō§.6^'&.G..F 000060
 00689A0C 77FF260E 77FF26FA 5EC46475 C0080210 00689A08 77FF260A 77..'26FE ±&.w.&.w..h....âudé^'&.w.&.w..h. 000080
 77FF26FA 5EC43C75 C0080238 00689A14 77FF2616 77FF26FA 5EC45075 C00b ?24 $..âuPé^'&.w.&.w..h.8..âu<é^'&.w 0000A0
 C0080260 00689A18 77FF261A 77FF26FA 5EC42875 C008024C 00689A10 77FF2 12 .&.w..h.L..âu(é^'&.w.&.w..h.'..â 0000C0
 5EC4FE76 FF39E88D F2880574 C0080085 00689A1C 77FF261E 77FF26FA 5EC41475 u.é^'&.w.&.w..h....ât.¡·.$9.v±é^ 0000E0
 FFFC76FF FE76FF18 E88DF288 0574C008 00000293 9A0084B7 FF260086 87FF26FA '&.ñ..&.ñ........ât.¡·.$..v±.v•. 000100
 CD881E00 0008C800 04CAC91F 00E8C028 04E88DF2 880574C0 08000001 089AFA76 v'......ât.¡·.$.•åS..èò..à....¡ë 000120
 FF0A76FF 32E88DF3 88057E02 067E8306 7C01067E 830C740A 46080846 88D88E01 ..Å.F..F.t..-..|..-..-.¡µ.$2.v.. 000140
 E88DF988 0575D008 FA5689F8 4689FE56 88FC4688 0000FFFF 9A5016FC 46800876 v..F•.P......F•.V±.F½.V'.Åu.¡'.$ 000160
 0A468808 8E02AF88 1E000008 C80006CA C91F00E8 C0280789 26064688 FC5EC40D .é^•.F.&..•åS..èò..à....¡£..Å.F. 000180
 02D89A50 16FC468D 0A76FF0C 76FF35E8 80F38805 75084608 06468808 740C4608 .F.t..F..F.u.¡µ.$5.v..v..F•.P.Å. 0001A0
 065EC407 8826F85E C410E88D F9880575 D008FA56 89F84689 FE5688FC 46880000 ...F•.V±.F½.V'.Åu.¡'.$.é^½&..é^. 0001C0
 7E830C74 0A460808 4688D88E 0309881E 000008C8 0008CAC9 1F00E8C0 28078926 &..•åS..èò..à....¡...Å.F..F.t..~ 0001E0

Dump of file SATURN:[PCCOMMON.DUMP.DLL]BRDNOPL.TMP;1 on 18-APR-1990 10:37:32.99
File ID (520,34,0)   End of file block 272 / Allocated 272

Virtual block number 11 (0000000B), 512 (0200) bytes

 88000003 2E9A5016 FC468D08 76FF0A76 FF33E88D F388057E 01067E83 067C0006 ..|..-..-.¡µ.$3.v..v..F•.P...... 000000
 C02B7647 89260646 88F85EC4 0EE88DF9 880575D0 08FA5689 F84689FE 5688FC46 F•.V±.F½.V'.Åu.¡'.$.é^½.F.&.Gv•à 000020
 7508460B 06468808 740C460B 0A468808 8E0362B8 1E000008 C80006CA C91F00EB $..èò..à....¡b..Å.F..F.t..F..F.u 000040
 89F84689 FE5688FC 46880000 03889A50 16FC468D 0A76FF0C 76FF36EB 8DF38805 .¡µ.$6.v..v..F•.P......F•.V±.F½. 000060
 08CAC91F 00E8C02B 07892606 5EC47647 8826F85E C411E880 F9880575 D008FA56 V'.Åu.¡'.$.é^½&.Gvé^.&..•åS..èò. 000080
 08460806 46880874 0C46080A 46880000 F646C7D8 8E038D88 1E565700 000AC800 .à...WV.¡§..ÅÚF-...F..F.t..F..F. 0000A0
 4689FE56 88FC4688 000003E2 9A5016FC 468D0A76 FF0C76FF 00A4E98D F3880675 u.¡µ.ÔÉ..v..v..F•.P.ã....F•.V±.F 0000C0
 C4016A50 52002205 FA5688F8 46885016 F6468D7F E88DF988 0575D008 FA5689F8 ½.V'.Åu.¡'.$..F-.P.F½.V'.".RPj.é 0000E0
 1B7400F6 7E8352EB 8DF18805 74C0080E C48305B6 E80E0877 FF260A77 FF26F85E ^½&.w.&.w..ÔÑ..é..ât.¡þ.$R.—.t. 000100
 C02B065E C42DE81F A5F20008 89DA8E1E F088FB88 002205FA 5688F846 88065EC4 é^..F½.V'."..«.Þ..Ö¿..·E.$-é^.•â 000120
 065EC408 4789260A 47892606 5EC40447 89260647 8926065E C4078926 02478926 &.G.&..é^.&.G.&.G.é^.&.G.&.G.é^. 000140
 88D88E04 19881E56 5700004E C80008CA C95F5E1F 00E8C028 0C478926 0E478926 &.G.&.G.•åS..^_èò..âN..WV.¡...Å. 000160
 F8468800 0004449A 5016F846 801676FF 1876FF04 35E98DF3 88067518 46081646 F..F.u.¡µ.Ô5..v̄..v..F½.P.D....F½ 000180
 01E9C02B 0575023F 83260E5E C4040FE9 8DF98806 75D008E0 56890E46 89FA5688 .V'.FB.VÅ.Åu.¡'.Ö..é^B&.?.u.•âÖ. 0001A0
 006A026A 1676FF18 76FF0000 FFFF9A50 16E6468D 50168E46 801676FF 1876FF04 ..v..v..F/.P.F|.P......v..v.j.j. 0001C0
 890A578B 2608478B 260E5EC4 E45689E2 46890032 05E0568B DE468800 00FFFF9A ......FB.VÅ.2..Fã.Vöé^B&.G.&.W.. 0001E0

Dump of file SATURN:[PCCOMMON.DUMP.DLL]BRDNOPL.TMP;1 on 18-APR-1990 10:37:32.99
File ID (520,34,0)   End of file block 272 / Allocated 272

Virtual block number 12 (0000000C), 512 (0200) bytes

 88DA4689 C02802EB 00018805 74084608 06468800 740C4608 0A4688FE 5689FC46 F•.V±.F..F.t..F..F.t.¡..$.•â.FÖ. 000000
 16C0468D 00000846 C7C65689 C4468910 56880E46 88C25689 C0468914 56881246 F..V..Fâ.Vó.F..V..Fé.VóúFÅ...Fâ. 000020
 FE76FFE2 76FFE476 FF50160C 46805016 E8468000 6A08C483 FFFF0216 9A530650 P.S......é.j..FÒ.P.FÉ.P.vô.vã.v± 000040
 76FF5016 C0468D04 C483FFFF 04CF9ADE 76FFE076 FF12C483 FFFF02C6 9AFC76FF .v•.ó....é..vÅ.vB.ü....é..Fé.P.v 000060
 7F667C00 227F8326 E25EC402 D3E90375 00087E83 08C483FF FF05C89A FC76FFFE ±.v•.à....é..-Å.u.Ōœ.é^ã&..".|f. 000080
 89C8468D 88568986 4689000A 8300012D 22578826 20478826 5D760120 7F832607 .&.. .v]&.G &.W"-...Ö..FÑ.V¡.Fâ. 0000A0
 26044729 26885688 86468882 5EC40257 19260729 26864688 825EC4B4 568C8246 Fý.VÇé^ý.FÑ&).&.W.é^ý.FÑ.V¡&)G.& 0000C0
 47012688 56888646 88825EC4 0A571126 08470126 88568886 4688825E C4065719 .W.é^ý.FÑ.V¡&.G.&.W.é^ý.FÑ.V¡&.G 0000E0
 46880001 07C72606 5EC41FA5 F2000889 1F161EC8 768DF888 0A5EC40E 5711260C .&.W.é^..«.và...¿..·E.é^.&ú....F 000100
 0277FF26 8A5EC4B4 56898246 890C5688 0A46888C 56898A46 89005E05 E05688DE 8.VÅ.^..Fo.V¥.F..V..Fý.VÇé^o&.w. 000120
 74C008C0 2802E800 01880575 D00806ED 01309A37 FF260277 FF26825E C437FF26 &.7é^ý&.w.&.7.0.Ú..Åu.¡..$.•â.ât 000140
 C406F502 C39A825E C437FF26 0277FF26 8A5EC444 E8025788 26078826 825EC40C .é^ý&..&.W.$Dé^o&.w.&.7é^ý.ú.%.é 000160
 D88808C4 83071307 8E9A0709 03EF9ADC 8808EC83 070406C7 9A06FA02 C39A8A5E ^o.ú.'..ú....$..É.ý..../....é..Ä 000180
 FF268A5E C4025789 26078926 825EC407 4400FC9A 5052071F 04A69A07 1802569A .V....!...RP.•.D.é^ý&..&.W.é^o&. 0001A0
 2802E800 01880575 D0080768 01309A04 77FF2606 77FF2682 5EC40477 FF260677 w.&.w.é^ý&.w.&.w..0.k..Åu.¡..$.• 0001C0
 8A5EC407 7602C39- 045F8DB2 5EC448EB 06578826 04478826 825EC40D 74C008C0 â.ât.é^ý&.G.&.W.$Ké^ý._..ú.v.é^o 0001E0
```

```
Dump of file SATURN:[PCCOMMON.DUMP.DLL]BRDNOPL.TMP;1 on 18-APR-1990 10:37:32.99
File ID (520,34,0)   End of file block 272 / Allocated 272

Virtual block number 13 (0000000D), 512 (0200) bytes

8808C483 079407BE 9A078A03 EF9ADC88 08EC8307 8506C79A 077B02C3 9A045F8D ...û.(..ú....&..É.ÿ..../....á.. 000000
B25EC407 DE00FC9A 0477FF26 0677FF26 8A5EC450 5207AB04 A69A0799 02569AD8 Ä.V....l.¨.RPá^¤&.w.&.w..•.&.á^ÿ 000020
FF260277 FF268A5E C4B45689 82468900 08050C56 880A4688 06578926 04478926 &.G.&.W..F..V.....Fÿ.VÇá^¤&.w.&. 000040
C40C74C0 08C02802 E8000188 05750008 08080130 9A37FF26 0277FF26 825EC437 7á^ÿ&.w.&.7.0....Åu.¡..$.+á.åt.á 000060
8A5EC408 1302C39A 825EC437 FF260277 FF268A5E C444EB02 57882607 8826825E ^ÿ&..&.W.$Dá^¤&.w.&.7á^ÿ.û....á^¤ 000080
569AD888 08C48308 3107CE9A 082703EF 9ADC8808 EC830822 06C79A08 1802C39A .û....ú."..&..É.ÿ.'..ö.1..á..Ä.V 0000A0
0677FF26 8A5EC402 57892607 8926825E C4086200 FC9A5052 083D04A6 9A083602 .6..l.=.RP.•.b.á^ÿ&..&.W.á^¤&.w. 0000C0
08C02802 E8000188 05750008 08890130 9A0477FF 260677FF 26825EC4 0477FF26 &.w.á^ÿ&.w.&.w..0....Åu.¡..$.+á. 0000E0
5F8D8A5E C4089402 C39A045F 8D825EC4 4BEB0657 88260447 8826825E C40074C0 åt.á^ÿ&.G.&.W.$Ká^ÿ._..û...á^¤._ 000100
9AD88808 C4830882 07CE9A08 A803EF9A DC8808EC 8308A306 C79A0899 02C39A04 ..û....ú.É..&..É.ÿ.¨..ö.ÿ..á..Ä. 000120
8926825E C4FFFF00 FC9A0477 FF260677 FF268A5E C4505208 C904A69A 08870256 V.Ñ..l.è.RPá^¤&.w.&.w..•...á^ÿ&. 000140
260A5EC4 07892602 478926C0 280A5EC4 20740C46 080A4688 45EB0657 89260447 G.&.W.$E.F..F.t-á^.+à&.G.&..á^.& 000160
0646880C 4789260E 4789260A 5EC40847 89260A47 89260A5E C4044789 26064789 .G.&.G.á^.&.G.&.G.á^.&.G.&.G..F. 000180
C0280000 05519AE6 76FFBE76 FF1676FF 1876FF00 0007C726 065EC408 74084608 .F.t.á^.&ú....v..v..vf.v].Q...+à 0001A0
46080646 8808740C 46080A46 88D88E04 E8881E00 0002C800 14CAC95F 5E1F00EB $..^ èò..à....¡$..Ä.F..F.t..F..F 0001C0
4689078B 260A5EC4 20EB8DF3 88000007 C726065E C4087408 46080646 88157508 .u..F..F.t.á^.&ú...¡µ.$ á^.&...F 0001E0

Dump of file SATURN:[PCCOMMON.DUMP.DLL]BRDNOPL.TMP;1 on 18-APR-1990 10:37:32.99
File ID (520,34,0)   End of file block 272 / Allocated 272

Virtual block number 14 (0000000E), 512 (0200) bytes

0000C800 08CAC91F 00EBC02B 07892606 5EC4C02B 02E8027F 00073D07 7CC008FE ±.á|.=....$.+àá^.&..+à$..èò..à.. 000000
1EF08BFB 880C5688 0A46880E 5EC42075 003F8326 065EC408 8E093F88 1E565700 .WV.¡?..Äá^.&.?.u á^..F..V..«.Þ. 000020
E80E0A76 FF0C76FF 0E76FF10 76FF13E8 000107C7 26065EC4 1FA5F200 08890A8E .Ö¿..·É.á^.&ú...$..v..v..v..v..Ò 000040
C29A006A 006A0676 FF0876FF D88E0995 881E0000 08C8CBC9 5F5E1F08 C483032C ,.ιá..^_èùà....¡...Ä.v..v.j.j..ó 000060
FC4689FA 5688F846 882675C0 0801FC0A 589A5016 F8468006 76FF0876 FF0A0109 ....v..v..F%.P.X.•..àu&.F%.V°.F• 000080
E8C028C6 E80CC483 FF65E80E 0E76FF10 76FF5052 000C050A 76FF0C76 FFFE5689 .V±.v..v....RP.v..v..Òe..á.$ó+à$ 0000A0
FF0A5D09 C29A006A 006A0676 FF0876FF D88E09E0 881E5657 000034C8 C8C91F00 ..èùá4..WV.¡Å..Ä.v..v.j.j..ò.]... 0000C0
89044689 EA5688E8 -688028F E90374C0 080A930A 589A5016 E8468006 76FF0876 v..v..FÒ.P.X....åt.Õ...FÒ.Võ.Fà. 0000E0
5016E046 80500E76 FF3774D0 080E5689 DC468940 57882563E 47882604 5EC4D656 Vøá^à&.G>&.Wû.FÉ.VB.Åt7.vBP.FÅ.P 000100
6A0C76FF 0E76FF10 76FF1276 FF187400 E07E8306 7F237C00 E27E8309 F100F09A .Þ.Þ..~ã.|#...~Å.t..v..v..v..v.j 000120
F07E8D00 16050656 88D4468B 5174000A 7E830EC4 83FF79E8 0E0C76FF 0E76FF00 ..vB.vÉ.Òy..á..~..tQ.Fà.Vø....~Þ 000140
F46E8300 FA568305 F8468300 F25E8305 F06E831F A5F20008 B90A8E1E 0716F088 .Þ....Ö¿..·É..nÞ..^·..F%..V°..n¶ 000160
E80E1076 FF1276FF 5016F046 8D0C76FF 0E76FF00 FE568305 FC468300 F65E8305 ..^~..F•..V±..v..v..FÞ.P.v..v..Ò 000180
FEAAE80E 6677FF26 6877FF26 045EC40C 76FF0E76 FF1076FF 1276FF0C C483FE7B (±.á..v..v..v..v.á^à&.wh&.wf.Ò¨± 0001A0
FF264477 FF26045E C4085A09 C29A006A 006A4277 FF264477 FF26D45E C40CC483 .á.á^à&.wD&.wBj.j..ò.Z.á^à&.wD&. 0001C0
83025689 0046890A 56880846 88018FE9 0374C008 08800A58 9A501608 46804277 wB.FÅ.P.X.$..åt.Ò...FÅ.VÖ.FÅ.Vø. 0001E0

Dump of file SATURN:[PCCOMMON.DUMP.DLL]BRDNOPL.TMP;1 on 18-APR-1990 10:37:32.99
File ID (520,34,0)   End of file block 272 / Allocated 272

Virtual block number 15 (0000000F), 512 (0200) bytes

1276FF0C C483FE03 E80E1076 FF1276FF 50520036 050C76FF 0E76FF18 74000A7E ~..t..v..v..6.RP.v..v..Ò.±.á..v. 000000
FF26D05E C40CC483 FL32E80E 5077FF26 5277FF26 D05EC40C 76FF0E76 FF1076FF .v..v..v.á^à&.wR&.wP.Ò2±.á.á^à&. 000020
9A5016E4 46804877 FF264A77 FF26D05E C4080209 C29A006A 006A4877 FF264A77 wJ&.wHj.j..ò.ø.á^à&.wJ&.wH.Fõ.P. 000040
89025788 26078826 E45EC400 F1E90647 8826E45E C40114E9 0374C008 0A4D0A58 X.M..åt.Ò..á^ò&.G.Òþ.á^ò&..&.W.. 000060
FF0E76FF 0000FFFF 9A5016F0 4680016A 0677FF26 0877FF26 CC5EC4CE 5689CC46 Fä.Vöá^ä&.w.&.w.j..FÞ.P......v.. 000080
0C76FF0E 76FF1076 FF1276FF 0CC483FD 6CE80E10 76FF1276 FF5016F0 46800C76 v..FÞ.P.v..v..Òl=.á..v..v..v..v. 0000A0
89025788 26078826 E45EC400 A7E90CC4 83FD09E8 0E2677FF 262877FF 26CC5EC4 á^ä&.w(&.w&.Ò.».á.Òl.á^ò&..&.W.. 0000C0
FF0E76FF 0000FFFF 9A5016F0 4680016A 0677FF26 0877FF26 EC5EC4EE 5689EC46 F&.VYá^$&.w.&.w.j..FÞ.P......v.. 0000E0
0C76FF0E 76FF1076 FF1276FF 0CC483FD 0CE80E10 76FF1276 FF5016F0 46800C76 v..FÞ.P.v..v..Ò.».á..v..v..v..v. 000100
46890257 88260788 26E45EC4 48EB0CC4 83FD3BE8 0E2477FF 262677FF 26EC5EC4 á^$&.w&&.w$.Ò;=.á.$Há^ò&..&.W..F 000120
83FD08E8 0E2677FF 262877FF 26CC5EC4 0C76FF0E 76FF1076 FF1276FF CE5689CC ë.Vö.v..v..v..v.á^ä&.w(&.w&.Ò.». 000140
E9FE00E9 00EBFF5B E9037500 0230C274 00013DFF 08E90375 C00816EB 18EB0CC4 á.$.$..àu.Õ..=..tô=..u.Õ[.$.ÕÅ±Õ 000160
88260788 26065EC4 D88E0A3C 881E0000 00C8CBC9 5F5E1F00 E8C028FD 5AE9FE55 U±ÕZ=+à$..^_èùà....¡<..Äá^.&..&. 000180
260A5EC4 02578826 07882606 5EC41476 07392605 7F187C02 5739260A 5EC40257 W.á^.&9W.|...&9.v.á^.&..&.W.á^.& 0001A0
04473926 067F1E7C 06573926 0A5EC406 57882604 47882606 5EC40257 89260789 ..&.W.á^.&.G.&.W.á^.&9W.|...&9G. 0001C0
26084788 26065EC4 06578926 04478926 0A5EC406 57882604 47882606 5EC41676 v.á^.&.G.&.W.á^.&.G.&.W.á^.&.G.& 0001E0
```

Dump of file SATURN:[PCCOMMON.DUMP.DLL]BRDNOPL.TMP;1 on 18-APR-1990 10:37:32.99
File ID (520,34,0) End of file block 272 / Allocated 272

Virtual block number 16 (00000010), 512 (0200) bytes

```
C40A5788 26084788 26065EC4 16730847 3926067C 1E7F0A57 39260A5E C40A5788 .W.á^.&9W...|.&9G.s.á^.&.G.&.W.á 000000
067C1E7F 0E573926 0A5EC40E 5788260C 47882606 5EC40A57 89260847 89260A5E ^.&.G.&.W.á^.&.G.&.W.á^.&9W...|. 000020
90C8C91F 0E578926 0C478926 0A5EC40E 5788260C 47882606 5EC41673 0C473926 &9G.s.á^.&.G.&.W.á^.&.G.&.W..èu. 000040
000A05F7 0002027F 00050509 02030000 00090506 00020272 00050049 02030010 ....I...r...ø...............¼... 000060
0003027C 0203028D 00050542 02030000 000C05B6 00020014 0003005B 02030000 ....(.......Ñ.......B.......|... 000080
0005092A 02030000 00140845 0002029E 00050039 0203021E 00040C68 02030022 "...h.......9.......E.......*... 0000A0
00040C08 02030000 00190004 00020000 001706C0 00020000 001605E4 000202AA ^...ð.......å................... 0000C0
080E4688 D88EFFFF 881E5657 00002AC8 00000000 00000000 00000000 000000CC ä...............å*..WV.|...Ä.F.. 0000E0
26C02806 5EC40104 E98DF388 06750846 08064688 08740C46 080A4688 10741046 F.t..F..F.t..F..F.u.|æ.Ôå.á^.+åå 000100
89E44689 FE5688FC 46880000 FFFF9A50 16FC468D 0E76FF10 76FF0789 26024789 .G.&...v..v..F•.P......F•.V±.Fð. 000120
16DE468D 009A680E 6A50E246 89064788 26E45EC4 01A2E98D F1880675 D008E656 VI.Åu.|þ.ÕÅ.á^ðå.G..FãPj.h...Fß. 000140
E276FFA5 F2004DB9 0000BEFB 88DE5EC4 017EE98D F2880674 C0080000 FFFF9A50 P......ât.|·.Õ~.á^ß.«/Å.¿M.·Ë.vã 000160
50520042 05E05688 DE4688E2 76FF2E75 C00800B3 00009A50 52003E05 C28CC388 .Û.ô.>.RP...°..âu..vã.Fß.VÅ.B.RP 000180
1474C008 FFFF0000 9A505200 6605E056 880E4688 E276FF17 75C00800 CA00009A ...ò..âu..vã.Fß.VÅ.f.RP......ât. 0001A0
16F088EC 7E800C56 880A4688 011AE98E 07880000 FFFF9ADE 76FFE076 FFE276FF .vã.vÅ.vß.....|..Õ...F..V..~$.Þ. 0001C0
88EC4688 2476EC46 39057F28 7CEE5639 F65688F4 46881FA5 F2000889 DA8E1E07 ...Ö¿...E..F¶.V-9VŸ|+..9F$v$.F$. 0001E0
```

Dump of file SATURN:[PCCOMMON.DUMP.DLL]BRDNOPL.TMP;1 on 18-APR-1990 10:37:32.99
File ID (520,34,0) End of file block 272 / Allocated 272

Virtual block number 17 (00000011), 512 (0200) bytes

```
F65689F4 46890C56 880A4688 EE5689EC 4689F656 88F44688 DC56890A 4689EE56 VŸ.FÖ.VÉ.F¶.V-.F$.VŸ.FÖ.VÉ.F¶.V- 000000
46880856 89064689 F25688F0 46882476 F0463905 7F287CF2 5639FA56 88F84688 .F½.V•9V·|+..9FÞv$.FÞ.V·.Fø.VÅ.F 000020
26E65688 E44688DE 5EC4FA56 89F84689 08568806 4688F256 89F04689 FA5688F8 ½.V•.FÞ.V·.Fø.VÅ.F½.V•á^ß.Fß.VÌ& 000040
8D167F8D DE5EC41F A5F20008 891F161E EC768D06 7F8DDE5E C4045789 26024789 .G.&.W.á^ß....v$...¿..·Ë.á^ß.... 000060
DE46881F A5F20008 891F161E EC768D26 7F8DDE5E C41FA5F2 0008891F 161EEC76 v$...¿..·Ë.á^ß..&.v$...¿..·Ë..Fß 000080
9D9A5052 006A016A 006A006A 1477FF26 1677FF26 E45EC4EA 5689E846 89E05688 .VÅ.FÕ.Vöá^ö&.w.&.w.j.j.j.j.RP.. 0000A0
E8468806 5EC414E8 8E078800 0000DA9A DE76FFE0 76FFE276 FF1374C0 08009C02 ....ât..vã.vÅ.vß.Ö...|..Š.á^..FÒ 0000C0
88D88E00 08881E00 0014C800 0CCAC95F 5E1F00E8 C0280257 89260789 26EA5688 .Vö&..&.W.+âŠ..^_èò..à....|...Å. 0000E0
02478826 F85EC4FA 5689F846 890A5688 08468801 1EE98DF3 8806750A 46080846 F..F.u.|æ.Õ...F.¯V..F½.V•á^½&.G. 000100
1038E80E F876FFFA 76FF0676 FF137502 3F8326FC 5EC4FE56 89FC4689 04578826 &.W..F•.V±á^=&.?.u..v..v•.v½.Ò;. 000120
6877FF26 F85EC400 81E90375 00067E83 0001008C 87C726F8 5EC400E5 E906C483 .á.Öl.á^½&ú......-..u.ÖŸ.á^½&.wh 000140
0A589A50 16EC4680 6677FF26 6877FF26 F85EC402 9009C29A 006A006A 6677FF26 &.wfj.j..ô...á^½&.wh&.wf.F$.P.X. 000160
006A4277 FF264477 FF26F85E C40AEBFF FF04049A EC76FFEE 76FF0075 C00802B5 ç..âu..vŸ.v$.....Šöá^½&.wö&.wßj. 000180
0F75C008 02F10A58 9A5016F0 46804277 FF264477 FF26F85E C402CA09 C29A006A j..ò.ò.á^½&.wö&.wß.FÞ.P.X.þ..âu. 0001A0
C29A006A 006A3E77 FF264077 FF26F85E C408E8FF FF01659A 016AF076 FFF276FF .v·.vÞj..e...$Åá^½&.wà&.w>j.j..ô 0001C0
FFF676FF 0E75C008 01D10A58 9A5016F4 4680З3E77 FF264077 FF26F85E C4030609 ...á^½&.wà&.w>.F¶.P.X.î..âu..v-. 0001E0
```

Dump of file SATURN:[PCCOMMON.DUMP.DLL]BRDNOPL.TMP;1 on 18-APR-1990 10:37:32.99
File ID (520,34,0) End of file block 272 / Allocated 272

Virtual block number 18 (00000012), 512 (0200) bytes

```
C00B08C4 83FFFF04 4A9AFC76 FFFE76FF 0876FF0A 76FFD9E8 FEEDE80E 016AF476 v¶j..ÒÚ±Š).v..v..v±.v=.J....á..á 000000
0E460B0C 4688D88E 0208881E 00001CC8 0006CAC9 1F00E8C0 2804E88E 07880574 t.|..Š.+âŠ..èò..à....|...Å.F..F. 000020
8904578B 2602478B 26F45EC4 F65689F4 46890E56 880C4688 0264E98D F3880675 u.|æ.Õd..F..V..F¶.V-á^¶&.G.&.W.. 000040
0A578B26 08478B26 F85EC4FC 4689FE46 89C02B1B 750A4608 084688FA 5689F846 F½.V•.F..F.u.+â.F±.F•á^½&.G.&.W. 000060
89405788 263E4788 26FC5EC4 FE5689FC 46890A56 88084688 1DEBF256 89F04689 .FÞ.V·Š..F..V..F•.V±á^=&.G>&.Wâ. 000080
7400008C BF832608 75000090 BF8326F4 5EC4000F E9037500 067E83F2 5689F046 FÞ.V·.-..u.ÖÖ.á^¶&.¢...u.&.¢...t 0000A0
0876FF0A 76FF1875 00008CBF 8326FC5E C429740A 46080846 8801E5E9 8E008806 .|..Öl..F..F.t)á^=&.¢...u..v..v. 0000C0
006AF076 FFF276FF 0184E98E 00880674 C00808C4 83FFFF16 249A0C76 FF0E76FF .v..v..$....á..ât.|..ÖÇ..v·.vÞj. 0000E0
4688F45E C40191E9 8E078806 74C00802 7B02909A 0C76FF0E 76FF006A 016A006A j.j.j..v..v....(..ât.|..Õ..á^¶.F 000100
FF261677 FF26F85E C4385789 26364789 26F45EC4 3C578926 3A478926 0A568808 ..V.&.G:&.W<á^¶&.G6&.Wßá^½&.w.&. 000120
5EC41874 FFEE7E83 0675FFEC 7E830484 091E9A50 16EC468D 0C76FF0E 76FF1477 w..v..v..F$.P......~$.u..~Ÿ.t.á^ 000140
00010090 87C726F4 5EC4041F 05009A00 6AEC76FF EE76FF14 77FF2616 77FF26F8 ½&.w.&.w..vŸ.v$j..Å...á^¶&ú..... 000160
76FF010E E98E00B8 06750000 908F8326 F45EC401 18E90001 009487C7 26F45EC4 á^¶&ú.....Õ..á^¶&.¢...u.|..Õ...v 000180
0675FFEA 7E830C75 FFE87E83 04E7091E 9A5016E8 46800C76 FF0E76FF F076FFF2 ·.vÞ.v..v..FÒ.P...Ó..-Ò.u..-ô.u. 0001A0
767F8326 F85EC405 0505D09A 006AE876 FFEA76FF F076FFF2 76FF00E6 E98E07B8 |..Öl..v·.vÞ.vö.vÒj..Å...á^½&..v 0001C0
FF264077 FF26F45E C4051A09 C29A006A 006A3E77 FF264077 FF26F45E C47E7501 .u-á^¶&.wâ&.w>j.j..ô...á^¶&.wâ&. 0001E0
```

```
Dump of file SATURN:[PCCOMMON.DUMP.DLL]BRDNOPL.TMP;1 on 18-APR-1990 10:37:32.99
File ID (520,34,0)   End of file block 272 / Allocated 272

Virtual block number 19 (00000013), 512 (0200) bytes

 76FFE676 FF3E77FF 264077FF 26F45EC4 5175C008 05390A58 9A5016E4 468D3E77 w>.Fô.P.X.9..åuOá^¶&.wä&.w>.v|.v 000000
 FFF276FF 70EB8E07 880575FF EA7E8308 75FFE87E 83056309 1E9A5016 E84680E4 ð.Fð.P...c..-Ô.u..-ð.u.¡..Sp.v·. 000020
 E8000100 9487C726 E45EC405 A302909A E476FFE6 76FF006A 016A006A 006AF076 vÞj.j.j.j..v|.vð...Ê.á^ð&ú.....$ 000040
 77FF26F8 5EC43857 E0263647 8926F45E C43C5789 263A4789 2699C028 F45EC496 .á^¶+à.&.G:&.W<á^¶&.G6&.Wöá^Y&.w 000060
 5EC40EE8 8E07B805 74C00804 6002909A 0C76FF0E 76FF5001 6A505014 77FF2616 .&.w.PPj.P.v..v....'..åt.¡..$.á^ 000080
 46080A46 8BD88E03 4E981E00 0000C800 0ACAC91F 00EBC028 00000090 87C726F4 ¶&ú.....+åS..èð..à....|F..Ä.F..F 0000A0
 065EC400 88978826 00868788 260A5EC4 1BE88DF3 88057508 46080646 8808740C .t..F..F.u.|µ.S.á^.&....&....á^. 0000C0
 0C46080A 4688D88E 05C7881E 000000C8 0008CAC9 1F00EBC0 28025789 26078926 &..&.W.+åS..èð..à....|ú..Ä.F..F. 0000E0
 C91F00EB C0280088 97892600 86878926 08568806 46880A5E C417E880 F3880575 u.|µ.S.á^..F..V.&....&....+åS..è 000100
 88067508 46080646 8808740C 46080A46 88088E06 06881E56 57000052 C80008CA ð..åR..WV.|...Ä.F..F.t..F..F.u.| 000120
 50160A76 FF52E056 8C0E4689 CE468DCC 5689CA46 890C5688 0A468805 58E98DF3 µ.Ô(..F..V..Fð.Vë.Fö.F8.VÅR.v..P 000140
 FC4689EC 468D1FA5 F2000889 0A8E1E07 16F088EC 7E800856 88064688 0543E80E .ÔC..F..V..-£.Þ....Ô¿..·Ê..F£.F• 000160
 88260788 26207308 47392606 7C357F0A 57392602 57882607 8826FC5E C4FE568C .V±á^•&..&.W.&9W..S|.&9G.±-&..&. 000180
 84568882 4688FC5E C4025789 26078926 0A578826 08478826 84568982 46890257 W..Fý.VÇ&.G.&.W.&..&.W.á^•.Fý.VÇ 0001A0
 76044739 26067F37 7C065739 260E5788 260C4788 26FC5EC4 0A578926 08478926 &.G.&.W.á^•&.G.&.W.&9W.|7..&9G.v 0001C0
 C4065789 26044789 260E5788 260C4788 26805689 AE468906 57882604 4788262F /&.G.&.W..FÙ.V¯&.G.&.W.&.G.&.W.á 0001E0

Dump of file SATURN:[PCCOMMON.DUMP.DLL]BRDNOPL.TMP;1 on 18-APR-1990 10:37:32.99
File ID (520,34,0)   End of file block 272 / Allocated 272

Virtual block number 20 (00000014), 512 (0200) bytes

 0739260E 5EC40257 88260788 26FC5EC4 0E578926 0C478926 805688AE 4688FC5E ^•.FÙ.V¯&.G.&.W.á^•&..&.W.á^B&9. 000000
 0A573926 3F750847 39260E5E C40A5788 26084788 26FC5EC4 53750257 39265975 uY&9W.uSá^•&.G.&.W.á^B&9G.u?&9W. 000020
 26FC5EC4 1F750657 39262575 04473926 0E5EC406 57882604 478826FC 5EC43975 u9á^•&.G.&.W.á^B&9G.u%&9W.u.á^•& 000040
 5688CA46 880425E9 C0280575 0E573926 08750C47 39260E5E C40E5788 260C4788 .G.&.W.á^B&9G.u.&9W.u.+åÔ%..Fð.V 000060
 260A5788 26084788 260E5EC4 08C483FF FF0CFE9A 0676FF08 76FF5052 002605CC ä.&.RP.v..v..±....á.á^B&.G.&.W.& 000080
 03750638 0775C138 02771826 0F28260A 77882608 4F8826FC 5EC40257 18260728 +.&.W.á^•&.O.&.w.&+.&.w.;èu.;øu. 0000A0
 26084788 26FC5EC4 3A750257 39264075 0739260E 5EC40257 88260788 26009CE9 Ô..&..&.W.á^B&9.u@&9W.u:á^•&.G.& 0000C0
 4788260E 5EC40080 9711267E 470126CA 5EC40A57 18260847 2826DE5E C40A5788 .W.á^B&+G.&.W.á^ð&.G-&....á^B&.G 0000E0
 DE5EC40A 57882608 478826FC 5EC44DEB 0A578926 08478926 FC5EC40A 57882608 .&.W.á^•&.G.&.W.$Mñ^•&.G.&.W.á^B 000100
 02571826 0728260E 5EC40257 88260788 26FC5EC4 33750A57 39263975 08473926 &9G.u9&9W.u3á^•&..&.W.á^B&+.&.W. 000120
 C4025789 26078926 FC5EC402 57882607 88260E5E C4785711 26764701 26CA5EC4 á^ð&.Gv&.Wxá^B&..&.W.á^•&..&.W.á 000140
 4F28260E 7788260C 4F8826FC 5EC40657 18260447 28260E57 88260C47 88260E5E ^B&.G.&.W.&+G.&.W.á^•&.O.&.w.&+O 000160
 75044739 260E5EC4 06578826 04478826 00A3E903 75063807 75C13806 7718^404 .&.w.;èu.;øu.ÔÉ.&.G.&.W.á^B&9G.u 000180
 CA5EC40E 5718260C 4728260E 5EC40E57 88260C47 8826FC5E C4387506 57392..1 A&9W.u;á^•&.G.&.W.á^B&+G.&.W.á^ð 0001A0
 0E578926 0C478926 FC5EC40E 5788260C 4788260E 5EC40084 97112600 828701.6 &....&....á^B&.G.&.W.á^•&.G.&.W. 0001C0
 26FC5EC4 37750E57 39263075 0C473926 DE5EC40E 5788260C 478826FC 5EC451EB $Qá^•&.G.&.W.á^B&9G.u=&9W.u7á^•& 0001E0

Dump of file SATURN:[PCCOMMON.DUMP.DLL]BRDNOPL.TMP;1 on 18-APR-1990 10:37:32.99
File ID (520,34,0)   End of file block 272 / Allocated 272

Virtual block number 21 (00000015), 512 (0200) bytes

 DE5EC47C 5711267A 470126CA 5EC40657 18260447 2826DE5E C4065788 26044788 .G.&.W.á^B&+G.&.W.á^ð&.Gz&.W|á^B 000000
 88260847 88260E5E C4026A00 6A065789 26044789 26FC5EC4 06578826 04478826 &.G.&.W.á^•&.G.&.W.j.j.á^B&.G.&. 000020
 4788260E 5EC4026A 006A8856 89864689 09820060 9A505202 57132607 03260A57 W.&..&.W.RP.'....FÑ.V¡j.j.á^B&.G 000040
 5EC4026A 006A8C56 898A4689 09A50060 9A50520E 5713260C 47032606 57882604 .&.W.&.G.&.W.RP.'.E..Fα.V¥j.j.á^ 000060
 6A006AE6 5689E446 8909C900 609A5052 02571326 0703260A 57882608 478826FC •&.G.&.W.&..&.W.RP.'.è..Fð.V|j.j 000080
 5689E846 89FFFF00 609A5052 0E571326 0C470326 06578826 04478826 FC5EC402 .á^•&.G.&.W.&.G.&.W.RP.'....FÔ.V 0000A0
 898C561B 8A462BEA 5688E846 88C05689 8E468988 5618B646 28E65688 E44688EA ð.Fð.V|+FÑ.V¡.F/.Vá.Fð.Võ+Fα.V¥. 0000C0
 C6468900 6E05CC56 88CA4688 7374C208 C2468807 75C04608 8E4688C4 5689C246 Fð.Vá.F/.Fåu..Fð.ôts.Fð.Vë.n..Fó 0000E0
 04470126 C45688C2 4688C65E C4025711 26070126 C05688BE 4688C65E C4C85689 .Vàá^ó.F/.Vå&..&.W.á^ó.Fð.Vá&.G. 000100
 470126C4 5688C246 88DE5EC4 02571126 070126C0 5688BE46 88DE5EC4 06571126 &.W.á^B.F/.Vå&..&.W.á^B.Fð.Vá&.G 000120
 26C45688 C24688DE 5EC40A57 11260847 0126C056 88BE4688 DE5EC406 57112604 .&.W.á^B.F/.Vá&.G.&.W.á^B.Fð.Vá& 000140
 C4517502 57392657 75073926 DE5EC402 57882607 8826FC5E C40E5711 260C4701 .G.&.W.á^•&..&.W.á^B&9.uW&9W.uÔá 000160
 04478826 FC5EC437 750A5739 26307508 4739260E 5EC40A57 88260847 8826FC5E ^•&.G.&.W.á^B&9G.u=&9W.u7á^•&.G. 000180
 5EC40E57 88260C47 8826FC5E C4107506 57392623 75044739 260E5EC4 06578826 &.W.á^B&9G.uW&9W.u.á^•&.G.&.W.á^ 0001A0
 037C04E2 7E83E246 FF03E800 00E246C7 00C2E903 750E5739 2609750C 4739260E B&9G.u.&9W.u.Ôö.úFã..$..Fã.-ã.|. 0001C0
 CA5EC402 57182607 2826DE5E C4025788 26078826 FC5EC400 8EE9E246 8800AFE9 Ô€..FãÔ..á^•&..&.W.á^B&+.&.W.á^ð 0001E0
```

```
Dump of file SATURN:[PCCOMMON.DUMP.DLL]BRDNOPL.TMP;1 on 18-APR-1990 10:37:32.99
File ID (520,34,0)   End of file block 272 / Allocated 272

Virtual block number 22 (00000016), 512 (0200) bytes

 571B2604 4728260E 5EC40657 88260447 8826FC5E C40084E9 78571126 76470126 &.Gv&.WxÕ..á^•&.G.&.W.á^8&+G.&.W 000000
 08472826 DE5EC40A 57882608 478826FC 5EC461EB 7C571126 7A470126 CA5EC406 .á^ò&.Gz&.W|$aá^•&.G.&.W.á^8&+G. 000020
 0E5EC40E 5788263C 478826FC 5EC43DEB 00809711 267E4701 26CA5EC4 0A571B26 &.W.á^ò&.G-&....$=á^•&.G.&.W.á^8 000040
 02740001 309074C0 0818EB00 84971126 00828701 26CA5EC4 0E571B26 0C472826 &+G.&.W.á^ò&....&....$..àt.=..t@ 000060
 00EBC028 00010094 87C726CA 5EC4FF45 E900E8A1 7400033D FF61E903 7500023D =..u.Õa.=..tÀ$.ÕE.á^ò&ú.....+à$. 000080
 08FE5689 FC46890C 56880A46 88D88E06 38881E56 57000008 C80008CA C95F5E1F .^_èò..à...WV.¡:..Ä.F..V..F=.Vz. 0000A0
 88F88800 1605FE56 88FC4688 065EC400 DBE98DF3 88067508 46080646 880874C2 õt_.F..F.u.¡µ.ÕÙ.á^..F=.Vz....«. 0000C0
 C4025711 26070126 065EC478 57882676 478826FC 5EC41FA5 F2000889 DA8E1EF0 Þ..Õ¿...É.á^=&.Gv&.Wxá^.&..&.W.á 0000E0
 80978826 7E478826 FC5EC406 57112604 47012606 5EC47C57 88267A47 8826FC5E ^•&.Gz&.W|á^.&.G.&.W.á^=&.G-&... 000100
 0C470126 065EC400 84978826 00828788 26FC5EC4 0A571126 08470126 065EC400 .á^.&.G.&.W.á^•&....&....á^.&.G. 000120
 065EC402 57882607 8826F85E C4FA5689 F8468900 6E05FE56 88FC4688 0E571126 &.W..F=.Vz.n..F½.V¹á^¥&..&.W.á^. 000140
 F85EC406 57112604 47012606 5EC40657 88260447 8826F85E C4025711 26070126 &..&.W.á^¥&.G.&.W.á^.&.G.&.W.á^½ 000160
 065EC406 57882604 478826F8 5EC40A57 11260847 0126065E C4025788 26078826 &..&.W.á^.&.G.&.W.á^¥&.G.&.W.á^. 000180
 0A468808 8E088F88 1E00000C C80008CA C95F5E1F 00E8C028 0E571126 0C470126 &.G.&.W.+à$..^_èò..à....¡¢..Ä.F. 0001A0
 F388067D 00067F83 26077C00 027F8326 065EC411 7408460B 06468819 740C4608 .F.t..F..F.t.á^.&....|.&....).¡µ 0001C0
 4689005E 05045788 26024788 26F85EC4 FA5689F8 46890C56 880A4688 0140E980 .Õa..F..V..F½.V¹á^¥&.G.&.W..^..F 0001E0

Dump of file SATURN:[PCCOMMON.DUMP.DLL]BRDNOPL.TMP;1 on 18-APR-1990 10:37:32.99
File ID (520,34,0)   End of file block 272 / Allocated 272

Virtual block number 23 (00000017), 512 (0200) bytes

 FF26065E C437FF26 0277FF26 FC5EC4F6 5689F446 89005E05 C28CC388 FE56??FC =.Vz.Û.Ô.^..F¶.V-á^=&.w.&.7á^.&. 000000
 26078826 065EC40C 74C008C0 2802E800 01880575 D0080065 01309A37 FF260277 w.&.7.0.e..Àu.¡..$.+à.àt.á^.&..& 000020
 9A007202 C39AFC5E C4006002 C39A065E C437FF26 0277FF26 FC5EC444 E8025788 .W.$Dá^•&.w.&.7á^..û.m.á^•.û.r.. 000040
 04A69A00 9002569A 088808C4 83008807 CE9A0081 03EF9ADC 8808EC83 007C06C7 ú.|..&..É.ÿ....ö....á..Ä.V....Ì. 000060
 5EC40477 FF260677 FF26FC5E C4025789 26078926 F45EC400 BC00FC9A 50520097 ..RP.=.¥.á^¶&..&.W.á^=&.w.&.w.á^ 000080
 065EC400 74C008C0 2802E800 01880575 D00800E3 01309A04 77FF2606 77FF2606 .&.w.&.w..0.D..Àu.¡..$.+à.àt.á^. 0000A0
 00F302C3 9A045F80 FC5EC400 EE02C39A 045F8006 5EC448EB 06578826 04478826 &.G.&.W.$Ká^.._..û.¥.á^•._..û.µ. 0000C0
 A69A0E11 02569AD8 8808C483 0E0C07CE 9A0E0203 EF9ADC88 08EC8300 FD06C79A .û.»..&..É.y....ö....á..Ä.V....Ì 0000E0
 06578926 04478926 F45EC409 5E00FC9A 0477FF26 0677FF26 FC5EC450 520E2304 .#.RPá^•&.w.&.w..•.^.á^¶&.G.&.W. 000100
 06468808 740C4608 0A468808 8E0CC988 1E565700 0000C800 08CAC91F 00E8C028 +à$..èò..à...WV.¡è..Ä.F..F.t..F. 000120
 A5A5A5DA 8E1EF088 F888005E 050C5688 0A468806 5EC41CE8 8DF38805 7508460B .F.u.¡µ.$.á^..F..V..^..«.Þ..ÕÉÉÉ 000140
 FC46890E 56880C46 88D88E0E 41881E00 0004C800 08CAC95F 5E1F00E8 C0281FA5 É.+à$..^_èò..à....¡A..Ä.F..V..F= 000160
 07892602 478926C0 28065EC4 73E880F3 88057508 46080646 880874C2 08FE5689 .Vz.õt..F..F.u.¡µ.$sá^.+à&.G.&.. 000180
 57392658 57882656 478826FC 5EC41EE8 5A478926 5C478926 FC5EC400 740A4639 9F.t.á^=&.G\&.GZ$.á^=&.GV&.WX&9W 0001A0
 265C77FF 264277FF 264477FF 26FC5EC4 37E880FF 8805725A 47392606 7F007C5C \|...&9GZr.¡..$7á^=&.wD&.wB&.w\& 0001C0
 FF880574 C00804C2 08689A06 76FF0876 FF006A00 5C578326 015A4783 265A77FF .wZ&.GZ.&.W\.j..v..v..k.ô..àt.¡. 0001E0

Dump of file SATURN:[PCCOMMON.DUMP.DLL]BRDNOPL.TMP;1 on 18-APR-1990 10:37:32.99
File ID (520,34,0)   End of file block 272 / Allocated 272

Virtual block number 24 (00000018), 512 (0200) bytes

 08740C46 080A4688 D88E0E83 881E5657 000018C8 000ACAC9 1F00E8C0 2804E88D .$.+à$..èò..à...WV.¡...Ä.F..F.t. 000000
 08260447 88260F75 02470826 07882606 5EC400E6 E98DF388 06750846 08064688 .F..F.u.¡µ.Õl.á^.&..&.G.u.&.G.&. 000020
 1E0716F0 88F07E8D 001605EE 5689EC46 890C5688 0A468800 C8E9C028 05750647 G.u.+àÕù..F..V..F&.VŸ....-Þ.Þ... 000040
 06578826 04478826 F25611F0 46010257 88260788 2608468E 1FA5F200 0889DA8E .Õ¿...É..F.&..&.W..FÞ.V.&.G.&.W. 000060
 5611FC46 01065788 26044788 26FA5611 F8460102 57882607 8826F656 11F44601 .F¶.V-&..&.W..F½.V¹&.G.&.W..F=.V 000080
 05EE5688 EC468808 C483079F 0CFE9A50 16F0468D 50520026 05EE5688 EC4688FE z.F&.VŸ.&.RP.FÞ.P.z....á..F&.VŸ. 0000A0
 26065EC4 02571126 070126E8 5EC40257 88260788 26065EC4 EA5689E8 4689006E n..FÒ.Võá^.&..&.W.á^Ò&..&.W.á^.& 0000C0
 0E530609 7500008E 8F8326EC 5EC40657 11260447 0126E85E C4065788 26044788 .G.&.W.á^Ò&.G.&.W.á^$&.¢...u..S. 0000E0
 1E000004 C80008CA C95F5E1F 00E8C028 00010094 87C726EC 5EC404C4 830375E8 Òu..á.á^$&ú.....+à$..^_èò..à.... 000100
 8800ACE9 8DF38806 7E0A0A7E 83067C00 0A7E830C 740E460B 0C4688D8 8E0F2488 ¡$..Ä.F..F.t..~..|..~.~.¡µ.Õ¯.. 000120
 FC5EC456 E80A4688 FE5689FC 46890E56 880C4688 009FE9C0 28057508 46080646 F..F.u.+àÕ...F..V..F=.Vz.F.$Vá^= 000140
 9711267E 47012608 56880646 88FC5EC4 59E87857 11267647 01260856 88064688 .F..V.&.Gv&.Wx$Yá^•.F..V.&.G-&.. 000160
 08568806 4688FC5E C432E87C 5711267A 47012608 56880646 88FC5EC4 45E80080 ..$Eá^•.F..V.&.Gz&.W|$2á^•.F..V. 000180
 00043DDA 7400023D CC740001 3D16E83A E88DF388 1DE80084 97112600 82870126 &....&....$.¡µ.$:$.=..tø=..tÕ×.. 0001A0
 FC5EC404 C483029E E80E5306 09750000 8E8F8326 FC5EC4E3 E8A97400 08309874 t.=..t`$Dá^•&.¢...u..S.Ò...á.á^= 0001C0
 08460806 4688D88E 1031881E 000014C8 000ACAC9 1F00E8C0 28000100 9487C726 &ú.....+à$..èò..à....¡1..Ä.F..F. 0001E0
```

```
Dump of file SATURN:[PCCOMMON.DUMP.DLL]BRDNOPL.TMP;1 on 18-APR-1990 10:37:32.99
File ID (520,34,0)   End of file block 272 / Allocated 272

Virtual block number 25 (00000019), 512 (0200) bytes

89045788 2602478* 26065EC4 FE5689FC 46890856 88064688 0170E98D F3880675 u.|µ.Ôp..F..V..F•.V±á^.&.G.&.W.. 000000
000605C2 8CC3880A 76FF0C76 FF0E76FF 1076FF2A 740C4608 0A4688F2 5689F046 FÞ.V·.F..F.t*.v..v..v..v..ú.ô... 000020
FF266877 FF26065E C414C483 03290000 9A016AFC 76FFFE76 FF008A87 FF265052 RP&.ñ...v±.v•j....)..á.á^.&.wh&. 000040
11830A58 9A5016F4 46806677 FF266877 FF26065E C4118E09 C29A006A 006A6677 wfj.j..ô...á^.&.wh&.wf.F¶.P.X.*. 000060
006A006A 4277FF26 4477FF26 065EC40A EB029F05 A49AF476 FFF676FF 0D75C008 .åu..v~.v¶.Ê...Šöá^.&.wD&.wBj.j. 000080
76FF1575 C0080F08 0A589A50 16F84680 4277FF26 4477FF26 065EC411 C809C29A .ô.à.á^.&.wD&.wB.F½.P.X....åu..v 0000A0
3877FF26 065EC4FC 76FFFE76 FFD2EB02 0B02FF9A 006AFC76 FFFE76FF F876FFFA *.v½.v±.v•j....Ü.$ø.v±.v•á^.&.wB 0000C0
5016EC46 80FC76FF FE76FF14 77FF2616 77FF26F0 5EC4F146 EB0E006A 3677FF26 &.wój..ÒFþá^Þ&.w.&.w..v±.v•.Få.P 0000E0
FFEE76FF 1477FF26 1677FF26 F05EC418 74FFEE7E 830675FF EC7E8312 37091E9A ...7..~å.u..~Ÿ.t.á^Þ&.w.&.w..vŸ. 000100
4477FF26 065EC412 5700689A 3E77FF26 4077FF26 065EC411 7905D09A 006AEC76 vêj..Å.y.á^.&.wâ&.w>.h.W.á^.&.wD 000120
0677FF26 F05EC412 1300689A 6677FF26 6877FF26 065EC412 6700689A 4277FF26 &.wB.h.g.á^.&.wh&.wf.h...á^Þ&.w. 000140
1E00000C C8C8C91F 00EBC028 04E88DF2 880574C0 08000001 E19A0676 FF0876FF .v..v..Å....åt.¡·.Š.+âŠ..èùà.... 000160
26065EC4 00C2E903 75000A7E 8300E2E9 8DF38806 75084608 06468808 8E110688 ¡...Ä.F..F.u.|µ.Ôã..~..u.Ôô.á^.& 000180
5016F446 806677FF 266877FF 26065EC4 120309C2 9A006A00 6A6677FF 266877FF .wh&.wfj.j..ô.Æ.á^.&.wh&.wf.F¶.P 0001A0
E80CC483 119009CF 9AF476FF F676FF00 6A006A00 6A006A18 75C00813 030A589A .X....åu.j.j.j.j..v~.v¶.ü....á.$ 0001C0
4277FF26 4477FF26 065EC413 1809C29A 006A006A 4277FF26 4477FF26 065EC4CF üá^.&.wD&.wBj.j..ô...á^.&.wD&.wB 0001E0

Dump of file SATURN:[PCCOMMON.DUMP.DLL]BRDNOPL.TMP;1 on 18-APR-1990 10:37:32.99
File ID (520,34,0)   End of file block 272 / Allocated 272

Virtual block number 26 (0000001A), 512 (0200) bytes

D5E806C4 83FFFF02 179AF876 FFFA76FF 016A1275 C0081342 0A589A50 16F8468D .F½.P.X.B..åu.j..v*.v½......á.$í 000000
803E77FF 264077FF 26065EC4 135709C2 9A006A00 6A3E77FF 264077FF 26065EC4 á^.&.wâ&.w>j.j..ô.W.á^.&.wâ&.w>. 000020
006AD6E8 06C483FF 22E80EFC 76FFFE76 FF016A11 75C00812 470A589A 5016FC46 F•.P.X.G..åu.j..v±.v•.Ö".á.$•j. 000040
881E5657 00000CC8 C8C91F00 E80CC483 FD80E80E 0676FF08 76FF006A 006A006A j.j.j..v..v..Ô.».á.Š..èùà...WV.¡ 000060
5689F446 89445788 26424788 2674E8C0 28047400 008E8F83 26065EC4 D88E1291 ...Äá^.&.¢....t.+âŠt&.GB&.WD.F¶.V 000080
3975C008 128E0A58 9A5016FC 468DF476 FFF676FF 13CA09C2 9A006A00 6A5052F6 -RPj.j..ô.ò..v~.v¶.F•.P.X./..åu9 0000A0
C41FA5A5 A5A50A8E 1EF0881E 7F8D0016 05F85EC4 FA5689F8 4689FE56 88FC4688 .F•.V±.F½.V*á^½.......Þ..ÒÉÊÉ.á 0000C0
8E87C726 065EC483 EB1FA5F2 0008890A 8E1EF088 267F8000 3605C28C C388F85E ^½.ù.ô.6...&.Þ..Ô¿..·É.$*á^.&ú.. 0000E0
46880874 08460806 4688088E 1390881E 000032C8 C8C95F5E 1F00E8C0 28000100 ...+âŠ..^.èùà2...¡...Ä.F..F.t..F 000100
89464788 26065EC4 D8568906 46890C56 880A4688 020FE980 F3880675 0C46080A ..F.u.|µ.Õ...F..V..F•.VÄá^•&.GF. 000120
80CE76FF 52F24689 F44689C0 28D05689 CE468944 57882642 47882606 5EC4E246 Fãá^.&.GB&.WD.Fö.VÅ+á.F¶.F·R.vö. 000140
5688E846 8800F856 8301F646 8308EBF6 4689F846 89C02814 8900F09A 5016E846 FÔ.P.Þ.¿.+â.F½.F-Š..F-..V½..FÔ.V 000160
6AF676FF F876FFCE 76FFD076 FF00C7E9 0372F646 39087C00 D1E9037E F85639EA ð9V½-.Ôl.|.9F-r.Ôú..vÅ.vö.v½.v-j 000180
7AE980F1 880675F0 56390875 EE46390C 56880A46 88158308 689A5016 EE468000 ..FŸ.P.k....F..V.9FŸu.9VÞu.¡þ.Ôz 0001A0
886675EC 4639E246 88EC4689 46478826 DE5EC4E0 5689DE46 89F05688 EE468801 ..FŸ.VÞ.FB.VÄá^B&.GF.Fâ.Fã9Fšuf. 0001C0
7401E27E 830C5689 DA468900 1605C28C C388D456 89024689 00160508 5688D646 F•.VÅ....FØ.VÅ.ù.ô....FÔ.VÉ.-ã.t 0001E0

Dump of file SATURN:[PCCOMMON.DUMP.DLL]BRDNOPL.TMP;1 on 18-APR-1990 10:37:32.99
File ID (520,34,0)   End of file block 272 / Allocated 272

Virtual block number 27 (0000001B), 512 (0200) bytes

77073926 057C097F 02573926 D25EC402 57882607 8826DA5E C41E7502 E27E8306 ..~ã.u.á^Ò&..&.W.á^Ø&9W...|.&9.w 000000
77044739 26067C0A 7F065739 26025EC4 06578826 04478826 DA5EC41E E837E802 .$7$.á^Ò&.G.&.W.á^Ø&9W...|.&9G.w 000020
CE76FF00 76FFFF19 _700F456 8301F246 8308EB02 7EEC4639 E24688 0A E817E802 .Š.Š..Fã9Fš-.Š..F·..V¶.Ô...vÅ.vö 000040
08568806 46880004 FA46C715 DD029D9A 0A76FF0C 76FF006A 006AF276 FFF476FF .v¶.v·j.j..v..v....ì.úF*...F..V. 000060
FA4688FF FF0247C7 26FFFF07 C72604FC 4683FC5E C412EBFE 5689FC46 89004605 .F..F•.V±Š.á^•.F•.&ú...&úG....F* 000080
E65689E4 46890046 05085688 064688F2 4689F446 89C028E2 EB0274C0 08FA4EFF .N*.åt.Šã+á.F¶.F·.F..V..F..FÔ.Vì 0000A0
0813BA0A 589A5016 EE468DCE 76FFD076 FF15ED09 C29A006A 006ACE76 FFD076FF .vÅ.vöj.j..ô.Ù..vÅ.vö.FŸ.P.X.¤.. 0000C0
6A8788E3 D10888EC 46894647 88260E5E C4E05689 DE4689F0 5688EE46 885475C0 åuT.FŸ.VÞ.FB.VÄá^B&.GF.Fâ.ÄID..j 0000E0
0075FF02 7F832614 75FF3F83 26FC5EC4 FE5689FC 4689E656 88E44603 02E0C101 .éÅ..FÔ.Vì.F•.V±á^=&.7.u.&....u. 000100
08C8C8C9 1F00E8C0 2898E800 F4568301 F2468302 57892607 8926F456 88F24688 .F·.V¶&..&.W..F·..V¶.Š.+âŠ..èùà. 000120
065EC45E E88DF388 05750C46 080A4688 08740846 08064688 D88E1422 881E0000 ...¡"..Ä.F..F.t..F..F.u.|µ.Š^á^. 000140
1682091E 9A5016FC 468D0A76 FF0C76FF 5052FA56 89F84689 44578826 42478826 &.GB&.WD.F½.V*RP.v..v..F•.P...ÿ. 000160
9A006AFC 76FFFE76 FFF876FF FA76FF2A EB8E0788 0575FFFE 7E830875 FFFC7E83 .~•.u..~±.u.¡..Š*.v*.v½.v±.v•j.. 000180
000CC8C9 1F00E8C0 2808C483 FD58E80E 0676FF08 76FF0A76 FF0C76FF 147705D0 Å.w..v..v..v..v..ÔX».á.+ãŠ..èù.. 0001A0
00000008 12EA0002 00000004 13290002 00000003 110F0002 00000001 0FC40002 ..á.......Ô.......).......õ..... 0001C0
0000000C 11620002 00140003 00720203 027F0005 00420203 00000009 03F90002 ..*.......B.......r.......b..... 0001E0
```

```
Dump of file SATURN:[PCCOMMON.DUMP.DLL]BRDNOPL.TMP;1 on 18-APR-1990 10:37:32.99
File ID (520,34,0)   End of file block 272 / Allocated 272

Virtual block number 28 (0000001C), 512 (0200) bytes

 00000019 16540002 00000017 00380002 00000014 168E0002 00220003 12770203 ..w...".........8.......T..... 000000
 E980F3B8 06750846 08064688 08741046 080E4688 D88EFFFF 881E5657 000014C8 à...WV.¡...Ä.F..F.t..F..F.u.¡µ.Ô 000020
 46880000 FFFF9A'0 16FC468D 0E76FF10 76FF0789 26024789 26C02806 5EC4013C <.á^.+àå.G.å...v..v..F=.P......F 000040
 6A50F246 89064788 26F45EC4 010AE98D F1880675 D00BF656 89F44689 FE5688FC =.V±.F¶.V-.Åu.¡þ.Ö..á^¶å.G..F·Pj 000060
 F84689EE 5688EC46 8800E7E9 8DF28806 74C00800 00FFFF9A 5016EC46 806E6A0E .jn.Få.P......ât.¡·.ÖÖ..Få.VŸ.F½ 000080
 76FF0457 89260247 8926F656 88F44688 A5F20037 89018A8E F888EC5E C4FA5689 .V*á^å.«ƒ..¿7.·Ê.F¶.V-å.G.å.W..v 0000A0
 4C05EE56 88EC4688 F276FF2E 75C00800 C600009A 50520048 05EE5688 EC4688F2 ·.Få.VŸ.H.RP...ó..âu..v·.Få.VŸ.L 0000C0
 08011A00 009A5052 00500SEE 5688EC46 88F276FF 1775C008 00D00000 9A505200 .RP...Î..âu..v·.Få.VŸ.P.RP...... 0000E0
 5EC42075 0C460B0A 468868E8 8DF28800 0001419A EC76FFEE 76FFF276 FF1374C0 ât..v·.vŸ.vå.A...¡·.Šh.F..F.u á^ 000100
 76FF12EB FFFF029D 9AF876FF FA76FF00 6A016A00 6A006A14 77FF2616 77FF26F4 ¶å.w.å.w.j.j.j.j..v*.v½.....Š..v 000120
 EC76FFEE 76FFF276 FF1374C0 08F04689 01CFE80E 016A0A76 FF0C76FF F876FFFA *.v½.v..v.j..Öü..Fþ.ât..v·.vŸ.vå 000140
 5E1F00E8 C0280257 89260789 26FA5688 F8468806 5EC414E8 F0468800 00FFFF9A ......FÞŠ.á^..F½.V*å..å.W.+âŠ..^ 000160
 08468801 7DE98DF3 8806750A 460B0846 88088E00 08881E00 0014C800 0CCAC95F _èò..â....¡...Ä.F..F.u.¡µ.Ö)..F. 000180
 3F8326FC 5EC4FE56 89FC4689 04578826 02478826 F45EC4F6 5689F446 890A5688 ¯V..F¶.V-á^¶å.G.å.W..F=.V±á^=å.? 0001A0
 88260647 8826F45E C40143E9 06C483FF FF02179A F476FFF6 76FF0676 FF147502 .u..v..v~.v¶......á.ÖC.á^¶å.G.å. 0001C0
 7500067E 83000164 47C726F4 5EC40001 009487C7 26F85EC4 FA5689F8 46890857 W..F½.V*á^½åú.....á^¶åúGd...-..u 0001E0

Dump of file SATURN:[PCCOMMON.DUMP.DLL]BRDNOPL.TMP;1 on 18-APR-1990 10:37:32.99
File ID (520,34,0)   End of file block 272 / Allocated 272

Virtual block number 29 (0000001D), 512 (0200) bytes

 265277FF 26F45EC4 020809C2 9A006A00 6A5077FF 265277FF 26F45EC4 00F5E903 .Ö%.á^¶å.wRå.wPj.j..ó...á^¶å.wRå 000000
 5EC4DAE8 FFFF0404 9AEC76FF EE76FF0D 75C00802 300A589A 5016EC46 8D5077FF .wP.Få.P.X.0..âu..vŸ.vå.....ŠÖá^ 000020
 F04680AC 77FF264E 77FF26F4 5EC40245 09C29A00 6A006A4C 77FF264E 77FF26F4 ¶å.wNå.wLj.j..ó.E.á^¶å.wNå.wL.Fþ 000040
 016A37FF 260277FF 260BEB02 7401067F 8326F05E C41C75C0 0802790A 589A5016 .P.X.y..âu.á^þå....t.ŠÜå.w.å.7j. 000060
 FF26F45E C4028E09 C29A006A 006A4877 FF264A77 FF26F45E C4C8EB02 AE01749A .t.Û.Šüá^¶å.wJå.wHj.j..ó...á^¶å. 000080
 C438EB2A E8064788 26F05EC4 4575C008 00AF0A58 9A5016F0 46804877 FF264A77 wJå.wH.Fþ.P.X.£..âuÉá^þå.G.Š*Šßá 0000A0
 269A016A 37FF2602 77FF26F0 5EC425E8 FFFF0174 9A016A37 FF260277 FF26F05E ^þå.w.å.7j..t...Š%á^þå.w.å.7j..å 0000C0
 FF0876FF 0A76FFA2 E800E800 74000230 CD740001 300474C0 0810E812 EBFFFF01 ...Š.Š..âtå=..të=..tìŠ.ŠÅ.v..v.. 0000E0
 C80006CA C91F00E8 C02804EB 8E078805 74C00808 C483FFFF 044A9AFC 76FFFE76 v±.v=.J....á..ât.¡..Š.+âŠ..èò..â 000100
 F446890E 56880C46 8801A8E9 8DF38806 750E4608 0C468808 8E016888 1E000018 ....¡k..Ä.F..F.u.¡µ.Ö´..F..V..F¶ 000120
 08468800 C9E90375 00067E83 FE5689FC 46890457 88260247 8826F45E C4F65689 .V-á^¶å.G.å.W..F=.V±.~..u.Öè..F. 000140
 BF8326F8 5EC4087. 00647F83 26016CE9 8DF38806 75D008FA 5689F846 890A5688 .V..F½.V*.Åu.¡µ.ÖL.å..d.u.á^½å.¢ 000160
 5EC40141 E98E008u 06740847 08260647 8826F45E C40154E9 8E008806 7400008C ...t.¡..ÖT.á^¶å.G.å.G.t.¡..ÖA.á^ 000180
 830675FF F07E8303 88091E9A 5016F046 800C76FF 0E76FF14 77FF2616 77FF26FC =å.w.å.w..v..v..Fþ.P...£..-þ.u.. 0001A0
 F85EC401 F605009A 006AF076 FFF276FF 1477FF26 1677FF26 FC5EC418 74FFF27E -·.t.á^=å.w.å.w..v·.vþj..Å.-.á^½ 0001C0
 880674C0 08039702 909A0C76 FF0E76FF 006A006A 006A006A 4277FF26 4477FF26 å.wDå.wBj.j.j.j..v..v.......ât.¡ 0001E0

Dump of file SATURN:[PCCOMMON.DUMP.DLL]BRDNOPL.TMP;1 on 18-APR-1990 10:37:32.99
File ID (520,34,0)   End of file block 272 / Allocated 272

Virtual block number 30 (0000001E), 512 (0200) bytes

 26064789 260A5688 084688F4 5EC40058 57832601 56478326 F85EC400 DAE98E00 ..ÖÖ.á^½å.GV.å.WX.á^¶.F..V.å.G.å 000000
 9EE98E00 88067500 08FA5689 F8468908 57882606 478826F4 5EC400AC E9085789 .W.Ö¯.á^¶å.G.å.W..F½.V*.Åu.¡..Ö. 000020
 9A5016EC 46800C76 FF0E76FF 5052EA56 89E84689 44578826 42478826 F85EC400 .á^½å.GBå.WD.FÖ.VõRP.v..v..Få.P. 000040
 76FFEE76 FFE876FF EA76FF6A E88E0088 0575FFEE 7E830875 FFEC7E83 0466091E ..f..~å.u..~Ÿ.u.¡..Šj.vð.vÒ.vŸ.v 000060
 006A006A 1477FF26 1677FF26 FC5EC44E E88E0088 0574C008 048005D0 9A006AEC åj..Å....ât.¡..ŠNá^=å.w.å.w.j.j. 000080
 01566F83 26F85EC4 27E88E07 880574C0 08030902 909A0C76 FF0E76FF 006A016A j.j..v..v....l..ât.¡..Š'á^½å.oV. 0000A0
 1F00EBC0 28000166 47C726F4 5EC40647 89260847 8926C028 F45EC400 585F8326 å._X.á^¶+âå.G.å.G.á^¶åüGf..+âŠ.. 0000C0
 F3880575 08460806 46880874 0C46080A 46880888E 0305881E 000004C8 000ACAC9 èò..â....¡...Ä.F..F.t..F..F.u.¡µ 0000E0
 00E8C028 07892606 5EC40A47 8826FC5E C4FE5689 FC46890C 56880A46 881DE88D .Š..F..V..F=.V±á^=å.G.á^.å..+âŠ. 000100
 88057508 46080646 8808740C 46080A46 88088E04 CA881E00 0004C800 08CAC91F .èò..â....¡ò..Ä.F..F.t..F..F.u.¡ 000120
 E8C02807 8926065E C40C4788 26FC5EC4 FE5689FC 46890C56 880A4688 1DE880F3 µ.Š..F..V..F=.V±á^=å.G.á^.å..+âŠ 000140
 05750846 08064688 08740C46 080A4688 D88E0508 881E0000 04C80008 CAC91F00 ..èò..â....¡...Ä.F..F.t..F..F.u. 000160
 3F832606 7F1A7C00 027F8326 065EC4FE 5689FC46 890C5688 0A4688SA E880F388 ¡µ.ŠZ.F..V..F=.V±á^.å....|...å.7 000180
 7F1C7C00 067F8326 065EC410 5789260E 478926FC 5EC40257 88260788 26127400 .t.å..å.W.á^=å.G.å.W.á^.å....|.. 0001A0
 1F00E8C0 28145789 26124789 26FC5EC4 06578826 04478826 13740004 7F832607 .å....t.å.G.å.W.á^=å.G.å.V.+âŠ.. 0001C0
 05750846 08064688 08740C46 080A4688 D88E054C 881E5657 000000C8 0008CAC9 èò..â...WV.¡L..Ä.F..F.t..F..F.u. 0001E0
```

Dump of file SATURN:[PCCOMMON.DUMP.DLL]BRDNOPL.TMP;1 on 18-APR-1990 10:37:32.99
File ID (520,34,0)   End of file block 272 / Allocated 272

Virtual block number 31 (0000001F), 512 (0200) bytes

```
EBC02B1F A5A5A5A5 DABE1EF0 8BF88800 0E050C56 880A4688 065EC41C EB8DF388 |µ.Š.á^..F..V.....«.Þ..ÖEEEE.+åŠ 000000
08064688 08740C46 080A4688 D88E05CC 881E5657 000000C8 0008CAC9 5F5E1F00 ..^_èò..à...WV.|ä..Ä.F..F.t..F.. 000020
1FA5F200 0889OA8E 1EF08836 7F8D0856 88064688 0A5EC418 EB8DF388 05750846 F.u.|µ.Š.á^..F..V...6.Þ..Öζ...Ê. 000040
8808740C 46080A46 [illegible]8D88E06 10881E56 57000028 C80008CA C95F5E1F 00EBC02B +åŠ..^_èò..à(..WV.|...Ä.F..F.t.. 000060
01AF00FE 9A5052EE [illegible]89EC46 890C5688 0A468803 6CE98DF3 88067508 46080646 F..F.u.|µ.Öl..F..V..F&.VŸRP.±.£. 000080
26EC5EC4 1FA5F200 0889DA8E 1EF088FB 88003605 EE5688EC 4688065E C404C483 .á.á^..F&.VŸ.6..«.Þ..Öζ...Ê.á^&&  0000A0
46890016 05C28CC3 887174C0 08047F77 7CD208F6 5689F446 895A5788 26584788 .GX&.WZ.F¶.V-.ø|w...åtg.ù.ô....F 0000C0
88260447 8826DE56 890C4689 F6561BF4 462B0257 88260788 26085EC4 0A568908 Ä.Vöá^A&..&.W.+F¶.V-.FÉ.V8&.G.&. 0000E0
5689E446 89F65613 F4460302 57882607 8826E256 89E04689 F6561BF4 462B0657 W.+F¶.V-.FÄ.Vä&..&.W..F¶.V-.Fô.V 000100
50160C46 800676FF 0876FFEA 5689E846 89F65613 F4460306 57882604 478826E6 1&.G.&.W..F¶.V-.FÖ.Võ.v..v..FÉ.P 000120
52478826 F85EC4FA 5689F846 89045788 26024788 26EC5EC4 08C483FF FF0CFE9A .±.....á.á^&&.G.&.W..F½.V*á^½&.GR 000140
FC468806 5EC40257 19260729 26065EC4 FE5689FC 4689000A 83000120 54578826 &.WT-...,Ö..F=.V±á^.&).&.W.á^..F= 000160
88065EC4 0A571126 08470126 FE5688FC 4688065E C4065719 26044729 26FE5688 .V±&)G.&.W.á^..F=.V±&.G.&.W.á^.. 000180
88064688 F25689F0 4689005E 05FA5688 F846880E 5711260C 470126FE 5688FC46 F=.V±&.G.&.W..F½.V*.^..FÞ.V..F.. 0001A0
EC01309A 37FF2602 77FF2608 5EC437FF 260277FF 26F05EC4 DA568908 46890856 V..FÄ.Vöá^Þ&.w.&.7á^A&.w.&.7.0.& 0001C0
26F05EC4 44EB0257 88260788 26085EC4 0C74C008 C02802E8 00018805 75D00807 ..Äu.|..Š.+â.ât.á^A&..&.W.ŠDá^Þ& 0001E0
```

Dump of file SATURN:[PCCOMMON.DUMP.DLL]BRDNOPL.TMP;1 on 18-APR-1990 10:37:32.99
File ID (520,34,0)   End of file block 272 / Allocated 272

Virtual block number 32 (00000020), 512 (0200) bytes

```
DC8808EC 83080306 C79A07F9 02C39AF0 5EC407F4 02C39AD8 5EC437FF 260277FF .w.&.7á^Ä.ù.¶.á^Þ.ù.°..ù....Š..É 000000
084300FC 9A505208 1E04A69A 08170256 9AD88808 C4830812 07BE9A08 0803EF9A .ÿ..../....á..Ä.V....Ï...RP.=.C. 000020
0477FF26 0677FF26 D85EC404 77FF2606 77FF26F0 5EC40257 89260789 26085EC4 á^A&..&.W.á^Þ&.w.&.w.á^A&.w.&.w. 000040
EB06578B 2604478B 26085EC4 0074C008 C02802EB 00018805 75D00808 6A01309A .0.j..Äu.|..Š.+â.ât.á^A&.G.&.W.Š 000060
8808EC83 088406C7 9A087A02 C39A045F 80F05EC4 087502C3 9A045F8D 085EC448 Ká^Ä._...ù.u.á^Þ._..ù.z..ù....Š.. 000080
26F05EC4 505208AA 04A69A08 9802569A D88808C4 83089307 8E9A0889 03EF9ADC É.y..../....á..Ä.V....Ï.¯.RPá^Þ& 0000A0
00080508 56880646 88065789 26044789 26085EC4 08D000FC 9A0477FF 260677FF .w.&.w..=.Ï.á^A&.G.&.W..F..V.... 0000C0
08090A01 309A37FF 260277FF 26085EC4 37FF2602 77FF26F0 5EC4DA56 89084689 .FÄ.Vöá^Þ&.w.&.7á^A&.w.&.7.0.... 0000E0
77FF26F0 5EC444EB 02578826 07882608 5EC40C74 C008C02B 02EB0001 88057500 Äu.|..Š.+â.ât.á^A&..&.W.ŠDá^Þ&.w 000100
EF9ADC88 08EC8309 2106C79A 091702C3 9AF05EC4 091202C3 9AD85EC4 37FF2602 .&.7á^Ä.ù...á^Þ.ù....ù.Ï..&..É.ÿ 000120
5EC40961 00FC9A50 52093C04 A69A0935 02569AD8 8808C483 093007CE 9A092603 .&..ö.0..á..Ä.V.5..Ï.<.RP.=.=.á^ 000140
309A0477 FF260677 FF26085E C40477FF 260677FF 26F05EC4 02578926 07892608 A&..&.W.á^Þ&.w.&.w.á^A&.w.&.w..0 000160
C44BE806 57882604 47882608 5EC40074 C008C02B 02E80001 88057500 08098801 ....Äu.|..Š.+â.ât.á^A&.G.&.W.ŠKá 000180
9ADC8808 EC8309A2 06C79A09 9802C39A 045F8DF0 5EC40993 02C39A04 5F80085E ^Ä._..ù...á^Þ._..ù....ù.Ä..Š..É. 0001A0
77FF26F0 5EC45052 09C804A6 9A098602 569AD888 08C48309 8107CE9A 09A703EF y.Ï¯.ö.Ÿ..á..Ä¯.V.Ñ..Ï.à.RPá^Þ&.w 0001C0
0008CAC9 5F5E1F00 EBC02806 57892604 47892608 5EC4FFFF 00FC9A04 77FF2606 .&.w..=...á^A&.G.&.W.+åŠ..^_èò.. 0001E0
```

Dump of file SATURN:[PCCOMMON.DUMP.DLL]BRDNOPL.TMP;1 on 18-APR-1990 10:37:32.99
File ID (520,34,0)   End of file block 272 / Allocated 272

Virtual block number 33 (00000021), 512 (0200) bytes

```
0A5EC415 EB8DF388 057D0008 7E830674 0C46080A 4688D88E 0653881E 000000C8 à....|S..Ä.F..F.t..~..).|µ.Š.á^. 000000
8E09E688 1E000000 C80008CA C91F00EB C02B5A57 89265847 89260856 88064688 .F..V.&.GX&.WZ+åŠ..èò..à....|l.. 000020
57882658 4788260A 5EC419EB 8DF38805 75084608 06468808 740C4608 0A468808 Ä.F..F.t..F..F.u.|µ.Š.á^.&.GX&.W 000040
4688D88E 0A1D881E 000000C8 0008CAC9 1F00EBC0 28025789 26078926 065EC45A Zá^.&..&.W.+åŠ..èò..à....|...Ä.F 000060
F3880574 02067E83 08740106 7E831174 08067E83 17740406 7E831874 0A460808 ..F.t..~..t..~..t..~..t..~..t.|µ 000080
D88E0A5A 881E0000 04C60006 CAC91F00 EBC02846 47892606 4688085E C40EEB80 .Š.á^..F.&.GF+åŠ..èò..à....|Z..Ä 0000A0
5689FC46 890C5688 0A46881D EB8DF388 05750846 08064688 08740C46 08C[illegible]688 .F..F.t..F..F.u.|µ.Š..F..V..F=.V 0000C0
8E0A9CB8 1E000004 C80008CA C91F00EB C0280789 26065EC4 46478826 FC5EC[illegible]FE ±á^=&.GFá^.&..+åŠ..èò..à....|... 0000E0
0A568808 46881AEB 80F38805 7E02067E 83067C00 067E830C 740A4608 08468[illegible]8 Ä.F..F.t..~..|..~..~.|µ.Š..F..V. 000100
D0881E00 0004C800 06CAC91F 00EBC02B 5C478926 064688FC 5EC4FE56 89FC4689 .F=.V±á^=.F.&.G\+åŠ..èò..à....|Ï 000120
46890C56 880A4688 1DEB8DF3 88057508 46080646 8808740C 46080A46 88D88E0A ..Ä.F..F.t..F..F.u.|µ.Š..F..V..F 000140
881E0000 08C80008 CAC91F00 EBC02807 8926065E C45C4788 26FC5EC4 FE5689FC =.V±á^=&.G\á^.&..+åŠ..èò..à....| 000160
5689FC46 89001605 08568806 46880001 E98DF388 06750846 08064688 D88E081F ...Ä.F..F.u.|µ.Öl..F..V.....F=.V 000180
5788267A 47882606 5EC40257 11260701 26FC5EC4 78578826 76478826 065EC4FE ±á^.&.Gv&.Wxá^=&..&.W.á^.&.Gz&.W 0001A0
26084701 26FC5EC4 0080978B 267E4788 26065EC4 06571126 04470126 FC5EC47C |á^=&.G.&.W.á^.&.G~&....á^=&.G.& 0001C0
56880646 880E5711 260C4701 26FC5EC4 0084978B 26008287 8826065E C40A5711 .W.á^.&....&....á^=&.G.&.W..F..V 0001E0
```

Dump of file SATURN:[PCCOMMON.DUMP.DLL]BRDNOPL.TMP;1 on 18-APR-1990 10:37:32.99
File ID (520,34,0)   End of file block 272 / Allocated 272

Virtual block number 34 (00000022), 512 (0200) bytes

```
5EC40257 11260701 26FC5EC4 02578826 078826F8 5EC4FA56 89F84689 006E0508 ..n..F½.V*á^½&..&.W.á^=&..&.W.á^ 000000
5EC40257 88260788 26F85EC4 06571126 04470126 FC5EC406 57882604 478826F8 ½&.G.&.W.á^=&.G.&.W.á^½&..&.W.á^ 000020
280E5711 260C4701 26FC5EC4 06578826 04478826 F85EC40A 57112608 470126FC =&.G.&.W.á^½&.G.&.W.á^=&.G.&.W.+ 000040
08460806 46880874 0C46080A 46880886 0860881E 56570000 1EC8C8C9 1F00E8C0 àS..èùà...WV.¡'..Ä.F..F.t..F..F. 000060
8904578B 26024788 26E25EC4 E45689E2 46890C56 880A4688 0160E980 F3880675 u.¡µ.Õ'..F..V..Fã.Vôá^ã&.G.&.W.. 000080
065EC401 28E98E08 880675C2 08FE5689 FC468908 57882606 478826EA 5689E846 FÒ.Võ&.G.&.W..F•.V±.óu.¡..Õ+.á^. 0000A0
57882604 47882606 5EC41F75 18573926 25751647 3926E25E C4025788 26078826 &..&.W.á^ã&9G.uX&9W.u.á^.&.G.&.W 0000C0
C28CC388 2E750066 7F832600 F3E9C028 05751C57 39260875 1A473926 E25EC406 .á^ã&9G.u.&9W.u.+ãÕµ.&..f.u..û.ô 0000E0
1EF08826 7F800036 05C28CC3 88E25EC4 1FA5A5A5 A5DA8E1E F0881E7F 80001605 .......Þ..ÕEEEE.á^ã.ù.ô.6...&.Þ. 000100
0CFE9A50 52003605 E2468850 52002605 E45688E2 46881BE8 1FA5F200 08890A8E .Ö¿..·E.Š..Fã.VÕ.&.RP.Fã.6.RP.±. 000120
FF521FA5 F2000889 DA8E1E07 16F088EC 7E800016 05FE5688 FC468808 C4830723 #..á..F•.V±....~&.Þ....Ö¿..·E.R. 000140
C48300AD 08879AE2 76FFE476 FF0676FF 0876FF00 6A006A04 C483FE14 E80EFC76 v=.Ò.±.á.j.j..v..v..vÕ.vã...Ù..á 000160
E88E0988 057400E6 7E831FA5 F2000889 1F161EEC 7680167F 80FC5EC4 E646890C ..F|á^=....vŠ...¿..·E..-|.t.¡..Š 000180
5EC42AE8 8E088805 74C00808 C483FFFF 164E9AFC 76FFFE76 FF0A76FF 0C76FF47 G.v..v..v±.v=.N....á..ãt.¡..Š*á^ 0001A0
C726E25E C4000168 47C726E2 5EC404C4 83067E0D FE9A5306 0A70010A 7F8326E2 ã&....)..S.±.-..á.á^ã&úGh..á^ã&ú 0001C0
46080A46 88088E0C 4E881E56 57000004 C80008CA C95F5E1F 00E8C028 00016647 Gf..+ãŠ..^_èò..à...WV.¡N..Á.F..F 0001E0
```

Dump of file SATURN:[PCCOMMON.DUMP.DLL]BRDNOPL.TMP;1 on 18-APR-1990 10:37:32.99
File ID (520,34,0)   End of file block 272 / Allocated 272

Virtual block number 35 (00000023), 512 (0200) bytes

```
05065EC4 FE5689FC 46890C56 880A4688 22E880F3 88057508 46080646 8808740C .t..F..F.u.¡µ.Š".F..V..F•.V±á^.. 000000
D7881E00 0000C800 08CAC95F 5E1F00E8 C0281FA5 A5A5A5DA 8E1EF088 F8880016 ...«.Þ..ÕEEEE.+ãŠ..^_èò..à....¡■ 000020
5789265E 47892608 56880646 880A5EC4 15E880F3 8805750C 46080A46 88088E00 ..Ä.F..F.u.¡µ.Š.á^..F̄..V.&.G^&.W 000040
08064688 08740C46 080A4688 088E0E1F 881E0000 00C80008 CAC91F00 E8C02860 '+ãŠ..èò..à....¡...Ä.F..F.t..F.. 000060
C0280257 89260789 26065EC4 60578826 5E478826 0A5EC419 E880F388 05750846 F.u.¡µ.Š.á^.&.G^&.W'á^.&..&.W.+à 000080
7508460B 06468808 740C4608 0A468808 8E0E5088 1E000000 C80008CA C91F00E8 Š..èò..à....¡P..Ä.F..F.t..F..F.u 0000A0
1F00E8C0 28025789 26078926 065EC408 57882606 4788260A 5EC419E8 80F38805 .¡µ.Š.á^.&.G.&.W.á^.&..&.W.+ãŠ.. 0000C0
080E4688 187C0012 7E831E74 16460814 46880886 0E80881E 000008C8 0008CAC9 èò..à....¡...Ä.F..F.t..-..|..F.. 0000E0
26C0280E 5EC40086 E980F388 06750846 08064688 08740C46 080A4688 10741046 F.t..F..F.t..F..F.u.¡µ.Õ..à^.+ã& 000100
124688F8 5EC4FA56 89F84689 16568814 46880003 07C7260A 5EC40789 26024789 .G.&..á^.&ú....F..V..F½.V*á^½.F. 000120
5016FC46 80006A50 52991246 884877FF 264A77FF 2655E880 F388057F 0A473926 &9G...¡µ.ŠU&.wJ&.wN.F..RPj..F•.P 000140
89260789 260E5EC4 02578826 078826FC 5EC432E8 80F18805 74C00804 4208689A .k.8..ãt.¡þ.$2á^•&..&.W.á^.&..&. 000160
00E8C028 07892606 5EC40447 8826FC5E C4078926 0A5EC406 478826FC 5EC40257 W.á^•&.G.á^.&..á^•&.G.á^.&..+ãŠ. 000180
00000004 005C0002 00000002 00900002 00000001 00200002 00009000 12CAC91F .èò....... .................\..... 0001A0
027F0005 003A0203 00000008 021A0002 00000007 02C10002 00000005 02630002 ..c.......ė...................:..... 0001C0
00000014 0F430002 00220003 00ED0203 0000000C 02E80002 00140003 00690203 ..i.......Ò.......Ù..."...C..... 0001E0
```

Dump of file SATURN:[PCCOMMON.DUMP.DLL]BRDNOPL.TMP;1 on 18-APR-1990 1 :37:32.99
File ID (520,34,0)   End of file block 272 / Allocated 272

Virtual block number 36 (00000024), 512 (0200) bytes

```
08460806 4688D88E FFFF881E 000022C8 00000019 0ECA0002 00000017 078F0002 ..e.......ò.....à"...¡...Á.F..F. 000000
8904578B 26024788 26065EC4 F05689EE 46890856 88064688 01FCE980 F3880675 u.¡µ.Õ=..F..V..FŸ.VÞá^.&.G.&.W.. 000020
003605C2 8CC3880A 76FF0C76 FF0E76FF 1076FF25 740C4608 0A4688E8 5689E646 F|.VÒ.F..F.tX.v..v..v..v..û.ô.6. 000040
6A006A50 77FF2652 77FF2606 5EC414C4 83FFFF00 009A026A 53526277 FF265052 RP&.wbRSj.......á.á^.&.wR&.wPj.j 000060
FF0075C0 0800E00A 589A5016 EA468050 77FF2652 77FF2606 5EC40089 09C29A00 ..ô...á^.&.wR&.wP.Fô.P.X.Á..âu.. 000080
89FC4689 4E578826 4C478826 065EC400 02F646C7 DAE8FFFF 05A49AEA 76FFEC76 v$.vô.Ê...ŠÕüF-..á^.&.GL&.WN.F•. 0000A0
E90375C0 08F64EFF F64688FE 5689FC46 894A5788 26484788 26065EC4 11E8FE56 V±Š.á^.&.GH&.WJ.F•.V±.F~.N-.âu.Õ 0000C0
01F24683 08E8F246 89F44689 C028011C 00F09A50 16E2468D FC76FFFE 76FF0092 ...v±.v•.Fã.P.Þ...+â.F¶.F·Š..F·. 0000E0
FFF476FF FC76FFFE 76FF5873 F2463905 7C627FF4 5639E456 88E24688 00F45683 .v¶..Fã.VÕ9v¶.b|.9F·s(.v±.v•.v¶. 000100
FF260277 FF26F85E C428E806 478826F8 5EC4FFFF 08689A50 16F8468D 006AF276 v·j..F½.P.k...á^½&.G.Š(á^½&.w.&. 000120
0810E812 E8FFFF03 029A37FF 260277FF 26F85EC4 23E8FFFF 03839A04 77FF2637 7&.w..°...Š#á^½&.w.&.7.....Š.Š.. 000140
77FF2606 5EC4EE76 FFF076FF FF50E988 E800E80F 7400023D CF7E0001 300C7CC0 â|.=..-ü=..tÕŠ.Š.ÕP..vÞ.vŸá^.&.w 000160
77FF2616 77FF26E6 5EC4008E E98E0088 0674C008 FFFF02FF 9A006A06 77FF2608 .&.w.j.......ât.¡..Õ..á^|&.w.&.w 000180
E65EC418 74FFE07E 830675FF DE7E8301 C3091E9A 50160E46 80EE76FF F076FF14 ..vÞ.vŸ.F8.P...ù..-8.u..-Á.t.á^| 0001A0
4877FF26 4A77FF26 065EC400 7405D09A 006ADE76 FFE076FF 1477FF26 1677FF26 &.w.&.w..vÁ.v8j..Á.t.á^.&.wJ&.wH 0001C0
5077FF26 5277FF26 065EC401 F300689A 4C77FF26 4E77FF26 065EC401 E300689A .h.D.á^.&.wN&.wL.h.µ.á^.&.wR&.wP 0001E0
```

Dump of file SATURN:[PCCOMMON.DUMP.DLL]BRDNOPL.TMP;1 on 18-APR-1990 10:37:32.99
File ID (520,34,0)   End of file block 272 / Allocated 272

Virtual block number 37 (00000025), 512 (0200) bytes

```
                                                                        .h...á^l&.w..v..v.......ât.¡·.$. 000000
04E88DF2 880574C0 080000FF FF9A0676 FF0876FF 0677FF26 E65EC401 9F00689A +àS..èùà....¡...Ä.F..F.u.¡µ.Ô).. 000020
830129E9 8DF3880o 75084608 06468808 8E000688 1E000008 C8C8C91F 00E8C028 -..u.Õ..á^.&.wR&.wPj.j..ó._.á^.& 000040
26065EC4 025F09C2 9A006A00 6A5077FF 265277FF 26065EC4 0109E903 75000A7E .wR&.wP.F%.P.X.....âu.j.j.j.j..v* 000060
FA76FF00 6A006A00 6A006A18 75C00802 8F0A589A 5016F846 805077FF 265277FF .v%.ü....á.$uá^.&.wN&.wLj.j..ô.£ 000080
A409C29A 006A006A 4C77FF26 4E77FF26 065EC4CF E80CC483 009809CF 9AF876FF .á^.&.wN&.wL.F=.P.X.Ü..âu.á^=&.. 0000A0
7F8326FC 5EC41F75 C0080208 0A589A50 16FC4680 4C77FF26 4E77FF26 065EC402 ..t.$Üj.&.w.&.7.l....á.$áá^.&.wJ 0000C0
4A77FF26 065EC4C8 E806C483 03100F6C 9A37FF26 0277FF26 016AD8EB 02740106 &.wHj.j..ô.P.á^.&.wJ&.wH.F=.P.X. 0000E0
0A589A50 16FC4680 4877.F26 4A77FF26 065EC402 F009C29A 006A006A 4877FF26 £..âuKá^=&.G.$0$>j.á^=&.w.&.7.l. 000100
0F6C9A37 FF260277 FF26FC5E C4016A3E E830E806 478826FC 5EC44875 C00^^103 8..á.$(j.á^=&.w.&.7.A.l..á.$.$.. 000120
0810E812 E806C483 014906A1 9A37FF26 0277FF26 FC5EC401 6A28E806 C483C.38 âtö=..tú=..tÖ$.$.j.j.j.j..v..v.. 000140
0E0676FF 0876FF00 6A006A00 6A006A9C E800E80A 74000230 C7740001 30CE74.0 ÒÜ=.á.$..èùà....¡...Ä.F..F.u.¡µ. 000160
80F38806 75084608 06468808 8E021088 1E00000C C8C8C91F 00E80CC4 83FCADE8 Ô..á^.&.G.&.W..F¶.V-.-..u2&.GL&. 000180
88264C47 88263275 010E7E83 F65689F4 46890457 88260247 8826065E C40108E9 WN.F=.Vz.F..P.v..v.R.v=.Ôy..á..- 0001A0
7E830CC4 8316EFE8 0EFC76FF 520A76FF 0C76FF50 16104680 FE5689FC 46894E57 ..u.¡..Ôá.$*.-..|.á^.&.G.H;F.).¡ 0001C0
88067D10 4638480A 47882606 5EC4007C 00107E83 2AE800C4 E98E0788 0675FF10 µ.Ô`.á^.&.GH&.WJ.F=.Vz.vz.v=.F.. 0001E0
99104688 FC76FFFE 76FFFE56 89FC4689 4A578826 48478826 065EC400 A9E98DF3
```

Dump of file SATURN:[PCCOMMON.DUMP.DLL]BRDNOPL.TMP;1 on 18-APR-1990 10:37:32.99
File ID (520,34,0)   End of file block 272 / Allocated 272

Virtual block number 38 (00000026), 512 (0200) bytes

```
                                                                        RPj..F%.P.k....ât.¡..$w.vz.v=.F. 000000
10468BFC 76FFFE76 FF77E88E 07880574 C0080418 08689A50 16F8468D 006A5052 .RPj..Ä.J..ât.¡..$[á^¶&.w..v*.v% 000020
F876FFFA 76FF0677 FF26F45E C458E88E 07880574 C008024A 05D09A00 6A505299 ......ât.¡·.$ã.-..u.á^.&.O.$-á^. 000040
065EC42D E80C4FFF 26065EC4 0975010E 7E8340E8 8DF28805 74C00800 0002039A &.O..-..t á^.&.....-..S.Ô...á..v. 000060
0876FF04 C4830CFF E80E5306 097E000A 7F832606 5EC42074 00127E83 0A4FFF26 .v..Ô...á.+àS..èùà...V.¡a..Ä.-.. 000080
04067E83 D88E0361 881E5600 0002C8C8 C91F00E8 C02804C4 830987E8 0E0676FF t..-..t..-..t..-..u0.-..t..-..t. 0000A0
0C740808 7E831274 04087E83 30750206 7E830674 01067E83 0C740806 7E831274 .-..t..-..u..F..F.t..F..F.t..F.. 0000C0
08124688 08741046 080E4688 10740C46 080A4688 18750208 7E830674 01087E83 F.u.¡µ.Ô..á^.&..&.W.á^.&..&.W.á^ 0000E0
5EC40257 11260701 26125EC4 02578826 0788260E 5EC40107 E98DF388 06751446 .&.G.&.W.á^.&.G.&.W..^.1D....1D. 000100
88E30102 109F88E3 D1085E88 06571126 04470126 125EC406 57882604 4788260E v.1l.Ç..èl...(..Fz.à).%ÄS..FzÔ.. 000120
009EE9FE 46880 3EB 08F7047D C008FE46 89022880 8803E6C1 02108488 E6010676 .^.1D....1D.v.1l.Ç..èl..¡H..t..F 000140
46881974 00024888 8303E6C1 02108488 E6010676 88E30102 109F88E3 D1085E88 ±%AP.v..v..v..v..w...$..vz.v..v. 000160
0A76FF0C 76FFFE76 FF16E800 0005779A 1276FF14 76FF0A76 FF0C76FF 5008F7FE .v..v......$'.-..t..-..u$á^.&.G. 000180
04478826 0A5EC424 7502087E 83067401 087E8360 E80000FF FF9A1276 FF1476FF &.W.á^.&+G.&.W.ÍÄi0&.G.&.W.$.á^. 0001A0
0A5EC41F E8065711 26044701 26020 1E0 D106571B 2604472B 26125EC4 06578826 &..&.W.á^.&+.&.W.ÍÄi0&..&.W.$.=Z 0001C0
5A300FE8 02571126 070126D2 D1E00102 57182607 2B26125E C4025788 26078826 .u.ÔZ.=Ç.tÄS.+àS..^èùà...V.¡...Ä 0001E0
D88E0488 881E5600 0010C8C8 C95E1F00 E8C02800 E8A27400 8430FF5A E9037500
```

Dump of file SATURN:[PCCOMMON.DUMP.DLL]BRDNOPL.TMP;1 on 18-APR-1990 10:37:32.99
File ID (520,34,0)   End of file block 272 / Allocated 272

Virtual block number 39 (00000027), 512 (0200) bytes

```
                                                                        .F..F.tä.-..t..-..t..-..t..-..u( 000000
2875020A 7E830674 010A7E83 0C74080A 7E831274 040A7E83 40740846 08064688 .-..t..-..t..-..t..-..u..F..F.t. 000020
08741046 080E4688 1075020C 7E830674 010C7E83 0C74080C 7E831274 040C7E83 .F..F.u.¡µ.Ô ..^.1D....1D.v.1l.Ç 000040
848 8E6D1 0A7688E3 D102109F 88E3D10C 5E880120 E98DF388 06751446 08124688 ..èl...(..F%úF*..$..F*.-*.)X.F*è 000060
C1FA4688 587D02FA 7E83FA46 FF03E800 00FA46C7 F8468902 28808803 E6C10210 Ä..F..V..F=.Vzá^.&..&.W.á^=&..&. 000080
11260701 26FC5EC4 02578826 07882612 5EC4FE56 89FC4689 08568806 460303E0 W.á^.&.G.&.W.á^=&.G.&.W..-%.t..v 0000A0
76FF1474 00F87E83 06571126 04470126 FC5EC406 57882604 47882612 5EC40257 %.v..v..vz.v=.a...$..-%.u.Ô..á^. 0000C0
065EC400 80E90375 00F87E83 9FE80000 05619AFC 76FFFE76 FF0E76FF 1076FFF8 &..&.W.&9W..5|.&9G.s-&..&.W..F¶. 0000E0
89F44689 02578826 07882620 73084739 26067C35 7F0A5739 26025788 26078826 V-&.G.&.W.&..&.W.á^..F¶.V-&.G.&. 000100
89260847 8926F656 88F44688 065EC402 57892607 89260A57 88260847 8826F656 W.á^.&.G.&.W.&9W.|7..&9G.v/&.G.& 000120
26044788 262F7604 47392606 7F377C06 5739260E 5788260C 47882606 5EC40A57 .W..FÞ.V·&.G.&.W.&.G.&.W.á^..FÞ. 000140
88F04688 065EC406 57892604 4789260E 5788260C 478826F2 5689F046 89065788 V·&.G.&.W.+àS..^èùà...WV.¡$..Äá^ 000160
5EC4088E 05EC881E 56570000 12C8C8C9 5E1F00E8 C0280E57 89260C47 8926F256 ..ü.ô.......Þ..ÔEEEE.á^..ü.ô.ó.. 000180
80003605 C28CC388 065EC41F A5A5A5A5 0A8E1EF0 881E7F80 001605C2 8CC38806 .&.Þ..Ô¿...E.úf ..á^.&.GH&.WJ.F= 0001A0
FC46894A 57882648 47882606 5EC40002 F246C71F A5F20008 890A8E1E F088267F .Vz$.á^.&.GL&.WN.F=.Vz.F·.N·.âu. 0001C0
0375C008 F24EFFF2 4688FE56 89FC4689 4E578826 4C478826 065EC411 E8FE5689 Ô¨..vz.v=j.j..ó.Þ..vz.v=.F¶.P.X. 0001E0
0A589A50 16F4468D FC76FFFE 76FF07F0 09C29A00 6A006AFC 76FFFE76 FF00A8E9
```

```
Dump of file SATURN:[PCCOMMON.DUMP.DLL]BRDNOPL.TMP;1 on 18-APR-199ι '0:37:32.99
File ID (520,34,0)   End of file block 272 / Allocated 272

Virtual block number 40 (00000028), 512 (0200) bytes

 89EE4689 02578826 078826F4 5EC466EB 06478826 F45EC400 82E90374 C00803FC •..ᴀt.Ō..ᴀ^¶ᴀ.G.Šfᴀ^¶ᴀ..ᴀ.W..FŸ. 000000
 8E028805 74C00800 00FFFF9A 50520016 05016A06 77FF2608 77FF26EE 5EC4F056 VÞᴀ^Ÿᴀ.w.ᴀ.w.j....RP......ᴀt.¡.. 000020
 6A0677FF 260877rF 26F85EC4 FA5689F8 46890257 88260788 26F45EC4 44EB50EB ŠPŠDᴀ^¶ᴀ..ᴀ.W..F½.V•ᴀ^½ᴀ.w.ᴀ.w.j 000040
 7E000130 0C7CC008 10EB12EB 1EEB8E02 880574C0 080000FF FF9A5052 00140501 ....RP......ᴀt.¡..Š.Š.Š..ᴀ|.•..~ 000060
 6AB81E56 57000046 C8C8C95F 5E1F00EB C028FF37 E9FF67E9 00EB8E74 00023091 .•..t/Š.Ōg.Ō7.+ᴀŠ..^_èùᴀF..WV.¡j 000080
 C05689BE 46890016 05085688 06468804 60E980F3 88067508 46080646 88D88E07 ..Ä.F..F.u.¡µ.Ō'..F.¯V.....F/.Vᴀ 0000A0
 8E1E0716 F088047E 800C5688 0A468841 740C4608 0A4688CC 568CCA46 89C2468D .Fō.Fb.Vᴀ.F..F.tA.F..V..~ᴀ.Þ.... 0000C0
 88084688 C45689C2 46890257 1826072B 268E5EC4 D6568804 46881FA5 A5A5A50A ÖEEEE..Fᴀ.Vᴀᴀ^/ᴀ+.ᴀ.W..Fō.Vᴀ.FÄ. 0000E0
 1056880E 46884174 CC4608CA 46884FEB C85689C6 46890657 18260447 2826DA56 VDᴀ+G.ᴀ.W..Fō.VᴀŠO.Fō.FätA.F..V. 000100
 89C45613 C2460302 57882607 8826BE5E C41FA5A5 A5A5DA8E 1E0716F0 88C27E8D .-ō.Þ....ÖEEEE.ᴀ^/ᴀ..ᴀ.W..Fō.Vō. 000120
 80E980F3 8806E8DA 56890846 89C85613 C6460306 57882604 47882606 56890446 Fᴀ.Vᴀᴀ.G.ᴀ.W..Fō.Vᴀ.FÄ.VōŠ.¡µ.Ō¯ 000140
 26065EC4 0395E9C0 28057506 47082604 4788260F 75024708 26078826 CA5EC403 .ᴀ^ōᴀ..ᴀ.G.u.ᴀ.G.ᴀ.G.u.+ᴀŌ..ᴀ^.ᴀ 000160
 46805016 D4468D50 52001605 E65689E4 46890857 88260647 8826CE46 89464788 .GF.Foᴀ.G.ᴀ.W..Fō.V]...RP.Fᴀ.P.F 000180
 3A74080E 7E834074 040E7E83 0350E98E 09880675 080E7E83 0000FFFF 9A50160E ᴀ.P......~ᴀ.u.¡..Ō]..-ᴀ.tᴀ.~ᴀ.t: 0001A0
 8A0074CE 4638000C 25E42ADE 468A2874 000E7E83 2E7402DE 7E833474 010E7E83 .~ᴀ.t4.-ᴀ.t..~ᴀ.t(.Fᴀ•ō%..;Föt.. 0001C0
 FF501604 46800E46 89000325 DE468806 E8CE4688 0575CE46 38000325 E42ADE46 Fᴀ•ō%..;Fou..FoŠ..Fᴀ%...Fᴀ.Fᴀ.P. 0001E0

Dump of file SATURN:[PCCOMMON.DUMP.DLL]BRDNOPL.TMP;1 on 18-APR-1990 10:37:32.99
File ID (520,34,0)   End of file block 272 / Allocated 272

Virtual block number 41 (00000029), 512 (0200) bytes

 26072826 8E5EC406 56880446 883674C0 080AC483 0ED2E80E E476FFE6 76FFDE76 vᴀ.vl.vᴀ.Ōᴀ..ᴀ..ᴀt6.Fᴀ.Vᴀᴀ^/ᴀ+.ᴀ 000000
 5EC40657 18260447 2826BE5E C4DA5688 08468802 57892607 8926CA5E C402571B .W.ᴀ^ōᴀ..ᴀ.W..FÄ.VŌᴀ^/ᴀ+G.ᴀ.W.ᴀ^ 000020
 16004680 5052FE56 89FC4689 4E578826 4C478826 065EC406 57892604 478926CA ōᴀ.G.ᴀ.W.ᴀ^.ᴀ.GLᴀ.WN.F•.V±RP.FÄ. 000040
 56390256 88004688 00E25683 01E04683 08E8E046 89E24689 C0280A93 00F09A50 P.Þ...+ᴀ.Fᴀ.FÄŠ..FÄ..Vᴀ..FÄ.V•9V 000060
 5016E846 80006AE0 76FFE276 FFFC76FF FE76FF7A 73E04639 057C0081 E9037EE2 ᴀ-.Ō..|.9FÄsz.v±.v•.vᴀ.vÄj..FŌ.P 000080
 50528C56 898A4689 02578826 0788268F E8027401 067F8326 E85EC408 1208689A .k...ᴀ^Ōᴀ....t.Šeᴀ..ᴀ.W..Fᴀ.V¥RP 0000A0
 0477FF26 E85EC400 6A006A06 77FF2608 77FF268A 5EC406C4 830B7710 A19A016A j..Ä.w..ᴀ.ᴀ^ᴀᴀ.w.ᴀ.w.j.j.ᴀ^Ōᴀ.w. 0000C0
 C7268A5E C41FA5A5 A5A51F16 1ED4768D 087F80E8 5EC40000 08D89A50 1604468D .Fᴀ.P.Ä...ᴀ^Ō....vᴀ...EEEE.ᴀ^ᴀᴀú 0000E0
 9A501600 46805052 FE5689FC 46894A57 88264847 8826065E C4FF69E9 00013847 Gᴀ..Ōi.ᴀ^.ᴀ.GHᴀ.WJ.F•.V±RP.FÄ.P. 000100
 7EE25639 D25688D0 468800E2 568301E0 468308EB E04689E2 4689C028 085400F0 Þ.T.+ᴀ.Fᴀ.FÄŠ..FÄ..Vᴀ..FÄ.V•9Vᴀ~ 000120
 16E8468D 006AE076 FFE276FF FC76FFFE 76FF0149 E90372E0 4639087C 0153E903 .ŌS.|.9FÄr.Ōl..v±.v•.vᴀ.vÄj..FŌ. 000140
 8C5689BA 46890257 88260788 26E85EC4 0113E906 47882628 5EC407E0 08689A50 P.k.Ä.ᴀ^Ōᴀ.G.Ō..ᴀ^Ōᴀ..ᴀ.W..Fᴀ.V¥ 000160
 8826BA5E C4F25689 F0468900 0805EA56 88E84688 06C4830C 0810A19A 006A5052 RPj..Ä....ᴀ..FŌ.Vō....FÞ.V·ᴀ^ᴀᴀ. 000180
 FFCC76FF F076FFF2 76FFDC46 89044788 26E85EC4 EE5689EC 46890857 88260647 G.ᴀ.W..Fᴀ.VŸᴀ^Ōᴀ.G..FÉ.v·.vÞ.vᴀ. 0001A0
 76FF006A 006AEC76 FFEE76FF 10C483F8 C0E80ECE 76FFDE76 FF501604 4680CA76 vō.Fᴀ.P.vᴀ.vö.Ōᴀ½.ᴀ..vŸ.vᴀj.j..v 0001C0
 93E90001 3647C726 8A5EC400 013847C7 268A5EC4 0000FFFF 9AF076FF F276FFDC É.v·.vÞ.....ᴀ^ᴀᴀúG8..ᴀ^ᴀᴀúG6..Ō. 0001E0

Dump of file SATURN:[PCCOMMON.DUMP.DLL]BRDNOPL.TMP;1 on 18-APR-1990 10:37:32.99
File ID (520,34,0)   End of file block 272 / Allocated 272

Virtual block number 42 (0000002A), 512 (0200) bytes

 F45EC406 C48302C2 10A19A02 6A5052F6 5689F446 89025788 26078826 E85EC400 .ᴀ^Ōᴀ..ᴀ.W..F¶.V-RPj..Ä.ō..ᴀ.ᴀ^¶ 000000
 FF5052F2 5689F046 89000805 EA5688E8 4688FA56 89F84689 08578826 06478826 ᴀ.G.ᴀ.W..F½.V•.FŌ.Vō....FÞ.V·RP. 000020
 F276FFF8 76FFFA76 FF10C483 F830E80E CE76FFDE 76FF5016 D4468DCA 76FFCC76 vᴀ.vō.Fᴀ.P.vᴀ.vö.Ō=½.ᴀ..v•.v½.v· 000040
 E8000130 47C726F4 5EC40000 FFFF9ADE 76FFF876 FFFA76FF 0000FFFF 9AF076FF .vÞ......v•.v½.vᴀ.....ᴀ^¶ᴀúG0..Š 000060
 75000A7F 8326065E C4FE97E9 00E8FF6F E9037500 0230FEE6 E90375C0 0811E813 .Š..ᴀu.Ōl±•..u.Ōo.Š.Ō.±ᴀ^.ᴀ....u 000080
 003605C2 8CC388CE 76FFDE76 FF501604 4680CA76 FFCC76FF 2174000C 7F832607 .ᴀ....tl.vᴀ.vō.Fᴀ.P.vᴀ.vö.ú.ō.6. 0000A0
 DE468806 5EC41FA5 45A5A51F 161ED476 8D167F8D 065EC410 C483F92F E80E5052 RP.Ō/ᴀ.ᴀ.ᴀ^.....vᴀ...EEEE.ᴀ^..Fᴀ 0000C0
 00010092 87C726E4 5EC40001 6847C726 065EC400 016647C7 26065EC4 46478926 ᴀ.GFᴀ^.ᴀúGf..ᴀ^.ᴀúGh..ᴀ^ōᴀú..... 0000E0
 8E088F88 1E560000 16C8C8C9 5F5E1F00 E8C02804 C4830104 E80E0676 FF0876FF .v..v..Ō...ᴀ.+ᴀŠ..^_èùᴀ...V.¡... 000100
 9A5016EE 46800676 FF0876FF 0006E980 F3880675 08460806 46880000 F246C708 ÄúF·...F..F.u.¡µ.Ōᴀ¯.v..v..FŸ.P. 000120
 7EF65639 F05688EE 468800F6 568301F4 468308EB F44689F6 4689C028 007400F0 Þ.t.+ᴀ.F-.F¶Š..F¶..V-..FŸ.VÞ9V-- 000140
 16F8468D 006AF476 FFF676FF 0676FF08 76FF0098 E90372F4 4639087C 00A2E903 .ŌÄ.|.9F¶r.Ō...v..v..v-.v¶j..F½. 000160
 26EC5689 EA468902 57882607 8826F85E C461E806 478826F8 5EC40A54 08689A50 P.k.Ì.ᴀ^½ᴀ.G.Šᴀᴀ^½ᴀ..ᴀ.W..Fō.VŠᴀ 000180
 EC5689EA 46890257 88260788 26F85EC4 50E8FFFF 1240C726 EA5EC4E6 D1047788 .w.llᴀ^ōᴀúᴀ...ŠPᴀ^½ᴀ..ᴀ.W..Fō.Vᴀ 0001A0
 89FC4689 02578826 078826F8 5EC42EE8 12408926 F24688EA 5EC4E6D1 04778826 ᴀ.w.llᴀ^ō.F·ᴀ.ᴀ.Š.ᴀ^½ᴀ..ᴀ.W..F•. 0001C0
 00E80474 00023096 74000130 8C74C008 10E812EB 0E478926 F24688FC 5EC4FE56 V±ᴀ^•.F·ᴀ.G.Š.Š..ᴀt¥=..t.=..tᴀŠ. 0001E0
```

Dump of file SATURN:[PCCOMMON.DUMP.DLL]BRDNOPL.TMP;1 on 18-APR-1990 10:37:32.99
File ID (520,34,0)   End of file block 272 / Allocated 272

Virtual block number 43 (0000002B), 512 (0200) bytes 47882606 5EC4D88F 0D0D881E 56570000 28C8C8C9 5E1F00EB C028FF48 E9F246FF .F·ÖM.+åŠ..^èüå(..WV.¡...Àá^.&.G 000000
88E44689 46478826 FE5689FC 46890036 05C28CC3 88F45689 F2468904 57882602 .&.W..F·.V¶.ù.ô.6..F=.V±&.GF.Fô. 000020
F05689EE 4689005E 05F45688 F24688F6 46890A47 8826E256 89E04689 001605C3 ù....FÀ.V&&.G..F~.F·.V¶.^..FŸ.VÞ 000040
88E67E8D E25688E0 46880E56 89DC4689 000E05C2 8CC38800 89E9037C 01F67E83 .~~.|.Ô...ù.ô....FÉ.VB.FÀ.Vã.~l. 000060
5611EA46 01065788 26044788 260C5EC4 4AE8E446 881FA5A5 A5A5DA8E 1E0716F0 Þ....ÖEEEE..FôŠJá^É&.G.&.W..Fô.V 000080
02578826 07882 6DC 5EC43AEB EC5619EA 46290657 88260447 88260C5E C44DE8EC åŠMá^É&.G.&.W.)Fô.V&Š:á^É&..&.W. 0000A0
30C47400 013016E8 E85619E6 46290257 88260788 260C5EC4 28E8E856 11E64601 .F|.VÖŠ(á^É&..&.W.)F|.VÖŠ.=..tá= 0000C0
6A006A48 77FF264A 77FF2606 5EC433E8 00E8C874 0008300F 7400043D AC740002 ..t¯=..tÖ=..tåŠ.Š3á^.&.wJ&.wHj.j 0000E0
DA8E1E07 16F088E6 7E8D0008 05FA5688 F846880D 3208689A 5016F846 80006A00 .j..F½.P.k.2..F½.V°....~l.Þ....Ö 000100
5EC46675 02E47E83 067401E4 7E83000C E9037C02 0A7F8326 065EC41F A5A5A5A5 ÉÉÉÉ.á^.&....|.ÖÉ..~ô.t..~ô.ufá^ 000120
26E05EC4 02578926 078926FC 5EC40257 1826072B 26EE5EC4 02578826 078826E0 À&..&.W.á^Ÿ&+.&.W.á^=&..&.W.á^À& 000140
26EE5EC4 02578826 078826E0 5EC40657 89260447 8926FC5E C4065788 26044788 .G.&.W.á^=&.G.&.W.á^À&..&.W.á^Ÿ& 000160
89260C47 8926EC56 88EA4688 FC5EC40A 57892608 478926FC 5EC40257 13260703 ..&.W.á^=&.G.&.W.á^=.Fô.V±&.G.&. 000180
26044788 26E05EC4 02578926 078926FC 5EC40257 88260788 26E05EC4 67E80E57 W.Šgá^À&..&.W.á^=&..&.W.á^À&.G.& 0001A0
88E64688 FC5EC406 57892604 478926FC 5EC40657 18260447 2826EE5E C4065788 .W.á^Ÿ&+G.&.W.á^=&.G.&.W.á^=.F|. 0001C0
06571326 04470326 EE5EC406 57882604 478826E0 5EC40A57 89260847 8926E856 VÖ&.G.&.W.á^À&.G.&.W.á^Ÿ&.G.&.W. 0001E0

Dump of file SATURN:[PCCOMMON.DUMP.DLL]BRDNOPL.TMP;1 on 18-APR-1990 10:37:32.99
File ID (520,34,0)   End of file block 272 / Allocated 272

Virtual block numb-- 44 (0000002C), 512 (0200) bytes

8D016A00 6A006A48 77FF264A 77FF2606 5EC400D5 E90E5789 260C4789 26FC5EC4 á^=&.G.&.W.Öf.á^.&.wJ&.wHj.j.j.. 000000
7E830674 01E47E83 DE56890C 46890008 05FA5688 F846880E F808689A 5016F846 F½.P.k.«..F½.V°....FÉ.VB.~ô.t..~ 000020
C4065788 26044788 26E05EC4 02578926 078926E8 5688E646 88FC5EC4 537502E4 ô.uSá^=.F|.VÖ&..&.W.á^À&.G.&.W.á 000040
C40A5789 26084789 26FC5EC4 02578826 0788260C 5EC40657 89260447 8926FC5E ^=&.G.&.W.á^É&..&.W.á^=&.G.&.W.á 000060
57882607 8826E05E C44CE80E 5789260C 478926FC 5EC40657 88260447 88260C5E ^É&.G.&.W.á^=&.G.&.W.ŠLá^À&..&.W 000080
57892604 478926FC 5EC40657 88260447 88260C5E C4025789 26078926 FC5EC402 .á^=&..&.W.á^É&.G.&.W.á^=&.G.&.W 0000A0
260C4789 26EC5688 EA4688FC 5EC40A57 89260847 8926E856 88E64688 FC5EC406 .á^=.F|.VÖ&.G.&.W.á^=.Fô.V&&.G.& 0000C0
88260788 26207308 47392606 7C357F0A 57392602 57882607 8826FC5E C40E5789 .W.á^=&..&.W.&9W..5|.&9G.s-&..&. 0000E0
DE56880C 4688FC5E C4025789 26078926 0A578826 08478826 DE56890C 46890257 W..FÉ.VB&.G.&.W.&..&.W.á^=.FÉ.VB 000100
76044739 26067F37 7C065739 260E5788 260C4788 26FC5EC4 0A578926 08478926 &.G.&.W.á^=&.G.&.W.&9W.|7..&9G.v 000120
C4065789 26044789 260E5788 260C4788 26DA5689 08468906 57882604 4788262F /&.G.&.W..FÄ.VÖ&.G.&.W.&.G.&.W.á 000140
881E5600 0048C8C8 C95F5E1F 00E8C028 0E578926 0C478926 0A5688D8 4688FC5E ^=.FÄ.VÖ&.G.&.W.+åŠ..^ èüåH..V.¡ 000160
000E05C3 888E5689 8C468900 1605C28C C388C446 89464788 26065EC4 D88E0E06 ...Äá^.&.GF.Fá.ù.ô....FŸ.V/.ù... 000180
894A5788 26484788 26CC5689 CA468900 5E050457 88260247 8826C256 89C04689 .Fá.VÖ&.G.&.W..^..Fô.Vø&.GH&.WJ. 0001A0
CA5EC41C 7502C47E u3067401 C47E8312 3E00F09A 5016C646 805052FE 5689FC46 F=.V±RP.Fô.P.Þ.>..~á.t..~á.u.á^ô 0001C0
04478826 CA5EC418 E8065689 D44689DA 56890846 8902D1E0 D1025788 26078826 &..&.W.¦A¦0.FÄ.VÖ.Fá.VøŠ.á^ô&.G. 0001E0

Dump of file SATURN:[PCCOMMON.DUMP.DLL]BRDNOPL.TMP;1 on 18-APR-1990 10:37:32.99
File ID (520,34,0)   End of file block 272 / Allocated 272

Virtual block number 45 (0000002D), 512 (0200) bytes

468308EB E04689E2 4689C02B 06568904 46890A56 89084689 D2D1E0D1 06578826 &.W.1A10.FA.VÖ.FÅ.V»+à.FÅ.FÅŠ..F 000000
76FFFC76 FFFE76FF 7373E046 39057C7A 7FE25639 C85688C6 468800E2 568301E0 À..Vã..Fô.Vàÿ9Vã.z|.9FÀss.vz.v».v 000020
26078826 C2EB0274 02067F83 26E85EC4 14360868 9A5016E8 4680006A E076FFE2 &.vÀj..Fô.P.k.6.á^ô&....t.Šô&..& 000040
46880000 FFFF9A50 16CE4680 0677FF26 0877FF26 F45EC4F6 5689F446 89025788 .W..F¶.V-á^¶&.w.&.w..Fô.P......F 000060
13084603 D05688CE 46881276 D4463805 7F197CD6 56380A56 13084603 D05688CE ö.VÀ.FÀ.VÖ;V»|...;FÀv..Fô.VÀ.FÀ. 000080
DE5689DC 468912D2 00609AC6 76FFC876 FF026A00 6AFF73E9 D6568904 46890A56 VÖ.Få.V»Ös.j.j..vå.vô.°.ß..FÉ.VB 0000A0
9AD476FF 0676FF37 FF260277 FF26CA5E C4009AE9 037402C4 7E830974 01C47E83 .~á.t..~á.t.Ö..á^ô&.w.&.7.v».vå. 0000C0
FF26CA5E C444E806 56880446 880874C0 08C02802 E8000188 0575D008 12F80130 Ö.«..Åu.¡..Š.+å.åt..Få.V»ŠÖá^ô&. 0000E0
9ADC8808 EC831312 06C79A13 0802C39A CA5EC413 03028F9A 045E8D37 FF260277 w.&.7.^å.¢...á^ô.ù....ú....&..É. 000100
89134000 FC9A5052 132D04A6 9A132602 569AD888 08C48313 2107CE9A 131703EF ÿ....ô.1..á..Å.V.&..|..·.RP..».ä.. 000120
F218C828 02778826 0F88268C 5EC4136D 00FC9ADC 76FFDE76 FF505206 56890446 Få.V»RP.vB.vÉ.».m.á^V&..&.w.+å.· 000140
08138C01 309A0476 FF0676FF 0477FF26 0677FF26 CA5EC400 90E9E676 89E44E89 .Nô.vlÖ..á^ô&.w.&.w...v».vå.0.... 000160
5EC41397 028F9AD4 5E8D48E8 D6568804 46880874 C008C028 02E80001 88057500 Åu.¡..Š.+å.åt..Få.V»ŠH.^å.¢...á^ 000180
08C48313 8507CE9A 13A803EF 9ADC8808 EC8313A6 06C79A13 9C02C39A 045F8DCA ô.....ù...ù.l..å..É.ÿ.¨..ö.ç..å. 0001A0
4689130F 00FC9A04 77FF2606 77FF26CA 5EC45052 13CC04A6 9A138A02 569AD888 .À¯V.o..|.ä.RPá^ô&.w.&.w..».Ö..F 0001C0
F218C828 06778826 044F8826 8C5EC4FF FF00FC9A DC76FFDE 76FF5052 D6568904 å.V»RP.vB.vÉ.=...á^V&.O.&.w.+å.· 0001E0

```
Dump of file SATURN:[PCCOMMON.DUMP.DLL]BRDNOPL.TMP;1 on 18-APR-1990 10:37:32.99
File ID (520,34,0)   End of file block 272 / Allocated 272

Virtual block number 46 (0000002E), 512 (0200) bytes

 5639C856 88C64688 00E25683 01E04683 08EBE046 89E24689 C02BE676 89E44E89 .N8.vl+à.Fã.FÁŠ..FÁ..Vã..F6.Và9V 000000
 4680006A E076FFE2 76FFFC76 FFFE76FF 025DE903 72E04639 087C0267 E9037EE2 ã-.Ôg.|.9FÁr.Ô]..v±.v•.vã.vÁj..F 000020
 F05EC400 CCE9C446 88F25689 F0468900 0805EA56 88E84688 10170868 9A5016E8 Ò.P.k....FÒ.Võ....FÞ.V·.FáÔà.á^Þ 000040
 26044703 26C05EC4 06578826 04478826 8C5EC402 57892607 8926E656 88E44688 .FÕ.Vl&..&.W.á^¥&.G.&.W.á^à&.G.& 000060
 57892607 8926E656 88E44688 F05EC400 84E90657 89260447 8926F05E C4065713 .W.á^Þ&.G.&.W.ÔÇ.á^Þ.FÕ.Vl&..&.W 000080
 89260447 8926F05E C406571B 2604472B 26C05EC4 06578826 04478826 8C5EC402 .á^¥&.G.&.W.á^à&+G.&.W.á^Þ&.G.&. 0000A0
 26078926 F05EC402 57132607 0326C05E C40257B8 26078826 8C5EC400 80E90657 W.Ô..á^¥&..&.W.á^à&..&.W.á^Þ&..& 0000C0
 02578826 078826BC 5EC44FEB 06578926 04478926 E65688E4 4688F05E C4025789 .W.á^Þ.FÕ.Vl&.G.&.W.ŠOá^¥&..&.W. 0000E0
 478926E6 5688E44  88F05EC4 02578926 078926F0 5EC40257 1B26072B 26C05EC4 á^à&+.&.W.á^Þ&..&.W.á^Þ.FÕ.Vl&.G 000100
 0830B874 00043D1. 24E90375 00023DFF 60E90375 0001301C EB1EEB06 57892604 .&.W.Š.Š.=..u.Ô'.=..u.Ô$.=..t¡=. 000120
 C48A5689 B8468902 57882607 8826E85E C4000BE9 06478826 E85EC400 E8827400 .t.Š.á^Ô&.G.ÔÜ.á^Ô&..&.W..F¡.Vaá 000140
 8876FFBA 76FF0246 89044788 26E85EC4 EE5689EC 46890857 88260647 8826885E ^¡&.G.&.W..F&.V¥á^Ô&.G..F@.va.v¡ 000160
 0AD69AF0 76FFF276 FFD276FF 006A006A EC76FFEE 76FF06C4 830A8510 A19A006A j..À.ç..á..vŸ.v&j.j..v@.v·.vÞ.ø. 000180
 47C72688 5EC40001 3847C726 885EC412 408926E0 4688885E C4E60102 76880000 ...v@l&^¡.FÁ&.a.á^¡&úG8..á^¡&úG 0001A0
 08578826 06478826 F45EC4F6 5689F446 89025788 26078826 E85EC473 E8000136 6..Šsá^Ô&..&.W..F¶.V-á^¶&.G.&.W. 0001C0
 549AF076 FFF276FF F876FFFA 76FF06C4 8316ED10 A19A026A 5306FA56 89F84689 .F½.V°.Sj..À.Ù..á..v°.v½.v·.vÞ.T 0001E0

Dump of file SATURN:[PCCOMMON.DUMP.DLL]BRDNOPL.TMP;1 on 18-APR-1990 10:37:32.99
File ID (520,34,0)   End of file block 272 / Allocated 272

Virtual block number 47 (0000002F), 512 (0200) bytes

 C40E4789 26E04688 F45EC400 000C629A 4677FF26 065EC4F8 76FFFA76 FF00000C ....v°.V½á^.&.wF.b...á^¶.FÁ&.G.á 000000
 FFC876FF 026A006A 00E88F74 00023DFF 1EE90375 C0080EE8 00013047 C726F45E ^¶&úG0..Š..àu.Ô..=..t.Š.j.j..và. 000020
 8300012D DE5688DC 46882874 C008C028 02E80001 88057500 0812A801 309AC676 v6.0.´..Áu.¡..Š.+à.àt(.FÉ.V8-... 000040
 46880CEB E65611E4 4601D201 E001D656 88D44688 1275E256 381775E0 463B000A Ö.;FÁu.;Vãu..FÁ.V@lÁl@.FÕ.VlŠ..F 000060
 5052FE56 89FC4689 ´E578826 4C478826 065EC4FD 83E9E656 11E44601 D65688D4 á.V•.FÕ.VlÕ.»á^.&.GL&.WN.F=.V±RP 000080
 88C64688 00E25683 01E04683 08E8E046 89E24689 C02B16D4 00F09A50 16C6468D .F6.P.Þ.á.+à.Fã.FÁŠ..FÁ..Vã..F6. 0000A0
 16E8468D 006AE076 FFE276FF FC76FFFE 76FF3F73 E0463905 7C467FE2 5639C856 Và9Vã.F|.9FÁs?.v±.v•.vã.vÁj..FÕ. 0000C0
 83157510 A19A016A 50528A56 89884689 02578826 078826E8 5EC411BF 08689A50 P.k.¢.á^Ô&..&.W..F¡.VaRPj..À.u.. 0000E0
 8E1170B8 1E565700 0016C8C8 C95E1F00 E8C028A7 E8000138 47C72688 5EC406C4 á.á^¡&úG8..Šl+àŠ..^èùà...WV.¡p.. 000100
 107E830C 7F020E7E 83127C00 0E7E8318 740C4608 0A468820 74084608 064688D8 Ã.F..F.t .F..F.t..~..|..~.....~. 000120
 C7077FFF 127E83FA 46890A47 8826065E C4018AE9 8DF3B806 7401107E 830C7400 .t..~..t.¡µ.Õ..á^.&.G..F°.~....ú 000140
 47882606 5EC4015F E98E0A88 0675010E 7E83067F 124639FA 468814E8 00001246 F...Š..F°9F....~..u.¡..Õ_.á^.&.G 000160
 8E1EF088 267F8D00 3605C28C C3881575 00667F83 26F85689 F6468904 57882602 .&.W..F-.V½&..f.u..ù.ò.6...&.Þ.. 000180
 0674C008 0000FFFF 9A5016FC 468D106A 0E6A0677 FF26F65E C41FA5F2 0008890A Ö¿...É.á^-&.w.j.j..F•.P......át. 0001A0
 03E8C028 0475020E 7E830257 89260789 260C5688 0A4688FC 5EC40113 E980F288 ¡·.Õ..á^•.F..V.&..&.W..~..u.+àŠ. 0001C0
 0C56880A 46887F75 010E7E83 06478926 0E4688FC 5EC40447 8926FC5E C4104688 .F.á^•&.G.á^•.F.&.G..~..u..F..V. 0001E0

Dump of file SATURN:[PCCOMMON.DUMP.DLL]BRDNOPL.TMP;1 on 18-APR-1990 10:37:32.99
File ID (520,34,0)   End of file block 272 / Allocated 272

Virtual block number 48 (00000030), 512 (0200) bytes

 9AFC76FF FE76FF00 6A016A00 6A006A4C 77FF264E 77FF2606 5EC4F056 89EE4689 .FŸ.VÞá^.&.wN&.wLj.j.j.j..v±.v•. 000000
 77FF26EE 5EC4EC56 89EA4689 00160508 56880646 880C47FF 26065EC4 16980290 ....á^.&.G..F..V.....FÕ.V&á^Ÿ&.w 000020
 FF1240C7 26EE5EC4 E6011076 88000015 8E9A5052 1076FF00 6A006A06 77FF2608 .&.w.j.j..v.RP......v.l|á^Ÿ&úa.. 000040
 4A77FF26 065EC434 E81FA5A5 A5A5DA8E 1EF08808 7F8DEC56 88EA4688 FC5EC4FF .á^•.FÕ.V&....Þ..ÖEEEE.Š4á^.&.wJ 000060
 0A47FF26 065EC418 1202909A FC76FFFE 76FF006A 006A5052 99124688 4877FF26 &.wH.F..RPj.j..v±.v•.....á^.&.G. 000080
 47882606 5EC404C4 83F557E8 0E0676FF 0876FF04 C483F8CF E80E0676 FF0876FF .v..v..ÒùŸ.á..v..v..ÒŸ.á.á^.&.G 0000A0
 1CC8C8C9 5F5E1F00 E8C02800 01009287 C726F25E C4F45689 F2468908 57882606 .&.W..F·.V¶á^·&ú.....+àŠ..^_èùà. 0000C0
 7E830C74 080A7E83 1274040A 7E832074 08460806 4688088E 1700881E 56570000 ..WV.¡...Ã.F..F.t .~..t..~..t..~ 0000E0
 005E0508 56880646 88018EE9 C0280575 0E46080C 46880875 020A7E83 0674010A ..t..~..u..F..F.u.+àÕ...F..V..^. 000100
 7C0E7F00 067F8326 1575003F 8326067C 1D7F0002 7F8326EC 5EC4EE56 89EC4689 .F&.V¥á^&&......|.&.?.u.&......| 000120
 A5A5A5DA 8E1E0716 F062E47E 800E5688 0C468801 58E9C02B 05750004 7F832607 .&....u.+àÕX..F..V..-Õ.Þ....ÖEEE 000140
 26078826 EE468E1F A5F20008 890A8E1E F088F07E 80001605 08568806 46ú.'FA5 É..F..V.....-Þ.Þ..Õ¿...É..FŸ&..& 000160
 46290257 88260788 26F65611 F4460106 57882604 478826F2 5611F046 0102.'88 .W..FÞ.V·&.G.&.W..F¶.V-&..&.W.)F 000180
 83265975 020A7E83 0674010A 7E83FE56 19FC4629 06578826 04478826 FA561)'8 ½.V°&.G.&.W.)F•.V±.~..t..~..uY&. 0001A0
 3926057C 167F0257 3926F256 88F04688 0C5EC44A 74003F83 26067F52 7C00027F ...|R..&.?.tJá^..FÞ.V·&9W...|.&9 0001C0
 7C025739 26FA5688 F846880C 5EC423E8 02578926 078926F2 5688F046 880F7307 .s..FÞ.V·&..&.W.Š#á^..F½.V°&9W.| 0001E0
```

```
Dump of file SATURN:[PCCOMMON.DUMP.DLL]BRDNOPL.TMP;1 on 18-APR-1990 10:37:32.99
File ID (520,34,0)   End of file block 272 / Allocated 272

Virtual block number 49 (00000031), 512 (0200) bytes

7C00067F 8326EC5E C45FEB02 57892607 8926FA56 8BF8468B 00760739 26057F14 ...&9.v..F%.V‡&..&.W.$_&^&&....| 000000
73044739 26067C1. 7F065739 26F6568B F4468B0C 5EC44C74 00047F83 26077F55 U..&....tL&^..F¶.V-&9W...|.&9G.s 000020
167C0657 3926FE56 8BFC468B 0C5EC425 EB065789 26044789 26F6568B F4468B10 ..F¶.V-&.G.&.W.$X&^..F=.V±&9W.|. 000040
26E6568B E4468B0C 5EC40657 89260447 8926FE56 8BFC468B 0E760447 3926067F ..&9G.v..F=.V±&.G.&.W.&^..FÐ.V|& 000060
EB0001B8 05740657 39260675 04473926 EA568BE8 46881275 02573926 18750739 9.u.&9W.u..FÒ.Võ&9G.u.&9W.t.|..$ 000080
0B0E468B 08740846 08064688 088E1806 8B1E0000 0CC8C8C9 5F5E1F00 EBC02802 .+åS..^_èùå....|ø..Å.F..F.t..F.. 0000A0
0676FF08 76FF0096 E98DF38B FFFF07C7 260E5EC4 08741046 0B0E468B 16751046 F.u..F.‾F.t.á^.&ú...|µ.Ö...v..v. 0000C0
FFFF07C7 260E5EC4 0C7301FC 7E83067C 147F00FE 7E831B2E 00F09A50 16FC468D .F=.P.Þ....‐±...|..‐=.s.á^.&ú... 0000E0
7FF65639 FE568BFC 468B00F6 568301F4 468308EB F44689F6 4689C02B 6CEBC02B +åS|+å.F-.F¶$..F¶..V-..F=.V±9V-. 000100
18870868 9A5016F8 468D006A F476FFF6 76FF0676 FF0876FF 3C73F446 39057C43 C|.9F¶s<.v..v..v‐.v¶j..F%.P.k... 000120
00018807 8926F446 880E5EC4 0E750257 39261475 0739260C 56880A46 8BF85EC4 á^%.F..V.&9.u.&9W.u.á^..F¶&..|.. 000140
000201E7 000415EF 02030012 90C8C91F 00EBC02B FFFF07C7 260E5EC4 AAEB0EEB $.$ˆá^.&ų...+åS..èù.....ÿ...Ò... 000160
00020000 00070326 000201FA 0004126A 02030000 0005150D 00020000 0003017A z.......ì.......j...*...&....... 000180
0002020E 00041601 02030014 000317A8 0203008A 0004183F 02030000 00080276 v.......?....................... 0001A0
02030000 00141AD8 0002021E 00040857 02030022 00030431 02030000 000C005D ].......1...".....W........Å....... 0001C0
020300CC 00040825 02030000 00191AA0 00020000 00171635 00020033 0004068E ƒ...3...5..............X...ä... 0001E0

Dump of file SATURN:[PCCOMMON.DUMP.DLL]BRDNOPL.TMP;1 on 18-APR-1990 10:37:32.99
File ID (520,34,0)   End of file block 272 / Allocated 272

Virtual block number 50 (00000032), 512 (0200) bytes

080A4688 D88EFFFF 8B1E5657 00001AC8 00000000 00000000 00000050 00040994 ....P...........à...WV.|...Å.F.. 000000
76FF0789 26024789 26C02B06 5EC4014B E98DF38B 06750846 0B064688 08740C46 F.t..F..F.u.|µ.ÒK.á^.+å&.G.&...v 000020
F1B80675 000BF656 89F(4689 FE568BFC 46880000 FFFF9A50 16FC4680 0A76FF0C ..v..F=.P......F=.V±.F¶.V-.Åu.|Þ 000040
74C00B00 00FFFF9A 5016E646 803E6A0E 6A50F246 8906478B 26F45EC4 011°E98D .Ö..á^¶&.G..F·Pj.j>.F|.P......åt 000060
50520026 05C28CC3 8BF276FF A5F2001F B902688E F8B8E65E C400F6E9 8DF2. '06 .|·.Ö‐.á^|.«/h.¿..·É.v·.û.ô.&.RP 000080
F276FF00 C0E98E02 B8000000 D89AE676 FFE876FF F276FF14 74C00800 CC000. ?A ...ä..åt..v·.vÒ.v|.Å...|..Òå..v· 0000A0
76FF0157 00689A26 77FF2628 77FF26E6 5EC42474 C0080000 FFFF9A50 16F8468D .F%.P......åt$á^|&.w(&.w&.h.W..v 0000C0
EE4689F0 4689EA46 89EC4689 C02B0088 E98E02B8 0000FFFF 9AE676FF E876FFF2 ·.vÒ.v|.....|..Ö..+å.Få.Fö.FÞ.FŸ 0000E0
8D016A00 6A006AF8 76FFFA76 FF000001 159A5016 EA468050 5050F876 FFFA76FF .v*.vWPPP.Fö.P......v*.v%j.j.j.. 000100
F8468BE6 5EC40457 89260247 8926F656 8BF4468B E65EC400 00FFFF9A 5016EA46 Fö.P.....á^|.F¶.V-&.G.&.W.á^|.F% 000120
76FF006A 016A006A 006A1477 FF261677 FF26F45E C4085789 26064789 26FA568B .V*&.G.&.W.á^¶&.w.&.w.j.j.j.j..v 000140
5F5E1F00 EBC02B02 57892607 8926E856 8BE6468B 065EC4FF FF029D9A E676FFE8 Ò.v|.....á^..F|.VÒ&..&.W.+åS..^_ 000160
08468800 EFE98DF3 8806750A 46080846 88088E00 08881E56 000012C8 0008CAC9 èÒ..à...V.|...Å.F..F.u.|µ.Öy..F‾ 000180
3F8326F8 5EC4FA56 89F84689 04578826 02478826 F45EC4F6 5689F446 890A568B .V..F¶.V-á^¶&.G.&.W..F%.V*á^%&.? 0001A0
83000134 47C726F4 5EC400B6 E906C483 00ACE80E F476FFF6 76FF0676 FF137502 .u..v..v‐.v¶.Ò‾..á.ÒR.á^¶&úG4... 0001C0
26F45EC4 01FF09C2 9A006A00 6A2677FF 262877FF 26F45EC4 0083E903 7500067E ‐..u.Ö..á^¶&.w(&.w&j.j..ó...á^¶& 0001E0

Dump of file SATURN:[PCCOMMON.DUMP.DLL]BRDNOPL.TMP;1 on 18-APR-1990 10:37:32.99
File ID (520,34,0)   End of file block 272 / Allocated 272

Virtual block number 51 (00000033), 512 (0200) bytes

FFFF0404 9AFC76FF FE76FF0D 75C00800 930A589A 5016FC46 8D2677FF 262877FF .w(&.w&.F=.P.X....åu..v±.v=..... 000000
260A408B 26F45EC4 02E6C1EE 7688397F 01EE7E83 EE46FF03 EB0000EE 46C7DAEB ŠÒúFŸ..Š..FŸ.‐Ÿ..9.vŸè|.á^¶&.ä.& 000020
FFF276FF 0D74C00B 04C4830F 6AE80E50 F276FF1C 74D00BF2 5689F046 890C508B .P..FÞ.V·.Åt..v·P.Òj..á..åt..v·. 000040
0B08C483 FFFF044A 9AF876FF FA76FF08 76FF0A76 FFBEEBFF FF01659A 006AF076 vÞj..e...$/.v..v..v*.v%.J....á.. 000060
0E4688D8 8E01788B 1E560000 14C80006 CAC95E1F 00EBC02B 04EB8E07 880574C0 åt.|..$.+åS..^èÒ..à...V.|(..Å.F. 000080
8800FEE9 8DF3B806 7401067E 830C7400 067E830C 740C4608 0A468814 7410460B .F.t..F..F.t..‐..t..‐..t.|µ.Ö±.. 0000A0
88260247 8B26F05E C4F65689 F446890C 56880A46 8BF25689 F0468910 56880E46 F..V..FÞ.V·.F..V..F¶.V-á^Þ&.G.&. 0000C0
26F45EC4 1C750034 7F8326FE 5689FC46 89000A05 C28CC388 FA5689F8 46890457 W..F%.V*.û.ô....F=.V±&..4.u.á^¶& 0000E0
5E88009F E98E0088 06740240 0B26008B 26FC76C4 02E3C106 5E881275 00647F83 ..d.u..^.èÐ.áv=&..&.ä.t.|..Ö...^ 000100
3F8326F0 5EC40676 FF0876FF 02508926 0089260C 56880A46 8BFC76C4 02E3C106 .èÐ.áv=.F..V.&..&.P..v..v.á^Þ&.? 000120
080EC483 FFFF1705 9AF476FF F676FF0E 76FF1076 FF500001 8803EBC0 28047503 .u.+åS.|..P.v..v..v‐.v¶......á.. 000140
1E9A5016 EC46800E 76FF1076 FF1477FF 261677FF 26F85EC4 55EB8E00 880574C0 åt.|..ŠUá^%&.w.&.w..v..v..F&.P.. 000160
EC76FFEE 76FF1477 FF261677 FF26F85E C41874FF EE7E8306 75FFEC7E 83039509 ....‐ä.u..‐Ÿ.t.á^%&.w.&.w..vŸ.v& 000180
C95E1F00 EBC02800 013847C7 26F05EC4 00016647 C726F45E C401EA05 D09A006A j..Å.ò.á^¶&úGf..á^Þ&úG8..+åS..^è 0001A0
01067E83 0C740006 7E830C74 0A460808 46880888E 0289881E 5600000C C8000CCA ò..à...V.|...Å.F..F.t..‐..t..‐.. 0001C0
000A05F4 460302E0 C1064688 F65689F4 46890A56 88084688 000E980 F3880674 t.|µ.ÒÅ..F..V..F¶.V-.F.èÅ..F¶... 0001E0
```

Dump of file SATURN:[PCCOMMON.DUMP.DLL]BRDNOPL.TMP;1 on 18-APR-1990 10:37:32.99
File ID (520,34,0)   End of file block 272 / Allocated 272

Virtual block number 52 (00000034), 512 (0200) bytes

```
470B2607 8826F85E C4FE5689 FC468900 1205F446 03E0D106 4688FA56 89F84689 .F%.V*.F.1Å.F¶....F•.V±ó^Y&..&.G 000000
033F8326 F45EC437 FF26FC5E C4016A00 87E98E00 88FFFF07 C726FC5E C40E7502 .u.ó^•&ú...¡..Õ..j.ó^•&.7ó^¶&.?. 000020
83034A03 589A37FF 260277FF 26F85EC4 0876FF0A 76FF5000 018803EB C02B0475 u.+óŠ.¡..P.v..v.ó^Y&.w.&.7.[.J.. 000040
400B260A 408826F4 5EC402E6 C1DEF7F6 1B01067E 834DE88E 00880574 C0080EC4 ó..ât.¡..ŠM.-...-%ßél.ó^¶&.ə.&.ə 000060
029D9A08 76FF0A76 FF006A01 6A006A00 6A1477FF 261677FF 26025FC4 261F750C .u.&ó_.&.w.&.w.j.j.j.j..v..v.... 000080
04C80006 CAC95E1F 00EBFFFF 07C726FC 5EC40789 26024789 26C02BF8 5EC40371 q.ó^Y+â&.G.&..ó^•&ú...Š..^èò..à. 0000A0
5689FC46 890C5688 0A468821 E88DF388 05750C46 080A4688 088E038A 881E0000 ...¡¤..Ä.F..F.u.¡µ.Šl.F..V..F•.V 0000C0
1E000004 C80008CA C91F00E8 C02B3057 89262E47 89260856 88064688 FC5EC4FE ±ó^•.F..V.&.G.&.WO+âŠ..èò..à.... 0000E0
0C568B0A 468B25E8 8DF38805 75084608 06468808 740C4608 0A4688D8 8E048488 ¡Ç..Ä.F..F.t..F..F.u.¡µ.Š%.F..V. 000100
1F00EBC0 28025789 26078926 065EC430 5788262E 478826FC 5EC4FE56 89FC4689 .F•.V±ó^•&.G.&.WOó^.&..&.W.+âŠ.. 000120
F3880575 08460806 46?80874 0C46080A 4688088E 04F1881E 000004C8 0008CAC9 èò..à....¡þ..Ä.F..F.t..F..F.u.¡µ 000140
07892606 5EC40857 88260647 8826FC5E C4FE5689 FC46890C 56880A46 8[?]5E88D .Š%.F..V..F•.V±ó^•&.G.&.W.ó^.&.. 000160
8808740C 46080A46 88088E05 3A881E00 0010C800 08CAC91F 00E8C028 025[?]926 &.W.+âŠ..èò..à....¡:..Ä.F..F.t.. 000180
260877FF 26F05EC4 F25689F0 46890C56 880A4688 78E88DF3 88057508 460B[?]46 F..F.u.¡µ.Š(.F..V..FÞ.V.ó^Þ&.w.& 0001A0
46FF03E8 0000F846 C750E88E 02880574 C0080000 FFFF9A06 76FF0876 FF0677FF .w..v..v.......ât.¡..ŠPúF%..Š..F 0001C0
46880720 E80E5016 FE468050 16FA468D F876FF0A 76FF0C76 FF3C7F01 F87E83F8 %.-%..<.v..v..v%.F*.P.F±.P.Ò ..F 0001E0
```

Dump of file SATURN:[PCCOMMON.DUMP.DLL]BRDNOPL.TMP;1 on 18-APR-1990 10:37:32.99
File ID (520,34,0)   End of file block 272 / Allocated 272

Virtual block number 53 (00000035), 512 (0200) bytes

```
0000FF9A 50520016 05F876FF 006A006A 0676FF08 76FFF656 89F44689 FC568BFA *.V•.F¶.V-.v..v.j.j..v%...RP.... 000000
46880874 0C46080A 4688088E 0583881E 000006C8 0008CAC9 1F00E8C0 288BE800 .ŠE+âŠ..èò..à....¡...Å.F..F.t..F 000020
C453EB8D F3880789 26024789 26C02806 5EC40C74 08460806 46881975 08460806 ..F.u..F..F.t.ó^.+â&.G.&..¡µ.ŠSó 000040
F5880789 26024789 26C02806 5EC41174 00043016 7400033D FE468907 88260A5E ^.&...F±=..t.=..t.ó^.+â&.G.&..¡% 000060
0676FF08 76FF0677 FF260877 FF26FA5E C4FC5689 FA46890C 56880A46 882FEB8D .Š/.F..V..F*.V•ó^*&.w.&.w..v..v. 000080
8E062288 1E000006 C80008CA C91F00E8 C02804E8 8E028805 74C00800 00FFFF9A ......ât.¡..Š.+âŠ..èò..à....¡"..  0000A0
46080646 88087501 0A7E8306 74000A7E 83147C00 0E7E831A 74124608 104688D8 Ä.F..F.t..-..|..-..t..-..u..F..F 0000C0
36E88DF5 88057400 04300A74 00033DFE 4689078B 26105EC4 4EE88DF3 88057508 .u.¡µ.ŠNó^.&...F±=..t.=..t.¡%.Š6 0000E0
76FF0A76 FF0C76FF 0E76FF06 77FF2608 77FF26FA 5EC4FC56 89FA4689 C28CC388 .û.ô.F*.V•ó^*&.w.&.w..v..v..v..v 000100
1E000006 C8000ECA C91F00E8 C02804E8 8E028805 74C00800 00FFFF9A 0676FF08 ..v.......ât.¡..Š.+âŠ..èò..à.... 000120
88087501 0A7E8306 74000A7E 83147C00 0E7E831A 74124608 104688D8 8E06AD88 ¡Ü..Ä.F..F.t..-..|..-..t..-..u.. 000140
05740004 300A7400 033DFE46 89078826 105EC400 82E98DF3 88067508 46080646 F..F.u.¡µ.Õ..ó^.&...F±=..t.=..t. 000160
FF016A52 E88E0C88 0575043F 8326FA5E C4FC5689 FA4689C2 8CC3886A E88DF588 ¡%.Šj.û.ô.F*.V•ó^*&.?.u.¡..ŠRj.. 000180
77FF26FA 5EC435E8 8DF38805 75C0080C C483084A E80E5306 0C76FF0E 76FF0A76 v..v..v..S.ÒJ..ó..åu.¡µ.Š5ó^*&.w 0001A0
8E028805 74C00800 0006009A 0676FF08 76FF0A76 FF0C76FF 0E76FF06 77FF2608 .&.w..v..v..v..v..v.......ât.¡.. 0001C0
4688088E 0731881E 000012C8 000ECAC9 1F00E8C0 28000138 47C726FA 5EC400E8 Š.ó^*&ÚG8..+âŠ..èò..à....¡1..Ä.F 0001E0
```

Dump of file SATURN:[PCCOMMON.DUMP.DLL]BRDNOPL.TMP;1 on 18-APR-1990 10:37:32.99
File ID (520,34,0)   End of file block 272 / Allocated 272

Virtual block number 54 (00000036), 512 (0200) bytes

```
06750846 08064688 0875010A 7E830674 000A7E83 147C000E 7E831A74 12460810 ..F.t..-..|..-..t..-..u..F..F.u. 000000
8800BCE9 8DF58806 7400043D 08740003 3DFA4689 07882610 5EC40005 E98DF388 ¡µ.Ôl.ó^.&...F±=..t.=..t.¡%.ÕV.. 000020
0E76FF0A 76FF006A 00A3E98E 00880675 043F8326 EE5EC4F0 5689EE46 89C28CC3 ú.ö.FY.VÞó^Y&.?.u.¡..ÕÉ.j..v..v. 000040
57882606 478826EE 5EC40085 E98DF388 0675C008 0CC48307 8FE80E53 060C76FF .v..S.Ò...ó..åu.¡µ.Ò..ó^Y&.G.&.W 000060
0574C008 00000715 9A5016F2 468D0A76 FF0C76FF 0E76FF50 52FE5689 FC468908 ..F•.V±RP.v..v..v..F..P......ât. 000080
26F85688 F6468816 75025739 261C7507 3926F456 88F24688 065EC456 E88E0288 ¡..ŠVó^..F..V¶&9.u.&9W.u..F-.V½& 0000A0
53060A76 FF0C76FF 0E76FFFC 76FFFE76 FF2CEBC0 28047506 5739260A 75044739 9G.u.&9W.u.+âŠ..v±.v•.v..v..v..S 0000C0
000ECAC9 1F00EBC0 28000138 47C726EE 5EC400EB 8E028805 74C00800 00FFFF9A ......ât.¡..Š.ó^Y&ÚG8..+âŠ..èò.. 0000E0
7E830874 00067E83 0C7C000A 7E831274 0E460B0C 4688D88E 07EA881E 000006C8 à....¡ö..Ä.F..F.t..-..|..-..t..- 000100
E88DF588 05740004 300A7400 033DFE46 89078826 0C5EC47C E88DF388 05740106 ..t.¡µ.Š|ó^.&...F±=..t.=..t.¡%.Š 000120
76FF0676 FF006A4C E88E0E88 0575043F 8326FA5E C4FC5689 FA4689C2 8CC38864 d.ü.ö.F*.V•ó^*&.?.u.¡..ŠLj..v..v 000140
77FF2608 77FF26FA 5EC42FEB 8DF38805 75C0080C C483068E E80E5306 0876FF0A ..v..S.Ò...ó..åu.¡µ.Š/ó^*&.w.&.w 000160
013847C7 26FA5EC4 00E88E02 880574C0 080000FF FF9A0676 FF0876FF 0A76FF06 ..v..v..v.......ât.¡..Š.ó^*&ÚG8. 000180
000A7E83 18740E46 080C4688 D88E08F6 881E0000 04C8000A CAC91F00 EBC02800 .+âŠ..èò..à....¡-..Ä.F..F.t..-.. 0001A0
890E5688 0C468832 E88DF388 05740108 7E830874 00087E83 0C7F020A 7E83127C |.-.....-..t..-..t.¡µ.Š2.F..V.. 0001C0
C0080000 FFFF9A06 76FF0876 FF0A76FF 0677FF26 0877FF26 FC5EC4FE 5689FC46 F•.V±ó^*&.w.&.w..v..v..v.......â 0001E0
```

```
Dump of file SATURN:[PCCOMMON.DUMP.DLL]BRDNOPL.TMP;1 on 18-APR-1990 10:37:32.99
File ID (520,34,0)   End of file block 272 / Allocated 272

Virtual block number 55 (00000037), 512 (0200) bytes

1046080E 4688D88F 09A0881E 000004C8 000ACAC9 1F00E8C0 2804E88E 02880574 t.|..Š.+âŠ..èò..à....|...Ä.F..F. 000000
08460806 46880875 010A7E83 0674000A 7E83147F 020C7E83 1A7C000C 7E832074 t .-..|..-.....-..t..-..u..F..F. 000020
76FF0677 FF260877 FF26FC5E C4FE5689 FC468910 5688OE46 8835E88D F3880575 u.|µ.Š5.F..V..F=.V±á^=&.w.&.w..v 000040
0CCAC91F 00E8C02B 04E88E02 880574C0 080000FF FF9A0676 FF0876FF 0A76FF0C ..v..v..v.......ât.|..Š.+âŠ..èò. 000060
83067501 0A7E8306 74000A7E 8312740E 46080C46 88088E0A 06881E00 0004C800 .à....|...Ä.F..F.t..-..t..-..u.. 000080
77FF2608 77FF26FC 5EC4FE56 89FC4689 0E56880C 46882FE8 8DF38805 7D00087E -..).|µ.Š/.F..V..F=.V±á^=&.w.&.w 0000A0
04C8000A CAC91F00 E8C02804 E88E0288 0574C008 0000FFFF 9A0676FF 0876FF06 ..v..v.......ât.|..Š.+âŠ..èò..à. 0000C0
08064688 0875010A 7E830674 000A7E83 14740E46 080C4688 D88E0A77 881E0000 ...|w..Ä.F..F.t..-..t..-..u..F.. 0000E0
0677FF26 0877FF26 FC5EC4FE 5689FC46 890E5688 0C46882F E88DF388 05750846 F.u.|µ.Š/.F..V..F=.V±á^=&.w.&.w. 000100
0004C800 0ACAC91F 00E8C028 04E88E02 880574C0 080000FF FF9A0676 FF0876FF .v..v.......ât.|..Š.+âŠ..èò..à.. 000120
35E880F3 88057401 0E7E830B 74000E7E 830C7412 46081046 88D88E0A D4881E00 ..|â..Ä.F..F.t..-..t..-..t.|µ.Š5 000140
0876FF0A 76FF0C76 FF0677FF 260877FF 26FC5EC4 FE5689FC 46891256 88104688 .F..V..F=.V±á^=&.w.&.w..v..v..v. 000160
881E0000 04C8000E CAC91F00 E8C02804 E88E0288 0574C00B 0000FFFF 9A0676FF .v.......ât.|..Š.+âŠ..èò..à....| 000180
10468835 E88DF388 0574010E 7E830874 000E7E83 0C741246 08104688 D88E0833 3..Ä.F..F.t..-..t..-..t.|µ.Š5.F. 0001A0
0676FF08 76FF0A76 FF0C76FF 0677FF26 0877FF26 FC5EC4FE 5689FC46 89125688 .V..F=.V±á^=&.w.&.w..v..v..v..v. 0001C0
8E089088 1E000004 C8000ECA C91F00E8 C02804E8 8E028805 74C00800 00FFFF9A ......ât.|..Š.+âŠ..èò..à....|... 0001E0

Dump of file SATURN:[PCCOMMON.DUMP.DLL]BRDNOPL.TMP;1 on 18-APR-1990 10:37:32.99
File ID (520,34,0)   End of file block 272 / Allocated 272

Virtual block number 56 (00000038), 512 (0200) bytes

16568814 46883BEB 8DF38805 7401127E 83087400 127E830C 74164608 14468808 Ä.F..F.t..-..t..-..t.|µ.Š;.F..V. 000000
0876FF0A 76FF0C76 FF0E76FF 1076FF06 77FF2608 77FF26FC 5EC4FE56 89FC4689 .F=.V±á^=&.w.&.w..v..v..v..v..v. 000020
881E0000 04C80012 CAC91F00 E8C02804 E88E0288 0574C008 0000FFFF 9A0676FF .v.......ât.|..Š.+âŠ..èò..à....| 000040
14468838 E88DF388 05740112 7E830874 00127E83 0C741646 08144688 D88E08ED Ú..Ä.F..F.t..-..t..-..t.|µ.Š;.F. 000060
0A76FF0C 76FF0E76 FF1076FF 0677FF26 0877FF26 FC5EC4FE 5689FC46 89165688 .V..F=.V±á^=&.w.&.w..v..v..v..v. 000080
0004C800 12CAC91F 00E8C02B 04E88E02 880574C0 080000FF FF9A0676 FF0876FF .v..v.......ât.|..Š.+âŠ..èò..à.. 0000A0
880C4688 30E880F3 88057508 46080646 8808740E 46080C46 88D88E0C 50881E00 ..|P..Ä.F..F.t..F..F.u.|µ.Š=.F.. 0000C0
76FF0677 FF260877 FF26FC5E C400010A 46C7057F 000A7E83 FE5689FC 46890E56 V..F=.V±.-....úF...á^=&.w.&.w..v 0000E0
04C8000A CAC91F00 E8C02804 E88E0288 0574C008 0000FFFF 9A0676FF 0876FF0A ..v..v.......ât.|..Š.+âŠ..èò..à. 000100
0A468808 75010E7E 83067400 0E7E8314 74124608 10468808 8E0CB388 1E560000 ..V.|*..Ä.F..F.t..-..t..-..u..F. 000120
26FC5EC4 02E6C10E 7688FE56 89FC4689 12568810 468845E8 8DF38805 750C4608 .F.u.|µ.ŠE.F..V..F=.V±.v.èl.á^=& 000140
5EC4E6D1 0E768812 74084608 06468802 57892607 89260A5E C40C5088 260A4088 .ə.&.P.á^.&..&.W..F..F.t..v.llá^ 000160
88D88E00 15881E00 0006C800 0ECAC95E 1F00E8C0 28078926 065EC412 408826FC =&.ə.á^.&..+âŠ..^èò..à....|...Ä. 000180
00053OFE 46890788 260A5EC4 3EE880F3 88057508 46080646 8808740C 46080A46 F..F.t..F..F.u.|µ.Š>á^.&...F±=.. 0001A0
75033F83 26FA5EC4 °C5689FA 46890C56 880A4688 22E80002 07C72606 5EC40A75 u.á^.&ú...Š".F..V..F*.V=á^*&.?.u 0001C0
0088881E 5600001E ᒪ80008CA C91F00E8 C0280789 26065EC4 00018803 E8C02804 .+âŠ.|..á^.&..+âŠ..èò..à...V.|.. 0001E0

Dump of file SATURN:[PCCOMMON.DUMP.DLL]BRDNOPL.TMP;1 on 18-APR-1990 10:37:32.99
File ID (520,34,0)   End of file block 272 / Allocated 272

Virtual block number 57 (00000039), 512 (0200) bytes

5689F246 89045788 26024788 26065EC4 0168E98D F3880675 08460806 46880886E .Ä.F..F.u.|µ.Õh.á^.&.G.&.W..F·.V 000000
E2468001 6A0677FF 260877FF 2649740C 46080A46 88FC5689 FA4689C2 8CC388F4 ¶.û.ô.F*.V=.F..F.tl&.w.&.w.j..Fã 000020
FF3277FF 26065EC4 5016E246 800A76FF 0C76FF0E 76FF1076 FF00000C F89A5016 .P.½....v..v..v..v..Fã.Pá^.&.w2. 000040
00FE46C7 14C48302 6A00009A 50000488 03E80003 88057503 3F8326FA 76FFFC76 v=.v*&.?.u.|..Š.|..P...j..á.ûF±. 000060
FF00740C 4008260A 40882606 5EC402E6 C1FE7688 227F01FE 7E83FE46 FF03E800 .Š..F±.-±..".v±èl.á^.&.ə.&.ə.t.. 000080
8DFA76FF FC76FF14 77FF2616 77FF26F2 5EC405E8 F517E80E FE76FFFA 76FFFC76 v=.v*.v±.Ò.%Šlá^·&.w.&.w..v=.v*. 0000A0
1477FF26 1677FF26 F25EC418 74FFE47E 830675FF E27E830E D8091E9A 5016E246 Fã.P...Ü..-ã.u..-õ.t.á^·&.w.&.w. 0000C0
74C00800 00FFFF9A 0677FF26 0877FF26 065EC404 9005D09A 006AE276 FFE476FF .vô.vãj..Å...á^.&.w.&.w.......ât 0000E0
77FF2606 5EC40F1D C?C29A00 6A006A26 77FF2628 77FF2606 5EC472E8 8E028805 .|..Šrá^.&.w(&.w&j.j..ô...á^.&.w 000100
DAE8020E 05A49AF6 76FFF876 FF0D75C0 080F3E0A 589A5016 F6468D26 77FF2628 (&.w&.F-.P.X.>..âu..v½.v-.Ê...ŠÖ 000120
0677FF26 F25EC41F E630F288 0574C008 0E870068 9A2677FF 262877FF 26065EC4 á^.&.w(&.w&.h.ñ..ât.|·.Š.á^·&.w. 000140
000004C8 C8C95E1F 00E8C028 04E88DF2 880574C0 08000000 A39A0676 FF0876FF .v..v..Ê....ât.|·.Š.+âŠ..^èüà... 000160
2877FF26 065EC445 74000A7E 8362E88D F3880575 08460806 46880886E 0DEE881E .|Ÿ..Ä.F..F.u.|µ.Šb.-..tEá^.&.w( 000180
0A589A50 16FC4680 2677FF26 2877FF26 065EC40F 8009C29A 006A006A 2677FF26 &.w&j.j..ô.¯.á^.&.w(&.w&.F=.P.X. 0001A0
006ACFE8 0CC4830F 2C09CF9A FC76FFFE 76FF006A 006A006A 006A1875 C0080F08 ...âu.j.j.j.j..v±.v=.ü.,..á.Šüj. 0001C0
72881E56 000008C8 C8C91F00 E80CC483 FE07E80E 0676FF08 76FF006A 006A006A j.j.j..v..v..Ò.±.á.Š..èüà...V.|r 0001E0
```

Dump of file SATURN:[PCCOMMON.DUMP.DLL]BRDNOPL.TMP;1 on 18-APR-1990 10:37:32.99
File ID (520,34,0)   End of file block 272 / Allocated 272

Virtual block number 58 (0000003A), 512 (0200) bytes

```
26065EC4 0091E9C0 28057E01 0E7E8306 7C000E7E 830C7408 46080646 88D88E0F ..Ä.F..F.t..~..|..~..~.+àÕ..á^.& 000000
8300FE5E 8301FC6E 83087500 107E8300 0006919A 5016FC46 8D0677FF 260877FF .w.&.w..F=.P......~..u..n*..^±.. 000020
08FA5689 F8468€JC 5618OA46 28FE5688 FC46880C E80C5688 0A468808 75000E7E -..u..F..V.Š..F•.V±+F..V..F½.Vª. 000040
88FC4688 2CE833E8 C0280474 0C400826 0A408826 065EC402 E6C10E76 881975C2 ðu..v.è|.á^.&.ə.&.ə.t.+áŠ3Š,.F=. 000060
08260A40 8826065E C402E6C1 DEF7F618 010E7E83 1C75FA56 392175F8 4639FE56 V±9F¥u|9Vªu..~...-¥ßè|.á^.&.ə.&. 000080
06468808 8E0FEFB8 1E565700 0014C8C8 C95E1F00 E80001B8 05E8C028 04740C40 ə.t.+áŠ.|..Š..^èùà...WV.¡ÿ..Ä.F. 0000A0
16F0468D 016A0677 FF260877 FF26EC5E C4EE5689 EC46890A 56880846 880000E9 Õ¦..F..V..F&.VŸá^Š&.w.&.w.j..FÞ. 0000C0
F0768D16 7F8D1A75 00387F83 26EC5EC4 00CAE98E 02880674 C0080000 0E339A50 P.3....át.¡..õò.á^Š&..8.u.....vÞ 0000E0
8D505200 1605EE56 88EC4688 18E80001 3847C726 EC5EC41F A5F20008 891F161E ...¿..·E.á^Š&úG8..Š..F&.VŸ...RP. 000100
FF26EC5E C4EE5689 EC46890A 56880846 880087E9 08C483FF FF0CFE9A 5016F046 FÞ.P.±....á.Õ...F..V..F&.VŸá^Š&. 000120
8326EC5E C45FE88E 02880574 C0080000 FFFF9A50 16F0468D 016A0677 FF260877 w.&.w.j..FÞ.P......át.¡..Š á^Š&. 000140
8818E800 013047C7 26EC5EC4 1FA5F200 08891F16 1EF0768D 147F8D1A 7500307F .0.u.....vÞ...¿..·E.á^Š&úGÕ..Š.. 000160
16E81CE8 8E03881D E808C483 11170CFE 9A5016F0 468D5052 001405EE 5688EC46 F&.VŸ...RP.FÞ.P.±....á.Š.¡..Š.Š. 000180
C8CBC95F 5E1F00E8 C028E3E8 FF78E903 75000230 FF17E903 7F000130 F57CC008 .á|¾=....Õ..=..u.Õ(.ŠD+áŠ..^_èùà 0001A0
E8F45689 F246894A 5788264B 47882606 5EC40002 F646C7D8 8E10A988 1E00001A ....|`..ÀúF-..á^.&.GH&.WJ.F·¯V¶Š 0001C0
FF008DE9 0375C008 F64EFFF6 4688F456 89F24689 4E578826 4C478826 065EC411 .á^.&.GL&.WN.F·.V¶.F-.N-.àu.Õ§.. 0001E0
```

Dump of file SATURN:[PCCOMMON.DUMP.DLL]BRDNOPL.TMP;1 on 18-APR-1990 10:37:32.99
File ID (520,34,0)   End of file block 272 / Allocated 272

Virtual block number 59 (0000003B), 512 (0200) bytes

```
28C2E802 7301EA7E 83067C0A 7F00EC7E 83124900 F09A5016 EA468DF2 76FFF476 v¶.v·.Fõ.P.Þ.I..-š...|..-õ.±.Šó+ 000000
4639057C 7D7FF056 39EC5688 EA468800 F0568301 EE468308 E8EE4689 F04689C0 á.FÞ.FŸŠ..FŸ..VÞ..Fõ.VŠ9VÞ.)|.9F 000020
8826F85E C40F98C* 689A5016 F8468D00 6AEE76FF F076FFF2 76FFF476 FF7673EE Ÿsv.v¶.v·.vÞ.vŸj..F½.P.k...á^½&. 000040
C0280475 00347F83 26E65EC4 E85689E6 46890257 88260788 26F85EC4 42E80647 G.ŠBá^½&..&.W..F|.VÒá^|&..4.u.+á 000060
C0280475 002E7F83 26FC5EC4 FE5689FC 46890257 88260788 26F85EC4 32E83FE8 Š?Š2á^½&..&.W..F•.V±á^•&....u.+á 000080
E80001B8 FF25E9FF 70E900E8 D0740002 30857E00 01300C7C C00810E8 12E81FE8 Š.Š.Š..á|.=..~ç=..tÀŠ.Õp.Õ%.¡..Š 0000A0
0002016B 00040BD1 02030000 00011182 00020060 00040086 0203001C C8C91F00 ..èù....Ñ...'...........¦.:.k... 0000C0
02030000 0004044D 0002006E 00040EE9 020300EE 00040A88 02030000 00030257 W.......¡...Ÿ...Ô...n...M....... 0000E0
02030101 00040A58 02030180 00040C34 02030000 00080FC7 0002007D 000407C5 é...)...ú.......4.......[....... 000100
02030000 000C0E67 00020014 00030069 0203008A 000408D1 0203027F 0005003A :.......¦.......¡.......g....... 000120
0203009B 0004097B 02030022 00030F57 02030195 00040C97 02030112 00040817 ...................W...".. .(....... 000140
02030000 001411FD 000200A8 0004101D 02030127 0004058A 0203021E 0004113E >........ɒ...'.........»....... 000160
02030158 00040874 020300CC 00041002 02030000 001911B5 000200BD 00040888 ....§...ç.......@...ä...t...X... 000180
0C46080A 468808BE FFFFB81E 000004C8 00000000 00000000 0000000F 000409EA õ...Õ............à....¡...Ä.F..F. 0001A0
FFFF0000 9A0676FF 0876FF0A 76FF0C76 FF36E88D F3880575 08460806 46880874 t..F..F.u.¡µ.Šó.v..v..v..v...... 0001C0
0407C726 FC5EC4FE 5689FC46 8902578B 26078826 065EC41C E88E0888 0574C008 .át.¡..Š.á^.&..&.W..F•.V±á^•&ú.. 0001E0
```

Dump of file SATURN:[PCCOMMON.DUMP.DLL]BRDNOPL.TMP;1 on 18-APR-1990 10:37:32.99
File ID (520,34,0)   End of file block 272 / Allocated 272

Virtual block numbe: 60 (0000003C), 512 (0200) bytes

```
065EC409 7408460B 06468808 8E000688 1E560000 16C80008 CAC91F00 E8C02800 .+áŠ..èò..à...V.¡...Ä.F..F.t.á^. 000000
2606478B 26EA5EC4 EC5689EA 46890856 88064688 0007E980 F3880674 033F8326 &.?.t.¡µ.Õ■..F..V..Fõ.VŠá^õ&.G.& 000020
E80000FA 46C70001 F846C700 00FFFF9A 5016F446 8D5052FE 5689FC46 8908578B .W..F=.V±RP.F¶.P.....úF½..úFª..Š 000040
76F8463B 057F1C7C FA563800 DA830001 20F6568B F4468800 FA568301 F8468308 ..F½..Vª..F¶.V--...Õ.;Vª|...;F½v 000060
F246FF03 E80000F2 46C7C8E8 0000FFFF 9A006AF8 76FFFA76 FFFC76FF FE76FF15 ..v±.v•.vª.v½j......ŠùúF·..Š..F· 000080
88016AF0 5689EE46 890C5088 260A408B 26EA5EC4 02E6C1F2 7688517F 01F27E83 .~·..Q.v·è|.á^õ&.ə.&.P..FŸ.VÞj.. 0000A0
6AF276FF FF6A0EC4 83014003 5B9A5052 0676FF08 76FF006A 1270FF26 E6D1F276 v·¦|&.p.j..v..v.RP.[.ə..á.j..v·j 0000C0
28000407 C726EA5E C4A6E80E C483FFFF 17059AEE 76FFF076 FF0676FF 0876FF01 ..v..v..vÞ.vŸ......á.Š|á^õ&ú...+ 0000E0
E98DF388 06750846 08064688 D88E0061 881E5600 000AC800 04CAC95E 1F00E8C0 àŠ..^èò..à...V.¡■..Ä.F..F.u.¡µ.Õ 000100
00FE46C7 6DE88DF3 88057404 3F8326F6 5EC4F856 89F64689 08568806 46880087 ...F..V..F-.V½á^-&.?.t.¡µ.ŠmúF±. 000120
FA46890C 5088260A 408826F6 5EC402E6 C1FE7688 517F01FE 7E83FE46 FF03E800 .Š..F±.-±..Q.v±è|.á^-&.ə.&.P..Fª 000140
0EC48301 E60358 9A 50520676 FF0876FF 016A1270 FF26E6D1 FE768801 6AFC5689 .V•j..v±¦|&.p.j..v..v.RP.(.|..á. 000160
F65EC4A6 E80EC483 01251705 9AFA76FF FC76FF06 76FF0876 FF006AFE 76FFFF6A j..v±j..v..v..v•.vª...X..á.Š|á^- 000180
06750846 08064688 D88E0160 881E5600 0016C8C8 C95E1F00 E8C02800 0307C726 &ú...+àŠ..^èùà...V.¡'..Ä.F..F.u. 0001A0
26065EC4 02E6C1F2 76882A7F 01F27E83 F246FF03 E80000F2 46C700AD E98DF388 ¡µ.ÕÙ.úF·..Š..F·.~·..*.v·è|.á^.& 0001C0
CDE8F652 89F44289 08578826 06478826 EA5EC4EC 5689EA46 890C5088 260A4088 .ə.&.P..Fõ.VŠá^õ&.G.&.W..ß¶.R-Šè 0001E0
```

```
Dump of file SATURN:[PCCOMMON.DUMP.DLL]BRDNOPL.TMP;1 on 18-APR-1990 10:37:32.99
File ID (520,34,0)   End of file block 272 / Allocated 272

Virtual block number 61 (0000003D), 512 (0200) bytes

 89EE4689 F65288F4 428802E6 C1F27688 5F7F01F2 7E83F246 FF03EB00 00F246C7 úF...Š..F..-.....v.èl..B¶.R-.FŸ. 000000
 FC4688FE 5689FC46 89F65288 F4428802 E6C1F288 F9F70002 899940F2 4688F056 Vþ.F.ə.¿..¥*..èT..B¶.R-.F•.V±.F• 000020
 478826FC 5EC419EB 0001B805 75FE5639 0A75FC46 39F05688 EE46882B 74FE4608 .F±(.FŸ.Vþ9F•u.9V±u.¡..Š.á^•&.G 000040
 000401C8 00020005 90C8C95E 1F00EBC0 2898EB00 EBFE5689 FC468938 57882636 6&.W8.F•.V±ŠÅŠ.+åŠ..^èù.....ù... 000060
 00190204 000200A8 000400A1 0203009B 000400E0 02030000 0005002E 00020000 ............À.......À...¨....... 000080
 080E4688 D88EFFFF 881E5657 000012C8 00000000 00000000 00000000 00000000 ................à...WV.¡...Ä.F.. 0000A0
 76FF0789 26024789 26C02806 5EC400FD E98DF388 06750846 08064688 08741046 F.t..F..F.u.¡µ.Õ•.á^.+å&.G.&...v 0000C0
 F1880675 D008F656 89F44689 FE5688FC 46880000 FFFF9A50 16FC468D 0E76FF10 ..v..F•.P......F•.V±.F¶.V-.Åu.¡þ 0000E0
 74C00800 00FFFF9A 5016F846 8D366A0E 6A50F246 89064788 26F45EC4 00C8E98D .Õù.á^¶&.G..F.Pj.j6.F%.P......åt 000100
 50520024 05C28CC3 88F276FF A5F2001B B902A68E FB88F85E C400A8E9 80F28806 .¡..Õ..á^%.•ƒ!.¿...Ê.v..û.ô.$.RP 000120
 88F85EC4 73E88E07 88000001 029AF876 FFFA76FF F276FF13 74C00800 F200009A .......åt..v..v'.v%.....¡..Šsá^%. 000140
 46880857 89260647 J9260C56 880A4688 F85EC404 57892602 478926F6 5688F446 F¶.V-&.G.&.W.á^%.F..V.&.G.&.W..F 000160
 9A505200 6A016A00 6A006A14 77FF2616 77FF26F4 5EC4F056 89EE4689 FA5688F8 %.V*.FŸ.Vþá^¶&.w.&.w.j.j.j.j.RP. 000180
 4688065E C414E88E 07880000 FFFF9AF8 76FFFA76 FFF276FF 1374C008 FFFF0290 .....åt..v..v'.v%.....¡..Š.á^..F 0001A0
 D88E0008 881E0000 10C8000C CAC95F5E 1F00EBC0 28025789 26078926 F05688EE Ÿ.Vþ&..&.W.+åŠ..^_èò..à.....¡...Ä 0001C0
 478826FC 5EC4FE56 89FC4689 0A568808 468800CF E98DF388 06750A46 08084688 .F..F.u.¡µ.Õù..F.¯V..F•.V±á^•&.G 0001E0

Dump of file SATURN:[PCCOMMON.DUMP.DLL]BRDNOPL.TMP;1 on 18-APR-1990 10:37:32.99
File ID (520,34,0)   End of file block 272 / Allocated 272

Virtual block number 62 (0000003E), 512 (0200) bytes

 30E80EFC 76FFFE76 FF0676FF 1375023F 8326F45E C4F65689 F4468904 57882602 .&.W..F¶.V-á^¶&.7.u..v..v±.v•.Õ0 000000
 77FF2626 77FF26FC 5EC46674 00067E83 00012E47 C726FC5E C40096E9 06C48305 ..á.Õ..á^•&úG....~..tfá^•&.w&&.w 000020
 0800930A 589A5016 F8468D24 77FF2626 77FF26FC 5EC401AD 09C29A00 6A006A24 $j.j..ô.Ù.á^•&.w&&.w$.F%.P.X.... 000040
 5689F046 890C5788 260A4788 26FC5EC4 DAEBFFFF 04049AF8 76FFFA76 FF0D75C0 åu..v'.v%.....Šöá^•&.G.&.W..Fþ.V 000060
 FF0A76FF FFFF0165 9A006AF0 76FFF276 FF0074C0 0804C483 FFFF11AF 9A5052F2 .RP.£.....á..åt..v..vþj..e....v.. 000080
 CAC91F00 EBC02804 E88E0788 0574C008 08C483FF FF044A9A F476FFF6 76FF0876 v..v-.v¶.J....á..åt.¡..Š.+åŠ..èò 0000A0
 E98DF388 06750A46 08084688 08740E46 080C4688 D88E012C 881E0000 10C80006 ..à....¡...Ä.F..F.t..F..F.u.¡µ.Õ 0000C0
 88FA5689 F8468904 57882602 478826FC 5EC4FE56 89FC4689 0E56880C 468800C8 ù..F..V..F•.V±á^•&.G.&.W..F%.V'. 0000E0
 26F45EC4 0A750C47 08260A47 88261475 002E7F83 26F65689 F446890A 56880846 F..V..F¶.V-&....u.&.G.&.G.u.á^¶& 000100
 0676FF0C 5789260A 4789260A 56880846 88FC5EC4 0081E98E 00880674 00647F83 ..d.t.¡..Õ..á^•.F..V.&.G.&.W..v. 000120
 EB8E0088 0574C008 0EC483FF FF17059A F476FFF6 76FF0C76 FF0E76FF 026A006A j.j..v..v..v-.v¶......á..åt.¡..Š 000140
 FFF07E83 02EE091E 9A5016F0 4680C076 FF0E76FF 1477FF26 1677FF26 F85EC44C Lá^¥&.w.&.w..v..v..Fþ.P...Ÿ..-þ. 000160
 019805D0 9A006AF0 76FFF276 FF1477FF 261677FF 26F85EC4 1874FFF2 7E830675 u..-..t.á^¥&.w.&.w..v..vþj..Å... 000180
 08064688 D88E0218 881E0000 0CC8000A CAC91F00 EBC02800 013047C7 26FC5EC4 á^•&úG0..+åŠ..èò..à.....¡...Á.F.. 0001A0
 5788260A 478826FC 5EC4FE56 89FC4689 08568806 46880083 E98DF388 06750846 F.u.¡µ.Õ°..F..V..F•.V±á^•&.G.&.W 0001C0
 FF0676FF 0876FF02 6A0E77FF 26016A00 8CE98E00 88067500 08FA5689 F846890C ..F%.V'.Åu.¡..Õ..j.&.w.j..v..v.. 0001E0

Dump of file SATURN:[PCCOMMON.DUMP.DLL]BRDNOPL.TMP;1 on 18-APR-1990 10:37:32.99
File ID (520,34,0)   End of file block 272 / Allocated 272

Virtual block number 63 (0000003F), 512 (0200) bytes

 77FF2602 5FC426FC 5EC467E8 8E018805 74C0080E C48302A3 03589AF8 76FFFA76 v'.v%.[.Ê..á..åt.¡..Šgá^•&á_.&.w 000000
 E88E0788 0574C008 02CA0290 9A0676FF 0876FF00 6A016A00 6A006A14 77FF2616 .&.w.j.j.j.j..v..v....ò..åt.¡..Š 000020
 26F85EC4 00010094 87C726F4 5EC4F656 89F44689 08578826 06478826 F85EC43C <á^¥&.G.&.W..F¶.V-á^¶&ú.....á^¥& 000040
 CAC91F00 E80A4789 260C4789 26C028FC 5EC40001 3047C726 FC5EC400 016647C7 úGf..á^•&úG0..á^•+å&.G.&.G.Š..èò 000060
 88064688 0A5EC415 E88DF388 05750C46 080A4688 D88E0308 881E0000 00C80004 ..à....¡...Ä.F..F.u.¡µ.Š.á^..F.. 000080
 0A468808 8E030888 1E000000 C80008CA C91F00EB C0281257 89261047 89260856 V.&.G.&.W.+åŠ..èò..à.....¡Á..Ä.F. 0000A0
 065EC412 57882610 4788260A 5EC419EB 8DF38805 75084608 06468808 740C4608 .F.t..F..F.u.¡µ.Š.á^.&.G.&.W.á^. 0000C0
 0C46080A 4688088E 0409881E 000000C8 0008CAC9 1F00EBC0 28025789 26078926 &..&.W.+åŠ..èò..à.....¡...Ä.F..F. 0000E0
 08578926 06478926 08568806 46880A5E C415E88D F3880575 08460806 46880874 t..F..F.u.¡µ.Š.á^..F..V.&.G.&.W. 000100
 46080646 8808740C 46080A46 88D88E04 46881E00 0000C800 08CAC91F 00EBC028 +åŠ..èò..à.....¡F..Ä.F..F.t..F..F 000120
 EBC02802 57892607 8926065E C4085788 26064788 260A5EC4 19E88DF3 88057508 .u.¡µ.Š.á^.&.G.&.W.á^.&..&.W.+åŠ 000140
 05750846 08064688 08740E46 080C4688 D88E047F 881E0000 04C80008 CAC91F00 ..èò..à.....¡...Ä.F..F.t..F..F.u. 000160
 26FC5EC4 00010A46 C7057D00 0A7E83FE 5689FC46 890E5688 0C468830 E88DF388 ¡µ.Š•.F..V..F•.V±.~..}.úF...á^•& 000180
 C02804EB 8E048805 74C00800 00FFFF9A 0676FF08 76FF0A76 FF0677FF 260877FF .w.&.w..v..v..v.......åt.¡..Š.+å 0001A0
 750C4608 0A468808 74104608 0E468808 8E048C88 1E000004 C8000ACA C91F00EB Š..èò..à.....¡¥..Ä.F..F.t..F..F.u 0001C0
 0A5EC40C 5788260A 478826FC 5EC4FE56 89FC4689 1056880E 46883AE8 8DF38805 .¡µ.Š:.F..V..F•.V±ó^•&.G.&.W.á^. 0001E0
```

```
Dump of file SATURN:[PCCOMMON.DUMP.DLL]BRDNOPL.TMP;1 on 18-APR-1990 10:37:32.99
File ID (520,34,0)   End of file block 272 / Allocated 272

Virtual block number 64 (00000040), 512 (0200) bytes

 00EBC02B 07892606 5EC40E47 8B26FC5E C40D7408 46080646 8B025789 26078926 &..&.W..F..F.t.á^=&.G.á^.&..+áŠ. 000000
 065EC401 11E980F3 8B067508 46080646 8BD88E05 1D8B1E00 001CC800 0CCAC91F .èò..à....¡...Ä.F..F.u.¡µ.Õ..á^. 000020
 3C740C46 080A4E38 F65689F4 4689C28C C388FA56 89F84689 04578826 02478826 &.G.&.W..F½.Vª.ú.ô.F¶.V-.F..F.t< 000040
 0A76FF0C 76FF0E76 FF1076FF 00000501 9A5016E4 4680016A 0677FF26 0877FF26 &.w.&.w.j..Fð.P......v..v..v..v. 000060
 26065EC4 14C48301 FB00009A 056AF476 FFF676FF 2C77FF26 065EC450 16E4468D .Fð.Pá^.&.w,.v-.v¶j....«..á.á^.& 000080
 5016FC46 8D2477FF 262677FF 26065EC4 061309C2 9A006A00 6A2477FF 262677FF .w&&.w$j.j..ò...á^.&.w&&.w$.F•.P 0000A0
 FCD2EB0E F476FFF6 76FFDAEB 01BC05A4 9AFC76FF FE76FF00 75C00B03 860A589A .X....àu..v±.v•.Ê.¥.Šö.v-.v¶.Ò0= 0000C0
 75FFE47E 83066D09 1E9A5016 E4468DF4 76FFF676 FF1477FF 261677FF 26F85EC4 á^½&.w.&.w..v-.v¶.Fð.P...m..-ð.u 0000E0
 C405FE05 D09A006A E476FFE6 76FF1477 FF261677 FF26F85E C41874FF E67E8306 ..-Ì.t.á^½&.w.&.w..vÌ.vòj..Ä.±.á 000100
 0000A39A 0676FF08 76FF0677 FF26F85E C4064900 689A2477 FF262677 FF26065E ^.&.w&&.w$.h.I.á^½&.w..v..v..È.. 000120
 46080646 8BD88E05 7B8B1E00 0004C8CB C91F00EB C02B04EB 8DF28805 74C00800 ..Ât.¡..Š.+áŠ..èuà....¡(..Ä.F..F 000140
 09C29A00 6A006A24 77FF2626 77FF2606 5EC44574 000A7E83 62EB80F3 8B057508 .u.¡µ.Šb.-..tEá^.&.w&&.w$j.j..ò. 000160
 6A006A00 6A1875C0 08067D0A 589A5016 FC468D24 77FF2626 77FF2606 5EC406E5 Ì.á^.&.w&&.w$.F•.P.X.)..àu.j.j.j 000180
 76FF0876 FF006A00 6A006A00 6ACFE80C C4830622 09CF9AFC 76FFFE76 FF006A00 .j..v±.v•.ü.".á.Šüj.j.j.j..v..v 0001A0
 00000004 03580002 00000003 01EA0002 000B90CB C91F00EB 0CC483FE 60E80E06 ..Ò'±.á.Š..èù.....õ.......X..... 0001C0
 00140003 00690203 027F0005 003A0203 00000008 06FC0002 00000005 01D60002 ..•.......•.......:.......Ì..... 0001E0

Dump of file SATURN:[PCCOMMON.DUMP.DLL]BRDNOPL.TMP;1 on 18-APR-1990 10:37:32.99
File ID (520,34,0)   End of file block 272 / Allocated 272

Virtual block number 65 (00000041), 512 (0200) bytes

 00000014 06D00002 021E0004 05C00203 00220003 06800203 0000000C 05E70002 ..Ò..........."...à.......Å..... 000000
 080E4688 D88EFFFF 881E5657 000032C8 00000000 00000000 00000019 06A70002 ..Ì..............à2..WV.¡...Ä.F.. 000020
 0E76FF10 76FF0303 E980F388 06750846 08064688 08740C46 080A4688 10741046 F.t..F..F.t..F..F.u.¡µ.Ò&..v..v. 000040
 03ADE980 F1880675 D0080E56 890C4689 FA5688F8 46880000 FFFF9A50 16F8468D .F½.P......F½.Vª.FÉ.V8.Åu.¡Þ.ÕÜ. 000060
 8DF28806 74C00800 00FFFF9A 5016FC46 8D3C6A0E 6A500A46 89064788 26DC5EC4 á^É&.G..FÖPj.j<.F=.P......át.¡·. 000080
 DA8E1E07 16F088E8 7E400C56 880A4688 A5F2001E 8902DC8E F888FC5E C4038AE9 Õ..á^=.«/É.¿...É.F..V..-Ò.Þ....Ö 0000A0
 5EC40856 8C064689 E8468DE6 5689E446 89005605 DE5688DC 46881FA5 F[illegible]0889 ¿...É..FÉ.V8.V..Fð.VÌ.FÒ.F•.VÄá^ 0000C0
 02E80001 8B0575D0 0800F201 309A37FF 260277FF 26065EC4 37FF2602 77F[illegible]5E4 Ò&.w.&.7á^•&.w.&.7.0....Åu.¡..Š. 0000E0
 9AD65EC4 37FF2602 77FF26E4 5EC440E8 02578826 07882606 5EC40C74 C00B[illegible]2B +á.ât.á^•&..&.W.ŠMá^Ò&.w.&.7á^•. 000100
 9ADC8808 EC830112 06999A28 161E8001 0806C79A 00FF02C3 9AE45EC4 00FA02C3 ú.•.á^ð.ú....ú......(......&..É. 000120
 C4015200 FC9A5052 012D04A6 9A012602 569AD888 08C48301 2107BE9A 011703EF ý..../.Ì..á..Ä.V.&..Ì.-.RP.•.R.á 000140
 9A0477FF 260677FF 26065EC4 0477FF26 0677FF26 E45EC402 57892607 8926065E ^•&..&.W.á^Ò&.w.&.w.á^•&.w.&.w.. 000160
 54E80657 88260447 8826065E C40074C0 08C02B02 E80001B8 0575D008 01790130 0.y..Åu.¡..$.+à.ât.á^•&.G.&.W.ŠT 000180
 9A28161E 8D019206 C79A0189 02C39A04 5F8DE45E C4018402 C39A045F 8DD65EC4 á^•._..ù...á^ð._..ù....ú......(. 0001A0
 04A69A01 8002569A D88808C4 8301AB07 BE9A01A1 03EF9ADC 8808EC83 019C0699 ....$..É.y.A..7...á..Ä.V.¯..Ì. 0001C0
 8D065789 26044789 26065EC4 01EF00FC 9A0477FF 260677FF 26E45EC4 505201C2 ó.RPá^Ò&.w.&.w..=.ý.á^•&.G.&.W.. 0001E0

Dump of file SATURN:[PCCOMMON.DUMP.DLL]BRDNOPL.TMP;1 on 18-APR-1990 10:37:32.99
File ID (520,34,0)   End of file block 272 / Allocated 272

Virtual block number 66 (00000042), 512 (0200) bytes

 1C01309A 37FF2602 77FF2606 5EC437FF 260277FF 26E45EC4 D8568CD6 4689F046 FÞ.F•.VÄá^Ò&.w.&.7á^•&.w.&.7.0.. 000000
 26E45EC4 4DEB0257 88260788 26065EC4 0C74C00B C02B02EB 0001B805 75D00802 ..Åu.¡..Š.+à.ât.á^•&..&.W.ŠMá^Ò& 000020
 9A28161E 8D023206 C79A0229 02C39AE4 5EC40224 02C39AD6 5EC437FF 260277FF .w.&.7á^•.ù.$.á^ð.ú.)..ú.2....(. 000040
 04A69A02 5002569A D88808C4 83024807 BE9A0241 03EF9ADC 8808EC83 023C0699 ..<..&..É.ý.A../.K..á..Ä.V.P..Ì. 000060
 5EC40477 FF260677 FF26E45E C4025789 26078926 065EC402 7C00FC9A 50520257 W.RP.=.|.á^•&..&.W.á^Ò&.w.&.w.á^ 000080
 065EC400 74C008C0 2B02EB00 01880575 000802A3 01309A04 77FF2606 77FF2606 •&.w.&.w..0.È..Åu.¡..Š.+à.ât.á^• 0000A0
 02B302C3 9A045F8D E45EC402 AE02C39A 045F8D06 5EC454E8 06578826 04478826 &.G.&.W.ŠTá^•._..ù.Û.á^ð._..ú.°. 0000C0
 08C48302 D507BE9A 02CB03EF 9ADC8808 EC8302C6 06999A28 161E8002 BC06C79A .ú.¥....(...ó..$..É.ý.ù..7.Ì..á. 0000E0
 5EC4FFFF 00FC9A04 77FF2606 77FF26E4 5EC45052 02EC04A6 9A02DA02 569AD888 .Ä.V.Ö..Ì.&.RPá^Ò&.w.&.w..=...á^ 000100
 5688E846 882476E8 4639057F 2B7CEA56 39F25688 F0468806 57892604 478926D6 •&.G.&.W..FÞ.V.9Vö|+..9FÒv$.FÒ.V 000120
 88F25689 F0468904 56880246 88EA5689 E84689F2 5688F046 88045689 D24689EA ð.F•.Vå.FÞ.V..FÒ.Vð.F•.Vå.FÞ.V.. 000140
 F4468800 5689CE46 89EE5688 EC468824 76EC4639 057F2B7C EE5639F6 5688F446 F¶.V-9VÝ|+..9Fšv$.F&.VÝ.Fo.VÅ.F¶ 000160
 89260E56 880C4688 FC5EC4F6 5689F446 89005688 CE4688EE 5689EC46 89F65688 .V-.F&.VÝ.Fo.VÅ.F¶.V-á^•.FÉ.V8&. 000180
 76800C7F 8DFC5EC4 1FA5F200 08891F16 1EE8768D 1C7F8DFC 5EC40457 89260247 G.&.W.á^•....vÒ...¿...É.á^=....v 0001A0
 77FF2616 77FF260C 5EC4E256 89E04689 FE5688FC 46881FA5 F2000889 1F161EE8 Ò...¿...É..F•.V±.FÅ.Vãá^É&.w.&.w 0001C0
 FFFF9AFC 76FFFE76 FFDA76FF 1374C00B FFFF0290 9A505200 6A016A00 6A006A14 .j.j.j.j.RP......át..vÖ.v±.v•... 0001E0
```

Dump of file SATURN:[PCCOMMON.DUMP.DLL]BRDNOPL.TMP;1 on 18-APR-1990 10:37:32.99
File ID (520,34,0)   End of file block 272 / Allocated 272

Virtual block number 67 (00000043), 512 (0200) bytes

88E04688 065EC400 013447C7 26FC5EC4 00013047 C726FC5E C426EB8E 0788 100 ..|..$&á^=&úG0..á^=&úG4..á^..FÅ. 000000
4688088E 0008881E 000008C8 000CCAC9 5F5E1F00 E8C02B02 57892607 8926E.56 Vã&..&.W.+åS..^ èò..à....|...Å.F 000020
88260247 8826FC5E C4FE5689 FC468908 56880646 8867E88D F3880575 08460806 ..F.u.|µ.$g.F..V..F=.V±á^=&.G.&. 000040
0EFC76FF FE76FF00 6A006A00 6A006A17 75023F83 26F85EC4 FA5689F8 46890457 W..F%.V°á^%&.?.u.j.j.j.j..v±.v=. 000060
0574C008 08C483FF FF044A9A F876FFFA 76FF0676 FF0876FF 2AE80CC4 83057CE8 Ò|..á.$*.v..v..v°.v%.J....á..àt. 000080
8E040A88 1E000012 C80004CA C91F00EB C0280001 3247C726 FC5EC400 E88E0788 |..S.á^=&úG2..+åS..èò..à....|... 0000A0
0A7E8306 74084608 0646880E 7F070A7E 83147C00 0A7E831A 740E4608 0C4688D8 Å.F..F.t..~..|..~.....F..F.t..~. 0000C0
26077500 327F8326 FC5EC4FE 5689FC46 890E5688 0C468800 E6E98DF3 88067506 .u.|µ.Õ|..F..V..F=.V±á^=&..2.u.& 0000E0
76FF0876 FF5016F8 46805016 F4468050 16F24680 00C3E98E 00880674 000A7F83 ....t.|..Õù..F·.P.F¶.P.F%.P.v..v 000100
76FFFA76 FF0094E9 8E008806 7400F27E 830675C0 0812C483 05A2E80E 0A76FF06 ..v..ÒÅ..á..àu..~·.t.|..Õ...v°.v 000120
F45EC472 E88E07B8 0574C008 038E0290 9A0C76FF 0E76FF00 6A016A00 6A006AF8 %j.j.j.j..v..v..../..àt.|..$ró^¶ 000140
06478926 08568806 4688FC5E C40A4789 260A4688 FC5EC400 02578326 01078326 &...&.W..á^=.F.&.G.á^=.F..V.&.G. 000160
1E9A5016 EE46800C 76FF0E76 FF1477FF 261677FF 26025FC4 26FC5EC4 08578926 &.W.á^=&á_.&.w.&.w..v..v..FŸ.P.. 000180
76FF1477 FF261677 FF26025F C426FC5E C41C74FF F07E8306 75FFEE7E 83059909 ....~Ÿ.u..~Þ.t.á^=&á_.&.w.&.w..v 0001A0
4688D88E 0480881E 000010C8 000ACAC9 1F00E8C0 28052205 D09A006A EE76FFF0 Þ.vŸj..Å.".+åS..èò..Ã....|...Å.F 0001C0
000A7F83 26FC5EC4 FE5689FC 46890856 88064688 00CEE98D F3880675 08460806 ..F.u.|µ.Õò..F..V..F=.V±á^=&.... 0001E0

Dump of file SATURN:[PCCOMMON.DUMP.DLL]BRDNOPL.TMP;1 on 18-APR-1990 10:37:32.99
File ID (520,34,0)   End of file block 272 / Allocated 272

Virtual block number 68 (00000044), 512 (0200) bytes

77FF2606 77FF2608 77FF2650 16F8468D 5016F046 8D006A00 6A0083E9 C0280575 u.+åÕ°.j.j..FÞ.P.F%.P&.w.&.w.&.w 000000
7E830630 091E9A50 16F4468D 0676FF08 76FFF876 FFFA76FF 12C48304 A5E80E0A ..ÕE..á..v°.v%.v..v..F¶.P...0..~ 000020
05D09A00 6AF476FF F676FFF8 76FFFA76 FF68EB8E 01880575 FFF67E83 0875FFF4 ¶.u..~~.u.|..Sk.v°.v%.v~.v¶j..Å. 000040
FF26025F C426FC5E C400025F 8326012F 8326F05E C44FEB8E 07880574 C0080667 g..àt.|..$Oá^Þ&./.&._..á^=&á_.&. 000060
8E078805 74C00805 7102909A 0676FF08 76FF006A 016A006A 006A1477 FF261677 w.&.w.j.j.j.j..v..v....q..àt.|.. 000080
C80004CA C91F00EB 06478926 08478926 C028FC5E C400000A 47C726FC 5EC418E8 S.á^=&úG...á^=+å&.G.&.G.S..èò..à 0000A0
26085688 0646880A 5EC415E8 8DF38805 750C4608 0A4688D8 8E05AA88 1E000000 ....|`..Å.F..F.u.|µ.S.á^..F..V.& 0000C0
0C46080A 4688D88E 0695881E 000000C8 0008CAC9 1F00E8C0 282E5789 262C4789 .G,&.W.+åS..èò..à....|...Å.F..F. 0000E0
07892606 5EC42E57 88262C47 88260A5E C419E88D F3880575 08460806 46880874 t..F..F.u.|µ.S.á^.&.G,&.W.á^.&.. 000100
740C4608 0A4688D8 8E06C688 1E565700 001CC800 08CAC91F 00E8C028 02578926 &.W.+åS..èò..à...WV.|ó..Ã.F..F.t 000120
56880646 88FE5689 FC46890C 56880A46 880121E9 8DF38806 75084608 06468808 ..F..F.u.|µ.Õ|..F..V..F=.V±.F..V 000140
4639057F 287CEE56 39F65688 F44681F A5F20008 890A8E1E 0716F088 EC7E8D08 ..~$.Þ....Õ¿...É..F¶.V-9VŸ|+..9F 000160
5688E846 88EE5689 EC4689F6 5688F446 88EA5689 E84689EE 5688EC46 882476EC åv$.F$.VŸ.FÕ.VÕ.F¶.V-.F$.VŸ.FÕ.V 000180
89F25688 F0468824 76F04639 057F287C F25639FA 5688F846 88F65689 F44689EA õ.F¶.V-.F%.V°9V·|+..9FÞv$.FÞ.V·. 0001A0
FC5EC4FA 5689F846 89E65688 E44688F2 5689F046 89FA5688 F84688E6 5689E446 FÕ.V|.F%.V°.FÞ.V·.FÕ.V|.F%.V°á^= 0001C0
26FC5EC4 1FA5F200 0889DA8E 1EF0881C 7F8D000C 05C28CC3 881E7500 367F8326 &..6.u..Ù.ô.......Þ..Õ¿..·E.á^=& 0001E0

Dump of file SATURN:[PCCOMMON.DUMP.DLL]BRDNOPL.TMP;1 on 18-APR-1990 10:37:32.99
File ID (520,34,0)   End of file block 272 / Allocated 272

Virtual block number 69 (00000045), 512 (0200) bytes

F65688F4 46883A75 0E573926 40750C47 3926EE56 88EC4688 FC5EC400 013647C7 úG6..á^=.F$.VŸ&9G.u&9W.u:.F¶.V- 000000
46881675 12573926 1C751047 3926F256 88F04688 28751657 39262E75 14473926 &9G.u.&9W.u(.FÞ.V·&9G.u.&9W.u..F 000020
0008891F 161EEC76 8D0C7F8D 1CE8C028 04751A57 39260A75 18473926 FA5688F8 %.V±&9G.u.&9W.u.+åS.....v&....¿.. 000040
05881E56 57000000 C80008CA C95F5E1F 00E8C02B 00013447 C726FC5E C41FA5F2 ·É.á^=&úG4..+åS..^_èò..à...WV.|. 000060
56880A46 88065EC4 1DE88DF3 88057508 46080646 8808740C 46080A46 88D88E07 ..Å.F..F.t..F..F.u.|µ.S.á^..F..V 000080
000008C8 0008CAC9 5F5E1F00 E8C02B1F A5F20008 890A8E1E F088F888 000C050C .....«.Þ..Õ¿..·É.+åS..^_èò..à.... 0000A0
5EC4008C E980F388 06750846 08064688 08740C46 080A4688 D88E084F 881E5657 WV.|O..Å.F..F.t..F..F.u.|µ.ÕW.á^ 0000C0
890C5688 0A468800 A1E9C028 05750647 08260447 88260F75 02470826 07882606 .&..&.G.u.&.G.&.G.u.+åÕÅ..F..V.. 0000E0
1FA5F200 0889DA8E 1EF0881C 7F8D000C 051A7500 367F8326 FC5EC4FE 5689FC46 F=.V±á^=&..6.u.........Þ..Õ¿..·É. 000100
88260788 26065EC4 FA5689F8 4689000C 05FE5688 FC468800 013647C7 26FC5EC4 á^=&úG6...F=.V±.....F%.V°á^.&..&. 000120
11260447 0126F85E C4065788 26044788 26065EC4 02571126 070126F8 5EC40257 W.á^%&..&.W.á^.&.G.&.W.á^%&.G.&. 000140
88260447 8826065E C40A5711 26084701 26F85EC4 02578826 07882606 5EC40657 W.á^.&..&.W.á^%&.G.&.W.á^.&.G.&. 000160
08CAC95F 5E1F00E8 C0280001 3447C726 FC5EC40E 5711260C 470126F8 5EC40657 W.á^%&.G.&.W.á^=&úG4..+åS..^_èò. 000180
46080646 8808740C 46080A46 88107410 46080E46 88D88E08 94881E00 0004C800 .à....|....Å.F..F.t..F..F.t..F..F 0001A0
89260A5E C40A4788 26FC5EC4 FE5689FC 46891056 880E4688 32E88DF3 88057508 .u.|µ.S2.F..V..F=.V±á^=&.G.á^.&. 0001C0
C8000CCA C91F00E8 C0280257 89260789 26065EC4 08578826 06478826 FC5EC407 .á^=&.G.&.W.á^.&..&.W.+åS..èò..à 0001E0

```
Dump of file SATURN:[PCCOMMON.DUMP.DLL]BRDNOPL.TMP;1 on 18-APR-1990 10:37:32.99
File ID (520,34,0)   End of file block 272 / Allocated 272

Virtual block number 70 (00000046), 512 (0200) bytes

 8B260247 8826065E C40080E9 8DF38806 75084608 06468808 8E0977B8 1E00000C ....¡w..Å.F..F.u.¡µ.Õ¯.á^.&.G.&. 000000
 0E76FF10 76FF2574 0C46080A 468BFE56 89FC4689 C28CC38B FA5689F8 46890457 W..F%.V*.ú.ò.F•.V±.F..F.t%.v..v. 000020
 FF14C483 04670700 9A066AFC 76FF5230 77FF2650 52000C05 C3880A76 FF0C76FF .v..v..ú...RP&.wOR.v•j....g..á.. 000040
 9A5016F4 468DFC76 FFFE76FF 1477FF26 1677FF26 F85EC4FB 68E80EFC 76FFFE76 v±.v•.Òk«á^½&.w.&.w..v±.v•.F¶.P. 000060
 76FFF676 FF1477FF 261677FF 26F85EC4 1874FFF6 7E830675 FFF47E83 0A76091E ..v..~¶.u..—.t.á^½&.w.&.w..v—.v 000080
 F2B80574 C0080000 03CE9A06 76FF0876 FF0677FF 26F85EC4 060C0500 9A006AF4 ¶j..Å...á^½&.w..v..v..ö....át.¡· 0000A0
 0A568808 46880131 E906468B D88E0905 881E0000 04C8C8C9 1F00EBC0 2804EB8D .Š.+àŠ..èúà....¡f..Ä.F.Ö1..F..V. 0000C0
 26FC5EC4 07892614 5EC4008C 878826FC 5EC40E74 16460814 468BFE56 89FC4689 .F•.V±.F..F.t.á^•&....á^.&..á^•& 0000E0
 07892600 6A05FE56 8BFC468B 105EC402 57892607 89260C5E C4685788 26664788 .Gf&.Wná^.&..&.W.á^..F•.V±.j.&.. 000100
 8B26FC5E C4007416 46081446 8BFE5689 FC46890A 56880846 8800FEE9 02578926 &.W.Õ±..F..V..F•.V±.F..F.t.á^•&. 000120
 105EC402 57892607 89260C5E C4525788 26504788 26FC5EC4 07892614 5EC46447 Gdá^.&..á^•&.GP&.WRá^.&..&.W.á^. 000140
 8BFE5689 FC46890A 56880846 880082E9 02578926 07892600 5405FE56 8BFC4688 .F•.V±.T.&..&.W.Òÿ..F..V..F•.V±. 000160
 C4285788 26264788 26FC5EC4 07892614 5EC43447 8B26FC5E C4007416 46081446 F..F.t.á^•&.G4á^.&..á^•&.G&&.W(á 000180
 468B67EB 02578926 07892600 2A05FE56 8BFC468B 105EC402 57892607 89260C5E ^.&..&.W.á^..F•.V±.*.&..&.W.Šg.F 0001A0
 C4078926 145EC42E 478826FC 5EC40074 16460814 468BFE56 89FC4689 0A568808 ..V..F•.V±.F..F.t.á^•&.G.á^.&..á 0001C0
 002805FE 568BFC46 88105EC4 02578926 0789260C 5EC42657 88262447 8826FC5E ^•&.G$&.W&á^.&..&.W.á^..F•.V±.(. 0001E0

Dump of file SATURN:[PCCOMMON.DUMP.DLL]BRDNOPL.TMP;1 on 18-APR-1990 10:37:32.99
File ID (520,34,0)   End of file block 272 / Allocated 272

Virtual block number 71 (00000047), 512 (0200) bytes

 430AF70A AA0BEBA7 FF2E93C0 03127700 04300001 2D1AEB1C EB025789 26078926 &..&.W.Š.Š.-..=..w..à...ÌŠ.¨.%.C 000000
 00020014 00030065 0203027F 00050036 02030007 CBC91F00 EBC02808 8E084308 .C...+àŠ..èú....6.......e....... 000020
 00020000 001700C5 00020000 00140A52 00020022 00030A86 02030000 000C0A2A *..........."...R.......é....... 000040
 0B06468B D88EFFFF 881E5657 000056C8 00000000 00000000 00000000 00190AA0 ................àV..WV.¡...Ä.F.. 000060
 0B12468B 16751446 0B12468B 08741046 080E468B 10740C46 080A468B 18740846 F.t..F..F.t..F..F.t..F..F.u..F.. 000080
 00F09A50 168C468D 0676FF08 76FF027F E98DF38B 000007C7 26125EC4 08741446 F.t.á^.&ú...¡µ.Õ...v..v..F¥.P.Þ. 0000A0
 260E5EC4 07892602 478926C0 280E5EC4 3673018C 7E83067C 3E7F008E 7E83000B Ù..-ƒ..>|..-¥.sбá^.+à&.G.&..á^.& 0000C0
 125EC40C 4789260E 4789260E 5EC40847 89260A47 89260E5E C4044789 26064789 .G.&.G.á^.&.G.&.G.á^.&.G.&.G.á^. 0000E0
 8C468B00 AC568301 AA468308 EBAA4689 AC4689C0 280000AE 46C70228 E9078926 &..Õ+.úFÜ..+á.F˙.F˙Š..F˙..V¯..F¥ 000100
 76FFAC76 FF0676FF 0876FF00 ABE90372 AA463908 7C0085E9 037EAC56 398E568B .V/9V¯-.Õç.|.9F˙r.Õ¨..v..v..v˙.v 000120
 89C84689 001605B2 56898046 89CE568B CC468BFF FF08689A 5016CC46 80006AAA ˙j..Fä.P.k....Fä.Vö.F¯.Vý....Fà. 000140
 07160076 8DF07E8D 407500AE 7E8308C4 8315E1E8 0E8076FF 52501600 468DCA56 Vò.FÅ.PR.v¯.ÒÅ..á..-Û.uΩ.-Þ.vÅ.. 000160
 AE46C71F A5F20008 890A8E1E F08BE07E 8DCA568B C846881F A5F20008 891F161E ...¿...É..Fà.Vò.-Å.Þ..O¿...É.úFÛ 000180
 CA76FF50 16E0468D 25E88656 89844689 005E0504 57882602 47882680 5EC40001 ..á^¯&.G.&.W..^..FÇ.VñŠ%.FÅ.P.vò 0001A0
 FF35E908 C483FFFF 0CFE9A50 1600468D 5016F046 8D08C483 01680CFE 9AC876FF .vå.±.h..á..FÞ.P.FÅ.P.±....á.Õ5. 0001C0
 02D1E001 06578826 04478826 C65689C4 46890201 E0010257 88260788 26845EC4 á^Ç&..&.W.ÌÅÌ@.Fá.Vó&.G.&.W.ÌÅÌ@ 0001E0

Dump of file SATURN:[PCCOMMON.DUMP.DLL]BRDNOPL.TMP;1 on 18-APR-1990 10:37:32.99
File ID (520,34,0)   End of file block 272 / Allocated 272

Virtual block number 72 (00000048), 512 (0200) bytes

 468B8A56 89B84689 C65613C4 4603F256 18F04628 E25688E0 468BC256 89C04689 .Fá.Vó.FÅ.Vä+FÞ.V·.Fá.Vó.F¡.Vα.F 000000
 4E88BA76 88067388 4E38057C 0D7F8A76 38127788 26104F8B 260A5EC4 E25688E0 Å.Väá^.&.O.&.w.;vα..|.;N¡s..vα.N 000020
 5613C046 03F65618 F4462BE6 5688E446 88025789 26078926 0E5EC406 1BC12888 ¡+ê.øá^.&..&.W..Fõ.V|+F¶.V-.Fá.V 000040
 38057C00 7FBA7638 16778826 144F8826 0A5EC4E6 568BE446 888A5689 884689C2 ô.F¡.Vα.Fõ.V|á^.&.O.&.w.;vα..|.; 000060
 28FA568B F8468806 57892604 4789260E 5EC4061B C128884E 888A7688 0673884E N¡s..vα.N¡+ê.øá^.&.G.&.W..F%.V*+ 000080
 7FBA563B 1A578826 18478826 0A5EC4BA 56898846 89C65613 C44603EA 561BE846 FÒ.Vó.Fá.Vó.F¡.Vαá^.&.G.&.W.;Vα. 0000A0
 880A5789 26084789 260E5EC4 EA5613E8 46038846 888A5688 0673B846 38057C00 .|.;F¡s..Vα.F¡.FÒ.Võá^.&.G.&.W.. 0000C0
 88261C47 88260A5E C48A5689 884689C2 5613C046 03EE5618 EC462BFE 568BFC46 F•.V±+Fá.VŸ.Fá.Vó.F¡.Vαá^.&.G.&. 0000E0
 4789260E 5EC4EE56 13EC4603 8846888A 56880673 88463805 7C007F8A 56381E57 W.;Vα..|.;F¡s..Vα.F¡.Fá.VŸá^.&.G 000100
 D88E0008 881E0000 10C8C8C9 5F5E1F00 EBC02800 0107C726 125EC40E 5789260C .&.W.á^.&ú...+àŠ..^_èúà....¡...Ä 000120
 5EC43373 01F87E83 067C387F 00FA7E83 035800F0 9A5016F8 46800676 FF0876FF .v..v..F%.P.Þ.[..~*¯..;|..-%.s3á^ 000140
 08478926 0A478926 125EC404 47892606 47892612 5EC40789 26024789 26C02812 .+á&.G.&..á^.&.G.&.G.á^.&.G.&.G. 000160
 8301F046 8308EBF0 4689F246 89C02807 89260E5E C40C4789 260E4789 26125EC4 á^.&.G.&.G.á^.&..+à.F·.FÞŠ..FÞ.. 000180
 76FFF276 FF0676FF 0876FF57 73F04639 057C5E7F F25639FA 568BF846 8800F256 V·..F%.V*9V·.^|.9FÞsW.v..v..v·.v 0001A0
 520A76FF 0C76FFF6 5689F446 89FE5688 FC468803 0608689A 5016FC46 8D006AF0 Þj..F•.P.k.ø..F•.V±.F¶.V-.v..v.R 0001C0
 02E80001 88057400 0092BF83 26087500 0094BF83 26F45EC4 08C48300 8DE80E50 P.Õ§..á.á^¶&.¢...u.&.¢...t.¡..Š. 0001E0
```

```
Dump of file SATURN:[PCCOMMON.DUMP.DLL]BRDNOPL.TMP;1 on 18-APR-1990 10:37:32.99
File ID (520,34,0)   End of file block 272 / Allocated 272

Virtual block number 73 (00000049), 512 (0200) bytes

 468800F2 568301FC 468308E8 F04689F2 4689C028 8FE80096 878926F4 5EC4C028 +ãã^¶&....$.+ã.F·.FÞ$..FÞ..V·..F 000000
 4680006A F076FFF2 76FF0676 FF0876FF 5073F046 39057C57 7FF25639 FA5688F8 %.V°9V·.W|.9FÞsP.v..v..v·.vÞj..F 000020
 FF1F7400 00968F83 26F45EC4 F65689F4 4689FE56 88FC4688 00500868 9A5016FC •.P.k.P..F•.V±.F¶.V-ã^¶&.¢...t.. 000040
 96E80000 009687C7 26F45EC4 0CC4830A 78E80E50 520676FF 0876FF0A 76FF0C76 v..v..v..v.RP.Òx..ã.ã^¶&ú.....$. 000060
 1F10C483 F8D4E80E 0676FF08 76FF0A76 FF0C76FF 1276FF14 76FF0E76 FF1076FF .v..v..v..v..v..v..v..v..Ôã«.ã.. 000080
 E45EC400 00E246C7 E65689E4 46890856 88064688 D88E02CC 881E0000 1EC8C8C9 èüà....¡ä..Ã.F..V..FÕ.V|úFä..ã^Õ 0000A0
 277C00FE 7E83020E 00F09A50 16FC468D 5052EA56 89E84689 40578826 3E478826 &.G>&.Wä.FÕ.VõRP.F•.P.Þ.ß..-±.|' 0000C0
 E876FFEA 76FF0A76 FF0C76FF 5016E246 8D5016EC 4680016A 1F7400FC 7E83067F ...-•.t.j..Fâ.P.Fã.P.v..v..võ.vÒ 0000E0
 83007FE8 0EE476FF E676FF0A 76FF0C76 FFE276FF 5016EC46 8012C483 FE32E80E .Ò2±.ã..F&.P.vâ.v..v..vÌ.võ.Ò... 000100
 468804C4 83FFFF00 009AE476 FFE676FF 04C48304 C90C819A E476FFE6 76FF0EC4 ã..vÌ.võ...è..ã..vÌ.võ......ã..F 000120
 47892670 478926C0 ?8E45EC4 08C48306 C8E80EE4 76FF5250 52006E05 E65688E4 Õ.VÌ.n.RPR.võ.Òü..ã.ã^Õ+ãã.Gpã.G 000140
 89267C47 8926E45E ?4764789 26784789 26E45EC4 72478926 74478926 E45EC46E nã^Õ&.Gt&.Grã^Õ&.Gx&.Gvã^Õ&.G|&. 000160
 1CC8C8C9 1F008287 89260084 878926E4 5EC47E47 89260080 878926E4 5EC47A47 Gzã^Õ&....&.G~ã^Õ&....&.....èüà. 000180
 F4468900 16050646 88F25689 F0468900 06050856 88064688 D88E0438 881E0000 ...¡Õ..Ã.F..V.....FÞ.V·.F.....F¶ 0001A0
 267A4788 26065EC4 02571126 070126F4 5EC47857 88267647 8826065E C4F65689 .V-ã^.&.Gv&.Wxã^¶&..&.W.ã^.&.Gz& 0001C0
 470126F4 5EC40080 9788267E 47882606 5EC40657 11260447 0126F45E C47C5788 .W|ã^¶&.G.&.W.ã^.&.G~&....ã^¶&.G 0001E0

Dump of file SATURN:[PCCOMMON.DUMP.DLL]BRDNOPL.TMP;1 on 18-APR-1990 10:37:32.99
File ID (520,34,0)   End of file block 272 / Allocated 272

Virtual block number 74 (0000004A), 512 (0200) bytes

 0E7E830E 5711260C 470126F4 5EC40084 97882600 82878826 065EC40A 57112608 .&.W.ã^.&....&....ã^¶&.G.&.W..-. 000000
 57882607 88260A5E C408C483 01560CFE 9A1076FF 1276FFF4 76FFF676 FF147400 .t..v-.v¶.v..v..±.V..ã.ã^.&..&.W 000020
 0A578826 08478826 F45EC4EE 5689EC46 89065788 26044788 26FE5689 FC468902 ..F•.V±&.G.&.W..Fã.VŸã^¶&.G.&.W. 000040
 FE5613FC 46030257 88260788 261573FC 4638057C 1C7FFE56 3802571B 26072826 &+.&.W.;V±..|.;F•s.&..&.W..F•.V± 000060
 1D7FEE56 3806571B 2604472B 260E5788 260C4788 26F45EC4 0A578926 08478926 &.G.&.W.ã^¶&.G.&.W.&+G.&.W.;VŸ.. 000080
 065EC40E 5789260C 478926EE 5613EC46 03065788 26044788 261673EC 4638057C |.;F&s.&.G.&.W..F&.VŸ&.G.&.W.ã^. 0000A0
 F65688F4 4688023C E9037500 0E7E83FA 5689F846 89005605 04578826 02478826 &.G.&.W..V..F%.V°.-..u.Õ<..F¶.V- 0000C0
 08068A01 309A37FF 260277FF 26E85EC4 37FF2602 77FF26F8 5EC4EA56 89E84689 .FÕ.Võã^%&.w.&.7ã^Õ&.w.&.7.0.α.. 0000E0
 77FF26F8 5EC444E8 02578826 078826E8 5EC40C74 C008C028 02E80001 88057500 Àu.¡..$.+ã.ãt.ã^Õ&..&.W.$Õã^%&.w 000100
 EF9ADC88 08EC8306 0106C79A 06C702C3 9AF85EC4 06C202C3 9AE85EC4 37FF2602 .&.7ã^Õ.ü.Õ.ã^%.ü.ü..ü.Ì..&..É.ÿ 000120
 5EC40711 00FC9A50 5206EC04 A69A06E5 02569A08 8808C483 06E0078E 9A060603 .•../.Â..ã..Ä.V.Ì..Ì.&.RP.•...ã^ 000140
 309A0477 FF260677 FF26E85E C40477FF 260677FF 26F85EC4 02578926 078926E8 Õ&..&.W.ã^%&.w.&.w.ã^Õ&.w.&.w..0 000160
 C44BE806 57882604 478826E8 5EC40074 C008C028 02E80001 88057500 08073801 .8..Àu.¡..$.+ã.ãt.ã^Õ&.G.&.W.$Kã 000180
 9ADC8808 EC830752 06C79A07 4802C39A 045F80F8 5EC40743 02C39A04 5F80E85E ^Õ._..ü.C.ã^%._..ü.H..ü.R..&..É. 0001A0
 77FF26F8 5EC45052 077804A6 9A076602 569AD888 08C48307 61078E9A 075703EF ÿ.W../.•..ã..Ã.V.f..Ì.x.RPã^%&.w 0001C0
 46890008 05F65688 F4468806 57892604 478926E8 5EC407A8 00FC9A04 77FF2606 .&.w..•.¨.ã^Õ&.G.&.W..F¶.V-....F 0001E0

Dump of file SATURN:[PCCOMMON.DUMP.DLL]BRDNOPL.TMP;1 on 18-APR-1990 10:37:32.99
File ID (520,34,0)   End of file block 272 / Allocated 272

Virtual block number 75 (0000004B), 512 (0200) bytes

 75D00807 D801309A 37FF2602 77FF26E8 5EC437FF 260277FF 26F85EC4 EA5689E8 Õ.Võã^%&.w.&.7ã^Õ&.w.&.7.0.Ã..Àu 000000
 260277FF 26F85EC4 44E80257 88260788 26E85EC4 0C74C008 C02802E8 00018805 .¡..$.+ã.ãt.ã^Õ&..&.W.$Õã^%&.w.& 000020
 F403EF9A 0C8808EC 8307EF06 C79A07E5 02C39AF8 5EC407E0 02C39AE8 5EC437FF .7ã^Õ.ü.Â.ã^%.ü.Ì..ü.ÿ..&..É.ÿ.¶ 000040
 26E85EC4 082F00FC 9A505208 0A04A69A 08030256 9AD88808 C48307FE 07CE9A07 ..ö.±..ã..Ä.V....Ì...RP.•./.ã^Õ& 000060
 5601309A 0477FF26 0677FF26 E85EC404 77FF2606 77FF26F8 5EC40257 89260789 ..&.W.ã^%&.w.&.w.ã^Õ&.w.&.w..0.V 000080
 E85EC44B E8065788 26044788 26E85EC4 0074C008 C02802E8 00018805 75000808 ..Àu.¡..$.+ã.ãt.ã^Õ&.G.&.W.$Kã^Õ 0000A0
 03EF9ADC 8808EC83 087006C7 9A086602 C39A045F 8DF85EC4 086102C3 9A045F8D ._..ü.•.ã^%._..ü.f..ü.p..&..É.ÿ. 0000C0
 260677FF 26F85EC4 50520896 04A69A08 8402569A D88808C4 83087F07 CE9A0875 u..ö....ã..Ã.V....Ì...RPã^%&.w.& 0000E0
 89E44689 F65688F4 46880250 E9065789 26044789 26E85EC4 FFFF00FC 9A0477FF .w..•...ã^Õ&.G.&.W.ÕÌ..F¶.V-.FÕ. 000100
 88057500 0808F601 309A37FF 260277FF 26E45EC4 37FF2602 77FF26F8 5EC4E656 VÌã^%&.w.&.7ã^Õ&.w.&.7.0.-..Àu.¡ 000120
 37FF2602 77FF26F8 5EC44DE8 02578826 078826E4 5EC40C74 C008C028 02E80001 ..$.+ã.ãt.ã^Õ&..&.W.$Mã^%&.w.&.7 000140
 EC830916 06999A28 1E1E8D09 0C06C79A 090302C3 9AF85EC4 08FE02C3 9AE45EC4 ã^Õ.ü.±.ã^%.ü....ú.....(......& 000160
 FC9A5052 093104A6 9A092A02 569AD888 08C48309 25078E9A 091803EF 9ADC8808 ..É.ÿ..../.X..ã..Ã.V.*..Ì.1.RP.• 000180
 260677FF 26E45EC4 0477FF26 0677FF26 F85EC402 57892607 8926E45E C4095600 .V.ã^Õ&..&.W.ã^%&.w.&.w.ã^Õ&.w.& 0001A0
 88260447 8826E45E C40074C0 08C02802 E8000188 05750008 09700130 9A04?7FF .w..0.)..Àu.¡..$.+ã.ãt.ã^Õ&.G.&. 0001C0
 80099606 C79A0980 02C39A04 5F8DF85E C4098802 C39A045F 8DE45EC4 54EBC?57 W.$Ìã^Õ._..ü...ã^%._..ü....ü.... 0001E0
```

```
Dump of file SATURN:[PCCOMMON.DUMP.DLL]BRDNOPL.TMP;1 on 18-APR-1990 10:37:32.99
File ID (520,34,0)   End of file block 272 / Allocated 272

Virtual block number 76 (0000004C), 512 (0200) bytes

 B402569A D88808C4 8309AF07 BE9A09A5 03EF9ADC 8808EC83 09A00699 9A281E1E ..(......&..É.ÿ.E../.£..á..Ä.V.Ç 000000
 26044789 26E45EC4 09F900FC 9A0477FF 260677FF 26F85EC4 505209C6 04A69A09 ..|.6.RPá^½&.w.&.w..•.'.á^ô&.G.& 000020
 26E45EC4 37FF26J2 77FF26F8 5EC4E656 89E44689 000805F6 5688F446 88065789 .W..F¶.V-....Fö.V|á^½&.w.&.7á^ô& 000040
 078826E4 5EC40C74 C008C02B 02E80001 B8057500 080A2601 309A37FF 260277FF .w.&.7.0.&..Äu.¡..§.+á.ät.á^ô&.. 000060
 0A3302C3 9AF85EC4 0A2E02C3 9AE45EC4 37FF2602 77FF26F8 5EC44DEB 02578826 &.W.$Má^½&.w.&.7á^ô.ü...á^½.ü.3. 000080
 08C4830A 5507BE9A 0A4B03EF 9ADC8808 EC830A46 06999A28 1E1E8D0A 3C06C79A .ú.<....(...F..&..É.ÿ.K../.U..á. 0000A0
 F85EC402 57892607 8926E45E C40A8600 FC9A5052 0A6104A6 9A0A5A02 569AD88B .Ä.V.Z..|.a.RP.=...á^ô&..&.W.á^½ 0000C0
 E80001B8 0575D00B 0AAD0130 9A0477FF 260677FF 26E45EC4 0477FF26 0677FF26 &.w.&.w.á^ô&.w.&.w..0.Ù..Äu.¡..$ 0000E0
 C40A8802 C39A045F 8DE45EC4 54E80657 88260447 8826E45E C40D74C0 08C02B02 .+á.ät.á^ô&.G.&.W.ŠTá^ð._..ü.¡.á 000100
 03EF9ADC 8808EC83 0AD00699 9A281E1E 8D0AC606 C79A0A8D 02C39A04 5F8DF85E ^½...ü.§..ú.6....(...Ä..&..É.ÿ. 000120
 260677FF 26F85EC4 50520AF6 04A69A0A E402569A 088808C4 830ADF07 8E9A0AD5 f..7.ö..á..Ä.V.ð..|.-.RPá^½&.w.& 000140
 5EC46875 00008ABF 8326065E C4065789 26044789 26E45EC4 068000FC 9A0477FF .w..=...á^ô&.G.&.W.á^.&.¢...uhá^ 000160
 57882608 478826F4 5EC45075 02573926 56750739 26F05EC4 02578826 078826F4 ¶&..&.W.á^Þ&9.uV&9W.uPá^¶&.G.&.W 000180
 3926F05E C4065788 26044788 26F45EC4 36750A57 39263C75 08473926 F05EC40A .á^Þ&9G.u<&9W.u6á^¶&.G.&.W.á^Þ&9 0001A0
 39260875 0C473926 F05EC40E 5788260C 478826F4 5EC41C75 06573926 22750447 G.u"&9W.u.á^¶&.G.&.W.á^Þ&9G.u.&9 0001C0
 567F8326 077F1F7C 00587F83 26065EC4 00010094 87C72606 5EC433E8 02750E57 W.u.$3á^.&ú.....á^.&..X.|...&..V 0001E0

Dump of file SATURN:[PCCOMMON.DUMP.DLL]BRDNOPL.TMP;1 on 18-APR-1990 10:37:32.99
File ID (520,34,0)   End of file block 272 / Allocated 272

Virtual block number 77 (0000004D), 512 (0200) bytes

 000034C8 C8C91F0C C48304B8 09029A53 06F076FF F276FFF4 76FFF676 FF167400 .t..v-.v¶.v..vÞ.S.Ø.E..á..èüä4.. 000000
 56880A46 8802A9E9 03750C46 080A4688 08740846 08064688 088E0534 881E5657 WV.¡4..Ä.F..F.t..F..F.u.Ö..F..V 000020
 02478826 065EC40A 568CD846 89004680 1FA5A5A5 A50A8E1E 0716F088 D07E8D0C ..~Ä.Þ....ÒEEEE..FÄ.FÄ.Vöá^.&.G. 000040
 FF260277 FF26085E C437FF26 0277FF26 F45EC4F6 5689F446 89005605 04578826 &.W..V..F¶.V-á^¶&.w.&.7á^Ä&.w.&. 000060
 E8025788 26078826 085EC40C 74C008C0 2802E800 01880575 D0080C41 01309A37 7.0.A..Äu.¡..§.+á.ät.á^Ä&..&.W.§ 000080
 0C5706C7 9A0C4E02 C39AF45E C40C4902 C39AD85E C437FF26 0277FF26 F45EC44D Má^¶&.w.&.7á^Ä.û.I.á^¶.û.N..ú.W. 0000A0
 02569AD8 8808C483 0C7007BE 9A0C6603 EF9ADC88 08EC830C 6106999A 281E1E8D ...(...a..&..É.ÿ.f../.p..á..Ä.V. 0000C0
 260677FF 26F45EC4 02578926 07892608 5EC40CA1 00FC9A50 520C7C04 A69A0C75 u..|.|.RP.=.À.á^Ä&..&.W.á^¶&.w.& 0000E0
 C008C02B 02E80001 B8057500 080CC801 309A0477 FF260677 FF26085E C40477FF .w.á^Ä&.w.&.w..0.à..Äu.¡..§.+á.á 000100
 045F8DF4 5EC40CD3 02C39A04 5F8D085E C454E806 57882604 47882608 5EC40074 t.á^Ä&.G.&.W.ŠTá^Ä._..û.&.á^¶._. 000120
 078E9A0C F003EF9A DC8808EC 830CE806 999A281E 1E8D0CE1 06C79A0C D802C39A .û.Ä..ú.Ä....(...Š.&..É.ÿ.Þ..7. 000140
 FC9A0477 FF260677 FF26F45E C4505200 1104A69A 0CFF0256 9AD88808 C4830CFA •..á..Á.V....|...RPá^¶&.w.&.w..• 000160
 08260447 88260075 02470826 07882608 5EC40657 89260447 8926085E C408C900 .è.á^Ä&.G.&.W.á^Ä&..&.G.u.&.G.&. 000180
 26025688 D04688F0 5EC4F256 89F04689 00160508 56880646 88013DE9 03750647 G.u.Ö=..F..V.....FÞ.V.á^Þ.FÄ.VØ& 0001A0
 D25688D0 4688F05E C4065711 26044701 26065688 D04688F0 5EC40257 11260701 ..&.W.á^Þ.Fá.VØ&.G.&.W.á^Þ.FÄ.VØ 0001C0
 9487C726 065EC40E 5711260C 47012606 56880446 88F05EC4 0A571126 08470126 &.G.&.W.á^Þ.Fá.VØ&.G.&.W.á^.&ú.. 0001E0

Dump of file SATURN:[PCCOMMON.DUMP.DLL]BRDNOPL.TMP;1 on 18-APR-1990 10:37:32.99
File ID (520,34,0)   End of file block 272 / Allocated 272

Virtual block number 78 (0000004E), 512 (0200) bytes

 0DEA00F0 9A5016DC 46605052 CE5689CC 46894457 88264247 8826065E C4000100 ...á^.&.GB&.WD.Fa.VöRP.FÉ.P.Þ.ö. 000000
 39057C39 7FFA5639 DE5688DC 468800FA 568301F8 468308EB F84689FA 46£.^02B +á.F•.F½Š..F½..V•..FÉ.V89V•.9|.9 000020
 FFDA76FF 0E210868 9A5016E4 4680006A F876FFFA 76FFCC76 FFCE76FF 3273.`46 F½s2.vo.va.v•.v½j..Fö.P.k.l..vÖ. 000040
 57B8263E 47882606 5EC484E8 0CC483FF FF08879A E476FFE6 76FF006A 006ADL76 vÄj.j..v|.vö......á.ŠÇá^.&.G>&.W 000060
 E0468308 EBE04689 E24689C0 280E5D00 F09A5016 FC468D50 52EE5689 EC468940 a.F&.VYRP.F=.P.Þ.].+á.Fã.FÄŠ..FÄ 000080
 E276FFEC 76FFEE76 FF2D73E0 4639057C 347FE256 39FE5688 FC468800 E2568301 ..Vã..F•.V±9Vã.4|.9FÄs-.vŸ.v&.vã 0000A0
 83FD3DE8 0EE876FF EA76FF08 76FFDA76 FF046808 689A5016 E8468000 6AE076FF .vÄj..FÖ.P.k.h..vÖ.vÄ.vö.vÖ.Ö=». 0000C0
 F09A5016 F846800A 76FF0C76 FFD88E08 84881E00 0016C8C8 C95F5E1F 89E808C4 á.Š¿.^_èüà....¡Ç..Ä.v..v..F½.P.Þ 0000E0
 C0280001 009887C7 26065EC4 00AFE903 7301F87E 83067C08 7F00FA7E 830EE800 .Ö..~•...|..~½.s.ÕÉ.á^.&ú.....+á 000100
 FC463905 7C7E7FFE 5639FA56 88F84688 00FE5683 01FC4683 08EBFC46 89FE4689 .F±.F=Š..F=..V±..F½.V•9V±.~|.9F= 000120
 EC5688EA 46880DAE 08689A50 16EA4680 006AFC76 FFFE76FF 0A76FF0C 76FF7773 sw.v..v..v±.v=j..Fõ.P.k.Û..Fõ.V& 000140
 76FF1076 FF5016F6 46805016 F2468D45 75000098 BF8326EE 5EC4F056 89EE4689 .FŸ.VÞá^Ÿ&.¢...u£.F..P.F~.P.v..v 000160
 1076FFF6 76FFF276 FFF476FF 2274C008 14C48304 0FE80E06 76FF0876 FF53520E .RS.v..v..Ö...á..át".v¶.v..v~.v. 000180
 9887C726 065EC4FF 6FE912C4 830013E8 0EEE76FF F076FF0A 76FF0C76 FF0E76FF .v..v..v..vÞ.vŸ.Ö...á.Öo.á^.&ú.. 0001A0
 89EA4689 C0280001 009887C7 26065EC4 D88E0E7F 881E0000 1CC8CBC9 1F000000 ....èüà....¡...Äá^.&ú.....+á.Fö. 0001C0
 EA5689E8 46890AF7 00028308 F7165688 1446884B E8124688 EC4689EE 4689E846 FÖ.FŸ.F&.F.ŠK.F..V.¼Ä.Ø.¼Ö.FÖ.Vö 0001E0
```

```
Dump of file SATURN:[PCCOMMON.DUMP.DLL]BRDNOPL.TMP;1 on 18-APR-1990 10:37:32.99
File ID (520,34,0)   End of file block 272 / Allocated 272

Virtual block number 79 (0000004F), 512 (0200) bytes

 EC46890A F7000283 08F71656 88144688 3EEBEA56 89E84689 16568814 46884CEB ŠL.F..V..FÒ.VõŠ>.F..V.¥Á.@.¥Ö.F& 000000
 00023003 7400013C 16E80000 E918EBEE 5689EC46 89165688 14468829 E8EE5689 .VŸ$).F..V..F&.VŸŠ.Ôï.Š.=..t#=.. 000020
 08C483F8 BFE80E06 76FF0876 FF5016E8 4680E5EB B6740008 30A67400 0430E374 tD=..tI=..tÂŠI.FÒ.P.v..v..Ò¢«.á. 000040
 568301FC 468308E8 FC4689FE 4689C028 103A00F0 9A5016F8 46800A76 FF0C76FF .v..v..F%.P.Þ.:.+á.F±.F¤Š..F¤..V 000060
 FC76FFFE 76FF0A76 FF0C76FF 7573FC46 39057C7C 7FFE5639 FA5688F8 468800FE ±..F%.V°9V±.||.9F¤su.v..v..v±.v¤ 000080
 00988F83 26F05EC4 F25689F0 4689E656 88E44688 0E910868 9A5016E4 4680006A j..Fõ.P.k....Fõ.V|.FÞ.V·á^Þ&.¢.. 0000A0
 12C48305 09E80E06 76FF0876 FF53520E 76FF1076 FF1276FF 5016F446 80437500 .uC.F¶.P.v..v..v.RS.v..v..Ò...á. 0000C0
 0EF076FF F276FF0A 76FF0C76 FF0E76FF 1076FF12 76FFF476 FFF676FF 2274C008 .ât".v-.v¶.v..v..v..v..v..v'.vÞ. 0000E0
 D88E0F5C 881E0000 3AC8C8C9 1F000000 9887C726 065EC4FF 71E912C4 83FEC3E8 Òù±.á.Õq.á^.&ú......èÙà:...¡\..Ä 000100
 4680C856 89C64689 0016050C 56880A46 88CC5689 CA468900 16050856 88064688 .F..V.....Fò.Vä.F..V.....Fó.Và.F 000120
 8305F1E8 0E0A76FF 0C76FF50 160A4680 08C48306 03E80E06 76FF0876 FF5016EE Ÿ.P.v..v..Ò...á..FÖ.P.v..v..Òp.. 000140
 56890246 890E5788 260C4788 26085689 0646890A 57882608 4788260E 5EC408C4 á.á^.&.G.&.W..F¤.VÄ&.G.&.W..F@.V 000160
 83FE46FF 03E80000 FE46C7D0 5689CE46 89005E05 04578826 02478826 065EC404 &á^.&.G.&.W..^..Fö.VÄúF±..Š..F±. 000180
 26C65EC4 D2D1E001 02578826 078826CE 5EC401C3 E9FE4688 01EDE903 7C04FE7E ~±.|.ÒÙ..F±ÒÙ.á^o&..&.W.ÌÀI@á^ó& 0001A0
 EA4689E4 5613E246 03F0J618 EE462802 57132607 0326CA5E C40A5718 26084728 +G.&.W.á^ò&..&.W.+FŸ.VÞ.Fä.Võ.Fõ 0001C0
 0326C65E C4EA4688 EC568806 73EA463B 057C0D7F EC563808 56880646 88E.^489 .V$.F¤.VÁ;V$..|.;Fõs..V$.Fõá^ó&. 0001E0

Dump of file SATURN:[PCCOMMON.DUMP.DLL]BRDNOPL.TMP;1 on 18-APR-1990 10:37:32.99
File ID (520,34,0)   End of file block 272 / Allocated 272

Virtual block number 80 (00000050), 512 (0200) bytes

 CE5EC401 75E90257 89260789 26125EC4 02571826 072826CA 5EC40A57 13260847 G.&.W.á^ò&+.&.W.á^.&..&.W.Õu.á^ö 000000
 02571326 070326C6 5EC40A57 18260847 2826CA5E C402D1E0 D1025788 26070826 &..&.W.ÌÀI@á^ò&+G.&.W.á^ó&..&.W. 000020
 38057C0D 7FEC5638 D8568806 4688EC56 89EA4689 0C56180A 4628F856 13F64603 .F~.V¼+FÖ.VÉ.Fõ.V$.F¤.VÁ;V$..|.; 000040
 C4025718 26072826 C65EC40A 57132608 470326CA 5EC4EA46 88EC5688 0673EA46 Fõs..V$.Fõá^ò&.G.&.W.á^ó&+.&.W.á 000060
 26CA5EC4 D2D1E001 06578826 04478826 CE5EC401 05E90657 89260447 8926125E ^.&.G.&.W.Õ..á^ö&.G.&.W.ÌÀI@á^ò& 000080
 4689E856 13E64603 F45618F2 46280E57 18260C47 2826C65E C4065713 26044703 .G.&.W.á^ó&+G.&.W.+F·.V¶.FI.VÒ.F 0000A0
 0C470326 EA4688EC 56880673 EA463805 7C0D7FEC 56380456 88024688 EC5689EA õ.V$.F@.Và;V$..|.;Fõs..V$.Fõ&.G. 0000C0
 CE5EC400 95E90A57 89260847 8926125E C4065718 26044728 26CA5EC4 0E571326 &.W.á^ò&+G.&.W.á^.&.G.&.W.Õ..á^ö 0000E0
 13260447 0326C65E C40E5718 260C4728 26CA5EC4 D2D1E001 06578826 04478826 &.G.&.W.ÌÀI@á^ò&+G.&.W.á^ó&.G.&. 000100
 7C0D7FEC 56380456 88024688 EC5689EA 4689E056 18DE4628 FC5613FA 46030657 W..F°.V¤+F8.VÁ.Fõ.V$.F@.Và;V$..| 000120
 18260447 2826C65E C40E5713 260C4703 26CA5EC4 EA4688EC 56880673 EA463805 .;Fõs..V$.Fõá^ò&.G.&.W.á^ó&+G.&. 000140
 FE90E903 75000130 FE36E903 75C00821 E823E80E 5789260C 47892612 5EC40657 W.á^.&.G.&.W.Š#Š!.àu.Õó±=..u.Õ.± 000160
 000020C8 C8C91F00 E8C028FE 07E900E8 FF60E903 75000330 FF05E903 75000230 =..u.Õ..=..u.Õm.Š.Õ.±+àŠ..èùà .. 000180
 88107410 46080E46 8818740C 46080A46 88207408 46080646 88D88E10 ACB81E56 V.¡¯..Á.F..F.t .F..F.t..F..F.t.. 0001A0
 FF0E76FF 1076FF50 16F0468D 020EE9C0 28057518 46081646 88087414 46081246 F..F.t..F..F.u.+àÒ...FÞ.P.v..v.. 0001C0
 F07E8309 7F01D1E9 037D00F2 7E8310C4 83F027E8 0E0676FF 0876FF0A 76FF0C76 v..v..v..v..Ò'».á..~·.).ÕI....~Þ 0001E0

Dump of file SATURN:[PCCOMMON.DUMP.DLL]BRDNOPL.TMP;1 on 18-APR-1990 10:37:32.99
File ID (520,34,0)   End of file block 272 / Allocated 272

Virtual block number 81 (00000051), 512 (0200) bytes

 037D00FA 7E830182 E9037500 F47E8309 7F0180E9 037D00F6 7E8301C6 E9037500 .u.Õó..—.).Õ§....~¶.u.Õý..~°.). 000000
 E9037500 FC7E8309 7F0195E9 037D00FE 7E83019E E9037500 F87E8309 7F01A9E9 Õ`....~½.u.Õ...~±.).Õ.....~¤.u.Õ 000020
 EE7E83EE 46FF03E8 0001EE46 C7E85689 E64689F2 5688F046 880004E4 46C7018A ..úFõ...FÞ.V·.FI.VÒúFŸ..Š..FŸ.-Ÿ 000040
 1F7FE256 39E85688 E64688E2 5689E046 89F25288 F0428802 E6C1EE76 883E7D04 .)>.vŸèI..BÞ.R·.FÁ.Vä.FI.VÒ9Vä.. 000060
 E8E85689 E64689E2 5688E046 88E44689 03188788 E3D1EE5E 881873E0 4639057C |.9FÁs..^ŸID.....Fõ.FÁ.Vä.FI.VÒŠ 000080
 7508E47E 83067404 E47E83EC 5689EA46 89005605 04578826 02478826 065EC489 ¿á^.&.G.&.W..V..Fõ.V$.-õ.t..-õ.u 0000A0
 2802E800 01880575 D0081480 01309AE6 76FFE876 FF37FF26 0277FF26 EA5EC472 rá^õ&.w.&.7.vÒ.vI.0....Áu.¡..Š.+ 0000C0
 C4149502 8F9AE65E 8D37FF26 0277FF26 EA5EC444 E8E85688 E6468808 74C008C0 à.ât..FI.VÒŠDá^õ&.w.&.7.^I.¢...á 0000E0
 D88808C4 83148307 CE9A14A9 03EF9ADC 8808EC83 14A406C7 9A149A02 C39AEA5E ^õ.û....ú.Ê..&..É.ÿ.`..ö.°..á..Ä 000100
 76FF0477 FF260677 FF26EA5E C475E814 D700FC9A 5052148F 04A69A14 8802569A .V.¡..I.¢.RP.¤.¤.Šuá^õ&.w.&.w..v 000120
 48E8E856 88E64688 0874C008 C02802E8 00018805 75000814 F601309A E676FFE8 Õ.vI.0.-..Áu.¡..Š.+à.ât..FI.VÒŠH 000140
 03EF9ADC 8808EC83 151006C7 9A150602 C39A045F 8DEA5EC4 1501028F 9AE65E8D .^I.¢...á^õ...ú....ú....&..É.ÿ. 000160
 260677FF 26EA5EC4 50521536 04A69A15 2402569A D88808C4 83151F07 CE9A1515 ...ö....á..Ä¯V.$..I.6.RPá^õ&.w.& 000180
 E8568BE6 4688165E C4078926 E4468812 5EC4E856 89E64689 0C1400FC 9A0477FF .w..¤....FI.VÒá^..Fõ&..á^..FI.VÒ 0001A0
 07892602 478926C0 28165EC4 000807C7 26125EC4 16E80001 88025789 26078926 &..&.W.¡..Š.á^.&ú...á^.+à&.G.&.. 0001C0
 740C460B 0A468818 7408460B 064688D8 8E133388 1E560000 10C8CBC9 5E1F00EB Š..^èùà...V.¡3..Á.F..F.t..F..F.t 0001E0
```

```
Dump of file SATURN:[PCCOMMON.DUMP.DLL]BRDNOPL.TMP;1 on 18-APR-1990 10:37:32.99
File ID (520,34,0)   End of file block 272 / Allocated 272

Virtual block number 82 (00000052), 512 (0200) bytes

 0E76FF10 76FF5016 F046807B EBC02B04 75164608 14468808 74104608 0E468810 ..F..F.t..F..F.u.+âŠ(.FÞ.P.v..v. 000000
 7400F07E 83067F53 7C^0F27E 8310C483 FAE6E80E 0676FF08 76FF0A76 FF0C76FF .v..v..v..v..Ò|*.á..-·.|S...¬Þ.t 000020
 FE7E832F 7400FB7E 83067F37 7C00FA7E 83307400 F47E8306 7F457C00 F(¬F834B K.~-.|E...¬¶.t=.-*.|7...¬½.t/.¬± 000040
 145EC4F2 5288F042 8802E6C1 0320B788 E301125E 88217400 FC7E8306 7F2\ 'C00 .|)...¬*.t).^.1D.ñ .èl..BÞ.R·á^. 000060
 4688D88E 157DB81E 000004C8 C8C95E1F 00EBC02B 04EB0001 B8025789 2607u?26 &..&.W.|..$.+âŠ..^èüà....|)..Ä.F 000080
 56880A46 8823EB00 01B80575 0C56390A 750A4639 08568806 46883474 0C46080A ..F.t4.F..V.9F.u.9V.u.|..S#.F..V 0000A0
 C91FD0EB C02BC4EB 0C56890A 46893C57 88263A47 8826FC5E C4FE5689 FC46890C ..F=.V±á^=&.G:&.W<.F..V.Šá+âŠ..è 0000C0
 460B0E46 8808740C 46080A46 88107408 46080646 88088E16 2A881E00 0002C8CB ùà....|*..Ä.F..F.t..F..F.t..F..F 0000E0
 FF9A5016 FE468D0A 76FF0C76 FF505200 16050856 88064688 45E880F3 88057510 .u.|µ.ŠE.F..V....RP.v..v..F±.P.. 000100
 88262826 068EE3D1 FE5E8818 EBC02B00 0807C726 0E5EC40C 7508FE7E 830000FF ....~±.u.á^.&ú...+âŠ..^±1D..&(&. 000120
 08064688 088E1677 881E5657 00002CC8 C8C91F00 EBC02B07 89260E5E C401F887 .½.á^.&..+âŠ..èüà,..WV.|W..Ä.F.. 000140
 FB880016 05085688 0646880A 5EC4030A E980F388 06750C46 080A4688 08740846 F.t..F..F.u.|µ.Ö..á^..F..V.....« 000160
 C0280573 01567F83 26077C0E 7F00587F 8326065E C41FA5F2 000889DA 8E1EF088 .Þ..Ö¿..·É.á^.&..X...|.&..V.s.+á 000180
 160C4680 50520A56 89D84689 44578826 42478826 F6568CF4 4689E446 8002D9E9 Õ1..FÕ.F¶.V-&.GB&.WD.FÁ.VORP.FÉ. 0001A0
 56390E56 88DC4688 00FE5683 01FC4683 08EBFC46 89FE4689 C0281790 00F09A50 P.Þ...+â.F±.F=Š..F=..V±..FÉ.VB9V 0001C0
 08689A50 16F8468D 006AFC76 FFFE76FF D876FFDA 76FF4173 FC463905 7C487FFE ±.H|.9F=sA.vÖ.vÁ.v±.v=j..F½.P.k. 0001E0

Dump of file SATURN:[PCCOMMON.DUMP.DLL]BRDNOPL.TMP;1 on 18-APR-1990 10:37:32.99
File ID (520,34,0)   End of file block 272 / Allocated 272

Virtual block number 83 (00000053), 512 (0200) bytes

 76FFF676 FF0A76FF 0C76FF08 C483026F E80EF876 FFFA76FF F476FFF6 76FF0FFE ±..v~.v¶.v*.vh.Öo..á..v..v..v~.v 000000
 88E25689 E0468900 5E050457 88260247 8826065E C4A5EB08 C48305C2 0CFE9AF4 ¶.±.Ó..á.ŠEá^.&.G.&.W..^..FÁ.Vã. 000020
 9A37FF26 0277FF26 D45EC437 FF260277 FF26E05E C4065689 D446890C 56880A46 F..V..FÁ.V=á^Á&.w.&.7á^Á&.w.&.7. 000040
 C444E802 57882607 8826D45E C40C74C0 08C02802 E80001B8 0575D008 181F0130 0....Âu.|..Š.+â.ât.á^Á&..&.W.ŠDá 000060
 EC831836 06C79A18 2C02C39A E05EC418 2702C39A D45EC437 FF260277 FF26E05E ^Á&.w.&.7á^â.ü.'.á^Â.ü.,..ü.6..& 000080
 FC9A5052 185104A6 9A184A02 569AD888 08C48318 45078E9A 183803EF 9ADC8808 ..É.ÿ.;..ƒ.E..á..Ä.V.J..Î.Q.RP.= 0000A0
 260677FF 26D45EC4 0477FF26 0677FF26 E05EC402 57892607 8926D45E C4187600 .v.á^Á&..&.W.á^Á&.w.&.w.á^Á&.w.& 0000C0
 88260447 8826045E C40D74C0 08C02802 E80001B8 0575D008 189D0130 9A0477FF .w..0....Âu.|..Š.+â.ât.á^Á&.G.&. 0000E0
 83188706 C79A18AD 02C39A04 5F8DE05E C418A802 C39A045F 8D045EC4 4BEB0657 W.ŠKá^â._..ü.´.á^Á._..ü.Ü..ú.ñ.. 000100
 C4505218 D004A69A 18C80256 9AD88808 C48318C6 07BE9A18 8C03EF9A DC8808EC â..É.y.¥..ƒ.ó..á..Ä.V.ù..Î.Ì.RPá 000120
 0C56880A 46880657 89260447 8926045E C4191000 FC9A0477 FF260677 FF26E05E ^Á&.w.&.w..=...á^Á&.G.&.W..F..V. 000140
 01309A37 FF260277 FF26D45E C437FF26 0277FF26 E05EC4D6 56890446 89000805 ....FÁ.V=á^Á&.w.&.7á^Á&.w.&.7.0. 000160
 E05EC444 E8025788 26078826 D45EC40C 74C008C0 2802E800 01880575 D0081930 =..Âu.|..Š.+â.ât.á^Á&..&.W.ŠDá^Á 000180
 8808EC83 195406C7 9A194A02 C39AE05E C4194502 C39AD45E C437FF26 0277FF26 &.w.&.7á^â.ü.E.á^Á.ü.J..ü.Î..É.. 0001A0
 9400FC9A 5052196F 04A69A19 6802569A D88808C4 83196307 CE9A1959 03EF9ADC É.ÿ.Y..ö.c..á..Á.V.h..Î.o.RP.=.. 0001C0
 77FF2606 77FF2604 5EC40477 FF260677 FF26E05E C4025789 26078926 D45EC419 .á^Á&..&.W.á^Á&.w.&.w.á^Á&.w.&.w 0001E0

Dump of file SATURN:[PCCOMMON.DUMP.DLL]BRDNOPL.TMP;1 on 18-APR-1990 10:37:32.99
File ID (520,34,0)   End of file block 272 / Allocated 272

Virtual block number 84 (00000054), 512 (0200) bytes

 06578826 04478826 D45EC400 74C008C0 2802E800 01880575 D00819B8 01309A04 ..0.£..Âu.|..Š.+â.ât.á^Á&.G.&.W. 000000
 08EC8319 D506C79A 19C802C3 9A045F8D E05EC419 C602C39A 045F8D04 5EC448EB ŠKá^â._..ü.ó.á^Á._..ú.ù..ú.f..Š. 000020
 E05EC450 5219FB04 A69A19E9 02569AD8 8808C483 19E407CE 9A19DA03 EF9ADC88 .É.ÿ.Ö¯..ö.Ö..á..Ä¯V.Ö..Î.«.RPá^Á 000040
 C95F5E1F 00E8C02B 06578926 04478926 D45EC414 6400FC9A 0477FF26 0677FF26 &.w.&.w..=.d.á^Á&.G.&.W.+âŠ..^ è 000060
 0C460B0A 46880874 08460806 46880000 EE46C7D8 8E16E888 1E565700 0032C8CB ùà2..WV.|Ö..ÀüFŸ...F..F.t..F..F. 000080
 05085688 0646880A 5EC404C4 830DFF00 FE9A0676 FF0876FF 0344E98D F3880675 u.|µ.ÖD..v..v..±....ó.á^..F..V.. 0000A0
 8826030E E9C02805 7D010A7F 8326065E C41FA5F2 0008890A 8E1EF088 FB880036 6..«.Þ..Ö¿..·É.á^.&....).+âÖ..&. 0000C0
 F09A5016 D2468DFC 76FF52E8 568CE646 89D64680 FE5689FC 46894A57 88264847 GH&.WJ.F=.V±.F=.FÌ.VÖR.v=.F@.P.Þ 0000E0
 727FF256 39D45688 D2468800 F2568301 F0468308 EBF04689 F24689C0 2B1ACD00 .ë.+â.F·.FÞŠ..FÞ..V·..F@.Vâ9V·.r 000100
 C4175408 689A5016 F4468000 6AF076FF F276FFFC 76FFFE76 FF6B73F0 4639057C |.9FÞsk.v±.v=.v·.vÞj..F¶.P.k.T.á 000120
 260877FF 26F85EC4 FA5689F8 46890257 88260788 26C2EB02 7402067F 8326F45E ^¶&....t.Šó&..&.W..F½.V*á^½&.w.& 000140
 B40CFE9A E676FFE8 76FF0A76 FF0C76FF 0000FFFF 9AE676FF E876FF01 6A0677FF .w.j..vÒ.vl......v..v..vÒ.vl.±.Ç 000160
 8826065E C40240E9 037500EE 7E83FF7B E90001EE 46C70575 00EE7E83 08C48317 ..á..~Ÿ.u.úFŸ..Ö(..~Ÿ.u.ÖM.á^.&. 000180
 FF26EA5E C4005689 :E46890C 56880A46 88EC5689 EA468900 5E050457 88260247 G.&.W..^..Fõ.V±.F..V..Fö.VÁá^ö&. 0001A0
 08C02802 E80001B8 .575D008 188F0130 9A37FF26 0277FF26 CE5EC437 FF260277 w.&.7á^ö&.w.&.7.0....Âu.|..Š.+â. 0001C0
 9702C39A CE5EC437 FF260277 FF26EA5E C444EB02 57882607 8826CE5E C40C74C0 ât.á^ö&..&.W.ŠDá^ö&.w.&.7á^ö.û.. 0001E0
```

Dump of file SATURN:[PCCOMMON.DUMP.DLL]BRDNOPL.TMP;1 on 18-APR-1990 10:37:32.99
File ID (520,34,0)   End of file block 272 / Allocated 272

Virtual block number 85 (00000055), 512 (0200) bytes

```
08C4831B 8507BE9A 1BAB03EF 9ADC8808 EC831BA6 06C79A1B 9C02C39A EA5EC41B .á^ð.û....ú.Ì..å..É.ÿ.¨..ƒ.ç..é. 000000
EA5EC402 5789260/ 8926CE5E C41BE600 FC9A5052 1BC104A6 9A1BBA02 569AD888 .Ä.V.¤..Ì.é.RP.•.Ì.á^ö&..&.W.á^ð 000020
E80001B8 05750008 1C0D0130 9A0477FF 260677FF 26CE5EC4 0477FF26 0677FF26 &.w.&.w.á^ö&.w.&.w..0....Åu.¡..$ 000040
C41C1802 C39A045F 8DCE5EC4 48E80657 88260447 8826CE5E C40D74C0 08C02B02 .+å.åt.á^ö&.G.&.W.Škâ^ö._..û...á 000060
C4831C36 07BE9A1C 2C03EF9A DC8808EC 831C2706 C79A1C1D 02C39A04 5F8DEA5E ^ð._..û....ú.'..å..É.ÿ.,..ƒ.6..á 000080
C41C8000 FC9A0477 FF260677 FF26EA5E C450521C 4D04A69A 1C380256 9AD88808 ..Ä.V.;..Ì.M.RPá^ö&.w.&.w..•...á 0000A0
0277FF26 EA5EC4D0 5689CE46 89000805 0C5688DA 46880657 89260447 8926CE5E ^ö&.G.&.W..F..V.....Fö.VÂá^ö&.w. 0000C0
74C008C0 2B02E800 01B80575 D0081CAD 01309A37 FF260277 FF26CE5E C437FF26 &.7á^ö&.w.&.7.0.Û..Åu.¡..$.+å.åt 0000E0
C41C8502 C39ACE5E C437FF26 0277FF26 EA5EC444 E8025788 26078826 CE5EC40C .á^ö&..&.W.$Dá^ö&.w.&.7á^ð.û.ç.á 000100
D88808C4 831CD307 CE9A1CC9 03EF9ADC 8808EC83 1CC406C7 9A1CBA02 C39AEA5E ^ð.û.¤..ú.á..å..É.ÿ.è..ö.Æ..á..Ä 000120
FF26EA5E C4025789 26078926 CE5EC41D 0400FC9A 50521CDF 04A69A1C D802569A .V.Ä..Ì.Ô.RP.•...á^ö&..&.W.á^ö&. 000140
2B02E800 01B80575 D0081D28 01309A04 77FF2606 77FF26CE 5EC40477 FF260677 w.&.w.á^ö&.w.&.w..0.+..Åu.¡..$.+ 000160
EA5EC41D 3602C39A 045F8DCE 5EC448EB 06578826 04478826 CE5EC400 74C008C0 å.åt.á^ö&.G.&.W.Škâ^ö._..û.6.á^ð 000180
8808C483 1D5407CE 9A1D4A03 EF9ADC88 08EC831D 4506C79A 1D3802C3 9A045F80 ._..û.;..ú.E..å..É.ÿ.J..ö.Ť..á.. 0001A0
CE5EC417 F200FC9A 0477FF26 0677FF26 EA5EC450 52106804 A69A1D59 02569A08 Ä.V.Y..Ì.k.RPá^ö&.w.&.w..•.·.á^ö 0001C0
1A410002 00000001 1B0F0002 000890C8 C95F5E1F 00EBC02B 06578926 04478926 &.G.&.W.+åŠ..^_èù.............A. 0001E0
```

Dump of file SATURN:[PCCOMMON.DUMP.DLL]BRDNOPL.TMP;1 on 18-APR-1990 10:37:32.99
File ID (520,34,0)   End of file block 272 / Allocated 272

Virtual block number 86 (00000056), 512 (0200) bytes

```
18620002 00000014 1A910002 021E0004 1AFC0203 00000008 08A40002 00000004 ......Ê.......•...............b. 000000
00000000 00000000 00000000 00500004 16AF0203 00000019 1A190002 00000017 ...............£...P............ 000020
000805C2 8CC38B00 80E90375 001A7F83 26105EC4 D88EFFFF B81E5657 000004C8 å...WV.¡...Äá^.&....u.Ô...û.ô... 000040
00520CFE 9A0676FF 0876FF50 52107500 0E7E832C 7400187F 8326FE56 89FC4689 .F•.V±&....t,.~..u.RP.v..v..±.R. 000060
C4187400 0E7E834D E808C483 00980CFE 9A0A76FF 0C76FFFC 76FFFE76 FF08C483 .á..v±.v•.v..v..±....á.$M.~..t.á 000080
08568806 4688FC5E ·426E81F A5F20008 B9DA8E1E F088F888 0C5688DA 4688FC5E ^•.F..V..«.Þ..Ö¿..·É.$&á^•.F..V. 0000A0
105EC408 C483FFFF ·CFE9A0A 76FF0C76 FF53061F A5F20008 B9DA8E1E F088F888 .«.Þ..Ö¿..·É..S.v..v..±....á.á^. 0000C0
8826145E C4D88E00 08B81E56 57000014 C8C8C95F 5E1F00E8 C02B0001 1847C726 &ûG...+åŠ..^_èùå...WV.¡...Äá^.&. 0000E0
B9DA8E1E F088F888 105688DE 46880A5E C41875D0 08FE5689 FC468902 57882607 .&.W..F•.V±.Äu.á^..F..V..«.Þ..Ö¿ 000100
145EC41F A5F20008 B9DA8E1E 0716F088 EC7E8D10 568B0E46 886AE81F A5F20008 ..·É.$j.F..V..~å.Þ....Ö¿..·É.á^. 000120
0876FF50 520C5688 0A468806 E899C02B 05740012 7E835052 0477FF26 0677FF26 &.w.&.w.RP.-..t.+å.$..F..V.RP.v. 000140
1FA5F200 08B91F16 1EEC768D F8880A5E C412C483 FC5EFF37 FF26065E C40676FF .v.á^.&.7.^•.á.á^..«.v$...¿..·É. 000160
881E0000 12C8C8C9 5F5E1F00 E8C02B1F A5F20008 B91F161E EC768DFB 880E5EC4 á^..«.v$...¿..·É.+åŠ..^ èùå....¡ 000180
0676FF08 76FF00AF E98DF388 06750C46 080A4688 08740846 08064688 D88E0087 ñ..Ä.F..F.t..F..F.u.¡æ.ÕÉ..v..v. 0001A0
0085E903 74C008FF FF0A589A 5016EE46 8D0676FF 0876FF01 9709C29A 006A006A j.j..ô....v..v..FŸ.P.X....åt.Ö.. 0001C0
89001C05 C28CC388 D1E80275 00347F83 26FC5EC4 FE5689FC 4689F056 88EE4688 .FŸ.VÞ.F•.V±á^•&..4.u.Šî.û.ô.... 0001E0
```

Dump of file SATURN:[PCCOMMON.DUMP.DLL]BRDNOPL.TMP;1 on 18-APR-1990 10:37:32.99
File ID (520,34,0)   End of file block 272 / Allocated 272

Virtual block number 87 (00000057), 512 (0200) bytes

```
FF52500A 76FF0C76 FFF64689 30478826 FA5689F8 4689000C 05C388F4 5689F246 F·.V¶.û....F½.V•&.G0.F-.v..v.PR. 000000
FFF476FF F876FFFA 76FFF676 FF0A76FF 0C76FF0E C483FE16 E80EF276 FF52F876 vÑR.v·.Ô.±.á..v..v..v–.v•.v½.v¶. 000020
830597E8 0E066AEE 76FFF076 FF006A00 6A12C483 FEA3E80E EE76FFF0 76FFF276 v·.vÞ.vŸ.Ôɱ.á.j.j..vÞ.vŸj..Ô... 000040
46880874 08460806 4688088E 0160881E 000032C8 C8C91F00 E8C02BFF 64E90AC4 å.Ôd.+åŠ..èùå2...|'..Ä.F..F.t..F 000060
47882606 5EC40002 F246C7F0 568CEE46 89DE468D 01D9E98D F3880675 0C46080A ..F.u.¡æ.Ô)..F8.FŸ.VÞúF·..á^.&.G 000080
4688FE56 89FC4689 4E578826 4C478826 065EC411 E8FE5689 FC46894A 57882648 H&.WJ.F•.V±Š.á^.&.GL&.WM.F•.V±.F 0000A0
FC76FFFE 76FF02A8 09C29A00 6A006AFC 76FFFE76 FF0196E9 0375C008 F24EFFF2 ·.N·.åu.Ô...v±.v•j.j..ô.´..v±.v• 0000C0
88260788 26064689 06478826 F45EC401 60E90374 C0080187 0A589A50 16F4468D .F¶.P.X....åt.Ôm.á^¶&.G..F•&..&. 0000E0
7F8326CE 5EC4D056 89CE4689 DA5688D8 4688000A E9D64688 DA5689D8 46890257 W..FÄ.VÖ.F•ÖÖ..FÄ.VÖ.Fö.VÂá^ö&.. 000100
83FE58E8 0E2677FF 262877FF 260A76FF 0C76FF15 74002A7F 8326077F 1E7C002C ,.|...&..*.t..v..v.&.w(&.w&.Ô{±. 000120
89D24689 001605C2 8CC388DC 46893247 88268CEB 02750038 7F8326CE 5EC408C4 á.á^ö&..8.u.$.&.G2.FÉ.û.ô....F8. 000140
DA5688D8 46880081 E90000FF FF9AEE76 FFF076FF 016A0677 FF260877 FF26D456 VÂ&.w.&.w.j..vÞ.vŸ.....Ô...FÄ.VÖ 000160
260A76FF 0C76FF15 7400287F 8326077F 1E7C002A 7F8326F8 5EC4FA56 89F84689 .F½.V•á^½&..*.|...&..(.t..v..v.& 000180
892C4788 26FF1FE9 03750030 7F8326F8 5EC408C4 83FDEFE8 0E2477FF 262677FF .w&&.w$.Ôy•.á.á^½&..0.u.Ô..&.G,. 0001A0
9AEE76FF F076FF01 6A0677FF 260877FF 26045689 D2468900 1405C28C C3880C46 FÉ.û.ô....F8.VÂ&.w.&.w.j..vÞ.vŸ. 0001C0
76FF0C76 FF00E881 74000230 FF1AE903 7F000130 0F7CC008 13EB15EB 0000FFFF ....Š.Š..á|.•....Ô..•..t.Š..v..v 0001E0
```

```
Dump of file SATURN:[PCCOMMON.DUMP.DLL]BRDNOPL.TMP;1 on 18-APR-1990 10:37:32.99
File ID (520,34,0)   End of file block 272 / Allocated 272

Virtual block number 88 (00000058), 512 (0200) bytes

 DC76FF0A 76FF0C76 FF0EC483 FC2CE80E D276FF04 76FFEE76 FFF076FF DC76FF0A ..vÉ.vÞ.vŸ.vå.v@.Ò,=.á..v..v..vÉ 000000
 FFEE76FF F076FF12 C483FCB9 E80ED876 FFDA76FF D276FFD4 76FFEE76 FFF076FF .vÞ.vŸ.vå.v@.vÖ.vÁ.Ò¿=.á..vÞ.vŸ. 000020
 4CE9FE7C E90AC4d3 039EE80E 500003B8 03E80005 B8057502 D67E8308 76FFDA76 vÖ.vÄ.-@.u.¡..Š.¡..P.Ò...á.Õ|±ÕL 000040
 080A4688 08740846 08064688 D88E0232 B81E5657 000042C8 CBC91F00 EBC02BFE ±+åŠ..èüåB..WV.¡2..Ä.F..F.t..F.. 000060
 000889DA 8E1E0716 F088DC7E 80002605 08568806 46880179 E98DF388 06750C46 F.u.¡µ.Õy..F..V..&..~É.Þ....Ö¿.. 000080
 88265847 8826065E C41FA5F2 000889DA 8E1EF088 F07E8D00 36050646 881FA5F2 ·É..F..ó..-Þ.Þ..Ö¿..·É.á^.&.GX&. 0000A0
 40C01801 627F8326 00C6E903 75C00807 7F00CFE9 037DD208 DA568908 46895A57 WZ.FÄ.VÖ.@).Õü....åu.Õ6.&..b..åà 0000C0
 8806568C D446890C 468D36EB C2468800 ADE9037C 02C27E83 C246FF03 EBC24689 .FóŠ..Fó.-ó.|.ÕÜ..FóŠ6.FÉ.Få.V@. 0000E0
 05085688 06468806 568CD446 89F0468D 27EBC056 898E4689 001E0508 56880646 F..V.....Ff.VåŠ'.FÞ.Få.V@.F..V.. 000100
 57882607 8826BE5E C400E8DB 7400013D C674C008 0BEB00EB C056898E 46890016 ...Ff.VåŠ.Š..åtó=..tÜŠ.á^f&..&.W 000120
 5689C846 890A561B D8462806 57882604 478826C6 5689C446 890A561B D8462B02 .+FÄ.VÖ.Fá.VóÉ.G.&.W.+FÄ.VÖ.Få.V 000140
 13084603 06578826 04478826 CE5689CC 46890A56 13084603 02578826 078826CA ò&..&.W..FÄ.VÖ.Fä.Vó&.G.&.W..FÁ. 000160
 4688FF47 E908C483 003E0CFE 9A5016C4 46800476 FFD676FF 02568900 46890A56 VÖ.FÅ.V@.v@.vå.Fá.P.±.>..á.ÕG..F 000180
 160C468D 5016F046 806277FF 26065EC4 0A76FF0C 76FFEE56 89EC4689 08568806 ..V..Fè.VŸ.v..v.á^.&.wb.FÞ.P.FÉ. 0001A0
 FF50160C 468D501^ F0468D62 77FF2606 5EC40A76 FF0C76FF 0EC483FA 78E80E50 P.Ò(•.á..v..v.á^.&.wb.FÞ.P.FÉ.P. 0001C0
 280AC483 01FAE80L 026AEC76 FFEE76FF 006A006A 12C483F8 06E80EEC 76FFEE76 vŸ.vè.Ò.«.á.j.j..vŸ.vèj..Ò•..á.+ 0001E0

Dump of file SATURN:[PCCOMMON.DUMP.DLL]BRDNOPL.TMP;1 on 18-APR-1990 10:37:32.99
File ID (520,34,0)   End of file block 272 / Allocated 272

Virtual block number 89 (00000059), 512 (0200) bytes

 0C46080A 46880874 08460806 4688088E 0430881E 00002AC8 CBC95F5E 1F00EBC0 åŠ..^_èüå*...¡0..Ä.F..F.t..F..F. 000000
 FC468006 76FF0876 FF060509 C29A006A 006A0676 FF0876FF 01C8E98D F3880675 u.¡µ.Õù..v..v.j.j..ó....v..v..F= 000020
 478826EC 5EC4EE56 89EC4689 FE5688FC 468801A1 E90374C0 0806350A 589A5016 .P.X.5..åt.ÕÅ..F=.V±.F&.VŸá^&&.G 000040
 83067F18 7C00FA7E 83029800 F09A5016 F8468050 52F65689 F4468940 5788263E >&.W@.F¶.V-RP.F%.P.Þ....-•.|.... 000060
 006C7F83 26EC5EC4 08C483FF 73E80EF4 76FFF676 FF0A76FF 0C76FF13 7400F87E -%.t..v..v..v-.v¶.Õs..á.á^&&..l. 000080
 08C483FA D0E80E66 77FF2668 77FF260A 76FF0C76 FF157400 6A7F8326 077F1E7C |...&..j.t..v..v.&.wh&.wf.ÒÏ•.á. 0000A0
 002605C3 88085689 D6468900 0605C28C C388008C E9037500 0094BF83 26EC5EC4 á^&&.¢....u.Õ...û.ó....F@.VÄ.û.&. 0000C0
 76FF52DA 76FF52DE 4689008A 878826E2 5689E046 89001605 C388DC56 89DA4689 .FÖ.VÉ.û....FÅ.Vå&.....FBR.VÖR.v 0000E0
 E80ED676 FFD876FF ^A76FFDC 76FFDE76 FF0A76FF 0C76FF08 C4830556 0CFE9AE0 Å.±.V..á..v..v..v8.vÉ.vÖ.vÄ.v@.Ò 000100
 FC76FFFE 76FFD676 FFD876FF E076FFE2 76FFDE76 FF0A76FF 0C76FF0E C483F91E .•.á..v..v..v8.vå.vÁ.vÄ.v@.v±.v= 000120
 478826EC 5EC40AC4 A3009FE8 0E016AFC 76FFFE76 FF006A00 6A12C483 F9A8E80E .Ò·•.á.j.j..v±.v=j..Ò...á.á^&&.G 000140
 16F0468D E476FFE6 76FF0744 09C29A00 6A006A50 52E65689 E4468944 57882642 B&.WD.Fó.V|RPj.j..ó.D..v|.vó.FÞ. 000160
 1E7C0056 7F8326E8 5EC4EA56 89E84689 F25688F0 46886275 C00805F5 0A589A50 P.X.%..åub.FÞ.V·.FÒ.Võá^Ò&..V.|. 000180
 5EC408C4 83F9DFE8 0E5077FF 265277FF 260A76FF 0C76FF15 7400547F 8326077F ..&..T.t..v..v.&.wR&.wP.ÒÖ•.á.á^ 0001A0
 EA76FF0A 76FF0C76 FF08C483 FC94E80E 53060A76 FF0C76FF 0F740066 7F8326E8 Ò&..f.t..v..v..S.Ò.=.á..v..v..võ 0001C0
 05CE881E 56570000 08C8CBC9 1F00EBC0 28FE48E9 8AE808C4 83FA85E8 0EE876FF .vÖ.Ò.•.á.Š.ÕH±+åŠ..èüå...WV.¡ö. 0001E0

Dump of file SATURN:[PCCOMMON.DUMP.DLL]BRDNOPL.TMP;1 on 18-APR-1990 10:37:32.99
File ID (520,34,0)   End of file block 272 / Allocated 272

Virtual block number 90 (0000005A), 512 (0200) bytes

 E9064688 026CE98D F3B8067E 07067E83 067C0006 7E830C74 0A460808 4688D88E .Ä.F..F.t..-..|..-..-.¡µ.Õl..F.Õ 000000
 009687C7 26F85EC4 0000008A 87C726F8 5EC4FA56 89F84689 0A568808 46880246 F..F..V..F%.V•á^¥&ú.....á^¥&ú... 000020
 0000008E 87C726F8 5EC40000 009487C7 26F85EC4 00000098 87C726F8 5EC40000 ..á^¥&ú.....á^¥&ú.....á^¥&ú..... 000040
 F8468838 57892636 4789263C 5788263A 478826F8 5EC40000 009287C7 26F85EC4 á^¥&ú.....á^¥&.G:&.W<&.G6&.W8.F% 000060
 F85EC41F A5F20008 B9DA8E1E F088067F 8DF85EC4 FE5689FC 46890016 05FA5688 .V•....F=.V±á^%....Þ..Ö¿..·É.á^% 000080
 47892670 478926C0 28F85EC4 1FA5F200 08890A8E 1EF08826 7F8DFE56 88FC4688 .F=.V±..&.Þ..Ö¿..·É.á^%+å&.Gp&.G 0000A0
 89267C47 8926F85E C4764789 26784789 26F85EC4 72478926 74478926 F85EC46E ná^¥&.Gt&.Grá^¥&.Gx&.Gvá^¥&.G|&. 0000C0
 46880186 E9008287 89260084 878926F8 5EC47E47 89260080 878926F8 5EC47A47 Gzá^¥&....&.G-á^¥&....&....Õ...F 0000E0
 26F85EC4 00006A47 C726F85E C4000062 47C726F8 5EC4FA56 89F84689 0A568808 ..V..F%.V•á^¥&úGb..á^¥&úGj..á^¥& 000100
 3605C28C C388F85E C4000068 47C726F8 5EC40000 6647C726 F85EC400 006C47C7 úGl..á^¥&úGf..á^¥&úGh..á^%.û.ó.6 000120
 8E1EF088 1E7F8D00 1605C28C C388F85E C41FA5F2 000889DA 8E1EF088 267F8D00 ...&.Þ..Ö¿..·É.á^%.û.ó.......Þ.. 000140
 5EC40000 3247C726 F85EC4FA 5689F846 890A5688 08468801 1BE91FA5 A5A5A5DA ÕÉÉÉÉ.Õ...F..V..F%.V•á^¥&úG2..á^ 000160
 3647C726 F85EC400 003847C7 26F85EC4 00003C47 C726F85E C400003A 47C726F8 ¥&úG:..á^¥&úG<..á^¥&úG8..á^¥&úG6 000180
 A5F20008 B9DA8E1E F088167F 800E5688 0C4688F8 5EC41774 0E4608C 46880000 ...F..F.t.á^%.F..V.....Þ..Ö¿..·É 0001A0
 3247C726 F85EC400 002C47C7 26F85EC4 FA5689F8 46890A56 88084688 00C0E91F .Õå..F..V..F%.V•á^¥&úG,..á^¥&úG2 0001C0
 88F85EC4 17740E46 080C4688 00003047 C726F85E C4000034 47C726F8 5EC40000 ..á^¥&úG4..á^¥&úG0...F..F.t.á^%. 0001E0
```

```
Dump of file SATURN:[PCCOMMON.DUMP.DLL]BRDNOPL.TMP;1 on 18-APR-1990 10:37:32.99
File ID (520,34,0)   End of file block 272 / Allocated 272

Virtual block number 91 (0000005B), 512 (0200) bytes

 5689F846 890A5689 0846886F E81FA5F2 000889DA 8E1EF088 147F8D0E 56880C46 F..V.....Þ..Ö¿...E.Šo.F..V..F%.V 000000
 26F85EC4 00003A47 :726F85E C4000038 47C726F8 5EC40000 3047C726 F85EC4FA *á^%&úG0..á^%&úG8..á^%&úG:..á^%& 000020
 DA8E1EF0 881C7F8D 000C05C2 8CC388F8 5EC40000 3647C726 F85EC400 003447C7 úG4..á^%&úG6..á^%.û.ô.......Þ..Ö 000040
 09290929 088E07E2 0A38A7FF 2E93C003 14770005 3000012D 1CE81FA5 F2000889 ¿...E.$.-..=..w..â...I8.â./.).). 000060
 021E0004 03A00203 00000001 06C40002 000590C8 C95F5E1F 00E8C028 09D50984 ..i.+âŠ..^_èù.....á.............. 000080
 00000000 00000000 00CC0004 03330203 00000019 078E0002 00000014 07340002 ..4........7.......3...ä......... 0000A0
 46050856 88064688 58E88DF3 88057508 46080646 88D88EFF FF881E56 00000AC8 à...V.j...Ã.F..F.u.|æ.ŠX.F..V..F 0000C0
 F676C402 E3C1FE5E 88357D04 FE7E83FE 46FF03E8 0000FE46 C7F85689 F6468900 ..F-.V%úF±..Š..F±.-±.)5.^±èD.áv- 0000E0
 0876FFFA 76FFFC76 FF1374FF FA830575 FFFF30FC 5689FA46 89025088 26008826 &..&.P..F*.V==..u..*.t..v=.v*.v. 000100
 4688088E 0007881E 00000AC8 C8C95E1F 00E8C028 C2E808C4 830000E8 0E0676FF .v..Ò...á.Šò+âŠ..^èùà....|...Ã.F 000120
 FF0C76FF 4277FF26 4477FF26 065EC46E E880F388 057D000C 7E830674 08460806 ..F.t..-..).|æ.Šnâ^.&.wO&.w8.v.. 000140
 F64689FE 5688FC46 8848E88E 07880574 C008FFFF 08689A50 16FC468D 006A0A76 v.j..F=.P.k....ât.|..ŠH.F=.V±.F- 000160
 FF0CC483 039AE80E 0676FF08 76FF5352 50006AFA 46894647 8826F65E C4F85689 .V%á^-&.GF.F*j.PRS.v..v..Ò...á.. 000180
 1F00E8C0 280EC483 000AE80E F676FFF8 76FF0676 FF0876FF FA76FF0A 76FF0C76 v..v..v*.v..v..V%.v-.Ò...á.+âŠ.. 0001A0
 89D44689 005E0504 57882602 4788260A 5EC4D88E 007A881E 56570000 50C8C8C9 èùàP..WV.|±..Ãá^.&.G.&.W._^..Fâ. 0001C0
 DC4680B2 56898046 89445788 26424788 26FA5689 F8468900 1605C28C C3880656 V=.ù.ô....F%.V*&.G8&.WD.F¯.Vý.FÊ 0001E0
```

```
Dump of file SATURN:[PCCOMMON.DUMP.DLL]BRDNOPL.TMP;1 on 18-APR-1990 10:37:32.99
File ID (520,34,0)   End of file block 272 / Allocated 272

Virtual block number 92 (0000005C), 512 (0200) bytes

 C48301F8 1A119A06 76FF0876 FFEC76FF 16D2568C D04689C0 468DEE56 8CEC4689 .Fâ.VŸ.Fè.FÃ.V@..vš.v..v....=..á 000000
 8D8076FF 8276FF0C C4830300 E80E0A76 FF0C76FF 0676FF08 76FF0E76 FF016A08 .j..v..v..v..v..v..Ò...á..vý.v¯. 000020
 F4468308 E8F65689 F4468900 D2830001 05125688 10468801 D300F09A 50168C46 F¥.P.Þ.Æ..F..V.....@..F¶.V-Š..F¶ 000040
 8276FF01 6EE90372 F4463908 7C0178E9 037EF656 398E5688 8C468800 F6568301 ..V-..F¥.Vƒ9V--.Òx.|.9F¶r.Òn..vý 000060
 5689FC46 890A5688 D8468800 AC08689A 5016D846 8D006AF4 76FFF676 FF8076FF .v¯.v-.v¶j..FÃ.P.k. ..FÃ.VÖ.F=.V 000080
 08C48302 E91A119A 5306D076 FFD276FF 013BE903 74464739 260E4688 FC5EC4FE ±á^=.F.&9GFt.Ö;..v@.vÃ.S...Ö..Á. 0000A0
 C40A5713 26084703 26EC5EC4 D201E001 02578826 07882604 5EC40096 E90E4688 .F.Ö..á^Ã&..&.W.1Ã1@á^$&.G.&.W.á 0000C0
 89F25688 F0468814 74C00804 7F1A7CD2 08F25689 F0468902 57182607 2826D05E ^Ã&+.&.W..FÞ.V·.@|....ât..FÞ.V·. 0000E0
 5EC4D201 E0D10657 88260447 8826045E C466E888 46898A46 89C02886 56898446 FÇ.VÑ+â.Fo.F|Šfá^&&.G.&.W.1Ã1@á^ 000100
 047F1A7C D208F256 89F44689 06571826 04472826 D05EC40E 5713260C 470326EC &&.G.&.W.á^Ã&+G.&.W..FÞ.V·.@|... 000120
 7C000130 19E81BE8 8A568988 4689F256 88F04688 84468986 4689C028 147?008 .ât.+â.FÑ.FÇ.FÞ.V·.F|.VoŠ.Š.=..| 000140
 F07E8306 7F337C00 F27E8300 E89C7400 0830A174 000430FF 5DE9037F 0002. 14 .=....Ö].=..tÃ=..t.Š..-·.|3...-Þ 000160
 D076FFD2 76FF0CC4 83FFFF08 879AFC76 FFFE76FF 006A006A 50168446 8D287470 .t+.FÇ.Pj.j..v±.v=......á..v@.vÃ 000180
 0E0A76FF 0C76FFFC 76FFFE76 FF0E76FF 016A08C4 83FFFF1A 119AFC76 FFFE76FF .v±.v=......á.j..v..v±.v=.v..v.. 0001A0
 1EF088F8 88D25688 D04688EC 5EC40856 89064689 FE5688FC 46880CC4 830173E8 Òs..á..F=.V±.F..V.á^š.FÃ.V@.«.Þ. 0001C0
 56880646 88D88E01 0A881E56 00000CC8 C8C95F5E 1FFE72E9 1FA5F200 08890A8E .Ö¿...E.Ör±.^_èùà...V.|...Ã.F..V 0001E0
```

```
Dump of file SATURN:[PCCOMMON.DUMP.DLL]BRDNOPL.TMP;1 on 18-APR-1990 10:37:32.99
File ID (520,34,0)   End of file block 272 / Allocated 272

Virtual block number 93 (0000005D), 512 (0200) bytes

 0002F846 C762E810 46887475 020A7E83 0674010A 7E83FE56 89FC4689 00160508 .....F=.V±.-..t..-..ut.F.ŠbúF%.. 000000
 56880C46 88F65689 F4468902 57182607 2826FC5E C40E5688 0C468800 00FA46C7 úF*...F..V.á^=&+.&.W..F¶.V-.F..V 000020
 472826FC 5EC40E56 880C4688 0000FA46 C70003F8 46C73EE8 02578926 0789260E .&..&.W.Š>úF%..úF*...F..V.á^=&+G 000040
 74C00808 E80DE80A 57892608 4789260E 56880C46 88F65689 F446890A 57182608 .&.W..F¶.V-.F..V.&.G.&.W.Š.Š..ât 000060
 FC5EC40E 56880C46 88F84689 FA4689C0 2862E810 468872E8 00E8C474 0001309A .=..táŠ.Šr.F.Šb+â.F*.F%.F..V.á^= 000080
 46C73EE8 06578926 04478926 0E56880C 4688F656 89F44689 06571826 04472826 &+G.&.W..F¶.V-.F..V.&.G.&.W.Š>úF 0000A0
 88F65689 F446890E 5718260C 472826FC 5EC40E56 880C4688 0000FA46 C70001F8 %..úF*...F..V.á^=&+G.&.W..F¶.V-. 0000C0
 26065EC4 00E8C474 0001309A 74C00808 E80DE80E 5789260C 4789260E 56880C46 F..V.&.G.&.W.Š.Š..ât.=..táŠ.á^.& 0000E0
 F676FF15 74FF4878 83260775 FF467883 26065EC4 02E6C1F8 76880001 009487C7 ú......v%è|.á^.&.xF.u.&.xH.t..v- 000100
 D88E0337 881E0000 2AC8C8C9 5E1F0CC4 8306E8E8 0E5306F8 76FFFA76 FFF476FF .v¶.v*.v%.S.ÒÒ..á..^èùà*...|7..Ã 000120
 5689F846 89001605 C28CC388 F65689F4 46890056 05045788 26024788 26065EC4 á^.&.G.&.W..V..F¶.V-.û.ô....F%.V 000140
 0381E910 468808C4 83015C1A 119A0A76 FF0C76FF 5016F256 8CF04689 E0468DFA *.FÃ.FÞ.V·.P.v..v....\..á..F.Ö.. 000160
 88260847 8826F85E C4D85689 0646890A 57882608 47882 6F0 5EC4017D E90E4688 .F.Ö).á^Þ&.G.&.W..F=.VÃá^%&.G.&. 000180
 75D00805 2401309A D676FFD8 76FF37FF 260277FF 26F45EC4 DC5689DA 46890A57 W..FÖ.VÉá^¶&.w.&.7.vÃ.v=.0.$..Ãu 0001A0
 5E8D37FF 260277FF 26F45EC4 44E80856 88D64688 0874C008 C02802E8 00018805 .|..Š.+ä.ât..F=.VÃŠDá^¶&.w.&.7.^ 0001C0
 07CE9A05 4003EF9A DC8808EC 83053806 C79A0531 02C39AF4 5EC4052C 028F9AD6 ø.«.,.á^¶.û.1..ú.;..š..É.ÿ.ä..ö. 0001E0
```

Dump of file SATURN:[PCCOMMON.DUMP.DLL]BRDNOPL.TMP;1 on 18-APR-1990 10:37:32.99
File ID (520,34,0)   End of file block 272 / Allocated 272

Virtual block number 94 (0000005E), 512 (0200) bytes

```
4688FE56 89FC4689 05B700FC 9A505205 5604A69A 054F0256 9AD88808 C483054A J..á..Ä.V.O..Î.V.RP.=.ñ..F=.V±.F 000000
E1E9FE56 11FC4601 02578826 078826F4 5EC41075 FE563915 75FC4639 DC5688DA Ö.VÉ9F=u.9V±u.á^¶&..&.W..F=.V±ÖÄ 000020
DA46890E 57882F0C 478826F8 5EC40856 89064689 0E578826 0C478826 F05EC400 .á^Þ&.G.&.W..Fø.VÄá^¥&.G.&.W..FÖ 000040
00018805 75D00805 D601309A D676FFD8 76FF0477 FF260677 FF26F45E C4DC5689 .Vé^¶&.w.&.w..vÄ.vø.0.ø..Äu.¡.. 000060
C39A045F 8DF45EC4 05E1028F 9AD65E8D 48E80856 88D64688 0874C008 C02802E8 $.+á.át..Fø.VÄ$H.^ø.¢.Ä.á^¶._..û 000080
0402569A D88808C4 8305FF07 CE9A05F5 03EF9ADC 8808EC83 05F006C7 9A05E602 .Î..ú.Þ..å..É.ÿ.%..ö....á..Ä.V.. 0000A0
4688FE56 89FC4689 FFFF00FC 9A0477FF 260677FF 26F45EC4 50520616 04A69A06 ..Î...RPá^¶&.w.&.w..•....F=.V±.F 0000C0
EBFE5611 FC460106 57882604 478826F4 5EC41175 FE563916 75FC4639 DC5688DA Ö.VÉ9F=u.9V±u.á^¶&.G.&.W..F=.V±$ 0000E0
FF21E903 7500083D FF29E903 7500043D FE76E903 7F00023D 1A7C0001 301FEB21 !$.=..|.=....Öv±=..u.Ö).=..u.Öl. 000100
D1E9DE46 89C02802 E80001B8 0576FC46 39057F0C 7CFE5639 DC5688DA 468800E8 $..FÖ.VÉ9V±|...9F=v.¡..$.+á.FBÖl 000120
57882607 8826F85E C4D85689 D6468902 57882607 8826F05E C4017BE9 0E468801 ..F.Ö(.á^Þ&..&.W..Fø.VÄá^¥&..&.W 000140
0575D008 06E30130 9AD676FF D876FF37 FF260277 FF26F45E C4DC5689 DA468902 ..FÖ.Vé^¶&.w.&.7.vÄ.vø.0.D..Äu. 000160
D65E8037 FF260277 FF26F45E C444E808 56880646 880874C0 08C02802 E80001B8 ¡..$.+á.át..Fø.VÄ$Dá^¶&.w.&.7.^ø 000180
0907BE9A 06FF03EF 9ADC8808 EC8306FA 06C79A06 F002C39A F45EC406 E8028F9A .¢.$.á^¶.û.Þ..ú.ª..å..É.ÿ..../.. 0001A0
DA4688FE 5689FC46 89077600 FC9A5052 071504A6 9A070E02 569AD888 08C48307 ..á..Ä.V....Î...RP.•.v..F=.V±.FÖ 0001C0
00E1E9FE 5619FC46 29025788 26078826 F45EC410 75FE5639 1575FC46 390C5688 .VÉ9F=u.9V±u.á^¶&..&.W.)F=.V±ÖÄ. 0001E0
```

Dump of file SATURN:[PCCOMMON.DUMP.DLL]BRDNOPL.TMP;1 on 18-APR-1990 10:37:32.99
File ID (520,34,0)   End of file block 272 / Allocated 272

Virtual block number 95 (0000005F), 512 (0200) bytes

```
890A4689 06578826 04478826 F85EC408 56890646 89065788 26044788 26F05EC4 á^Þ&.G.&.W..Fø.VÄá^¥&.G.&.W..FÖ. 000000
E80001B8 05750008 07950130 9AD676FF D876FF04 77FF2606 77FF26F4 5EC4DC56 Vé^¶&.w.&.w..vÄ.vø.0....Äu.¡..$ 000020
02C39A04 5F8DF45E C407A002 8F9AD65E 8D48E808 56880646 880874C0 08C02802 .+á.át..Fø.VÄ$H.^ø.¢....á^¶._..û. 000040
07C30256 9AD88808 C483078E 078E9A07 8403EF9A DC8808EC 8307AF06 C79A07A5 É..ú.€..å..É.ÿ.Ç../../..á..Ä.V.û. 000060
DA4688FE 5689FC46 8904F800 FC9A0477 FF260677 FF26F45E C4505207 D504A69A .Î.Î.RPá^¶&.w.&.w..•.«..F=.V±.FÖ 000080
21E8FE56 19FC4629 06578826 04478826 F45EC411 75FE5639 1675FC46 390C5688 .VÉ9F=u.9V±u.á^¶&.G.&.W.)F=.V±$! 0000A0
E8FF21E9 03750008 30FF29E9 03750004 30FE78E9 037F0002 301A7C00 01301FEB $.=..|.=....Öx±=..u.Ö).=..u.Öl.$ 0000C0
E813E8DE 4689C028 02E80001 B80573FC 4639057C 0C7FFE56 390C5688 DA468800 ..FÖ.VÉ9V±..|.9F=s.¡..$.+á.FB$.$ 0000E0
76FFFE76 FF1076FF 1974000E 7E8300E8 FC70E903 75000130 FE39E903 75C00811 ..áu.Ö9±=..u.Öp•$..~B.t..v..v±.v 000100
047C881E 000012C8 C8C91F00 E8C0280C C483FAC2 E80E0676 FF0876FF 0E76FFFC •.v..v..v..Öó•.á.+á$..èùà....¡|. 000120
C40130E9 C0280575 1046080E 46880874 0C46080A 46881074 08460806 468808BE .Ä.F..F.t..F..F.t..F..F.u.+áÖÖ.á 000140
46890857 88260647 8826F056 89EE4689 001605C2 8CC388F2 46894647 8826065E ^.&.GF.F·.ú.ô....FŸ.VÞ&.G.&.W..F 000160
88260A5E C4767502 467F8326 07740146 7F8326F6 5689F446 89005E05 FA5689F8 ½.V•.^..F¶.V-&..F.t.&..F.uvá^.&. 000180
057F377C 02573926 EE5EC4FE 5689FC46 89025713 26070326 F45EC402 57882607 .&.W.á^¶&..&.W..F=.V±á^Ÿ&9W.|7.. 0001A0
FE5689FC 46890257 18260728 26F45EC4 0A578826 08478826 0A5EC430 72073926 &9.rÖá^.&.G.&.W.á^¶&+.&.W..F=.V± 0001C0
2B26EE5E C4FE5688 FC468800 9AE9C028 05770739 26057C0C 7F025739 26EE5EC4 á^Ÿ&9W...|.&9.w.+áÖ...F=.V±á^Ÿ&+ 0001E0
```

Dump of file SATURN:[PCCOMMON.DUMP.DLL]BRDNOPL.TMP;1 on 18-APR-1990 10:37:32.99
File ID (520,34,0)   End of file block 272 / Allocated 272

Virtual block number 96 (00000060), 512 (0200) bytes

```
26F45EC4 06578826 04478826 0A5EC47A E8025711 26070126 0E5EC402 571B2607 .&.W.á^.&..&.W.$zá^.&.G.&.W.á^¶& 000000
5EC43172 04473926 067F397C 06573926 EE5EC4FE 5689FC46 89065713 26044703 .G.&.W..F=.V±á^Ÿ&9W.|9..&9G.r1á^ 000020
573926EE 5EC4FE56 89FC4689 06571826 04472826 F45EC40E 5788260C 4788260A .&.G.&.W.á^¶&+G.&.W..F=.V±á^Ÿ&9W 000040
06571826 04472826 EE5EC4FE 5688FC46 8820E8C0 28047704 47392606 7C0C7F06 ...|.&9G.w.+á$ .F=.V±á^Ÿ&+G.&.W. 000060
08064688 088E087E 881E0000 1CC8C8C9 1F00E8C0 28065711 26044701 260E5EC4 á^.&.G.&.W.+á$..èùà....¡-..Ä.F.. 000080
47882606 5EC4015A E98DF388 06751046 080E4688 08740C46 080A4688 10740846 F.t..F..F.t..F..F.u.¡µ.ÖZ.á^.&.G 0000A0
E8FC4689 FE4689C0 280A5700 F09A5016 F4468050 52E65689 E4468944 57882642 B&.WD.FÖ.VÌRP.F¶.P.Þ.W.+á.F±.F=$ 0000C0
0FE90372 FC463908 7C0119E9 037EFE56 39F65688 F4468800 FE568301 FC468308 ..F=..V±..F¶.V-9V±-.Ö..|.9F=r.Ö. 0000E0
89FA5688 F8468801 8708689A 5016F846 80006AFC 76FFFE76 FFE476FF E676FF01 ..v|.vÖ.v±.v•j..F½.P.k....F½.V•. 000100
0E5EC478 E8464788 26E85EC4 EE5689EC 4689F256 89F04689 99C028EA 5689E846 FÖ.VÖ+á..FÞ.V·.F$.VŸá^Ö&.GF$xá^. 000120
88260E5E C473E8F2 5611F046 010E5718 260C4728 260A5EC4 0E578826 0C478826 &.G.&.W.á^.&+G.&.W..FÞ.V·$sá^.&. 000140
08478826 0E5EC455 E8F25611 F0460106 571B2604 4728260A 5EC40657 88260447 G.&.W.á^.&+G.&.W..FÞ.V·$Uá^.&.G. 000160
57882607 88260E5E C437E8EE 5611EC46 010A5718 26084728 260A5EC4 0A578826 &.W.á^.&+G.&.W..F$.VŸ$7á^.&..&.W 000180
E9037500 023DA174 00013D19 E818E8EE 5611EC46 01025718 26072826 0A5EC402 .á^.&+.&.W..F$.VŸ$.$.=..tÀ=..u.Ö 0001A0
0EE876FF EA76FF0E 76FF1076 FF5016EC 468000E8 AD740008 30007400 043DFF7B (.=..tÀ=..tÙ$..F$.P.v..v..vö.vÖ. 0001C0
FF006A00 6A5016EC 46801774 F24608F0 46880875 EE4608EC 46880CC4 83FD55E8 ÖU».á..F$.FŸu..FÞ.F·t..F$.Pj.j.. 0001E0
```

Dump of file SATURN:[PCCOMMON.DUMP.DLL]BRDNOPL.TMP;1 on 18-APR-1990 10:37:32.99
File ID (520,34,0)   End of file block 272 / Allocated 272

Virtual block number 97 (00000061), 512 (0200) bytes

```
0908881E 5600001E C8C8C91F 00E8C028 FED1E90C C4830205 08879AE8 76FFEA76 vô.vÒ...Í..á.Õl±+âŠ..èùà...V.|Ä. 000000
00FDE980 F3880675 030A7E83 067F0E7C 0A7C000C 7E831074 08460806 4688088E .Ä.F..F.t..-..|.|....-..v.|µ.Ö». 000020
46894850 88264640 8826065E C402E6C1 0A768800 F0E9C028 05751046 080E4688 .F..F.u.+âÕÞ..v.él.á^.&.ðF&.PH.F 000040
82878826 2828068E E3010A5E 8800CAE9 C0280575 FFFA830A 75FFFF30 FE5689FC ».V±»..u..ª.u.+âÕò..^.10..((&... 000060
880E7502 F27E8306 7401F27E 83EC5689 EA4689F0 5689EE46 8999C028 F2468901 ..F·+â..FŸ.VÞ.Fô.Vâ.-·.t..-·.u.. 000080
42478826 065EC4EC 5689EA46 8910568B 0E46880C E8F05689 EE468910 56880E46 F..V..FŸ.VÞŠ..F..V..Fõ.Vâá^.&.GB 0000A0
00FE5683 01FC4683 08E80C48 00F09A50 16F4468D 5052E456 89E24689 44578826 &.WD.Fâ.VØRP.F¶.P.Þ.H.Š..F»..V±. 0000C0
006AFC76 FFFE76FF E276FFE4 76FF4773 FC463905 7C4E7FFE 5639F656 88F44688 .F¶.V-9V±.N|.9F»sG.vô.vâ.v±.v»j. 0000E0
46473926 F24688E6 5EC4E856 89E64689 FA5688F8 46880A15 08689A50 16F8468D .F%.P.k....F%.Vª.Fl.VÒá^l.F·&9GF 000100
C95E1F00 E8C0289F E80CC483 08480887 9A530600 6A006A50 16EA4680 15E80274 t.Š..Fô.P|.j..Š...N..á.Š.+âŠ..^è 000120
587F8326 065EC402 51E980F3 88067508 46080646 88088E08 5E881E00 002CC8C8 ùà,...|^..Ä.F..F.u.|µ.Õ0.á^.&..X 000140
05EA5689 E8468904 57882602 47882602 39E9C028 05730156 7F832607 7C0E7F00 ...|.&..V.s.+âÕ9.&.G.&.W..FÒ.Vô. 000160
52FA568C F84689F0 46800656 89044689 44578826 42478826 E65689E4 4689005E ^..Fô.Vl&.GB&.WD.FÂ.V».FÞ.F%.VªR 000180
8800FE56 8301FC46 8308E8FC 4689FE46 89C0280D 2D00F09A 5016E046 8D0476FF .vâ.FÂ.P.Þ.-.+â.F±.F»Š..F»..V±.. 0001A0
FE76FFD4 76FF0676 FF01CFE9 0372FC46 39087C01 D9E9037E FE5639E2 5688E046 FÂ.Vã9V±~.Ôl.|.9F»r.Õü..v».vâ.v± 0001C0
83260C5E C4DE5689 DC4689EE 5688EC46 880C1408 689A5016 EC468000 6AFC76FF .v»j..Fš.P.k....Fš.VŸ.FÉ.Vßá^É&. 0001E0
```

Dump of file SATURN:[PCCOMMON.DUMP.DLL]BRDNOPL.TMP;1 on 18-APR-1990 10:37:32.99
File ID (520,34,0)   End.of file block 272 / Allocated 272

Virtual block number 98 (00000062), 512 (0200) bytes

```
FF26E45E C40A5689 D8468900 1605C28C C388A9E8 02750062 7F832609 7500687F .h.u.&..b.u.Š`.û.ô....FÂ.VÖá^ô&. 000000
08C02802 E8000188 0575000B 0D9F0130 9A37FF26 0277FF26 D85EC437 FF260277 w.&.7á^Ä&.w.&.7.0....Äu.|..Š.+â. 000020
A702C39A D85EC437 FF260277 FF26E45E C44DE802 57882607 8826085E C40C74C0 ât.á^Ä&..&.W.ŠHá^ô&.w.&.7á^Ä.û.Ï 000040
C403EF9A 0C8808EC 83008F06 999A282A 1E800085 06C79A0D AC02C39A E45EC400 .á^ô.û.`..û.ç...*(...¢..&..É.ÿ.á 000060
26F85EC4 00FF00FC 9A505200 DA04A69A 00030256 9A088808 C48300CE 078E9A00 ..ƒ.ö..á..Ä.V.Æ..Ì.Ö.RP.»...á^½& 000080
2601309A 0477FF26 0677FF26 D85EC404 77FF2606 77FF26E4 5EC40257 89260789 ...&.W.á^ô&.w.&.w.á^Ä&.w.&.w..0.& 0000A0
D85EC454 E8065788 26044788 26D85EC4 0074C008 C02802E8 00018805 7500080E ..Äu.|..Š.+â.ât.á^Ä&.G.&.W.ŠTá^Ä 0000C0
4906999A 282A1E8D 0E3F06C7 9A0E3602 C39A045F 8DE45EC4 0E3102C3 9A045F8D ._..û.1.á^ô._..û.6..ú.?...*(...Ì 0000E0
520E6F04 A69A0E50 02569A08 8808C483 0E5807BE 9A0E4E03 EF9ADC88 08EC830E ._&..É.ÿ.N..7.X..á..Ä.V.]..Ì.o.R 000100
26F85EC4 06578926 04478926 F85EC406 BA00FC9A 0477FF26 0677FF26 E45EC450 Pá^ô&.w.&.w..».o.á^½&.G.&.W.á^½& 000120
C4065788 26044788 26F85EC4 1A750257 39262075 07392608 5EC40257 88260788 ..&.W.á^Ä&9.u &9W.u.á^½&.G.&.W.á 000140
879ADC76 FFDE76FF F876FFFA 76FF006A 006A2C74 06573926 06750447 3926085E ^Ä&9G.u.&9W.t,j.j..vª.v½.v®.vÉ.. 000160
47C7260C 5EC408C4 83FFFF16 4E9A0676 FF0876FF EC76FFEE 76FF0CC4 830C7208 .r..á..vŸ.vâ.v..v..N....á.á^É&úG 000180
00000004 0EC10002 00000002 0ED50002 000690C8 C91F00E8 C028FE11 E9000068 h..Õ.±+âŠ..èù.....Í.......ê..... 0001A0
00000019 0C870002 00000017 00720002 00000014 0CE80002 00000009 04850002 ..ç.......Š.......r............. 0001C0
1046080E 46881074 0A460808 46881874 00067E83 D88EFFFF 881E5657 000014C8 à...WV.|...Ä.-..t..F..F.t..F..F. 0001E0
```

Dump of file SATURN:[PCCOMMON.DUMP.DLL]BRDNOPL.TMP;1 on 18-APR-1990 10:37:32.99
File ID (520,34,0)   End of file block 272 / Allocated 272

Virtual block number 99 (00000063), 512 (0200) bytes

```
1E0716F0 88F07E8D 1056880E 46881675 000C7E83 40E80275 14460812 46880874 t..F..F.u.ŠM.-..u..F..V..-Þ.Þ... 000000
F04680D8 E899C028 .574000C 7E83006A 006A1676 FF1876FF 1FA5F200 0889DA8E .Ö¿...É..v..v.j.j..-..t.+â.Š..FÞ 000020
04C8C8C9 5F5E1F12 C483125E FF0676FF 0876FF0A 76FF5052 D28CEE56 8CEC4689 .Fš.VŸ.ØRP.v..v..v..^..á..^ èùà. 000040
89000805 C28CC388 49E8C028 0475001A 7F83260A 5EC4088E 0008881E 56570000 ..WV.|...Äá^.&....u.+âŠl.û.Õ.... 000060
5EC41FE8 08C483FF FF0CFE9A 0676FF08 76FF5052 12740018 7F8326FE 5689FC46 F».V±&....t.RP.v..v..±....á.Š.á^ 000080
E8C02800 011847C7 260A5EC4 1FA5F200 08890A8E 1EF088F8 88085688 064688FC ».F..V..«.Þ..Ö¿..·É.á^.&úG...+âŠ 0000A0
FC4689EC 468DE656 8CE44689 D44680D8 8E008688 1E560000 32C8C8C9 5F5E1F00 ..^ èùà2..V.|...Ä.FÂ.FÒ.Vl.Fš.F» 0000C0
260877FF 26CE5EC4 005689CE 46890856 88064688 0008E907 8826065E C4FE568C .V±Ž^.&..ÕÜ..F..V..Fö.VÂá^ö&.w.& 0000E0
407F01D2 7E830246 FF03E800 000246C7 0000FFFF 9AE476FF E676FF01 6A0677FF .w.j..vl.vô.....úF@..Š..F@.-@..@ 000100
FF50EA76 FF237400 08EA5689 E846890C 5088260A 408826CE 5EC402E6 C1D27688 .v@èl.á^ö&.@.&.P..FÒ.Vô.Ât#.vôP. 000120
87E808C4 8300870C FE9AFC76 FFFE76FF E476FFE6 76FFFFFF 06489AFC 76FFFE76 v±.v».K....vl.vô.v±.v».±.ñ..á.Šñ 000140
76FFE676 FF016A06 77FF2608 77FF26CE 5EC40056 89CE4689 08568806 468879E8 Šy.F..V..Fö.VÂá^ö&.w.&.w.j..vl.v 000160
FF50EA76 FF237400 08EA5689 E846890C 5788260A 478826CE 5EC40000 FFFF9AE4 ô.....á^ö&.G.&.W..FÒ.Vô.Ât#.vôP. 000180
18E808C4 8301790C FE9AFC76 FFFE76FF E476FFE6 76FF0168 06489AFC 76FFFE76 v±.v».K.h..vl.vô.v±.v».±.y..á.Š. 0001A0
76FF0C76 FFE5E889 74000530 FF18E903 7F00043D F47C0003 3D14E82D E88E0388 |..Š-Š.=..|¶=....Ô..=..t.Šl.v..v 0001C0
D88E00ED 881E0000 48C8C8C9 5E1F00E8 C02808C4 83FE73E8 0EE476FF E676FF0A ..vl.vô.Ôs±.á.+âŠ..^èùàH...|Ú..Ä 0001E0
```

Dump of file SATURN:[PCCOMMON.DUMP.DLL]BRDNOPL.TMP;1 on 18-APR-1990 10:37:32.99
File ID (520,34,0)   End of file block 272 / Allocated 272

Virtual block number 100 (00000064), 512 (0200) bytes

```
89025788 26078826 0A5EC402 12E9C028 05750C46 080A4688 08740846 08064688 .F..F.t..F..F.u.+âÕ..á^.&..&.W.. 000000
46891A57 88261847 8826065E C4E25689 E0468906 57882604 478826C6 5689C446 Fâ.Vó&.G.&.W..FÅ.Vãá^.&.G.&.W..F 000020
0BFFFF0A 589A5C16 BC4680DC 76FFDE76 FF027D09 C29A006A 006A5052 DE56890C É.V8RPj.j..õ.)..v8.vÉ.F¥.P.X.... 000040
5689C846 89E65689 E446898E 5688BC46 88017EE9 0788268C 5EC401A6 E90374C0 àt.Õl.á^¥&..Õ~..F¥.V/.Fõ.Vl.Fà.V 000060
76FF08C4 83FDC3E8 0E505200 16050A76 FF0C76FF 2C740000 8C8F8326 C85EC4CA öá^à&.¢...t,.v..v....RP.Õü».á..v 000080
5688BC46 88014EE9 0CC483FF FF11009A E476FFE6 76FFC476 FFC676FF E076FFE2 ã.vÅ.vó.vá.vl.vö......á.ÕN..F¥.V 0000A0
4B9A5016 EC468D50 52387400 647F8326 C05EC4C2 5689C046 890A5689 D846898E /.FÅ.VÖ.Fâ.Vôá^à&..d.t8RP.Fâ.P.K 0000C0
76FFC676 FFE076FF E276FF08 C483FD6C E80E5016 EC4680DA 76FF0C76 FF01C806 .à..v..v..Fâ.P.Õl».á..vã.vÅ.vó.v 0000E0
46890656 89044689 8E5688BC 468800F7 E90CC483 FFFF0000 9AD876FF DA76FFC4 á.vÖ.vÅ......á.ÕX..F¥.V/.FÅ.Vø.F 000100
E276FF08 C483FD8C E80E5052 0A76FF0C 76FF2974 00347F83 26885EC4 8A568988 ¡.Vøá^¡&..4.t).v..v.RP.Õ.».á..vã 000120
8E5688BC 468800AF E90CC483 FFFF00E7 9A8C76FF 8E76FFC4 76FFC676 FFE076FF .vÅ.vó.vá.v/.v¥.Õ....á.ÕE..F¥.V/ 000140
E80E5052 0A76FF0C 76FF2974 002E7F83 26E85EC4 EA5689E8 4689CE56 89CC4689 .Fø.Vö.FÕ.Võá^Õ&....t).v..v.RP.Õ 000160
E80CC483 FFFF0575 9A8C76FF 8E76FFC4 76FFC676 FFE076FF E276FF08 C483FD44 D».á..vã.vÅ.vó.vá.v/.v¥.u....á.Š 000180
0C76FF2C 7400327F 8326FC5E C4FE5689 FC468902 56890046 898E5688 8C468868 h.F¥.V/.FÅ.V¥.F•.V±á^•&..2.t,.v. 0001A0
76FF8E76 FFC476FF C676FFE0 76FFE276 FF08C483 FC92E80E 5052000C 050A76FF .v....RP.Õ.•.á..vã.vÅ.vó.vá.v/.v 0001C0
D8028F04 1DA7FF2E 93C00314 77000530 0001201C E81EE80C C483FFFF 09CF9A8C ¥.ü....á.Š.Š.-..=..w..à...Ï....Û 0001E0
```

Dump of file SATURN:[PCCOMMON.DUMP.DLL]BRDNOPL.TMP;1 on 18-APR-1990 10:37:32.99
File ID (520,34,0)   End of file block 272 / Allocated 272

Virtual block number 101 (00000065), 512 (0200) bytes

```
75C00802 6D05D09A 016A006A 006ADC76 FFDE76FF FE43E903 C1037A03 32033202 .2.2.z.è.ÕC±.v8.vÉj.j.j..Å.m..âu 000000
0A4688D8 74084608 064688D8 8E021C88 1E560000 10C8C8C9 1F00E8C0 28E9E802 .ŠÕ+âŠ..èüà...V.¡...Å.F..F.t..F. 000020
260A5EC4 F85689F6 46891A57 88261847 8826065E C40091E9 8DF38806 750C4608 .f.u.¡µ.Õ..á^.&.G.&.W..F-.V½á^.& 000040
468DF676 FFF876FF 04A609C2 9A5050F6 76FF52FA 4689FC46 89C028FE 46890788 ...F±+â.F•.F°R.v-PP.ó.l..v½.v-.F 000060
848BE6D1 F088E3D1 FE5E88F4 46890788 26F05EC4 2875C008 04ED0A58 9A5016F0 Þ.P.X.Ü..âu(á^Þ&...F¶.^±ÌD.Þll.. 000080
FA76FFFC 76FFF676 FFF876FF C4E800FC 568301FA 46830AE8 027D0338 87390338 8.9.8.).Š..F°..V•.Šá.v½.v-.v•.v° 0000A0
CBC95E1F 00E8C028 04E88E07 880574C0 08043802 9D9A0A76 FF0C76FF 016A006A j.j..v..v....;..àt.¡..Š.+âŠ..^èü 0000C0
0004032A 00020000 00030301 00020000 000202D3 00020000 000101D9 00020008 ....).......Ø...............*... 0000E0
000401A2 02030000 00080404 00020000 000703BA 00020000 00050372 00020000 ....r.......¤...............Å... 000100
00000000 000000CC 0004012C 02030000 00190451 00020000 00140496 0002021E ............Q.........,...ä...... 000120
081E4688 087428+ 08264688 10742C46 082A4688 D88EFFFF 881E5657 00003EC8 à>..WV.¡...Ä.F*.F,t..F&.F(t..F.. 000140
FA5688F8 46880000 FFFF9A50 16F84680 2A76FF2C 76FF02E0 E98DF388 06752046 F u.¡µ.ÕÅ..v,.v*.F½.P......F½.V° 000160
2C76FFA5 F2000E89 07160348 8EC27E8D 028AE98D F1880675 D00BE656 89E44689 .Fõ.Vl.Åu.¡þ.Õ¤..~ô/H...¿..·É.v, 000180
3926057F 477C0257 3926EA56 88E84688 265EC400 00FFFF9A 5016E846 8D2A76FF .v*.FÕ.P.....á^&.FÕ.Võ&9W.|G..&9 0001A0
06573926 EE5688EC 46882077 07392605 7C347F02 573926F2 5688F046 88407207 .rã.FÞ.V·&9W..4|.&9.w-.F&.VŸ&9W. 0001C0
01880577 04473926 067C007F 06573926 F65688F4 46881972 04473926 067F217C |l..&9G.r..F¶.V-&9W...|.&9G.w.j. 0001E0
```

Dump of file SATURN:[PCCOMMON.DUMP.DLL]BRDNOPL.TMP;1 on 18-APR-1990 10:37:32.99
File ID (520,34,0)   End of file block 272 / Allocated 272

Virtual block number 102 (00000066), 512 (0200) bytes

```
8826E45E C4E25689 E0468900 7805E656 88E44688 0186E903 75C008C0 2802E800 .Š.+â.âu.ÕÑ..Fõ.Vl.x..FÅ.Vãá^õ&. 000000
75C008DE 4EFFDE46 8802E046 8304E800 06DE46C7 FE5689FC 46890A57 88260847 G.&.W..F•.V±úF8..Š..FÅ..F8.N8.âu 000020
8D1F74D0 08036A16 23036806 23245688 22468801 36E90788 26E05EC4 0171E903 .Õq.á^Å&..Õ6..F".V$#.h.#.j..Åt.. 000040
31E90144 E90374C0 080CC483 0CDAE80E FC76FFFE 76FF2676 FF2876FF 5016C246 Fõ.P.v(.v&.v±.v•.ÕÖ..á..ât.ÕD.Õl 000060
76FF2676 FF2876FF 5016C246 8D1F7400 08036E16 23036C06 23245688 22468801 ..F".V$#.l.#.n..Åt..Fõ.P.v(.v&.v 000080
23037006 23245688 22468800 FDE90110 E90374C0 080CC483 0FD4E80E FC76FFFE ±.v•.Õâ..á..ât.Õ..Õ»..F".V$#.p.# 0000A0
080CC483 11ACE80E FC76FFFE 76FF2676 FF2876FF 5016C246 8D1F7400 08037216 .r..Åt..Fõ.P.v(.v&.v±.v•.Õ^..á.. 0000C0
5016C246 8D1F74D0 08037616 23037406 23245688 22468800 C9E9000C E90374C0 Åt.ÕÉ.Õè..F".V$#.t.#.v..Åt..Fõ.P 0000E0
22468800 95E900A8 E90374C0 080CC483 12B4E80E FC76FFFE 76FF2676 FF2876FF .v(.v&.v±.v•.ÕÇ..á..ât.Õ´.Õ...F" 000100
FC76FFFE 76FF2676 FF2876FF 5016C246 8D1E7400 08037A16 23037806 23245688 .V$#.x.#.z..Åt..Fõ.P.v(.v&.v±.v• 000120
74D00803 7E162303 7C062324 56882246 8863E875 E80274C0 080CC483 138CE80E .Õ¥..á..ât.Šu$c.F".V$#.|.#.~..Åt 000140
E843E802 74C0080C C4831680 E80EFC76 FFFE76FF 2676FF28 76FF5016 C24680 1E ..Fõ.P.v(.v&.v±.v•.Õ...á..ât.ŠC$ 000160
03750004 3DFF1AE9 03750003 3DFEEEE9 03750002 3DFEC2E9 03750001 3D2FEB31 1$/=..u.Õô±=..u.ÕŸ±=..u.Õ..=..u. 000180
000E8907 1603488E C27E8DFE 7EE900E8 9F740006 3DFF72E9 03750005 3DFF46E9 ÕF.=..u.Õr.=..t.Š.Õ-±.-ô/H...¿.. 0001A0
26078926 C65688C4 46881A5E C410741C 46081A46 88078926 C246881E 5EC4A5F2 ·Éá^..Fõ&...F..F.t.á^..Fá.Vó&..& 0001C0
46081246 881FA5A5 A5A51F16 1EC87680 FB88165E C4107418 46081646 88025789 .W..F..F.t.á^..«.và...ÉÉÉÉ..F..F 0001E0
```

Dump of file SATURN:[PCCOMMON.DUMP.DLL]BRDNOPL.TMP;1 on 18-APR-1990 10:37:32.99
File ID (520,34,0)   End of file block 272 / Allocated 272

Virtual block number 103 (00000067), 512 (0200) bytes

```
46880E5E C4097410 46080E46 88025789 26078926 D2568800 4688125E C4107414 .t.á^..FÅ.V8&..&.W..F..F.t.á^..F 000000
065EC409 74084608 ^6468807 89260646 880A5EC4 09740C46 080A4688 07892604 â&...F..F.t.á^..F●&...F..F.t.á^. 000020
12468808 8E000888 E565700 0026C800 28CAC95F 5E1F00EB C0280789 260C4688 .FÈ&..+âŠ.._èò(.â&..WV.¡...Ä.F. 000040
065EC40C 74084608 0646881A 75084608 06468808 74104608 0E468810 74144608 .F.t..F..F.t..F..F.u..F..F.t.á^. 000060
76FF1476 FF078926 02478926 C028065E C401CCE9 8DF38807 89260247 8926C028 +â&.G.&..¡µ.Ôä.á^.+â&.G.&...v..v 000080
9AE98DF1 88067500 08F65689 F44689FE 5688FC46 88000000 369A5016 FC468012 ..F●.P.6....F●.V±.F¶.V~.Åu.¡þ.Ô. 0000A0
5EC41274 C0080000 FFFF9A50 16F84680 106A0E6A 50F24689 06478826 F45EC401 .á^¶&.G..F·Pj.j..F½.P......Åt.á^ 0000C0
F45EC4A5 F2000889 039A8EF8 88F85EC4 0168E98D F2880789 26024789 26C02806 .+â&.G.&..¡·.Ôk.á^½.«ƒ..¿..·Èá^¶ 0000E0
FF1474C0 08042C02 909AF876 FFFA76FF 006A016A 006A006A 0C77FF26 0E77FF26 &.w.&.w.j.j.j.j..v°.v½.....åt.. 000100
04478926 06478926 C028F85E C40128E9 8E078800 00FFFF9A F876FFFA 76FFF276 v·.v°.v½.....¡..Ô(.á^½+â&.G.&.G. 000120
4688F276 FF025789 26078926 F65688F4 4688F85E C4084789 260A4789 26F85EC4 á^½&.G.&.G.á^½.F¶.V~&..&.W..v·.F 000140
FF0C4789 260E4789 26C028F8 5EC41074 C008FFFF 00009A50 52000C05 FA5688F8 ½.V°...RP......åt.á^½+â&.G.&.G.. 000160
B90A8E1E 0716F088 E27E8D10 56880E46 8800CCE9 8E078801 D3E80EF8 76FFFA76 v°.v½.ÒŒ.¡..Ôä..F..V..~ã.Þ....Ö¿ 000180
0E4689E4 5688E246 882476E2 4639057F 287CE456 39EC5688 EA46881F A5F20008 ..·È..Fõ.V$9VÒ|+..9Fãv$.Fã.VÒ.F8 0001A0
5688EE46 88EC5689 EA4689E0 56880E46 88E45689 E24689EC 5688EA46 88E05689 .VÅ.Fõ.V$.Fã.VÒ.F8.VÅ.Fõ.V$.FŸ.V 0001C0
89F05688 EE46880C 56890A46 89E85688 E6468824 76E64639 057F287C E85639F0 Þ9VÒ|+..9F|v$.F|.VÒ.FÖ.VÉ.FŸ.VÞ. 0001E0
```

Dump of file SATURN:[PCCOMMON.DUMP.DLL]BRDNOPL.TMP;1 on 18-APR-1990 10:37:32.99
File ID (520,34,0)   End of file block 272 / Allocated 272

Virtual block number 104 (00000068), 512 (0200) bytes

```
FF260A77 FF26F45E C40A76FF 0C76FFF0 5689EE46 89DC5688 DA4688E8 5689E646 F|.VÒ.FÖ.VÉ.FŸ.VÞ.v..v.á^¶&.w.&. 000000
E80EF876 FFFA76FF 0F74C008 10C48325 00E80EF8 76FFFA76 FF5016E2 46800877 w..Fã.P.v°.v½.Òï%.á..åt..v°.v½.Ò 000020
CAC95F5E 1F00EBC0 28025789 26078926 FA5688F8 4688065E C414E88E 0688011A ..¡..Š.á^..F½.V°&..&.W.+âŠ.._èò 000040
E88DF388 05750846 08064688 08740C46 080A4688 088E0319 881E0000 00C80010 ..à....¡...Ä.F..F.t..F..F.u.¡µ.Š 000060
C80008CA C91F00EB C0280257 89260789 26065EC4 06578826 04478826 0A5EC419 .á^.&.G.&.W.á^.&..&.W.+âŠ..èò..à 000080
FC468912 56881046 8800A0E9 8DF38806 75124608 10468808 8E052888 1E000008 ....¡(..Ä.F..F.u.¡µ.Ö...F..V..F● 0000A0
57882604 478826FC 5EC40847 89260A47 8926C028 FC5EC400 74000E7E 83FE5689 .V±.~..t.á^=+â&.G.&.G.á^●&.G.&.W 0000C0
02478926 C028065E C4000007 C7260A5E C4167208 47392606 7F1E7C0A 57392606 .&9W.|...&9G.r.á^.&ú...á^.+â&.G. 0000E0
57832601 08478326 0877FF26 0A77FF26 0C77FF26 0E77FF26 FC5EC452 E8078926 &..ŠRá^=&.w.&.w.&.w.&.w.&.G..&.W 000100
0A5EC407 8826F85E C420E88E 06880574 C0080309 08689A50 16F8468D 006A000A ..j..F½.P.k.\..åt.¡..Š á^½&..á^. 000120
000010C8 000ECAC9 1F00E8C0 28025789 26078926 FA5688F8 4688065E C4078926 &..á^..F½.V°&..&.W.+âŠ..èò..à... 000140
C4F65689 F4468908 56880646 880099E9 C0280575 08460806 4688088E 0565881E .¡e..Ä.F..F.u.+àÒ...F..V..F¶.V~á 000160
FE5689FC 46890E57 88260C47 8826F05E C4F25689 F0468902 57882607 8826F45E ^¶&..&.W..FÞ.V·á^Þ&.G.&.W..F●.V± 000180
1376FFF8 7E83067F 187CFFFA 7E830691 091E9A50 16F8468D F476FFF6 76FF5052 RP.v~.v¶.F½.P......~°.|.....~½.v. 0001A0
00740E47 08260C47 8826F45E C406AB05 009A006A F876FFFA 76FFFC76 FFFE76FF .v±.v=.v°.v½j..Å.¨.á^¶&.G.&.G.t. 0001C0
08000003 E99AF476 FFF676FF 0677FF26 F05EC405 EC00689A 0C77FF26 0E77FF26 &.w.&.w..h.ś.á^Þ&.w..v~.v¶.Ö.... 0001E0
```

Dump of file SATURN:[PCCOMMON.DUMP.DLL]BRDNOPL.TMP;1 on 18-APR-1990 10:37:32.99
File ID (520,34,0)   End of file block 272 / Allocated 272

Virtual block number 105 (00000069), 512 (0200) bytes

```
46081E46 88088E06 22881E00 0006C800 04CAC91F 00E8C028 04E880F2 880574C0 åt.¡·.Š.+âŠ..èò..à....¡"..Ä.F..F 000000
260477FF 26025FC4 26FA5EC4 FC5689FA 46892056 881E4688 67E880F3 88057520  u.¡µ.Šg.F..V .F°.V=á^°&á_.&.w.& 000020
1276FF14 76FF1676 FF1876FF 1A76FF1C 76FF0677 FF260877 FF26FA5E C40277FF .w.á^°&.w.&.w..v..v..v..v..v..v. 000040
5EC40074 C008FE46 890C00FF FF9A0676 FF0876FF 0A76FF0C 76FF0E76 FF1076FF .v..v..v..v..v..v........F±.Åt.á^ 000060
4688088E 06D7881E 00001AC8 001CCAC9 1F00E8C0 2804E88E 06880000 07C72616 .&ú...¡..Š.+âŠ..èò..à....¡µ..Ä.F 000080
125EC4FA 46890788 26165EC4 00FAE980 F3880675 14460812 46880874 1846.116 ..F.t..F..F.u.¡µ.Ö°.á^.&...F°á^. 0000A0
F5880674 04EE7E83 0C7403EE 7E830C75 04FA7E83 067403FA 7E83EE46 89078.76 &...FŸ.~°.t..~°.u..~Ÿ.t..~Ÿ.t.¡% 0000C0
26EA5EC4 F45689F2 46891456 88124688 EC5689EA 46891856 88164688 00CAE9.D .Òò..F..V..Fõ.V$.F..V..F·.V¶á^ò& 0000E0
88016A50 52FE5689 FC468908 57882606 478826F8 5689F646 89045788 26024788 .G.&.W..F~.V½&.G.&.W..F=.V±RPj.. 000100
5EC4FC76 FFFE76FF 0277FF26 0477FF26 F65EC400 00FFFF9A 50520016 05C28CC3 ü.ò...RP.....á^~&.w.&.w..v±.v=á^ 000120
0000FFFF 9A0676FF 0876FF0A 76FF0C76 FF0E76FF 1076FF06 77FF2608 77FF26F2 ·&.w.&.w..v..v..v..v..v..v...... 000140
5016E646 80FC76FF FE76FF2C 75043F83 26EA5EC4 42E88E03 880574C0 08F04689 .FÞ.åt.¡..ŠBá^ò&.?.u,.v±.v=.F|.P 000160
C483FFFF 01599A16 76FF1876 FF0E7602 E67E8306 7F167C00 E87E8300 00FFFF9A ......~Ò.|....~|.v..v..v..Y....á 000180
76FFD88E 075A881E 5600000A C80014CA C91F00E8 C0280001 3847C726 EA5EC404 .á^ò&úG8..+âŠ..èò..à...V.¡Z..Ä.v 0001A0
F9880575 D008FA56 89F84689 FE5688FC 46880000 03679A50 16FC4680 0A76FF0C ..v..F=.P.g....F=.V±.F½.V°.Åu.¡° 0001C0
5EC40088 26065EC4 E601F676 88147006 F67E83F6 46FF03E8 0000F646 C728E880 .Š(úF~..Š..F~.~~.)..v~||á^.&..á^ 0001E0
```

Dump of file SATURN:[PCCOMMON.DUMP.DLL]BRDNOPL.TMP;1 on 18-APR-1990 10:37:32.99
File ID (520,34,0)   End of file block 272 / Allocated 272

Virtual block number 106 (0000006A), 512 (0200) bytes

```
46080646 88D88E08 7A881E00 0018C800 08CAC95E 1F00E8C0 28E3E878 408926F8 %&.ax$D+á$..^èb..à....|z..Ä.F..F 000000
06478826 065EC400 0007C726 0E5EC400 ADE980F3 88067510 46080E46 88087408 .t..F..F.u.|µ.ÕU.á^.&ú...á^.&.G. 000020
8300012D FA5688F8 46880000 08419A50 16F84680 5052FE56 89FC4689 08578826 &.W..F=.V±RP.F%.P.A....F%.V°-... 000040
4680006A 0A76FF0C 76FFFC76 FFFE76FF 6EE8C028 04750C56 3809750A 4638000A Ö.;F.u.;V.u.+á$n.v±.v=.v..v.j..F 000060
4680006A 50520002 83000105 0C5688OA 4688FC76 FFFE76FF 00000964 9A5016F0 Þ.P.d....v±.v=.F..V.....@.RPj..F 000080
000107C7 260E5EC4 0A75F656 390F75F4 4639EE56 88EC4688 0000FFFF 9A5016E8 Ò.P......F&.VŸ9F¶u.9V~u.á^.&ú... 0000A0
C91F00E8 C0280002 07C7260E 5EC40875 F2563900 75F04639 EA5688E8 468818E8 $..FÒ.Võ9FÞu.9V u.á^.&ú...+á$..è 0000C0
80F38806 750C4608 UA468808 7408460B 064688D8 8E080788 1E565700 0028C8C8 ùà(..WV.|ø..Ä.F..F.t..F..F.u.|µ. 0000E0
F088EC7E 80085688 064688FE 568CFC46 89EC4680 EA568CE8 4689E046 80O446E9 ÕF..FÄ.FÕ.Võ.F&.F=.V±.F..V..-&.Þ 000100
02578326 06078326 FC5EC400 000A46C7 00060846 C71FA5F2 0008890A 8E1E0716 ....Ö¿..·É.úFÄ..úFÕ..á^=&...&.W. 000120
26044701 260A5688 084688FC 5EC40A57 19260847 29260A56 88084688 FC5EC400 .á^=.FÄ.VÖ&)G.&.W.á^=.FÄ.VÖ&.G.& 000140
5EC40257 88260788 26FC5EC4 0E571926 0C472926 0A568808 4688FC5E C4065711 .W.á^=.FÄ.VÖ&)G.&.W.á^=&..&.W.á^ 000160
067F427C 0A573926 FC5EC402 57882607 88265272 07392605 7F597C02 5739260A .&9W.|Y..&9.rR&..&.W.á^=&9W.|B.. 000180
C4217204 47392606 7F297C06 5739260A 5EC40657 88260447 88263A72 08473926 &9G.r:&.G.&.W.á^.&9W.|)..&9G.rIá 0001A0
02E80001 88057704 47392606 7C0D7F06 5739260A 5EC40E57 88260C47 8826FC5E ^=&.G.&.W.á^.&9W...|.&9G.w.|..$. 0001C0
5E880346 E9037C08 DE7E83DE 46FF03E8 0000DE46 C7035EE9 C0280574 C008C028 +á.àt.+áÕ^.úFß..$..Fß.-ß.|.ÕF..^ 0001E0
```

Dump of file SATURN:[PCCOMMON.DUMP.DLL]BRDNOPL.TMP;1 on 18-APR-1990 10:37:32.99
File ID (520,34,0)   End of file block 272 / Allocated 272

Virtual block number 107 (0000006B), 512 (0200) bytes

```
A5A5A5DA 8E1E0716 F088E07E 8D085688 06468802 08E90C46 89038A87 88E3D1DE ßÌD.....FÉÕ...F..V..-Á.Þ....ÕEEE 000000
E446890E 5788260C 478826E2 5689E046 89025788 26078826 065EC402 17E91FA5 É.Õ..á^.&..&.W...FÄ.Vã&.G.&.W..FÕ 000020
D8E91FA5 A5A5A5DA 8E1E0716 F088E07E 8D000805 08568806 468801F6 E9E65689 .VÌÕ-..F..V.....-Á.Þ....ÕEEEE.ÕU 000040
E65689E4 46890657 88260447 8826E256 89E04689 0A578826 08478826 065EC401 .á^.&.G.&.W...FÄ.Vã&.G.&.W...FÕ.VÌ 000060
065EC402 57892607 8926FC5E C4000A83 00052002 57882607 8826065E C40189E9 Õ¿.á^.&..&.W.-...Ö.á^=&..&.W.á^. 000080
00050502 57882607 8826065E C4065789 26044789 26FC5EC4 06578826 04478826 &.G.&.W.á^=&.G.&.W.á^.&..&.W.... 0000A0
0C478926 FC5EC40E 5788260C 47882606 5EC40A57 89260847 8926FC5E C4000283 .@.á^=&.G.&.W.á^.&.G.&.W.á^=&.G. 0000C0
89260789 26FC5EC4 000A8300 052D0A57 88260847 8826065E C40155E9 0E578926 &.W.ÕU.á^.&.G.&.W.-...Ö.á^=&..&. 0000E0
26084788 26065EC4 06578926 04478926 FC5EC406 57882604 47882606 5EC40257 W.á^.&.G.&.W.á^=&.G.&.W.á^.&.G.& 000100
C40E5788 260C4788 26065EC4 0A578926 08478926 FC5EC400 D2830005 050A5788 .W.....@.á^=&.G.&.W.á^.&.G.&.W.á 000120
57892607 8926FC5E C4025788 26078826 065EC400 EFE90E57 89260C47 8926FC5E ^=&.G.&.W.Õÿ.á^.&..&.W.á^=&..&.W 000140
065EC406 57892604 478926FC 5EC4000A 83000520 0E578826 0C478826 065EC402 .á^.&.G.&.W.-...Ö.á^=&.G.&.W.á^. 000160
05050E57 88260C47 8826065E C40A5789 26084789 26FC5EC4 0A578826 08478826 &.G.&.W.á^=&.G.&.W.á^.&.G.&.W... 000180
26FC5EC4 02578826 07882606 5EC4008A E90E5789 260C4789 26FC5EC4 00?28300 ..@.á^=&.G.&.W.Õ..á^.&..&.W.á^=& 0001A0
89260447 8926FC5E C4000A83 00052D06 57882604 47882606 5EC40257 8926 789 ..&.W.á^.&.G.&.W.-...Ö.á^=&.G.&. 0001C0
26044788 26065EC4 0A578926 08478926 FC5EC40A 57882608 47882606 5EC40?57 W.á^.&.G.&.W.á^=&.G.&.W.á^.&.G.& 0001E0
```

Dump of file SATURN:[PCCOMMON.DUMP.DLL]BRDNOPL.TMP;1 on 18-APR-1990 10:37:32.99
File ID (520,34,0)   End of file block 272 / Allocated 272

Virtual block number 108 (0000006C), 512 (0200) bytes

```
1C770009 3D00012D 24E826E8 0E578926 0C478926 FC5EC400 D2830005 05065788 .W.....@.á^=&.G.&.W.$&$$-..=..w. 000000
04DC7E83 08060821 08A70CFC 0AE50ACD 08430CFC 0C000C72 0CE8A7FF 2E93C003 .á...ÌÒ.r...=.C.ë.Ì.=.Ì.I....~É. 000020
E85EC460 7400DC7E 83737402 DC7E8379 7401DC7E 837F7408 DC7E8300 85E90375 u.Õ...~É.t..~É.ty.~É.ts.-É.tmá^Õ 000040
57882607 8826E85E C4025789 26078926 FC5EC400 DA830005 2D025788 26078826 &..&.W.-...Õ.á^=&..&.W.á^Õ&..&.W 000060
00052D06 57882604 478826E8 5EC40A57 89260847 8926FC5E C4000283 00050502 .....@.á^=&.G.&.W.á^Õ&.G.&.W.-.. 000080
C4000283 00050506 57882604 478826E8 5EC40657 89260447 8926FC5E C4000A83 .Õ.á^=&.G.&.W.á^Õ&.G.&.W.....@.á 0000A0
26057F59 7C025739 260A5EC4 02578826 078826FC 5EC40E57 89260C47 8926FC5E ^=&.G.&.W.á^=&..&.W.á^.&9W.|Y..& 0000C0
04478826 3A720847 3926067F 427C0A57 3926FC5E C4025788 26078826 52720739 9.rR&..&.W.á^=&9W.|B..&9G.r:&.G. 0000E0
0E578826 0C478826 FC5EC421 72044739 26067F29 7C065739 260A5EC4 06578826 &.W.á^.&9W.|)..&9G.rIá^=&.G.&.W. 000100
E80C4688 0574C008 C02802E8 00018805 77044739 26067C0D 7F065739 260A5EC4 á^.&9W...|.&9G.w.|..$.+á.àt..FÉ$ 000120
FC4689EC 4680088E 09A9881E 56570000 24C8C8C9 5F5E1F00 E8000888 FCAEE908 .ÕÚ=|..$..^_èùà$..WV.|`..Ä.F&.F= 000140
0A589A50 16E84680 0676FF08 76FF0E40 09C29A00 6A006A06 76FF0876 FFFE568C .V±.v..v.j.Ì..ó.ã..v..v..FÕ.P.X. 000160
40578826 3E478826 DC5EC40E 56890C46 89EA5688 E8468801 58E90374 C0080E70 p..àt.ÕX..FÕ.Võ.FÉ.Vßá^É&.G>&.Wã 000180
237400E4 7E83067F 287C00E6 7E830670 00F09A50 16E44680 5052E256 89E04689 .FÄ.VãRP.FÕ.P.Þ.p..~I.|+...~Õ.t# 0001A0
00018806 74C0080C C483FF78 E80EE076 FFE276FF 0A76FF0C 76FF0E76 FF1076FF .v..v..v..v..vã.vÅ.Õx..á..àt.|.. 0001C0
26FC5EC4 1FA5F200 0889DA8E 1E0716F0 88EC7E8D 001605DE 5688DC46 880102E9 Õ...FÉ.Vß....~&.Þ....Õ¿..·É.á^=& 0001E0
```

Dump of file SATURN:[PCCOMMON.DUMP.DLL]BRDNOPL.TMP;1 on 18-APR-1990 10:37:32.99
File ID (520,34,0)   End of file block 272 / Allocated 272

Virtual block number 109 (00000060), 512 (0200) bytes

```
5F832605 046F832C FC5EC400 0A578326 05084783 26FC5EC4 00025F83 26052F83 ./.&. ..á^=&.G..&.W..á^=&.o..&._ 000000
02573926 0A5EC402 57882607 8826FC5E C4000E57 8326050C 478326FC 5EC40006 ..á^=Ē.G..&.W..á^=&..&.W.á^.&9W. 000020
72084739 26067F42 7C0A5739 26FC5EC4 02578826 07882652 72073926 057F597C |Y..&9.r R&..&.W.á^=&9W.|B..&9G.r 000040
478826FC 5EC42172 04473926 067F297C 06573926 0A5EC406 57882604 4788263A :&.G.&.W.á^.&9W.|)..&9G.r!á^=&.G 000060
74C008C0 2802E800 01880577 04473926 067C0D7F 06573926 0A5EC40E 5788260C .&.W.á^.&9W...|.&9G.w.¡..$.+à.åt 000080
0A76FF0C 76FF0457 89260247 8926EA56 88E8468B 0E5EC400 0107C726 0E5E 430 =á^.&ú...á^..FÒ.VÒ&.G.&.W..v..v. 0000A0
91E907E8 0001881A 4789260E 5EC408C4 83FA12E8 0E505200 16050E56 88DC4.98 .Fé.VB...RP.Ò.ª.á.á^.&.G.¡..$.Õ. 0000C0
89003605 08568806 4688088E 0E16881E 56570000 1EC8CBC9 5F5E1F00 EBC028FE ±+à$..^_èùà...WV.¡...Ã.F..V..6.. 0000E0
26527207 3926057F 597C0257 39260A5E C4025788 26078826 FC5EC4FE 5689FC46 F=.V±á^=&..&.W.á^.&9W.|Y..&9.rR& 000100
C4065788 26044788 263A7208 47392606 7F427C0A 573926FC 5EC40257 88260788 ..&.W.á^=&9W.|B..&9G.r:&.G.&.W.á 000120
39260A5E C40E5788 260C4788 26FC5EC4 21720447 3926067F 297C0657 39260A5E ^.&9W.|)..&9G.r!á^=&.G.&.W.á^.&9 000140
47882606 5EC4000F E90374C0 08C02802 E80001B8 05770447 3926067C 007F0657 W...|.&9G.w.¡..$.+à.åt.ÒÒ.á^.&.G 000160
05C28CC3 88008AE9 0375C008 077F00C3 E90370D2 08F85689 F646895A 57882658 X&.W2.F-.V%.Ø).Òù....åu.Õ¤..ù.ò. 000180
89E64689 02571826 07282604 5EC40257 88260788 26F25EC4 F45689F2 46890016 ...F .V¶á^ &..&.W.á^.&+.&.W..F|. 0001A0
5E8DE456 89E24689 06571826 04472826 0A5EC406 57882604 478826F2 5EC4E856 VÒá^ &.G.&.W.á^.&+G.&.W..Fã.VÒ.^ 0001C0
8F9AE25E 8D10C102 8F9AE25E 8D108906 C29A1081 028F9AE6 5E8D10AC 028F9AE6 |.¢.¯..^|.¢.Ÿ..ô.¿..^ã.¢.è..^ã.¢ 0001E0
```

Dump of file SATURN:[PCCOMMON.DUMP.DLL]BRDNOPL.TMP;1 on 18-APR-1990 10:37:32.99
File ID (520,34,0)   End of file block 272 / Allocated 272

Virtual block number 110 (0000006E), 512 (0200) bytes

```
8D08C483 FFFF0785 9A100A03 EF9ADC88 08EC8310 0506019A 10C806C2 9A10C602 .ó..ô.ù..î.í..å..Ê.ÿ.Ò..ç.....á.. 000000
D69A1101 028F9AF6 5E8D10FC 02329AEA 5E8D1FA5 A5A5A50A 8E1E0716 F088EA7E ~ô.Þ....ÒEEEE..^ô.2.=..^-.¢.....ø 000020
0207C726 0E5EC41E EBC02804 E80274C0 08FA4689 C02802E8 00018805 7210A406 .Ê.r.¡..$.+à.Fª.åt.$.+à$.á^.&ú.. 000040
000018C8 CBC95F5E 1F00E800 01880457 89260247 89260856 88064688 0E5EC400 .á^..F..V.&.G.&.W.¡..$..^_èùà... 000060
5016FC46 8D0676FF 0876FF11 6309C29A 006A006A 0676FF08 76FFD88E 0F82881E .¡ý..Ã.v..v.j.j..ô.c..v..v..F=.P 000080
263E4788 26EC5EC4 EE5689EC 4689FE56 88FC4688 0080E903 74C00811 930A589A .X....åt.Õ¯..F=.V±.F&.VŸá^&&.G>& 0000A0
F87E8306 7F2A7C00 FA7E830E 3000F09A 5016F846 8D5052F6 5689F446 89405788 .WØ.F¶.V-RP.F%.P.Þ.O..-ª.|*...-% 0000C0
0574C008 0CC483FF 83E80EF4 76FFF676 FF0A76FF 0C76FF0E 76FF1076 FF227400 .t".v..v..v..v..v-.v¶.Ò...á..åt. 0000E0
EF09C29A 006A006A 5052EA56 89E84689 44578826 42478826 EC5EC458 E80001B8 ¡..$(á^&&.GB&.WD.FÒ.VÒRPj.j..ô.ÿ 000100
76FF0C76 FF0E76FF 1076FF24 75C00811 530A589A 5016F046 8DE876FF EA76FF11 ..vô.vÒ.FÞ.P.X.S..åu$.v..v..v..v 000120
00E8C028 FF39E9C8 E809E800 01880574 C0080CC4 83FD9FE8 0EF076FF F276FF0A ..v·.vÞ.Ò.».á..åt.¡..$.$àÒ9.+à$. 000140
7400107E 83067500 0A7E8318 74020A7E 83D88E11 42881E56 5700001A C8CBC91F .èùà...WV.¡B..Ã.~..t..~..u..~..t 000160
46800C76 FF0E76FF 0676FF08 76FF00F1 E9C02805 7500127E 83087501 0A7E830C ..~..u..~..u.+àÒþ..v..v..v..v..F 000180
C008EA46 89F456E8 0E5016F8 46805016 F0468050 16F44680 5016EC46 805016F6 -.P.F±.P.F¶.P.FÞ.P.F%.P.ÒV¶.Fõ.à 0001A0
FA83E856 89E64689 18578826 16478826 145EC400 86E9C028 057500F6 7E830675 u..~-.u.+àÒÑ.á^.&.G.&.W..F|.VÒ.ª 0001C0
82E9C028 0572EC46 39057F0C 7CEE5639 E85688E6 46881776 FFFF3005 7F1E7CFF .|...=..v..F|.VÒ9VŸ|...9F&r.+àÒ. 0001E0
```

Dump of file SATURN:[PCCOMMON.DUMP.DLL]BRDNOPL.TMP;1 on 18-APR-1990 10:37:32.99
File ID (520,34,0)   End of file block 272 / Allocated 272

Virtual block number 111 (0000006F), 512 (0200) bytes

```
57892602 47892608 56880646 88145EC4 07892603 84848BE6 D10A7688 145EC400 .á^..v.!!....&..á^..F..V.&.G.&.W 000000
260E4789 26F25688 F0468814 5EC41FA5 A5A5A51F 161EF876 8D067F8D 145EC404 .á^.....v%...EEEE.á^..FÞ.V·&.G.& 000020
7E835052 00140516 56881446 88287500 F47E8312 478926F4 4688145E C4105789 .W.á^..F¶&.G..~¶.u+.F..V....RP.- 000040
01880CC4 83F596E8 0E0676FF 0876FF50 52F25688 F0468806 EB99C028 05740012 ..t.+à.$..FÞ.V·RP.v..v..Ò.%.á.¡. 000060
6A006A06 76FF0876 FF0000EE 46C7D88E 1228881E 000022C8 CBC95F5E 1F00EB00 .$..^_èùà"...¡+..ÀúFÝ...v..v.j.j 000080
FC468800 FFE90374 C00813A4 0A589A50 16FC468D 0676FF08 76FF1374 09C29A00 ..ò.t..v..v..F=.P.X.É...åt.Ò...F= 0000A0
16F4468D 5052F256 89F04689 40578826 3E478826 E65EC4E8 5689E646 89FE5688 .V±.F!.Vöå^!&.G>&.WØ.FÞ.V·RP.F¶. 0000C0
0A76FF0C 76FF0E76 FF1076FF 227400F4 7E83067F 2A7C00F6 7E8313F0 00F09A50 P.Þ.Þ..--.|*...-¶.t".v..v..v..v. 0000E0
57882642 478826E6 5EC40001 EE46C705 74C0080C C483FF7E E8DEF076 FFF276FF .v·.vÞ.Ò-..á..åt.úFÝ..á^!&.GB&.W 000100
0A589A50 16EA468D DE76FFE0 76FF1400 09C29A00 6A006A50 52E05689 DE468944 D.F8.VÀRPj.j..Ò....vÀ.v8.Fõ.P.X. 000120
6A006A48 77FF264A 77FF26E2 5EC4E456 89E24689 EC5688EA 46887375 C0081424 $..åus.Fõ.V±.F&.Vöå^&&.wJ&.wHj.j 000140
C43775C0 0811DF0A 589A5016 F8468D48 77FF264A 77FF26E2 5EC41439 09C29A00 ..ò.9.á^&&.wJ&.wH.F%.P.X.Ò..åu7á 000160
77FF2606 77FF260A 76FF0C76 FF016A00 6A0E76FF 1076FF28 7500047F 8326F85E ^%&....u+.v..v.j.j..v..v.&.w.&.w 000180
EBEE4688 FEEAE9FF 79E9B0E8 0001EE46 C70574C0 0812C483 FDBBE80E 37FF2602 .&.7.ÒÉ».á..åt.úFÝ..$¯Òy.Òò±.FÝ$ 0001A0
09C29A00 6A006A06 76FF0876 FF0000EE 46C7D88E 134E881E 000022C8 CBC91F00 ..èùà"...¡N..ÀúFÝ...v..v.j.j..ò. 0001C0
89FE5688 FC468800 FFE90374 C00814E0 0A589A50 16FC468D 0676FF08 76FF1480 ¯..v..v..F=.P.X.Á..åt.Ò...F=.V±. 0001E0
```

```
Dump of file SATURN:[PCCOMMON.DUMP.DLL]BRDNOPL.TMP;1 on 18-APR-1990 10:37:32.99
File ID (520,34,0)   End of file block 272 / Allocated 272

Virtual block number 112 (00000070), 512 (0200) bytes

 00F09A50 16F4468D 5052F256 89F04689 40578B26 3E478B26 E65EC4E8 5689E646 F|.VÐá^|&.G>&.W@.FÞ.V·RP.F¶.P.Þ. 000000
 FFF276FF 0A76FF0C 76FF0E76 FF1076FF 227400F4 7E83067F 2A7C00F6 7E831364 d..—.|*...~¶.t".v..v..v..v..v·. 000020
 DE468944 578B2642 478B26E6 5EC40001 EE46C705 74C0080C C483FF7E E80EF076 vÞ.Ð~..á..ât.úFŸ..á^|&.GB&.WD.FB 000040
 C00B1560 0A589A50 16EA468D DE76FFE0 76FF153C 09C29A00 6A006A50 52E05689 .VÅRPj.j..ô.<..vÅ.vB.Fõ.P.X.'..á 000060
 09C29A00 6A006A4C 77FF264E 77FF26E2 5EC4E456 89E24689 EC568BEA 46887375 us.Fõ.V&.Fâ.VÐá^ã&.wN&.wLj.j..ô. 000080
 8326F85E C43775C0 0814A00A 589A5016 F846804C 77FF264E 77FF26E2 5EC41575 u.á^ã&.wN&.wL.F%.P.X....áu7á^½&. 0000A0
 37FF2602 77FF2606 77FF260A 76FF0C76 FF006A01 6A0E76FF 1076FF2B 7500047F ...u+.v..v.j.j..v..v.&.w.&.w.&.7 0000C0
 C8C91F00 E8EE468B FEEAE9FF 79E9B0EB 0001EE46 C70574C0 0812C483 FC7FE80E .Ò.=.á..ât.úFŸ..Š¯Ðy.Ðô±.FŸŠ..èù 0000E0
 8D0676FF 0876FF15 E709C29A 006A006A 0676FF08 76FFD88E 148AB81E 000034C8 â4...|...Å.v..v.j.j..ô.Ò..v..v.. 000100
 26D45EC4 D65689D4 4689EE56 8BEC468B 0177E903 74C00816 170A589A 5016EC46 Fâ.P.X....ât.Ðw..Fâ.VŸ.Fâ.Vøá^Å& 000120
 7F2B7C00 E67E8316 6400F09A 5016E446 8D5052E2 5689E046 89405788 263E4788 .G>&.W@.FÅ.VãRP.Fõ.P.Þ.d..–|.|+. 000140
 0CC483FF 83E80EE0 76FFE276 FF0A76FF 0C76FF0E 76FF1076 FF237400 E47E8306 ..~ô.t#.v..v..v..v..vã.vÅ.Ò...á. 000160
 6A006A50 52CE5689 CC468944 578B2642 478B26D4 5EC40121 E90001B8 0674C00B .ât.¡..Ô|.á^â&.GB&.WD.Fä.VöRPj.j 000180
 DC468800 E7E90374 C0081698 0A589A50 160C468D CC76FFCE 76FF1674 09C29A00 ..ô.t..vö.vä.FÊ.P.X....ât.ÕÓ..FÊ 0001A0
 D05EC416 B009C29A 006A006A 4877FF26 4A77FF26 D05EC4D2 56890046 890E5688 .VB.FÅ.VØá^Å&.wJ&.wHj.j..ô.¯.á^Å 0001C0
 067F8326 E85EC400 ABE90374 C008152C 0A589A50 16E8468D 4877FF26 4A77FF26 &.wJ&.wH.FÒ.P.X.,..ât.Ô´.á^Ô&... 0001E0

Dump of file SATURN:[PCCOMMON.DUMP.DLL]BRDNOPL.TMP;1 on 18-APR-1990 10:37:32.99
File ID (520,34,0)   End of file block 272 / Allocated 272

Virtual block number 113 (00000071), 512 (0200) bytes

 FFFF04B6 9A5016F0 468D016A 50520A56 89D84689 02578B26 078B26D8 EB027402 .t.$Å&..&.W..FÅ.VÖRPj..FÞ.P.Ñ... 000000
 02573926 FA568BF8 46884072 07392605 7F477C02 573926F2 568BF046 880A5EC4 á^..FÞ.V·&9W.|G..&9.rã.F%.V°&9W. 000020
 FC468819 72044739 26067F21 7C065739 26F6568B F446882D 77073926 057C347F .4|.&9.w-.F¶.V–&9W.||..&9G.r..F= 000040
 260E5EC4 2274C008 C02B02EB 00018805 77044739 26067C0D 7F065739 26FE568B .V±&9W...|.&9G.w.¡..Š.+â.ât"á^.& 000060
 3CE90DEB 00018804 57892602 4789260E 5EC40257 8B26078B 26E85EC4 000507C7 ú...á^Ô&..&.W.á^.&.G.&.W.¡..Š.Ô< 000080
 F84689E8 468D088E 15C6881E 56570000 1CC8CBC9 1F00E8C0 2BFE72E9 FF02E9FF .Ô..Ôr±+âŠ..èùâ...WV.¡6..Å.FÔ.F% 0000A0
 0A589A50 16E4468D 0676FF08 76FF17A0 09C29A00 6A006A06 76FF0876 FFFA568C .V°.v..v.j.j..ô....v..v..FÔ.P.X. 0000C0
 1E0716F0 8BE87E8D 000C05FE 5689FC46 89E6568B E4468B01 04E90374 C00B15D7 =..ât.Ô...FÔ.V|.F=.V±....–Ô.Þ... 0000E0
 0A578326 05084783 26F85EC4 00025F83 26052F83 26F85EC4 1FA5F200 08B9DA8E .Ö¿...E.á^½&./.&._..á^½&.G..&.W. 000100
 8826F85E C4000E57 8326050C 478326F8 5EC40006 5F832605 046F8326 F85EC400 .á^½&.o..&._..á^½Ž.G..&.W..á^½&. 000120
 26F85EC4 02578B26 078B2652 72073926 057F597C 02573926 0A5EC402 578B2607 .&.W.á^.&9W¯|Y..&9.rR&..&.W.á^½& 000140
 067F297C 06573926 0A5EC406 578B2604 478B263A 72084739 26067F42 7C0A5739 9W.|B..&9G.r:&.G.&.W.á^.&9W.|).. 000160
 04473926 067C0D7F 06573926 0A5EC40E 578B260C 478B26F8 5EC42172 04473926 &9G.r!á^½&.G.&.W.á^.&9W...|.&9G. 000180
 8926E656 8BE4468B 0E5EC400 0607C726 0E5EC43D 74C00BC0 2B02EB00 01880577 w.¡..Š.+â.ât=á^.&ú...á^..FÔ.V|&. 0001A0
 5EC408C4 83F106E8 0E505200 0C05FE56 8BFC468B 0A76FF0C 76FF0457 89260247 G.&.W..v..v..F=.V±...RP.Ô.þ.á.á^ 0001C0
 088E1776 881E0000 32C8C8C9 5F5E1F00 E8C028FE E5E907EB 0001881A 4789260E .&.G.¡..Š.Ô|±+âŠ..^_èùâ2...¡v..Å 0001E0

Dump of file SATURN:[PCCOMMON.DUMP.DLL]BRDNOPL.TMP;1 on 18-APR-1990 10:37:32.99
File ID (520,34,0)   End of file block 272 / Allocated 272

Virtual block number 114 (00000072), 512 (0200) bytes

 0819000A 589A5016 F0468D06 76FF0876 FF180009 C29A006A 006A0676 FF0876FF .v..v.j.j..ô.†..v..v..FÞ.P.X.... 000000
 E2468940 578B263E 478B260A 5EC40C56 890A4689 F2568BF0 468801DE E90374C0 ât.Ô8..FÞ.V·.FÖ.VÉá^Ô&.G>&.W@.Fâ 000020
 1076FF23 7400E67E 83067F2B 7C00E87E 83196000 F09A5016 E6468D50 52E45689 .VöRP.F|.P.Þ.'..–Ô.|+...–|.t#.v. 000040
 0188E900 01880674 C0080CC4 83FF83E8 0EE276FF E476FF0A 76FF0C76 FF0E76FF .v..v..v..vÔ.vã.Ô...á..ât.¡..Ô.. 000060
 09C29A00 6A006A4C 77FF2644 77FF2600 5689CE46 89445788 26424788 260A5EC4 á^Ô&.GB&.WD.Fö.VÅ&.WD&.wBj.j..ô. 000080
 4688011C E90374C0 0819F50A 589A5016 DE468042 77FF2644 77FF260A 5EC41975 u.á^Ô&.WD&.wB.FB.P.X.%..ât.Ô...F 0000A0
 77FF2652 77FF2606 5EC40A76 FF0C76FF 0E76FF10 76FFD856 89D64689 E0568BDE B.VÅ.F=.VÄ.v..v..v..v.á^ø&.wR&.w 0000C0
 88264847 8826065E C40002EA 46C70116 E90001B8 0674C00B 0CC483FD C9E80E50 P.Ôè».á..ât.¡..Õ..úFõ..á^ø&.GH&. 0000E0
 4EFFEA46 88FE5689 FC46894E 578B264C 478B2606 5EC411EB FE5689FC 46894A57 WJ.F=.V±Š.á^ø&.GL&.WN.F=.V±.Fõ.N 000100
 EC468DFC 76FFFE76 FF1A0509 C29A006A 006AFC76 FFFE76FF 00AFE903 75C00BEA ô.âu.ÔE..v±.v=j.j..ô....v±.v=.Fâ 000120
 578B2607 8826EC5E C448EB06 478B26EC 5EC40086 E90374C0 0817900A 589A5016 .P.X....ât.Ô..á^Š&.G.ŠHá^Š&..&.W 000140
 078B26EC 5EC435EB FA5689F8 46892857 88262647 8826025E C4045689 D2468902 ..F0.Vâá^ø&.G&&.W(.F%.V°$5á^Š&.. 000160
 0810EB12 EBFA5689 F8468926 578B2624 478B26F4 5EC4F656 89F44689 02578B26 &.W..F¶.V–á^¶&.G$&.W&.F%.V°Š.Š.. 000180
 76FFFA76 FF0A76FF 0C76FF0E 76FF1076 FF00E8CD 74000230 AF7E0001 300C7CC0 â|.=..–£=..teŠ..v..v..v..v..v°.v 0001A0
 0E76FF10 76FFFEC8 E9FF33E9 FF63E937 E80001B8 0574C008 0CC483FC E9E80EF8 %.ÔÔ=.á..ât.¡..Š7Ôc.Ô3.Ôâ±.v..v. 0001C0
 E80001B8 0574C008 0CC483FC B9E80E66 77FF2668 77FF260A 5EC40A76 FF0C76FF .v..v.á^Ô&.wh&.wf.Ô¿=.á..ât.¡..Š 0001E0
```

Dump of file SATURN:[PCCOMMON.DUMP.DLL]BRDNOPL.TMP;1 on 18-APR-1990 10:37:32.99
File ID (520,34,0)   End of file block 272 / Allocated 272

Virtual block number 115 (00000073), 512 (0200) bytes

```
08064688 0000E646 C7088E18 8CB81E56 57000026 C8CBC91F 00E8C028 FE0BE907 .Õ.±+âŠ..èùà&..WV.¡V..ÄúFl...F.. 000000
5EC4035D E98DF383 06751246 08104688 087F070E 7E830E7C 000E7E83 14740846 F.t..-..|..-.....F..F.u.¡µ.Õ].á^ 000020
E276FFE4 76FF1828 09C29A00 6A006A50 52E45689 E2468916 57882614 47882606 .&.G.&.W..Fã.VöRPj.j..ò.(..võ.vã 000040
E90314E9 03740739 260E4688 DA5EC403 25E90374 C00818CD 0A589A50 160A4680 .FÖ.P.X.ë..ât.ÕX.á^Õ.F.&9.t.Õ..Õ 000060
A5F20008 B90A8E1E 0716F088 E87E8000 1605E056 890E4689 DC5688DA 4688020F Õ..FÖ.VÉ.FB.VÁ....~Õ.Þ....Õ¿...É 000080
83260508 478326F8 5EC40002 5F832605 2F8326F8 5EC4FA56 8CF84689 E84680IF ..FÖ.F%.V°á^¥&./.&. ..á^¥&.G..&. 0000A0
F85EC400 0E578326 050C4783 26F85EC4 00065F83 2605046F 8326F85E C4000A57 W..á^¥&.o..&._..á^¥&.G..&.W..á^% 0000C0
5EC40257 88260788 26527207 3926057F 597C0257 39260A5E C4025788 26078826 &..&.W.á^.&9W.|Y..&9.rR&..&.W.á^ 0000E0
297C0657 39260A5E C4065788 26044788 263A7208 47392606 7F427C0A 573926F8 W&9W.|B..&9G.r:&.G.&.W.á^.&9W.|) 000100
3926067C 007F0657 39260A5E C40E5788 260C4788 26F85EC4 21720447 3926067F ..&9G.r|á^¥&.G.&.W.á^.&9W...|.&9 000120
DC5688DA 4688105E C4000107 C726105E C43E74C0 08C02802 E8000188 05770447 G.w.¡..Š.+â.ât>á^.&ú...á^..FÕ.VÉ 000140
08C483ED 64E80E50 52001605 E05688DE 46880A76 FF0C76FF 04578926 02478926 &.G.&.W..v..v..FB.VÁ...RP.ÒdÙ.á. 000160
FFDC76FF 0A76FF0C 76FF1076 FF1276FF 0203E902 0EE90001 881A4789 26105EC4 á^.&.G.¡..Õ..Õ...v..v..v..v..vÉ. 000180
016A006A 1076FF12 76FF01D0 E901E8E9 00018806 74C0080C C483F344 E80EDA76 vÕ.Õ0µ.á..ât.¡..ÕÕ.Õï..v..v.j.j. 0001A0
82E90001 E646C705 74C00812 C483F591 E80EDA76 FFDC76FF 006A0A76 FF0C76FF .v..v.j..vÉ.vÕ.Õ.%.á..ât.úFl..Õý 0001C0
12C483F5 66E80EDA 76FFDC76 FF016A0A 76FF0C76 FF006A01 6A1076FF 1276FF01 ..v..v.j.j..v..v.j..vÉ.vÕ.Õf%.á. 0001E0
```

Dump of file SATURN:[PCCOMMON.DUMP.DLL]BRDNOPL.TMP;1 on 18-APR-1990 10:37:32.99
File ID (520,34,0)   End of file block 272 / Allocated 272

Virtual block number 116 (00000074), 512 (0200) bytes

```
9A501601 6A0A76FF 0C76FFFA 568CF846 89E8468D 0187E900 01E646C7 0574C008 .ât.úFl..Õ...FÕ.F%.V°.vÉ.vÕj..P. 000000
88265272 07392605 7F597C02 5739260A 5EC40257 88260788 26F85EC4 160E0486 Ñ.B.á^¥&..&.W.á^.&9W.|Y..&9.rR&. 000020
5EC40657 88260447 88263A72 08473926 067F427C 0A573926 F85EC402 57882607 .&.W.á^¥&9W.|B..&9G.r:&.G.&.W.á^ 000040
5739260A 5EC40E57 88260C47 8826F85E C4217204 47392606 7F297C06 5739260A .&9W.|)..&9G.r|á^¥&.G.&.W.á^.&9W 000060
5EC40005 07C72610 5EC41F74 C008C028 02E80001 88057704 47392606 7C0D7F06 ...|.&9G.w.¡..Š.+â.ât.á^.&ú...á^ 000080
46890C56 880A4688 000BE900 E6E90001 88045789 26024789 260C5688 0A468810 ..FÕ.VÉ&.G.&.W.¡..Õl.ÕÙ..FÕ.VÉ.F 0000A0
597C0257 39260A5E C4025788 26078826 F85EC4FA 5689F846 89000C05 FE5689FC •.V±....F%.V°á^¥&..&.W.á^.&9W.|Y 0000C0
263A7208 47392606 7F427C0A 573926F8 5EC40257 88260788 26527207 3926057F ..&9.rR&..&.W.á^¥&9W.|B..&9G.r:& 0000E0
260C4788 26F85EC4 21720447 3926067F 297C0657 39260A5E C4065788 26044788 .G.&.W.á^.&9W.|)..&9G.r|á^¥&.G.& 000100
C41E74C0 08C02802 E8000188 05770447 3926067C 007F0657 39260A5E C40E5788 .W.á^.&9W...|.&9G.w.¡..Š.+â.ât.á 000120
E834E83E E8000188 04578926 02478926 DC5688DA 4688105E C4000607 C726105E ^.&ú...á^..FÕ.VÉ&.G.&.W.¡..Š>Š4Š 000140
60E90375 000430FE 30E90375 000330FE 1FE90375 000230F0 19E90375 00013032 2=..u.Õ.»=..u.Õ.±=..u.Õ=±=..u.Õ' 000160
CBC95F5E 1F00E8E6 4688FCC4 E900E8FF 27E90375 000630FE 83E90375 000530FE ±=..u.Õ.±=..u.Õ'.Š.Õä=.FlŠ..^_èù 000180
0E76FF01 6A016A00 6A006A0C 77FF260E 77FF2606 5EC4088E 1A03881E 000000C8 â....¡Æ..Áá^.&.w.&.w.j.j.j.j..v. 0001A0
C0280006 57832601 04478326 065EC411 E88E0688 0574C008 18180290 9A0C76FF .v.......ât.¡..Š.á^.&.G..&.W..+â 0001C0
76FF1ECC 09C29A00 6A006A0E 76FF1076 FFD88E1E 66881E00 0014C8C8 C91F00E8 Š..èùà....¡f..Ä.v..v.j.j..ò.ä..v 0001E0
```

Dump of file SATURN:[PCCOMMON.DUMP.DLL]BRDNOPL.TMP;1 on 18-APR-1990 10:37:32.99
File ID (520,34,0)   End of file block 272 / Allocated 272

Virtual block number 117 (00000075), 512 (0200) bytes

```
5689EC46 89FA5688 F8468800 EAE90374 C0081EFC 0A589A50 16F8468D 0E76FF10 ..v..F%.P.X.=..ât.Õõ..F%.V°.F&.V 000000
7E831E86 00F09A50 16F4468D 5052F256 89F04689 40578826 3E478826 EC5EC4EE Vá^&&.G>&.Wə.FÞ.V RP.F¶.P.Þ....- 000020
E80E0676 FF0876FF 0A76FF0C 76FFF076 FFF276FF 197400F4 7E83067F 217C00F6 -.|l...-¶.t..v .vÞ.v..v..v..v..Õ 000040
5EC40257 88260788 26FC5EC4 FE5689FC 46890016 05EE5688 EC46880C C483FF83 ...á..F&.VŸ....F=.V±á^=&..&.W.á^ 000060
7F427C0A 573926FC 5EC40257 88260788 26527208 47392606 7F5A7C0A 5739260A .&9W.|Z..&9G.rR&..&.W.á^=&9W.|B. 000080
47392606 7C267F06 573926FC 5EC40E57 88260C47 88260A5E C43A7208 47392606 .&9G.r:á^.&.G.&.W.á^=&9W..&|.&9G 0000A0
E8000188 05770447 3926067C 007F0657 39260A5E C40E5788 260C4788 261E7704 .w.&.G.&.W.á^.&9W...|.&9G.w.¡..Š 0000C0
28FEFFE9 0AC483FE A7E80E06 76FF0876 FF016AF8 76FFFA76 FF1574C0 08C02802 .+â.ât..v°.v%j..v..v..Õl±.á.Õ.±+ 0000E0
6A0E76FF 1076FFFE 568CFC46 89EC4680 D88E1EA8 881E0000 28C8CBC9 1F00E8C0 âŠ..èùà(...¡¨..Ä.F&.F=.V±.v..v.j 000100
88011FE9 0374C008 20260A58 9A5016E8 46800E76 FF1076FF 1FF609C2 9A006A00 .j..ò.-..v..v..FÕ.P.X.& .ât.Õ... 000120
46805052 E25689E0 46894057 88263E47 882608SE C40A5689 D84689EA 5688E846 FÕ.Võ.FÄ.VÖá^Ä&.G>&.Wə.FÄ.VãRP.F 000140
FF0C76FF E076FFE2 76FF1974 00E47E83 067F217C 00E67E83 206100F0 9A5016E4 õ.P.Þ.e .-|.|l...-õ.t..vã.vÁ.v.. 000160
C29A006A 006A4277 FF264477 FF26085E C40CC483 FF7AE80E 0676FF08 76FF0A76 v..v..v..Õz..á.á^Ä&.wD&.wBj.j..ò 000180
FF009CE9 0374C008 1E8C0A58 9A50160C 46804277 FF264477 FF26085E C4207609 .v á^Ä&.wD&.wB.FÉ.P.X.¥..ât.Õ... 0001A0
5739260A 5EC40257 88260788 26FC5EC4 FFFF0648 9AFC76FF FE76FF0C 76FF0E76 vB.vÉ.v±.v•.K...á^=&..&.W.á^.&9W 0001C0
47392606 7F427C0A 573926FC 5EC40257 88260788 26527208 47392606 7F5A7C0A .|Z..&9G.rR&..&.W.á^=&9W.|B..&9G 0001E0
```

```
Dump of file SATURN:[PCCOMMON.DUMP.DLL]BRDNOPL.TMP;1 on 18-APR-1990 10:37:32.99
File ID (520,34,0)   End of file block 272 / Allocated 272

Virtual block number 118 (00000076), 512 (0200) bytes

 261E7704 47392606 7C267F06 573926FC 5EC40E57 88260C47 88260A5E C43A7208 .r:á^.&.G.&.W.á^=&9W..&|.&9G.w.& 000000
 0BC02B02 E80001B8 05770447 3926067C 007F0657 39260A5E C40E5788 260C4788 .G.&.W.á^.&9W...|.&9G.w.¡..Š.+à. 000020
 C02BFECA E9FF4E39 0AC483FD 4BE80E06 76FF0876 FF026ADC 76FFDE76 FF1574C0 àt..v8.vÉj..v..v..ÒK».á.ÖH.Öò±+à 000040
 76FF214C 09C29A00 6A006A0E 76FF1076 FFD88E1F CC881E00 0032C8C8 C91F00EB Š..èùà2...¡ä..Á.v..v.j.j..ô.Ll.v 000060
 56890646 89EE5688 EC468801 7DE90374 C008217C 0A589A50 16EC468D 0E76FF10 ..v..F&.P.X.|I.ât.Ö)..F&.VŸ.F•.V 000080
 7E8321B7 00F09A5  16E4468D 5052E256 89E04689 40578826 3E478826 D65EC408 Äá^•&.G>&.W@.FÁ.VãRP.FÖ.P.Þ.ñI.~ 0000A0
 E80E0676 FF0876FF 0A76FF0C 76FFE076 FFE276FF 197400E4 7E83067F 217C00E6 Ì.|I...-ô.t..vã.vÁ.v..v..v..v..Ö 0000C0
 4477FF26 D65EC421 CC09C29A 006A006A 4277FF26 4477FF26 D65EC40C C483FF83 ...á.á^•&.wO&.wBj.j..ô.âIá^•&.wD 0000E0
 56890246 890E5688 DC468800 FAE90374 C00821F3 0A589A50 160C468D 4277FF26 &.w8.FÉ.P.X.µI.ât.Ö"..FÉ.V8.F•.V 000100
 4877FF26 4A77FF26 D25EC422 0809C29A 006A006A 4877FF26 4A77FF26 D25EC404 àá^•&.wJ&.wHj.j..ô.."á^•&.wJ&.wH 000120
 8906478B 26087401 047F8326 E85EC400 88E90374 C0081FE6 0A589A50 16E8468D .FÒ.P.X.]..ât.ÒE.á^Ò&....t.&.G.. 000140
 0677FF26 0877FF26 CE5EC4D0 5689CE46 89025788 26078826 CDE80274 C008DA46 FÖ.ât.Še&..&.W..Fö.VÀá^ö&.w.&.w. 000160
 47392606 7F487C0A 573926F2 5688F046 880A5EC4 000007E9 9A5016F0 4680016A j..FÞ.P.Ö...á^..FÞ.V·&9W.|H..&9G 000180
 0E573926 F65688F4 46882077 07392605 7C347F02 573926FA 5688F846 88407208 .rã.F%.V•&9W..4|.&9.w-.F¶.V-&9W. 0001A0
 01880577 04473926 067C007F 06573926 FE5688FC 46881972 0C473926 067F217C |I..&9G.r..F•.V±&9W...|.&9G.w.¡. 0001C0
 FF0876FF 0384B7FF E301DA5E 8837FF26 0277FF26 E85EC420 74C008C0 2B02E800 .Š.+à.ât á^Ò&.w.&.7.^ÖID.ñ...v.. 0001E0

Dump of file SATURN:[PCCOMMON.DUMP.DLL]BRDNOPL.TMP;1 on 18-APR-1990 10:37:32.99
File ID (520,34,0)   End of file block 272 / Allocated 272

Virtual block number 119 (00000077), 512 (0200) bytes

 28881E00 0032C8C8 C91F00E8 C02BFE6C E9FEEAE9 FF29E90A C483FB9A E80E0676 v..Ò.=.á.Ö).Öò±Öl±+àŠ..èùà2...¡+ 000000
 0A589A50 16EC468D 3E76FF10 76FF2300 09C29A00 6A006A0E 76FF1076 FFD88E21 I.Å.v..v.j.j..ô..#.v..v..F&.P.X. 000020
 40578826 3E478826 D65EC4D8 56890646 89EE5688 EC468801 7EE90374 C0082330 0#.ât.Ö-..F&.VŸ.F•.VÀá^•&.G>&.W@ 000040
 197400E4 7E83067F 217C00E6 7E832368 00F09A50 16E4468D 5052E256 89E04689 .FÁ.VãRP.FÖ.P.Þ.k#.-].|I...-ô.t. 000060
 4477FF26 D65EC40C C483FF83 E80E0676 FF0876FF 0A76FF0C 76FFE076 FFE276FF .vã.vÁ.v..v..v..v..Ö...á.á^•&.wO 000080
 0A589A50 160C468D 4277FF26 4477FF26 D65EC423 8009C29A 006A006A 4277FF26 &.wBj.j..ô..#á^•&.wO&.w8.FÉ.P.X. 0000A0
 4C77FF26 4E77FF26 D25EC4D4 56890246 89DE5688 DC468800 F8E90374 C00823A7 I#.ât.Ö«..FÉ.V8.F•.Vàá^•&.wN&.wL 0000C0
 C008213C 0A589A50 16E8468D 4C77FF26 4E77FF26 D25EC423 8C09C29A 006A006A j.j..ô.V#á^•&.wN&.wL.FÒ.P.X.<I.à 0000E0
 07882 6CC E8027400 01300A46 8906478B 260C7401 047F8326 E85EC400 8CE90374 t.ÒV.á^Ò&....t.&.G..FÖ=..t.Šà&.. 000100
 0022489A 5016F046 80016A06 77FF2608 77FF26CE 5EC4D056 89CE4689 02578826 &.W..Fö.VÀá^ö&.w.&.w.j..FÞ.P.H". 000120
 3926FA56 88F84688 40720847 3926067F 487C0A57 3926F256 88F04688 0A5EC400 .á^..FÞ.V·&9W.|H..&9G.rã.F%.V•&9 000140
 8819720C 47392606 7F217C0E 573926F6 5688F446 88207707 3926057C 347F0257 W..4|.&9.w-.F¶.V-&9W.|I..&9G.r.. 000160
 5EC42074 C008C028 02E80001 88057704 47392606 7C007F06 573926FE 5688FC46 F•.V±&9W...|.&9G.w.¡..Š.+à.ât á^ 000180
 28E90AC4 83F9E5E8 0E0676FF 0876FF03 84B7FFE3 01DA5E88 37FF2602 77FF26E8 Ò&.w.&.7.^ÖID.ñ...v..v..ÖI•.á.Ö( 0001A0
 568CFC46 89EC468D D88E22DF 881E0000 30C8CBC9 1F00E8C0 28FE6BE9 FEE9E9FF .ÖÒ±Òk±+àŠ..èùà0...¡Ö".Á.F&.F•.V 0001C0
 22F00A58 9A5016E8 46800E76 FF1076FF 248E09C2 9A006A00 6A0E76FF 1076FFFE ±.v..v.j.j..ô./$.v..v..FÒ.P.X.Þ" 0001E0

Dump of file SATURN:[PCCOMMON.DUMP.DLL]BRDNOPL.TMP;1 on 18-APR-1990 10:37:32.99
File ID (520,34,0)   End of file block 272 / Allocated 272

Virtual block number 120 (00000078), 512 (0200) bytes

 46894057 88263E47 8826045E C4065689 D44689EA 5688E846 880171E9 0374C008 .ât.Òq..FÒ.Vö.Fà.V•á^À&.G>&.W@.F 000000
 76FF1974 00E07E83 067F217C 00E27E83 252900F0 9A5016E0 468D5052 DE5689DC É.VBRP.FÁ.P.Þ.)%.-ã.|I...-Á.t..v 000020
 FF264477 FF26045E C40CC483 FF7AE80E 0676FF08 76FF0A76 FF0C76FF DC76FFDE 8.vÉ.v..v..v..v..Òz..á.á^À&.wO&. 000040
 25650A58 9A5016D8 46804277 FF264477 FF26045E C4253E09 C29A006A 006A4277 wBj.j..ô.>%á^À&.wO&.w8.FÁ.P.X.e% 000060
 006A4877 FF264A77 FF26005E C4025689 D04689DA 56880846 8800EEE9 0374C008 .ât.ÖY..FÁ.VÖ.FÀ.V8á^À&.wJ&.wHj. 000080
 0374C008 24AE0A58 9A5016E4 46804877 FF264A77 FF26005E C4257A09 C29A006A j..ô.z%á^À&.wJ&.wH.FÖ.P.X.Ü$.ât. 0000A0
 B69AFC76 FFFE76FF 016A37FF 260277FF 2608EB02 7402067F 8326E45E C400AFE9 ÖE.á^Ò&....t.ŠÀ&.w.&.7j..v±.v•.Ñ 0000C0
 88265272 08473926 067F5A7C 0A573926 0A5EC402 57882607 8826FC5E C41CE204 .ã.á^•&..&.W.á^.&9W.|Z..&9G.rR&. 0000E0
 5788260C 4788260A 5EC43A72 08473926 067F427C 0A573926 FC5EC402 57[illegible]2607 .&.W.á^•&9W.|B..&9G.r:á^.&.G.&.W 000100
 5739260A 5EC40E57 88260C47 88261E77 04473926 067C267F 06573926 FC5E[illegible]40E .á^•&9W..&|.&9G.w.&.G.&.W.á^.&9W 000120
 37FF2602 77FF26E4 5EC41974 C008C028 02E80001 88057704 47392606 7C007[illegible]06 ...|.&9G.w.¡..Š.+à.ât.á^Ò&.w.&.7 000140
 C8C8C91F 00E8C028 FE78E9FE F6E9FF35 E90AC483 F834E80E 0676FF08 76FF056A j..v..v..Ö4%.á.Ö5.Ö-±Öx±+àŠ..èùà 000160
 46800676 FF0876FF 266609C2 9A006A00 6A0676FF 0876FFD8 8E249488 1E00000C ....¡.$.Ä.v..v.j.j..ô.f&.v..v..F 000180
 4689000C 05FE5689 FC4689F6 5688F446 8800A0E9 0374C008 24EE0A58 9A5016F4 ¶.P.X.Y$.ât.Ö...F¶.V-.F•.V±....F 0001A0
 26527208 47392606 7F5A7C0A 5739260A 5EC40257 88260788 26F85EC4 FA5689F8 %.V•á^%&..&.W.á^.&9W.|Z..&9G.rR& 0001C0
 88260C47 88260A5E C43A7208 47392606 7F427C0A 573926F8 5EC40257 88260788 ..&.W.á^%&9W.|B..&9G.r:á^.&.G.&. 0001E0
```

```
Dump of file SATURN:[PCCOMMON.DUMP.DLL]BRDNOPL.TMP;1 on 18-APR-1990 10:37:32.99
File ID (520,34,0)   End of file block 272 / Allocated 272

Virtual block number 121 (00000079), 512 (0200) bytes

 39260A5E C40E578B 260C478B 261E7704 47392606 7C267F06 573926F8 5EC40E57 W.&^%&9W..&|.&9G.w.&.G.&.W.&^.&9 000000
 FF066AF4 76FFF676 FF1574C0 08C02B02 EB0001B8 05770447 3926067C 007F0657 W...|.&9G.w.j..S.+&.&t..v-.v¶j.. 000020
 D88E2645 881E0000 2BC8C8C9 1F00EBC0 2BFF49E9 0AC483F7 57E80E0E 76FF1076 v..v..ÒW.&.Òl.+&S..èùà(...¡E&.Ä 000040
 0B27600A 589A5016 F44680DE 76FF1076 FF273D09 C29A006A 006A0E76 FF1076FF .v..v.j.j..ô.=',v..v..F¶.P.X.m'. 000060
 E8468940 578B263E 478B26E0 5EC4E256 89E04689 F65688F4 468801D5 E90374C0 èt.Ôf..F¶.V-.FÁ.Vää^Á&.G>&.Wà.FÒ 000080
 EA76FF19 7400EC7E 83067F21 7C00EE7E 8327A800 F09A5016 EC468050 52EA5689 .VòRP.Fâ.P.Þ.´'.~Ÿ.|!...-&.t..vô 0000A0
 77FF2644 77FF26E0 5EC40CC4 83FF83E8 0E0676FF 0876FF0A 76FF0C76 FFE876FF .vÒ.v..v..v..v..Ò...&.&^Á&.wÒ&.w 0000C0
 0B28020A 589A5016 E4468042 77FF2644 77FF26E0 5EC427B0 09C29A00 6A006A42 Bj.j..ô.§'&^Á&.wÒ&.wB.Fô.P.X..(. 0000E0
 5EC40A76 FF0C76FF 0676FF08 76FFDE56 890C4689 E6568BE4 46880134 E90374C0 ät.Ô4..Fô.Vl.FÉ.VB.v..v..v..v.&^ 000100
 9A006A00 6A4C77FF 264E77FF 260C5EC4 0CC483FE 52E80E50 77FF2652 77FF260C É&.wR&.wP.ÒR±.&.&^É&.wN&.wLj.j.. 000120
 F05EC430 75C00B2B 5F0A589A 5016F046 804C77FF 264E77FF 260C5EC4 281709C2 ô..(&^É&.wN&.wL.FÞ.P.X._(.àuÒ&^Þ 000140
 2877FF26 D85EC40A 76FF0C76 FF0676FF 0876FF0A 56890846 8902578B 26078B26 &..&.W..FÄ.VÖ.v..v..v..v.&^Ä&.w( 000160
 7409C29A 006A006A 4877FF26 4A77FF26 DC5EC487 E80CC483 FDF7E80E 2677FF26 &.w&.Ò%».&.Šñ&^É&.wJ&.wHj.j..ô.t 000180
 478B26F0 5EC47D75 C00B2656 0A589A50 16F0468D 4877FF26 4A77FF26 DC5EC428 (&^É&.wJ&.wH.FÞ.P.X.V&.àu)&^Þ&.G 0001A0
 28578B26 26478B26 D85EC40A 56890846 8902578B 26078B26 F05EC40C EB48EB06 .ŠHŠÉ&^Þ&..&.W..FÄ.VÖ&^Ä&.G&&.W( 0001C0
 26244788 26F85EC4 FA5689F8 46890257 88260788 26F05EC4 33EBFE56 89FC4689 .F=.V±Š3&^Þ&..&.W..F%.V'&^%&.GŠ& 0001E0

Dump of file SATURN:[PCCOMMON.DUMP.DLL]BRDNOPL.TMP;1 on 18-APR-1990 10:37:32.99
File ID (520,34,0)   End of file block 272 / Allocated 272

Virtual block number 122 (0000007A), 512 (0200) bytes

 76FF0876 FF00EBCF 7400023D AF740001 3B8674C0 0810EBFE 5689FC46 892[illegible]788 .W&.F=.V±Š..âtÑ=..t£=..tüŠ..v..v 000000
 0676FF08 76FFFEB0 E9FF6AE9 0CC483FD 4EEB0EFC 76FFFE76 FF0A76FF 0C76F[illegible]06 ..v..v..v±.v=.ÒN=.&.Òj.Ö¯±.v..v. 000020
 1F00EBC0 2BFE14E9 0CC483FD 2AE80E66 77FF2668 77FF26E0 5EC40A76 FF0C76[illegible]F .v..v.&^Á&.wh&.wf.Ò*=.&.Ö.±+&S.. 000040
 E980F388 06751046 080E4688 08740846 08064688 D88E271C 881E0000 22C8C8C9 èùà"...¡.'.Ä.F..F.t..F..F.u.¡µ.Ô 000060
 8826E25E C4E45689 E2468902 578B2607 8826065E C4FE568C FC4689EC 46800189 ...F&.F=.V±&^.&..&.W..F&.VÖ&^ã&. 000080
 DE468DE6 76FFE876 FF298509 C29A006A 006A5052 E85689E6 46891657 88261447 G.&.W..F].VÒRPj.j..ô..).vÒ.vl.FB 0000A0
 0364878B 02E3C1D8 88EA4689 078B260E 5EC40139 E90374C0 0827200A 589A5016 .P.X.-'.ât.Õ9.&^B&...Fô.ÄèD...d. 0000C0
 89001605 E05688DE 468869EB EA468800 8AE90375 D0080C56 230A4623 03669788 ..f.#F.#V..Äu.Õ...FôŠi.FB.VÁ.... 0000E0
 260877FF 260E5EC4 63E8FE56 89FC4689 003605E0 5688DE46 8874E8FE 5689FC46 F=.V±Št.FB.VÁ.6..F=.V±Šc&^B&.w.& 000100
 FF016A06 77FF2608 77FF260E 5EC449EB 000023FD 9AFC76FF FE76FF01 6A0677FF .w.j..v±.v=.=#..Š1&^B&.w.&.w.j.. 000120
 2D1CEB1E E8FE5689 FC468900 0C05E056 880E4688 2FEB0000 FFFF9AFC 76FFFE76 v±.v=.....Š/.FB.VÁ....F=.V±Š.Š.- 000140
 8B26FC5E C42A0C29 F2290829 0829C729 B62A2FA7 FF2E93C0 03147700 05300001 ..=..w..â...l/*Ñ)ú)Ä)Ä)·).*&^=&. 000160
 FC5EC402 578B2607 88265272 08473926 067F5A7C 0A573926 0E5EC402 578B2607 .&.W.&^.&9W.|Z..&9G.rR&..&.W.&^= 000180
 06573926 FC5EC40E 578B260C 478B260E 5EC43A72 08473926 067F427C 0A573926 &9W.|B..&9G.r:&^.&.G.&.W.&^=&9W. 0001A0
 47392606 7C0D7F06 5739260E 5EC40E57 88260C47 88261E77 04473926 067C267F .&|.&9G.w.&.G.&.W.&^.&9W...|.&9G 0001C0
 9FE80E06 76FF0876 FFEA76FF DE76FFE0 76FF1674 C00BC02B 02E80001 B8057704 .w.¡..Š.+&.&t..vÁ.vB.vô.v..v..Ò. 0001E0

Dump of file SATURN:[PCCOMMON.DUMP.DLL]BRDNOPL.TMP;1 on 18-APR-1990 10:37:32.99
File ID (520,34,0)   End of file block 272 / Allocated 272

Virtual block number 123 (0000007B), 512 (0200) bytes

 8826078B 26065EC4 D88E2928 881E0000 0AC8C8C9 1F00EBC0 2BFEB0E9 0AC483F3 µ.&.Ö¯±+&S..èùà....¡().Ä&^.&..&. 000000
 FFF64688 02F84683 04E80000 F646C7FA 5689F846 89007B05 FE5689FC 46890257 W..F=.V±.x..F%.V'úF-..Š..F%..F-. 000020
 6A162303 68062314 56881246 880114E9 078B26F8 5EC4014F E9037C00 0630F646 F-=..|.ÕO.&^%&..Õ...F..V.#.h.#.j 000040
 15E90CC4 83F36AE8 0E0676FF 0876FF0A 76FF0C76 FF0E76FF 1076FF19 74D00803 ..Ät..v..v..v..v..v..v..Òjµ.&.Ö. 000060
 FF0A76FF 0C76FF0E 76FF1076 FF1974D0 08036E16 23036C06 23145688 12468801 ..F..V.#.l.#.n..Ät..v..v..v..v.. 000080
 74D00803 72162303 70062314 56881246 8800E7E9 0CC483F4 5DE80E06 76FF0876 v..v..Ò]¶.&.ÒÒ..F..V.#.p.#.r..Ät 0000A0
 12468800 89E90CC4 83F58EE8 0E0676FF 0876FF0A 76FF0C76 FF0E76FF 1076FF19 ..v..v..v..v..v..v..Ò.%.&.Ò¿..F. 0000C0
 76FF0876 FF0A76FF 0C76FF0E 76FF1076 FF1974D0 08037616 23037406 23145688 .V.#.t.#.v..Ät..v..v..v..v..v..v 0000E0
 1076FF19 74D00803 7A162303 78062314 56881246 880088E9 0CC483F7 14E80E06 ..Ò.%.&.Õ...F..V.#.x.#.z..Ät..v. 000100
 06231456 88124688 5EE80CC4 83F898E8 0E0676FF 0876FF0A 76FF0C76 FF0E76FF .v..v..v..v..v..Ò.%.&.Š^.F..V.#. 000120
 FAF6E80E 0676FF08 76FF0A76 FF0C76FF 0E76FF10 76FF1974 D008037E 1623037C |.#.-..Ät..v..v..v..v..v..v..Ò-' 000140
 30FF30E9 03750003 30FF0AE9 03750002 30FEE4E9 03750001 302FE831 E80CC483 .&.Š1Š/=..u.ÒÒ±=..u.Õ..=..u.ÕO.= 000160
 FF0A76FF 0C76FFFE 9FE900EB A4740006 30FF7CE9 03750005 30FF56E9 03750004 ..u.ÕV.=..u.Õ|.=..tÉŠ.Õ.±.v..v.. 000180
 081C0203 001090CB C91F00EB C02B0CC4 83FCB3E8 0E0676FF 0876FF12 76FF1476 v..v..v..v..Ò'=.&.+&S..èù....... 0001A0
 088A0203 00000007 25A10002 00000006 085C0002 00000003 208E0002 02600005 ..'.... .......\.......Ä%........ 0001C0
 09120203 021E0004 2A060203 00220003 06880203 00140003 03960203 027F0005 ..............£..."....*........ 0001E0
```

Dump of file SATURN:[PCCOMMON.DUMP.DLL]BRDNOPL.TMP;1 on 18-APR-1990 10:37:32.99
File ID (520,34,0)   End of file block 272 / Allocated 272

Virtual block number 124 (0000007C), 512 (0200) bytes

```
 00690203 00B00004 09440203 00000017 10F40002 00000014 29750002 00AB0004 .."...u)......¶.......D...§...í. 000000
 00000000 024C0005 07330203 00CC0004 29EC0203 00000019 2AD40002 02360005 ..6...Ì*......ì)..ä...3...L..... 000020
 0674C008 0000FF*F 9A5016F6 46BD246A 0E6A0A76 FFD88EFF FF881E56 00000AC8 À...V.¡...Ä.v.j.j$.F-.P......Àt. 000040
 FF03EB00 00FE46C7 00012247 C726F65E C4078926 0A4688F6 5EC40083 E98DF288 ¡·.Õ..á^-.F.&..á^-&ùG"..úF±..Š.. 000060
 EB8DF2B8 0574C008 06C483FF FF02379A 0A76FF50 16FA4680 457D04FE 7E83FE46 F±.-±.)E.F°.P.v..7....á..Àt.¡·.$ 000080
 5EC402E6 C1FE7688 04508926 02408926 FC5688FA 4688F65E C402E6C1 FE768848 H.v±èl.á^-.F°.V•&.ä.&.P..v±èl.á^ 0000A0
 8926F856 88F64688 065EC410 74084608 064688B2 EB124089 26144089 26C02BF6 -+á&.ä.&.ä.$ý.F..F.t.á^..F-.V½&. 0000C0
 75084608 064688D8 8E0007B8 1E000010 C80006CA C95E1F00 EBC02B02 57892607 .&.W.+áŠ..^èb..à....¡...Ä.F..F.u 0000E0
 0007C726 FE468907 8876F45E C4F65689 F4468908 56880646 88008FE9 8DF5B806 .¡¾.Õ...F..V..F¶.V-á^¶&...F±&ú.. 000100
 000205F6 5688F446 0302E0C1 FC4688 4A 7D04FC7E 83FC46FF 03EB0000 FC46C700 .úF•..Š..F•.-•.)J.F•ëÄ..F¶.V-... 000120
 FF078926 02478926 C02BFA56 89F84689 02578826 078826F0 5EC4F256 89F(?)689 .Fÿ.V·á^ÿ&..&.W..F½.V°+á&.G.&... 000140
 76FFFE76 FFADEB1D EB8DF2B8 0574C008 06C48300 5302819A FE76FFF8 76FF..76 v°.v½.v±...S..á..Àt.¡·.Š.ŠÙ.v±.v 000160
 57000014 C80004CA C91F00EB C02B04EB 8DF2B805 74C00B00 00FFFF9A F476FFF6 -.v¶......Àt.¡·.Š.+áŠ..èb..à...W 000180
 5689EC46 890C5688 0A468800 DAE98DF5 8806750C 46080A46 88088E00 85881E56 V.¡ç..Ä.F..F.u.¡¾.ÕÕ..F..V..F&.V 0001A0
 8DF2B806 74C00800 0000189A 5016FC46 8D246A0E 6A50F646 89078826 EC5EC4EE Ÿá^&&...F-Pj.j$.F•.P......Àt.¡·. 0001C0
 02408826 EC5EC402 E6C1F476 88697D04 F47E83F4 46FF03EB 0000F446 C700ACE9 Õ¯.úF¶..Š..F¶.-¶.)i.v¶èl.á^&&.ä. 0001E0
```

Dump of file SATURN:[PCCOMMON.DUMP.DLL]BRDNOPL.TMP;1 on 18-APR-1990 10:37:32.99
File ID (520,34,0)   End of file block 272 / Allocated 272

Virtual block number 125 (0000007D), 512 (0200) bytes

```
 C00B0AC4 83012B02 A09AF676 FFF076FF 525016F8 468DF256 89F04689 04508826 &.P..Fÿ.V·.F½.PR.vÿ.v-...+..á..à 000000
 76880451 89260241 8926FA56 88F84688 FC5EC402 E7C1F47E 8868EB8D F2880574 t.|·.Šh.-¶èÕ.á^•.F½.V°&.A.&.Q..v 000020
 88FC5EC4 8EEB1450 89261240 8926FC5E C4145088 26124088 26EC5EC4 02E6C1F4 ¶è|.á^&&.ä.&.P.á^•&.ä.&.P.Š.á^•. 000040
 4688065E C4107408 46080646 88224789 26FC5EC4 22478826 EC5EC407 8926F646 F-&..á^&&.G"á^•&.G".F..F.t.á^..F 000060
 8E0163B8 1E560000 0CC80008 CAC95F5E 1F00EBC0 28025789 26078926 FE5688FC •.V±&..&.W.+áŠ..^_èb..à...V.¡c.. 000080
 46080A46 88FC5689 FA468910 56880E46 8800F9E9 8DF5B806 75104608 0E4688D8 Ä.F..F.u.¡¾.Õ°..F¯..V..F°.V•.F..F 0000A0
 47882 6F6 5EC40001 F446C7F8 5689F646 890C5688 0A468800 DFE98DF5 8806750C .u.¡¾.ÕÕ..F..V..F-.V½úF¶..á^-&.G 0000C0
 00FE46C7 0097E903 7400227F 832600A1 E90000F4 46C70874 22473926 FA5EC422 "á^°&9G"t.úF¶..ÕÀ.&..".t.Õ..úF±. 0000E0
 26124088 26F65EC4 02E6C1FE 76882C7D 04FE7E83 327400F4 7E83FE46 FF03EB00 .Š..F±.-¶.t2.-±.),.v±èl.á^-&.ä.& 000100
 46C7C5EB F44689C0 2802EB00 01B80574 14503926 06751240 3926FA5E C4145088 .P.á^°&9ä.u.&9P.t.¡..Š.+á.F¶ŠèúF 000120
 C45016F4 468002E6 C1FE7688 3F7D04FE 7E834574 00F47E83 FE46FF03 EB0000FE ±..Š..F±.-¶.tE.-±.)?.v±èl..F¶.Pá 000140
 74C00B0C C4830109 038E9A02 70FF2604 70FF26FA 5EC40270 FF260470 FF26F65E ^-&.p.&.p.á^°&.p.&.p....l..á..Àt 000160
 4688065E C4097408 46080646 8882EB00 00FFFF9A 00EF6803 8A681E03 E3681E10 ..hD..h¤.hÿ......Šý.F..F.t.á^..F 000180
 75084608 064688 08 8E025088 1E560000 06C8000C CAC95E1F 00EBC028 078926F4 ¶&..+áŠ..^èb..à...V.¡]..Ä.F..F.u 0001A0
 04FE7E83 FE46FF03 EB0000FE 46C7FC56 89FA4689 08568806 46886 3E8 8DF58805 .¡¾.Šc.F..V..F°.V•úF±..Š..F±.-±. 0001C0
 C00B06C4 83033804 679A37FF 260270FF 260470FF 26FA5EC4 02E6C1FE 76883A7D ):.v±èl.á^°&.p.&.p.&.7.g.8..á..à 0001E0
```

Dump of file SATURN:[PCCOMMON.DUMP.DLL]BRDNOPL.TMP;1 on 18-APR-1990 10:37:32.99
File ID (520,34,0)   End of file block 272 / Allocated 272

Virtual block number 126 (0000007E), 512 (0200) bytes

```
 26FA5EC4 80E81240 89261440 8926C028 FA5EC402 E6C1FE76 8822EB8D F2880574 t.¡·.Š".v±èl.á^°+á&.ä.&.ä.Š§á^°& 000000
 750C4608 0A4688D8 8E0375B8 1E000004 C80004CA C95E1F00 EBC02B00 012247C7 úG"..+áŠ..^èb..à....¡u..Ä.F..F.u 000020
 478B26FC 5EC40D74 08460806 4688FE56 89FC4689 0C56880A 468825EB 8DF58805 .¡¾.Š%.F..V..F•.V±.F..F.t.á^•&.G 000040
 0C46080A 46880B8E 03F5881E 000004C8 0008CAC9 1F00EBC0 28078926 065EC422 "á^.&..+áŠ..èb..à....¡¾..Ä.F..F. 000060
 8826FC5E C40C7408 46080646 88FE5689 FC46890C 56880A46 8824EB8D F5880575 u.¡¾.Š$.F..V..F•.V±.F..F.t.á^•&. 000080
 1046080E 46880B8E 0436881E 000006C8 0008CAC9 1F00EBC0 28078926 065EC407 .á^.&..+áŠ..èb..à....¡6..Ä.F..F. 0000A0
 D8F7C01B 01227F83 26FC5EC4 FE5689FC 46891056 880E4688 0095E98D F5880675 u.¡¾.Õ...F..V..F•.V±á^•&.."..á¾Ä 0000C0
 08460806 46885F74 00FA7E83 078926FA 46880A5E C409740C 46080A46 88FA4689 .F°.F..F.t.á^..F°&...~°.t_.F..F. 0000E0
 88261647 8826FC5E C4025789 26078926 065EC414 57882612 478826FC 5EC45774 tWá^•&.G.&.W.á^.&..&.W.á^=&.G.&. 000100
 26084789 26065EC4 1C578826 1A478826 FC5EC406 57892604 47892606 5EC41857 W.á^.&.G.&.W.á^•&.G.&.W.á^.&.G.& 000120
 CAC91F00 EBC02B0E 5789260C 47892606 5EC42057 88261E47 8826FC5E C40A5789 .W.á^•&.G.&.W á^.&.G.&.W.+áŠ..èb 000140
 880A4688 013EE98D F5880675 0C46080A 46880B8E 0476881E 56570000 0CC8000C ..à...WV.¡v..Ä.F..F.u.¡¾.Õ>..F.. 000160
 F088F47E 8D08568B 06468801 21E90374 00227F83 26FC5EC4 FE5689FC 46890C56 V..F•.V±á^•&..".t.Õl..F..V..-¶.Þ 000180
 5016F446 8D185711 26164701 26FA5688 F84688FE 468E1FA5 A5A5A5DA 8E1E0716 ....ÕEEEE..F±.F½.V°&.G.&.W..F¶.P 0001A0
 6803E968 1E041268 1E1074C0 0808C483 05C80516 9A0677FF 260877FF 26FC5EC4 á^•&.w.&.w....ù..á..Àt..h...hÕ.h 0001C0
 FC5EC450 16F4468D 20571126 1E470126 FA5688F8 4688FC5E C4000005 E09A0179 y..Å...á^•.F½.V°&.G.&.W .F¶.Pá^• 0001E0
```

```
Dump of file SATURN:[PCCOMMON.DUMP.DLL]BRDNOPL.TMP;1 on 18-APR-1990 10:37:32.99
File ID (520,34,0)   End of file block 272 / Allocated 272

Virtual block number 127 (0000007F), 512 (0200) bytes

9A017D68 0418681˙ 0441681E 1074C008 08C48303 8905169A 0E77FF26 1077FF26 &.w.&.w....¿..á..åt..hA..h..h).. 000000
89F84689 02578826 078826F6 5689F446 89065788 26044788 26065EC4 0000034D M...á^.&.G.&.W..F¶.V-&..&.W..F%. 000020
05169A02 77FF2604 77FF26FC 5EC45016 F4468D14 57112612 470126FC 5EC4FA56 V*á^•&.G.&.W..F¶.Pá^•&.w.&.w.... 000040
88F84688 FC5EC400 0006729A 01856804 47681E04 70681E10 74C00808 C4830650 ]..á..åt..hp..hG.h...r...á^•.F%. 000060
83058E05 169A0A77 FF260C77 FF26FC5E C45016F4 468D1C57 11261A47 0126FA56 V*&.G.&.W..F¶.Pá^•&.w.&.w....... 000080
08CAC95F 5E1F00E8 C0280000 05A39A01 89680476 681E049F 681E1074 C00808C4 á..åt..h...hv.h...È...+åŠ..^_èb. 0000A0
0C56880A 4688015B E98DF588 06750C46 080A4688 D88E052A 881E5600 0012C800 .à...V.¡*..Ä.F..F.u.¡%.Ö[..F..V. 0000C0
FE5689FC 46890856 88064688 0141E980 F5880675 08460806 4688F856 89F64689 .F-.V%.F..F.u.¡%.ÖA..F..V..F•.V± 0000E0
FA76883C 7D04FA7E 83FA46FF 03E80000 FA46C701 24E90374 00227F83 26FC5EC4 á^•&..".t.Ö$.úF*..Š..F*.-*.)<.v* 000100
FF260470 FF26F65E C40270FF 260470FF 26FC5EC4 038287FF E3D1FA5E 8802E6C1 èl..^*1D.ñý.á^•&.p.&.p.á^-&.p.&. 000120
227F8326 F65EC488 EB000EE9 8DF28806 74C0080C C4830620 0AFD9A37 FF260270 p.&.7.». ..á..åt.¡·.Ö8.Šéá^-&..* 000140
7D04FA7E 83FA46FF 03E80000 FA46C722 478926F6 5EC42247 8826FC5E C43F7400 .t?á^•&.G"á^-&.G"úF*..Š..F*.-*.) 000160
E9D9E814 50892612 408926F6 5EC41450 88261240 8826FC5E C402E6C1 FA76881E ..v*èl.á^•&.a.&.P.á^-&.a.&.P.Š1Ö 000180
26124088 26FC5EC4 02E6C1FA 76887F7D 04FA7E83 FA46FF03 E80000FA 46C7008F ..úF*..Š..F*.-*.)..v*èl.á^•&.a.& 0001A0
83E301FA 5E88F056 89EE4689 14508826 12408826 F65EC4F4 5689F246 89145088 .P..F·.V¶á^-&.a.&.P..FŸ.Vb.^*1D. 0001C0
26124089 26F45688 F24688F6 5E881176 F2463905 7F187CF4 56391F74 000382BF éý..t.9V¶|...9F·v..^-.F·.V¶&.a.& 0001E0

Dump of file SATURN:[PCCOMMON.DUMP.DLL]BRDNOPL.TMP;1 on 18-APR-1990 10:37:32.99
File ID (520,34,0)   End of file block 272 / Allocated 272

Virtual block number 128 (00000080), 512 (0200) bytes

F65EC402 E6C1FA76 881773F2 4639057C 1E7FF456 39F05688 EE468829 EB145089 .P.Š).FŸ.Vb9V¶..|.9F·s..v*èl.á^- 000000
56000016 C80008CA C95E1F00 EBC028FF 78E91450 89261240 8926F456 88F24688 .F·.V¶&.a.&.P.Öx.+åŠ..^èb..à...V 000020
F05689EE 46890C56 880A4688 020DE980 F5880675 0C46080A 4688D88E 0688881E .|...Ä.F..F.u.¡%.Ö...F..V..FŸ.Vb 000040
C400CDE9 03AA8788 E3D1F65E 8801DAE9 037C04F6 7E83F646 FF03E800 00F646C7 úF-..Š..F-.—.|.ÖÖ..^-1D..˙.Öë.á 000060
8826FE56 89FC4689 0E578826 0C478826 FA5689F8 46890657 88260447 8826065E ^.&.G.&.W..F%.V*&.G.&.W..F•.V±&. 000080
8826FA56 89F84689 02578826 07882606 5EC40080 E9F45689 F2468902 57882607 .&.W..F·.V¶Ö§.á^.&..&.W..F%.V*&. 0000A0
065EC400 8EE9F456 89F24689 06578826 04478826 FE5689FC 46890A57 88260847 G.&.W..F•.V±&.G.&.W..F·.V¶Ö..á^. 0000C0
08478826 FE5689FC 46890E57 88260C47 8826FA56 89F84689 06578826 04478826 &.G.&.W..F%.V*&.G.&.W..F•.V±&.G. 0000E0
08478826 FA5689F8 46890257 88260788 26065EC4 5FE8F456 89F24689 0A578826 &.W..F·.V¶Š_á^.&..&.W..F%.V*&.G. 000100
681E04CE 681E31E8 F45689F2 46890E57 88260C47 8826FE56 89FC4689 0A578826 &.W..F•.V±&.G.&.W..F·.V¶Š1.hö..h 000120
1EE90375 00043083 74000230 FF5AE903 75000130 1FE80000 06359A01 F56804A5 È.h%..5...Š.»..u.ÖZ.=..t*»..u.Ö. 000140
F65E88F8 76FFFA76 FFFC76FF FE76FFF2 76FFF476 FFCFE8FF 74E90375 000830FF .»..u.Öt.Šü.v¶.v·.v±.v•.v*.v%.^- 000160
83070805 A19A37FF 260270FF 260470FF 26EE5EC4 02E6C1F6 768803B2 87FFE3D1 1D.ñý..v-èl.á^Ÿ&.p.&.p.&.7.À.... 000180
88F24688 02E6C1F6 ˙6881674 00227F83 26EE5EC4 0085E980 F2880674 C00814C4 á..åt.¡·.Öç.á^Ÿ&..".t..v-èl..F·. 0001A0
460302E0 C1F64688 3A740003 82BF83E3 D1F65E88 7EEB1450 89261240 8926F456 V¶&.a.&.P.Š-.^-1D.éý..t:.F-èÄ..F 0001C0
3926057C 147F0257 3926F456 88F24688 EA5EC4EC 5689EA46 89001205 F05688EE Ÿ.Vb....Fö.V±á^ö.F·.V¶&9W...|.&9 0001E0

Dump of file SATURN:[PCCOMMON.DUMP.DLL]BRDNOPL.TMP;1 on 18-APR-1990 10:37:32.99
File ID (520,34,0)   End of file block 272 / Allocated 272

Virtual block number 129 (00000081), 512 (0200) bytes

1205F056 88EE4603 02E0C1F6 468838E8 02578926 078926F4 5688F246 88007307 .s..F·.V¶&..&.W.Š8.F-èÄ..FŸ.Vb.. 000000
F2468800 76073926 057F147C 02573926 F45688F2 4688EA5E C4EC5689 EA468900 ..Fö.V±á^ö.F·.V¶&9W.|...&9.v..F· 000020
EBC02800 002247C7 26067400 227F8326 EE5EC4FE 1AE90257 89260789 26F45688 .V¶&..&.W.Ö.±á^Ÿ&..".t.&úG"..+åŠ 000040
00C1E980 F5880675 1046080E 4688D88E 0802881E 5600000E C80008CA C95E1F00 ..^èb..à...V.¡...Ä.F..F.u.¡%.Öè. 000060
0C56880A 468800A7 E98DF588 06750C46 080A4688 F45689F2 46891056 880E4688 .F..V..F·.V¶.F..F.u.¡%.Ö[..F..V. 000080
00F646C7 0000FE46 C775E800 00FE46C7 07740022 7F8326F8 5EC4FA56 89F84689 .F%.V*á^%&..".t.úF±..ŠuúF±..úF-. 0000A0
038287FF E3D1F65E A95016FC 468D02E6 C1F67688 607D04F6 7E83F646 FF03E800 .Š..F-.—.)'.v-èl..F•.P.^-1D.ñý. 0000C0
C0080EC4 8309500C E79A0270 FF260470 FF26F25E C40270FF 260470FF 26F85EC4 á^%&.p.&.p.á^·&.p.&.p..Ö.]..á..á 0000E0
8308E824 E88E1188 077503FC 7E830000 09069A02 366804D4 681E04FD 681E1074 t..h»..hå.h6.......~•.u.¡..ŠŠŠ.. 000100
E8C02807 8926FE46 88065EC4 09740846 08064688 97E80001 FE46C705 7502FC7E ~•.u.úF±..Š..F..F.t.á^..F±&..+åŠ 000120
0193E980 F5880675 1046080E 4688D88E 0A2E881E 56000014 C8000CCA C95E1F00 ..^èb..à...V.¡...Ä.F..F.u.|%.Ö.. 000140
880170E9 037C04F4 7E83F446 FF03E800 00F446C7 EE5689EC 46891056 880E4688 .F..V..F&.VŸúF¶..Š..F¶.-¶.|.Öp.. 000160
0C478826 FA5689F8 46890657 88260447 88260A5E C400CDE9 03AA8788 E3D1F45E ^¶1D..˙.Öë.á^.&.G.&.W..F%.V*&.G. 000180
0788260A 5EC40080 E9F25689 F0468902 57882607 8826FE56 89FC4689 0E578826 &.W..F•.V±&..&.W..Fb.V·Ö§.á^.&.. 0001A0
06578826 04478826 FE5689FC 46890A57 88260847 8826FA56 89F84689 02578826 &.W..F%.V*&.G.&.W..F•.V±&.G.&.W. 0001C0
88260C47 8826FA56 89F84689 06578826 04478826 0A5EC400 8EE9F256 89F04689 .Fb.V·Ö..á^.&.G.&.W..F%.V*&.G.&. 0001E0
```

```
Dump of file SATURN:[PCCOMMON.DUMP.DLL]BRDMOPL.TMP;1 on 18-APR-1990 10:37:32.99
File ID (520,34,0)   End of file block 272 / Allocated 272

Virtual block number 130 (00000082), 512 (0200) bytes

 8B26078B 260A5EC4 5FEBF256 89F04689 0A578B26 08478B26 FE5689FC 46890E57 W..F=.V±&.G.&.W..FÞ.V·Š_é^.&..&. 000000
 46890E57 8B260C47 8B26FE56 89FC4689 0A578B26 08478B26 FA5689F8 46890257 W..F½.V°&.G.&.W..F=.V±&.G.&.W..F 000020
 FF5AE903 7500013D 1FEB0000 0CB09A02 72680503 681E052C 681E31EB F25689F0 Þ.V·Š1.h,..h..hr......Š.=..u.ÕZ. 000040
 FFF276FF 5016F646 8DCFEBFF 74E90375 000830FF 1EE90375 00043083 74000230 =..t°=..u.Õ..=..u.Õt.Šü.F-.P.v·. 000060
 EC5EC402 E6C1F476 8803B2B7 FFE3D1F4 5E8BF876 FFFA76FF FC76FFFE 76FFF076 vÞ.v±.v=.v°.v½.^¶ÌD.ñý..v¶èl.é^& 000080
 9A02766B 0532681E 055B681E 1074C00B 16C4830A 890BAA9A 0270FF26 0470FF26 &.p.&.p..´.¿..é..ât..h[..h2.hv.. 0000A0
 B8057502 F67E8313 7408460B 0646881B EB24EB8E 11880775 03F67E83 00000ACE ö....—.u.¡..ŠŠŠ..F..F.t..—.u.¡ 0000C0
 0EB81E00 0012C800 0CCAC95E 1F00EBC0 2BFE84E9 07892606 5EC4C02B 02EB0001 ..Š.+àé^.&..Õ.±+éŠ..^èò..à....¡. 0000E0
 0A468BF0 5689EE46 89125688 10468801 1EE98DF5 88067512 46081046 88D88E08 ..Ä.F..F.u.¡%.Õ...F..V..FŸ.VÞ.F. 000100
 F246C700 ACE90E46 88FA5689 F846890C 56880A46 880104E9 8DF58806 750C4608 .F.u.¡%.Õ...F..V..F½.V°.F.Õ¯.úF· 000120
 46890C57 8B260A47 8B26F85E C4F65689 F4468904 578B2602 478B26EE 5EC40000 ..é^Ÿ&.G.&.W..F¶.V-é^Ÿ&.G.&.W..F 000140
 F85EC4F6 5689F446 89085788 26064788 26EE5EC4 0000F246 C7009EE9 FE5689FC =.V±Õ..úF·..é^Ÿ&.G.&.W..F¶.V-é^½ 000160
 0C578B26 0A478B26 EE5EC400 01F246C7 75EBFE56 89FC4689 10578B26 0E478B26 &.G.&.W..F=.V±ŠuúF·..é^Ÿ&.G.&.W. 000180
 5EC40001 F246C74C EBFE5689 FC468904 578B2602 478B26F8 5EC4F656 89F44689 .F¶.V-é^½&.G.&.W..F=.V±ŠLúF·..é^ 0001A0
 FE5689FC 46890857 8B260647 8B26F85E C4F65689 F4468910 578B260E 478B26EE Ÿ&.G.&.W..F¶.V-é^½&.G.&.W..F=.V± 0001C0
 0830FF3F E9037500 0430C374 00023DFF 76E90375 00013D1C EB48EB8D F3B823EB Š#¡µ.ŠHŠ.=..u.Õv.=..tú=..u.Õ7.=. 0001E0

Dump of file SATURN:[PCCOMMON.DUMP.DLL]BRDMOPL.TMP;1 on 18-APR-1990 10:37:32.99
File ID (520,34,0)   End of file block 272 / Allocated 272

Virtual block number 131 (00000083), 512 (0200) bytes

 830C680F 5D9AF47  FFF676FF F276FFFC 76FFFE76 FF0676FF 0876FF0D E88D7400 .t.Šì.v..v..v±.v=.v·.v-.v¶.].k.. 000000
 4688D88E 0C8FB81E 000016C8 000ECAC9 1F00EBC0 2B04EB8E 10880574 C0080EC4 à..ât.¡..Š.+àŠ..èò..à....¡¢..Ä.F 000020
 46C7011A E90E4688 EC5689EA 46891256 88104688 0181E98D F5880675 12460810 ..F.u.¡%.Õ...F..V..FÕ.VŠ.F.Õ..úF 000040
 89065788 26044788 260A5EC4 F25689F0 46890457 88260247 8B26EA5E C40000EE Ÿ..é^õ&.G.&.W..FÞ.V·é^.&.G.&.W.. 000060
 5689F446 890A5788 26084788 26FE5689 FC46890E 5788260C 478B26FA 5689F846 F½.V°&.G.&.W..F=.V±&.G.&.W..F¶.V 000080
 0788260A 5EC4F256 89F04689 08578B26 06478B26 EA5EC400 00EE46C7 00F3E9F6 -Õµ.úFŸ..é^õ&.G.&.W..FÞ.V·é^.&.. 0000A0
 0E578B26 0C478B26 FE5689FC 46890A57 88260847 8B26FA56 89F84689 02578B26 &.W..F½.V°&.G.&.W..F=.V±&.G.&.W. 0000C0
 C4F25689 F046890C 5788260A 478B26EA 5EC40001 EE46C700 AEE9F656 89F44689 .F¶.V-ÕÜ.úFŸ..é^õ&.G.&.W..FÞ.V·é 0000E0
 8B26FE56 89FC4689 0E578B26 0C478B26 FA5689F8 46890657 88260447 88260A5E ^.&.G.&.W..F½.V°&.G.&.W..F=.V±&. 000100
 F0468910 5788260E 478B26EA 5EC40001 EE46C76A EBF65689 F4468902 578B2607 .&.W..F¶.V-ŠjúFŸ..é^õ&.G.&.W..FÞ 000120
 5689FC46 890A5788 26084788 26FA5689 F8468902 578B2607 88260A5E C4F25689 .V·é^.&..&.W..F½.V°&.G.&.W..F=.V 000140
 FF24E903 75000130 1FEB57E8 8DF38826 EBF65689 F4468906 578B2604 478B26FE ±&.G.&.W..F¶.V-Š&¡µ.ŠWŠ.=..u.ÕŠ. 000160
 F676FF06 76FF0876 FFDAEBFF 54E90375 00083DFE D1E90375 00043DA8 7400023D =..t´=..u.Õì±=..u.ÕT.ŠÖ.v..v..v- 000180
 16C48300 D000E69A F076FFF2 76FFEE76 FFF876FF FA76FFFC 76FFFE76 FFF476FF .v¶.v±.v=.v°.v½.vŸ.v·.vÞ.Ì.Ï..é. 0001A0
 080A4688 D88E0DFA 881E0000 04C8000E CAC91F00 EBC02B04 EB8E1088 0574C008 .ât.¡..Š.+éŠ..èò..à....¡°..Á.F.. 0001C0
 64880975 08460806 4688FE56 89FC4689 0C56880A 46880152 E980F588 06750C46 F.u.¡%.ÕR..F..V..F=.V±.F..F.u.¡d 0001E0

Dump of file SATURN:[PCCOMMON.DUMP.DLL]BRDMOPL.TMP;1 on 18-APR-1990 10:37:32.99
File ID (520,34,0)   End of file block 272 / Allocated 272

Virtual block number 132 (00000084), 512 (0200) bytes

 C40CC483 0FF60010 9A0676FF 0876FF05 61681E0A 76FF0C76 FF085E8C 0646890B ..F..^..v..v..ha..v..v....-..é.é 000000
 FC5EC435 E808C483 102D0010 9A0676FF 0876FF05 6C681E14 7400227F 8326FC5E ^=&..".t..hl..v..v....-..é.Š5é^= 000020
 1277FF26 1477FF26 1677FF26 1877FF26 1A77FF26 1C77FF26 1E77FF26 2077FF26 &.w &.w.&.w.&.w.&.w.&.w.&.w.&.w. 000040
 6C00109A 0676FF08 76FF05A8 681E18C4 83103F00 109A0676 FF0876FF 0583681E .h...v..v....?..é..h´..v..v....l 000060
 1E0AC483 10871150 9A0277FF 260477FF 26FC5EC4 006A0676 FF0876FF 08C48310 ..é..v..v.j.é^=&.w.&.w..P....é.. 000080
 0877FF26 FC5EC400 6A0676FF 0876FF08 C4831099 00109A06 76FF0876 FF05B668 hÅ..v..v.......é..v..v.j.é^=&.w. 0000A0
 76FF08C4 8310C600 109A0676 FF0876FF 05C4681E 0AC48310 B411509A 0677FF26 &.w..P.Ç..é..hé..v..v....ó..é..v 0000C0
 0876FF05 D2681E0A C48310E1 11509A0A 77FF260C 77FF26FC 5EC4016A 0676FF08 ..v.j.é^=&.w.&.w..P.Ä..é..h@..v. 0000E0
 509A0E77 FF261077 FF26FC5E C4016A06 76FF0876 FF08C483 10F30010 9A0676FF .v....µ..é..v..v.j.é^=&.w.&.w..P 000100
 08CAC91F 00EBC02B 08C483FF FF00109A 0676FF08 76FF05E0 681E0AC4 830F7811 .(..é..hÁ..v..v.......é.+éŠ..èò. 000120
 0FDA0002 0000000F 105A0002 00220003 01450203 00140003 01950203 00069000 ..............E..."...Z.......Õ. 000140
 00000000 00000000 00000000 02800006 0C120203 00000019 0F980002 00000017 ..................§............. 000160
 B80574C0 0B0000FF FF9A5016 FC46800E 6A0E6A06 76FFD88E FFFFB81E 000004C8 à....¡...Á.v.j.j..F=.P......ât.¡ 000180
 8926FC5E C4044789 26064789 26FC5EC4 07892602 478926C0 2BFC5EC4 45EB0001 ..ŠEé^=+à&.G.&..é^=&.G.&.G.é^=&. 0001A0
 8926FE56 88FC4688 085EC410 740A460B 0846880A 4789260C 478926FC 5EC40847 G.é^=&.G.&.G..F..F.t.é^..F=.V±&. 0001C0
 260C4789 26C02B08 5EC4088E 0006881E 000000C8 CBC91F00 EBC02B02 57892607 .&.W.+àŠ..èùà....¡...Äé^.+à&.G.& 0001E0
```

Dump of file SATURN:[PCCOMMON.DUMP.DLL]BRDNOPL.TMP;1 on 18-APR-1990 10:37:32.99
File ID (520,34,0) End of file block 272 / Allocated 272

Virtual block number 133 (00000085), 512 (0200) bytes

```
C91F00EB C02B04EB 0001B805 74C00B00 00FFFF9A 0876FF0A 76FF0676 FF0A4789 .G..v..v..v.......ât.¡..Š.+âŠ..è 000000
8B26FC5E C46674C2 0BFE5689 FC46890A 56880846 8B088E00 72881E00 0008C8C8 ùà....¡r..Ä.F..V..F=.V±.ôtfá^=&. 000020
06C483FF 8FE80E06 76FF5306 3474FA46 0BF84688 FA5689F8 46890C57 8B260A47 G.&.W..F%.V'.F%.F't4.S.v..Ô...á. 000040
0C578826 0A478826 FC5EC4FE 5689FC46 89FA5688 F84688 3C EB000188 0574C00B .ât.¡..Š<.F%.V'.F=.V±á^=&.G.&.W. 000060
EB000188 0574C00B 06C483FF 57E80E06 76FFFC76 FFFE76FF C4EBFA56 89F84689 .F%.V'Šá.v±.v=.v..ÔW..á..ât.¡..Š 000080
681E060A 681E1075 08460806 4688088E 00A7881E 00000CC8 CBC91F00 EBC02B04 .+âŠ..èùà....¡Ï..Ä.F..F.u..h...h 0000A0
46880C56 890A4689 08568806 46880C75 0C46080A 46880000 01909A00 8A6805E2 â.ho........F..F.u..F..V..F..V..F 0000C0
26057F17 7C025739 2410568B 0E46880A 5EC42674 08563905 75064639 0C56880A ..V.9F.u.9V.t&á^..F..V.&9W.|...& 0000E0
880A4688 FC4689FE 4689C02B 0000FFFF 9A008E68 061A681E 0642681E 10760739 9.v..hB..h..h/......+â.F±.F=.F.. 000100
8826F45E C411EBF6 5F89F446 890C578B 260A4788 260A5EC4 FA5689F8 46890C56 V..F%.V'á^.&.G.&.W..F¶.V-Š.á^¶&. 000120
57392610 56880E46 8BF45EC4 3074F646 0BF44688 F65689F4 46890C57 8B260A47 G.&.W..F¶.V-.F¶.F-tOá^¶.F..V.&9W 000140
89F84689 C28CC38B 0CEBFE56 89FC4689 FA5688F8 46880E76 07392605 7F157C02 .|...&9.v..F%.V'.F=.V±Š..ü.ô.F%. 000160
10741446 0812468B FE5689FC 4689FA56 8BF84688 0C75FE46 0BFC4688 87EBFA56 V'Šñ.F=.F±u..F%.V'.F=.V±.F..F.t. 000180
8E012EB8 1E000004 C8CBC91F 00EBC02B 02578926 078926FE 568BFC46 8B125EC4 á^..F=.V±&..&.W.+âŠ..èùà....¡... 0001A0
0847C726 FC5EC425 EB000188 0574C00B 06C483FD 83E80E06 76FF5016 FC468008 Ä.F=.P.v..Ô°».á..ât.¡..Š%á^=&ùG. 0001C0
C91F00EB C0280257 89260789 26FE5688 FC468808 5EC41074 0A460808 46880001 ...F..F.t.á^..F=.V±&..&.W.+âŠ..è 0001E0
```

Dump of file SATURN:[PCCOMMON.DUMP.DLL]BRDNOPL.TMP;1 on 18-APR-1990 10:37:32.99
File ID (520,34,0) End of file block 272 / Allocated 272

Virtual block number 134 (00000086), 512 (0200) bytes

```
CBC91F00 EB06C483 FE09E80E 0676FF08 76FF0A76 FFD88E02 30881E00 0000C8CB ùà....¡=..Ä.v..v..v..Ô.±.á.Š..èù 000000
46890A56 8B08468B F04689F2 4689F846 89FA4689 C02B088E 02B7881E 000010C8 à....¡...Ä+â.F'.F%.F·.FÞ.F..V..F 000020
E90375F6 460BF446 8BF65689 F446890C 578B260A 478826F4 5EC411EB F65689F4 ¶.V-Š.á^¶&.G.&.W..F¶.V-.F¶.F-u.Ô 000040
8B26F45E C40090E9 0001B806 74C00806 C483FD12 E80E0676 FF5016FC 46800080 ...F=.P.v..Ô.».á..ât.¡..Ô..á^¶&. 000060
478926FC 5EC40657 8B260447 8B26F45E C4025789 26078926 FC5EC402 57882607 .&.W.á^=&..&.W.á^¶&.G.&.W.á^=&.G 000080
568BFC46 880C75FA 460BF846 8B084789 26FC5EC4 08478826 F45EC406 57892604 .&.W.á^¶&.G.á^=&.G..F%.F'u..F=.V 0000A0
0C578926 0A478926 FE5688FC 4688F05E C41174F2 460BF046 8BFA5689 F84689FE ±.F%.V'.FÞ.F·t.á^Þ.F=.V±&.G.&.W. 0000C0
FA5688F8 46880C5E C410740E 46080C46 8BFF57E9 F25689F0 4689FE56 8BFC4688 .F=.V±.FÞ.V·ÔW..F..F.t.á^..F%.V' 0000E0
46890856 88064688 D88E02A6 881E0000 08C8C8C9 1F00E8C0 28025789 26078926 &..&.W.+âŠ..èùà....¡Ï..Ä.F..V..F 000100
FC46890C 5788260A 478826FC 5EC422E8 FA5689F8 46890C56 880A4688 FE5689FC =.V±.F..V..F%.V'Š"á^=&.G.&.W..F= 000120
0BF8468B 5F74FE46 0BFC4688 FA5689F8 46890C57 8B260A47 8826F85E C4FE5689 .V±á^¥&.G.&.W..F%.V'.F=.F±t_.F%. 000140
5EC40257 8B26078B 26F85EC4 4274FE56 390575FC 4639FA56 8BF84688 5774FA46 F'tW.F%.V'9F=u.9V±tBá^¥&..&.W.á^ 000160
16750447 3926FC5E C406578B 2604478B 26F85EC4 2A750257 39263075 073926FC =&9.u0&9W.u*á^¥&.G.&.W.á^=&9G.u. 000180
46080E46 8BFF77E9 03E80274 08473926 FC5EC408 478826F8 5EC41075 06573926 &9W.u.á^¥&.G.á^=&9G.t.Š.Ôw..F..F 0001A0
0789260E 5EC4C02B 02E80001 8B0575FE 56390A75 FC4639FA 568BF846 8B107410 .t..F%.V'9F=u.9V±u.¡..Š.+âá^.&.. 0001C0
75681E06 90681E10 750A460B 08468808 8E0394B8 1E000000 C8CBC91F 00EBC02B +âŠ..èùà....¡...Ä.F..F.u..h...hu 0001E0
```

Dump of file SATURN:[PCCOMMON.DUMP.DLL]BRDNOPL.TMP;1 on 18-APR-1990 1:37:32.99
File ID (520,34,0) End of file block 272 / Allocated 272

Virtual block number 135 (00000087), 512 (0200) bytes

```
76FF0A77 FF260C77 FF261B74 0C470826 0A478826 085EC400 0004C99A 01666806 .hf..è...á^.&.G.&.G.t.&.w.&.w..v 000000
05681E10 74024708 26078826 085EC462 EB000188 0574C008 06C483FB FCE80E06 ..Ô=«.á..ât.¡..Šbá^.&..&.G.t..hf 000020
681E0713 681E1074 06470826 04478826 085EC400 0004E69A 01606806 AD681E06 ..hÙ.hm..Ï...á^.&.G.&.G.t..h...h 000040
9A016F68 072A681E 0752681E 10750008 7F832608 5EC40000 05009A01 6E6806EB Š.hn......á^.&....u..hR..h*.ho.. 000060
D88E0460 881E0000 04C8C8C9 1F00EB0A 4789260C 478926C0 2B085EC4 00000146 F...á^.+â&.G.&.G.Š..èùà....¡m..Ä 000080
260A4788 26065EC4 00000485 9A018768 075F681E 0787681E 10750846 08064688 .F..F.u..h...h .h.......á^.&.G.& 0000A0
0BFC4688 FE5689FC 46890C57 8B260A47 8B26FC5E C411EBFE 5689FC46 890C578B .W..F=.V±Š.á^=Ï.G.&.W..F=.V±.F=. 0000C0
00087F83 26FC5EC4 02571126 070126FC 5EC40257 8B26078B 260A5EC4 3674FE46 F±t6á^.&..&.W.á^=&..&.W.á^=&.... 0000E0
C91F00EB C02B81E8 06571126 04470126 FC5EC406 57882604 4788260A 5EC41675 u.á^.&.G.&.W.á^=&.G.&.W.ŠŸ+âŠ..è 000100
E19A0180 68079768 1E07BF68 1E10750A 46080846 88088E05 1C881E00 0016C8CB ùà....¡...Ä.F..F.u..he..h..h¯..Ä 000120
01816807 CF681E07 F7681E10 720E4639 057F177C 10563914 56881246 88000005 ....F..V.9V.|...9F.r..h%..hü.hŸ. 000140
C483F82A E80E0876 FF0A76FF 006A006A 0E76FF10 76FF5016 EA468000 0005349A .4....Fõ.P.v..v.j.j..v..v..Ô°«.á 000160
C410C483 F80CE80E 0876FF0A 76FFEA76 FFEC76FF 1276FF14 76FF5016 F0468010 ..FÞ.P.v..v..vš.võ.v..v..Ô.«.á.á 000180
47392606 7F287C06 5739261B 56881646 88147400 0C7E833D 7500087F 8326EA5E ^õ&....u=.-..t..F..V.&9W.|+..&9G 0001A0
47392609 7F0253E9 037D0657 39261856 8816468B 0262E903 74000C7E 83237204 .r#.-..t.Ôb..F..V.&9W.).ÔS...&9G 0001C0
56880E46 88EA5EC4 000CE903 75EC5639 08750838 0A568808 46880248 E9037704 .w.ÔH..F..V.;Äu.9Všu.ÔÉ.á^õ.F..V 0001E0
```

Dump of file SATURN:[PCCOMMON.DUMP.DLL]BRDNOPL.TMP;1 on 18-APR-1990 10:37:32.99
File ID (520,34,0) End of file block 272 / Allocated 272

Virtual block number 136 (00000088), 512 (0200) bytes

```
390098E9 0374083B F25688F0 468800C2 E9037402 57392600 C8E90374 07392610 .&9.t.Õù.&9W.t.Õõ..FÞ.V·;Åt.Õ..9 000000
043AE900 01B80674 C00806C4 83F940E8 0E0676FF 5016FC46 800090E9 0374EC56 V&t.Õ...F•.P.v..ÒM'.á..ât.¡..Õ:. 000020
26FE5688 FC4688FA 5EC40C57 89260A47 8926FC5E C40C5788 260A4788 26EA5EC4 á^õ&.G.&.W.á^=&.G.&.W.á^õ.F•.V±& 000040
88260447 8826EA5E C4025789 26078926 14568812 4688FC5E C40C5789 260A4789 .G.&.W.á^•.F..V.&..&.W.á^õ&.G.&. 000060
4688EA5E C4084789 26FC5EC4 08478826 EA5EC406 57892604 478926FC 5EC40657 W.á^•&.G.&.W.á^õ&.G.á^=&.G.á^õ.F 000080
18568816 4688EA5E C41AE800 000847C7 26EA5EC4 06578926 04478926 18568816 ..V.&.G.&.W.á^õ&úG...$.á^õ.F..V. 0000A0
E90374EA 4639F256 88F04688 015AE900 000847C7 26EA5EC4 06578926 04478926 &.G.&.W.á^õ&úG...Õ2..FÞ.V·9Fõt.Õ 0000C0
00018806 74C00806 C483F88A E80E0676 FF5016FC 468D0007 E90374EC 5639000F Õ.9V&t.Õ•..F•.P.v..Õ.½.á..ât.¡.. 0000E0
88FC4688 EA5EC40C 5789260A 478926FC 5EC40C57 88260A47 8826EA5E C40377E9 Õw.á^õ&.G.&.W.á^•&.G.&.W.á^õ.F•. 000100
478826EA 5EC40257 89260789 26145688 124688FC 5EC40C57 89260A47 8926FE56 V±&.G.&.W.á^•.F..V.&..&.W.á^õ&.G 000120
46800847 8926FC5E C4084788 26EA5EC4 06578926 04478926 FC5EC406 57882604 .&.W.á^=&.G.&.W.á^õ&.G.á^•&.G..F 000140
88260A47 8826EA5E C40303E9 00018806 74C00806 C483F816 E80E0676 FF5016FC •.P.v..Õ.½.á..ât.¡..Õ..á^õ&.G.&. 000160
5EC40C57 89260A47 8926FE56 88FC4688 EA5EC40C 5789260A 478926FC 5EC40C57 W.á^•&.G.&.W.á^õ.F•.V±&.G.&.W.á^ 000180
E8065789 26044789 26185688 164688FC 5EC40257 89260789 26105688 0E4688FC •.F..V.&..&.W.á^•.F..V.&.G.&.W.$ 0001A0
478826EA 5EC402A0 E90001B8 0674C008 06C483F7 83E80E06 76FF5016 FC46806D m.F•.P.v..Õ°¥.á..ât.¡..Õ..á^õ&.G 0001C0
5789260A 478926FE 5688FC46 88EA5EC4 0C578926 0A478926 FC5EC40C 5788260A .&.W.á^•&.G.&.W.á^õ.F•.V±&.G.&.W 0001E0
```

Dump of file SATURN:[PCCOMMON.DUMP.DLL]BRDNOPL.TMP;1 on 18-APR-1990 10:37:32.99
File ID (520,34,0) End of file block 272 / Allocated 272

Virtual block number 137 (00000089), 512 (0200) bytes

```
89260447 89261856 88164688 FC5EC402 57892607 89261056 880E4688 FC5EC40C .á^•.F..V.&..&.W.á^•.F..V.&.G.&. 000000
35E90375 EC563908 75EA4639 F25688F0 4688EC56 89EA4689 FE5688FC 46880657 W..F=.V±.Fõ.V&.FÞ.V·9Fõu.9V&u.Õ5 000020
26067F28 7C065739 26185688 16468814 74000C7E 83307500 087F8326 F05EC402 .á^Þ&....u=.-..t..F..V.&9W.|+..& 000040
26097F00 89E9037D 06573926 18568816 468800C8 E9037400 0C7E8323 72044739 9G.r#.~..t.ÕÀ..F..V.&9W.).Õ¿...& 000060
16FC468D 009AE903 75025739 26097507 39261456 88124688 00AEE903 77^44739 9G.w.ÕÜ..F..V.&9.u.&9W.u.Õ...F•. 000080
0C578826 0A478826 F05EC401 C5E90001 880674C0 0806C483 F6D8E80E 067c F50 P.v..ÕÀ-.á..ât.¡..Õ¢.á^Þ&.G.&.W. 0000A0
88FC5EC4 0C578926 0A478926 FE5688FC 4688F05E C40C5789 260A4789 26FC5.C4 á^=&.G.&.W.á^Þ.F=.V±&.G.&.W.á^•. 0000C0
89260447 8926FC5E C4065788 26044788 26F05EC4 02578926 07892614 56881246 F..V.&..&.W.á^Þ&.G.&.W.á^=&.G.&. 0000E0
57892604 47892618 56881646 88F05EC4 08478926 FC5EC408 478826F0 5EC40657 W.á^Þ&.G.á^=&.G.á^Þ.F..V.&.G.&.W 000100
5788260A 478826EA 5EC4F256 89F04689 FE5688FC 46880000 0847C726 F05EC406 .á^Þ&úG....F=.V±.FÞ.V·á^õ&.G.&.W 000120
F64608F4 4688F656 89F44689 0C578826 0A478826 F45EC411 E8F65689 F446890C ..F¶.V-$.á^¶&.G.&.W..F¶.V-.F¶.F- 000140
7E833475 00087F83 26F45EC4 58E80275 F6563907 75F44639 F25688F0 46886A74 tj.FÞ.V·9F¶u.9V-u.$Xá^¶&....u4.- 000160
46882875 000C7E83 1A720447 3926067F 227C0657 39261856 88164688 1474000C ..t..F..V.&9W.|"..&9G.r..-..u+.F 000180
06578926 04478926 18568816 46881776 04473926 067F1F7C 06573926 18568816 ..V.&9W.|...&9G.v..F..V.&.G.&.W. 0001A0
260A4788 26F85EC4 FA5689F8 4689EC56 88EA4688 FF7DE900 000847C7 26F45EC4 á^¶&úG...Õ)..Fõ.V&.F½.V'á^½&.G.& 0001C0
C02802E8 00018805 75F65639 0A75F446 39F25688 F04688F6 5689F446 890C5788 .W..F¶.V-.FÞ.V·9F¶u.9V-u.¡..$.+& 0001E0
```

Dump of file SATURN:[PCCOMMON.DUMP.DLL]BRDNOPL.TMP;1 on 18-APR-1990 10:37:32.99
File ID (520,34,0) End of file block 272 / Allocated 272

Virtual block number 138 (0000008A), 512 (0200) bytes

```
26F85EC4 06578826 04478826 48750008 7F8326F4 5EC45275 00087F83 26EE4689 .FY&....uRá^¶&....uH&.G.&.W.á^½& 000000
5789260A 478926F8 5EC40C57 88260A47 8826F45E C4317506 57392637 75044739 9G.u7&9W.u1á^¶&.G.&.W.á^½&.G.&.W 000020
26F85EC4 11E820E8 00018805 74C00806 C483F59E E80E0676 FFF476FF F676FF0C ..v~.v¶.v..Õ.¥.á..ât.¡..$ $.á^½& 000040
0004C8C8 C91F00E8 C028FF62 E9037500 EE7E83FA 5689F846 890C5788 260A4788 .G.&.W..F½.V'.~Y.u.Õb.+á$..èùà.. 000060
88000008 339A022F 6807FF68 1E082768 1E10750A 46080846 88D88E05 A7881E00 ..¡Ï..Á.F..F.u..h'..h..h/..3.... 000080
FC46890E 56880C46 88000005 8F9A0230 68083E68 1E086668 1E10750E 46080C46 F..F.u..hf..h>.h0..¢....F..V..F= 0000A0
5EC44574 FE4608FC 4688FE56 89FC4689 0C578826 0A478826 FC5EC411 E8FE5689 .V±$.á^•&.G.&.W..F=.V±.F=.F±tÉá^ 0000C0
FF26FC5E C437FF26 0277FF26 0A5FC426 0477FF26 0677FF26 39750008 7F8326FC =&....u9&.w.&.w.&á .&.w.&.7á^•&. 0000E0
E80001B8 0574C008 14C483FA 0CE80E06 76FF0876 FF0A76FF 1076FF37 FF260277 w.&.7.v..v..v..v..Õ.ª.á..ât.¡..$ 000100
08A1681E 10750846 08064688 D88E0803 881E0000 0EC8C8C9 1F00E8C0 28A2E806 .$Á+á$..èùà....¡...Á.F..F.u..hÀ. 000120
681E1072 0C463905 7F177C0E 56391256 88104688 000008EA 9A025768 0879681E .hy.hW..õ....F..V.9V.|...9F.r..h 000140
0876FF00 6A006A0C 76FF0E76 FF5016F2 46800000 0818A902 58680881 681E0809 )..hÿ.hx.......F·.P.v..v.j.j..v. 000160
F476FF50 52000A83 00012012 56881046 885016F8 468010C4 83F521E8 0E0676FF .v..ÕI%.á..F½.P.F..V.-...Õ.RP.v¶ 000180
5689FC46 89F45688 F2468800 01F646C7 10C483F4 F8E80E06 76FF0876 FFF276FF .v·.v..v..Õ«¶.á.úF-...F·.V¶.F•.V 0001A0
26FC5EC4 7374FE46 08FC4688 FE5689FC 46890C57 88260A47 8826FC5E C411E8FE ±$.á^•&.G.&.W..F•.V±.F•.F±tsá^•& 0001C0
1A720447 3926067F 227C0657 39261656 88144688 1474000A 7E833475 00087F83 ....u4.~..t..F..V.&9W.|"..&9G.r. 0001E0
```

```
Dump of file SATURN:[PCCOMMON.DUMP.DLL]BRDNOPL.TMP;1 on 18-APR-1990 10:37:32.99
File ID (520,34,0)   End of file block 272 / Allocated 272

Virtual block number 139 (0000008B), 512 (0200) bytes

EB0003F6 46C70775 04473926 067F0F7C 06573926 1656B814 46881875 000A7E83 .-..u..F..V.&9W.|...&9G.v.úF-..$ 000000
5688F846 880002F6 46C70575 06573926 08750447 39261656 B814468B FC5EC42E .á^=.F..V.&9G.u.&9W.u.úF-...F½.V 000020
078926F6 46881B5E C409741A 46081846 88FF74E9 03E80275 FE563907 75083BFA °;Äu.9V±u.Š.Öt..F..F.t.á^..F-&.. 000040
E1681E09 09681E10 7508460B 06468808 8E08B08B 1E000008 C8CBC91F 00EBC02B +åŠ..èùà....¡¯..Ä.F..F.u..h...hÅ 000060
0008C89A 02836809 19681E09 41681E10 750C4608 0A468800 0000109A 02826808 .h........F..F.u..hA..h..h...à.. 000080
A2E90001 8806750C 4708260A 4788260A 5EC41375 0C470826 0A478826 065EC400 .á^.&.G.&.G.u.á^.&.G.&.G.u.¡..ÕÄ 0000A0
890C5788 260A4788 26FC5EC4 11E8FE56 89FC4689 0C56880A 46880001 FA46C700 .úF°...F..V..F=.V±Š.á^=&.G.&.W.. 0000C0
0677FF26 5016F846 80557500 087F8326 FC5EC461 74FE4608 FC4688FE 5689FC46 F=.V±.F=.F±tað^=&....wU.F½.P&.w. 0000E0
FF0876FF 0E76FF37 FF260277 FF26FC5E C437FF26 0277FF26 0A5FC426 0477FF26 &.w.&á_.&.w.&.7á^=&.w.&.7.v..v.. 000100
E80FE800 03FA46C7 097503F8 7E8331E8 00018805 74C00816 C483FE04 E80E0676 v..Ò.±.á..át.¡..$1.-½.u.úF°..Š.Š 000120
28078926 FA468810 5EC40974 12460810 468886E8 0002FA46 C7057502 F87E8308 ..-½.u.úF°..Š..F..F.t.á^..F°&..+ 000140
0952681E 097A681E 10750846 08064688 088E0CED 881E0000 16C8C8C9 1F00E8C0 åŠ..èùà....¡Ú..Ä.F..F.u..hz..hR. 000160
681E09B2 681E1072 0C463905 7F177C0E 56391256 88104688 00000E26 9A028668 hÑ..&....F..V.9V.|...9F.r..hý..h 000180
0E0676FF 0876FF00 6A006A0C 76FF0E76 FF5016EA 46800000 00059A02 8768098A ..hñ.......Fõ.P.v..v.j.j..v..v.. 0001A0
FFEA76FF EC76FF50 52000A83 00012D12 56881046 885016F2 468D10C4 83F2E5E8 Òl·.á..F·.P.F..V.-...Õ.RP.v$.võ. 0001C0
C411E8F8 5689F646 89EC5688 EA468800 00FE46C7 10C483F2 8FE80E06 76FF0876 v..v..Òe·.á.úF±...Fõ.V$.F-.V½Š.á 0001E0

Dump of file SATURN:[PCCOMMON.DUMP.DLL]BRDNOPL.TMP;1 on 18-APR-1990 10:37:32.99
File ID (520,34,0)   End of file block 272 / Allocated 272

Virtual block number 140 (0000008C), 512 (0200) bytes

8326F65E C40098E9 0375F846 08F6468B F85689F6 46890C57 88260A47 8826F65E ^-&.G.&.W..F-.V½.F-.F½u.Õ..á^-&. 000000
46891656 1B14462B 06578826 04478826 0001FE46 C71B7500 FE7E8379 7500087F ...uy.-±.u.úF±..&.G.&.W.+F..V..F 000020
2074000A 7E83FC56 89FA4689 16561814 46280657 88260447 8826588EB F05689EE Ÿ.VÞŠX&.G.&.W.+F..V..F°.V=.-..t 000040
1EEBF056 89EE4689 FC5688FA 46880C76 FA463905 7F137CFC 5639F056 88EE4688 .FŸ.VÞ9V=|...9F°v..F°.V=.FŸ.VÞŠ. 000060
4688F056 89EE4689 FC5688FA 46880C73 FA463905 7C137FFC 5639F056 88EE4688 .FŸ.VÞ9V=..|.9F°s..F°.V=.FŸ.VÞ.F 000080
46881CE8 00018805 7500FE7E 83FF4CE9 03E80275 F8563907 75F64639 F45688F2 ·.V¶9F-u.9V½u.Š.ÕL..-±.u.¡..Š..F 0000A0
001AC8CB C91F00E8 C0280257 89260789 26F05688 EE468818 5EC41074 1A460818 ..F.t.á^..FŸ.VÞ&..&.W.+áŠ..èùà.. 0000C0
8800000F 939A02F7 68098A68 1E09E268 1E107508 46080646 88088E00 EC881E00 ..¡ä..Ä.F..F.u..hã..ho.h¼....... 0000E0
8B06468B 0000FE46 C700000E 049A02F8 6809F268 1E0A1A68 1E10750E 46080C46 F..F.u..h...h·.h½......úF±...F.. 000100
890C5788 260A4788 26EE5EC4 EC5689EA 46890E56 880C4688 F05689EE 46890856 V..FŸ.VÞ.F..V..Fõ.V$á^Ÿ&.G.&.W.. 000120
45E90375 F84608F6 4688F456 89F24689 0C578826 0A478826 EA5EC4F8 5689F646 F-.V½á^õ&.G.&.W..F·.V¶.F-.F½u.ÕE 000140
087F8326 EA5EC400 D6E90374 00087F83 26EE5EC4 013AE903 75F44608 F2468801 ..F·.F¶u.Õ:.á^Ÿ&....t.Õe.á^õ&... 000160
3926087C 0083E903 7E025739 26EE5EC4 02578826 078826F2 5EC400C9 E9037400 .t.Õè.á^·&..&.W.á^Ÿ&9W.-.Õ°.|.&9 000180
3926087C 0093E903 7E025739 26EA5EC4 02578826 078826F6 5EC400A9 E9037207 .r.Õ¨.á^-&..&.W.á^õ&9W.-.Õ..|.&9 0001A0
26EA5EC4 06578826 04478826 EE5EC400 01FE46C7 237500FE 7E830089 E9037207 .r.Õ...-±.u#úF±..á^Ÿ&.G.&.W.á^õ& 0001C0
472B26EA 5EC40657 88260447 8826EE5E C460E8E8 5689E646 8906571B 2604472B +G.&.W..F|.VÒŠ'á^Ÿ&.G.&.W.á^õ&+G 0001E0

Dump of file SATURN:[PCCOMMON.DUMP.DLL]BRDNOPL.TMP;1 on 18-APR-1990 10:37:32.99
File ID (520,34,0)   End of file block 272 / Allocated 272

Virtual block number 141 (0000008D), 512 (0200) bytes

4639057F 137CFC56 39E85688 E6468820 74000A7E 83FC5689 FA468906 57182604 .&.W..F°.V=.-..t .F|.VÒ9V=|...9F 000000
4639057C 137FFC56 39E85688 E646881E E8E85689 E64689FC 5688FA46 880C76FA °v..F°.V=.F|.VÒŠ..F|.VÒ9V=..|.9F 000020
02573926 F65EC402 57882607 8826F25E C4E85689 E64689FC 5688FA46 880C73FA °s..F°.V=.F|.VÒá^·&..&.W.á^-&9W. 000040
46890C57 88260A47 8826EE5E C4F05689 EE4689C2 8CC3881D 73073926 057C247F .$|.&9.s..û.ô.FŸ.VÞá^Ÿ&.G.&.W..F 000060
F246890C 5788260A 478826EA 5EC4EC56 89EA4689 F45688F2 46881DE8 F85689F6 -.V½Š..F·.V¶.Fõ.V$á^õ&.G.&.W..F· 000080
88E6468B 105EC410 7412460B 1046881C E8000188 057500FE 7E83FE80 E9F45689 .V¶Õ¯±.~±.u.¡..Š..F..F.t.á^..F|. 0000A0
08460806 468808BE 0F63881E 000004C8 C8C91F00 E8C02802 57892607 8926E856 VÕ&..&.W.+áŠ..èùà....¡c..Ä.F..F. 0000C0
080C468B 00000F7B 7A033768 0A2E681E 0A56681E 10750008 7F832606 5EC40A74 t.á^.&....u..hV..h..h7..(....F.. 0000E0
0A79681E 50002888 03E8002D 88057400 0A7E830E 5E8C0C46 89086488 09750E46 F.u.¡d..F..^..-..t.¡-.Š.¡+.P.hy. 000100
E8FE5689 FC46890C 5788260A 47882606 5EC40AC4 8311F100 109A0C76 FF0E76FF .v..v....þ..á.á^.&.G.&.W..F=.V±Š 000120
77FF26FC 5EC46974 FE4608FC 4688FE56 89FC4689 0C578826 0A478826 FC5EC411 .á^=&.G.&.W..F=.V±.F=.F±tiá^=&.w 000140
23740008 7F8326FC 5EC40CC4 83121C00 109A0C76 FF0E76FF 0A87681E 37FF2602 .&.7.h...v..v.......á.á^=&....t# 000160
C4831238 00109A0C 76FF0E76 FF0A8F68 1E50002B 8803E800 20880574 000A7E83 .-..t.¡-.Š.¡+.P.h...v..v....;..á 000180
0CC48312 5000109A 0C76FF0E 76FF0A95 681E0477 FF260677 FF26FC5E C41DE80A .Š.á^=&.w.&.w..h...v..v....P..á. 0001A0
02030005 C8C91F00 E8C02808 C483FFFF 00109A0C 76FF0E76 FF0A9868 1EFF7EE9 Õ-..h...v..v.......á.+åŠ..èù.... 0001C0
02030000 00191156 00020000 001711A9 00020022 0003008D 02030014 00030017 ..........."...`.......V....... 0001E0
```

Dump of file SATURN:[PCCOMMON.DUMP.DLL]BRDNOPL.TMP;1 on 18-APR-1990 10:37:32.99
File ID (520,34,0) End of file block 272 / Allocated 272

Virtual block number 142 (0000008E), 512 (0200) bytes 08460806 4688088E FFFF881E 000000C8 00000000 00000000 0000028D 00061178 x...§...........à....¡...Ä.F..F. 000000
C7260014 5A47C726 065EC400 005847C7 26001456 47C72606 5EC47CE8 C0280475 u.+àŠ|á^.ÀúGV..ÀúGX..á^.ÀúGZ..Àú 000020
6447C726 000562?7 C726065E C4000060 47C72600 055E47C7 26065EC4 00005C47 G\..á^.ÀúG^..ÀúG'..á^.ÀúGb..ÀúGd 000040
00006C47 C726000F 6A47C726 065EC400 006847C7 26000F66 47C72606 5EC40000 ..á^.ÀúGf..ÀúGh..á^.ÀúGj..ÀúGl.. 000060
C0280000 7447C726 00147247 C726065E C4000070 47C72600 146E47C7 26065EC4 á^.ÀúGn..ÀúGp..á^.ÀúGr..ÀúGt..+à 000080
83067F16 7C000C7E 831C7410 46080E46 88088E00 06881E00 000CC8C8 C91F00E8 Š..èùà....¡...Ä.F..F.t..~..|.... 0000A0
46800E76 FF1076FF 59E880F3 88057500 067E8306 7C007F00 087E830E 74000A7E ~..t..~....|..~..u.¡µ.ŠY.v..v..F 0000C0
F4468834 E880F988 05750008 F65689F4 4689FE56 88FC4688 0000FFFF 9A5016FC •.P......F•.V±.F¶.V~.Àu.¡ª.Š4.F¶ 0000E0
88F85EC4 02578926 0789260C 56880A46 88F85EC4 FA5689F8 46890056 05F65688 .V~.V..F%.Vªá^%.F..V.À..À.W.á^%. 000100
D88E0098 881E0000 0CC8000C CAC91F00 E8C02806 57892604 47892608 56880646 F..V.À.G.À.W.+àŠ..èò..à....¡...Ä 000120
FC468800 0000049A 5016FC46 800E76FF 1076FF72 E880F388 05751046 080E4688 .F..F.u.¡µ.Šr.v..v..F•.P.À....F• 000140
5689F846 89005605 F65688F4 46884DE8 80F98805 75000BF6 5689F446 89FE5688 .V±.F¶.V~.Àu.¡ª.ŠM.F¶.V~.V..F%.V 000160
46880257 89260789 26065EC4 06578826 04478826 F85EC415 74084608 064688FA ª.F..F.t.á^½À.G.À.W.á^.À..À.W..F 000180
1F00E8C0 28025789 26078926 0A5EC406 57882604 478826F8 5EC41574 0C46080A ..F.t.á^½À.G.À.W.á^.À..À.W.+àŠ.. 0001A0
7E83067F 167C0008 7E831C74 1046080E 4688088E 012C881E 00000CC8 000CCAC9 èò..à....¡...Ä.F..F.t..~..|....~ 0001C0
FC46800E 76FF1076 FF59E880 F3880575 000A7E83 067C007F 000C7E83 0E740006 ..t..~....|..~..u.¡µ.ŠY.v..v..F• 0001E0

Dump of file SATURN:[PCCOMMON.DUMP.DLL]BRDNOPL.TMP;1 on 18-APR-1990 10:37:32.99
File ID (520,34,0) End of file block 272 / Allocated 272

Virtual block number 143 (0000008F), 512 (0200) bytes

88F8468B 34E880F9 88057500 08FA5689 F84689FE 5688FC46 88000001 499A5016 .P.I....F•.V±.F%.Vª.Àu.¡ª.Š4.F%. 000000
4688F45E C4025789 26078926 0C56880A 4688F45E C4F65689 F4468900 5E05FA56 Vª.^..F¶.V~á^¶.F..V.À..À.W.á^¶.F 000020
88088E01 8A881E00 000CC800 0CCAC91F 00E8C028 06578926 04478926 08568806 ..V.À.G.À.W.+àŠ..èò..à....¡¤..Ä. 000040
88FC4688 000001F3 9A5016FC 46800E76 FF1076FF 71E880F3 88057510 46080E46 F..F.u.¡µ.Šq.v..v..F•.P.µ....F•. 000060
F65689F4 4689005E 05FA5688 F846884C E880F988 05750008 FA5689F8 4689FE56 V±.F%.Vª.Àu.¡ª.ŠL.F%.Vª.^..F¶.V~ 000080
06468802 57892607 89260A5E C4065788 26044788 26F45EC4 15740C46 080A4688 .F..F.t.á^¶À.G.À.W.á^.À..À.W..F. 0000A0
CAC91F00 E8C02802 57892607 8926065E C4025788 26078826 F45EC414 7408460B .F.t.á^¶À..À.W.á^.À..À.W.+àŠ..èò 0000C0
FF1076FF 0091E980 F3880675 1046080E 4688088E 0248881E 56570000 08C8000C ..à...WV.¡K..Ä.F..F.u.¡µ.Ö...v.. 0000E0
E880F988 05750008 FA5689F8 4689FE56 88FC4688 00000268 9A5016FC 46800E76 v..F•.P.h....F•.V±.F%.Vª.Àu.¡ª.Š 000100
C44EE880 F388057D 00067F83 26077C00 027F8326 0A5EC42C 740C4608 0A46886C l.F..F.t,á^.À....|.À....).¡µ.ŠNá 000120
065EC42C 74084608 0646881F A5A5A5A5 DA8E1EF0 88667F80 0C56880A 4688F85E ^%.F..V...f.Þ..ÖÉÉÉ..F..F.t,á^. 000140
886E7F80 08568806 4688F85E C41AE880 F388057D 00067F83 26077C00 027F8326 À....|.À....).¡µ.Š.á^%.F..V...n. 000160
D88E020A 881E5657 000008C8 000CCAC9 5F5E1F00 E8C0281F A5A5A5A5 DA8E1EF0 Þ..ÖÉÉÉ.+àŠ..^_èò..à...WV.¡Ö..Ä 000180
FC468800 0002F89A 5016FC46 800E76FF 1076FF69 E880F388 05751046 080E4688 .F..F.u.¡µ.Ši.v..v..F•.P.%....F• 0001A0
F84688 0A 5EC41874 0C46080A 468844E8 80F98805 75000BFA 5689F846 89FE5688 .V±.F%.Vª.Àu.¡ª.ŠD.F..F.t.á^..F% 0001C0
F8468806 5EC41874 08460806 46881FA5 A5A5A5DA 8E1EF088 F8880066 05FA5688 .Vª.f..«.Þ..ÖÉÉÉ..F..F.t.á^..F% 0001E0

Dump of file SATU ?:[PCCOMMON.DUMP.DLL]BRDNOPL.TMP;1 on 18-APR-1990 10:37:32.99
File ID (520,34,0) End of file block 272 / Allocated 272

Virtual block number 144 (00000090), 512 (0200) bytes

000CC800 0CCAC95F 5E1F00E8 C0281FA5 A5A5A5DA 8E1EF088 F888006E 05FA5688 .Vª.n..«.Þ..ÖÉÉÉ.+àŠ..^_èò..à.. 000000
88067508 46080646 8808740C 46080A46 88107410 46080E46 88088E03 8C881E00 ..¡...Ä.F..F.t..F..F.t..F..F.u.¡ 000020
5689F846 89FE5688 FC468800 0003A99A 5016FC46 800E76FF 1076FF01 5AE980F3 µ.ÖZ..v..v..F•.P.`....F•.V±.F%.V 000040
77FF26F4 5EC4F656 89F44689 005E05FA 5688F846 880134E9 80F98806 75000BFA ª.Àu.¡ª.Ö4..F%.Vª.^..F¶.V~á^¶À.w 000060
C008C028 02E80001 88057500 0804AE01 309A37FF 260277FF 260A5EC4 37FF2602 .À.7á^.À.w.À.7.0.Ù..Àu.¡..Š.+à.à 000080
04B602C3 9A0A5EC4 37FF2602 77FF26F4 5EC44DE8 02578826 0788260A 5EC40C74 t.á^.À..À.W.ŠMá^¶À.w.À.7á^..û.Ñ. 0000A0
04D303EF 9ADC8808 EC8304CE 06999A28 321E8004 C406C79A 048802C3 9AF45EC4 á^¶.û.É..ú.á...2(...ö..À..É.ÿ.Æ. 0000C0
8926065E C4050E00 FC9A5052 04E904A6 9A04E202 569AD888 08C48304 DD07BE9A .ƒ.ï..á..Ä.V.â..Ï.Ö.RP.•...á^.À. 0000E0
05350130 9A0477FF 260677FF 260A5EC4 0477FF26 0677FF26 F45EC402 57892607 .À.W.á^¶À.w.À.w.á^.À.w.À.w..0.5. 000100
800A5EC4 54E80657 88260447 88260A5E C40074C0 08C02802 E8000188 05750008 .Àu.¡..Š.+à.àt,á^.À.G.À.W.Š1á^.. 000120
05580699 9A28321E 80054E06 C79A0545 02C39A04 5F80F45E C4054002 C39A045F _..û.â.á^¶. ..û.E..û.N...2(...X. 000140
5052057E 04A69A05 6C02569A 088808C4 83056707 8E9A055D 03EF9ADC 8808EC83 ¯à..É.ÿ.]..7.g..á..Ä.V.l..Ï.~.RP 000160
1F00E8C0 28065789 26044789 26065EC4 FFFF00FC 9A0477FF 260677FF 26F45EC4 á^¶À.w.À.w..•...á^.À.G.À.W.+àŠ.. 000180
46880874 0C46080A 46881074 1046080E 4688088E 0413881E 00000CC8 000CCAC9 èò..à....¡...Ä.F..F.t..F..F.t..F 0001A0
88FC4688 00000441 9A5016FC 46800E76 FF1076FF 015AE980 F3880675 08460806 ..F.u.¡µ.ÖZ..v..v..F•.P.A....F•. 0001C0
5689F846 89005605 F65688F4 46880134 E980F988 06750008 F65689F4 4689FE56 V±.F¶.V~.Àu.¡ª.Ö4..F¶.V~.V..F%.V 0001E0

```
Dump of file SATURN:[PCCOMMON.DUMP.DLL]BRDNOPL.TMP;1 on 18-APR-1990 10:37:32.99
File ID (520,34,0)   End of file block 272 / Allocated 272

Virtual block number 145 (00000091), 512 (0200) bytes

 01B80575 00080635 01309A37 FF260277 FF260A5E C437FF26 0277FF26 FB5EC4FA *á^½&.w.&.7á^.&.w.&.7.0.5..Åu.¡. 000000
 C437FF26 0277FF26 FB5EC440 EB0257BB 26078B26 0A5EC40C 74C008C0 2B02EB00 .Š.+à.ât.á^.&..&.W.$Má^½&.w.&.7á 000020
 08EC8306 5506999A 28321E8D 064B06C7 9A064202 C39AFB5E C4063D02 C39A0A5E ^..û.=.á^%.û.B..û.K...2(...U..à. 000040
 00FC9A50 52067004 A69A0669 02569AD8 8B08C483 066407BE 9A065A03 EF9ADC8B .É.ÿ.Z../.d..á..Ä.V.ì..Ì.p.RP.•. 000060
 FF260677 FF260A5E C40477FF 260677FF 26FB5EC4 02578926 07892606 5EC40695 ..á^.&..&.W.á^½&.w.&.w.á^.&.w.&. 000080
 57B82604 47B8260A 5EC40074 C00BC02B 02EB0001 B80575D0 08068C01 309A0477 w..0.V..Åu.¡..Š.+à.ât.á^.&.G.&.W 0000A0
 1EBD0605 06C79A06 CC02C39A 045F8DF8 5EC406C7 02C39A04 5F8D0A5E C454EB06 .ŠTá^.._..û.ú.á^%._..û.ë..ú.Í... 0000C0
 06F30256 9A0B8808 C48306EE 07BE9A06 E403EF9A DC8B08EC 83060F06 999A2832 2(...Ô.¯ä..É.ÿ.ô..7.Ÿ..á..Ä.V.µ. 0000E0
 89260447 8926065E C4048100 FC9A0477 FF260677 FF26FB5E C4505207 0504A69A .Ì...RPá^½&.w.&.w..•...á^.&.G.&. 000100
 00020000 00170608 0002027F 000505C8 02030003 90000CCA C91F00EB C02B0657 W.+àŠ..èò........à............... 000120
 2E7C0106 7E83088E FFFFB81E 000002C8 00000000 00000000 00000000 0019059A .................à....¡...Ä.-..|. 000140
 0674010A 7E830C74 080A7E83 1274040A 7E832074 0E460B0C 46B8287C 01087E83 .-..|(.F..F.t .-..t..-..t..-..t. 000160
 65E90A46 8BFE4689 40084688 0195E98D F3B80675 12460810 46B80875 020A7E83 .-..u..F..F.u.¡µ.Ô...F.∂.F±.F.Ôe 000180
 99FE4688 50529906 46B80257 89260789 26105EC4 0A578B26 08478B26 0C5EC401 .á^.&.G.&.W.á^.&..&.W..F..RP.F±. 0001A0
 FC9A5052 00910060 9A505206 57182604 4728260E 57B8260C 47B8260C 5EC45052 RPá^.&.G.&.W.&+G.&.W.RP.'...RP.• 0001C0
 260C5EC4 0129E906 57892604 47892610 5EC40657 13260447 03260C5E C400E400 .ô.á^.&.G.&.W.á^.&.G.&.W.Ô).á^.& 0001E0

Dump of file SATURN:[PCCOMMON.DUMP.DLL]BRDNOPL.TMP;1 on 18-APR-1990 10:37:32.99
File ID (520,34,0)   End of file block 272 / Allocated 272

Virtual block number 146 (00000092), 512 (0200) bytes

 260C5EC4 505299FE 46B85052 99064688 02578926 07892610 5EC40257 8B26078B ..&.W.á^.&..&.W..F..RP.F±.RPá^.& 000000
 0C5EC401 2900FC9A 505200EB 00609A50 52065718 2604472B 260E578B 260C478B .G.&.W.&+G.&.W.RP.'.Š.RP.•.).á^. 000020
 99FE4688 50529906 448800CF E9065789 26044789 26105EC4 06571326 04470326 &.G.&.W.á^.&.G.&.W.Ôü..F..RP.F±. 000040
 00FC9A50 52013000 609A5052 0257182 6072B260A 57B82608 47B8260C 5EC45052 RPá^.&.G.&.W.&+.&.W.RP.'.0.RP.•. 000060
 57B8260C 47B8260C 5EC40257 89260789 26105EC4 02571326 0703260C 5EC40181 ..á^.&..&.W.á^.&..&.W.á^.&.G.&.W 000080
 47B8260C 5EC45052 99FE4688 50529906 46B877EB 06578926 04478926 105EC40E .á^.&.G.&.W.Šw.F..RP.F±.RPá^.&.G 0000A0
 0703260C 5EC4FFFF 00FC9A50 52018800 609A5052 02571826 072B260A 57B82608 .&.W.&+.&.W.RP.'...RP.•...á^.&.. 0000C0
 04478926 105EC406 57B82604 47B8260C 5EC40257 89260789 26105EC4 02571326 &.W.á^.&..&.W.á^.&.G.&.W.á^.&.G. 0000E0
 03750008 30FEE1E9 03750004 30FF43E9 03750002 30A37400 01301FEB 06578926 &.W.Š.=..tÊ=..u.ÔC.=..u.ÔÄ±=..u. 000100
 28742846 08264688 D88E0006 881E5657 000032C8 CBC91F00 E8C02800 E8FE7EE9 Ô-±Š.+àŠ..èùà2..WV.¡...Ä.F&.F(t( 000120
 08740C46 080A4688 10741046 080E4688 18741446 08124688 20742446 08224688 .F".F$t .F..F.t..F..F.t..F..F.t. 000140
 224688E2 5689E046 89001605 28568826 46880338 E98DF388 06750846 08064688 .F..F.u.¡µ.Ô;..F&.V(....FÅ.Vã.F" 000160
 03742646 39224688 0E468916 46880C46 89184688 E65689E4 46890016 05245688 .V$....FÔ.VÌ.F..FÉ.F..FB.F"9F&t. 000180
 7508187E 8339751C 46081A46 88417520 46081E46 880092E9 03742856 39009AE9 Ô..9V(t.Ô...F..F uA.F..F.u9.-..u 0001A0
 46890E46 89164688 08750818 7E8320EB 0C46890E 46890002 88087508 167E8311 ..-..u.¡...FB.FÉŠ .-..u..F..FB.F 0001C0
 081A4688 3E752046 081E4688 46EB0C46 890E4689 18468809 7508167E 830FEBDC ÉŠ..-..u..F..FB.FÉŠF.F..F u>.F.. 0001E0

Dump of file SATURN:[PCCOMMON.DUMP.DLL]BRDNOPL.TMP;1 on 18-APR-1990 10:37:32.99
File ID (520,34,0)   End of file block 272 / Allocated 272

Virtual block number 147 (00000093), 512 (0200) bytes

 89064689 2056881E 46881646 890A4688 18468916 4688DA46 89184688 36741C46 F.tó.F..FÖ.F..F..FÖ.F..F..V .Fø. 000000
 187E8301 20E91C56 891A4689 08568806 46882056 891E4689 1C56881A 4688D856 VÄ.F..V..F..V .Fø.VÄ.F..V.Ô-..-. 000020
 7C04FE7E 83FE46FF 03EB0000 FE46C7FF FFDA46C7 011EE903 7408167E 83097408 .t..-..t.Ô..úFÖ..úF±..Š..F±.-±.| 000040
 46890A57 18260847 2B26E05E C402578B 26078B26 E45EC476 EBFE4688 00C6E903 .Ôó..F±Švá^ô&..&.W.á^Å&+G.&.W..F 000060
 5689CE46 890A5718 2608472B 26E45EC4 02578B26 078B26E0 5EC46EEB D05689CE ö.VÅŠná^Å&..&.W.á^ô&+G.&.W..Fö.V 000080
 EB005689 CE46890E 5718260C 472B26E0 5EC40657 8B260447 8B26E45E C451EBD0 ÅŠQá^ô&.G.&.W.á^Å&+G.&.W..Fö.VÅŠ 0000A0
 0815EBD0 5689CE46 890E5718 260C472B 26E45EC4 06578B26 04478B26 E05EC433 3á^Å&.G.&.W.á^ô&+G.&.W..Fö.VÅŠ.. 0000C0
 DA7EB3FF 5BE9037D 00007E83 00EBCF74 00033086 74000230 9E740001 308674C0 ât.=..t.=..tÑ=..tüŠ..-Å.).Ô(..-ö 0000E0
 56890246 89005688 CE468812 73CE4639 057C197F D0563904 5688D246 88127C00 .|..Fø.VÅ9VÅ..|.9Föε..Fö.VÅ.Fø.V 000100
 878802E3 C10A5E88 0C752046 081E4688 14750818 7E83FF2E E90A4689 FE4688D4 Å.F±.FÖÔ...-..u..F..F u..^ÖèD... 000120
 878802E3 C10A5E88 0C751C46 081A4688 14750816 7E830C46 89184688 03EB0A9E ..Š..F..FÉ.-..u..F..F.u..^ÖèD... 000140
 E9037C02 FE7EB3FE 46FF03EB 0000E846 C70000FE 46C7DE46 89164688 03E.^AA0 ..Š..F..FBúF±..úFÔ..Š..F±.-±.|.Ô 000160
 0374C208 FC5689FA 46891C56 881A4688 06EB2056 881E4688 087500FE 7E83C F1 þ..-±.u..F..V Š..F..V..F".Vø.ôt. 000180
 7508167E 830C7420 46081E46 88147528 56391975 26463924 56882246 880081 9 Ô...F".V$9F&u.9V(u..F..F t..-..u 0001A0
 7688E072 FFE272FF 02E6C1FE 76885016 EA428D03 E6C1FE76 880E4689 DC468806 ..FÉ.FB.v±èl..Bõ.P.v±èl..rå.rÅ.v 0001C0
 88500001 8803EB00 02880575 2856390A 75264639 24568822 4688DC72 FFE6D1FE ±ll.rÉ.F".V$9F&u.9V(u.¡..Š.¡..P. 0001E0
```

```
Dump of file SATURN:[PCCOMMON.DUMP.DLL]BRDNOPL.TMP;1 on 18-APR-1990 10:37:32.99
File ID (520,34,0)   End of file block 272 / Allocated 272

Virtual block number 148 (00000094), 512 (0200) bytes

 83F831E8 0E500001 8803E8E8 4688E846 FF087528 56390075 26463924 56882246 F".V$9F&u.9V(u..FÒ.FÒ$.¡..P.Ò1«. 000000
 50160C42 8DE6D1FE 7688FA76 FFFC76FF E072FFE2 72FF02E6 C1FE7688 4CEB0EC4 Á.$L.v±è|..rã.rÁ.v».v°.v±||.ëÉ.P 000020
 5688FA46 8803E6C1 FE768854 EB8DF388 05750B0C 7A83E6D1 FE768800 00FFFF9A ......v±||.zÉ.u.¡µ.$T.v±è|..F°.V 000040
 88065EC4 078926JC 46880A5E C4FF03E9 1FA5A5A5 A5DA8E1E 0716F088 EA7A8DFC ».zõ.Þ....ÖEEEE.Ö..á^..FÉ&..á^.. 000060
 1F161EF2 7680F888 0E5EC41F A5A5A5A5 1F161EEA 7680F888 125EC407 8926DE46 F8&..á^..«.võ...EEEE.á^..«.v·... 000080
 4788260A 5EC4088E 01E4881E 000008C8 0024CAC9 5F5E1F00 EBC0281F A5A5A5A5 EEEE.+áS..^_èõ$.à....¡õ..Äá^.&.G 0000A0
 16FC468D F876FFFA 76FF0594 09C29A00 6A006A50 52FA5689 F8468906 57882604 .&.W..F%.V°ÑPj.j..õ....v°.v½.F«. 0000C0
 E806E800 01880575 0856390A 75064639 FE5688FC 46881775 C008FFFF 0A589A50 P.X....&u..F«.V±9F.u.9V.u.¡..$.$ 0000E0
 8789260E 56880C46 88065EC4 088E0566 881E5657 000004C8 C8C91F00 EBC028D5 {+á$..èùà...WV.¡f..Äá^..F..V.&.. 000100
 89008697 88260084 87882606 5EC40088 8789260A 4688065E C4008C97 8926008A ..&....á^..F.&....á^.&....&..... 000120
 E80001B8 1FA5F200 0889DA8E 1EF08816 7F801256 88104688 FC5EC4FE 5689FC46 F«.V±á^«.F..V.....Þ..Ö¿..·É.¡..$ 000140
 6A0A76FF 0C76FFFE 568CFC46 89EC468D D88E05C0 881E0000 1CC8C8C9 5F5E1F00 ..^_èùà....¡á..Ä.F&.F«.V±.v..v.j 000160
 88E84688 6D75C008 05840A58 9A5016E8 46800A76 FF0C76FF 064609C2 9A006A00 .j.¯õ.F..v..v..FÒ.P.X....áum.FÒ. 000180
 76FF1876 FF1A76FF 08C483FF FF1A119A 5052FC76 FFFE76FF E65689E4 4689EA56 Võ.Fõ.V|.v±.v»RP......á..v..v..v 0001A0
 16C48300 33E80E06 76FF0876 FFFC76FF FE76FF0E 76FF1076 FF1276FF 1476FF16 ..v..v..v..v..v±.v».v..v..Ò3..á. 0001C0
 07E80E02 77FF2604 /7FF26E4 5EC4026A E876FFEA 76FFFC76 FFFE76FF 2274C008 .át".v±.v».võ.vÒj.á^õ&.w.&.w..Ò. 0001E0

Dump of file SATURN:[PCCOMMON.DUMP.DLL]BRDNOPL.TMP;1 on 18-APR-1990 10:37:32.99
File ID (520,34,0)   End of file block 272 / Allocated 272

Virtual block number 149 (00000095), 512 (0200) bytes

 03C1E90E 4688088E 061C881E 00000EC8 C8C91F00 EBC028FF 7FE907EB 0EC483FF ..á.$.Õ..+á$..èùà....|...Ä.F.Õé. 000000
 E9037704 47392609 7F00D0E9 03700657 39260A5E C4065788 26044788 26105EC4 á^.&.G.&.W.á^.&9W.).ÕÄ...&9G.w.Õ 000020
 02573826 105EC400 02830001 0502571B 26072826 185EC402 57882607 882600C5 é.&..&.W.á^.&+.&.W.....Ø.á^.&;W. 000040
 07032618 5EC40A57 88260847 88260A5E C40098E9 03720738 26087C00 A2E9037E -.ÕÄ.|.&;.r.Õ..á^.&.G.&.W.á^.&.. 000060
 47882614 5EC46076 07382605 7F747C02 57382610 5EC4000A 8300012D 02571326 &.W.-...Õ.á^.&;W.|t..&;.vmá^.&.G 000080
 88105EC4 1C760447 3926067F 247C0657 39260A5E C4FA5689 F8468906 57882604 .&.W..F%.V°á^.&9W.|$..&9G.v.á^.. 0000A0
 74C008F2 4689C028 02E80001 88057304 47392606 7C007F06 573926FA 5688F846 F%.V°&9W...|.&9G.s.¡..$.+á.F·.át 0000C0
 8906571B 2604472B 26185EC4 06578826 04478826 0A5EC416 E8FA5688 F8468808 ..F%.V°$.á^.&.G.&.W.á^.&+G.&.W.. 0000E0
 5739260A 5EC40657 88260447 8826105E C402F4E9 037FE9C0 2805E8F6 5689F446 F¶.V-$.+áÕ..Õ¶.á^.&.G.&.W.á^.&9W 000100
 18260728 26185EC4 02578826 07882600 C5E90372 0C473926 097C0000 E9037E0E .-.ÕÄ.|.&9G.r.Õé.&..&.W.á^.&+.&. 000120
 5EC40098 E9037207 38260B7C 00A2E903 7E025738 26105EC4 00028300 01050257 W.....Ø.á^.&;W.-.ÕÄ.|.&;.r.Õ..á^ 000140
 02573826 105EC400 DA830001 20025713 26070326 185EC40A 57882608 4788260A .&.G.&.W.á^.&..&.W.-...Õ.á^.&;W. 000160
 5739260A 5EC4FA56 89F84689 06578826 04478826 145EC46D 76073826 057F747C |t..&;.vmá^.&.G.&.W..F%.V°á^.&9W 000180
 04473926 067F007C 06573926 FA5688F8 4688105E C41C730C 47392606 7C247F0E ..$|.&9G.s.á^..F%.V°&9W.|...&9G. 0001A0
 260C4788 260A5EC4 16E8FA56 88F84688 0874C008 F24689C0 2802E800 01880576 v.¡..$.+á.F·.át..F%.V°$.á^.&.G.& 0001C0
 5EC40205 E90290E9 C02805E8 F65689F4 46890657 13260447 0326185E C40E5788 .W.á^.&.G.&.W..F¶.V-$.+áÕ..Õ..á^ 0001E0

Dump of file SATURN:[PCCOMMON.DUMP.DLL]BRDNOPL.TMP;1 on 18-APR-1990 10:37:32.99
File ID (520,34,0)   End of file block 272 / Allocated 272

Virtual block number 150 (00000096), 512 (0200) bytes

 882600C5 E9037707 3926087F 00CFE903 7D025739 260A5EC4 02578826 078B¯410 .&..&.W.á^.&9W.).Õü...&9.w.Õé.&. 000000
 037E0657 3826105E C4000283 00010506 57182604 47282618 5EC40657 88266 47 G.&.W.á^.&+G.&.W.....Ø.á^.&;W.-. 000020
 04470326 185EC40E 5788260C 4788260A 5EC40095 E9037204 47382609 7C00A0E9 Õ..|.&;G.r.Õ..á^.&.G.&.W.á^.&.G. 000040
 8826145E C4687604 47382606 7F707C06 57382610 5EC4000A 8300012D 06571326 &.W.-...Õ.á^.&;W.|p..&;G.vhá^.&. 000060
 4688105E C4187607 3926057F 227C0257 39260A5E C4FA5689 F8468902 57882607 .&.W..F%.V°á^.&9W.|"..&9.v.á^..F 000080
 880874C0 08F24689 C02802E8 00018805 73073926 057C0C7F 02573926 FA5688F8 %.V°&9W...|.&9.s.¡..$.+á.F·.át.. 0000A0
 5689F446 8902571B 26072826 185EC402 57882607 88260A5E C414E8FA 5688F846 F%.V°$.á^.&..&.W.á^.&+.&.W..F¶.V 0000C0
 02E9037E 0A573926 0A5EC402 57882607 8826105E C40118E9 01A3E9C0 2805E8F6 -$.+áÕÉ.Õ..á^.&..&.W.á^.&9W.-.ÕØ 0000E0
 0506571B 2604472B 26185EC4 06578826 04478826 00C7E903 72084739 26097C00 .|.&9G.r.Õú.&.G.&.W.á^.&+G.&.W.. 000100
 260A5EC4 0097E903 72044738 26097C00 A2E9037E 06573826 105EC400 02830001 ...Ø.á^.&;W.-.ÕÄ.|.&;G.r.Õ..á^.& 000120
 7C065738 26105EC4 000A8300 01200657 13260447 0326185E C40E5788 260C4788 .G.&.W.á^.&.G.&.W.-...Õ.á^.&;W.| 000140
 0A573926 0A5EC4FA 5689F846 89025788 26078826 145EC46A 76044738 26067F72 r..&;G.vjá^.&..&.W..F%.V°á^.&9W. 000160
 05760739 26057F0C 7C025739 26FA5688 F8468810 5EC41873 08473926 067C237F .#|.&9G.s.á^..F%.V°&9W.|...&9.v. 000180
 57882608 4788260A 5EC415E8 FA5688F8 46880874 C008F246 89C02802 E80001B8 ¡..$.+á.F·.át..F%.V°$.á^.&.G.&.W 0001A0
 E800ACE9 C02829E8 0083E9C0 2805E8F6 5689F446 89025713 26070326 185EC40A .á^.&..&.W..F¶.V-$.+áÕ°.$)+áÕ¯.$ 0001C0
 FDE90375 000830FE F2E90375 000430FC 2FE90375 000230FD 26E90375 00013022 "=..u.Õ&»=..u.Õ/==..u.Õ·±=..u.Õ» 0001E0
```

Dump of file SATURN:[PCCOMMON.DUMP.DLL]BRDNOPL.TMP;1 on 18-APR-1990 10:37:32.99
File ID (520,34,0)   End of file block 272 / Allocated 272

Virtual block number 151 (00000097), 512 (0200) bytes

```
74020E7E 833C7500 0E7F8326 FE5689FC 46891457 88261247 8826065E C4D7EBFD =Šѳ^.&.G.&.W..F=.V±&....u<.-..t 000000
83067401 0E7E831c 72F44639 057F257C F65639FE 5688FC46 88127508 0E7E8306 ..-..u..F=.V±9V-|%..9F¶r..-..t.. 000020
F65688F4 4688065E C43076F4 4639057F 377CF656 39FE5688 FC468842 75040E7E -..u8.F=.V±9V-|7..9F¶vOá^..F¶.V- 000040
0E47C726 0674000E 7F832606 5EC41047 8926F246 88065EC4 14578926 12478926 &.G.&.W.á^..F.&.G.á^.&....t.&úG. 000060
26164788 260C5EC4 D88E06C6 881E0000 2CC8C8C9 1F00E8C0 2804E800 01880000 ..¡..$.+á$..èùà,...¡ó..Äá^.&.G.& 000080
76FF0876 FFF6568C F44689E4 4680DA56 89084689 005E050E 56890C46 89185788 .W..FÉ.V8.^..FÅ.VÖ.FÔ.F¶.V-.v..v 0000A0
22E90374 C00B0C26 0A589A50 16F8468D 0676FF08 76FF0888 09C29A00 6A006A06 .j.j..ò....v..v..F%.P.X.&..át.Ô" 0000C0
0375C008 08C483F9 87E80E50 520C76FF 0E76FFD6 56890446 89FA5688 F8468801 ..F%.V°.Få.V®.v...v.RP.Òñ°.á..áu. 0000E0
FF1676FF D876FFDA 76FF4574 00567F83 26077F4E 7C00587F 8326045E C400ADE9 ÕÙ.á^&&..X.|N..&..V.tE.vÖ.vÄ.v.. 000100
16C483FA 29E80E0C 76FF0E76 FF4277FF 264477FF 260A76FF 1076FF12 76FF1476 v..v..v..v.&.wO&.w8.v..v..Ò)°.á. 000120
8826045E C4025789 26078926 185EC400 86978826 00848788 260C5EC4 1774C008 .át.á^É&....&....á^.&..&.W.á^&&. 000140
067F307C 00FE7E83 063600F0 9A5016FC 46805052 E25689E0 46894057 88263E47 G>&.W@.FÅ.VàRP.F=.P.Þ.6..-±.|0.. 000160
76FF0C76 FF0E76FF 107uFF12 76FF1476 FF1676FF 1876FF1A 76FF2874 00FC7E83 .-=.t(.v..v..v..v..v..v..v..v..v 000180
6316E09A D476FFD6 76FFF476 FFF676FF 50E816C4 83FEE3E8 0EE076FF E27'FF0A ..vâ.vÅ.ÒD±.á.ŠP.v-.v¶.v®.vâ.Å.c 0001A0
FFF476FF F676FF0A 76FF1076 FF1276FF 1476FF16 76FFD876 FFDA76FF 08C4.306 ..á..vÖ.vÅ.v..v..v..v..v..v-.v¶. 0001C0
02578926 078926FA 5688F846 88185EC4 1074C008 16C483FA 27E80E0C 76FF0E76 v..v..Ò'°.á..át.á^..F%.V°&..&.W. 0001E0
```

Dump of file SATURN:[PCCOMMON.DUMP.DLL]BRDNOPL.TMP;1 on 18-APR-1990 10:37:32.99
File ID (520,34,0)   End of file block 272 / Allocated 272

Virtual block number 152 (00000098), 512 (0200) bytes

```
7E83FC46 89FE4689 C028088E 0844881E 56570000 18C8C8C9 1F00E8C0 28FEC7E9 Õú±+á$..èùà...WV.¡D..Ä+à.F±.F=.- 000000
46882074 0A460808 46882875 02067E83 06740106 7E830C74 08067E83 12740406 ..t..-..t..-..t..-..u(.F..F.t .F 000020
F3880675 1A460818 46880874 16460814 46881074 12460810 46881874 0E46080C ..F.t..F..F.t..F..F.t..F..F.u.¡µ 000040
C726085E C400010E 47C726F6 5689F446 89185788 26164788 26085EC4 01E4E980 .Òð.á^.&.G.&.W..F¶.V-&úG...á^.&ú 000060
5EC40075 C208FA56 89F84689 F25689F0 46890257 88260788 26085EC4 00001047 G...á^.&..&.W..FÞ.V·.F%.V°.ðu.á^ 000080
16FC468D EE5689EC 46894057 88263E47 8826F85E C408E80A 57882608 478826F4 ¶&.G.&.W.$.á^¥&.G>&.W@.F&.VŸ.F=. 0000A0
C483FD80 E80EEC76 FF520676 FF0876FF 0A76FF0C 76FF0E76 FF1076FF 1276FF50 P.v..v..v..v..v..v..v.R.v&.Ò¯».á 0000C0
E1E90374 FE4608FC 46881FA5 A5A5A50A 8E1EF088 F8880E56 880C4688 145EC416 .á^..F..V..«.Þ..ÒÉÉÉÉ..F=.F±t.ÒÅ 0000E0
47392606 7F187C06 57392610 5EC40657 88260447 8826145E C40080E9 06468800 ..F.Ò§.á^.&.G.&.W.á^.&9W.|...&9G 000100
04478826 145EC400 A7E90657 89260447 8926145E C4065788 26044788 26137604 .v.&.G.&.W.á^.&.G.&.W.ÒI.á^.&.G. 000120
145EC406 57882604 47882613 73044739 26067C18 7F065739 26105EC4 06578826 &.W.á^.&9W...|.&9G.s.&.G.&.W.á^. 000140
26057F18 7C025739 26105EC4 02578826 07882614 5EC476E8 06578926 04478926 &.G.&.W.$vá^.&..&.W.á^.&9W.|...& 000160
57882607 8826145E C449E802 57892607 8926145E C4025788 26078826 11760739 9.v.&..&.W.á^.&..&.W.$Iá^.&..&.W 000180
89260789 26145EC4 02578826 07882611 73073926 057C187F 02573926 105EC402 .á^.&9W...|.&9.s.&..&.W.á^.&..&. 0001A0
00E88C74 000830BE 7400043D FF33E903 7500023D FF6DE903 7500013D 1CE80257 W.$.=..u.Òm.=..u.Ò3.=..t/=..t.$. 0001C0
C4127508 067E8306 7404067E 83EA5689 E8468914 57882612 47882608 5EC452E8 $Rá^.&.G.&.W..FÒ.Võ.-..t..-..u.á 0001E0
```

Dump of file SATURN:[PCCOMMON.DUMP.DLL]BRDNOPL.TMP;1 on 18-APR-1990 10:37:32.99
File ID (520,34,0)   End of file block 272 / Allocated 272

Virtual block number 153 (00000099), 512 (0200) bytes

```
89260447 8926EA56 88E84688 145EC411 E8025789 26078926 EA5688E8 4688145E ^..FÒ.Võ&..&.W.$.á^..FÒ.Võ&.G.&. 000000
078926FE 5688FC46 88185EC4 FC4689FE 4689C028 08740010 7F832608 5EC40657 W.á^.&....t.+à.F±.F=á^..F=.V±&.. 000020
26008487 8826065E C4D88E0C C2881E00 0014C8C8 C95F5E1F 00E8C028 02578926 &.W.+á$..^_èùà....¡ò..Äá^.&....& 000040
F45689F2 4689005E 05C28CC3 88FE5689 FC468900 1605F856 89F64689 00869788 .....F-.V%....F=.V±.û.ô.^..F·.V¶ 000060
30057400 0130FA46 89464788 26EE5EC4 F05689EE 4689008C 97882600 8A878826 &....&.....FŸ.VÞá^Ÿ&.GF.F°=..t.= 000080
2802E800 01880575 020A7E83 0674010A 7E83EC46 89C02802 E8000188 05750002 ..u.¡..$.+à.F&.-..t..-..u.¡..$.+ 0000A0
470326F2 5EC40E57 88260C47 8826FC5E C40087E9 FA468800 84E90375 EC4638C0 à;F$u.ÒÇ..F°Ò..á^=&.G.&.W.á^·&.G 0000C0
F25EC406 57882604 478826FC 5EC47DE8 06578926 04478926 0C5EC406 57132604 .&.W.á^.&.G.&.V.$)á^=&.G.&.W.á^· 0000E0
0A578826 08478826 FC5EC45A E8065789 26044789 260C5EC4 06571826 04472826 &+G.&.W.á^.&.G.&.W.$Zá^=&.G.&.W. 000100
02578826 078826FC 5EC439E8 02578926 0789260C 5EC40257 13260703 26F25EC4 á^·&..&.W.á^.&..&.W.$9á^=&..&.W. 000120
03750002 30977400 013D19E8 02578926 0789260C 5EC40257 18260728 26F25EC4 á^·&+.&.W.á^.&..&.W.$.=..t.=..u. 000140
E8C02804 E8000188 078926FA 4688105E C400E8A8 7400083D CE740004 30FF6CE9 Òl.=..tö=..t'$.á^..F°&..¡..$.+á$ 000160
C4EC5689 EA468922 57882620 4788260C 5EC4088E 0F03881E 000016C8 C8C91F00 ..èùà....¡...Äá^.&.G &.W".Fõ.V$á 000180
FC468900 86978826 00848788 26F25EC4 F45689F2 46890457 88260247 8826EA5E ^õ&.G.&.W..F·.V¶á^·&....&.....F= 0001A0
FA5689F8 46890856 88064688 F05689EE 46891057 88260E47 8826EA5E C4FE5689 .V±á^õ&.G.&.W..FŸ.VÞ.F..V..F%.V° 0001C0
C41F75FA 56392475 F84639FE 5688FC46 88337408 57392606 75064739 26EE5EC4 á^Ÿ&9G.u.&9W.t3.F=.V±9F%u$9V°u.á 0001E0
```

```
Dump of file SATURN:[PCCOMMON.DUMP.DLL]BRDNOPL.TMP;1 on 18-APR-1990 10:37:32.99
File ID (520,34,0)   End of file block 272 / Allocated 272

Virtual block number 154 (0000009A), 512 (0200) bytes

 C0280474 008C9739 26077500 8A873926 F05688EE 46881475 0200888F 8326F25E ^·&.e...u..FŸ.VÞ&9...u.&9...t.+á 000000
 39260675 07392610 5EC40257 88260788 26145EC4 F6468946 478826EE 5E. 4DEB ŠMá^Ÿ&.GF.F-á^.&..&.W.á^.&9.u.&9 000020
 46880075 06573926 13750447 3926105E C4065788 26044788 26145EC4 1A74 257 W.t.á^.&.G.&.W.á^.&9G.u.&9W.u..F 000040
 7E83088E 103AB81E 56570000 2CC8C8C9 1F00EBC0 2804EB00 01880574 0A4637F6 -9F.t.|..Š.+âŠ..èùà,..WV.|:..Ä.- 000060
 46882874 0E46080C 46883075 020A7E83 0674010A 7E830C74 080A7E83 1274040A ..t..-..t..-..t..-..u0.F..F.t(.F 000080
 46880874 1A460818 46881074 16460814 46881874 12460810 46882074 08460806 ..F.t .F..F.t..F..F.t..F..F.t..F 0000A0
 260C5EC4 02CCE98D F3880000 07C72620 5EC40874 22460820 46881675 22460820  .F"u..F .F"t.á^ &ú...|µ.Õä.á^.& 0000C0
 FE5689FC 46890086 97882600 84878826 E85EC4EA 5689E846 89185788 26164788 .G.&.W..FÒ.Võá^Ò&....&.....F=.V± 0000E0
 205EC41F A5A5A5A5 DA8E1EF0 88F88812 56881046 88185EC4 000007C7 26205EC4 á^ &ú...á^..F..V..«.Þ..ÒEEEE,á^  000100
 76FF1A76 FF1C76FF 1E76FF25 75085639 2A750646 39FE5688 FC468800 0007C726 &ú....F=.V±9F.u*9V.uX.v..v..v..v 000120
 EA5688E8 4688024E E9C02805 74C0080E C483FCFF E80EE876 FFEA76FF 0A76FF18 ..v..vð.vÒ.Ò.=.á..ât.+âÒN..FÒ.Võ 000140
 2FE80E50 520C76FF 0E76FFE2 5689E046 89085688 064688E6 5689E446 89005E05 .^..Fð.VÌ.F..V..FÁ.Vã.v..v.RP.Ò/ 000160
 A5F20008 B9DA8E1E 0716F088 EC7E8D00 1605E256 88E04688 1874C008 08C483F3 µ.á..ât..FÁ.Vã....-ǂ.Þ....Ò¿..·E 000180
 FF1A76FF 1476FF16 76FF08C4 830C6F16 E09AE076 FFE276FF 5016EC46 8D13E81F .Š..Fǂ.P.vã.vÁ.Å.o..á..v..v..v.. 0001A0
 26205EC4 0074C008 12C483FD AFE80EE0 76FFE276 FF0A76FF 0C76FF0E 76FF1876 v..v..v..v..vã.vÁ.Ò€».á..ât.á^ & 0001C0
 2826145E C4FA5688 F8468875 75080A7E 83067404 0A7E8301 8FE9C028 000107C7 ú...+âÒ«..-..t..-..ωu.F½.V°á^.&+ 0001E0

Dump of file SATURN:[PCCOMMON.DUMP.DLL]BRDNOPL.TMP;1 on 18-APR-1990 10:37:32.99
File ID (520,34,0)   End of file block 272 / Allocated 272

Virtual block number 155 (0000009B), 512 (0200) bytes

 5EC42673 C138047C 2C7FD638 F27618F0 4E280677 8826044F 88260657 18260447 G.&.W.&.O.&.w.+NÞ.v·;ø.,|.;ès&á^ 000000
 07C7261C 5EC40657 89260447 8926185E C4FA5613 F8460306 57882604 478826E4 Ò&.G.&.W..F½.V°á^.&.G.&.W.á^.&ú. 000020
 06578926 04478926 185EC406 57182604 472826E4 5EC4F256 88F04688 24E80002 ..$$.FÞ.V·á^Ò&+G.&.W.á^.&.G.&.W. 000040
 7788260F 88260257 18260728 26145EC4 F65688F4 46886DE8 000107C7 261C5EC4 á^.&ú...Šm.F¶.V-á^.&+.&.W.&..&.ω 000060
 5613F446 03025788 26078826 E45EC424 73C13804 7C2A7FD6 38EE7618 EC4E2802 .+N&.vŸ;ø.*|.;ès$á^Ò&..&.W..F¶.V 000080
 2826E45E C4EE5688 EC468822 E8000807 C7261C5E C4025789 26078926 185EC4F6 -á^.&..&.W.á^.&ú...Š".Fǂ.VŸá^Ò&+ 0000A0
 75000C7F 83260C5E C4000407 C7261C5E C4025789 26078926 185EC402 57182607 .&.W.á^.&..&.W.á^.&ú...á^.&....u 0000C0
 5EC4D656 89044689 02571826 07282618 5EC40257 88260788 26145EC4 00C0E903 .Òá.á^.&..&.W.á^.&+.&.W..FÅ.Vøá^ 0000E0
 0788261C 5EC4DA56 89084689 06571826 04472826 185EC406 57882604 47882614 .&.G.&.W.á^.&+G.&.W..FÄ.VÒá^.&.. 000100
 68E8C028 047C000A 7E8344E8 74E8C028 04750008 7E83067C 0C7F000A 7E8342E8 $8.-Ò...|..-Ä.u.+âŠ‹ŠD.-Ò.|.+âŠh 000120
 48E8C028 047C0006 7E8324E8 54E8C028 04750004 7E83067C 0C7F0006 7E8338E8 $8.-ø...|..-á.u.+âŠTŠ$.-ø.|.+âŠH 000140
 FF50160C 468D00E8 CA740008 3DE37400 04308474 00023DCD 7400013D 16E818E8 Š.Š.«..tè«..tÇ=..tD=..tòŠ..FÉ.P. 000160
 69E80E37 FF261C5E C40C76FF 0E76FF18 76FF1A76 FF1476FF 1676FF18 76FF1A76 v..v..v..v..v..v..v..v.á^.&.7.Òi 000180
 88107408 46080646 88088E11 2A881E00 0008C8C8 C95F5E1F 00E8C028 16C483F8 ½.á.+âŠ..^_èùà....|*..Ä.F..F.t.. 0001A0
 38578826 36478826 065EC400 8EE98DF3 88067510 46080E46 8808740C 46080A46 F..F.t..F..F.u.|µ.Ò..á^.&.G6&.W8 0001C0
 74FE4608 FC4688FE 5689FC46 89385788 26364788 26FC5EC4 11E8FE56 89FC4689 .F=.V±Š.á^=&.G6&.W8.F=.V±.F=.F±t 0001E0

Dump of file SATURN:[PCCOMMON.DUMP.DLL]BRDNOPL.TMP;1 on 18-APR-1990 10:37:32.99
File ID (520,34,0)   End of file block 272 / Allocated 272

Virtual block number 156 (0000009C), 512 (0200) bytes

 89385788 26364788 26F85EC4 11E8FA56 89F84689 38578826 36478826 0A5EC454 Tá^.&.G6&.W8.F½.V°Š.á^½&.G6&.W8. 000000
 0E5EC414 75FE5639 1975FC46 39FA5688 F8468826 74FA4608 F84688FA 5689F846 F½.V°.F½.F°ǂ&.F½.V°9F=u.9V±u.á^. 000020
 89260247 8926C028 0E5EC493 E8C1E812 E8C02802 57892607 8926FE56 88FC4688 .F=.V±&..&.W.+âŠ.ŠèŠ.á^.+â&.G.&. 000040
 5689FC46 89085688 06468800 02FA46C7 D88E1463 881E0000 06C8C8C9 1F00E807 .Š..èùà....|c..ÄúF°...F..V..F=.V 000060
 C4117500 167E8355 74C008FA 4EFFFA46 88FE5689 FC46890C 56880A46 880CE8FE ±Š..F..V..F=.V±.F°.N°.âtU.-..u.á 000080
 2C74FE56 390575FC 46391056 880E4688 FE5689FC 46893857 88263647 8826FC5E ^=&.G6&.W8.F=.V±.F..V.9F=u.9V±t, 0000A0
 36478826 FC5EC408 7802909A FC76FFFE 76FF006A 016A006A 006A1276 FF1476FF .v..v.j.j.j.j..v±.v=...x,á^=&.G6 0000C0
 88D88E15 1C881E00 0002C8C8 C91F00E8 C02895E8 C4E8FE56 89FC4689 38578826 &.W8.F=.V±ŠáŠ.+âŠ..èùà....|...Ä. 0000E0
 260E5EC4 65E88DF3 88057510 46080E46 8808740C 46080A46 88107408 46080646 F..F.t..F..F.t..F..F.u.|µ.Šeá^.& 000100
 FE60E80E 0676FF08 76FF0A76 FF0C76FF 530653E8 80F58805 75184708 26164788 .G.&.G.u.|¥.$S.S.v..v..v..v..Òm± 000120
 FF260277 FF260477 FF260677 FF260E5E C41276FF 35E80274 C008FE46 890CC483 .á..F±.ât.Š5.v.á^.&.w.&.w.&.w.&. 000140
 E8C02804 E80274C0 08FE4689 12C483FE F5E80E06 76FF0876 FF0A76FF 0C76FF37 7.v..v..v..v..Ò%±.á..F±.ât.Š.+âŠ 000160
 F3880575 0C46080  46880874 08460806 4688D88E 15A8881E 000008C8 C8C91F00 ..èùà....|¨..Ä.F..F.t..F..F.u.|µ 000180
 FFFE76FF 3EE8C028 0475D008 FE5689FC 46890A57 88260847 8826065E C457E880 .ŠWá^.&.G.&.W..F=.V±.Åu.+âŠ>.v±. 0001A0
 881775C0 08158704 589A5016 F8468DFC 76FFFE76 FF168909 C29A006A 006AFC76 v=j.j..ô....v±.v=.F½.P.X....âu.. 0001C0
 0042C8C8 C91F00E8 C028D5E8 06E80001 880575FA 56390A75 F846390C 56880A46 F..V.9F½u.9V°u.|..Š.Š1+âŠ..èùà8. 0001E0
```

```
Dump of file SATURN:[PCCOMMON.DUMP.DLL]BRDNOPL.TMP;1 on 18-APR-1990 10:37:32.99
File ID (520,34,0)   End of file block 272 / Allocated 272

Virtual block number 157 (0000009D), 512 (0200) bytes

 46800A76 FF0C76FF 160609C2 9A006A00 6A0A76FF 0C76FF08 8E163A88 1E565700 .WV.|:..Ä.v..v.j.j..ô.ø..v..v..F 000000
 83FF45E8 0E0676FF 0876FFCC 76FFCE76 FF00FDE9 0374C008 16790A58 9A5016CC ä.P.X.y..ât.Ò»..vö.vë.v..v..ÒE.. 000020
 1A119AC8 76FF5250 16F0468D CA5689C8 4689CE56 88CC4688 D0E80274 C00808C4 á..ât.ŠÅ.Fë.Vö.Fè.Vò.FÞ.PR.vè... 000040
 02578826 0788260E 5EC41FA5 F2000889 1F161E07 16F0768D E07E8D08 C4831261 a..á..~Å.vÞ.....¿..·E.á^.&..&.W. 000060
 C05689BE 4689000A 8300012D 06578826 04478826 C45689C2 4689000A 8300012D ·...Ö..Fó.Vá&.G.&.W.·...Ö..F/.Vâ 000080
 4601E656 19E44629 C05688BE 4688EA56 11E84601 E25619E0 4629C456 88C24688 .Fó.Vá)FÅ.Vã.FÒ.Võ.F/.Vá)Fô.VÌ.F 0000A0
 88D87E8D 0008051F A5A5A5A5 DA8E1E07 16F08800 7E8D1456 88124688 EE5611EC â.VŸ.F..V..~Å.Þ....ÒEEEE.....~Ä. 0000C0
 FFFF9A50 16C6468D 5016E046 8D501608 46805016 D0468D1F A5A5A5A5 DA8E1EF0 Þ..ÒEEEE..FÅ.P.FÅ.P.FÅ.P.Fó.P... 0000E0
 0277FF26 0477FF26 C85EC402 6ACC76FF CE76FF50 16F0468D 217400C6 7E830000 ...~ó.t!.FÞ.P.vö.vëj.á^á&.w.&.w. 000100
 8E1685B8 1E565700 003AC8CB C95F5E1F 00E8C02B FEECE907 E80EC483 EDE4E80E .ÒôÜ.á.Š.Òš±+âŠ..^_èùà:..WV.|ç.. 000120
 4788260A 5EC40189 E9C02805 74024708 26078826 125EC40C 74084608 064688D8 Ä.F..F.t.á^.&..&.G.t.+âÓ¿.á^.&.G 000140
 FF0876FF F65689F4 4689005E 05185788 26164788 26FA5689 F8468918 57882616 .&.W..F%.V°&.G.&.W..^..F¶.V~.v.. 000160
 E90374C0 0816C60A 589A5016 FC468006 76FF0876 FF184909 C29A006A 006A0676 v.j.j..ò.l..v..v..F=.P.X.ó..ât.Õ 000180
 77FF26F0 5EC4F476 FFF676FF 0E76FF10 76FFF256 89F04689 FE5688FC 46880160 m..F=.V±.FÞ.V·.v..v..v~.v¶á^Þ&.w 0001A0
 88260084 878826F8 5EC41C74 C00810C4 83FE2EE8 0E0A76FF 0C76FF42 77FF2644 D&.w8.v..v..Ò.±.á..ât.á^¥&....&. 0001C0
 E80EFC76 FFFE76FF 0A76FF0C 76FF0121 E9C02802 57892607 8926125E C4008697 ...á^.&..&.W.+âÒl..v..v..v±.v=.Ò 0001E0

Dump of file SATURN:[PCCOMMON.DUMP.DLL]BRDNOPL.TMP;1 on 18-APR-1990 10:37:32.99
File ID (520,34,0)   End of file block 272 / Allocated 272

Virtual block number 158 (0000009E), 512 (0200) bytes

 FF26F05E C40A76FF 0C76FF0E 76FF1076 FF1276FF 1476FF27 74C00808 C483ECAE Û&.á..ât'.v..v..v..v..v..v.á^Þ&. 000000
 F044E80E 0A76FF0C 76FFFC76 FFFE76FF 000CE910 C483FF08 E80E3E77 FF264077 wâ&.w>.Ò...á.ÒE..v±.v=.v..v..ÒD= 000020
 0008890A 8E1E0716 F088E07E 8D001605 F25688F0 4688FF41 E90374C0 0808C483 .á..ât.ÒA..FÞ.V·.....~Å.Þ....Ò¿.. 000040
 57882604 478826CC 5689CA46 89000A83 00012002 57882607 8826F45E C41FA5F2 ·E.á^¶&..&.W.·...Ö..Fò.Vâ&.G.&.W 000060
 88EA5611 E84601E7 5619E046 29CC5688 CA4688C8 5689C646 89000A83 00012006 .·...Ö..Fó.Vâ.Fò.Vä)FÅ.Vä.FÒ.Võ. 000080
 8E1E0716 F088D87E 8D105688 0E4688EE 5611EC46 01E65619 E44629C8 5688C646 Fó.Vâ)FÒ.VÌ.F&.VŸ.F..V..~Å.Þ.... 0000A0
 50160046 8D501608 46801FA5 A5A5A50A 8E1EF088 D07E8D00 08051FA5 A5A5A50A ÒEEEE.....~Å.Þ..ÒEEEE..FÅ.P.FÅ.P 0000C0
 5688FC46 88125EC4 FE93E903 7500CE7E 83000017 AE9A5016 CE468D50 16E0468D .FÅ.P.Fö.P.Û....~ö.u.Ô.±á^..F=.V 0000E0
 17E0881E 000010C8 C8C95F5E 1F00E8C0 28FE7CE9 07E8C028 02578926 078926FE ±&..&.W.+âŠ.Ò|±+âŠ..^_èùà....|Ù. 000100
 1046080E 46881975 1046080E 46880874 0C46080A 46881074 08460806 4688D88E .Ä.F..F.t..F..F.t..F..F.u..F..F. 000120
 C4078926 02478926 C02B0E5E C471E88D F3880789 26024789 26C02B0E 5EC40C74 t.á^.+â&.G.&..|µ.Šqá^.+â&.G.&..á 000140
 FC4689F6 5689F446 89025788 26078826 FA5689F8 46891857 88261647 8826065E ^.&.G.&.W..F%.V°&..&.W..F¶.V~.F= 000160
 89405788 263E4788 26FC5EC4 08E80A57 88260847 8826F85E C40D75C2 08FE5689 .V±.ôu.á^¥&.G.&.W.Š.á^=&.G>&.Wâ. 000180
 10C483FD 78E80E50 520676FF 0876FF0A 76FF0C76 FF0E76FF 1076FFF2 5689F046 FÞ.V·.v..v..v..v..v..v.RP.Òx=.á. 0001A0
 0676FF08 76FFFE56 8CFC4689 EC468DD8 8E19CE88 1E000020 C8C8C91F 00E8C028 +âŠ..èùà ...|ó..Ä.F&.F=.V±.v..v. 0001C0
 00FCE903 74C00818 390A589A 5016E846 8D0676FF 0876FF1A A709C29A 006A006A j.j..ò.Ì..v..v..FÒ.P.X.9..ât.Ò=. 0001E0

Dump of file SATURN:[PCCOMMON.DUMP.DLL]BRDNOPL.TMP;1 on 18-APR-1990 10:37:32.99
File ID (520,34,0)   End of file block 272 / Allocated 272

Virtual block number 159 (0000009F), 512 (0200) bytes

 01200257 88260788 260A5EC4 08C48317 101A119A E876FFEA 76FFFC76 FFFE76FF .v±.v=.võ.vÒ......á.á^.&..&.W.·. 000000
 5EC4E256 89E04689 000A8300 01200657 88260447 8826E656 89E44689 000A8300 ..Ö..Fô.VÌ&.G.&.W.·...Ö..FÅ.Vãá^ 000020
 C40A5711 26084701 26E65688 E44688FC 5EC40257 19260729 26E65688 E44688FC =.Fô.VÌ&).&.W.á^=.Fô.VÌ&.G.&.W.á 000040
 5711260C 470126E2 5688E046 88FC5EC4 06571926 04472926 E25688E0 4688FC5E ^=.FÅ.Vã&)G.&.W.á^=.FÅ.Vã&.G.&.W 000060
 26078826 52720847 3926067F 5A7C0A57 3926FC5E C4025788 26078826 0E5EC40E .á^.&..&.W.á^=&9W.|Z..&9G.rR&..& 000080
 C40E5788 260C4788 26FC5EC4 3A720847 3926067F 427C0A57 39260E5E C4025788 .W.á^.&9W.|B..&9G.r:á^=&.G.&.W.á 0000A0
 7F065739 26FC5EC4 0E578826 0C478826 1E770447 3926067C 267F0657 39260E5E ^.&9W..&|.&9G.w.&.G.&.W.á^=&9W.. 0000C0
 00E8C02B FEEDE907 E8000188 0574C008 C02B02E8 00018805 77044739 26067C0D .|.&9G.w.|..Š.+á.ât.|..Š.ÒÙ±+âŠ. 0000E0
 47082607 8826125E C40C7408 46080646 88D88E1A 7D881E56 57000024 C8C8C91F .èùà$..WV.|}..Ä.F..F.t.á^.&..&.G 000100
 FF0876FF EA5689E8 4689005E 05185788 26164788 260A5EC4 019AE9C0 28057402 .t.+âÕ..á^.&.G.&.W..^..FÒ.Võ.v.. 000120
 E90374C0 081A970A 589A5016 FC468006 76FF0876 FF1C0909 C29A006A 006A0676 v.j.j..ò....v..v..F=.P.X....ât.Õ 000140
 77FF26E4 5EC4E876 FFEA76FF 0E76FF10 76FFE656 89E44689 FE5688FC 4688015C \..F=.V±.Fô.VÌ.v..v..vô.vÒá^Ò&.w 000160
 02578926 078926FE 5688FC46 88125EC4 1574C008 0CC483FE 3EE80E42 77FF2644 D&.w8.Ò>±.á..ât.á^..F=.V±&..&.W. 000180
 FF1476FF 2774C008 08C483E8 F8E80EFC 76FFFE76 FF0A76FF 0C76FF01 1DE9C02B +âÒ...v..v..v±.v=.Ò«Ò.á..ât'.v.. 0001A0
 10C483FF 26E80E3E 77FF2640 77FF26E4 5EC40A76 FF0C76FF 0E76FF10 76FF1276 v..v..v..v..v.á^Ò&.wâ&.w>.Ò&..á. 0001C0
 26E85EC4 1FA5F200 08890A8E 1E0716F0 88EC7E8D 001605E6 5688E446 880008E9 ÒÄ..Fô.VÌ....~š.Þ....Ò¿..·E.á^Ò& 0001E0
```

Dump of file SATURN:[PCCOMMON.DUMP.DLL]BRDNOPL.TMP;1 on 18-APR-1990 10:37:32.99
File ID (520,34,0)   End of file block 272 / Allocated 272

Virtual block number 160 (000000A0), 512 (0200) bytes

```
000A8300 01200657 88260447 8826E256 89E04689 000A8300 01200257 88260788 ..&.W.-...Ö..FÅ.Vâ&.G.&.W.-...Ö. 000000
46290E56 880C4688 F65611F4 4601EE56 19EC4629 E25688E0 46880E56 890C4689 .FÉ.V8.FÅ.Vä)F&.VŸ.F¶.V-.FÉ.V8)F 000020
41770739 26057.48 7F025739 26F65688 F446880E 5EC4FA56 11F84601 F25619F0 Þ.V·.F%.V*á^..F¶.V-&9W..H|.&9.wA 000040
217F0657 3926FA56 88F84688 2D720847 3926067F 357C0A57 3926EE56 88EC4688 .F&.VŸ&9W.|5..&9G.r-.F%.V*&9W..| 000060
E80001B8 05720C47 3926067F 007C0E57 3926F256 88F04688 19770447 3926067C |.&9G.w..FÞ.V·&9W.|...&9G.r.|..$ 000080
C028FE8D E907E8C0 28025789 26078926 FE5688FC 4688125E C41474C0 08C02802 .+â.ât.á^..F•.V±&..&.W.+âS.Ö.±+â 0000A0
740C4608 0A468810 74084608 06468808 8E1B8B88 1E000010 C8C8C95F 5E1F00E8 $..^_èùà....¡£..Ä.F..F.t..F..F.t 0000C0
80F38807 89260247 8926C028 0E5EC40C 7410460B 0E468819 7510460B 0E468808 ..F._F.u..F..F.t.á^.+â&.G.&..¡æ. 0000E0
26FA5689 F8468918 57882616 47882606 5EC40789 26024789 26C0280E 5EC471E8 Sqâ^.+â&.G.&..á^.&.G.&.W..F%.V*& 000100
57882608 478826F8 5EC40D75 C208FE56 89FC4689 F65689F4 46890257 88260788 ..&.W..F¶.V-.F•.V±.ôu.á^½&.G.&.W 000120
0A76FF0C 76FF0E76 FF1076FF F25689F0 46894057 88263E47 8826FC5E C408E80A .S.á^•&.G>&.WΩ.FÞ.V·.v..v..v..v. 000140
088E1D7D 881E00·0 18C8C8C9 1F00E8C0 2810C483 FD97E80E 50520676 FF0876FF .v..v.RP.Ò.».á.+âS..èùà....¡)..Ä 000160
468D0676 FF0876.. 1E5609C2 9A006A00 6A0676FF 0876FFFE 568CFC46 89EC468D .F&.F•.V±.v..v.j.j..ô.V..v..v..F 000180
08C4831A BF1A119A E876FFEA 76FFFC76 FFFE76FF 4475C008 18F90A58 9A5016E8 Ò.P.X.'..áuD.v±.v•.võ.vÒ...¢..á. 0001A0
76FF0C76 FF0E76FF 1076FF12 76FF1476 FF1676FF 1876FF1A 76FF1C76 FF1E76FF .v..v..v..v..v..v..v..v..v..v..v 0001C0
8E1E2C88 1E000000 C8C8C91F 00E8C028 A8E81AC4 83000CE8 0EFC76FF FE76FF0A ..v±.v•.Ò...á.S`+âS..èùà....|,.. 0001E0
```

Dump of file SATURN:[PCCOMMON.DUMP.DLL]BRDNOPL.TMP;1 on 18-APR-1990 10:37:32.99
File ID (520,34,0)   End of file block 272 / Allocated 272

Virtual block number 161 (000000A1), 512 (0200) bytes

```
46885F72 08473926 067F677C 0A573926 16568814 4688065E C401E2E9 0E468808 Ä.F.Öã.á^..F..V.&9W.|g..&9G.r_.F 000000
26067F40 7C0E5739 26125688 1046884C 77073926 057C537F 02573926 1A568818 ..V.&9W..S|.&9.wL.F..V.&9W.|ã..& 000020
1D770447 3926067C 257F0657 3926065E C4025788 26078826 1C5EC438 760C4739 9G.v8á^.&..&.W.á^.&9W..X|.&9G.w. 000040
0188E902 57892607 89261C5E C406571B 2604472B 260A5EC4 06578826 04478826 &.G.&.W.á^.&+G.&.W.á^.&..&.W.Ö.. 000060
5739261A 56881846 885F7208 47392606 7F677C0A 57392616 56881446 88065EC4 á^..F..V.&9W.|g..&9G.r_.F..V.&9W 000080
5EC43873 04473926 067C407F 06573926 12568810 46884C77 07392605 7C537F02 ..S|.&9.wL.F..V.&9W..ã|.&9G.sBá^ 0000A0
5788260C 4788261D 720C4739 26067F25 7C0E5739 26065EC4 02578826 0788261C .&..&.W.á^.&9W.|X..&9G.r.&.G.&.W 0000C0
88144688 065EC401 12E90257 89260789 261C5EC4 06571326 04470326 0A5EC40E .á^.&.G.&.W.á^.&..&.W.Ö..á^..F.. 0000E0
3926067C 517F0657 39261A56 88184688 5D720C47 3926067F 657C0E57 39261656 V.&9W.|e..&9G.r).F..V.&9W..Ω|.&9 000100
88260788 261C5EC4 35760847 3926067F 3D7C0A57 39261256 88104688 49770447 G.wI.F..V.&9W.|=..&9G.v5á^.&..&. 000120
26072B26 0A5EC402 57882607 88261877 07392605 7C227F02 57392606 5EC40257 W.á^.&9W.."|.&9.w.&..&.W.á^.&+.& 000140
7F667C0E 57392616 56881446 88065EC4 0098E902 57892607 89261C5E C402571B .W.á^.&..&.W.Ö..á^..F..V.&9W.|f. 000160
56881046 884A7704 47392606 7C527F06 5739261A 56881846 885E720C 47392606 .&9G.r^.F..V.&9W..R|.&9G.wJ.F..V 000180
7C0A5739 26065EC4 02578826 0788261C 5EC43773 07392605 7C3E7F02 57392612 .&9W..>|.&9.s7á^.&..&.W.á^.&9W.| 0001A0
89261C5E C4025713 26070326 0A5EC40A 57882608 4788261C 72084739 26067F24 $..&9G.r.&.G.&.W.á^.&..&.W.á^.&. 0001C0
6FE90375 00043DFE 0EE90375 00023DFE 8FE90375 00013D22 EB24EB02 57892607 .&.W.S$S"=..u.Ö.±=..u.Ö.±=..u.Öo 0001E0
```

Dump of file SATURN:[PCCOMMON.DUMP.DLL]BRDNOPL.TMP;1 on 18-APR-1990 10:37:32.99
File ID (520,34,0)   End of file block 272 / Allocated 272

Virtual block number 162 (000000A2), 512 (0200) bytes

```
08064688 088E1EAD 881E0000 0CC8C8C9 1F00E8C0 2B00E8FE F0E90375 00083DFF .•..u.ÖÞ±S.+âS..èùà....¡Ù..Ä.F.. 000000
89005E05 18578826 16478826 0A5EC400 FFE9C028 05751E46 081C4688 08740846 F.t..F..F.u.+âÖ..á^.&.G.&.W..^.. 000020
9A5016FC 468D0676 FF0876FF 211209C2 9A006A00 6A0676FF 0876FFFA 5689F846 F%.V*.v..v.j.j..ô..|.v..v..F•.P. 000040
1A76FF1C 76FF1E76 FFF65689 F44689FE 5688FC46 8800C1E9 0374C008 1E460A58 X.F..ât.Öè..F•.V±.F¶.V-.v..v..v. 000060
264477FF 26F45EC4 F876FFFA 76FF0E76 FF1076FF 1276FF14 76FF1676 FF1876FF .v..v..v..v..v..v..v*.v%á^¶&.wÖ& 000080
74C00808 C483E3F6 E80EFC76 FFFE76FF 0A76FF0C 76FF1AC4 83FCCFE8 0E4277FF .w8.Öü•.á..v..v..v±.v•.Ö-D.á..ât 0000A0
FF0C76FF 0E76FF10 76FF1276 FF1476FF 1676FF18 76FF1A76 FF1C76FF 1E76FF35 5.v..v..v..v..v..v..v..v..v..v.. 0000C0
FF1A76FF 1C76FF1E 76FF33E8 1AC483FF 21E80E3E 77FF2640 77FF26F4 5EC40A76 v.á^¶&.wÖ&.w>.Öl..á.S3.v..v..v.. 0000E0
001605F6 5688F446 88F876FF FA76FF0E 76FF1076 FF1276FF 1476FF16 76FF1876 v..v..v..v..v..v..v*.v%.F¶.V-... 000100
06468808 8E20C888 1E000018 C8C8C91F 00E8C028 FF28E91A C483FCD1 E80E5052 RP.Öl•.á.Ö(.+âS..èùà....¡à .Ä.F. 000120
18468808 75020A7E 83067401 0A7E830C 74080A7E 83127404 0A7E8320 74084608 .F.t .-..t..-..t..-..t..-..u..F. 000140
80F38802 57892607 89260E56 880C4688 185EC410 741A4608 1846881E 751A4608 .F.u..F..F.t.á^..F..V.&..&.W.¡æ. 000160
5689E846 89125688 10468824 76104639 057F287C 12563916 56881446 880107E9 Ö...F..V.9V.|+..9F.v$.F..V..FÖ.V 000180
83067402 0A7E8316 56391446 89EA5688 E8468812 56891046 89165688 144688EA ö.F..V..F..V..FÖ.Võ.F..V..-..t.. 0001A0
26078926 185EC4FE 5689FC46 89C000BA 00018806 E83FFF8A FFFF8808 7F^80A7E -..u.¡..ɑ.?$.|..ɑ.â.F•.V±á^.&..& 0001C0
5689EC46 89025788 26078826 F65689F4 46891857 88261647 8826065E C4C 5789 .W.á^.&.G.&.W..F¶.V-&..&.W..F&.V 0001E0
```

Dump of file SATURN:[PCCOMMON.DUMP.DLL]BRDNOPL.TMP;1 on 18-APR-1990 10:37:32.99
File ID (520,34,0) End of file block 272 / Allocated 272

Virtual block numbe: 163 (000000A3), 512 (0200) bytes

```
263E4788 26F85EC4 08E80A57 88260847 8826F45E C40D75C2 08FA5689 F84689EE Y.F%.V*.òu.á^¶&.G.&.W.Š.á^%&.G>& 000000
76FF0E76 FF1076FF 1276FF14 76FF1676 FF1876FF 1A76FFF2 5689F046 89405788 .W@.FÞ.V·.v..v..v..v..v..v..v..v 000020
75073926 FE5688FC 4688185E C41AC483 FDC2E80E 50520676 FF0876FF 0A76FF0C ..v..v..v.RP.Òö».á.á^..F•.V±&9.u 000040
5EC408E8 000007C7 261C5EC4 02578926 0789260E 56880C46 88177502 5739261D .&9W.u..F..V.&..&.W.á^.&ú...Š.á^ 000060
01AC0004 19980203 00000009 1E680002 000690C8 C91F00E8 C0280001 07C7261C .&ú...+&Š..èù.....k...........¯. 000080
00500004 04F10203 00000019 21E90002 00000017 008A0002 00000014 21020002 ...|..............Öl......þ...P. 0000A0
4688020F E980F388 06750846 08064688 00008A46 C7D88EFF FF881E56 000052C8 &R..V.¡...ÄúFo...F..F.u.¡µ.Ö...F 0000C0
8826C25E C4C45689 C2468904 57882602 47882682 5EC48456 89824689 08568806 ..V..Fý.VÇá^ý&.G.&.W..Fö.Vá&^ö&. 0000E0
46890857 88260647 8826825E C48E5689 8C468904 57882602 478826C0 46890647 G..F&&.G.&.W..F¥.V/á^ý&.G.&.W..F 000100
8056888AE 46880227 00009A50 16AE4680 C076FFF2 568CF046 89C8468D FE5689FC •.V±.Fà.FÞ.V·.vå.FÛ.P...'..FÙ.V¯ 000120
88E05689 0E4689C4 5688C246 88D04689 024689C0 28000004 46C7CE56 89CC4689 .Fa.VöúFå..+á.F@.FÅ.Fö.Vá.F8.VÅ. 000140
FC4688EA 5689E846 89085688 064688E6 4689C046 88E45689 E246898E 56888C46 F¥.V/.Fã.Vö.Fâ.FÌ.F..V..FÒ.Vð.F• 000160
C402E6C1 C676882A 7F01C67E 83C646FF 03E80000 C646C7EE 5689EC46 89FE5688 .V±.F&.VŸúFó..Š..Fó.-ó..*.vóèl.á 000180
5289F442 89085788 26064788 26865EC4 88568986 46890C50 88260A40 8826825E ^ý&.ə.&.P..FÑ.V¡á^Ñ&.G.&.W..8¶.R 0001A0
FF0EC483 FFFF15A5 9AF476FF F676FFF8 76FFFA76 FFF076FF F276FF00 6ACDE8F6 -Šëj..v·.vÞ.v* v%.v-.v¶.Ë....á.. 0001C0
6A000FE9 037C0064 308A46FF 8A468800 008A46C7 04C4832E FFE80E82 76FF8476 vÇ.vý.Ò...á.úF¤...F¤.F¤=d.|.ÖÖ.j 0001E0
```

Dump of file SATURN:[PCCOMMON.DUMP.DLL]BRDNOPL.TMP;1 on 18-APR-1990 10:37:32.99
File ID (520,34,0) End of file block 272 / Allocated 272

Virtual block number 164 (000000A4), 512 (0200) bytes

```
8AE90374 C00810C4 830384E8 0E8C76FF 8E76FFFC 76FFFE76 FF006A00 6A006A00 .j.j.j..v±.v•.v/.v¥.ÒÇ..á..ât.Ò¤ 000000
0374C008 10C48305 14E80E8C 76FF8E76 FFFC76FF FE76FF00 6A006A00 6A006A00 .j.j.j.j..v±.v•.v/.v¥.Ò...á..ât. 000020
C00810C4 830887E8 0E8C76FF 8E76FFFC 76FFFE76 FF006A00 6A006A00 6A0098E9 Ö..j.j.j.j..v±.v•.v/.v¥.Ö...á..â 000040
75C00810 C4830C35 E80E8C76 FF8E76FF FC76FFFE 76FF006A 006A006A 006A7975 uyj.j.j.j..v±.v•.v/.v¥.Ö5..á..âu 000060
FFF276FF 006A4175 C0080AC4 832107E8 0EFC76FF FE76FFF0 76FFF276 FF016A5A Zj..v·.vÞ.v±.v•.Ò.l.á..âuAj..v·. 000080
0EC276FF C476FFFC 76FFFE76 FF2875C0 080AC483 20EEE80E FC76FFFE 76FFF076 vÞ.v±.v•.ÒŸ .á..âu(.v±.v•.vá.vö. 0000A0
76FFFF13 E90374C0 0804C483 2338E80E FC76FFFE 76FF1175 C00808C4 830F6AE8 Òj..á..âu..v±.v•.Ò8#.á..ât.Ö...v 0000C0
88088E00 07881E56 57000086 C80004CA C95E1F00 E8C028FF FF00689A AE7o FB0 ¯.vÛ.h...+âŠ..^èò..à...WV.¡...Ä. 0000E0
5EC49C56 899A4689 04578826 02478826 065EC402 03E980F3 88067508 46080 46 F..F.u.¡µ.Ö..á^.&.G.&.W..F..V.á^ 000100
46FF03E8 00009E46 C7A25689 A0468900 0A050856 88064688 98468906 478826?A .&.G..F..F..V.....F..VÂúF...Š..F 000120
8E5EC490 56898E46 89025088 26008826 A05EC402 E6C19E76 88487F01 9E7E839E ..~...K.v.èl.á^.&..&.P..F..V.á^. 000140
9E76FF00 6A006A06 77FF2608 77FF2606 5EC4E652 89E44289 08578826 06478826 &.G.&.W..8ö.Rlá^.&.w.&.w.j.j..v. 000160
888A5EC4 8C568C8A 4689FF7A 868DACE8 0000FFFF 9A501600 438003E7 C19E7E88 .-.èÖ..CÅ.P.....Š¯..z..F..V.á^.. 000180
E80000E2 46C71FA5 A5A5A51F 161ED876 80087F80 1FA5A5A5 A51F161E D0768DF8 «.vÅ...ÈÈÈÈ.....vÅ...ÈÈÈÈ.úFâ..Š 0001A0
FF8C76FF 96568994 4689E652 88E44288 02E6C1E2 76883F7D 02E27E83 E246FF03 ..Fã.-ã.)?.vâèl..8Ö.Rl.F..V..v.. 0001C0
7E01927E 830000FF FF9A5016 F8468050 16F04680 50169246 80505200 16058A76 v....RP.F..P.FÞ.P.F%.P......~..- 0001E0
```

Dump of file SATURN:[PCCOMMON.DUMP.DLL]BRDNOPL.TMP;1 on 18-APR-1990 10:37:32.99
File ID (520,34,0) End of file block 272 / Allocated 272 virtual block number 165 (000000A5), 512 (0200) bytes

```
7800009A 50520004 05D28C98 76FFCE56 8CCC4689 A4468088 E80109E9 00018806 .¡..Ö..Š¡.FÊ.Fä.Vö.v..@...RP...x 000000
899C5688 9A468800 008046C7 03FC0000 9A505200 0805CE56 88CC4688 9876FF00 ..v..Fä.Vö...RP...•.úF¯...F..V.. 000020
4689C028 C2468998 4688C056 898E4689 04578826 02478826 9A5EC48C 56898A46 F¤.V¥á^.&.G.&.W..F/.Vå.F..Fò+å.F 000040
A59AE476 FFE676FF E876FFEA 76FFCC76 FFCE76FF 016AC846 89CA4689 C44689C6 ó.Fó.Fò.Fàj..vö.vá.võ.vÒ.vl.vö.Ë 000060
77FF260A 77FF26CC 5EC42A7F 019E7E83 9E46FF03 E800009E 46C70EC4 83041415 ....á.úF...Š..F..-...*á^ä&.w.&.w 000080
CDE80439 02909A30 FF260270 FF26A076 C402E3C1 9E5E8800 6A016A00 6A006A08 .j.j.j.j..^.èD.áv.&.p.&.0...9.Šë 0000A0
74EE4608 EC46880C C483011A 19C89ACC 76FFCE76 FF8A76FF 8C76FF50 16EC468D .F&.P.v..v..vö.vä.à....á..F&.FŸt 0000C0
FF26CC5E C4044900 689A0477 FF260677 FF26CC5E C4E04689 C02802E8 00018805 .¡..Š.+á.FÁá^ä&.w.&.w..h.l.á^ä&. 0000E0
C7D88E02 38881E00 000AC8CB C95F5E1F 00E8E046 88035F00 689A0877 FF260A77 w.&.w..h._..FÅŠ..^_èùà....¡;..Äú 000100
5FC42606 5EC4008E E980F388 06750C46 080A4688 08740846 08064688 0000F646 F-...F..F.t..F..F.ū.¡µ.Ö..á^.&á_ 000120
FE5689FC 46890857 88260647 8826065E C4FA5689 F8468904 57882602 47882602 .&.G.&.W..F%.V*á^.&.G.&.W..F•.V± 000140
0EF876FF FA76FFFC 76FFFE76 FF006A00 6A006A00 6A597000 6430F646 FFF64688 .F-.F-=d.)Yj.j.j.j..v±.v•.v*.v%. 000160
E80EF876 FFFA76FF FC76FFFE 76FF006A 006A006A 006A3875 C00810C4 830048E8 ÒH..á..âu8j.j.j.j..v±.v•.v*.v%.Ò 000180
C0080AC4 832927E8 0EFC76FF FE76FF0A 76FF0C76 FF016A19 75C00810 C48301A8 ¨..á..âu.j..v..v..v±.v•.Ö').á..á 0001A0
88087408 46080646 88088E04 58881E56 57000028 C8C8C91F 00E8C028 9CE80274 t.Š.+âŠ..èùà(..WV.¡(..Ä.F..F.t.. 0001C0
FA7E8300 00FFFF9A 5016F846 800A76FF 0C76FF01 58E980F3 8806750C 46080A46 F..F.u.¡µ.Ö[..v..v..F%.P......-* 0001E0
```

```
Dump of file SATURN:[PCCOMMON.DUMP.DLL]BRDNOPL.TMP;1 on 18-APR-1990 10:37:32.99
File ID (520,34,0)   End of file block 272 / Allocated 272

Virtual block number 166 (000000A6), 512 (0200) bytes

 8CE84689 E0468DF6 568CF446 89EC468D 0138E9C0 28057303 F87E8306 7C0D7F00 ...|..-%.s.+àÒ8..Få.F¶.V-.FÅ.FÒ. 000000
 C40000FE 46C70001 FC46C700 0002CC9A 5016006A 006A006A 0A76FF0C 76FFEA56 Võ.v..v.j.j.j..P.ä...úF•..úF±..ê 000020
 FF9A016A 006A0A76 FF0C76FF 1FA5A5A5 A5DA8E1E F088F88B EA5688E8 4688F45E ^¶.FÒ.Võ.«.Þ..ÖEEEE..v..v.j.j... 000040
 A5A5A5DA 8E1EF08B F88BEA56 88E8468B F45EC400 FE568301 FC46831D EB0000FF ...Š..F=..V±.ê^¶.FÒ.Võ.«.Þ..ÖEEE 000060
 078826E8 5EC400AA E90374C0 0B0000FF FF9AE876 FFEA76FF 0A76FF0C 76FF1FA5 É..v..v..võ.vò......ât.Ö´.ê^Ö&.. 000080
 F45EC406 578B2604 478B26E8 5EC41A75 02573926 20750739 26F45EC4 02578B26 &.W.ê^¶&9.u &9W.u.ê^Ö&.G.&.W.ê^¶ 0000A0
 380D75FC 4638000A 8300012D FA5688F8 468897E8 02740657 39260675 04473926 &9G.u.&9W.t.Š..F%.V•-...Ö.;F•u.; 0000C0
 A51F161E 0716EC76 8D087E8D 35741046 080E468B 00FE5E83 01FC6E83 0875FE56 V±u..n•..^±..F..F.t5.-Ä.v&.....È 0000E0
 0876FF0A 76FF0C76 FF016AFC 76FFFE76 FF5016D8 468D1276 FF1476FF 1FA5A5A5 ÈÈÈ..v..v..FÄ.P.v±.v•j..v..v..v. 000100
 EB0001B8 0000FFFF 9A006AFC 76FFFE76 FF0A76FF 0C76FF16 C4830E5E FF0676FF .v..^..ê..v..v..v±.v•j......|..Š 000120
 7408460B 064688D8 8E0513B8 1E565700 0030C8CB C95F5E1F 00EBC028 FF21E907 .Öt.+âŠ..^_èùàO..WV.|...Ä.F..F.t 000140
 7E830000 05399A50 16F8468D 0A76FF0C 76FF014C E9C02B05 750C460B 0A468808 ..F..F.u.+ãÖL..v..v..F%.P.9....- 000160
 E0468D00 6A006A00 6A0A76FF 0C76FF01 29E9C02B 057303F8 7E83067C 0D7F00FA •...|..-%.s.+àÖ)..v..v.j.j.j..FÅ 000180
 FC46C700 0005719A 5016E846 8D006A01 6A006A0A 76FF0C76 FF000006 F99A5016 .P.•....v..v.j.j.j..FÒ.P.q...úF• 0001A0
 00FE5683 01FC4683 08EB0000 059F9A02 6A006A0A 76FF0C76 FF0000FE 46C70002 ..úF±...v..v.j.j......Š..F•..V±. 0001C0
 16F0468D 5016D846 8D008FE9 0374C008 000005CF 9A5016F0 468D0A76 FF0C76FF .v..v..FÞ.P.ù....ât.Ö¢..FÄ.P.FÞ. 0001E0
```

```
Dump of file SATURN:[PCCOMMON.DUMP.DLL]BRDNOPL.TMP;1 on 18-APR-199% 10:37:32.99
File ID (520,34,0)   End of file block 272 / Allocated 272

Virtual block number 167 (000000A7), 512 (0200) bytes

 6702569A 283A1E8D C0E80274 C00810C4 830080E8 0E5016E0 46805016 E8468D50 P.FÒ.P.FÅ.P.Ò¯..ê..ât.Šâ..:(.V.g 000000
 0716E876 8D007E8D 30741046 080E468B 6576FFFF 06D69A07 6C02329A 085E8D07 ..^Ä.2.l..•...ve.F..F.t=.-Å.vÒ.. 000020
 52000A83 00012DFE 568BFC46 88501600 468D1276 FF1476FF 1FA5A5A5 A51F161E ...ÈÈÈÈ..v..v..FÅ.P.F•.V±-...Ö.R 000040
 5688FC46 880A76FF 0C76FF16 C4830E5E FF0676FF 0876FF0A 76FF0C76 FF016A50 Pj..v..v..v..v..^..ê..v..v..F•.V 000060
 1F161E07 16E8768D E07E8D25 E80001B8 00000678 9A006A50 52000A83 00012DFE ±·...Ö.RPj..x...|..$%.-Å.vÒ..... 000080
 C8CBC95F 5E1F00E8 C02BFF22 E91FA5A5 A5A51F16 1EF0768D E87E8D1F A5A5A5A5 ÈÈÈÈ..-Ò.vÞ...ÈÈÈÈ.Ö".+âŠ..^_èùà 0000A0
 10460B0E 46881074 0C460B0A 46881874 08460806 4688D88E 0695881E 56000044 D..V.|...Ä.F..F.t..F..F.t..F..F. 0000C0
 07392606 5EC40257 88260788 260A5EC4 01EEE98D F3B80675 14460812 46880874 t..F..F.u.|µ.ÖŸ.ê^.&..&.W.ê^.&9. 0000E0
 06573926 06750447 3926065E C4065788 26044788 260A5EC4 1A750257 39262075 u &9W.u.ê^.&.G.&.W.ê^.&9G.u.&9W. 000100
 4788260E 5EC42075 02573926 26750739 260A5EC4 02578B26 0788260E 5EC43274 t2ê^.&..&.W.ê^.&9.u&&9W.u ê^.&.G 000120
 07882606 5EC40184 E98DF388 06750657 39260C75 04473926 0A5EC406 578B2604 .&.W.ê^.&9G.u.&9W.u.|µ.Ö..ê^.&.. 000140
 9AE85E8D 08C2028F 9A8C5E8D 8C46898E 56890257 18260728 260A5EC4 02578826 &.W.ê^.&+.&.W..V/.F¥.^¥.¢.ô..^Ò. 000160
 8C46898E 56890657 18260447 28260A5E C4065788 26044788 26065EC4 08E603EF ÿ.Ì.ê^.&.G.&.W.ê^.&+G.&.W..V/.F¥ 000180
 0728260A 5EC40257 88260788 260E5EC4 091003EF 9AD05E8D 08EE028F 9A8C5E8D .^¥.¢.Ÿ..^Å.y...ê^.&..&.W.ê^.&+. 0001A0
 4788260E 5EC4093C 03EF9AD8 5E8D0918 028F9A8C 5E80BC46 898E5689 02571826 &.W..V/.F¥.^¥.¢....^Ä.ÿ.<.ê^.&.G 0001C0
 5E8D0944 028F9A8C 5E8D8C46 898E5689 06571826 04472826 0A5EC406 578B2604 .&.W.ê^.&+G.&.W..V/.F¥.^¥.¢.D..^ 0001E0
```

```
Dump of file SATURN:[PCCOMMON.DUMP.DLL]BRDNOPL.TMP;1 on 18-APR-1990 10:37:32.99
File ID (520,34,0)   End of file block 272 / Allocated 272

Virtual block number 168 (000000A8), 512 (0200) bytes

 5E8D0964 02329AD0 5E8D095C 06429AD8 5E8D0954 02329AE8 5E8D094C 03EF9AC0 à.ÿ.L..^Ò.2.T..^Ä.B.\..^Å.2.d..^ 000000
 429AE85E 8D098102 329AE85E 8D097903 EF9AF85E 8D097106 D19A0969 06429AC0 à.B.Ì..Ì.q..^%.ÿ.y..^Ò.2....^Ò.B 000020
 09A603EF 9AE05E8D 099E06D1 9A099606 429AD05E 8D099102 329AD05E 8D098906 ....^Å.2....^Å.B....Ì....^Å.ÿ.Ì. 000040
 09C30642 9AC05E8D 098E0232 9AC05E8D 09860642 9AD85E8D 09AE0232 9AD85E8D .^Å.2.Û..^Å.B.Ñ..^à.2.ƒ..^à.B.û. 000060
 5E8D09E4 02329AE0 5E8D09DC 02569A28 421E8D09 D403EF9A C85E8D09 C806019A .Ì.ù..^à.ÿ.à...B(.V.É..^Å.2.ô..^ 000080
 02329AF8 5E8D24E8 8DF78805 750A0006 D69A09F1 03D79AF0 5E8D09EC 06429AC8 à.B.&..^Þ.•.þ..•...u.|%.$$.^%.2. 0000A0
 5E1F00E8 C02B075F 03F79A12 5EC40A18 065A9AF0 5E8D0A10 06429AF8 5E8D0A08 ...^%.B....^Þ.Z...ê^..%._.+âŠ..^ 0000C0
 F3B80675 0C460B0A 46880874 08460806 4688088E 0806881E 56570000 1CC8C8C9 èùà...WV.|...Ä.F..F.t..F..F.u.|µ 0000E0
 03F67E83 067C0D7F 00F87E83 0000068A 9A5016F6 468D0A76 FF0C76FF 018EE98D .Öƒ..v..v..F-.P.o....-%...|..—. 000100
 FC46C700 0006E39A 5016EE46 8D006A00 6A006A0A 76FF0C76 FF0198E9 C02B0573 s.+àÖ...v..v.j.j.j..FŸ.P.D...úF• 000120
 6A006A0A 76FF0C76 FF1FA5A5 A5A51F16 1E0716EE 768DE67E 8D0000FE 46C70001 ..úF±...~Ì.vŸ.....ÈÈÈÈ..v..v.j.j 000140
 1FA5A5A5 A51F161E 0716EE76 8DE67E8D 00FE5683 01FC4683 18EB0000 07129A01 ......Š..F•..V±..~Ì.vŸ.....ÈÈÈÈ. 000160
 FE7E8306 7501FC7E 830127E9 0374C008 0000072C 9A5016EE 468D0A76 FF0C76FF .v..v..FŸ.P.,....ât.Ö'..~•.u..~± 000180
 563B0575 FC463800 DA830001 2DF8568B F64688FA 4689C02B 02EB0001 B8057400 .t.|..Š.+à.F•.F-.V%-...Ö.;F•u.;V 0001A0
 8300E8E8 0E5016E6 46805016 EE468DFA 76FF50E4 4689C02B 02EB0001 B80574FE ±t.|..Š.+à.FðP.v•.FŸ.P.FÌ.P.ÒÒ.. 0001C0
 00012DFE 5688FC46 880A76FF 0C76FF3B 7510460B 0E4688FF 7FE90375 C0080CC4 ê..àu.Ò...F..F.u;.v..v..F=.V±-.. 0001E0
```

```
Dump of file SATURN:[PCCOMMON.DUMP.DLL]BRDNOPL.TMP;1 on 18-APR-1990 10:37:32.99
File ID (520,34,0)   End of file block 272 / Allocated 272

Virtual block number 169 (000000A9), 512 (0200) bytes

 80006AFC 76FFFE76 FF0A76FF 0C76FF00 0008659A 5016E646 80006A50 52000A83 .Ö.RPj..F|.P.e....v..v..v±.v=j.. 000000
 00012DFE 5688FC46 885016E6 46801276 FF1476FF 008AE900 0008859A 5016EE46 FŸ.P.ç...Ö...v..v..F|.P.F=.V±-.. 000020
 880A76FF 0C76FF16 C4830E5E FF0676FF 0876FF0A 76FF0C76 FF026A50 52000A83 .Ö.RPj..v..v..v..v..^..á..v..v.. 000040
 801276FF 1476FF00 00FFFF9A 5016E646 80006A50 52000A83 00012DFE 5688FC46 F=.V±-...Ö.RPj..F|.P......v..v.. 000060
 76FF16C4 830E5EFF 0676FF08 76FF0A76 FF0C76FF 026AFC76 FFFE76FF 5016EE46 FŸ.P.v±.v=j..v..v..v..v..^..á..v 000080
 C02BFEAA E907EB00 01880000 0B4D9A50 16EE468D 006AFC76 FFFE76FF 0A76FF0C ..v..v±.v=j..FŸ.P.M...|..Š.Ö^±+á 0000A0
 000405FE 5689FC46 89085688 06468808 8E0A2A88 1E000010 C8CBC95F 5E1F00EB Š..^_èüà....|°..Ä.F..V..F=.V±... 0000C0
 76FF1076 FFF25689 F0468900 0405FA56 89F84689 0C56880A 4688F656 89F44689 .F¶.V̄-.F..V..F%.V°....FÞ.V·.v..v 0000E0
 76FF2975 C00B14C4 83003CE8 0EFC76FF FE76FFF4 76FFF676 FFF876FF 5250520E .RPR.v%.v-.v¶.v±.v=.Ö<..á..áu).v 000100
 0013E80E F476FFF6 76FFFC76 FFFE76FF F076FFF2 76FFF876 FFFA76FF 0E76FF10 ..v...v°.v%.v·.vÞ.v±.v=.v-.v¶.Ö.. 000120
 0E5EC4D8 8E0C0088 1E00000C C8CBC91F 00E8C028 02EB0001 880574C0 0B14C483 .á..ât.|..Š.+áŠ..èüà....|...Äá^. 000140
 578B2607 8B26125E C4FE5689 FC468902 571B2607 2B26065E C4025788 26078826 &..&.W.á^.&+.&.W..F=.V±á^.&..&.W 000160
 00167E83 010CE903 75FE4608 FC4688FA 5689F846 89025718 26072826 0A5EC402 .á^.&+.&.W..F%.V°.F=.F±u.Ö...-.. 000180
 06EBDAF7 00028308 F7FA5688 F846880F 7D00FA7E 8300F0E9 03750018 7E830975 u..-..u.Ö»..-°.)..F%.V°%Á.@.%ÖŠ. 0001A0
 EBDAF700 028308F7 FE5688FC 46880F7D 00FE7E83 F65689F4 4689FA56 88F84688 .F%.V°.F¶.V-.-±.)..F=.V±%Á.@.%ÖŠ 0001C0
 037EF656 38D2D1E0 D1D313C1 03D2D1E0 D1D2D1E0 D1DA88C8 88FE5688 FC468806 ..F=.V±.à.ÖìÀì@ìÀì@.è.ÆìÀì@;V--. 0001E0

Dump of file SATURN:[PCCOMMON.DUMP.DLL]BRDNOPL.TMP;1 on 18-APR-1990 10:37:32.99
File ID (520,34,0)   End of file block 272 / Allocated 272

Virtual block number 170 (000000AA), 512 (0200) bytes

 207F0257 3926065E C4025788 26078826 0E5EC400 98E90372 F4463808 7C00A5E9 ÖE.|.;F¶r.Ö..á^.&..&.W.á^.&9W..  000000
 63EB0257 89260789 260E5EC4 02578826 07882613 7400187E 83197307 3926057C |.&9.s..-..t.&..&.W.á^.&..&.W.Šc 000020
 13740016 7E831973 07392605 7C207F02 5739260E 5EC40257 88260788 26065EC4 á^.&..&.W.á^.&9W.. |.&9.s..-..t. 000040
 26078826 065EC416 7400187E 8330E802 57892607 8926065E C4025788 26078826 &..&.W.á^.&..&.W.Š0.-..t.á^.&..& 000060
 26078926 065EC402 57882607 88260E5E C414E802 57892607 89260E5E C4025788 .W.á^.&..&.W.Š.á^.&..&.W.á^.&..& 000080
 76FF0C76 FF088E0C 99881E56 5700005E C8CBC91F 00E8C028 04EB0001 88025789 .W.|..Š.+áŠ..èüà^..WV.|...Á.v..v 0000A0
 76FF0193 E9C02805 7304007E 83067C0D 7F00027E 8300000A 509A5016 D04680DA ..FÅ.P.P....-@...|..-Å.s.+áÖ...v 0000C0
 08E80000 0646C700 010446C7 00000E7A 9A5016B0 4680006A 006A006A 0A76FF0C ..v.j.j.j..F¯.P.z...úFå..úF=..Š. 0000E0
 4638087F 0151E903 7D065638 00DA8300 02200256 88004688 00065683 01D44683 .Få..V=..FÅ.V@-...Ö.;V=).Öq...;F 000100
 46800000 0EBC9A50 16884680 006AD476 FFD676FF 0A76FF0C 76FF0147 E9037704 åw.ÖG..v..v..v=.vâj..F|.P.W....F 000120
 1FA5A5A5 A51F161E 88768DF8 88F04680 1FA5A5A5 A51F161E 07168076 8DF888E8 Ö.%.v¯.....EEEE..FÞ.%.v|...EEEE. 000140
 00000F08 9A5016C0 4680006A 50520002 83000105 06568804 46880A76 FF0C76FF .v..v..Få.V=....@.RPj..Fá.P..... 000160
 88004688 00AE5683 01AC4683 08EBAE56 89AC4689 00028300 0205D656 88044688 .Få.V=....@..F¯.VÜŠ..F¯..VÜ..FÅ. 000180
 AC76FFAE 76FF0A76 FF0C76FF 00A6E903 72AC4639 087C0080 E9037EAE 56390256 V@9VÜ-.Ö¯.|.9F¯r.Öl..v..v..vÜ.v¯ 0001A0
 46801FA5 A5A5A51F 161E0716 C0768DF8 88D84680 00000A79 9A5016C8 4680006A |..Fà.P.y....FÅ.%.và.....EEEE..F 0001C0
 A2468050 16AA4680 5016D846 805016E8 46801FA5 A5A5A51F 161EC876 8DF888E0 Å.%.và...EEEE..FÖ.P.FÅ.P.F¯.P.FÅ 0001E0

Dump of file SATURN:[PCCOMMON.DUMP.DLL]BRDNOPL.TMP;1 on 18-APR-1990 10:37:32.99
File ID (520,34,0)   End of file block 272 / Allocated 272

Virtual block numb r 171 (000000AB), 512 (0200) bytes

 4680DE76 FF1076FF 1276FF14 76FF357E 00AA7E83 0000FFFF 9A5016F8 46805016 .P.F%.P......-¯.-5.v..v..v..v..F 000000
 830037E8 0E0676FF 0876FF0A 76FF0C76 FFD476FF D676FFAC 76FFAE76 FF5016A2 Å.P.vÜ.v¯.v=.vå.v..v..v..v..Ö7.. 000020
 88768D80 7E8DFF3A E91FA5A5 A5A51F16 1E0716C8 768DC07E 8D2AE800 01881CC4 á.|..Š°.-à.và.....EEEE.Ö:..-¯.v| 000040
 00F7881E 56570000 24C8CBC9 5F5E1F00 E8C028FE 93E91FA5 A5A5A51F 161E0716 .....EEEE.Ö.±+áŠ..^_èüà$..WV.|%. 000060
 0A76FF0C 76FF0000 0E309A50 16F2468D 006A0E76 FF1076FF 0A76FF0C 76FFD88E .Ä.v..v..v..v.j..F·.P.Ö....v..v. 000080
 1D750739 26F45688 F2468816 5EC40000 108F9A50 16E8468D 006A1276 FF1476FF .v..v.j..FÖ.P.¢...á^..F·.V¶&9.u. 0000A0
 89C02B02 EB0001B8 05750657 392608 75 04473926 F85688F6 46881775 02573926 &9W.u..F-.V%&9G.u.&9W.u.j..Š.+á. 0000C0
 26087504 473926EE 5688EC46 88177502 5739261D 75073926 EA5688E8 4688FA46 F°.FÖ.Vö&9.u.&9W.u..Fá.V¥&9G.u.& 0000E0
 460399C0 2803E899 00018806 7400FA7E 83F04689 C02802E8 00018805 75065739 9W.u.|..Š.+á.FÞ.-°.t.|...Š.+á..F 000100
 28145E88 124E8899 00018804 E899C028 057400F0 7E83FE56 89FC4689 1056130E ..V..F=.V±.-Þ.t.+á.Š.|....N..^.+ 000120
 4638057F 617CFE56 3800E65E 8301E46E 83E65688 E44688E6 5E89E44E 890A18C8 à.Ö.NÖ.^|.FÖ.V|.nÖ..^|.;V±|à..;F 000140
 D69A5016 DC468000 6AFC76FF FE76FF0A 76FF0C76 FF30741C 460B1A46 885A72FC =rZ.F..F.t=.v..v..v±.v=j..FÉ.P.= 000160
 FF0876FF 0A76FF0C 76FF016A FC76FFFE 76FF5016 DC46801E 76FF2076 FF00000F ....v .v..FÉ.P.v±.v=j..v..v..v.. 000180
 FA7E838C E8000007 CC9A006A FC76FFFE 76FF0A76 FF0C76FF 16C4831A 5EFF0676 v..^..á..v..v..v±.v=j..ä...Š..-° 0001A0
 8E1E0716 F088DC7E A0185688 1646883A 741C4608 1A46885B 7500F07E 83617500 .uà.-Þ.u[.F..F.t:.F..V..-É.Þ.... 0001C0
 FF0A76FF 0C76FF00 6A0E76FF 1076FF50 160C468D 1E76FF20 76FF1FA5 A5A5A5DA ÖEEEE..v .v..FÉ.P.v..v.j..v..v.. 0001E0
```

Dump of file SATURN:[PCCOMMON.DUMP.DLL]BRDNOPL.TMP;1 on 18-APR-1990 10:37:32.99
File ID (520,34,0)   End of file block 272 / Allocated 272

Virtual block number 172 (000000AC), 512 (0200) bytes

```
9A1676FF 1876FF00 6A0E76FF 1076FF0A 76FF0C76 FF16C483 1A5EFF06 76FF0876 v..v..^..á..v..v..v..v.j..v..v.. 000000
08064688 0000FE46 C7D88E0F BEB81E00 001AC8CB C95F5E1F 00EBC028 0000FFFF ....+âŠ..^_èùà....¡/..ÀúF±...F.. 000020
5689E646 89005F05 08568806 46880236 E98DF388 06750C46 080A4688 08740846 F.t..F..F.ū.¡µ.Õ6..F..V..^..F|.V 000040
007F00EC 7E830000 0E079A50 16EA468D 0A76FF0C 76FFFC56 8CFA4689 F24680E8 Ò.F·.Fª.V=.v..v..Fõ.P......-ŝ... 000060
6A006A0A 76FF0C76 FF0000F0 46C70001 EE46C701 FBE9C028 057303EA 7E83067C |..-ð.s.+áÕ«.úFŸ..úFÞ...v..v.j.j 000080
7DF05638 000A8300 0220EC56 88EA4688 00F05683 01EE4683 08E80000 0AA29A01 ..Å...Š..FŸ..VÞ..Fõ.Vŝ-...Ő.;VÞ) 0000A0
0800000A CC9AFA76 FFFC76FF 0A76FF0C 76FF0185 E90373EE 4638087F 01BFE903 .Ő«...;FŸs.Õç..v..v..v=.vª.ä.... 0000C0
08126701 309A37FF 260277FF 26FA5EC4 37FF2602 77FF26E6 5EC4019D E90374C0 ât.Õ..á^|&.w.&.7á^ª&.w.&.7.0.g.. 0000E0
0677FF26 FA5EC404 77FF2606 77FF26E6 5EC42074 C00BC028 02E80001 88057500 Àu.¡..Š.+á.ât-á^|&.w.&.w.á^ª&.w. 000100
FF26E65E C40145E9 0374C008 C02802E8 00018805 75000812 9201309A 0477FF26 &.w..0....Àu.¡..Š.+á.ât.ÕE.á^|&. 000120
08C02802 E80001B8 0575D008 128F0130 9A37FF26 0277FF26 FA5EC437 FF260277 w.&.7á^ª&.w.&.7.0.¢..Àu.¡..Š.+á. 000140
C702C39A FA5EC437 FF260277 FF26E65E C440E802 57882607 8826FA5E C40C74C0 ât.á^ª&..&.W.ŠMá^|&.w.&.7á^ª.ù.ú 000160
E403EF9A DC8808EC 83120F06 999A284A 1E801205 06C79A12 CC02C39A E65EC412 .á^|.ù.ä..ú.(...J(...Õ..ŝ..Ê.ÿ.ð 000180
26FA5EC4 131F00FC 9A505212 FA04A69A 12F30256 9AD88808 C48312EE 07BE9A12 ..ƒ.Ÿ..á..Ä.V.µ..|.ª.RP.=...á^ª& 0001A0
4601309A 0477FF26 0677FF26 FA5EC404 77FF2606 77FF26E6 5EC40257 89260789 ..&.W.á^|&.w.&.w.á^ª&.w.&.w..0.F 0001C0
FA5EC454 E8065788 26044788 26FA5EC4 0074C008 C02802E8 00018805 75000813 ..Àu.¡..Š.+á.ât.á^ª&.G.&.W.ŠTá^ª 0001E0
```

Dump of file SATURN:[PCCOMMON.DUMP.DLL]BRDNOPL.TMP;1 on 18-APR-1990 10:37:32.99
File ID (520,34,0)   End of file block 272 / Allocated 272

Virtual block number 173 (000000AD), 512 (0200) bytes

```
6906999A 284A1E8D 135F06C7 9A135602 C39A045F 8DE65EC4 135102C3 9A045F8D ._..û.Q.á^|._..û.V..ú._...J(...i 000000
52138F04 A69A137D 02569AD8 8808C483 137807BE 9A136E03 EF9ADC88 08EC8313 ..ŝ..Ê.ÿ.n..7.x..á..Ä.V̄.)..|...R 000020
FF0C76FF 06578926 04478926 FA5EC408 8A00FC9A 0477FF26 0677FF26 E65EC450 Pá^|&.w.&.w..=.o.á^ª&.G.&.W..v.. 000040
0001FE46 C7057500 FE7E8300 0008F29A FA76FFFC 76FF006A EE76FFF0 76FF0A76 v..vÞ.vŸj..v=.vª.·....-±.u.úF±.. 000060
88187408 46080646 88088E11 73881E56 5700000A C8C8C91F 00EBFE46 88FE25E9 Õ%±.F±Š..èùà...W.¡s..Ä.F..F.t.. 000080
167E8301 F0E980F3 8806751A 46081846 88087414 46081246 88107410 46080E46 F..F.t..F..F.t..F..F.u.¡µ.ÕÞ..-. 0000A0
07770739 26057C0E 7F025739 260A5EC4 02578826 07882606 5EC40093 E9037500 .u.Õ..á^.&..&.W.á^.&9W...|.&9.w. 0000C0
C7077708 473926^6 7C0F7F0A 57392606 5EC40257 88260788 2670E800 04FE46C7 úF±..Šp&..&.W.á^.&9W...|.&9G.w.ú 0000E0
C7077704 473926.. 7C0F7F06 5739260A 5EC40657 88260447 882651E8 0008FE46 F±..ŠQ&.G.&.W.á^.&9W...|.&9G.w.ú 000100
04473926 067F0F7C 06573926 0A5EC40E 5788260C 47882606 5EC431E8 0001FE46 F±..Š1á^.&.G.&.W.á^.&9W.|...&9G. 000120
FF0676FF 0876FF60 E80156E9 8DF18800 0807C726 185EC40E E80002FE 46C70772 r.úF±..Š.á^.&ú...¡þ.ÕV.Šk.v..v.. 000140
8DF18800 0807C726 185EC40E 7508FE7E 830000FF FF9A5016 FE468D0A 76FF0C76 v..v..F±.P......-±.u.á^.&ú...¡þ. 000160
8826125E C4297402 FE7E832F 7401FE7E 83357408 FE7E8338 7404FE7E 83012AE9 Õª..-±.t;.-±.t5.-±.t/.-±.t)á^.&. 000180
0C25FE46 8806E800 0325FE46 88087502 5739260E 75073926 0E5EC402 57882607 .&.W.á^.&9.u.&9W.u..F±%..Š..F±%. 0001A0
39260E5E C4065788 26044788 26125EC4 0086E907 8926185E C4FE4688 FE468900 ..F±.F±á^.&..Õ..á^.&.G.&.W.á^.&9 0001C0
5EC40657 88260447 8826125E C47CE800 8CE9C028 05760447 3926067F 007C0657 W.|...&9G.v.+áÕŸ.Š|á^.&.G.&.W.á^ 0001E0
```

Dump of file SATURN:[PCCOMMON.DUMP.DLL]BRDNOPL.TMP;1 on 18-APR-1990 10:37:32.99
File ID (520,34,0)   End of file block 272 / Allocated 272

Virtual block number 174 (000000AE), 512 (0200) bytes

```
02578826 07882612 5EC459E8 0099E9C0 28057304 47392606 7C0D7F06 5739260E .&9W...|.&9G.s.+áÕ..ŠYá^.&..&.W. 000000
02578826 07882612 5EC439E8 79E8C028 04760739 26057F08 7C025739 260E5EC4 á^.&9W.|...&9.v.+áŠyŠ9á^.&..&.W. 000020
03750002 30987400 013D19E8 59E8C028 04730739 26057C08 7F025739 260E5EC4 á^.&9W...|.&9.s.+áŠYŠ.=..t.=..u. 000040
A5DA8E1E 0716F088 F67E8D10 56880E46 8800E8A9 7400083D CE740004 30FF6DE9 Õm.=..tö=..t`Š..F..V..~-.Þ....ÖE 000060
768DF888 125EC41F A5A5A5A5 DA8E1EF0 88F88814 56881246 880E5EC4 1FA5A5A5 ÊÊÊ.á^..F..V..«.Þ..ÖÊÊÊÊ.á^..«.v 000080
46880888 1303881E 56570000 56C8C8C9 5F5E1F00 E8C0281F A5A5A5A5 1F161EF6 ~...ÊÊÊÊ.+âŠ..^_èùàV..WV.¡ŝ..Ä.F 0000A0
C388C456 89C24689 005E0504 57882602 4788268E 5EC4C056 898E4689 08568806 ..V..Fƒ.Vâá^/&.Ğ.&.W..^..Fõ.Vá.û 0000C0
7400127E 831FA5F2 0008890A 8E1E0716 F088E27E 8DFA5689 F8468900 1605C28C .ó....F%.Vª.-â.Þ....Ö¿...Ê..~..t 0000E0
20065788 26044788 26825689 80468900 DA830001 20025788 26078826 C25EC44E Ná^ó&..&.W.-...Õ..F¯.Vý&.G.&.W.- 000100
AC4688EC 5611EA46 01E45619 E2462982 56888046 88AE5689 AC468900 DA830001 ...Ö..F¯.VÙ.F¯.Vý)Fâ.VÕ.Fõ.Vŝ.F¯ 000120
568CCE46 89C6468D E0568CDE 46890246 80F05611 EE4601E8 5619E646 29AE5688 .VÙ)F|.VÕ.FŸ.VÞ.F0.F8.VÅ.F6.Fö.V 000140
84468926 56882446 88F646FF 0FE88656 89844689 22568820 46880000 F646C7D0 ÀúF-...F .V".FÇ.VÑŠ..F-.FŠ.V&.FÇ 000160
5E880C56 890A4689 1056880E 460303E0 C1F6468B 03C3E903 7C02F67E 83865689 .VÑ.--.|.Õù..F-èÀ..F..V..FÖ.VÉ.^ 000180
76FF006A 50520A76 FF0C76FF F45689F2 46890250 88260088 261476C4 02E3C1F6 -èO.áv.&..&.P..F·.V¶.v..v.RPj..v 0001A0
FF006A50 52000283 000105F4 5688F246 880A76FF 0C76FF00 0017269A DE76FFE0 Å.v8.&....v..v..F·.V¶....0.RPj.. 0001C0
CE76FFD0 76FF30FF 261876C4 E301F65E 8850168C 46800000 0FEE9ACE 76FFD076 vÅ.vö.Ÿ....FŸ.P.^-1Dáv.&.0.vÅ.vö 0001E0
```

Dump of file SATURN:[PCCOMMON.DUMP.DLL]BRDNOPL.TMP;1 on 18-APR-1990 10:37:32.99
File ID (520,34,0)   End of file block 272 / Allocated 272

Virtual block number 175 (000000AF), 512 (0200) bytes

1876C4E3 D1F65E88 16C483FC 76E80E50 16E2468D DA76FFDC 76FFDE76 FFE076FF .vÄ.v8.vÉ.vÖ.F8.P.Övo.6..^-1D6v. 000000
5EC402C0 E91FA5A5 A5A5DA8E 1EF088F8 880C5688 DA4688B4 5EC41874 00388326 &.8.t.6^Ç.FÖ.VÉ.«.Þ..ÖEEEE.Ö&.6^ 000020
88260788 26CE5EC4 1E740657 39260675 04473926 DE5EC406 57882604 47882 6CE ö&.G.&.W.6^B&9G.u.&9W.t.6^ö&..&. 000040
260A5EC4 000DE98C 46880105 E9037402 57392601 0EE90374 0739260E 5EC40257 W.6^B&9.t.Ö..&9W.t.Ö...FWÖÏ.6^Ö& 000060
0326C25E C40E5788 260C4788 26F85EC4 02578926 07892684 5EC40257 88260788 ..&.W.6^Ç&..&.W.6^Y&.G.&.W.6^ö&. 000080
5EC40257 88260788 260A5EC4 00C4E906 57892604 47892684 5EC40657 13260447 G.&.W.6^Ç&.G.&.W.Ö6.6^Ö&..&.W.6^ 0000A0
5EC40657 18260447 2826C25E C4065788 26044788 26F85EC4 02578926 07892684 Ç&..&.W.6^Y&.G.&.W.6^ö&+G.&.W.6^ 0000C0
57132607 0326C25E C40A5788 26084788 26F85EC4 008CE906 57892604 47892684 Ç&.G.&.W.Ö..6^Y&.G.&.W.6^ö&..&.W 0000E0
57892604 47892684 5EC40657 88260447 88260A5E C4025789 26078926 845EC402 Ç&.G.&.W.6^Ö&.G.&.W.6^Ç&.G.&.W 000100
57892607 8926845E C402571B 26072826 C25EC402 57882607 8826F85E C455E806 .6^Ç&..&.W.6^Ö&.G.&.W.6^Ç&.G.&.W 000120
53E90375 00013D1F E8065789 26044789 26845EC4 06578826 04478826 DA5EC402 .$U6^Y&..&.W.6^ö&+.&.W.6^Ç&..&.W 000140
7401BC7E 830183E9 00E8FF76 E9037500 0830B574 00043DFF 13E90375 00023DFF .6^Ö&.G.&.W.6^Ç&.G.&.W.Š.=..u.ÖS 000160
75018C7E 838A5689 88468906 57882604 478826C2 5EC4008C E9037402 8C7E8309 .=..u.Ö..=..tç=..u.Öv.Š.Ö...-¥.t 000180
04472826 DA5EC406 57882604 4788260E 5EC48A56 89884689 DAF70002 8308F70D ..-¥.t.Ö¥.6^ö&.G.&.W..F¡.Vo.-¥.u 0001A0
02571826 0728260A 5EC40257 88260788 260E5EC4 8876FF8A 76FF5052 06571826 .¥Ä.@.¥Ö.F¡.Vo6^B&.G.&.W.6^Ö&+G. 0001C0
46030257 88260788 2?DA5EC4 FE5689FC 4689123D 00609A50 52192C00 FC9A5052 &.W.RP.vo.v¡6^B&..&.W.6^Ö&+.&.W. 0001E0
RP.=.,.RP.'.=..F=.V±6^Ö&..&.W..F

Dump of file SATURN:[PCCOMMON.DUMP.DLL]BRDNOPL.TMP;1 on 18-APR-1990 10:37:32.99
File ID (520,34,0)   End of file block 272 / Allocated 272

Virtual block number 176 (000000B0), 512 (0200) bytes

030E5788 260C4788 26F85EC4 1375028C 7E830257 89260789 26845EC4 FE5613FC =.V±6^Ç&..&.W..-¥.u.6^Y&.G.&.W.. 000000
26044789 26845EC4 8A561388 46030657 88260447 8826F85E C411E88A 56138846 F¡.VoŠ.6^Y&.G.&.W..F¡.Vo6^Ç&.G.& 000020
D2830BF7 0075048C 7E838A56 89884689 02578826 078826C2 5EC40088 E9065789 .W.Ö¡.6^ö&..&.W..F¡.Vo.-¥.u.¥Ä.@ 000040
FF505202 57182607 28260A5E C4025788 26078826 DE5EC48A 56898846 89DAF700 .¥Ö.F¡.Vo6^B&..&.W.6^Ö&+.&.W.RP. 000060
00FC9A50 52065718 2604472B 260A5EC4 06578826 04478826 DE5EC488 76FF8A76 vo.v¡6^B&.G.&.W.6^Ö&+G.&.W.RP.=. 000080
0A578826 08478826 F85EC413 75088C7E 83FE5689 FC468919 2500609A 505219E7 Ö.RP.'.X..F=.V±.-¥.u.6^Y&.G.&.W. 0000A0
89260789 26845EC4 8A561388 46030257 88260788 26F85EC4 10E88A56 13884603 .F¡.VoŠ.6^Y&..&.W..F¡.Vo6^Ç&..&. 0000C0
7E830657 89260447 8926845E C4FE5613 FC460306 57882604 4788260A 5EC40257 W.6^Ö&.G.&.W..F=.V±6^Ç&.G.&.W..- 0000E0
250001B8 03E80002 88057501 3C03248C 468A11E8 C0280475 038C46F6 487500F6 -.uH-F¥.u.+åŠ..F¥Š.<.u.¡..Š.¡..X 000100
00048803 E8000888 0575043C 0C248C46 8A11E8C0 2804750C 8C46F6AA 46890003 ...F^-F¥.u.+åŠ..F¥Š.<.u.¡..Š.¡.. 000120
FA881E56 00001CC8 C8C95F5E 1F00E8C0 28FC25E9 0789261C 5EC4AA46 08000C25 X...F^6^.&..ÖX=+åŠ..^_èuà...V.¡* 000140
46081646 88107414 46081246 88187410 46080E46 88207408 46080646 88088E15 ..Ä.F..F.t .F..F.t..F..F.t..F..F 000160
7500027F 83260C75 003F8326 165EC402 68E980F3 8806751C 46081A46 88087418 .t..F..F.u.¡µ.Ök.6^.&.7.u.&....u 000180
005E0504 57882602 478826E6 5EC4E856 89E64689 08568806 46880256 E9C02805 .+åÖV..F..V..F¡.VÖ6^¡&.G.&.W..^. 0001A0
FA7E83FA 46FF03E8 0000FA46 C7FE5689 FC468900 1605C28C C388EC56 89EA4689 .FÖ.V&.û.ò....F=.V±úF*..Š..F*.-* 0001C0
880E4603 03E0C1FA 4688E4E8 02750038 83261676 C4E301FA 5E880212 E9037C02 .|.Ö...^*iDáv.&.8.u.ŠÖ.F*èÅ..F.. 0001E0

Dump of file SATURN:[PCCOMMON.DUMP.DLL]BRDNOPL.TMP;1 on 18-APR-1990 10:37:32.99
File ID (520,34,0)   End of file block 272 / Allocated 272

Virtual block number 177 (000000B1), 512 (0200) bytes

76FFF856 89F64689 02508826 00882612 76C402E3 C1FA5E88 F45689F2 46891056 V..F·.V¶.^*èÖ.áv.&..&.P..F-.V½.v 000000
00750739 26F25EC4 02578826 078826FC 5EC40000 11869A50 16EE468D 0A76FF0C ..v..FY.P.Ñ...6^=&..&.W.6^·&9.u. 000020
57392600 75084739 26FC5EC4 02578826 07882661 E80004E4 46C70775 025,'026 &9W.u.úFÖ..Š=&..&.W.6^=&9G.u.&9W 000040
75065739 26007504 473926F2 5EC40657 88260447 882644E8 0008E446 C7077 'JA .u.úFÖ..ŠD&.G.&.W.6^·&9G.u.&9W.u 000060
06573926 00750447 3926F25E C40E5788 260C4788 26FC5EC4 26E80001 E446C7C7 .úFÖ..Š&6^=&.G.&.W.6^·&9G.u.&9W. 000080
C40E5788 260C4788 26FC5EC4 0087E9E4 46880008 E446C705 E80002E4 46C70775 u.úFÖ..Š.úFÖ...FÖÖ..6^=&.G.&.W.& 0000A0
88260447 8826FC5E C47DE806 57892604 478926F2 5EC40657 13260447 0326EA5E ^Ö&.G.&.W.6^·&.G.&.W.Š)6^=&.G.&. 0000C0
478826FC 5EC45AE8 06578926 04478926 F25EC406 57182604 472826EA 5EC40657 W.6^Ö&+G.&.W.6^·&.G.&.W.ŠZ6^=&.G 0000E0
8826FC5E C439E802 57892607 8926F25E C4025713 26070326 EA5EC40A 57882608 .&.W.6^Ö&..&.W.6^·&..&.W.Š96^=&. 000100
97740001 3019E802 57892607 8926F25E C402571B 26072826 EA5EC402 57882607 .&.W.6^Ö&+.&.W.6^·&..&.W.Š.=..t. 000120
FF0C76FF 4475F846 08F64688 00E8A874 00083DCE 74000430 FF6CE903 75000230 =..u.Öl.=..tö=..t'Š..F-.F½.Ö.v.. 000140
01008326 1276C402 E3C1FA5E 8800001D 099AF276 FFF476FF 006A016A 006A0A76 v.j.j.j..v¶.v·......^*èÖ.áv.&... 000160
48E80006 50832601 04408326 125EC402 E6C1FA76 88137500 FA7E8300 02508326 &.P...-*.u..v*èl.6^.&.a..&.P..ŠH 000180
016A006A 0A76FF0C 76FF1975 F856381E 75F6463B 000A8300 0120F056 88EE4688 .FY.VÞ-...Ö.;F-u.;V½u..v..v.j.j. 0001A0
F476FF00 6AF676FF F876FF0A 76FF0C76 FF19E800 0011609A F276FFF4 76FF016A j..v¶.v·.'...Š..v..v..v½.v-j..v¶ 0001C0
C8C95E1F 00E8C028 FDE2E900 0100C726 1A76C4E3 D1FA5E88 00001381 9AF276FF .v·.Y....^*iDáv.&ú...Öã»+åŠ..^èù 0001E0

Dump of file SATURN:[PCCOMMON.DUMP.DLL]BRDNOPL.TMP;1 on 18-APR-1990 10:37:32.99
File ID (520,34,0)   End of file block 272 / Allocated 272

Virtual block number 178 (00000082), 512 (0200) bytes

```
1046080E 46882874 0C46080A 46883074 08460806 4688088E 1A9FB81E 000018C8 à....¡...Á.F..F.t0.F..F.t(.F..F. 000000
2046081E 46880874 1C46081A 46881074 18460816 46881874 14460812 46882074 t .F..F.t..F..F.t..F..F.t..F..F  000020
1876FF1E 76FF20~6 FF5016EC 46805016 EE468050 16F6468D 0167E980 F3880675 u.¡µ.Ög..F-.P.FŸ.P.F$.P.v .v..v. 000040
C422C483 F836E80E 0A76FF0C 76FF0676 FF0876FF 1276FF14 76FF2276 FF1676FF .v..v".v..v..v..v..v..v..Ò6%.á"á 000060
16EE468D 006A006A 006AE876 FFEA76FF 0000FFFF 9A5016E8 468D1E77 FF260E5E ^.&.w..FÒ.P......võ.vÒj.j.j..FŸ. 000080
16FE468D 00001E68 9A5016F6 4680006A 016A006A E876FFEA 76FF0000 1DF89A50 P.%....võ.vÒj.j.j..F-.P.h....F±. 0000A0
76FFEC76 FF0E76FF 1076FF50 16EE468D 5016F646 805016EE 468D5016 EC468050 P.F$.P.FŸ.P.F-.P.FŸ.P.v..v..v$.v 0000C0
391775F6 4639F056 88EE4688 74E80274 00FE7E83 1EC48303 C111229A 0A76FF0C ..v..".è..á..-±.t.Št.FŸ.VÞ9F-u.9 0000E0
016A006A E876FFEA 76FF52E8 0275FC56 390775FA 4639F456 88F24688 1275F856 Vüu..F·.V¶9F*u.9V=u.ŠR.võ.vÒj.j. 000100
4689FC56 88FA4688 0E7508EC 7E830674 04EC7E83 00001EA4 9A5016EE 4680016A j..FŸ.P.Ê....-$.t..-$.u..F*.V=.F 000120
4680016A 016A006A E876FFEA 76FFF056 89EE4689 F85688F6 46880CE8 F45689F2 ·.V¶Š..F-.V%.FŸ.VÞ.võ.vÒj.j.j..F 000140
C4E876FF EA76FF06 76FF0876 FF1A77FF 261C77FF 260E5EC4 00001CAF 9A5016EE Ÿ.P.£...á^.&.w.&.w..v..v..võ.vÒá 000160
0000FFFF 9A0277FF 2637FF26 1A5EC404 77FF2606 77FF2637 FF260277 FF26165E ^.&.w.&.7&.w.&.w.á^.&.7&.w...... 000180
4688D88E 1D46881E 56570000 30C8C8C9 1F00E8C0 280000FF FF9AE876 FFEA76FF .võ.vÒ.....+äŠ..èùà0..WV.¡F..Ä.F 0001A0
0E7E831F A5F20008 B9DA8E1E 0716F088 F07E8D00 1605EE56 89EC4689 08568806 ..V..F$.VŸ....~Þ.Þ....Ö¿..·Ê..-. 0001C0
57882607 8826D85E C4DA5689 D8468900 5E050457 88260247 8826EC5E C4627400 .tbá^$&.G.&.W..^..FÄ.VÖá^Ä&..&.W 0001E0
```

Dump of file SATURN:[PCCOMMON.DUMP.DLL]BRDNOPL.TMP;1 on 18-APR-1990 10:37:32.99
File ID (520,34,0)   End of file block 272 / Allocated 272

Virtual block number 179 (00000083), 512 (0200) bytes

```
56890046 8900DA83 00012006 57882604 47882606 56890446 8900DA83 00012D02 .-...Ö..Få.V=&.G.&.W.-...Ö..FÅ.V 000000
01F65619 F44629D2 56880046 88FA5611 F84601F2 5619F046 29D6568P D44688D2 @.Få.V=)FÞ.V·.F%.V*.FÅ.V@)F¶.V-. 000020
83E4468D 1FA5A5A5 A5D88E1E 0716F288 F8880C5E 880A5688 DC468DFE 5611FC46 F=.V±.FÉ.V..^..%.·....ÜEEEE..FÕ. 000040
76FF1076 FF1276FF 5016F046 8D5016DC 468D1FA5 A5A5A5D8 8E1EF288 F88808C2 Õ..%.·..ÜEEEE..FÉ.P.FÞ.P.v..v..v 000060
003EC8C8 C95F5E1F 00E8C028 00000337 9A505200 08051656 88144688 1476FF16 ..v..F..V....RP.7...+äŠ..^_èùà>. 000080
FF1676FF 5016FC46 8D5016EC 468DEA46 89078826 205EC408 8E1EFA88 1E565700 .WV.¡*..Äá^ &...FÕ.F$.P.F=.P.v.. 0000A0
FC7E8302 88E9C028 057D01FC 7E8312C4 83FEE3E8 0E0676FF 0876FF0E 76FF1076 v..v..v..v..ÒO±.á..-=.).+äÒ¡..-= 0000C0
04478826 D8568906 4689EE56 18EC4628 02578826 0788260E 5EC40137 E9037402 .t.Ö7.á^.&..&.W.+F$.VŸ.F=.VÄ&.G. 0000E0
206302BF 9AD65E8D 205E028F 9AD65E8D 04568902 4689F256 18F04628 06578826 &.W.+FÞ.V·.F@.VÅ.^=.¢.^ .^=.¢.c  000100
83208706 D19A207D 06C29A20 78028F9A D25E8D20 73028F9A D25E8D20 6806C29A .ô.k .^@.¢.s .^@.¢.x .ô.} .Ì.. . 000120
1FA5A5A5 A5DA8E1E 0716F088 E27E8D08 C48319E0 07859A20 8C03EF9A DC8808EC $..É.ÿ.. .ç.Á..á..-ã.Þ....ÖEEEE. 000140
46280657 88260447 88260056 89CE4689 F65618F4 46280257 88260788 260E5EC4 á^.&..&.W.+F¶.V-.Fö.VÄ&.G.&.W.+F 000160
8D20E506 C29A200D 028F9ACE 5E8D2008 028F9ACE 5E8DCC56 89CA4689 FA56 8F8 %.V*.Fò.V=.^ö.¢.Ä .^ö.¢.Ï .ô.Í . 000180
EF9ADC88 08EC8321 0106D19A 20F706C2 9A20F202 8F9ACA5E 8D20ED02 8F9AL.5E ^ò.¢.Ü .^ò.¢.· .ô.% .Ì..Ì.$..É.ÿ 0001A0
02329AE2 5E8D1FA5 A5A5A5DA 8E1E0716 F088DA7E 8D08C483 205607B5 9A210603 ..Ì.ç.V .Å..-Ö.Þ....ÖEEEE..^ã.2. 0001C0
A5A5A5A5 1F161E07 16EC768D C27E8D2C 73200006 D69A212D 02329ADA 5E8D2128 (Ì.^Ö.2.-Ì.=.Å s,.-ô.v$.....EEEE 0001E0
```

Dump of file SATURN:[PCCOMMON.DUMP.DLL]BRDNOPL.TMP;1 on 18-APR-1990 10:37:32.99
File ID (520,34,0)   End of file block 272 / Allocated 272

Virtual block number 180 (00000084), 512 (0200) bytes

```
EA46881F A5A5A5A5 1F161EC2 768DF47E 8D1FA5A5 A5A51F16 1EF4768D EC7E8D1F ..-$.v¶...EEEE..-¶.võ...EEEE..Fõ 000000
EC728D08 7F8D03E6 C1F08812 5EC4FE46 8948FC46 88009BE9 037F0002 30FC4603 .F=*....Ö...F=H.F±á^..Þèl.....r$ 000020
52392275 EC423903 E6C1FE76 880A5788 26084788 260E5EC4 1FA5A5A5 A51F161E ...EEEE.á^.&.G.&.W..v±èl.9B$u"9R 000040
02E80001 880575F2 52390A75 F0423903 E6C1FE76 880E5788 260C4788 261D75EE Ÿu.&.G.&.W..v±èl.9BÞu.9R·u.¡..Š. 000060
EB0C5688 0A468808 7400027F 83261C5E C4127501 FE7E8302 4789261C 5EC4C028 +äá^.&.G..-±.u.á^.&....t..F..V.Š 000080
46C7057D 02EA7E83 06578926 04478926 185EC400 DA830001 20DC5688 0A46880C ..F..V.-...Ö.á^.&.G.&.W..~ô.).úF 0000A0
768B00AA E9037CFE 4639FC46 88FE46FF EA46FF06 E80000FE 46C700C2 E90002EA ô..Òô.úF±..Š..Fõ.F±.F=9F±|.Ö`..v 0000C0
03E6C1FE 76881FA5 A5A5A51F 161EEC72 8D398D12 7EC403E3 C1EA5E88 03E6C1FE ±èl..^ôèD.á-..9.r$...EEEE..v±èl. 0000E0
03E6C1FE 76882675 02503926 2C750039 260E76C4 03E3C1EA 5E88EE52 88EC4288 .B$.RŸ.^ôèD.áv.&9.u,&9P.u&.v±èl. 000100
02E80001 88057506 50392608 75044039 260E5E88 03E6C1EA 7688F252 88F04288 .BÞ.R·.vôèl..^.&9ã.u.&9P.u.¡..Š. 000120
74003883 261C76C4 E301EA5E 88167501 FE7E8300 89261C76 C4E301EA 5E88C028 +á.^ô1Dáv.&...-±.u..^ô1Dáv.&.B.t 000140
89261876 C402E3C1 EA5E8800 DA830001 20DC5688 0A46880C E80C5688 0A468808 ..F..V.Š..F..V.-...Ö..^ôèD.áv.&. 000160
56570000 58C8C8C9 5F5E1F00 E8C02807 8926EA46 88205EC4 FF45E902 50892600 .&.P.ÕE.á^ .Fõ&..+äŠ..^_èùàX..WV 000180
0247E9C0 2805750C 46080A46 88087408 46080646 880000CE 46C7D88E 1FE5B81E .¡Ì..ÁùFö...F..F.t..F..F̄.u.+äÖG. 0001A0
C0280573 02E07E83 067C007F 00E27E83 0001186A 9A5016E0 46800676 FF0876FF .v..v..FÅ.P.j....-ã...|..-Å.s.+à 0001C0
86978826 00848788 26885EC4 8A568988 46891857 88261647 88260A5E C40224E9 Õ$.á^.&.G.&.W..F¡.Vöá^¡&....&... 0001E0
```

```
Dump of file SATURN:[PCCOMMON.DUMP.DLL]BRDNOPL.TMP;1 on 18-APR-1990 10:37:32.99
File ID (520,34,0)   End of file block 272 / Allocated 272

Virtual block number 181 (000000B5), 512 (0200) bytes

 00BC46C7 24AD0000 9A505200 0805C28C C38B1E77 FF260A5E C4FE5689 FC468900 ..F=.V±á^.&.w..û.ô...RP...Û$úF¥. 000000
 01F046C7 00001705 9A501608 46805050 500676FF 0876FFF8 4689FA46 89C02800 .+å.F°.F½.v..v.PPP.FÄ.P.....úFÞ. 000020
 016A006A 0676FF08 76F.1FA5 A5A5A51F 161E0716 08768D00 7E8D0000 F246C700 .úF·...-Å.vÄ.....EEEE..v..v.j.j. 000040
 FF1FA5A5 A5A51F16 1E071608 7680D07E 8D00F256 8301F046 8318EB00 00''F29A .å...$..FÞ..V·..-Å.vÄ.....EEEE.. 000060
 46804D75 FA4608F8 46880087 E90374C0 08000012 189A5016 08468006 76FF 976 v..v..FÄ.P......át.Ô...F½.F°uM.F 000080
 1FA5A5A5 A51F161E 087680F8 88B0468D 1FA5A5A5 A51F161E 07160076 8DF88C48 ´.½.vÅ.....EEEE..F¯.½.vÅ...EEEE. 0000A0
 0875FA46 08F84688 0CC4831E 2719C89A 0A76FF0C 76FF5016 A8468D50 16F84680 .F½.P.F´.P.v..v..à.'..á..F½.F°u. 0000C0
 8E46800E 76FF5016 E4468D50 16EC468D 50168C46 8DFF7CE9 35E8027E 018C7E83 .-¥.-.$5Ö|..F¥.P.F&.P.FÔ.P.v..F/ 0000E0
 8C7E83FF 4AE91EC4 83FB86E8 0EF876FF FA76FFF0 76FFF276 FF501600 46805016 .P.FÅ.P.v·.vÞ.v°.v½.Ô.«.á.ÔJ..-¥ 000100
 6A006A00 6A0877FF 260A77FF 260A5EC4 0085E903 75FA4608 F8468840 E8027E01 .-.$M.F½.F°u.Ôç.á^.&.w.&.w.j.j.j 000120
 008C9788 26008A87 8826885E C40F75FA 56391475 F84639FE 5688FC46 88006A01 .j..F=.V±9F½u.9V°u.á^¡&....&.... 000140
 3931750E 4639F446 89F64689 C028FEAA E9037202 909A5052 FA5688F8 468806E8 $..F½.V°RP...r.Ô¯±+ã.F-.F¶9F.u19 000160
 0876FF50 168E4680 5016E446 805016EC 46805016 F4468027 74EE4639 0575EC46 F&u.9FŸt'.F¶.P.F&.P.FÔ.P.F/.P.v. 000180
 E4468050 16EC4680 5016F446 800E76FF 18C483F5 A8E80EF8 76FFFA76 FF0676FF .v..v°.v½.Ô¨%.á..v..F¶.P.F&.P.FÔ 0001A0
 1EC483F8 23E80E06 76FF0876 FFF876FF FA76FF0A 76FF0C76 FF50168E 46805016 .P.F/.P.v..v..v°.v½.v..v..Ô#%.á. 0001C0
 89260A47 8926C02B 0A5EC423 5A00689A 0877FF26 0A77FF26 0A5EC400 01CE46C7 úFö..á^.&.w.&.w..h.Z#á^.+á&.G.&. 0001E0

Dump of file SATURN:[PCCOMMON.DUMP.DLL]BRDNOPL.TMP;1 on 18-APR-1990 10:37:32.99
File ID (520,34,0)   End of file block 272 / Allocated 272

Virtual block number 182 (000000B6), 512 (0200) bytes

 05750846 08064688 088E22E2 881E5657 00002CC8 C8C95F5E 1F00E8CE 46880847 G..Föš..^_èùà,..WV.¡ã".Å.F..F.u. 000000
 F87E8306 7C007F00 FA7E8300 00230C9A 5016F846 800676FF 0876FF01 87E9C028 +áÕ...v..v..F½.P..#...-°...|..-½ 000020
 76FF0000 25809A50 16E0468D 016A006A 006A0676 FF0876FF 0164E9C0 28057302 .s.+áÕd..v..v.j.j.j..FÅ.P.¯%...v 000040
 7E8D0000 FE46C700 01FC46C7 00002378 9A5016F0 468D006A 006A006A 0676FF08 ..v.j.j.j..FÞ.P.x#..úF=..úF±...- 000060
 8318E800 0023A19A 016A006A 0676FF08 76FF1FA5 A5A5A51F 161E0716 F07680E8 Ô.vÞ.....EEEE..v..v.j.j..À#..$.. 000080
 F0468006 76FF0876 FF1FA5A5 A5A51F16 1E0716F0 768DE87E 8D00FE56 8301FC46 F=..V±..-Ô.vÞ.....EEEE..v..v..FÞ 0000A0
 46881074 F6563905 75F44639 EE5688EC 468800DA E90374C0 08000023 C89A5016 .P.ú#...át.ÕÕ..F&.VŸ9F¶u.9V-t..F 0000C0
 0E7D0208 EE5618EC 4628E656 88E44688 AFE80275 F2563907 75F04639 EA5688E8 Ô.Võ9FÞu.9V·u.$£.FÔ.V|+F&.VŸ.#). 0000E0
 E25E88E0 4E88EE56 18EC4628 E65688E4 46880CE8 E6561BE4 4628EE56 88EC4688 .F&.VŸ+FÔ.V|$..FÔ.V|+F&.VŸ.NÅ.^ã 000100
 46880CE8 E2561BE0 4628EA56 88E84688 0E7DD808 D6568904 4689EA5E 18E84E28 +NÔ.^õ.F&.V#.Ü)..FÔ.Võ+FÅ.Vä$..F 000120
 89084689 F25688F0 46881A73 D4463805 7C217F06 5638EA56 18E84628 E25688E0 Å.Vã+FÔ.Võ;V#.!|.;Fás..FÞ.V·.FÄ. 000140
 88F44688 0A568908 4689EA56 88E84688 18E80E56 890C4689 EE5688EC 46880A56 VÖ.F&.VŸ.FÉ.VB$..FÔ.Võ.FÄ.VÖ.F¶. 000160
 00001DE2 9A501608 4680006A FC76FFFE 76FF0676 FF0876FF DE56890C 4689F656 V-.FÉ.VB.v..v..v±.v=j..FÄ.P.ã... 000180
 74010E7E 83088E25 54881E00 0026C8C8 C95F5E1F 00E8C028 FEF7E907 E8000188 ¡..$.Ô%±+á$..^_èùà&...¡T%.Å.-..t 0001A0
 89025788 26078826 DC56890A 46890657 88260447 8826145E C42E7502 0E7E8306 ..~..u.á^.&.G.&.W..FÔ.VÉ&..&.W.. 0001C0
 89025788 26078826 145EC42C E8FA5689 F846890A 57882608 47882 6FE 5689FC46 F=.V±&.G.&.W..F½.V°$,á^.&..&.W.. 0001E0

Dump of file SATURN:[PCCOMMON.DUMP.DLL]BRDNOPL.TMP;1 on 18-APR-1990 10:37:32.99
File ID (520,34,0)   End of file block 272 / Allocated 272

Virtual block number 183 (000000B7), 512 (0200) bytes

 5689F846 890E5788 260C4788 26FE5689 FC468906 57882604 4788260C 56890A46 FÖ.VÉ&.G.&.W..F=.V±&.G.&.W..F½.V 000000
 0E76FFDA 76FFDC76 FFFC76FF FE76FFF8 76FFFA76 FF5016F4 46805016 DE468DFA °.F8.P.F¶.P.v°.v½.v±.v=.vÉ.vÖ.v. 000020
 390A75F4 4639DC56 880A4688 157400DE 7E831AC4 83241321 E39A0A76 FF0C76FF .v..v..DI.$.á..-B.t..FÖ.VÉ9F¶u.9 000040
 80006A50 52000A83 00022D12 56881046 880676FF 0876FF03 A0E9C028 0575F656 V-u.+áÕ...v..v..F..V.-...Ö.RPj.. 000060
 80006A50 52000283 00010512 56881046 880676FF 0876FF00 0027E59A 5016E046 FÅ.P.|'...v..v..F..V.....#.RPj.. 000080
 77E44639 057C1E7F E656390C 56880A46 880229E9 0E468800 00259A9A 5016E846 FÖ.P..%...F.Ö)..FÖ.VÉ9V|..|.9FÔw 0000A0
 56390C56 880A4688 0331E9C0 280577EC 4639057C 0C7FEE56 390C5688 DA468817 ..FÖ.VÉ9VŸ..|.9F&w.+áÕ1..FÖ.VÉ9V 0000C0
 56390C56 880A4688 3EE8F256 89F04689 EE5688EC 46880E77 E4463905 7C157FE6 |..|.9FÔw..F&.VŸ.FÞ.V·$>.FÖ.VÉ9V 0000E0
 5638E656 88E44688 1EE8F256 89F04689 E65688E4 46880E77 EC463905 7C157FEE Ÿ..|.9F&w..FÔ.V|.FÞ.V·$..FÔ.V|;V 000100
 390C5688 DA468801 C1E9F256 89F04689 EC4688EE 56880676 EC463805 7F007CEE Ÿ|...;F&v..VŸ.F&.FÞ.V·Ôé..FÖ.VÉ9 000120
 E9C02805 72EC4639 057F0C7C EE56390C 56880A46 881772E4 4639057F 1E7CE656 V||...9FÔr..FÖ.VÉ9VŸ|...9F&r.+áÕ 000140
 F25689F0 4689EE56 88EC4688 0E72E446 39057F15 7CE65639 DC5688DA 468802A7 I..FÖ.VÉ9V||...9FÔr..F&.VŸ.FÞ.V· 000160
 F25689F0 4689E656 88E44688 0E72EC46 39057F15 7CEE5639 DC5688DA 46883EE8 $>.FÖ.VÉ9VŸ|...9F&r..FÔ.V|.FÞ.V· 000180
 F25689F0 4689EC46 88EE5688 0673EC46 38057C0D 7FEE5638 E65688E4 46881EE8 $..FÔ.V|;VŸ..|.;F&s..VŸ.F&.FÞ.V· 0001A0
 0C7FEA56 390C5688 A468817 77E04639 057C1E7F E256390C 56880A46 880137E9 Ô7..FÖ.VÉ9Vã..|.9FÅw..FÖ.VÉ9VÕ.. 0001C0
 46880E77 E0463905 7C157FE2 56390C56 880A4688 021DE9C0 280577E8 4639057C |.9FÔw.+áÕ...FÖ.VÉ9Vã..|.9FÅw..F 0001E0
```

```
Dump of file SATURN:[PCCOMMON.DUMP.DLL]BRDNOPL.TMP;1 on 18-APR-1990 10:37:32.99
File ID (520,34,0)   End of file block 272 / Allocated 272

Virtual block number 184 (000000B8), 512 (0200) bytes

46880E77 E8463905 7C157FEA 5639DC56 88DA4688 3EE8F256 89F04689 EA5688E8 Ò.Vð.FÞ.V·Š>.FÖ.VÉ9Vð..|.9FÒw..F 000000
56880676 E8463805 7F007CEA 5638E256 88E04688 1EE8F256 89F04689 E25688E0 Å.Vã.FÞ.V·Š..FÁ.Vã;Vð|...;FÒv..V 000020
881772E0 463905?F 1E7CE256 390C5688 DA468800 ADE9F256 89F04689 E84688EA ð.FÒ.FÞ.V·ÒÚ..FÖ.VÉ9Vâ|...9FÁr.. 000040
7CE25639 DC5688DA 46880193 E9C02805 72E84639 057F0C7C EA56390C 5688DA46 FÖ.VÉ9Vð|...9FÒr.+äÖ...FÖ.VÉ9Vâ| 000060
7CEA5639 DC5688DA 46883EE8 F25689F0 4689EA56 88E84688 0E72E046 39057F15 ...9FÁr..FÒ.Vð.FÞ.V·Š>.FÖ.VÉ9Vð| 000080
7FEA5638 E25688E0 46881EE8 F25689F0 4689E256 88E04688 0E72E846 39057F15 ...9FÒr..FÁ.Vã.FÞ.V·Š..FÁ.Vã;Vð. 0000A0
FE59E903 7500013D 22E824E8 F25689F0 4689E846 88EA5688 0673E846 38057C00 .|.;FÒs..Vð.FÒ.FÞ.V·Š$Š"=..u.ÖY± 0000C0
5F7400DE 7E8300EB FECBE903 75000830 FF50E903 75000430 FDC7E903 75000230 =..u.Öú»=..u.Ö].=..u.Öù±Š..-8.t 0000E0
F44689F2 5688F046 880C73F0 4639057C 137FF256 39F65688 F4468842 E80E4688 .F.Š8.F¶.V-9V·..|.9FÞs..FÞ.V·.F¶ 000100
F44689F2 5688F046 880C76F0 4639057F 137CF256 39F65688 F4468838 EBF65689 .V-Š8.F¶.V-9V·|...9FÞv..FÞ.V·.F¶ 000120
880CE800 E8AA7400 0830CF74 00043DB4 74000230 09740001 3D16E818 EBF65689 .V-Š.Š.=..t)=..tÇ=..tü=..t`Š.Š.. 000140
0089E9C0 280575F6 56390A75 F446390C 5688DA46 88F65689 F44689F2 5688F046 FÞ.V·.F¶.V-.FÖ.VÉ9F¶u.9V-u.+äÖ.. 000160
145EC40E 5789260C 478926F6 5688F446 88145EC4 1E75020E 7E830674 010E7E83 .~..t..~..u.á^..F¶.V-&.G.&.W.á^. 000180
8926145E C40A5789 26084789 26F65688 F4468814 5EC418E8 06578926 04478926 &.G.&.W.Š.á^..F¶.V-&.G.&.W.á^.&. 0001A0
76FF1676 FF006A50 5200DA83 00012012 56881046 880676FF 0876FF02 57892607 .&.W..v..v..F..V.-...Ö.RPj..v..v 0001C0
9A505200 08051656 88144688 006A1076 FF1276FF 0676FF08 76FF0000 28409A14 ..ə+...v..v..v..v.j..F..V....RP. 0001E0

Dump of file SATURN:[PCCOMMON.DUMP.DLL]BRDNOPL.TMP;1 on 18-APR-1990 10:37:32.99
File ID (520,34,0)   End of file block 272 / Allocated 272

Virtual block number 185 (000000B9), 512 (0200) bytes

06468800 01F246C7 088E26F7 881E5657 000040C8 CBC91F00 E8000188 00001024 $...|..Š..èùäə..WV.|¼&.ÄúF·...F. 000000
76FF0876 FF02A2E9 8DF38806 75164608 14468808 740C4608 0A468810 74084608 .F.t..F..F.t..F..F.u.|x.ÖÅ..v..v 000020
7500187E 83000027 C59A5016 F4468000 6A505200 D2830001 05125688 10468806 ..F..V.....@.RPj..F¶.P.á'...-..u 000040
1EF4768D E47E8D1F A5A5A5A5 DA8E1E07 16F08804 7E8D1656 88144688 000DE903 .Öì..F..V..-á.Þ....ÖEEEE..-Ö.v¶. 000060
0C468902 57882607 8826145E C41E7502 0E7E8306 74010E7E 831FA5A5 A5A51F16 ..EEEE..-..t..-..u.á^.&..&.W..FÉ 000080
145EC4DE 5689DC46 89F65688 F446881D EBE25689 E04689FA 5688F846 88DE5689 .V8.F½.V°.FÁ.Vãš..F¶.V-.FÉ.V8á^. 0000A0
468304E8 EE568CEC 4689D446 8D0002F0 46C7E256 89E04689 06578826 04478826 &.G.&.W..FÁ.VãúFÞ...Få.Få.VŸŠ..F 0000C0
A5A50B8E 1E0716F2 88F888EE 5E88EC56 88C4468D 5274C008 F04EFFF0 468808EC Š..FÞ.NÞ.åtR.Fá.Vš.^Ÿ.½.·....ÜEÉ 0000E0
FF5016C4 46805016 FC46801F A5A5A5A5 D88E1EF2 88F88808 C283CC46 8D1FA5A5 ÉE..Fä.ó..½.·..UEEEE..F=.P.Fá.P. 000100
08E9A0EB 02E80000 F246C707 74FE4608 FC46880C C4832789 19C89A0A 76FF0C76 v..v..à..'.á..F=.Fžt.úF·..Š.Š.Ö. 000120
5EC40257 89260789 26C45EC4 02578826 07882614 5EC4C656 8CC44689 D4468001 ..Få.Fá.Vóá^.&..&.W.á^á&..&.W.á^ 000140
478926F6 5688F446 88C45EC4 06578926 04478926 C45EC406 57882604 47882614 .&.G.&.W.á^á&.G.&.W.á^á.F¶.V-&.G 000160
02578826 078826C4 5EC40E57 89260C47 8926FA56 88F84688 C45EC40A 57892608 .&.W.á^á.F½.V°&.G.&.W.á^á&..&.W. 000180
26084788 26EE5689 EC468902 57882607 88262D73 08473926 067C357F 0A573926 &9W..5|.&9G.s-&..&.W..Fš.VŸ&.G.& 0001A0
8826C45E C40A5789 26084789 26EE5688 EC4688C4 5EC40257 89260789 260A5788 .W.&..&.W.á^á.Fš.VŸ&.G.&.W.á^á&. 0001C0
89C04689 06578826 04478826 2F760447 3926067F 377C0657 39260E57 88260C47 G.&.W.&9W.|7..&9G.v/&.G.&.W..Få. 0001E0

Dump of file SATURN:[PCCOMMON.DUMP.DLL]BRDNOPL.TMP;1 on 18-APR-1990 10:37:32.99
File ID (520,34,0)   End of file block 272 / Allocated 272

Virtual block number 186 (000000BA), 512 (0200) bytes

260C4789 26C25688 C04688C4 5EC40657 89260447 89260E57 88260C47 8826C256 Vó&.G.&.W.&.G.&.W.á^á.Få.Vó&.G.& 000000
08FC4688 0CC4832C 681D779A 0A76FF0C 76FFC476 FFC676FF 5016FC46 8D0E5789 .W..F=.P.vó.vá.v..v..w.h,.á..F=. 000020
4688145E C413750  0E7E8306 74010E7E 836A7400 F27E8300 00F246C7 0574FE46 F±t.úF·...-·.tj.-..t..-..u.á^..F 000040
76FF0257 89260789 26F65688 F4468814 5EC410EB 06578926 04478926 FA5688F8 ½.V°&.G.&.W.Š.á^..F¶.V-&..&.W..v 000060
FF00002B 229A1476 FF1676FF 006A5052 000A8300 012D1256 88104688 0676FF08 ..v..F..V.-...Ö.RPj..v..v.."+... 000080
FF1476FF 1676FF24 EB26EB00 01880000 10F79A00 6A1076FF 1276FF06 76FF0876 v..v..v..v.j..¼...|..Š&Š.v..v.. 0000A0
5F5E1F00 EB12C483 F8D9EB0E 0676FF08 76FF0A76 FF0C76FF 0E76FF10 76FF1276 v..v..v..v..v..v..v..Ö1½.á.Š..^ 0000C0
C0280575 0C46080A 46880874 08460806 4688088E 2854881E 56570000 2AC8CBC9 èùà°..WV.|Ť+.Ä.F..F.t..F..F.u.+Ī 0000E0
7304F67E 83067C0D 7F00F87E 83000025 719A5016 F6468006 76FF0876 FF01E0E9 ÖÅ..v..v..F-.P.q%...-½...|..—.• 000100
FF0876FF 00002E8E 9A50160E 4680016A 006A006A 0676FF08 76FF01B0 E9C02805 .+äÖŠ..v..v.j.j.j..F8.P......v.. 000120
8DE67E8D 0000FE46 C70002FC 46C70000 2F469A50 16EE468D 006A016A 006A0676 v.j.j.j..FŸ.P.F/..úF=..úF±...-Ì. 000140
FC46831B E8000025 D99A026A 006A0676 FF0876FF 1FA5A5A5 A51F161E 0716EE76 vŸ.....EEEE..v..v.j.j..1%..Š..F• 000160
DA830002 2DF85688 F646881F A5A5A5A5 1F161E07 16EE768D E67E8000 FE568301 ..V±..-Ì.vŸ.....EEEE..F-.V½·...Ö 000180
039A5016 EE468006 76FF0876 FF012CE9 0373FC46 38087F01 36E9037D FE563800 .;V±).Ö6...;F=s.Ö,..v..v..FŸ.P.. 0001A0
E45688E2 46886175 F4563966 75F24639 EC5688EA 46880115 E90374C0 08000026 &...át.Ö...Fõ.Vš9F·uf9V¶ua.Få.Vð 0001C0
006A5052 00028300 0105FE56 88FC4688 0676FF08 76FF2275 EC563927 75EA4639 9Fõu'9Všu".v..v..F=.V±....@.RPj. 0001E0
```

```
Dump of file SATURN:[PCCOMMON.DUMP.DLL]BRDNOPL.TMP;1 on 18-APR-1990 10:37:32.99
File ID (520,34,0)   End of file block 272 / Allocated 272

Virtual block number 187 (000000BB), 512 (0200) bytes

 8BEA468B 1FA5A5A5 A51F161E 07160E76 80067E8D 10EB0000 2FB79A50 16D6468D .F..P.../..$..-..vB.....EEEE..FÕ. 000000
 568BE646 8874EBFA 46890001 8803EB00 02B80576 DA463905 7F0C7CDC 5639EC56 V$9VÉ|...9FÖv.|..$.|...F'$t.F|.V 000020
 76FF0876 FF2275E8 56392775 E64639E0 5680DE46 886175F0 56396675 EE4639E8 Ö9FŸu|9Vpu..FB.VÄ9F|u'9VÒu".v..v 000040
 D67E8D10 EB00002B 979A5016 D6468D00 6A505200 D2830001 05FE568B FC468806 ..F..V....B.RP|..F..P..+..$..- 000060
 B80576D6 4639057F 0C7CD856 39E8568B E646801F A5A5A5A5 1F161E07 160E768D .vB.....EEEE..F|.VÖ9VÄ|...9F.v.| 000080
 FA76FFFC 76FFFE76 FF5016E6 46800E76 FFFECEE9 03EBFA46 890004B8 03EB0008 ..$.|...F'$.Öö.v..F|.P.v..v..v' 0000A0
 2BFE9EE9 07EB0001 880574C0 0B14C483 FB3CEB0E 0676FF08 76FF0A76 FF0C76FF .v..v..v..v..Ò<..é..ât.|..$.Õ..+ 0000C0
 60E980F3 88067508 46080646 8808BE2E 2A881E56 000036C8 C8C95F5E 1F00EBC0 â$..^_èüA6..V.|"..Ä.F..F.u.|µ.Õ' 0000E0
 80EA5689 E8468900 0A05C28C C38BFE56 89FC4689 08578826 06478826 065EC401 .é^.&.G.&.W..F..V..Ù.Õ....FÕ.VÕ. 000100
 03E80000 E646C7D0 5689CE46 89005E05 04578826 02478826 E4568CE2 46890246 F0.FÅ.VÕ&.G.&.W..^..FÖ.VÄÚF|..$. 000120
 89CA4689 02508826 008826EB 76C402E3 C1E65E88 0111E903 7E01E67E 83E646FF .F|.-|.-.Õ...^|èD.ÁvÒ&..&.P..FÕ. 000140
 80E676FF 006A006A FC76FFFE 76FF08C4 83FFFF1A 119A5052 E276FFE4 76FFCC56 Vä.vÕ.väRP......é..v..v.j.j..v|. 000160
 00002E78 9A5016F4 468DE676 FF016A00 6AFC76FF FE76FF00 0030DC9A 5016EC46 F$.P.ÉO...v..v.j.j..v|.F¶.P.x... 000180
 F25689F0 4689E056 130E4603 06578826 04478826 CE5EC464 EB464788 26CA5EC4 é^ò&.GFŠdé^ò&.G.&.W..FB.VÅ.FÞ.V· 0001A0
 8826CE5E C448EBF2 5689F046 8906571B 2604472B 26CE5EC4 D8568806 468861EB Šn.F..VÄé^ò&+G.&.W..FÞ.V·ŠHé^ò&. 0001C0
 26072826 CE5EC4D4 56880246 8830EBEE 5689EC46 890C5613 DA460302 57882607 .&.W..FÖ.VÉ.F$.VŸŠO.F..Väé^ò&+.& 0001E0

Dump of file SATURN:[PCCOMMON.DUMP.DLL]BRDNOPL.TMP;1 on 18-APR-1990 10:37:32.99
File ID (520,34,0)   End of file block 272 / Allocated 272

Virtual block number 188 (000000BC), 512 (0200) bytes

 7400083D 07740004 30927400 023D8074 00013016 EB18EBEE 5689EC46 8902571B .W..F$.VŸ$.$.=..t¯=..t.=..t=..t 000000
 56390575 F84639F2 5688F046 881075F6 56391575 F44639EE 5688EC46 8800EBBA ¤$..F$.VŸ9F¶u.9V-u..FÞ.V·9F¥u.9V 000020
 EBC02BFE E3E90000 260C9A50 16EC468D E676FF01 6A006AFC 76FFFE76 FF1774FA "t..v..v.j.j..v|.F$.P.É&..ÕD.+å$ 000040
 006E0004 1EE70203 02600005 1EDC0203 00600004 1DCC0203 001290CB C95E1F00 ..^èü.....ä...'...É...'...Ó...n. 000060
 00980004 2DEE0203 008A0004 20080203 00000009 30AD0002 007D0004 31960203 ...1..)...üO......Ü-.......Ÿ-.... 000080
 01330004 2E870203 00000014 25330002 00A80004 2E4F0203 00000011 20770002 ..w-.......O...¨...3%......ñ...3. 0000A0
 00000019 302F0002 01BD0004 0F480203 00BD0004 30C50203 00000017 21200002 .. !......é0..$...H...$.../0.... 0000C0
 00000000 00000000 00500004 14AB0203 01CE0004 1F000203 01450004 2EFF0203 ......E...Å...ö...¨...P......... 0000E0
 46890856 88064688 43EB8DF3 88057508 46080646 88088EFF FF881E56 000006C8 Å...V.|...Å.F..F.u.|µ.$C.F..V..F 000100
 408826FA 5EC402E6 C1FE768B 1A7F01FE 7E83FE46 FF03EB00 00FE46C7 FC5689FA '.V.úF..$..F..-...v.èl.é^'&.a 000120
 04CAC95E 1F00EBC0 23000136 47C726FA 5EC4DDEB 0FEB8E03 8805750C 4008260A .&.a.u.|..$.$1é^'&üG6..+å$..^èÕ. 000140
 47882606 5EC40074 08460806 46880000 8E46C7D8 8E0007B8 1E565700 007EC800 .à-..WV.|...ÁúF....F..F.t.é^.&.G 000160
 5052F256 89F04689 06578826 06478826 065EC403 30E980F3 88067508 47082606 .&.G.u.|µ.Õ0.é^.&.G.&.W..FÞ.V·RP 000180
 0230057F 247CD208 000C5E83 01DA6E83 DC56880A 46880000 FFFF9A50 16DA468D .FÕ.P......FÕ.VÉ.nÕ..^É..B|$..=. 0001A0
 CAE802DF E98E0288 0674C008 0000FFFF 9A006A01 6A006AF0 76FFF276 FF1D7600 .v..v·.vÞj.j.j.......ât.|..ÕÕ.$Õ 0001C0
 E9037E01 9C7E839C 46FF03EB 00009C46 C79A5689 98468900 0A050856 88064688 .F..V.....F..V.úF...$..F..-..-.Õ 0001E0

Dump of file SATURN:[PCCOMMON.DUMP.DLL]BRDNOPL.TMP;1 on 18-APR-1990 10:37:32.99
File ID (520,34,0)   End of file block 272 / Allocated 272

Virtual block number 189 (000000BD), 512 (0200) bytes

 5EC48C56 898A4689 84528982 42890250 88260088 26985EC4 02E6C19C 76880088 ...v.èl.é^.&..&.P..B..R..F..V.é^ 000000
 4689CA43 8D03E7C1 9C7E88EE 5689EC46 89E45289 E242890B 57882606 4788268A .&.G.&.W..Bå.RÕ.F$.VŸ.-.èÕ..CÕ.F 000020
 5EC4DE76 FFE076FF 0000FFFF 9A50169C 76FF006A 006AF076 FFF276FF E0568CDE B.VÅ.v·.vÞj.j..v..P......vÅ.vBé^ 000040
 FF9C76FF 016A006A F076FFF2 76FF0AC4 830253E8 0EEC76FF EE76FF46 77FF268A .&.wF.vŸ.v$.ÕS..é..v·.vÞj.j..v.. 000060
 5EC49456 89924689 04578826 02478826 825EC4FF 69E90000 02E29ADE 76FFE076 vÅ.vB.å...Õi.é^.&.G.&.W..F..V.é^ 000080
 C028FFFF 00009A50 16A2468D 9676FFC8 568CC646 899E468D 96468906 47882692 .&.G..F..F...FÕ.Vå.v..FÅ.P.....+å 0000A0
 88468904 57882602 47882692 5EC48656 89844689 94568892 4688A646 89A84689 .F´.F|.F..V..FÇ.VÑé^.&.G.&.W..F| 0000C0
 F2568BF0 4688C056 89BE4689 08568806 46880001 AA46C78C 46899646 888A5689 .Vo.F..FŸúF´...F..V..Fƒ.VÅ.FÞ.V· 0000E0
 83028215 A59AE276 FFE476FF E676FFE8 76FFC676 FFC876FF 006AC456 89C24689 .FÕ.Véj..vå.vÕ.vÕ.v|.vÕ.v$.É.... 000100
 C0E80E50 16CA468D 50169046 8DEC4689 EE4689C0 28FE568C FC4689F4 46800EC4 é..F¶.F..V.+é.FŸ.F$.F..P.FÕ.P.Õå 000120
 A5A5A51F 161E0716 CA768DF4 7E8D0128 E9037C00 643D8E46 FF8E4688 08C48303 ..é..F..F.=d.|.Õ(..-¶.vÕ.....EEE 000140
 9A9076FF C676FFC8 76FF5016 CA468D50 16024680 5016CA46 8D5016EC 46801FA5 É..F$.P.FÕ.P.FB.P.FÕ.P.vå.vÕ.v.. 000160
 06463900 5688CE46 8813750A 56391875 024639CC 5688CA46 8816C483 03190CBA ¤....é..FÕ.Vä9FBu.9Våu..FÖ.VÄ9F. 000180
 46881275 02573926 18750739 26CC5688 CA4688FC 5EC40000 E90375D8 56390875 u.9VÁu.ÕÅ.é^=.FÕ.Vä&9.u.&9W.u..F 0001A0
 16CA468D 016A026A 006AF076 FFF276FF 16740657 39260675 04473926 D05688CE ö.VÅ&9G.u.&9W.t..v·.vÞj.j.j..FÕ. 0001C0
 B2468D50 16CA468D 50169046 8D5016EA 46807074 EE4608EC 46880000 FFFF9A50 P......F$.FŸtp.FÕ.P.F..P.FÕ.P.FB 0001E0
```

```
Dump of file SATURN:[PCCOMMON.DUMP.DLL]BRDNOPL.TMP;1 on 18-APR-1990 10:37:32.99
File ID (520,34,0)   End of file block 272 / Allocated 272

Virtual block number 190 (000000BE), 512 (0200) bytes

 7E831EC4 83FFFF11 229AEC76 FFEE76FF 9076FFC6 76FFC876 FF5016CA 468D5016 .P.Fò.P.vâ.vó.v..vŸ.vš."....á..- 000000
 75D64639 D05688CE 46881275 04563917 75D24639 CC5688CA 468854EB 027400EA ð.t.ŠT.Fò.Va9F@u.9Vâu..Fó.VÂ9F@u 000020
 46800000 01869A5  16CA468D 016A026A 006AF076 FFF276FF 32EB0275 D8563907 .9VÂu.Š2.v·.vÞj.j.j..Fò.P......F 000040
 1A7C648E 7E83FEC  E90EC483 0116EB0E 9076FF50 16CA468D 50160246 8D501690 ..P.F@.P.Fò.P.v..Ò...á.Òò±.-.d|. 000060
 C676FFC8 76FF0000 FFFF9A10 4068006A 0AAE681E 0ABE681E 016A006A 016A006A j.j.j.j..h/..hÛ.j.hã.......vâ.vó 000080
 5F5E1F00 EBC02B01 8C00689A A276FFA4 76FF08C4 83FFFF04 559A0676 FF0876FF .v..v..U....á..vÊ.vÂ.h.Ÿ.+áŠ..^  0000A0
 EE5689EC 4689005E 05045788 26024788 26065EC4 D88E0069 881E0000 14C8CBC9 èûâ....|i..Ää^.&.G.&.W..^..Fâ.VŸ 0000C0
 072B26EC 5EC4F256 8BF04688 76EB0A46 8808C483 FFFF16E0 9A530650 16F0468D .Fþ.P.S.Å....á..F.Šv.FÞ.V·á^ŠŠ+. 0000E0
 FA5613F8 46030257 88260788 26EC5EC4 73EB0257 89260789 260C5EC4 02571B26 &.W.á^.&..&.W.Šsá^ŠŠ..&.W..F½.V* 000100
 0C5EC406 571B2604 472B26EC 5EC4F656 8BF44688 57EB0257 89260789 260C5EC4 á^.&..&.W.ŠW.F¶.V-á^Š&+G.&.W.á^. 000120
 89260C5E C4FE5613 FC460306 578B2604 478B26EC 5EC439EB 06578926 04478926 &.G.&.W.Š9á^Š&.G.&.W..F=.V±á^.&. 000140
 7400083D FF78E903 7500043D 06740002 3DB07400 013D19EB 1BEB0657 89260447 G.&.W.Š.Š.=..t§=..t@=..u.Õx.=..t 000160
 5EC40257 88260788 260C5EC4 D88E03C8 881E0000 0EC8CBC9 1F00EBC0 2800E88F .Š.+âŠ..èûâ....|â..Äá^.&..&.W.á^ 000180
 04472B26 085EC406 578B2604 478B260C 5EC4FC56 89FA4689 02571B26 072B2608 .&+.&.W..F*.V=á^.&.G.&.W.á^.&+G. 0001A0
 F24689F8 568BF646 8806EBDA F7000283 D8F7097D D20BF856 89F64689 06571B26 &.W..F-.V½.@).ŸÅ.@.ŸÒŠ..F-.V½.F· 0001C0
 5638FC56 8BFA4688 06EBDAF7 00D28308 F7FC5688 FA46880F 7D00FC7E 83F45689 .V¶.-=.)..F*.V=ŸÅ.@.ŸÒŠ..F*.V=;V 0001E0

Dump of file SATURN:[PCCOMMON.DUMP.DLL]BRDNOPL.TMP;1 on 18-APR-1990 10:37:32.99
File ID (520,34,0)   End of file block 272 / Allocated 272

Virtual block numbe  191 (000000BF), 512 (0200) bytes

 F87E8311 EBFE4689 00088803 EB000488 057D00FC 7E831376 F2463805 7F1A7CF4 ¶|...;F·v..-=.).|..Š.|...F±Š..-½ 000000
 11EBC028 04750306 46F65274 FE463906 468BFE46 890002B8 03EB0001 88057D00 .).|..Š.|...F±.F.9F±tR-F..u.+âŠ. 000020
 EBC02804 750C0646 F6F24689 00032500 018803EB 00028805 75013C03 2406468A .F.$.<.u.|..Š.|..%...F·-F..u.+âŠ 000040
 105EC408 74FE463B F2460800 0C250004 8803E800 08880575 043C0C24 06468A11 ..F.$.<.u.|..Š.|..%...F·;F±t.á^. 000060
 F6468806 EBDAF700 D28308F7 F85688F6 46880F7D 00F87E83 72EB0789 26FE4688 .F±&..Šr.-½.)..F-.V½ŸÅ.@.ŸÒŠ..F- 000080
 468806EB DAF70002 8308F7FC 5688FA46 880F7D00 FC7E83F4 5689F246 89F85688 .V½.F·.V¶.-=.)..F*.V=ŸÅ.@.ŸÒŠ..F 0000A0
 5EC40002 8803EB00 0188057D 00F87E83 1676F246 38057F1D 7CF4563B FC5688FA *.V=;V¶|...;F·v..-½.).|..Š.|..á^ 0000C0
 C91F00EB C02B0789 26105EC4 00088803 EB000488 057D00FC 7E8314EB 07892610 .&..Š..-=.).|..Š.|..á^.&..+âŠ..è 0000E0
 9CE980F3 8806750C 46080A46 88087408 46080646 88088E04 90881E00 000CC8CB ûâ....|...Å.F..F.t..F..F.u.|æ.Õ. 000100
 578B260C 478B26FE 5689FC46 8902571B 26072B26 0A578B26 08478B26 065EC400 .á^.&.G.&.W.&+.&.W..F=.V±&.G.&.W 000120
 8BF84688 06EBDAF7 00D28308 F7097D02 08FA5689 F8468906 571B2604 472B260E .&+G.&.W..F½.V*.@).ŸÅ.@.ŸÒŠ..F½. 000140
 FC468806 EBDAF700 D28308F7 FE5688FC 46880F7D 00FE7E83 F65689F4 4689FA56 V*.F¶.V-.-±.)..F=.V±ŸÅ.@.ŸÒŠ..F= 000160
 0A5EC400 088803EB 00048805 7D00FE7E 831676F4 4638057F 1D7CF656 3BFE5688 .V±;V-|...;F¶v..-±.).|..Š.|..á^. 000180
 C8C91F00 EBC02B07 89260A5E C40002B8 03EB0001 88057D00 FA7E8314 EB078926 &..Š..-*.).|..Š.|..á^.&..+âŠ..èû 0001A0
 00040000 02030000 000903EA 0002007D 0004035A 02030088 00010396 0103000A ............Z...)...õ.......Å... 0001C0
 001403B7 000200AB 000400A6 02030000 001203A9 00020000 0011021D 0002009B ............`.......|...¨...ñ... 0001E0

Dump of file SATURN:[PCCOMMON.DUMP.DLL]BRDNOPL.TMP;1 on 18-APR-1990 10:37:32.99
File ID (520,34,0)   End of file block 272 / Allocated 272

Virtual block number 192 (000000C0), 512 (0200) bytes

 00000000 00000000 00000000 00000000 00190607 0002008D 00040154 02030000 ....T...§....................... 000000
 FF42E88E 15880575 08460806 46880874 000A7E83 D88EFFFF 881E5657 000004C8 à...WV.|...Ä.-..t..F..F.u.|..Š8. 000020
 0C8EF888 FC5EC428 E88E1488 0574C008 0000FFFF 9A5016FC 4680126A 056A0A76 v.j.j..F=.P......ât.|..Š(á^=.«/É 000040
 EBC02802 57892607 8926FE56 88FC4688 065EC404 4789260A 4688A5F2 0009890A .¿...·E.F.&.G.á^..F=.V±&..&.W.+âŠ 000060
 C208FC56 89FA4689 08558806 4688088E 0008881E 00000EC8 0006CAC9 5F5E1F00 ..^_èò..à....|...Ä.F..V..F*.V=.ô 000080
 88F45689 F2468908 578B2606 478B26FE 46890447 8826FA5E C464E88E 15_^0575 u.|..Šdá^*&.G..F±&.G.&.W..F·.V¶. 0000A0
 000A9A53 06FE76FF F85689F6 46890A57 88260847 8826F25E C42974F4 4608.^46 F·.F¶t)á^·&.G.&.W..F-.V½.v±.Š.Õ. 0000C0
 C0080000 FFFF9AFA 76FFFC76 FFFE76FF CFEBF456 89F24689 F85688F6 46880.90 ...F-.V½.F·.V¶Šü.v±.v=.v*......â 0000E0
 0C56880A 4688088E 006E881E 000004C8 0004CAC9 1F00EBC0 2804E88E 14880574 t.|..Š.+âŠ..èò..à....|n..Ä.F..V. 000100
 26C02806 5EC40C74 08460806 46881975 08460806 46880874 C208FE56 89FC4689 .F=.V±.ôt..F..F.u..F..F.t.á^.+â& 000120
 28025789 26078926 065EC402 57882607 8826FC5E C418E88E 15880789 26024789 .G.&..|..Š.á^=&..&.W.á^.&..&.W.+ 000140
 E88E1588 05750A46 08084688 D88E00F6 881E5657 000004C8 0008CAC9 1F00EBC0 âŠ..èò..à...WV.|-..Ä.F..F.u.|..Š 000160
 26024789 26C02808 5EC41174 C0080000 002C9A50 16FC468D 0C6A056A 0676FF47 G.v.j.j..F=.P,.....ât.á^.+â&.G.& 000180
 078926FE 5688FC46 88085EC4 A5F20006 890AD08E F888FC5E C421E88E 14880789 ..|..Š!á^=.«/Å.¿...·Éá^..F=.V±&.. 0001A0
 88067508 46080646 88088E01 50881E00 0008C8C8 C95F5E1F 00E8C02B 02578926 &.W.+âŠ..^_èûâ....|P..Ä.F..F.u.| 0001C0
 52026A00 6AFE5689 FC468900 DA830001 20025788 26078826 065EC400 05E98E15 ..Ò1.á^.&.¯&.W.·...Ö..F=.V±j.j.R 0001E0
```

```
Dump of file SATURN:[PCCOMMON.DUMP.DLL]BRDNOPL.TMP;1 on 18-APR-1990 10:37:32.99
File ID (520,34,0)   End of file block 272 / Allocated 272

Virtual block number 193 (000000C1), 512 (0200) bytes

 F8468908 5788260C 47882606 5EC44272 0A463805 7F497C0C 5638FFFF 00609A50 P.`...;V.|I..;F.r8é^.&.G.&.W..F% 000000
 46881474 FA4608F8 4688FA56 89F84689 0A578826 08478826 F85EC411 E8FA5689 .V•$.é^%&.G.&.W..F%.V•.F%.F•t..F 000020
 0C5618 0A 4628FE56 88FC4688 52E803E8 02740008 000C5E83 010A6E83 0C56880A ..V..n...^...Àt.$&$R.F•.V±+F..V. 000040
 04478826 F85EC411 E8FA5689 F846890C 5788260A 47882606 5EC40C56 890A4689 .F..V.é^.&.G.&.W..F%.V•$.é^%&.G. 000060
 000C5E83 010A6E83 0C56880A 46881474 FA4608F8 4688FA56 89F84689 06578826 &.W..F%.V•.F%.F•t..F..V..n...^.. 000080
 0014C8C8 C91F00E8 C0280257 89260789 26FA5688 F846880E 5EC403E8 02740008 .Àt.$&é^..F%.V•&..&.W.+à$..èùà.. 0000A0
 0C7E8306 7C000C7E 830C74C2 08F65689 F4468914 56881246 88D88E01 83881E00 ..¡°..Ä.F..V..F¶.V-.ôt..~..|..~. 0000C0
 390C7C00 107E83FE 5689FC46 89025788 26078826 F45EC402 4DE98E15 88067E01 .~.¡..ÕM.é^¶&..&.W..F•.V±.~..|.9 0000E0
 83067F4F 7C00FE7E 83557400 0A7E8302 25E98E15 8806760E 4639057F 007C1056 V.|...9F.v.¡..Õ%..~..tU.~±.|O... 000100
 26084788 26EC5EC4 11E8EE56 89EC4689 08578826 06478826 F45EC447 7400FC7E ~•.tGé^¶&.G.&.W..F&.VŸ$.é^&&.G.& 000120
 26087507 39260856 88064688 EC5EC418 74EE4608 EC4688EE 5689EC46 890A5788 .W..F&.VŸ.F&.FŸt.é^&.F..V.&9.u.& 000140
 C45016EC 46805C73 01FC7E83 067C647F 00FE7E83 CCE801CC E9C02805 75025739 9W.u.+àÕë.$ë.~±..d|..~•.s\.F&.Pé 000160
 EE5688EC 4688F45E C4019FE9 8E148806 74C00806 C483F00E E80E0477 FF26F45E ^¶&.w..Õ8».é..àt.¡..Õ..é^¶.F&.VŸ 000180
 000247C7 26000107 C726F45E C4085789 26064789 26F45EC4 0C578926 0A478926 &.G.&.W.é^¶&.G.&.W.é^¶&ú...&úG.. 0001A0
 FF26F45E C45016F8 46800160 E9C02802 57892607 89260856 88064688 EC5EC400 .é^&.F..V.&..&.W.+àÕ'..F%.Pé^¶&. 0001C0
 26078926 08568806 4688F85E C40143E9 8E148806 74C00806 C483FD82 E80E0477 w..Õ.».é..àt.¡..ÕC.é^%.F..V.&..& 0001E0

Dump of file SATURN:[PCCOMMON.DUMP.DLL]BRDNOPL.TMP;1 on 18-APR-1990 10:37:32.99
File ID (520,34,0)   End of file block 272 / Allocated 272

Virtual block number 194 (000000C2), 512 (0200) bytes

 F0468910 5618 0E46 28FE5688 FC46880C E8105688 0E468808 75000C7E 83025789 .W..~..u..F..V.$..F•.V±+F..V..Fþ 000000
 26084789 26F85EC4 EE5689EC 46890857 88260647 8826F45E C44175C2 08F25689 .V·.õuAé^¶&.G.&.W..F&.VŸé^%&.G.& 000020
 478926FA 5688F846 88F45EC4 06578926 04478926 FA5688F8 4688EC5E C40A5789 .W.é^&.F%.V•&.G.&.W.é^¶.F%.V•&.G 000040
 260A4788 26F45EC4 4075F256 394575F0 4639FE56 88FC4688 008EE908 57892606 .&.W.Õ/..F•.V±9FÞuE9V·uøé^¶&.G.& 000060
 478926FA 5688F846 88EC5EC4 06578926 04478926 F85EC4EE 5689EC46 890C5788 .W..F&.VŸé^%&.G.&.W.é^&.F%.V•&.G 000080
 F276FF50 16EC4680 6EE80C57 89260A47 8926FA56 88F84688 F45EC40A 57892608 .&.W.é^¶.F%.V•&.G.&.W.$n.F&.P.v· 0000A0
 04478826 EC5EC450 E88E1388 0574C008 0CC483FD 00E80EF4 76FFF676 FFF076FF .vÞ.v~.v¶.Õ.».é..àt.¡..$}é^&&.G. 0000C0
 0A578926 08478926 EE5688EC 4688F85E C4065789 26044789 26F85EC4 06578826 &.W.é^%&.G.&.W.é^%.F&.VŸ&.G.&.W. 0000E0
 8926FA56 88F84688 EC5EC40A 57892608 478926FA 5688F846 88045FC4 26EC5EC4 é^&&é_..F%.V•&.G.&.W.é^&.F%.V•&. 000100
 1E000004 C80010CA C91F00E8 C0280002 57832601 078326F4 5EC40657 89260447 G.&.W.é^¶&...&.W..+à$..èò..à.... 000120
 7E010A7E 83067C00 0A7E830C 74C208FE 5689FC46 890E5688 0C468808 8E02A388 ¡Ê..Ä.F..V..F•.V±.ôt..~..|..~..~ 000140
 E8FD3EE8 0E0676FF 0876FF00 6A0A76FF 006A006A 0C76FF0E 76FF18E8 8E158805 .¡..$..v..v.j.j..v.j..v..v..Õ>»$ 000160
 0C74C208 FE5689FC 46890E56 880C4688 088E0521 881E0000 06C8000A CAC91F00 ..èò..à....¡!..Ä.F..V..F•.V±.ôt. 000180
 6A0C76FF 0E76FF20 74084608 0646883A E88E1588 057E010A 7E83067C 000A7E83 .~..|..~..~.¡..$:.F..F.t .v..v.j 0001A0
 6A0C76FF 0E76FF12 E80274C0 08FA4689 028BE80E 0676FF08 76FF0A76 FF006A00 .j..v..v..v..ÕE..F•.àt.$..v..v.j 0001C0
 0E56880C 46880 88E 056C881E 00000CC8 000ACAC9 1F00E800 07E80E01 6A006A00 .j.j..Õ..$..èò..à....¡!..Ä.F..V. 0001E0

Dump of file SATURN:[PCCOMMON.DUMP.DLL]BRDNOPL.TMP;1 on 18-APR-1990 10:37:32.99
File ID (520,34,0)   End of file block 272 / Allocated 272

Virtual block number 195 (000000C3), 512 (0200) bytes

 000A7E83 2872013F 8326067F 337C0002 7F8326FC 5EC43D74 C208FE56 89FC4689 .F•.V±.ôt=é^•&....|3..&.?.r+.~.. 000000
 7C00067E 830C7208 4638057F 137C0A56 3800DA83 00012D02 57882607 8826257C |%&..&.W.-...Õ.;V.|....;F.r..~..| 000020
 0846884E 7500027F 83265575 013F8326 FC5EC401 92E98E15 88067E01 067E8306 ..~..~.¡..Õ..é^•&.?.uW&....uN.F. 000040
 0674C008 000007A2 9A0677FF 260877FF 260477FF 260174E9 8E158806 740A4608 .F.t.¡..Õt.&.w.&.w.&.w..Ä....àt. 000060
 5EC40A47 89260C47 8926FC5E C4064789 26084789 26C028FC 5EC40159 E98E1488 ¡..ÕY.é^•+à&.G.&.G.é^•&.G.&.G.é^ 000080
 26078826 FC5EC416 E80A5688 08468808 7500067E 830134E9 07892602 478926FC •&.G.&..Õ4..~..u..F..V.$.é^•&..& 0000A0
 06478826 FC5EC438 75C208FA 5689F846 89000A83 00012D0A 56180846 28025788 .W.+F..V.-...Õ..F%.V•.õu;é^•&.G. 0000C0
 08578926 06478926 FC5EC40A 57882608 478826F4 5EC4F656 89F44689 08578826 &.W...F¶.V-é^¶&.G.&.W.é^•&.G.&.W. 0000E0
 01200257 88260788 26FC5EC4 00A0E904 47892606 478926C0 28065FC4 26FC5EC4 é^•&é_.+à&.G.&.G.Õ..é^•&..&.W.-. 000100
 26F45EC4 F65689F4 46890C57 88260A47 88263775 FA56383C 75F8463B 000A8300 ..Õ.;F%u<;V•u7&.G.&.W..F¶.V-é^¶& 000120
 260A4789 26C0280A 5FC426FC 5EC40C57 89260A47 8926FC5E C4065788 26044788 .G.&.W.é^•&.G.&.W.é^•&é_.+à&.G.& 000140
 74C0080C C483FA53 E80EFC76 FFFE76FF F876FFFA 76FF5016 F44680 4F E8084789 .G.$O.F¶.P.v•.v%.v±.v•.ÕS•.é..àt 000160
 F45EC40A 57892608 47892604 5FC4260A 57882608 478826F4 5EC459E8 8E138805 .¡..$Yé^¶&.G.&.W.&é_.&.G.&.W.é^¶ 000180
 76FFF676 FF0477FF 26FC5EC4 06578926 04478926 085FC426 06578826 04478826 &.G.&.W.&é_.&.G.&.W.é^•&.w..v~.v 0001A0
 1F00E8C0 2800025F 8326012F 8326FC5E C410E88E 14880574 C0080000 008E9AF4 ¶./....àt.¡..$.é^•&./.&._..+à$.. 0001C0
 7E832E74 C208FE56 89FC4689 12568810 46880 88E 05068 81E 000008C8 000ACAC9 èò..à....¡•..Ä.F..V..F•.V±.ôt..~ 0001E0
```

Dump of file SATURN:[PCCOMMON.DUMP.DLL]BRDNOPL.TMP;1 on 18-APR-1990 10:37:32.99
File ID (520,34,0)   End of file block 272 / Allocated 272

Virtual block number 196 (000000C4), 512 (0200) bytes

```
0C720C46 38057F13 7C0E5638 000A8300 012D0257 8826078B 26FC5EC4 287C000E ..|(á^=&..&.W.-...Ö.;V.|...;F.r. 000000
880C4688 0875000A 7E835016 F8468D55 E88E1588 057E010A 7E83067C 000A7E83 .-..|..-..-.¡..ŠU.F½.P.~..u..F.. 000020
FFFE76FF 5052007A 83000120 0E5618OC 462B0257 8826078B 26FC5EC4 16EB0E56 V.Š.á^=&..&.W.+F..V.-...Ö.RP.v±. 000040
89260789 26085688 064688F8 5EC414EB 8E138805 74C0080C C483F967 E80EFC76 v=.Ög*.á..ât.¡..Š.á^½.F..V.&..&. 000060
5689FC46 89125688 10468808 8E07CA88 1E000008 C8000ECA C91F00EB C02B0257 W.+âŠ..èò..à....¡ò..Ä.F..V..F=.V 000080
187C0E56 38000A83 00012D02 57882607 8826FC5E C4307C00 0E7E8336 74C208FE ±.ôt6.-..|0á^=&..&.W.-...Ö.;V.|. 0000A0
59E88E15 88057508 46080646 88087F01 0A7E830E 7C000A7E 8314720C 4638057F ..;F.r..-..|..-.....F..F.u.¡..ŠY 0000C0
0C462B02 57882607 8826FC5E C416E80E 56880C46 88087500 0A7E8350 16F84680 .F½.P.~..u..F..V.Š.á^=&..&.W.+F. 0000E0
E88E1388 0574C008 0CC483F8 88E80EFC 76FFFE76 FF505200 DA830001 20U.T618 .V.-...Ö.RP.v±.v=.Ò¡½.á..ât.¡..Š 000100
0CC8000E CAC91F00 E8C02B02 57892607 8926065E C4025788 26078826 F85E.:18 .á^½&..&.W.á^.&..&.W.+âŠ..èò..à. 000120
05750846 08064688 0874C208 FA5689F8 46891056 880E4688 D88E0871 881E0.00 ...¡q..Ä.F..V..F½.V°.ôt..F..F.u. 000140
19E8F656 89F44689 08578826 06478826 F85EC4FC 4689FE46 89C02878 E88E1588 ¡..Šx+á.F±.F=á^½&.G.&.W..F¶.V-Š. 000160
74F64608 F4468800 FE568301 FC4683F6 5689F446 890A5788 26084788 26F45EC4 á^¶&.G.&.W..F¶.V-.F=..V±..F¶.F-t 000180
8926FE56 88FC4688 065EC414 75025739 261A7507 39260C56 880A4688 F45EC42A *á^¶.F..V.&9.u.&9W.u.á^..F=.V±&. 0001A0
CAC91F00 E8C028FF FF0247C7 26FFFF07 C726065E C485E814 E8C02802 57892607 .&.W.+âŠ.Šçá^.&ú...&úG...+âŠ..èò 0001C0
E88E1588 0575C208 FE5689FC 46890C56 880A4688 088E0924 881E0000 08C8000C ..à....¡$..Ä.F..V..F=.V±.ôu.¡..Š 0001E0
```

Dump of file SATURN:[PCCOMMON.DUMP.DLL]BRDNOPL.TMP;1 on 18-APR-1990 10:37:32.99
File ID (520,34,0)   End of file block 272 / Allocated 272

Virtual block number 197 (000000C5), 512 (0200) bytes

```
47892610 478926C0 280F7707 3926057C 167F0257 39260856 88064688 FC5EC472 rá^=.F..V.&9W...|.&9.w.+â&.G.&.G 000000
08478826 F85EC411 E8FA5689 F8468908 57882606 478826FC 5EC44DE8 8E158B0E .¡..ŠMá^=&.G.&.W..F½.V°Š.á^½&.G. 000020
5EC4D8E8 0274000B 00085E83 01066E83 08568806 4688FA56 89F84689 0A578826 &.W..F½.V°.F..V..n...^...Ât.ŠUá^ 000040
09C8881E 000008C8 0008CAC9 1F00E8C0 28105789 260E4789 26FA5688 F84688FC =.F½.V°&.G.&.W.+âŠ..èò..à....¡à. 000060
C454E88E 15880575 08460806 46880874 C208FE56 89FC4689 0C56880A 4688D88E .Ä.F..V..F=.V±.ôt..F..F.u.¡..ŠTá 000080
07892602 478926C0 28065EC4 11750008 FA5689F8 46891057 88260E47 8826FC5E ^=&.G.&.W..F½.V°.Âu.á^.+â&.G.&.. 0000A0
08478826 F85EC402 57892607 8926065E C4025788 26078826 F85EC42E E88E1688 ¡..Š.á^½&..&.W.á^.&..&.W.á^½&.G. 0000C0
14000301 6E020300 0408CAC9 1F00E8C0 28105789 260E4789 26FC5EC4 0A578826 &.W.á^=&.G.&.W.+âŠ..èò.....n.... 0000E0
00000000 00000000 0000190A 5E000200 00001701 E4000200 22000306 58020300 ...X..."...ð.......^........... 000100
89F24689 C028005A G0F09A50 16E84680 0676FF08 76FF088E FFFF881E 000038C8 â8...¡...Ä.v..v..FÒ.P.Þ.Z.+á.F·. 000120
72F04639 087C0176 E9037EF2 5639EA56 88E84688 00F25683 01F04683 08E8F046 FÞŠ..FÞ..V·..FÒ.Võ9V·-.Õv.|.9FÞr 000140
88F84688 00800868 9A5016F8 4680006A F076FFF2 76FF0676 FF0876FF 016CE903 .Õl..v..v..v·.vÞj..F½.P.k.¯..F½. 000160
FC46890A 57882608 47882602 5FC42604 5EC40656 89044689 D2568900 4689FA56 V°.FÂ.V0.Fà.Vmá^Â&á_.&.G.&.W..F= 000180
D45EC40A C483FF66 E80E3E77 FF264077 FF26045E C40A76FF 0C76FF01 6AFE5689 .V±j..v..v.á^Â&.wQ&¯w>.Òf..á.á^à 0001A0
01DC4683 08E80C46 890E4689 C02800F7 00F09A50 16084680 4277FF26 4477FF26 &.wÒ&.w8.FÄ.P.Þ.¼.+à.F8.FÉŠ..FÉ. 0001C0
26045EC4 0001E903 720C4639 087C000B E9037EDE 56390A56 88084688 000E5683 .V8..FÄ.VO9V8~.ÒU.|.9FÉr.Õi.á^Â& 0001E0
```

Dump of file SATURN:[PCCOMMON.DUMP.DLL]BRDNOPL.TMP;1 on 18-APR-1990 10:37:32.99
File ID (520,34,0)   End of file block 272 / Allocated 272

Virtual block number 198 (000000C6), 512 (0200) bytes

```
89E65688 E4468801 1808689A 5016E446 8D006ADC 76FFDE76 FF4277FF 264477FF .wÒ&.w8.v8.vÉj..Fð.P.k....Fð.VI. 000000
89EE4689 C0280159 00F09A50 16E04680 4877FF26 4A77FF26 CC5EC4CE 5689CC46 Fà.Vöá^ã&.wJ&.wH.FÂ.P.Þ.Y.+à.FŸ. 000020
5EC46C73 EC463905 7C737FEE 5639E256 88E04688 00EE5683 01EC4683 08E8EC46 F&Š..F&..VŸ..FÂ.Vã9VŸ.ã|.9F&slá^ 000040
8326F45E C4FFFF08 689A5016 F4468000 6AEC76FF EE76FF48 77FF264A 77FF26CC ã&.wJ&.wH.vŸ.vãj..F¶.P.k...á^¶&. 000060
473926E6 5688E446 88C85EC4 CA5689C8 46890257 8826078B 268DEB02 7400067F ...t.Š§&..&.W..Fà.Vòá^à.Fð.VI&9G 000080
0676FF08 76FF5306 0A76FF0C 76FF0E76 FFFC76FF FE76FF1E 750C5739 2624750A .u$&9W.u..v±.v=.v..v..v..S.v..v. 0000A0
C4D88E00 06881E56 5700003E C8CBC91F FE74E9FF 0FE9FF7A E912C483 000FE80E .Ò...á.Òz.Ò..Òt±.èúà>..WV.¡...Äá 0000C0
4689C02B 0000FFFF 9A5016E6 468D5052 DC56890A 46890857 88260647 88260A5E ^.&.G.&.W..FÒ.VÉRP.F|.P.....+à.F 0000E0
E9037DFE 5638000A 83000120 E85688E6 468800FE 568301FC 468308EB FC4689FE ±.F=Š..F=..V±..F|.VÒ-...Ò.;V±).Ò 000100
9A50160E 4680006A FC76FFFE 76FFDA76 FFDC76FF 011BE903 77FC4638 087F0125 X...;F=w.Ò...vÉ.vÖ.v±.v=j..F8.P. 000120
9A5016D2 4680006A 50520002 83000105 FE5688FC 4688DA76 FFDC76FF 00000240 ã....vÉ.vÖ.F=.V±....0.RPj..F0.P. 000140
390A75E2 46390856 88064688 1575E056 391A75DE 46390456 88D24688 0000FFFF .....F0.Vâ9F8u.9VÂu..F=.VÂ9Fâu.9 000160
1AE80000 FA46C707 75E05639 0C75DE46 39D45688 D2468831 E8FF7FE9 0575E456 Vðu.Ò..Š1.F0.Vâ9F8u.9VÂu.úF°..Š. 000180
80F888C2 4680FF4C E903E800 01FA46C7 0775E456 390C75E2 46390856 88D64688 .F=.VÄ9Fâu.9Vðu.úF°..Š.ÒL..Fð.½. 0001A0
80EA7E80 1FA5A5A5 A51F161E D2768DF8 88CA4680 1FA5A5A5 A51F161E 0716DE76 v8.....ÉÉÉÉ..Fð.½.v0...ÉÉÉÉ..-ð. 0001C0
C24680FC 76FFFE76 FFFA76FF 0E76FF10 76FF1276 FF1FA5F2 0008891F 161EC276 vð...¿..·É..v..v..v..v².v±.v=.Fð 0001E0
```

```
Dump of file SATURN:[PCCOMMON.DUMP.DLL]BRDNOPL.TMP;1 on 18-APR-1990 10:37:32.99
File ID (520,34,0)   End of file block 272 / Allocated 272

Virtual block number 199 (000000C7), 512 (0200) bytes

 1076FF00 6A297400 127E831B C483003A E80E0676 FF0876FF 0A76FF0C 76FF5016 .P.v..v..v..v..Ò:..á..-..t)j..v. 000000
 0BE80E14 76FF1676 FF0A76FF 0C76FF50 16EA468D FC76FFFE 76FFFA76 FF0E76FF .v..v'.vz.v=.Fõ.P.v..v..v..v..Ò. 000020
 16EC468D 0676FF08 76FFD88E 01B8B81E 000034C8 CBC95F5E 1FFEBFE9 18C48300 ..á.Òez.^_èùá4...¡É..Ä.v..v..Fá. 000040
 5639EE56 8BEC468B 00F65683 01F44683 08EBF446 89F64689 C02B0386 00F09A50 P.Þ...+à.F-.F¶Š..F¶..V-..Fá.V¥9V 000060
 468D006A F476FFF6 76FF0676 FF0876FF 0161E903 72F44639 087C016B E9037EF6 --.Ök.|.9F¶r.Öa..v..v..v-.v¶j..F 000080
 77FF2608 5EC40A56 89D84689 D6568904 4689FE56 8BFC468B 03AD086B 9A5016FC =.P.k.Ü..F=.Vz.FÅ.V=.FÅ.VÖá^Ä&.w 0000A0
 E2568301 E0468308 EBE04689 E24689C0 2B03F400 F09A5016 DC468D42 77FF2644 D&.wB.FÉ.P.Þ.¶.+à.Fã.FÅŠ..FÅ..Vã 0000C0
 4477FF26 085EC400 F5E90372 E0463908 7C00FFE9 037EE256 39DE568B DC468B00 ..FÉ.VB9Vã-.Ö..|.9FÅr.Ö%.á^Ä&.wD 0000E0
 89D04689 EA568BE8 468B0018 08689A50 16E8468D 006AE076 FFE276FF 4277FF26 &.wB.vã.vÅj..FÒ.P.k....FÒ.Võ.FÅ. 000100
 EBF04689 F24689C0 2B045C00 F09A5016 E4468D48 77FF264A 77FF2600 5EC40256 V0á^Ä&.wJ&.wH.Fõ.P.Þ.\.+à.F..FÞŠ 000120
 8AE90372 F0463908 7C0094E9 037EF256 39E6568B E4468B00 F2568301 F0468308 ..FÞ..V..Fõ.V|9V.-.Ö..|.9FÞr.Ö. 000140
 5EC40344 08689A50 16F8468D 006AF076 FFF276FF 4877FF26 4A77FF26 D05EC400 .á^Ä&.wJ&.wH.v.vÞj..F%.P.k.D.á^ 000160
 EA5688E8 4688CC5E C4CE5689 CC468902 57882607 882687E8 02740006 7F8326F8 ¥&....t.Šñ&..&.W..Fä.Vöá^ä.FÒ.Võ 000180
 76FF1276 FF1476FF 1676FF18 76FF1A76 FF1C76FF 3C750C57 39264275 0A473926 &9G.u&9W.u<.v..v..v..v..v..v..v 0001A0
 77FF2604 77FF2602 5FC426D8 5EC40676 FF0876FF 0A76FF0C 76FF5306 0E76FF10 ..v..S.v..v..v..v.á^ÄÄá_.&.w.&.w 0001C0
 1076FF16 76FF1876 FF1A76FF 1C76FFFE 7FE9FEE8 E9FF56E9 20C48300 34E80E02 ..Ò4..á ÒV.ÒŠzÒ.z.v..v..v..v..v. 0001E0

Dump of file SATURN:[PCCOMMON.DUMP.DLL]BRDNOPL.TMP;1 on 18-APR-1990 10:37:32.99
File ID (520,34,0)   End of file block 272 / Allocated 272

Virtual block number 200 (000000C8), 512 (0200) bytes

 1E565700 0030C8CB C91F14C4 830894E8 0E0676FF 0876FF0A 76FF0C76 FF0E76FF .v..v..v..v..v..Ò...á..èùà0..WV. 000000
 01089A50 16E8468D 50520E56 890C4689 08578826 06478826 125EC408 8E03328B ¡2..Äá^.&.G.&.W..FÉ.VBRP.FÒ.P.Ä. 000020
 00DA8300 012DEA56 8BE8468B 00FE5683 01FC4683 08EBFC46 89FE4689 C02B0000 ..+à.Fz.F=Š..F=..Vz..FÒ.Võ-...Ö. 000040
 14563917 75124639 1056880E 46880102 E90377FC 4638087F 010CE903 7DFE563B ;Vz).Ö....;F=w.Ö...F..V.9F.u.9V. 000060
 FC76FFFE 76FFDC76 FFDE76FF 08E80275 FE563907 75FC4639 1C56881A 46881275 u..F..V.9F=u.9Vzu.Š¡.vB.vÉ.vz.v= 000080
 505200D2 83000105 FE5688FC 4688DC76 FFDE76FF 000005A8 9A5016E0 468D006A j..FÅ.P.´....vB.vÉ.F=.Vz....0.RP 0000A0
 E6563905 75E44639 06568804 46881075 011E7E83 00000220 9A501600 468D006A j..FÅ.P. ....-..u..Fà.V=9Fõu.9V¦ 0000C0
 F88BEC46 807675E2 56397875 E04639D2 5688D046 880086E9 0374001E 7E831974 t..-..t.Ö...FÅ.V09FÅu(9Vãuv.Fá.% 0000E0
 1E76FF1F A5A5A5A5 1F161ED0 768DF888 F446801F A5A5A5A5 1F161E07 16E0768D .vÅ.....ÉÉÉÉ..F¶.%.vÅ...ÉÉÉÉ..v. 000100
 74C00812 C483003F E80E0676 FF0876FF 1676FF18 76FF5016 EC468D50 16084680 .FÅ.P.Fá.P.v..v..v..v..Ò7..á..àt 000120
 76FF5016 EC4680FC 76FFFE76 FFD876FF DA76FF1E 76FF2076 FF2276FF 2476FF30 0.vŠ.v".v .v..vÒ.vÅ.vz.v=.Fá.P.v 000140
 01881E00 001AC8C8 .75F5E1F FED8E91C C4830092 E80E0A76 FF0C76FF 1276FF14 ..v..v..v..Ò...à.ÒÄz.^_èùà....¡. 000160
 FF9A5016 EC468050 16F4468D 5016E646 8D0E76FF 1076FF0A 76FF0C76 FFD88E05 ..Ä.v..v..v..v..F|.P.F¶.P.Fá.P.. 000180
 468BFFFF 02459A50 16E8468D 5016FC46 8D0676FF 0876FF50 7502E67E 830000FF ....-|.uP.v..v..F=.P.FÒ.P.E....F 0001A0
 8926FE56 88FC4688 125EC41F E8025789 26078926 EA5688E8 4688125E C426E816 .Š&á^..FÒ.Võ&..&.W.Š.á^..F=.Vz&. 0001C0
 CBC91F00 EBC02804 EB000188 00EB0174 000130E8 74C00808 EB00EB02 57892607 .&.W.Š.Š..àtÒ=..tìŠ.¡..Š.+àŠ..èù 0001E0

Dump of file SATURN:[PCCOMMON.DUMP.DLL]BRDNOPL.TMP;1 on 18-APR-1990 10:37:32.99
File ID (520,34,0)   End of file block 272 / Allocated 272

Virtual block number 201 (000000C9), 512 (0200) bytes

 77FF2602 5FC4260A 5EC40000 8646C700 000446C7 088E065F 881E5657 000056C8 ÅV..WV.¡_..ÄúFå..úFÅ..á^.&á .&.w 000000
 260477FF 26025FC4 260A5EC4 07300126 9A5016C4 468D5016 FC468D02 77FF2604 .&.w..F=.P.Fá.P.&.0.á^.&á _Ë.w.& 000020
 F4468D06 77FF2608 77FF260A 5EC4069C 02459A50 16C0468D 5016F846 800277FF .w..F%.P.Fà.P.E...á^.&.w.Ë.w..F¶ 000040
 46890C57 88260A47 88260A5E C41E7500 147E8324 7501127E 83000005 1E9A5016 .P......-..u$.-..u.á^.&.G.&.W..F 000060
 F44E8800 02830002 05145688 124688 3C E8000186 46C7AC56 89AA4689 D25689D0 Å.V0.F¯.V¯úFÅ..Š<.F..V.....0..N¶ 000080
 89D04689 10578826 0E478826 0A5EC41C 75D33820 75C13800 D88301E9 83F65E88 .^-.Ö..Ü.;èu ;Åu.á^.&.G.&.W..FÅ. 0000A0
 88468902 57882607 88260E5E C401F3E9 1A468800 018646C7 AC5689AA 46890256 V0.F´.V¯úFÅ...F.Öµ.á^.&..&.W..F¡ 0000C0
 890A5788 26084788 268E5689 8C468918 56131646 03065788 26044788 268A5689 .Vo&.G.&.W..F..V..F¥.V/&.G.&.W.. 0000E0
 E9037500 867E83E0 56890E46 89185613 1646030E 5788260C 4788260C 56890A46 FÖ.VÉ&.G.&.W..F..V..F0.VÅ.-Å.u.Ö 000100
 1816E09A C876FF52 5016E446 8DCA5689 C8468908 57882606 478826AA 5EC40098 ..á^´&.G.&.W..Fà.Vò.FÒ.PR.vå.Å.. 000120
 01F06E83 00EE5E83 01EC6E83 00EA5683 01E84683 00E65683 01E44683 08C48309 ..á..FÒ..V|..FÒ..Võ..nŠ..^¥..nÞ. 000140
 CC7E8300 0009529A 5016CC46 805016E4 468D5016 DA468D50 1688468D 00F25E83 .^..F¡.P.FÒ.P.FÒ.P.Fä.P.R....-ä 000160
 FF0001E2 46C705E8 0004E246 C70775C6 56390C75 C44639C2 5688C046 88387400 .t8.Fà.Vó9Fáu.9Vóu.úFã..Š.úFå... 000180
 1646880C E80001D4 46C78056 89AE4689 098700FC 9A505299 E24688C4 76FFC676 vó.vá.Fã.RP.=....FÙ.V¯úFå..Š..F. 0001A0
 89884689 18561316 46030257 88260788 260E5EC4 0108E980 5689AE46 89185688 .V..FÙ.V¯Ö..á^.&..&.W..F..V..F¡. 0001C0
 46891856 13164603 0A578826 08478826 8E56898C 46890657 88260447 88268A56 Vo&.G.&.W..F¥.V/&.G.&.W..F..V..F 0001E0
```

```
Dump of file SATURN:[PCCOMMON.DUMP.DLL]BRDNOPL.TMP;1 on 18-APR-1990 10:37:32.99
File ID (520,34,0)   End of file block 272 / Allocated 272

Virtual block number 202 (000000CA), 512 (0200) bytes

8B26AA5E C4009BE9 037500B6 7E83E056 89DE4689 0E578B26 0C478B26 DC5689DA Ö.VÉ&.G.&.W..FB.VÁ.-Ñ.u.Õ..á^`&. 000000
E4468308 C483FFFF 16E09AC8 76FF5250 16E4468D CA5689C8 46890857 8B260647 G.&.W..Fà.Vò.FÖ.PR.và.Á....á..FÖ 000020
B8468D00 F25E8301 F06E8300 EE5E8301 EC6E8300 EA568301 E8468300 E6568301 ..Vì..FÒ..Vò..nš..^Ÿ..nÞ..^·..F¡ 000040
8BF8468B 387400CC 7E830000 FFFF9A50 16CC468D 5016E446 8D50160A 46805016 .P.FÖ.P.FÒ.P.Fø.P......~ä.tß.F%. 000060
468BFC76 FFFE76FF 0001E246 C705E800 04E246C7 0775FE56 390C75FC 4639FA56 V*9F=u.9V±u.úFã..Š.úFã...v±.v=.F 000080
89AE4689 18568816 46880CE8 0001D446 C7B05689 AE4689FF FF00FC9A 505299E2 â.RP.=....FÜ.V¯úFå..Š..F..V..FÜ. 0000A0
C41D7414 46081246 8800EBFD FEE90375 00013DFE FFE90375 C00811EB 13EB8056 V¯Š.Š..âu.Õ.±=..u.Õ±»Š..F..F.t.á 0000C0
8B124688 0000FFFF 9A501688 4680006A 1276FF14 76FF0677 FF260877 FF260A5E ^.&.w.&.w..v..v.j..F¡.P......F.. 0000E0
260A5EC4 25740338 0475C138 00D88301 E983F65E 8BF44E8B 00D28300 01051456 V.....ø..N¶.^-.Õ..Ü.;èu.;£t%á^.& 000100
0009D89A 5016DA46 8D006A50 5200D283 00010514 56881246 8B0677FF 260877FF .w.&.w..F..V.....ø.RPj..FÖ.P.Ä.. 000120
DA768D08 7F8D1FA5 A5A5A51F 161EB876 8DFB8B0E 5EC40001 3847C726 0A5EC400 .á^.&úGB..á^..«.v¡...ÉÉÉÉ.....vÖ 000140
FFB45689 B24689D8 56890646 890C578B 260A478B 260A5EC4 1FA5A5A5 A51F161E ...ÉÉÉÉ.á^.&.G.&.W..Fø.VÁ.Fý.VÇ. 000160
12468B20 7414460B 12468B10 C4830202 E80E2076 FF501688 46805306 50521A76 v.RP.S.F¡.P.v .Òø..á..F..F.t .F. 000180
12468B43 75D33B47 75C13B00 D88301E9 83F65E8B F44E8B00 D2830001 05145688 .V.....ø..N¶.^-.Õ..Ü.¿èuG;£uC.F. 0001A0
FF1E76FF 2076FFAE 76FF8076 FF006A00 01CE46C7 05EB0000 CE46C707 7514460B .F.u.úFö..Š.úFö..j..v`.vÜ.v .v.. 0001C0
1CC48303 CCE80E06 76FF0876 FF0A76FF 0C76FFCE 76FF1A76 FF501688 46801C76 v..F¡.P.v..vö.v..v..v..v..Öä..á. 0001E0

Dump of file SATURN:[PCCOMMON.DUMP.DLL]BRDNOPL.TMP;1 on 18-APR-1990 10:37:32.99
File ID (520,34,0)   End of file block 272 / Allocated 272

Virtual block number 203 (000000CB), 512 (0200) bytes

5EC4AE76 FFB076FF 1A76FF1C 76FF1E76 FF2076FF AA76FFAC 76FF3074 00047E83 .~å.t0.v¯.v`.v .v..v..v..v¯.vÜá^ 000000
FF1C76FF 1E76FF20 76FF18C4 8308B6E8 0E0676FF 0876FF06 77FF2608 77FF26AA ¨&.w.&.w..v..v..ÒÑ..á..v .v..v.. 000020
C483F7EE E80E0676 FF0876FF 0A76FF0C 76FF0E76 FF1076FF 1276FF14 76FF1A76 v..v..v..v..v..v..v..v..v..ÒŸ%.á 000040
8B260A40 8B26065E C402E6C1 12768808 8E06E888 1E560000 32C8C8C9 5F5E1F18 ..^ èùâ2..v.¡Ò..Ä.v.èl.á^.&.ə.&. 000060
01C0E903 7F00013D E646890A 47B82602 5EC4D456 89D24689 EE5689EC 46890C50 P..Fã.VŸ.Fø.Vâá^ø&.G..F¦=....Òá. 000080
01F04683 08E8F046 89F24689 C02B0807 00F09A50 16E8468D 4877FF26 4A77FF26 &.wJ&.wH.FÒ.P.Þ.ø.+à.F·.FÞŠ..FÞ. 0000A0
26025EC4 0184E903 72F04639 087C018E E9037EF2 5639EA56 8BE84688 00F25683 .V·..FÒ.Võ9V·-.Õ..|.9FÞr.Õ..á^ø& 0000C0
067F8326 FC5EC404 1508689A 5016FC46 8D006AF0 76FFF276 FF4877FF 264A77FF .wJ&.wH.v·.vÞj..F•.P.k...á^•&... 0000E0
D0563907 75CE4639 08568806 46880056 89CE4689 02578B26 07882687 E8027400 .t.Šñ&..&.W..Fö.VÅ.F..V.9Föu.9VÅ 000100
5016F446 8D006A00 6A006A06 77FF2608 77FF26CE 5EC43875 00127E83 98EB0275 u.Š..~..uBá^ö&.w.&.w.j.j.j..F¶.P 000120
00000C5B 9A50160E 4680006A 016A006A 0677FF26 0877FF26 CE5EC400 000C3C9A .<...á^ö&.w.&.w.j.j.j..FB.P.[... 000140
C400000C 809A5016 F4468D00 6A0A76FF 0C76FF06 77FF2608 77FF26CE 5EC442EB ŠBá^ö&.w.&.w..v..v.j..F¶.P.....á 000160
9A50160E 4680006A 5052000A 83000120 0C56880A 46880677 FF260877 FF26CE5E ^ö&.w.&.w..F..V.·...Ö.RPj..FB.P. 000180
E05688DE 46884075 FA563945 75F84639 E45688E2 468800A5 E914468B 00000588 .....F.ÖÉ..Fã.Vö9F½uE9V*uə.FB.VÅ 0001A0
CE5EC40C 56890A46 89E45613 E2460306 57882604 4788260E 5EC4D856 89D64689 .Fø.VÄá^.&.G.&.W..Fã.Vö.FÖ.VÉá^ö 0001C0
880E4688 61EB0000 0D279A50 16064680 006A0A76 FF0C76FF 0677FF26 0877FF26 &.w.&.w..v..v.j..Fø.P.'...Šø.FB. 0001E0

Dump of file SATURN:[PCCOMMON.DUMP.DLL]BRDNOPL.TMP;1 on 18-APR-1990 10:37:32.99
File ID (520,34,0)   End of file block 272 / Allocated 272

Virtual block number 204 (000000CC), 512 (0200) bytes

89D64689 E056130E 46030257 88260788 260E5EC4 3F75F656 394475F4 4639E056 VÅ9F¶uD9V-u?á^.&..&.W..FB.VÅ.Fø. 000000
6A0A76FF 0C76FF06 77FF2608 77FF26CE 5EC40C56 890A4689 E45688E2 46880856 VÄ.Fã.VÒ.FÖ.VÉá^ö&.w.&.w..v..v.j 000020
FE5CE900 EBFF4FE9 03750001 3DA974C0 080EEB10 EB00000A 1D9A5016 06468D00 ..Fø.P.....Š.Š..ât`=..u.ÕO.Š.Õ\± 000040
8B260647 8B26105E C4014FE9 03750006 7E83088E 0B4DB81E 000028C8 CBC95E1F .^èùâ(...¡M..Ä.-..u.Õo.á^.&.G.&. 000060
C4F25689 F0468938 57882636 478826E0 5EC4E256 89E04689 F65689F4 46890857 W..F¶.V-.FÅ.Vãá^Å&.Gó&.WB.FÞ.V·á 000080
57882606 478826FC 5EC4FE56 89FC4689 E65689E4 46891057 88260E47 88260C5E ^.&.G.&.W..FÖ.Vl.F=.V±á^=&.G.&.W 0000A0
4639EA56 89E84689 38578826 36478826 D85EC40A 56890846 89EE5689 EC468908 ..F&.VŸ.FÅ.VÒá^Å&.Gó&.WB.FÒ.Võ9F 0000C0
C406578B 2604478B 26085EC4 00C4E914 46880008 E90374F2 563900E0 E90374F0 Þt.ÕÅ.9V·t.ÕÅ..F.Õá.á^.&.G.&.W.á 0000E0
8D0277FF 260477FF 26025FC4 26E05EC4 44732247 3926067C 4C7F2457 3926F05E ^Þ&9W$.L|.&9G"sDá^Å&á .&.w.&.w.. 000100
C40E5613 DC460306 57882604 47882608 5EC40E6D 02459A50 16DC468D 5016F846 F%.P.FÉ.P.E.m.á^.&.G.Ī.W..FÉ.VBá 000120
02578826 07882608 5EC470EB 00010096 87C726F0 5EC42457 89262247 8926F05E ^Þ&.G"&.W$á^Þ&ú.....Špá^.&..&.W. 000140
0277FF26 0477FF26 025FC426 E05EC443 731E4739 26067C48 7F205739 26F05EC4 á^Þ&9W .K|.&9G.sCá^Å&á_.&.w.&.w. 000160
C4FA5613 F8460302 57882607 8826085E C4071202 459A5016 DC468D50 16F8468D .F%.P.FÉ.P.E...á^.&..&¯W..F%.V*á 000180
7500013D 9A74C008 0EEB10EB 00010096 87C726F0 5EC42057 89261E47 8926F05E ^Þ&.G.&.W á^Þ&ú.....Š.Š..ât.=..u 0001A0
C402E6C1 0E768800 00F646C7 D88E004A 881E5600 0022C8C8 C91F00EB FF30E903 .Õ0.Š..èùâ"..V.¡J..ÄúF~...v.èl.á 0001C0
57882606 478826E6 5EC4E856 89E64689 FA5689F8 46890C50 8B260A40 8B260A5E ^.&.ə.&.P..F%.V*.Fl.VÒá^l&.G.&.W 0001E0
```

```
Dump of file SATURN:[PCCOMMON.DUMP.DLL]BRDNOPL.TMP;1 on 18-APR-1990 10:37:32.99
File ID (520,34,0)   End of file block 272 / Allocated 272

Virtual block number 205 (000000CD), 512 (0200) bytes

 5EC41A75 08467F83 26077404 467F8326 E65EC400 CDE91046 88F45689 F2468908 ..F·.V¶.F.Õë.á^|&..F.t.&..F.u.á^ 000000
 46883374 00207E83 06751C57 39260C75 1A473926 E65EC406 57882604 47882612 .&.G.&.W.á^|&9G.u.&9W.u..- .t3.F 000020
 1C578826 1A478826 E056890E 46891857 88261647 8826F056 89EE4689 1E56881C ..V..FY.VÞ&.G.&.W..Fã.VÅ&.G.&.W. 000040
 7F832607 7401467F 8326E65E C475E800 01F646C7 E45689E2 46891E56 131C4603 .F..V..Fã.VõúF-..Šuá^|&..F.t.&.. 000060
 207E8306 75185739 260C7516 473926E6 5EC40257 88260788 26125EC4 19750246 F.u.á^.&..&.W.á^|&9G.u.&9W.u..-  000080
 DE46891E 56131C46 03185788 26164788 26EC5689 EA46891E 56881C46 88337400 .t3.F..V..Fõ.V&&.G.&.W..F..V..F8 0000A0
 01309574 C0080EE8 1UE80001 F646C7E4 5689E246 891C5788 261A4788 26E05689 .VÅ&.G.&.W..Fã.VõúF-..Š.Š..åt.=. 0000C0
 EA468D0E 76FF1076 FF1E7500 0E7E8300 82E90375 00F67E83 00E8FF27 E9037500 .u.Õ'.Š..—.u.Õý..-..u..v..v..Fõ 0000E0
 0677FF26 0877FF26 0A5EC438 E810C483 F856E80E 0A76FF0C 76FF016A 006A5016 .Pj.j..v..v..ÕV«.á.Š;á^.&.w.&.w. 000100
 0A830001 20FE5688 FC468850 16EA468D 0E76FF10 76FF0000 07439A50 16FC4680 .F=.P.C....v..v..Fõ.P.F=.V±-...Õ 000120
 9AE676FF E876FF50 160E468D 006A006A 10C483F8 19E80E0A 76FF0C76 FF505200 .RP.v..v..Õ.=.á.j.j..F8.P.vÕ.vl. 000140
 83FFFF00 009A5052 F45689F2 46890857 88260647 8826E65E C40CC483 FFFF0887 .....á.á^|&.G.&.W..F·.V¶RP...... 000160
 0BF3E80E 0676FF08 76FFF276 FFF476FF 1076FF16 76FF1876 FF1A76FF 006A04C4 á.j..v..v..v..v..v¶.v·.v..v..Õµ. 000180
 9000F09A 5016F046 800676FF 0876FFD8 8E0E8088 1E000018 C8C8C95E 1F12C483 .á..^èùà....|¯..Å.v..v..FÞ.P.Þ.. 0001A0
 99E9037E F65639F2 5688F046 8800F656 8301F446 8308E8F4 4689F646 89C02808 .+à.F-.F¶Š..F¶..V-..FÞ.V·9V--.Õ. 0001C0
 689A5016 FC468D00 6AF476FF F676FF06 76FF0876 FF008FE9 0372F446 39087C00 .|.9F¶r.Õ...v..v..v-.v¶j..F=.P.k 0001E0

Dump of file SATURN:[PCCOMMON.DUMP.DLL]BRDNOPL.TMP;1 on 18-APR-1990 10:37:32.99
File ID (520,34,0)   End of file block 272 / Allocated 272

Virtual block number 206 (000000CE), 512 (0200) bytes

 EA5689E8 46890C57 88260A47 88260A5E C4EE5689 EC4689FE 5688FC46 88109F08 ....F=.V±.F&.VYá^.&.G.&.W..FÕ.Võ 000000
 76FFEE76 FF53060E 76FF1076 FF5016F8 468D1276 FF1876FF E84689EA 4689C028 +à.Fõ.FÕ.v..v..F%.P.v..v..Š.vY.v 000020
 76FF1276 FF1476FF 1676FF18 76FFE876 FFEA76FF 2874C008 14C48300 38E80EEC &.Õ8..á..åt+.võ.vÕ.v..v..v..v..v 000040
 003CC8C8 C91FFF51 E918C483 0575E80E 0676FF08 76FFEC76 FFEE76FF F876FFFA °.v%.vY.v&.v..v..Õu..á.ÕQ..èùà<. 000060
 08051FA5 A5A5A5DA 8E1E0716 F088F87E 80105688 0E468808 8E1080B8 1E565700 .WV.¡...Ä.F..V..-%.Þ....ÕEEEE... 000080
 C483081F 16E09A06 76FF0876 FF5016D2 468D1FA5 A5A5A5DA 8E1EF088 C47E8D00 ..~á.Þ..ÕEEEE..F0.P.v..v..Å....á 0000A0
 52501602 468D5016 E4468DCE 5689CC46 89005E05 04578826 02478826 065EC408 .á^.&.G.&.W..^..Fä.Vö.Fõ.P.F0.PR 0000C0
 01EC6E83 00EA5683 01E84683 00E65683 01E44683 10C48302 7EE80E53 06CC76FF .vä.S.Õ~..á..Fõ..Vl..FÕ..Võ..nå. 0000E0
 50160046 805016E4 468D5016 C4468D50 16F8468D 00F25E83 01F06E83 00EE5E83 .^Y..nÞ..^·..F%.P.Fá.P.Fõ.P.FÅ.P 000100
 0E0A76FF 0C76FF06 76FF0876 FF1876FF 0122E9C0 28057500 D07E8300 0008599A .Y....-Å.u.+åÕ"..v..v..v..v..v.. 000120
 0C76FF0E 76FF1076 FF5016E4 468D1676 FF0103E9 C0280574 C0080AC4 830326E8 Õ&..á..åt.+åÕ...v..Fõ.P.v..v..v. 000140
 56050457 88260247 8826065E C400DFE9 C0280574 C0080EC4 8300F0E8 0E0A76FF .v..ÕÞ..á..åt.+åÕÕ.á^.&.G.&.W..V 000160
 E9C02805 74FE5639 0575FC46 39CA5688 C8468800 82E91646 88F65689 F4468900 ..F¶.V-.F.Õý..Fà.Vö9F=u.9V±t.+åÕ 000180
 04E246C7 07750657 3926^075 04473926 F45EC406 57882604 478826CC 5EC40080 ¯.á^a&.G.&.W.á^¶&9G.u.&9W.u.úFã. 0001A0
 8926125E C4130F00 FC9A0477 FF260677 FF265052 99E24688 0001E246 C70<FB00 .Š.úFã...Fã.RP&.w.&.w..=...á^.&. 0001C0
 8826CC5E C457E8C0 280474FA 56390575 F84639C6 5688C446 8866E802 5789< 07 .&.W.Šf.Fá.Vö9F%u.9V°t.+åŠWá^a&. 0001E0

Dump of file SATURN:[PCCOMMON.DUMP.DLL]BRDNOPL.TMP;1 on 18-APR-1990 10:37:32.99
File ID (520,34,0)   End of file block 272 / Allocated 272

Virtual block number 207 (000000CF), 512 (0200) bytes

 880001E2 46C705E8 0004E246 C7077502 5739260D 75073926 F45EC402 57882607 .&.W.á^¶&9.u.&9W.u.úFã..Š.úFã... 000000
 080EE810 E8025789 26078926 125EC408 8E00FC9A 37FF2602 77FF2650 5299E246 Fã.RP&.w.&.7.=...á^.&..&.W.Š.Š.. 000020
 1165881E 5600001C C8C8C95F 5E1F00E8 00018800 E8FF42E9 03750001 30A474C0 åt£=..u.Õ8.Š.¡..Š..^_èùà...V.|e. 000040
 02E6C1EE 768800E5 E9037C02 EE7E83EE 46FF03E8 0000EE46 C70000E8 46C7D88E .ÄúFÕ..úFY..Š..FY.-Y¯|.Õl..vYèl. 000060
 76FF0C76 FF04C483 104200FE 9A5052E6 5689E446 890C5088 260A4088 26065EC4 á^.&.a.&.P..Fõ.V|RP.±.8..á..v..v 000080
 0000FFFF 9A5016F0 468D5016 F8468D50 16EA468D 50520036 05E65688 E446880A ..Fõ.Vl.6.RP.Fõ.P.F%.P.FÞ.P..... 0000A0
 88260C47 88261975 06573926 1F750447 3926FE56 88FC4688 0A5EC460 E8124688 .F.Š'á^..F=.V±&9G.u.&9W.u.&.G.&. 0000C0
 3926FA56 88F84688 0A5EC438 E80001E8 46C70575 06573926 08750447 39260E57 W.&9G.u.&9W.u.úFÕ..Š;á^..F%.V°&9 0000E0
 01E846C7 05750A57 39260875 08473926 02578826 07882618 75025739 261E7507 .u.&9W.u.&..&.W.&9G.u.&9W.u.úFÕ. 000100
 88E44688 0E76FF10 76FF2674 00E87E83 00E89774 00013DCC 74C00808 E80DE800 .Š.Š..åtä=..t.Š..-Õ.t&.v..v..Fõ. 000120
 28FF0FE9 07E80001 88057400 EC7E8300 00FFFF9A 5016EC46 80505200 3605E656 Vl.6.RP.F&.P......-&.t.¡..Š.Õ..+ 000140
 F088F888 1056880E 4688125E C4D88E13 3E881E56 57000002 C8C8C95E 1F00E8C0 åŠ..^èùà...WV.|>..Äá^..F..V..«.Þ 000160
 C1FE7688 00C8E903 7C04FE7E 83FE46FF 03E80000 FE46C71F A5F20008 890A8E1E ..Õ¿..·E.úF±..Š..F±.~±.|.Õà..v±è 000180
 C4008AE9 FE468800 A8E90374 FF487883 260082E9 0374FF46 78832606 5EC402E6 |.á^.&.xF.t.Õý.&.xH.t.Õ¨..F±Õ..á 0001A0
 06578926 04478926 125EC406 57182604 4728260A 5EC40657 88260447 88260E5E ^.&.G.&.W.á^.&+G.&.W.á^.&.G.&.W. 0001C0
 260C4789 26125EC4 06571326 04470326 0A5EC40E 5788260C 4788260E 5EC47FE8 Š.á^.&.G.&.W.á^.&.G.&.W.á^.&.G.& 0001E0
```

Dump of file SATURN:[PCCOMMON.DUMP.DLL]BRDNOPL.TMP;1 on 18-APR-1990 10:37:32.99
File ID (520,34,0) End of file block 272 / Allocated 272

Virtual block number 208 (00000000), 512 (0200) bytes

```
26078926 125EC402 571B2607 2B260A5E C40257B8 26078826 0E5EC45C EB0E5789 .W.Š\á^.&..&.W.á^.&+.&.W.á^.&..& 000000
47892612 5EC40257 13260703 260A5EC4 0A578826 08478826 0E5EC43C EB025789 .W.Š<á^.&.G.&.W.á^.&..&.W.á^.&.G 000020
EBC67400 0330AB¯4 00023080 7400013D FF6FE903 75C00818 EB1AEB0A 57892608 .&.W.Š.Š..àu.Õo.=..t.=..t¨=..tóŠ 000040
0A478826 065EC47D 74000E7E 83D88E14 4F881E00 0026C8CB C95F5E1F FF2CE900 .Õ,..^_èùà&...¡O..Ä.-..t)á^.&.G. 000060
5689EC46 89085788 26064788 26DA5EC4 DC5689DA 4689EA56 89E84689 0C578826 &.W..FÕ.VÕ.FÖ.VÉá^Ö&.G.&.W..F&.V 000080
89DE4689 38578826 36478826 0A5EC401 35E90001 8806750C 56390875 0A4639EE Ÿ9F.u.9V.u.¡..Õ5.á^.&.G6&.W8.F8. 0000A0
0106E900 01880675 0C563908 750A4639 E05688DE 46882974 E04608DE 4688E056 VÄ.F8.FÄt).F8.VÄ9F.u.9V.u.¡..Õ.. 0000C0
5788260A 47882606 5EC400EC E9CFEBE0 5689DE46 89385788 26364788 26DE5EC4 á^8&.G6&.W8.F8.VÄŠüÕ&.á^.&.G.&.W 0000E0
56890A46 89EA5688 EB4688E6 5689E446 89105788 260E4788 26EA5689 E846890C ..FÒ.VÕ&.G.&.W..FÕ.VÌ.FÒ.VÕ.FÖ.V 000100
5EC4EE56 89EC4689 08578826 06478826 DA5EC4FA 5689F846 89E65688 E44688DC É.FÕ.VÌ.F%.V*á^Ö&.G.&.W..F&.VŸá^ 000120
F65689F4 46893857 88263647 8826EC5E C4FE5689 FC468908 57882606 478826F8 %&.G.&.W..F=.V±á^&&.G6&.W8.F¶.V~ 000140
E05689DE 4689FE56 88FC4688 E246FF20 EB0000E2 46C7E056 89DE4689 C28CC388 .û.ò.F8.VÄúFã..Š .Fã.F=.V±.F8.VÄ 000160
36478826 F45EC411 EB4B7D02 E27E83F6 5689F446 89385788 26364788 26FC5EC4 á^=&.G6&.W8.F¶.V-.-ö.)KŠ.á^¶&.G6 000180
F0468938 57882636 478826DE 5EC42E74 F64608F4 4688F656 89F44689 38578826 &.W8.F¶.V-.F¶.F-t.á^8&.G6&.W8.FÞ 0001A0
B9EBE056 89DE4689 F25688F0 46881468 0001B805 750C5639 0A750A46 39F25689 .V·9F.u.9V.u.¡..Š..FÞ.V·.F8.VÄŠ¿ 0001C0
5689F846 890C5688 0A4688D8 8E154F88 1E565700 002CC8C8 C91F00E8 C0288FEB Š.+àŠ..èùà,..WV.¡O..Ä.F..V..F%.V 0001E0
```

Dump of file SATURN:[PCCOMMON.DUMP.DLL]BRDNOPL.TMP;1 on 18-APR-1990 10:37:32.99
File ID (520,34,0) End of file block 272 / Allocated 272

Virtual block number 209 (00000001), 512 (0200) bytes

```
47892606 47892604 5EC40789 26024789 26C02804 5EC40656 89044689 006E05FA *.n..Fà.V®á^à+à&.G.&..á^à&.G.&.G 000000
880E4688 D45EC41F EB655789 26044789 26105688 0E468804 5EC427EB 12468804 ..F.Š'á^à.F..V.&.G.&.W.Š.á^à.F.. 000020
009487C7 260A5EC4 00EBD074 000130E8 74C00808 EB0DE802 57892607 8S.´1056 V.&..&.W.Š.Š..àtÒ=..tÄŠ.á^.&ú... 000040
C3880A5E C41FA5F2 000889DA 8E1E0716 F088DC7E 8D000605 0C56880A 4686 001 ...F..V.....-É.Þ....Ö¿..·É.á^..û 000060
04329AF8 76FFFA76 FF1476FF 1676FF1F A5F20008 890A8E1E F088067F 8D001605 .......Þ..Ö¿..·É..v..v..v*.v%.2. 000080
C40CC483 119C0E79 9A0A76FF 0C76FF06 76FF0876 FF1476FF 1676FF08 C483179A ...á..v..v..v..v..v..v..y....á.á 0000A0
1A76FF1C 76FF1476 FF1676FF 1876FF1F A5F20008 891F161E 0C768006 7F800A5E ^.....vÉ...¿..·É..v..v..v..v..v. 0000C0
76FF006A 18C48300 E4E80E06 76FF0876 FF0A76FF 0C76FF0E 76FF1076 FF1276FF .v..v..v..v..v..v..v..ÒÕ..á.j..v 0000E0
0A5EC412 C4830479 E80E0676 FF0876FF 0A76FF0C 76FF1276 FF1476FF 1676FF18 ..v..v..v..v..v..v..v..Òy..á.á^. 000100
1676FF18 76FF006A 20740018 7E83FE56 89FC4689 0A578826 08478826 025FC426 &á_.&.G.&.W..F=.V±.-..t j..v..v. 000120
468DFC76 FFFE76FF D080E912 C4830441 E80E5052 0A76FF0C 76FF1276 FF1476FF .v..v..v..v.RP.ÒA..á.Õ...v±.v=.F 000140
EE5688EC 468800F2 568301F0 468308E8 F04689F2 4689C028 188200F0 9A5016EC &.P.Þ...+à.F·.FÞŠ..FÞ..V·..F&.VŸ 000160
9A5016F4 468D006A F076FFF2 76FFFC76 FFFE76FF 4C73F046 39057C53 7FF25639 9V·.S|.9FÞsL.v±.v=.v·.vÞj..F¶.P. 000180
76FF1276 FF1476FF 1676FF18 76FF006A DA5689D8 4689F656 88F44688 10E10868 k.Ä..F¶.V-.FÄ.VÖj..v..v..v..v..v 0001A0
0022C8CB C95F5E1F 9AE812C4 8303C0E8 0E3E77FF 264077FF 26085EC4 0A76FF0C ..v.á^Ä&.wÕ&.w>.Òà..á.Š..^_èùà". 0001C0
4689C028 192100F0 9A5016E8 46804277 FF264477 FF260A5E C4088E16 D1881E00 ..¡!..Äá^.&.wÕ&.wB.FÒ.P.Þ.T.+à.F 0001E0
```

Dump of file SATURN:[PCCOMMON.DUMP.DLL]BRDNOPL.TMP;1 on 18-APR-1990 10:37:32.99
File ID (520,34,0) End of file block 272 / Allocated 272

Virtual block number 210 (00000002), 512 (0200) bytes

```
4639087C 00E8E903 7EEE5639 EA5688E8 468800EE 568301EC 468308E8 EC4689EE Ÿ.F&Š..F&..VŸ..FÒ.VÕ9VŸ-.ÕŠ.|.9F 000000
689A5016 F8468D00 6AEC76FF EE76FF42 77FF2644 77FF260A 5EC400E1 E90372EC &r.ÕÄ.á^.&.wÕ&.w8.vŸ.v&j..F%.P.k 000020
EB0275E4 56390775 E2463916 56881446 88E45689 E24689FA 5688F846 88195408 .T..F%.V*.Fã.VÕ.F..V.9Fãu.9VÕu.Š 000040
08EBF446 89F64689 C0281995 00F09A50 16F04680 4877FF26 4A77FF26 E25EC4A5 Eá^ã&.wJ&.wH.FÞ.P.Þ...+à.F-.F¶Š. 000060
77FF26E2 5EC46A73 F4463905 7C717FF6 5639F256 88F04688 00F65683 01F44683 .F¶..V-..FÞ.V·9V-.q|.9F¶sjá^ã&.w 000080
7400067F 8326FC5E C4184608 689A5016 FC468000 6AF476FF F676FF48 77FF264A J&.wH.v-.v¶j..F=.P.k.F.á^=&....t 0000A0
1A76FF12 76FF1C76 FFE64689 04478826 E05689DE 46890257 88260788 268DEB02 .Š§&..&.W..F8.VÄ&.G..F|.v..v..v. 0000C0
C483000C E80E0676 FF0876FF E276FFE4 76FFDE76 FF52500E 76FF1076 FF1876FF .v..v..v.PR.v8.vÕ.vã.v..v..Õ...á 0000E0
FF260E5E C40000E4 46C7088E 18C3881E 56570000 44C8C8C9 1FFEFFE9 FF7CE91A .Õ|.Õ.±.èùàD..WV.¡û..ÄúFÕ..á^.&. 000100
FF260877 FF260E5E C400001A 2F9A5016 F0468012 76FF006A 006A0677 FF260877 w.&.w.j.j..v..FÞ.P./...á^.&.w.&. 000120
DC46890E 4689C028 7AEB1C46 8800001B 829A5016 D4468012 76FF016A 006A0677 w.j.j..v..Fà.P.ý....F.Šz+à.F8.FÉ 000140
D8468815 7502467F 83260774 01467F83 260A5EC4 E25689E0 46891656 8814468B .F..V..FÄ.Vãá^.&..F.t.&..F.u..FÄ 000160
DE5689DC 46891656 88144688 4CE80001 E446C705 74F65639 0575F446 390A5688 .VÕ9F¶u.9V-t.úFÕ..ŠL.F..V..FÉ.V8 000180
39D65688 D4468815 7508467F 83260774 04467F83 260A5EC4 E04689E2 4689C028 +à.Fã.FÄá^.&..F.t.&..F.u..Fà.V®9 0001A0
00E8FF7A E9037500 01308E74 C0080EE8 10E80001 E446C705 74F25639 0575F046 FÞu.9V·t.úFÕ..Š.Š...àt/=..u.Õz.Š. 0001C0
4689E256 13E04603 DA568808 4688CE56 89CC4689 DE5613DC 46030656 88D44688 .Fà.V®.FÉ.V8.Fã.VÕ.FÄ.VÖ.FÄ.Vã.F 0001E0
```

Dump of file SATURN:[PCCOMMON.DUMP.DLL]BRDNOPL.TMP;1 on 18-APR-1990 .':37:32.99
File ID (520,34,0)   End of file block 272 / Allocated 272

Virtual block number 211 (00000003), 512 (0200) bytes

```
46C72CEB 12468800 0010069A 5016F846 8D0677FF 260877FF 260E5EC4 D2568900 Å.V8á^.&.w.&.w..F%.P......F.$,úF 000000
000A8300 032DFA56 88F84688 0001E646 C726EB00 00FE46C7 0001FC46 C70000E6 |..úF=..úF±..$&úF|...F%.V*-...Ö. 000020
F87E8306 7C3A7F00 FA7E8300 EBDC7400 01300074 C00808EB 0DE8FE56 89FC4689 .F=.V±Š.Š..âtÅ=..t€Š..-*..:|..-% 000040
FFE676FF 1C76FF50 16CC4680 1876FF1A 76FF1E76 FF1476FF 1676FF01 6A327703 .w2j..v..v..v..v..v..Fä.P.v..v|. 000060
0677FF26 0877FF26 0E5EC400 F9E91CC4 83F33AE8 0E0676FF 0876FF0E 76FF1076 v..v..v..v..Ö:µ.á.Ö*.á^.&.w.&.w. 000080
77FF260E 5EC400D4 E9037500 E47E8300 001BE69A 5016CC46 8D1276FF 016A006A j.j..v..Fä.P.|....-ð.u.Ö&.á^.&.w 0000A0
11E84601 DE5688DC 46880000 0C219A50 16E8468D 1276FF02 6A006A06 77FF2608 .&.w.j.j..v..FÒ.P.|....FÉ.V8.FÒ. 0000C0
1276FF02 6A006A06 77FF2608 77FF260E 5EC4EE56 11EC4601 E25688E0 4688EA56 Vô.FÁ.Vã.Fš.VŸá^.&.w.&.w.j.j..v. 0000E0
A5A5A5A5 1F161E07 16CC7680 F888BC46 8D4AEB12 46880000 0CD69A50 16E84680 .FÒ.P.ø....F.$J.F¥.%.vä.....EEEE 000100
1F161E07 16E87680 F888BC46 8D31EB1F A5A5A5A5 1F161EE8 768DF888 C4468D1F ..Fá.%.vÒ...EEEE.$1.F¥.%.vÒ..... 000120
00013082 74C00808 EB0DEB1F A5A5A5A5 1F161ECC 768DF888 C4468D1F A5A5A5A5 EEEE..Fá.%.vä...EEEE.$.$..âtý=.. 000140
76FF1076 FF50168C 468DFC76 FFFE76FF 1C76FF18 76FF1A76 FF1E76FF 00EBD174 t|Š..v..v..v..v..v±.v=.F¥.P.v..v 000160
0876FFD8 8E19F2B8 1E000034 C8C8C95F 5E1F18C4 83E6C1E8 0E0676FF 0876FF0E ..v..v..Òè|.á..^_èüå4...|..Ä.v. 000180
8800F656 8301F446 8308E8F4 4689F646 89C02B1C CD00F09A 5016EC46 8D0676FF .v..Fš.P.Þ.ë.+á.F-.F¶$..F¶..V-.. 0001A0
F676FF06 76FF0876 FF0160E9 0372F446 39087C01 6AE9037E F65639EE 5688EC46 Fš.VŸ9V--.Öj.|.9F¶r.Ö'..v..v..v- 0001C0
56890846 89065689 D44689FE 5688FC46 881CF408 689A5016 FC468000 6AF476FF .v¶j..F=.P.k.¶..F=.V±.Fš.Vø.FÁ.V 0001E0
```

Dump of file SATURN:[PCCOMMON.DUMP.DLL]BRDNOPL.TMP;1 on 18-APR-1990 10:37:32.99
File ID (520,34,0)   End of file block 272 / Allocated 272

Virtual block number 212 (00000004), 512 (0200) bytes

```
08E8E046 89E24689 C02B18DA 00F09A50 160C468D 4277FF26 4477FF26 D85EC4DA Öá^Å&.wD&.wB.FÉ.P.Þ.Ö.+á.Fã.FÁŠ. 000000
00F4E903 72E04639 087C00FE E9037EE2 56390E56 88DC4688 00E25683 01E04683 .FÁ..Vã..FÉ.V89Vã-.Ö±.|.9FÁr.Ö¶. 000020
E8468810 5C08689A 5016E846 8D006AE0 76FFE276 FF4277FF 264477FF 26D85EC4 á^Å&.wD&.wB.vã.vÅj..FÒ.P.k.\..FÒ 000040
C02B10A3 00F09A50 16E4468D 4877FF26 4A77FF26 D05EC4D2 56890046 89EA5688 .Vô.FÁ.V8á^Å&.wJ&.wH.FÒ.P.Þ.È.+á 000060
087C0093 E9037EF2 5639E656 88E44688 00F25683 01F04683 08E8F046 89F24689 .F·.FÞŠ..FÞ..V·..Fð.V|9V·-.Ö..|. 000080
5016F846 8D006AF0 76FFF276 FF4877FF 264A77FF 26D05EC4 0089E903 72F04639 9FÞr.Ö..á^Å&.wJ&.wH.v·.vÞj..F%.P 0000A0
067F8326 F85EC40C E8B1EB02 7502067F 8326F85E C40E7400 167E831C 88086B9A .k....~..t.á^Y&....u.ŠYŠ.á^Y&... 0000C0
3926EA56 88E84688 CC5EC4CE 5689CC46 89025788 26078826 F85EC4A3 E8027400 .t.ŠEá^Y&..&.W..Fã.Vöá^ä.FÒ.Vö&9 0000E0
060A76FF 0C76FF0E 76FF1076 FF1276FF 1476FF16 76FF2475 0C573926 2A750A47 G.u*&9W.u$.v..v..v..v..v..v..v.. 000100
56570000 34C8C8C9 1FFE80E9 FEECE9FF 57E916C4 83000FE8 0E0676FF 0876FF53 S.v..v..Ö...á.ÖW.Ö&±Ö.±.èüå4..WV 000120
46805052 F45689F2 46890857 88260647 88260A5E C400000C 46C7088E 1C79881E .|Y..ÄúFÉ..á^.&.G.&.W..F·.V¶RP.F 000140
F85688F6 468800FE 568301FC 468308E8 FC4689FE 4689C028 00001AF5 9A5016F6 -.P.%...+ä.F±.F=Š..F=..V±..F-.V% 000160
76FFF276 FFF476FF 012EE903 77FC4638 087F0138 E9037DFE 5638000A 83000120 -...Ö.;V±).Ö8...;F=w.Ö...v¶.v·.v 000180
83000105 FE5688FC 4688F276 FFF476FF 00001EAC 9A5016EA 468D006A FC76FFFE ±.v=j..Fõ.P.¯....v¶.v·.F=.V±.... 0001A0
880E4688 58740012 7E835E74 01127E83 00001A13 9A50160E 468D006A 50520002 ø.RPj..F8.P......~..t^.~..tX.F8. 0001C0
E8FF73E9 0575F056 390A75EE 4639E456 88E24688 1575EC56 391A75EA 4639E056 VÁ9Fôu.9Všu..Fã.V89FŸu.9VÞu.Ös.$ 0001E0
```

Dump of file SATURN:[PCCOMMON.DUMP.DLL]BRDNOPL.TMP;1 on 18-APR-1990 10:37:32.99
File ID (520,34,0)   End of file block 272 / Allocated 272

Virtual block number 213 (00000005), 512 (0200) bytes

```
4639E456 88E24688 1AEB0000 FA46C707 75EC5639 0C75EA46 39E05688 DE468831 1.F8.VÁ9Fôu.9Všu.úF*..Š..Fã.V89F 000000
80F888CC 468DFA46 89124688 06E8FF40 E903EB00 01FA46C7 0775F056 390C75EE Ÿu.9VÞu.úF*..Š.ða.Š..F..F*.Fã.%. 000020
8D1A76FF 1FA5A5A5 A51F161E DE768DF8 88D4468D 1FA5A5A5 A51F161E 0716EA76 vò.....EEEE..Fã.%.v8....EEEE..v.. 000040
0E76FF10 76FF0A76 FF0C76FF 5016CC46 8D5016E6 468DFA76 FF1876FF 5016DC46 FÈ.P.v..v*.F|.P.Fã.P.v..v..v..v 000060
FE76FFE6 76FFE876 *FFA76FF 1476FF16 76FF1876 FF3074C0 0B1AC483 0047E80E .ðG..á..âtO.v..v..v..v*.vð.v|.v± 000080
74000C7E 831CC483 748E80E 0676FF08 76FF0A76 FF0C76FF 5016CC46 8DFC76FF .v».Fã.P.v..v..v..v..ÔHÖ.á..-É.t 0000A0
F87E8010 56880E46 88D88E1E 22881E56 57000036 C8C8C95F 5E1FFEAC E903EB02 .Š.Ô"±.^ èüå6..WV.|"..Ä.F..V..-% 0000C0
16D84680 1FA5A5A5 A5DA8E1E F08BCA7E 8D000805 1FA5A5A5 A5DA8E1E 0716F08B .Þ....ÖEÉÉÉ......~ö.Þ..ÖEÉÉÉ..FÁ. 0000E0
D4468900 5E050457 88260247 8826065E C408C483 178016E0 9A0676FF 0876FF50 P.v..v..Å....á.á^.&.G.&.W..^..Fã 000100
568301E8 468310C4 83F430E8 0E530604 76FF5250 16D84680 5016E846 8DD65689 .Vø.FÒ.P.FÃ.PR.vã.S.ÖO¶.á..FÒ..V 000120
8D5016F8 468D00F6 5E8301F4 6E8300F2 5E8301F0 6E8300EC 568301EC 468300EA ô..Fš..VŸ..nÞ..^..n¶..^~..F%.P. 000140
C41F7400 D27E8325 74001E7E 83000012 019A5016 D2468D50 16E8468D 5016CA46 Fò.P.Fò.P.F8.P.......~..tX.-ø.t.á 000160
7E8300F2 E9C02B00 0107C726 1A5EC400 013847C7 260A5EC4 00013647 C7260A5E ^.&üG6..á^.&üG8..á^.&ü...+àÕ..- 000180
0B0AC483 F4ADE80E 0A76FF0C 76FF0676 FF0876FF 1876FF00 E7E9C02B 05750002 ë.u.+àÕÖ..v..v..v..v..v..ÔüÑ.á.. 0001A0
F277E80E 0A76FF0C 76FF0E76 FF1076FF 5016E846 8D1676FF 00C8E9C0 2B0574C0 Ät.+àÕà..v..FÒ.P.v..v..v..v..Ðw 0001C0
B6568904 4689005E 05045788 26024788 26065EC4 00A4E9C0 2B0574C0 0B0EC483 .á..ât.+àÕÉ.á^.&.G.&.W..^..Fã.V» 0001E0
```

```
Dump of file SATURN:[PCCOMMON.DUMP.DLL]BRDNOPL.TMP;1 on 18-APR-1990 10:37:32.99
File ID (520,34,0)   End of file block 272 / Allocated 272

Virtual block number 214 (00000006), 512 (0200) bytes

 0447B826 D45EC477 EBC02B04 74FE5639 0575FC46 39005688 CE468878 EB164688 .F.Šx.Fö.VÄ9F=u.9V±t.+åŠwá^Å&.G. 000000
 EB025789 26078926 125EC4E6 5613E446 03065718 2604472B 260E5EC4 06578826 &.W.á^.&+G.&.W..FÖ.V|á^.&..&.W.Š 000020
 C4025788 26078826 045EC438 EBC02B04 74FA5639 0575F846 39CC5688 CA46884A J.Fö.Va9F%u.9V*t.+åŠ;á^å&..&.W.á 000040
 74C0080E EB10EB02 57892607 8926125E C4E25613 E0460302 571B2607 28260E5E ^.&+.&.W..FÅ.Vãá^.&..&.W.Š.Š..åt 000060
 00000004 13760002 000E90C8 C95F5E1F 00EB0001 B800EBFF 7CE90375 00013DC0 å=..u.Õ|.Š.¡..Š..^_èù.....v..... 000080
 00000010 0E0C0002 00000008 105D0002 008A0004 18B00203 00000009 1FEA0002 ..õ................Ĩ............ 0000A0
 00000017 12B90002 00000014 1D3B0002 01AC0004 204F0203 00AB0004 1E440203 ..D...¨...O ..ˆ...;........¿..... 0000C0
 00000019 1F830002 003F0004 142D0203 01B00004 067F0203 00B00004 1E8C0203 ......§.......§...-...?...•..... 0000E0
 8826065E C4D88EFF FFB81E56 00001EC8 00000000 00000000 01CE0004 139C0203 ......ö..........à...V.¡...Äá^.&. 000100
 B800BAE9 037E01F2 7E83F246 FF03EB00 00F246C7 F05689EE 46890457 88260247 G.&.W..FŸ.VÞúF..Š..F.-.-.Õ□.. 000120
 57882648 47B826E6 5EC4E856 89E64689 0C508826 0A408826 065EC402 E6C1F276 v·è|.á^.&.ə.&.P..F|.Vòá^|&.GH&.W 000140
 F4468308 EBF44689 F64689C0 2B009000 F09A5016 EA468D50 52FA5689 F846894A J.F%.V*RP.Fõ.P.Þ...+å.F-.F¶Š..F¶ 000160
 F676FFF8 76FFFA76 FF5F73F4 4639057C 667FF656 39EC5688 EA468800 F6568301 ..V-..Fõ.V±9V-.f|.9F¶s_.v*.v%.v- 000180
 882607B8 26C2EB02 7400067F 8326FC5E C400D008 689A5016 FC468D00 6AF476FF .v¶j..F=.P.k.Å.á^=&....t.Šó&..&. 0001A0
 02909A50 52016A01 6A006A00 6A1C77FF 261E77FF 26EE5EC4 E45689E2 46890257 W..Fã.Vòá^Ÿ&.w.&.w.j.j.j.j.RP... 0001C0
 C95E1F00 E8C028FF 3AE987E8 00013647 C726E25E C4000138 47C726E2 5EC4FFFF ..á^ã&úG8..á^ã&úG6..Š.Õ:.+åŠ..^è 0001E0

Dump of file SATURN:[PCCOMMON.DUMP.DLL]BRDNOPL.TMP;1 on 18-APR-1990 10:37:32.99
File ID (520,34,0)   End of file block 272 / Allocated 272

Virtual block number 215 (00000007), 512 (0200) bytes

 260247B8 26F85EC4 FA5689F8 46890856 88064688 D88E0007 B81E5600 001AC8CB ùå...V.¡...Ä.F..V..F%.V*á^%&.G.& 000000
 8B347F01 F27E83F2 46FF03EB 0000F246 C70152E9 0A4688FE 5689FC46 89045788 .W..F=.V±.F.ÕR.úF...Š..F..-...4. 000020
 880134E9 C02B0575 D00BF656 89F44689 0C508826 0A408826 F85EC402 E6C1F276 v·è|.á^%&.ə.&.P..F¶.V-.Åu.+åÕ4.. 000040
 7F83260A 7500327F 8326F85E C4C3EBE8 5289E642 89F65688 F4468802 E6C1F276 v·è|..F¶.V-.B|.RÒŠúá^%&..2.u.&.. 000060
 000A7F83 26EA5EC4 357F010C 7F83263C 7F000A7F 8326E65E C40099E9 03750038 8.u.Õ..á^|&.....<&.....5á^õ&.... 000080
 76FFFA76 FF1275C0 0B04C483 FFFF0233 9AF876FF FA76FF24 7F010C7F 832628 7F .+&.....$.v*.v%.3....á..åu..v*.v 0000A0
 0000F246 C704C483 FFFF0159 9A0676FF 0876FF53 74C00B04 C48301C6 01FD9AF8 %.=.ó..å..åtS.v..v..Y....á.úF.. 0000C0
 89EE4689 08578826 06478826 E65AC402 E6C1F276 88237F01 F27E83F2 46FF03EB Š..F.-...#.v·è|.áZ|&.G.&.W..FŸ. 0000E0
 73EB0001 B804C483 FDFBEB0E F876FFFA 76FFD4EB 04C483FF FF00009A 5052F056 VÞRP......á.Šå.v*.v%.Õ%».á.¡..Š» 000100
 FF016A01 6A006A00 6A1C77FF 261E77FF 26FC5EC4 29740036 7F8326F8 5EC460EB Šmá^%&..6.t)á^=&.w.&.w.j.j.j.j.. 000120
 C41E7400 387F8326 F85EC428 EB000138 47C726F8 5EC40268 02909AF8 76FFFA76 v*.v%...k.á^%&úG8..Š(á^%&..8.t.á 000140
 EB10EB00 61029D9A 0676FF08 76FF016A 016A006A 006A1C77 FF261E77 FF26FC5E ^=&.w.&.w.j.j.j.j..v..v....a.Š.Š 000160
 8E00F8B8 1E000014 C8CBC95E 1F00EBC0 2B00EBFE A2E90375 0001309D 74C00B0E ..åt.=..u.ÕÅ±Š.+åŠ..^èùå....¡%.. 000180
 894A5788 264847B8 26065EC4 0002F646 C700B3E9 8DF3B806 7508460B 06468808 Ä.F..F.u.¡µ.Õ°.úF-..á^.&.GH&.WJ. 0001A0
 C00BF64E FFF6468 FE5689FC 46894E57 88264C47 8826065E C411EBFE 5689FC46 F=.V±Š.á^.&.GL&.WN.F=.V±.F-.N-.å 0001C0
 01F24683 08EBF246 89F44689 C028031C 00F09A50 16EC468D FC76FFFE 76FF7C74 t|.v±.v=.Fš.P.Þ...+å.F¶.F·Š..F·. 0001E0

Dump of file SATURN:[PCCOMMON.DUMP.DLL]BRDNOPL.TMP;1 on 18-APR-1990 10:37:32.99
File ID (520,34,0)   End of file block 272 / Allocated 272

Virtual block number 216 (00000008), 512 (0200) bytes

 FFF476FF FC76FFFE 76FF4573 F2463905 7C4C7FF4 5639EE56 88EC4688 00F45683 .V¶..F±.VŸ9V¶.L|.9F·sE.v±.v=.V¶. 000000
 FFB0EB02 75000230 F0468906 478826F8 5EC40238 08689A50 16F8468D 006AF276 v·j..F%.P.k.8.á^%&.G..FÞ=..u.Š§. 000020
 C02BFF69 E9A1EB09 E8000188 0574C00B 06C483FD B4E80E37 FF260277 FF26F076 vÞ&.w.&.7.ÕÇ».á..åt.¡..Š.ŠÅÕi.+å 000040
 0876FF01 5FE98DF3 B8067508 46080646 88088E02 80881E00 0030C8CB C91F00E8 Š..èùåO...¡...Ä.F..F.u.¡µ.Õ_..v. 000060
 8800DA56 8301D846 8308EBD8 46890A46 89C02B03 8D00F09A 5016F046 8D0676FF .v..FÞ.P.Þ.§.+å.FÖ.FÄŠ..FÄ..¯VÖ.. 000080
 DA76FF06 76FF0876 FF0121E9 0372D846 39087C01 2BE9037E DA5639F2 5688F046 FÞ.V 9VÖ-.Õ+.|.9FÄr.Õ|..v..v..vÖ 0000A0
 8826E05E C4E25689 E04689FA 5688F846 8803E608 689A5016 F8468000 6AD876FF .vÄj..F%.P.k.|..F%.V*.FÅ.Vãá^Å&. 0000C0
 067F157C 00FE7E83 041E00F0 9A5016FC 46805052 EE5689EC 46894057 88263E47 G>&.Wə.F±.VŸRP.F=.P.Þ....-±.|... 0000E0
 46894457 88264247 *826E05E C404C483 FF55EB0E EC76FFEE 76FF0074 00FC7E83 .-=.t..vŸ.v±.ÒU..á.á^Å&.GB&.WO.F 000100
 568301F4 468308EB F44689F6 4689C02B 045000F0 9A50160C 46805052 D2568900 Å.V@RP.FÉ.P.Þ.].+å.F-.F¶Š..F¶..V 000120
 F676FFD0 76FFD276 FF7E73F4 4639057C 0085E903 7EF65639 DE5688DC 468800F6 -..FÉ.V89V--.Õ..|.9F¶s-.v@.vÅ.v- 000140
 0064E846 C7D65689 D44689E6 5688E446 8802E008 689A5016 E4468000 6AF476FF .v¶j..FÕ.P.k.Å..FÕ.V|.Få.VøúFÕd. 000160
 F6E80ED4 76FFD676 FF1374D0 0B00EA5E 8301E86E 83EA5688 E8468800 00EA46C7 úFõ...FÕ.Võ.nÒ..^õ..Åt..v=.vå.Õ- 000180
 016A006A 016A006A 1A7500E8 7E83067C 227F00EA 7E83D8EB 0274C00B 04C483FD ».á..åt.ŠÜ.-õ..*|..-Õ.u.j.j.j.j. 0001A0
 C8CBC91F 00E8C02B FEBFE9FF 65E90000 FFFF9A10 4068006A 0AEE681E 0B07681E .h...hŸ.j.hə......Õe.Õ¢±+åŠ..èùå 0001C0
 260A77FF 26065EC4 0178E98D F3B80675 08460806 4688D88E 035B881E 56000022 "..V.¡(..Å.F..F.u.¡µ.Õx.á^.&.w.& 0001E0
```

Dump of file SATURN:[PCCOMMON.DUMP.DLL]BRDNOPL.TMP;1 on 18-APR-1990 10:37:32.99
File ID (520,34,0)   End of file block 272 / Allocated 272

Virtual block number 217 (000000D9), 512 (0200) bytes

```
F0468D50 52FE56A9 FC46891E 5788261C 47882606 5EC404C4 83FE5EEB 0E0877FF .w..Ò^±.á.á^.&.G.&.W..F•.V±RP.Fþ 000000
FC76FFFE 76FF0136 E9C02805 7301F07E 83067C00 7F00F27E 83053700 F09A5016 .P.Þ.7..-·...|..~Þ.s.+àÖ6..v±.v• 000020
00F5E903 74C00803 780A589A 5016F446 80FC76FF FE76FF05 4709C29A 006A006A j.j..ô.G..v±.v•.F¶.P.X.(..åt.Õ%. 000040
53060C74 00367F83 26D2E802 74033F83 26EC5EC4 EE5689EC 4689F656 8BF4468B .F¶.V-.F&.VŸá^&&.7.t.$ô&..6.t..S 000060
0677FF26 0877FF26 EC5EC401 A200009A F476FFF6 76FF0BEB 04C483FF FF00619A .a....á.Š..v-.v¶...Ä.á^&&.w.&.w. 000080
00E646C7 0096E90ⁿ 7400FA7E 83009FE9 037402F8 7E830000 FFFF9A50 16F8468D .F½.P......-½.t.Ö...-•.t.Ö..úFl. 0000A0
E846890C 508B260  408826EC 5EC402E6 C1E6768B 347F01E6 7E83E646 FF03E800 .Š..Fl.-l..4.vlèl.á^&&.ð.&.P..FÒ 0000C0
C3E8E052 890E4289 EA5688E8 468802E6 C1E6768B 0084E9C0 28057500 08EA5689 .Vð.Åu.+àÖ...vlèl..FÒ.Vð.BB.RÅŠû 0000E0
32700002 300C4703 260A4788 26E25EC4 42700002 300C4703 260A4788 260E5EC4 á^B&.G.&.G.•..)Bá^â&.G.&.G.=..)2 000100
04C48306 3001FD9A EC76FFEE 76FF2075 C00804C4 83058302 339AEC76 FFEE76FF .vŸ.vå.3....á..åu .vŸ.vå.».=..á. 000120
6A006A00 6AFC76FF FE76FFFE F4E9FEF7 E9018400 5A9AF476 FFF676FF 0E75C008 .åu..v-.v¶.Z.Ç.Ö%±Ö¶±.v±.v•j.j.j 000140
0002008B 000104BE 01030008 CBC95E1F 00E8C02B E9E80275 C0080515 05D09A01 ..Å....åu.ŠÖ+äŠ..^èù..../....... 000160
000200AB 00040596 02030000 00120619 00020000 000801F7 00020000 0006062B +.......¥........................ 000180
00000000 00000000 00000000 001904D6 00020000 00140654 00020000 00130573 s.......T.......ø................ 0001A0
FFFC568C FA46890E 46805657 000008C8 00000000 00000000 00000000 00000000 .................à...WV.F..Fª.V•. 0001C0
76FF0876 FF0A76FF 0C76FFFA 76FFFC76 FFF08804 C4830044 08349A06 76FF0876 v..v..4.D..á..Þ.v•.v'.v..v..v..v 0001E0
```

Dump of file SATURN:[PCCOMMON.DUMP.DLL]BRDNOPL.TMP;1 on 18-APR-1990 10:37:32.99
File ID (520,34,0)   End of file block 272 / Allocated 272

Virtual block number 218 (000000DA), 512 (0200) bytes

```
CBC95F5E C78806C4 83FFFF09 0A9A5606 76FF0876 FFF8880C C4830055 09AE9A06 ..Ö.U..á..%.v..v.V......á..ú^_èù 000000
06568908 46890000 100AF7D8 F7065688 47117DC0 08084688 FF335356 57EC8855 U.åWVS3..F..å).G.V.%Å%Ö....F..V. 000020
880A4E88 1575C008 UA56890C 46890000 100AF7D8 F70A5688 47117DC0 080C4688 .F..å).G.V.%Å%Ö....F..V..åu..N.. 000040
D901E8D1 06468808 56880A4E 88D88838 E8D388F1 F7064688 0888F1F7 D2330846 F.3Ø%þ.Ä.F.%þ.ÆSØ.Ä.N..V..F.1Š1) 000060
06720777 0856380C 720103E6 F70A4688 910C66F7 F088F1F7 F475D808 D8D1EAD1 1ð1Ä.Ûu¶%þ.Þ%f...F.%l.1r.;V.w.r. 000080
88EC8855 0008CA50 E5885F5E 5B000A83 08F70AF7 07754F96 D2334E01 7606463B ;F.v.N3Ø.Ou.%Ö%Ä.Ö.[^_.|]ð..U.å. 0000A0
66F70646 88C888E3 F70008CA 50E588E3 F7064688 08750A5E 8808080C 5E880846 F..^..Ä.^.u..F.%D.|]ð..%D.à.F.%f 0000C0
8847117D C0080846 88FF3357 53EC8855 0008CA5D E5880103 E3F70646 88C8030C ..à.F.%D.1.|]ð..U.åSW3..F..å).G. 0000E0
0000100A F7D8F70A 5688107D C0080C46 88065689 08468900 00100AF7 D8F70656 V.%Å%Ö....F..V..F..å)..V.%Å%Ö... 000100
43794FD2 33C288F1 F7064688 F1F7D233 0846880A 4E881875 C0080A56 890C4689 .F..V..åu..N..F.3Ø%þ.F.%þ.ó3ØOyC 000120
0C66F7C8 88F1F7F4 75D808D8 D1EAD1D9 D1E8D106 46880856 880A4E88 D88848E8 ŠN.Ä.N..V..F.1Š1)1ð1Ä.Ûu¶%þ.å%f. 000140
08561806 46280C56 180A462B 06760646 38087207 7708563B 0C720103 0A66F791 .%f..1r.;V.w.r.;F.v.+F..V.+F..V. 000160
0A891066 8F0818BE C08ED88C 57560008 CA5DE588 585F000A 8308F7DA F707794F Oy.%Ö%Ä.Ö._[.|]ð..VW.Ä.å/..ef.¿. 000180
FCD88EC1 8ED98CC0 8CFB880C C3831F7A 1E88F388 5756C08E D08CC85E 5FA5F300 .µÉ_^ù.Ä.åVW.µ..z..û..«.â.}.ė.Ä• 0001A0
F881F388 A5A5FCC1 8ED98CFB 880CC383 1F7A1E88 F3885756 16E8F388 D98EA5A5 ÉÉ.Ť.µŠ.VW.µ..z..û..«.}.ė•ÉÉ.µ.« 0001C0
C3831F7A 1E88F388 5756C08E D08CC85E 5F03FE47 C6FC7789 1F7A1E89 4E741F66 f.tN..z..w•6G±._^ù.Ä.åVW.µ..z..û 0001E0
```

Dump of file SATURN:[PCCOMMON.DUMP.DLL]BRDNOPL.TMP;1 on 18-APR-1990 10:37:32.99
File ID (520,34,0)   End of file block 272 / Allocated 272

Virtual block number 219 (000000DB), 512 (0200) bytes

```
C3831F7A 1E88F388 575618EB F388D98E A5A5A5A5 FCD88EC1 8ED98CC0 8CFB880C ..«.â.}.ė.Ä•ÉÉÉÉ.}.µŠ.VW.µ..z..û 000000
5FFC7789 07FE47C6 1F7A1E89 0E741F66 F881F388 A5A5A5A5 FCC18ED9 8CFB880C ..«.}.ė•ÉÉÉÉ.µ.«f.t...z.6G±..w•_ 000020
880CC383 1F7A1E88 F388FCD8 8EC18ED9 8CD88C57 5604E800 8C575611 CBE9CB5E ^ùÖù.VW.ÅŠ.VW.Ä.}.ė.Ä•.µ..z..û.. 000040
8CC85E5F D98EFC5F 891F7A1E 89CF741F 66F881A5 A5027403 3CA5A5FE 4588ADF8 «Ü.E±ÉÉ<.t.ÉÉ.«f.tü..z.._•.}_^ù. 000060
99078803 E8025788 07880AE8 99078826 C08ED08C 14E80257 88260788 26C08ED0 Å.å&..&.W.Š..Å.å&...Š....W.Š.... 000080
1C741F66 FF810CC7 831F7A3E 88000883 0AF708F7 07798024 C78AD088 DA885756 VW.Ö.Å.úß.y.%ÛKÖ.Ü..>z..ú...f.t. 0000A0
C6FF63E9 C85E5F16 ECE89E84 03FE45C6 0F7500FF 80C18ED9 8CFC7D89 1F7A3E89 .>z..)•.}.ė...u.óE±.Ç.Ö&._^ùÖc.ó 0000C0
75881F7A 3E88C08E 088^5756 C85E5F5D 1A48E8F8 880833C8 88876080 5507FE45 E±.U§'..ù3Ü.«ÖK.]_^ùVW.Ä.Ǎ.>z..u 0000E0
A5A50274 033CA5A5 FCFE4588 FC7D891F 7A3E8981 741F66FF 810CC783 FE‹58AFC •.E±.ú...f.tŸ.>z..)•.E±•ÉÉ<.t.ÉÉ 000100
8ED88C03 FE45C6FC 7D891F7A 3E898C74 1F66FF81 0CC7831F 7A3E8857 56C8 =5F _^ùVW.>z..ú...f.t..>z..)•óE±..Ä. 000120
E80C1F7A 06831F7A 1E88FCF8 885756C0 8ED88C02 E8D08CC8 5E5FA8A8 FCC03.C0 Ǎ3ë•¨¨ ^ù.ÅŠ..Ä.åVW.«•..z...z..Š 000140
7A2E83A5 A5FC7788 0D7503FE 7F801F7A 1E88FCF8 885756C0 8ED88C02 E8D08C11 ..ÅŠ..Ǎ.åVW.«•..z...±.u..w•ÉÉ..z 000160
56C08ED8 8C02E800 8CE4E85D DE885F11 0EE857FC 77881088 268955C8 5E5F0C1F .._^ùW.&...w•WÖ...B}ŠÖ.ÅŠ..Ä.åV 000180
1F7A1E88 FCF88857 56C08ED8 8C02E800 8C11E80C 1F7A0683 1F7A1E88 FCF88857 W.«•..z...z..Š..ÅŠ..Ä.åVW.«•..z. 0001A0
E9E80F87 F7882672 E8DF87C8 5E5F0C1F 7A2E83A5 A5A5A5FC 77880F75 07FE7F80 ..±.u..w•ÉÉÉÉ..z.._^ù.ÖÖr&.%.ÖŠÖ 0001C0
56C08ED8 8C02E800 8C10E80C 1F7A0683 1F7A1E88 F8885756 C08ED88C 02E8D08C .ÅŠ..Ä.åVW.«..z...z..Š..ÅŠ..Ä.åV 0001E0
```

Dump of file SATURN:[PCCOMMON.DUMP.DLL]BRDNOPL.TMP;1 on 18-APR-1990 10:37:32.99
File ID (520,34,0)   End of file block 272 / Allocated 272

Virtual block number 220 (000000DC), 512 (0200) bytes

```
CBB8CB5E 5FA5A502 74033CA5 A5ABFC0C 1F7A2E83 FE478AF3 881F7A1E 88FB8857 W.«..z..µ.Gz..z..•¨EE<.t.EE_^ù¡ù 000000
36EB0486 8A048088 08482688 9F002804 DF9A48E8 15FE8A15 F98850E8 15D58A15 .¤f.$P¡'.¤z.$H.Ô.(...&H.¡..¤..$6 000020
D8F70773 589E0848 268A5011 87E89004 EB11F2E8 900AEB11 A4E89010 EB11A5E8 ÒE.$..ÒE.$..Ò·.$..Òñ.P.&H..X«.%Ã 000040
8851531D 88268955 57560492 8A048C88 08482688 9F047104 DF9AC30A F7000283 .@.%Òù.Ô.q...&H.¡..¤..VWU.&..$Q. 000060
57CB5E5F 50585902 FF02E800 FF047508 7488030A 7C801F7A 36890CEE 831F7A36 6z..Ÿ..6z..|...t.u..Å$..@Y(]_^ùW 000080
7480FF41 F6CB5F08 75F0FF41 F6087403 F8801375 7F01F6FF 32FE5D8A 1F7A3E88 .>z..]z2.-..u..«.t.-A.Þu._ù-Ã..t 0000A0
7A3E8857 56CB5F7F 2180FF32 FE5D8A1F 7A3E8857 CBF9CBE4 0803755F 8001F6F8 W-.._u..õù'ùW.>z..]z2..!.¯ùVW.>z 0000C0
7503F880 A5FCC18E 098CFC7D 89CB5E5F 803180FF 320875F7 38FC7588 FE5D8A1F ..]z¯u«;%u.2..1._^ù.)=.\.Ž=Ê.«.u 0000E0
24FEE857 5602EBC0 8ED08C57 56CB5E5F AB80F480 ADA5A5C8 5E5FA880 F480AD08 .Ü.¶.¨_^ùÊÊÜ.¶.¨¯^ùVW.Å.à$.VWÒz$ 000100
0488F388 575604E8 24E6E857 5602EBC0 8ED08C57 5676E800 0888F388 575604E8 $.VW.µ¯..$vVW.Å.Ã$.VWÒ!$$.VW.µ¡. 000120
8ED08C57 5646E800 0C88F388 575604EB 24CEE857 5602EBC0 8ED08C57 565EEB00 .$^VW.Å.à$.VWÒö$$.VW.µ¡..$FVW.Å. 000140
249EE857 5602EBC0 8ED08C57 562EEB00 1488F388 575604E8 2486E857 5602EBC0 à$.VWÒÑ$$.VW.µ¡..$.VW.Å.à$.VWÒ.$ 000160
0088F388 575604E8 2486E857 5602EBC0 8ED08C57 5616E800 1088F388 575604E8 $.VW.µ¡..$.VW.Å.à$.VWÒ.$$.VW.µ¡. 000180
5E5F5D0B 2C97FF10 88268955 FC7D8710 7407FE7D 80C18ED9 8C1F7A3E 88D88800 ..Ã.>z..\.ê.)z.t..)•U.&.....,.]_^ 0001A0
EB2455E8 575602EB C08ED08C 5756DFE8 1F7A3E88 F7882491 E810FC8F 02C383C8 ù.û.«=.Ò.$.%.>z.$ÒVW.Å.à$.VWÒU$$ 0001C0
000688F3 88575604 EB2430E8 575602EB C08ED08C 575676E8 000A88F3 88575604 .VW.µ¡..$vVW.Å.à$.VWÒ=$$.VW.µ¡.. 0001E0
```

Dump of file SATURN:[PCCOMMON.DUMP.DLL]BRDNOPL.TMP;1 on 18-APR-1990 10:37:32.99
File ID (520,34,0)   End of file block 272 / Allocated 272

Virtual block number 221 (000000DD), 512 (0200) bytes

```
C08ED08C 575646E8 000E88F3 88575604 EB2425E8 575602EB C08ED08C 57565EEB $^VW.Å.à$.VWÒX$$.VW.µ¡..$FVW.Å.à 000000
EB23F5E8 575602EB C08ED08C 57562EEB 001688F3 88575604 EB2400E8 575602EB $.VWÒ.$$.VW.µ¡..$.VW.Å.à$.VWÒ%#$ 000020
000288F3 88575604 EB230DE8 575602EB C08ED08C 575616E8 001288F3 88575604 .VW.µ¡..$.VW.Å.à$.VWÒï#$.VW.µ¡.. 000040
00088821 EB0004B8 FF39E95E 2308E856 057407FE 7D80C18E D98C1F7A 3E88D888 .Ã.>z..\.é.)z.t.VÒÃ#^Ò9.£..$I£.. 000060
57560018 8803E800 1C8808E8 00008800 EB001488 12E80010 8817E800 0C881CEB $.£..$.£..$.£..$.£..$.£..$.£..VW 000080
7D89FC75 88C08ED8 8C1F7A3E 890CEF83 287407F2 7D803974 07FE7D80 1F7A3E88 .>z..)z.t9.)·.t+.ÿ..>z..Ã.à.u•.) 0000A0
68E802C3 83C85E5F 50082C97 FF1D8826 89553E73 18FB832F 731CFB83 087D88FC •.)..«.s/.«.s>U.&.....,.]_^ù.û.Òk 0000C0
550C1F7A 2E83F787 8FEB2356 E81F7A3E 890CEF83 C47407F2 7D8002C3 83CDEB23 #$ë.û..)·.tá.ÿ..>z.ÒV#$«¯%..z..U 0000E0
01410025 9F5D082C 97FF1088 2689550C 1F7A2E83 C85E5F50 082897FF 10882689 .&....(.]_^ù..z..U.&.....,.].%.A! 000100
C08ED88C 5756000C 8803E8FF 32DF02E7 00F88AE3 00E300C8 9E5E5FE0 0AE4D0E8 ÒÃÒ.Å_^.ùÃDÀD.«ÀÒ.Ò2.$.£..VW.Ã.à 000120
EC8855C8 5E5FF4E2 47471D88 FE448905 87AD0005 89FB28FE 884E4E1F 7A3688FC •.6z.ÑN.z+«¿..Ù...Dz..GGã¶_^ùU.& 000140
88551A3E E922EB8A 084888C8 5DE5885E 5F22DDE8 037407FE 7D801F7A 3E885756 VW.>z..)z.t.Òi"_^.[]ùEK.¤$"Ò>.U. 000160
885E5F80 23903680 0008E880 805756EC 8855C85D E5885E5F 0018E8C0 325756EC &VW2àÒ.._^.|]ùU¯&VW¯.Ò...6.#._^. 000180
8E1F7A36 FFFF4430 36FF4530 A536A536 A536A536 2396BF06 7680071E FCCB5DE5 [}ù=...v¯«.#6É6É6É0E.600..6z.ƒ 0001A0
C08ED88E 58108CE8 1E071606 7E80555D 18798007 44F60F30 E8551F7A 36892396 .#.6z.UÒ=.-D..y.]U.-....ÒV.X.Ã.à 0001C0
067E8125 8E06FF56 000004C8 C30A8C96 1F7A068F 5D13FAE8 0850BF06 7423968E ƒ.#t.«P.Ò'.]..z...ÒùÀ...V../%.-. 0001E0
```

Dump of file SATURN:[PCCOMMON.DUMP.DLL]BRDNOPL.TMP;1 on 18-APR-1990 10:37:32.99
File ID (520,34,0)   End of file block 272 / Allocated 272

Virtual block number 222 (000000DE), 512 (0200) bytes

```
2475FFFF 087E812B 750B7006 7E8113EB 0000FE46 C7077508 5C087E81 0E750864 d.u..-.\.u.úFz..$..-.p.u+.-...u& 000000
4C87F606 D868F9F7 000C8999 085820C3 8815750C 0A47F626 065EC400 01FE46C7 úFz..á^.&-G..u..ù-X..¿..%*kÃ.-.L 000020
FD9A0200 68147502 44080488 1D4AC681 02E6C1FE 76889090 7EEBC02B 06740117 ..t.+à$-...vzèl..óJ....D.u.h...» 000040
03E0D1C8 88F9F700 0C89990B 58200646 88D574D0 08025489 048902C4 8309472E .G..á....T..Ãtf.F.-X..¿..%'.àlÃ. 000060
89260647 89261D4C 9488104A 848802E6 C1FE7688 065EC4FC 4689174C 05E0D1C1 èlÃ.L..F=á^..vzèl...J...L.&.G.&. 000080
8026065E 881107C6 0E880447 89260244 89020088 FC768802 57892607 89260857 W.&..&.W..v=¡...D.&.G..B6...^.&. 0000A0
C103E001 C888F9F7 000C8999 08582008 46880000 04C890C8 C95E0001 88020A4F O..¡..^èù.à....F.-X..¿..%'.àlÃ.é 0000C0
478A2608 5EC47274 1007F626 FC5EC451 7400067E 83FE5E8C FC468917 4C05E0D1 lÃ.L..F=.^z.-..tÒá^=&-..trá^.&.G 0000E0
5EC404C4 8309982E 629A0876 FF0A76FF 5C74C008 02C48309 59312A9A 50E42A08 .*ÒP.*1Y..á..àt\.v..v..b....á.á^ 000100
08578926 06478926 02578926 07892699 C02B085E C4000002 47C72600 07C626FC =&6..&úG...á^.+á.&..&.W.&.G.&.W. 000120
74C00802 C48309AA 312A9A50 E42A0847 8A26085E C4217410 07F626FC 5EC42AEB $*á^=&-..t|á^.&.G.*ÒP.*1`..á..àt 000140
8C2A36A3 2A3C8808 A133FC9A 000A88EC 8855C8C9 04A92E62 9A0876FF 0A76FF08 ..v..v..b.`.èùU.&¡...=3Ã.¡<*É6*. 000160
3206C72A 0E16892A 0CA30856 88064688 2A281689 2A26A310 56880E46 882A381E .8*.F..V.È&*..(*.F..V.È.*...*ú.2 000180
2A16A3C0 2800012A 3406C703 08E90374 25F67E80 038DE900 002A3006 C700002A *..ú.0*..Ò...--%t.Ò..ú.4*..+àÈ.* 0001A0
5EC40020 289C06C7 2A24A32A 0AA32A10 A32A2AA3 2A2CA32A 14A32A2E A32A12A3 È.*È.*È.*È,*È**È.*È.*È$*ú..+ .á^ 0001C0
1606FF0D 75283F80 260A5E88 903EEB00 302B9C06 C70A46FF 49753001 7F80260A .&...0ul.f.ú..+0.$>..^.&.?+u.... 0001E0
```

```
Dump of file SATURN:[PCCOMMON.DUMP.DLL]BRDNOPL.TMP;1 on 18-APR-1990 10:37:32.99
File ID (520,34,0)   End of file block 272 / Allocated 272

Virtual block number 223 (000000DF), 512 (0200) bytes

06FF9014 EB2A2A06 FF1A7500 2A163E83 0E75203F 80269028 EB00002A 2A06C72A *ú.**..$(.&.? u..>.*.u...**$.... 000000
0978E80E 5098078A 260A5E88 0A46FF2A 2406FFC7 75203F80 260A5EC4 00EB2A0A .*$.é^.&.?-uú..$*.F..^.&...P.Òx. 000020
3E830C56 890A4689 08C48308 C7E80E2A 3A681E0A 76FF0C76 FFD075C0 0802C483 .é..åuî.v..v..h:*.Òú..é..F..V..> 000040
C7067530 289C3E83 0074002A 243E832A 3AA308F7 2A3AA12A 2406FF0C 7D002A3A :*.)...$*À:*¥ÅÈ:*.>$*.t..>.+0u.ú 000060
78E80E2A 34681E0A 76FF060A 46FF2A2C 06FF2075 2E3F8026 0A5EC400 2028C906 ..+ .é^.&.?.u-..,*.F...v..h4*.Ò( 000080
8A260A5E C42A2C0E FF00012A 3406C70A 7D002A34 3E830C56 890A4689 08C48308 ..é..F..V..>4*.).ú.4*....,*é^.&. 0000A0
2A143E83 00022A14 06C70675 006C3028 74006830 4074004E 30307400 46309807 ..=F.t==N.t@=h.t+=l.u.ú..*...>.* 0000C0
2A1406C7 90024EE9 1C75003F 80260A5E C40A46FF 03754C3F 80260A5E C4097500 .u.é^.&.?Lu..F.é^.&.?.u.ÒN..ú..* 0000E0
0A740045 30F84689 98078A26 C8EB0008 2A1406C7 00EB0010 2A1406C7 08EB0001 ..$Àú..*..$Àú..*..$à&....F%=E.t. 000100
300191E9 037E7874 00693DF8 46882OF8 46832A12 06FF0875 00583005 74004730 =G.t.=X.u....*.F% .F%=i.tx-.Ò..= 000120
C4157502 2A143E83 900159E9 0140E903 75002530 0152E903 7E013FE9 03750063 c.u.Ò?.~.ÒR.=X.u.Òa.ÒY...>.*.u.é 000140
89262A30 A11FC426 2A261EC4 00EB0000 0247C726 0789262A 30A11FC4 262..61E .&*&é.À0*&..&úG...$.é.&*&é.À0*&. 000160
F6262A0C 1EC4018D E9037400 2A303E83 0170E903 75002A32 3E83042A 26066'07 ...&*..>2*.u.Òp..>0*.t.Ò§.é..*&- 000180
C483019E E80E0A6A 00002A0A 06C72A2E 06FF01AC E9FFFF88 01AFE903 75200A'7 G. u.Ò€.j..Ò`....*ú..*..j..Ò...é 0001A0
75082A14 3E830004 2A3406C7 2A2C06FF 2A1206FF 2A1006FF F2EB086A 90C3EB02 .$ú.j.$`...*...*..,*ú.4*...>.*.u 0001C0
83FA4689 2A3AA128 742A3A06 39FA4689 2A14A3C0 287A7401 2A143E83 0081E903 .Ò...>.*.tz+åÈ.*.F*9.:*t(À:*.F*. 0001E0

Dump of file SATURN:[PCCOMMON.DUMP.DLL]BRDNOPL.TMP;1 on 18-APR-1990 10:37:32.99
File ID (520,34,0)   End of file block 272 / Allocated 272

Virtual block number 224 (000000E0), 512 (0200) bytes

3AA3C028 027DC008 2A3AA105 2A3A2E83 909013EB 00002A3A 06C70A74 002A243E >$*.t.ú.:*..$.....:*.À:*.à).+åÈ: 000000
3E832274 00FA7E83 02C48304 8DE80E3A 6A02C483 0130E80E 106A022A 2606832A *..&*.j..Ò0..é.j:.Ò...é..~*.t*.> 000020
00002A3A 06C79007 EB2A3AA3 C028027D C0082A3A A300052D FA468815 74002A24 $*.t..F*-..È:*.à).+åÈ:*$..ú.:*.. 000040
E80E006A 90FF3FE9 106AFF10 E9022A26 068302C4 8300F1E8 0E106A04 2A262E83 ..&*.j..Òp..é...&*.Ò..j.Ò?..j..Ò 000060
643090FF 21E90428 E80E256A FF2AE903 49E80EF8 76FFF4EB 016A90FF 39E9026E n.Ò9..j.$¶.v%.Òl.Ò*.j%.Ò(.Òl..=d 000080
0A4EFF0C 56880A46 88097400 2A143E83 DA7E0067 30057C00 6530FF0C E9037500 .u.Ò..=e.|.=g.-Ò.>.*.t..F..V..N. 0000A0
FEE4E903 75006F30 FE80E903 75006E30 903AE8FE 5689FC46 89400C56 880A4688 .F..V.ã.F=.V±$:.=n.u.Ò.±=o.u.ÒÒ± 0000C0
9081E8FF 79E90375 007830FE 89E90375 0075308F 74007330 FEE0E903 75007030 =p.u.ÒÅ±=s.t.=u.u.Ò¿±=x.u.Òy.$Y. 0000E0
500A4628 C388EC75 253C0474 C00AF646 88078A26 FC5EC4FC 46FF9034 E80A46FF .F.$4..F=é^=&...F-.åt.<%u&.ú+F.P 000100
88078A26 0A5EC40C 56890A46 89FE5688 FC468806 C483044C E80E0A76 FF0C76FF .v..v..ÒL..é..F=.V±.F..V.é^.&... 000120
000012C8 C8C92A30 A1FE51E9 0374200A 47F6262A 0C1EC4FC 63E90374 C00AF646 F-.åt.Òc=é..*&-G. t.ÒQ±À0*èùà... 000140
0774022A 143E832A 2E06FF04 740A067E 8300202B 9C06C706 74002A2C 3E835657 WV.>,*.t.ú..+ ..~..t....*.>.*.t. 000160
902CE804 2A260683 FE5689FC 46890257 88260788 262A261E C4197510 2A143E83 .>.*.u.é.&*&..&.W..F=.V±..&*.$,. 000180
99078826 2A261EC4 0EEB0000 FE46C7FC 46890788 262A261E C4117400 2A2E3E83 .>.*.t.é.&*&...F=úF±..$.é.&*&... 0001A0
9003E806 46880674 FE4608FC 46880E74 002A0A3E 83022A26 0683FE56 89FC4689 .F=.V±..&*..>.*.t..F=.F±t..F.$.. 0001C0
83287D00 FE7E8331 75002A2E 3E83F456 89F24689 2A381688 2A36A128 9AA3C028 +åÈ.+À6*..8*.F·.V¶.>.*.ul.-±.)+. 0001E0

Dump of file SATURN:[PCCOMMON.DUMP.DLL]BRDNOPL.TMP;1 on 18-APR-1990 10:37:32.99
File ID (520,34,0)   End of file block 272 / Allocated 272

Virtual block number 225 (000000E1), 512 (0200) bytes

89FC4689 DAF7D0D2 8308F7FE 5688FC46 882D07C6 26F246FF F25EC41D 750A067E -..u.é^·.F·&ó.-.F=.V±%À.Ø.%Ò.F=. 000000
FE76FF50 1E0676FF FA5E8CF8 46892A18 880000F6 46C79006 EB0001F6 46C7FE56 V±úF-..$..úF-..|.*.F%.^*.v..P.v± 000020
04C48309 872FEE9A F876FFFA 76FF4574 002A2C3E 830AC483 0E983120 9AFC76FF .v=. 1...é..>,*.tE.v*.v%.Ÿ/ñ..é. 000040
F27EC4F0 4E880000 289A06C7 0675082B 9A3E8300 7EC908F0 4E89C828 2A340E88 ..4*+à.NÞ.è-..>.+.u.ú..+...NÞé-· 000060
76C5EE5E 8C2A120E 88F04E89 F4468CF2 7E89F47F C00849C1 88473005 C62605EB $.&6.0G.èl.é.¶.-·.F¶.NÞ...*.^Ÿév 000080
7689E375 003F8026 F846FF46 202C8003 7C613C07 74C90804 88078A26 F85EC4F2 ·é^%&.....èt.<a|.., F.F%&.?.uÐ.v 0000A0
00018805 7500F67E 8308742A 2A06082A 16A11475 002A2E3E 83EE5E8E F45E8CF2 ·.^¶.^Ÿ.>.*.u.À.*..**t..—.u.|.. 0000C0
A10001BE 18740006 7E835657 000010C8 C8C95F5E 02C48302 FFE80E50 C02802E8 $.+åP.Ò...é.^_èùà...WV.~..t./..À 0000E0
262A261E C4137408 2A143E83 008FE902 2A260683 FA5689F8 46892A28 16882A26 &*..(*.F%.V*._&*.Ò...>.*.t.é.&*& 000100
0683FA5E 8CF84689 FC468907 88262A26 1EC410EB FA5689F8 46890257 88260788 ..&.W..F%.V*$.é.&*&...F=.F%.^*.. 000120
59880975 00FC7E83 900AEB1D 52881575 FA4608F8 46880E74 082A143E 83042A26 &*..>.*.t..F%.F*u.|R.$...-=.u.|Y 000140
E82A340E 881C742A 2C3639F6 28F45689 F24689FA 5688F846 88FA5E8C F8468910 ..F%.^*.F%.V*.F·.V¶+-96,*t...4*$ 000160
3F8026F2 46FFF25E C44690ED E8107ECE 38461574 003F8026 F246FFF2 5EC4900E ..é^·.F·&.?.t.F;ö-.$Ú.Fé^·.F·&.? 000180
0EF876FF FA76FF56 02C48301 59E80E57 0875002A 243E83FE 2B2A3A3E 88F37500 .uu.>:*+±.>$*.u.W.ÒY..é.V.v*.v%. 0001A0
26A10000 06C890C8 C95F5E02 C483013C E80E5708 74002A24 3E8306C4 830183E8 Ò*..é..>$*.t.W.Ò<..é.^_èù.à...À& 0001C0
4688C02A 9003E801 80057547 067E8306 7467067E 83FE5689 FC46892A 2816882A *..(*.F=.V±.-.gt..-.Gu.¯.$..*à.F 0001E0
```

```
Dump of file SATURN:[PCCOMMON.DUMP.DLL]BRDNOPL.TMP;1 on 18-APR-1990 10:37:32.99
File ID (520,34,0)   End of file block 272 / Allocated 272

Virtual block number 226 (000000E2), 512 (0200) bytes

 012A3406 C7067500 2A343E83 007400FA 7E800006 2A3406C7 0675002A 2C3E83FA *.>,*.u.ú.4*...~*.t..>4*.u.ú.4*. 000000
 FF262852 068EFC76 FFFE76FF 2A3636FF 2A3836FF 0676FF2A 3436FF2A 1236FF00 ..6.*.64*.v..68*.66*.v±.v=..R(&. 000020
 26285206 8E2A3636 FF2A3836 FF147500 2A0A3E83 1B7400FA 7E800EC4 8310661E .f..á..~*.t..>.*.u..68*.66*..R(& 000040
 52068E2A 3636FF2A 3836FF14 75002A34 3E831874 002A0A3E 8304C483 106A1EFF ..j..á..>.*.t..>4*.u..68*.66*..R 000060
 FE76FF1B 742A2A06 082A16A1 000028 9A 06C7082A 26068304 C4831072 1EFF2628 (&..r..á...&*.ú..+..À.*..**t..v± 000080
 C90129E8 0E50C028 02E80001 880574C0 0804C483 10761EFF 26285206 8EFC76FF .v=..R(&..v..á..ât.|..Š.+âP.Ò).è 0000A0
 FF263788 2606468A 1478044F FF262A0C 1EC43C75 002A323E 83560000 00C890C8 ù.à...V.>2*.u<á..*&.O.x..F.&.7&. 0000C0
 FF077540 06C48311 732CEC9A 0676FF53 2A0E36FF 10E8E42A 04882602 478E2607 .&.G.&..*ðŠ..6.*S.v..&,s..á.âu.. 0000E0
 F6080676 88577500 2A323E83 56570000 02C890C8 C95E2A30 06FF9005 E82A3206 .2*Š....0*^èü.à...WV.>2*.uW.v..- 000100
 882A3206 FF047540 06C48311 D82CEC9A 289C36FF 2A0C36FF 2A0E36FF 18E8507E ~PŠ..6.*.6.*.6.+.&,Ü..á.âu...2*. 000120
 05882602 478E2607 FF263F88 26289CA0 D478044F FF262A0C 1EC41E7E C0084EC6 6N.á~.á..*&.O.xÁ..+&.?&..&.G:&.. 000140
 830A7688 56570000 02C8C8C9 5F5E2A30 06010646 88077500 2A323E83 D4E8E42A *ðŠà.>2*.u..F...0*^_èüà...WV.v.. 000160
 06C48312 4D2CEC9A 5098078A 26065EC4 2A0C36FF 2A0E36FF 22E85E75 002A323E >2*.u^Š".6.*.6.*á^.Ī...P.&,M..á. 000180
 8A26065E C4CD7804 4FFF262A 0C1EC425 74C0084E C6880646 FF2A3206 FF047540 âu...2*.F..6N.ât%á..*&.O.xëá^.&. 0001A0
 0A468807 75002A32 3E83CAE8 E42A0588 2602478E 2607FF26 3F88262A 0C1EC407 .á..*&.?&..&.G.&..*ðŠò.>2*.u..F. 0001C0
 89FC4689 C028F656 89F44689 2A381688 2A36A156 00000CC8 C8C95F5E 2A300601 ..0*^_èüà...VÀ6*..8*.F¶.V-+á.F=. 0001E0

Dump of file SATURN:[PCCOMMON.DUMP.DLL]BRDNOPL.TMP;1 on 18-APR-1990 10:37:32.99
File ID (520,34,0)   End of file block 272 / Allocated 272

Virtual block number 227 (000000E3), 512 (0200) bytes

 7510289A 3E830676 28F028F8 468904C4 830E862F EE9AF476 FF522A3A 3688FA46 F*.6:*R.v¶.Ÿ/...á..FŸ+Þ+v..>.+.u 000000
 3E831975 2D3F8026 F45EC422 75002A24 3E834E01 7508289A 3E8308E8 02EE8305 ..Ÿ.Š..>.+.u.N.>$*.u"á^¶&.?-u..> 000020
 F6080874 30289C3E 83F84EFF 02C483FE 71E80E50 98078A26 F446FF12 7530289C .+0u..F¶&...P.Òq±.á..N½.>.+0t..- 000040
 FC46FF07 7400289A 3E830066 E80EFA46 FF077400 067E8318 74002A24 3E83077E -..>$*.t..~..t..F*.Òf..>.+.t..F= 000060
 0E047500 FA7E830A 7400067E 8302C483 FE7EE80E 56297500 2A243E83 0070E80E .Òp..>$*.u)V.Ò-±.á..~..t..~*.u.. 000080
 85E80EF4 76FFF676 FFF876FF 0040E80E 047500FC 7E830A74 00289A3E 830039E8 Ò9..>.+.t..-=.u..Òâ..v½.v-.v¶.Òç 0000A0
 2A163E83 C8C95E02 C483FE38 E80E5600 20289C06 C70E7400 2A243E83 06C483FE ±.á..>$*.t.ü..+ .V.Ò8±.á.^èü.>.* 0000C0
 9A3E8302 C483FDC8 E80E306A C802C483 FD02E80E 50002088 03E8002B 88057400 .t.|+.Š.| .P.Ò0».á.üj0.Òà».á..>. 0000E0
 000006C8 C802C483 FDAAE80E 50007888 03E80058 88057400 2A123E83 1775102B +.u..>.*.t.|X.Š.|x.P.Ò`».á.üà... 000100
 E80A46FF 022A2606 83378826 2A261EC4 12752A3F 80260A5E C40001FE 46C75657 WVúF±..á^.&.?*u.á.&*&.7..&*..F.Š 000120
 303CFA46 88078A26 0A5E88F6 280A46FF FFFFFE46 C7087520 3F80260A 5EC49060 '.á^.&.?-u.úF±...F.+-.^.&...F*<0 000140
 1B7F3930 802606E8 F8880030 289C06C7 0675303C 0A752A2C 3639387F 393C3F7C |?<9.;96,*u.<0u.ú..+0..«Š.&.=9.. 000160
 468C0A7E 890F7030 30802647 F18830E9 83C803E1 D1CE0302 E1C1CE88 98058A26 &....òèÀ..öìÅ.à.Ò0.þG&.=0)Ò.-..F 000180
 1D608857 000004C8 C8C95F5E 0C56880A 46883789 26065EC4 F088EEF7 FE46880C ..F±%Ÿ.Þá^.&.7.F..V.^_èüà...W¡'. 0001A0
 FC7E8900 0188F475 00382611 74003D80 264701E8 FC7EC406 4E8AFE5E 8CFC4689 .F=.^±.N.á~=Š.G&.=.t.Ī8.u¶|...-= 0001C0
 1D8406C7 1CE88480 34301084 06C790C8 C95FC028 FE468CFC 7E899009 E8FE468C .F±Š...-=.F±+à_èü.ú...04¯.Š.ú... 0001E0

Dump of file SATURN:[PCCOMMON.DUMP.DLL]BRDNOPL.TMP;1 on 18-APR-1990 10:37:32.99
File ID (520,34,0)   End of file block 272 / Allocated 272

Virtual block number 228 (000000E4), 512 (0200) bytes

 FF047400 1DFA3E83 8A803031 1D8406C7 08E88180 31301084 06C712E8 83803330 03¯.Š.ú...01¯.Š.ú...10¯..>*..t.. 000000
 88147532 609A1080 8811372C 5C9A1D86 A3E42A32 311D8406 C706758C 3C1DF81E .½.<.u.ú...12*ðÈ...\,7.£...'2u.¡ 000020
 3E88C314 922C029A 1D8636FF 14862C86 9A50FFE4 051D86A1 147D2C86 9A5000FD ».P.Ñ,).À...ð.P.Ñ,...6.......û.> 000040
 D9D1FAD1 D8D1D9D1 FAD1D8D1 D9D1FAD1 29747F80 C2F7C033 0254880C 88FC1F7A z.=...T.3à%ð..t)Ì*ÌÌÌÄÌ*ÌÌÌÄÌ*ÌÌ 000060
 88EAE8D0 8AC888C3 F7880655 89044D89 02458900 0005C738 00C2818F E680D8D1 ÌÀ.Ì..ó.8ú....E..M..U..%ü.à.ÅŠð. 000080
 D3D1E2D1 D3D1E2D1 D3D1E2D1 F88AADDC 8AF08AAD D48AC80A ADC888AD FC1F7A3E >z.=Ù.âÙ.à.âÙ.Þ.ÉÙ.½ÌâÌÆÌâÌÆÌâÌÆ 0000A0
 E0D1E0D1 38723800 20307747 E0307FF0 25E922EC 8AF90A80 8101CA80 0374CD0A .èt..ò.Ý..*.$"Õ%Þ.=ÁGw=-.8r;ÌÀÌÀ 0000C0
 74C00817 747F8030 00800508 73000383 01C68010 7401C6F6 15720777 D13AE0D1 ÌÀ:Ìw.r.-ó.t..ó..Æ.s....=..t..àt 0000E0
 F7880245 890589C0 33FED8E9 C3F78805 89C68AE3 8A024589 E50AC70A 7FE78016 ..Ò..ú.Ì.E..D.ó...%üÒÜ±3á...E..% 000100
 79C008C3 8800880 8811E80A F7157902 08083300 881DE8C3 88D088DA 88D233C3 ü30.Ò.Å.üŠ..Å3Ü.0y.%ÒŠ..Ò.Å.û.ây 000120
 08083 3C8 881DE8C3 88C888DA 88D23304 74E99E84 8024C48A 00D8830A F7D8F707 .%ÜÒ.Ü..á$.Ç.Òt.30.Ò.à.üŠ..à3Ü. 000140
 D233FF33 8024C48A 00D88309 F7D8F707 79C008C3 88C888DA 8811E8D9 F71579C9 èy.%1Š..ó.à.û.ây.%Ü%1.Ü..á$.3.30 000160
 D1677500 0283C0D1 0026E803 E80035E8 08E8002B E800E800 3AE807B5 E9856080 §'.Òç.Ò:.Š.Ò+.Š.ÒŠ.Š.ÒŁ.ìá.0.ug1 000180
 2CE800E8 002CE8C3 4E75020B 0039E803 E8005DE8 08E8003E E800E800 9CE8C3C8 àüÒ..Š.Ò>.Š.Ò].Š.Ò9..0uNüÒ,.Š.Ò, 0001A0
 C2D10001 83000283 F508F7D2 F7D1F700 79FF08C9 330041E8 03E8007B E808E800 .Š.Ò(.Š.ÒA.3è..y.%1%0%A%.0..1.1ò 0001C0
 C3130813 F581F980 C00AE822 01850833 001CE803 E80056E8 C3CAD121 75000183 .1.ul ìòüÒV.Š.Ò..3Üç."Ò.ë.'.%.Ü.û 0001E0
```

```
Dump of file SATURN:[PCCOMMON.DUMP.DLL]BRDNOPL.TMP;1 on 18-APR-1990 10:37:32.99
File ID (520,34,0)   End of file block 272 / Allocated 272

Virtual block number 229 (000000E5), 512 (0200) bytes

 80F1220F B6F98B0F EE8391AD 91AD93AD 060A92AD 00A4E9FD E9E9C301 72000283 .0.r.úÕÕ»ÕÉ.Ù..øÙ.Ù.Ù..Ÿ..¹Ñ.™þ. 000000
 E825E983 CA7F20F9 83787203 FEE981D8 74C908E9 D1E9D1E9 D1E9D17F E58010CE ö..|.1Õ1Õ1Õ1Õ.ètÄ.Õ±.rx.ª .ò.ÕX$ 000020
 08DCD0F9 D1D0E4D0 7FE183F9 8BE98A04 EE83C186 ACC88AAD F88AACDA 8AD2332F /30.Õ¯.¥Ù.à¯.è.Ÿ..Õ.ª.Ã.ÃÕÅ1ªÃÉ. 000040
 01E28002 D0F501FA 801A7C08 F98D09F7 20E98399 7F20F983 47727EE9 804D74C9 ètM.Õ~rG.ª ...Õ %1.ª.|..ª.%Ã0.Õ. 000060
 D1D801EE D0000A80 018201FA 8015E3E1 E808E980 F632E68A C48AF88A DF8AD30A .Æ.Õ.%.á.|2-.Õ.$ÃD..ª.ÿ..Õ.ÃŸ1Ã1 000080
 0068E8FD 35E9C300 88C03300 01800081 F9C3C388 D088CA8A F3E200D2 800AD008 ÙÃÕ.0.Ãµ.ò.Ã.Õú¹Ÿ..1.3á.ÃÚÕ5»Õh. 0000A0
 C3FE8806 7C89E073 7FF0FA81 7FE680D7 8810EF83 067C031F 7A368801 31E80780 ¯.Õ1..6z..|..ÿ..ø.Ì..ªÞ.øÃ.|..±û 0000C0
 737F80FA 817FE680 D7880080 EF81027C 031F7A36 880108E8 03800087 E8FD0FE9 Õ.»Õ..¯.Õ...6z..|..ÿ...ø.Ì..ª..ø 0000E0
 EF811F7A 36880053 E8C3FE88 067C0110 EF831F7A 3688001E E8C3FE88 027C89DF Õ.|..±ûÕ...6z..ÿ..|..±ûÕS..6z..ÿ 000100
 00108A1F 7A3688C0 8EA5A5A5 A5C18ED9 8CC08C1F 7A3E88FC C3FE8802 7C010080 ...|..±ûª.>z..à.\.éÉÉÉ.à.6z.¤.. 000120
 E901E901 E901E901 0035887F E580CF88 F0E78306 4C89CA0A 0FE183F9 88064C88 .L..ª.Ã..ò.L..ÕÞ.ü.|.¡5.1Õ1Õ1Õ1Õ 000140
 1F7A3688 C08EA5A5 C18ED98C C08C1F7A 3E88FC00 82E93FE8 D9F7047D 0433E981 .Õ3.}.%1$7Õ..ø.>z..à.1.éÉÉ.à.6z. 000160
 32C08AE1 D1001888 7FE580CF 8880E783 024C89CA 0A7FE183 F988024C 8800808A ¤...L..ª.Ã..ò.L..Õ..ü.|.¡..1Ã.ë2 000180
 00E581EF 88C8880A 74C838FA 008000E7 81147CEF 88C83BD9 F7487D00 96E981ED Ú.Õ..)H%1;à.ÿ|..Õ...ª;àt..à.ÿ.Í. 0001A0
 348AE7E8 4608E980 0004C614 0A000280 0082F501 FA80147C 08F98002 33EA2880 .+õ3ø.ª.|..ª.Ãÿ..ø...ó...Õ.FSÕ.4 0001C0
 D106E3E1 8AEF8A00 0188C334 8AD188C9 33C32C88 E822EE8A D7C18A1D 8A8B0CE3 D.É...èø.Ÿ"Õ.,ú3è.1.4úÉ...ÿ.ÃD.1 0001E0

Dump of file SATURN:[PCCOMMON.DUMP.DLL]BRDNOPL.TMP;1 on 18-APR-1990 10:37:32.99
File ID (520,34,0)   End of file block 272 / Allocated 272

Virtual block number 230 (000000E6), 512 (0200) bytes

 981F7A0E 88E203CC 9AFD8802 7400DA80 018281FA 80030ADE 22D70AFA E207D0EA õÃøã¹.ø"B.Æ.ª.ÿ..Õ.t..».øÆã..z.. 000000
 CC80F8C8 E9C3F5D3  14C747F 80C3F7C3 FAE20014 804606E3 3488F202 CE28C803 .à+ö.·.4D.F...ã¹ÚÃû..tL1Æ%ÚÕà«.ä 000020
 F77F80C3 F7D3F7E2 74D0F77F 80A9D0F7 E1747F80 A9025D88 26024488 C3E4D07F .ÃÕû.D.&.].`..tÃ%Ã`..%ÃtÃ%Æ%û..% 000040
 04880575 C3380A8E C18E098C C28CF787 930873E0 D1E3D1D5 78EF32EC 8AD874D3 ÆtÃ.á2ÿx{1D1Ãs...%.ô.).è.Õ;ûu... 000060
 F0A90650 88260644 88C3E400 7FCC80F8 75E9C3F5 D3015E74 7FF0C3F7 C3053826 &;.úÃûÞ.t^1Æ%ÚÕu«.ä.ÃÕû.D.Å.].`Þ 000080
 E0D1E3D1 0578EF32 EC8A0874 03F77FF0 C3F7D3F7 E274D0F7 7FF0A900 F7E1747F .tÃ%Ã`Þ.%ÃtÃ%Æ%ûÞ.%ÆtÃ.á2ÿx{1D1Ã 0000A0
 45382602 44880E75 04453826 04448817 75C3380A 8EC18ED9 8CC28CF7 87930873 s...%.ô.).è.Õ;ûu..D.&;E.u..D.&;E 0000C0
 80CF8000 82358A01 5D880245 8803E880 F4800245 88F787C3 05382604 88057502 .u...&;.û.%.E..¶.Š..E..]..5ÿ..ü. 0000E0
 73EC3A58 74E40A65 74ED0AC0 D1C1D180 00CE81FF 00E78101 7488FF7C 88024C88 .L..|..t..Õ...ö..1é1à.Ûte.ôt[:às 000100
 7C0EF980 55E300B5 CD8A9109 D0E8D0C9 00497718 FC80DCF6 E52A91FA 87F38705 ..µ.¹.ª1-É.ø.w1ÃèÃÕÃ1..èç.DU.ª.| 000120
 8A01CE80 0374D20A 287E05F9 803E741D 7210E980 D8330388 01C88003 74D20812 ..øt..ù..Æ3Ù.Õ.r.t>.ª.-+.øt..ö.. 000140
 E8D0C188 D788DE88 19E8F875 C1FED3D1 E2012374 177708E9 80FD8ADF 8AF38AD6 ø.µ.Õ.».Õ.w.t#1ã1Æ±èu%$..ß.ø.éÃÕ 000160
 13D70314 70E0D020 CA800374 3FC2F6FA E20AD1E8 D120CA80 03743FC2 F60097E9 Õ..-ô?t..ò 1$1Õã¹-ô?t..ò ÃÃp..ø. 000180
 F5DAF7D3 F70A730E 88D788F3 18FA28FA 41E94575 FFFC80C4 FEDAD1D8 D150730E BsP1Ù1Õ±é.ø.uÉÕA¹+ª.µ.ø.Bs.%Æ%Õ% 0001A0
 8AF88A58 7608EC80 0F75FF0A 6474D808 DA876A76 10EC8008 75D80800 F6000383 .Æ.-Ã.Ûu..$.vj.Õ.Ûtd..u..$.v[.«. 0001C0
 80FA8001 7CE90374 0010923E 80F67103 D1E2D148 74CCFE0A 78FF0AD2 32F28ADE ß.·2ø..x.±ätK1ã1Æq-.>...t.Õ|..ª. 0001E0

Dump of file SATURN:[PCCOMMON.DUMP.DLL]BRDNOPL.TMP;1 on 18-APR-1990 10:37:32.99
File ID (520,34,0)   End of file block 272 / Allocated 272

Virtual block number 231 (000000E7), 512 (0200) bytes

 747F80A9 D8D1E0D0 3A74FFFC 80C4FE07 73000383 01C6800F 7401C6F6 14720777 w.r.-ó.t..ó..Æ.s.±á.ø.t:ÃÃ1Ã`..t 000000
 E9037400 1D923E80 C3F78805 89C68AE3 8A024589 1F7A3E88 C70A7FE7 80802417 .$..Õ..ú.>z..E..D.ó...%û.>...t.Õ 000020
 E40AD8D0 E0D19634 88ADFCF9 9DE9E679 C3F78805 89024589 1F7A3E88 C033017E -.3à.>z..E....%ûÿ1Õ.ª»Ù.4.1ÃÃÃ.Õ 000040
 80C480D3 70E5027F ED8080EC 80C13208 883D88C8 74ED0AD9 D0E1D102 40880674 tø.M.1ÃÃ1.Ûtù.=.Ã2è.$..Ù..1pÆ.á. 000060
 E7F7C588 509FC008 DA88E7F7 C688E888 80C98080 C880EF8A FF3250CD 74FFFC80 .ø.tèP2..ÿ.ù..è..Š.óÆÕ.Õ.à.P.é%Õ 000080
 58930388 C703E1F6 C58801C8 8003749E 58FA1308 03E6F7C1 88FA8800 D2830803 .Ã.ø..ª.éÆ1.Ã.ªX.t..ù..é-Ã.ú.Æ.X 0000A0
 E1D1024D 88F787FF 1AE9AD74 FFFC80C4 FEFF69E9 0A75E40A 0301E201 0878FF0A ..x.1ã1Æ.ôu.Õi.±á.ø.tÜÕ...%.M.1Ã 0000C0
 FF78E903 71E52A7F ED8081EC 80C13208 74E40A5C 74ED0AD8 D0E0D102 4488D900 Ã1.D.1ÃÃÃ.Ût\.ôtÜ2è.$..Ù.*1q.Õ(. 0000E0
 D9D1E801 0874001D 923E8080 CF80C932 208A015D 88FF78E9 0375FFFC 8080C480 .á..ø.u.Õx..]..·2è.ü..>...t.1$11 000100
 74D688C2 080011E8 EE88001A E8D8D1EA D180CE80 C032248A 01548850 10923E02 .>..P.T..$2á.ö.1õ1ÃÕ...ŸÕ...ô.øt 000120
 18D8F7E1 F7C688FA 8815E3C0 3396F3F7 10730338 F880E9FF 76E9D088 01CA8003 ..ò..1Õv.Õ¯½;Æs.%µ.3ÃD..ª.ó%Ã%Ã. 000140
 2E8A001D 9206C6C3 ED73C188 D003C128 FFFF8EC3 F9730313 C1034E07 730788FA ª.øs.N.è.Æs¹ú/..+ê.Ã.èsÚûó...... 000160
 D2335253 5010951F 7A06C71F 7A36FF38 74E40A3C 77EC3A0E ED800774 ED0A1D94 ...Ût..Ù.:åw<.ôt8.6z.ú.z...PSR3ø 000180
 FE33E91F 7A068F58 585AFE0F E8FF3252 53501D99 1F7A06C7 585B5AFE 4EE8D832 2ÙÕN±Z[Xú.z...PSR2.Õ.±Z[X..z.Õ3± 0001A0
 97A31D95 A3C033FE 1AE85253 5010991F 7A06C71F 7A36FF1D 92A2D233 D833C033 3à3Û3øÃ...6z.ú.z...PSRÕ.±3àÉ..É. 0001C0
 E60A80E6 807FE480 ADA5A5A5 1F7A3E88 F7881DE8 8000F581 066D88F7 87D3E81D .$Æ.%.m..%..Š..%.>z.ÉÉÉÙ.õ..1..1 0001E0
```

```
Dump of file SATURN:[PCCOMMON.DUMP.DLL]BRDNOPL.TMP;1 on 18-APR-1990 10:37:32.99
File ID (520,34,0)   End of file block 272 / Allocated 272

Virtual block number 232 (000000E8), 512 (0200) bytes

 3BE0E583 D274FFE0 250AD0E0 D1DED0E5 D10644B8 FC0660B8 C3FE881F 7A3688AB ".6z..±û.m.•.D.1IÅ81ÅÅÒXÅ.t@.IÅ; 000000
 C0D157D0 D1E2D0DD D1E60D89 7706A030 D8F7C52B C274C00B D68695F7 870977E8 Òw..%..•.åtò+é%Å=..w¿Å]|1Åã1lWlà 000020
 0EFF8363 74FF0810 CC800FE4 80AD93AD 91AD92C0 32E08AAC F888E086 C0D1C0D1 1à1à.Å.%¯.Å2à.Ù.Ù.Ù.Ô..ä...tc... 000040
 0A2B7C06 FF832372 4874E777 10EF83C0 330888C8 88D18801 C9800374 D208187C |..@t..è..1.ù.Å3à.ÿ.wÒtHr#...|+. 000060
 D1E2D123 740F7708 EF83E432 C48AF88A DF8AE88A CD8AF18A D68A01CE 800374D2 @t..ö..•.þ.ë.Š.Ô.%.á2ô.ÿ.w.t#1ã1 000080
 CF87F6E2 DAD1DFD1 DBD1E8D1 20CA8003 743FC2F6 CF8716E8 F57547D0 D1D3D1D1 1I£1ÅGu%Š..ü-ô?t..ò 1Ò1Ù1Ò1Òã-.ü 0000A0
 05748850 9F50035C 13014C13 3402D8D0 E5D13B70 E5D120CA 8003743F C2F6975E ^.-ô?t..ò 1Ip;1IÅÅ.4.L..\.P.P.t. 0000C0
 FD8320C5 830AD1D9 D1DBD1DF D1137420 00C7F7FE 13589E58 1000CE81 0FFFE681 .Ì...ö..X.X.±%ú. t.1Ò1Ù111Ö.é .» 0000E0
 810FFFE6 819F0574 88035C18 014C1834 2AD0F6D8 D0E5D100 88E9F6EC E90375E0 Åu.Ô‡-Ö..1IÅÅ-Å*4.L..\..t...[... 000100
 080004BE FCFE130F 13CE13F5 DAF7D1F7 D3F7D7F7 D0F6F633 1373FE18 9E1000CE ö....±s.3--Å%m%£%1%Ö%.ö.8.±=/... 000120
 751FE0C7 F7E4EBD` 33CA88D9 88F88830 744E4076 0200ED81 1375E0C7 F61875FF .u.-üÅu..Ù..vâNt=.«.1.ô3@ŠÕ%üÅ.u 000140
 83127510 00C7F797 0082F28A CE8AE98A D08AF88A C78AE08A 97277601 00ED8118 ..Ù..v'..Å.ú.«.Ì.Ò.ö.·ÿ..%ú..u.. 000160
 7780FA80 0385E903 74001DAA 3E80FC90 65EBEBEB 07D1D301 D1D1E2D1 717420ED Ú tq1ã111£1aŠŠŠe.•.>¯..t.Ô...•.w 000180
 E0FD8320 C5830874 2000C7F7 00D78300 D3830001 8301C680 1A7401C6 F61F7207 .r.-ó.t..ó..1..Æ..•.%ú. t..é .»Å 0001A0
 5D880645 89C70AC5 08C032E0 862274E0 D10FE780 8024DE87 1F7A3E88 F7883074 t0.%.>z..8$..Ô.1Ùt".Å2à.é.ú.E..] 0001C0
 0377E903 74001DAA 3E80FCF5 FDE90379 C3F78805 EF83A8C6 88ABC188 AAC68A05 ..ó^.è¨.ó¨.ÿ..%úy.Ô»%•.>¯..t.Ôw. 0001E0

Dump of file SATURN:[PCCOMMON.DUMP.DLL]BRDNOPL.TMP;1 on 18-APR-1990 10:37:32.99
File ID (520,34,0)   End of file block 272 / Allocated 272

Virtual block number 233 (000000E9), 512 (0200) bytes

 81D13306 4D880874 7FF025D0 88064488 FCC3FE88 ABABABAB F7881F7A 3E88C033 3à.>z..%¨¨¨¨¨.±ü=.D..ÅXÞ.tÙ.M.31. 000000
 D8D1E600 8674FFE0 30800005 8C70C103 7FE0E981 80002DE1 D1E0D1D0 747FFFE1 ÅÞ.tÅ1Å1Å-...ÔÅ..ëp#...=Å.tRÅ11Å 000020
 0A75ED08 D7D1D301 D1D1E2D1 0E751000 C7F7D8D0 E5D15D01 CA800374 0181E850 PÒ..t..ò.]11ÅÅ%ú..u.1ã111£1•.Ùu. 000040
 4488EF74 7FF0E181 D1880640 88FCF787 F58CE9FF 24E98874 E0FD8320 C58393E8 Š..é .»Åt.Ô$.Ô.%.%•.M..1.ÅÞ.tÿ.D 000060
 D09B74FF E0308000 359B70C1 2B7FE0E9 8180202D E1D1E0D1 9B747FF0 25D03306 .3ÅXÞ.t.1Å1Å- ..ÔÅ.+èp....=Å.t.Å 000080
 ADFD1DA8 8F05C683 F7885092 10CC800F E480AD92 AD93ADC9 32E88AAC 500801E6 |1ÅP¯.Ò2èÙ.Ù.Ù.Ô..ä..P.%.ó.€´.»Ù 0000A0
 E888ADF7 881DA88F FD1F7400 1DAA3E80 0005C6FC A44746A5 A5A810CC 800FE480 .Ô..ä.¨EEFGÈ•ó...>¯..t.»€´..%Ù.Ò 0000C0
 E8D901D8 D1D8D1EA D158FCA8 D8D1ADA8 D8D1ADA8 D8D1ADED D1A81DAA 2602E8D1 1Ò.&¯.¨1ÙÙ1Å¨Ù1Å¨Ù1Å¨•X1Ò1Å1Ù11Ò 0000E0
 C2F601CA 8003745F 5859D788 C208C108 C3080033 E8570037 E8570038 E857003F ?.WÒ;.WÒ7.WÒ3..ü.è.ô.•Y[ t..ò.-ô 000100
 08E9DAD1 D9D1D8D1 EFD1DAD1 D9D1D8D1 EFD1DAD1 D9D1D8D1 EFD108CA 80037407 .t..ò.1ÿ1Ù111Ò1ÿ1Ù111Ò1ÿ1Ù111Òô. 000120
 C0081DA2 A1F588ED 339752F6 F73877F0 38047502 085C7306 38FF331D A83688FF ..ó´.3.;•s\.@u.;Þw;%-R.3Ù.%ÅÅ..à 000140
 83E803E7 F70874C0 081DA6A1 EA13F003 E7F70674 C0081DA4 A150F288 E7F70474 t.%Ò.·PÅÈ..ât.%Ò.Þ.ôÅ1..ât.%Ò.Ò. 000160
 1DA60613 1DA41E13 1DA20E03 4F137393 919295E8 185000D18 CE18DAF7 5A9200D2 •..Z%Ò.ö.1].Ò....s.O..Å...Ê...Ì. 000180
 1688C213 1DA61E13 1DA40E03 1DA60618 1DA41E18 1DA20E28 4FC3ED73 1DA81613 ..´.sÙÛO+.Å...Ê...Ì...Ê...Ì..ó.. 0001A0
 88E88808 3310A0A3 100C0F24 06458A1D 9EA3100C 0F24E432 06448AC9 EBF51DA2 Å.%Šè.D.2ô$...Ê...E.$...Ê..3Ù.Š. 0001C0
 ED33550A 13C803E2 F70674D2 08025588 0488CA88 E888E1F7 08E30D88 911AE30C .D....D.%Å.Ò.ò...U..@t.%ã.à.ÒU3Ù 0001E0

Dump of file SATURN:[PCCOMMON.DUMP.DLL]BRDNOPL.TMP;1 on 18-APR-1990 10:37:32.99
File ID (520,34,0)   End of file block 272 / Allocated 272

Virtual block number 234 (000000EA), 512 (0200) bytes

 0074C008 02448850 C1085805 D10A13C8 03E2F708 74020815 880E74C0 08024488 .D..ât....@t.%ã.à.Ò11X.èP.D..ât. 000000
 D803E2F7 0874D208 0455880F 74C00804 88C933EA 130803E2 F70674D2 08025588 .U..@t.%ã.Å.ò3è...ât..U..@t.%ã.Å 000020
 048850C3 08580001 83EA1308 03E2F709 74020815 880F74C0 08044488 D1D1EA13 .ô11.D..ât....@t.%ã.Å.ô.1.X.ùP.. 000040
 08024488 0833CA13 E803109E 26F70874 C008058B CA13E803 1DA026F7 0874C008 .ât.%£...Ò.ò...ât.%£...Ò.ò3Ù.D.. 000060
 09740208 02558810 74C00804 44880301 CA13E803 E2F70874 D2080455 880F74C0 ât..U..@t.%ã.Ò.ò1£.D..ât..U..@t. 000080
 C0080244 880A13C8 031D9E26 F70874C0 08024588 ED335500 D383CA13 E803E2F7 %ã.Ò.ò.£.U3Ù.E..ât.%£...à.Ö.D..à 0000A0
 D5D1DA13 C803E2F7 0874D208 0455881A 74C00804 4488DA13 C8031DA0 26F70874 t.%£...à.Ö.D..ât..U..@t.%ã.à.Ò11 0000C0
 A026F61D 9EA0EA13 D803109E 26F70874 C0080445 88EA1308 0310A026 F7044488 .D.%£...Å.ô.E..ât.%£...Å.ô...-£. 0000E0
 F6085ED7 D1D3D1D1 D1E2D107 D1D3D1D1 D1E2D107 D1D3D1D1 D1E2D15A 97C5031D ..é.Z1à111£1•1ã111£1•1ã111£1•^.- 000100
 06C71F7A 36FF4C74 ED085077 F53804C0 EE810874 F6081DA8 3688001D AA06C6C3 ùó.´...ó¨..-t..Yà.;%wP.ÙtL.óz.ú. 000120
 501D851F 7A06C758 595A5850 5FFC3EE8 D233C933 D8335755 53525150 1DAD1F7A z.Ù.PQRSUW3Ù3è3@Ò>•_][ZYXú.z.ç.P 000140
 330B3302 33C933C0 33FC1AE9 1F7A068F 58595A58 5D5FF8D1 E8FF3357 55535251 QRSUW3.Ò1«_][ZYX..z¯Ô.•3à3è3@3Ù3 000160
 A8ABC033 1DAD8FFB F8E85755 53525150 1D851F7A 06C71F7A 36FF1DAA A2FF33ED Ù3.Å¯..óz.ù.z.ç.PQRSUWÒ%«€Ù.3ä¨¨ 000180
 56EC8855 08EBA536 A536A536 A5361DCC BF0E7680 071EFC57 56EC8855 C6L°ABAB ¨¨¨$óU.$VW•...v.€ä.6E6E6E6EŠ.U.$V 0001A0
 1F7A06C7 1F7A36FF 1DCCBF1D C4BEA536 A536A536 A5361DC4 BF067680 071E`C57 W•...v.€ó.6E6E6E6E/ó.€ä..óz.ú.z. 0001C0
 C01E89C8 8AC933C8 50E5885E 5FDA8C1D D4880872 1F7A068F 585D02FF 55531`D4 à.SU.@][..z.r.¡à..Ò_^.[]ù3è.à...à 0001E0
```

```
Dump of file SATURN:[PCCOMMON.DUMP.DLL]BRDNOPL.TMP;1 on 18-APR-1990 10:37:32.99
File ID (520,34,0)   End of file block 272 / Allocated 272

Virtual block number 235 (000000EB), 512 (0200) bytes

 0C74073C 127403FC 8010048F 0110E806 C6057503 0230001D EB06C61D C21E8C1D ...6.6.$..=..u.6.$..e&..=.t.<.t. 000000
 A526E8BE 07E8801D 080E80A5 A5A5A526 E88E0301 17E8ABA8 ABABC033 1874033C <.t.3a     $.Y./O&EEEE..U..$./O&E 000020
 1DEB3E80 21B09475 C00B04C4 83149B32 C59A501D BEB81EF1 881D8E0E 89A5A5A5 EEE../..p.|/.P.62...a..au.¯1.>$. 000040
 9A4B10C0 1E881874 F60B1D0A B48BE6D1 239EA398 22B00272 0310BE3E 83077500 .u..>/..r. ".E.#11.CO..-t...a.K. 000060
 FE881F7A 3688C3F9 050188FF 59E922CA 2CB69A56 22C23260 9A1DE8BB 22913260 '2."EO..'26"V.A,o"OY.|..'u.6z..± 000080
 E020D778 FFF025E1 747FF0A9 F88A0644 88270ABF FCC3F8FE 88ABF300 04B9C033 36¿..µ¨.±%u•e.'.D..%`p.tAXp.x=-A 0000A0
 80CF80D3 D1D1D1E2 D1030101 D1E20103 D1D1D1E2 D1560154 88034C88 055C8A3F ?.\..L..T.V1a111£1a111£1a111£.u. 0000C0
 B1B85236 EBF90372 FEF88306 45893FE0 05F8D10A D109D1E8 D1001005 097410A8 ´.t....1$1101%.A?.E..«sr.'$6R|Y 0000E0
 EB13F9F5 F7C18803 880001E8 03F5F7C0 330388FF FFB00373 EA0357D8 80E3F7AF €%D$AU.6s.§...£3a%%.O11.£.e%%'.O 000100
 D10301E1 D1000103 D1E101C0 330E03C8 880088F5 F758F088 F5F7C188 03880001 11.£.e%%.p%%.1.a.a3a1A1£1A1A1£1 000120
 5FF813E8 575E0000 05C7024D 89045089 06450800 D10301E1 D1000103 D1E101D0 A1A1£1A1A1£1A.E..}..M.u...^WO.«_ 000140
 0125C187 F6D88898 078A2606 5EC45657 04EC83EC 885500C3 F810066D 83F8A5E8 OE%.m..%u.U.$.$.WVa^.&....A-.e%. 000160
 058A2647 FB881674 00653098 078A2606 5E8807E8 00200598 078A2606 5E880C74 t..^.&.... .$..^.&...=e.t..«G&.. 000180
 2E07C626 0646FFF0 8B98078A 26065EC4 08468C06 7E89F275 0425C187 F6D88898 ..A-.e%.u·.-..F.6^.&....p.F.&6.. 0001A0
 CB5DE588 5F5EFC7E 89E975C0 0A0646FF F7880788 26C688F8 889807BA 26065E88 .^.&....%.6&...%.F..auO.-=^_.|]u 0001C0
 468C067E 89F37500 30802647 07742E30 80269008 EB067EC4 565706EC 83EC8855 U.&.&.WVa~.$..&.=.t.G&.=.uµ.-..F 0001E0
```

```
Dump of file SATURN:[PCCOMMON.DUMP.DLL]BRDNOPL.TMP;1 on 18-APR-1990 10:37:32.99
File ID (520,34,0)   End of file block 272 / Allocated 272

Virtual block number 236 (000000EC), 512 (0200) bytes

 26470774 45308026 00746530 8026900E EB067E88 6774003F 80260646 FFDF8808 ..O.F.&.?.tg.-.$..&.=et.&.=Et.G& 000000
 264F9002 EB067E88 FE5689FC 4689064E FFC28CC7 8808468C 067E89ED 75003080 .=.uU.-..F..u.o.N..F=.V±.-.$..O& 000020
 C40646FF FC76C5FA 5E8C064E FF03752E 3F80260F 8808468C 067E89F9 74303080 .=0t'.-..F..O&.?.u..N..^'ev=.F.A 000040
 541E8DEC 885590CB 5DE5885F 5EFA5E8E FE5E8CFC 7689F275 C00A0788 26AC065E ^.¯&...au·.v=.^±.^'^_.|]u.U.$..T 000060
 8855CB50 C02BCB50 00018805 7224F506 D69A24D1 02369A06 5EC424CC 02569A28 (.V.a$6^..6.1$.=.%$r¯.|..]u+a]iJ. 000080
 88FB8808 5EC404C4 83251930 069A0C76 FF0E76FF 24740006 7E835657 08EC03EC &.&.WV.~..t$.v..v...0.%.6.6^..«. 0000A0
 7E8004C4 83253330 069A0C76 FF0E76FF 90CB5DE5 885F5E1F A5A5A5A5 DA8E:'F0 p..OEEEE.^ .|]u..v..v...03%.6..~ 0000C0
 885F5E25 AF03A99A 085EC425 3802569A F85E8D1F A5A5A5A5 DA8E1E07 16F086F8 %.p....OEEEE..^%.V.;%6^..`.£%^ . 0000E0
 FA5689F8 468928A0 1688289E A1477400 1DF23E80 56570AEC 83EC8855 90CB50E5 |]u.U.&.&.WV.>·..tGA.+...+.F%.V' 000100
 000E7E83 FE5689FC 46890C56 880A4603 C02802EB 00018805 75203F83 26F85EC4 6^%&.?-u.|..$.+a.F..V..F=.V±.-.. 000120
 77FF2606 5EC458EB 06C48304 5DE80EFC 76FFFE76 FF50C02B 9003EB00 0188067E ~.|..$..+aP.v±.v=.O]..a.$Xa^.&.w 000140
 400E4688 5052FA56 89F84689 08C48325 ED327A9A 37FF2602 77FF2604 77FF2606 .&.w.&.w.&.7.z2U%.a..F%.V'RP.F.a 000160
 C02802EB 00018805 75203F83 26F888F8 5EC4C02B 02E80001 88057E00 0E7E8350 P.-..-.|..$.+a6^%.%&.?-u.|..$.+a 000180
 5EC4FE56 89FC4689 0C56880A 46880AC4 83264730 5C9A5052 0C56880A 4603C703 .u.F..V.RP.\OG&.6..F..V..F=.V±6^ 0001A0
 88260147 8A26FC5E C4147E00 0E7E832D 07C626FC 46FFFC5E C40A752D 3F8326F8 %&.?-u.6^=.F=&6.-.-..-.6^=&.G.&. 0001C0
 88FC4603 0E460308 F7C01801 1DF23E80 501E1DEC 882E07C6 26FC5E88 FC46FF07 ..F=.^=&6..|$..P.>·...a%A.F..F=. 0001E0
```

```
Dump of file SATURN:[PCCOMMON.DUMP.DLL]BRDNOPL.TMP;1 on 18-APR-1990 10:37:32.99
File ID (520,34,0)   End of file block 272 / Allocated 272

Virtual block number 237 (000000ED), 512 (0200) bytes

 FF4507C6 26FC5EC4 07740010 7E83FE56 89FC4689 08C48327 812F889A 5052FE56 V±RP.|/.'.6..F=.V±.-..t.6^=&6.E. 000000
 8B08F708 7DF608F0 88480247 8826F85E C45E7430 3F802606 5FC426F8 5EC4FC46 F=6^%&6_.&.70t^6^%&.G.H.p.-}.%A. 000020
 C68B0700 26FC5EC4 F9F70064 8999C688 157C64FE 83FC46FF 2D07C626 FC5EC4F0 pa^=&6.¯.F=.±d|..6.¿d.%'6^=&...6 000040
 F9F799C6 88070026 FC5EC4F9 F7000A89 99C68815 7C0AFE83 FC46FFF2 88F9F799 .%'.·.F=.±.|..6.¿..%'6^=&...6.%' 000060
 04EC83EC 885590CB 5DE5885F 5E0C5688 0A468807 0026C688 FC5EC4FC 46FFF288 .·.F=a^=.6&...F..V.^_.|]u.U.$.$. 000080
 5689FC46 89FE49E8 0E0676FF 0876FF0A 76FF0C76 FF0E76FF 1076FF01 1DF206C6 6.·...v..v..v..v..v..v..Ol±.F=.V 0000A0
 1688289E A1517400 1DF23E80 00F246C6 12EC83EC 8855C850 E5880010 F206C6FE ±6.·...|]iJ.$.$.6F·..>·..tQA.+.. 0000C0
 46890C56 880A4603 C02802EB 00018805 75203F83 26F45EC4 F65689F4 468928A0 .+.F¶.V-6^¶&.?-u.|..$.+a.F..V..F 0000E0
 26EE46FF EE5EC4F0 5689EE46 891DF406 03FC4688 6A750E46 391DF4A1 FE5689FC =.V±A¶.9F.uj.F=..¶..FY.Vp6^Y.FY& 000100
 7A9A37FF 260277FF 260477FF 260677FF 26065EC4 4AE80007 C626EE5E 883007C6 6.0.^Y&6..$J6^.&.w.&.w.&.w.&.7.z 000120
 88057520 3F832650 0E460302 478826F4 5EC45052 F65689F4 468908C4 83278132 2Y'.6..F¶.V-RP6^¶&.G..F.P&.?-u.| 000140
 89FC4689 0C56880A 46880AC4 83220030 5C9A5052 0C56880A 4603C028 02E80001 ..$.+a.F..V.RP.\OA".6..F..V..F=. 000160
 88107F00 027F8326 F45EC42D 07C626FC 46FFFC5E C40A752D 3F8326F4 5EC4FE56 V±6^¶&.?-u.6^=.F=&6.-6^¶&......| 000180
 26F45EC4 0AE83007 C626FC46 FFFC5EC4 06C48302 05E80EFC 76FFFE76 FF500001 ..P.v±.v=.O...6.6^=.F=&6.0$.6^¶& 0001A0
 FC5EC406 C48301D8 E80EFC76 FFFE76FF 500001B8 687E000E 7E83FC46 01024788 .G..F=.-..-h|..P.v±.v=.OA..6.6^= 0001C0
 0EE8D8F7 02478826 08740010 F23E8043 7D00027F 8326F45E C42E07C6 26FC46FF .F=&6..6^¶&....)C.>·..t.&.G.%A$. 0001E0
```

Dump of file SATURN:[PCCOMMON.DUMP.DLL]BRDNOPL.TMP;1 on 18-APR-1990 10:37:32.99
File ID (520,34,0)   End of file block 272 / Allocated 272

Virtual block number 238 (000000EE), 512 (0200) bytes

```
FF06C483 0196E80E FC76FFFE 76FF500E 46890E46 8B037E0E 463B08F7 02478B26 &.G.%Ä;F.~..F..F.P.v±.v•.Ò...ó.. 000000
8B55CB50 E5BB0C56 8B0A468B 08C48328 C832189A FC76FFFE 76FF5000 30B80E76 v.¡0.P.v±.v•..2à(.ó..F..V..Ì]ÙU. 000020
89FC4689 FE6EE60E 0676FF08 76FF0A76 FF0C76FF 0E76FF01 1DF206C6 04EC83EC &.&.6.·....v..v..v..v..v..Òn±.F•. 000040
FF260477 FF260677 FF26065E C45606EC 83EC8B55 90CB50E5 8B001DF2 06C6FE56 V±6.·....Ì]ù.U.&.&.Vó^.&.w.&.w.&. 000060
1DF4A348 02478B26 2B9E1EC4 2BA01689 2B9EA30B C4832904 327A9A37 FF260277 w.&.7.z2.).ó.È.+...+ó..+&.G.HÈ¶. 000080
520E76FF 5306FE56 89FC4689 0C568B0A 4603C02B 9003EB00 01B80675 2D3F8326 &.?-u.¡..Š..+à.F..V..F•.V±.S.v.R 0000A0
F6A2C02A 02EB01B0 047D1DF4 36394E02 77B8262B 9E1EC40A C4832A04 305C9A50 P.\0.*.ó.ó..+&.w.N96¶.).¯.Š.*àÀ- 0000C0
0876FF0A 76FF0C76 FF0E76FF 1076FF1F 7F0E4639 C68B077C FCFE831D F436891D ..6¶..±•|..69F....v..v..v..v..v. 0000E0
7C8046FC 76C5FA5E 8C1E7400 1DF63E80 90CB5DE5 8B5E0CC4 83FD93E8 0E0676FF .v..Ò.».à.^.Ì]ù..>-..t..^*év•F.| 000100
76FF0A76 FF0C76FF 0E76FF00 FE47C626 FC5EC4FA 5E8EFE5E 8CFC7689 F97500FF ..u*.v•.^±.^*ó^•&6G±..v..v..v..v 000120
FF197545 0E7E8306 74650E7E 83EC8B55 CB5DE58B 5E0AC483 FEF6E80E 0676FF08 ..v..Ò-±.ó.^.Ì]ÙU.&.-.et..-.Eu.. 000140
76FF1875 660E7E83 9035EBF8 8FE80E06 76FF0876 FF0A76FF 0C76FF10 76FF1276 v..v..v..v..v..v..Ò.«Š5..-.fu..v 000160
FF0C76FF 1076FF12 76FFCB50 0AC483FD 39E80E06 76FF0876 FF0A76FF 0C76FF10 ..v..v..v..v..Ò9».ó.]ù.v..v..v.. 000180
76FF0876 FF297400 0A7E83EC 8B5590CB 500CC483 FEC0E80E 0676FF08 76FF0A76 v..v..v..Òà±.ó.]ù.U.&.-..t).v..v 0001A0
C4314E9A 50520856 8B064603 0A468806 76FF0876 FF504004 C4832A1F 2F??9A06 ..Ÿ/.*.ó.@P.v..v..F..F..V.RP.N1ó 0001C0
EB1E0A1F 7A06C708 74127703 FB83088E 1EEC8B55 45900B8C C88BCB5D 0AC?9324 $.ó.]ù.à.Á.EU.&..Ä.«.w.t.ú.z...Š 0001E0
```

Dump of file SATURN:[PCCOMMON.DUMP.DLL]BRDNOPL.TMP;1 on 18-APR-1990 10:37:32.99
File ID (520,34,0)   End of file block 272 / Allocated 272

Virtual block number 239 (000000EF), 512 (0200) bytes

```
F388C8F3 F60CB31E 0A2D1F7A A1C84050 1FE58802 ED83F810 FA16891D F80E8908 ...%...*.%.Ù..Ì.]MùÀz.-..°.-µù.µ 000000
8EC18ED9 8CC08C10 FC8FF388 C310FC8E D98EA5A5 FCD88EC1 8ED98CC0 8C1DFC8F ¢•..à.).é.Ä•ÉÉ.)ƒ•.Û.µ¢•..à.).é. 000020
0C88C033 FCFC7588 03E807FE 45C6FC7D 89FC7588 C310FC8E D98EA5A5 A5A5FCD8 Ä•ÉÉÉÉ.)ƒ•.Û.u•.)•éÉ±.Š..u••3à.. 000040
024589D8 D10901FA D1D80109 D1FAD1D8 D1D901FA D1058925 747F80C2 F702548B .T.%ô..t%..Ì*ÌÌÌÄÌ*ÌÌÌÄÌ*ÌÌÌÄ.E. 000060
C48850EC 8855C306 45890445 89024589 0589C306 55893800 C2818FE6 80044D89 .M..Ì..ô.8.U.ù...E..E..E.ùU.éP.ó 000080
006CE800 21E80000 FFFF9A1F 7C681E1F 7E681E23 A2A3E086 580000FF FF9A5016 .P.....X.ÁÈÀ#.h~..h|......Ò1.Òl. 0000A0
8B1E1F84 16FF00FF 6828102C 869A2803 2C5C9A50 CB5DE588 00018828 6F34209A . 4o(|...Ì]ùP.\,.+.Ñ,.+h.......£ 0000C0
F3C888D1 8823888E 3174003D 80264701 75003D80 267FFF89 1F7E068E FF33000D ..3...-.¿..&.=.u.G&.=.t1ƒ.#.1.ùµ 0000E0
AC9204E0 C00E7241 2CAC23A9 8F1FF788 071E061C E8E774AE F2C03308 74CA88A6 Ì.òt.3à·ÛtÒŠ.....%.¢`#˜,Ar.àÀ..˜ 000100
9A521650 1653C488 508723A9 A780D488 5200028B 00C31FED E8AAC20A 0572412C ,Ar..ô˜ŠÚ.û.£..R.à.Ì`#ñP.óS.P.R. 000120
8B5AD479 4B23A98F 00088106 7500023D 07740001 3040B112 7558C008 0000FFFF .....àXu.Ÿ@=..t.=..u.Ÿ...`#Kyàz. 000140
FF0003B8 C28C280E 06C400CA E9037328 061EFFD8 33C28C28 0A06C41E E328080E ..(D.ó..(.ô3Ü...(±.Òò.ó..(.ô£... 000160
0E016A08 74281630 28128800 73E82804 8F27FC8E 007CE828 128F2812 8E28061E ..(ƒ.(¢.(Ò|.ƒ•'¢.(Òs.¡.(=.(t.j.. 000180
2BE49A00 6A006A03 6A0051E8 28168F28 128ED88E 0847B8C3 0000FFFF 9A28E968 hÒ+.....û¡G..Äƒ.(¢.(ÒQ.j.j.j..ð+ 0001A0
8F28168E EC885503 E80031E8 28168F28 128E003A E828AA8F 28AA8EEC 88550000 ..U.&ƒ˜+¢˜+Ò:.ƒ.(¢.(Ò1.Š.U.&ƒ.(¢ 0001C0
07E32808 0E880000 FFFF9A50 06468A50 C033001A E828168F 28168E00 23E82816 .(Ò#.ƒ.(¢.(Ò..3àP.F.P.......(D. 0001E0
```

Dump of file SATURN:[PCCOMMON.DUMP.DLL]BRDNOPL.TMP;1 on 18-APR-1990 10:37:32.99
File ID (520,34,0)   End of file block 272 / Allocated 272

Virtual block number 240 (000000F0), 512 (0200) bytes

```
B8EC8B55 00C3EEEB 1DFFF274 02450805 8804EF83 0E73F738 C328061E FF0002BB £.....(û;%±..ÿ....E.t·..ŠŸû.U.&¡ 000000
CB50E588 2C662CB6 9A5000FF 8825BA1E FF047400 258C3E83 28152CB6 9A5000FC •.P.Ñ,.+.>¥%.t...¤%¡..P.Ñ,f,.Ì]ù 000020
74964010 74C23BAD 28648E06 5688C08E 088E28EA 885756EC 8855FE86 E90002B8 ¡..Ô.±U.&VW¡ô+.Ä.à.V.ƒd(Ù;ôt.@.t 000040
2C869A06 76FF57EC 88550002 CA5DE588 5E5F96E8 E8F788AE F2FFFF89 C033970C ..3à¿..·Û.%ŠŠ._^.Ì]ò..U.&W.v...., 000060
9A501651 521E5300 0288C488 50490 1F7 AEF2FFFF 89C033FA 88921F74 C0082C7A z,.àt...*3à¿..¯Û%ÌÌP.óÉ..S.RQ.P. 000080
C388FA46 89E42A08 478A2608 5EC45657 000008C8 0002CA5D E5885F58 0000FFFF ....[_.Ì]ò..à...WVó^.&.G.*ô.F*.û 0000A0
F6260774 830A47F6 26F84689 174C05E0 01C103E0 01C888F9 F7000CB9 99085820 -X..¿..%*.àÌÀ.èÌÀ.L..F%&-G..t.&- 0000C0
80260E74 010A47F6 26085EC4 900128E9 FFFF8820 0A4F8026 085EC40F 74400A47 G.@t.ó^.&.O. ¡..Ò+..ó^.&-G..t.&. 0000E0
7689F088 04478926 C028EF0A 67802602 0A4F8026 90E2E800 000447C7 26200A4F O. &ùG...Šä.&.O..&.g.ÿ+à&.G..Þ.v 000100
087E8137 7501174C 87F60608 68F9F700 0C899908 5820C388 4C750C0A 47F626FC •&-G..uL.û-X..¿..%*kÀ.-.L..u7.-. 000120
08312A9A FA76FF0F 752C8C0A 7E811675 0870087E 810E7420 950A7E81 07750864 d.u..-..-t..-.þ.u..-..,u..v*.*1. 000140
C3881575 080A47F6 26085EC4 04C48307 87E80876 FF0A76FF 0C75C008 02C4832E ..ó..âu..v..v.Òñ..ó.ó^.&-G..u..û 000160
47882606 77282637 8826085E 88677401 174C87F6 060868F9 F7000CB9 99085820 -X..¿..%*kÀ.-.L..tg.^.&.7&+w.&.G 000180
FF265256 167EF608 04478926 48024588 F87E8802 57892607 89264008 57882606 .&.W.@&..&.W..-½.E.H&.G..-~.VR&. 0001A0
006A026A 0F742023 A987F6FA 5E8819E8 FC468908 C4832E26 36309AFA 76FF0677 w..v*.06&..ó..F=Š..^*-.`# t.j.j. 0001C0
46805600 018E17E8 07882606 468A065F C426085E C408C483 2E4935F2 9A53006A j.S.·51..ó.ó^.&ó_..F.&..Š.ƒ..V.F 0001E0
```

```
Dump of file SATURN:[PCCOMMON.DUMP.DLL]BRDNOPL.TMP;1 on 18-APR-1990 10:37:32.99
File ID (520,34,0)   End of file block 272 / Allocated 272

Virtual block number 241 (000000F1), 512 (0200) bytes

 5F5EE42A 06468AFE CCE90374 FC7639FC 468908C4 832CC036 309AFA76 FF501606 ..P.v*.06à,.á..F=9v=t.Öä±.F.*ð^_ 000000
 20C38815 75080A47 F6265575 023C0324 0A478A26 065EC4F6 28560000 04C8C8C9 èüà...V+-á^.&.G.$.<.uU&-G..u..û- 000020
 08FC4689 06472826 07882606 5E883974 01174C87 F6060868 F9F7000C 89990858 X..¿..K*kÄ.-.L..t9.^.&..&+G..F=. 000040
 0874FC46 3808C483 209F3630 9A50E42A 08478A26 0677FF26 0877FF26 50287EC0 à-(P&.w.&.w.&.G.*ðP.06.-.á.;F=t. 000060
 47C72602 57892607 89260857 88260647 8826065E C4FFFF8E 200A4F80 26065EC4 á^.&.O. ƒ..á^.&.G.&.W.&..&.W.&üG 000080
 EC8855C8 5DE58801 FE4F8026 0574C308 C08C065E C4EC8855 CBC95EC6 88000004 ....ó^èüU.&á^..à.üt.&.O±..ǀ]üU.& 0000A0
 750082E8 272AA312 740025E8 08750027 2A3E831E 73FFF130 06468857 5602EC83 .à.VW.F.=þ.s..>*'.u.Ò%.t.È*'Ò..u 0000C0
 3900F08B C850E588 5E5F02C4 832EB637 D09A0676 FF087500 78E80574 0018E815 .Ò..t.Òx.u..v..A7Ñ..á._^.ǀ]üÉÞ.9 0000E0
 832F3139 D49A5002 80510E4F 8D50501E C033FE5E 89FEE383 43065E88 0776065E ^.v..^.C.D±.^±3à.PP.O.Q̄.P.à91/. 000100
 C033088E FE5E8800 08A30A8E 05740208 272EA327 2C1687C2 883874FF FA8308C4 à..*.t8.ó..,'È.'.@t..ÒÈ...^±.Ä3à 000120
 1FD88C00 06A3000D 05000AA3 01478D00 02A30000 A3000A88 0C478948 480008A3 È..HH.G.|..È..È...G.È.....È...Ä. 000140
 1EDE88D7 88EC8855 C3098EC1 8CD20808 68E8272E 1E8ED833 064E88C0 8ED88CC3 ù.Ä.à.H.3Ü...'Òh..@.è.ǀüU.&.=.&. 000160
 F3E9D149 A4027401 A8C78806 7EC4D1F7 AEF2FFFF 89C033C0 8ED88CFE 880A76C5 év..±.Ä.à3à¿....Ü%ǀá-..ú´.t.ÈǀǀÒµ 000180
 49D1F7AE F2FFFF89 C033067E C4D788EC 8855C85D C28C1FFA 88F388A4 F3C913A5 È.èµÈ.µ.*..ò]üU.&.má-.3à¿...Ü%iǀ 0001A0
 F2750825 C187F608 8898058A 26479002 E8067EC4 56570000 00C800C8 5DFA8891 ..*]ù.à...WVá-.Š..G&....Ä-.èX.u· 0001C0
 C4832F50 3B6E9A57 0876FF50 04C48330 3C2FEE9A 5706006A 006A0846 8C067E89 .-..F.j.j..W.Y/<O.á.P.v.W.n;]/.á 0001E0

Dump of file SATURN:[PCCOMMON.DUMP.DLL]BRDNOPL.TMP;1 on 18-APR-1990 10:37:32.99
File ID (520,34,0)   End of file block 272 / Allocated 272

Virtual block number 242 (000000F2), 512 (0200) bytes

 00000AC8 C8C95F5E DA8C28A2 881FA5A5 A5A5DA8E 1E071EF0 8828A28F 0008050A ....¢Ä+.Þ....ÒÉÉÉÉ.¡Ä+.Ö^_èüà... 000000
 C4FE5689 FC468908 57882606 4788260C 5EC4FA56 89F84689 08568806 46885657 WV.F..V..F½.V*á^.&.G.&.W..F=.V±á 000020
 74003F80 26FC5EC4 F876C5F6 5E8C0A4E 882E7E00 0A7E8330 07C626F8 46FFF85E ^½.F½&ó.O.-..-..N..^-év½á^=&.?.t 000040
 F85EC40A 4E89F65E 8EFA5E8C F87689E7 E2460488 30809003 E8078A26 FC46FF09 ..F=&..Š..¯O..Fäó.v½.^*.^-.N.á^½ 000060
 3005C626 9006E8F8 7EC4F84E FF1F7C35 3F8026FC 5EC4287C 000A7E83 0007C626 &ó...~..|(á^=&.?5|..N½á-½Š..&ó.0 000080
 FF260C5E C4097531 3F802606 5EC407FE 260F88FA 468CF87E 89F57439 3080264F O&.=9t%.-½.F*.Ò&±.á^.&.?1u.á^.&. 0000A0
 000090C8 C95F5E08 C483302F 2F889A06 76FF5250 52400856 88064688 15E80247 G.Š..F..V.@RPR.v..¡//0.á.^_èü... 0000C0
 4023A987 F60C7C00 F883117D 23A71E38 065E88EC 8855098A E9008357 56EC8855 U.&VW*.Òo.U.&.^.;.ǀ#)..«.|¯-.¯#@ 0000E0
 76C55657 1E0085E9 0375C908 0E4E88EC 885500C8 5DE588C0 3302E800 01880574 t.|..Š.3à.ǀ]ù.U.&.N..èu.Òç..WVév 000100
 0773F103 49507300 DA83C128 5778D208 0E4E8831 143AC69A 5706561E 067EC40A .á-..V.W.ó:.1.N..@xW+è.O.=P1.þs. 000120
 C628C703 C323081B C72848C1 8841C08E 318305C0 8C0773F9 03088EFF FF05088C .Ä....Ä.'s..á..1.&A.èH+ú.Üøù.ú+ó 000140
 FFFF83D8 8E318E20 088C0775 FFFE835C E391FCA4 F3FDC128 9140C603 C323081B .Üøù.óa.+è»µÈ=.D\.±.u..Ä·.1.Ä... 000160
 C22802F7 0688C203 C323081B C22802F7 D78848C1 88C8E8C0 8E318920 C08CD175 uǀ.à-¿1.àŠà.èH.=%@+ó.Üøù.ó.=%@+ó 000180
 088E31C5 05D88C07 75F6081B E391A4F3 C913A5F3 E9D1C128 9140C203 C323081B .Üøù.óa.+èiÒµÈ.èµÈ.D..-u..Ä.é1.Ä 0001A0
 38E30C4E 88EC8855 C8500856 88064688 1F5F5E8E E8C08E31 FC05C08C C775FF08 ..uú.à.=1.àŠ/^_..F..V.]üU.&.N.D8 0001C0
 13A8F3E9 D1E08A0A 46880128 D187D103 0323081B D1280C74 DAF7D788 067EC457 Wá-..=%Öt.+1.Üªª.1.1+1.F..ÄǀÒµ¨. 0001E0

Dump of file SATUK":[PCCOMMON.DUMP.DLL]BRDNOPL.TMP;1 on 18-APR-1990 10:37:32.99
File ID (520,34,0)   End of file block 272 / Allocated 272

Virtual block number 243 (000000F3), 512 (0200) bytes

 C8500856 88064688 5FAAF3C9 13A8F3E9 D1C38E32 07C381C3 8C10E3D1 87AAF3C9 èµ^.ǀD..ú.ú.2.úǀÒµ¨.èµ^_.F..V.]ù 000000
 FC5756EC 8855C858 00002CE0 9A531650 521E5100 02890C88 5301578D E42A078A ..*ö.W.S.É¿..Q.RP.S.Ä,..[üU.&VW= 000020
 ACC88826 04BF5D09 8AE85526 CC8EA536 A536A536 A53626CC 8F06768D C08ED88C .Ä.à.v.¢ëàóÉóÉóÉóÉ/äàÜÒα.]¢Ä&.à¯ 000040
 5FC788DA 8C0850D8C 26040645 C7044D89 0255891D 89FF3226 C28FAA91 A4F39198 ..µÉ.¨¢ò&2....U..M.üÉ.Ä&.]..Ö.ú 000060
 3688E96A E9270A8F 1F7A3688 C80126F0 06C6C85D E588C033 EC8855C8 50E5885E ^.ǀ]üU.&3à.ǀ]ùó.Þ&.ù.6z.¢.'Öjö.ö 000080
 1F7A3E88 E886E927 0A8F1F7A 3688E850 E9270A8F 1F7A3688 E930E927 0A8F1F7A z.¢.'Ö=Ö.6z.¢.'Ö]Š.6z.¢.'ÖÑŠ.>z. 0000A0
 C3585FA8 A8A8A81F 7A3E88FC C0335750 E8A2E927 0A8E1F7A 3E88E91F E9270A8E ƒ.'Ö.Ö.>z.ƒ.'ÖÄŠPW3à=.>z.    _Xù 0000C0
 270A8F1F 7A3688C3 1F7A3688 A5A5A5A5 1F7A3E88 270A8EC3 0875F738 1F7A3E88 .>z.;%u.ûƒ.'.>z.ÉÉÉÉ.6z.û.6z.ē.' 0000E0
 0674FF58 1F7A3688 04E8270A 8EC308EE 83A5A5A5 A527128F C308EE83 A5A5A5A5 ÉÉÉÉ.Y.û¢.'ÉÉÉÉ.Y.ûƒ.'Š..6z.X.t. 000100
 FF06448F 04448F02 448F048F 581F7A36 8804E827 0A8EE0FF 34FF0274 FF0474FF .t..t..4.Äƒ.'Š..6z.X...D..D..D.. 000120
 A5A5A51F 7A3E8817 E851ED32 0579C908 91ADF388 A5A5A5A5 270A8F1F 7A3688E0 Ä.6z.¢.'ÉÉÉÉ.µÙ..èy.2ÙQŠ..>z.ÉÉÉ 000140
 88E4E208 C683595E C890E81F 7A3E8856 5EEAA0E8 270A8F1F 7A368856 511CE3A5 ÉD.QV.6z.¢.'Ò.ö^V.>z.Ò.Ò^Y.6.äö. 000160
 E180C88A E8D30481 23770370 3D3FC02D 28747FF0 25E88A06 4488C3F7 881F7A3E >z..%ù.D..Ö%Þ.t+-à7=p.w#Y.ÆÒ.à.Ä 000180
 DC885A59 C3066C88 E3020640 8A066C86 10CD80D8 F7D88898 E8D0E8D0 E8D04107 .AÀÒÀÒÀÒ..Ä%Ù.ë..ǀ..ã.@Ä.ǀ.ûYZ.É 0001A0
 271A2EFF 5152F6F2 E9C03305 7540271A A1C85152 E3880572 271E1E38 08720828 +Är.;..'r..DRQùÄ.'ãu.3äÖ·-RQ...' 0001C0
 89F25689 F04689C0 281F7E16 8800F0E9 03751F7E 3639FF28 F6285657 000014C8 à...WV+-+.96-.u.ÖÞ...-.+à.FÞ.V·. 0001E0
```

```
Dump of file SATURN:[PCCOMMON.DUMP.DLL]BRDNOPL.TMP;1 on 18-APR-1990 10:37:32.99
File ID (520,34,0)   End of file block 272 / Allocated 272

Virtual block number 244 (000000F4), 512 (0200) bytes

 FE814619 74C0080A C4833494 3A8A9A23 88681EF6 76FFF876 FF0C6AF8 5689F646 F-.V%j..v%.v-.h.#..:.4.6..ât.F.± 000000
 003F8026 F646FFF6 5EC40CE8 47EA7500 3F8026F6 46FFF65E C4008CE9 03767FFF ..v.ÕV.6^-.F-&.?.uôG$.6^-.F-&.?. 000020
 56EE5689 EC468904 C48334A3 397C9A04 6A500145 808A7500 3F8026F6 5E88F475 u¶.^-&.?.uo.E.Pj..|9É4.6..F&.VŸV 000040
 EC468866 74C208FC 46886074 EE460BEC 4688FE56 89FC4689 02C48334 D92EFD9A .».14.6..F=.V±.F&.FŸtm.F=.ôtf.F& 000060
 C0080AC4 8331683A 8A9A2388 681EF076 FFF276FF 0C6A25B1 168925AF A3EE5688 .VŸÈ€X..Ÿ%j..v·.vÞ.h.#..:k1.6..& 000080
 C4078A26 F046FFF0 5EC404EC 46830257 89260789 26FE5688 FC4688EC 5EC42C74 t,6^&.F=.V±&..&.W..F&.6^Þ.FÞ&..6 0000A0
 3F8026F0 5EC4F475 003F8026 F046FFF0 5EC4E8E8 0E74C00A 078826FC 46FFFC5E ^=.F=&...ât.ŠÒ6^Þ.FÞ&.?.u¶6^Þ&.? 0000C0
 47F626FA 5EC41CE8 F628FC5E 8CFA4689 08588856 000006C8 90C8C95F 5EA77500 .uÏ^_èù.à...V|X..F*.^=+-Š.6^*&-G 0000E0
 FA46391D 4816881D 46A10CFA 46834601 744004C4 8334542E 629A5306 0E74830A ..t..S.b.T4.6.@t.F.F*.ÀF...N.9F* 000100
 E001C888 F9F7000C 89990858 20044688 258E06FF 000004C8 90C8C95E C6880876 vÄ.6^èù.à...../%.F.-X..¿..%*.à1Á 000120
 26064789 26045EC4 02C48335 492EFD9A 020068FE 5E8CFC46 89174C05 E001C103 .è1Á.L..F=.^±h...».I5.6.6^.&.G.& 000140
 040A4F80 26045EC4 9021E802 000247C7 26FC5EC4 080A4F80 26117400 08085789 .W..Àt.&.O..6^=&ùG...Š1.6^.&.O.. 000160
 26064788 26045EC4 00010247 C726FC5E C4085789 26064789 2640FE56 88FC4688 .F=.V±@&.G.&.W.6^=&ùG...6^.&.G.& 000180
 098A0872 23A71E38 065E88EC 8855C3C9 00000447 C7260257 89260789 26085788 .W.&..&.W.&ùG...èùU.&.^.;.Ï#r.¤. 0001A0
 590000FF FF9A5116 0C76FF08 76FF0A76 FF53CC88 04EC8307 A6E9079A E9C03300 ,3àÕ..Õ!..&..äS.v..v..v..Q.....Y 0001C0
 8A087223 A71E3806 5E880CEC 83EC8855 00C85DE5 88FD23A9 A78091E1 75C0855A Z.àuÅ..]`#».|)ù.U.&.&..^.;.Ï#r.¤ 0001E0

Dump of file SATURN:[PCCOMMON.DUMP.DLL]BRDNOPL.TMP;1 on 18-APR-1990 10:37:32.99
File ID (520,34,0)   End of file block 272 / Allocated 272

Virtual block number 245 (000000F5), 512 (0200) bytes

 00003618 9A5016F4 46805141 415151C9 33531274 2023A987 F60759E9 C0330009 ..3àÕY.-.`# t.S3èOQAAQ.F¶.P..6.. 000000
 89F288FA 885657FC FC4689FE 4689C033 0856C50A 468EFA5E 8C667480 23A987F6 -.`#.tf.^*.F.éV.3à.F±.F==WV.*.·. 000020
 0C4E8807 16FA8804 88E22800 808ADC88 02EC8338 75AEF20A 8049E30C 4E88F866 f%.N.DI¯.·Üu;.&..Éo..+ã.Â.*...N. 000040
 46FF0A80 AA001FE8 0375F838 0D80009A E9002BE8 F4E2AA1A 74F83800 740A3CAC ¯<.t.;«t.¯ä¶Ô+.Õ..¯.;«u.Ò..¯¯..F 000060
 1F061E51 5350355 33FC9AFF FC887AE8 0093E9FA 5E8E5F5E E1E80014 E8E2E8FC =ŠàÒ..ŠÂ^_.^*Õ..Šz¡=..=3.5PSQ... 000080
 5E01F45E 881175Cu 08000032 749A5016 F4468051 521E5306 5E881FE3 CA28CF88 .ü+ðO..^.Š.RQ.F¶.P.t2...àu..^¶.^ 0000A0
 750009BA 00013000 7400603D 1874C008 08C4831F C3FA8858 58591F07 740808FE ±.Üt..Y[X.*ù..6..ât.=m.t.=..¤..u 0000C0
 751A3F80 085E880A 5E8E0E74 4023A987 F6FE5E8E 26E8F900 208A03E8 001C8A08 .¤..Š.¤ .*Š&.^±-.`#@t..^..^..?.u 0000E0
 CB5DE588 0472FA5E 8E5F5EF8 6688FC46 28FE4688 06E8F9C0 33001C8A 0EE8F803 .%Š.¤..3à*Š..F±+F=.f%^_.^*r..Ï]ù 000100
 000036F3 9A5016F4 46805152 1E530856 C51EEEE8 C1880475 C9080C4E 880630E9 Õ=..N..èu..éŠŸ.éV.S.RQ¯F¶.P.µ6.. 000120
 4688C2E8 0020BAC7 E8001C8A CC750009 BA000130 00740060 301774C0 081F071E ....ât.=m.t.=..¤..uäo..Šùo .Šô.F 000140
 885500A3 E8C03300 1C8AA6E8 02751A3F 80260A88 0A744023 A987F687 75C008F4 ¶.àuñ-.`#@t..Ö&.?.u.Š|¤..3àŠÈ.U. 000160
 88071E29 75003F83 27208857 56EC8855 C85DE588 01FE4F80 04740808 065E88EC &.^..Üt..O±..Ï]ùU.ŠVWÉ '.?.u)..¡ 000180
 FE44C704 C6830001 04C79627 22A32720 A3FE2440 24E899C0 33057501 76E80005 ..Òv.u.3à.Š$@Š±È 'È"'.ú....6.úD± 0001A0
 83FEE180 FA744100 D0E9C85D E5885E5F 0009E8C0 8ED88C06 4E882726 3689FFFE ±..6&'.N..Ä.àÒ.._^.Ï]ùÕÅ.At*.Å±. 0001C0
 05C20335 7401A8AD F0030088 1573C138 48437401 A8FE88AD FC027788 F273EEF9 *Ÿs·.w.=Ü.±´.tCH;ès..Å.ÞÙ´.t5.ô. 0001E0

Dump of file SATURN:[PCCOMMON.DUMP.DLL]BRDNOPL.TMP;1 on 18-APR-1990 10:37:32.99
File ID (520,34,0)   End of file block 272 / Allocated 272

Virtual block numb-r 246 (000000F6), 512 (0200) bytes

 C688FE4C FEF90305 5B058948 C128FE4C 89F9030C 74FE88E6 E8FE4489 F7880002 ...%.D±Š|.±t..*.L±+èH..Š..*±L±.6 000000
 03FE8825 74FFFE30 02273206 C626C302 7F89272E 1E8C2605 74D13820 87B90A8C .Ö¿.-;|t.&...'...ù&6.2'.=±.t%.±. 000020
 FE4489F7 88000205 C203E274 01A8ADF0 03008BBC 73C13848 FE88F274 01A8ADF0 ÞÙ´.t·.±H;èsŸ.Å.ÞÙ´.tã.ô....%.D± 000040
 1E8E2605 74C73838 638FD88C 12742732 0EFE2615 E8D88E04 74C00808 4788E6E8 Š|.G..ât..ÄŠ.&±.2't..Äec8;út.&.. 000060
 E8FE4DFE 0D74005F E8984040 01240074 C6380068 E8C03306 77888BE8 3788272A *'.7ŠE.w.3àÒk.;ót.$.@@.Ò_.t.±M±Ò 000080
 51C399C0 33024789 0788272E A3260474 C1383887 B9D88C98 E84E4E96 0574001D ..t..NNŠ..Ä¿ñ8;èt.&È.'...G.3à.ùQ 0000A0
 1572C603 C188F575 EAD10476 27301638 267FFF8A 414149C8 28037401 A8FE4588 .E±´.t.+à1AA¤..&;.0'v.1ôu%.è.ór. 0000C0
 1874001D E85152C3 59C033E5 75EAD102 F7087500 0CE8C628 C22302F7 0072C203 .ór.%@#6+6Ò..u.%@1ôu|3àYùRQÒ..t. 0000E0
 1E023350 53C35A59 58FE5589 4AD72806 88067789 FFFEFE44 C7F203F0 88FE8857 W.±.Þ.·úD±±..w..@+@J.U±XYZùSP3@. 000100
 00000AC8 C3020802 74585A1F FFFA8308 C4833608 39D49A1F 06500001 88505252 RRP¡..P...à9Á6.6..*..Z[t..@ùà... 000120
 E899C028 0674FFFF C2F7FA56 89F84689 39A900FC 9A0676FF 006A0876 FF006A56 Vj..v.j..v..=.`9.F%.V*%ô..t.+à.Š 000140
 9A50FE76 FF006A56 12740008 FE5689FC 468902C4 8339C22E FD9A56F8 7688902F /..v%V.».ô9.6..F=.V±.Ât.Vj..v±P. 000160
 3875000A 7E830657 56EC8855 90C8C95E FE5688FC 46889007 E808C483 396C3218 .2l9.6.Š...F=.V±^èù.U.ŠVW..~..u8 000180
 448800074 F7381174 48238636 884CE827 720057E8 07754806 46880856 881F868F €...V..F.Hu.ÒW.r'ŠL.6.#Ht.;%t..D 0001A0
 885021E8 99FFFF88 0675D208 04732386 FE8104C6 8334735E 003EE856 0E468902 ..F.VÒ>.^s4.6..±.#s..@u.|...Š1P. 0001C0
 07C03303 88238636 89025C89 1489E675 C085F958 0000FFFF 9A50C033 501652C4 àR.P3àP.....(*.àul...\..6.#.Æ3à. 0001E0
```

Dump of file SATURN:[PCCOMMON.DUMP.DLL]BRDNOPL.TMP;1 on 18-APR-1990 10:37:32.99
File ID (520,34,0)   End of file block 272 / Allocated 272

Virtual block number 247 (000000F7), 512 (0200) bytes

```
 1C03DA88 2CEBF9F7 752386FE 8104C683 0C74024C 39F7880E 4E88CB5D E5885E5F _^.[]ù.N..%9L.t..ó..±.Æu·¹$,.Ö.. 000000
 890475F7 380E75C0 850000FF FF9A5153 13731F80 1E390675 F738C18E 03882672 r&.Æ.è;%u.9...s.SQ......&u8;%u.. 000020
 AEF2C033 F788067E C4D98827 E30E4E88 1E5657EC 885500C3 01880487 921F8016 .......lû.U.&WV..N.O'.\á-..%3á·Û 000040
 5E1FC188 01F74949 04740477 FF453A26 C933FF44 8AA6F30A 76C5FE88 C80309F7 %\.ù.±év.µ[.D.3è&:E.w.t.I]%l.é.^ 000060
 E588031B 0A4628EB D3EA03FF FF890C5E 88085688 06468BEC 885500CB 50E5885F _.[]ù.U.å.F..V..^.¿..ÆõÆ$+F..Æ.[ 000080
 080E750A F9831374 C00A93FC 071E570A 7EC51E08 56880646 880E4E88 0008CA5D ]ò...N..F..V..é-.W..=..åt..ª.u.. 0000A0
 30040387 92F1F793 F1F70274 C0080233 92F7880A F7000283 D8F7AA2D 800A7902 Øy.¯-¨%Ü.Ø.%Ö.%.3Ø.åt.%þ.%þ..Æ.0 0000C0
 580A8CF2 72C73801 4480FF44 880586AC 4F0588E2 75C308C2 88AA2704 0276393C <9v..'^.ó.ùuã..O¯...O..Ö.;úr·.ÖX 0000E0
 76380027 C906C600 28E80127 C906C60E 56880833 5756EC88 55C850E5 885E5F1F ._^.[]ùW.&VW3Ü.V.ó.è'.Ö(.ó.è'.;v 000100
 50E5885E 5F0006E8 0E5E8802 335756EC 8855C850 E5885E5F 008940C9 8005730A .ŝ..èə.._^.[]ùW.&VW3Ø.^.Ö.._^.[] 000120
 4E88D88E A4F32746 8F0676C5 27E8F633 40810676 64F9830A 4E88C08E D88CFCCB ù=.Ä.å.N¯..ªdv.Ýã3-Š'év.¢F'µË.Ä.N 000140
 00892734 8F0A7603 0676285D 0283E855 273C8F06 4E010C46 88067689 27468E0A ./f'.v..F..N.¢<'UÒ..]+v..v.¢4'.. 000160
 C6831675 C43A8080 75094784 2E09648A 5653C30A 8CC78806 50890445 89027589 .u..E..]..ú.ÒüSV.d...G.X..:åu..ó 000180
 33AD93AD 92AD95AD 56C3585E F3E10738 2E048802 E88302EE 830005B9 0AC3830A ..û.¿...Ý..Š....;.Åµ^[ÚVÙ.Ù.Ù.Ù3 0001A0
 3C895E03 FE2D0801 F5000130 D001E301 F4E20FD1 DD010AD1 D8D1E8D1 000589FF .¿..]ÒiÙiÒi!iÒã¶iÒiÅ=..%iÙ-±.^.< 0001C0
 FDCCCCCC CCCCCCCC CD0000FF FFFFFFFF FFFC66C3 08448906 5C890454 89026C89 .Ì..T..\..D.ùf=........êêêêêêê» 0001E0
```

Dump of file SATURN:[PCCOMMON.DUMP.DLL]BRDNOPL.TMP;1 on 18-APR-1990 10:37:32.99
File ID (520,34,0)   End of file block 272 / Allocated 272

Virtual block number 248 (000000F8), 512 (0200) bytes

```
 00048957 27AA8FFC C08E088C 06C3075B 40D088C0 33300144 C60104C6 27B68EFF ./Ñ'ó..ó0.03á.Åâ[.ú..Ä.å=¢¨'W¿.. 000000
 818EFF33 FF7BE853 20830279 C9080674 7FF0C1F7 20837F07 6480064C 885EA5F3 µË^.L..d..° %èþ.t..èy.°-SÒ(.3./Ý 000020
 E7F69A80 D713C803 E4F64D80 91E2F74D 108AC888 3FFE05AD F88A8874 80A8AC27 '¨´.tÈ.%Ù.±7.åo.M%ã. M-ð.à.ø¯.-Ó 000040
 57470972 5FFF13E8 3C208805 89E827AA 8EDFF757 13430F81 12F4E981 FA13C803 .à.°.Ö¶..ÖC.W%Ö∫¨'Ò¿.É-<Ò.. r.GW 000060
 DDD10AD1 E8010CE3 C033F788 09F791AD 93AD92AD 95AD97AD 575F0442 E83C3788 £7<ÖB._WÙ.Ù.Ù.Ù.Ù.%\.%3åD.[Š]Ö11 000080
 56555253 51C03200 10892787 8FD91301 13E91303 9A068156 C480F4E2 DCD00ED1 1ßÅÉã¶.åV.ø...Ö.1.\¢ñ'¿..2åQSRUV 0000A0
 59F11359 E50259D0 D0D30102 D1D50106 D1E400D0 D0D30102 D1D50106 D1E40050 PÅÖ1ø111Ø1ÆÅÅÅÖ1ø111Ø1ÆÅÅY.ÎY.þY 0000C0
 3080494F 80E259AA 30040D00 D3010201 D5010601 E4000014 D91359D1 1359E913 .ÖY.1Y.\..ÅÖ1ø111Ø1ÆÅÅ.0¨Yã§OI¯0 0000E0
 09060D05 18040203 02021601 00C3075B 5A000188 0C882786 8E12C183 FCAEF3FD »µÜ=.è./Ñ'..¡..Z[.ù............ 000100
 00530052 02430D41 02350212 12110D10 120F160D 160C0808 070A0C09 0C080C07 .......................S.A.C.R.S. 000120
 16080D00 080702CE 08A40084 09820A81 0A801606 09721C70 2060006C 08590057 W.Y.l.m p.r...........Ê.ö.ø..... 000140
 30548823 A5A3CB5D E58899FF FF880008 E8CB50E5 8899FFFF 88239E16 8923A5A3 ÊÊ#...#¡....[]ùÖ..¡....[]ùÊÊ#ÊT= 000160
 76CA3C04 728C3C43 0A76243C 0472133C F7E24343 1674073A 2E1875E4 0A002489 ¿$..ðu..:.t.CCã%<.r.<$v.C<¥r.<òv 000180
 00ACE908 330185E8 EF88FF33 D78840C9 8030C980 58C3239E A3980147 8A2E4301 .C..G..É.#ùX.èO.èã.ø3..ýÒ..3ÙÕ¯. 0001A0
 F7C388EA 88F88827 D626F7C7 8850E072 0205E8F8 88E17202 0CE8D833 27D61E89 ..ø'3ÙÒ..rÃ.%Ò..rÅP.ú%&ø'.%.ð.ú% 0001C0
 0E89CE03 27CC3E89 FC85E808 73000383 F803588E 720888C5 03C475D2 0827D62E .ø'.Øuá.é.Ar/X.%.Æ.sÅŠç=.>ä'.ö.. 0001E0
```

Dump of file SATURN:[PCCOMMON.DUMP.DLL]BRDNOPL.TMP;1 on 18-APR-1990 10:37:32.99
File ID (520,34,0)   End of file block 272 / Allocated 272

Virtual block number 249 (000000F9), 512 (0200) bytes

```
 75D80880 CD800375 01ADE891 27D4A327 00A327D2 A3C03327 0A168927 08A3.¨CE ö'ÊÄ'..Ö'3ãÊØ'ÊÄ'Êå'.ÖÙ.u..ë..Ùu 000000
 3C06742B 3C317400 27C93E80 1274453C 1C74443C 4E417401 FDE80B33 00E7Eb?F .ÒÒ.3ÙÒ=.tAN<Dt.<Et..>è'.t1<+t.< 000020
 C5F60088 E8509F01 6CE84600 0027D806 C70EC980 03E80402 C9814E27 7502742D -t.u'N.è..Š..è.ú.Ä'..FÖl..PÒ..-é 000040
 03F80330 C9800374 1872C1F7 0675FF08 27D83E88 D8F70275 9E5840C9 80037502 .u..èãX.u.%Ù.>Ä'..u.%èr.t..èO.«. 000060
 06C627CC 3E880394 E827E08E 5156507F 0190FF81 27DA3E28 047510C5 F627D43E >å'-é.u.+>Ö'.....PVQ/Å'Ò...>ä'ó. 000080
 45F70003 83F5D8F7 D3F71374 80C5F627 DE1E8827 DCA13875 5E5901AC E80027EA ð'.Ö¯.Y^uØÅÉ'..Ø'-é.t.%Æ%Å%.Æ.%E 0000A0
 CD800375 0027D23E 8327EA2E 8A08C980 03760727 D23E8380 07408004 747FF006 .Þ.t..M...>Ø'.v..è...ð'.>Ø'.u..ë 0000C0
 C303E301 02CD80ED 770CCCF8 81177200 E4E80A27 D606C63F FF88C301 C980C302 .ù.è.ùÉ.?ó.ø'.Öð.r..«ä.wÙ.ë.1D.ù 0000E0
 83000358 008AE850 28720006 E8D788DF 88EF88FF 33C30FE8 DE78D803 E3D1E301 1Ð1D.ÄxØŠÖù3..ý.Ô.øÒø.r(PÒ..X.Å. 000100
 EEE827D4 06FF01CA 800374C0 0A007200 88E8E572 1999FF81 00D78300 D5830003 Æ..[..ø.....r[ÖÉ.r..át..ò...å'ŠŸ 000120
 06E80575 02080975 8000F881 0F7480C5 F6177480 C7F61675 27D40608 C508C788 .ú.é..å'u.-ú.t.-é.t..«..u..Øu.Š. 000140
 25E80973 1999FF81 1C74C208 C308C508 C78827DE 1E8927DC 168920C9 8010C980 .è..è ..É'..Ø'.ú.é.ù.òt.....s.ÖX 000160
 AB95AB93 AB9227E0 8FF78856 F6E8002A E8480678 FF080040 88F1E827 D40EFF00 ...å'$þ¡ə...x.HÒ*.Š-V.%¢Å'.¨.¨.¨ 000180
 D301E2D1 F81358E8 13580813 58000300 08E8000E E8C28853 5557C35E A892A896 .¨.¨^ùWUS.óÒ..Ò...ÄX.ÄX.ÒX.%iãiÆ 0001A0
 093C4572 302C4A74 004EE8C3 4E460175 283C0674 203C0874 005EE8C3 D7D1D501 i1iøùÒ^.t.<-t.<+u.FNùÒN.tJ,0rE<. 0001C0
 10C5F626 77093C2A 72302C20 742E3C33 740037E8 1DE8397D 27D6063A 072C027E -.,.:.ø')9Š.Ö7.t3<.t ,0r*<.w&-é. 0001E0
```

```
Dump of file SATURN:[PCCOMMON.DUMP.DLL]BRDNOPL.TMP;1 on 18-APR-1990 10:37:32.99
File ID (520,34,0)   End of file block 272 / Allocated 272

Virtual block number 250 (000000FA), 512 (0200) bytes

 CD8027D0 06FF0975 10C5F6F4 EB20CD80 C3E43227 D206FF08 CD8027D4 0EFF0E74 t...Å'.ë...@'2ôû.ë $¶-é.u...Å'.ë 000000
 E6740A3C EA74093C EE74203C 10740027 C83E80AC 237327CE 3638C3F9 4EC9EB10 .Sèn*û;6ö's#¯.>à'.t.< tÿ<.tô<.tÎ 000020
 C108C508 F888AC95 AD91AD92 AD57C3C0 32C35F24 02777A3C 0672613C E274003C <.tä<ar.<zw.$ û2àùÀû.Û.Ù.Û.%.é.è 000040
 FED7D000 D1D7D1D5 D1D1D1E2 D10005B8 DFD1E8D1 E7D13E78 03FE05AD 4974C208 .ôtÌÙ.±.x>1ÓÌÕ1ÒE..1ã1111ï1e1ÀÄa± 000060
 300E74FF F0A900D7 80C613FE 13EE13CE 13F58001 FA81F633 D30AD922 43F075C8 ùuÞC").Æ3-.*..%.ö.Ÿ.±.ó.m.`Þ.t.» 000080
 89026D89 0D895FF7 88F888E8 88C888D8 88C03301 27EA0E80 0FE80007 80F57FF0 Þ.%.m.Š...ð'.3à.Ä.à.Ò.%.% ...m.. 0000A0
 04B80007 BF084401 0847882E ABF3C033 F0880008 8927ECBD C3FF0A06 45890475 u..E...Û§ã'¿...»3åµ¨..G..Õ.e..¡. 0000C0
 06C683F7 28F10308 C3830F28 D9285653 C8889804 0408F6C4 2AC42AE0 22C72800 .+ú"Å*á*á-Ä....àSV+1+Ô.û..þ+%.ó. 0000E0
 4F02C583 585EE6E2 02C38302 EE830004 56833E02 56113E00 46013E27 F72E0488 ...%'>.F.>.V.>.V...Ÿ..û.ã1^[.é.O 000100
 C008F588 AD93AD91 AD97ADD1 0A92ADCD 0AC808AD C808AD91 ADF5870E ED838C75 u¥.Û..%Û.Ù.àÛ.à.ëÛ..1Û.Û.Û.Û.%.å 000120
 13FD13F5 8001FA81 ED330508 EF230001 800001D3 D1D1D1D7 D1E2D108 4CFF0078 x..L.1ã1e111£1Å§..#ÿ.13Û.*..%.». 000140
 00000000 0000C306 4489045C 89024C89 3C89C508 CDD1086C 01D5D1C5 130D13CD ë.Ï.éÌÍ.Ì.le.é.<.L..\..D.û...... 000160
 BEBC2000 00000000 000E9C40 00000000 00000007 C8000000 00000000 0004A000 ...........à........ã........ ¥/ 000180
 0005C278 1F49FFCF A6D50068 9DC5ADA8 2B70859E 00368E18 C98F0400 0000001B ......«è..ó..çp+´Ûé.k.f1ü.I.xôf. 0001A0
 D70AFFFD CCCCCCCC CCCCCCCD 0353AA7E E8FB9DF9 DE8E01AA 938A47C9 80E98CE0 Å.Ô.èGo.¨..8*.«Š-´S.ëàààààà»..m 0001C0
 C44DE158 FFE6A8CC 77118461 CEFDFFF3 D1871758 E219652C FFFAA3D7 0A3D70A3 Ëp=.mÊ*.,e.õX.ñ1µ.»öa..wä¨I.[ÅMé 0001E0

Dump of file SATURN:[PCCOMMON.DUMP.DLL]BRDNOPL.TMP;1 on 18-APR-1990 10:37:32.99
File ID (520,34,0)   End of file block 272 / Allocated 272

Virtual block number 251 (000000FB), 512 (0200) bytes

 467C64BC E4A1FF2C AB7FEA27 A539E9A5 FF96CF81 1EAD4539 94BAFFCB E69594BE ƒ..lù.¤.9EÙ.Ÿù..EÒ9E'ð.´,.ÀÒ¥d|F 000000
 0AC3830A EB830FF7 4214BB05 79FF0B41 BABBFCAE C0314325 637A193A FE570D00 ÃÌW±:.±c%C1àÛ•Ê¤A..y.Ê.B%Ô.$..û. 000020
 2C360103 02CB0007 377C0203 000DC3EC EB5B5FFE 7BE85753 F573EFD1 0074FF08 ..t.Ìÿs%SWÒ(±_[$$û....|7..û...6, 000040
 3AD30105 00260002 3A730103 00220002 3A280103 00070002 2BFE0103 00050002 ......±+......(:.."...s:..&...Æ: 000060
 28800103 00000017 398E0002 003A0002 365C0103 00880002 32480105 00870002 ......K2......\6..:....9.......+ 000080
 00000000 005C0002 2AE30103 00580002 2AF60103 00000019 38EC0002 00400002 ..M...&8......-*..[...D*..\..... 0000A0
 6F432020 20797261 7262694C 20656069 54206E75 5220534D 00000000 00000000 ........MS Run-Time Library - Co 0000C0
 70726F43 2074666F 736F7263 6940202C 38383931 20296328 20746867 69727970 pyright (c) 1988, Microsoft Corp 0000E0
 00000000 00000000 00000000 00000000 00000000 00000000 00000000 00010011 ................................ 000100
 00000000 00000000 00000000 00000000 00000000 00000000 00000000 00000000 ................................ 000120
 00000014 00000014 00000001 00000000 00000000 00000000 00000000 00000000 ................................ 000140
 00030002 00060001 00000014 00000014 0000000F 0000000F 00000005 00000005 ................................ 000160
 00000000 00000000 00000000 00000001 00000000 00000000 00000001 00050004 ................................ 000180
 00000000 00000000 00000000 00000000 00000000 00000000 00000000 00000000 ................................ 0001A0
 FFFFFFFF FFFFFFFF FFFF0000 00000000 00000000 00000000 00000000 00000000 ................................ 0001C0
 00000000 00000000 00000000 00000000 00000000 00000000 0000FFFF FFFFFFFF ................................ 0001E0

Dump of file SATURN:[PCCOMMON.DUMP.DLL]BRDNOPL.TMP;1 on 18-APR-1990 10:37:32.99
File ID (520,34,0)   End of file block 272 / Allocated 272

Virtual block number 252 (000000FC), 512 (0200) bytes

 00000000 00010000 00000000 00000000 00000000 00000000 00000000 00000000 ................................ 000000
 FFFFFFFF 0003FFFF FFFFFFFF 0002FFFF 00010000 FFFF0000 00000001 00000000 ................................ 000020
 00000000 00000000 00000000 00000000 00000000 00020008 00040002 0001FFFF ................................ 000040
 00000000 00000000 00000000 00000000 00000000 00000000 00000000 00000000 ................................ 000060
 00000000 00000000 00000000 00000008 00000000 00000000 00000000 00000000 ................................ 000080
 00080002 00010008 00000000 00000001 00000001 00000000 00000000 00040000 ................................ 0000A0
 00000000 00000002 00000001 00000000 00080008 00080008 00080004 00040004 ................................ 0000C0
 00840000 FFA6005A FFA6005A 00000084 005AFFA6 00840000 00000000 00000003 ..........Ç.I.Z.Ç...Z.I.Z.I...Ç. 0000E0
 00000000 00000001 00010000 00000000 00000001 00000000 00000084 005AFFA6 I.Z.Ç........................... 000100
 0000FFFF FFFF0000 00000000 00000000 00000000 00000003 00000000 00010000 ................................ 000120
 00000000 00010000 00000000 00000000 00000000 00000000 00000000 00000000 ................................ 000140
 00000000 00000000 0000FFFF 00000000 00000000 00000000 00050000 00000001 ................................ 000160
 00000006 00000000 00010000 00010000 00000000 00000000 00000000 00000000 ................................ 000180
 00000000 00000000 00000000 00000000 00000000 00000000 00000000 00000000 ................................ 0001A0
 00020001 00080004 00000000 00000000 00000001 00000000 00000000 00000000 ................................ 0001C0
 00020004 0005FFFF 00000000 00000001 00000000 00000000 00000003 00020000 ................................ 0001E0
```

```
Dump of file SATURN:[PCCOMMON.DUMP.DLL]BRDNOPL.TMP;1 on 18-APR-1990 10:37:32.99
File ID (520,34,0)   End of file block 272 / Allocated 272

Virtual block number 253 (000000FD), 512 (0200) bytes

 FFFF0000 0000FFFF FFFF0000 00000000 00000000 00000000 FFFF0000 00010003 ................................ 000000
 00000020 00000010 00U00008 00000004 00000002 00000001 00000000 000BFFFF ............................ ... 000020
 00000000 00000001 00080002 00040009 000A0006 00050005 00040003 FFF'FFFF ................................ 000040
 6F72705C 3A710001 00010000 00000002 00080001 00040000 00000000 000C'000 ........................q:\pro 000060
 65636E65 665C6C70 6F6E6472 625C6D73 775C6372 735C3133 30306A6F 72705C6A j\proj0031\src\wsm\brdnopl\fence 000080
 73775C63 72735C31 3330306A 6F72705C 6A6F7270 5C3A7100 45534C41 4600632E .c.FALSE.q:\proj\proj0031\src\ws 0000A0
 5C6A6F72 705C3A71 0045534C 41460063 2E65636E 65665C6C 706F6E64 72625C6D m\brdnopl\fence.c.FALSE.q:\proj\ 0000C0
 632E6563 6E65665C 6C706F6E 6472625C 6D73775C 6372735C 31333030 6A6F7270 proj0031\src\wsm\brdnopl\fence.c 0000E0
 5C6D7377 5C637273 5C313330 306A6F72 705C6A6F 72705C3A 71004553 4C414600 .FALSE.q:\proj\proj0031\src\wsm\ 000100
 72705C6A 6F72705C 3A710045 534C4146 00632E65 636E6566 5C6C706F 6E647262 brdnopl\fence.c.FALSE.q:\proj\pr 000120
 4600632E 65636E65 665C6C70 6F6E6472 625C6D73 775C6372 735C3133 30306A6F oj0031\src\wsm\brdnopl\fence.c.F 000140
 72625C6D 73775C63 72735C31 3330306A 6F72705C 6A6F7270 5C3A7100 45534C41 ALSE.q:\proj\proj0031\src\wsm\br 000160
 6A6F7270 5C6A6F72 705C3A71 0045534C 41460063 2E65636E 65665C6C 706F6E64 dnopl\fence.c.FALSE.q:\proj\proj 000180
 4C414600 632E6563 6E65665C 6C706F6E 6472625C 6D73775C 6372735C 31333030 0031\src\wsm\brdnopl\fence.c.FAL 0001A0
 6E647262 5C6D7377 5C637273 5C313330 306A6F72 705C6A6F 72705C3A 71004553 SE.q:\proj\proj0031\src\wsm\brdn 0001C0
 30306A6F 72705C6A 6F72705C 3A710045 534C4146 00632E65 636E6566 5C6C706F opl\fence.c.FALSE.q:\proj\proj00 0001E0

Dump of file SATURN:[PCCOMMON.DUMP.DLL]BRDNOPL.TMP;1 on 18-APR-1990 10:37:32.99
File ID (520,34,0)   End of file block 272 / Allocated 272

Virtual block number 254 (000000FE), 512 (0200) bytes

 45534C41 4600632E 65636E65 665C6C70 6F6E6472 625C6D73 775C6372 735C3133 31\src\wsm\brdnopl\fence.c.FALSE 000000
 6E696665 646E5520 73692074 6E657478 45202020 00786C25 2065636E 65460A00 ..Fence %lx. - Extent is Undefin 000020
 202C646C 2520646C 25202959 58595828 20736920 746E6574 78452020 20006465 ed. - Extent is (XYXY) %ld %ld,  000040
 6F74746F 42202020 200A0020 20203A74 66654C20 2020200A 00646C25 20646C25 %ld %ld..    Left:   ..   Botto 000060
 00202020 203A706F 54202020 200A0020 203A7468 67695220 2020200A 00203A60 m: ..    Right:  ..    Top:    . 000080
 6F6E6472 625C6D73 775C6372 735C3133 30306A6F 72705C6A 6F72705C 3A71000A ..q:\proj\proj0031\src\wsm\brdno 0000A0
 6F72705C 3A71004C 4C554E20 4C51454E 20737473 6F700063 2E74736F 705C6C70 pl\post.c.posts NEQL NULL.q:\pro 0000C0
 2E74736F 705C6C70 6F6E6472 625C6D73 775C6372 735C3133 30306A6F 72705C6A j\proj0031\src\wsm\brdnopl\post. 0000E0
 3E207828 20524F20 29747261 74537473 6F707020 4C514520 7374736F 70280063 c.(posts EQL ppostStart) OR (x > 000100
 6F72705C 6A6F7270 5C3A7100 29656764 45783E20 74726174 5374736F 70702030 = ppostStart->xEdge).q:\proj\pro 000120
 736F7000 632E7473 6F705C6C 706F6E64 72625C6D 73775C63 72735C31 3330306A j0031\src\wsm\brdnopl\post.c.pos 000140
 72735C31 3330306A 6F72705C 6A6F7270 5C3A7100 4C4C554E 204C5145 4E207374 ts NEQL NULL.q:\proj\proj0031\sr 000160
 67644578 3E207374 736F7000 632E7473 6F705C6C 706F6E64 72625C6D 73775C63 c\wsm\brdnopl\post.c.posts->xEdg 000180
 5C637273 5C313330 306A6F72 705C6A6F 72705C3A 71004C4C 554E204C 51452065 e EQL NULL.q:\proj\proj0031\src\ 0001A0
 65756C61 56793E20 7374736F 7000632E 74736F70 5C6C706F 6E647262 5C6D7377 wsm\brdnopl\post.c.posts->yValue 0001C0
 775C6372 735C3133 30306A6F 72705C6A 6F72705C 3A71004C 4C554E20 4C514520  EQL NULL.q:\proj\proj0031\src\w 0001E0

Dump of file SATURN:[PCCOMMON.DUMP.DLL]BRDNOPL.TMP;1 on 18-APR-1990 10:37:32.99
File ID (520,34,0)   End of file block 272 / Allocated 272

Virtual block number 255 (000000FF), 512 (0200) bytes

 7100666E 4959663E 2D737473 6F700063 2E74736F 705C6C70 6F6E6472 625C6D73 sm\brdnopl\post.c.posts->fYInf.q 000000
 5C6C706F 6E647262 5C6D7377 5C637273 5C313330 306A6F72 705C6A6F 72705C3A :\proj\proj0031\src\wsm\brdnopl\ 000020
 705C6A6F 72705C3A 71004C4C 554E204C 51454E20 7374736F 7000632E 74736F70 post.c.posts NEQL NULL.q:\proj\p 000040
 7000632E 74736F70 5C6C706F 6E647262 5C6D7377 5C637273 5C313330 306A6F72 roj0031\src\wsm\brdnopl\post.c.p 000060
 5C313330 306A6F72 705C6A6F 72705C3A 71004C4C 554E204C 51454E20 7374736F osts NEQL NULL.q:\proj\proj0031\ 000080
 71004878 203C204C 7800632E 74736F70 5C6C706F 6E647262 5C6D7377 5C637273 src\wsm\brdnopl\post.c.xL < xH.q 0000A0
 5C6C706F 6E647262 5C6D7377 5C637273 5C313330 306A6F72 705C6A6F 72705C3A :\proj\proj0031\src\wsm\brdnopl\ 0000C0
 3A71004C 4C554E20 4C51454E 20746365 6C6C6F43 7374736F 7000632E 74736F70 post.c.postsCollect NEQL NULL.q: 0000E0
 705C6C70 6F6E6472 625C6D73 775C6372 735C3133 30306A6F 72705C6A 6F72705C \proj\proj0031\src\wsm\brdnopl\p 000100
 6A6F7270 5C3A7100 4C4C554E 204C5145 4E206464 41737473 6F700063 2E74736F ost.c.postsAdd NEQL NULL.q:\proj 000120
 632E7473 6F705C6C 706F6E64 72625C6D 73775C63 72735C31 3330306A 6F72705C \proj0031\src\wsm\brdnopl\post.c 000140
 3330306A 6F72705C 6A6F7270 5C3A7100 4C4C554E 204C5145 4E207374 736F7000 .posts NEQL NULL.q:\proj\proj003 000160
 4878203C 204C7800 532E7473 6F705C6C 706F6E64 72625C6D 73775C63 72735C31 1\src\wsm\brdnopl\post.c.xL < xH 000180
 706F6E64 72625C6D '3775C63 72735C31 3330306A 6F72705C 6A6F7270 5C3A7100 .q:\proj\proj0031\src\wsm\brdnop 0001A0
 6A6F7270 5C3A7100 4C4C554E 204C5145 4E207374 736F7000 632E7473 6F705C6C l\post.c.posts NEQL NULL.q:\proj 0001C0
 632E7473 6F705C6C 706F6E64 72625C6D 73775C63 72735C31 3330306A 6F72705C \proj0031\src\wsm\brdnopl\post.c 0001E0
```

```
Dump of file SATURN:[PCCOMMON.DUMP.DLL]BRDNOPL.TMP;1 on 18-APR-1990 10:37:32.99
File ID (520,34,0)   End of file block 272 / Allocated 272

Virtual block number 256 (00000100), 512 (0200) bytes

 30306A6F 72705C6A 6F72705C 3A71004C 4C554E20 4C51454E 20327374 736F7000 .posts2 NEQL NULL.q:\proj\proj00 000000
 20737473 6F700063 2E74736F 705C6C70 6F6E6472 625C6073 775C6372 735C3133 31\src\wsm\brdnopl\post.c.posts  000020
 775C6372 735C3133 30306A6F 72705C6A 6F72705C 3A71004C 4C554E20 4C51454E NEQL NULL.q:\proj\proj0031\src\w 000040
 6F72705C 3A710048 78203C20 4C780063 2E74736F 705C6C70 6F6E6472 625C6073 sm\brdnopl\post.c.xL < xH.q:\pro 000060
 2E74736F 705C6C70 6F6E6472 625C6073 775C6372 735C3133 30306A6F 72705C6A j\proj0031\src\wsm\brdnopl\post. 000080
 30306A6F 72705C6A 6F72705C 3A71004C 4C554E20 4C51454E 20737473 6F700063 c.posts NEQL NULL.q:\proj\proj00 0000A0
 50737473 6F700063 2E74736F 705C6C70 6F6E6472 625C6073 775C6372 735C3133 31\src\wsm\brdnopl\post.c.postsP 0000C0
 735C3133 30306A6F 72705C6A 6F72705C 3A71004C 4C554E20 4C51454E 20686361 ack NEQL NULL.q:\proj\proj0031\s 0000E0
 51454E20 7374736F 70280063 2E74736F 705C6C70 6F6E6472 625C6073 775C6372 rc\wsm\brdnopl\post.c.(posts NEQ 000100
 2C692D20 28205B00 666E4959 663E2073 74736F70 20444E41 20294C4C 554E204C L NULL) AND posts->fYInf.[ ( -i, 000120
 0008005D 20002920 646C2500 29206963 2500202C 646C2520 28002920 69632520  %ci ).( %ld, .%ci ).%ld ). ]... 000140
 6E490065 74756F52 20646E69 46203A4D 47440002 00010001 00020008 00040004 ..............DGM: Find Route.In 000160
 00000000 00000000 00000000 00000000 00002170 6F6F6C20 7373656C 646E6520  endless loop!.................. 000180
 74736E6F 43206563 726F666E 45203A4D 47440000 00000000 00000000 00000000 ..............DGM: Enforce Const 0001A0
 081A2420 FFFF2990 0021706F 6F6C2073 73656C64 6E65206E 49007374 6E696172 raints.In endless loop!..).. $.. 0001C0
 1E821818 1E4F1A95 1C231929 1C251928 1C481933 0826248A 082223AA 081E24DE 8$..¯#".¤$&.3.H.+.%.).#...0...ý. 0001E0

Dump of file SATURN:[PCCOMMON.DUMP.DLL]BRDNOPL.TMP;1 on 18-APR-1990 10:37:32.99
File ID (520,34,0)   End of file block 272 / Allocated 272

Virtual block number 257 (00000101), 512 (0200) bytes

 00000000 08600000 3FF00000 00000000 00747271 73040000 18071884 1E801819 ..¯...■....sqrt.......Þ?..'..... 000000
 00000000 02020000 00000000 00000000 01020000 00000000 00000000 0001FFFF ................................ 000020
 00000000 00000000 00000000 00000000 00000000 00000000 00000000 00000000 ................................ 000040
 00000000 00000000 00000000 00000000 00000000 00000000 00000000 00000000 ................................ 000060
 00000000 00000000 00000000 00000000 00000000 00000000 00000000 00000000 ................................ 000080
 00000000 00000000 00000000 00000000 00000000 00000000 00000000 00000000 ................................ 0000A0
 00000000 00000000 00000000 00000000 00000000 00000000 00000000 00000000 ................................ 0000C0
 00000000 00000000 00000000 00000000 00000000 00000000 00000000 00000000 ................................ 0000E0
 00000000 00000000 00000000 00000000 00000000 00000000 00000000 00000000 ................................ 000100
 00000000 00000000 00000000 00000000 00000000 00000000 00000000 00000000 ................................ 000120
 00000000 00000000 00000000 00000000 00000000 00000000 00000000 00000000 ................................ 000140
 00000000 00000000 00000000 00000000 00000000 00000000 00000000 00000000 ................................ 000160
 00000000 00000000 00000000 00000000 00000000 00000000 00000000 00000000 ................................ 000180
 00000000 00000000 00000000 00000000 00000000 00000000 00000000 00000000 ................................ 0001A0
 00000000 00000000 00000000 00000000 00000000 00000000 00000000 00000000 ................................ 0001C0
 00000000 00000000 00000000 00000000 00000000 00000000 00000000 00000000 ................................ 0001E0

Dump of file SATURN:[PCCOMMON.DUMP.DLL]BRDNOPL.TMP;1 on 18-APR-1990 10:37:32.99
File ID (520,34,0)   End of file block 272 / Allocated 272

Virtual block number 258 (00000102), 512 (0200) bytes

 00000000 00000000 00000000 00000000 00000000 00000000 00000000 00000000 ................................ 000000
 00000000 00000000 00000000 00000000 00000000 00000000 00000000 00000000 ................................ 000020
 00000000 00000000 00000000 00000000 00000000 00000000 00000000 00000000 ................................ 000040
 00000000 00000000 00000000 00000000 00000000 00000000 00000000 00000000 ................................ 000060
 00000000 00000000 00000000 00000000 00000000 00000000 00000000 00000000 ................................ 000080
 00000000 00000000 00000000 00000000 00000000 00000000 00000000 00000000 ................................ 0000A0
 00000000 00000000 00000000 00000000 00000000 00000000 00000000 00000000 ................................ 0000C0
 00000000 00000000 00000000 00000000 00000000 00000000 00000000 00000000 ................................ 0000E0
 00000000 00000000 00000000 00000000 00000000 00000000 00000000 00000000 ................................ 000100
 00000000 00000000 00000000 00000000 00000000 00000000 00000000 00000000 ................................ 000120
 00000000 00000000 00000000 00000000 00000000 00000000 00000000 00000000 ................................ 000140
 00000000 00000000 00000000 00000000 00000000 00000000 00000000 00000000 ................................ 000160
 00000000 00000000 00000000 00000000 00000000 00000000 00000000 00000000 ................................ 000180
 00000000 00000000 00000000 00000000 00000000 00000000 00000000 00000000 ................................ 0001A0
 00000000 00000000 00000000 00000000 00000000 00000000 00000000 00000000 ................................ 0001C0
 00000000 00000000 00000000 00000000 00000000 00000000 00000000 00000000 ................................ 0001E0
```

```
Dump of file SATURN:[PCCOMMON.DUMP.DLL]BRDNOPL.TMP;1 on 18-APR-1990 10:37:32.99
File ID (520,34,0)   End of file block 272 / Allocated 272

Virtual block number 259 (00000103), 512 (0200) bytes

00000000 00000000 00000000 00000000 00000000 00000000 00000000 00000000 ................................ 000000
00000000 00000000 00000000 00000000 00000000 00000000 00000000 00000000 ................................ 000020
00000000 00000000 00000000 00000000 00000000 00000000 00000000 00000000 ................................ 000040
00000000 00000000 00000000 00000000 00000000 00000000 00000000 00000000 ................................ 000060
00000000 00000000 00000000 00000000 00000000 00000000 00000000 00000000 ................................ 000080
00000000 00000000 00000000 00000000 00000000 00000000 00000000 00000000 ................................ 0000A0
00000000 00000000 00000000 00000000 00000000 00000000 00000000 00000000 ................................ 0000C0
00000000 00000000 00000000 00000000 00000000 00000000 00000000 00000000 ................................ 0000E0
00000000 00000000 00000000 00000000 00000000 00000000 00000000 00000000 ................................ 000100
00000000 00000000 00000000 00000000 00000000 00000000 00000000 00000000 ................................ 000120
00000000 00000000 00000000 00000000 00000000 00000000 00000000 00000000 ................................ 000140
00000000 00000000 00000000 00000000 00000000 00000000 00000000 00000000 ................................ 000160
00000000 00000000 00000000 00000000 00000000 00000000 00000000 00000000 ................................ 000180
00000000 00000000 00000000 00000000 00000000 00000000 00000000 00000000 ................................ 0001A0
00000000 00000000 00000000 00000000 00000000 00000000 00000000 00000000 ................................ 0001C0
00000000 00000000 00000000 00000000 00000000 00000000 00000000 00000000 ................................ 0001E0

Dump of file SATURN:[PCCOMMON.DUMP.DLL]BRDNOPL.TMP;1 on 18-APR-1990 10:37:32.99
File ID (520,34,0)   End of file block 272 / Allocated 272

Virtual block number 260 (00000104), 512 (0200) bytes

00000000 00000000 00000000 00000000 00000000 00000000 00000000 00000000 ................................ 000000
00000000 00000000 00000000 00000000 00000000 00000000 00000000 00000000 ................................ 000020
00000000 00000000 00000000 00000000 00000000 00000000 00000000 00000000 ................................ 000040
00000000 00000000 00000000 00000000 00000000 00000000 00000000 00000000 ................................ 000060
00000000 00000000 00000000 00000000 00000000 00000000 00000000 00000000 ................................ 000080
00000000 00000000 00000000 00000000 00000000 00000000 00000000 00000000 ................................ 0000A0
00000000 00000000 00000000 00000000 00000000 00000000 00000000 00000000 ................................ 0000C0
00000000 00000000 00000000 00000000 00000000 00000000 00000000 00000000 ................................ 0000E0
00000000 00000000 00000000 00000000 00000000 00000000 00000000 00000000 ................................ 000100
00000000 00000000 00000000 00000000 00000000 00000000 00000000 00000000 ................................ 000120
00000000 00000000 00000000 00000000 00000000 00000000 00000000 00000000 ................................ 000140
00000000 00000000 00000000 00000000 00000000 00000000 00000000 00000000 ................................ 000160
00000000 00000000 00000000 00000000 00000000 00000000 00000000 00000000 ................................ 000180
00000000 00000000 00000000 00000000 00000000 00000000 00000000 00000000 ................................ 0001A0
00000000 00000000 00000000 00000000 00000000 00000000 00000000 00000000 ................................ 0001C0
00000000 00000000 00000000 00000000 00000000 00000000 00000000 00000000 ................................ 0001E0

Dump of file SATURN:[PCCOMMON.DUMP.DLL]BRDNOPL.TMP;1 on 18-APR-1990 10:37:32.99
File ID (520,34,0)   End of file block 272 / Allocated 272

Virtual block number 261 (00000105), 512 (0200) bytes

00000000 00000000 00000000 00000000 00000000 00000000 00000000 00000000 ................................ 000000
00000000 00000000 00000000 00000000 00000000 00000000 00000000 00000000 ................................ 000020
00000000 00000000 00000000 00000000 00000000 00000000 00000000 00000000 ................................ 000040
00000000 00000000 00000000 00000000 00000000 00000000 00000000 00000000 ................................ 000060
00000000 00000000 00000000 00000000 00000000 00000000 00000000 00000000 ................................ 000080
00000000 00000000 00000000 00000000 00000000 00000000 00000000 00000000 ................................ 0000A0
00000000 00000000 00000000 00000000 00000000 00000000 00000000 00000000 ................................ 0000C0
00000000 00000000 00000000 00000000 00000000 00000000 00000000 00000000 ................................ 0000E0
00000000 00000000 00000000 00000000 00000000 00000000 00000000 00000000 ................................ 000100
00000000 00000000 00000000 00000000 00000000 00000000 00000000 00000000 ................................ 000120
00000000 00000000 00000000 00000000 00000000 00000000 00000000 00000000 ................................ 000140
00000000 00000000 00000000 00000000 00000000 00000000 00000000 00000000 ................................ 000160
00000000 00000000 00000000 00000000 00000000 00000000 00000000 00000000 ................................ 000180
00000000 00000000 00000000 00000000 00000000 00000000 00000000 00000000 ................................ 0001A0
00000000 00000000 00000000 00000000 00000000 00000000 00000000 00000000 ................................ 0001C0
00000000 00000000 00000000 00000000 00000000 00000000 00000000 00000000 ................................ 0001E0
```

```
Dump of file SATURN:[PCCOMMON.DUMP.DLL]BRDNOPL.TMP;1 on 18-APR-1990 10:37:32.99
File ID (520,34,0)   End of file block 272 / Allocated 272

Virtual block number 262 (00000106), 512 (0200) bytes

00000000 00000000 00000000 00000000 00000000 00000000 00000000 00000000 ................................ 000000
00000000 00000000 00000000 00000000 00000000 00000000 00000000 00000000 ................................ 000020
00000000 00000000 00000000 00000000 00000000 00000000 00000000 00000000 ................................ 000040
00000000 00000000 00000000 00000000 00000000 00000000 00000000 00000000 ................................ 000060
00000000 00000000 00000000 00000000 00000000 00000000 00000000 00000000 ................................ 000080
00000000 00000000 00000000 00000000 00000000 00000000 00000000 00000000 ................................ 0000A0
00000000 00000000 00000000 00000000 00000000 00000000 00000000 00000000 ................................ 0000C0
00000000 00000000 00000000 00000000 00000000 00000000 00000000 00000000 ................................ 0000E0
00000000 00000000 00000000 00000000 00000000 00000000 00000000 00000000 ................................ 000100
00000000 00000000 00000000 00000000 00000000 00000000 00000000 00000000 ................................ 000120
00000000 00000000 00000000 00000000 00000000 00000000 00000000 00000000 ................................ 000140
00000000 00000000 00000000 00000000 00000000 00000000 00000000 00000000 ................................ 000160
00000000 00000000 00000000 00000000 00000000 00000000 00000000 00000000 ................................ 000180
00000000 00000000 00000000 00000000 00000000 00000000 00000000 00000000 ................................ 0001A0
00000000 00000000 00000000 00000000 00000000 00000000 00000000 00000000 ................................ 0001C0
00000000 00000000 00000000 00000000 00000000 00000000 00000000 00000000 ................................ 0001E0

Dump of file SATURN:[PCCOMMON.DUMP.DLL]BRDNOPL.TMP;1 on 18-APR-1990 10:37:32.99
File ID (520,34,0)   End of file block 272 / Allocated 272

Virtual block number 263 (00000107), 512 (0200) bytes

00000000 00000000 00000000 00000000 02000001 00000000 00000000 00000000 ................................ 000000
00000000 00000000 00000000 00000000 00000000 00000000 00000000 00000000 ................................ 000020
00000000 00000000 00000000 00000000 00000000 00000000 00000000 00000000 ................................ 000040
00000000 00000000 00000000 00000000 00000000 00000000 00000000 00000000 ................................ 000060
00000000 00000000 00000000 00000000 00000000 00000000 00000000 00000000 ................................ 000080
00000000 00000000 00000000 00000000 00000000 00000000 00000000 00000000 ................................ 0000A0
00000000 00000000 00000000 00000000 00000000 00000000 00000000 00000000 ................................ 0000C0
00000000 00000000 00000000 00000000 00000000 00000000 00000000 00000000 ................................ 0000E0
00000000 00000000 00000000 00000000 00000000 00000000 00000000 00000000 ................................ 000100
00000000 00000000 00000000 00000000 00000000 00000000 00000000 00000000 ................................ 000120
00000000 00000000 00000000 00000000 00000000 00000000 00000000 00000000 ................................ 000140
00000000 00000000 00000000 00000000 00000000 00000000 00000000 00000000 ................................ 000160
00000000 00000000 00000000 00000000 00000000 00000000 00000000 00000000 ................................ 000180
00000000 00000000 00000000 00000000 00000000 00000000 00000000 00000000 ................................ 0001A0
00000000 00000000 00000000 00000000 00000000 00000000 00000000 00000000 ................................ 0001C0
00000000 00000000 00000000 00000000 00000000 00000000 00000000 00000000 ................................ 0001E0

Dump of file SATURN:[PCCOMMON.DUMP.DLL]BRDNOPL.TMP;1 on 18-APR-1990 10:37:32.99
File ID (520,34,0)   End of file block 272 / Allocated 272

Virtual block number 264 (00000108), 512 (0200) bytes

00000000 00000000 00000000 00000000 00000000 00000000 00000000 00000000 ................................ 000000
00000000 00000000 00000000 00000000 00000000 00000000 00000000 00000000 ................................ 000020
00000000 00000000 00000000 00000000 00000000 00000000 00000000 00000000 ................................ 000040
00000000 00000000 00000000 00000000 00000000 00000000 00000000 00000000 ................................ 000060
00000000 00000000 00000000 00000000 00000000 00000000 00000000 00000000 ................................ 000080
00000000 00000000 00000000 00000000 00000000 00000000 00000000 00000000 ................................ 0000A0
00000000 00000000 00000000 00000000 00000000 00000000 00000000 00000000 ................................ 0000C0
00000000 00000000 00000000 00000000 00000000 00000000 00000000 00000000 ................................ 0000E0
00000000 00000000 00000000 00000000 00000000 00000000 00000000 00000000 ................................ 000100
00000000 00000000 00000000 00000000 00000000 00000000 00000000 00000000 ................................ 000120
00000000 00000000 00000000 00000000 00000000 00000000 00000000 00000000 ................................ 000140
00000000 00000000 00000000 00000000 00000000 00000000 00000000 00000000 ................................ 000160
00000000 00000000 00000000 00000000 00000000 00000000 00000000 00000000 ................................ 000180
00000000 00000000 00000000 00000000 00000000 00000000 00000000 00000000 ................................ 0001A0
00000000 00000000 00000000 00000000 00000000 00000000 00000000 00000000 ................................ 0001C0
00000000 00000000 00000000 00000000 00000000 00000000 00000000 00000000 ................................ 0001E0
```

```
Dump of file SATURN:[PCCOMMON.DUMP.DLL]BRDNOPL.TMP;1 on 18-APR-1990 10:37:32.99
File ID (520,34,0)   End of file block 272 / Allocated 272

Virtual block number 265 (00000109), 512 (0200) bytes

 00000000 000000C0 00000000 00000000 00000000 00000000 00000000 00000000 ................................ 000000
 00000000 00000000 00000000 00000000 00000000 00000000 00000000 00000000 ................................ 000020
 00000000 00000000 00000000 00000000 00000000 00000000 00000000 00000000 ................................ 000040
 00000000 00000000 00000000 00000000 00000000 00000000 00000000 00000000 ................................ 000060
 00000000 00000000 00000000 00000000 00000000 00000000 00000000 00000000 ................................ 000080
 00000000 00000000 00000000 00000000 00000000 00000000 00000000 00000000 ................................ 0000A0
 00000000 00000000 00000000 00000000 00000000 00000000 00000000 00000000 ................................ 0000C0
 00000000 00000000 00000000 00000000 00000000 00000000 00000000 00000000 ................................ 0000E0
 00000000 00000000 00000000 00000000 00000000 00000000 00000000 00000000 ................................ 000100
 00000000 00000000 00000000 00000000 00000000 00000000 00000000 00000000 ................................ 000120
 00000000 00000000 00000000 00000000 00000000 00000000 00000000 00000000 ................................ 000140
 00000000 00000000 00000000 00000000 00000000 00000000 00000000 00000000 ................................ 000160
 00000000 00000000 00000000 00000000 00000000 00000000 00000000 00000000 ................................ 000180
 00000000 00000000 00000000 00000000 00000000 00000000 00000000 00000000 ................................ 0001A0
 00000000 00000000 00000000 00000000 00000000 00000000 00000000 00000000 ................................ 0001C0
 00000000 00000000 00000000 00000000 00000000 00000000 00000000 00000000 ................................ 0001E0

Dump of file SATURN:[P.COMMON.DUMP.DLL]BRDNOPL.TMP;1 on 18-APR-1990 10:37:32.99
File ID (520,34,0)   End of file block 272 / Allocated 272

Virtual block number 266 (0000010A), 512 (0200) bytes

 00296C6C 756E2800 296C6C75 6E280000 00000000 00002828 17400000 00000000 ......@.((........(null).(null). 000000
 01010000 00001D74 2C801D70 2C801D6C 2C801D68 2C8027FE 2C800000 23202028 +- #...,z'.,h...l..,p..,t....... 000020
 00000000 00000000 00000000 000080C0 E0F0F8FC FEFF0000 00007878 31364005 .M61xx.....z=ÿÞÀÀ.............. 000040
 00000000 00000000 00000000 00000000 00000000 00000000 00000000 00000000 ................................ 000060
 00790078 00000000 00000000 00000000 00000000 00000000 00000000 00000000 ..........................x.y. 000080
 00000000 00000000 00000000 00000030 30302B65 00203A02 0000007A 00000000 ....z....: .e+000............... 0000A0
 00000000 00000000 00000000 00000000 00000000 00000000 00000000 00000000 ................................ 0000C0
 00000000 00000000 00000000 00000000 00000000 00000000 00000000 00000000 ................................ 0000E0
 00000000 00000000 00000000 00000000 00000000 00000000 00000000 00000000 ................................ 000100
 00000000 00000000 00000000 00000000 00000000 00000000 00000000 00000000 ................................ 000120
 00000000 00000000 00000000 00000000 00000000 00000000 00000000 00000000 ................................ 000140
 00000000 00000000 00000000 00000000 00000000 00000000 00000000 00000000 ................................ 000160
 00000000 00000000 00000000 00000000 00000000 00000000 00000000 00000000 ................................ 000180
 00000000 00000000 00000000 00000000 00000000 00000000 00000000 00000000 ................................ 0001A0
 00000000 00000000 00000000 00000000 00000000 00000000 00000000 00000000 ................................ 0001C0
 00000000 00000000 00000000 00000000 00000000 00000000 00000000 00000000 ................................ 0001E0

Dump of file SATURN:[PCCOMMON.DUMP.DLL]BRDNOPL.TMP;1 on 18-APR-1990 10:37:32.99
File ID (520,34,0)   End of file block 272 / Allocated 272

Virtual block number 267 (0000010B), 512 (0200) bytes

 00000000 00000000 00000000 00000000 00000000 00000000 00000000 00000000 ................................ 000000
 00000000 1E0A0000 00000000 00000000 00000000 00000000 00000000 00000000 ................................ 000020
 00000000 00000000 00000000 00000000 00000000 00002852 2B802C19 2B802BB0 ¯+¯+.,¯+R(...................... 000040
 00000000 00000000 00000000 00000000 00000000 00000000 00000000 00000000 ................................ 000060
 00000000 00000000 00000000 00000000 00000000 00000000 00000000 00000000 ................................ 000080
 00000000 00000000 00000000 00000000 00000000 00000000 00000000 00000000 ................................ 0000A0
 00000000 00000000 00000000 00000000 00000000 00000000 00000000 00000000 ................................ 0000C0
 00000000 00000000 00000000 00000000 00000000 00000000 00000000 00000000 ................................ 0000E0
 00000000 00000000 00000000 00000000 00000000 00000000 00000000 00000000 ................................ 000100
 00000000 00000000 00000000 00000000 00000000 00000000 00000000 00000000 ................................ 000120
 00000000 00000000 00000000 00000000 00000000 00000000 00000000 00000000 ................................ 000140
 00000000 00000000 00000000 00000000 00000000 00000000 00000000 00000000 ................................ 000160
 00000000 00000000 00000000 00000000 00000000 00000000 00000000 00000000 ................................ 000180
 00000000 00000000 00000000 00000000 00000000 00000000 00000000 00000000 ................................ 0001A0
 00000000 00000000 00000000 00000000 00000000 00000000 00000000 00000000 ................................ 0001C0
 00000000 00000000 00000000 00000000 00000000 00000000 00000000 00000000 ................................ 0001E0
```

```
Dump of file SATURN:[PCCOMMON.DUMP.DLL]BRDNOPL.TMP;1 on 18-APR-1990 10:37:32.99
File ID (520,34,0)    End of file block 272 / Allocated 272

Virtual block number 268 (0000010C), 512 (0200) bytes

00000000 00000000 00000000 00000000 00000000 00000000 00000000 00000000 ................................ 000000
00000000 00000000 00000000 00000000 00000000 00000000 00000000 00000000 ................................ 000020
00000000 00000000 00000000 00000000 00000000 00000000 00000000 00000000 ................................ 000040
00000000 00000000 0C000000 00000000 00000000 00000000 00000000 00000000 ................................ 000060
00000000 00000000 00000000 00000000 00000000 00000000 00000000 00000000 ................................ 000080
00000000 00000000 00000000 00000000 00000000 00000000 00000000 00000000 ................................ 0000A0
00000000 00000000 00000000 00000000 00000000 00000000 00000000 00000000 ................................ 0000C0
00000000 00000000 00000000 00000000 00000000 00000000 00000000 00000000 ................................ 0000E0
00000000 00000000 00000000 00000000 00000000 00000000 00000000 00000000 ................................ 000100
00000000 00000000 00000000 00000000 00000000 00000000 00000000 00000000 ................................ 000120
00000000 00000000 00000000 00000000 00000000 00000000 00000000 00000000 ................................ 000140
00000000 00000000 00000000 00000000 00000000 00000000 00000000 00000000 ................................ 000160
00000000 00000000 00000000 00000000 00000000 00000000 00000000 00000000 ................................ 000180
00000000 00000000 00000000 00000000 00000000 00000000 00000000 00000000 ................................ 0001A0
00000000 00000000 00000000 00000000 00000000 00000000 00000000 00000000 ................................ 0001C0
00000000 00000000 00000000 00000000 00000000 00000000 00000000 00000000 ................................ 0001E0

Dump of file SATURN:[PCCOMMON.DUMP.DLL]BRDNOPL.TMP;1 on 18-APR-1990 10:37:32.99
File ID (520,34,0)    End of file block 272 / Allocated 272

Virtual block number 269 (0000010D), 512 (0200) bytes

00000000 00000000 00000000 00000000 00000000 00000000 00000000 00000000 ................................ 000000
00000000 00000000 00000000 00000000 00000000 00000000 00000000 00000000 ................................ 000020
00000000 00000000 00000030 4F464E49 5F454C49 465F435F 1F860000 00000000 ........_C_FILE_INFO=........... 000040
00000000 00000000 00000000 00000000 00000000 81818101 00000001 00000000 ................................ 000060
00000000 00000000 00000000 00000000 00000000 00000000 00000000 00000000 ................................ 000080
00000000 00000000 00000000 00000000 00000000 00000000 00000000 00000000 ................................ 0000A0
00000000 00000000 00000000 00000000 00000000 00000000 00000000 00000000 ................................ 0000C0
00000000 00000000 00000000 00000000 00000000 00000000 00000000 00000000 ................................ 0000E0
00000000 00000000 00000000 00000000 00000000 00000000 00000000 00000000 ................................ 000100
00000000 00000000 00000000 00000000 00000000 00000000 00000000 00000000 ................................ 000120
00000000 00000000 00000000 00000000 00000000 00000000 00000000 00000000 ................................ 000140
0A0A0A0A 0A0A0A0A 0A0A0A0A 0A0A0A0A 0A0A0A0A 0A0A0A00 00000000 00000000 ................................ 000160
0A0A0A0A 0A0A0A0A 0A0A0A0A 0A0A0A0A 0A0A0A0A 0A0A0A0A 0A0A0A0A 0A0A0A0A ................................ 000180
0A0A0A0A 0A0A0A0A 0A0A0A0A 0A0A0A0A 0A0A0A0A 0A0A0A0A 0A0A0A0A 0A0A0A0A ................................ 0001A0
0A0A0A0A 0A0A0A0A 0A0A0A0A 0A0A0A0A 0A0A0A0A 0A0A0A0A 0A0A0A0A 0A0A0A0A ................................ 0001C0
0A0A0A0A 0A0A0A0A 0A0A0A0A 0A0A0A0A 0A0A0A0A 0A0A0A0A 0A0A0A0A 0A0A0A0A ................................ 0001E0

Dump of file SATURN:[PCCOMMON.DUMP.DLL]BRDNOPL.TMP;1 on 18-APR-1990 10:37:32.99
File ID (520,34,0)    End of file block 272 / Allocated 272

Virtual block number 270 (0000010E), 512 (0200) bytes

0A0A0A0A 0A0A0A0A 0A0A0A0A 0A0A0A0A 0A0A0A0A 0A0A0A0A 0A0A0A0A 0A0A0A0A ................................ 000000
0A0A0A0A 0A0A0A0A 0A0A0A0A 0A0A0A0A 0A0A0A0A 0A0A0A0A 0A0A0A0A 0A0A0A0A ................................ 000020
0A0A0A0A 0A0A0A0A 0A0A0A0A 0A0A0A0A 0A0A0A0A 0A0A0A0A 0A0A0A0A 0A0A0A0A ................................ 000040
00000000 00000000 00000000 00000000 00000000 0000000A 0A0A0A0A 0A0A0A0A ................................ 000060
20202020 20202020 20202020 20202020 20282828 28282020 20202020 20202000 .         (((((                  000080
10101010 10848484 84848484 84848410 10101010 10101010 10101010 10104820 H............................... 0000A0
10101010 01010101 01010101 01010101 01010101 01010101 81818181 81811010 ................................ 0000C0
10101010 02020202 02020202 02020202 02020202 02020202 82828282 82821010 ................................ 0000E0
00000000 00000000 00000000 00000000 00000000 00000000 00000000 00000020  ............................... 000100
00000000 00000000 00000000 00000000 00000000 00000000 00000000 00000000 ................................ 000120
00000000 00000000 00000000 00000000 00000000 00000000 00000000 00000000 ................................ 000140
00000000 00000000 00000000 00000000 00000000 00000000 00000000 00000000 ................................ 000160
00000000 00000000 00000000 00000000 00000000 00000000 00000000 00000000 ................................ 000180
00000000 00003FE0 00000000 00000000 7FEFFFFF FFFFFFFF 00000000 00000000 ..............ÿ.........Å?...... 0001A0
0200FFFF FFFF0000 00000000 00000000 00000000 00004000 00000000 00003FF0 Þ?.......@...................... 0001C0
00000000 00000000 00000000 00002000 00000000 00000000 00000000 00000000 ................ ............... 0001E0
```

```
Dump of file SATURN:[PCCOMMON.DUMP.DLL]BRDNOPL.TMP;1 on 18-APR-1990 10:37:32.99
File ID (520,34,0)   End of file block 272 / Allocated 272

Virtual block number 271 (0000010F), 512 (0200) bytes

00000000 00000000 00000000 00000000 00000000 00000000 00000000 00000000 ................................ 000000
00000000 00000000 00000000 00000000 00000000 00000000 00000000 00000000 ................................ 000020
00000000 00000000 00000000 00000000 00000000 00000000 00000000 00000000 ................................ 000040
00000000 00000000 00000000 00000000 00000000 00000000 00000000 00000000 ................................ 000060
00000000 00000000 00000000 00000000 00000000 00000000 00000000 00000000 ................................ 000080
082A01D2 00000000 00000000 00000000 00000000 00000000 00000000 00000000 ............................Ò.*. 0000A0
00003FE0 00000000 00002810 35282808 14630000 00001078 2A260000 281432CE ö2.(..&*x.....c..((5.(......Å?.. 0000C0
66666666 66663FE0 00000000 00003FE0 00000000 00002826 FFFF3FE0 00000000 ....Å?..&(......Å?......Å?ffffff 0000E0
4D4E3C3C 00000000 00000000 1D483FE0 00000000 00000000 00000000 00003FEE Ÿ?..............Å?H.........<<NM 000100
6520746E 696F702D 676E6974 616F6C66 202D0A00 48544140 203A00FD 3E3E4753 SG>>ý.: MATH..- floating-point e 000120
30207962 20656469 76696400 67000A0D 64696C61 766E6900 6500203A 726F7272 rror: .e.invalid...g.divide by 0 000140
776F6C66 7265766F 20686361 7473006E 000A0077 6F6C6672 65766F00 68000A00 ...h.overflow...n.stack overflow 000160
4F440078 000A0064 65746172 656E6567 20796C74 6963696C 70786500 70000A00 ...p.explicitly generated...x.DO 000180
4C54007A 000A0072 6F727265 20474E49 53007900 0A00726F 72726520 4E49414D MAIN error...y.SING error...z.TL 0001A0
65766F20 68636174 7320200A 00303030 36520000 000A0072 6F727265 2053534F OSS error.....R6000..- stack ove 0001C0
64697669 64207265 6765746E 6920200A 00333030 36520003 000A0077 6F6C6672 rflow.....R6003..- integer divid 0001E0

Dump of file SATURN:[PCCOMMON.DUMP.DLL]BRDNOPL.TMP;1 on 18-APR-1990 10:37:32.99
File ID (520,34,0)   End of file block 272 / Allocated 272

Virtual block number 272 (00000110), 512 (0200) bytes

73206867 756F6E65 20746F6E 202D0A00 38303036 52000800 0A0D3020 79622065 e by 0.....R6008..- not enough s 000000
202D0A00 39303036 52000900 0A0D7374 6E656D75 67726120 726F6620 65636170 pace for arguments.....R6009..-  000020
746E656D 6E6F7269 766E6520 726F6620 65636170 73206867 756F6E65 20746F6E not enough space for environment 000040
30303652 00020020 726F7272 65206560 6974206E 757200FF 000A0D00 FC000A0D ...•......run-time error ...R600 000060
0A0D6465 64616F6C 20746F6E 20746E69 6F702067 6E697461 6F6C6620 2D0A0D32 2..- floating point not loaded.. 000080
00000000 00000000 00000000 00000000 00000000 00000000 00000000 00FFFF00 ................................ 0000A0
191F8800 02000000 18085A00 02000000 17280200 020003FF 00000000 00000000 ..............(......Z.......... 0000C0
00000000 00000000 00000000 00000000 00000000 00000000 00000000 00000000 ................................ 0000E0
00000000 00000000 00000000 00000000 00000000 00000000 00000000 00000000 ................................ 000100
00000000 00000000 00000000 00000000 00000000 00000000 00000000 00000000 ................................ 000120
00000000 00000000 00000000 00000000 00000000 00000000 00000000 00000000 ................................ 000140
00000000 00000000 00000000 00000000 00000000 00000000 00000000 00000000 ................................ 000160
00000000 00000000 00000000 00000000 00000000 00000000 00000000 00000000 ................................ 000180
00000000 00000000 00000000 00000000 00000000 00000000 00000000 00000000 ................................ 0001A0
00000000 00000000 00000000 00000000 00000000 00000000 00000000 00000000 ................................ 0001C0
00000000 00000000 00000000 00000000 00000000 00000000 00000000 00000000 ................................ 0001E0
```

```
Dump of file SATURN:[PCCOMMON.DUMP.DLL]BRD.TMP;1 on 18-APR-1990 10:36:59.83
File ID (519,15,0)   End of file block 272 / Allocated 272

Virtual block number 1 (00000001), 512 (0200) bytes

 00000000 00000040 00000000 00000088 0000FFFF 00000004 00000110 00E35A40 MZD.............|........ə....... 000000
 00000080 00000000 00000000 00000000 00000000 00000000 00000000 00000000 ................................ 000020
 6F6E6E61 63206F61 72676F72 70207369 685421CD 4C01B821 CD09B400 0EBA1F0E ..o..Ç.ë|¡.L€!This program canno 000040
 00000000 00000024 0A0D0D2E 65646F6D 20534F44 206E6920 6E757220 65622074 t be run in DOS mode....$....... 000060
 00070019 00000000 00172ADA 00000000 00198009 324A5261 024C0075 0505454E NE..u.L.aRJ2........Ö*.......... 000080
 00000000 00000000 00010000 00040000 00001041 0AA10A93 01080108 00400048 H.ə.......Å.A................... 0000A0
 1B640F00 1B640461 0F860F00 0F860362 16CE0F00 16CE01EF 0D000F00 0D000109 ..Å...Å.ÿ.ö...ö.b.......a.d...d. 0000C0
 0BFC0F00 0BFC0803 071E0F00 071E0788 02C80F00 02C8075B 12B40F00 12B40621 !.Ç...Ç.[.à...à...........*...*. 0000E0
 05000F00 05000C3E 0EEE0F00 0EEE084C 0A4E0F00 0A4E0AA4 1D820F00 1D8208C7 ü.......Ê.N...N.L.Ÿ...Ÿ.>....... 000100
 071C0F00 071C11A1 125C0F00 125C1078 11020F00 11020F64 2C7A0F00 2C7A0C94 ..z,..z,d.......x.\...\.À....... 000120
 0AD80F00 0AD717E2 06C00F00 06C01770 31A60F00 31A6144C 233E0F00 233E1215 ..>#..>#L.Ì1..Ì1p.à...à.ã.m...Ä. 000140
 02000E21 00000000 42920F00 429218 1C 06640F00 06641A81 21760F00 21761892 ..vl..vlÝ.d...d....B...B....!... 000160
 00014544 4F4D434F 53534154 45534452 420F0000 44524203 2B800F21 2A091F4C L..*!.¯+.BRD...BRDSETASSOCMODE.. 000180
 4C485952 45555145 54554F52 44524212 00025241 454C4345 434E4546 4452420D .BRDFENCECLEAR...BRDROUTEQUERYHL 0001A0
 52414554 44524218 00044449 52474145 52415952 45555144 52421000 03454E49 INE...BRDQUERYAREAGRID...BRDTEAR 0001C0
 45545845 59524555 51445242 0E00054F 464E4952 45535559 52455551 504F5244 DROPQUERYUSERINFO...BRDQUERYEXTE 0001E0

Dump of file SAT''N:[PCCOMMON.DUMP.DLL]BRD.TMP;1 on 18-APR-1990 10:36:59.83
File ID (519,15,'    End of file block 272 / Allocated 272

Virtual block number 2 (00000002), 512 (0200) bytes

 4F525445 53414552 41445242 13000743 4F535341 4E4E4F43 4452420C 0006544E NT...BRDCONNASSOC...BRDAREASETRO 000000
 55494441 52455355 4F4D5952 4555514E 4E4F4344 52421700 08545349 44444E55 UNDDIST...BRDCONNQUERYMOUSERADIU 000020
 4F524452 4213000A 4F464E49 52455355 59524555 51414552 41445242 14000953 S...BRDAREAQUERYUSERINFO...BRDRO 000040
 4543414C 50455245 54554F52 44524211 0008544E 45545845 59524555 51455455 UTEQUERYEXTENT...BRDROUTEREPLACE 000060
 43445242 12000D44 49524745 54554F52 4F545450 50414E53 44524214 000C5450 PT...BRDSNAPPTTOROUTEGRID...BRDC 000080
 5241454C 43534945 434E4546 4452420F 000E4F46 4E495245 53555445 534E4E4F ONNSETUSERINFO...BRDFENCEISCLEAR 0000A0
 44524212 00104554 554F5259 42524145 4E454E49 4D524554 45444452 4217000F ...BRDDETERMINENEARBYROUTE...BRD 0000C0
 49535952 4555514E 4E4F4344 52421000 11545245 564E4F43 54484749 41525453 STRAIGHTCONVERT...BRDCONNQUERYSI 0000E0
 534E4E4F 43445242 10001341 45524159 52455551 4E4E4F43 44524210 00124544 DE...BRDCONNQUERYAREA...BRDCONNS 000100
 0015544E 45545845 59524555 514C4542 414C4452 42130014 544E4554 58455445 ETEXTENT...BRDLABELQUERYEXTENT.. 000120
 52455551 4554554F 52445242 15001645 44495354 46494853 41455241 44524210 .BRDAREASHIFTSIDE...BRDROUTEQUER 000140
 53445242 13001B43 4F535341 4554554F 52445242 0000174F 464E4952 45535559 YUSERINFO...BRDROUTEASSOC...BRDS 000160
 42595245 55514543 4E454644 52421800 1945434E 41545349 44455455 4F525445 ETROUTEDISTANCE...BRDFENCEQUERYB 000180
 44524211 00184554 41455243 4E4E4F43 4452420D 001A5453 49444B43 4150584F OXPACKDIST...BRDCONNCREATE...BRD 0001A0
 554F5259 52455551 41455241 44524215 001C544E 554F4359 52455551 444E4946 FINDQUERYCOUNT...BRDAREAQUERYROU 0001C0
 52421500 1E544E55 4F435952 45555145 54554F52 44524212 001D5453 4944444E NDDIST...BRDROUTEQUERYCOUNT...BR 0001E0

Dump of file SATURN:[PCCOMMON.DUMP.DLL]BRD.TMP;1 on 18-APR-1990 10:36:59.83
File ID (519,15,0)   End of file block 272 / Allocated 272

Virtual block number 3 (00000003), 512 (0200) bytes

 55514543 4E454644 52421300 1F53544E 49415254 534E4F43 4543524F 464E4544 DENFORCECONSTRAINTS...BRDFENCEQU 000000
 49474552 4E495354 43454A42 4F444E49 46445242 16002054 4E455458 45595245 ERYEXTENT ..BRDFINDOBJECTSINREGI 000020
 44524219 00225355 49444152 4553554F 4D544553 4E4E4F43 44524215 00214E4F ONI..BRDCONNSETMOUSERADIUS"..BRD 000040
 4542414C 44524215 00235354 4F4C5354 48474941 52545359 52455551 4E4E4F43 CONNQUERYSTRAIGHTSLOTS#..BRDLABE 000060
 0025434F 5353414C 4542414C 4452420D 00244F46 4E495245 53555952 4555514C LQUERYUSERINFO$..BRDLABELASSOC%. 000080
 45555144 52420C00 26504F52 44544859 52455551 504F5244 52414554 44524216 .BRDTEARDROPQUERYHTDROP&..BRDQUE 0000A0
 4452420F 0028434F 53534944 504F5244 52414554 44524211 00274550 59545952 RYTYPE'..BRDTEARDROPDISSOC(..BRD 0000C0
 4215002A 544E4952 5045434E 45464452 42000029 4D495254 54455345 54554F52 ROUTESETTRIM)..BRDFENCEPRINT*..B 0000E0
 45444E4E 4F434452 4200002B 4D494444 4E4F4D41 49445445 53455455 4F524452 RDROUTESETDIAMONDDIM+..BRDCONNDE 000100
 45555144 52421100 20545845 4E595245 5551444E 49464452 4210002C 4554454C LETE,..BRDFINDQUERYNEXT-..BRDQUE 000120
 2F504145 48595245 55514543 4E454644 52421100 2E45444F 4D434F53 53415952 RYASSOCMODE...BRDFENCEQUERYHEAP/ 000140
 43595245 55514554 554F5244 52421100 30435241 5445534E 4E4F4344 52420000 ..BRDCONNSETARC0..BRDROUTEQUERYC 000160
 55514E4E 4F434452 42120032 45544145 52434554 554F5244 52420E00 314E4E4F ONN1..BRDROUTECREATE2..BRDCONNQU 000180
 42110034 434F5353 41504F52 44524145 54445242 10003354 4E455458 45595245 ERYEXTENT3..BRDTEARDROPASSOC4..B 0001A0
 54454C45 44455455 4F524452 420E0035 45544145 52435448 47494152 54534452 RDSTRAIGHTCREATE5..BRDROUTEDELET 0001C0
 54505952 45555145 54554F52 4452420F 0037594F 52545345 44445242 0A003645 E6..BRDDESTROY7..BRDROUTEQUERYPT 0001E0
```

```
Dump of file SATURN:[PCCOMMON.DUMP.DLL]BRD.TMP;1 on 18-APR-1990 10:36:59.83
File ID (519,15,0)   End of file block 272 / Allocated 272

Virtual block number 4 (00000004), 512 (0200) bytes

 5145434E 45464452 421A0039 53544F4C 53595245 55514E4E 4F434452 42110038 8..BRDCONNQUERYSLOTS9..BRDFENCEQ 000000
 434F5353 41414552 41445242 0C003A54 5349444B 43415045 434E4546 59524555 UERYFENCEPACKDIST:..BRDAREAASSOC 000020
 55514545 434E4546 44524200 003C4554 554F5250 554E4145 4C434452 420F0038 ;..BRDCLEANUPROUTE<..BRDFENCEEQU 000040
 4F524452 41455444 52421600 3E454449 53544553 4E4E4F43 4452420E 00304C41 AL=..BRDCONNSETSIDE>..BRDTEARDRO 000060
 42150040 4D494454 45534E4E 4F434452 4200003F 4F464E49 52455355 54455350 PSETUSERINFO?..BRDCONNSETDIM@..B 000080
 424F444E 49464452 42110041 45434E41 54534944 4554554F 52595245 55514452 RDQUERYROUTEDISTANCEA..BRDFINDOB 0000A0
 41445242 12004345 54414552 434C4542 414C4452 420E0042 54505441 5443454A JECTATPTB..BRDLABELCREATEC..BRDA 0000C0
 11004559 504F4345 434E4546 4452420C 00444F46 4E495245 53555445 53414552 REASETUSERINFOD..BRDFENCECOPYE.. 0000E0
 59524555 514E4E4F 43445242 14004644 49524745 54554F52 59524555 51445242 BRDQUERYROUTEGRIDF..BRDCONNQUERY 000100
 46445242 10004844 49524741 45524154 45534452 420E0047 4F464E49 52455355 USERINFOG..BRDSETAREAGRIDH..BRDF 000120
 13004A45 54454C45 444C4542 414C4452 420E0049 444E454E 4F494745 52444E49 INDREGIONENDI..BRDLABELDELETEJ.. 000140
 45555141 45524144 52421200 48444952 47414552 414F5454 5050414E 53445242 BRDSNAPPTTOAREAGRIDK..BRDAREAQUE 000160
 42110040 52545441 59524555 51455455 4F524452 4211004C 45444953 54505952 RYPTSIDEL..BRDROUTEQUERYATTRM..B 000180
 59524555 51455455 4F524452 4217004E 4554554F 52595245 55514E4E 4F434452 RDCONNQUERYROUTEN..BRDROUTEQUERY 0001A0
 584F4246 49434C41 43455245 434E4546 4452421A 004F4D49 44444E4F 4D414944 DIAMONDDIMO..BRDFENCERECALCIFBOX 0001C0
 0F005154 4E455241 50595245 55514C45 42414C44 52421300 50444556 4F4D4552 REMOVEDP..BRDLABELQUERYPARENTQ.. 0001E0

Dump of file SATURN:[PCCOMMON.DUMP.DLL]BRD.TMP;1 on 18-APR-1990 10:36:59.83
File ID (519,15,0)   End of file block 272 / Allocated 272

Virtual block number 5 (00000005), 512 (0200) bytes

 45564F4D 45524554 554F5244 52421000 52525454 41544553 4554554F 52445242 BRDROUTESETATTRR..BRDROUTEREMOVE 000000
 45524144 52421000 54545052 4F48434E 41544553 4E4E4F43 44524212 00535450 PTS..BRDCONNSETANCHORPTT..BRDARE 000020
 00564554 554F5242 55535452 45534E49 44524211 0055544E 45545845 54455341 ASETEXTENTU..BRDINSERTSUBROUTEV. 000040
 0E005845 564F4D4C 4542414C 4452420C 00575450 44444145 54554F52 4452420D .BRDROUTEADDPTW..BRDLABELMOVEX.. 000060
 4E494C59 504F4345 54554F52 44524210 0059584F 42444441 45434E45 46445242 BRDFENCEADDBOXY..BRDROUTECOPYLIN 000080
 504F5244 52414554 44524211 005B4554 41455243 45434E45 46445242 0E005A45 EZ..BRDFENCECREATE[..BRDTEARDROP 0000A0
 0F005D54 50524F48 434E4159 52455551 4E4E4F43 44524214 005C4554 41455243 CREATE\..BRDCONNQUERYANCHORPT].. 0000C0
 49524745 54554F52 54455344 52420F00 5E455059 544A424F 59524555 51445242 BRDQUERYOBJTYPE^..BRDSETROUTEGRI 0000E0
 59524555 514E4E4F 43445242 0F006045 54414552 43414552 41445242 0D005F44 D_..BRDAREACREATE`..BRDCONNQUERY 000100
 554F5244 52420E00 62544E45 54584554 45534C45 42414C44 52421100 61435241 ARCa..BRDLABELSETEXTENTb..BRDROU 000120
 554F5244 52421100 6445564F 4D45434E 45464452 420C0063 434F5353 49444554 TEDISSOCc..BRDFENCEMOVEd..BRDROU 000140
 45464649 434C4143 45524543 4E454644 52421C00 65404952 54595245 55514554 TEQUERYTRIMe..BRDFENCERECALCIFFE 000160
 4F524454 48544553 504F5244 52414554 44524214 00664445 564F4D45 5245434E NCEREMOVEDf..BRDTEARDROPSETHTDRO 000180
 52445242 1300684D 4944574F 52524159 52455551 4554554F 52445242 150C-750 Pg..BRDROUTEQUERYARROWDIMh..BRDR 0001A0
 45535554 45534554 554F5244 52421300 6940494D 574F5252 41544553 45545.4F OUTESETARROWDIMi..BRDROUTESETUSE 0001C0
 44504F52 44524145 54445242 11006845 54414552 43445242 09006A4F 464E4952 RINFOj..BRDCREATEk..BRDTEARDROPD 0001E0

Dump of file SATURN:[PCCOMMON.DUMP.DLL]BRD.TMP;1 on 18-APR-1990 10:36:59.83
File ID (519,15,0)   End of file block 272 / Allocated 272

Virtual block number 6 (00000006), 512 (0200) bytes

 45535445 53445242 11006D45 54454C45 44414552 41445242 0D006C45 54454C45 ELETEl..BRDAREADELETEm..BRDSETSE 000000
 42414C44 52420E00 6F45564F 4D414552 41445242 08006E52 4544524F 48435241 ARCHORDERn..BRDAREAMOVEo..BRDLAB 000020
 4E45545B 45595245 5551504F 52445241 45544452 42160070 434F5353 49444C45 ELDISSOCp..BRDTEARDROPQUERYEXTEN 000040
 45464452 420F0072 4E4E4F43 59524555 51504F52 44524145 54445242 14007154 Tq..BRDTEARDROPQUERYCONNr..BRDFE 000060
 420C0074 4D494459 52455551 4E4E4F43 4452420F 0073594F 52545345 4445434E NCEDESTROYs..BRDCONNQUERYDIMt..B 000080
 544E4554 58455952 45555141 45524144 52421200 75455455 4F52444E 49464452 RDFINDROUTEu..BRDAREAQUERYEXTENT 0000A0
 45534C45 42414C44 52421300 774E4E4F 43595245 55514145 52414452 42100076 v..BRDAREAQUERYCONNw..BRDLABELSE 0000C0
 42110079 45434E45 46444441 45434E45 46445242 1000784F 464E4952 45535554 TUSERINFOx..BRDFENCEADDFENCEy..B 0000E0
 C7028902 32002F00 10000700 0100007A 45505954 59524555 51455455 4F524452 RDROUTEQUERYTYPEz......../.2.¿.ú 000100
 4C42434F 4C4C414D 454D004D 45400353 4C4C4143 534F4408 4E495740 50050002 ...PMWIN.DOSCALLS.MEM.MEMALLOCBL 000120
 45544154 4F525450 5048530B 50485303 4B434F4C 42454552 464D454D 0C4B434F OCK.MEMFREEBLOCK.SHP.SHPPTROTATE 000140
 44495359 52455551 584F4250 48530F58 4F425345 53534F52 43584F42 50485310 .SHPBOXCROSSESBOX.SHPBOXQUERYSID 000160
 530C594F 52545345 44454E49 4C504853 0E455441 45524345 4E494C50 48530D45 E.SHPLINECREATE.SHPLINEDESTROY.S 000180
 5048530F 54504543 414C5045 52454E49 4C504853 10545044 4441454E 494C5048 HPLINEADDPT.SHPLINEREPLACEPT.SHP 0001A0
 530E544E 554F4359 52455551 454E494C 50485311 54504556 4F4D4552 454E494C LINEREMOVEPT.SHPLINEQUERYCOUNT.S 0001C0
 544E4554 58455952 45555145 4E494C50 48531254 50595245 5551454E 494C5048 HPLINEQUERYPT.SHPLINEQUERYEXTENT 0001E0
```

Dump of file SATURN:[PCCOMMON.DUMP.DLL]BRD.TMP;1 on 18-APR-1990 10:36:59.83
File ID (519,15,0)   End of file block 272 / Allocated 272

Virtual block number 7 (00000007), 512 (0200) bytes

```
49444049 52545445 53454E49 4C504853 12525454 41544553 454E494C 5048530E .SHPLINESETATTR.SHPLINESETTRIMDI 000000
59524555 51454E49 4C504853 14525454 41595245 5551454E 494C5048 53105453 ST.SHPLINEQUERYATTR.SHPLINEQUERY 000020
54494E49 454E4C4C 50485311 59504F43 454E494C 5048530B 54534944 4D495254 TRIMDIST.SHPLINECOPY.SHPLINEINIT 000040
4E494C50 48531254 50545845 4E595245 5551454E 494C5048 53125450 5458454E NEXTPT.SHPLINEQUERYNEXTPT.SHPLIN 000060
4944574F 52524159 52455551 454E494C 50485314 4D494457 4F525241 54455345 ESETARROWDIM.SHPLINEQUERYARROWDI 000080
5551454E 494C5048 53164D49 44444E4F 4D414944 54455345 4E494C50 4853144D M.SHPLINESETDIAMONDDIM.SHPLINEQU 0000A0
5310584F 42534553 534F5243 47455350 4853104D 4944444E 4F4D4149 44595245 ERYDIAMONDDIM.SHPSEGCROSSESBOX.S 0000C0
45535245 544E4958 4F424745 53504853 18474553 53455353 4F524347 45535048 HPSEGCROSSESSEG.SHPSEGBOXINTERSE 0000E0
54504853 13545054 52415453 54455350 4F524454 50485312 5354504E 4F495443 CTIONPTS.SHPTDROPSETSTARTPT.SHPT 000100
13545355 4A544553 504F5244 54504853 0F535549 44415259 52455551 504F5244 DROPQUERYRADIUS.SHPTDROPSETJUST. 000120
59524555 514D4744 154D4744 03544E45 54584559 52455551 504F5244 54504853 SHPTDROPQUERYEXTENT.DGM.DGMQUERY 000140
4E454554 554F5245 52594252 41454E4D 47441354 4E455458 454D4152 47414944 DIAGRAMEXTENT.DGMNEARBYREROUTEEN 000160
50414548 59524555 514D4744 0C455455 4F524255 53545245 534E494D 47441144 D.DGMINSERTSUBROUTE.DGMQUERYHEAP 000180
08525450 4553554F 4D595245 55514D47 44104452 414F4259 52455551 4D47440D .DGMQUERYBOARD.DGMQUERYMOUSEPTR. 0001A0
44094742 44035254 50455355 4F4D5445 534D4744 0E445241 4F425445 534D4744 DGMSETBOARD.DGMSETMOUSEPTR.DBG.D 0001C0
01036E03 0E01035C 03010145 54495257 534F4408 4F495303 54524553 53414742 BGASSERT.SIO.DOSWRITE...\....n.. 0001E0
```

Dump of file SATURN:[PCCOMMON.DUMP.DLL]BRD.TMP;1 on 18-APR-1990 10:36:59.83
File ID (519,15,0)   End of file block 272 / Allocated 272

Virtual block number 8 (00000008), 512 (0200) bytes

```
030301CC C3030201 02FF0303 01041103 01010403 03070101 26031001 0F340305 ..4....&....................û.... 000000
000103EF 030E010E 19030301 04000310 0107E403 0CAD0305 0205C103 020 1A17 .....è....Ù..ð...............ÿ... 000020
03050210 28030201 08470308 01060803 0E87030A 96030303 005A0306 0106 103 .I....Z...............G....+.... 000040
05010E39 03020105 22030001 00000303 010DF403 0E010202 03100102 820304E8 §........●....¶.........".....9... 000060
0306C003 08020505 0309E003 03020311 03000104 70030E01 04E30301 01061C03 .......Ð....p.........À........à.. 000080
08E70305 010F9203 0E010A71 03050103 02030701 03030301 01047903 07010487 .....y..............q.........Ó. 0000A0
0003000E 0305020A D7030301 0430030E 0103B703 0101055F 03000101 65030301 ...e...._....ñ....0....■......... 0000C0
0106A703 050101C7 03010101 74030501 00000306 01021203 0701064B 03030100 ....K...............t....ú....Î.. 0000E0
0307010A 54030301 0256030E 01000003 12010340 0302010C 89030E01 04C40303 ..ó....¿....@..........V....Î.... 000100
0158030E 01060003 02010000 03080100 00030001 03840310 01054603 03010302 @....F........................[. 000120
11010594 03100104 04030801 061C0300 01009503 10010E4A 03030102 45031001 ...E....J......................... 000140
9A030502 09710308 01080703 0E010C4A 0305010E C4030301 0A000305 01010C03 .É...........ó....J...........q..... 000160
030E0108 8C030801 07280305 01075403 00010633 0302010C 46030301 08F00309 ..Þ....F....3....T.....+.......... 000180
01840310 01093903 010100CF 03030100 00030701 0000030E 01057D03 050107FB «....)...............ü....9....Ç. 0001A0
0E010ACE 03050105 22030E01 03830305 0106FD03 08010819 03030100 00030201 .............»....*....".....ö... 0001C0
03020101 26030701 00000301 0104AE03 08200308 8A030503 04400307 010A2703 .'....@.......-..Û..........&.... 0001E0
```

Dump of file SATURN:[PCCOMMON.DUMP.DLL]BRD.TMP;1 on 18-APR-1990 10:36:59.83
File ID (519,15,0)   End of file block 272 / Allocated 272

Virtual block number 9 (00000009), 512 (0200) bytes

```
030100AF 030E0105 17030486 03070205 A4030801 0F1C0302 01087303 00010205 .....s..........Ê....Ñ.......£... 000000
00008503 05010681 030E0106 8F030801 0E7D0308 87030202 00000313 0105C403 .á.........ñ..)................. 000020
20746867 69727970 6F432029 63282060 65747379 73627553 20647261 6F424400 .DBoard Subsystem (c) Copyright  000040
73606574 73795320 6E6F6974 6160726F 666E4920 6E616068 63614220 39383931 1989 Bachman Information Systems 000060
080C4688 088EFFFF 881E5657 00000AC8 00000000 00000000 00002E63 6E49202C , Inc...........à...WV.|...Ä.F.. 000080
76FF0192 E980F388 06750846 08064688 087F020A 7E830E7C 010A7E83 14740E46 F.t..~..|..~.....F..F.u.|µ.Õ...v 0000A0
FA76FF00 00FFFF9A 5016FA46 800C76FF 0E76FF00 0001889A 006A006A 0C76FF0E ..v.j.j..|....v..v..Fª.P......vª 0000C0
428EF888 F65EC401 57E980F2 880674C0 08000001 589A5016 F6468000 8E680E6A j.h...F-.P.[....ât.|·.ÕW.á^-.«/B 0000E0
4688FA76 FF7375C0 08009C00 009A5052 000805C2 8CC388FA 76FFA5F2 00478900 .¿G.·Ê.vª.û.ô...RP......åus.vª.F 000100
50520010 05F85688 F64688FA 76FF5C75 C0080083 00009A50 52000C05 F85688F6 -.V½...RP...°..åu\.vª.F-.V½...RP 000120
2E75C008 00E10000 9A505200 1405F856 88F64688 FA76FF45 75C00800 CA00009A ...ð..åuE.vª.F-.V½...RP...Ä..åu. 000140
F85688F6 4688FA76 FF1775C0 0800F800 009A5052 001805F8 5688F646 88FA76FF .vª.F-.V½...RP...½..åu..vª.F-.V½ 000160
E980F288 00000160 9AF676FF F876FFFA 76FF1474 C008FFFF 00009A50 52001C05 ...RP......ât..vª.V½.v~.m...|·.Õ 000180
88F65EC4 04578926 02478926 0E56880C 4688F65E C4078926 0A4688F6 5EC400AE Û.á^-.F.&..á^-.F..V.&.G.&.W.á^-. 0001A0
FA76FF1F A5F20012 890A8E1E F088327F 80085688 064688F6 5EC40647 8926FA46 Fª&.G.á^-.F..V...2.Þ..Õ¿..·Ê..vª 0001C0
00FFFF9A F676FFF8 76FFFA76 FF1374C0 080000FF FF9A5016 FC468000 9A680E6A j.h...F=.P......ât..vª.V½.v~.... 0001E0
```

```
Dump of file SATURN:[PCCOMMON.DUMP.DLL]BRD.TMP;1 on 18-APR-1990 10:36:59.83
File ID (519,15,0)   End of file block 272 / Allocated 272

Virtual block number 10 (0000000A), 512 (0200) bytes

 F8568BF6 46881FA, F2004D89 D8BE1E00 D0BEFB88 000888FC 5EC44AEB 8DF2B800 .|·.$Já^•|...«/Å...Å¿M.·E..F-.V% 000000
 76FF0E76 FF008697 89260084 878926FE 5688FC46 88F65EC4 04578926 02478926 &.G.&.W.á^-.F•.V±&....&.....v..v 000020
 8E017AB8 1E000006 C8000ACA C95F5E1F 00E8C02B 0000FFFF 9AF676FF F876FF0C ..v%.v-.....+àŠ..^_èð..à....|z.. 000040
 46890647 8826FA5E C4008DE9 8DF98806 75C208FC 5689FA46 89085688 06468808 Å.F..V..F¹.V•.ðu.|T.Õ§.á^¹&.G..F 000060
 00689A0C 77FF260E 77FF26FA 5EC46475 C0080210 00689A08 77FF260A 77FF26FE ±&.w.&.w..h....ðudá^¹&.w.&.w..h. 000080
 77FF26FA 5EC43C75 C0080238 00689A14 77FF2616 77FF26FA 5EC45075 C0080224 $..ðuPá^¹&.w.&.w..h.8..ðu<á^¹&.w 0000A0
 C0080260 00689A18 77FF261A 77FF26FA 5EC42875 C008024C 00689A10 77FF2612 .&.w..h.L..ðu(á^¹&.w.&.w..h.'..à 0000C0
 5EC4FE76 FF39E88D F2B80574 C0080085 00689A1C 77FF261E 77FF26FA 5EC41475 u.á^¹&.w.&.w..h....åt.|·.$9.v±á^ 0000E0
 FFFC76FF FE76FF1B E88DF288 0574C008 00000293 9A0084B7 FF260086 B7FF26FA ¹&.ñ..&.ñ........åt.|·.$..v±.v•. 000100
 CD881E00 0008C800 04CAC91F 00E8C028 04E88DF2 880574C0 08000001 089AFA76 v¹......åt.|·.$.+àŠ..èð..à....|ë 000120
 FF0A76FF 32E88DF3 88057E02 067E8306 7C01067E 830C740A 46080846 88D88E01 ..Ä.F..F.t..~..|..~..~.|µ.$2.v.. 000140
 E88DF988 0575D008 FA5689F8 4689FE56 88FC4688 0000FFFF 9A5016FC 46800876 v..F•.P......F•.V±.F%.V¹.Åu.|¹.$ 000160
 0A4688D8 8E02AF88 1E000008 C80006CA C91F00E8 C02807B9 26064688 FC5EC400 .á^•.F.&..+àŠ..èð..à....|£..Ä.F. 000180
 02D89A50 16FC4680 0A76FF0C 76FF35E8 8DF38805 75084608 06468808 740C4608 .F.t..F..F.u.|µ.$5.v..v..F•.P.Ä. 0001A0
 065EC407 8826F85E C410E88D F9880575 D008FA56 89F84689 FE5688FC 46880000 ...F•.V±.F%.V¹.Åu.|¹.Š.á^%&..á^. 0001C0
 7E830C74 0A460808 46880888 0309881E 000008C8 0008CAC9 1F00E8C0 28078926 &..+àŠ..èð..à....|...Ä.F..F.t..- 0001E0

Dump of file SATURN:[PCCOMMON.DUMP.DLL]BRD.TMP;1 on 18-APR-1990 10:36:59.83
File ID (519,15,0)   End of file block 272 / Allocated 272

Virtual block number 11 (0000000B), 512 (0200) bytes

 88000003 2E9A5016 FC468D08 76FF0A76 FF33E88D F388057E 01067E83 067C0006 ..|..~..~.|µ.$3.v..v..F•.P...... 000000
 C0287647 89260646 88F85EC4 0EE88DF9 88057500 08FA5689 F84689FE 5688FC46 F•.V±.F%.V¹.Åu.|¹.Š.á^%.F.&.Gv+à 000020
 75084608 06468808 740C4608 0A4688D8 8E0362B8 1E000008 C80006CA C91F00E8 Š..èð..à....|b..Ä.F..F.t..F..F.u 000040
 89F84689 FE5688FC 46880000 03889A50 16FC468D 0A76FF0C 76FF36E8 8DF38805 .|µ.$6.v..v..F•.P......F•.V±.F%. 000060
 08CAC91F 00E8C02B 07892606 5EC47647 8826F85E C411E88D F9880575 D008FA56 V¹.Åu.|¹.Š.á^%&.Gvá^.&..+àŠ..èð. 000080
 08460806 46880874 0C46080A 46880000 F646C708 8E038088 1E565700 000AC800 .à...WV.|§..ÄúF-...F..F.t..F..F. 0000A0
 4689FE56 88FC4688 000003E2 9A5016FC 468D0A76 FF0C76FF 00A4E98D F3880675 u.|µ.ÕÊ..v..v..F•.P.ã....F•.V±.F 0000C0
 C4016A50 52002205 FA5688F8 46885016 F6468D7F E88DF988 0575D008 FA5689F8 %.V¹.Åu.|¹.Š..F-.P.F%.V¹.".RPj.á 0000E0
 187400F6 7E8352E8 8DF18805 74C0080E C48305B6 E80E0877 FF260A77 FF26F85E ^%&.w.&.w..ÒÑ..á..ât.|þ.ŠR.—.t. 000100
 C028065E C420E81F A5F20008 890A8E1E F088F888 002205FA 5688F846 88065EC4 á^..F%.V¹.".«.Þ..Ö¿..·Ê.Š-á^.+à 000120
 065EC408 4789260A 47892606 5EC40447 89260647 8926065E C4078926 02478926 &.G.&..á^.&.G.&.G.á^.&.G.&.G.á^. 000140
 88D88E04 19881E56 5700004E C80008CA C95F5E1F 00E8C02B 0C478926 0E478926 &.G.&.G.+àŠ..^_èð..àN..WV.|...Å. 000160
 F8468800 0004449A 5016F846 801676FF 1876FF04 35E98DF3 88067518 46081646 F..F.u.|µ.Õ5..v̄..v..F%.P.D....F% 000180
 01E9C028 0575023F 83260E5E C4040FE9 8DF98806 75D008E0 56890E46 89FA5688 .V¹.F8.VÁ.Åu.|¹.Õ..á^B&.?.u.+àÕ. 0001A0
 006A026A 1676FF18 76FF0000 FFFF9A50 16E64680 50168E46 801676FF 1876FF04 ..v..v..Ff.P.F|.P......v..v.j.j. 0001C0
 890A5788 26084788 260E5EC4 E45689E2 46890032 05E05688 0E468800 00FFFF9A ......F8.VÁ.2..Fã.Vðé^B&.G.&.W.. 0001E0

Dump of file SATURN:[PCCOMMON.DUMP.DLL]BRD.TMP;1 on 18-APR-1990 10:36:59.83
File ID (519,15,0)   End of file block 272 / Allocated 272

Virtual block number 12 (0000000C), 512 (0200) bytes

 88DA4689 C02802E8 00018805 74084608 06468800 740C4608 0A4688FE 5689FC46 F•.V±.F..F.t..F..F.t.|..Š.+à.FÖ. 000000
 16C04680 00000846 C7C65689 C4468910 5688OE46 88C25689 C0468914 56881246 F..V..Fà.Võ.F..V..Fá.VóúFÅ...Fà. 000020
 FE76FFE2 76FFE476 FF50160C 468D5016 E8468D00 6A08C483 FFFF0216 9A530650 P.S......á.j..FÒ.P.FÉ.P.vÕ.vâ.v± 000040
 76FF5016 C0468D04 C483FFFF 04CF9ADE 76FFE076 FF12C483 FFFF02C6 9AFC76FF .v•.6....á..vÅ.v8.ü....á..Fà.P.v 000060
 7F667C00 227F8326 E25EC402 D3E90375 00D87E83 08C483FF FF05C89A FC76FFFE ±.v•.à....á..-Ä.u.ÕŒ.á^ã&..".|f. 000080
 89C84680 88568986 4689000A 8300012D 22578826 20478826 5D760120 7F832607 .&.. .v]&.G &.W"-...Ö..FÑ.V|.Fà. 0000A0
 26044729 26885688 86468882 5EC40257 19260729 26864688 825EC484 568C8246 Fý.VÇá^ý.FÑ&).&.W.á^ý.FÑ.V|&)G.& 0000C0
 47012688 5688864  88825EC4 0A571126 08470126 88568886 4688825E C4065719 .W.á^ý.FÑ.V|&.G.&.W.á^ý.FÑ.V|&.G 0000E0
 46880001 07C7260_ 5EC41FA5 F2000889 1F161EC8 768DF888 0A5EC40E 5711260C .&.W.á^..«.và...¿..·Ê.á^.&ú....F 000100
 0277FF26 8A5EC484 56898246 890C5688 0A46888C 56898A46 89005E05 E05688DE 8.VÅ.^..Fo.V¥.F..V..Fý.VÇá^¤&.w. 000120
 74C008C0 2802E800 01880575 000806E0 01309A37 FF260277 FF26825E C437FF26 &.7á^ý&.w.&.7.0.Ú..Åu.|..Š.+à.ât 000140
 C406F502 C39A825E C437FF26 0277FF26 8A5EC444 E8025788 26078826 825EC40C .á^ý&..&.W.ŠOá^¤&.w.&.7á^ý.ú.%.á 000160
 D88808C4 83071307 8E9A0709 03EF9ADC 8808EC83 070406C7 9A06FA02 C39A8A5E ^¤.ú.¹..ú....$..É.ÿ..../....á..Ä 000180
 FF268A5E C4025789 26078926 825EC407 4400FC9A 5052071F 04A69A07 1802569A .V....Î...RP.•.D.á^ý&..&.W.á^¤&. 0001A0
 2802E800 01880575 D0080768 01309A04 77FF2606 77FF2682 5EC40477 FF260677 w.&.w.á^ý&.w.&.w..0.k..Åu.|..Š.+ 0001C0
 8A5EC407 7602C39A 045F8D82 5EC448E8 06578826 04478826 825EC400 74C008C0 à.ât.á^ý&.G.&.W.ŠKá^ý._..ü.v.á^¤ 0001E0
```

```
Dump of file SATURN:[PCCOMMON.DUMP.DLL]BRD.TMP;1 on 18-APR-1990 10:36:59.83
File ID (519,15,0)   End of file block 272 / Allocated 272

Virtual block number 13 (0000000D), 512 (0200) bytes

 8808C483 079407BE 9A078A03 EF9ADC88 08EC8307 8506C79A 077802C3 9A045F8D ._..û.(..ú....ß..É.ÿ..../....á.. 000000
 B25EC407 DE00FC9A 0477FF26 0677FF26 BA5EC450 5207AB04 A69A0799 02569AD8 Ä.V....Î.¨.RPá^¤&.w.&.w..=.8.á^ÿ 000020
 FF260277 FF268A5E C4845689 82468900 08050C56 880A4688 06578926 04478926 &.G.&.W..F..V.....Fÿ.VÇá^¤&.w.&. 000040
 C40C74C0 08C02802 E8000188 05750008 08080130 9A37FF26 0277FF26 B25EC437 7á^ÿ&.w.&.7.0....Åu.¡..Š.+à.àt.á 000060
 BA5EC408 1302C39A B25EC437 FF260277 FF268A5E C444EB02 57882607 8826B25E ^ÿ&..&.W.$Dá^¤&.w.&.7á^ÿ.û...á^¤ 000080
 569AD888 08C48308 3107CE9A 082703EF 9ADC8808 EC830822 06C79A08 1802C39A .û....ú.".'.ß..É.ÿ.'..ö.1..á..Ä.V 0000A0
 0677FF26 BA5EC402 57892607 8926B25E C4086200 FC9A5052 083004A6 9A083602 .6..Î.=.RP.=.b.á^ÿ&..&.W.á^¤&.w. 0000C0
 08C02802 E8000188 05750008 08890130 9A0477FF 260677FF 26B25EC4 0477FF26 &.w.á^ÿ&.w.&.w..0....Åu.¡..Š.+à. 0000E0
 5F8D8A5E C4089402 C39A045F 8DB25EC4 48EB0657 88260447 8826B25E C40D74C0 àt.á^ÿ&.G.&.W.ŠKá^ÿ._..û...á^¤._ 000100
 9AD88808 C4830882 07CE9A08 AB03EF9A DC8808EC 8308A306 C79A0899 02C39A04 ..û....ú.É..ß..É.ÿ.¯..ö.ÿ..á..Ä. 000120
 8926B25E C4FFFF00 FC9A0477 FF260677 FF268A5E C4505208 C904A69A 08870256 V.ñ..Î.è.RPá^¤&.w.&.w..=...á^ÿ&. 000140
 260A5EC4 07892602 478926C0 280A5EC4 2D740C46 080A4688 45E80657 89260447 G.&.W.ŠE.F..F.t-á^.+à&.G.&..á^.& 000160
 06468B0C 4789260E 4789260A 5EC40847 89260A47 89260A5E C4044789 26064789 .G.&.G.á^.&.G.&.G.á^.&.G.&.G..F. 000180
 C0280000 05519AE6 76FF8E76 FF1676FF 1876FF00 0007C726 065EC408 7408460B .F.t.á^.&ú....v..v..v/.vÌ.Q...+à 0001A0
 46080646 8808740C 46080A46 88088E04 E8881E00 0002C800 14CAC95F 5E1F00EB Š..^_èò..à....¡Š..Å.F..F.t..F..F 0001C0
 4689078B 260A5EC4 20E88DF3 88000007 C726065E C4087408 46080646 88157508 .u..F̄..F.t.á^.&ú...¡æ.Š á^.&...F 0001E0

Dump of file SATURN:[PCCOMMON.DUMP.DLL]BRD.TMP;1 on 18-APR-1990 10:36:59.83
File ID (519,15,0)   End of file block 272 / Allocated 272

Virtual block number 14 (0000000E), 512 (0200) bytes

 0000C800 08CAC91F 00EBC02B 07892606 5EC4C02B 02E8027F 00073D07 7CC008FE ±.à|.=....Š.+ãá^.&..+àŠ..èò..à.. 000000
 1EF088FB 880C568B 0A4688OE 5EC42075 003F8326 065EC408 8E093F88 1E565700 .WV.¡?..Äá^.&.?.u á^..F..V..«.Þ. 000020
 E80E0A76 FF0C76FF 0E76FF10 76FF13E8 000107C7 26065EC4 1FA5F200 08B9DA8E .Ö¿...È.á^.&ú...Š..v..v..v..v..Ò 000040
 C29A006A 006A0676 FF0876FF D88E0995 881E0000 08C8C8C9 5F5E1F08 C483032C ,...á..^_èùà....¡...Ä.v..v.j.j..ô 000060
 FC4689FA 5688F846 882675C0 0801FC0A 589A5016 F8468D06 76FF0876 FF0A0109 ....v..v̄..F½.P.X.=..àu&.F½.Vª.F= 000080
 E8C028C6 E80CC483 FF65E80E 0E76FF10 76FF5052 000C050A 76FF0C76 FFFE5689 .V±.v..v....RP.v..v..Òe..á.Šó+àŠ 0000A0
 FF0A5D09 C29A006A 006A0676 FF0876FF D88E09E0 881E5657 000034C8 CBC91F00 ..èùà4..WV.¡Å..Å.v..v.j.j..ô.]... 0000C0
 89D44689 EA5688E8 4688028F E90374C0 080A930A 589A5016 E8468006 76FF0876 v..v..FÒ.P.X....àt.Ò...FÒ.Võ.Fà. 0000E0
 5016E046 8D500E76 FF377400 08DE5689 DC468940 57882636 47882604 5EC40656 Vøá^à&.G>&.W@.FÉ.V8.Åt7.v8P.FÅ.P 000100
 6A0C76FF 0E76FF10 76FF1276 FF1B7400 E07E8306 7F237C00 E27E8309 F100F09A .Þ.þ..~ã.|#...~Å.t..v..v..v..v.j 000120
 F07E8D00 16050656 88D4468B 5174000A 7E830EC4 83FF79E8 0EDC76FF 0E76FF00 ..v8.vÉ.Òy..á..~..tQ.Fà.Vø....~Þ 000140
 F46E8300 FA568305 F8468300 F25E8305 F06E831F A5F20008 B9DA8E1E 0716F088 .Þ....Ö¿...È..nÞ..^...F½..Vª..n¶ 000160
 E80E1076 FF1276FF 5016F046 8D0C76FF 0E76FF00 FE568305 FC468300 F65E8305 ..^-..F=..V±..v..v..FÞ.P.v..v..Ò 000180
 FEAAE80E 6677FF26 6877FF26 045EC40C 76FF0E76 FF1076FF 1276FF0C C483FE78 (±.à..v..v..v..v.á^À&.wh&.wf.Ò^± 0001A0
 FF264477 FF26045E C4085A09 C29A006A 006A4277 FF264477 FF26045E C40CC483 .á.á^À&.wD&.wBj.j..ô.Z.á^À&.wD&. 0001C0
 83025689 D04689DA 5688D846 88018FE9 0374C008 08800A58 9A5016D8 46804277 wB.FÅ.P.X.§..àt.Ò...FÅ.VO.FÅ.V@. 0001E0

Dump of file SATL N:[PCCOMMON.DUMP.DLL]BRD.TMP;1 on 18-APR-1990 10:36:59.83
File ID (519,15,G,   End of file block 272 / Allocated 272

Virtual block number 15 (0000000F), 512 (0200) bytes

 1276FF0C C483FE03 E80E1076 FF1276FF 50520036 050C76FF 0E76FF18 74000A7E ~..t..v..v..6.RP.v..v..Ò.±.á..v. 000000
 FF26D05E C40CC483 FE32E80E 5077FF26 5277FF26 D05EC40C 76FF0E76 FF1076FF .v..v..v.á^À&.wR&.wP.Ò2±.á.á^À&. 000020
 9A5016E4 46804877 FF264A77 FF26005E C4080209 C29A006A 006A4877 FF264A77 wJ&.wHj.j..ô.@.á^À&.wJ&.wH.FÕ.P. 000040
 8902578B 26078826 E45EC400 F1E90647 8826E45E C40114E9 0374C008 0A4D0A58 X.M..àt.Ò..á^ò&.G.Òp.á^ò&..&.W.. 000060
 FF0E76FF 0000FFFF 9A5016F0 468D016A 0677FF26 0877FF26 CC5EC4CE 5689CC46 Fä.Vöá^ä&.w.&.w.j..FÞ.P......v.. 000080
 0C76FF0E 76FF1076 FF1276FF 0CC483FD 6CE80E10 76FF1276 FF5016F0 46800C76 v..FÞ.P.v..v..Òl».á..v..v..v..v. 0000A0
 8902578B 26078826 E45EC400 A7E90CC4 83FD9BE8 0E2677FF 262877FF 26CC5EC4 á^ä&.w(&.w&.Ò.».á.ÒÏ.á^ò&..&.W.. 0000C0
 FF0E76FF 0000FFFF 9A5016F0 468D016A 0677FF26 0877FF26 EC5EC4EE 5689EC46 F&.VŸá^ì&.w.&.w.j..FÞ.P......v.. 0000E0
 0C76FF0E 76FF1076 FF1276FF 0CC483FD 0CE80E10 76FF1276 FF5016F0 46800C76 v..FÞ.P.v..v..Ò.».á..v..v..v..v. 000100
 46890257 88260788 26E45EC4 48E80CC4 83FD3BE8 0E2477FF 262677FF 26EC5EC4 á^ì&.w&&.w$.Ò;».á.ŠHá^ò&..&.W..F 000120
 83FD08E8 0E2677FF 262877FF 26CC5EC4 0C76FF0E 76FF1076 FF1276FF CE5689CC ä.Vö.v..v..v..v.á^ä&.w(&.w&.Ò.». 000140
 E9FED0E9 00E8FF58 59037500 0230C274 000130FF 08E90375 C00816EB 18E80CC4 á.Š.Š..àu.Ò..=..tó=..u.Ò(.Š.ÒÅ±Ò 000160
 8826078B 26065EC4 D88E0A3C 881E0000 00C8C8C9 5F5E1F00 E8C028FD 5AE9FE55 U±ÖZ»+àŠ..^_èùà....¡<..Äá^.&..&. 000180
 260A5EC4 02578826 C7882606 5EC41476 07392605 7F187C02 5739260A 5EC40257 W.á^.&9W.|¯..&9.v.á^.&..&.W.á^.& 0001A0
 04473926 067F1E7C 06573926 0A5EC406 57882604 47882606 5EC40257 89260789 ..&.W.á^.&.G.&.W.á^.&9W.|...&9G. 0001C0
 2608478B 26065EC4 06578926 04478926 0A5EC406 57882604 47882606 5EC41676 v.á^.&.G.&.W.á^.&.G.&.W.á^.&.G.& 0001E0
```

```
Dump of file SATURN:[PCCOMMON.DUMP.DLL]BRD.TMP;1 on 18-APR-1990 10:36:59.83
File ID (519,15,0)   End of file block 272 / Allocated 272

Virtual block number 16 (00000010), 512 (0200) bytes

 C40A5788 26084788 26065EC4 16730847 3926067C 1E7F0A57 39260A5E C40A5788 .W.á^.&9W...|.&9G.s.á^.&.G.&.W.á 000000
 067C1E7F 0E573926 0A5EC40E 5788260C 47882606 5EC40A57 89260847 89260A5E ^.&.G.&.W.á^.&.G.&.W.á^.&9W...|. 000020
 90C8C91F 0E578926 0C478926 0A5EC40E 5788260C 47882606 5EC41673 0C473926 &9G.s.á^.&.G.&.W.á^.&.G.&.W..èu. 000040
 000A05F7 0002027F 00050509 02030000 00090506 00020272 00050049 02030010 ....|...r...ø...............%... 000060
 0003027C 02030280 00050542 02030000 000C0586 00020014 0003005B 02030000 ....[.......Ñ.......B.......|... 000080
 0005092A 02030000 00140845 0002029E 00050039 0203021E 00040C68 02030022 *...h.......9.......E.......*... 0000A0
 00040C08 02030000 00190004 00020000 001706C0 00020000 001605E4 000202AA ˆ...ð.......à................... 0000C0
 080E4688 088EFFFF 881E5657 00002AC8 00000000 00000000 00000000 000000CC á...............à*..WV.|...Ä.F.. 0000E0
 26C02806 5EC401D4 E98DF388 06750846 08064688 08740C46 080A4688 10741046 F.t..F..F.t..F..F.u.|a.Óå.á^.+å& 000100
 89E44689 FE5688FC 46880000 FFFF9A50 16FC4680 0E76FF10 76FF0789 26024789 .G.&...v..v..F•.P......F•.V±.Fð. 000120
 160E4680 009A68G 6A50E246 89064788 26E45EC4 01A2E98D F1880675 D008E656 V|.Åu.|þ.ÕÅ.á^ô&.G..FãPj.h...FB. 000140
 E276FFA5 F20040By 00D08EFB 88DE5EC4 017EE980 F2880674 C0080000 FFFF9A50 P......ât.|·.Õ–.á^B.«fÅ.¿M.·E.vâ 000160
 50520042 05E05688 DE4688E2 76FF2E75 C0080083 00009A50 52003E05 C28CC388 .ù.ò.>.RP...*..âu..vã.FB.VÅ.B.RP 000180
 1474C008 FFFF0000 9A505200 6605E056 88DE4688 E276FF17 75C00800 CA00009A ...ò..âu..vã.FB.VÅ.f.RP......ât. 0001A0
 16F088EC 7E800C56 880A4688 011AE98E 07880000 FFFF9ADE 76FFE076 FFE276FF .vâ.vÅ.vB.....|..Õ...F..V..–$.Þ. 0001C0
 88EC4688 2476EC46 39057F28 7CEE5639 F65688F4 46881FA5 F2000889 DA8E1E07 ...Õ¿..·E..F¶.V–9VÝ|+..9F$v$.F$. 0001E0

Dump of file SATURN:[PCCOMMON.DUMP.DLL]BRD.TMP;1 on 18-APR-1990 10:36:59.83
File ID (519,15,0)   End of file block 272 / Allocated 272

Virtual block number 17 (00000011), 512 (0200) bytes

 F65689F4 46890C56 880A4688 EE5689EC 4689F656 88F44688 DC56890A 4689EE56 VÝ.FÖ.VÉ.F¶.V–.F&.VÝ.FÖ.VÉ.F¶.V– 000000
 46880856 89064689 F25688F0 46882476 F0463905 7F287CF2 5639FA56 88F84688 .F%.V¹9V·|+..9FÞv$.FÞ.V·.F•.VÅ.F 000020
 26E65688 E44688DE 5EC4FA56 89F84689 D8568806 4688F256 89F04689 FA5688F8 %.V¹.FÞ.V·.F•.VÄ.F%.V¹á^B.FÕ.V|& 000040
 8D167F8D DE5EC41F A5F20008 891F161E EC768006 7F8DDE5E C4045789 26024789 .G.&.W.á^B....v$...¿..·E.á^B.... 000060
 DE46881F A5F20008 891F161E EC768026 7F8DDE5E C41FA5F2 0008891F 161EEC76 v$...¿..·E.á^B..&.v$...¿..·E..FB 000080
 909A5052 006A016A 006A006A 1477FF26 1677FF26 E45EC4EA 5689E846 89E05688 .VÅ.FÕ.Võá^ô&.w.&.w.j.j.j.j.RP.. 0000A0
 E8468806 5EC414E8 JE078800 0000DA9A DE76FFE0 76FFE276 FF1374C0 08009C02 ....ât..vã.vÅ.vB.Ö...|..Š.á^..FÒ 0000C0
 88D88E00 08881E00 0014C800 0CCAC95F 5E1F00E8 C0280257 89260789 26EA5688 .Võ&..&.W.+âŠ..^_èò..à....|...Å. 0000E0
 02478826 F85EC4FA 5689F846 890A5688 08468801 1EE980F3 8806750A 46080846 F..F.u.|a.Õ...F.¯V..F%.V¹á^¼&.G. 000100
 1038E80E F876FFFA 76FF0676 FF137502 3F8326FC 5EC4FE56 89FC4689 04578826 &.W..F•.V±á^•&.?.u..v..v¹.v%.Ö;. 000120
 6877FF26 F85EC400 81E90375 00067E83 0001008C 87C726F8 5EC400E5 E906C483 .á.Õl.á^¼&ú......~..u.ÕÝ.á^¼&.wh 000140
 0A589A50 16EC4680 6677FF26 6877FF26 F85EC402 9009C29A 006A006A 6677FF26 &.wfj.j..ò...á^¼&.wh&.wf.F&.P.X. 000160
 006A4277 FF264477 FF26F85E C40AE8FF FF04049A EC76FFEE 76FF0075 C00802B5 ç..âu..vÝ.v$.....ŠÕá^¼&.wÕ&.wBj. 000180
 0F75C008 02F10A58 9A5016F0 46804277 FF264477 FF26F85E C402CA09 C29A006A j..ô.ò.á^¼&.wÕ&.wB.FÞ.P.X.þ..âu. 0001A0
 C29A006A 006A3E77 FF264077 FF26F85E C4D8E8FF FF01659A 016AF076 FFF276FF .v·.vÞj..e...ŠÅá^¼&.wâ&.w>j.j..ô 0001C0
 FFF676FF 0E75C008 01D10A58 9A5016F4 46803E77 FF264077 FF26F85E C4030609 ...á^¼&.wâ&.w>.F¶.P.X.l..âu..v–. 0001E0

Dump of file SATURN:[PCCOMMON.DUMP.DLL]BRD.TMP;1 on 18-APR-1990 10:36:59.83
File ID (519,15,0)   End of file block 272 / Allocated 272

Virtual block number 18 (00000012), 512 (0200) bytes

 C00808C4 83FFFF04 4A9AFC76 FFFE76FF 0876FF0A 76FFD9E8 FEEDE80E 016AF476 v¶j..ÕÚ±$l.v..v..v±.v•.J....á..á 000000
 0E46080C 46880088E 02088B1E 00001CC8 0006CAC9 1F00E8C0 2804E88E 07880574 t.|..$.+àŠ..èò..à....|...Ä.F..F. 000020
 89045788 26024788 26F45EC4 F65689F4 46890E56 880C4688 0264E98D F3880675 u.|a.Õd..F..V..F¶.V–á^¶&.G.&.W.. 000040
 0A578826 08478826 F85EC4FC 4689FE46 89C0281B 750A4608 084688FA 5689F846 F%.V¹.F..F.u.+â.F±.F•á^¼&.G.&.W. 000060
 89405788 263E4788 26FC5EC4 FE5689FC 46890A56 88084688 1DE8F256 89F04689 .FÞ.V·$..F..V..F•.V±á^•&.G>&.W@. 000080
 7400008C 8F832608 75000090 8F8326F4 5EC4000F E9037500 067E83F2 5689F046 FÞ.V·.–..u.ÕÕ.á^¶&.¢...u.&.¢...t 0000A0
 0876FF0A 76FF1875 00008C8F 8326FC5E C429740A 46080846 8801E5E9 8E008806 .|..Õl..F..F.t)á^•&.¢...u..v..v. 0000C0
 006AF076 FFF276FF 0184E98E 00880674 C00808C4 83FFFF16 249A0C76 FF0E76FF .v..v..$....á..ât.|..ÕÇ..v·.vÞj. 0000E0
 4688F45E C40191E9 8E078806 74C00802 7802909A 0C76FF0E 76FF006A 016A006A j.j.j..v..v....(..ât.|..Õ..á^¶.F 000100
 FF261677 FF26F85E C4385789 26364789 26F45EC4 3C578926 3A478926 0A568808 ..V.&.G:&.W<á^¶&.G6&.Wõá^¼&.w.&. 000120
 5EC41874 FFEE7E83 0675FFEC 7E830484 091E9A50 16EC4680 0C76FF0E 76FF1477 w..v..v..F$.P......–$.u..–Ý.t.á^ 000140
 00010090 87C726F4 5EC4041F 05009A00 6AEC76FF EE76FF14 77FF2616 77FF26F8 ¼&.w.&.w..vÝ.v$j..Å...á^¶&ú..... 000160
 76FF010E E98E0088 06750000 908F8326 F45EC401 18E90001 009487C7 26F45EC4 á^¶&ú.....Õ..á^¶&.¢...u.|..Õ...v 000180
 0675FFEA 7E830C75 FFE87E83 04E7091E 9A5016E8 46800C76 FF0E76FF FU, ¨FF2 ·.vÞ.v..v..FÒ.P...Õ..–Õ.u..–õ.u. 0001A0
 767F8326 F85EC405 0505D09A 006AE876 FFEA76FF F076FFF2 76FF00E6 E98E ¨88 |..Õl..v·.vÞ.võ.vÕj..Å...á^¼&..v 0001C0
 FF264077 FF26F45E C4051A09 C29A006A 006A3E77 FF264077 FF26F45E C47E7,01 .u–á^¶&.wâ&.w>j.j..õ...á^¶&.wâ&. 0001E0
```

Dump of file SATURN:[PCCOMMON.DUMP.DLL]BRD.TMP;1 on 18-APR-1990 10:36:59.83
File ID (519,15 ?)   End of file block 272 / Allocated 272

Virtual block number 19 (00000013), 512 (0200) bytes

```
76FFE676 FF3E77FF 264077FF 26F45EC4 5175C008 05390A58 9A5016E4 46803E77 w>.Fõ.P.X.9..&uö^¶&.w@&.w>.vl.v 000000
FFF276FF 70EB8E07 B80575FF EA7E8308 75FFE87E 83056309 1E9A5016 E84680E4 õ.Fò.P...c..~ò.u..~õ.u.¡..Šp.v·. 000020
E8000100 9487C726 E45EC405 A302909A E476FFE6 76FF006A 016A006A 006AF076 vÞj.j.j.j..vl.vö...È.á^ò&ú.....Š 000040
77FF26F8 5EC43857 89263647 8926F45E C43C5789 263A4789 2699C028 F45EC496 .á^¶+à.&.G:&.W<á^¶&.G6&.W8á^¼&.w 000060
5EC40EEB 8E07B805 74C00804 6002909A 0C76FF0E 76FF5001 6A505014 77FF2616 .&.w.PPj.P.v..v....`..ât.¡..$.á^ 000080
46080A46 88D88E03 46881E00 0000C800 0ACAC91F 00EBC028 00000090 87C726F4 ¶&ú.....+âŠ..èò..à....¡F..Ä.F..F 0000A0
065EC400 88978826 00868788 260A5EC4 1BEB8DF3 88057508 46080646 8808740C .t..F..F.u.¡æ.Š.á^.&....&....á^. 0000C0
0C46080A 4688D88E 05C7881E 000000C8 0008CAC9 1F00EBC0 28025789 26078926 &..&.W.+âŠ..èò..à....¡ú..Ä.F..F. 0000E0
C91F00EB C0280088 97892600 86878926 08568806 46880A5E C417EB8D F3880575 u.¡æ.Š.á^..F..V.&....&....+âŠ..è 000100
88067508 46080646 8808740C 46080A46 88088E06 06881E56 57000052 C80008CA ò..àR..WV.¡...Ä.F..F.t..F..F.u.¡ 000120
50160A76 FF52E056 8CDE4689 CE468DCC 5689CA46 890C5688 0A468805 58E98DF3 æ.Ô[..F..V..Fò.Vä.Fö.F8.VÅR.v..P 000140
FC4689EC 468D1FA5 F2000889 DA8E1E07 16F088EC 7E800856 88064688 0543E80E .ÒC..F..V..~&.Þ....Ö¿..·È..F&.F= 000160
88260788 26207308 47392606 7C357F0A 57392602 57882607 8826FC5E C4FE568C .V±á^=&..&.W.&9W..5|.&9G.s-&..&. 000180
84568882 4688FC5E C4025789 26078926 0A578826 08478826 84568982 46890257 W..Fý.VÇ&.G.&.W.&..&.W.á^=.Fý.VÇ 0001A0
76044739 26067F37 7C065739 260E5788 260C4788 26FC5EC4 0A578926 08478926 &.G.&.W.á^=&.G.&.W.&9W.|7..&9G.v 0001C0
C4065789 26044789 260E5788 260C4788 26805689 AE468906 57882604 4788262F /&.G.&.W..FÛ.V¯&.G.&.W.&.G.&.W.á 0001E0
```

Dump of file SATURN:[PCCOMMON.DUMP.DLL]BRD.TMP;1 on 18-APR-1990 10:36:59.83
File ID (519,15,0)   End of file block 272 / Allocated 272

Virtual block number 20 (00000014), 512 (0200) bytes

```
0739260E 5EC40257 88260788 26FC5EC4 0E578926 0C478926 B05688AE 4688FC5E ^=.FÛ.V¯&.G.&.W.á^=&..&.W.á^8&9. 000000
0A573926 3F750847 39260E5E C40A5788 26084788 26FC5EC4 53750257 39265975 uY&9W.uSá^=&.G.&.W.á^8&9G.u?&9W. 000020
26FC5EC4 1F750657 39262575 04473926 0E5EC406 57882604 478826FC 5EC43975 u9á^=&.G.&.W.á^8&9G.u%&9W.u.á^=& 000040
5688CA46 880425E9 C0280575 0E573926 08750C47 39260E5E C40E5788 260C4788 .G.&.W.á^8&9G.u.&9W.u.+àÖ%..Fò.V 000060
260A5788 26084788 260E5EC4 08C483FF FF0CFE9A 0676FF08 76FF5052 002605CC ä.&.RP.v..v..±....á.á^8&.G.&.W.& 000080
03750638 0775C138 02771826 0F28260A 77882608 4F8826FC 5EC40257 18260728 +.&.W.á^=&.O.&.w.&+.&.w.;éu.;æu. 0000A0
26084788 26FC5EC4 3A750257 39264075 0739260E 5EC40257 88260788 26009CE9 Ô..&..&.W.á^8&9.u@&9W.u:á^=&.G.& 0000C0
4788260E 5EC40080 9711267E 470126CA 5EC40A57 18260847 2826DE5E C40A5788 .W.á^8&+G.&.W.á^ò&.G~&....á^8&.G 0000E0
DE5EC40A 57882608 478826FC 5EC44DEB 0A578926 08478926 FC5EC40A 57882608 .&.W.á^=&.G.&.W.ŠMá^=&.G.&.W.á^8 000100
02571826 0728260E 5EC40257 88260788 26FC5EC4 33750A57 39263975 08473926 &9G.u9&9W.u3á^=&..&.W.á^8&+.&.W. 000120
C4025789 26078926 FC5EC402 57882607 88260E5E C4785711 26764701 26CA5EC4 á^ò&.Gv&.Wxá^8&..&.W.á^=&..&.W.á 000140
4F28260E 7788260C 4F8826FC 5EC40657 18260447 28260E57 88260C47 88260E5E ^8&.G.&.W.&+G.&.W.á^=&.O.&.w.&+O 000160
75044739 260E5EC4 06578826 04478826 00A3E903 75063807 75C13806 77182604 .&.w.;éu.;æu.ÕÈ.&.G.&.W.á^8&9G.u 000180
CA5EC40E 5718260C 4728260E 5EC40E57 88260C47 8826FC5E C4387506 57392641 A&9W.u;á^=&.G.&.W.á^8&+G.&.W.á^ò 0001A0
0E578926 0C478926 FC5EC40E 5788260C 4788260E 5EC40084 97112600 82870126 &....&....á^8&.G.&.W.á^=&.G.&.W. 0001C0
26FC5EC4 37750E57 39263075 0C473926 DE5EC40E 5788260C 478826FC 5EC451EB ŠQá^=&.G.&.W.á^8&9G.u=&9W.u7á^=& 0001E0
```

Dump of file SATURN:[PCCOMMON.DUMP.DLL]BRD.TMP;1 on 18-APR-1990 10:36:59.83
File ID (519,15,0)   End of file block 272 / Allocated 272

Virtual block number 21 (00000015), 512 (0200) bytes

```
DE5EC47C 5711267A 470126CA 5EC40657 18260447 2826DE5E C406578B 26 :4788 .G.&.W.á^8&+G.&.W.á^ò&.Gz&.W|á^8 000000
88260847 8826DE5E C4026A00 6A065789 26044789 26FC5EC4 06578826 044 3826 &.G.&.W.á^=&.G.&.W.j.j.á^8&.G.&. 000020
4788260E 5EC4026A 006A8856 89864689 09820060 9A505202 57132607 0326vA57 W.&..&.W.RP.`....FÑ.V¡j.j.á^8&.G 000040
5EC4026A 006A8C56 898A4689 09A50060 9A50520E 5713260C 47032606 57882604 .&.W.&.G.&.W.RP.`.E..F¤.V¥j.j.á^ 000060
6A006AE6 5689E446 8909C900 609A5052 02571326 0703260A 57882608 478826FC =&.G.&.W.&..&.W.RP.`.è..Fò.V|j.j 000080
5689E846 89FFFF00 609A5052 0E571326 0C470326 06578826 04478826 FC5EC402 .á^=&.G.&.W.&.G.&.W.RP.`....FÒ.V 0000A0
898C5618 BA462BEA 5688E846 88C05689 8E4689B8 56188646 28E65688 E44688EA õ.Fò.V|+FÑ.V¡.Ff.Vâ.FÒ.Võ+F¤.V¥. 0000C0
C6468900 6E05CC56 88CA4688 7374C208 C2468807 75C04608 BE4688C4 5689C246 Fò.Vá.Ff.Fàu..Fò.ôts.Fò.Vä.n..Fó 0000E0
04470126 C45688C2 4688C65E C4025711 26070126 C05688BE 4688C65E C4C85689 .Vàá^ó.Ff.Vá&..&.W.á^ó.Fò.Vá&.G. 000100
470126C4 5688C246 880E5EC4 02571126 070126C0 56888E46 880E5EC4 06571126 &.W.á^8.Ff.Vá&..&.W.á^8.Fò.Vá&.G 000120
26C45688 C246880E 5EC40A57 11260847 0126C056 888E4688 DE5EC406 57112604 .&.W.á^8.Ff.Vá&.G.&.W.á^8.Fò.Vá& 000140
C4517502 57392657 75073926 DE5EC402 57882607 8826FC5E C40E5711 260C4701 .G.&.W.á^=&..&.W.á^8&9.uW&9W.uQá 000160
04478826 FC5EC437 750A5739 26307508 4739260E 5EC40A57 88260847 8826FC5E ^=&.G.&.W.á^8&9G.u=&9W.u7á^=&.G. 000180
5EC40E57 88260C47 8826FC5E C41D7506 57392623 75044739 260E5EC4 06578826 &.W.á^8&9G.u#&9W.u.á^=&.G.&.W.á^ 0001A0
037C04E2 7E83E246 FF03E800 00E246C7 00C2E903 750E5739 2609750C 4739260E 8&9G.u.&9W.u.Õõ.úFã..Š..Fã.~ã.|. 0001C0
CA5EC402 57182607 2826DE5E C4025788 26078826 FC5EC400 8EE9E246 8800AFE9 Õ£..FãÕ..á^=&..&.W.á^8&+.&.W.á^ò 0001E0
```

```
Dump of file SATURN:[PCCOMMON.DUMP.DLL]BRD.TMP;1 on 18-APR-1990 10:36:59.83
File ID (519,15,0)   End of file block 272 / Allocated 272

Virtual block number 22 (00000016), 512 (0200) bytes

 57182604 4728260? 5EC40657 88260447 8826FC5E C40084E9 78571126 76470126 &.Gv&.WxÖ..á^=&.G.&.W.á^8&+G.&.W 000000
 08472826 DE5EC40A 57882608 478826FC 5EC461EB 7C571126 7A470126 CA5EC406 .á^ò&.Gz&.W|$=á^=&.G.&.W.á^8&+G. 000020
 DE5EC40E 5788260C 478826FC 5EC430EB 00809711 267E4701 26CA5EC4 0A571826 &.W.á^ò&.G-&....$=á^=&.G.&.W.á^8 000040
 D2740001 3D9074C0 0818E800 84971126 00828701 26CA5EC4 0E571826 0C472826 &+G.&.W.á^ò&....&....$..át.=..t0 000060
 00E8C028 00010094 87C726CA 5EC4FF45 E900E8A1 74000330 FF61E903 7500023D =..u.Ö=.=..tÀ$.ÖE.á^ò&ú.....+á$. 000080
 08FE5689 FC46890C 56880A46 8808BE06 38881E56 57000008 C80008CA C95F5E1F .^_èò..à...WV.|...Ä.F..V..F=.V±. 0000A0
 88F88800 1605FE56 88FC4688 065EC400 D8E980F3 88067508 46080646 880874C2 òt..F..F.u.|µ.ÖÙ.á^..F=.V±....«. 0000C0
 C4025711 26070126 065EC478 57882676 478826FC 5EC41FA5 F2000889 DA8E1EF0 Þ..Ö¿...E.á^=&.Gv&.Wxá^.&..&.W.á 0000E0
 C4025711 26070126 065EC478 57882676 478826FC 5EC41FA5 F2000889 DA8E1EF0 Þ..Ö¿...E.á^=&.Gv&.Wxá^.&..&.W.á 0000E0
 80978826 7E478826 FC5EC406 57112604 47012606 5EC47C57 88267A47 8826FC5E ^=&.Gz&.W|á^.&.G.&.W.á^=&.G-&... 000100
 0C470126 065EC400 84978826 00828788 26FC5EC4 0A571126 08470126 065EC400 .á^.&.G.&.W.á^=&....&....á^.&.G. 000120
 065EC402 57882607 8826F85E C4FA5689 F8468900 6E05FE56 88FC4688 0E571126 &.W..F=.V±.n..F½.V*á^½&..&.W.á^. 000140
 F85EC406 57112604 47012606 5EC40657 88260447 8826F85E C4025711 26070126 &..&.W.á^½&.G.&.W.á^.&.G.&.W.á^½ 000160
 065EC406 57882604 478u26F8 5EC40A57 11260847 0126065E C4025788 26078826 &..&.W.á^.&.G.&.W.á^½&.G.&.W.á^. 000180
 0A4688D8 8E088F88 1E00000C C80008CA C95F5E1F 00EBC028 0E571126 0C?70126 &.G.&.W.+á$..^ èò..à....|¢..Á.F. 0001A0
 F388067D 00067F83 26077C00 027F8326 065EC411 74084608 06468819 740C ?08 .F.t..F..F.t.á*.&....|.&....).|µ 0001C0
 4689005E 05045788 26024788 26F85EC4 FA5689F8 46890C56 880A4688 0140E.3D .Öa..F..V..F½.V*á^½&.G.&.W..^..F 0001E0

Dump of file SATURN:[PCCOMMON.DUMP.DLL]BRD.TMP;1 on 18-APR-1990 10:36:59.83
File ID (519,15,0)   End of file block 272 / Allocated 272

Virtual block number 23 (00000017), 512 (0200) bytes

 FF26065E C437FF26 0277FF26 FC5EC4F6 5689F446 89005E05 C28CC388 FE5689FC =.V±.û.ò.^..F¶.V-á^=&.w.&.7á^.&. 000000
 26078826 065EC40C 74C008C0 2802E800 01880575 D0080065 01309A37 FF260277 w.&.7.0.e..Àu.|..$.+á.át.á^.&..& 000020
 9A007202 C39AFC5E C40D6D02 C39A065E C437FF26 0277FF26 FC5EC444 E8025788 .W.$Dá^=&.w.&.7á^..û.m.á^=.û.r.. 000040
 04A69A0D 9002569A D88808C4 830D8807 CE9A0081 03EF9ADC 8808EC83 0D7C06C7 û.|..å..É.ÿ....ö....á..Ä.V....|. 000060
 5EC40477 FF260677 FF26FC5E C4025789 26078926 F45EC400 8C00FC9A 50520D97 ..RP.=.¥.á^¶&..&.W.á^=&.w.&.w.á^ 000080
 065EC400 74C008C0 2802E800 01880575 D00800E3 01309A04 77FF2606 77FF2606 .&.w.&.w..0.D..Àu.|..$.+á.át.á^. 0000A0
 0DF302C3 9A045F8D FC5EC40D EE02C39A 045F8006 5EC44BEB 06578826 04478826 &.G.&.W.$Ká^.._..û.¥.á^=._..û.µ. 0000C0
 A69A0E11 02569A08 8808C483 0E0C07CE 9A0E0203 EF9ADC88 08EC8300 FD06C79A .û.»..å..É.ÿ....ö....á..Ä.V....| 0000E0
 06578926 04478926 F45EC409 5E00FC9A 0477FF26 0677FF26 FC5EC450 520E2304 .#.RPá^=&.w.&.w..=.^.á^¶&.G.&.W. 000100
 06468808 740C4608 0A468808 8E0CC988 1E565700 0000C800 08CAC91F 00EBC028 +á$..èò..à...WV.|è..Ä.F..F.t..F. 000120
 A5A5A50A 8E1EF088 F888005E 050C5688 0A468806 5EC41CEB 8DF38805 7508460B .F.u.|µ.$.á^..F..V..^..«.Þ..ÖEEE 000140
 FC46890E 56880C46 88D88E0E 41881E00 0004C800 08CAC95F 5E1F00EB C0281FA5 É.+á$..^_èò..à....|A..Ä.F..V..F= 000160
 07892602 478926C0 28065EC4 73E880F3 88057508 46080646 880874C2 08FE5689 .V±.òt..F..F.u.|µ.$sá^.+á&.G.&.. 000180
 57392658 57882656 478826FC 5EC41EEB 5A478926 5C478926 FC5EC400 740A4639 9F.t.á^=&.G\&.GZ$.á^=&.Gv&.Wx&9W 0001A0
 265C77FF 264277FF 264477FF 26FC5EC4 37E880FF 8805725A 47392606 7F0D7C5C \|...&9GZr.|..$7á^=&.wD&.wB&.w\& 0001C0
 FF880574 C00804C2 08689A06 76FF0876 FF006A00 5C578326 015A4783 265A77FF .wZ&.GZ.&.W\.j..v..v..k.ò..àt.|. 0001E0

Dump of file SATURN:[PCCOMMON.DUMP.DLL]BRD.TMP;1 on 18-APR-1990 10:36:59.83
File ID (519,15,0)   End of file block 272 / Allocated 272

Virtual block number 24 (00000018), 512 (0200) bytes

 08740C46 080A4688 D88E0E83 881E5657 000018C8 000ACAC9 1F00E8C0 2804E88D .$.+á$..èò..à...WV.|...Ä.F..F.t. 000000
 08260447 88260F75 02470826 07882606 5EC400E6 E980F388 06750846 08064688 .F..F.u.|µ.Ö].á^.&..&.G.u.&.G.&. 000020
 1E0716F0 88F07E8D 001605EE 5689EC46 890C5688 0A468800 C8E9C028 05750647 G.u.+áÖù..F..V..F&.VŸ....-Þ.Þ... 000040
 06578826 04478826 F25611F0 46010257 8826078B 2608468E 1FA5F200 0889DA8E .Ö¿...E..F.&..&.W..FÞ.V.&.G.&.W. 000060
 5611FC46 01065788 26044788 26FA5611 F8460102 57882607 8826F656 11F44601 .F¶.V-&..&.W..F½.V*&.G.&.W..F=.V 000080
 05EE5688 EC468808 C483079F 0CFE9A50 16F0468D 50520026 05EE5688 EC4688FE ±.F$.VŸ.&.RP.FÞ.P.±.....á..F$.VŸ. 0000A0
 26065EC4 02571126 070126E8 5EC40257 8826078B 26065EC4 EA5689E8 4689006E n..FÖ.Võá^.&..&.W.á^Ö&..&.W.á^.& 0000C0
 0E530609 7500008E 8F8326EC 5EC40657 11260447 0126E85E C4065788 26044788 .G.&.W.á^Ö&.G.&.W.á^$&.¢...u..S. 0000E0
 1E000004 C80008CA C95F5E1F 00E8C028 00010094 87C726EC 5EC404C4 830375E8 Öu..á.á^$&ú.....+á$..^_èò..à.... 000100
 8800ACE9 8DF38806 7E0A0A7E 83067C00 0A7E830C 740E4608 0C4688D8 8E0F2488 |$..Ä.F..F.t..~..|..~..~.|µ.Ö¯.. 000120
 FC5EC456 E80A4688 FE5689FC 46890E56 880C4688 009FE9C0 28057508 46080646 F..F.u.+áÖ...F..V..F=.V±.F.$Vá^= 000140
 9711267E 47012608 56880646 88FC5EC4 59E87857 11267647 01260856 88064688 .F..V.&.Gv&.Wx$Yá^=.F..V.&.G-&.. 000160
 08568806 4688FC5E C432E87C 5711267A 47012608 56880646 88FC5EC4 45E80080 ..$Eá^=.F..V.&.Gz&.W|$2á^=.F..V. 000180
 0004300A 74000230 CC740001 3016E83A E880F388 1DE80084 97112600 82870126 &....&....$.|µ.$:$.=..të=..tÖ=.. 0001A0
 FC5EC404 C483029E E80E5306 09750000 8E8F8326 FC5EC4E3 E8A97400 08309874 t.=..t`$Dá^=&.¢...u..S.Ö...á.á^= 0001C0
 08460806 4688088E 103188 1E 000014C8 000ACAC9 1F00E8C0 28000100 9487C726 &ú.....+á$..èò..à....|1..Ä.F..F. 0001E0
```

```
Dump of file SATURN:[PCCOMMON.DUMP.DLL]BRD.TMP;1 on 18-APR-1990 10:36:59.83
File ID (519,15,0)   End of file block 272 / Allocated 272

Virtual block number 25 (00000019), 512 (0200) bytes

 89045788 26024788 24065EC4 FE5689FC 46890856 88064688 0170E980 F3880675 u.jµ.Õp..F..V..F».V±á^.&.G.&.W.. 000000
 000605C2 8CC3880A 76FF0C76 FF0E76FF 1076FF2A 740C4608 0A4688F2 5489F046 FÞ.V·.F..F.t*.v..v..v..v..ù.ò... 000020
 FF266877 FF26065E C414C483 03290000 9A016AFC 76FFFE76 FF008AB7 FF.5052 RP&.ñ...v±.v»j....)..á.á^.&.wh&. 000040
 11B30A58 9A5016F4 46806677 FF266877 FF26065E C411BE09 C29A006A 006..677 wfj.j..ô...á^.&.wh&.wf.F¶.P.X.°. 000060
 006A006A 4277FF26 4477FF26 065EC4DA E8029F05 A49AF476 FFF676FF 0075C008 .áu..v-.v¶.É...ŠÖá^.&.wD&.wBj.j. 000080
 76FF1575 C0080F08 0A589A50 16F8468D 4277FF26 4477FF26 065EC411 C809C29A .ô.à.á^.&.wD&.wB.F½.P.X....áu..v 0000A0
 3877FF26 065EC4FC 76FFFE76 FFD2E802 DB02FF9A 006AFC76 FFFE76FF F876FFFA °.v½.v±.v»j....Ü.Š®.v±.v»á^.&.wB 0000C0
 5016EC46 8DFC76FF FE76FF14 77FF2616 77FF26F0 5EC4F146 E80E006A 3677FF26 &.wój..ÖFþá^Þ&.w.&.w..v±.v».F&.P 0000E0
 FFEE76FF 1477FF26 1677FF26 F05EC418 74FFEE7E 830675FF EC7E8312 37091E9A ...7..~&.u..~Ÿ.t.á^Þ&.w.&.w..vŸ. 000100
 4477FF26 065EC412 5700689A 3E77FF26 4077FF26 065EC411 7905D09A 006AEC76 v&j..Å.y.á^.&.wØ&.w>.h.W.á^.&.wD 000120
 0677FF26 F05EC412 1300689A 6677FF26 6877FF26 065EC412 6700689A 4277FF26 &.wB.h.g.á^.&.wh&.wf.h...á^Þ&.w. 000140
 1E00000C C8C8C91F 00E8C028 04E88DF2 880574C0 08000001 E19A0676 FF0876FF .v..v..Å....át.¡·.Š.+áŠ..èùà.... 000160
 26065EC4 00C2E903 75000A7E 8300E2E9 8DF38806 75084608 06468808 8E110688 ¡...Á.F..F.u.¡µ.Õã..-..u.Õò.á^.& 000180
 5016F446 806677FF 266877FF 26065EC4 12D309C2 9A006A00 6A6677FF 266877FF .wh&.wfj.j..ò.£.á^.&.wh&.wf.F¶.P 0001A0
 E80CC483 119D09CF 9AF476FF F676FF00 6A006A00 6A006A18 75C00813 030A589A .X....áu.j.j.j.j..v-.v¶.ü....á.Š 0001C0
 4277FF26 4477FF26 065EC413 1809C29A 006A006A 4277FF26 4477FF26 065EC4CF üá^.&.wD&.wBj.j..ò...á^.&.wD&.wB 0001E0

Dump of file SATURN:[PCCOMMON.DUMP.DLL]BRD.TMP;1 on 18-APR-1990 10:36:59.83
File ID (519,15,0)   End of file block 272 / Allocated 272

Virtual block number 26 (0000001A), 512 (0200) bytes

 D5EB06C4 83FFFF02 179AF876 FFFA76FF 016A1275 C0081342 0A589A50 16F8468D .F½.P.X.B..áu.j..v°.v½......á.Š¡ 000000
 8D3E77FF 264077FF 26065EC4 135709C2 9A006A00 6A3E77FF 264077FF 26065EC4 á^.&.wØ&.w>j.j..ò.W.á^.&.wØ&.w>. 000020
 006AD6E8 06C483FF 22E80EFC 76FFFE76 FF016A11 75C00812 470A589A 5016FC46 F».P.X.G..áu.j..v±.v».Ö"..á.Š»j. 000040
 881E5657 00000CC8 C8C91F00 E80CC483 FD80E80E 0676FF08 76FF006A 006A006A j.j.j..v..v..Ö.».á.Š..èùà...WV.¡ 000060
 5689F446 89445788 26424788 2674E8C0 28047400 008E8F83 26065EC4 D88E1291 ...Äá^.&.e...t.+àŠt&.GB&.WD.F¶.V 000080
 3975C008 128E0A58 9A5016FC 468DF476 FFF676FF 13CA09C2 9A006A00 6A5052F6 -RPj.j..ô.ò..v-.v¶.F».P.X./..áu9 0000A0
 C41FA5A5 A5A5DA8E 1EF0881E 7F8D0016 05F85EC4 FA5689F8 4689FE56 88FC4688 .F».V±.F½.V°á^½.......Þ..ÖÉÉÉ.á 0000C0
 8E87C726 065EC483 E81FA5F2 0008890A 8E1EF088 267F8000 3605C28C C388F85E ^½.ù.ô.6...&.Þ..Ö¿..·É.Š°á^.&ú.. 0000E0
 46880874 08460806 46880886E 1390881E 000032C8 C8C95F5E 1F00E8C0 28000100 ...+áŠ..^ èùà2...¡...Å.F..F.t..F 000100
 89464788 26065EC4 085689D6 46890C56 880A4688 020FE98D F3880675 0C46080A ..F.u.¡µ.Õ...F..V..F».VÁá^»&.GF. 000120
 8DCE76FF 52F24689 F44689C0 28005689 CE468944 57882642 47882606 5EC4E246 Fãá^.£.GB&.WD.Fö.VÅ+á.F¶.F·R.vö. 000140
 5688E846 8800F856 8301F646 8308E8F6 4689F846 89C02814 8900F09A 5016E846 FÒ.P.Þ.¿.+à.F½.F-Š..F-..V½..FÒ.V 000160
 6AF676FF F876FFCE 76FFD076 FF00C7E9 0372F646 39087C00 D1E9037E F85639EA õ9V½~.Öî.|.9F-r.Õù..vÅ.vò.v½.v-j 000180
 7AE98DF1 880675F0 56390875 EE46390C 56880A46 88158308 689A5016 EE468000 ..FŸ.P.k....F..V.9FŸu.9VÞu.¡þ.Õz 0001A0
 886675EC 4639E246 88EC4689 46478826 DE5EC4E0 56890E46 89F05688 EE468801 ..FŸ.VÞ.F8.VÁá^B&.GF.F&.Fã9Fšuf. 0001C0
 7401E27E 830C5689 DA468900 1605C28C C3880456 89D24689 001605D8 56880646 F».VÁ....F®.Vå.ù.ò....FÖ.VÉ.-ã.t 0001E0

Dump of file SATURN:[PCCOMMON.DUMP.DLL]BRD.TMP;1 on 18-APR-1990 10:36:59.83
File ID (519,15,0)   End of file block 272 / Allocated 272

Virtual block number 27 (0000001B), 512 (0200) bytes

 77073926 057C097F 02573926 025EC402 57882607 88260A5E C41E7502 E27E8306 ..-ã.u.á^Ö&..&.W.á^Ø&9W...|.&9.w 000000
 77044739 26067C0A 7F065739 26025EC4 06578826 04478826 DA5EC41E E837E802 .Š7Š.á^Ö&.G.&.W.á^Ø&9W...|.&9G.w 000020
 CE76FFD0 76FFFF19 E900F456 8301F246 8308E802 7EEC4639 E246880A E817E802 .Š.Š..Fã9F&-.Š..F·..V¶.Ö...vÅ.vö 000040
 08568806 46880004 FA46C715 DD029D9A 0A76FF0C 76FF006A 006AF276 FFF476FF .v¶.v·j.j..v..v....Ì.úF°...F..V. 000060
 FA4688FF FF0247C7 26FFFF07 C72604FC 4683FC5E C412E8FE 5689FC46 89004605 .f..F».V±Š.á^».F».&ú...&úG....F° 000080
 E65689E4 46890046 05085688 064688F2 4689F446 89C028E2 E80274C0 08FA4EFF .N°.àt.Šã+à.F¶.F·.F..V..F..FÒ.VÌ 0000A0
 0B138A0A 589A5016 EE468DCE 76FFD076 FF15ED09 C29A006A 006ACE76 FFD076FF .vÅ.vöj.j..ô.Ù..vÅ.vö.FŸ.P.X.¤.. 0000C0
 6A8788E3 D1D888EC 46894647 88260E5E C4E05689 DE4689F0 5688EE46 885475C0 áuT.FŸ.VÞ.F8.VÁá^B&.GF.F&.ÄID..j 0000E0
 0D75FF02 7F832614 75FF3F83 26FC5EC4 FE5689FC 4689E656 88E44603 02E0C101 .èÅ..Fõ.VÌ.F».V±á^»&.?.u.&....u. 000100
 08C8C8C9 1F00E8C0 2898E800 F4568301 F2468302 57892607 8926F456 88F24688 .F·.V¶&..&.W..F·..V¶.Š.+áŠ..èùà. 000120
 065EC45E E88DF388 05750C46 080A4688 08740846 08064688 D88E1422 881E0000 ...¡"..Å.F..F.t..F..F.u.¡µ.Š^á^. 000140
 16B2091E 9A5016FC 46800A76 FF0C76FF 5052FA56 89F84689 44578826 42478826 &.GB&.WD.F½.V°RP.v..v..F».P...ý. 000160
 9A006AFC 76FFFE7· FFF876FF FA76FF2A E88E0788 0575FFFE 7E830875 FFFC7E83 .-».u..-±.u.¡..Š°.v°.v½.v±.v»j.. 000180
 000CC8C9 1F00E8C. 2808C483 FD58E80E 0676FF08 76FF0A76 FF0C76FF 14770500 Å.w..v..v..v..v..ÒX».á.+áŠ..èù.. 0001A0
 00000008 12EA0002 00000004 13290002 00000003 11DF0002 00000001 0FC40002 ..á.......Ô.......).......õ..... 0001C0
 0000000C 11620002 00140003 00720203 027F0005 00420203 00000009 03F90002 ..°.......8.......r.......b..... 0001E0
```

```
Dump of file SATURN:[PCCOMMON.DUMP.DLL]BRD.TMP;1 on 18-APR-1990 10:36:59.83
File ID (519,15,0)   End of file block 272 / Allocated 272

Virtual block number 28 (0000001C), 512 (0200) bytes

 00000019 16540002 00000017 00380002 00000014 168E0002 00220003 12770203 ..w...".............8.......T..... 000000
 E9BDF388 06750846 08064688 08741046 080E4688 088EFFFF 881E5657 000014C8 à...WV.¡...Ä.F..F.t..F..F.u.¡µ.Ö 000020
 46880000 FFFF9A50 16FC4680 0E76FF10 76FF0789 26024789 26C02806 5EC4013C <.á^.+àÆ.G.Æ...v..v..F=.P......F 000040
 6A50F246 89064788 26F45EC4 010AE980 F1880675 0008F656 89F44689 FE5688FC =.V±.F¶.V-.Äu.¡þ.Ö..á^¶Æ.G..F Pj 000060
 F84689EE 5688EC46 8800E7E9 8DF28806 74C00800 00FFFF9A 5016EC46 806E6A0E .jn.FÆ.P......àt.¡ .ÖÖ..FÆ.VŸ.F½ 000080
 76FF0457 89260247 8926F656 88F44688 A5F20037 89018A8E F888EC5E C4FA5689 .V°á^Æ.«/..¿7. È.F¶.V-Æ.G.Æ.W..v 0000A0
 4C05EE56 88EC4688 F276FF2E 75C00800 C600009A 50520048 05EE5688 EC4688F2 ·.FÆ.VŸ.H.RP...Ö..äu..v·.FÆ.VŸ.L 0000C0
 08011A00 009A5052 005005EE 5688EC46 88F276FF 1775C008 00000000 9A505200 .RP...Ì..äu..v·.FÆ.VŸ.P.RP...... 0000E0
 5EC42075 0C46080A 468868E8 8DF28800 0001419A EC76FFEE 76FFF276 FF1374C0 àt..v·.vŸ.vÆ.A...¡·.Šh.F..F.u á^ 000100
 76FF12E8 FFFF0290 9AF876FF FA76FF00 6A016A00 6A006A14 77FF2616 77FF26F4 ¶Æ.w.Æ.w.j.j.j.j..v°.v½.....Š..v 000120
 EC76FFEE 76FFF276 FF1374C0 08F04689 01CFE80E 016A0A76 FF0C76FF F876FFFA °.v½.v..v.j..Öü..Fþ.àt..v·.vŸ.vÆ 000140
 5E1F00E8 C0280257 89260789 26FA5688 F8468806 5EC414E8 F0468800 00FFFF9A ......FþŠ.á^..F½.V°Æ..Æ.W.+àŠ..^ 000160
 08468801 7DE980F3 8806750A 46080846 88088E00 08881E00 0014C800 0CCAC95F _èò..à....¡...Ä.F..F.u.¡µ.Ö)..F. 000180
 3F8326FC 5EC4FE56 89FC4689 04578826 02478826 F45EC4F6 5689F446 890A5688 .V..F¶.V-á^¶Æ.G.Æ.W..F=.V±á^=Æ.? 0001A0
 88260647 8826F45E C40143E9 06C483FF FF02179A F476FFF6 76FF0676 FF147502 .u..v..v-.v¶......á.ÖC.á^¶Æ.G.Æ. 0001C0
 7500067E 83000164 47C726F4 5EC40001 009487C7 26F85EC4 FA5689F8 46890857 W..F½.V°á^½Æú.....á^¶ÆúGd...-..u 0001E0

Dump of file SATURN:[PCCOMMON.DUMP.DLL]BRD.TMP;1 on 18-APR-1990 10:36:59.83
File ID (519,15,0)   End of file block 272 / Allocated 272

Virtual block number 29 (0000001D), 512 (0200) bytes

 265277FF 26F45EC4 020809C2 9A006A00 6A5077FF 265277FF 26F45EC4 00F5E903 .Ö%.á^¶Æ.wRÆ.wPj.j..ö...á^¶Æ.wRÆ 000000
 5EC4DAE8 FFFF0404 9AEC76FF EE76FF0D 75C00802 300A589A 5016EC46 8D5077FF .wP.FÆ.P.X.0..äu..vŸ.vÆ.....ŠÖá^ 000020
 F0468D4C 77FF264E 77FF26F4 5EC40245 09C29A00 6A006A4C 77FF264E 77FF26F4 ¶Æ.wNÆ.wLj.j..ô.E.á^¶Æ.wNÆ.wL.Fþ 000040
 016A37FF 260277FF 26D8E802 7401067F 8326F05E C41C75C0 0802790A 589A5016 .P.X.y..äu.á^þÆ....t.ŠUÆ.w.Æ.7j. 000060
 FF26F45E C402BE09 C29A006A 006A4877 FF264A77 FF26F45E C4C8E802 AE01749A .t.Û.Šüá^¶Æ.wJÆ.wHj.j..ô...á^¶Æ. 000080
 C438E82A E8064788 26F05EC4 4575C008 00AF0A58 9A5016F0 46804877 FF264A77 wJÆ.wH.Fþ.P.X.£..äuEá^þÆ.G.Š*Šßá 0000A0
 269A016A 37FF2602 77FF26F0 5EC425E8 FFFF0174 9A016A37 FF260277 FF26F05E ^þÆ.w.Æ.7j..t...ŠXá^þÆ.w.Æ.7j..Æ 0000C0
 FF0876FF 0A76FFA2 E800E8DD 74000230 CD740001 300474C0 0810E812 E8FFFF01 ...Š.Š..àtà=..tè=..tìŠ.ŠÄ.v..v.. 0000E0
 C80006CA C91F00E8 C02804E8 8E078805 74C00808 C483FFFF 044A9AFC 76FFFE76 v±.v=.J....á..àt.¡..Š.+àŠ..èò..à 000100
 F446890E 56880C46 8801A8E9 8DF38806 750E4608 0C468808 8E016888 1E000018 ....¡k..Ä.F..F.u.¡µ.Ö´..F..V..F¶ 000120
 08468800 C9E90375 00067E83 FE5689FC 46890457 88260247 8826F45E C4F65689 .V-á^¶Æ.G.Æ.W..F=.V±.-..u.Öè..F. 000140
 8F8326F8 5EC40875 00647F83 26016CE9 80F38806 75000BFA 5689F846 890A5688 .V..F½.V°.Äu.¡µ.Öl.Æ..d.u.á^½Æ.¢ 000160
 5EC40141 E98E0088 06740847 08260647 8826F45E C40154E9 8E008806 7400008C ...t.¡..ÖT.á^¶Æ.G.Æ.G.t.¡..ÖA.á^ 000180
 830675FF F07E8303 88091E9A 5016F046 8D0C76FF 0E76FF14 77FF2616 77FF26FC =Æ.w.Æ.w..v..v..Fþ.P...£..-þ.u.. 0001A0
 F85EC401 F605D09A 006AF076 FFF276FF 1477FF26 1677FF26 FC5EC418 74FFF27E -·.t.á^=Æ.w.Æ.w..v·.vþj..Å.-.á^½ 0001C0
 880674C0 08039702 9D9A0C76 FF0E76FF 006A006A 006A006A 4277FF26 4477FF26 Æ.wDÆ.wBj.j.j.j..v..v.......àt.¡ 0001E0

Dump of file SATURN:[PCCOMMON.DUMP.DLL]BRD.TMP;1 on 18-APR-1990 10:36:59.83
File ID (519,15,0)   End of file block 272 / Allocated 272

Virtual block number 30 (0000001E), 512 (0200) bytes

 26064789 260A5688 084688F4 5EC40058 57832601 56478326 F85EC400 DAE98E00 ..ÖÖ.á^½Æ.GV.Æ.WX.á^¶.F..V.Æ.G.Æ 000000
 9EE98E00 88067500 08FA5689 F8468908 57882606 478826F4 5EC400AC E9085789 .W.Ö¯.á^¶Æ.G.Æ.W..F½.V°.Äu.¡..Ö. 000020
 9A5016EC 46800C76 FF0E76FF 5052EA56 89E84689 44578826 42478826 F85EC400 .á^½Æ.GBÆ.WD.FÖ.VöRP.v..v..F$.P. 000040
 76FFEE76 FFE876FF EA76FF6A E88E0088 0575FFEE 7E830875 FFEC7E83 0466091E ..f..-$.u..-Ÿ.u.¡..Šj.vö.vÖ.vŸ.v 000060
 006A006A 1477FF26 1677FF26 FC5EC44E E88E0088 0574C008 048005D0 9A006AEC ±j..Å....àt.¡..ŠNá^=Æ.w.Æ.w.j.j. 000080
 01566F83 26F85EC4 27E88E07 880574C0 08030902 909A0C76 FF0E76FF 006A016A j.j..v..v....Ì..àt.¡..Š'á^½Æ.oV. 0000A0
 1F00E8C0 28000166 47C726F4 5EC40647 89260847 8926C028 F45EC400 585F8326 Æ._X.á^¶+àÆ.G.Æ.G.á^¶ÆúGf..+àŠ.. 0000C0
 F3880575 08460806 46880874 0C46080A 4688088E 0305881E 000004C8 000ACAC9 èò..à....¡...Ä.F..F.t..F..F.u.¡µ 0000E0
 00E8C028 07892606 5EC40A47 8826FC5E C4FE5689 FC46890C 56880A46 881DE880 .Š..F..V..F=.V±á^=Æ.G.á^.Æ..+àŠ. 000100
 88057508 46080646 8808740C 46080A46 88088E04 CA881E00 0004C800 08CAC91F .èò..à....¡ò..Ä.F..F.t..F..F.u.¡ 000120
 E8C02807 8926065E C40C4788 26FC5EC4 FE5689FC 46890C56 880A4688 10E880F3 µ.Š..F..V..F=.V±á^=Æ.G.á^.Æ..+àŠ 000140
 05750846 08064688 08740C46 080A4688 D88E0508 881E0000 04C80008 CAC91F00 ..èò..à....¡...Ä.F..F.t..F..F.u. 000160
 3F832606 7F1A7C00 027F8326 065EC4FE 5689FC46 890C5688 0A46885A E880F388 ¡µ.Š2.F..V..F=.V±á^.Æ....|...Æ.? 000180
 7F1C7C00 067F8326 065EC410 5789260E 478926FC 5EC40257 88260788 26127400 .t.Æ..Æ.W.á^=Æ.G.Æ.W.á^.Æ....|.. 0001A0
 1F00E8C0 28145789 26124789 26FC5EC4 06578826 04478826 13740004 7F832607 .Æ....t.Æ.G.Æ.W.á^=Æ.G.Æ.W.+àŠ.. 0001C0
 05750846 08064688 08740C46 080A4688 D88E054C 881E5657 000000C8 0008CAC9 èò..à...WV.¡L..Ä.F..F.t..F..F.u. 0001E0
```

```
Dump of file SATURN:[PCCOMMON.DUMP.DLL]BRD.TMP;1 on 18-APR-1990 10:36:59.83
File ID (519,15,0)   End of file block 272 / Allocated 272

Virtual block number 31 (0000001F), 512 (0200) bytes

 EBC02B1F A5A5A5A5 DABE1EF0 8BFB8800 0E050C56 880A4688 065EC41C EB8DF388 |µ.Š.ó^..F..V.....«.Þ..ÖËËË.+âŠ 000000
 08064688 08740C46 080A4688 D88E05CC 881E5657 000000C8 0008CAC9 5F5E1F00 ..^_èò..à...WV.¡ä..Ä.F..F.t..F.. 000020
 1FA5F200 0889C48E 1EF08836 7F8D0856 88064688 0A5EC418 EB8DF388 05750846 F.u.¡µ.Š.ó^..F..V...6.Þ..Ö¿..·Ë. 000040
 8808740C 46080A46 88D88E06 10881E56 57000028 C80008CA C95F5E1F 00EBC02B +âŠ..^_èò..à(..WV.¡...Ä.F..F.t.. 000060
 01AF0DFE 9A5052EE 5689EC46 890C5688 0A468803 6CE98DF3 88067508 46080646 F..F.u.¡µ.Öl..F..V..F&.VŸRP.±.Ê. 000080
 26EC5EC4 1FA5F200 0889DA8E 1EF088FB 88003605 EE5688EC 4688065E C404C483 .ó.ó^..F&.VŸ.6..«.Þ..Ö¿..·Ë.ó^š& 0000A0
 46890016 05C28CC3 887174C0 08047F77 7CD20BF6 5689F446 895A5788 26584788 .GX&.WZ.F¶.V-.Ø|w...átq.ù.ö....F 0000C0
 88260447 88260E56 890C4689 F65618F4 462B0257 88260788 26085EC4 DA568908 Ä.VÖó^Ä&..&.W.+F¶.V-.FÉ.V8&.G.&. 0000E0
 5689E446 89F65613 F4460302 57882607 8826E256 89E04689 F65618F4 46280657 W.+F¶.V-.FÅ.Vã&..&.W..F¶.V-.Fô.V 000100
 50160C46 8D0676FF 0876FFEA 5689E846 89F65613 F4460306 57882604 47882686 |&.G.&.W..F¶.V-.FÒ.Võ.v..v..FÉ.P 000120
 52478826 F85EC4FA 5689F846 89045788 26024788 26EC5EC4 08C483FF FF0CFE9A .±....ó.ó^š&.G.&.W..F%.Vªó^%&.GR 000140
 FC468806 5EC40257 19260729 26065EC4 FE5689FC 4689000A 83000120 54578826 &.WT-...Ö..F•.V±ó^.&).&.W.ó^..F• 000160
 88065EC4 0A571126 08470126 FE5688FC 4688065E C4065719 26044729 26FE5688 .V±&)G.&.W.ó^..F•.V±&.G.&.W.ó^.. 000180
 88064688 F25689F0 4689005E 05FA5688 F846880E 5711260C 470126FE 5688FC46 F•.V±&.G.&.W..F%.Vª.^..FÞ.V·.F.. 0001A0
 EC01309A 37FF26 ? 77FF26D8 5EC437FF 260277FF 26F05EC4 DA568908 46890856 V..FÄ.VÖó^Þ&.w.&.7ó^Ä&.w.&.7.0.& 0001C0
 26F05EC4 44E80257 88260788 26085EC4 0C74C008 C02802E8 00018805 75D00807 ..Åu.¡..Š.+à.ât.ó^Ä&..&.W.ŠDó^Þ& 0001E0

Dump of file SATURN:[PCCOMMON.DUMP.DLL]BRD.TMP;1 on 18-APR-1990 10:36:59.83
File ID (519,15,0)   End of file block 272 / Allocated 272

Virtual block number 32 (00000020), 512 (0200) bytes

 DC8808EC 83080306 C79A07F9 02C39AF0 5EC407F4 02C39AD8 5EC437FF 260277FF .w.&.7ó^Ä.ù.¶.ó^Þ.ù.ª..ú....&..É 000000
 084300FC 9A505208 1E04A69A 08170256 9AD88808 C4830812 07BE9A08 0803EF9A .ÿ..../....ó..Ä.V....Ï...RP.•.C. 000020
 0477FF26 0677FF26 D85EC404 77FF2606 77FF26F0 5EC40257 89260789 26085EC4 ó^Ä&..&.W.ó^Þ&.w.&.w.ó^Ä&.w.&.w. 000040
 EB065788 26044788 26D85EC4 0D74C008 C02802E8 00018805 75D00808 6A01309A .0.j..Åu.¡..Š.+à.ât.ó^Ä&.G.&.W.Š 000060
 8808EC83 088406C7 9A087A02 C39A045F 8DF05EC4 087502C3 9A045F8D D85EC44B Kó^Ä._..ù.u.ó^Þ._..ù.z..ú....&.. 000080
 26F05EC4 505208AA 04A69A08 9802569A D88808C4 83089307 8E9A0889 03EF9ADC É.ÿ..../....ó..Ä.V....Ï.¯.RPó^Þ& 0000A0
 00080508 56880646 88065789 26044789 26D85EC4 080000FC 9A0477FF 260677FF .w.&.w..•.Ï.ó^Ä&.G.&.W..F..V.... 0000C0
 08090A01 309A37FF 260277FF 26D85EC4 37FF2602 77FF26F0 5EC40A56 89084689 .FÄ.VÖó^Þ&.w.&.7ó^Ä&.w.&.7.0.... 0000E0
 77FF26F0 5EC444E6 02578826 07882608 5EC40C74 C008C028 02E80001 88057500 Åu.¡..Š.+à.ât.ó^Ä&..&.W.ŠDó^Þ&.w 000100
 EF9ADC88 08EC8309 2106C79A 091702C3 9AF05EC4 091202C3 9AD85EC4 37FF2602 .&.7ó^Ä.ù...ó^Þ.ù....ú.!..&..É.ÿ 000120
 5EC40961 00FC9A50 52093C04 A69A0935 02569AD8 8808C483 093007CE 9A092603 .&..ö.0..ó..Ä.V.5..Ï.<.RP.•.ø.ó^ 000140
 309A0477 FF260677 FF26D85E C40477FF 260677FF 26F05EC4 02578926 07892608 Ä&..&.W.ó^Þ&.w.&.w.ó^Ä&.w.&.w..0 000160
 C448EB06 57882604 47882608 5EC40074 C008C028 02E80001 88057500 08098801 ....Åu.¡..Š.+à.ât.ó^Ä&.G.&.W.ŠKó 000180
 9ADC8808 EC8309A2 06C79A09 9802C39A 045F8DF0 5EC40993 02C39A04 5F8DD85E ^Ä._..ù...ó^Þ._..ù....ú.Å..&..É. 0001A0
 77FF26F0 5EC45052 09C804A6 9A098602 569AD888 08C48309 8107CE9A 09A703EF ÿ.Ï¯.ö.Ÿ..ó..Ä¯.V.Ñ..Ï.à.RPó^Þ&.w 0001C0
 0008CAC9 5F5E1F00 EBC02806 57892604 47892608 5EC4FFFF 00FC9A04 77FF2606 .&.w..•...ó^Ä&.G.&.W.+âŠ..^_èò.. 0001E0

Dump of file SATURN:[PCCOMMON.DUMP.DLL]BRD.TMP;1 on 18-APR-1990 10:36:59.83
File ID (519,15,0)   End of file block 272 / Allocated 272

Virtual block number 33 (00000021), 512 (0200) bytes

 0A5EC415 EB8DF388 057D0008 7E830674 0C46080A 4688088E 0653881E 000000C8 à....¡S..Ä.F..F.t..~..).¡µ.Š.ó^. 000000
 8E09E688 1E000000 C80008CA C91F00EB C02B5A57 89265847 89260856 88064688 .F..V.&.GX&.WZ+âŠ..èò..à....¡|.. 000020
 57882658 4788260A 5EC419EB 8DF38805 75084608 06468808 740C4608 0A4688D8 Ä.F..F.t..F..F.u.¡µ.Š.ó^.&.GX&.W 000040
 4688D88E 0A1D881E 000000C8 0008CAC9 1F00EBC0 28025789 26078926 065EC45A Zó^.&..&.W.+âŠ..èò..à....¡...Ä.F 000060
 F3880574 02067E83 08740106 7E831174 08067E83 17740406 7E831874 0A460808 ..F.t..~..t..~..t..~..t..~..t.¡µ 000080
 D88E0A5A 881E0000 04C80006 CAC91F00 EBC02846 47892606 4688085E C40EE88D .Š.ó^..F.&.GF+âŠ..èò..à....¡Z..Ä 0000A0
 5689FC46 890C5688 0A46881D EB8DF388 05750846 08064688 08740C46 080A4688 .F..F.t..F..F.u.¡µ.Š..F..V..F•.V 0000C0
 8E0A9C88 1E000004 C80008CA C91F00EB C0280789 26065EC4 46478826 FC5EC4FE ±ó^•&.GFó^.&..+âŠ..èò..à....¡... 0000E0
 0A568808 46881AE8 8DF38805 7E02067E 83067C00 067E830C 740A4608 084688D8 Ä.F..F.t..~..|..~..~.¡µ.Š..F..V. 000100
 D0881E00 0004C800 06CAC91F 00EBC028 5C478926 064688FC 5EC4FE56 89FC4689 .F•.V±ó^•.F.&.G\+âŠ..èò..à....¡Ï 000120
 46890C56 880A4688 1DEB8DF3 88057508 46080646 8808740C 46080A46 88D88E0A ..Ä.F..F.t..F..F.u.¡µ.Š..F..V..F 000140
 881E0000 08C80008 CAC91F00 EBC02807 8926065E C45C4788 26FC5EC4 FE5689FC •.V±ó^•&.G\ó^.&..+âŠ..èò..à....¡ 000160
 5689FC46 89001605 08568806 468800D1 E98DF388 06750846 08064688 D88E081F ...Ä.F..F.u.¡µ.Öï..F..V.....F•.V 000180
 5788267A 47882606 5EC40257 11260701 26FC5EC4 78578826 76478826 065EC4FE ±ó^.&.Gv&.Wxó^•&..&.W.ó^.&.Gz&.W 0001A0
 26084701 26FC5EC4 00809788 267E4788 26065EC4 06571126 04470126 FC5EC47C |ó^•&.G.&.W.ó^.&.G~&....ó^•&.G.& 0001C0
 56880646 880E5711 260C4701 26FC5EC4 00849788 26008287 8826065E C40A5711 .W.ó^.&....&....ó^•&.G.&.W..F..V 0001E0
```

```
Dump of file SATURN:[PCCOMMON.DUMP.DLL]BRD.TMP;1 on 18-APR-1990 10:36:59.83
File ID (519,15,0)   End of file block 272 / Allocated 272

Virtual block number 34 (00000022), 512 (0200) bytes

 5EC40257 11260701 26FC5EC4 02578826 07B826F8 5EC4FA56 89F84689 006E0508 ..n..F%.V*á^%&..&.W.á^=&..&.W.á^ 000000
 5EC40257 8826076a 26F85EC4 06571126 04470126 FC5EC406 57882604 478826F8 %&.G.&.W.á^=&.G.&.W.á^%&..&.W.á^ 000020
 280E5711 260C4701 26FC5EC4 06578826 04478826 F85EC40A 57112608 470126FC =&.G.&.W.á^%&.G.&.W.á^=&.G.&.W.+ 000040
 08460806 46880874 0C46080A 4688D88E 0860881E 56570000 1EC8C8C9 1F00E8C0 àŠ..èùà...WV.¡'..Á.F..F.t..F..F. 000060
 89045788 26024788 26E25EC4 E45689E2 46890C56 880A4688 0160E980 F3880675 u.¡µ.Ò'..F..V..Fã.Vôá^ã&.G.&.W.. 000080
 065EC401 28E98E08 880675C2 08FE5689 FC468908 57882606 478826EA 5689E846 FÒ.Võ&.G.&.W..F=.V±.òu.¡..Ò+.á^. 0000A0
 57882604 47882606 5EC41F75 18573926 25751647 3926E25E C4025788 26078826 &..&.W.á^ã&9G.uX&9W.u.á^.&.G.&.W 0000C0
 C28CC388 2E750066 7F832600 F3E9C028 05751C57 39260875 1A473926 E25EC406 .á^ã&9G.u.&9W.u.+àÒµ.&..f.u..û.ó 0000E0
 1EF08826 7F8D0036 05C28CC3 88E25EC4 1FA5A5A5 A5DA8E1E F0881E7F 80001605 .......Þ..ÒEEEE.á^ã.û.ó.6...&.Þ. 000100
 0CFE9A50 52003605 E2468850 52002605 E45688E2 46881BE8 1FA5F200 0889DA8E .Ò¿...E.Š..Fã.VÔ.&.RP.Fã.6.RP.±. 000120
 FF521FA5 F2000889 DA8E1E07 16F088EC 7E8D0016 05FE5688 FC468808 C4830723 #..á..F=.V±....~Š.Þ....Ò¿...E.R. 000140
 C4830DAD 08879AE2 76FFE476 FF0676FF 0876FF00 6A006A04 C483FE14 E80EFC76 v=.Ò.±.á.j.j..v..v..vÒ.vã...Ù..á 000160
 E88E0988 057400E6 7E831FA5 F2000889 1F161EEC 7680167F 80FC5EC4 E646890C ..FÌá^=....v$...¿...E..~Ì.t.|..Š 000180
 5EC42AEB 8E088805 74C00808 C483FFFF 164E9AFC 76FFFE76 FF0A76FF 0C76FF47 G.v...v..v±.v=.N....á..ât.¡..Š*á^ 0001A0
 C726E25E C4000168 47C726E2 5EC404C4 83067E00 FE9A5306 0A7D010A 7F8326E2 ã&....)..S.±.-..á.á^ã&ùGh..á^ã&ú 0001C0
 46080A46 88D88E0C 4E881E56 57000004 C80008CA C95F5E1F 00E8C028 00016647 Gf..+âŠ..^_èò..à...WV.¡N..Á.F..F 0001E0

Dump of file SATURN:[PCCOMMON.DUMP.DLL]BRD.TMP;1 on 18-APR-1990 10:36:59.83
File ID (519,15,0)   End of file block 272 / Allocated 272

Virtual block number 35 (00000023), 512 (0200) bytes

 05065EC4 FE5689FC 46890C56 880A4688 22E88DF3 88057508 46080646 8808740C .t..F..F.u.¡µ.Š".F..V..F=.V±á^.. 000000
 07881E00 0000C800 08CAC95F 5E1F00E8 C0281FA5 A5A5A5DA 8E1EF088 F8880016 ...«.Þ..ÒEEEE.+âŠ..^_èò..à....¡= 000020
 5789265E 47892608 56880646 880A5EC4 15E880F3 8805750C 46080A46 88D88E0D ..Á.F..F.u.¡µ.Š.á^..F..V.&.G^&.W 000040
 08064688 08740C46 080A4688 D88E0E1F 881E0000 00C80008 CAC91F00 E8C02860 '+âŠ..èò..à....¡...Ä.F..F.t..F.. 000060
 C0280257 89260789 26065EC4 60578826 5E478826 0A5EC419 E88DF388 05750846 F.u.¡µ.Š.á^.&.G^&.W'á^.&..&.W.+â 000080
 75084608 06468808 740C4608 0A468808 8E0E5088 1E000000 C80008CA C91F00E8 Š..èò..à....¡P..Ä.F..F.t..F..F.u 0000A0
 1F00E8C0 28025789 26078926 065EC408 57882606 4788260A 5EC419E8 8DF38805 .¡µ.Š.á^.&.G.&.W.á^.&..&.W.+âŠ.. 0000C0
 080E4688 187C0012 7E831E74 16460814 4688D88E 0E8D881E 000008C8 0008CAC9 èò..à....¡...Ä.F..F.t..~..|..F.. 0000E0
 26C0280E 5EC40086 E98DF388 06750846 08064688 08740C46 080A4688 10741046 F.t..F..F.t..F..F.u.¡µ.Ò..á^.+â& 000100
 124688F8 5EC4FA56 89F84689 16568814 46880003 07C7260A 5EC40789 26u..789 .G.&..á^.&ú....F..V..F%.V*á^%.F. 000120
 5016FC46 80006A50 52991246 884877FF 264A77FF 2655E880 F388057F 0A47..26 &9G...¡µ.ŠU&.wJ&.wH.F..RPj..F=.P 000140
 89260789 260E5EC4 02578826 078826FC 5EC432E8 80F18805 74C00804 4208669A .k.B..át.¡þ.Š2á^=&..&.W.á^.&..&. 000160
 00E8C028 07892606 5EC40447 8826FC5E C4078926 0A5EC406 478826FC 5EC40257 W.á^=&.G.á^.&..á^=&.G.á^.&..+âŠ. 000180
 00000004 005C0002 00000002 00900002 00000001 00200002 00009000 12CAC91F .èò...... ...............\..... 0001A0
 027F0005 003A0203 00000008 021A0002 00000007 02C10002 00000005 02630002 ..c.......è...............:..... 0001C0
 00000014 0F430002 00220003 00ED0203 0000000C 02E80002 00140003 00690203 ..i.......Ò.......Ù..."...C..... 0001E0

Dump of file SATURN:[PCCOMMON.DUMP.DLL]BRD.TMP;1 on 18-APR-1990 10:36:59.83
File ID (519,15,0)   End of file block 272 / Allocated 272

Virtual block number 36 (00000024), 512 (0200) bytes

 08460806 4688D88E FFFF881E 000022C8 00000019 0ECA0002 00000017 078F0002 ..¢.......ò.....à"...¡...Ä.F..F. 000000
 89045788 26024788 26065EC4 F05689EE 46890856 88064688 01FCE980 F3880675 u.¡µ.Ò=..F..V..FŸ.VÞá^.&.G.&.W.. 000020
 003605C2 8CC3880A 76FF0C76 FF0E76FF 1076FF25 740C4608 0A4688E8 5689E646 F|.VÒ.F..F.t%.v..v..v..v..ú.ô.6. 000040
 6A006A50 77FF2652 77FF2606 5EC414C4 83FFFF00 009A026A 53526277 FF265052 RP&.wbRSj.......á.á^.&.wR&.wPj.j 000060
 FF0075C0 0800E00A 589A5016 EA468D50 77FF2652 77FF2606 5EC40089 09C29A00 ..ô...á^.&.wR&.wP.Fõ.P.X.Á..âu.. 000080
 89FC4689 4E578826 4C478826 065EC400 02F646C7 DAE8FFFF 05A49AEA 76FFEC76 v$.vò.Ê...ŠÒùF-..á^.&.GL&.WN.F=. 0000A0
 E90375C0 08F64EFF F64688FE 5689FC46 894A5788 26484788 26065EC4 11E8FE56 V±Š.á^.&.GH&.WJ.F=.V±.F-.N-.âu.Ò 0000C0
 01F24683 08E8F246 89F44689 C028011C 00F09A50 16E24680 FC76FFFE 76FF0092 ...v±.v=.Fã.P.Þ...+á.F¶.F.Š..F.. 0000E0
 FFF476FF FC76FFFE 76FF5873 F2463905 7C627FF4 5639E456 88E24688 00F45683 .V¶..Fã.V69V¶.b|.9F.s[.v±.v=.v¶. 000100
 FF260277 FF26F85E C428E806 478826F8 5EC4FFFF 08689A50 16F84680 006AF276 v.j..F%.P.k...á^%&.G.Š(á^%&.w.&. 000120
 0810E812 E8FFFF03 029A37FF 260277FF 26F85EC4 23E8FFFF 03839A04 77FF2637 7&.w..*...Š#á^%&.w.&.7.....Š.Š.. 000140
 77FF2606 5EC4EE76 FFF076FF FF50E988 E800E8DF 7400023D CF7E0001 300C7CC0 à|.=..~ü=..tÒŠ.Š.ÒP..vÞ.vŸá^.&.w 000160
 77FF2616 77FF26E6 5EC4008E E98E0088 0674C008 FFFF02FF 9A006A06 77FF2608 .&.w.j.......àt.¡..Ò..á^Ì&.w.&.w 000180
 E65EC418 74FFE07E 830675FF DE7E8301 C3091E9A 50160E46 80EE76FF F076FF14 ..vÞ.vŸ.FB.P...ù..~B.u..-Á.t.á^Ì 0001A0
 4877FF26 4A77FF26 065EC400 7405D09A 006ADE76 FFE076FF 1477FF26 1677FF26 &.w.&.w..vÁ.vBj..Å.t.á^.&.wJ&.wH 0001C0
 5077FF26 5277FF26 065EC401 F300689A 4C77FF26 4E77FF26 065EC401 E300689A .h.D.á^.&.wN&.wL.h.µ.á^.&.wR&.wP 0001E0
```

```
Dump of file SATURN:[PCCOMMON.DUMP.DLL]BRD.TMP;1 on 18-APR-1990 10:36:59.83
File ID (519,15,0)   End of file block 272 / Allocated 272

Virtual block number 37 (00000025), 512 (0200) bytes

04EB80F2 880574C0 080000FF FF9A0676 FF0876FF 0677FF26 E65EC401 9F00689A .h...á^|&.w..v..v.......åt.¡·.Š. 000000
830129E9 8DF38806 75084608 064688D8 8E000688 1E000008 C8C8C91F 00E8C028 +åŠ..èùà....¡...Ä.F..F.u.¡µ.Ö).. 000020
26065EC4 025F0^C2 9A006A00 6A5077FF 265277FF 26065EC4 0109E903 75000A7E -..u.Õ..á^.&.wR&.wPj.j..ó._.á^.& 000040
FA76FF00 6A006A00 6A006A18 75C00802 8F0A589A 5016F846 8D5077FF 265277FF .wR&.wP.F%.P.X....åu.j.j.j.j..vª 000060
A409C29A 006A006A 4C77FF26 4E77FF26 065EC4CF EB0CC483 009809CF 9AF876FF .vñ.ü....á.Šüá^.&.wN&.wLj.j..ó.Ê 000080
7F8326FC 5EC41F75 C008020B 0A589A50 16FC468D 4C77FF26 4E77FF26 065EC402 .á^.&.wN&.wL.F=.P.X.Ü..åu.á^=&.. 0000A0
4A77FF26 065EC4C8 EB06C483 03100F6C 9A37FF26 0277FF26 016ADBEB 02740106 ..t.ŠÜj.&.w.&.7.l....á.Šàá^.&.wJ 0000C0
0A589A50 16FC468D 4877FF26 4A77FF26 065EC402 F009C29A 006A006A 4877FF26 &.wHj.j..ó.Þ.á^.&.wJ&.wH.F=.P.X. 0000E0
0F6C9A37 FF260277 FF26FC5E C4016A3E EB30EB06 478B26FC 5EC44B75 C00B01D3 &..åuKá^=&.G.ŠOŠ>j.á^=&.w.&.7.l. 000100
0810EB12 EB06C483 014906A1 9A37FF26 0277FF26 FC5EC401 6A28EB06 C4830138 8..á.Š(j.á^=&.w.&.7.À.I..á.Š.Š.. 000120
0E0676FF 0876FF00 6A006A00 6A006A9C EB00EBDA 74000230 C7740001 3DCE74C0 åtö=..tü=..tÖŠ.Š.j.j.j.j..v..v.. 000140
8DF38806 75084608 06468808 8E021088 1E00000C C8C8C91F 00EB0CC4 83FCADE8 ÕÜ•.á.Š..èùà....¡...Ä.F..F.u.¡µ. 000160
88264C47 88263275 010E7E83 F65689F4 46890457 88260247 8826065E C4010BE9 Ö..á^.&.G.&.W..F¶.V-.~..u2&.GL&. 000180
7E830CC4 8316EFE8 0EFC76FF 520A76FF 0C76FF50 1610468D FE5689FC 46894E57 WN.F=.V±.F..P.v..v.R.v=.Öÿ..á..- 0001A0
88067D10 4638480A 47882606 5EC40D7C 00107E83 2AE800C4 E98E07B8 0675FF10 ..u.¡..Ôá.Š*.-..|.á^.&.G.H;F.).¡ 0001C0
99104688 FC76FFFE 76FFFE56 89FC4689 4A578826 48478826 065EC400 A9E98DF3 µ.Ö`.á^.&.GH&.WJ.F=.V±.v±.v=.F.. 0001E0

Dump of file SATURN:[PCCOMMON.DUMP.DLL]BRD.TMP;1 on 18-APR-1990 1^:36:59.83
File ID (519,15,0)   End of file block 272 / Allocated 272

Virtual block number 38 (00000026), 512 (0200) bytes

104688FC 76FFFE76 FF77E88E 07880574 C0080418 08689A50 16F8468D 006A5052 RPj..F%.P.k....åt.¡..Šw.v±.v=.F. 000000
F876FFFA 76FF0677 FF26F45E C458E88E 07880574 C008024A 05D09A00 6A505299 .RPj..Å.J..åt.¡..Š[á^¶&.w..vª.v% 000020
065EC42D EB0C4FFF 26065EC4 0975010E 7E8340E8 8DF28805 74C00800 0002039A ......åt.¡·.Šã.-..u.á^.&.O.Š-á^. 000040
0876FF04 C4830CFF E80E5306 097E000A 7F832606 5EC42074 00127E83 0A4FFF26 &.O..~..t á^.&....-..S.Ö...á..v. 000060
04067E83 D88E0361 881E5600 0002C8C8 C91F00E8 C02804C4 830987E8 0E0676FF .v..Ö...á.+åŠ..èùà...V.¡ø..Ä.-.. 000080
0C740808 7E831274 04087E83 30750206 7E830674 01067E83 0C740806 7E831274 t..~..t..~..t..-..u0.-..t..~..t. 0000A0
08124688 08741046 080E4688 10740C46 080A4688 18750208 7E830674 01087E83 .~..t..~..u..F..F.t..F..F.t..F.. 0000C0
5EC40257 11260701 26125EC4 02578826 0788260E 5EC40107 E980F388 06751446 F.u.¡µ.Ö..á^.&..&.W.á^.&..&.W.á^ 0000E0
88E30102 109F88E3 D1085E88 06571126 04470126 125EC406 57882604 4788260E .&.G.&.W.á^.&.G.&.W..^.ÌD....ÌD. 000100
009EE9FE 468803E8 D8F7047D C008FE46 89022880 8803E6C1 02108488 E6D10676 v.Ìl.Ç..èl...(..F±.ä).%ÄŠ..F±Ö.. 000120
46881974 00024888 8303E6C1 02108488 E6D10676 88E3D102 109F88E3 D1085E88 .^.ÌD....ÌD.v.Ìl.Ç..èl..¡H..t..F 000140
0A76FF0C 76FFFE76 FF16E800 0005779A 1276FF14 76FF0A76 FF0C76FF 500BF7FE ±%ÄP.v..v..v..v..w...Š..v±.v..v. 000160
04478826 0A5EC424 7502087E 83067401 087E8360 E80000FF FF9A1276 FF1476FF .v..v......Š'.-..t..~..uŠá^.&.G. 000180
0A5EC41F EB065711 26044701 26D2D1E0 D1065718 2604472B 26125EC4 06578826 &.W.á^.&+G.&.W.ÌÄÌ@&.G.&.W.Š.á^. 0001A0
5A300FEB 02571126 07012602 D1E0D102 57182607 2B26125E C402578B 26078826 &..&.W.á^.&+.&.W.ÌÄÌ@&..&.W.Š.=Z 0001C0
D88E0488 881E5600 0010C8C8 C95E1F00 EBC02800 E8A27400 8430FF5A E9037500 .u.ÕZ.=Ç.tÅŠ.+åŠ..^èùà...V.¡...Á 0001E0

Dump of file SATURN:[PCCOMMON.DUMP.DLL]BRD.TMP;1 on 18-APR-1990 10:36:59.83
File ID (519,15,0)   End of file block 272 / Allocated 272

Virtual block number 39 (00000027), 512 (0200) bytes

2875020A 7E830674 010A7E83 0C74080A 7E831274 040A7E83 40740846 08064688 .F..F.t@.-..t..-..t..-..t..-..u( 000000
08741046 080E4688 1075020C 7E830674 010C7E83 0C74080C 7E831274 040C7E83 .-..t..-..t..-..t..-..u..F..F.t. 000020
8488E6D1 0A768BE3 D102109F 88E3D10C 5E880120 E980F388 06751446 08124688 .F..F.u.¡µ.Ö ..^.ÌD....ÌD.v.Ìl.Ç 000040
C1FA4688 587D02FA 7E83FA46 FF03E800 00FA46C7 F8468902 28808803 E6C10210 ..èl...(..F%úFª..Š..Fª.-ª.)X.Fªè 000060
11260701 26FC5EC4 02578826 07882612 5EC4FE56 89FC4689 08568806 460303E0 Á..F..V..F=.V±á^.&..&.W.á^=&..&. 000080
76FF1474 00F87E83 06571126 04470126 FC5EC406 57882604 47882612 5EC40257 W.á^.&.G.&.W.á^=&.G.&.W..-%.t..v 0000A0
065EC400 8DE90375 00F87E83 9FE80000 05619AFC 76FFFE76 FF0E76FF 1076FFF8 %.v..v..v±.v=.a...Š..~%.u.Õ..á^. 0000C0
89F44689 02578826 07882620 73084739 26067C35 7F0A5739 26025788 26078826 &..&.W.&9W..5|.&9G.s-&..&.W..F¶. 0000E0
89260847 8926F656 88F44688 065EC402 57892607 89260A57 88260847 8826F656 V-&.G.&.W.&..&.W.á^..F¶.V-&.G.&. 000100
2604478B 262F7604 47392606 7F377C06 5739260E 5788260C 47882606 5EC40A57 W.á^.&.G.&.W.&9W.|7..&9G.v/&.G.& 000120
88F04688 065EC406 57892604 4789260E 5788260C 478826F2 5689F046 89065788 .W..FÞ.V·&.G.&.W.&.G.&.W.á^..FÞ. 000140
5EC4088E 05EC881E 56570000 12C8C8C9 5E1F00EB C02B0E57 89260C47 8926F256 V·&.G.&.W.+åŠ..^èùà...WV.¡$..Áá^ 000160
80003605 C28CC388 065EC41F A5A5A5A5 DA8E1EF0 881E7F8D 001605C2 8CC38806 ..û.ô.......Þ..ÖEEEE.á^..û.ô.6.. 000180
FC46894A 57882648 47882606 5EC40002 F246C71F A5F20008 890A8E1E F088267F .&.Þ..Ö¿..·E.úF·..á^.&.GH&.WJ.F= 0001A0
0375C008 F24EFFF2 4688FE56 89FC4689 4E578826 4C478826 065EC411 EBFE5689 .V±Š.á^.&.GL&.WN.F=.V±.F·.N·.åu. 0001C0
0A589A50 16F4468D FC76FFFE 76FF07F0 09C29A00 6A006AFC 76FFFE76 FF00A8E9 Õ¨..v±.v=j.j..ô.Þ..v±.v=.F¶.P.X. 0001E0
```

```
Dump of file SATURN:[PCCOMMON.DUMP.DLL]BRD.TMP;1 on 18-APR-1990 10:36:59.83
File ID (519,15,0)   End of file block 272 / Allocated 272

Virtual block number 40 (00000028), 512 (0200) bytes

 89EE4689 025788:6 078826F4 5EC466E8 06478826 F45EC400 82E90374 C00803FC •..ât.Õ..á^¶&.G.Şfá^¶&..&.W..FŸ. 000000
 8E028805 74C00800 00FFFF9A 50520016 05016A06 77FF2608 77FF26EE 5EC4F056 Vÿá^Y&.w.&.w.j....RP......ât.|.. 000020
 6A0677FF 260877FF 26F85EC4 FA5689F8 46890257 88260788 26F45EC4 44E850E8 ŞPŞDá^¶&..&.W..F%.V•á^Y&.w.&.w.j 000040
 7E00013D 0C7CC008 10E812E8 1EE88E02 880574C0 080000FF FF9A5052 00140501 ....RP......ât.|..Ş.Ş.Ş..â|.=..~ 000060
 6A881E56 57000046 C8C8C95F 5E1F00E8 C028FF37 E9FF67E9 00E88E74 00023091 .=..t/Ş.Õg.Õ7.+âŞ..^_èüâF..WV.|j 000080
 C05689BE 46890016 05085688 06468804 60E98DF3 88067508 46080646 88D88E07 ..Ã.F..F.u.|µ.Õ'..F..V.....F/.Vå 0000A0
 8E1E0716 F088047E 800C5688 0A468841 740C4608 0A4688CC 568CCA46 89C2468D .Fô.Fô.Vä.F..F.tA.F..V..-å.Þ.... 0000C0
 88084688 C45689C2 46890257 1826072B 268E5EC4 D6568804 46881FA5 A5A5A5DA ÕEEEE..Få.Vøá^/&+.&.W..Fó.Vá.FÄ. 0000E0
 1056880E 46884174 CC4608CA 46884FE8 C85689C6 46890657 18260447 2826DA56 VÕ&+G.&.W..Fó.VàŞO.Fö.FätA.F..V. 000100
 89C45613 C2460302 57882607 88268E5E C41FA5A5 A5A5DA8E 1E0716F0 88C27E8D .~ô.Þ....ÕEEEE.á^/&..&.W..Fó.Vá. 000120
 80E98DF3 8806E8DA 56890846 89C85613 C6460306 57882604 47882606 56890446 Få.Vø&.G.&.W..Fó.Vå.FÁ.VÕŞ.|µ.Õ¯ 000140
 26065EC4 0395E9C0 28057506 47082604 4788260F 75024708 26078826 CA5EC403 .á^ò&..&.G.u.&.G.&.G.u.+áÕ..á^.& 000160
 46805016 04468050 52001605 E65689E4 46890857 88260647 8826CE46 89464788 .GF.Fo&.G.&.W..Fó.V|...RP.Få.P.F 000180
 3A74080E 7E834074 040E7E83 0350E98E 09880675 080E7E83 0000FFFF 9A50160E 8.P......~8.u.|..Õ]..~8.t@.~8.t: 0001A0
 8A0074CE 4638000C 25E42ADE 468A2874 000E7E83 2E74020E 7E833474 010E7E83 .~8.t4.~8.t..~8.t(.F8*ÕX..;Föt.. 0001C0
 FF501604 4680DE46 89000325 DE468806 E8CE4688 0575CE46 38000325 E42ADE46 F8*ÕX..;Föu..FöŞ..F8X...F8.Få.P. 0001E0

Dump of file SATURN:[PCCOMMON.DUMP.DLL]BRD.TMP;1 on 18-APR-1990 10:36:59.83
File ID (519,15,0)   End of file block 272 / Allocated 272

Virtual block number 41 (00000029), 512 (0200) bytes

 26072826 8E5EC4D6 56880446 883674C0 080AC483 0ED2E80E E476FFE6 76FFDE76 v8.v|.v8.Õ8..á..ât6.Få.Vøá^/&+.& 000000
 5EC40657 18260447 28268E5E C4DA5688 08468802 57892607 8926CA5E C402571B .W.á^ò&..&.W..FÅ.VÕá^/&+G.&.W.á^ 000020
 16D0468D 5052FE56 89FC4689 4E578826 4C478826 065EC406 57892604 478926CA ò&.G.&.W.á^.&.GL&.WN.F=.V:RP.FÅ. 000040
 56390256 88D04688 00E25683 01E04683 08E8E046 89E24689 C0280A93 00F09A50 P.Þ...+â.Fã.FÅŞ..FÅ..Vã..FÅ.V@9V 000060
 5016E846 80006AE0 76FFE276 FFFC76FF FE76FF7A 73E04639 057C0081 E9037EE2 â-.Õ..|.9FÅsz.v:.v=.vã.vÅj..FÕ.P 000080
 5052BC56 898A4689 02578826 0788268F E8027401 067F8326 E85EC408 1208689A .k...á^Õ&....t.Ş¢&..&.W..Fa.V¥RP 0000A0
 0477FF26 E85EC400 6A006A06 77FF2608 77FF268A 5EC406C4 830B7710 A19A016A j..Å.w..á.á^a&.w.&.w.j.j.á^Õ&.w. 0000C0
 C7268A5E C41FA5A5 A5A51F16 1E04768D 087F8DE8 5EC40000 08D89A50 16044680 .FÅ.P.Å...á^Õ....vå...EEEE.á^a&ú 0000E0
 9A501600 46805052 FE5689FC 46894A57 88264847 8826065E C4FF69E9 00013847 G8..Õ|.á^.&.GH&.WJ.F=.V:RP.FÅ.P. 000100
 7EE25639 025688D0 468800E2 568301E0 468308E8 E04689E2 4689C028 085400F0 Þ.T.+â.Fã.FÅŞ..FÅ..Vã..FÅ.V@9Vã- 000120
 16E8468D 006AE076 FFE276FF FC76FFFE 76FF0149 E90372E0 4639087C 0153E903 .ÕS.|.9FÅr.Õ|..v:.v=.vã.vÅj..FÕ. 000140
 8C56898A 46890257 88260788 26E85EC4 0113E906 478826E8 5EC407E0 08689A50 P.k.Å.á^Õ&.G.Õ..á^Õ&..&.W..Fa.V¥ 000160
 88268A5E C4F25689 F0468900 0805EA56 88E84688 06C4830C 0810A19A 006A5052 RPj..Å....á..FÕ.Võ....FÞ.V·á^a&. 000180
 FFCC76FF F076FFF2 76FFDC46 89044788 26E85EC4 EE5689EC 46890857 88260647 G.&.W..Få.VŸá^Õ&.G..FÉ.v·.vÞ.vã. 0001A0
 76FF006A 006AEC76 FFEE76FF 10C483F8 C0E80ECE 76FFDE76 FF501604 4680CA76 vò.Få.P.v8.vo.Õá%.á..vŸ.v$j.j..v 0001C0
 93E90001 3647C726 8A5EC400 013847C7 268A5EC4 0000FFFF 9AF076FF F276FFDC É.v·.vÞ.....á^a&úG8..á^a&úG6..Õ. 0001E0

Dump of file SATURN:[PCCOMMON.DUMP.DLL]BRD.TMP;1 on 18-APR-1990 10:36:59.83
File ID (519,15,0)   End of file block 272 / Allocated 272

Virtual block num :r 42 (0000002A), 512 (0200) bytes

 F45EC406 C48302C2 10A19A02 6A5052F6 5689F446 89025788 26078826 E85EC400 .á^Õ&..&.W..F¶.V-RPj..Å.ò..á.á^¶ 000000
 FF5052F2 5689F046 89000805 EA5688E8 4688FA56 89F84689 08578826 06478826 &.G.&.W..F%.V•.FÕ.Võ....FÞ.V·RP. 000020
 F276FFF8 76FFFA76 FF10C483 F830E80E CE76FFDE 76FF5016 D4468DCA 76FFCC76 vä.vò.Få.P.v8.vö.Õ=%.á..v•.v%.v· 000040
 E8000130 47C726F4 5EC40000 FFFF9ADE 76FFF876 FFFA76FF 0000FFFF 9AF076FF .vÞ......v•.v%.v8.....á^¶&úGÕ..Ş 000060
 75000A7F 8326065E C4FE97E9 00E8FF6F E9037500 0230FEE6 E90375C0 0811E813 .Ş..âu.Õ|±=..u.Õo.Ş.Õ.±á^.&....u 000080
 003605C2 8CC388CE 76FFDE76 FF501604 4680CA76 FFCC76FF 2174000C 7F832607 .&....t!.vä.vò.Få.P.v8.vö.û.ò.6. 0000A0
 0E468806 5EC41FA5 A5A5A51F 161ED476 8D167F8D 065EC410 C483F92F E80E5052 RP.Õ/•.6.á^.....vå...EEEE.á^..F8 0000C0
 00010092 87C726E4 5EC40001 6847C726 065EC400 016647C7 26065EC4 46478926 &.GFá^.&úGf..á^.&úGh..á^Õ&ú..... 0000E0
 8E088F88 1E560000 16C8C8C9 5F5E1F00 E8C02804 C4830104 E80E0676 FF0876FF .v..v..Õ...á.+âŞ..^_èüâ...V.|... 000100
 9A5016EE 46800676 FF0876FF 0006E98D F3880675 08460806 46880000 F246C7D8 Åüf·...F..F.u.|µ.Õø..v..v..FŸ.P. 000120
 7EF65639 F05688EE 468800F6 568301F4 468308E8 F44689F6 4689C028 007400F0 Þ.t.+â.F-.F¶Ş..F¶..V-..FŸ.VÞ9V-- 000140
 16F8468D 006AF476 FFF676FF 0676FF08 76FF0098 E90372F4 4639087C 00A2E903 .ÕÅ.|.9F¶r.Õ...v..v..v-.v¶j..F%. 000160
 26EC5689 EA468902 57882607 8826F85E C461E806 478826F8 5EC40A54 08689A50 P.k.T.á^Y&.G.Şøá^Y&..&.W..Fõ.V$& 000180
 EC5689EA 46890257 88260788 26F85EC4 50E8FFFF 1240C726 EA5EC4E6 D1047788 .w.||á^õ&úa...ŞPá^Y&..&.W..Fõ.V$ 0001A0
 89FC4689 02578826`J78826F8 5EC42EE8 12408926 F24688EA 5EC4E6D1 04778826 &.w.||á^õ.F·&.a.Ş.á^Y&..&.W..F=. 0001C0
 00E80474 00023096 7400013D 8C74C008 10E812E8 0E478926 F24688FC 5EC4FE56 V±á^=.F·&.G.Ş.Ş..âtŸ=..t.=..tâŞ. 0001E0
```

```
Dump of file SATURN:[PCCOMMON.DUMP.DLL]BRD.TMP;1 on 18-APR-1990 10:36:59.83
File ID (519,15,0)   End of file block 272 / Allocated 272

Virtual block number 43 (0000002B), 512 (0200) bytes

47882606 5EC4D88E 000D881E 56570000 28C8C8C9 5E1F00E8 C028FF48 E9F246FF .F.ÕH.+âŠ..^èùà(..WV.|...Äé^.&.G 000000
88E44689 46478826 FE5689FC 46890036 05C28CC3 88F45689 F2468904 57882602 .&.W..F..V¶.û.ô.6..F•.V±&.GF.Fô. 000020
F05689EE 4689C05E 05F45688 F24688F6 46890A47 8826E256 89E04689 001605C3 û....FÅ.Vâ&.G..F-.F..V¶.^..FŸ.Vþ 000040
88E67E8D E25688E0 46880E56 89DC4689 000E05C2 8CC38800 89E9037C 01F67E83 .—.|.Õ...ù.ô....FÉ.V8.FÅ.Vã.-|. 000060
5611EA46 01065788 26044788 26DC5EC4 4AE8E446 881FA5A5 A5A5DA8E 1E0716F0 Þ....ÖEÈÈÈ..FôŠJé^É&.G.&.W..Fõ.V 000080
02578826 0788260C 5EC43AE8 EC5619EA 46290657 88260447 88260C5E C44DE8EC &ŠMé^É&.G.&.W.)Fõ.V&Š:é^É&..&.W. 0000A0
30C47400 013D16E8 E85619E6 46290257 88260788 260C5EC4 28E8E856 11E64601 .F|.VÕŠ(é^É&..&.W.)F|.VÕŠ.=..té= 0000C0
6A006A48 77FF264A 77FF2606 5EC433E8 00E8C874 0008300F 74000430 AC740002 ..t¯=..tÕ=..tâŠ.Š3é^.&.wJ&.wHj.j 0000E0
DA8E1E07 16F088E6 7E800008 05FA5688 F8468800 3208689A 5016F846 8D006A00 .j..F%.P.k.2..F%.V°....-|.Þ....Õ 000100
5EC46675 02E47E83 067401E4 7E83000C E9037C02 0A7F8326 065EC41F A5A5A5A5 ÈÈÈÈ.é^.&....|.ÕÉ..-õ.t..-õ.ufé^ 000120
26E05EC4 02578926 078926FC 5EC40257 18260728 26EE5EC4 02578826 078826E0 Å&..&.W.é^Ÿ&+.&.W.é^•&..&.W.é^Å& 000140
26EE5EC4 02578826 078826E0 5EC40657 89260447 8926FC5E C4065788 26044788 .G.&.W.é^•&.G.&.W.é^Å&..&.W.é^Ÿ& 000160
89260C47 8926EC56 88EA4688 FC5EC40A 57892608 478926FC 5EC40257 13260703 ..&.W.é^•&.G.&.W.é^•.Fõ.V&&.G.&. 000180
26044788 26E05EC4 02578926 078926FC 5EC40257 88260788 26E05EC4 67E80E57 W.Šgé^Å&..&.W.é^•&..&.W.é^Å&.G.& 0001A0
88E64688 FC5EC406 57892604 478926FC 5EC40657 18260447 2826EE5E C4065788 .W.é^Ÿ&+G.&.W.é^•&.G.&.W.é^•.F|. 0001C0
06571326 04470326 EE5EC406 57882604 478826E0 5EC40A57 89260847 8926E856 VÕ&.G.&.W.é^Å&.G.&.W.é^Ÿ&.G.&.W. 0001E0

Dump of file SATURN:[PCCOMMON.DUMP.DLL]BRD.TMP;1 on 18-APR-1990 10:36:59.83
File ID (519,15,0)   End of file block 272 / Allocated 272

Virtual block number 44 (0000002C), 512 (0200) bytes

8D016A00 6A006A48 77FF264A 77FF2606 5EC400D5 E90E5789 260C4789 26FC5EC4 é^•&.G.&.W.Õ(.é^.&.wJ&.wHj.j.j.. 000000
7E830674 01E47E83 0E56890C 46890008 05FA5688 F846880E F808689A 5016F846 F%.P.k.«..F%.V°....FÉ.V8.-õ.t..- 000020
C4065788 26044788 26E05EC4 02578926 078926E8 5688E646 88FC5EC4 537502E4 õ.uSé^•.F|.VÕ&..&.W.é^Å&.G.&.W.é 000040
C40A5789 26084789 26FC5EC4 02578826 0788260C 5EC40657 89260447 8926FC5E ^•&.G.&.W.é^É&..&.W.é^•&.G.&.W.é 000060
57882607 8826E05E C44CE80E 5789260C 478926FC 5EC40657 88260447 88260C5E ^É&.G.&.W.é^•&.G.&.W.ŠLé^Å&..&.W 000080
57892604 478926FC 5EC40657 88260447 88260C5E C4025789 26078926 FC5EC402 .é^•&..&.W.é^É&.G.&.W.é^•&.G.&.W 0000A0
260C4789 26EC5688 EA4688FC 5EC40A57 89260847 8926E856 88E64688 FC5EC406 .é^•.F|.VÕ&.G.&.W.é^•.Fõ.V&&.G.& 0000C0
88260788 262D73 3 47392606 7C357F0A 57392602 57882607 8826FC5E C40E5789 .W.é^•&..&.W.&9W..S|.&9G.s-&..&. 0000E0
0E5688DC 4688FC.. C4025789 26078926 0A578826 08478826 DE56890C 46890257 W..FÉ.V8&.G.&.W.&..&.W.é^•.FÉ.V8 000100
76044739 26067F37 7C065739 260E5788 260C4788 26FC5EC4 0A578926 08478926 &.G.&.W.é^•&.G.&.W.&9W.|7..&9G.v 000120
C4065789 26044789 260E5788 260C4788 260A5689 08468906 57882604 4788262F /&.G.&.W..FÅ.VÕ&.G.&.W.&.G.&.W.é 000140
881E5600 0048C8C8 C95F5E1F 00E8C028 0E578926 0C478926 DA5688D8 4688FC5E ^•.FÅ.VÕ&.G.&.W.+âŠ..^ èùàH..V.| 000160
000E05C3 888E5689 8C468900 1605C28C C388C446 89464788 26065EC4 D88E0E06 ...Äé^.&.GF.Fé.û.ô....FŸ.V/.û... 000180
894A5788 26484788 26CC5689 CA468900 5E050457 88260247 8826C256 89C04689 .Fâ.VÕ&.G.&.W..^..Fò.V&&.GH&.WJ. 0001A0
CA5EC41C 7502C47E 83067401 C47E8312 3E00F09A 5016C646 8D5052FE 5689FC46 F•.V±RP.Fó.P.Þ.>..-é.t..-é.u.é^ò 0001C0
04478826 CA5EC418 E8D65689 D446890A 56890846 890201E0 D1025788 26078826 &..&.W.ÌÅ1•.FÅ.VÕ.Fâ.V•Š.é^ò&.G. 0001E0

Dump of file SATURN:[PCCOMMON.DUMP.DLL]BRD.TMP;1 on 18-APR-1990 10:36:59.83
File ID (519,15,0)   End of file block 272 / Allocated 272

Virtual block number 45 (0000002D), 512 (0200) bytes

468308E8 E04689E2 4689C028 D6568904 46890A56 89084689 02D1E001 06578826 &.W.ÌÅ1•.FÅ.VÕ.Fâ.V•+ô.Fã.FÅŠ..F 000000
76FFFC76 FFFE76FF 7373E046 39057C7A 7FE25639 C85688C6 468800E2 568301E0 Å..Vã..Fó.Vâ9Vâ.z|.9FÅss.V±.V•.v 000020
26078826 C2E80274 02067F83 26E85EC4 14360868 9A5016E8 4680006A E076FFE2 â.vÅj..FÒ.P.k.6.é^ò&....t.Šò&..& 000040
46880000 FFFF9A50 16CE4680 0677FF26 0877FF26 F45EC4F6 5689F446 89025788 .W..F¶.V-é^¶&.w.&.w..Fö.P......F 000060
13084603 D05688CE 46881276 D4463805 7F197CD6 563BDA56 13084603 D05688CE õ.VÅ.FÅ.VÕ;V•|...;Fâv..Fö.VÅ.FÅ. 000080
DE56890C 468912D2 00609AC6 76FFC876 FF026A00 6AFF73E9 D6568904 46890A56 VÕ.Fâ.V•Õs.j.j..vâ.vó.'.•..FÉ.V8 0000A0
9AD476FF D676FF37 FF260277 FF26CA5E C4009AE9 037402C4 7E830974 01C47E83 .-é.t..-é.t.Õ..é^ò&.w.&.7.v•.vâ. 0000C0
FF26CA5E C444EBD6 5688D446 880874C0 08C02802 E8000188 0575D008 12F80130 0.«..Åu.|..Š.+â.ât..Fâ.V•ŠDé^ò&. 0000E0
9ADC8808 EC831312 06C79A13 0802C39A CA5EC413 03028F9A D45E8D37 FF260277 w.&.7.^â.e...é^ò.û....û....â..É. 000100
89134000 FC9A5052 132004A6 9A132602 569AD888 08C48313 2107CE9A 131703EF ÿ....ö.|..é..Å.V.&..|.-.RP.•.a.. 000120
F218C828 02778826 0F88268C 5EC4136D 00FC9ADC 76FFDE76 FF505206 56890446 Fâ.V•RP.v8.vÉ.•.m.é^¥&..&.w.+à.· 000140
08138C01 309AD476 FFD676FF 0477FF26 0677FF26 CA5EC400 90E9E676 89E44E89 .NÕ.v|Õ..é^ò&.w.&.w..v•.vâ.0.... 000160
5EC41397 028F9AD4 5E8D48E8 D65688D4 46880874 C008C028 02E80001 88057500 Åu.|..Š.+â.ât..Fâ.V•ŠH.^â.e...é^ 000180
08C48313 8507CE9A 13A803EF 9ADC8808 EC8313A6 06C79A13 9C02C39A 045F8DCA ò._..û....û.|..â..É.ÿ.¨..ö.ç..é. 0001A0
4689130F 00FC9A04 77FF2606 77FF26CA 5EC45052 13CC04A6 9A138A02 569AD888 .Å¯V.o..|.ä.RPé^ò&.w.&.w..•.Õ..F 0001C0
F218C828 06778826 044F8826 8C5EC4FF FF00FC9A DC76FFDE 76FF5052 D6568904 â.V•RP.v8.vÉ.•...é^¥&.O.&.w.+à.· 0001E0
```

Dump of file SATURN:[PCCOMMON.DUMP.DLL]BRD.TMP;1 on 18-APR-1990 10:36:59.83
File ID (519,15,0)   End of file block 272 / Allocated 272

Virtual block number 46 (0000002E), 512 (0200) bytes

```
5639C856 88C64686 00E25683 01E04683 08E8E046 89E24689 C028E676 89E44E89 .N8.vl+à.Fã.FÅS..FÅ..Vã..F6.Vè9V 000000
4680006A E076FFE2 76FFFC76 FFFE76FF 0250E903 72E04639 087C0267 E9037EE2 â-.Ög.|.9FÅr.Ö1..v±.v=.vã.vÅj..F 000020
F05EC400 CCE9C446 88F25689 F0468900 0805EA56 88E84688 10170868 9A5016E8 Ö.P.k....FÖ.Vö....FÞ.V·.F6Öa.6^Þ 000040
26044703 26C05EC4 06578826 04478826 8C5EC402 57892607 8926E656 88E44688 .Fö.VI&..&.W.6^W&.G.&.W.6^å&.G.& 000060
57892607 8926E656 88E44688 F05EC400 84E90657 89260447 8926F05E C4065713 .W.6^Þ&.G.&.W.ÖÇ.6^Þ.Fö.VI&..&.W 000080
89260447 8926F05E C406571B 2604472B 26C05EC4 06578826 04478826 8C5EC402 .6^W&.G.&.W.6^å&+G.&.W.6^Þ&.G.&. 0000A0
26078926 F05EC402 57132607 0326C05E C4025788 26078826 8C5EC400 80E90657 W.Ö..6^W&..&.W.6^å&..&.W.6^Þ&..& 0000C0
02578826 0788268C 5EC44FE8 06578926 04478926 E65688E4 4688F05E C4025789 .W.6^Þ.Fö.VI&.G.&.W.$O6^W&..&.W. 0000E0
478926E6 5688E446 88F05EC4 02578926 078926F0 5EC40257 1826072B 26C05EC4 6^å&+.&.W.6^Þ&..&.W.6^Þ.Fö.VI&.G 000100
08308874 00043DFF 24E90375 00023DFF 60E90375 0001301C E81EE806 57892604 .&.W.$.$.=..u.Ö`.=..u.Ö$.=..t¡=. 000120
C48A5689 88468902 57882607 8826E85E C4000BE9 06478826 E85EC400 E8827400 .t.$.6^Ö&.G.ÖU.6^Ö&..&.W..F¡.Voá 000140
8876FF8A 76FFD246 89044788 26E85EC4 EE5689EC 46890857 88260647 8826885E ^¡&.G.&.W..F$.VŸ6^Ö&.G..F0.vo.v¡ 000160
0AD69AF0 76FFF276 FFD276FF 006A006A EC76FFEE 76FF06C4 830AB510 A19A006A j..Å.ç..6..vŸ.v$j.j..v0.v·.vÞ.ø. 000180
47C72688 5EC40001 3847C726 885EC412 408926E0 46888B5E C4E6D102 76880000 ...v0ÌÌ6^¡.FÅ&.ə.6^¡&úG8..6^¡&úG 0001A0
08578826 06478826 F45EC4F6 5689F446 89025788 26078826 E85EC473 E8000136 6..$s6^Ö&..&.W..F¶.V-6^¶&.G.&.W. 0001C0
549AF076 FFF276FF F876FFFA 76FF06C4 8316ED10 A19A026A 5306FA56 89F84689 .F½.V°.Sj..À.Ú..6..v°.v½.v·.vÞ.T 0001E0
```

Dump of file SATURN:[PCCOMMON.DUMP.DLL]BRD.TMP;1 on 18-APR-1990 10:36:59.83
File ID (519,15,0)   End of file block 272 / Allocated 272

Virtual block number 47 (0000002F), 512 (0200) bytes

```
C40E4789 26E04688 F45EC400 000C629A 4677FF26 065EC4F8 76FFFA76 FF00000C ....v°.v½6^.&.wF.b...6^¶.FÅ&.G.6 000000
FFC876FF 026A006A 00E88F74 00023DFF 1EE90375 C0080EE8 00013047 C726F45E ^¶&úG0..$..àu.Ö..=..t.$.j.j..và. 000020
8300012D DE56880C 46882874 C008C028 02E80001 88057500 0812A801 309AC676 vö.0.`..Åu.¡..$.+à.ât(.FÉ.V8-... 000040
46880CE8 E65611E4 46010201 E0010656 88D44688 1275E256 381775E0 463B000A Ö.;FÅu.;Väu..FÅ.V0ÌÅI0.Fö.VI$..F 000060
5052FE56 89FC4689 4E578826 4C478826 065EC4FD 83E9E656 11E44601 D65688D4 Å.V0.Fö.VIÖ.=6^.&.GL&.WN.F=.V±RP 000080
88C64688 00E25683 01E04683 08E8E046 89E24689 C0281604 00F09A50 16C6468D .F6.P.Þ.Å.+à.Fã.FÅS..FÅ..Vã..F6. 0000A0
16E8468D 006AE076 FFE276FF FC76FFFE 76FF3F73 E0463905 7C467FE2 5639C856 Vè9Vã.F|.9FÅs?.v±.v=.vã.vÅj..FÖ. 0000C0
83157510 A19A016A 50528A56 89884689 02578826 078826E8 5EC4118F 08689A50 P.k.¢.6^Ö&..&.W..F¡.VoRPj..Å.u.. 0000E0
8E117088 1E565700 0016C8C8 C95E1F00 E8C028A7 E8000138 47C72688 5EC406C4 6.6^¡&úG8..$Ì+à$..^èùà...WV.¡p.. 000100
107E830C 7F020E7E 83127C00 0E7E8318 740C4608 0A468820 74084608 06468808 Å.F..F.t .F..F.t..~..|..~.....~. 000120
C7077FFF 127E83FA 46890A47 88260656 C4018AE9 80F38806 7401107E 830C7400 .t..~..t.¡m.Ö..6^.&.G..F°.~....ú 000140
47882606 5EC4015F E98E0A88 0675010E 7E83067F 124639FA 468814E8 00001246 F...$..F°9F....~..u.¡..Ö_.6^.&.G 000160
8E1EF088 267F8000 3605C28C C3881575 00667F83 26F85689 F6468904 57882602 .&.W..F-.V½&..f.u..ü.6.6...&.Þ.. 000180
0674C008 0000FFFF 9A5016FC 4680106A 0E6A0677 FF26F65E C41FA5F2 0008890A Ö¿..·Ë.6^-&.w.j.j..F=.P......ât. 0001A0
03E8C028 0475020E 7E830257 89260789 260C5688 0A4688FC 5EC40113 E980F288 ¡·.Ö..6^=.F..V.&..&.W..~..u.+à$. 0001C0
0C56880A 46887F75 010E7E83 06478926 0E4688FC 5EC40447 8926FC5E C4104688 .F.6^=&.G.6^=.F.&.G..~..u..F..V. 0001E0
```

Dump of file SATURN:[PCCOMMON.DUMP.DLL]BRD.TMP;1 on 18-APR-1990 10:36:59.83
File ID (519,15,0)   End of file block 272 / Allocated 272

Virtual block number 48 (00000030), 512 (0200) bytes

```
9AFC76FF FE76FF00 6A016A00 6A006A4C 77FF264E 77FF2606 5EC4F056 89EE4689 .FŸ.VÞ6^.&.wN&.wLj.j.j.j..v±.v=. 000000
77FF26EE 5EC4EC56 89EA4689 00160508 56880646 880C47FF 26065EC4 16980290 ....6^.&.G..F..V.....Fö.V&6^Ÿ&.w 000020
FF1240C7 26EE5EC4 E6011076 88000015 8E9A5052 1076FF00 6A006A06 77FF2608 .&.w.j.j..v.RP......v.ÌÌ6^Ÿ&úə.. 000040
4A77FF26 065EC434 E81FA5A5 A5A5DA8E 1EF08808 7F80EC56 88EA4688 FC. ^C4FF .6^=.Fö.V$....Þ..ÖEEEE.$46^.&.wJ 000060
0A47FF26 065EC418 1202909A FC76FFFE 76FF006A 006A5052 99124688 4877 ^26 &.wN.F..RPj.j..v±.v=.....6^.&.G. 000080
47882606 5EC404C4 83F557E8 0E0676FF 0876FF04 C483F8CF E80E0676 FF087.FF .v..v..ÖuM.6..v..v..ÖuM.6.6^.&.G 0000A0
1CC8C8C9 5F5E1F00 E8C02800 01009287 C726F25E C4F45689 F2468908 57882606 .&.W..F·.V¶6^·&ú.....+àS..^_èùà. 0000C0
7E830C74 080A7E83 1274040A 7E832074 08460806 4688D88E 1700881E 56570000 ..WV.¡...Å.F..F.t .~..t..~..t..~ 0000E0
005E0508 56880646 88018EE9 C0280575 0E46080C 46880875 020A7E83 0674010A ..t..~..u..F..F.u.+àÖ...F..V..^. 000100
7C0E7F00 067F8326 1575003F 8326067C 107F0002 7F8326EC 5EC4EE56 89EC4689 .F$.VŸ6^$&......|.&.?.u.&......| 000120
A5A5A5DA 8E1E0716 F088E47E 800E5688 0C468801 58E9C028 05750004 7F832607 .&....u.+àÖX..F..V..-Ö.Þ....ÖEEE 000140
26078826 EE468E1F A5F20008 890A8E1E F088F07E 80001605 08568806 46881FA5 É..F..V.....~Þ.Þ..Ö¿..·É..FŸ&..& 000160
46290257 88260788 26F65611 F4460106 57882604 478826F2 5611F046 01025788 .W..FÞ.V·&.G.&.W..F¶.V-&..&.W.)F 000180
83265975 020A7E83 0674010A 7E83FE56 19FC4629 06578826 04478826 FA5619F8 ½.V°&.G.&.W.)F=.V±.~..t..~..uŸ&. 0001A0
3926057C 167F0257 3926F256 88F04688 0C5EC44A 74003F83 26067F52 7C00027F ...|R..&.?.tJ6^..FÞ.V·&9W...|.&9 0001C0
7C025739 26FA5688 F846880C 5EC423E8 02578926 078926F2 5688F046 880F7307 .s..FÞ.V·&..&.W.$#6^..F½.V°&9W.| 0001E0
```

```
Dump of file SATURN:[PCCOMMON.DUMP.DLL]BRD.TMP;1 on 18-APR-1990 10:36:59.83
File ID (519,15,0)   End of file block 272 / Allocated 272

Virtual block number 49 (00000031), 512 (0200) bytes

7C00067F 8326EC5E C45FEB02 57B92607 8926FA56 8BF84688 00760739 26057F14 ...&9.v..F%.V*&..&.W.$_&^$&....| 000000
73044739 26067C18 7F065739 26F6568B F44688OC 5EC44C74 00047F83 26077F55 U..&....tL&^..F¶.V-&9W...|.&9G.s 000020
167C0657 3926FF56 8BFC468B 0C5EC425 EB065789 26044789 26F6568B F4468B10 ..F¶.V-&.G.&.W.SX&^..F=.V±&9W.|. 000040
26E6568B E44688OF 5EC40657 89260447 8926FE56 8BFC4688 0E760447 3926067F ..&9G.v..F=.V±&.G.&.W.&^..F6.V|& 000060
EB0001B8 05740657 39260675 04473926 EA5688E8 46881275 02573926 18750739 9.u.&9W.u..FÒ.Võ&9G.u.&9W.t.|..$ 000080
080E4688 08740846 08064688 D8BE18D6 B81E0000 0CC8CBC9 5F5E1F00 EBC02B02 .+äS..^_èùà....|ø..Ä.F..F.t..F.. 0000A0
0676FF08 76FF0096 E98DF38B FFFF07C7 260E5EC4 08741046 080E4688 16751046 F.u..F..F.t.&^.&ú...|µ.Õ...v..v. 0000C0
FFFF07C7 260E5EC4 0C7301FC 7E83067C 147F00FE 7E8318 2E 00F09A50 16FC4680 .F=.P.Þ....-±...|..-=.s.&^.&ú... 0000E0
7FF65639 FE5688FC 468800F6 568301F4 468308E8 F44689F6 4689C02B 6CE8C02B +äS|+&.F-.F¶S..F¶..V-..F=.V±9V-. 000100
1887086B 9A5016FB 4680006A F476FFF6 76FF0676 FF0876FF 3C73F446 39057C43 C|.9F¶s<.v..v..v-.v¶j..F%.P.k... 000120
0001B807 8926F446 880E5EC4 0E750257 39261475 0739260C 5688OA46 8BF85EC4 &^%.F..V.&9.u.&9W.u.&^..F¶&..|.. 000140
000201E7 000415EF 02030012 90CBC91F 00EBC02B FFFF07C7 260E5EC4 AAEB0EE8 S.S`&^.&ú...+äS..èù.....ÿ...Ô... 000160
00020000 00070326 000201FA 0004126A 02030000 00051500 00020000 0003017A z.......ï.......j...•...&....... 000180
0002020E 00041601 02030014 000317A8 0203008A 0004183F 02030000 00080276 v.......?....................... 0001A0
02030000 00141AD8 0002021E 00040857 02030022 00030431 02030000 000C005D ].......1...".. W........Ä....... 0001C0
020300CC 00040825 02030000 00191AA0 00020000 00171635 00020033 0004068E ƒ...3...5...............X...ä... 0001E0

Dump of file SATURN:[PCCOMMON.DUMP.DLL]BRD.TMP;1 on 18-APR-1990 10:36:59.83
File ID (519,15,0)   End of file block 272 / Allocated 272

Virtual block number 50 (00000032), 512 (0200) bytes

080A4688 D88EFFFF 881E5657 00001AC8 00000000 00000000 00000050 00040994 ....P...........à...WV.|...Ä.F.. 000000
76FF0789 26024789 26C02806 5EC4014B E980F388 06750846 08064688 08740C46 F.t..F..F.u.|µ.ÕK.&^.+à&.G.&...v 000020
F1880675 0008F656 89F44689 FE5688FC 46880000 FFFF9A50 16FC4680 0A76FF0C ..v..F=.P......F=.V±.F¶.V-.Äu.|Þ 000040
74C00800 00FFFF9A 5016E646 8D3E6A0E 6A50F246 89064788 26F45EC4 0119E980 .Õ..&^¶&.G..F·Pj.j>.F|.P......åt 000060
50520026 05C28CC3 8BF276FF A5F2001F B902688E F888E65E C400F6E9 8DF28806 .|·.Õ-.&^|.«/h.¿...É.v·.û.ô.&.RP 000080
F276FF00 C0E98E02 88000000 D89AE676 FFE876FF F276FF14 74C00800 CC00009A ...ä..åt..v·.vÒ.v|.Ä...|..Õå..v· 0000A0
76FF0157 00689A26 77FF2628 77FF26E6 5EC42474 C0080000 FFFF9A50 16F84680 .F%.P......åt$&^|&.w(&.w&.h.W..v 0000C0
EE4689F0 4689EA46 89EC4689 C028008B E98E0288 0000FFFF 9AE676FF E876FFF2 ·.vÒ.v|.....|..Õ..+à.F&.Fõ.FÞ.FŸ 0000E0
80016A00 6A006AF8 76FFFA76 FF000001 159A5016 EA468050 5050F876 FFFA76FF .v*.v%PPP.Fõ.P......v*.v%j.j.j.. 000100
FB4688E6 5EC40457 89260247 8926F656 8BF44688 E65EC400 00FFFF9A 5016EA46 Fõ.P.....&^|.F¶.V-&.G.&.W.&^|.F% 000120
76FF006A 016A006A 006A1477 FF261677 FF26F45E C4085789 26064789 26FA5688 .V*&.G.&.W.&^¶&.w.&.w.j.j.j.j..v 000140
5F5E1F00 EBC02802 57392607 8926E856 88E6468B 065EC4FF FF02909A E676FFE8 Ò.v|.....&^..F|.VÒ&..&.W.+äS..^_ 000160
08468800 EFE98DF3 8806750A 46080846 88088E00 08881E56 000012C8 0·.^CAC9 èò..à...V.|...Ä.F..F.u.|µ.Õÿ..F. 000180
3F8326F8 5EC4FA56 89F84689 04578826 02478826 F45EC4F6 5689F446 890·`688 .V..F¶.V-&^¶&.G.&.W..F%.V*&^%&.? 0001A0
83000134 47C726F4 5EC40086 E906C483 00ACE80E F476FFF6 76FF0676 FF13/502 .u..v..v-.v¶.Ò`..&.ÕÑ.&^¶&ûG4... 0001C0
26F45EC4 01FF09C2 9A006A00 6A2677FF 262877FF 26F45EC4 0083E903 7500067E ~..u.Õ..&^¶&.w(&.w&j.j..ò...&^¶& 0001E0

Dump of file SATURN:[PCCOMMON.DUMP.DLL]BRD.TMP;1 on 18-APR-1990 10:36:59.83
File ID (519,15,0)   End of file block 272 / Allocated 272

Virtual block number 51 (00000033), 512 (0200) bytes

FFFF0404 9AFC76FF FE76FF0D 75C00800 930A589A 5016FC46 8D2677FF 262877FF .w(&.w&.F=.P.X....åα..v±.v=..... 000000
260A4088 26F45EC4 02E6C1EE 7688397F 01EE7E83 EE46FF03 EB0000EE 46C7DAEB SÒúFŸ..S..FŸ.-Ÿ..9.vŸè|.&^¶&.∂.& 000020
FFF276FF 0074C008 04C4830F 6AE80E50 F276FF1C 74D00BF2 5689F046 890C5088 .P..FÞ.V·.Ät..v·P.Òj..&..åt..v·. 000040
0808C483 FFFF044A 9AF876FF FA76FF08 76FF0A76 FFBEEBFF FF01659A 006AF076 vÞj..e...$ƒ.v..v..v*.v%.J....&.. 000060
0E468808 8E017BB8 1E560000 14C80006 CAC95E1F 00EBC02B 04EB8E07 B80574C0 åt.|...S.+äS..^èò..à...V.|(..Ä.F. 000080
8800FEE9 8DF38806 7401067E 830C7400 067E830C 740C4608 0A468B14 74104608 .F.t..F..F.t..-..t..-..t.|µ.Õ±.. 0000A0
88260247 8826F05E C4F65689 F446890C 56880A46 8BF25689 F0468910 56880E46 F..V..FÞ.V·.F..V..F¶.V-&^Þ&.G.&. 0000C0
26F45EC4 1C750034 7F8326FE 5689FC46 89000A05 C28CC388 FA5689F8 46890457 W..F%.V*.û.ò....F=.V±&..4.u.&^¶& 0000E0
5E88009F E98E0088 06740240 08260088 26FC76C4 02E3C106 5E881275 00647F83 ..d.u..^.èD.åv=&..&.∂.t.|..Õ...^ 000100
3F8326F0 5EC40676 FF0876FF 02508926 0089260C 56880A46 8BFC76C4 02E3C106 .èD.åv=.F..V.&..&.P..v..v.&^Þ&.? 000120
080EC483 FFFF1705 9AF476FF F676FF0E 76FF1076 FF500001 B803EBC0 28047503 .u.+äS.|..P.v..v..v-.v¶......&.. 000140
1E9A5016 EC46800E 76FF1076 FF1477FF 261677FF 26F85EC4 55E88E00 B80574C0 åt.|..Sùá^¥&.w.&.w..v..v..F&.P.. 000160
EC76FFEE 76FF1477 FF261677 FF26F85E C41874FF EE7E8306 75FFEC7E 83039509 ....-$.u..-Ÿ.t.&^¥&.w.&.w..vŸ.v$ 000180
C95E1F00 EBC02800 013847C7 26F05EC4 00016647 C726F45E C401EA05 D09A006A j..Å.õ.&^¶&ûGƒ..&^Þ&ûG8..+äS..^è 0001A0
01067E83 0C740006 7E830C74 0A460808 468BD08E 0289881E 5600000C C8000CCA ò..à...V.|...Ä.F..F.t..-..t..-.. 0001C0
000A05F4 460302E0 C1064688 F65689F4 46890A56 88084688 0000E980 F3880674 t.|µ.ÒÄ..F..V..F¶.V-.F.èÄ..F¶... 0001E0
```

```
Dump of file SATURN:[PCCOMMON.DUMP.DLL]BRD.TMP;1 on 18-APR-1990 10:36:59.83
File ID (519,15,0)   End of file block 272 / Allocated 272

Virtual block number 52 (00000034), 512 (0200) bytes

 47082607 8826F85E C4FE5689 FC468900 1205F446 03E0D106 4688FA56 89F84689 .F½.V°.F.¹Å.F¶....F•.V±á^¥£..&.G 000000
 033F8326 F45EC437 FF26FC5E C4016A00 87E98E00 88FFFF07 C726FC5E C40E7502 .u.á^•&ú...¡..Õ..j.á^•&.7á^¶&.?. 000020
 83034A03 5B9A37FF 260277FF 26F85EC4 0876FF0A 76FF5000 01B803E8 C0280475 u.+àS.¡..P.v..v.á^¥£.w.&.7.[.J.. 000040
 4008260A 408826F4 5EC402E6 C1DEF7F6 1801067E 834DEB8E 00880574 C0080EC4 á..ât.¡..$M.-...-¥8è|.á^¶&.@.&.@ 000060
 02909A08 76FF0A76 FF006A01 6A006A00 6A1477FF 261677FF 26025FC4 26.`750C .u.&á_.&.w.&.w.j.j.j.j..v..v.... 000080
 04C80006 CAC95E1F 00E8FFFF 07C726FC 5EC40789 26024789 26C028F8 5EC4 371 q.á^½+à£.G.&..á^•&ú...$..^èò..à. 0000A0
 5689FC46 890C5688 0A468821 E880F388 05750C46 080A4688 D88E038A 881E0300 ...¡¤..Ä.F..F.u.¡µ.$1.F..V..F•.V 0000C0
 1E000004 C80008CA C91F00E8 C0283057 89262E47 89260856 88064688 FC5EC4FE ±á^•.F..V.&.G.&.W0+àS..èò..à.... 0000E0
 0C56880A 468825E8 8DF38805 75084608 06468808 740C4608 0A4688D8 8E04B488 ¡Ç..Ä.F..F.t..F..F.u.¡µ.$%.F..V. 000100
 1F00E8C0 28025789 26078926 065EC430 5788262E 478826FC 5EC4FE56 89FC4689 .F•.V±á^•&.G.&.W0á^.&..&.W.+àS.. 000120
 F3880575 08460806 46880874 0C46080A 4688088E 04F1881E 000004C8 0008CAC9 èò..à....¡þ..Ä.F..F.t..F..F.u.¡µ 000140
 07892606 5EC40857 88260647 8826FC5E C4FE5689 FC46890C 56880A46 8825E88D .$%.F..V..F•.V±á^•&.G.&.W.á^.&.. 000160
 8808740C 46080A46 88088E05 3A881E00 0010C800 08CAC91F 00E8C028 02578926 &.W.+àS..èò..à....¡:..Ä.F..F.t.. 000180
 260877FF 26F05EC4 F25689F0 46890C56 880A4688 78E880F3 88057508 46080646 F..F.u.¡µ.$(.F..V..FÞ.V·á^Þ£.w.& 0001A0
 46FF03E8 0000F846 C750E88E 02880574 C0080000 FFFF9A06 76FF0876 FF0677FF .w..v..v.......ât.¡..$PúF½..$..F 0001C0
 46880720 E80E5016 FE468050 16FA468D F876FF0A 76FF0C76 FF3C7F01 F87E83F8 ½.-½..<.v..v..v½.F°.P.F±.P.Ò ..F 0001E0

Dump of file SATURN:[PCCOMMON.DUMP.DLL]BRD.TMP;1 on 18-APR-1990 10:36:59.83
File ID (519,15,0)   End of file block 272 / Allocated 272

Virtual block number 53 (00000035), 512 (0200) bytes

 0000FF9A 50520016 05F876FF 006A006A 0676FF08 76FFF656 89F44689 FC5688FA °.V•.F¶.V-.v..v.j.j..v½...RP.... 000000
 46880874 0C46080A 4688D88E 0583881E 000006C8 0008CAC9 1F00E8C0 2888E800 .$£+àS..èò..à....¡...Ä.F..F.t..F 000020
 C453E880 F3880789 26024789 26C02806 5EC40C74 08460806 46881975 08460806 ..F.u..F..F.t.á^.+à£.G.&..¡µ.$Sá 000040
 F5880789 26024789 26C02806 5EC41174 00043016 7400033D FE468907 88260A5E ^.&...F±=..t.=..t.á^.+à£.G.&..¡% 000060
 0676FF08 76FF0677 FF260877 FF26FA5E C4FC5689 FA46890C 56880A46 882FE880 .$/.F..V..F°.V•á^°&.w.&.w..v..v. 000080
 8E062288 1E000006 C80008CA C91F00E8 C02804E8 8E028805 74C00800 00FFFF9A ......ât.¡..$.+àS..èò..à....¡"..  0000A0
 46080646 88087501 0A7E8306 74000A7E 83147C00 0E7E831A 74124608 10468808 Ä.F..F.t..-..|..-..t..-..u..F..F 0000C0
 36E880F5 88057400 04300A74 00033DFE 46890788 26105EC4 4EE880F3 88057508 .u.¡µ.$NÁ^.&...F±=..t.=..t.¡%.$6 0000E0
 76FF0A76 FF0C76FF 0E76FF06 77FF2608 77FF26FA 5EC4FC56 89FA4689 C28CC388 .û.ô.F°.V•á^°&.w.&.w..v..v..v..v 000100
 1E000006 C8000ECA C91F00E8 C02804E8 8E028805 74C00800 00FFFF9A 0676FF08 ..v.......ât.¡..$.+àS..èò..à.... 000120
 88087501 0A7E8306 74000A7E 83147C00 0E7E831A 74124608 10468808 8E06A088 ¡Ù..Ä.F..F.t..-..|..-..t..-..u.. 000140
 05740004 300A7400 033DFE46 89078826 105EC400 82E980F3 88067508 46080646 F..F.u.¡µ.Ô..á^.&...F±=..t.=..t. 000160
 FF016A52 E88E0C88 0575043F 8326FA5E C4FC5689 FA4689C2 8CC3886A E880F588 ¡%.$j.ü.ô.F°.V•á^°&.?.u.¡..$Rj.. 000180
 77FF26FA 5EC435E8 8DF38805 75C0080C C483084A E80E5306 0C76FF0E 76FF0A76 v..v..v..S.ÒJ..á..âu.¡µ.$5á^°&.w 0001A0
 8E028805 74C00800 0006009A 0676FF08 76FF0A76 FF0C76FF 0E76FF06 77FF2608 .&.w..v..v..v..v..v.......ât.¡.. 0001C0
 4688D88E 0731881E 000012C8 000ECAC9 1F00E8C0 28000138 47C726FA 5EC400EB $.á^°&úG8..+àS..èò..à....¡1..Ä.F 0001E0

Dump of file SATURN:[PCCOMMON.DUMP.DLL]BRD.TMP;1 on 18-APR-1990 10:36:59.83
File ID (519,15,0)   End of file block 272 / Allocated 272

Virtual block number 54 (00000036), 512 (0200) bytes

 06750846 08064688 0875010A 7E830674 000A7E83 147C000E 7E831A74 12460810 ..F.t..-..|..-..t..-..u..F..F.u. 000000
 88008CE9 8DF58806 74000430 08740003 3DFA4689 07882610 5EC40005 E980F388 ¡µ.Õ(.á^.&...F°=..t.=..t.¡%.Õ¥.. 000020
 0E76FF0A 76FF006A 00A3E98E 00880675 043F8326 EE5EC4F0 5689EE46 89C28CC3 û.ô.F¥.VÞá^¥&.?.u.¡..ÕÊ.j..v..v. 000040
 57882606 478826EE 5EC40085 E980F388 0675C008 0CC48307 8FE80E53 060C76FF .v..S.Ò...á..âu.¡µ.Õ..á^¥&.G.&.W 000060
 0574C008 00000715 9A5016F2 46800A76 FF0C76FF 0E76FF50 52FE5689 FC468908 ..F•.V±RP.v..v..v..F·.P......ât. 000080
 26F85688 F6468816 75025739 261C7507 3926F456 88F24688 065EC456 E88E0288 ¡..$Vá^..F·.V¶&9.u.&9W.u..F-.V½£ 0000A0
 53060A76 FF0C76FF 0E76FFFC 76FFFE76 FF2CE8C0 28047506 5739260A 75044739 9G.u.&9W.u.+àS,.v±.v•.v..v..v..S 0000C0
 000ECAC9 1F00E8C0 28000138 47C726EE 5EC400E8 8E028805 74C00800 00FFFF9A ......ât.¡..$.á^¥&úG8..+àS..èò.. 0000E0
 7E830874 00067E83 0C7C000A 7E831274 0E46080C 4688088E 07EA881E 000006C8 à....¡ô..Ä.F..F.t..-..|..-..t..- 000100
 E880F588 05740004 300A7400 033DFE46 89078826 0C5EC47C E880F388 05740106 ..t.¡µ.$|á^.&...F±=..t.=..t.¡%.$ 000120
 76FF0676 FF006A4C E88E0E88 0575043F 8326FA5E C4FC5689 FA4689C2 8CC38864 d.û.ô.F°.V•á^°&.?.u.¡..$Lj..v..v 000140
 77FF2608 77FF26FA 5EC42FE8 8DF38805 75C0080C C483068E E80E5306 0876FF0A ..v..S.Ò...á..âu.¡µ.$/á^°&.w.&.w 000160
 013847C7 26FA5EC4 00E88E02 880574C0 080000FF FF9A0676 FF0876FF 0A76FF06 ..v..v..v.......ât.¡..$.á^°&úG8. 000180
 000A7E83 18740E46 080C4688 088E08F6 881E0000 04C8000A CAC91F00 E8C02800 .+àS..èò..à....¡-..Ä.F..F.t..-.. 0001A0
 890E5688 0C46883; E880F388 05740108 7E830874 00087E83 0C7F020A 7E83127C |..-.....-..t..-..t.¡µ.$2.F..V.. 0001C0
 C0080000 FFFF9A0ь 76FF0876 FF0A76FF 0677FF26 0877FF26 FC5EC4FE 5689FC46 F•.V±á^•&.w.&.w..v..v..v.......à 0001E0
```

Dump of file SATURN:[PCCOMMON.DUMP.DLL]BRD.TMP;1 on 18-APR-1990 10:36:59.83
File ID (519,15,0)   End of file block 272 / Allocated 272

Virtual block number 55 (00000037), 512 (0200) bytes

```
10460B0E 4688088E 09A0B81E 000004C8 000ACAC9 1F00EBC0 2B04EB8E 02B80574 t.¡..Š.+âŠ..èò..à....¡...Ä.F..F. 000000
08460B06 46880875 010A7E83 0674000A 7E83147F 020C7E83 1A7C000C 7E832074 t .~..|..~.....~..t..~..u..F..F. 000020
76FF0677 FF264B77 FF26FC5E C4FE5689 FC468910 56880E46 8835E880 F3B80575 u.¡µ.Š5.F..V..F=.V±ó^=&.w.&.w..v 000040
0CCAC91F 00EBC02B 04EB8E02 B80574C0 0B0000FF FF9A0676 FF0876FF 0A76FF0C ..v..v..v.......ât.¡..Š.+âŠ..èò. 000060
83067501 0A7E8306 74000A7E 8312740E 46080C46 8808BE0A 06881E00 0004C800 .à....¡...Ä.F..F.t..~..t..~..u.. 000080
77FF2608 77FF26FC 5EC4FE56 89FC4689 0E56880C 46882FEB 8DF38805 7D00087E ~..).¡µ.Š/.F..V..F=.V±ó^=&.w.&.w 0000A0
04C8000A CAC91F00 EBC02B04 EB8E02B8 0574C008 0000FFFF 9A0676FF 0876FF06 ..v..v.......ât.¡..Š.+âŠ..èò..à. 0000C0
08064688 0875010A 7E830674 000A7E83 14740E46 080C4688 D88E0A77 B81E0000 ...¡w..Ä.F..F.t..~..t..~..u..F.. 0000E0
0677FF26 0877FF26 FC5EC4FE 5689FC46 890E5688 0C46882F EB8DF3B8 05750846 F.u.¡µ.Š/.F..V..F=.V±ó^=&.w.&.w. 000100
0004C800 0ACAC91F 00EBC02B 04EB8E02 B80574C0 0B0000FF FF9A0676 FF0876FF .v..v.......ât.¡..Š.+âŠ..èò..à.. 000120
35EB8DF3 B8057401 0E7E8308 74000E7E 830C7412 46081046 88D88E0A D4881E00 ..¡Â..Ä.F..F.t..~..t..~..t.¡µ.Š5 000140
0876FF0A 76FF0C76 FF0677FF 260877FF 26FC5EC4 FE5689FC 46891256 88104688 .F..V..F=.V±ó^=&.w.&.w..v..v..v. 000160
B81E0000 04C8000E CAC91F00 EBC02B04 EB8E02B8 0574C008 0000FFFF 9A0676FF .v.......ât.¡..Š.+âŠ..èò..à....¡ 000180
10468835 EB8DF3B8 0574010E 7E830874 000E7E83 0C741246 08104688 D88E0833 3..Ä.F..F.t..~..t..~..t.¡µ.Š5.F. 0001A0
0676FF08 76FF0A76 FF0C76FF 0677FF26 0877FF26 FC5EC4FE 5689FC46 89125688 .V..F=.V±ó^=&.w.&.w..v..v..v..v. 0001C0
8E089088 1E000004 C8000ECA C91F00EB C02B04EB 8E028805 74C00800 00FFFF9A ......ât.¡..Š.+âŠ..èò..à....¡... 0001E0
```

Dump of file SATURN:[PCCOMMON.DUMP.DLL]BRD.TMP;1 on 18-APR-1990 10:36:59.83
File ID (519,15,0)   End of file block 272 / Allocated 272

Virtual block number 56 (00000038), 512 (0200) bytes

```
16568814 46883BEB 8DF38805 7401127E 83087400 127E830C 74164608 144688D8 Ä.F..F.t..~..t..~..t.¡µ.Š;.F..V. 000000
0876FF0A 76FF0C76 FF0E76FF 1076FF06 77FF2608 77FF26FC 5EC4FE56 89FC4689 .F=.V±ó^=&.w.&.w..v..v..v..v..v. 000020
B81E0000 04C80012 CAC91F00 EBC02B04 EB8E02B8 0574C008 0000FFFF 9A0676FF .v.......ât.¡..Š.+âŠ..èò..à....¡ 000040
1446883B EB8DF3B8 05740112 7E830874 00127E83 0C741646 08144688 D88E08ED Ù..Ä.F..F.t..~..t..~..t.¡µ.Š;.F. 000060
0A76FF0C 76FF0E76 FF1076FF 0677FF26 0877FF26 FC5EC4FE 5689FC46 89165688 .V..F=.V±ó^=&.w.&.w..v..v..v..v. 000080
0004C800 12CAC91F 00EBC02B 04EB8E02 B80574C0 0B0000FF FF9A0676 FF0876FF .v..v.......ât.¡..Š.+âŠ..èò..à.. 0000A0
880C4688 30EB8DF3 B8057508 46080646 8808740E 46080C46 88D88E0C 50881E00 ..¡P..Ä.F..F.t..F..F.u.¡µ.Š=.F.. 0000C0
76FF0677 FF260877 FF26FC5E C400010A 46C7057F 000A7E83 FE5689FC 46890E56 V..F=.V±.~....úF...ó^=&.w.&.w..v 0000E0
04C8000A CAC91F00 EBC02B04 EB8E02B8 0574C008 0000FFFF 9A0676FF 0876FF0A ..v..v.......ât.¡..Š.+âŠ..èò..à. 000100
0A468808 75010E7E 83067400 0E7E8314 74124608 10468808 8E0C83B8 1E560000 ..V.¡°..Ä.F..F.t..~..t..~..u..F. 000120
26FC5EC4 02E6C10E 7688FE56 89FC4689 12568810 468845EB 8DF38805 750C4608 .F.u.¡µ.ŠE.F..V..F=.V±.v.èl.ó^=& 000140
5EC4E6D1 0E768812 74084608 06468802 57892607 89260A5E C40C5088 260A4088 .ə.&.P.ó^.&..&.W..F..F.t..v.ìĺó^ 000160
88088E0D 15881E00 0006C800 0ECAC95E 1F00EBC0 28078926 065EC412 408826FC =&.ə.ó^.&..+âŠ..^èò..à....¡...Ä. 000180
00053DFE 46890788 260A5EC4 3EEB8DF3 B8057508 46080646 8808740C 46080A46 F..F.t..F..F.u.¡µ.Š>ó^.&...F±=.. 0001A0
75033F83 26FA5EC4 FC5689FA 46890C56 880A4688 22E80002 07C72606 5EC40A75 u.ó^.&ú...Š".F..V..F°.V=ó^°&.?.u 0001C0
0088881E 5600001E C80008CA C91F00EB C0280789 26065EC4 00018803 EBC02B04 .+âŠ.¡..ó^.&..+âŠ..èò..à...V.¡.. 0001E0
```

Dump of file SATURN:[PCCOMMON.DUMP.DLL]BRD.TMP;1 on 18-APR-1990 10:36:59.83
File ID (519,15,0)   End of file block 272 / Allocated 272

Virtual block number 57 (00000039), 512 (0200) bytes

```
5689F246 89045788 26024788 26065EC4 0168E980 F3B80675 08460806 4688088E .Ä.F..F.u.¡µ.Òh.ó^.&.G.&.W..F·.V 000000
E2468D01 6A0677FF 260877FF 2649740C 46080A46 88FC5689 FA4689C2 8CC388F4 ¶.û.ô.F°.V=.F..F.tl&.w.&.w.j..Fâ 000020
FF3277FF 26065E ( 5016E246 8D0A76FF 0C76FF0E 76FF1076 FF00000C F89A5016 .P.½....v..v..v..v..Fã.Pó^.&.w2. 000040
00FE46C7 14C48302 6A00009A 500004B8 03EB0003 B8057503 3F8326FA 76FFFC76 v=.v°&.?.u.¡..Š.¡..P...j..ó.úF±. 000060
FF0D740C 4008260A 40882606 5EC402E6 C1FE7688 227F01FE 7E83FE46 FF03EB00 .Š..F±.~±..".v±èl.ó^.&.ə.&.ə.t.. 000080
8DFA76FF FC76FF14 77FF2616 77FF26F2 5EC4D5EB F517EB0E FE76FFFA 76FFFC76 v=.v°.v±.Ò.XŠ¶ó^·&.w.&.w..v=.v°. 0000A0
1477FF26 1677FF26 F25EC418 74FFE47E 830675FF E27E830E D8091E9A 5016E246 Fâ.P...Ü..~ã.u..~ð.t.ó^·&.w.&.w. 0000C0
74C00800 00FFFF9A 0677FF26 0877FF26 065EC404 9005D09A 006AE276 FFE476FF .vô.vãj..Å...ó^.&.w.&.w.......ât 0000E0
77FF2606 5EC40F1D 09C29A00 6A006A26 77FF2628 77FF2606 5EC472EB 8E028805 .¡..Šrá^.&.w(&.w&j.j..ô...ó^.&.w 000100
0AEB020E 05A49AF6 76FFF876 FF0075C0 080F3E0A 589A5016 F6468026 77FF2628 (&.w&.F~.P.X.>..âu..v½.v~.Ê...ŠÖ 000120
0677FF26 F25EC41F EB8DF2B8 0574C008 0EB70068 9A2677FF 262877FF 26065EC4 ó^.&.w(&.w&.h.ñ..ât.¡·.Š.ó^·&.w. 000140
000004C8 CBC95E1F 00EBC02B 04EB8DF2 B80574C0 08000000 A39A0676 FF0876FF .v..v..Ê....ât.¡·.Š.+âŠ..^èùà... 000160
2877FF26 065EC445 74000A7E 8362EB8D F3B80575 08460806 4688088E 00EE881E .¡Ÿ..Ä.F..F.u.¡µ.Šb.~..tÉó^.&.w( 000180
0A589A50 16FC4680 2677FF26 2877FF26 065EC40F 8009C29A 006A006A 2677FF26 &.w&j.j..ô.¯.ó^.&.w(&.w&.F=.P.X. 0001A0
006ACFE8 0CC4830F 2C09CF9A FC76FFFE 76FF006A 006A006A 006A1875 C0080F08 ...âu.j.j.j.j..v±.v=.ü.,..ó.Šüj. 0001C0
72881E56 000008C8 CBC91F00 EB0CC483 FE07E80E 0676FF08 76FF006A 006A006A j.j.j..v..v..Ò.±.ó.Š..èùà...V.¡r 0001E0
```

Dump of file SATURN:[PCCOMMON.DUMP.DLL]BRD.TMP;1 on 18-APR-1990 10:36:59.83
File ID (519,15,0)   End of file block 272 / Allocated 272

Virtual block number 58 (0000003A), 512 (0200) bytes

```
26065EC4 0091E9C0 28057E01 0E7E8306 7C000E7E 830C7408 46080646 88088E0F ..Ä.F..F.t..-..|..-..-.+äÕ..á^.& 000000
8300FE5E 8301FC6E 83087500 107E8300 0006919A 5016FC46 800677FF 260877FF .w.&.w..F•.P......-..u..n•..^±.. 000020
08FA5689 F846890C 56180A46 28FE5688 FC46880C E80C5688 0A468808 75000E7E -..u..F..V.Š..F•.V±+F..V..F%.V•. 000040
88FC4688 2CE833E8 C0280474 0C400826 0A408826 065EC402 E6C10E76 881975C2 ðu..v.èl.á^.&.a.&.a.t.+åŠ3Š,.F•. 000060
08260A40 8826065E C402E6C1 0EF7F618 010E7E83 1C75FA56 392175F8 4639FE56 V±9F%ul9V•u..-...-%8èl.á^.&.a.&. 000080
06468808 8E0FEF88 1E565700 0014C8C8 C95E1F00 E8000188 05E8C028 04740C40 a.t.+åŠ.¡..Š..^èúà...WV.¡Ÿ..Ä.F. 0000A0
16F04680 016A0677 FF260877 FF26EC5E C4EE5689 EC46890A 56880846 88000DE9 Õï..F..V..Fâ.VŸá^&&.w.&.w.j..Fþ. 0000C0
F0768016 7F801A75 00387F83 26EC5EC4 00CAE98E 02880674 C0080000 0E339A50 P.3....ât.¡..Õò.á^&&..8.u.....vþ 0000E0
80505200 1605EE56 88EC4688 18E80001 3847C726 EC5EC41F A5F20008 891F161E ...¿..·E.á^â&úG8..Š..Fâ.VŸ...RP. 000100
FF26EC5E C4EE5689 EC46890A 56880846 880087E9 08C483FF FF0CFE9A 5016F046 Fþ.P.±....á.Õ...F..V..Fâ.VŸá^&&. 000120
8326EC5E C45FE88E 02880574 C0080000 FFFF9A50 16F04680 016A0677 FF260877 w.&.w.j..Fþ.P......ât.¡..Š á^&&. 000140
8818E800 013047C7 26EC5EC4 1FA5F200 08891F16 1EF07680 147F8D1A 7500307F .0.u.....vþ...¿..·E.á^š&úGÕ..Š.. 000160
16E81CE8 8E03881D E808C483 11170CFE 9A5016F0 46805052 001405EE 5688EC46 Fâ.VŸ...RP.Fþ.P.±....á.Š.¡..Š.Š. 000180
C8C8C95F 5E1F00E8 C028E3E8 FF78E903 75000230 FF17E903 7F000130 F57CC008 .â|%=....Õ..=..u.Õ(.ŠD+åŠ..^_èúà 0001A0
E8F45689 F246894A 57882648 47882606 5EC40002 F646C7D8 8E10A988 1E00001A ....|`..ÄúF-..á^.&.GH&.WJ.F·.V¶Š 0001C0
FF008DE9 0375C008 F64EFFF6 4688F456 89F24689 4E578826 4C478826 065EC411 .á^.&.GL&.WN.F·.V¶.F-.N-.âu.ÕŠ.. 0001E0
```

Dump of file SATURN:[PCCOMMON.DUMP.DLL]BRD.TMP;1 on 18-APR-1990 10:36:59.83
File ID (519,15,0)   End of file block 272 / Allocated 272

Virtual block number 59 (0000003B), 512 (0200) bytes

```
28C2E802 7301EA7E 83067C0A 7F00EC7E 83124900 F09A5016 EA4680F2 76FFF476 v¶.v·.Fõ.P.Þ.I..-â...|..-õ.s.Šõ+ 000000
4639057C 707FF056 39EC5688 EA468800 F0568301 EE468308 E8EE4689 F04689C0 á.Fþ.FŸŠ..FŸ..Vþ..Fõ.V±9Vþ.)|.9F 000020
8826F85E C40F9808 689A5016 F8468000 6AEE76FF F076FFF2 76FFF476 FF7673EE Ÿsv.v¶.v·.vþ.vŸj..F%.P.k...á^%&. 000040
C0280475 00347F83 26E65EC4 E85689E6 46890257 88260788 26F85EC4 42E80647 G.Šßá^%&..&.W..F|.VÕá^|&..4.u.+á 000060
C0280475 002E7F83 26FC5EC4 FE5689FC 46890257 88260788 26F85EC4 32E83FE8 Š?Š2á^%&..&.W..F•.V±á^•&....u.+á 000080
E8000188 FF25E9FF 70E900E8 D0740002 30B57E00 01300C7C C00810E8 12E81FE8 Š.Š.Š..â|.=..-ç=..tÄŠ.Õp.Õ%.¡..Š 0000A0
00020168 00040801 02030000 00011182 00020060 00040086 0203001C CBC91F00 ..âü....Ñ...`...........l...k... 0000C0
02030000 00040440 0002006E 00040EE9 020300EE 00040A88 02030000 00030257 W.......¡...Ÿ...Õ...n...M....... 0000E0
02030101 00040A5B 02030180 00040C34 02030000 00080FC7 0002007D 000407C5 é...)...ú.......4.......[....... 000100
02030000 000C0E67 00020014 00030069 0203008A 000408D1 0203027F 0005003A :.......l.......i.......g....... 000120
0203009B 0004097B ⌄2030022 00030F57 02030195 00040C97 02030112 00040817 .................W..."...(....... 000140
02030000 001411F0 000200A8 0004101D 02030127 000405BA 0203021E 0004113E >.......¤...'.............•....... 000160
02030158 00040874 020300CC 00041002 02030000 001911B5 00020080 00040888 ....§...ç.......@...ä...t...X... 000180
0C46080A 4688D88E FFFFB81E 000004C8 00000000 00000000 0000000F 000409EA õ...Õ...........à....¡...Ä.F..F. 0001A0
FFFF0000 9A0676FF 0876FF0A 76FF0C76 FF36E880 F3880575 08460806 46880874 t..F..F.u.¡µ.Šó.v..v..v..v...... 0001C0
0407C726 FC5EC4FE 5689FC46 89025788 26078826 065EC41C E88E0888 0574C008 .ât.¡..Š.á^.&..&.W..F•.V±á^•&ú.. 0001E0
```

Dump of file SATURN:[PCCOMMON.DUMP.DLL]BRD.TMP;1 on 18-APR-1990 10:36:59.83
File ID (519,15,0)   End of file block 272 / Allocated 272

Virtual block number 60 (0000003C), 512 (0200) bytes

```
065EC409 74084608 06468808 8E000688 1E560000 16C80008 CAC91F00 E8C02800 .+âŠ..èò..à...V.¡...Ä.F..F.t.á^. 000000
26064788 26EA5EC4 EC5689EA 46890856 88064688 0007E980 F3880674 033F8326 &.?.t.¡µ.Õ•..F..V..Fõ.V±á^õ&.G.& 000020
E80000FA 46C70001 F846C700 00FFFF9A 5016F446 8D5052FE 5689FC46 89085788 .W..F•.V±RP.F¶.P.....úF%..úF•..Š 000040
76F84638 057F1C7C FA563800 DA830001 2DF65688 F4468800 FA568301 F8468308 ..F%..V•..F¶.V--...Õ.;V•|...;F%v 000060
F246FF03 E80000F2 46C7C8E8 0000FFFF 9A006AF8 76FFFA76 FFFC76FF FE76FF15 ..v±.v•.v•.v%j......ŠúúF·..Š..F· 000080
88016AF0 5689EE46 890C5088 260A4088 26EA5EC4 02E6C1F2 7688517F 01F27E83 .-·..Q.v·èl.á^õ&.a.&.P..FŸ.Vþj.. 0000A0
6AF276FF FF6A0EC4 83014003 589A5052 0676FF08 76FF006A 1270FF26 E601F276 v·1l&.p.j..v..v.RP.[.a..á.j..v·j 0000C0
28000407 C726EA5E C4A6E80E C483FFFF 17059AEE 76FFF076 FF0676FF 0876FF01 ..v..v..vþ.vŸ......á.Šlá^õ&ú...+ 0000E0
E980F388 06750846 08064688 D88E0061 881E5600 000AC800 04CAC95E 1F00E8C0 âŠ..^èò..à...V.¡a..Ä.F..F.u.¡µ.Õ 000100
00FE46C7 6DE880F3 88057404 3F8326F6 5EC4F856 89F64689 08568806 46880087 ...F..V..F-.V%á^-&.?.t.¡µ.ŠmúF±. 000120
FA46890C 5088260A 408826F6 5EC402E6 C1FE7688 517F01FE 7E83FE46 FF03E800 .Š..F±.-±..Q.v±èl.á^-&.a.&.P..F• 000140
0EC48301 E60358 9A 50520676 FF0876FF 016A1270 FF26E601 FE768801 6AFC5689 .V•j..v±1l&.p.j..v..v.RP.[.l..á. 000160
F65EC4A6 E80EC483 01251705 9AFA76FF FC76FF06 76FF0876 FF006AFE 76FFFF6A j..v±j..v..v..v•.v•...X..á.Šlá^- 000180
06750846 08064688 D88E0160 881E5600 0016C8C8 C95E1F00 E8C02800 0307C726 &ú...+âŠ..^èúà...V.¡'..Á.F..F.u. 0001A0
26065EC4 02E6C1F2 76882A7F 01F27E83 F246FF03 E80000F2 46C700AD E980F388 ¡µ.ÕÜ.úF·..Š..F·.-·..•.v·èl.á^.& 0001C0
CDE8F652 89F44289 08578826 06478826 EA5EC4EC 5689EA46 890C5088 260A4088 .a.&.P..Fõ.V±á^õ&.G.&.W..B¶.R-Šë 0001E0
```

Dump of file SATURN:[PCCOMMON.DUMP.DLL]BRD.TMP;1 on 18-APR-1990 10:36:59.83
File ID (519,15,0)   End of file block 272 / Allocated 272

Virtual block number 61 (00000030), 512 (0200) bytes

```
89EE4689 F6528BF4 428B02E6 C1F2768B 5F7F01F2 7E83F246 FF03EB00 00F246C7 úF..Š..F.-.....v.èl..B¶.R-.FŸ. 000000
FC468BFE 5689FC46 89F6528B F4428B02 E6C1F28B F9F70002 B99940F2 468BF056 VÞ.F ə.¿..¼•.·èT..B¶.R-.F•.V±.F• 000020
478B26FC 5EC41½EB 0001B805 75FE5639 0A75FC46 39F0568B EE468B2B 74FE460B .F±(.FŸ.VÞ9F=u.9V±u.¡..Š.á^=&.G 000040
000401CB 000200^5 90CBC95E 1F00EBC0 2B9BEB00 EBFE5689 FC468938 57882636 6&.W8.F•.V±ŠÅŠ.+àŠ..^èù.....ù... 000060
00190204 000200/ 000400A1 02030098 000400E0 02030000 0005002E 00020000 ............Å........À............ 000080
080E468B D8BEFFFF B81E5657 000012C8 00000000 00000000 00000000 00000000 ................à...WV.¡...Ä.F.. 0000A0
76FF0789 26024789 26C02B06 5EC400FD E98DF3B8 06750846 08064688 08741046 F.t..F..F.u.¡µ.Õ».á^.+à&.G.&...v 0000C0
F1B80675 000BF656 89F44689 FE568BFC 46880000 FFFF9A50 16FC468D 0E76FF10 ..v..F=.P......F•.V±.F¶.V-.Åu.¡þ 0000E0
74C00B00 00FFFF9A 5016F846 8D366A0E 6A50F246 8906478B 26F45EC4 00CBE98D .Õù.á^¶&.G..F·Pj.j6.F½.P......ât 000100
50520024 05C28CC3 88F276FF A5F2001B B902A68E FB8BF85E C400A8E9 8DF28806 .¡·.Õ˙.á^½.«ƒl.¿..·Ê.v·.ù.ő.$.RP 000120
8BF85EC4 73E88E07 B8000001 029AF876 FFFA76FF F276FF13 74C00B00 F200009A ......ât..v·.vª.v½.....¡..Šsá^½. 000140
46880857 89260647 89260C56 880A468B F85EC404 57892602 478926F6 568BF446 F¶.V-&.G.&.W.á^½.F..V.&.G.&.W..F 000160
9A505200 6A016A00 6A006A14 77FF2616 77FF26F4 5EC4F056 89EE4689 FA568BF8 ½.Vª.FŸ.VÞá^¶&.w.&.w.j.j.j.j.RP. 000180
468B065E C414EB8E 07B80000 FFFF9AF8 76FFFA76 FFF276FF 1374C008 FFFF0290 .....ât..v·.vª.v½.....¡..Š.á^..F 0001A0
D88E0008 B81E0000 10C8000C CAC95F5E 1F00EBC0 28025789 26078926 F0568BEE Ÿ.VÞ&..&.W.+àŠ..^_èò..à....¡...Ä 0001C0
478B26FC 5EC4FE56 89FC4689 0A568808 468800CF E98DF3B8 06750A46 08084688 .F..F.u.¡µ.Õù..F..V..F•.V±á^=&.G 0001E0
```

Dump of file SATURN:[PCCOMMON.DUMP.DLL]BRD.TMP;1 on 18-APR-1990 10:36:59.83
File ID (519,15,0)   End of file block 272 / Allocated 272

Virtual block number 62 (0000003E), 512 (0200) bytes

```
30E80EFC 76FFFE76 FF0676FF 1375023F 8326F45E C4F65689 F4468904 57882602 .&.W..F¶.V-á^¶&.?.u..v..v±.v•.ÒO 000000
77FF2626 77FF26FC 5EC46674 00067E83 00012E47 C726FC5E C40096E9 06C48305 ..á.Õ..á^=&úG....~..tfá^=&.w&&.w 000020
0B00930A 589A5016 F8468D24 77FF2626 77FF26FC 5EC401AD 09C29A00 6A006A24 $j.j..ô.Ù.á^=&.w&&.w$.F½.P.X.... 000040
5689F046 890C578B 260A478B 26FC5EC4 DAE8FFFF 04049AF8 76FFFA76 FF0075C0 âu..vª.v½.....ŠÖá^=&.G.&.W..FÞ.V 000060
FF0A76FF FFFF0165 9A006AF0 76FFF276 FF0D74C0 0B04C483 FFFF11AF 9A5052F2 ·RP.£....á..ât..v·.vÞj..e....v.. 000080
CAC91F00 EBC02B04 EB8E07B8 0574C008 08C483FF FF044A9A F476FFF6 76FF0876 v..v-.v¶.J....á..át.¡..Š.+àŠ..èò 0000A0
E98DF3B8 06750A46 08084688 08740E46 080C4688 D88E012C B81E0000 10C80006 ..à....¡...Ä.F..F.t..F..F.u.¡µ.Õ 0000C0
8BFA5689 F8468904 57882602 478B26FC 5EC4FE56 89FC4689 0E56880C 468800CB ù..F..V..F•.V±á^=&.G.&.W..F½.Vª. 0000E0
26F45EC4 0A750C47 08260A47 88261475 002E7F83 26F65689 F446890A 56880846 F..V..F¶.V-&....u.&.G.&.G.u.á^¶& 000100
0676FF0C 5789260A 4789260A 56880846 8BFC5EC4 0081E98E 00880674 00647F83 ..d.t.¡..Õ..á^•.F..V.&.G.&.W..v. 000120
EB8E0088 0574C008 0EC483FF FF17059A F476FFF6 76FF0C76 FF0E76FF 026A006A j.j..v..v..v-.v¶......á..ât.¡..Š 000140
FFF07E83 02EE091E 9A5016F0 468D0C76 FF0E76FF 1477FF26 1677FF26 F85EC44C Lá^½&.w.&.w..v..v..FÞ.P...Ÿ..-Þ. 000160
01980500 9A006AF0 76FFF276 FF1477FF 261677FF 26F85EC4 1874FFF2 7E830675 u..-·.t.á^½&.w.&.w..v·.vÞj..Å... 000180
0B06468B D88E0218 B81E0000 0CC8000A CAC91F00 EBC02B00 013047C7 26FC5EC4 á^=&úGO..+àŠ..èò..à....¡...Ä.F.. 0001A0
5788260A 478B26FC 5EC4FE56 89FC4689 08568806 46880083 E98DF3B8 06750846 F.u.¡µ.Õ°..F..V..F•.V±á^=&.G.&.W 0001C0
FF0676FF 0876FF02 6A0E77FF 26016A00 8CE98E00 B8067500 0BFA5689 F846890C ..F½.Vª.Åu.¡..Õ..j.&.w.j..v..v.. 0001E0
```

Dump of file SATURN:[PCCOMMON.DUMP.DLL]BRD.TMP;1 on 18-APR-1990 10:36:59.83
File ID (519,15,0)   End of file block 272 / Allocated 272

Virtual block number 63 (0000003F), 512 (0200) bytes

```
77FF2602 5FC426FC 5EC467EB 8E01B805 74C00B0E C48302A3 03589AF8 76FFFA76 vª.v½.[.È..á..ât.¡..Šgá^=&á_.&.w 000000
EB8E07B8 0574C008 02CA0290 9A0676FF 0876FF00 6A016A00 6A006A14 77FF2616 .&.w.j.j.j.j..v..v....ò..ât.¡..Š 000020
26F85EC4 00010094 87C726F4 5EC4F656 89F44689 08578B26 06478B26 F85EC43C <á^½&.G.&.W..F¶.V-á^¶&ú.....á^½& 000040
CAC91F00 EB0A4789 260C4789 26C02BFC 5EC40001 3047C726 FC5EC400 016647C7 úGf..á^=&úGO..á^=+à&.G.&.G.Š..èò 000060
88064688 0A5EC415 EB8DF3B8 05750C46 080A4688 D88E0308 B81E0000 00C80004 ..à....¡...Ä.F..F.u.¡µ.Š.á^..F.. 000080
0A468808 8E030888 1E000000 C80008CA C91F00EB C0281257 89261047 89260856 V.&.G.&.W.+àŠ..èò..à....¡Ä..Ä.F. 0000A0
065EC412 57882610 478B260A 5EC419EB 8DF38805 75084608 06468808 74¶C4608 .F.t..F..F.u.¡µ.Š.á^.&.G.&.W.á^. 0000C0
0C46080A 4688088E 0409881E 000000C8 0008CAC9 1F00EBC0 28025789 26‿ 8926 &..&.W.+àŠ..èò..à....¡...Ä.F..F. 0000E0
08578926 06478926 08568806 46880A5E C415EB8D F3880575 08460806 4686 974 t..F..F.u.¡µ.Š.á^..F..V.&.G.&.W. 000100
46080646 8808740C 46080A46 88D88E04 46881E00 0000C800 08CAC91F 00EBC)28 +àŠ..èò..à....¡F..Ä.F..F.t..F..F 000120
EBC02B02 57892607 8926065E C408578B 2606478B 260A5EC4 19EB8DF3 88057508 .u.¡µ.Š.á^.&.G.&.W.á^.&..&.W.+àŠ 000140
05750846 08064688 08740E46 080C4688 D88E047F B81E0000 04C80008 CAC91F00 ..èò..à....¡...Ä.F..F.t..F..F.u. 000160
26FC5EC4 00010A46 C7057D00 0A7E83FE 5689FC46 890E568B 0C468B3D EB8DF388 ¡µ.Š=.F..V..F=.V±.-..}.úF...á^=& 000180
C02B04EB 8E04B805 74C00800 00FFFF9A 0676FF08 76FF0A76 FF0677FF 260877FF .w.&.w..v..v..v.......ât.¡..Š.+à 0001A0
750C460B 0A468808 7410460B 0E468808 8E04BC88 1E000004 C8000ACA C91F00EB Š..èò..à....¡Ÿ..Ä.F..F.t..F..F.u 0001C0
0A5EC40C 5788260A 478B26FC 5EC4FE56 89FC4689 1056880E 46883AEB 8DF38805 .¡µ.Š:.F..V..F•.V±á^=&.G.&.W.á^. 0001E0
```

```
Dump of file SATURN:[PCCOMMON.DUMP.DLL]BRD.TMP;1 on 18-APR-1990 10:36:59.83
File ID (519,15,0)   End of file block 272 / Allocated 272

Virtual block number 64 (00000040), 512 (0200) bytes

 00E8C028 07892606 5EC40E47 8826FC5E C40D7408 46080646 88025789 26078926 &..&.W..F..F.t.á^=&.G.á^.&..+áS. 000000
 065EC401 11E980F3 88067508 46080646 88088E05 10881E00 001CC800 0CCAC91F .èò..à....¡...Ä.F..F.u.¡µ.Ô..á^. 000020
 3C740C46 080A4688 F65689F4 4689C28C C388FA56 89F84689 04578826 02478826 &.G.&.W..F½.V°.ú.ô.F¶.V-.F..F.t< 000040
 0A76FF0C 76FF0E76 FF1076FF 00000501 9A5016E4 468D016A 0677FF26 0877FF26 &.w.&.w.j..Fô.P......v..v..v..v. 000060
 26065EC4 14C48301 F800009A 056AF476 FFF676FF 2C77FF26 065EC450 16E4468D .Fô.Pá^.&.w,.v-.v¶j....«..á.á^.& 000080
 5016FC46 8D2477FF 262677FF 26065EC4 061309C2 9A006A00 6A2477FF 262677FF .w&&.w$j.j..ô...á^.&.w&&.w$.F=.P 0000A0
 FCD2E80E F476FFF6 76FFDAE8 01BC05A4 9AFC76FF FE76FF0D 75C00803 860A589A .X....åu..v±.v=.Ê.¥.SÖ.v-.v¶.Ö0= 0000C0
 75FFE47E 83066009 1E9A5016 E4468DF4 76FFF676 FF1477FF 261677FF 26F85EC4 á^¥&.w.&.w..v-.v¶.Fô.P...m..~ô.u 0000E0
 C405FE05 D09A006A E476FFE6 76FF1477 FF261677 FF26F85E C41874FF E67E8306 ..-Ì.t.á^¥&.w.&.w..vÌ.vôj..Ä.±.á 000100
 0000A39A 0676FF08 76FF0677 FF26F85E C4064900 689A2477 FF262677 FF26065E ^.&.w&&.w$.h.I.á^¥&.w..v..v..Ê.. 000120
 46080646 88D88E05 78881E00 0004C8C8 C91F00E8 C02804E8 8DF28805 74C00800 ..ât.¡·.S.+áS..èùà....¡(..Ä.F..F 000140
 09C29A00 6A006A24 77FF2626 77FF2606 5EC44574 000A7E83 62E880F3 88057508 .u.¡µ.Sb.~..tEá^.&.w&&.w$j.j..ô. 000160
 6A006A00 6A1875C0 0806700A 589A5016 FC468D24 77FF2626 77FF2606 5EC406E5 Ì.á^.&.w&&.w$.F=.P.X.)..åu.j.j.j 000180
 76FF0876 FF006A00 6A006A00 6ACFEB0C C4830622 09CF9AFC 76FFFE76 FF006A00 .j..v±.v=.ü."..á.Suj.j.j.j..v..v 0001A0
 00000004 03580002 00000003 01EA0002 000890C8 C91F00E8 0CC483FE 60E80E06 ..Ò'±.á.S..èù.....õ.......X..... 0001C0
 00140003 00690203 027F0005 003A0203 00000008 06FC0002 00000005 01060002 ..ø.......=.......:........i..... 0001E0

Dump of file SATURN:[PCCOMMON.DUMP.DLL]BRD.TMP;1 on 18-APR-1990 10:36:59.83
File ID (519,15,0)   End of file block 272 / Allocated 272

Virtual block number 65 (00000041), 512 (0200) bytes

 00000014 06D00002 021E0004 05C00203 00220003 068D0203 0000000C 05E7C902 ..Ô...........".. .à.......Å..... 000000
 080E4688 D88EFFFF 881E5657 000032C8 00000000 00000000 00000019 06A70C02 ..Ì.............à2..WV.|...Ä.F.. 000020
 0E76FF10 76FF0303 E98DF388 06750846 08064688 08740C46 080A4688 10741046 F.t..F..F.t..F..F.u.¡µ.ÔE..v..v. 000040
 03ADE980 F1880675 D0080E56 89DC4689 FA5688F8 46880000 FFFF9A50 16F8468D .F½.P......F½.V°.FÉ.V8.Åu.¡Þ.ÖÜ. 000060
 8DF28806 74C00800 00FFFF9A 5016FC46 8D3C6A0E 6A50DA46 89064788 26DC5EC4 á^É&.G..FÖPj.j<.F=.P......åt.¡·. 000080
 DA8E1E07 16F088E8 7E800C56 880A4688 A5F2001E 8902DC8E F888FC5E C4038AE9 Õ..á^=.«/É.¿...É.F..V..-Ô.Þ....Ö 0000A0
 5EC40856 8CD64689 E8468DE6 5689E446 89005605 DE5688DC 46881FA5 F2000889 ¿...É..FÉ.V8.V..Fô.VÌ.FÒ.Fø.VÄá^ 0000C0
 02E80001 88057500 0800F201 309A37FF 260277FF 26065EC4 37FF2602 77FF26E4 Ô&.w.&.7á^ø&.w.&.7.0....Åu.|..S. 0000E0
 9AD65EC4 37FF2602 77FF26E4 5EC440E8 02578826 07882606 5EC40C74 C008C028 +á.ât.á^ø&..&.W.SMá^Ô&.w.&.7á^ø. 000100
 9ADC8808 EC830112 06999A28 161E8D01 0806C79A 00FF02C3 9AE45EC4 00FA02C3 ú.'.á^ô.û....ú......(......å..Ê. 000120
 C4015200 FC9A5052 012004A6 9A012602 569A0888 08C48301 21078E9A 011703EF ÿ..../.I..á..Ä.V.&..Ì.-.RP.=.R.á 000140
 9A0477FF 260677FF 26D65EC4 0477FF26 0677FF26 E45EC402 57892607 8926D65E ^ø&..&.W.á^Ô&.w.&.w.á^ø&.w.&.w.. 000160
 54E80657 88260447 8826D65E C40D74C0 08C02802 E8000188 05750008 01790130 0.y..Åu.¡..S.+á.ât.á^ø&.G.&.W.ST 000180
 9A28161E 80019206 C79A0189 02C39A04 5F8DE45E C4018402 C39A045F 80065EC4 á^ø._..û...á^ô._..û....û......(. 0001A0
 04A69A01 8002569A D88808C4 8301A807 8E9A01A1 03EF9ADC 8808EC83 019C0699 ....¯S..É.ÿ.À..7.¨..á..Ä.V.¯..Ì. 0001C0
 80065789 26044789 26D65EC4 01EF00FC 9A0477FF 260677FF 26E45EC4 505201C2 ô.RPá^Ô&.w.&.w..=.ÿ.á^ø&.G.&.W.. 0001E0

Dump of file SATURN:[PCCOMMON.DUMP.DLL]BRD.TMP;1 on 18-APR-1990 10:36:59.83
File ID (519,15,0)   End of file block 272 / Allocated 272

Virtual block number 66 (00000042), 512 (0200) bytes

 1C01309A 37FF2602 77FF2606 5EC437FF 260277FF 26E45EC4 D8568C06 4689F046 FÞ.Fø.VÄá^Ô&.w.&.7á^ø&.w.&.7.0.. 000000
 26E45EC4 40E80257 88260788 26D65EC4 0C74C008 C02802E8 00018805 75D00802 ..Åu.¡..S.+á.ât.á^ø&..&.W.SMá^Ô& 000020
 9A28161E 8D023206 C79A0229 02C39AE4 5EC40224 02C39AD6 5EC437FF 260277FF .w.&.7á^ø.û.$.á^ô.û.)..û.2....(. 000040
 04A69A02 5002569A D88808C4 83024807 8E9A0241 03EF9ADC 8808EC83 023C0699 ..<..S..É.ÿ.A../.K..á..Ä.V.P..Ì. 000060
 5EC40477 FF260677 FF26E45E C4025789 26078926 D65EC402 7C00FC9A 50520257 W.RP.=.|.á^ø&..&.W.á^Ô&.w.&.w.á^ 000080
 D65EC400 74C008C0 2802E800 01880575 D00802A3 01309A04 77FF2606 77FF2606 ø&.w.&.w..0.Ê..Åu.¡..S.+á.ât.á^ø 0000A0
 028302C3 9A045F8D E45EC402 AE02C39A 045F8DD6 5EC454E8 06578826 04478826 &.G.&.W.STá^ø._..û.Û.á^ô._..û.°. 0000C0
 08C48302 0507BE9A 02C803EF 9ADC8808 EC8302C6 06999A28 161E8D02 8C06C79A .ú.¥....(...ó.¯S..É.ÿ.û..7.(..á. 0000E0
 5EC4FFFF 00FC9A04 77FF2606 77FF26E4 5EC45052 02EC04A6 9A020A02 569A0888 .Ä.V.Ö..Ì.$.RPá^Ô&.w.&.w..=...á^ 000100
 5688E846 882476E8 4639057F 287CEA56 39F25688 F0468806 57892604 47892606 ø&.G.&.W..FÞ.V·9vö|+..9FÒv$.FÒ.V 000120
 88F25689 F04689D4 56880246 88EA5689 E84689F2 5688F046 88045689 D24689EA ô.Fø.Vå.FÞ.V·.FÒ.VÒ.Fø.Vå.FÞ.V·. 000140
 F44688D0 5689CE46 89EE5688 EC468824 76EC4639 057F287C EE5639F6 5688F446 F¶.V-9VŸ|+..9F±v$.F±.VŸ.Fö.VÅ.F¶ 000160
 89260E56 880C4688 FC5EC4F6 5689F446 89005688 CE4688EE 5689EC46 89F65688 .V-.F±.VŸ.Fö.VÅ.F¶.V-á^=.FÉ.V8&. 000180
 76800C7F 8DFC5EC4 1FA5F200 08891F16 1EE8768D 1C7F8DFC 5EC40457 89260247 G.&.W.á^=....vÒ...¿...É.á^=....v 0001A0
 77FF2616 77FF260C 5EC4E256 89E04689 FE5688FC 46881FA5 F2000889 1F161EE8 Ò...¿...É..F=.V±.FÅ.Väá^É&.w.&.w 0001C0
 FFFF9AFC 76FFFE76 FFDA76FF 1374C008 FFFF0290 9A505200 6A016A00 6A006A14 .j.j.j.j.RP......ât..vÖ.v±.v=... 0001E0
```

```
Dump of file SATURN:[PCCOMMON.DUMP.DLL]BRD.TMP;1 on 18-APR-1990 10:36:59.83
File ID (519,15,0)   End of file block 272 / Allocated 272

Virtual block number 67 (00000043), 512 (0200) bytes

88E0468B 065EC400 013447C7 26FC5EC4 00013047 C726FC5E C426E88E 07B80000 ..|..$&á^=&úG0..á^=&úG4..á^..FÀ. 000000
4688088E 0008881E 000008C8 000CCAC9 5F5E1F00 EBC02802 57892607 8926E256 Vâ&..&.W.+âŠ..^_èò..à....|...Ä.F 000020
88260247 8B26FC5E C4FE5689 FC468908 56880646 8867EB8D F3880575 08460806 ..F.u.|µ.Şg.F..V̈..F•.V±á^=&.G.&. 000040
0EFC76FF FE76FF00 6A006A00 6A006A17 75023F83 26F85EC4 FA5689F8 46890457 W..F%.V•á^Y&.?.u.j.j.j.j..v±.v•. 000060
0574C008 08C483FF FF044A9A FB76FFFA 76FF0676 FF0876FF 2AE80CC4 83057CE8 Ò|..á.$•.v..v..v•.v%.J....á..ât. 000080
8E040AB8 1E000012 C80004CA C91F00E8 C0280001 3247C726 FC5EC400 E88E07B8 |..Š.á^=&úG2..+âŠ..èò..à....|... 0000A0
0A7E8306 7408460B 064688OE 7F070A7E 83147C00 0A7E831A 740E4608 0C4688D8 Ä.F..F.t..~..|..~.....F..F.t..~. 0000C0
26077500 327F8326 FC5EC4FE 5689FC46 890E5688 0C468800 E6E980F3 88067506 .u.|µ.Ôl..F..V..F•.V±á^=&..2.u.& 0000E0
76FF0876 FF5016F8 468D5016 F4468D50 16F2468D 00C3E98E 00880674 0C..7F83 ....t.|..Ôü..F·.P.F¶.P.F%.P.v..v 000100
76FFFA76 FF0094E9 8E008806 7400F27E 830675C0 0812C483 05A2E80E 0A76··06 ..v..ÒÅ..á..âu..~·.t.|..Õ...v•.v 000120
F45EC472 E88E07B8 0574C008 038E0290 9A0C76FF 0E76FF00 6A016A00 6A006·F8 %j.j.j.j..v..v..../..ât.|..Şrá^¶ 000140
06478926 08568806 4688FC5E C40A4789 260A4688 FC5EC400 02578326 01078326 &...&.W..á^=.F.&.G.á^=.F..V.&.G. 000160
1E9A5016 EE468D0C 76FF0E76 FF1477FF 261677FF 26025FC4 26FC5EC4 08578926 &.W.á^=&á_.&.w.&.w..v..v..FŸ.P.. 000180
76FF1477 FF261677 FF26025F C426FC5E C41C74FF F07E8306 75FFEE7E 83059909 ....-Ÿ.u..~Þ.t.á^=&á_.&.w.&.w..v 0001A0
4688088E 0480881E 000010C8 000ACAC9 1F00EBC0 28052205 D09A006A EE76FFF0 Þ.vŸj..Ä.".+âŠ..èò..Ä....|...Ä.F 0001C0
000A7F83 26FC5EC4 FE5689FC 46890856 88064688 00CEE98D F3880675 08460806 ..F.u.|µ.Ôò..F..V..F=.V±á^=&.... 0001E0

Dump of file SATURN:[PCCOMMON.DUMP.DLL]BRD.TMP;1 on 18-APR-1990 10:36:59.83
File ID (519,15,0)   End of file block 272 / Allocated 272

Virtual block number 68 (00000044), 512 (0200) bytes

77FF2606 77FF2608 77FF2650 16F8468D 5016F046 8D006A00 6A0083E9 C0280575 u.+âÔ°.j.j..FÞ.P.F%.P&.w.&.w.&.w 000000
7E830630 091E9A50 16F4468D 0676FF08 76FFF876 FFFA76FF 12C48304 A5E80E0A ..ÒE..á..v•.v%.v..v..F¶.P...0..~ 000020
05D09A00 6AF476FF F676FFF8 76FFFA76 FF68E88E 01880575 FFF67E83 0875FFF4 ¶.u..-~.u.|..Şk.v•.v%.v~.v¶j..Ä. 000040
FF26025F C426FC5E C400025F 8326012F 8326F05E C44FE88E 07B80574 C0080667 g..ât.|..$Oá^Þ&./.&._..á^=&á_.&. 000060
8E07B805 74C00805 7102909A 0676FF08 76FF006A 016A006A 006A1477 FF261677 w.&.w.j.j.j.j..v..v....q..ât.|.. 000080
C80004CA C91F00E8 06478926 08478926 C028FC5E C400000A 47C726FC 5EC418E8 Š.á^=&úG...á^=+â&.G.&.G.Š..èò..à 0000A0
26085688 0646880A 5EC415E8 8DF38805 750C4608 0A468808 8E05AAB8 1E000000 ....|^..Ä.F..F.u.|µ.Š.á^..F..V.& 0000C0
0C46080A 4688088E 0695881E 000000C8 0008CAC9 1F00EBC0 2B2E5789 262C4789 .G,&.W.+âŠ..èò..à....|...Ä.F..F. 0000E0
07892606 5EC42E57 88262C47 88260A5E C419E880 F3880575 08460806 46880874 t..F..F.u.|µ.Š.á^.&.G,&.W.á^.&.. 000100
740C4608 0A468808 8E06C688 1E565700 001CC800 08CAC91F 00E8C028 02578926 &.W.+âŠ..èò..à...WV.|ó..Ä.F..F.t 000120
56880646 88FE5689 FC46890C 56880A46 880121E9 8DF38806 75084608 06468808 ..F..F.u.|µ.Ôl..F..V..F=.V±.F..V 000140
4639057F 287CEE56 39F65688 F446881F A5F20008 890A8E1E 0716F088 EC7E8008 ..-&.Þ....Ò¿...É..F¶.V-9VŸ|+..9F 000160
5688E846 88EE5689 EC4689F6 5688F446 88EA5689 E84689EE 5688EC46 882476EC &v$.F&.VŸ.FÒ.Võ.F¶.V-.F&.VŸ.FÒ.V 000180
89F25688 F0468824 76F04639 057F287C F25639FA 5688F846 88F65689 F44689EA ð.F¶.V-.F%.V•9V·|+..9FÞv$.FÞ.V·. 0001A0
FC5EC4FA 5689F846 89E65688 E44688F2 5689F046 89FA5688 F8468BE6 5689E446 FÒ.Vl.F%.V•.FÞ.V·.FÒ.Vl.F%.V•á^= 0001C0
26FC5EC4 1FA5F200 08890A8E 1EF0881C 7F80000C 05C28CC3 881E7500 367F8326 &..6.u..ù.ô.......Þ..Ò¿...É.á^=& 0001E0

Dump of file SATURN:[PCCOMMON.DUMP.DLL]BRD.TMP;1 on 18-APR-1990 10:36:59.83
File ID (519,15,0)   End of file block 272 / Allocated 272

Virtual block number 69 (00000045), 512 (0200) bytes

F65688F4 46883A75 0E573926 40750C47 3926EE56 88EC4688 FC5EC400 013647C7 úG6..á^=.F&.VŸ&9G.u@&9W.u:.F¶.V- 000000
46881675 12573926 1C751047 3926F256 88F04688 28751657 39262E75 14473926 &9G.u.&9W.u(.FÞ.V·&9G.u.&9W.u..F 000020
0008891F 161EEC76 8D0C7F8D 1CE8C028 04751A57 39260A75 18473926 FA5688F8 %.V•&9G.u.&9W.u.+âŠ.....v&...¿.. 000040
05881E56 57000000 C80008CA C95F5E1F 00E8C028 00013447 C726FC5E C41FA5F2 ·É.á^=&úG4..+âŠ..^_èò..à...WV.|. 000060
56880A46 88065EC4 1DE880F3 88057508 46080646 8808740C 46080A46 88D88E07 ..Ä.F..F.t..F..F.u.|µ.Š.á^..F..V 000080
000008C8 0008CAC9 5F5E1F00 E8C0281F A5F20008 890A8E1E F088F888 000C050C .....«.Þ..Ò¿..·É.+âŠ..^_èò..à... 0000A0
5EC400BC E98DF388 06750846 0806468B 08740C46 080A4688 D88E084F 881E5657 WV.|O..Ä.F..F.t..F..F.u.|µ.ÒŸ.á^ 0000C0
890C5688 0A468800 A1E9C028 05750647 08260447 88260F75 02470826 07882606 .&..&.G.u.&.G.&.G.u.+âÒÄ..F..V.. 0000E0
1FA5F200 08890A8E 1EF0881C 7F80000C 051A7500 367F8326 FC5EC4FE 5689FC46 F=.V±á^=&..6.u........Þ..Ò¿..·É. 000100
88260788 26065EC4 FA5689F8 4689000C 05FE5688 FC468800 013647C7 26FC5EC4 á^=&úG6...F•.V±....F%.V•á^.&..&. 000120
11260447 0126F85E C4065788 26044788 26065EC4 02571126 070126F8 5EC40257 W.á^Y&..&.W.á^.&.G.&.W.á^Y&.G.&. 000140
88260447 8826065E C40A5711 26084701 26F85EC4 02578826 07882606 5EC40657 W.á^.&..&.W.á^Y&.G.&.W.á^.&.G.&. 000160
08CAC95F 5E1F00E8 C0280001 3447C726 FC5EC40E 5711260C 470126F8 5EC40657 W.á^Y&.G.&.W.á^=&úG4..+âŠ..^_èò. 000180
46080646 8808740C 46080A46 88107410 46080E46 88088E08 94881E00 0004C800 .à....|...Ä.F..F.t..F..F.t..F..F 0001A0
89260A5E C40A4788 26FC5EC4 FE5689FC 46891056 880E4688 32E880F3 88057508 .u.|µ.Ş2.F..V..F=.V±á^=&.G.á^.&. 0001C0
C8000CCA C91F00E8 C0280257 89260789 26065EC4 08578826 06478826 FC5EC407 .á^=&.G.&.W.á^.&..&.W.+âŠ..èò..à 0001E0
```

Dump of file SATURN:[PCCOMMON.DUMP.DLL]BRD.TMP;1 on 18-APR-1990 10:36:59.83
File ID (519,15,0)   End of file block 272 / Allocated 272

Virtual block number 70 (00000046), 512 (0200) bytes

```
88260247 882606FE C40080E9 8DF38806 75084608 06468808 8E0977B8 1E00000C ....|W..Ã.F..F.u.|ж.Õ¯.á^.&.G.&. 000000
0E76FF10 76FF2574 0C46080A 4688FE56 89FC4689 C28CC388 FA5689F8 46890457 W..F%.V².û.ô.F=.V±.F..F.t%.v..v. 000020
FF14C483 04670000 9A066AFC 76FF5230 77FF2650 52000C05 C3880A76 FF0C76FF .v..v..û...RP&.wOR.v=j....@..á.. 000040
9A5016F4 4680FC76 FFFE76FF 1477FF26 1677FF26 F85EC4F8 68E80EFC 76FFFE76 v±.v=.Òk«á^½&.w.&.w..v±.v=.F¶.P. 000060
76FFF676 FF1477FF 261677FF 26F85EC4 1874FFF6 7E830675 FFF47E83 0A76091E ..v..-¶.u..—.t.á^½&.w.&.w..v—.v 000080
F2880574 C0080000 03CE9A06 76FF0876 FF0677FF 26F85EC4 060C0500 9A006AF4 ¶|..Ã...á^½&.w..v..v..ö....ât.¡· 0000A0
0A568808 46880131 E9064688 D88E0905 881E0000 04C8C8C9 1F00EBC0 2804E88D .Š.+âŠ..èùà....¡f..Ã.F.Ô1..F..V. 0000C0
26FC5EC4 07892614 5EC4008C 878826FC 5EC40E74 16460814 4688FE56 89FC4689 .F=.V±.F..F.t.á^=&....á^.&..á^=& 0000E0
07892600 6A05FE56 88FC4688 105EC402 57892607 89260C5E C4685788 26664788 .Gf&.Wná^.&..&.W.á^..F=.V±.j.&.. 000100
8826FC5E C4007416 46081446 88FE5689 FC46890A 56880846 8800FEE9 02578926 &.W.Ô±..F..V..F=.V±.F..F.t.á^=&. 000120
105EC402 57892607 89260C5E C4525788 26504788 26FC5EC4 07892614 5EC46447 Gdá^.&..á^=&.GP&.WRá^.&..&.W.á^. 000140
88FE5689 FC46890A 56880846 880082E9 02578926 07892600 5405FE56 88FC4688 .F=.V±.T.&..&.W.Ôý..F..V..F=.V±. 000160
C4285788 26264788 26FC5EC4 07892614 5EC43447 8826FC5E C4007416 46081446 F..F.t.á^=&.G4á^.&..á^=&.G&&.W(á 000180
46886 7EB 02578926 07892600 2A05FE56 88FC4688 105EC402 57892607 89260C5E ^.&..&.W.á^..F=.V±.*.&..&.W.$g.F 0001A0
C4078926 145EC42E 478826FC 5EC40074 16460814 4688FE56 89FC4689 0A568808 ..V..F=.V±.F..F.t.á^=&.G.á^.&..á 0001C0
002805FE 5688FC46 88105EC4 02578926 0789260C 5EC42657 88262447 8826FC5E ^=&.G$&.W&á^.&..&.W.á^..F=.V±.(. 0001E0
```

Dump of file SATURN:[PCCOMMON.DUMP.DLL]BRD.TMP;1 on 18-APR-1990 10:36:59.83
File ID (519,15,0)   End of file block 272 / Allocated 272

Virtual block number 71 (00000047), 512 (0200) bytes

```
430AF70A AA08EBA7 FF2E93C0 03127700 04300001 201AEB1C EB025789 26078926 &..&.W.$.$.-..=..w..â...1$.¨.%.C 000000
00020014 00030065 0203027F 00050036 02030007 CBC91F00 EBC02808 8E084308 .C...+âŠ..èù....6.......e....... 000020
00020000 001700C5 00020000 00140A52 00020022 00030A86 02030000 000C0A2A *...........".. .R.......é....... 000040
08064688 D88EFFFF 881E5657 000056C8 00000000 00000000 00000000 00190AA0 ................âV..WV.|...Ã.F.. 000060
08124688 16751446 08124688 08741046 080E4688 10740C46 080A4688 18740846 F.t..F..F.t..F..F.t..F..F.u..F.. 000080
00F09A50 168C468D 0676FF08 76FF027F E980F388 000007C7 26125EC4 08741446 F.t.á^.&ú...|ж.Õ...v..v..F¥.P.Þ. 0000A0
260E5EC4 07892602 478926C0 280E5EC4 3673018C 7E83067C 3E7F008E 7E83000B Û..-ƒ..>|..-¥.s6á^.+â&.G.&..á^.& 0000C0
125EC40C 4789260E 4789260E 5EC40847 89260A47 89260E5E C4044789 26064789 .G.&.G.á^.&.G.&.G.á^.&.G.&.G.á^. 0000E0
8C468800 AC568301 AA468308 EBAA4689 AC4689C0 2B0000AE 46C70228 E9078926 &..Ô+.úFÛ..+â.F¯.F'$..F'..V¯..F¥ 000100
76FFAC76 FF0676FF 0876FF00 ABE90372 AA463908 7C0085E9 037EAC56 398E5688 .V/9V¯-.Õç.|.9F'r.Õ¨..v..v..v¯.v 000120
89C84689 00160582 56898046 89CE5688 CC4688FF FF08689A 5016CC46 8D006AAA ˆj..Fä.P.k....Fä.Vó.F¯.Vý....Fâ. 000140
07160076 8DF07E8C 407500AE 7E8308C4 8315E1E8 0E8076FF 52501600 4680CA56 Vò.FÂ.PR.v¯.ÒÂ..á..-Û.uâ.-Þ.vÂ.. 000160
AE46C71F A5F20006 890A8E1E F088E07E 8DCA5688 C846881F A5F20008 891F161E ...¿..·E..Fâ.Vò.-Ã.Þ..Ô¿..·E.úFÛ 000180
CA76FF50 16E04680 25E88656 89844689 005E0504 57882602 47882680 5EC40001 ..á^¯&.G.&.W..^..FÇ.VÑ$%.FÂ.P.vò 0001A0
FF35E908 C483FFFF 0CFE9A50 16004680 5016F046 8D08C483 01680CFE 9AC876FF .vâ.±.h..á..FÞ.P.FÂ.P.±....á.Õ5. 0001C0
D201E001 06578826 04478826 C65689C4 46890201 E0D10257 88260788 26845EC4 á^Ç&..&.W.¡Âì@.Fá.Vó&.G.&.W.¡Âì@ 0001E0
```

Dump of file SATURN:[PCCOMMON.DUMP.DLL]BRD.TMP;1 on 18-APR-1990 10:36:59.83
File ID (519,15,0)   End of file block 272 / Allocated 272

Virtual block number 72 (00000048), 512 (0200) bytes

```
46888A56 89884689 C65613C4 4603F256 18F0462B E25688E0 4688C256 89C04689 .Fâ.Vò.FÂ.Vä+FÞ.V·.Fâ.Vó.F¡.Vα.F 000000
4E888A76 88067388 4E38057C 007F8A76 38127788 26104F88 260A5EC4 E25688E0 Â.Vâá^.&.O.&.w.;vα..|.;N¡s..vα.N 000020
5613C046 03F6561B F4462BE6 5688E446 88025789 26078926 0E5EC406 18C12888 ¡+è.ø6^.&..&.W..Fð.V|+F¶.V-.Fâ.V 000040
38057C0D 7F8A7638 16778826 144F8826 0A5EC4E6 5688E446 888A5689 884689C2 ö.F¡.Vα.Fð.V¡á^.&.O.&.w.;vα..|.; 000060
28FA5688 F8468806 57892604 4789260E 5EC40618 C128884E 888A7688 0673884E N¡s..vα.N¡+è.ø6^.&.G.&.W..F%.V¥+ 000080
7F8A5638 1A578826 :8478826 0A5EC48A 56898846 89C65613 C44603EA 5618E846 FÒ.Vö.Fâ.Vó.F¡.Vαá^.&.G.&.W.;Vα. 0000A0
880A5789 26084789 260E5EC4 EA5613E8 46038846 888A5688 06738846 38057C0D .|.;F¡s..Vα.F¡.FÒ.Vöá^.&.G.&.W.. 0000C0
88261C47 88260A5E C4BA5689 884689C2 5613C046 03EE561B EC4628FE 5688FC46 F=.V±+F$.VÝ.Fâ.Vó.F¡.Vαá^.&.G.&. 0000E0
4789260E 5EC4EE56 13EC4603 8846888A 56880673 88463805 7C0D7F8A 56381E57 W.;Vα..|.;F¡s..Vα.F¡.F$.VÝá^.&.G 000100
D88E0008 881E0000 10C8C8C9 5F5E1F00 E8C02800 0107C726 125EC40E 5789260C .&.W.á^.&ú...+âŠ..^_èùà.....|...Ä 000120
5EC43373 01F87E83 067C387F 00FA7E83 035800F0 9A5016F8 46800676 FF0876FF .v..v..F%.P.Þ.{..-*..;|..-½.s3á^ 000140
08478926 0A478926 125EC404 47892606 47892612 5EC40789 26024789 26C02812 .+â&.G.&..á^.&.G.&.G.á^.&.G.&.G. 000160
8301F046 8308E8F0 4689F246 89C02807 89260E5E C40C4789 260E4789 26125EC4 á^.&.G.&.G.á^.&..+â.F·.FÞŠ..FÞ.. 000180
76FFF276 FF0676FF 0876FF57 73F04639 057C5E7F F25639FA 5688F846 8800F256 V·..F%.V¹9V·.^|.9FÞsW.v..v..v·.v 0001A0
520A76FF 0C76FFF6 5689F446 89FE5688 FC468803 D608689A 5016FC46 8D006AF0 Þj..F=.P.k.ø..F=.V±.F¶.V-.v..v.R 0001C0
02E80001 88057400 00928F83 26087500 00948F83 26F45EC4 08C48300 8DE80E50 P.Ò§..á.á^¶&.¢....u.&.¢....t.¡..Š. 0001E0
```

```
File ID (519,15,0)   End of file block 272 / Allocated 272

Virtual block number 73 (00000049), 512 (0200) bytes

 468800F2 568301F0 468308E8 F04689F2 4689C028 8FEB0096 878926F4 5EC4C028 +åá^¶&....Š.+å.F·.FÞŠ..FÞ..V·..F 000000
 4680006A F076FFF2 76FF0676 FF0876FF 5073F046 39057C57 7FF25639 FA5688F8 ½.V*9V·.W|.9FÞsP.v..v..v·.vÞj..F 000020
 FF1F7400 00968F83 26F45EC4 F65689F4 4689FE56 88FC4688 00500868 9A5016FC •.P.k.P..F•.V±.F¶.V-á^¶&.¢...t.. 000040
 96E80000 009687C7 26F45EC4 0CC4830A 78E80E50 520676FF 0876FF0A 76FF0C76 v..v..v..v.RP.Òx..á.á^¶&ú.....Š. 000060
 1F10C483 F8D4E80E 0676FF08 76FF0A76 FF0C76FF 1276FF14 76FF0E76 FF1076FF .v..v..v..v..v..v..v..v..Ôå«.á.. 000080
 E45EC400 00E246C7 E65689E4 46890856 88064688 D88E02CC 881E0000 1EC8C8C9 èùå.....¡ë..Ä.F..V..Fõ.V|úFã..á^õ 0000A0
 277C00FE 7E83020E 00F09A50 16FC468D 5052EA56 89E84689 40578826 3E478826 &.G>&.Wà.FÒ.VõRP.F•.P.Þ.8..-±.|' 0000C0
 E876FFEA 76FF0A76 FF0C76FF 5016E246 8D5016EC 4680016A 1F7400FC 7E83067F ...-•.t.j..Fã.P.Fã.P.v..v..võ.vÒ 0000E0
 83007FE8 0EE476FF E676FF0A 76FF0C76 FFE276FF 5016EC46 8D12C483 FE32E80E .Ò2±.á..Fá.P.vã.v..v..v|.võ.Ò... 000100
 468804C4 83FFFF00 009AE476 FFE676FF 04C48304 C90C819A E476FFE6 76FF0EC4 á..v|.võ...è..á..v|.võ......á..F 000120
 47892670 478926C0 28E45EC4 08C48306 CBE80EE4 76FF5250 52006E05 E65688E4 õ.V|.n.RPR.võ.Òù..á.á^õ+ä&.Gp&.G 000140
 89267C47 8926E45E C4764789 26784789 26E45EC4 72478926 74478926 E45EC46E ná^õ&.Gt&.Grá^õ&.Gx&.Gvá^õ&.G|&. 000160
 1CC8C8C9 1F008287 89260084 878926E4 5EC47E47 89260080 878926E4 5EC47A47 Gzá^õ&....&.G-á^õ&....&.....èùå. 000180
 F4468900 16050646 88F25689 F0468900 06050856 88064688 D88E0438 881E0000 ...¡8..Ä.F..V.....FÞ.V·.F.....F¶ 0001A0
 267A4788 26065EC4 02571126 070126F4 5EC47857 88267647 8826065E C4F65689 .V-á^.&.Gv&.Wxá^¶&..&.W.á^.&.Gz& 0001C0
 470126F4 5EC40080 9788267E 47882606 5EC40657 11260447 0126F45E C47C5788 .W|á^¶&.G.&.W.á^.&.G-&....á^¶&.G 0001E0

Dump of file SATURN:[PCCOMMON.DUMP.DLL]BRD.TMP;1 on 18-APR-1990 10:36:59.83
File ID (519,15,0)   End of file block 272 / Allocated 272

Virtual block num'er 74 (0000004A), 512 (0200) bytes

 0E7E830E 5711260C 470126F4 5EC40084 97882600 82878826 065EC40A 57112608 .&.W.á^.&....&....á^¶&.G.&.W..~. 000000
 57882607 88260A5E C408C483 01560CFE 9A1076FF 1276FFF4 76FFF676 FF147400 .t..v-.v¶.v..v..±.V..á.á^.&..&.W 000020
 0A578826 08478826 F45EC4EE 5689EC46 89065788 26044788 26FE5689 FC468902 ..F•.V±&.G.&.W..F&.VYá^¶&.G.&.W. 000040
 FE5613FC 46030257 88260788 261573FC 4638057C 1C7FFE56 38025718 26072826 &+.&.W.;V±..|.;F•s.&..&.W..F•.V± 000060
 1D7FEE56 38065718 26044728 260E5788 260C4788 26F45EC4 0A578926 08478926 &.G.&.W.á^¶&.G.&.W.&+G.&.W.;VŸ.. 000080
 065EC40E 5789260C 478926EE 5613EC46 03065788 26044788 261673EC 4638057C |.;F&s.&.G.&.W..F&.VY&.G.&.W.á^. 0000A0
 F65688F4 4688023C E9037500 0E7E83FA 5689F846 89005605 04578826 02478826 &.G.&.W..V..F½.V*.-..u.Õ<..F¶.V- 0000C0
 08068A01 309A37FF 260277FF 26E85EC4 37FF2602 77FF26F8 5EC4EA56 89E84689 .FÒ.Võó^½&.w.&.7á^Õ&.w.&.7.0.¤.. 0000E0
 77FF26F8 5EC444E8 02578826 078826E8 5EC40C74 C008C028 02E80001 88057500 Åu.¡..Š.+ã.ât.á^Õ&..&.W.ŠDá^½&.w 000100
 EF9ADC88 08EC8306 D106C79A 06C702C3 9AF85EC4 06C202C3 9AE85EC4 37FF2602 .&.7á^Õ.ú.ô.á^½.û.ú..ú.Ì..&..É.ÿ 000120
 5EC40711 00FC9A50 5206EC04 A69A06E5 02569AD8 8808C483 06E0078E 9A060603 .ø..ƒ.Á..á..Ä.V.Ì..Ì.&.RP.•...á^ 000140
 309A0477 FF260677 FF26E85E C40477FF 260677FF 26F85EC4 02578926 078926E8 Õ&..&.W.á^½&.w.&.w.á^Õ&.w.&.w..0 000160
 C448E806 57882604 478826E8 5EC40D74 C008C028 02E80001 88057500 08073801 .8..Åu.¡..Š.+ã.ât.á^Õ&.G.&.W.ŠKá 000180
 9ADC8808 EC830752 06C79A07 4802C39A 045F8DF8 5EC40743 02C39A04 5F8DE85E ^Õ._..û.C.á^½._..û.H..û.R..&..É. 0001A0
 77FF26F8 5EC45052 077804A6 9A076602 569AD888 08C48307 61078E9A 075703EF ÿ.W..ƒ.a..á..Ä.V.f..Ì.x.RPá^½&.w 0001C0
 46890008 05F65688 F4468806 57892604 478926E8 5EC407A8 00FC9A04 77FF2606 .&.w..•.¨.á^Õ&.G.&.W..F¶.V-....F 0001E0

Dump of file SATURN:[PCCOMMON.DUMP.DLL]BRD.TMP;1 on 18-APR-1990 10:36:59.83
File ID (519,15,0)   End of file block 272 / Allocated 272

Virtual block number 75 (0000004B), 512 (0200) bytes

 75000807 D801309A 37FF2602 77FF26E8 5EC437FF 260277FF 26F85EC4 EA5689E8 Õ.Võá^½&.w.&.7á^Õ&.w.&.7.0.Ä..Åu 000000
 260277FF 26F85EC4 44E80257 88260788 26E85EC4 0C74C008 C02802E8 0001B805 .¡..Š.+ã.ât.á^Õ&..&.W.ŠDá^½&.w.& 000020
 F403EF9A DC8808EC 8307EF06 C79A07E5 02C39AF8 5EC407E0 02C39AE8 5EC437FF .7á^Õ.û.Á.á^½.û.Ì..ú.ÿ..&..É.ÿ.¶ 000040
 26E85EC4 082F00FC 9A505208 0A04A69A 08030256 9AD88808 C48307FE 07CE9A07 ..ö.±..á..Ä.V....Ì...RP.•./.á^Õ& 000060
 5601309A 0477FF26 0677FF26 E85EC404 77FF2606 77FF26F8 5EC40257 89260789 ..&.W.á^½&.w.&.w.á^Õ&.w.&.w..0.V 000080
 E85EC44B E8065788 26044788 26E85EC4 0074C008 C02802E8 0001B805 75000808 ..Åu.¡..Š.+ã.ât.á^Õ&.G.&.W.ŠKá^Õ 0000A0
 03EF9ADC 8808EC83 087006C7 9A086602 C39A045F 8DF85EC4 086102C3 9A045F8D ._..û.•.á^½._..û.f..û.p..&..É.ÿ. 0000C0
 260677FF 26F85EC4 50520896 04A69A08 8402569A D88808C4 83087F07 CE9A0875 u..ö....á..Ä.V....Ì...RPá^½&.w.& 0000E0
 89E44689 F65688F4 46880250 E9065789 26044789 26E85EC4 FFFF00FC 9A0477FF .w..•...á^Õ&.G.&.W.Õ)..F¶.V-.Fõ. 000100
 88057500 0808F601 309A37FF 260277FF 26E45EC4 37FF2602 77FF26F8 5EC4E656 V|á^½&.w.&.7á^Õ&.w.&.7.0.-..Åu.¡ 000120
 37FF2602 77FF26F8 5EC44DE8 02578826 078826E4 5EC40C74 C008C028 02E80001 ..Š.+ã.ât.á^Õ&..&.W.ŠMá^½&.w.&.7 000140
 EC830916 06999A28 1E1E8009 0C06C79A 090302C3 9AF85EC4 08FE02C3 9AE45EC4 á^õ.û.±.á^½.û....ú......(......& 000160
 FC9A5052 093104A6 9A092A02 569AD888 08C48309 25078E9A 091803EF 9ADC8808 ..É.ÿ....ƒ.%..á..Ä.V.*..Ì.1.RP.• 000180
 260677FF 26E45EC4 0477FF26 0677FF26 F85EC402 57892607 8926E45E C4095600 .V.á^õ&..&.W.á^½&.w.&.w.á^Õ&.w.& 0001A0
 88260447 8826E45E C40074C0 08C02802 E80001B8 05750008 09700130 9A0477FF .w..0.)..Åu.¡..Š.+ã.ât.á^Õ&.G.&. 0001C0
 80099606 C79A098D 02C39A04 5F8DF85E C4098802 C39A045F 8DE45EC4 54E80657 W.ŠTá^õ._..û...á^½._..û....ú.... 0001E0
```

Dump of file SATURN:[PCCOMMON.DUMP.DLL]BRD.TMP;1 on 18-APR-1990 10:36:59:83
File ID (519,15,0)   End of file block 272 / Allocated 272

Virtual block number 76 (0000004C), 512 (0200) bytes

```
B402569A D88808F4 8309AF07 8E9A09A5 03EF9ADC 8808EC83 09A00699 9A281E1E ..(......&..É.ÿ.É../.É..á..Ä.V.Ç 000000
26044789 26E45EC4 09F900FC 9A0477FF 260677FF 26F85EC4 505209C6 04A69A09 ..Î.ó.RPá^½&.w.&.w..=.'.á^ô&.G.& 000020
26E45EC4 37FF2602 77FF26F8 5EC4E656 89E44689 000805F6 5688F446 88065789 .W..F¶.V-....Fö.VÎá^½&.w.&.7á^ô& 000040
078826E4 5EC40C74 C008C028 02E80001 88057500 080A2601 309A37FF 260277FF .w.&.7.0.&..Àu.¡..Š.+à.àt.á^ô&.. 000060
0A3302C3 9AF85EC4 0A2E02C3 9AE45EC4 37FF2602 77FF26F8 5EC44DE8 02578826 &.W.ŠMá^½&.w.&.7á^ô.ü....á^%.ü.3. 000080
08C4830A 5507BE9A 0A4803EF 9ADC8808 EC830A46 06999A28 1E1E8D0A 3C06C79A .ü.<....(...F..&..É.ÿ.K../.U..á. 0000A0
F85EC402 57892607 8926E45E C40A8600 FC9A5052 0A6104A6 9A0A5A02 569AD888 .Ä.V.Z..Î.a.RP.=...á^ô&..&.W.á^½ 0000C0
E80001B8 0575D008 UAAD0130 9A0477FF 260677FF 26E45EC4 0477FF26 0677FF26 &.w.&.w.á^ô&.w.&.w...0.Û..Àu.¡..Š 0000E0
C40A8802 C39A045F 8DE45EC4 54E80657 88260447 8826E45E C40D74C0 08C02802 .+à.àt.á^ô&.G.&.W.ŠTá^ô._...û.¡.á 000100
03EF9ADC 8808EC83 0AD00699 9A281E1E 8D0AC606 C79A0A8D 02C39A04 5F8DF85E ^%._..û.§..ú.ó....(...Å..ǎ..É.ÿ. 000120
260677FF 26F85EC4 50520AF6 04A69A0A E402569A D88808C4 830ADF07 8E9A0AD5 ¡..7.Ó..á..Ä.V.ô..Î.-.RPá^½&.w.& 000140
5EC46875 00008A8F 8326065E C4065789 26044789 26E45EC4 068D00FC 9A0477FF .w..=...á^ô&.G.&.W.á^.&.¢...uhá^ 000160
57882608 478826F4 5EC45075 02573926 56750739 26F05EC4 02578826 078826F4 ¶&..&.W.á^Þ&9.uV&9W.uPá^¶&.G.&.W 000180
3926F05E C4065788 26044788 26F45EC4 36750A57 39263C75 08473926 F05EC40A .á^Þ&9G.u<&9W.uóá^¶&.G.&.W.á^Þ&9 0001A0
39260875 0C473926 F05EC40E 5788260C 478826F4 5EC41C75 06573926 22750447 G.u"&9W.u.á^¶&.G.&.W.á^Þ&9G.u.&9 0001C0
567F8326 077F1F7C 00587F83 26065EC4 00010094 87C72606 5EC433E8 02750E57 W.u.Š3á^.&ú.....á^.&..X.|...&..V 0001E0
```

Dump of file SATURN:[PCCOMMON.DUMP.DLL]BRD.TMP;1 on 18-APR-1990 10:36:59.83
File ID (519,15,0)   End of file block 272 / Allocated 272

Virtual block number 77 (0000004D), 512 (0200) bytes

```
000034C8 CBC91F0C C48304BB 09D29A53 06F076FF F276FFF4 76FFF676 FF167400 .t..v-.v¶.v·.vÞ.S.@.É..á..èüà4.. 000000
56880A46 8802A9E9 03750C46 080A4688 08740846 08064688 088E0534 881E5657 WV.¡4..Ä.F..F.t..F..F.u.Ö`..F..V 000020
02478826 065EC40A 568CD846 89004680 1FA5A5A5 A5DA8E1E 0716F088 D07E8D0C ..~Ä.Þ....ÖEEEE..FÄ.FÄ.VÖá^.&.G. 000040
FF260277 FF26D85E C437FF26 0277FF26 F45EC4F6 5689F446 89005605 04578826 &.W..V..F¶.V-á^¶&.w.&.7á^Ä&.w.&. 000060
E802578B 26078826 D85EC40C 74C008C0 2802E800 01880575 D0080C41 01309A37 7.0.A..Àu.¡..Š.+à.àt.á^Ä&..&.W.Š 000080
0C5706C7 9A0C4E02 C39AF45E C40C4902 C39AD85E C437FF26 0277FF26 F45EC44D Má^¶&.w.&.7á^Ä.û.I.á^¶.û.N..ú.W. 0000A0
02569AD8 8808C483 0C7007BE 9A0C6603 EF9ADC88 08EC830C 6106999A 281E1E8D ...(...a..&..É.ÿ.f../.p..á..Ä.V. 0000C0
260677FF 26F45EC4 02578926 07892608 5EC40CA1 00FC9A50 520C7C04 A69A0C75 u..Î.|.RP.=.Ä.á^Ä&..&.W.á^¶&.w.& 0000E0
C008C028 02E80001 88057500 080CC801 309A0477 FF260677 FF26D85E C40477FF .w.á^Ä&.w.&.w...0.Þ..Àu.¡..Š.+à.à 000100
045F8DF4 5EC40CD3 02C39A04 5F8D085E C454E806 57882604 47882608 5EC40074 t.á^Ä&.G.&.W.ŠTá^Ä._..û.Æ.á^¶._. 000120
078E9A0C F003EF9A DC8808EC 830CE806 999A281E 1E8D0CE1 06C79A0C D802C39A .û.Ä..ú.Ä....(...Š.¯&..É.ÿ.Þ..7. 000140
FC9A0477 FF260677 FF26F45E C4505200 1104A69A 0CFF0256 9AD88808 C4830CFA "..á..Ä.V....Î...RPá^¶&.w.&.w..= 000160
08260447 88260075 02470826 07882608 5EC40657 89260447 8926D85E C408C900 .è.á^Ä&.G.&.W.á^Ä&..&.G.u.&.G.&. 000180
26025688 D04688F0 5EC4F256 89F04689 00160508 56880646 880130E9 03750647 G.u.Ö=..F..V.....FÞ.V·á^Þ.FÄ.V@& 0001A0
D25688D0 4688F05E C0^5711 26044701 26065688 D44688F0 5EC40257 11260701 ..&.W.á^Þ.Fá.V@&.G.&.W.á^Þ.FÄ.V@ 0001C0
9487C726 065EC40E 5711260C 47012606 5688D446 88F05EC4 0A571126 08'70126 &.G.&.W.á^Þ.Fá.V@&.G.&.W.á^.&ú.. 0001E0
```

Dump of file SATURN:[PCCOMMON.DUMP.DLL]BRD.TMP;1 on 18-APR-1990 10:36.59.83
File ID (519,15,0)   End of file block 272 / Allocated 272

Virtual block number 78 (0000004E), 512 (0200) bytes

```
0DEA00F0 9A50160C 46805052 CE5689CC 46894457 88264247 8826065E C4000100 ...á^.&.GB&.WD.Fä.VöRP.FÉ.P.Þ.õ. 000000
39057C39 7FFA5639 DE56880C 468800FA 568301F8 468308E8 F84689FA 4689C028 +à.F'.F½Š..F½..V'..FÉ.V89V'.9|.9 000020
FFDA76FF 0E210868 9A50J6E4 4680006A F876FFFA 76FFCC76 FFCE76FF 3273F846 F½s2.vö.vä.v'.v½j..Fö.P.k.Î..vÖ. 000040
5788263E 47882606 5EC4B4E8 0CC483FF FF08879A E476FFE6 76FF006A 006AD876 vÄj.j..vÎ.vö......á.ŠÇá^.&.G>&.W 000060
E0468308 E8E04689 E24689C0 280E5000 F09A5016 FC468050 52EE5689 EC468940 a.F$.VŸRP.F=.P.Þ.).+à.Fä.FÄŠ..FÄ 000080
E276FFEC 76FFEE76 FF2D73E0 4639057C 347FE256 39FE5688 FC468800 E2568301 ..Vä..F=.V±9Vä.4|.9FÄs-.vŸ.v$.vä 0000A0
83FD30E8 0EE876FF EA76FFD8 76FFDA76 FF046808 689A5016 E8468000 6AE076FF .vÄj..FÒ.P.k.h..vÖ.vÄ.vö.vÒ.Ò=». 0000C0
F09A5016 F846800A 76FF0C76 FF088E08 84881E00 0016C8C8 C95F5E1F 89E808C4 á.Š¿.^_èüà....¡Ç..Ä.v..v..F½.P.Þ 0000E0
C02B0001 009887C7 26065EC4 00AFE903 7301F87E 83067C08 7F00FA7E 830EE800 .Ò..~'...|..~½.s.ÒÉ.á^.&ú.....+à 000100
FC463905 7C7E7FFE 5639FA56 88F84688 00FE5683 01FC4683 08E8FC46 89FE4689 .F±.F=Š..F=..V±..F½.V'9V±.~|.9F= 000120
EC5688EA 468800AE 08689A50 16EA4680 006AFC76 FFFE76FF 0A76FF0C 76FF7773 sw.v..v..v±.v=j..Fö.P.k.Û..Fö.V$ 000140
76FF1076 FF5016F6 46805016 F2468045 75000098 8F8326EE 5EC4F056 89EE4689 .FŸ.VÞá^Ÿ&.¢...uÉ.F·.P.F-.P.v..v 000160
7076FFF6 76FFF276 FFF476FF 2274C008 14C48304 0FE80E06 76FF0876 FF53520E .RS.v..v..Ò...á..àt".v¶.v·.v-.v. 000180
9887C726 065EC4FF 6FE912C4 830013E8 0EEE76FF F076FF0A 76FF0C76 FF0E76FF .v..v..v..vÞ.vŸ.Ò...á.Öo.á^.&ú.. 0001A0
89EA4689 C02B0001 009887C7 26065EC4 D88E0E7F 881E0000 1CC8CBC9 1F000000 ....èüà....¡...Aá^.&ü.....+à.Fö. 0001C0
EA5689E8 46890AF7 00028308 F716568B 14468848 E8124688 EC4689EE 4689E846 FÒ.FŸ.F$.F.ŠK.F..V.½A.@.½Ò.FÒ.Vö 0001E0
```

```
Dump of file SATURN:[PCCOMMON.DUMP.DLL]BRD.TMP;1 on 18-APR-1990 10:36:59.83
File ID (519,15,0)   End of file block 272 / Allocated 272

Virtual block number 79 (0000004F), 512 (0200) bytes

 EC46890A F7000283 D8F71656 8B14468B 3EEBEA56 89E84689 16568B14 46884CEB ŠL.F..V..FÒ.VõŠ>.F..V.ẌÄ.ø.ẌÖ.F£ 000000
 00023003 7400013D 16EB000D E91BEBEE 5689EC46 8916568B 1446B829 EBEE5689 .VŸ$).F..V..F$.VŸŠ.ÕÏ.Š.=..t£=.. 000020
 08C483F8 BFE80C06 76FF0876 FF5016E8 468DE5EB 86740008 30A67400 0430E374 tD=..tl=..tÑŠl.FÒ.P.v..v..Ò¢«.á. 000040
 568301FC 468308EB FC4689FE 4689C028 103A00F0 9A5016F8 468D0A76 FF0C76FF .v..v..F½.P.Þ.:.+å.F±.F•Š..F=..V 000060
 FC76FFFE 76FF0A76 FF0C76FF 7573FC46 39057C7C 7FFE5639 FA5688F8 468800FE ±..F½.V°9V±.||.9F•su.v..v..v±.v= 000080
 00988F83 26F05EC4 F25689F0 4689E656 88E4468B 0E91086B 9A5016E4 4680006A j..FÕ.P.k....FÕ.Vl.FÞ.V·á^Þ&.¢.. 0000A0
 12C48305 09E80E06 76FF0876 FF53520E 76FF1076 FF1276FF 5016F446 80437500 .uC.F¶.P.v..v..v.RS.v..v..Ò...á. 0000C0
 0EF076FF F276FF0A 76FF0C76 FF0E76FF 1076FF12 76FFF476 FFF676FF 2274C008 .åt".v~.v¶.v..v..v..v..v..v·.vÞ. 0000E0
 D88E0F5C 881E0000 3AC8CBC9 1F000000 9887C726 065EC4FF 71E912C4 83FEC3E8 Òü±.á.Õq.á^.&ú......èüà:...¡\..Ä 000100
 4680C856 89C64689 0016050C 56880A46 88CC5689 CA468900 16050856 88064688 .F..V.....FÒ.Vä.F..V.....Fó.VÀ.F 000120
 8305F1E8 0E0A76FF 0C76FF50 160A468D 08C48306 03E80E06 76FF0876 FF5016EE Ÿ.P.v..v..Ò...á..FÖ.P.v..v..Òþ.. 000140
 56890246 890E5788 260C4788 26085689 D646890A 57882608 4788260E 5EC408C4 á.á^.&.G.&.W..F•.VÄ&.G.&.W..Fø.V 000160
 83FE46FF 03E80000 FE46C7D0 5689CE46 89005E05 04578826 02478826 065EC404 åá^.&.G.&.W..^..Fö.VÅúF±..Š..F±. 000180
 26C65EC4 02D1E001 02578826 078826CE 5EC401C3 E9FE4688 01EDE903 7C04FE7E ~±.|.ÕÚ..F±Õú.á^ö&..&.W.ìÅìøá^ó& 0001A0
 EA4689E4 5613E246 03F05618 EE462802 57132607 0326CA5E C40A5718 2608472B +G.&.W.á^ò&..&.W.+FŸ.VÞ.Fã.VÕ.Fõ 0001C0
 0326C65E C4EA4688 EC568806 73EA463B 057C007F EC5638D8 56880646 88EC5689 .V$.F•.VÁ;V$..|.;Fõs..V$.Fõá^ó&. 0001E0

Dump of file SATURN:[PCCOMMON.DUMP.DLL]BRD.TMP;1 on 18-APR-1990 10:36:59.83
File ID (519,15,0)   End of file block 272 / Allocated 272

Virtual block number 80 (00000050), 512 (0200) bytes

 CE5EC401 75E90257 892607B9 26125EC4 02571826 072826CA 5EC40A57 13260847 G.&.W.á^ò&+.&.W.á^.&..&.W.Õu.á^ö 000000
 02571326 070326C6 5EC40A57 18260847 2826CA5E C402D1E0 D1025788 24078826 &..&.W.ìÅìøá^ò&+G.&.W.á^ó&..&.W. 000020
 38057C0D 7FEC5638 08568806 4688EC56 89EA4689 DC5618DA 4628F856 13F.4603 .F-.V½+FÖ.VÊ.Fõ.V$.F•.VÁ;V$..|.; 000040
 C4025718 26072826 C65EC40A 57132608 470326CA 5EC4EA46 88EC5688 067.'A46 Fõs..V$.Fõá^ò&.G.&.W.á^ó&+.&.W.á 000060
 26CA5EC4 D2D1E0D1 06578826 04478826 CE5EC401 05E90657 89260447 8926125E ^.&.G.&.W.Õ..á^ö&.G.&.W.ìÅìøá^ò& 000080
 4689E856 13E64603 F45618F2 46280E57 18260C47 2826C65E C4065713 26044703 .G.&.W.á^ó&+G.&.W.+F .V¶.Fl.VÒ.F 0000A0
 0C470326 EA4688EC 56880673 EA463805 7C007FEC 56380456 8802468B EC5689EA õ.V$.Fø.Vá;V$..|.;Fõs..V$.Fõ&.G. 0000C0
 CE5EC400 95E90A57 89260847 8926125E C4065718 26044728 26CA5EC4 0E571326 &.W.á^ò&+G.&.W.á^.&.G.&.W.Õ..á^ö 0000E0
 13260447 0326C65E C40E5718 260C4728 26CA5EC4 D2D1E0D1 06578826 04478826 &.G.&.W.ìÅìøá^ò&+G.&.W.á^ó&.G.&. 000100
 7C007FEC 56380456 8802468B EC5689EA 4689E056 18DE4628 FC5613FA 46030657 W..F°.V•+Fø.VÁ.Fõ.V$.Fø.Vá;V$..| 000120
 18260447 2826C65E C40E5713 260C4703 26CA5EC4 EA4688EC 56880673 EA463805 .;Fõs..V$.Fõá^ò&.G.&.W.á^ó&+G.&. 000140
 FE9DE903 7500013D FE36E903 75C00821 EB23EB0E 5789260C 47892612 5EC40657 W.á^.&.G.&.W.Š#Šl.åu.Õó±=..u.Õ.± 000160
 000020C8 C8C91F00 E8C028FE 07E900EB FF60E903 7500033D FF05E903 7500023D *..u.Õ..=..u.Õm.Š.Õ.±+éŠ..èüà .. 000180
 88107410 46080E46 8818740C 46080A46 88207408 46080646 8808BE10 AC881E56 V.¡¯..Ä.F..F.t .F..F.t..F..F.t.. 0001A0
 FF0E76FF 1076FF50 16F0468D 020EE9C0 28057518 46081646 88087414 46081246 F..F.t..F..F.u.+äÕ...FÞ.P.v..v.. 0001C0
 F07E8309 7F0101E9 037D00F2 7E8310C4 83FD27E8 0E0676FF 0876FF0A 76FF0C76 v..v..v..v..Ò'».á..-·.).Õì....-Þ 0001E0

Dump of file SATURN:[PCCOMMON.DUMP.DLL]BRD.TMP;1 on 18-APR-1990 10:36:59.83
File ID (519,15,0)   End of file block 272 / Allocated 272

Virtual block number 81 (00000051), 512 (0200) bytes

 037D00FA 7E8301B2 E9037500 F47E8309 7F01B0E9 037D00F6 7E8301C6 E9037500 .u.Õó..-~.).Õ§....-¶.u.Õý..-•.). 000000
 E9037500 FC7E8309 7F0195E9 037D00FE 7E83019E E9037500 F87E8309 7F01A9E9 Õ`....-%.u.Õ..-±.).Õ.....-ø.u.Õ 000020
 EE7E83EE 46FF03EB 0001EE46 C7E85689 E64689F2 5688F046 880004E4 46C7018A ..üFõ...FÞ.V·.Fl.VÕúFŸ..Š..FŸ.-Ÿ 000040
 1F7FE256 39E8568B E64688E2 5689E046 89F2528B F0428B02 E6C1EE76 883E7D04 .)>.vŸè|..ßÞ.R·.FÀ.Vä.Fl.VÕ9Vä.. 000060
 E8E85689 E64689E2 5688E046 88E44689 031887B8 E3D1EE5E 881873E0 4639057C |.9FÀs..^ŸlD.....FÕ.FÀ.Vä.Fl.VÕŠ 000080
 7508E47E 83067404 E47E83EC 5689EA46 89005605 04578826 02478826 065EC489 ¿á^.&.G.&.W..V..FÕ.Vê.-Õ.t..-Õ.u 0000A0
 2802E800 01880575 D0081480 01309AE6 76FFE876 FF37FF26 EA5EC472 ... 0000C0
 C4149502 BF9AE65E 8D37FF26 0277FF26 EA5EC444 E8E85688 E6468808 74C008C0 á.át..Fl.VÕŠDá^ò&.w.&.7.^l.¢...á 0000E0
 D88808C4 8314B307 CE9A14A9 03EF9ADC 8808EC83 14A406C7 9A149A02 C39AEA5E ^õ.ü....ú.É..&...É.ý.`..ó.°..á..Ä 000100
 76FF0477 FF260677 FF26EA5E C475EB14 D700FC9A 505214BF 04A69A14 B802569A .V.|..l.¢.RP.•.m.Šuá^ò&.w.&.w..v 000120
 48EBE856 88E64688 0874C008 C02802EB 00018805 75D00814 F601309A E676FFE8 Õ.v|.O.-..Åu.¡..Š.+á.át..Fl.VÕŠH 000140
 03EF9ADC 8808EC83 151006C7 9A150602 C39A045F 8DEA5EC4 1501028F 9AE65E8D .^l.¢...á^õ._..ü....ü....Š..É.ý. 000160
 260677FF 26EA5EC4 50521536 04A69A15 2402569A D88808C4 83151F07 CE9A1515 ....ó.....á..Å.V.Š..l.6.RPá^ò&.w.& 000180
 E8568BE6 4688165E C4078926 E4468812 5EC4E856 89E64689 0C1400FC 9A0477FF .w..•....Fl.Vóá^..Fó&..á^..Fl.VÒ 0001A0
 07892602 478926C0 28165EC4 000807C7 26125EC4 16E80001 88025789 26078926 &..&.W.¡..Š.á^.&ú...á^.+á&.G.&... 0001C0
 740C4608 0A468818 7408460B 06468808 8E13338B 1E560000 10C8CBC9 5E1F00E8 Š..^èüà...V.¡3..Ä.F..F.t..F..F.t 0001E0
```

```
Dump of file SATURN:[PCCOMMON.DUMP.DLL]BRD.TMP;1 on 18-APR-1990 10:36:59.83
File ID (519,15,0)   End of file block 272 / Allocated 272

Virtual block number 82 (00000052), 512 (0200) bytes

 0E76FF10 76FF5016 F046807B E8C02804 75164608 14468808 74104608 0E468810 ..F..F.t..F..F.u.+âŠ(.FÞ.P.v..v. 000000
 7400F07E 83067F53 7C00F27E 8310C483 FAE6E80E 0676FF08 76FF0A76 FF0C76FF .v..v..v..v..Òl*.á..~·.|S...~Þ.t 000020
 FE7E832F 7400F87E 83067F37 7C00FA7E 83307400 F47E8306 7F457C00 F67E8348 K.—.|E...~¶.t¤.~*.|7...~½.t/.~± 000040
 145EC4F2 5288F042 8802E6C1 03208788 E301125E 88217400 FC7E8306 7F297C00 .|)...~•.tl.^.1D.ñ .èl..BÞ.R·á^. 000060
 4688088E 157D881E 000004C8 CBC95E1F 00E8C028 04E80001 88025789 26078926 &..&.W.¡..Š.+áŠ..^èúà....¡)..Ä.F 000080
 56880A46 8823E800 01880575 0C56390A 750A4639 08568806 46883474 0C46080A ..F.t4.F..V.9F.u.9V.u.¡..Š#.F..V 0000A0
 C91F00EB C028C4E8 0C56890A 46893C57 88263A47 8826FC5E C4FE5689 FC46890C ..F•.V±á^•&.G:&.W<.F..V.Šá+âŠ..è 0000C0
 46080E46 8808740C 46080A46 88107408 46080646 88088E16 2A881E00 0002C8C8 ùà....¡*..Ä.F..F.t..F..F.t..F..F 0000E0
 FF9A5016 FE46800A 76FF0C76 FF505200 16050856 88064688 45E880F3 88057510 .u.¡µ.ŠE.F..V....RP.v..v..F±.P.. 000100
 88262826 068EE301 FE5E8818 E8C02800 0807C726 0E5EC40C 7508FE7E 830000FF ....~±.u.á^.&ü...+âŠ..^±1D..&(&. 000120
 08064688 088E1677 881E5657 00002CC8 C8C91F00 E8C02807 89260E5E C401F887 .½.á^.&..+âŠ..èúà,..WV.¡w..Ä.F.. 000140
 F8880016 05085688 0646880A 5EC4030A E980F388 06750C46 080A4688 08740846 F.t..F..F.u.¡µ.Õ..á^..F..V.....« 000160
 C0280573 01567F83 26077C0E 7F00587F 8326065E C41FA5F2 0008890A 8E1EF088 .Þ..Õ¿...É.á^.&..X...|.&..V.s.+â 000180
 160C468D 5052DA56 89084689 44578826 42478826 F6568CF4 4689E446 800209E9 Õl..FÕ.F¶.V-&.GB&.WD.FÄ.VÒRP.FÉ. 0001A0
 56390E56 880C4688 00FE5683 01FC4683 08E8FC46 89FE4689 C0281790 00F09A50 P.Þ...+á.F±.F•Š..F•..V±..FÉ.V89V 0001C0
 08689A50 16F84680 006AFC76 FFFE76FF D876FFDA 76FF4173 FC463905 7C487FFE ±.H|.9F•sA.vÒ.vÁ.v±.v•j..F½.P.k. 0001E0

Dump of file SATURN:[PCCOMMON.DUMP.DLL]BRD.TMP;1 on 18-APR-1990 10:36:59.83
File ID (519,15,0)   End of file block 272 / Allocated 272

Virtual block number 83 (00000053), 512 (0200) bytes

 76FFF676 FF0A76FF 0C76FF08 C483026F E80EF876 FFFA76FF F476FFF6 76FF0FFE ±..v~.v¶.v*.v½.Òo..á..v..v..v~.v 000000
 88E25689 E0468900 5E050457 88260247 8826065E C4A5E808 C48305C2 0CFE9AF4 ¶.±.ó..á.ŠEá^.&.G.&.W..^..FÅ.Vã. 000020
 9A37FF26 0277FF26 D45EC437 FF260277 FF26E05E C4065689 D446890C 56880A46 F..V..Fâ.V•á^Å&.w.&.7á^â&.w.&.7. 000040
 C444E802 57882607 8826045E C40C74C0 08C02802 E8000188 0575D008 181F0130 O....Åu.¡..Š.+â.ât.á^â&..&.W.ŠDá 000060
 EC831836 06C79A18 2C02C39A E05EC418 2702C39A D45EC437 FF260277 FF26E05E ^Å&.w.&.7á^â.û.'.á^Å.û.,..ú.6..& 000080
 FC9A5052 185104A6 9A184A02 569AD888 08C48318 45078E9A 183803EF 9ADC8808 ..É.ÿ.;..ƒ.E..á..Ä.V.J..Ï.Q.RP.= 0000A0
 260677FF 26045EC4 0477FF26 0677FF26 E05EC402 57892607 8926045E C4187600 .v.á^â&..&.W.á^Å&.w.&.w.á^â&.w.& 0000C0
 88260447 8826045E C40D74C0 08C02802 E8000188 0575D008 18900130 9A0477FF .w..0....Åu.¡..Š.+â.ât.á^â&.G.&. 0000E0
 83188706 C79A18AD 02C39A04 5F8DE05E C418A802 C39A045F 8D045EC4 48E80657 W.ŠKá^â._..û.´.á^Å._..û.Ù..ú.ñ.. 000100
 C450521B D004A69A 18C80256 9AD88808 C48318C6 078E9A18 8C03EF9A DC8808EC &..É.ÿ.V..ƒ.ó..á..Ä.V.ù..Ï.Ï.RPá 000120
 0C56880A 46880657 89260447 8926045E C4191000 FC9A0477 FF260677 FF26E05E ^Å&.w.&.w..=...á^â&.G.&.W..F..V. 000140
 01309A37 FF260277 FF26045E C437FF26 0277FF26 E05EC406 5689D446 89000805 ....Fâ.V•á^Å&.w.&.7á^â&.w.&.7.0. 000160
 E05EC444 E8025788 26078826 D45EC40C 74C008C0 2802E800 01880575 D008193D =..Åu.¡..Š.+â.ât.á^â&..&.W.ŠDá^Å 000180
 8808EC83 195406C7 9A194A02 C39AE05E C4194502 C39AD45E C437FF26 0277FF26 &.w.&.7á^â.û.E.á^Å.û.J..ú.T..&.. 0001A0
 9400FC9A 5052196F 04A69A19 6802569A D88808C4 83196307 CE9A1959 03EF9ADC É.ÿ.Y..ö.c..á..Ä.V.h..Ï.o.RP.=.. 0001C0
 77FF2606 77FF2604 5EC40477 FF260677 FF26E05E C4025789 26078926 D45EC419 .á^â&..&.W.á^Å&.w.&.w.á^â&.w.&.w 0001E0

Dump of file SATURN:[PCCOMMON.DUMP.DLL]BRD.TMP;1 on 18-APR-1990 10:36:59.83
File ID (519,15,0)   End of file block 272 / Allocated 272

Virtual block number 84 (00000054), 512 (0200) bytes

 06578826 04478826 D45EC40D 74C008C0 2802E800 01880575 D0081988 01309A04 ..0.E..Åu.¡..Š.+â.ât.á^â&.G.&.W. 000000
 08EC8319 0506C79A 19C802C3 9A045F8D E05EC419 C602C39A 045F8DD4 5EC448E8 ŠKá^â._..û.6.á^Å._..û.ù..ú.(..&. 000020
 E05EC450 5219F804 A69A19E9 02569AD8 8808C483 19E407CE 9A19DA03 EF9ADC88 .É.ÿ.Ö..ö.ô..á..Ä.V.Õ..Ï.«.RPá^Å 000040
 C95F5E1F 00E8C028 06578926 04478926 D45EC414 6400FC9A 0477FF26 0677FF26 &.w.&.w..•.d.á^â&.G.&.W.+âŠ..^_è 000060
 0C46080A 46880874 08460806 46880000 EE46C7D8 8E16E888 1E565700 0032C8C8 ùà2..WV.¡Ò..ÄúFŸ...F..F.t..F..F. 000080
 05085688 0646880A 5EC404C4 830DFF00 FE9A0676 FF0876FF 0344E980 F3880675 u.¡µ.ÕD..v..v..±....á.á^..F..V.. 0000A0
 8826030E E9C02805 7D010A7F 8326065E C41FA5F2 0008890A 8E1EF088 F8880036 6..«.Þ..Õ¿...É.á^.&....).+âÕ..&. 0000C0
 F09A5016 02468DFC 76FF52E8 568CE646 89D6468D FE5689FC 46894A57 88264847 GH&.WJ.F•.V±.F•.Fl.VÒR.v•.F•.P.Þ 0000E0
 727FF256 39D45688 02468800 F2568301 F0468308 E8F04689 F24689C0 281ACD00 .è.+â.F·.FÞŠ..FÞ..V·..F•.VÅ9V·.r 000100
 C4175408 689A5016 F4468D00 6AF076FF F276FFFC 76FFFE76 FF6873F0 4639057C |.9FÞsk.v±.v•.v·.vÞj..F¶.P.k.T.á 000120
 260877FF 26F85EC4 FA5689F8 46890257 88260788 26C2E802 7402067F 8326F45E ^¶&....t.Šó&..&.W..F½.V*á^½&.w.& 000140
 840CFE9A E676FFE8 76FF0A76 FF0C76FF 0000FFFF 9AE676FF E876FF01 6A0677FF .w.j..vÒ.vl......v..v..vÒ.vl.±.Ç 000160
 8826065E C4024DE9 037500EE 7E83FF7B E90001EE 46C70575 00EE7E83 08C48317 ..á..~Ÿ.u.úFŸ..Õ(..~Ÿ.u.ÕM.á^.&. 000180
 FF26EA5E C4D05689 CE46890C 56880A46 88EC5689 EA468900 5E050457 88260247 G.&.W..^..Fõ.VŠ.F..V..Fö.VÅá^õ&. 0001A0
 08C02802 E8000188 05750008 188F0130 9A37FF26 0277FF26 CE5EC437 FF260277 w.&.7á^ö&.w.&.7.0....Åu.¡..Š.+â. 0001C0
 9702C39A CE5EC437 FF260277 FF26EA5E C444E802 57882607 8826CE5E C40C74C0 ât.á^ö&..&.W.ŠDá^õ&.w.&.7á^ö.û.. 0001E0
```

```
Dump of file SATURN:[PCCOMMON.DUMP.DLL]BRD.TMP;1 on 18-APR-1990 10:36:59.83
File ID (519,15,0)   End of file block 272 / Allocated 272

Virtual block number 85 (00000055), 512 (0200) bytes

 08C4831B B507BE9A 1BAB03EF 9ADC8808 EC831BA6 06C79A1B 9C02C39A EA5EC41B .á^ô.û....ú.Î..å..É.ÿ.¨../.ç..á. 000000
 EA5EC402 57892607 8926CE5E C41BE600 FC9A5052 1BC104A6 9A1B8A02 569AD88B .Ä.V.¤..Î.é.RP.•.Î.á^ô&..&.W.á^ô 000020
 EB0001B8 05750J08 1C0D0130 9A0477FF 260677FF 26CE5EC4 0477FF26 0677FF26 &.w.&.w.á^ô&.w.&.w..0....Äu.¡..Š 000040
 C41C1802 C39A045F 8DCE5EC4 4BEB0657 88260447 8826CE5E C40D74C0 08C02802 .+à.át.á^ô&.G.&.W.ŠKá^ô._..ú...á 000060
 C4831C36 07BE9A1C 2C03EF9A DC8808EC 831C2706 C79A1C1D 02C39A04 5F8DEA5E ^ô._..û....ú.'..å..É.ÿ.,./.6..á 000080
 C41C8000 FC9A0477 FF260677 FF26EA5E C450521C 4D04A69A 1C380256 9AD88808 ..Ä.V.;..Î.M.RPá^ô&.w.&.w..•...á 0000A0
 0277FF26 EA5EC4D0 5689CE46 89000805 0C56880A 46880657 89260447 8926CE5E ^ô&.G.Å.W..F..V.....Fö.VÅá^ô&.w. 0000C0
 74C008C0 2802E800 01B80575 D0081CAD 01309A37 FF260277 FF26CE5E C437FF26 &.7á^ô&.w.&.7.0.Ü..Äu.¡..$.+á.át 0000E0
 C41C8502 C39ACE5E C437FF26 0277FF26 EA5EC444 E8025788 26078826 CE5EC40C .á^ô&..&.W.$Dá^ô&.w.&.7á^ö.û.ç.á 000100
 D88808C4 831CD307 CE9A1CC9 03EF9ADC 8808EC83 1CC406C7 9A1C8A02 C39AEA5E ^ô.û.¤..ú.á..å..É.ÿ.è..ö.É..á..Ä 000120
 FF26EA5E C4025789 26078926 CE5EC41D 0400FC9A 50521CDF 04A69A1C D802569A .V.Ä..Î.Ô.RP.•...á^ô&..&.W.á^ô&. 000140
 2802E800 01880575 D0081D28 01309A04 77FF2606 77FF26CE 5EC40477 FF260677 w.&.w.á^ô&.w.&.w..0.+..Äu.¡..$.+ 000160
 EA5EC41D 3602C39A 045F8DCE 5EC44BE8 06578826 04478826 CE5EC400 74C008C0 á.át.á^ô&.G.&.W.ŠKá^ö._..ú.6.á^ô 000180
 8808C483 1D5407CE 9A1D4A03 EF9ADC88 08EC831D 4506C79A 1D3802C3 9A045F8D ._..û.;..ú.E..å..É.ÿ.J¯.ö.T..á.. 0001A0
 CE5EC417 F200FC9A 0477FF26 0677FF26 EA5EC450 521D6804 A69A1D59 02569AD8 Ä¯V.Y..Î.k.RPá^ô&.w.&.w..•.·.á^ö 0001C0
 1A410002 00000001 1B0F0002 000890C8 C95F5E1F 00E8C028 06578926 04478926 &.G.&.W.+áŠ..^_èü............A. 0001E0

Dump of file SATURN:[PCCOMMON.DUMP.DLL]BRD.TMP;1 on 18-APR-1990 10:36:59.83
File ID (519,15,0)   End of file block 272 / Allocated 272

Virtual block number 86 (00000056), 512 (0200) bytes

 18620002 00000014 1A910002 021E0004 1AFC0203 00000008 08A40002 00000004 ......Ê.......•...............b. 000000
 00000000 00000000 00000000 00500004 16AF0203 00000019 1A190002 00000017 ..............£...P............. 000020
 000805C2 8CC38800 8DE90375 001A7F83 26105EC4 D88EFFFF B81E5657 000004C8 à...WV.¡...Äá^.&....u.Ô...û.ô... 000040
 00520CFE 9A0676FF 0876FF50 52107500 0E7E832C 7400187F 8326FE56 89FC4689 .F•.V±&....t,.-..u.RP.v..v..±.R. 000060
 C4187400 0E7E834D E808C483 00980CFE 9A0A76FF 0C76FFFC 76FFFE76 FF08C483 .á..v±.v•.v..v..±....á.ŠM.-..t.á 000080
 08568806 4688FC5E C426EB1F A5F20008 890A8E1E F088F888 0C56880A 4688FC5E ^•.F..V..«.Þ..Ö¿...É.Š&á^•.F..V. 0000A0
 105EC408 C483FFFF 0CFE9A0A 76FF0C76 FF53061F A5F20008 890A8E1E F088F888 .«.Þ..Ö¿...É..S.v..v..±....á.á^. 0000C0
 8826145E C4D88E00 08881E56 57000014 C8CBC95F 5E1F00E8 C0280001 1847C726 &úG...+áŠ..^ èüà...WV.¡...Äá^.&. 0000E0
 890A8E1E F088F888 1056880E 46880A5E C41875D0 08FE5689 FC468902 57882607 .&.W..F•.V±.Äu.á^..F..V..«.Þ..Ö¿ 000100
 145EC41F A5F20008 890A8E1E 0716F088 EC7E8D10 56880E46 886AE81F A5F20008 ...É.Šj.F..V..-å.Þ....Ö¿...É.á^. 000120
 0876FF50 520C5688 0A468806 E899C028 05740012 7E835052 0477FF26 0677FF26 &.w.&.w.RP.-..t.+á.Š..F..V.RP.v. 000140
 1FA5F200 08891F16 1EEC768D F8880A5E C412C483 FC5EFF37 FF26065E C40676FF .v.á^.&.7.^•.á.á^..«.vš...¿...É. 000160
 881E0000 12C8CBC9 5F5E1F00 E8C0281F A5F20008 891F161E EC768DF8 880E5EC4 á^..«.vš...¿...É.+áŠ..^ èüà....¡ 000180
 0676FF08 76FF00AF E98DF388 06750C46 080A4688 08740846 08064688 D88E0087 ñ..Á.F..F.t..F..F.u.¡µ.Ô£..v..v. 0001A0
 0085E903 74C008FF FF0A589A 5016EE46 8D0676FF 0876FF01 9709C29A 006A006A j.j..ô....v..v..FŸ.P.X....át.Ô.. 0001C0
 89001C05 C28CC38  D1E80275 00347F83 26FC5EC4 FE5689FC 4689F056 88EE4688 .FŸ.VÞ.F•.V±á^•&..4.u.Ši.û.ô.... 0001E0

Dump of file SATURN:[PCCOMMON.DUMP.DLL]BRD.TMP;1 on 18-APR-1990 10:36:59.83
File ID (519,15,0)   End of file block 272 / Allocated 272

Virtual block number 87 (00000057), 512 (0200) bytes

 FF52500A 76FF0C76 FFF64689 30478826 FA5689F8 4689000C 05C388F4 5689F246 F .V¶.û....F½.V•&.G0.F-.v..v.PR. 000000
 FFF476FF F876FFFA 76FFF676 FF0A76FF 0C76FF0E C483FE16 E80EF276 FF52F876 V½R.v .Ô.±.á..v..v..v-.v•.v½.v¶. 000020
 830597E8 0E066AEE 76FFF076 FF006A00 6A12C483 FEA3E80E EE76FFF0 76FFF276 v .vÞ.vŸ.Ô£±.á.j.j..vÞ.vŸj..Ô... 000040
 46880874 08460806 4688088E 01608B1E 000032C8 CBC91F00 EBC028FF 64E90AC4 á.Ôd.+áŠ..èüà2...¡'..Ä.F..F.t..F 000060
 47882606 5EC40002 F246C7F0 568CEE46 890E468D 01D9E98D F3880675 0C460B0A ..F.u.¡µ.Ô)..F8.FŸ.VÞúF ..á^.&.G 000080
 4688FE56 89FC4689 4E578826 4C478826 065EC411 E8FE5689 FC46894A 57882648 H&.WJ.F•.V±Š.á^.&.GL&.WN.F•.V±.F 0000A0
 FC76FFFE 76FF02A8 09C29A00 6A006AFC 76FFFE76 FF0196E9 0375C008 F24EFFF2 .N .áu.Ô...v±.v•j.j..ô. ..v±.v• 0000C0
 88260788 26064689 06478826 F45EC401 6DE90374 C0080187 0A589A50 16F4468D .F¶.P.X....át.Ôm.á^¶&.G..F•&..&. 0000E0
 7F8326CE 5EC4D056 89CE4689 DA5688D8 4688000A E9064688 0A56890B 46890257 W..FÄ.VÖ.F•ÔÔ..FÄ.VÖ.Fö.VÅá^ô&.. 000100
 83FE5BE8 0E2677FF 262877FF 260A76FF 0C76FF15 74002A7F 8326077F 1E7C002C ,.|...&..*.t..v..v.&.w(&.w&.Ô[±. 000120
 89D24689 001605C2 8CC3880C 46893247 88268CEB 02750038 7F8326CE 5EC408C4 á.á^ô&..8.u.Š.&.G2.FÉ.û.ô....F•. 000140
 DA5688D8 46880081 ¿90000FF FF9AEE76 FFF076FF 016A0677 FF260877 FF260456 VÅ&.w.&.w.j..vÞ.vŸ.....Ô...FÄ.VÖ 000160
 260A76FF 0C76FF15 7400287F 8326077F 1E7C002A 7F8326F8 5EC4FA56 89F84689 .F½.V•á^½&..*.|...&..(.t..v..v.& 000180
 892C4788 26FF1FE9 03750030 7F8326F8 5EC408C4 83FDEFE8 0E2477FF 262677FF .w&&.w$.Ôy».á.á^½&..0.u.Ô..&.G,. 0001A0
 9AEE76FF F076FF01 6A0677FF 260877FF 26045689 D2468900 1405C28C C388DC46 FÉ.û.ô....F•.VÅ&.w.&.w.j..vÞ.vŸ. 0001C0
 76FF0C76 FF00E881 7400230D FF1AE903 7F00130D 0F7CC008 13E815E8 0000FFFF ....Š.Š..á|.=....Ô..=..t.Š..v..v 0001E0
```

```
Dump of file SATURN:[PCCOMMON.DUMP.DLL]BRD.TMP;1 on 18-APR-1990 10:36:59.83
File ID (519,15,0)   End of file block 272 / Allocated 272

Virtual block number 88 (00000058), 512 (0200) bytes

0C76FF0A 76FF0C73 FF0EC483 FC2CE80E D276FFD4 76FFEE76 FFF076FF DC76FF0A ..vÉ.vÞ.vŸ.vå.v0.Ò,=.á..v..v..vÉ 000000
FFEE76FF F076FF12 C483FC89 E80ED876 FFDA76FF D276FFD4 76FFEE76 FFF076FF .vÞ.vŸ.vå.v0.vÖ.vÄ.Ò¿=.á..vÞ.vŸ. 000020
4CE9FE7C E90AC483 039EE80E 50000388 03E80005 88057502 D67E8308 76FFDA76 vÖ.vÄ.~e.u.|..Š.|..P.Ò...á.Ò|±ÒL 000040
080A4688 08740846 08064688 088E0232 881E5657 000042C8 CBC91F00 E8C028FE ±+åŠ..èùàB..WV.¡2..Ä.F..F.t..F.. 000060
0008890A 8E1E0716 F088DC7E 8D002605 08568806 46880179 E980F388 06750C46 F.u.|µ.Ðy..F..V..&..-É.Þ....Ö¿.. 000080
88265847 8826065E C41FA5F2 0008890A 8E1EF088 F07E8D00 36050646 881FA5F2 ·É..F..6..-Þ.Þ..Ö¿..·É.á^.&.GX&. 0000A0
40C01801 627F8326 00C6E903 75C00807 7F00CFE9 037DD208 DA568908 46895A57 WZ.FÄ.VÖ.@).Òù....âu.Òó.&..b..âã 0000C0
8806568C D446890C 168036E8 C2468800 ADE9037C 02C27E83 C246FF03 E8C24689 .FóŠ..Fó.-ò.|.ÒÙ..FóŠ6.FÉ.Få.V#. 0000E0
05085688 06468806 568C0446 89F0468D 27E8C056 898E4689 001E0508 56880646 F..V.....Ff.VåŠ'.FÞ.Få.V#.F..V.. 000100
57882607 88268E5E C400E8D8 74000130 C674C008 08E800E8 C056898E 46890016 ...Ff.VåŠ.Š..âtó=..tÙŠ.á^f&..&.W 000120
5689C846 890A5618 D8462806 57882604 478826C6 5689C446 890A5618 D8462802 .+FÄ.VÖ.Fá.VÖ&.G.&.W.+FÄ.VÖ.Få.V 000140
13084603 06578826 04478826 CE5689CC 46890A56 13084603 02578826 078826CA ò&..&.W..FÄ.VÓ.Fä.VÖ&.G.&.W..FÄ. 000160
4688FF47 E908C483 003E0CFE 9A5016C4 468D0476 FFD676FF D2568900 46890A56 VÖ.FÄ.V0.v#.vå.Fá.P.±.>..á.ÒG..F 000180
160C4680 5016F046 806277FF 26065EC4 DA76FF0C 76FFEE56 89EC4689 08568806 ..V..Få.VŸ.v..v.á^.&.wb.FÞ.P.FÉ. 0001A0
FF50160C 46805016 F0468062 77FF2606 5EC40A76 FF0C76FF 0EC483FA 7BE80E50 P.Ò(ª.á..v..v.á^.&.wb.FÞ.P.FÉ.P. 0001C0
280AC483 01FAE80E 026AEC76 FFEE76FF 006A006A 12C483F8 06E80EEC 76FFEE76 vŸ.v±.Ò.«.á.j.j..vŸ.vŝj..Òª..á.+ 0001E0
```

```
Dump of file SATURN:[PCCOMMON.DUMP.DLL]BRD.TMP;1 on 18-APR-1990 10:36:59.83
File ID (519,15,0)   End of file block 272 / Allocated 272

Virtual block number 89 (00000059), 512 (0200) bytes

0C46080A 46880874 08460806 4688D88E 0430881E 00002AC8 CBC95F5E 1F00E8C0 åŠ..^_èùà*...¡0..Ä.F..F.t..F..F. 000000
FC468D06 76FF0876 FF060509 C29A006A 006A0676 FF0876FF 01C8E98D F3880675 u.|µ.Òù..v..v.j.j..ô....v..v..F= 000020
478826EC 5EC4EE56 89EC4689 FE5688FC 468801A1 E90374C0 0806350A 589A5016 .P.X.5..ât.ÒÄ..F=.V±.F&.VŸá^&&.G 000040
83067F18 7C00FA7E 83029800 F09A5016 F8468050 52F65689 F4468940 5788263E >&.WQ.F¶.V-RP.F%.P.Þ....-ª.|.... 000060
006C7F83 26EC5EC4 08C483FF 73E80EF4 76FFF676 FF0A76FF 0C76FF13 7400F87E -½.t..v..v..v-.v¶.Ò±..á.á^&&..l. 000080
08C483FA 0DE80E66 77FF2668 77FF260A 76FF0C76 FF157400 6A7F8326 077F1E7C |...&..j.t..v..v.&.wh&.wf.ÒÏª.á. 0000A0
002605C3 88D85689 06468900 0605C28C C388008C E9037500 00948F83 26EC5EC4 á^&&.e...u.Õ...ü.ô....F#.VÄ.ü.&. 0000C0
76FF520A 76FF52DE 4689008A 878826E2 5689E046 89001605 C388OC56 890A4689 .FÖ.VÉ.ü....FÅ.Vã&.....F8R.VÒR.v 0000E0
E80ED676 FFD876FF DA76FFDC 76FFDE76 FF0A76FF 0C76FF08 C4830556 0CFE9AE0 Å.±.V..á..v..v..v8.vÉ.vÖ.vÄ.v#.Ò 000100
FC76FFFE 76FFD676 FFD876FF E076FFE2 76FFDE76 FF0A76FF 0C76FF0E C483F91E .ª.á..v..v..v8.vã.vÅ.vÄ.v#.v±.v= 000120
478826EC 5EC40AC4 83009FE8 0E016AFC 76FFFE76 FF006A00 6A12C483 F9ABE80E .Ò¨ª.á.j.j..v±.v=j..Ò...á.á^&&.G 000140
16F0468D E476FFE6 76FF0744 09C29A00 6A006A50 52E65689 E4468944 57882642 B&.WD.Fò.VÌRPj.j..ò.D..vl.vò.FÞ. 000160
1E7C0056 7F8326E8 5EC4EA56 89E84689 F25688F0 46886275 C00805F5 0A589A50 P.X.%..àub.FÞ.V·.FÒ.Võá^Ò&..V.|. 000180
5EC408C4 83F90FE8 0E5077FF 265277FF 260A76FF 0C76FF15 7400547F 8326077F ..&..T.t..v..v.&.wR&.wP.ÒÒª.á.á^ 0001A0
EA76FF0A 76FF0C76 FF08C483 FC94E80E 53060A76 FF0C76FF 0F740066 7F8326E8 Ò&..f.t..v..v..S.Ò.=.á..v..v..vò 0001C0
05CE881E 56570000 08C8C8C9 1F00E8C0 28FE48E9 8AE808C4 83FA85E8 0EE876FF .vÒ.Ò.ª.á.Š.ÒH±+âŠ..èùà...WV.|ö. 0001E0
```

```
Dump of file SATURN:[PCCOMMON.DUMP.DLL]BRD.TMP;1 on 18-APR-1990 10:36:59.83
File ID (519,15,0)   End of file block 272 / Allocated 272

Virtual block number 90 (0000005A), 512 (0200) bytes

E9064688 026CE98D F388067E 07067E83 067C0006 7E830C74 0A460808 4688D88E .Ä.F..F.t..~..|..~..~.¡µ.Òl..F.Ò 000000
009687C7 26F85EC4 0000008A 87C726F8 5EC4FA56 89F84689 0A568808 46880246 F..F..V..F%.Vªá^%&ú.....á^%&ú... 000020
0000008E 87C726F8 5EC40000 009487C7 26F85EC4 00000098 87C726F8 5EC40000 ..á^%&ú.....á^%&ú.....á^%&ú..... 000040
F8468838 57892636 4789263C 5788263A 478826F8 5EC40000 009287C7 26F85EC4 á^%&ú.....á^%&.G:&.W<&.G6&.W8.F% 000060
F85EC41F A5F20008 89DA8E1E F088067F 8DF85EC4 FE5689FC 46890016 05FA5688 .Vª....F=.V±á^%....Þ..Ò¿..·É.á^% 000080
47892670 478926C0 28F85EC4 1FA5F200 0889DA8E 1EF08826 7F8DFE56 88FC4688 .F=.V±..&.Þ..Ò¿..·É.á^%+â&.Gp&.G 0000A0
89267C47 8926F85E C4764789 26784789 26F85EC4 72478926 74478926 F85EC46E ná^%&.Gt&.Grá^%&.Gx&.Gvá^%&.G|&. 0000C0
46880186 E9008287 89260084 878926F8 5EC47E47 89260080 878926F8 5EC47A47 Gzá^%&....&.G-á^%&....&....Ò...F 0000E0
26F85EC4 00006A47 C72cF85E C4000062 47C726F8 5EC4FA56 89F84689 0A568808 ..V..F%.Vªá^%&úGb..á^%&úGj..á^%& 000100
3605C28C C388F85E C4000068 47C726F8 5EC40000 6647C726 F85EC400 00c^47C7 úGl..á^%&úGf..á^%&úGh..á^%.ü.ô.6 000120
8E1EF088 1E7F8D00 1605C28C C388F85E C41FA5F2 0008890A 8E1EF088 267F.^00 ...&.Þ..Ò¿..·É.á^%.ü.ô.......Þ.. 000140
5EC40000 3247C726 F85EC4FA 5689F846 890A5688 08468801 1BE91FA5 A5A5A5)A ÒÉÉÉÉ.Ò...F..V..F%.Vªá^%&úG2..á^ 000160
3647C726 F85EC400 003847C7 26F85EC4 00003C47 C726F85E C400003A 47C726F8 %&úG:..á^%&úG<..á^%&úG8..á^%&úG6 000180
A5F20008 B9DA8E1E F088167F 8D0E5688 0C4688F8 5EC41774 0E46080C 46880000 ...F..F.t.á^%.F..V.....Þ..Ò¿..·É 0001A0
3247C726 F85EC400 002C47C7 26F85EC4 FA5689F8 46890A56 88084688 00C0E91F .Òá..F..V..F%.Vªá^%&úG,..á^%&úG2 0001C0
88F85EC4 17740E46 080C4688 00003047 C726F85E C4000034 47C726F8 5EC40000 ..á^%&úG4..á^%&úG0...F..F.t.á^%. 0001E0
```

```
Dump of file SATURN:[PCCOMMON.DUMP.DLL]BRD.TMP;1 on 18-APR-1990 10:36:59.83
File ID (519,15,0)   End of file block 272 / Allocated 272

Virtual block number 91 (0000005B), 512 (0200) bytes

 5689F846 890A568B 0846B86F EB1FA5F2 0008B9DA 8E1EF08B 147F8D0E 568B0C46 F..V.....Þ..Ö¿...E.So.F..V..F%.V 000000
 26F85EC4 00003A47 C726F85E C4000038 47C726F8 5EC40000 3047C726 F85EC4FA •á^%&úG0..á^%&úG8..á^%&úG:..á^%& 000020
 DA8E1EF0 8B1C7180 000C05C2 8CC38BF8 5EC40000 3647C726 F85EC400 003447C7 úG4..á^%&úG6..á^%.ú.ô.......Þ..Ö 000040
 09290929 08BE07E2 0A38A7FF 2E93C003 14770005 3000012D 1CEB1FA5 F2000889 ¿...E.$.-..=..w..â...T8.ã./.).). 000060
 021E0004 03A00203 00000001 06C40002 000590CB C95F5E1F 00EBC02B 09050984 ..(.+åŠ..^_èù.....á............. 000080
 00000000 00000000 00CC0004 03330203 00000019 078E0002 00000014 07340002 ..4.......7.......3...ä......... 0000A0
 46050856 88064688 58EB8DF3 B8057508 46080646 8B08BEFF FF8B1E56 00000AC8 à...V.¡...Ä.F..F.u.|µ.ŠX.F..V..F 0000C0
 F676C402 E3C1FE5E 88357D04 FE7E83FE 46FF03EB 0000FE46 C7F85689 F6468900 ..F-.V%úF±..Š..F±.-±.)5.^±èD.áv- 0000E0
 0876FFFA 76FFFC76 FF1374FF FA830575 FFFF30FC 5689FA46 8902508B 26008B26 &..&.P..F*.V==..u..*.t..v=.v*.v. 000100
 4688D88E 0007B81E 00000AC8 CBC95E1F 00EBC02B C2EB08C4 830000E8 0E0676FF .v..Ò...á.Šô+åŠ..^èùà....|...Ä.F 000120
 FF0C76FF 4277FF26 4477FF26 065EC46E EB8DF38B 057D000C 7E830674 08460806 ..F.t..-..).|µ.Šná^.&.wD&.w8.v.. 000140
 F64689FE 568BFC46 8848EB8E 078B0574 C008FFFF 08689A50 16FC468D 006A0A76 v.j..F=.P.k....ãt.¡..ŠH.F•.V±.F- 000160
 FF0CC483 039AEB0E 0676FF08 76FF5352 50006AFA 46894647 8B26F65E C4F85689 .V%á^-&.GF.F*j.PRS.v..v..Ò...á.. 000180
 1F00EBC0 280EC483 000AEB0E F676FFF8 76FF0676 FF0876FF FA76FF0A 76FF0C76 v..v..v*.v..v..v%.v-.Ò...á.+åŠ.. 0001A0
 89044689 005E0504 578B2602 478B260A 5EC4D88E 007A881E 56570000 50C8C8C9 èùàP..WV.¡z..Äá^.&.G.&.W..^..Få. 0001C0
 0C4680B2 56898046 89445788 26424788 26FA5689 F8468900 1605C28C C3880656 V•.ù.ô....F%.V*&.GB&.WD.F¯.Vý.FÉ 0001E0

Dump of file SATURN:[PCCOMMON.DUMP.DLL]BRD.TMP;1 on 18-APR-1990 10:36:59.83
File ID (519,15,0)   End of file block 272 / Allocated 272

Virtual block number 92 (0000005C), 512 (0200) bytes

 C48301FB 1A119A06 76FF0876 FFEC76FF 16D2568C 004689C0 468DEE56 8CEC4689 .Få.VŸ.Fá.FÅ.V@..v$.v..v....«..á 000000
 8D8076FF 8276FF0C C4830300 E80E0A76 FF0C76FF 0676FF08 76FF0E76 FF016A08 .j..v..v..v..v..v..Ò...á..vý.v¯. 000020
 F4468308 E8F65689 F4468900 D2830001 0512568B 10468801 D300F09A 5016BC46 F¥.P.Þ.£..F..V.....@..F¶.V-Š..F¶ 000040
 8276FF01 6EE90372 F4463908 7C0178E9 037EF656 398E568B 8C468800 F6568301 ..V-..F¥.V/9V--.Öx.|.9F¶r.Ön..vý 000060
 5689FC46 890A568B D8468800 AC08689A 50160846 8D006AF4 76FFF676 FFB076FF .v¯.v-.v¶j..FA.P.k.¯..FÅ.VÖ.F•.V 000080
 08C48302 E91A119A 53060076 FFD276FF 013BE903 74464739 260E468B FC5EC4FE ±á^•.F.&9GFt.Ô;..v@.vÅ.S...Ô..á. 0000A0
 C40A5713 26084703 26EC5EC4 D2D1E0D1 02578826 07882604 5EC40096 E90E4688 .F.Õ..á^&&..&.W.1Å1@á^$&.G.&.W.á 0000C0
 89F2568B F0468814 74C00804 7F1A7CD2 08F25689 F0468902 571B2607 2826005E ^Å&+.&.W..FÞ.V·.@|....ât..FÞ.V·. 0000E0
 5EC402D1 E0D10657 88260447 8826045E C466E888 46898A46 89C02886 56898446 FÇ.VÑ+ä.F¤.F¡Šfá^&&.G.&.W.1Å1@á^ 000100
 047F1A7C 0208F256 89F04689 06571826 04472826 D05EC40E 5713260C 470326EC &&.G.&.W.á^Å&+G.&.W..FÞ.V·.@|... 000120
 7C000130 19E818EB 8A568988 4689F256 88F04688 84468986 4689C02B 1474C008 .ât.+å.FÑ.FÇ.FÞ.V·.F¡.VoŠ.Š.=..| 000140
 F07E8306 7F337C00 F27E8300 EB9C7400 0830A174 00043DFF 5DE9037F 00023D14 .=....Ô].=..tÀ=..t.Š..-·.|3...-Þ 000160
 D076FFD2 76FF0CC4 83FFFF08 879AFC76 FFFE76FF 006A006A 50168446 8D2B7400 .t+.FÇ.Pj.j..v±.v•......á..v@.vÅ 000180
 0E0A76FF 0C76FFFC 76FFFE76 FF0E76FF 016A08C4 83FFFF1A 119AFC76 FFFE76FF .v±.v•......á.j..v..v±.v•.v..v.. 0001A0
 1EF08BFB 88D2568B D04688EC 5EC40856 89064689 FE568BFC 46880CC4 830173E8 Ôs..á..F•.V±.F..V.á^š.FÅ.V@.«.Þ. 0001C0
 56880646 88088E01 0A881E56 00000CC8 CBC95F5E 1FFE72E9 1FA5F200 08B90A8E .Ö¿...E.Ôr±.^_èùà...V.¡...Ä.F..V 0001E0

Dump of file SATURN:[PCCOMMON.DUMP.DLL]BRD.TMP;1 on 18-APR-1990 10:36:59.83
File ID (519,15,0)   End of file block 272 / Allocated 272

Virtual block number 93 (0000005D), 512 (0200) bytes

 0002F846 C762EB10 46887475 020A7E83 0674010A 7E83FE56 89FC4689 00160508 .....F•.V±.-..t..-..ut.F.ŠbúF%.. 000000
 56880C46 88F65689 F4468902 571B2607 2B26FC5E C40E568B 0C468800 00FA46C7 úF*...F..V.á^•&+.&.W..F¶.V-.F..V 000020
 472B26FC 5EC40E56 880C4688 0000FA46 C70003F8 46C73EEB 02578926 0789260E .&..&.W.Š>úF%..úF*...F..V.á^•&+G 000040
 74C0080B EB0DEB0A 57892608 4789260E 56880C46 88F65689 F446890A 571B2608 .&.W..F¶.V-.F..V.&.G.&.W.Š.Š..ât 000060
 FC5EC40E 56880C46 88F84689 FA4689C0 2B62EB10 468872E8 00EBC474 0001309A .=..tåŠ.Šr.F.Šb+ä.F*.F%.F..V.á^• 000080
 46C73EEB 06578926 04478926 0E56880C 4688F656 89F44689 06571826 04472826 &+G.&.W..F¶.V-.F..V.&.G.&.W.Š>úF 0000A0
 88F65689 F446890E 571B260C 472B26FC 5EC40E56 880C4688 0000FA46 C70001F8 %..úF*...F..V.á^•&+G.&.W..F¶.V-. 0000C0
 26065EC4 00EBC474 0001309A 74C0080B EB0DEB0E 5789260C 4789260E 56880C46 F..V.&.G.&.W.Š.Š..ât.=..tåŠ.á^.& 0000E0
 F676FF15 74FF487B 83260775 FF467883 26065EC4 02E6C1F8 76880001 009487C7 ú......v%él.á^.&.xF.u.&.xH.t..v- 000100
 D88E0337 881E0000 2AC8C8C9 5E1F0CC4 8306E8E8 0E5306F8 76FFFA76 FFF476FF .v¶.v*.v%.S.ÖÖ..á..^èùà*...|7..Ä 000120
 5689F846 89001605 C28CC388 F65689F4 46890056 05045788 2602478B 26065EC4 á^.&.G.&.W..V..F¶.V-.ú.ô....F%.V 000140
 0381E910 468808C4 83015C1A 119A0A76 FF0C76FF 5016F256 8CF04689 E0468DFA *.FÅ.FÞ.V·.P.v..v....\..á..F.Õ.. 000160
 88260847 8826F85E C4085689 D646890A 578B2608 478B26F0 5EC4017D E90E4688 .F.Õ).á^Þ&.G.&.W..F•.VÁá^%&.G.&. 000180
 75000805 2401309A D676FF08 76FF37FF 260277FF 26F45EC4 DC56890A 46890A57 W..FÖ.VÉá^¶&.w.&.7.vÅ.v•.0.$..Åu 0001A0
 5E8D37FF 260277FF 26F45EC4 44EBD856 88D64688 0874C008 C02B02EB 00018805 .¡..Š.+ä.ât..F•.VÅŠDá^¶&.w.&.7.^ 0001C0
 07CE9A05 4003EF9A DC8808EC 83053806 C79A0531 02C39AF4 5EC4052C 028F9AD6 ø.¢.,.á^¶.ú.1..ú.;..š..É.ÿ.ã..ö. 0001E0
```

```
Dump of file SATURN:[PCCOMMON.DUMP.DLL]BRD.TMP;1 on 18-APR-1990 10:36:59.83
File ID (519,15,0)   End of file block 272 / Allocated 272

Virtual block number 94 (0000005E), 512 (0200) bytes

 4688FE56 89FC4689 058700FC 9A505205 5604A69A 054F0256 9AD88808 C483054A J..ó..Ä.V.O..Î.V.RP.=.ñ..F=.V±.F 000000
 E1E9FE56 11FC4431 02578826 078826F4 5EC41075 FE563915 75FC4639 DC5688DA Ö.VÉ9F=u.9V±u.ó^¶&..&.W..F=.V±ÖÄ 000020
 DA46890E 5788260C 478826F8 5EC4D856 89D64689 0E578826 0C478826 F05EC400 .ó^Þ&.G.&.W..Fø.VÄó^¥&.G.&.W..FÖ 000040
 00018805 75000805 0601309A D676FFD8 76FF0477 FF260677 FF26F45E C40C5689 .VÉó^¶&.w.&.w..vÄ.vø.O.ø..Åu.¡.. 000060
 C39A045F 8DF45EC4 05E1028F 9AD65E8D 48E8D856 88D64688 0874C008 C02802E8 $.+å.åt..Fø.VÄ$H.^ø.¢.Ä.ó^¶._..û 000080
 0402569A D88808C4 8305FF07 CE9A05F5 03EF9ADC 8808EC83 05F006C7 9A05E602 .Î..ú.Þ..$..É.ÿ.¾..ö....ó..Ä.V.. 0000A0
 4688FE56 89FC4689 FFFF00FC 9A0477FF 260677FF 26F45EC4 50520616 04A69A06 ..Î...RPó^¶&.w.&.w..=....F=.V±.F 0000C0
 E8FE5611 FC460106 57882604 478826F4 5EC41175 FE563916 75FC4639 DC5688DA Ö.VÉ9F=u.9V±u.ó^¶&.G.&.W..F=.V±$ 0000E0
 FF21E903 75000830 FF29E903 75000430 FE76E903 7F000230 1A7C0001 301FE821 !$.=..|.=....Öv±=..u.Ö).=..u.Ö!. 000100
 D1E9DE46 89C02802 E8000188 0576FC46 39057F0C 7CFE5639 DC5688DA 468800E8 $..FÖ.VÉ9V±|...9F=v.¡..$.+å.FBÖ! 000120
 57882607 8826F85E C4085689 06468902 57882607 8826F05E C40178E9 0E468801 ..F.Ö(.ó^Þ&..&.W..Fø.VÄó^¥&..&.W 000140
 0575D008 06E30130 9A0676FF 0876FF37 FF260277 FF26F45E C4DC5689 DA468902 ..FÖ.VÉó^¶&.w.&.7.vÄ.vø.O.D..Åu. 000160
 D65E8D37 FF260277 FF26F45E C444E808 56880646 880874C0 08C02802 EB0 0188 ¡..$.+å.åt..Fø.VÄ$Dó^¶&.w.&.7.^ø 000180
 0907BE9A 06FF03EF 9ADC8808 EC8306FA 06C79A06 F002C39A F45EC406 EB02&F9A .¢.$.ó^¶.ú.Þ..ú.'..&..É.ÿ..../.. 0001A0
 DA4688FE 5689FC46 89077600 FC9A5052 071504A6 9A070E02 569AD888 08C48307 ..ó..Ä.V....Î...RP.=.v..F=.V±.FÖ 0001C0
 00E1E9FE 5619FC46 29025788 26078826 F45EC410 75FE5639 1575FC46 390C5688 .VÉ9F=u.9V±u.ó^¶&..&.W.)F=.V±ÖÄ. 0001E0

Dump of file SATURN:[PCCOMMON.DUMP.DLL]BRD.TMP;1 on 18-APR-1990 10:36:59.83
File ID (519,15,0)   End of file block 272 / Allocated 272

Virtual block number 95 (0000005F), 512 (0200) bytes

 890A4689 06578826 04478826 F85EC408 56890646 89065788 26044788 26F05EC4 ó^Þ&.G.&.W..Fø.VÄó^¥&.G.&.W..FÖ. 000000
 E80001B8 0575D008 07950130 9AD676FF D876FF04 77FF2606 77FF26F4 5EC4DC56 VÉó^¶&.w.&.w..vÄ.vø.O....Åu.¡..$ 000020
 02C39A04 5F8DF45E C407A002 8F9AD65E 8048E8D8 56880646 880874C0 08C02802 .+å.åt..Fø.VÄ$H.^ø.¢...ó^¶._..ù. 000040
 07C30256 9AD88808 C48307BE 07BE9A07 8403EF9A 0C8808EC 8307AF06 C79A07A5 É..ú.£..$..É.ÿ.Ç../././..ó..Ä.V.ù. 000060
 DA4688FE 5689FC46 8904F800 FC9A0477 FF260677 FF26F45E C4505207 D504A69A .Î.Í.RPó^¶&.w.&.w..=.=..F=.V±.FÖ 000080
 21E8FE56 19FC4629 06578826 04478826 F45EC411 75FE5639 1675FC46 390C5688 .VÉ9F=u.9V±u.ó^¶&.G.&.W.)F=.V±$! 0000A0
 E8FF21E9 03750008 30FF29E9 03750004 30FE78E9 037F0002 301A7C00 01301FE8 $.=..|.=....Öx±=..u.Ö).=..u.Ö!.$ 0000C0
 E813E80E 4689C028 02E80001 880573FC 4639057C 0C7FFE56 390C5688 DA468800 ..FÖ.VÉ9V±..|.9F=s.¡..$.+å.FB$.$ 0000E0
 76FFFE76 FF1076FF 197400DE 7E8300E8 FC70E903 75000130 FE39E903 75C00811 ..åu.Ö9±=..u.Öp=$..~8.t..v..v±.v 000100
 047C881E 000012C8 C8C91F00 E8C0280C C483FAC2 E80E0676 FF0876FF 0E76FFFC =.v..v..v..ÒÓ°.ó.+å$..èüå....¡|. 000120
 C40130E9 C0280575 1046080E 46880874 0C46080A 46881074 08460806 46880D8E .Ä.F..F.t..F..F.t..F..F.u.+åÖ0.ó 000140
 46890857 88260647 8826F056 89EE4689 001605C2 8CC388F2 46894647 8826065E ^.&.GF.F·.ú.ô....FŸ.VÞ&.G.&.W..F 000160
 88260A5E C4767502 467F8326 07740146 7F8326F6 5689F446 89005E05 FA5689F8 %.V°.^..F¶.V-&..F.t.&..F.uvó^.&. 000180
 057F377C 02573926 EE5EC4FE 5689FC46 89025713 26070326 F45EC402 57882607 .&.W.ó^¶&..&.W..F=.V±ó^Ÿ&9W.|7.. 0001A0
 FE5689FC 46890257 18260728 26F45EC4 0A578826 08478826 0A5EC430 72073926 &9.rOó^.&.G.&.W.ó^¶&+.&.W..F=.V± 0001C0
 2826EE5E C4FE5688 FC468800 9AE9C028 05770739 26057C0C 7F025739 26EE5EC4 ó^Ÿ&9W...|.&9.w.+åÖ...F=.V±ó^Ÿ&+ 0001E0

Dump of file SATURN:[PCCOMMON.DUMP.DLL]BRD.TMP;1 on 18-APR-1990 10:36:59.83
File ID (519,15,0)   End of file block 272 / Allocated 272

Virtual block number 96 (00000060), 512 (0200) bytes

 26F45EC4 06578826 04478826 0A5EC47A E8025711 26070126 0E5EC402 57182607 .&.W.ó^.&..&.W.$zó^.&.G.&.W.ó^¶& 000000
 5EC43172 04473926 067F397C 06573926 EE5EC4FE 5689FC46 89065713 26044703 .G.&.W..F=.V±ó^Ÿ&9W.|9..&9G.r1ó^ 000020
 573926EE 5EC4FE56 89FC4689 06571826 04472826 F45EC40E 5788260C 4788260A .&.G.&.W.ó^¶&+G.&.W..F=.V±ó^Ÿ&9W 000040
 06571826 04472826 EE5EC4FE 5688FC46 8820E8C0 28047704 47392606 7C0C7F06 ...|.&9G.w.+å$ .F=.V±ó^Ÿ&+G.&.W. 000060
 08064688 D88E087E 881E0000 1CC8C8C9 1F00E8C0 28065711 26044701 260E5EC4 ó^.&.G.&.W.+å$..èüå....¡~..Ä.F.. 000080
 47882606 5EC4015A E980F388 06751046 080E4688 08740C46 080A4688 10740846 F.t..F..F.t..F..F.u.¡µ.ÖZ.ó^.&.G 0000A0
 E8FC4689 FE4689C0 280A5700 F09A5016 F4468050 52E65689 E4468944 57882642 8&.WD.FÖ.VÌRP.F¶.P.Þ.W.+å.F±.F=$ 0000C0
 0FE90372 FC463908 7C0119E9 037EFE56 39F65688 F4468800 FE568301 FC468308 ..F=..V±..F¶.V-9V±~.Ö..|.9F=r.Ö. 0000E0
 89FA5688 F8468801 8708689A 5016F846 8D006AFC 76FFFE76 FFE476FF E676FF01 ..v|.vö.v±.v=j..F%.P.k....F%.V°. 000100
 0E5EC478 E8464788 26E85EC4 EE5689EC 4689F256 89F04689 99C028EA 5689E846 FÖ.Vö+å..FÞ.V·.F&.VŸó^Ö&.GF$xó^. 000120
 88260E5E C473E8F2 5611F046 010E5718 260C4728 260A5EC4 0E578826 0C478826 &.G.&.W.ó^.&+G.&.W..FÞ.V·$só^.&. 000140
 08478826 0E5EC455 E8F25611 F0460106 57182604 4728260A 5EC40657 88260447 G.&.W.ó^.&+G.&.W..FÞ.V·$Uó^.&.G. 000160
 57882607 88260E5E C437E8EE 5611EC46 010A5718 26084728 260A5EC4 0A578826 &.W.ó^.&+G.&.W..F$.VŸ$7ó^.&..&.W 000180
 E9037500 023DA174 00013019 E818E8EE 5611EC46 01025718 26072826 0A5EC402 .ó^.&+.&.W..F$.VŸ$.$.=..tÅ=..u.Ö 0001A0
 0EE876FF EA76FF0E 76FF1076 FF5016EC 468D00E8 AD740008 30007400 043DFF78 (.=..tÅ=..tÙ$..F$.P.v..v..vö.vÒ. 0001C0
 FF006A00 6A5016EC 46801774 F2460BF0 46880875 EE460BEC 46880CC4 83FD55E8 ÒU».ó..F$.FŸu..FÞ.F·t..F$.Pj.j.. 0001E0
```

```
Dump of file SATURN:[PCCOMMON.DUMP.DLL]BRD.TMP;1 on 18-APR-1990 10:36:59.83
File ID (519,15,0)   End of file block 272 / Allocated 272

Virtual block number 97 (00000061), 512 (0200) bytes

 09DB881E 5600001E C8C8C91F 00E8C028 FED1E90C C4830205 08879AE8 76F. A76 võ.vÒ...f..á.Õl±+åŠ..èùà...V.¡Ä. 000000
 00FDE98D F3880676 030A7E83 067F0E7C 0A7C000C 7E831074 08460806 4688U88E .Ä.F..F.t..-..|.|....~..v.¡µ.Ö». 000020
 46894850 88264640 8826065E C402E6C1 0A768800 F0E9C028 05751046 080E4688 .F..F.u.+åÕÞ..v.é|.á^.&.ãF&.PH.F 000040
 82878826 2828068E E3010A5E 8800CAE9 C0280575 FFFA830A 75FFFF30 FE5689FC =.V±=..u..*.u.+åÕò..^.1D..((&... 000060
 880E7502 F27E8306 7401F27E 83EC5689 EA4689F0 5689EE46 8999C028 F2468901 ..F·+à..FŸ.VÞ.Fõ.V&.-·.t..-·.u.. 000080
 42478826 065EC4EC 5689EA46 89105688 0E46880C E8F05689 EE468910 56880E46 F..V..FŸ.VÞŠ..F..V..Fõ.V&á^.&.GB 0000A0
 00FE5683 01FC4683 08E80C48 00F09A50 16F4468D 5052E456 89E24689 44578826 &.WD.Fã.VÕRP.F¶.P.Þ.H.Š..F=..V±. 0000C0
 006AFC76 FFFE76FF E276FFE4 76FF4773 FC463905 7C4E7FFE 5639F656 88F44688 .F¶.V-9V±.N|.9F=sG.vÕ.vã.v±.v•j. 0000E0
 46473926 F24688E6 5EC4E856 89E64689 FA5688F8 46880A15 08689A50 16F8468D .F½.P.k....F½.V*.F|.VÕá^|.F·&9GF 000100
 C95E1F00 E8C0289F E80CC483 08480887 9A530600 6A006A50 16EA468D 15E80274 t.Š..Fõ.Pj.j..S...H..á.Š.+åŠ..^è 000120
 587F8326 065EC402 51E980F3 88067508 46080646 88088E08 5E881E00 002CC8C8 ùà,...¡^..Ä.F..F.u.¡µ.Õo.á^.&..X 000140
 05EA5689 E8468904 57882602 47882602 39E9C028 05730156 7F832607 7C0E7F00 ...|.&..V.s.+åÕ9.&.G.&.W..FÒ.Võ. 000160
 52FA568C F84689F0 46800656 89044689 44578826 42478826 E65689E4 4689005E ^..Fõ.V|&.GB&.WD.Få.V•.FÞ.F½.V*R 000180
 8800FE56 8301FC46 8308E8FC 4689FE46 89C02800 2D00F09A 5016E046 8D0476FF .vå.FÁ.P.Þ.-.+à.F±.F=Š..F=..V±.. 0001A0
 FE76FF04 76FFD676 FF01CFE9 0372FC46 39087C01 D9E9037E FE5639E2 5688E046 fÁ.Vã9V±-.Õ\.|.9F=r.Õü..v•.vå.v± 0001C0
 83260C5E C4DE5689 DC4689EE 5688EC46 880C1408 689A5016 EC468000 6AFC76FF .v•j..F&.P.k....F&.VŸ.FÉ.V8á^É&. 0001E0

Dump of file SATURN:[PCCOMMON.DUMP.DLL]BRD.TMP;1 on 18-APR-1990 10:36:59.83
File ID (519,15,0)   End of file block 272 / Allocated 272

Virtual block number 98 (00000062), 512 (0200) bytes

 FF26E45E C4DA5689 D8468900 1605C28C C388A9E8 02750062 7F832609 7500687F .h.u.&..b.u.$`.û.ó....FÄ.VÕá^õ&. 000000
 08C02802 E80001B8 05750008 0D9F0130 9A37FF26 0277FF26 D85EC437 FF260277 w.&.7á^Ä&.w.&.7.0....Äu.¡..Š.+à. 000020
 A702C39A D85EC437 FF260277 FF26E45E C44DE802 57882607 8826D85E C40C74C0 àt.á^Ä&..&.W.$Má^õ&.w.&.7á^Ä.û.Ì 000040
 C403EF9A DC8808EC 83008F06 999A282A 1E8D0085 06C79A0D AC02C39A E45EC400 .á^õ.û.¯..û.ç...*(...¢..ã..Ê.ÿ.á 000060
 26F85EC4 00FF00FC 9A50520D DA04A69A 0D030256 9A088808 C48300CE 07BE9A0D ..ƒ.ö..á..Ä.V.Æ..Ì.Õ.RP.=...á^½& 000080
 2601309A 0477FF26 0677FF26 D85EC404 77FF2606 77FF26E4 5EC40257 89260789 ..&.W.á^õ&.w.&.w.á^Ä&.w.&.w..0.& 0000A0
 D85EC454 E8065788 26044788 26D85EC4 0074C008 C02802E8 0001B805 7500080E ..Äu.¡..Š.+à.åt.á^Ä&.G.&.W.$Tá^Ä 0000C0
 4906999A 282A1E8D 0E3F06C7 9A0E3602 C39A045F 8DE45EC4 0E3102C3 9A045F8D ._..û.1.á^õ.¯..û.6..û.?...*(...Ì 0000E0
 520E6F04 A69A0E5D 02569AD8 8808C483 0E58078E 9A0E4E03 EF9ADC88 08EC830E ._á..Ê.ÿ.N..7.X..á..Ä.V.]..Ì.o.R 000100
 26F85EC4 06578926 04478926 F85EC406 8A00FC9A 0477FF26 0677FF26 E45EC450 Pá^õ&.w.&.w..=.o.á^½&.G.&.W.á^½& 000120
 C4065788 26044788 26F85EC4 1A750257 39262075 07392608 5EC40257 88260788 ..&.W.á^Ä&9.u &9W.u.á^½&.G.&.W.á 000140
 879ADC76 FFDE76FF F876FFFA 76FF006A 006A2C74 06573926 06750447 3926085E ^Ä&9G.u.&9W.t,j.j..v*.v½.v8.vÉ.. 000160
 47C7260C 5EC408C4 83FFFF16 4E9A0676 FF0876FF EC76FFEE 76FF0CC4 830C7208 .r..á..vŸ.vš.v..v..N....á.á^É&ûG 000180
 00000004 0EC10002 00000002 0ED50002 000690C8 C91F00E8 C028FE11 E9000068 h..Õ.±+åŠ..èü.....Ì.......ê..... 0001A0
 00000019 0C870002 00000017 00720002 00000014 0CE80002 00000009 04850002 ..ç.......Š.......r............. 0001C0
 1046080E 46881074 0A460808 46881874 00067E83 D88EFFFF 881E5657 000014C8 à...WV.¡...Ä.~..t..F..F.t..F..F. 0001E0

Dump of file SATURN:[PCCOMMON.DUMP.DLL]BRD.TMP;1 on 18-APR-1990 10:36:59.83
File ID (519,15,0)   End of file block 272 / Allocated 272

Virtual block number 99 (00000063), 512 (0200) bytes

 1E0716F0 88F07E8D 1056880E 46881675 000C7E83 4DE80275 14460812 46880874 t..F..F.u.$M.~..u..F..V..-Þ.Þ... 000000
 F046800B E899C028 0574000C 7E83006A 006A1676 FF1876FF 1FA5F200 0889DA8E .Õ¿...E..v..v.j.j..-..t.+à.Š..FÞ 000020
 04C8C8C9 5F5E1F12 C483125E FF0676FF 0876FF0A 76FF5052 D28CEE56 8CEC4689 .F&.VŸ.ØRP.v..v..v..^..á..^ èùà. 000040
 89000805 C28CC388 49E8C028 0475001A 7F83260A 5EC4088E 0008881E 56570000 ..WV.¡...Äá^.&....u.+åŠl.û.Õ.... 000060
 5EC41FE8 08C483FF FF0CFE9A 0676FF08 76FF5052 12740018 7F8326FE 5689FC46 F•.V±&.....t.RP.v..v..±....á.Š.á^ 000080
 E8C02800 011847C7 260A5EC4 1FA5F200 0889DA8E 1EF088F8 88085688 064688FC •.F..V..«.Þ..Õ¿...E.á^.&ûG...+åŠ 0000A0
 FC4689EC 468DE656 8CE44689 D44680D8 8E008688 1E560000 32C8C8C9 5F5E1F00 ..^ èùà2..V.¡...Ä.Få.Fõ.Vl.F&.F= 0000C0
 260877FF 26CE5EC4 D05689CE 46890856 88064688 00D8E907 8826065E C4FE568C .V±Ä^.&..ÕÜ..F..V..Fö.VÅá^ö&.w.& 0000E0
 407F01D2 7E83D2[illegible]6 FF03E800 00D246C7 0000FFFF 9AE476FF E676FF01 6A0677FF .w.j..vl.vÕ.....úF@..Š..F@.~@..ã 000100
 FF50EA76 FF2374[illegible] 08EA5689 E846890C 5088260A 408826CE 5EC402E6 C1027688 .v@è|.á^o&.ã.&.P..FÒ.Võ.Ät#.võP. 000120
 87E808C4 830087[illegible] FE9AFC76 FFFE76FF E476FFE6 76FFFFFF 06489AFC 76FFFE76 v±.v•.K....vl.vÕ.v±.v•.±.ñ..á.Šñ 000140
 76FFE676 FF016A06 77FF2608 77FF26CE 5EC40056 89CE4689 08568806 468879E8 Šy.F..V..Fö.VÅá^ö&.w.&.w.j..vl.v 000160
 FF50EA76 FF2374D0 08EA5689 E846890C 5788260A 478826CE 5EC40000 FFFF9AE4 ð.....á^o&.G.&.W..FÒ.Võ.Ät#.võP. 000180
 18E808C4 8301790C FE9AFC76 FFFE76FF E476FFE6 76FF0168 06489AFC 76FFFE76 v±.v•.K.h..vl.vÕ.v±.v=.±.y..á.Š. 0001A0
 76FF0C76 FFE5E889 7400053D FF18E903 7F00043D F47C0003 3D14E82D E88E0388 ¡..Š-Š.=..|¶=....Õ..=..t.Šl.v..v 0001C0
 D88E00ED 881E0000 48C8C8C9 5E1F00E8 C02808C4 83FE73E8 0EE476FF E676FF0A ..vl.vÕ.Õs±.á.+åŠ..^èùàH...¡Ù..Ä 0001E0
```

```
Dump of file SATURN:[PCCOMMON.DUMP.DLL]BRD.TMP;1 on 18-APR-1990 10:36:59.83
File ID (519,15,0)   End of file block 272 / Allocated 272

Virtual block number 100 (00000064), 512 (0200) bytes

 89025788 26078826 0A5EC402 12E9C028 05750C46 080A4688 08740846 08064688 .F..F.t..F..F.u.+åÕ..á^.&..&.W.. 000000
 46891A57 88261847 8826065E C4E25689 E0468906 57882604 478826C6 5689C446 Fá.Vö&.G.&.W..FÅ.Vãá^.&.G.&.W..F 000020
 08FFFF0A 589A5016 8C4680DC 76FFDE76 FF027D09 C29A006A 006A5052 DE56890C É.V8RPj.j..ö.)..v8.vÉ.F¥.P.X.... 000040
 5689C846 89E65689 E446898E 56888C46 88017EE9 0788268C 5EC401A6 E90374C0 àt.Õl.á^¥&..Õ-..F¥.V/.Fõ.Vl.Fà.V 000060
 76FF08C4 83F0C3E8 0E505200 16050A76 FF0C76FF 2C740000 8C8F8326 C85EC4CA Äá^å&.¢...t,.v..v....RP.Òü».á..v 000080
 56888C46 88014EE9 0CC483FF FF11009A E476FFE6 76FFC476 FFC676FF E076FFE2 ã.vÀ.vó.vá.vl.võ......á.ÕN..F¥.V 0000A0
 489A5016 EC468D50 52387400 647F8326 C05EC4C2 5689C046 890A5689 D846898E /.FÃ.VÖ.Fà.Vöá^å&..d.t8RP.Fš.P.K 0000C0
 76FFC676 FFE076FF E276FF08 C483FD6C E80E5016 EC46800A 76FF0C76 FF01C806 .à..v..v..Fš.P.Òl».á..vã.vÀ.vó.v 0000E0
 46890656 89D44689 8E56888C 468800F7 E90CC483 FFFF0000 9AD876FF DA76FFC4 á.vÖ.vÀ......á.Õ%..F¥.V/.Fâ.Vø.F 000100
 E276FF08 C483FD8C E80E5052 0A76FF0C 76FF2974 00347F83 26885EC4 8A568988 ¡.V¤á^¡&..4.t).v..v.RP.Ò.».á..vã 000120
 8E56888C 468800AF E90CC483 FFFF0DE7 9A8C76FF 8E76FFC4 76FFC676 FFE076FF .vÀ.vó.vá.v/.v¥.Ó....á.ÕÉ..F¥.V/ 000140
 E80E5052 0A76FF0C 76FF2974 002E7F83 26E85EC4 EA5689E8 4689CE56 89CC4689 .Fä.Vö.FÒ.Võá^Ò&....t).v..v.RP.Ò 000160
 E80CC483 FFFF0575 9A8C76FF 8E76FFC4 76FFC676 FFE076FF E276FF08 C483FD44 D».á..vã.vÀ.vó.vá.v/.v¥.u....á.Š 000180
 0C76FF2C 7400327F 8326FC5E C4FE5689 FC4689D2 56890046 898E5688 8C468868 h.F¥.V/.FÀ.V0.F».V±á^=&..2.t,.v. 0001A0
 76FF8E76 FFC476FF C676FFE0 76FFE276 FF08C483 FC92E80E 5052000C 050A76FF .v....RP.Ò.=.á..vã.vÀ.vó.vá.v/.v 0001C0
 D8028F04 1DA7FF2E 93C00314 77000530 00012D1C E81EE80C C483FFFF 09CF9A8C ¥.ü....á.Š.Š.-..=..w..â...Ï....Û 0001E0

Dump of file SATURN:[PCCOMMON.DUMP.DLL]BRD.TMP;1 on 18-APR-1990 10:36:59.83
File ID (519,15,0)   End of file block 272 / Allocated 272

Virtual block number 101 (00000065), 512 (0200) bytes

 75C00802 6005D09A 016A006A 006ADC76 FFDE76FF FE43E903 C1037A03 32033202 .2.2.z.ê.ÕC±.v8.vÉj.j.j..Å.m..åu 000000
 0A468808 7408460P.06468808 8E021C88 1E560000 10C8C8C9 1F00E8C0 28E9E802 .ŠÕ+åŠ..èüÀ...V.¡...Å.F..F.t..F. 000020
 260A5EC4 F85689Fr 46891A57 88261847 8826065E C40091E9 80F38806 750C4608 .F.u.¡µ.Õ..á^.&.G.&.W..F-.V¼á^.& 000040
 4680F676 FFF876FF 04A609C2 9A5050F6 76FF52FA 4689FC46 89C028FE 46890788 ...F±+á.F».F*R.v-PP.ô.Ì..v½.v-.F 000060
 8488E601 F088E301 FE5E88F4 46890788 26F05EC4 2875C008 04ED0A58 9A5016F0 Þ.P.X.Ú..åu(á^Þ&...F¶.^±ÌD.Þ¦|.. 000080
 FA76FFFC 76FFF676 FFF876FF C4E800FC 568301FA 46830AE8 027D0338 87390338 8.9.8.).Š..F*..V».Šá.v½.v-.v».v* 0000A0
 C8C95E1F 00E8C028 04E88E07 880574C0 08043802 909A0A76 FF0C76FF 016A006A j.j..v..v....;..ât.¡..Š.+åŠ..^èù 0000C0
 0004032A 00020000 00030301 00020000 000202D3 00020000 00010109 00020008 ....).......Æ...............*... 0000E0
 000401A2 02030000 00080404 00020000 0007038A 00020000 00050372 00020000 ....r.......¤...............Å... 000100
 00000000 000000CC 0004012C 02030000 00190451 00020000 00140496 0002021E ............Q.........,..ä....... 000120
 081E4688 08742846 08264688 10742C46 082A4688 D88EFFFF 881E5657 00003EC8 à>..WV.¡...Å.F*.F,t..F&.F(t..F.. 000140
 FA5688F8 46880000 FFFF9A50 16F8468D 2A76FF2C 76FF02E0 E98DF388 06752046 F u.¡µ.ÕÅ..v,.v*.F%.P......F%.V* 000160
 2C76FFA5 F2000E89 07160348 8EC27E8D 028AE98D F1880675 0008E656 89E44689 .Fõ.V|.Åu.¡þ.Õo..-ó/H...¿..·Ë.v, 000180
 3926057F 477C0257 3926EA56 88E84688 265EC400 00FFFF9A 5016E846 8D2A76FF .v*.FÒ.P.....á^&.FÒ.Võ&9W.|G..&9 0001A0
 06573926 EE5688EC 46882077 07392605 7C347F02 573926F2 5688F046 88407207 .r@.FÞ.V·&9W..4|.&9.w-.Fš.VŸ&9W. 0001C0
 01880577 04473926 067C007F 06573926 F65688F4 46881972 04473926 067F217C |!..&9G.r..F¶.V-&9W...|.&9G.w.¡. 0001E0

Dump of file SATURN:[PCCOMMON.DUMP.DLL]BRD.TMP;1 on 18-APR-1990 10:36:59.83
File ID (519,15,0)   End of file block 272 / Allocated 272

Virtual block number 102 (00000066), 512 (0200) bytes

 8826E45E C4E25689 E0468900 7805E656 88E44688 0186E903 75C008C0 2802E800 .Š.+á.åu.ÕÑ..Fõ.V|.x..FÀ.Vãá^õ&. 000000
 75C008DE 4EFFDE46 8802E046 8304E800 060E46C7 FE5689FC 46890A57 88260847 G.&.W..F».V±úF8..Š..FÀ..F8.N8.åu 000020
 8D1F74D0 08036A16 23036806 23245688 22468801 36E90788 26E05EC4 0171E903 .Õq.á^À&..Õ6..F".V$#.h.#.j..Åt.. 000040
 31E90144 E90374C0 080CC483 0CDAE80E FC76FFFE 76FF2676 FF2876FF 5016C246 Fô.P.v(.v&.v±.v».ÒÖ..á..ât.ÕD.Õ1 000060
 76FF2676 FF2876FF 5016C246 8D1F74D0 08036E16 23036C06 23245688 22468801 ..F".V$#.l.#.n..Åt..Fô.P.v(.v&.v 000080
 23037006 23245688 22468800 FDE90110 E90374C0 080CC483 0FD4E80E FC76FFFE ±.v».Õå..á..ât.Õ..Õ»..F".V$#.p.# 0000A0
 080CC483 11ACE80E FC76FFFE 76FF2676 FF2876FF 5016C246 8D1F74D0 08037216 .r..Åt..Fô.P.v(.v&.v±.v».Õ¨..á.. 0000C0
 5016C246 8D1F74D0 08037616 23037406 23245688 22468800 C9E9000C E90374C0 ât.ÕÉ.Õè..F".V$#.t.#.v..Åt..Fô.P 0000E0
 22468800 95E900A8 E90374C0 080CC483 1284E80E FC76FFFE 76FF2676 FF2876FF .v(.v&.v±.v».ÒÇ..á..ât.Õ´.Õ...F" 000100
 FC76FFFE 76FF2676 FF2876FF 5016C246 8D1E74D0 08037A16 23037806 23245688 .V$#.x.#.z..Åt..Fô.P.v(.v&.v±.v» 000120
 74D00803 7E162303 7C062324 56882246 8863E875 E80274C0 080CC483 138CE80E .Õ¥..á..ât.ŠuŠc.F".V$#.|.#.~..Åt 000140
 E843E802 74C0080C C4831680 E80EFC76 FFFE76FF 2676FF28 76FF5016 C24680 1E ..Fô.P.v(.v&.v±.v».Ò...å..ât.ŠCŠ 000160
 03750004 3DFF1AE9 03750003 3DFEEEE9 03750002 3DFEC2E9 03750001 3D2FE831 1Š/=..u.Õô±=..u.ÕŸ±=..u.Õ..=..u. 000180
 000E8907 1603488E C27E8DFE 7EE900E8 9F740006 3DFF72E9 03750005 3DFF46E9 ÕF.=..u.Õr.=..t.Š.Õ-±.-ó/H...¿.. 0001A0
 26078926 C65688C4 46881A5E C410741C 46081A46 88078926 C246881E 5EC4A5F2 ·Eá^..Fõ&...F..F.t.á^..Fá.Võ&..& 0001C0
 46081246 881FA5A5 A5A51F16 1EC8768D FB88165E C4107418 46081646 88025789 .W..F..F.t.á^..«.và...EEEE..F..F 0001E0
```

```
Dump of file SATURN:[PCCOMMON.DUMP.DLL]BRD.TMP;1 on 18-APR-1990 10:36:59.83
File ID (519,15,0)   End of file block 272 / Allocated 272

Virtual block number 103 (00000067), 512 (0200) bytes

 46880E5E C4097410 46080E46 88025789 26078926 D2568800 4688125E C4107414 .t.á^..FÅ.V@&..&.W..F..F.t.á^..F 000000
 065EC409 74084608 06468807 89260646 880A5EC4 09740C46 080A4688 07892604 á&...F..F.t.á^..F@&...F..F.t.á^. 000020
 12468808 8E000888 1E565700 0026C800 28CAC95F 5E1F00E8 C0280789 260C4688 .FÉ&..+åŠ..^_èò(.á&..WV.¡...Á.F. 000040
 065EC40C 74084608 0646881A 75084608 06468808 74104608 0E468810 74144608 .F.t..F..F.t..F..F.u..F..F.t.á^. 000060
 76FF1476 FF078926 02478926 C028065E C401CCE9 80F38807 89260247 8926C028 +á&.G.&..¡µ.Öä.á^.+á&.G.&...v..v 000080
 9AE980F1 88067500 08F65689 F44689FE 5688FC46 88000000 369A5016 FC468012 ..F=.P.6....F=.V±.F¶.V-.Åu.¡þ.Ô. 0000A0
 5EC41274 C0080000 FFFF9A50 16F84680 106A0E6A 50F24689 06478826 F45EC401 .á^¶&.G..F·Pj.j..F½.P......åt.á^ 0000C0
 F45EC4A5 F2000889 039A8EF8 88F85EC4 0168E98D F2880789 26024789 26C02806 .+á&.G.&..¡·.Ök.á^½.«/..¿..·Éá^¶ 0000E0
 FF1474C0 08042C02 909AF876 FFFA76FF 006A016A 006A006A 0C77FF26 0E77FF26 &.w.&.w.j.j.j.j..v°.v½....,..åt.. 000100
 04478926 064789?4 C028F85E C40128E9 8E078800 00FFFF9A F876FFFA 76FFF276 v·.v°.v½.....¡..Ö(.á^½+á&.G.&.G. 000120
 4688F276 FF0257? 26078926 F65688F4 4688F85E C4084789 260A4789 26F85EC4 á^½&.G.&.G.á^½.F¶.V-&..&.W..v·.F 000140
 FF0C4789 260E4789 26C028F8 5EC41074 C008FFFF 00009A50 52000C05 FA5688F8 ½.V°...RP......åt.á^½+á&.G.&.G.. 000160
 890A8E1E 0716F088 E27E8D10 56880E46 8800CCE9 8E078801 03E80EF8 76FFFA76 v°.v½.ÒŒ.¡..Öä..F..V..-ã.Þ....Ö¿ 000180
 DE4689E4 5688E246 882476E2 4639057F 287CE456 39EC5688 EA46881F A5F20008 ..·É..Fõ.V≤9Vô|+..9Fãv$.Fã.Vô.F8 0001A0
 5688EE46 88EC5689 EA4689E0 5688DE46 88E45689 E24689EC 5688EA46 88E05689 .VÁ.Fõ.V$.Fã.Vô.F8.VÁ.Fõ.V$.FŸ.V 0001C0
 89F05688 EE46880C 56890A46 89E85688 E6468824 76E64639 057F287C E85639F0 Þ9VÒ|+..9F|v$.F|.VÒ.FÖ.VÉ.FŸ.VÞ. 0001E0

Dump of file SATURN:[PCCOMMON.DUMP.DLL]BRD.TMP;1 on 18-APR-1990 10:36:59.83
File ID (519,15,0)   End of file block 272 / Allocated 272

Virtual block number 104 (00000068), 512 (0200) bytes

 FF260A77 FF26F45E C40A76FF 0C76FFF0 5689EE46 890C5688 DA4688E8 5689E646 F|.VÒ.FÖ.VÉ.FŸ.VÞ.v..v.á^¶&.w.&. 000000
 E80EF876 FFFA76FF 0F74C008 10C48325 D0E80EF8 76FFFA76 FF5016E2 46800877 w..Fã.P.v°.v½.Öi%.á..åt..v°.v½.Ò 000020
 CAC95F5E 1F00E8C0 28025789 26078926 FA5688F8 4688065E C414E88E 0688011A ..¡..Š.á^..F½.V°&..&.W.+åŠ..^_èò 000040
 E880F388 05750846 08064688 08740C46 080A4688 D88E0319 881E0000 00C80010 ..à....¡...Ä.F..F.t..F..F.u.¡µ.Š 000060
 C80008CA C91F00E8 C0280257 89260789 26065EC4 06578826 04478826 0A5EC419 .á^.&.G.&.W.á^.&..&.W.+åŠ..èò..à 000080
 FC468912 56881046 8800A0E9 80F38806 7512460B 104688D8 8E052888 1E000008 ....¡(..Ä.F..F.u.¡µ.Ö...F..V..F= 0000A0
 57882604 478826FC 5EC40847 89260A47 8926C028 FC5EC400 74000E7E 83FE5689 .V±.~..t.á^=+á&.G.&.G.á^=&.G.&.W 0000C0
 02478926 C028065E C4000007 C7260A5E C4167208 47392606 7F1E7C0A 57392606 .&9W.|...&9G.r.á^.&ú...á^.+á&.G. 0000E0
 57832601 08478326 0877FF26 0A77FF26 0C77FF26 0E77FF26 FC5EC452 E8078926 &..ŠRá^=&.w.&.w.&.w.&.w.&.G..&.W 000100
 0A5EC407 8826F85E C420E88E 06880574 C0080309 08689A50 16F84680 006A000A ..j..F½.P.k.)..åt.¡..Š á^½&..á^. 000120
 000010C8 000ECAC9 1F00E8C0 28025789 26078926 FA5688F8 4688065E C4078926 &..á^..F½.V°&..&.W.+åŠ..èò..à... 000140
 C4F65689 F4468908 56880646 880099E9 C0280575 08460806 4688D88E 0565881E .¡e..Ä.F..F.u.+åÖ...F..V..F¶.V-á 000160
 FE5689FC 46890E57 88260C47 8826F05E C4F25689 F0468902 57882607 8826F45E ^¶&..&.W..FÞ.V·á^Þ&.G.&.W..F=.V± 000180
 1376FFF8 7E83067F 187CFFFA 7E830691 091E9A50 16F84680 F476FFF6 76FF5052 RP.v~.v¶.F½.P......-°.|....~½.v. 0001A0
 00740E47 08260C47 8826F45E C406A805 D09A006A F876FFFA 76FFFC76 FFFE76FF .v±.v=.v°.v½j..Å.¨.á^¶&.G.&.G.t. 0001C0
 08000003 E99AF476 FFF676FF 0677FF26 F05EC405 EC00689A 0C77FF26 0E77FF26 &.w.&.w..h.š.á^Þ&.w..v~.v¶.Ö.... 0001E0

Dump of file SATURN:[PCCOMMON.DUMP.DLL]BRD.TMP;1 on 18-APR-1990 10:36:59.83
File ID (519,15,0)   End of file block 272 / Allocated 272

Virtual block number 105 (00000069), 512 (0200) bytes

 46081E46 88088E06 22881E00 0006C800 04CAC91F 00E8C028 04E880F2 880574C0 åt.¡·.Š.+åŠ..èò..à....¡"..Ä.F..F 000000
 260477FF 26025FC4 26FA5EC4 FC5689FA 46892056 881E4688 67E880F3 88057520  u.¡µ.Šg.F..V .F°.V=á^°&á_.&.w.& 000020
 1276FF14 76FF1676 FF1876FF 1A76FF1C 76FF0677 FF260877 FF26FA5E C40277FF .w.á^°&.w.&.w..v..v..v..v..v..v. 000040
 5EC40074 C008FE46 890000FF FF9A0676 FF0876FF 0A76FF0C 76FF0E76 FF1076FF .v..v..v..v..v..v.......F±.åt.á^ 000060
 4688D88E 0607881E 00001AC8 001CCAC9 1F00E8C0 2804E88E 06880000 07C72616 .&ú...¡..Š.+åŠ..èò..à....¡■..Ä.F 000080
 125EC4FA 46890788 26165EC4 00FAE980 F3880675 14460812 46880874 18460816 ..F.t..F..F.u.¡µ.Ö°.á^.&...F°á^. 0000A0
 F5880674 04EE7E83 0C7403EE 7E830C75 04FA7E83 067403FA 7E83EE46 89078826 &...FŸ.~°.t..~°.u..~Ÿ.t..~Ÿ.t.¡¾ 0000C0
 26EA5EC4 F45689F2 46891456 88124688 EC5689EA 46891856 88164688 00CAE980 .Öò..F..V..Fõ.V$.F..V..F·.V¶á^ö& 0000E0
 88016A50 52FE5689 FC468908 57882606 478826F8 5689F646 89045788 26024788 .G.&.W..F-.V½&.G.&.W..F=.V±RPj.. 000100
 5EC4FC76 FFFE76FF 0277FF26 0477FF26 F65EC400 00FFFF9A 50520016 05C28CC3 û.ò...RP.....á^-&.w.&.w..v±.v=á^ 000120
 0000FFFF 9A0676FF 0876FF0A 76FF0C76 FF0E76FF 1076FF06 77FF2608 77FF26F2 ·&.w.&.w..v..v..v..v..v..v...... 000140
 5016E646 80FC76FF FF76FF2C 75043F83 26EA5EC4 42E88E03 880574C0 08F04689 .FÞ.åt.¡..ŠBá^ö&.?.u,.v±.v=.F|.P 000160
 C483FFFF 01599A16 76FF1876 FF0E7602 E67E8306 7F167C00 E87E8300 00FFFF9A ......-Ò.|....-|.v..v..v..Ÿ....á 000180
 76FFD88E 075A881E 5600000A C80014CA C91F00E8 C0280001 3847C726 EA. C404 .á^ö&úG8..+åŠ..èò..à...V.¡Z..Ä.v 0001A0
 F9880575 D008FA56 89F84689 FE5688FC 46880000 03679A50 16FC4680 0A7L FOC ..v..F=.P.g....F=.V±.F½.V°.Åu.¡° 0001C0
 5EC40088 26065EC4 E601F676 88147006 F67E83F6 46FF03E8 0000F646 C728Eà8D .Š(úF-..Š..F-.--.)..v-||á^.&..á^ 0001E0
```

```
Dump of file SATURN:[PCCOMMON.DUMP.DLL]BRD.TMP;1 on 18-APR-1990 10:36:59.83
File ID (519,15,0) . End of file block 272 / Allocated 272

Virtual block number 106 (0000006A), 512 (0200) bytes

 46080646 88D88E03 7AB81E00 0018C800 08CAC95E 1F00E8C0 28E3E878 408926F8 Y&.@x5D+aS..^eb..a....jz..A.F..F 000000
 06478826 065EC400 0007C726 0E5EC400 ADE98DF3 88067510 46080E46 88087408 .t..F..F.u.jm.OU.a^.&u...a^.&.G. 000020
 8300012D FA5688F8 46880000 08419A50 16F84680 5052FE56 89FC4689 08578826 &.W..F=.VtRP.F%.P.A....F%.V*-... 000040
 4680006A 0A76FF0C 76FFFC76 FFFE76FF 6EE8C028 04750C56 3809750A 4638000A O.;F.u.;V.u.+aSn.vt.v=.v..v.j..F 000060
 4680006A 50520002 83000105 0C56880A 4688FC76 FFFE76FF 00000964 9A5016F0 P.P.d....vt.v=.F..V.....@.RPj..F 000080
 000107C7 260E5EC4 0A75F656 390F75F4 4639EE56 88EC4688 0000FFFF 9A5016E8 O.P......F&.VY9F{u.9V-u.a^.&u... 0000A0
 C91F00E8 C0280002 07C7260E 5EC40875 F256390D 75F04639 EA5688E8 468818E8 $..FO.V69FPu.9V u.a^.&u...+aS..e 0000C0
 80F38806 750C4608 0A468808 74084608 06468808 8E08D788 1E565700 0028C8C8 uA(..WV.j=..A.F..F.t..F..F.u.jm. 0000E0
 F088EC7E 80085688 064688FE 568CFC46 89EC4680 EA568CE8 4689E046 80044669 OF..FA.FO.Vo.F&.F=.Vt.F..V..-&.P 000100
 02578326 06078326 FC5EC400 000A46C7 00060846 C71FA5F2 0008890A 8E1E0716 ....O;.. E.uFA..uFO..a^=&...&.W. 000120
 26044701 260A5688 084688FC 5EC40A57 19260847 29260A56 88084688 FC5EC400 .a^=.FA.VO&)G.&.W.a^=.FA.VO&.G.& 000140
 5EC40257 88260788 26FC5EC4 0E571926 0C472926 DA5688D8 4688FC5E C4065711 .W.a^=.FA.VO&)G.&.W.a^=&..&.W.a^ 000160
 067F427C 0A573926 FC5EC402 57882607 88265272 07392605 7F597C02 5739260A .&9W.|Y..&9.rR&..&.W.a^=&9W.|B.. 000180
 C4217204 47392606 7F297C06 5739260A 5EC40657 88260447 88263A72 08473926 &9G.r:&.G.&.W.a^.&9W.|)..&9G.r!a 0001A0
 02E80001 88057704 47392606 7C0D7F06 5739260A 5EC40E57 88260C47 8826FC5E ^=&.G.&.W.a^.&9W...|.&9G.w.j..S. 0001C0
 5E880346 E9037C08 DE7E83DE 46FF03E8 0000DE46 C7035EE9 C0280574 C008C028 +a.at.+aO^.uF8..S..F8.-8.|.OF..^ 0001E0

Dump of file SATURN:[PCCOMMON.DUMP.DLL]BRD.TMP;1 on 18-APR-1990 10:36:59.83
File ID (519,15,0)   End of file block 272 / Allocated 272

Virtual block number 107 (0000006B), 512 (0200) bytes

 A5A5A50A 8E1E0716 F088E07E 80085688 06468802 08E90C46 89038A87 88E3010E &iD.....FEO...F..V..-A.P....OEEE 000000
 E446890E 5788260C 478826E2 5689E046 89025788 26078826 065EC402 17E91FA5 E.O..a^.&..&.W..FA.Va&.G.&.W..FO 000020
 D8E91FA5 A5A5A50A 8E1E0716 F088E07E 80000805 08568806 468801F6 E9E65689 .VIO-..F..V.....-A.P....OEEEE.OU 000040
 E65689E4 46890657 88260447 8826E256 89E04689 0A578826 08478826 065EC401 .a^.&.G.&.W..FA.Va&.G.&.W..FO.VI 000060
 065EC402 57892607 892(FC5E C4000A83 00052002 57882607 8826065E C40189E9 O;.a^.&..&.W.-...O.a^=&..&.W.a^. 000080
 00050502 57882607 8826065E C4065789 26044789 26FC5EC4 06578826 04/78826 &.G.&.W.a^=&.G.&.W.a^.&..&.W.... 0000A0
 0C478926 FC5EC40E 5788260C 47882606 5EC40A57 89260847 8926FC5E C400 283 .@.a^=&.G.&.W.a^.&.G.&.W.a^=&.G. 0000C0
 89260789 26FC5EC4 000A8300 0520DA57 88260847 8826065E C40155E9 0E578926 &.W.OU.a^.&.G.&.W.-...O.a^=&..&. 0000E0
 26084788 26065EC4 06578926 04478926 FC5EC406 57882604 47882606 5EC40257 W.a^.&.G.&.W.a^=&.G.&.W.a^.&.G.& 000100
 C40E5788 260C4788 26065EC4 0A578926 08478926 FC5EC400 02830005 050A5788 .W.....@.a^=&.G.&.W.a^.&.G.&.W.a 000120
 57892607 8926FC5E C4025788 26078826 065EC400 EFE90E57 89260C47 8926FC5E ^=&.G.&.W.Oy.a^.&..&.W.a^=&..&.W 000140
 065EC406 57892604 478926FC 5EC4000A 8300052D 0E578826 0C478826 065EC402 .a^.&.G.&.W.-...O.a^=&.G.&.W.a^. 000160
 05050E57 88260C47 8826065E C40A5789 26084789 26FC5EC4 0A578826 08478826 &.G.&.W.a^=&.G.&.W.a^.&.G.&.W... 000180
 26FC5EC4 02578826 07882606 5EC4008A E90E5789 260C4789 26FC5EC4 00028300 ..@.a^=&.G.&.W.O..a^.&..&.W.a^=& 0001A0
 89260447 8926FC5E C4000A83 00052006 57882604 47882606 5EC40257 89260789 ..&.W.a^.&.G.&.W.-...O.a^=&.G.&. 0001C0
 26044788 26065EC4 0A578926 08478926 FC5EC40A 57882608 47882606 5EC40657 W.a^.&.G.&.W.a^=&.G.&.W.a^.&.G.& 0001E0

Dump of file SATURN:[PCCOMMON.DUMP.DLL]BRD.TMP;1 on 18-APR-1990 10:36:59.83
File ID (519,15,0)   End of file block 272 / Allocated 272

Virtual block number 108 (0000006C), 512 (0200) bytes

 1C770009 3D00012D 24E826E8 0E578926 0C478926 FC5EC400 02830005 05065788 .W.....@.a^=&.G.&.W.S&$-..=..w. 000000
 04DC7E83 08060821 08A70CFC 0AE50ACD 08430CFC 0C000C72 0CE8A7FF 2E93C003 .a...IO.r...=.C.e.I.=.I.!....-E. 000020
 E85EC460 74000C7E 83737402 0C7E8379 74010C7E 837F7408 0C7E8300 85E90375 u.O...-E.t..-E.ty.-E.ts.-E.tma^O 000040
 57882607 8826E85E C4025789 26078926 FC5EC400 0A830005 20025788 26078826 &..&.W.-...O.a^=&..&.W.a^O&..&.W 000060
 00052006 57882604 478826E8 5EC40A57 89260847 8926FC5E C4000283 00050502 .....@.a^=&.G.&.W.a^O&.G.&.W.-.. 000080
 C4000283 00050506 57882604 478826E8 5EC40657 89260447 8926FC5E C4000A83 .O.a^=&.G.&.W.a^O&.G.&.W.....@.a 0000A0
 26057F59 7C025739 260A5EC4 02578826 078826FC 5EC40E57 89260C47 8926FC5E ^=&.G.&.W.a^=&..&.W.a^.&9W.|Y..& 0000C0
 04478826 3A720847 3926067F 427C0A57 3926FC5E C4025788 26078826 52720739 9.rR&..&.W.a^=&9W.|B..&9G.r:&.G. 0000E0
 0E578826 0C478826 FC5EC421 72044739 26067F29 7C065739 260A5EC4 06578826 &.W.a^.&9W.|)..&9G.r!a^=&.G.&.W. 000100
 E8DC4688 0574C008 C02802E8 00018805 77044739 26067C0D 7F065739 260A5EC4 a^.&9W...|.&9G.w.j..S.+a.at..FES 000120
 FC4689EC 4680088E 09A9881E 56570000 24C8C8C9 5F5E1F00 E8000888 FCAEE908 .OU=j..S..^ eUA$..WV.j`..A.F&.F= 000140
 0A589A50 16E84680 0676FF08 76FF0E40 09C29A00 6A006A06 76FF0876 FFFE568C .Vt.v..v.j.j..o.a..v..v..FO.P.X. 000160
 40578826 3E478826 0C5EC4DE 56890C46 89EA5688 E8468801 58E90374 C0080E70 p..at.OX..FO.Vo.FE.VBa^E&.G>&.Wa 000180
 237400E4 7E83067F 287C00E6 7E830670 00F09A50 16E44680 5052E256 89E04689 .FA.VaRP.FO.P.P.p..-I.|+...-O.t# 0001A0
 00018806 74C0080C C483FF78 E80EE076 FFE276FF 0A76FF0C 76FF0E76 FF1076FF .v..v..v..v..va.vA.Ox..a..at.j.. 0001C0
 26FC5EC4 1FA5F200 0889DA8E 1E0716F0 88EC7E80 0016050E 56880C46 880102E9 O...FE.VB....-S.P....O;.. E.a^=& 0001E0
```

```
Dump of file SATURN:[PCCOMMON.DUMP.DLL]BRD.TMP;1 on 18-APR-1990 10:36:59.83
File ID (519,15,0)   End of file block 272 / Allocated 272

Virtual block number 109 (0000006D), 512 (0200) bytes

 5F832605 046F8326 FC5EC400 0A578326 05084783 26FC5EC4 00025F83 26052F83 ./.&. ..á^=&.G..&.W..á^=&.o..&._ 000000
 02573926 0A5EC402 57882607 8826FC5E C4000E57 8326050C 478326FC 5EC40006 ..á^=&.G..&.W..á^=&..&.W.á^.&9W. 000020
 72084739 26067F42 7C0A5739 26FC5EC4 02578826 07882652 72073926 057F597C |Y..&9.rR&..&.W.á^=&9W.|B..&9G.r 000040
 478826FC 5EC42172 04473926 067F297C 06573926 0A5EC406 57882604 4788263A :&.G.&.W.á^.&9W.|)..&9G.r!á^=&.G 000060
 74C008C0 2802E800 01880577 04473926 067C007F 06573926 0A5EC40E 5788260C .&.W.á^.&9W...|.&9G.w.¡..Š.+â.ât 000080
 0A76FF0C 76FF0457 89260247 8926EA56 88E84688 0E5EC400 0107C726 0E5EC430 =á^.&ú...á^..FÒ.Vö&.G.&.W..v..v. 0000A0
 91E907E8 0001881A 4789260E 5EC408C4 83FA12E8 0E505200 16050E56 880C4688 .Fé.V8...RP.Ò.*.á.á^.&.G.¡..Š.Õ. 0000C0
 89003605 08568806 46880088E 0E16881E 56570000 1EC8C8C9 5F5E1F00 E8C028FE ±+âŠ..^_èùà...WV.¡...Ä.F..V..6.. 0000E0
 26527207 3926057F 597C0257 39260A5E C4025788 26078826 FC5EC4FE 5689FC46 F=.V±á^=&..&.W.á^.&9W.|Y..&9.rR& 000100
 C4065788 26044788 263A7208 47392606 7F427C0A 573926FC 5EC40257 88260788 ..&.W.á^=&9W.|B..&9G.r:&.G.&.W.á 000120
 39260A5E C40E5788 260C4788 26FC5EC4 21720447 3926067F 297C0657 39260A5E ^.&9W.|)..&9G.r!á^=&.G.&.W.á^.&9 000140
 47882606 5EC4000F E90374C0 08C02802 E8000188 05770447 3926067C 007F0657 W...|.&9G.w.¡..Š.+â.ât.ÒÒ.á^.&.G 000160
 05C28CC3 88008AE9 0375C008 077F00C3 E9037002 08F85689 F646895A 57882658 X&.WZ.F-.V½.@).Òú....âu.Òo..ú.ò. 000180
 89E64689 02571826 07?8260A 5EC40257 88260788 26F25EC4 F45689F2 46890016 ...F·.V¶á^·&..&.W.á^.&+.&.W..F|. 0001A0
 5E80E456 89E24689 06571826 04472826 0A5EC406 57882604 478826F2 5FC4E856 VÒá^·&.G.&.W.á^.&+G.&.W..Fã.Vö.^ 0001C0
 8F9AE25E 8D10C102 8F9AE25E 8D108906 C29A1081 028F9AE6 5E8D10AC 028·9AE6 |.¢.¯..^|.¢.Ÿ..ò.¿..^ã.¢.è..^ã.¢ 0001E0

Dump of file SATURN:[PCCOMMON.DUMP.DLL]BRD.TMP;1 on 18-APR-1990 10:36:59.83
File ID (519,15,0)   End of file block 272 / Allocated 272

Virtual block number 110 (0000006E), 512 (0200) bytes

 8D08C483 FFFF0785 9A100A03 EF9ADC88 08EC8310 D506019A 10C806C2 9A10C602 .ó..ó.ù..!.f..ê..É.ÿ.Ö..ç....á.. 000000
 069A1101 028F9AF6 5E8D10FC 02329AEA 5E8D1FA5 A5A5A50A 8E1E0716 F088EA7E ~ö.Þ....ÖEEEE..^ö.2.•..^-.¢....• 000020
 0207C726 0E5EC41E E8C02804 E80274C0 08FA4689 C02802E8 00018805 7210A406 .Ê.r.¡..Š.+â.F'.ât.Š.+âŠ.á^.&ú.. 000040
 000018C8 C8C95F5E 1F00E800 01880457 89260247 89260856 88064688 0E5EC400 .á^..F..V.&.G.&.W.¡..Š..^_èùà... 000060
 5016FC46 800676FF 0876FF11 6309C29A 006A006A 0676FF08 76FF088E 0F82881E .¡ý..Ä.v..v.j.j..ô.c..v..v̄..F•.P 000080
 263E4788 26EC5EC4 EE5689EC 4689FE56 88FC4688 0080E903 74C00811 930A589A .X....ât.Ō¯..F=.V±.F§.VŸá^§&.G>& 0000A0
 F87E8306 7F2A7C00 FA7E830E 3000F09A 5016F846 8D5052F6 5689F446 89405788 .W@.F¶.V-RP.F½.P.Þ.O..-ª.|*...-½ 0000C0
 0574C008 0CC483FF 83E80EF4 76FFF676 FF0A76FF 0C76FF0E 76FF1076 FF227400 .t".v..v..v..v..v~.v¶.Ò...á..ât. 0000E0
 EF09C29A 006A006A 5052EA56 89E84689 44578826 42478826 EC5EC45B E8000188 ¡..Š[á^§&.GB&.WD.FÒ.VöRPj.j..ò.ÿ 000100
 76FF0C76 FF0E76FF 1076FF24 75C00811 530A589A 5016F046 8DE876FF EA76FF11 ..vò.vÒ.FÞ.P.X.S..âu$.v..v..v..v 000120
 00E8C028 FF39E9C8 E809E800 01880574 C0080CC4 83FD9FE8 0EF076FF F276FF0A ..v·.vÞ.Ò.».á..ât.¡..Š.Šâð9.+âŠ. 000140
 7400107E 83067500 0A7E8318 74020A7E 83088E11 42881E56 5700001A C8C8C91F .èùà...WV.¡B..A.-..t..-..u..-..t 000160
 46800C76 FF0E76FF 0676FF08 76FF00F1 E9C02805 7500127E 83087501 0A7E830C ..-..u..-..u.+âÒþ..v..v..v..v..F 000180
 C008EA46 89F456E8 0E5016F8 46805016 F0468050 16F4468D 5016EC46 8D5016F6 -.P.F§.P.F¶.P.FÞ.P.F½.P.ÒV¶.Fö.â 0001A0
 FA83E856 89E64689 18578826 16478826 145EC400 B6E9C028 057500F6 7E830675 u..~-.u.+âÒÑ.á^.&.G.&.W..F|.VÒ.* 0001C0
 82E9C028 0572EC46 39057F0C 7CEE5639 E85688E6 46881776 FFFF3005 7F1E7CFF .|...=..v..F|.VÒ9VŸ|...9Fšr.+âÒ. 0001E0

Dump of file SATURN:[PCCOMMON.DUMP.DLL]BRD.TMP;1 on 18-APR-1990 10:36:59.83
File ID (519,15,0)   End of file block 272 / Allocated 272

Virtual block number 111 (0000006F), 512 (0200) bytes

 57892602 47892608 56880646 88145EC4 07892603 848488E6 D10A7688 145EC400 .á^..v.i|....&..á^..F..V.&.G.&.W 000000
 260E4789 26F25688 F0468814 5EC41FA5 A5A5A51F 161EF876 80067F8D 145EC404 .á^.....v½...EEEE.á^..FÞ.V·&.G.& 000020
 7E835052 00140516 56881446 88287500 F47E8312 478926F4 4688145E C4105789 .W.á^..F¶&.G..~¶.u+.F..V....RP.- 000040
 01880CC4 83F596E8 0E0676FF 0876FF50 52F25688 F0468806 E899C028 05740012 ..t.+â.Š..FÞ.V·RP.v..v..Ò.%.á.¡. 000060
 6A006A06 76FF0876 FF0000EE 46C7D88E 1228881E 000022C8 C8C95F5E 1F00E800 .Š..^_èùà"...¡+..ÁùFŸ...v..v.j.j 000080
 FC468800 FFE90374 C00813A4 0A589A50 16FC468D 0676FF08 76FF1374 09C29A00 ..ô.t¯..v..v..F•.P.X.Ê..ât.Ô...F• 0000A0
 16F4468D 5052F256 89F04689 40578826 3E478826 E65EC4E8 5689E646 89FE5688 .V±.F|.VÒá^|&.G>&.W@.FÞ.V·RP.F¶. 0000C0
 0A76FF0C 76FF0E76 FF1076FF 227400F4 7E83067F 2A7C00F6 7E8313F0 00F09A50 P.Þ.Þ..—.|*...-¶.t".v..v..v..v. 0000E0
 57882642 478826E6 5EC40001 EE46C705 74C0080C C483FF7E E80EF076 FFF276FF .v·.vÞ.Ò—..á..ât.úFŸ..á^|&.GB&.W 000100
 0A589A50 16EA468D DE76FFE0 76FF1400 09C29A00 6A006A50 52E05689 DE468944 D.F8.VÁRPj.j..ò....vÁ.v8.Fö.P.X. 000120
 6A006A48 77FF264A 77FF26E2 5EC4E456 89E24689 EC5688EA 46887375 C0081424 $..âus.Fö.Vê.Fã.Vöá^ã&.wJ&.wHj.j 000140
 C43775C0 0811DF0A 589A5016 F8468048 77FF264A 77FF26E2 5EC41439 09C29A00 ..ò.9.á^ã&.wJ&.wH.F½.P.X.Ô..âu7á 000160
 77FF2606 77FF260A 76FF0C76 FF016A00 6A0E76FF 1076FF28 7500047F 8326F85E ^½&....u+.v..v.j.j..v..v.&.w.&.w 000180
 E8EE4688 FEEAE9FF 79E980E8 0001EE46 C70574C0 0812C483 FD88E80E 37FF2602 .&.7.ÒE».á..ât.úFŸ..Š¯Òy.Õõ±.FŸŠ 0001A0
 09C29A00 6A006A06 76FF0876 FF0000EE 46C7D88E 134E881E 000022C8 C8C91F00 _.èùà"...¡N..ÁùFŸ...v..v.j.j..ò. 0001C0
 89FE5688 FC468800 FFE90374 C00814E0 0A589A50 16FC468D 0676FF08 76FF1480 ¯..v..v..F=.P.X.Á..ât.Ô...F=.V±. 0001E0
```

```
Dump of file SATURN:[PCCOMMON.DUMP.DLL]BRD.TMP;1 on 18-APR-1990 10:36:59.83
File ID (519,15,0)   End of file block 272 / Allocated 272

Virtual block number 112 (00000070), 512 (0200) bytes

 00F09A50 16F4468D 5052F256 89F04689 40578826 3E478826 E65EC4E8 5689E646 Fl.VÒá^l&.G>&.Wa.FÞ.V·RP.F¶.P.Þ. 000000
 FFF276FF 0A76FF0C 76FF0E76 FF1076FF 227400F4 7E83067F 2A7C00F6 7E831364 d..~-.|*...¬¶.t".v..v..v..v..v·. 000020
 DE468944 57882642 478826E6 5EC40001 EE46C705 74C0080C C483FF7E E80EF076 vÞ.Ò~..é..ât.úFŸ..á^l&.G8&.WD.F8 000040
 C0081560 0A589A50 16EA468D DE76FFE0 76FF153C 09C29A00 6A006A50 52E05689 .VÀRPj.j..ô.<..vÁ.v8.Fõ.P.X.`..á 000060
 09C29A00 6A006A4C 77FF264E 77FF26E2 5EC4E456 89E24689 EC5688EA 46887375 us.Fõ.Vê.Fã.VÒá^ã&.wN&.wLj.j..ô. 000080
 8326F85E C43775C0 0814A00A 589A5016 F8468D4C 77FF264E 77FF26E2 5EC41575 u.á^ã&.wN&.wL.F½.P.X....âu7á^½&. 0000A0
 37FF2602 77FF2606 77FF260A 76FF0C76 FF006A01 6A0E76FF 1076FF28 7500047F ...u*.v..v.j.j..v..v.&.w.&.w.&.7 0000C0
 C8C91F00 E8EE4688 FEEAE9FF 79E980E8 0001EE46 C70574C0 0812C483 FC7FE80E .Ô.•.é..ât.úFŸ..$¯Öy.Õö±.FŸŠ..èù 0000E0
 8D0676FF 0876FF15 E709C29A 006A006A 0676FF08 76FFD88E 148A881E 000034C8 â4...¡...Å.v..v.j.j..ô.Ô..v..v.. 000100
 26D45EC4 D6568904 4689EE56 88EC4688 0177E903 74C00816 170A589A 5016EC46 F&.P.X....ât.Ôw..Fê.VŸ.Fâ.Vøá^â& 000120
 7F2B7C00 E67E8316 6400F09A 5016E446 805052E2 5689E046 8940578B 263E4788 .G>&.Wa.FÁ.VãRP.Fõ.P.Þ.d..¬l.|+. 000140
 0CC483FF 83E80EE0 76FFE276 FF0A76FF 0C76FF0E 76FF1076 FF237400 E47E8306 ..¬ô.t#.v..v..v..v..vã.vÁ.Ô...é. 000160
 6A006A50 52CE5689 CC468944 57882642 47882604 5EC40121 E90001B8 0674C008 .ât.¡..Ôl.á^â&.G8&.WD.Fä.VöRPj.j 000180
 0C468800 E7E90374 C008169B 0A589A50 16DC468D CC76FFCE 76FF1674 09C29A00 ..ô.t..vö.va.FÉ.P.X....ât.ÔÖ..FÉ 0001A0
 D05EC416 8009C29A 006A006A 4877FF26 4A77FF26 D05EC4D2 56890046 89DE5688 .V8.FÁ.Vøá^Â&.wJ&.wHj.j..ô.¯.á^À 0001C0
 067F8326 E85EC400 A8E90374 C008152C 0A589A50 16E8468D 4877FF26 4A77FF26 &.wJ&.wH.FÒ.P.X.,..ât.Ó´.á^Ò&... 0001E0

Dump of file SATURN:[PCCOMMON.DUMP.DLL]BRD.TMP;1 on 18-APR-1990 10:36:59.83
File ID (519,15,0)   End of file block 272 / Allocated 272

Virtual block number 113 (00000071), 512 (0200) bytes

 FFFF04B6 9A5016F0 4680016A 50520A56 89D84689 02578826 07882608 E8027402 .t.$A&..&.W..FÁ.VÖRPj..FÞ.P.Ñ... 000000
 02573926 FA5688F8 46884072 07392605 7F477C02 573926F2 5688F046 880A5EC4 á^..FÞ.V·&9W.|G..&9.ra.F½.V*&9W. 000020
 FC468819 72044739 26067F21 7C065739 26F65688 F4468820 77073926 057C347F .4|.&9.w·.F¶.V-&9W.|!..&9G.r..F• 000040
 260E5EC4 2274C008 C02802E8 00018805 77044739 26067C0D 7F065739 26FE5688 .V±&9W...|.&9G.w.¡..$.+á.ât"á^.& 000060
 3CE900E8 00018804 57892602 4789260E 5EC40257 88260788 26E85EC4 000507C7 ú...á^Ò&..&.W.á^.&.G.&.W.¡..$.Ô< 000080
 F84689E8 468D088E 15C6881E 56570000 1CC8C8C9 1F00E8C0 28FE72E9 FF02E9FF .Ô..Ôr±+â$..èúâ...WV.¡ó..Å.FÒ.F½ 0000A0
 0A589A50 16E4468D 0676FF08 76FF17A0 09C29A00 6A006A06 76FF0876 FFFA568C .V*.v..v.j.j..ô....v..v..FÒ.P.X. 0000C0
 1E0716F0 88E87E8D 000C05FE 5689FC46 89E65688 E4468801 04E90374 C00815D7 •..ât.Ô...FÔ.V|.F=.V±....¬Ô.Þ... 0000E0
 0A578326 05084783 26F85EC4 00025F83 26052F83 26F85EC4 1FA5F200 0889DA8E .Ö¿..·È.á^½&./.&._..á^½&.G..&.W. 000100
 8826F85E C4000E57 8326050C 478326F8 5EC40006 5F832605 046F8326 F85EC400 .á^½&.o..&._..á^½&.G..&.W..á^½&. 000120
 26F85EC4 02578826 07882652 72073926 057F597C 02573926 0A5EC402 57882607 .&.W.á^.&9W.|Y..&9.rR&..&.W.á^½& 000140
 067F297C 06573926 0A5EC406 57882604 4788263A 72084739 26067F42 7C0A5739 9W.|B..&9G.r:&.G.&.W.á^.&9W.|).. 000160
 04473926 067C0D7F 06573926 0A5EC40E 5788260C 478826F8 5EC42172 04473926 &9G.r!á^½&.G.&.W.á^.&9W...|.&9G. 000180
 8926E656 88E4468B 0E5EC400 0607C726 0E5EC43D 74C008C0 2802E800 01880577 w.¡..$.+á.ât=á^.&ú...á^..FÒ.V|&. 0001A0
 5EC408C4 83F106E8 0E505200 0C05FE56 88FC4688 0A76FF0C 76FF0457 89260247 G.&.W..v..v..F=.V±...RP.Ò.Þ.á.á^ 0001C0
 D88E1776 881E0000 32C8C8C9 5F5E1F00 E8C028FE E5E907E8 00018B1A 4789260E .&.G.¡..$.Ôl±+â$..^_èúâ2...¡v..À 0001E0

Dump of file SATURN:[PCCOMMON.DUMP.DLL]BRD.TMP;1 on 18-APR-1990 10:36:59.83
File ID (519,15,0)   End of file block 272 / Allocated 272

Virtual block number 114 (00000072), 512 (0200) bytes

 0819000A 589A5016 F0468D06 76FF0876 FF180009 C29A006A 006A0676 FF0876FF .v..v.j.j..ô.ï..v..v..FÞ.P.X.... 000000
 E2468940 5788263E 478826DA 5EC4DC56 89DA4689 F25688F0 468801DE E90374C0 ât.Ô8..FÞ.V·.FÖ.VÉá^Ò&.G>&.Wa.Fã 000020
 1076FF23 7400E67E 83067F28 7C00E87E 83196000 F09A5016 E6468D50 52E45689 .VÖRP.Fl.P.Þ.`..¬Ô.|+...¬l.t#.v. 000040
 0188E900 01880674 C0080CC4 83FF83E8 0EE276FF E476FF0A 76FF0C76 FF0E76FF .v..v..v..vÔ.vã.Ô...á..ât.¡..Ô.. 000060
 09C29A00 6A006A42 77FF2644 77FF260D 5689CE46 8944578B 2642478B 260A5EC4 á^Ô&.G8&.WD.Fö.VÂ&.wD&.wBj.j..ô. 000080
 4688011C E90374C0 0819F50A 589A5016 DE468042 77FF2644 77FF260A 5EC41975 u.á^Ô&.wD&.w8.F8.P.X.%..ât.Ô...F 0000A0
 77FF2652 77FF2606 5EC40A76 FF0C76FF 0E76FF10 76FF0856 89D64689 E05688DE 8.VÁ.Fø.VÁ.v..v..v..v.á^ø&.wR&.w 0000C0
 88264847 8826065E C40002EA 46C70116 E90001B8 0674C008 0CC483FD C9E80E50 P.Ôè».á..ât.¡..Ô..úFõ..á^ø&.GH&. 0000E0
 4EFFEA46 88FE5689 FC46894E 5788264C 47882606 5EC411E8 FE5689FC 46894A57 WJ.F•.V±Š.á^ø&.GL&.WN.F•.V±.Fõ.N 000100
 EC468DFC 76FFFE76 FF1A0509 C29A006A 006AFC76 FFFE76FF 00AFE903 75C008EA õ.âu.Ô£..v±.v•j.j..ô....v±.v•.F& 000120
 57882607 8826EC5E C448E806 478826EC 5EC40086 E90374C0 0817900A 589A5016 .P.X....ât.Ô..á^$&.G.ŠHá^$&..&.W 000140
 078826EC 5EC435E8 FA5689F8 46892857 88262647 8826D25E C4D45689 D2468902 ..F•.Vâá^ø&.G&&.W(.F½.V*$5á^$&.. 000160
 0810E812 E8FA5689 F9468926 57882624 478826F4 5EC4F656 89F44689 02578826 &.W..F¶.V-á^¶&.G$&.W&.F½.V*$.$.. 000180
 76FFFA76 FF0A76FF 0C76FF0E 76FF1076 FF00E8CD 74000230 AF7E0001 3D0C7CC0 â|.=..-€=..teŠ..v..v..v..v..v*.v 0001A0
 0E76FF10 76FFFEC8 E^FF33E9 FF63E937 E8000188 0574C008 0CC483FC E9E80EF8 ½.ÔÕ=.á..ât.¡..$7Ôc.Ô3.Ôâ±.v..v. 0001C0
 E8000188 0574C008 0CC483FC 89E80E66 77FF2668 77FF260A 5EC40A76 FF0C76FF .v..v.á^Ò&.wh&.wf.Ô¿=.á..ât.¡..$ 0001E0
```

```
Dump of file SATURN:[PCCOMMON.DUMP.DLL]BRD.TMP;1 on 18-APR-1990 10:36:59.83
File ID (519,15,0)   End of file block 272 / Allocated 272

Virtual block number 115 (00000073), 512 (0200) bytes

 0B06468B 0000E646 C7D88E18 8CB81E56 57000026 C8C8C91F 00EBC028 FE08E907 .Ô.±+åŠ..èùà&..WV.¡¥..ÀúFÌ...F.. 000000
 5EC4035D E98DF388 06751246 0B104688 087F070E 7E830E7C 000E7E83 14740846 F.t..~..|..~.....F..F.u.¡µ.Ö].á^ 000020
 E276FFE4 76FF1828 09C29A00 6A006A50 52E45689 E2468916 57882614 47882606 .&.G.&.W..Fã.VöRPj.j..ô.(..vô.vã 000040
 E90314E9 03740739 260E4688 DA5EC403 25E90374 C00B18CD 0A589A50 160A468D .FÖ.P.X.é..åt.ÖX.á^Ö.F.&9.t.Ö..Ö 000060
 A5F20008 B90A8E1E 0716F088 E87E8D00 1605E056 89DE4689 DC56880A 468802DF Ô..FÖ.VÉ.F8.VÅ....~Ö.Þ....Ö¿..·É 000080
 83260508 478326F8 5EC40002 5F832605 2F8326F8 5EC4FA56 8CF84689 E84680 1F ..FÖ.F%.V•á^½&./.&. ..á^½&.G..&. 0000A0
 F85EC400 0E578326 050C4783 26F85EC4 00065F83 2605046F 8326F85E C4000A57 W..á^½&.o..&.  ..á^½Ï.G..&.W..á^½ 0000C0
 5EC40257 88260788 26527207 3926057F 597C0257 39260A5E C4025788 26078826 &..&.W.á^.&9W.|Y..&9.rR&..&.W.á^ 0000E0
 297C0657 39260A5E C4065788 26044788 263A7208 47392606 7F427C0A 573926F8 ½&9W.|B..&9G.r:&.G.&.W.á^.&9W.|) 000100
 3926067C 0D7F0657 39260A5E C40E5788 260C4788 26F85EC4 21720447 3926067F ..&9G.r!á^½&.G.&.W.á^.&9W...|.&9 000120
 DC5688DA 4688105E C4000107 C726105E C43E74C0 08C02802 EB0001B8 05770447 G.w.¡..Š.+å.åt>á^.&ú...á^..FÖ.VÉ 000140
 08C483ED 64E80E50 52001605 E05688DE 46880A76 FF0C76FF 04578926 02478926 &.G.&.W..v..v..F8.VÅ...RP.ÔdÜ.á. 000160
 FFDC76FF 0A76FF0C 76FF1076 FF1276FF 0203E902 0EE90001 881A4789 26105EC4 á^.&.G.¡..Ö..Ö...v..v..v..v..vÉ. 000180
 016A006A 1076FF12 76FF01D0 E901E8E9 00018806 74C0080C C483F344 E80EDA76 vÖ.ÖDµ.á..åt.¡..ÖÖ.Öl..v..v.j.j. 0001A0
 82E90001 E646C705 74C00812 C483F591 E80EDA76 FFDC76FF 006A0A76 FF0C76FF .v..v.j..vÉ.vÖ.Ö.%.á..åt.úFÌ..Öý 0001C0
 12C483F5 66E80EDA 76FFDC76 FF016A0A 76FF0C76 FF006A01 6A1076FF 1276FF01 ..v..v.j.j..v..v.j..vÉ.vÖ.Öf%.á. 0001E0

Dump of file SATURN:[PCCOMMON.DUMP.DLL]BRD.TMP;1 on 18-APR-1990 10:36:59.83
File ID (519,15,0)   End of file block 272 / Allocated 272

Virtual block number 116 (00000074), 512 (0200) bytes

 9A501601 6ADA76FF DC76FFFA 568CF846 89E8468D 0187E900 01E646C7 0574C008 .åt.úFÌ..Ö...FÖ.F%.V•.vÉ.vÖj..P. 000000
 88265272 07392605 7F597C02 5739260A 5EC40257 88260788 26F85EC4 160E0486 Ñ.B.á^½&..&.W.á^.&9W.|Y..&9.rR&. 000020
 5EC40657 88260447 88263A72 08473926 067F427C 0A573926 F85EC402 57882607 .&.W.á^½&9W.|B..&9G.r:&.G.&.W.á^ 000040
 5739260A 5EC40E57 88260C47 8826F85E C4217204 47392606 7F297C06 5739260A .&9W.|)..&9G.r!á^½&.G.&.W.á^.&9W 000060
 5EC40005 07C72610 5EC41F74 C00BC028 02EB0001 88057704 47392606 7C0D7F06 ...|.&9G.w.¡..Š.+å.åt.á^.&ú...á^ 000080
 46890C56 88DA468 '0008E900 E6E90001 88045789 26024789 260C5688 DA468810 ..FÖ.VÉ&.G.&.W.¡..Öl.ÖÜ..FÖ.VÉ.F 0000A0
 597C0257 39260A5. C4025788 26078826 F85EC4FA 5689F846 89000C05 FE5689FC •.V±....F%.V•á^½&..&.W.á^.&9W.|Y 0000C0
 263A7208 47392606 7F427C0A 573926F8 5EC40257 88260788 26527207 3926057F ..&9.rR&..&.W.á^½&9W.|B..&9G.r:& 0000E0
 260C4788 26F85EC4 21720447 3926067F 297C0657 39260A5E C4065788 26044788 .G.&.W.á^.&9W.|)..&9G.r!á^½&.G.& 000100
 C41E74C0 08C02802 EB0001B8 05770447 3926067C 0D7F0657 39260A5E C40E5788 .W.á^.&9W...|.&9G.w.¡..Š.+å.åt.á 000120
 EB34EB3E EB0001B8 04578926 02478926 DC5688DA 4688105E C4000607 C726105E ^.&ú...á^..FÖ.VÉ&.G.&.W.¡..Š>Š4Š 000140
 60E90375 00043DFE 30E90375 00033DFE 1FE90375 00023DFD 19E90375 00013D32 2=..u.Ö.»=..u.Ö.±=..u.Ö=±=..u.Ö' 000160
 CBC95F5E 1F00EBE6 4688FCC4 E900EBFF 27E90375 00063DFE 83E90375 00053DFE ±=..u.Ö.±=..u.Ö'.Š.Öá•.FÌŠ..^_èù 000180
 0E76FF01 6A016A00 6A006A0C 77FF260E 77FF2606 5EC4D88E 1AD3B81E 000000C8 à....¡&..Àá^.&.w.&.w.j.j.j.j.¯v. 0001A0
 C02B0006 57832601 04478326 065EC411 EB8E0688 0574C008 1B18029D 9A0C76FF .v.......åt.¡..Š.á^.&.G..&.W..+à 0001C0
 76FF1ECC 09C29A00 6A006A0E 76FF1076 FFD88E1E 66881E00 0014C8C8 C91F00EB Š..èùà....¡f..Á.v..v.j.j..ô.a..v 0001E0

Dump of file SATURN:[PCCOMMON.DUMP.DLL]BRD.TMP;1 on 18-APR-1990 10:36:59.83
File ID (519,15,0)   End of file block 272 / Allocated 272

Virtual block number 117 (00000075), 512 (0200) bytes

 5689EC46 89FA5688 F8468800 EAE90374 C00B1EFC 0A589A50 16F8468D 0E76FF10 ..v..F%.P.X.•..åt.Öõ..F%.V•.F&.V 000000
 7E831E86 00F09A50 16F4468D 5052F256 89F04689 40578826 3E478826 EC5EC4EE Ÿá^š&.G>&.Wa.FÞ.V·RP.F¶.P.Þ....~ 000020
 E80E0676 FF0876FF 0A76FF0C 76FFF076 FFF276FF 197400F4 7E83067F 217C00F6 ~.|l...~¶.t..v·.vÞ.v..v..v..v..Ò 000040
 5EC40257 88260788 26FC5EC4 FE5689FC 46890016 05EE5688 EC46880C C483FF83 ...á..F&.VŸ....F•.V±á^•&..&.W.á^ 000060
 7F427C0A 573926FC 5EC40257 88260788 26527208 47392606 7F5A7C0A 5739260A .&9W.|Z..&9G.rR&..&.W.á^•&9W.|B. 000080
 47392606 7C267F06 573926FC 5EC40E57 88260C47 88260A5E C43A7208 47392606 .&9G.r:á^.&.G.&.W.á^•&9W..&|.&9G 0000A0
 E80001B8 05770447 3926067C 0D7F0657 39260A5E C40E5788 260C4788 261E7704 .w.&.G.&.W.á^.&9W...|.&9G.w.¡..Š 0000C0
 2BFEFFE9 0AC483FE A7E80E06 76FF0876 FF016AF8 76FFFA76 FF1574C0 0BC02B02 .+å.åt..v•.v½j..v..v..Öl±.á.Ö.±+ 0000E0
 6A0E76FF 1076FFFE 568CFC46 89EC468D 088E1EA8 881E0000 28C8C8C9 1F00EBC0 åŠ..èùà(...¡¨..Á.F&.F•.V±.v..v.j 000100
 88011FE9 0374C00B 20260A58 9A5016E8 468D0E76 FF1076FF 1FF609C2 9A006A00 .j..ô.-..v..v..FÖ.P.X.& .åt.Ö... 000120
 468D5052 E25689E0 46894057 88263E47 8826085E C40A5689 D84689EA 5688E846 FÖ.Vô.FÄ.VÖá^Ä&.G>&.Wa.FÅ.VãRP.F 000140
 FF0C76FF E076FFE2 76FF1974 00E47E83 067F217C 00E67E83 206100F0 9A5016E4 ô.P.Þ.a .-|.|l...-ô.t..vã.vÅ.v.. 000160
 C29A006A 006A4277 FF264477 FF26085E C40CC483 FF7AE80E 0676FF08 76FF0A76 v..v..v..Òz..á.á^Ä&.wÖ&.wBj.j..ô 000180
 FF009CE9 0374C00B 1EBC0A58 9A50160C 46804277 FF264477 FF26085E C4207609 .v á^Ä&.wÖ&.wB.FÉ.P.X.¥..åt.Ö... 0001A0
 5739260A 5EC40257 88260788 26FC5EC4 FFFF064B 9AFC76FF FE76FFDC 76FFDE76 v8.vÉ.v±.v•.K...á^•&..&.W.á^.&9W 0001C0
 47392606 7F427C0A 573926FC 5EC40257 88260788 26527208 47392606 7F5A7C0A .|Z..&9G.rR&..&.W.á^•&9W.|B..&9G 0001E0
```

```
Dump of file SATURN:[PCCOMMON.DUMP.DLL]BRD.TMP;1 on 18-APR-1990 10:36:59.83
File ID (519,15,0)   End of file block 272 / Allocated 272

Virtual block number 118 (00000076), 512 (0200) bytes

261E7704 47392606 7C267F06 573926FC 5EC40E57 88260C47 88260A5E C43A7208 .r:á^.&.G.&.W.á^•&9W..&|.&9G.w.& 000000
08C02802 E8000188 35770447 3926067C 0D7F0657 39260A5E C40E5788 260C4788 .G.&.W.á^.&9W...|.&9G.w.¡..Š.+á. 000020
C02BFECA E9FF48E9 0AC483FD 48E80E06 76FF0876 FF026ADC 76FFDE76 FF1574C0 ät..vB.vÉj..v..v..ÒK».á.ÒH.Òò±+á 000040
76FF214C 09C29A00 6A006A0E 76FF1076 FFD88E1F CC881E00 0032C8C8 C91F00E8 Š..èùâ2...¡ä..Á.v..v.j.j..ó.LI.v 000060
56890646 89EE5688 EC468801 7DE90374 C008217C 0A589A50 16EC468D 0E76FF10 ..v..F$.P.X.|I.ät.Ô)..F&.VŸ.F•.V 000080
7E8321B7 00F09A50 16E4468D 5052E256 89E04689 40578826 3E478826 D65EC4D8 Áá^•&.G>&.Wâ.FÁ.VàRP.FÒ.P.Þ.ñI.- 0000A0
E80E0676 FF0876FF 0A76FF0C 76FFE076 FFE276FF 197400E4 7E83067F 217C00E6 I.|I...~Ô.t..vã.vÁ.v..v..v..v..Ò 0000C0
4477FF26 D65EC421 CC09C29A 006A006A 4277FF26 4477FF26 D65EC40C C483FF83 ...á.á^•&.wD&.wBj.j..Ó.äIá^•&.wD 0000E0
56890246 890E5688 0C468800 FAE90374 C00B21F3 0A589A50 160C468D 4277FF26 &.wB.FÉ.P.X.µI.ät.Ó*..FÉ.VB.F•.V 000100
4877FF26 4A77FF26 D25EC422 0809C29A 006A006A 4877FF26 4A77FF26 D25EC404 Áá^•&.wJ&.wHj.j..Ó.."á^•&.wJ&.wH 000120
89064788 26087401 047F8326 E85EC400 88E90374 C0081FE6 0A589A50 16E8468D .FÒ.P.X.I..ät.ÒÉ.á^Ò&....t.&.G.. 000140
0677FF26 0877FF26 CE5EC4D0 5689CE46 89025788 26078826 CDE80274 C008DA46 FÒ.ät.Še&..&.W..Fö.VÁá^ö&.w.&.w. 000160
47392606 7F487C0A 573926F2 5688F046 880A5EC4 000007E9 9A5016F0 4680016A j..FÞ.P.Ô...á^..FÞ.V &9W.|H..&9G 000180
0E573926 F65688F4 46882077 07392605 7C347F02 573926FA 5688F846 88407208 .rä.F½.V•&9W..4|.&9.w-.F¶.V-&9W. 0001A0
01880577 04473926 06?C007F 06573926 FE5688FC 46881972 0C473926 067F217C |I..&9G:r..F•.V±&9W...|.&9G.w.¡. 0001C0
FF0876FF 03848 7FF E3D10A5E 8837FF26 0277FF26 E85EC420 74C008C0 2802E800 .Š.+á.ät á^Ò&.w.&.7.^ÖID.ñ...v.. 0001E0

Dump of file SATURN:[PCCOMMON.DUMP.DLL]BRD.TMP;1 on 18-APR-1990 10:36:59.83
File ID (519,15,0)   End of file block 272 / Allocated 272

Virtual block number 119 (00000077), 512 (0200) bytes

28881E00 0032C8C8 C91F00E8 C028FE6C E9FEEAE9 FF29E90A C483FB9A E80E0676 v..Ò.=.á.Ò).Òô±Òl±+àŠ..èùâ2...¡+ 000000
0A589A50 16EC468D 0E76FF10 76FF2300 09C29A00 6A006A0E 76FF1076 FFD88E21 I.Ä.v..v.j.j..ó..#.v..v..F&.P.X. 000020
40578826 3E478826 D65EC408 56890646 89EE5688 EC468801 7EE90374 C0082330 0#.ät.Ô-..F&.VŸ.F•.VÄá^•&.G>&.Wâ 000040
197400E4 7E83067F 217C00E6 7E832368 00F09A50 16E4468D 5052E256 89E04689 .FÁ.VàRP.FÒ.P.Þ.k#.-I.|I...-Ô.t. 000060
4477FF26 D65EC40C C483FF83 E80E0676 FF0876FF 0A76FF0C 76FFE076 FFE276FF .vã.vÁ.v..v..v..v..Ò...á.á^•&.wD 000080
0A589A50 160C468D 4277FF26 4477FF26 D65EC423 8009C29A 006A006A 4277FF26 &.wBj.j..Ó..#á^•&.wD&.wB.FÉ.P.X. 0000A0
4C77FF26 4E77FF26 D25EC4D4 56890246 890E5688 DC468800 F8E90374 C00823A7 I#.ät.Ôw..FÉ.VB.F•.VÄá^•&.wN&.wL 0000C0
C008213C 0A589A50 16E8468D 4C77FF26 4E77FF26 D25EC423 BC09C29A 006A006A j.j..Ó.¥#á^•&.wN&.wL.FÒ.P.X.<I.á 0000E0
078826CC E8027400 0130DA46 89064788 260C7401 047F8326 E85EC400 8CE90374 t.ÒŸ.á^Ò&....t.&.G..FÖ=..t.Šä&.. 000100
0022489A 5016F046 80016A06 77FF2608 77FF26CE 5EC40056 89CE4689 02578826 &.W..Fö.VÁá^ö&.w.&.w.j..FÞ.P.H". 000120
3926FA56 88F84688 40720847 3926067F 487C0A57 3926F256 88F04688 0A5EC400 .á^..FÞ.V &9W.|H..&9G.rä.F½.V•&9 000140
8819720C 47392606 7F217C0E 573926F6 5688F446 88207707 3926057C 347F0257 W..4|.&9.w-.F¶.V-&9W.|I..&9G.r.. 000160
5EC42074 C008C028 02E80001 88057704 47392606 7C007F06 573926FE 5688FC46 F•.V±&9W...|.&9G.w.¡..Š.+á.ät á^ 000180
28E90AC4 83F9E5E8 0E0676FF 0876FF03 8487FFE3 D10A5E88 37FF2602 77FF26E8 Ò&.w.&.7.^ÖID.ñ...v..v..ÒI•.á.Ò( 0001A0
568CFC46 89EC468D D88E22DF 881E0000 30C8C8C9 1F00E8C0 28FE68E9 FEE9E9FF .ÒÒ±Òk±+àŠ..èùâ0...¡Ò".Ä.F&.F•.V 0001C0
22F00A58 9A5016E8 4680DE76 FF1076FF 248E09C2 9A006A00 6A0E76FF 1076FFFE ±.v..v.j.j..ó./$.v..v..FÒ.P.X.Þ" 0001E0

Dump of file SATURN:[PCCOMMON.DUMP.DLL]BRD.TMP;1 on 18-APR-1990 10:36:59.83
File ID (519,15,0)   End of file block 272 / Allocated 272

Virtual block number 120 (00000078), 512 (0200) bytes

46894057 88263E47 882604?E C4D65689 D44689EA 5688E846 880171E9 0374C008 .ät.Òq..FÒ.Võ.F&.V•á^Á&.G>&.Wâ.F 000000
76FF1974 00E07E83 067F217C 00E27E83 252900F0 9A5016E0 46805052 DE568?.~ É.VàRP.FÁ.P.Þ.)%.~ã.|I...-Á.t..v 000020
FF264477 FF26045E C40CC483 FF7AE80E 0676FF08 76FF0A76 FF0C76FF DC76FFD? ß.vÉ.v..v..v..v..Òz..á.á^Á&.wD&. 000040
25650A58 9A5016D8 46804277 FF264477 FF26045E C4253E09 C29A006A 006A4277 wBj.j..Ó.>%á^Á&.wD&.wB.FÄ.P.X.e% 000060
006A4877 FF264A77 FF26005E C4025689 D04689DA 56880846 8800EEE9 0374C008 .ät.ÒŸ..FÁ.VÒ.FÁ.V•á^Á&.wJ&.wHj. 000080
0374C008 24AE0A58 9A5016E4 46804877 FF264A77 FF26005E C4257A09 C29A006A j..Ó.z%á^Á&.wJ&.wH.FÒ.P.X.Û$.ät. 0000A0
869AFC76 FFFE76FF 016A37FF 260277FF 2608E802 7402067F 8326E45E C400AFE9 ÒÉ.á^Ò&....t.$Á&.w.&.7j..v±.v•.Ñ 0000C0
88265272 08473926 067F5A7C 0A573926 0A5EC402 57882607 8826FC5E C41CE204 .ã.á^•&..&.W.á^.&9W.|Z..&9G.rR&. 0000E0
5788260C 4788260A 5EC43A72 08473926 067F427C 0A573926 FC5EC402 57882607 .&.W.á^•&9W.|B..&9G.r:á^.&.G.&.W 000100
5739260A 5EC40E57 88260C47 88261E77 04473926 067C267F 06573926 FC5EC40E .á^•&9W..&|.&9G.w.&.G.&.W.á^.&9W 000120
37FF2602 77FF26E4 5EC41974 C008C028 02E80001 88057704 47392606 7C007F06 ...|.&9G.w.¡..Š.+á.ät.á^Ò&.w.&.7 000140
C8C8C91F 00E8C028 FE78E9FE F6E9FF35 E90AC483 F834E80E 0676FF08 76FF056A j..v..v..Ò4½.á.Ò5.Ò~±Òx±+àŠ..èùà 000160
46800676 FF0876FF 266609C2 9A006A00 6A0676FF 0876FFD8 8E249488 1E00000C ....¡.$.Ä.v..v.j.j..ó.f&.v..v..F 000180
4689000C 05FE5689 FC4689F6 5688F446 8800A0E9 0374C008 24EE0A58 9A5016F4 ¶.P.X.Ÿ$.ät.Ò...F¶.V-.F•.V±....F 0001A0
26527208 47392606 7F5A7C0A 5739260A 5EC40257 88260788 26F85EC4 FA5689F8 ½.V•á^½&..&.W.á^.&9W.|Z..&9G.rR& 0001C0
88260C47 88260A5E C43A7208 47392606 7F427C0A 573926F8 5EC40257 88260788 ..&.W.á^½&9W.|B..&9G.r:á^.&.G.&. 0001E0
```

```
Dump of file SATURN:[PCCOMMON.DUMP.DLL]BRD.TMP;1 on 18-APR-1990 10:36:59.83
File ID (519,15,0)   End of file block 272 / Allocated 272

Virtual block number 121 (00000079), 512 (0200) bytes

 39260A5E C40E5788 260C4788 261E7704 47392606 7C267F06 573926F8 5EC40E57 W.á^%&9W..&|.&9G.w.&.G.&.W.á^.&9 000000
 FF066AF4 76FFF676 F+1574C0 08C02B02 EB000188 05770447 3926067C 0D7F0657 W...|.&9G.w.|..Š.+à.àt..v-.v¶j.. 000020
 D88E2645 881E0000 28C8C8C9 1F00EBC0 28FF49E9 0AC483F7 57E80E0E 76FF1076 v..v..ÒW%.á.Òl.+àŠ..èùà(...¡E&.Ä 000040
 0827600A 589A5016 F4468D0E 76FF1076 FF273009 C29A006A 006A0E76 FF1076FF .v..v.j.j..ô.=′.v..v..F¶.P.X.m′. 000060
 E8468940 5788263E 478826E0 5EC4E256 89E04689 F6568BF4 468801D5 E90374C0 àt.Ôl..F¶.V-.FÁ.Vàá^Á&.G>&.WQ.FÒ 000080
 EA76FF19 7400EC7E 83067F21 7C00EE7E 8327A800 F09A5016 EC468D50 52EA5689 .VÒRP.F&.P.Þ.´′.~Y.|l...-&.t..vō 0000A0
 77FF2644 77FF26E0 5EC40CC4 83FF83E8 0E0676FF 0876FF0A 76FF0C76 FFE876FF .vÒ.v..v..v..v..Ò...á.á^Á&.WÒ&.w 0000C0
 0828020A 589A5016 E4468D42 77FF2644 77FF26E0 5EC427BD 09C29A00 6A006A42 8j.j..ô.§′á^Á&.WÒ&.wB.Fô.P.X..(. 0000E0
 5EC40A76 FF0C76FF 0676FF08 76FFDE56 890C4689 E6568BE4 46880134 E90374C0 át.Ò4..Fô.Vl.FÉ.VB.v..v..v..v.á^ 000100
 9A006A00 6A4C77FF 264E77FF 260C5EC4 0CC483FE 52E80E50 77FF2652 77FF260C É&.wR&.wP.ÒR±.á.á^É&.wN&.wLj.j.. 000120
 F05EC430 75C00828 5F0A589A 5016F046 804C77FF 264E77FF 260C5EC4 281709C2 ô..(á^É&.wN&.wL.FÞ.P.X._(.àuÒá^Þ 000140
 2877FF26 D85EC40A 76FF0C76 FF0676FF 0876FFDA 56890846 89025788 26078826 &..&.W..FÁ.VÒ.v..v..v..v̄.á^Á&.W( 000160
 7409C29A 006A006A 4877FF26 4A77FF26 DC5EC4B7 EB0CC483 FDF7E80E 2677FF26 &.w&.Ò%».á.Šñá^É&.wJ&.wHj.j..ô.t 000180
 478826F0 5EC47D75 C0082656 0A589A50 16F04680 4877FF26 4A77FF26 DC5EC428 (á^É&.wJ&.wH.FÞ.P.X.V&.àu)á^Þ&.G 0001A0
 28578826 26478826 D85EC40A 56890846 89025788 26078826 F05EC40C EB48EB06 .ŠHŠÉá^Þ&..&.W..FÁ.VÒá^Á&.G&&.W( 0001C0
 26244788 26F85EC4 FA5689F8 46890257 88260788 26F05EC4 33E8FE56 89FC4689 .F=.V±Š3á^Þ&..&.W..F%.V°á^%&.G$& 0001E0

Dump of file SATURN:[PCCOMMON.DUMP.DLL]BRD.TMP;1 on 18-APR-1990 10:36:59.83
File ID (519,15,0)   End of file block 272 / Allocated 272

Virtual block number 122 (0000007A), 512 (0200) bytes

 76FF0876 FF00E8CF 74000230 AF740001 308674C0 0810EBFE 5689FC46 89265788 .W&.F=.V±Š..àtÑ=..t£=..tùŠ..v..v 000000
 0676FF08 76FFFE80 E9FF6AE9 0CC483FD 4EE80EFC 76FFFE76 FF0A76FF 0C76FF06 ..v..v..v±.v=.ÒN».á.Õj.Ō¯±.v..v. 000020
 1F00EBC0 28FE14E9 0CC483FD 2AE80E66 77FF2668 77FF26E0 5EC40A76 FF0C76FF .v..v.á^Á&.wh&.wf.Ò*».á.Ô.±+àŠ.. 000040
 E980F388 06751046 080E4688 08740846 08064688 088E271C 881E0000 22C8C8C9 èùà"...¡.′.Á.F..F.t..F..F.u.¡µ.Ô 000060
 8826E25E C4E45689 E2468902 57882607 8826065E C4FE568C FC4689EC 46800189 ...F&.F=.V±á^.&..&.W..Fã.VÒá^ã&. 000080
 DE468DE6 76FFE876 FF298509 C29A006A 006A5052 E85689E6 46891657 88261447 G.&.W..Fl.VÒRPj.j..ô..).vÒ.vl.F8 0000A0
 03648788 02E3C108 88EA4689 0788260E 5EC40139 E90374C0 0827200A 589A5016 .P.X.-′.àt.Ò9.á^B&...Fô.ÄéD...d. 0000C0
 89001605 E05688DE 468869E8 EA468800 8AE90375 D0080C56 230A4623 03669788 ..f.#F.#V..Áu.Ô...FôŠi.F8.VÁ.... 0000E0
 260877FF 260E5EC4 63E8FE56 89FC4689 003605E0 5688DE46 8874E8FE 5689FC46 F=.V±Št.F8.VÁ.6..F=.V±Šcá^B&.w.& 000100
 FF016A06 77FF2608 77FF260E 5EC449E8 000023FD 9AFC76FF FE76FF01 6A0677FF .w.j..v±.v=.»#..Šlá^B&.w.&.w.j.. 000120
 201CEB1E EBFE5689 FC468900 0C05E056 880E4688 2FEB0000 FFFF9AFC 76FFF±76 v±.v=.....Š/.F8.VÁ....F=.V±Š.Š.- 000140
 8826FC5E C42A0C29 F2290829 0829C729 862A2FA7 FF2E93C0 03147700 0530000! ..=..w..á...[/*Ñ)ú)Á)Á)·).*á^=&. 000160
 FC5EC402 57882607 88265272 08473926 067F5A7C 0A573926 0E5EC402 5788260/ .&.W.á^.&9W.|Z..&9G.rR&..&.W.á^= 000180
 06573926 FC5EC40E 5788260C 4788260E 5EC43A72 08473926 067F427C 0A573926 &9W.|B..&9G.r:á^.&.G.&.W.á^=&9W. 0001A0
 47392606 7C007F06 5739260E 5EC40E57 88260C47 88261E77 04473926 067C267F .&|.&9G.w.&.G.&.W.á^.&9W...|.&9G 0001C0
 9FE80E06 76FF0876 FFEA76FF DE76FFE0 76FF1674 C008C028 02EB0001 88057704 .w.|..Š.+à.àt..vÁ.v8.vō.v..v..Ò. 0001E0

Dump of file SATURN:[PCCOMMON.DUMP.DLL]BRD.TMP;1 on 18-APR-1990 10:36:59.83
File ID (519,15,0)   End of file block 272 / Allocated 272

Virtual block number 123 (0000007B), 512 (0200) bytes

 88260788 26065EC4 088E2928 881E0000 0AC8CBC9 1F00EBC0 2BFEB0E9 0AC483F3 µ.á.Ō¯±+àŠ..èùà....¡().Áá^.&..&. 000000
 FFF64688 02F84683 04EB0000 F646C7FA 5689F846 89007805 FE5689FC 46890257 W..F=.V±.x..F%.V°úF-..Š..F%..F-. 000020
 6A162303 68062314 56881246 880114E9 078826F8 5EC4014F E9037C00 0630F646 F-=..|.ÒO.á^%&..Ò...F..V.#.h.#.j 000040
 15E90CC4 83F36AE8 0E0676FF 0876FF0A 76FF0C76 FF0E76FF 1076FF19 74D00803 ..Ât..v..v..v..v..v..v..Òjµ.á.Ō. 000060
 FF0A76FF 0C76FF0E 76FF1076 FF1974D0 08036E16 23036C06 23145688 12468801 ..F..V.#.l.#.n..Ât..v..v..v..v.. 000080
 74D00803 72162303 70062314 56881246 8800E7E9 0CC483F4 5DE80E06 76FF0876 v..v..Ò]¶.á.ÒÒ..F..V.#.p.#.r..Ât 0000A0
 12468800 89E90CC4 83F58EE8 0E0676FF 0876FF0A 76FF0C76 FF0E76FF 1076FF19 ..v..v..v..v..v..Ò.%.á.Ò¿..F. 0000C0
 76FF0876 FF0A76FF 0C76FF0E 76FF1076 FF1974D0 08037616 23037406 23145688 .V.#.t.#.v..Ât..v..v..v..v..v..v 0000E0
 1076FF19 74D00803 7A162303 78062314 56881246 88008BE9 0CC483F7 14E80E06 ..Ò.%.á.Ō...F..V.#.x.#.z..Ât..v. 000100
 06231456 88124688 5EE80CC4 83F89BE8 0E0676FF 0876FF0A 76FF0C76 FF0E76FF .v..v..v..v..v..Ò.%.á.Š^.F..V.#. 000120
 FAF6EB0E 0676FF08 76FF0A76 FF0C76FF 0E76FF10 76FF1974 D008037E 1623037C |.#.-..Ât..v..v..v..v..v..v..Ò-* 000140
 30FF30E9 03750003 30FF0AE9 03750002 30FEE4E9 03750001 302FEB31 EB0CC483 .á.Š1Š/=..u.ÒÒ±=..u.Ō..=..u.ÒO.= 000160
 FF0A76FF 0C76FFFE 9FE900E8 A4740006 30FF7CE9 03750005 30FF56E9 03750004 ..u.ÒV.=..u.Ò|.=..tÉŠ.Ō.±.v..v.. 000180
 081C0203 001090C8 C91F00E8 C0280CC4 83FCB3E8 0E0676FF 0876FF12 76FF1476 v..v..v..v..Ò°=.á.+àŠ..èù....... 0001A0
 088A0203 00000007 25A10002 00000006 085C0002 00000003 208E0002 02600005 ..'.... ......\........ÁX........ 0001C0
 09120203 021E0004 2A060203 00220003 06880203 00140003 03960203 027F0005 ..............£...".....*........ 0001E0
```

Dump of file SATURN:[PCCOMMON.DUMP.DLL]BRD.TMP;1 on 18-APR-1990 10:36:59.83
File ID (519,15,0) End of file block 272 / Allocated 272

Virtual block number 124 (0000007C), 512 (0200) bytes

```
00690203 00800004 09440203 00000017 10F40002 00000014 29750002 00AB0004 ..¨...u)......¶.......D...§...í. 000000
00000000 024C0005 07330203 00CC0004 29EC0203 00000019 2AD40002 02360005 ..6...å°......ì)..ä...3...L..... 000020
0674C008 0000FFFF 9A5016F6 468D246A 0E6A0A76 FFD88EFF FF881E56 0000... à...V.¡...Ä.v.j.j$.F-.P......ât. 000040
FF03E800 00FE46C7 00012247 C726F65E C4078926 0A4688F6 5EC40083 E98DF28 ¡·.Õ..á^-.F.&..á^-&ÚG"..ÚFt..$.. 000060
E88DF288 0574C008 06C483FF FF02379A 0A76FF50 16FA468D 457D04FE 7E83FE4E Fz.-z.)E.F°.P.v..7....á..ât.¡·.$ 000080
5EC402E6 C1FE7688 04508926 02408926 FC5688FA 4688F65E C402E6C1 FE768848 H.vzèl.á^-.F°.V=&.a.&.P..vzèl.á^ 0000A0
8926F856 88F64688 065EC410 74084608 06468882 E8124089 26144089 26C028F6 -+á&.a.&.a.$ý.F..F.t.á^..F-.V%&. 0000C0
75084608 06468808 8E0007B8 1E000010 C80006CA C95E1F00 E8C02802 57892607 .&.W.+áS..^èò..à....¡...Ä.F..F.u 0000E0
0007C726 FE468907 8826F45E C4F65689 F4468908 56880646 88008FE9 8DF58806 .¡%.Õ...F..V..F¶.V-á^¶&...Fz&ú.. 000100
000205F6 5688F446 0302E0C1 FC46884A 7D04FC7E 83FC46FF 03E80000 FC46C700 .úF=..$..F=.-=.)J.F=éÅ..F¶.V-... 000120
FF078926 02478926 C028FA56 89F84689 02578826 078826F0 5EC4F256 89F04689 .FÞ.V·á^Þ&..&.V..F%.V°+á&.G.&... 000140
76FFFE76 FFADE81D E88DF288 0574C008 06C48300 5302819A FE76FFF8 76FFFA76 v°.v%.vz...S..á..ât.¡·.$.$Ù.vz.v 000160
57000014 C80004CA C91F00E8 C02804E8 8DF28805 74C00800 00FFFF9A F476FFF6 -.v¶......ât.¡·.$.+àS..èò..à...W 000180
5689EC46 890C5688 0A468800 DAE98DF5 8806750C 46080A46 88088E00 85881E56 V.¡ç..Ä.F..F.u.¡%.ÖÖ..F..V..F&.V 0001A0
8DF28806 74C00800 0000189A 5016FC46 8D246A0E 6A50F646 89078826 EC5EC4EE Ÿá^$&...F-Pj.j$.F=.P......ât.¡·. 0001C0
02408826 EC5EC402 E6C1F476 88697D04 F47E83F4 46FF03E8 0000F446 C700ACE9 Õ¯.úF¶..$..F¶.-¶.)i.v¶èl.á^$&.a. 0001E0
```

Dump of file SATURN:[PCCOMMON.DUMP.DLL]BRD.TMP;1 on 18-APR-1990 10:36:59.83
File ID (519,15,0) End of file block 272 / Allocated 272

Virtual block number 125 (0000007D), 512 (0200) bytes

```
C0080AC4 83012802 A09AF676 FFF076FF 525016F8 468DF256 89F04689 04508826 &.P..FÞ.V·.F%.PR.vÞ.v-...+..á..â 000000
76880451 89260241 8926FA56 88F8468B FC5EC402 E7C1F47E 8868E88D F2880574 t.¡·.$h.-¶èÓ.á^=.F%.V°&.A.&.Q..v 000020
88FC5EC4 8EE81450 89261240 8926FC5E C4145088 26124088 26EC5EC4 02E6C1F4 ¶èl.á^$&.a.&.P.á^=&.a.&.P.$.á^=. 000040
4688065E C4107408 46080646 88224789 26FC5EC4 22478826 EC5EC407 8926F646 F-&..á^$&.G"á^=&.G".F..F.t.á^..F 000060
8E016388 1E560000 0CC80008 CAC95F5E 1F00E8C0 28025789 26078926 FE5688FC =.Vz&..&.W.+àS..^_èò..à...V.¡c.. 000080
46080A46 88FC5689 FA468910 56880E46 8800F9E9 8DF58806 75104608 0E468808 Ä.F..F.u.¡%.Õ°..F¯..V..F°.V=.F..F 0000A0
47882 6F6 5EC40001 F446C7F8 5689F646 890C5688 0A468800 DFE98DF5 8806750C .u.¡%.ÖÖ..F..V..F-.V%úF¶..á^-&.G 0000C0
00FE46C7 0097E903 7400227F 832600A1 E90000F4 46C70874 22473926 FA5EC422 "á^°&9G"t.úF¶..ÕÅ.&..".t.Õ..úFz. 0000E0
26124088 26F65EC4 02E6C1FE 76882C7D 04FE7E83 327400F4 7E83FE46 FF03E800 .$..Fz.-¶.t2.-z.),.vzèl.á^-&.a.& 000100
46C7C5E8 F44689C0 2802E800 01880574 14503926 06751240 3926FA5E C4145088 .P.á^°&9a.u.&9P.t.¡..$.+á.F¶$éúF 000120
C45016F4 468002E6 C1FE7688 3F7D04FE 7E834574 00F47E83 FE46FF03 E80000FE z..$..Fz.-¶.tE.-z.)?.vzèl..F¶.Pá 000140
74C0080C C4830109 038E9A02 70FF2604 70FF26FA 5EC40270 FF260470 FF26F65E ^-&.p.&.p.á^°&.p.&.p....)..á..ât 000160
4688065E C4097408 46080646 8882E800 00FFFF9A 00EF6803 8A681E03 E3681E10 ..hD..ha.hÿ......$ý.F..F.t.á^..F 000180
75084608 06468808 8E025088 1E560000 06C8000C CAC95E1F 00E8C028 078926F4 ¶&..+àS..^èò..à...V.¡]..Ä.F..F.u 0001A0
04FE7E83 FE46FF03 E80000FE 46C7FC56 89FA4689 08568806 468863E8 8DF58805 .¡%.$c.F..V..F°.VeúFz..$..Fz.-z. 0001C0
C00806C4 83033804 679A37FF 260270FF 260470FF 26FA5EC4 02E6C1FE 76883A7D ):.vzèl.á^°&.p.&.p.&.7.g.8..á..â 0001E0
```

Dump of file SATURN:[PCCOMMON.DUMP.DLL]BRD.TMP;1 on 18-APR-1990 10:36:59.83
File ID (519,15,0) End of file block 272 / Allocated 272

Virtual block number 126 (0000007E), 512 (0200) bytes

```
26FA5EC4 8DE81240 89261440 8926C028 FA5EC402 E6C1FE76 8822E88D F2880574 t.¡·.$".vzèl.á^°+à&.a.&.a.$§á^°& 000000
750C4608 0A468808 8E037588 1E000004 C80004CA C95E1F00 E8C02800 012247C7 úG"..+àS..^èò..à....¡u..Ä.F..F.u 000020
478826FC 5EC40074 08460806 4688FE56 89FC4689 0C56880A 468825E8 8DF58805 .¡%.$X.F..V..F=.Vz.F..F.t.á^=&.G 000040
0C46080A 4688D88E 03F5881E 000004C8 0008CAC9 1F00E8C0 28078926 065EC422 "á^.&..+àS..èò..à....¡%..Ä.F..F. 000060
8826FC5E C40C7408 46080646 88FE5689 FC46890C 56880A46 8824E88D F5880575 u.¡%.$$.F..V..F=.Vz.F..F.t.á^=&. 000080
1046080E 4688D88E 0436881E 000006C8 0008CAC9 1F00E8C0 28078926 065EC407 .á^.&..+àS..èò..à....¡6..Ä.F..F. 0000A0
08F7C018 01227F83 26FC5EC4 FE5689FC 46891056 880E4688 0095E98D F5880675 u.¡%.Õ...F..V..F=.Vzá^=&..".. à%Ä 0000C0
08460806 46885F74 00FA7E83 078926FA 46880A5E C409740C 46080A46 88FA4689 .F°.F..F.t.á^..F°&...-°.t_.F..F. 0000E0
88261647 8826FC5E C4025789 26078926 065EC414 57882612 478826FC 5EC45774 tWá^=&.G.&.W.á^.&..&.W.á^=&.G.&. 000100
26084789 26065EC4 1C578826 1A478826 FC5EC406 57892604 47892606 5EC41857 W.á^.&.G.&.W.á^=&.G.&.W.á^.&.G.& 000120
CAC91F00 E8C0280E 5789260C 47892606 5EC42057 88261E47 8826FC5E C40A5789 .W.á^=&.G.&.W á^.&.G.&.W.+àS..èò 000140
880A4688 013EE98D F5880675 0C46080A 4688D88E 0476881E 56570000 0CC8000C ..à...WV.¡v..Ä.F..F.u.¡%.Õ>..F.. 000160
F088F47E 80085688 06468801 21E90374 00227F83 26FC5EC4 FE5689FC 46890C56 V..F=.Vzá^=&..".t.ÕI..F..V..-¶.Þ 000180
5016F446 8D185711 26 54701 26FA5688 F84688FE 468E1FA5 A5A5A5DA 8E1E0716 ....ÕEEEE..Fz.F%.V°&.G.&.W..F¶.P 0001A0
6803E968 1E041268 1E1074C0 0808C483 05C80516 9A0677FF 260877FF 26FC5EC4 á^=&.w.&.w....ù..á..ât..h...hÕ.h 0001C0
FC5EC450 16F4468D 20571126 1E470126 FA5688F8 4688FC5E C4000005 E09A0179 y..Å...á^=.F%.V°&.G.&.W .F¶.Pá^= 0001E0
```

```
Dump of file SATURN:[PCCOMMON.DUMP.DLL]BRD.TMP;1 on 18-APR-1990 10:36:59.83
File ID (519,15,0)   End of file block 272 / Allocated 272

Virtual block number 127 (0000007F), 512 (0200) bytes

 9A017D68 0418681E 0441681E 1074C008 08C48303 8905169A 0E77FF26 1077FF26 &.w.&.w....¿..á..át..hA..h..h).. 000000
 89F84689 02578826 078826F6 5689F446 89065788 26044788 26065EC4 0000034D M...á^.&.G.&.W..F¶.V-&..&.W..F%. 000020
 05169A02 77FF2604 77FF26FC 5EC45016 F4468014 57112612 470126FC 5EC4FA56 V*á^=&.G.&.W..F¶.Pá^=&.w.&.w.... 000040
 88F84688 FC5EC400 0006729A 01856804 47681E04 70681E10 74C00808 C483065D )..á..át..hp..hG.h...r...á^=.F%. 000060
 83058E05 169A0A77 FF260C77 FF26FC5E C45016F4 46801C57 11261A47 0126FA56 V*&.G.&.W..F¶.Pá^=&.w.&.w....... 000080
 08CAC95F 5E1F00E8 C0280000 05A39A01 89680476 681E049F 681E1074 C00808C4 á..át..h...hv.h...È...+âŠ..^_èò. 0000A0
 0C56880A 46880158 E98DF588 06750C46 080A4688 D88E052A 881E5600 0012C800 .à...V.¡*..Ä.F..F.u.¡%.Õ[..F..V. 0000C0
 FE5689FC 46890856 88064688 0141E98D F5880675 08460806 4688F856 89F64689 .F-.V%.F..F.u.¡%.ÕA..F..V..F=.V± 0000E0
 FA76883C 7D04FA7E 83FA46FF 03E80000 FA46C701 24E90374 00227F83 26FC5EC4 á^=&..".t.Õ$.úF*..Š..F*.-*.)<.v* 000100
 FF260470 FF26F65E C40270FF 260470FF 26FC5EC4 03B2B7FF E3D1FA5E 8802E6C1 èl..^*iD.ñý.á^=&.p.&.p.á^-&.p.&. 000120
 227F8326 F65EC488 E800DEE9 80F28806 74C0080C C4830620 0AFD9A37 FF260270 p.&.7.». ..á..át.¡·.ÕB.ŠEá^-&..* 000140
 7D04FA7E 83FA46FF 03E80000 FA46C722 478926F6 5EC42247 8826FC5E C43F7400 .t?á^=&.G"á^-&.G"úF*..Š..F*.-*.) 000160
 E9D9E814 50892612 408926F6 5EC41450 88261240 8826FC5E C402E6C1 FA76881E ..v*èl.á^=&.a.&.P.á^-&.a.&.P.$iÕ 000180
 26124088 26FC5EC4 02E6C1FA 76887F7D 04FA7E83 FA46FF03 E80000FA 46C7008F ..úF*..Š..F*.-*.)..v*èl.á^=&.a.& 0001A0
 83E3D1FA 5E88F056 89EE4689 14508826 12408826 F65EC4F4 5689F246 89145088 .P..F·.V¶á^-&.a.&.P..FŸ.VÞ.^*iD. 0001C0
 26124089 26F45688 F24688F6 5E881176 F2463905 7F187CF4 56391F74 0003B28F «ý..t.9V¶|...9F·v..^-.F·.V¶&.a.& 0001E0

Dump of file SATURN:[PCCOMMON.DUMP.DLL]BRD.TMP;1 on 18-APR-1990 10:36:59.83
File ID (519,15,0)   End of file block 272 / Allocated 272

Virtual block number 128 (00000080), 512 (0200) bytes

 F65EC402 E6C1FA76 881773F2 4639057C 1E7FF456 39F05688 EE468829 E8145089 .P.Š).FŸ.VÞ9V¶..|.9F·s..v*èl.á^- 000000
 56000016 C80008CA C95E1F00 E8C028FF 78E91450 89261240 8926F456 88F2468B .F·.V¶&.a.&.P.Õx.+âŠ..^èò..à...V 000020
 F05689EE 46890C56 880A4688 020DE98D F5880675 0C46080A 4688088E 0688881E .¡...Ä.F..F.u.¡%.Õ...F..V..FŸ.VÞ 000040
 C400CDE9 03AA8788 E3D1F65E 8801DAE9 037C04F6 7E83F646 FF03E800 00F646C7 úF-..Š..F-.—.|.ÕÕ..^-iD..¨.Õe.á 000060
 8826FE56 89FC4689 0E578826 0C478826 FA5689F8 46890657 88260447 8826065E ^.&.G.&.W..F%.V*&.G.&.W..F=.V±&. 000080
 8826FA56 89F84689 02578826 07882606 5EC40080 E9F45689 F2468902 57882607 .&.W..F·.V¶Õ§.á^.&..&.W..F%.V*&. 0000A0
 065EC400 8EE9F456 89F24689 06578826 04478826 FE5689FC 46890A57 88260847 G.&.W..F=.V±&.G.&.W..F·.V¶Õ..á^. 0000C0
 08478826 FE5689FC 46890E57 88260C47 8826FA56 89F84689 06578826 04478826 &.G.&.W..F%.V*&.G.&.W..F=.V±&.G. 0000E0
 08478826 FA5689F8 46890257 88260788 26065EC4 5FE8F456 89F24689 0A578826 &.W..F·.V¶Š_á^.&..&.W..F%.V*&.G. 000100
 681E04CE 681E31E8 F45689F2 46890E57 88260C47 8826FE56 89FC4689 0A578826 &.W..F=.V±&¯G.&.W..F·.V¶$1.hö..h 000120
 1EE90375 00043083 74000230 FF5AE903 7500013D 1FE80000 06359A01 F56804A5 È.h%..5...$.=..u.ÕZ.=..t*=..u.Õ. 000140
 F65E88F8 76FFFA76 FFFC76FF FE76FFF2 76FFF476 FFCFE8FF 74E90375 00083DFF .=..u.Õt.Šü.V¶.v·.v±.v=.v*.v%.^- 000160
 83070805 A19A37FF 260270FF 260470FF 26EE5EC4 02E6C1F6 76880382 87FFE3D1 iD.ñý..v-èl.á^Ÿ&.p.&.p.&.7.À.... 000180
 88F24688 02E6C1F6 76881674 00227F83 26EE5EC4 0085E98D F2880674 C00814C4 á..át.¡·.Õç.á^Ÿ&..".t..v-èl..F·. 0001A0
 460302E0 C1F64688 3A740003 828F83E3 D1F65E88 7EE81450 89261240 8926F456 V¶&.a.&.P.Š~.^-iD.«ý..t:.F-èÀ..F 0001C0
 3926057C 147F0257 3926F456 88F24688 EA5EC4EC 5689EA46 89001205 F05688EE Ÿ.VÞ....Fõ.Všá^õ.F·.V¶&9W...|.&9 0001E0

Dump of file SATURN:[PCCOMMON.DUMP.DLL]BRD.TMP;1 on 18-APR-1990 10:36:59.83
File ID (519,15,0)   End of file block 272 / Allocated 272

Virtual block number 129 (00000081), 512 (0200) bytes

 1205F056 88EE4603 · 'E0C1F6 468838E8 02578926 078926F4 5688F246 88007307 .s..F·.V¶&..&.W.$8.F-èÀ..FŸ.VÞ.. 000000
 F2468800 76073926 057F147C 02573926 F45688F2 4688EA5E C4EC5689 EA468900 ..Fõ.Všá^õ.F·.V¶&9W.|...&9.v..F· 000020
 E8C02800 002247C7 26067400 227F8326 EE5EC4FE 1AE90257 89260789 26F45688 .V¶&..&.W.Õ.±á^Ÿ&..".t.&ùG*..+âŠ 000040
 00C1E98D F5880675 1046080E 4688088E 0802881E 5600000E C80008CA C95E1F00 ..^èò..à...V.¡...Ä.F..F.u.¡%.Õè. 000060
 0C56880A 468800A7 E98DF588 06750C46 080A4688 F45689F2 46891056 880E4688 .F..V..F·.V¶.F..F.u.¡%.Õ]..F..V. 000080
 00F646C7 0000FE46 C775E800 00FE46C7 07740022 7F8326F8 5EC4FA56 89F84689 .F%.V*á^%&..".t.úF±..ŠuúF±..úF-. 0000A0
 03B2B7FF E3D1F65E 885016FC 468002E6 C1F67688 607D04F6 7E83F646 FF03E800 .Š..F-.—.)'.v-èl..F=.P.^-iD.ñý. 0000C0
 C0080EC4 8309500C E79A0270 FF260470 FF26F25E C40270FF 260470FF 26F85EC4 á^%&.p.&.p.á^·&.p.&.p..Õ.]..á..à 0000E0
 8308E824 E88E1188 077503FC 7E830000 09069A02 36680404 681E04FD 681E1074 t..h»..hâ.hó.......-=.u.¡..Š$$.. 000100
 E8C02807 8926FE46 88065EC4 09740846 08064688 97E80001 FE46C705 7502FC7E -=.u.úF±..Š..F..F.t.á^..F±&..+âŠ 000120
 0193E98D F5880675 1046080E 4688088E 0A2E881E 56000014 C8000CCA C95E1F00 ..^èò..à...V.¡...Ä.F..F.u.¡%.Õ.. 000140
 880170E9 037C04F4 7E83F446 FF03E800 00F446C7 EE5689EC 46891056 880E4688 .F..V..F$.VŸúF¶..Š..F¶.-¶.|.Õp.. 000160
 0C478826 FA5689F8 46890657 88260447 88260A5E C400CDE9 03AA8788 E3D1F45E ^¶iD..¨.Õe.á^.&.G.&.W..F%.V*&.G. 000180
 0788260A 5EC4008D E9F25689 F0468902 57882607 8826FE56 89FC4689 0E578826 &.W..F=.V±&..&.W..FÞ.V·Õ§.á^.&.. 0001A0
 06578826 04478826 FE5689FC 46890A57 88260847 8826FA56 89F84689 02578826 &.W..F%.V*&.G.&.W..F=.V±&.G.&.W. 0001C0
 88260C47 8826FA56 89F84689 06578826 04478826 0A5EC400 8EE9F256 89F04689 .FÞ.V·Õ..á^.&.G.&.W..F%.V*&.G.&. 0001E0
```

Dump of file SATURN:[PCCOMMON.DUMP.DLL]BRD.TMP;1 on 18-APR-1990 10:36:59.83
File ID (519,15,0)   End of file block 272 / Allocated 272

Virtual block number 130 (00000082), 512 (0200) bytes

```
88260788 260A5EC4 5FE8F256 89F04689 0A578826 08478826 FE5689FC 46890E57 W..F=.V±&.G.&.W..FÞ.V·$_é^.&..&. 000000
46890E57 88260C47 8826FE56 89FC4689 0A578826 08478826 FA5689F8 46890257 W..F½.V°&.G.&.W..F=.V±&.G.&.W..F 000020
FF5AE903 7500013D 1FE80000 0C809A02 72680503 681E052C 681E31E8 F25689F0 Þ.V·$1.h,..h..hr......$.=..u.ÕZ. 000040
FFF276FF 5016F646 8DCFE8FF 74E90375 00083DFF 1EE90375 00043083 74000230 =..t°=..u.Õ..=..u.Õt.$ü.F-.P.v·. 000060
EC5EC402 E6C1F476 88038287 FFE301F4 5E88F876 FFFA76FF FC76FFFE 76FFF076 vÞ.v±.v=.v°.v½.^¶ID.ñý..v¶èl.é^& 000080
9A027668 0532681E 0558681E 1074C008 16C4830A 8908AA9A 0270FF26 0470FF26 &.p.&.p..^.¿..é..ét..h(..h2.hv.. 0000A0
88057502 F67E8313 74084608 06468818 E824E88E 11880775 03F67E83 00000ACE ö....—.u.|..$$$..F..F.t..—.u.| 0000C0
0E881E00 0012C800 0CCAC95E 1F00E8C0 28FE84E9 07892606 5EC4C028 02E80001 ..$.+àé^.&..Õ.±+à$..^èò..à....|. 0000E0
0A4688F0 5689EE46 89125688 10468801 1EE98DF5 88067512 46081046 88088E08 ..Ä.F..F.u.|%.Õ...F..V..FŸ.VÞ.F. 000100
F246C700 ACE90E46 88FA5689 F846890C 56880A46 880104E9 80F58806 750C4608 .F.u.|%.Õ...F..V..F½.V°.F.Õ^.úF· 000120
46890C57 88260A47 8826F85E C4F65689 F4468904 57882602 478826EE 5EC40000 ..é^Ÿ&.G.&.W..F¶.V-é^½&.G.&.W..F 000140
F85EC4F6 5689F446 89085788 26064788 26EE5EC4 0000F246 C7009EE9 FE5689FC =.V±Õ..úF·..é^Ÿ&.G.&.W..F¶.V-é^½ 000160
0C578826 0A478826 EE5EC400 01F246C7 75E8FE56 89FC4689 10578826 0E478826 &.G.&.W..F=.V±$uúF·..é^Ÿ&.G.&.W. 000180
5EC40001 F246C74C E8FE5689 FC468904 57882602 478826F8 5EC4F656 89F44689 .F¶.V-é^½&.G.&.W..F=.V±$LúF·..é^ 0001A0
FE5689FC 46890857 88260647 8826F85E C4F65689 F4468910 5788260E 478826EE Ÿ&.G.&.W..F¶.V-é^½&.G.&.W..F=.V± 0001C0
0830FF3F E9037500 04.'C374 000230FF 76E90375 0001301C E848E880 F38823E8 $#|µ.$H$.=..u.Õv.=..tû=..u.Õ?.=. 0001E0
```

Dump of file SATURN:[PCCOMMON.DUMP.DLL]BRD.TMP;1 on 18-APR-1990 10:36:59.83
File ID (519,15,0)   End of file block 272 / Allocated 272

Virtual block number 131 (00000083), 512 (0200) bytes

```
830C680F 5D9AF476 FFF676FF F276FFFC 76FFFE76 FF0676FF 0876FFD0 E88D7400 .t.$Ï.v..v..v±.v=.v·.v-.v¶.].k.. 000000
4688088E 0C8F881E 000016C8 000ECAC9 1F00E8C0 2804E88E 10880574 C0080EC4 é..ât.|..$.+à$..èò..à....|¢..Ä.F 000020
46C7011A E90E4688 EC5689EA 46891256 88104688 0181E98D F5880675 12460810 ..F.u.|%.Õ...F..V..Fõ.V&.F.Õ..úF 000040
89065788 26044788 260A5EC4 F25689F0 46890457 88260247 8826EA5E C40000EE Ÿ..é^ô&.G.&.W..FÞ.V·é^.&.G.&.W.. 000060
5689F446 890A5788 26084788 26FE5689 FC46890E 5788260C 478826FA 5689F846 F½.V°&.G.&.W..F=.V±&.G.&.W..F¶.V 000080
0788260A 5EC4F256 89F04689 08578826 06478826 EA5EC400 00EE46C7 00F3E9F6 -Õµ.úFŸ..é^ô&.G.&.W..FÞ.V·é^.&.. 0000A0
0E578826 0C478826 FE5689FC 46890A57 88260847 8826FA56 89F84689 02578826 &.W..F½.V°&.G.&.W..F=.V±&.G.&.W. 0000C0
C4F25689 F046890C 5788260A 478826EA 5EC40001 EE46C700 AEE9F656 89F44689 .F¶.V-ÕÜ.úFŸ..é^ô&.G.&.W..FÞ.V·é 0000E0
8826FE56 89FC4689 0E578826 0C478826 FA5689F8 46890657 88260447 88260A5E ^.&.G.&.W..F½.V°&.G.&.W..F=.V±&. 000100
F0468910 5788260E 4788?6EA 5EC40001 EE46C76A E8F65689 F4468902 57882607 .&.W..F¶.V-$júFŸ..é^ô&.G.&.W..FÞ 000120
5689FC46 890A5788 26084788 26FA5689 F8468902 57882607 88260A5E C4F25689 .V·é^.&..&.W..F½.V°&.G.&.W..F=.V 000140
FF24E903 7500013D 1FE857E8 80F38826 E8F65689 F4468906 57882604 478826FE ±&.G.&.W..F¶.V-$&|µ.$W$.=..u.Õ$. 000160
F676FF06 76FF0876 FFDAE8FF 54E90375 000830FE D1E90375 00043DA8 74000230 =..t´=..u.Õl±=..u.Õl.$Õ.v..v..v- 000180
16C48300 000DE69A F076FFF2 76FFEE76 FFF876FF FA76FFFC 76FFFE76 FFF476FF .v¶.v±.v=.v°.v½.vŸ.v·.vÞ.Ì.\..é. 0001A0
080A4688 D88E0DFA 881E0000 04C8000E CAC91F00 E8C02804 E88E1088 0574C008 .àt.|..$.+à$..èò..à....|°..Ä.F.. 0001C0
64880975 08460806 4688FE56 89FC4689 0C56880A 46880152 E980F588 06750C46 F.u.|%.ÕR..F..V..F=.V±.F..F.u.|d 0001E0
```

Dump of file SATURN:[PCCOMMON.DUMP.DLL]BRD.TMP;1 on 18-APR-1990 10:36:59.83
File ID (519,15,0)   End of file block 272 / Allocated 272

Virtual block number 132 (00000084), 512 (0200) bytes

```
C40CC483 0FF60010 9A0676FF 0876FF05 61681E0A 76FF0C76 FF085E8C 06468908 ..F..^..v..v..h=..v..v....-..é.é 000000
FC5EC435 E808C483 102D0010 9A0676FF 0876FF05 6C681E14 7400227F 8326FC5E ^=&..".t..hl..v..v....-..é.$5é^= 000020
1277FF26 1477FF26 1677FF26 1877FF26 1A77FF26 1C77FF26 1E77FF26 2077FF26 &.w &.w.&.w.&.w.&.w.&.w.&.w.&.w. 000040
6C00109A 0676FF08 76FF05A8 681E18C4 83103F00 109A0676 FF0876FF 0583681E .h...v..v....?..é..h´..v..v....l 000060
1E0AC483 10871150 9A0277FF 260477FF 26FC5EC4 006A0676 FF0876FF 08C48310 ..é..v..v.j.é^=&.w.&.w..P....é.. 000080
0877FF26 FC5EC400 6A0676FF 0876FF08 C4831099 00109A06 76FF0876 FF058668 hÑ..v..v.......é..v..v.j.é^=&.w. 0000A0
76FF08C4 8310C600 109A0676 FF0876FF 05C4681E 0AC48310 8411509A 0677FF26 &.w..P.Ç..é..hé..v..v....ó..é..v 0000C0
0876FF05 D2681E0A C48310E1 11509A0A 77FF260C 77FF26FC 5EC4016A 0676FF08 ..v.j.é^=&.w.&.w..P.Ä..é..h@..v. 0000E0
509A0E77 FF261077 FF26FC5E C4016A06 76FF0876 FF08C483 10F30010 9A0676FF .v....µ..é..v..v.j.é^=&.w.&.w..P 000100
08CAC91F 00E8C028 08C483FF FF00109A 0676FF08 76FF05E0 681E0AC4 830F7811 .(..é..hÁ..v..v.......é.+à$..èò. 000120
0FDA0002 0000000F 105A0002 00220003 01450203 00140003 01950203 00069000 ..............E..."...Z.......Ö. 000140
00000000 00000000 00000000 02800006 0C120203 00000019 0F980002 00000017 ..................§............. 000160
880574C0 080000FF FF9A5016 FC4680DE 6A0E6A06 76FFD88E FFFF881E 000004C8 à....|...Ä.v.j.j..F=.P......àt.| 000180
8926FC5E C4044789 26064789 26FC5EC4 07892602 478926C0 28FC5EC4 45E80001 ..$Eé^=+à&.G.&..é^=&.G.&.G.é^=&. 0001A0
8926FE56 88FC4688 085EC410 740A4608 0846880A 4789260C 478926FC 5EC40847 G.é^=&.G.&.G..F..F.t.é^..F=.V±&. 0001C0
260C4789 26C02808 5EC4D88E 0006881E 000000C8 C8C91F00 E8C02802 57892607 .&.W.+à$..èùà....|...Äé^.+à&.G.& 0001E0
```

```
File ID (519,15,0)   End of file block 272 / Allocated 272

Virtual block number 133 (00000085), 512 (0200) bytes

 C91F00E8 C02804E8 0C 1B805 74C00B00 00FFFF9A 0876FF0A 76FF0676 FF0A4789 .G..v..v..v.......ât.¡..Š.+åŠ..è 000000
 8826FC5E C46674C2 06r¿5689 FC46890A 56880846 88088E00 72881E00 0008C8C8 ùà....¡r..Ä.F..V..F=.V±.ôtfá^=&. 000020
 06C483FF 8FE80E06 ¡6FF5306 3474FA46 08F84688 FA5689F8 46890C57 88260A47 G.&.W..F½.V°.F½.F°t4.S.v..Ò...á. 000040
 0C578826 0A478826 FC5EC4FE 5689FC46 89FA5688 F846883C E80001B8 0574C008 .åt.¡..Š<.F½.V°.F=.V±á^=&.G.&.W. 000060
 E80001B8 0574C008 06C483FF 57E80E06 76FFFC76 FFFE76FF C4EBFA56 89F84689 .F½.V°Šá.v±.v=.v..ÒW..á..åt.¡..Š 000080
 681E060A 681E1075 08460806 4688D88E 00A7B81E 00000CC8 CBC91F00 EBC02804 .+åŠ..èùà....¡Ì..Ä.F..F.u..h...h 0000A0
 46880C56 890A4689 08568806 46880C75 0C46080A 46880000 01909A00 8A6805E2 â.ho.......F..F.u..F..V..F..V..F 0000C0
 26057F17 7C025739 26105688 0E46880A 5EC42674 08563905 75064639 0C56880A ..V.9F.u.9V.t&á^..F..V.&9W.|...& 0000E0
 880A4688 FC4689FE 4689C02B 0000FFFF 9A008E68 061A681E 0642681E 10760739 9.v..h8..h..h/......+å.F±.F=.F.. 000100
 8826F45E C411EBF6 5689F446 890C5788 260A4788 260A5EC4 FA5689F8 46890C56 V..F½.V°á^.&.G.&.W..F¶.V-Š.á^¶&. 000120
 57392610 56880E46 88F45EC4 3074F646 08F44688 F65689F4 46890C57 88260A47 G.&.W..F¶.V-.F¶.F-t0á^¶.F..V.&9W 000140
 89F84689 C28CC388 0CEBFE56 89FC4689 FA5688F8 46880E76 07392605 7F157C02 .|...&9.v..F½.V°.F=.V±Š..û.ô.F½. 000160
 10741446 08124688 FE5689FC 4689FA56 88F84688 0C75FE46 08FC4688 87EBFA56 V¹Šñ.F=.F±u..F½.V°.F=.V±.F..F.t. 000180
 8E012E88 1E000004 C8C8C91F 00EBC028 02578926 078926FE 5688FC46 88125EC4 á^..F=.V±&..&.W.+åŠ..èùà....¡... 0001A0
 0847C726 FC5EC425 E80001B8 0574C008 06C483FD B3E80E06 76FF5016 FC4680D8 Ä.F=.P.v..Ò°».á..åt.¡..ŠXá^=&úG. 0001C0
 C91F00E8 C0280257 89260789 26FE5688 FC468808 5EC41074 0A460808 46880001 ...F..F.t.á^..F=.V±&..&.W.+åŠ..è 0001E0

Dump of file SATURN:[PCCOMMON.DUMP.DLL]BRD.TMP;1 on 18-APR-1990 10:36:59.83
File ID (519,15,0)   End of file block 272 / Allocated 272

Virtual block number 134 (00000086), 512 (0200) bytes

 CBC91F00 E806C483 FE09E80E 0676FF08 76FF0A76 FFD88E02 30881E00 0000C8C8 ùà....¡=..Ä.v..v..v..Ò.±.á.Š..èù 000000
 46890A56 88084688 F04689F2 4689F846 89FA4689 C028D88E 0287881E 000010C8 à....|...Ä+å.F°.F½.F·.FÞ.F..V..F 000020
 E90375F6 460BF446 88F65689 F446890C 5788260A 478826F4 5EC411EB F65689F4 ¶.V-Š.á^¶&.G.&.W..F¶.V-.F¶.F-u.Ô 000040
 8826F45E C40090E9 00018806 74C00806 C483FD12 E80E0676 FF5016FC 4680008D ...F=.P.v..Ò.».á..åt.¡..Ò..á^¶&. 000060
 478926FC 5EC40657 88260447 8826F45E C4025789 26078926 FC5EC402 57882607 .&.W.á^=&..&.W.á^¶&.G.&.W.á^=&.G 000080
 5688FC46 880C75FA 460BF846 88084789 26FC5EC4 08478826 F45EC406 57892604 .&.W.á^¶&.G.á^=&.G..F½.F°u..F=.V 0000A0
 0C578926 0A478926 FE5688FC 4688F05E C41174F2 460BF046 88FA5689 F84689FE ±.F½.V°.FÞ.F·t.á^Þ.F=.V±&.G.&.W. 0000C0
 FA5688F8 46880C5E C410740E 46080C46 88FF57E9 F25689F0 4689FE56 88FC4688 .F=.V±.FÞ.V·ÕW..F..F.t.á^..F½.V° 0000E0
 46890856 88064688 D88E02A6 881E0000 08C8C8C9 1F00EBC0 28025789 26078926 &..&.W.+åŠ..èùà....¡Ì..Ä.F..V..F 000100
 FC46890C 5788260A 478826FC 5EC422EB FA5689F8 46890C56 880A4688 FE5689FC =.V±.F..V..F½.V°Š"á^=&.G.&.W..F= 000120
 08F84688 5F74FE46 08FC4688 FA5689F8 46890C57 88260A47 8826F85E C4FE5689 .V±á^½&.G.&.W..F½.V°.F=.F±t_.F½. 000140
 5EC40257 88260788 26F85EC4 4274FE56 390575FC 4639FA56 88F84688 5774FA46 F°tW.F½.V°9F=u.9V±tBá^½&..&.W.á^ 000160
 16750447 3926FC5E C4065788 26044788 26F85EC4 2A750257 39263075 073926FC =&9.uO&9W.u°á^½&.G.&.W.á^=&9G.u. 000180
 46080E46 88FF77E9 03E80274 08473926 FC5EC408 478826F8 5EC41075 06573926 &9W.u.á^½&.G.á^=&9G.t.Š.Òw..F..F 0001A0
 0789260E 5EC4C028 02E80001 880575FE 56390A75 FC4639FA 5688F846 881D7410 .t..F½.V°9F=u.9V±u.¡..Š.+åá^.&.. 0001C0
 75681E06 90681E10 750A4608 08468808 8E039488 1E000000 C8C8C91F 00EBC028 +åŠ..èùà....¡...Ä.F..F.u..h...hu 0001E0

Dump of file SATURN:[PCCOMMON.DUMP.DLL]BRD.TMP;1 on 18-APR-1990 10:36:59.83
File ID (519,15,0)   End of file block 272 / Allocated 272

Virtual block number 135 (00000087), 512 (0200) bytes

 76FF0A77 FF260C77 FF261874 0C470826 0A478826 085EC400 0004C99A 01666806 .hf..è...á^.&.G.&.G.t.&.w.&.w..v 000000
 D5681E10 74024708 26078826 085EC462 E80001B8 0574C008 06C483FB FCE80E06 ..Ò=«.á..åt.¡..Šbá^.&..&.G.t..hí 000020
 681E0713 681E1074 06470826 04478826 085EC400 0004E69A 01606806 AD681E06 ..hÙ.hm..Ì...á^.&.G.&.G.t..h...h 000040
 9A016F68 072A681E 0752681E 10750008 7F832608 5EC40000 05009A01 6E680.¨ª Š.hn......á^.&....u..hR..h*.ho.. 000060
 D88E0460 881E0000 04C8C8C9 1F00E80A 4789260C 478926C0 28085EC4 0000014. F...á^.+åå.G.&.G.Š..èùà....¡m..Ä 000080
 260A4788 26065EC4 00000485 9A018768 075F681E 0787681E 10750846 08064688 .F..F.u..h...h .h.......á^.&.G.& 0000A0
 08FC4688 FE5689FC 46890C57 88260A47 8826FC5E C411EBFE 5689FC46 890C5788 .W..F=.V±Š.á^=Ï.G.&.W..F=.V±.F=. 0000C0
 00087F83 26FC5EC4 02571126 070126FC 5EC40257 88260788 260A5EC4 3674FE46 F±t6á^.&..&.W.á^=&..&.W.á^=&.... 0000E0
 C91F00E8 C02881E8 06571126 04470126 FC5EC406 57882604 4788260A 5EC41675 u.á^.&.G.&.W.á^=&.G.&.W.ŠÝ+åŠ..è 000100
 E19A01B0 68079768 1E07BF68 1E10750A 46080846 88D88E05 1C881E00 0016C8C8 ùà....¡...Ä.F..F.u..h¢..h..h¯..Ä 000120
 01816807 CF681E07 F7681E10 720E4639 057F177C 10563914 56881246 88000005 ....F..V.9V.|...9F.r..h¥..hü.hÝ. 000140
 C483F82A E80E0876 FF0A76FF 006A006A 0E76FF10 76FF5016 EA468000 0005349A .4....Fõ.P.v..v.j.j..v..v..Ò°=.á 000160
 C410C483 F80CE80E 0876FF0A 76FFEA76 FFEC76FF 1276FF14 76FF5016 F0468010 ..FÞ.P.v..v..vŠ.võ.v..v..Ò.«.á.á 000180
 47392606 7F2B7C06 57392618 56881646 88147400 0C7E833D 7500087F 8326EA5E ^ô&....u=.~..t..F..V.&9W.|+..&9G 0001A0
 47392609 7F0253E9 03700657 39261856 88164688 0262E903 74000C7E 83237204 .r#.-..t.Òb..F..V.&9W.).ÒŠ...&9G 0001C0
 56880E46 88EA5EC4 000CE903 75EC5639 0875D838 0A568808 46880248 E9037704 .w.ÕH..F..V.;Äu.9VŠu.ÕÉ.á^õ.F..V 0001E0
```

Dump of file SATURN:[PCCOMMON.DUMP.DLL]BRD.TMP;1 on 18-APR-1990 10:36:59.83
File ID (519,15,0)   End of file block 272 / Allocated 272

Virtual block number 136 (00000088), 512 (0200) bytes

```
390098E9 03740838 F25688F0 468800C2 E9037402 57392600 C8E90374 07392610 .89.t.Ðù.89W.t.Ðð..FÞ.V·;Ät.Ð..9 000000
043AE900 01880674 C00806C4 83F94DE8 0E0676FF 5016FC46 8D0090E9 0374EC56 V$t.Ð...F=.P.v..ÐM'.6..ât.|..Ð:. 000020
26FE5688 FC4688EA 5EC40C57 89260A47 8926FC5E C40C5788 260A4788 26EA5EC4 6^ð&.G.&.W.6^=&.G.&.W.6^ð.F=.V$& 000040
88260447 8826EA5E C4025789 26078926 14568812 4688FC5E C40C5789 260A4789 .G.&.W.6^=.F..V.&..&.W.6^ð&.G.&. 000060
4688EA5E C4084789 26FC5EC4 08478826 EA5EC406 57892604 478926FC 5EC40657 W.6^=&.G.&.W.6^ð&.G.6^=&.G.6^ð.F 000080
18568816 4688EA5E C41AE800 000847C7 26EA5EC4 06578926 04478926 18568816 ..V.&.G.&.W.6^ð&úG...$.6^ð.F..V. 0000A0
E90374EA 4639F256 88F04688 015AE900 000847C7 26EA5EC4 06578926 04478926 &.G.&.W.6^ð&úG...ÐZ..FÞ.V·9Fðt.Ð 0000C0
00018806 74C00806 C483F88A E80E0676 FF5016FC 468D0007 E90374EC 5639000F Ð.9V$t.Ð=..F=.P.v..Ð.%.6..ât.|.. 0000E0
88FC4688 EA5EC40C 5789260A 478926FC 5EC40C57 88260A47 8826EA5E C40377E9 Ðw.6^ð&.G.&.W.6^=&.G.&.W.6^ð.F=. 000100
478826EA 5EC40257 89260789 26145688 124688FC 5EC40C57 89260A47 8926FE56 V$&.G.&.W.6^=.F..V.&..&.W.6^ð&.G 000120
46800847 8926FC5E C4084788 26EA5EC4 06578926 04478926 FC5EC406 57882604 .&.W.6^=&.G.&.W.6^ð&.G.6^=&.G..F 000140
88260A47 8826EA5E C40303E9 00018806 74C00806 C483F816 E80E0676 FF5016FC =.P.v..Ð.%.6..ât.|..Ð..6^ð&.G.&. 000160
5EC40C57 89260A47 8926FE56 88FC4688 EA5EC40C 5789260A 478926FC 5EC40C57 W.6^=&.G.&.W.6^ð.F=.V$&.G.&.W.6^ 000180
E8065789 26044789 26185688 164688FC 5EC40257 89260789 26105688 0E4688FC =.F..V.&..&.W.6^=.F..V.&.G.&.W.$ 0001A0
478826EA 5EC402A0 E90001B8 0674C008 06C483F7 83E80E06 76FF5016 FC46806D m.F=.P.v:.Ð"%.6..ât.|..Ð..6^ð&.G 0001C0
5789260A 478926FE 5688FC46 88EA5EC4 0C578926 0A478926 FC5EC40C 5788260A .&.W.6^=&.G.&.W.6^ð.F=.V$&.G.&.W 0001E0
```

Dump of file SATURN:[PCCOMMON.DUMP.DLL]BRD.TMP;1 on 18-APR-1990 10:36:59.83
File ID (519,15,0)   End of file block 272 / Allocated 272

Virtual block number 137 (00000089), 512 (0200) bytes

```
89260447 89261856 88164688 FC5EC402 57892607 89261056 880E4688 FC5EC40C .6^=.F..V.&..&.W.6^=.F..V.&.G.&. 000000
35E90375 EC563908 75EA4639 F25688F0 4688EC56 89EA4689 FE5688FC 46880657 W..F=.V$.Fð.V$.FÞ.V·9Fðu.9V$u.Ð5 000020
26067F28 7C065739 26185688 16468814 74000C7E 83307500 087F8326 F05EC402 .6^Þ&....u=.~..t..F..V.&9W.|+..& 000040
26097F00 89E9037D 06573926 18568816 468800C8 E9037400 0C7E8323 72044739 9G.r#.~..t.Ðà..F..V.&9W.).Ð¿...& 000060
16FC468D 009AE903 75025739 26097507 39261456 88124688 00AEE903 77044739 9G.w.ÐÛ..F..V.&9.u.&9W.u.Ð...F=. 000080
0C578826 0A478826 F05EC401 C5E90001 880674C0 0806C483 F6D8E80E 0676FF50 P.v..ÐÄ-.6..ât.|..Ðé.6^Þ&.G.&.W. 0000A0
88FC5EC4 0C578926 0A478926 FE5688FC 4688F05E C40C5789 260A4789 26FC5EC4 6^=&.G.&.W.6^Þ.F=.V$&.G.&.W.6^=. 0000C0
89260447 8926FC5E C4065788 26044788 26F05EC4 02578926 07892614 56881246 F..V.&..&.W.6^Þ&.G.&.W.6^=&.G.&. 0000E0
57892604 47892618 56881646 88F05EC4 08478926 FC5EC408 478826F0 5EC40657 W.6^Þ&.G.6^=&.G.6^Þ.F..V.&.G.&.W 000100
5788260A 478826EA 5EC4F256 89F04689 FE5688FC 46880000 0847C726 F05EC406 .6^Þ&úG....F=.V$.FÞ.V·6^ð&.G.&.W 000120
F6460BF4 4688F656 89F44689 0C578826 0A478826 F45EC411 E8F65689 F446890C ..F¶.V-$.6^¶&.G.&.W..F¶.V-.F¶.F- 000140
7E833475 00087F83 26F45EC4 58E80275 F6563907 75F44639 F25688F0 46886A74 tj.FÞ.V·9F¶u.9V-u.$X6^¶&....u4.- 000160
46882875 000C7E83 1A720447 3926067F 227C0657 39261856 88164688 1474000C ..t..F..V.&9W.|"..&9G.r..~..u+.F 000180
06578926 04478926 18568816 46881776 04473926 067F1F7C 06573926 18568816 ..V.&9W.|...&9G.v..F..V.&.G.&.W. 0001A0
260A4788 26F85EC4 FA5689F8 4689EC56 88EA4688 FF7DE900 000847C7 26F45EC4 6^¶&úG...Ð)..Fð.V$.F%.V'6^%&.G.& 0001C0
C02802E8 00018805 75F65639 0A75F446 39F25688 F04688F6 5689F446 890C5788 .W..F¶.V-.FÞ.V·9F¶u.9V-u.|..$.+à 0001E0
```

Dump of file SATURN:[PCCOMMON.DUMP.DLL]BRD.TMP;1 on 18-APR-1990 10:36:59.83
File ID (519,15,0)   End of file block 272 / Allocated 272

Virtual block number 138 (0000008A), 512 (0200) bytes

```
26F85EC4 06578826 04478826 48750008 7F8326F4 5EC45275 00087F83 26EE4689 .F¥&....uR6^¶&....uH&.G.&.W.6^%& 000000
5789260A 478926F8 5EC40C57 88260A47 8826F45E C4317506 57392637 75044739 9G.u7&9W.u16^¶&.G.&.W.6^%&.G.&.W 000020
26F85EC4 11E820E8 00018805 74C00806 C483F59E E80E0676 FFF476FF F676FF0C ..v~.v¶.v..Ð.%.6..ât.|..$ $.6^%& 000040
0004C8C8 C91F00E8 C028FF62 E9037500 EE7E83FA 5689F846 890C5788 260A4788 .G.&.W..F%.V'.-Ÿ.u.Ðb.+à$..èùà.. 000060
88000008 339A022F 6807FF68 1E082768 1E10750A 46080846 88D88E05 A7881E00 ..|Ï..Ä.F..F.u..h'..h..h/..3.... 000080
FC46890E 56880C46 88000005 8F9A0230 68083E68 1E086668 1E10750E 46080C46 F..F.u..hf..h>.h0..¢....F..V..F= 0000A0
5EC44574 FE4608FC 4688FE56 89FC4689 0C578826 0A478826 FC5EC411 E8FE5689 .V$$.6^=&.G.&.W..F=.V$.F=.F$tE6^ 0000C0
FF26FC5E C437FF26 0277FF26 0A5FC426 0477FF26 0677FF26 39750008 7F8326FC =&....u9&.w.&.w.&6_.&.w.&.76^=&. 0000E0
E8000188 0574C008 14C483FA 0CE80E06 76FF0876 FF0A76FF 1076FF37 FF260277 w.&.7.v..v..v..v..Ð.'.6..ât.|..$ 000100
08A1681E 10750846 08064688 D88E0803 881E0000 0EC8C8C9 1F00E8C0 28A2E806 .$Å+à$..èùà....|...Ä.F..F.u..hÅ. 000120
681E1072 0C463905 7F177C0E 56391256 88104688 000008EA 9A025768 0879681E .hy.hW..ð....F..V.9V.|...9F.r..h 000140
0876FF00 6A006A0C 76FF0E76 FF5016F2 46800000 08189A02 58680881 681E0809 \..hÝ.hX.......F·.P.v..v.j.j..v. 000160
F476FF50 52000A83 00012012 56881046 885016F8 468D10C4 83F521E8 0E0676FF .v..Ð!%.6..F%.P.F..V.-...Ð.RP.v¶ 000180
5689FC46 89F45688 F2468800 01F646C7 10C483F4 F8E80E06 76FF0576 FFF276FF .v·.v..v..Ð«¶.6.úF-...F·.V¶.F=.V 0001A0
26FC5EC4 7374FE46 08FC4688 FE5689FC 46890C57 88260A47 8826FC5E C411E8FE $$.6^=&.G.&.W..F=.V$.F=.F$ts6^=& 0001C0
1A720447 3926067F 227C0657 39261656 88144688 1474000A 7E833475 00087F83 ....u4.~..t..F..V.&9W.|"..&9G.r. 0001E0
```

```
Dump of file SATURN:[PCCOMMON.DUMP.DLL]BRD.TMP;1 on 18-APR-1990 10:36:59.83
File ID (519,15,0)   End of file block 272 / Allocated 272

Virtual block number 139 (0000008B), 512 (0200) bytes

 E80003F6 46C70776 04473926 067F0F7C 06573926 16568814 46881875 000A7E83 .-..u..F..V.&9W.|...&9G.v.úF-..$ 000000
 5688F846 880002F6 46C70575 06573926 08750447 39261656 88144688 FC5EC42E .Á^=.F..V.&9G.u.&9W.u.úF-...F%.V 000020
 078926F6 4688185E C409741A 46081846 88FF74E9 03E80275 FE563907 75D838FA ";Áu.9V±u.Š.Õt..F..F.t.Á^..F-&.. 000040
 E1681E09 09681E10 7508460B 064688D8 8E088088 1E000008 C8C8C91F 00EBC028 +àŠ..èùà....¡¯..Ä.F..F.u..h...hÄ 000060
 0008C89A 02836809 19681E09 41681E10 750C460B 0A468800 000D1D9A 02826808 .h........F..F.u..hA..h..h...à.. 000080
 A2E90001 8806750C 4708260A 4788260A 5EC41375 0C470826 0A478826 065E^400 .Á^.&.G.&.G.u.Á^.&.G.&.G.u.¡..ÕÅ 0000A0
 890C5788 260A4788 26FC5EC4 11E8FE56 89FC4689 0C56880A 46880001 FA46C..0 .úF°...F..V..F=.V±Š.Á^=&.G.&.W.. 0000C0
 0677FF26 5016F846 80557500 087F8326 FC5EC461 74FE4608 FC4688FE 5689FC.. F=.V±.F=.F±tmÁ^=&....ωJ.F%.P&.w. 0000E0
 FF0876FF 0E76FF37 FF260277 FF26FC5E C437FF26 0277FF26 0A5FC426 0477FF26 &.w.&Á_.&.w.&.7Á^=&.w.&.7.v..v.. 000100
 E80FE800 03FA46C7 097503F8 7E8331E8 00018805 74C00816 C483FE04 E80E0676 v..Õ.±¯Á..àt.¡..$1.-%.u.úF°..Š.$ 000120
 28078926 FA468810 5EC40974 12460810 468886E8 0002FA46 C7057502 F87E8308 ..-%.u.úF°..Š..F..F.t.Á^..F°&..+ 000140
 0952681E 097A681E 10750846 08064688 D88E0CED 881E0000 16C8C8C9 1F00EBC0 àŠ..èùà....¡Ú..Ä.F..F.u..hz..hR. 000160
 681E0982 681E1072 0C463905 7F177C0E 56391256 88104688 00000E26 9A028668 hÑ..&....F..V.9V.|...9F.r..hý..h 000180
 0E0676FF 0876FF00 6A006A0C 76FF0E76 FF5016EA 46800000 00059A02 8768098A ..hñ.......Fõ.P.v..v.j.j..v..v.. 0001A0
 FFEA76FF EC76FF50 52000A83 00012D12 56881046 885016F2 468D10C4 83F2E5E8 Õl·.Á..F·.P.F..V.-...Õ.RP.v&.võ. 0001C0
 C411E8F8 5689F646 89EC5688 EA468800 00FE46C7 10C483F2 8FE80E06 76FF0876 v..v..Õe·.Á.úF±...Fõ.V&.F-.V%Š.Á 0001E0

Dump of file SATURN:[PCCOMMON.DUMP.DLL]BRD.TMP;1 on 18-APR-1990 10:36:59.83
File ID (519,15,0)   End of file block 272 / Allocated 272

Virtual block number 140 (0000008C), 512 (0200) bytes

 8326F65E C40098E9 0375F846 08F64688 F85689F6 46890C57 88260A47 8826F65E ^-&.G.&.W..F-.V%.F-.F%u.Õ..Á^-&. 000000
 46891656 1814462B 06578826 04478826 0001FE46 C7187500 FE7E8379 7500087F ...uy.-±.u.úF±..&.G.&.W.+F..V..F 000020
 2074000A 7E83FC56 89FA4689 16561814 46280657 88260447 882658E8 F05689EE Ÿ.VÞŠx&.G.&.W.+F..V..F°.V=.~..t 000040
 1EE8F056 89EE4689 FC5688FA 46880C76 FA463905 7F137CFC 5639F056 88EE4688 .FŸ.VÞ9V=|...9F°v..F°.V=.FŸ.VÞŠ. 000060
 4688F056 89EE4689 FC5688FA 46880C73 FA463905 7C137FFC 5639F056 88EE4688 .FŸ.VÞ9V=..|.9F°s..F°.V=.FŸ.VÞ.F 000080
 46881CE8 00018805 7500FE7E 83FF4CE9 03E80275 F8563907 75F64639 F45688F2 ·.V¶9F-u.9V%u.Š.ÕL..-±.u.¡..Š..F 0000A0
 001AC8C8 C91F00E8 C0280257 89260789 26F05688 EE468818 5EC41074 1A460818 ..F.t.Á^..FŸ.VÞ&..&.W.+àŠ..èùà.. 0000C0
 8800000F 939A02F7 68098A68 1E09E268 1E107508 46080646 88088E00 EC881E00 ..¡&..Ä.F..F.u..hã..ho.h%....... 0000E0
 88064688 0000FE46 C700000E 049A02F8 6809F268 1E0A1A68 1E10750E 46080C46 F..F.u..h...h·.h%......úF±...F.. 000100
 890C5788 260A4788 26EE5EC4 EC5689EA 46890E56 880C4688 F05689EE 46890856 V..FŸ.VÞ.F..V..Fõ.V&Á^Ÿ&.G.&.W.. 000120
 45E90375 F84608F6 4688F456 89F24689 0C578826 0A478826 EA5EC4F8 5689F646 F-.V%Á^õ&.G.&.W..F·.V¶.F-.F%u.ÕE 000140
 087F8326 EA5EC400 D6E90374 00087F83 26EE5EC4 013AE903 75F4460B F2468801 ..F·.F¶u.Õ:.Á^Ÿ&....t.Õø.Á^õ&... 000160
 3926087C 0083E903 7E025739 26EE5EC4 02578826 078826F2 5EC400C9 E9037400 .t.Õè.Á^·&..&.W.Á^Ÿ&9W.-.Õ°.|.&9 000180
 3926087C 0093E903 7E025739 26EA5EC4 02578826 078826F6 5EC400A9 E9037207 .r.Õ`.Á^-&..&.W.Á^õ&9W.-.Õ..|.&9 0001A0
 26EA5EC4 06578826 04478826 EE5EC400 01FE46C7 237500FE 7E830089 E9037207 .r.Õ...-±.u#úF±..Á^Ÿ&.G.&.W.Á^õ& 0001C0
 472826EA 5EC40657 88260447 8826EE5E C460E8E8 5689E646 89065718 26044728 +G.&.W..F|.VÕŠ'Á^Ÿ&.G.&.W.Á^õ&+G 0001E0

Dump of file SATURN:[PCCOMMON.DUMP.DLL]BRD.TMP;1 on 18-APR-1990 10:36:59.83
File ID (519,15,0)   End of file block 272 / Allocated 272

Virtual block number 141 (0000008D), 512 (0200) bytes

 4639057F 137CFC56 39E85688 E6468820 74000A7E 83FC5689 FA468906 571B2604 .&.W..F°.V=.-..t .F|.VÒ9V=|...9F 000000
 4639057C 137FFC56 39E85688 E646881E E8E85689 E64689FC 5688FA46 880C76FA °v..F°.V=.F|.VÒŠ..F|.VÒ9V=..|.9F 000020
 02573926 F65EC402 57882607 8826F25E C4E85689 E64689FC 5688FA46 880C73FA °s..F°.V=.F|.VÒÁ^·&..&.W.Á^-&9W. 000040
 46890C57 88260A47 8826EE5E C4F05689 EE4689C2 8CC3881D 73073926 057C247F .$|.&9.s..û.ó.FŸ.VÞÁ^Ÿ&.G.&.W..F 000060
 F246890C 5788260A 478826EA 5EC4EC56 89EA4689 F45688F2 46881DE8 F85689F6 -.V%Š..F·.V¶.Fõ.V&Á^õ&.G.&.W..F· 000080
 88E64688 105EC410 7412460B 1046881C E800018B 057500FE 7E83FE80 E9F45689 .V¶Õ¯±.-±.u.¡..Š..F..F.t.Á^..F|. 0000A0
 08460806 4688D88E 0F63881E 000004C8 C8C91F00 E8C02802 57892607 8926E856 VÒ&..&.W.+àŠ..èùà....¡c..Ä.F..F. 0000C0
 080C4688 00000F7B 9A033768 0A2E681E 0A56681E 10750008 7F832606 5EC40A74 t.Á^.&....u..hV..h..h7..(....F.. 0000E0
 0A79681E 50002888 03E80020 88057400 0A7E830E 5E8C0C46 89086488 09750E46 F.u.¡d..F..^..-..t.¡-.Š.¡+.P.hy. 000100
 E8FE5689 FC46890C 5788260A 47882606 5EC40AC4 8311F100 109A0C76 FF0E76FF .v..v....þ..Á.Á^.&.G.&.W..F=.V±Š 000120
 77FF26FC 5EC46974 FE4608FC 4688FE56 89FC4689 0C578826 0A478826 FC5EC411 .Á^=&.G.&.W..F=.V±.F=.F±tiÁ^=&.w 000140
 23740008 7F8326FC 5EC40CC4 83121C00 109A0C76 FF0E76FF 0A87681E 37FF2602 .&.7.h...v..v.......Á.Á^=&....t# 000160
 C4831238 00109A0C 76FF0E76 FF0A8F68 1E50002B 8803E800 20880574 000A7E83 .-..t.¡·.Š.¡+.P.h...v..v....;..Á 000180
 0CC48312 5000109A 0C76FF0E 76FF0A95 681E0477 FF260677 FF26FC5E C41DE80A .Š.Á^=&.w.&.w..h...v..v....P..Á. 0001A0
 02030005 C8C91F00 E8C02808 C483FFFF 00109A0C 76FF0E76 FF0A9868 1EFF7EE9 Õ-..h...v..v........Á.+àŠ..èù.... 0001C0
 02030000 00191156 00020000 001711A9 00020022 00030080 02030014 00030017 ............"...`.......V....... 0001E0
```

```
Dump of file SATURN:[PCCOMMON.DUMP.DLL]BRD.TMP;1 on 18-APR-1990 10:36:59.83
File ID (519,15,0)   End of file block 272 / Allocated 272

Virtual block number 142 (0000008E), 512 (0200) bytes

 08460806 4688D88E FFFF881E 000000C8 00000000 00000000 00000280 00061178 x...§...........à....¡...Ä.F..F. 000000
 C7260014 5A47C726 u65EC400 005847C7 26001456 47C72606 5EC47CEB C0280475 u.+àŠ|á^.&úGV..&úGX..á^.&úGZ..&ú 000020
 6447C726 00056247 C726065E C4000060 47C72600 055E47C7 26065EC4 00005C47 G\..á^.&úG^..&úG`..á^.&úGb..&úGd 000040
 00006C47 C726000F 6A47C726 065EC400 006847C7 26000F66 47C72606 5EC40000 ..á^.&úGf..&úGh..á^.&úGj..&úGl.. 000060
 C0280000 7447C726 00147247 C726065E C4000070 47C72600 146E47C7 26065EC4 á^.&úGn..&úGp..á^.&úGr..&úGt..+à 000080
 83067F16 7C000C7E 831C7410 46080E46 88088E00 06881E00 000CC8C8 C91F00E8 Š..èúà....¡...Ä.F..F.t..~..|.... 0000A0
 468D0E76 FF1076FF 59E880F3 88057500 067E8306 7C0D7F00 087E830E 74000A7E ~..t..~....|..~..u.¡µ.ŠY.v..v..F 0000C0
 F4468834 E880F988 0575000B F65689F4 4689FE56 88FC4688 0000FFFF 9A5016FC ∎.P......F∎.V±.F¶.V~.Âu.¡*.Š4.F¶ 0000E0
 88F85EC4 02578926 0789260C 56880A46 88F85EC4 FA5689F8 46890056 05F65688 .V~.V..F%.V*á^%.F..V.&..&.W.á^%. 000100
 D88E0098 881E0000 0CC8000C CAC91F00 E8C02806 57892604 47892608 56880646 F..V.&.G.&.W.+àŠ..èò..à.....¡...Ä 000120
 FC468800 0000049A 5016FC46 8D0E76FF 1076FF72 E880F388 05751046 080E4688 .F..F.u.¡µ.Šr.v..v..F∎.P.à....F∎ 000140
 5689F846 89005605 F65688F4 46884DE8 8DF98805 750008F6 5689F446 89FE5688 .V±.F¶.V~.Âu.¡*.ŠM.F¶.V~.V..F%.V 000160
 46880257 89260789 26065EC4 06578826 04478826 F85EC415 7408460B 064688FA *.F..F.t.á^%&.G.&.W.á^.&..&.W..F 000180
 1F00EBC0 28025789 26078926 0A5EC406 57882604 478826F8 5EC41574 0C46080A ..F.t.á^%&.G.&.W.á^.&..&.W.+àŠ.. 0001A0
 7E83067F 167C0008 7E831C74 1046080E 4688D88E 012C881E 00000CC8 000CCAC9 èò..à....¡...Ä.F..F.t..~..|....~ 0001C0
 FC46800E 76FF1076 FF59E880 F3880575 000A7E83 067C0D7F 000C7E83 0E740006 ..t..~....|..~..u.¡µ.ŠY.v..v..F∎ 0001E0

Dump of file SATURN:[PCCOMMON.DUMP.DLL]BRD.TMP;1 on 18-APR-1990 10:36:59.83
File ID (519,15,0)   End of file block 272 / Allocated 272

Virtual block number 143 (0000008F), 512 (0200) bytes

 88F84688 34E880F9 88057500 08FA5689 F84689FE 5688FC46 88000001 499A5016 .P.I....F∎.V±.F%.V*.Âu.¡*.Š4.F%. 000000
 4688F45E C4025789 26078926 0C56880A 4688F45E C4F65689 F4468900 5E05FA56 V*.^..F¶.V~á^¶.F..V.&..&.W.á^¶.F 000020
 88D88E01 8A881E00 000CC800 0CCAC91F 00E8C028 06578926 04478926 08568806 ..V.&.G.&.W.+àŠ..èò..à....¡¤..Ä. 000040
 88FC4688 000001F3 9A5016FC 46800E76 FF1076FF 71E880F3 88057510 46080E46 F..F.u.¡µ.Šq.v..v..F∎.P.µ....F∎. 000060
 F65689F4 4689005E 05FA5688 F846884C E880F988 0575000B FA5689F8 4689FE56 V±.F%.V*.Âu.¡*.ŠL.F%.V*.^..F¶.V~ 000080
 06468802 57892607 89260A5E C4065788 26044788 26F45EC4 15740C46 080A4688 .F..F.t.á^¶&.G.&.W.á^.&..&.W..F. 0000A0
 CAC91F00 E8C02802 57892607 8926065E C4025788 26078826 F45EC414 7408460B .F.t.á^¶&..&.W.á^.&..&.W.+àŠ..èò 0000C0
 FF1076FF 0091E980 F3880675 1046080E 4688D88E 0248881E 56570000 08C8000C ..à...WV.¡K..Ä.F..F.u.¡µ.Ö...v.. 0000E0
 E880F988 0575000B FA5689F8 4689FE56 88FC4688 00000268 9A5016FC 46800E76 v..F∎.P.h....F∎.V±.F%.V*.Âu.¡*.Š 000100
 C44EE880 F388057D 00 57F83 26077C00 027F8326 0A5EC42C 740C460B 0A46886C l.F..F.t,á^.&....|.&....).¡µ.ŠNá 000120
 065EC42C 7408460B 0646881F A5A5A5A5 DA8E1EF0 88667F80 0C56880A 4688F85E ^%.F..V...f.Þ..OEEEE..F..F.t,á^. 000140
 886E7F80 08568806 4688F85E C41AE880 F388057D 00067F83 26077C00 027F8326 &....|.&....).¡µ.Š.á^%.F..V...n. 000160
 D88E020A 881E5657 000008C8 000CCAC9 5F5E1F00 E8C0281F A5A5A5A5 DA8E1EF0 Þ..OEEEE.+àŠ..^_èò..à...WV.¡O..Ä 000180
 FC468800 0002F89A 5016FC46 800E76FF 1076FF69 E880F388 05751046 080E4688 .F..F.u.¡µ.Ši.v..v..F∎.P.%....F∎ 0001A0
 F846880A 5EC41874 0C46080A 468844E8 8DF98805 75000BFA 5689F846 89FE5688 .V±.F%.V*.Âu.¡*.ŠD.F..F.t.á^..F% 0001C0
 F8468806 5EC41874 08460806 46881FA5 A5A5A50A 8E1EF088 F8880066 05FA5688 .V*.f..«.Þ..OEEEE..F..F.t.á^..F% 0001E0

Dump of file SATURN:[PCCOMMON.DUMP.DLL]BRD.TMP;1 on 18-APR-1990 10:36:59.83
File ID (519,15,0)   End of file block 272 / Allocated 272

Virtual block number 144 (00000090), 512 (0200) bytes

 000CC800 0CCAC95F 5E1F00E8 C0281FA5 A5A5A50A 8E1EF088 F888006E 05FA5688 .V*.n..«.Þ..OEEEE.+àŠ..^_èò..à.. 000000
 88067508 46080646 8808740C 46080A46 88107410 46080E46 88088E03 8C881E00 ..¡...Ä.F..F.t..F..F.t..F..F.u.¡ 000020
 5689F846 89FE5688 FC468800 0003A99A 5016FC46 800E76FF 1076FF01 5AE980F3 µ.ÖZ..v..v..F∎.P.`....F∎.V±.F%.V 000040
 77FF26F4 5EC4F656 89F44689 005E05FA 5688F846 880134E9 8DF98806 75000BFA *.Âu.¡*.Ö4..F%.V*.^..F¶.V~á^¶&.w 000060
 C008C028 02E80001 88057500 0804AE01 309A37FF 260277FF 260A5EC4 37FF2602 .&.7á^.&.w.&.7.0.Û..Âu.¡..Š.+à.â 000080
 048602C3 9A0A5EC4 37FF2602 77FF26F4 5EC44DE8 02578826 0788260A 5EC40C74 t.á^.&..&.W.ŠMá^¶&.w.&.7á^..ú.Ñ. 0000A0
 040303EF 9ADC8808 EC8304CE 06999A28 321E8004 C406C79A 048802C3 9AF45EC4 á^¶.û.£..ú.á...2(...ö..&..É.ÿ.£. 0000C0
 8926065E C4050E00 FC9A5052 04E904A6 9A04E202 569AD888 08C48304 D007BE9A .ƒ.\..á..Ä.V.ã..1.Ö.RP.∎...á^.&. 0000E0
 05350130 9A0477FF 260677FF 260A5EC4 0477FF26 0677FF26 F45EC402 57892607 .&.W.á^¶&.w.&.w.á^.&.w.&.w..0.5. 000100
 800A5EC4 54E80657 88260447 88260A5E C40D74C0 08C02802 E8000188 0575D008 .Âu.¡..Š.+à.ât.á^.&.G.&.W.ŠTá^.. 000120
 05580699 9A28321E 8D054E06 C79A0545 02C39A04 5F8DF45E C4054002 C39A045F _..ú.ə.á^¶._..ú.E..ú.N...2(...X. 000140
 5052057E 04A69A05 6C02569A D88808C4 83056707 8E9A055D 03EF9ADC 8808EC83 ¯&..É.ÿ.]..7.g..á..Ä.V.l..1.~.RP 000160
 1F00E8C0 28065789 26044789 26065EC4 FFFF00FC 9A0477FF 260677FF 26F45EC4 á^¶&.w.&.w..∎...á^.&.G.&.W.+àŠ.. 000180
 46880874 0C46080A 46881074 1046080E 4688D88E 0413881E 00000CC8 000CCAC9 èò..à....¡...Ä.F..F.t..F..F.t..F 0001A0
 88FC4688 00000441 9A5016FC 46800E76 FF1076FF 015AE980 F3880675 08460806 ..F.u.¡µ.ÖZ..v..v..F∎.P.A....F∎. 0001C0
 5689F846 89005605 F65688F4 46880134 E980F988 0675D008 F65689F4 4689FE56 V±.F¶.V~.Âu.¡*.Ö4..F¶.V~.V..F%.V 0001E0
```

File ID (519,15,0)   End of file block 272 / Allocated 272

Virtual block number 145 (00000091), 512 (0200) bytes

```
01880575 D0080635 01309A37 FF260277 FF260A5E C437FF26 0277FF26 F85EC4FA *6^½&.w.&.76^.&.w.&.7.0.5..Åu.¡. 000000
C437FF26 0277FF26 F85EC44D E8025788 26078826 0A5EC40C 74C008C0 2802E800 .Š.+à.åt.6^.&..&.W.ŠM6^½&.w.&.76 000020
08EC8306 5506999A 28321E8D 064806C7 9A064202 C39AF85E C4063002 C39A0A5E ^..û.=.å^½.Û.B..Ú.K...2(...U..&. 000040
00FC9A50 52067004 A69A0669 02569AD8 8808C483 066407BE 9A065A03 EF9ADC88 .É.ÿ.Z../.d..á..Ä.V.i..Ï.p.RP.=. 000060
FF260677 FF260A5E C40477FF 260677FF 26F85EC4 02578926 07892606 5EC40695 ..6^.&..&.W.6^½&.w.&.w.6^.&.w.&. 000080
57882604 4788260A 5EC40074 C008C028 02E80001 88057500 08068C01 309A0477 w..0.V..Åu.¡..Š.+à.åt.6^.&.G.&.W 0000A0
1E800605 06C79A06 CC02C39A 045F80F8 5EC406C7 02C39A04 5F800A5E C454E806 .ŠTá^..._..Û.Ú.6^½._..Û.ä..Ú.f... 0000C0
06F30256 9AD88808 C48306EE 07BE9A06 E403EF9A DC8808EC 83060F06 999A2832 2(...Ô.¯&..É.ÿ.ô..7.Ÿ..á..Ä.V.µ. 0000E0
89260447 8926065E C4048100 FC9A0477 FF260677 FF26F85E C4505207 0504A69A .Î...RPá^½&.w.&.w..=...6^.&.G.&. 000100
00020000 00170608 0002027F 000505C8 02030003 90000CCA C91F00E8 C0280657 W.+àŠ..èò.......à............... 000120
2E7C0106 7E83088E FFFF881E 000002C8 00000000 00000000 00000000 0019059A .................à....¡...Ä.-..|. 000140
0674010A 7E830C74 080A7E83 1274040A 7E832074 0E46080C 4688287C 01087E83 .-..|(.F..F.t .-..t..-..t..-..t. 000160
65E90A46 88FE4689 40084688 0195E98D F3880675 12460810 46880875 020A7E83 .-..u..F..F.u.¡µ.Ô...F.ə.F±.F.Ôe 000180
99FE4688 50529906 46880257 89260789 26105EC4 0A578826 08478826 0C5EC401 .á^.&.G.&.W.6^.&..&.W..F..RP.F±. 0001A0
FC9A5052 00910060 9A505206 57182604 4728260E 5788260C 4788260C 5EC45052 RPá^.&.G.&.W.&+G.&.W.RP.'...RP.= 0001C0
260C5EC4 0129E906 57892604 47892610 5EC40657 13260447 03260C5E C400E400 .ð.á^.&.G.&.W.á^.&.G.&.W.Ô).á^.& 0001E0
```

Dump of file SATURN: °CCOMMON.DUMP.DLL]BRD.TMP;1 on 18-APR-1990 10:36:59.83
File ID (519,15,0)   End of file block 272 / Allocated 272

Virtual block number 146 (00000092), 512 (0200) bytes

```
260C5EC4 505299FE 46885052 99064688 02578926 07892610 5EC40257 88260788 ..&.W.á^.&..&.W..F..RP.F±.RPá^.& 000000
0C5EC401 2900FC9A 505200E8 00609A50 52065718 2604472B 260E5788 260C4788 .G.&.W.&+G.&.W.RP.'.Š.RP.=.).á^. 000020
99FE4688 50529906 468800CF E9065789 26044789 26105EC4 06571326 04470326 &.G.&.W.á^.&.G.&.W.ÔÜ..F..RP.F±. 000040
00FC9A50 52013000 609A5052 02571826 0728260A 57882608 4788260C 5EC45052 RPá^.&.G.&.W.&+.&.W.RP.'.O.RP.=. 000060
5788260C 4788260C 5EC40257 89260789 26105EC4 02571326 0703260C 5EC40181 ..á^.&..&.W.á^.&..&.W.á^.&.G.&.W 000080
4788260C 5EC45052 99FE4688 50529906 468877E8 06578926 04478926 105EC40E .á^.&.G.&.W.Šw.F..RP.F±.RPá^.&.G 0000A0
0703260C 5EC4FFFF 00FC9A50 52018800 609A5052 02571826 0728260A 57882608 .&.W.&+.&.W.RP.'...RP.=...á^.&.. 0000C0
04478926 105EC406 57882604 4788260C 5EC40257 89260789 26105EC4 02571326 &.W.á^.&..&.W.á^.&.G.&.W.á^.&.G. 0000E0
03750008 30FEE1E9 03750004 30FF43E9 03750002 30A37400 0130 1FE8 06578926 &.W.Š.=..tÉ=..u.ÔC.=..u.ÔÄ±=..u. 000100
28742846 08264688 D88E0006 881E5657 000032C8 C8C91F00 E8C02800 E8FE7EE9 Ô~±Š.+àŠ..èùà2..VV.¡...Ä.F&.F(t( 000120
08740C46 080A4688 10741046 080E4688 18741446 08124688 20742446 08224688 .F".F$t .F..F.t..F..F.t..F..F.t. 000140
22468BE2 5689E046 89υ01605 28568826 4688033B E98DF388 06750846 08064688 .F..F.u.¡µ.Ô;..F&.V(....FÅ.Vā.F" 000160
03742646 39224688 DE468916 46880C46 89184688 E65689E4 46890016 05245688 .V$....FÔ.VÎ.F..FÉ.F..FB.F"9F&t. 000180
75081 87E 83397 51C 46081A46 88417520 46081E46 880092E9 03742856 39009AE9 Ô..9V(t.Ô...F..F uA.F..F.u9.-..u 0001A0
46890E46 89164688 08750818 7E8320E8 DC46890E 46890002 88087508 167E8311 ..-..u.¡...FB.FÉŠ .-..u..F..FB.F 0001C0
081A4688 3E752046 081E4688 46E80C46 890E4689 18468809 7508167E 830FE8DC ÉŠ..-..u..F..FB.FÉŠF.F..F u>.F.. 0001E0
```

Dump of file SATURN:[PCCOMMON.DUMP.DLL]BRD.TMP;1 on 18-APR-1990 10:36:59.83
File ID (519,15,0)   End of file block 272 / Allocated 272

Virtual block number 147 (00000093), 512 (0200) bytes

```
89064689 2056881E 46881646 890A4688 18468916 46880A46 89184688 36741C46 F.t6.F..FÔ.F..F..FÖ.F..F..V .F=. 000000
187E8301 20E91C56 891A4689 08568806 46882056 891E4689 1C56881A 46880856 VÄ.F..V..F..V .F=.VÄ.F..V.Ô-..-. 000020
7C04FE7E 83FE46FF 03E80000 FE46C7FF FFDA46C7 011EE903 7408167E 83097408 .t..-..t.Ô..ÚFÖ..ÚF±..Š..F±.~±.| 000040
46890A57 18260847 2826E05E C4025788 26078826 E45EC476 E8FE4688 00C6E903 .Ô6..F±Švá^Ô&..&.W.á^Å&+G.&.W..F 000060
5689CE46 890A5718 26084728 26E45EC4 02578826 07882 6E0 5EC46EE8 D05689CE ö.VÅŠná^Å&..&.W.á^Ô&+G.&.W..Fö.V 000080
E8D05689 CE46890E 5718260C 472826E0 5EC40657 88260447 8826E45E C451E8D0 ÅŠQá^Ô&.G.&.W.á^Å&+G.&.W..Fö.VÅŠ 0000A0
0815E8D0 5689CE46 890E5718 260C4728 26E45EC4 06578826 04478826 E05EC433 3á^Å&.G.&.W.á^Ô&+G.&.W..Fö.VÅŠ.. 0000C0
DA7E83FF 58E9037D 00D07E83 00E8CF74 00033D86 7400023D 9E740001 308674C0 åt.=..t.=..tÑ=..tüŠ..-Å.).Ô[..-Ô 0000E0
56890246 89D05688 CE468812 73CE4639 057C197F D0563904 56880246 88127C00 .|..F=.VÅ9VÅ..|.9Föe..Fö.VÅ.F=.V 000100
87880 2E3 C1DA5E88 0C752046 081E4688 14750818 7E83FF2E E90A4689 FE4688D4 Å.F±.FÔÔ...-..u..F..F u..^ÔèD... 000120
878802E3 C1DA5E88 0C751C46 081A4688 14750816 7E830C46 89184688 03E80A9E ..Š..F..FÉ.-..u..F..F.u..^ÔèD... 000140
E9037C02 FE7E83FE 46FF03E8 0000E846 C70000FE 46C70E46 89164688 03E80AA0 ..Š..F..FBÚF±..ÚFÔ..Š..F±.~±.|.Ô 000160
0374C208 FC5689FA 46891C56 881A4688 06E82056 881E4688 087500FE 7E8300F1 þ..-±.u..F..V Š..F..V..F".V=.ôt. 000180
7508167E 830C7420 46081E46 88147528 56391975 26463924 56882246 880081E9 Ô...F".V$9F&u.9V(u..F..F t..-..u 0001A0
7688E072 FFE272FF 02E6C1FE 76885016 EA428003 E6C1FE76 880E4689 DC468806 ..FÉ.FB.v±èl..Bõ.P.v±èl..rā.rÅ.v 0001C0
88500001 8803E800 02880575 2856390A 75264639 24568822 46880C72 FFE6D1FE ±Il.rÉ.F".V$9F&u.9V(u.¡..Š.¡..P. 0001E0
```

```
Dump of file SATURN:[PCCOMMON.DUMP.DLL]BRD.TMP;1 on 18-APR-1990 10:36:59.83
File ID (519,15,0)   End of file block 272 / Allocated 272

Virtual block number 148 (00000094), 512 (0200) bytes

 83F831E8 0E500001 8803E8E8 4688E846 FF087528 56390075 26463924 56882246 F".V$9F&u.9V(u..FÒ.FÒ$.|..P.Ò1«. 000000
 50160C42 80E601FE 7688FA76 FFFC76FF E072FFE2 72FF02E6 C1FE7688 4CE80EC4 Ä.$L.vzè|..rå.rÅ.v=.v".vz||.BÉ.P 000020
 5688FA46 8803E6C1 FE768854 E880F388 0575080C 7A83E6D1 FE768800 00FFFF9A ......vz||.zÉ.u.|¤.$T.vzè|..F".V 000040
 88065EC4 0789260C 46880A5E C4FF03E9 1FA5A5A5 A50A8E1E 0716F088 EA7A80FC •.zö.Þ....ÖEEEE.Ö..á^..FÉ&..á^.. 000060
 1F161EF2 7680F888 0E5FC41F A5A5A5A5 1F161EEA 7680F888 125EC407 89260E46 F0&..á^..«.võ...ÉÉÉÉ.á^..«.v.... 000080
 4788260A 5EC4088E 01E4881E 000008C8 0024CAC9 5F5E1F00 E8C0281F A5A5A5A5 ÉÉÉÉ.+á$..^_èò$.à....|Ö..Äá^.&.G 0000A0
 16FC4680 F876FFFA 76FF0594 09C29A00 6A006A50 52FA5689 F8468906 57882604 .&.W..F%.V"ÑPj.j..ô....v".v%.F•. 0000C0
 E806E800 01880575 0856390A 75064639 FE5688FC 46881775 C008FFFF 0A589A50 P.X....åu..F•.Vz9F.u.9V.u.|..$.$ 0000E0
 8789260E 56880C46 88065EC4 088E0566 881E5657 000004C8 C8C91F00 E8C02805 1+á$..èùà...WV.|f..Äá^..F..V.&.. 000100
 89008697 88260084 87882606 5EC40088 8789260A 4688065E C4008C97 8926008A ..&....á^..F.&....á^.&....&..... 000120
 E8000188 1FA5F200 08890A8E 1EF08816 7F801256 88104688 FC5EC4FE 5689FC46 F•.Vzá^•.F..V.....Þ..Ö¿...É.|..$ 000140
 6A0A76FF 0C76FFFE 568CFC46 89EC4680 088E05C0 881E0000 1CC8C8C9 5F5E1F00 ..^_èùà....|á..Á.F$.F•.Vz.v..v.j 000160
 88E84688 6D75C008 05840A58 9A5016E8 46800A76 FF0C76FF 064609C2 9A006A00 .j.¯ô.F..v..v..FÒ.P.X....åum.FÒ. 000180
 76FF1876 FF1A76FF 08C483FF FF1A119A 5052FC76 FFFE76FF E65689E4 4689EA56 VÕ.FÕ.V|.vz.v=RP......á..v..v..v 0001A0
 16C48300 33E80E06 76FF0876 FFFC76FF FE76FF0E 76FF1076 FF1276FF 1476FF16 ..v..v..v..v..vz.v=.v..v..Ò3..á. 0001C0
 07E80E02 77FF2604 77FF26E4 5EC4026A E876FFEA 76FFFC76 FFFE76FF 2274C008 .át".vz.v=.võ.vÒj.á^Ö&.w.&.w..Ò. 0001E0

Dump of file SATURN:[PCCOMMON.DUMP.DLL]BRD.TMP;1 on 18-APR-1990 10:36:59.83
File ID (519,15,0)   End of file block 272 / Allocated 272

Virtual block number 149 (00000095), 512 (0200) bytes

 03C1E90E 4688D88E 061C881E 00000EC8 C8C91F00 E8C028FF 7FE907E8 0EC483FF ..á.$.Ö..+á$..èùà....|...Ä.F.Öè. 000000
 E9037704 47392609 7F000DE9 03700657 39260A5E C4065788 26044788 26105EC4 á^.&.G.&.W.á^.&9W.).ÖÅ...&9G.w.Ö 000020
 02573826 105EC400 D2830001 05025718 26072826 185EC402 57882607 882600C5 á.&..&.W.á^.&+.&.W.....•.á^.&;W. 000040
 07032618 5EC40A57 88260847 88260A5E C40098E9 03720738 26087C00 A2E9037E -.ÖÅ.|.&;.r.Ö..á^.&.G.&.W.á^.&.. 000060
 47882614 5EC46D76 07382605 7F747C02 57382610 5EC400DA 8300012D 02571326 &.W.-...Ö.á^.&;W.|t..&;.vmá^.&.G 000080
 88105EC4 1C760447 3926067F 247C0657 39260A5E C4FA5689 F8468906 57882604 .&.W..F%.V"á^.&9W.|$..&9G.v.á^.. 0000A0
 74C008F2 4689C028 02E80001 88057304 47392606 7C007F06 573926FA 5688F846 F%.V"&9W...|.&9G.s.|..$.+á.F·.ât 0000C0
 89065718 2604472B 26185EC4 06578826 04478826 0A5EC416 E8FA5688 F8468808 ..F%.V"$.á^.&.G.&.W.á^.&+G.&.W.. 0000E0
 5739260A 5EC40657 88260447 8826105E C402F4E9 037FE9C0 2805E8F6 5689F446 F¶.V-$.+âÒ..Ö¶.á^.&.G.&.W.á^.&9W 000100
 1826072B 26185EC4 02578826 07882600 C5E90372 0C473926 097C0000 E9037E0E .-.ÖÅ.|.&9G.r.Öé.&..&.W.á^.&+.&. 000120
 5EC40098 E9037207 3826087C 00A2E903 7E025738 26105EC4 00D28300 01050257 W.....•.á^.&;W.-.ÖÅ.|.&;.r.Ö..á^ 000140
 02573826 105EC400 DA830001 20025713 26070326 185EC40A 57882608 4788260A .&.G.&.W.á^.&..&.W.-...Ö.á^.&;W. 000160
 5739260A 5EC4FA56 89F84629 06578826 04478826 145EC46D 76073826 057F747C |t..&;.vmá^.&.G.&.W..F%.V"á^.&9W 000180
 04473926 067F007C 06573926 FA5688F8 4688105E C41C730C 47392606 7C247^^E ..$|.&9G.s.á^..F%.V"&9W.|...&9G. 0001A0
 260C4788 260A5EC4 16E8FA56 88F84688 0874C008 F24689C0 2802E800 01880S7 v.|..$.+á.F·.ât..F%.V"$.á^.&.G.& 0001C0
 5EC40205 E90290E9 C02805E8 F65689F4 46890657 13260447 0326185E C40E5788 .W.á^.&.G.&.W..F¶.V-$.+âÒ..Ö..á^ 0001E0

Dump of file SATURN:[PCCOMMON.DUMP.DLL]BRD.TMP;1 on 18-APR-1990 10:36:59.83
File ID (519,15,0)   End of file block 272 / Allocated 272

Virtual block number 150 (00000096), 512 (0200) bytes

 882600C5 E9037707 3926087F 00CFE903 7D025739 260A5EC4 02578826 07882610 .&..&.W.á^.&9W.).Öü...&9.w.Öé.&. 000000
 037E0657 3826105E C4000283 00010506 57182604 47282618 5EC40657 88260447 G.&.W.á^.&+G.&.W.....•.á^.&;W.-. 000020
 04470326 185EC40E 5788260C 4788260A 5EC40095 E9037204 47382609 7C00A0E9 Ö..|.&;G.r.Ö..á^.&.G.&.W.á^.&.G. 000040
 8826145E C4687604 47382606 7F707C06 57382610 5EC400DA 8300012D 06571326 &.W.-...Ö.á^.&;W.|p..&;G.vhá^.&. 000060
 4688105E C4187607 3926057F 227C0257 39260A5E C4FA5689 F8468902 57882607 .&.W..F%.V"á^.&9W.|"..&9.v.á^..F 000080
 880874C0 08F24689 C02802E8 00018805 73073926 057C0C7F 02573926 FA5688F8 %.V"&9W...|.&9.s.|..$.+á.F·.ât.. 0000A0
 5689F446 89025718 26072826 185EC402 57882607 88260A5E C414E8FA 5688F846 F%.V"$.á^.&..&.W.á^.&+.&.W..F¶.V 0000C0
 02E9037E 0A573926 0A5EC402 57882607 8826105E C40118E9 01A3E9C0 2805E8F6 -$.+âÖÉ.Ö..á^.&..&.W.á^.&9W.-.Ö• 0000E0
 05065718 2604472B 26185EC4 06578826 04478826 00C7E903 72084739 26097C00 .|.&9G.r.Öü.&.G.&.W.á^.&+G.&.W.. 000100
 260A5EC4 0097E903 72044738 26097C00 A2E9037E 06573826 105EC400 02830001 ...•.á^.&;W.-.ÖÅ.|.&;G.r.Ö..á^.& 000120
 7C065738 26105EC4 000A8300 01200657 13260447 0326185E C40E5788 260C4788 .G.&.W.á^.&.G.&.W.-...Ö.á^.&;W.| 000140
 0A573926 0A5EC4FA 5689F846 89025788 26078826 145EC46A 76044738 26067F72 r..&;G.vjá^.&..&.W..F%.V"á^.&9W. 000160
 05760739 26057F0C 7C025739 26FA5688 F8468810 5EC41873 08473926 067C237F .#|.&9G.s.á^..F%.V"&9W.|...&9.v. 000180
 57882608 4788260A 5EC415E8 FA5688F8 46880874 C008F246 89C02802 E8000188 |..$.+á.F·.ât..F%.V"$.á^.&.G.&.W 0001A0
 E800ACE9 C02829E8 0083E9C0 2805E8F6 5689F446 89025713 26070326 185EC40A .á^.&..&.W..F¶.V-$.+âÒ°.$)+âÒ˜.$ 0001C0
 FDE90375 00083DFE F2E90375 00043DFC 2FE90375 00023DFD 26E90375 00013022 "=..u.Ö&»=..u.Ö/•=..u.Ö±=..u.Ö» 0001E0
```

```
Dump of file SATURN:[PCCOMMON.DUMP.DLL]BRD.TMP;1 on 18-APR-1990 10:36:59.83
File ID (519,15,0)   End of file block 272 / Allocated 272

Virtual block number 151 (00000097), 512 (0200) bytes

 74020E7E 833C7500 0E7F8326 FE5689FC 46891457 88261247 8826065E C4D7E8FD »Šmá^.&.G.&.W..F=.V±&....u<.~..t 000000
 83067401 0E7E831E 72F44639 057F257C F65639FE 5688FC46 88127508 0E7E8306 ..~..u..F=.V±9V-|%..9F¶r..~..t.. 000020
 F65688F4 4688065E C43076F4 4639057F 377CF656 39FE5688 FC468842 75040E7E -..uB.F=.V±9V-|7..9F¶vOá^..F¶.V- 000040
 0E47C726 0674000E 7F832606 5EC41047 8926F246 88065EC4 14578926 12478926 &.G.&.W.á^..F·&.G.á^.&....t.&úG. 000060
 261647B8 260C5EC4 088E06C6 881E0000 2CC8C8C9 1F00E8C0 2804E800 01880000 ..|..Š.+äŠ..èùà,...¡ó..Äá^.&.G.& 000080
 76FF0876 FFF6568C F44689E4 4680DA56 89D84689 005E050E 56890C46 891857B8 .W..FÉ.V8.^..FÁ.VÖ.FÔ.F¶.V-.v..v 0000A0
 22E90374 C0080C26 0A589A50 16F8468D 0676FF08 76FF0888 09C29A00 6A006A06 .j.j..ô....v..v..F%.P.X.&..ât.Ö" 0000C0
 0375C008 08C483F9 87E80E50 520C76FF 0E76FFD6 5689D446 89FA5688 F8468801 ..F%.V°.Fâ.Vø.v..v.RP.Òñ°.á..âu. 0000E0
 FF1676FF D876FFDA 76FF4574 00567F83 26077F4E 7C00587F 8326D45E C400ADE9 ÕU.á^â&..X.|N..&..V.tE.vÖ.vÄ.v.. 000100
 16C483FA 29E80E0C 76FF0E76 FF4277FF 264477FF 260A76FF 1076FF12 76FF1476 v..v..v..v.&.wD&.wB.v..v..Ò)°.á. 000120
 8826D45E C4025789 26078926 185EC400 86978826 008487B8 260C5EC4 1774C008 .ât.á^É&....&....á^.&..&.W.á^â&. 000140
 067F307C 00FE7E83 063600F0 9A5016FC 46805052 E25689E0 46894057 88263E47 G>&.W@.FÁ.VäRP.F=.P.Þ.ó..-±.|0.. 000160
 76FF0C76 FF0E76FF 1076FF12 76FF1476 FF1676FF 1876FF1A 76FF2874 00FC7E83 .-=.t(.v..v..v..v..v..v..v..v..v 000180
 6316E09A D476FFD6 76FFF476 FFF676FF 50E816C4 83FEE3E8 0EE076FF E276FF0A ..vã.vÅ.Òo±.á.ŠP.v-.v¶.vø.vâ.Å.c 0001A0
 FFF476FF F676FF0A 76FF1076 FF1276FF 1476FF16 76FFD876 FFDA76FF 08C48306 ..á..vÖ.vÁ.v..v..v..v..v..v-.v¶. 0001C0
 02578926 078926FA 5688F846 88185EC4 1074C008 16C483FA 27E80E0C 76FF0E76 v..v..Ò'°.á..ât.á^..F%.V°&..&.W. 0001E0

Dump of file SATURN:[PCCOMMON.DUMP.DLL]BRD.TMP;1 on 18-APR-1990 10:36:59.83
File ID (519,15,0)   End of file block 272 / Allocated 272

Virtual block number 152 (00000098), 512 (0200) bytes

 7E83FC46 89FE4689 C028D88E 0844881E 56570000 18C8C8C9 1F00E8C0 28FEC~<9 Õú±+äŠ..èùà...WV.¡D..Ä+á.F±.F=.~ 000000
 46882074 0A460808 46882875 02067E83 06740106 7E830C74 08067E83 127404C? ..t..~..t..~..t..~..u(.F..F.t .F 000020
 F3880675 1A460818 46880874 16460814 46881074 12460810 46881874 0E46080C ..F.t..F..F.t,.F..F.t..F..F.u.¡µ 000040
 C726085E C400010E 47C726F6 5689F446 891857B8 261647B8 26085EC4 01E4E98D .Öß.á^.&.G.&.W..F¶.V-&úG...á^.&ú 000060
 5EC40D75 C208FA56 89F84689 F25689F0 46890257 882607B8 26085EC4 00001047 G...á^.&..&.W..FÞ.V·.F%.V°.ôu.á^ 000080
 16FC468D EE5689EC 46894057 88263E47 8826F85E C408E80A 57882608 478826F4 ¶&.G.&.W.Š.á^½&.G>&.W@.F&.VŸ.F=. 0000A0
 C483FD80 E80EEC76 FF520676 FF0876FF 0A76FF0C 76FF0E76 FF1076FF 1276FF50 P.v..v..v..v..v..v..v.R.v&.Ò¯».á 0000C0
 E1E90374 FE4608FC 46881FA5 A5A5A5DA 8E1EF088 F8880E56 880C4688 145EC416 .á^..F..V..«.Þ..ÖEEEE..F=.F±t.ÖÄ 0000E0
 47392606 7F187C06 57392610 5EC40657 88260447 8826145E C4008DE9 06468800 ..F.Ö§.á^.&.G.&.W.á^.&9W.|...&9G 000100
 04478826 145EC400 A7E90657 89260447 8926145E C40657B8 260447B8 26137604 .v.&.G.&.W.á^.&.G.&.W.ÖÏ.á^.&.G. 000120
 145EC406 57882604 47882613 73044739 26067C18 7F065739 26105EC4 06578826 &.W.á^.&9W...|.&9G.s.&.G.&.W.á^. 000140
 26057F18 7C025739 26105EC4 02578826 07882614 5EC476E8 06578926 04478926 &.G.&.W.Švá^.&..&.W.á^.&9W.|...& 000160
 57882607 8826145E C449E802 57892607 8926145E C40257B8 26078826 11760739 9.v.&..&.W.á^.&..&.W.$Iá^.&..&.W 000180
 89260789 26145EC4 02578826 07882611 73073926 057C187F 02573926 105EC402 .á^.&9W...|.&9.s.&..&.W.á^.&..&. 0001A0
 00E88C74 0008308E 7400043D FF33E903 7500023D FF6DE903 7500013D 1CE80257 W.Š.=..u.Öm.=..u.Ö3.=..t/=..t.Š. 0001C0
 C4127508 067E8306 7404067E 83EA5689 E8468914 57882612 47882608 5EC452E8 ŠRá^.&.G.&.W..FÒ.Võ.-..t..-..u.á 0001E0

Dump of file SATURN:[PCCOMMON.DUMP.DLL]BRD.TMP;1 on 18-APR-1990 10:36:59.83
File ID (519,15,0)   End of file block 272 / Allocated 272

Virtual block number 153 (00000099), 512 (0200) bytes

 89260447 8926EA56 88E8468B 145EC411 E8025789 26078926 EA5688E8 4688145E ^..FÒ.Võ&..&.W.Š.á^..FÒ.Võ&.G.&. 000000
 078926FE 5688FC46 88185EC4 FC4689FE 4689C028 08740010 7F832608 5EC40657 W.á^.&....t.+á.F±.F=á^..F=.V±&.. 000020
 26008487 8826065E C4088E0C C2881E00 0014C8C8 C95F5E1F 00E8C028 02578926 &.W.+áŠ..^_èùà....¡ó..Äá^.&....& 000040
 F45689F2 4689005E 05C28CC3 88FE5689 FC468900 1605F856 89F64689 008697B8 .....F-.V%....F=.V±.ù.ô.^..F·.V¶ 000060
 30057400 0130FA46 894647B8 26EE5EC4 F05689EE 4689008C 97882600 8A878826 &....&.....FŸ.VÞá^Ÿ&.GF.F°=..t.= 000080
 2802E800 01880575 020A7E83 0674010A 7E83EC46 89C02802 E8000188 05750002 ..u.|..Š.+á.Fá.-..t..-..u.|..Š.+ 0000A0
 470326F2 5EC40E57 88260C47 8826FC5E C40087E9 FA468800 84E90375 EC4638C0 â;F$u.ÖÇ..F°Ö..á^=&.G.&.W.á^·&.G 0000C0
 F25EC406 57882604 478826FC 5EC47DE8 06578926 04478926 0C5EC406 57132604 .&.W.á^.&.G.&.W.Š)á^=&.G.&.W.á^· 0000E0
 0A578826 08478826 FC5EC45A E8065789 26044789 260C5EC4 06571826 04472826 &+G.&.W.á^.&.G.&.W.ŠZá^=&.G.&.W. 000100
 02578826 078826FC 5EC439E8 02578926 0789260C 5EC40257 13260703 26F25EC4 á^·&..&.W.á^.&..&.W.Š9á^=&..&.W. 000120
 03750002 30977400 013019E8 02578926 0789260C 5EC40257 1826072B 26F25EC4 á^·&+.&.W.á^.&..&.W.Š.=..t.=..u. 000140
 E8C02804 E80001B8 078926FA 4688105E C400E8A8 74000830 CE740004 30FF6CE9 ÖI.=..tö=..t Š.á^..F°&..|..Š.+áŠ 000160
 C4EC5689 EA468922 57882620 4788260C 5EC4D88E 0F03881E 000016C8 C8C91F00 ..èùà....|...Äá^.&.G &.W".Fõ.V&á 000180
 FC468900 86978826 008487B8 26F25EC4 F45689F2 46890457 88260247 8826EA5E ^õ&.G.&.W..F·.V¶á^·&....&.....F= 0001A0
 FA5689F8 46890856 88064688 F05689EE 46891057 88260E47 8826EA5E C4FE5689 .V±á^õ&.G.&.W..FŸ.VÞ.F..V..F%.V° 0001C0
 C41F75FA 56392475 F84639FE 5688FC46 88337408 57392606 75064739 26EE5EC4 á^Ÿ&9G.u.&9W.t3.F=.V±9F%u&9V°u.á 0001E0
```

```
Dump of file SATURN:[PCCOMMON.DUMP.DLL]BRD.TMP;1 on 18-APR-1990 10:36:59.83
File ID (519,15,0)   End of file block 272 / Allocated 272

Virtual block number 154 (0000009A), 512 (0200) bytes

 C0280474 008C9739 26077500 8A873926 F05688EE 46881475 0200888F 8326F25E ^.&.¢...u..FŸ.VÞ&9...u.&9...t.+å 000000
 39260675 07392610 5EC40257 88260788 26145EC4 F6468946 47882 6EE 5EC44DE8 $Má^V&.GF.F-á^.&..&.W.á^.&9.u.&9 000020
 46880075 06573926 13750447 3926105E C4065788 26044788 26145EC4 1A740257 W.t.á^.&.G.&.W.á^.&9G.u.&9W.u..F 000040
 7E83088E 103A881E 56570000 2CC8C8C9 1F00E8C0 2804E800 01880574 0A4639F6 -9F.t.¡..Š.+åŠ..èúà,..WV.¡:..Ä.- 000060
 46882874 0E46080C 46883075 020A7E83 0674010A 7E830C74 080A7E83 1274040A ..t..-..t..-..t..-..u0.F..F.t(.F 000080
 46880874 1A460818 46881074 16460814 46881874 12460810 46882074 08460806 ..F.t .F..F.t..F..F.t..F..F.t..F 0000A0
 260C5EC4 02CCE98D F3880000 07C72620 5EC40874 22460820 46881675 22460820  .F"u..F .F"t.á^ &ú...¡µ.Õä.á^.& 0000C0
 FE5689FC 46890086 97882600 84878826 E85EC4EA 5689E846 89185788 26164788 .G.&.W..FÒ.Vöá^Ò&....&.....F=.V± 0000E0
 205EC41F A5A5A5A5 DA8E1EF0 88F88812 56881046 88185EC4 000007C7 26205EC4 á^ &ú...á^..F..V..«.Þ..ÖÉÉÉ.á^  000100
 76FF1A76 FF1C76FF 1E76FF25 75085639 2A750646 39FE5688 FC468800 0007C726 &ú....F=.V±9F.u*9V.uX.v..v..v..v 000120
 EA5688E8 4688024E E9C02805 74C0080E C483FCFF E80EE876 FFEA76FF 0A76FF18 ..v..võ.vÒ.Ò.=.á..åt.+åÒN..FÒ.Võ 000140
 2FE80E50 520C76FF 0E76FFE2 5689E046 89085688 064688E6 5689E446 89005E05 .^..FÒ.V|.F..V..FÅ.Vä.v..v.RP.Ò/ 000160
 A5F20008 890A8E1E 0716F088 EC7E8D00 1605E256 88E04688 1874C008 08C483F3 µ.á..åt..FÅ.Vã....-&.Þ....Ö¿..·E 000180
 FF1A76FF 1476FF16 76FF08C4 830C6F16 E09AE076 FFE276FF 5016EC46 8D13E81F .Š..F&.P.vä.vÅ.Å.o..á..v..v..v.. 0001A0
 26205EC4 0074C008 12C483FD AFE80EE0 76FFE276 FF0A76FF 0C76FF0E 76FF1876 v..v..v..v..vä.vÅ.Ò€».á..åt.á^ & 0001C0
 2826145E C4FA5688 F8468875 75080A7E 83067404 0A7E8301 8FE9C028 000107C7 ú...+åÒ¢..-..t..-..uu.F½.V*á^.&+ 0001E0
```

```
Dump of file SATURN:[PCCOMMON.DUMP.DLL]BRD.TMP;1 on 18-APR-1990 10:36:59.83
File ID (519,15,0)   End of file block 272 / Allocated 272

Virtual block number 155 (0000009B), 512 (0200) bytes

 5EC42673 C138047C 2C7FD638 F27618F0 4E280677 8826044F 88260657 18260447 G.&.W.&.O.&.w.+NÞ.v·;ø.,|.;ès&á^ 000000
 07C7261C 5EC40657 89260447 8926185E C4FA5613 F8460306 57882604 478826E4 Ò&.G.&.W..F½.V*á^.&.G.&.W.á^.&ú. 000020
 06578926 04478926 185EC406 57182604 472826E4 5EC4F256 88F04688 24E80002 ..$$.FÞ.V·á^Ò&+G.&.W.á^.&.G.&.W. 000040
 7788260F 88260257 18260728 26145EC4 F65688F4 46886DE8 000107C7 261C5EC4 á^.&ú...Šm.F¶.V-á^.&+.&.W.&..&.w 000060
 5613F446 03025788 26078826 E45EC424 73C13804 7C2A7FD6 38EE7618 EC4E2802 .+N&.vŸ;ø.*|.;ès$á^Ò&..&.W..F¶.V 000080
 2826E45E C4EE5688 EC468822 E8000807 C7261C5E C4025789 26078926 185EC4F6 -á^.&..&.W.á^.&ú...Š".F&.VŸá^Ò&+ 0000A0
 75000C7F 83260C5E C4000407 C7261C5E C4025789 26078926 185EC402 57182607 .&.W.á^.&..&.W.á^.&ú...á^.&....u 0000C0
 5EC4D656 89D44689 02571826 07282618 5EC40257 88260788 26145EC4 00C0E903 .Òä.á^.&..&.W.á^.&+.&.W..F&.Vøá^ 0000E0
 0788261C 5EC4DA56 89D84689 06571826 04472826 185EC406 57882604 47882614 .&.G.&.W.á^.&+G.&.W..FÅ.VÒá^.&.. 000100
 68E8C028 047C000A 7E8344E8 74E8C028 04750008 7E83067C 0C7F000A 7E8342E8 $B.-Ò...|..-Å.u.+å$t$D.-Ò.|.+å$h 000120
 48E8C028 047C0006 7E8324E8 54E8C028 047500D4 7E83067C 0C7F00D6 7E8338E8 $B.-ø...|..-å.u.+å$T$$.-ø.|.+å$H 000140
 FF50160C 468D00E8 CA740008 3DE37400 0430B474 00023DCD 74000130 16E818E8 $.$.=..tè=..tÇ=..tD=..tòŠ..FÉ.P. 000160
 69E80E37 FF261C5E C40C76FF 0E76FF18 76FF1A76 FF1476FF 1676FF18 76FF1A76 v..v..v..v..v..v..v..v.á^.&.7.Òi 000180
 88107408 46080646 88088E11 2A881E00 0008C8C8 C95F5E1F 00E8C028 16C483F8 ½.á.+åŠ..^_èúà....¡*..Å.F..F.t.. 0001A0
 38578826 36478826 065EC400 8EE98DF3 88067510 46080E46 8808740C 46080A46 F..F.t..F..F.u.jµ.Ò..á^.&.G6&.W8 0001C0
 74FE4608 FC4688FE 5689FC46 89385788 26364788 26FC5EC4 11E8FE56 89FC4689 .F=.V±$.á^=&.G6&.W8.F=.V±.F=.F±t 0001E0
```

```
Dump of file SATURN:[PCCOMMON.DUMP.DLL]BRD.TMP;1 on 18-APR-1990 10:36:59.83
File ID (519,15,0)   End of file block 272 / Allocated 272

Virtual block number 156 (0000009C), 512 (0200) bytes

 89385788 26364788 26F85EC4 11E8FA56 89F84689 38578826 36478826 0A5EC454 Tá^.&.G6&.W8.F½.V*$.á^½&.G6&.W8. 000000
 0E5EC414 75FE5639 1975FC46 39FA5688 F8468826 74FA4608 F84688FA 5689F846 F½.V*.F½.F*t&.F½.V*9F=u.9V±u.á^. 000020
 89260247 8926C028 0E5EC493 E8C1E812 E8C02802 57892607 8926FE56 88FC4688 .F=.V±&..&.W.+åŠ.ŠèŠ.á^.+å&.G.&. 000040
 5689FC46 8908568B 06468800 02FA46C7 D88E1463 881E0000 06C8C8C9 1F00E807 .Š..èúà....¡c..ÄúF*...F..V..F=.V 000060
 C4117500 167E8355 74C008FA 4EFFFA46 88FE5689 FC46890C 56880A46 880CE8FE ±Š..F..V..F=.V±.F*.N*.åtU.-..u.á 000080
 2C74FE56 390575FC 46391056 880E4688 FE5689FC 46893857 88263647 8826FC5E ^=&.G6&.W8.F=.V±.F..V.9F=u.9V±t, 0000A0
 36478826 FC5EC408 7802909A FC76FFFE 76FF006A 016A006A 006A1276 FF1476FF .v..v.j.j.j.j..v±.v=...x.á^=&.G6 0000C0
 88088E15 1C881E00 0002C8C8 C91F00E8 C02895E8 C4E8FE56 89FC4689 38578826 &.W8.F=.V±$á$.+å$..èúà....|...Ä. 0000E0
 260E5EC4 65E880F3 88057510 46080E46 8808740C 46080A46 88107408 46080646 F..F.t..F..F.t..F..F.u.jµ.$eá^.& 000100
 FE60E80E 0676FF08 76FF0A76 FF0C76FF 530653E8 8DF58805 75184708 26164788 .G.&.G.u.¡%.$S.S.v..v..v..v..Òm± 000120
 FF260277 FF260477 FF260677 FF260E5E C41276FF 35E80274 C008FE46 890CC483 .á..F±.åt.$5.v.á^.&.w.&.w.&.w.&. 000140
 E8C02804 E80274C0 08FE4689 12C483FE F5E80E06 76FF0876 FF0A76FF 0C76FF37 7.v..v..v..v..Ò%±.á..F±.åt.$.+å$ 000160
 F3880575 0C46080A 46880874 08460806 4688088E 15A8881E 000008C8 C8C91F00 ..èúà....¡¨..Ä.F..F.t..F..F.u.¡µ 000180
 FFFE76FF 3EE8C028 04750008 FE5689FC 46890A57 88260847 8826065E C457E88D .$Wá^.&.G.&.W..F=.V±.Åu.+å$>.v±. 0001A0
 881775C0 0815870A 589A5016 F8468DFC 76FFFE76 FF168909 C29A006A 006AFC76 v=j.j..ó....v±.v=.F½.P.X....åu.. 0001C0
 0042C8C8 C91F00E8 C02805E8 06E80001 880575FA 56390A75 F846390C 56880A46 F..V.9F½u.9V*u.¡..Š.Š¡+åŠ..èúàB. 0001E0
```

```
Dump of file SATURN:[PCCOMMON.DUMP.DLL]BRD.TMP;1 on 18-APR-1990 10:36:59.83
File ID (519,15,0)   End of file block 272 / Allocated 272

Virtual block number 157 (0000009D), 512 (0200) bytes

 46800A76 FF0C76FF 160609C2 9A006A00 6A0A76FF 0C76FFD8 8E163A88 1E565700 .WV.¡:..Å.v..v.j.j..ô.ø..v..v..F 000000
 83FF45E8 0E0676FF 0876FFCC 76FFCE76 FF00FDE9 0374C008 16790A58 9A5016CC ë.P.X.y..ât.Ô»..vö.vä.v..v..ÒE.. 000020
 1A119AC8 76FF5750 16F0468D CA5689C8 4689CE56 88CC4688 D0E80274 C00808C4 Á..ât.ŠÅ.Fë.Vö.Fà.Vò.FÞ.PR.và... 000040
 02578826 0788260E 5EC41FA5 F2000889 1F161E07 16F0768D E07E8008 C4831261 ø..á..~Å.vÞ.....¿..·E.á^.&..&.W. 000060
 C05689BE 4689000A 8300012D 06578826 04478826 C45689C2 4689000A 8300012D -...Ö..Fô.V6&.G.&.W.-...Ö..Ff.Vå 000080
 4601E656 19E44629 C056888E 4688EA56 11E84601 E25619E0 4629C456 88C2468B .Fô.Vá)FÅ.Vä.FÔ.Võ.Ff.Vä)Fô.V|.F 0000A0
 88D87E8D 0008051F A5A5A5A5 DA8E1E07 16F08800 7E8D1456 88124688 EE5611EC å.VŸ.F..V..-Å.Þ....ÒEEEE.....-Å. 0000C0
 FFFF9A50 16C6468D 5016E046 80501608 46805016 D04680 1F A5A5A5A5 DA8E1EF0 Þ..ÒEEEE..FÅ.P.FÅ.P.FÅ.P.Fô.P... 0000E0
 0277FF26 0477FF26 C85EC402 6ACC76FF CE76FF50 16F0468D 217400C6 7E830000 ...-ó.t!.FÞ.P.vö.väj.á^å&.w.&.w. 000100
 8E1685B8 1E565700 003AC8C8 C95F5E1F 00E8C028 FEECE907 E80EC483 EDE4E80E .ÒôÚ.á.Š.Ô$±+áŠ..^_èùà:..WV.¡ç.. 000120
 4788260A 5EC40189 E9C02805 7402470B 26078826 125EC40C 74084608 06468808 Å.F..F.t.á^.&..&.G.t.+åÔ¿.á^.&.G 000140
 FF0876FF F65689F4 4689005E 05185788 26164788 26FA5689 F8468918 57882616 .&.W..F½.V¹&.G.&.W..^..F¶.V-.v.. 000160
 E90374C0 0816C60A 589A5016 FC468006 76FF0876 FF184909 C29A006A 006A0676 v.j.j..ô.I..v..v..F=.P.X.ô..ât.Ô 000180
 77FF26F0 5EC4F476 FFF676FF 0E76FF10 76FFF256 89F04689 FE5688FC 46880160 m..F=.V±.FÞ.V·.v..v..v-.v¶á^Þ&.w 0001A0
 88260084 878826F8 5EC41C74 C00810C4 83FE2EE8 0E0A76FF 0C76FF42 77FF2644 D&.wB.v..v..Ò.±.Á..ât.á^¼&....&. 0001C0
 E80EFC76 FFFE76FF 0A76FF0C 76FF0121 E9C02802 57892607 8926125E C4008697 ...á^.&..&.W.+åÔI..v..v..v±.v•,Ò 0001E0

Dump of file SATURN:[PCCOMMON.DUMP.DLL]BRD.TMP;1 on 18-APR-1990 10:36:59.83
File ID (519,15,0)   End of file block 272 / Allocated 272

Virtual block number 158 (0000009E), 512 (0200) bytes

 FF26F05E C40A76FF 0C76FF0E 76FF1076 FF1276FF 1476FF27 74C00808 C483ECAE Û$.á..ât'.v..v..v..v..v..v.á^Þ&. 000000
 FD44E80E 0A76FF0C 76FFFC76 FFFE76FF 00DCE910 C483FF08 E80E3E77 FF264077 wå&.w>.Ò...á.ÒE..v±.v•.v..v..ÒD» 000020
 0008890A 8E1E0716 F088E07E 8D001605 F25688F0 4688FF41 E90374C0 0808C483 .á..ât.ÒA..FÞ.V·....-Å.Þ....Ò¿.. 000040
 57882604 478826CC 5689CA46 89000A83 00012D02 57882607 8826F45E C41FA5F2 ·E.á^¶&..&.W.-...Ö..Fò.Vä&.G.&.W 000060
 88EA5611 E84601E2 5619E046 29CC5688 CA4688C8 5689C646 89000A83 00012D06 .-...Ö..Fó.Và.Fò.Và)FÅ.Vä.FÔ.Vò. 000080
 8E1E0716 F088D87E 8D105688 0E4688EE 5611EC46 01E65619 E44629C8 5688C646 Fó.Và)FÔ.V|.F±.VŸ.F..V..-Å.Þ.... 0000A0
 50160046 80501608 46801FA5 A5A5A5DA 8E1EF088 D07E8000 08051FA5 A5A5A5DA ÒEEEE.....-Å.Þ..ÒEEEE..FÅ.P.FÅ.P 0000C0
 5688FC46 88125EC4 FE93E903 7500CE7E 83000017 AE9A5016 CE468050 16E0468D .FÅ.P.Fö.P.Û....-ö.u.Ô.±á^..F•.V 0000E0
 17ED881E 000010C8 C8C95F5E 1F00E8C0 28FE7CE9 07E8C028 02578926 078926FE ±&..&.W.+áŠ.Ô|±+áŠ..^_èùà....¡Ú. 000100
 1046080E 46881975 1046080E 46880874 0C46080A 46881074 08460806 4688088E .Ä.F..F.t..F..F.t..F..F.u..F..F. 000120
 C4078926 02478926 C0280E5E C471E88D F3880789 26024789 26C0280E 5EC40C74 t.á^.+å&.G.&..¡µ.Šqá^.+å&.G.&..á 000140
 FC4689F6 5689F446 89025788 26078826 FA5689F8 46891857 88261647 8826065E ^.&.G.&.W..F½.V¹&..&.W..F¶.V-.F• 000160
 89405788 263E47P- 26FC5EC4 08EB0A57 88260847 8826F85E C40075C2 08FE5689 .V±.ôu.á^¼&.G.&.W.Š.á^•&.G>&.Wâ. 000180
 10C483FD 78E80E.. 520676FF 0876FF0A 76FF0C76 FF0E76FF 1076FFF2 5689F046 FÞ.V·.v..v..v..v..v..v.RP.Òx».á. 0001A0
 0676FF08 76FFFE56 8CFC4689 EC4680D8 8E19CE88 1E000020 C8C8C91F 00E8C028 +åŠ..èùà ...¡ö..Å.F±.F•.V±.v..v. 0001C0
 00FCE903 74C00818 390A589A 5016E846 8D0676FF 0876FF1A A709C29A 006A006A j.j..ô.I..v..v..FÒ.P.X.9..ât.Ô•. 0001E0

Dump of file SATURN:[PCCOMMON.DUMP.DLL]BRD.TMP;1 on 18-APR-1990 10:36:59.83
File ID (519,15,0)   End of file block 272 / Allocated 272

Virtual block number 159 (0000009F), 512 (0200) bytes

 012D0257 8826078B 260A5EC4 08C48317 101A119A E876FFEA 76FFFC76 FFFE76FF .v±.v•.vô.vÒ......á.á^.&..&.W.-. 000000
 5EC4E256 89E04689 000A8300 012D0657 88260447 8826E656 89E44689 000A8300 ..Ö..Fô.V|&.G.&.W.-...Ö..FÅ.Väá^ 000020
 C40A5711 26084701 26E65688 E44688FC 5EC40257 19260729 26E65688 E44688FC •.Fô.V|&).&.W.á^•.Fô.V|&.G.&.W.á 000040
 5711260C 470126E2 5688E046 88FC5EC4 06571926 04472926 E25688E0 4688FC5E ^•.FÅ.Vä&)G.&.W.á^•.FÅ.Vä&.G.&.W 000060
 26078826 52720847 3926067F 5A7C0A57 3926FC5E C402578B 26078826 0E5EC40E .á^.&..&.W.á^•&9W.|Z..&9G.rR&..& 000080
 C40E578B 260C478B 26FC5EC4 3A720847 3926067F 427C0A57 39260E5E C402578B .W.á^.&9W.|B..&9G.r:á^•&.G.&.W.á 0000A0
 7F065739 26FC5EC4 0E578826 0C478826 1E770447 3926067C 267F0657 39260E5E ^.&9W..&|.&9G.w.&.G.&.W.á^•&9W.. 0000C0
 00E8C028 FEEDE907 E80001B8 0574C008 C02802E8 00018805 77044739 26067C0D .|.&9G.w.¡..Š.+á.ât.¡..Š.ÔÚ±+áŠ. 0000E0
 47082607 8826125E C40C7408 46080646 88D88E1A 7D881E56 57000024 C8C8C91F .èùàŠ..WV.¡)..Ä.F..F.t.á^.&..&.G 000100
 FF0876FF EA5689E8 4689005E 0518578B 2616478B 260A5EC4 019AE9C0 28057402 .t.+åÔ..á^.&.G.&.W..^..FÔ.Võ.v.. 000120
 E90374C0 081A970A 589A5016 FC468006 76FF0876 FF1C0909 C29A006A 006A0676 v.j.j..ô....v..v..F=.P.X....ât.Ô 000140
 77FF26E4 5EC4E876 FFEA76FF 0E76FF10 76FFE656 89E44689 FE5688FC 4688015C \..F=.V±.Fô.V|.v..v..võ.vÒá^Ô&.w 000160
 02578926 078926FE 5688FC46 88125EC4 1574C008 0CC483FE 3EE80E42 77FF2644 D&.wB.Ò>±.á..ât.á^..F•.V±&..&.W. 000180
 FF1476FF 2774C008 08C483E8 FBE80EFC 76FFFE76 FF0A76FF 0C76FF01 1DE9C028 +åÔ...v..v..v±.v•.Ò«Ò.á..ât'.v.. 0001A0
 10C483FF 26E80E3E 77FF2640 77FF26E4 5EC40A76 FF0C76FF 0E76FF10 76FF1276 v..v..v..v..v.á^Ô&.wå&.w>.Ò&..á. 0001C0
 26E85EC4 1FA5F200 08890A8E 1E0716F0 88EC7E8D 001605E6 5688E446 880008E9 ÔA..Fô.V|....~&.Þ....Ò¿...·E.á^Ô& 0001E0
```

```
Dump of file SATURN:[PCCOMMON.DUMP.DLL]BRD.TMP;1 on 18-APR-1990 10:36:59.83
File ID (519,15,0)   End of file block 272 / Allocated 272

Virtual block number 160 (000000A0), 512 (0200) bytes

 00DA8300 01200657 88260447 8826E256 89E04689 00DA8300 01200257 88260788 ..&.W.-...Ö..FÅ.Vä&.G.&.W.-...Ö. 000000
 46290E56 880C4688 F65611F4 4601EE56 19EC4629 E25688E0 46880E56 890C4689 .FÉ.V8.FÅ.Vä)F&.VŸ.F¶.V-.FÉ.V8)F 000020
 41770739 26057C48 7F025739 26F65688 F446880E 5EC4FA56 11F84601 F25619F0 Þ.V·.F%.V*á^..F¶.V-&9W..H|.&9.wA 000040
 217F0657 3926FA56 88F84688 20720847 3926067F 357C0A57 3926EE56 88EC4688 .F&.VŸ&9W.|5..&9G.r-.F%.V*&9W..! 000060
 E8000188 05720C47 3926067F 007C0E57 3926F256 88F04688 19770447 3926067C |.&9G.w..FÞ.V·&9W.|...&9G.r.|..$ 000080
 C028FE8D E907E8C6 28025789 26078926 FE5688FC 4688125E C41474C0 08C02802 .+á.åt.á^..F=.V±&..&.W.+åS.Ö.±+á 0000A0
 740C4608 0A468810 74084608 06468808 8E1888B8 1E000010 C8C8C95F 5E1F00E8 $..^_èùà....¡£..Ä.F..F.t..F..F.t 0000C0
 8DF38807 89260247 8926C028 0E5EC40C 74104608 0E468819 75104608 0E468808 ..F..F.u..F..F.t.á^.+&&.G.&...¡µ. 0000E0
 26FA5689 F846891B 57882616 47882606 5EC40789 26024789 26C0280E 5EC471EB $qá^.+&&.G.&..á^.&.G.&.W..F%.V*& 000100
 57882608 478826F8 5EC40D75 C208FE56 89FC4689 F65689F4 46890257 88260788 ..&.W..F¶.V-.F=.V±.ôu.á^½&.G.&.W 000120
 0A76FF0C 76FF0E76 FF1076FF F25689F0 46894057 88263E47 8826FC5E C408EB0A .$.á^=&.G>&.W@.FÞ.V·.v..v..v..v. 000140
 D88E1D7D 881E0000 18C8C8C9 1F00E8C0 2810C483 FD97E80E 50520676 FF0876FF .v..v.RP.Ö.».á.+åS..èùà....¡)..Ä 000160
 46800676 FF0876FF 1E5609C2 9A006A00 6A0676FF 0876FFFE 568CFC46 89EC4680 .F$.F=.V±.v..v.j.j..ô.V..v..v..F 000180
 08C4831A 8F1A119A E876FFEA 76FFFC76 FFFE76FF 4475C008 18F90A58 9A5016E8 Ò.P.X.*..âuD.v±.v=.vô.vÒ...¢..á. 0001A0
 76FF0C76 FF0E76FF 1076FF12 76FF1476 FF1676FF 1876FF1A 76FF1C76 FF1E76FF .v..v..v..v..v..v..v..v..v..v..v 0001C0
 8E1E2C88 1E000000 C8C8C91F 00E8C028 A8E81AC4 83000CE8 0EFC76FF FE76FF0A ..v±.v=.Ò...á.$´+åS..èùà....¡,.. 0001E0

Dump of file SATURN:[PCCOMMON.DUMP.DLL]BRD.TMP;1 on 18-APR-1990 10:36:59.83
File ID (519,15,0)   End of file block 272 / Allocated 272

Virtual block numbe- 161 (000000A1), 512 (0200) bytes

 46885F72 08473926 057F677C 0A573926 16568814 4688065E C401E2E9 0E468808 Ä.F.Ôã.á^..F..V.&9W.|g..&9G.r_.F 000000
 26067F40 7C0E5739 26125688 1046884C 77073926 057C537F 02573926 1A568818 ..V.&9W..S|.&9.wL.F..V.&9W.|ä..& 000020
 10770447 3926067C 257F0657 3926065E C4025788 26078826 1C5EC438 760C4739 9G.v8á^.&..&.W.á^.&9W..%|.&9G.w. 000040
 0188E902 57892607 89261C5E C406571B 26044728 260A5EC4 06578826 04478826 &.G.&.W.á^.&+G.&.W.á^.&..&.W.Ö.. 000060
 5739261A 56881846 885F7208 47392606 7F677C0A 57392616 56881446 88065EC4 á^..F..V.&9W.|g..&9G.r_.F..V.&9W 000080
 5EC43873 04473926 067C407F 06573926 12568810 46884C77 07392605 7C537F02 ..S|.&9.wL.F..V.&9W..@].&9G.s8á^ 0000A0
 5788260C 4788261D 720C4739 26067F25 7C0E5739 26065EC4 02578826 0788261C .&..&.W.á^.&9W.|%..&9G.r.&.G.&.W 0000C0
 88144688 065EC401 12E90257 89260789 261C5EC4 06571326 04470326 0A5EC40E .á^.&.G.&.W.á^.&..&.W.Ö..á^..F.. 0000E0
 3926067C 517F0657 39261A56 88184688 50720C47 3926067F 657C0E57 39261656 V.&9W.|e..&9G.r).F..V.&9W..Q|.&9 000100
 88260788 261C5EC4 35760847 3926067F 307C0A57 39261256 88104688 49770447 G.wI.F..V.&9W.|=..&9G.v5á^.&..&. 000120
 26072826 0A5EC402 57882607 88261877 07392605 7C227F02 57392606 5EC40257 W.á^.&9W.."|.&9.w.&..&.W.á^.&+.& 000140
 7F667C0E 57392616 56881446 88065EC4 0098E902 57892607 89261C5E C402571B .W.á^.&..&.W.Ö..á^..F..V.&9W.|f. 000160
 56881046 884A7704 47392606 7C527F06 5739261A 56881846 885E720C 47392606 .&9G.r^.F..V.&9W..R|.&9G.wJ.F..V 000180
 7C0A5739 26065EC4 02578826 0788261C 5EC43773 07392605 7C3E7F02 57392612 .&9W..>|.&9.s7á^.&..&.W.á^.&9W.| 0001A0
 89261C5E C4025713 26070326 0A5EC40A 57882608 4788261C 72084739 26067F24 $..&9G.r.&.G.&.W.á^.&..&.W.á^.&. 0001C0
 6FE90375 00043DFE 0EE90375 00023DFE 8FE90375 00013D22 E824E802 57892607 .&.W.$$$"=..u.Ö.±=..u.Ö.±=..u.Öo 0001E0

Dump of file SATURN:[PCCOMMON.DUMP.DLL]BRD.TMP;1 on 18-APR-1990 10:36:59.83
File ID (519,15,0)   End of file block 272 / Allocated 272

Virtual block number 162 (000000A2), 512 (0200) bytes

 08064688 D88E1EAD 881E0000 0CC8C8C9 1F00E8C0 2800E8FE F0E90375 000830FF .=..u.ÖÞ±S.+åS..èùà....¡Ù..Ä.F.. 000000
 89005E05 18578826 16478826 0A5EC400 FFE9C028 05751E46 081C4688 08740846 F.t..F..F.u.+äÖ..á^.&.G.&.W..^.. 000020
 9A5016FC 46800676 FF0876FF 211209C2 9A006A00 6A0676FF 0876FFFA 5689F846 F%.V*.v..v.j.j..ô..!.v..v..F=.P. 000040
 1A76FF1C 76FF1E76 FFF65689 F44689FE 5688FC46 8800C1E9 0374C008 1E460A58 X.F..ât.Ôé..F=.V±.F¶.V-.v..v..v. 000060
 264477FF 26F45EC4 F876FFFA 76FF0E76 FF1076FF 1276FF14 76FF1676 FF1876FF .v..v..v..v..v..v*.v%á^¶&.wD& 000080
 74C00808 C483E3F6 E80EFC76 FFFE76FF 0A76FF0C 76FF1AC4 83FCCFE8 0E4277FF .w8.Òü=.á..v..v..v±.v=.Ò-Ð.á..ât 0000A0
 FF0C76FF 0E76FF10 76FF1276 FF1476FF 1676FF18 76FF1A76 FF1C76FF 1E76FF35 5.v..v..v..v..v..v..v..v..v..v.. 0000C0
 FF1A76FF 1C76FF1E 76FF33E8 1AC483FF 21E80E3E 77FF2640 77FF26F4 5EC ^A76 v.á^¶&.wa&.w>.Ò!..á.$3.v..v..v.. 0000E0
 001605F6 5688F446 88F876FF FA76FF0E 76FF1076 FF1276FF 1476FF16 76FF '76 v..v..v..v..v..v*.v%.F¶.V-... 000100
 06468808 8E20C888 1E000018 C8C8C91F 00E8C028 FF28E91A C483FCD1 E80E5L52 RP.Ò!=.á.Ö(.+åS..èùà....¡à .Ä.F. 000120
 18468808 75020A7E 83067401 0A7E830C 74080A7E 83127404 0A7E8320 74084608 .F.t .~..t..~..t..~..t..~..u..F. 000140
 80F38802 57892607 89260E56 880C4688 185EC410 741A4608 1846881E 751A4608 .F.u..F..F.t.á^..F..V.&..&.W.¡µ. 000160
 5689E846 89125688 10468824 76104639 057F287C 12563916 56881446 880107E9 Ö...F..V.9V.|+..9F.v$.F..V..FÖ.V 000180
 83067402 0A7E8316 56891446 89EA5688 E8468812 56891046 89165688 144688EA ô.F..V..F..V..FÖ.Vô.F..V..~..t.. 0001A0
 26078926 185EC4FE 5689FC46 89C0008A 00018806 E83FFFBA FFFFB808 75080A7E ~..u.¡..¤.?S.¡..¤.á.F=.V±á^.&..& 0001C0
 5689EC46 89025788 26078826 F65689F4 46891857 88261647 8826065E C4025789 .W.á^.&.G.&.W..F¶.V-&..&.W..F$.V 0001E0
```

Dump of file SATURN:[PCCOMMON.DUMP.DLL]BRD.TMP;1 on 18-APR-1990 10:36:59.83
File ID (519,15,0) End of file block 272 / Allocated 272

Virtual block number 163 (000000A3), 512 (0200) bytes

```
263E4788 26F85EC4 08EB0A57 88260847 8826F45E C40075C2 08FA5689 F84689EE Y.F%.V*.ôu.é^¶&.G.&.W.Š.é^½&.G>& 000000
76FF0E76 FF1076FF 1276FF14 76FF1676 FF1876FF 1A76FFF2 5689F046 89405788 .W@.Fb.V·.v..v..v..v..v..v..v..v 000020
75073926 FE568PFC 4688185E C41AC483 F0C2E80E 50520676 FF0876FF 0A76FF0C ..v..v..v.RP.Ðô».é.é^..F•.V±&9.u 000040
5EC408E8 000007C7 261C5EC4 02578926 0789260E 56880C46 88177502 5739261D .&9W.u..F..V.&..&.W.é^.&ú...Š.é^ 000060
01AC0004 19980203 00000009 1E680002 000690C8 C91F00E8 C0280001 07C7261C .&ú...+åŠ..èù.....k..........¯. 000080
00500004 04F10203 00000019 21E90002 00000017 008A0002 00000014 21020002 ...!..............Ô!......þ...P. 0000A0
4688020F E98DF388 06750846 08064688 00008A46 C7D88EFF FF881E56 000052C8 åR..V.¡...ÁúFα...F..F.u.¡µ.Ö...F 0000C0
8826C25E C4C45689 C2468904 57882602 47882682 5EC48456 89824689 08568806 ..V..Fý.VÇé^ÿ&.G.&.W..Fö.Vöé^ö&. 0000E0
46890857 88260647 8826825E C48E5689 8C468904 57882602 478826C0 46890647 G..Fé&.G.&.W..F¥.V/é^ÿ&.G.&.W..F 000100
805688AE 46880227 30009A50 16AE468D C076FFF2 568CF046 89C8468D FE5689FC •.V±.Fà.Fþ.V·.vâ.FÚ.P...'..FÚ.V¯ 000120
88E05689 DE4689C4 5688C246 88D04689 D24689C0 28000004 46C7CE56 89CC4689 .Fä.VòúFå..+â.F®.FÅ.Fó.Vé.F8.VÅ. 000140
FC4688EA 5689E846 89085688 064688E6 4689C046 88E45689 E246898E 56888C46 F¥.V/.Fä.Vô.Fé.Fl.F..V..FÒ.Vö.F= 000160
C402E6C1 C676882A 7F01C67E 83C646FF 03E80000 C646C7EE 5689EC46 89FE5688 .V±.Fé.VŸúFó..Š..Fó.~ó..*.vóèl.é 000180
5289F442 89085788 26064788 26865EC4 88568986 46890C50 88260A40 8826825E ^ÿ&.a.&.P..FÑ.V¡é^Ñ&.G.&.W..B¶.R 0001A0
FF0EC483 FFFF15A5 9AF476FF F676FFF8 76FFFA76 FFF076FF F276FF00 6ACDE8F6 -Šej..v·.vþ.v*.v½.v~.v¶.É....é.. 0001C0
6A000FE9 037C0064 30BA46FF 8A468800 008A46C7 04C4832E FFE80E82 76FFB476 vÇ.vý.Ò...é.úFα...Fα.Fα=d.|.ÒÒ.j 0001E0
```

Dump of file SATURN:[PCCOMMON.DUMP.DLL]BRD.TMP;1 on 18-APR-1990 10:36:59.83
File ID (519,15,0) End of file block 272 / Allocated 272

Virtual block number 164 (000000A4), 512 (0200) bytes

```
8AE90374 C00810C4 830384E8 0E8C76FF 8E76FFFC 76FFFE76 FF006A00 6A006A00 .j.j.j..v±.v•.v/.v¥.ÒÇ..é..ât.Òα 000000
0374C008 10C48305 14E80E8C 76FF8E76 FFFC76FF FE76FF00 6A006A00 6A006A00 .j.j.j.j..v±.v•.v/.v¥.Ò...é..ât. 000020
C00810C4 830887E8 0E8C76FF 8E76FFFC 76FFFE76 FF006A00 6A006A00 6A0098E9 Ö..j.j.j.j..v±.v•.v/.v¥.Ò...é..â 000040
75C00810 C4830C35 E80E8C76 FF8E76FF FC76FFFE 76FF006A 006A006A 006A7975 uyj.j.j.j..v±.v•.v/.v¥.Ò5..é..âu 000060
FFF276FF 006A4175 C0080AC4 832107E8 0EFC76FF FE76FFF0 76FFF276 FF016A5A Zj..v·.vþ.v±.v•.Ò.!.é..âuAj..v·. 000080
0EC276FF C476FFFC 76FFFE76 FF2875C0 080AC483 20EEE80E FC76FFFE 76FFF076 vþ.v±.v•.ÒŸ .é..âu(.v±.v•.vé.vó. 0000A0
76FFFF13 E90374C0 0804C483 2338E80E FC76FFFE 76FF1175 C00808C4 830F6AE8 Òj..é..âu..v±.v•.Ò8#.é..ât.Ö...v 0000C0
880088E00 07881E56 57000086 C80004CA C95E1F00 E8C028FF FF00689A AE76FF80 ¯.vÙ.h...+âŠ..^èò..à...WV.¡...Ä. 0000E0
5EC49C56 899A4689 04578826 02478826 065EC402 03E98DF3 88067508 46080646 F..F.u.¡µ.Ö..é^.&.G.&.W..F..V.é^ 000100
46FF03E8 00009E46 C7A25689 A0468900 0A050856 88064688 98468906 4788269A .&.G..F..F..V.....F..VÅúF...Š..F 000120
8E5EC490 56898E46 89025088 26008826 A05EC402 E6C19E76 88487F01 9E7E839E ..-...K.v.êl.é^.&..&.P..F..V.é^. 000140
9E76FF00 6A006A06 77FF2608 77FF2606 5EC4E652 89E44289 08578826 06478826 &.G.&.W..Bö.Rlé^.&.w.&.w.j.j..v. 000160
888A5EC4 8C568C8A 4689FF7A 868DACE8 0000FFFF 9A501600 438003E7 C19E7E88 .-.éÒ..CÅ.P.....Š¯..z..F..V.é^.. 000180
E80000E2 46C71FA5 A5A5A51F 161ED876 8D087F8D 1FA5A5A5 A51F161E D0768DF8 «.vÅ...EEEE.....vÅ...EEEÉ.úFä..Š 0001A0
FF8C76FF 96568994 4689E652 88E44288 02E6C1E2 76883F7D 02E27E83 E246FF03 ..Fä.~ä.)7.vâèl..Bö.Rl.F..V..v.. 0001C0
7E01927E 830000FF FF9A5016 F8468D50 16F0468D 50169246 80505200 16058A76 v....RP.F..P.Fþ.P.F½.P......-..- 0001E0
```

Dump of file SATURN:[PCCOMMON.DUMP.DLL]BRD.TMP;1 on 18-APR-1990 10:_\:59.83
File ID (519,15,0) End of file block 272 / Allocated 272

Virtual block number 165 (000000A5), 512 (0200) bytes

```
7800009A 50520004 05028C98 76FFCE56 8CCC4689 A4468D88 E80109E9 00018806 .¡..Ö..Š¡.FÊ.Fä.Vö.v..@...RP...x 000000
899C5688 9A468800 008046C7 03FC0000 9A505200 0805CE56 88CC4688 9876FF00 ..v..Fä.Vö...RP...•.úF¯...F..V.. 000020
4689C028 C2468998 4688C056 898E4689 04578826 02478826 9A5EC48C 56898A46 Fα.V¥é^.&.G.&.W..F/.Vè.F..Fó+é.F 000040
A59AE476 FFE676FF E876FFEA 76FFCC76 FFCE76FF 016AC846 89CA4689 C44689C6 ó.Fé.Fò.Fàj..vó.vä.võ.vÒ.vl.võ.E 000060
77FF260A 77FF26CC 5EC42A7F 019E7E83 9E46FF03 E800009E 46C70EC4 83041415 ....é.úF...Š..F..-...*é^ä&.w.&.w 000080
CDE80439 02909A30 FF260270 FF26A076 C402E3C1 9E5E8800 6A016A00 6A006A08 .j.j.j.j..^.èD.év.&.p.&.0...9.Šë 0000A0
74EE4608 EC46880C C483011A 19C89ACC 76FFCE76 FF8A76FF 8C76FF50 16EC468D .Fé.P.v..v..vö.vä.à.....é..Fé.FŸt 0000C0
FF26CC5E C4044900 689A0477 FF260677 FF26CC5E C4E04689 C02802E8 00018805 .¡..Š.+à.FÁé^a&.w.&.w..h.I.é^ä&. 0000E0
C7D88E02 38881E00 000AC8C8 C95F5E1F 00E8E046 88035F00 689A0877 FF260A77 w.&.w..h._..FÅŠ..^_èùà....¡;..Äú 000100
5FC42606 5EC4008E E98DF388 06750C46 080A4688 08740846 08064688 0000F646 F-...F..F.t..F..F.ú.¡µ.Ö..é^.&é_ 000120
FE5689FC 46890857 88260647 8826065E C4FA5689 F8468904 57882602 47882602 .&.G.&.W..F½.V*é^.&.G.&.W..F•.V± 000140
0EF876FF FA76FFFC 76FFFE76 FF006A00 6A006A00 6A597D00 6430F646 FFF64688 .F-.F-=d.)Yj.j.j.j..v±.v=.v*.v½. 000160
E80EF876 FFFA76FF FC76FFFE 76FF006A 006A006A 006A3875 C00810C4 830048E8 ÒH..é..âu8j.j.j.j..v±.v=.v*.v½.Ò 000180
C0080AC4 832927E8 0EFC76FF FE76FF0A 76FF0C76 FF016A19 75C00810 C48301A8 ¨..é..âu.j..v..v..v±.v•.Ò').é..ä 0001A0
88087408 46080646 88D88E04 58881E56 57000028 C8C8C91F 00E8C028 9CE80274 t.Š.+âŠ..èùà(..WV.¡[..Ä.F..F.t.. 0001C0
FA7E8300 00FFFF9A 5016F846 800A76FF 0C76FF01 58E98DF3 8806750C 46080A46 F..F.u.¡µ.Ö[..v..v..F½.P......-• 0001E0
```

Dump of file SATURN:[PCCOMMON.DUMP.DLL]BRD.TMP;1 on 18-APR-1990 10:36:59.83
File ID (519,15,0) End of file block 272 / Allocated 272

Virtual block number 166 (000000A6), 512 (0200) bytes

8CE84689 E0468DF6 568CF446 89EC468D 0138E9C0 2B057303 F87E8306 7C0D7F00 ...|..-½.s.+éÖ8..Fâ.F¶.V-.FÅ.FÒ. 000000
C40000FE 46C70001 FC46C700 0002CC9A 5016006A 006A006A 0A76FF0C 76FFEA56 Vö.v..v.j.j.j..P.ä...úF=..úF±..é 000020
FF9A016A 006A0A76 FF0C76FF 1FA5A5A5 A5DA8E1E F08BF88B EA5688E8 4688F45E ^¶.FÒ.Vö.«.Þ..ÕEEEE..v..v.j.j... 000040
A5A5A5DA 8E1EF088 FB88EA56 88E84688 F45EC400 FE568301 FC46831D E80000FF ...Š..F=..V±.é^¶.FÒ.Vö.«.Þ..ÕEEE 000060
078826E8 5EC400AA E90374C0 080000FF FF9AE876 FFEA76FF 0A76FF0C 76FF1FA5 È..v..v..vö.vÒ......ât.Õ¯.é^Ò&.. 000080
F45EC406 57882604 478826E8 5EC41A75 02573926 20750739 26F45EC4 02578826 &.W.é^¶&9.u &9W.u.é^Ò&.G.&.W.é^¶ 0000A0
380075FC 4638000A 8300012D FA5688F8 468897E8 02740657 39260675 04473926 &9G.u.&9W.t.Š..F½.V°-...Ö.;F=u.; 0000C0
A51F161E 0716EC76 80087E80 35741046 080E4688 00FE5E83 01FC6E83 0875FE56 V±u..n=..^±..F..F.t5.-Ä.vâ.....È 0000E0
0876FF0A 76FF0C76 FF016AFC 76FFFE76 FF501608 46801276 FF1476FF 1FA5A5A5 EEE..v..v..FÅ.P.v±.v=j..v..v..v. 000100
E8000188 0000FFFF 9A006AFC 76FFFE76 FF0A76FF 0C76FF16 C4830E5E FF06‚.¯F .v..^..é..v..v..v±.v=j......|..Š 000120
74084608 06468808 8E051388 1E565700 0030C8C8 C95F5E1F 00E8C028 FF21E9C˜ .Õl.+âŠ..^ èùàO..WV.¡...Ä.F..F.t 000140
7E830000 05399A50 16F8468D 0A76FF0C 76FF014C E9C02805 750C4608 0A4688O.. ..F..F.u.+ãÖL..v..v..F½.P.9....- 000160
E0468D00 6A006A00 6A0A76FF 0C76FF01 29E9C028 057303F8 7E83067C 0D7F00FA •...|..-½.s.+âÖ)..v..v.j.j.j..FÅ 000180
FC46C700 0005719A 5016E846 8D006A01 6A006A0A 76FF0C76 FF000006 F99A5016 .P.•....v..v.j.j.j..FÒ.P.q...úF= 0001A0
00FE5683 01FC4683 08E80000 059F9A02 6A006A0A 76FF0C76 FF0000FE 46C70002 ..úF±...v..v.j.j......Š..F=..V±. 0001C0
16F0468D 50160846 80008FE9 0374C008 000005CF 9A5016F0 468D0A76 FF0C76FF .v..v..FÞ.P.ü....ât.Õ«..FÅ.P.FÞ. 0001E0

Dump of file SATURN:[PCCOMMON.DUMP.DLL]BRD.TMP;1 on 18-APR-1990 10:36:59.83
File ID (519,15,0) End of file block 272 / Allocated 272

Virtual block number 167 (000000A7), 512 (0200) bytes 6702569A 283A1E80 C0E80274 C00810C4 830080E8 0E5016E0 46805016 E8468050 P.FÒ.P.FÅ.P.Õ¯..é..ât.Šâ..:(.V.g 000000
0716E876 80D07E80 30741046 080E4688 6576FFFF 06069A07 6C02329A D85E8D07 ..^Ä.2.l..ø...ve.F..F.t=.-Å.vÒ.. 000020
52000A83 00012DFE 5688FC46 88501600 46801276 FF1476FF 1FA5A5A5 A51F161E ...EEEE..v..v..FÅ.P.F=.V±-...Ö.R 000040
5688FC46 880A76FF 0C76FF16 C4830E5E FF0676FF 0876FF0A 76FF0C76 FF016A50 Pj..v..v..v..v..^..é..v..v..F=.V 000060
1F161E07 16E8768D E07E8D25 E8000188 00000678 9A006A50 52000A83 00012DFE ±-...Ö.RPj..x...¡..Š%.-Å.vÒ..... 000080
C8C8C95F 5E1F00EB C028FF22 E91FA5A5 A5A51F16 1EF0768D E87E8D1F A5A5A5A5 EEEE..-Ò.vÞ...EEEE.Õ".+âŠ..^_èùà 0000A0
1046080E 46881074 0C46080A 46881874 08460806 4688088E 0695881E 56000044 D..V.¡...Ä.F..F.t..F..F.t..F¯..F. 0000C0
07392606 5EC40257 88260788 260A5EC4 01EEE98D F3880675 14460812 46880874 t..F..F.u.¡µ.ÕŸ.é^.&..&.W.é^.&9. 0000E0
06573926 06750447 3926065E C4065788 26044788 260A5EC4 1A750257 39262075 u &9W.u.é^.&.G.&.W.é^.&9G.u.&9W. 000100
4788260E 5EC42075 02573926 26750739 260A5EC4 02578826 0788260E 5EC43274 t2é^.&..&.W.é^.&9.u&&9W.u é^.&.G 000120
07882606 5EC40184 E98DF388 06750657 39260C75 04473926 0A5EC406 57882604 .&.W.é^.&9G.u.&9W.u.¡µ.Õ..é^.&.. 000140
9AE85E8D 08C2028F 9A8C5E8D 8C46898E 56890257 18260728 260A5EC4 02578826 &.W.é^.&+.&.W..Vƒ.F¥.^¥.«.õ..^Ò. 000160
8C46898E 56890657 18260447 28260A5E C4065788 26044788 26065EC4 08E603EF ÿ.Ì.é^.&.G.&.W.é^.&+G.&.W..Vƒ.F¥ 000180
0728260A 5EC40257 88260788 260E5EC4 091003EF 9AD05E8D 08EE028F 9A8C5E8D .^¥.«.Ÿ..^Å.ÿ...é^.&..&.W.é^.&+. 0001A0
4788260E 5EC4093C 03EF9AD8 5E800918 028F9A8C 5E808C46 898E5689 02571826 &.W..Vƒ.F¥.^¥.«....^Å.ÿ.<.é^.&.G 0001C0
5E8D0944 028F9A8C 5E808C46 898E5689 06571826 04472826 0A5EC406 57882604 .&.W.é^.&+G.&.W..Vƒ.F¥.^¥.«.D..^ 0001E0

Dump of file SATURN:[PCCOMMON.DUMP.DLL]BRD.TMP;1 on 18-APR-1990 10:36:59.83
File ID (519,15,0) End of file block 272 / Allocated 272

Virtual block number 168 (000000A8), 512 (0200) bytes

5E8D0964 02329AD0 5E80095C 06429AD8 5E8D0954 02329AE8 5E8D094C 03EF9AC0 å.ÿ.L..^Ò.2.T..^Ä.8.\..^Å.2.d..^ 000000
429AE85E 80098102 329AE85E 80097903 EF9AF85E 80097106 D19A0969 06429AC0 å.8.ì..ì.q..^½.ÿ.y..^Ò.2....^Ò.8 000020
09A603EF 9AE05E80 099E06D1 9A099606 429AD05E 80099102 329AD05E 80098906 ....^Å.2....^Å.8....ì....^Å.ÿ.Ì. 000040
09C30642 9AC05E80 098E0232 9AC05E80 09860642 9AD85E8D 09AE0232 9AD85E80 .^Ä.2.Û..^Ä.8.Ñ..^â.2.ƒ..^â.8.û. 000060
5E8D09E4 02329AE0 5E80090C 02569A28 421E8D09 D403EF9A C85E8D09 C806D19A .Ì.û..^â.ÿ.å...B(.V.É..^Å.2.ð..^ 000080
02329AF8 5E8D24E8 80F78805 750A0006 069A09F1 03D79AF0 5E8D09EC 06429AC8 å.8.$..^Þ.ø.þ..ø...u.¡%.$$.^½.2. 0000A0
5E1F00E8 C028075F 03F79A12 5EC40A18 065A9AF0 5E8D0A10 06429AF8 5E8D0A08 ...^½.8....^Þ.Z...é^..%._+âŠ..^ 0000C0
F3880675 0C46080A 46880874 08460806 4688088E 0806881E 56570000 1CC8C8C9 èùà...WV.¡...Ä.F..F.t..F¯..F.u.¡µ 0000E0
03F67E83 067C0D7F 00F87E83 0000068A 9A5016F6 46800A76 FF0C76FF 018EE980 .Õƒ..v..v..F-.P.¤....-½...|..-¯. 000100
FC46C700 0006E39A 5016EE46 80006A00 6A006A0A 76FF0C76 FF019BE9 C0280573 ±.+âÖ...v..v.j.j.j..FŸ.P.D...úF= 000120
6A006A0A 76FF0C76 FF1FA5A5 A5A51F16 1E0716EE 768DE67E 800000FE 46C70001 ..úF±...-Ì.vŸ.....EEEE..v..v.j.j 000140
1FA5A5A5 A51F161E 0716EE76 8DE67E80 00FE5683 01FC4683 18E80000 07129A01 ......Š..F=..V±..-Ì.vŸ.....EEEE. 000160
FE7E8306 7501FC7E 830127E9 0374C008 0000072C 9A5016EE 46800A76 FF0C76FF .v..v..FŸ.P.,....ât.Õ'..-«.u..-± 000180
56380575 FC463800 0A830001 2DF8568B F6468BFA 4689C028 02E80001 B8057400 .t.¡..Š.+â.F•.F-.V½-...Ö.;F=u.;V 0001A0
8300E8E8 0E5016E6 46805016 EE468DFA 76FF50E4 4689C028 02E80001 B80574FE ±t.¡..Š.+â.FÕP.v•.FŸ.P.F¦.P.ÕÒ.. 0001C0
000120FE 5688FC46 880A76FF 0C76FF38 75104608 0E4688FF 7FE90375 C0080CC4 é..âu.Õ...F..F.u;.v..v..F=.V±-.. 0001E0

Dump of file SATURN:[PCCOMMON.DUMP.DLL]BRD.TMP;1 on 18-APR-1990 10:36:59.83
File ID (519,15,0) End of file block 272 / Allocated 272

Virtual block number 169 (000000A9), 512 (0200) bytes

```
 8D006AFC 76FFFE76 FF0A76FF 0C76FF00 000B659A 5016E646 8D006A50 52000A83 .Ö.RPj..Fl.P.e....v..v..v±.v▪j.. 000000
 00012DFE 568BFC46 8B5016E6 468D1276 FF1476FF 008AE900 000B859A 5016EE46 FŸ.P.ç...Ö...v..v..Fl.P.F▪.V±-.. 000020
 8B0A76FF 0C76FF16 C4830E5E FF0676FF 0876FF0A 76FF0C76 FF026A50 52000A83 .Ö.RPj..v..v..v..v..^..á..v..v.. 000040
 8D1276FF 1476FF30 00FFFF9A 5016E646 8D006A50 52000A83 00012DFE 568BFC46 F▪.V±-...Ö.RPj..Fl.P......v..v.. 000060
 76FF16C4 830E5EFF 0676FF08 76FF0A76 FF0C76FF 026AFC76 FFFE76FF 5016EE46 FŸ.P.v±.v▪j..v..v..v..v..^..á..v 000080
 C02BFEAA E907EB00 01B80000 084D9A50 16EE468D 006AFC76 FFFE76FF 0A76FF0C ..v..v±.v▪j..FŸ.P.M...¡..Š.Õ˘±+â 0000A0
 00040SFE 5689FC46 89085688 0646880B 8E0A2A88 1E000010 C8CBC95F 5E1F00EB Š..^_èùà....¡°..Ä.F..V..F▪.V±... 0000C0
 76FF1076 FFF25689 F0468900 0405FA56 89F84689 0C568B0A 468BF656 89F44689 .F¶.V̄-.F..V..F½.V°....FÞ.V·.v..v 0000E0
 76FF2975 C00B14C4 83003CE8 0EFC76FF FE76FFF4 76FFF676 FFF876FF 5250520E .RPR.v½.v-.v¶.v±.v▪.Ö<..á..âu).v 000100
 0013E80E F476FFF6 76FFFC76 FFFE76FF F076FFF2 76FFF876 FFFA76FF 0E76FF10 ..v..v°.v½.v·.vÞ.v±.v▪.v-.v¶.Ö.. 000120
 0E5EC4D8 8E0C00B8 1E00000C C8CBC91F 00E8C028 02E80001 B80574C0 0B14C483 .á..ât.¡..Š.+âŠ..èùà....¡...Áá^. 000140
 578B2607 8826125E C4FE5689 FC468902 57182607 2B26065E C4025788 26078826 &..&.W.á^.&+.&.W..F▪.V±á^.&..&.W 000160
 00167E83 010CE903 75FE4608 FC4688FA 5689F846 89025718 26072B26 0A5EC402 .á^.&+.&.W..F½.V°.F▪.F±u.Ö...-.. 000180
 06EBDAF7 00028308 F7FA5688 F846880F 7D00FA7E 8300FDE9 03750018 7E830975 u..-..u.Ö»..-°.)..F½.V°¼Á.●.¼ÖŠ. 0001A0
 EBDAF700 D283D8F7 FE5688FC 46880F7D 00FE7E83 F65689F4 4689FA56 88F84688 .F½.V°.F¶.V-.-±.)..F▪.V±¼Á.●.¼ÖŠ 0001C0
 037EF656 3B02D1E0 D10313C1 03020 1E0 D10201E0 D1DA88C8 88FE5688 FC468806 ..F▪.V±.à.ÖlÁi●lÁl●.è.£lÁl●;V--. 0001E0
```

Dump of file SATURN:[PCCOMMON.DUMP.DLL]BRD.TMP;1 on 18-APR-1990 10:36:59.83
File ID (519,15,0) End of file block 272 / Allocated 272

Virtual block number 170 (000000AA), 512 (0200) bytes

```
 207F0257 3926065E C4025788 26078826 0E5EC400 9BE90372 F4463B08 7C00A5E9 ÕE.|.;F¶r.Ö..á^.&..&.W.á^.&9W..  000000
 63EB0257 89260789 260E5EC4 02578826 07882613 7400187E 83197307 3926057C |.&9.s..-..t.&..&.W.á^.&..&.W.Šc 000020
 13740016 7E831973 07392605 7C207F02 5739260E 5EC40257 88260788 26065EC4 á^.&..&.W.á^.&9W.. |.&9.s..-..t. 000040
 26078826 065EC416 7400187E 8330EB02 57892607 8926065E C4025788 26078826 &..&.W.á^.&..&.W.Š0.-..t.á^.&..& 000060
 26078926 065EC402 57882607 88260E5E C414EB02 57892607 89260E5E C4025788 .W.á^.&..&.W.Š.á^.&..&.W.á^.&..& 000080
 76FF0C76 FFD88E0C 99881E56 5700005E C8CBC91F 00E8C028 04E80001 88025789 .W.¡..Š.+âŠ..èùà^..WV.¡...Á.v..v 0000A0
 76FF0193 E9C02805 7304D07E 83067C0D 7F00027E 8300000A 509A5016 0046800A ..FÁ.P.P....-●...|..-Á.s.+âÖ...v 0000C0
 08EB0000 D646C700 01D446C7 00000E7A 9A501680 4680006A 006A006A 0A76FF0C ..v.j.j.j..F¯.P.z...úFá..úf●..Š. 0000E0
 463B087F 0151E903 70D6563B 000A8300 02200256 88D04688 00065683 01044683 .Fá..V●..FÁ.V●-...Ö.;V●).ÖQ...;F 000100
 46800000 0E8C9A50 16884680 006AD476 FFD676FF 0A76FF0C 76FF0147 E90377D4 âw.ÖG..v..v..v●.vâj..F¡.P.V....F 000120
 1FA5A5A5 A51F161E B8768DF8 88F0468D 1FA5A5A5 A51F161E 07168076 8DF888E8 Ö.½.v¯.....ÉÉÉÉ..FÞ.½.v¡...ÉÉÉÉ. 000140
 00000F08 9A5016C0 4680006A 50520002 83000105 D6568804 46880A76 FF0C76FF .v..v..FÁ.V●....●.RPj..Fá.P..... 000160
 88D04688 00AE5683 01AC4683 08EBAE56 89AC4689 00028300 0205D656 88D4468B .Fá.V●....●..F¯.VÙŠ..F¯..VÙ..FÁ. 000180
 AC76FFAE 76FF0A76 FF0C76FF 00A6E903 72AC4639 087C00B0 E9037EAE 56390256 V●9VÙ-.Ö¯.|.9F¯r.Öl..v..v..vÙ.v¯ 0001A0
 468D1FA5 A5A5A51F 161E0716 C0768DF8 88D8468D 00000A79 9A5016C8 4680006A j..Fà.P.y....FA.½.vâ.....ÉÉÉÉ..F 0001C0
 A2468050 16AA4680 50160846 8D5016E8 468D1FA5 A5A5A51F 161EC876 8DF888E0 Á.½.và...ÉÉÉÉ..FÖ.P.FÁ.P.F˙.P.FÁ 0001E0
```

Dump of file SATURN:[PCCOMMON.DUMP.DLL]BRD.TMP;1 on 18-APR-1990 10:36:59.83
File ID (519,15,0) End of file block 272 / Allocated 272

Virtual block number 171 (000000AB), 512 (0200) bytes

```
 468D0E76 FF1076FF 1276FF14 76FF357E 00AA7E83 0000FFFF 9A5016F8 468D5016 .P.F½.P......-˙.-5.v..v..v..v..F 000000
 830037E8 0E0676FF 0876FF0A 76FF0C76 FFD476FF D676FFAC 76FFAE76 FF5016A2 Á.P.vÙ.v¯.v●.vâ.v..v..v..v..Ö7.. 000020
 B8768DB0 7E8DFF3A E91FA5A5 A5A51F16 1E0716C8 768DC07E 8D2AEB00 01B81CC4 á.¡..Š°.-â.và.....ÉÉÉÉ.Ö:..-¯.v¡ 000040
 0DF7B81E 56570000 24C8CBC9 5F5E1F00 EBC028FE 93E91FA5 A5A5A51F 161E0716 .....ÉÉÉÉ.Ö.±+âŠ..^_èùà$..WV.¡½. 000060
 0A76FF0C 76FF0000 0E309A50 16F2468D 006A0E76 FF1076FF 0A76FF0C 76FFD88E .Ä.v..v..v..v.j..F·¯P.0....v..v. 000080
 10750739 26F45688 F2468816 5EC40000 108F9A50 16E8468D 006A1276 FF1476FF .v..v.j..FÖ.P.€...á^..F·.V¶&9.u. 0000A0
 89C02802 EB00018B 05750657 3926087S 04473926 F85688F6 46881775 02573926 &9W.u..F-.V½&9G.u.&9W.u.¡..Š.+â. 0000C0
 26087504 473926EE 5688EC46 88177502 5739261D 75073926 EA5688E8 4688FA46 F°.FÖ.Vö&9.u.&9W.u..F&.VŸ&9G.u.& 0000E0
 460399C0 2803EB99 1001B806 7400FA7E 83F04689 C02802E8 0001B805 75065739 9W.u.¡..Š.+â.FÞ.-°.t.¡...Š.+â..F 000100
 2B145E8B 124E8B99 L001B804 EB99C028 057400F0 7E83FE56 89FC4689 1056130E ..V..F▪.V±.-Þ.t.+â.Š.¡....N..^.+ 000120
 463B057F 617CFE56 3B00E65E 8301E46E 83E6568B E4468BE6 5E89E44E 890A18C8 à.Ö.NÖ.^l.FÖ.Vl.nÖ..^l.;V±|a..;F 000140
 D69A5016 0C468D00 6AFC76FF FE76FF0A 76FF0C76 FF3D741C 46081A46 885A72FC ▪rZ.F..F.t=.v..v..v±.v▪j..FÉ.P.● 000160
 FF0876FF 0A76FF0C 76FF016A FC76FFFE 76FF5016 DC468D1E 76FF2076 FF00000F ....v .v..FÉ.P.v±.v▪j..v..v..v.. 000180
 FA7E838C EB000007 CC9A006A FC76FFFE 76FF0A76 FF0C76FF 16C4831A 5EFF0676 v..^..á..v..v..v±.v▪j..ä...Š..-° 0001A0
 8E1E0716 F088DC7E 8D18568B 164688 3A 741C4608 1A468858 7500F07E 83617500 .ua.-Þ.u[.F..F.t:.F..V..-É.Þ.... 0001C0
 FF0A76FF 0C76FF00 6A0E76FF 1076FF50 16DC468D 1E76FF20 76FF1FA5 A5A5A5DA ÖÉÉÉÉ..v .v..FÉ.P.v..v.j..v..v.. 0001E0
```

```
Dump of file SATURN:[PCCOMMON.DUMP.DLL]BRD.TMP;1 on 18-APR-1990 10:36:59.83
File ID (519,15,0)   End of file block 272 / Allocated 272

Virtual block number 172 (000000AC), 512 (0200) bytes

 9A1676FF 1876FF00 6A0E76FF 1076FF0A 76FF0C76 FF16C483 1A5EFF06 76FF0876 v..v..^..á..v..v..v..v.j..v..v.. 000000
 08064688 0000FE46 C7D88E0F 8E881E00 001AC8C8 C95F5E1F 00E8C028 0000FFFF ....+áŠ..^_èùà....¡ƒ..ÀúF±...F.. 000020
 5689E646 89005E05 08568806 46880236 E98DF388 06750C46 080A4688 08740846 F.t..F..F.ũ.¡µ.Ô6..F..V..^..F|.V 000040
 007F00EC 7E830000 0E079A50 16EA468D 0A76FF0C 76FFFC56 8CFA4689 F24680E8 Ò.F·.F°.V=.v..v..Fõ.P......-å... 000060
 6A006A0A 76FF0C76 FF0000F0 46C70001 EE46C701 F8E9C028 057303EA 7E83067C |..~ô.s.+áÔ«.úFŸ..úFÞ...v..v.j.j 000080
 7DF0563B 000A8300 022DEC56 88EA4688 00F05683 01EE4683 08E80000 0AA29A01 ..Å...Š..FŸ..VÞ..Fõ.V§-...Ô.;VÞ) 0000A0
 0800000A CC9AFA76 FFFC76FF 0A76FF0C 76FF0185 E90373EE 4638087F 018FE903 .Ôe...;FŸs.Ôç..v..v..v=.v°.ë.... 0000C0
 08126701 309A37FF 260277FF 26FA5EC4 37FF2602 77FF26E6 5EC4019D E90374C0 àt.Ô..á^|&.w.&.7á^°&.w.&.7.0.g.. 0000E0
 0677FF26 FA5EC404 77FF2606 77FF26E6 5EC42D74 C008C028 02E80001 88057500 Àu.¡..Š.+à.ât-á^|&.w.&.w.á^°&.w. 000100
 FF26E65E C40145E9 0374C008 C02802E8 00018805 75000812 9201309A 0477FF26 &.w..0....Àu.¡..Š.+à.ât.ÕE.á^|&. 000120
 08C02802 E80001B8 05750008 128F0130 9A37FF26 0277FF26 FA5EC437 FF260277 w.&.7á^°&.w.&.7.0.¢..Àu.¡..Š.+à. 000140
 C702C39A FA5EC437 FF260277 FF26E65E C44DE802 57882607 8826FA5E C40C74C0 àt.á^°&..&.W.ŠMá^|&.w.&.7á^°.ù.ú 000160
 E403EF9A DC8808EC 8312DF06 999A284A 1E801205 06C79A12 CC02C39A E65EC412 .á^|.ù.ä..ú.{...J(...Ô..å..Ê.ÿ.ð 000180
 26FA5EC4 131F00FC 9A505212 FA04A69A 12F30256 9AD88808 C48312EE 078E9A12 ..ƒ.Ÿ..á..Ä.V.µ..|.°.RP.•...á^°& 0001A0
 4601309A 0477FF26 0677FF26 FA5EC404 77FF2606 77FF26E6 5EC40257 89260789 ..&.W.á^|&.w.&.w.á^°&.w.&.w..0.F 0001C0
 FA5EC454 E8065788 26044788 26FA5EC4 0074C008 C02802E8 00018805 75000813 ..Àu.¡..Š.+à.ât.á^°&.G.&.W.ŠTá^° 0001E0

Dump of file SATURN:[PCCOMMON.DUMP.DLL]BRD.TMP;1 on 18-APR-1990 10:36:59.83
File ID (519,15,0)   End of file block 272 / Allocated 272

Virtual block number 173 (000000AD), 512 (0200) bytes

 6906999A 284A1E8D 35F06C7 9A135602 C39A045F 8DE65EC4 135102C3 9A045F8D ._..ú.Q.á^|._..ú.V..ú._...J(...i 000000
 52138F04 A69A137D 02569A08 8808C483 1378078E 9A136E03 EF9ADC88 08EC8313 ..Š..Ê.ÿ.n..?.x..á..Ä.V.)..|...R 000020
 FF0C76FF 06578926 04478926 FA5EC408 8A00FC9A 0477FF26 0677FF26 E65EC450 Pá^|&.w.&.w..•.¤.á^°&.G.&.W..v.. 000040
 0001FE46 C7057500 FE7E8300 0008F29A FA76FFFC 76FF006A EE76FFFD 76FF0A76 v..vÞ.vŸj..v=.v°.·....-±.u.úF±.. 000060
 88187408 46080646 88088E11 73881E56 5700000A C8C8C91F 00E8FE46 88FE25E9 Ô%±.F±Š..èùà...WV.¡s..Ä.F..F.t.. 000080
 167E8301 F0E98DF3 8806751A 46081846 88087414 46081246 88107410 46080E46 F..F.t..F..F.t..F..F.u.¡µ.ÔÞ..-. 0000A0
 07770739 26057C0E 7F025739 260A5EC4 02578826 07882606 5EC40093 E9037500 .u.Ô..á^.&..&.W.á^.&9W...|.&9.w. 0000C0
 C7077708 47392606 7C0F7F0A 57392606 5EC40257 88260788 2670E800 04FE46C7 úF±..Šp&..&.W.á^.&9W...|.&9G.w.ú 0000E0
 C7077704 47392606 7C0F7F06 5739260A 5EC40657 88260447 882651E8 0008FE46 F±..ŠQ&.G.&.W.á^.&9W...|.&9G.w.ú 000100
 04473926 067F0F7C 06573926 0A5EC40E 5788260C 47882606 5EC431E8 0001FE46 F±..Š1á^.&.G.&.W.á^.&9W.|...&9G. 000120
 FF0676FF 0876FF68 E80156E9 80F18800 0807C726 185EC40E E80002FE 46C70772 r.úF±..Š.á^.&ú...¡þ.ÔV.Šk.v..v.. 000140
 80F18800 0807C726 185EC40E 7508FE7E 830000FF FF9A5016 FE468D0A 76FF0C76 v..v..F±.P......-±.u.á^.&ú...¡þ. 000160
 8826125E C4297402 FE7E832F 7401FE7E 83357408 FE7E8338 7404FE7E 83012AE9 Ô*..-±.t;.-±.t5.-±.t/.-±.t)á^.&. 000180
 0C25FE46 8806E800 0325FE46 88087502 5739260E 75073926 0E5EC402 57882607 .&.W.á^.&9.u.&9W.u..F±X..Š..F±X. 0001A0
 39260E5E C4065788 26044788 26125EC4 0086E907 8926185E C4FE4688 FE468900 ..F±.F±á^.&..Ô..á^.&.G.&.W.á^.&9 0001C0
 5EC40657 88260447 8826125E C47CE800 8CE9C028 05760447 3926067F 007C0657 W.|...&9G.v.+àÔŸ.Š|á^.&.G.&.W.á^ 0001E0

Dump of file SATURN:[PCCOMMON.DUMP.DLL]BRD.TMP;1 on 18-APR-1990 10:36:59.83
File ID (519,15,0)   End of file block 272 / Allocated 272

Virtual block number 174 (000000AE), 512 (0200) bytes

 02578826 07882612 5EC459E8 0099E9C0 28057304 47392606 7C007F06 5739260E .&9W...|.&9G.s.+àÔ..ŠYá^.&..&.W. 000000
 02578826 07882612 5EC439E8 79E8C028 04760739 26057F08 7C025739 260E5EC4 á^.&9W.|...&9.v.+àŠyŠ9á^.&..&.W. 000020
 03750002 30987400 013D19E8 59E8C028 04730739 26057C08 7F025739 260E5EC4 á^.&9W...|.&9.s.+àŠYŠ.=..t.=..u. 000040
 A50A8E1E 0716F088 F67E8D10 56880E46 8800E8A9 74000830 CE740004 30FF60E9 Ôm.=..tö=..t`Š..F..V..-—.Þ....ÔÊ 000060
 768DF888 125EC41F A5A5A5A5 0A8E1EF0 88F88814 56881246 880E5EC4 1FA5A5A5 ÊÊÊ.á^..F..V..«.Þ..ÔÊÊÊÊ.á^..«.v 000080
 4688D88E 1303881E 56570000 56C8C8C9 5F5E1F00 E8C0281F A5A5A5A5 1F161EF6 -...ÊÊÊÊ.+àŠ..^_èùàV..WV.¡Æ..Ä.F 0000A0
 C388C456 89C24689 005E0504 57882602 4788268E 5EC4C056 898E4689 08568806 ..V..Fƒ.Väá^/&.Ĝ.&.W..^..Fô.Vá.ù 0000C0
 7400127E 831FA5F2 0008890A 8E1E0716 F088E27E 8DFA5689 F8468900 1605C28C .ô....F%.V°.-ã.Þ....Ôƀ..·Ê..-..t 0000E0
 20065788 26044788 26825689 80468900 0A830001 20025788 26078826 C25EC44E Ná^ô&..&.W.-...Ô..F¯.Vÿ&.G.&.W.- 000100
 AC4688EC 5611EA46 01E45619 E2462982 56888046 88AE5689 AC468900 0A830001 ...Ô..F¯.VÙ.F¯.Vý)F&.VÔ.Fõ.V$.F¯ 000120
 568CCE46 89C6468D E0568CDE 46890246 80F05611 EE4601E8 5619E646 29AE5688 .VÙ)F|.VÒ.FŸ.VÞ.F0.F8.VÀ.Fó.Fö.V 000140
 84468926 56882446 88F646FF 0FE88656 89844689 22568820 46880000 F646C7D0 ÀúF-...F .V".FÇ.VÑŠ..F-.F$.V&.FÇ 000160
 5E880C56 890A4689 1056880E 460303E0 C1F64688 03C3E903 7C02F67E 83865689 .VÑ.--.|.Ôü..F-èÀ..F..V..FÖ.VÉ.^ 000180
 76FF006A 50520A76 FF0C76FF F45689F2 46890250 88260088 261476C4 02E3C1F6 -èD.áv.&..&.P..F·.V¶.v..v.RPj..v 0001A0
 FF006A50 52000283 000105F4 5688F246 880A76FF 0C76FF00 0017269A 0E76FFE0 À.vB.&....v..v..F·.V¶....0.RPj.. 0001C0
 CE76FFD0 76FF30FF 261876C4 E301F65E 8850168C 46800000 0FEE9ACE 76FFD076 vÀ.vö.Ÿ....F¥.P.^-ìDáv.&.0.vÀ.vö 0001E0
```

File ID (519,15,0)   End of file block 272 / Allocated 272

Virtual block number 175 (000000AF), 512 (0200) bytes

```
1876C4E3 01F65E88 16C483FC 76E80E50 16E2468D DA76FFDC 76FFDE76 FFE076FF .vÀ.v8.vÉ.vÖ.Fã.P.Òv=.á..^-1Dáv. 000000
5EC402C0 E91FA5A5 A5A5DABE 1EF088F8 880C5688 DA468884 5EC41874 00388326 &.8.t.á^Ç.FÖ.VÉ.«.Þ..ÖÉÉÉÉ.Öå.á^ 000020
88260788 26CE5E:4 1E740657 39260675 04473926 DE5EC406 57882604 47882 6CE ö&.G.&.W.á^8&9G.u.&9W.t.á^ö&..&. 000040
260A5EC4 000DE98C 46880105 E9037402 57392601 0EE90374 0739260E 5EC40257 W.á^8&9.t.Ö..&9W.t.Ö...FWÖI.á^Ö& 000060
0326C25E C40E5788 260C4788 26F85EC4 02578926 07892684 5EC40257 88260788 ..&.W.á^Ç&..&.W.á^½&.G.&.W.á^ö&. 000080
5EC40257 88260788 260A5EC4 00C4E906 57892604 47892684 5EC40657 13260447 G.&.W.á^Ç&.G.&.W.Öå.á^Ö&..&.W.á^ 0000A0
5EC40657 18260447 2826C25E C4065788 26044788 26F85EC4 02578926 07892684 Ç&..&.W.á^½&.G.&.W.á^ö&+G.&.W.á^ 0000C0
57132607 0326C25E C40A5788 26084788 26F85EC4 008CE906 57892604 47892684 Ç&.G.&.W.Ö..á^½&.G.&.W.á^ö&..&.W 0000E0
57892604 4789268 5EC40657 88260447 88260A5E C4025789 26078926 845EC402 .á^Ç&..&.W.á^Ö&.G.&.W.á^Ç&.G.&.W 000100
57892607 8926845. C4025718 26072826 C25EC402 57882607 8826F85E C455E806 .$Uá^½&..&.W.á^ö&+.&.W.á^Ç&..&.W 000120
53E90375 0001301F E8065789 26044789 26845EC4 06578826 04478826 DA5EC402 .á^Ö&.G.&.W.á^Ç&.G.&.W.$.=..u.ÖS 000140
7401BC7E 830183E9 00E8FF76 E9037500 08308574 00043OFF 13E90375 00023DFF .=..u.Ö..=..tç=..u.Öv.$.Ö...-¥.t 000160
7501BC7E 838A5689 88468906 57882604 478826C2 5EC4008C E9037402 8C7E8309 ..-¥.t.Ö¥.á^ö&.G.&.W..F¡.Vo.-¥.u 000180
04472826 DA5EC406 57882604 4788260E 5EC48A56 89884689 DAF70002 8308F70D .¥À.@.¥Ö.F¡.Voá^8&.G.&.W.á^Ö&+G. 0001A0
02571826 0728260A 5EC40257 88260788 260E5EC4 8876FF8A 76FF5052 06571826 &.W.RP.vo.v¡á^8&..&.W.á^Ö&+.&.W. 0001C0
46030257 88260788 260A5EC4 FE5689FC 46891230 00609A50 52192C00 FC9A5052 RP.=.,.RP.'.=..F•.V±á^Ö&..&.W..F 0001E0
```

Dump of file SATURN:[PCCOMMON.DUMP.DLL]BRD.TMP;1 on 18-APR-1990 10:36:59.83
File ID (519,15,0)   End of file block 272 / Allocated 272

Virtual block number 176 (000000B0), 512 (0200) bytes

```
030E5788 260C4788 26F85EC4 137502BC 7E830257 89260789 26845EC4 FE5613FC •.V±á^Ç&..&.W..-¥.u.á^½&.G.&.W.. 000000
26044789 26845EC4 8A5613B8 46030657 88260447 8826F85E C411E88A 5613B846 F¡.Vo$.á^½&.G.&.W..F¡.Voá^Ç&.G.& 000020
D28308F7 00750 4BC 7E838A56 89884689 02578826 078826C2 5EC40088 E9065789 .W.Ö¡.á^ö&..&.W..F¡.Vo.-¥.u.¥À.@ 000040
FF505202 57182607 28260A5E C4025788 26078826 DE5EC48A 56898846 890AF700 .¥Ö.F¡.Voá^8&..&.W.á^Ö&+.&.W.RP. 000060
00FC9A50 52065718 7604472B 260A5EC4 06578826 04478826 DE5EC488 76FF8A76 vo.v¡á^8&.G.&.W.á^Ö&+G.&.W.RP.=. 000080
0A578826 08478826 F85EC413 75088C7E 83FE5689 FC468919 2500609A 505219E7 Ö.RP.'.X..F•.V±.-¥.u.á^½&.G.&.W. 0000A0
89260789 26845EC4 8A5613B8 46030257 88260788 26F85EC4 10E88A56 13884603 .F¡.Vo$.á^½&..&.W..F¡.Voá^Ç&..&. 0000C0
7E830657 89260447 8926845E C4FE5613 FC460306 57882604 4788260A 5EC40257 W.á^Ö&.G.&.W..F•.V±á^Ç&.G.&.W..- 0000E0
25000188 03E80002 88057501 3C03248C 468A11E8 C0280475 038C46F6 487500F6 -.uH-F¥.u.+â$..F¥$.<.u.¡..$.¡..X 000100
00048803 E8000888 0575043C 0C248C46 8A11E8C0 2804750C 8C46F6AA 46890003 ...F¯-F¥.u.+â$..F¥$.<.u.¡..$.¡.. 000120
FA881E56 00001CC8 C8C95F5E 1F00E8C0 28FC25E9 0789261C 5EC4AA46 08000C25 X...F¯á^.&..ÖX=+â$..^_èûà...V.¡• 000140
46081646 88107414 46081246 88187410 46080E46 88207408 46080646 88088E15 ..Ä.F..F.t .F..F.t..F¯..F.t..F..F 000160
7500027F 83260C75 003F8326 165EC402 68E980F3 8806751C 46081A46 88087418 .t..F..F.u.¡µ.Òk.á^.&.?.u.&....u 000180
005E0504 57882602 478826E6 5EC4E856 89E64689 08568806 46880256 E9C02805 .+âÖV..F..V..F¦.VÖá^¦&.G.&.W..^. 0001A0
FA7E83FA 46FF03E8 0000FA46 C7FE5689 FC468900 1605C28C C388EC56 89EA4689 .Fõ.V$.û.ô....F•.V±úF•..$..F•.-• 0001C0
880E4603 03E0C1FA 4688E4E8 02750038 83261676 C4E301FA 5E880212 E9037C02 .|.Ö...^•iDáv.&.8.u.$Ö.F•èÀ..F.. 0001E0
```

Dump of file SATURN:[PCCOMMON.DUMP.DLL]BRD.TMP;1 on 18-APR-1990 10:36:59.83
File ID (519,15,0)   End of file block 272 / Allocated 272

Virtual block number 177 (000000B1), 512 (0200) bytes

```
76FFF856 89F64689 02508826 00882612 76C402E3 C1FA5E88 F45689F2 46891056 V..F·.V¶.^•éD.áv.&..&.P..F-.V½.v 000000
00750739 26F25EC4 02578826 078826FC 5EC40000 11869A50 16EE468D 0A76FF0C ..v..FŸ.P.Ñ...á^=&..&.W.á^·&9.u. 000020
5739260D 75084739 26FC5EC4 02578826 07882661 E80004E4 46C70775 02573926 &9W.u.úFÖ..$a&..&.W.á^=&9G.u.&9W 000040
75065739 26007504 473926F2 5EC40657 88260447 882644E8 0008E446 C707750A .u.úFÖ..$D&.G.&.W.á^·&9G.u.&9W.u 000060
06573926 00750447 3926F25E C40E5788 260C4788 26FC5EC4 26E80001 E446C707 .úFÖ..$&á^=&.G.&.W.á^·&9G.u.&9W. 000080
C40E5788 260C4788 26FC5EC4 0087E9E4 4688000B E446C705 E80002E4 46C70775 u.úFÖ..$.úFÖ...FÖÖ..á^=&.G.&.W.á 0000A0
88260447 8826FC5E C47DE806 57892604 478926F2 5EC40657 13260447 0326EA5E ^Ö&.G.&.W.á^·&.G.&.W.$)á^=&.G.&. 0000C0
478826FC 5EC45AE8 06578926 04478926 F25EC406 57182604 472826EA 5EC40657 W.á^ö&+G.&.W.á^·&.G.&.W.$Zá^=&.G 0000E0
8826FC5E C439E802 57892607 8926F25E C4025713 26070326 EA5EC40A 57882608 .&.W.á^ö&..&.W.á^·&..&.W.$9á^=&. 000100
97740001 3019E802 57892607 8926F25E C4025718 26072826 EA5EC402 57882607 .&.W.á^ö&+.&.W.á^·&..&.W.$.=..t. 000120
FF0C76FF 4475F846 08F.4688 00E8A874 00083OCE 74000430 FF6CE903 7500023D =..u.Öl.=..tö=..t¨$..F-.F¥µD.v.. 000140
01008326 1276C402 E3C1FA5E 8800001D 099AF276 FFF476FF 006A016A 00..0A76 v.j.j.j..v¶.v·......^•éD.áv.&... 000160
48E80006 50832601 04408326 125EC402 E6C1FA76 88137500 FA7E8300 0250.126 &.P...-•.u..v•èl.á^.&.a..&.P..$H 000180
016A006A 0A76FF0C 76FF1975 F856381E 75F6463B 000A8300 0120F056 8BEE4c98 .FŸ.vp·...Ö.;F-u.;V½u..v..v.j.j. 0001A0
F476FF00 6AF676FF F876FF0A 76FF0C76 FF19E800 0011609A F276FFF4 76FF016A j..v¶.v·.'...$..v..v..v½.v-j..v¶ 0001C0
C8C95E1F 00E8C028 FDE2E900 0100C726 1A76C4E3 D1FA5E88 000013B1 9AF276FF .v·.Ÿ....^•iDáv.&ú...Öä»+â$..^èù 0001E0
```

Dump of file SATURN:[PCCOMMON.DUMP.DLL]BRD.TMP;1 on 18-APR-1990 10:36:59.83
File ID (519,15,0)   End of file block 272 / Allocated 272

Virtual block number 178 (00000082), 512 (0200) bytes

```
1046080E 4688287' 0C46080A 46883074 08460806 4688D88E 1A9F881E 000018C8 à....¡...Ä.F..F.t0.F..F.t(.F..F. 000000
2046081E 46880874 1C46081A 46881074 18460816 46881874 14460812 46882074 t .F..F.t..F..F.t..F..F.t..F..F  000020
1876FF1E 76FF2076 FF5016EC 46805016 EE468050 16F6468D 0167E98D F3B80675 u.¡µ.Ög..F-.P.FŸ.P.F‡.P.v .v..v. 000040
C422C483 F836E80E 0A76FF0C 76FF0676 FF0876FF 1276FF14 76FF2276 FF1676FF .v..v".v..v..v..v..v..v..Ò6½.á"á 000060
16EE468D 006A006A 006AE876 FFEA76FF 0000FFFF 9A5016E8 468D1E77 FF260E5E ^.&.w..FÒ.P......vŏ.vÒj.j.j..FŸ. 000080
16FE468D 00001E68 9A5016F6 468D006A 016A006A E876FFEA 76FF0000 1DF89A50 P.½....vŏ.vÒj.j.j..F-.P.h....F±. 0000A0
76FFEC76 FF0E76FF 1076FF50 16EE468D 5016F646 8D5016EE 46805016 EC468D50 P.F‡.P.FŸ.P.F-.P.FŸ.P.v..v..v‡.v 0000C0
391775F6 4639F056 88EE4688 74E80274 00FE7E83 1EC48303 C111229A 0A76FF0C ..v..".è..á..-±.t.Št.FŸ.V₽9F-u.9 0000E0
016A006A E876FFEA 76FF52E8 0275FC56 390775FA 4639F456 88F24688 1275F856 V½u..F·.V¶9F•u.9V•u.ŠR.vŏ.vÒj.j. 000100
4689FC56 88FA4688 0E7508EC 7E830674 04EC7E83 00001EA4 9A5016EE 468D016A j..FŸ.P.Ê....-‡.t..-‡.u..F•.V•.F 000120
468D016A 016A006A E876FFEA 76FFF056 89EE4689 F85688F6 46880CE8 F45689F2 ·.V¶$..F-.V½.FŸ.V₽.vŏ.vÒj.j.j..F 000140
C4E876FF EA76FF06 76FF0876 FF1A77FF 261C77FF 260E5EC4 00001CAF 9A5016EE Ÿ.P.£...á^.&.w.&.w..v..v..vŏ.vÒá 000160
0000FFFF 9A0277FF 2637FF26 1A5EC404 77FF2606 77FF2637 FF260277 FF26165E ^.&.w.&.7&.w.&.w.á^.&.7&.w...... 000180
4688D88E 1D46881E 56570000 30C8CBC9 1F00E8C0 2B0000FF FF9AE876 FFEA76FF .vŏ.vÒ.....+åŠ..èûà0..WV.¡F..Ä.F 0001A0
0E7E831F A5F20008 890A8E1E 0716F088 F07E8D00 1605EE56 89EC4689 08568806 ..V..F‡.VŸ....-Þ.Þ....Ö¿...Ê..-. 0001C0
57882607 8826D85E C4DA5689 D8468900 5E050457 88260247 8826EC5E C4627400 .tbá^$&.G.&.W..^..FÁ.VÖá^Ä&..&.W 0001E0
```

Dump of file SATURN:[PCCOMMON.DUMP.DLL]BRD.TMP;1 on 18-APR-1990 10:36:59.83
File ID (519,15,0)   End of file block 272 / Allocated 272

Virtual block number 179 (00000083), 512 (0200) bytes

```
56890046 89000A83 00012006 57882604 47882606 56890446 89000A83 00012002 .-...Ö..F‡.Vø&.G.&.W.-...Ö..FÅ.V 000000
01F65619 F4462902 568D0046 88FA5611 F84601F2 5619F046 29065688 D4468802 Ø.FÅ.Vø)FÞ.V·.F½.V•.FÅ.VØ)F¶.V-. 000020
83E4468D 1FA5A5A5 A5D88E1E 0716F288 F888OC5E 880A5688 0C468DFE 5611FC46 F•.V±.FÊ.V..^..½.·....ÜEEEE..FÕ. 000040
76FF1076 FF1276FF 5016F046 8D5016DC 468D1FA5 A5A5A5D8 8E1EF288 F886. 1C2 ô..½.·..ÜEEEE..FÉ.P.FÞ.P.v..v..v 000060
003EC8CB C95F5E1F 00E8C02B 00000337 9A505200 08051656 88144688 1476F ´6 ..v..F..V....RP.7...+åŠ..^_èûà>. 000080
FF1676FF 5016FC46 8D5016EC 468DEA46 89078826 205EC4D8 8E1EFA88 1E5657ʋ0 .WV.¡•..Äá^ &...Fõ.F‡.P.F•.P.v.. 0000A0
FC7E8302 88E9C02B 057D01FC 7E8312C4 83FEE3E8 0E0676FF 0876FF0E 76FF1076 v..v..v..v..ÒD±.á..-•.).+åÒ¡..-• 0000C0
04478826 08568906 4689EE56 18EC4628 02578826 0788260E 5EC40137 E9037402 .t.Ö7.á^.&..&.W.+F‡.VŸ.Fø.VÄ&.G. 0000E0
2063028F 9AD65E8D 205E028F 9AD65E8D 045689D2 4689F256 18F04628 06578826 &.W.+FÞ.V·.FØ.Vå.^ø.¢.^ .^ø.¢.c  000100
83208706 D19A207D 06C29A20 78028F9A D25E8D20 73028F9A D25E8D20 6806C29A .ô.k .^Ø.¢.s .^Ø.¢.x .ô.) .1.. . 000120
1FA5A5A5 A5DA8E1E 0716F088 E27E8D08 C48319E0 07859A20 8C03EF9A DC8808EC &..Ê.ÿ.. .ç.Å..á..-ã.Þ....ÖEEEE. 000140
46280657 88260447 88260056 89CE4689 F65618F4 46280257 88260788 260E5EC4 á^.&..&.W.+F¶.V-.Fö.VÄ&.G.&.W.+F 000160
8D20E506 C29A200D 028F9ACE 5E802008 028F9ACE 5E8DCC56 89CA4689 FA5618F8 ½.V•.Fò.Vä.^ö.¢.Å .^o.¢.ï .ô.Í . 000180
EF9ADC88 08EC8321 0106D19A 20F706C2 9A20F202 8F9ACA5E 8D20ED02 8F9ACA5E ^ò.¢.Ù .^ò.¢.· .ô.¼ .Í..Í.‡..É.ÿ 0001A0
02329AE2 5E8D1FA5 A5A5A5DA 8E1E0716 F088DA7E 8008C483 205607B5 9A210603 ..Í.ç.V .á..-Ö.Þ....ÖEEEE..^ã.2. 0001C0
A5A5A5A5 1F161E07 16EC768D C27E8D2C 73200006 D69A212D 02329ADA 5E8D2128 (Í.^Ö.2.-Í.ø.Å s,.-ô.v‡.....EEEE 0001E0
```

Dump of file SATURN:[PCCOMMON.DUMP.DLL]BRD.TMP;1 on 18-APR-1990 10:36:59.83
File ID (519,15,0)   End of file block 272 / Allocated 272

Virtual block number 180 (00000084), 512 (0200) bytes

```
EA46881F A5A5A5A5 1F161EC2 768DF47E 8D1FA5A5 A5A51F16 1EF4768D EC7E8D1F ..-‡.v¶...EEEE..-¶.vô...EEEE..Fõ 000000
EC728008 7F8D03E6 C1F08812 5EC4FE46 8948FC46 88009BE9 037F0002 30FC4603 .F•=....Ö...F•H.F±á^..Þèl.....r‡ 000020
52392275 EC423903 E6C1FE76 880A5788 26084788 260E5EC4 1FA5A5A5 A51F161E ...EEEE.á^.&.G.&.W..v±èl.9B$u"9R 000040
02E80001 880575F2 52390A75 F0423903 E6C1FE76 880E5788 260C4788 261D75EE Ÿu.&.G.&.W..v±èl.9BÞu.9R·u.¡..Š. 000060
E80C5688 0A468808 7400027F 83261C5E C4127501 FE7E8302 4789261C 5EC4C028 +åá^.&.G..-±.u.á^.&.....t..F..V.Š 000080
46C7057D 02EA7E83 06578926 04478926 185EC400 DA830001 200C5688 0A4688OC ..F..V.-...Ö.á^.&.G.&.W..-ô.).úF 0000A0
768800AA E9037CFE 4639FC46 88FE46FF EA46FF06 E80000FE 46C700C2 E90002EA ô..Öô.úF±..Š..Fõ.F±.F=9F±|.Ö^..v 0000C0
03E6C1FE 76881FA5 A5A5A51F 161EEC72 8D398D12 7EC403E3 C1EA5E88 03E6C1FE ±èl..^õèÐ.á-..9.r‡...EEEE..v±èl. 0000E0
03E6C1FE 76882675 02503926 2C750039 260E76C4 03E3C1EA 5E88EE52 88EC4288 .B‡.RŸ.^õèÐ.áv.&9.u,&9P.u&.v±èl. 000100
02E80001 88057506 50392608 75044039 260E5E88 03E6C1EA 7688F252 88F04288 .BÞ.R·.vöèl..^.&9ə.u.&9P.u.¡..Š. 000120
74003883 261C76C4 E301EA5E 88167501 FE7E8300 89261C76 C4E3D1EA 5E88C028 +å.^õÍDáv.&...-±.u..^õÍDáv.&.8.t 000140
89261876 C402E3C1 EA5E8800 DA830001 200C5688 0A4688OC E80C5688 0A468808 ..F..V.Š..F..V.-...Ö..^õèÐ.áv.&. 000160
56570000 58C8CBC9 5F5E1F00 E8C02807 8926EA46 88205EC4 FF45E902 50892600 .&.P.ÖE.á^ .Fõ&..+åŠ..^_èûàX..WV 000180
0247E9C0 2805750C 46080A46 88087408 46080646 880000CE 46C7D88E 1FE5881E .¡Í..ÄûFö...F..F.t..F..F̄.u.+åÖG. 0001A0
C0280573 02E07E83 067C007F 00E27E83 0000186A 9A5016E0 46800676 FF0876FF .v..v..FÁ.P.j....-ã...|..-Á.s.+å 0001C0
86978826 00848788 26885EC4 8A568988 46891857 88261647 88260A5E C40224E9 Ö$.á^.&.G.&.W..F¡.Vøá^¡&....&... 0001E0
```

```
File ID (519,15,0)   End of file block 272 / Allocated 272

Virtual block number 181 (00000085), 512 (0200) bytes

 008C46C7 24AD0000 9A505200 0805C28C C3881E77 FF260A5E C4FE5689 FC468900 ..F=.V±á^.&.w..û.ó...RP...ÚßúF¥. 000000
 01F046C7 00001705 9A501608 46805050 500676FF 0876FFF8 4689FA46 89C02800 .+å.F°.F%.v..v.PPP.FÄ.P.....úFÞ. 000020
 016A006A 0676FF38 76FF1FA5 A5A5A51F 161E0716 08768000 7E800000 F246C700 .úF·...-Å.vÄ.....ÉÉÉÉ..v..v.j.j. 000040
 FF1FA5A5 A5A51F16 1E071608 7680007E 8D00F256 8301F046 8318E800 0011E29A .å...Ś..FÞ..V·..-Å.vÄ.....ÉÉÉÉ.. 000060
 46804D75 FA4608F8 46880087 E90374C0 08000012 189A5016 08468006 76FF0876 v..v..FÄ.P......ât.Ő...F%.F°uM.F 000080
 1FA5A5A5 A51F161E 08768DF8 88804680 1FA5A5A5 A51F161E 07160076 80F888A8 ´.%.vÄ.....ÉÉÉÉ..F¯.%.vÄ...ÉÉÉÉ. 0000A0
 0875FA46 08F84688 0CC4831E 2719C89A 0A76FF0C 76FF5016 A8468050 16F84680 .F%.P.F´.P.v..v..å.'..á..F%.F°u. 0000C0
 BE46800E 76FF5016 E4468050 16EC4680 50168C46 8DFF7CE9 35E8027E 01BC7E83 .-¥.-.ŠSÕ|..F¥.P.F&.P.FÕ.P.v..F/ 0000E0
 BC7E83FF 4AE91EC4 83F886E8 0EF876FF FA76FFF0 76FFF276 FF501600 46805016 .P.FÄ.P.v·.vÞ.v°.v%.Ò.=.á.ÕJ..-¥ 000100
 6A006A00 6A0877FF 260A77FF 260A5EC4 0085E903 75FA4608 F846884D E8027E01 .-.ŠM.F%.F°u.Õç.á^.&.w.&.w.j.j.j 000120
 008C9788 26008A87 8826885E C40F75FA 56391475 F84639FE 5688FC46 88006A01 .j..F=.V±9F%u.9V°u.á^¡&....&.... 000140
 3931750E 4639F446 89F64689 C028FEAA E9037202 909A5052 FA5688F8 468806E8 Š..F%.V°RP...r.Ő¨±+å.F-.F¶9F.u19 000160
 0876FF50 168E4680 50:6E446 805016EC 46805016 F4468D27 74EE4639 0575EC46 F&u.9FŸt'.F¶.P.F&.P.FÕ.P.F/.P.v. 000180
 E4468050 16EC4680 5016F446 800E76FF 18C483F5 ABE80EF8 76FFFA76 FF^<76FF .v..v°.v%.Ò¨%.á..v..F¶.P.F&.P.FÕ 0001A0
 1EC483F8 23E80E06 76FF0876 FFF876FF FA76FF0A 76FF0C76 FF50168E 468L´016 .P.F/.P.v..v..v°.v%.v..v..Õ#%.á. 0001C0
 89260A47 8926C028 0A5EC423 5A00689A 0877FF26 0A77FF26 0A5EC400 01CE4\C7 úFö..á^.&.w.&.w..h.2#á^.+ä&.G.&. 0001E0

Dump of file SATURN:[PCCOMMON.DUMP.DLL]BRD.TMP;1 on 18-APR-1990 10:36:59.83
File ID (519,15,0)   End of file block 272 / Allocated 272

Virtual block number 182 (00000086), 512 (0200) bytes

 05750846 08064688 D88E22E2 881E5657 00002CC8 C8C95F5E 1F00E8CE 46880847 G..FöŠ..^_èùà,..WV.¡ä".Ä.F..F.u. 000000
 F87E8306 7C007F00 FA7E8300 00230C9A 5016F846 800676FF 0876FF01 87E9C028 +åÕ...v..v̄..F%.P..#...-'...|..-% 000020
 76FF0000 25809A50 16E04680 016A006A 006A0676 FF0876FF 0164E9C0 28057302 .s.+åÕd..v..v.j.j.j..FÄ.P.¯X...v 000040
 7E800000 FE46C700 01FC46C7 00002378 9A5016F0 4680006A 006A006A 0676FF08 ..v.j.j.j..FÞ.P.x#..úF=..úF±...- 000060
 8318E800 0023A19A 016A006A 0676FF08 76FF1FA5 A5A5A51F 161E0716 F0768DE8 Ò.vÞ.....ÉÉÉÉ..v..v.j.j..À#..Š.. 000080
 F0468006 76FF0876 FF1FA5A5 A5A51F16 1E0716F0 7680E87E 8000FE56 8301FC46 F=..V±..-Ò.vÞ.....ÉÉÉÉ..v..v..FÞ 0000A0
 46881074 F6563905 75F44639 EE5688EC 4688000A E90374C0 08000023 C89A5016 .P.ú#...ât.ÕÖ..F&.VŸ9F¶u.9V-t..F 0000C0
 0E700208 EE5618EC 4628E656 88E44688 AFE80275 F2563907 75F04639 EA5688E8 Ò.Võ9FÞu.9V·u.ŠE.FÕ.V|+F&.VŸ.ø). 0000E0
 E25E88E0 4E88EE56 18EC4628 E65688E4 46880CE8 E65618E4 4628EE56 88EC4688 .F&.VŸ+FÕ.V|Š..FÕ.V|+F&.VŸ.NÄ.^ã 000100
 46880CE8 E25618E0 4628EA56 88E84688 0E7DD808 D65689D4 4689EA5E 18E84E28 +NÒ.^Õ.F&.Vø.Ù)..FÒ.Võ+FÄ.VäŠ..F 000120
 89D84689 F25688F0 46881A73 D4463805 7C217FD6 5638EA56 18E8462B E25688E0 Å.Vã+FÒ.Võ;Vø.!|.;Fås..FÞ.V·.FÄ. 000140
 88F44688 DA568908 4689EA56 88E84688 18E8DE56 89DC4689 EE5688EC 46880A56 VÕ.F&.VŸ.FÉ.V8Š..FÒ.Võ.FÄ.VÕ.F¶. 000160
 000010E2 9A501608 4680006A FC76FFFE 76FF0676 FF0876FF DE56890C 4689F656 V-.FÉ.V8.v..v..v±.v=j..FÄ.P.ã... 000180
 74010E7E 83088E25 54881E00 0026C8C8 C95F5E1F 00E8C028 FEF7E907 E80001B8 ¡..Š.Õ%±+åŠ..^ èùà&...¡T%.Ä.-..t 0001A0
 89025788 26078826 DC56890A 46890657 88260447 8826145E C42E7502 0E7E8306 ..-..u.á^.&.G.Ī.W...FÕ.VÉ&..&.W.. 0001C0
 89025788 26078826 145EC42C E8FA5689 F846890A 57882608 478826FE 5689FC46 F=.V±&.G.&.W..F%.V°Š,á^.&..&.W.. 0001E0

Dump of file SATURN:[PCCOMMON.DUMP.DLL]BRD.TMP;1 on 18-APR-1990 10:36:59.83
File ID (519,15,0)   End of file block 272 / Allocated 272

Virtual block number 183 (00000087), 512 (0200) bytes

 5689F846 890E5788 260C4788 26FE5689 FC468906 57882604 4788260C 5689DA46 FÖ.VÉ&.G.&.W..F=.V±&.G.&.W..F%.V 000000
 0E76FFDA 76FFDC76 FFFC76FF FE76FFF8 76FFFA76 FF5016F4 46805016 DE468DFA °.F8.P.F¶.P.v°.v%.v±.v=.vÉ.vÕ.v. 000020
 390A75F4 46390C56 880A4688 1574000E 7E831AC4 83241321 E39A0A76 FF0C76FF .v..v..DI.$.á..-8.t..FÖ.VÉ9F¶u.9 000040
 80006A50 5200DA83 00022D12 56881046 880676FF 0876FF03 A0E9C028 0575F656 V-u.+äÕ...v..v..F..V.-...Ö.RPj.. 000060
 80006A50 52000283 00010512 56881046 880676FF 0876FF00 0027E59A 5016E046 FÄ.P.|'...v..v..F..V.....ø.RPj.. 000080
 77E44639 057C1E7F E656390C 5688DA46 880229E9 0E468800 00259A9A 5016E846 FÒ.P..X...F.Õ)..FÖ.VÉ9V|..|.9FÕw 0000A0
 56390C56 880A4688 0331E9C0 280577EC 4639057C 0C7FEE56 390C5688 DA468817 ..FÖ.VÉ9VŸ..|.9F&w.+äÕ1..FÖ.VÉ9V 0000C0
 56390C56 880A4688 3EE8F256 89F04689 EE5688EC 46880E77 E4463905 7C157FE6 |..|.9FÕw..F&.VŸ.FÞ.V·Š>.FÖ.VÉ9V 0000E0
 563BE656 88E44688 1EE8F256 89F04689 E65688E4 46880E77 EC463905 7C157FEE Ÿ..|.9F&w..FÕ.V|.FÞ.V·Š..FÕ.V|;V 000100
 390C5688 0A468801 C1E9F256 89F04689 EC4688EE 56880676 EC463805 7F007CEE Ÿ|...;F&v..VŸ.F&.FÞ.V·Õè..FÕ.VÉ9 000120
 E9C02805 72EC4639 057F0C7C EE56390C 5688DA46 881772E4 4639057F 1E7CE656 V||...9FÕr..FÖ.VÉ9VŸ|...9F&r.+äÕ 000140
 F25689F0 4689EE56 88EC4688 0E72E446 39057F15 7CE65639 DC5688DA 468802A7 ]..FÖ.VÉ9V||...9FÕr..F&.VŸ.FÞ.V· 000160
 F25689F0 4689E656 88E44688 0E72EC46 39057F15 7CEE5639 DC5688DA 46883EE8 Š>.FÖ.VÉ9VŸ|...9F&r..FÕ.V|.FÞ.V· 000180
 F25689F0 4689EC46 88EE5688 0673EC46 38057C0D 7FEE5638 E65688E4 46881EE8 Š..FÕ.V|;VŸ..|.;F&s..VŸ.F&.FÞ.V· 0001A0
 0C7FEA56 390C5688 DA468817 77E04639 057C1E7F E256390C 5688DA46 880137E9 Õ7..FÖ.VÉ9Vä..|.9FÄw..FÖ.VÉ9VÕ.. 0001C0
 46880E77 E0463905 7C157FE2 56390C56 880A4688 021DE9C0 280577E8 4639057C |.9FÕw.+äÕ...FÕ.VÉ9Vä..|.9FÄw..F 0001E0
```

```
Dump of file SATURN:[PCCOMMON.DUMP.DLL]BRD.TMP;1 on 18-APR-1990 10:36:59.83
File ID (519,15,0)   End of file block 272 / Allocated 272

Virtual block number 184 (000000B8), 512 (0200) bytes

 46880E77 E8463905 7C157FEA 5639DC56 88DA4688 3EE8F256 89F04689 EA5688E8 Ò.Vö.FÞ.V·$>.FÖ.VÉ9Vö..|.9FÒw..F 000000
 56880676 E846380? 7F0D7CEA 5638E256 88E04688 1EE8F256 89F04689 E25?? ?E0 Å.Vä.FÞ.V·$..FÅ.Vä;Vö|...;FÒv..V 000020
 881772E0 4639057F 1E7CE256 39DC5688 DA468800 ADE9F256 89F04689 E8468??A ò.FÒ.FÞ.V·ÒÙ..FÖ.VÉ9Vâ|...9FÅr.. 000040
 7CE25639 DC56880A 46880193 E9C02805 72E84639 057F0C7C EA56390C 56880A?6 FÖ.VÉ9Vö|...9FÒr.+àÕ...FÖ.VÉ9Vâ| 000060
 7CEA5639 DC56880A 46883EE8 F25689F0 4689EA56 88E84688 0E72E046 39057F15 ...9FÅr..FÒ.Vö.FÞ.V·$>.FÖ.VÉ9Vö| 000080
 7FEA5638 E25688E0 46881EE8 F25689F0 4689E256 88E04688 0E72E846 39057F15 ...9FÒr..FÅ.Vä.FÞ.V·$..FÅ.Vä;Vö. 0000A0
 FE59E903 7500013D 22E824E8 F25689F0 4689E846 88EA5688 0673E846 38057C00 .|.;FÒs..Vö.FÒ.FÞ.V·$$$"=..u.ÒY± 0000C0
 5F74000E 7E8300E8 FEC8E903 7500083D FF5DE903 7500043D FDC7E903 7500023D =..u.Òù»=..u.Ò].=..u.Òù±$..~8.t  0000E0
 F44689F2 5688F046 880C73F0 4639057C 137FF256 39F65688 F4468842 E80E4688 .F.$8.F¶.V-9V·..|.9FÞs..FÞ.V·.F¶ 000100
 F44689F2 5688F046 880C76F0 4639057F 137CF256 39F65688 F4468838 EBF65689 .V-$8.F¶.V-9V·|...9FÞv..FÞ.V·.F¶ 000120
 880CE800 E8AA7400 0830CF74 000430B4 7400023D D9740001 3016E818 EBF65689 .V-$.$.=..t)=..tÇ=..tü=..t¯$.$.. 000140
 0089E9C0 280575F6 56390A75 F446390C 56880A46 88F65689 F44689F2 5688F046 FÞ.V·.F¶.V-.FÖ.VÉ9F¶u.9V-u.+àÕ.. 000160
 145EC40E 5789260C 478926F6 5688F446 88145EC4 1E75020E 7E830674 010E7E83 .-..t..-..u.á^..F¶.V-&.G.&.W.á^. 000180
 8926145E C40A5789 26084789 26F65688 F4468814 5EC418E8 06578926 04478926 &.G.&.W.$.á^..F¶.V-&.G.&.W.á^.&. 0001A0
 76FF1676 FF006A50 5200DA83 00012D12 56881046 880676FF 0876FF02 57892607 .&.W..v..v..F..V.·...Ö.RPj..v..v 0001C0
 9A505200 08051656 88144688 006A1076 FF1276FF 0676FF08 76FF0000 28409A14 ..ə+...v..v..v..v.j..F..V....RP. 0001E0

Dump of file SATURN:[PCCOMMON.DUMP.DLL]BRD.TMP;1 on 18-APR-1990 10:36:59.83
File ID (519,15,0)   End of file block 272 / Allocated 272

Virtual block number 185 (000000B9), 512 (0200) bytes

 06468800 01F246C7 088E26F7 881E5657 000040C8 C8C91F00 E8000188 00001D24 $...¡..$..èùàə..WV.¡%&.ÄúF·...F. 000000
 76FF0876 FF02A2E9 8DF38806 75164608 14468808 740C4608 0A468810 74084608 .F.t..F..F.t..F..F.u.¡µ.ÕÅ..v..v 000020
 7500187E 83000027 C59A5016 F4468D00 6A505200 D2830001 05125688 10468806 ..F..V.....@.RPj..F¶.P.é'...~..u 000040
 1EF4768D E47E8D1F A5A5A5A5 DA8E1E07 16F08804 7E8D1656 88144688 000DE903 .Òì..F..V..-å.Þ....ÖÉÉÉ..-ö.v¶. 000060
 0C468902 57882607 8826145E C41E7502 0E7E8306 74010E7E 831FA5A5 A5A51F16 ..ÉÉÉÉ..~..t..~..u.á^.&..&.W..FÉ 000080
 145EC4DE 5689DC46 89F65688 F4468810 E8E25689 E04689FA 5688F846 88DE5689 .V8.F½.V°.FÅ.Vä$..F¶.V-.FÉ.V8á^. 0000A0
 468304E8 EE568CEC 4689D446 8D0002F0 46C7E256 89E04689 06578826 04478826 &.G.&.W..FÅ.VäúFÞ...Få.Fé.VŸ$..F 0000C0
 A5A5D88E 1E0716F2 88F888EE 5E88EC56 88C4468D 5274C008 F04EFFF0 468808EC &..FÞ.NÞ.âtR.Fá.Vè.^Ÿ.½.·....ÙÉÉ 0000E0
 FF5016C4 468D5016 FC468D1F A5A5A5A5 D88E1EF2 88F88808 C283CC46 8D1FA5A5 ÉÉ..Fä.ô..½.·..ÙÉÉÉ..F=.P.Fá.P. 000100
 08E9A0E8 02E80000 F246C707 74FE4608 FC46880C C4832789 19C89A0A 76FF0C76 v..v..à..'.á..F=.F±t.úF·..$.$.Ö. 000120
 5EC40257 89260789 26C45EC4 02578826 07882614 5EC4C656 8CC44689 D4468D01 ..Få.Fá.Vóá^.&..&.W.á^á&..&.W.á^ 000140
 478926F6 5688F446 88C45EC4 06578926 04478926 C45EC406 57882604 47882614 .&.G.&.W.á^á&.G.&.W.á^á.F¶.V-&.G 000160
 02578826 078826C4 5EC40E57 89260C47 8926FA56 88F84688 C45EC40A 57892608 .&.W.á^á.F½.V°&.G.&.W.á^á&..&.W. 000180
 26084788 26EE5689 EC468902 57882607 88262D73 08473926 067C357F 0A573926 &9W..5|.&9G.s-&..&.W..Fé.VŸ&.G.& 0001A0
 8826C45E C40A5789 26084789 26EE5688 EC4688C4 5EC40257 89260789 260A5788 .W.&..&.W.á^á.Fé.VŸ&.G.&.W.á^á&. 0001C0
 89C04689 06578826 04478826 2F760447 3926067F 377C0657 39260E57 88260C47 G.&.W.&9W.|7..&9G.v/&.G.&.W..Fá. 0001E0

Dump of file SATURN:[PCCOMMON.DUMP.DLL]BRD.TMP;1 on 18-APR-1990 10:36:59.83
File ID (519,15,0)   End of file block 272 / Allocated 272

Virtual block number 186 (000000BA), 512 (0200) bytes

 260C4789 26C25688 C04688C4 5EC40657 89260447 89260E57 88260C47 8826C256 Vó&.G.&.W.&.G.&.W.á^á.Fá.Vó&.G.& 000000
 08FC4688 0CC4832C 681D779A 0A76FF0C 76FFC476 FFC676FF 5016FC46 8D0E5789 .W..F=.P.vó.vá.v..v..w.h,.á..F=. 000020
 4688145E C4137502 0E7E8306 74010E7E 836A7400 F27E8300 00F246C7 0574FE46 F±t.úF·...~·.tj.~..t..~..u.á^..F 000040
 76FF0257 89260789 26F65688 F4468814 5EC410E8 06578926 04478926 FA5688F8 ½.V°&.G.&.W.$.á^..F¶.V-&..&.W..v 000060
 FF00002B 229A1476 FF1676FF 006A5052 00DA8300 01201256 88104688 0676FF08 ..v..F..V.·...Ö.RPj..v..v.."+... 000080
 FF1476FF 1676FF24 E826E800 01880000 10F79A00 6A1076FF 1276FF06 76FF0876 v..v..v..v.j..%...¡..$&$$.v..v.. 0000A0
 5F5E1F00 E812C483 F8D9E80E 0676FF08 76FF0A76 FF0C76FF 0E76FF10 76FF1276 v..v..v..v..v..v..v..ÒÌ½.á.$..^  0000C0
 C0280575 0C46080A 46880874 08460806 4688D88E 2854881E 56570000 2AC8C8C9 èùà*..WV.¡T+.Ä.F..F.t..F..F.u.+Ä 0000E0
 7304F67E 83067C0D 7F00F87E 83000025 719A5016 F6468D06 76FF0876 FF01E0E9 ÕÄ..v..v..F-.P.q%...-½...|..--.s 000100
 FF0876FF 00002E8E 9A50160E 4680016A 006A006A 0676FF08 76FF0180 E9C02805 .+àÕ§..v..v.j.j.j..F8.P......v.. 000120
 8DE67E8D 0000FE46 C70002FC 46C70000 2F469A50 16EE468D 006A016A 006A0676 v.j.j.j..FŸ.P.F/..úF=..úF±...-Ì. 000140
 FC468318 E8000025  99A026A 006A0676 FF0876FF 1FA5A5A5 A51F161E 0716EE76 vŸ.....ÉÉÉÉ..v..v.j.j..1%..$..F= 000160
 DA830002 2DF85688 .?4688 1F A5A5A5A5 1F161E07 16EE768D E67E8000 FE568301 ..V±..-Ì.vŸ.....ÉÉÉÉ..F-.V½-...Ö 000180
 039A5016 EE468D06 76FF0876 FF012CE9 0373FC46 38087F01 36E9037D FE563800 .;V±).Ò6...;F=s.Õ,..v..v..FŸ.P.. 0001A0
 E45688E2 46886175 F4563966 75F24639 EC5688EA 46880115 E90374C0 08000026 &...át.Õ...Fö.V$9F·uf9V¶uo.Fä.Vö 0001C0
 006A5052 00028300 0105FE56 88FC4688 0676FF08 76FF2275 EC563927 75EA4639 9Föu'9V$u".v..v..F=.V±....@.RPj. 0001E0
```

```
Dump of file SATURN:[PCCOMMON.DUMP.DLL]BRD.TMP;1 on 18-APR-1990 10:36:59.83
File ID (519,15,0)   End of file block 272 / Allocated 272

Virtual block number 187 (000000BB), 512 (0200) bytes

88EA4688 1FA5A5A5 A51F161E 07160E76 8D067E8D 10E80000 2FB79A50 16064680 .F.P.ñ/..$..-.v8.....EEEE..Fõ. 000000
5688E646 8874E8FA 46890001 8803E800 02880576 DA463905 7F0C7CDC 5639EC56 V$9VÉ|...9FÕv.¡..$.|...F'$t.F|.V 000020
76FF0876 FF2275F8 56392775 E64639E0 5688DE46 8B6175F0 56396675 EE4639E8 Ö9FYu!9VÞua.F8.VÀ9F|u'9VÖu".v..v 000040
D67E8D10 E800028 979A5016 D6468D00 6A505200 02830001 05FE5688 FC468806 ..F=.V±....@.RPj..F=.P..+..$..-= 000060
B80576D6 4639057F 0C7CD856 39E85688 E646881F A5A5A5A5 1F161E07 160E768D .v8.....EEEE..F|.VÒ9VÀ|...9F=v.¡ 000080
FA76FFFC 76FFFE76 FF5016E6 46800E76 FFFECEE9 03E8FA46 890004B8 03E80008 ..$.¡...F'$.Õo±.v..F|.P.v±.v=.v' 0000A0
28FE9EE9 07E80001 880574C0 0814C483 F83CE80E 0676FF08 76FF0A76 FF0C76FF .v..v..v..v..Ò<«.Á..At.¡..$.Õ.±+ 0000C0
60E980F3 88067508 46080646 88D88E2E 2A881E56 000036C8 CBC95F5E 1F00E8C0 À$..^_èùà6..V.¡*..Á.F..F.u.¡µ.Õ' 0000E0
8DEA5689 E8468900 0A05C28C C388FE56 89FC4689 08578826 06478826 065EC401 .á^.&¯G.&.W..F=.V±.ú.ò....FÕ.VÕ. 000100
03E80000 E646C7D0 5689CE46 89005E05 04578826 02478826 E4568CE2 46890246 F@.Fâ.VÕ&.G.&.W..^..Fò.VÀúF|..$. 000120
89CA4689 02508826 008826E8 76C402E3 C1E65E88 0111E903 7E01E67E 83E646FF .F|.-|.-.Õ...^|èÕ.ávÕ&..&.P..Fò. 000140
80E676FF 006A006A FC76FFFE 76FF08C4 83FFFF1A 119A5052 E276FFE4 76FFCC56 Và.vÕ.vàRP......á..v±.v=j.j..v|. 000160
00002E78 9A5016F4 4680E676 FF016A00 6AFC76FF FE76FF00 0030DC9A 5016EC46 F$.P.ÉO...v±.v=j.j..v|.F¶.P.x... 000180
F25689F0 4689E056 130E4603 06578826 04478826 CE5EC464 E8464788 26CA5EC4 á^ò&.GF$dá^ò&.G.&.W..F8.VÀ.FÞ.V· 0001A0
8826CE5E C448E8F2 5689F046 8906571B 26044728 26CE5EC4 08568806 468861E8 $a.F=.VÀá^ò&+G.&.W..FÞ.V·$Há^ò&. 0001C0
26072826 CE5EC4D4 56880246 8830E8EE 5689EC46 89DC5613 DA460302 57882607 .&.W..FO.VÉ.F$.VY$O.F@.Váá^ò&+.& 0001E0

Dump of file SATURN:[PCCOMMON.DUMP.DLL]BRD.TMP;1 on 18-APR-1990 10:36:59.83
File ID (519,15,0)   End of file block 272 / Allocated 272

Virtual block number 188 (000000BC), 512 (0200) bytes

7400083D D7740004 30927400 023D8074 00013D16 E818E8EE 5689EC46 8902571B .W..F$.VY$.$.=..t¯=..t.=..t==..t 000000
56390575 F84639F2 5688F046 881075F6 56391575 F44639EE 5688EC46 8800E88A ¤$..F$.VY9F¶u.9V-u..FÞ.V·9F¥u.9V 000020
E8C028FE E3E90000 26DC9A50 16EC4680 E676FF01 6A006AFC 76FFFE76 FF1774FA 't..v±.v=j.j..v|.F$.P.É&..Õ0±+á$ 000040
006E0004 1EE70203 02600005 1EDC0203 00600004 1DCC0203 001290C8 C95E1F00 ..^èù.....=...'...É...'...Ö...n. 000060
00980004 2DEE0203 008A0004 2D0B0203 00000009 30AD0002 007D0004 31960203 ...1..)...ÙO......Ù-.......Ÿ-.... 000080
01330004 2E870203 00000014 25330002 00AB0004 2E4F0203 00000011 20770002 ..w-.......O...¨...3X......ñ...3. 0000A0
00000019 302F0002 01B00004 0F480203 00B00004 30C50203 00000017 21200002 .. !......éO..§...H...§.../O.... 0000C0
00000000 00000000 00500004 14AB0203 01CE0004 1F000203 01450004 2EFF0203 ......E...Å...ö...¨...P......... 0000E0
46890856 88064688 43E88DF3 88057508 46080646 88D88EFF FFB81E56 000006C8 à...V.¡...Á.F..F.u.¡µ.$C.F..V..F 000100
408826FA 5EC402E6 C1FE7688 1A7F01FE 7E83FE46 FF03E800 00FE46C7 FC5689FA '.V=úF±..$..F±.-±....v±é|.á^'&.@ 000120
04CAC95E 1F00E8C0 28000136 47C726FA 5EC40DE8 0FE88E03 8805750C 4008260A .&.@.u.¡..$.$ïá^'&úG6..+á$..^èò. 000140
47882606 5EC40D74 08460806 46880000 8E46C7D8 8E0007B8 1E565700 007EC800 .à-..WV.¡...ÁúF....F..F.t.á^.&.G 000160
5052F256 89F04689 08578826 06478826 065EC403 30E980F3 88067508 47082606 .&.G.u.¡µ.ÕO.á^.&.G.&.W..FÞ.V·RP 000180
023D057F 247CD208 000C5E83 01DA6E83 DC5688DA 46880000 FFFF9A50 160A4680 .FO.P......FÕ.VÉ.nÖ..^É..@|$..=. 0001A0
CAE802DF E98E0288 0674C00B 0000FFFF 9A006A01 6A006AF0 76FFF276 FF107600 .v..v·.vÞj.j.j.......ât.¡..ÕÕ.$ò 0001C0
E9037E01 9C7E839C 46FF03E8 00009C46 C79A5689 98468900 0A050856 88064688 .F..V.....F..V.úF...$..F..-..-.Õ 0001E0

Dump of file SATURN:[PCCOMMON.DUMP.DLL]BRD.TMP;1 on 18-APR-1990 10:36:59.83
File ID (519,15,0)   End of file block 272 / Allocated 272

Virtual block numi r 189 (000000BD), 512 (0200) bytes

5EC48C56 898A4689 84528982 42890250 88260088 26985EC4 02E6C19C 76880088 ...v.è|.á^.&..&.P..B..R..F..V.á^ 000000
4689CA43 8D03E7C1 9C7E88EE 5689EC46 89E45289 E2428908 57882606 4788268A .&.G.&.W..Bä.RÕ.F$.VŸ.-.èÕ..Cò.F 000020
5EC4DE76 FFE076FF 0000FFFF 9A50169C 76FF006A 006AF076 FFF276FF E0568CDE 8.VÀ.v·.vÞj.j..v..P......vÀ.v8á^ 000040
FF9C76FF 016A006A F076FFF2 76FF0AC4 830253E8 0EEC76FF EE76FF46 77FF268A .&.wF.vŸ.v$.ÕS..á..v·.vÞj.j..v.. 000060
5EC49456 89924689 04578826 02478826 825EC4FF 69E90000 02E29ADE 76FFE076 vÀ.v8.ã...Õi.á^.&.G.&.W..F..V.á^ 000080
C028FFFF 00009A50 16A2468D 9676FFC8 568CC646 899E4680 96468906 47882692 .&.G..F..F..Fó.Và.v..FÀ.P.....+à 0000A0
88468904 57882602 47882692 5EC48656 89844689 94568892 4688A646 89A84689 .F`.F|.F..V..FÇ.VÑá^.&.G.&.W..F¡ 0000C0
F25688F0 4688C056 898E4689 08568806 46880001 AA46C78C 46899646 888A5689 .V¤.F..F¥úF`...F..V..F/.Và.FÞ.V· 0000E0
83028215 A59AE276 FFE476FF E676FFE8 76FFC676 FFC876FF 006AC456 89C24689 .Fó.Váj..và.vó.vÕ.v|.vÕ.vä.E.... 000100
C0E80E50 16CA4680 50169046 8DEC4689 EE4689C0 28FE568C FC4689F4 46800EC4 à..F¶.F=.V±+á.FŸ.F$.F..P.Fò.P.Õà 000120
A5A5A51F 161E0716 CA768DF4 7E800128 E9037C00 64308E46 FF8E4688 08C48303 ..á..F..F.=d.|.Õ(..-¶.vò.....EEE 000140
9A9076FF C676FFC8 76FF5016 CA4680S0 16024680 5016CA46 8D5016EC 46801FA5 È..F$.P.Fò.P.F@.P.Fò.P.và.vó.v.. 000160
D6463900 5688CE46 88137504 56391875 D24639CC 5688CA46 8816C483 03190CBA ¤....á..Fò.Va9F@u.9Vâu..Fó.VÀ9F= 000180
46881275 02573926 18750739 26CC5688 CA4688FC 5EC40000 E9037508 56390875 u.9VAu.ÕÀ.á^=.Fò.Va&9.u.&9W.u..F 0001A0
16CA4680 016A026A ^06AF076 FFF276FF 16740657 39260675 04473926 D05688CE ö.VÀ&9G.u.&9W.t..v·.vÞj.j.j..Fò. 0001C0
D2468D50 16CA4680 50169046 8D5016EA 468D7074 EE4608EC 46880000 FFFF9A50 P......F$.FŸtp.Fõ.P.F..P.Fò.P.F@ 0001E0
```

```
Dump of file SATURN:[PCCOMMON.DUMP.DLL]BRD.TMP;1 on 18-APR-1990 10:36:59.83
File ID (519,15,0)   End of file block 272 / Allocated 272

Virtual block number 190 (000000BE), 512 (0200) bytes

 7E831EC4 83FFFF11 229AEC76 FFEE76FF 9076FFC6 76FFCB76 FF5016CA 468D5016 .P.Fò.P.và.vó.v..vÿ.vš.".....&..~ 000000
 75D64639 D0568BCE 46881275 D4563917 75D24639 CC5688CA 468854E8 027400EA ð.t.$T.Fò.Va9F@u.9Vâu..Fö.VÀ9Fæu 000020
 468D0000 01869A50 16CA468D 016A026A 006AF076 FFF276FF 32E80275 D8563907 .9VÁu.$2.v·.vÞj.j.j..Fò.P......F 000040
 1A7C648E 7E83FECA E90EC483 0116E80E 9076FF50 16CA468D 5016D246 8D501690 ..P.F@.P.Fò.P.v..Ò...&.Ö0±.-.d|. 000060
 C676FFC8 76FF0000 FFFF9A10 4068006A 0AAE681E 0ABE681E 016A006A 016A006A j.j.j.j..h/..hÙ.j.hª.......và.vó 000080
 5F5E1F00 E8C02801 8C00689A A276FFA4 76FF08C4 83FFFF04 559A0676 FF0876FF .v..v..U....&..vÉ.vÅ.h.V.+àS..^ 0000A0
 EE5689EC 4689005E 05045788 26024788 26065EC4 088E0069 881E0000 14C8C8C9 èùà....¡i..Äé^.&.G.&.W..^..F&.Vÿ 0000C0
 072826EC 5EC4F256 88F04688 76E80A46 8808C483 FFFF16E0 9A530650 16F0468D .FÞ.P.S.Å....&..F.$v.FÞ.V·é^&&+. 0000E0
 FA5613F8 46030257 88260788 26EC5EC4 73E80257 89260789 260C5EC4 02571826 &.W.é^.&..&.W.$sé^&&..&.W..F%.Vª 000100
 0C5EC406 57182604 472826EC 5EC4F656 88F44688 57E80257 89260789 260C5EC4 é^.&..&.W.$W.F¶.V-é^&&+G.&.W.é^. 000120
 89260C5E C4FE5613 FC460306 57882604 478826EC 5EC439E8 06578926 04478926 &.G.&.W.$9é^&&.G.&.W..F=.V±é^.&. 000140
 7400083D FF78E90? 75000430 06740002 308D7400 013D19E8 18E80657 89260447 G.&.W.$.$.=..t§=..tø=..u.Õx.=..t 000160
 5EC40257 8826078E ?60C5EC4 D88E03C8 881E0000 0EC8C8C9 1F00E8C0 2800E88F .$.+à$..èùà....¡à..Äé^.&..&.W.é^ 000180
 04472826 085EC406 57882604 4788260C 5EC4FC56 89FA4689 02571826 07282608 .&+.&.W..Fª.V=é^.&.G.&.W.é^.&+G. 0001A0
 F24689F8 5688F646 8806E80A F7000283 08F7097D 0208F856 89F64689 06571826 &.W..F-.V%.@).%Á.@.%Ö$..F-.V%.F· 0001C0
 5638FC56 88FA4688 06E80AF7 00028308 F7FC5688 FA46880F 7D00FC7E 83F45689 .V¶.-=.)..Fª.V=%Á.@.%Ö$..Fª.V=;V 0001E0
```

```
Dump of file SATURN:[PCCOMMON.DUMP.DLL]BRD.TMP;1 on 18-APR-1990 10:36:59.83
File ID (519,15,0)   End of file block 272 / Allocated 272

Virtual block number 191 (000000BF), 512 (0200) bytes

 F87E8311 E8FE4689 00088803 E8000488 057D00FC 7E831376 F2463805 7F1A7CF4 ¶|...;F·v..-=.).¡..$.¡...F±$..-% 000000
 11E8C028 04750306 46F65274 FE463906 4688FE46 89000288 03E80001 88057D00 .).¡..$.¡...F±.F.9F±tR-F..u.+à$. 000020
 E8C02804 750C0646 F6F24689 00032500 018803E8 00028805 75013C03 2406468A .F.$.<.u.¡..$.¡..%...F·-F..u.+à$ 000040
 105EC408 74FE4638 F2460800 0C250004 8803E800 08880575 043C0C24 06468A11 ..F.$.<.u.¡..$.¡..%...F·;F±t.é^. 000060
 F6468806 E80AF700 02830BF7 F85688F6 46880F7D 00F87E83 72E80789 26FE4688 .F±&..$r.-%.)..F-.V%Á.@.%Ö$..F- 000080
 468806E8 DAF700D2 830BF7FC 5688FA46 880F7D00 FC7E83F4 5689F246 89F85688 .V%.F·.V¶.-=.)..Fª.V=%Á.@.%Ö$..F 0000A0
 5EC40002 8803E800 U188057D 00F87E83 1676F246 38057F10 7CF45638 FC5688FA ª.V=;V¶|...;F·v..-%.).¡..$.¡..é^ 0000C0
 C91F00E8 C0280789 26105EC4 00088803 E8000488 057D00FC 7E8314E8 07892610 .&..$..-=.).¡..$.¡..é^.&..+à$..è 0000E0
 9CE980F3 8806750C 46080A46 88087408 46080646 88088E04 90881E00 000CC8C8 ùà....¡...Ä.F..F.t..F..F.u.¡æ.Ö. 000100
 5788260C 478826FE 5689FC46 89025718 26072826 0A578826 08478826 065EC400 .é^.&.G.&.W.&+.&.W..F=.V±&.G.&.W 000120
 88F84688 06E80AF7 00028308 F7097D02 08FA5689 F8468906 57182604 4728260E .&+G.&.W..F%.Vª.@).%Ä.@.%Ö$..F%. 000140
 FC468806 E8DAF700 02830BF7 FE5688FC 46880F7D 00FE7E83 F65689F4 4689FA56 Vª.F¶.V-.-±.)..F=.V±%Á.@.%Ö$..F= 000160
 0A5EC400 088803E8 00048805 7D00FE7E 831676F4 4638057F 107CF656 38FE5688 .V±;V-|...;F¶v..-±.).¡..$.¡..é^. 000180
 CBC91F00 E8C02807 89260A5E C4000288 03E80001 88057D00 FA7E8314 E8078926 &..$..-ª.).¡..$.¡..é^.&..+à$..èù 0001A0
 00040000 02030000 000903EA 0002007D 0004035A 02030088 00010396 0103000A ...........Z...)...ö.......Å... 0001C0
 001403B7 000200A8 000400A6 02030000 001203A9 00020000 0011021D 00020098 ..........`.......Ì....¨...ñ... 0001E0
```

```
Dump of file SATURN:[PCCOMMON.DUMP.DLL]BRD.TMP;1 on 18-APR-1990 10:36:59.83
File ID (519,15,0)   End of file block 272 / Allocated 272

Virtual block number 192 (000000C0), 512 (0200) bytes

 00000000 00000000 00000000 00000000 00190607 00020080 00040154 02030000 ....T...§....................... 000000
 FF42E88E 15880575 08460806 46880874 000A7E83 D88EFFFF 881E5657 000004C8 à...WV.¡...Ä.-..t..F..F.u.¡..$B. 000020
 DC8EF888 FC5EC428 E88E1488 0574C008 0000FFFF 9A5016FC 4680126A 056A0A76 v.j.j..F=.P......ât.¡..$(é^=.«/É 000040
 E8C02802 57892607 8926FE56 88FC4688 065EC404 4789260A 4688A5F2 0009B90A .¿..·É.F.&.G.é^..F=.V±&..&.W.+à$ 000060
 C208FC56 89FA4689 08568806 4688D88E 0008881E 00000EC8 0006CAC9 5F5E1F00 ..^_èò..à....¡...Ä.F..V..Fª.V=.ò 000080
 88F45689 F2468908 57882606 478826FE 46890447 8826FA5E C464E88E 15880575 u.¡¯.$dé^ª&.G..F±&.G.&.W..F·.V¶. 0000A0
 000A9A53 06FE76FF F85689F6 46890A57 88260847 8826F25E C42974F4 4608F246 F·.F¶t)é^·&.G.&.W..F-.V%.v±.S.Ö. 0000C0
 C0080000 FFFF9AFA 76FFFC76 FFFE76FF CFE8F456 89F24689 F85688F6 46880000 ...F-.V%.F·.V¶Sù.v±.v=.vª......à 0000E0
 0C5688DA 4688088E 006E881E 000004C8 0004CAC9 1F00E8C0 2804E88E 14880574 t.¡..$.+à$..èò..à....¡n..Ä.F..V. 000100
 26C02806 5EC40C74 08460806 46881975 08460806 46880874 C208FE56 89FC4689 .F=.V±.öt..F..F.u..F..F.t.é^.+à& 000120
 28025789 26078926 065EC402 57882607 8826FC5E C418E88E 15880789 26024789 .G.&..¡..$.é^=&..&.W.é^.&..&.W.+ 000140
 E88E1588 05750A46 0808468B D88E00F6 881E5657 000004C8 0008CAC9 1F00E8C0 à$..èò..à...WV.¡-..Ä.F..F.u.¡..$ 000160
 26024789 26C02808 5EC41174 C0080000 002C9A50 16FC468D 0C6A056A 0676FF47 G.v.j.j..F=.P.,....ât.é^.+à&.G.& 000180
 078926FE 5688FC46 880?5EC4 A5F20006 890AD08E F888FC5E C421E88E 14880789 ..¡..$!é^=.«ƒÅ.¿..·Éé^..F=.V±&.. 0001A0
 88067508 46080646 88088E01 50881E00 0008C8C8 C95F5E1F 00E8C028 02??8926 &.W.+à$..^_èùà....¡P..Ä.F..F.u.¡ 0001C0
 52026A00 6AFE5689 FC468900 DA830001 20025788 26078826 065EC400 D5E? ?15 ..Õ(.é^.&.¯&.W.-....Ò..F=.V±j.j.R 0001E0
```

```
Dump of file SATURN:[PCCOMMON.DUMP.DLL]BRO.TMP;1 on 18-APR-1990 10:36:59.83
File ID (519,15,0)   End of file block 272 / Allocated 272

Virtual block number 193 (000000C1), 512 (0200) bytes

F8468908 578826.. 47882606 5EC44272 0A463805 7F497C0C 5638FFFF 00609A50 P.'...;V.|I..;F.rB&^.&.G.&.W..F% 000000
46881474 FA4608F8 4688FA56 89F84689 0A578826 08478826 F85EC411 E8FA5689 .V'$.&^%&.G.&.W..F%.V'.F%.F't..F 000020
0C5618 0A 462BFF56 88FC4688 52E803E8 0274D008 000C5E83 010A6E83 0C56880A ..V..n...^...At.$&$R.F=.V±+F..V. 000040
04478826 F85EC411 E8FA5689 F846890C 5788260A 47882606 5EC40C56 890A4689 .F..V.&^.&.G.&.W..F%.V'$.&^%&.G. 000060
000C5E83 010A6E83 0C56880A 46881474 FA4608F8 4688FA56 89F84689 06578826 &.W..F%.V'.F%.F't..F..V..n...^.. 000080
0014C8C8 C91F00E8 C0280257 89260789 26FA5688 F846880E 5EC4D3E8 0274D008 .At.$&&^..F%.V'&..&.W.+a$..eua.. 0000A0
0C7E8306 7C000C7E 830C74C2 08F65689 F4468914 56881246 88088E01 83881E00 ..|°..A.F..V..F¶.V-.ôt..-..|..-. 0000C0
390C7C00 107E83FE 5689FC46 89025788 26078826 F45EC402 4DE98E15 88067E01 .-.|..ÔM.&^¶&..&.W..F=.V±.-..|.9 0000E0
83067F4F 7C00FE7E 83557400 0A7E8302 25E98E15 8806760E 4639057F 007C1056 V.|...9F.v.|..ÔX..-..tU.-±.|O... 000100
26084788 26EC5EC4 11E8EE56 89EC4689 08578826 06478826 F45EC447 7400FC7E -•.tGá^¶&.G.&.W..F&.VY$.&^&&.G.& 000120
26087507 39260856 88064688 EC5EC418 74EE4608 EC4688EE 5689EC46 890A5788 .W..F&.VY.F&.FYt.&^&.F..V.&9.u.& 000140
C45016EC 46805C73 01FC7E83 067C647F 00FE7E83 CCE801CC E9C02805 75025739 9W.u.+aÔa.$a.-±..d|..-•.s\.F&.P& 000160
EE5688EC 4688F45E C4019FE9 8E148806 74C00806 C483FD0E E80E0477 FF26F45E ^¶&.w..Ô&».&..at.|..Ô..&^¶.F&.VY 000180
000247C7 26000107 C726F45E C4085789 26064789 26F45EC4 0C578926 0A478926 &.G.&.W.&^¶&.G.&.W.&^¶&ú...&úG.. 0001A0
FF26F45E C45016F8 46800160 E9C02802 57892607 89260856 88064688 EC5EC400 .&^&.F..V.&..&.W.+aÔ'..F%.P&^¶&. 0001C0
26078926 08568806 4688F85E C40143E9 8E148806 74C00806 C483FD82 E80E0477 w..Ô.».&..at.|..ÔC.&^%.F..V.&..& 0001E0

Dump of file SATURN:[PCCOMMON.DUMP.DLL]BRO.TMP;1 on 18-APR-1990 10:36:59.83
File ID (519,15,0)   End of file block 272 / Allocated 272

Virtual block number 194 (000000C2), 512 (0200) bytes

F0468910 56180E46 28FE5688 FC46880C E8105688 0E468808 75000C7E 83025789 .W..-..u..F..V.$..F=.V±+F..V..Fþ 000000
26084789 26F85EC4 EE5689EC 46890857 88260647 8826F45E C44175C2 08F25689 .V·.ôuA&^¶&.G.&.W..F&.VY&^%&.G.& 000020
478926FA 5688F846 88F45EC4 06578926 04478926 FA5688F8 4688EC5E C40A5789 .W.&^&.F%.V'&.G.&.W.&^¶.F%.V'&.G 000040
260A4788 26F45EC4 4075F256 394575F0 4639FE56 88FC4688 008EE908 57892606 .&.W.Ô/..F=.V±9FþuE9V·u&&^¶&.G.& 000060
478926FA 5688F846 88EC5EC4 06578926 04478926 F85EC4EE 5689EC46 890C5788 .W..F&.VY&^%&.G.&.W.&^&.F%.V'&.G 000080
F276FF50 16EC468D 6EE80C57 89260A47 8926FA56 88F84688 F45EC40A 57892608 .&.W.&^¶.F%.V'&.G.&.W.$n.F&.P.v· 0000A0
04478826 EC5EC45D E88E1388 0574C008 0CC483FD 00E80EF4 76FFF676 FFF076FF .vþ.v-.v¶.Ô.».&..at.|..$]&^&&.G. 0000C0
0A578926 08478926 EE5688EC 4688F85E C4065789 26044789 26F85EC4 06578826 &.W.&^%&.G.&.W.&^%.F&.VY&.G.&.W. 0000E0
8926FA56 88F84688 EC5EC40A 57892608 478926FA 5688F846 88045FC4 26EC5EC4 &^&&&_..F%.V'&.G.&.W.&^&.F%.V'&. 000100
1E000004 C80010CA C91F00E8 C0280002 57832601 078326F4 5EC40657 89260447 G.&.W.&^¶&...&.W..+a$..eò..à.... 000120
7E010A7E 83067C00 0A7E830C 74C208FE 5689FC46 890E5688 0C4688D8 8E02A388 |Ê..Ä.F..V..F=.V±.ôt..-..|..-..- 000140
E8FD3EE8 0E0676FF 0876FF00 6A0A76FF 006A006A 0C76FF0E 76FF18E8 8E158805 .|..$..v..v.j.j..v.j..v..v..Ô>»$ 000160
0C74C208 FE5689FC 46890E56 880C4688 D88E0521 881E0000 06C8000A CAC91F00 ..eò..à....|!..Ä.F..V..F=.V±.ôt. 000180
6A0C76FF 0E76FF20 74084608 0646883A E88E1588 057E010A 7E83067C 000A7E83 .-..|..-..-.|..$:.F..F.t .v..v.j 0001A0
6A0C76FF 0E76FF12 E80274C0 08FA4689 0288E80E 0676FF08 76FF0A76 FF006A00 .j..v..v..v..ÔE..F*.at.$..v..v.j 0001C0
0E56880C 4688088E 056C881E 00000CC8 000ACAC9 1F00E800 07E80E01 6A006A00 .j.j..Ô..$..eò..à....|l..Ä.F..V. 0001E0

Dump of file SATURN:[PCCOMMON.DUMP.DLL]BRO.TMP;1 on 18-APR-1990 10:36:59.83
File ID (519,15,0)   End of file block 272 / Allocated 272

Virtual block number 195 (000000C3), 512 (0200) bytes

000A7E83 2872013F 8326067F 337C0002 7F8326FC 5EC43074 C208FE56 89FC4689 .F=.V±.ôt=&^=&....|3..&.?.r+.-.. 000000
7C00067E 830C7208 46[illegible]8057F 137C0A56 38000A83 00012D02 57882607 8826257C |%&..&.W.-...Ö.;V.|...;F.r..-..| 000020
08468B4E 7500027F 83265575 013F8326 FC5EC401 92E98E15 88067E01 0C[illegible]8306 ..-..-.|..Ö..&^=&.?.uu&....uN.F. 000040
0674C008 000007A2 9A0677FF 260877FF 260477FF 260174E9 8E158806 740[illegible] 408 .F.t.|..Öt.&.w.&.w.&.w..Å....at. 000060
5EC40A47 89260C47 8926FC5E C4064789 26084789 26C028FC 5EC40159 E98E1 88 |..ÖY.&^=+a&.G.&.G.&^=&.G.&.G.&^ 000080
26078826 FC5EC416 E80A5688 08468808 7500067E 830134E9 07892602 478926FC =&.G.&..Ö4..-..u..F..V.$.&^=&..& 0000A0
06478826 FC5EC438 75C208FA 5689F846 89000A83 0001200A 56180846 28025788 .W.+F..V.-...Ö..F%.V'.ôu;&^=&.G. 0000C0
08578926 06478926 FC5EC40A 57882608 478826F4 5EC4F656 89F44689 08578826 &.W..F¶.V-&^¶&.G.&.W.&^=&.G.&.W. 0000E0
01200257 88260788 26FC5EC4 00A0E904 47892606 478926C0 28065FC4 26FC5EC4 &^=&&_.+a&.G.&.G.Ö..&^=&..&.W.-. 000100
26F45EC4 F65689F4 46890C57 88260A47 88263775 FA56383C 75F84638 000A8300 ..Ö.;FYu<;V'u7&.G.&.W..F¶.V-&^¶& 000120
260A4789 26C0280A 5FC426FC 5EC40C57 89260A47 8926FC5E C4065788 26044788 .G.&.W.&^=&.G.&.W.&^=&&_.+a&.G.& 000140
74C0080C C483FA53 E80EFC76 FFFE76FF F876FFFA 76FF5016 F446804F E8084789 .G.$O.F¶.P.v'.v%.v±.v=.ÔS'.&..at 000160
F45EC40A 57892608 47892604 5FC4260A 57882608 478826F4 5EC459E8 8E138805 .|..$Y&^¶&.G.&.W.&&_.&.G.&.W.&^¶ 000180
76FFF676 FF0477FF 26FC5EC4 06578926 04478926 085FC426 06578826 04478826 &.G.&.W.&&_.&.G.&.W.&^=&.w..v-.v 0001A0
1F00E8C0 2800025F 8326012F 8326FC5E C410E88E 14880574 C0080000 008E9AF4 ¶./....at.|..$.&^=&./.&._..+a$.. 0001C0
7E832E74 C208FE56 89FC4689 12568810 4688088E 0506881E 000008C8 000ACAC9 eò..à....|•..Ä.F..V..F=.V±.ôt..- 0001E0
```

```
Dump of file SATURN:[PCCOMMON.DUMP.DLL]BRD.TMP;1 on 18-APR-1990 10:36:59.83
File ID (519,15,0)   End of file block 272 / Allocated 272

Virtual block number 196 (000000C4), 512 (0200) bytes

 0C720C46 38057F.3 7C0E5638 000A8300 01200257 88260788 26FC5EC4 287C000E ..|(á^•&..&.W.-...Ö.;V.|...;F.r. 000000
 880C4688 0875000A 7E835016 F8468D55 E88E1588 057E010A 7E83067C 000A7E83 .~..|..~..~.¡..$U.F%.P.~..u..F.. 000020
 FFFE76FF 5052000A 8300012D 0E5618OC 46280257 88260788 26FC5EC4 16E80E56 V.$.á^•&..&.W.+F..V.-...Ö.RP.v±. 000040
 89260789 26085688 064688F8 5EC414E8 8E138805 74C0080C C483F967 E80EFC76 v•.Ög*.á..át.¡..$.á^%.F..V.&..&. 000060
 5689FC46 89125688 10468808 8E07CA88 1E000008 C8000ECA C91F00E8 C0280257 W.+áS..èò..à....¡ò..Ä.F..V..F•.V 000080
 187C0E56 38000A83 00012D02 57882607 8826FC5E C4307C00 0E7E8336 74C208FE ±.òt6.-..|0á^•&..&.W.-...Ö.;V.|. 0000A0
 59E88E15 88057508 46080646 88087F01 0A7E830E 7C000A7E 8314720C 4638057F ..;F.r..-..|..-.....F..F.u.¡..$Y 0000C0
 0C462802 57882607 8826FC5E C416E80E 56880C46 88087500 0A7E8350 16F8468D .F%.P.-..u..F..V.$.á^•&..&.W.+F. 0000E0
 E88E1388 0574C008 0CC483F8 88E80EFC 76FFFE76 FF505200 0A830001 200E5618 .V.-...Ö.RP.v±.v•.Ò¡%.á..át.¡..$ 000100
 0CC8000E CAC91F00 E8C02802 57892607 8926065E C4025788 26078826 F85EC418 .á^%&..&.W.á^.&..&.W.+áS..èò..à. 000120
 05750846 08064688 0874C208 FA5689F8 46891056 880E4688 088E0871 881E0000 ...¡q..Ä.F..V..F%.V*.òt..F..F.u. 000140
 19E8F656 89F44689 08578826 06478826 F85EC4FC 4689FE46 89C02878 E88E1588 ¡..$x+à.F±.F•á^%&.G.&.W..F¶.V-$. 000160
 74F6460B F4468800 FE568301 FC4683F6 5689F446 890A5788 26084788 26F45EC4 á^¶&.G.&.W..F¶.V-.F•..V±..F¶.F-t 000180
 8926FE56 88FC4688 065EC414 75025739 261A7507 39260C56 880A4688 F45EC42A *á^¶.F..V.&9.u.&9W.u.á^..F•.V±&. 0001A0
 CAC91F00 E8C028FF FFC247C7 26FFFF07 C726065E C485E814 E8C02802 57892607 .&.W.+áS.$çá^.&ú...&úG...+áS..èò 0001C0
 E88E1588 0575C208 FE5689FC 46890C56 880A4688 088E0924 881E0000 08^8000C ..à....¡$..Ä.F..V..F•.V±.òu.¡..$ 0001E0

Dump of file SATURN:[PCCOMMON.DUMP.DLL]BRD.TMP;1 on 18-APR-1990 10:3ᒐ 59.83
File ID (519,15,0)   End of file block 272 / Allocated 272

Virtual block number 197 (000000C5), 512 (0200) bytes

 47892610 478926C0 280F7707 3926057C 167F0257 39260856 88064688 FC5EC472 rá^•.F..V.&9W...|.&9.w.+á&.G.&.G 000000
 08478826 F85EC411 E8FA5689 F8468908 57882606 478826FC 5EC44DE8 8E15880E .¡..$Má^•&.G.&.W..F%.V*$.á^%&.G. 000020
 5EC408E8 0274000B 00085E83 01066E83 08568806 4688FA56 89F84689 0A578826 &.W..F%.V*.F..V..n...^...Ät.$Üá^ 000040
 09C8881E 000008C8 0008CAC9 1F00E8C0 28105789 260E4789 26FA5688 F84688FC •.F%.V*&.G.&.W.+áS..èò..à....¡à. 000060
 C454E88E 15880575 08460806 46880874 C208FE56 89FC4689 0C56880A 4688088E .Ä.F..V..F•.V±.òt..F..F.u.¡..$Tá 000080
 07892602 478926C0 28065EC4 11750008 FA5689F8 46891057 88260E47 8826FC5E ^•&.G.&.W..F%.V*.Äu.á^.+á&.G.&.. 0000A0
 08478826 F85EC402 57892607 8926065E C4025788 26078826 F85EC42E E88E1688 ¡..$.á^%&..&.W.á^.&..&.W.á^%&.G. 0000C0
 14000301 6E020300 0408CAC9 1F00E8C0 28105789 260E4789 26FC5EC4 0A578826 &.W.á^•&.G.&.W.+áS..èò.....n.... 0000E0
 00000000 00000000 0000190A 5E000200 00001701 E4000200 22000306 58020300 ...X...".. ò.......^........... 000100
 89F24689 C028005A 00F09A50 16E8468D 0676FF08 76FFD08E FFFF881E 000038C8 à8...¡...Ä.v..v..FÒ.P.Þ.Z.+à.F·. 000120
 72F04639 087C0176 E9037EF2 5639EA56 88E84688 00F25683 01F04683 08E8F046 FÞ$..FÞ..V·..FÒ.Võ9V·~.Ôv.|.9FÞr 000140
 88F84688 00800868 9A5016F8 4680006A F076FFF2 76FF0676 FF0876FF 016CE903 .Ö1..v..v..v·.vÞj..F%.P.k.¯..F%. 000160
 FC46890A 57882608 47882602 5FC42604 5EC40656 89044689 D25689D0 4689FA56 V*.FÄ.V0.Fá.Vøá^á&á_.&.G.&.W..F• 000180
 D45EC40A C483FF66 E80E3E77 FF264077 FF26045E C40A76FF 0C76FF01 6AFE5689 .V±j..v..v.á^á&.wà&¯w>.Òf..á.á^á 0001A0
 010C4683 08E80C46 890E4689 C02800F7 00F09A50 1608468D 4277FF26 4477FF26 &.wO&.w8.FA.P.Þ.X.+à.F8.FÉ$..FÉ. 0001C0
 26045EC4 0001E903 720C4639 087C0008 E9037EDE 56390A56 88084688 000E5683 .V8..FÄ.VO9V8~.ÒU.|.9FÉr.Ò1.á^á& 0001E0

Dump of file SATURN:[PCCOMMON.DUMP.DLL]BRD.TMP;1 on 18-APR-1990 10:36:59.83
File ID (519,15,0)   End of file block 272 / Allocated 272

Virtual block number 198 (000000C6), 512 (0200) bytes

 89E65688 E4468801 1808689A 5016E446 80006ADC 76FFDE76 FF4277FF 264477FF .wO&.w8.v8.vÉj..F8.P.k....F8.V¦. 000000
 89EE4689 C0280159 00F09A50 16E04680 4877FF26 4A77FF26 CC5EC4CE 5689CC46 Fä.Voá^a&.wJ&.wH.FÄ.P.Þ.Y.+à.FY. 000020
 5EC46C73 EC463905 7C737FEE 5639E256 88E04688 00EE5683 01EC4683 08E8EC46 F&$..F±..VY..FÄ.Vã9VY.s|.9F±slá^ 000040
 8326F45E C4FFFF08 689A5016 F4468000 6AEC76FF EE76FF48 77FF264A 77FF26CC à&.wJ&.wH.vY.v±j..F¶.P.k...á^¶&. 000060
 473926E6 5688E446 88C85EC4 CA5689C8 46890257 88260788 2680E802 7400067F ...t.$§&..&.W..Fà.Vòá^à.F8.V¦&9G 000080
 0676FF08 76FF5306 0A76FF0C 76FF0E76 FFFC76FF FE76FF1E 750C5739 2624750A .u$&9W.u..v±.v•.v..v..v..S.v..v. 0000A0
 C4D88E00 06881E56 5700003E C8C8C91F FE74E9FF 0FE9FF7A E912C483 000FE80E .Ò...á.Òz.Ò..Òt±.èùà>..W.¡...Äá 0000C0
 4689C028 0000FFFF 9A5016E6 46805052 DC56890A 46890857 88260647 88260A5E ^.&.G.&.W..FÒ.VÈRP.F¦.P.....+à.F 0000E0
 E9037DFE 5638000A 8300012D E85688E6 468800FE 568301FC 468308E8 FC4689FE ±.F•$..F•..V±..F¦.VÒ-...Ö.;V±).Ö 000100
 9A50160E 4680006A FC76FFFE 76FFDA76 FFDC76FF 011BE903 77FC4638 087F0125 %...;F•w.Ò...vÉ.vÒ.v±.v•j..F8.P. 000120
 9A501602 4680006A 50520002 83000105 FE5688FC 4688DA76 FFDC76FF 00000240 ∂....vÉ.vÒ.F•.V±....0.RPj..F0.P. 000140
 390A75E2 46390856 88064688 1575E056 391A750E 46390456 88D24688 0000FFFF .....F0.Vä9F8u.9VÄu..F•.VÄ9Fãu.9 000160
 1AE80000 FA46C707 75E05639 0C750E46 39045688 D2468831 E8FF7FE9 0575E456 Vòu.Ò..$1.F0.Vä9F8u.9VÄu.úF*..$. 000180
 80F888C2 4680FF4C E903E800 01FA46C7 0775E456 390C75E2 46390856 88D64688 .F•.VÄ9Fãu.9Vòu.úF*..$.ÒL..Fò.%. 0001A0
 80EA7E80 1FA5A5A5 A51F161E D27680F8 88CA4680 1FA5A5A5 A51F161E 07160E76 v8.....ÉÉÉÉ..Fò.%.v0...ÉÉÉÉ..-ò. 0001C0
 C24680FC 76FFFE76 FFFA76FF 0E76FF10 76FF1276 FF1FA5F2 0008891F 161EC276 vò...¿..·É..v..v..v..v*.v±.v•.Fò 0001E0
```

```
Dump of file SATURN:[PCCOMMON.DUMP.DLL]BRD.TMP;1 on 18-APR-1990 10:36:59.83
File ID (519,15,0)   End of file block 272 / Allocated 272

Virtual block number 199 (000000C7), 512 (0200) bytes

 1076FF00 6A297400 127E8318 C483003A E80E0676 FF0876FF 0A76FF0C 76FF5016 .P.v..v..v..v..Ò:..á..-..t)j..v. 000000
 08E80E14 76FF1676 FF0A76FF 0C76FF50 16EA468D FC76FFFE 76FFFA76 FF0E76FF .v..vª.v±.v=.Fö.P.v..v..v..v..Ò. 000020
 16EC468D 0676FF08 76FFD88E 01B8B81E 000034C8 CBC95F5E 1FFEBFE9 18C48300 ..á.Öe±.^_èûà4...¡É..Ä.v..v..Fì. 000040
 5639EE56 8BEC4688 00F65683 01F44683 08E8F446 89F64689 C02B0386 C0F09A50 P.Þ...+á.F-.F¶Š..F¶..V-..Fš.VŸ9V 000060
 4680006A F476FFF6 76FF0676 FF0876FF 0161E903 72F44639 087C016B E9 7EF6 --.Ök.|.9F¶r.Òa..v..v..v-.v¶j..F 000080
 77FF2608 5EC4DA56 89D84689 D6568904 4689FE56 8BFC4688 03AD086B 9A5 6FC •.P.k.Ù..F=.V±.Fà.V•.FÅ.VÖá^Åß.w 0000A0
 E2568301 E0468308 E8E04689 E24689C0 2B03F400 F09A5016 DC468042 77FF2644 Dß.wB.FÉ.P.Þ.¶.+à.Fã.FÅŠ..FÅ..Vã 0000C0
 4477FF26 D85EC400 F5E90372 E0463908 7C00FFE9 037EE256 390E5688 DC468800 ..FÉ.VB9Vã-.Ò..|.9FÅr.ÒX.á^Åß.wD 0000E0
 89D04689 EA5688E8 46880018 08689A50 16E8468D 006AE076 FFE276FF 4277FF26 ß.wB.vã.vÅj..FÒ.P.k....FÒ.VÕ.FÅ. 000100
 E8F04689 F24689C0 2B045C00 F09A5016 E4468D48 77FF264A 77FF2600 5EC4D256 V®á^Åß.wJß.wH.FÒ.P.Þ.\.+á.F·.FÞŠ 000120
 8AE90372 F0463908 7C0094E9 037EF256 39E65688 E4468800 F2568301 F0468308 ..FÞ..V·..FÒ.V|9V·-.Ò..|.9FÞr.Ò. 000140
 5EC40344 08689A50 16F8468D 006AF076 FFF276FF 4877FF26 4A77FF26 D05EC400 .á^Åß.wJß.wH.v·.vÞj..F½.P.k.D.á^ 000160
 EA5688E8 4688CC5E C4CE5689 CC468902 57882607 882687E8 02740006 7F8326F8 ½ß....t.Šñß..ß.W..Fä.Vöá^a.FÒ.Võ 000180
 76FF1276 FF1476FF 1676FF18 76FF1A76 FF1C76FF 3C750C57 39264275 0A473926 ß9G.uBß9W.u<.v..v..v..v..v..v..v 0001A0
 77FF2604 77FF2602 5FC42608 5EC40676 FF0876FF 0A76FF0C 76FF5306 0E76FF10 ..v..S.v..v..v..v.á^Äßá_.ß.w.ß.w 0001C0
 1076FF16 76FF1876 FF1A76FF 1C76FFFE 7FE9FEE8 E9FF56E9 20C48300 34E80E02 ..Ò4..á ÒV.ÒŠ±Ò.±.v..v..v..v..v. 0001E0

Dump of file SATURN:[PCCOMMON.DUMP.DLL]BRD.TMP;1 on 18-APR-1990 10:36:59.83
File ID (519,15,0)   End of file block 272 / Allocated 272

Virtual block number 200 (000000C8), 512 (0200) bytes

 1E565700 0030C8CB C91F14C4 830894E8 0E0676FF 0876FF0A 76FF0C76 FF0E76FF .v..v..v..v..v..Ò...á..èûà0..WV. 000000
 01D89A50 16E8468D 5052DE56 890C4689 08578826 06478826 125EC408 8E033288 ¡2..Äá^.ß.G.ß.W..FÉ.VBRP.FÒ.P.Ä. 000020
 000A8300 0120EA56 88E84688 00FE5683 01FC4683 08E8FC46 89FE4689 C0280000 ..+à.F±.F•Š..F=..V±..FÒ.Võ-...Ö. 000040
 14563917 75124639 1056880E 46880102 E90377FC 4638087F 010CE903 7DFE5638 ;V±).Ö....;F•w.Ö...F..V.9F.u.9V. 000060
 FC76FFFE 76FFDC76 FF0E76FF 88E80275 FE563907 75FC4639 1C56881A 46881275 u..F..V.9F•u.9V±u.Š¡.vB.vÉ.v±.v= 000080
 50520002 83000105 FE5688FC 46880C76 FFDE76FF 000005A8 9A5016E0 4680006A j..FÅ.P.´....vB.vÉ.F=.V±....@.RP 0000A0
 E6563905 75E44639 06568804 46881075 011E7E83 00000220 9A501600 4680006A j..FÅ.P. ....-..u..Fà.V•9Fõu.9V! 0000C0
 F888EC46 807675E2 56397875 E0463902 56880046 880086E9 0374001E 7E831974 t..-..t.Ö...FÅ.V@9FÅu(9Vãuv.Fš.½ 0000E0
 1E76FF1F A5A5A5A5 1F161ED0 768DF888 F4468D1F A5A5A5A5 1F161E07 16E0768D .vÅ.....ÉÉÉÉ..F¶.½.vÅ...ÉÉÉÉ..v. 000100
 74C00812 C483003F E80E0676 FF0876FF 1676FF18 76FF5016 EC468D50 16084680 .FÅ.P.Fš.P.v..v..v..v..Ò?..á..àt 000120
 76FF5016 EC468DFC 76FFFE76 FFD876FF DA76FF1E 76FF2076 FF2276FF 2476FF30 0.vŠ.v".v .v..vÒ.vÄ.v±.v=.Fš.P.v 000140
 01B81E00 001AC8CB C95F5E1F FED8E91C C4830092 E80E0A76 FF0C76FF 1276FF14 ..v..v..v..Ò...á.ÒÄ±.^ èûà....¡. 000160
 FF9A5016 EC468D50 16F4468D 5016E646 800E76FF 1076FF0A 76FF0C76 FFD88E05 ..Å.v..v..v..v..Fì.P.F¶.P.Fš.P.. 000180
 4688FFFF 02459A50 16E8468D 5016FC46 800676FF 0876FF50 7502E67E 830000FF ....-Ì.uP.v..v..F•.P.FÒ.P.E....F 0001A0
 8926FE56 88FC4688 125EC41F E8025789 26078926 EA5688E8 4688125E C426E816 .Šßá^..FÒ.Võß..ß.W.Š.á^..F•.V±ß. 0001C0
 CBC91F00 E8C02804 E80001B8 00E80174 000130E8 74C0080B E80DE802 57892607 .ß.W.Š.Š..àtÒ=..tìŠ.¡..Š.+àŠ..èù 0001E0

Dump of file SATURN:[PCCOMMON.DUMP.DLL]BRD.TMP;1 on 18-APR-1990 10:36:59.83
File ID (519,15,0)   End of file block 272 / Allocated 272

Virtual block number 201 (000000C9), 512 (0200) bytes

 77FF2602 5FC4260A 5EC40000 8646C700 00D446C7 D88E065F 881E5657 000056C8 àV..WV.¡_..ÄúFà..úFÑ..á^.ßá_.ß.w 000000
 260477FF 26025FC4 260A5EC4 07300126 9A5016C4 468D5016 FC468002 77FF2604 .ß.w..F•_P.Fá.P.ß.O.á^.ßá_.Ï.w.ß 000020
 F4468D06 77FF2608 77FF260A 5EC4069C 02459A50 16C0468D 5016F846 800277FF .w..F½.P.Fà.P.E...á^.ß.w.Ï.w..F¶ 000040
 46890C57 88260A47 88260A5E C41E7500 147E8324 7501127E 83000005 1E9A5016 .P......-..uß.-..u.á^.ß.G.ß.W..F 000060
 F44E8800 D2830002 05145688 1246883C E80001B6 46C7AC56 89AA4689 D2568900 Å.V@.F¯.V¯úFÑ..Š<.F..V.....@..N¶ 000080
 89D04689 10578826 0E478826 0A5EC41C 75D33820 75C13800 D88301E9 83F65E88 .^-.Ö..Ù.;èu ;ßu.á^.ß.G.ß.W..FÅ. 0000A0
 88468902 57882607 88260E5E C401F3E9 1A468800 018646C7 AC5689AA 46890256 V@.F¯.V¯úFÑ...F.Òµ.á^.ß..ß.W..F¡ 0000C0
 890A5788 26084788 268E5689 8C468918 56131646 03065788 26044788 268A5689 .Voß.G.ß.W..F..V..F¥.V/ß.G.ß.W.. 0000E0
 E9037500 867E83E0 56890E46 89185613 1646030E 5788260C 4788260C 56890A46 FÖ.VÉß.G.ß.W..F..V..Fß.VÅ.-Ñ.u.Ö 000100
 1816E09A C876FF52 5016E446 8DCA5689 C8468908 57882606 47882 6AA 5EC4009B ..á^¯ß.G.ß.W..Fà.Vò.Fß.PR.và.Å.. 000120
 01F06E83 00EE5E83 01EC6E83 00EA5683 01E84683 00E65683 01E44683 08C48309 ..á..Fö..VÌ..FÒ..Võ..nš..^Ÿ..nÞ. 000140
 CC7E8300 0009529A 5016CC46 805016E4 46805016 DA468050 16884680 00F25E83 .^·..F¡.P.FÒ.P.FÒ.P.Fä.P.R....~ä 000160
 FF0001E2 46C705E8 0004E246 C70775C6 56390C75 C44639C2 5688C046 88387400 .tß.Fá.Vò9Fáu.9Váu.úFã..Š.úFã... 000180
 1646880C E80001D4 46C78056 89AE4689 098700FC 9A505299 E24688C4 76FFC676 vó.vá.Fã.RP.•....FÛ.V¯úFÅ..Š..F. 0001A0
 89884689 185613:. 46030257 88260788 260E5EC4 0108E980 5689AE46 89185688 .V..FÛ.V¯Ö..á^.ß..ß.W..F..V..F¡. 0001C0
 46891856 131646.. 0A578826 08478826 8E56898C 46890657 88260447 88268A56 Voß.G.ß.W..F¥.V/ß.G.ß.W..F..V..F 0001E0
```

```
Dump of file SATURN:[PCCOMMON.DUMP.DLL]BRD.TMP;1 on 18-APR-1990 10:36:59.83
File ID (519,15,0)   End of file block 272 / Allocated 272

Virtual block number 202 (000000CA), 512 (0200) bytes

 8826AA5E C40098E9 03750086 7E83E056 890E4689 0E578826 0C478826 DC5689DA Ö.VÉ&.G.&.W..F8.VÁ.-Ñ.u.Ö..á^`&. 000000
 E4468308 C483FFFF 16E09AC8 76FF5250 16E4468D CA5689C8 46890857 88260647 G.&.W..Fà.Vò.FÖ.PR.vä.Á....á..FÖ 000020
 88468D00 F25E8301 F06E8300 EE5E8301 EC6E8300 EA568301 E8468300 E6568301 ..V|..FÒ..Võ..nå..^V..nÞ..^·..F| 000040
 88F84688 387400CC 7E830000 FFFF9A50 16CC468D 5016E446 8D50160A 46805016 .P.FÖ.P.Fö.P.Fä.P......-ä.t8.F%. 000060
 4688FC76 FFFE76FF 0001E246 C705E800 04E246C7 0775FE56 390C75FC 4639FA56 V*9F•u.9V±u.úFã..Š.úFå...v±.v•.F 000080
 89AE4689 18568816 46880CE8 00010446 C7805689 AE4689FF FF00FC9A 505299E2 å.RP.•....FÛ.V¯úFå..Š..F..V..FÚ. 0000A0
 C4107414 46081246 8800E8FD FEE90375 000130FE FFE90375 C00811E8 13E88056 V¯Š.Š..åu.Ö.±•..u.Ö±•Š..F..F.t.á 0000C0
 88124688 0000FFFF 9A501688 4680006A 1276FF14 76FF0677 FF260877 FF260A5E ^.&.w.&.w..v..v.j..F|.P......F.. 0000E0
 260A5EC4 25740338 0475C138 00088301 E983F65E 88F44E88 00028300 01051456 V.....8..N¶.^-.Ö..Ü.;éu.;ÆtXá^.& 000100
 0009D89A 50160A46 80006A50 52000283 00010514 56881246 880677FF 260877FF .w.&.w..F..V.....8.RP|..FÖ.P.Ä.. 000120
 DA768D08 7F8D1FA5 A5A5A51F 161E8876 8DF8880E 5EC40001 3847C726 0A5EC400 .á^.&úG8..á^..«.v|...ÉÉÉÉ.....vÖ 000140
 FF845689 82468908 56890646 890C5788 260A4788 260A5EC4 1FA5A5A5 A51F161E ...ÉÉÉÉ.á^.&.G.&.W..F•.VÄ.Fÿ.VÇ. 000160
 12468820 74144608 12468810 C48302D2 E80E2076 FF501688 46805306 50521A76 v.RP.S.F|.P.v .Ö8..á..F..F.t .F. 000180
 12468843 75D33847 75C13800 D88301E9 83F65E88 F44E8800 D2830001 05145688 .V.....8..N¶.^-.Ö..Ü.¿éuG;ÆuC.F. 0001A0
 FF1E76FF 2076FFAE 76FF8076 FF006A00 01CE46C7 05E80000 CE46C707 75144608 .F.u.úFö..Š.úFö..j..v¯.vÜ.v .v.. 0001C0
 1CC48303 CCE80E06 76FF0876 FF0A76FF 0C76FFCE 76FF1A76 FF501688 46801C76 v..F|.P.v..vö.v..v..v..v..Öä..á. 0001E0

Dump of file SATURN:[PCCOMMON.DUMP.DLL]BRD.TMP;1 on 18-APR-1990 10:36:59.83
File ID (519,15,0)   End of file block 272 / Allocated 272

Virtual block number 203 (000000CB), 512 (0200) bytes

 5EC4AE76 FF8076FF 1A76FF1C 76FF1E76 FF2076FF AA76FFAC 76FF3074 00047E83 .~á.t0.v¨.v˙.v .v..v..v..v¯.vÚá^ 000000
 FF1C76FF 1E76FF20 76FF18C4 830886E8 0E0676FF 0876FF06 77FF2608 77FF26AA `&.w.&.w..v..v..ÖÑ..á..v .v..v.. 000020
 C483F7EE E80E0676 FF0876FF 0A76FF0C 76FF0E76 FF1076FF 1276FF14 76FF1A76 v..v..v..v..v..v..v..v..v..ÖŸ%.á 000040
 88260A40 8826065E C402E6C1 12768808 8E06E888 1E560000 32C8CBC9 5F5E1F18 ..^ èùå2..V.¡Ò..Á.v.é|.á^.&.@.&. 000060
 01C0E903 7F000130 E646890A 478826D2 5EC40456 89024689 EE5689EC 46890C50 P..Fä.VŸ.F8.Vàá^8&.G..F|=....Öá. 000080
 01F04683 08E8F046 89F24689 C02808D7 00F09A50 16E8468D 4877FF26 4A77FF26 &.wJ&.wH.FÒ.P.Þ.ø.+á.F·.FÞŠ..FÞ. 0000A0
 26025EC4 0184E90` 72F04639 087C018E E9037EF2 5639EA56 88E84688 00F25683 .V·..FÒ.Vö9V·-.Ö..|.9FÞr.Ö..á^8& 0000C0
 067F8326 FC5EC40. 1508689A 5016FC46 8D006AF0 76FFF276 FF4877FF 264A77FF .wJ&.wH.v·.vÞj..F•.P.k...á^•&... 0000E0
 D0563907 75CE4639 08568806 46880056 89CE4689 02578826 07882687 E8027400 .t.Šñ&..&.W..Fö.VÅ.F..V.9Föu.9VÅ 000100
 5016F446 8D006A00 6A006A06 77FF2608 77FF26CE 5EC43875 00127E83 98E80275 u.Š..~..uBá^o&.w.&.w.j.j.j..F¶.P 000120
 00000C58 9A50160E 4680006A 016A006A 0677FF26 0877FF26 CE5EC400 000C3C9A .<...á^o&.w.&.w.j.j.j..F8.P.[... 000140
 C400000C 809A5016 F4468000 6A0A76FF 0C76FF06 77FF2608 77FF26CE 5EC442E8 $Bá^o&.w.&.w..v..v.j..F¶.P.....á 000160
 9A50160E 4680006A 505200DA 8300012D 0C56880A 46880677 FF260877 FF26CE5E ^o&.w.&.w..F..V.·...Ö.RPj..F8.P. 000180
 E05688DE 46884075 FA563945 75F84639 E45688E2 468800A5 E9144688 00000588 .....F.ÖÉ..Fä.Vö9F%uÆ9V*uQ.F8.VÅ 0001A0
 CE5EC40C 56890A46 89E45613 E2460306 57882604 4788260E 5EC40856 89064689 .F•.VÄá^.&.G.&.W..Fã.VÖ.FÖ.VÉá^ö 0001C0
 88DE4688 61E80000 00279A50 16064680 006A0A76 FF0C76FF 0677FF26 0877FF26 &.w.&.w..v..v.j..F•.P.'...Ša.F8. 0001E0

Dump of file SATURN:[PCCOMMON.DUMP.DLL]BRD.TMP;1 on 18-APR-1990 10:36:59.83
File ID (519,15,0)   End of file block 272 / Allocated 272

Virtual block number 204 (000000CC), 512 (0200) bytes

 89064689 E056130E 46030257 88260788 260E5EC4 3F75F656 394475F4 4639E056 VÄ9F¶uD9V-u?á^.&..&.W..F8.VÅ.F•. 000000
 6A0A76FF 0C76FF06 77FF2608 77FF26CE 5EC40C56 890A4689 E45688E2 46880856 VÄ.Fä.VÖ.FÖ.VÉá^o&.w.&.w..v..v.j 000020
 FE5CE900 E8FF4FE9 03750001 30A974C0 080EE810 E800000A 1D9A5016 06468000 ..F•.P.....Š.Š..åt`•..u.ÖO.Š.Ö\± 000040
 88260647 8826105E C4014FE9 03750006 7E83088E 0840881E 000028C8 C8C95E1F .^èùå(...¡N..Ä.-..u.ÖO.á^.&.G.&. 000060
 C4F25689 F0468938 57882636 478826E0 5EC4E256 89E04689 F65689F4 46890857 W..F¶.V-.FÅ.Väá^Å&.G6&.W8.FÞ.V·á 000080
 57882606 478826FC 5EC4FE56 89FC4689 E65689E4 46891057 88260E47 88260C5E ^.&.G.&.W..FÖ.V|.F•.V±á^•&.G.&.W 0000A0
 4639EA56 89E84689 38578826 36478826 D85EC40A 56890846 89EE5689 EC468908 ..F±.VŸ.FÄ.VÖá^Å&.G6&.W8.FÖ.Vö9F 0000C0
 C406578B 26044788 26085EC4 00C4E914 46880008 E90374F2 563900E0 E90374F0 Þt.ÖÅ.9V·t.ÖÅ..F.Öá.á^.&.G.&.W.á 0000E0
 8D0277FF 260477FF 26025FC4 26E05EC4 44732247 3926067C 4C7F2457 3926F05E ^Þ&9W$.L|.&9G"sDá^Å&á .&.w.&.w.. 000100
 C40E5613 DC460306 57882604 47882608 5EC40E60 02459A50 160C468D 5016F846 F%.P.FÉ.P.E.m.á^.&.G.&.W..FÉ.V8á 000120
 02578826 07882608 5EC470E8 00010096 87C726F0 5EC42457 89262247 8926F05E ^Þ&.G"&.W$á^Þ&ú.....Špá^.&..&.W. 000140
 0277FF26 0477FF26 025FC426 E05EC443 731E4739 26067C48 7F205739 26F05EC4 á^Þ&9W .K|.&9G.sCá^Å&á_.&.w.&.w. 000160
 C4FA5613 F8460302 57882607 8826085E C4071202 459A5016 DC468D50 16F8468D .F%.P.FÉ.P.E...á^.&..&.W..F%.V*á 000180
 7500013D 9A74C008 0EE810E8 00010096 87C726F0 5EC42057 89261E47 8926F05E ^Þ&.G.&.W á^Þ&ú.....Š.Š..åt.=..u 0001A0
 C402E6C1 0E768800 00F646C7 D88E0D4A 881E5600 0022C8C8 C91F00E8 FF30E903 .Ö0.Š..èùå"..V.¡J..ÄúF-...v.é|.á 0001C0
 57882606 478826E6 5EC4E856 89E64689 FA5689F8 46890C50 88260A40 88260A5E ^.&.@.&.P..F%.V*.F|.VÖá^|&.G.&.W 0001E0
```

File ID (519,15,0) End of file block 272 / Allocated 272

Virtual block number 205 (000000CD), 512 (0200) bytes

```
5EC41A75 08467F83 26077404 467F8326 E65EC400 CDE91046 8BF45689 F2468908 ..F·.V¶.F.Öë.á^|&..F.t.&..F.u.á^ 000000
46883374 00207E83 06751C57 39260C75 1A473926 E65EC406 57882604 47882612 .&.G.&.W.á^|&9G.u.&9W.u..~ .t3.F 000020
1C578826 1A478926 E056890E 46891857 88261647 8826F056 89EE4689 1E56881C ..V..FŸ.VÞ&.G.&.W..F8.VÅ&.G.&.W. 000040
7F832607 7401467F 8326E65E C475E800 01F646C7 E45689E2 46891E56 131C4603 .F..V..Fä.VöúF-..Šuá^|&..F.t.&.. 000060
207E8306 75185739 260C7516 473926E6 5EC40257 88260788 26125EC4 19750246 F.u.á^.&..&.W.á^|&9G.u.&9W.u..- 000080
DE46891E 56131C46 03185788 26164788 26EC5689 EA46891E 56881C46 88337400 .t3.F..V..Fõ.V&&.G.&.W..F..V..F8 0000A0
01309574 C0080EE8 10E80001 F646C7E4 5689E246 891C5788 261A4788 26E05689 .VÅ&.G.&.W..Fã.VöúF-..Š.Š..ât.=. 0000C0
EA468D0E 76FF1076 FF1E7500 0E7E8300 82E90375 00F67E83 00E8FF27 E9037500 .u.Õ'.Š..—.u.Õý..~..u..v..v..Fõ 0000E0
0677FF26 0877FF26 0A5EC438 E810C483 F856E80E 0A76FF0C 76FF016A 006A5016 .Pj.j..v..v..ÒV«.á.Š;á^.&.w.&.w. 000100
DA830001 20FE5688 FC468850 16EA4680 0E76FF10 76FF0000 07439A50 16FC4680 .F•.P.C....v..v..Fõ.P.F•.V±-...Ö 000120
9AE676FF E876FF50 16DE4680 006A006A 10C483F8 19E80E0A 76FF0C76 FF505200 .RP.v..v..Ò.«.á.j.j..F8.P.vÒ.v|. 000140
83FFFF00 009A5052 F45689F2 46890857 88260647 8826E65E C40CC483 FFFF0887 ......á.á^|&.G.&.W..F·.V¶RP...... 000160
0BF3E80E 0676FF08 76FFF276 FFF476FF 1076FF16 76FF1876 FF1A76FF 006A04C4 á.j..v..v..v..v..v¶.v·.v..v..Òµ. 000180
9000F09A 5016F046 800676FF 0876FFD8 8E0E8088 1E000018 C8C8C95E 1F12C483 .á..^èùà....¡¯..Å.v..v..FÞ.P.Þ.. 0001A0
99E9037E F65639F2 5688F046 8800F656 8301F446 8308E8F4 4689F646 89C0280B .+à.F-.F¶Š..F¶..V-..FÞ.V·9V--.Ö. 0001C0
689A5016 FC468000 6AF476FF F676FF06 76FF0876 FF008FE9 0372F446 39087C00 .|.9F¶r.Ö...v..v..v-.v¶j..F•.P.k 0001E0
```

Dump of file SATURN:[PCCOMMON.DUMP.DLL]BRD.TMP;1 on 18-APR-1990 10:36:59.83
File ID (519,15,0) End of file block 272 / Allocated 272

Virtual block number 206 (000000CE), 512 (0200) bytes

```
EA5689E8 46890C57 88260A47 88260A5E C4EE5689 EC4689FE 5688FC46 88109F08 ....F•.V±.F&.VŸá^.&.G.&.W..FÒ.Võ 000000
76FFEE76 FF53060E 76FF1076 FF5016F8 46801276 FF1876FF E84689EA 4689C028 +á.Fõ.FÒ.v..v..F½.P.v..v..S.vŸ.v 000020
76FF1276 FF1476FF 1676FF18 76FFE876 FFEA76FF 2874C008 14C48300 38E80EEC &.Ò8..á..ât+.võ.vÒ.v..v..v..v..v 000040
003CC8CB C91FFF51 E918C483 0575E80E 0676FF08 76FFEC76 FFEE76FF F876FFFA ".v½.vŸ.v&.v..v..Òu..á.ÒQ..èùà<. 000060
08051FA5 A5A5A5DA 8E1E0716 F088F87E 8D105688 0E468808 8E108D88 1E565700 .WV.¡...Å.F..V..-½.Þ....ÒEEEE... 000080
C483081F 16E09A06 76FF0876 FF501602 46801FA5 A5A5A5DA 8E1EF088 C47E8000 ..-á.Þ..ÒEEEE..F8.P.v..v..Å....á 0000A0
52501602 46805016 E44680CE 5689CC46 89005E05 04578826 02478826 065EC408 .á^.&.G.&.W..^..Fa.Vö.FÒ.P.F8.PR 0000C0
01EC6E83 00EA5683 01E84683 00E65683 01E44683 10C48302 7EE80E53 06CC76FF .va.S.Ò—..á..FÒ..V|..FÒ..Võ..nš. 0000E0
50160046 805016E4 46805016 C4468050 16F8468D 00F25E83 01F06E83 00EE5E83 .^Ÿ..nÞ..^·..F½.P.Fá.P.FÒ.P.FÅ.P 000100
0E0A76FF 0C76FF06 76FF0876 FF1876FF 0122E9C0 28057500 007E8300 0008599A .Y....-Å.u.+àÕ"..v..v..v..v..v.. 000120
0C76FF0E 76FF1076 FF5016E4 46801676 FF0103E9 C0280574 C0080AC4 830326E8 Ò&..á..ât.+àÕ...v..FÒ.P.v..v..v. 000140
56050457 88260247 8826065E C4000FE9 C0280574 C0080EC4 8300F0E8 0E0A76FF .v..ÒÞ..á..ât.+àÕÕ.á^.&.G.&.W..V 000160
E9C02805 74FE5639 0575FC46 39CA5688 C8468800 82E91646 88F65689 F4468900 ..F¶.V-.F.Òý..Fà.Vò9F•u.9V±t.+àÕ 000180
04E246C7 07750657 39260075 04473926 F45EC406 57882604 47882 6CC 5EC40080 ¯.á^a&.G.&.W.á^¶&9G.u.&9W.u.úFã. 0001A0
8926125E C4130F00 FC9A0477 FF260677 FF265052 99E24688 0001E246 C705E800 .Š.úFã...Fã.RP&.w.&.w..•...á^.&. 0001C0
8826CC5E C457E8C0 280474FA 56390575 F84639C6 5688C446 8866E802 57892607 .&.W.Šf.Fá.V69F½u.9V¹t.+àŠWá^ä&. 0001E0
```

Dump of file SATURN:[PCCOMMON.DUMP.DLL]BRD.TMP;1 on 18-APR-1990 10:36:59.83
File ID (519,15,0) End of file block 272 / Allocated 272

Virtual block number 207 (000000CF), 512 (0200) bytes

```
880001E2 46C705E8 0004E246 C7077502 57392600 75073926 F45EC402 57882607 .&.W.á^¶&9.u.&9W.u.úFã..Š.úFã... 000000
080EE810 E8025789 26078926 125EC408 8E00FC9A 37FF2602 77FF2650 5299E246 Fã.RP&.w.&.7.=...á^.&..&.W.Š.Š.. 000020
1165881E 5600001C C8C8C95F 5E1F00E8 00018800 E8FF42E9 03750001 30A474C0 âtÊ=..u.Ò8.Š.¡..Š..^_èùà...V.¡e. 000040
02E6C1EE 768800E5 E9037C02 EE7E83EE 46FF03E8 0000EE46 C70000E8 46C7D88E .ÄúFÒ..úFŸ..Š..FŸ.-Ÿ¯|.Ò1..vŸèl. 000060
76FF0C76 FF04C483 104200FE 9A5052E6 5689E446 890C5088 260A4088 26065EC4 á^.&.a.&.P..FÒ.V|RP.±.B..á..v..v 000080
0000FFFF 9A5016F0 46805016 F8468050 16EA4680 50520036 05E65688 E446880A ..Fõ.V|.6.RP.Fõ.P.F½.P.FÞ.P..... 0000A0
88260C47 88261975 06573926 1F750447 3926FE56 88FC4688 0A5EC460 E8124688 .F.Š'á^..F•.V±&9G.u.&9W.u.&.G.&. 0000C0
3926FA56 88F84688 0A5EC438 E80001E8 46C70575 06573926 08750447 39260E57 W.&9G.u.&9W.u.úFÒ..Š;á^..F%.V²&9 0000E0
01E846C7 05750A57 39260875 08473926 02578826 07882618 75025739 261E7507 .u.&9W.u.&..&.W.&9G.u.&9W.u.úFÒ. 000100
88E44688 0E76FF10 76FF2674 00E87E83 00E89774 000130CC 74C00808 E800E800 .Š.Š..âta=..t.Š..-Ò.t&.v..v..FÒ. 000120
28FF0FE9 07E80001 88057400 EC7E8300 00FFFF9A 5016EC46 80505200 3605E656 V|.6.RP.F&.P......-&.t.¡..Š.Ò..+ 000140
F088F888 1056880E 4688125E C4088E13 3E881E56 57000002 C8C8C95E 1F00E8C0 âŠ..^èùà...WV.¡>..Äá^..F..V..«.Þ 000160
C1FE7688 00C8E903 7C04FE7E 83FE46FF 03E80000 FE46C71F A5F20008 890A8E1E ..Ò¿...Ë.úF±..Š..F±.-±.|.Òà..v±è 000180
C4008AE9 FE468800 A8E90374 FF487883 260082E9 0374FF46 78832606 5EC402E6 |.á^.&.xF.t.Òý.&.xH.t.Ò'..F±Ò..á 0001A0
06578926 04478926 125EC406 57182604 47282 60A 5EC40657 88260447 88260E5E ^.&.G.&.W.á^.&+G.&.W.á^.&.G.&.W. 0001C0
260C4789 26125EC4 06571326 04470326 0A5EC40E 5788260C 4788260E 5EC47FE8 $.á^.&.G.&.W.á^.&.G.&.W.á^.&.G.& 0001E0
```

```
Dump of file SATURN:[PCCOMMON.DUMP.DLL]BRD.TMP;1 on 18-APR-1990 10:36:59.83
File ID (519,15,0)   End of file block 272 / Allocated 272

Virtual block number 208 (00000000), 512 (0200) bytes

 26078926 125EC402 57182607 28260A5E C4025788 26078826 0E5EC45C EB0E5789 .W.$\á^.&..&.W.á^.&+.&.W.á^.&..& 000000
 47892612 5EC40257 ,3260703 260A5EC4 0A578826 08478826 0E5EC43C EB025789 .W.$<á^.&.G.&.W.á^.&..&.W.á^.&.G 000020
 E8C67400 0330A874 00023080 74000130 FF6FE903 75C00818 EB1AEB0A 57892608 .&.W.$.$..áu.Öo.=..t.=..t¨=..tó$ 000040
 0A478826 065EC47D 74000E7E 83088E14 4F881E00 0026C8C8 C95F5E1F FF2CE900 .Õ,..^ èùà&...¡O..Ä.-..t)á^.&.G. 000060
 5689EC46 89085788 26064788 260A5EC4 DC56890A 4689EA56 89E84689 0C578826 &.W..FÕ.Võ.FÖ.VÉá^Ö&.G.&.W..Fâ.V 000080
 890E4689 38578826 36478826 0A5EC401 35E90001 8806750C 56390875 0A4639EE Ÿ9F.u.9V.u.¡..Õ5.á^.&.G6&.W8.F8. 0000A0
 0106E900 01880675 0C563908 750A4639 E05688DE 46882974 E04608DE 4688E056 VÁ.F8.FÁt).F8.VÁ9F.u.9V.u.¡..Õ.. 0000C0
 5788260A 47882606 5EC400EC E9CFEBE0 5689DE46 89385788 26364788 260E5EC4 á^8&.G6&.W8.F8.VÁ$üÕ&.á^.&.G.&.W 0000E0
 56890A46 89EA5688 E84688E6 5689E446 89105788 260E4788 26EA5689 E846890C ..FÒ.Võ&.G.&.W..FÒ.V¦.FÒ.Võ.FÖ.V 000100
 5EC4EE56 89EC4689 08578826 06478826 0A5EC4FA 5689F846 89E65688 E44688DC É.FÒ.V¦.F%.Vªá^Ö&.G.&.W..Fâ.VŸá^ 000120
 F65689F4 46893857 88263647 8826EC5E C4FE5689 FC468908 57882606 478826F8 ½&.G.&.W..F=.V±á^$&.G6&.W8.F¶.V- 000140
 E05689DE 4689FE56 88FC4688 E246FF20 E80000E2 46C7E056 890E4689 C28CC388 .û.ô.F8.VÁúFã..$ .Fã.F=.V±.F8.VÁ 000160
 36478826 F45EC411 EB487D02 E27E83F6 5689F446 89385788 26364788 26FC5EC4 á^=&.G6&.W8.F¶.V-.-ã.)K$.á^¶&.G6 000180
 F0468938 57882636 4788260E 5EC42E74 F64608F4 4688F656 89F44689 38578826 &.W8.F¶.V-.F¶.F-t.á^8&.G6&.W8.FÞ 0001A0
 89EBE056 890E4689 F25688F0 468814E8 00018805 750C5639 0A750A46 39F25689 .V 9F.u.9V.u.¡..$..FÞ.V .F8.VÁ$¿ 0001C0
 5689F846 890C5688 0A468808 8E154F88 1E565700 002CC8C8 C91F00E8 C02B8FEB $.+â$..èùà,..WV.¡O..Ä.F..V..F%.V 0001E0

Dump of file SATURN:[PCCOMMON.DUMP.DLL]BRD.TMP;1 on 18-APR-1990 10:36:59.83
File ID (519,15,0)   End of file block 272 / Allocated 272

Virtual block number 209 (00000001), 512 (0200) bytes

 47892606 47892604 5EC40789 26024789 26C02804 5EC40656 89044689 006E05FA *.n..Få.Vøá^å+á&.G.&..á^á&.G.&.G 000000
 880E4688 D45EC41F E8065789 26044789 26105688 0E468804 5EC427E8 12468804 ..F.$'á^å.F..V.&.G.&.W.$.á^å.F.. 000020
 009487C7 260A5EC4 00E80074 00013DE8 74C00808 EB0DEB02 57892607 89261056 V.&..&.W.$.$..åtÒ=..tÅ$.á^.&ú... 000040
 C3880A5E C41FA5F2 0008890A 8E1E0716 F088DC7E 80000605 0C56880A 46880001 ...F..V.....-É.Þ....Ö¿..·É.á^..û 000060
 04329AF8 76FFFA76 FF1476FF 1676FF1F A5F20008 890A8E1E F088067F 80001605 .......Þ..Ö¿..·É..v..v..vª.v½.2. 000080
 C40CC483 119C0E79 9A0A76FF 0C76FF06 76FF0876 FF1476FF 1676FF08 C483179A ...á..v..v..v..v..v..v..y....á.á 0000A0
 1A76FF1C 76FF1476 FF1676FF 1876FF1F A5F20008 891F161E DC768006 7F800A5E ^.....vÉ...¿..·É..v..v..v..v..v. 0000C0
 76FF006A 18C48300 E4E80E06 76FF0876 FF0A76FF 0C76FF0E 76FF1076 FF1276FF .v..v..v..v..v..v..v..ÒÕ..á.j..v 0000E0
 0A5EC412 C4830479 E80E0676 FF0876FF 0A76FF0C 76FF1276 FF1476FF 1676FF18 ..v..v..v..v..v..v..v..Òy..á.á^. 000100
 1676FF18 76FF006A 20740018 7E83FE56 89FC4689 0A578826 08478826 025FC426 &á_.&.G.&.W..F•.V±.-..t j..v..v. 000120
 4680FC76 FFFE76FF 0080E912 C4830441 E80E5052 0A76FF0C 76FF1276 FF¡ ¯6FF .v..v..v..v.RP.ÒA..á.Õ...v±.v•.F 000140
 EE5688EC 468800F2 568301F0 468308EB F04689F2 4689C028 188200F0 9A50 'EC å.P.Þ...+á.F·.FÞ$..FÞ..V·..Få.VŸ 000160
 9A5016F4 4680006A F076FFF2 76FFFC76 FFFE76FF 4C73F046 39057C53 7FF25¿39 9V·.S|.9FÞsL.v±.v•.v·.vÞj..F¶.P. 000180
 76FF1276 FF1476FF 1676FF18 76FF006A DA5689D8 4689F656 88F44688 10E10868 k.Ä..F¶.V-.FÄ.VÒj..v..v..v..v..v 0001A0
 0022C8C8 C95F5E1F 9AE812C4 8303C0E8 0E3E77FF 264077FF 26085EC4 0A76FF0C ..v.á^Å&.wå&.w>.Òà..á.$..^ èùà". 0001C0
 4689C028 192100F0 9A5016E8 46804277 FF264477 FF260A5E C4088E16 D1881E00 ..¡|..Aá^.&.wÒ&.w8.FÒ.P.Þ.Ï.+á.F 0001E0

Dump of file SATURN:[PCCOMMON.DUMP.DLL]BRD.TMP;1 on 18-APR-1990 10:36:59.83
File ID (519,15,0)   End of file block 272 / Allocated 272

Virtual block number 210 (00000002), 512 (0200) bytes

 4639087C 00E8E903 7EEE5639 EA5688E8 468800EE 568301EC 468308E8 EC4689EE Ÿ.F$$..Få..VŸ..FÒ.Võ9VŸ-.Õ$.|.9F 000000
 689A5016 F8468000 6AEC76FF EE76FF42 77FF2644 77FF260A 5EC400E1 E90372EC år.ÕÄ.á^.&.wÒ&.w8.vŸ.v$j..F%.P.k 000020
 E80275E4 56390775 E2463916 56881446 88E45689 E24689FA 5688F846 88195408 .T..F%.Vª.Fã.VÕ.F..V.9Fâu.9Vôu.$ 000040
 08E8F446 89F64689 C0281995 00F09A50 16F0468D 4877FF26 4A77FF26 E25EC4A5 Eá^ã&.wJ&.wH.FÞ.P.Þ...+á.F-.F¶$. 000060
 77FF26E2 5EC46A73 F4463905 7C717FF6 5639F256 88F0468B 00F65683 01F44683 .F¶..V-..FÞ.V·9V-.q|.9F¶sjá^ã&.w 000080
 7400067F 8326FC5E C4184608 689A5016 FC468000 6AF476FF F676FF48 77FF264A J&.wH.v-.v¶j..F•.P.k.F.á^•&....t 0000A0
 1A76FF12 76FF1C76 FFE64689 04478826 E05689DE 46890257 88260788 2680EB02 .$§&..&.W..F8.VÁ&.G..F|.v..v..v. 0000C0
 C483000C E80E0676 FF0876FF E276FFE4 76FFDE76 FF52500E 76FF1076 FF1876FF .v..v..v.PR.v8.võ.vå.v..v..Ò...á 0000E0
 FF260E5E C40000E4 46C7D88E 18C3B81E 56570000 44C8C8C9 1FFEFFE9 FF7CE91A .Õ|.Õ.±.èùàD..WV.¡ú..ÄúFÕ..á^.&. 000100
 FF260877 FF260E5E C400001A 2F9A5016 F0468D12 76FF006A 006A0677 FF260877 w.&.w.j.j..v..FÞ.P./...á^.&.w.&. 000120
 DC46890E 4689C028 7AE81C46 8800001B 829A5016 D4468012 76FF016A 006A0677 w.j.j..v..Få.P.ÿ....F.$z+å.F8.FÉ 000140
 08468815 7502467F 83260774 01467F83 260A5EC4 E25689E0 46891656 88144688 .F..V..FÁ.Vãá^.&..F.t.&..F.u..FÄ 000160
 DE56890C 46891656 88144688 4CE80001 E446C705 74F65639 0575F446 390A5688 .VÒ9F¶u.9V-t.úFÕ..$L.F..V..FÉ.V8 000180
 39065688 D4468815 7508467F 83260774 04467F83 260A5EC4 E04689E2 4689C028 +å.Fã.FÅá^.&..F.t.&..F.u..Få.Vø9 0001A0
 00E8FF7A E9037500 0130BE74 C0080EE8 10E80001 E446C705 74F25639 0575F046 FÞu.9V·t.úFÕ..$.$..åt/=..u.Õz.$. 0001C0
 4689E256 13E04603 0A568808 4688CE56 89CC4689 DE56130C 46030656 8804468B .Få.Vø.FÉ.V8.Fã.Võ.FÁ.VÕ.FÅ.Vã.F 0001E0
```

```
Dump of file SATURN:[PCCOMMON.DUMP.DLL]BRD.TMP;1 on 18-APR-1990 10:36:59.83
File ID (519,15,0)   End of file block 272 / Allocated 272

Virtual block number 211 (00000003), 512 (0200) bytes

 46C72CE8 12468800 0010069A 5016F846 8D0677FF 260877FF 260E5EC4 D2568900 Å.V6á^.&.w.&.w..F%.P......F.Š,úF 000000
 000A8300 032DFA56 88F84688 0001E646 C726E800 00FE46C7 0001FC46 C70000E6 |..úF•..úF±..Š&úF|...F%.V•-...Ö. 000020
 F87E8306 7C3A7F00 FA7E8300 E8DC7400 01300074 C00B08E8 0DE8FE56 89FC4689 .F•.V±Š.Š..àtÅ=..tÉŠ..-•..:|..-% 000040
 FFE676FF 1C76FF50 16CC4680 1876FF1A 76FF1E76 FF1476FF 1676FF01 6A327703 .w2j..v..v..v..v..v..Fä.P.v..vl. 000060
 0677FF26 0877FF26 0E5EC400 F9E91CC4 83F33AE8 0E0676FF 0876FF0E 76FF1076 v..v..v..v..Ö:µ.á.Ö•.á^.&.w.&.w. 000080
 77FF260E 5EC40004 E9037500 E47E8300 0018E69A 5016CC46 8D1276FF 016A006A j.j..v..Fä.P.|....-ö.u.Öå.á^.&.w 0000A0
 11E84601 DE56880C 46880000 0C219A50 16E84680 1276FF02 6A006A06 77FF2608 .&.w.j.j..v..FÖ.P.|....FÉ.V8.FÖ. 0000C0
 1276FF02 6A006A06 77FF2608 77FF260E 5EC4EE56 11EC4601 E25688E0 4688EA56 Võ.FÅ.Vä.F&.VY6^.&.w.&.w.j.j..v. 0000E0
 A5A5A5A5 1F161E07 16CC768D F888BC46 8D4AE812 46880000 0CD69A50 16E84680 .FÖ.P.ø....F.ŠJ.F¥.%.vä.....ÉÉÉÉ 000100
 1F161E07 16E8768D F888BC46 8D31E81F A5A5A5A5 1F161EE8 768DF888 C44680 1F ..Fé.%.vÖ...ÉÉÉÉ.Š1.F¥.%.vÖ..... 000120
 00013DB2 74C0080B E80DE81F A5A5A5A5 1F161ECC 768DF888 C44680 1F A5A5A5A5 ÉÉÉÉ..Fé.%.vä...ÉÉÉÉ.Š.Š..àtý=.. 000140
 76FF1076 FF50168C 4680FC76 FFFE76FF 1C76FF18 76FF1A76 FF1E76FF 00EBD174 tlŠ..v..v..v..v..v±.v=.F¥.P.v..v 000160
 0876FF08 8E19F288 1E000034 C8C8C95F 5E1F18C4 83E6C1E8 0E0676FF 0876FF0E ..v..v..Öèl.á..^ èüå4...¡·..Å.v. 000180
 8800F656 8301F446 8308E8F4 4689F646 89C02B1C CD00F09A 5016EC46 8D0676FF .v..F&.P.Þ.ë.+á.F-.F¶Š..F¶..V-.. 0001A0
 F676FF06 76FF0876 FF0160E9 0372F446 39087C01 6AE9037E F65639EE 5688EC46 F&.VŸ9V--.Öj.|.9F¶r.Ö'..v..v..v- 0001C0
 56890846 89065689 044689FE 5688FC46 881CF408 689A5016 FC468000 6AF476FF .v¶j..F•.P.k.¶..F•.V±.Få.V•.FÅ.V 0001E0
```

```
Dump of file SATURN:[PCCOMMON.DUMP.DLL]BRD.TMP;1 on 18-APR-1990 10:36:59.83
File ID (519,15,0)   End of file block 272 / Allocated 272

Virtual block number 212 (00000004), 512 (0200) bytes

 08E8E046 89E24689 C02B18DA 00F09A50 16DC468D 4277FF26 4477FF26 D85E 4DA Öó^Å&.wD&.wB.FÉ.P.Þ.Ö.+à.Fã.FÅŠ. 000000
 00F4E903 72E04639 087C00FE E9037EE2 56390E56 88DC4688 00E25683 01E04683 .FÅ..Vã..FÉ.V89Vã-.Ö±.|.9FÅr.Ö¶. 000020
 E84688 1D 5C0868 9A 5016E846 8D006AE0 76FFE276 FF4277FF 264477FF 26085EC4 á^Å&.wD&.wB.vã.vÅj..FÖ.P.k.\..FÖ 000040
 C02B10A3 00F09A50 16E4468D 4877FF26 4A77FF26 D05EC402 56890046 89EA5688 .Võ.FÅ.V6á^Å&.wJ&.wH.FÖ.P.Þ.É.+à 000060
 087C0093 E9037EF2 5639E656 88E44688 00F25683 01F04683 08E8F046 89F24689 .F·.FÞŠ..FÞ..V·..FÖ.V|9V·-.Ö..|. 000080
 5016F846 8D006AF0 76FFF276 FF4877FF 264A77FF 26005EC4 0089E903 72F04639 9FÞr.Ö..á^Å&.wJ&.wH.v·.vÞj..F%.P 0000A0
 067F8326 F85EC40C E8B1E802 7502067F 8326F85E C40E7400 167E831C 8B08689A .k....-..t.á^%&....u.ŠYŠ.á^%&... 0000C0
 3926EA56 88E84688 CC5EC4CE 5689CC46 89025788 26078826 F85EC4A3 E8027400 .t.ŠÉá^%&..&.W..Fã.Voá^ã.FÖ.Võ&9 0000E0
 060A76FF 0C76FF0E 76FF1076 FF1276FF 1476FF16 76FF2475 0C573926 2A750A47 G.u*&9W.u$.v..v..v..v..v..v..v.. 000100
 56570000 34C8CBC9 1FFE80E9 FEECE9FF 57E916C4 83000FE8 0E0676FF 0876FF53 S.v..v..Ö...á.ÖW.Ö$±Ö.±.èüå4..WV 000120
 468D5052 F45689F2 46890857 88260647 88260A5E C400000C 46C7D88E 1C79881E .|Y..ÅúFÉ..á^.&.G.&.W..F·.V¶RP.F 000140
 F85688F6 468800FE 568301FC 468308E8 FC4689FE 4689C02B 00001AF5 9A5016F6 -.P.%...+à.F±.F=Š..F=..V±..F-.V% 000160
 76FFF276 FFF476FF 012EE903 77FC4638 087F0138 E9037DFE 5638000A 8300012D -...Ö.;V±).Ö8...;F=w.Ö...v¶.v·.v 000180
 83000105 FE5688FC 4688F276 FFF476FF 00001EAC 9A5016EA 4680006A FC76FFFE ±.v•j..Fõ.P.¯....v¶.v·.F=.V±.... 0001A0
 88DE4688 58740012 7E835E74 01127E83 00001A13 9A5016DE 4680006A 50520002 Ø.RPj..F8.P......-..t^.-..tX.F8. 0001C0
 E8FF73E9 0575F056 390A75EE 4639E456 88E24688 1575EC56 391A75EA 4639E056 VÅ9Fõu.9Všu..Fã.VÖ9FŸu.9VÞu.Ös.Š 0001E0
```

```
Dump of file SATURN:[PCCOMMON.DUMP.DLL]BRD.TMP;1 on 18-APR-1990 10:36:59.83
File ID (519,15,0)   End of file block 272 / Allocated 272

Virtual block number 213 (00000005), 512 (0200) bytes

 4639E456 88E24688 1AE80000 FA46C707 75EC5639 0C75EA46 39E05688 DE468831 1.F8.VÅ9Fõu.9V±u.úF•..Š..Fõ.VÖ9F 000000
 8DF888CC 4680FA46 89124688 06E8FF40 E903E800 01FA46C7 0775F056 390C75EE Ÿu.9VÞu.úF•..Š.Öã.Š..F..F•.Fa.%. 000020
 8D1A76FF 1FA5A5A5 A51F161E DE768DF8 88D4468D 1FA5A5A5 A51F161E 0716EA76 vÖ.....ÉÉÉÉ..Få.%.v8...ÉÉÉÉ..v.. 000040
 0E76FF10 76FF0A76 FF0C76FF 5016CC46 8D5016E6 4680FA76 FF1876FF 50160C46 FÉ.P.v..v•.F|.P.Fä.P.v..v..v..v. 000060
 FE76FFE6 76FFE876 FFFA76FF 1476FF16 76FF1876 FF3074C0 081AC483 0047E80E .ÖG..á..àt0.v..v..v..v•.vÖ.v|.v± 000080
 74000C7E 831CC483 E748E80E 0676FF08 76FF0A76 FF0C76FF 5016CC46 8DFC76FF .v•.Fä.P.v..v..v..v..ÖHÖ.á..-É.t 0000A0
 F87E8D10 56880E46 88D88E1E 22881E56 57000036 C8CBC95F 5E1FFEAC E903E802 .Š.Ö¯±.^ èüàó..WV.|ª..Ä.F..V..-% 0000C0
 16D8468D 1FA5A5A5 A5DA8E1E F088CA7E 8D000805 1FA5A5A5 A5DA8E1E 0716F088 .Þ....ÖÉÉÉÉ.....-ö.Þ..ÖÉÉÉÉ..FÄ. 0000E0
 D4468900 5E050457 88260247 88260 65E C408C483 178016E0 9A0676FF 0876FF50 P.v..v..Å....á.á^.&.G.&.W..^..Få 000100
 568301E8 468310C4 83F430E8 0E5306D4 76FF5250 16084680 5016E846 80065689 .V•.FÖ.P.FÅ.PR.vå.S.Ö0¶.á..FÖ..V 000120
 8D5016F8 468000F6 5E8301F4 6E8300F2 5E8301F0 6E8300EE 568301EC 468300EA ö..F&..VŸ..nÞ..^·..n¶..^-..F%.P. 000140
 C41F7400 D27E8325 74001E7E 83000012 019A5016 D2468050 16E8468D 5016CA46 FÖ.P.FÖ.P.FØ.P......-..t%.-Ø.t.á 000160
 7E8300F2 E9C02800 0107C726 1A5EC400 013847C7 260A5EC4 00013647 C7260A5E ^.&úG6..á^.&úG8..á^.&ú...+àÖ·..- 000180
 080AC483 F4ADE80E 0A76FF0C 76FF0676 FF0876FF 1876FF00 E7E9C02B 05750002 Ø.u.+àÖÖ..v..v..v..v..v..ÖÚ¶.á.. 0001A0
 F277E80E 0A76FF0C 76FF0E76 FF1076FF 5016E846 8D1676FF 00C8E9C0 2B0574C0 àt.+àÖà..v..FÖ.P.v..v..v..v..Öw· 0001C0
 D65689D4 4689005E 0504578B 2602478B 26065EC4 00A4E9C0 2B0574C0 080EC483 .á..àt.+àÖÉ.á^.&.G.&.W..^..Få.V• 0001E0
```

```
Dump of file SATURN:[PCCOMMON.DUMP.DLL]BRD.TMP;1 on 18-APR-1990 10:36:59.83
File ID (519,15,0)   End of file block 272 / Allocated 272

Virtual block number 214 (00000006), 512 (0200) bytes

04478826 045EC477 EBC02804 74FE5639 0575FC46 39D05688 CE468878 EB164688 .F.Šx.Fö.VÅ9F•u.9V±t.+åŠwá^Å&.G. 000000
EB025789 26078926 125EC4E6 5613E446 03065718 26044728 260E5EC4 06578826 &.W.á^.&+G.&.W..Fő.V|á^.&..&.W.$ 000020
C4025788 26078826 045EC438 EBC02804 74FA5639 0575F846 39CC5688 CA46884A J.Fò.Vá9F‰u.9V'it.+åŠ;á^Å&..&.W.á 000040
74C0080E EB10EB02 57892607 8926125E C4E25613 E0460302 57182607 28260E5E ^.&+.&.W..FÅ.Väá^.&..&.W.Š.Š..åt 000060
00000004 13760002 000E90CB C95F5E1F 00E80001 8800E8FF 7CE90375 000130C0 å=..u.Ö|.Š.¡..Š..^_èù.....v..... 000080
00000010 0E0C0002 00000008 10500002 008A0004 18800203 00000009 1FEA0002 ..ð..............Ĩ............ 0000A0
00000017 12890002 00000014 10380002 01AC0004 204F0203 00A80004 1E440203 ..D...¨...O ..¯...;.......¿..... 0000C0
00000019 1F830002 003F0004 14200203 01800004 067F0203 00800004 1E8C0203 ......§.......§...¯...?...•..... 0000E0
8826065E C4088EFF FF881E56 00001EC8 00000000 00000000 01CE0004 139C0203 ......ö.........å...V.|...Äá^.&. 000100
8B008AE9 037E01F2 7E83F246 FF03E800 00F246C7 F05689EE 46890457 88260247 G.&.W..FŸ.VÞúF ..Š..F .-.-.Õα.. 000120
57882648 47882 6E6 5EC4E856 89E64689 0C508826 0A408826 065EC402 E6C1F276 v·èl.á^.&.ə.&.P..F|.VÒá^|&.GH&.W 000140
F4468308 EBF44689 F64689C0 28009000 F09A5016 EA468050 52FA5689 F846894A J.F%.V°RP.Fõ.P.Þ...+å.F-.F¶Š..F¶ 000160
F676FFF8 76FFFA76 FF5F73F4 4639057C 667FF656 39EC5688 EA468800 F6568301 ..V-..Fõ.V±9V-.f|.9F¶s_.v°.v½.v- 000180
88260788 26C2E802 7400067F 8326FC5E C4000008 689A5016 FC468D00 6AF476FF .v¶j..F=.P.k.Å.á^•&....t.Šö&..&. 0001A0
02909A50 52016A01 6A006A00 6A1C77FF 261E77FF 26EE5EC4 E45689E2 46890257 W..Fã.VÐá^Ÿ&.w.&.w.j.j.j.j.RP... 0001C0
C95E1F00 EBC02BFF 3AE987EB 00013647 C726E25E C4000138 47C726E2 5EC4FFFF ..á^ã&ùG8..á^ã&ùG6..Š.Ö:.+åŠ..^è 0001E0

Dump of file SATURN:[PCCOMMON.DUMP.DLL]BRD.TMP;1 on 18-APR-1990 10:36:59.83
File ID (519,15,0)   End of file block 272 / Allocated 272

Virtual block number 215 (00000007), 512 (0200) bytes

26024788 26F85EC4 FA5689F8 46890856 88064688 D88E0007 881E5600 001AC8C8 ùå...V.¡...Ä.F..V..F%.V°á^%&.G.& 000000
88347F01 F27E83F2 46FF03E8 0000F246 C70152E9 0A4688FE 5689FC46 89045788 .W..F=.V±.F.ÕR.úF ..Š..F .-·..4. 000020
880134E9 C0280575 D008F656 89F44689 0C508826 0A408826 F85EC402 E6C1F276 v·èl.á^%&.ə.&.P..F¶.V-.Åu.+åÖ4.. 000040
7F83260A 7500327F 8326F85E C4C3E8E8 5289E642 89F65688 F4468802 E6C1F276 v·èl..F¶.V-.8l.RÒŠúá^%&..2.u.&.. 000060
000A7F83 26EA5EC4 357F010C 7F83263C 7F000A7F 8326E65E C40099E9 03750038 8.u.Ö..á^l&.....<&.....Šá^Ö&.... 000080
76FFFA76 FF1275C0 0804C483 FFFF0233 9AF876FF FA76FF24 7F010C7F 8326287F .+&.....$.v°.v½.3....á..åu..v°.v 0000A0
0000F246 C704C483 FFFF0159 9A0676FF 0876FF53 74C00804 C48301C6 01FD9AF8 ½.=.6..á..åtS.v..v..Y....á.úF .. 0000C0
89EE4689 08578826 06478826 E65AC402 E6C1F276 88237F01 F27E83F2 46FF03E8 Š..F·.-·..#.v·èl.áZ|&.G.&.W..FŸ. 0000E0
73E80001 8804C483 FDF8E80E F876FFFA 76FFD4E8 04C483FF FF00009A 5052F056 VÞRP......á.Šå.v°.v½.Ö‰.å.¡..Š± 000100
FF016A01 6A006A00 6A1C77FF 261E77FF 26FC5EC4 29740036 7F8326F8 5EC46DE8 Šmá^%&..6.t)á^=&.w.&.w.j.j.j.j.. 000120
C41E7400 387F8326 F85EC428 E8000138 47C726F8 5EC4026B 02909AF8 76FFFA76 v°.v½...k.á^%&ùG8..Š(á^%&..8.t.á 000140
E810E800 6102909A 0676FF08 76FF016A 016A006A 006A1C77 FF261E77 FF26FC5E ^=&.w.&.w.j.j.j.j..v..v....ə.Š.Š 000160
8E00F888 1E000014 C8C8C95E 1F00E8C0 2800E8FE A2E90375 00013090 74C0080E ..åt.=..u.ÖÅ±Š.+åŠ..^èùå....¡½.. 000180
894A5788 26484788 26065EC4 0002F646 C70083E9 80F38806 75084608 06468808 Ä.F..F.u.¡µ.Õ°.úF-..á^.&.GH&.WJ. 0001A0
C008F64E FFF64688 FE5689FC 46894E57 88264C47 8826065E C411E8FE 5689FC46 F=.V±Š.á^.&.GL&.WN.F=.V±.F-.N-.å 0001C0
01F24683 08E8F246 89F44689 C028031C 00F09A50 16EC4680 FC76FFFE 76FF7C74 t|.v±.v=.F&.P.Þ...+å.F¶.F Š..F·. 0001E0

Dump of file SATURN:[PCCOMMON.DUMP.DLL]BRD.TMP;1 on 18-APR-1990 10:36:59.83
File ID (519,15,0)   End of file block 272 / Allocated 272

Virtual block number 216 (00000008), 512 (0200) bytes

FFF476FF FC76FFFE 76FF4573 F2463905 7C4C7FF4 5639EE56 88EC4688 00F45683 .V¶..F&.VŸ9V¶.L|.9F sE.v±.v=.v¶. 000000
FF80E802 7500023C F0468906 478826F8 5EC40238 08689A50 16F8468D 006AF276 v·j..F%.P.k.8.á^%&.G..FÞ=..u.Š§. 000020
C028FF69 E9A1E80C E8000188 0574C008 06C483FD 84E80E37 FF260277 FF26F076 vÞ&.w.&.7.ÒÇ».á..åt.¡..Š.ŠÅÖi.+å 000040
0876FF01 5FE980F3 88067508 46080646 88D88E02 8D881E00 0030C8C8 C91F00E8 Š..èùå0...¡...Ä.F..F.u.¡µ.Õ_..v. 000060
88000A56 8301D846 8308E8D8 46890A46 89C02803 8000F09A 5016F046 8D0676FF .v..FÞ.P.Þ.§.+å.FÖ.FÅŠ..FÅ..VÖ.. 000080
DA76FF06 76FF0876 FF0121E9 03720846 39087C01 28E9037E DA5639F2 5688F046 FÞ.V 9VÖ-.Ö+.|.9FÅr.Öl..v..v..vÖ 0000A0
8826E05E C4E25689 E04689FA 5688F846 8803E608 689A5016 F8468000 6AD876FF .vÅj..F%.P.k.|..F%.V°.FÅ.Vãá^Å&. 0000C0
067F157C 00FE7E83 041E00F0 9A5016FC 46805052 EE5689EC 46894057 88263E47 G>&.Wə.F&.VŸRP.F=.P.Þ....-±.|... 0000E0
46894457 88264247 8826E05E C404C483 FF55E80E EC76FFEE 76FF0074 00FC7E83 .-•.t..vŸ.v$.ÒU..á.á^Å&.GB&.WD.F 000100
568301F4 468308E8 F44689F6 4689C028 045D00F0 9A50160C 46805052 02568900 Å.V®RP.FÉ.P.Þ.].+å.F-.F¶Š..F¶..V 000120
F676FFD0 76FFD276 FF7E73F4 4639057C 0085E903 7EF65639 DE5688DC 468800F6 -..FÉ.V89V--.Ö..|.9F¶s-.v®.vÅ.v- 000140
0064E846 C7065689 D44689E6 5688E446 8802E008 689A5016 E4468D00 6AF476FF .v¶j..Fõ.P.k.Å..Fõ.V|.Få.VøúFÖd. 000160
F6E80ED4 76FFD676 FF137400 0800EA5E 8301E86E 83EA5688 E8468800 00EA46C7 úFõ...FÒ.Võ.nÐ..^õ..Åt..v=.vå.Ö- 000180
016A006A 016A006A 1A7500E8 7E83067C 227F00EA 7E8308EB 0274C008 04C483FD ».á..åt.ŠÙ.-õ..“|..-Ö.u.j.j.j.j. 0001A0
C8CBC91F 00EBC02B FEBFE9FF 65E90000 FFFF9A10 4068006A 0AEE681E 0807681E .h...hŸ.j.hə......Õe.Öe±+åŠ..èùå 0001C0
260A77FF 26065EC4 0178E980 F3880675 08460806 4688D88E 035B881E 56000022 "..V.¡[..Å.F..F.u.¡µ.Õx.á^.&.w.& 0001E0
```

```
Dump of file SATURN:[PCCOMMON.DUMP.DLL]BRD.TMP;1 on 18-APR-1990 10:36:59.83
File ID (519,15,0)   End of file block 272 / Allocated 272

Virtual block number 217 (000000D9), 512 (0200) bytes

 F0468D50 52FE5689 FC46891E 57B8261C 47B82606 5EC404C4 83FE5EE8 0E0877FF .w..Ò^±.á.á^.&.G.&.W..F=.V±RP.Fþ 000000
 FC76FFFE 76FF0136 E9C02B05 7301F07E 83067C0D 7F00F27E 83053700 F09A5016 .P.Þ.7..~....|..~Þ.s.+àÓ6..v±.v= 000020
 00F5E903 74C0C903 7B0A589A 5016F446 80FC76FF FE76FF05 4709C29A 006A006A j.j..Ó.G..v±.v=.F¶.P.X.(..àt.Ò%. 000040
 53060C74 00367F83 2602E802 74033F83 26EC5EC4 EE5689EC 4689F656 8BF4468B .F¶.V-.F&.VŸá^&&.?.t.Š0&..6.t..S 000060
 0677FF26 0877FF26 EC5EC401 A200009A F476FFF6 76FF08EB 04C483FF FF00619A .a....á.Š..v~.v¶...Å.á^&&.w.&.w. 000080
 00E646C7 0096E903 7400FA7E 83009FE9 037402F8 7E830000 FFFF9A50 16F8468D .F%.P......~%.t.Ó...~°.t.Ó..úF|. 0000A0
 E846890C 508B260A 408826EC 5EC402E6 C1E6768B 347F01E6 7E83E646 FF03EB00 .Š..F|.-|..4.vlèl.á^&&.à.&.P..FÒ 0000C0
 C3EBE052 89DE4289 EA5688E8 468802E6 C1E6768B 0084E9C0 2B057500 0BEA5689 .VÕ.Åu.+àÓ...vlèl..FÒ.VÕ.B8.RÅŠû 0000E0
 32700002 300C4703 260A478B 26E25EC4 42700002 300C4703 260A478B 260E5EC4 á^8&.G.&.G.=..)0á^8&.G.&.G.=..)2 000100
 04C48306 3001FD9A EC76FFEE 76FF2075 C00804C4 83058302 339AEC76 FFEE76FF .vŸ.v&.3....á..åu .vŸ.v&.».=..á. 000120
 6A006A00 6AFC76FF FE76FFFE F4E9FEF7 E9018400 5A9AF476 FFF676FF 0E75C008 .åu..v~.v¶.Z.Ç.Ò%±Ò¶±.v±.v=j.j.j 000140
 00020088 000104BE 01030008 CBC95E1F 00EBC028 E9E80275 C0080515 05D09A01 ..Å....åu.ŠÓ+åŠ..^èü..../....... 000160
 000200A8 00040596 02030000 00120619 00020000 000801F7 00020000 0006062B +.......%........................ 000180
 00000000 00000000 00000000 00190406 00020000 00140654 00020000 00130573 s.......T.......ø................ 0001A0
 FFFC568C FA46890E 46805657 000008C8 00000000 00000000 00000000 00000000 ..................à...WV.F..F°.V=. 0001C0
 76FF0876 FF0A76FF 0C76FFFA 76FFFC76 FFF08804 C4830044 08349A06 76FF0876 v..v..4.D..á..Þ.v=.v°.v..v..v..v 0001E0

Dump of file SATURN:[PCCOMMON.DUMP.DLL]BRD.TMP;1 on 18-APR-1990 10:36:59.83
File ID (519,15,0)   End of file block 272 / Allocated 272

Virtual block number 218 (000000DA), 512 (0200) bytes

 CBC95F5E C78806C4 83FFFF09 0A9A5606 76FF0876 FFF8880C C4830055 09AE9A06 ..Û.U..á..%.v..v.V......á..ú^_èù 000000
 06568908 46890000 100AF7D8 F7065688 47117DC0 08084688 FF335356 57EC8855 U.$WVS3..F..à).G.V.%Ä%Ö....F..V. 000020
 880A4E88 1575C008 0A56890C 46890000 1D0AF7D8 F70A5688 47117DC0 080C4688 .F..à).G.V.%Ä%Ö....F..V..åu..N.. 000040
 D9D1EBD1 06468808 56880A4E 8BD88838 EB038BF1 F7064688 D888F1F7 D2330846 F.30%þ.Ä.F.%þ.Æ58.Ä.N..V..F.ì$ìì 000060
 06720777 0856380C 72D103E6 F70A4688 910C66F7 F088F1F7 F475D808 D8D1EAD1 ìÕìÄ.Uu¶%þ.Þ%f...F.%l.ìr.;V.w.r. 000080
 88EC8855 0008CA5D E5885F5E 5B000A83 D8F7DAF7 07754F96 02334E01 7606463B ;F.v.N30.Ou.%O%Ä.Ö.[^_.ì]ò..U.&. 0000A0
 66F70646 88C888E3 F70008CA 5DE588E3 F7064688 08750A5E 88D8080C 5E880846 F..^..Ä.^.u..F.%D.ì]ò..%D.à.F.%f 0000C0
 8847117D C0080846 88FF3357 53EC8855 0008CA5D E5880103 E3F70646 88C8030C ..à.F.%D.ì.ì]ò..U.$SW3..F..à).G. 0000E0
 0000100A F7D8F70A 5688107D C0080C46 88065689 08468900 0010DAF7 D8F70656 V.%Ä%Ö....F..V..F..à)..V.%Ä%Ö... 000100
 43794F02 33C288F1 F7064688 F1F7D233 0846880A 4E881875 C0080A56 890C4689 .F..V..åu..N..F.30%þ.F.%þ.ô30oyC 000120
 0C66F7C8 88F1F7.. 75D80808 D1EAD1D9 D1E80106 46880856 880A4E8B D8884BEB ŠN.Ä.N..V..F.ì$ììì0ìÄ.Uu¶%þ.à%f. 000140
 08561806 46280C.. 180A462B 06760646 38087207 7708563B 0C72D103 0A66F791 .%f..ìr.;V.w.r.;F.v.+F..V.+F..V. 000160
 0A891066 BF0818BE C08ED88C 57560008 CA5DE588 5B5F000A 8308F7DA F707794F Oy.%O%Ä.Ö._[.ì]ò..VW.Ä.à/..ef.¿. 000180
 FCD88EC1 8ED98CC0 8CF8880C C3831F7A 1E88F388 5756C08E D08CC85E 5FA5F300 .µE_^ù.Å.åVW.µ..z..û..«.à.ì.ê.Ä= 0001A0
 FB81F388 A5A5FCC1 8ED98CF8 880CC383 1F7A1E88 F3885756 16E8F388 098EA5A5 EE.T.µŠ.VW.µ..z..ù..«.ì.ê=EE.µ.« 0001C0
 C3831F7A 1E88F388 5756C08E D08CCB5E 5F03FE47 C6FC7789 1F7A1E89 4E741F66 f.tN..z..w=óG±._^ù.Å.åVW.µ..z..û 0001E0

Dump of file SATURN:[PCCOMMON.DUMP.DLL]BRD.TMP;1 on 18-APR-1990 10:36:59.83
File ID (519,15,0)   End of file block 272 / Allocated 272

Virtual block number 219 (000000DB), 512 (0200) bytes

 C3831F7A 1E88F388 575618E8 F388098E A5A5A5A5 FCD88EC1 8ED98CC0 8CF8880C ..«.à.ì.ê.Ä=EEEE.ì.µŠ.VW.µ..z..û 000000
 5FFC7789 07FE47C6 1F7A1E89 0E741F66 F881F388 A5A5A5A5 FCC18ED9 8CF8880C ..«.ì.ê=EEEE.µ.«f.t...z.óG±..w=_ 000020
 880CC383 1F7A1E88 F388FCD8 8EC18ED9 8CD88C57 5604EBD0 8C575611 C8E9C85E ^ùÕù.VW.ÅŠ.VW.Ä.ì.ê.Ä=.µ..z..û.. 000040
 8CC85E5F D98EFC5F 891F7A1E 89CF741F 66F881A5 A5027403 3CA5A5FE 4588ADFB «Ù.E±EE<.t.EE.«f.tü..z.._•.ì_^ù. 000060
 99078803 E802578P 07880AEB 99078826 C08ED08C 14E80257 88260788 26C08ED0 Å.à&..&.W.Š..Å.à&...Š....W.Š.... 000080
 1C741F66 FF810CC7 831F7A3E 88000883 DAF7D8F7 07798024 C78AD088 DA885756 VW.Ö.Å.ú$.y.%Ü%Ö.Ü..>z..ú...f.t. 0000A0
 C6FF63E9 C85E5F16 ECE89E84 03FE45C6 0F7500FF 80C18ED9 8CFC7D89 1F7A3E89 .>z..)•.ì.ê...u.óE±.Ç.Ò&._^ùÕc.ó 0000C0
 758B1F7A 3E88C08E D88C5756 C85E5F5D 1A48E8F8 88D833C8 88876080 5507FE45 E±.U§`..ù3Ù.«ÒK.]_^ùVW.Ä.ã.>z..u 0000E0
 A5A50274 033CA5A5 FCFE4588 FC7D891F 7A3E89B1 741F66FF 810CC783 FE458AFC •.E±.ú...f.tŸ.>z..)•.E±•EE<.t.EE 000100
 8ED88C03 FE45C6FC 7D891F7A 3E898C74 1F66FF81 0CC7831F 7A3E8857 56C85E5F _^ùVW.>z..ú...f.t..>z..)•óE±..Ä. 000120
 EB0C1F7A 06831F7A 1E88FCF8 885756C0 8ED88C02 EBD08CC8 5E5FA8A8 FCC033C0 Ä3à=``` ^ù.ÅŠ..Ä.åVW.«•..z...z..Š 000140
 7A2E83A5 A5FC7788 007503FE 7F801F7A 1E88FCF8 885756C0 8ED88C02 EBD08C11 ..ÅŠ..Ä.åVW.«•..z...±.u..w•EE..z 000160
 56C08ED8 8C02EBD0 8CE4E85D DE885F11 0EE857FC 77881D88 268955C8 5E5F0C1F .._^ùW.&...w•WÒ.._.8)ŠÕ.ÅŠ..Ä.åV 000180
 1F7A1E88 FCF88857 56C08ED8 8C02EB00 8C11EB0C 1F7A0683 1F7A1E88 FCF88857 W.«•..z...z..Š..ÅŠ..Ä.åVW.«•..z. 0001A0
 E9EB0F87 F7882672 E8DF87C8 5E5F0C1F 7A2E83A5 A5A5A5FC 77880F75 07FE7F80 ..±.u..w•EEEE..z..^ù.ÕÒr&.%.ÒŠÕ 0001C0
 56C08ED8 8C02EBD0 8C10EB0C 1F7A0683 1F7A1E88 F8885756 C08ED88C 02EBD08C .ÅŠ..Ä.åVW.«..z...z..Š..ÅŠ..Ä.åV 0001E0
```

Dump of file SATURN:[PCCOMMON.DUMP.DLL]BRD.TMP;1 on 18-APR-1990 10:36:59.83
File ID (519,15,0)   End of file block 272 / Allocated 272

Virtual block number 220 (0000000C), 512 (0200) bytes

C808C85E 5FA5A502 74033CA5 A5A8FC0C 1F7A2E83 FE478AF3 881F7A1E 88F88857 W.«..z..µ.Gz..z..«¨EE<.t.EE_^ù¡ù 000000
36E80486 8A0480«8 08482688 9F002804 DF9A48EB 15FEBA15 F98850EB 15D5BA15 .ol.$P¡*.oz.$H.Ô.(...&H.¡..ō..$6 000020
D8F70773 589E084^ 268A5011 87E89004 EB11F2E8 900AEB11 A4E89010 EB11A5E8 ÔE.$..ÔE.$..Ô·.$..Ôñ.P.&H..Xs.%Á 000040
8851531D 8826895' 57560492 8A048C88 08482688 9F047104 DF9AC30A F7000283 .@.%Ôù.Ô.q...&H.¡..o..VWU.&..$Q. 000060
57C85E5F 5D5859D2 FF02E800 FF047508 7488030A 7C801F7A 36890CEE 831F7A36 6z..V..6z..|...t.u..À$..@Y()_^ùW 000080
7480FF41 F6C85F08 75F0FF41 F6087403 F8801375 7F01F6FF 32FE5D8A 1F7A3E88 .>z..]z2.-..u..«.t.-A.Þu._ù-Ā..t 0000A0
7A3E8857 56C85F7F 2180FF32 FE5D8A1F 7A3E8857 C8F9C8E4 0803755F 8001F6F8 ¥-.._u..ÔùªùW.>z..]z2..!.¯ùVW.>z 0000C0
7503F880 A5FCC18E D98CFC7D 89C85E5F 803180FF 320875F7 38FC7588 FE5D8A1F ..]z¯u«;%u.2..1._^ù.)«.1.Ē«E.«.u 0000E0
24FEE857 5602E8C0 8ED08C57 56C85E5F A880F480 ADA5A5CB 5E5FA880 F480AD08 .Ù.¶.¯_^ùÉÉÙ.¶.¯¯^ùVW.À.à$.VWÔz$ 000100
0488F388 575604E8 24E6E857 5602E8C0 8ED08C57 5676E800 0888F388 575604E8 $.VW.µ]..$vVW.À.Ā$.VWÔl$$.VW.µ¡. 000120
8ED08C57 5646E800 0C88F388 575604E8 24CEE857 5602E8C0 8ED08C57 565EE800 .$^VW.À.à$.VWÔö$$.VW.µ¡..$FVW.À. 000140
249EE857 5602E8C0 8ED08C57 562EE800 1488F388 575604E8 2486E857 5602E8C0 à$.VWÔÑ$$.VW.µ¡..$.VW.À.à$.VWÔ.$ 000160
0088F388 575604E8 2486E857 5602E8C0 8E008C57 5616E800 1088F388 575604E8 $.VW.µ¡..$.VW.À.à$.VWÔ.$$.VW.µ¡. 000180
5E5F5D08 2C97FF1D 88268955 FC7D8710 7407FE7D 80C18ED9 8C1F7A3E 88D88800 ..Â.>z..\.è.)z.t..)«U.&....,.)_^ 0001A0
E82455E8 575602E8 C08ED08C 57560FE8 1F7A3E88 F7882491 E81DFC8F 02C383C8 ù.Ù.¢«.Ô.$.%.>z.$ÔVW.À.à$.VWÔU$$ 0001C0
000688F3 88575604 E82430E8 575602E8 C08ED08C 575676E8 000A88F3 88575604 .VW.µ¡..$vVW.À.à$.VWÔ=$$.VW.µ¡.. 0001E0

Dump of file SATURN:[PCCOMMON.DUMP.DLL]BRD.TMP;1 on 18-APR-1990 10:36:59.83
File ID (519,15,0)   End of file block 272 / Allocated 272

Virtual block number 221 (0000000D), 512 (0200) bytes

C08ED08C 575646E8 000E88F3 88575604 E82425E8 575602E8 C08ED08C 57565EE8 $^VW.À.à$.VWÔ%$$.VW.µ¡..$FVW.À.à 000000
E823F5E8 575602E8 C08ED08C 57562EE8 001688F3 88575604 E8240DE8 575602E8 $.VWÔ.$$.VW.µ¡..$.VW.À.à$.VWÔ%#$ 000020
000288F3 88575604 E8230DE8 575602E8 C08ED08C 575616E8 001288F3 88575604 .VW.µ¡..$.VW.À.à$.VWÔl#$.VW.µ¡.. 000040
00088821 E80004B8 FF39E95E 23D8E856 057407FE 7D80C18E D98C1F7A 3E88D888 .À.>z..\.è.)z.t.VÔÀ#^Ô9.£..$I£.. 000060
57560018 8803E800 1C8808E8 00008800 E80014B8 12E80010 8817E800 0C881CE8 $.£..$.£..$.£..$.£..$.£..$.£..VW 000080
7D89FC75 88C08ED8 8C1F7A3E 890CEF83 287407F2 7D803974 07FE7D80 1F7A3E88 .>z..)z.t9.)·.t+.ÿ..>z..À.à.u«.) 0000A0
68E802C3 83C85E5F 5D0082C97 FF108826 89553E73 18F8832F 731CF883 087D88FC «.)..«.s/.«.s>U.&.....,.]_^ù.ù.Ôk 0000C0
550C1F7A 2E83F787 8FE82356 E81F7A3E 890CEF83 C47407F2 7D8002C3 83CDE823 #$ë.ù..)·.tá.ÿ..>z.ÔV#$¢¯%..z..U 0000E0
D1410025 9F5D082C 97FF1D88 2689550C 1F7A2E83 C85E5F50 082897FF 10882689 .&....(.]_^ù..z..U.&.....,.].%.A1 000100
C08ED88C 5756000C 8803E8FF 32DF02E7 D0F88AE3 00E300C8 9E5E5FE0 0AE400E8 ÔÀÔ.À_^.ùÀÔÀÔ.«ÀÔ.Ô2.$.£..VW.À.à 000120
EC8855C8 5E5FF4E2 47471D88 FE448905 87AD0005 89FB28FE 884E4E1F 7A3688FC «.6z.ÑN.z+«¿..Ù...Dz..GGà¶_^ùU.& 000140
88551A3E E922E88A 084888C8 5DE5885E 5F220DE8 037407FE 7D801F7A 3E885756 VW.>z..)z.t.Ôl«_^.[]ùÉK.o$ªÔ>.U. 000160
885E5F80 23903680 0008E880 805756EC 8855C85D E5885E5F 0018E8C0 325756EC &VW2àÔ.._^.[]ùW¯$VW¯.Ô...6.#._^. 000180
8E1F7A36 FFFF4430 36FF4530 A536A536 A536A536 23968F06 7680071E FCC850E5 [)ù«...v¯¢.#6E6E6E6E0E.60D..6z.ƒ 0001A0
C08ED88E 58108CE8 1E071606 7E8D555D 18798007 44F60F3D E8551F7A 36892396 .#.6z.UÔ=.-D..y.]U.-....ÔV.X.À.à 0001C0
067E8125 8E06FF56 000004C8 C3DA8C96 1F7A068F 5D13FAE8 08508F06 7423968E ƒ.#t.«P.Ô*.)..z...Ôùà...V../%.-. 0001E0

Dump of file SATURN:[PCCOMMON.DUMP.DLL]BRD.TMP;1 on 18-APR-1990 10:36:59.83
File ID (519,15,0)   End of file block 272 / Allocated 272

Virtual block number 222 (0000000E), 512 (0200) bytes

2475FFFF 087E8128 75087006 7E8113E8 0000FE46 C7077508 5C087E81 0E750864 d.u..-.\.u.úFz..$..-.p.u+.-...u$ 000000
4C87F606 D868F9F7 000C8999 08582DC3 8815750C 0A47F626 065EC400 01FE46C7 úFz..á^.&-G..u..û-X..¿..%ªkÄ.-.L 000020
FD9A0200 68147502 44080488 1D4AC681 02E6C1FE 76889090 7EE8C028 06740117 ..t.+à$-...vzèl..óJ....D.u.h...» 000040
03E001C8 88F9F700 0C89990B 58200646 88D57400 08025489 048902C4 8309472E .G..á....T..Àtí.F.-X..¿..%ª.àlÁ. 000060
89260647 89261D4C 948^104A 848802E6 C1FE7688 065EC4FC 4689174C 05E001C1 èlÀ.L..F«á^..vzèl...J...L.&.G.&. 000080
8026065E 881107C6 DE880447 89260244 890200B8 FC768802 57892607 89?^0857 W.&..&.W..v«¡...D.&.G..ß6...^.&. 0000A0
C103E001 C888F9F7 000C8999 08582D08 46880000 04C890C8 C95E0001 8802.\4F 0..¡..^èù.à....F.-X..¿..%ª.àlÁ.è 0000C0
478A2608 5EC47274 1007F626 FC5EC451 7400067E 83FE5E8C FC468917 4C05E\?1 lÀ.L..F«.^z.-..tQá^«&-..trá^.&.G 0000E0
5EC404C4 8309982E 629A0876 FF0A76FF 5C74C008 02C48309 59312A9A 50E42A08 .*ôP.*1Y..á..àt\.v..v..b....á.á^ 000100
08578926 06478926 02578926 07892699 C028085E C4000002 47C72600 07C626FC «&6..&ùG...á^.+á.&..&.W.&.G.&.W. 000120
74C00802 C48309AA 312A9A50 E42A0847 8A26085E C4217410 07F626FC 5EC42AE8 $*á^«&-..tlá^.&.G.*ôP.*1¯..á..àt 000140
8C2A36A3 2A3C8808 A133FC9A 000A88EC 8855C8C9 04A92E62 9A0876FF 0A76FF08 ..v..v..b.`.èùW.$¡...«3À.¡<*É6*. 000160
3206C72A 0E16892A 0CA30856 88064688 2A281689 2A26A310 56880E46 882A381E .8*.F..V.É&*..(*.F..V.É.*...*ú.2 000180
2A16A3C0 2800012A 3406C703 08E90374 25F67E80 038DE900 002A3006 C700002A *..ú.0*..Ô...--%t.Ô..ú.4*..+àÉ.* 0001A0
5EC40020 289C06C7 2A24A32A 0AA32A10 A32A2AA3 2A2CA32A 14A32A2E A32A12A3 É.*É.*É.*É,*É**É.*É.*É$*ú..+ .á^ 0001C0
1606FF00 752B3F80 260A5E88 903EE800 30289C06 C70A46FF 49753001 7F80260A .&...Oul.F.ú..+0.$>..^.&.?+u.... 0001E0

```
Dump of file SATURN:[PCCOMMON.DUMP.DLL]BRD.TMP;1 on 18-APR-1990 10:36:59.83
File ID (519,15,0)   End of file block 272 / Allocated 272

Virtual block number 223 (000000DF), 512 (0200) bytes

 06FF9014 EB2A2A06 FF1A7500 2A163E83 0E75203F 80269028 E800002A 2A06C72A *ú.**..$(.&.? u..>.*.u...**$.... 000000
 0978E80E 5098078A 260A5E88 0A46FF2A 2406FFC7 752D3F80 260A5EC4 0DEB2A0A .*$.á^.&.?-uú..$*.F..^.&...P.Ôx. 000020
 3E830C56 890A4C89 08C48308 C7E80E2A 3A681E0A 76FF0C76 FFDD75C0 0802C483 .á..áui.v..v..h:*.Ôú..á..F..V..> 000040
 C7067530 289C3E83 0074002A 243E832A 3AA30BF7 2A3AA12A 2406FF0C 7D002A3A :*.)...$*À:*%ÁÈ:*.>$*.t..>.+Ôu.ú 000060
 7BE80E2A 34681E0A 76FF060A 46FF2A2C 06FF2D75 2E3F8026 0A5EC400 20289C06 ..+ .á^.&.?.u-..,*.F...v..h4*.Ô( 000080
 8A260A5E C42A2C0E FF00012A 3406C70A 7D002A34 3E830C56 890A4689 08C48308 ..á..F..V..>4*.).ú.4*....,*á^.&. 0000A0
 2A143E83 00022A14 06C70675 006C3028 74006830 4074004E 30307400 46309807 ..=F.t==N.t@=h.t+=l.u.ú..*...>.* 0000C0
 2A1406C7 90024EE9 1C75003F 80260A5E C40A46FF 03754C3F 80260A5E C4097500 .u.á^.&.?Lu..F.á^.&.?.u.ÔN..ú..* 0000E0
 0A740045 30F84689 98078A26 C8EB0008 2A1406C7 D0EB0010 2A1406C7 D8EB0001 ..$Àú..*..$Àú..*..$à&....F½=E.t. 000100
 300191E9 037E7874 006930F8 468820F8 46832A12 06FF0875 00583005 74004730 =G.t.=X.u....*.F½ .F½=i.tx~.Ô..= 000120
 C4157502 2A143E83 900159E9 0140E903 75002530 0152E903 7E013FE9 03750063 c.u.Ô?.~.ÔR.=%.u.Ô@.ÔY...>.*.u.á 000140
 89262A30 A11FC426 2A261EC4 0DEB0000 0247C726 0789262A 30A11FC4 262A261E .&*&á.À0*&..&úG...$.á.&*&á.À0*&. 000160
 F6262A0C 1EC401BD E9037400 2A303E83 0170E903 75002A32 3E83042A 26068307 ...&*..>2*.u.Ôp..>0*.t.Ô§.á..*&- 000180
 C483019E E80E0A6A 00002A0A 06C72A2E 06FF01AC E9FFFFB8 01AFE903 75200A47 G. u.Ô€.j..Ô¯....*ú..*..j..Ò...á 0001A0
 75082A14 3E830004 2A3406C7 2A2C06FF 2A1206FF 2A1006FF F2EB086A 90C3EB02 .$ù.j.$....*...*..,*ù.4*...>.*.u 0001C0
 83FA4689 2A3AA128 742A3A06 39FA4689 2A14A3C0 2B7A7401 2A143E83 0081E903 .Ô...>.*.tz+àÈ.*.F*9.:*t(À:*.F*. 0001E0

Dump of file SATURN:[PCCOMMON.DUMP.DLL]BRD.TMP;1 on 18-APR-1990 10:36:59.83
File ID (519,15,0)   End of file block 272 / Allocated 272

Virtual block number 224 (000000E0), 512 (0200) bytes

 3AA3C028 027DC008 2A3AA105 2A3A2E83 909013E8 00002A3A 06C70A74 002A243E >$*.t.ú.:*..$.....:*.À:*.à).+àÈ: 000000
 3E832274 00FA7E83 02C48304 8DE80E3A 6A02C483 0130E80E 106A022A 2606832A *..&*.j..Ô0..á.j:.Ô...á..-*.t*.> 000020
 00002A3A 06C79007 EB2A3AA3 C02B027D C00B2A3A A300052D FA468B15 74002A24 $*.t..F*-..È:*.à).+àÈ:*$..ú.:*.. 000040
 E80E006A 90FF3FE9 106AFF10 E9022A26 068302C4 8300F1E8 0E106A04 2A262E83 ..&*.j..Ôp..á...&*.Ô..j.Ô?..j..Ò 000060
 643090FF 21E90428 E80E256A FF2AE903 49E80EF8 76FFF4EB 016A90FF 39E9026E n.Ô9..j.$¶.v½.ÒI.Ô*.j%.Ò(.ÔI..=d 000080
 0A4EFF0C 56880A46 88097400 2A143E83 DA7E0067 30057C00 6530FF0C E9037500 .u.Ô..=e.|.=g.-Ô.>.*.t..F..V..N. 0000A0
 FEE4E903 75006F30 FE80E903 75006E30 903AEBFE 5689FC46 89400C56 880A4688 .F..V.@.F=.V±$:.=n.u.Ô.±=o.u.Ôô± 0000C0
 9081EBFF 79E90375 007830FE 89E90375 0075308F 74007330 FEE0E903 75007030 =p.u.ÔÀ±=s.t.=u.u.Ô¿±=x.u.Ôy.$Ý. 0000E0
 500A4628 C388EC75 253C0474 C00AF646 88078A26 FC5EC4FC 46FF9034 EB0A46FF .F.$4..F=á^=&...F-.àt.<%u$.ú+F.P 000100
 88078A26 0A5EC40C 56890A46 89FE568B FC468806 C483044C EB0E0A76 FF0C76FF .v..v..ÒL..á..F=.V±.F..V.á^.&... 000120
 000012C8 CBC92A30 A1FE51E9 0374200A 47F6262A 0C1EC4FC 63E90374 C00AF646 F-.àt.Ôc=á..*&-G. t.ÔQ±À0*èúà... 000140
 0774022A 143E832A 2E06FF04 740A067E 83002028 9C06C706 74002A2C 3E835657 WV.>,*.t.ú..+ ..~..t....*.>.*.t. 000160
 902CEB04 2A260683 FE5689FC 46890257 88260788 262A261E C4197510 2A143E83 .>.*.u.á.&*&..&.W..F=.V±..&*.$,. 000180
 99078826 2A261EC4 0EEB0000 FE46C7FC 468907B8 262A261E C4117400 2A2E3E83 .>.*.t.á.&*&...F=úF±..$.á.&*&... 0001A0
 9003E806 46880674 FE4608FC 46880E74 002A0A3E 83022A26 0683FE56 89FC4689 .F=.V±..&*..>.*.t..F=.F±t..F.$.. 0001C0
 83287D00 FE7E8331 75002A2E 3E83F456 89F24689 2A38168B 2A36A128 9``3C028 +àÈ.+À6*..8*.F .V¶.>.*.u1.-±.)+. 0001E0

Dump of file SATURN:[PCCOMMON.DUMP.DLL]BRD.TMP;1 on 18-APR-1990 10:3 :59.83
File ID (519,15,0)   End of file block 272 / Allocated 272

Virtual block number 225 (000000E1), 512 (0200) bytes

 89FC4689 0AF70002 8308F7FE 5688FC46 882007C6 26F246FF F25EC41D 750A067E -..u.á^..F &6.-.F=.V±%À.Ø.%Ö.F=. 000000
 FE76FF50 1E0676FF FA5E8CF8 46892A18 880000F6 46C79006 E80001F6 46C7FE56 V±úF-..$..úF-..¡.*.F%.^*.v..P.v± 000020
 04C48309 872FEE9A F876FFFA 76FF4574 002A2C3E 830AC483 0E983120 9AFC76FF .v=. 1...á..>,*.tE.v*.v%.Ÿ/ñ..á. 000040
 F27EC4F0 4E880000 289A06C7 0675082B 9A3E830D 7EC908F0 4E89C828 2A340E88 ..4*+à.NÞ.è~..>.+.u.ú..+...NÞá-· 000060
 76C5EE5E 8C2A120E 88F04E89 F4468CF2 7E89F47F C00849C1 88473005 C62605EB $.&6.0G.èI.à.¶.-·.F¶.NÞ...*.^Ÿév 000080
 7689E375 003F8026 F846FF46 202C8003 7C613C07 74C90804 88078A26 F85EC4F2 ·á^%&.....èt.<a|..,F.F%&.?.uD.v 0000A0
 00018805 7500F67E 8308742A 2A06082A 16A11475 002A2E3E 83EE5E8E F45E8CF2 ·.^¶.^Ÿ.>.*.u.À.*..**t..--.u.|.. 0000C0
 A10001BE 18740006 7E835657 000010C8 CBC95F5E 02C48302 FFE80E50 C02B02E8 $.+àP.Ò...á.^_èúà...WV.-..t.ƒ..À 0000E0
 262A261E C4137408 2A143E83 008FE902 2A260683 FA5689F8 46892A28 16882A26 &*..(*.F%.V*._&*.Ô...>.*.t.á.&*& 000100
 0683FA5E 8CF84689 FC468907 88262A26 1EC410EB FA5689F8 46890257 88260788 ..&.W..F%.V*$.á.&*&...F=.F%.^*.. 000120
 59880975 00FC7E83 900AE81D 52881575 FA4608F8 46880E74 082A143E 83042A26 &*..>.*.t..F%.F*u.¡R.$...-=.u.¡Y 000140
 E82A340E 881C742A 2C3639F6 28F45689 F24689FA 5688F846 88FA5E8C F846891D ..F%.^*.F%.V*.F .V¶+-96,*t...4*$ 000160
 3F8026F2 46FFF25E C44690ED E8107ECE 3B461574 003F8026 F246FFF2 5EC4900E ..á^·.F &.?.t.F;ö~.$Ù.Fá^·.F &.? 000180
 0EFB76FF FA76FF56 02C48301 59E80E57 0875002A 243E83FE 282A3A3E 88F37500 .uµ.>:*+±.>$*.u.W.ÔY..á.V.v*.v%. 0001A0
 26A10000 06C890CB C95F5E02 C483013C E80E5708 74002A24 3E8306C4 830183E8 Ò*..á..>$*.t.W.Ô<..á.^_èù.à...À& 0001C0
 4688C02A 9003E801 80057547 067E8306 7467067E 83FE5689 FC46892A 2816882A *..(*.F=.V±.-.gt..-.Gu¯.$..*á.F 0001E0
```

```
Dump of file SATURN:[PCCOMMON.DUMP.DLL]BRD.TMP;1 on 18-APR-1990 10:36:59.83
File ID (519,15,0)   End of file block 272 / Allocated 272

Virtual block number 226 (000000E2), 512 (0200) bytes

012A3406 C7067500 2A343E83 0D7400FA 7E800006 2A3406C7 0675002A 2C3E83FA *.>,*.u.ú.4*...~*.t..>4*.u.ú.4*. 000000
FF262852 068EFC76 FFFE76FF 2A3636FF 2A3836FF 0676FF2A 3436FF2A 1236FF00 ..6.*.64*.v..68*.66*.v±.v*..R(&. 000020
26285206 8E2A3636 FF2A3836 FF147500 2A0A3E83 1B7400FA 7E800EC4 8310661E .f..á..~*.t..>.*.u..68*.66*..R(& 000040
52068E2A 3636FF2A 3836FF14 75002A34 3E831B74 002A0A3E 8304C483 106A1EFF ..j..á..>.*.t..>4*.u..68*.66*..R 000060
FE76FF1B 742A2A06 082A16A1 0000289A 06C7082A 26068304 C4831072 1EFF2628 (&..r..á...&*.ú..+..À.*..**t..v± 000080
C90129E8 0E50C028 02E80001 880574C0 0804C483 10761EFF 26285206 8EFC76FF .v*..R(&..v..á..át.¡..$.+áP.Ò).è 0000A0
FF26378B 2606468A 1478044F FF262A0C 1EC43C75 002A323E 83560000 00C890CB ù.à...V.>2*.u<á..*&.O.x..F.&.7&. 0000C0
FF077540 06C48311 732CEC9A 0676FF53 2A0E36FF 10E8E42A 04882602 478E2607 .&.G.&..*ôS..6.*S.v..&,s..á.âu.. 0000E0
F6080676 88577500 2A323E83 56570000 02C890CB C95E2A30 06FF9005 EB2A3206 .2*$....0*^èù.à...WV.>2*.uW.v..~ 000100
882A3206 FF047540 06C48311 0B2CEC9A 289C36FF 2A0C36FF 2A0E36FF 1BEB507E ~P$..6.*.6.*.6.+.&,Û..á.âu...2*. 000120
05882602 478E2607 FF263F88 26289CA0 D478044F FF262A0C 1EC41E7E C0084EC6 ôN.á~.á..*&.O.xà..+&.7&..&.G.&.. 000140
830A768B 56570000 02C8CBC9 5F5E2A30 06010646 88077500 2A323E83 D4E8E42A *ôSà.>2*.u..F...0*^_èùà...WV.v.. 000160
06C48312 4D2CEC9A 5098078A 26065EC4 2A0C36FF 2A0E36FF 22E85E75 002A323E >2*.u^$".6.*.6.*á^.Ì...P.&,M..á. 000180
8A26065E C4CD7804 4FFF262A 0C1EC425 74C0084E C6880646 FF2A3206 FF047540 âu...2*.F..6N.át%á..*&.O.xèá^.&. 0001A0
0A468807 75002A32 3E83CAEB E42A0588 2602478E 2607FF26 3F88262A 0C1EC407 .á..*&.7&..&.G.&..*ôSò.>2*.u..F. 0001C0
89FC4689 C028F656 89F44689 2A381688 2A36A156 00000CC8 CBC95F5E 2A300601 ..0*^_èùà...VÀ6*..8*.F¶.V~+á.F*. 0001E0

Dump of file SATURN:[PCCOMMON.DUMP.DLL]BRD.TMP;1 on 18-APR-1990 10:36:59.83
File ID (519,15,0)   End of file block 272 / Allocated 272

Virtual block number 227 (000000E3), 512 (0200) bytes

751028 9A 3E830676 28F?28F8 468904C4 830E862F EE9AF476 FF522A3A 3688FA46 F*.6:*R.v¶.Ÿ/...á..F½+Þ+v..>.+.u 000000
3E831975 2D3F8026 F45EC422 75002A24 3E834E01 7508289A 3E8308E8 02??8305 ..Ÿ.$..>.+.u.N.>$*.u"á^¶&.?-u..> 000020
F6080874 30289C3E 83F84EFF 02C483FE 71E80E50 98078A26 F446FF12 753C?89C .+0u..F¶&...P.Òq±.á..N%.>.+0t..~ 000040
FC46FF07 7400289A 3E830066 E80EFA46 FF077400 067E8318 74002A24 3E83??7E ~..>$*.t..~..t..F*.Òf..>.+.t..F* 000060
0E047500 FA7E830A 7400067E 8302C483 FE7EE80E 56297500 2A243E83 0070E80E .Òp..>$*.u)V.Ò~±.á..~..t..~*.u.. 000080
85E80EF4 76FFF676 FFF876FF 0040E80E 047500FC 7E830A74 00289A3E 830039E8 Ò9..>.+.t..~*.u..Òâ..v½.v~.v¶.Òç 0000A0
2A163E83 C8C95E02 C483FE38 E80E5600 20289C06 C70E7400 2A243E83 06C483FE ±.á..>$*.t.ú..+ .V.Ò8±.á.^èù.>.* 0000C0
9A3E8302 C483FDC8 E80E306A C802C483 FD02E80E 50002088 03E80028 88057400 .t.¡+.$.¡ .P.Òá*.á.ùj0.Òà*.á..>. 0000E0
000006C8 C802C483 FDAAE80E 50007888 03E80058 88057400 2A123E83 1775102B +.u..>.*.t.¡X.$.¡X.P.Ò`*.á.ùà... 000100
E80A46FF 022A2606 83378826 2A261EC4 12752A3F 80260A5E C40001FE 46C75657 WVúF±..á^.&.7*u.á.&*&.7..&*..F.$ 000120
303CFA46 88078A26 0A5E88F6 280A46FF FFFFFE46 C7087520 3F80260A 5EC49060 '.á^.&.?-u.úF±...F.+~.^.&...F*<0 000140
187F3930 802606E8 F8880030 289C06C7 0675303C 0A752A2C 3639387F 393C3F7C |?<9.;96,*u.<0u.ú..+0..«$.&.=9.. 000160
468C0A7E 890F7D30 30802647 F18830E9 83C803E1 D1CE0302 E1C1CE88 98058A26 &....öèÀ..öìÀ.á.Ò0.þG&.=0)Ò.~..F 000180
10608857 000004C8 CBC95F5E 0C56880A 46883789 26065EC4 F088EEF7 FE46880C ..F±%Ÿ.Þá^.&.7.F..V.^_èùà...W¡'. 0001A0
FC7E8900 0188F475 00382611 74003080 264701E8 FC7EC406 4E8AFE5E 8CFC4689 .F*.^±.N.á~*$.G&.=.t.Ì8.u¶¡...~* 0001C0
108406C7 1CE88480 34301084 06C790C8 C95FC028 FE468CFC 7E899009 E8FE468C .F±$...~*.F±+à_èù.ú...04¯.$.ú... 0001E0

Dump of file SATURN:[PCCOMMON.DUMP.DLL]BRD.TMP;1 on 18-APR-1990 10:36:59.83
File ID (519,15,0)   End of file block 272 / Allocated 272

Virtual block number 228 (000000E4), 512 (0200) bytes

FF047400 10FA3E83 8A803031 108406C7 08E08180 31301084 06C712E8 83803330 03¯.$.ú...01¯.$.ú...10¯..>*..t.. 000000
08147532 609A1080 8811372C 5C9A1086 A3E42A32 31108406 C706758C 3C10F81E .%.<.u.ú...12*ôÈ...\,7.£...'2u.¡ 000020
3E88C314 922C029A 108636FF 14862C86 9A50FFE4 051086A1 147D2C86 9A5000FD *.P.Ñ,).À...ô.P.Ñ,...6.......û.> 000040
D901FAD1 08D1D901 FAD108D1 D901FAD1 29747F80 C2F7C033 0254880C 88FC1F7A z.*...Ì.3à%ö..t)Ì*ÌÌÌÀÌ*ÌÌÌÀÌ*ÌÌ 000060
88EAE8D0 8AC888C3 F7880655 89044089 02458900 0005C738 00C2818F E680D8D1 ÌÀ.Ì..ô.8ú....E..M..U..%ù.à.À$ô. 000080
D3D1E2D1 D3D1E2D1 D3D1E2D1 F88AADDC 8AF08AAD D48AC80A ADC888AD FC1F7A3E >z.*Ù.àÙ.à.àÙ.Þ.ÉÙ.%ÌâÌ€ÌâÌ€ÌâÌ€ 0000A0
E0D1E0D1 38723800 2D3D7747 E03D7FF0 25E922EC 8AF90A80 8101CA80 0374CD0A .èt..ò.Ÿ..*.$"Ö%Þ.*ÀGw*-.8r;ÌÀÌÀ 0000C0
74C00817 747F8030 00800508 73000383 01C68010 7401C6F6 15720777 D13AE0D1 ÌÀ;Ìw.r.~ó.t..ó..Æ.s....*..t..àt 0000E0
F7880245 890589C0 33FE08E9 C3F78805 89C68AE3 8A024589 E50AC70A 7FE78016 ..Ô..ú.Ì.E..D.ó...%ùÒÙ±3à...E..% 000100
79C008C3 88D088DA 8811E8DA F7157902 08083300 8810E8C3 88D088DA 88D233C3 ù3Ø.Ö.À.ù$..À3Ù.Øy.%Ò$..Ö.À.ú.áy 000120
08D833C8 881DE8C3 88C888DA 88D23304 74E99E84 8024C48A 00D8830A F7D8F707 .%Ù%ö.Ù..á$.Ç.Òt.3Ø.Ö.à.ù$..à3Ù. 000140
0233FF33 8024C48A 00D88309 F7D8F707 79C008C3 88C888DA 8811E8D9 F71579C9 èy.%1$..Ö.à.ú.áy.%Ù%).Ù..á$.3.3Ø 000160
01677500 0283C001 0026E803 E80035E8 08E8002B E80DE800 3AE807B5 E985608D §'.Òç.Ò:.$.Ò+.$.Ò5.$.Ò&.1á.Ø.ug1 000180
2CE80DEB 002CE8C3 4E75D20B 0039E803 E8005DE8 08E8003E E80DE800 9CE8C3C8 àùÒ..$.Ò>.$.Ò].$.Ò9..ØuNùÒ,.$.Ò, 0001A0
C2010001 83000283 F5D8F7D2 F7D1F700 79FF08C9 330041E8 03E8007B E808E800 .$.Ò(.$.ÒA.3è..y.%Ì%Ø%À%.Ø..Ì.1ò 0001C0
C3130813 F581F980 CD0AE822 01850833 001CE803 E80056E8 C3CAD121 75000183 .Ì.uÌÌòùòV.$.Ò..3Ùç."Ò.ë.*.%.Ù.û 0001E0
```

Dump of file SATURN:[PCCOMMON.DUMP.DLL]BRD.TMP;1 on 18-APR-1990 10:36:59.83
File ID (519,15,0)   End of file block 272 / Allocated 272

Virtual block number 229 (000000E5), 512 (0200) bytes

```
80F1220F 86F98808 EE8391AD 91AD93AD D60A92AD 00A4E9FD E9E9C301 72000283 .@.r.ùÕÕ»ÕÉ.Ù..øÙ.Ù.Ù..Ý..°Ñ.™þ. 000000
EB25E983 CA7F20F9 83787203 FEE981D8 74C908E9 D1E9D1E9 D1E9017F E58010CE ö..|.1ÕiÕiÕiÕ.ètÀ.Õz.rx.° .ò.ÕX§ 000020
080CD0F9 D1D0E!D0 7FE183F9 88E98A04 EE83C186 ACC88AAD F88AACDA 8AD2332F /3@.Õ¯.½Ù.à¯.é.Ý..Õ.°.Ã.ÀðÃ1°ÄÉ. 000040
01E28002 D0F501FA 801A7C08 F98009F7 20E98399 7F20F983 47727EE9 804074C9 ètM.Õ~rG.° ...Õ ½1.°.|..°.½À@.ã. 000060
D1D8D1EE D0000A80 01B201FA 8015E3E1 E808E980 F632E68A C48AF88A DF8AD30A .Æ.Õ.½.á.12-.Õ.$ÃD..°.ý..Õ.ÀÝ1À1 000080
0068E8FD 35E9C300 88C03300 01800081 F9C3C388 D088CA8A F3E20002 800AD008 ÛÀÕ.@.ãµ.ò.À.ùü°Ý..1.3á.ÀùÕ5»Õh. 0000A0
C3FE8806 7C89E073 7FF0FA81 7FE680D7 8810EF83 067C031F 7A368801 31E807B0 ¯.Õ1..6z..|..ÿ..■.|..°Þ.sÀ.|..±û 0000C0
737F80FA 817FE680 D7880080 EF81027C 031F7A36 880108E8 03800087 E8FD0FE9 Õ.»Õ..¯.Õ...6z..|..ÿ...■.|..°..s 0000E0
EF811F7A 36880053 E8C3FE88 067C0110 EF831F7A 3688001E E8C3FE88 027C890F Õ.|..±ûÕ...6z..ÿ..|..±ûÕS..6z..ÿ 000100
00108A1F 7A3688C0 8EA5A5A5 A5C18ED9 8CC08C1F 7A3E88FC C3FE8802 7C010080 ...|..±ù•.>z..á.\.éÉÉÉ.á.6z.□.. 000120
E901E9D1 E901E9D1 0C35887F E580CF88 F0E78306 4C89CA0A 0FE183F9 88064C88 .L..°.Ã..ò.L..Õþ.ù.|.¡5.1ÕiÕiÕiÕ 000140
1F7A3688 C08EA5A5 C18ED98C C08C1F7A 3E88FC00 82E93FE8 D9F7047D 0..3E981 .Õ3.).½1§7Õ..•.>z..á.\.éÉÉ.á.6z. 000160
32CD8AE1 D1001888 7FE580CF 8880E783 024C89CA 0A7FE183 F988024C 88G!!308A □...L..°.Ã..ò.L..Õ..ù.|.¡..1Ã.è2 000180
00E581EF 88C8880A 74C838FA 088000E7 81147CEF 88C83809 F7487D00 96E961ED Ù.Õ..)H½1;à.ÿ|..Õ...°;àt..à.ý.1. 0001A0
348AE7E8 4608E980 0004C614 0A000280 0082F501 FA80147C 08F98002 33EA2880 .+õ3@.°.|..°.½ý..@...ó...Õ.FSÕ.4 0001C0
D106E3E1 8AEF8A00 018BC334 8AD188C9 33C32C88 E822EE8A D7C18A1D 8A880CE3 Õ.É...ëm.Ý"Õ.,ù3è.1.4ùÉ...ÿ.ÃD.1 0001E0
```

Dump of file SATURN:[PCCOMMON.DUMP.DLL]BRD.TMP;1 on 18-APR-1990 10:36:59.83
File ID (519,15,0)   End of file block 272 / Allocated 272

Virtual block number 230 (000000E6), 512 (0200) bytes

```
981F7A0E 88E2D3CC 8AFD8802 74000A80 01B281FA 80D30ADE 22D70AFA E2D700EA õÀøã°.ø"B.Æ.°.ý..Õ.t..».ãÆã..z.. 000000
CC80F8C8 E9C3F5D3 D14C747F 80C3F7C3 FAE20014 804606E3 3488F202 CE28C803 .à+ö.·.4D.F...ã°ùÀù..tLiÆ½ùÕà«.ä 000020
F77F80C3 F7D3F7E2 7400F77F 80A9D0F7 E1747F80 A9025D88 26024488 C3E4D07F .Àõù.D.&.).`..tÃ½Ã`..½ÀtãÆ½ù..½ 000040
04880575 C338DA8E C18ED98C C28CF787 930873E0 D1E3D1D5 78EF32EC 8AD87403 ÆtÀ.&2ýx11D1Às...½.ò.).è.Õ;ùu... 000060
F0A9065D 88260644 88C3E400 7FCC80FB 75E9C3F5 D3D15E74 7FF0C3F7 C3053826 &;.ùÆùþ.t^1Æ½ùÕu«.à.Àõù.D.&.).`þ 000080
E0D1E3D1 D578EF32 EC8AD874 D3F77FF0 C3F7D3F7 E274D0F7 7FF0A9D0 F7E1747F .tÃ½Ã`þ.½ÀtãÆ½ùþ.½ÆtÀ.&2ýx11D1À 0000A0
45382602 44880E75 04453826 04448817 75C3380A 8EC18E09 8CC28CF7 87930873 e...½.ò.).è.Õ;ùu..D.&;E.u..D.&;E 0000C0
80CF8000 82358A01 50880245 8803E880 F4800245 88F787C3 05382604 88057502 .u...&;.ù.½.E..¶.$..E..)..5ÿ..ü. 0000E0
73EC3A58 74E40A65 74ED0AC0 D1C1D180 00CE81FF 00E78101 7488FF7C 88024C88 .L..|..t..Õ...ö..lëlä.Ùte.Õt[:&s 000100
7C0EF980 55E30085 CD8A91D9 D0E8D0C9 D0497718 FC80DCF6 E52A91FA 87F38705 ..µ.°.*|-É.•.w[ÀèÀÕÀ)..ëç.DU.°.| 000120
8A01CE80 0374D20A 287E05F9 803E741D 7210E980 D8330388 01C88003 74D20812 ..@t..ù..Æ3Ù.Õ.r.t>.°.-+.@t..ö.. 000140
E800C188 D788D0E88 19E8F875 C1FED3D1 E2012374 177708E9 80FD8ADF 8AF38AD6 ø.µ.Õ.».Õ.w.t#iãiÆ±êu%$..8.■.èÀÕ 000160
13D70314 70E0D020 CA800374 3FC2F6FA E2DAD1E8 D120CA80 03743FC2 F60097E9 Õ..-ô?t..ò 1$ioã°-ô?t..ò ÀÀp..■. 000180
F5DAF7D3 F70A730E 880788F3 18FA28FA 41E94575 FFFC80C4 FEDAD108 D150730E 8sP1Ùiõ±á.•.uÉÕA°+°.µ.■.8s.½Æ½Õ½ 0001A0
8AF88A58 7608EC80 0F75FF0A 6474D808 DA876A76 10EC8008 75D808D0 F6000383 .Æ.-À.Ùu..$.vj.Õ.Ùtd..u..$.v[.«. 0001C0
80FA8001 7CE90374 001D923E 80F671D3 D1E2014B 74CCFE0A 78FF0AD2 32F28ADE 8.·2@..x.±ätKiãiÆq-.>...t.Õ|..°. 0001E0
```

Dump of file SATURN:[PCCOMMON.DUMP.DLL]BRD.TMP;1 on 18-APR-1990 10:36:59.83
File ID (519,15,0)   End of file block 272 / Allocated 272

Virtual block number 231 (000000E7), 512 (0200) bytes

```
747F80A9 D8D1E000 3A74FFFC 80C4FE07 73000383 01C6800F 7401C6F6 14720777 w.r.-ó.t..ó..Æ.s.±á.•.t:ÀÀ1À`..t 000000
E9037400 1D923E80 C3F78805 89C68AE3 8A024589 1F7A3E88 C70A7FE7 80802417 .$..Õ..ú.>z..E..D.ó...½ú.>...t.Õ 000020
E40AD8D0 E0019634 88ADFCF9 9DE9E679 C3F78805 89024589 1F7A3E88 C033017E -.3à.>z..E....½ûý1Õ.°=ù.4.1ÀÀÃ.ö 000040
80C48003 70E5027F ED8080EC 80C132D8 88308BC8 74ED0AD9 D0E1D102 4D880674 t@.M.1ÃÃ1.Ùtù.=.Ã2è.&..Ù..1pÆ.á. 000060
E7F7C588 509FC008 DA88E7F7 C688E888 80C98080 C880EF8A FF3250CD 74FFFC80 .•.tèP2..ÿ.ù..è..$.ó½Õ.Õ.á.P.é½Õ 000080
5893D388 C703E1F6 C58801C8 8003749E 58FA1308 03E6F7C1 88FA8800 D2830803 .Ã.@..°.è½1.À.°X.t..ù..é-Ã.ú.Æ.X 0000A0
E1D1024D 88F787FF 1AE9AD74 FFFC80C4 FEFF69E9 0A75E40A D3D1E2D1 0878FF0A ..x.1ã1Æ.õu.Õi.±á.•.tùÕ...½.M.1Ã 0000C0
FF78E903 71E52A7F ED8081EC 80C132D8 74E40A5C 74ED0AD8 D0E0D102 44880900 À1.D.1ÀÀÃ.Ùt\.ôtÙ2è.&..Ù.°1q.Õ(. 0000E0
D9D1E8D1 0874001D 923E8080 CF80C932 2D8A015D 88FF78E9 0375FFFC 8080C480 .á..•.u.Õx..]..-2è.ü..>...t.1$11 000100
74D688C2 080011E8 EE88001A E8D8D1EA D180CE80 C032248A 01548850 1D923E02 .>..P.T..$2á.ö.1õ1ÀÕ...ÝÕ...ó.øt 000120
18D8F7E1 F7C688FA 8815E3C0 3396F3F7 1D73033B F880E9FF 76E9DD88 01CA8003 ..ò..1Õv.Õ¯½;Æs.½µ.3àÕ..°.ó½Ã½Ã. 000140
2E8A001D 9206C6C3 ED73C188 D003C128 FFFF8EC3 F9730313 C1034E07 730788FA °.øs.N.ê.Æs°ù/..+è.À.èsÙùó...... 000160
D2335253 5010951F 7A06C71F 7A36FF38 74E40A3C 77EC3A0E ED800774 ED0A1D94 ...Ùt..Ù.:$w<.õt8.6z.ù.z...PSR3@ 000180
FE33E91F 7A068F58 5B5AFE0F E8FF3252 53501D99 1F7A06C7 58585AFE 4EE8DB32 2ÙÕN±Z(Xù.z...PSR2.Õ.±Z(X..z.Õ3± 0001A0
97A31095 A3C033FE 1AE85253 5010991F 7A06C71F 7A36FF1D 92A2D233 D833C033 3à3Ù3@Ã...6z.ù.z...PSRÕ.±3àÈ..É. 0001C0
E60A80E6 807FE480 ADA5A5A5 1F7A3E88 F78B1DEB 8000F581 066D88F7 87D3EB1D .$Æ.½.m..½..$..½.>z.ÉÉÉÙ.ò..|..| 0001E0
```

```
Dump of file SATURN:[PCCOMMON.DUMP.DLL]BRD.TMP;1 on 18-APR-1990 10:36:59.83
File ID (519,15,0)   End of file block 272 / Allocated 272

Virtual block number 232 (000000E8), 512 (0200) bytes

 3BE0E5B3 D274FFE0 25DAD0E0 D1DED0E5 D10644B8 FC0660B8 C3FE8B1F 7A3688A8 ¨.6z..±ù.m.».D.¹ÌÅ±ÌÅÅÖXÅ.t@.ÌÅ; 000000
 C0D157D0 D1E2D0LD D1E60089 7706A030 D8F7C528 C274C008 D68695F7 870977E8 Ðw..%..ø.àtó÷éXÅ=..w¿ÅÌÌÌÅãÌÌWÌà 000020
 0EFF8363 74FF0810 CC800FE4 80AD93AD 91AD92C0 32E08AAC F888E086 C0D1C001 ÌãÌâ.Å.%¯.Å2â.Ù.Ù.Ù.Õ..ä...tc... 000040
 0A2B7C06 FF832372 4874E777 10EF83C0 33D888C8 88D18801 C9800374 D208187C |..@t..è..Ì.ù.Å3â.ÿ.wÖtHr#...|+. 000060
 D1E2D123 740F7708 EF83E432 C48AF88A DF8AE88A CD8AF18A D68A01CE 800374D2 @t..ö..ø.þ.ë.Š.Ö.%.á2ö.ÿ.w.t#Ìâì 000080
 CF87F6E2 DAD1DFD1 D8D1E8D1 20CA8003 743FC2F6 CF8716E8 F57547D0 D1D30101 ÌÌÆÌÅGu%Š..ü-ö?t..ò ÌÖÌÜÌÖÌÖã-.ü 0000A0
 05748850 9F50035C 13014C13 3402D800 E5013870 E5D120CA 8003743F C2F6975E ^.-ö?t..ò Ìp;ÌÌÅÅ.4.L..\.P.P.t. 0000C0
 FD8320C5 830AD109 D108D1DF D1137420 00C7F7FE 13589E58 1000CE81 0FFFE681 .Ì...ö..X.X.±%ú. t.ÌÖÌÜÌÌÌÖ.é .» 0000E0
 810FFFE6 819F0574 88035C18 014C1834 2AD0F608 D0E5D100 88E9F6EC E90375E0 Åu.Öš-Ö..ÌÌÅÅ-Å*4.L..\..t...Ì... 000100
 0B0004BE FCFE130E 13CE13F5 DAF7D1F7 D3F7D7F7 D0F6F633 1373FE18 9E1000CE ö....±ø.3--Å%wÅ£%Ì%Ö%.ö.ß.±»ƒ... 000120
 751FE0C7 F7E4E8D2 33CA8809 88FB8830 744E4076 0200E081 1375E0C7 F61875FF .u.-úÅu..Ü..vâNt=.«.Ì.ö3@Šö%úÅ.u 000140
 83127510 00C7F797 0082F28A CE8AE98A D08AF88A C78AE08A 97277601 00ED8118 ..Ü..v'..Å.ú.«.Ì.Õ.ö.·ÿ..%ú..u.. 000160
 7780FA80 0385E903 74001DAA 3E80FC90 65E8E8E8 07D10301 D1D1E2D1 717420ED Ü tqiâÌÌÌÆÌø$$$e.».>¯..t.Õ...¹.w 000180
 E0FD8320 C5830874 2000C7F7 00D78300 D3830001 8301C680 1A7401C6 F61F7207 .r.-ó.t..ó..Ì..Æ..ø.%ú. t..é .»Å 0001A0
 50880645 89C70AC5 08C032E0 862274ED D10FE780 8024DE87 1F7A3E88 F7883074 t0.%.>z..8$..Ó.ÌÜt".Å2â.é.ú.E..] 0001C0
 0377E903 74001DAA 3E80FCF5 FDE90379 C3F78805 EF83ABC6 88ABC188 AAC68A05 ..ó¯.é¨.ó¨.ÿ..%üy.Ö»%».>¯..t.Öw. 0001E0

Dump of file SATURN:[PCCOMMON.DUMP.DLL]BRD.TMP;1 on 18-APR-1990 10:36:59.83
File ID (519,15,0)   End of file block 272 / Allocated 272

Virtual block number 233 (000000E9), 512 (0200) bytes

 81D13306 4D880874 7FF02500 88064488 FCC3FE88 ABABABAB F78B1F7A 3E88C033 3à.>z..%¨¨¨¨¨¨.±Ü».D..Å%Þ.tÜ.M.3Ì. 000000
 D8D1E600 8674FFE0 30800005 8C70C103 7FE0E981 800020E1 D1E0D100 747FF0E1 ÅÞ.tÅÌÅÌÅ·...ÖÅ..ép¥...=Å.tÑÅÌÌÅ 000020
 0A75ED08 D7D1D301 D1D1E2D1 0E751000 C7F7D8D0 E5D15001 CA800374 D1B1E850 PÒ..t..ò.]ÌÌÌÅÅ%ú..u.ÌâÌÌÌÆÌø.Üu. 000040
 4488EF74 7FF0E181 D1880640 88FCF787 F58CE9FF 24E98874 E0FD8320 C58393E8 Š..é .»Åt.Ö$.Ö.%.%=.M..Ì.Åþ.tÿ.D 000060
 D09874FF E0308000 059870C1 287FE0E9 81802020 E1D1E0D1 98747FF0 25D03306 .3Å%Þ.t.ÌÅÌÅ· ..ÖÅ.÷ép....=Å.t.Å 000080
 ADFD1DA8 BF05C683 F7885092 10CC800F E480AD92 AD93ADC9 32E88AAC 500801E6 ÌÌAP¯.Ö2èÜ.Ü.Ü.Õ..ä..P.%.ó.é´.»Ü 0000A0
 E888ADF7 881DA8BF FD1F7400 1DAA3E80 0005C6FC A44746A5 A5AB10CC 800FE480 .ð..ä.¨EEFGÊ»ó...>¯..t.»é´..%Ü.Ö 0000C0
 E8090108 D1D8D1EA D158FCA8 D8D1ADA8 D8D1ADA8 D8D1ADED D1A81DAA 2602E801 ÌÖ.&¯.¨ÌÜÜÌÅ¨ÜÌÅ¨ÜÌÅ¨=XÌðÌÅÌÜÌÌÖ 0000E0
 C2F601CA 8003745F 58590788 C208C108 C3080033 E8570037 E857003B E857003F ?.WÒ;.WÓ7.WÓ3..ü.è.ó.øY{ t..ò.-ô 000100
 08E90AD1 D901D8D1 EFD1DAD1 D901D8D1 EFD1DAD1 D901D8D1 EFD108CA 80037407 .t..ò.ÌÿÌÜÌÌÌÖÌÿÌÜÌÌÌÖÌÿTÜÌÌÌÖÖ. 000120
 C00B1DA2 A1F588E0 339752F6 F73B77F0 38047502 085C7306 3BFF331D A83688FF ..6¯.3.;øs\.@u.;Þw;%-R.3Ü.%ÅÅ..à 000140
 83E803E7 F70874C0 081DA6A1 EA13F003 E7F70674 C00B1DA4 A150F288 E7F70474 t.%Ó.·PÅÊ..ât.%Ó.Þ.õÅÌ..ât.%Ó.Ö. 000160
 1DA60613 1DA41E13 1DA20E03 4F137393 919295E8 18500018 CE18DAF7 5A920002 @..Z%Ö.ó.Ì].Ö....s.O..Å...Ê...Ì. 000180
 1688C213 1DA61E13 1DA40E03 1DA60618 1DA41E18 1DA20E28 4FC3ED73 1DA81613 ..¯.sÜÜO+.Å...Ê...Ì...Ê...Ì..ó.. 0001A0
 88E888D8 331DA0A. 100C0F24 06458A1D 9EA3100C 0F24E432 06448AC9 E8F51DA2 Å.%Sè.O.2Ö$...Ê...E.$...Ê..3Ü.$. 0001C0
 ED3355DA 13C803E2 F70674D2 08025588 0488CA88 E888E1F7 08E30D88 911AE30C .O....D.%Å.Ö.ò...U..@t.%ã.à.OU3Ü 0001E0

Dump of file SATURN:[PCCOMMON.DUMP.DLL]BRD.TMP;1 on 18-APR-1990 10:36:59.83
File ID (519,15,0)   End of file block 272 / Allocated 272

Virtual block number 234 (000000EA), 512 (0200) bytes

 0D74C008 02448850 C10858D5 D1DA13C8 03E2F708 74D20815 880E74C0 08024488 .D..ât....@t.%ã.à.ÖÌÌX.èP.D..ât. 000000
 D803E2F7 08740208 0455880F 74C00804 88C933EA 130803E2 F70674D2 08025588 .U..@t.%ã.Å.õ3è...ât..U..@t.%ã.Å 000020
 048850C3 08580001 83EA1308 03E2F709 74D20815 880F74C0 08044488 D1D1EA13 .õÌÌ.D..ât....@t.%ã.Å.õ.Ì.X.ÜP.. 000040
 0802448B 0833CA13 E8031D9E 26F70874 C0080588 CA13E803 1DA026F7 0874C008 .ât.%&...Ö.ò...ât.%&...Ö.ò3Ü.D.. 000060
 0974D208 02558810 74C00804 4488D301 CA13E803 E2F70874 D2080455 880F74C0 ât..U..@t.%ã.Ö.òÌ£.D..ât..U..@t. 000080
 C0080244 88DA13C8 031D9E26 F70874C0 08024588 ED335500 D383CA13 E803E2F7 %ã.Ö.ò.£.U3Ü.E..ât.%&...à.Ö.D..à 0000A0
 D5D1DA13 C803E2F7 08740208 0455881A 74C00804 4488DA13 C8031DA0 26F70874 t.%&...à.Ö.D..ât..U..@t.%ã.à.ÖÌÌ 0000C0
 A026F61D 9EA0EA13 D8031D9E 26F70874 C0080445 88EA1308 031DA026 F7044488 .D.%&...Å.õ.E..ât.%&...Å.õ...-&. 0000E0
 F60B5ED7 D1D3D1D1 D1E2D107 D1D3D1D1 D1E2D107 D1D3D101 D1E2D15A 97C5031D ..é.ZÌãÌÌÌ£ÌøÌãÌÌÌ£ÌøÌãÌÌÌ£Ìø^.- 000100
 06C71F7A 36FF4C74 ED085077 F53804C0 EE810874 F6081DA8 36880010 AA06C6C3 ùó.¯...ó¨..-t..Ÿé.;%wP.ÙtL.óz.ú. 000120
 501D851F 7A06C758 575A5850 5FFC3EE8 D233C933 D8335755 53525150 1DAD1F7A z.Ü.PQRSUW3Ü3è3@Ò>»_][ZYXú.z.ç.P 000140
 330B3302 33C933C0 33FC1AE9 1F7A068F 58595A58 5D5FF8D1 E8FF3357 55535251 QRSUW3.Öì«_][ZYX..z.Ö.»3ã3è3@3Ü3 000160
 ABABC033 1DAD8FF8 F8E85755 53525150 1D851F7A 06C71F7A 36FF1DAA A2FF33ED Ü3.Å¯..óz.ü.z.ç.PQRSUWÒ%«¢Ü.3â¨¨ 000180
 56EC8855 08E8A536 A536A536 A5361DCC 8F0E768D 071EFC57 56EC8855 C6E8ABAB ¨¨$óU.$VW»...v.¢ä.6E6E6E6E$.U.$V 0001A0
 1F7A06C7 1F7A36FF 1DCC8F1D C48EA536 A536A536 A53610C4 8F067680 071EFC57 W»...v.¢á.6E6E6E6E/ó.¢ä..óz.ú.z. 0001C0
 C01E89C8 8AC933C8 5DE5885E 5FDA8C1D D4880872 1F7A068F 585D02FF 55531DD4 à.SU.@][..z.r.¡Å..Ö_^.Ì]ü3è.à..à 0001E0
```

```
Dump of file SATURN:[PCCOMMON.DUMP.DLL]BRD.TMP;1 on 18-APR-1990 10:36:59.83
File ID (519,15,0)   End of file block 272 / Allocated 272

Virtual block number 235 (000000EB), 512 (0200) bytes

 0C74073C 127403FC 8010048F 0110EB06 C6057503 0230001D EB06C610 C21E8C1D ...ó.ó.$..=..u.ó.$..¢á..•.t.<.t. 000000
 A526E88E 07EB801D DB0E80A5 A5A5A526 E88E0381 17EBABAB ABABC033 1874033C <.t.3á     $.Ý./Ò&EEEE..Û..$./Ò&E 000020
 1DE83E80 21B09475 C00B04C4 83149832 C59A501D BE881EF1 881D8E0E 89A5A5A5 EEE..ƒ..þ.¡ƒ.P.é2...á..âu.¯!.>$. 000040
 9A481DC0 1E881874 F60B1D0A B48BE6D1 239EA398 22800272 031D8E3E 83077500 .u..>ƒ..r.¯".È.#îl.ÇÖ..-t...á.K. 000060
 FE881F7A 3688C3F9 0501B8FF 59E922CA 2CB69A56 22C23260 9A1DE888 22913260 '2."£Ò..'2ó"V.Ñ,ò"ÕY.¡..ªû.óz..± 000080
 E02D077B FFF025E1 747FF0A9 F88A0644 88270ABF FCC3F8FE 88ABF300 0489C033 3â¿..µ¨.±Ýû=¢.'.D..Ý`Þ.tÃXÞ.x=-Á 0000A0
 80CF8003 D1D1D1E2 D1D301D1 D1E2D1D3 D1D1D1E2 D1560154 88034C88 055C8A3F ?.\..L..T.VIâIIIÆIâIIIÆIâIIIÆ.Ü. 0000C0
 81885236 EBF90372 FEFB8306 45893FE0 05F8D1DA D1D9D1E8 D1001005 097410A8 ¨.t....ISIIIÖI%.Á?.E..«±r.ªS6R¡Ý 0000E0
 E813F9F5 F7C18803 880D01E8 03F5F7C0 330388FF FFBD0373 EA035708 BDE3F7AF £XÐ§ÃW.õs.§...£3áXX.ÒII.Æ.èXX'.Ò 000100
 D1D301E1 D1D001D3 D1E1D1C0 330E03C8 880D88F5 F758F088 F5F7C188 D3880D01 II.Æ.èXX.ÞXXX.I.à.B3áIÃIÆIÃIÃIÆI 000120
 5FF813E8 575E0000 05C7024D 89045D89 06450800 D1D301E1 D1D001D3 D1E1D1D0 ÃIÃIÆIÃIÃIÆIÃ.E..]..M.û...^WÒ.«_ 000140
 0125C187 F6D88898 078A2606 5EC45657 04EC83EC 885500C3 F8100660 83F8A5E8 ÒE%.m..Ýû.U.$.$.WVá^.&....Á-.èX¯ 000160
 058A2647 F8881674 00653098 078A2606 5E8807E8 00200598 078A2606 5E880C74 t..^.&.... .$..^.&...=e.t..«G&.. 000180
 2E07C626 0646FFF0 8898078A 26065EC4 08468C06 7E89F275 0425C187 F6D88898 ..Á-.èX.u·.-..F.á^.&....Þ.F.&ó.. 0001A0
 C85DE588 5F5EFC7E 89E975C0 0A0646FF F7880788 26C688F8 8898078A 26065E88 .^.&....Ý.ó&...X.F..âuÒ.~•^_.[]ù 0001C0
 468C067E 89F37500 30802647 07742E3D 80269008 E8067EC4 565706EC 83EC8855 U.$.$.WVá-.$..&.=.t.G&.=.uµ.~..F 0001E0

Dump of file SATURN:[PCCOMMON.DUMP.DLL]BRD.TMP;1 on 18-APR-1990 10:36:59.83
File ID (519,15,0)   End of file block 272 / Allocated 272

Virtual block number 236 (000000EC), 512 (0200) bytes

 26470774 45308026 00746530 8026900E E8067E88 6774003F 80260646 FFDF8808 ..Ô.F.&.?.tg.~.$..&.=et.&.=Et.G& 000000
 264F9002 E8067E`1 FE5689FC 4689064E FFC28CC7 8808468C 067E89ED 75003D80 .=.uÛ.~..F..ú.ô.N..F•.V±.-.$..O& 000020
 C40646FF FC76C5... 5E8C064E FF03752E 3F80260F 8808468C 067E89F9 74303D80 .=0tª.-..F..Ô&.?.u..N..^ªéve.F.ó 000040
 541E8DEC 885590C8 5DE5885F 5EFA5E8E FE5E8CFC 7689F275 C00A0788 26AC065E ^.¯&...âu·.v=.^±.^ª^_.[]ù.U.$..T 000060
 8855C85D C028C85D 00018805 7224F506 D69A24D1 02369A06 5EC424CC 02569A28 (.V.ä$á^..ó.i$.ø.X$r.¡..]ù+â]ûJ. 000080
 88F88808 5EC404C4 83251930 069A0C76 FF0E76FF 24740006 7E835657 08EC83EC $.$.WV.-..t$.v..v...0.X.ó.ó^..«. 0000A0
 7E8D04C4 83253330 069A0C76 FF0E76FF 90C85DE5 885F5E1F A5A5A5A5 DA8E1EF0 Þ..ÒEEEE.^_.[]ù..v..v...03X.ó..~ 0000C0
 885F5E25 AF03A99A 085EC425 3802569A F85E8D1F A5A5A5A5 DA8E1E07 16F088F8 Ý.Þ....ÒEEEE..^Ý.V.;Xá^..`.£X^_. 0000E0
 FA5689F8 468928A0 1688289E A1477400 1DF23E80 56570AEC 83EC8855 90C85DE5 []ù.U.$.$.WV.>·..tGÅ.+...+.FÝ.V̄ª 000100
 000E7E83 FE5689FC 46890C56 880A4603 C02802E8 00018805 75203F83 26F85EC4 á^Ý&.?-u.¡..$.+á.F..V..F•.V±.-.. 000120
 77FF2606 5EC458E8 06C48304 5DE80EFC 76FFFE76 FF50C028 9003E800 0188067E -.¡..$..+âP.v±.v•.Ò]..ó.$Xá^.&.w 000140
 400E4688 5052FA56 89F84689 08C48325 ED327A9A 37FF2602 77FF2604 77FF2606 .&.w.&.w.&.7.z2ÚX.ó..FÝ.VªRP.F.@ 000160
 C02802E8 00018805 75203F83 26F888F8 5EC4C028 02E80001 88057E00 0E7E8350 P.-..-.¡..$.+äá^Ý.Ý&.?-u.¡..$.+á 000180
 5EC4FE56 89FC4689 0C56880A 46880AC4 83264730 5C9A5052 0C56880A 4603C703 .ú.F..V.RP.\0G&.ó..F..V..F=.V±á^ 0001A0
 88260147 8A26FC5E C4147E00 0E7E832D 07C626FC 46FFFC5E C40A7520 3F8326F8 Ý&.?-u.á^•.F•&ó.-.~..-.á^•&.G.&. 0001C0
 88FC4603 0E460308 F7C01801 1DF23E80 501E1DEC 882E07C6 26FC5E88 FC46FF07 ..F=.^•&ó..¡$..P.>·...âXÁ.F..F•. 0001E0

Dump of file SATUPN:[PCCOMMON.DUMP.DLL]BRD.TMP;1 on 18-APR-1990 10:36:59.83
File ID (519,15,0)   End of file block 272 / Allocated 272

Virtual block number 237 (000000ED), 512 (0200) bytes

 FF4507C6 26FC5EC4 07740010 7E83FE56 89FC4689 08C48327 812F889A 5052FE56 V±RP.¡/.'.á..F=.V±.-..t.á^=&ó.E. 000000
 88D8F708 7DF608F0 88480247 8826F85E C45E7430 3F802606 5FC426F8 5EC4FC46 F•á^Ý&á_.&.70t^á^Ý&.G.H.Þ.-).XÃ. 000020
 C6880700 26FC5EC4 F9F70064 B999C688 157C64FE 83FC46FF 2D07C626 FC5EC4F0 Þá^•&ó.¯.F•.±d|..ó.¿d.Xªá^•&...ó 000040
 F9F799C6 88070026 FC5EC4F9 F7000AB9 99C68815 7C0AFE83 FC46FFF2 88F9F799 .Xª.·.F•.±.|..ó.¿..Xªá^•&...ó.Xª 000060
 04EC83EC 885590C8 5DE5885F 5E0C5688 0A468807 0026C688 FC5EC4FC 46FFF288 .·.F=á^•.ó&...F..V.^_.[]ù.U.$.$. 000080
 5689FC46 89FE49E8 0E0676FF 0876FF0A 76FF0C76 FF0E76FF 1076FF01 1DF206C6 ó.·...v..v..v..v..v..v..Òl±.F=.V 0000A0
 1688289E A1517400 1DF23E80 00F246C6 12EC83EC 8855C85D E588001D F206C6FE ±ó.·...[]ùW.$.$.óF·..>·..tQÅ.+.. 0000C0
 46890C56 880A4603 C02802E8 00018805 75203F83 26F45EC4 F65689F4 468928A0 .+.F¶.V-á^¶&.?-u.¡..$.+á.F..V..F 0000E0
 26EE46FF EE5EC4F0 5689EE46 891DF406 03FC4688 6A750E46 391DF4A1 FE5689FC =.V±Å¶.9F.uj.F•..¶..FÝ.VÞá^Ý.FÝ& 000100
 7A9A37FF 260277FF 260477FF 260677FF 26065EC4 4AE80007 C626EE5E 883007C6 ó.0.^Ý&ó..$Já^.&.w.&.w.&.w.&.7.z 000120
 8805752D 3F832650 0E460302 47882 6F4 5EC45052 F65689F4 468908C4 83278132 2Ý'.á..F¶.V-RPá^¶&.G..F.P&.?-u.¡ 000140
 89FC4689 0C56880A 46880AC4 83220030 5C9A5052 0C56880A 4603C028 02E80001 ..$.+á.F..V.RP.\0Å".á..F..V..F•. 000160
 881D7F00 027F8326 F45EC42D 07C626FC 46FFFC5E C40A7520 3F8326F4 5EC4FE56 V±á^¶&.?-u.á^•.F=&ó.-á^¶&......¡ 000180
 26F45EC4 0AE83007 C626FC46 FFFC5EC4 06C48302 05E80EFC 76FFFE76 FF500001 ..P.v±.v•.Ò...ó.á^•.F•&ó.0$.á^¶& 0001A0
 FC5EC406 C48301D8 E80EFC76 FFFE76FF 500001B8 687E000E 7E83FC46 01024788 .G..F•.-..-h¡..P.v±.v•.ÒA..á.á^• 0001C0
 0EE8D8F7 02478826 0874001D F23E8043 7D00027F 8326F45E C42E07C6 26FC46FF .F•&ó..á^¶&....)C.>·..t.&.G.XÁ$. 0001E0
```

```
Dump of file SATURN:[PCCOMMON.DUMP.DLL]BRD.TMP;1 on 18-APR-1990 10:36:59.83
File ID (519,15,0)   End of file block 272 / Allocated 272

Virtual block number 238 (000000EE), 512 (0200) bytes

 FF06C483 0196E80L FC76FFFE 76FF500E 46890E46 88037E0E 463BD8F7 02478B26 &.G.%A;F.-..F..F.P.v±.v=.Ò...ó.. 000000
 8855C85D E5880C56 880A4688 08C48328 C832189A FC76FFFE 76FF5000 30880E76 v.¡0.P.v±.v=..2à(.ó..F..V..[]ùW. 000020
 89FC4689 FE6EE80E 0676FF08 76FF0A76 FF0C76FF 0E76FF01 1DF206C6 04EC83EC &.&.ó.·...v..v..v..v..v..Òn±.F=. 000040
 FF260477 FF260677 FF26065E C45606EC 83EC8855 90C850E5 880010F2 06C6FE56 V±ó.·...[]ù.U.&.&.Vó^.&.w.&.w.&. 000060
 1DF4A348 02478B26 2B9E1EC4 28A01689 2B9EA308 C4832904 327A9A37 FF260277 w.&.7.z2.).ó.È.+...+ó..+&.G.HÈ¶. 000080
 520E76FF 5306FE56 89FC4689 0C56880A 4603C028 9003EB00 01B80675 203F8326 &.?-u.¡..$..+ó.F..V..F=.V±.S.v.R 0000A0
 F6A2C02A 02EB0180 047D10F4 36394E02 77882628 9E1EC40A C4832A04 305C9A50 P.\0.*.ó.ó..+&.w.N96¶.).¯.$.*àÀ- 0000C0
 0876FF0A 76FF0C76 FF0E76FF 1076FF1F 7F0E4639 C688077C FCFE831D F436891D ..6¶..±=|..69F....v..v..v..v..v. 0000E0
 7C8046FC 76C5FA5E C:1E7400 1DF63E80 90C85DE5 885E0CC4 83FD93E8 0E0676FF .v..Ò.».&.^.[]ù..>-..t..^*év=F.| 000100
 76FF0A76 FF0C76FF 0E76FF00 FE47C626 FC5EC4FA 5E8EFE5E 8CFC7689 F97500FF ..u*.v=.^±.^*ó^=&6G±..v..v..v..v 000120
 FF197545 0E7E8306 74650E7E 83EC8855 C850E588 5E0AC483 FEF6E80E 0676FF08 ..v..Ò-±.ó.^.[]ùW.&.-.et..-.Eu.. 000140
 76FF1875 660E7E83 9035E8F8 8FEB0E06 76FF0876 FF0A76FF 0C76FF10 76FF1276 v..v..v..v..v..v..Ò.«$5..-.fu..v 000160
 FF0C76FF 1076FF12 76FFC85D 0AC483FD 39E80E06 76FF0876 FF0A76FF 0C76FF10 ..v..v..v..v..Ò9».ó.]ù.v..v..v.. 000180
 76FF0876 FF297400 0A7E83EC 885590CB 500CC483 FEC0E80E 0676FF08 76FF0A76 v..v..v..Òà±.ó.]ù.U.&.-..t).v..v 0001A0
 C4314E9A 50520856 88064603 0A468806 76FF0876 FF504004 C4832A1F 2FEE9A06 ..Ý/.*.ó.ƏP.v..v..F..F..V.RP.N1ó 0001C0
 EB1E0A1F 7A06C708 74127703 F883D88E 1EEC8855 4590D88C C888C85D 0AC48324 $.ó.]ù.à.Á.EU.$..Á.«.w.t.ú.z...$ 0001E0

Dump of file SATURN:[PCCOMMON.DUMP.DLL]BRD.TMP;1 on 18-APR-1990 10:36:59.83
File ID (519,15,0)   End of file block 272 / Allocated 272

Virtual block number 239 (000000EF), 512 (0200) bytes

 F388C8F3 F60C831E 0A2D1F7A A1C84D5D 1FE58802 E083F81D FA16891D F80E8908 ...%...*.%.Ù..[.]MùÀz.-..*.-µù.µ 000000
 8EC18ED9 8CC08C1D FC8FF388 C31DFC8E D98EA5A5 FCD88EC1 8ED98CC0 8C1DFC8F €=..â.\.è.À=EE.\ƒ=.Û.µ€=..â.\.è. 000020
 0C88C033 FCFC7588 03E807FE 45C6FC7D 89FC7588 C31DFC8E D98EA5A5 A5A5FCD8 À=EEEE.\ƒ=.û.u=.}=6E±.$..u==3ó.. 000040
 02458908 D10901FA 01D801D9 01FAD108 01D9D1FA D1058925 747F80C2 F7025488 .T.%ò..t%..1*1\1À1*1\1À1*1\1À.E. 000060
 C48850EC 8855C306 45890445 89024589 0589C306 55893800 C2818FE6 80044D89 .M..]..ô.8.U.Û...E..E..E.ùW.&P.ó 000080
 006CE800 21E80000 FFFF9A1F 7C681E1F 7E681E23 A2A3E086 580000FF FF9A5016 .P.....X.ÀEÀ#.h-..h|......Ò1.Ò1. 0000A0
 8B1E1F84 16FF00FF 682B102C 869A2803 2C5C9A50 C850E588 00018828 6F34209A . 4o(¡...[]ùP.\,.+.Ñ,.+h.......€ 0000C0
 F3C888D1 8823888E 31740030 80264701 75003080 267FFF89 1F7E068E FF33000D ..3...-.¿..&.=.u.G&.=.t1/.#.1.ùµ 0000E0
 AC9204E0 C00E7241 2CAC23A9 8F1FF788 071E061C E8E774AE F2C03308 74CA88A6 Ì.òt.3à·ÛtÒ$.....%.€¨#¯,Ar.àÀ..¯ 000100
 9A521650 1653C488 508723A9 A780D488 52000288 00C31FED E8AAC20A 0572412C ,Ar..ó¨$Ú.ú.E..R.à.Ì¨#ñP.àS.P.R. 000120
 885AD479 4823A98F 08088106 75000230 07740001 30408112 7558C008 0000FFFF .....àXu.ÝƏ=..t.=..u.Ý...`#Kyàz. 000140
 FF00038B C28C280E 06C400CA E9037328 061EFFD8 33C28C28 0A06C41E E328080E ..(D.ó..(.ó3Ù...(s.Òò.ó..(.òÈ... 000160
 0E016A08 7428163D 28128800 73E82804 8F27FC8E 007CE828 128F2812 8E28061E ..(ƒ.(«.(Ò|.ƒ='«.(Òs.¡.(=.(t.j.. 000180
 28E49A00 6A006A03 6A0051E8 28168F28 128ED88E 0847B8C3 0000FFFF 9A28E968 hÒ+.....ù¡G..Àƒ.(«.(ÒQ.j:j.j..ô+ 0001A0
 8F28168E EC885503 E80031E8 28168F28 128E003A E828AA8F 28AA8EEC 88550000 ..U.&ƒ`+«`+Ò:.ƒ.(«.(Ò1.$.U.&ƒ.(« 0001C0
 07E32808 0E880000 FFFF9A50 06468A50 C033001A E828168F 28168E00 23E82816 .(Ò#.ƒ.(«.(Ò..3àP.F.P........(D. 0001E0

Dump of file SATURN:[PCCOMMON.DUMP.DLL]BRD.TMP;1 on 18-APR-1990 10:3?:59.83
File ID (519,15,0)   End of file block 272 / Allocated 272

Virtual block number 240 (000000F0), 512 (0200) bytes

 88EC8855 00C3EEE8 10FFF274 02450805 8804EF83 0E73F738 C328061E FF0002B8 £.....(û;%s..ÿ....E.t·..$Yû.U.&¡ 000000
 C850E588 2C662C86 9A5000FF 88258A1E FF047400 258C3E83 28152C86 9A5000FC =.P.Ñ,.+.>V%.t...¤%¡..P.Ñ,f,.[]ù 000020
 74964010 74C238AD 28648E06 5688C08E D88E28EA 885756EC 8855FE86 E9000288 ¡..Ò.±U.$VW¡ò+.À.â.V.ƒd(Ù;òt.Ə.t 000040
 2C869A06 76FF57EC 88550002 CA5DE588 5E5F96E8 E8F788AE F2FFFF89 C033970C ..3à¿..·Û.%$$._^.[]ò..U.&W.v..., 000060
 9A501651 521E5300 0288C488 50490 1F7 AEF2FFFF 89C033FA 88921F74 C0082C7A z,.àt...*3à¿..¯Ù%1IP.óE..S.RQ.P. 000080
 C388FA46 89E42A08 478A2608 5EC45657 000008C8 0002CA5D E5885F58 0000FFFF ....(_.[]ò..à...WVó^.&.G.*Ò.F*.û 0000A0
 F6260774 830A47F6 26F84689 174C05E0 D1C103E0 D1C888F9 F7000C89 99085820 -X..¿¯.%*.àIÁ.èIÁ.L..FW&-G..t.&- 0000C0
 80260E74 010A47F6 26085EC4 90012BE9 FFFF8820 0A4F8026 085EC40F 74400A47 G.Ət.ó^.&.O. ¡..Ò+..ó^.&-G..t.&. 0000E0
 7689F088 04478926 C028EF0A 67802602 0A4F8026 90E2EB00 000447C7 26200A4F O. &ùG...$ã.&.O..&.g.ÿ+à&.G..Þ.v 000100
 087E8137 7501174C 87F60608 68F9F700 0C89990B 5820C388 4C750C0A 47F626FC =&-G..uL.û-X..¿..%*kÁ.-.L..u7.-. 000120
 08312A9A FA76FF0F 752C8C0A 7E811675 0870087E 810E7420 950A7E81 07750864 d.u..-..·t..-.p.u..-..,u..v*.*1. 000140
 C3881575 080A47F6 26085EC4 04C48307 87E80876 FF0A76FF 0C75C008 02C4832E ..ó..àu..v..v.Òñ..ó.ó^,&-G..u..û 000160
 47882606 77282637 8826085E 88677401 174C87F6 060868F9 F7000C89 99085820 ·X..¿..%*kÁ.-.L..tg.^.&.7&+w.&.G 000180
 FF265256 167EF608 04478926 48024588 F87E8802 57892607 89264008 57882606 .&.W.Ə&..&.W..-%.E.H&.G..--.VR&. 0001A0
 006A026A 0F742023 A987F6FA 5E8819E8 FC468908 C4832E26 36309AFA 76FF0677 w..v*.06&..ó..F=$..^*-.`# t.j.j. 0001C0
 46805600 018E17E8 07882606 468A065F C426085E C408C483 2E4935F2 9A53006A j.S.·51..ó.ó^.&ó_..F.&..$.ƒ..V.F 0001E0
```

Dump of file SATURN:[PCCOMMON.DUMP.DLL]BRD.TMP;1 on 18-APR-1990 10:36:59.83
File ID (519,15,0)   End of file block 272 / Allocated 272

Virtual block number 241 (000000F1), 512 (0200) bytes

```
5F5EE42A 06468AFE CCE90374 FC7639FC 468908C4 832CC036 309AFA76 FF501606 ..P.v°.06â,.á..F=9v=t.Öëz.F.*ð^_ 000000
20C38B15 75080A47 F6265575 023C0324 0A478A26 065EC4F6 28560000 04C8C8C9 èùà...V+-á^.&.G.$.<.uU&-G..u..û¯ 000020
08FC4689 06472B26 07882606 5E883974 01174C87 F606D868 F9F7000C 89990858 X..¿..%*kÅ.-.L..t9.^.&..&+G..F=. 000040
0874FC46 3808C483 209F3630 9A50E42A 08478A26 0677FF26 0877FF26 50287EC0 à-(P&.w.&.w.&.G.*ðP.06.-.á.;F=t. 000060
47C72602 57892607 89260857 88260647 8826065E C4FFFF8E 200A4F80 26065EC4 á^.&.O. ƒ..á^.&.G.&.W.&..&.W.&ûG 000080
EC8855CB 50E58801 FE4F8026 0574C308 C08C065E C4EC8855 C8C95EC6 88000004 ....ó^èùU.$á^..á.ût.&.Oz..[]ùU.& 0000A0
750082E8 272AA312 740025E8 08750027 2A3E831E 73FFF13D 06468857 5602EC83 .&.VW.F.=þ.s..>*'.u.ÒX.t.Ê*'Ò..u 0000C0
3900F088 C85DE588 5E5F02C4 832EB637 D09A0676 FF087500 78E80574 0018E815 .Ò..t.Òx.u..v..Å7Ñ..á._^.[]üEÞ.9 0000E0
832F3139 D49A5002 80510E4F 8D50501E C033FE5E 89FEE383 43065E88 0776065E ^.v..^.C.Dz.^±3â.PP.O.Ō¯.P.â91/. 000100
C033D88E FE5E8800 08A30A8E 0574D208 272EA327 2C1687C2 883874FF FA8308C4 á..*.tß.ó..,'Ê.'.@t..ÖÊ...^z.Å3â 000120
1FD88C00 06A30000 05000AA3 01478000 02A30000 A3000A88 0C478948 480008A3 Ê..HH.G.|..Ê..Ê...G.Ê.....Ê...Å. 000140
1EDE88D7 88EC8855 C3098EC1 8CD20808 68E8272E 1E8ED833 064E88C0 8ED88CC3 û.Á.â.N.3Ü...'Òh..@.è.1ùU.&.@.8. 000160
F3E9D149 A4027401 A8C78806 7EC4D1F7 AEF2FFFF 89C033C0 8ED88CFE 880A76C5 év..z.Á.â3â¿...ÜX1á~..ú´.t.ÊI1Òµ 000180
49D1F7AE F2FFFFB9 C033067E C4D788EC 8855CB50 C28C1FFA 88F388A4 F3C913A5 É.èµÊ.µ.*..ô]ùU.&.@á~.3á¿...ÜXI1 0001A0
F2750825 C187F608 8898058A 26479002 E8067EC4 56570000 00C800C8 50FA8891 ..*]ù.à...WVá~.$..G&....Å~.èX.u· 0001C0
C4832F5D 386E9A57 0876FF50 04C48330 3C2FEE9A 5706006A 006A0846 8C067E89 .~..F.j.j..W.Ý/<0.á.P.v.W.n;]/.á 0001E0
```

Dump of file SATURN:[PCCOMMON.DUMP.DLL]BRD.TMP;1 on 18-APR-1990 10:36:59.83
File ID (519,15,0)   End of file block 272 / Allocated 272

Virtual block number 242 (000000F2), 512 (0200) bytes

```
00000AC8 C8C95F5E DA8C2BA2 881FA5A5 A5A5DA8E 1E071EF0 882BA2BF 0008050A ....«Å+.Þ....ÖEEEE.¡Å+.Ö^_èùà... 000000
C4FE5689 FC468908 57882606 4788260C 5EC4FA56 89F84689 08568806 46885657 WV.F..V..F%.V*á^.&.G.&.W.¯F=.V±á 000020
74003F80 26FC5EC4 F876C5F6 5E8C0A4E 882E7E00 0A7E8330 07C626F8 46FFF85E ^%.F%&ó.O.-..-..N..^-év%á^=&.7.t 000040
F85EC40A 4E89F65E 8EFA5E8C F87689E7 E2460488 30809003 E8078A26 FC46FF09 ..F=&..$..¯O..Fãó.v%.^*.^-.N.á^% 000060
3005C626 9006E8F8 7EF4F84E FF1F7C35 3F8026FC 5EC4287C 000A7E83 0007C626 &ó...-..|(á^=&.75|..N%á-%$..&6.0 000080
FF260C5E C4097531 3F802606 5EC407FE 26DF88FA 468CF87E 89F57439 30R0264F O&.=9t%.-%.F*.Ô&z.á^.&.71u.á^.&. 0000A0
000090C8 C95F5E08 C483302F 2F889A06 76FF5250 52400856 88064688 15E1 1247 G.$..F..V.@RPR.v..¡//0.á.^_èù... 0000C0
4023A987 F60C7C00 F883117D 23A71E38 065E88EC 8855098A E9008357 56ECL .55 U.$VW*.Ô¤.U.$.^.;.1#)..«.|¯-.¨#@ 0000E0
76C55657 1E0085E9 0375C908 0E4E88EC 885500C8 5DE588C0 3302E800 01880574 t.¡..$.36.[]ù.U.Å.N..èu.Òç..WVév 000100
0773F103 49507300 DA83C128 5778D208 0E4E8831 143AC69A 5706561E 067EC40A .á~..V.W.ó:.1.N..@xW+è.Ö.sPI.þs. 000120
C628C703 C323D818 C72848C1 8841C08E 318305C0 8C0773F9 03088EFF FF05D88C .Ä....Á.*s..á..1.âA.èH+ú.ÜWù.ú+ó 000140
FFFF83D8 8E318E2D D88C0775 FFFE835C E391FCA4 F3FDC128 9140C603 C323D818 .ÜWù.6@.+ê»µÊ=.D\.z.u..Ä-.1.Á... 000160
C22BD2F7 0688C203 C323D818 C22BD2F7 D78848C1 88C8E8C0 8E318920 C08CD175 uI.á-¿1.âŠâ.èH.@%@+õ.ÜWù.ô.@%@+ò 000180
D88E31C5 05D88C07 75F60818 E391A4F3 C913A5F3 E9D1C128 9140C203 C323D818 .ÜWù.ô@.+èiÖµÊ.èµÊ.D..-u..Á.é1.Å 0001A0
38E30C4E 88EC8855 C8500856 88064688 1F5F5E8E E8C08E31 FC05C08C C775FF08 ..uú.â.=1.â$/^ ..F..V.]ùU.&.N.D8 0001C0
13A8F3E9 D1E08A0A 46880128 D187D103 D323D818 D12BDC74 DAF7D788 067EC457 Wá-..@%Òt.+Ï.Ü#£.Ï.Ï+Ï.F..ÅIÒµ¨. 0001E0
```

Dump of file SATURN:[PCCOMMON.DUMP.DLL]BRD.TMP;1 on 18-APR-1990 10:36:59.83
File ID (519,15,0)   End of file block 272 / Allocated 272

Virtual block number 243 (000000F3), 512 (0200) bytes

```
C8500856 88064688 5FAAF3C9 13A8F3E9 D1C38E32 07C381C3 8C10E3D1 87AAF3C9 èµ´.1D..û.û.2.ûIÒµ¨.èµ´_.F..V.]ù 000000
FC5756EC 8855C858 00002CE0 9A531650 521E5100 02B9DC88 5301578D E42A078A ..*ð.W.S.É¿..Q.RP.S.Å,..¯[ùU.$VW= 000020
ACC88826 04BF5D09 BAE85526 CC8EA536 A536A536 A53626CC BF06768D C08ED88C .Á.â.v.«a&6E6E6E6E/ƒa&ÙÒ¤.]«â&.à¯ 000040
5FC788DA 8C08508C 26040645 C7044089 0255891D 89FF3226 C2BFAA91 A4F39198 ..µÊ.¯«ó&2....U..M.úE.â&.]..ð.ú_ 000060
3688E96A E9270ABF 1F7A3688 C80126F0 06C6CB5D E588C033 EC8855C8 50E5885E ^.[]ùU.$3à.[]ùó.Þ&.ù.6z.«.'ðjð.ð 000080
1F7A3E88 E8B6E927 0ABF1F7A 3688E85D E9270ABF 1F7A3688 E93DE927 0ABF1F7A z.«.'Ō=Ō.6z.«_'Ō]Š.6z.«.'ŌRŠ.>z. 0000A0
C3585FA8 ABABAB1F 7A3E88FC C0335750 E8A2E927 0A8E1F7A 3E88E91F E9270A8E ƒ.'Ō.Ō.>z.ƒ.'ŌÅŠPW3â=.>z.¨¨¨¨¨¨_Xù 0000C0
270ABF1F 7A3688C3 1F7A3688 A5A5A5A5 1F7A3E88 270A8EC3 0875F738 1F7A3E88 .>z.;Xu.úƒ.'.>z.EEEE.6z.û.6z.ē.' 0000E0
0674FF58 1F7A3688 04E8270A 8EC308EE 83A5A5A5 A52712BF C308EE83 A5A5A5A5 EEEE.Ý.ü«.'EEEE.Ý.úƒ.'Š..6z.X.t. 000100
FF06448F 04448F02 448F048F 581F7A36 8804E827 0A8EE0FF 34FF0274 FF0474FF .t..t..4.Áƒ.'Š..6z.X...D..D..D.. 000120
A5A5A51F 7A3E8817 E851E032 0579C908 91ADF388 A5A5A5A5 270A8F1F 7A3688E0 Å.6z.«.'EEEE.µÙ..èy.2ÜØŠ..>z.EEE 000140
88E4E208 C683595E E890E81F 7A3E8856 5EEAA0E8 270A8F1F 7A368856 511CE3A5 ED.QV.6z.«.'Ò.ð^V.>z.Ò.Ò^Ý.ó.ãð. 000160
E180C88A E8D304B1 23770370 3D3FC02D 28747FF0 25E88A06 4488C3F7 881F7A3E >z..Xú.D..ÒXÞ.t+-ä7=p.w#Ý.ÆÒ.à.Å 000180
DC885A59 C3066C88 E0020640 8A066C86 10C8008 F7D88898 E8D0E8D0 E8D04107 .AÅÒÅÒÅÒ..ÅXÜ.ë..l..ə.@Å.l.úYZ.É 0001A0
271A2EFF 5152F6F2 E9C03305 7540271A A1C85152 E3880572 271E1E38 08720828 +Ár.;..'r..DRQùÀ.'əu.3ãÒ·-RQ...' 0001C0
89F25689 F04689C0 281F7E16 8800F0E9 03751F7E 3639FF28 F6285657 000014C8 à...WV+-+.96~.u.ÒÞ...-.+á.FÞ.V·. 0001E0
```

```
Dump of file SATURN:[PCCOMMON.DUMP.DLL]BRD.TMP;1 on 18-APR-1990 10:36:59.83
File ID (519,15,0)   End of file block 272 / Allocated 272

Virtual block number 244 (000000F4), 512 (0200) bytes

 FE814619 74C0080A C4833494 3A8A9A23 88681EF6 76FFF876 FF0C6AF8 5689F646 F-.V%j..v%.v-.h.#..:.4.6..6t.F.± 000000
 003F8026 F646FFF6 5EC40CEB 47EA7500 3F8026F6 46FFF65E C4008CE9 03767FFF ..v.ÔV.6^-.F-&.?.uôG$.6^-.F-&.?. 000020
 56EE5689 EC468904 C48334A3 397C9A04 6A500145 808A7500 3F8026F6 5E88F475 u¶.^-&.?.u□.E.Pj..|9E4.6..F&.VŸV 000040
 EC468866 74C208FC 46886D74 EE4608EC 4688FE56 89FC4689 02C48334 D92EFD9A .».14.6..F•.V±.F&.FŸtm.F•.6tf.F& 000060
 C0080AC4 8331683A 8A9A2388 681EF076 FFF276FF 0C6A2581 168925AF A3EE5688 .VŸ€€X..ŸXj..v·.vÞ.h.#..:k1.6..6 000080
 C4078A26 F046FFF0 5EC404EC 46830257 89260789 26FE5688 FC4688EC 5EC42C74 t,6^&.F•.V±&..&.W..F&.6^Þ.FÞ&..6 0000A0
 3F8026F0 5EC4F475 003F8026 F046FFF0 5EC4E8EB 0E74C00A 078826FC 46FFFC5E ^•.F•&...ât.$ô6^Þ.FÞ&.?.u¶6^Þ&.? 0000C0
 47F626FA 5EC41CEB F628FC5E 8CFA4689 08588856 000006C8 90C8C95F 5EA77500 .uÎ^_èù.à...V|X..F*.^•+-Š.6^*&-G 0000E0
 FA46391D 4816881D 46A10CFA 46834601 744004C4 8334542E 629A5306 0E74830A ..t..S.b.T4.6.ât.F.F*.ÀF...N.9F* 000100
 E0D1C888 F9F7000C 89990858 20044688 258E06FF 000004C8 90C8C95E C6880876 vÁ.6^èù.à...../X.F.-X..¿..%*.àIÁ 000120
 26064789 26045EC4 02C48335 492EFD9A 020068FE 5E8CFC46 89174C05 E0D1C103 .éIÁ.L..F•.^±h...».15.6.6^.&.G.& 000140
 040A4F80 26045EC4 9021E802 000247C7 26FC5EC4 080A4F80 261174D0 08085789 .W..Ât.&.O..6^•&ûG...$I.6^.&.O.. 000160
 26064788 26045EC4 00010247 C726FC5E C4085789 26064789 2640FE56 88FC4688 .F•.V±â&.G.&.W.6^•&ûG...6^.&.G.& 000180
 098A0872 23A71E38 065E88EC 8855C3C9 00000447 C7260257 89260789 26085788 .W.&..&.W.&ûG...èûU.&.^.;.I#r.□. 0001A0
 590000FF FF9A5116 0C76FF08 76FF0A76 FF53CC88 04EC8307 A6E9079A E9C03300 .3àÕ..ÕI..&..äS.v..v..v..Q.....Y 0001C0
 8A087223 A71E3806 5E880CEC 83EC8855 00C850E5 88FD23A9 A78091E1 75C0855A Z.àuÀ..I`#».I]ù.U.&.&..^.;.I#r.□ 0001E0

Dump of file SATURN:[PCCOMMON.DUMP.DLL]BRD.TMP;1 on 18-APR-1990 10:36:59.83
File ID (519,15,0)   End of file block 272 / Allocated 272

Virtual block number 245 (000000F5), 512 (0200) bytes

 0000361B 9A5016F4 46805141 415151C9 33531274 2023A987 F60759E9 C0330009 ..3àÕY.-.`# t.S3èQQAAQ.F¶.P..6.. 000000
 89F288FA 885657FC FC4689FE 4689C033 0856C50A 468EFA5E 8C667480 23A987F6 -.`#.tf.^*.F.éV.3à.F±.F••WV.*.·. 000020
 0C4E8807 16FA8804 88E22800 808ADC88 02EC833B 75AEF20A 8049E30C 4E88F866 f%.N.DI¯.·Ùu;.&..É□..+ã.Â.*...N. 000040
 46FF0A80 AA001FE8 0375F838 0D80009A E9002BE8 F4E2AA1A 74F83800 740A3CAC ¯<.t.;«t.`ã¶Õ+.Õ..¯.;«u.Õ..¯..F 000060
 1F061E51 53503593 33FC9AFF FC887AE8 0093E9FA 5E8E5F5E E1E80014 E8E2E8FC •Šãò..ŠÀ^_.^*Õ..Šz|•..•3.5PSQ... 000080
 5E01F45E 881175C0 08000032 749A5016 F4468051 521E5306 5E881FE3 CA28CF88 .ù+ôD..^.Š.RQ.F¶.P.t2...àu..^¶.^ 0000A0
 7500098A 00013000 74006030 1874C008 08C4831F C3FA8858 58591F07 740808FE ±.Ût..Y[X.*û..6..ât.=m.t.=..□..u 0000C0
 751A3F80 085E880A 5E8E0E74 4023A987 F6FE5E8E 26E8F900 208A03E8 001C8A08 .□..$.□ .*$&.^±-.`#ât..^..^..?.u 0000E0
 C85DE588 0472FA5E 8E5F5EF8 6688FC46 28FE4688 06E8F9C0 33001C8A 0EE8F803 .%$.□..3à*$..F±+F•.f%^_.^*r..I]ù 000100
 000036F3 9A5016F4 46805152 1E530856 C51EEEE8 C1880475 C9080C4E 880630E9 Õ=..N..èu..è$Ÿ.éV.S.RQ.F¶.P.µ6.. 000120
 4688C2E8 00208AC7 E8001C8A CC750009 8A000130 00740060 301774C0 081F071E ....ât.=m.t.=..□..uào..Šúo .$ô.F 000140
 885500A3 E8C03300 1C8AA6E8 02751A3F 80260A88 0A744023 A987F687 75C008F4 ¶.àuñ-.`#ât..Õ&.?.u.ŠIo..3àŠÈ.U. 000160
 88071E29 75003F83 27208857 56EC8855 C85DE588 01FE4F80 04740808 065E88EC &.^..Ût..O±..I]ùU.$VWE '.?.u)..¡ 000180
 FE44C704 C6830001 04C79627 22A32720 A3FE2440 24E899C0 33057501 76E80005 ..Õv.u.3à.$$ã$±È 'È"'.ú....6.úD± 0001A0
 83FEE180 FA744100 D0E9C850 E5885E5F 0009E8C0 8ED88C06 4E882726 3689FFFE ±..6&'.N..Ä.àÕ.._^.I]ùÕÂ.At*.Ä±. 0001C0
 05C20335 7401A8AD F0030088 1573C138 48437401 A8FE88AD FC027788 F273EEF9 *Ÿs·.w.•Ù.±`.tCH;ès..Â.ÞÙ'.t5.ô. 0001E0

Dump of file SATURN:[PCCOMMON.DUMP.DLL]BRD.TMP;1 on 18-APR-1990 10:36:59.83
File ID (519,15,0)   End of file block 272 / Allocated 272

Virtual block number 246 (000000F6), 512 (0200) bytes

 C688FE4C FEF90305 E8058948 C128FE4C 89F9030C 74FE88E6 E8FE4489 F7880002 ...%.D±ŠI.±t..*.L±+éH..Š..*±L±.6 000000
 03FE8825 74FFFE3D 02273206 C626C302 7F89272E 1E8C2605 74013820 87890A8C .Õ¿.-;It.&...'...ú&6.2'.=±.t%.±. 000020
 FE4489F7 88000205 C203E274 01A8ADF0 0300888C 73C13848 FE88F274 01A8ADF0 ÞÙ'.t·.±H;ès¥.Â.ÞÙ'.tã.ô....%.D± 000040
 1E8E2605 74C73838 638F088C 12742732 0EFE2615 E8088E04 74C00808 4788E6E8 $I.G..ât..ÄŠ.&±.2't..Ä¢c8;út.&.. 000060
 E8FE4DFE 0074005F E8984040 01240074 C6380068 E8C03306 778808EB 3788272A *'.7$E.w.3àÕk.;ót.$.@@.Õ_.t.±M±Õ 000080
 51C399C0 33024789 0788272E A3260474 C1383887 89D88C98 E84E4E96 0574001D ..t..NNŠ..Ä¿ñ8;èt.&È.'...G.3à.ûQ 0000A0
 1572C603 C188F575 EAD10476 27301638 267FFF8A 414149C8 28037401 A8FE4588 .E±`.t.+àIAA□..&;.O'v.Iòu%.é.ór. 0000C0
 1874001D E85152C3 59C033E5 75EAD1D2 F7087500 0CE8C628 C22302F7 0072C203 .ór.%@Wõ+6Õ..u.%@IõuI3àYÚRQÕ..t. 0000E0
 1E023350 53C35A55 58FE5589 4AD72806 88067789 FFFEFE44 C7F203F0 88FE8857 W.±.Þ.·ÚD±±..W..#+•J.U±XYZúSP3@. 000100
 00000AC8 C30208D2 74585A1F FFFA8308 C4833608 39D49A1F 06500001 88505252 RRP¡..P...à9À6.6..*..Z[t..@ùà... 000120
 E899C028 0674FFFF C2F7FA56 89F84689 39A900FC 9A0676FF 006A0876 FF006A56 Vj..v.j..v..•.`9.F%.V*%ô..t.+à.$ 000140
 9A50FE76 FF006A56 12740008 FE5689FC 468902C4 8339C22E FD9A56F8 7688902F /..v%V.».ô9.6..F•.V±.Ât.Vj..v±P. 000160
 3875000A 7E830657 56EC8855 90C8C95E FE5688FC 46889007 E808C483 396C3218 .2I9.6.Š...F•.V±^èù.U.&VW..-..u8 000180
 44880074 F7381174 48238636 884CE827 720057E8 07754806 46880856 881F868F ¢...V..F.Hu.ÕW.r'ŠL.6.#Ht.;%t..D 0001A0
 885021E8 99FFFF88 0675D208 04732386 FE8104C6 8334735E 003EE856 0E468902 ..F.VÕ>.^s4.6..±.#s..@u.¡...ŠIP. 0001C0
 07C03303 88238636 89025C89 1489E675 C085F958 0000FFFF 9A50C033 501652C4 áR.P3àP.....[*.àuI...\..6.#.Æ3à. 0001E0
```

```
Dump of file SATURN:[PCCOMMON.DUMP.DLL]BRD.TMP;1 on 18-APR-1990 10:36:59.83
File ID (519,15,0)   End of file block 272 / Allocated 272

Virtual block number 247 (000000F7), 512 (0200) bytes

 1C030A88 2CE8F9F2 752386FE 8104C683 0C74024C 39F7880E 4E88C850 E5885E5F _^.[]ù.N..X9L.t..ó..±.#u·*$,.Ö.. 000000
 890475F7 38DE75C0 850000FF FF9A5153 13731F80 1E390675 F738C18E 03882672 r&.Æ.è;%u.9...s.SQ......âu8;%u.. 000020
 AEF2C033 F788047E C4098827 E30E4E88 1E5657EC 885500C3 D1880487 921F8016 .......[ù.U.ŠWV..N.D'.]ó~..X3á·Û 000040
 5E1FC188 D1F74949 04740477 FF453A26 C933FF44 8AA6F30A 76C5FE88 CB0309F7 %].ù.±év.µI.D.3è&:E.w.t.[IX].è.^ 000060
 E5880318 0A4628E8 D3EAD3FF FFB90C5E 88085688 064688EC 885500C8 50E5885F _.[]ù.U.ê.F..V..^.¿..ÆõÆŠ+F..Æ.[ 000080
 080E750A F9831374 C00A93FC 071E570A 7EC51E08 56880646 880E4E88 0008CA50 ]ò...N..F..V..é~.W..•..ât..*.u.. 0000A0
 30040387 92F1F793 F1F70274 C0080233 92F7880A F700D283 D8F7AA2D 800A7902 øy.¯-¯%Û.ø.%Ò.%.3ø.ât.%þ.%þ..Æ.0 0000C0
 580A8CF2 72C73801 4480FF44 880586AC 4F0588E2 75C308C2 88AA2704 0276393C <9v..'¯.ó.ùuã..O¯...D..D.;ùr·.ÕX 0000E0
 76380027 C906C600 28E80127 C906C60E 56880833 5756EC88 55C850E5 885E5F1F ._^.[]ùU.âVW3Û.V.ó.è'.Ò(.ó.è'.;v 000100
 50E5885E 5F0006E8 0E5E8802 335756EC 8855C850 E5885E5F 008940C9 8005730A .ã..èa.._^.[]ùU.âVW3ø.^.Ò.._^.[] 000120
 4E88088E A4F32746 BF0676C5 27E8F633 40810676 64F9830A 4E88C08E 088CFCC8 ù•.Å.â.N¯.*dv.Ÿa3-Š'év.¢F'µE.Å.N 000140
 00892734 BF0A7603 06762850 0283E855 273C8F06 4E010C46 88067689 27468E0A ./F'.v..F..N.¢<'UÒ..]+v..v.¢4'.. 000160
 C6831675 C43A8080 2509478A 2E09648A 5653C30A 8CC78806 50890445 89027589 .u..E..]..ú.ÒûSV.d...G.X..:éu..ó 000180
 33AD93AD 92AD95AD 56C35B5E F3E10738 2E048802 E88302EE 830005B9 0AC3830A ..ū.¿...Ÿ..$....;.Åµ^[ûVÛ.Û.Û.Û3 0001A0
 3C895E03 FE2D08D1 F5000130 D001E3D1 F4E2DFD1 D001DAD1 D8D1E8D1 000589FF .¿..[Ò[Û[Ò[|[ÒâŸ[D[Å=..%[Û-±.^.< 0001C0
 FDCCCCCC CCCCCCCC CD0000FF FFFFFFFF FFFC66C3 08448906 5C890454 89026C89 .[..T..\..D.ûf•........ëããããããã» 0001E0

Dump of file SATURN:[PCCOMMON.DUMP.DLL]BRD.TMP;1 on 18-APR-1990 10:36:59.83
File ID (519,15,0)   End of file block 272 / Allocated 272

Virtual block number 248 (000000F8), 512 (0200) bytes

 00048957 27AAB FFC C08ED88C 06C30758 40D088C0 33300144 C60104C6 27868EFF ./Ñ'ó..óD.03à.Àa[.û..Å.â•¢¯'W¿.. 000000
 818EFF33 FF78E853 2D830279 C9080674 7FF0C1F7 20837F07 6480064C 885EA5F3 µÉ^.L..d..* %èp.t..èy.*-SÒ(.3./Ÿ 000020
 E7F69A80 D713C803 E4F64D80 91E2F74D 108AC888 3FFE05AD F88A8874 80A8AC27 '¯'.tE.%Û.±?.âa.M%ã.¯M-ô.à.ø¯.-Ô 000040
 57470972 5FFF13E8 3C2D8805 89E827AA 8EDFF757 13430F81 12F4E981 FA13C803 .à.*.Ò¶..ÒC.WÅÒ/¯'Ò¿.E-<Ò.. r.GW 000060
 D0010AD1 E8D10CE3 C033F788 D9F791AD 93AD92AD 95AD97AD 575F0442 E83C3788 E7<ÒB._WÛ.Û.Û.Û.Û.%].X3âD.[Š[Ò[[ 000080
 56555253 51C03200 10892787 8FD91301 13E91303 9AD68156 C480F4E2 DCD0OED1 [ÀÂÉã¶¯ÁV.ø...Ò.].]eñ'¿..2àQSRUV 0000A0
 59F11359 E50259D0 D0030102 D1D50106 D1E40000 D0030102 D1050106 D1E40050 PÅÒ[ø[[[ø[ÆÅÅÅÒ[ø[[[ø[ÆÅÅY.[Y.þY 0000C0
 3080494F 80E259AA 30040000 D3010201 D5010601 E4000014 091359D1 1359E913 .ÒY.]Y.]..ÅÒ[ø[[[ø[ÆÅÅ.O¯YâŠO[¯O 0000E0
 09060005 18040203 02021601 00C30758 5A0001B8 0C8827B6 8E12C183 FCAEF3FD »µÛ•.é./Ñ'..¡..Z(.û............ 000100
 00530052 02430041 02350212 12110010 120F1600 160C0808 070A0C09 0C080C07 ......................S.A.C.R.S. 000120
 16080000 08D702CE 08A40084 09820A81 0A801606 09721C70 2060006C 08590057 W.Y.l.m p.r...........É.ö.■..... 000140
 30548823 A5A3C850 E58899FF FFB80008 E8C850E5 8899FFFF 88239E16 8923A5A3 ÈÉ#...#¡....[]ûÒ..¡....[]ûÈÉ#ÉT= 000160
 76CA3C04 728C3C43 0A76243C 0472133C F7E24343 1674073A 2E1875E4 0A002489 ¿$..Òu..:.t.CCã%<.r.<$v.C<Ÿr.<òv 000180
 00ACE90B 330185E8 EF88FF33 D78840C9 8030C980 58C3239E A3980147 8A2E4301 .C..G..È.#ûX.è0.èa.ø3..ŸÒ..3ûÒ¯. 0001A0
 F7C388EA 88F88827 0626F7C7 8850E072 0205E8F8 88E17202 0CE80833 27D61E89 ..ø'3ûÒ..rÅ.%Ò..rÁP.û%&ø'.%.õ.û% 0001C0
 0E89CE03 27CC3E89 FC85E808 73000383 F80358BE 72D888C5 03C47502 0827062E .ø'.Øuâ.é.Âr/X.%.Æ.sÅŠç•.>â'.ö.. 0001E0

Dump of file SAT!'?N:[PCCOMMON.DUMP.DLL]BRD.TMP;1 on 18-APR-1990 10:36:59.83
File ID (519,15,'.   End of file block 272 / Allocated 272

Virtual block number 249 (000000F9), 512 (0200) bytes

 750B0880 CD800375 01ADE891 27D4A327 D0A327D2 A3C03327 DA168927 D8A327CE ö'ÈÁ'..Ö'3âÉø'ÈÁ'Èâ'.ÒÛ.u..ë..Ûu 000000
 3C067428 3C317400 27C93E80 1274453C 1C74443C 4E417401 FDE80833 00E7E89F .ÒÒ.3ÛÒ».tAN<Dt.<Et..>è'.t1<+t.< 000020
 C5F60088 E8509F01 6CE84600 0027D806 C70EC980 03E80402 C9814E27 7502742D -t.u'N.è..Š..è.ú.Ä'..FÒl..PÒ..-é 000040
 03F80330 C9800374 1872C1F7 0675FF08 27D83E88 D8F70275 9E5840C9 80037502 .u..èaX.u.%Û.>Á'..u.%ër.t..è0.«. 000060
 06C627CC 3E880394 E827E08E 5156507F 0190FF81 27DA3E28 047510C5 F627D43E >å'-é.u.+>Ö'.....PVQ/Á'Ò...>ä'ó. 000080
 45F70003 83F5D8F7 D3F71374 80C5F627 DE1E8827 DCA13875 5E5901AC E80027EA ô'.Ò¯.Y^uBÅÉ'..B'-é.t.%Æ%Å%.Æ.%E 0000A0
 CD800375 0027D23E 8327EA2E 8A08C980 03760727 D23E8380 07408004 747FF006 .þ.t..N...>ø'.v..è...ô'.>ø'.u..ë 0000C0
 C303E301 02CD80ED 770CCCF8 81177200 E4E80A27 D606C63F FF88C301 C980C302 .ù.è.ùE.?ó.ø'.ÒÒ.r..«ä.wÛ.ë.[D.ü 0000E0
 83000358 008AE850 28720006 E8D788DF 88EF88FF 33C30FE8 DE780803 E301E301 [D[D.ÅxBŠÒû3..ÿ.Ò.øÒø.r(PÒ..X.Å. 000100
 EEE827D4 06FF01CA 800374C0 0A007200 88E8E572 1999FF81 00D78300 D58300D3 Æ..[..ø.....r[ÒE.r..ât..ò...â'ŠŸ 000120
 06E80575 D2080975 8000F881 0F7480C5 F6177480 C7F61675 27D40608 C508C788 .ú.é..å'u.-ú.t.-é.t..«..u..øu.Š. 000140
 25E80973 1999FF81 1C74C208 C308C508 C78827DE 1E8927DC 168920C9 8010C980 .è..è ..É'..B'.ú.é.ú.ôt.....s.ÒX 000160
 A895A893 A89227E0 8FF78856 F6E8002A E8480678 FF080040 88F1E827 D40EFF00 ...å'Šþ¡ä...x.HÒ*.Š-V.%¢Å'.¨.¨.¨ 000180
 03D1E2D1 F81358E8 13580813 58D00300 08E8000E E8C28853 5557C35E A892A896 .¨.¨^úMUS.òÒ..Ò...ÅX.ÅX.ÒX.%iàiÆ 0001A0
 093C4572 302C4A74 004EE8C3 4E460175 283C0674 203C0874 005EE8C3 D7D1D5D1 [[[øûÒ^.t.<-t.<+u.FNûÒN.tJ,0rE<. 0001C0
 10C5F626 77093C2A 72302C20 742E3C33 740037E8 1DE8397D 27D6063A 072C027E -.,.:.ø')9Š.Ò7.t3<.t ,0r*<.wß-é. 0001E0
```

```
Dump of file SATURN:[PCCOMMON.DUMP.DLL]BRD.TMP;1 on 18-APR-1990 10:36:59.83
File ID (519,15,0)   End of file block 272 / Allocated 272

Virtual block number 250 (000000FA), 512 (0200) bytes

 CD8027D0 06FF0975 10C5F6F4 EB20CD80 C3E43227 D206FF08 CD8027D4 0EFF0E74 t...å'.ë...ø'2öû.ë §¶-é.u...Å'.ë 000000
 E6740A3C EA74093C EE74203C 10740027 C83E80AC 237327CE 3638C3F9 4EC9EB10 .ŠèN•û;6ö's#¯.>à'.t.< tŸ<.tõ<.tl 000020
 C108C508 F888AD95 AD91AD92 AD57C3C0 32C35F24 02777A3C 0672613C E274003C <.tã<ar.<zw.$_û2éûMÛ.Û.Û.Û.%.é.ê 000040
 FED7D000 D107D105 D101D1E2 01000588 0FD1E8D1 E7013E78 03FE05AD 4974C208 .ôtlÛ.±.x>1ölÕ10£..1ã11111ø1ÅÅø± 000060
 300E74FF F0A90007 80C613FE 13EE13CE 13F58001 FA81F633 D30AD922 43F075C8 ùuÞC"1.Æ3-.•..%.ö.Ÿ.±.6.ø.`Þ.t.= 000080
 89026089 00895FF7 88F888E8 88C88808 88C03301 27EA0E80 0FE80007 80F57FF0 Þ.%.ø.Š...ð'.3é.Ä.à.Ò.%.%...ø.. 0000A0
 04B80007 BF084401 0847882E ABF3C033 FD880008 8927ECB0 C3FF0A06 45890475 u..E...ü§§'¿...»3ãµ¨..G..Ð.¢..|. 0000C0
 06C683F7 28F10308 C383DF28 D9285653 C8889804 040BF6C4 2AC42AE0 22C72800 .+ú"Å"é"é-Ä....àSV+1+Ô.û..þ+%.ö. 0000E0
 4F02C583 585EE6E2 02C38302 EE830004 56833E02 56113E00 46013E27 F72E0488 ...%'>.F.>.V.>.V...Ÿ..û.ãl^[.é.O 000100
 C008F588 AD93AD91 AD97ADD1 0A92ADCD 0AC808AD C808AD91 ADF5870E ED838C75 u¥.Û..%Û.Û.àÛ.à.éÛ..1Û.Û.Û.Û.%.â 000120
 13FD13F5 8001FA81 :D330508 EF230001 80000103 D1D1D107 D1E20108 4CFF0078 x..L.1ã1ø111£1Å§..#y.í3Û.•..%.». 000140
 00000000 0000C306 4489045C 89024C89 3C89C508 CDD1086C 01D5D1C5 130D13CD ë.ï.é11.l.ïe.é.<.L..\..D.û...... 000160
 BEBC2000 00000000 000E9C40 00000000 00000007 C8000000 00000000 0004A000 ...........à........ə........ ¥ƒ 000180
 0005C278 1F49FFCF A6D50068 90C5ADA8 2870859E 00368E18 C98F0400 0000001B ......¢è..6..çp÷¨Ué.k.ílü.l.xöl. 0001A0
 D70AFFFD CCCCCCCC CCCCCCCD 0353AA7E E8F890F9 DE8E01AA 938A47C9 80E98CE0 Å.Ô.èGɑ.¨..8'.«Š~¨S.eããããããã»..ø 0001C0
 C44DE158 FFE6ABCC 77118461 CEFDFFF3 D1871758 E219652C FFFAA307 0A3070A3 Ëp=.øÉ'.,e.ãX.ñiµ.»öa..wã¨l.(ÅMé 0001E0
```

```
Dump of file SATURN:[PCCOMMON.DUMP.DLL]BRD.TMP;1 on 18-APR-1990 10:36:59.83
File ID (519,15,0)   End of file block 272 / Allocated 272

Virtual block number 251 (000000FB), 512 (0200) bytes

 467C64BC E4A1FF2C AB7FEA27 A539E9A5 FF96CFB1 1EAD4539 94BAFFCB E69594BE ƒ..lù.¤.9ÉÜ.Ÿü..ÉÖ9É'õ.´,.Åõ¥d|F 000000
 0AC3830A EB83DFF7 42148805 79FF0841 8AB8FCAE C0314325 637A193A FE57DD00 ÅlW±:.zc%C1àÜ=£¤A..y.£.ß¥Ö.Š..ù. 000020
 2C360103 02CB0007 377C0203 000DC3EC EB5B5FFE 7BE85753 F573EFD1 0D74FF08 ..t.lys%SWÒ(±_[Š§ù....|7..ù...6, 000040
 3AD30105 00260002 *A730103 00220002 3A280103 00070002 28FE0103 00050002 ......±+......(:..".._s:..&...Æ: 000060
 28800103 00000017 398E0002 003A0002 365C0103 00880002 32480105 00870002 ......K2......\6..:....9.......+ 000080
 00000000 005C0002 2AE30103 005B0002 2AF60103 00000019 38EC0002 004D0002 ..M...£8......-*..[...D*..\..... 0000A0
 6F43202D 20797261 7262694C 20656069 54206E75 52205340 00000000 00000000 ........MS Run-Time Library - Co 0000C0
 70726F43 2074666F 736F7263 6940202C 38383931 20296328 20746867 69727970 pyright (c) 1988, Microsoft Corp 0000E0
 00000000 00000000 00000000 00000000 00000000 00000000 00000000 00010011 ................................ 000100
 00000000 00000000 00000000 00000000 00000000 00000000 00000000 00000000 ................................ 000120
 00000014 00000014 00000001 00000000 00000000 00000000 00000000 00000000 ................................ 000140
 00030002 00060001 00000014 00000014 0000000F 0000000F 00000005 00000005 ................................ 000160
 00000000 00000000 00000000 00000001 00000000 00000000 00000001 00050004 ................................ 000180
 00000000 00000000 00000000 00000000 00000000 00000000 00000000 00000000 ................................ 0001A0
 FFFFFFFF FFFFFFFF FFFF0000 00000000 00000000 00000000 00000000 00000000 ................................ 0001C0
 00000000 00000000 00000000 00000000 00000000 00000000 0000FFFF FFFFFFFF ................................ 0001E0
```

```
Dump of file SATURN:[PCCOMMON.DUMP.DLL]BRD.TMP;1 on 18-APR-1990 10:36:59.83
File ID (519,15,0)   End of file block 272 / Allocated 272

Virtual block number 252 (000000FC), 512 (0200) bytes

 00000000 00010000 00000000 00000000 00000000 00000000 00000000 00000000 ................................ 000000
 FFFFFFFF 0003FFFF FFFFFFFF 0002FFFF 00010000 FFFF0000 00000001 00000000 ................................ 000020
 00000000 00000000 00000000 00000000 00000000 00020008 00040002 0001FFFF ................................ 000040
 00000000 00000000 00000000 00000000 00000000 00000000 00000000 00000000 ................................ 000060
 00000000 00000000 00000000 00000008 00000000 00000000 00000000 00000000 ................................ 000080
 00080002 0001000B 00000000 00000001 00000001 00000000 00000000 00040000 ................................ 0000A0
 00000000 00000002 00000001 00000000 00080008 00080008 00080004 00040004 ................................ 0000C0
 00840000 FFA6005A FFA6005A 00000084 005AFFA6 00840000 00000000 00000003 ..........Ç.Ì.Z.Ç...Z.Ì.Z.Ì...Ç. 0000E0
 00000000 00000001 00010000 00000000 00000001 00000000 00000084 005AFFA6 Ì.Z.Ç........................... 000100
 0000FFFF FFFF0000 00000000 00000000 00000000 00000003 00000000 00010000 ................................ 000120
 00000000 00010000 00000000 00000000 00000000 00000000 00000000 00000000 ................................ 000140
 00000000 00000000 000JFFFF 00000000 00000000 00000000 00050000 00000001 ................................ 000160
 00000006 00000000 00010000 00010000 00000000 00000000 00000000 [illegible] ................................ 000180
 00000000 00000000 00000000 00000000 00000000 00000000 00000000 [illegible] ................................ 0001A0
 00020001 00080004 00000000 00000000 00000001 00000000 00000000 [illegible] ................................ 0001C0
 00020004 0005FFFF 00000000 00000001 00000000 00000000 00000003 00020000 ................................ 0001E0
```

```
Dump of file SATURN:[PCCOMMON.DUMP.DLL]BRD.TMP;1 on 18-APR-1990 10:36:59.83
File ID (519,15,0)   End of file block 272 / Allocated 272

Virtual block number 253 (000000FD), 512 (0200) bytes

FFFF0000 0000FFFF FFFF0000 00000000 00000000 00000000 FFFF0000 00010003 ................................ 000000
00000020 00000010 00000008 00000004 00000002 00000001 00000000 0008FFFF ................................ 000020
00000000 00000001 00080002 00040009 000A0006 00050005 00040003 FFFFFFFF ................................ 000040
6F72705C 3A710001 00010000 00000002 00080001 00040000 00000000 00000000 ..........................q:\pro 000060
65636E65 665C6C70 6F6E6472 625C6D73 775C6372 735C3133 30306A6F 72705C6A j\proj\proj0031\src\wsm\brdnopl\fence 000080
73775C63 72735C31 3330306A 6F72705C 6A6F7270 5C3A7100 45534C41 4600632E .c.FALSE.q:\proj\proj0031\src\ws 0000A0
5C6A6F72 705C3A71 0045534C 41460063 2E65636E 65665C6C 706F6E64 72625C6D m\brdnopl\fence.c.FALSE.q:\proj\ 0000C0
632E6563 6E65665C 6C706F6E 6472625C 6D73775C 6372735C 31333030 6A6F7270 proj0031\src\wsm\brdnopl\fence.c 0000E0
5C6D7377 5C637273 5C313330 306A6F72 705C6A6F 72705C3A 71004553 4C414600 .FALSE.q:\proj\proj0031\src\wsm\ 000100
72705C6A 6F72705C 3A710045 534C4146 00632E65 636E6566 5C6C706F 6E647262 brdnopl\fence.c.FALSE.q:\proj\pr 000120
4600632E 65636E65 665C6C70 6F6E6472 625C6D73 775C6372 735C3133 30306A6F oj0031\src\wsm\brdnopl\fence.c.F 000140
72625C6D 73775C63 72735C31 3330306A 6F72705C 6A6F7270 5C3A7100 45534C41 ALSE.q:\proj\proj0031\src\wsm\br 000160
6A6F7270 5C6A6F72 705C3A71 0045534C 41460063 2E65636E 65665C6C 706F6E64 dnopl\fence.c.FALSE.q:\proj\proj 000180
4C414600 632E6563 6E65665C 6C706F6E 6472625C 6D73775C 6372735C 31333030 0031\src\wsm\brdnopl\fence.c.FAL 0001A0
6E647262 5C6D7377 5C637273 5C313330 306A6F72 705C6A6F 72705C3A 71004553 SE.q:\proj\proj0031\src\wsm\brdn 0001C0
30306A6F 72705C6A 6F72705C 3A710045 534C4146 00632E65 636E6566 5C6C706F opl\fence.c.FALSE.q:\proj\proj00 0001E0

Dump of file SATURN:[PCCOMMON.DUMP.DLL]BRD.TMP;1 on 18-APR-1990 10:36:59.83
File ID (519,15,0)   End of file block 272 / Allocated 272

Virtual block number 254 (000000FE), 512 (0200) bytes

45534C41 4600632E 65636E65 665C6C70 6F6E6472 625C6D73 775C6372 735C3133 31\src\wsm\brdnopl\fence.c.FALSE 000000
6E696665 646E5520 73692074 6E657478 45202020 00786C25 2065636E 65460A00 ..Fence %lx. - Extent is Undefin 000020
202C646C 2520646C 25202959 58595828 20736920 746E6574 7845202D 20006465 ed. - Extent is (XYXY) %ld %ld,  000040
6F74746F 42202020 200A0020 20203A74 66654C20 2020200A 00646C25 20646C25 %ld %ld..   Left:  ..     Botto 000060
00202020 203A706F 54202020 200A0020 203A7468 67695220 2020200A 00203A6D m: ..     Right:  ..    Top:    . 000080
6F6E6472 625C6D73 775C6372 735C3133 30306A6F 72705C6A 6F72705C 3A71000A ..q:\proj\proj0031\src\wsm\brdno 0000A0
6F72705C 3A71004C 4C554E20 4C51454E 20737473 6F700063 2E74736F 705C6C70 pl\post.c.posts NEQL NULL.q:\pro 0000C0
2E74736F 705C6C70 6F6E6472 625C6D73 775C6372 735C3133 30306A6F 72705C6A j\proj0031\src\wsm\brdnopl\post. 0000E0
3E207828 20524F20 29747261 74537473 6F707020 4C514520 7374736F 70280063 c.(posts EQL ppostStart) OR (x > 000100
6F72705C 6A6F7270 5C3A7100 29656764 45783E2D 74726174 5374736F 7070203D = ppostStart->xEdge).q:\proj\pro 000120
736F7000 632E7473 6F705C6C 706F6E64 72625C6D 73775C63 72735C31 3330306A j0031\src\wsm\brdnopl\post.c.pos 000140
72735C31 3330306A 6F72705C 6A6F7270 5C3A7100 4C4C554E 204C5145 4E207374 ts NEQL NULL.q:\proj\proj0031\sr 000160
67644578 3E207374 736F7000 632E7473 6F705C6C 706F6E64 72625C6D 73775C63 c\wsm\brdnopl\post.c.posts->xEdg 000180
5C637273 5C313330 306A6F72 705C6A6F 72705C3A 71004C4C 554E204C 51452065 e EQL NULL.q:\proj\proj0031\src\ 0001A0
65756C61 56793E2D 7374736F 7000632E 74736F70 5C6C706F 6E647262 5C6D7377 wsm\brdnopl\post.c.posts->yValue 0001C0
775C6372 735C3133 30306A6F 72705C6A 6F72705C 3A71004C 4C554E20 4C514520  EQL NULL.q:\proj\proj0031\src\w 0001E0

Dump of file SATURN:[PCCOMMON.DUMP.DLL]BRD.TMP;1 on 18-APR-1990 10:36:59.83
File ID (519,15,0)   End of file block 272 / Allocated 272

Virtual block number 255 (000000FF), 512 (0200) bytes

7100666E 4959663E 2D737473 6F700063 2E74736F 705C6C70 6F6E6472 6???6D73 sm\brdnopl\post.c.posts->fYInf.q 000000
5C6C706F 6E647262 5C6D7377 5C637273 5C313330 306A6F72 705C6A6F 727??C3A :\proj\proj0031\src\wsm\brdnopl\ 000020
705C6A6F 72705C3A 71004C4C 554E204C 51454E20 7374736F 7000632E 7473??70 post.c.posts NEQL NULL.q:\proj\p 000040
7000632E 74736F70 5C6C706F 6E647262 5C6D7377 5C637273 5C313330 306A6F72 roj0031\src\wsm\brdnopl\post.c.p 000060
5C313330 306A6F72 705C6A6F 72705C3A 71004C4C 554E204C 51454E20 7374736F osts NEQL NULL.q:\proj\proj0031\ 000080
71004878 203C204C 7800632E 74736F70 5C6C706F 6E647262 5C6D7377 5C637273 src\wsm\brdnopl\post.c.xL < xH.q 0000A0
5C6C706F 6E647262 5C6D7377 5C637273 5C313330 306A6F72 705C6A6F 72705C3A :\proj\proj0031\src\wsm\brdnopl\ 0000C0
3A71004C 4C554E20 4C51454E 20746365 6C6C6F43 7374736F 7000632E 74736F70 post.c.postsCollect NEQL NULL.q: 0000E0
705C6C70 6F6E6472 625C6D73 775C6372 735C3133 30306A6F 72705C6A 6F72705C \proj\proj0031\src\wsm\brdnopl\p 000100
6A6F7270 5C3A7100 4C4C554E 204C5145 4E206464 41737473 6F700063 2E74736F ost.c.postsAdd NEQL NULL.q:\proj 000120
632E7473 6F705C6C 706F6E64 72625C6D 73775C63 72735C31 3330306A 6F72705C \proj0031\src\wsm\brdnopl\post.c 000140
3330306A 6F72705C 6A6F7270 5C3A7100 4C4C554E 204C5145 4E207374 736F7000 .posts NEQL NULL.q:\proj\proj003 000160
4878203C 204C7800 632E7473 6F705C6C 706F6E64 72625C6D 73775C63 72735C31 1\src\wsm\brdnopl\post.c.xL < xH 000180
706F6E64 72625C6D 73775C63 72735C31 3330306A 6F72705C 6A6F7270 5C3A7100 .q:\proj\proj0031\src\wsm\brdnop 0001A0
6A6F7270 5C3A7100 4C4C554E 204C5145 4E207374 736F7000 632E7473 6F705C6C l\post.c.posts NEQL NULL.q:\proj 0001C0
632E7473 6F705C6C 706F6E64 72625C6D 73775C63 72735C31 3330306A 6F72705C \proj0031\src\wsm\brdnopl\post.c 0001E0
```

```
Dump of file SATURN:[PCCOMMON.DUMP.DLL]BRD.TMP;1 on 18-APR-1990 10:36:59.83
File ID (519,15,0)   End of file block 272 / Allocated 272

Virtual block number 256 (00000100), 512 (0200) bytes

 30306A6F 72705C64 6F72705C 3A71004C 4C554E20 4C51454E 20327374 736F7000 .posts2 NEQL NULL.q:\proj\proj00 000000
 20737473 6F700063 2E74736F 705C6C70 6F6E6472 625C6D73 775C6372 735C3133 31\src\wsm\brdnopl\post.c.posts  000020
 775C6372 735C3133 30306A6F 72705C6A 6F72705C 3A71004C 4C554E20 4C51454E NEQL NULL.q:\proj\proj0031\src\w 000040
 6F72705C 3A710048 78203C20 4C780063 2E74736F 705C6C70 6F6E6472 625C6D73 sm\brdnopl\post.c.xL < xH.q:\pro 000060
 2E74736F 705C6C70 6F6E6472 625C6D73 775C6372 735C3133 30306A6F 72705C6A j\proj0031\src\wsm\brdnopl\post. 000080
 30306A6F 72705C6A 6F72705C 3A71004C 4C554E20 4C51454E 20737473 6F700063 c.posts NEQL NULL.q:\proj\proj00 0000A0
 50737473 6F700063 2E74736F 705C6C70 6F6E6472 625C6D73 775C6372 735C3133 31\src\wsm\brdnopl\post.c.postsP 0000C0
 735C3133 30306A6F 72705C6A 6F72705C 3A71004C 4C554E20 4C51454E 20686361 ack NEQL NULL.q:\proj\proj0031\s 0000E0
 51454E20 7374736F 70280063 2E74736F 705C6C70 6F6E6472 625C6D73 775C6372 rc\wsm\brdnopl\post.c.(posts NEQ 000100
 2C692020 28205800 666E4959 663E2073 74736F70 20444E41 20294C4C 554E204C L NULL) AND posts->fYInf.[ ( -i, 000120
 0008005D 20002920 646C2500 29206963 2500202C 646C2520 28002920 69632520  %ci ).( %ld, .%ci ).%ld ). ]... 000140
 6E490065 74756F52 20646E69 46203A4D 47440002 00010001 00020008 00040004 ..............DGM: Find Route.In 000160
 00000000 00000000 00000000 00000000 00002170 6F6F6C20 7373656C 646E6520  endless loop!.................. 000180
 74736E6F 43206563 726?666E 45203A4D 47440000 00000000 00000000 00000000 ..............DGM: Enforce Const 0001A0
 081A2420 FFFF2990 0021706F 6F6C2073 73656C64 6E65206E 49007374 6E^96172 raints.In endless loop!..).. $.. 0001C0
 1E821818 1E4F1A95 1C231929 1C25192B 1C481933 082624BA 082223AA 081E 4DE 8$..`#".¤$&.3.H.+.%.).#...0...ÿ. 0001E0

Dump of file SATURN:[PCCOMMON.DUMP.DLL]BRD.TMP;1 on 18-APR-1990 10:36:59.83
File ID (519,15,0)   End of file block 272 / Allocated 272

Virtual block number 257 (00000101), 512 (0200) bytes

 00000000 08600000 3FF00000 00000000 00747271 73040000 18071884 1E801819 ..¯...@....sqrt.......Þ7..`..... 000000
 00000000 02020000 00000000 00000000 01020000 00000000 00000000 0001FFFF ................................ 000020
 00000000 00000000 00000000 00000000 00000000 00000000 00000000 00000000 ................................ 000040
 00000000 00000000 00000000 00000000 00000000 00000000 00000000 00000000 ................................ 000060
 00000000 00000000 00000000 00000000 00000000 00000000 00000000 00000000 ................................ 000080
 00000000 00000000 00000000 00000000 00000000 00000000 00000000 00000000 ................................ 0000A0
 00000000 00000000 00000000 00000000 00000000 00000000 00000000 00000000 ................................ 0000C0
 00000000 00000000 00000000 00000000 00000000 00000000 00000000 00000000 ................................ 0000E0
 00000000 00000000 00000000 00000000 00000000 00000000 00000000 00000000 ................................ 000100
 00000000 00000000 00000000 00000000 00000000 00000000 00000000 00000000 ................................ 000120
 00000000 00000000 00000000 00000000 00000000 00000000 00000000 00000000 ................................ 000140
 00000000 00000000 00000000 00000000 00000000 00000000 00000000 00000000 ................................ 000160
 00000000 00000000 00000000 00000000 00000000 00000000 00000000 00000000 ................................ 000180
 00000000 00000000 00000000 00000000 00000000 00000000 00000000 00000000 ................................ 0001A0
 00000000 00000000 00000000 00000000 00000000 00000000 00000000 00000000 ................................ 0001C0
 00000000 00000000 00000000 00000000 00000000 00000000 00000000 00000000 ................................ 0001E0

Dump of file SATURN:[PCCOMMON.DUMP.DLL]BRD.TMP;1 on 18-APR-1990 10:36:59.83
File ID (519,15,0)   End of file block 272 / Allocated 272

Virtual block number 258 (00000102), 512 (0200) bytes

 00000000 00000000 00000000 00000000 00000000 00000000 00000000 00000000 ................................ 000000
 00000000 00000000 00000000 00000000 00000000 00000000 00000000 00000000 ................................ 000020
 00000000 00000000 00000000 00000000 00000000 00000000 00000000 00000000 ................................ 000040
 00000000 00000000 00000000 00000000 00000000 00000000 00000000 00000000 ................................ 000060
 00000000 00000000 00000000 00000000 00000000 00000000 00000000 00000000 ................................ 000080
 00000000 00000000 00000000 00000000 00000000 00000000 00000000 00000000 ................................ 0000A0
 00000000 00000000 00000000 00000000 00000000 00000000 00000000 00000000 ................................ 0000C0
 00000000 00000000 00000000 00000000 00000000 00000000 00000000 00000000 ................................ 0000E0
 00000000 00000000 00000000 00000000 00000000 00000000 00000000 00000000 ................................ 000100
 00000000 00000000 00000000 00000000 00000000 00000000 00000000 00000000 ................................ 000120
 00000000 00000000 00000000 00000000 00000000 00000000 00000000 00000000 ................................ 000140
 00000000 00000000 00000000 00000000 00000000 00000000 00000000 00000000 ................................ 000160
 00000000 00000000 00000000 00000000 00000000 00000000 00000000 00000000 ................................ 000180
 00000000 00000000 00000000 00000000 00000000 00000000 00000000 00000000 ................................ 0001A0
 00000000 00000000 00000000 00000000 00000000 00000000 00000000 00000000 ................................ 0001C0
 00000000 00000000 00000000 00000000 00000000 00000000 00000000 00000000 ................................ 0001E0
```

```
Dump of file SATURN:[PCCOMMON.DUMP.DLL]BRD.TMP;1 on 18-APR-1990 10:36:59.83
File ID (519,15,0)   End of file block 272 / Allocated 272

Virtual block number 259 (00000103), 512 (0200) bytes

00000000 00000000 00000000 00000000 00000000 00000000 00000000 00000000 ................................ 000000
00000000 00000000 00000000 00000000 00000000 00000000 00000000 00000000 ................................ 000020
00000000 00000000 00000000 00000000 00000000 00000000 00000000 00000000 ................................ 000040
00000000 00000000 00000000 00000000 00000000 00000000 00000000 00000000 ................................ 000060
00000000 00000000 00000000 00000000 00000000 00000000 00000000 00000000 ................................ 000080
00000000 00000000 00000000 00000000 00000000 00000000 00000000 00000000 ................................ 0000A0
00000000 00000000 00000000 00000000 00000000 00000000 00000000 00000000 ................................ 0000C0
00000000 00000000 00000000 00000000 00000000 00000000 00000000 00000000 ................................ 0000E0
00000000 00000000 00000000 00000000 00000000 00000000 00000000 00000000 ................................ 000100
00000000 00000000 00000000 00000000 00000000 00000000 00000000 00000000 ................................ 000120
00000000 00000000 00000000 00000000 00000000 00000000 00000000 00000000 ................................ 000140
00000000 00000000 00000000 00000000 00000000 00000000 00000000 00000000 ................................ 000160
00000000 00000000 00000000 00000000 00000000 00000000 00000000 00000000 ................................ 000180
00000000 00000000 00000000 00000000 00000000 00000000 00000000 00000000 ................................ 0001A0
00000000 00000000 00000000 00000000 00000000 00000000 00000000 00000000 ................................ 0001C0
00000000 00000000 00000000 00000000 00000000 00000000 00000000 00000000 ................................ 0001E0

Dump of file SATURN:[PCCOMMON.DUMP.DLL]BRD.TMP;1 on 18-APR-1990 10:36:59.83
File ID (519,15,0)   End of file block 272 / Allocated 272

Virtual block number 260 (00000104), 512 (0200) bytes

00000000 00000000 00000000 00000000 00000000 00000000 00000000 00000000 ................................ 000000
00000000 00000000 00000000 00000000 00000000 00000000 00000000 00000000 ................................ 000020
00000000 00000000 00000000 00000000 00000000 00000000 00000000 00000000 ................................ 000040
00000000 00000000 00000000 00000000 00000000 00000000 00000000 00000000 ................................ 000060
00000000 00000000 00000000 00000000 00000000 00000000 00000000 00000000 ................................ 000080
00000000 00000000 00000000 00000000 00000000 00000000 00000000 00000000 ................................ 0000A0
00000000 00000000 00000000 00000000 00000000 00000000 00000000 00000000 ................................ 0000C0
00000000 00000000 00000000 00000000 00000000 00000000 00000000 00000000 ................................ 0000E0
00000000 00000000 00000000 00000000 00000000 00000000 00000000 00000000 ................................ 000100
00000000 00000000 00000000 00000000 00000000 00000000 00000000 00000000 ................................ 000120
00000000 00000000 00000000 00000000 00000000 00000000 00000000 00000000 ................................ 000140
00000000 00000000 00000000 00000000 00000000 00000000 00000000 00000000 ................................ 000160
00000000 00000000 00000000 00000000 00000000 00000000 00000000 00000000 ................................ 000180
00000000 00000000 00000000 00000000 00000000 00000000 00000000 00000000 ................................ 0001A0
00000000 00000000 00000000 00000000 00000000 00000000 00000000 00000000 ................................ 0001C0
00000000 00000000 00000000 00000000 00000000 00000000 00000000 00000000 ................................ 0001E0

Dump of file SATURN:[PCCOMMON.DUMP.DLL]BRD.TMP;1 on 18-APR-1990 10:36:59.83
File ID (519,15,0)   End of file block 272 / Allocated 272

Virtual block number 261 (00000105), 512 (0200) bytes

00000000 00000000 00000000 00000000 00000000 00000000 00000000 00000000 ................................ 000000
00000000 00000000 00000000 00000000 00000000 00000000 00000000 00000000 ................................ 000020
00000000 00000000 00000000 00000000 00000000 00000000 00000000 00000000 ................................ 000040
00000000 00000000 00000000 00000000 00000000 00000000 00000000 00000000 ................................ 000060
00000000 00000000 00000000 00000000 00000000 00000000 00000000 00000000 ................................ 000080
00000000 00000000 00000000 00000000 00000000 00000000 00000000 00000000 ................................ 0000A0
00000000 00000000 00000000 00000000 00000000 00000000 00000000 00000000 ................................ 0000C0
00000000 00000000 00000000 00000000 00000000 00000000 00000000 00000000 ................................ 0000E0
00000000 00000000 00000000 00000000 00000000 00000000 00000000 00000000 ................................ 000100
00000000 00000000 00000000 00000000 00000000 00000000 00000000 00000000 ................................ 000120
00000000 00000000 00000000 00000000 00000000 00000000 00000000 00000000 ................................ 000140
00000000 00000000 00000000 00000000 00000000 00000000 00000000 00000000 ................................ 000160
00000000 00000000 00000000 00000000 00000000 00000000 00000000 00000000 ................................ 000180
00000000 00000000 00000000 00000000 00000000 00000000 00000000 00000000 ................................ 0001A0
00000000 00000000 00000000 00000000 00000000 00000000 00000000 00000000 ................................ 0001C0
00000000 00000000 00000000 00000000 00000000 00000000 00000000 00000000 ................................ 0001E0
```

```
Dump of file SATURN:[PCCOMMON.DUMP.DLL]BRD.TMP;1 on 18-APR-1990 10:36:59.83
File ID (519,15,0)   End of file block 272 / Allocated 272

Virtual block number 262 (00000106), 512 (0200) bytes

 00000000 00000000 00000000 00000000 00000000 00000000 00000000 00000000 ................................ 000000
 00000000 00000000 00000000 00000000 00000000 00000000 00000000 00000000 ................................ 000020
 00000000 00000000 00000000 00000000 00000000 00000000 00000000 00000000 ................................ 000040
 00000000 00000000 00000000 00000000 00000000 00000000 00000000 00000000 ................................ 000060
 00000000 00000000 00000000 00000000 00000000 00000000 00000000 00000000 ................................ 000080
 00000000 00000000 00000000 00000000 00000000 00000000 00000000 00000000 ................................ 0000A0
 00000000 00000000 00000000 00000000 00000000 00000000 00000000 00000000 ................................ 0000C0
 00000000 00000000 00000000 00000000 00000000 00000000 00000000 00000000 ................................ 0000E0
 00000000 00000000 00000000 00000000 00000000 00000000 00000000 00000000 ................................ 000100
 00000000 00000000 00000000 00000000 00000000 00000000 00000000 00000000 ................................ 000120
 00000000 00000000 00000000 00000000 00000000 00000000 00000000 00000000 ................................ 000140
 00000000 00000000 00000000 00000000 00000000 00000000 00000000 00000000 ................................ 000160
 00000000 00000000 00000000 00000000 00000000 00000000 00000000 00000000 ................................ 000180
 00000000 00000000 00000000 00000000 00000000 00000000 00000000 00000000 ................................ 0001A0
 00000000 00000000 00000000 00000000 00000000 00000000 00000000 00000000 ................................ 0001C0
 00000000 00000000 00000000 00000000 00000000 00000000 00000000 00000000 ................................ 0001E0

Dump of file SATURN:[PCCOMMON.DUMP.DLL]BRD.TMP;1 on 18-APR-1990 10:36:59.83
File ID (519,15,0)   End of file block 272 / Allocated 272

Virtual block number 263 (00000107), 512 (0200) bytes

 00000000 00000000 00000000 00000000 02000001 00000000 00000000 00000000 ................................ 000000
 00000000 00000000 00000000 00000000 00000000 00000000 00000000 00000000 ................................ 000020
 00000000 00000000 00000000 00000000 00000000 00000000 00000000 00000000 ................................ 000040
 00000000 00000000 00000000 00000000 00000000 00000000 00000000 00000000 ................................ 000060
 00000000 00000000 00000000 00000000 00000000 00000000 00000000 00000000 ................................ 000080
 00000000 00000000 00000000 00000000 00000000 00000000 00000000 00000000 ................................ 0000A0
 00000000 00000000 00000000 00000000 00000000 00000000 00000000 00000000 ................................ 0000C0
 00000000 00000000 00000000 00000000 00000000 00000000 00000000 00000000 ................................ 0000E0
 00000000 00000000 00000000 00000000 00000000 00000000 00000000 00000000 ................................ 000100
 00000000 00000000 00000000 00000000 00000000 00000000 00000000 00000000 ................................ 000120
 00000000 00000000 00000000 00000000 00000000 00000000 00000000 00000000 ................................ 000140
 00000000 00000000 00000000 00000000 00000000 00000000 00000000 00000000 ................................ 000160
 00000000 00000000 00000000 00000000 00000000 00000000 00000000 00000000 ................................ 000180
 00000000 00000000 00000000 00000000 00000000 00000000 00000000 00000000 ................................ 0001A0
 00000000 00000000 00000000 00000000 00000000 00000000 00000000 00000000 ................................ 0001C0
 00000000 00000000 00000000 00000000 00000000 00000000 00000000 00000000 ................................ 0001E0

Dump of file SATURN:[PCCOMMON.DUMP.DLL]BRD.TMP;1 on 18-APR-1990 10:36:59.83
File ID (519,15,0)   End of file block 272 / Allocated 272

Virtual block number 264 (00000108), 512 (0200) bytes

 00000000 00000000 00000000 00000000 00000000 00000000 00000000 00000000 ................................ 000000
 00000000 00000000 00000000 00000000 00000000 00000000 00000000 00000000 ................................ 000020
 00000000 00000000 00000000 00000000 00000000 00000000 00000000 00000000 ................................ 000040
 00000000 00000000 00000000 00000000 00000000 00000000 00000000 00000000 ................................ 000060
 00000000 00000000 00000000 00000000 00000000 00000000 00000000 00000000 ................................ 000080
 00000000 00000000 00000000 00000000 00000000 00000000 00000000 00000000 ................................ 0000A0
 00000000 00000000 00000000 00000000 00000000 00000000 00000000 00000000 ................................ 0000C0
 00000000 00000000 00000000 00000000 00000000 00000000 00000000 00000000 ................................ 0000E0
 00000000 00000000 00000000 00000000 00000000 00000000 00000000 00000000 ................................ 000100
 00000000 00000000 00000000 00000000 00000000 00000000 00000000 00000000 ................................ 000120
 00000000 00000000 00000000 00000000 00000000 00000000 00000000 00000000 ................................ 000140
 00000000 00000000 00000000 00000000 00000000 00000000 00000000 00000000 ................................ 000160
 00000000 00000000 00000000 00000000 00000000 00000000 00000000 00000000 ................................ 000180
 00000000 00000000 00000000 00000000 00000000 00000000 00000000 00000000 ................................ 0001A0
 00000000 00000000 00000000 00000000 00000000 00000000 00000000 00000000 ................................ 0001C0
 00000000 00000000 00000000 00000000 00000000 00000000 00000000 00000000 ................................ 0001E0
```

```
Dump of file SATURN:[PCCOMMON.DUMP.DLL]BRD.TMP;1 on 18-APR-1990 10:36:59.83
File ID (519,15,0)   End of file block 272 / Allocated 272

Virtual block number 265 (00000109), 512 (0200) bytes

00000000 00000000 00000000 00000000 00000000 00000000 00000000 00000000 ................................ 000000
00000000 00000000 00000000 00000000 00000000 00000000 00000000 00000000 ................................ 000020
00000000 00000000 00000000 00000000 00000000 00000000 00000000 00000000 ................................ 000040
00000000 00000000 00000000 00000000 00000000 00000000 00000000 00000000 ................................ 000060
00000000 00000000 00000000 00000000 00000000 00000000 00000000 00000000 ................................ 000080
00000000 00000000 00000000 00000000 00000000 00000000 00000000 00000000 ................................ 0000A0
00000000 00000000 00000000 00000000 00000000 00000000 00000000 00000000 ................................ 0000C0
00000000 00000000 00000000 00000000 00000000 00000000 00000000 00000000 ................................ 0000E0
00000000 00000000 00000000 00000000 00000000 00000000 00000000 00000000 ................................ 000100
00000000 00000000 00000000 00000000 00000000 00000000 00000000 00000000 ................................ 000120
00000000 00000000 00000000 00000000 00000000 00000000 00000000 00000000 ................................ 000140
00000000 00000000 00000000 00000000 00000000 00000000 00000000 00000000 ................................ 000160
00000000 00000000 00000000 00000000 00000000 00000000 00000000 00000000 ................................ 000180
00000000 00000000 00000000 00000000 00000000 00000000 00000000 00000000 ................................ 0001A0
00000000 00000000 00000000 00000000 00000000 00000000 00000000 00000000 ................................ 0001C0
00000000 00000000 00000000 00000000 00000000 00000000 00000000 00000000 ................................ 0001E0

Dump of file SATURN:[PCCOMMON.DUMP.DLL]BRD.TMP;1 on 18-APR-1990 10:36:59.83
File ID (519,15,0)   End of file block 272 / Allocated 272

Virtual block number 266 (0000010A), 512 (0200) bytes

00296C6C 756E2800 296C6C75 6E280000 00000000 00002828 17400000 00000000 ......a.((........(null).(null). 000000
01010000 00001D74 2C801D70 2C801D6C 2C801D68 2C8027FE 2C800000 23202028 +- #...,z'.,h...l..,p..,t....... 000020
00000000 00000000 00000000 000080C0 E0F0F8FC FEFF0000 00007878 31364005 .M61xx.....z•½þÀà............... 000040
00000000 00000000 00000000 00000000 00000000 00000000 00000000 00000000 ................................ 000060
00790078 00000000 00000000 00000000 00000000 00000000 00000000 00000000 ............................x.y. 000080
00000000 00000000 00000000 00000030 30302B65 00203A02 0000007A 00000000 ....z....: .e+000............... 0000A0
00000000 00000000 00000000 00000000 00000000 00000000 00000000 00000000 ................................ 0000C0
00000000 00000000 00000000 00000000 00000000 00000000 00000000 00000000 ................................ 0000E0
00000000 00000000 00000000 00000000 00000000 00000000 00000000 00000000 ................................ 000100
00000000 00000000 00000000 00000000 00000000 00000000 00000000 00000000 ................................ 000120
00000000 00000000 00000000 00000000 00000000 00000000 00000000 00000000 ................................ 000140
00000000 00000000 00000000 00000000 00000000 00000000 00000000 00000000 ................................ 000160
00000000 00000000 00000000 00000000 00000000 00000000 00000000 00000000 ................................ 000180
00000000 00000000 00000000 00000000 00000000 00000000 00000000 00000000 ................................ 0001A0
00000000 00000000 00000000 00000000 00000000 00000000 00000000 00000000 ................................ 0001C0
00000000 00000000 00000000 00000000 00000000 00000000 00000000 00000000 ................................ 0001E0

Dump of file SATURN:[PCCOMMON.DUMP.DLL]BRD.TMP;1 on 18-APR-1990 10:36:59.83
File ID (519,15,0)   End of file block 272 / Allocated 272

Virtual block number 267 (0000010B), 512 (0200) bytes

00000000 00000000 00000000 00000000 00000000 00000000 00000000 00000000 ................................ 000000
00000000 1E0A0000 00000000 00000000 00000000 00000000 00000000 00000000 ................................ 000020
00000000 00000000 00000000 00000000 00000000 00002852 2B802C19 2B802B80 ¯+¯+.,¯+R(...................... 000040
00000000 00000000 00000000 00000000 00000000 00000000 00000000 00000000 ................................ 000060
00000000 00000000 00000000 00000000 00000000 00000000 00000000 00000000 ................................ 000080
00000000 00000000 00000000 00000000 00000000 00000000 00000000 00000000 ................................ 0000A0
00000000 00000000 00000000 00000000 00000000 00000000 00000000 00000000 ................................ 0000C0
00000000 00000000 00000000 00000000 00000000 00000000 00000000 00000000 ................................ 0000E0
00000000 00000000 00000000 00000000 00000000 00000000 00000000 00000000 ................................ 000100
00000000 00000000 00000000 00000000 00000000 00000000 00000000 00000000 ................................ 000120
00000000 00000000 00000000 00000000 00000000 00000000 00000000 00000000 ................................ 000140
00000000 00000000 00000000 00000000 00000000 00000000 00000000 00000000 ................................ 000160
00000000 00000000 00000000 00000000 00000000 00000000 00000000 00000000 ................................ 000180
00000000 00000000 00000000 00000000 00000000 00000000 00000000 00000000 ................................ 0001A0
00000000 00000000 00000000 00000000 00000000 00000000 00000000 00000000 ................................ 0001C0
00000000 00000000 00000000 00000000 00000000 00000000 00000000 00000000 ................................ 0001E0
```

```
Dump of file SATURN:[PCCOMMON.DUMP.DLL]BRD.TMP;1 on 18-APR-1990 10:36:59.83
File ID (519,15,0)   End of file block 272 / Allocated 272

Virtual block number 268 (0000010C), 512 (0200) bytes

00000000 00000000 00000000 00000000 00000000 00000000 00000000 00000000 ................................ 000000
00000000 00000000 00000000 00000000 00000000 00000000 00000000 00000000 ................................ 000020
00000000 00000000 00000000 00000000 00000000 00000000 00000000 00000000 ................................ 000040
00000000 00000000 00000000 00000000 00000000 00000000 00000000 00000000 ................................ 000060
00000000 00000000 00000000 00000000 00000000 00000000 00000000 00000000 ................................ 000080
00000000 00000000 00000000 00000000 00000000 00000000 00000000 00000000 ................................ 0000A0
00000000 00000000 00000000 00000000 00000000 00000000 00000000 00000000 ................................ 0000C0
00000000 00000000 00000000 00000000 00000000 00000000 00000000 00000000 ................................ 0000E0
00000000 00000000 00000000 00000000 00000000 00000000 00000000 00000000 ................................ 000100
00000000 00000000 00000000 00000000 00000000 00000000 00000000 00000000 ................................ 000120
00000000 00000000 00000000 00000000 00000000 00000000 00000000 00000000 ................................ 000140
00000000 00000000 00000000 00000000 00000000 00000000 00000000 00000000 ................................ 000160
00000000 00000000 00000000 00000000 00000000 00000000 00000000 00000000 ................................ 000180
00000000 00000000 00000000 00000000 00000000 00000000 00000000 00000000 ................................ 0001A0
00000000 00000000 00000000 00000000 00000000 00000000 00000000 00000000 ................................ 0001C0
00000000 00000000 00000000 00000000 00000000 00000000 00000000 00000000 ................................ 0001E0

Dump of file SATURN:[PCCOMMON.DUMP.DLL]BRD.TMP;1 on 18-APR-1990 10:36:59.83
File ID (519,15,0)   End of file block 272 / Allocated 272

Virtual block number 269 (0000010D), 512 (0200) bytes

00000000 00000000 00000000 00000000 00000000 00000000 00000000 00000000 ................................ 000000
00000000 00000000 00000000 00000000 00000000 00000000 00000000 00000000 ................................ 000020
00000000 00000000 00000030 4F464E49 5F454C49 465F435F 1F860000 00000000 ........C_FILE_INFO=........... 000040
00000000 00000000 00000000 00000000 00000000 81818101 00000001 00000000 ................................ 000060
00000000 00000000 00000000 00000000 00000000 00000000 00000000 00000000 ................................ 000080
00000000 00000000 00000000 00000000 00000000 00000000 00000000 00000000 ................................ 0000A0
00000000 00000000 00000000 00000000 00000000 00000000 00000000 00000000 ................................ 0000C0
00000000 00000000 00000000 00000000 00000000 00000000 00000000 00000000 ................................ 0000E0
00000000 00000000 00000000 00000000 00000000 00000000 00000000 00000000 ................................ 000100
00000000 00000000 00000000 00000000 00000000 00000000 00000000 00000000 ................................ 000120
00000000 00000000 00000000 00000000 00000000 00000000 00000000 00000000 ................................ 000140
0A0A0A0A 0A0A0A0A 0A0A0A0A 0A0A0A0A 0A0A0A0A 0A0A0A00 00000000 00000000 ................................ 000160
0A0A0A0A 0A0A0A0A 0A0A0A0A 0A0A0A0A 0A0A0A0A 0A0A0A0A 0A0A0A0A 0A0A0A0A ................................ 000180
0A0A0A0A 0A0A0A0A 0A0A0A0A 0A0A0A0A 0A0A0A0A 0A0A0A0A 0A0A0A0A 0A0A0A0A ................................ 0001A0
0A0A0A0A 0A0A0A0A 0A0A0A0A 0A0A0A0A 0A0A0A0A 0A0A0A0A 0A0A0A0A 0A0A0A0A ................................ 0001C0
0A0A0A0A 0A0A0A0A 0A0A0A0A 0A0A0A0A 0A0A0A0A 0A0A0A0A 0A0A0A0A 0A0A0A0A ................................ 0001E0

Dump of file SATURN:[PCCOMMON.DUMP.DLL]BRD.TMP;1 on 18-APR-1990 10:36:59.83
File ID (519,15,0)   End of file block 272 / Allocated 272

Virtual block number 270 (0000010E), 512 (0200) bytes

0A0A0A0A 0A0A0A0A 0A0A0A0A 0A0A0A0A 0A0A0A0A 0A0A0A0A 0A0A0A0A 0A0A0A0A ................................ 000000
0A0A0A0A 0A0A0A0A 0A0A0A0A 0A0A0A0A 0A0A0A0A 0A0A0A0A 0A0A0A0A 0A0A0A0A ................................ 000020
0A0A0A0A 0A0A0A0A 0A0A0A0A 0A0A0A0A 0A0A0A0A 0A0A0A0A 0A0A0A0A 0A0A0A0A ................................ 000040
00000000 00000000 00000000 00000000 00000000 0000000A 0A0A0A0A 0A0A0A0A ................................ 000060
20202020 20202020 20202020 20202020 20282828 28282020 20202020 20202000 .         (((((                  000080
10101010 10848484 84848484 84848410 10101010 10101010 10101010 10104820 H............................... 0000A0
10101010 01010101 01010101 01010101 01010101 01010101 81818181 81811010 ................................ 0000C0
10101010 02020202 02020202 02020202 02020202 02020202 82828282 82821010 ................................ 0000E0
00000000 00000000 00000000 00000000 00000000 00000000 00000000 00000020  ............................... 000100
00000000 00000000 00000000 00000000 00000000 00000000 00000000 00000000 ................................ 000120
00000000 00000000 00000000 00000000 00000000 00000000 00000000 00000000 ................................ 000140
00000000 00000000 00000000 00000000 00000000 00000000 00000000 00000000 ................................ 000160
00000000 00000000 00000000 00000000 00000000 00000000 00000000 00000000 ................................ 000180
00000000 00003FE0 00000000 00000000 7FEFFFFF FFFFFFFF 00000000 00000000 ..............ÿ.........Â?...... 0001A0
0200FFFF FFFF0000 00000000 00000000 00000000 00004000 00000000 00003FF0 þ?.......a...................... 0001C0
00000000 00000000 00000000 00002000 00000000 00000000 00000000 00000000 ................. .............. 0001E0
```

```
Dump of file SATURN:[PCCOMMON.DUMP.DLL]BRD.TMP;1 on 18-APR-1990 10:36:59.83
File ID (519,15,0)   End of file block 272 / Allocated 272

Virtual block number 271 (0000010F), 512 (0200) bytes

 00000000 00000000 00000000 00000000 00000000 00000000 00000000 00000000 ................................ 000000
 00000000 00000000 00000000 00000000 00000000 00000000 00000000 00000000 ................................ 000020
 00000000 0000r000 00000000 00000000 00000000 00000000 00000000 00000000 ................................ 000040
 00000000 00000000 00000000 00000000 00000000 00000000 00000000 00000000 ................................ 000060
 00000000 00000000 00000000 00000000 00000000 00000000 00000000 00000000 ................................ 000080
 0B2A01D2 00000000 00000000 00000000 00000000 00000000 00000000 00000000 ............................@.*. 0000A0
 00003FE0 00000000 00002810 35282808 14630000 00001D78 2A260000 281432CE ö2.(..&*x.....c..((5.(......Á?.. 0000C0
 66666666 66663FE0 00000000 00003FE0 00000000 00002826 FFFF3FE0 00000000 ....Á?..&(......Á?......Á?ffffff 0000E0
 4D4E3C3C 00000000 00000000 1D483FE0 00000000 00000000 00000000 00003FEE Ÿ?..............Á?H.........<<NM 000100
 6520746E 696F702D 676E6974 616F6C66 202D0A0D 48544140 203A00FD 3E3E4753 SG>>ж.: MATH..- floating-point e 000120
 30207962 20656469 76696400 67000A0D 64696C61 766E6900 6500203A 726F7272 rror: .e.invalid...g.divide by 0 000140
 776F6C66 7265766F 20686361 7473006E 000A0D77 6F6C6672 65766F00 68000A0D ...h.overflow...n.stack overflow 000160
 4F44007B 000A0D64 65746172 656E6567 20796C74 6963696C 70786500 70000A0D ...p.explicitly generated...x.DO 000180
 4C54007A 000A0D72 6F727265 20474E49 53007900 0A0D726F 72726520 4E49414D MAIN error...y.SING error...z.TL 0001A0
 65766F20 68636174 73202D0A 0D303030 36520000 000A0D72 6F727265 2053534F OSS error.....R6000..- stack ove 0001C0
 64697669 64207265 6765746E 69202D0A 0D333030 36520003 000A0D77 6F6C6672 rflow.....R6003..- integer divid 0001E0

Dump of file SATURN:[PCCOMMON.DUMP.DLL]BRD.TMP;1 on 18-APR-1990 10:36:59.83
File ID (519,15,0)   End of file block 272 / Allocated 272

Virtual block number 272 (00000110), 512 (0200) bytes

 73206867 756F6E65 20746F6E 202D0A0D 38303036 52000800 0A0D3020 79622065 e by 0.....R6008..- not enough s 000000
 202D0A0D 39303036 52000900 0A0D7374 6E656D75 67726120 726F6620 65636170 pace for arguments.....R6009..-  000020
 746E656D 6E6F7269 766E6520 726F6620 65636170 73206867 756F6E65 20746F6E not enough space for environment 000040
 30303652 00020020 726F7272 6520656D 6974206E 757200FF 000A0D00 FC000A0D ...•......run-time error ...R600 000060
 0A0D6465 64616F6C 20746F6E 20746E69 6F702067 6E697461 6F6C6620 2D0A0032 2..- floating point not loaded.. 000080
 00000000 00000000 00000000 00000000 00000000 00000000 00000000 00FFFF00 ................................ 0000A0
 191F8800 02000000 180B5A00 02000000 17280200 020003FF 00000000 00000000 ..............(......Z.......... 0000C0
 00000000 00000000 00000000 00000000 00000000 00000000 00000000 00000000 ................................ 0000E0
 00000000 00000000 00000000 00000000 00000000 00000000 00000000 00000000 ................................ 000100
 00000000 00000000 00000000 00000000 00000000 00000000 00000000 00000000 ................................ 000120
 00000000 00000000 00000000 00000000 00000000 00000000 00000000 00000000 ................................ 000140
 00000000 00000000 00000000 00000000 00000000 00000000 00000000 00000000 ................................ 000160
 00000000 00000000 00000000 00000000 00000000 00000000 00000000 00000000 ................................ 000180
 00000000 00000000 00000000 00000000 00000000 00000000 00000000 00000000 ................................ 0001A0
 00000000 00000000 00000000 00000000 00000000 00000000 00000000 00000000 ................................ 0001C0
 00000000 00000000 00000000 00000000 00000000 00000000 00000000 00000000 ................................ 0001E0
```

Dump of file SATURN:[PCCOMMON.DUMP.PBIN]BACHMAN.EXE;1 on 18-APR-1990 10:54:14.84
File ID (370,5,0)   End of file block 23 / Allocated 24

Virtual block number 1 (00000001), 512 (0200) bytes

```
00000000 0000004J 00000000 00000088 0000FFFF 00000004 00000015 00E75A4D MZÓ.............|.......@....... 000000
00000080 00000000 00000000 00000000 00000000 00000000 00000000 00000000 ................................ 000020
6F6E6E61 63206061 72676F72 70207369 685421CD 4C01B821 CD09B400 0EBA1F0E ..¤..Ç.èl|.LèlThis program canno 000040
00000000 00000024 0A0D0D2E 65646F6D 20534F44 206E6920 6E757220 65622074 t be run in DOS mode....$....... 000060
00080004 00030000 00010344 80000000 0003030A 29250301 00020126 0505454E NE..&.....X)........D........... 000080
00000000 00000000 00010001 00040000 000001A8 007F006F 00640060 0040001D ..@.'.d.o....................... 0000A0
04201E81 04200290 0A100F01 08600207 02060E01 00000000 10AE0F00 10AE001D ..Û...Û...........m....... .Ý. . 0000C0
0000A300 96008000 6A005900 10000A00 01000000 4E414048 43414207 00010001 .....BACHMAN.........Y.j.....È.. 0000E0
4F544554 41455243 4954475F 0E495447 034E4957 40500553 4C4C4143 534F4408 .DOSCALLS.PMWIN.GTI._GTICREATETO 000100
49564C4F 4F545445 53495447 14584140 4E494D4C 4F4F5454 45534954 47104C4F OL.GTISETTOOLMINMAX.GTISETTOOLVI 000120
4C0A4E49 474F4C05 5355434F 464C4F4F 54544553 4954470F 5954494C 49424953 SIBILITY.GTISETTOOLFOCUS.LOGIN.L 000140
05544F4F 524E414D 48434142 5445534C 5455114C 5455034E 49474F4C 4E49474F OGINLOGIN.UTL.UTLSETBACHMANROOT. 000160
49525753 4F44084F 49530358 4F425455 4F424159 414C5053 49440F54 554F4241 ABOUT.DISPLAYABOUTBOX.SIO.DOSWRI 000180
72676F72 70207061 72747374 6F6F6220 4E414048 43414219 0000534C 4E034554 TE.NLS...BACHMAN bootstrap progr 0001A0
FF0876FF D8BEFFFF B81E5657 000052C8 00000000 00000000 00000000 00006061 am..............àR..WV.|...Å.v.. 0001C0
FE76FF00 2EE90375 B941FE7E 810038E9 037500FE 7E83FE46 890000FF FF9A0676 v.......F±.~±.u.Õ8..~±A.u.Ô...v± 0001E0
```

Dump of file SATURN:[PCCOMMON.DUMP.PBIN]BACHMAN.EXE;1 on 18-APR-1990 10:54:14.84
File ID (370,5,0)   End of file block 23 / Allocated 24

Virtual block number 2 (00000002), 512 (0200) bytes

```
681E5016 AE468D01 6A006A01 6A006A0A C483FFFF 04369A50 16AE4680 0042681E .hB..FÙ.P.6....á.j.j.j.j..FÙ.P.h 000000
0008881E 56570000 54C8CBC9 5F5E1F00 00E9FE46 880000FF FF9A406A 016A0057 W.j.j@......F±Ô...^_èùàT..WV.|.. 000020
0034E903 7500FC7E 83FC4689 08C48300 00FFFF9A FF6A0676 FF5016FE 468D088E .Ä.F±.P.v.j.......á..F•.~•.u.Ô4. 000040
16AC4680 016A006A 016A006A 0AC48300 3C04369A 5016AC46 80005068 1EFC76FF .v=.h]..F¯.P.6.<..á.j.j.j.j..F¯. 000060
76FF0000 FFFF9A01 6AFE76FF 0022E9FC 46800000 00579A40 6A016A00 78681E50 P.hx.j.j@.W....F•Ô"..v±j.......v 000080
57000074 C8CBC95F 5E1F0000 E9000088 0000FFFF 9AFE76FF 0000FFFF 9A016AFE ±j.......v±.....|..Ô...^_èùàt..W 0000A0
680E76FF E076FFE0 56890E46 890000FF FF9A006A 00000C46 C7088E00 6E881E56 V.|n..ÄúFÉ..j.......F8.VÃ.vÁ.v8h 0000C0
500000FF FF9ADE76 FFE076FF 0048E903 74000BFE 5689FC46 890000FF FF9A00C8 à.......F•.V±.Ât.ÔH..vÁ.v8.....P 0000E0
681E5016 8C468D01 6A006A01 6A006A0A C483009F 04369A50 168C4680 007E681E .h~..F..P.6....á.j.j.j.j..F..P.h 000100
0764068E 00F1E900 01880000 FFFF9ADE 76FFE076 FF000000 8A9A406A 016A00A1 Å.j.j@.¤....vÁ.v8.....|..Ôp...d. 000120
00013004 C48301B2 02629A37 FF260277 FF26085E C40202A3 260204A3 26000088 |..&È..&È..á^.&.w.&.7.b.ÿ..á.=.. 000140
9A0477FF 260677FF 26085EC4 0000FFFF 9A016A00 6A006A01 6A006A00 83E90375 u.Ô..j.j.j.j.j.......á^.&.w.&.w.. 000160
013C0066 9A236A00 4FE90375 00F9830C 4E8909F7 C9180001 3004C483 01CE0000 ..ö..á.=...è%l.NÉ.'.u.ÔO.j#.f.<. 000180
5016E246 800E76FF E076FF00 33E90375 00F9830C 4E8909F7 C9180001 3002C483 .á.=...è%l.NÉ.'.u.Ô3..vÁ.v8.Fã.P 0001A0
5016E246 800E76FF E076FF00 13E90375 00003000 00FFFF9A 006A006A 006A006A j.j.j.j......=..u.Ô...vÁ.v8.Fã.P 0001C0
068E0000 01629ADE 76FFE076 FF0000FF FF9AFC76 FFFE76FF FFCDE900 00FFFF9A .....Ôë..v±.v•......vÁ.v8.b..... 0001E0
```

Dump of file SATURN:[PCCOMMON.DUMP.PBIN]BACHMAN.EXE;1 on 18-APR-1990 10:54:14.84
File ID (370,5,0)   End of file block 23 / Allocated 24

Virtual block numb· 3 (00000003), 512 (0200) bytes

```
FF9A0202 36FF2602 0436FF26 0764068E 0013E903 75020406 08260202 A1260764 d.&À..&....u.Ô....d.&.6..&.6.... 000000
016A088E 00F3881E 56570000 04C8CBC9 5F5E1F00 00E940C0 1801DC7E 830000FF ....~É..àaÔ...^_èùà...WV.|µ..Äj. 000020
6A006A01 6A006A00 2EE90375 00003000 00FFFF9A 00A7681E 5052FFFF 8A020288 |..¤..RP.hI.......=..u.Ô..j.j.j.j 000040
02A32602 04A32600 00880764 068E0000 02E99A40 6A016A00 8F681E00 C5681E01 ..hé..he.j.j@.Ô.....d.|..&È..&È. 000060
74D00BFE 5689FC46 8906C483 030504BC 9A0676FF 0876FF5C 6A0078E9 00018802 .|..Ôx.j\.v..v..¥....á..F•.V±.Ât 000080
0001B800 0001579A 406A016A 00E1681E 00E7681E 016A006A 016A006A 001FE903 .Ô..j.j.j.j..hÔ..hÄ.j.j@.W...|.. 0000A0
FE5689FC 468906C4 83018804 BC9A0676 FF0876FF 5C6A0007 C626FC5E C4003CE9 Ô<.á^•&ó..j\.v..v..¥....á..F•.V± 0000C0
1F0000E9 00008800 00FFFF9A 0676FF08 76FF0007 C626FC5E C40007E9 0375000B .Áu.Ô..á^•&ó...v..v......|..Ô... 0000E0
1A1E8C01 18268901 142689FC 00000000 00000000 00000000 00000000 CBC95F5E ^_èù.................•.&...&..... 000100
053E8805 3CA3E086 580000FF FF9A5016 C4885001 0E1E8901 10A30112 0E894901 .Î....È......P.á.P.....X.ÀÈ<.|>. 000120
7136FF05 7336FF03 82060A9A 037D133E 9A02C204 EA9A004B E80000FF FF9A501E .P.....ÔK..ô.ô..>.)........6s..6q 000140
011606C7 360003B8 03A00574 9A500387 00E89A05 6836FF05 6036FF05 6F36FF05 ..6o..6m..6k..Š...P.t...|..6ú... 000160
C6087500 053E3E80 0000B801 1616FF50 00FF8803 8606C69A 03A605E6 9A500574 t.P.Ì.Ì..6.Ñ.|..P....£...>>..u.6 000180
43740030 80264701 75003080 267FFFB9 0110068E FF334800 052606C6 3B051A06 ...;6.&..K3.....¿..&.=.u.G&.=.tC 0001A0
F8830543 BF1FF788 C71E062E EBE774AE F2C03308 74CA88A6 F3C888D1 88051ABE ƒ...\.ùµÌ.ôt.3à·UtÓŠ.....¥.¢C..« 0001C0
480174C0 FEAC9198 ACEEEBAA C20A1172 412CAC92 E0021972 412CAC04 81147500 .u.Ý.¯,Ar.0Á.¯,Ar..ô˙ŠŸ¯..¯±ât.H 0001E0
```

```
Dump of file SATURN:[PCCOMMON.DUMP.PBIN]BACHMAN.EXE;1 on 18-APR-1990 10:54:14.84
File ID (370,5,0)   End of file block 23 / Allocated 24

Virtual block number 4 (00000004), 512 (0200) bytes

 FE568CFC 46890E46 8DFA568C F84689EC 468D5657 16EC83EC 8855C31F 16F7E2AA ˜ä%..ùU.&.&.WV.F&.F%.V'.F..F=.V± 000000
 47C72602 57892607 89260857 89260647 89260856 88064688 420A47C6 26F85EC4 Ä^%&óG.B.F..V.&.G.&.V.&..&.V.&úG 000020
 044FFF26 F85EC4F0 880CC483 04AE0884 9A53060A 76FF0C76 FFFC76FF 167FFF04 .....v=.v..v..S...Û..Á..Þá^%&.O. 000040
 03B806FC 9A50C02B 53FA76FF 9010E805 88260247 8E2607FF 263F8B26 C02A1278 x.*á&.7&..&.G.&..Š...v'S+áP.=.£. 000060
 468A4FD9 F741AEF2 FFFFB9C0 33067EC4 57EC8855 90CB50E5 885F5EC6 8806C483 .Á..ó^ .[]ù.U.&Wá-.3à¿..·ÛA%10.F 000080
 04885200 02B8C85D E5885FFC C28CC788 04E80088 C0330674 05382647 AEF2FD0A .»·ÛG&Š.t.3à.ÀŠ..ú.ó=_.[]ùE..R.Å 0000A0
 02300774 00013040 B1127558 C00B0000 FFFF9A52 16501653 C4885087 0543A780 .ÏC.ñP.áS.P.R......áXū.Ÿ@=..t.=. 0000C0
 0000FFFF 9A531652 0E03A88A 500C8850 50C0335A D4794805 438F0808 B1067500 .u.Ÿ...C.Kyå23àPP.ÉP¤´..R.S..... 0000E0
 0FF0E91F 16057307 541EFF36 DB330A8C 075806C5 01103688 29E30756 0E885858 XX..V.D).6..é.X..O3U6..T.s...Ôþ. 000100
 0760BF07 608E0068 E80760BF 07608E1F 1607541E FF360003 B80A8C07 5C06C536 6é.\..ÔE..6..T...ƒ'.e'.Ôh.ƒ'.e'. 000120
 648EEC8B 5503E800 49E80764 BF07608E 0052E80A 02BF0A02 8EEC8855 CB005FE8 Ò_.ùU.&ƒ..e..ÒR.ƒ'.ed.Ò1.Š.U.&ƒd 000140
 C7057500 067E8308 74C00804 82156A9A 0032E807 64BF0764 8E003BE8 0764BF07 .ēd.Ò;.ƒd.ed.Ò2..j....àt..-..u.ú 000160
 541EFF00 02B807E3 07560E88 0000FFFF 9A500646 8A500001 B8000DE8 00FF0646 F...Ò..¡..P.F.P.......V.D.E....T 000180
 06C69A50 00FCB8EC 8B5500C3 EEEB1DFF F2740245 0B058804 EF830E73 F73BC307 .ú;%s..ÿ....E.t·..ŠŸú.U.&¡=.P.6. 0001A0
 068F0580 068FCB50 E58805F0 06C69A50 00FFB805 7C1EFF04 7400057E 3E8305A3 È..>-..t...|.¡..P.6.Þ..[]ù...... 0001C0
 FE2440C7 8846FA75 AE46AEF2 0674053A 26FFFFB9 FF33F633 C0330110 068E0582 ......3à3-3.¿..&:.t.·ÛFÛu'F.ú@$± 0001E0

Dump of file SATURN:[PCCOMMON.DUMP.PBIN]BACHMAN.EXE;1 on 18-APR-1990 10:54:14.84
File ID (370,5,0)   End of file block 23 / Allocated 24

Virtual block number 5 (00000005), 512 (0200) bytes

 FE03F888 CF880573 168C0571 A3FD6FE9 00098806 730F55E8 C603E601 E601FE88 .±||Ï.6ÒU.s.¡..Ôo»Êq...s..ü.%.± 000000
 5FA7F300 0689051A BF575651 1075051A 063B2604 882BE349 0716F633 1F060888 .Å..3-..ID+..&;...u.OVWe..¿..µÏ_ 000020
 161F1602 4F89260F 89260E2 FA75C00A AAAC04C3 8302578C 263F8926 0A74595E ^Yt.&.?&.W..ú.¯¯.àu'ã[&..&.O...¯ 000040
 74964010 74C238AD 07708E06 5688C08E D88E026A B85756EC 88550005 802EFF07 ......U.&VW¡j..Å.à.V.ƒp.Ü;ôt.@.t 000060
 06969A06 76FF57EC 88550002 CA5DE588 5E5F96EB EBF788AE F2FFFF89 C033970C ..3à¿..·Û.%S$._^.[]ò..Ü.&W.v.... 000080
 9A501651 521E5300 028BC488 504901F7 AEF2FFFF B9C033FA 88921F74 C00B0604 ...àt...'3à¿..¯Û%IIP.áE..S.RQ.P. 0000A0
 FA4689E4 2A0B478A 26085EC4 565708EC 83EC8855 0002CA5D E5885F5B 0000FFFF ....(_.[]ò..U.&.&.WVá^.&.G.*ô.F' 0000C0
 0774830A 47F626F8 468906A6 05E0D1C1 03E0D1C8 8BF9F700 0CB99905 B620C38B .û-Ñ.¯¿..%'.àÏÁ.èÏÁ.[..F%&-G..t. 0000E0
 0E74010A 47F626C^ 5EC49001 39E9FFFF B8200A4F 8026085E C40F7440 0A47F626 &-G.@t.á^.&.O. ¡..Ô9..á^.&-G..t. 000100
 F0880447 8926C02 EF0A6780 26020A4F 802690E2 E8000004 47C72620 0A4F8026 &.O. &úG...Šã.&.O..&.g.ÿ+à&.G..Þ 000120
 A687F6E3 D10803E3 D1088BF9 F7000C89 99058620 C3885175 0C0A47F6 26FC7689 .v=&-G..uQ.û-Ñ..¿..%'.ÀÏD.ÀÏD-.Ï 000140
 0F75069C 0A7E8116 7505CE08 7E810E74 07AC0A7E 81077505 C2087E81 37750106 ..u7.-.ò.u..-.¯.t..-.ö.u..-...u. 000160
 F626085E C404C483 0E0AE808 76FF0A76 FF0C75C0 0802C483 08241864 9AFA76FF .v'.d.$..á..àu..v..v.Ò...á.á^.&- 000180
 88697401 06A687F6 E3D10803 E3D10888 F9F7000C B9990586 20C3881A 75080A47 G..u..û-Ñ..¿..%'.ÀÏD.ÀÏD-.Ï..ti. 0001A0
 48024588 F87E8802 57892607 89264008 57882606 47882606 77282637 8826085E ^.&.7&+w.&.G.&.W.@&..&.W..-%.E.H 0001C0
 5E881BEB FC468908 C4830844 169E9AFA 76FF0677 FF265256 167EF608 04478926 &.G..--.VR&.w..v'...D..á..F=Š..^ 0001E0

Dump of file SATURN:[PCCOMMON.DUMP.PBIN]BACHMAN.EXE;1 on 18-APR-1990 10:54:14.84
File ID (370,5,0)   End of file block 23 / Allocated 24

Virtual block number 6 (00000006), 512 (0200) bytes

 065FC426 085EC408 C4830869 16609A53 5050C02B 500002B8 11742005 4387F6FA '-.C. t.¡..P+àPPS.'.í..á.á^.&á_. 000000
 468908C4 83060016 9E9AFA76 FF501606 468D50C6 880001BE 19E80788 2606468A .F.&..Š.ƒ...óP.F..P.v'...Å..á.¯F 000020
 B8078615 469A000A B8EC8855 CB5DE588 5F5EE42A 06468AFE 8EE90374 FC7639FC =9v=t.Õƒ±.F.*ô^ .[]ùW.&¡...F.Ñ.¡ 000040
 890870A3 08568806 4688088C 1689088A A310568B 0E468808 9C1E8C08 9AA308A0 ..È.......F..V.Ē.......F..V.Èp.. 000060
 01089806 C70318E9 037425F6 7E800390 E9000008 9406C700 00089606 C7087216 .r.ú.....ú.....Õ...—%t.Õ..ú.... 000080
 06C70888 A3086EA3 0874A308 8EA30890 A30878A3 0892A308 76A3087A A3C02800 .+àÈz.Èv.È..Èx.È..È..Èt.Èn.È..ú. 0000A0
 3F80260A 5E88903E E800300A 0006C70A 46FF4975 30017F80 260A5EC4 00200A00 .. .á^.&...OuI.F.ú...O.$>..^.&.? 0000C0
 8E06FF1A 7500087A 3E830E75 203F8026 9028EB00 00088E06 C7087A06 FF0D752B +u...z.ú.....$(.&.? u..>z..u.... 0000E0
 078A260A 5E880A46 FF088806 FFC7752D 3F80260A 5EC40DEB 086E06FF 9014EB08 .Š....n.Š.á^.&.?-uú.....F..^.&.. 000100
 8908C483 08F2E80E 501E089E B80A76FF 0C76FFD0 75C00802 C48309AA E80E5098 .P.Ò¯..á..áuÏ.v..v.¡...P.Ò·..á.. 000120
 83007400 08883E83 089EA308 F7089EA1 088806FF 0C700008 9E3E830C 56890A46 F..V..>...)......À..%ÀÈ...>...t.. 000140
 0A76FF06 0A46FF08 9006FF2E 752E3F80 260A5EC4 00200A00 06C70675 300A003E >..Ou.ú... .á^.&.?.u......F...v. 000160
 FF000108 9806C70A 7D000898 3E830C56 890A4689 08C48308 A5E80E50 1E0898B8 ¡...P.ÒE..á..F..V..>...).ú...... 000180
 06C70675 006C302B 74006830 4074004E 303D7400 46309807 8A260A5E C408900E ...á^.&...=F.t==N.t@=h.t+=l.u.ú. 0001A0
 1C75003F 80260A5E C40A46FF 03754C3F 80260A5E C4097500 08783E83 0002087B x....>x..u.á^.&.7Lu..F.á^.&.?.u. 0001C0
 98078A26 C8EB0008 087806C7 D0EB0010 087806C7 D8EB0001 087806C7 90025CE9 Õ\..ú.x...ŠÀú.x...ŠÀú.x...Šà&... 0001E0
```

```
Dump of file SATURN:[PCCOMMON.DUMP.PBIN]BACHMAN.EXE;1 on 18-APR-1990 10:54:14.84
File ID (370,5,0)   End of file block 23 / Allocated 24

Virtual block number 7 (00000007), 512 (0200) bytes

 006930F8 468820FL 46830876 06FF0875 00583D05 7400473D 0A740045 30F84689 .F½=E.t.=G.t.=X.u...v..F½ .F½=i. 000000
 900167E9 014CE90> 7500253D 0160E903 7E0149E9 03750063 30019FE9 037E7874 tx~.Õ..=c.u.Õl.~.Õ'.=X.u.ÕL.Õg.. 000020
 088A1EC4 00EB0000 0247C726 07892608 94A11FC4 26088A1E C4157502 08783E83 .>x..u.á...&á.À..&..&úG...Š.á... 000040
 E9037400 08943E83 017EE903 75000896 3E830408 8A068307 89260894 A11FC426 &á.À..&........>...u.Õ~..>...t.Õ 000060
 0000086E 06C70892 06FF01BA E9FFFFB8 018DE903 75200A47 F6260870 1EC401CB ù.á.p.&-G. u.Õ§.¡..Õ¤.....ú.n... 000080
 089006FF 087606FF 087406FF 90F0EB00 088890C1 EB02C483 01ACE80E 50000AB8 ¡..P.Õ¯..á.Šè.¡..Šþ...t...v..... 0000A0
 39FA4689 0878A3C0 287E7401 08783E83 0085E903 75080878 3E830004 089806C7 ú......>x..u.Õ...>x..t~+åÈx..F*9 0000C0
 089E2E83 909013EB 0000089E 06C70A74 0008883E 83FA4689 089EA128 74089E06 ...t(À...F*.>...t.ú.....Š....... 0000E0
 003A8802 C483013A E80E5000 10880208 8A068308 9EA3C02B 027DC008 089EA105 .À...â).+âÈ.......¦..P.Ò:..á.¡:. 000100
 C008089E A300052D FA468815 74000888 3E832274 00FA7E83 02C48304 A1E80E50 P.ÒÀ..á..-*.t".>...t..F*-..È...â 000120
 02C48300 F7E80E50 00108804 088A2E83 0000089E 06C79007 EB089EA3 C028027D ).+âÈ..Š..ú..........¦..P.ÒK..á. 000140
 76FF90F3 E80001B8 FF30E902 77E80E50 C028FF35 E9001088 FF06E902 088A0683 .....Õ..¡..Õ5.+âP.Õw.ÕO.¡..Šµ..v 000160
 7C006530 FEFEE903 75006430 90FF15E9 0436E80E 50002588 FF20E903 55E80EF8 ½.ÕU.Õ .¡X.P.Õ6.Õ...=d.u.Õ±±=e.| 000180
 FC468940 0C5688OA 46880A4E FF0C5688 0A468809 74000878 3E83087E 00673005 .=g.~À.>x..t..F..V..N..F..V.ə.F= 0001A0
 7330FED6 E9037500 7030FE08 E9037500 6F30FE72 E9037500 6E3D903A EBFE5689 .V±Š:.=n.u.Õr±=o.u.ÕÀ±=p.u.Õø±=s 0001C0
 C4FC46FF 9034E80A 46FF9081 EBFF75E9 03750078 3DFEABE9 03750075 30887400 .t.=u.u.Õ ±=x.u.Õu.ŠŸ..F.Š4..F=á 0001E0

Dump of file SATURN:[PCCOMMON.DUMP.PBIN]BACHMAN.EXE;1 on 18-APR-1990 10:54:14.84
File ID (370,5,0)  `End of file block 23 / Allocated 24

Virtual block number 8 (00000008), 512 (0200) bytes

 045EE80E 0A76FF0C 76FF500A 462BC388 EC75253C 0474C00A F6468807 8A26FC5E ^=&...F~.át.<%uš.ú+F.P.v..v..Ò^. 000000
 C4FC53E9 0374C00A F6468807 8A260A5E C40C5689 0A4689FE 5688FC46 8806C483 .á..F=.V±.F..V.á^.&...F~.át.ÕS=á 000020
 08903E83 565712EC 83EC8855 CB50E588 0894A1FE 43E90374 200A47F6 2608701E .p.&-G. t.ÕC±À...Ì]ìW.š.š.WV.>.. 000040
 75100878 3E830774 0208783E 83089206 FF04740A 067E8300 200A0006 C7067400 .t.ú... ..~..t......>x..t..>x..u 000060
 74000892 3E83902C E804088A 0683FE56 89FC4689 02578826 07882608 8A1EC419 .á...&..&.W..F=.V±.....Š,..>...t 000080
 FE5689FC 46899907 8826088A 1EC40EEB 0000FE46 C7FC4689 07882608 8A1EC411 .á...&...F=úF±..Š.á...&....F=.V± 0000A0
 A109FEA3 C0289003 EB06468B 0674FE46 08FC4688 0E740008 6E3E8302 088A0683 ......>n..t..F=.F±t..F.Š..+âÈ±.À 0000C0
 C41D750A 067E8328 7D00FE7E 83317500 08923E83 F45689F2 4689089C 1688089A .......F·.V¶.>...u1.-±.)+.~..u.á 0000E0
 01F646C7 FE5689FC 46890AF7 00028308 F7FE5688 FC46882D 07C626F2 46FFF25E ^·.F·&6.-.F=.V±¼À.Ø.¼Õ.F=.V±úF~. 000100
 185A9AFC 76FFFE76 FF501E06 76FFFA5E 8CF84689 087C8800 00F646C7 9006EB00 .Š..úF~..¡|..F½.^*.v..P.v±.v=.Z. 000120
 C8280898 0E8804C4 83088018 429AF876 FFFA76FF 45740008 903E830A C4830085 ...á..>...tE.v*.v½.Ø....á.....+à 000140
 3005C626 05E8F27E C4F04E88 000009FE 06C70675 0809FE3E 830D7EC9 08F04E89 .Nþ.è~..>±..u.ú.±....Nþá~·Š.&6.0 000160
 8A26F85E C4F276C5 EE5E8C08 760E8BF0 4E89F446 8CF27E89 F47FC008 49C18847 G.él.á.¶.~·.F¶.Nþ..v..^Ÿév·á^½&. 000180
 5E8EF45E 8CF27689 E375003F 8026F846 FF46202C 80037C61 3C0774C9 08048807 ....èt.<a|.., F.F½&.?.uD.v·.^¶.^ 0001A0
 0E50C028 02E80001 88057500 F67E8308 74088E06 08087AA1 14750008 923E83EE Ÿ.>...u.Àz.....t..-~.u.¡..Š.+âP. 0001C0
 088AA100 01BE1874 00067E83 565710EC 83EC8855 CB5DE588 5F5E02C4 830311E8 Ò...á.^_.Ì]ìW.š.š.WV.~..t.ƒ..À.. 0001E0

Dump of file SATURN:[PCCOMMON.DUMP.PBIN]BACHMAN.EXE;1 on 18-APR-1990 10:54:14.84
File ID (370,5,0)   End of file block 23 / Allocated 24

Virtual block number 9 (00000009), 512 (0200) bytes

 07882608 8A1EC413 74080878 3E83008F E902088A 0683FA56 89F84689 088C1688 .....F½.V*.....Õ...>x..t.á...&.. 000000
 088A0683 FA5E8CF8 4689FC46 89078826 088A1EC4 10EBFA56 89F84689 02578826 &.W..F½.V*Š.á...&...F=.F½.^*.... 000020
 89058888 097500FC 7E63900A EB058488 1575FA46 08F84688 0E740808 783E8304 ..>x..t..F½.F*u.¡..Š...~=.u.¡... 000040
 900EEB08 980E881C 74089036 39F62BF4 5689F246 89FA5688 F84688FA 5.¯°F846 F½.^*.F½.V*.F·.V¶+-96..t.....Š.. 000060
 75003F80 26F246FF F25EC446 90EDEB10 7ECE3846 1574003F 8026F246 FFF.¯EC4 á^·.F·&.?.t.F;ö~.ŠÚ.Fá^·.F·&.?.u 000080
 80E80EF8 76FFFA76 FF5602C4 83015FE8 0E57087S 0008883E 83FE2808 9E3E±9F3 µ.>..+±.>...u.W.Ò_..á.V.v*.v½.Õ§ 0000A0
 06ECB3EC 885590CB 50E5885F 5E02C483 0142E80E 57087400 08883E83 06C48301 ..á..>...t.W.ÒB..Ā.^_.Ì]ù.U.š.&. 0000C0
 C02A9003 EB01B005 7547067E 83067467 067E83FE 5689FC46 89088C16 88088AA1 À.......F=.V±.~.gt..~.Gu.¯.Š..*â 0000E0
 9806C706 75000898 3E830074 00FA7E80 00060898 06C70675 0008903E 83FA4688 .F*.>...u.ú......-*.t..>...u.ú.. 000100
 0766068E FC76FFFE 76FF089A 36FF089C 36FF0676 FF089836 FF087636 FF000108 ....6v..6...v..6...6...v±.v=..f. 000120
 66068E08 9A36FF08 9C36FF14 7500086E 3E831874 00FA7E80 0EC48307 221EFF26 &..".á..-*.t..>n..u..6...6....f 000140
 8E089A36 FF089C36 FF147500 08983E83 18740008 6E3E8304 C4830726 1EFF2607 .&..&..á..>n..t..>...u..6...6... 000160
 FF187408 8E060808 7AA10000 09FE06C7 08088A06 8304C483 072E1EFF 26076606 .f.&.....á......ú.±...Àz.....t.. 000180
 33E80E50 C02B02EB 0001B805 74C00804 C4830732 1EFF2607 66068EFC 76FFFE76 v±.v=..f.&..2..á..át.¡..Š.+âP.Õ3 0001A0
 88260646 8A157804 4FFF2608 701EC430 75000896 3E8356EC 885590CB 50E58801 ..Ì]ù.U.šV.>...u=á.p.&.O.x..F.&. 0001C0
 06C48310 6906FC9A 0676FF53 087236FF 9011EBE4 2A048826 02478E26 07FF2637 7&..&.G.&..*ÕŠ...6r.S.v..=.i..á. 0001E0
```

```
Dump of file SATURN:[PCCOMMON.DUMP.PBIN]BACHMAN.EXE;1 on 18-APR-1990 10:54:14.84
File ID (370,5,0)   End of file block 23 / Allocated 24

Virtual block number 10 (0000000A), 512 (0200) bytes

 75000896 3E835657 02EC83EC 8B5590CB 5D5E0894 06FF9005 EB089606 FF077540 ău.....$......^]ù.U.&.&.WV.>...u 000000
 754006C4 83100506 FC9A0A00 36FF0870 36FF0872 36FF1BEB 507EF60B 06768857 W.v..--P$..6r..6p..6...•.{..á.ău 000020
 2607FF26 3F88260A 00A00478 044FFF26 08701EC4 1E7EC008 4EC68808 9606FF04 ......6N.á~.á.p.&.O.xå...&.?&..& 000040
 8855CB5D E5885F5E 08940601 06468807 75000896 3E8304EB E42A0588 2602478E .G.&..*ðŠå.>...u..F.....^_.[]ùU. 000060
 078A2606 5EC40870 36FF0872 36FF22EB 5E750008 963E830A 76885657 02EC83EC &.&.WV.v..>...u^$".6r..6p.á^.&.. 000080
 2608701E C42574CU 0B4EC688 0646FF08 9606FF04 754006C4 83114806 FC9A5098 .P.•.K..á.ău......F..6N.ât%á.p.& 0000A0
 CAEBE42A 05882602 478E2607 FF263F88 2608701E C4078A26 065EC4CD 78044FFF .O.xëá^.&..á.p.&.?&..&.G.&..*ðŠò 0000C0
 1688089A A1560CEC 83EC8855 CB5DE588 5F5E0894 06010A46 88077500 08963E83 .>...u..F.....^_.[]ùU.&.&.VÀ.... 0000E0
 04C4830D 7018429A F476FF52 089E3688 FA4689FC 4689C02B F65689F4 4689089C ...F¶.V-+á.F•.F¯.6..R.v¶.B.p..á. 000100
 08883E83 4E017508 09FE3E83 08EB02EE 83057510 09FE3E83 067628F0 28F84689 .F½Þ+v..>±..u..Ÿ.Š..>±..u.N.>.. 000120
 83FE67E8 0E509807 8A26F446 FF127530 0A003E83 19752D3F 8026F45E C4227500 .u"á^¶&.?-u..>..0u..F¶&...P.Òg±. 000140
 FA46FF07 7400067E 83187400 08883E83 077EF60B 0B74300A 003E83F8 4EFF02C4 á..N½.>..0t..--..>...t..-..t..F* 000160
 C483FE74 E80E5629 75000888 3E830072 E80EFC46 FF077400 09FE3E83 0068E80E .Òh..>±..t..F•.Òr..>...u)V.Òt±.á 000180
 E80E0475 00FC7E83 0A740009 FE3E8300 38E80E04 7500FA7E 830A7400 067E8302 ..-..t..-*.u..Ò;..>±..t..-•.u..Ò 0001A0
 5600200A 0006C70E 74000888 3E8306C4 83FEAFE8 0EF476FF F676FFF8 76FF0042 B..v½.v-.v¶.Ò£±.á..>...t.ú... .V 0001C0
 FDC6E80E 50002088 03E8002B 88057400 087A3E83 CB5DE588 5E02C483 FE2EE80E .Ò.±.á.^.[]ù.>z..t.¡+.Š.¡ .P.Òó» 0001E0

Dump of file SATURN:[PCCOMMON.DUMP.PBIN]BACHMAN.EXE;1 on 18-APR-1990 10:54:14.84
File ID (370,5,0)   End of file block 23 / Allocated 24

Virtual block number 11 (0000000B), 512 (0200) bytes

 00588805 74000876 3E831775 1009FE3E 8302C483 FD8AE80E 500030B8 CB02C483 .á.ù¡0.P.Ò∞».á..>±..u..>v..t.¡X. 000000
 80260A5E C40001FE 46C75657 06EC83EC 8855CB02 C483FD9C E80E5000 788803EB Š.¡x.P.Ò.».á.ùU.&.&.WVúF±..á^.&. 000020
 C708752D 3F80260A 5EC49061 E80A46FF 02088A06 83378826 088A1EC4 12752A3F ?*u.á...&.7......F.Ša.á^.&.?-u.ú 000040
 0A750890 36393C7F 393C407C 303CFA46 88078A26 0A5E88F6 280A46FF FFFFFE46 F±...F.+-.^.&...F*<0|ã<9.<96..u. 000060
 CE03E101 E1D1CE88 98058A26 1C7F3930 802606E8 F8880030 0A0006C7 0675303C <0u.ú...0..«Š.&.=9..&....öIÀIÀ.ö 000080
 065EC4F0 88EEF7FE 46880C46 8C0A7E89 DE7D3030 802647F1 8830E983 C803E101 1À.à.Ò0.þG&.=0)B.-..F..F±¼Ÿ.Þá^. 0000A0
 FE5E8CFC 46890592 885704EC 83EC8855 90CB5DE5 885F5E0C 56880A46 88378926 &.7.F..V.^_.[]ù.U.&.&.W¡...F•.^± 0000C0
 9009E8FE 468CFC7E 890001B8 F4750038 26117400 30802647 01E8FC7E C4064E8A .N.á-•Š.G&¯=.t.&8.u¶¡...-•.F±Š.. 0000E0
 4EF08801 101E8E01 0EA1059C 068F059A 068F90CB 5DE588 5F C028FE46 8CFC7E89 .-•.F±+á_.[]ù.........À.......ÞN 000100
 D2330598 36893696 0175FF04 F6960577 1E8C3605 75368936 F77500FF 7C800674 t..|..uKð.6u.6..W..-..u..6.6..30 000120
 74093CEC 74203CAC 4E477774 C00AF774 093CFB74 203CACFA 75C00A42 AC0001BF ¢..¨B.âu*¯< t«<.t¼.âtwGN¯< t&<.t 000140
 5C3CAC41 C9330EEB 4203745C 3C247422 3CE9EB02 C2830573 0151E868 74C00AEB Ò.âthÒQ.s..ó.ŠÒ<"t$<\t.BŠR3èA¯<\ 000160
 73011AE8 3174C00A AC4E01EB C47501A8 D113E901 C188CDEB D1030474 223CFA74 t*<"t..ÍŠe.èiÒ.Í¨.uáŠ.N¯.âtÍÒ..s 000180
 EBD10304 74223CFA 745C3CAC 41C933E6 EB420374 5C3CAE74 223CF1EB 07^28305 ..ò.Šþ<"tÜ<\t.BŠ|3èA¯<\t*<"t..ÍŠ 0001A0
 FE24C203 C78BE7D1 E7D147D7 0305683E 891F1688 E8CC7501 ABD113E9 D1C 9BD5 [.èiÒ.Í¨.uaŠ....>k..•GÍÓÍÒ.ú.òŠ± 0001C0
 8302578C 363F8936 0716F803 D888056F 1E8C0560 A3EF97E9 00088806 730? DE8 Ò).s.¡..Ò.yÈm...o..Á.½..6.?6.W.. 0001E0

Dump of file SATURN:[PCCOMMON.DUMP.PBIN]BACHMAN.EXE;1 on 18-APR-1990 10:54:14.84
File ID (370,5,0)   End of file block 23 / Allocated 24

Virtual block number 12 (0000000C), 512 (0200) bytes

 C00AF774 093CFB74 203CACAA C03303EB FA75C00A AAAC0110 1E8E0598 368804C3 û..6......¯¨.âu*Š.3â¨¯< t«<.t¼.â 000000
 0079E86A 74C00AD9 74093CDD 74203CAC 4E04C383 02578C36 3F893600 85E90375 u.Ò..6.?6.W..û.N¯< tÍ<.tÍ.âtjÒy. 000020
 AAF35CB0 0674223C FA745C3C AC41C933 E0EBAA03 745C3C27 74223CEB EBAB0373 s.¨ŠŠ<"t'<\t.¨ŠÀ3èA¯<\t*<"t.¯\µ¨ 000040
 74223CF3 EBAB0373 0041E832 74C00AAC 4EC1EBAA 22800673 AAF3E901 5CB0CDEB Šè¯\ÍÒµ¨s.¯"¨ŠèN¯.ât2ÒA.s.¨Šµ<"t 000060
 AAF3E901 5CB005EB AAF35CB0 0674223C FA745C3C AC41C933 EBEBAA03 745C3CAF £<\t.¨ŠÒ3èA¯<\t*<"t.¯\µ¨ŠÍ¯\ÍÒµ¨ 000080
 000BE850 EC885505 9A2EFF00 000247C7 000007C7 1F16AAC0 33C9EBAA 22808E73 s.¯"¨Šè3â¨..ú...úG.......U.ŠPÒ.. 0000A0
 0AB81875 00059E3E 80088E07 9EB8501E 5652EC88 55C35DE5 88F94624 8A047358 Xs..ŠF*.[]ùU.ŠRV.P¡...Ä.>...u.¡. 0000C0
 0974C085 ADFC059F BE5A0105 9E06C600 00FFFF9A 50059F88 1E5005A8 881E5000 .P.¡¨.P.¡..P.....ó....Z/..•Ù.ât. 0000E0
 1E380872 D8280C88 5A59EE6C E90002B8 C35DE588 5A5E1FF9 F377D43A F772003A :Ár¼:åwµ*.^Z.[]ù¡..ÒlŸYZ.É+Är.;. 000100
 004289F6 335605B0 2EFFEE4C E9C03305 754005B0 A15152CB 5152E388 05720584 Ç.r..DRQùRQÀ¯.ău.3äÒLŸ..¯.V3-¿B. 000120
 CB5E0001 88158006 C69A5000 0188102B 05E69A11 7455F480 FBE2E032 ACFCE432 2ð=¨2Àã«.¶Ut..Í.+.¡..P.ó...¡..^ù 000140
 C0850000 FFFF9A1E 5150410F C98049C8 88197201 121E3826 72D80301 181E885A Z.....Är&;...r..ùl.è.APQ.......á 000160
 FFC388E3 88027205 B41E3808 720828DC 880EEBF8 01181E87 01120E89 490C7558 Xu.[........½Š..É+Är.;.Ç.r..D.û. 000180
 E001C103 E001C888 F9F7000C 899905B6 2D044688 073C06FF 04EC83EC 8B5500E2 â.U.Š.Š...<..F.-Ñ..¿..¼*.àIÀ.èIÀ 0001A0
 08578926 06478926 045EC402 C4831589 19499A50 020088FE 5E8CFC46 8906A605 .Í..F•.^±¡..P.Í....á.á^.&.G.&.W. 0001C0
 88FC4688 040A4F80 26045EC4 20EB0200 0247C726 FC5EC408 0A4F8026 1074D008 .Àt.&.O..á^=&úG...Š á^.&.O...F=. 0001E0
```

```
Dump of file SATURN:[PCCOMMON.DUMP.PBIN]BACHMAN.EXE;1 on 18-APR-1990 10:54:14.84
File ID (370,5,0)   End of file block 23 / Allocated 24

Virtual block number 13 (0000000D), 512 (0200) bytes

 26085788 260647P8 26045EC4 00010247 C726FC5E C4085789 26064789 2640FE56 V±∂&.G.&.W.&^=&úG...&^.&.G.&.W.& 000000
 3300098A 08720541 1E38065E 88EC8855 C350E588 00000447 C7260257 89260789 ..&.W.&úG....|)úU.&.^.;.A.r.¤..3 000020
 855A5900 00FFFF9A 51160C76 FF0876FF 0A76FF53 CC8804EC 83026CE9 0260E9C0 åÒ'.Òl..&..äS.v..v..v..Q.....YZ. 000040
 00098A08 7205411E 380u5E88 0CEC83EC 885500C8 50E588F0 0543A780 91E175C0 ÅuÅ..ÏC.».|)û.U.&.&..^.;.A.r.¤.. 000060
 87F60000 16899A50 16F4468D 51414151 51C93353 12742005 4387F602 1FΓ^C033 3àÒ..-.C. t.S3èQQAAQ.F¶.P.....-. 000080
 F86689F2 8BFA8856 57FCFC46 89FE4689 C0330856 C50A468E FA5E8C7D 7480 543 C...t).^'.F.éV.3à.F±.F==WV.'.·.f% 0000A0
 8ADC8802 EC831F4E 7600A830 16001920 9AFA5E8E 1E5275AE F20A8060 E30C4ⱡ88 .N.0'¯.·ÛuR..^'. ...=´.vN..&..É¤ 0000C0
 E2AA1A74 FB380D74 0A3CAC0C 4E880716 FA88D488 E2280080 8A037302 28300200 ..=(.±.¤..+ã.&.'...N.¯<.t.;«t.¨ã 0000E0
 8E5F5EE1 E80014E8 E2E8FC46 FF0A80AA 001FE803 75F83800 80009AE9 002BE8F4 ¶Ò+.Ò..¯.;«u.Ò..¯¯..F•ŠãÒ..ŠÃ^_. 000100
 1E53065E 881FE3CA 28CF881F 061E5153 50170215 469AFFFC 887AE800 93E9FA5E ^'Ô..Šz¦=..F...PSQ....ü+òO..^.Š. 000120
 FA885858 591F0774 0808FE5E 01F45E88 1175C008 000006F0 9A5016F4 46805152 RQ.F¶.P.Þ....åu..^¶.^±.Ût..Y[X.' 000140
 EBF90020 8A03E800 1C8A0875 00098A00 01300074 00603D18 74C00808 C4831FC3 û..&..åt.=m.t.=..¤..u.¤..$.¤ .'$ 000160
 EBF9C033 001C8A0E E8F80375 1A3F8008 5E880A5E 8E0E7440 054387F6 FE5E8E26 &.^±-.C.∂t..^..^..?.u.½$.¤..3à'$ 000180
 880475C9 080C4E88 00ECE9C8 50E58804 72FA5E8E 5F5EF866 88FC4628 FE468806 ..F±+F=.f%^_.^'r..|)úÒš..N..èu.. 0001A0
 74006030 1774C008 1F071E00 0017789A 5016F446 8051521E 530856C5 1EEEE8C1 èŠY.éV.S.RQ¯F¶.P.x.......åt.=m.t 0001C0
 74400543 87F68775 C008F446 88C2E800 208AC7E8 001C8ACC 7500098A 00013000 .=..¤..uà¤..Šú¤ .Šò.F¶.àuñ-.C.∂t 0001E0

Dump of file SATURN:[PCCOMMON.DUMP.PBIN]BACHMAN.EXE;1 on 18-APR-1990 10:54:14.84
File ID (370,5,0)   End of file block 23 / Allocated 24

Virtual block number 14 (0000000E), 512 (0200) bytes

 F2FFFF89 C033067E C4D788EC 8855A3E8 C033001C 8AA6E802 751A3F80 260A880A ..Ö&.7.u.$|¤..3àŠÈU.&.=á-.3à¿..· 000000
 117D0541 1E38065E 88EC8855 01A0E900 835756EC 885500C8 50FA8891 4901F7AE ÛK||..')ù.U.&VW'.Ô..U.&.^.;.A.). 000020
 18040203 02021601 00C850E5 88C03302 E80001B8 05744005 4387F60C 7C00F883 .«.|.-.C.∂t.¡..Š.3à.|)ù.......... 000040
 02430041 02350212 12110D10 120F1600 160C0808 070A0C09 0C080C07 09060005 ..........................5.A.C. 000060
 080702CE 08A40084 09820A81 0A801606 09721C70 2060006C 08590057 00530052 R.S.W.Y.l.m p.r.............É.ö.=. 000080
 3FA3C85D E58899FF FFB80008 E8C850E5 8899FFFF 88053816 89053FA3 16080000 ....È?...8.¡.....|)úÒ..¡.....|)úÈ? 0000A0
 728C3C43 0A76243C 0472133C F7E24343 1674073A 2E1875E4 0A0024B9 18888805 .E..¿$..Ôu..:.t.CCà%<.r.<$v.C<¥r 0000C0
 C8515208 F7C42807 73C43805 84A15A59 00C30538 A3980147 8A2E4301 76CA3C04 .<òv.C..G..ÈB.ü.YZÀÇ.;ás.+á%ÄRQù 0000E0
 5602EC83 EC8855C8 50E58801 FE4F8026 0574C308 C08C065E C4EC8855 F9E8C033 3àŠ'U.&á^..Å.ût.&.O±..|)úU.&.&.V 000100
 0018E815 750082E8 0748A312 740025E8 08750007 483E831E 73FFF130 06468857 W.F.=þ.s..>H..u.Ò%.t.ÈH.Ò..u.Ò.. 000120
 0776065E 3900F088 CB50E588 5E5F02C4 831750 1A 8E9A0676 FF087500 78E80574 t.Òx.u..v..ƒ.)..á._^.|)ùÈÞ.9^.v. 000140
 FA8308C4 831970 1C 689A5002 80510E4F 8050501E C033FE5E 89FEE383 43065E88 .^.C.D±.^±3à.PP.O.Q¯.P.h.)..á..' 000160
 480008A3 C033088E FE5E8800 08A30A8E 0574D208 074CA307 4A1687C2 883874FF .t8.ô..J.ÈL..0t..ÒÈ...^±.Ã3âÈ..H 000180
 8ED88CC3 1F088C00 06A30000 05000AA3 01478000 02A30000 A3000A88 0C478948 N.G.¡...È..È...G.È.....È...Ä.ü.Ä. 0001A0
 7EC51E08 56880646 880E4E88 C3098EC1 8CD20801 0AE8074C 1E8ED833 064E88C0 ã.N.3Ü..L.Ò...0.ê.|ù.N..F..V..é~ 0001C0
 92F788DA F7000283 08F7AA20 800A79D2 080E750A F9831374 C00A93FC 071E570A .W..=..ât..'.u..0y.¯-`%Ü.0.%Ö.%. 0001E0

Dump of file SATURN:[PCCOMMON.DUMP.PBIN]BACHMAN.EXE;1 on 18-APR-1990 10:54:14.84
File ID (370,5,0)   End of file block 23 / Allocated 24

Virtual block number 15 (0000000F), 512 (0200) bytes

 4F0588E2 75C308C2 88AA2704 0276393C 30040387 92F1F793 F1F70274 C0080233 30.ât.%þ.%þ..Æ.0<9v..'`.ô.ûuã..O 000000
 885606EC 83EC8855 00C850E5 885E5F1F 580A8CF2 72C73801 4480FF44 880586AC ¯...D..D.;úr·.ÖX._^.|)ù.U.$.$.V¡ 000020
 04C48319 A91D1E9A 53060E74 830A47F6 26FA5EC4 1CE8F628 FC5E8CFA 46890586 Ñ..F'.^=+-Š.á^'&-Ğ..t..S...¨..á. 000040
 88EC8855 90C850E5 885EC688 0876FA46 39072016 88071EA1 0CFA4683 46017440 ∂t.F.F'.À..... .9F'vÀ.ó^.|)ù.U.&. 000060
 00058807 1E297500 3F83073E 885756EC 8855C850 E58801FE 4F800474 0808065E ^..Ût..O±..|)úU.&VWÈ>..?.u)..¡.. 000080
 FFFEFE44 C704C683 000104C7 960740A3 073EA3FE 244024E8 99C03305 750173E8 Òs.u.3à.$$∂$±È>.È∂..ú....ó.úD±±. 0000A0
 EEF983FE E180FA74 4100CEE9 C850E588 5E5F0009 E8C08ED8 8C064E88 07443689 .6O..N..Ä.àÒ.._^.|)úÒö.At'.Ä±.'Y 0000C0
 000205C2 03347401 A8ADF003 00881573 C1384842 7401A8FE 88ADFC02 778BF273 s·.w.=Ù.±`.tBH;ès..Å.ÞÙ´.t4.ô... 0000E0
 DA8CC688 FE4CFEF9 0305E805 8948C128 FE4C89F9 030C74FE 88E6E8FE 4489F788 .%.D±Š|.±t..'.L±+èH..Š..'±L±.ó.Ò 000100
 A8ADF003 FE882574 FFFE3D02 075006C6 26C3027F 89074C1E 8C260574 D1380 18C .|;|t.&..L....Û&ó.P..=±.tX.±.ÞÙ´ 000120
 88E6E8FE 4489F788 000205C2 03E27401 A8ADF003 D0888D73 C13848FE 88F27401 .t·.±H;ês§.Å.ÞÙ´.tã.ô....%.D±Š|. 000140
 37880748 1E8E2605 74C738D7 8CD88C11 7407500E FE2614E8 D88E0474 C0080847 G..ât..ÄŠ.&±.P.t..Ä.=;út.&..H..7 000160
 0574001C E8FE40FE 0074005E E8984040 01240D74 C638006A E8C03306 77888CE8 Š¥.w.3àÒj.;ót.$.∂∂.Ò^.t.±M±Ò..t. 000180
 01A8FE45 8851C399 C0330247 89078807 4CA32604 74C138D1 8CD88C99 EB4E4E96 .NNŠ..Ä.|;èt.&ÈL....G.3à.ûQ.E±¨. 0001A0
 F70072C2 031572C^ 03C188F5 75EAD104 76074E16 38267FFF 8A414149 C8280374 t.+à|AA¤..&;.N.v.|õuX.ê.ór..ór.% 0001C0
 F088FE88 571874C  1DE85152 C359C033 E575EAD1 D2F70875 000CE8C6 28C223D2 0#ô+6O..u.%0|õu|3âYúRQÒ..t.W.±.Þ 0001E0
```

```
Dump of file SATURN:[PCCOMMON.DUMP.PBIN]BACHMAN.EXE;1 on 18-APR-1990 10:54:14.84
File ID (370,5,0)   End of file block 23 / Allocated 24

Virtual block number 16 (00000010), 512 (0200) bytes

 01885052 521E0233 5053C35A 5958FE55 894AD728 D6880677 89FFFEFE 44C7F203 .·ÙD±±..w..ø+øJ.U±XYZûSP3Ø.RRP¡. 000000
 7E830657 56EC8855 00C3D208 0274585A 1FFFFA83 08C4831A 881C689A 1F065000 .P...h....á..ª..Z[t..ØÙ.U.$VW..~ 000020
 F7381174 48051836 884CE827 720057E8 07754806 46880856 8801188F 3875000A ..uØ«...V..F.Hu.ÒW.r'ŠL.6..Ht.;% 000040
 99FFFF88 0675C208 04730518 FE8104C6 8334735E 003EE856 0E468902 44880074 t..D..F.Vò>.^s4.ó..±..s..Øu.¡... 000060
 88051836 89025C89 1489E675 C085F958 0000FFFF 9A50C033 501652C4 885021E8 ŠIP.ÁR.P3äP.....[ª.ûu]...\..ó... 000080
 2CEBF9F2 750518FE 8104C683 0C74024C 39F7880E 4E88C850 E5885E5F 07C03303 Æ3á._^.[]ù.N..%9L.t..ó..±..u·ª$, 0000A0
 3BDE75C0 85000015 AA9A5153 13730112 1E390675 F738C18E D3882672 1C03DA88 .Ö..F̄&.Æ.è;%u.9...s.SQ.¯....àu8; 0000C0
 03240A47 8A26065E C4F62856 04EC83EC 885500C3 D1880487 92011216 890475F7 %u.........lû.U.š.š.V+-á^.&.G.$. 0000E0
 87F6E301 D803E301 D888F9F7 000C8999 05862DC3 881A7508 0A47F626 5A75023C <.uZ&-G..u..û·Ñ..¿..%ª.ÄID.ÄID-. 000100
 260677FF 260877FF 2650287E C008FC46 8906472B 26078826 065E8839 740106A6 Î..t9.^.&..&+G..F=.à-(P&.w.&.w.& 000120
 5EC4FFFF BE200A4F 8026065E C40874FC 463808C4 831C5716 9E9A50E4 2A08478A .G.ªôP...W..á.;F=t.á^.&.O. ƒ..á^ 000140
 001E90CB 50E5885E C6880000 0447C726 02578926 07892608 57882606 47882606 .&.G.&.W.&..&.W.&ûG....ó^.[]ù... 000160
 00F70002 022A0103 00F60002 00FF0103 00000001 1D790002 00F30002 01280103 ..+...µ...y..........-...ª...%. 000180
 006E0005 03250203 00050001 05C00103 00000003 15030002 00000002 02740002 ..t...............à.......%...n. 0001A0
 00220001 1C8C0103 00180001 027D0103 00170001 024F0103 00880002 029E0103 ..........O.......}.......¥...". 0001C0
 00310001 03730103 00860006 01A00203 00260001 1D070103 00140003 007D0203 ..}...........&...........s...1. 0001E0

Dump of file SATURN:[PCCOMMON.DUMP.PBIN]BACHMAN.EXE;1 on 18-APR-1990 10:54:14.84
File ID (370,5,0)   End of file block 23 / Allocated 24

Virtual block number 17 (00000011), 512 (0200) bytes

 003A0002 01130103 00040008 151D0103 003A0001 16CA0103 00230003 00CA0203 ..ð...#...ð...:...............:. 000000
 009A0007 18010203 00410002 01F90103 00340003 00040203 003B0002 021F0103 ......;...Å...4...ª...A......... 000020
 00590001 052C0103 00490003 000C0203 00400001 04FE0103 00440002 02110103 ......D...±...M...É...l...,...Y. 000040
 542D6E75 52205340 00000000 00000000 005F0004 00130203 005C0001 03630103 ..c...\..................MS Run-T 000060
 38383931 20296328 20746867 69727970 6F432020 20797261 7262694C 20656069 ime Library - Čopyright (c) 1988 000080
 20676E69 67676F6C 20726F72 72450011 70726F43 2074666F 736F7263 694D202C , Microsoft Corp..Error logging  0000A0
 68736564 20676E69 74726174 7320726F 72724500 726F7272 45006425 203A6E69 in: %d.Error.Error starting desk 0000C0
 73656D20 676E6974 61657263 20726F72 72450072 6F727245 00642520 3A706F74 top: %d.Error.Error creating mes 0000E0
 48434142 5C404553 5C00726F 72724500 78343025 203A6575 65757120 65676173 sage queue: %04x.Error.\SEM\BACH 000100
 20736920 4E414048 43414200 726F7272 45005055 2E4E4140 48434142 5C4E414D MAN\BACHMAN.UP.Error.BACHMAN is  000120
 6F742065 6C62616E 5500726F 72724500 21676E69 6E6E7572 20796461 65726C61 already running!.Error.Unable to 000140
 00000000 2179726F 74636572 69642074 6F6F7220 4E414048 43414220 74657320  set BACHMAN root directory!.... 000160
 00000000 00000000 00000000 00000000 00000000 FFFF0000 05880000 00000000 ................................ 000180
 00000000 00000000 00000000 00000000 00000000 00000000 00000000 00000000 ................................ 0001A0
 00000000 00000000 00000000 00000000 00000000 00000000 00000000 00000000 ................................ 0001C0
 00000000 00000000 00000000 00000000 00000000 00000000 00000000 00000000 ................................ 0001E0

Dump of file SATURN:[PCCOMMON.DUMP.PBIN]BACHMAN.EXE;1 on 18-APR-1990 10:54:14.84
File ID (370,5,0)   End of file block 23 / Allocated 24

Virtual block number 18 (00000012), 512 (0200) bytes

 00000000 00000000 00000000 00000000 00000000 00000000 00000000 00000000 ................................ 000000
 00000000 00000000 00000000 00000000 00000000 00000000 00000000 00000000 ................................ 000020
 00000000 00000000 00000000 00000000 00000000 00000000 00000000 00000000 ................................ 000040
 00000000 00000000 00000000 00000000 00000000 00000000 00000000 00000000 ................................ 000060
 00000000 00000000 00000000 00000000 00000000 00000000 00000000 00000000 ................................ 000080
 00000000 00000000 00000000 00000000 00000000 00000000 00000000 00000000 ................................ 0000A0
 00000000 00000000 00000000 00000000 00000000 00000000 00000000 00000000 ................................ 0000C0
 00000000 00000000 00000000 00000000 00000000 00000000 00000000 00000000 ................................ 0000E0
 00000000 00000000 00000000 00000000 00000000 00000000 00000000 00000000 ................................ 000100
 00000000 00000000 00000000 00000000 00000000 00000000 00000000 00000000 ................................ 000120
 00000000 00000000 00000000 00000000 00000000 00000000 00000000 00000000 ................................ 000140
 00000000 00000000 00000000 00000000 00000000 00000000 00000000 00000000 ................................ 000160
 00000000 00000000 00000000 00000000 00000000 00000000 00000000 00000000 ................................ 000180
 00000000 00000000 00000000 00000000 00000000 00000000 00000000 00000000 ................................ 0001A0
 00000000 00000000 00000000 00000000 00000000 00000000 00000000 00000000 ................................ 0001C0
 00000000 00000000 00000000 00000000 00000000 00000000 00000000 00000000 ................................ 0001E0
```

```
Dump of file SATURN:[PCCOMMON.DUMP.PBIN]BACHMAN.EXE;1 on 18-APR-1990 10:54:14.84
File ID (370,5,0)   End of file block 23 / Allocated 24

Virtual block number 19 (00000013), 512 (0200) bytes

 00000000 0000000; 00000000 00000000 00000000 00000000 00000000 00000000 ................................ 000000
 00000000 00000000 00000000 00000000 00000000 00000000 00000000 00000000 ................................ 000020
 00000000 00000000 00000000 00000000 00000000 00000000 00000000 00000000 ................................ 000040
 00000000 00000000 00000000 00000000 00000000 00000000 00000000 00000000 ................................ 000060
 00000000 00000000 00000000 00000000 00000000 00000000 00000000 00000000 ................................ 000080
 00000000 00000000 00000000 00000000 00000000 00000000 00000000 00000000 ................................ 0000A0
 00000000 00000000 00000000 00000000 00000000 00000000 00000000 00000000 ................................ 0000C0
 00000000 00000000 00000000 00000000 00000000 00000000 00000000 00000000 ................................ 0000E0
 00000000 00000000 00000000 00000000 00000000 00000000 00000000 00000000 ................................ 000100
 00000000 00000000 00000000 00000000 00000000 00000000 00000000 00000000 ................................ 000120
 00000000 00000000 00000000 00000000 00000000 00000000 00000000 00000000 ................................ 000140
 00000000 00000000 00000000 00000000 00000000 00000000 00000000 00000000 ................................ 000160
 00000000 0001FFFF 00304F46 4E495F45 4C49465F 435F0118 00000000 00000000 .........._C_FILE_INFO=......... 000180
 00000000 00000000 00008181 81001400 00000000 00000000 00000000 00000000 ................................ 0001A0
 00000000 000A0A0A 0A0A0A0A 0A0A0A0A 0A0A0A0A 0A0A0A0A 0A000000 00000000 ................................ 0001C0
 6C6C756E 2800296C 5C756E28 00000000 00000000 00000000 00000000 00000000 ....................(null).(null 0001E0

Dump of file SATURN:[PCCOMMON.DUMP.PBIN]BACHMAN.EXE;1 on 18-APR-1990 10:54:14.84
File ID (370,5,0)   End of file block 23 / Allocated 24

Virtual block number 20 (00000014), 512 (0200) bytes

 00000000 00000000 00000000 00000000 00000000 00000000 00002320 20280029 ).+- #.......................... 000000
 00000102 00000000 00000000 00000001 07640002 0000058E 00020C10 FFFFFFFF ......../.....d................. 000020
 00000000 00000000 00000000 00000000 00000000 00000202 00000000 00000000 ................................ 000040
 00000000 00000000 00000000 00000000 00000000 00000000 00000000 00000000 ................................ 000060
 00000000 00000000 00000000 00000000 00000000 00000000 00000000 00000000 ................................ 000080
 00000000 00000000 00000000 00000000 00000000 00000000 00000000 00000000 ................................ 0000A0
 00000000 00000000 00000000 00000000 00000000 00000000 00000000 00000000 ................................ 0000C0
 00000000 00000000 00000000 00000000 00000000 00000000 00000000 00000000 ................................ 0000E0
 00000000 00000200 00010000 00000000 00000000 00000000 00000000 00000000 ................................ 000100
 00000000 00000000 00000000 00000000 00000000 00000000 00000000 00000000 ................................ 000120
 00000000 00000000 u0000000 00000000 00000000 00000000 00000000 00000000 ................................ 000140
 00000000 00000000 00000000 00000000 00000000 00000000 00000000 00000000 ................................ 000160
 15400728 15400724 1540FFFF 15400766 069A0000 00000000 00000000 00000000 ................f.a...a.$.a.(.a. 000180
 20000000 00000000 00000000 00000000 01010000 00000730 1540072C ,.a.0..........................  0001A0
 3E3E4753 4D4E3C3C 011AFFFF 07341A68 00000000 00000000 00000000 00000000 ................h.4.....<<NMSG>> 0001C0
 36520003 000A0077 6F6C6672 65766F20 68636174 7320200A 00303030 36520000 ..R6000..- stack overflow.....R6 0001E0

Dump of file SATURN:[PCCOMMON.DUMP.PBIN]BACHMAN.EXE;1 on 18-APR-1990 10:54:14.84
File ID (370,5,0)   End of file block 23 / Allocated 24

Virtual block number 21 (00000015), 512 (0200) bytes

 52000800 0A003020 79622065 64697669 64207265 6765746E 6920200A 00333030 003..- integer divide by 0.....R 000000
 67726120 726F6620 65636170 73206867 756F6E65 20746F6E 20200A0D 38303036 6008..- not enough space for arg 000020
 73206867 756F6E65 20746F6E 20200A0D 39303036 52000900 0A0D7374 6E656075 uments.....R6009..- not enough s 000040
 757200FF 000A0D00 FC000A0D 746E656D 6E6F7269 766E6520 726F6620 65636170 pace for environment...■......ru 000060
 6E697461 6F6C6620 200A0032 30303652 00020020 726F7272 6520656D 6974206E n-time error ...R6002..- floatin 000080
 20200A00 31303036 52000100 0A0D6465 64616F6C 20746F6E 20746E69 6F702067 g point not loaded.....R6001..-  0000A0
 020003FF FFFF000A 0D746E65 6D6E6769 73736120 7265746E 696F7020 6C6C756E null pointer assignment......... 0000C0
 00000000 00000000 00000000 03072000 02000000 0205B800 02000000 01076200 .b......¡....... ............... 0000E0
 FFFFFF00 00000001 00010040 00200000 000C0000 00200010 00100000 01204349 IC ....... ....... .a........... 000100
 FCFFFF3F FCFFFF3F FCFFFF3F FCFFFF3F FCFFFF3F F8FFFF1F 00000000 00000000 ...........½?..■?..■?..■?..■?..■ 000120
 7CD5AB3E 7C8A513E 7C25A43E 7C724E3E 7CFC3F3E 7CFFFF3E FCFFFF3F FCFFFF3F ?..■?..■>..|>?■|>Nr|>ÊX|>Q.|>¨¦| 000140
 FCFFFF3F FCFFFF3F FCFFFF3F 7CFFFF3E 7CFC3F3E 7C724E3E 7C25A43E 7C8A513E >Q.|>ÊX|>Nr|>?■|>..|?..■?..■?..■ 000160
 00000000 00000000 F8FFFF1F FCFFFF3F FCFFFF3F FCFFFF3F FCFFFF3F FCFFFF3F ?..■?..■?..■?..■?..■...½........ 000180
 00000000 00000000 00000000 00000000 00000000 00000000 00000000 00000000 ................................ 0001A0
 00C00300 00800100 00000000 00000000 00000000 00000000 00000000 00000000 ..............................â. 0001C0
 00000000 00000000 00000000 00000000 00000000 00000000 00000000 00800100 ................................ 0001E0
```

```
Dump of file SATURN:[PCCOMMON.DUMP.PBIN]BACHMAN.EXE;1 on 18-APR-1990 10:54:14.84
File ID (370,5,0)   End of file block 23 / Allocated 24

Virtual block number 22 (00000016), 512 (0200) bytes

00000000 00000000 00000000 00000000 00000000 00000000 00000000 00000000 ................................ 000000
FFE7FFFF FFFFCFFF FFE7FF0F C0FFCFFF FFE7FF07 80FFCFFF FFE7FFE3 1FFFCFFF .ü..D.Ó..ü....Ó..ü.å..Ó..ü....Ó. 000020
FF3FFF7F FCFFF9FF FF9FFFFF FEFFF3FF FFCFFFFF FFFFE7FF FFE7FFFF FFFFCFFF .ü....Ó..Ó....ü..µ.±.....'.•..?. 000040
FFFFF37F FC9FFFFF FFFFF93F F83FFFFF FFFFFC1F F07FFEFF FF7FFE3F F8FFFCFF .•.½?±...±.Þ.•....?½?'.....•.µ.. 000060
FF83FF7F FCFFFFFF FFFF1F00 00F0FFFF FFFF0F00 00E0FFFF FFFFE77F FCCFFFFF ..ü•.Ó....Å.......Þ........•.... 000080
7FFEF93F F93F9FF? 7FFEFC7F FC7FC0FF FF7CFE7F FCFFE0FF FF01FF7F FCFFFFFF ...•.....Å.•.±|..å.•.•±...?'?'±. 0000A0
FFFC1FF0 1FF09FFF 7FFECFE7 CFE73FFF 7FFEE7CF E7CF3FFF 7FFEF39F F39F3FFF .?.µ.µ±..?üÓüÓ±..?ÓüÓü±...Þ.Þ.•. 0000C0
FFFFFFFF FFFFFFFF FFFFFFFF FFFFFFFF FFFFFFFF FFFFEFFF FFF93FF8 3FF8CFFF .ü½?½?'..ÿ...................... 0000E0
FFFFFFFF FFFFFFFF FFFFFFFF FFFFFFFF FFFFFFFF FFFFFFFF FFFFFFFF FFFFFFFF ................................ 000100
00000000 00000000 00000000 00000000 00000000 00000000 00000000 00000000 ................................ 000120
00000000 00000000 00000000 00000000 00000000 00000000 00000000 00000000 ................................ 000140
00000000 00000000 00000000 00000000 00000000 00000000 00000000 00000000 ................................ 000160
00000000 00000000 00000000 00000000 00000000 00000000 00000000 00000000 ................................ 000180
00000000 00000000 00000000 00000000 00000000 00000000 00000000 00000000 ................................ 0001A0
00000000 00000000 00000000 00000000 00000000 00000000 00000000 00000000 ................................ 0001C0
00000000 00000000 00000000 00000000 00000000 00000000 00000000 00000000 ................................ 0001E0

Dump of file SATURN:[PCCOMMON.DUMP.PBIN]BACHMAN.EXE;1 on 18-APR-1990 10:54:14.84
File ID (370,5,0)   End of file block 23 / Allocated 24

Virtual block number 23 (00000017), 512 (0200) bytes

00000000 00000000 00000000 00000000 00000000 00000000 00000000 00000000 ................................ 000000
00000000 00000000 00000000 00000000 00000000 00000000 00000000 00000000 ................................ 000020
00000000 00000000 00000000 00000000 00000000 00000000 00000000 00000000 ................................ 000040
00000000 00000000 00000000 00000000 00000000 00000000 00000000 00000000 ................................ 000060
00000000 00000000 00000000 00000000 00000000 00000000 00000000 00000000 ................................ 000080
00000000 00000000 00000000 00000000 00000000 00000000 00000000 00000000 ................................ 0000A0
00000000 00000000 00000000 00000000 00000000 00000000 00000000 00000000 ................................ 0000C0
00000000 00000000 00000000 00000000 00000000 00000000 00000000 00000000 ................................ 0000E0
00000000 00000000 00000000 00000000 00000000 00000000 00000000 00000000 ................................ 000100
00000000 00000000 00000000 00000000 00000000 00000000 00000000 00000000 ................................ 000120
00000000 00000000 00000000 00000000 00000000 00000000 00000000 00000000 ................................ 000140
00000000 00000000 00000000 00000000 00000000 00000000 00000000 00000000 ................................ 000160
00000000 00000000 00000000 00000000 00000000 00000000 00000000 00000000 ................................ 000180
00000000 00000000 00000000 00000000 00000000 00000000 00000000 00000000 ................................ 0001A0
00000000 00000000 00000000 00000000 00000000 00000000 00000000 00000000 ................................ 0001C0
00000000 00000000 00000000 00000000 00000000 00000000 00000000 00000000 ................................ 0001E0
```

```
Dump of file SATURN:[PCCOMMON.DUMP.PBIN]BACHCOPY.EXE;1 on 18-APR-1990 10:54:10.01
File ID (357,3,0)   End of file block 29 / Allocated 32

Virtual block number 1 (00000001), 512 (0200) bytes

 00000000 00000040 00000000 00000088 0000FFFF 00000004 0000001D 00305A4D MZ*.............|.......a....... 000000
 00000080 00000000 00000000 00000000 00000000 00000000 00000000 00000000 ................................ 000020
 6F6E6E61 63206061 72676F72 70207369 685421CD 4C01B821 CD09B400 0EBA1F0E ..o..Ç.el|.LëIThis program canno 000040
 00000000 00000024 0A0D0D2E 65646F60 20534F44 206E6920 6E757220 65622074 t be run in DOS mode....$....... 000060
 00020003 00030000 0001017A 0A000000 0003020A 3172B07E 00020076 0505454E NE..v...~§r1........z........... 000080
 00000000 00000000 00010000 00040000 000000F8 00680064 00580058 00400010 ..a.X.X.d.h.%................... 0000A0
 504F4348 43414208 0A800F01 08E302F4 02000E01 00000000 2D9E0F00 2D9E0011 ...-...-........¶.D......BACHCOP 0000C0
 706F6368 6361620C 0000534C 4E03534C 4C414353 4F440800 000A0001 00000059 Y.........DOSCALLS.NLS...bachcop 0000E0
 FE7C86C7 D88EFFFF B81E5657 000204C8 00000000 00000000 00000045 58452E79 y.EXE...........à...WV.|...Äú.|± 000100
 04C48300 5D046A9A 0042681E 0012E903 7703067E 830009E9 03730306 7E830000 ...~..s.Õ...~..w.Õ...hB..j.]..å. 000120
 00300000 FFFF9A00 80685016 FDFC868D 0072681E 007E681E 076A012A E9000188 |..Õ*.j..h~..hr...•».Ph.......=. 000140
 0C9A5016 FDFC868D 00F8E900 01B804C4 83007104 6A9A0083 681E0012 E9037500 .u.Õ...h...j.q..á.|..Õ%...•».P.. 000160
 00FE7EBE 83001FE9 037202FE 7CBE83FE 7E8EFF00 04E9FE7E 868904C4 83008005 .§..á...~±Õ....~±./|±.r.Õ.../~±. 000180
 868DFE7E B6FFFFD3 E9FE7C86 FF0004E9 03745CFD FB8A80FE 7E868800 15E90377 w.Õ...Ñ~±.o«»\t.Õ....|±Õ£..Ñ~±.. 0001A0
 E104C69A 5016FE80 8680009E 681E0AC4 8300CF05 249A5016 FE808680 5016FDFC =».P...±.P.$.ú..á..h.....±.P.ó.Ã 0001C0
 FF008680 5016FE80 868008C4 8300F504 C69A5016 FF00868D 00A4681E 08C48300 ..á..hÊ......P.ó.X..á....±.P.... 0001E0

Dump of file SATURN:[PCCOMMON.DUMP.PBIN]BACHCOPY.EXE;1 on 18-APR-1990 10:54:10.01
File ID (357,3,0)   End of file block 29 / Allocated 32

Virtual block number 2 (00000002), 512 (0200) bytes

 012004C6 9A5016FF 00868004 77FF2606 77FF2608 5EC408C4 83010E04 C69A.016 .P.ó....á.á^.&.w.&.w......P.ó. . 000000
 16FF0086 8D5016FE 80868008 C4830134 04C69A50 16FF0086 8D00AA68 1E08C4A3 .á..h^......P.ó.4..á....±.P..... 000020
 83015B04 C69A5016 FF00868D 0877FF26 0A77FF26 085EC408 C483014D 04C69A50 P.ó.M..á.á^.&.w.&.w......P.ó.[.. 000040
 00000000 00000000 000090CB C95F5E1F 04C483FF FF05609A 5016FF00 868D08C4 á......P.`....á..^_èù........... 000060
 8900AEA3 00800E89 4900881E 8C008626 89008226 89FC0000 F3E90000 00000000 ......Õ¤..•.&ý..&Ñ¯..|.|..¯.ÈÙ.. 000080
 004BE800 00FFFF9A 501E0528 880526A3 E0865800 00FFFF9A 5016C488 5000AC1E .¯.P.á.P.....X.ÀÈ&.|(..P.....ÒK. 0000A0
 FF055736 FF055936 FF055836 FF055D36 FF01B807 5E9A01B3 01769A00 28063E9A .>.+..v.*..^.|..6]..6[..6Y..6W.. 0000C0
 1A9A01DC 073A9A50 06C80084 06C73600 03B801D6 06C89A50 01B00000 9A055536 6U....§.P.à.ø.|..6ú.Ç.à.P.:.É... 0000E0
 480004C4 06C63B04 8806C608 75000528 3E800000 88008416 FF5000FF B801EC08 .ß.|..P..Ç.£...>(..u.6.|.;6.á..K 000100
 88A6F3C8 88D18804 888E4374 00308026 47017500 3D80267F FFB900AE 068EFF33 3...Ù.¿..&.=.u.G&.=.tC/|..Ì.ûµÌ. 000120
 1972412C AC048114 7500F883 05208F1F F788071E 062EE8E7 74AEF2C0 330874CA ðt.3à·ÙtÓŠ.....X.ç-..«.u.Ÿ.¯,Ar. 000140
 04D0068F C31F16F7 E2AA4801 74C0FEAC 9198ACEE EBAAC20A 1172412C AC92E002 øÁ.¯,Ar..ö¨ŠŸ¯..¯±ât.H¨ä%..û..Å. 000160
 05611E8C 36055F36 8936F775 00FF7C80 06744EF0 8800AE1E 8E00ACA1 04D2068F ..ø.Å¯...Ù..ÞNt..|..u%6.6_.6..ø. 000180
 F774093C F874203C ACFA75C0 0A42AC00 01BFD233 04CE3689 36960175 FF04F696 .-..u..6.6ó.3Ø¢..¯B.àu°¯<¯t«<.t% 0001A0
 C933E8EB 4203745C 3C247422 3C5474C0 0AE87409 3CEC7420 3CAC4E47 6374C00A .àtcGN¯< tš<.tÒ.àtÌ<"t$<\t.BŠÕ3è 0001C0
 2774C00A AC4E01EB CE7501A8 0113E9D1 C188D7EB D1030474 223CFA74 5C3CAC41 A¯<\t°<"t..iŠø.èîÒ.ì´.uöŠ.N¯.àt' 0001E0

Dump of file SATURN:[PCCOMMON.DUMP.PBIN]BACHCOPY.EXE;1 on 18-APR-1990 10:54:10.01
File ID (357,3,0)   End of file block 29 / Allocated 32

Virtual block number 3 (00000003), 512 (0200) bytes

 13E9D1C1 88DFE8D1 03047422 3CFA745C 3CAC41C9 33F0E842 03745C3C C274223C <"tô<\t.BŠÞ3èA¯<\t°<"t..ìŠÒ.èîÒ. 000000
 0520E8FE 2440C203 C788E7D1 E7D147D7 03070305 553E891F 169FE8D6 7501A8D1 Ì´.uøŠ....>U..ø.øGîÒìÒ.ú.ò£Š±Ò . 000020
 8B04C383 02578C36 3F893607 16F80308 8805591E 8C0557A3 FE80E900 08880673 s.|..Õ¯±ÊW...Y..Ä.%..6.?6.W..û.. 000040
 75C00AF7 74093CFB 74203CAC AAC03303 EBFA75C0 0AAAAC4E A400AE1E 8E04CE36 6ö...Û.ÊN¯¯.àu°$.3ä¯¯< t«<.t%.àu 000060
 3C6374C0 0AD67409 3CDA7420 3CAC4EAA D78804C3 8302578C 363F8936 0081E903 .Õ..6.?6.W..û..ø¨N¯< tÒ<.tø.àtc< 000080
 E9D15C80 D5E8AAF3 5C800674 223CFA74 5C3CAC41 C933E8EB AA03745C 3C267422 "t&<\t.¨ŠÕ3èA¯<\t°<"t.¯\µ¨Šï¯\ìÒ 0000A0
 03745C3C B674223C 2A74C00A AC4ED787 4FAA22B0 D78746C9 EBAA22B0 0573AAF3 µ¨s.¯"¨ŠèF.ø¯"¨O.øN¯.àt*<"tÑ<\t. 0000C0
 AA228095 73AAF3E9 D15C8005 EBAAF35C 80067422 3CFA745C 3CAC41C9 33F0EBAA ¨ŠÞ3èA¯<\t°<"t.¯\µ¨Šï¯\ìÒµ¨s.¯"¨ 0000E0
 FF22E904 D02EFF04 75C08501 F128009A 00000247 C7000007 C71F16AA C033C7EB Šû3ä¨..ú...úG....Å(þ..àu...Å.Õ". 000100
 06C704D4 B9510621 7400087E 83064EC4 FE468D00 248A0406 88500001 88EC8855 U.š|..PÊø.¤$..F±áN..~..t!.Q¿Å.ú. 000120
 531E04D4 36FF0EE8 0000FFFF 9A5050C0 33501652 531E5100 1089511E 000104D4 å....Q¿..Q.SR.P3áPP.....$..6å..S 000140
 0CEC83EC 8855C85D E58899C0 33037493 C085DA8C 0017C381 0000FFFF 9A501652 R.P......û...Ò.à.t.3à..Ì]ùU.š.š. 000160
 8804C483 04A60892 9AF676FF 1EFC568C FA46890A 468DF85E 8CF64689 057AB856 V¡z..F~.^%.F..F°.V=..v~...Ì..á.. 000180
 76FFF446 890CC483 04880A20 9AF676FF F876FF06 76FF0876 FFFA76FF FC76FFF0 Þ.v=.v°.v..v..v%.v~. .¡..á..F¶.v 0001A0
 7EC41EDE 88D788EC 885590C8 5DE5885E F4468806 C4830403 09749A56 F676FFF8 %.v~V.t....á..F¶^.|]ù.U.š.ø.B.á~ 0001C0
 FE870846 8ED88EC0 8CF928D1 F7AEF2FF FFB90A7E C4FF758D AEF2FFFF 89C03306 .3ä¿..·Û.u.á~.¿..·Û¼ì+°.ä.Ä.F..± 0001E0
```

```
Dump of file SATURN:[PCCOMMON.DUMP.PBIN]BACHCOPY.EXE;1 on 18-APR-1990 10:54:10.01
File ID (357,3,0)   End of file block 29 / Allocated 32

Virtual block number 4 (00000004), 512 (0200) bytes

 8BEC8855 CB5DC28C 1FFA8BF3 8BA4F3C9 13A5F3E9 D149A402 740001C6 F706468B .F.%6..t.Ê!1ÖµÊ.èµÊ.µ.ª..ó]ìW.&. 000000
 33D78B06 7EC41E56 57EC8855 00CB5DFA 88914901 F7AEF2FF FFB9C033 067EC4D7 ■á-.3à¿..·Ú%!!..ª]ù.U.&W.á-..■3 000020
 F38BFE8B D9F70E4E 2B410175 AEF20E4E 8BDF8B0A 7EC406F7 8B4FAEF2 FFFFB9C0 à¿...ÙÖ.%.á-..Ö.N.·Ùu.A+N.%).±.µ 000040
 04FA8B18 EC830d8E 1EEC8855 4590581E 00C8505F 5E1FC28C C28BAAA4 F3071F06 ...µÊ`.ô.ô.^_]ù..X.EU.&..Ä.&.¡ª. 000060
 9AEE76FF 5250C028 20750846 08064688 F05689EE 468904C4 83059214 DA9A501E .P.Ö....á..FŸ.VÞ.F..F.u +âPR.vŸ. 000080
 5E8CF246 89050288 90008EE9 C0289000 94E90001 880775C0 0806C483 05E6180A Ö.ǀ..á..áu.¡..Ö...+àÖ...¡...F·.^ 0000A0
 5036FF37 74F04608 EE4688FA 4689FC46 89C028F8 5689F646 89085688 064688F4 ¶.F..V..F-.V¼+à.F■.Fª.FŸ.FÞt7.6] 0000C0
 7540EC46 890EC483 06301570 9A50C028 EE76FFF0 76FF5016 EE468D05 5836FF05 ..6[..FŸ.P.vÞ.vŸ+âP.p.0..á..F&∂u 0000E0
 03E80505 88057400 05283E80 31E8EC46 8805740D 05223E83 0C740205 223E830E ..>"..t..>"..t..F&$1.>(..t.¡..Š. 000100
 172C9A50 C028EE76 FF1E5016 EE468005 5836FF05 5D36FFF0 5E8CEE46 8,ˆ50D88 ¡...FŸ.^Þ.6]..6[..FŸ.P..vŸ+âP.,. 000120
 16501653 C4885087 052DA780 D4885200 0288C840 5D1FE588 02ED830E C48.ˆ48A ...á..Ù..[.]MùÉ..R.å.Ĩ·.ñP.áS.P. 000140
 D4794805 2D8F0808 81067500 023D0774 00013040 81127558 C0080000 FFFF°452 R......âXu.Ÿ∂=..t.=..u.Ÿ...·.Kyå 000160
 00AE3688 29E3075E 0E885858 0000FFFF 9A531652 0E010E8A 500C8850 50C0335A 23âPP.ÉP□8..R.S.....XX..^.D).6Ù. 000180
 FF360003 880A8C07 6406C536 1272E91F 16057307 5C1EFF36 DB33DA8C 076006C5 é.ˆ..03Ù6..\.s...Ör.6é.d..ÖE..6. 0001A0
 808F0A80 8EEC8855 C8005FE8 07688F07 688E0068 E807688F 07688E1F 16075C1E .\.../h.eh.Òh./h.eh.Ò_.ùW.&/..e. 0001C0
 6C8F076C 8E0038E8 076C8F07 6C8EEC88 5503E800 49E8076C 8F07688E 0052E80A .ÒR./h.el.Òl.Š.U.&/l.ēl.Ò;./l.el 0001E0
```

```
Dump of file SATURN:[PCCOMMON.DUMP.PBIN]BACHCOPY.EXE;1 on 18-APR-1990 10:54:10.01
File ID (357,3,0)   End of file block 29 / Allocated 32

Virtual block number 5 (00000005), 512 (0200) bytes

 8A500001 88000DE8 00FF0646 C7057500 067E8308 74C00805 7519409A 0032E807 .Ò2..∂.u..ât..-..u.úF...Ò..¡..P. 000000
 08058804 EF830E73 F738C307 5C1EFF00 028807E3 075E0E88 0000FFFF 9A500646 F.P.......^.D.E....\.ù;%s..ÿ.... 000020
 661EFF04 74000568 3E8306F7 081A9A50 00FC88EC 885500C3 EEEB1DFF F2740245 E.t·..ŠYù.U.&¡■.P...%..>h..t...f 000040
 FF33F633 C03300AE 068E056C 068F056A 068FCB50 E5880744 081A9A50 00FF8805 .¡..P...D..[]ù..j...l...Û.3à3-3. 000060
 7300C1E8 C603E601 E6D1FE88 FE2440C7 8846FA75 AE46AEF2 0674053A 26FFFFB9 ¿..&:.t.·ÚFÛuªF.ú∂$±.±!!!!.6Òê.s 000080
 882BE349 0716F633 1F06D888 FE03F888 CF880550 168C0558 A3FA51E9 00098806 .¡..Ö□ªÉ[...]..ü.½.±.Ä..3-..[D+. 0000A0
 8302578C 263F8926 0A74595E 5FA7F300 06890488 8F575651 10750488 06382604 .&;.¡.u.QVW¢¡.¿..µĪ_^Yt.&.?&.W.. 0000C0
 885756EC 88550005 6A2EFF07 161F1602 4F89260F 89260SE2 FA75C00A AAAC04C3 Û.¨¨.àuªà!&..&.O.......j..U.$VW¡ 0000E0
 EBF788AE F2FFFF89 C033970C 74964010 74C238AD 077A8E06 5688C08E D88E0008 ...Ä.à.V.ƒz.Ù;ôt.∂.t..3à¿..·Û.%Š 000100
 B9C033FA 88921F74 C0080758 07EA9A06 76FF57EC 88550002 CA5DE588 5E5F96E8 Š._^.[]ò..U.&W.v..õ.X..ât...ª3à¿ 000120
 0002CA5D E5885F58 0000FFFF 9A501651 521E5300 0288C488 504901F7 AEF2FFFF ..¯Ù%!!P.áE..S.RQ.P.....[_.[]ò.. 000140
 C0850000 FFFF9A1E 5150410F C98049C8 88197200 801E3826 72080300 861E885A Z..Ñ..Är&;.¯.r..ùl.è.APQ¯......â 000160
 FFC388E3 88027207 141E3808 72082B0C 880EE8F8 00861E87 00800E89 490C7558 Xu.I..¯...Ñ.%Š..É+Är.;...r..D.û. 000180
 0000FE46 C7077508 8C087E81 0E75057A 067E8107 1606FF56 04EC83EC 885500E2 ã.U.&.&.V.....-.z.u..-.¥.u.úF±.. 0001A0
 881A750C 0A47F626 065EC400 01FE46C7 297507F0 087E8130 75058606 7E8113E8 Š..-...u0.-.Þ.u)úF±..á^.&-G..u.. 0001C0
 90900081 E9C02807 7401065E 87F6E3D1 D803E301 D888F9F7 000C8999 056E20C3 ù-n..¿..%ª.ÄìD.ÄìD-.^..t.+àÖ.... 0001E0
```

```
Dump of file SATURN:[PCCOMMON.DUMP.PBIN]BACHCOPY.EXE;1 on 18-APR-1990 10:54:10.01
File ID (357,3,0)   End of file block 29 / Allocated 32

Virtual block number 6 (00000006), 512 (0200) bytes

 048902C4 8309831C 289A5002 00881575 02440804 88060AC6 81E6D302 81FE7688 .v±Ÿ.Æ!.6Ö....D.u.¡..P.+.ª..á... 000000
 4689065E 05E001C1 03E001C8 8BF9F700 0C899905 6E200646 88027400 08025489 .T..Ät@.F.·n..¿..%ª.àÌÅ.èÌÅ.^..F 000020
 89260789 26085789 26064789 26060C94 88060A84 88E6D1E6 D1FE7688 065EC4FC ■á^..v±!!!!..Ö...É.&.G.&.W.&..&. 000040
 5E0001B8 020A4F80 26065E88 1107C60E 88044789 26024489 020088FC 76880257 W..v■¡...D.&.G..Bó...^.&.O..¡..^ 000060
 5E05E001 C103E001 C888F9F7 000C8999 056E2D08 468804EC 83EC8855 CB5DE588 .[]ìW.&.&..F.·n..¿..%ª.àÌÅ.èÌÅ.^ 000080
 50E42A08 478A2608 5EC47574 1007F626 FC5EC451 7400067E 83FE5E8C FC468906 ..F■.^±.-..tÖá^■&-..tuá^.&.G.*ÒP 0000A0
 07C626FC 5EC404C4 830A0418 869A0876 FF0A76FF 5F74C008 02C48309 C510869A .Ñ.é..á..ât_.v..v.......á.á^■&6. 0000C0
 5EC42DE8 08578926 06478926 02578926 07892699 C028085E C4000002 47C72600 .&úG...á^.+Ĩ.&..&.W.&.G.&.W.Š-á^ 0000E0
 0A76FF0E 74C00802 C4830A16 10869A50 E42A0847 8A26085E C4247410 07F626FC ■&-..t$á^.&.G.*ÒP.Ñ....á..ât..v. 000100
 10A30916 88090919 1C9A000A 88EC8855 90CB50E5 8804C483 08241886 9A0876FF .v....$..á..[]ù.U.&¡.......¡..È. 000120
 C708E816 8908E6A3 08568806 46880902 16890900 A310568B 0E468809 121E8C09 ......F..V.È.......F..V.È!...Ò.ú 000140
 A3C02800 01090E06 C7031BE9 037425F6 7E800390 E9000009 0A06C700 00090C06 .....ú.....Ö...—%t.Ö..ú.....+àÈ 000160
 00200A76 06C708FE A308E4A3 08EAA309 04A30906 A308EEA3 0908A308 ECA308F0 Þ.É$.É..ÉŸ.É..É..Éõ.Éõ.É±.ú.v. . 000180
 FF007528 3F80260A 5E88903E E800300A 7606C70A 46FF4975 30017F80 260A5EC4 á^.&...0u!.F.ú.v.0.$>..^.&.?+u.. 0001A0
 9014E809 0406FF1A 750008F0 3E830E75 203F8026 9028E800 00090406 C708F006 .Þ.ú.....Š(.&.? u..>Þ..u.....Š.. 0001C0
 E80E5098 078A260A 5E880A46 FF08FE06 FFC7752D 3F80260A 5EC400E8 08E406FF ..ô.Š.á^.&.?-ωú..±..F..^.&...P.Ò 0001E0
```

Dump of file SATURN:[PCCOMMON.DUMP.PBIN]BACHCOPY.EXE;1 on 18-APR-1990 10:54:10.01
File ID (357,3,0) End of file block 29 / Allocated 32

Virtual block number 7 (00000007), 512 (0200) bytes

```
56890A46 8908C483 08F2E80E 501E0914 880A76FF 0C76FFD0 75C00802 C48309AA ¯..ô..âuî.v..v.¡...P.Ò·..ô..F..V 000000
300A763E 83007400 08FE3E83 0914A308 F70914A1 08FE06FF 0C7D0009 143E830C ..>...)...±.À..¾ÃÈ...>±..t..>v.0 000020
1E090E88 0A76FF06 0A46FF09 0606FF2E 752E3F80 260A5EC4 00200A76 06C70675 u.ú.v. .ô^.&.?.u......F...v.¡... 000040
C409060E FF000109 0E06C70A 7D00090E 3E830C56 890A4689 08C48308 A5E80E50 P.ÒÈ..ô..F..V..>...).ú.........ô 000060
000208EE 06C70675 006C3028 7400683D 4074004E 30307400 46309807 8A260A5E ^.&...=F.t==N.tà=h.t+=l.u.ú.Ÿ... 000080
90025CE9 1C75003F 80260A5E C40A46FF 03754C3F 80260A5E C4097500 08EE3E83 .>Ÿ..u.ô^.&.?Lu..F.ô^.&.?.u.Õ\.. 0000A0
30F84689 98078A26 C8EB0008 08EE06C7 D0E80010 08EE06C7 D8E80001 08EE06C7 ú.Ÿ...ŠÄú.Ÿ...ŠÄú.Ÿ...Šà&....F½= 0000C0
037E7874 006930F8 46B820F8 468308EC 06FF0875 00583005 7400473D 0A740045 E.t.=G.t.=X.u...&..F½ .F½=ï.tx~. 0000E0
08EE3E83 900167E9 014CE903 75002530 0160E903 7E0149E9 03750063 30019FE9 Õ..=c.u.Õl.-.Õ'.=%.u.ÕL.Õg...>Ÿ. 000100
A11FC426 09001EC4 00E80000 0247C726 07892609 0AA11FC4 2609001E C4157502 .u.ô...&ô.À..&..&úG...Š.ô...&ô.À 000120
1EC401C8 E9037400 090A3E83 017EE903 7500090C 3E830409 00068307 8926090A ..&........>...u.Õ~..>...t.Õù.ô. 000140
50000A88 000008E4 06C70908 06FF01BA E9FFFF88 01BDE903 75200A47 F62608E6 ¦.&-G. u.Õ§.¡..Õα.....ú.Ò...¡..P 000160
090E06C7 090606FF 08EC06FF 08EA06FF 90F0E800 088890C1 EB02C483 01ACE80E .Ò¯..ô.Šè.¡..Šþ...ô...&.....ú... 000180
74091406 39FA4689 08EEA3C0 287E7401 08EE3E83 0085E903 750808EE 3E830004 ...>Ÿ..u.Õ...>Ÿ..t-+âÈŸ..F*9...t 0001A0
0914A105 09142E83 909013E8 00000914 06C70A74 0008FE3E 83FA4689 0914A128 (À...F*.>±..t.ú.....Š........À.. 0001C0
A1E80E50 003A8802 C483013A E80E5000 10880209 00068309 14A3C028 027DC008 .â).+âÈ.......¡..P.Ò:..ô.¡:.P.ÒÀ 0001E0
```

Dump of file SATURN:[PCCOMMON.DUMP.PBIN]BACHCOPY.EXE;1 on 18-APR-1990 10:54:10.01
File ID (357,3,0) End of file block 29 / Allocated 32

Virtual block number 8 (00000008), 512 (0200) bytes

```
C02B027D C0080914 A300052D FA468815 740008FE 3E832274 00FA7E83 02C48304 ..ô..-*.t".>±..t..F*-..È...â).+ô 000000
09000683 02C48300 F7E80E50 00108804 09002E83 00000914 06C79007 EB0914A3 È..Š..ú..........¡..P.Ò%..ô..... 000020
55E80EF8 76FF90F3 E8000188 FF30E902 77E80E50 C028FF35 E9001088 FF06E902 .Õ..¡..Õ5.+âP.Õw.ÕO.¡..Šµ..v½.ÕU 000040
00673005 7C00653D FEFEE903 75006430 90FF15E9 0436E80E 50002588 FF20E903 .Õ .¡%.P.Õ6.Õ...=d.u.Õ±±=e.|.=g. 000060
E8FE5689 FC468940 0C5688 0A 46880A4E FF0C5688 0A468809 740008EE 3E83087E -Ã.>Ÿ..t..F..V..N..F..V.à.F=.V±Š 000080
30887400 7330FED6 E9037500 7030FED8 E9037500 6F30FE72 E9037500 6E30903A :.=n.u.Õr±=o.u.ÕÄ±=p.u.Õø±=s.t.= 0000A0
8A26FC5E C4FC46FF 9034E80A 46FF9081 E8FF75E9 03750078 30FEA8E9 03750075 u.u.Õ¨±=x.u.Õu.ŠŸ..F.Š4..F=ô^=&. 0000C0
8806C483 045EE80E 0A76FF0C 76FF500A 4628C388 EC75253C 0474C00A F6468807 ..F-.ât.<%u&.ú+F.P.v..v..Ò^..ô.. 0000E0
2608E61E C4FC53E9 0374C00A F6468807 8A260A5E C40C5689 0A4689FE 5688FC46 F=.V±.F..V.ô^.&...F-.ât.ÒS=ô.Ì.& 000100
C7067400 09063E83 565712EC 83EC8855 C850E588 090AA1FE 43E90374 200A47F6 -G. t.ÕC±À...[]üU.&.&.W.>...t.ú 000120
001EC419 751008EE 3E830774 0208EE3E 83090806 FF04740A 067E8300 200A7606 .v. ..-..t......>Ÿ..t..>Ÿ..u.ô.. 000140
001EC411 7400090E 3E83902C E8040900 0683FE56 89FC4689 02578826 07882609 .&..&.W..F=.V±.....Š,..>...t.ô.. 000160
09000683 FE5689FC 46899907 88260900 1EC40EE8 0000FE46 C7FC4689 07882609 .&...F=úF±..Š.ô...&....F=.V±.... 000180
16880910 A10A74A3 C0289003 E8064688 0674FE46 08FC4688 0E740008 E43E8302 ..>ô..t..F=.F±t..F.Š..+âÈt.À.... 0001A0
46FFF25E C410750A 067E8328 7D00FE7E 83317500 09083E83 F45689F2 46890912 ...F·.V¶.>...ul.~±.)+.-..u.ô^·.F 0001C0
9006E800 01F646C7 FE5689FC 46890AF7 00028308 F7FE5688 FC468820 07C626F2 ·&ô.-.F=.V±¾Á.@.¾Ò.F=.V±úF-..Š.. 0001E0
```

Dump of file SATURN:[PCCOMMON.DUMP.PBIN]BACHCOPY.EXE;1 on 18-APR-1990 10:54:10.01
File ID (357,3,0) End of file block 29 / Allocated 32

Virtual block number 9 (00000009), 512 (0200) bytes

```
C4830F21 1DAC9AFC 76FFFE76 FF501E06 76FFFA5E 8CF84689 08F28800 00F646C7 úF-..¡·..F½.^*.v..P.v±.v=.¯.!..ô 000000
08F04E89 C828090E 0E8804C4 830A2905 0C9AF876 FFFA76FF 45740009 063E830A ..>...tE.v*.v½...)..ô.....+à.NÞ. 000020
49C18847 3005C626 05E8F27E C4F04E88 00000A74 06C70675 080A743E 83007EC9 è~..>t..u.ú.t....NÞô~·Š.&6.0G.èl 000040
08048807 8A26F85E C4F276C5 EE5E8C08 EC0E88F0 4E89F446 8CF27E89 F47FC008 .â.¶.~·.F¶.NÞ..&..^Ÿév·ô^½&..... 000060
083E83EE 5E8EF45E 8CF27689 E375003F 8026F846 FF46202C 80037C61 3C0774C9 èt.<a|.., F.F½&.?.uD.v·.^¶.^Ÿ.>. 000080
830311E8 0E50C028 u2E80001 88057500 F67E8308 74090406 0808F0A1 14750009 ..u.ÀÞ.....t..--.u.¡..Š.+âP.Ò... 0000A0
09021688 0900A100 01BE1874 00067E83 565710EC 83EC8855 C850E588 5F5E02C4 ô.^_.[]üU.&.&.W.-..t.ƒ..À...... 0000C0
02578826 07882609 001EC413 740808EE 3E83008F E9020900 0683FA56 89F84689 .F½¯V*.....Õ...>Ÿ..t.ô...&..&.W. 0000E0
EE3E8304 09000683 FA5E8CF8 4689FC46 89078826 09001EC4 10E8FA56 89F84689 .F½.V*Š.ô...&...F=.F½.^*......>Ÿ 000100
5E8CF846 8906E988 097500FC 7E83900A E806E288 1575FA46 08F84688 0E740808 ..t..F½.F*u.¡ã.Š...~=.u.¡Õ..F½.^ 000120
FFF25EC4 900EE809 0E0E881C 74090636 39F628F4 5689F246 89FA5688 F84688FA *.F½.V*.F·.V¶+-96..t.....Š..ô^·. 000140
143E88F3 75003F80 26F246FF F25EC446 90EDE810 7ECE3846 1574003F 8026F246 F·&.?.t.F;ö~.ŠÙ.Fô^·.F·&.?.uµ.>. 000160
06C48301 80E80EF8 76FFFA76 FF5602C4 83015FE8 0E570875 0008FE3E 83FE2809 .+±.>±..u.W.Ò_..ô.V.v*.v½.Õ§..ô. 000180
880900A1 06EC83EC 885590C8 5DE5885F 5E02C483 0142E80E 57087400 08FE3E83 .>±..t.W.Õ8..Ã.^_.[]ù.U.&.Š.À... 0001A0
83FA4688 C02A9003 E8018005 7547067E 83067467 067E83FE 5689FC46 89090216 ....F=.V±.-.gt..¯.Gu.¯.Š..*à.F*. 0001C0
FF000109 0E06C706 7500090E 3E830074 00FA7E80 0006090E 06C70675 0009063E >...u.ú......-*.t..>...u.ú...... 0001E0
```

Dump of file SATURN:[PCCOMMON.DUMP.PBIN]BACHCOPY.EXE;1 on 18-APR-1990 10:54:10.01
File ID (357,3,0)   End of file block 29 / Allocated 32

Virtual block number 10 (0000000A), 512 (0200) bytes

```
181EFF26 076C068E FC76FFFE 76FF0910 36FF0912 36FF0676 FF090E36 FF08EC36 6&..6...v..6...6...v±.v•..l.&... 000000
1EFF2607 6C068E09 1036FF09 1236FF14 750008E4 3E831B74 00FA7E80 0EC48307 ..&..-*.t..>ä..u..6...6....l.&.. 000020
26076C06 8E091036 FF091236 FF147500 090E3E83 18740008 E43E8304 C483071C ...&..>ä..t..>...u..6...6....l.& 000040
76FFFE76 FF187.09 04060808 F0A10000 0A7406C7 08090006 8304C483 07241EFF ..$..&......ú.t...Àþ.....t..v±.v 000060
5DE58801 33E80E50 C02802E8 00018805 74C00804 C4830728 1EFF2607 6C068EFC •..l.&..(..&..àt.|..$.+àP.Ó3..|} 000080
07FF2637 88260646 8A157804 4FFF2608 E61EC43D 7500090C 3E8356EC 885590C8 ù.U.&V.>...u=&.|.&.O.x..F.&.7&.. 0000A0
FF077540 06C48312 0519FE9A 0676FF53 08E836FF 9011E8E4 2A048826 02478E26 &.G.&..*ô$...6ò.$.v..±....&.àu.. 0000C0
06768857 7500090C 3E835657 02EC83EC 885590C8 505E090A 06FF9005 E8090C06 ...$......^]ù.U.&.&.WV.>...uW.v. 0000E0
0C06FF04 754006C4 83127119 FE9A0A76 36FF08E6 36FF08E8 36FF18E8 507E5608 .--P$..6ò..6|..6v..±.q..&.àu.... 000100
2602478E 2607FF26 3F88260A 76A00478 044FFF26 08E61EC4 1E7EC008 4EC68809 ..6N.&-.&.|.&.O.xÀ.v.&.7&..&.G.& 000120
02EC83EC 8855CB5D E5885F5E 090A0601 06468807 7500090C 3E8304E8 E42A0588 ..*ô$À.>...u..F.....^_.|}ùU.&.&. 000140
FE9A5098 078A2606 5EC408E6 36FF08E8 36FF22E8 5E750009 0C3E830A 76885657 WV.v..>...u^$".6ò..6|‾.&^.&...P.± 000160
78044FFF 2608E61E C42574C0 084EC688 0646FF09 0C06FF04 754006C4 8312E719 .Ó..&.àu......F..6N.àtX&.|.&.O.x 000180
090C3E83 CAE8E42A 05882602 478E2607 FF263F88 2608E61E C4078A26 065EC4CD ë&^.&...&.|.&.7&..&.G.&..*ô$ò.>.. 0001A0
46890912 16880910 A1560CEC 83EC8855 C85DE588 5F5E090A 06010A46 88077500 .u..F.....^_.|}ùU.&.&.VÀ.......F 0001C0
28F84689 04C4830F 0C050C9A F476FF52 09143688 FA4689FC 4689C028 F65689F4 ¶.V-+&.F•.F‾.6..R.v¶......&..F½+ 0001E0
```

Dump of file SATURN:[PCCOMMON.DUMP.PBIN]BACHCOPY.EXE;1 on 18-APR-1990 10:54:10.01
File ID (357,3,0)   End of file block 29 / Allocated 32

Virtual block number 11 (0000000B), 512 (0200) bytes

```
C4227500 08FE3EC  4E017508 0A743E83 08E802EE 83057510 0A743E83 06762BF0 Þ+v..>t..u..Ÿ.$..>t..u.N.>±..u"& 000000
4EFF02C4 83FE67E8 0E509807 8A26F446 FF127530 0A763E83 1975203F 8026F45E ^¶&.?-u..>v.0u..F¶&...P.Ôg±.&..N 000020
0068E80E FA46FF07 7400067E 831B7400 08FE3E83 077EF60B 0874300A 763E83F8 ½.>v.0t..--..>±..t..-..t..F*.Òh. 000040
067E8302 C483FE74 E80E5629 750008FE 3E830072 E80EFC46 FF077400 0A743E83 .>t..t..F•.Òr..>±..u)V.Òt±.&..-. 000060
76FF0042 E80E0475 00FC7E83 0A74000A 743E8300 38E80E04 7500FA7E 830A7400 .t..-*.u..Ò;..>t..t..-•.u..ÒB..v 000080
FE2EE80E 5600200A 7606C70E 740008FE 3E8306C4 83FEAFE8 0EF476FF F676FFF8 ½.v-.v¶.ÒE±.&..>±..t.ú.v. .V.Ò.± 0000A0
CB02C483 FDC6E80E 500020B8 03E8002B 88057400 08F03E83 CB5DE588 5E02C483 .&.^.|}ù.>Þ..t.|+.$.| .P.Òó».&.ù 0000C0
788803E8 00588805 740008EC 3E831775 100A743E 8302C483 FD8AE80E 50003088 |0.P.Ò▭».&..>t..u..>&..t.|X.$.|x 0000E0
12752A3F 80260A5E C40001FE 46C75657 06EC83EC 8855C802 C483FD9C E80E5000 .P.Ò.».&.ùU.&.&.WVúF±..&^.&.?*u. 000100
FFFFFE46 C708752D 3F80260A 5EC49061 E80A46FF 02090006 83378826 09001EC4 &...&.7......F.$a.&^.&.?-u.úF±.. 000120
0675303C 0A750906 36393C7F 393C407C 303CFA46 88078A26 0A5E88F6 280A46FF .F.+-.^.&...F*<0|a<9.<96..u.<0u. 000140
C803E1D1 CE03E1D1 E1D1CE88 98058A26 1C7F393D 802606E8 F8880030 0A7606C7 ú.v.0..«$.&.=9..&....ölÅlÅ.ölÅ.à 000160
88378926 065EC4F0 88EEF7FE 46880C46 8C0A7E89 DE7D3030 802647F1 8830E983 .Ö0.þG&.=0)ß.-..F..F±¥Ÿ.Þ&^.&.7. 000180
C4064E8A FE5E8CFC 468906F0 885704EC 83EC8855 90CB5DE5 885F5E0C 56880A46 F..V.^_.|}ù.U.&.&.W|Þ..F•.^±.N.& 0001A0
8CFC7E89 9009E8FE 468CFC7E 890001B8 F4750038 26117400 30802647 01E8FC7E -•$.G&‾=.t.&8.u¶|...-•.F±$...-•. 0001C0
C208FC56 89FA4689 05501688 0558A156 06EC83EC 885590C8 5DE5885F C02BFE46 F±+â_.|}ù.U.&.&.VÀ[...]..F*.V•.ô 0001E0
```

Dump of file SATURN:[PCCOMMON.DUMP.PBIN]BACHCOPY.EXE;1 on 18-APR-1990 10:54:10.01
File ID (357,3,0)   End of file block 29 / Allocated 32

Virtual block number 12 (0000000C), 512 (0200) bytes

```
46839090 06E8F088 04C48315 28050C9A 0676FF08 76FF6E74 08460806 46887674 tv.F..F.tn.v..v....(..&..Þ$....F 000000
7EC63804 C4831551 050C9A37 FF260277 FF264A74 02470826 078826FA 5EC404FA *.&^*&..&.G.tJ&.w.&.7...Q..&.;6- 000020
709A37FF 260277FF 26FA5EC4 0676FF08 76FF5601 75303880 261FC426 FA5EC40D Í&^*&&.&.8=uIV.v..v.&^*&.w.&.7.p 000040
CB5DE588 5E99C02B 9004E8C2 8C01408D 1FC426FA 5EC48475 C0080AC4 8311C71D .ú..&..&uÇ&^*&&..ə..ó$..+&.^.|}ù 000060
EE468D50 16F2468D 0876FF0A 76FF15A1 191C9A00 14880886 1EEC8855 4590581E .X.EU.&..À|.....À..v..v..F·.P.FŸ 000080
900173E9 FFFF8807 754014C4 8315BD1E C69A0C76 FF0E76FF 1076FF12 76FF5016 .P.v..v..v..v..6.§..&.àu.|..Õs.. 0000A0
FF0A76FF 50002F88 FC5689FA 468906C4 83150S1E 3A9A0876 FF0A76FF 50005C88 |\.P.v..v..:.Í..&..F*.V•|/.P.v.. 0000C0
88084688 2775FC46 08FA4688 1075C208 F85689F6 468906C4 8316201E 3A9A0876 v..:. ..&..F-.V½.6u..F*.F•u'.F.. 0000E0
FA4689F8 5688F646 880C76F6 4639FC56 88FA4688 0874FC46 08FA4688 19E80A56 V.$..F*.F•t..F*.V•9F-v..F-.V½.F* 000100
FFF276FF F476FF23 74D00806 C4831641 10DA9AFA 76FFFC76 FF50002E 88FC5689 .V•|..P.v•.v*.Ö.A..&..Àt#.v¶.v·. 000120
FF0A76FF 0087E9EC 46890EC4 83165522 329A0676 FF0876FF 0A76FFEE 76FFF076 vÞ.vŸ.v..v..v..2"U..&..F&Ôñ..v.. 000140
0875D008 FC5689FA 468902C4 8316871C 2B9A5000 050504C4 83166105 0C9A0876 v....•..&....P.+....&..F*.V•.Àu. 000160
1E06F688 08C48316 9A1CE69A FA76FFFC 76FF0876 FF0A76FF 0088E9FF FFEC46C7 úF$..Õ...v..v..v•.v*.|....&.|-.. 000180
06C48316 C618DA9A FA76FFFC 76FF50C0 2808C483 16A804C6 9AFA76FF FC76FF50 P.v•.v*.6.¨..&.+àP.v•.v*.Ö.6..&. 0001A0
1CE69A50 5206C483 16001E3A 9AFA76FF FC76FF50 002E8850 1E06F888 2174C008 .àt||«..P|..P.v•.v*.:.Å..&.RP.|. 0001C0
8316FE22 329A0676 FFFA76FF FC76FFEE 76FFF076 FFF276FF F476FF08 C48316ED Ú..&..v¶.v·.vÞ.vŸ.v•.v*.v..2"±.. 0001E0
```

```
Dump of file SATURN:[PCCOMMON.DUMP.PBIN]BACHCOPY.EXE;1 on 18-APR-1990 10:54:10.01
File ID (357,3,0)   End of file block 29 / Allocated 32

Virtual block number 13 (0000000D), 512 (0200) bytes

 C483171A 1C169AEE 76FFF076 FF04C483 170C1C16 9AFA76FF FC76FFEC 46890EC4 ú..Fä.v=.v¹......ú..vÞ.v¥......ú 000000
 4590581E 90CB40D0 1FE58802 ED83EC46 8804C483 15031C16 9AF276FF F476FF04 ..v¶.v.......ú..Fä.Ü..Í.]Hù..X.E 000020
 FF1276FF FF72968C FF708689 FF20868D 56571764 191C9A00 E48808BE 1EEC8855 U.ä..Ä¡ð....d.WV.. ...p...r..v.. 000040
 447540FF 7886890E C48317A3 15709A06 76FF0876 FF0A76FF 0C76FF0E 76FF1076 v..v..v..v..v..v..p.È..ú...x.ãuD 000060
 24745C3C 28742F3C FF1E8688 078A2608 5EC43675 0005223E 83077402 05223E83 .>".t..>"..uóá^.&......</t(<\t$ 000080
 FF7C9689 FF7A8689 04C48317 D1140A9A 501E0700 8819743A 017F8026 0774C00A .át.&...:t.¡...P.Ö.1..ú...z...|. 0000A0
 469A5016 FF7E868D FF7A86FF FF7C86FF 50007F88 900113E9 FF788688 08750008 .Äu...x.Ö...|..P.Å|..Åz...~..P.F 0000C0
 00EBFF70 86C5FF1C 9E8CFF7A 8EC400FD 46C6FF7C 9689FF7A 86890AC4 83185A1D .Z..ú...z...|.6F».å/z.....éÅp.$. 0000E0
 89FF1C9E 8EFF729E 3CFF7086 89E07500 30802646 47048805 8A260074 38308026 &.»;t.&....GF&.=.uÜ.Åp...r...... 000100
 769689FF 748689C2 8CFF7086 88FF708E FF0007C6 26FF709E C4FF7C86 8CFF7A8E /z...|.ú.p.&6....p...p..ó..t...v 000120
 0705B812 742F3F80 2618745C 3F8026FF 749EC4FF 72968CFF 708689FF 208680FF ... ...p...r.ú.t.&.?\t.&.?/t.¡.. 000140
 04C69AFF 7086FFFF 7286FF08 76FF0A76 FF08C483 187004C6 9AFF7086 FF16501E .P..Åp..ó.p..ú..v..v..År..Åp..ó. 000160
 8015709A 0676FFFF 7086FFFF 7286FF0C 76FF0E76 FF1076FF 1276FF08 C483188F ...ú..v..v..v..v..År..Åp..v..p.. 000180
 C4FF05E9 03740005 223E830A 74020522 3E83FF16 E9037440 FF788689 0EC48315 ..ú...x.ãt.Õ...>"..t..>"..t.Õ..ú 0001A0
 5F5EFEE6 E9FF17E9 0374D008 FF7A86FF C28CC388 FEF8E903 75003F80 26FF7A9E .z.&.?.u.Ö½±.ú.ó..z..Ät.Õ..Õ|±^_ 0001C0
 9A5050C0 3350FE46 8D160676 FF0876FF 02EC83EC 885590C8 40501FE5 8802ED83 .Ú..Í.]Hù.U.$.$..v..v...F±P3ãPP. 0001E0

Dump of file SATURN:[PCCOMMON.DUMP.PBIN]BACHCOPY.EXE;1 on 18-APR-1990 10:54:10.01
File ID (357,3,0)   End of file block 29 / Allocated 32

Virtual block number 14 (0000000E), 512 (0200) bytes

 80E900A4 E90005B8 000DBA0C 740001FE 46F71374 020A46F6 1675C008 0000FFFF .....âu.-F..t.%F±..t.¤..¡..Õ€.Õ¯ 000000
 52C85152 E3880572 07141E38 08720828 DC885A59 E8CCE900 028800C8 5DE58800 ..Í]ù.¡..ÕãÕYZ.É+Ár.;...r..DRQùR 000020
 F480F8E2 E032ACFC E4320042 89F63356 07102EFF E8ACE9C0 33057540 0710A151 QÀ..ãu.3äÕ¯Õ....V3-¿8.2ð=¯2Äã«.¶ 000040
 00051804 02030202 1601C85E 0001B819 56081A9A 500001B8 2C88073A 9A117455 Ut..:..,¡..P...V.¡..^ü.......... 000060
 00520243 00410235 02121211 0D10120F 160D160C 0808070A 0C090C08 0C070906 ........................S.A.C.R. 000080
 000008D7 02CE08A4 0D840982 0A810A80 16060972 1C702060 006C0859 00570053 S.W.Y.l.m p.r............É.ö.m... 0000A0
 880529A3 CB50E588 99FFFFB8 0008E8C8 5DE58899 FFFFB805 22168905 29A31608 ..É)...".¡....Í]ùÒ..¡....Í]ùÉ).É 0000C0
 3C0472BC 3C430A76 243C0472 133CF7E2 43431674 073A2E1B 75E40A00 24891966 f.¿$..ðu..:..t.CCã%<.r.<$v.C<¥r.< 0000E0
 89E42A08 478A2608 5EC45657 08EC83EC 885500C3 0522A398 01478A2E 430176CA ðv.C..G..È".û.U.$.$.WVé^.&.G.*ð. 000100
 830A47F6 26F84689 065E05E0 D1C103E0 D1C888F9 F7000CB9 99056E2D C388FA46 F°.û-n..¿..%¹.âÍÁ.éÍÁ.^..F¥&-G.. 000120
 010A47F6 26085EC4 900139E9 FFFF8820 0A4F8026 085EC40F 74400A47 F6260774 t.&-G.ãt.ú^.&.O. ¡..Õ9..ú^.&-G.. 000140
 04478926 C028EF0A 67802602 0A4F8026 90E2E800 000447C7 26200A4F 80260E74 t.&.O. &ùG...Šã.&.O..&.g.ý+ä&.G. 000160
 F6E3D108 03E3D108 88F9F700 0C899905 6E20C388 51750C0A 47F626FC 7689F088 .Þ.v»&-G..uQ.û-n..¿..%¹.ÄiD.ÄiD- 000180
 08A70A7E 81167505 86087E81 0E741AAE 0A7E8107 75057A08 7E813775 01065E87 .^..u7.-.z.u..-.Ü.t..-...u..-.Ï. 0001A0
 085EC404 C4830880 E80876FF 0A76FF0C 75C00802 C4831826 1D869AFA 76FF0F75 u..v¹.Å.&..ú..âu..v..v.Ò...ú.ú^. 0001C0
 7401065E 87F6E3D1 D803E3D1 0888F9F7 000CB999 056E2DC3 881A7508 0A47F626 &-G..u..û-n..¿..%¹.ÄiD.ÄiD-.^..t 0001E0

Dump of file SATURN:[PCCOMMON.DUMP.PBIN]BACHCOPY.EXE;1 on 18-APR-1\`) 10:54:10.01
File ID (357,3,0)   End of file block 29 / Allocated 32

Virtual block number 15 (0000000F), 512 (0200) bytes

 4588F87E 88025789 26078926 40085788 26064788 2606772B 26378826 085E8869 i.^.&.7&+w.&.G.&.W.ã&..&.W..-½.E 000000
 18E8FC46 8908C483 18462416 9AFA76FF 0677FF26 5256167E F6080447 89264802 .H&.G..--.VR&.w..v¹..$F..ú..F»$. 000020
 C426085E C408C483 18682308 9A535050 C0285000 02881174 20052D87 F6FA5E88 .^*-.-. t.¡..P+äPPS.Ä#k..ú.ú^.&ú 000040
 08C48319 5F24169A FA76FF50 1606468D 50C68800 018E19E8 07882606 468A065F _..F.&..$./...óP.F..P.v¹..$_..ú. 000060
 C4F62856 04EC83EC 8855C850 E5885F5E E42A0646 8AFE8EE9 0374FC76 39FC4689 .F»9v»t.Õ/±.F.*Õ^_.Í]ùW.$.$.V+-ú 000080
 D888F9F7 000C8999 056E20C3 881A7508 0A47F626 5A75023C 03240A47 8A26065E ^.&.G.$.<.uZ&-G..ü..û-n..¿..%¹.Ä 0000A0
 2650287E C008FC46 89064728 26078826 065E8839 7401065E 87F6E3D1 0803E3D1 10.ÄiD-.^..t9.^.&..&+G..F».á-(P& 0000C0
 8026065E C40874FC 463808C4 831A8824 169A50E4 2A08478A 260677FF 260877FF .w.&.w.&.G.*óP..$¡..ú.;F»t.ú^.&. 0000E0
 C6880000 0447C726 02578926 07892608 57882606 47882606 5EC4FFFF 8E200A4F O. /..ú^.&.G.&.W.&..&.W.&ùG....ó 000100
 EC83EC88 55C850E5 8801FE4F 80260574 C308C08C 065EC4EC 885590C8 5DE5885E ^.Í]ù.U.$ú^..â.ût.&.O±..Í]ùW.$.$ 000120
 E8157500 82E80750 A3127400 25E80875 0007503E 831E73FF F1300646 88575602 .VW.F.=Þ.s..>P..u.Õ%.t.ÈP.Ò..u.Ò 000140
 065E3900 F088C850 E5885E5F 02C4831B E125CC9A 0676FF08 750078E8 0574001B ..t.Õx.u..v..ã%Ä..ú._^.Í]ùÈÞ.9^. 000160
 08C4831C 5F27769A 50028051 0E4F8D50 501EC033 FE5E89FE E3834306 5E880776 v..^.C.D±.^±3ã.PP.O.Q¯.P.v' ..ú. 000180
 08A3C033 D88EFE5E 880008A3 DA8E0574 D2080754 A3075216 87C28838 74FFFA83 .*.t8.ò..R.ÈT..@t..ÒÈ...^±.Ã3ãÈ. 0001A0
 8CC31F08 8C0006A3 00000500 0AA30147 800002A3 0000A300 0A880C47 89484800 .HH.G.¡..È..È...G.È.....È...Ä.ü. 0001C0
 76C51EDE 880788EC 8855C309 8EC18CD2 080936E8 07541E8E D833064E 88C08ED8 Ä.á.N.3Ü..T.Ò6..@.ë.\ùW.$.a.8.év 0001E0
```

```
Dump of file SATURN:[PCCOMMON.DUMP.PBIN]BACHCOPY.EXE;1 on 18-APR-1990 10:54:10.01
File ID (357,3,0)   End of file block 29 / Allocated 32

Virtual block number 16 (00000010), 512 (0200) bytes

13A5F3E9 D149A402 7401A8C7 88067EC4 D1F7AEF2 FFFFB9C0 33C08ED8 8CFE880A ..±.Ä.â3â¿...ÙK1â-..ú´.t.Ê!1ÕµE. 000000
F2FFFF89 C0330A7E C40676C5 1EDE88D7 88EC8855 C850C28C 1FFA88F3 88A4F3C9 èµÊ.µ.ª..ô]ìU.å.¤.å.év.á-.3â¿..· 000020
C5067EC4 1E5657EC 885500C8 5DFA88F3 881FFFFF 1DC01805 74A6F3F9 28D1F7AE ÙK1+ªµ!t..à.....µ.ª)ù.U.åWV.á-.é 000040
CB5DE588 5F5E1rC2 8CC388AA F3C032F8 E2AA0374 C00AAC0C E30E4E88 DF880A76 v..Ô.N.D.¯.ât.¯â½2âµ´.û.ô.^_.[]ù 000060
F30A76C5 FE88C803 D9F7AEF2 C033F788 067EC4D9 8827E30E 4E881E56 57EC8855 U.åWV..N.D'.1á-..K3â·ÙK1.ù.±év.µ 000080
56EC8855 00C850E5 885F5E1F C1880 1F7 49490474 0477FF45 3A26C933 FF448AA6 [.D.3èå:E.w.t.I!K1.è.^_.[]ù.U.åV 0000A0
01880574 40052087 F60C7C00 F883117D 05281E38 065E88EC 88550A76 E9008357 Wª.Ôv.U.å.^.;.+.)..«.|¯-.·.ât.¡. 0000C0
0A468AD9 F741AEF2 FFFFB9C0 330F8806 7EC457EC 885500C8 5DE588C0 3302E800 .$.3â.[]ù.U.åWá-..Ô3â¿..·ÙA%1.F. 0000E0
06067EC4 57EC8855 00C850E5 885FC28C C788C78E FF330474 0538264F AEF2F888 .«·ÙO&8.t.3..ú.ú.ô_.[]ù.U.åWá-.. 000100
1CE69A50 520AE804 C4830575 D2080975 C00858 1E 141C289A 50401C88 050C9A57 W.....âP.+...[.âu.¯@u..á.$.RP.|. 000120
FD0A468A 4F09F741 AEF2FFFF 89C03306 7EC457EC 8855C850 E5885F08 C4831E18 ...á._.[]ìU.åWá-.3â¿..·ÙA%1O.F.» 000140
575620EC 83EC8855 C850E588 5FFCC28C C78804E8 D088C033 06740538 2647AEF2 ·ÙG&8¯t.3â.ÅS..ú.ô•_.[]ìU.å.å VW 000160
07E18001 80C888F8 881474C0 0AACABF3 E07E80C0 33001089 C08ED08C 0A76C51E .év..Å.â¿..3á.-Åµ¨¯¯ât..½.â¯..Å. 000180
D207E180 0180C888 F8881974 00FF25AC D2330676 C5E7E8E0 4308EFD3 03B1E0D2 @ÅŸ.ÆŸ.CÅŠÓév.3@¯X..t..½.â¯..Å.@ 0001A0
46885657 0EEC83EC 8855C850 E5885E5F 1FDA8CFF 448DE674 E04322EF D303B1E0 ÅŸ.ÆŸ"CÅ±|.D..Ö._^.[]ìU.å.å.WV.F 0001C0
8EFA5689 F8468908 56880646 880C5689 0A468905 5D168805 5BA10075 0C460B0A ..F.u.Å[...]..F.¯V..F..V..F½.Vª/ 0001E0

Dump of file SATURN:[PCCOMMON.DUMP.PBIN]BACHCOPY.EXE;1 on 18-APR-1990 10:54:10.01
File ID (357,3,0)   End of file block 29 / Allocated 32

Virtual block number 17 (00000011), 512 (0200) bytes

F85EC4F0 034004C4 831F4605 0C9A37FF 260277FF 2604F846 83F85EC4 19E80002 ..Š.á^½.F½.&.w.&.7...F..á.ə.Þá^½ 000000
478926C0 28125EC4 1A727FFF FE81F676 89D5767F FFFE8106 74024708 26078826 &..&.G.t..±..v¦.v-.±..r.á^.+â&.G 000020
89260E5E C402C483 1F981C28 9A562FE8 000A0529 06C70007 052206C7 07892602 .&..ú."...ú.)...$/V.+....á.á^.&. 000040
08052906 C7000C05 2206C707 89260247 8926C028 125EC41F 75D00802 57892607 .&.W..Åu.á^.+â&.G.&..ú."...ú.).. 000060
F84683F8 5EC4901A E800028E FA5689F8 46890C56 880A4688 900285E9 F¡.¯8800 .¡..Ôç...F..V..F½.Vª/..$..á^½.F½ 000080
81067402 47082607 8826F85E C4F00340 04C4831F EF050C9A 37FF2602 77F ¯604 .&.w.&.7...ÿ..á.ə.Þá^½&..&.G.t.. 0000A0
7E83FE7E 89F6754F 03750005 2C8080F8 880F74C0 08FE4689 0528A1D5 767F.FFE ±..v¦Å+..F±.ât..½.§,..u.Ou-.-±.- 0000C0
13050C9A 1676FF18 76FFFE76 03037400 05283E80 F003000E 05FE4688 127400FE ±.t..F±....Þ.>(..t..v±.v..v..... 0000E0
37FF2602 77FF260E 5EC41876 7FFE3005 75020802 13C60302 28F64603 04C48320  .á..F-+@.ó.@.@u.=±.v.á^.&.w.&.7 000100
57892607 8926125E C402C483 20421C28 9A56FF00 E90E5EC4 04C48320 221C169A ..." .á.á^.Ô..V.+.B .á.á^.&..&.W 000120
5EC490FF 0FE90E5E C404C483 20861C16 9A37FF26 0277FF26 0E5EC419 75000802 ..Åu.á^.&.w.&.7.... .á.á^.Ô...á^ 000140
078826F8 5EC4FA56 89F84689 08568806 4688F456 89F24689 02578826 0788260E .&..&.W..F·.V¶.F..V..F½.Vªá^½&.. 000160
4683F85E C408C483 209C1CE6 9AF276FF F476FF37 FF260277 FF266A74 02470826 &.G.tj&.w.&.7.v¶.v·.|.. .á.á^½.F 000180
260277FF 26F85EC4 903CE8F2 46014004 C48320B8 050C9A37 FF260277 FF2604F8 ½.&.w.&.7...£ .á.ə.F·$<.á^½&.w.& 0001A0
0C9A37FF 260277FF 2604F846 83F85EC4 08C48320 D11CE69A F276FFF4 76FF37FF .7.v¶.v·.|.i .á.á^½.F½.&.w.&.7.. 0001C0
C4897502 47082607 8826F85E C4F246FF 2007C626 F25EC4F2 460104C4 83214905 .!!.á..F·á^·&ó. .F·á^½&..&.G.u¿á 0001E0

Dump of file SATURN:[PCCOMMON.DUMP.PBIN]BACHCOPY.EXE;1 on 18-APR-1990 10:54:10.01
File ID (357,3,0)   End of file block 29 / Allocated 32

Virtual block number 18 (00000012), 512 (0200) bytes

56880A46 88F45689 F2468902 57882607 8826125E C4078826 FF478826 C02AF25E ^·*â&.G.&..á^.&..&.W..F·.V¶.F..V 000000
26F246FF F25EC43F 7500FE7E 83457502 47082607 8826F85E C4FA5689 F846890C ..F½.Vªá^½&..&.G.uE.-±.u?á^·.F·& 000020
5EC408C4 83215F1C E69AF276 FFF476FF 37FF2602 77FF26F8 5EC49033 E80007C6 6..$3.á^½&.w.&.7.v¶.v·.|. |.á.á^ 000040
08260788 26F85EC4 F2460140 04C48321 88050C9A 37FF2602 77FF2604 F84683F8 ½.F½.&.w.&.7....|.á.ə.F·á^½&..&. 000060
08C48321 981CE69A F276FFF4 76FF501E 04888800 A6E90375 00FE7E83 C2750247 G.uó.-±.u.Ô!.¡¡..P.v¶.v·.|..|.á. 000080
848A1EE8 F27EC4F6 28377400 05283E80 F2460104 C4831E30 050C9A50 1E048888 ¡¡..P...O..á..F·.>(..t7+-á-·$... 0000A0
FFFE4688 46470588 2641040F 24052084 8A470588 2641040F 24F80304 81980520 -..Ÿ.Æ%$..A&..G..-.$..A&..GF.F±. 0000C0
88FE4E88 F6280788 26FE468A F246FFF2 5EC438E8 F4468CF2 7E890875 C008FE4E N±.âuÅ.-·.F¶$;á^·.F·.F±&..+-.N±. 0000E0
90E7E805 2D848AE8 7400052D 8C800E74 C00849C1 88464705 8826FFB0 07E8F27E -·$.¯.&..GF.ê|.ât..¥-..t$..-.$Ó. 000100
E5885F5E C0280007 C626F25E C40007C6 26F246FF F25E88FE 4E89F446 8CF27E89 .-·.F¶.N±.^·.F·&ó..á^·&ó..+á^_.| 000120
0646886F 75C00806 C4831F05 18DA9A08 76FF0A76 FF50C033 04EC83EC 8855C850 ]ìU.å.å.3âP.v..v..Ö....á..âuo¯F. 000140
F742E9C0 3300168A 08740001 30420E74 00033013 7400023D 42197400 00300233 3@=..t.B=..t.=..t.B=..t.o..3âÔ8% 000160
6306C708 76FF0A76 FF5016FC 46801076 FF1276FF 0C76FF0E 76FF5250 5050C033 3âPPPR.v..v..v..v..F•.P.v..v.ú.c 000180
4688F713 E90374C0 0805E9E9 03750206 7E830000 056306C7 0000FFFF 9A000105 ........ú.c....-..u.ÕÕ..ât.Ô.%.F 0001A0
75000734 3E80088E 1AA0881E 56EC8855 C850E588 FE468AE0 8A057500 067E83FC •.-..u..Å.F±.[]ìU.åV.¡...Å.>4..u 0001C0
FC07358E 06568801 073406C6 0000FFFF 9A500735 881E5007 41881E50 000A8818 .¡..P.¡A.P.¡S.P.....6.4...V./5.• 0001E0
```

```
Dump of file SATURN:[PCCOMMON.DUMP.PBIN]BACHCOPY.EXE;1 on 18-APR-1990 10:54:10.01
File ID (357,3,0)   End of file block 29 / Allocated 32

Virtual block number 19 (00000013), 512 (0200) bytes

056E8856 06EC83FC 8855CB5D E58B5E1F 00018BF3 77D43AF7 72D03A08 74C085AD Ù.åt.:ÅrK:åwµ|...^.|]ùU.å.å.V|n. 000000
744004C4 83224418 869A5306 0E74830A 47F626FA 5EC41CE8 F628FC5E 8CFA4689 .F°.^•+-Š.á^°&-G..t..S...D".á.ât 000020
04EC83EC 885590C8 5DE5885E C6880876 FA463906 D8168806 06A10CFA 46834601 .F.F°.Å•...Å.9F°vÅ.ó^.|]ù.U.å.å. 000040
5E8CFC46 89065E05 E0D1C103 E0D1C888 F9F7000C 8999056E 20044688 071606FF .....F.-n..¿..%°.àIÅ.èIÅ.^..F•.^ 000060
0A4F8026 1074D008 08578926 06478926 045EC402 C4832329 1C289A50 020088FE ±|..P.+.)#.á.á^.&.G.&.W..Åt.&.O. 000080
26064789 2640FE56 88FC4688 040A4F80 26045EC4 20E80200 0247C726 FC5EC408 .á^•&úG...$ á^.&.O...F•.V±â&.G.& 0000A0
C7260257 89260789 26085788 26064788 26045EC4 00010247 C726FC5E C4085789 .W.á^•&úG...á^.&.G.&.W.&..&.W.&ú 0000C0
83F502E9 F5C6E9C0 3300098A 08720528 1E38065E 88EC8855 C35DE588 00000447 G....|]ùU.å.^.;.+.r.¤..3àÓó%Ó@%. 0000E0
0520A780 91E175C0 855A5900 00FFFF9A 51160C76 FF0876FF 0A76FF53 CC8804EC å..äS.v..v..v..Q.....YZ.åuÅ..I-. 000100
2D87F6F5 85E9C033 00098A08 7205281E 38065E88 0CEC83EC 885500C8 50E588FD ».|]ù.U.å.å..^.;.+.r.¤..3àÕ.%-.- 000120
FA5E8C7D 74800520 87F60000 24019A50 16F4468D 51414151 51C93353 12742005 . t.S3èQQAAQ.F¶.P..$..-.-..t)_^° 000140
F20A8060 E30C4E88 F86689F2 88FA8856 57FCFC46 89FE4689 C0330856 C50A468E .F.éV.3à.F±.F••WV.°.·.f%.N.D'¯.· 000160
8A037302 28300200 8ADC8802 EC831F4E 7600A830 2378288C 9AFA5E8E 1E5275AE ÙuR..^°.¥(x#=´.vN..å..É¤..=(.s.¤ 000180
80009AE9 0028E8F4 E2AA1A74 F8380D74 0A3CAC0C 4E880716 FA88D488 E2280080 ..+ã.å.°._.N.¯<.t.;«t.¨ã¶Ô+.Õ..¯ 0001A0
887AE800 93E9FA5E 8E5F5EE1 E80014E8 E2E8FC46 FF0A80AA 001FE803 75F83800 .;«u.Ò..¨¯..F•ŠàÒ..ŠÃ^_.^°Õ..Šz¡ 0001C0
9A5016F4 46805152 1E53065E 881FE3CA 28CF881F 061E5153 50247A19 1C9AFFFC •....z$PSQ....ü+òD..^.Š.RQ.F¶.P. 0001E0

Dump of file SATURN:[PCCOMMON.DUMP.PBIN]BACHCOPY.EXE;1 on 18-APR-1990 10:54:10.01
File ID (357,3,0)   End of file block 29 / Allocated 32

Virtual block number 20 (00000014), 512 (0200) bytes

74C00808 C4831FC3 FA885858 591F0774 D808FE5E 01F45E88 1175C008 00000844 D....åu..^¶.^±.Üt..Y(X.°ù..á..åt 000000
052D87F6 FE5E8E26 E8F90020 8A03E800 1C8A0875 00098A00 01300074 00603018 .=m.t.=..¤..u.¤..Š.¤ .°Š&.^±-.-. 000020
88FC4628 FE468806 E8F9C033 001C8A0E E8F80375 1A3F8008 5E880A5E 8E0E7440 ât..^..^..?.u.%Š.¤..3à°Š..F±+F•. 000040
530856C5 1EEEE8C1 880475C9 080C4E88 F452E9C8 50E58804 72FA5E8E 5F5EF866 f%^_.^°r..|]ùÒR¶.N..èu..éŠ¥.éV.S 000060
7500098A 00013000 74006030 1774C008 1F071E00 0024F09A 5016F446 8051521E .RQ¯F¶.P.Þ$......åt.=m.t.=..¤..u 000080
751A3F80 260A880A 74400520 87F68775 C008F446 88C2E800 208AC7E8 001C8ACC à¤..Šú¤ .Šò.F¶.àuñ-.-.ât..Ö&.?.u 0000A0
56EC8855 C85DE588 01FE4F80 04740808 065E88EC 8855A3E8 C033001C 8AA6E802 .Š|¤..3àŠEU.å.^..Ut..O±..|]ùU.åV 0000C0
48A30746 A3FE2440 24E899C0 33057501 73E80005 88071E29 75003F83 07468857 WEF..7.u)..¡..Ös.u.3à.Š$â$±ÉF.ÈN 0000E0
E5885E5F 0009E8C0 8ED88C06 4E88074C 3689FFFE FE44C704 C6830001 04C79607 ..ú....ó.ùD±±..6L..N..Ä.àÒ.._^.| 000100
1573C138 48427401 A8FE88AD FC027788 F273EEF9 83FEE180 FA744100 CEE9C85D ]ùÕo.At°.Å±.°Ÿs·.w.•Ü.±´.tBH;ès. 000120
C128FE4C 89F9030C 74FE88E6 E8FE4489 F7880002 05C20334 7401A8AD F0030088 .Å.ÞÜ¨.t4.ô....%.D±Š|.±t..°.L±+è 000140
06C626C3 027F8907 541E8C26 05740138 D18CDA8C C688FE4C FEF90305 E8058948 H..Š..°±L±.ó.Õ.Ï;It.&..T....ù&ó. 000160
7401A8AD F0030088 8D73C138 48FE88F2 7401A8AD F003FE88 2574FFFE 30020758 X..=±.tX.±.ÞÜ¨.t·.±H;ès§.Å.ÞÜ´.t 000180
8C117407 580EFE26 14E8D88E 0474C008 084788E6 E8FE4489 F7880002 05C203E2 ã.ô....%.D±Š|.G..åt..ÅŠ.&±.X.t.. 0001A0
40400124 0074C638 006AE8C0 33067788 8CE83788 07501E8E 260574C7 38D78CD8 Ä.•;út.&..P..7Š¥.w.3àÒj.;ót.$.ââ 0001C0
880754A3 260474C1 38D18CD8 8C99E84E 4E960574 001CE8FE 40FE0074 005EE898 .Ò^.t.±M±Ò..t..NNŠ..Ä.|;èt.&ÈT.. 0001E0

Dump of file SATURN:[PCCOMMON.DUMP.PBIN]BACHCOPY.EXE;1 on 18-APR-1990 10:54:10.01
File ID (357,3,0)   End of file block 29 / Allocated 32

Virtual block number 21 (00000015), 512 (0200) bytes

D1047607 56163826 7FFF8A41 4149C828 037401A8 FE458851 C399C033 02478907 ..G.3à.ùQ.E±´.t.+àIAA¤..&;.V.v.| 000000
C033E575 EAD1D2F7 0875000C E8C62BC2 2302F700 72C20315 72C603C1 88F575EA ôuK.ê.ór..ór.%@#ó+óÒ..u.%@|òu|3à 000020
FE55894A D72BD688 067789FF FEFE44C7 F203F088 FE885718 74001DE8 5152C359 YùRQÒ..t.W.±.Þ.·ùD±±..W..@+•J.U± 000040
585A1FFF FA8308C4 83240527 769A1F06 50000188 5052521E D2335053 C35A5958 XYZùSP3@.RRP¡..P...v'(Š.á..°..Z( 000060
57E80775 48064688 08568800 868F3875 000A7E83 065756EC 885500C3 D2080274 t..@ù.U.åVW..-..uB¢Ñ..V..F.Hu.ÒW 000080
04C68334 735E003F E8560E46 89024488 0074F738 11744804 86368884C E8277200 .r'ŠL.6Ñ.Ht.;%t..D..F.VÒ>.^s4.ó. 0000A0
F95B0000 FFFF9A5C C0335016 52C48850 21E899FF FF880675 D2080473 0486FE81 .±Ñ.s..@u.¡...ŠIP.áR.P3àP.....[° 0000C0
024C39F7 880E4E88 C85DE588 5E5F07C0 33038804 86368902 5C891489 E675C085 .àu|...\..6Ñ..Æ3à._^.|]ù.N..%9L. 0000E0
00801E39 0675F738 C18E0388 26721C03 DA882CE8 F9F27504 86FE8104 C6830C74 t..6..±Ñ.u·°Š,.Ö..r̄&.Æ.è;%u.9.¯. 000100
880E4E88 00C30188 04879200 80168904 75F738DE 75C08500 00086A9A 51531373 ±.SQ.j....àuB;%u...¯.....|ù_.N.. 000120
D8F7AA2D 800A79D2 080E750A F9831374 C00A93FC 071E570A 7EC51E08 56880646 F..V..é-.W..•..åt..°.u..@y.¯-´%Ü 000140
88AA2704 0276393C 30040387 92F1F793 F1F70274 C0080233 92F7880A F7000283 .@.%Ö.%.3@.àt.%þ.%þ..Æ.0<9v..'¨. 000160
00C850E5 885E5F1F 580A8CF2 72C73801 4480FF44 880586AC 4F0588E2 75C308C2 ô.ùuã..O¯...D..D.;ür·.ÖX._^.|]ù. 000180
081A9A27 65073A9A 5200068A 03740008 3000058A 0874000A 3000078A 2174C008 .àt|¤..=..t.¤..=..t.¤..R.:.e'... 0001A0
F9E8C033 C85152D8 F7C42807 73C43807 14A15A59 00288006 DF9A50FF FF8828A8 ¨(¡..P.Ô.¯(.YZÀ..;ás.+á%ÃRQù3àŠ° 0001C0
0A78A399 C028FE56 89FC4689 05591688 260557A1 26076E06 8E5618EC 83EC8855 U.Š.å.V..n.&AW.&..Y..F•.V±+à.Èx. 0001E0
```

```
Dump of file SATURN:[PCCOMMON.DUMP.PBIN]BACHCOPY.EXE;1 on 18-APR-1990 10:54:10.01
File ID (357,3,0)   End of file block 29 / Allocated 32

Virtual block number 22 (00000016), 512 (0200) bytes

 1E070888 51E8FE56 89FC4689 05591688 260557A1 260A7E16 890A7CA3 0A7A1689 ..z.Ê|...~.&ÀW.&..Y..F=.V±SO¡... 000000
 F676FF17 74000BF6 5689F446 8908C483 29021E68 9A37FF26 0277FF26 FC5EC450 Pá^=&.w.&.7.h.θ).á..F¶.V~.Ât..v- 000020
 E80E37FF 260277FF 26FC5EC4 46E808C4 83013CE8 0E37FF26 0277FF26 FC5EC450 Pá^=&.w.&.7.Ò<..á.ŠFá^=&.w.&.7.Ò 000040
 2607FF26 37882628 74024708 26078826 FC5EC404 FC468335 75C00804 C4830329 )..á..âuS.F=.á^=&..&.G.t+&.7&..& 000060
 FF88CB74 C00804C4 8302F4E8 0E37FF26 0277FF26 FC5EC493 75223C80 2602478E .G.&.<"u.á^=&.w.&.7.Ô¶..á..âtù¡. 000080
 26044788 26EA5EC4 14E8EC56 89EA4689 0A7E1688 0A7CA100 00E846C7 00E2E9FF .Õ&.úFÒ..À|...~..FÕ.V&S.á^Õ&.G.& 0000A0
 9A500004 05E001E0 01E84688 E475EC46 08EA4688 E846FFEC 5689EA46 89065788 .W..FÕ.V&.FÒ.FÕ.F&uÕ.FÒ1Á1Á...P. 0000C0
 59168926 0557A326 FA568807 6E068EAD 74D008FA 5689F846 8902C483 2A6D1C28 +.m*.á..F%.V*.ÂtÙ..n..V*&€W.&..Y 0000E0
 06578826 04478826 EA5EC408 E80A7E16 880A7CA1 0555A326 E8468807 70068E05 ...p..FÕ&€U.À|...~.Š.á^Õ&.G.&.W. 000100
 89260789 2604F846 83F85EC4 02578826 078826EA 5EC41A74 C208EC56 89EA4689 .FÕ.V&.Ôt.á^Õ&..&.W.á^%.F%.&..&. 000120
 74C208EC 5689EA46 890A7E16 880A7CA1 07892602 478926C0 28F85EC4 D1E80257 W.Š1á^%+â&.G.&..À|...~..FÕ.V&.Ôt 000140
 832AD21C 169AEA76 FFEC76FF 0A7E1689 0A7CA306 57882604 4788260A 7C1EC423 #á.|.&.G.&.W.Ê|...~..v&.vÕ...θ*. 000160
 89F64689 08568806 46880000 E846C71A EC83EC88 55C85DE5 885EC028 CCE804C4 á.Šâ+â^.|}ùW.$.$.úFÒ...F..V..F-. 000180
 880A753A 3C04742F 3C08745C 3CE64688 078A26FC 5EC422E8 FE5689FC 4689F856 V%.F=.V±Š"á^=&...F|<\t.</t.<:u.. 0001A0
 9A509807 8A26FC5E C41973FC 46390C56 880A4688 FC46FFF8 5689F646 89C28CC3 û.Õ.F-.V%.F=.F..V.9F=s.á^=&...P. 0001C0
 260A5EC4 0C56890A 4689F856 88F64688 D9E8FC46 FF8F74C0 0802C483 283C22C0 â"<+.á..âte.F=Š).F-.V%.F..V.á^.& 0001E0

Dump of file SATURN:[PCCOMMON.DUMP.PBIN]BACHCOPY.EXE;1 on 18-APR-1990 10:54:10.01
File ID (357,3,0)   End of file block 29 / Allocated 32

Virtual block number 23 (00000017), 512 (0200) bytes

 83016CE8 0E0676FF 0876FF10 740C5638 0575C338 40085688 06468820 753A3F80 .?:u .F..V.ә;ùu.;V.t..v..v..Òl.. 000000
 4006462B C3880975 3A3C0474 2F3C0874 5C3CE646 88078A26 0A5EC401 62E904C4 á.Òb.á^.&...F|<\t.</t.<:u..ú+F.ә 000020
 16880A78 A18A7400 08EC5689 EA468904 C4832866 04109A06 76FF0876 FFFA4689 .F*.v..v....f+.á..FÕ.V&.Ât¤Âx... 000040
 E90375C0 0808C483 2880101C 9AEA76FF EC76FF50 1E070888 F45689F2 46890A7A z..F·.V¶¡...P.v&.vÕ....+.á..âu.Õ 000060
 260A5EC4 00A2E903 75C00808 C48328AA 1D1C9AEA 76FFEC76 FF501E07 0D88008C ¥.¡...P.v&.vÕ...¯+.á..âu.ÕÀ.á^.& 000080
 8904C483 28D71E08 9AEA76FF EC76FF20 742F3C31 743A3C35 745C3CE6 4688078A ...F|<\t5<:t1</t-.v&.vÕ...=+.á.. 0000A0
 76FF00A9 E9FFFFB8 6374C008 04C48300 8AE80E50 0876FF0F 74D00808 56890646 F..V..Ât..v.P.Õ□..á..âtc¡..Ô`..v 0000C0
 08F05689 EE468902 C4832C09 1C289A50 40FA4603 04C48328 E4050C9A EA76FFEC &.vÕ...Õ+.á..F*aP.+..,.á..FŸ.Vþ. 0000E0
 46030AC4 832C161D 469A50F0 76FF0676 FF0876FF FA76FFEA 76FFEC76 FFD574D0 Ât|.v&.vÕ.v*.v..v..vþP.F...,.á..F 000100
 C02BE846 FF9D75C0 0804C483 0057E80E 5052FA46 2808C483 2C351CE6 9A5052FA *RP.|.S,.á.+F*RP.ÒW..á..âu..FÒ+â 000120
 FE85E903 7500E87E 83FF11E9 0374D008 EC5689EA 468904C4 83173C04 109A5050 PP...<..á..FÕ.V&.Ât.Õ...-Õ.u.Õç± 000140
 E80E5052 0A7E1688 0A7CA107 E8065788 26044788 26F25EC4 0074F446 0BF24688 .F·.F¶t.á^·&.G.&.W.Š.À|...~.RP.Ò 000160
 FC468902 C4832D33 1C289A50 00088804 EC83EC88 55C85DE5 88C02804 C4830084 ...á.+â.|}ùW.$.$.¡..P.+.3-.á..F= 000180
 28FC5EC4 02578926 07892608 56880646 88FC5EC4 56E8FFFF 88057500 08FE5689 .V±.Âu.¡..ŠVá^=.F..V.&..&.W.á^=+ 0001A0
 04478926 FE5688FC 46880A78 1EC41474 0A7E0608 0A7CA104 47892606 478926C0 â&.G.&.G.À|...~.t.á.x..F=.V±&.G. 0001C0
 0A7A1689 0A78A3FF 5688FC46 880A7E16 890A7CA3 FE5688FC 46880DEB 06578926 &.W.Š..F=.V±Ê|...~..F=.V±Êx...z. 0001E0

Dump of file SATURN:[PCCOMMON.DUMP.PBIN]BACHCOPY.EXE;1 on 18-APR-1990 10:54:10.01
File ID (357,3,0)   End of file block 29 / Allocated 32

Virtual block number 24 (00000018), 512 (0200) bytes

 88260447 8826065E C40092E9 03750846 08064688 08EC83EC 8855C850 E588C028 +á.|}ùW.$.$..F..F.u.Õ..á^.&.G.&. 000000
 37FF2602 77FF26F8 5EC437FF 260277FF 26065EC4 7D740008 FA5689F8 46890657 W..F%.V*.Ât)á^.&.w.&.7á^%&.w.&.7 000020
 26F85EC4 FE5689FC 46890257 882607B8 26065EC4 347DC008 08C48329 1E1D1C9A ....).á..á)4á^.&..&.W..F=.V±á^%& 000040
 02578926 078926FE 5688FC46 88F85EC4 02578926 07892606 5EC40257 8826078B ..&.W.á^.&..&.W.á^%.F=.V±&..&.W. 000060
 06578826 04478826 065EC497 75D008FA 5689F846 89065788 26044788 26F85EC4 á^%&.G.&.W..F%.V*.Âu.á^.&.G.&.W. 000080
 00000003 22C60002 00000001 28890002 001190CB 5DE588FF 6EE90856 89064689 .F..V.Õn..|}ù.....¿(......ó".... 0000A0
 00900001 22940103 00040002 22E00103 008A0001 25790103 00050001 07140103 ..........ý%......Â"......."...... 0000C0
 00310001 01A90103 00260001 28150103 00220001 27CA0103 00970001 004A0103 ..J.......ò'..".....(..&...`...1. 0000E0
 00480001 18F00103 00410001 04540103 00400001 04440103 003A0001 24420103 ..8$..:...D...ә...T...A...Þ...K. 000100
 00000000 00000000 005C0001 01990103 00590001 06800103 004D0001 06520103 ..R...M.......Y.......\......... 000120
 6F432020 20797261 7262694C 20656069 542D6E75 5220534D 00000000 00000000 ........MS Run-Time Library - Co 000140
 70726F43 2074666F 736F7263 694D202C 38383931 20296328 20746867 69727970 pyright (c) 1988, Microsoft Corp 000160
 3C203E65 60616E65 6372756F 533C2079 706F6368 63616220 3A656761 73550011 ..Usage: bachcopy <Sourcename> < 000180
 41500045 58452E4E 41404843 4142000A 3E656061 6E6E6F69 74616E69 74736544 Destinationname>..BACHMAN.EXE.PA 0001A0
 645C000A 2E485441 50206E69 20746F6E 20657865 2E4E414D 48434142 20004854 TH. BACHMAN.exe not in PATH...\d 0001C0
 00000000 0000FFFF 0000060F 00000000 00000000 00200020 79706F63 005C6C6C ll\.copy . .........Ô........... 0001E0
```

```
Dump of file SATURN:[PCCOMMON.DUMP.PBIN]BACHCOPY.EXE;1 on 18-APR-1990 10:54:10.01
File ID (357,3,0)   End of file block 29 / Allocated 32

Virtual block number 25 (00000019), 512 (0200) bytes

00000000 00000000 00000000 00000000 00000000 00000000 00000000 00000000 ................................ 000000
00000000 00000000 00000000 00000000 00000000 00000000 00000000 00000000 ................................ 000020
00000000 00000000 00000000 00000000 00000000 00000000 00000000 00000000 ................................ 000040
00000000 00000000 00000000 00000000 00000000 00000000 00000000 00000000 ................................ 000060
00000000 00000000 00000000 00000000 00000000 00000000 00000000 00000000 ................................ 000080
00000000 00000000 00000000 00000000 00000000 00000000 00000000 00000000 ................................ 0000A0
00000000 00000000 00000000 00000000 00000000 00000000 00000000 00000000 ................................ 0000C0
00000000 00000000 00000000 00000000 00000000 00000000 00000000 00000000 ................................ 0000E0
00000000 00000000 00000000 00000000 00000000 00000000 00000000 00000000 ................................ 000100
00000000 00000000 00000000 00000000 00000000 00000000 00000000 00000000 ................................ 000120
00000000 00000000 00000000 00000000 00000000 00000000 00000000 00000000 ................................ 000140
00000000 00000000 00000000 00000000 00000000 00000000 00000000 00000000 ................................ 000160
00000000 00000000 00000000 00000000 00000000 00000000 00000000 00000000 ................................ 000180
00000000 00000000 00000000 00000000 00000000 00000000 00000000 00000000 ................................ 0001A0
00000000 00000000 00000000 00000000 00000000 00000000 00000000 00000000 ................................ 0001C0
00000000 00000000 00000000 00000000 00000000 00000000 00000000 00000000 ................................ 0001E0

Dump of file SATURN:[PCCOMMON.DUMP.PBIN]BACHCOPY.EXE;1 on 18-APR-1990 10:54:10.01
File ID (357,3,0)   End of file block 29 / Allocated 32

Virtual block number 26 (0000001A), 512 (0200) bytes

00000000 00000000 00000000 00000000 00000000 00000000 00000000 00000000 ................................ 000000
00000000 00000000 00000000 00000000 00000000 00000000 00000000 00000000 ................................ 000020
00000000 00000000 00000000 00000000 00000000 00000000 00000000 00000000 ................................ 000040
00000000 00000000 00000000 00000000 00000000 00000000 00000000 00000000 ................................ 000060
00000000 00000000 00000000 00000000 00000000 00000000 00000000 00000000 ................................ 000080
00000000 00000000 00000000 00000000 00000000 00000000 00000000 00000000 ................................ 0000A0
00000000 00000000 00000000 00000000 00000000 00000000 00000000 00000000 ................................ 0000C0
00000000 00000000 00000000 00000000 00000000 00000000 00000000 00000000 ................................ 0000E0
00000000 00000000 00000000 00000000 00000000 00000000 00000000 00000000 ................................ 000100
00000000 00000000 00000000 00000000 00000000 00000000 00000000 00000000 ................................ 000120
00000000 00000000 00000000 00000000 00000000 00000000 00000000 00000000 ................................ 000140
00000000 00000000 00000000 00000000 00000000 00000000 00000000 00000000 ................................ 000160
00000000 00000000 00000000 00000000 00000000 00000000 00000000 00000000 ................................ 000180
00000000 00000000 00000000 00000000 00000000 00000000 00000000 00000000 ................................ 0001A0
00000000 00000000 00000000 00000000 00000000 00000000 00000000 00000000 ................................ 0001C0
5F454C49 465F435F 00860000 00000000 00000000 00000000 00000000 00000000 ......................Ä._C_FILE_ 0001E0

Dump of file SATURN:[PCCOMMON.DUMP.PBIN]BACHCOPY.EXE;1 on 18-APR-1990 10:54:10.01
File ID (357,3,0)   End of file block 29 / Allocated 32

Virtual block number 27 (0000001B), 512 (0200) bytes

00000000 00000000 00000001 00000000 00000000 00000001 FFFF003D 4F464E49 INFO=........................... 000000
4550534D 4F430000 00000000 00000000 00000000 00000000 00000000 00000000 ..........................COMSPE 000020
00000000 00000000 606F632E 646E616D 606F6300 6578652E 64606300 632F0043 C./c.cmd.exe.command.com........ 000040
00000000 00000000 00000000 00000000 81818100 14000000 00000000 00000000 ................................ 000060
00000000 00000000 0000000A 0A0A0A0A 0A0A0A0A 0A0A0A0A 0A0A0A0A 0A0A0A00 ................................ 000080
00000000 00000001 FFFF0000 00000576 00000000 00000000 00000000 00000000 ...............v................ 0000A0
00000000 00000000 00000000 00000202 00000000 00000000 00000102 00000000 ................................ 0000C0
00000000 00000000 00000000 00000000 00000000 00000000 00000000 00000000 ................................ 0000E0
00000000 00000000 00000000 00000000 00000000 00000000 00000000 00000000 ................................ 000100
00000000 00000000 00000000 00000000 00000000 00000000 00000000 00000000 ................................ 000120
00000000 00000000 00000000 00000000 00000000 00000000 00000000 00000000 ................................ 000140
00000000 00000000 00000000 00000000 00000000 00000000 00000000 00000000 ................................ 000160
00010000 00000000 00000000 00000000 00000000 00000000 00000000 00000000 ................................ 000180
00000000 00000000 00000000 00000000 00000000 00000000 00000000 00000200 ................................ 0001A0
00000000 00000000 00000000 00000000 00000000 00000000 00000000 00000000 ................................ 0001C0
00000000 00000000 00000000 00000000 00000000 00000000 00000000 00000000 ................................ 0001E0
```

```
Dump of file SATURN:[PCCOMMON.DUMP.PBIN]BACHCOPY.EXE;1 on 18-APR-1990 10:54:10.01
File ID (357,3,0)   End of file block 29 / Allocated 32

Virtual block number 28 (0000001C), 512 (0200) bytes

 00000000 000000B8 06520000 00000000 00000000 00000000 00000000 00000000 ......................R.j....... 000000
 00657865 2E006D6F 632E0000 2320202B 00296C6C 756E2800 296C6C75 6E280000 ..(null).(null).+- #...com..exe. 000020
 071A1916 076A1?16 00000C80 FFFFFFFF 002E2E00 2E003F2A 00005C00 48544150 PATH.\..*?...............j..... 000040
 00000000 00000000 00000000 00020101 00000000 07261916 07221916 071E1916 ......"...&..................... 000060
 00000000 00000000 20000000 00000000 00000000 00000000 00000000 00000000 ................................ 000080
 30303652 00003E3E 4753404E 3C3C076C 077006D8 FFFF2306 00000000 00000000 .........#..Ä.p.l.<<NMSG>>..R600 0000A0
 200A0D33 30303652 0003000A 0D776F6C 66726576 6F206B63 61747320 200A0030 0..- stack overflow.....R6003..- 0000C0
 0A0D3830 30365200 08000A0D 30207962 20656469 76696420 72656765 746E6920  integer divide by 0.....R6008.. 0000E0
 73746E65 6D756772 6120726F 66206563 61707320 6867756F 6E652074 6F6E202D - not enough space for arguments 000100
 66206563 61707320 6867756F 6E652074 6F6E202D 0A0D3930 30365200 09000A0D .....R6009..- not enough space f 000120
 656D6974 206E757? 00FF000A 0D00FC00 0A0D746E 656D6E6F 7269766E 6520726F or environment...*......run-time 000140
 6E696F70 20676E69 74616F6C 6620200A 0D323030 36520002 0020726F 72726520  error ...R6002..- floating poin 000160
 70206C6C 756E202D 0A0D3130 30365200 01000A0D 64656461 6F6C2074 6F6E2074 t not loaded.....R6001..- null p 000180
 6E20200A 0D353030 36520005 000A0D74 6E656D6E 67697373 61207265 746E696F ointer assignment.....R6005..- n 0001A0
 30365200 06000A0D 63657865 206E6F20 79726F6D 656D2068 67756F6E 6520746F ot enough memory on exec.....R60 0001C0
 30365200 07000A0D 63657865 206E6F20 74616D72 6F662064 6162202D 0A0D3630 06..- bad format on exec.....R60 0001E0

Dump of file SATURN:[PCCOMMON.DUMP.PBIN]BACHCOPY.EXE;1 on 18-APR-1990 10:54:10.01
File ID (357,3,0)   End of file block 29 / Allocated 32

Virtual block number 29 (0000001D), 512 (0200) bytes

 000A0D63 65786520 6E6F2074 6E656D6E 6F726976 6E652064 6162202D 0A0D3730 07..- bad environment on exec... 000000
 00000000 00000307 6E000200 00000205 70000200 00000107 2A000200 03FFFFFF .......*.......p.......n........ 000020
 00000000 00000000 00000000 00000000 00000000 00000000 00000000 00000000 ................................ 000040
 00000000 00000000 00000000 00000000 00000000 00000000 00000000 00000000 ................................ 000060
 00000000 00000000 00000000 00000000 00000000 00000000 00000000 00000000 ................................ 000080
 00000000 00000000 00000000 00000000 00000000 00000000 00000000 00000000 ................................ 0000A0
 00000000 00000000 00000000 00000000 00000000 00000000 00000000 00000000 ................................ 0000C0
 00000000 00000000 00000000 00000000 00000000 00000000 00000000 00000000 ................................ 0000E0
 00000000 00000000 00000000 00000000 00000000 00000000 00000000 00000000 ................................ 000100
 00000000 00000000 00000000 00000000 00000000 00000000 00000000 00000000 ................................ 000120
 00000000 00000000 00000000 00000000 00000000 00000000 00000000 00000000 ................................ 000140
 00000000 00000000 00000000 00000000 00000000 00000000 00000000 00000000 ................................ 000160
 00000000 00000000 00000000 00000000 00000000 00000000 00000000 00000000 ................................ 000180
 00000000 00000000 00000000 00000000 00000000 00000000 00000000 00000000 ................................ 0001A0
 00000000 00000000 00000000 00000000 00000000 00000000 00000000 00000000 ................................ 0001C0
 00000000 00000000 00000000 00000000 00000000 00000000 00000000 00000000 ................................ 0001E0
```

```
Dump of file SATURN:[PCCOMMON.DUMP.DLL]BUSBASE.TMP;1 on 18-APR-1990 10:38:38.95
File ID (530,4,0)   End of file block 5 / Allocated 8

Virtual block number 1 (00000001), 512 (0200) bytes

 00000000 00000040 00000000 00000088 0000FFFF 00000004 00000005 01435A4D MZC.............|........a....... 000000
 00000080 00000000 00000000 00000000 00000000 00000000 00000000 00000000 ................................ 000020
 6F6E6E61 63206D61 72676F72 70207369 685421CD 4C01B821 CD09B400 0EBA1F0E ..o..Ç.ëî|.Lëîthis program canno 000040
 00000000 00000024 0A0D0D2E 65646F6D 20534F44 206E6920 6E757220 65622074 t be run in DOS mode....$....... 000060
 00000004 00000000 00000000 00000000 00048001 59843C04 00070083 0505454E NE.......<.Y..................... 000080
 00000000 00000000 00010000 00040000 0000010A 00830083 00600060 0040000F ..a.'.'.......................... 0000A0
 000A0F21 00090093 007C0E00 007C0088 00940F00 00930080 06E00F81 06D10012 ..!...A...........|...|.....!... 0000C0
 454D414E 4C4C4453 59534255 53595245 55515355 42150000 45534142 53554207 .BUSBASE...BUSQUERYSUBSYSDLLNAME 0000E0
 00000000 00000000 00004C4C 442E6573 61627375 62080000 00000302 01000001 ...........busbase.DLL.......... 000100
 00404744 00404144 004C5455 00495447 004C4D44 004D454D 00535542 00525245 ERR.BUS.MEM.DML.GTI.UTL.DAM.DGM. 000120
 4348004E 49474F4C 00474244 00454254 00445242 00444F4D 00504853 0054^544 DUT.SHP.MOD.BRD.TBE.DBG.LOGIN.NC 000140
 4553004E 59534C44 50005455 41530045 53414250 50410054 494E4953 43480( 3 S.NCSINIT.APPBASE.SAUT.PDLSYN.SE 000160
 464A424F 00474F4C 0059504F 43414400 54554C41 4E410057 49550054 53494C4. LLIST.UIW.ANALUT.DACOPY.LOG.OBJF 000180
 4D535700 4D464400 35454552 46535542 00344545 52465355 42004D41 5300444E ND.SAM.BUSFREE4.BUSFREE5.DFM.WSM 0001A0
 00485345 44414441 5300444C 49484300 544E4552 4150004F 5250004E 49474F4C LOGIN.PRO.PARENT.CHILD.SADADESK. 0001C0
 48434950 0057454E 20414400 48534544 41440054 53594C41 4E410045 4752454D MERGE.ANALYST.DADESK.DA-NEW.PICK 0001E0

Dump of file SATURN:[PCCOMMON.DUMP.DLL]BUSBASE.TMP;1 on 18-APR-1990 10:38:38.95
File ID (530,4,0)   End of file block 5 / Allocated 8

Virtual block number 2 (00000002), 512 (0200) bytes

 00454D41 4E522D41 4400454D 414E522D 41440053 45444B50 20414400 5345442D -DES.DA-PKDES.DA-RNAME.DA-RNAME. 000000
 44502D41 44005452 4556522D 41440045 4D414E52 20414400 454D414E 52204144 DA-RNAME.DA-RNAME.DA-RVERT.DA-PD 000020
 004D4947 44204144 00444144 004E4753 44204144 00524353 50204144 00474149 IAG.DA-PSCR.DA-DSGN.DAD.DA-DGIM. 000040
 44004C41 56204144 00444E49 46204144 004D524F 46204144 00454752 454D4144 DAMERGE.DA-FORM.DA-FIND.DA-VAL.D 000060
 474F4C2D 41440054 52504552 20414400 54524F50 58204144 00545250 4D492041 A-IMPRT.DA-XPORT.DA-REPRT.DA-LOG 000080
 4D492041 44004C41 504D492D 4144004D 524F4E2D 41440054 554F4241 20414400 .DA-ABOUT.DA-NORM.DA-IMPAL.DA-IM 0000A0
 004D524F 46584144 0054524F 48534144 00574144 00524554 4C494641 44004445 ED.DAFILTER.DAW.DASHORT.DAXFORM. 0000C0
 45455246 41440031 45455246 4144004E 49414C50 58414400 4C455254 4E454144 DAENTREL.DAXPLAIN.DAFREE1.DAFREE 0000E0
 5345442D 41530035 45455246 41440034 45455246 41440033 45455246 41440032 2.DAFREE3.DAFREE4.DAFREE5.SA-DES 000100
 414E522D 41530045 4D414E52 20415300 4E45504F 20415300 57454E2D 4153004B K.SA-NEW.SA-OPEN.SA-RNAME.SA-RNA 000120
 41530054 52455652 20415300 454D414E 52204153 00454D41 4E522D41 5300454D ME.SA-RNAME.SA-RNAME.SA-RVERT.SA 000140
 004C4450 4744204l 53004D46 4947442D 41530044 4647442D 4153004E 4753442D -DSGN.SA-DGFD.SA-DGIFM.SA-DGPDL. 000160
 524F4658 20415300 444E4946 20415300 4D524F46 20415300 45475245 4D204153 SA-MERGE.SA-FORM.SA-FIND.SA-XFOR 000180
 45522D41 53005452 4F50582D 41530054 52504D49 20415300 4C41562D 4153004D M.SA-VAL.SA-IMPRT.SA-XPORT.SA-RE 0001A0
 20415300 45434152 54204153 004D554E 45522D41 5300474F 4C204153 00545250 PRT.SA-LOG.SA-RENUM.SA-TRACE.SA- 0001C0
 53004D46 4944204l 53004445 4C44502D 4153004B 4349502D 41530054 554F4241 ABOUT.SA-PICK.SA-PDLED.SA-DIFM.S 0001E0

Dump of file SATURN:[PCCOMMON.DUMP.DLL]BUSBASE.TMP;1 on 18-APR-1990 10:38:38.95
File ID (530,4,0)   End of file block 5 / Allocated 8

Virtual block number 3 (00000003), 512 (0200) bytes

 45524641 53003345 45524641 53003245 45524641 53003145 45524641 53005741 AW.SAFREE1.SAFREE2.SAFREE3.SAFRE 000000
 32424400 53454450 20324244 00485345 44203242 44003545 45524641 53003445 E4.SAFREE5.DB2-DESK.DB2-PDES.DB2 000020
 00545641 53203242 44004156 41532032 42440045 56415320 32424400 57454E2D -NEW.DB2-SAVE.DB2-SAVA.DB2-SAVT. 000040
 46582D32 4244004E 4753442D 32424400 54525652 20324244 004E4552 20324244 DB2-REN.DB2-RVRT.DB2-DSGN.DB2-XF 000060
 462D3242 44004E45 472D3242 44005041 432D3242 44004C41 562D3242 44004D52 RM.DB2-VAL.DB2-CAP.DB2-GEN.DB2-F 000080
 46324244 00404946 44204144 0054554F 42413242 44005645 522D3242 44004457 WD.DB2-REV.DB2ABOUT.DA-DFIM.DB2F 0000A0
 00344545 52463242 44003345 45524632 42440032 45455246 32424400 31454552 REE1.DB2FREE2.DB2FREE3.DB2FREE4. 0000C0
 000C0002 03E00008 0004030A 00040000 03040000 00010000 35454552 46324244 DB2FREE5......å.....Ö.....A..... 0000E0
 04040020 000803FE 001C000A 03F80018 000F03F2 00140005 03EC0010 000303E6 !.....§.....'.....½.....±... ... 000100
 00080422 00340007 041C0030 00060416 002C000E 04100028 000D040A 0024000C ..$.....(.........0.....4."... 000120
 00570012 04400052 0011043A 004A0010 04340042 0087042E 003E0009 04280038 8.(...>.....B.4...J.:...R.a...W. 000140
 04640078 0018045E 00710017 0458006A 00160452 00660015 044C005E 00140446 F...^.L...f.R...j.X...q.^...x.d. 000160
 001F0482 0099001E 047C0090 001D0476 0087001C 04700083 001B046A 007C0019 ..|.j.....p.....v.....|......... 000180
 00C00024 04A00087 0023049A 00810022 049400AA 0021048E 00A60020 04880090 .... .!...!.`..."...Ÿ...#.ñ...$.å. 0001A0
 04C400E5 002904BE 000C0028 04880005 00270482 00CE0026 04AC00C6 002504A6 |.%.6.¯.&.ö.ý.'.{.¡.(.É.ƒ.).!.á. 0001C0
 002F04E2 0112002E 040C0109 002004D6 0100002C 040000F7 002B04CA 00EE002A *.Ÿ.ò.+.¼.Å.,...ø.·...É.....ã./. 0001E0
```

```
Dump of file SATURN:[PCCOMMON.DUMP.DLL]BUSBASE.TMP;1 on 18-APR-1990 ?:38:38.95
File ID (530,4,0)   End of file block 5 / Allocated 8

Virtual block number 4 (00000004), 512 (0200) bytes

 01400034 05000138 003304FA 01340032 04F4012C 003104EE 01240030 04E8011B ..ò.0.$.Ý.1.,.¶.2.4.*.3.8...4.@. 000000
 05240168 0039051E 015F0038 05180158 00370512 01500036 050C0148 00350506 ..5.H...6.P...7.X...8._...9.h.$. 000020
 00430542 01920042 053C018A 00300536 0181003C 0530017A 003B052A 0171003A :.q.*.;.z.0.<...6.=...<.B...B.C. 000040
 01C00048 056001B8 0047055A 01B00046 055401AC 0045054E 01A30044 0548019B ..H.D.É.N.E.¯.T.F.¯.Z.G.¡.'.H.Å. 000060
 058401EA 0040057E 01E2004C 057801DA 00480572 01D2004A 056C01C9 00490566 f.I.è.l.J.@.r.K.Ö.x.L.ã.-.M.õ... 000080
 005305A2 02110052 059C0209 00510596 02020050 059001FA 004F058A 01F2004E N.'...O.*...P.....Q.....R...Å.S. 0000A0
 02460058 05C0023E 0057058A 02350056 0584022C 005505AE 02230054 05A8021A ..'.T.#.Û.U.,.Ç.V.5.¤.W.>.å.X.F. 0000C0
 05E40271 005D05DE 0269005C 05D80260 005B05D2 0257005A 05CC024E 005905C6 ô.Y.N.ä.Z.W.@.[.'.Ä.\.í.8.].q.ô. 0000E0
 00630602 029B0062 05FC0292 006105F6 02890060 05F00282 005F05EA 0279005E ^.y.õ.`...Þ.'...-.ø...•.b.....c. 000100
 02CE0068 FFFF02C6 0067061A 02BD0066 06140284 0065060E 02AB0064 060802A4 Ê...d.¯...e.Ç...f.§...g.ó...h.ö. 000120
 064402F3 006D063E 02E8006C 063802E3 00680632 02DF006A 062C02D7 00690626 &.i.m.,.j.Ô.Z.k.D.8.l.Š.>.m.µ.D. 000140
 00730662 031D0072 065C0314 00710656 030B0070 06500303 006F064A 02FB006E n.«.J.o...P.p...V.q...\.r...b.s. 000160
 03510078 06800348 0077067A 03400076 06740337 0075066E 032E0074 06680325 X.h.t...n.u.7.t.v.ä.z.w.H...x.Q. 000180
 06A4037B 007D069E 0373007C 0698036B 007B0692 0363007A 068C035A 00790686 ..y.Z...z.c...(.k...|.s...).(.É. 0001A0
 008206C2 03A50081 068C039C 00800686 03940085 0680038B 007F06AA 0383007E ~...´.....¯.....Ñ.....¥...É.ô... 0001C0
 00000000 00000000 01062000 02000181 03CE03C0 008406CE 03B70083 06CB03AE Û.à...ñ.ö...å.ö...... .......... 0001E0

Dump of file SATURN:[PCCOMMON.DUMP.DLL]BUSBASE.TMP;1 on 18-APR-1990 10:38:38.95
File ID (530,4,0)   End of file block 5 / Allocated 8

Virtual block number 5 (00000005), 512 (0200) bytes

 00FE46C7 0071E983 00880006 E9037D00 880A7E81 D88EFFFF 881E5657 000002C8 à...WV.¡...Ä.-...).Õ..¡..Õq.úF±. 000000
 068E06FE 5E680A46 880050E9 0372FE46 39060DA1 26000606 8EFE46FF 0003E900 .Õ...F±....&ÀÅ.9F±r.ÕP..F.k^±... 000020
 76FF03CC B7FF2603 CEB7FF26 0008068E 06FE5E68 0038E903 7403CA87 39260008 ..&9.ò.t.Õ8.k^±.....&.ñö.&.ñë..v 000040
 008808C4 83FFFF00 009A0676 FF0876FF 0000681E 08C48300 7900469A 0676FF08 ..v..F.y..ó..h...v..v.......ó.¡. 000060
 08000200 00000300 67000200 0206CAC9 5F5E1F00 00E98300 B8FF9DE9 0009E900 .Õ..Õ..¡..Õ...^_èò.....g........ 000080
 FFFF89C0 33067EC4 1EDE8807 88EC8855 00000000 00000000 00000000 00000400 ................¯U.$.m.8.ó~.3à¿.. 0000A0
 01C6F706 468BFE87 08468ED8 8EC08CF9 2801F7AE F2FFFFB9 0A7EC4FF 758DAEF2 ·Û.u.ó-.¿..·ÜKl+*.ó.Ä.F..±.F.%ó. 0000C0
 76C51EDE 88D788EC 8855CB50 C28C1FFA 88F388A4 F3C913A5 F3E9D149 A4027400 .t.Èl1ÕµÈ.èµÈ.µ.*..ó]ùU.$.m.B.év 0000E0
 13A5F3E9 D149A402 7401A8C7 88067EC4 D1F7AEF2 FFFFB9C0 33C08ED8 8CFE880A ..±.Ä.à3à¿..·Üklö~..ú´.t.Èl1ÕµÈ. 000100
 01000800 02000106 FFFF0000 4C4C442E 00000000 CB5DC28C 1FFA88F3 88A4F3C9 èµÈ.µ.*..ó]ù.....DLL........... 000120
 00000000 00000000 00000000 00000000 00000000 00000000 00000000 00000000 ................................ 000140
 00000000 00000000 00000000 00000000 00000000 00000000 00000000 00000000 ................................ 000160
 00000000 00000000 00000000 00000000 00000000 00000000 00000000 00000000 ................................ 000180
 00000000 00000000 00000000 00000000 00000000 00000000 00000000 00000000 ................................ 0001A0
 00000000 00000000 00000000 00000000 00000000 00000000 00000000 00000000 ................................ 0001C0
 00000000 00000000 00000000 00000000 00000000 00000000 00000000 00000000 ................................ 0001E0
```

```
Dump of file SATURN:[PCCOMMON.DUMP.DLL]ABOUT.TMP;1 on 18-APR-1990 10:36:14.56
File ID (483,24,0)   End of file block 34 / Allocated 36

Virtual block number 1 (00000001), 512 (0200) bytes

00000000 00000040 00000000 00000088 0000FFFF 00000004 00000022 01265A4D MZ&."...........¦.......@....... 000000
00000080 00000000 00000000 00000000 00000000 00000000 00000000 00000000 ................................ 000020
6F6E6E61 63206061 72676F72 70207369 685421CD 4C01B821 CD09B400 0E8A1F0E ..¤..Ç.ë|¦.LëIThis program canno 000040
00000000 00000024 0A0D0D2E 65646F6D 20534F44 206E6920 6E757220 65622074 t be run in DOS mode....$....... 000060
00070005 00000000 00020000 00000000 00058009 0889C708 000A00E4 0505454E NE..õ....ú¦...................... 000080
00000000 00000000 00010000 00040000 0000016E 00A10093 00680068 00400011 ..@.h.h...Å.n................... 0000A0
000C0E21 00000000 28AC0F00 28AB00A4 000F0F00 000F00A2 077A0F00 077A0018 ..z...z.Å.......É.¨+..¯+....!... 0000C0
0001434F 5250444E 57544E45 494C4300 00005455 4F424105 0CD00F21 0CBC0365 e.¥.!.Å..ABOUT...CLIENTWNDPROC.. 0000E0
36002200 19001100 08000500 01000002 584F4254 554F4241 59414C50 5349440F .DISPLAYABOUTBOX.............".6 000100
4143534F 44084950 4148534D 50074950 47405005 4E49574D 5005534C 4E030000 ...NLS.PMWIN.PMGPI.PMSHAPI.DOSCA 000120
57534F44 084F4953 03574F44 4E495752 45544E45 434C5455 0F4C5455 03534C4C LLS.UTL.UTLCENTERWINDOW.SIO.DOSW 000140
00000000 74756F62 41204D50 20322F53 4F000000 00000302 02030102 45544952 RITE...........OS/2 PM About.... 000160
6AC876FF CA76FFCA 5689C846 890000FF FF9A006A D88EFFFF 881E5657 000040C8 àa..WV.¦...Áj.......Fà.Vò.vò.vàj 000180
046A006A FFFF68FF FF68004C 681EC876 FFCA76FF E85689E6 46890000 FFFF9A00 .......Fì.VÒ.vò.vè.hL.h..h..j.j. 0001A0
6A006A00 42681E00 4C681E00 56681E00 6A006A0C 76FF0E76 FF0000FF FF9A006A j.......v..v.j.j..hV..hL..hB.j.j 0001C0
6A006A00 6AC476FF C676FFC6 5689C446 890000FF FF9A5016 FC468000 6A006A00 .j.j..F=.P......Fá.Vó.vó.váj.j.j 0001E0

Dump of file SATURN:[PCCOMMON.DUMP.DLL]ABOUT.TMP;1 on 18-APR-1990 10:36:14.56
File ID (483,24,0)   End of file block 34 / Allocated 36

Virtual block number 2 (00000002), 512 (0200) bytes

00FFFF9A 016A5004 E0C10008 A12608 4C 068E5037 00060668 26084A06 8E006A00 .j...J.&k...7P..L.&À..èÀ.Pj..... 000000
68004868 1E036AFF AFC76FF FE76FF00 00FFFF9A 5016EC46 8DFC76FF FE76FF00 ..v±.v=.F§.P......v±.v=j.j..hH.h 000020
50C128CA 03E1D1E1 u1D18800 060E8826 084A068E F8D1C228 99F4468B 006A8000 ..j..F¶.+öì½..J.&.....¦íÃíÅ.ò+èP 000040
E001E001 C8880006 A12604A 068E50F0 4603F9F7 00038999 0008A126 084C068E ..L.&À...¿..¾*.FÞP..J.&À...àíÁíÁ 000060
01100362 9A011E05 009A084E 1E8DFFFF 018C9A00 081E8008 4C068E50 E001C103 .èíÁP..L.............N.......b... 000080
C25689C0 46890000 FFFF9A00 6A006A00 6A006A01 6A046A00 6AFC76FF FE76FF50 P.v±.v=j.j.j.j.j.j.j.......Fà.Vó 0000A0
6AC476FF C676FF00 00FFFF9A C476FFC6 76FF0000 00AD9A50 16EC4680 016A006A j.j..F§.P.Ù....vó.vá.......vó.váj 0000C0
00FFFF9A FC76FFFE 76FF016A 006A0000 00909A08 6A006A00 6A006A00 6A006A00 .j.j.j.j.j.j.......j.j..v±.v=.... 0000E0
46890000 FFFF9A0F A068006A 681E005A 681E006A 006A002C E9037500 067E8300 ..~..u.Ò,.j.j..hZ..hj.h........F 000100
6A5016CC 4680006A 006A0000 FFFF9AEA 76FF029A 68FC76FF FE76FF00 6A006AEA õj.j..v±.v=h...võ.....j.j..Fë.Pj 000120
9A5016CC 4680C876 FFCA76FF 0013E903 7500003D 0000FFFF 9A006A00 6A006A00 .j.j.j......=..u.Õ...vò.và.Fä.P. 000140
CAC95F5E 1F0000E9 00008A00 00880000 FFFF9AC4 76FFC676 FFFFCFE9 0000FFFF ....Õü..vó.vá.....¦..¤..Õ...^_èò 000160
76FF006A 006A0045 E90A4688 050EE90E 4688D88E 0008881E 56570001 70C8000A ..àp..WV.¦...Ä.F.Õ...F.ÕE.j.j..v 000180
FF2A6A50 520000FF FF9A006A 056A1076 FF1276FF 0000FFFF 9A029A68 1076FF12 ..v.h........v..v.j.j......RPj*. 0001A0
3D0008E9 000EE905 19E90000 BA000088 0000FFFF 9A0676FF 0876FF0A 76FF0C76 v..v..v..v......¦..¤..Õ..Õ..Õ..= 0001C0
16FEC086 8D266A00 00FEC086 C70000FE C286C704 E8E9FFEF E9FFB3E9 03750001 ..u.Õ°.Õÿ.ÕÕ.ú.õ±..ú.ê±..j&..ê±. 0001E0

Dump of file SATURN:[PCCOMMON.DUMP.DLL]ABOUT.TMP;1 on 18-APR-1990 10:36:14.56
File ID (483,24,0)   End of file block 34 / Allocated 36

Virtual block number 3 (00000003), 512 (0200) bytes

76FF0000 A326FE94 86880856 068E0000 FFFF9A50 16FE9086 805016FE 92868050 P...±.P...±.P.......V....±&È...v 000000
868D0000 68006AFE 8886FFFE BAB6FFFE BA9689FE 88868900 00FFFF9A 1076FF12 ..v........¦±..¤±.Å¤±.Å¦±j.hÀ... 000020
0AA326FF 50868808 58068E00 06A326FF 48868808 4A068E00 00FFFF9A 5016FEE4 õ±.P.......J...H.&È....X...P.&È. 000040
8886FFFE BAB6FF00 02A326FF 34868808 5A068E00 08A326FF 54868808 4C068E00 ...L...T.&È....Z...4.&È...Å¤±.Å¦ 000060
9A029A68 1076FF12 76FF006A 006A0443 E90463E9 00008A00 00880000 FFFF9AFE ±......¦..¤..Õc.ÕC.j.j..v..v.h... 000080
0876FF0A 76FF0C76 FF2A6A50 52000003 709A006A 056A1076 FF1276FF 0000036E n....v..v.j.j..)...RPj*.v..v..v. 0000A0
0042E908 4688005E E9037502 0A46F604 21E90000 8A000088 00000392 9A0676FF .v.......¦..¤..Õ!.-F..u.Õ^..F.ÕB. 0000C0
0002379A 006A056A 1076FF12 76FF0000 02289A02 9A681076 FF1276FF 006A006A j.j..v..v.h...(....v..v.j.j..7.. 0000E0
E903D3E9 00008A00 00880000 024C9A06 76FF0876 FF0A76FF 0C76FF2A 6A505200 .RPj*.v..v..v..v..L...¦..¤..ÕÆ.Õ 000100
FF1276FF 006A006A 0390E900 00E9FFAE E9037500 1E3DFFB6 E9037500 08300013 ..=..u.ÕÑ.=..u.ÕÜ.Õ..Õ..j.j..v.. 000120
0C76FF2A 6A505200 00032F9A 006A056A 1076FF12 76FF0000 03209A02 9A681076 v.h... ....v..v.j.j../...RPj*.v. 000140
6A006A10 76FF1276 FF037BE9 00008A00 00880000 03449A06 76FF0876 FF0A76FF .v..v..v..D...¦..¤..Õ(..v..v.j.j 000160
014A9A50 1684468D 1076FF12 76FFFE8A 9689FE88 86890000 FFFF9A00 6A006A00 .j.j........¦±..¤±.v..v..FÇ.P.J. 000180
7A681E00 04FA46C7 0038C446 C708C483 04490046 9A5016C4 4680006A 386A0000 ..j8j..Fá.P.F.I..ó.úF68.úF*...hz 0001A0
8999E001 C103E001 C8880008 A126084C 068E08C4 83011900 109A5016 CC468000 ..Fä.P......ó...L.&À...àíÁ.èíÁ.. 0001C0
068EF656 89F44689 99E001C1 03E001E0 D1C88800 06A12608 4A068EF2 5689F046 FÞ.V·..J.&À...àíÁíÁ.èíÁ..F¶.V-.. 0001E0
```

```
Dump of file SATURN:[PCCOMMON.DUMP.DLL]ABOUT.TMP;1 on 18-APR-1990 10:36:14.56
File ID (483,24,0)   End of file block 34 / Allocated 36

Virtual block number 4 (00000004), 512 (0200) bytes

 FEBAB6FF FE5689FC 46890000 FFFF9AFE B8B6FFFE BAB6FFEE 46890000 A1260856 V.&Å...FY.Ñα±.Ñ|±......F•.V±.Ñα± 000000
 89C02BF0 5688FED6 9689FE04 8689C02B F4568800 0006429A 036A006A FEB8B6FF .Ñ|±j.j..B....V¶+å..å±..ø±.VÞ+å. 000020
 B6FFFEBA B6FF0000 FFFF9A50 16FEDC86 8DFEB8B6 FFFEBAB6 FFFEDA96 89FED886 .Å±..Ö±.Ñα±.Ñ|±..É±.P......Ñα±.Ñ 000040
 B8B6FFFE BAB6FFFF FFFEBE86 C7FFFFFE 8C86C700 00062F9A 5016FED4 868DFEB8 |±..å±.P./...ú.¥±..ú./±...Ñα±.Ñ| 000060
 037400FA 83002EE9 03740002 300000FF FF9A5016 C446807B 6A006A00 6A006AFE ±j.j.j.j(.Fó.P.....=..t.Õ...*.t. 000080
 FEB8B6FF FEBAB6FF FEBE9689 FEBC8689 0000FFFF 9AFEB8B6 FFFEBAB6 FF0026E9 Õ&..Ñα±.Ñ|±.......¥±../±.Ñα±.Ñ|± 0000A0
 076A006A 50168446 80000668 1EFF6AFE B8B6FFFE BAB6FF00 00061C9A 786A006A j.j(......Ñα±.Ñ|±j..hø..FÇ.Pj.j. 0000C0
 FEC69689 FEC48689 10028300 05058656 88844688 000005D0 9A800068 006A006A j.j.h...Å....FÇ.VÑ....•...á±..ó± 0000E0
 88C04688 FECE9689 FECC8689 8E5688BC 4688FECA 9689FEC8 86898A56 88884688 .F|.Vα..à±..ò±.F¥.V/..ä±..ö±.Få. 000100
 86800080 681EFF6A FEB8B6FF FEBAB6FF FED29689 FED08689 000A8300 042DC256 Vô-...Ö...Å±..Ø±.Ñα±.Ñ|±j..h.... 000120
 681EFF6A FEB8B6FF FEBAB6FF 000005F3 9A810068 006A006A 076A006A 5016FEC4 á±.Pj.j.j.j.h...µ....Ñα±.Ñ|±j..h 000140
 0AE90374 FFFEBCBE 83000006 859A0100 68006A00 6A016A00 6A5016B4 46800080 ...FÇ.Pj.j.j.j.h......../¥±.t.Õ. 000160
 0000FFFF 9AFEBCB6 FFFEBEB6 FFFEB8B6 FFFEBAB6 FF0015E9 0375FFFE BEBE8300 ..//±.u.Õ...Ñα±.Ñ|±.Ñ/±.Ñ¥±..... 000180
 76FFFE76 FFFEB8B6 FFFEBAB6 FF0000FF FF9A5016 FEDC868D FEB8B6FF FEBAB6FF .Ñα±.Ñ|±..É±.P......Ñα±.Ñ|±.v±.v 0001A0
 9902E0C1 00080603 26084C06 8EF8D1C2 28990002 A126085A 068E0000 FFFF9AFC •.......Z.&Å...+ôÌ½..L.&....èÅ.. 0001C0
 6A006A07 6A006A50 1684468D 0088681E FF6AFEB8 B6FFFEBA B6FFBA56 11884601 .F|.Vα.Ñα±.Ñ|±j..h...FÇ.Pj.j.j.j 0001E0

Dump of file SATURN:[PCCOMMON.DUMP.DLL]ABOUT.TMP;1 on 18-APR-1990 10:36:14.56
File ID (483,24,0)   End of file block 34 / Allocated 36

Virtual block number 5 (00000005), 512 (0200) bytes

 99000806 0326084C 068EF801 C2289900 02A12608 5A068E00 0006C59A 09006800 .h...é.....Z.&Å...+ôÌ½..L.&..... 000000
 6A006A07 6A006A50 16844680 00B2681E FF6AFEB8 B6FFFEBA B6FFBA56 19884629 )F|.Vα.Ñα±.Ñ|±j..hý..FÇ.Pj.j.j.j 000020
 99000806 0326084C 068EF801 C2289900 02A12608 5A068E00 0007059A 09006800 .h.........Z.&Å...+ôÌ½..L.&..... 000040
 6A006A07 6A006A50 16844680 00C2681E FF6AFEB8 B6FFFEBA B6FFBA56 19884629 )F|.Vα.Ñα±.Ñ|±j..hò..FÇ.Pj.j.j.j 000060
 E90053E9 0000BA00 00880000 FFFF9AFE B8B6FFFE BAB6FF00 00FFFF9A 09006800 .h........Ñα±.Ñ|±.....j..α..ÕS.Õ 000080
 E9037500 2430FC8D E9037500 2330FAE2 E9037500 203DFB43 E9037500 013D0033 3.=..u.ÕC«= .u.Õã*=#.u.Õ§•=$.u.Õ 0000A0
 76FF0E76 FF1076FF 1276FF00 00E9F8FF E9037500 7A3DFBC8 E9037500 293DFC76 v==).u.Õà«=z.u.Õ.«Õ...v..v..v..v 0000C0
 00370002 00249000 0ECAC95F 5E1F0000 E90000FF FF9A0676 FF0876FF 0A76FF0C ..v..v..v......Õ...^_èò...$...7. 0000E0
 00430103 00000003 042E0002 00030001 028E0103 00F60002 000F0103 00000001 ..........-......................C. 000100
 016E0103 00070002 01EE0103 00060002 01360103 00000005 020A0002 00030002 ..............6.......¥.......n. 000120
 019A0103 02020001 003A0005 008C0002 00680103 01080002 05680103 00080002 ......h.......k.......:......... 000140
 02C50103 009A0003 050F0103 001A0002 041E0103 00190002 03D50103 00020004 ......{.........................é. 000160
 07120103 00200002 04060103 002C0002 03020103 00280002 02A50103 009F0003 ......E...+...................-..... 000180
 07680103 00AA0003 04E90103 00A90003 052C0103 00A80003 05450103 002E0002 ......E.........,...!...Õ.......k. 0001A0
 04920103 00820003 04A90103 003A0002 00220103 00AB0003 04060103 00820002 ..ý...•.........".......:......ý..... 0001C0
 01550203 00450002 03EA0103 00440002 01E00103 00410002 01C80103 00830003 ..*...à...A...Å...D...õ...E...U. 0001E0

Dump of file SATURN:[PCCOMMON.DUMP.DLL]ABOUT.TMP;1 on 18-APR-1990 10:36:14.56
File ID (483,24,0)   End of file block 34 / Allocated 36

Virtual block number 6 (00000006), 512 (0200) bytes

 00000000 00550002 03C60103 00540002 01820103 004D0002 017D0103 00260006 ..&...)...M...ý...T...6...U..... 000000
 00000000 00000000 00000400 02000200 01CB0001 881F0004 3E89D88E FFFFB81E .|...Å.>...|..ù................. 000020
 8ED88CFE 880A76C5 1EDE88D7 88EC8855 00000000 00000000 00000000 00000000 ................U.§.•.B.év..±.Å. 000040
 88F38BA4 F3C913A5 F3E9D149 A4027401 A8C78806 7EC4D1F7 AEF2FFFF 89C033C0 å3à¿...Ü%1ó-..ú´.t.ÉIIÕµÉ.èµÉ.µ. 000060
 D103D323 0818D128 0C74DAF7 D788067E C45738E3 0C4E88EC 8855C85D C28C1FFA *..ó]ùU.§.N.D8Wó~..•%Õt.+1.Ü¥£.1 000080
 F3E9D1C3 8EFFFFC3 81C38C10 E3D187AA F3C913A8 F3E9D1E0 8A0A4688 D128D187 .1+1.F..Å1Õµ¨.èµ´.ÌD..ú.û...ù1Õµ 0000A0
 5FA5F300 0A89010A BF000888E C08ED88C 5756C850 08568806 46885FAA F3C913A8 ¨.èµ¨ .F..V.]ùVW.Ä.á/Ä.¢..¿..µÉ 0000C0
 D98EA5A5 FCD88EC1 8ED98CC0 8CF8880C C38302F0 1E88F388 5756C08E D08CC85E ^ù.Å.ÅVW.µ..Þ..ù..«.å.).è.Å•ÉÉ.T 0000E0
 4E74020C F881F388 A5A5FCC1 8ED98CF8 880CC383 02F01E88 F3885756 16E8F388 .µŠ.VW.µ..Þ..ù..«.).è•ÉÉ.µ.«É.tN 000100
 8CF8880C C38302F0 1E88F388 5756C08E D08CC85E 5F03FE47 C6FC7789 02F01E89 ..Þ..w•6G±. ^ù.Å.åVW.µ..Þ..ù..«. 000120
 8CF8880C C38302F0 1E88F388 575618EB F388098E A5A5A5A5 FCD88EC1 8ED› CC0 å.).è.Å•ÉÉÉÉ.).µŠ.VW.µ..Þ..ù..«. 000140
 4FE9CB5E 5FFC7789 07FE47C6 02F01E89 0E74020C F881F388 A5A5A5A5 FCC1L )9 ).è•ÉÉÉÉ.µ.«É.t...Þ.6G±..w•_^ùÕO 000160
 4588ADFB 880CC383 02F01E88 F388FCD8 8EC18ED9 8CD88C57 5604EBD0 8C5756J5 .VW.ÅŠ.VW.Å.).è.Å•.µ..Þ..û.¯•Ù.E 000180
 26C08ED0 8CC85E5F D98EFC5F 8902F01E 89CF7402 DCF881A5 A5027403 3CA5A5FE ±ÉÉ<.t.ÉÉ.«É.tü..Þ.._•.)_^ù.Å.å& 0001A0
 DA885756 99078803 E802578B 07880AE8 99078826 C08ED08C 14E80257 88260788 ..&.W.Š..Å.å&...Š...¯W.Š¯...VW.Õ 0001C0
 02F03E89 1C74020C FF810CC7 8302F03E 8800D883 DAF7DBF7 07798024 C78AD088 .Å.ú$.y.%Ù%Õ.Ù..>Þ..ú...É.t..>Þ. 0001E0
```

```
Dump of file SATURN:[PCCOMMON.DUMP.DLL]ABOUT.TMP;1 on 18-APR-1990 10:36:14.56
File ID (483,24,0)   End of file block 34 / Allocated 36

Virtual block number 7 (00000007), 512 (0200) bytes

 5507FE45 C6FF63E9 CB5E5F0A 70E89E84 03FE45C6 0F7500FF 80C18ED9 8CFC7D89 .)=.).è...u.6E±.Ç.Òp._^üÒc.6E±.U 000000
 FE458AFC 758802F0 3E88C08E 088C5756 CB5E5F5D 0DCFE8FB 880833C8 88876080 §'..ù3Ü.«Òü.]_^üVW.Ä.Ä.>Þ..u«.E± 000020
 56C85E5F A5A50274 033CA5A5 FCFE4588 FC7D8902 F03E89B1 7402DCFF 810CC783 .ú...É.tÝ.>Þ.¯)=.E±=ÉÉ<.t.ÉÉ_^ùV 000040
 FCC033C0 8ED88C03 FE45C6FC 7D8902F0 3E898C74 02DCFF81 0CC78302 F03E8857 W.>Þ..ú...É.t..>Þ..)=6E±..Ä.Ä3â= 000060
 EB008C11 EB0C02F0 068302F0 1E88FCFB 885756C0 8ED88C02 EB008CCB 5E5FABAB ¨¨_^ù.ÄŠ..Ä.âVW.«=..Þ...Þ..Š..ÄŠ 000080
 5E5F0C02 F02E83A5 A5FC7788 0D7503FE 7F8002F0 1E88FCFB 885756C0 8ED88C02 ..Ä.âVW.«=..Þ...±.U..w=ÉÉ..Þ.._^ 0000A0
 FCF88857 56C08ED8 8C02EB00 8CE4EB50 0E885F04 92E857FC 7788012C 268955CB ùW.&,..w=WÒ.._.8]ŠÕ.ÄŠ..Ä.âVW.«= 0000C0
 07FE7F80 02F01E88 FCF88857 56C08ED8 8C02EB00 8C11EB0C 02F00683 02F01E88 ..Þ...Þ..Š..ÄŠ..Ä.âVW.«=..Þ...±. 0000E0
 02EBD08C E9EBDF87 F7881830 EBDF87CB 5E5F0C02 F02E83A5 A5A5A5FC 77880F75 u..w=ÉÉÉÉ..Þ.._^ù.ÒÒÒ..Ä.ÒŠÕ.ÄŠ. 000100
 88F88857 56C08ED8 8C02EB00 8C10EB0C 02F00683 02F01E88 F8885756 C08ED88C .Ä.âVW.«..Þ...Þ..Š..ÄŠ..Ä.âVW.«. 000120
 08158A08 0888C85E 5FA5A502 74033CA5 A5A8FC0C 02F02E83 FE478AF3 8802F01E .Þ..µ.G±..Þ..=¨ÉÉ<.t.ÉÉ_^ù|..¤.. 000140
 EB0529E8 36E80342 8A033C88 01082688 9FFFFF03 989A48EB 083EBA08 398850EB ŠP|9.¤>.ŠH.......&..|<.¤B.Š6Ò).Š 000160
 F7000283 D8F70773 589E0108 268A5005 38E89004 EB0576E8 900AEB05 28E89010 ..Ò(.Š..Òv.Š..Ò;.P.&...Xs.%Ä.@.% 000180
 8302F036 88515301 2C268955 5756034E 8A034888 01082688 9F032003 989AC3DA Òü...-...&..¡H.¤N.VWU.&,.SQ.6Þ.. 0001A0
 02F03E88 57C85E5F 5D585902 FF02EB00 FF047508 7488030A 7C8002F0 36890CEE Ý..6Þ..|...t.u..ÄŠ..@Ý[]_^üW.>Þ. 0001C0
 8001F6F8 7480FF41 F6C85F08 75F0FF41 F6087403 F8801375 7F01F6FF 32FE508A .]±2.-..u..«.t.-A.Þu._ù-Ä..t½-.. 0001E0

Dump of file SATURN:[PCCOMMON.DUMP.DLL]ABOUT.TMP;1 on 18-APR-1990 10:36:14.56
File ID (483,24,0)   End of file block 34 / Allocated 36

Virtual block number 8 (00000008), 512 (0200) bytes

 FE508A02 F03E8857 56C85F7F 2180FF32 FE508A02 F03E8857 C8F9C8E4 0803755F _u..ðù°ùW.>Þ..]±2..!._ùVW.>Þ..]± 000000
 F480AD08 7503F880 A5FCC18E D98CFC7D 89C85E5F 803180FF 320875F7 38FC7588 ¯u=;%u.2..1._^ù.)=.).ê=É.«.u.Ù.¶ 000020
 575604EB 168CE857 5602EBC0 8ED08C57 56C85E5F A880F480 ADA5A5CB 5E5FAB80 .¨_^ùÉÉÙ.¶.¨¨^ùVW.Ä.âŠ.VWÒ¥.Š.VW 000040
 565EEB00 0488F388 575604EB 16A4E857 5602EBC0 8ED08C57 5676EB00 0888F388 .µ|..ŠvVW.Ä.ÄŠ.VWÒÉ.Š.VW.µ|..Š^V 000060
 5602EBC0 8ED08C57 5644EB00 0C88F388 575604EB 168CE857 5602EBC0 8ED08C57 W.Ä.âŠ.VWÒ..Š.VW.µ|..ŠFVW.Ä.âŠ.V 000080
 575604EB 165CE857 5602EBC0 8ED08C57 562EEB00 1488F388 575604EB 1674E857 WÒt.Š.VW.µ|..Š.VW.Ä.âŠ.VWÒ\.Š.VW 0000A0
 88D88800 0088F388 575604EB 1644E857 5602EBC0 8ED08C57 5616EB00 1088F388 .µ|..Š.VW.Ä.âŠ.VWÒD.Š.VW.µ|...Ä. 0000C0
 02C383CB 5E5F5000 EC97FF01 2C268955 FC7D8710 7407FE7D 80C18ED9 8C02F03E >Þ..).ê.)±.t..)=U.&,...&.)_^ù.û. 0000E0
 88575604 EB1613E8 575602EB C08ED08C 57560FEB 02F03E88 F788164F EB01728F «r.ÒÒ..%.>Þ.ŠÒVW.Ä.âŠ.VWÒ..Š.VW. 000100
 57565EEB 000688F3 88575604 EB15F8E8 575602EB C08ED08C 575676EB 000A88F3 µ|..ŠvVW.Ä.âŠ.VWÒ«.Š.VW.µ|..Š^VW 000120
 575602EB C08ED08C 575646EB 000E88F3 88575604 EB15E3E8 575602EB C08ED08C .Ä.âŠ.VWÒÒ.Š.VW.µ|..ŠFVW.Ä.âŠ.VW 000140
 88575604 EB1583E8 575602EB C08ED08C 57562EEB 001688F3 88575604 EB15C8E8 Òù.Š.VW.µ|..Š.VW.Ä.âŠ.VWÒ°.Š.VW. 000160
 3E88D888 000288F3 88575604 EB1598E8 575602EB C08ED08C 575616EB 001288F3 µ|..Š.VW.Ä.âŠ.VWÒ..Š.VW.µ|...Ä.> 000180
 0C881CEB 00088821 EB000488 FF39E95E 1596E856 057407FE 7D80C18E D98C02F0 Þ..).ê.)±.t.VÒ..^Ò9.É..ŠIÉ..Š.É. 0001A0
 02F03E88 57560018 8803E800 1C8808EB 00008800 EB0014B8 12EB0010 8B17EB00 .Š.É..Š.É..Š.É..Š.É..Š.É..VW.>Þ. 0001C0
 087D88FC 7D89FC75 8BC08ED8 8C02F03E 890CEF83 287407F2 7D803974 07FE7D80 .)±.t9.)·.t+.ÿ..>Þ..Ä.â.u=.)=.). 0001E0

Dump of file SATURN:[PCCOMMON.DUMP.DLL]ABOUT.TMP;1 on 18-APR-1990 10:36:14.56
File ID (483,24,0)   End of file block 34 / Allocated 36

Virtual block number 9 (00000009), 512 (0200) bytes

 83CDEB15 29E802C3 83C85E5F 5D00EC97 FF012C26 89553E73 18F8832F 731CF883 .«.s/.=.s>U.&,...&.)_^ù.û.Ò).Šë. 000000
 012C2689 550C02F0 2E83F787 8FEB1514 EB02F03E 890CEF83 C47407F2 7D8002C3 ù..)·.té.ÿ..>Þ.Ò..Še.%..Þ..U.&,. 000020
 0AE4D0E8 D1410025 9F5D00EC 97FF012C 2689550C 02F02EB3 C85E5F5D 00E897FF ..Ò.)_^ù..Þ..U.&,...&.).%.AIÒÄÒ. 000040
 F03688FC C08ED88C 5756000C 8803E8FF 320F02E7 00F88AE3 D0E300C8 9E5E5FE0 Ä_^.ùÄDÄD.«ÄÓ.Ò2.Š.É..VW.Ä.â=.6Þ 000060
 3E885756 EC8855C8 5E5FF4E2 47471D88 FE448905 87A00005 89F828FE 884E4E02 .ÑN.±+«¿..Ù...D±..GGã¶_^ùU.ŠVW.> 000080
 012806C7 1CE88480 34300128 06C700C8 5DE5885E 5F1498E8 037407FE 7D8002F0 Þ..)±.t.Ò.._^.]]ù.ú.(.Ò4¯.Š.ú.(. 0000A0
 FF047400 01703E83 8A803031 012806C7 08E881B0 31300128 06C712EB 83803330 03¯.Š.ú.(.01¯.Š.ú.(.10¯..>p..t.. 0000C0
 8806851D E09A0124 8B03651B 549A012A A3E42A32 31012806 C706758C 3C016E1E .n.<.u.ú.(.12*ôÈ*..T.e.£$..Ä.ç.| 0000E0
 3E88C306 D21F6E9A 012A36FF 06C61BAE 9A50FFE4 05012AA1 068D1BAE 9A5000FD ».P.Ü.§.Ä*..ô.P.Ü.6..6*..n.@.ù.> 000100
 D901FAD1 D8D1D901 FAD1D8D1 D901FAD1 29747F80 C2F7C033 0254880C 88FC02F0 Þ.=...T.3ä%ô..t)ì°ììÄì°ììÄì°ìì 000120
 88EAE8D0 8AC888C3 F7880655 89044D89 02458900 0005C738 00C2818F E6800801 ìA.Ì..ö.8ú....E..M..U..%ù.à.ÄŠô. 000140
 D3D1E2D1 D3D1E2D1 D3D1E2D1 F88AADDC 8AF08AAD D48AC80A ADC888AD FC02F03E >Þ.=Ù.àÙ.à.âÙ.Þ.ÉU.%ìãì&ìãì&ìãì& 000160
 E0D1E0D1 38723800 20307747 E03D7FF0 25E922EC 8AF90A80 B101CA80 0374CD0A .ët..ò.Ý..'.š"Ö%Þ.=ÄGw=-.8r;ìÄìÄ 000180
 74C00817 747F803D 00800508 73000383 01C68010 7401C6F6 15720777 D13AE001 ìÄ:iw.r.-ó.t..ó..Æ.s....=..t..ât 0001A0
 F7880245 890589C0 33FED8E9 C3F78805 89C68AE3 8A024589 E50AC70A 7FE78016 ..Ó..ú.Ì.É..D.ó...%ùÖÙ±3â...E..% 0001C0
 79C008C3 88D088DA 8811E8DA F71579D2 08D83300 881DE8C3 88D088DA 88D233C3 ù3@.Ò.Ä.ùŠ..Ä3Ù.@y.%ÒŠ..Ö.Ä.ù.ây 0001E0
```

```
Dump of file SATURN:[PCCOMMON.DUMP.DLL]ABOUT.TMP;1 on 18-APR-1990 10:36:14.56
File ID (483,24,0)   End of file block 34 / Allocated 36

Virtual block number 10 (0000000A), 512 (0200) bytes

 0BDB33C8 8B1DEBC3 8BC88BDA 8BD23304 74E99EB4 8024C48A 00D8830A F7D8F707 .XUKÖ.Ü..ÂS.Ç.Ôt.30.Ô.â.ûS..â3U. 000000
 D233FF33 8024C48A 000B8309 F7D8F707 79C00BC3 8BC88B0A 8811E809 F71579C9 èy.%1$..Ô.â.û.ây.XUK1.Ü..â$.3.30 000020
 D1677500 D283C0D1 0026E803 EB0035E8 08EB002B EB0DEB00 3AEB07B5 E985608D §'.Ôç.Ô:.Š.Ô+.Š.ÔS.Š.Ô&.1â.0.ug1 000040
 2CEB00EB 002CEBC3 4E75D208 0039EB03 EB005DE8 08EB003E EB0DEB00 9CEBC3C8 âûÒ..Š.Ô>.Š.Ô].Š.Ô9..0uNûÒ,.Š.Ô, 000060
 C2010001 83000283 F5D8F7D2 F7D1F70D 79FF0BC9 330041E8 03EB007B EB08EB00 .Š.Ô(.Š.ÔA.3è..y.X1X0KAX.0..1.1ô 000080
 C3130B13 F5B1F980 CD0AE822 0185D833 001CE803 EB0056E8 C3CAD121 75000183 .1.ul1ôûÒV.Š.Ô..3Üç."Ô.ë.'.X.Ü.û 0000A0
 80F1220F B6F98808 EE8391AD 91AD93AD D60A92AD 00A4E9FD E9E9C301 72000283 .0.r.ûÖÖ»ÔÊ.Ü..0Ü.Ü.Ü..Ÿ..'Ñ."þ. 0000C0
 EB25E983 CA7F20F9 83787203 FEE98108 74C90BE9 D1E9D1E9 D1E9D17F E58010CE ö..Ï.1Ô1Ô1Ô1Ô.ètÂ.Ô±.rx.' .ò.ÔXS 0000E0
 0BDCDDF9 D100E400 7FE183F9 8BE98A04 EE83C186 ACC88AAD F88AACDA 8AD2332F /30.Ô¯.ŸÜ.â¯.è.Ÿ..Ô.'.Ã.ÂÔÂ1'ÂÉ. 000100
 01E28002 D0F501FA 801A7C08 F98009F7 20E98399 7F20F983 47727EE9 804D74C9 ètM.Ô~rG.' ...Ô X1.'.|..'.XÂ0.ã. 000120
 D1D8D1EE D000DA80 01B201FA 8015E3E1 EB08E980 F632E68A C48AF88A DF8AD30A .Æ.Ô.½.â.12-.Ô.ŠÂD..'.ÿ..Ô.ÂŸ1Â1 000140
 0068E8FD 35E9C300 88C03300 D1800081 F9C3C388 D088CA8A F3E20002 80""D0D8 ÜÂÔ.0.âµ.ò.Â.ûû'Ÿ..1.3â.ÂûÔ5»Ôh. 000160
 C3FE8806 7C89E073 7FF0FA81 7FE680D7 8810EF83 067C0302 F0368801 31EE 780 ¯.Ô1..6Þ..|..ÿ..0.1..'Þ.sÂ.|..±û 000180
 737F80FA 817FE680 D7880080 EF81027C 0302F036 880108E8 03800087 E8FDU.E9 Ô.»Ô..¯.Ô...6Þ..|..ÿ...0.1..'..s 0001A0
 EF8102F0 36880053 E8C3FE88 067C0110 EF8302F0 3688001E E8C3FE88 027C89DF Ô.|..±ûÔ...6Þ..ÿ..|..±ûÔS..6Þ..ÿ 0001C0
 00108A02 F03688C0 8EA5A5A5 A5C18ED9 8CC08C02 F03E88FC C3FE8802 7C010080 ...|..±û0.>Þ..â.1.éÉÉÉÉ.â.6Þ.¤.. 0001E0

Dump of file SATURN:[PCCOMMON.DUMP.DLL]ABOUT.TMP;1 on 18-APR-1990 10:36:14.56
File ID (483,24,0)   End of file block 34 / Allocated 36

Virtual block number 11 (0000000B), 512 (0200) bytes

 E9D1E9D1 E9D1E9D1 0035B87F E580CF88 F0E78306 4C89CA0A 0FE183F9 88064C88 .L..'.Ã..ò.L..ÔÞ.ü.Ï.¡5.1Ô1Ô1Ô1Ô 000000
 02F0368B C08EA5A5 C18ED98C C08C02F0 3E88FC00 82E93FEB D9F7047D 0433E981 .Ô3.).X1S?Ô..0.>Þ..â.1.éÉÉ.â.6Þ. 000020
 32C08AE1 D1001888 7FE580CF 8880E783 024C89CA 0A7FE183 F988024C 8B00808A ¤...L..'.Ã..ò.L..Ô..ü.Ï.¡..1Ã.ë2 000040
 00E581EF 8BC8880A 74C83BFA 0B8000E7 81147CEF 8BC83BD9 F7487000 96E981ED Ú.Ô..)H%1;â.ÿ|..Ô...';ât..â.ÿ.Ï. 000060
 348AE7EB 4608E980 0004C614 0A000280 00B2F501 FA80147C 08F98002 33EA2B80 .+Ô30.'.|..'.%ÿ..0...Ô...Ô.FSÔ.4 000080
 D106E3E1 8AEF8A00 018BC334 8AD18BC9 33C32C88 EB22EE8A D7C18A01 2EB80CE3 Ô.É...è0.Ÿ"Ô.,û3è.1.4ûÉ...ÿ.ÂD.1 0000A0
 9802F00E 8BE2D3CC 8AFD8802 74000A80 01B281FA 80030ADE 22D70AFA E2D7D0EA ÔÂ00'.0"8.Æ.'.ÿ..Ô.t..».âÆã..Þ.. 0000C0
 CC80FBC8 E9C3F5D3 D14C747F 80C3F7C3 FAE20014 804606E3 3488F202 CE28C803 .â+ö.·.4D.F...â'ûKû..tL1ÆXûÔâ«.ä 0000E0
 F77F80C3 F7D3F7E2 7400F77F 80A9D0F7 E1747F80 A9025D88 26024488 C3E4D07F .ÂÔû.D.&.].`..tÃ%Â`..%ÂtâXÆXû..% 000100
 04880575 C338DA8E C18ED98C C28CF7B7 930B73E0 D1E3D1D5 78EF32EC 8AD874D3 ÆtÃ.Š2ÿx11D1Ãs...X.Ô.1.è.Ô;ûu... 000120
 F0A9065D 88260644 88C3E4D0 7FCC80FB 75E9C3F5 D3D15E74 7FF0C3F7 C3053826 &;.ûKûÞ.t^1ÆXûÔu«.ä.ÂÔû.D.&.].`Þ 000140
 E001E3D1 D578EF32 EC8AD874 D3F77FF0 C3F7D3F7 E274D0F7 7FF0A9D0 F7E1747F .tÃ%Â`Þ.%ÂtâXÆXûÞ.%ÆtÂ.Š2ÿx11D1Â 000160
 45382602 44880E75 04453826 04448817 75C338DA 8EC18ED9 8CC28CF7 87930B73 s...X.Ô.).è.Ô;ûu..D.&;E.u..D.&;E 000180
 80CF8000 82358A01 50880245 8803E880 F4800245 88F787C3 05382604 88057502 .u...&;.û.X.E..¶.Š..E..]..Sÿ..ü. 0001A0
 73EC3A58 74E40A65 74ED0AC0 D1C1D180 00CE81FF 00E78101 7488FF7C 88024C88 .L..|..t..Ô...ö..1è1â.Üte.Ôt(:Šs 0001C0
 7C0EF980 55E30085 CD8A91D9 D0E8D0C9 D049771B FC800CF6 E52A91FA 87F38705 ..µ.'.'|-É.0.w1ÂèÂÔÂ1..ëç.DU.'.| 0001E0

Dump of file SATURN:[PCCOMMON.DUMP.DLL]ABOUT.TMP;1 on 18-APR-1990 10:36:14.56
File ID (483,24,0)   End of file block 34 / Allocated 36

Virtual block number 12 (0000000C), 512 (0200) bytes

 8A01CE80 0374D20A 2B7E05F9 803E741D 7210E980 DB33D388 01CB8003 74D20B12 ..0t..û..Æ3U.Ô.r.t>.'.-+.0t..ò.. 000000
 E800C188 D788DE88 19EBF875 C1FED3D1 E2D12374 177708E9 80FD8A0F 8AF38AD6 0.µ.Ô.».Ô.w.t#1â1Æ±èuKŠ..0.0.éÂÔ 000020
 13D70314 70E00020 CA800374 3FC2F6FA E2DAD1E8 D120CA80 03743FC2 F60097E9 Ô..-ô?t..ò 1Š1Ôâ'-ô?t..ò ÂÂp..0. 000040
 F5DAF7D3 F70A730E 8BD788F3 1BFA28FA 41E94575 FFFC80C4 FEDAD10B D150730E 8sP1Ü1Ô±ô.0.uÉÔA'+'.µ.0.8s.%Æ%Ô% 000060
 8AF88A58 7608EC80 0F75FF0A 6474D80B DA876A76 10EC800B 75DB0800 F6000383 .Æ.-Â.Üu..Š.vj.Ô.Ütd..u..Š.v(.«. 000080
 80FA8001 7CE90374 0001363E 80F671D3 D1E2D14B 74CCFE0A 78FF0AD2 32F28ADE 8.·20..x.±âtK1â1Æq-.>6..t.Ô|..'. 0000A0
 747F80A9 D8D1E000 3A74FFFC 80C4FE07 73000383 01C6800F 7401C6F6 14720777 w.r.-ô.t..ô..Æ.s.±ô.0.t:ÂÂ1Â`..t 0000C0
 E9037400 01363E80 C3F78805 89C68AE3 8A024589 02F03E8B C70A7FE7 80802417 .Š..Ô..û.>Þ..E..D.ô...%û.>6..t.Ô 0000E0
 E40AD8D0 E0019634 88ADFCF9 9DE9E679 C3F78805 89024589 02F03E8B C033017E -.3â.>Þ..E....%ûÿ1Ô.'0Ü.4.1ÂÂÂ.ô 000100
 80C48003 70E5027F ED8080EC 80C132D8 8B3D8BC8 74ED0AD9 D0E1D102 40B80674 t0.M.1ÃÂ1.Ütû.=.Â2è.Š..Ú..1pÆ.ô. 000120
 E7F7C58B 509FC00B DA8BE7F7 C68BE888 80C98080 C880EF8A FF3250CD 74FFFC80 .0.tëP2..ÿ.ù..è..Š.ô%Ô.Ô.â.P.é%Ô 000140
 5893038B C703E1F6 C58B01C8 8003749E 58FA13D8 03E6F7C1 8BFA8800 D2830803 .Ã.0..'.é%1.Ã.'X.t..ù..é-Ã.ú.Æ.X 000160
 E1D1024D 8BF787FF 1AE9AD74 FFFC80C4 FEFF69E9 0A75E40A D3D1E2D1 0B78FF0A ..x.1â1Æ.Ôu.Ôi.±ô.0.tÜÔ...%.M.1Ã 000180
 FF7BE903 71E52A7F ED8081EC 80C132D8 74E40A5C 74ED0AD8 D0E00102 44880900 Â1.D.1ÂÂÂ.Üt\.ÔtÜ2è.Š..Ú.*1q.Ô(. 0001A0
 D9D1E8D1 08740001 363E8080 CF80C932 2D8A0150 8BFF78E9 0375FFFC 8080C480 .ô..0.u.Ôx..]..-2è.ü..>6..t.1Š11 0001C0
 74D68BC2 0B0011E8 EE8B001A E8D8D1EA D180CE80 C032248A 01548B50 01363E02 .>6.P.T..$2â.ö.1Ô1ÂÔ...ŸÔ...ô.0t 0001E0
```

```
Dump of file SATURN:[PCCOMMON.DUMP.DLL]ABOUT.TMP;1 on 18-APR-1990 10:36:14.56
File ID (483,24,0)   End of file block 34 / Allocated 36

Virtual block number 13 (0000000D), 512 (0200) bytes

 18D8F7E1 F7C688FA 8815E3C0 3396F3F7 1D73033B F880E9FF 76E90D88 01CA8003 ..ò..ÌÕv.Õ¯ħ;Æs.¾µ.3àD..ª.6¾Å¾Å. 000000
 2E8A0001 3606C3C3 ED73C188 D003C12B FFFF8EC3 F9730313 C1034E07 730788FA ª.ãs.N.è.Æsªù/..+è.Å.èsÙù6.6.... 000020
 D2335253 50013902 F006C702 F036FF38 74E40A3C 77EC3A0E ED800774 ED0A0138 8..Ut..Ù.:ãw<.ðt8.6Þ.ú.Þ.9.PSR30 000040
 FE33E902 F0068F58 585AFE0F E8FF3252 53500130 02F006C7 585B5AFE 4EE80832 2ÙÒN±Z[Xú.Þ.=.PSR2.Ò.±Z[X..Þ.Ó3± 000060
 38A30139 A3C033FE 1AE85253 50013002 F006C702 F036FF01 36A2D233 DB33C033 3ã3Ù30À6..6Þ.ú.Þ.=.PSRÒ.±3âÈ9.Ê; 000080
 E60A80E6 807FE480 ADA5A5A5 02F03E88 F78810E8 8000F581 066D88F7 87D3EB01 .Sæ.¾.m..¾..Š..¾.>Þ.ÈÈÈÙ.ð..Ì..Ì 0000A0
 38E0E583 D274FFE0 25DAD0E0 D1DED0E5 D1064488 FC066D88 C3FE8802 F0368BA8 ¨.6Þ..±ú.m.=.D.ÌÌÀBÌÀÀÒ¾À.t0.ÌÀ; 0000C0
 C00157D0 D1E2D0D0 D1E6D089 7706A030 D8F7C528 C274C008 D68695F7 870977E8 Ðw..¾..ø.àtò+é¾À=..w¿ÀÌÌÌÀâÌÌWÌá 0000E0
 0EFF8363 74FF0810 CC800FE4 80AD93AD 91AD92C0 32E08AAC F888E086 C001C001 Ìâìâ.À.¾¯.Â2à.Ù.Ù.Ù.Ò..ä...tc... 000100
 0A2B7C06 FF832372 4874E777 10EF83C0 33D888C8 88D18801 C9800374 D208187C |..0t..è..Ì.ù.Ã3â.ÿ.wÒtHr#...|+. 000120
 D1E2D123 740F7708 EF83E432 C48AF88A DF8AE88A CD8AF18A D68A01CE 80037402 0t..ö..ø.Þ.ë.Š.Ò.¾.620.ÿ.w.t#Ìäì 000140
 CF87F6E2 DAD1DFD1 D8D1E8D1 20CA8003 743FC2F6 CF8716E8 F57547D0 D1D3D1D1 ÌÌÆÌÀGu¾Š..ü-ò?t..ò ÌÒÌÙÌÒÌÒä-.ü 000160
 05748850 9F50035C 13014C13 34020800 E5D13870 E5D120CA 8003743F C2F6975E ^.-ò?t..ò Ìlp;ÌÌÀÀ.4.L..\.P.P.t. 000180
 FD8320C5 830AD109 D1D8D1DF D1137420 00C7F7FE 13589E58 1000CEB1 0FFFE681 .Ì...ö..X.X.±¾ú. t.ÌÒÌÙÌÌÌÒ.é .» 0001A0
 810FFFE6 819F0574 88035C18 014C1834 2AD0F6D8 D0E5D100 88E9F6EC E90375E0 Åu.Òš-Ò..ÌÌÀÀ-À*4.L..\..t...Ì... 0001C0
 0800048E FCFE130E 13CE13F5 DAF7D1F7 D3F7D7F7 00F6F633 1373FE18 9E1000CE ö....±s.3--À¾a¾Æ¾Ì¾Ò¾.ö.8.±=/... 0001E0

Dump of file SATURN:[PCCOMMON.DUMP.DLL]ABOUT.TMP;1 on 18-APR-1990 10:36:14.56
File ID (483,24,0)   End of file block 34 / Allocated 36

Virtual block number 14 (0000000E), 512 (0200) bytes

 751FE0C7 F7E4EBD2 33CA88D9 88F8883D 744E4076 0200ED81 1375E0C7 F61875FF .u.-úÀu..Ù..v@Nt=.«.).ò30S0¾úÀ.u 000000
 83127510 00C7F797 0082F28A CE8AE98A DD8AF88A C78AE08A 97277601 00ED8118 ..Ù..v'..À.ú.«.Ì.Ò.ö.·ÿ..¾ú..u.. 000020
 7780FA80 0385E903 7400014E 3E80FC90 65E8E8E8 D7D1D3D1 D1D1E2D1 717420ED Ù tqìâÌÌÌÆÌæSSSe.ø.>N..t.Ò...ª.w 000040
 E0FD8320 C5830874 2000C7F7 00078300 D3830001 8301C680 1A7401C6 F61F7207 .r.-ó.t..ó..1..Æ..ø.¾ú. t..é .»À 000060
 50880645 89C70AC5 08C032E0 862274ED D10FE780 80240E87 02F03E88 F7883074 t0.¾.>Þ..8$..Ò.ÌÙt".Â2à.é.ú.E..] 000080
 0377E903 7400014E 3E80FCF5 FDE90379 C3F78805 EF83ABC6 88A8C188 AAC68A05 ..ó¨.è¨.ó¨.ÿ..¾ùy.Ò»¾ø.>N..t.Òw. 0000A0
 81013306 4D880874 7FF025D0 88064488 FCC3FE88 ABABABAB F78802F0 3E88C033 3â.>Þ..¾¨¨¨¨.±ü=.D..À¾Þ.tÙ.M.3Ì. 0000C0
 D8D1E6D0 8674FFE0 30800005 8C70C103 7FE0E981 80002DE1 01E0D100 747FF0E1 ÀÞ.tÀÌÀÌÀ-...ÒÀ..èp¥...=À.tÑÀÌÌÀ 0000E0
 0A75E008 D7D1D301 D1D1E201 0E751000 C7F7D800 E5D15D01 CA800374 0181E850 PÒ..t..ò.]ÌÌÌÀÀ¾ú..u.ÌâÌÌÌÆÌø.Ùu. 000100
 4488EF74 7FF0E181 D188064D 88FCF787 F58CE9FF 24E98874 E0FD8320 C58393EB Š..é .»Àt.Ò$.Ò.¾.¾=.M..1.ÀÞ.tÿ.D 000120
 D09874FF E0308000 0598708C1 287FE0E9 8180202D E1D1E0D1 98747FF0 25003306 .3À¾Þ.t.ÌÀÌÀ- ..ÒÀ.+èp....=À.t.À 000140
 ADFD014C 8F05C683 F7885092 10CC800F E480A092 AD93ADC9 32E88AAC 50D801E6 ÌÌAP¯.Ò2èÙ.Ù.Ù.Ò..ä..P.¾.6.«L.»Ù 000160
 E888ADF7 88014CBF FD1F7400 014E3E80 0005C6FC A44746A5 A5AB10CC 800FE480 .Ò..ø.¨ÈÈFGÈ=6...>N..t.»«L..¾Ù.Ò 000180
 E8090108 D1D801EA D158FCA8 D801ADA8 D801ADA8 D801ADED D1A8014E 2602E801 ÌÒ.ÆN. ¨ÌÙÙÌÀ¨ÙÌÀ¨ÙÌÀ¨=XÌÒÌÀÌÙÌÌÒ 0001A0
 C2F601CA 8003745F 58590788 C208C108 C3080033 E8570037 E857003B E857003F ?.WÒ;.WÒ7.WÒ3..ù.é.ô.øY[_t..ò.-ô 0001C0
 08E90AD1 D9D1D8D1 EFD1DAD1 D9D1D8D1 EFD1DAD1 D9D1D8D1 EFD108CA 80037407 .t..ò.ÌÿÌÙÌÌÌÒÌÿÌÙÌÌÌÒÌÿ¯ÙÌÌÌÒÒ. 0001E0

Dump of file SATURN:[PCCOMMON.DUMP.DLL]ABOUT.TMP;1 on 18-APR-1990 10:36:14.56
File ID (483,24,(   End of file block 34 / Allocated 36

Virtual block number 15 (0000000F), 512 (0200) bytes

 C0080146 A1F588ED 339752F6 F73877F0 38047502 085C7306 38FF3301 4C3688FF ..6L.3.;øs\.øu.;Þw;¾-R.3Ù.¾ÀF..à 000000
 83E803E7 F70874C0 08014AA1 EA13F003 E7F70674 C0080148 A150F288 E7F70474 t.¾Ò.·PÀH..àt.¾Ò.Þ.òÀJ..àt.¾Ò.Ò. 000020
 014A0613 01481E13 01460E03 4F137393 919295E8 18500018 CE18DAF7 5A920002 ø..Z¾Ò.ö.ì).Ò....s.O..F...H...J. 000040
 1688C213 014A1E13 01480E03 014A0618 01481E18 01460E28 4FC3ED73 014C1613 ..L.sÙÙO+.F...H...J...H...J..ò.. 000060
 88E888D8 330144A3 100C0F24 06458A01 42A3100C 0F24E432 06448AC9 E8F50146 F.¾Šè.D.20$...ÈB..E.$...ÈD.3Ù.Š. 000080
 E033550A 13C803E2 F70674D2 08025588 0488CA88 E888E1F7 08E30D88 911AE30C .D....D.¾Ã.Ò.ò...U..øt.¾ã.à.ÒU3Ù 0000A0
 0074C008 02448850 C1085805 01DA13C8 03E2F708 74D20815 880E74C0 08024488 .D..àt....øt.¾ã.à.ÒÌÌX.èP.D..àt. 0000C0
 D803E2F7 0874D208 0455880F 74C00804 88C933EA 13D803E2 F70674D2 08025588 .U..øt.¾ã.Ã.õ3è...àt..U..øt.¾ã.Ã 0000E0
 048850C3 08580001 83EA1308 03E2F709 74D20815 880F74C0 08044488 D1D1EA13 .õÌÌ.D..àt....øt.¾ã.Á.õ.Ì.X.ÙP.. 000100
 08024488 D833CA13 E8030142 26F70874 C0080588 CA13E803 014426F7 0874C008 .àt.¾&D..Ò.ò...àt.¾&B..Ò.ò3Ù.D.. 000120
 0974D208 02558810 74C00804 44880301 CA13E803 E2F70874 02080455 880F74C0 àt..U..øt.¾ã.Ò.òÌÆ.D..àt..U..øt. 000140
 C0080244 880A13C8 03014226 F70874C0 08024588 ED335500 0383CA13 E803E2F7 ¾ã.Ò.ò.Æ.U3Ù.E..àt.¾&B..à.Ö.D..à 000160
 D5D1DA13 C803E2F7 08740208 0455881A 74C00804 4488DA13 C8030144 26F70874 t.¾&D..à.Ö.D..àt..U..øt.¾ã.à.ÒÌÌ 000180
 4426F601 42A0EA13 D8030142 26F70874 C0080445 88EA1308 03014426 F7044488 .D.¾&D..À.õ.E..àt.¾&B..Ã.õ.B.-&D 0001A0
 F6085ED7 D1D3D1D1 ?1E2D107 01D3D1D1 D1E2D107 01D3D1D1 D1E2D15A 97C50301 ..é.ZìâìììÆìaìâìììÆìaìâìììÆìa^.- 0001C0
 06C702F0 36FF4C74 ED085077 F53804C0 EE810874 F608014F 36880001 4E06C6C3 ùó.N...6O..-t..Ÿã.;¾wP.ÙtL.6Þ.ú. 0001E0
```

```
Dump of file SATURN:[PCCOMMON.DUMP.DLL]ABOUT.TMP;1 on 18-APR-1990 10:36:14.56
File ID (483,24,0)   End of file block 34 / Allocated 36

Virtual block number 16 (00000010), 512 (0200) bytes

 50015902 F006C758 595A585D 5FFC3EE8 D233C933 DB335755 53525150 015102F0 Þ.Q.PORSUW3U3è3ÉÒ>ø_](ZYXú.Þ.Y.P 000000
 33DB33D2 33C933C0 33FC1AE9 02F0068F 58595A58 505FF8D1 E8FF3357 55535251 QRSUW3.Öì«_](ZYX..Þ.Ö.ø3á3è3ø3Û3 000020
 ABABC033 0151PFF8 F8E85755 53525150 015902F0 06C702F0 36FF014E A2FF33ED Û3.ÅN..6Þ.Ü.Þ.Y.PORSUWÕ½««Q.3á`` 000040
 26065E88 0C740102 F787F608 8898078A 26065EC4 565704EC 83EC8855 C6EBABAB ``Š6U.Š.Š.WVá^.&....Å-.¥..t..^.& 000060
 F787F608 8898058A 2647F888 16740065 3098078A 26065E88 07E80020 0598078A .... .Š..^.&...ªe.t..«G&....Å-.¥ 000080
 078A2606 5E8B2E07 C6260646 FFF08898 078A2606 5EC40846 8C067E89 F2750402 ..u·.-..F.á^.&....Þ.F.&ó...^.&.. 0000A0
 06EC83EC 8855CB5D E5885F5E FC7E89E9 75C00A06 46FFF788 078826C6 88F88898 ..½.ó&...¥.F..âuÕ.-ø^_.Î]ûW.Š.Š. 0000C0
 0646FFDF 88084680 067E89F3 75003080 26470774 2E308026 9008E806 7EC45657 WVá-.Š..&.ª.t.G&.ª.uµ.-..F..Ô.F. 0000E0
 89E07500 30802647 07744530 80260074 65308026 900EE806 7E886774 003F8026 &.7.tg.-.Š..&.ªet.&.ªEt.G&.ª.uÚ. 000100
 89F97430 3080264F 9002E806 7E88FE56 89FC4689 064EFFC2 8CC78808 468C067E -..F..ú.ô.N..Fø.V±.-.Š..O&.ª0tº. 000120
 078826AC 065EC406 46FFFC76 C5FA5E8C 064EFF03 752E3F80 260F8808 468C067E -..F..Ô&.?.u..N..^ºévø.F.á^.¯&.. 000140
 15460112 9A085C1E 80EC8855 90C850E5 885F5EFA 5E8EFE5E 8CFC7689 F275C00A .âu·.vø.^±.^º^_.Î]ù.U.Š..\....F. 000160
 565708EC 83EC8855 C850C028 C8500001 88057215 6F05929A 154800F2 9A065EC4 á^..·.K....o.r.¡..]ù+â]ûW.Š.Š.WV 000180
 A5A5DA8E 1EF088F8 88085EC4 04C48315 931BFC9A 0C76FF0E 76FF2474 00067E83 .-..t$.v..v..ø....á.á^..«.Þ..OÉÉ 0001A0
 1E0716F0 88F87E80 04C48315 AD1BFC9A 0C76FF0E 76FF90C8 5DE5885F 5E1FA5A5 ÉÉ.^_.Î]ù..v..v..ø.Ù..á..-½.Þ... 0001C0
 885590CB 5DE5885F 5E162902 659A085E C4158501 129AF85E 8D1FA5A5 A5A5DA8E .ÖÉÉÉ..^½...ç.á^..e.).^_.Î]ù.U. 0001E0

Dump of file SATURN:[PCCOMMON.DUMP.DLL]ABOUT.TMP;1 on 18-APR-1990 10:36:14.56
File ID (483,24,0)   End of file block 34 / Allocated 36

Virtual block number 17 (00000011), 512 (0200) bytes

 3F8326F8 5EC4FA56 89F84689 0CBE1688 0CBCA147 74000168 3E805657 0AECB3EC &.&.WV.>h..tGÀ¥...ƒ..F½.Vºá^½&.? 000000
 EB0001B8 067E000E 7E83FE56 89FC4689 0C5688 0A 4603C028 02EB0001 88057520 -u.¡..Š.+â.F..V..Fø.V±.-..-.¡..Š 000020
 260477FF 260677FF 26065EC4 58EB06C4 83045DE8 0EFC76FF FE76FF50 C0289003 ..+âP.v±.vø.Ô]..á.ŠXá^.&.w.&.w.& 000040
 7E000E7E 8350400E 46885052 FA5689F8 468908C4 8316671D FA9A37FF 260277FF .w.&.7.º.g..á..F½.VºRP.F.@P.-..- 000060
 880A4603 C703C028 02E80001 88057520 3F8326F8 88F85EC4 C02802E8 00018805 .¡..Š.+ââ^½.½&.?-u.¡..Š.+â.ú.F.. 000080
 75203F83 26F85EC4 FE5689FC 46890C56 880A4688 0AC48316 C11C529A 50520C56 V.RP.R.è..á..F..V..Fø.V±á^½&.?-u 0000A0
 5E88FC46 FF078: '6 01478A26 FC5EC414 7E000E7E 832007C6 26FC46FF FC5EC40A .á^ø.Fø&ó.-.-..-.á^ø&.G.&...Fø.^ 0000C0
 109A5052 FE568ı;C 46030E46 0308F7C0 18010168 3E80501E 0162882E 07C626FC ø&ó..¡b..P.>h...âŠÅ.F..Fø.V±RP.. 0000E0
 26F85EC4 FC46FF45 07C626FC 5EC40774 00107E83 FE5689FC 468908C4 8317F800 .«..á..Fø.V±.-..t.á^ø&ó.E.Føá^½& 000100
 C626FC5E C4F08808 F7087DF6 08F08848 02478826 F85EC45E 74303F80 26065FC4 á_.&.70t^á^½&.G.H.Þ.-).ŠÅ.Þá^ø&ó 000120
 FFF288F9 F799C688 070026FC 5EC4F9F7 00648999 C688157C 64FE83FC 46FF2007 .¯.Fø.±d|..ó.¿d.¥ºá^ø&...ó.¥º.·. 000140
 C4FC46FF F288F9F7 99C68807 0026FC5E C4F9F700 0A8999C6 88157C0A FE83FC46 Fø.±.|..ó.¿..¥ºá^ø&...ó.¥º.·.Føá 000160
 FF010168 06C604EC 83EC8855 90C850E5 885F5E0C 56880A46 88070026 C688FC5E ^ø.ó&...F..V.^_.Î]ù.U.Š.Š.ó.h... 000180
 00016806 C6FE5689 FC4689FE 49E80E06 76FF0876 FF0A76FF 0C76FF0E 76FF1076 v..v..v..v..v..v..Öì±.Fø.V±ó.h.. 0001A0
 89F44689 0CBE1688 0CBCA151 74000168 3E8000F2 46C612EC 83EC8855 C85DE588 .Î]ûW.Š.Š.óF·..>h..tQÀ¥...ƒ..F¶. 0001C0
 6AA1FE56 89FC4689 0C56880A 4603C028 02E80001 88057520 3F8326F4 5EC4F656 V-á^¶&.?-u.¡..Š.+â.F..V..Fø.V±Àj 0001E0

Dump of file SATURN:[PCCOMMON.DUMP.DLL]ABOUT.TMP;1 on 18-APR-1990 10:36:14.56
File ID (483,24,0)   End of file block 34 / Allocated 36

Virtual block number 18 (00000012), 512 (0200) bytes

 EE5E8830 07C626F5 46FFEE5E C4F05689 EE468901 6A0603FC 46886A75 0E463901 .9F.uj.Fø..j..FŸ.VÞá^Ÿ.FŸ&ó.0.^Ÿ 000000
 08C48318 2B1DFA9A 37FF2602 77FF2604 77FF2606 77FF2606 5EC44AEB 0007C626 &ó..ŠJá^.&.w.&.w.&.w.&.7.º.+..á. 000020
 C02B02EB 0001B80§ 752D3F83 26500E46 03024788 26F45EC4 5052F656 89F44689 .F¶.V-RPá^¶&.G..F.P&.?-u.¡..Š.+â 000040
 26F45EC4 FE5689FC 46890C56 880A4688 0AC48306 081C529A 50520C56 880A4603 .F..V.RP.R.Ü..á..F..V..Fø.V±á^¶& 000060
 FE76FF50 0001B81D 7F00027F 8326F45E C42007C6 26FC46FF FC5EC40A 75203F83 .7-u.á^ø.Fø&ó.-á^¶&......¡..P.v± 000080
 FC460102 47882 6F4 5EC40AEB 3007C626 FC46FFFC 5EC406C4 830205E8 0EFC76FF .vø.Ô...á.á^ø.Fø&ó.0Š.á^¶&.G..Fø 0000A0
 07C626FC 46FFFC5E C406C483 01D8E80E FC76FFFE 76FF5000 01886 87E 000E7E83 .-..-h¡..P.v±.vø.ÔÅ..á.á^ø.Fø&ó. 0000C0
 08F70247 88260EEB D8F70247 88260874 0001683E 80437D00 027F8326 F45EC42E .á^¶&....)C.>h..t.&.G.¥ÅŠ.&.G.¥Å 0000E0
 50003088 0E76FF06 C4830196 E80EFC76 FFFE76FF 500E4689 0E468803 7E0E463B ;F.-..F..F.P.v±.vø.Ô...á..v.¡0.P 000100
 06C604EC 83EC8855 C850E588 0C56880A 468808C4 83194200 469AFC76 FFFE76FF .v±.vø.F.B..á..F..V..Î]ûW.Š.Š.ó. 000120
 016806C6 FE5689FC 4689FE6E E80E0676 FF0876FF 0A76FF0C 76FF0E76 FF010168 h...v..v..v..v..v..Ôn±.Fø.V±ó.h. 000140
 9A37FF26 0277FF26 0477FF26 0677FF26 065EC456 06EC83EC 885590CB 50E58800 ..Î]ù.U.Š.Š.Vá^.&.w.&.w.&.w.&.7. 000160
 06752D3F 8326016A A3480247 88260CBC 1EC40CBE 16890CBC A308C483 197E1DFA º.-..á.É¥...ƒ.á.¥.&.G.HÉj.&.7-u. 000180
 1A7E1C52 9A50520E 76FF5306 FE5689FC 46890C56 880A4603 C0289003 EB0001B8 ¡..Š..+â.F..V..Fø.V±.S.v.RP.R.-. 0001A0
 83016A36 89016CA2 C02A02EB 01B0047D 016A3639 4E02778B 260CBC1E C40AC483 .á.á.¥.&.w.N96j.).¯.Š.ºâÅl..6j.. 0001C0
 93E80E06 76FF0876 FF0A76FF 0C76FF0E 76FF1076 FF1F7F0E 4639C688 077CFCFE ±ø|..69F....v..v..v..v..v..v..Ô. 0001E0
```

```
Dump of file SATURN:[PCCOMMON.DUMP.DLL]ABOUT.TMP;1 on 18-APR-1990 10:36:14.56
File ID (483,24,0)   End of file block 34 / Allocated 36

Virtual block num :r 19 (00000013), 512 (0200) bytes

 7689F975 00FF7C80 46FC76C5 FA5E8C1E 7400016C 3E8090C8 50E5885E 0CC483FD =.á.^.|]ù..>|..t..^*év=f.|..u*.v 000000
 E80E0676 FF0876FF 0A76FF0C 76FF0E76 FF00FE47 C626FC5E C4FA5E8E FE5E8CFC =.^±.^*á^=&óG±..v..v..v..v..v..Ó 000020
 FF1076FF 1276FF19 75450E7E 83067465 0E7E83EC 8855C850 E5885E0A C483FEF6 -±.á.^.|]ùU.$.-.et..~.Eu..v..v.. 000040
 76FF0C76 FF1076FF 1875660E 7E839035 E8F88FE8 0E0676FF 0876FF0A 76FF0C76 v..v..v..v..Ó.«$5..~.fu..v..v..v 000060
 FF0876FF 0A76FF0C 76FF1076 FF1276FF C8500AC4 83FD39E8 0E0676FF 0876FF0A ..v..v..Ó9».á.]ù.v..v..v..v..v.. 000080
 1A991BE4 9A0676FF 0876FF29 74000A7E 83EC8855 90C85D0C C483FEC0 E80E0676 v..Ôá±.á.]ù.U.&.~..t).v..v..Ô... 0000A0
 C8500AC4 83153E1D 169A5052 08568806 46030A46 880676FF 0876FF50 4004C483 .á.@P.v..v..F..F..V.RP...>..á.]ù 0000C0
 89016E0E 8908E801 8002F006 C7087412 7703F883 D88E1EEC 88554590 D88CC888 .à.Ã.EU.â..Á.=.w.t.ú.Þ...$...n.. 0000E0
 8CC08C01 728FF388 C8F3F60C 8301802D 02F0A1C8 4D5D1FE5 8802ED83 F8017016 .p.½.Ú..[.]MùÀÞ.-..*.-µù.µ¢r..å. 000100
 A5A5A5A5 FCD88EC1 8ED98CC0 8C01728F F388C301 728ED98E A5A5FCD8 8EC18ED9 \.é.Á=ÉÉ.\/r.û.µ¢r..å.\.é.Á=ÉÉÉÉ 000120
 80C2F702 54880C88 C033FCFC 758803E8 07FE45C6 FC7D89FC 7588C301 728ED98E .\/r.û.u=.)=6E±.$..u==3å...T.%ò. 000140
 8FE68004 4D890245 89D8D1D9 01FAD1D8 D1D9D1FA D1D8D1D9 D1FAD105 8925747F .t%..ï*ï\ïÄï*ï\ïÄï*ï\ïÄ.E..M..|. 000160
 18E91BAE 9A5000FC 88EC8855 C3064589 04458902 45890589 C3065589 3800C281 .ô.8.U.û...E..E..E.ûU.$¡=.P.Û.Õ. 000180
 885502FA E9000288 C85DE588 185E18AE 9A5000FF 8802F21E FF047400 02F43E83 .>¶..t....¡..P.Û.^..|]ù¡..Õ*.U. 0001A0
 F2FFFFB9 C033970C 74964010 74C238AD 086C8E06 5688C08E D88EFFFF 885756EC $VW¡...Á.â.V./t.Û;ôt.ə.t..3â¿... 0001C0
 88921F74 C0081872 187E9A06 76FF57EC 88550002 CA5DE588 5E5F96E8 E8F788AE Û.%$$._^.|]ò..U.$W.v..-.r..ât... 0001E0

Dump of file SATURN:[PCCOMMON.DUMP.DLL]ABOUT.TMP;1 on 18-APR-1990 10:36:14.56
File ID (483,24,0)   End of file block 34 / Allocated 36

Virtual block number 20 (00000014), 512 (0200) bytes

 E5885F58 0000FFFF 9A501651 521E5300 0288C488 50490 1F7 AEF2FFFF 89C033FA *3â¿...ÛK||P.6£..S.RQ.P.....[_.| 000000
 000000C8 00C850FA 88914901 F7AEF2FF FF89C033 067EC4D7 88EC8855 0002CA5D ]ò..U.$.m á-.3â¿...ÛK||..*]ù.à... 000020
 006A006A 08468C06 7E89F275 0802F787 F6D88898 058A2647 9002E806 7EC45657 WVá-.$..G&....Ä-.X..u·.-..F.j.j. 000040
 1EF0880C C08F0008 050AC483 18882000 9A570876 FF5004C4 831C3218 E49A5706 .W.Ö.2..á.P.v.W..¡..á....¢á..Þ. 000060
 46890856 88064688 56570000 0AC8C8C9 5F5EDA8C 0CC0881F A5A5A5A5 DA8E1E07 ...ÖÉÉÉÉ.¡â..Ö^_èùà...WV.F..V..F 000080
 833007C6 26F846FF F85EC4FE 5689FC46 89085788 26064788 260C5EC4 FA5689F8 ½.V*á^.&.G.&.W.¯F=.V±á^½.F½&ó.0. 0000A0
 9003E807 8A26FC46 FF097400 3F8026FC 5EC4F876 C5F65E8C 0A4E882E 7E000A7E -..-..N..^-év½á^=&.?.t..F=&..$.. 0000C0
 287C000A 7E830007 C626F85E C40A4E89 F65E8EFA 5E8CF876 89E7E246 04883080 ¯0..Fãó.v½.^*.^-.N.á^½&ó...-..|( 0000E0
 F87E89F5 74393D80 264F3005 C6269006 E8F87EC4 F84EFF1F 7C353F80 26FC5EC4 á^=&.?5|..N½ó-½$..&ó.00&.=9t%.-½ 000100
 08568806 468815E8 0247FF26 0C5EC409 75313F80 26065EC4 07FE260F 88FA468C .F*.Ô&±.á^.&.?1u.á^.&.G.$..F..V. 000120
 0375C908 0E4E88EC 88550000 90C8C95F 5E08C483 1C250010 9A0676FF 52505240 @RPR.v....X..á.^_èù...U.$.N..èu. 000140
 DA83C128 57780208 0E4E8810 0A1FC89A 5706561E 067EC40A 76C55657 1E0085E9 Õç..WVév.á-..V.W.à....N..ØxW+é.Ö 000160
 C72848C1 8841C08E 104805C0 8C0773F9 03D88E00 7905088C 0773F103 49507300 .sP1.þs..Ä.y..Ä.*s..â.K..âA.êH+ú 000180
 D88C0775 FFFE835C E391FCA4 F3FDC128 9140C603 C3230818 C628C703 C3230818 .Ü#ú.ú+ó.Ü#ú.óə.+è»µÊ=.D\.±.u..Ä 0001A0
 C3230818 C22802F7 D78848C1 88C8E8C0 8E10812D C08CD175 FFFF8308 8E1D5620 -V..Á...ul.á-...âŠà.êH.ø%Ø+ó.Ü#ú 0001C0
 75F60818 E391A4F3 C913A5F3 E9D1C128 9140C203 C3230818 C22802F7 D688C203 .ô.ø%Ø+ó.Ü#ú.óə.+èîÔµÊ.èµÊ.D..-u 0001E0

Dump of file SATURN:[PCCOMMON.DUMP.DLL]ABOUT.TMP;1 on 18-APR-1990 10:36:14.56
File ID (483,24,0)   End of file block 34 / Allocated 36

Virtual block number 21 (00000015), 512 (0200) bytes

 C85D0856 88064688 1F5F5E8E E8C08E1D C405C08C C775FF08 D88E1D8D 05D88C07 ..Á....Ä..uú.â.á..âŠ/^_..F..V.]ù 000000
 FC5756EC 8855C858 000018D8 9A531650 521E5100 02890C88 5301578D E4._'078A ..*ö.W.S.É¿..Q.RP.S.Á...[ùU.$VW= 000020
 ACC88804 0A8F5002 D9E85504 028EA536 A536A536 A5360402 8F06768D C08t 98C .Á.â.v.¢..6É6É6É6É/..UÒ\.]¢...à¯ 000040
 5FC788DA 8C08508C 040A0645 C7044D89 0255891D 89FF3203 F88FAA91 A4F39:98 ..µÉ.¯¢½.2....U..M.úÉ....]..Ö.ú_ 000060
 1E681E04 20681E08 44A3E086 580000FF FF9A5016 C48850EC 885500C8 5DE5885E ^.|]ù.U.$P.á.P.....X.ÀÉD..h ..h¯ 000080
 AE9A1E6F 18549A50 C85DE588 0001881D 3321F29A 006CE800 21E80000 FFFF9A04 ......Ò!.Òl...!3.¡...|]ùP.T.o..Û 0000A0
 80264701 75003D80 267FFF89 0420068E FF33000D 881E0426 16FF00FF 681E7C18 .|.h....&..£..3.....¿..&.=.u.G&. 0000C0
 8F1FF788 071E061C E8E774AE F2C03308 74CA88A6 F3C888D1 88082A8E 31740030 =.t1/*..1.ùµ|.òt.3à·ÛtÓ$.....%.¢ 0000E0
 A7800488 52000288 00C31FED E8AAC20A 0572412C AC9204E0 C00E7241 2CAC0848 K.¯,Ar.âÀ..¯,Ar..ò`$Û.û.£..R.â.| 000100
 7500023D 07740001 30408112 7558C008 0000FFFF 9A521650 1653C488 50870848 K.ÑP.áS.P.R......âXu.Ÿə=..t.=..u 000120
 E903730B 3E1EFFD8 33C28C08 4206C41E E308400E 885AD479 4808488F 08088106 .Ÿ...K.Kyâž..ə.D.á.8..ó3Ü..>.s.Õ 000140
 73E8083C 8F08388E 007CE808 4A8F084A 8E083E1E FF000388 C28C0846 06C4FC56 V=á.F..ô£....>./J.¢J.Ò|./8.¢<.Òs 000160
 084A8F08 4A8ED88E 188488C3 0000FFFF 9A1F5568 0E016A08 74084A3D 084A8800 .¡J.=J.t.j..hU......Û¡...Ä/J.¢J. 000180
 084A8F08 4A8E003A E80CC88F 0CC88EEC 88550000 1F509A00 6A006A03 6A0051E8 ÒQ.j.j.j..P...U.$/à.¢à.Ò:./J.¢J. 0001A0
 06468A50 C033001A E8084A8F 084A8E00 23E8084A 8F084A8E EC885503 E80031E8 Ò1.$.U.$/J.¢J.Ò#./J.¢J.Ò..3âP.F. 0001C0
 02450805 8804EF83 0E73F738 C3083E1E FF000288 07E30840 0E880000 FFFF9A50 P.......ə.D.£....>.ù;%s..ÿ....E. 0001E0
```

```
Dump of file SATURN:[PCCOMMON.DUMP.DLL]ABOUT.TMP;1 on 18-APR-1990 10:36:14.56
File ID (483,24,0)   End of file block 34 / Allocated 36

Virtual block number 22 (00000016), 512 (0200) bytes

 D3180A46 2BEB03EA 03FFFFB9 0C5E8808 56880646 8BEC8855 00C3EEEB 1DFFF274 t...SYù.U.$.F..V..^.¿..ÆõÆ$+F..Æ 000000
 0A763B00 0AF106C6 0028E801 0AF106C6 0E5688D8 335756EC 88550008 CA5DE58B .|}ò..U.$VW3U.V.ó.þ..Ò(.ó.þ..;v. 000020
 CB5DE58B 5E5FC006 E80E5E88 02335756 EC8855C8 5DE5885E 5F008940 C9800573 s..èa.._^.[)ùU.$VW3Ø.^.Ò.._^.])ù 000040
 0A4E88D8 8EA4F30A 6E8F0676 C527EBF6 33408106 7664F983 0A4E88C0 8ED88CFC =.Ä.à.N..*dv.Ÿà3-Š'év.¢n.µË.Ä.N. 000060
 890D890A 5CBF0A76 0306762B 5D0456E8 550A640F 064E010C 46880676 890A6EBE ƒn..v..F..N.¢d.UÒV.]+v..v.¢\.... 000080
 0AC68316 75C43A80 80250947 8A2E0964 8A5653C3 DA8CC788 06508904 45890275 u..E..]..ú.ÒùSV.d...G.X..;áu..ó. 0000A0
 FF33AD93 AD92AD95 AD56C358 5EF3E107 382E0488 02EB8302 EE830005 890AC383 .ù.¿...Ÿ..Š....;.Äµ^[ùVÙ.Ù.Ù.Ù3. 0000C0
 893C895E 03FE2008 01F50001 3D0001E3 D1F4E20F 01DD01DA D10BD1E8 01000589 ¿..ÌÒÌÙÌÒÌÌÌÒà¶ÌÐÌÂ=..%ÌÙ-±.^.<. 0000E0
 FFFDCCCC CCCCCCCC CCCD0000 FFFFFFFF FFFFFC66 C3084489 065C8904 5489026C |..T..\..D.ùf•........ëààààààà». 000100
 F30004B9 570AD2BF FCC08ED8 8C06C307 58400088 C0333001 44C60104 C60ADEBE ƒ8.ó..ó0.03à.Äà[.Ù..Ä.à•¢8.W¿..µ 000120
 0AD9BEFF 33FF7BE8 53208302 79C90806 747FF0C1 F720837F 07648006 4C885EA5 Ë^.L..d..* %èÞ.t..èÿ.*-SÒ(.3./). 000140
 03E7F69A 800713C8 03E4F640 8091E2F7 4D108AC8 883FFE05 ADF88A88 7480A8AC ``.tÈ.%Ù.±?.àö.M%à.¯M-ð.à.■¯.-Ó. 000160
 88574709 725FFF13 E820CC88 078CE80A D28EDFF7 5713430F 8112F4E9 81FA13C8 à.*.Ò¶..ÒC.WÁÒ/8.Ò..£à Ò.. r.GWE 000180
 D100D1DA D1E8D10C E3C033F7 88D9F791 AD93AD92 AD95AD97 AD575F06 15E82006 ø Ò.._WÙ.Ù.Ù.Ù.Ù.%).%3àD.1ŠÌÒÌÌÌ 0001A0
 50565552 5351C032 0010890A DF8FD913 D113E913 039AD681 56C480F4 E2DCD0DE 8ÀÉà¶¯.áV.ø...Ò.Ì.\¢Ò.¿..2àQSRUVP 0001C0
 1359F113 59E50259 D0000301 D2D10501 D601E400 D0D00301 D2D10501 D601E400 ÀÒÌøÌÌÌØÌÆÅÄÀÒÌøÌÌÌØÌÆÀÄY.|Y.þY. 0001E0

Dump of file SATURN:[PCCOMMON.DUMP.DLL]ABOUT.TMP;1 on 18-APR-1990 10:36:14.56
File ID (483,24,0)   End of file block 34 / Allocated 36

Virtual block number 23 (00000017), 512 (0200) bytes

 FD308049 4F80E259 AA3004D0 D0030102 D1050106 D1E4D000 14091359 D11359E9 ÕY.1Y.1..ÀÒÌøÌÌÌØÌÆÀÄ.O`YàŠOI¯O» 000000
 04203639 FF2BF628 56570000 14C8C307 585A0001 880C880A DE8E12C1 83FCAEF3 µÙ=.é./8...¡..Z[.ùà...WV+-+.96 . 000020
 1EF676FF F876FF0C 6AF85689 F64689F2 5689F046 89C02804 20168800 F0E90375 u.Õþ... .+á.FÞ.V·.F-.V%j..v%.v-. 000040
 26F646FF F65EC400 8CE90376 7FFFFEB1 461974C0 080AC483 22662422 9A082A68 h*.."$f".á..ât.F.±..v.ÕV.á^-.F-& 000060
 01458D8A 75003F80 26F65E88 F475003F 8026F646 FFF65EC4 0CE847EA 75003F80 .?.uõG$.á^-.F-&.?.u¶.^-&.?.u¤.E. 000080
 FE5689FC 468902C4 8322A823 0F9A56EE 5689EC46 8904C483 227523CA 9A046A50 Pj..ò#u".á..F$.VŸV..#""".á..F•.V± 0000A0
 76FF0C6A 0A531689 0A51A3EE 5688EC46 886674C2 08FC4688 6D74EE46 08EC4688 .F$.FŸtm.F•.òtf.F$.VŸÈQ...S.j..v 0000C0
 078926FE 5688FC46 88EC5EC4 2C74C008 0AC4831E 8124229A 082A681E F076FFF2 `.vÞ.h*.."$...á..ât,á^$.F•.V±&.. 0000E0
 E8EB0E74 C00A0788 26FC46FF FC5EC407 8A26F046 FFF05EC4 04EC4683 02578926 &.W..F$.á^Þ.FÞ&..á^=.F•&...ât.ŠÒ 000100
 065EC4EC 885590C8 C95F5EA7 75003F80 26F05EC4 F475003F 8026F046 FFF05EC4 á^Þ.FÞ&.?.u¶á^Þ&.?.u]^_èù.U.$á^. 000120
 831E73FF F1300646 88575602 EC83EC88 55C850E5 8801FE4F 80260574 L.`9C08C .á.ùt.&.0±..[)ùU.$.$.VŪ.F.=þ.s.. 000140
 0676FF08 750078E8 05740018 E8157500 82E8082E A3127400 25E80875 00C`?E3E >...u.ÒX.t.É..Ò..u.Ò..t.Òx.u..v. 000160
 FE5E89FE E3834306 5E880776 065E3900 F08BC850 E5885E5F 02C48322 2629;69A ..)&".á.__^.[)ùÉÞ.9^.v..^.C.D±.^± 000180
 A3083016 87C28838 74FFFA83 08C48323 432AC29A 50028051 0E4F8050 501EC033 3à.PP.O.Q¯.P.ô*C#.á..*.t8.ó..O.È 0001A0
 0000A300 0A880C47 89484800 08A3C033 D88EFE5E 880008A3 DA8E0574 D20B0832 2..8t..OÈ...^±.Ä3àÈ..HH.G.¡..È.. 0001C0
 08321E8E DB33064E 88C08ED8 8CC31FD8 8C0006A3 00000500 0AA30147 8D0002A3 È...G.È.....È...Ä.ù.Ä.à.N.3Ù..2. 0001E0

Dump of file SATURN:[PCCOMMON.DUMP.DLL]ABOUT.TMP;1 on 18-APR-1990 10:36:14.56
File ID (483,24,0)   End of file block 34 / Allocated 36

Virtual block number 24 (00000018), 512 (0200) bytes

 468923F7 28789A06 76FF006A 0876FF00 6A560000 0AC8C309 8EC18CD2 08059CE8 Ò...8.è.1ùà...Vj..v.j..v..x+%#.F 000000
 89FC4689 02C48324 10230F9A 56F87688 902FE899 C0280674 FFFFC2F7 FA5689F8 %.V*%ò..t.+à.$/..v%V..#.$.á..F•. 000020
 C95EFE56 88FC4688 9007EB08 C483236F 00469A50 FE76FF00 6A561274 D008FE56 V±.Àt.Vj..v±P.F.o#.á.Š...F•.V±^è 000040
 76C5FE88 C80309F7 AEF2C033 F788067E C4D98827 E30E4E88 1E5657EC 885590C8 ù.U.$WV..N.D'.1á-..%3à·Ù%).ù.±év 000060
 C98058C8 50E5885F 5E1FC188 D1F74949 04740477 FF453A26 C933FF44 8AA6F30A .µ|.D.3è&:E.w.t.||%|.è.^_.|}ùX.è 000080
 E8F888E1 72020CE8 08330AFE 1E8900AC E9083301 85E8EF88 FF330788 40C98030 0.èà.■3..ÿÒ..3ÙÒ¯...±.3ÙŌ..rÄ.%Ò 0000A0
 588E7208 88C503C4 7502080A FE2EF7C3 88EA88F8 880AFE26 F7C78850 E0720205 ..rÁP.ù%&±..%.õ.ù%.±..8uá.é.Är/X 0000C0
 0AFAA3C0 33080216 890800A3 0AF60E89 CE030AF4 3E89FCB5 E8087300 D383F803 .%.Æ.sÀŠç•.>¶..ö..-.É......3àÈ*. 0000E0
 443C4E41 7401FDE8 083300E7 E89F7508 0880CD80 037501AD E8910AFC A30AF8A3 È%.É•..ÒÙ.u..ë..Ùu.ÒÒ.3ÙÒ».tAN<D 000100
 C98003E8 0402C981 4E277502 74203C06 74283C31 74000AF1 3E801274 453C1C74 t.<Et..>þ..t1<+t.<-t.u'N.è..Š..è 000120
 3E880BF7 02759E58 40C98003 7502C5F6 0088E850 9F016CE8 46000008 0006C70E .ú.....FÒl..PÒ..-é.u..èàX.u.%Ù.> 000140
 FF810802 3E280475 10C5F60A FC3E03F8 0330C980 03741872 C1F70675 FF080800 ....u.%èr.t..è0.«.>•.-é.u.+>.... 000160
 880804A1 38755E59 01ACE800 081206C6 0AF43E88 0394E808 088E5156 507F0190 ...PVQ/..Ò...>¶.ó....Ò¯.Y^uØÀ... 000180
 070AFA3E 8380074D 8004747F F00645F7 000383F5 D8F7D3F7 137480C5 F608061E ...-é.t.%Æ%Æ%.Æ.%E.Þ.t..M...>*.. 0001A0
 0A0AFE06 C63FFF88 C301C980 C302CD80 0375000A FA3E8308 122E8A08 C9800376 v..è......>*..u..ë.û.è.ùÉ.7ó.±.. 0001C0
 88FF33C3 DFE8DE78 D803E301 E301C303 E30102CD 80ED770C CCF88117 7200E4E8 ÒØ.r..«à.wÙ.è.1D.ùÌDÌD.ÄxØŠÒù3.. 0001E0
```

Dump of file SATURN:[PCCOMMON.DUMP.DLL]ABOUT.TMP;1 on 18-APR-1990 10:36:14.56
File ID (483,24,0)   End of file block 34 / Allocated 36

Virtual block number 25 (00000019), 512 (0200) bytes

```
E5721999 FF8100D7 83000583 00038300 0358008A E8502872 0006E8D7 88DF88EF ÿ.Ô.æÒæ.r(PÒ..X.Å.Æ..(..æ.....rÏ 000000
7480C7F6 16750AFC 06C8C508 C788EEE8 0AFC06FF 01CA8003 74C00A00 720088E8 ÖÉ.r..åt..ò...æ.$Ÿ.ú.é..æ.u.-ú.t 000020
08061E89 08041689 20C98010 C98006E8 05750208 09758000 F8810F74 B0C5F617 .-é.t..æ..u..Ðu.Š..è..è ........ 000040
0678FF08 00408BF1 E80AFC0E FF0025E8 09731999 FF811C74 C208C308 C5U 788 .ú.é.ú.ôt.....s.Ö%...æ.Şpiã...x. 000060
000EE8C2 88535557 C35EA892 AB96AB95 AB93AB92 08088FF7 8856F6E8 002A 348 NÒ*.$-V.%e.......^ÙÄUS.6Ò.. 000080
067420 3C 0874005E E8C307D1 05010301 E2D1F813 58E81358 08135800 03000BE8 Ò...ÀX.ÀX.ÒX.%iãiÆiiimûÒ^.t.<-t. 0000A0
37E81DE8 397D0AFE 063A072C 027E093C 4572302C 4A74004E E8C34E46 01752B3C <+u.FNÙÒN.tJ,0rE<.-.,:.±.)9$.Ò7 0000C0
320AFA06 FF08CD80 0AFC0EFF 0E7410C5 F6267709 3C2A7230 2C20742E 3C337400 .t3<.t ,Or*<.w&-é.t...æ..ë...*.2 0000E0
80AC2373 0AF63638 C3F94EC9 E810CD80 0AF806FF 097510C5 F6F4E820 CD80C3E4 ôu.ë $¶-é.u...%..ë.$èN*ù;6-.s#¯. 000100
5F240277 7A3C0672 613CE274 003CE674 0A3CEA74 093CEE74 203C1074 000AF03E >Þ..t.< tŸ<.tô<.tÌ<.tã<ar.<zw.$ 000120
E8D1E7D1 3E7803FE 05AD4974 C208C108 C508F888 AD95AD91 AD92AD57 C3C032C3 û2àÙÄÙ.Ù.Ù.Ù.%.é.è.ôtlÙ.±.x>lÒlÕ 000140
8001FA81 F633030A 092243F0 75C8FED7 0000D107 D1050101 01E2D100 0588DFD1 lÒE..lãiiiiimlÀÄm±ùuÞC"l.Æ3-.*.. 000160
33010812 0E800FE8 000780F5 7FF0300E 74FFF0A9 000780C6 13FE13EE 13CE13F5 %.ö.Ÿ.±.ó.æ.`Þ.t.=Þ.%.æ.Š......3 000180
00088908 1480C3FF 0A064589 04758902 60890089 5FF788F8 88E888C8 88D888C0 å.Á.à.Ò.%.%_...m..u..E...ù§..¿.. 0001A0
98040408 F6C42AC4 2AE022C7 28000488 0007BF08 44010847 882EA8F3 C033F088 .»3àµ¨..G..Ď.¢..¡..+ú"Å*6*6-Á... 0001C0
3E025611 3E004601 3E27F72E 048806C6 83F72BF1 0308C383 DF2809028 5653C888 .àSV+l+Ò.ù..þ+%.ó....%'>.F.>.V.> 0001E0
```

Dump of file SATURN:[PCCOMMON.DUMP.DLL]ABOUT.TMP;1 on 18-APR-1990 10:36:14.56
File ID (483,24,0)   End of file block 34 / Allocated 36

Virtual block number 26 (0000001A), 512 (0200) bytes

```
08ADC808 AD91ADF5 870EED83 8C754F02 C5835B5E E6E202C3 8302EE83 00045683 .V...Ÿ..ù.ãl^[.é.Ou¥.Ù..%Ù.Ù.àÙ. 000000
D1D301D1 01D7D1E2 D1084CFF 0D78C008 F588AD93 AD91AD97 ADD10A92 ADCD0AC8 à.ëÙ..lÙ.Ù.Ù.Ù.%.àx..L.lãlælllÆl 000020
C508CDD1 086C01D5 D1C51300 13C013FD 13F58001 FA81ED33 D508EF23 0001800D Å§..#y.l3ù.*..%.».e.l.éil.l.lë.é 000040
0007C800 00000000 00000004 A0000000 00000000 C3064489 045C8902 4C893C89 .<.L..\..D.ü.................à.. 000060
859E0036 8E18C98F 04000000 0018BEBC 20000000 0000000E 9C400000 00000000 ......ã........ ¥f......¢è..6..ç 000080
9DF9DE8E D1AA938A 47C980E9 8CE00005 C2781F49 FFCFA6D5 006890C5 ADA82870 p+¨Ùé.k.lÌù.l.xòl.Á.Õ.èGo.ˆ..B*. 0000A0
1758E219 652CFFFA A3D70A3D 70A3D70A FFFDCCCC CCCCCCCC CCCD0353 AA7EEBF8 «$~ˆS.ëëëëëëë»..mÊp=.mÈ*.,e.ãX. 0000C0
CF811EAD 453994BA FFCBE695 948EC440 E158FFE6 ABCC7711 8461CEFD FFF301B7 ÑÌµ.»öa..wä¨l.[ÀMé/..lù.o.9ÈÙ.Ÿü 0000E0
FCAEC031 4325637A 193AFE57 D000467C 648CE4A1 FF2CA87F EA27A539 E9A5FF96 ..ÈÒ9E'ô.´,.ÀÒ¥d|FÀlW±:.±c%C1äÙ= 000100
5FFE78E8 5753F573 EFD10D74 FF080AC3 830AEB83 DFF72886 880579FF 08282C88 É.(..y.É.(%Ò.Š..ù...t.lÿs%SWÒ(±_ 000120
3F830824 885756EC 8855C85D E58801FE 4F800474 D808065E 88EC8855 C3ECEB58 [ŠšùU.£.^..Ùt..O±..l)ùU.ÈVWÈ$..7 000140
000104C7 960826A3 0824A3FE 244024E8 99C03305 750176E8 00058807 1E297500 .u)..¡..Òv.u.3à.Š$æŠ±É$.È£..ú... 000160
410000E9 C850E588 5E5F0009 E8C08ED8 8C064E88 082A3689 FFFEFE44 C704C683 .6.ùD±±..6*..N..Ä.àÒ.._^.l)ùÕÅ.A 000180
A8ADF003 D0881573 C1384843 7401A8FE 88ADFC02 7788F273 EEF983FE E180FA74 t*.Å±.*Ÿs·.w.»Ù.±¨.tCH;ês..À.ÞÙˆ 0001A0
0305EB05 8948C128 FE4C89F9 030C74FE 88E6E8FE 4489F788 000205C2 03357401 .t5.ó....%.D±$l.±t..*.L±+èH..Š.. 0001C0
FE300208 3606C626 C3027F89 08321E8C 260574D1 381F5689 DA8CC688 FE4CFEF9 *±L±.6.O¿V.;it.&..2....ü&6.6..=± 0001E0
```

Dump of file SATURN:[PCCOMMON.DUMP.DLL]ABOUT.TMP;1 on 18-APR-1990 10:36:14.56
File ID (483,24,0)   End of file block 34 / Allocated 36

Virtual block number 27 (0000001B), 512 (0200) bytes

```
0205C203 E27401A8 ADF003D0 888C73C1 3848FE88 F27401A8 ADF003FE 882574FF .t%.±.ÞÙˆ.t·.±H;ès¥.Å.ÞÙˆ.tã.ò.. 000000
3829A98F D88C1274 08360EFE 2615E808 8E0474C0 08084788 E6E8FE44 89F78800 ..%.D±Šl.G..åt..ÄŠ.&±.6.t..Ä¢`); 000020
005FE898 40400124 0074C638 0068E8C0 33067788 88E83788 082E1E8E 260574C7 út.&.....7ŠÈ.w.3àÒk.;6t.$.ãã.Ò_. 000040
47890788 0832A326 0474C138 29FD8908 8C98EB4E 4E960574 001DE8FE 4DFE0074 t.±M±Ò..t..NNŠ..Ä¿»);èt.&È2....G 000060
F575EAD1 04760834 1638267F FFBA4141 49C82803 7401A8FE 458851C3 99C03302 .3à.ùQ.E±´.t.+àlAAo..&;.4.v.lÒu% 000080
52C359C0 33E575EA D1D2F708 75000CE8 C628C223 D2F70D72 C2031572 C603C188 .è.ór..ór.%Ø#ò+6Ò..u.%ØlõulšàYùR 0000A0
5A5958FE 55894AD7 28D68806 7789FFFE FE44C7F2 03F088FE 88571874 001DE851 QÒ..t.W.±.Þ. ùD±±..W..æ+mJ.U±XYZ 0000C0
08027458 5A1FFFFA 8308C483 230C2AC2 9A1F0650 00018850 52521ED2 335053C3 ùSP3Ø.RRP¡..P...ó*É#.6..*..Z(t.. 0000E0
E8277200 57E80775 48064688 08568804 288F3875 000A7E83 065756EC 8855C3D2 ØùU.ŠVW..-..uØ¢(..V..F.Hu.ÒW.r'Š 000100
0828FE81 04C68334 735E003E E8560E46 89024488 0074F738 11744808 2836884C L.6(.Ht.;%t..D..F.VÒ>.^s4.6..±(. 000120
E675C085 F9580000 FFFF9A50 C0335016 52C48850 21EB99FF FF880675 D2080473 s..Øu.¡...ŠlP.åR.P3àP.....[*.àul 000140
C6830C74 024C39F7 880E4E88 C85DE588 5E5F07C0 33038808 28368902 5C891489 ...\..6(..Æ3à._^.l)ù.N..%9L.t..6 000160
51531373 04221E39 0675F738 C18ED388 26721C03 DA882CE8 F9F27508 28FE8104 ..±(.u·*Š,.Ö..r&.Æ.è;%u.9.".s.SQ 000180
5E880846 88EC885 00C3D188 04879204 22168904 75F738DE 75C08500 00FFFF9A ......àuß;%u...".....lù.U.å.F..^ 0001A0
88C8030C 66F7064 6 88C888E3 F70008CA 5DE588E3 F7064688 08750A5E 88D8080C ..Ä.^.u..F.%D.l]ò..%D.à.F.%f..à. 0001C0
82000200 5C00051E 4F010300 5800051E 62010300 0C08CA50 E588D103 E3F70646 F.%D.l.l]ò.....b...[...O...\...ý 0001E0
```

```
Dump of file SATURN:[PCCOMMON.DUMP.DLL]ABOUT.TMP;1 on 18-APR-1990 10:36:14.56
File ID (483,24,0)   End of file block 34 / Allocated 36

Virtual block number 28 (0000001C), 512 (0200) bytes

A2010300 88000510 CF010500 8700051F D5010500 0000052A 32000200 0000032A *......2*......f.......ü.......Å 000000
F4020300 26000528 61010300 22000528 16010300 0700051F 6A010300 0500051F .......j........+..".. a+..&...¶ 000020
54206E75 5220534D 00000000 00000000 00000000 4000051E EC010300 3A00071D ...:...$...M............MS Run-T 000040
38383931 20296328 20746867 69727970 6F432020 20797261 7262694C 20656D69 ime Library - Copyright (c) 1988 000060
636C6557 0000484F 0074756F 62410011 70726F43 2074666F 736F7263 694D202C , Microsoft Corp..About.OK..Welc 000080
69446F67 6F4C006C 656E6150 6C6F7274 6E6F435F 4D500000 01030000 3365606F ome3......PM ControlPanel.LogoDi 0000A0
20303939 31296328 004E414D 48434142 0000766C 65480065 6D695479 616C7073 splayTime.HeTv..BACHMAN.(c)1990  0000C0
2E636E49 20736065 74737953 206E6F69 74616D72 6F666E49 206E6160 68636142 Bachman Information Systems Inc. 0000E0
73655220 73746867 6952206C 6C410031 3330302E 30312E33 30206174 65420000 ..Beta 03.10.0031.All Rights Res 000100
0E880B73 00E61534 00E21424 000E1558 000A149A FFFF1A0A 00000064 65767265 erved.........Ö.X.ß.$.ã.4.|.s... 000120
1B780B3A 1B780000 0B170AC4 10F00059 10F20058 108F0CD5 0E630869 0E650868 k.e.i.c.f...[.·.Y.Þ.á.....x.:.x. 000140
FEFF0000 00007878 31364005 01010000 00000118 1B780114 1B780110 1B78010C ..x...x...x..........M61xx.....‡ 000160
00000000 00000000 00000000 00000000 00000000 00000000 000080C0 E0F0F8FC •½ÞÀà........................... 000180
00000000 00000000 00303030 28650000 00000000 00000000 00000000 00000000 .................e+000......... 0001A0
00000000 00000000 00000000 00000000 00000000 00000000 00000000 00000000 ................................ 0001C0
00000000 00000000 00000000 00000000 00000000 00000000 00000000 00000000 ................................ 0001E0

Dump of file SATURN:[PCCOMMON.DUMP.DLL]ABOUT.TMP;1 on 18-APR-1990 10:36:14.56
File ID (483,24,0)   End of file block 34 / Allocated 36

Virtual block number 29 (0000001D), 512 (0200) bytes

00000000 00000000 00000000 00000000 00000000 00000000 00000000 00000000 ................................ 000000
00000000 00000000 00000000 00000000 00000000 00000000 00000000 00000000 ................................ 000020
00000000 00000000 00000000 00000000 00000000 00000000 00000000 00000000 ................................ 000040
00000000 00000000 00000000 00000000 00000000 00000000 00000000 00000000 ................................ 000060
00000000 00000000 00000000 00000000 00000000 00000000 00000000 00000000 ................................ 000080
00000000 00000000 00000000 00000000 00000000 00000000 00000000 00000000 ................................ 0000A0
00000000 00000000 00000000 00000000 00000000 00000000 00000000 00000000 ................................ 0000C0
00000000 00000000 00000000 00000000 00000000 00000000 00000000 00000000 ................................ 0000E0
00000000 00000000 00000000 00000000 00000000 00000000 00000000 00000000 ................................ 000100
00000000 00000000 00000000 00000000 00000000 00000000 00000000 00000000 ................................ 000120
20202020 20202020 20202028 28282828 20202020 20202020 20000000 00000180 .......           (((((          000140
84848484 84848484 84101010 10101010 10101010 10101010 48202020 20202020       H......................... 000160
01010101 01010101 01010101 01010101 01018181 81818181 10101010 10101084 ................................ 000180
02020202 02020202 02020202 02020202 02028282 82828282 10101010 10100101 ................................ 0001A0
00000000 00000000 00000000 00000000 00000000 00000000 00201010 10100202 ...... ......................... 0001C0
00000000 00000000 00000000 00000000 00000000 00000000 00000000 00000000 ................................ 0001E0

Dump of file SATURN:[PCCOMMON.DUMP.DLL]ABOUT.TMP;1 on 18-APR-1990 10:36:14.56
File ID (483,24,0)   End of file block 34 / Allocated 36

Virtual block number 30 (0000001E), 512 (0200) bytes

00000000 00000000 00000000 00000000 00000000 00000000 00000000 00000000 ................................ 000000
00000000 000000 ) 00000000 00000000 00000000 00000000 00000000 00000000 ................................ 000020
00000000 0000000u 00000000 00000000 00000000 00000000 00000000 00000000 ................................ 000040
00000000 FFFF0CD0 1F850CD0 0CD00000 00000000 00000000 00000000 00000000 ..................Å.Å...Å....... 000060
00000000 00000000 00000000 00000000 00000000 00000000 00000000 00000000 ................................ 000080
00000000 00000000 00000000 00000000 00000000 00000000 00000000 00000000 ................................ 0000A0
00000000 00000000 00000000 00000000 00000000 00000000 00000000 00000000 ................................ 0000C0
00000000 00000000 00000000 00000000 00000000 00000000 00000000 00000000 ................................ 0000E0
00000000 00000000 00000000 00000000 00000000 00000000 00000000 00000000 ................................ 000100
00000000 00000000 00000000 00000000 00000000 00000000 00000000 00000000 ................................ 000120
00000000 00000000 00000000 00000000 00000000 00000000 00000000 00000000 ................................ 000140
00000000 00000000 00000000 00000000 00000000 00000000 00000000 00000000 ................................ 000160
00000000 00000000 00000000 00000000 00000000 00000000 00000000 00000000 ................................ 000180
00000000 00000000 00000000 00000000 00000000 00000000 00000000 00000000 ................................ 0001A0
00000000 00000000 00000000 00000000 00000000 00000000 00000000 00000000 ................................ 0001C0
00000000 00000000 00000000 00000000 00000000 00000000 00000000 00000000 ................................ 0001E0
```

```
Dump of file SATURN:[PCCOMMON.DUMP.DLL]ABOUT.TMP;1 on 18-APR-1990 10:36:14.56
File ID (483,24,0)   End of file block 34 / Allocated 36

Virtual block number 31 (0000001F), 512 (0200) bytes

 00000000 00000000 00000000 00000000 00000000 00000000 00000000 00000000 ................................ 000000
 00000000 00000000 00000000 00000000 00000000 00000000 00000000 00000000 ................................ 000020
 00000000 00000000 00000000 00000000 00000000 00000000 00000000 00000000 ................................ 000040
 00000000 00000000 00000000 00000000 00000000 00000000 00000000 00000000 ................................ 000060
 00000000 00000000 00000000 00000000 00000000 00000000 00000000 00000000 ................................ 000080
 00000000 00000000 00000000 00000000 00000000 00000000 00000000 00000000 ................................ 0000A0
 00000000 00000000 00000000 00000000 00000000 00000000 00000000 00000000 ................................ 0000C0
 00000000 00000000 00000000 00000000 00000000 00000000 00000000 00000000 ................................ 0000E0
 00000000 00000000 00000000 00000000 00000000 00000000 00000000 00000000 ................................ 000100
 00000000 00000000 00000000 00000000 00000000 00000000 00000000 00000000 ................................ 000120
 00000000 00000000 00000000 00000000 00000000 00000000 00000000 00000000 ................................ 000140
 00000000 00000000 00000000 00000000 00000000 00000000 00000000 00000000 ................................ 000160
 00000000 00000000 00000000 00000000 00000000 00000000 00000000 00000000 ................................ 000180
 00000000 00000000 00000000 00000000 00000000 00000000 00000000 00000000 ................................ 0001A0
 00000000 00000000 00000000 00000000 00000000 00000000 00000000 00000000 ................................ 0001C0
 00000000 00000000 00000000 00000000 00000000 00000000 00000000 00000000 ................................ 0001E0

Dump of file SATURN:[PCCOMMON.DUMP.DLL]ABOUT.TMP;1 on 18-APR-1990 10:36:14.56
File ID (483,24,0)   End of file block 34 / Allocated 36

Virtual block number 32 (00000020), 512 (0200) bytes

 00000000 00000000 00000000 00000000 00000000 00000000 00000000 00000000 ................................ 000000
 00000000 00000000 00000000 00000000 00000000 00000000 00000000 00000000 ................................ 000020
 00000000 00000000 00000000 00000000 00000000 00000000 00000000 00000000 ................................ 000040
 4C49465F 435F0428 00000000 00000000 00000000 00000000 00000000 00000000 .........................(._C_FIL 000060
 00008181 81010000 00010000 00000000 00000000 00000000 00304F46 4E495F45 E_INFO=......................... 000080
 00000000 00000000 00000000 00000000 00000000 00000000 00000000 00000000 ................................ 0000A0
 00000000 00000000 00000000 00000000 00000000 00000000 00000000 00000000 ................................ 0000C0
 00000000 00000000 00000000 00000000 00000000 00000000 00000000 00000000 ................................ 0000E0
 00000000 00000000 00000000 00000000 00000000 00000000 00000000 00000000 ................................ 000100
 00000000 00000000 00000000 00000000 00000000 00000000 00000000 00000000 ................................ 000120
 00000000 00000000 00000000 00000000 00000000 00000000 00000000 00000000 ................................ 000140
 00000000 00000000 00000000 00000000 00000000 00000000 00000000 00000000 ................................ 000160
 0A0A0A0A 0A000000 00000000 00000000 00000000 00000000 00000000 00000000 ................................ 000180
 0A0A0A0A 0A0A0A0A 0A0A0A0A 0A0A0A0A 0A0A0A0A 0A0A0A0A 0A0A0A0A 0A0A0A0A ................................ 0001A0
 0A0A0A0A 0A0A0A0A 0A0A0A0A 0A0A0A0A 0A0A0A0A 0A0A0A0A 0A0A0A0A 0A0A0A0A ................................ 0001C0
 0A0A0A0A 0A0A0A0A 0A0A0A0A 0A0A0A0A 0A0A0A0A 0A0A0A0A 0A0A0A0A 0A0A0A0A ................................ 0001E0

Dump of file SATURN:[PCCOMMON.DUMP.DLL]ABOUT.TMP;1 on 18-APR-1990 10:36:14.56
File ID (483,24,0)   End of file block 34 / Allocated 36

Virtual block number 33 (00000021), 512 (0200) bytes

 0A0A0A0A 0A0A0A0A 0A0A0A0A 0A0A0A0A 0A0A0A0A 0A0A0A0A 0A0A0A0A 0A0A0A0A ................................ 000000
 0A0A0A0A 0A0A0A0A 0A0A0A0A 0A0A0A0A 0A0A0A0A 0A0A0A0A 0A0A0A0A 0A0A0A0A ................................ 000020
 0A0A0A0A 0A0A0A0A 0A0A0A0A 0A0A0A0A 0A0A0A0A 0A0A0A0A 0A0A0A0A 0A0A0A0A ................................ 000040
 0A0A0A0A 0A0A0A0A 0A0A0A0A 0A0A0A0A 0A0A0A0A 0A0A0A0A 0A0A0A0A 0A0A0A0A ................................ 000060
 00000000 000A0A0A 0A0A0A0A 0A0A0A0A 0A0A0A0A 0A0A0A0A 0A0A0A0A 0A0A0A0A ................................ 000080
 00000000 00000000 00000000 00000000 00000000 00000000 00000000 00000000 ................................ 0000A0
 00000000 00000000 00000000 00000000 00000000 00000000 00000000 00000000 ................................ 0000C0
 00000000 00000000 00000000 00000000 00000000 00000000 00000000 00000000 ................................ 0000E0
 00000000 00000000 00000000 00000000 00000000 00000000 00000000 00000000 ................................ 000100
 00000000 00000000 00000000 00000000 00000000 00000000 00000000 00000000 ................................ 000120
 00000000 00000000 00000000 00000000 00000000 00000000 00000000 00000000 ................................ 000140
 00000000 00000000 00000000 00000000 00000000 00000000 00000000 00000000 ................................ 000160
 0000084A FFFF0840 06A30000 0000011C 1AA00000 00EA008E 00002000 00000000 ..... ....õ...........Ê.@...J... 000180
 203A00F0 3E3E4753 4D4E3C3C 00000000 00000000 0B580856 0B4C3FF8 00000000 ....½?L.V.X.........<<NMSG>>».:  0001A0
 6500203A 726F7272 6520746E 696F702D 676E6974 616F6C66 20200A00 4854414D MATH..- floating-point error: .e 0001C0
 65766F00 68000A00 30207962 20656469 76696400 67000A00 64696C61 766E6900 .invalid...g.divide by 0...h.ove 0001E0
```

```
Dump of file SATURN:[PCCOMMON.DUMP.DLL]ABOUT.TMP;1 on 18-APR-1990 10:36:14.56
File ID (483,24,0)   End of file block 34 / Allocated 36

Virtual block number 34 (00000022), 512 (0200) bytes

 70786500 70000A0D 776F6C66 7265766F 20686361 7473006E 000A0D77 6F6C6672 rflow...n.stack overflow...p.exp 000000
 73202D0A 003030 ) 36520000 000A0D64 65746172 656E6567 20796C74 6963696C licitly generated.....R6000..- s 000020
 6765746E 6920[illegible] 00333030 36520003 000A0D77 6F6C6672 65766F20 68636174 tack overflow.....R6003..- integ 000040
 20746F6E 20200A0D 38303036 52000800 0A0D3020 79622065 64697669 64207265 er divide by 0.....R6008..- not  000060
 52000900 0A0D7374 6E656D75 67726120 726F6620 65636170 73206867 756F6E65 enough space for arguments.....R 000080
 766E6520 726F6620 65636170 73206867 756F6E65 20746F6E 20200A00 39303036 6009..- not enough space for env 0000A0
 726F7272 6520656D 6974206E 757200FF 000A0000 FC000A0D 746E656D 6E6F7269 ironment...•......run-time error 0000C0
 20746F6E 20746E69 6F702067 6E697461 6F6C6620 200A0D32 30303652 00020020  ...R6002..- floating point not  0000E0
 00020000 0004085A 00020000 00030848 00020003 FFFFFF00 0A0D6465 64616F6C loaded...........H.......2....... 000100
 00000000 00000000 00000000 00000000 00000000 00000000 00000000 0005042A •............................... 000120
 00000000 00000000 00000000 00000000 00000000 00000000 00000000 00000000 ................................ 000140
 00000000 00000000 00000000 00000000 00000000 00000000 00000000 00000000 ................................ 000160
 00000000 00000000 00000000 00000000 00000000 00000000 00000000 00000000 ................................ 000180
 00000000 00000000 00000000 00000000 00000000 00000000 00000000 00000000 ................................ 0001A0
 00000000 00000000 00000000 00000000 00000000 00000000 00000000 00000000 ................................ 0001C0
 00000000 00000000 00000000 00000000 00000000 00000000 00000000 00000000 ................................ 0001E0
```

Dump of file SATURN:[PCCOMMON.DUMP.PBIN]SETUP.EXE;1 on 18-APR-1990 08:07:51.45
File ID (375,16,0)   End of file block 32 / Allocated 32

Virtual block number 1 (00000001), 512 (0200) bytes

```
00000000 00000040 00000000 00000008 0000FFFF 00000004 0000001D 008F5A4D MZ..............¡.......a....... 000000
00000080 00000000 00000000 00000000 00000000 00000000 00000000 00000000 ................................ 000020
6F6E6E61 63206D61 72676F72 70207369 685421CD 4C01B821 CD09B400 0EBA1F0E ..¤..Ç.ëI¡.LÍ!This program canno 000040
00000000 00000024 0A0D002E 65646F6D 20534F44 206E6920 6E757220 65622074 t be run in DOS mode....$....... 000060
00050011 00030000 000100C6 10001000 0003030A EF8D780C 00020135 0505454E NE..5....(§ÿ........ó........... 000080
00000000 00000000 0001000E 00040000 00000187 01130109 010000C8 00400016 ..a.à.......ñ................... 0000A0
00441EB1 00440393 09A00F01 08050311 02C00E01 00000000 20960F00 2096001D ...·...·......à...........D.Ÿ.D. 0000C0
00271EB1 002703A2 00261EB1 0026039F 002E1EB1 002E039C 00321EB1 00320398 ..2.Ÿ.2.....Ÿ.....&.Ÿ.&.Å.'.Ÿ.'. 0000E0
004B1EB1 004B03B3 00471EB1 004703AE 004F1EB1 004F03A9 00311EB1 003103A5 Ê.1.Ÿ.1.`.O.Ÿ.O.Û.G.Ÿ.G.°.K.Ÿ.K. 000100
00F31EB1 00F303C3 000A1EB1 000A03C2 00391EB1 0039038E 005B1EB1 005B0388 ¡.[.Ÿ.[./.9.Ÿ.9.ó...Ÿ...û.µ.Ÿ.µ. 000120
00310005 00230005 00220005 00250005 00240005 00210005 000A1EB1 000A0303 Æ.Ö.Ÿ.Ö...!...$...%..."...#...1. 000140
02000004 01000004 00010008 00450005 00440005 00430005 00420005 00410005 ..A...B...C...D...E............. 000160
40500553 4C4C4143 534F4408 00001E00 16001000 0A000100 00005055 54455305 .SETUP...............DOSCALLS.PM 000180
204E414D 48434142 12000053 4C4E0349 50414853 40500749 50474050 054E4957 WIN.PMGP1.PMSHAP1.NLS...BACHMAN  0001A0
FF9A006A D88EFFFF 881E5657 000512C8 00000000 00007075 74655320 30312E33 3.10 Setup......à...WV.¡...Áj... 0001C0
9689FDF4 86890000 FFFF9A00 6AFDEEB6 FFFDF0B6 FFFDF096 89FDEE86 890000FF .....Ÿ»..Þ».ÑÞ».ÑŸ»j........¶».. 0001E0
```

Dump of file SATURN:[PCCOMMON.DUMP.PBIN]SETUP.EXE;1 on 18-APR-1990 08:07:51.45
File ID (375,16,0)   End of file block 32 / Allocated 32

Virtual block number 2 (00000002), 512 (0200) bytes

```
5D0FFA9A 5016FF00 86800477 FF260677 FF26085E C40082E9 03740206 7E83FDF6 -».-..t.Õÿ.á^.&.w.&.w......P.°.] 000000
86800015 E903745C FEFFBA80 F08804C4 83007710 5A9A5016 FF008680 08C48300 ..á.......P.Z.w..á..Þ.¤.±\t.Õ.... 000020
00A511CC 9A5016FF 00868D00 6A00FEFF 82C6F088 04C48300 8E105A9A 5016FF00 ...P.Z....á..Þó..±.j.......P.a.E. 000040
B6FFFDF6 B6FF06C4 8300D70C D19A0440 685016FF 00868D00 31E90374 4006C483 .á.at.Õ1......Pha..1.a..á..Ñ-».Ñ 000060
86800042 681E033C E90001B8 0000FFFF 9AFDEEB6 FFFDF0B6 FF0000FF FF9AFDF4 ¶».......ÑÞ».ÑŸ».....¡..Õ<..hB... 000080
0086C600 05E904C4 83012D11 A49A5016 FF008680 08C48300 E50FB49A 5016FF00 ...P.Ç.Í..á......P.Ê.-..á.Õ..ó.. 0000A0
006A006A 006A0000 011E9A50 5201198A 00008830 6A020068 006A006A 006A00FF ..j.j.j.h..j=¡..¤..RP.....j.j.j. 0000C0
83FFFF04 089A5052 FFFFBA00 00880000 FFFF9A50 5201268A 023EB83D 6A030068 h..j=¡>.¤&.RP.....¡..¤..RP...... 0000E0
8E000002 7E06C726 0040027C 06C72606 FA068E02 7DE90003 E9037500 003004C4 á.=..u.Õ..Õ)...°.&ú.|.a.&ú.-.... 000100
06C72606 FA068E04 C483010F 0C809A50 52035C8A 02A08800 028106C6 2606FA06 .°.&ó....¡..¤\.RP...Õ..á...°.&ú. 000120
A3260292 A3260000 8806FA06 8E029CA3 26029EA3 26000088 06FA068E 000202A0 .......°.¡..&Ê..&Ê....°.¡..&Ê..&Ê 000140
C69A5016 FAEE8680 01006802 3068006A 006A006A 03028006 C62606FA 068E0290 ....°.&ó....j.j.j.h0.h....Ÿ°.P.ó 000160
7400FF00 8E800000 01069A50 16FDFC86 80010068 02106800 6A006A00 6A000001 ...j.j.j.h..h....•».P......ƒ...t 000180
03740008 FDFA9689 FDF88689 06C48302 1711769A 5016FAEE 868D5C6A 00C9E903 .Õè.j\..Ÿ°.P.v....á...½»..°».Åt. 0001A0
FA9688FD F8868B00 44681E50 16FF0086 8DFDFA96 8CFDF886 89FAED86 8D000CE9 Õ....Ü°..½»..°».....P.hD...½»..° 0001C0
FCEE868D 505204C4 83023511 A49A5016 FF00868D 0CC48302 2528EA9A 505240FD »aRP.õ+%..á......P.Ê.5..á.RP..Ÿ• 0001E0
```

Dump of file SATURN:[PCCOMMON.DUMP.PBIN]SETUP.EXE;1 on 18-APR-1990 08:07:51.45
File ID (375,16,0)   End of file block 32 / Allocated 32

Virtual block number 3 (00000003), 512 (0200) bytes

```
9689FDF8 868906C4 83025F11 769A5016 FF00868D 5C6A08C4 8302450F FA9A5016 .P.°.E..á.j\.....P.v._..á...½».. 000000
C626FDF8 9EC4019C E9000188 02C48302 70DCD19A 04106800 11E90374 D008FDFA °».Åt.Õ..h...Ì.)..á.¡..Õ..á.½»&ó 000020
09E90375 D008FDFA 9689F0F8 868906C4 83028611 769A5016 FF00868D 5C6A0007 ..j\.....P.v.Ñ..á...½»..°».Åu.Õ. 000040
EE868000 49681E50 16FF0086 8D5016FA EE868D00 1EE90001 47C626FD F89EC400 .á.½»&6G..Õ....Ÿ°.P.....P.hI...Ÿ 000060
8D08C483 02DE0FFA 9A5016F8 EE868D50 16FF0086 8D10C483 02CA1072 9A5016FC •.P.r.ò..á......P..Ÿ«.P.°.B..á.. 000080
C483036B 11A49A50 16FBEE86 8D08C483 02EC0F84 9A5016F8 EE868D50 16FDFC86 .•».P..Ÿ«.P.Ç.š..á...Ÿ«.P.Ê.k..á 0000A0
8C260294 A326FBEE 868D06FA 068E028E 168C2602 8CA326FC EE868D06 FA068E04 ...°...Ÿ•&Ê..&......°...Ÿ«&Ê..&. 0000C0
6A016A00 6A0000FF FF9A056A 006A016A 006AFEFC 8689FEFE 86890000 88029616 ...¡....±±..•±j.j.j.j......j.j.j 0000E0
FFFEFEB6 FF016A00 6A0011E9 0375D008 FEFE9689 FEFC8689 0000FFFF 9A006A03 .j........•±..±±.Åu.Õ..j.j..Ñ±±. 000100
08C48300 4F044E9A 50520101 8A000088 50520364 8A028C88 0000FFFF 9AFEFCB6 Ñ•±......¡¥.¤d.RP¡..¤..RP.N.O..á. 000120
E9037201 FDF28E83 FDF286FF 0004E900 00FDF286 C7003FE9 0003E903 7500003D =..u.Õ..Õ?.ú..»..Õ.....».ƒ·».r.Õ 000140
7500003D 06C48301 6404B89A FDF2B6FF 02BC36FF 2602BE36 FF2606FC 068E0028 (...•.&.6ƒ.&.6¥..Ñ·».¡.d..á.=..u 000160
00FA8300 15E90374 00053000 00FFFF9A 006A016A 006AFFCA E90003E9 0003E903 .Õ..Õ..Õò.j.j.j......=..t.Õ...°. 000180
FF000000 839AFDF4 B6FFFDF6 B6FF0000 03279A00 6A006A01 6A006A00 0DE90374 t.Õ..j.j.j.j..'....Ñ-».Ñ¶».°.... 0001A0
57000000 C8CBC95F 5E1F02C4 8303A70F 429A006A 000000C0 9AFDEEB6 FFFDF0B6 ÑÞ».ÑŸ».à...j..B.Ì..á..^_èùà...W 0001C0
0676FF08 76FF0100 68006AFF FF680401 68016A00 6A016A00 6AD88E00 08B81E56 V.¡...Åj.j.j.j.h..h..j.h...v..v. 0001E0
```

Dump of file SATURN:[PCCOMMON.DUMP.PBIN]SETUP.EXE;1 on 18-APR-1990 08:07:51.45
File ID (375,16,0)   End of file block 32 / Allocated 32

Virtual block number 4 (00000004), 512 (0200) bytes

```
04C8CBC9 5F5E1F00 00E90000 880006E9 00018800 06E90374 00013000 00FFFF9A .....=..t.Ô..¡..Ô..¡..Ô...^_èùà. 000000
890000FF FF9A006A 0676FF08 76FF0054 36FF0056 36FFD88E 0413B81E 56570000 ..WV.¡...A.6V..6T..v..v.j....... 000020
9A042068 0676FF08 76FF5000 00FFFF9A 006A006A 0021E903 74D00BFE 5689FC46 F=.V±.Ât.Ôl.j.j......P.v..v.h .. 000040
00008802 57892607 8926FE56 88FC4688 0A5EC400 16E90001 8808C483 04200CD1 Ì. ..á.¡..Ô..á^..F=.V±&..&.W.¡.. 000060
B7FF0606 5E68006A 006A006A D88E0456 881E5657 0001A2C8 CBC95F5E 1F0000E9 Ô...^_èùàÂ..WV.¡V..Âj.j.j.k^...ñ 000080
0011E901 19E90000 8C0009E9 03740000 30000005 199A5016 FE5E8680 3C6A004E N.j<..^±.P.....=..t.Ô..¡..Ô..Ô.. 0000A0
680050B7 FF06065E 68006A00 6A006A02 8A168C26 0288A326 FE5E8680 Γ'ᶠA068E ..ª...^±&É..&....j.j.j.k^...ñP.h 0000C0
98A326FF 00868006 FA068E00 14E90375 00003000 00055F9A 5016FE5E 86.`00FF ....^±.P._...=..u.Ô....ª.....&É. 0000E0
5E68006A 006A006A 0298A326 029AA326 00008806 FA068E00 0FE9029A 168.'602 .&....Ô....ª.¡..&É..&É..j.j.j.k^ 000100
8D06FA06 8E0014E9 03750000 30000001 AF9A5016 FE9C8680 646A0052 87FF0606 ...ñR.jd...±.P.£...=..u.Ô....ª.. 000120
86800290 A3260292 A3260000 8806FA06 8E000FE9 0292168C 260290A3 26FE9C86 ..±&É..&....Ô....ª.¡..&É..&É.... 000140
05E5BA02 7CB80054 36FF0056 36FF08C4 8305F50A CE9A0876 FF0A76FF 5016FE5E ^±.P.v..v..ö.%..á..6V..6T.¡|.¤l. 000160
FF0A76FF 005436FF 005636FF 003CE903 74000800 00FFFF9A 0876FF0A 76FF5052 RP.v..v.......Ât.Ô<..6V..6T..v.. 000180
685016FE 5E868050 5201508A 00008850 00000481 9A006A00 6A0000FF FF9A0876 v......j.j......P¡..¤].RP..^±.Ph 0001A0
57000048 C8CBC95F 5E1F0000 E9000088 0006E900 01B80CC4 8304920C D19A0430 0..Ì....á.¡..Ô..¡..Ô...^_èùàH..W 0001C0
76FF1276 FF04C483 064C0A56 9A1076FF 1276FF02 82E90E46 88D88E04 C0881E56 V.¡á..Á.F.Ô...v..v..V.L..á..v..v 0001E0
```

Dump of file SATURN:[PCCOMMON.DUMP.PBIN]SETUP.EXE;1 on 18-APR-1990 08:07:51.45
File ID (375,16,0)   End of file block 32 / Allocated 32

Virtual block number 5 (00000005), 512 (0200) bytes

```
C483059D 08689AFF 6AFF6A50 16884680 08081689 0806A300 00FFFF9A 01106810 .h.......É.......F¡.Pj.j..h....á 000000
00000688 9A505205 AE8A023E 88FF6A00 6A016168 080636FF 080836FF FE468908 ..F±.6...6..ha.j.j.¡>.¤Ù.RP..... 000020
00FA46C7 000006C3 9A006A00 6AFC76FF 006A0169 68080636 FF080836 FFFC4689 .F=.6...6..hi.j..v=j.j..ú...úFª. 000040
6A006A01 61680806 36FF0808 36FF0050 E90372FA 4639FE46 88FA46FF 0003E900 .Ô...Fª.F±9Fªr.ÔP..6...6..ha.j.j 000060
36FF0808 36FFFC46 89000006 E89A0C70 FF260E70 FF26885E C404E6C1 FA7688FF ..vªèl.á^¡&.p.&.p..Š....F=.6...6 000080
E9000007 069A30FF 260270FF 268876C4 04E3C1FA 5E88FC76 FF006A01 69680806 ..hi.j..v=.^ªèD.áv¡&.p.&.0.....Ô 0000A0
FFFF9A8A 76FF0000 FFFF9A01 6A006A00 6A006A01 64680806 36FF0808 36FFFFA2 Â..6...6..hd.j.j.j.j.......v¤... 0000C0
91E9019D E90000BA 00008800 00FFFF9A 0676FF08 76FF006A 1076FF12 76FF0000 ...v..v.j..v..v......j..¤..Ô..Ô. 0000E0
68080636 FF080836 FF00E9E9 00000816 9A016A10 76FF1276 FF00E6E9 0A468801 ..F.Ôl..v..v.j......ÔÔ..6...6..h 000100
36FF00C2 E90003E9 0374FFFC 7E83FC46 89000007 8C9A006A 006A006A 006A0165 e.j.j.j.j.......F=.~=.t.Ô..Ôó..6 000120
0000066C 9A50168C 46805052 30CA8300 0000D228 FC468801 68680806 36FF0808 ...6..hh..F=+@....ò=RP.F¥.P.l... 000140
1276FF00 44E90374 00003008 C48307C4 10309A50 168C4680 50520667 BA023E88 ¡>.¤g.RP.F¥.P.0.á..á.=..t.ÔD..v. 000160
6A006A01 6A006A08 C48307D2 0FFA9A50 168C4680 50520000 07FF9A00 6A1076FF .v.j......RP.F¥.P.ª.@..á.j.j.j.j 000180
3FE90003 E9037400 01300000 04319A50 168C4680 02006800 6AFFFF68 08086801 .h..h..j.h...F¥.P.1...=..t.Ô..Ô? 0001A0
1276FF08 C4830626 0FFA9A50 520000FF FF9A006A 1076FF12 76FF5016 BC468000 ..F¥.P.v..v.j.......RP.ª.&..á..v. 0001C0
0000E9FF 1AE90375 030030FF 12E90375 00023000 13E90000 08759A00 6A1076FF .v.j..u...Ô..=..u.Ô..=..u.Ô..Ô.. 0001E0
```

Dump of file SATURN:[PCCOMMON.DUMP.PBIN]SETUP.EXE;1 on 18-APR-1990 08:07:51.45
File ID (375,16,0)   End of file block 32 / Allocated 32

Virtual block number 6 (00000006), 512 (0200) bytes

```
6A030068 006A206A 1076FF12 76FF0016 E9037405 0C7E8300 25E90A46 88008FE9 Ô...F.Ô%..~..t.Ô...v..v.j j.h..j 000000
FF1276FF 0056E900 00E9FFD3 E9037501 1030000B E9000EE9 0000FFFF 9A006A00 .j......Ô..Ô..=..u.Ô£.Ô..ÔV..v.. 000020
76FF0876 FF0A76FF 0C76FF0E 76FF1076 FF1276FF 0046E900 00FFFF9A 016A1076 v.j......ÔF..v..v..v..v..v..v..v 000040
30FFBDE9 03750029 30FE8AE9 03750020 300023E9 0026E900 32E90000 FFFF9A06 ......Ô2.Ô&.Ô#.= .u.Ô.±=).u.Ô§.= 000060
CAC95F5E 1F0000E9 0000BA00 00B8FFBA E9FD5EE9 0375003B 30FF7CE9 03750030 0.u.Ô|.=;.u.Ô^»Ô¤.¡..¤..Ô...^_èò 000080
83097F0A 569A1076 FF1276FF 0147E90E 4688D88E 0613B81E 56570000 3EC8000E ..à>..WV.¡...Ä.F.ÔG..v..v..V.... 0000A0
43680210 681076FF 1276FF00 0007219A 0676FF08 76FF006A 1076FF12 76FF04C4 á..v..v.j..v..v..l....v..v.h..hC 0000C0
76FF5052 00000965 9A021068 1076FF12 76FF0000 FFFF9A00 6A006A3C 6A006A01 .j.j<j.j.......v..v.h...e...RP.v 0000E0
76FF1276 FF0097E9 0A468801 01E90100 E90000BA 00008800 00FFFF9A 0676FF08 ..v......¡..¤..Ô..Ô...F.Ô...v..v 000100
C24680 3C 6A505200 0009A59A 02106810 76FF1276 FF009AE9 00000908 9A016A10 .j..Ä...Ô...v..v.h...É...RPj<.Fò 000120
9A040068 0027E903 74000030 04C48309 92105A9A 5016C246 800000FF FF9A5016 .P......Fò.P.Z....á.=..t.Ôª.h... 000140
0000FFFF 9A505200 0006359A 02106810 76FF1276 FF016A00 6A02C483 09CA0CD1 Ì.ò..á.j.j..v..v.h...5...RP..... 000160
FF08C483 07A00FFA 9A505200 0007B69A 006A1076 FF1276FF 5016C246 800042E9 ÔB..Fò.P.v..v.j..Ñ...RP.ª....á.. 000180
E9037503 0030FF61 E9037500 02300013 E90016E9 00000740 9A006A10 76FF1276 v..v.j..ā...Ô..Ô..=..u.Ôa.=..u.Ô 0001A0
76FF1076 FF1276FF 003EE900 0009549A 016A1076 FF1276FF 004EE900 00E9FF69 i.Ô..ÔN..v..v.j..T...Ô>..v..v..v 0001C0
03750020 300018E9 001EE900 2AE90000 08929A06 76FF0876 FF0A76FF 0C76FF0E ..v..v..v..v......Ôª.Ô..Ô..= .u. 0001E0
```

```
Dump of file SATURN:[PCCOMMON.DUMP.PBIN]SETUP.EXE;1 on 18-APR-1990 08:07:51.45
File ID (375,16,0)   End of file block 32 / Allocated 32

Virtual block number 7 (00000007), 512 (0200) bytes

 1F0000E9 00008A00 0088FFC2 E9FEA1E9 03750038 30FFBDE9 03750029 30FF12E9 Õ..=).u.Õ§.=;.u.ÕÀ±Õó.¡..¤..Õ... 000000
 00000A7C 9A5016u8 468D016A 006AD88E 080A881E 56570000 28C8000E CAC95F5E ^_èò..à(..WV.¡Õ..Äj.j..FÀ.P.|... 000020
 89EC4628 F44688FE 4689E846 28F04688 0000FFFF 9A5016E8 46800676 FF0876FF .v..v..FÒ.P......FÞ+FÒ.F±.F¶+F&. 000040
 76FFF846 89F8D1C2 2899FA46 28E44688 FC4689F8 D1C22899 FE4628E0 4688FA46 F*.FÀ+F±.+ôî%.F=.Fð+F*.+ôî%.F%.v 000060
 08C8CBC9 5F5E1F00 00FFFF9A 026A006A 006AF876 FFFC76FF 036A006A 0676FF08 ..v.j.j..v=.v%j.j.j.......^_èùà. 000080
 F8468908 C4830828 08689A06 76FF0876 FF5016FA 4680088E 0A5E881E 56570000 ..WV.j^..Ä.F*.P.v..v..h.+..Ž..F% 0000A0
 4AE90372 FE4639F8 4688FE46 FF0003E9 0000FE46 C70068E9 0003E903 74000030 =..t.Õ..Õh.úF±..Õ...F±.F%9F±r.ÕJ 0000C0
 08C48308 ED10309A 0C70FF26 0E70FF26 FA5EC404 E6C1FE76 880A76FF 0C76FF00 ..v..v..v±è!.á^*&.p.&.p..0.Ú..á. 0000E0
 30FF2602 70FF26FA 76C404E3 C1FE5E88 005436FF 005636FF 0020E903 74000030 =..t.Õ ..6V..6T..^±èÐ.áv*&.p.&.0 000100
 881E5657 00000CC8 CBC95F5E 1F000007 0E9AFC76 FFFFA8E9 0008E900 00FFFF9A .....Õ..Õ`..v=......^_èùà...WV.¡ 000120
 8D006A00 6A006A00 6A0676FF 0876FF00 5436FF00 5636FF00 00F846C7 D88E0AD6 ø..ÀúF%...6V..6T..v..v.j.j.j.j.. 000140
 0054E900 00880006 E90374F6 4608F446 88F65689 F4468900 0008EA9A 5016F846 F%.P.õ....F¶.V-.F¶.F-t.Õ..¡..ÕT. 000160
 36FF0056 36FFFC56 89FA4689 C028FE56 880000FF FF9A006A 5016FE46 8DF476FF .v¶.F±.Pj.......V±+à.F*.V=.6V..6 000180
 5EC40000 FFFF9A50 16F8468D F476FFF6 76FFFA76 FFFC76FF 0676FF08 76FF0054 T..v..v..v=.v*.v-.v¶.F%.P.....á^ 0001A0
 1E565700 0008C8C8 C95F5E1F 0000E9F8 46880257 89260789 26FC5688 FA46880A ..F*.V=&..&.W..F%Õ...^_èùàÄ..WV. 0001C0
 00008800 06E90374 D008FF2A 9689FF28 86890000 FFFF9A01 6A006AD8 8E087088 ¡p..Äj.j........(...*.¯Àt.Õ..¡.. 0001E0
```

```
Dump of file SATURN:[PCCOMMON.DUMP.PBIN]SETUP.EXE;1 on 18-APR-1990 08:07:51.45
File ID (375,16,0)   End of file block 32 / Allocated 32

Virtual block number 8 (00000008), 512 (0200) bytes

 FFFF2AB6 FF0000FF FF9A5016 FF30868D 00006800 6AFF28B6 FFFF2AB6 FF0048E9 ÕH..Ñ*..Ñ(.j.hÀ...0..P......Ñ*.. 000000
 E0D1A046 88FF2E96 89FF2C86 890000FF FF9A266A 016A006A 0000FFFF 9AFF28B6 Ñ(......j.j.j&..............F.îÀ 000020
 26065EC4 D88E0C11 881E5657 000000C8 CBC95F5E 1F0000E9 FF2C8603 FF7C8603 ..|...,.Õ...^_èùà...WV.¡...Äá^.& 000040
 26065EC4 00000C8A 9A146A01 6A006A06 47892606 5EC40AE8 0C099A00 000847C7 úG......Õ.á^.Ž.G.j.j.j..¤...á^.Ž 000060
 C95F5E1F 02478926 065EC406 472B2606 5EC40000 0C5F9A15 6A016A00 6A044789 .G.j.j.j.._....á^.&+G.á^.&.G..^_è 000080
 DB9A5016 FE80868D 506A0676 FF006A00 6A006AD8 8E0C8888 1E565700 0154C8CB ùàT..WV.¡...Äj.j.j..v.jP..¯±.P¯Û 0000A0
 FE80868D 0058681E 0676FF50 0000050C 9A006A00 6A001FE9 03740000 30000004 ...=..t.Õ..j.j..É...P.v..hX...¯± 0000C0
 B0868DFE AC86FFFE AE86FFFE AE968CFE AC868908 46800CC4 830D3C10 729A5016 .P.r.<..á..F...¯±..Û±.ÑÛ±.Ñ¯±..¯ 0000E0
 1E5016FF 00868D01 6A006A01 6A006A0C C4830C98 10F89A50 16FF0086 8D5016FE ±.P.....P.%....á.j.j.j.j......P. 000100
 4680D88E 0C09881F 56570001 04C8CBC9 5F5E1F00 00FFFF9A 40406801 6A008368 h..j.hàà......^_èùà...WV.¡)..Ä.F 000120
 10F89A50 16FF008C 500676FF 0876FFFE FC86FFFE FE86FFFE FE968CFE FC86890A ...=±..±±.Ñ±±.Ñ=±.v..v......P.%. 000140
 0000599A 40006801 6A008968 1E5016FF 00868D01 6A006A01 6A006A0C C4830015 ...á.j.j.j.j......P.h..j.h.à.Y.. 000160
 8C009A26 89009626 89FC0000 00000000 00000000 00000000 0000CBC9 5F5E1F00 ..^_èù................•.&...&... 000180
 8804BEA3 E0865800 00FFFF9A 5016C48B 5000901E 890092A3 00940E89 49009C1E ...Ï....È......P.á.P.....X.ÀÈ/.¡ 0001A0
 FF04F536 FF0E0412 589A00FF 221A9A00 900E889A 0048E800 00FFFF9A 501E04C0 á..P.....ÒK..¡......"...X....6%.. 0001C0
 06C73600 03880E22 0F429A50 0E090000 9A04E036 FF04EF36 FF04F136 FF04F336 6µ..6þ..6y..6Ú......P.B.".¡..6ú. 0001E0
```

```
Dump of file SATURN:[PCCOMMON.DUMP.PBIN]SETUP.EXE;1 on 18-APR-1990 08:07:51.45
File ID (375,16,0)   End of file block 32 / Allocated 32

Virtual block number 9 (00000009), 512 (0200) bytes

 750004C0 3E800000 88009816 FF5000FF 880E3813 149A0E28 12089A50 0F420098 ..8.P...(....8.¡..P....£...>à..u 000000
 00308026 47017500 3080267F FF890092 068EFF33 480004A8 06C63804 9C06C608 .6...;6.`..K3.....¿..&.=.u.G&.=. 000020
 04C58F1F F788071E 062EE8E7 74AEF2C0 330874CA 88A6F3C8 88D18804 9C8E4374 tC/...î.ùµî.òt.3à·ÚtÒŠ.....%.¢é. 000040
 74C0FEAC 9198ACEE FBAAC20A 1172412C AC92E002 1972412C AC048114 750DFB83 .«.u.Ÿ.¯,Ar.ØÀ.¯,Ar..ô¯ŠŸ¯..¯±ât 000060
 0000FFFF 9A521650 1653C488 508704C5 A7800488 52000288 C31F16F7 E2AA4801 .H¯ã%..úÉ..R.â.Ïé.ñP.áS.P.R..... 000080
 885050C0 335A0479 4804C58F 08088106 75000230 07740001 30408112 7558C008 .àXu.Ÿà=..t.=..u.Ÿ...é.KyâZ3âPP. 0000A0
 DA8C06EE 06C50092 368829E3 06EC0E88 58580000 FFFF9A53 16520E0E 2A8A500C ÉP¤*..R.S.....XX..&.D).6..é.Ÿ..Ö 0000C0
 8E1F1606 EA1EFF36 0003880A 8C06F206 C536030E E91F1605 7306EA1E FF360B33 3Ú6..ô.s...Õ..6é.·..ÖÉ..6..ô.../ 0000E0
 F68E0052 E8099E8F 099E8EEC 8855C800 5FE806F6 8F06F68E 0068E806 F68F06F6 -.¢-.Õh./-.¢-.Õ_.ùU.š/..¢..ÕR./- 000100
 329A0032 E806FA8F 06FA8E00 38E806FA 8F06FA8E EC885503 E80049E8 06FA8F06 .¢*.ÕI.Š.U.š/*.¯¢*.Õ;./*.¢*.Õ2..2 000120
 FFFF9A50 06468A50 00018800 0DE800FF 0646C705 7500067E 830B74C0 080E3D12 .=..ât..-..u.úF...Õ..¡..P.F.P... 000140
 1DFFF274 02450805 8804EF83 0E73F738 C306EA1E FF000288 07E306EC 0E880000 ....š.D.£....õ.ú;%s..ÿ....E.t·.. 000160
 F2FFFF89 0A7EC4FF 758DAEF2 FFFF89C0 33067EC4 1EDE88D7 88EC8855 00C3EEE8 ŠŸú.U.š.■.Ñ.á-.3â¿..·Ú.u.á~.¿..· 000180
 F3C913A5 F3E9D149 A4027400 01C6F706 4688FE87 08468ED8 8EC08CF9 28D1F7AE Ú%î+*.à.À.F..±.F.%ó..t.ÈÌîÕµÊ.èµ 0001A0
 FFFF89C0 33C08ED8 8CFE880A 76C51EDE 88D788EC 8855C850 C28C1FFA 88F388A4 Ê.µ.*..ò)ùU.š.■.Ñ.év..±.À.à3â¿.. 0001C0
 CB50C28C 1FFA88F3 88A4F3C9 13A5F3E9 D149A402 7401A8C7 88067EC4 D1F7AEF2 ·Ú%îá-..ú´.t.ÈÌîÕµÊ.èµÊ.µ.*..ò)ù 0001E0
```

Dump of file SATURN:[PCCOMMON.DUMP.PBIN]SETUP.EXE;1 on 18-APR-1990 08:07:51.45
File ID (375,16,0)   End of file block 32 / Allocated 32

Virtual block number 10 (0000000A), 512 (0200) bytes

```
1DC01805 74A6F3F9 28D1F7AE F2FFFFB9 C0330A7E C40676C5 1EDE88D7 88EC8855 U.&.m.B.év.á-.3à¿...ÚK|+*µlt..á. 000000
5DFA8891 49D1F7AE F2FFFFB9 C033067E C4D788EC 885500CB 5DFA88F3 881FFFFF ....µ.*]ù.U.$.mé-.3à¿...ÚK||..*] 000020
26F85EC4 FE568_FC 46890E46 8DFA568C F84689EC 46805657 16EC83EC 885500CB ù.U.&.&.WV.F$.F%.V*.F..F•.V±á^½& 000040
167FFF04 47C72602 57892607 89260857 89260647 89260856 88064688 420A47C6 6G.B.F..V.&.G.&.W.&..&.W.&úG.... 000060
C02A1278 044FFF26 F85EC4F0 880CC483 10EA156A 9A53060A 76FF0C76 FFFC76FF .v•.v..v..S.j.õ..á..Þá^½&.O.x.*á 000080
8806C483 0F7113E2 9A50C028 53FA76FF 9010EB05 88260247 8E2607FF 263F8826 &.?&..&.G.&..$...v*S+äP.ã.q..á.. 0000A0
0A47C626 FC5EC4FE 568CFC46 89F0468D 565712EC 83EC8855 90C85DE5 885F5EC6 ó^_.|]ù.U.&.&.WV.FÞ.F•.V±á^•&6G. 0000C0
FF1076FF 7FFF0447 C7260257 89260789 26085789 26064789 26085688 06468842 B.F..V.&.G.&.W.&..&.W.&úG....v.. 0000E0
26C02A11 78044FFF 26FC5EC4 F0880CC4 83116815 6A9A5306 0A76FF0C 76FF0E76 v..v..v..S.j.h..á..Þá^•&.O.x.*à& 000100
5EC68806 C48310BE 13E29A50 C02B53FE 76FF0FE8 05882602 478E2607 FF263F88 .?&..&.G.&..$..v±S+äP.ã./..á..ó^ 000120
2647AEF2 FD0A468A 4FD9F741 AEF2FFFF 89C03306 7EC457EC 885590CB 5DE5885F _.|]ù.U.$Wá-.3à¿...ÚAK\O.F.»ÚG& 000140
078AD388 065EC509 8CEC8855 CB5DE588 5FFCC28C C78804EB D088C033 06740538 B.t.3à.A$..ú.ô•_.|]ùU.&.1é^..Æ.. 000160
83EC8855 CB5DD98E DA8C92EF 75C00A07 8A430788 41040473 1A3C612C 1174C00A .àt.,a<.s..A..C¯..åuÿ..Õ.\]ùU.&. 000180
1374020A 46F61675 C0080000 FFFF9A50 50C03350 FE468D16 0676FF08 76FF02EC &..v..v...F±P3äPP......åu.-F..t. 0001A0
9A5000FC B8EC8855 00CB5DE5 8801A2E9 0196E900 05880000 8A0C7400 01FE46F7 %F±..t.¤..¡..Õ..ÕÄ..|]ù.U.&¡•.P. 0001C0
E9000288 CB5DE588 12121314 9A5000FF 8805001E FF047400 05023E83 28FD1314 ..»+.>...t.....¡..P......|]ù¡..Õ 0001E0
```

Dump of file SATURN:[PCCOMMON.DUMP.PBIN]SETUP.EXE;1 on 18-APR-1990 08:07:51.45
File ID (375,16, ›   End of file block 32 / Allocated 32

Virtual block number 11 (0000000B), 512 (0200) bytes

```
149A5000 01881226 12089A11 7455F480 F8E2E032 ACFCE432 00428 9F6 3356FC02 .•V3-¿B.2ô•¯2Äã«.¶Ut....&.¡..P.. 000000
053A26FF FF89FF33 F633C033 0092068E 0506068F 0504068F C85E0001 88124813 .H.¡..^ù...........3à3-3.¿..&:. 000020
A3E90009 88067311 87E8C603 E6D1E6D1 FE88FE24 40C78846 FA75AE46 AEF20674 t.·UFÙu*F.úä$±.±||i|.6ôñ.s.¡..ÔÈ 000040
049C0638 26048828 E3490716 F6331F06 D888FE03 F888CF88 04F5168C 04F3A3FB «Èµ...%..ü.½.±.Ä..3-..ID+..&¿... 000060
C00AAAAC 04C38302 578C263F 89260A74 595E5FA7 F3000689 049C8F57 56511075 u.QVWe..¿..µI_^Yt.&.?&.W..ù.¨¯.á 000080
C08ED88E 006A8857 56EC8855 0005042E FF07161F 16024F89 260F8926 D5E2FA75 u*ãI&..&.O.........U.$VW¡¡..Ä.á 0000A0
E5885E5F 96E8E8F7 88AEF2FF FF89C033 970C7496 401074C2 38AD0708 8E065688 .V./..Ù;òt.@.t..3à¿..·Ù.%$$._^.I 0000C0
D1F7AEF2 FFFFB9C0 33FA8892 1F74C008 125112E4 9A0676FF 57EC8855 0002CA5D ]ô..U.$W.v..ô.Q..ät...*3à¿..¯ÚK1 0000E0
02030202 16010002 CA5DE588 5F580000 FFFF9A50 1651521E 53000288 C4885049 IP.áE..S.RQ.P.....[_.|]ò........ 000100
00410235 02121211 0010120F 1600160C 0808070A 0C090C08 0C070906 00051804 ............................$.A. 000120
02CE0BA4 00840982 0A810A80 16060972 1C70206D 006C0859 00570053 00520243 C.R.S.W.Y.l.m p.r...........E.ö. 000140
C85DE588 99FFFF88 0008E8C8 5DE58899 FFFF8804 8A168904 C1A31608 000008D7 •.....Èè...¤.¡....|]ùÒ..¡....|]ù 000160
3C430A76 243C047? 133CF7E2 43431674 073A2E18 75E40AD0 24891 34A 8804C1A3 Èè.ÉJ.¿$..ôu..:..t.CCã%<.r.<$v.C< 000180
478A2608 5EC45657 08EC83EC 885500C3 048AA398 01478A2E 430176CA 3C04728C ¥r.<òv.C..G..É¤.û.U.$.$.WVá^.&.G 0001A0
26F84689 063C05E0 D1C103E0 D1C888F9 F7000C89 99054C2D C388FA46 89E42A08 .*ô.F*.ú-L..¿..K*.àIÄ.èIÄ.<..F½& 0001C0
26085EC4 900139E9 FFFF8820 0A4F8026 085EC40F 74400A47 F6260774 830A47F6 -G..t.&-G.@t.á^.&.O. ¡..Õ9..á^.& 0001E0
```

Dump of file SATURN:[PCCOMMON.DUMP.PBIN]SETUP.EXE;1 on 18-APR-1990 08:07:51.45
File ID (375,16,0)   End of file block 32 / Allocated 32

Virtual block number 12 (0000000C), 512 (0200) bytes

```
C02BEF0A 67802602 0A4F8026 90E2EB00 000447C7 26200A4F 80260E74 010A47F6 -G..t.&.O. &úG...$ã.&.O..&.g.ÿ+á 000000
03E3D108 88F9F700 0C899905 4C2DC388 51750C0A 47F626FC 7689F088 04478926 &.G..Þ.ve&-G..uQ.ü-L..¿..K*.ÄiD. 000020
81167505 64087E81 0E741492 0A7E8107 75055808 7E813775 01063C87 F6E30108 ÄiD-.<..u7.-.X.u..-...t..-.d.u.. 000040
C4830FD4 E80876FF 0A76FF0C 75C00802 C483150A 28089AFA 76FF0F75 12EA0A7E -.ô.u..v*..(...á..àu..v..v.Òå..á 000060
87F6E301 D803E301 D888F9F7 000C8999 054C20C3 881A7508 0A47F626 085EC404 .á^.&-G..u..ü-L..¿..K*.ÄiD.ÄiD-. 000080
88025789 26078926 40085788 26064788 26067728 26378826 085E8869 7401063C <..ti.^.&.7&+w.&.G.&.W.@&..&.W.. 0000A0
8908C483 152A254E 9AFA76FF 0677FF26 5256167E F6080447 89264802 4588F87E ~%.E.N&.G..--.VR&.w..v*.NX*..á.. 0000C0
C408C483 154F2510 9A535050 C0285000 02881174 2004C587 F6FA5E88 18E8FC46 F•$..^*-.é. t.¡..P+äPPS..%O..á.á 0000E0
1E254E9A FA76FF50 1606468D 50C68800 018E19E8 07882606 468A065F C426085E ^.&á_..F.&..$./...6P.F..P.v*.NX. 000100
000A88EC 8855C85D E5885F5E E42A0646 8AFE8EE9 0374FC76 39FC4689 08C48313 ..á.¯Fe9vet.Õ/±.F.*ô^_.|]ùU.&¡.. 000120
88064688 08281689 0826A310 56880E46 8808381E 8C0836A3 083C8814 9C241C9A ..$..¡<.É6...B..F..V.É&...(..F.. 000140
18E90374 25F67E80 0390E900 00083006 C7000008 3206C708 0E168908 0CA30856 V.È......ú.2...ú.0...Õ...—%t.Õ. 000160
0AA30810 A3082AA3 082CA308 14A3082E A30812A3 0816A3C0 28000108 3406C703 .ú.4...+àÉ..È..È..È..È,.È*.È..È. 000180
903EEB00 30099C06 C70A46FF 49753001 7F80260A 5EC40020 099C06C7 0824A308 .É$.ú... .á^.&...Oul.F.ú...0.$>. 0001A0
08163E83 0E75203F 80269028 E8000008 2A06C708 1606FF00 752B3F80 260A5E88 .^.&.?+u.....ú.*...$(.&.? u..>.. 0001C0
0A46FF08 2406FFC7 75203F80 260A5EC4 00E8080A 06FF9014 E8082A06 FF1A7500 .u...*.$......$.á^.&.?-uú..$..F. 0001E0
```

```
Dump of file SATURN:[PCCOMMON.DUMP.PBIN]SETUP.EXE;1 on 18-APR-1990 08:07:51.45
File ID (375,16,0)   End of file block 32 / Allocated 32

Virtual block number 13 (0000000D), 512 (0200) bytes

 E80E501E 083AB80A 76FF0C76 FFD075C0 0802C483 09AAE80E 5098078A 260A5E88 .^.&...P.Ò`..á..âuï.v..v.¡:..P.Ò 000000
 3E83083A A308F708 3AA10824 06FF0C7D 00083A3E 830C5689 0A468908 C48308F2 ·..á..F..V..>:..)...$.À:.%ÄÉ:..> 000020
 FF082C06 FF2E752E 3F80260A 5EC40020 099C06C7 06753009 9C3E8300 74000824 $..t..>..Ou.ú... .á^.&.?.u....,.. 000040
 C70A7D00 08343E83 0C56890A 468908C4 8308A5E8 0E501E08 34B80A76 FF060A46 F...v.¡4..P.ÒÉ..á..F..V..>4..).ú 000060
 302B7400 68304074 004E3030 74004630 98078A26 0A5EC408 2C0EFF00 01083406 .4......,.á^.&...=F.t==N.tä=h.t+= 000080
 0A5EC40A 46FF0375 4C3F8026 0A5EC409 75000814 3E830002 081406C7 0675006C l.u.ú......>...u.á^.&.?lu..F.á^. 0000A0
 00080814 06C7D0E8 00100814 06C7D8E8 00010814 06C79002 5CE91C75 003F8026 &.?.u.Ò\..ú.....$Äú.....$Äú..... 0000C0
 20F84683 081206FF 08750058 30057400 47300A74 004530F8 46899807 8A26C8E8 $ä&....F%=E.t.=G.t.=X.u......F%  0000E0
 E9037500 25300160 E9037E01 49E90375 00633001 9FE9037E 78740069 30F8468B .F½=l.tx-.Ò..=c.u.Òl.-.Ò'.=%.u.Ò 000100
 00000247 C7260789 260830A1 1FC42608 261EC415 75020814 3E839001 67E9014C l.Òg...>...u.á.&.&á.À0.&..&úG... 000120
 3E83017E E9037500 08323E83 04082606 83078926 0830A11F C4260826 1EC400E8 $.á.&.&á.À0.&....&...>2..u.Ò-..> 000140
 082E06FF 018AE9FF FF880180 E9037520 0A47F626 080C1EC4 01C8E903 74000830 0..t.Òù.á...&-G. u.Ò§.¡..Òo..... 000160
 06FF0810 06FF90F0 E8000888 90C1E802 C48301AC E80E5000 0A880000 080A06C7 ú.....¡..P.Ò`..á.$é.¡..$Þ....... 000180
 A3C02B7E 74010814 3E830085 E9037508 08143E83 00040834 06C7082C 06FF0812 ....,.ú.4....>...u.Ò...>...t-+ãÉ 0001A0
 13EB0000 083A06C7 0A740008 243E83FA 4689083A A1287408 3A0639FA 46890814 ...F*9.:.t(À:..F*.>$..t.ú.:...$. 0001C0
 013AE80E 50001088 02082606 83083AA3 C028027D C008083A A105083A 2E839090 ....:..À:..á).+ãÉ:...&..|..P.Ò:. 0001E0
```

```
Dump of file SATURN:[PCCOMMON.DUMP.PBIN]SETUP.EXE;1 on 18-APR-1990 08:07:51.45
File ID (375,16,0)   End of file block 32 / Allocated 32

Virtual block number 14 (0000000E), 512 (0200) bytes

 052DFA46 8B157400 08243E83 227400FA 7E8302C4 8304A1E8 0E50003A 8802C483 .á.¡:.P.ÒÀ..á..-*.t".>$..t..F*-. 000000
 0E500010 88040826 2E830000 083A06C7 9007EB08 3AA3C02B 027DC008 083AA300 .É:...á).+ãÉ:.$..ú.:......&..|..P. 000020
 01B8FF30 E90277E8 0E50C02B FF35E900 1088FF06 E9020826 068302C4 8300F7E8 Ò%..á...&..Ò..|..Ò5.+âP.Òw.Ò0.|. 000040
 E9037500 643090FF 15E90436 E80E5000 2588FF20 E90355E8 0EF876FF 90F3E800 .$µ..v½.ÒU.Ò .¡%.P.Ò6.Ò...=d.u.Ò 000060
 880A4688 0A4EFF0C 56880A46 88097400 08143E83 087E0067 30057C00 6530FEFE ±±=e.|.=g.-Á.>...t..F..V..N..F.. 000080
 7500703D FED8E903 75006F30 FE72E903 75006E30 903AEBFE 5689FC46 89400C56 V.@.F=.V±$:.=n.u.Òr±=o.u.ÒÁ±=p.u 0000A0
 EB0A46FF 9081E8FF 75E90375 00783DFE A8E90375 00753088 74007330 FE... 903 .Ò@±=s.t.=u.u.Ò ±=x.u.Òu.$Ÿ..F.$ 0000C0
 FF0C76FF 500A4628 C388EC75 253C0474 C00AF646 88078A26 FC5EC4FC 46FF. '34 4..F=á^=&...F-.ât.<%u$.ù+F.P.v.. 0000E0
 C00AF646 88078A26 0A5EC40C 56890A46 89FE5688 FC468806 C483045E E80E0/.76 v..Ò^..á..F=.V±.F..V.á^.&...F-.â 000100
 12EC83EC 8855C850 E5880830 A1FE43E9 0374200A 47F62608 0C1EC4FC 53E90374 t.ÒS=á...&-G. t.ÒC±À0..|)ùU.$.$. 000120
 07740208 143E8308 2E06FF04 740A067E 83002009 9C06C706 7400082C 3E835657 WV.>,..t.ü... ..-..t......>...t. 000140
 902CE804 08260683 FE5689FC 46890257 88260788 2608261E C4197510 08143E83 .>...u.á.&.&..&.W..F=.V±..&..$,. 000160
 99078826 08261EC4 0EE80000 FE46C7FC 4689078B 2608261E C4117400 082E3E83 .>...t.á.&.&...F=úF±..$.á.&.&... 000180
 9003E806 46880674 FE460BFC 46880E74 00080A3E 83020826 0683FE56 89FC4689 .F=.V±..&...>...t..F=.F±t..F.$.. 0001A0
 832B7000 FE7E8331 7500082E 3E83F456 89F24689 08381688 0836A109 9AA3C028 +âÉ..À6...8..F .V¶.>...ul.-±.)+. 0001C0
 89FC4689 DAF70002 8308F7FE 5688FC46 882007C6 26F246FF F25EC410 750A067E -..u.á^ .F &ó.-.F=.V±%Á.Ø.%Ò.F=. 0001E0
```

```
Dump of file SATURN:[PCCOMMON.DUMP.PBIN]SETUP.EXE;1 on 18-APR-1990 08:07:51.45
File ID (375,16,0)   End of file block 32 / Allocated 32

Virtual block number 15 (0000000F), 512 (0200) bytes

 FE76FF50 1E0676FF FA5E8CF8 46890818 880000F6 46C79006 E80001F6 46C7FE56 V±úF-..$..úF-..¡...F%.^*.v..P.v± 000000
 04C48315 73105A9A F876FFFA 76FF4574 00082C3E 830AC483 1A6B27FE 9AFC76FF .v=.±'k..á..>,...tE.v*.v½.Z.s..á. 000020
 F27EC4F0 4E880000 099A06C7 06750809 9A3E8300 7EC908F0 4E89C82B 08340E88 ..4.+à.NÞ.è-..>...u.ú......NÞá-· 000040
 76C5EE5E 8C08120E 88F04E89 F4468CF2 7E89F47F C00849C1 88473005 C62605EB $.&6.0G.èl.á.¶.-·.F¶.NÞ.....^Ÿév 000060
 7689E375 003F8026 F846FF46 202C8003 7C613C07 74C90804 88078A26 F85EC4F2 ·á^%&.....èt.<a|..., F.F%&.?.uÐ.v 000080
 0001B805 7500F67E 83087408 2A060808 16A11475 00082E3E 83EE5E8E F45E8CF2 ·.^¶.^Ÿ.>...u.À....*.t..--.u.¡.. 0000A0
 18740006 7E835657 10EC83EC 8855C850 E5885F5E 02C48303 11E80E50 C02802EB $.+âP.Ò...á.^_.|)ùU.$.$.WV.-...t. 0000C0
 C4137408 08143E83 008FE902 08260683 FA5689F8 46890828 16880826 A10001BE ƒ..À&...(..F%¯V*..&..Ò...>...t.á 0000E0
 8CF84689 FC468907 88260826 1EC410EB FA5689F8 46890257 88260788 2608261E .&.&..&.W..F%.V*$.á.&.&...F=.F%. 000100
 00FC7E83 900AEB05 08881575 FA4608F8 46880E74 0808143E 83040826 0683FA5E ^*..&...>...t..F%.F*u.¡..$...-=. 000120
 881C7408 2C3639F6 28F45689 F24689FA 5688F846 88FA5E8C F8468905 0F880975 u.¡...F%.^*.F%.V*.F .V¶+-96,.t.. 000140
 46FFF25E C44690ED E8107ECE 38461574 003F8026 F246FFF2 5EC4900E E808340E .4.$..á^ .F &.?.t.F;o-.$U.Fá^ .F 000160
 FA76FF56 02C48301 5FE80E57 08750008 243E83FE 28083A3E 88F37500 3F8026F2 &.?.uµ.>:.+±.>$..u.W.Ò_..á.V.v* 000180
 90C85DE5 885F5E02 C4830142 E80E5708 74000824 3E8306C4 83018DE8 0EF876FF .v½.Ò§..á..>$..t.W.ÒB..ã.^_.|)ù_ 0001A0
 80057547 067E8306 7467067E 83FE5689 FC468908 28168808 26A106EC 83EC8855 U.$.$.À&...(..F=.V±.-.gt..¯.Gu.¯ 0001C0
 08343E83 007400FA 7E800006 083406C7 06750008 2C3E83FA 4688C02A 9003E801 .$..*á.F*.>,..u.ú.4....-*.t..>4. 0001E0
```

```
Dump of file SATURN:[PCCOMMON.DUMP.PBIN]SETUP.EXE;1 on 18-APR-1990 08:07:51.45
File ID (375,16,0)   End of file block 32 / Allocated 32

Virtual block number 16 (00000010), 512 (0200) bytes

 FFFE76FF 083636FF 083836FF 0676FF08 3436FF08 1236FF00 01083406 C7067500 .u.ú.4....6...64..v..68..66..v±. 000000
 FF083836 FF147500 080A3E83 1B7400FA 7E800EC4 8306B81E FF2606FE 068EFC76 v•..±.&..¡..á..~'.t..>...u..68.. 000020
 3836FF14 75000934 3E831874 00080A3E 8304C483 068C1EFF 2606FE06 8E083636 66...±.&..¥..á..>...t..>4..u..68 000040
 080816A1 0000099A 06C70808 26068304 C48306C4 1EFF2606 FE068E08 3636FF08 ..66...±.&..á..á...&..ú.....À... 000060
 02EB0001 880574C0 0804C483 06C81EFF 2606FE06 8EFC76FF FE76FF1B 74082A06 .*.t..v±.v•..±.&..à..á..át.¡..$. 000080
 78044FFF 26080C1E C4307500 08323E83 56EC8855 90C850E5 880133E8 0E50C02B +áP.Ò3..[]ù.U.$V.>2..u=á...&.O.x 0000A0
 E29A0676 FF53080E 36FF9011 EBE42A04 88260247 8E2607FF 26378826 06468A15 ..F.&.7&..&.G.&..*ô$...6..$.v..ã 0000C0
 565702EC 83EC8855 90CB505E 083006FF 9005E808 3206FF07 754006C4 83104F13 .O..á.âu...2.$....0.^]ù.U.&.&.WV 0000E0
 8B13E29A 099C36FF 080C36FF 080E36FF 1BEB507E F60B0676 88577500 08323E83 .>2..uW.v..--P$..6...6...6...ã.£ 000100
 26099CA0 D478044F FF26080C 1EC41E7E C00B4EC6 88083206 FF047540 06C4831D ..á.âu...2..ôN.á~.á...&.O.xâ...& 000120
 5F5E0830 06010646 88077500 08323E83 D4EBE42A 05882602 478E2607 FF263F88 .?&..&.G.&..*ô$â.>2..u..F...0.^_ 000140
 080C36FF 080E36FF 22EB5E75 0008323E 830A7688 565702EC 83EC8855 CB5DE588 .[]ùW.$.$.WV.v..>2..u^$".6...6.. 000160
 74C0084E C6880646 FF083206 FF047540 06C4831E 3113E29A 5098078A 26065EC4 á^.&...P.ã.1..á.âu...2..F..ôN.ât 000180
 2602478E 2607FF26 3F882608 0C1EC407 8A26065E C4CD7804 4FFF2608 0C1EC425 %á...&.O.xëá^.&..á...&.?&..&.G.& 0001A0
 0CEC83EC 8855C85D E5885F5E 08300601 0A468807 75000832 3E83CAEB E42A0588 ..*ô$ò.>2..u..F...0.^_.[]ùW.$.$. 0001C0
 5A9AF476 FF52083A 3C98FA46 89FC4689 C028F656 89F44689 08381688 0836A156 VÀ6...8..F¶.V-+à.F•.F¯.6:.R.v¶.Z 0001E0

Dump of file SATURN:[PCCOMMON.DUMP.PBIN]SETUP.EXE;1 on 18-APR-1990  9:07:51.45
File ID (375,16,0)   End of file block 32 / Allocated 32

Virtual block number 17 (00000011), 512 (0200) bytes

 7508099A 3E8308EB 02EE8305 7510099A 3E830676 2BF02BF8 468904C4 831A5610 .V..á..F½+Þ+v..>...u..¥.$..>...u 000000
 98078A26 F446FF12 7530099C 3E831975 2D3F8026 F45EC422 75000824 3E834E01 .N.>$..u"á^¶&.?-u..>..0u..F¶&... 000020
 067E831B 74000824 3E83077E F6080874 30099C3E 83F84EFF 02C483FE 67E80E50 P.Òg±.á..N½.>..0t..~-..>$..t..-. 000040
 56297500 08243E83 0072E80E FC46FF07 7400099A 3E830068 E80EFA46 FF077400 .t..F'.Òh..>...t..F•.Òr..>$..u)V 000060
 7E830A74 00099A3E 83003BE8 0E047500 FA7E830A 7400067E 8302C483 FE74E80E .Òt±.á..~..t..~'.u..Ò;..>...t..- 000080
 C70E7400 08243E83 06C483FE AFE80EF4 76FFF676 FFF876FF 0042E80E 047500FC •.u..ÒB..v½.v~.v¶.Ò£±.á..>$..t.ú 0000A0
 208803EB 002B8805 74000816 3E83C85D E5885E02 C483FE2E E80E5600 20099C06 ...  .V.Ò.±.á.^.[]ù.>...t.¡+.$.¡  0000C0
 08123E83 17751009 9A3E8302 C483FDBA E80E5000 3088C802 C483FDC6 E80E5000 .P.Ò6».á.ù¡0.P.Ò∞».á..>...u..>.. 0000E0
 01FE46C7 565706EC 83EC8855 C802C483 FD9CE80E 50007888 03E80058 88057400 .t.¡X.$.¡x.P.Ò.».á.ùW.$.$.WVúF±. 000100
 260A5EC4 9061E80A 46FF0208 26068337 88260826 1EC41275 2A3F8026 0A5EC400 .á^.&.?*u.á.&.&.7..&...F.$ə.á^.& 000120
 3C7F393C 407C303C FA468807 8A260A5E 88F62B0A 46FFFFFF FE46C708 752D3F80 .?·u.úF±...F.+-.^.&...F'<0|ə<9.< 000140
 CE889805 8A261C7F 39308026 06EBF888 0030099C 06C70675 303C0A75 082C3639 96,.u.<0u.ú...0..«$.&.=9..&....ö 000160
 F7FE4688 0C468C0A 7E890E7D 30308026 47F18830 E983C803 E1D1CE03 E1D1E1D1 ìÀìÀ.öìÀ.à.Ò0.þG&.=0)8.~..F..F±¼ 000180
 05168857 04EC83EC 885590C8 5DE5885F 5E0C5688 0A468837 8926065E C4F088EE ¥.Þá^.&.7.F..V.^_.[]ù.U.$.$.W¡.. 0001A0
 FC7E8900 018BF475 00382611 74003080 264701EB FC7EC406 4E8AFE5E 8CFC4689 .F•.^±.N.á~•$.G&¯=.t.&8.u¶¡...~• 0001C0
 168804F3 A15606EC 83EC8855 90C850E5 885FC02B FE468CFC 7E899009 EBFE468C .F±$...~•.F±+à_.[]ù.U.$.$.VÀµ... 0001E0

Dump of file SATURN:[PCCOMMON.DUMP.PBIN]SETUP.EXE;1 on 18-APR-1990 08:07:51.45
File ID (375,16,0)   End of file block 32 / Allocated 32

Virtual block number 18 (00000012), 512 (0200) bytes

 83207210 5A9A0676 FF0876FF 6E740846 08064688 7674C20B FC5689FA 468904F5 %..F'.V•.ôtv.F..F.tn.v..v..Z.r . 000000
 9A37FF26 0277FF26 4A740247 0826078B 26FA5EC4 04FA4683 909006EB F08B04C4 á..Þ$....F'.á^*&..&.G.tJ&.w.&.7. 000020
 5EC40676 FF0876FF 56017530 3880261F C426FA5E C4007EC6 3B04C483 2098105A Z.. .á.;ó~1á^*&á.&.8=u¦V.v..v.á^ 000040
 EBC28C01 408D1FC4 26FA5EC4 8475C008 0AC4831D 1127C29A 37FF2602 77FF26FA *&.w.&.7.ó'...á..âuÇá^*&á..ə..ö$ 000060
 08C48300 05E80E50 C02B0676 FF0876FF 0A76FFEC 8855C85D E5885E99 C02B9004 ..+â.^.[]ùW.$.v...v..v.+âP.Ò...á. 000080
 16F8468D 50160646 8D0F7500 067E8300 01F446C7 0C768856 0CEC83EC 8855CB5D ]ùW.$.$.V.v.úF¶...-..u..F..P.F½. 0000A0
 46890A56 88084688 00002191 9A5016F4 46805016 F6468D06 76FF0000 21C99A50 P.è¦...v..F-.P.F¶.P..¦...F..V..F 0000C0
 C483204D 27079A56 03C683F4 7688067E C63B0003 05F44688 40750008 FE5689FC •.V±.Àuə.F¶...;ó~..v¶.ó.V..'M .á 0000E0
 88FC4688 67EBFE56 88000804 C106C700 0C04BA06 C7117500 0BFE5689 FC468902 ..F•.V±.Àu.ú.¤...ú.ê....V±$g.F•. 000100
 3A07C626 FC46FFFC 5E880788 26400406 468AFC46 FFFC5EC4 0A568908 4689FE56 V±.F..V.á^•.F•.F..ə&...^•.F•&ó.: 000120
 5016F446 8DFC76FF 060676FF 1577C63B 000305F4 46885C07 C626FC46 FFFC5E88 .^•.F•&ó.\.F¶...;ów..v...v•.F¶.P 000140
 FE5688FC 468B09EB 99C02B00 0104C106 C7002204 BA06C711 74C00800 00FFFF9A ......ât.ú.¤.".ú.é...+â.$..F•.V± 000160
 FA468800 00FFFF9A 5016FC46 8D5016FA 468D06EC 83EC8855 CB5DE588 5E00032D -..^.[]ùW.$.$..F'.P.F•.P......F' 000180
 881E5005 29881E50 000A8818 7500051C 3E80088E 1484881E 56EC8855 CB5DE588 .[]ùW.$V.¡...Á.>...u.¡..P.¡).P.¡ 0001A0
 77D43AF7 72003A08 74C085AD FC051D8E 06568801 051C06C6 0000FFFF 9A50051D ..P.....ó.....V.ƒ..•Ù.ât.:Àr¼:âw 0001C0
 7C800674 4EF08800 921E8E00 90A10532 068F0530 068FC85D E5885E1F 00018BF3 µ¡...^.[]ù..0...2.À.......ÞNt..| 0001E0
```

```
Dump of file SATURN:[PCCOMMON.DUMP.PBIN]SETUP.EXE;1 on 18-APR-1990 08:07:51.45
File ID (375,16,0)   End of file block 32 / Allocated 32

Virtual block number 19 (00000013), 512 (0200) bytes

 AC0001BF D233052F 36893696 0175FF04 F69604F9 1E8C3604 F7368936 F77500FF ..u%6.6%.6..'..-..u..6.6..30¢..¯ 000000
 74C00AE8 74093CEC 74203CAC 4E477774 C00AF774 093CFB74 203CACFA 75C00A42 B.àu'¯< t«<.t%.átwGN¯< t$<.tÒ.àt 000020
 223CFA74 5C3CAC41 C9330EEB 4203745C 3C247422 3CE9EB02 C2830573 0151E868 hÒQ.s..ô.ŠÕ<"t$<\t.B$B3èA¯<\t'<" 000040
 02C28305 73011AE8 3174C00A AC4E01EB C47501A8 D113E9D1 C188CDEB D10.¨\74 t..1Še.èlÒ.1¨.uáŠ.N¯.àt1Ò..s..ô. 000060
 01C18805 EBD10304 74223CFA 745C3CAC 41C933E6 EB420374 5C3CAE74 223C¨ ¯B Šp<"tÚ<\t.BŠl3èA¯<\t'<"t..1Š1.èl 000080
 730151E8 FE24C203 C78BE7D1 E7D147D7 0304ED3E 891F168B EBCC7501 A8D113.9 Õ.1¨.uáŠ....>Ù..mGlÒlÒ.ú.ô$±ÒQ.s 0000A0
 368804C3 8302578C 363F8936 0716F803 088804F1 1E8C04EF A3EB30E9 00088806 .¡..Õ=ŠÈÿ...þ..À.%..6.?6.W..û..6 0000C0
 85E90375 C00AF774 093CFB74 203CACAA C03303EB FA75C00A AAAC0092 1E8E052E ......¯¯.àu'Š.3à¯¯< t«<.t%.àu.Õ. 0000E0
 EBAB0373 0079E86A 74C00AD9 74093CDD 74203CAC 4E04C383 02578C36 3F893600 .6.?6.W..ù.N¯< tÎ<.tÌ.àtjÒy.s.¯Š 000100
 5CB0CDEB AAF35CB0 0674223C FA745C3C AC41C933 E0EBAA03 745C3C27 74223CEB Š<"t'<\t.¯ŠÂ3èA¯<\t'<"t.¯\µ¨Še¯\ 000120
 745C3CAF 74223CF3 EBAB0373 0041EB32 74C00AAC 4EC1EBAA 22B00673 AAF3E9D1 lÒµ¨s.¯"¨ŠèN¯.àt2ÒA.s.¯Šµ<"tÈ<\t 000140
 22B08E73 AAF3E9D1 5CB0D5EB AAF35CB0 0674223C FA745C3C AC41C933 E8EBAA03 .¯ŠÒ3èA¯<\t'<"t.¯\µ¨Š1¯\lÒµ¨s.¯" 000160
 8A047358 0008E850 EC8B5505 302EFF00 000247C7 000007C7 1F16AAC0 33C9E8AA ¯Šè3à¨..ú...úG.....0.U.$PÒ..Xs.. 000180
 B81E5000 0AB81875 0005343E 80088E21 0AB8501E 5652EC8B 55C35DE5 8BF94624 $F'.[]ùU.$RV.P¡Ò!.Ä.>4..u.¡..P.¡ 0001A0
 F772D03A 0974C085 ADFC0535 BE5A0105 3406C600 0021F49A 50053588 1E500541 A.P.¡5.P.¶!..ô.4..Z/5.•Ù.àt.:Ár% 0001C0
 52CB5152 E3880572 054A1E38 0872082B DC885A59 C350E588 5A5E1FF9 F377D43A :àwµ'.^Z.[]ùYZ.É+Ár.;.J.r..DRQùR 0001E0

Dump of file SATURN:[PCCOMMON.DUMP.PBIN]SETUP.EXE;1 on 18-APR-1990 08:07:51.45
File ID (375,16,0)   End of file block 32 / Allocated 32

Virtual block number 20 (00000014), 512 (0200) bytes

 88197200 941E3826 72D80300 9A1E885A 05462EFF E9F8E9C0 33057540 0546A151 QÀF.ãu.3àÔ%Õ..F.Z.....Àr&;...r.. 000000
 880EE8F8 009A1E87 00940E89 490C7558 C0850000 FFFF9A1E 5150410F C98049C8 ùl.è.APQ.......àXu.I........%Š.. 000020
 20044688 060206FF 04EC83EC 885500E2 FFC388E3 88027205 4A1E3808 72D828DC É+Àr.;.J.r..D.ü.ã.U.ã.ã...@..F.- 000040
 27079A50 020088FE 5E8CFC46 89063C05 E0D1C103 E0D1C888 F9F7000C 8999054C L..¿..%'.àìÁ.èìÁ.<..F=.^±¡..P..' 000060
 0247C726 FC5EC408 0A4F8026 1074D008 08578926 06478926 045EC402 C483212C ,I.á.á^.&.G.&.W..Àt.&.O..á^•&úG. 000080
 C726FC5E C4085789 26064789 2640FE56 88FC468B 040A4F80 26045EC4 20EB0200 ..Š á^.&.O...F•.V±@&.G.&.W.á^•&ú 0000A0
 C35DE58B 00000447 C7260257 89260789 26085788 26064788 26045EC4 00010247 G...á^.&.G.&.W.&..&.W.&úG....[]ù 0000C0
 0A76FF53 CC8804EC 83EE7EE9 EE72E9C0 3300098A 087204C3 1E38065E 8BEC8B55 U.&.^.;.û.r.¤..3àÒrŸÒ-Ÿ.&..äS.v. 0000E0
 885500CB 5DE588FD 04C5A780 91E175C0 855A5900 00FFFF9A 51160C76 FF0876FF .v..v..Q.....YZ.àuÃ..Ìé.».[]ù.U. 000100
 51C93353 12742004 C587F6EE 31E9C033 00098A08 7204C31E 38065E88 0CEC83EC &.&..^.;.û.r.¤..3àÒ1Ÿ-.é. t.S3èQ 000120
 C0330856 C50A468E FA5E8C7D 748004C5 87F60000 25399A50 16F44680 51414151 QAAQ.F¶.P.9%..-.é..t).^'.F.éV.3ã 000140
 9AFA5E8E 1E5275AE F20AB060 E30C4E88 F86689F2 88FA8856 57FCFC46 89FE4689 .F±.F••WV.'.¨.f%.N.D'¯.¨ÙuR..^'. 000160
 FA880488 E2280080 8A037302 28300200 8ADC8802 EC831F4E 7600A830 2480282C ,(¯$=¨.vN..$..Éo..=(.s.¤..+ã.à.' 000180
 001FE803 75FB3800 80009AE9 0028E8F4 E2AA1A74 F8380074 0A3CAC0C 4E880716 ...N.¯<.t.;«t.¯ã¶Ò+.Õ..¯.;«u.Ò.. 0001A0
 50258224 1C9AFFFC 887AE800 93E9FA5E 8E5F5EE1 E80014E8 E2EBFC46 FF0AB0AA ¨¯..F•ŠàÒ..ŠÂ^_.^'Õ..Šz¡=...$ÿ%P 0001C0
 1175C008 0000133E 9A5016F4 46805152 1E53065E 881FE3CA 28CF881F 061E5153 SQ....ù+òD..^.S̄.RQ.F¶.P.>....àu. 0001E0

Dump of file SATURN:[PCCOMMON.DUMP.PBIN]SETUP.EXE;1 on 18-APR-1990 08:07:51.45
File ID (375,16,0)   End of file block 32 / Allocated 32

Virtual block number 21 (00000015), 512 (0200) bytes

 01300074 00603018 74C00808 C4831FC3 FA88585B 591F0774 D808FE5E 01F45E88 .^¶.^±.Ùt..Y[X.'ù..é..àt.=m.t.=. 000000
 5E880A5E 8E0E7440 04C587F6 FE5E8E26 E8F90020 8A03E800 1C8A0875 00098A00 .¤..u.¤..Š.¤ .'Š&.^±-.é.@t..^..^ 000020
 72FA5E8E 5F5EF866 88FC4628 FE468806 E8F9C033 001C8A0E E8F80375 1A3F8008 ..?.u.%Š.¤..3à'Š..F±+F•.f%^_.^'r 000040
 5016F446 8D51521E 530856C5 1EEEE8C1 880475C9 080C4E88 ECFEE9C8 50E58804 ..[]ùÒ±Š.N..èu..èŠŸ.éV.S.RQ.F¶.P 000060
 208AC7E8 001C8ACC 7500098A 00013000 74006030 1774C008 1F071E00 0026289A .(&......àt.=m.t.=..¤..uà¤..Šù¤ 000080
 C033001C 8AA6E802 751A3F80 260A880A 744004C5 87F68775 C008F446 88C2E800 .Šô.F¶.àuñ-.é.@t..Ò&.?.u.$[¤..3à 0000A0
 88575602 EC83EC88 55C85DE5 8801FE4F 80260574 C308C08C 065EC4EC 8855A3E8 ŠÈU.$á^..à.ût.&.O±..[]ùU.&.&.VW. 0000C0
 05740018 E8157500 82E8060E A3127400 25E80875 00060E3E 831E73FF F1300646 F.=þ.s..>B..u.Ò%.t.È8.Ò..u.Ò..t. 0000E0
 5E880776 065E3900 F088C850 E5885E5F 02C48326 0028529A 0676FF08 750078E8 Òx.u..v..R(.&.é._^.[]ùÈÞ.9^.v..^ 000100
 74FFFA83 08C48327 3829FC9A 50028051 0E4F8050 501EC033 FE5E89FE E3834306 .C.D±.^±3à.PP.O.Õ¯.P.=);'.é..'.t 000120
 89484800 08A3C033 D88EFE5E 880008A3 DA8E0574 D20806E2 A306E016 87C28838 8.ò..À.Èã..@t..ÒÈ...^±.Ã3àÈ..HH. 000140
 88C08ED8 8CC31FD8 8C0006A3 00000500 0AA30147 800002A3 0000A300 0A880C47 G.¡..È..È...G.È.....È...Á.û.Á.â. 000160
 C4D98827 E30E4E88 1E5657EC 8855C3D9 8EC18CD2 0800E0E8 06E21E8E D833064E N.3Ù..ã.ÒÁ..@.è.\ùU.ŠWV..N.D'.1á 000180
 04740477 FF453A26 :933FF44 8AA6F30A 76C5FE88 CB03D9F7 AEF2C033 F788067E -..%3à¨Ù%).ù.±év.µ[.D.3è&:E.w.t. 0001A0
 1E38065E 88EC8855 )2AAE900 835756EC 885500CB 5DE5885F 5E1FC188 D1F74949 [[%i.è.^_.[]ù.U.ŠVW'.Ò^.U.&.^.;. 0001C0
 4AA15A59 00C85DE5 88C03302 E8000188 05744004 C587F60C 7C00FB83 117D04C3 û.)..«.|¯-.é.@t.¡..Š.3à.[]ù.YZÀJ 0001E0
```

```
Dump of file SATURN:[PCCOMMON.DUMP.PBIN]SETUP.EXE;1 on 18-APR-1990 08:07:51.45
File ID (375,16,0)   End of file block 32 / Allocated 32

Virtual block number 22 (00000016), 512 (0200) bytes

 E58801FE 4F800474 D808065E 88EC8855 F9E8C033 C8515208 F7C42807 73C43805 .;ás.+á%ARQù3àS'U.&.^..Ût..O±..! 000000
 244024E8 99C03305 750173E8 00058807 1E297500 3F830604 885756EC 8855C850 ]ùU.$VWE&..?.u)..¡..Ôs.u.3à.$$a$ 000020
 E8C08E08 8C064F88 060A3689 FFFEFE44 C704C683 000104C7 960606A3 0604A3FE ±Eå.Ê#..ú....6.úD±±..6Ö..N..Ä.åÒ 000040
 7401A8FE 88ADFC02 7788F273 EEF983FE E180FA74 4100CEE9 C850E588 5E5F0009 .._^.[}ùÔò.At*.Å±.*Ys·.w.=Ü.±´.t 000060
 030C74FE 88E6E8FE 4489F788 000205C2 03347401 A8ADF003 D0881573 C1384842 8H;ès..Å.ÞÙ´.t4.ô....%.D±$].±t.. 000080
 8906E21E 8C260574 D138D18C DA8CC688 FE4CFEF9 0305E805 8948C128 FE4C89F9 *.L±+èH..Š..*±L±.6.Ö.[;]t.&..ã.. 0000A0
 D088BD73 C13848FE 88F27401 A8ADF003 FE882574 FFFE3002 06E606C6 26C3027F ..Ü&6.|..=±.t%.±.ÞÙ´.t·.±H;ès§.Â 0000C0
 FE2614E8 D88E0474 C00B0847 88E6E8FE 4489F788 000205C2 03E27401 A8ADF003 .ÞÙ´.tà.ô....%.D±$|.G..ât..ÄS.&± 0000E0
 C638006A E8C03306 7788BCE8 378806DE 1E8E2605 74C73807 8CD88C11 7406E60E .|.t..Ä.=;út.&..8..7$¥.w.3àÒj.;6 000100
 74C138D1 8CD88C99 E84E4E96 0574001C E8FE4DFE 0074005E E8984040 01240074 t.$.ªª.Ò^.t.±M±Ò..t..NN$..Ä.|;èt 000120
 38267FFF 8A414149 C8280374 01A8FE45 8851C399 C0330247 89078806 E2A32604 .&Êã....G.3à.ÚQ.E±´.t.+à|AAo..&; 000140
 D2F70875 000CE8C6 28C22302 F70072C2 031572C6 03C188F5 75EAD104 7606E416 .8.v.Ìõu%.è.ór..ôr.%@#ó+6Ò..u.%@ 000160
 D6880677 89FFFEFE 44C7F203 F088FE88 57187400 1DE85152 C359C033 E575EAD1 ÌõuÌ3àYÚRQÒ..t.W.±.Þ.·ÚD±±..w..ø 000180
 08C48327 6729FC9A 1F065000 01885052 521ED233 5053C35A 5958FE55 894AD728 +@J.U±XYZÚSP3@.RRP¡..P...=)g'.á. 0001A0
 46880856 88009A8F 3875000A 7E830657 56EC8855 00C3D208 02745B5A 1FFFFA83 .*..Z(t..@Ù.U.$VW..-..uB¢...V..F 0001C0
 003EE856 0E468902 44880074 F7381174 48049A36 884CE827 720057E8 07754806 .Hu.ÒW.r'$L.6..Ht.;%t..D..F.VÒ>. 0001E0

Dump of file SATURN:[PCCOMMON.DUMP.PBIN]SETUP.EXE;1 on 18-APR-1990 08:07:51.45
File ID (375,16,0)   End of file block 32 / Allocated 32

Virtual block number 23 (00000017), 512 (0200) bytes

 9A50C033 501652C4 885021E8 99FFFF88 06750208 0473049A FE8104C6 8334735E ^s4.6..±..s..@u.¡...$!P.áR.P3àP. 000000
 4E88C850 E5885E5F 07C03303 88049A36 89025C89 1489E675 C085F958 000008B8 £...(*.àu|...\..6...Æ3á._^.[}ù.N 000020
 F738C18E D3882672 1C030A88 2CE8F9F2 75049AFE 8104C683 0C74024C 39F7880E ..%9L.t..6..±...u·*$,.Ö..¯r&.Æ.è;% 000040
 D1880487 92009416 890475F7 38DE75C0 85000024 5A9A5153 13730094 1E390675 u.9...s.SQ.Z$...àuB;%u.........| 000060
 79D2080E 750AF983 1374C00A 93FC071E 570A7EC5 1E085688 0646880E 4E8800C3 ù..N..F..V..é~.W..=..át..*.u..@y 000080
 393C3004 D38792F1 F793F1F7 0274C008 D23392F7 880AF700 D28308F7 AA2D800A .¯-¯%Ù.@.%Ò.%.3@.àt.%þ.%þ..Æ.0<9 0000A0
 5F1F580A 8CF272C7 38014480 FF448805 86AC4F05 88E275C3 08C288AA 27040276 v..'´.ô.ùuã..O¯...D..D.;úr·.ÖX._ 0000C0
 47F626FA 5EC41CE8 F628FC5E 8CFA4689 054C8856 06EC83EC 885500C8 5DE5885E ^.[}ù.U.$.$.V¡L..F*.^=+-$.6^*&-Ḡ 0000E0
 FA463906 86168806 84A10CFA 46834601 744004C4 8329E828 5A9A5306 0E74830A ..t..S.Z+$).á.@t.F.F*.ÀÇ...Â.9F* 000100
 5A75023C 03240A47 8A26065E C4F62856 04EC83EC 885590C8 5DE5885E C6880876 vÄ.6^.[}ù.U.$.$.V+-6^.&.G.$.<.uZ 000120
 7401063C 87F6E301 D803E301 D888F9F7 000C8999 054C2DC3 881A7508 0A47F626 &-G..u..ù-L..¿..%*.ÄiD.ÄiD-.<..t 000140
 2A08478A 260677FF 260877FF 2650287E C008FC46 8906472B 26078826 065E8839 9.^.&..&+G..F=.à-(P&.w.&.w.&.G.* 000160
 47882606 5EC4FFFF 8E200A4F 8026065E C40874FC 463808C4 83283925 4E9A50E4 6P.N%9+.á.;F=t.6^.&.O. ƒ..6^.&.G 000180
 0CEC83EC 885590C8 5DE5885E C6880000 0447C726 02578926 07892608 57882606 .&.W.&..&.W.&úG....6^.[}ù.U.$.$. 0001A0
 0E76FF10 76FF5000 90884275 C00806C4 832C1311 CC9A0676 FF0876FF 50C02856 V+àP.v..v..ä..,.á..àuB¡..P.v..v. 0001C0
 C4832C40 0F849A53 06501E04 FE880F74 00037F80 260E5EC4 06C4832C 2C208A9A .ɑ ,,.á.6^.&....t.¡±..P.S.Ç.ə,.á 0001E0

Dump of file SATURN:[PCCOMMON.DUMP.PBIN]SETUP.EXE;1 on 18-APR-1990 08:07:51.45
File ID (375,16,0)   End of file block 32 / Allocated 32

Virtual block number 24 (00000018), 512 (0200) bytes

 249A0A76 FF0C76FF 000EE908 C4832C51 0F849A0E 76FF1076 FF0676FF 0876FF08 ..v..v..v..v..Ç.Q,.á.Ô8..v..v..$ 000000
 E8F676FF F876FFC  76FF1076 FF008CE9 03750008 F85689F6 468904C4 832C9E20 .,.á..F-.V½.Âu.Ô¥..v..v..v½.v-Ò 000020
 FC468910 56880E46 880000F4 46C7009D E90375D0 08F85689 F6468908 C4830089 ¿..á..F-.V½.Âu.Ô..úF¶...F..V..F= 000040
 3F8026FC 5EC4FC46 FF1374C0 0802C483 20002104 9A509807 8A26FC5E C4FE5689 .V±á^=&...P.à|.-.á..ât..F=á^=&.? 000060
 7500F47E 83C87500 3F8026FC 5EC4FC46 FF0000F4 46C705E8 0001F446 C7187400 .t.úF¶..$.úF¶...F=á^=&.?.uà.-¶.u 000080
 07C626FC 46FFFC5E C40A743A FE830F74 5CFE8314 742FFE83 F08898FF 478A2616 .&.G...Þ.±/t..±\t..±:t.á^=.F=&6. 0000A0
 CC9A0E76 FF1076FF 50C02808 C4832D11 0FFA9AFC 76FFFE76 FF0676FF 0876FF5C \.v..v..v±.v=.*..-.á.+àP.v..v..ä 0000C0
 EC83EC88 55C850E5 885E0007 C6260E5E C407E8FF 46E90374 C00806C4 83113011 .=..á..ât.ÔF.$.á^.&6..^.[}ùU.$.$ 0000E0
 5EC4078A 260446FF 045EC41F 7438FA7E 8018E8FE 5689FC46 89065688 04468806 ..F..V..F=.V±$..~*;t.á^..F.&..á^ 000100
 8026045E C40007C6 26085EC4 0875C00A FA468807 8A26045E C4078826 0846FF08 ..F.&..á^.&...F*.àuÙá^.&6..á^.&. 000120
 C02803E8 06568804 46880874 FE563905 75FC4639 C28C0446 880446FF 0374003F ?.t..F..F..ó9F=u.9V±t..F..V.$.+à 000140
 00F60002 000F0103 00000001 28850002 00F30002 00000103 003590C3 5DE58899 ..[}ù.5.......Ã...Ç+..........-. 000160
 007D0002 07E20103 00000003 230F0002 00000002 07940002 00F70002 03F80103 ..½...%...........Ô#......â...). 000180
 008A0001 26810103 007F0002 091A0103 007E0002 0A010103 00050001 0F8E0103 ...............-...........Ý&.... 0001A0
 010E0002 09010103 01000002 09C10103 00880002 0DA00103 00080002 0AC50103 ..é.......Ù.......è.............. 0001C0
 00950002 0CA80103 00130002 09280103 00110002 09730103 00100002 09350103 ..S.......s.......(........´..... 0001E0
```

```
Dump of file SATURN:[PCCOMMON.DUMP.PBIN]SETUP.EXE;1 on 18-APR-1990 08:07:51.45
File ID (375,16,0)   End of file block 32 / Allocated 32

Virtual block number 25 (00000019), 512 (0200) bytes

 00040005 23F90103 06080001 04230005 00220001 2A500103 001A0002 0A6C0103 ..l.......P"..".. #........'#.... 000000
 009F0003 0C470103 00270001 085F0103 00260001 2A980103 00900002 0CEF0103 ..ÿ........*..&...'...G..... 000020
 003A0001 257A0103 002C0002 0C540103 00280002 0C1A0103 00310001 0DF50103 ..%...1.......+...T...,...zX..:. 000040
 00300002 07580103 00380002 03E80103 003A0002 00260103 00830002 0A1E0103 ......*...&...:...$...;...[...=. 000060
 00330004 08510103 00320004 05890103 00480001 20F20103 00470001 21040103 ...l..G...' ..H...¿...2...Q...3. 000080
 00360004 08950103 004D0001 0ECC0103 00450002 08540103 00480001 11E20103 ..ã...K...T...E...ä...M.......6. 0000A0
 003C0004 05D30103 004C0002 03C10103 00480002 030E0103 00370004 04680103 ..k...7...B...K...è...L...Æ...<. 0000C0
 005B0002 03340103 005C0001 0DE50103 00590001 0EFA0103 004D0002 09AC0103 ..¯...M...*...Y...Í...\...4...[. 0000E0
 54206E75 5220534D 00000000 00000000 08D20001 07D50005 005C0002 03540103 ..T...\...(...@.........MS Run-T 000100
 38383931 20296328 20746867 69727970 6F43202D 20797261 7262694C 20656069 ime Library - Copyright (c) 1988 000120
 02400073 25732500 48544150 005C0011 70726F43 2074666F 736F7263 6940202C , Microsoft Corp..\.PATH.%s%s.@. 000140
 67736020 726F7272 65206461 6F6C206F 7420656C 62616E55 FFFFFFFF 02600250 P.'.....Unable to load error msg 000160
 00007075 74655300 726F7272 45007825 203A7361 7720726F 7272450A 3A782320 #x:.Error was: %x.Error.Setup.. 000180
 00000000 00000000 00000000 00000000 0000FFFF 00000F59 00000000 00000000 ........Y....................... 0001A0
 00000000 00000000 00000000 00000000 00000000 00000000 00000000 00000000 ................................ 0001C0
 00000000 0000000C 00000000 00000000 00000000 00000000 00000000 00000000 ................................ 0001E0

Dump of file SATURN:[PCCOMMON.DUMP.PBIN]SETUP.EXE;1 on 18-APR-1990 08:07:51.45
File ID (375,16,0)   End of file block 32 / Allocated 32

Virtual block number 26 (0000001A), 512 (0200) bytes

 00000000 00000000 00000000 00000000 00000000 00000000 00000000 00000000 ................................ 000000
 00000000 00000000 00000000 00000000 00000000 00000000 00000000 00000000 ................................ 000020
 00000000 00000000 00000000 00000000 00000000 00000000 00000000 00000000 ................................ 000040
 00000000 00000000 00000000 00000000 00000000 00000000 00000000 00000000 ................................ 000060
 00000000 00000000 00000000 00000000 00000000 00000000 00000000 00000000 ................................ 000080
 00000000 00000000 00000000 00000000 00000000 00000000 00000000 00000000 ................................ 0000A0
 00000000 00000000 00000000 00000000 00000000 00000000 00000000 00000000 ................................ 0000C0
 00000000 00000000 00000000 00000000 00000000 00000000 00000000 00000000 ................................ 0000E0
 00000000 00000000 00000000 00000000 00000000 00000000 00000000 00000000 ................................ 000100
 00000000 00000000 00000000 00000000 00000000 00000000 00000000 00000000 ................................ 000120
 00000000 00000000 00000000 00000000 00000000 00000000 00000000 00000000 ................................ 000140
 00000000 00000000 00000000 00000000 00000000 00000000 00000000 00000000 ................................ 000160
 00000000 00000000 00000000 00000000 00000000 00000000 00000000 00000000 ................................ 000180
 00000000 00000000 00000000 00000000 00000000 00000000 00000000 00000000 ................................ 0001A0
 00000000 00000000 00000000 00000000 00000000 00000000 00000000 00000000 ................................ 0001C0
 00000000 00000000 00000000 00000000 00000000 00000000 00000000 00000000 ................................ 0001E0

Dump of file SATURN:[PCCOMMON.DUMP.PBIN]SETUP.EXE;1 on 18-APR-1990 08:07:51.45
File ID (375,16,0)   End of file block 32 / Allocated 32

Virtual block number 27 (0000001B), 512 (0200) bytes

 00000000 00000000 00000000 00000000 00000000 00000000 00000000 00000000 ................................ 000000
 00000000 00000000 00000000 00000000 00000000 00000000 00000000 00000000 ................................ 000020
 00000000 00000000 00000000 00000000 00000000 00000000 00000000 00000000 ................................ 000040
 00000000 00000000 00000000 00000000 00000000 00000000 00000000 00000000 ................................ 000060
 00000000 00000000 00000000 00000000 00000000 00000000 00000000 00000000 ................................ 000080
 00000000 00000000 00000000 00000000 00000000 00000000 00000000 00000000 ................................ 0000A0
 00000000 00000000 00000000 00000000 00000000 00000000 00000000 00000000 ................................ 0000C0
 00000000 00000000 00000000 00000000 00000000 00000000 00000000 00000000 ................................ 0000E0
 00000000 00000000 00000000 00000000 00000000 00000000 00000000 00000000 ................................ 000100
 00000000 00000000 00000000 00000000 00000000 00000000 00000000 00000000 ................................ 000120
 00000000 00000000 00000000 00000000 00000000 00000000 00000000 00000000 ................................ 000140
 00000000 00000000 00000000 00000000 00000000 00000000 00000000 00000000 ................................ 000160
 00000000 00000000 00000000 00000000 00000000 00000000 00000000 00000000 ................................ 000180
 00000001 FFFF003D 4F464E49 5F454C49 465F435F 009A0000 00000000 00000000 ............_C_FILE_INFO=....... 0001A0
 00000000 00000000 81818100 14000000 00000000 00000000 00000000 00000000 ................................ 0001C0
 0000000A 0A0A0A0A 0A0A0A0A 0A0A0A0A 0A0A0A0A 0A0A0A00 00000000 00000000 ................................ 0001E0
```

```
Dump of file SATURN:[PCCOMMON.DUMP.PBIN]SETUP.EXE;1 on 18-APR-1990 08:07:51.45
File ID (375,16,0)   End of file block 32 / Allocated 32

Virtual block number 28 (0000001C), 512 (0200) bytes

 2800296C 6C756E28 00000000 00000000 005C0000 00000000 00000000 00000000 ..............\.........(null).( 000000
 00000000 00000000 00000000 00000000 00000000 00002320 20280029 6C6C756E null).+- #......................... 000020
 0554003E 08A0FF : FFFF0000 00000000 00000000 00000000 00000000 00000000 ..........................>.T. 000040
 02020000 000000uu 00000000 01020000 00000000 00000000 000106FC 003E0000 ..>.*........................... 000060
 00000000 00000000 00000000 00000000 00000000 00000000 00000000 00000000 ................................ 000080
 00000000 00000000 00000000 00000000 00000000 00000000 00000000 00000000 ................................ 0000A0
 00000000 00000000 00000000 00000000 00000000 00000000 00000000 00000000 ................................ 0000C0
 00000000 00000000 00000000 00000000 00000000 00000000 00000000 00000000 ................................ 0000E0
 00000000 00000000 00000000 00000000 00000000 00000000 00000000 00000000 ................................ 000100
 00000000 00000000 00000000 00000000 00000000 00000000 00000000 00000000 ................................ 000120
 00000000 00000000 00000000 00000000 02000001 00000000 00000000 00000000 ................................ 000140
 00000000 00000000 00000000 00000000 00000000 00000000 00000000 00000000 ................................ 000160
 00000000 00000000 00000000 00000000 00000000 00000000 00000000 00000000 ................................ 000180
 00000000 00000000 00000000 00000000 00000000 00000000 00000000 00000000 ................................ 0001A0
 00000000 06C6122C 06C2122C 068E122C 068A122C FFFF122C 06FE0630 00000000 ....0.±.,...,.¤.,./.,.ö.,.ö..... 0001C0
 00000000 00000000 00002000 00000000 00000000 00000000 00000000 00000101 .................... .......... 0001E0

Dump of file SATURN:[PCCOMMON.DUMP.PBIN]SETUP.EXE;1 on 18-APR-1990 08:07:51.45
File ID (375,16,0;   End of file block 32 / Allocated 32

Virtual block number 29 (0000001D), 512 (0200) bytes

 0D303030 36520000 3E3E4753 4D4E3C3C 009C06FA FFFF06CA 28160000 00000000 .......+ò...*...<<NMSG>>..R6000. 000000
 6920200A 00333030 36520003 000A0D77 6F6C6672 65766F20 6B636174 7320200A .- stack overflow.....R6003..- i 000020
 20200A00 38303036 52000800 0A0D3020 79622065 64697669 64207265 6765746E nteger divide by 0.....R6008..-  000040
 0A0D7374 6E656D75 67726120 726F6620 65636170 73206867 756F6E65 20746F6E not enough space for arguments.. 000060
 726F6620 65636170 73206867 756F6E65 20746F6E 20200A0D 39303036 52000900 ...R6009..- not enough space for 000080
 6520656D 6974206E 757200FF 000A0D00 FC000A0D 746E656D 6E6F7269 766E6520  environment...*......run-time e 0000A0
 20746E69 6F702067 6E697461 6F6C6620 200A0032 30303652 00020020 726F7272 rror ...R6002..- floating point  0000C0
 696F7020 6C6C756E 20200A0D 31303036 52000100 0A0D6465 64616F6C 20746F6E not loaded.....R6001..- null poi 0000E0
 02000000 0106F800 020003FF FFFF000A 0D746E65 6D6E6769 73736120 7265746E nter assignment..........½...... 000100
 6E452D65 522F4E41 4D484341 42230352 00000000 03068600 02000000 02054E00 .N.......Ñ......R.#BACHMAN/Re-En 000120
 00010001 00010001 00010074 65532074 6375646F 72502067 6E697265 656E6967 gineering Product Set........... 000140
 00000000 00000000 00000000 00010001 00010001 00010001 00010001 00010001 ................................ 000160
 00010001 00010001 00010001 00455845 2E4E414D 48434142 5C4E4942 50110352 R..PBIN\BACHMAN.EXE............. 000180
 00000000 00000000 00000000 00000001 00010001 00010001 00010001 00010001 ................................ 0001A0
 00010001 00010001 00010001 00010001 0030312E 33204E41 4D484341 42000352 R..BACHMAN 3.10.................. 0001C0
 00010001 00010001 004E4942 50050352 00000001 00010001 00010001 00010001 .................R..PBIN......... 0001E0

Dump of file SATURN:[PCCOMMON.DUMP.PBIN]SETUP.EXE;1 on 18-APR-1990 08:07:51.45
File ID (375,16,0)   End of file block 32 / Allocated 32

Virtual block number 30 (0000001E), 512 (0200) bytes

 00000000 00000000 00000001 00010001 00010001 00010001 00010001 00010001 ................................ 000000
 01000100 01000100 01000100 01000100 01000100 01000100 53544E4F 46060352 R..FONTS........................ 000020
 2070756F 72672077 654E2020 20100352 00000000 00000000 00000100 01000100 ................R..-- New group  000040
 01000100 01000100 01000100 01000100 01000100 01000100 01000100 01002020 --.............................. 000060
 66696365 70732065 73616C6C 502E0352 00000000 00000000 00000000 00000000 ................R..Please specif 000080
 6C65636E 61432074 63656C65 7320726F 202C656D 616E2070 756F7267 2061 2079 y a group name, or select Cancel 0000A0
 00000100 01000100 01000100 01000100 01000100 01000100 01000100 0100 100 ................................ 0000C0
 69642074 6F6F7220 4E414D48 43414220 74657320 6F742065 6C62616E 55260352 R.&Unable to set BACHMAN root di 0000E0
 01000100 01000100 01000100 01000100 01000100 01000100 2179726F 74636572 rectory!........................ 000100
 65726320 6F742065 6C62616E 552A0352 00000000 00000000 00000100 01000100 ................R.*Unable to cre 000120
 01000100 7825203A 73617720 726F7272 45002773 25270070 756F7267 20657461 ate group.'%s'.Error was: %x.... 000140
 00000000 00000100 01000100 01000100 01000100 01000100 01000100 01000100 ................................ 000160
 74002773 25272020 6D617267 6F727020 64646120 6F742065 6C62616E 553A0352 R.:Unable to add program  '%s'.t 000180
 01000100 7825203A 73617720 726F7272 45002773 25272020 0070756F 7267206F o group.  '%s'.Error was: %x.... 0001A0
 00000000 00000100 01000100 01000100 01000100 01000100 01000100 01000100 ................................ 0001C0
 01000100 01007325 2020003A 79726F74 63657269 64206469 6C61766E 49180352 R..Invalid directory:.  %s...... 0001E0
```

```
Dump of file SATURN:[PCCOMMON.DUMP.PBIN]SETUP.EXE;1 on 18-APR-1990 08:07:51.45
File ID (375,16,0)   End of file block 32 / Allocated 32

Virtual block number 31 (0000001F), 512 (0200) bytes

 00000000 00000000 01000100 01000100 01000100 01000100 01000100 01000100 ................................ 000000
 00000000 FFFF0001 000E0352 000000F3 00000000 0000004B 2E707267 6B636970 pickgrp.K.......µ...R........... 000020
 00000000 00B7FFFF 01000079 00F40042 00499400 009000A4 00120001 00000004 ........£.....I.B.¶.y.....ñ..... 000040
 00000000 0000FFFF FFFF0000 000800C4 006C000F 80010001 008B002C 00050000 .....£.......l.á................ 000060
 00030000 00000000 FFFFFFFF 0110004E 0008001D 000F8002 000800E8 00000007 ....Ò.........Á.N............... 000080
 00060003 00000000 0000FFFF FFFF0300 00000026 0005004D 80020000 00E90002 ..Ò.....M...&................... 0000A0
 41404843 41422070 75746553 FFFFFFFF 00020000 00260005 00838002 000000EC ì.........&.........Setup BACHMA 0000C0
 736E6920 6F742070 756F7267 20612074 63656C65 53000000 03003031 2E33204E N 3.10.....Select a group to ins 0000E0
 636E6143 00484F00 003A6F74 6E692030 312E3320 4E414048 43414220 6C6C6174 tall BACHMAN 3.10 into:..OK.Canc 000100
 00000000 FFFF0001 000E0352 000000DA 00000000 00000000 00000000 00006C65 el..............Ö...R........... 000120
 00000000 00B5FFFF 0200002F 00FC006E 00589400 009000A4 00100001 00000004 ........£.....[.n.=./.....ç..... 000140
 00000000 0000FFFF FFFF0000 00080066 00240007 80010001 00890015 00050000 ......¿........$.f.............. 000160
 00030000 00000000 FFFFFFFF 02100008 00EA0017 00098002 000800CF 00000006 ....ú.........ö................. 000180
 00060003 00000000 0000FFFF FFFF0300 00000026 00040055 80020400 00000002 ..Å.....U...&................... 0001A0
 67207765 6E206574 61657243 FFFFFFFF 00020000 00260003 00838002 00000003 £.........&.........Create new g 0001C0
 00003A65 6D616E20 70756F72 67207765 6E207265 746E4500 00000300 70756F72 roup.....Enter new group name:.. 0001E0

Dump of file SATURN:[PCCOMMON.DUMP.PBIN]SETUP.EXE;1 on 18-APR-1990 08:07:51.45
File ID (375,16,0)   End of file block 32 / Allocated 32

Virtual block number 32 (00000020), 512 (0200) bytes

 00000000 00000000 00000000 00000000 00000000 0000006C 65636E61 4300484F OK.Cancel....................... 000000
 00000000 00000000 00000000 00000000 00000000 00000000 00000000 00000000 ................................ 000020
 00000000 00000000 00000000 00000000 00000000 00000000 00000000 00000000 ................................ 000040
 00000000 00000000 00000000 00000000 00000000 00000000 00000000 00000000 ................................ 000060
 00000000 00000000 00000000 00000000 00000000 00000000 00000000 00000000 ................................ 000080
 00000000 00000000 00000000 00000000 00000000 00000000 00000000 00000000 ................................ 0000A0
 00000000 00000000 00000000 00000000 00000000 00000000 00000000 00000000 ................................ 0000C0
 00000000 00000000 00000000 00000000 00000000 00000000 00000000 00000000 ................................ 0000E0
 00000000 00000000 00000000 00000000 00000000 00000000 00000000 00000000 ................................ 000100
 00000000 00000000 00000000 00000000 00000000 00000000 00000000 00000000 ................................ 000120
 00000000 00000000 00000000 00000000 00000000 00000000 00000000 00000000 ................................ 000140
 00000000 00000000 00000000 00000000 00000000 00000000 00000000 00000000 ................................ 000160
 00000000 00000000 00000000 00000000 00000000 00000000 00000000 00000000 ................................ 000180
 00000000 00000000 00000000 00000000 00000000 00000000 00000000 00000000 ................................ 0001A0
 00000000 00000000 00000000 00000000 00000000 00000000 00000000 00000000 ................................ 0001C0
 00000000 00000000 00000000 00000000 00000000 00000000 00000000 00000000 ................................ 0001E0
```

```
Dump of file SATURN:[PCCOMMON.DUMP.PBIN]PLOW_ON.CMD;1 on 18-APR-1990 08:24:09.13
File ID (1030,18,0)   End of file block 1 / Allocated 4

Virtual block number 1 (00000001), 512 (0200) bytes

 70202F2F 0A0D0A0D 74726174 733A206F 746F670A 0D0A0D66 666F206F 68636540 @echo off....goto :start....// p 000000
 414C5328 20797265 7474616C 53207461 50202F2F 0A0D646D 632E6E6F 5F776F6C low_on.cmd..// Pat Slattery (SLA 000020
 6F636863 6162206C 6C61630A 0D0A0D74 72617473 3A0A0D0A 00295059 52455454 TTERYP)....:start....call bachco 000040
 0A0D646E 653A0A0D 0A0D6C6C 642E6472 62206C6C 642E776F 6C706472 62207970 py brdplow.dll brd.dll....:end.. 000060
 00000000 00000000 00000000 00000000 00000000 00000000 00000000 00000000 ................................ 000080
 00000000 00000000 00000000 00000000 00000000 00000000 00000000 00000000 ................................ 0000A0
 00000000 00000000 00000000 00000000 00000000 00000000 00000000 00000000 ................................ 0000C0
 00000000 00000000 00000000 00000000 00000000 00000000 00000000 00000000 ................................ 0000E0
 00000000 00000000 00000000 00000000 00000000 00000000 00000000 00000000 ................................ 000100
 00000000 00000000 00000000 00000000 00000000 00000000 00000000 00000000 ................................ 000120
 00000000 00000000 00000000 00000000 00000000 00000000 00000000 00000000 ................................ 000140
 00000000 00000000 00000000 00000000 00000000 00000000 00000000 00000000 ................................ 000160
 00000000 00000000 00000000 00000000 00000000 00000000 00000000 00000000 ................................ 000180
 00000000 00000000 00000000 00000000 00000000 00000000 00000000 00000000 ................................ 0001A0
 00000000 00000000 00000000 00000000 00000000 00000000 00000000 00000000 ................................ 0001C0
 00000000 00000000 00000000 00000000 00000000 00000000 00000000 00000000 ................................ 0001E0
```

```
Dump of file SATURN:[PCCOMMON.DUMP.MSG]SDFORM.MSG;1 on 18-APR-1990 08:24:04.02
File ID (1018,6,0)   End of file block 1 / Allocated 4

Virtual block number 1 (00000001), 512 (0200) bytes

 60000000 00000000 00000000 00000000 01000100 27464453 00464753 404B40FF .MKMSGF.SDF'..................m 000000
 90009A00 97009400 91008E00 88008800 85008200 7F007C00 79007600 73007000 .p.s.v.y.|...................... 000020
 FC00F900 F600E800 D6008E00 B8008800 B5008200 AF00AC00 A900A600 A300A000 ...É.Ï.`.'.£.ÿ.ç.¡.£./.ø.Ö.-.ª.= 000040
 490A0049 0A00490A 00490A00 490A0049 0A004901 45012F01 1A010501 0200FF00 ........./.E.I..I..I..I..I..I..I 000060
 0A00490A 00490A00 490A0049 0A00490A 00490A00 490A0049 0A00490A 00490A00 ..I..I..I..I..I..I..I..I..I..I.. 000080
 67450A00 490A0049 0A00490A 00490A00 490A0049 0A00490A 00490A00 490A0049 I..I..I..I..I..I..I..I..I..I..Eg 0000A0
 6F725044 5374696E 49450A00 6C65646F 6D207373 65636F72 7020676E 69747465 etting process model..EInitSDPro 0000C0
 490A0049 0A00490A U0490A00 73776F6C 46445374 696E4945 0A006C65 646F4D63 cModel..EInitSDFlows..I..I..I..I 0000E0
 746F4E44 53450A00 656D614E 6E795374 65537966 69746F4E 4453450A 00490A00 ..I..ESDNotifySetSynName..ESDNot 000100
 4E65746F 4E746553 79666974 6F4E4453 450A0065 6D614E79 654B7465 53796669 ifySetKeyName..ESDNotifySetNoteN 000120
 0000000A 000A0065 6D614E77 6F6C4674 65537966 69746F4E 4453450A 00656D61 ame..ESDNotifySetFlowName....... 000140
 00000000 00000000 00000000 00000000 00000000 00000000 00000000 00000000 ................................ 000160
 00000000 00000000 00000000 00000000 00000000 00000000 00000000 00000000 ................................ 000180
 00000000 00000000 00000000 00000000 00000000 00000000 00000000 00000000 ................................ 0001A0
 00000000 00000000 00000000 00000000 00000000 00000000 00000000 00000000 ................................ 0001C0
 00000000 00000000 00000000 00000000 00000000 00000000 00000000 00000000 ................................ 0001E0
```

```
Dump of file SATURN:[PCCOMMON.DUMP.DLL]SA-XPORT.DLL;1 on 18-APR-1990 08:23:46.62
File ID (460,18,0)   End of file block 63 / Allocated 64

Virtual block number 1 (00000001), 512 (0200) bytes

 00000000 00000C+0 00000000 000000B8 0000FFFF 00000004 0000003C 01BE5A4D MZ/.<...........¡.......@....... 000000
 00000080 00000000 00000000 00000000 00000000 00000000 00000000 00000000 ................................ 000020
 6F6E6E61 63206061 72676F72 70207369 685421CD 4C01B821 CD09B400 0EBA1F0E ..o..Ç.ël¡.LèlThis program canno 000040
 00000000 00000024 0A0D0D2E 65646F6D 20534F44 206E6920 6E757220 65622074 t be run in DOS mode....$....... 000060
 000A000A 00000000 00040000 00000000 00078009 59D96C80 000C03EE 0505454E NE..Y...¯l1Y.................... 000080
 00000000 00000000 00010003 00040000 0000047A 00CC008B 009C0090 00400025 %.@.....¡.@.z................... 0000A0
 000F0F00 000F0334 162A0F00 162A018F 05680F00 05680150 10260F00 1026004A J.&...&.].h...h.e.*...*.4....... 0000C0
 000C1EF1 000C077E 1ED00F21 1D3405A9 02020E21 00000000 26920F00 26920336 6..&...&....!...`.4.!.Å.~.É.þ.É. 0000E0
 20415308 01F40004 00110005 00100005 02AB1EB1 02AB07A2 015B1EF1 015B078C ..[.þ.[.Å.¨.Ý.¨...........¶..SA- 000100
 001F0019 00100001 00000243 4F525047 4C445452 4F505845 00000054 524F5058 XPORT...EXPORTDLGPROC........... 000120
 534F4408 52494452 55435153 4F440A4F 49530300 02E80235 022301DB 00C2004E N.ó.Ü.#.S.Ò...SIO.DOSQCURDIR.DOS 000140
 454D0E50 41454845 54414552 434D454D 004D454D 034E4957 40500553 4C4C4143 CALLS.PMWIN.MEM.MEMCREATEHEAP.ME 000160
 470B4954 47034B43 4F4C4243 4F4C4C41 40454000 50414548 594F5254 5345444D MDESTROYHEAP.MEMALLOCBLOCK.GTI.G 000180
 4E455349 54470A43 4F52504C 4F4F5446 45444954 470E4C4F 4F544C4C 49484954 TIKILLTOOL.GTIDEFTOOLPROC.GTISEN 0001A0
 59524555 51495447 12574F44 4E49574C 4F4F5459 52455551 49544712 47534D44 DMSG.GTIQUERYTOOLWINDOW.GTIQUERY 0001C0
 51495447 12525450 41544144 58554154 45534954 47105254 50415441 44585541 AUXDATAPTR.GTISETAUXDATAPTR.GTIQ 0001E0

Dump of file SATURN:[PCCOMMON.DUMP.DLL]SA-XPORT.DLL;1 on 18-APR-1990 08:23:46.62
File ID (460,18,0)   End of file block 63 / Allocated 64

Virtual block number 2 (00000002), 512 (0200) bytes

 40544845 52495551 43414C4D 440D6C6D 6403544E 45524150 4C4F4F54 59524555 UERYTOOLPARENT.dml.DMLACQUIREHTM 000000
 4C444E41 484C4544 4F405952 4555514C 4D44134C 45444F4D 45455246 4C4D440C .DMLFREEMODEL.DMLQUERYMODELHANDL 000020
 514C4044 0C4E4C52 59524555 514C4044 08444C45 49465952 4555514C 4D440045 E.DMLQUERYFIELD.DMLQUERYRLN.DMLQ 000040
 4C4D4459 52455551 4C4D4400 5453494C 45455246 4C4D440B 314E4C52 59524555 UERYRLN1.DMLFREELIST.DMLQUERYDML 000060
 54414552 43454049 54595245 55514C4D 4413545B 45544441 45524C4D 44084449 ID.DMLREADTEXT.DMLQUERYTIMECREAT 000080
 43595245 55514C4D 44114445 54414450 55454D49 54595245 55514C4D 44134445 ED.DMLQUERYTIMEUPDATED.DMLQUERYC 0000A0
 49464C4D 440C5942 44455441 44505559 52455551 4C4D4411 59424445 54414552 REATEDBY.DMLQUERYUPDATEDBY.DMLFI 0000C0
 4C4D4412 59454B45 5441474F 52525553 59524555 514C4D44 1446464F 5245544C LTEROFF.DMLQUERYSURROGATEKEY.DML 0000E0
 58455444 494C4D44 59524555 514C4D44 17535443 454A424F 4C4C4159 52455551 QUERYALLOBJECTS.DMLQUERYDMLIDTEX 000100
 434C5455 0F574F44 4E495752 45544E45 434C5455 0F4C5455 03544345 4A424F54 TOBJECT.UTL.UTLCENTERWINDOW.UTLC 000120
 514C5455 13485441 504C4C55 46454B41 4D4C5455 0F4B5441 5045534E 45444E4F ONDENSEPATH.UTLMAKEFULLPATH.UTLQ 000140
 524F5058 45414408 74726F70 78206164 08544F4F 524E414D 48434142 59524555 UERYBACHMANROOT.da-xport.DAEXPOR 000160
 45491045 4C444E41 48544E45 52525543 54454745 49126E6F 6D6D6F63 65690854 T.iecommon.IEGETCURRENTHANDLE.IE 000180
 490A5443 454A424F 5458454E 54454745 490F5443 454A424F 54535249 46544547 GETFIRSTOBJECT.IEGETNEXTOBJECT.I 0001A0
 454E5445 47454900 544F4C53 54535249 46544547 45490E54 4F4C5345 45524645 EFREESLOT.IEGETFIRSTSLOT.IEGETNE 0001C0
 0C4C4C54 58454E54 45474549 0B4C4C54 53524946 54454745 490C544F 4C535458 XTSLOT.IEGETFIRSTLL.IEGETNEXTLL. 0001E0

Dump of file SATURN:[PCCOMMON.DUMP.DLL]SA-XPORT.DLL;1 on 18-APR-1990 08:23:46.62
File ID (460,18,0)   End of file block 63 / Allocated 64

Virtual block number 3 (00000003), 512 (0200) bytes

 454A424F 54454745 490F4444 41485341 48454909 5055484F 4F4C4853 41484549 IEHASHLOOKUP.IEHASHADD.IEGETOBJE 000000
 45440E4B 53454441 44415308 49535241 5458454E 54454745 490D454D 414E5443 CTNAME.IEGETNEXTARSI.SADADESK.DE 000020
 4F440845 534F4C43 534F4408 4E45504F 534F4407 454C4946 4F525054 45474B53 SKGETPROFILE.DOSOPEN.DOSCLOSE.DO 000040
 78452041 530E000^ 05E50303 01018003 02014441 4552534F 44074554 49525753 SWRITE.DOSREAD........!....SA Ex 000060
 00000001 434F525  4C4F4F54 54524F50 58454153 1000006C 6F6F7420 74726F70 port tool...SAEXPORTTOOLPROC.... 000080
 890E5688 0C468B00 00FFFF9A 5016FC46 800676FF D08EFFFF 881E5657 00013AC8 à:..WV.¡...Ä.v..F•.P......F..V.. 0000A0
 CC868306 FEC88683 000AE9FE CE9689FE CC868912 56881046 88FECA96 89FEC886 .à±..ò±.F..V...ä±..ö±Ö....à±...à 0000C0
 C400C1E9 0377003F 8326FECC 9EC400D1 E9037502 47082607 8826FECC 9EC404FE ±.á.à±&..&.G.u.Öí.á.ä±&.?.w.Öê.á 0000E0
 FF0A76FF 00A4E903 7504470B 2602478B 26FEC89E C400B5E9 0377003F 83260C5E ^.&.?.w.Öç.á.à±&.G.&.G.u.ÖÊ..v.. 000100
 0277FF26 0477FF26 FEC89EC4 37FF2602 77FF26FE CC9EC437 FF26FEC8 9EC40876 v.á.à±&.7á.ä±&.w.&.7á.à±&.w.&.w. 000120
 020036FF 261C4C06 8E006A00 6A006DE9 037500FE C6BE83FE C6868900 00FFFF9A .......ó±./ó±.u.Öm.j.j...L.&.6.. 000140
 C89EC402 77FF2604 77FF26FE C89EC400 00FFFF9A 5016FF66 86800095 68010268 h..h....f..P.....á.ä±&.w.&.w.á.à 000160
 9A5016FE D0868000 42681E50 16FF6686 8037FF26 0277FF26 FECC9EC4 37FF26FE ±&.7á.ä±&.w.&.7..f..P.hB...Å±.P. 000180
 0000FFFF 9A006A00 6A5016FE D08680D1D B1682377 FF26FC5E C416C483 FFFF0268 h....á.á^•&.w#hÝ...Å±.Pj.j...... 0001A0
 FC468006 76FFD88E 0008B81E 56570001 44C8C8C9 5F5E1F00 00E90000 B8FF15E9 Ö..¡..Ö...^_èuàD..WV.¡...Ä.v..F• 0001C0
```

```
BE9689FE 8C868912 56881046 88FA5689 F846890E 56880C46 88000000 159A5016 .P......F..V..F%.V*.F..V...¥±../ 0001E0

Dump of file SATURN:[PCCOMMON.DUMP.DLL]SA-XPORT.DLL;1 on 18-APR-1990 08:23:46.62
File ID (460,18,0)   End of file block 63 / Allocated 64

Virtual block number 4 (00000004), 512 (0200) bytes

FF0A76FF 0165E903 7502470B 26078826 F85EC406 FEBC8683 04F84683 0009E9FE ±Ö...F%...¥±.á^½&..&.G.u.Öe..v.. 000000
00FEC08E 83FEC386 890000FF FF9A5016 FECA868D 37FF2602 77FF26F8 5EC40876 v.á^½&.w.&.7..ô±.P.......å±./á±. 000020
759A5016 FF62868D 00956801 00680200 36FF261C 4C068E00 6A006A00 82E90375 u.Ö..j.j...L.&.6..h..h....b..P.u 000040
02689A50 16FECC86 8D006668 1E5016FF 62868037 FF260277 FF26F85E C4000002 ...á^½&.w.&.7..b..P.hf...ä±.P.h. 000060
5EC40000 02849A00 6A006A50 16FECC86 8D1D8168 2377FF26 FC5EC410 C483029A ...á.á^=&.w#hÝ...ä±.Pj.j..Ç...á^ 000080
04478926 000088FE 8C9EC4FF FF07C726 FE8C9EC4 FFFF0247 C726FFFF 07C726F8 ½&ú...&úG...á.¥±&ú...á.¥±¦..&.G. 0000A0
260277FF 26F85EC4 0876FF0A 76FF0789 26FECA86 88FE8C9E C4FF3DE9 02478926 &.G.Ö=.á.¥±..ô±&...v..v.á^½&.w.& 0000C0
8E006A00 6A006FE9 037500FE C08E83FE C0868900 00FFFF9A 5016FEC2 868D37FF .7..ô±.P.......å±./á±.u.Öo.j.j.. 0000E0
F85EC4FE CA86FF00 0000CD9A 5016FF62 868D0095 68010168 020036FF 261C4C06 .L.&.6..h..h....b..P.e....Ñô±á^% 000100
C412C483 01020268 9A5016FE CC868D00 77681E50 16FF6286 8D37FF26 0277FF26 &.w.&.7..b..P.hw...ä±.P.h....á.á 000120
26000088 FE8C9EC4 0000011C 9A006A00 6A5016FE CC868D10 81682377 FF26FC5E ^=&.w#hÝ...ä±.Pj.j......á.¥±¦..& 000140
83E90457 89260247 8926FEC8 9688FEC6 8688FE8C 9EC4FE9A E9024789 26044789 .G.&.G.Ö.±á.¥±..ó±..å±&.G.&.W.Ö. 000160
1F0000E9 00008802 47892604 47892600 0088FE8C 9EC40000 07C726FE 8C9EC4FE ±á.¥±&ú...á.¥±¦..&.G.&.G.¦..Ö... 000180
801676FF 1276FF14 76FF0E76 FF1076FF D88E0136 881E5657 000010C8 C8C95F5E ^_èùà...WV.¦6..Ä.v..v..v..v..v.. 0001A0
0019E903 75F6460B F4468800 24E90374 00F07E83 F0468900 00FFFF9A 5016F446 F¶.P......Fþ.-þ.t.Ö$..F¶.F-u.Ö.. 0001C0
89F64689 00008800 09E90000 01939A50 16FA468D F476FFF6 76FF0E76 FF1076FF .v..v..v-.v¶.F*.P.....Ö..¦...F-. 0001E0

Dump of file SATURN:[PCCOMMON.DUMP.DLL]SA-XPORT.DLL;1 on 18-APR-1990 08:23:46.62
File ID (460,18,0)   End of file block 63 / Allocated 64

Virtual block number 5 (00000005), 512 (0200) bytes

83F04689 00000403 9A501618 46805016 F8468050 16F2468D 1876FF1A 76FFF446 F¶.v..v..F·.P.F%.P.F..P......Fþ. 000000
39FA4688 0039E903 75F6460B F44688FC 4689FE46 89000088 0085E903 7400F07E -þ.t.Ö..¦...F±.F=.F¶.F-u.Ö9..F*9 000020
0000FFFF 9A5016FC 468DF476 FFF676FF FA76FF0A 76FF0C76 FF002EE9 0374F246 F·t.Ö...v..v..v*.v-.v¶.F=.P..... 000040
FF009468 1EFC76FF FE76FFFC 4689FE46 89000088 0009E903 7500F07E 83F04689 .Fþ.-þ.u.Ö..¦...F±.F=.v±.v=.h... 000060
18468D50 16F8468D 5016F246 8D1876FF 1A76FF0C C48301E0 011E9A06 76FF0876 v..v....Å..á..v..v..F·.P.F%.P.F. 000080
881E5657 000420C8 C8C95F5E 1F0000E9 000088FF 72E9F046 890000FF FF9A5016 .P......FþÖr.¦..Ö...^_èùà ..WV.¦ 0000A0
8D5016F8 E0868D50 16FC468D 5016E846 8D5016FE 46800E76 FF1076FF D88E030C ...Å.v..v..F±.P.FÒ.P.F=.P..Å«.P. 0000C0
01C9E9E8 46880222 E9037400 E67E83E6 46890000 FFFF9A50 16F04680 5016F446 F¶.P.Fþ.P......F¦.-¦.t.Ö"..FÖÕè. 0000E0
76FF1476 FF0A76FF 0C76FF06 76FF0876 FF1676FF 1876FFFE 76FFF076 FFF276FF .v·.vþ.v±.v..v..v..v..v..v..v..v 000100
76FF0676 FF0876FF F64689F8 E086F7D2 28FC4680 01C0E916 C483FFFF 03049A12 .......á.Öá..F=+Ø%ÑÄ«.F-.v..v..v 000120
8CEA4689 F8E2868D 0001E9F6 46880000 0580D9A50 16F8E286 8DFE76FF 1676FF18 ..v..v±..ã«.P.§....F-Ö¦...ã«.Fõ. 000140
26EA46FF EA5EC400 20E90372 EE4639F8 E08688EE 46FF0003 E90000EE 46C7EC56 V&úFŸ..Ö...FŸ..Å«9FŸr.Ö .á^õ.Fõ& 000160
F8E2868D 00A8E5 F 01E90AC4 83053401 1E9A1276 FF1476FF 0099681E 5098078A ...P.h...v..v....4..á.Ö¦.Ö´...ã« 000180
F85EC400 1FE903/2 EE4639F8 E08688EE 46FF0003 E90000EE 46C7FA56 8CF84689 .F%.V*úFŸ..Ö...FŸ..Å«9FŸr.Ö..á^% 0001A0
8D0065E9 FFD2E90A C483057B 011E9A12 76FF1476 FF009068 1E37FF26 02F84683 .F%.&.7.h...v..v....(..á.Ö#.Öe.. 0001C0
0023E903 72EE4639 F8E08688 EE46FF00 03E90000 EE46C7E4 568CE246 89F8E286 .ã«.Fâ.VÖúFŸ..Ö...FŸ..Å«9FŸr.Ö#. 0001E0

Dump of file SATURN:[PCCOMMON.DUMP.DLL]SA-XPORT.DLL;1 on 18-APR-1990 08:23:46.62
File ID (460,18,0)   End of file block 63 / Allocated 64

Virtual block number 6 (00000006), 512 (0200) bytes

0CC48305 D4011E9A 1276FF14 76FF00A1 681E37FF 260277FF 2604E246 83E25EC4 á^â.Fâ.&.w.&.7.hÅ..v..v....Å..á. 000000
9EE90375 000430FF 63E90375 000230FF 27E90375 00013000 18E9001E E9FFCEE9 Öö.Ö..Ö..*..u.Ö'.=..u.Öc.=..u.Ö. 000020
0005F29A 5016F8E2 868DFE76 FF1676FF 1876FF06 76FF0876 FF00A5E9 0000E9FF .Ö..Ö£..v..v..v..v..v±..ã«.P.·.. 000040
FF0876FF 0070E90A C4830609 011E9A12 76FF1476 FF00A668 1E5098F8 E2868A00 ...ã«.P.h¦..v..v.......á.Öp..v.. 000060
00AC681E 5016F8E2 868D0000 FFFF9A50 16F8E286 8DFE76FF 1676FF18 76FF0676 v..v..v..v±..ã«.P.......ã«.P.h¯. 000080
03E8011E 9A1276FF 1476FF00 82681E00 38E90CC4 83061E01 1E9A1276 FF1476FF .v..v.......á.Ö;..hý..v..v....Ö. 0000A0
98E90375 000430F_ 27E90375 000330FE 58E90375 00013000 23E90026 E908C483 .á.Ö&.Ö#.=..u.Ö¦±=..u.Ö'±=..u.Ö. 0000C0
16FC468D 5016E846 805016FE 46800E76 FF1076FF FFC5E9FF 5EE90375 000530FF .=..u.Ö^.Öé..v..v..F±.P.FÒ.P.F=. 0000E0
E9000088 FD05E9E6 46890000 FFFF9A50 16F04680 5016F446 805016F8 E0868D50 P..Å«.P.F¶.P.Fþ.P......F¦Ö¦»¦..Ö 000100
88FE5689 FC46891E 56881C46 88088E04 20881E56 57000018 C8C8C95F 5E1F0000 ...^_èùà...WV.¦ ..Ä.F..V..F=.V±. 000120
02470826 078826E8 5EC404E8 468306FC 46830008 E9EA5689 E846891A 56881846 F..V¯..FÒ.VõÖ...F=..FÒ.á^Ö&..&.G. 000140
0277FF26 E85EC40A 76FF0C76 FF00CAE9 03740739 260E4688 FC5EC400 08E90375 u.ÖU.á^=.F.&9.t.Öò..v..v.á^Ö&.w. 000160
830004E9 F05689EE 4689F456 88F24688 0000FFFF 9A5016F2 46801076 FF37FF26 &.7.v..F·.P......F·.V¶.FŸ.VþÖ... 000180
260277FF 26EE5EC4 0A76FF0C 76FF007A E9037502 47082607 8826EE5E C404EE46 FŸ.á^Ÿ&..&.G.u.Öz..v..v.á^Ÿ&.w.& 0001A0
0676FF08 76FF004F E9037500 0030FA46 89124688 00000352 9A5016FA 468037FF .7.F*.P.R....F..F*=..u.ÖO..v..v. 0001C0
```

```
037500EC 7E83EC46 89000003 8C9A5016 F6468D37 FF260277 FF26EE5E C4FA76FF .v*á^Y&.w.&.7.F-.P.¥....Fš.~š.u. 0001E0

Dump of file SATURN:[PCCOMMON.DUMP.DLL]SA-XPORT.DLL;1 on 18-APR-1990 08:23:46.62
File ID (460,18,0)   End of file block 63 / Allocated 64

Virtual block number 7 (00000007), 512 (0200) bytes

 76FF1676 FF00CG68 1E0277FF 260477FF 26FC5EC4 F676FFF8 76FFFF99 E90003E9 Ő..Ő...v%.v~á^•&.w.&.w..há..v..v 000000
 FF0EE900 00FFFF9A F276FFF4 76FF0A76 FF0C76FF FF73E910 C48304F1 011E9A14 ....þ..á.Ős..v..v..v¶.v·.....Ő.. 000020
 1076FF06 76FF0876 FF088E06 8FB81E56 5700005A C8C8C95F 5E1F0000 E9000088 ¡..Ő...^_èùàZ..WV.¡...Ă.v..v..v. 000040
 5016AA46 8D0148E9 FE468800 06E90375 00003000 00FFFF9A 5016AA46 8D0E76FF .v..F¯.P¯.....=..u.Ő...F±ŐH..F¯.P 000060
 46800E76 FF1076F  0676FF08 76FF0CC4 83081E01 1E9A0A76 FF0C76FF 00CA681E .hò..v..v.......á..v..v..v..v..F 000080
 086502E8 9A5016FA 468D010D E9FE4688 0006E903 75000030 0000FFFF 9A5016FA *.P.....=..u.Ő...F±Ő...F*.P.Ő.e. 0000A0
 A65EC404 77FF26A6 5EC40277 FF26A65E C437FF26 A65EC4A8 5689A646 8904C483 .á..Fl.V´á^l&.7á^l&.w.á^l&.w.á^l 0000C0
 FF0C76FF 0000681E 50076C05 0A478826 A65EC450 40084788 26A65EC4 0677FF26 &.w.á^l&.G.@Pá^l&.G..l.P.hÅ..v.. 0000E0
 0000FFFF 9A5016AA 468D0E76 FF1076FF 0676FF08 76FF14C4 8308A001 1E9A0A76 v.......á..v..v..v..v..F¯.P..... 000100
 011E9A0A 76FF0C76 FF00F668 1E5016AA 46800095 E9FE4688 0006E903 75000030 =..u.Ő...F±Ő...F¯.P.h-..v..v.... 000120
 03750000 300000FF FF9A5016 FA468D0E 76FF1076 FF0676FF 0876FF0C C48308D1 l..á..v..v..v..v..F*.P.....=..u. 000140
 26A65EC4 A85689A6 468904C4 83091802 E89A5016 FA468D00 5AE9FE46 8B0006E9 Ő...F±ŐZ..F*.P.Ő....á..Fl.V´á^l& 000160
 50400847 8B26A65E C40677FF 26A65EC4 0477FF26 A65EC402 77FF26A6 5EC437FF .7á^l&.w.á^l&.w.á^l&.w.á^l&.G.@P 000180
 00008814 C48307B4 011E9A0A 76FF0C76 FF00FC68 1E50076C 050A4788 26A65EC4 á^l&.G..l.P.h•..v..v.......á.¡.. 0001A0
 5016FDFC 86800676 FF0876FF 088E07B3 881E5657 000208C8 CBC95F5E 1F0000E9 Ő...^_èùà...WV.¡*..Á.v..v...=».P 0001C0
 0000FFFF 9A5016FD F8868D80 0068616A 27,77FF26 1A5EC4FE 9E868900 00FFFF9A .........±á^.&.w'jah....½».P..... 0001E0

Dump of file SATURN:[PCCOMMON.DUMP.DLL]SA-XPORT.DLL;1 on 18-APR-1990 08:23:46.62
File ID (460,18,0)   End of file block 63 / Allocated 64

Virtual block number 8 (00000008), 512 (0200) bytes

 805016FE A886800A /6FF0C76 FF03CBE9 FE9E8688 0007E903 7500003D FE9E8689 ...±=..u.Ő.....±Őù..v..v...´±.P. 000000
 0398E903 7400FE9E BE83FE9E 86890000 FFFF9A50 16FEAA86 80506A50 16FDFE86 .±».PjP..¯±.P........±./.±.t.Ő.. 000020
 86891456 88124688 0CC4830A 17011E9A 0E76FF10 76FF0122 681E5016 FDFE868D ..±».P.h"..v..v.......á..F..V... 000040
 FE808683 06FEA086 83000AE9 FE829689 FE808689 18568816 4688FEA2 9689FEA0 .±..Á±.F..V...¯±..ý±Ő.....±...¯± 000060
 9EC400C8 E9037407 3926FEA8 8688FEA0 9EC40008 E9037500 3F8326FE A09EC404 .á..±&.?.u.ŐÙ.á..±..´±&9.t.Őà.á. 000080
 FEB09EC4 0CC4830A AF011E9A 0E76FF10 76FF0128 681E0277 FF260477 FF26FEA0 .±&.w.&.w..h+..v..v....£..á.á.¯± 0000A0
 26FEB09E C40CC483 0A6307A8 9A0676FF 0876FF0E 76FF1076 FF37FF26 0277FF26 &.w.&.7.v..v..v..v..¨.c..á.á.¯±& 0000C0
 0676FF08 76FF0A76 FF0C76FF FEAAB6FF FEACB6FF 0E76FF10 76FF37FF 260277FF .w.&.7.v..v..Ñ¯±.Ñ´±.v..v..v..v. 0000E0
 26FEB09E C40676FF 0876FF00 3FE90374 FEA88639 FDFC8688 14C48304 8404189A ......á...•»9.´±t.Ő7..v..v.á.¯±& 000100
 B6FFFDFA B6FFFE9E 86890000 FFFF9AFD F886FFFD FAB6FF80 006837FF 260277FF .w.&.7h...Ñ*».Ñ%».........±.Ñ*».Ñ 000120
 1E9A0E76 FF1076FF 0135681E 0CC4830A C1011E9A 0E76FF10 76FF012F 681EFDF8 %».h/..v..v....è..á..h5..v..v... 000140
 86868050 16FE8A86 805016FE AE868DFE AAB6FFFE ACB6FFFF 0EE908C4 83089001 ....á.Ő...Ñ¯±.Ñ´±..Ù±.P..¤±.P..Ñ 000160
 868689FE 88868900 00880008 E9037500 FE9E8E83 FE9E8689 0000FFFF 9A5016FE ±.P.........±./.±.u.Ő..¡....¡±..Ñ 000180
 82C7E6D1 FE848688 000FE903 7252FEB4 BE83FEB4 86FF0004 E90000FE 8486C7FE ±ú.Ç±..Ő....Ç±./Ç±Rr.Ő...ÑÇ±ÌÌú. 0001A0
 B6FF01C7 E9037400 FE9E8E83 01D1E903 75FE8886 08FE8686 88FFE3E9 0000FF0C ....ŐD...Ñ±..¡±u.Ői../.±.t.Őù..Ñ 0001C0
 9E868900 0003789A 5016FEB6 86805016 FEA6868D 5016FEA4 868DFEB6 86FFFEB8 ¡±.ÑÑ±..Ê±.P..Î±.P..Ñ±.P.x...... 0001E0

Dump of file SATURN:[PCCOMMON.DUMP.DLL]SA-XPORT.DLL;1 on 18-APR-1990 08:23:46.62
File ID (460,18,0)   End of file block 63 / Allocated 64

Virtual block number 9 (00000009), 512 (0200) bytes

 00FFFF9A 506A5016 B0468DFE A486FF0A 76FF0C76 FF015FE9 037400FE 9EBE83FE ±./.±.t.Ő ..v..v..ÑÊ±.F¯.PjP.... 000000
 08B70214 9A5016FD FE868D08 C48308 9E 01849A50 16FEBC86 805016FD FE868000 ...±».P..¥±.P.Ç....á...±».P...ñ. 000020
 FEA4B688 0AC48308 ED022C9A 5016FE8C 86805016 80468050 08F70012 2D04C483 .á.-..%ÁP.F¯.P..¥±.P.,.Ú..á..ÑÊ± 000040
 FF0CB2FF E601FEA4 B6880084 E9037701 FF0CBA83 E601FEA4 868BFF0C 82FFE6D1 ÌÌ.....ÑÊ±ÌÌ.¤...w.Ő...ÑÊ±ÌÌ.ý.. 000060
 04C4830C 0802149A 5016FE4E 86800AC4 8307ED02 689A5016 FE4E8680 0137681E .h7...N±.P.h.Ù..á...N±.P......á. 000080
 5016FE4E 8680002C E9C37300 1230C603 04C4830C 2902149A F08B5116 FEBC8E8D ..¥±.Q.Þ...)..á..ó=..s.Ő,...N±.P 0000A0
 0C5501B4 9A5016FE BC828DDE F712EE83 F08804C4 830C3E02 149A5016 FC[illegible]868D ..N±.P...>..á..Þ.Ÿ.%B..¥±.P.Ç.U. 0000C0
 5016FEBC 868D08C4 830C6D01 6E9A5016 FEBC868D 5016FE4E 86800014 E90[illegible]483 .á.Ő....N±.P..¥±.P.n.m..á...¥±.P 0000E0
 76FF1676 FF1876FF 1276FF14 76FF0CC4 83098301 1E9A0E76 FF1076FF 013A[illegible]1E .h:..v..v....*..á..v..v..v..v..v 000100
 3606879A 0A76FF0C 76FF0676 FF0876FF FEA8B6FF FEAEB6FF FEA4B6FF 0E76FF10 ..v..ÑÊ±.ÑÜ±.Ñ´±.v..v..v..v....6 000120
 599A5016 FE86868D 5016FEA6 86805016 FEA4868D FEB6B6FF FEB8B6FF 1AC4830A ..á..Ñ¡±.ÑÑ±..Ê±.P..Î±.P..Ñ±.P.Y 000140
 86805016 FEBA868D 5016FEAE 868DFEAA 86FFFEAC B6FFFE97 E9FE9E86 89000008 ......±Ő.±.Ñ¯±.Ñ´±..Ù±.P..¤±.P.. 000160
 8689FEB8 86890000 88000BE9 037500FE 9EBE83FE 9E868900 00FFFF9A 5016FEB6 Ñ±.P.........±./.±.u.Ő..¡....¡±.. 000180
 86805016 FEA8868D 0A76FF0C 76FF0000 FFFF9AFE AAB6FFFE ACB6FFFE 22E9FEB6 Ñ±Ő"±.Ñ¯±.Ñ´±......v..v...´±.P.. 0001A0
 5E1F0000 E9000088 FC5EE9FE 9E868900 00FFFF9A 5016FEAA 868D506A 5016FDFE ±».PjP..¯±.P........±Ő^•¡..Ő...^ 0001C0
```

```
26F85EC4 00000143 9A5016F8 46800676 FFD88E09 30881E56 570001EC C8C8C95F _èùà$..WV.¡0..A.v..F½.P.C...á^½& 0001E0
```

Dump of file SATURN:[PCCOMMON.DUMP.DLL]SA-XPORT.DLL;1 on 18-APR-1990 08:23:46.62
File ID (460,18,0)   End of file block 63 / Allocated 64

Virtual block number 10 (0000000A), 512 (0200) bytes

```
18868900 0088FE1E 86892747 8826F85E C4FE1C96 89FE1A86 89285788 26294788 .G)&.W+...±...±á^½&.G'...±¡..... 000000
86890000 FFFF9A50 16FE1686 8D5016FE 86868DFE 1A86FFFE 1C86FFFE 168689FE ±...±.Ñ.±.Ñ.±..Ñ±.P...±.P....... 000020
8D009568 01036802 0036FF26 1C4C068E 006A006A 0062E903 7500FE14 8E83FE14 .±./.±.u.Õb.j.j...L.&.6..h..h... 000040
FE20868D 0142681E 5016FF12 868DFE1A 86FFFE1C 86FF0000 0EAF9A50 16FF1286 ....P.£....Ñ.±.Ñ.±.....P.hB... ± 000060
659A006A 006A5016 FE20868D 10816823 77FF26F8 5EC410C4 830E7F02 689A5016 .P.h....á.á^½&.w#hÿ... ±.Pj.j..e 000080
6AFE1E86 FF010CE9 0375FE88 8608FE86 8688FE86 8689FE88 86890000 8800000F ...j....j±..Ñ±..Ñ±..¡±u.ÕÉ..Ñ.±j 0000A0
FE148689 0000095C 9A5016FE 8E868D50 000605E0 D1C103E0 D1C888FE 86868861 a..Ñ±.àlÅ.èlÅ...P../±.P.\......± 0000C0
FFFE1686 FFFE1884 FFFE8E86 FFFEC086 FF01D1E9 FE148688 0007E903 7500003D =..u.Õ.....±Õl..Ñà±.Ñ/±.Ñ.±.Ñ.±. 0000E0
4800EA9A 0876FF0A 76FF014F 681E0EC4 830FAA01 2E9A0676 FFFE1A86 FFFE1C86 Ñ.±.Ñ.±.v....¯..á..hO..v..v..ð.K 000100
36FF261C 4C068E00 6A006A00 3FE90374 FE4608FC 4688FE56 89FC4689 08C4830F ..á..F=.V±.F=.F±t.Õ?.j.j...L.&.6 000120
16FF1286 8D016A00 6A016A00 6A00000F 259A5016 FF12868D 00956800 F8680200 ..h«.h.......P.X...j.j.j.j...... 000140
FF2077FF 26F85EC4 FE1E86FF 014CE900 01880000 FFFF9A20 6A006A00 6A006A50 Pj.j.j.j .....¡..ÕL..Ñ.±á^½&.w-. 000160
14868900 00FFFF9A 5016FE8A 86805016 FEC2868D 5016A846 8DFE1A86 FFFE1C86 Ñ.±.Ñ.±.f´.P..ó±.P..¤±.P........ 000180
86800095 68010468 020036FF 261C4C06 8E006A00 6A0064E9 037500FE 148E83FE ±./.±.u.Õd.j.j...L.&.6..h..h.... 0001A0
681E5016 FF12868D FE1A86FF FE1C86FF 2077FF26 F85EC400 00018F9A 5016FF12 ...P.¢...á^½&.w-.Ñ.±.Ñ.±.....P.h 0001C0
5016FE20 868D1081 682377FF 26F85EC4 12C4830F 8702689A 5016FE20 86800151 Q... ±.P.h....á.á^½&.w#hÿ... ±.P 0001E0
```

Dump of file SATURN:[PCCOMMON.DUMP.DLL]SA-XPORT.DLL;1 on 18-APR-1990 08:23:46.62
File ID (460,18,0)   End of file block 63 / Allocated 64

Virtual block number 11 (0000000B), 512 (0200) bytes

```
76FF016E 681E5016 A8468D50 16FEC286 8D0081E9 00018800 0001FA9A 006A006A j.j..ª...¡..ÕY...ó±.P.F´.P.hn..v 000000
FE8C86FF FE8E86FF FEC086FF FE1686FF FE1886FF 10C4830F EC011E9A FC76FFFE ±.v=...$..á..Ñ.±.Ñ.±.Ñà±.Ñ/±.Ñ¥± 000020
C086FFFE 1686FFFE 1886FFF8 76FFFA76 FF0EC483 0FDE0000 9A0676FF FE8A86FF .Ñ¤±.v....8..á..vª.v½.Ñ.±.Ñ.±.Ñà 000040
0C9F0928 9AFE1A86 FFFE1C86 FFFE8A86 FFFE8C86 FFFC76FF FE76FFFE 8E86FFFE ±.Ñ/±.v±.v=.Ñ¥±.Ñ¤±.Ñ.±.Ñ.±.(... 000060
75FE1886 08FE1686 880000FE 1486C704 C4830BFB 00109AFC 76FFFE76 FF18C483 .á..v±.v=...«..á.ú..±.....±...±u 000080
0000E9FE 14868800 0007999A FE1686FF FE1886FF FE1A86FF FE1C86FF 0015E903 .Õ...Ñ.±.Ñ.±.Ñ.±.Ñ.±.........±Õ.. 0000A0
023E0009 0EF90203 01560006 08870203 00000001 0E600002 002190C8 C95F5E1F .^_èù.!...m.......ñ...V...ª...>. 0000C0
00600005 00FF0203 00000005 0DE50002 02CA0009 087D0203 02C00009 00A10203 ..Ã...á...)...ò...l...........m. 0000E0
02DA0009 0C8F0203 00000007 00480002 016A0006 07C90203 02510009 098E0203 ......Q...è...j...K.......¢...Ö. 000100
017C0006 087C0203 02620009 002D0203 00F50006 04AE0203 00880003 0ECA0103 ..ò.......Û...%...·...b...|...|. 000120
02720009 0D0E0203 009D0003 00C60103 01030006 06EC0203 00880005 00580203 ..X.......$.......ó...........r. 000140
011C0006 10150203 01980006 02490203 027D0009 044A0203 010F0006 03250203 ..%.......J...)...1.............. 000160
01800006 009A0203 00400004 0E380203 01280006 07280203 028C0009 06720203 ..r.......(...(...8...∂.......¯. 000180
01420006 08040203 02A70009 0CE50203 01360006 0A920203 029A0009 0AE40203 ..8...........6...1...Ī.......B. 0001A0
4680026A D88EFFFF 881E5657 00000CC8 02830009 07530203 01C30006 09410203 ..A...û...S...°.à...WV.¡...Äj..F 0001C0
3C68616A F676FF01 5JE9F446 880006E9 03750000 3DF44689 0000FFFF 9A5016F6 ~.P......F¶=..u.Õ...F¶ÒP..v~jah< 0001E0
```

Dump of file SATURN:[PCCOMMON.DUMP.DLL]SA-XPORT.DLL;1 on 18-APR-19 1 08:23:46.62
File ID (460,18,0)   End of file block 63 / Allocated 64

Virtual block number 12 (0000000C), 512 (0200) bytes

```
46880000 01319AF6 76FF000E E9037500 003DF446 890000FF FF9A5016 FC468D03 ..F=.P......F¶=..u.Õ...v~.1....F 000000
478926F6 4688FC5E C408C483 00A6039A 9AFC76FF FE76FF00 6A033C68 0125E9F4 ¶ÕX.h<.j..v±.v=...Ī..á.á^=.F~&.G 000020
46830000 FFFF9A50 52002305 FE5688FC 46880A76 FF214789 260A4688 FC5EC427 'á^=.F.&.GI.v..F=.V±.#.RP......F 000040
C4040646 8308C483 00F10184 9AFC76FF FE76FFFC 77FF26FE 77FF2606 5EC40406 ..á^.&.w±&.w=.v±.v=.Ç.þ..á..F..á 000060
89F84689 FE578826 FC478826 065EC404 0646832D 478926FC 5EC4FC47 8826065E ^.&.G=á^=&.G-.F..á^.&.G=&.W±.F½. 000080
849A5052 013005FE 5688FC46 88F876FF FA76FF00 1CE90375 FA4608F8 4688FA56 Vª.F½.Fªu.Õ...vª.V½.F=.V±.0.RP.Ç 0000A0
FFFE76FF 0A76FF2D 77FF26FC 5EC40001 3087C626 FC5EC400 09E908C4 83FFFF01 ....á.Õ..á^=&6.0..á^=&.w-.v..v±. 0000C0
F676FF00 0EE90375 000030F4 46890000 FFFF9A50 52002905 FE5688FC 4688FC76 v=.F=.V±.).RP......F¶=..u.Õ...v~ 0000E0
7E83F446 890000FF FF9A2977 FF262877 FF26FC5E C4003EE9 F4468800 00015B9A .(....F¶Õ>.á^=&.w+&.w)......F¶.~ 000100
FF9AFC76 FFFE76FF 0A76FF00 14E9F446 880000FF FF9AF676 FF000EE9 037500F4 ¶.u.Õ...v~......F¶Õ...v..v±.v=.. 000120
E90E4688 D88E0008 881E5657 00006AC8 0006CAC9 5F5E1F00 00E90000 880000FF ...¡..Õ...^_èò..àj..WV.¡...Ä.F.Õ 000140
99964688 964689FF FF00009A 0A76FF0C 76FF1076 FF03C5E9 00008A00 01880037A ±.¡..¤..Õé.¯v..v..v.......F..F.. 000160
00620214 9A505201 3005FE56 88FC4688 0000FFFF 9A5016FC 46801076 FF03ADE9 ÕÜ..v..F=.P......F=.V±.0.RP...b. 000180
83964689 06C483FF FF13879A 1076FFFC 76FFFE76 FF0062E9 03740000 3004C483 .á.=..t.Õb..v±.v=.v.......á..F.. 0001A0
9A501698 4680636A 01096802 0036FF26 1C4E068E 006A006A 0045E903 7500967E ~..u.ÕE.j.j...N.&.6..h..jc.F..P. 0001C0
```

```
6A1076FF 00000293 9A006A00 6A501698 46801DB1 682377FF 26FC5EC4 00000278 (...á^=&.w#hÝ..F..Pj.j.......v.j 0001E0
```

```
Dump of file SATURN:[PCCOMMON.DUMP.DLL]SA-XPORT.DLL;1 on 18-APR-1990 08:23:46.62
File ID (460,18,0)   End of file block 63 / Allocated 64

Virtual block number 13 (0000000D), 512 (0200) bytes

6A016A00 6A0007c9 03750003 34BF8326 FC5EC403 23E99996 46880000 FFFF9A00 .......F..Õ#.á^=&.«4..u.Õ■.j.j.j 000000
020036FF 261C4E06 8E006A00 6A000003 189A5052 00000314 9A006A03 6A016A00 .j.j.j......RP.....j.j...N.&.6.. 000020
006A5016 98468D10 81682377 FF26FC5E C4000002 D39A5016 98468063 6A010868 h..jc.F..P.£...á^=&.w#hÝ..F..Pj. 000040
FE76FF50 52013005 FE5688FC 46882977 FF262877 FF26FC5E C4000003 039A006A j......á^=&.w+&.w).F=.V±.0.RP.v± 000060
98468063 6A00FF68 020036FF 261C4E06 8E006A00 6A964689 0000FFFF 9AFC76FF .v=......F.j.j...N.&.6..h..jc.F. 000080
C408C483 01CE016E 9A501698 46805052 013005FE 5688FC46 88000003 529A5016 .P.R....F=.V±.0.RP.F..P.n.ö..á.á 0000A0
6A016A00 6A016A00 6A000003 6A9A006A 006A5016 98468010 81682377 FF26FC5E ^=&.w#hÝ..F..Pj.j..j...j.j.j.j.j 0000C0
FF9A006A 036A016A 006A016A 006A00C9 E9000003 369A5052 0000032F 9A006A01 .j../...RP.6...Õè.j.j.j.j.j.j... 0000E0
16984680 636A0108 68020036 FF261C4E 068E006A 006A0000 FFFF9A50 520000FF ...RP.....j.j...N.&.6..h..jc.F.. 000100
46880000 FFFF9A00 6A006A50 1698468D 10816823 77FF26FC 5EC40000 Fr,¨9A50 P.....á^=&.w#hÝ..F..Pj.j.......F 000120
261C4E06 8E006A00 6A964689 06C483FF FF00439A 1076FF50 52013005 FE56-9FC •.V±.0.RP.v..C....á..F.j.j...N.& 000140
46805052 013005FE 5688FC46 88000002 109A5016 98468063 6A00FF68 020036FF .6..h..jc.F..P......F=.V±.0.RP.F 000160
4A9A006A 006A5016 98468010 81682377 FF26FC5E C408C483 02EA016E 9A501698 ..P.n.ö..á.á^=&.w#hÝ..F..Pj.j..J 000180
006A1076 FF000002 5F9A5052 00000258 9A006A01 6A016A00 6A016A00 6A000004 ...j.j.j.j.j.j..X...RP._....v.j. 0001A0
4FE90000 8A000088 0158E999 96468800 07E90375 00967E83 96468900 0002329A .2....F..~..u.Õ...F..ÕX¯.j..¤..Õ0 0001C0
260A4688 FC5EC400 0AE90375 08460806 46880000 04839A50 16FC4680 1076FF01 ..v..F=.P......F..F.u.Õ..á^=.F.& 0001E0
```

```
Dump of file SATURN:[PCCOMMON.DUMP.DLL]SA-XPORT.DLL;1 on 18-APR-1990 08:23:46.62
File ID (460,18,0)   End of file block 63 / Allocated 64

Virtual block number 14 (0000000E), 512 (0200) bytes

00880000 049E9A06 76FF0876 FF505299 10468810 AE682377 FF26FC5E C4254789 .G%á^=&.w#hÛ..F..RP.v..v......j. 000000
89260247 89260000 88065EC4 07892602 47892600 00880A5E C40109E9 00008A00 .¤..Õ..á^.j..&.G.&..á^.j..&.G.&. 000020
76FF2377 FF26FC5E C4000004 C69A5016 FC468D10 76FF00E6 E900008A 00008807 .j..¤..Õl..v..F=.P.6...á^=&.w#.v 000040
260A5EC4 0084E999 96468896 46890000 02289A06 76FF0876 FF0A76FF 0C76FF0E ..v..v..v..v..(....F..F..ÕÇ.á^.& 000060
77FF26FC 5EC40000 018C9A50 16FC4680 1076FF00 A3E90000 8A000088 000107C7 ú...j..¤..ÕÉ..v..F=.P.¥...á^=&.w 000080
FF0071E9 00008A00 00880000 004A9A27 77FF26FC 5EC40000 FFFF9A29 77FF2628 +&.w).....á^=&.w'.J...j..¤..Õq.. 0000A0
751DAD30 0048E900 57E90000 FFFF9A06 76FF0876 FF0A76FF 0C76FF0E 76FF1076 v..v..v..v..v..v......ÕW.ÕK.=Ù.u 0000C0
8CE90375 10043DFC 72E90375 10033DFC 71E90375 10013000 18E90376 FC9FE903 .Õ.=v.Õ..=..u.Õq==..u.Õr==..u.Õ. 0000E0
751D8230 FF2EE903 751D8130 FF68E903 751D803D FED5E903 751DAE30 FF8BE9FF .ÕÉ.=Û.u.Õ‡±=¯.u.Õh.=Ý.u.Õ..=ý.u 000100
000604D6 02030015 90000CCA C95F5E1F 0000E900 008A0000 B8FF98E9 FF03E903 .Õ..Õ..j..¤..Õ..^_èò.......•... 000120
000301E7 00020000 000201A7 0002005E 00050502 02030000 0001037F 00020004 å................^...Ï.......Ó... 000140
0005041A 02030000 00070188 00020060 000503CF 02030000 00050386 00020000 ....Ñ.......ù...m................ 000160
0005016F 02030023 00040014 0203018E 00060147 02030090 0003039F 01030088 ............G..........#...o... 000180
000802B4 02030040 00040037 020300AF 0005008A 02030031 000404E2 0203009E ....â...1.......£...7...ª...Ç... 0001A0
000503F1 020300C6 0006011E 0203005C 000303E7 01030058 000303E0 0103022C ,...Á...(...Ó...\.......ó...þ... 0001C0
08064688 D88EFFFF 881E5657 000000C8 00000000 00000000 00000000 00000052 R................à...WV.j...Ä.F.. 0001E0
```

```
Dump of file SATURN:[PCCOMMON.DUMP.DLL]SA-XPORT.DLL;1 on 18-APR-1990 08:23:46.62
File ID (460,18,0)   End of file block 63 / Allocated 64

Virtual block number 15 (0000000F), 512 (0200) bytes

460B0A46 8808C483 003F0184 9A0E76FF 1076FF06 76FF0876 FF0014E9 03750846 F.u.Õ...v..v..v..v..Ç.?..á..F..F 000000
03745CFF 788D260E 5EC4F088 04C48300 6D02149A 0E76FF10 76FF001D E903750C .u.Õ...v..v....m..á..Pá^.&.x.\t. 000020
83008C01 6E9A0E76 FF1076FF 017E681E 0012E903 7400027F 80260E5E C4000DE9 Õ..á^.&....t.Õ...h-..v..v..n.... 000040
C483FFFF 016E9A0E 76FF1076 FF0A76FF 0C76FF00 14E90375 0C460B0A 46B808C4 á..F..F.u.Õ...v..v..v..v..n....á 000060
FF0876FF FFFFFE46 C70001FA 46C7D88E 0008881E 56570001 1EC8C8C9 5F5E1F08 ..^ èùà...WV.j...ÄúF*..úF±...v.. 000080
0000FFFF 9A006A00 6A5016FA 46800117 685016FE E2868031 6A5016FE 46800676 v..F±.Pj1..ã±.Ph...F*.Pj.j...... 0000A0
0002C8C8 C95F5E1F 0000E9FC 46880003 FC46C700 05E90374 899CFC7E 81FC4689 .F=.-=..t.Õ..úF=...F=Õ...^ èùà.. 0000C0
03750038 80260676 C4FE5E88 FE46FF00 03E90000 FE46C7D8 8E009E88 1E565700 .WV.j...ÄúF±..Õ...F±.^±áv.Ï.8.u. 0000E0
8A260676 C4FE5E88 000EE903 75020215 87F6FF2A 188A2606 76C4FE5E 880038E9 Õ8..^±áv.&..*.-....u.Õ...^±áv.&. 000100
76C4FE5E 88FF86E9 0088260A 76C4FE5E 88008A26 0676C4FE 5E880009 E9202C00 ., Õ...^±áv.&...^±áv.&..ÕÑ..^±áv 000120
0000FE46 C70001FA 46C7D88E 00F5881E 56570003 3EC8C8C9 5F5E1F00 00C6260A .&ó...^_èùà>..WV.¡%..ÄúF*..úF±.. 000140
C3E986ED 880006E9 03750000 3D0000FF FF9A5016 FEDE868D 146A0E76 FF1076FF .v..v.j...ß±.P.....=..u.Õ..¡Ù.Õù 000160
86800A76 FF0676FF 0876FF08 C48301F5 00E09A50 16FEDE86 805016FD DA868001 ...Õ».P..ß±.P.Ù.%..á..v..v..v... 000180
02A79A00 6A006A00 6A006A01 6E680C76 FF0676FF 0876FF00 00FFFF9A 5016FDDA Õ».P......v..v..v.hn.j.j.j.j..Ï. 0001A0
FF1076FF 0180681E 5016FEF8 86800000 FFFF9A50 16FEF286 805016FC 46800000 ...F=.P..·±.P.......½±.P.h...v.. 0001C0
```

```
FCC2868D 106A5016 F8468D50 16FEF886 8DFFFFF8 46C70CC4 83FFFF00 009A0E76 v.......å.úF%....½±.P.F%.Pj...ô• 0001E0

Dump of file SATURN:[PCCOMMON.DUMP.DLL]SA-XPORT.DLL;1 on 18-APR-1990 08:23:46.62
File ID (460,18,0)   End of file block 63 / Allocated 64

Virtual block number 16 (00000010), 512 (0200) bytes

FCD9868D 0098E903 7500FA7E 83000000 CC9A006A 006A5016 FA468001 17685016 .Ph...F*.Pj.j..ä....-*.u.Õ....1• 000000
EA9AFEDA B6FFFEDC B6FF0184 681E0069 E9037510 FCD686F6 FEDC968C FEDA8689 ..Ö±..É±-.ø•.u.Õi..h...ÑÉ±.ÑÖ±.ð 000020
83028801 EA9AFEDA B6FFFEDC B6FF0187 681E0040 E9037500 003D08C4 83026001 .m..å.=..u.ÕM..h...ÑÉ±.ÑÖ±.ð.... 000040
08C48303 3101B49A 5016FDDA 868DFEDA B6FFFEDC B6FF0031 E9037500 003D08C4 å.=..u.Õ1..ÑÉ±.ÑÖ±..Ö».P.Ç.1..å. 000060
868DF876 FF000002 EE9A5016 FD0A868D FE6A006A 0161680C 76FF0676 FF0876FF .v..v..v.hø.j.j±..Ö».P.Ÿ....v½.. 000080
260E5EC4 0000FFFF 9AF876FF FF5FE900 00FFFF9A 5016FA46 8D011768 5016FCC2 ô•.Ph...F*.P.....Õ_..v½.....å^.& 0000A0
034D9A01 89681E00 6A006A01 61680C76 FF0676FF 0876FF00 19E90375 00037F80 ....u.Õ...v..v..v.ħø.j.j..h...M. 0000C0
0044E903 765AFEF6 BE80FEF2 9ED1FEF4 AED1FEF6 86FE000C E941FEF6 86C60000 ..ó.-±AÕ..±.-±lÚ¶±l..±.ƒ-±Zv.ÕD. 0000E0
689A5016 FD0A868D 018C681E 50E42AFE F6868A00 34E90374 013C0124 FEF2868A ..·±$.<.t.Õ4...-±*ÕP.h....Ö».P.h 000100
00FFFF9A 5016FD0A 868DFF6A 006A0161 680C76FF 0676FF08 76FF0AC4 83002602 .&..å..v..v..v.hø.j.j...Ö».P.... 000120
0676FF08 76FF0001 FC46C7D8 8E0162B8 1E565700 0320C8CB C95F5E1F FFA6E900 .Õl..^_èùà ..WV.¦b..ÅúF•...v..v. 000140
6A006A01 6E680C76 FF0676FF 0876FF00 00FFFF9A 5016FCE0 868D0100 680A76FF .v.h....Å•.P......v..v..v.hn.j.j 000160
5016FCE0 868D1276 FF1476FF 0028E903 7400FCE0 8E800000 045D9A00 6A006A00 .j.j..]..../Å•.t.Õ(..v..v...Å•.P 000180
FDE0868D 000001B5 9A5016FC E0868D0A 76FF0676 FF0876FF 08C48302 5101B49A .Ç.Q..å..v..v..v...Å•.P.ç.....Å» 0001A0
16FDE086 8DFFFFFE 46C70CC4 8301A000 009A0E76 FF1076FF 5016FCE0 86805016 .P..Å•.P.v..v.......å.úF±....Å». 0001C0
83000002 1F9A006A 006A5016 FC468D01 17685016 FEE0868D 176A5016 FE468D50 P.F±.Pj...Å±.Ph...F•.Pj.j....... 0001E0

Dump of file SATURN:[PCCOMMON.DUMP.DLL]SA-XPORT.DLL;1 on 18-APR-1990 08:23:46.62
File ID (460,18,0)   End of file block 63 / Allocated 64

Virtual block number 17 (00000011), 512 (0200) bytes

F85EC400 34E90374 1111FEF4 86F7FA56 8CF84689 FEF7868D 0062E903 7500FC7E ~•.u.Õb...¼±.F%.V*%.¶±..t.Õ4.å^% 000000
680C76FF 0676FF08 76FF001B E9037500 017F8026 F85EC400 0DE90374 2E3F8026 &.?.t.Õ..å^%&....u.Õ...v..v..v.h 000020
FC468001 17685016 FEE0868D FE76FF00 0001CE9A F876FFFA 76FFFE6A 006A0161 ø.j.j±.v*.v½.ö....v±..Å±.Ph...F• 000040
61B81E56 57000164 CBCBC95F 5E1F0000 02C89AFE 76FFFF95 E9000002 8D9A5016 .P.§...Õ...v±.à....^_èùàd..WV.¦ø 000060
FF0E76FF 3F6A0017 E90374D0 0B06C483 04B5036C 9A0C76FF 0E76FF2A 6AD88E03 ..Äj*.v..v..l.ç..å..Ãt.Õ..j?.v.. 000080
8904C483 04E10096 9A0C76FF 0E76FF00 11E90375 D00B06C4 8304F903 6C9A0C76 v..l.*..å..Åu.Õ...v..v....Å..å.. 0000A0
0192681E 00B1E90A 468808C4 8303E100 ED9A0C76 FF0E76FF 5016FE9C 868D0A46 F....±.P.v..v..Ú.Å..å..F.ÕŸ..h.. 0000C0
76FF5016 FE9C868D 0676FF08 76FF016A 006A08C4 83053001 6E9A5016 FE9C868D ...±.P.n.0..å.j.j..v..v....±.P.v 0000E0
016E9A50 16FE9C86 8D01A768 1E008DE9 0015B800 0005509A 206A006A 1076FF12 ..v.j.j .P...¡..Õ§..hÎ....±.P.n. 000100
9A206A00 6A1076FF 1276FF50 16FE9C86 8D0676FF 0876FF01 6A006A08 C4830565 e..å.j.j..v..v....±.P.v..v.j.j . 000120
17E90374 D00B06C4 83057C03 6C9A0C76 FF0E76FF 2A6A0086 E9001588 0000FFFF ....¡..Õ..j*.v..v..l.|..å..Ãt.Õ. 000140
01B80052 E90000B8 0006E903 75000B06 C4830383 036C9A0C 76FF0E76 FF3F6A00 .j?.v..v..l.*..å..Åu.Õ..¡..ÕR.¡. 000160
E9037500 02300013 E90376FF 85E90375 00123000 43E90046 E90A468B 004CE900 .ÕL..F.ÕF.ÕC.=..u.Õç.v.Õ..=..u.Õ 000180
00CE30FF 1FE90375 006B30FF 27E90375 00153DFF D7E9FF32 E9037500 033DFFA8 ´.=..u.Õ2.Õø.=..u.Õ'.=k.u.Õ..=ö. 0001A0
8E048FB8 1E565700 036AC8CB C95F5E1F FFB4E9FF 46E90375 000030FF 4EE90375 u.ÕN.=Å.u.ÕF.ÕÇ..^_èùàj..WV.¡... 0001C0
006AFC56 89FA4689 08568806 4688004A E90E468B FC9C8689 FC9E8689 00008808 Ä¡.....•...•.F.ÕJ..F..V..F*.V•j. 0001E0

Dump of file SATURN:[PCCOMMON.DUMP.DLL]SA-XPORT.DLL;1 on 18-APR-1990 08:23:46.62
File ID (460,18,0)   End of file block 63 / Allocated 64

Virtual block number 18 (00000012), 512 (0200) bytes

00FFFF9A 1076FF12 76FF0000 07069A50 52000006 FF9A006A 036A016A 006A016A j.j.j.j.j......RP......v..v..... 000000
FA468801 F6681076 FF1276FF 0000FFFF 9A0676FF 0876FF00 6A1076FF 1276FF00 ..v..v.j..v..v.......v..v.h-..F* 000020
76FF01F8 6801FC68 5052002F 05FC5688 FA468800 0003C89A 50520130 05FC5688 .V•.0.RP.à....F*.V•./.RPh•.h%..v 000040
002F05FC 5688FA46 88505201 3005FC56 88FA4688 0CC48306 A1015A9A 1076FF12 ..v..Z.Å..å..F*.V•.0.RP.F*.V•./. 000060
6801F668 1076FF12 76FF10C4 8304CA03 599A1076 FF1276FF 01F66801 FA685052 RPh*.h-..v..v..Y.ò..å..v..v.h-.h 000080
016A006A 01256801 FE681076 FF1276FF 00000605 9A006A00 6A010068 006A0143 C.j.h..j.j..f....v..v.h±.h%.j.j. 0000A0
03969A00 6A006A01 6A006A01 25680202 681076FF 1276FF00 0006EE9A 006A006A j.j..Ÿ....v..v.h..h%.j.j.j.j.... 0000C0
6A006A0C 6AE90000 FFFF9A50 520000FF FF9A006A 016A016A 006A016A 006A0000 ..j.j.j.j.j.j......RP.....Õj.j.j 0000E0
1276FF01 6A006A00 00FFFF9A 5016A646 8D506A00 FE680200 36FF261C 50068E00 ...P.&.6..h±.jP.FÎ.P.....j.j..v. 000100
206A1076 FF1276FF 0C2FE900 0005199A 206A006A 006A006A 5016A646 8D1076FF .v..FÎ.Pj.j.j.j .....Õ/..v..v.j 000120
000AE903 7501FCA4 7E81A446 890A4688 0C17E900 000A889A 016A006A 026A006A j.j.j.j......Õ...F..FÊ.~Ê•.u.Õ.. 000140
1276FFFC 5689FA46 890000FF FF9A006A 1076FF12 76FF0054 E9037401 FAA47E81 .~Ê*.t.ÕÎ..v..v.j.......F*.V•.v. 000160
FF1076FF 1276FFFE 46890000 07CA9A00 6A006A00 6A006A01 6568A476 FF1076FF .v..vÊhe.j.j.j.j..ò....F±.v..v.. 000180
46880000 0A269A50 16FEA286 8D505201 00CA8100 0000D228 FE468801 6868A476 vÊhh..F±+@....ò..RP..Å±.P.&....F 0001A0
0015E903 745BFEA2 BE8002DE E90003E9 037505A2 7E83A246 890C4688 02DDE9A4 ÊÕi..F..FÅ.~Å.u.Õ..Õ8../Å±[t.Õ.. 0001C0
```

```
 5052002F 05FC5688 FA468800 FEA486C6 FEA38688 FEA4868A FEA28688 FEA3868A ..Èt..Àt..Ét..Ètó.Ét..F'.V=./.RP 0001E0

Dump of file SATURN:[PCCOMMON.DUMP.DLL]SA-XPORT.DLL;1 on 18-APR-1990 08:23:46.62
File ID (460,18,0)   End of file block 63 / Allocated 64

Virtual block number 19 (00000013), 512 (0200) bytes

 5016FEA2 868DF846 89000009 0D9A5016 FCA0868D 5016FDA2 868D5016 FEA2868D ..Àt.P..À».P...=.P......F½..Àt.P 000000
 76FF5016 FEA2868D 01C0681E 0CC48308 5A00009A 5016FDA2 868D5016 FCA0868D ...=.P..À».P...Z..á..há...Àt.P.v 000020
 FF016A00 6A001CE9 037500F8 7E83F846 890EC483 08D30487 9A1076FF 1276FFF8 ½.v..v....£..á..F½.-½.u.Õ..j.j.. 000040
 FA468850 16FDA286 8D0230E9 00000A3F 9A505200 000A389A 01F66810 76FF1276 v..v.h-..8...RP.?...Õ=...À».P.F' 000060
 05FC5688 FA468801 F8681076 FF1276FF 08C48309 7201B49A 5052002F 05FC5688 .V=./.RP.Ç.r..á..v..v.h½..F'.V=. 000080
 1076FF12 76FF01F8 6801FC68 5052002F 05FC5688 FA468800 0009AD9A 5052002F /.RP.Ù....F'.V=./.RPh=.h½..v..v. 0000A0
 88000003 7D9A5016 FEA2868D 01006801 F6681076 FF1276FF 0CC48309 29015A9A .Z.)..á..v..v.h-.h....Àt.P.).... 0000C0
 00FFFF9A 5016FCA0 868D5016 FDA2868D 5016FEA2 868D5052 002F05FC 5688FA46 F'.V=./.RP..Àt.P..À».P...=.P.... 0000E0
 681E0CC4 83094400 009A5016 FDA2868D 5016FCA0 868D5016 FEA2868D F8468900 ..F½..Àt.P...=.P..À».P...D..á..h 000100
 00F87E83 F846890E C48309C8 04879A10 76FF1276 FFF876FF 5016FEA2 868D01C7 ú...Àt.P.v½.v..v....ù..á..F½.-½. 000120
 9A505200 2F05FC56 88FA4688 5016FDA2 868D0083 E9037401 F87E8300 09E90375 u.Õ...-½.t.Õ°...À».P.F'.V=./.RP. 000140
 5052002F 05FC5688 FA468850 16FDA286 8D0051E9 03750000 3D08C483 099301EA õ....á.=..u.ÕQ...À».P.F'.V=./.RP 000160
 0009E09A 5052002F 05FC5688 FA468801 F8681076 FF1276FF 08C48304 9E01B49A .Ç....á..v..v.h½..F'.V=./.RP.À.. 000180
 0CC4830A 09015A9A 1076FF12 76FF01F8 6801FC68 5052002F 05FC5688 FA468800 ..F'.V=./.RPh=.h½..v..v..Z....á. 0001A0
 88505201 3005FC56 88FA4688 00000A5F 9A5016FC A0868D01 F6681076 FF1276FF .v..v.h-....=.P._....F'.V=.0.RP. 0001C0
 35E910C4 83067703 599A1076 FF1276FF 01F66801 FA685052 002F05FC 5688FA46 F'.V=./.RPh'.h-..v..v..Y.w..á.Õ5 0001E0

Dump of file SATURN:[PCCOMMON.DUMP.DLL]SA-XPORT.DLL;1 on 18-APR-1990 08:23:46.62
File ID (460,18,0)   End of file block 63 / Allocated 64

Virtual block number 20 (00000014), 512 (0200) bytes

 76FF016A 006A000U 068C9A00 6A006A00 6A006A01 6E6801FA 681076FF 1276FF00 ..v..v.h'.hn.j.j.j.j..¥...j.j..v 000000
 FF0049E9 0C468800 78E9007E E90000FF FF9A5052 0000FFFF 9A01F668 1076FF12 ..v.h-......RP.....Õ~.Õ(..F.ÕI.. 000020
 8D01F668 1076FF12 76FF0045 E900000A 769A5016 FEA2868D 01F66810 76FF1276 v..v.h-...Àt.P.v...ÕE..v..v.h-.. 000040
 E90000FF FF9A016A 006A016A 006A206A 1076FF12 76FF0000 06599A50 16FEA286 .Àt.P.Y....v..v.j j.j.j.j......Õ 000060
 13E90016 E9FFE7E9 FF8EE903 75000530 FFAFE903 75000130 0013E900 16E90019 ..Õ..Õ..=..u.Õ£.=..u.Õf.ÕÕ.Õ..Õ. 000080
 6A006A08 3EE90A46 880880E9 0000E9FD 13E90375 01FC3DFF 90E90375 01FA3000 .='.u.Õ..=•.u.Õ.»Õ..Õ¯..F.Õ>.j.j 0000A0
 1276FF01 6A006A00 000C889A 5016A646 8D506A00 FE680200 36FF261C 50068E00 ...P.&.6..ht.jP.Fl.P.j...j.j..v. 0000C0
 006A1076 FF1276FF 081EE900 0000189A 206A006A 006A006A 5016A646 8D1076FF .v..Fl.Pj.j.j.j .....Õ...v..v.j. 0000E0
 08EB9A50 16FEA286 8D010068 01F66810 76FF1276 FFFC5689 FA468900 0007839A ......F'.V=.v..v.h-.h....Àt.P.S. 000100
 9A5016FC A0868D50 16FDA286 8D5016FE A2868D50 52002F05 FC5688FA 46880000 ...F'.V=./.RP..Àt.P..À».P...=.P. 000120
 C4830887 00009A50 16FDA286 8D5016FC A0868D50 16FEA286 8DF84689 00000823 #....F½..Àt.P...=.P..À».P......á 000140
 88F84689 0EC48308 CF04879A 1076FF12 76FFF876 FF5016FE A2868D01 CE681E0C ..hö...Àt.P.v½.v..v....ü..á..F½. 000160
 03E90000 00349A50 52000000 209A01F6 681076FF 1276FF01 6A006A07 05E9F846 F%Õ..j.j..v..v.h-..-...RP.4...Õ. 000180
 3F00ED9A 5016FEA2 868D5052 023105FC 5688FA46 88000103 3287C726 FA5EC407 .á^'&ú.2....F'.V=.1.RP..Àt.P.Ú.? 0001A0
 C4033487 8926FA5E C4033887 8926FA5E C4033A87 89260000 88FA5EC4 08C48308 ..á.á^'j..&..:.á^'&..8.á^'&..4.á 0001C0
 00000C36 9A006A00 5A006A00 6A012468 01FE6810 76FF1276 FF033687 8926FA5E ^'&..6..v..v.ht.h$.j.j.j.j..6... 0001E0

Dump of file SATURN.[PCCOMMON.DUMP.DLL]SA-XPORT.DLL;1 on 18-APR-1990 08:23:46.62
File ID (460,18,0)   End of file block 63 / Allocated 64

Virtual block number 21 (00000015), 512 (0200) bytes

 6A006A01 246801FF 681076FF 1276FF00 01033687 C726FA5E C4000AE9 0375D008 .Àu.Õ..á^'&ú.6....v..v.h..h$.j.j 000000
 76FF1276 FF000103 3487C726 FA5EC400 0AE90375 D0080000 0C609A00 6A006A00 .j.j..'....Àu.Õ..á^'&ú.4....v..v 000020
 C726FA5E C4000AE9 0375D008 00000C8A 9A006A00 6A006A00 6A012468 02016810 .h..h$.j.j.j.j.......Àu.Õ..á^'&ú 000040
 D0080000 07A29A00 6A006A00 6A006A01 24680202 681076FF 1276FF00 01033A87 .:....v..v.h..h$.j.j.j.j..À....À 000060
 6A010568 020036FF 261C5006 8E006A00 6A000103 3887C726 FA5EC400 0AE90375 u.Õ..á^'&ú.8...j.j...P.&.6..h..j 000080
 C48304C 036C9A50 52023105 FC5688FA 46882E6A 00000CFE 9A5016FC 96868D05 ....=.P.t...j..F'.V=.1.RP.l.L..á 0000A0
 FF261C50 068E006A 006A0055 E90374FC 9E8608FC 9C8688FC 9E9689FC 9C868906 ....=...=...=...=t.ÕU.j.j...P.&. 0000C0
 6A5016A6 4680016A 006A016A 006A0000 0D719A50 16A6468D 506A010A 68020036 6..h..jP.Fl.P.q...j.j.j.j..Fl.Pj 0000E0
 0000A09A 01F66810 76FF1276 FF016A00 6AA24689 0000008B 9A206A00 6A006A00 .j.j.j ......FÀj.j..v..v.h-..... 000100
 C4830E59 01EA9A50 16FC9686 8DFC9CB6 FFFC9EB6 FF0579E9 000000A7 9A505200 .RP.Ì...Õy..Ñ.=.Ñ.=....=.P.õ.Y..á 000120
 5016A646 8D506A01 0A680200 36FF261C 50068E00 6A006A00 55E90375 00003D08 .=..u.ÕU.j.j...P.&.6..h..jP.Fl.P 000140
 8900000D FC9A206A 006A006A 006A5016 A6468001 6A006A01 6A006A00 000DE29A .ã...j.j.j.j..Fl.Pj.j.j.j .=.... 000160
 5EC40506 E900000E 159A5052 00000E0E 9A01F668 1076FF12 76FF016A 006AA246 FÀj.j..v..v.h-......RP.....Õ..á^ 000180
 068E006A 006A0052 E9037400 0334BF83 26FA5EC4 0060E903 74000336 8F8326FA '&.«6..t.Õ'.á^'&.«4..t.ÕR.j.j... 0001A0
 4680016A 006A016A 006A0000 07259A50 16A6468D 506A00FC 68020036 FF261C50 P.&.6..h=.jP.Fl.P.X...j.j.j.j..F 0001C0
```

```
08799A01 F6681076 FF1276FF 016A006A 00000741 9A206A00 6A006A00 6A5016A6 Ì.Pj.j.j.j .A...j.j..v..v.h-..y. 0001E0

Dump of file SATURN:[PCCOMMON.DUMP.DLL]SA-XPORT.DLL;1 on 18-APR-1990 08:23:46.62
File ID (460,18,0)   End of file block 63 / Allocated 64

Virtual block number 22 (00000016), 512 (0200) bytes

9A505200 0006189A 006A016A 016A006A 016A006A 0498E900 0008809A 50520000 ..RP.....Ö..j.j.j.j.j.j......RP. 000000
3F6A002E E903.500 FCA08E80 0470E900 00FFFF9A 016A1076 FF1276FF 00000622 ".....v..v.j......Öp../.•.u.Ö..j? 000020
036C9A50 16FCA086 8D2A6A00 17E90374 D00806C4 830E7003 6C9A5016 FCA0868D ...•.P.l.p..á..Ät.Ö..j"...•.P.l. 000040
2F05FC56 88FA4688 5016FDA2 86800000 FDA086C7 0118E903 75D00806 C4830898 ...á..Äu.Ö..ú..»....Å».P.F".V•./ 000060
05FC5688 FA468850 16FDA286 8D0060E9 03750000 3008C483 0E8701EA 9A505200 .RP.ö.ñ..á.=..u.Ö'...Å».P.F".V=. 000080
08C4830E FE00ED9A 5016FDA2 86805016 FEA2868D 08C4830F 2101849A 5052002F /.RP.Ç.I..á...Ä±.P..Å».P.Ü.±..á. 0000A0
68505200 2F05FC56 88FA4688 00000885 9A5016FE A2868D01 F8681076 FF1276FF .v..v.h½...Ä±.P.ç....F".V=./.RPh 0000C0
FA468800 19E90374 00FCA08E 800CC483 086C015A 9A1076FF 1276FF01 F86801FC •.h½..v..v..Z.l..á../.•.t.Ö...F" 0000E0
FCA0868D 5016FL 2 868D08C4 830CCC01 849A5016 FCA08680 50520130 05FC5688 .V=.0.RP...•.P.Ç.ü..á...Ä±.P...• 000100
46880000 0EE09A.J 16FEA286 8001F668 1076FF12 76FF08C4 830F7300 ED9A5016 .P.Ü.s..á..v..v.h-...Ä±.P.Å....F 000120
1076FF12 76FF01F6 6801FA68 5052002F 05FC5688 FA468850 52013005 FC5688FA ".V=.0.RP.F".V=./.RPh".h-..v..v. 000140
00115F9A 50520000 11589A01 F6681076 FF1276FF 016A006A 10C4830F A203599A .Y.Å..á.j.j..v..v.h-..X...RP. .. 000160
5016A646 8D010568 1E08C483 0FFA00E0 9A5016FE A2868D50 16A64680 0320E900 .Ö ..FÌ.P..Ä±.P.Ü."..á..hí..FÌ.P 000180
9A116A00 6A01FA68 1E5016A6 46801076 FF1276FF 016A006A 08C48310 F7016E9A .n.X..á.j.j..v..v..FÌ.P.h".j.j.. 0001A0
52023105 FC5688FA 46880002 033287C7 26FA5EC4 0293E903 74000130 00001143 C...=..t.Ö..á^"&ú.2....F".V=.1.R 0001C0
878926FA 5EC4033A 87892600 0088FA5E C408C483 0EC800ED 9A5016FE A2868D50 P..Ä±.P.Ü.ù..á.á^"j..&..:.á^"&.. 0001E0

Dump of file SATURN:[PCCOMMON.DUMP.DLL]SA-XPORT.DLL;1 on 18-APR-1990 08:23:46.62
File ID (460,18,0)   End of file block 63 / Allocated 64

Virtual block number 23 (00000017), 512 (0200) bytes

006A0124 6801FE68 1076FF12 76FF0336 878926FA 5EC40334 878926FA 5EC40338 8.á^"&..4.á^"&..6..v..v.h±.h$.j. 000000
FF1276FF 00010336 87C726FA 5EC4000A E9037500 08000010 619A006A 006A006A j.j.j..•....Äu.Ö..á^"&ú.6....v.. 000020
26FA5EC4 000AE90' 75000800 0010889A 006A006A 006A006A 01246801 FF681076 v.h..h$.j.j.j.j.......Äu.Ö..á^"& 000040
08000010 859A006A 006A006A 006A0124 68020168 1076FF12 76FF0001 033487C7 ú.4....v..v.h..h$.j.j.j.j..ç.... 000060
006A006A 01246802 02681076 FF1276FF 0001033A 87C726FA 5EC4000A E9037500 Äu.Ö..á^"&ú.:....v..v.h..h$.j.j. 000080
068E006A 006A0001 033887C7 26FA5EC4 000AE903 75000800 000C0C9A 006A006A j.j.......Äu.Ö..á^"&ú.8...j.j... 0000A0
05FC5688 FA46882E 6A000011 299A5016 FC96868D 056A0105 68020036 FF261C50 P.&.6..h..j....•.P.)...j..F".V•. 0000C0
55E90374 FC9E8608 FC9C8688 FC9E9689 FC9C8689 06C48311 77036C9A 50520231 1.RP.l.w..á....•...•...•...•t.ÖU 0000E0
6A006A00 00119C9A 5016A646 8D506A01 0A680200 36FF261C 50068E00 6A006A00 .j.j...P.&.6..h..jP.FÌ.P.....j.j 000100
76FF016A 006AA246 89000011 869A206A 006A006A 006A5016 A6468001 6A006A01 .j.j..FÌ.Pj.j.j.j .Ñ....FÅj.j..v 000120
868DFC9C 86FFFC9E 86FF014E E9000011 D29A5052 000011C8 9A01F668 1076FF12 ..v.h-..ù...RP.Ð...ÖN..Ñ.=.Ñ.=.. 000140
0036FF26 1C50068E 006A006A 0055E903 7500003D 08C4830E 9601EA9A 5016FC96 .=.P.ö....á.=..u.ÖU.j.j...P.&.6. 000160
6A006A50 16A6468D 016A006A 016A006A 00001200 9A5016A6 468D506A 010A6802 .h..jP.FÌ.P.....j.j.j.j..FÌ.Pj.j 000180
52000012 399A01F6 681076FF 1276FF01 6A006AA2 46890000 12279A20 6A006A00 .j.j .'....FÅj.j..v..v.h-..9...R 0001A0
0003348F 8326FA5E C40060E9 03740003 368F8326 FA5EC400 0BE90000 12409A50 P.ə...ÖU.á^"&.«6..t.Ö'.á^"&.«4.. 0001C0
000AE59A 5016A646 8D506A00 FC680200 36FF261C 50068E00 6A006A00 52E90374 t.ÖR.j.j...P.&.6..h•.jP.FÌ.P.Í.. 0001E0

Dump of file SATURN:[PCCOMMON.DUMP.DLL]SA-XPORT.DLL;1 on 18-APR-1990 08:23:46.62
File ID (460,18,0)   End of file block 63 / Allocated 64

Virtual block number 24 (00000018), 512 (0200) bytes

FF016A00 6A000008 019A206A 006A006A 006A5016 A6468D01 6A006A01 6A006A00 .j.j.j.j..FÌ.Pj.j.j.j .....j.j.. 000000
6A016A00 6A016A00 6A0060E9 00001284 9A505200 00127D9A 01F66810 76FF1276 v..v.h-..)...RP.....Öm.j.j.j.j.j 000020
6A0019E9 00000E3D 9A016A10 76FF1276 FF00000E 309A5052 00000E29 9A006A01 .j..)...RP.0....v..v.j..=...Ö..j 000040
FFBA86E8 880029E9 000008AA 9A505200 0008A39A 01F66810 76FF1276 FF016A00 .j..v..v.h-..Ê...RP.ˆ...Ö).¡Š.ᴑ. 000060
E4E90375 001530F9 08E90375 000130F8 A3E90375 C008001A E9001DE9 00ECE9FF .Ö±.Ö..Ö...âu.ÖÊ«=..u.Ö.'=..u.ÖÖ 000080
87C626FA 5EC4FC56 89FA4689 00000811 9A006A10 76FF1276 FF006FE9 FFD7E9F8 ½Ö■.Öo..v..v.j.......F".V=á^"&6. 0000A0
50520000 12549A00 6A016A01 6A006A01 6A006A00 03033287 C726FA5E C4000231 1..á^"&ú.2...j.j.j.j.j.j..T...RP 0000C0
03750001 30001BE9 001EE900 21E90000 12689A02 6A1076FF 1276FF00 0012589A .(....v..v.j..h...Öl.Ö..Ö..=..u. 0000E0
FF1076FF 1276FF00 4EE9FFDF E9F7AAE9 03750203 30FF9CE9 03750002 30F7F5E9 Ö½½=..u.Ö..=..u.Ö`½ÖÖ.ÖN..v..v.. 000100
75002030 002BE900 2EE9003A E90000FF FF9A0676 FF0876FF 0A76FF0C 76FF0E76 v..v..v..v..v......Ö:.Ö..Ö+.= .u 000120
75003830 F3F4E903 7.003030 F3E4E903 75002930 F3B1E903 7500223D F773E903 .Ös½=".u.ÖŸµ=).u.Ööµ=0.u.Ö¶µ=;.u 000140
EDB81E56 57000144 C8000ECA C95F5E1F 0000E900 008A0000 88FFB2E9 , °EE903 .Ö. Öÿ.¡..ᴑ..Ö...^_èò..àO..WV.¡Ü 000160
0000FFFF 9A5016FE BE868009 6A0676FF 0000FFFF 9A5016F0 46800676 FFL '8E05 ..Ä.v..FÞ.P......v.j.../±.P..... 000180
037500FE BCBE83FE BC868900 00FFFF9A 5016E246 8D5016FE BE868006 76FF796A j..v.../±.P.Fã.P.......¥±./¥±.u. 0001A0
BE83FEBC 86890000 FFFF9A50 16FC468D E276FFE4 76FF024A E9FEBC86 880007E9 Ö....¥±ÖJ..vö.vã.F•.P.......¥±.ƒ 0001C0
```

```
002F050A 56880846 88002F47 C626085E C40225E9 FE8C8688 0007E903 7500FE8C .¥±.u.Õ....¥±ÕX.á^.&6G/..F..V../. 0001E0

Dump of file SATURN:[PCCOMMON.DUMP.DLL]SA-XPORT.DLL;1 on 18-APR-1990 08:23:46.62
File ID (460,18,0)   End of file block 63 / Allocated 64

Virtual block number 25 (00000019), 512 (0200) bytes

88084688 0113EV03 7410F446 F6EE4689 00001401 9A006A00 6A5016F4 46805052 RP.F¶.Pj.j..I....FŸ-F¶.t.Õ...F.. 000000
F8468D00 58E90375 00FE8C8E 83FE8C86 890000FF FF9A0101 68505200 2F050A56 V../.RPh.........¥±./¥±.u.ÕX..F% 000020
3A3047C6 26085EC4 2F478826 4004F846 8A085EC4 000014F5 9A5016E6 46805016 .P.F|.P.%...á^..F%.@&.G/á^.&6G0: 000040
9A5016FA 46805052 0032050A 56880846 88006A01 00FA46C7 5C3147C6 26085EC4 á^.&6G1\úF*..j..F..V..2.RP.F*.P. 000060
050A5688 08468802 01681E00 9AE90182 E986E888 0006E903 7500003D 0000152D -...*..u.Õ..¡Š.Õ..Õ...h...F..V.. 000080
006A006A 5016F446 80505200 2F050A56 88084688 08C48315 51016E9A 5052002F /.RP.n.Q..á..F..V../.RP.F¶.Pj.j. 0000A0
805016F8 46800055 E9037410 F446F600 09E90374 00EE7E83 EE468900 00FFFF9A ......FŸ.-Ÿ.t.Õ..-F¶.t.ÕU..F%.P. 0000C0
085EC43A 3047C626 085EC42F 47882640 04F8468A 085EC400 0001DE9A 5016E646 F|.P.&...á^..F%.@&.G/á^.&6G0:á^. 0000E0
00FFFF9A 5016FA46 80505200 32050A56 88084688 006A0100 FA46C75C 3147C626 &6G1\úF*..j..F..V..2.RP.F*.P.... 000100
849A5052 0130050A 56880846 88020968 1E00E5E9 86E88800 06E90375 00003000 .*..u.Õ..¡Š.Õl..h...F..V..0.RP.Ç 000120
0000F646 C7000303 3287C726 085EC400 00FFFF9A E276FFE4 76FF08C4 83158C01 .¥..á..vÕ.vã.....á^.&ú.2...úF-.. 000140
FF0A76FF 01F46802 0036FF26 1C50068E FFFF680F 3568F076 FFF276FF 016A006A j.j..v·.vÞh5.h....P.&.6..h¶..v.. 000160
31050A56 88084688 0000FFFF 9AEA76FF EC76FFEC 5689EA46 890000FF FF9A0876 v.......Fõ.Vš.vš.võ......F..V..1 000180
E90109B8 002EE903 32878826 085EC408 C48315E9 01849A50 16FEE086 80505202 .RP..Å±.P.Ç.Õ..á.á^.&..2.Õ..¡..Õ 0001A0
24E908C4 830F8301 849A5052 0130050A 56880846 885016FE E0868D00 40E90052 R.Õa...Å±.P.F..V..0.RP.Ç.°..á.Õ$ 0001C0
E9037500 0330FFC8 E9037700 023DFFEF E9037300 01300018 E9002DE9 FFFF8800 .|..Õ-.Õ..=..s.Õy.=..w.Õù.*..u.Õ 0001E0

Dump of file SATURN:[PCCOMMON.DUMP.DLL]SA-XPORT.DLL;1 on 18-APR-1990 08:23:46.62
File ID (460,18,0)   End of file block 63 / Allocated 64

Virtual block number 26 (0000001A), 512 (0200) bytes

15500203 002390C8 C95F5E1F 0000E900 0088FF4D E9037501 F67E83FF DCE9FF8A α.ÕÉ..~-.u.ÕM.|..Õ...^ èù.#...}. 000000
15930103 00E10006 13E60203 00050001 14900203 00000003 15780002 00040006 ..å...(...............T...Ä..... 000020
10370103 007E0003 12*E0103 007C0003 15A40103 00000005 14870002 007A0003 ..z...ñ........Ê...|...z...~...7. 000040
082E0103 00860003 0F4A0103 00000007 138F0002 010F0007 06200203 0^7F0003 ......·...Õ...........J......... 000060
0F860103 01EF0007 017F0203 00880003 0FD00103 00780005 139C0203 008 0003 ..........x...Å...........ÿ...... 000080
12C00103 01FF0007 08500203 001E0003 06400103 00900003 10E30103 0013 003 ......D.......ə.......P.......å. 0000A0
133F0103 020F0007 14380203 05E50003 157E0005 02F1000A 13AC0203 001F0003 ......¯...þ...~...ı...;.......?. 0000C0
14580103 00410002 04730103 00400002 04080103 003F0002 047E0103 00830003 ..°...~...?.......ə...s...A...X. 0000E0
12EA0103 004D0003 0F8D0103 00450003 07590103 00480002 141C0103 00480002 ..M.......K...Y...E.......M...õ. 000100
00000000 00000000 00000000 00C60006 13C10203 005C0003 12F10103 00580003 ..[...þ...\...è...6............. 000120
00000000 00000000 00000600 02000200 01C80001 881F0200 3E89088E FFFF881E .|...Ä.>...¡..ù................. 000140
830A47F6 26065EC4 FFFF8E56 000012C8 00000000 00000000 00000000 00000000 ..............à...V/..á^.&-G.. 000160
842D0646 88F08804 C483005A 082A9A53 0600ADE9 0374400A 47F62600 87E90375 u.Õñ.&-G.ət.ÕÙ..S.*.Z..á..Þ.F.-Ç 000180
C404C483 006C0558 9A0676FF 0876FFFA 468913AC 87880608 68F9F700 0C899907 ..¿..%*kÄ...¯..F*.v..v..X.l..á.á 0001A0
8D021068 1E617400 FA7E8364 7CC00802 C4830087 138A9A50 E42A0847 8A26065E ^.&.G.*ðP......á..â|d.-*.ta.h... 0001C0
1E13745C FE7F8026 FC5EC4FE 568CFC46 89F2468D 08C48300 A801849A 5016F046 FÞ.P.Ç.¨..á..F·.F•.V±á^=&..±\t.. 0001E0

Dump of file SATURN:[PCCOMMON.DUMP.DLL]SA-XPORT.DLL;1 on 18-APR-1990 08:23:46.62
File ID (460,18,0)   End of file block 63 / Allocated 64

Virtual block number 27 (0000001B), 512 (0200) bytes

FA76FFFC 76FFFE76 FF0A6AFC 4EFF03E8 08C48300 C3016E9A 5016F046 8D021268 h...FÞ.P.n.û..á.Š..N=j..v±.v=.v* 000000
26065EC4 FFFF8E03 74C00804 C483FFFF 17309A50 16F0468D 08C48300 0013849A .Ç.Å..á..FÞ.P.0....á..ât./..á^.& 000020
FE76FF18 74D008FE 5689FC46 89011013 349A0000 04C890C8 C95EC688 000A47C6 6G...ó^èù.à....4....F•.V±.Åt..v± 000040
08C890C8 C999C028 9004E80C C4830034 059E9A06 76FF0876 FF0A76FF 0C76FF50 P.v..v..v..v....4..á.Š..+à.èù.à. 000060
FC76FFF0 8804C483 01520680 9A0676FF 0876FFFC 568CFA46 890E4680 56570000 ..WV.F...F*.V•.v..v..¯.R..á..Þ.v= 000080
560676FF 0876FFF8 880CC483 01630880 9A0676FF 0876FF0A 76FF0C76 FFFA76FF .v*.v..v..v..v..¯.c..á..%.v..v.V 0000A0
AEF2FFFF 89C03306 7EC41EDE 88078BEC 8855CBC9 5F5EC788 06C48300 F107869A ...þ..á..ú^ èùU.š.■.8.á-.3ä¿...Ü 0000C0
740001C6 F706468B FE870846 8ED88EC0 8CF928D1 F7AEF2FF FF890A7E C4FF758D .u.á-.¿...Ü%ì+*.à.Ä.F..±.F.%ó..t 0000E0
880A76C5 1EDE88D7 88EC8855 CB5DC28C 1FFA88F3 88A4F3C9 13A5F3E9 D149A402 .Êl|ÕµÊ.èµÊ.µ.*..ô]ùU.š.■.B.év.. 000100
F3C913A5 F3E9D149 A4027401 A8C78806 7EC4D1F7 AEF2FFFF 89C033C0 8ED88CFE ±.A.à3ä¿...Ü¼ìá-..ú´.t.Êl|ÕµÊ.èµ 000120
F7AEF2FF FF89C033 0A7EC406 76C51EDE 88D788EC 8855CB5D C28C1FFA 88F388A4 Ê.µ.*..ô]ùU.š.■.B.év.á-.3ä¿...Ü% 000140
FF89C033 067EC4D7 88EC8855 00CB5DFA 88F3881F FFFF1DC0 180574A6 F3F928D1 ì+*µ|t..à.....µ.*]ù.U.š.■á-.3ä¿. 000160
884FAEF2 FFFF89C0 33078806 7EC41E56 57EC8855 00C85DFA 88914901 F7AEF2FF .·Ü%ìl..*]ù.U.šWV.á-..■3ä¿...ÜO. 000180
C288AAA4 F3071F06 F388FE88 D9F70E4E 28410175 AEF20E4E 88DF880A 7EC406F7 ¥.á-..Ô.N.·Ùu.A+N.%).±.µ...µÊ´.ô 0001A0
FE568CFC 46890E46 8DFA568C F84689EC 46805657 000016C8 00C85D5F 5E1FC28C .ó.^_]ù.à...WV.Fš.F½.V*.F..F•.V± 0001C0
```

```
47C72602 57892607 89260857 89260647 89260856 88064688 420A47C6 26F85EC4 á^½&óG.B.F..V.&.G.&.W.&..&.W.&úG 0001E0
```

Dump of file SATURN:[PCCOMMON.DUMP.DLL]SA-XPORT.DLL;1 on 18-APR-1990 08:23:46.62
File ID (460,18,0)   End of file block 63 / Allocated 64

Virtual block number 28 (0000001C), 512 (0200) bytes

```
044FFF26 F85EC4F0 880CC483 02D00880 9A53060A 76FF0C76 FFFC76FF 167FFF04 .....v=.v..v..S.¯.Ī..á..Þá^½&.O. 000000
83013603 E29A.06A 53FA76FF 900FE805 88260247 8E2607FF 263F8826 C02A1278 x.*á&.?&..&.G.&..Š...v'Sj..ã.6.. 000020
18035006 2B0257B8 26078826 065EC403 1115889A 000008C8 CBC95F5E C68806C4 á..ó^ èùà........á^.&..&.W.+.P.. 000040
06750008 FE5689FC 468904C4 83033613 D09A5016 F8468DFA 5689F845 89035216 .R..F‰.V'.F‰.P.À.6..á..F=.V±.Àu. 000060
812574C0 0804C483 03501662 9AFC76FF FE76FF37 74000354 3E839045 E899C028 +á.ŠE..>Ī..t7.v±.v=.b.P..á..átX. 000080
C726FC5E C4FE5689 FC468904 C48302B2 13D09A50 16F84680 00FA5683 0E10F846 F‰...V'..F‰.P.À.ý..á..F=.V±á^=&ú 0000A0
8AD9F741 AEF2FFFF 89C0330F 88067EC4 57EC8855 CBC9FE56 88FC4688 00011047 G....F=.V±èUU.&Wá~..Ô3á¿..·ÜA\). 0000C0
0C4E88EC 885500C8 50E5885F C28CC788 C78EFF33 04740538 264FAEF2 F8880A46 F..«·ÜO&8.t.3..ú.ú.ô_.Ï)ù.U.ã.N. 0000E0
F3E9D1E0 8A0A4688 D128D187 01030323 08180128 0C74DAF7 D788067E C45738E3 DØWá~..æ½Öt.+1.ÜWE.Ī¯Ī+Ī.F..ÀĪÕµ 000100
08568806 46885FAA F3C913A8 F3E9D1C3 8EFFFFC3 81C38C10 E3D187AA F3C913A8 ¨.èµ¨.ĪD..ú.ú...úĪÕµ¨.èµ´_.F..V. 000120
88F9F700 0CB99907 842DC388 FA4689E4 2A08478A 26085EC4 56570000 08C8CB5D )ùà...WVá^.&.G.*ô.F'.ú·Ç..¿..%'. 000140
8026085E C40F7440 0A47F626 0774830A 47F626F8 468913A8 05E0D1C1 03E0D1C8 àĪÀ.èĪÀ.´..F½&-G..t.&-G.ât.á^.&. 000160
E8000004 47C72620 0A4F8026 0E74010A 47F62608 5EC49001 28E9FFFF .¯?00A4F O. ¡..Õ+..á^.&-G..t.&.O. &úG...$ 000180
C3884C75 0C0A47F6 26FC7689 F0880447 8926C028 EF0A6780 26020A4F 8G.'90E2 ã.&.O..&.g.ÿ+ã&.G..Þ.v=&-G..uL.ü 0001A0
7404880A 7E810775 07C0087E 81377501 13A887F6 06D868F9 F7000C89 990,942D -Ç..¿..%'kÀ.-.´..u7_~.à.u..~...t 0001C0
76FF0C75 C00802C4 8304FE1E 809AFA76 FF0F75FF FF0A7E81 167507CC 087E810E ..~.ä.u..~...u..v'.¯.±..á..àu..v 0001E0
```

Dump of file SATURN:[PCCOMMON.DUMP.DLL]SA-XPORT.DLL;1 on 18-APR-1990 08:23:46.62
File ID (460,18,0)   End of file block 63 / Allocated 64

Virtual block number 29 (0000001D), 512 (0200) bytes

```
68F9F700 0CB99907 B42DC388 1575080A 47F62608 5EC404C4 83145BE8 0876FF0A ..v.Ò(..á.á^.&-G..u..ü-Ç..¿..%'k 000000
26078926 40085788 26064788 26067728 26378826 085E8867 740113A8 87F60608 Å.-.´..tg.^.&.7&+w.&.G.&.W.ã&..& 000020
051C1888 9AFA76FF 0677FF26 5256167E F6080447 89264802 4588F87E 88025789 .W..-½.E.H&.G..-~.VR&.w..v'..... 000040
C483053F 198C9A53 006A006A 026A0F74 201A1387 F6FA5E88 19E8FC46 8908C483 .á..F=Š..^'-... t.j.j.j.S...?..á 000060
EF18889A FA76FF50 1606468D 560001BE 17E80788 2606468A 065FC426 085EC408 .á^.&á_..F.&..Š.ƒ..V.F..P.v'...ÿ 000080
26065EC4 000000C8 CBC95F5E E42A0646 8AFECCE9 0374FC76 39FC4689 08C48302 ..á..F=9v=t.Ôa±.F.*ô^_èùà...á^.& 0000A0
065EC404 C4830495 1D169A06 77FF2608 77FF262E 74080A47 F6263574 830A47F6 -G..t5&-G..t.&.w.&.w.......á.á^. 0000C0
0AC890C8 C9044789 26085789 26064789 26025789 26078926 99C028F7 0A678026 &.g.%+à.&..&.W.&.G.&.W.&.G.èù.à. 0000E0
9000EEE9 99C02813 7400773D 0C740072 30277400 61309807 8A260A5E C4560000 ..Vá^.&...=a.t'=r.t.=w.t.+à.ÕŸ.. 000100
0002C6F7 90F4E801 098E90F1 E802FC46 C60301BE 9022E800 018901FC 46C6F628 +-óF=.¿..$".ƒ..óF=.Šþ.ƒ..§¶.%ó.. 000120
078A2633 74C90837 74003F80 260A5EC4 0A46FF80 FC46C6FE E6830002 CE814375 uC.ö...Ī±óF=..F.á^.&.?.t7.èt3&.. 000140
C6889000 E84000CE 810E75C0 00A9C688 15750074 30137400 62300674 00283098 .=+.t=b.t.=t.u..ó`.àu..ö.ãŠÀ..ó 000160
19CA9A06 76FF0876 FF5601A4 68FE4E89 80E88000 CE8190C4 E8C92805 74C000A9 `.ât.+èŠá..ö..$§.N±hÊ.V.v..v..ò. 000180
2DC38819 AA06FF0A 478826FC 468A0E5E C4FF6AE9 037DC008 FA468908 C4830578 x..á..F'.à).Õj.á^..F=&.G...¯..ü- 0001A0
5E889807 88F85E88 C02AF846 8913A805 E0D1C103 E0D1C888 F9F7000C 899907B4 Ç..¿..%'.àĪÀ.èĪÀ.´..F½*à.^½....^ 0001C0
89260647 89260257 89260789 2699C028 0E5E8800 000447C7 F85E8804 4789260E .&.G..^½úG....^.+á.&..&.W.&.G.&. 0001E0
```

Dump of file SATURN:[PCCOMMON.DUMP.DLL]SA-XPORT.DLL;1 on 18-APR-1990 08:23:46.62
File ID (460,18,0)   End of file block 63 / Allocated 64

Virtual block number 30 (0000001E), 512 (0200) bytes

```
0E7507C0 067E8119 AA06FF56 000004C8 CBC95EC2 8CC38808 478826FA 468A0857 W..F'&.G..û.ô^èùà...V..´..~.à.u. 000000
01FE46C7 2475047D 087E8128 7507CC06 7E8113E8 0000FE46 C7077506 D8087E81 .~.Ã.u.úF±..Š..~.ä.u+.~.).u$úF±. 000020
06740113 A887F606 D868F9F7 000C8999 07842DC3 8815750C 0A47F626 065EC400 .á^.&-G..u..û-Ç..¿..%'kÄ.-.´..t. 000040
8307C31D 289A0200 68147502 44080488 0316C681 02E6C1FE 76889090 7EE8C028 +áŠ-...v±èĪ..ó.....D.u.h...+.û.. 000060
05E0D1C1 03E0D1C8 88F9F700 0CB99907 84200646 88D57400 08025489 048902C4 á....Ī..ÀtĪ.F.-Ç..¿..%'.àĪÀ.èĪÀ. 000080
89260857 89260647 89260318 94880316 848802E6 C1FE7688 065EC4FC 468913A8 ´..F=á^..v±èĪ........&.G.&.W.&. 0000A0
88020A4F 8026065E 881107C6 DE880447 89260244 89020088 FC768802 57892607 .&.W..v=¡...D.&.G..Bó...^.&.O..¡ 0000C0
A805E0D1 C103E0D1 C888F9F7 000C8999 07842D08 46880000 04C890C8 C95E0001 ..^èù.à....F.-Ç..¿..%'.àĪÀ.èĪÀ.´ 0000E0
50E42A08 478A2608 5EC47274 1007F626 FC5EC451 7400067E 83FE5E8C FC468913 .¸F=.^±.-..tOá^=&-..trá^.&.G.*ôP 000100
07C626FC 5EC404C4 83081408 2A9A0876 FF0A76FF 5C74C008 02C48307 D51E809A .¯.Ī..á..ât\.v..v..*....á.á^=&6. 000120
5EC42AE8 08578926 06478926 02578926 07892699 C028085E C4000002 47C72600 .&úG...á^.+à.&..&.W.&.G.&.W.$*á^ 000140
0A76FF08 74C00802 C4830826 1E809A50 E42A0847 8A26085E C4217410 07F626FC =&~..tĪá^.&.G.*ôP.¯.&..á..ât..v. 000160
F6265575 023C0324 0A478A26 065EC4F6 28560000 04C8CBC9 0640082A 9A0876FF .v..*.ã.èùà...V+-á^.&.G.$.<.ɯ&- 000180
07882606 5E883974 0113A887 F6060868 F9F7000C 899907B4 20C38815 75080A47 G..u..û-Ç..¿..%'kÁ.-.´..t9.^.&.. 0001A0
071D1888 9A50E42A 08478A26 0677FF26 0877FF26 50287EC0 08FC4689 06472826 &+G..F=.à-(P&.w.&.w.&.G.*ôP..... 0001C0
```

```
89260857 88260647 8826065E C4FFFFBE 200A4F80 26065EC4 0874FC46 3808C483 .á.;F•t.á^.&.O. /..á^.&.G.&.W.&. 0001E0

Dump of file SATURN:[PCCOMMON.DUMP.DLL]SA-XPORT.DLL;1 on 18-APR-1990 08:23:46.62
File ID (460,18,0)   End of file block 63 / Allocated 64

Virtual block number 31 (0000001F), 512 (0200) bytes

 60A31D66 88087E20 D29A000A 88EC8855 CBC95EC6 88000004 47C72602 57892607 .&.W.&úG....ó^èùW.&|...@ -.¡f.È' 000000
 C71D3816 891D36A3 08568806 46881D52 16891D50 A3105688 0E46881D 621E8C1D ...b..F..V.ÈP...R..F..V.È6...8.ú 000020
 A3C02800 011D5E06 C7030BE9 037425F6 7E80038D E900001D 5A06C700 001D5C06 .\...ú.Z...Ò...—%t.Ò..ú.^...+àÈ 000040
 00201EC6 06C71D4E A31D34A3 103AA31D 54A31D56 A31D3EA3 1058A31D 3CA31D40 a.È<.ÈX.È>.ÈV.ÈT.È:.È4.ÈN.ú.6. . 000060
 FF00752B 3F80260A 5E88903E E800301E C606C70A 46FF4975 30017F80 260A5EC4 á^.&...0uI.F.ú.6.0.$>..^.&.?+u.. 000080
 9014E81D 5406FF1A 75001040 3E830E75 203F8026 9028E800 001D5406 C71D4006 .a.ú.T...$(.&.? u..>a..u...T.$.. 0000A0
 E80E5098 078A260A 5E880A46 FF1D4E06 FFC7752D 3F80260A 5EC400EB 1D3406FF ..4.$.á^.&.?-uú..N..F..^.&...P.Ò 0000C0
 0C56890A 468908C4 8308C7E8 0E1D6468 1E0A76FF 0C76FFD0 75C00802 C4830978 x..á..áu).v..v..hd..Òú..á..F..V. 0000E0
 75301EC6 3E830074 001D4E3E 831D64A3 D8F71064 A11D4E06 FF0C7D00 1D643E83 .>d..)...N.Àd.%ÄÈd..>N..t..>6.0u 000100
 0E1D5E68 1E0A76FF 060A46FF 1D5606FF 20752E3F 80260A5E C400201E C606C706 .ú.6. .á^.&.7.u-..V..F...v..h^.. 000120
 0A5EC41D 560EFF00 011D5E06 C70A7D00 1D5E3E83 0C56890A 468908C4 83087BE8 Ò(..á..F..V..>^..).ú.^.....V.á^. 000140
 3E830002 1D3E06C7 0675006C 302B7400 68304074 004E3D30 74004630 98078A26 &...=F.t==N.ta=h.t+=l.u.ú.>....> 000160
 06C79002 4EE91C75 003F8026 0A5EC40A 46FF0375 4C3F8026 0A5EC409 7500103E >..u.á^.&.?Lu..F.á^.&.?.u.ÒN..ú. 000180
 004530F8 46899807 8A26C8EB 0008103E 06C7D0EB 0010103E 06C7D8EB 0001103E >...$Áú.>...$Áú.>...$à&....F½=E. 0001A0
 91E9037E 78740069 30F84688 20F84683 103C06FF 08750058 30057400 47300A74 t.=G.t.=X.u...<..F½ .F½=i.tx~.Ò. 0001C0
 75021D3E 3E839001 59E90140 E9037500 25300152 E9037E01 3FE90375 00633001 .=c.u.Ò?.~.ÒR.=%.u.Òa.ÒY...>>..u 0001E0

Dump of file SATURN:[PCCOMMON.DUMP.DLL]SA-XPORT.DLL;1 on 18-APR-1990 08:23:46.62
File ID (460,18,0)   End of file block 63 / Allocated 64

Virtual block number 32 (00000020), 512 (0200) bytes

 1D5AA11F C4261D50 1EC40DEB 00000247 C7260789 261D5AA1 1FC4261D 501EC415 .á.P.&á.ÀZ.&..&úG...$.á.P.&á.ÀZ. 000000
 1D361EC4 018DE903 74001D5A 3E830170 E9037500 105C3E83 041D5006 83078926 &....P...>\..u.Òp..>Z..t.Ò§.á.6. 000020
 019EE80E 0A6A0000 1D3406C7 1D5806FF 01ACE9FF FF8801AF E9037520 0A47F626 &-G. u.Ò€.¡..Ò^...X.ú.4...j..Ò.. 000040
 1D3E3E83 0004105E 06C71D56 06FF1D3C 06FF1D3A 06FFF2EB 086A90C3 EB02C483 .á.$ü.j.$...:...<...V.ú.^....>>. 000060
 46891064 A128741D 640639FA 46891D3E A3C02B7A 74011D3E 3E830081 E9037508 .u.Ò...>>..tz+àÈ>..F•9.d.t(Àd..F 000080
 C028027D C0081064 A1051064 2E839090 13E80000 106406C7 0A74001D 4E3E83FA '.>N..t.ú.d...$.....d..Àd..à).+à 0000A0
 227400FA 7E8302C4 830480E8 0E3A6A02 C4830130 E80E106A 021D5006 831064A3 Èd...P..j..ÒO..á.j:.Ò...á..-'.t" 0000C0
 106406C7 9007E81D 64A3C02B 027DC008 1064A300 0520FA46 88157400 104E3E83 .>N..t..F'-..Èd..à).+àÈd.$..ú.d. 0000E0
 006A90FF 3FE9106A FF10E902 10500683 02C48300 F1E80E10 6A041D50 2E830000 ....P..j..Òp..á...P..Ò..j.Ò?..j. 000100
 90FF21E9 0428E80E 256AFF2A E90349E8 0EF876FF F4E8016A 90FF39E9 026EE80E .Òn.Ò9..j.$¶.v%.ÒI.Ò*.jX.Ò(.ÒI.. 000120
 FF0C5688 0A468809 74001D3E 3E830A7E 00673D05 7C00653D FF0CE903 7500643D =d.u.Ò..=e.|.=g.-Ò.>>..t..F..V.. 000140
 E9037500 6F3DFE80 E9037500 6E3D903A E8FE5689 FC468940 0C56880A 46880A4E N..F..V.a.F=.V±$:.=n.u.Ò.±=o.u.Ò 000160
 E8FF79E9 03750078 30FE89E9 03750075 308F7400 7330FEE0 E9037500 7030FEE4 Ò±=p.u.ÒÁ±=s.t.=u.u.Ò¿±=x.u.Òy.$ 000180
 462BC388 EC75253C 0474C00A F6468807 8A26FC5E C4FC46FF 9034EB0A 46FF9081 Ý..F.$4..F•á^•&...F-.àt.<%u$.ú+F 0001A0
 8A260A5E C40C5689 0A4689FE 5688FC46 8806C483 044CE80E 0A76FF0C 76FF500A .P.v..v..ÒL..á..F=.V±.F..V.á^.&. 0001C0
 12C8C8C9 1D5AA1F6 51E90374 200A47F6 261D361E C4FC63E9 0374C00A F6468807 ..F-.át.Òc•á.6.&-G. t.ÒQ±ÀZ.èùà. 0001E0

Dump of file SATURN:[PCCOMMON.DUMP.DLL]SA-XPORT.DLL;1 on 18-APR-1990 08:23:46.62
File ID (460,18,0)   End of file block 63 / Allocated 64

Virtual block number 33 (00000021), 512 (0200) bytes

 021D3E3E 831D5806 FF04740A 067E8300 201EC606 C7067400 1D563E83 56570000 ..WV.>V..t.ú.6. ..-..t...X..>>.. 000000
 E8041D50 0683FE56 89FC4689 02578826 0788261D 501EC419 75101D3E 3E830774 t..>>..u.á.P.&..&.W..F=.V±..P..$ 000020
 88261D50 1EC40EE8 0000FE46 C7FC4689 0788261D 501EC411 74001D58 3E83902C ,..>X..t.á.P.&...F•úF±..$.á.P.&. 000040
 E8064688 0674FE46 08FC4688 0E74001D 343E8302 10500683 FE5689FC 46899907 ...F=.V±..P...>4..t..F=.F±t..F.$ 000060
 7D00FE7E 83317500 10583E83 F45689F2 46891062 16881060 A11EC4A3 C0289003 ..+àÈá.À'...b..F..V¶.>X..u1.-±.) 000080
 46890AF7 00028308 F7FE5688 FC46882D 07C626F2 46FFF25E C41D750A 067E832B +.~..u.á^..F.&6.-.F=.V±%À.@.%Ò.F 0000A0
 FF501E06 76FFFA5E 8CF84689 1D42B800 00F646C7 9006E800 01F646C7 FE5689FC =.V±úF-..$..úF-..¡8..F%.^'.v..P. 0000C0
 83088902 149AF876 FFFA76FF 4574001D 563E830A C4830090 1E149AFC 76FFFE76 v±.v=......á..>V..tE.v'.v%...¿.. 0000E0
 C4F04E88 00001EC4 06C70675 081EC43E 830D7EC9 08F04E89 C82B1D5E 0E8804C4 á...^.+à.Np.è-..>á..u.ú.á....Npá 000100
 EE5E8C1D 3C0E88F0 1E89F446 8CF27E89 F47FC008 49C18847 3005C626 05E8F27E -.$.&6.0G.èI.á.¶.-..F¶.Np..<..^Y 000120
 E375003F 8026F846 FF46202C 80037C61 3C0774C9 08048807 8A26F85E C4F276C5 èv.á^%&.....èt.<a|..., F.F%&.?.uD 000140
 B8057500 F67E8308 741D5406 081D40A1 1475001D 5A3E83EE 5E8EF45E 8CF27689 .v..^¶.^Y.>X..u.Àa...T.t..~-.u.¡ 000160
 018E1874 00067E83 56570000 10C8C8C9 5F5E02C4 8302FFE8 0E50C028 02E80001 ..$.+àP.Ò...á.^_èùà...WV.-..t./. 000180
 501EC413 74081D3E 3E83008F E9021D50 0683FA56 89F84689 10521688 1050A100 .ÀP...R..F%.V'..P..Ò...>>..t.á.P 0001A0
 FA5E8CF8 4689FC46 89078826 10501EC4 10E8FA56 89F84689 02578826 0788261D .&..&.W..F%.V'$.á.P.&...F=.F%.^' 0001C0
```

```
097500FC 7E83900A EB031EB8 1575FA46 08F84688 0E74081D 3E3E8304 1D500683 ..P...>>..t..F%.F*u.¡..$...~=.u. 0001E0

Dump of file SATURN:[PCCOMMON.DUMP.DLL]SA-XPORT.DLL;1 on 18-APR-1990 08:23:46.62
File ID (460,18,0)   End of file block 63 / Allocated 64

Virtual block number 34 (00000022), 512 (0200) bytes

5E0E881C 741D5636 39F62BF4 5689F246 89FA5688 F84688FA 5E8CF846 89032588 ¡X..F%.^*.F%.V*.F .V¶+~96V.t...^ 000000
26F246FF F25EC446 90EDEB10 7ECE3846 1574003F 8026F246 FFF25EC4 900EEB1D .$..á^ .F &.?.t.F;ö~.$Ú.Fá^ .F & 000020
76FFFA76 FF5602C4 830159E8 0E570875 001D4E3E 83FE2B1D 643E88F3 75003F80 .?.uµ.>d.+±.>N..u.W.ÒY..á.V.v*.v 000040
000006C8 90CBC95F 5E02C483 013CE80E 57087400 1D4E3E83 06C48301 83E80EF8 %.Ò°..á..>N..t.W.Ò<..á.^_èù.à... 000060
C02A9003 EB018005 7547067E 83067467 067E83FE 5689FC46 89105216 8B1D50A1 ÀP...R..F•.V±.~.gt..~.Gu.¯.$..*á 000080
5E06C706 75001D5E 3E830074 00FA7E80 00061D5E 06C70675 0010563E 83FA4688 .F*.>V..u.ú.^....~*.t..>^..u.ú.^ 0000A0
1C52068E FC76FFFE 76FF1060 36FF1062 36FF0676 FF1D5E36 FF1D3C36 FF00011D ....6<..6^..v..6b..6'..v±.v•..R. 0000C0
52068E1D 6036FF1D 6236FF14 75001D34 3E831874 00FA7E80 0EC48319 AC1EFF26 &..¯..á..~*.t..>4..u..6b..6'...R 0000E0
8E1D6036 FF1D6236 FF147500 1D5E3E83 1874001D 343E8304 C4831980 1EFF261C .&..¯..á..>4..t..>^..u..6b..6'.. 000100
FF1B741D 5406081D 40A10000 1EC406C7 081D5006 8304C483 19881EFF 261C5206 .R.&..¡..á...P..ú.á...Àª...T.t.. 000120
29E80E50 C02802EB 0001B805 74C00804 C48319BC 1EFF261C 52068EFC 76FFFE76 v±.v•..R.&..V..á..àt.¡..$.+àP.Ò) 000140
37882606 468A1478 044FFF26 1D361EC4 3C75001D 5C3E8356 000000C8 90CBC901 .èù.à...V.>\..u<á.6.&.O.x..F.&.7 000160
754006C4 83107503 E29A0676 FF531D38 36FF10EB E42A0488 2602478E 2607FF26 &..&.G.&..*ô$..68.S.v..ã.u..á.àu 000180
06768857 75001D5C 3E835657 000002C8 90CBC95E 1D5A06FF 9005EB1D 5C06FF07 ...\.$....Z.^èù.à...WV.>\..uW.v. 0001A0
5C06FF04 754006C4 83100003 E29A1EC6 36FF1D36 36FF1D38 36FF18EB 507EF60B .~~P$..68..66..66..à.Ì..á.àu...\ 0001C0
2602478E 2607FF26 3F88261E C6A00478 044FFF26 1D361EC4 1E7EC008 4EC68B1D ..6N.á~.á.6.&.O.xá.6.&.?&..&.G.& 0001E0

Dump of file SATURN:[PCCOMMON.DUMP.DLL]SA-XPORT.DLL;1 on 18-APR-1990 08:23:46.62
File ID (460,18,0)   End of file block 63 / Allocated 64

Virtual block number 35 (00000023), 512 (0200) bytes

76885657 000002C8 CBC95F5E 1D5A0601 06468807 75001D5C 3E83D4E8 E42A0588 ..*ô$à.>\..u..F...Z.^_èùà...WV.v 000000
83114F03 E29A5098 078A2606 5EC41036 36FF1D38 36FF22EB 5E75001D 5C3E830A ..>\..u^$".68..66.á^.Ï...P.à.O.. 000020
065EC4CD 78044F"5 261D361E C42574C0 084EC688 0646FF1D 5C06FF04 754006C4 á.àu...\..F..6N.àt%á.6.&.O.xëá^. 000040
88077500 1D5C3E '5 CAEBE42A 05882602 478E2607 FF263F88 261D361E C4078A26 &..á.6.&.?&..&.G.&..*ô$ò.>\..u.. 000060
4689C028 F65689F4 46891D62 16881060 A1560000 0CC8CBC9 5F5E1D5A 06010A46 F...Z.^_èùà...VÀ'...b..F¶.V~+á.F 000080
1EC43E83 06762BF0 28F84689 04C4830D 8802149A F476FF52 1D64368B FA4689FC •.F*.6d¯R.v¶......á..F%+Þ+v..>á. 0000A0
1975203F 8026F45E C4227500 1D4E3E83 4E017508 1EC43E83 08EB02EE 83057510 .u..Ÿ.$..>á..u.N.>N..u"á^¶&.?-u. 0000C0
08743D1E C63E83F8 4EFF02C4 83FE71E8 0E509807 8A26F446 FF127530 1EC63E83 .>6.0u..F¶&...P.Òq±.á..N%.>6.0t. 0000E0
FF077400 1EC43E83 0066E80E FA46FF07 7400067E 83187400 1D4E3E83 077EF60B .~~..>N..t..~..t..F*.Òf..>á..t.. 000100
7500FA7E 830A7400 067E8302 C483FE7E E80E5629 7500104E 3E830070 E80EFC46 F•.Òp..>N..u)V.Ò~±.á..~..t..~*.u 000120
0EF476FF F676FFF8 76FF0040 E80E0475 00FC7E83 0A74001E C43E8300 39E80E04 ..Ò9..>á..t..~•.u..Òª..V%.v~.v¶. 000140
3E83C8C9 5E02C483 FE38E80E 5600201E C606C70E 7400104E 3E8306C4 83FE85E8 Òç±.á..>N..t.ü.6. .V.Ò8±.á.^èù.> 000160
8302C483 FDC8E80E 306AC802 C483F002 E80E5000 208803E8 00288805 74001040 ª..t.¡+.$.¡ .P.Ò0».á.ùj0.Òà».á.. 000180
06C8C802 C483FDAA E80E5000 788803E8 00588805 7400103C 3E831775 101EC43E >á..u..><..t.¡X.$.¡x.P.Ò^».á.ùà. 0001A0
46FF021D 50068337 88261050 1EC41275 2A3F8026 0A5EC400 01FE46C7 56570000 ..WúF±..á^.&.?*u.á.P.&.7..P...F 0001C0
FA468807 8A260A5E 88F6280A 46FFFFFF FE46C708 75203F80 260A5EC4 9060EB0A .$'.á^.&.?-u.úF±...F.+~.^.&...F* 0001E0

Dump of file SATURN:[PCCOMMON.DUMP.DLL]SA-XPORT.DLL;1 on 18-APR-1990 08:23:46.62
File ID (460,18,0)   End of file block 63 / Allocated 64

Virtual block number 36 (00000024), 512 (0200) bytes

39308026 06E8F888 00301EC6 06C70675 303C0A75 10563639 387F393C 3F7C303C <0|?<9.;96V.u.<0u.ú.6.0..«$.&.=9 000000
0A7E89DF 7D303080 2647F188 30E983C8 03E1D1CE 0302E1C1 CE889805 8A26187F ..&....öèÀ..öÌÀ.à.Ò0.þG&.=0)Ò.-. 000020
88570000 04C8CBC9 5F5E0C56 880A4688 37892606 5EC4F088 EEF7FE46 880C468C .F..F±%Y.Þá^.&.7.F..V.^_èùà...W¡ 000040
89000188 F4750038 26117400 30802647 01E8FC7E C4064E8A FE5E8CFC 4689032C ,...F•.^±.N.á~•$.G&.=.t.Ï8.u¶¡... 000060
5E8CFC46 89078488 000004C8 90C8C95F C028FE46 8CFC7E89 9009E8FE 468CFC7E ~•.F±$...~•.F±+á_èù.à...¡Ç..F•.^ 000080
89260857 89260647 8926990A 47882604 478926C0 28257583 0A47F626 FC5EC4FE ±á^•&~G..uX+à&.G¯&.G..&.G.&.W.&. 0000A0
1638C375 19A20638 0CFC4683 C28CC388 17E8C28C C388FF08 47C62602 57892607 .&.W.&6G...û.ô$..û.ô.F•.;.À.uú;. 0000C0
24E90518 E9C03300 098A0872 1A111E38 065E88EC 885590C8 C999C028 8D7519A4 Ê.u$+à.èù.U.&.^.;...r.¤..3èÒ..Ò$ 0000E0
46880C4E 88018357 56EC8855 CB5DE588 001A1387 C6F375C0 850000FF FF9A5305 .S......àuµó.....Ì]üW.$VW"..N..F 000100
7F12CE02 7F812606 5EC45657 00000EC8 0811E908 7EC51E99 01750AF9 83023306 .30.*.u...é~.Ò..à...WVá^.&...ö.. 000120
1F609A37 FF260277 FF263380 6801E168 0194E999 C0280673 A6003F81 26077C0F .|.&.?.Ìs.+à.Ò..hÀ.h.3&.w.&.7.'. 000140
80680 1E1 6814341F FC9A5052 99F088F9 F7000489 99405180 68016A03 3CA31419 ..Ê<.j.h.0ª.¿..%*.Þ.RP.•.4.hÀ.h. 000160
89FA4689 F45618F2 4628148F 20309AF4 5689F246 8937FF26 0277FF26 065EC433 3á^.&.w.&.7.F .V¶.0 ¢.+F .V¶.F*. 000180
80FA4681 0A75D208 F9F70004 89994003 3CA101E1 FC568133 80FA4681 26EBFC56 V•$&.F*.3.V•À.À<.ª.¿..%*.@u..F*. 0001A0
08F9F700 04899903 3CA107B2 033C0681 D47C00FC 7E83033C 0EFF4E01 FC568351 Q.V•.N..<..~•.|à..<.ÿ.À<..¿..%*. 0001C0
```

```
19C6B805 75D208F9 F7019089 99033CA1 0D75D208 F9F70064 8999033C A11F75D2 @u.À<..¿d.%*.@u.À<..¿..%*.@u.¡ó. 0001E0
```

Dump of file SATU V:[PCCOMMON.DUMP.DLL]SA-XPORT.DLL;1 on 18-APR-1990 08:23:46.62
File ID (460,18,0)   End of file block 63 / Allocated 64

Virtual block number 37 (00000025), 512 (0200) bytes

```
D11F609A FA76FFFC 76FF5180 68016A07 6C033C2E 81F85E8C F6468919 E08803E8 $.¡À..F-.^%..<.l.j.h.Q.v=.v*.'.ì 000000
260340A1 F65EC400 01033A06 C715281F 389A5016 FA4680S1 8068016A 0340A314 .Eâ.j.h.Q.F*.P.8.(.ú.:...á^-Àâ.& 000020
260340A1 033A06FF 02C783F2 7EC4F456 89F24689 000205C2 8CC3881F 7D024739 9G.)..û.ô....F .V¶á~·.ú...:.Àâ.& 000040
FF0E1068 006A0338 A3012826 F65EC4E7 D1033A3E 88033A0E FF0340A1 F17C0539 9.|þÀâ...:..>:.lóá^-&+.È8.j.h... 000060
3C6A006A 15491F38 9A5016FA 4680DE10 68006A03 36A3153A 1F609AFA 76FFFC76 v=.v*.'.:.Èó.j.h...F*.P.8.l.j.j< 000080
0332A310 3920309A FA76FFFC 76FF3C6A 006A0334 A315581F 609AFA76 FFFC76FF .v=.v*.'.[.È4.j.j<.v=.v*.0 9.È2. 0000A0
B8000003 4206C703 3E1689F9 F70007B9 9963CA20 C6030340 0603016D 033C0669 i.<.m...â..ó-ðc.¿..%*..>.ú.B...¡ 0000C0
44681E56 000006C8 C81EC806 FF0005E8 0E087500 1EC83E83 C8C95F5E DA8C0332 2..Ö^_èù.>à..u..Ö....à.ùà...V.hD 0000E0
E9037500 3F8026FA 5EC400A8 E90375D0 08FC5689 FA468904 C48315D1 1E1E9A03 ....1¯.á..F*.V=.Àu.Ö´.á^*&.?.u.Ö 000100
FF03FA46 830E1068 006A0AC4 8315E81D E69A0356 36FF0358 36FF5006 036A009C ..j..P.6X..6V..Ì.Ò..á.j.h...F*.. 000120
FA5EC4F6 28035216 890350A3 16401FFC 9A505204 C48315F2 1E109AFA 76FFFC76 v=.v*.......á.RP.=.â.ÈP...R.+-á^* 000140
03FE8346 06752D38 8026FA5E 88097504 021587F6 D8889800 8A261C74 00388026 &.8.t.&....Ä-....u..^*&.8-u.F.±. 000160
1DE69A03 5A36FF03 5C36FF50 52C603C2 8CC38803 6A1D7400 388026FA 5EC4DB7C |Ùá^*&.8.t.j..ù.ö.6RP.6\..6Z..Ì. 000180
C95E0354 A340C018 U13F8026 035A1EC4 0007C626 035A1EC4 9009EB0A C4831400 ...á.Š..á.Z.&6..á.Z.&.?..àâÈT.^è 0001A0
832600AD E9037E09 087F8326 00B7E903 7D03087F 8326065E C4560000 06C890CB ù.à...Vá^.&....).Òñ.&....~.ÒÙ.&. 0001C0
7F832617 7E07C2FE 81076CC6 810A7788 260081E9 037D0908 7F83260A 7E03087F ...~.&....).Ò..&.w..ól..±ò.-.&.. 0001E0
```

Dump of file SATURN:[PCCOMMON.DUMP.DLL]SA-XPORT.DLL;1 on 18-APR-1990 08:23:46.62
File ID (460,18,0)   End of file block 63 / Allocated 64

Virtual block number 38 (00000026), 512 (0200) bytes

```
E28788E3 D1085F88 26065E88 900EE800 070519E0 8788E301 085F8826 10750308 ..u.&._.ìD..À....Š...^.&._.ìD..ã 000000
F9F70004 89990144 8046EE83 0A778826 065EC4FA 46FF0375 0003C6F7 FA468919 ..F*%ó¯.u..F*á^.&.w..¥F.D¯.¿..%* 000020
7503087F 8326FE46 89C228FA 4688F9F7 00078999 000405C1 030160CE 69FA4603 .F*iòm..ê....¿..%*.F*+ô.F±&....u 000040
0E473926 FE468806 5EC49018 E8000188 1B7C0204 7F832622 75097F0E 47392615 .&9G...u"&....|.¡..Š..á^..F±&9G. 000060
FFFF9A50 50C03306 76FF0876 FFEC8855 C8C95EC0 28E57C01 047F8326 0775EE7C |¥u.&....||+â^èùU.$.v..v.3àPP... 000080
0CA3E086 580000FF FF9A5016 C48850EC 885500C8 5DE58801 7CE90374 C0850000 ...ât.Ò|..Ì]ù.U.$P.á.P.....X.ÀÈ. 0000A0
C85DE588 00018815 A421E69A 0982E800 21E80000 FFFF9A03 9A681E03 9C681E1A ..h...h.......Òl.Ò...ÌÌÈ.¡...Ì]ù 0000C0
267FFF89 039C068E FF330000 881E03A2 16FF00FF 68178418 349A1777 17E09A50 P.À.w..4...h....À..£..3.....¿..& 0000E0
E8E774AE F2C03308 74CA88A6 F3C888D1 8807A68E 3174003D 80264701 75003D80 .=.u.G&.=.t1/l..Ì.ùµl.òt.3á·ÙtÒŠ 000100
00C31FED E8AAC20A 0572412C AC9204E0 C00E7241 2CAC1A13 8F1FF788 071E061C .....%.¢..¯,Ar.âÀ..¯,Ar..ô`ŠÙ.û. 000120
17EA1834 9A5000FF 8819A61E FF047400 19A83E83 17891834 9A5000FC 88EC8855 U.š¡•.P.4....>`..t...Ì.¡..P.4.ô. 000140
970C7496 401074C2 38AD1C5C BE065688 C08ED88E 06C38857 56EC8855 C85DE588 .Ì]ùU.$W¡ù..À.â.V./\.Ù;ôt.â.t.. 000160
17FE1804 9A0676FF 57EC8855 0002CA5D E5885E5F 96E8E8F7 88AEF2FF FF89C033 3à¿..·Ù.%ŠŠ._^.Ì]ò..U.$W.v....±. 000180
FFFF9A50 1651521E 530002B8 C4885049 D1F7AEF2 FFFF89C0 33FA8892 1F74C008 .ât...*3à¿..¯ÙÀlÌP.áÈ..S.RQ.P... 0001A0
0808070A 0C090C08 0C070906 00051804 02030202 16010002 CA5DE588 5F580000 ..[_.Ì]ò......................... 0001C0
1C70206D 006C0859 00570053 00520243 00410235 02121211 0D10120F 1600160C .............S.A.C.R.S.W.Y.l.m p. 0001E0
```

Dump of file SATURN:[PCCOMMON.DUMP.DLL]SA-XPORT.DLL;1 on 18-APR-1990 08:23:46.62
File ID (460,18,0)   End of file block 63 / Allocated 64

Virtual block number 39 (00000027), 512 (0200) bytes

```
FFFF881A 0816891A 0FA31608 0D000807 02CE08A4 00840982 0A810A80 16060972 r...........È.ö.•.....È......¡.. 000000
073A2E18 75E40A00 2489186A 881A0FA3 C85DE588 99FFFF88 0008E8CB 5DE58899 ..Ì]ùÒ..¡....Ì]ùÈ..Èj.¿$..ðu..:. 000020
1A08A398 01478A2E 430176CA 3C0472BC 3C430A76 243C0472 133CF7E2 43431674 t.CCã%<.r.<$v.C<¥r.<òv.C..G..È.. 000040
A805E001 C103E001 C888F9F7 000C8999 07842004 46881 9AA 06FF0000 04C800C3 û.à.....¯..F.·Ç..¿..%*.àlÀ.èiÀ.´ 000060
74D00808 57892606 47892604 5EC402C4 83183E1D 289A0200 68FE5E8C FC468913 ..F•.^±h...+.>..á.á^.&.G.&.W...Àt 000080
FE5688FC 4688040A 4F802604 5EC49021 E8020002 47C726FC 5EC4080A 4F802611 .&.O..á^•&úG...Šl.á^.&.O...F•.V± 0000A0
07892608 57882606 47882604 5EC40001 0247C726 FC5EC408 57892606 47892640 â&.G.&.W.á^=&úG...á^.&.G.&.W.&.. 0000C0
FF16E9C0 3300098A 08721A11 1E38065E 88EC8855 C3C90000 0447C726 02578926 &.W.&úG...èùU.š.^.;...r.¤..3àÕ.. 0000E0
91E175C0 855A5900 00FFFF9A 51160C76 FF0876FF 0A76FF53 CC8804EC 83FF22E9 Õ"..$..âS.v..v..v..Q.....YZ.âuÃ. 000100
56801652 FE568016 0676FF08 76FF4087 0EEC83EC 885500C8 5DE588FD 1A13A780 .Ì..».Ì]ù.U.$.$.ñâ.v..v...V±R..V 000120
740200A9 2A750400 A910CA80 08740100 A90A4688 018AE80C 4E885252 D23352F8 ¥R3@RR.N.Ò...F.`..t..ò.`..u*`..t 000140
4E880875 58C08500 00FFFF9A 5050C033 50160676 FF0876FF FE468050 02CA8022 ".ò.P.F±.v..v..P3àPP......âXu..N 000160
0E75006E 3D1674C0 080000FF FF9A5050 C03350C7 0A000325 525101CA 8003E8FE ±Š..ò.QR%...úP3àPP......ât.=n.u. 000180
000013A3 9A500072 1A110638 FE468800 8DE9FE68 E90011BA 03740002 8AF0C2F6 -òbo..t.¤..Òh±Ò...F±;...r.P.È... 0001A0
0A468861 75C00800 00FFFF9A 50F84680 1653F45E 8D165000 88E4E8C0 3300188A ¤..3àŠò.ÀP..^¶S..F½P......âua.F. 0001C0
```

```
C6077501 3CF4468A F24E8880 B1027580 1C2506F6 07754000 A90E7580 00A9C933 3è`..u.`.àu.-.%..u.Ý..N·.F¶<.u.6 0001E0

Dump of file SATURN:[PCCOMMON.DUMP.DLL]SA-XPORT.DLL;1 on 18-APR-1990 08:23:46.62
File ID (460,18,0)   End of file block 63 / Allocated 64

Virtual block number 40 (00000028), 512 (0200) bytes

7400020A 46F77A74 C90AF446 88C03200 83E908F4 46C60775 023C008E E940F446 F¶àÔ..<.u.6F¶.Ô..2è.F¶.ètz%F...t 000000
E4E90374 0083.00C 74C00800 0019859A 50FA4680 16510002 B95151FF FFB95273 sR¿..QQ¿..Q..F°P.ç....ât.=..t.Ôð 000020
F8463923 75C00800 00FFFF9A 50F84680 16500001 8850F646 8D16524F EBC033FD »3ãŠOR..F-P¦..P..F¥P......âu#9F½ 000040
8E75C008 0000FFFF 9AFA76FF FC76FF00 FC5E8301 FA6E8352 18751AF6 7E833274 t2.—.u.R.nª..^=..v=.vª......âu/ 000060
FF0876FF 287548C1 F6F44E8A AA75C008 00001AD1 9A50FA46 8D165050 50C03352 R3âPPP..F°P.1....âu`.N¶-èHu(.v.. 000080
7400080A 46F710C9 80037400 01F846F7 00001A15 9A5050C0 3350F846 80160676 v...F¥P3âPP.....%F½..t..è.%F...t 0000A0
A8C933C1 2300F71A 0AA1CB5D E5881A13 8F880888 C28801C9 80F24E0A 20C98003 ..è .N·.è..ô.Ä.....[]ùÀ..%Ä#è3è` 0000C0
F6FD17E9 C0330009 8A08721A 111E3806 5E880CEC 83EC8855 00C301C9 80037580 .u..è.û.U.å.å..^.;...r.¤..3àÔ.»— 0000E0
8C667480 1A1387F6 00001B2C 9A5016F4 46805141 415151C9 33531274 201A1387 ... t.S3èQQAAQ.F¶.P.,...-....tf_ 000100
8049E30C 4E88F866 89F288FA 885657FC FC4689FE 4689C033 0856C50A 468EFA5E ^ª.F.éV.3â.F±.F»»WV.ª.·.f½.N.DI¯ 000120
74F83800 740A3CAC 0C4E8807 16FA88D4 88E22800 80BADC88 02EC8338 75AEF20A .·Ûu;.ŝ..Éo..+ã.å.ª..N.¯<.t.;«t 000140
E1E80014 E8E2EBFC 46FF0A80 AA001FE8 0375FB38 0080009A E9002BE8 F4E2AA1A .¨ã¶Ô+.Ô..¯.;«u.Ô..¯¯..F»ŠãÔ..ŠÃ 000160
5E881FE3 CA28CF88 1F061E51 5350192D 20D29AFF FC887AEB 0093E9FA 5E8E5F5E ^_.^ªÔ..Šz¦=..@ -.PSO....ü+ðD..^ 000180
58591F07 740B08FE 5E01F45E 881175C0 08000018 5E9A5016 F4468051 521E5306 .Š.RQ.F¶.P.^....âu..^¶.^±.Ut..Y[ 0001A0
208A03E8 001C8A08 7500098A 00013000 74006030 1874C008 08C4831F C3FA8858 X.ªù..á..ât.=m.t.=..¤..u.¤..Š.¤ 0001C0
33001C8A 0EE8F803 751A3F80 085E880A 5E8E0E74 401A1387 F6FE5E8E 26E8F900 .ªŠå.^±-...ât..^..^..?.u.½Š.¤..3 0001E0

Dump of file SATURN:[PCCOMMON.DUMP.DLL]SA-XPORT.DLL;1 on 18-APR-1990 08:23:46.62
File ID (460,18,0)   End of file block 63 / Allocated 64

Virtual block number 41 (00000029), 512 (0200) bytes

C9080C4E 88F8F8E9 C850E588 0472FA5E 8E5F5EF8 6688FC46 28FE4688 06E8F9C0 åªŠ..F±+F=.f½^_.^ªr..[]ùÔ««.N..è 000000
301774C0 081F071E 00001C48 9A5016F4 46805152 1E530856 C51EEEEB C1880475 u..éŠY.éV.S.RQ¯F¶.P.K.......ât.= 000020
1387F687 75C008F4 4688C2E8 00208AC7 E8001C8A CC750009 8A000130 00740060 m.t.=..¤..um¤..Šú¤ .Šô.F¶.âuñ-.. 000040
C308C08C 065EC4EC 885500A3 E8C03300 1C8AA6E8 02751A3F 80260A88 0A74401A .ât..Oå.?.u.Š|¤..3âŠÈ.U.ŝá^..â.û 000060
001C303E 831E73FF F1300646 88575602 EC83EC88 55C85DE5 8801FE4F 80260574 t.å.O±..[]ùU.ŝ.ŝ.VW.F.=þ.s..>0.. 000080
3023469A 0676FF08 75007BE8 05740018 E8157500 82E81C30 A3127400 25E80875 u.ÔX.t.ÉO.Ô..u.Ô..t.Ôx.u..v..F#O 0000A0
501EC033 FE5E89FE E3834306 5E880776 065E3900 F088C85D E5885E5F ^^C4831C ..á._^.[]ùEÞ.9^.v..^.C.D±.^±3â.P 0000C0
02081C34 A31C3216 87C28838 74FFFA83 08C4831D 5F254A9A 50028051 0E ¯8050 P.O.Q¯.P.J%_..á..ª.t8.ô..2.É4..@ 0000E0
8D0002A3 0000A300 0A880C47 89484800 08A3C033 088EFE5E 880008A3 DA8‿1574 t..ÔÉ...^±.Ã3âÉ..HH.G.¦..É..É... 000100
0805B0E8 1C341E8E D833064E 88C08ED8 8CC31FD8 8C0006A3 00000500 0AA30147 G.É.....É...Ä.û.Ä.à.N.3Ü..4.O¯.. 000120
E2AA0374 C00AAC0C E30E4E88 DF880A76 C5067EC4 1E5657EC 8855C309 8EC18CD2 @.è.\ùU.ŝWV.á~.év..Ô.N.O.¯.ât.ˆã 000140
06C80086 E9008357 56EC8855 000829E9 C850E588 5F5E1FC2 8CC388AA F3C032F8 ½2âµ¯.ù.ô.^_.[]ùÔ)..U.ŝVWª.ÔÑ.à. 000160
FF0876FF 6E740846 08064688 7674C208 FC5689FA 46891C18 16881C19 A1560000 ..VÀ.......F¯ª.V=.ôtv.F..F.tn.v.. 000180
4A740247 08260788 26FA5EC4 04FA4683 909006E8 F08804C4 831E6A02 149A0676 v....j..á..ÞŠ....Fª.á^ª&..&.G.tJ 0001A0
56017530 3880261F C426FA5E C4DD7EC6 3804C483 1E930214 9A37FF26 0277FF26 &.w.&.7......á.;ó-ÏÁ^ª&á.&.8=uîV 0001C0
26FA5EC4 8475C008 0AC4831D 8826009A 37FF2602 77FF26FA 5EC40676 FF0876FF .v..v.á^ª&.w.&.7..&...á..âuÇá^ª& 0001E0

Dump of file SATURN:[PCCOMMON.DUMP.DLL]SA-XPORT.DLL;1 on 18-APR-1990 08:23:46.62
File ID (460,18,0)   End of file block 63 / Allocated 64

Virtual block number 42 (0000002A), 512 (0200) bytes

7C00F883 117D1A11 1E38065E 88EC8855 C8C95E99 C02B9004 E8C28C01 40801FC4 á..à..ôŠ..+â.^èùU.&.^.;...)..«.| 000000
7EC51E08 56880646 880E4E88 00C850E5 88C03302 E8000188 0574401A 1387F60C .-...ât.¦..Š.3â.[]ù_.N..F..V..é~ 000020
92F7880A F7000283 08F7AA2D 800A79D2 080E750A F9831374 C00A93FC 071E570A .W..=..ât..ª.u..@y.¯-¯%Ù.@.%Ô.%. 000040
4F0588E2 75C308C2 88AA2704 0276393C 30040387 92F1F793 F1F70274 C0080233 3@.ât.%þ.%þ..Æ.0<9v..'¯.ô.ùuã..O 000060
76FF065E C4EC8855 00C850E5 885E5F1F 58DA8CF2 72C73801 448DFF44 880586AC ¯...D..D.;úr·.ÔX._^.[]ù.U.ŝá^..v 000080
0008CA5D E5880789 26025789 26065EC4 1E452030 9A37FF26 0277FF26 0A76FF0C ..v.&.w.&.7.0 E.á˟.&.W.&...[]ò.. 0000A0
06568908 46890000 100AF708 F7065688 47117DC0 08084688 FF335356 57EC8855 U.ŝWVS3..F..â).G.V.%ÄÀÔ....F..V. 0000C0
880A4E88 1575C008 0A56890C 46890000 100AF708 F70A5688 47117DC0 080C4688 .F..â).G.V.%ÄÀÔ....F..V..âu..N.. 0000E0
D9D1E8D1 06468808 56880A4E 88088838 E8D388F1 F7064688 D888F1F7 D2330846 F.3@%þ.Ä.F.%þ.ÆŠ8.Ä.N..V..F.1Š11 000100
06720777 0856380C 720103E6 F70A4688 910C66F7 F088F1F7 F4750808 D8D1EAD1 ÏôÏÄ.Ùu¶%þ.Þ%f...F.%|.ir.;V.w.r. 000120
88EC8855 0008CA50 E5885F5E 58000A83 D8F7DAF7 07754F96 D2334E01 76064638 ;F.v.N3@.Ou.%O%Ä.Ö.[^_.[]ò..U.ŝ. 000140
66F70646 88C888E3 F70008CA 5DE588E3 F7064688 08750A5E 88D8080C 5E880846 F..^..Ä.^.u..F.%D.[]ò..%D.â.F.%f 000160
8847117D C0080846 88FF3357 53EC8855 0008CA50 E5880103 E3F70646 88C8030C ..â.F.%O.1.[]ò..U.ŝSW3..F..â).G. 000180
00001D0A F7D8F70A 5688107D C0080C46 88065689 08468900 0010DAF7 08F70656 V.%ÄÀÔ....F..V..F..â)..V.%ÄÀÔ... 0001A0
43794FD2 33C288F1 F7064688 F1F7D233 0846880A 4E881875 C0080A56 890C4689 .F..V..âu..N..F.3@%þ.F.%þ.ô3@OyC 0001C0
```

0C66F7C8 88F1F7F4 75080808 D1EAD109 D1EBD106 46880856 880A4E88 D8884BEB $H.A.N..V..F.iŠi1iòiA.Üu¶‰þ.à‰f. 0001E0

Dump of file SATURN:[PCCOMMON.DUMP.DLL]SA-XPORT.DLL;1 on 18-APR-1990 08:23:46.62
File ID (460,18,0)   End of file block 63 / Allocated 64

Virtual block number 43 (0000002B), 512 (0200) bytes 08561806 46280C56 180A462B 06760646 38087207 7708563B 0C72D103 0A6ι 791 .‰f..1r.;V.w.r.;F.v.+F..V.+F..V. 000000
057219FE 1E380872 D82B0C8B 5A590008 CA50E588 585F000A 8308F7DA F707.)4F Oy.‰O‰À.Ò._[.]]ò..YZ.É+År.;.±.r. 000020
1A13A780 D4885200 028819FA 2EFF5152 F690E9C0 33057540 19FAA1CB 5152E58B .DRQùÀ'.ãu.3àÕ.-RQ..'.E..R.å.Ì.. 000040
81067500 02300774 00013040 81127558 C0080000 1A759A52 16501653 C48850B7 ñP.ás.P.R.u....àXu.Ýã=..t.=..u.Ý 000060
01AEE903 731C401E FFD833C2 8C1C4406 C41EE31C 420E885A D47948 1A 138F0808 .....KyåZ..B.D.é.D..ó3Ü..ã.s.ÕÜ. 000080
880073E8 1C4C8F1C 4C8E007C E81C4C8F 1C4C8E1C 401EFF00 038BC28C 1C4806C4 á.H..ôÉ....ã./L.«L.Ò|./L.«L.Òs.| 0000A0
51E81C3E 8F1C3ABE D88E180A 88C30000 FFFF9A21 73680E01 6A08741C 3E3D1C3A :.=>.t.j..hs!.....Ùj...Ä/:.«>.Òa 0000C0
31E81C3E 8F1C3ABE 003AE81E CA8F1ECA 8EEC8855 0000216E 9A006A00 6A036A00 .j.j.j..n!..U.$/ò.«ò.Ò:./:.«>.Ò1 0000E0
9A500646 8A50C033 001AE81C 4C8F1C4C 8E0023E8 1C4C8F1C 4C8EEC88 5503EB00 .Š.U.å/L.«L.Ò#./L.«L.Ò..3åP.F.P. 000100
F2740245 08058804 EF830E73 F738C31C 401EFF00 028807E3 1C420E88 0000FFFF ......B.D.É....ã.ú;‰s..ÿ....E.t 000120
89C02803 9C168800 F0E90375 039C3639 FF28F62B 56570000 14C800C3 EEE81DFF ..ŠÝù.à...WV+-+.96..u.Õþ.....+á. 000140
080AC483 225A2600 9A07A668 1EF676FF F876FF0C 6AF85689 F64689F2 5689F046 Fþ.V·.F-.V½j..v½.v-.hÌ...&Z".é.. 000160
FFF65EC4 0CE847EA 75003F80 26F646FF F65EC400 8CE90376 7FFFFE81 461974C0 åt.F.±..v.Õ¥.á^-.F-&.?.uõG$.á^-. 000180
8904C483 226924F2 9A046A50 01458DBA 75003F80 26F65E88 F475003F 8026F646 F-&.?.u¶.^-&.?.uo.E.Pj..$i".é.. 0001A0
08FC4688 6074EE46 08EC4688 FE5689FC 468902C4 83229F1D 289A56EE 5689EC46 F$.VÝV.+..".é..F=.V±.F$.FÝtm.F•. 0001C0
4E26009A 07A6681E F076FFF2 76FF0C6A 1C1B1689 1C19A3EE 5688EC46 886674C2 òtf.F$.VÝÈ......j..v·.vþ.hÌ...&N 0001E0

Dump of file SATURN:[PCCOMMON.DUMP.DLL]SA-XPORT.DLL;1 on 18-APR-1990 08:23:46.62
File ID (460,18,0)   End of file block 63 / Allocated 64

Virtual block number 44 (0000002C), 512 (0200) bytes

FFF05EC4 04EC4683 02578926 078926FE 5688FC46 88EC5EC4 2C74C008 0AC4831F ..é..åt,á^š.F•.V±&..&.W..F$.á^þ. 000000
F475003F 8026F046 FFF05EC4 E8E80E74 C00A0788 26FC46FF FC5EC407 8A26F046 Fþ&..á^•.F=&...åt.ŠÒá^þ.Fþ&.?.u¶ 000020
8CFA4689 07848856 000006C8 F48CE900 028890CB C95F5EA7 75003F80 26F05EC4 á^þ&.?.uI^_èù.¡..Õ.¶à...V¡Ç..F'. 000040
46834601 744004C4 83221A08 2A9A5306 0E74830A 47F626FA 5EC41CEB F628FC5E ^•+-Š.á^'&¯G..t..S.*..".á.ãt.F.F 000060
4F800474 D808065E 88EC8855 90C8C95E C6880876 FA463919 A4168819 A2A10CFA '.ÀÅ...Ê.9F'vÁ.ó^èù.U.£.^..Üt..O 000080
99C03305 750176E8 00058807 1E297500 3F831C26 885756EC 8855C850 E58801FE ±..|]ùU.$VWE&..?.u)..¡..Òv.u.3á. 0000A0
8C064E88 1C2C3689 FFFEFE44 C704C683 000104C7 961C28A3 1C26A3FE 244024EB $$ã$±É&.É(..ú....ó.úD±±..6,..N.. 0000C0
88ADFC02 7788F273 EEF983FE E180FA74 41000E9 CB5DE588 5E5F0009 E8C08ED8 Á.àÒ.._^.|]ùÒÀ.At'.Ã±.'Ýs·.w.=Ù. 0000E0
88E6E8FE 4489F788 000205C2 03357401 A8ADF003 D0881573 C1384843 7401A8FE ±´.tCH;ès..Á.þÙ´.t5.ó....‰.D±Š!. 000100
26057401 38217489 DA8CC688 FE4CFEF9 0305E805 8948C128 FE4C89F9 030C74FE ±t..'.L±+èH..Š..'±L±.ó.Ö¿t!;ìt.& 000120
3848FE88 F27401A8 ADF003FE 882574FF FE30021C 3806C626 C3027F89 1C341E8C ..4....ù&ó.8..=±.t%.±.þÙ´.t·.±H; 000140
8E0474C0 08084788 E6E8FE44 89F78800 0205C203 E27401A8 ADF00300 888C73C1 ès¥.Á.þÙ´.tã.ó....‰.D±Š!.G..åt.. 000160
33067788 88E83788 1C301E8E 260574C7 3823098F D88C1274 1C380EFE 2615E8D8 A$.&±.8.t..Ä«1#;út.&..0..7ŠÉ.w.3 000180
8C98E84E 4E960574 0010E8FE 4DFE0074 005FE898 40400124 0074C63B 0068E8C0 àÒk.;ót.$.ãã.Ò_.t.±M±Ò..t..NNŠ.. 0001A0
49C82803 7401A8FE 458851C3 99C03302 47890788 1C34A326 0474C138 24208908 Á¿·$;èt.&É4....G.3ã.ùQ.E±´.t.+àI 0001C0
C628C223 02F70072 C2031572 C603C188 F575EAD1 04761C36 1638267F FF8A4141 AAα..&;.6.v.ìõu‰.ê.ór..ór.‰@#ó+6 0001E0

Dump of file SATURN:[PCCOMMON.DUMP.DLL]SA-XPORT.DLL;1 on 18-APR-1990 08:23:46.62
File ID (460,18,0)   End of file block 63 / Allocated 64

Virtual block number 45 (0000002D), 512 (0200) bytes

FE44C7F2 03F088FE 88571874 001DE851 52C359C0 33E575EA D1D2F708 75000CE8 Ò..u.‰@ìõu!3àYùRQÒ..t.W.±.Þ.·ùD± 000000
9A1F0650 0001B850 52521ED2 335053C3 5A5958FE 55894AD7 28068806 7789FFFE ±..W..ø+øJ.U±XYZùSP3@.RRP¡..P... 000020
76FF006A 0876FF00 6A560000 0AC8C3D2 08027458 5A1FFFFA 8308C483 2315254A JX.#.á..'..Z(t..@ùà...Vj..v.j..v 000040
38102B9A 56F87688 902FE899 C0280674 FFFFC2F7 FA5689F8 4689251F 1FFC9A06 ..•..‰.F½.V'‰ó..t.+å.Š/..v½V.+.8 000060
9007E808 C48324E2 039A9A50 FE76FF00 6A561274 0008FE56 89FC4689 02C48325 ‰.é..F•.V±.Åt.Vj..v±P...ã$.á.Š.. 000080
48064688 08568803 A48F3875 000A7E83 065756EC 885590C8 C95EFE56 88FC4688 .F•.V±^èù.U.$VW..~..uB«Ê..V..F.H 0000A0
735E003E E8560E46 89024488 0074F738 11744807 A436884C E8277200 57E80775 u.ÒW.r'ŠL.6É.Ht.;‰t..D..F.VÒ>.^s 0000C0
FFFF9A50 C0335016 52C48850 21E899FF FF880675 D2080473 07A4FE81 04C68334 4.6..±É.s..@u.¡...ŠIP.áR.P3åP... 0000E0
880E4E88 C850E588 5E5F07C0 33038807 A4368902 5C891489 E675C085 F9580000 ..['.àul...\..6É..Æ3à._^.|]ù.N.. 000100
0675F738 C18ED388 26721C03 DA882CE8 F9F27507 A4FE8104 C6830C74 024C39F7 ‰9L.t..ó..±É.u·'Š,.Ò..F&.Æ.ê;‰u. 000120
00C3D188 0487920. 9E168904 75F738DE 75C08500 00FFFF9A 51531373 039E1E39 9...s.SQ......àuB;‰u.........ìù. 000140
F30A76C5 FE88C80› D9F7AEF2 C033F788 067EC4D9 8827E30E 4E881E56 57EC8855 U.$WV..N.D'.\á~..‰3à·Ù‰).ù.±év.µ 000160
57EC8855 00C850E5 885F5E1F C1880 1F7 49490474 0477FF45 3A26C933 FF448AA6 Ì.D.3è&:E.w.t.IIÌi.ê.^_.Ì]ù.U.$W 000180
77393CAC 0175283C 0474203C 50F77409 3CF87420 3CACD833 99C03306 76C51E56 V.év.3à.3U¯< t«<.t‰P<-Ť.<+u.¯<9w 0001A0
DCE80002 83D803D7 13D903D2 D1E3D1D2 D1E3D1FA 88C88802 D1E3D118 72302C1F .,Or.ìDi@.ù.'iDi@iDi@.\.±.Ä.@.ŠÉ 0001C0

```
1A5C0203 03000001 1A330203 0012CB50 5F5E1FDA F7000283 08F70775 93203C58 X<-.u.%A.@.%O.^_)ù....3.......\. 0001E0

Dump of file SATURN:[PCCOMMON.DUMP.DLL]SA-XPORT.DLL;1 on 18-APR-1990 08:23:46.62
File ID (460,18,0)   End of file block 63 / Allocated 64

Virtual block number 46 (0000002E), 512 (0200) bytes

 1C040203 00070002 21880103 00050002 21C00103 00000005 25040002 03080001 .......%......å!.......!......å. 000000
 25E90103 0022C302 259E0103 031A0001 1AF50203 00000007 24620002 03110001 ......b$......%........%.."...Õ% 000020
 1B180103 003C0002 173E0103 003A0002 1B840103 00880002 03CD0105 00260002 ..å...ë.......Ç...:...>...<..... 000040
 17570103 00580002 176A0103 004D0002 210A0103 00480002 1B4C0103 00440902 ..D...L...K....!..H...j...[...W. 000060
 54206E75 52205340 00000000 00000000 00000000 00000000 00000000 005C0002 ..\.....................MS Run-T 000080
 38383931 20296328 20746867 69727970 6F432020 20797261 7262694C 20656069 ime Library - Copyright (c) 1988 0000A0
 7525306A 626F6C60 6468203A 73250011 70726F43 2074666F 736F7263 694D202C , Microsoft Corp..%s: hdmlobj=%u 0000C0
 626F6C6D 6468203A 73250075 25307262 6E207965 68202C75 25306469 6C6D642C ,dmlid=%u, key nbr=%u.%s: hdmlob 0000E0
 30206469 6C6D6420 2C752520 30206A62 6F6C6D64 68203A73 25007525 2030206A j = %u.%s: hdmlobj = %u, dmlid = 000100
 7325222C 00226325 222C0064 6C252C00 64252C00 64252C00 646C252C 00752520  %u.,%ld.,%d.,%d.,%ld.,"%c".,"%s 000120
 00227325 222C000A 20646C25 2C646C25 0020726F 72726520 746F6C73 202C0022 ".,-slot error-.%ld,%ld ..,"%s". 000140
 302E7532 30252E75 3230252E 75323025 20753230 25207532 30252D75 3430252C ,%04u-%02u-%02u-%02u.%02u.%02u.0 000160
 75323025 20753230 25207532 30252D75 3430252C 00227325 222C0030 30303030 00000.,"%s".,%04u-%02u-%02u-%02u 000180
 2C00646C 25000A20 2A2A7325 2A2A0030 30303030 302E7532 30252E75 3230252E .%02u.%02u.000000.**%s** ..%ld., 0001A0
 77007525 20302060 7468203A 7325000A 2A2A7325 2A2A0064 25000A00 22732522 "%s"...%d.**%s**..%s: htm = %u.w 0001C0
 61420075 25203020 65707974 206C6564 6F6D202C 75252030 20607468 20732500 .%s htm = %u, model type = %u.Ba 0001E0

Dump of file SATURN:[PCCOMMON.DUMP.DLL]SA-XPORT.DLL;1 on 18-APR-1990 08:23:46.62
File ID (460,18,0)   End of file block 63 / Allocated 64

Virtual block number 47 (0000002F), 512 (0200) bytes

 3A632558 002E2E00 2E002E2E 002A2E2A 005C0000 0A732520 7325206E 61606863 chman %s %s...\.*.*.........[%c: 000000
 616E656C 69662020 20002E68 74617020 64696C61 76206120 746F6E20 2020005D ]. - not a valid path.. - filena 000020
 78450074 726F7078 45007472 6F707845 002E676E 6F6C206F 6F742073 69206560 me is too long..Export.Export.Ex 000040
 20656220 6C6C6977 2073746E 65746E6F 43202020 73747369 78652000 74726F70 port. exists - Contents will be  000060
 00005241 562E2A00 534E4749 53454400 74726F70 78450021 64656361 6C706572 replacedl.Export.DESIGNS.*.VAR.. 000080
 20202020 20202020 20202020 20282828 28282020 20202020 20202000 005C005C \.\..        (((((              0000A0
 10848484 84848484 84848410 10101010 10101010 10101010 10104820 20202020      H......................... 0000C0
 01010101 01010101 01010101 01010101 01010101 81818181 81811010 10101010 ................................ 0000E0
 02020202 02020202 02020202 02020202 02020202 82828282 82821010 10101010 ................................ 000100
 00000000 00000000 00000000 00000000 00000000 00000000 00000020 10101010 .... ........................... 000120
 00000000 00000000 00000000 00000000 00000000 00000000 00000000 00000000 ................................ 000140
 00000000 00000000 00000000 00000000 00000000 00000000 00000000 00000000 ................................ 000160
 00000000 00000000 00000000 00000000 00000000 00000000 00000000 00000000 ................................ 000180
 23202028 00296C6C 756E2800 296C6C75 6E280000 00000000 00000000 00000000 ..............(null).(null).+- # 0001A0
 00544445 00545345 00005A54 00000000 00000000 00000000 00000000 00000000 ...................TZ..EST.EDT. 0001C0
 69724675 68546465 57657554 6E6F406E 75531C52 034C035C 03480001 00004650 PF....H.\.L.R.SunMonTueWedThuFri 0001E0

Dump of file SATURN:[PCCOMMON.DUMP.DLL]SA-XPORT.DLL;1 on 18-APR-1990 08:23:46.62
File ID (460,18,0)   End of file block 63 / Allocated 64

Virtual block number 48 (00000030), 512 (0200) bytes

 4F706553 6775416C 754A6E75 4A796140 72704172 61406265 466E614A 00746153 Sat.JanFebMarAprMayJunJulAugSepO 000000
 00000000 00000000 03581ED0 21A31ED0 1ED00000 00000000 63654476 6F4E7463 ctNovDec......À.À.ÈIÀ.X......... 000020
 00000000 00000000 00000000 00000000 00000000 00000000 00000000 00000000 ................................ 000040
 00000000 00000000 00000000 00000000 00000000 00000000 00000000 00000000 ................................ 000060
 00000000 00000000 00000000 00000000 00000000 00000000 00000000 00000000 ................................ 000080
 00000000 00000000 00000000 00000000 00000000 00000000 00000000 00000000 ................................ 0000A0
 00000000 00000000 00000000 00000000 00000000 00000000 00000000 00000000 ................................ 0000C0
 00000000 00000000 00000000 00000000 00000000 00000000 00000000 00000000 ................................ 0000E0
 00000000 00000000 00000000 00000000 00000000 00000000 00000000 00000000 ................................ 000100
 00000000 00000000 00000000 00000000 00000000 00000000 00000000 00000000 ................................ 000120
 00000000 00000000 00000000 00000000 00000000 00000000 00000000 00000000 ................................ 000140
 00000000 00000000 00000000 00000000 00000000 00000000 00000000 00000000 ................................ 000160
 00000000 00000000 00000000 00000000 00000000 00000000 00000000 00000000 ................................ 000180
 00000000 0000000C 00000000 00000000 00000000 00000000 00000000 00000000 ................................ 0001A0
 00000000 00000000 00000000 00000000 00000000 00000000 00000000 00000000 ................................ 0001C0
```

```
00000000 00000000 00000000 00000000 00000000 00000000 00000000 00000000 ................................ 0001E0

Dump of file SATURN:[PCCOMMON.DUMP.DLL]SA-XPORT.DLL;1 on 18-APR-1990 08:23:46.62
File ID (460,18,0)   End of file block 63 / Allocated 64

Virtual block number 49 (00000031), 512 (0200) bytes

00000000 00000000 00000000 00000000 00000000 00000000 00000000 00000000 ................................ 000000
00000000 00000000 00000000 00000000 00000000 00000000 00000000 00000000 ................................ 000020
00000000 00000000 00000000 00000000 00000000 00000000 00000000 00000000 ................................ 000040
00000000 00000000 00000000 00000000 00000000 00000000 00000000 00000000 ................................ 000060
00000000 00000000 00000000 00000000 00000000 00000000 00000000 00000000 ................................ 000080
00000000 00000000 00000000 00000000 00000000 00000000 00000000 00000000 ................................ 0000A0
00000000 00000000 00000000 00000000 00000000 00000000 00000000 00000000 ................................ 0000C0
00000000 00000000 00000000 00000000 00000000 00000000 00000000 00000000 ................................ 0000E0
00000000 00000000 00000000 00000000 00000000 00000000 00000000 00000000 ................................ 000100
00000000 00000000 00000000 00000000 00000000 00000000 00000000 00000000 ................................ 000120
00000000 00000000 00000000 00000000 00000000 00000000 00000000 00000000 ................................ 000140
00000000 00000000 00000000 00000000 00000000 00000000 00000000 00000000 ................................ 000160
00000000 00000000 00000000 00000000 00000000 00000000 00000000 00000000 ................................ 000180
00000000 00000000 00000000 00000000 00000000 00000000 00000000 00000000 ................................ 0001A0
00000000 00000000 00000000 00000000 00000000 00000000 00000000 00000000 ................................ 0001C0
00000000 00000000 00000000 00000000 00000000 00000000 00000000 00000000 ................................ 0001E0

Dump of file SATURN:[PCCOMMON.DUMP.DLL]SA-XPORT.DLL;1 on 18-APR-1990 08:23:46.62
File ID (460,18,0)   End of file block 63 / Allocated 64

Virtual block number 50 (00000032), 512 (0200) bytes

00000000 00000000 00000000 00000000 00000000 00000000 00000000 00000000 ................................ 000000
4E495F45 4C49465F 435F03A4 00000000 00000000 00000000 00000000 00000000 ....................É._C_FILE_IN 000020
00000000 01020000 00000000 00000000 00011C50 00000000 07BC0000 003D4F46 FO=...¥.....P................... 000040
00000000 00000000 00000000 00000000 00000000 00000000 02020000 00000000 ................................ 000060
00000000 00000000 00000000 00000000 00000000 00000000 00000000 00000000 ................................ 000080
00000000 00000000 00000000 00000000 00000000 00000000 00000000 00000000 ................................ 0000A0
00000000 00000000 00000000 00000000 00000000 00000000 00000000 00000000 ................................ 0000C0
00000000 00000000 00000000 00000000 00000000 00000000 00000000 00000000 ................................ 0000E0
00000000 00000000 00000000 00000000 00000000 00000000 00000000 00000000 ................................ 000100
00000000 00000000 00000000 00000000 00000000 00000000 00000000 00000000 ................................ 000120
00000000 00000000 00000000 00000000 00000000 00000000 00000000 00000000 ................................ 000140
00000000 00000000 00000000 00000000 00000000 00000000 00000000 00000000 ................................ 000160
00000000 00000000 00000000 00000000 00000000 00000000 00000000 00000000 ................................ 000180
00000000 00000000 00000000 00000000 00000000 00000000 00000000 00000000 ................................ 0001A0
00000000 00000000 00000000 00000000 00000000 00000000 00000000 00000000 ................................ 0001C0
00000000 00000000 00000000 00000000 00000000 00000000 00000000 00000000 ................................ 0001E0

Dump of file SATURN:[PCCOMMON.DUMP.DLL]SA-XPORT.DLL;1 on 18-APR-1990 08:23:46.62
File ID (460,18,0)   End of file block 63 / Allocated 64

Virtual block number 51 (00000033), 512 (0200) bytes

00000000 00000000 00000000 00000000 00000000 00000000 00000000 00000000 ................................ 000000
00000000 00000000 00000000 00000000 00000000 00000000 00000000 00000000 ................................ 000020
00000000 00000000 00000000 00000000 00000000 00000000 00000000 00000000 ................................ 000040
00000000 00000000 00000000 00000000 00000000 00000000 00000000 00000000 ................................ 000060
00000000 00000000 00000000 00000000 00000000 00000000 00000000 00000000 ................................ 000080
00000000 00000000 00000000 00000000 00000000 00000000 00000000 00000000 ................................ 0000A0
00000000 00000000 00000000 00000000 00000000 00000000 00000000 00000000 ................................ 0000C0
00000000 00000000 00000000 00000000 00000000 00000000 00000000 00000000 ................................ 0000E0
00000000 00000000 00000000 00000000 00000000 00000000 00000000 00000000 ................................ 000100
00000000 00000000 00000000 00000000 00000000 00000000 00000000 00000000 ................................ 000120
00000000 00000000 00000000 00000000 00000000 00000000 00000000 00000000 ................................ 000140
00000000 00000000 00000000 00000000 00000000 00000000 00000000 00000000 ................................ 000160
00000000 00000000 00000000 00000000 00000000 00000000 00000000 00000000 ................................ 000180
00000000 00000000 00000000 00000000 00000000 00000000 00000000 00000000 ................................ 0001A0
00000000 00000000 00000000 00000000 00000000 00000000 00000000 00000000 ................................ 0001C0
```

```
00000000 00000000 00000000 00000000 00000000 00000000 00000000 00000000 ................................ 0001E0

Dump of file SATURN:[PCCOMMON.DUMP.DLL]SA-XPORT.DLL;1 on 18-APR-1990 08:23:46.62
File ID (460,18,0)   End of file block 63 / Allocated 64

Virtual block number 52 (00000034), 512 (0200) bytes

00000000 00000000 00000000 00000000 00000000 00000000 00000000 00000000 ................................ 000000
00000000 00000000 00000000 00000000 00000000 00000000 00000000 00000000 ................................ 000020
00000000 00000000 00000000 00000000 00000000 00000000 00000000 00000000 ................................ 000040
00000000 00000000 00000000 00000000 00000000 00000000 00000000 00000000 ................................ 000060
00000000 00000000 00000000 00000000 00000000 00000000 00000000 00000000 ................................ 000080
00000000 00000000 00000000 00000000 00000000 00000000 00000000 00000000 ................................ 0000A0
00000000 00000000 00000000 00000000 00000000 00000000 00000000 00000000 ................................ 0000C0
00000000 00000000 00000000 00000000 00000000 00000000 00000000 00000000 ................................ 0000E0
00000000 00000000 00000000 00000000 00000000 00000000 00000000 00000000 ................................ 000100
00000000 00000000 00000000 00000000 00000000 00000000 00000000 00000000 ................................ 000120
00000000 00000000 00000000 00000000 00000000 00000000 00000000 00000000 ................................ 000140
00000000 00000000 00000000 00000000 00000000 00000000 00000000 00000000 ................................ 000160
00000000 00000000 00000000 00000000 00000000 00000000 00000000 00000000 ................................ 000180
00000000 00000000 00000000 00000000 00000000 00000000 00000000 00000000 ................................ 0001A0
00000000 00000000 00000000 00000000 00000000 00000000 00000000 00000000 ................................ 0001C0
00000000 00000000 00000000 00000000 00000000 00000000 00000000 00000000 ................................ 0001E0

Dump of file SATURN:[PCCOMMON.DUMP.DLL]SA-XPORT.DLL;1 on 18-APR-1990 08:23:46.62
File ID (460,18,0)   End of file block 63 / Allocated 64

Virtual block number 53 (00000035), 512 (0200) bytes

00000000 00000000 00000000 00000000 00000000 00000000 00000000 00000000 ................................ 000000
00000000 00000000 00000000 00000000 00000000 00000000 00000000 00000000 ................................ 000020
00000000 00000000 00000000 00000000 00000000 00000000 00000000 00000000 ................................ 000040
00000000 00000000 00000000 00000000 00000000 00000000 00000000 00000000 ................................ 000060
00000000 00000000 00000000 00000000 00000000 00000000 00000000 00000000 ................................ 000080
00000000 00000000 00000000 00000000 00000000 00000000 00000000 00000000 ................................ 0000A0
00000000 00000000 00000000 00000000 00000000 00000000 00000000 00000000 ................................ 0000C0
00000000 00000000 00000000 00000000 00000000 00000000 00000000 00000000 ................................ 0000E0
00000000 00000000 00000000 00000000 00000000 00000000 00000000 00000000 ................................ 000100
00000000 00000000 00000000 00000000 00000000 00000000 00000000 00000000 ................................ 000120
00000000 00000000 00000000 00000000 00000000 00000000 00000000 00000000 ................................ 000140
00000000 00000000 00000000 00000000 00000000 00000000 00000000 00000000 ................................ 000160
00000000 00000000 00000000 00000000 00000000 00000000 00000000 00000000 ................................ 000180
00000000 00000000 00000000 00000000 00000000 00000000 00000000 00000000 ................................ 0001A0
00000000 00000000 00000000 00000000 00000000 00000000 00000000 00000000 ................................ 0001C0
00000000 00000000 00000000 00000000 00000000 00000000 00000000 00000000 ................................ 0001E0

Dump of file SATURN:[PCCOMMON.DUMP.DLL]SA-XPORT.DLL;1 on 18-APR-1990 08:23:46.62
File ID (460,18,0)   End of file block 63 / Allocated 64

Virtual block number 54 (00000036), 512 (0200) bytes

00000000 00000000 00000000 00000000 00000000 00000000 00000000 00000000 ................................ 000000
00000000 00000000 00000000 00000000 00000000 00000000 00000000 00000000 ................................ 000020
00000000 00000000 00000000 00000000 00000000 00000000 00000000 00000000 ................................ 000040
00000000 00000000 00000000 00000000 00000000 00000000 00000000 00000000 ................................ 000060
00000000 00000000 00000000 00000000 00000000 00000000 00000000 00000000 ................................ 000080
00000000 00000000 00000000 00000000 00000000 00000000 00000000 00000000 ................................ 0000A0
00000000 00000000 00000000 00000000 00000000 00000000 00000000 00000000 ................................ 0000C0
00000000 00000000 00000000 00000000 00000000 00000000 00000000 00000000 ................................ 0000E0
00000000 00000000 00000000 00000000 00000000 00000000 00000000 00000000 ................................ 000100
00000000 00000000 00000000 00000000 00000000 00000000 00000000 00000000 ................................ 000120
00000000 00000000 00000000 00000000 00000000 00000000 00000000 00000000 ................................ 000140
00000000 00000000 00000000 00000000 00000000 00000000 00000000 00000000 ................................ 000160
00000000 00000000 00000000 00000000 00000000 00000000 00000000 00000000 ................................ 000180
00000000 00000000 00000000 00000000 00000000 00000000 00000000 00000000 ................................ 0001A0
00000000 00000000 00000000 00000000 00000000 00000000 00000000 00000000 ................................ 0001C0
```

```
 00000000 00000000 00000000 00000000 00000000 00000000 00000000 00000000 ................................ 0001E0

Dump of file SATURN:[PCCOMMON.DUMP.DLL]SA-XPORT.DLL;1 on 18-APR-1990 08:23:46.62
File ID (460,18,0)   End of file block 63 / Allocated 64

Virtual block number 55 (00000037), 512 (0200) bytes

 00000000 00000000 00000000 00000000 00000000 00000000 00000000 00000000 ................................ 000000
 00000000 00000000 00000000 00000000 00000000 00000000 00000000 00000000 ................................ 000020
 00000000 00000000 00000000 00000000 00000000 00000000 00000000 00000000 ................................ 000040
 00000000 00000000 00000000 00000000 00000000 00000000 00000000 00000000 ................................ 000060
 00000000 00000000 00000000 00000000 00000000 00000000 00000000 00000000 ................................ 000080
 00000000 00000000 00000000 00000000 00000000 00000000 00000000 00000000 ................................ 0000A0
 00000000 00000000 00000000 00000000 00000000 00000000 00000000 00000000 ................................ 0000C0
 00000000 00000000 00000000 00000000 00000000 00000000 00000000 00000000 ................................ 0000E0
 00000000 00000000 00000000 00000000 00000000 00000000 00000000 00000000 ................................ 000100
 00000000 00000000 00000000 00000000 00000000 00000000 00000000 00000000 ................................ 000120
 00000000 00000000 00000000 00000000 00000000 00000000 00000000 00000000 ................................ 000140
 00000000 00000000 00000000 00000000 00000000 00000000 00000000 00000000 ................................ 000160
 00000000 00000000 00000000 00000000 00000000 00000000 00000000 00000000 ................................ 000180
 00000000 00000000 00000000 00000000 00000000 00000000 00000000 00000000 ................................ 0001A0
 00000000 00000000 00000000 00000000 00000000 00000000 00000000 00000000 ................................ 0001C0
 00000000 00000000 00000000 00000000 00000000 00000000 00000000 00000000 ................................ 0001E0

Dump of file SATURN:[PCCOMMON.DUMP.DLL]SA-XPORT.DLL;1 on 18-APR-1990 08:23:46.62
File ID (460,18,0)   End of file block 63 / Allocated 64

Virtual block number 56 (00000038), 512 (0200) bytes

 00000000 00000000 00000000 00000000 00000000 00000000 00000000 00000000 ................................ 000000
 00000000 02000001 00000000 00000000 00000000 00000000 00000000 00000000 ................................ 000020
 00000000 00000000 00000000 00000000 00000000 00000000 00000000 00000000 ................................ 000040
 00000000 00000000 00000000 00000000 00000000 00000000 00000000 00000000 ................................ 000060
 00000000 00000000 00000000 00000000 00000000 00000000 00000000 00000000 ................................ 000080
 00000000 00000000 00000000 00000000 00000000 00000000 00000000 00000000 ................................ 0000A0
 00000000 00000000 00000000 00000000 00000000 00000000 00000000 00000000 ................................ 0000C0
 00000000 00000000 00000000 00000000 00000000 00000000 00000000 00000000 ................................ 0000E0
 00000000 00000000 00000000 00000000 00000000 00000000 00000000 00000000 ................................ 000100
 00000000 00000000 00000000 00000000 00000000 00000000 00000000 00000000 ................................ 000120
 00000000 00000000 00000000 00000000 00000000 00000000 00000000 00000000 ................................ 000140
 00000000 00000000 00000000 00000000 00000000 00000000 00000000 00000000 ................................ 000160
 00000000 00000000 00000000 00000000 00000000 00000000 00000000 00000000 ................................ 000180
 00000000 00000000 00000000 00000000 00000000 00000000 00000000 00000000 ................................ 0001A0
 00000000 00000000 00000000 00000000 00000000 00000000 00000000 00000000 ................................ 0001C0
 00000000 00000000 00000000 00000000 00000000 00000000 00000000 00000000 ................................ 0001E0

Dump of file SATURN:[PCCOMMON.DUMP.DLL]SA-XPORT.DLL;1 on 18-APR-1990 08:23:46.62
File ID (460,18,0)   End of file block 63 / Allocated 64

Virtual block number 57 (00000039), 512 (0200) bytes

 00000000 00000000 00000000 00000000 00000000 00000000 00000000 00000000 ................................ 000000
 00000000 00000000 00000000 00000000 00000000 00000000 00000000 00000000 ................................ 000020
 00000000 00000000 00000000 00000000 00000000 00000000 00000000 00000000 ................................ 000040
 00000000 00000000 00000000 00000000 00000000 00000000 00000000 00000000 ................................ 000060
 00000000 00000000 00000000 00000000 00000000 00000000 00000000 00000000 ................................ 000080
 00000000 00000000 00000000 00000000 00000000 00000000 00000000 00000000 ................................ 0000A0
 00000000 00000000 00000000 00000000 00000000 00000000 00000000 00000000 ................................ 0000C0
 00000000 00000000 00000000 00000000 00000000 00000000 00000000 00000000 ................................ 0000E0
 00000000 00000000 00000000 00000000 00000000 00000000 00000000 00000000 ................................ 000100
 00000000 00000000 00000000 00000000 00000000 00000000 00000000 00000000 ................................ 000120
 00000000 00000000 00000000 00000000 00000000 00000000 00000000 00000000 ................................ 000140
 00000000 00000000 00000000 00000000 00000000 00000000 00000000 00000000 ................................ 000160
 00000000 00000000 00000000 00000000 00000000 00000000 00000000 00000000 ................................ 000180
 00000000 00000000 00000000 00000000 00000000 00000000 00000000 00000000 ................................ 0001A0
 00000000 00000000 00000000 00000000 00000000 00000000 00000000 00000000 ................................ 0001C0
```

```
00000000 00000000 00000000 00000000 00000000 00000000 00000000 00000000 ................................ 0001E0

Dump of file SATURN:[PCCOMMON.DUMP.DLL]SA-XPORT.DLL;1 on 18-APR-1990 08:23:46.62
File ID (460,18,0)   End of file block 63 / Allocated 64

Virtual block number 58 (0000003A), 512 (0200) bytes

00000000 00000000 00000000 00000000 00000000 00000000 00000000 00000000 ................................ 000000
00000000 00000000 00000000 00000000 00000000 00000000 00000000 00000000 ................................ 000020
00000000 00000000 00000000 00000000 00000000 00000000 00000000 00000000 ................................ 000040
00000000 00000000 00000000 00000000 00000000 00000000 00000000 00000000 ................................ 000060
00000000 00000000 00000000 00000000 00000000 00000000 00000000 00000000 ................................ 000080
00000000 00000000 00000000 00000000 00000000 00000000 00000000 00000000 ................................ 0000A0
00000000 00000000 00000000 00000000 00000000 00000000 00000000 00000000 ................................ 0000C0
00000000 00000000 00000000 00000000 00000000 00000000 00000000 00000000 ................................ 0000E0
00000000 00000000 00000000 00000000 00000000 00000000 00000000 00000000 ................................ 000100
00000000 00000000 00000000 00000000 00000000 00000000 00000000 00000000 ................................ 000120
00000000 00000000 00000000 00000000 00000000 00000000 00000000 00000000 ................................ 000140
00000000 00000000 00000000 00000000 00000000 00000000 00000000 00000000 ................................ 000160
00000000 00000000 00000000 00000000 00000000 00000000 00000000 00000000 ................................ 000180
00000000 00000000 00000000 00000000 00000000 00000000 00000000 00000000 ................................ 0001A0
00000000 00000000 00000000 00000000 00000000 00000000 00000000 00000000 ................................ 0001C0
00000000 00000000 00000000 00000000 00000000 00000000 00000000 00000000 ................................ 0001E0

Dump of file SATURN:[PCCOMMON.DUMP.DLL]SA-XPORT.DLL;1 on 18-APR-1990 08:23:46.62
File ID (460,18,0)   End of file block 63 / Allocated 64

Virtual block number 59 (0000003B), 512 (0200) bytes

00000000 00000000 00000000 00000000 00000000 00000000 00000000 00000000 ................................ 000000
1C3C22EE 00000000 000003A6 139C0000 00000000 00000000 00000000 00000000 ....................Ì.......Ÿ"<. 000020
0078005A 003B001E FFFF0101 00000000 19BA22EE 19B622EE 19B222EE 19AE22EE Ÿ"Ú.Ÿ"ý.Ÿ"Ñ.Ÿ"o...........;.Z.x. 000040
00D30084 00960077 0059003A 001EFFFF 0160014E 01300111 00F30004 00B50097 ..ç.Å.µ...0.N.m.....:.Y.w...Ç.Æ. 000060
00010000 00000000 00000000 00000000 0200FFFF FFFF016C 0140012F 011000F2 ·.../.M.l....................... 000080
00000000 00000000 00000000 00000000 00000000 00000000 00008181 81010000 ................................ 0000A0
00000000 00000000 00000000 00000000 00000000 00000000 00000000 00000000 ................................ 0000C0
00000000 00000000 00000000 00000000 00000000 00000000 00000000 00000000 ................................ 0000E0
00000000 00000000 00000000 00000000 00000000 00000000 00000000 00000000 ................................ 000100
00000000 00000000 00000000 00000000 00000000 00000000 00000000 00000000 ................................ 000120
00000000 00000000 00000000 00000000 00000000 00000000 00000000 00000000 ................................ 000140
00000000 00000000 00000000 00000000 00000000 00000000 00000000 00000000 ................................ 000160
00000000 00000000 00000000 00000000 00000000 00000000 00000000 00000000 ................................ 000180
0A0A0A0A 0A0A0A0A 0A0A0A0A 0A0A0A0A 0A0A0A0A 0A0A0A0A 0A0A0A0A 0A000000 ................................ 0001A0
0A0A0A0A 0A0A0A0A 0A0A0A0A 0A0A0A0A 0A0A0A0A 0A0A0A0A 0A0A0A0A 0A0A0A0A ................................ 0001C0
0A0A0A0A 0A0A0A0A 0A0A0A0A 0A0A0A0A 0A0A0A0A 0A0A0A0A 0A0A0A0A 0A0A0A0A ................................ 0001E0

Dump of file SATURN:[PCCOMMON.DUMP.DLL]SA-XPORT.DLL;1 on 18-APR-1990 08:23:46.62
File ID (460,18,0)   End of file block 63 / Allocated 64

Virtual block number 60 (0000003C), 512 (0200) bytes

0A0A0A0A 0A0A0A0A 0A0A0A0A 0A0A0A0A 0A0A0A0A 0A0A0A0A 0A0A0A0A 0A0A0A0A ................................ 000000
0A0A0A0A 0A0A0A0A 0A0A0A0A 0A0A0A0A 0A0A0A0A 0A0A0A0A 0A0A0A0A 0A0A0A0A ................................ 000020
0A0A0A0A 0A0A0A0A 0A0A0A0A 0A0A0A0A 0A0A0A0A 0A0A0A0A 0A0A0A0A 0A0A0A0A ................................ 000040
0A0A0A0A 0A0A0A0A 0A0A0A0A 0A0A0A0A 0A0A0A0A 0A0A0A0A 0A0A0A0A 0A0A0A0A ................................ 000060
0A0A0A0A 0A0A0A0A 0A0A0A0A 0A0A0A0A 0A0A0A0A 0A0A0A0A 0A0A0A0A 0A0A0A0A ................................ 000080
00000000 00000000 00000000 00000000 00000000 00000000 00000000 000A0A0A ................................ 0000A0
1C4CFFFF 00000000 00000000 00000000 0000FFFF 22F40000 20000000 00000000 ....... ..¶"..................L. 0000C0
65766F20 6B636174 73202D0A 0D303030 36520000 3E3E4753 4D4E3C3C FFFF1C4E N...<<NMSG>>..R6000..- stack ove 0000E0
64697669 64207265 6765746E 69202D0A 0D333030 36520003 000A0077 6F6C6672 rflow.....R6003..- integer divid 000100
73206867 756F6E65 20746F6E 20202D0A 38303036 52000800 0A0D3020 79622065 e by 0.....R6008..- not enough s 000120
20200A00 39303036 52000900 0A0D7374 6E656075 67726120 726F6620 65636170 pace for arguments.....R6009..-  000140
746E6560 6E6F7269 766E6520 726F6620 65636170 73206867 756F6E65 20746F6E not enough space for environment 000160
30303652 00020020 726F7272 6520656D 6974206E 757200FF 000A0000 FC000A00 ...=......run-time error ...R600 000180
0A006465 64616F6C 20746F6E 20746E69 6F702067 6E697461 6F6C6620 200A0032 2..- floating point not loaded.. 0001A0
00000000 000719> 00020000 000607B6 00020000 0005198E 00020003 FFFFFF00 ........f.......Ñ.......Ê....... 0001C0
```

```
 20656061 6E656C69 46180001 00010001 00010001 00010001 00010001 00010352 R.......................Filename  0001E0

Dump of file SATURN:[PCCOMMON.DUMP.DLL]SA-XPORT.DLL;1 on 18-APR-1990 08:23:46.62
File ID (460,18,0)   End of file block 63 / Allocated 64

Virtual block number 61 (00000030), 512 (0200) bytes

 676E696E 65706F20 726F7272 45100064 65696669 63657073 20656220 7473756D must be specified..Error opening 000000
 70786520 726F6620 6E6F6973 7265562A 00646569 66696365 70732065 6C696620  file specified.*Version for exp 000020
 656C6946 2C006465 69666963 65707320 65622074 73756020 656C6966 2074726F ort file must be specified.,File 000040
 70732065 62207473 75602065 6C696620 74726F70 78652072 6F662065 70797420  type for export file must be sp 000060
 00656C62 616C6961 76612074 65792074 6F6E2070 6C654817 00646569 66696365 ecified..Help not yet available. 000080
 00000000 00203A65 6C694620 6F742064 6574656C 70606F43 2074726F 70784518 .Export Completed to File: ..... 0000A0
 20726F72 72451E00 64696C6D 6420676E 696E6961 74626F20 726F7272 45160352 R..Error obtaining dmlid..Error  0000C0
 6120726F 7272451B 00796568 20657461 676F7272 75732067 6E696E69 6174626F obtaining surrogate key..Error a 0000E0
 69617462 6F20726F 72724528 00656C62 61742068 73616820 6F742067 6E696464 dding to hash table.(Error obtai 000100
 72452400 6C6D6420 6D6F7266 20737463 656A626F 2074726F 70786520 676E696E ning export objects from dml.$Er 000120
 656C6261 74206549 206F7420 656C646E 61682067 6E696E69 6174626F 20726F72 ror obtaining handle to le table 000140
 72207461 6D726F66 20656C62 61697261 56200052 58562E05 00524156 2E050073 s...VAR...VXR.-Variable format r 000160
 7869462A 006E6F69 736E6574 78652065 6C696620 5241562E 20736572 69757165 equires .VAR file extension.*Fix 000180
 74786520 656C6966 20525856 2E207365 72697571 65722074 6160726F 66206465 ed format requires .VXR file ext 0001A0
 656C6C65 636E6163 206E6F69 74636E75 66207472 6F707845 1A006E6F 69736E65 ension..Export function cancelle 0001C0
 6E6F6973 6E657478 65205241 562E2065 76616820 7473756D 20656C69 461F0064 d..File must have .VAR extension 0001E0

Dump of file SATURN:[PCCOMMON.DUMP.DLL]SA-XPORT.DLL;1 on 18-APR-1990 08:23:46.62
File ID (460,18,0)   End of file block 63 / Allocated 64

Virtual block number 62 (0000003E), 512 (0200) bytes

 00000000 00000100 01000100 01006C65 646F6D20 676E6974 726F7078 4510002E ...Exporting model.............. 000000
 004E9400 0090022A 00060001 00000011 00000000 FFFF0001 000E0352 000002AB ...R....................*.....N. 000020
 009C0008 80010001 0235000A 00050000 00000000 0231FFFF 01F400AB 00080010 ..A...¶...1...........5......... 000040
 0040009C 00488002 000C0240 00050006 00000000 0000FFFF FFFF01F5 00080036 6...%...............@.....H...@. 000060
 00080050 00900008 80010001 02460013 00050000 00000000 FFFFFFFF 01F60008 ..-.................F.........P... 000080
 01F80008 0084009C 00548001 0001025A 00000005 00000000 0000FFFF FFFF01F7 %...............Z.....T.......%. 0000A0
 FFFF01F9 0008002. 0084000C 80010001 02580005 00050000 00000000 FFFFFFFF ...............[.........*... 0000C0
 FFFFFFFF 01FA0038 00580048 000C8000 00000261 00000007 00000000 0000FFFF ...........a........H.X.8.*..... 0000E0
 0000FFFF FFFF01FB 00080040 00840074 80010001 02620008 00050000 00000000 ..........b.....t...@...«....... 000100
 00000000 FFFFFFFF 01FC0038 00580048 00748000 0000026E 00000007 00000000 .........n.....t.H.X.8.*......... 000120
 00000000 0000FFFF FFFF01FD 00200050 0024000C 80010002 026F0007 00050000 ......o.......$.P. .»........... 000140
 00030000 00000000 FFFFFFFF 01FE000C 0020002A 00108002 00040277 00040003 ....w.......*. ...*............. 000160
 00090005 00000000 0000FFFF FFFF01FF 000C0020 002A0038 80020004 027C0004 ..|.....8.*. ................... 000180
 02880006 00030000 00000000 FFFFFFFF 02000020 00700024 00648001 00020281 ......d.$.p. ................... 0001A0
 00040292 00090003 00000000 0000FFFF FFFF0201 000A0028 002C0068 80020004 ....h.,.(....................... 0001C0
 80030400 029C0002 00030000 00000000 FFFFFFFF 0202000A 0034002C 00968002 ....,.4......................... 0001E0

Dump of file SATURN:[PCCOMMON.DUMP.DLL]SA-XPORT.DLL;1 on 18-APR-1990 08:23:46.62
File ID (460,18,0)   End of file block 63 / Allocated 64

Virtual block number 63 (0000003F), 512 (0200) bytes

 00588002 0000029F 00060003 00000000 0000FFFF FFFF0001 000C0026 000C0028 (...&.........................X. 000000
 000C0088 80020100 02A60004 00030000 00000000 FFFFFFFF 0002000C 0026000C ..&.....................|......... 000020
 003A656D 616E2065 6C694600 00000300 74726F70 7845FFFF FFFF0203 000C0026 &.........Export.....File name:. 000040
 73656C69 46000020 3A79726F 74636572 69642074 6E657272 75430052 41562E2A *.VAR.Current directory: ..Files 000060
 312E327E 00312E33 7E006E6F 69737265 56000073 6569726F 74636572 69440000 ..Directories..Version.-3.1.-2.1 000080
 430048 4F 00656C62 61697261 567E0064 65786946 7E006570 79542065 6C694600 .File Type.-Fixed.-Variable.OK.C 0000A0
 00000000 00000000 00000000 00000000 00000000 2200706C 6548006C 65636E61 ancel.Help."................... 0000C0
 00000000 00000000 00000000 00000000 00000000 00000000 00000000 00000000 ................................ 0000E0
 00000000 00000000 00000000 00000000 00000000 00000000 00000000 00000000 ................................ 000100
 00000000 00000000 00000000 00000000 00000000 00000000 00000000 00000000 ................................ 000120
 00000000 00000000 00000000 00000000 00000000 00000000 00000000 00000000 ................................ 000140
 00000000 00000000 00000000 00000000 00000000 00000000 00000000 00000000 ................................ 000160
 00000000 00000000 00000000 00000000 00000000 00000000 00000000 00000000 ................................ 000180
 00000000 00000000 00000000 00000000 00000000 00000000 00000000 00000000 ................................ 0001A0
 00000000 00000000 00000000 00000000 00000000 00000000 00000000 00000000 ................................ 0001C0
```

031000 .................................. 00000000 00000000 00000000 00000000 00000000 00000000 00000000 00000000

```
Dump of file SATURN:[PCCOMMON.DUMP.DLL]EVFORM.TMP;1 on 18-APR-1990 10:45:53.65
File ID (651,22,0)   End of file block 5 / Allocated 8

Virtual block number 1 (00000001), 512 (0200) bytes

 00000000 00000040 00000000 000000B8 0000FFFF 00000004 00000001 01795A40 MZy.............¡........ə....... 000000
 00000080 00000040 00000000 00000000 00000000 00000000 00000000 00000000 ................................ 000020
 6F6E6E61 63206061 72676F72 70207369 685421CD 4C01B821 CD09B400 0EBA1F0E ..¤..Ç.é!¡.L╚!This program canno 000040
 00000000 00000024 3A00002E 65646F6D 20534F44 206E6920 6E757220 65622074 t be run in DOS mode....$....... 000060
 00000004 00000000 00020000 00000000 00038009 E8037824 0007006E 0505454E NE..n...$x.Ò.................... 000080
 00000000 00000000 C0010001 00040000 000000F5 006E006E 00640060 00400039 9.ə.'.d.n.n.%................... 0000A0
 07131EB1 07130018 00020E21 00000000 000F0F00 000F0016 001A0F00 001A0013 ....................!.......Ÿ... 0000C0
 4153204D 5020322F 534F2000 00000003 01010000 004D524F 46564506 01000004 .....EVFORM.......... OS/2 PM SA 0000E0
 4F46544E 45564512 00006072 6F462074 6E657645 20676E69 72656767 69725420  Triggering Event Form...EVENTFO 000100
 E90000B8 D88EFFFF B81E5657 000000C8 00000000 01504152 5453544F 4F424052 RMBOOTSTRAP.....à...WV.¡...Ä¡..Ô 000120
 00000000 00000000 00000000 00000003 00080002 00019000 04CAC95F 5E1F0000 ...^_èò......................... 000140
 00000000 00000000 00000300 02000200 01CB0001 B81F0000 3E89D88E FFFFB81E .¡...Á.>...¡..ù................. 000160
 00A79400 009005CC 00000001 00000030 00000000 FFFF0001 000E0352 00000713 ....R............0.......ä.....Ī. 000180
 02770009 80010001 05010004 00050000 00000000 05CDFFFF 0100028A 0107FFC0 à.........e...........ī.......w. 0001A0
 00EA0267 00008002 00080506 00000006 00000000 0000FFFF FFFF0104 00080060 '..................■.......g.õ. 0001C0
 00080060 020A0008 80010001 05D70008 00050000 00000000 FFFFFFFF 01050008 .....................■.........'... 0001E0

Dump of file SATURN:[PCCOMMON.DUMP.DLL]EVFORM.TMP;1 on 18-APR-1990 10:45:53.65
File ID (651,22,0)   End of file block 5 / Allocated 8

Virtual block number 2 (00000002), 512 (0200) bytes

 01190018 00EA01EA 000F8002 000805E3 00000006 00000000 0000FFFF FFFF0118 .................D.......ŏ.õ..... 000000
 FFFF0122 006700EE 0179000E 80000002 05E40008 00050000 00000000 FFFFFFFF ..............ö.......y.Ÿ.g."... 000020
 FFFFFFFF 01230008 006001CD 00178001 000105ED 00070005 00000000 0000FFFF ..........Ù.......ë.'...#..... 000040
 0000FFFF FFFF0124 00080080 01BF0019 80020008 05F50000 00060000 00000000 ..........¥......e.¯...$....... 000060
 00000000 FFFFFFFF 01250008 006001B0 001A8001 000105F6 00080005 00000000 ........-.......¯.'...%......... 000080
 00000000 0000FFFF FFFF0126 003000B4 0170001A 80000000 05FF0000 00070000 ...............).Ç.0.&........... 0000A0
 00030000 00000000 FFFFFFFF 0127000C 002401C0 00038002 04000600 00030003 ..........£.á.$...'.............. 0000C0
 00060003 00000000 0000FFFF FFFF0128 000C0024 01A90003 80020000 06040007 ........£.`.$...(................ 0000E0
 06130005 00050000 00000000 FFFFFFFF 0129000C 00240190 00028002 0000060C ......■...$...)................. 000100
 00010619 00040005 00000000 0000FFFF FFFF014A 005C00EE 00300004 80000002 ......0.Ÿ.\.J.................... 000120
 80020008 061E0000 00060000 00000000 FFFFFFFF 01480008 0060007B 000C8001 ....(.'...K...................... 000140
 00088001 0001061F 00050005 00000000 0000FFFF FFFF014C 0008005C 0071000E ..q.\...L........................ 000160
 00340008 80000000 06250000 00070000 00000000 FFFFFFFF 01400008 00[illegible]0063 c.'...M...............%.......4. 000180
 00240070 00C88002 04000626 00030003 00000000 0000FFFF FFFF014E 003[illegible]060 '.0.N...............&.....à.p.$. 0001A0
 000C0024 005C00C8 80020000 062A0007 00030000 00000000 FFFFFFFF 014F[illegible]0C ..0...............*.....à.\.$... 0001C0
 0151000C 00240048 00C88002 00000632 00060003 00000000 0000FFFF FFFF0150 P...............2.....à.H.$...Q. 0001E0

Dump of file SATURN:[PCCOMMON.DUMP.DLL]EVFORM.TMP;1 on 18-APR-1990 10:45:53.65
File ID (651,22,0)   End of file block 5 / Allocated 8

Virtual block number 3 (00000003), 512 (0200) bytes

 FFFF03C5 000800A0 02530008 80010001 06390000 00050000 00000000 FFFFFFFF ...............9.......S.....é... 000000
 FFFFFFFF 03C60008 00E50243 00008002 00080647 00040006 00000000 0000FFFF .............G.......C.Ì...ó..... 000020
 0000FFFF FFFF03CC 00080041 022D000C 80010001 064C0007 00050000 00000000 ..........L.......-.A...à........ 000040
 00000000 FFFFFFFF 03C00008 000E021E 00008002 00080654 00040006 00000000 ........T..........B...ë.......... 000060
 00000000 0000FFFF FFFF03CE 000000FC 00950008 80010002 0659000A 00050000 ......Y.........■.Ì.ö........... 000080
 00030000 00000000 FFFFFFFF 03CF000A 00530158 00188002 00030664 00110003 ....d.......[.S...ü............. 0000A0
 000A0003 00000000 0000FFFF FFFF0300 000A0068 010B0011 80020003 06760014 ..v.........k...Å............... 0000C0
 06960010 00030000 00000000 FFFFFFFF 0301000A 004000E2 00138002 00030688 ........ã.ə...ì................. 0000E0
 000806A7 00040006 00000000 0000FFFF FFFF0302 000A0056 00860011 80020003 ......Ñ.V...■................Ì... 000100
 80020008 06AC0004 00060000 00000000 FFFFFFFF 0303001E 006C00F3 00808002 ....µ.l...Æ...................¯..... 000120
 00808002 00080681 00040006 00000000 0000FFFF FFFF0304 001E0068 00C9008C ..è.k...Å...............Ÿ....... 000140
 015D0088 80010001 06860009 00050000 00000000 FFFFFFFF 03050021 006C0090 ..ℓ.l.ƒ................Ñ.......]. 000160
 00350145 00888001 000106C0 000A0005 00000000 0000FFFF FFFF0306 00080059 Y...■..................à.......E.5. 000180
 002A0070 011A0088 80020000 06CB0000 00070000 00000000 FFFFFFFF 03070008 ..■................ù.........p.*. 0001A0
 03090008 006A0151 008F8002 000806CC 00040006 00000000 0000FFFF FFFF0308 Ä..................ä.......Q.j...\. 0001C0
 FFFF03E2 002800E8 00040006 80010002 06D10004 00050000 00000000 FFFFFFFF ...............ì.........$.(.ã... 0001E0
```

```
Dump of file SATURN:[PCCOMMON.DUMP.DLL]EVFORM.TMP;1 on 18-APR-1990 10:45:53.65
File ID (651,22,0)   End of file block 5 / Allocated 8

Virtual block number 4 (00000004), 512 (0200) bytes

 FFFFFFFF 03E30008 00250013 00088001 00010606 00070005 00000000 0000FFFF .............#.........%...D..... 000000
 0000FFFF FFFF03E4 00080027 00080000 80010001 060E0007 00050000 00000000 ..........8.........'...ð....... 000020
 00000000 FFFFFFFF 03E50008 0014001E 003F8001 000106E6 00040005 00000000 ........|.....?........|......... 000040
 00000000 0000FFFF FFFF03E6 00080014 0010005E 80010001 06E80004 00050000 ......$.....^........|........... 000060
 00050000 00000000 FFFFFFFF 03E70008 001C001E 007D8001 000106F0 00040005 ....Þ.....}.......ð............. 000080
 00040005 00000000 0000FFFF FFFF0384 00080014 00140038 80010001 06F50004 ..%.....;......................... 0000A0
 06FF0004 00050000 00000000 FFFFFFFF 03E80008 00140009 003F8001 000106FA •.....?.......ð................. 0000C0
 00010704 00040005 00000000 0000FFFF FFFF03E9 00080014 0014005E 80010001 ....^.......ð.................... 0000E0
 80010001 07090004 00050000 00000000 FFFFFFFF 03EA0008 00140008 00608001 ..'.......ð...................... 000100
 00838001 0001070E 00040005 00000000 0000FFFF FFFF0385 00080014 00140080 ................................. 000120
 69747069 72637365 44000065 60614E00 00000000 FFFFFFFF 03E80008 00140008 ......$..........Name..Descripti 000140
 00007360 796E6F6E 79530000 60796E6F 6E795300 736D796E 6F6E7953 00006E6F on..Synonyms.Synonym..Synonyms.. 000160
 4E000065 746F4E00 7365746F 4E006574 656C6544 00656361 6C706552 00646441 Add.Replace.Delete.Notes.Note..N 000180
 73736563 6F725000 6574656C 65440065 63616C70 65520064 64410000 7365746F otes..Add.Replace.Delete.Process 0001A0
 5420746E 65764500 74786554 00737365 636F7250 00747865 54006C65 646F4D20  Model.Text.Process.Text.Event T 0001C0
 656C6143 2F68636F 6C43006C 61766972 72412077 6F6C4620 6F666E49 00657079 ype.Info Flow Arrival.Clock/Cale 0001E0

Dump of file SATURN:[PCCOMMON.DUMP.DLL]EVFORM.TMP;1 on 18-APR-1990 10:45:53.65
File ID (651,22,0)   End of file block 5 / Allocated 8

Virtual block number 5 (00000005), 512 (0200) bytes

 65726F74 53206F66 6E490074 6E657645 20726573 5500746E 65764520 7261646E ndar Event.User Event.Info Store 000000
 00776F6C 46206F66 6E490074 78655400 74786554 00747865 5400746E 65764520  Event.Text.Text.Text.Info Flow. 000020
 70550064 65746165 7243006F 666E4900 74786554 00007377 6F6C4620 6F666E49 Info Flows..Text.Info.Created.Up 000040
 54007478 65540074 78655400 72657355 00656069 54006574 61440064 65[illegible]6164 dated.Date.Time.User.Text.Text.T 000060
 00000000 00000000 00000000 00007478 65540074 78655400 74786554 00747865 ext.Text.Text.Text.............. 000080
 00000000 00000000 00000000 00000000 00000000 00000000 00000000 00000000 ................................ 0000A0
 00000000 00000000 00000000 00000000 00000000 00000000 00000000 00000000 ................................ 0000C0
 00000000 00000000 00000000 00000000 00000000 00000000 00000000 00000000 ................................ 0000E0
 00000000 00000000 00000000 00000000 00000000 00000000 00000000 00000000 ................................ 000100
 00000000 00000000 00000000 00000000 00000000 00000000 00000000 00000000 ................................ 000120
 00000000 00000000 00000000 00000000 00000000 00000000 00000000 00000000 ................................ 000140
 00000000 00000000 00000000 00000000 00000000 00000000 00000000 00000000 ................................ 000160
 00000000 00000000 00000000 00000000 00000000 00000000 00000000 00000000 ................................ 000180
 00000000 00000000 00000000 00000000 00000000 00000000 00000000 00000000 ................................ 0001A0
 00000000 00000000 00000000 00000000 00000000 00000000 00000000 00000000 ................................ 0001C0
 00000000 00000000 00000000 00000000 00000000 00000000 00000000 00000000 ................................ 0001E0
```

Dump of file SATURN:[PCCOMMON.DUMP.DLL]ERR.TMP;1 on 18-APR-1990 10:45:48.49
File ID (648,17,0)   End of file block 33 / Allocated 36

Virtual block number 1 (00000001), 512 (0200) bytes

```
 00000000 00000040 00000000 00000088 0000FFFF 00000004 00000021 01565A4D MZV.!...........¡.......a....... 000000
 00000080 00000000 00000000 00000000 00000000 00000000 00000000 00000000 ................................ 000020
 6F6E6E61 6320'061 72676F72 70207369 685421CD 4C01B821 CD09B400 0EBA1F0E ..o..Ç.el¡.LeIThis program canno 000040
 00000000 00000024 0A0D0D2E 65646F6D 20534F44 206E6920 6E757220 65622074 t be run in DOS mode....$....... 000060
 0007000C 00000000 00040000 00000000 00088005 B1AD0E53 00190163 0505454E NE..c...S.ÜY.................... 000080
 00000000 00000000 00010001 00040000 000001FC 010800FA 00A400A0 00400014 ..a...É.•...=................... 0000A0
 00110F00 00110099 02B60F00 02B6006A 00C20F00 00C2005A 032C0F00 032C0021 !.,...,.Z.ô...ô.j.Ñ...Ñ......... 0000C0
 002C0F00 002A0263 18F60F00 18F600CD 00040E00 000400CC 02840F00 0283009C ........ä.......ë.-...-.c.•...,. 0000E0
 00871EB1 00870416 1C600F21 1ACC0267 020C0E21 00000000 00080E01 00000000 ............!...g.ä.!.'.....Ÿ... 000100
 52524554 45475252 455F0F00 01474F4C 54425252 45080000 52524503 00010005 .....ERR...ERRBTLOG..._ERRGETERR 000120
 44444152 52450C00 L34E4654 49584545 564F4D45 52525245 0F000247 534D524F ORMSG...ERRREMOVEEXITFÑ...ERRADD 000140
 000E000A 00010000 05504254 4E455241 50544547 5252450E 00044E46 . '495845 EXITFN...ERRGETPARENTBP......... 000160
 05534C4C 41434555 51084753 4D03534C 4C414353 4F440800 004E0030 0L '0017 ....0.N...DOSCALLS.MSG.QUECALLS. 000180
 45534142 53554207 52545045 54414449 4C41564C 54550E4C 5455034E 495 '4D50 PMWIN.UTL.UTLVALIDATEPTR.BUSBASE 0001A0
 5257534F 44084F49 5303454D 414E4C4C 44535953 42555359 52455551 53554215 .BUSQUERYSUBSYSDLLNAME.SIO.DOSWR 0001C0
 4D535710 00000000 03060100 00030173 03010200 00030301 010B0305 01455449 ITE...Ü.........s..Ÿ.........WSM 0001E0
```

Dump of file SATURN:[PCCOMMON.DUMP.DLL]ERR.TMP;1 on 18-APR-1990 10:45:48.49
File ID (648,17,0)   End of file block 33 / Allocated 36

Virtual block number 2 (00000002), 512 (0200) bytes

```
 00003E83 D88EFFFF 881E5657 000006C8 0000006D 65747379 7320726F 72724520  Error system...à...WV.¡...Ä.>.. 000000
 89FA4689 C0280000 16880000 FE46C700 0000029A 006A006A 036A0008 E9037400 .t.Õ..j.j.j..@...ÚF±......+à.F•. 000020
 47082607 8826FA5E C4007BE9 0372FE46 390002A1 0AFA4683 FE46FF00 07E9FC56 V•Õ...F±.F•.À..9F±r.Õ(.á^•&..&.G 000040
 E9037500 067E8300 0FE90374 01087F83 26FA5EC4 0035E9FF DCE90006 E9037402 .t.Õ..ÕÉ.ÕS.á^•&....t.Õ...-..u.Õ 000060
 A4E90003 E9037400 067E830C 0CE90374 02087F83 26FA5EC4 0019E9FF C0E90006 ..Õä.Õ..á^•&....t.Õ...-..t.Õ..ÕÉ 000080
 260677FF 26FA5EC4 0017E903 7400003D 0000FFFF 9A37FF26 0277FF26 FA5EC4FF .á^•&.w.&.7.....=..t.Õ..á^•&.w.& 0000A0
 6A006A03 6A0000FF FF9A0000 36FFFF73 E906C483 1FFF26FA 5EC40676 FF0477FF .w..v.á^•&...á.Õs..6.......j.j.j 0000C0
 7510460B 0E4688D8 8E000888 1E565700 0006C800 02CAC95F 5E1F0000 FFFF9A00 .......^_èò..à...WV.¡...Á.F..F.u 0000E0
 FC468000 5FE983CF B80006E9 03750000 3D000000 9C9A0E76 FF1076FF 0013E903 .Õ...v..v̄......=..u.Õ..¡ü.Õ ..F= 000100
 4688FC5E C40041E9 FA468800 06E90375 00003DFA 468904C4 83FFFF01 E39A5016 .P.D....á..F•=..u.Õ...F•ÕA.Ã^=.F 000120
 88FC5EC4 06578926 04478926 0C56880A 4688FC5E C4025789 26078926 1056880E ..V.&..&.W.á^•.F..V.&.G.&.W.á^•. 000140
 C95F5E1F 0000E900 00880257 89260789 26FE5688 FC468806 5EC40847 89261246 F.&.G.á^..F•.V±&..&.W.¡..Õ...^_è 000160
 76FFFE76 FFFE5689 FC468908 56880646 88D88E00 E5881E56 57000004 C80010CA ò..à...WV.¡|..Á.F..V..F•.V±.V±̄.v 000180
 83C98800 06E90374 02470826 078826FC 5EC4000F E9037400 00300000 00FB9AFC •.«...=..t.Õ..á^•&..&.G.t.Õ..¡è. 0001A0
 04681E07 89260247 89260000 88FC5EC4 0000FFFF 9AFF6AFF 6A000468 1E0029E9 Õ)..h..j.j......á^•¡..&.G.&...h. 0001C0
 83088E01 7B881E56 57000006 C80004CA C95F5E1F 0000E900 00880000 FFFF9A00 ......¡..Õ...^_èò..à...WV.¡(..Á. 0001E0
```

Dump of file SATURN:[PCCOMMON.DUMP.DLL]ERR.TMP;1 on 18-APR-1990 10:45:48.49
File ID (648,17,0)   End of file block 33 / Allocated 36

Virtual block number 3 (00000003), 512 (0200) bytes

```
 CAB80006 E9037500 00300000 FFFF9A00 6A000068 1E326A00 4CE90374 0000003E >...t.ÕL.j2.h..j......=..u.Õ..¡ò 000000
 83FFFF01 249AFA76 FFFC76FF 006A326A FC5689FA 4689C02B 0000168B 0112E983 .Õ......+à.F•.V=j2j..v•.v•.$.... 000020
 01BC9AFF 6AFF6A00 04681E00 0000109A FFFF6801 1568016A 00050002 06C708C4 á.ú.....j.h..h........h..j.j..¥. 000040
 0002A10A FA4683FE 46FF0007 E9FC5689 FA4689C0 28000016 880000FE 46C70000 ..úF±......+à.F•.V=Õ...F±.F•.À.. 000060
 FC5688FA 4688065E C4001FE9 03740247 08260788 26FA5EC4 0031E903 72FE4639 9F±r.Õ1.á^•&..&.G.t.Õ..á^..F•.V• 000080
 E001C888 0002A1FF 8DE90080 E9000088 00000102 9A000468 1E025789 26078926 &..&.W..h...@...¡..Õ..Õ§.À...àÍÁ 0000A0
 55E983CA B80006E9 03750000 300000FF FF9A0000 36FF5000 3205E001 C103E001 ÍÁ.èÍÁ.2.P.6.......=..u.Õ..¡ò.ÕU 0000C0
 FC5689FA 4689D30B C10BC92B 00001E88 D22BE001 C103E001 E001C888 0002A100 .À...àÍÁÍÁ.èÍÁ+@....+è.è.Æ.F•.V• 0000E0
 89260789 26FC5688 FA468806 5EC408C4 83022D01 249AFA76 FFFC76FF 006A326A j2j..v•.v•.$.-..á.á^..F•.V=&..&. 000100
 0002000B 90CBC95F 5E1F0000 E9000088 0000029C 9A000468 1E050002 06830257 W.......h.......¡..Õ...^_èü..... 000120
 0002008D 0001031C 0103008C 0001024E 01030007 00010241 01030000 0001023B ;.......A.......N............... 000140
 01030022 00010202 01030000 000901EB 00020000 0001023E 00050000 000702FD ».......>.......Š...........".. 000160
 00000000 00000000 00000021 00050192 02030027 000100C7 01030026 0001028F «...&...ú...'.......!........... 000180
 7500003D FFFF0000 9A0206A3 2606468B 19E2068E D88EFFFF 881E5657 000000C8 à...WV.¡...À..ã..F.&É.......=..u 0001A0
 00E90001 B8004206 FF0000FF FF9AFFFF 68FFFF68 016A0017 E9000088 0006E903 .Õ..¡..Õ..j.h..h.........B.¡..Õ. 0001C0
 001A01A6 9A0005E9 03740042 0EFFD88E 0008881E 56570000 00C8C8C9 5F5E1F00 ..^_èùà...WV.¡...Ä..B.t.Õ...Í... 0001E0
```

```
Dump of file SATURN:[PCCOMMON.DUMP.DLL]ERR.TMP;1 on 18-APR-1990 10:45:48.49
File ID (648,17,0)   End of file block 33 / Allocated 36

Virtual block number 4 (00000004), 512 (0200) bytes

 5EC4D88E 004E881E 56570000 00C80002 CAC95F5E 1F000000 339A006A 006A036A j.j.j..3....^_èò..à...WV.¡N..Äá^ 000000
 8E006A00 6A0021E9 04C483FF FF008C9A 0876FF0A 76FF0011 E9037500 3F802608 .&.?.u.Õ...v..v.......á.Õl.j.j.. 000020
 C95F5E1F 0000E900 00FFFF9A 0876FF0A 76FF0C76 FF0676FF 020636FF 2619E206 .â.&.6...v..v..v..v......Õ...^_è 000040
 005E0002 00070001 00670103 00000002 002D0002 00460002 00300005 000790C8 ù.....0...F...-.......g.......×. 000060
 00000000 00900004 00850103 00000008 007A0002 00000007 00930002 00000005 ..............z.......ç......... 000080
 83FFFF02 3A9A0676 FF5016FE F2868D50 16FE468D D88EFFFF 881E5657 00013CC8 à<..WV.¡...Ä.F±.P...±.P.v..:.... 0000A0
 003FE903 748301FE F08E8100 07C62608 5EC4006C E9037500 0030FEF0 86890AC4 á...Þ±=..u.Õl.á^.&6.../Þ±l.t.Õ?. 0000C0
 FF005068 1E0676FF 0015E903 75000030 08C48301 9300729A 026A0050 681E506A jP.hP.j..r....á.=..u.Õ...v..hP.. 0000E0
 FF08C483 00880010 9A0876FF 0A76FF00 44681E0A C483007A 00A49A08 76FF0A76 v..v..É.z..á..hD..v..v.......á.. 000100
 5016FEF2 868D0198 E9FEF086 88078926 0C5EC404 C48300A9 008C9A08 76FF0A76 v..v....`..á.á^.&....Þ±Õ....±.P 000120
 08C48301 8600109A 5016FEFE 868D0047 681E08C4 83008800 569A5016 FEFE8680 ..±±.P.V.É..á..hG...±±.P...Ñ..á. 000140
 E9037209 FEFCBE83 FEFC86FF 0004E900 00FEFC86 C7FEEA96 8CFEE886 89124680 .F...Õ±..õ±ú.•±..Õ....•±./•±.r.Õ 000160
 89FE5788 26FC4788 26FEE89E C404FEE8 8683004B E90372FE FC863910 46880057 W..F.9.=±r.ÕK...Õ±.á.Õ±&.G•&.W±. 000180
 88001AE9 0003E903 75000030 0000FFFF 9AFEF886 FFFEFA86 FFFEFA96 89FEF886 .½±..ª±.Ñª±.Ñ½±.....=..u.Õ..Õ... 0001A0
 FF5016FE C4868DFF 98E9FEC6 9289FEC4 8289FEFA 9688FEF8 868802E6 C1FEFC86 Ñ=±èl...½±..ª±..á±..ó±Õ....á±.P. 0001C0
 109A5016 FEEC868D 5016FEFE 8680FE76 FF37FF26 0C5EC408 76FF0A76 FFFEFC86 Ñ•±.v..v.á^.&.7.v±..±±.P..$±.P.. 0001E0

Dump of file SATURN:[PCCOMMON.DUMP.DLL]ERR.TMP;1 on 18-APR-1990 10:45:48.49
File ID (648,17,0)   End of file block 33 / Allocated 36

Virtual block number 5 (00000005), 512 (0200) bytes

 C7006CE9 FEEE8688 0007C626 085EC400 98E90375 00FEEE8E 83FEEE86 89FFFF00 .....Ÿ±./Ÿ±.u.Õ..á^.&6....Ÿ±Õl.ú 000000
 002DE903 75000030 08C483FF FF00729A 016A00A0 681E506A 007EE983 CCFEF086 .Þ±•.Õ-.jP.h..j..r....á.=..u.Õ-. 000020
 FF004C68 1E0EC483 01C800A4 9A0876FF 0A76FF00 A0681E50 16FEF286 80FE76FF .v±...±.P.h...v..v..É.à..á..hL.. 000040
 C70027E9 83CEFEF0 86C70030 E983CDFE F086C708 C4830223 00109A08 76FF0A76 v..v....#..á.ú.Þ±ë.Õ0.ú.Þ±ö.Õ'.ú 000060
 03750130 30FFD8E9 0375013C 30FF8CE9 03750002 30001BE9 001EE983 C8FEF086 .Þ±à.Õ..Õ..=..u.Õ..=<.u.ÕU.==.u. 000080
 0876FF0A 76FF0000 FEF086C7 0000C626 0876C4FE EC9E8800 11E9FFD9 E9FF85E9 Õ..Õl.Õ....$±áv.&6..ú.Þ±...v..v. 0000A0
 56570000 04C8C8C9 5F5E1F00 00E9FEF0 86880789 260C5EC4 04C483FF FF008C9A ......á.á^.&....Þ±Õ...^_èùà...WV 0000C0
 E9037C83 00067E81 0010E900 5BE983D1 880009E9 037F0006 7E83D88E 0008881E .¡...Ä.-....Õ..¡l.Õ(.Õ....-...|.Õ 0000E0
 4688FC46 89F1F700 C8890228 FE4688FE 46897D00 05064688 004BE983 C8880006 ..¡ù.ÕN..F...).F±.F±•Ø¿à.¾þ.F•.F 000100
 75000030 0000FFFF 9A0876FF 0A76FFFC 76FF1789 260C5EC4 F1F700C8 890228FE ±•Ø¿à.¾þá^.&...v=.v..v......=..u 000120
 00000002 00480002 000790C8 C95F5E1F 0000E900 00880006 E983C888 0006E903 .Õ..¡ù.Õ..¡..Õ...^_èù.....K..... 000140
 00000008 02420002 00000008 01610002 00000007 00680002 00000003 001D0002 ..........h.......a.......B..... 000160
 1F02C483 FFFF0000 9A57D88E FFFF881E 00380006 02980203 00210005 01100203 ......l.......8..¡...ÄW......á.. 000180
 00000000 00000000 00000000 00000000 08000200 02000000 02000A00 020002C8 ù............................... 0001A0
 46E90374 0001503  83018AE9 00008800 01FE46C7 D88EFFFF 881E5657 000008C8 ÀA..WV.¡...ÁúF±..¡..Õ...>P..t.ÕF 0001C0
 0161E900 0088000o E9037500 00300000 FFFF9A00 F0681E50 16FF2E86 80016A01 .j......P.hÞ......=..u.Õ..¡..Õa. 0001E0

Dump of file SATURN:[PCCOMMON.DUMP.DLL]ERR.TMP;1 on 18-APR-1990 10:45:48.49
File ID (648,17,0)   End of file block 33 / Allocated 36

Virtual block number 6 (00000006), 512 (0200) bytes

 00A49A50 16FF3286 8D010068 1E010368 1E006A00 00FFFF9A FF2EB6FF FF30B6FF .ÑO..Ñ.......j..h...h....2..P.É. 000000
 12681E50 16FF2886 8D006A00 6A5016FF 32868D04 6A006A00 6A006A0E C483FFFF ...á.j.j.j.j...2..Pj.j...(..P.h. 000020
 8868006A FF2EB6FF FF30B6FF 0100E900 00880006 E9037500 00300000 FFFF9A01 ......=..u.Õ..¡..Õ...ÑO..Ñ..j.h. 000040
 9AFF2CB6 FF000000 ED9AFF2E B6FFFF30 B6FF001C E9037400 793D0000 FFFF9A13 ......=y.t.Õ...ÑO..Ñ...Ú....Ñ,.. 000060
 75000030 FC468900 00FFFF9A 5016FF2C 8680011C 681E0007 E90000B8 0000FFFF ....¡..Õa..h....,..P......F•=..u 000080
 28FF2C96 8B19E406 8E00AAE9 00008800 00FFFF9A FF2EB6FF FF30B6FF 0013E903 .Õ...ÑO..Ñ.......¡..Õ¨...ô...,.+ 0000A0
 4C168901 4AA30257 8B260788 2600021E C42619E4 068E0004 16892600 02A326C0 à&È..&.......ô.&á...&..&.W.ÈJ...L 0000C0
 8E020A16 89260208 A32619E6 068E0857 88260647 88260002 1EC42619 E4068E01 ...ô.&á...&.G.&.W...l.&È..&..... 0000E0
 0000B79A FF2EB6FF FF30B6FF 0000A326 19E8068E 04478826 00021EC4 2619E406 .ô.&á...&.G...Õ.&È...ÑO..Ñ...ñ.. 000100
 0CE90375 00003000 00FFFF9A 0134681E 014E681E 5016FA46 8D000101 5006C700 .ú.P....Fª.P.hN..h4......=..u.Õ. 000120
 00E90000 880000FF rF9A0000 36FF2619 E8068E00 14E90000 88000001 4E06C700 .ú.N...¡..Õ....Õ.&.6......¡..Õ. 000140
 36FF0018 E9037501 4C060801 4AA1D88E 0008881E 56570000 00C8CBC9 5F5E1F00 ..^_èùà...WV.¡...ÄÀJ...L.u.Õ...6 000160
 5700000C C8CBC95F 5E1F0000 FFFF9A00 6A006A00 6A006A10 6568014A 36FF014C L..ÕJ.he.j.j.j.j.......^_èùà...W 000180
 00FFFF9A 5016FA46 8D00086E9 00008800 06E90374 00014E3E 83088E01 AEB81E56 V.¡Ù..Á.>N..t.Õ..¡..Õ...Fª.P.... 0001A0
 06E90374 000030F8 46890000 FFFF9A23 6A020836 FF26020A 36FF2619 E6068E00 ...l.&.6..&.6..j#......F½=..t.Õ. 0001C0
 5689F446 89D308C1 08C92800 001E8826 19E8068E D22BF846 880056E9 00008800 .¡..ÕV..F½+Ø..Õ.&....+è.é.Æ.F¶.V 0001E0
```

Dump of file SATURN:[PCCOMMON.DUMP.DLL]ERR.TMP;1 on 18-APR-1990 10:45:48.49
File ID (648,17,0) End of file block 33 / Allocated 36

Virtual block number 7 (00000007), 512 (0200) bytes

```
00600056 9A505200 0205F656 88F44688 0876FF0A 76FF0789 26064688 F45EC4F6 -6^¶.F.&...v..v..F¶.V-...RP.V.'. 000000
5F5E1F00 00E90000 B80000FF FF9A006A F876FF1E 046AFC76 FF014E36 FF08C483 .&..6N..v=j...v%j......|..Ò...^ 000020
49010300 8E00P100 A2010300 E4000402 12010300 79000101 97010300 0F06CAC9 èò.........y........ð...Å.......T 000040
50010300 06000302 73010300 00000702 5E000200 90000100 82010300 8F000100 ...............^........s.......] 000060
05010300 00000801 E3000200 18000100 2E010300 07000301 75010300 17000101 .......u..................D.......{ 000080
00000000 5E000101 FD010300 45000401 D2010300 27000100 C0010300 24000100 ...$...á...'...@...E...=...^.... 0000A0
00000000 00000000 00000000 00000000 00000000 00000000 00000000 CB004688 .F.ù............................ 0000C0
2B01F7AE F2FFFFB9 0A7EC4FF 758DAEF2 FFFFB9C0 33067EC4 1EDE88D7 8BEC8855 U.&.=.B.6-.3ä¿..·Û.u.6-.¿..·Ù%1+ 0000E0
8BF38BA4 F3C913A5 F3E90149 A4027400 01C6F706 4688FE87 08468ED8 8EC08CF9 *.à.Ä.F..±.F.%ó..t.ÉÌÌÒµÊ.èµÊ.µ. 000100
D1F7AEF2 FFFFB9C0 33C08ED8 8CFE8B0A 76C51EDE 8BD78BEC 8B55CB5D C28C1FFA *..ó]ùU.$.=.ñ.év..±.Á.ä3ä¿..·Ù%1 000120
8BEC8855 CB5DC28C 1FFA8BF3 8BA4F3C9 13A5F3E9 D149A402 7401A8C7 88067EC4 6-..ú´.t.ÉÌÌÒµÊ.èµÊ.µ.*..ó]ùU.$. 000140
F84689EC 46805657 000016C8 00CB5DFA 88914901 F7AEF2FF FFB9C033 067EC4D7 =á~.3ä¿..·Ù%ì|..*]ù.à...WV.F$.F% 000160
89260647 89260856 88064688 420A47C6 26F85EC4 FE568CFC 46890E46 8DFA568C .V*.F..F=.V±á^%&6G.B.F..V.&.G.&. 000180
011902E2 9A53060A 76FF0C76 FFFC76FF 167FFF04 47C72602 57892607 89260857 W.&..&.W.&úG.....v=.v..v..S.ã... 0001A0
900FEB05 88260247 8E2607FF 263F8826 C02A1278 044FFF26 F85EC4F0 880CC483 .6..Þá^%&.O.x.*á&.?&..&.G.&..$.. 0001C0
067EC457 38E30C4E 8BEC8855 C8C95F5E C68806C4 83FFFF01 6C9A006A 53FA76FF .v*Sj..ì....á..6^_èùU.$.N.D8W6-. 0001E0
```

Dump of file SATURN:[PCCOMMON.DUMP.DLL]ERR.TMP;1 on 18-APR-1990 10:45:48.49
File ID (648,17,0) End of file block 33 / Allocated 36

Virtual block number 8 (00000008), 512 (0200) bytes

```
87AAF3C9 13ABF3E9 D1E08A0A 46880128 D187D103 D3230818 D12B0C74 DAF7D788 .=%Ot.+Ì.Ù#£.Ì.Ì+Ì.F..ÁÌÒµ¨.èµ¨. 000000
000008C8 CB5D0856 88064688 5FAAF3C9 13ABF3E9 D1C38EFF FFC381C3 8C10E3D1 ÌD..ù.ù...ùÌÒµ¨.èµ¨_.F..V.]ùà... 000020
D1C103E0 D1C886 9 F7000C89 9905A42D C388FA46 89E42A08 478A2608 5EC45657 WVá^.&.G.*ð.F*.ú-Ê.¯¿..%*.àÌÁ.èÌ 000040
FFFFB820 0A4F80¿o 085EC40F 74400A47 F6260774 830A47F6 26F84689 119805E0 Å....F%&-G..t.&-G.ât.á^.&.O. ¡.. 000060
0A4F8026 90E2EB00 000447C7 26200A4F 80260E74 010A47F6 26085EC4 90012BE9 Ò+..á^.&-G..t.&.O. &úG...$ã.&.O. 000080
0C899905 A42DC388 4C750C0A 47F626FC 7689F088 04478926 C028EF0A 67802602 .&.g.y+à&.G..Þ.v=&-G..uL.ù-Ê..¿. 0000A0
058C087E 810E7402 150A7E81 077505B0 087E8137 75011198 87F60608 68F9F700 .%*kÁ.-....u7.-.¯.u..-...t..-.¥. 0000C0
51E80876 FF0A76FF 0C75C008 02C48302 8810E29A FA76FF0F 75FFFF0A 7E811675 u..-...u..v*.ã....á..àu..v..v.ÒQ 0000E0
119887F6 060868F9 F7000C89 9905A42D C3881575 080A47F6 26085EC4 04C4830C ..á.á^.&-G..u..ù-Ê..¿..%*kÁ.-... 000100
F87E8802 57892607 89264008 57882606 47882606 77282637 8826085E 88677401 .tg.^.&.7&+w.&.G.&.W.ã&..&.W..-% 000120
FC468908 C48302A6 0F4A9AFA 76FF0677 FF265256 167EF608 04478926 48024588 .E.H&.G..--.VR&.w..v*.J.Ì..á..F= 000140
C426085E C408C483 02C90F0C 9A53006A 006A026A 0F742017 A987F6FA 5E8819EB $..^*-.´. t.j.j.j.S...è..á.á^.&6 000160
468908C4 8300EE0F 4A9AFA76 FF501606 46805600 018E17EB 07882606 468A065F _..F.&..$./..V.F..P.v*.J.Ÿ..á..F 000180
1AFE8802 1F11069A 000A88EC 8855CBC9 5F5EE42A 06468AFE CCE90374 FC7639FC =9v=t.Òa±.F.*ð^_èùU.&¡.......|±. 0001A0
D016891A CEA30856 88064688 1AEA1689 1AE8A310 56880E46 881AFA1E 8C1AF8A3 È%...*..F..V.ÈO¯...ð..F..V.Èö...Å 0001C0
2B00011A F606C703 08E90374 25F67E80 038DE900 001AF206 C700001A F406C71A .ú.¶...ú.´...Ò...--%t.Ò..ú.-...+ 0001E0
```

Dump of file SATURN:[PCCOMMON.DUMP.DLL]ERR.TMP;1 on 18-APR-1990 10:45:48.49
File ID (648,17,0; End of file block, 33 / Allocated 36

Virtual block number 9 (00000009), 512 (0200) bytes

```
1C5E06C7 1AE6A31A CCA31AD2 A31AECA3 1AEEA31A D6A31AF0 A31AD4A3 1AD8A3C0 àÈÀ.È&.ÈÞ.È=.ÈY.È&.È@.Èä.È|.ú.^. 000000
75283F80 260A5E88 903EE800 301C5E06 C70A46FF 49753001 7F80260A 5EC40020 .á^.&...0uI.F.ú.^.0.$>..^.&.?+u 000020
E81AEC06 FF1A7500 1AD83E83 0E75203F 80269028 E800001A EC06C71A D806FF00 ...Å.ú.&...$(.&.? u..>Å..u...&.$ 000040
5098078A 260A5E88 0A46FF1A E606FFC7 75203F80 260A5EC4 0DE81ACC 06FF9014 ....ö.$.á^.&.?-uù..Ì..F..^.&...P 000060
890A4689 08C48308 C7E80E1A FC681E0A 76FF0C76 FFD075C0 0802C483 0978E80E .Òx..á..àuÌ.v..v..h=..Òù..á..F.. 000080
1C5E3E83 0D74001A E63E831A FCA308F7 1AFCA11A E606FF0C 7D001AFC 3E830C56 V..>=..)...Ì.Å=.%ÄÈ=..>|..t..>^. 0000A0
F6681E0A 76FF060A 46FF1AEE 06FF2D75 2E3F8026 0A5EC400 201C5E06 C7067530 Ou.ú.^. .á^.&.?.u-..Ÿ..F...v..h- 0000C0
C41AEE0E FF00011A F606C70A 7D001AF6 3E830C56 890A4689 08C48308 78E80E1A ..Ò(..á..F..V..>-..).ú.-.....Ÿ.á 0000E0
00021AD6 06C70675 006C3028 7400683D 4074004E 303D7400 46309807 8A260A5E ^.&...=F.t==N.tâ=h.t+=l.u.û.=... 000100
90024EE9 1C75003F 80260A5E C40A46FF 03754C3F 80260A5E C4097500 1AD63E83 .>=..u.á^.&.?Lu..F.á^.&.?.u.ÒN.. 000120
3DF84689 98078A26 C8E80008 1AD606C7 D0E80010 1AD606C7 D8E80001 1AD606C7 ú.=...$Áú.=...$Áú.=...$À&....F%= 000140
037E7874 00693DF8 468820F8 46831AD4 06FF0875 00583D05 7400473D 0A740045 E.t.=G.t.=X.u...á..F% .F%=i.tx-. 000160
1AD63E83 900159E9 0140E903 75002530 0152E903 7E013FE9 03750063 300191E9 Ò..=c.u.Ò?.-.ÒR.=%.u.Òâ.ÒY...>=. 000180
A11FC426 1AE81EC4 00E80000 0247C726 0789261A F2A11FC4 261AE81E C4157502 .u.á.Ò.&á.À´.&..&úG...$.á.Ò.&á.À 0001A0
1EC401B0 E9037400 1AF23E83 0170E903 75001AF4 3E83041A E8068307 89261AF2 ·.&....Ò...>¶..u.Òp..>·..t.Ò§.á. 0001C0
E80E0A6A 00001ACC 06C71AF0 06FF01AC E9FFFF88 01AFE903 75200A47 F6261ACE ö.&-G. u.ÒÉ.¡..Ò¯...Þ.ú.ä...j..Ò 0001E0
```

```
Dump of file SAT..N:[PCCOMMON.DUMP.DLL]ERR.TMP;1 on 18-APR-1990 10:45:48.49
File ID (648,17,0)   End of file block 33 / Allocated 36

Virtual block number 10 (0000000A), 512 (0200) bytes

3E830004 1AF606C7 1AEE06FF 1AD406FF 1AD206FF F2EB086A 90C3EB02 C483019E ...á.Šù.j.Š..@...å...Ÿ.ú.-....> 000000
1AFCA128 741AFC06 39FA4689 1AD6A3C0 2B7A7401 1AD63E83 0081E903 75081AD6 ø..u.Ö...>ø..tz+àÈø..F¹9.=.t(Å=. 000020
027DC00B 1AFCA105 1AFC2E83 909013EB 00001AFC 06C70A74 001AE63E 83FA4689 .F°.>Ì..t.ú.°...Š.....°..À=..â). 000040
00FA7E83 02C48304 8DE80E3A 6A02C483 0130EB0E 106A021A E806831A FCA3C02B +âÈ=...Ò..j..ÒO..á.j:.Ò...á..-°. 000060
06C79007 EB1AFCA3 C02B027D C0081AFC A300052D FA46B815 74001AE6 3E832274 t".>Ì..t..F°-..È=..â).+âÈ=.Š..ú. 000080
90FF3FE9 106AFF10 E9021AE8 068302C4 8300F1E8 0E106A04 1AE82E83 00001AFC =.....Ò..j..Òþ..á...Ò..Ò..j.Ò?.. 0000A0
21E90428 E80E256A FF2AE903 49E80EF8 76FFF4EB 016A90FF 39E9026E E80E006A j..Òn.Ò9..j.Š¶.v%.ÒI.Ò°.j%.Ò(.Òi 0000C0
56880A46 88097400 1AD63E83 DA7E0067 30057C00 653DFF0C E9037500 643090FF ..=d.u.Ò..=e.|.=g.-Ò.>ø..t..F..V 0000E0
75006F30 FE80E903 75006E30 903AE8FE 5689FC46 89400C56 880A4688 0A4EFF0C ..N..F..V.@.F=.V±Š:.=n.u.Ò.±=o.u 000100
79E90375 007830FE 89E90375 0075308F 74007330 FEE0E903 75007030 FEE4E903 .Òô±=p.u.ÒÁ±=s.t.=u.u.Ò¿±=x.u.Òy 000120
C388EC75 253C0474 C00AF646 88078A26 FC5EC4FC 46FF9034 EB0A46FF 9081E8FF .ŠŸ..F.Š4..F=á^=&...F-.ât.<Xu£.ù 000140
0A5EC40C 56890A46 89FE5688 FC468806 C483044C E80E0A76 FF0C76FF 500A462B +F.P.v..v..ÒL..á..F=.V±.F..V.á^. 000160
CBC91AF2 A1FE51E9 0374200A 47F6261A CE1EC4FC 63E90374 C00AF646 88078A26 &...F-.ât.Òc=á.ö.&-G. t.Òo±À .èü 000180
D63E831A F006FF04 740A067E 8300201C 5E06C706 74001AEE 3E835657 000012C8 à...WV.>Ÿ..t.ú.^. ..-..t...þ..>ø 0001A0
1AE80683 FE5689FC 46890257 88260788 261AE81E C4197510 1AD63E83 0774021A ..t..>ø..u.á.Ò.&..&.W..F=.V±..Ò. 0001C0
1AE81EC4 0EE80000 FE46C7FC 46890788 261AE81E C4117400 1AF03E83 902CE804 .Š,..>þ..t.á.Ò.&...F=úF±..Š.á.Ò. 0001E0

Dump of file SATURN:[PCCOMMON.DUMP.DLL]ERR.TMP;1 on 18-APR-1990 10:45:48.49
File ID (648,17,0)   End of file block 33 / Allocated 36

Virtual block number 11 (0000000B), 512 (0200) bytes

46880674 FE460BFC 46880E74 001ACC3E 83021AE8 0683FE56 89FC4689 99078B26 &....F=.V±..Ò...>ä..t..F=.F±t..F 000000
FE7E8331 75001AF0 3E83F456 89F24689 1AFA1688 1AF8A11C 5CA3C02B 9003E806 .Š..+âÈ\.À%...°..F·.V¶.>þ..u1.-± 000020
DAF70002 8308F7FE 5688FC46 882D07C6 26F246FF F25EC41D 750A067E 832B7D00 .)+.-..u.á^·.F·&ó.-.F=.V±ŠÀ.@.XÖ 000040
1E0676FF FA5E8CF8 46891ADA B80000F6 46C79006 EB0001F6 46C7FE56 89FC4689 .F=.V±úF-..Š..úF-..¡Ö..F%.^°.v.. 000060
EB008C9A F876FFFA 76FF4574 001AEE3E 830AC483 07CF1008 9AFC76FF FE76FF50 P.v±.v=.Á.ü..á..>Ÿ..tÈ.v°.v%...Š 000080
4E880000 1C5C06C7 0675081C 5C3E8300 7EC908F0 4E89C82B 1AF60EB8 04C48302 ..á...-.+à.Nþ.è-..>\..u.ú.\....N 0000A0
8C1AD40E 88F04E89 F4468CF2 7E89F47F C00849C1 88473005 C62605EB F27EC4F0 þá-·Š.&ó.OG.èI.à.¶.-··.F¶.Nþ..å.. 0000C0
003F8026 F846FF46 202C8003 7C613C07 74C90804 88078A26 F85EC4F2 76C5EE5E ^Ÿév·á^%&.....èt.<a|.., F.F%&.?. 0000E0
7500F67E 8308741A EC06081A 08A11475 001AF03E 83EE5E8E F45E8CF2 7689E375 uÒ.v·.^¶.^Ÿ.>þ..u.ÀÀ...&.t..-·.u 000100
18740006 7E835657 000010C8 C8C95F5E 02C48302 FFE80E50 C02B02EB 00018805 .¡..Š.+âP.Ò...á.^_èuà...WV.-..t. 000120
C4137408 1AD63E83 008FE902 1AE80683 FA5689F8 46891AEA 16881AE8 A100018E ƒ..ÀÒ...Ò..F%.V°..Ò..Ò...>ø..t.á 000140
8CF84689 FC468907 88261AE8 1EC410EB FA5689F8 46890257 88260788 261AE81E .Ò.&..&.W..F%.V°Š.á.Ò.&...F=.F%. 000160
00FC7E83 900AE801 52881575 FA4608F8 46880E74 081AD63E 83041AE8 0683FA5E ^°..Ò...>ø..t..F%.F°u.¡R.Š...-=. 000180
881C741A EE3639F6 28F45689 F24689FA 5688F846 88FA5E8C F8468901 59880975 u.¡Ÿ..F%.^°.F%.V°.F·.V¶+-96Ÿ.t.. 0001A0
46FFF25E C44690ED E8107ECE 38461574 003F8026 F246FFF2 5EC4900E EB1AF60E .-.Š..á^·.F·&.?.t.F;o-.ŠU.Fá^·.F 0001C0
FA76FF56 02C48301 59E80E57 0875001A E63E83FE 2B1AFC3E 88F37500 3F8026F2 ·&.7.uµ.>=.+±.>Ì..u.W.ÒY..á.V.v° 0001E0

Dump of file SATURN:[PCCOMMON.DUMP.DLL]ERR.TMP;1 on 18-APR-1990 10:45:48.49
File ID (648,17,0)   End of file block 33 / Allocated 36

Virtual block number 12 (0000000C), 512 (0200) bytes

06C890C8 C95F5E02 C483013C E80E5708 74001AE6 3E8306C4 8301B3E8 0EF876FF .v%.Ò°..á..>Ì..t.W.Ò<..á.^_èù.à. 000000
9003E801 80057547 067E8306 7467067E 83FE5689 FC46891A EA16881A E8A10000 ..ÀÒ...ö..F=.V±.-.gt..-.Gu¯.Š.. 000020
C7067500 1AF63E83 007400FA 7E800006 1AF606C7 0675001A EE3E83FA 4688C02A °à.F°.>Ÿ..u.ú.-....-°.t..>-..u.ú 000040
068EFC76 FFFE76FF 1AF836FF 1AFA36FF 0676FF1A F636FF1A D436FF00 011AF606 .-....6å..6-..v..6°..6%..v±.v=.. 000060
8E1AF836 FF1AFA36 FF147500 1ACC3E83 1B7400FA 7E800EC4 8305841E FF2619EA ò.&.....á..-°.t..>ä..u..6°..6%.. 000080
F836FF1A FA36FF14 75001AF6 3E831B74 001ACC3E 8304C483 05881EFF 2619EA06 .ò.&.....á..>ä..t..>-..u..6°..6% 0000A0
741AEC06 081AD8A1 00001C5C 06C7081A E8068304 C4830590 1EFF2619 EA068E1A ...ò.&.....á...Ò..ú.\...ÀÀ...&.t 0000C0
0E50C02B 02E80001 880574C0 0804C483 05941EFF 2619EA06 8EFC76FF FE76FF1B ..v±.v=..ò.&.....á..ât.¡..Š.+âP. 0000E0
2606468A 1478044F FF261ACE 1EC43C75 001AF43E 83560000 00C890C8 C90129E8 Ò).èù.à...V.>¶..u<á.ö.&.O.x..F.& 000100
06C4830A A7016C9A 0676FF53 1AD036FF 10E8E42A 04882602 478E2607 FF2637B8 .7&..&.G.&..°ÒŠ..6Å.S.v..l.Ì..á. 000120
88577500 1AF43E83 56570000 02C890CB C95E1AF2 06FF9005 EB1AF406 FF077540 @u...¶.Š....·.^èù.à...WV.>¶..uW. 000140
FF047540 06C4830B 0F016C9A 1C5E36FF 1ACE36FF 1AD036FF 1BEB507E F60B0676 v..--PŠ..6Å..6o..6^..l....á.@u.. 000160
478E2607 FF263F8B 261C5EA0 D478044F FF261ACE 1EC41E7E C0084EC6 881AF406 .¶..6N.á-.á.ö.&.O.xå.^.&.7&..&.G 000180
56570000 02C8C8C9 5F5E1AF2 06010646 88077500 1AF43E83 D4E8E42A 05882602 .&..°òŠå.>¶..u..F...·.^ èùà...WV 0001A0
81016C9A 5098078A 26065EC4 1ACE36FF 1AD036FF 22EB5E75 001AF43E 830A7688 .v..>¶..u^Š".6Å..6ö.á^.Ì...P.l.. 0001C0
C4C07804 4FFF261A CE1EC425 74C0084E C6880646 FF1AF406 FF047540 06C4830B ..á.@u...¶..F..6N.ât%á.ö.&.O.xëá 0001E0
```

Dump of file SATURN:[PCCOMMON.DUMP.DLL]ERR.TMP;1 on 18-APR-1990 10:45:48.49
File ID (648,17,0)   End of file block 33 / Allocated 36

Virtual block number 13 (0000000D), 512 (0200) bytes

```
75001AF4 3E83CAE8 E42A0588 2602478E 2607FF26 3F8B261A CE1EC407 8A26065E ^.&..&.ö.&.7&..&.G.&..*ÔŠò.>¶..u 000000
C02BF656 89F44689 1AFA1688 1AF8A156 00000CC8 CBC95F5E 1AF20601 0A468807 ..F....^_èùà...VÀ¼...•..F¶.V-+à 000020
3E830676 2BF0^8F8 468904C4 83078A00 8C9AF476 FF521AFC 368BFA46 89FC4689 .F•.F•.6•.R.v¶...¤..á..F½+Þ+v..> 000040
2D3F8026 F45EC422 75001AE6 3E834E01 75081C5C 3E8308E8 02EE8305 75101C5C \..u..Ÿ.$..>\..u.N.>Ì..u"á^¶&.?- 000060
301C5E3E 83F84EFF 02C483FE 71E80E50 98078A26 F446FF12 75301C5E 3E831975 u..>^.0u..F¶&...P.Òq±.á..N½.>^.0 000080
74001C5C 3E830066 E80EFA46 FF077400 067E8318 74001AE6 3E83077E F60B0874 t..--..>Ì..t..~..t..F•.Òf..>\..t 0000A0
FA7E830A 7400067E 8302C483 FE7EE80E 56297500 1AE63E83 0070E80E FC46FF07 ..F•.Òp..>Ì..u)V.Ò~±.á..~..t..~• 0000C0
76FFF676 FFF876FF 0040E80E 047500FC 7E830A74 001C5C3E 830039E8 0E047500 .u..Ò9..>\..t..~•.u..Òa..v½.v~.v 0000E0
C8C95E02 C483FE38 E80E5600 201C5E06 C70E7400 1AE63E83 06C483FE 85E80EF4 ¶.Òç±.á..>Ì..t.ú.^. .V.Ò8±.á.^èù 000100
C483FDC8 E80E306A C802C483 FDD2E80E 50002088 03E80028 88057400 1AD83E83 .>Á..t.¡+.Š.¡ .P.Ò0».á.ùj0.Òà».á 000120
C802C483 FDAAE80E 50007888 03E80058 88057400 1AD43E83 1775101C 5C3E8302 ..>\..u..>å..t.¡X.Š.¡x.P.Ò^».á.ù 000140
021AE806 83378826 1AE81EC4 12752A3F 80260A5E C40001FE 46C75657 000006C8 à...WVúF±..á^.&.?*u.á.Ò.&.7..Ò.. 000160
88078A26 0A5E88F6 280A46FF FFFFFE46 C708752D 3F80260A 5EC49060 E80A46FF .F.$'.á^.&.?-u.úF±...F.+-.^.&... 000180
802606E8 F8880030 1C5E06C7 0675303C 0A751AEE 3639387F 393C3F7C 303CFA46 F•<0|?<9.;96Ÿ.u.<0u.ú.^.0..«Š.&. 0001A0
890F7D30 30802647 F18830E9 83C803E1 D1CE0302 E1C1CE88 98058A26 187F3930 =9..&....öèÅ..öìÅ.à.Õ0.þG&.=0)Ô. 0001C0
000004C8 CBC95F5E 0C56880A 46883789 26065EC4 F088EEF7 FE46880C 468C0A7E -..F..F±¼Ÿ.Þá^.&.7.F..V.^_èùà... 0001E0
```

Dump of file SATURN:[PCCOMMON.DUMP.DLL]ERR.TMP;1 on 18-APR-1990 10:45:48.49
File ID (648,17,0)   End of file block 33 / Allocated 36

Virtual block number 14 (0000000E), 512 (0200) bytes

```
01B8F475 00382611 74003080 264701E8 FC7EC406 4E8AFE5E 8CFC4689 01608857 W¡'..F=.^±.N.á-=Š.G&.=.t.&8.u¶¡. 000000
FF9A5016 C48850EC 885590CB C95FC02B FE468CFC 7E899009 EBFE468C FC7E8900 ..-•.F±$...-•.F±+á_èù.U.$P.á.P.. 000020
68121A9A 039EE800 21E80000 FFFF9A01 66681E01 68681E17 A2A3E086 580000FF ...X.ÁÈÅ..hh..hf......ÒI.Ò.....k 000040
FF33000D 8B1E016E 16FF00FF 68009C0E 4C9A008F 0DF89A50 CB5DE588 0001B80A .¡...Ì]ùP.½....L...h....n..£..3. 000060
74CA88A6 F3CB88D1 8805728E 31740030 80264701 75003080 267FFFB9 0168068E ..h.¿..&.=.u.G&.=.t1ƒr..Ì.ùµÌ.òt 000080
0572412C AC9204E0 CU0E7241 2CAC17A9 BF1FF788 071E061C EBE774AE F2C03308 .3à·ÙtÓŠ.....¥.¢`.¯,Ar.àÅ..¯,Ar. 0000A0
8805801E FF047400 05823E83 0DA10E4C 9A5000FC 88EC8855 00C31FED £ AC20A .Ô´ŠÙ.ù.U.$¡•.P.L.À..>...t.....¡ 0000C0
38AD19F4 8E065688 C08ED88E 0207B857 56EC8855 CB5DE588 0E020E4C 9A5``00FF ..P.L....Ì]ùU.$VW¡...Ä.á.V./¶.Ù; 0000E0
57EC8855 0002CA5D E5885E5F 96E8EBF7 88AEF2FF FFB9C033 970C7496 401U74C2 òt.ə.t..3à¿..·Ù.¥ŠŠ._^.Ì]ò..U.$W 000100
530002B8 C4885049 01F7AEF2 FFFFB9C0 33FA8892 1F74C008 0E160E1C 9A0676FF .v.......ât...•3à¿..¯Ù¼ÌIP.á£..S 000120
05A42D04 4688198A 06FF0000 04C80002 CA5DE588 5F580000 FFFF9A50 1651521E .RQ.P.....[_.Ì]ò..à.....¤..F.·Ê. 000140
830E5613 D59A0200 68FE5E8C FC468911 9805E0D1 C103E0D1 C888F9F7 000CB999 .¿..¥•.àÌÅ.ÈÌÅ....F•.^±h...ſ.V.. 000160
E8020002 47C726FC 5EC4080A 4F802611 74000808 57892606 47892604 5EC402C4 á.á^.&.G.&.W..Àt.&.O..á^•&úG...Š 000180
0247C726 FC5EC408 57892606 47892640 FE5688FC 4688040A 4F802604 5EC49021 Ì.á^.&.O...F•.V±ə&.G.&.W.á^•&úG. 0001A0
88EC8855 C3C90000 0447C726 02578926 07892608 57882606 47882604 5EC40001 ..á^.&.G.&.W.&..&.W.&úG...èùU.$. 0001C0
FF0876FF 0A76FF53 CC8804EC 830460E9 0454E9C0 3300098A 087217A7 1E38065E ^.;.Ì.r.¤..3àÒT.Ô'..$..àS.v..v.. 0001E0
```

Dump of file SATURN:[PCCOMMON.DUMP.DLL]ERR.TMP;1 on 18-APR-1990 10:45:48.49
File ID (648,17,0)   End of file block 33 / Allocated 36

Virtual block number 15 (0000000F), 512 (0200) bytes

```
0CEC83EC 885500CB 5DE588FD 17A9A780 91E175C0 855A5900 00FFFF9A 51160C76 v..Q.....YZ.àuÅ..Ì`.».Ì)ù.U.&.&. 000000
51414151 51C93353 12742017 A987F604 13E9C033 00098A08 7217A71E 38065E88 .^.;.Ì.r.¤..3àÕ..-.`. t.S3èQQAAQ 000020
89FE4689 C0330856 C50A468E FA5E8C66 748017A9 87F60000 0F359A50 16F4468D .F¶.P.S...-.`..tf.^•.F.éV.3à.F±. 000040
2800808A DC8802EC 833875AE F20A8049 E30C4E88 F86689F2 88FA8856 57FCFC46 F••WV.•.·.f½.N.DÌ¯.·Ùu;.&..Éa..+ 000060
FB3B00B0 009AE900 2BE8F4E2 AA1A74F8 3800740A 3CAC0C4E 880716FA 88D488E2 à.á.•...N.¯<.t.;«t.˙à¶Ò+.Ô..¯.;« 000080
9AFFFC88 7AE80093 E9FA5E8E 5F5EE1E8 0014E8E2 E8FC46FF 0A80AA00 1FE80375 u.Ò..`¯..F•ŠàÒ..ŠÅ^_.^•Ô..Šz¡•.. 0000A0
000E769A 5016F446 8D51521E 53065E88 1FE3CA28 CF881F06 1E515350 0EAD1106 ..Ù.PSQ....ù+òD..^.Š.RQ.F¶.P.v.. 0000C0
6D301874 C00808C4 831FC3FA 88585859 1F07740B 08FE5E01 F45E8811 75C00800 ..àu..^¶.^±.Ùt..Ÿ{X.•ù..á..ât.=m 0000E0
0E744017 A987F6FE 5E8E26E8 F900208A 03E8001C 8A087500 098A0001 30007400 .t.=..¤..u.¤..$.¤ .•$&.^±-.`.ət. 000100
5EF86688 FC4628FE 468806E8 F9C03300 1C8A0EE8 F803751A 3F80085E 880A5E8E .^..^..?.u.½Š.¤..3à•$..F±+F•.f½^ 000120
51521E53 0856C51E EEEBC188 0475C908 0C4E8802 F7E9C85D E5880472 FA5E8E5F _.^•r..Ì]ùÒ¼..N..èu..èŠŸ.éV.S.RQ 000140
1C8ACC75 00098A00 01300074 00603017 74C0081F 071E0000 10009A50 16F4468D ¯F¶.P.........ât.=m.t.=..¤..uàa. 000160
A6E80275 1A3F8026 DA880A74 4017A987 F68775C0 08F44688 C2E80020 8AC7E800 .Šùa .Šò.F¶.àuñ-.`.ət..Ò&.?.u.ŠÌ 000180
F883117D 17A71E38 065E88EC 88550442 E9008357 56EC8855 00A3E8C0 33001C8A a..3àŠÈ.U.$VW•.Ò8.U.&.^.;.Ì.)..« 0001A0
1E380872 D828DC88 5A5900C8 5DE588C0 3302E800 01880574 4017A987 F60C7C00 .|.-.`.ət.¡..$.3à.Ì]ù.YZ.É+Ár.;. 0001C0
D4885200 0288059E 2EFF5152 FC74E9C0 33057540 059EA1C8 5152E388 057205A2 Å.r..DRQùÀ..əu.3àÒt=RQ....£..R.Å 0001E0
```

```
Dump of file SATURN:[PCCOMMON.DUMP.DLL]ERR.TMP;1 on 18-APR-1990 10:45:48.49
File ID (648,17,0)   End of file block 33 / Allocated 36

Virtual block number 16 (00000010), 512 (0200) bytes

 02300774 00013D40 81127558 C0080000 FFFF9A52 16501653 C4885087 17A9·780 .Ï`.ñP.ǿS.P.R......àXu.Ÿã=..t.=. 000000
 7319D21E FFD83.C2 8C190606 C41EE319 D40E885A D4794817 A98F0808 81067500 .u.Ÿ...`.Kyå2..å.D.ó.ø..ó3Ü..ß.s 000020
 19DEBF19 DEBE007C E819DEBF 19DEBE19 D21EFF00 0388C28C 19DA06C4 01AEE903 .ÕÜ.ó.Õ..óE....ß./ß.«ß.Õ|./ß.«ß. 000040
 8F19DEBE D88E0E22 88C30000 FFFF9A11 A7680E01 6A087419 E23019DE 880073E8 Òs.¡ß.=ã.t.j..hÏ......ú¡*..Ä/ß.« 000060
 8F19DE8E 003AE81C 608F1C60 8EEC8855 000011A2 9A006A00 6A036A00 51E819E2 å.ÒQ.j.j.j..Å...U.å/'.«'.Ò:./ß.« 000080
 8A50C033 001AE819 E28F19E2 8E0023E8 19E28F19 E28EEC88 5503E800 31E819E2 å.Ò1.Š.U.å/ã.«ã.Ò#./ã.«ã.Ò..3åP. 0000A0
 08058804 EF830E73 F738C319 D21EFF00 028807E3 19D40E88 0000FFFF 9A500646 F.P.......å.D.E....ß.ü;%s..ÿ.... 0000C0
 68168800 F0E90375 01683639 FF28F628 56570000 14C800C3 EEE810FF F2740245 E.t·..ŠŸü.à...WV+-+.96h.u.ÕÞ...h 0000E0
 128E14E8 9A057268 1EF676FF F876FF0C 6AF85689 F64689F2 5689F046 89C02801 .+ó.FÞ.V·.F-.V%j..v%.v-.hr..Ò... 000100
 0CE847EA 75003F80 26F646FF F65EC400 8CE90376 7FFFFE81 461974C0 080AC483 .ó..ât.F.±..v.Õ¥.ó^~.F-&.?.uõG$. 000120
 12901490 9A046A50 014580BA 75003F80 26F65E88 F475003F 8026F646 FFF65EC4 ó^~.F-&.?.u¶.^-&.?.u¤.E.Pj...... 000140
 6074EE46 08EC4688 FE5689FC 468902C4 83120313 D59A56EE 5689EC46 8904C483 .ó..F&.VŸV.{.£..ó..F=.V±.F&.FŸtm 000160
 0572681E F076FFF2 76FF0C6A 19811689 19AFA3EE 5688EC46 886674C2 08FC4688 .F=.õtf.F&.VŸÈE...Ÿ.j..v·.vÞ.hr. 000180
 04EC4683 02578926 078926FE 5688FC46 88EC5EC4 2C74C008 0AC4830F F214E89A .Õ.·..ó..åt,ó^&.F=.V±&..&.W..F&. 0001A0
 8026F046 FFF05EC4 E8E80E74 C00A0788 26FC46FF FC5EC407 8A26F046 FFF05EC4 ó^Þ.FÞ&..ó^=.F=&...åt.$Õó^Þ.FÞ&. 0001C0
 18040203 02021601 FA70E900 028890C8 C95F5EA7 75003F80 26F05EC4 F475003F ?.u¶ó^Þ&.?.uÏ^_èü.¡..Õp'........ 0001E0

Dump of file SATURN:[PCCOMMON.DUMP.DLL]ERR.TMP;1 on 18-APR-1990 10:45:48.49
File ID (648,17,0)   End of file block 33 / Allocated 36

Virtual block number 17 (00000011), 512 (0200) bytes

 02430041 02350212 12110010 120F1600 160C0808 070A0C09 0C080C07 09060005 .........................5.A.C. 000000
 080702CE 08A40084 09820A81 0A801606 09721C70 2060006C 08590057 00530052 R.S.W.Y.l.m p.r...........É.ö.ø. 000020
 A5A3C850 E58899FF FF880008 E8C850E5 8899FFFF 88179E16 8917A5A3 16080000 ....ÈE.....¡....Ï]ùÕ..¡....Ï]ùÈÈ 000040
 728C3C43 0A76243C 0472133C F7E24343 1674073A 2E1875E4 0A0024B9 13288817 .£(.¿$..õu..:.t.CCã%<.r.<$v.C<¥r 000060
 FE4F8026 0574C308 C08C065E C4EC8855 00C3179E A3980147 8A2E4301 76CA3C04 .<òv.C..G..É..û.U.£ó^..å.ût.&.O± 000080
 740025E8 08750019 C63E831E 73FFF130 06468857 5602EC83 EC8855C8 5DE58801 ..Ï]ùW.å.å.VW.F.=þ.s..>ó..u.Õ%.t 0000A0
 5E5F02C4 83124E15 DA9A0676 FF087500 78E80574 0018E815 750082E8 19C6A312 .Èó.Õ..u.Õ..t.Õx.u..v..Õ.N..ó._^ 0000C0
 80510E4F 8D50501E C033FE5E 89FEE383 43065E88 0776065E 3900F088 C85DE588 .Ï]ùEÞ.9^.v..^.C.D±.^±3å.PP.O.Q̄ 0000E0
 08A30A8E 0574020B 19CAA319 C81687C2 883874FF FA8308C4 83140917 869A5002 .P......ó..*.tß.ó..å.Èò..ßt..ÕÈ. 000100
 05000AA3 01478D00 02A30000 A3000AB8 0C478948 480008A3 C033088E FE5E8800 ..^±.Ä3åÈ..HH.G.¡..È..È...G.È... 000120
 C3098EC1 8C020801 9AE819CA 1E8ED833 064E88C0 8ED88CC3 1FD88C00 06A30000 ..È...Ä.û.Ä.â.N.3Ü..ò.Ò...ß.é.lù 000140
 0674FFFF C2F7FA56 89F84689 148D183C 9A0676FF 006A0876 FF006A56 00000AC8 à...Vj..v.j..v..<.§..F%.V'%ó..t. 000160
 FF006A56 12740008 FE5689FC 468902C4 83140613 D59A56F8 7688902F E899C028 +à.$/..v%V.{.ø..ó..F=.V±.Ät.Vj.. 000180
 4E881E56 57EC8855 90C8C95E FE5688FC 46889007 E808C483 14350124 9A50FE76 v±P.$.S..ó.$...F=.V±^èù.U.åWV..N 0001A0
 3A26C933 FF448AA6 F30A76C5 FE88C803 D9F7AEF2 C033F788 067EC4D9 8827E30E .D'.1ó-..%3å·Ú%1.ù.±év.µÏ.D.3è&: 0001C0
 7EC51E08 56880646 880E4E88 00C85DE5 885F5E1F C188D1F7 49490474 0477FF45 E.w.t.ÏÏ%Ï.é.^_.Ï]ù..N..F..V..é~ 0001E0

Dump of file SATURN:[PCCOMMON.DUMP.DLL]ERR.TMP;1 on 18-APR-1990 10:45:48.49
File ID (648,17,0)   End of file block 33 / Allocated 36

Virtual block number 18 (00000012), 512 (0200) bytes

 92F788DA F7000283 D8F7AA2D 800A7902 080E750A F9831374 C00A93FC 071E570A .W..•..åt..*.u..øy.¯-¨%Ü.ø.%Õ.%. 000000
 4F0588E2 75C308C2 88AA2704 0276393C 30040387 92F1F793 F1F70274 C0080233 3ø.åt.%þ.%þ..Æ.0<9v..'¨.ô.ùuã..O 000020
 05A48856 000006C8 00C85DE5 885E5F1F 580A8CF2 72C73801 448DFF44 880586AC ¯...D..D.;úr·.ÕX._^.Ï]ù.å...V¡È. 000040
 744004C4 8314A218 709A5306 0E74830A 47F626FA 5EC41CE8 F628FC5E 8CFA4689 .F*.^=+-Š.ó^*&-G.¯t..S.p.Å..ó.ðt 000060
 D808065E 88EC8855 90C8C95E C6880876 FA463917 94168817 92A10CFA 46834601 .F.F*.Å......9F*vÅ.ó^èù.U.å.^..Ü 000080
 750176E8 00058807 1E297500 3F83198C 885756EC 8855C850 E58801FE 4F800474 t..O±..Ï]ùW.åVWE¥..?.u)..¡..Õv.u 0000A0
 19C23689 FFFEFE44 C704C683 000104C7 96198EA3 198CA3FE 244024EB 99C03305 .3å.Š$ã$±È¥.È/..ú....ó.úD±±..óó. 0000C0
 7788F273 EEF983FE E180FA74 4100D0E9 C85DE588 5E5F0009 E8C08ED8 8C064E88 .N..Ä.åÕ.._^.Ï]ùÕÅ.At*.Ä±.*Ÿs·.w 0000E0
 4489F788 000205C? 03357401 A8ADF003 D0881573 C1384843 7401A8FE 88ADFC02 .øÜ.±´.tCH;ès..Å.ÞÜ´.t5.ô....%.O 000100
 3811A889 DA8CC6E FE4CFEF9 0305E805 8948C128 FE4C89F9 030C74FE 88E6E8FE ±Šl.±t..*.L±+èH..Š..*±L±.ó.Õ¿¨.; 000120
 F27401A8 ADF003FE 882574FF FE300219 CE06C626 C3027F89 19CA1E8C 26057401 Ït.&..ò....ù&ó.ö..=±.t%.±.ÞÜ´.t· 000140
 08084788 E6E8FE44 89F78800 0205C203 E27401A8 ADF00300 888C73C1 3848FE88 .±H;ès¥.Å.ÞÜ´.tã.ó....%.D±Šl.G.. 000160
 88E83788 19C61E8E 260574C7 38166D8F D88C1274 19CE0EFE 2615E8D8 8E0474C0 åt..ÄŠ.&±.ö.t..Äem.;út.&..ó..7ŠE 000180
 4E960574 001DE8FE 4DFE0074 005FE898 40400124 0074C638 0068E8C0 33067788 .w.3åÕk.;ót.$.ãã.O_.t.±M±Õ..t..N 0001A0
 7401A8FE 458851C3 99C03302 47890788 19CAA326 0474C138 16C18908 8C98E84E N$..Ä¿é.;ét.&Èò...¯G.3å.úQ.E±´.t 0001C0
 D2F70072 C2031572 C603C188 F575EAD1 047619CC 1638267F FFBA4141 49C82803 .+àIAA¤..&;.ä.v.ïõu%.é.ór..ôr.%ø 0001E0
```

```
Dump of file SATURN:[PCCOMMON.DUMP.DLL]ERR.TMP;1 on 18-APR-1990 10:45:48.49
File ID (648,17,0)   End of file block 33 / Allocated 36

Virtual block number 19 (00000013), 512 (0200) bytes

 03F088FE 88571874 001DE851 52C359C0 33E575EA D1D2F708 75000CE8 C628C223 #ô+6ò..u.%Ølõul3äYúRQò..t.W.±.Þ. 000000
 00018850 52521ED2 335053C3 5A5958FE 55894AD7 28D68806 7789FFFE FE44C7F2 ·úD±±..w..ø+■J.U±XYZûSP3Ø.RRP¡.. 000020
 000A7E83 0657"6EC 8855C302 0802745B 5A1FFFFA 8308C483 15A91786 9A1F0650 P.....¨..á..*..Z[t..ØúU.$VW..-.. 000040
 0074F738 11744805 7036884C E8277200 57E80775 48064688 08568801 708F3875 u8«p..V..F.Hu.ÒW.r'$L.6p.Ht.;%t. 000060
 21EB99FF FF880675 02080473 0570FE81 04C68334 735E003E E8560E46 89024488 .D..F.VÒ>.^s4.6..±p.s..Øu.¡...Š! 000080
 33038805 70368902 5C891489 E675C085 F9580000 FFFF9A50 C0335016 52C48850 P.áR.P3àP.....[*.àul...\..6p..Æ3 0000A0
 DA882CE8 F9F27505 70FE8104 C6830C74 024C39F7 880E4E88 C850E588 5E5F07C0 à._^.l]ù.N..%9L.t..6..±p.u·*$,.Ö 0000C0
 75F7380E 75C08500 00FFFF9A 51531373 016A1E39 0675F738 C18ED388 26721C03 ..F&.Æ.è;%u.9.j.s.SQ......âuB;%u 0000E0
 F7064688 08750A5E 8808080C 5E880846 88EC8855 00C3D188 04879201 6A168904 ...j.....lù.U.&.F..^..Á.^.u..F.% 000100
 0008CA5D E588D103 E3F70646 88C8030C 66F70646 88C888E3 F70008CA 5DE588E3 D.[]ò..%D.à.F.%f..à.F.%D.l.[]ò.. 000120
 05A42DC3 88157508 0A47F626 5575023C 03240A47 8A26065E C4F62856 000004C8 à...V+-á^.&.G.$.<.uU&-G..u..û·Ê. 000140
 7EC008FC 46890647 28260788 26065E88 39740111 9887F606 D868F9F7 000C8999 .¿..%*kÁ.-....t9.^.&..&+G..F■.à- 000160
 5EC40874 FC463808 C4831776 0F4A9A50 E42A0847 8A260677 FF260877 FF265028 (P&.w.&.w.&.G.*ôP.J.v..á.;F■t.á^ 000180
 000447C7 26025789 26078926 08578826 06478826 065EC4FF FFBE200A 4F802606 .&.O. ƒ..á^.&.G.&.W.&..&.W.&úG.. 0001A0
 00070001 118C0103 00050001 11F40103 00520007 10960203 000CC8C9 5EC68800 ..6^èù........R...¶.......¥..... 0001C0
 00000008 16F60002 00220001 17DA0103 00880001 01570105 00000007 18C40002 ..á.......W.......Ö...".....-..... 0001E0

Dump of file SATURN:[PCCOMMON.DUMP.DLL]ERR.TMP;1 on 18-APR-1990 10:45:48.49
File ID (648,17,0)   End of file block 33 / Allocated 36

Virtual block number 20 (00000014), 512 (0200) bytes

 00580001 00820103 00400001 113E0103 003A0001 0F760103 00260001 18250103 ..%...&...v...:...>...M.......[. 000000
 002A0000 00010047 45534753 404840FF 00000000 00000000 005C0001 006F0103 ..o...\..........MKMSGSEG.....*. 000020
 00250103 0001FF00 00FFFFEA 50044689 08468702 46870646 87EC8855 0E50C033 3àP.U.&.F..F..F..F.]õ.........%. 000040
 54206E75 52205340 00000000 00000000 00000000 00000000 00000000 00020002 .......................MS Run-T 000060
 38383931 20296328 20746867 69727970 6F432020 20797261 7262694C 20656069 ime Library - Copyright (c) 1988 000080
 00000A0D 0047534D 2E000A0D 00000011 70726F43 2074666F 736F7263 694D202C , Microsoft Corp........MSG..... 0000A0
 00000000 00000000 00000000 00000000 00000000 00000000 00000000 00000000 ................................ 0000C0
 00000000 00000000 00000000 00000000 00000000 00000000 00000000 00000000 ................................ 0000E0
 00000000 00000000 00000000 00000000 00000000 00000000 00000000 00000000 ................................ 000100
 00000000 00000000 00000000 00000000 00000000 00000000 00000000 00000000 ................................ 000120
 00000000 00000000 00000000 00000000 00000000 00000000 00000000 00000000 ................................ 000140
 25732500 6578652E 65627272 65006065 732E6562 7272655C 7272655C 6065735C \sem\err\errbe.sem.errbe.exe.%s% 000160
 2E656272 72655C72 72655C60 65606572 6168735C 00657865 2E656272 72650063 c.errbe.exe.\sharemem\err\errbe. 000180
 00000000 00000065 75712E65 62727265 5C727265 5C736575 6575715C 00606560 mem.\queues\err\errbe.que....... 0001A0
 11D71C60 1C600000 00000000 2320202B 00296C6C 756E2800 296C6C75 6E280000 ..(null).(null).+· #......'.'.■. 0001C0
 00000000 00000000 00000000 00000000 00000000 00000000 00000000 19EA1C60 '.õ............................. 0001E0

Dump of file SATURN:[PCCOMMON.DUMP.DLL]ERR.TMP;1 on 18-APR-1990 10:45:48.49
File ID (648,17,^)   End of file block 33 / Allocated 36

Virtual block number 21 (00000015), 512 (0200) bytes

 00000000 00000000 00000000 00000000 00000000 00000000 00000000 00000000 ................................ 000000
 00000000 00000000 00000000 00000000 00000000 00000000 00000000 00000000 ................................ 000020
 00000000 00000000 00000000 00000000 00000000 00000000 00000000 00000000 ................................ 000040
 00000000 00000000 00000000 00000000 00000000 00000000 00000000 00000000 ................................ 000060
 00000000 00000000 00000000 00000000 00000000 00000000 00000000 00000000 ................................ 000080
 00000000 00000000 00000000 00000000 00000000 00000000 00000000 00000000 ................................ 0000A0
 00000000 00000000 00000000 00000000 00000000 00000000 00000000 00000000 ................................ 0000C0
 00000000 00000000 00000000 00000000 00000000 00000000 00000000 00000000 ................................ 0000E0
 00000000 00000000 00000000 00000000 00000000 00000000 00000000 00000000 ................................ 000100
 00000000 00000000 00000000 00000000 00000000 00000000 00000000 00000000 ................................ 000120
 00000000 00000000 00000000 00000000 00000000 00000000 00000000 00000000 ................................ 000140
 00000000 00000000 00000000 00000000 00000000 00000000 00000000 00000000 ................................ 000160
 00000000 00000000 00000000 00000000 00000000 00000000 00000000 00000000 ................................ 000180
 00000000 00000000 00000000 00000000 00000000 00000000 00000000 00000000 ................................ 0001A0
 00000000 00000000 00000000 00000000 00000000 00000000 00000000 00000000 ................................ 0001C0
 00000000 00000000 00000000 00000000 00000000 00000000 00000000 00000000 ................................ 0001E0
```

```
Dump of file SATURN:[PCCOMMON.DUMP.DLL]ERR.TMP;1 on 18-APR-1990 10:45:48.49
File ID (648,17,0)   End of file block 33 / Allocated 36

Virtual block number 22 (00000016), 512 (0200) bytes

00000000 00000000 00000000 00000000 00000000 00000000 00000000 00000000 ................................ 000000
00000000 00000000 00000000 00000000 00000000 00000000 00000000 00000000 ................................ 000020
00000000 00000000 00000000 00000000 00000000 00000000 00000000 00000000 ................................ 000040
00000000 00000000 00000000 00000000 00000000 00000000 00000000 00000000 ................................ 000060
00000000 00000000 00000000 00000000 00000000 00000000 00000000 00000000 ................................ 000080
00000000 00000000 00000000 00000000 00000000 00000000 00000000 00000000 ................................ 0000A0
00000000 00000000 00000000 00000000 00000000 00000000 00000000 00000000 ................................ 0000C0
00000000 00000000 00000000 00000000 00000000 00000000 00000000 00000000 ................................ 0000E0
00000000 00000000 00000000 00000000 00000000 00000000 00000000 00000000 ................................ 000100
00000000 00000000 00000000 00000000 00000000 00000000 00000000 00000000 ................................ 000120
00000000 00000000 00000000 00000000 00000000 00000000 00000000 00000000 ................................ 000140
00000000 00000000 00000000 00000000 00000000 00000000 00000000 00000000 ................................ 000160
00000000 00000000 00000000 00000000 00000000 00000000 00000000 00000000 ................................ 000180
00000000 00000000 00000000 00000000 00000000 00000000 00000000 00000000 ................................ 0001A0
00000000 00000000 00000000 00000000 00000000 00000000 00000000 00000000 ................................ 0001C0
058A1322 05861322 FFFF1322 00000000 00304F46 4E495F45 4C49465F 435F0170 p._C_FILE_INFO=....."..."..."... 0001E0

Dump of file SATURN:[PCCOMMON.DUMP.DLL]ERR.TMP;1 on 18-APR-1990 10:45:48.49
File ID (648,17,0)   End of file block 33 / Allocated 36

Virtual block number 23 (00000017), 512 (0200) bytes

000119E8 00060000 05AC0006 0200FFFF FFFF0101 00000000 05921322 058E1322 "..."................-.....Ô... 000000
00000000 00000000 02020000 00000000 00000000 01020000 00000000 00000000 ................................ 000020
00000000 00000000 00000000 00000000 00000000 00000000 00000000 00000000 ................................ 000040
00000000 00000000 00000000 00000000 00000000 00000000 00000000 00000000 ................................ 000060
00000000 00000000 00000000 00000000 00000000 00000000 00000000 00000000 ................................ 000080
00000000 00000000 00000000 00000000 00000000 00000000 00000000 00000000 ................................ 0000A0
00000000 00000000 00000000 00000000 00000000 00000000 00000000 00000000 ................................ 0000C0
00000000 00000000 00000000 00000000 00000000 00000000 00000000 00000000 ................................ 0000E0
00000000 00000000 00000000 00000000 00000000 00000000 00000000 00000000 ................................ 000100
00000000 00000000 00000000 00000000 00000000 00000000 00000000 00000000 ................................ 000120
00000000 00000000 00000000 00000000 00000000 00000000 00000000 00000000 ................................ 000140
00000000 00000000 00000000 00000000 00000000 00000000 00000000 00000000 ................................ 000160
00000000 00000000 00000000 00000000 00000000 00000000 00000000 00000000 ................................ 000180
00000000 00000000 00000000 00000000 00000000 00000000 00000000 00000000 ................................ 0001A0
00000000 00000000 00000000 00000000 00000000 00000000 00000000 00000000 ................................ 0001C0
00000000 00000000 00000000 00000000 00000000 00000000 00000000 00000000 ................................ 0001E0

Dump of file SATURN:[PCCOMMON.DUMP.DLL]ERR.TMP;1 on 18-APR-1990 10:45:48.49
File ID (648,17,0)   End of file block 33 / Allocated 36

Virtual block number 24 (00000018), 512 (0200) bytes

00000000 00000000 00000000 00000000 00000000 00000000 00000000 00000000 ................................ 000000
00000000 00000000 00000000 00000000 00000000 00000000 00000000 00000000 ................................ 000020
00000000 00000000 00000000 00000000 00000000 00000000 00000000 00000000 ................................ 000040
00000000 00000000 00000000 00000000 00000000 00000000 00000000 00000000 ................................ 000060
00000000 00000000 00000000 00000000 00000000 00000000 00000000 00000000 ................................ 000080
00000000 00000000 00000000 00000000 00000000 00000000 00000000 00000000 ................................ 0000A0
00000000 00000000 00000000 00000000 00000000 00000000 00000000 00000000 ................................ 0000C0
00000000 00000000 00000000 00000000 00000000 00000000 00000000 00000000 ................................ 0000E0
00000000 00000000 00000000 00000000 00000000 00000000 00000000 00000000 ................................ 000100
00000000 00000000 00000000 00000000 00000000 00000000 00000000 00000000 ................................ 000120
00000000 00000000 00000000 00000000 00000000 00000000 00000000 00000000 ................................ 000140
00000000 00000000 00000000 00000000 00000000 00000000 00000000 00000000 ................................ 000160
00000000 00000000 00000000 00000000 00000000 00000000 00000000 00000000 ................................ 000180
00000000 00000000 00000000 00000000 00000000 00000000 00000000 00000000 ................................ 0001A0
00000000 00000000 00000000 00000000 00000000 00000000 00000000 00000000 ................................ 0001C0
00000000 00000000 00000000 00000000 00000000 00000000 00000000 00000000 ................................ 0001E0
```

```
Dump of file SATURN:[PCCOMMON.DUMP.DLL]ERR.TMP;1 on 18-APR-1990 10:45:48.49
File ID (648,17,0)   End of file block 33 / Allocated 36

Virtual block number 25 (00000019), 512 (0200) bytes

00000000 00000000 00000000 00000000 00000000 00000000 00000000 00000000 ................................ 000000
00000000 00000000 00000000 00000000 00000000 00000000 00000000 00000000 ................................ 000020
00000000 00000000 00000000 00000000 00000000 00000000 00000000 00000000 ................................ 000040
00000000 00000000 00000000 00000000 00000000 00000000 00000000 00000000 ................................ 000060
00000000 00000000 00000000 00000000 00000000 00000000 00000000 00000000 ................................ 000080
00000000 00000000 00000000 00000000 00000000 00000000 00000000 00000000 ................................ 0000A0
00000000 00000000 00000000 00000000 00000000 00000000 00000000 00000000 ................................ 0000C0
00000000 00000000 00000000 00000000 00000000 00000000 00000000 00000000 ................................ 0000E0
00000000 00000000 00000000 00000000 00000000 00000000 00000000 00000000 ................................ 000100
00000000 00000000 00000000 00000000 00000000 00000000 00000000 00000000 ................................ 000120
00000000 00000000 00000000 00000000 00000000 00000000 00000000 00000000 ................................ 000140
00000000 00000000 00000000 00000000 00000000 00000000 00000000 00000000 ................................ 000160
00000000 00000000 00000000 00000000 00000000 00000000 00000000 00000000 ................................ 000180
00000000 00000000 00000000 00000000 00000000 00000000 00000000 00000000 ................................ 0001A0
00000000 00000000 00000000 00000000 00000000 00000000 00000000 00000000 ................................ 0001C0
00000000 00000000 00000000 00000000 00000000 00000000 00000000 00000000 ................................ 0001E0

Dump of file SATURN:[PCCOMMON.DUMP.DLL]ERR.TMP;1 on 18-APR-1990 10:45:48.49
File ID (648,17,0)   End of file block 33 / Allocated 36

Virtual block number 26 (0000001A), 512 (0200) bytes

00000000 00000000 00000000 00000000 00000000 00000000 00000000 00000000 ................................ 000000
00000000 00000000 00000000 00000000 00000000 00000000 00000000 00000000 ................................ 000020
00000000 00000000 00000000 00000000 00000000 00000000 00000000 00000000 ................................ 000040
00000000 00000000 00000000 00000000 00000000 00000000 00000000 00000000 ................................ 000060
00000000 00000000 00000000 00000000 00000000 00000000 00000000 00000000 ................................ 000080
00000000 00000000 00000000 00000000 00000000 00000000 00000000 00000000 ................................ 0000A0
00000000 00000000 00000000 00000000 00000000 00000000 00000000 00000000 ................................ 0000C0
00000000 00000000 00000000 00000000 00000000 00000000 00000000 00000000 ................................ 0000E0
00000000 00000000 00000000 00000000 00000000 00000000 00000000 00000000 ................................ 000100
00000000 00000000 00000000 00000000 00000000 00000000 00000000 00000000 ................................ 000120
00000000 00000000 00000000 00000000 00000000 00000000 00000000 00000000 ................................ 000140
00000000 00000000 00000000 00000000 00000000 00000000 00000000 00000000 ................................ 000160
00000000 00000000 00000000 00000000 00000000 00000000 00000000 00000000 ................................ 000180
00000000 00000000 00000000 00000000 00000000 00000000 00000000 00000000 ................................ 0001A0
00000000 00000000 00000000 00000000 00000000 00000000 00000000 00000000 ................................ 0001C0
00000000 00000000 00000000 00000000 00000000 00000000 00000000 00000000 ................................ 0001E0

Dump of file SATURN:[PCCOMMON.DUMP.DLL]ERR.TMP;1 on 18-APR-1990 10:45:48.49
File ID (648,17,0)   End of file block 33 / Allocated 36

Virtual block number 27 (0000001B), 512 (0200) bytes

00000000 00000000 00000000 00000000 00000000 00000000 00000000 00000000 ................................ 000000
00000000 00000000 00000000 00000000 00000000 00000000 00000000 00000000 ................................ 000020
00000000 00000000 00000000 00000000 00000000 00000000 00000000 00000000 ................................ 000040
00000000 00000000 00000000 00000000 00000000 00000000 00000000 00000000 ................................ 000060
00000000 00000000 00000000 00000000 00000000 00000000 00000000 00000000 ................................ 000080
00000000 00000000 00000000 00000000 00000000 00000000 00000000 00000000 ................................ 0000A0
00000000 00000000 00000000 00000000 00000000 00000000 00000000 00000000 ................................ 0000C0
00000000 00000000 00000000 00000000 00000000 00000000 00000000 00000000 ................................ 0000E0
00000000 00000000 00000000 00000000 00000000 00000000 00000000 00000000 ................................ 000100
00000000 00000000 00000000 00000000 00000000 00000000 00000000 00000000 ................................ 000120
00000000 00000000 00000000 00000000 00000000 00000000 00000000 00000000 ................................ 000140
00000000 00000000 00000000 00000000 00000000 00000000 00000000 00000000 ................................ 000160
00000000 00000000 00000000 00000000 00000000 00000000 00000000 00000000 ................................ 000180
00000000 00000000 00000000 00000000 00000000 00000000 00000000 00000000 ................................ 0001A0
00000000 00000000 00000000 00000000 00000000 00000000 00000000 00000000 ................................ 0001C0
00000000 00000000 00000000 00000000 00000000 00000000 00000000 00000000 ................................ 0001E0
```

```
Dump of file SATURN:[PCCOMMON.DUMP.DLL]ERR.TMP;1 on 18-APR-1990 10:45:48.49
File ID (648,17,0)   End of file block 33 / Allocated 36

Virtual block number 28 (0000001C), 512 (0200) bytes

 00000000 00000000 00000000 00000000 00000000 00000000 00000000 00000000 ................................ 000000
 00000000 00000000 00000000 00000000 00000000 00000000 00000000 00000000 ................................ 000020
 00000000 00000000 00000000 00000000 00000000 00000000 00000000 00000000 ................................ 000040
 00000000 00000000 00000000 00000000 00000000 00000000 00000000 00000000 ................................ 000060
 00000000 00000000 00000000 00000000 00000000 00000000 00000000 00000000 ................................ 000080
 00000000 00000000 00000000 00000000 00000000 00000000 00000000 00000000 ................................ 0000A0
 00000000 00000000 00000000 00000000 00000000 00000000 00000000 00000000 ................................ 0000C0
 00000000 00000000 00000000 00000000 00000000 00000000 00000000 00000000 ................................ 0000E0
 00000000 00000000 00000000 00000000 00000000 00000000 00000000 00000000 ................................ 000100
 00000000 00000000 00000000 00000000 00000000 00000000 00000000 00000000 ................................ 000120
 00000000 00000000 00000000 00000000 00000000 00000000 00000000 00000000 ................................ 000140
 00000000 00000000 00000000 00000000 00000000 00000000 00000000 00000000 ................................ 000160
 00000000 00000000 00000000 00000000 00000000 00000000 00000000 00000000 ................................ 000180
 00000000 00000000 00000000 00000000 00000000 00000000 00000000 00000000 ................................ 0001A0
 00000000 00000000 00000000 00000000 00000000 00000000 00000000 00000000 ................................ 0001C0
 00000000 00000000 00000000 00000000 00000000 00000000 00000000 00000000 ................................ 0001E0

Dump of file SATURN:[PCCOMMON.DUMP.DLL]ERR.TMP;1 on 18-APR-1990 10:45:48.49
File ID (648,17,0)   End of file block 33 / Allocated 36

Virtual block number 29 (0000001D), 512 (0200) bytes

 00000000 00000000 00000000 00000000 00000000 02000001 00000000 00000000 ................................ 000000
 00000000 00000000 00000000 00000000 00000000 00000000 00000000 00000000 ................................ 000020
 00000000 00000000 00000000 00000000 00000000 00000000 00000000 00000000 ................................ 000040
 00000000 00000000 00000000 00000000 00000000 00000000 00000000 00000000 ................................ 000060
 00000000 00000000 00000000 00000000 00000000 00000000 00000000 00000000 ................................ 000080
 00000000 00000000 00000000 00000000 00000000 00000000 00000000 00000000 ................................ 0000A0
 00000000 00000000 00000000 00000000 00000000 00000000 00000000 00000000 ................................ 0000C0
 00000000 00000000 00000000 00000000 00000000 00000000 00000000 00000000 ................................ 0000E0
 00000000 00000000 00000000 00000000 00000000 00000000 00000000 00000000 ................................ 000100
 00000000 00000000 00000000 00000000 00000000 00000000 00000000 00000000 ................................ 000120
 00000000 00000000 00000000 00000000 00000000 00000000 00000000 00000000 ................................ 000140
 00000000 00000000 00000000 00000000 00000000 00000000 00000000 00000000 ................................ 000160
 00000000 00000000 00000000 00000000 00000000 00000000 00000000 00000000 ................................ 000180
 00000000 00000000 00000000 00000000 00000000 00000000 00000000 00000000 ................................ 0001A0
 00000000 00000000 00000000 00000000 00000000 00000000 00000000 00000000 ................................ 0001C0
 00000000 00000000 00000000 00000000 00000000 00000000 00000000 00000000 ................................ 0001E0

Dump of file SATURN:[PCCOMMON.DUMP.DLL]ERR.TMP;1 on 18-APR-1990 10:45:48.49
File ID (648,17,0)   End of file block 33 / Allocated 36

Virtual block number 30 (0000001E), 512 (0200) bytes

 00000000 00000000 00000000 00000000 00000000 00000000 00000000 00000000 ................................ 000000
 00000000 00000000 00000000 00000000 00000000 00000000 00000000 00000000 ................................ 000020
 00000000 00000000 00000000 00000000 00000000 00000000 00000000 00000000 ................................ 000040
 00000000 00000000 00000000 00000000 00000000 00000000 00000000 00000000 ................................ 000060
 00000000 00000000 00000000 00000000 00000000 00000000 00000000 00000000 ................................ 000080
 00000000 00000000 00000000 00000000 00000000 00000000 00000000 00000000 ................................ 0000A0
 00000000 00000000 00000000 00000000 00000000 00000000 00000000 00000000 ................................ 0000C0
 00000000 00000000 00000000 00000000 00000000 00000000 00000000 00000000 ................................ 0000E0
 00000000 00000000 00000000 00000000 00000000 00000000 00000000 00000000 ................................ 000100
 00000000 00000000 00000000 00000000 00000000 00000000 00000000 00000000 ................................ 000120
 00000000 00000000 00000000 00000000 00000000 00000000 00000000 00000000 ................................ 000140
 00000000 00000000 00000000 00000000 00000000 00000000 00000000 00000000 ................................ 000160
 00000000 00000000 00000000 00000000 00000000 00000000 00000000 00000000 ................................ 000180
 00000000 00000000 00000000 00000000 00000000 00000000 00000000 00000000 ................................ 0001A0
 00000000 00000000 00000000 00000000 00000000 00000000 00000000 00000000 ................................ 0001C0
 00000000 00000000 00000000 00000000 00000000 00000000 00000000 00000000 ................................ 0001E0
```

```
Dump of file SATURN:[PCCOMMON.DUMP.DLL]ERR.TMP;1 on 18-APR-1990 10:45:48.49
File ID (648,17,0)   End of file block 33 / Allocated 36

Virtual block number 31 (0000001F), 512 (0200) bytes

 00000000 00000000 00000000 00000000 00000000 00000000 00000000 00000000 ................................ 000000
 00000000 00000000 00000000 00000000 00000000 00000000 00000000 00000000 ................................ 000020
 00000000 00000000 00000000 00000000 00000000 00000000 00000000 00000000 ................................ 000040
 00000000 00000000 00000000 00000000 00000000 00000000 00000000 00000000 ................................ 000060
 00000000 00000000 00000000 00000000 00000000 00000000 00000000 00000000 ................................ 000080
 00000000 00000000 00000000 00000000 00000000 00000000 00000000 00000000 ................................ 0000A0
 00000000 00000000 00000000 00000000 00000000 00000000 00000000 00000000 ................................ 0000C0
 00000000 00000000 00000000 00000000 00000000 00000000 00000000 00000000 ................................ 0000E0
 00000000 00000000 00000000 00000000 00000000 00000000 00000000 00000000 ................................ 000100
 00000000 00000000 00000000 00000000 00000000 00000000 00000000 00000000 ................................ 000120
 00000000 00000000 00000000 00000000 00000000 00000000 00000000 00000000 ................................ 000140
 00000000 00000000 00000000 00000000 00000000 00000000 00000000 00000000 ................................ 000160
 00000000 00000000 00000000 00000000 00000000 00000000 00000000 00000000 ................................ 000180
 00000000 00000000 00000000 00000000 00000000 00000000 00000000 00000000 ................................ 0001A0
 00000000 00000000 00000000 00000000 00000000 00000000 00000000 00000000 ................................ 0001C0
 00000000 00000000 00000000 00000000 00000000 00000000 00000000 00000000 ................................ 0001E0

Dump of file SATURN:[PCCOMMON.DUMP.DLL]ERR.TMP;1 on 18-APR-1990 10:45:48.49
File ID (648,17,0)   End of file block 33 / Allocated 36

Virtual block number 32 (00000020), 512 (0200) bytes

 00000000 81818101 00000001 00000000 00000000 00000000 00000172 118C0000 ....r........................... 000000
 00000000 00000000 00000000 00000000 00000000 00000000 00000000 00000000 ................................ 000020
 00000000 00000000 00000000 00000000 00000000 00000000 00000000 00000000 ................................ 000040
 00000000 00000000 00000000 00000000 00000000 00000000 00000000 00000000 ................................ 000060
 00000000 00000000 00000000 00000000 00000000 00000000 00000000 00000000 ................................ 000080
 00000000 00000000 00000000 00000000 00000000 00000000 00000000 00000000 ................................ 0000A0
 00000000 00000000 00000000 00000000 00000000 00000000 00000000 00000000 ................................ 0000C0
 00000000 00000000 00000000 00000000 00000000 00000000 00000000 00000000 ................................ 0000E0
 0A0A0A0A 0A0A0A00 00000000 00000000 00000000 00000000 00000000 00000000 ................................ 000100
 0A0A0A0A 0A0A0A0A 0A0A0A0A 0A0A0A0A 0A0A0A0A 0A0A0A0A 0A0A0A0A 0A0A0A0A ................................ 000120
 0A0A0A0A 0A0A0A0A 0A0A0A0A 0A0A0A0A 0A0A0A0A 0A0A0A0A 0A0A0A0A 0A0A0A0A ................................ 000140
 0A0A0A0A 0A0A0A0A 0A0A0A0A 0A0A0A0A 0A0A0A0A 0A0A0A0A 0A0A0A0A 0A0A0A0A ................................ 000160
 0A0A0A0A 0A0A0A0A 0A0A0A0A 0A0A0A0A 0A0A0A0A 0A0A0A0A 0A0A0A0A 0A0A0A0A ................................ 000180
 0A0A0A0A 0A0A0A0A 0A0A0A0A 0A0A0A0A 0A0A0A0A 0A0A0A0A 0A0A0A0A 0A0A0A0A ................................ 0001A0
 0A0A0A0A 0A0A0A0A 0A0A0A0A 0A0A0A0A 0A0A0A0A 0A0A0A0A 0A0A0A0A 0A0A0A0A ................................ 0001C0
 0A0A0A0A 0A0A0A0A 0A0A0A0A 0A0A0A0A 0A0A0A0A 0A0A0A0A 0A0A0A0A 0A0A0A0A ................................ 0001E0

Dump of file SATURN:[PCCOMMON.DUMP.DLL]ERR.TMP;1 on 18-APR-1990 10:45:48.49
File ID (648,17,0)   End of file block 33 / Allocated 36

Virtual block number 33 (00000021), 512 (0200) bytes

 00000000 0000000A 0A0A0A0A 0A0A0A0A 0A0A0A0A 0A0A0A0A 0A0A0A0A 0A0A0A0A ................................ 000000
 00002000 00000000 00000000 00000000 00000000 00000000 00000000 00000000 .............................. .. 000020
 4D4E3C3C FFFF19E6 19E419E2 FFFF0596 15880000 00000000 00000000 00000000 ....................à.ô.¦...<<NM 000040
 000A0077 6F6C6672 65766F20 68636174 73202D0A 0D303030 36520000 3E3E4753 SG>>..R6000..- stack overflow... 000060
 0A0D3020 79622065 64697669 64207265 6765746E 6920200A 0D333030 36520003 ..R6003..- integer divide by 0.. 000080
 726F6620 65636170 73206867 756F6E65 20746F6E 20200A0D 38303036 52000800 ...R6008..- not enough space for 0000A0
 756F6E65 20746F6E 20200A0D 39303036 52000900 0A0D7374 6E656D75 67726120  arguments.....R6009..- not enou 0000C0
 000A0000 FC000A0D 746E656D 6E6F7269 766E6520 726F6620 65636170 73206867 gh space for environment...=.... 0000E0
 6F6C6620 200A0D32 30303652 00020020 726F7272 6520656D 6974206E 757200FF ..run-time error ...R6002..- flo 000100
 00020003 FFFFFF00 0A0D6465 64616F6C 20746F6E 20746E69 6F702067 6E697461 ating point not loaded.......... 000120
 00000000 00000000 00000000 00081794 00020000 000A05A6 00020000 000719E0 Å.......¦....................... 000140
 20495041 203A726F 72724520 6E616068 63614220 6E776F6E 6B6E552C 00010352 R...,Unknown Bachman Error: API  000160
 6142206E 6F4E20^E 776F6E6B 6E551E00 6425203D 20726F72 7265202C 7325203D = %s, error = %d..Unknown Non-Ba 000180
 74726174 73206F ‥ 20656C62 616E551E 00642520 3A726F72 7245206E 61606863 chman Error: %d..Unable to start 0001A0
 01000100 01000100 01000100 01000100 0100646E 65686361 6220726F 72724520  Error backend.................. 0001C0
 00000000 00000000 00000000 00000000 00000000 00000000 00000100 01000100 ................................ 0001E0
```

```
Dump of file SATURN:[PCCOMMON.DUMP.PBIN]ERRBE.EXE;1 on 18-APR-1990 10:54:47.29
File ID (361,10,0)   End of file block 38 / Allocated 40

Virtual block number 1 (00000001), 512 (0200) bytes

 00000000 00000040 00000000 00000088 0000FFFF 00000004 00000026 004B5A4D MZK.&...........|.......@....... 000000
 00000080 00000000 00000000 00000000 00000000 00000000 00000000 00000000 ................................ 000020
 6F6E6E61 63206J61 72676F72 70207369 685421CD 4C01B821 CD09B400 0EBA1F0E ..o..Ç.ël|.LëlThis program canno 000040
 00000000 00000024 0A0D0D2E 65646F6D 20534F44 206E6920 6E757220 65622074 t be run in DOS mode....$....... 000060
 00030004 00040000 000106C6 0A000000 00040002 D98D64A2 00070092 0505454E NE......Àd.\........ó........... 000080
 00000000 00000000 00010000 00090000 00000119 00790073 00600060 00400000 ..@.'.'.s.y..................... 0000A0
 1D00F01 1C310017 020A0E01 00000000 08340E01 00000000 28F00F00 28EF0001 ..ÿ(..Þ(......4...........1...Å. 0000C0
 4143534F 44080000 13000A00 01000001 434F5250 444E5707 00004542 52524505 .ERRBE...WNDPROC...........DOSCA 0000E0
 2E656272 72650900 0003F201 01014E49 57405005 534C4C41 43455551 08534C4C LLS.QUECALLS.PMWIN...·....errbe. 000100
 00000000 00000000 00000000 00000000 00000000 00000000 00000000 00455845 EXE............................. 000120
 00000000 00000000 00000000 00000000 00000000 00000000 00000000 00000000 ................................ 000140
 00000000 00000000 00000000 00000000 00000000 00000000 00000000 00000000 ................................ 000160
 00000000 00000000 00000000 00000000 00000000 00000000 00000000 00000000 ................................ 000180
 00000000 00000C"0 00000000 00000000 00000000 00000000 00000000 00000000 ................................ 0001A0
 00000000 00000C 1 00000000 00000000 00000000 00000000 00000000 00000000 ................................ 0001C0
 00000000 00000000 00000000 00000000 00000000 00000000 00000000 00000000 ................................ 0001E0
```

```
Dump of file SATURN:[PCCOMMON.DUMP.PBIN]ERRBE.EXE;1 on 18-APR-1990 10:54:47.29
File ID (361,10,0)   End of file block 38 / Allocated 40

Virtual block number 2 (00000002), 512 (0200) bytes

 76FF0876 FFAC76FF AE76FFAE 568CAC46 890A468D D88EFFFF 881E5657 000058C8 àX..WV.¡...Á.F..F¯.VÛ.vÛ.v¯.v..v 000000
 468908C4 83005205 8A9A0044 681E0042 681E0CC4 83FFFF06 4E9A5016 80468006 ..F¯.P.N....á..hB..hD....R..á..F 000020
 04689AA8 76FFAA76 FF08C483 006005DE 9AA876FF AA76FF50 16804680 AA5689A8 ´.V´.F¯.P.v´.v´.B.'..á..v´.v´.h. 000040
 80000036 FF261AF2 068ED88E 0008881E 56570000 0EC8CBC9 5F5E1F04 C4830029 )..á..^_èùà...WV.¡...Ä..·.&.6... 000060
 0000FFFF 9A006A00 6A5016FE 4680006A 006A5016 F44680D50 16F24680 5016FA46 F°.P.F·¯P.F¶.Pj.j..Fz.Pj.j...... 000080
 36FF2602 0836FF26 1AF4068E F85689F6 4689F446 0BC02B02 08168B26 1AF4068E ..¶.&....+á.F¶.F-.V½..¶.&.6..&.6 0000A0
 088E0072 881E5657 00083CC8 CBC95F5E 1FFFA7E9 0000FFFF 9A236AF4 76FF0206 ...v¶j#.....ÕÏ..^_èùà<..WV.¡r..Ä 0000C0
 C8868D00 51681E0A 6AF7C486 89F7C686 89000088 0000F7D8 86C70800 F7D686C7 ú.ø%..ú.Ä%..¡....Õ%..á%j..hQ...à 0000E0
 83014F00 009A006v 681EF876 FF0018E9 03750000 3DF84689 0000FFFF 9A5016F7 %.P......F½=..u.Õ...v½.hi....O.. 000100
 00003DF8 46890000 FFFF9A02 6A5016FA 46800400 68000001 599A016A 016A06C4 á.j.j..Y...h...F°.Pj.......F½=.. 000120
 FA76FF00 0001979A 016A016A 06C48301 8000009A 0085681E F876FF00 18E90375 u.Õ...v½.h........á.j.j.......v° 000140
 03740008 02081689 260206A3 261AF406 8E0000FF FF9A006A 006A006A 006A006A j.j.j.j.j........¶.&È..&.....Àt. 000160
 FFBA0000 88000001 CD9A016A 016A06C4 8301C300 009A009E 681EF876 FF0018E9 Õ...v½.h.....û..á.j.j..ë...¡..o. 000180
 00CF681E F876FF00 18E90375 000030F8 46890000 FFFF9A00 89681E00 6A5052FF .RPj..h¿.......F½=..u.Õ...v½.hü. 0001A0
 F7D09689 F7CE8689 0000FFFF 9A006A00 0001F89A 016A016A 06C48301 EE00009A ...Ÿ..á.j.j..½...j........ö%..Å% 0001C0
 F7D086FF 00000245 9A016A01 6A04C483 022E0000 9A00EB68 1E0015E9 0374000B .Àt.Õ...h$.......á.j.j..E....ÑÅ% 0001E0
```

```
Dump of file SATURN:[PCCOMMON.DUMP.PBIN]ERRBE.EXE;1 on 18-APR-1990 10:54:47.29
File ID (361,10,0)   End of file block 38 / Allocated 40

Virtual block number 3 (00000003), 512 (0200) bytes

 F7CEB6FF F7D086FF 0031E903 740008F6 5689F446 890000FF FF9A646A F7CEB6FF .Ñö%jd......F¶.V-.Àt.Õ1..ÑÅ%.Ñö% 000000
 000002D6 9AF7CEB6 FFF7D086 FF08C483 02560000 9A010768 1E505200 0002809A .¯...RP.h.....V..á..ÑÅ%.Ñö%.ø... 000020
 6A006A00 6AFFFF68 02806801 29681EF7 CEB6FFF7 D086FF00 00020F9A 016A016A j.j..Õ....ÑÅ%.Ñö%.h).h§.h..j.j.j 000040
 006A006A 0130681E 5016F7D6 868DF7C4 B6FFF7C6 B6FF016A 006A0000 FFFF9A00 ......j.j..Ñö%.Ñá%..ø%.P.h=.j.j. 000060
 8608F7CA 868BF7CC 9689F7CA 86890000 FFFF9A50 16FC468D 006A006A 006A006A j.j.j.j..F=.P.......ð%..ä%..ð%.. 000080
 83003900 009A0151 681E5052 0000FFFF 9AF7CEB6 FFF7D086 FF003CE9 0374F7CC à%t.Õ<..ÑÅ%.Ñö%.....RP.hQ....9.. 0000A0
 FF9A016A 016A0000 FFFF9AF7 CEB6FFF7 D086FF00 00FFFF9A F476FFF6 76FF08C4 á..v-.v¶......ÑÅ%.Ñö%.....j.j... 0000C0
 8800021E C4261AF6 068E0004 16892600 02A326C0 28F7C896 881AF606 8E0000FF .....-...à%+à&È..&......-.&á.... 0000E0
 1AF4068E 04478926 FA468800 021EC426 1AF6068E 02578926 078926FE 5688FC46 F=.V±&..&.W...-.&á....F°&.G...¶. 000100
 0068006A 006A0857 89260647 89260002 1EC4261A F6068E02 08168B26 0206A126 &À..&......-.&á...&.G.&.W.j.j.h. 000120
 9A01756B 1E5016F7 D2868D0E C4830110 07929AFF FF680350 685016F7 F4868D08 ...¶%.PhP.h........á...ø%.P.hu.. 000140
 D2B6FFF7 D486FF00 00FFFF9A F702B6FF F7D486FF 001AE903 74000030 0000FFFF ....=..t.Õ...ÑÅ%.Ñø%......ÑÅ%.Ñø 000160
 00FFFF9A 006A006A 006A006A 5016F7DA 868DF7CE 86FFF7D0 86FF0000 FFFF9AF7 %......ÑÅ%.Ñö%..Ö%.Pj.j.j.j..... 000180
 FFFFC7E9 0000FFFF 9A5016F7 DA868DF7 CEB6FFF7 D086FF00 16E90375 00003D00 .=..u.Õ...ÑÅ%.Ñö%..Ö%.P.....Õú.. 0001A0
 9AF7CEB6 FFF7D086 FF000002 C99AF476 FFF676FF 0000FFFF 9AF7CAB6 FFF7CCB6 Ñø%.Ñö%......v-.v¶.è....ÑÅ%.Ñö%. 0001C0
 4688088E 000CB81E 5C570000 00C8CBC9 5F5E1F00 0001279A 006A016A 0000023C <...j.j..'....^_èùà...WV.¡É..Ä.F 0001E0
```

```
Dump of file SATURN:[PCCOMMON.DUMP.PBIN]ERRBE.EXE;1 on 18-APR-1990 10:54:47.29
File ID (361,10,0)    End of file block 38 / Allocated 40

Virtual block number 4 (00000004), 512 (0200) bytes

FF1276FF 002BE900 00FFFF9A 006A006A 006A006A 2A6A1076 FF1276FF 003BE90E .ð8..v..v.j*j.j.j.j......ð+..v.. 000000
75106530 000BE900 17E90000 FFFF9A06 76FF0876 FF0A76FF 0C76FF0E 76FF1076 v..v..v..v..v..v......ð..ð..=e.u 000020
00000000 00000000 90000ECA C95F5E1F 0000E900 008A0000 88FFD5E9 FFC0E903 .ðâ.ðí.j..¤..ð...^_èò........... 000040
000A47C6 26077440 0A47F626 065EC4FF FFFC46C7 000004C8 00000000 00000000 ........å...úF=..á^.å-G.ât.&6G.. 000060
15E80E06 76FF0876 FF02C483 180CE850 FE4689F9 F7000C89 99088A2D C3882EE8 Š..ú-¤..¿..¾ª.F±Pò...á..v..v..ò. 000080
C4FFFFEE 46C70000 12C890C8 C9FC4688 02C48317 FFE8FE76 FFFC4689 04C48300 ..á..F=.v±ò...á..F=èù.å...úFŸ..á 0000A0
99088A2D 06468BEE 468904C4 8304F810 289A5306 0080E903 75830A47 F626065E ^.å-G..u.ð¯..S.(.¾..á..FŸ.F.-¤.. 0000C0
065EC404 C483050A 0D4A9A06 76FF0876 FFFA4689 14B28788 06D868F9 F7000C89 ¿..¾ªkÅ...ÿ..F*.v..v..J....á.á^. 0000E0
F0468D01 88681E63 7400FA7E 83647CC0 0802C483 05251BC8 9A50E42A 08478A26 &.G.*ðP.å.¾..á..å|d.~*.tc.h...FÞ 000100
8A681E13 745CFE7F 8026FC5E C4FE568C FC4689F2 468D08C4 8305491C 4E9A5016 .P.N.I..á..F·.F=.V±á^=&..±\t..h. 000120
849AFA76 FFFC76FF FE76FF0A 6AFC4EFF 03E808C4 8305611C 089A5016 F0468D01 ..FÞ.P....á.Š..N=j..v±.v=.v*.. 000140
26065EC4 FFFFEE46 C70574C0 0804C483 03481D32 9A5016F0 468D08C4 83056E1C .n..á..FÞ.P.2.H..á..åt.úFŸ..á^.& 000160
99C02805 75D00BFE 5689FC46 89058718 369A0000 08C890C8 C9EE4688 000A47C6 6G...FŸèù.å....6.ñ..F=.V±.åu.+å. 000180
89F84689 0CC48304 D100909A 0676FF08 76FF0A76 FF0C76FF FC76FFFE 76FF39E8 $9.v±.v=.v..v..v..v....!..á..F½. 0001A0
0AC890C8 C9FA5688 F8468802 C483160A E850F9F7 000C8999 08BA2DFC 468BFA56 V*.F=-¤..¿..¾ªPòO..á..F½.V*èù.å. 0001C0
16A0E850 F84689F9 F7000C89 99088A2D 06468BFC 568CFA46 890E468D 56570000 ..WV.F..F*.V=.F.-¤..¿..¾ª.F½Pò.. 0001E0

Dump of file SATURN:[PCCOMMON.DUMP.PBIN]ERRBE.EXE;1 on 18-APR-1990 10:54:47.29
File ID (361,10,0)    End of file block 38 / Allocated 40

Virtual block number 5 (00000005), 512 (0200) bytes

FF0A76FF 0C76FFFA 76FFFC76 FFF08804 C4830628 0EA29A06 76FF0876 FF02C483 .á..v..v..Å.(..á..Þ.v=.v*.v..v.. 000000
76FF06C4 8305910F 789A5606 76FF0876 FFF8880C C4830639 10829A06 76FF0876 v..v..ÿ.9..á..½.v..v.V.x.....á..v 000020
FC5EC4FE 568CFC46 89F0468D 56570000 12C890C8 C95F5EC7 8802C483 1668E8F8 ½Òh..á..ú^_èù.å....WV.FÞ.F=.V±á^= 000040
7FFF0447 C7260257 89260789 26085789 26064789 26085688 06468842 0A47C626 &6G.B.F..V¯&.G.&.W.&..&.W.&úG... 000060
78044FFF 26FC5EC4 F0880CC4 83068810 829A5306 0A76FF0C 76FF0E76 FF1076FF .v..v..v..v..S.ÿ.£..á..Þá^=&.0.x 000080
06C48306 0C08049A 006A53FE 76FF0EE8 05882602 478E2607 FF263F88 26C02A11 .*ê&.?&..&.G.&..Š..v±Sj..å.....á. 0000A0
1E018C1E 89018EA3 01900E89 49019C1E 8C019A26 89019226 89FCC8C9 5F5EC688 .6^_èù=.&...&.......I.....È....... 0000C0
9A06911D 869A004A E806A2A3 0015A126 0194068E 0000FFFF 9A019868 1E019468 h...h...........&Å..ÈÅ.ðJ....... 0000E0
00049A08 A836FF08 AA36FF08 AC36FF08 AE36FF08 8036FF07 020A0C9A 06FD0884 ..»........6¯..6ù..6¯..6¯..6¯..Å. 000100
9A5000FF 8807340A C89A0726 083A9A50 0003B8D8 8E03FA88 07201E20 9A..0707 ..P. . .¡ª..Å¡..P..:.&..å.4.¡..P. 000120
059C8E31 74003080 26470175 00308026 7FFF8901 8E068EFF 330000D8 073»!E3A :.9.£..3......¿..&.=.u.G&.=.t1ƒ.. 000140
0E72412C AC06A8BF 1FF78807 1E061CE8 E774AEF2 C0330874 CA88A6F3 C88801B8 .Ì.ú¡Ì.ðt.3à·ÚtðŠ.....¾.¢´.¯,Ar. 000160
A8D8880A 468819E3 0C4E88EC 885500C3 1F16EDE8 AAC20A05 72412CAC 9204E0C0 àÅ.¯,Ar..ö¯ŠÚ..ú.U.&.N.Ð..F..Å´ 000180
C488FF6A 038EE906 C0330016 8A0973D0 03047501 C2F60974 D2080E56 88107501 .u..V..ðt.-ð.u..Ås.¤..3à.ð..j..á 0001A0
74C0085E 5F0000FF FF9A107E 88127688 06568808 4E885251 501607F2 680E5756 VW.h·..PQR.N..V..v..~......^.ât 0001C0
30730020 30480006 A1260198 068ECB50 C6E80008 8A057600 20305803 81E90604 ..ð..X= .v.¤..ŠðJù....&Å..H= .s0 0001E0

Dump of file SATURN:[PCCOMMON.DUMP.PBIN]ERRBE.EXE;1 on 18-APR-1990 10:54:47.29
File ID (361,10,0)    End of file block 38 / Allocated 40

Virtual block number 6 (00000006), 512 (0200) bytes

068E1696 E8EC8855 CB15D4E8 52510818 680E5756 ED3305D8 87890200 05E30193 .1D.....Á.3ÚVW.h..QRÒÅ.ÚU.&ò.... 000000
00FC88EC 88550000 0003E99A 006A006A FFFF05D8 87C7E3D1 4800061E 88260198 ..&....KiDú.Á...j.j..ð....U.&¡=. 000020
3356C85D E5880844 0AC89A50 00FF8805 AA1EFF04 740005AC 3E830742 0AC89A50 P.à.B..>¯..t...¯.¡..P.à.D..!]ùV3 000040
8808740A C89A5000 01B80858 083A9A11 7455F480 F8E2E032 ACFCE432 004289F6 -¿B.2ð=¯2Åä=.¶Ut..:.X.¡..P.à.t.¡ 000060
8936F775 00FF7C80 06744EF0 88018E1E 8E018CA1 05B2068F 05B0068F C85E0001 ..^ù..¯...ÿ.À.......ÞNt..|..ú¾6. 000080
ACFA75C0 0A42AC00 01BFD233 05AE3689 36960175 FF04F696 08B41E8C 36088236 6ÿ.6..Ç..-..u..6.6Ù.3ð«..¯B.âu*¯ 0000A0
3C247422 3C5474C0 0AE87409 3CEC7420 3CAC4E47 6374C00A F774093C F874203C < t«<.t¾.âtcGN¯< t&<.tð.âtT<"t$< 0000C0
CE7501A8 D113E901 C188D7EB D1030474 223CFA74 5C3CAC41 C933E8EB 4203745C \t.8Šð3èA¯<\t*<"t..!Š=.èið.Ì´.uö 0000E0
03047422 3CFA745C 3CAC41C9 33F0EB42 03745C3C C274223C 2774C00A AC4E01EB Š.N¯.ât'<"tò<\t.BŠÞ3èA¯<\t*<"t.. 000100
C203C788 E7D1E7D1 47D70308 A83E891F 169FE806 7501A8D1 13E9D1C1 88DFE8D1 !Šð.èið.!´.u&Š....>´..&Gìóið.ú.ò 000120
8C363F89 360716F8 03D88808 AC1E8C08 AAA3FDE2 E9000888 06731596 E8FE2440 ð$±ò..s.¡..ðã=È´...¯..Å.½..6.76. 000140
74093CF8 74203CAC AAC03303 E8FA75C0 0AAAAC01 8E1E8E05 AE368804 C3830257 W..ù..6Ù....¯¯.&u*Š.3à¯¯< t«<.t 000160
5A74C00A D974093C DD74203C AC4E04C3 8302578C 363F8936 9076E803 75C00AF7 ¾.âu.Šv.6.?6.W..ù.N¯< ti<.t).âtZ 000180
D15C8005 E8AAF35C 80067422 3CFA745C 3CAC41C9 33E8E8AA 03745C3C 2774223C <"t'<\t.`Šð3èA¯<\t*<"t.¯\µ´Šì¯\ì 0001A0
3CAC41C9 33F0E8AA 03745C3C 8F74223C 2A74C00A AC4EC9E8 AA228006 73AAF3E9 ðµ´s.¯"´ŠèN¯.ât*<"t«<\t.´ŠÞ3èA¯< 0001C0
C71F16AA C033D1EB AA22809E 73AAF3E9 D15C800D E8AAF35C 80067422 3CFA745C \t*<"t.¯\µ´Šì¯\ìðµ´s.¯"´Šì3à´..ú 0001E0
```

```
Dump of file SATURN:[PCCOMMON.DUMP.PBIN]ERRBE.EXE;1 on 18-APR-1990 10:54:47.29
File ID (361,10,0)   End of file block 38 / Allocated 40

Virtual block number 7 (00000007), 512 (0200) bytes

 FFB9FF33 F633C033 018E068E 0586068F 0584068F 05802EFF 00000247 C7000007 ...úG.....¯...Ç...Ä.....3à3-3.¿. 000000
 88067314 9FE8C603 E6D1E601 FE88FE24 40C78846 FA75AE46 AEF20674 053A26FF .&:.t.·ÛFÛu•F.úa$±.±||||.6Ò..•.¡ 000020
 26048828 E349C716 F6331F06 D888FE03 F888CF88 0880168C 08AEA3FC EBE90009 ..Ô$•ÈÚ...¯..ü.½.±.Ä..3-..ID+..& 000040
 04C38302 578C263F 89260A74 595E5FA7 F3000689 059C8F57 56511075 059C0638 ¡...u.QVW¢..¿..µI_^Yt.&.?&.W..ü. 000060
 07298857 56EC8855 0005842E FF07161F 16024F89 260F8926 05E2FA75 C00AAAAC ¨`.àu•ã(&..&.O.......Ç..U.$VW¡). 000080
 96E8E8F7 88AEF2FF FF89C033 970C7496 401074C2 38AD1802 8E06568B C08ED88E .Ä.à.V./..Ù;ôt.à.t..3à¿..·Û.X$$. 0000A0
 FFFFB9C0 33FA8892 1F74C008 087D0A98 9A0676FF 57EC8855 0002CA5D E5885E5F _^.|]ò..U.àW.v....)..àt...•3à¿.. 0000C0
 16010002 CA5DE588 5F580000 FFFF9A50 1651521E 53000288 C4885049 D1F7AEF2 ¯ÜK||P.áÉ..S.RQ.P.....[_.|]ò.... 0000E0
 02121211 0D10120F 160D160C 0808070A 0C090C08 0C070906 0D051804 02030202 ................................ 000100
 0D840982 0A810A80 16060972 1C70206D 006C0859 00570053 00520243 00410235 5.A.C.R.S.W.Y.l.m p.r........... 000120
 FF880620 97890662 8789E3D1 4800061E 88260198 068E1608 00000807 02CE08A4 Ê.ö.■.........&....KID..b... .¡. 000140
 628789E3 01480006 1E882601 98068ECB 5DE58899 FFFFB800 08E8C85D E58899FF ...|]ùÒ..¡....|]ù....&....KID..b 000160
 8C3C430A 76243C04 72133CF7 E2434316 74073A2E 1875E40A 0024890A FE885306 .SÉ±.¿$..ôu..:.t.CCâ%<.r.<$v.C<¥ 000180
 06208AEC 885506E8 06628AEC 8855C306 20878958 9801478A 2E430176 CA3C0472 r.<òv.C..G..[.. .ÙU.&¤b.$.U.$¤ . 0001A0
 478A2608 5EC45657 000008C8 C85D0A8C C203E001 48930006 1E882601 98068E93 .....&.....HIÀ.ô.Ô]ùà...WVé^.&.G 0001C0
 26F84689 14AE05E0 D1C103E0 01C888F9 F7000C89 99088A2D C388FA46 89E42A08 .•ô.F•.ù-¤..¿..%•.àIÀ.èIÀ.Û..FY& 0001E0

Dump of file SATURN:[PCCOMMON.DUMP.PBIN]ERRBE.EXE;1 on 18-APR-1990 10:54:47.29
File ID (361,10,0)   End of file block 38 / Allocated 40

Virtual block number 8 (00000008), 512 (0200) bytes

 26085EC4 90012BE9 FFFF8820 0A4F8026 085EC40F 74400A47 F6260774 830A47F6 -G..t.&-G.ât.á^.&.O. ¡..Ô+..á^.& 000000
 C02BEF0A 67802602 0A4F8026 90E2EB00 000447C7 26200A4F 80260E74 010A47F6 -G..t.&.O. &úG...Sã.&.O..&.g.y+á 000020
 87F60608 68F9F700 0C899908 8A2DC388 4C750C0A 47F626FC 7689F088 04478926 &.G..Þ.v•&-G..uL.ù-¤..¿..%•kÀ.-. 000040
 750A9E0A 7E811675 0802087E 810E740C 7D0A7E81 077508C6 087E8137 750114AE Û..u7.~.ó.u..~.).t..~.@.u..~...u 000060
 26085EC4 04C48312 85E80876 FF0A76FF 0C75C008 02C4830C F0253A9A FA76FF0F ..v•.:%Þ..á..àu..v..v.Ô...á.á^.& 000080
 88260858 88677401 14AE87F6 06086BF9 F7000C89 99088A2D C3881575 080A47F6 -G..u..ù-¤..¿..%•kÀ.-.Û..tg.^.&. 0000A0
 04478926 48024588 F87E8802 57892607 89264008 57882606 47882606 77282637 7&+w.&.G.&.W.a&..&.W..-%.E.H&.G. 0000C0
 A887F6FA 5E8819E8 FC468908 C483000E 21FE9AFA 76FF0677 FF265256 167EF608 .--.VR&.w..v•.±l...á..F•$..^•-.` 0000E0
 07882606 468A065F C426085E C408C483 00311F82 9A53006A 006A026A 0F742006 . t.j.j.j.S.y.1..á.á^.&á_..F.&.. 000100
 CCE90374 FC7639FC 468908C4 830AD221 FE9AFA76 FF501606 46805600 018E17E8 $./..V.F..P.v•.±l@..á..F=9v•t.Ôä 000120
 262E7408 0A47F626 3574830A 47F62606 5EC40000 00C8C8C9 5F5EE42A 06468AFE ±.F.•ô^_èùà...á^.&-G..t5&-G..t.& 000140
 57892607 892699C0 28F70A67 8026065E C404C483 0C8723E2 9A0677FF 260877FF .w.&.w..¯ã#...á.á^.&.g.%+ò.&..&.W 000160
 74006130 98078A26 0A5EC456 00000AC8 90C8C904 47892608 57892606 47892602 .&.G.&.W.&.G.èù.à...Vá^.&...=a.t 000180
 018E9022 E8000189 01FC46C6 F6289000 EEE999C0 28137400 77300C74 00723027 '=r.t.=w.t.+à.ÔY..+-óF•.¿..$".ƒ. 0001A0
 FF80FC46 C6FEE683 0002CE81 43750002 C6F790F4 E801098E 90F1EB02 FC46C603 .óF•.$þ.ƒ..$¶.%ó..uC.ö...|±óF•.. 0001C0
 00743013 74006230 06740028 3098078A 263374C9 08377400 3F80260A 5EC40A46 F.á^.&.7.t7.èt3&...=+.t•=b.t.=t. 0001E0

Dump of file SATURN:[PCCOMMON.DUMP.PBIN]ERRBE.EXE;1 on 18-APR-1990 10:54:47.29
File ID (361,10,0)   End of file block 38 / Allocated 40

Virtual block number 9 (00000009), 512 (0200) bytes

 8000CE81 90C4E8C9 280574C0 00A9C688 9000E840 00CE810E 75C000A9 C6881575 u..ó`.àu..ö.â$À..ó`.àt.+è$á..ö.. 000000
 6AE9037D C008FA46 8908C483 006A2020 9A0676FF 0876FF56 01A468FE 4E8980E8 $§.N±hÊ.V.v..v..  j..á..F•.á).Ôj 000020
 C103E0D1 C888F9F7 000C8999 088A20C3 881AAC06 FF0A4788 26FC468A 0E5EC4FF .á^..F•&.G...¯..ù-¤..¿..%•.àIÀ.è 000040
 88000004 47C7F85E 88044789 260E5E88 980788F8 5E88C02A F8468914 AE05E0D1 1À.Û..F½•à.^½....^.&.G..^%úG.... 000060
 5EC28CC3 88084788 26FA468A 08578926 06478926 02578926 07892699 C02B0E5E ^.+à.&..&.W.&.G.&.W..F•&.G..û.ô^ 000080
 13E80000 FE46C707 750ECA08 7E810E75 08C6067E 811AAC06 FF560000 04C8C8C9 èùà...V..¯..~.ó.u..~.ò.u.úF±..$. 0000A0
 2DC38815 750C0A47 F626065E C40001FE 46C72475 0C6F087E 81287508 02067E81 .-.@.u+.-.o.ú&úF±..á^.&-G..u..û- 0000C0
 C68102E6 C1FE7688 90907EE8 C02B0674 0114AE87 F6060868 F9F7000C 8999088A ¤..¿..%•kÀ.-.Û..t.+à$~...v±èl..ó 0000E0
 064688D5 74000802 54890489 02C4830F 8524189A 02006814 75024408 04880588 ¡....D.u.h....$ç..á....T..Àt(.F. 000100
 02E6C1FE 7688065E C4FC4689 14AE05E0 D1C103E0 01C888F9 F7000C89 99088A2D -¤..¿..%•.àIÀ.èIÀ.Û..F=á^..v±èl. 000120
 02448902 0088FC76 88025789 26078926 08578926 06478926 058A9488 05888488 ..¡...¤.&.G.&.W.&..&.W..v•¡...D. 000140
 20084688 000004C8 90C8C95E 00018802 0A4F8026 065E8811 07C60E88 04478926 &.G..8ó...^.&.O..¡..^èù.à....F.- 000160
 C44F7400 067E83FE 5E8CFC46 8914AE05 E0D1C103 E0D1C888 F9F7000C 8999088A ¤..¿..%•.àIÀ.èIÀ.Û..F•.^±.~..tOá 000180
 76FF3074 C00802C4 830FC725 3A9A50E4 2A08478A 26085EC4 46741007 F626FC5E ^•&-..tFá^.&.G.•ôP.:%ú..á..àt0.v 0001A0
 2699C028 085EC400 000247C7 260007C6 26FC5EC4 04C4830E 3210289A 0876FF0A ..v..(.2..á.á^=&ó..&úG...á^.+á.& 0001C0
 F9F7000C 8999088A 20064688 000004C8 C8C90857 89260647 89260257 89260789 ..&.W.&.G.&.W.èùà....F.-¤..¿..%• 0001E0
```

```
Dump of file SATURN:[PCCOMMON.DUMP.PBIN]ERRBE.EXE;1 on 18-APR-1990 10:54:47.29
File ID (361,10,0)   End of file block 38 / Allocated 40

Virtual block number 10 (0000000A), 512 (0200) bytes

 0C8CE8FC 76FFFE46 8904C483 0014E80E 0676FF08 76FF02C4 830C99E8 50FC4689 .F=PÒ...á..v..v..Ò...á..F±.v=Ò.. 000000
 F6265775 023C0324 0A478A26 065EC400 00FE46C7 000004C8 CBC9FE46 8802C483 .á..F±èùà...úF±..á^.&.G.$.<.uW&- 000020
 07882606 5E883874 0114AE87 F6060868 F9F7000C 8999088A 2DC38815 75080A47 G..u..ù-¤..¿..¥ªkÄ.-.Ù..t;.^.&.. 000040
 0F0F21FE 9A50E42A 08478A26 0677FF26 0877FF26 502A7EC0 08FC4689 06472826 &+G..F=.ä-*P&.w.&.w.&.G.*ÒP.±l.. 000060
 08578826 06478826 065EC4FF FFFE46C7 200A4F80 26065EC4 0074FC46 3808C483 .á.;F=t.á^.&.O. úF±..á^.&.G.&.W. 000080
 E8056A10 7E10509A 000C88EC 8855C8C9 FE468800 000447C7 26025789 26078926 &..&.W.&úG....F±èùW.&|...P.~.j.Ò 0000A0
 88064688 1C501689 1C4EA310 56880E46 881C601E 8C1C5EA3 1C648802 C4830C0E ...á.|d.È^...'..F..V.ÈN...P..F.. 0000C0
 F1E90374 25F47E80 0373E900 001C5806 C700001C 5A06C71C 3616891C 34A30856 V.É4...6.ú.Z...ú.X...Òs..-¶%t.Òp 0000E0
 32A31C38 A31C52A3 1C54A31C 3CA31C56 A31C3AA3 1C3EA3C0 2800011C 5C06C702 .ú.\...+àÈ>.È:.ÈV.È<.ÈT.ÈR.È8.È2 000100
 903EE800 301DC406 C70A46FF 49753001 7F80260A 5EC40020 1DC406C7 1C4CA31C .ÈL.ú.á. .á^.&...0ul.F.ú.á.0.$>. 000120
 1C3E3E83 0E75203F 80269028 E800001C 5206C71C 3E06FF0D 752B3F80 260A5E88 .^.&.?+u...>.ú.R...$(.&.? u..>>. 000140
 0A46FF1C 4C06FFC7 75203F80 260A5EC4 00E81C32 06FF9014 E81C5206 FF1A7500 .u...R.$....2.$.á^.&.?-uú..L..F. 000160
 BFE80E1C 62681E0A 76FF0C76 FF0D75C0 0802C483 0970E80E 5098078A 260A5E88 .^.&...P.Òp..á..àuï.v..v..hb..Ò« 000180
 4C3E831C 62A308F7 1C62A11C 4C06FF0C 7D001C62 3E830C56 890A4689 08C48308 ..á..F..V..>b..)...L.Àb.¥ÄÈb..>L 0001A0
 46FF1C54 06FF2075 2E3F8026 0A5EC400 201DC406 C7067530 1DC43E83 0074001C ..t..>á.0u.ú.á. .á^.&.?.u-..T..F 0001C0
 5C06C70A 7D001C5C 3E830C56 890A4689 08C48308 73E80E1C 5C681E0A 76FF060A ...v..h\..Òs..á..F..V..>\..).ú.\ 0001E0

Dump of file SATURN:[PCCOMMON.DUMP.PBIN]ERRBE.EXE;1 on 18-APR-1990 10:54:47.29
File ID (361,10,0)   End of file block 38 / Allocated 40

Virtual block number 11 (0000000B), 512 (0200) bytes

 006C302B 7400683D 4074004E 30307400 46309807 8A260A5E C41C540E FF00011C .....T.á^.&...=F.t==N.t@=h.t+=l. 000000
 80260A5E C40A46FF 03754C3F 80260A5E C4097500 1C3C3E83 00021C3C 06C70675 u.ú.<....><..u.á^.&.7Lu..F.á^.&. 000020
 C8E80008 1C3C06C7 D0E80010 1C3C06C7 D8E80001 1C3C06C7 900234E9 1C75003F 7.u.Ò4..ú.<...$Àú.<...$Àú.<...$à 000040
 46B820F8 46831C3A 06FF0875 00583D05 74004730 0A740045 30F84689 98078A26 &....F½=E.t.=G.t.=X.u...:..F½ .F 000060
 0126E903 75002530 0138E903 7E0125E9 03750063 300177E9 037E5E74 006930F8 ½=i.t^-.Òw.=c.u.Ò%.-.Ò8.=%.u.Ò&. 000080
 00E80000 0247C726 0789261C 58A11FC4 261C4E1E C4157502 1C3C3E83 90013FE9 Ò?...><..u.á.N.&á.ÀX.&..&úG...$. 0000A0
 90019CE9 0156E903 75001C5A 3E83041C 4E068307 89261C58 A11FC426 1C4E1EC4 á.N.&á.ÀX.&....N...>Z..u.ÒV.Ò... 0000C0
 06FF1C38 06FFF2E8 086A900D E802C483 0180E80E 0A6A0000 1C3206C7 1C5606FF ..V.ú.2...j..Ò¯..á.$ï.j.$·..8... 0000E0
 A3C02B7A 74011C3C 3E830081 E9037508 1C3C3E83 00041C5C 06C71C54 06FF1C3A :...T.ú.\....><..u.Ò...><..tz+àÈ 000100
 13E80000 1C6206C7 0A74001C 4C3E83FA 46891C62 A128741C 620639FA 46891C3C <..Fª9.b.t(Àb..Fª.>L..t.ú.b...$. 000120
 C4830142 E80E106A 021C4E06 831C62A3 C028027D C0081C62 A1051C62 2E839090 ....b..Àb..à).+àÈb...N..j..Ò8..á 000140
 1C62A300 052DFA46 88157400 1C4C3E83 227400FA 7E8302C4 83049FE8 0E3A6A02 .j:.Ò...á..-ª.t".>L..t..Fª-..Èb. 000160
 02C48301 03E80E10 6A041C4E 2E830000 1C6206C7 9007EB1C 62A3C02B 027DC008 .à).+àÈb.$..ú.b.....N..j..Ò...á. 000180
 0EF876FF F4E8016A 90FF39E9 0280E80E 006A90FF 3FE9106A FF2AE902 1C4E0683 ..N..Ò*.j.Ò?..j..Ò..Ò9..j.$¶.v½. 0001A0
 00673005 7C006530 FF0CE903 7500643D 90FF21E9 043AE80E 256AFF2A E9035BE8 Ò(.Ò*.j%.Ò:.Òl..=d.u.Ò..=e.|.=g. 0001C0
 EBFE5689 FC468940 0C56880A 46880A4E FF0C5688 0A468809 74001C3C 3E830A7E -Ò.><..t..F..V..N..F..V.@.F=.V±$ 0001E0

Dump of file SATURN:[PCCOMMON.DUMP.PBIN]ERRBE.EXE;1 on 18-APR-1990 10:54:47.29
File ID (361,10,0)   End of file block 38 / Allocated 40

Virtual block number 12 (0000000C), 512 (0200) bytes

 308F7400 7330FEEU E9037500 703DFEE4 E9037500 6F3DFE9A E9037500 6E30903A :.=n.u.Ò.±=o.u.ÒÒ±=p.u.ÒÀ±=s.t.= 000000
 8A26FC5E C4FC46FF 9034E80A 46FF90B1 EBFF79E9 03750078 30FEB9E9 03750075 u.u.Ò¿±=x.u.Òy.$Ÿ..F.$4..F=á^=&. 000020
 8806C483 045EE80E 0A76FF0C 76FF500A 462BC388 EC75253C 0474C00A F4468807 ..F¶.àt.<%u$.ú+F.P.v..v..Ò^..á.. 000040
 261C341E C4FC7DE9 0374C00A F4468807 8A260A5E C40C5689 0A4689FE 5688FC46 F=.V±.F..V.á^.&...F¶.àt.Ò)=á.4.& 000060
 90C8C9F6 468802C4 83085EE8 056AF646 891C58A1 9004EBFF FFB80674 200A47F6 -G. t.j..$..ÀX..F-j.Ò^..á..F-èù. 000080
 3C3E831C 5606FF04 740A067E 83002010 C406C706 74001C54 3E835657 000012C8 à...WV.>T..t.ú.á. ..-..t...V..>< 0000A0
 1C4E0683 FE5689FC 46890257 88260788 261C4E1E C4197510 1C3C3E83 0774021C ..t..><..u.á.N.&..&.W..F=.V±..N. 0000C0
 1C4E1EC4 0EE80000 FE46C7FC 46890788 261C4E1E C4117400 1C563E83 902CE804 .$,..>V..t.á.N.&...F=úF±..$.á.N. 0000E0
 46880674 FE4608FC 46880E74 001C323E 83021C4E 0683FE56 89FC4689 99078826 &....F=.V±..N...>2..t..F=.F±t..F 000100
 FE7E8331 75001C56 3E83F456 89F24689 1C601688 1C5EA11D C2A3C02B 9003EB06 .$..+àÈÒ.À^...'..F·.V¶.>V..ul.~± 000120
 DAF70002 8308F7FE 5688FC46 882007C6 26F246FF F25EC41D 750A067E 83287D00 .)+.-..u.á^·.F·&6.·.F=.V±¥Ä.@.¥Ò 000140
 1E0676FF FA5E8CF8 46891C40 880000F6 46C79006 E80001F6 46C7FE56 89FC4689 .F=.V±úF-..$..úF-..¡@..F½.^ª.v.. 000160
 8824FE9A F876FFFA 76FF4574 001C543E 830AC483 159F2516 9AFC76FF FE76FF50 P.v±.v=..%...á..>T..tE.vª.v½.±$£ 000180
 4E880000 1DC206C7 0675081D C23E8300 7EC908F0 4E89C828 1C5C0E88 04C48310 ..á...\.+à.NÞ.è~..>ò..u.ú.ô....N 0001A0
 8C1C3A0E 88F04E89 F4468CF2 7E89F47F C00849C1 88473005 C62605E8 F27EC4F0 Þá--$.&6.0G.èl.â.¶.-·.F¶.NÞ..:.. 0001C0
 003F8026 F846FF46 202C8003 7C613C07 74C90804 88078A26 F85EC4F2 76C5EE5E ^Ÿév·á^½&.....èt.<a|.., F.F½&.?. 0001E0
```

Dump of file SATURN:[PCCOMMON.DUMP.PBIN]ERRBE.EXE;1 on 18-APR-1990 10:54:47.29
File ID (361,10,0) End of file block 38 / Allocated 40

Virtual block number 13 (00000000), 512 (0200) bytes

```
7500F67E 8308741C 5206081C 3EA11475 001C563E 83EE5E8E F45E8CF2 7689E375 uD.v·.^¶.^Ÿ.>V..u.À>...R.t..—.u 000000
18740006 7E835657 000010C8 CBC95F5E 02C48302 FFE80E50 C02B02EB 0001B805 .¡..Š.+áP.Ò...á.^_èùà...WV.-..t. 000020
C4137408 1C3C3c83 008FE902 1C4E0683 FA5689F8 46891C50 16881C4E A10001BE ƒ..ÀN...P..F%.V°.¯N..Ô...><..t.á 000040
8CF84689 FC468907 88261C4E 1EC410E8 FA5689F8 46890257 88260788 261C4E1E .N.&..&.W..F%.V°$.á.N.&...F•.F%. 000060
00FC7E83 900AE805 C0881575 FA4608F8 46880E74 081C3C3E 83041C4E 0683FA5E ^°..N...><..t..F%.F°u.|á.Š...-•. 000080
881C741C 543639F6 28F45689 F24689FA 5688F846 88FA5E8C F8468905 C7880975 u.¡ú..F%.^°.F%.V°.F·.V¶+-96T.t.. 0000A0
46FFF25E C44690ED E8107ECE 38461574 003F8026 F246FFF2 5EC4900E E81C5C0E .\.Š..á^·.F·&.?.t.F;ö-.ŠÙ.Fá^·.F 0000C0
FA76FF56 02C48301 59E80E57 0875001C 4C3E83FE 281C623E 88F37500 3F8026F2 ·&.?.uµ.>b.+±.>L..u.W.ÒY..á.V.v° 0000E0
06C890C8 C95F5E02 C483013C E80E5708 74001C4C 3E8306C4 830183E8 0EF876FF .V%.Ò°..á..>L..t.W.Ò<..á.^_èù.à. 000100
9003E801 80057547 067E8306 7467067E 83FE5689 FC46891C 5016881C 4EA10000 ..ÀN...P..F•.V±.-.gt..-.Gu.¯.Š.. 000120
C7067500 1C5C3E83 007400FA 7E800006 1C5C06C7 0675001C 543E83FA 4688C02A °á.F°.>T..u.ú.\....-°.t..>\..u.ú 000140
068EFC76 FFFE76FF 1C5E36FF 1C6036FF 0676FF1C 5C36FF1C 3A36FF00 011C5C06 .\....6:..6\..v..6'..6^..v±.v•.. 000160
8E1C5E36 FF1C6036 FF147500 1C323E83 187400FA 7E800EC4 831AAE1E FF261AF8 %.&..Û..á..-°.t..>2..u..6'..6^.. 000180
5E36FF1C 6036FF14 75001C5C 3E831874 001C323E 8304C483 1A821EFF 261AF806 .%.&..ý..á..>2..t..>\..u..6'..6^ 0001A0
741C5206 081C3EA1 00001DC2 06C7081C 4E068304 C4831A8A 1EFF261A F8068E1C ...%.&..¤..á...N..ú.ó...À>...R.t 0001C0
0E50C028 02E80001 880574C0 0804C483 1A8E1EFF 261AF806 8EFC76FF FE76FF1B ..v±.v•..%.&..ƒ..á..ât.|..Š.+áP. 0001E0
```

Dump of file SATURN:[PCCOMMON.DUMP.PBIN]ERRBE.EXE;1 on 18-APR-1990 10:54:47.29
File ID (361,10,0) End of file block 38 / Allocated 40

Virtual block number 14 (0000000E), 512 (0200) bytes

```
2606468A 1478044F FF261C34 1EC43C75 001C5A3E 83560000 00C890C8 C90129E8 Ò).èù.à...V.>Z..u<á.4.&.O.x..F.& 000000
06C48318 7708049A 0676FF53 1C3636FF 10E8E42A 04882602 478E2607 FF263788 .7&..&.G.&..°ÒŠ..66.S.v..á.w..á. 000020
88577500 1C5A3E83 56570000 02C890C8 C95E1C58 06FF9005 E81C5A06 FF077540 àu...Z.Š....X.^èù.à...WV.>Z..uW. 000040
FF047540 06C48318 0F08049A 1DC436FF 1C3436FF 1C3636FF 1BE8507E F60B0676 v..--P$..66..64..6á..á.Ô..á.àu.. 000060
478E2607 FF263F88 261DC4A0 D478044F FF261C34 1EC41E7E C00B4EC6 881C5A06 .Z..6N.á-.á.4.&.O.xá.á.&.7&..&.G 000080
56570000 02C8CBC9 5F5E1C58 06010646 88077500 1C5A3E83 D4E8E42A 05882602 .&..°ÒŠá.>Z..u..F...X.^_èùà...WV 0000A0
5108049A 5098078A 26065EC4 1C3436FF 1C3636FF 22E85E75 001C5A3E 830A7688 .v..>Z..u^$".66..64.á^.Ī...P.á.Q 0000C0
C4C07804 4FFF261C 341EC425 74C00B4E C6880646 FF1C5A06 FF047540 06C48319 ..á.àu...Z..F..6N.át%á.4.&.O.xeá 0000E0
75001C5A 3E83CA[illegible] E42A0588 2602478E 2607FF26 3F88261C 341EC407 8A26065E ^.&..á.4.&.7&..&.G.&..°ÒŠò.>Z..u 000100
C02BF656 89F446 1C601688 1C5EA156 00000CC8 CBC95F5E 1C580601 0A468807 ..F...X.^_èùà...VÀ^....'..F¶.V-+á 000120
3E830676 28F028F8 468904C4 83158A24 FE9AF476 FF521C62 3688FA46 89FC4689 .F•.F°.6b.R.v¶.±$....á..F%+Þ+v..> 000140
203F8026 F45EC422 75001C4C 3E834E01 750810C2 3E8308E8 02EE8305 751010C2 ò..u..Ÿ.Š..>ò..u.N.>L..u"á^¶&.?- 000160
3010C43E 83F84EFF 02C483FE 71E80E50 98078A26 F446FF12 75301DC4 3E831975 u..>á.Ou..F¶&...P.Òq±.á..N%.>á.0 000180
74001DC2 3E830066 E80EFA46 FF077400 067E8318 74001C4C 3E83077E F60B0B74 t..--..>L..t..-..t..F°.Òf..>ô..t 0001A0
FA7E830A 7400067E 8302C483 FE7EE80E 56297500 1C4C3E83 0070E80E FC46FF07 ..F•.Òp..>L..u)V.Ò-±.á..-..t..-° 0001C0
76FFF676 FFF876FF 0040E80E 047500FC 7E830A74 001DC23E 830039E8 0E047500 .u..Ò9..>ô..t..-•.u..Òà..V%.v-.v 0001E0
```

Dump of file SATURN:[PCCOMMON.DUMP.PBIN]ERRBE.EXE;1 on 18-APR-1990 10:54:47.29
File ID (361,10,0) End of file block 38 / Allocated 40

Virtual block number 15 (0000000F), 512 (0200) bytes

```
CBC95E02 C483FE38 E80E5600 201DC406 C70E7400 1C4C3E83 06C483FE 85E80EF4 ¶.Òç±.á..>L..t.ú.á. .V.Ò8±.á.^èù 000000
C483FDC8 E80E306A C802C483 FD02E80E 50002088 03E80020 88057400 1C3E3E83 .>>..t.¡+.Š.¡ .P.Ò0».á.ùj0.Òà•.á 000020
C802C483 FDAAE80E 50007888 03E80058 88057400 1C3A3E83 1775101D C23E8302 ..>ô..u..>:..t.¡X.Š.¡x.P.Ò`•.á.ù 000040
021C4E06 8337882o 1C4E1EC4 12752A3F 80260A5E C40001FE 46C75657 000006C8 à...WVúF±..á^.&.7*u.á.N.&.7..N.. 000060
88078A26 0A5E88F6 280A46FF FFFFFE46 C7087520 3F80260A 5EC49060 E80A46FF .F.$'.á^.&.?-u.úF±...F.+-.^.&... 000080
802606E8 F8880030 10C406C7 0675303C 0A751C54 3639387F 393C3F7C 303CFA46 F°<0|?<9.;96T.u.<0u.ú.á.0..«Š.&. 0000A0
890F7030 30802647 F18830E9 83C803E1 D1CE0302 E1C1CE88 98058A26 187F393D =9..&....öeÀ..ö1Ã.à.Ò0.þG&.=0)Ò. 0000C0
000004C8 CBC95F5E 0C5688DA 46883789 26065EC4 F088EEF7 FE46880C 468C0A7E -..F..F±%Ÿ.Þá^.&.7.F..V.^_èùà... 0000E0
0188F475 00382611 74003080 264701E8 FC7EC406 4E8AFE5E 8CFC4689 05CE8857 W¡ö..F•.^±.N.á-•Š.G&.=.t.Ī8.u¶¡. 000100
4689088A 88560000 06C890C8 C95FC028 FE468CFC 7E899009 E8FE468C FC7E8900 ..-•.F±Š...-•.F±+á_èù.à...V¡¤..F 000120
1AA8A10C FA468302 C4830156 E856900C E8FE7688 02C48301 87E8026A FC5E8CFA °.^•j.Ò...á..v±Š..V̄ÒV..á..F°.À´. 000140
5EC402C4 830125E8 56F088F9 F7000C89 99088A2D FA468843 77FA4639 1AAA1688 ..`.9F°wC.F°-¤..¿..%°.ÞVÒX..á.á^ 000160
89260789 26085789 26064789 26990A47 88260447 8926C028 CA75830A 47F626FA °&-G..uò+à&.G.&.G..&.G.&.W.&..&. 000180
8802C483 0139E802 6AFA4689 FC4689C0 28FE7689 08E8FE76 89FF0847 C6260257 W.&6G...v±Š..v±+á.F•.F°j.Ò9..á.. 0001A0
00E4E853 EF6EE9C0 3300098A 127206A6 1E38065E 88EC8855 CBC95EFC 5688FA46 F°.V•^èùU.$.^.;.Ī.r.¤..3áÒnyŠÒÒ. 0001C0
00C4E853 0006A887 C6E575C0 850000FF FF9A5302 C48300CE E853EF80 E902C483 .á.Ö.ySÒö..á.S......àuIó.´..SÒá. 0001E0
```

```
Dump of file SATURN:[PCCOMMON.DUMP.PBIN]ERRBE.EXE;1 on 18-APR-1990 10:54:47.29
File ID (361,10,0)   End of file block 38 / Allocated 40

Virtual block number 16 (00000010), 512 (0200) bytes

 0A7EC4FF 758DAEF2 FFFFB9C0 33067EC4 1EDE8807 88EC8855 00CB5DE5 8802C483 .Á..|}ù.U.‰.Ë.Ë.á~.3â¿...Û.u.á~. 000000
 F3E9D149 A4027. ) 01C6F706 4688FE87 08468E08 8EC08CF9 28D1F7AE F2FFFFB9 ¿...ÚÑ|÷*.å.Ä.F...±.F.%ó..t.€||Ô¤ 000020
 33C08ED8 8CFE88UA 76C51EDE 88D788EC 8855C85D C28C1FFA 88F388A4 F3C913A5 Ë.è¤Ê.¤.*..ó]üU.‰.Ë.Ë.év..±.Ä.â3 000040
 1FFA88F3 88A4F3C9 13A5F3E9 D149A402 7401A8C7 88067EC4 D1F7AEF2 FFFFB9C0 â¿...ÚÑ|é~..ú´.t.€||Ô¤Ê.è¤Ê.¤.*. 000060
 08C8E908 7EC51E99 01750AF9 83023306 46880C4E 88018357 56EC8855 C85DC28C .ô]üU.âVW*..N..F.3@.*.u...é~.Öù. 000080
 05044688 50EC8855 44E80000 05044688 50EC8855 28E80000 05044688 50EC8855 U.‰P.F....Š+U.‰P.F....ŠDU.‰P.F.. 0000A0
 FF6A50FF FF6802E0 C1044688 50EC8855 2CE80100 05044688 50EC8855 13E80100 ..Š.U.‰P.F....Š,U.‰P.F.èÅ.h..Pj. 0000C0
 6802E0C1 04468850 EC885518 3825209A C35DE588 580575C0 080000FF FF9AFF6A j.......âu.X.|]ù. X;.U.‰P.F.èÅ.h 0000E0
 5DE58802 C483FF86 E80676FF EC8855C3 5DE58858 E475C008 00000375 9A501CD8 Û.P.u....âuðX.|]üU.‰.v.ÒÑ..á..|} 000100
 9A5050C0 330676FF 0876FFEC 885500C8 5DE58802 C483FFC8 E80676FF EC8855C8 üU.‰.v.Òù..á..|}ù.U.‰.v..v.3âPP. 000120
 0006A126 0198068E 1C72082B DC885A59 00CB5DE5 88EE18E9 0374C085 0000FFFF .....ât.Õ.Ý.|}ù.YZ.É+Ár.....&Á.. 000140
 52E981E9 C0330575 40050A41 CB5152E0 88057205 08873893 E0D1480F 7700203D = .w.HiÁ.;.Á.r..ÁRQùÀ‰.âu.3âÕÝÒR 000160
 52165016 53C48850 8706A8A7 80048852 00028800 00FFFF9A 286A0005 042EFF51 Q..å..j(.....£..R.‰.Ï´.ñP.âS.P.R 000180
 5AD47948 06A88F08 08810675 00023007 74000130 40811275 58C00800 00FFFF9A ......âXu.Ýâ=..t.=..u.Ý...´.KyåZ 0001A0
 E1E81AEE BF1AEEBE 0013E858 580000FF FF9A5316 520E0728 8A50DC8B 5050C033 3âPP.ÉPɑ(..R.S.....XXÒ..ƒŸ.«Ÿ.ÒÃ 0001C0
 E21EFFDB 33C28C1A E606C401 8E36882E E31AE40E 88C80008 E81AEEBF 1AEEBE00 .ƒŸ.«Ÿ.ÒÁ.ù..ô.D..6..á.Ï..ö3Ù..ã 0001E0

Dump of file SATURN:[PCCOMMON.DUMP.PBIN]ERRBE.EXE;1 on 18-APR-1990 10:54:47.29
File ID (361,10,0)   End of file block 38 / Allocated 40

Virtual block number 17 (00000011), 512 (0200) bytes

 C31AE21E FF00038B C28C1AEA 06C40075 4800061E 88260198 068E0000 E903731A .s.ÕÅ.....&....Ku.á.ð.´.óÉ....ã.û 000000
 0036E8EC 885506E8 008AE81A F28F1AEE 8E0093E8 1DC68F1D C68E0050 E8EC8855 U.‰ÒP.ƒó.«ó.Ò..ƒŸ.«´.Ò..Š.U.‰Ò6. 000020
 7500067E 830874C0 081CF308 5E9A0070 E81AF28F 1AF28E00 79E81AF2 8F1AF28E ƒ´.«´.Òy.ƒ´.«´.Òp..^.µ..ât..–..u 000040
 C483FE52 E80C6AEC 88550000 08359A50 06468A50 00018800 48E800FF 0646C705 .úF...ÒK.¡..P.F.P.S...U.‰j.ÒR±.á 000060
 54E80C6A 9F08881E 3908881E 890475FF FF3D0888 A1480006 1E882601 98068E02 .....&....KÅ¡.=..u...¡.9.¡..j.ÒÏ 000080
 E21EFF00 028807E3 1AE40E88 C35DE588 F8E80000 FFFF9A53 4309749E 02C483FE ±.á..t.CS.....Š%.|}ù..ô.D.£....ã 0000A0
 9A1E885A E854E900 028800C3 EEE81DFF F2740245 08058804 EF830E73 F738C31A .û;%s..ÿ....E.t´..ŠÝù.¡..ÕÏÒZ... 0000C0
 490C7558 C0850000 FFFF9A1E 5150410F C98049C8 88197201 901E3826 72080301 ..Ár&;...r..ùl.è.APQ.......âXu.Ï 0000E0
 04C800E2 FFC388E3 88027205 D81E3808 72082B0C 880EE8F8 019A1E87 01900E89 ........%Š..É+Ár.;.Ä.r..Ð.û.ã.â. 000100
 FC468914 AE05E0D1 C103E0D1 C888F9F7 000C8999 088A2004 46881AAC 06FF0000 ....¯..F.-ɑ..¿..%*.âlÅ.èlÅ.Û..F= 000120
 4F802611 74D00808 57892606 47892604 5EC402C4 831E5524 189A0200 68FE5E8C .^±h....ŠU..á.á^.&.G.&.W..Át.&.O 000140
 47892640 FE5688FC 4688040A 4F802604 5EC49021 E8020002 47C726FC 5EC4080A ..á^*&úG...Š!.á^.&.O...F=.V±@&.G 000160
 02578926 07892608 57882606 47882604 5EC40001 0247C726 FC5EC408 57892606 .&.W.á^*&úG...á^.&.G.&.W.&..&.W. 000180
 5E88FE46 89FFFF88 02EC83EC 885509E8 C03302EC 83EC8855 C3C90000 0447C726 &úG...èûU.Š.Š.3âŠ.U.Š.Š.¡....F±.^ 0001A0
 E886E902 C483FCEA E8530774 C908FE4E 88E878E9 C0330009 8A197206 A61E3806 .;.Ï.r.ɑ..3âÕ(Š.N±.èt.SÒö*.á.Õ.Š 0001C0
 00FFFF9A 51160C76 FF0876FF 0A76FF53 CC8804EC 8302C483 FCD0E853 0774C008 .ât.SÒÅ=.á..Š..aS.v..v..v..Q.... 0001E0

Dump of file SATURN:[PCCOMMON.DUMP.PBIN]ERRBE.EXE;1 on 18-APR-1990 10:54:47.29
File ID (361,10,0)   End of file block 38 / Allocated 40

Virtual block number 18 (00000012), 512 (0200) bytes

 00CB5DE5 889102C4 83FCADE8 530774C0 08FE4688 FD06A8A7 80C875C0 855A5900 .YZ.âuà.Ï´.».F±.ât.SÒÙ*.á...|]ù. 000000
 E80C4E88 52520233 52F8568D 1652FE56 8D160676 FF0876FF 40870EEC 83EC8855 U.Š.Š.ñ@.v..v...V±R..VŸR3@RR.N.Ò 000020
 76FFFE46 805002CA 80?27402 00A92A75 0400A910 CA800874 0100A90A 468801A1 À..F.´..t..ò.´..u*´..t".ò.P.F±.v 000040
 03255251 01CA8003 E8FE4E88 087558C0 850000FF FF9A5050 C0335016 0^76FF08 ..v..P3âPP......âXu..N±Š..ò.QR%. 000060
 118A0374 00028AF0 C2F60E75 006E3D16 74C00800 00FFFF9A 5050C033 50( 0A00 ..úP3âPP......ât.=n.u.-òbɑ..t.ɑ. 000080
 F7E850E4 E8C03300 188A0000 18EF9A50 0D7206A6 0638FE46 88009DE9 EAA6 ?00 .ÕÏðÕ...F±;.Ï.r.P.ÿ...ɑ..3âŠÕPÒ% 0000A0
 A9C9330A 46886175 C0080000 1DA19A50 F8468016 53F45E8D 16500088 02C483F8 «.á..ÁP..^¶S..F%P.Å....âuɑ.F.3è´ 0000C0
 40F446C6 0775013C F4468AF2 4E888081 0275801A C906F607 754000A9 0E758000 ..u.´.âu.-.è..u.Ý..N´.F¶<.u.óF¶â 0000E0
 89527C74 00020A46 F7F474C9 0AF44688 C032008C E908F446 C6077502 3C0097E9 Õ..<.u.óF¶.Õ..2â.F¶.èt¶%F...t|R¿ 000100
 83E8FE76 FF0C7400 83301574 C0080000 1FFD9A50 FA468016 51000289 5151FFFF ..QQ¿..Q..F*P.»....ât.=..t..v±Ò. 000120
 080000FF FF9A50F8 46801650 00018850 F6468016 524FE8C0 33EA1FE9 02C483F8 =.á.Õ.õ3âŠÕR..F-P¡..P..F%P...... 000140
 FFFF9AFA 76FFFC76 FF00FC5E 8301FA6E 83521875 1AF67E83 3274F846 392375C0 âu#9F%t2.--.u.R.n*..^=..v=.v*... 000160
 48C1F6F4 4E8AA175 C0080000 212E9A50 FA468016 505050C0 33528575 C0080000 ...âuçR3âPPP..F*P..Ï...âuÀ.N¶-èN 000180
 10C98003 740001F8 46F70000 20689A50 50C03350 F8468016 0676FF08 76FF2875 u(.v..v...F%P3âPP.k ..%F%..t..è. 0001A0
 8802C483 FAE8E853 06A88F88 D888C288 01C980F2 4E0A20C9 80037400 080A46F7 %F...t..è .N´.è..ô.Ä..´.SÒÒ*.á.. 0001C0
 885509E8 C0330EEC 83EC8855 C301C980 037580A8 C933C123 D0F70660 A1CB50E5 |}ùÀ'.%Á#è3è´.u..è.ûU.Š.Š.3âŠ.U. 0001E0
```

```
Dump of file SATURN:[PCCOMMON.DUMP.PBIN]ERRBE.EXE;1 on 18-APR-1990 10:54:47.29
File ID (361,10,0)   End of file block 38 / Allocated 40

Virtual block number 19 (00000013), 512 (0200) bytes

530774C0 08E92FE9 C0330009 8A087206 A61E3806 5E88F246 89FFFFB8 0EEC83EC &.&.|...F·.^.;.!.r.¤..3àÒ/Ö.àt.S 000000
F6000021 929A5016 F44680S1 41415151 C9335312 742006A8 87F602C4 83FA95E8 Ò.*.á.-.´. t.S3èQQAAQ.F¶.P..!..- 000020
6689F288 FA885657 FCFC4689 FE4689C0 330856C5 0A468EFA 5E8C7D74 8006A887 .¨..t).^*.F.éV.3à.F±.F••WV.*.·.f 000040
DC8802EC 831F4C74 00A8301F 4926389A FA5E8E1E 5275AEF2 0A803FE3 0C4E88F8 ¾.N.D?¯.·ÜuR..^*.B&I.=´.vL..å..É 000060
AA1A74F8 3B0D740A 3CAC0C4E 880716FA 88D488E2 2800808A 03730228 3002008A ¤..=(.s.¤..+ã.å.*..N.¯<.t.;«t.´ 000080
5F5EE1E8 0022E8E2 E8FC46FF 0A80AA00 2DE80375 F8380080 00A8E900 39E8F4E2 â¶Ò9.Ò´.¯.;«u.Ò-.¯¯..F•ŠäÒ".ŠÃ^ 0000A0
53502273 1D509AFF FC8802C4 83F9F1E8 0676FF09 74C008F2 468800C1 E9FA5E8E .^*Òé..F·.åt..v.Òþ*.á.¡=..P.s"PŠ 0000C0
881175C0 0800000A F29A5016 F4468D51 521E5306 5E881FE3 CA28CF88 1F061E51 Q....ü+ÒD..^.S.RQ.F¶.P.·....åu.. 0000E0
00013000 74006D30 1874C008 08C4831F C3FA8858 58591F07 74D808FE 5E01F45E ^¶.^±.Üt..Y[X.*ú..á..åt.=m.t.=.. 000100
085E880A 5E8E0E74 4006A887 F6FE5E8E 26E8F900 208A03E8 001C8A08 7500098A ¤..u.¤..Š.¤ .*Š&.^±-.´.@t..^..^. 000120
1472FA5E 8E5F5EF8 6688FC46 28FE4688 06E8F9C0 33001CBA 0EE8F803 751A3F80 .?.u.½Š.¤..3á*Š..F±+F•.f½^_.^*r. 000140
43E80676 FF0974D8 08F25E88 C850E588 02C483F9 57E80676 FF0974D8 08F25E88 .^·.Üt..v.ÒW*.á..!)ù.^·.Üt¯..v.ÒC 000160
9A5016F4 468D5152 1E530856 C51ECEE8 C1880475 C9080C4E 88E7C3E9 02C483F9 *.á.ÒùÒ.N..èu..èŠò.éV.S.RQ.F¶.P. 000180
00208A87 E8001CBA 8C750009 8A00013D 0D74006D 301774C0 081F071E 000022F7 ¾"......åt.=m.t.=..¤..u#¤..Šñ¤ . 0001A0
E8C03300 1C8A86E8 02751A3F 80260A88 0A744006 A887F697 75C008F4 468882E8 Šý.F¶.åu.-.´.@t..Ò&.?.u.$.¤..3åŠ 0001C0
83F8F6E8 096A04C4 83000FE8 0E0676FF 0876FF02 C483F8E6 E8096AEC 88550093 ..U.&j.Òl½.á..v..v..Ò...á.j.Ò-½. 0001E0

Dump of file SATURN:[PCCOMMON.DUMP.PBIN]ERRBE.EXE;1 on 18-APR-1990 10:54:47.29
File ID (361,10,0)   End of file block 38 / Allocated 40

Virtual block number 20 (00000014), 512 (0200) bytes

096AEC88 55C850E5 8801FE4F 80260574 C308C08C 065EC4EC 8855C85D E58802C4 á..[]ùU.&á^..å.ùt.&.O±..[]ùU.&j. 000000
02EC83EC 8855C850 E58802C4 83F8C2E8 096A5800 0DE80E06 76FF02C4 83F8ADE8 ÒU½.á..v..Ò..[j.Òó½.á..[]ùU.&.&. 000020
18E81575 0088E81A D4A31274 0025E808 75001AD4 3E831E73 FFF13006 46885756 VW.F.=þ.s..>å..u.Ò%.t.Èå.Ò..u.Ò. 000040
76065E39 00F088C8 5DE5885E 5F02C483 22DC2680 9A0676FF 08750081 E8057400 .t.Ò..u..v...&É".á._^.[]ùÉÞ.9^.v 000060
8308C483 246E283A 9A500280 510E4F80 50501EC0 33FE5E89 FEE38343 065E8807 ..^.C.D±.^±3à.PP.O.Q¯.P.:(n$.á.. 000080
880008A3 DA8E0574 D2081ADC A303761A DC063B1A D8A31AD6 1687C288 4174FFFA *.tA.ó..•.ÈÄ.;.É.v.ÈÉ..@t..ÒÉ... 0000A0
00000500 0AA30147 8D0002A3 0000A300 0A880C47 89484800 08A3C033 D88EFE5E ^±.Ä3àÉ..HH.G.¡..É..É...G.É..... 0000C0
8855C309 8EC18CD2 0801E0E8 1AD81E8E D833064E 88C08ED8 8CC31FD8 8C0006A3 É...Ä.û.Ä.ã.N.3Ü..Ä.ÒÄ..@.è.1ùU. 0000E0
003EE900 835756EC 885500C8 50FA8891 49D1F7AE F2FFFFB9 C033067E C4D788EC å.má-.3à¿..·ÜK1I..*]ù.U.&VW*.Ò>. 000100
065E88EC 885500C8 5DE58825 2A1E3A9A 500003B8 249A0AC8 9A50000A 88EC8855 U.$¡..P.à..$¡..P.:.*X.[]ù.U.å.^. 000120
4E8800C8 5DE588C0 3302E800 01880574 4006A887 F60C7C00 F883117D 06A61E38 ;.].)..«.|.-.´.@t.¡..Š.3á.[]ù._.N 000140
AA2D800A 79020B0E 750AF983 1374C00A 93FC071E 570A7EC5 1E085688 0646880E ..F..V..é-.W..•..åt..*.u..@y.¯·¯ 000160
27040276 393C3004 D38792F1 F793F1F7 0274C008 D23392F7 880AF700 ^?83D8F7 ½Ü.@.½Ò.½.3@.ät.½þ.½þ..ß.0<9v..' 000180
5DE5885E 5F1F580A 8CF272C7 38014480 FF448805 86AC4F05 88E275C3 0L¯288AA ´.ò.ùuã..O¯...D..D.;ùr·.ÒX._^.[] 0001A0
38EBFE76 8802C483 F6F8E802 6AFF28FA 5E8CF846 89088A88 56570000 08L400CB ù.à...WV|¤..F½.^*+.j.Ò½-.á.¯v±Š8 0001C0
060E7483 0A47F626 F85EC402 C483F6AE E856F088 F9F7000C B999088A 2DF84688 .F½-¤..¿..½*.ÞVÒÜ-.á.á^½&-G..t.. 0001E0

Dump of file SATURN:[PCCOMMON.DUMP.PBIN]ERRBE.EXE;1 on 18-APR-1990 10:54:47.29
File ID (361,10,0)   End of file block 38 / Allocated 40

Virtual block number 21 (00000015), 512 (0200) bytes

391AAA16 881AA8A1 0CF84683 02C483F6 98E85647 01744004 C4832533 10289A53 S.(.3X.á.@t.GVÒ.-.á..F½.À´...´.9 000000
88260198 068E5A59 C8C95F5E C78802C4 83F6C6E8 026AFE76 89FC7E89 8C76F846 F½v¥.-•.v±j.Òó-.á..ú^ èùYZ....&. 000020
065E88EC 885500F9 E8C033C8 51520BF7 C4280773 C4380508 8788E301 4800061E ...K1D..Ä.;ás.+áXÄRQù3àŠ*.U.&.^. 000040
C483000F E80E0676 FF02C483 F65CE809 6AEC8855 C850E588 01FE4F80 04740808 .Üt..O±..[]ùU.&j.Ò\-.á..v..Ò...á 000060
E8000588 071E2975 003F831A CA885756 EC8855C8 50E58802 C483F66F E8096A02 .j.Òo-.á..[]ùU.&VWÉò..?.u)..¡..Ò 000080
89FFFEFE 44C704C6 83000104 C7961ACC A31ACAA3 FE244024 E899C033 05750177 w.u.3à.Š$@$±Éò.Èä..ú....ó.ùD±±.. 0000A0
EEF983FE E180FA74 41000DE9 00C85DE5 885E5F00 0AE8C08E D88C064E 881A0036 6À..N..Ä.àÒ.._^.[]ù.ÒÄ.At*.Ä±.*Ÿ 0000C0
000205C2 03357401 A8ADF003 D0881573 C1384843 7401A8FE 88ADFC02 7788F273 s·.w.=Ü.±´.tCÑ;ès..Å.ÞÜ´.tS.ó... 0000E0
DA8CC688 FE4CFEF9 0305E805 8948C128 FE4C89F9 030C74FE 88E6E8FE 4489F788 .½.D±Šl.±t..*.L±+èH..Š..*±L±.ó.Ö 000100
ADF003FE 882574FF FE30021A DE06C626 C3027F89 1AD81E8C 260574D1 380E8589 ¿ç.;lt.&..Ä....ù&ó.B..=±.tX.±.ÞÜ 000120
E6E8FE44 89F78800 0205C203 E27401A8 ADF00300 888C73C1 3848FE88 F27401A8 ´.t·.±N;ès¥.Å.ÞÜ´.tã.ó....½.D±Šl 000140
1AD41E8E 260574C7 382721BF D88C1274 1ADE0EFE 2615E808 8E0474C0 08084788 .G..åt..ÄŠ.&±.B.t..Äel';ùt.&..å. 000160
001DE8FE 4DFE0074 005FE898 40400124 0074C638 0068E8C0 33067788 88E83788 .7ŠÉ.w.3àÒk.;ót.$.@@.Ò_.t.±M±Ò.. 000180
458851C3 99C03302 47890788 1AD8A326 0474C138 27758908 8C98E84E 4E960574 t..NNŠ..Ä¿u';èt.&ÈÄ...¯G.3à.ùQ.E 0001A0
C2031572 C603C188 F575EAD1 04761ADA 1638267F FF8A4141 49C82803 7401A8FE ±´.t.+àlAA¤..&;.Ö.v.ìõuX.è.ór..ó 0001C0
88571874 0010E851 52C359C0 33E575EA 01D2F708 75000CE8 C628C223 D2F70D72 r.½@#ó+óÒ..u.½@iõul3àYùRQÒ..t.W. 0001E0
```

```
Dump of file SATURN:[PCCOMMON.DUMP.PBIN]ERRBE.EXE;1 on 18-APR-1990 10:54:47.29
File ID (361,10,0)   End of file block 38 / Allocated 40

Virtual block number 22 (00000016), 512 (0200) bytes

 52521ED2 335053C3 5A5958FE 55894AD7 28D68806 7789FFFE FE44C7F2 03F08BFE ±.Þ.·úD±±..w..ø+øJ.U±XYZûSP3Ø.RR 000000
 065756EC 8855C302 08027458 5A1FFFFA 8308C483 2604283A 9A1F0650 0001B850 P¡..P...:(.&.á..ª..Z[t..ÃÜU.ìVW. 000020
 11744805 9A36884C E8277200 57E80775 48064688 08568801 9A8F3875 000A7E83 .~..uÆ¢...V..F.Hu.ÒW.r'$L.6..Ht. 000040
 FFB80675 D2080473 059AFE81 04C68334 735E003E E8560E46 8902448B 0D74F738 ;%t..D..F.Vò>.^s4.6..±..s..Øu.¡. 000060
 9A368902 5C891489 E67.C085 F95B0000 01369A50 C0335016 52C48850 21EB99FF ..$IP.ÆR.P3àP.6...[ª.àul...\..6. 000080
 F9F27505 9AFE8104 C6830C74 024C39F7 880E4E88 CB5DE588 5E5F07C0 33.¯8805 ..Æ3à._^.[]ù.N..%9L.t..6..±..u·ª 0000A0
 75C08500 001EF69A 51531373 01901E39 0675F738 C18ED38B 26721C03 DA86.¯E8 $,.Ö..r&.Æ.é;%u.9...±.SQ.-....àu 0000C0
 0000021D 00000200 00000128 2A000200 2CC3D188 04879201 90168904 75F73r0E 8;%u.........lù,...*(.......... 0000E0
 0500011E 72010300 00000301 9F000200 F3000302 21010300 6A000103 48000500 ...K...j...!...µ...........r.... 000100
 08000106 E8010300 00000427 AA000200 F7000303 E0010300 F6000301 D4010300 ...Å...-...Å...%...¨'......Ò.... 000120
 8A000123 A0010303 F2000102 59000500 89000121 58010300 01000200 9C010300 ...........(!......Y...·....#... 000140
 91000107 D7010300 08000201 AA010300 8D00011D 04010300 8C00011C E3010300 ...D.................·.......■.... 000160
 19000103 60010300 07000303 C8010300 17000103 82010300 03000302 62010300 ...b..............à.......'.... 000180
 23000101 04010300 22000128 8E010300 8C000302 8E010300 1800011E AA010300 ...¨.................(..".......# 0001A0
 3C000110 40010300 38000120 82010300 3A000122 38010300 26000128 D9010300 ...)(..&...;"..:...ÿ ..;...ə...< 0001C0
 3A000302 07010300 46000120 89010300 44000121 7E010300 82000304 32010300 ...2...ý...-!..D.... ..F.......: 0001E0

Dump of file SATURN:[PCCOMMON.DUMP.PBIN]ERRBE.EXE;1 on 18-APR-1990 10:54:47.29
File ID (361,10,0)   End of file block 38 / Allocated 40

Virtual block number 23 (00000017), 512 (0200) bytes

 41000303 9D010300 4D000120 D2010300 48000121 82010300 38000303 D3010300 ...Æ...;...ýl..K...Ø ..M.......A 000000
 59000110 CF010300 55000110 89010300 45000304 15010300 44000303 B8010300 ...¡...D.......E.......U...ü...Y 000020
 00000000 00000000 00000000 00000000 E6000300 C8010300 E1000301 68010300 ...k...Ã...à...!................ 000040
 00000000 00000000 00000000 00000000 00000000 00000000 00000000 00000000 ................................ 000060
 00000000 00000000 00000000 00000000 00000000 00000000 00000000 00000000 ................................ 000080
 00000000 00000000 00000000 00000000 00000000 00000000 00000000 00000000 ................................ 0000A0
 00000000 00000000 00000000 00000000 00000000 00000000 00000000 00000000 ................................ 0000C0
 00000000 00000000 00000000 00000000 00000000 00000000 00000000 00000000 ................................ 0000E0
 00000000 00000000 00000000 00000000 00000000 00000000 00000000 00000000 ................................ 000100
 00000000 00000000 00000000 00000000 00000000 00000000 00000000 00000000 ................................ 000120
 00000000 00000000 00000000 00000000 00000000 00000000 00000000 00000000 ................................ 000140
 00000000 00000000 00000000 00000000 00000000 00000000 00000000 00000000 ................................ 000160
 00000000 00000000 00000000 00000000 00000000 00000000 00000000 00000000 ................................ 000180
 00000000 00000000 00000000 00000000 00000000 00000000 00000000 00000000 ................................ 0001A0
 00000000 00000000 00000000 00000000 00000000 00000000 00000000 00000000 ................................ 0001C0
 00000000 00000000 00000000 00000000 00000000 00000000 00000000 00000000 ................................ 0001E0

Dump of file SATURN:[PCCOMMON.DUMP.PBIN]ERRBE.EXE;1 on 18-APR-1990 10:54:47.29
File ID (361,10,0)   End of file block 38 / Allocated 40

Virtual block number 24 (00000018), 512 (0200) bytes

 6F432020 20797261 7262694C 20656069 54206E75 5220534D 00000000 00000000 ........MS Run-Time Library - Co 000000
 70726F43 2074666F 736F7263 6940202C 38383931 20296328 20746867 69727970 pyright (c) 1988, Microsoft Corp 000020
 655C7272 655C6065 60657261 68735C00 676F6C2E 65627272 655C3A63 00770011 ..w.c:\errbe.log.\sharemem\err\e 000040
 3D206765 53726853 636F6C6C 41736F44 203A4542 52524500 6065602E 65627272 rrbe.mem.ERRBE: DosAllocShrSeg = 000060
 52450078 2520303D 20676553 636F6C6C 41736F44 203A4542 52524500 7825203D = %x.ERRBE: DosAllocSeg == %x.ER 000080
 73657565 75715C00 7825203D 3D207061 65486574 61657243 6E695720 3A454252 RBE: WinCreateHeap == %x.\queues 0000A0
 51657461 65724373 6F44203A 45425252 45006575 712E6562 7272655C 7272655C \err\errbe.que.ERRBE: DosCreateQ 0000C0
 20657A69 6C616974 696E496E 6957203A 45425252 45007825 20303D20 65756575 ueue == %x.ERRBE: WinInitialize  0000E0
 69616620 65756575 5167734D 65746165 7243203A 45425252 45006465 6C696166 failed.ERRBE: CreateMsgQueue fai 000100
 72724500 7373616C 4320646E 65686361 4220726F 72724500 7525202D 2064656C led - %u.Error Backend Class.Err 000120
 74536574 61657243 203A4542 52524500 7373616C 4320646E 65686361 4220726F or Backend Class.ERRBE: CreateSt 000140
 72655C72 72655C60 65735C00 756C2520 20206465 6C696166 20776F64 6E695764 dWindow failed - %lu.\sem\err\er 000160
 0000FFFF 00000000 00060000 00000000 00000000 005C005C 00606573 2E656272 rbe.sem.\.\...................... 000180
 00000000 00000000 00000000 00000000 00000000 00000000 00000000 00000000 ................................ 0001A0
 00000000 00000000 00000000 00000000 00000000 00000000 00000000 00000000 ................................ 0001C0
 00000000 0000000r 00000000 00000000 00000000 00000000 00000000 00000000 ................................ 0001E0
```

```
Dump of file SATURN:[PCCOMMON.DUMP.PBIN]ERRBE.EXE;1 on 18-APR-1990 10:54:47.29
File ID (361,10,0)   End of file block 38 / Allocated 40

Virtual block number 25 (00000019), 512 (0200) bytes

 00000000 00000000 00000000 00000000 00000000 00000000 00000000 00000000 ................................ 000000
 00000000 00000000 00000000 00000000 00000000 00000000 00000000 00000000 ................................ 000020
 00000000 0000CJ00 00000000 00000000 00000000 00000000 00000000 00000000 ................................ 000040
 00000000 00000000 00000000 00000000 00000000 00000000 00000000 00000000 ................................ 000060
 00000000 00000000 00000000 00000000 00000000 00000000 00000000 00000000 ................................ 000080
 00000000 00000000 00000000 00000000 00000000 00000000 00000000 00000000 ................................ 0000A0
 00000000 00000000 00000000 00000000 00000000 00000000 00000000 00000000 ................................ 0000C0
 00000000 00000000 00000000 00000000 00000000 00000000 00000000 00000000 ................................ 0000E0
 00000000 00000000 00000000 00000000 00000000 00000000 00000000 00000000 ................................ 000100
 00000000 00000000 00000000 00000000 00000000 00000000 00000000 00000000 ................................ 000120
 00000000 00000000 00000000 00000000 00000000 00000000 00000000 00000000 ................................ 000140
 00000000 00000000 00000000 00000000 00000000 00000000 00000000 00000000 ................................ 000160
 00000000 00000000 00000000 00000000 00000000 00000000 00000000 00000000 ................................ 000180
 00000000 00000000 00000000 00000000 00000000 00000000 00000000 00000000 ................................ 0001A0
 00000000 00000000 00000000 00000000 00000000 00000000 00000000 00000000 ................................ 0001C0
 00000000 00000000 00000000 00000000 00000000 00000000 00000000 00000000 ................................ 0001E0

Dump of file SATURN:[PCCOMMON.DUMP.PBIN]ERRBE.EXE;1 on 18-APR-1990 10:54:47.29
File ID (361,10,0)   End of file block 38 / Allocated 40

Virtual block number 26 (0000001A), 512 (0200) bytes

 00000000 00000000 00000000 00000000 00000000 00000000 00000000 00000000 ................................ 000000
 00000000 00000000 00000000 00000000 00000000 00000000 00000000 00000000 ................................ 000020
 00000000 00000000 00000000 00000000 00000000 00000000 00000000 00000000 ................................ 000040
 00000000 00000000 00000000 00000000 00000000 00000000 00000000 00000000 ................................ 000060
 00000000 00000000 00000000 00000000 00000000 00000000 00000000 00000000 ................................ 000080
 00000000 00000000 00000000 00000000 00000000 00000000 00000000 00000000 ................................ 0000A0
 00000000 00000000 00000000 00000000 00000000 00000000 00000000 00000000 ................................ 0000C0
 00000000 00000000 00000000 00000000 00000000 00000000 00000000 00000000 ................................ 0000E0
 00000000 00000000 00000000 00000000 00000000 00000000 00000000 00000000 ................................ 000100
 00000000 00000000 00000000 00000000 00000000 00000000 00000000 00000000 ................................ 000120
 00000000 00000000 00000000 00000000 00000000 00000000 00000000 00000000 ................................ 000140
 00000000 00000000 00000000 00000000 00000000 00000000 00000000 00000000 ................................ 000160
 465F435F 019A0000 00000000 00000000 00000000 00000000 00000000 00000000 ..............................C_F 000180
 00000000 00000000 00000000 00000000 00000000 0000003D 4F464E49 5F454C49 ILE_INFO=....................... 0001A0
 FFFFFFFF FFFF1FD0 FFFFFFFF 00002320 202B0029 6C6C756E 2800296C 6C756E28 (null).(null).+- #......Å....... 0001C0
 FFFFFFFF FFFFFFFF FFFFFFFF FFFFFFFF FFFFFFFF FFFFFFFF FFFFFFFF FFFFFFFF ................................ 0001E0

Dump of file SATURN:[PCCOMMON.DUMP.PBIN]ERRBE.EXE;1 on 18-APR-1990 10:54:47.29
File ID (361,10,0)   End of file block 38 / Allocated 40

Virtual block number 27 (0000001B), 512 (0200) bytes

 00000000 00000000 FFFFFFFF FFFFFFFF FFFFFFFF FFFFFFFF FFFFFFFF FFFFFFFF ................................ 000000
 00000000 00000000 00000000 00000000 00000000 00000000 00000000 00000000 ................................ 000020
 00000000 00000000 00000000 00000000 00000000 00000000 00000000 00000000 ................................ 000040
 00000000 000000C^ 00000000 00000000 00000000 00000000 00000000 00000000 ................................ 000060
 00000000 000000C  00000000 00000000 00000000 00000000 00000000 00000000 ................................ 000080
 00000000 00000000 00000000 00000000 00000000 00818181 01000001 00000000 ................................ 0000A0
 00000000 00000000 00000000 00000000 00000000 00000000 00000000 00000000 ................................ 0000C0
 00000000 00000000 00000000 00000000 00000000 00000000 00000000 00000000 ................................ 0000E0
 00000000 00000000 00000000 00000000 00000000 00000000 00000000 00000000 ................................ 000100
 00000000 00000000 00000000 00000000 00000000 00000000 00000000 00000000 ................................ 000120
 00000000 00000000 00000000 00000000 00000000 00000000 00000000 00000000 ................................ 000140
 00000000 00000000 00000000 00000000 00000000 00000000 00000000 00000000 ................................ 000160
 00000000 00000000 00000000 00000000 00000000 00000000 00000000 00000000 ................................ 000180
 0A0A0A0A 0A0A0A0A 0A0A0A0A 0A0A0A0A 0A0A0A0A 0A0A0A0A 00000000 00000000 ................................ 0001A0
 0A0A0A0A 0A0A0A0A 0A0A0A0A 0A0A0A0A 0A0A0A0A 0A0A0A0A 0A0A0A0A 0A0A0A0A ................................ 0001C0
 0A0A0A0A 0A0A0A0A 0A0A0A0A 0A0A0A0A 0A0A0A0A 0A0A0A0A 0A0A0A0A 0A0A0A0A ................................ 0001E0
```

```
Dump of file SATURN:[PCCOMMON.DUMP.PBIN]ERRBE.EXE;1 on 18-APR-1990 10:54:47.29
File ID (361,10,0)   End of file block 38 / Allocated 40

Virtual block number 28 (0000001C), 512 (0200) bytes

0A0A0A0A 0A0A0A0A 0A0A0A0A 0A0A0A0A 0A0A0A0A 0A0A0A0A 0A0A0A0A 0A0A0A0A ................................ 000000
0A0A0A0A 0A0A0AJA 0A0A0A0A 0A0A0A0A 0A0A0A0A 0A0A0A0A 0A0A0A0A 0A0A0A0A ................................ 000020
0A0A0A0A 0A0A0A0A 0A0A0A0A 0A0A0A0A 0A0A0A0A 0A0A0A0A 0A0A0A0A 0A0A0A0A ................................ 000040
0A0A0A0A 0A0A0A0A 0A0A0A0A 0A0A0A0A 0A0A0A0A 0A0A0A0A 0A0A0A0A 0A0A0A0A ................................ 000060
0A0A0A0A 0A0A0A0A 0A0A0A0A 0A0A0A0A 0A0A0A0A 0A0A0A0A 0A0A0A0A 0A0A0A0A ................................ 000080
000008C2 0006FFFF 00000000 00000000 00000000 00000000 0A0A0A0A 0A0A0A0A ............................ô... 0000A0
00000202 00000000 00000000 00000102 00000000 00000000 00000001 1AF60006 ..-............................. 0000C0
00000000 00000000 00000000 00000000 00000000 00000000 00000000 00000000 ................................ 0000E0
00000000 00000000 00000000 00000000 00000000 00000000 00000000 00000000 ................................ 000100
00000000 00000000 00000000 00000000 00000000 00000000 00000000 00000000 ................................ 000120
00000000 00000000 00000000 00000000 00000000 00000000 00000000 00000000 ................................ 000140
00000000 00000000 00000000 00000000 00000000 00000000 00000000 00000000 ................................ 000160
00000000 00000000 00000000 00000000 00000000 00000000 00000000 00000000 ................................ 000180
00000000 00000000 00000000 00000000 00000000 00000000 00000000 00000000 ................................ 0001A0
00000000 00000000 00000000 00000000 00000000 00000000 00000000 00000000 ................................ 0001C0
00000000 00000000 00000000 00000000 00000000 00000000 00000000 00000000 ................................ 0001E0

Dump of file SATURN:[PCCOMMON.DUMP.PBIN]ERRBE.EXE;1 on 18-APR-1990 10:54:47.29
File ID (361,10,0   End of file block 38 / Allocated 40

Virtual block number 29 (0000001D), 512 (0200) bytes

00000000 00000000 00000000 00000000 00000000 00000000 00000000 00000000 ................................ 000000
00000000 00000000 00000000 00000000 00000000 00000000 00000000 00000000 ................................ 000020
00000000 00000000 00000000 00000000 00000000 00000000 00000000 00000000 ................................ 000040
00000000 00000000 00000000 00000000 00000000 00000000 00000000 00000000 ................................ 000060
00000000 00000000 00000000 00000000 00000000 00000000 00000000 00000000 ................................ 000080
00000000 00000000 00000000 00000000 00000000 00000000 00000000 00000000 ................................ 0000A0
00000000 00000000 00000000 00000000 00000000 00000000 00000000 00000000 ................................ 0000C0
00000000 00000000 00000000 00000000 00000000 00000000 00000000 00000000 ................................ 0000E0
00000000 00000000 00000000 00000000 00000000 00000000 00000000 00000000 ................................ 000100
00000000 00000000 00000000 00000000 00000000 00000000 00000000 00000000 ................................ 000120
00000000 00000000 00000000 00000000 00000000 00000000 00000000 00000000 ................................ 000140
00000000 00000000 00000000 00000000 00000000 00000000 00000000 00000000 ................................ 000160
00000000 00000000 00000000 00000000 00000000 00000000 00000000 00000000 ................................ 000180
00000000 00000000 00000000 00000000 00000000 00000000 00000000 00000000 ................................ 0001A0
00000000 00000000 00000000 00000000 00000000 00000000 00000000 00000000 ................................ 0001C0
00000000 00000000 00000000 00000000 00000000 00000000 00000000 00000000 ................................ 0001E0

Dump of file SATURN:[PCCOMMON.DUMP.PBIN]ERRBE.EXE;1 on 18-APR-1990 10:54:47.29
File ID (361,10,0)   End of file block 38 / Allocated 40

Virtual block number 30 (0000001E), 512 (0200) bytes

00000000 00000000 00000000 00000000 00000000 00000000 00000000 00000000 ................................ 000000
00000000 00000000 00000000 00000000 00000000 00000000 00000000 00000000 ................................ 000020
00000000 00000000 00000000 00000000 00000000 00000000 00000000 00000000 ................................ 000040
00000000 00000000 00000000 00000000 00000000 00000000 00000000 00000000 ................................ 000060
00000000 00000000 00000000 00000000 00000000 00000000 00000000 00000000 ................................ 000080
00000000 00000000 00000000 00000000 00000000 00000000 00000000 00000000 ................................ 0000A0
00000000 00000000 00000000 00000000 00000000 00000000 00000000 00000000 ................................ 0000C0
00000000 00000000 00000000 00000000 00000000 00000000 00000000 00000000 ................................ 0000E0
00000000 00000000 00000000 00000000 00000000 00000000 00000000 00000000 ................................ 000100
00000000 00000000 00000000 00000000 00000000 00000000 00000000 00000000 ................................ 000120
00000000 00000000 00000000 00000000 00000000 00000000 00000000 00000000 ................................ 000140
00000000 00000000 00000000 00000000 00000000 00000000 00000000 00000000 ................................ 000160
00000000 00000000 00000000 00000000 00000000 00000000 00000000 00000000 ................................ 000180
00000000 00000000 00000000 00000000 00000000 00000000 00000000 00000000 ................................ 0001A0
00000000 00000000 00000000 00000000 00000000 00000000 00000000 00000000 ................................ 0001C0
00000000 00000000 00000000 00000000 00000000 00000000 00000000 00000000 ................................ 0001E0
```

```
Dump of file SATURN:[PCCOMMON.DUMP.PBIN]ERRBE.EXE;1 on 18-APR-1990 10:54:47.29
File ID (361,10,0)   End of file block 38 / Allocated 40

Virtual block number 31 (0000001F), 512 (0200) bytes

00000000 00000000 00000000 00000000 00000000 00000000 00000000 00000000 ................................ 000000
00000000 00000000 00000000 00000000 00000000 00000000 00000000 00000000 ................................ 000020
00000000 00000000 00000000 00000000 00000000 00000000 00000000 00000000 ................................ 000040
00000000 00000000 00000000 00000000 00000000 00000000 00000000 00000000 ................................ 000060
00000000 00000000 00000000 00000000 00000000 00000000 00000000 00000000 ................................ 000080
00000000 00000000 00000000 00000000 00000000 00000000 00000000 00000000 ................................ 0000A0
00000000 00000000 00000000 00000000 00000000 00000000 00000000 00000000 ................................ 0000C0
00000000 00000000 00000000 00000000 00000000 00000000 00000000 00000000 ................................ 0000E0
00000000 00000000 00000000 00000000 00000000 00000000 00000000 00000000 ................................ 000100
00000000 00000000 00000000 00000000 00000000 00000000 00000000 00000000 ................................ 000120
00000000 00000000 00000000 00000000 00000000 00000000 00000000 00000000 ................................ 000140
00000000 00000000 00000000 00000000 00000000 00000000 00000000 00000000 ................................ 000160
00000000 00000000 00000000 00000000 00000000 00000000 00000000 00000000 ................................ 000180
00000000 00000000 00000000 00000000 00000000 00000000 00000000 00000000 ................................ 0001A0
00000000 00000000 00000000 00000000 00000000 00000000 00000000 00000000 ................................ 0001C0
00000000 00000000 00000000 00000000 00000000 00000000 00000000 00000000 ................................ 0001E0

Dump of file SATURN:[PCCOMMON.DUMP.PBIN]ERRBE.EXE;1 on 18-APR-1990 10:54:47.29
File ID (361,10,0)   End of file block 38 / Allocated 40

Virtual block number 32 (00000020), 512 (0200) bytes

00000000 00000000 00000000 00000000 00000000 00000000 00000000 00000000 ................................ 000000
00000000 00000000 00000000 00000000 00000000 00000000 00000000 00000000 ................................ 000020
00000000 00000000 00000000 00000000 00000000 00000000 00000000 00000000 ................................ 000040
00000000 00000000 00000000 00000000 00000000 00000000 00000000 00000000 ................................ 000060
00000000 00000000 00000000 00000000 00000000 00000000 00000000 00000000 ................................ 000080
00000000 00000000 00000000 00000000 00000000 00000000 00000000 00000000 ................................ 0000A0
00000000 00000000 00000000 00000000 00000000 00000000 00000000 00000000 ................................ 0000C0
00000000 00000000 00000000 00000000 00000000 00000000 00000000 00000000 ................................ 0000E0
00000000 00000000 00000000 00000000 00000000 00000000 00000000 00000000 ................................ 000100
00000000 00000000 00000000 00000000 00000000 00000000 00000000 00000000 ................................ 000120
00000000 00000000 00000000 00000000 00000000 00000000 00000000 00000000 ................................ 000140
00000000 00000000 00000000 00000000 00000000 00000000 00000000 00000000 ................................ 000160
00000000 00000000 00000000 00000000 00000000 00000000 00000000 00000000 ................................ 000180
00000000 00000000 00000000 00000000 00000000 00000000 00000000 00000000 ................................ 0001A0
00000000 00000000 00000000 00000000 00000000 00000000 00000000 00000000 ................................ 0001C0
00000000 00000000 00000000 00000000 00000000 00000000 00000000 00000000 ................................ 0001E0

Dump of file SATURN:[PCCOMMON.DUMP.PBIN]ERRBE.EXE;1 on 18-APR-1990 10:54:47.29
File ID (361,10,0)   End of file block 38 / Allocated 40

Virtual block number 33 (00000021), 512 (0200) bytes

00000000 00000000 00000000 00000000 00000000 00000000 00000000 00000000 ................................ 000000
00000000 00000000 00000000 00000000 00000000 00000000 00000000 00000000 ................................ 000020
00000000 00000000 00000000 00000000 00000000 00000000 00000000 00000000 ................................ 000040
00000000 00000000 00000000 00000000 00000000 00000000 00000000 00000000 ................................ 000060
00000000 00000000 00000000 00000000 00000000 00000000 00000000 00000000 ................................ 000080
00000000 00000000 00000000 00000000 00000000 00000000 00000000 00000000 ................................ 0000A0
00000000 00000000 00000000 00000000 00000000 00000000 00000000 00000000 ................................ 0000C0
00000000 00000000 00000000 00000000 00000000 00000000 00000000 00000000 ................................ 0000E0
00000000 00000000 00000000 00000000 00000000 00000000 00000000 00000000 ................................ 000100
00000000 00000000 00000000 00000000 00000000 00000000 00000000 00000000 ................................ 000120
00000000 00000000 00000000 00000000 00000000 00000000 00000000 00000000 ................................ 000140
00000000 00000000 00000000 00000000 00000000 00000000 00000000 00000000 ................................ 000160
00000000 00000000 00000000 00000000 00000000 00000000 00000000 00000000 ................................ 000180
00000000 00000000 00000000 00000000 00000000 00000000 00000000 00000000 ................................ 0001A0
00000000 00000000 00000000 00000000 00000000 00000000 00000000 00000000 ................................ 0001C0
00000000 00000000 00000000 00000000 00000000 00000000 00000000 00000000 ................................ 0001E0
```

```
Dump of file SATURN:[PCCOMMON.DUMP.PBIN]ERRBE.EXE;1 on 18-APR-1990 10:54:47.29
File ID (361,10,0)   End of file block 38 / Allocated 40

Virtual block number 34 (00000022), 512 (0200) bytes

00000000 00000000 00000000 00000000 00000000 00000000 00000000 00000000 ................................ 000000
00000000 00000000 00000000 00000000 00000000 00000000 00000000 00000000 ................................ 000020
00000000 00000000 00000000 00000000 00000000 00000000 00000000 00000000 ................................ 000040
00000000 00000000 00000000 00000000 00000000 00000000 00000000 00000000 ................................ 000060
00000000 00000000 00000000 00000000 00000000 00000000 00000000 00000000 ................................ 000080
00000000 00000000 00000000 00000200 00010000 00000000 00000000 00000000 ................................ 0000A0
00000000 00000000 00000000 00000000 00000000 00000000 00000000 00000000 ................................ 0000C0
00000000 00000000 00000000 00000000 00000000 00000000 00000000 00000000 ................................ 0000E0
00000000 00000000 00000000 00000000 00000000 00000000 00000000 00000000 ................................ 000100
00000000 00000000 00000000 00000000 00000000 00000000 00000000 00000000 ................................ 000120
00000000 00000000 00000000 00000000 00000000 00000000 00000000 00000000 ................................ 000140
00000000 00000000 00000000 00000000 00000000 00000000 00000000 00000000 ................................ 000160
00000000 00000000 00000000 00000000 00000000 00000000 00000000 00000000 ................................ 000180
00000000 00000000 00000000 00000000 00000000 00000000 00000000 00000000 ................................ 0001A0
00000000 00000000 00000000 00000000 00000000 00000000 00000000 00000000 ................................ 0001C0
00000000 00000000 00000000 00000000 00000000 00000000 00000000 00000000 ................................ 0001E0

Dump of file SATURN:[PCCOMMON.DUMP.PBIN]ERRBE.EXE;1 on 18-APR-1990 10:54:47.29
File ID (361,10,0)   End of file block 38 / Allocated 40

Virtual block number 35 (00000023), 512 (0200) bytes

00000000 00000000 00000000 00000000 00000000 00000000 00000000 00000000 ................................ 000000
00000000 00000000 00000000 00000000 00000000 00000000 00000000 00000000 ................................ 000020
00000000 00000000 00000000 00000000 00000000 00000000 00000000 00000000 ................................ 000040
00000000 00000000 00000000 00000000 00000000 00000000 00000000 00000000 ................................ 000060
00000000 00000000 00000000 00000000 00000000 00000000 00000000 00000000 ................................ 000080
00000000 00000000 00000000 00000000 00000000 00000000 00000000 00000000 ................................ 0000A0
00000000 00000000 00000000 00000000 00000000 00000000 00000000 00000000 ................................ 0000C0
00000000 00000000 00000000 00000000 00000000 00000000 00000000 00000000 ................................ 0000E0
00000000 00000000 00000000 00000000 00000000 00000000 00000000 00000000 ................................ 000100
00000000 00000000 00000000 00000000 00000000 00000000 00000000 00000000 ................................ 000120
00000000 00000000 00000000 00000000 00000000 00000000 00000000 00000000 ................................ 000140
00000000 00000000 00000000 00000000 00000000 00000000 00000000 00000000 ................................ 000160
00000000 00000000 00000000 00000000 00000000 00000000 00000000 00000000 ................................ 000180
00000000 00000000 00000000 00000000 00000000 00000000 00000000 00000000 ................................ 0001A0
00000000 00000000 00000000 00000000 00000000 00000000 00000000 00000000 ................................ 0001C0
00000000 00000000 00000000 00000000 00000000 00000000 00000000 00000000 ................................ 0001E0

Dump of file SATURN:[PCCOMMON.DUMP.PBIN]ERRBE.EXE;1 on 18-APR-1990 10:54:47.29
File ID (361,10,0)   End of file block 38 / Allocated 40

Virtual block number 36 (00000024), 512 (0200) bytes

00000000 00000000 00000000 00000000 00000000 00000000 00000000 00000000 ................................ 000000
00000000 00000000 00000000 00000000 00000000 00000000 00000000 00000000 ................................ 000020
00000000 00000000 00000000 00000000 00000000 00000000 00000000 00000000 ................................ 000040
00000000 00000000 00000000 00000000 00000000 00000000 00000000 00000000 ................................ 000060
00000000 00000000 00000000 00000000 00000000 00000000 00000000 00000000 ................................ 000080
00000000 00000000 00000000 00000000 00000000 00000000 00000000 00000000 ................................ 0000A0
00000000 00000000 00000000 00000000 00000000 00000000 00000000 00000000 ................................ 0000C0
00000000 00000000 00000000 00000000 00000000 00000000 00000000 00000000 ................................ 0000E0
00000000 00000000 00000000 00000000 00000000 00000000 00000000 00000000 ................................ 000100
00000000 00000000 00000000 00000000 00000000 00000000 00000000 00000000 ................................ 000120
00000000 00000000 00000000 00000000 00000000 00000000 00000000 00000000 ................................ 000140
00000000 00000000 00000000 00000000 00000000 00000000 00000000 00000000 ................................ 000160
00000000 00000000 00000000 00000000 00000000 00000000 00000000 00000000 ................................ 000180
00000000 00000000 00000000 00000000 00000000 00000000 00000000 00000000 ................................ 0001A0
00000000 00000000 00000000 00000000 00000000 00000000 00000000 00000000 ................................ 0001C0
00000000 00000000 00000000 00000000 00000000 00000000 00000000 00000000 ................................ 0001E0
```

```
Dump of file SATURN:[PCCOMMON.DUMP.PBIN]ERRBE.EXE;1 on 18-APR-1990 10:54:47.29
File ID (361,10,0)   End of file block 38 / Allocated 40

Virtual block number 37 (00000025), 512 (0200) bytes

00000000 00000000 00000000 00000000 00000000 00000000 00000000 00000000 ................................ 000000
00000000 00000000 00000000 00000000 00000000 00000000 00000000 00000000 ................................ 000020
00000000 00000000 00000000 00000000 00000000 00000000 00000000 00000000 ................................ 000040
00000000 00000000 00000000 00000000 00000000 00000000 00000000 00000000 ................................ 000060
00000000 00000000 00000000 00000000 00000000 00000000 00000000 00000000 ................................ 000080
1ED61AB8 1ED61AB4 1ED61AB0 1ED61AF0 1ED60000 1AF814A2 00000000 00000000 ........Å.½...ø.Þ.ø.¯.ø.Ç.ø.ì.ø. 0000A0
00000000 20000000 00000000 00000000 00000000 00000000 01010000 00001ABC ¥............................... 0000C0
47534D4E 3C3C019C 1AF41AF2 FFFFFFFF 25C20000 00000000 00000000 00000000 ..............ô%....·.¶...<<NMSG 0000E0
0003000A 0D776F6C 6C726576 6F206B63 61747320 2D0A0D30 30303652 00003E3E >>..R6000..- stack overflow..... 000100
08000A0D 30207962 20656469 76696420 72656765 746E6920 2D0A0D33 30303652 R6003..- integer divide by 0.... 000120
6120726F 66206563 61707320 6867756F 6E652074 6F6E2020 0A0D3830 30365200 .R6008..- not enough space for a 000140
6867756F 6E652074 6F6E2020 0A0D3930 30365200 09000A0D 73746E65 6D756772 rguments.....R6009..- not enough 000160
00FF000A 0000FC00 0A0D746E 656D6E6F 7269766E 6520726F 66206563 61707320  space for environment...•...... 000180
206C6C75 6E202D0A 0D313030 36520001 0020726F 72726520 656D6974 2D6E7572 run-time error ...R6001..- null  0001A0
20202D0A0D 32303036 52000200 0A0D746E 656D6E67 69737361 20726574 6E696F70 pointer assignment.....R6002..-  0001C0
410A000A 000A0D64 6564616F 6C20746F 6E20746E 696F7020 676E6974 616F6C66 floating point not loaded......A 0001E0

Dump of file SATURN:[PCCOMMON.DUMP.PBIN]ERRBE.EXE;1 on 18-APR-1990 10:54:47.29
File ID (361,10,0)   End of file block 38 / Allocated 40

Virtual block number 38 (00000026), 512 (0200) bytes

00000000 0A6E6F69 74616E69 6D726574 206D6172 676F7270 206C616D 726F6E62 bnormal program termination..... 000000
0308BC00 02000000 011AC000 020003FF 00000000 00000000 00000000 00000000 ......................à.......¥.. 000020
00000000 00000000 00000000 00000000 00000000 00000000 041AAA00 02000000 ................................ 000040
00000000 00000000 00000000 00000000 00000000 00000000 00000000 00000000 ................................ 000060
00000000 00000000 00000000 00000000 00000000 00000000 00000000 00000000 ................................ 000080
00000000 00000000 00000000 00000000 00000000 00000000 00000000 00000000 ................................ 0000A0
00000000 00000000 00000000 00000000 00000000 00000000 00000000 00000000 ................................ 0000C0
00000000 00000000 00000000 00000000 00000000 00000000 00000000 00000000 ................................ 0000E0
00000000 00000000 00000000 00000000 00000000 00000000 00000000 00000000 ................................ 000100
00000000 00000000 00000000 00000000 00000000 00000000 00000000 00000000 ................................ 000120
00000000 00000000 00000000 00000000 00000000 00000000 00000000 00000000 ................................ 000140
00000000 00000000 00000000 00000000 00000000 00000000 00000000 00000000 ................................ 000160
00000000 00000000 00000000 00000000 00000000 00000000 00000000 00000000 ................................ 000180
00000000 00000000 00000000 00000000 00000000 00000000 00000000 00000000 ................................ 0001A0
00000000 00000000 00000000 00000000 00000000 00000000 00000000 00000000 ................................ 0001C0
00000000 00000000 00000000 00000000 00000000 00000000 00000000 00000000 ................................ 0001E0
```

```
Dump of file SATURN:[PCCOMMON.DUMP.DLL]ENGMAPS.TMP;1 on 18-APR-1990 10:45:43.89
File ID (642,11,0)   End of file block 29 / Allocated 32

Virtual block number 1 (00000001), 512 (0200) bytes

 00000000 00000040 00000000 00000088 0000FFFF 00000004 0000001D 00C55A40 MZé.............|.......a....... 000000
 00000080 000000J0 00000000 00000000 00000000 00000000 00000000 00000000 ................................ 000020
 6F6E6E61 63206D61 72676F72 70207369 685421CD 4C01B821 CD09B400 0EBA1F0E ..a..Ç.ë||.LelThis program canno 000040
 00000000 00000024 0A0D0D2E 65646F60 20534F44 206E6920 6E757220 65622074 t be run in DOS mode....$....... 000060
 00060012 00000000 00000000 00000800 00128009 A2126928 0071046E 0505454E NE..n.q.(i.Å.................... 000080
 00000000 00000000 00010000 00040000 0000055F 02FA02EE 00000000 0040002F /.a.Å.Å.Ÿ.*._................... 0000A0
 06100F00 061000FC 03BE0F00 03B000BD 049E0F00 049E006F 01420F00 01410059 Y.A...B.o.......§.§.../.•....... 0000C0
 03060F00 030601CF 011A0F00 011A01BB 008A0F00 008901B1 04CE0F00 04CD0161 a.ë...ö.Ÿ.......£.......ü....... 0000E0
 030A0F00 03090269 010E0F00 010E0255 01740F00 0173023A 034C0F00 034C0201 ..L...L.:.s...t.U.......|.)...Ö. 000100
 02340F00 02340330 05B40F00 05B402E0 014C0F00 014B02C8 01880F00 018702AB ¨.......à.K...L.Å.......=.4...4. 000120
 414D474E 45120000 5350414D 474E4507 00B40F21 00B30380 01B20F00 01B10364 d.Ÿ...ý...*.|.Ç..ENGMAPS...ENGMA 000140
 534E4954 54415445 47535041 4D474E45 1700024E 45475445 4D414E54 45475350 PSGETNAMETGEN...ENGMAPSGETATTINS 000160
 1800044F 4445464F 454D414E 54454753 50414D47 4E451300 03484645 434E4154 TANCEFK...ENGMAPSGETNAMEOFEDO... 000180
 414D474E 45150005 50414D54 45475241 54455441 52454E45 47535041 4D474E45 ENGMAPSGENERATETARGETMAP...ENGMA 0001A0
 5055484F 4F4C5350 414D474E 45190006 45434E41 54534E49 54544154 45475350 PSGETATTINSTANCE...ENGMAPSLOOKUP 0001C0
 49574445 4C4C554E 53495350 414D474E 45130007 59454B53 4C414E52 45544E49 INTERNALSKEY...ENGMAPSISNULLEDWI 0001E0

Dump of file SATURN:[PCCOMMON.DUMP.DLL]ENGMAPS.TMP;1 on 18-APR-1990 10:45:43.89
File ID (642,11,0)   End of file block 29 / Allocated 32

Virtual block number 2 (00000002), 512 (0200) bytes

 4E451600 094E4547 50414D4D 45545359 53544547 5350414D 474E4516 00084854 TH...ENGMAPSGETSYSTEMMAPGEN...EN 000000
 45475350 414D474E 450E000A 59454B53 54454D41 4E50554B 4F4F4C53 50414D47 GMAPSLOOKUPNAMETSKEY...ENGMAPSGE 000020
 50414045 4352554F 53455441 52454E45 47535041 4D474E45 18000845 4D414E54 TNAME...ENGMAPSGENERATESOURCEMAP 000040
 52435350 414D474E 4515000D 5350414D 4C4C4154 45475350 414D474E 4511000C ...ENGMAPSGETALLMAPS...ENGMAPSCR 000060
 44455441 4C455254 45475350 414D474E 4516000E 54454D41 4E50414D 45544145 EATEMAPNAMET...ENGMAPSGETRELATED 000080
 59454B53 504C4C55 4E524F46 4B434548 43535041 4D474E45 18000F53 59454B53 SKEYS...ENGMAPSCHECKFORNULLPSKEY 0000A0
 474E4516 00115945 4B534C4C 554E524F 464B4345 48435350 414D474E 45170010 ...ENGMAPSCHECKFORNULLSKEY...ENG 0000C0
 54454753 50414D47 4E451400 124E4744 54584550 414D4554 41455243 5350414D MAPSCREATEMAPEXTDGN...ENGMAPSGET 0000E0
 4E45474E 4744545B 45544547 5350414D 474E4513 00134E45 4750414D 52455355 USERMAPGEN...ENGMAPSGETEXTDGNGEN 000100
 12001544 4554414C 45524A42 4F4E4744 45435255 4F535350 414D474E 451A0014 ...ENGMAPSSOURCEDGNOBJRELATED... 000120
 41455243 5350414D 474E4516 00164E49 44454E49 41544E4F 43535041 4D474E45 ENGMAPSCONTAINEDIN...ENGMAPSCREA 000140
 43534F44 08000163 013400C9 009A000A 00010000 1750414D 53595350 414D4554 TEMAPSYSMAP.........è.4.c...DOSC 000160
 4C4D440D 454C444L 41484C45 444F4D59 52455551 4C4D4413 6C6D6403 534C4C41 ALLS.dml.DMLQUERYMODELHANDLE.DML 000180
 504D4953 4C4D444L 444C4549 46595245 55514C4D 4400544E 554F4359 52455551 QUERYCOUNT.DMLQUERYFIELD.DMLSIMP 0001A0
 464C4D44 08455441 4C45524C 4D44094E 4C525952 4555514C 4D440854 4553454C LESET.DMLQUERYRLN.DMLRELATE.DMLF 0001C0
 14455441 4552434C 4D440944 494C4D44 59524555 514C4D44 00545349 4C454552 REELIST.DMLQUERYDMLID.DMLCREATE. 0001E0

Dump of file SATURN:[PCCOMMON.DUMP.DLL]ENGMAPS.TMP;1 on 18-APR-1990 10:45:43.89
File ID (642,11,0)   End of file block 29 / Allocated 32

Virtual block number 3 (00000003), 512 (0200) bytes

 41455243 4D454D00 4D454D03 59454B45 5441474F 52525553 59524555 514C4D44 DMLQUERYSURROGATEKEY.MEM.MEMCREA 000000
 4C42434F 4C4C414D 454D0050 41454859 4F525453 45444D45 4D0E5041 45484554 TEHEAP.MEMDESTROYHEAP.MEMALLOCBL 000020
 32424412 4E474454 58455041 4D455441 4552434D 32424413 4D324244 044B434F OCK.DB2M.DB2MCREATEMAPEXTDGN.DB2 000040
 53595350 414D4554 41455243 4D324244 1354454D 414E5041 4D455441 4552434D MCREATEMAPNAMET.DB2MCREATEMAPSYS 000060
 4C4D3242 44135945 4B534C41 4E524554 4E495055 4B4F4F4C 4D324244 1650414D MAP.DB2MLOOKUPINTERNALSKEY.DB2ML 000080
 43544547 4D324244 580E4154 454D5745 4E075945 4B535445 4D414E50 554B4F4F OOKUPNAMETSKEY.NEWMETA.XDB2MGETC 0000A0
 42440859 45484654 '5474D32 42440859 45485054 45474D32 4244084E 4D554C4F OLUMN.DB2MGETPKEY.DB2MGETFKEY.DB 0000C0
 03090101 8B030F01 02370308 0104F703 0401484F 4C4D4453 49073445 45524632 2FREE4.ISDMLOK...%....7....£.... 0000E0
 030F0304 01000003 C9010000 030C0100 00030401 0000030F 01026703 05010000 .....g.........................Ö. 000100
 00030045 03060200 00030001 00000303 01000003 07010000 03050100 00030E01 ............................E... 000120
 11000001 EC030301 0000030A 01000003 020101BB 0300ED03 0B020148 03030100 ....K....Ù..£..............&.... 000140
 554B4F4F 4C535041 4D474E45 17000020 7370614D 20676E69 7265656E 69676E45 Engineering Maps ...ENGMAPSLOOKU 000160
 260A5EC4 D88EFFFF 881E5657 000002C8 00000000 01594548 534E4744 54584550 PEXTDGNSKEY.....à...WV.|...Äé^.& 000180
 882600A8 878B260A 5EC40010 E9037400 527F8326 0A5EC400 3FE90374 00527F83 ..R.t.Ö?.é^.&..R.t.Ö..é^.&..`.&. 0001A0
 00009A06 76FF0876 FF016A50 52010297 88260100 878B260A 5EC40000 E900AA97 .`.Ö..é^.&....&....RPj..v..v.... 0001C0
 978B2600 A8878B26 0A5EC400 10E90374 00527F83 260A5EC4 003CE9FE 4689008F ...F±Ö<.é^.&..R.t.Ö..é^.&..`.&.. 0001E0
```

```
Dump of file SATURN:[PCCOMMON.DUMP.DLL]ENGMAPS.TMP;1 on 18-APR-1990 10:45:43.89
File ID (642,11,0)   End of file block 29 / Allocated 32

Virtual block number 4 (00000004), 512 (0200) bytes

 FF00009A 0676FF08 76FF006A 50520102 97882601 00878826 0A5EC400 0DE900AA ^.Ö..á^.&....&....RPj..v..v..... 000000
 0A5EC4D8 8E000888 1E565700 0002C800 08CAC95F 5E1F0000 E9FE4688 FE4689FF ..F±.F±Ö...^_èò..à...WV.j...Äá^. 000020
 2600A887 88260\5E C40010E9 03740052 7F83260A 5EC4003F E9037400 527F8326 &..R.t.Ö?.á^¯&..R.t.Ö..á^.&..´.& 000040
 ED9A0676 FF0876FF 016A5052 01029788 26010087 88260A5E C4000DE9 00AA9788 ..`.Ö..á^.&....&....RPj..v..v..Ú 000060
 882600A8 8788260A 5EC40010 E9037400 527F8326 0A5EC400 3CE9FE46 89013000 .Ö..F±Ö<.á^.&..R.t.Ö..á^.&..´.&. 000080
 00ED9A06 76FF0876 FF006A50 52010297 88260100 8788260A 5EC4000D E900AA97 .`.Ö..á^.&....&....RPj..v..v..Ú. 0000A0
 1200A900 02000000 0800F100 02000208 CAC95F5E 1F0000E9 FE4688FE 46890050 P..F±.F±Ö...^_èò.....þ.......`.. 0000C0
 26065EC4 D88EFFFF 881E5657 0000FAC8 00000000 00000000 00000000 00000000 ................à°..WV.j...Äá^.& 0000E0
 02478926 00008812 5EC40000 07C7260A 5EC40000 E446C700 00F846C7 000107C7 ú...úF%..úFö..á^.&ú...á^.j..&.G. 000100
 1E5EC400 10E90374 00527F83 261E5EC4 07892602 47892600 00880E5E C4078926 &..á^.j..&.G.&..á^.&..R.t.Ö..á^. 000120
 FF1C76FF 50520102 97882601 00878826 1E5EC400 0DE900AA 97882600 A8878826 &..´.&..´.Ö..á^.&....&....RP.v.. 000140
 5EC40408 E9E64688 0006E903 7500E67E 83E64689 0000FFFF 9A5016E8 468D1A76 v..FÒ.P......Fl.-l.u.Ö...FlÖ..á^ 000160
 88261E5E C4000DE9 00AA9788 2600A887 88261E5E C40010E9 03740052 7F83261E .&..R.t.Ö..á^.&..´.&..´.Ö..á^.&. 000180
 9A5016FA 468D5016 FE468050 16FC468D 1A76FF1C 76FF5052 01029788 26010087 ...&....RP.v..v..F=.P.F±.P.F°.P. 0001A0
 03740052 7F83261E 5EC403B0 E9E64688 0006E903 7500E67E 83E64689 FFFF0322 "....Fl.-l.u.Ö...FlÖ¯.á^.&..R.t. 0001C0
 01029788 26010087 88261E5E C4000DE9 00AA9788 2600A887 88261E5E C40010E9 Ö..á^.&..´.&..´.Ö..á^.&....&.... 0001E0

Dump of file SATURN:[PCCOMMON.DUMP.DLL]ENGMAPS.TMP;1 on 18-APR-1990 10:45:43.89
File ID (642,11,0)   End of file block 29 / Allocated 32

Virtual block number 5 (00000005), 512 (0200) bytes

 E9037500 E67E83E6 46890000 02F89A50 16FF0686 8DFC76FF 1A76FF1C 76FF5052 RP.v..v..v=.....P.«....Fl.-l.u.Ö 000000
 4689FF08 9688FF06 8688F256 89F04689 FF089688 FF068688 035EE9E6 46880006 ...FlÖ^..........FÞ.V·.........F 000020
 12868902 57882607 8826F05E C400C9E9 03750247 08260788 26F05EC4 F65689F4 ¶.V-á^Þ&..&.G.u.Öè.á^Þ&..&.W.... 000040
 00527F83 261E5EC4 086A036F 00009A50 16FF0E86 8D1E76FF 2076FFFF 149689FF ......v .v......P...o.j.á^.&..R. 000060
 FF1E868D 50520106 05205688 1E468800 09E9010E 05205688 1E468800 0CE90374 t.Ö...F..V ...Ö...F..V ...RP.... 000080
 26078826 F05EC400 5CE90375 00F98309 F7C91800 013D0AC4 83037F00 7C9A5016 .P.|....á.=...è¼l.ª.u.Ö\.á^Þ&..& 0000A0
 E9000188 0006E903 748000FF 368E8104 F4468302 57892607 8926F45E C4025788 .W.á^¶&..&.W..F¶../ó...t.Ö..j..Ö 0000C0
 0000880E 5EC40789 26024789 26000088 125EC400 28E90375 00003000 00880003 ..j..=..u.Ö(.á^.j..&.G.&..á^.j.. 0000E0
 26F45EC4 FF28E904 F0468302 71E90000 88000007 C726065E C4078926 02478926 &.G.&..á^.&ú...j..Öq..FÞ.Ö(.á^¶& 000100
 C4FF0DE9 04F44683 07892602 47892600 0088F45E C40014E9 03750247 08260788 ..&.G.u.Ö..á^¶j..&.G.&...F¶.Öï.á 000120
 261E5EC4 0010E903 7400527F 83261E5E C40049E9 03740247 08260788 26FF069E ...&..&.G.t.Öl.á^.&..R.t.Ö..á^.& 000140
 FFFF0886 FF505201 02978826 01008788 261E5EC4 000DE900 AA978826 00A88788 ..´.&..´.Ö..á^.&....&....RP.Ñ... 000160
 88FF0686 88125EC4 0017E907 89260247 89260000 88125EC4 0000FFFF 9AFF0686 Ñ.......á^.j..&.G.&..Ö..á^...... 000180
 261E5EC4 0010E903 7400527F 83261E5E C40001F8 46C70257 89260789 26FF0896 ...&..&.W.úF%..á^.&..R.t.Ö..á^.& 0001A0
 76FF1C76 FF505201 02978826 01008788 261E5EC4 000DE900 AA978826 00A88788 ..´.&..´.Ö..á^.&....&....RP.v..v 0001C0
 85E9E646 880006E9 037500E6 7E83E646 890000FF FF9A5016 FF0A868D FE76FF1A ..v±.....P......Fl.-l.u.Ö...FlÖ. 0001E0

Dump of file SATURN:[PCCOMMON.DUMP.DLL]ENGMAPS.TMP;1 on 18-APR-1990 10:45:43.89
File ID (642,11,0)   End of file block 29 / Allocated 32

Virtual block number 6 (00000006), 512 (0200) bytes

 0E5EC4F6 5689F446 89FF0C96 88FF0A86 88F25689 F04689FF 0C9688FF 0A868801 ..........FÞ.V·.........F¶.V-á^. 000000
 5EC40095 E9037502 47082607 8826F05E C4025789 26078926 FF0C9688 FF0A8688 ........&..&.W.á^Þ&..&.G.u.Ö..á^ 000020
 FF00A19A 5016FF38 86801E76 FF2076FF FF3E9689 FF3C8689 02578826 078826F0 Þ&..&.W...<...>..v .v...ß..P.À.. 000040
 26F05EC4 0050E903 74000030 08C483FF FF00369A 50168E46 8D1676FF 1876FFFF ..v..v..F..P.6....á.=..t.ÖP.á^Þ& 000060
 75000030 08F7C018 018C7E83 04F44683 02578926 078926F4 5EC40257 88260788 ..&.W.á^¶&..&.W..F¶..-...ä¼Ä=..u 000080
 5EC40789 26024789 26000088 0E5EC407 89260247 89260000 88125EC4 0028E903 .Ö(.á^.j..&.G.&..á^.j..&.G.&..á^ 0000A0
 E9037502 47082607 8826F45E C4FF5CE9 04F04683 008AE900 00880000 07C72606 .&ú...j..Öα..FÞ.Ö\.á^¶&..&.G.u.Ö 0000C0
 47082607 8826FF0A 9EC4FFD0 E904F446 83078926 02478926 000088F4 5EC40014 ..á^¶j..&.G.&...F¶.Öï.á...&..&.G 0000E0
 00AA9788 2600A887 88261E5E C40010E9 03740052 7F83261E 5EC40049 E9037402 .t.Öl.á^.&..R.t.Ö..á^.&..´.&..´. 000100
 C4000002 949AFF0A 86FFFF0C 86FF5052 01029788 26010087 88261E5E C4000DE9 Ö..á^.&....&....RP.Ñ...Ñ.......á 000120
 57892607 8926FF0C 9688FF0A 86880E5E C40017E9 07892602 47892600 00880E5E ^.j..&.G.&..Ö..á^.........&..&.W 000140
 000107C7 260A5EC4 0008E903 7400E47E 830011E9 037400F8 7E830001 E446C702 .úFö...-½.t.Ö...-ö.t.Ö..á^.&ú... 000160
 00850002 00780203 00000001 01840002 00079000 1CCAC95F 5E1F0000 E9E64688 .FlÖ...^_èò...............x..... 000180
 00480002 01220203 00000012 00080002 00000011 01850002 0000000C 00D20002 ..●.......ç...............".. K. 0001A0
 FF0C76FF D88EFFFF 881E5657 00000AC8 00000000 00000000 00610002 04480203 ..K...●..........à...WV.j...Ä.v.. 0001C0
 FA4608F8 4688F646 8900FF03 DF9A5016 F8468D50 52000805 08568806 46880A76 v..F..V....RP.F½.P.Ö....F-.F½.F° 0001E0
```

Dump of file SATURN:[PCCOMMON.DUMP.DLL]ENGMAPS.TMP;1 on 18-APR-1990 10:45:43.89
File ID (642,11,0)   End of file block 29 / Allocated 32

Virtual block number 7 (00000007), 512 (0200) bytes

```
0A76FF0C 76FFF646 890000FF FF9A5016 F8468D1A 6A0A76FF 0C76FF01 04E90374 t.Ö...v..v.j..F½.P......F-.v..v. 000000
76FF0C76 FFF64689 00000085 9A505200 08050856 88064688 036AF876 FFFA76FF .vª.v½j..F..V....RP......F-.v..v 000020
FF0C76FF F6468900 0000A69A 50520010 05085688 06468804 6AF876FF FA76FF0A ..vª.v½j..F..V....RP.Ì....F-.v.. 000040
0C76FFF6 46890000 00C79A50 52005C05 08568806 4688056A F876FFFA 76FF0A76 v..vª.v½j..F..V..\.RP.ú....F-.v. 000060
4688F646 890000FF FF9A5052 005E0508 56880646 88066AF8 76FFFA76 FF0A76FF .v..vª.v½j..F..V..^.RP......F-.F 000080
88064688 0A76FF0C 76FF0050 E9037400 0030FFFF 00009A50 52005E05 08568806 ..V..^.RP.....=..t.ÕP..v..v..F.. 0000A0
FF0021E9 0375FE46 08FC4688 F64689FF FF030F9A 5016FC46 80505200 5E050856 V..^.RP.F=.P.Ö....F-.F=.F±u.Öt.. 0000C0
0006E9F6 46890000 FFFF9A07 6AFC76FF FE76FF0A 6AF876FF FA76FF0A 76FF0C76 v..v..vª.v½j..v±.v=j.......F-Ö.. 0000E0
57000006 C80008CA C95F5E1F 0000E9F6 46880000 F646C700 05E9000E E90001B8 ¡..Ö..Ö..úF-...F-Ö...^_èb..à...W 000100
04F79A50 16FC4680 50520008 05085688 0646880A 76FF0C76 FFD88E00 08881E56 V.¡...Ä.v..v..F..V....RP.F=.P.%. 000120
00439A50 16FC468D 196A0A76 FF0C76FF 005AE903 74FE4608 FC4688FA 46890025 %..Fª.F=.F±t.ÖZ..v..v.j..F=.P.C. 000140
D09A5052 00080508 56880646 88036AFC 76FFFE76 FF0A76FF 0C76FFFA 46890000 ...Fª.v..v..v±.v=j..F..V....RP.Å 000160
9A505200 10050856 88064688 046AFC76 FFFE76FF 0A76FF0C 76FFFA46 89000001 ....Fª.v..v..v±.v=j..F..V....RP. 000180
00000CC8 0008CAC9 5F5E1F00 00E9FA46 880000FA 46C70005 E9FA4689 00000064 d....FªÖ..úFª...FªÖ...^_èb..à... 0001A0
0C76FFF8 46890000 018E9A50 16F4468D 186A0A76 FF0C76FF D88E0153 881E5657 WV.¡S..Ä.v..v.j..F¶.P......F½.v. 0001C0
76FFF846 89000002 489A5052 00080508 56880646 88036AF4 76FFF676 FF0A76FF .v..v~.v¶j..F..V....RP.H.....F½.v 0001E0
```

Dump of file SATURN:[PCCOMMON.DUMP.DLL]ENGMAPS.TMP;1 on 18-APR-1990 10:45:43.89
File ID (642,11,0)   End of file block 29 / Allocated 32

Virtual block number 8 (00000008), 512 (0200) bytes

```
FFF84689 00000269 9A505200 10050856 88064688 046AF476 FFF676FF 0A76FF0C ..v..v~.v¶j..F..V....RP.i.....F½. 000000
F8468900 00028A9A 50520018 05085688 06468805 6AF476FF F676FF0A 76FF0C76 v..v..v~.v¶j..F..V....RP......F½ 000020
46890000 02A89A50 52002005 08568806 4688066A F476FFF6 76FF0A76 FF0C76FF .v..v..v~.v¶j..F..V.. .RP.¨....F 000040
89000001 AF9A5052 00280508 56880646 88076AF4 76FFF676 FF0A76FF 0C76FFF8 %..v..v..v~.v¶j..F..V..(.RP.£..... 000060
00009A50 16FC4680 5016FA46 80505200 08050856 88064688 0A76FF0C 76FFF846 F½.v..v..F..V....RP.Fª.P.F=.P.... 000080
76FF096A F476FFF6 76FF0A76 FF0C76FF 0022E903 75FE4608 FC4688F8 46890330 0..F½.F=.F±u.Õ"..v..v..v..v~.v¶j..v 0000A0
06E90375 00F87E83 00AFE9F8 46880006 E9F84689 00000357 9AFA76FF FC76FFFE ±.v=.vª.W....F½Õ...F½ÕE.-½.u.Õ. 0000C0
03DF9A50 16FC4680 50520018 05085688 0646880A 76FF0C76 FF00A0E9 F8468800 ..F½Õ...v..v..F..V....RP.F=.P.Õ. 0000E0
76FF086A F476FFF6 76FF0A76 FF0C76FF 001EE903 75FE4608 FC4688F8 4689037D )..F½.F=.F±u.Õ...v..v..v..v~.v¶j..v 000100
08568806 46880A76 FF0C76FF 0053E9F8 46880006 E9000003 A49A096A FC76FFFE ±.v=j..È...Õ...F½ÕS..v..v..F..V. 000120
0C76FF00 1EE90375 FE4608FC 4688F846 89017004 F79A5016 FC468050 52001005 ...RP.F=.P.%.p..F½.F=.F±u.Õ...v. 000140
06E9F846 880006E9 00000126 9A066AFC 76FFFE76 FF0A6AF4 76FFF676 FF0A76FF .v..v~.v¶j..v±.v=j..&...Õ...F½Õ. 000160
02000000 04020000 02007800 02020602 03000608 CAC95F5E 1F0000E9 00008800 .¡..Õ...^_èb..........(...Å...... 000180
00005700 0202F802 03003E00 02022702 03000000 1201F400 02000000 0600DC00 .È.......¶.......'...>...½...W.. 0001A0
801276FF 1476FF07 89260247 89260000 88065EC4 D88EFFFF 881E5657 00001EC8 à...WV.¡...Äá'.¡..&.G.&...v..v.. 0001C0
0001149A 5016E246 80186AF0 76FFF276 FF1276FF 1476FF00 00FFFF9A 5016F046 FÞ.P......v..v..v·.vÞj..Fã.P.... 0001E0
```

Dump of file SATURN:[PCCOMMON.DUMP.DLL]ENGMAPS.TMP;1 on 18-APR-1990 1:45:43.89
File ID (642,11,0)   End of file block 29 / Allocated 32

Virtual block number 9 (00000009), 512 (0200) bytes

```
5EC4EE56 89EC4689 E45688E2 46880386 E9E64688 0006E903 7500003D E6468900 ..F l=..u.Õ...F lÕ...Fã.VÕ.F£.V¥á^ 000000
F8468D37 FF260277 FF26EC5E C41276FF 1476FF01 84E90375 02470826 07882CEC $&..&.G.u.Õ...v..v..á^$&.w.&.7.F½ 000020
EF9AE276 FFE476FF 1276FF14 76FF0017 E9037500 003DE646 89000001 5B9A5016 .P.[....F l=..u.Õ...v..v..vÕ.vã.ÿ 000040
00300AC4 83018100 7C9A0E76 FF1076FF 5016F846 80086A03 2FE9E646 88000000 ....F lÕ/.j..F½.P.v..v..|.....á.=. 000060
07C7260A 5EC40257 89260789 26065EC4 02578826 078826EC 5EC40036 E9037400 .t.Õ6.á^$&..&.W.á^.&..&.W.á^.&ú. 000080
FF1476FF 00EEE902 DFE90000 88000001 879AE276 FFE476FF 1276FF14 76FF001B ...v..v..vÕ.vã.ñ....¡..ÕÕ.ÕY..v.. 0000A0
7500E67E 83E64689 00000216 9A5016E8 468D136A 37FF2602 77FF26EC 5EC41276 v.á^$&.w.&.7j..FÕ.P.......F l.-l.u 0000C0
02470826 07882644 5EC4F656 89F44689 EA5688E8 468802AE E9E64688 0006E903 .Õ...F lÕÜ..FÕ.VÕ.F¶.V-á^¶&..&.G. 0000E0
89000002 5C9A5016 F8468D37 FF260277 FF26F45E C41276FF 1476FF00 94E90375 u.Õ...v..v..á^¶&.w.&.7.F½.P.\.... 000100
7C9A0E76 FF1076FF 5016F846 80086A02 67E9E646 880006E9 037500E6 7E83E646 F l.-l.u.Õ...F lÕg.j..F½.P.v..v..| 000120
89260789 26065EC4 02578826 078826F4 5EC40044 E9037400 003D0AC4 83029200 ....á.=..t.Õ0.á^¶&..&.W.á^.&..&. 000140
76FF1476 FF000001 C89AE276 FFE476FF 1276FF14 76FF000E 07C7260A 5EC40257 W.á^.&ú....v..v..vÕ.vã.à.....v..v 000160
FF1276FF 1476FFFF 5DE904F4 46830206 E9000088 000001E6 9AE876FF EA76FF12 ..vã.vÕ.l....¡..Õ...F¶.Õ]..v..v.. 000180
02789AE2 76FFE476 FF1276FF 1476FFFE 6DE904EC 46830000 01FE9AE8 76FFEA76 vã.vÕ.±....F£.Õm±.v..v..vÕ.vã.x. 0001A0
00003DE6 46890000 02FE9A50 16E2468D 1A6AF076 FFF276FF 1276FF14 76FF0000 ...v..v..v·.vÞj..Fã.P.±....F l=.. 0001C0
47082607 8826EC5E C4EE5689 EC4689E4 5688E246 8801ADE9 E6468800 06E90375 u.Õ...F lÕÜ..Fã.VÕ.F£.V¥á^$&..&.G 0001E0
```

```
Dump of file SATURN:[PCCOMMON.DUMP.DLL]ENGMAPS.TMP;1 on 18-APR-1990 10:45:43.89
File ID (642,11,0)   End of file block 29 / Allocated 32

Virtual block number 10 (0000000A), 512 (0200) bytes

 0000FFFF 9A5016F8 468D37FF 260277FF 26EC5EC4 1276FF14 76FF0093 E9037502 .u.Ô...v..v.á^$&.w.&.7.F%.P..... 000000
 E9E6468B 000002C0 9AE276FF E476FF12 76FF1476 FF0017E9 03750000 3DE64689 .F|=..u.Ô...v..v..vÔ.vâ.á....F|Ô 000020
 C40033E9 0374C000 3D0AC483 FFFF007C 9A0E76FF 1076FF50 16F8468D 086A0156 V.j..F%.P.v..v..|....á.=..t.Ô3.á 000040
 9AE276FF E476FF12 76FF1476 FF025789 26078926 065EC402 57882607 8826EC5E ^$&..&.W.á^.&..&.W..v..v..vÔ.vâ. 000060
 FF1276FF 1476FFFF 5EE904EC 46830106 E9000088 001C07C7 260A5EC4 000002E6 |...á^.&ú...|..Ô...F&.Ô^..v..v.. 000080
 FFFF9A50 16E2468D 316AF076 FFF276FF 1276FF14 76FF0000 FFFF9AE2 76FFE476 vÔ.vâ......v..v..v·.vÞj1.Fâ.P... 0000A0
 C4EE5689 EC4689E4 5688E246 8800C5E9 E6468800 06E90375 00003DE6 46890000 ...F|=..u.Ô...F|Ôé..Fâ.VÔ.F&.VŸá 0000C0
 468D37FF 260277FF 26EC5EC4 1276FF14 76FF0093 E9037502 47082607 8826EC5E ^$&..&.G.u.Ô...v..v.á^$&.w.&.7.F 0000E0
 9AE276FF E476FF12 76FF1476 FF0017E9 03750000 3DE64689 00000083 9A5016F8 %.P......F|=..u.Ô...v..v..vÔ.vâ. 000100
 3D0AC483 0089007C 9A0E76FF 1076FF50 16F8468D 086A006E E9E6468B 000003A8 ´....F|Ôn.j..F%.P.v..v..|.¿..á.= 000120
 76FF1476 FF025789 26078926 065EC402 57882607 8826EC5E C40033E9 03740000 ..t.Ô3.á^$&..&.W.á^.&..&.W..v..v 000140
 5EE904EC 4683001E E9000088 001907C7 260A5EC4 000003CE 9AE276FF E476FF12 ..vÔ.vâ.ö...á^.&ú...|..Ô...F&.Ô^ 000160
 C80010CA C95F5E1F 0000E900 01880000 009F9AE2 76FFE476 FF1276FF 1476FFFF ..v..v..vÔ.vâ.....|..Ô...^_èÒ..à 000180
 468D0E76 FF1076FF 07892602 47892600 0088065E C4088E00 08881E56 57000016 ...WV.|...Àá^.|..&.G.&...v..v..F 0001A0
 00000030 9A5016EA 468D296A F476FFF6 76FF0E76 FF1076FF 00000025 9A5016F4 ¶.P.X....v..v..v~.v¶j).FÕ.P.=... 0001C0
 F05EC4F2 5689F046 89EC5688 EA468800 8FE9EE46 880006E9 03750000 3DEE4689 .FŸ=..u.Ô...FŸÔé..FÕ.V&.FÞ.V·á^Þ 0001E0

Dump of file SATURN:[PCCOMMON.DUMP.DLL]ENGMAPS.TMP;1 on 18-APR-1990 10:45:43.89
File ID (642,11,0)   End of file block 29 / Allocated 32

Virtual block number 11 (0000000B), 512 (0200) bytes

 468D036A 37FF2602 77FF26F0 5EC40E76 FF1076FF 008DE903 75024708 26078826 &..&.G.u.Ô...v..v.á^Þ&.w.&.7j..F 000000
 9AEA76FF EC76FF0E 76FF1076 FF0017E9 03750000 3DEE4689 0000FFFF 9A5016F8 %.P......FŸ=..u.Ô...v..v..v&.vÕ. 000020
 3D0AC483 037A007C 9F0A76FF 0C76FF50 16F8468D 086A0066 E9EE468B 000004C8 à....FŸÔf.j..F%.P.v..v..|.z..á.= 000040
 76FF1076 FF025789 26078926 065EC402 57882607 8826F05E C4002BE9 03740000 ..t.Ô+.á^Þ&..&.W.á^.&..&.W..v..v 000060
 FF0E76FF 1076FFFF 64E904F0 4683001E E9000088 000004E6 9AEA76FF EL  FF0E ..v&.vÕ.|...|..Ô...FÞ.Ôd..v..v.. 000080
 E7881E56 57000016 C8000CCA C95F5E1F 0000E900 01880000 03609AEA 76F. .C76 v&.vÕ.'...|..Ô...^_èÒ..à...WV.|Ô 0000A0
 00000404 9A5016F4 468D0E76 FF1076FF 07892602 47892600 0088065E C408oE03 ..Àá^.|..&.G.&...v..v..F¶.P..... 0000C0
 03750000 3DEE4689 0000041C 9A5016EA 468D286A F476FFF6 76FF0E76 FF1076FF .v..v..v~.v¶j(.FÕ.P......FŸ=..u. 0000E0
 75024708 26078826 F05EC4F2 5689F046 89EC5688 EA468800 8FE9EE46 880006E9 Ô...FŸÔé..FÕ.V&.FÞ.V·á^Þ&..&.G.u 000100
 00000464 9A5016F8 468D036A 37FF2602 77FF26F0 5EC40E76 FF1076FF 008DE903 .Ô...v..v.á^Þ&.w.&.7j..F%.P.d... 000120
 E9EE468B 000005E0 9AEA76FF EC76FF0E 76FF1076 FF0017E9 03750000 3DEE4689 .FŸ=..u.Ô...v..v..v&.vÕ.À....FŸÔ 000140
 C4002BE9 03740000 3D0AC483 049A007C 9A0A76FF 0C76FF50 16F8468D 086A0066 f.j..F%.P.v..v..|....á.=..t.Ô+.á 000160
 9AEA76FF EC76FF0E 76FF1076 FF025789 26078926 065EC402 57882607 8826F05E ^Þ&..&.W.á^.&..&.W..v..v..v&.vÕ. 000180
 04809AEA 76FFEC76 FF0E76FF 1076FFFF 64E904F0 4683001E E9000088 000005FE ±...|..Ô...FÞ.Ôd..v..v..v&.vÕ... 0001A0
 0002051C 02030085 00020344 02030007 90000CCA C95F5E1F 0000E900 01880000 ..|..Ô...^_èÒ.......D........... 0001C0
 00020534 02030000 001204FF 00020000 001105B2 00020030 0002057C 0203000E ....|...0.¯.ý...............4... 0001E0

Dump of file SATURN:[PCCOMMON.DUMP.DLL]ENGMAPS.TMP;1 on 18-APR-1990 10:45:43.89
File ID (642,11,0)   End of file block 29 / Allocated 32

Virtual block number 12 (0000000C), 512 (0200) bytes

 260A5EC4 D88EFFFF 881E5657 0000C8C8 00000000 00000061 00020598 0203004B K.......a.......àà..WV.|...Àá^.& 000000
 086A08C4 83004300 009A5016 A6468D50 52000805 0C56880A 4688F246 8954478B .GT.F·.F..V....RP.F|.P...C..á.j. 000020
 0676FF08 76FF086A 0AC48300 5800089A 50169E46 8D505200 18051056 880E4688 .F..V....RP.F..P.À.X..á.j..v..v. 000040
 7F832612 5EC4003C E9037400 527F8326 125EC40A C4830108 00089A50 16F4468D .F¶.P.À....á.á^.&..R.t.Ô<.á^.&.. 000060
 26010087 8826125E C4000DE9 00AA9788 2600A887 8826125E C40010E9 03740052 R.t.Ô..á^.&..´.&..`.Ô..á^.&....& 000080
 03740052 7F832612 5EC4003F E9944689 016A0000 9A501696 468D5052 01029788 ....RP.F..P...j..F.Ô?.á^.&..R.t. 0000A0
 01029788 26010087 8826125E C4000DE9 00AA9788 2600A887 8826125E C40010E9 Ô..á^.&..´.&..`.Ô..á^.&....&.... 0000C0
 46880006 E9037500 947E8394 46890000 FFFF9A00 6A006A00 6A501696 468D5052 RP.F..Pj.j.j.......F..~..u.Ô...F 0000E0
 88086A08 C4830123 00009A50 16FF4886 8D505200 56050C56 880A4688 016CE994 .Ôl..F..V..V.RP..H..P...#..á.j.. 000100
 00527F83 26125EC4 0AC483FF FF00089A 5016FF40 868D5052 00100510 56880E46 F..V....RP..@..P.À....á.á^.&..R. 000120
 E900AA97 882600A8 87882612 5EC40010 E9037400 527F8326 125EC400 3DE90374 t.Ô=.á^.&..R.t.Ô..á^.&..´.&..`.Ô 000140
 E9944689 02030148 9A5016FF 38868D50 52010297 88260100 87882612 5EC4000D ..á^.&....&....RP..8..P.K....F.Ô 000160
 C4000DE9 00AA9788 2600A887 8826125E C40010E9 03740052 7F832612 5EC40040 @.á^.&..R.t.Ô..á^.&..´.&..`.Ô..á 000180
 890000FF FF9A006A 006A006A 5016FF38 868D5052 01029788 26010087 8826125E ^.&....&....RP..8..Pj.j.j....... 0001A0
 5EC4003D E9037400 527F8326 125EC400 9FE99446 880006E9 03750094 7E839446 F..-..u.Ô...F.Ô..á^.&..R.t.Ô=.á^ 0001C0
 8826125E C4000DE9 00AA9788 2600A887 8826125E C40010E9 03740052 7F832612 .&..R.t.Ô..á^.&..´.&..`.Ô..á^.&. 0001E0
```

```
Dump of file SATURN:[PCCOMMON.DUMP.DLL]ENGMAPS.TMP;1 on 18-APR-1990 10:45:43.89
File ID (642,11,0)   End of file block 29 / Allocated 32

Virtual block number 13 (0000000D), 512 (0200) bytes

 8326125E C40040E9 944689FF FF01EC9A 0E76FF10 76FF5052 0102978B 26010087 ...&....RP.v..v..&....F.Õa.á^.&. 000000
 0100878B 26125EC4 0000E900 AA978B26 00A8878B 26125EC4 0010E903 7400527F .R.t.Õ..á^.&..´.&..`.Õ..á^.&.... 000020
 7500947E 83944689 0000FFFF 9A006A00 6A006A0E 76FF1076 FF505201 0297BB26 &....RP.v..v.j.j.j.......F..~..u 000040
 08881E56 570000C8 C80010CA C95F5E1F 0000E994 46880006 E994468B 0006E903 .Õ...F.Õ...F.Õ...^_èò..àà..WV.¡. 000060
 00009A50 16A6468D 50520008 050C568B 0A4688F2 46895447 88260A5E C4D88E00 ..Äá^.&.GT.F·.F..V....RP.FÌ.P... 000080
 6A0AC483 028F0008 9A50169E 468D5052 00180510 56880E46 88086A08 C48302AA ^..á.j..F..V....RP.F..P.Ä.¢..á.j 0000A0
 3CE90375 00527F83 26125EC4 0AC48303 6F00089A 5016F446 8D0676FF 0876FF08 ..v..v..F¶.P.Ä.o..á.á^.&..R.u.Õ< 0000C0
 5EC40000 E9010297 88260100 87882612 5EC40010 E9037400 527F8326 125EC400 .á^.&..R.t.Õ..á^.&....&....Õ..á^ 0000E0
 125EC400 3FE99446 89030100 009A5016 96468D50 5200AA97 882600A8 87882612 .&..´.&..`.RP.F..P...1..F.Õ?.á^. 000100
 87882612 5EC40000 E9010297 88260100 87882612 5EC40010 E9037400 527F8326 &..R.t.Õ..á^.&....&....Õ..á^.&.. 000120
 00947E83 94468900 0000E9A 006A006A 006A5016 96468D50 5200AA97 882600A8 ´.&..`.RP.F..Pj.j.j..8....F..~.. 000140
 8A00009A 5016FF48 868D5052 0056050C 56880A46 88016CE9 94468800 06E90375 u.Õ...F.Õl..F..V..V.RP..H..P.... 000160
 C40AC483 00290008 9A5016FF 40868D50 52001005 1056880E 4688086A 08C48303 ..á.j..F..V....RP..a..P.Ä.)..á.á 000180
 00878826 125EC400 10E90374 00527F83 26125EC4 0030E903 7500527F 8326125E ^.&..R.u.Õ=.á^.&..R.t.Õ..á^.&... 0001A0
 489A5016 FF38868D 505200AA 97882600 A8878826 125EC400 00E90102 97882601 .&....Õ..á^.&..´.&..`.RP..8..P.K 0001C0
 88260100 87882612 5EC40010 E9037400 527F8326 125EC400 40E99446 89046A01 .j..F.Õa.á^.&..R.t.Õ..á^.&....&. 0001E0

Dump of file SATURN:[PCCOMMON.DUMP.DLL]ENGMAPS.TMP;1 on 18-APR-1990 10:45:43.89
File ID (642,11,0)   End of file block 29 / Allocated 32

Virtual block number 14 (0000000E), 512 (0200) bytes

 6A006A00 6A5016FF 38868D50 5200AA97 882600A8 87882612 5EC40000 E9010297 ...Õ..á^.&..´.&..`.RP..8..Pj.j.j 000000
 00527F83 26125EC4 009FE994 46880006 E9037500 947E8394 46890000 01A89A00 ..¨....F..~..u.Õ...F.Õ..á^.&..R. 000020
 E9010297 88260100 87882612 5EC40010 E9037400 527F8326 125EC400 30E90375 u.Õ=.á^.&..R.t.Õ..á^.&....&....Õ 000040
 E9944689 009E01EC 9A0E76FF 1076FF50 5200AA97 882600A8 87882612 5EC40000 ..á^.&..´.&..`.RP.v..v..&....F.Õ 000060
 C40000E9 0102978B 26010087 8826125E C40010E9 03740052 7F832612 5EC40040 a.á^.&..R.t.Õ..á^.&....&....Õ..á 000080
 89000002 449A006A 006A006A 0E76FF10 76FF5052 00AA978B 2600A887 8826125E ^.&..´.&..`.RP.v..v.j.j.j..0.... 0000A0
 03000610 CAC95F5E 1F0000E9 94468800 06E99446 880006E9 03750094 7E839446 F..~..u.Õ...F.Õ...F.Õ...^_èò.... 0000C0
 02000000 11029000 0200F500 0404AB02 03000000 03030500 0200E200 04034502 .E...â...........¨...%.......... 0000E0
 00FE46C7 088EFFFF B81E5657 000002C8 0000CE00 04041202 03000000 12026F00 .o...........ö..à...WV.¡...ÄúF±. 000100
 B80006E9 03750038 80260676 C4FE5E88 0018E903 7C08FE7E 83FE46FF 0003E900 .Õ...F±.-±.|.Õ...^±áv.&.8.u.Õ..¡ 000120
 8E000888 1E565700 0002C800 04CAC95F 5E1F0000 E9000188 FFDCE900 09E90000 ..Õ..ÕÉ.¡..Õ...^_èò..à...WV.¡... 000140
 75003880 260676C4 FE5E8800 18E9037C 08FE7E83 FE46FF00 03E90000 FE46C7D8 ÄúF±..Õ...F±.-±.].Õ...^±áv.&.8.u 000160
 12004000 02000104 CAC95F5E 1F0000E9 000188FF DCE90009 E9000088 0006E903 .Õ..¡..Õ..ÕÉ.¡..Õ...^_èò.....N.. 000180
 B8125EC4 088EFFFF B81E5657 00000EC8 00000000 00000000 00000000 00000000 ................à...WV̄.¡...Äá^.¡ 0001A0
 02478926 0000880A 5EC40789 26024789 26000088 0E5EC407 89260247 89260000 ..&.G.&..á^.¡..&.G.&..á^.¡..&.G. 0001C0
 9A0676FF 0876FF50 16FE468D 5016FC46 8D1676FF 1876FF1A 76FF1C76 FF078926 &...v..v..v..v..F=.P.F±.P.v..v.. 0001E0

Dump of file SATURN:[PCCOMMON.DUMP.DLL]ENGMAPS.TMP;1 on 18-APR-1990 10:45:43.89
File ID (642,11,0)   End of file block 29 / Allocated 32

Virtual block number 15 (0000000F), 512 (0200) bytes

 FF1876FF 1A76FF1C 76FF00AC E9F2468B 0006E903 7500F27E 83F24689 FFFF0322 "....F·.-·.u.Õ...F·Õ¨..v..v..v.. 000000
 FF1676FF 1876FF1A 76FF1C76 FFF24689 000000C4 9A1276FF 1476FFFC 76FF1676 v..v=.v..v..á....F·.v..v..v..v.. 000020
 76FF0064 E9F2468B 0006E903 7500F27E 83F24689 000000E0 9A5016F8 468DFC76 v=.F%.P.Å....F·.-·.u.Õ...F·Õd..v 000040
 76FF1C76 FFF24689 0000FFFF 9A0E76FF 1076FFFE 76FF1676 FF1876FF 1A76FF1C ..v..v..v..v±.v..v.......F·.v..v 000060
 0006E903 7500F27E 83F24689 0000FFFF 9A5016F4 468DFE76 FF1676FF 1876FF1A ..v..v..v±.F¶.P......F·.-·.u.Õ.. 000080
 E900008B 02578926 078926FA 5613F846 03F6568B F446880A 5EC4001C E9F2468B .F·Õ..á^..F¶.V-.F%.V°&..&.W.¡..Õ 0000A0
 00080002 0022000^ 00980203 0000000C 00520002 00049000 18CAC95F 5E1F0000 ...^_èò.......R...........".... 0000C0
 26065EC4 088EFFF. B81E5657 000006C8 00000000 00480002 007C0203 00000012 ......|...K.....à...WV.¡...Äá^.& 0000E0
 0087FF0A 0A5E68FC 76FFFE76 FF0C76FF 0E76FFFE 5689FC46 89065788 26044788 .G.&.W..F=.V±.v..v..v±.v=k^...ñ. 000100
 FC76FFFE 76FF0C76 FF0E76FF FA468900 0000649A 50520008 0508568B 06468800 ..F..V....RP.d....F°.v..v..v±.v= 000120
 76FF0E76 FFFA4689 0000008B 9A505200 18050856 8806468B 000287FF 0A0A5E68 k^...ñ...F..V....RP......F°.v..v 000140
 89000000 829A5052 00100508 56880646 88000487 FF0A0A5E 68FC76FF FE76FF0C ..v±.v=k^...ñ...F..V....RP.ý.... 000160
 52002805 08568806 46880006 B7FF0A0A 5E68FC76 FFFE76FF 0C76FF0E 76FFFA46 F°.v..v..v±.v=k^...ñ...F..V..(.R 000180
 06468800 0887FF0A 0A5E68FC 76FFFE76 FF0C76FF 0E76FFFA 46890000 00D99A50 P.\....F°.v..v..v±.v=k^...ñ...F. 0001A0
 0006C800 0ACAC95F 5E1F0000 E9FA468B FA468900 00FFFF9A 50520020 0508568B .V.. .RP......F°.F°Õ...^_èò..à.. 0001C0
 0C76FF0E 76FFFE56 89FC4689 06578826 04478826 065EC4D8 8E00088B 1E565700 .WV.¡...Äá^.&.G.&.W..F=.V̄±.v..v. 0001E0
```

```
Dump of file SATURN:[PCCOMMON.DUMP.DLL]ENGMAPS.TMP;1 on 18-APR-1990 10:45:43.89
File ID (642,11,0)   End of file block 29 / Allocated 32

Virtual block number 16 (00000010), 512 (0200) bytes

 00000155 9A505200 08050856 88064688 0014B7FF 03E3C10A 5E88FC76 FFFE76FF .v±.v▪.^.èD..ñ...F..V....RP.U... 000000
 05085688 06468800 1687FF03 E3C10A5E 88FC76FF FE76FF0C 76FF0E76 FFFA4689 .F'.v..v..v±.v▪.^.èD..ñ...F..V.. 000020
 B7FF03E3 C10A5:88 FC76FFFE 76FF0C76 FF0E76FF FA468900 00017E9A 50520054 T.RP.-....F'.v..v..v±.v▪.^.èD..ñ 000040
 76FFFE76 FF0C76FF 0E76FFFA 46890000 01A79A50 52005605 08568806 46880018 ...F..V..V.RP.§....F'.v..v..v±.v 000060
 4688FA46 89000000 309A5052 00A20508 56880646 88001AB7 FF03E3C1 0A5E88FC ▪.^.èD..ñ...F..V..Å.RP.=....F'.F 000080
 88260447 8826065E C4D88E00 F5881E56 57000006 C8000ACA C95F5E1F 0000E9FA 'Ö...^ èò..à...WV.¡%..Äé^.&.G.&. 0000A0
 46880024 B7FF02E3 C10A5E88 FC76FFFE 76FF0C76 FF0E76FF FE5689FC 46890657 W..F▪.V±.v..v..v±.v▪.^.èD..ñ$..F 0000C0
 0A5E88FC 76FFFE76 FF0C76FF 0E76FFFA 46890000 02239A50 52001005 08568806 ..V....RP.#....F'.v..v..v±.v▪.^. 0000E0
 0000E9FA 4688FA46 89000001 2C9A5052 00080508 56880646 88002687 FF02E3C1 èD..ñ&..F..V....RP.,....F'.F'Ö.. 000100
 46890657 88260447 8826065E C4D88E01 C3881E56 57000006 C8000ACA C95F5E1F .^ èò..à...WV.¡ú..Äé^.&.G.&.W..F 000120
 08568806 4688002C B7FF03E3 C10A5E88 FC76FFFE 76FF0C76 FF0E76FF FE5689FC ▪.V±.v..v..v±.v▪.^.èD..ñ,..F..V. 000140
 FF03E3C1 0A5E88FC 76FFFE76 FF0C76FF 0E76FFFA 46890000 029F9A50 52001005 ...RP......F'.v..v..v±.v▪.^.èD.. 000160
 FFFE76FF 0C76FF0E 76FFFA46 89000002 C89A5052 00080508 56880646 88002EB7 ñ...F..V....RP.à....F'.v..v..v±. 000180
 FFFA4689 000002F1 9A505200 5E050856 88064688 0030B7FF 03E3C10A 5E88FC76 v▪.^.èD..ñ0..F..V..^.RP.þ....F'. 0001A0
 5052005C 05085688 06468800 3287FF03 E3C10A5E 88FC76FF FE76FF0C 76FF0E76 v..v..v±.v▪.^.èD..ñ2..F..V..\.RP 0001C0
 00300002 02760203 00029000 0ACAC95F 5E1F0000 E9FA4688 FA468900 0001FA9A .'....F'.F'Ö...^_èò.......v...0. 0001E0

Dump of file SATURN:[PCCOMMON.DUMP.DLL]ENGMAPS.TMP;1 on 18-APR-1990 10:45:43.89
File ID (642,11,0)   End of file block 29 / Allocated 32

Virtual block number 17 (00000011), 512 (0200) bytes

 260A5EC4 D88EFFFF B81E5657 000084C8 00000000 00000000 00000012 023F0002 ..?:............àÇ..WV.¡...Äé^.& 000000
 0DE900AA 97882600 A8878826 165EC400 10E90374 00527F83 26165EC4 000007C7 ú...é^.&..R.t.Ö..é^.&..`.&..`.Ö. 000020
 5016F846 8D5016FC 468D1276 FF1476FF 50520102 97882601 00878826 165EC400 .é^.&....&....RP.v..v..F▪.P.F%.P 000040
 0010E903 7400527F 8326165E C4FF7A86 89FFFF00 009A5016 80468050 168A4680 .F..P.F..P.......z.é^.&..R.t.Ö.. 000060
 FF505201 02978826 01008788 26165EC4 000DE900 AA978826 00A88788 26165EC4 é^.&..`.&..`.Ö..é^.&....&....RP. 000080
 82468D50 588A4668 7E6A0104 87FF2616 5EC4FF7A 86890000 03359AF8 76FFFA76 v'.v½.5.....z.é^.&.ñ..j-kF.XP.F. 0000A0
 76FF586A 006A027A E9FF7A86 880007E9 03750000 3DFF7A86 890000FF FF9A5016 .P.......z.=..u.Ö....z.Öz.j.jX.v 0000C0
 82468806 5EC408C4 8301C401 369A8276 FF8476FF 006A5000 E5017E9A 8A76FF8C ..v..~.Î.Pj..v..v..6.é..é.é^..F. 0000E0
 5E680027 E9037C02 867E8386 46FF0003 E9000086 46C70257 89260789 26845688 .V.&..&.W.úF...Ö...F..-..|.Ö'.k^ 000100
 9689FF7C 8689003E 9788003C 87880686 5E680014 E9037400 40873980 46880686 ...F.9.a.t.Ö..k^....<...>...|... 000120
 E9037502 47082607 8826FC5E C4FF4E96 89FF4C86 89FE5688 FC4688FF CDE9FF7E ~.Öe..F▪.V±..L...N.é^▪&..&.G.u.Ö 000140
 10E90374 00527F83 26165EC4 FF569689 FF548689 02578826 078826FC 5EC401AE Ü.é^▪&..&.W...T...V.é^.&..R.t.Ö. 000160
 50520102 97882601 00878826 165EC400 0DE900AA 97882600 A8878826 165EC400 .é^.&..`.&..`.Ö..é^.&....&....RP 000180
 FF7A8688 0007E903 7500FF7A BE83FF7A 86890264 00009A50 16FF5086 8D8076FF .v...P..P...d...z../z..u.Ö....z. 0001A0
 D9F7C91B 0001300A C48301E9 007C9A50 16FF6086 8D0E76FF 1076FF08 6A0191E9 Ö..j..v..v...'..P.|.Ö..é.=...è%) 0001C0
 5EC40AC4 83028E0^ D89A8276 FF8476FF 5016FF68 868D086A 0121E903 7500F983 .'.u.Öl.j...h..P.v..v..Ä....é.é^ 0001E0

Dump of file SATURN:[PCCOMMON.DUMP.DLL]ENGMAPS.TMP;1 on 18-APR-1990 10:45:43.89
File ID (642,11,0)   End of file block 29 / Allocated 32

Virtual block number 18 (00000012), 512 (0200) bytes

 8826165E C4000DE9 00AA9788 2600A887 8826165E C40010E9 03740052 7F832616 .&..R.t.Ö..é^.&..`.&..`.Ö..é^.&. 000000
 165EC4FF 7A8689FF 7C9EFF50 1692468D 8276FF84 76FF5052 01029788 26010087 ...&....RP.v..v..F..P..|...z.é^. 000020
 87882616 5EC4000D E900AA97 882600A8 87882616 5EC40010 E9037400 527F8326 &..R.t.Ö..é^.&..`.&..`.Ö..é^.&.. 000040
 7500FF7A BE83FF7A 8689FFFF 02379A50 168E4680 8076FF50 52010297 88260100 ..&....RP.v..F..P.7.....z../z..u 000060
 FFFF0000 9A505200 08058456 88824688 50169E46 8D00C9E9 FF7A8688 0007E903 .Ö....z.Öè..F..P.F..V....RP..... 000080
 808276FF 8476FF00 A887FF26 00AA87FF 26165EC4 0028E903 7400807E 8308C483 .é..-..t.Ö+.é^.&.ñ`.&.ñ`..v..v.. 0000A0
 260102B7 FF26165E C40028E9 FFFF0000 9A505200 54058456 88824688 50168846 F..P.F..V..T.RP.....Ö(.é^.&.ñ..& 0000C0
 C40000FF FF9A5052 00540584 56888246 88501688 46808276 FF8476FF 010087FF .ñ...v..v..F..P.F..V..T.RP.....é 0000E0
 165EC400 10E90374 00527F83 26165EC4 FE43E904 FC468358 82468307 FF260A5E ^.&...F.X.F▪.ÖC±é^.&..R.t.Ö..é^. 000100
 FF4EB6FF 50520102 97882601 00878826 165EC400 0DE900AA 97882600 A8878826 &..`.&..`.Ö..é^.&....&....RP.Ñw. 000120
 00020008 900014CA C95F5E1F 0000E9FF 7A8688FF 7A868900 00FFFF9A FF4CB6FF .ÑL........z...z.Ö...^_èò....... 000140
 00020109 000402E8 02030000 0008019C 00020000 00070050 00020000 000402C2 ó.......}................Š....... 000160
 00000061 00020096 02030088 00030083 02030000 00120008 00020000 00110007 ▪...............°...£........... 000180
 0A76FF0C 76FF0E76 FF1076FF 000007C7 26065EC4 D88EFFFF B81E5657 00003CC8 à<..WV.¡...Äé^.&ú....v..v..v..v. 0001A0
 0006E903 7500F27E 83F24689 FFFF0322 9A5016F4 46805016 F8468050 16F6468D .F-.P.F%.P.F¶.P."....F·.-·.u.Ö.. 0001C0
 890000FF FF9A5016 C4468DF6 76FF0A76 FF0C76FF 0E76FF10 76FF0127 E9F24688 .F·Ö'..v..v..v..v..v-.Fé.P...... 0001E0
```

Dump of file SATURN:[PCCOMMON.DUMP.DLL]ENGMAPS.TMP;1 on 18-APR-1990 10:45:43.89
File ID (642,11,0)   End of file block 29 / Allocated 32

Virtual block number 19 (00000013), 512 (0200) bytes

```
C45EC4FC 5689FA4' 89C65688 C4468800 FCE9F246 880006E9 037500F2 7E83F246 F .-'.u.Õ...F Õ=..Fá.V6.F°.V=á^á 000000
FF1076FF CE5689. 46890257 88260788 26C45EC4 0088E903 75024708 26078826 &..&.G.u.Õ¡.á^á&..&.W..Fä.Vö.v.. 000020
ACE9F246 880006E9 037500F2 7E83F246 89FFFF00 009A5016 C8468DF4 76FF0E76 v..v¶.Fà.P......F .-'.u.Õ...F Õ` 000040
00F983D9 F7C91800 01300AC4 83FFFF00 7C9A5016 08468016 76FF1876 FF086A00 .j..v..v..FÁ.P.|....á.=...è%).°. 000060
009A5016 FE468D12 76FF1476 FF5016E0 468DF476 FF0E76FF 1076FF00 58E90375 u.ÕX..v..v..v¶.FÁ.P.v..v..F±.P.. 000080
76FF001F E9037500 FE7E8300 58E9F246 880006E9 037500F2 7E83F246 89FFFF00 ....F .-'.u.Õ...F ÕX..-±.u.Õ...v 0000A0
C4468300 30E90000 88000107 C726065E C4000001 519AFA76 FFFC76FF 0E76FF10 ..v..v=.v°.Q...á^.&ú...¡..Õ0..Fá 0000C0
06E90375 00F27E83 F2468900 00FFFF9A FA76FFFC 76FF0E76 FF1076FF FF39E904 .Õ9..v..v..v=.v°......F .-'.u.Õ. 0000E0
01000200 00000800 AD000200 0714CAC9 5F5E1F00 00E9F246 880006E9 F2468800 ..F Õ...F Õ...^_èò.....Ù........ 000100
58020300 00001200 08000200 00001100 D1000200 00000C00 32000200 00000801 .......2.......T................[ 000120
26065EC4 D88EFFFF 881E5657 000072C8 00000000 61000201 28020300 48000200 ...K...+...a....àr..WV.¡...Äá^.& 000140
FF086A00 D9E90000 880006E9 03750000 30FFFF00 009A0E76 FF1076FF 000007C7 ú....v..v......=..u.Õ..¡..Õ).j.. 000160
E9037500 F98309F7 C9180001 300AC483 FFFF007C 9A0E76FF 1076FF0A 76FF0C76 v..v..v..v..|....á.=...è%).°.u.Õ 000180
7C02947E 839446FF 0003E900 009446C7 00A6E900 00880001 07C72606 5EC4000E ..á^.&ú...¡..Õ].úF...Õ...F..~..| 0001A0
004A9788 00488788 06945E68 0012E903 74004C87 3912468B 06945E68 0025E903 .ÕX.k^...F.9.L.t.Õ..k^....H...J. 0001C0
8E468990 5EFF5016 9A468D0E 76FF1076 FF1476FF 1676FFFF CFE99256 89904689 .F..V.Õü..v..v..v..v..F..P.^..F. 0001E0
```

Dump of file SATURN:[PCCOMMON.DUMP.DLL]ENGMAPS.TMP;1 on 18-APR-1990 10:45:43.89
File ID (642,11,0)   End of file block 29 / Allocated 32

Virtual block number 20 (00000014), 512 (0200) bytes

```
02379A50 16964680 1276FF14 76FF1676 FF0047E9 8E468800 06E90375 008E7E83 .-..u.Õ...F.ÕG..v..v..v..F..P.7. 000000
F4468D12 76FF1476 FF1676FF 0022E98E 46880006 E9037500 8E7E838E 4689FFFF ...F..-..u.Õ...F.Õ"..v..v..v..F¶ 000020
00059000 12CAC95F 5E1F0000 E9FFFF00 009A0676 FF0876FF 0A76FF0C 76FF5016 .P.v..v..v..v......Õ...^_èò..... 000040
00000011 003E0002 00000008 01010002 00000008 00000002 00000006 00100002 ..........Á.................>..... 000060
26065EC4 D88EFFFF 881E5657 0000EAC8 00000000 00000000 00000012 00080002 .................àõ..WV.¡...Äá^.& 000080
882600A8 878B260E 5EC40010 E9037400 527F8326 0E5EC400 00F446C7 000007C7 ú...úF¶..á^.&..R.t.Õ..á^.&..`.&. 0000A0
5016F846 800A76FF 0C76FF50 52010297 88260100 878B260E 5EC40000 E900AA97 .`.Õ..á^.&....&....RP.v..v..F½.P 0000C0
AAE9F446 880006E9 037500F4 7E83F446 89FFFF03 229A5016 F6468050 16FA4680 .F°.P.F-.P."....F¶.-¶.u.Õ...F¶Õ` 0000E0
5EC40000 E900AA97 882600A8 878B260E 5EC40010 E9037400 527F8326 0E5EC402 .á^.&..R.t.Õ..á^.&..`.&..`.Õ..á^ 000100
00020A9A 5016FF16 868DF876 FF0A76FF 0C76FF50 52010297 88260100 878B260E .&....&....RP.v..v..v½.....P.... 000120
5689FC46 89FF1896 88FF1686 880258E9 F4468800 06E90375 00F47E83 F4468900 ..F¶.-¶.u.Õ...F¶ÕX..........F=.V 000140
9689FF22 86890257 88260788 26FC5EC4 00A3E903 75024708 26078826 FC5EC4FE ±á^=&..&.G.u.ÕE.á^=&..&.W...".... 000160
880006E9 037500F4 7E83F446 89025E00 009A5016 FF1E8680 0E76FF10 76FFFF24 $..v..v......P...^..F¶.-¶.u.Õ... 000180
0009E901 0E051056 880E4688 000CE903 7400527F 83260E5E C4086A02 06E9F446 F¶Õ..j.á^.&..R.t.Õ...F..V....Õ.. 0001A0
D9F7C918 00013D0A C483029E 007C9A50 16FF2E86 80505201 06051056 880E4688 .F..V....RP.....P.|....á.=...è%) 0001C0
75000030 00008800 03E90001 880006E9 03748000 FF468E81 0024E903 7500F983 .°.u.Õ$..ƒF...t.Õ..¡..Õ..¡..=..u 0001E0
```

Dump of file SATURN:[PCCOMMON.DUMP.DLL]ENGMAPS.TMP;1 on 18-APR-1990 10:45:43.89
File ID (642,11,0)   End of file block 29 / Allocated 32

Virtual block number 21 (00000015), 512 (0200) bytes

```
0010E903 7400527F 83260E5E C4FF4EE9 04FC4683 000107C7 26065EC4 0008E903 .Õ..á^.&ú....F=.ÕN.á^.&..R.t.Õ.. 000000
FF505201 02978826 01008788 260E5EC4 0000E900 AA978826 00A88788 260E5EC4 á^.&..`.&..`.Õ..á^.&....&....RP. 000020
5EC4014D E9F4468B 00C5E903 7500F47E 83F44689 000002FF 9AFF1686 FFFF1886 Ñ...Ñ........F¶.-¶.u.Õ...F¶ÕM.á^ 000040
88260E5E C4000DE9 00AA9788 2600A887 88260E5E C40010E9 03740052 7F83260E .&..R.t.Õ..á^.&..`.&..`.Õ..á^.&. 000060
46890000 FFFF9A50 16FF1A86 80FA76FF 0A76FF0C 76FF5052 01029788 260. 087 ...&....RP.v..v..v°.....P......F 000080
5EC4FE56 89FC4689 FF1C9688 FF1A8688 00F8E9F4 46880006 E9037500 F47Eb F4 ¶.-¶.u.Õ...F¶Õ«...........F=.V±á^ 0000A0
FFFF4E96 89FF4C86 89025788 26078826 FC5EC400 8DE90375 02470826 078826FC =&..&.G.u.Õ..á^=&..&.W...L...N.. 0000C0
E9F4468B 0006E903 7500F47E 83F44689 FFFFD0A1 9A5016FF 4886800E 76FF1076 v..v...H..P.À....F¶.-¶.u.Õ...F¶Õ 0000E0
56880E46 880009E9 00800510 56880E46 88000CE9 03740052 7F83260E 5EC400A9 `.á^.&..R.t.Õ...F..V..`.Õ...F..V 000100
18019C7E 830018E9 03740000 3008C483 FFFF0036 9A50169E 46805052 00580510 ..X.RP.F..P.6....á.=..t.Õ...~... 000120
7F83260E 5EC4FF64 E904FC46 83000107 C726065E C40008E9 03750000 3008F7C0 á¼Á=..u.Õ..á^.&ú....F=.Õd.á^.&.. 000140
26010087 88260E5E C4000DE9 00AA978B 2600A887 88260E5E C40010E9 03740052 R.t.Õ..á^.&..`.&..`.Õ..á^.&....& 000160
880006E9 037500F4 7E83F446 890000FF FF9AFF1A 86FFFF1C 86FF5052 01029788 ....RP.Ñ...Ñ........F¶.-¶.u.Õ... 000180
5EC4088E 0008881E 56570000 06C8000C CAC95F5E 1F0000E9 F4468800 06E9F446 F¶Õ...F¶Õ...^_èò..à...WV.¡...Äá^ 0001A0
FF1476FF 1676FF18 76FF0001 07C72606 5EC40000 07C7260A 5EC40000 07C7260E .&ú...á^.&ú..¯á^.&ú....v..v..v.. 0001C0
46C70065 E9FA4688 0006E903 7500FA7E 83FA4689 0000FFFF 9A5016FC 46801276 v..F=.P......F°.-°.u.Õ...F°Õe.úF 0001E0
```

Dump of file SATURN:[PCCOMMON.DUMP.DLL]ENGMAPS.TMP;1 on 18-APR-1990 10:45:43.89
File ID (642,11,0)   End of file block 29 / Allocated 32

Virtual block number 22 (00000016), 512 (0200) bytes

```
 74005487 39FC4688 03E3C1FE 5E880048 E9037C08 FE7E83FE 46FF0003 E90000FE ±..Õ...F±.-±.|.ÕK..^±èO..F=9.T.t 000000
 58848803 E6C1FE76 880A5EC4 07892600 56848803 E6C1FE76 880E5EC4 0036E903 .Õ6.á^..v±èl...V.&..á^..v±èl...X 000020
 000188FF A9E90009 E9000088 07892600 5A848803 E6C1FE76 88065EC4 07892600 .&..á^..v±èl...Z.&..|..Õ..Õ¨.|.. 000040
 11014400 02000000 0C005000 02000000 01010100 02000714 CAC95F5E 1F0000E9 Õ...^_èò.............]......D.. 000060
 02035802 03006100 02018802 03004800 0200AD02 03000000 12032A00 02000000 .....ª.......Ù...K...|...a...X.. 000080
 00F046C7 D88EFFFF 881E5657 00003EC8 00000000 00000000 00000000 00006000 .m..............à>..WV.|...ÄúFÞ. 0000A0
 805016F4 46801676 FF1876FF 1A76FF1C 76FF0000 07C7250A 5EC40000 F846C700 .úF%..á^.&ú....v..v..v..v..F¶.P. 0000C0
 0131E9F0 46880006 E9037500 F07E83F0 4689FFFF 03229A50 16F2468D 5016F646 F-.P.F·.P.".....FÞ.-Þ.u.Õ...FÞÕ1. 0000E0
 00F07E83 F0468900 00FFFF9A 5016C246 8DF476FF 1676FF18 76FF1A76 FF1C76FF .v..v..v..v..v¶.Fõ.P......FÞ.-Þ. 000100
 47082607 8826C25E C4FC5689 FA4689C4 5688C246 880106E9 F0468800 06E90375 u.Õ...FÞÕ...Fõ.Vá.Fª.V=á^õ&..&.G 000120
 80F276FF 1A76FF1C 76FFCC56 89CA4689 02578826 078826C2 5EC40089 E9037502 .u.Õ¿.á^õ&..&.W..Fò.Vä.v..v..v·. 000140
 1476FF08 6A0086E9 F0468800 06E90375 00F07E83 F04689FF FF00009A 5016C646 Fõ.P......FÞ.-Þ.u.Õ...FÞÕÑ.j..v. 000160
 FF0059E9 037500F9 8309F7C9 18000130 0AC48301 43007C9A 50160646 801276FF .v..F=.P.|.C..á.*...è%).ª.u.ÕY.. 000180
 F04689FF FF00009A 5016FE46 800E76FF 1076FF50 160E468D F276FF1A 76FF1C76 v..v..v·.F8.P.v..v..F±.P......FÞ 0001A0
 88S016DE 4680086A 0020E903 7500FE7E 830062E9 F0468800 06E90375 00F07E83 .-Þ.u.Õ...FÞÕb..-±.u.Õ .j..F8.P. 0001C0
 FFFF38E9 04C24683 0AC483FF FF00089A 50520856 88064603 03E0C1F8 46FFF846 F%.F%èÅ..F..V.RP.Ä....á..Fó.Õ8.. 0001E0
```

Dump of file SATURN:[PCCOMMON.DUMP.DLL]ENGMAPS.TMP;1 on 18-APR-1990 10:45:43.89
File ID (642,11,0)   End of file block 29 / Allocated 32

Virtual block number 23 (00000017), 512 (0200) bytes

```
 E9F04688 0006E903 7500F07E 83F04689 0000FFFF 9AFA76FF FC76FF1A 76FF1C76 v..v..v=.vª......FÞ.-Þ.u.Õ...FÞÕ 000000
 00000800 87000200 0718CAC9 5F5E1F00 00E9F046 88078926 F846880A 5EC4000F ..á^..F%&...FÞÕ...^_èò.....ñ.... 000020
 00001200 08000200 00001100 08000200 00000C00 3C000200 00000801 08000200 ...........<.......Ū............. 000040
 00000000 00000000 00000000 00000000 61000201 5C020300 48000200 65020300 ...e...K...\...a................ 000060
 76FF0C76 FF1076FF 1276FF00 21E90374 810E7E83 D88EFFFF 881E5657 00000AC8 à...WV.|...Ä.-..t.Õl..v..v..v..v 000080
 FF0C76FF 1076FF12 76FF001E E9F64689 FFFF0000 9A5016FA 46805016 F84680DA ..F%.P.Fª.P......F-Õ...v..v..v.. 0000A0
 F6468800 06E90375 00F67E83 F6468900 00FFFF9A 5016FA46 8D5016F8 4680A76 v..F%.P.Fª.P......F-.--.u.Õ...F- 0000C0
 00F67E83 F64689FF FF00C49A 5016FE46 8DFA76FF FC76FF10 76FF1276 FF005AE9 Õ2..v..v..v=.vª.F±.P.á....F-.--. 0000E0
 0676FF08 76FFFE76 FFFA76FF FC76FF10 76FF1276 FF0032E9 F6468800 06E90375 u.Õ...F-Õ2..v..v..v=.vª.v±.v..v. 000100
 5F5E1F00 00E90000 880006E9 F6468800 06E90375 00F67E83 F6468900 00FFFF9A ......F-.—.u.Õ...F-Õ..|..Õ...^_ 000120
 76FF0E76 FF1076FF 000007C7 26065EC4 D88E0008 881E5657 000006C8 000ECAC9 èò..à...WV.|...Äá^.&ú....v..v..v̄ 000140
 0045E9FA 46880006 E9037500 FA7E83FA 46890000 FFFF9A50 16FC4680 0A76FF0C ..v..F=.P......Fª.-ª.u.Õ...FªÕE. 000160
 948739FC 468802E3 C1FE5E88 0028E903 7C08FE7E 83FE46FF 0003E900 00FE46C7 úF±..Õ...F±.-±.|.Õ+..^±èO..F=9.. 000180
 88FFC9E9 0009E900 0C380789 26009684 8802E6C1 FE768806 5EC40016 E9037400 .t.Õ..á^..v±èl.....&..|..Õ..Õè.| 0001A0
 77000201 09000400 4D020300 00000400 2E000200 060CCAC9 5F5E1F00 C¨90001 ..Õ...^_èò.............M.......w 0001C0
 00000000 6D000200 EA020300 00001200 CC000200 30000200 A1020300 00L 9E00 .......Ā...0...ä.......õ...m.... 0001E0
```

Dump of file SATURN:[PCCOMMON.DUMP.DLL]ENGMAPS.TMP;1 on 18-APR-1990 10:45:43.89
File ID (642,11,0)   End of file block 29 / Allocated 32

Virtual block number 24 (00000018), 512 (0200) bytes

```
 46C70000 07C7260A 5EC40000 EC46C700 00E846C7 D88EFFFF 881E5657 000018C8 à...WV.|...ÄúFÒ..úF&..á^.&ú...úF 000000
 00700008 9A5016F8 46805052 16568814 460303E0 C1EC46FF EC468808 6AFFFFF2 ·..j..F&.F&èÅ..F..V.RP.F%.P.Ä.p. 000020
 03E0C1EC 46FFEC46 88086A00 26E90374 00003000 9F00009A 5016F846 800AC483 .á..F%.P.....=..t.Õ&.j..F&.F&èÅ. 000040
 74FFF27E 83FFC8E9 F246FF0A C48300C1 00089A50 16F8468D 50521656 88144603 .F..V.RP.F%.P.Ä.è..á..F·Õà..-·.t 000060
 FF00459A 50521A56 88184603 03E0C1EC 46880000 EC46C700 00F246C7 0005E903 .Õ..úF·..úF&...F&èÅ..F..V.RP.E.. 000080
 089A5016 F8468D50 521A5688 18460303 E0C1EC46 88086A01 05E90374 00003DFF .*..t.Õ..j..F&èÅ..F..V.RP.F%.P.Ä 0000A0
 0000FFFF 9A5016F4 46805016 EA468D50 16F8468D 2076FF22 76FF0AC4 83FFFF00 ....á..v".v .F%.P.Fð.P.F¶.P..... 0000C0
 76FFF476 FFF676FF 2076FF22 76FF00C2 E9E84688 0006E903 7500E87E 83E84689 .FÒ.-Õ.u.Õ...FÒÕó..v".v .v-.v¶.v 0000E0
 F2468000 97E9E846 880006E9 037500E8 7E83E846 890000FF FF9A5016 EE468DEA ð.FŸ.P......FÒ.-Ò.u.Õ...FÒÕ...F· 000100
 76FF5016 0E46800A 76FF0C76 FF505208 56880646 0303E0C1 0788260A 5EC45016 .Pá^.&..èÅ..F..V.RP.v..v..F..P.v 000120
 FF03AD9A 2076FF22 76FFEE76 FFF076FF 1C76FF1E 76FF1476 FF1676FF 1076FF12 ..v..v..v..v..v..vÞ.vŸ.v".v .Ù.. 000140
 FFF076FF 2076FF22 76FF003E E9E84688 0006E903 7500E87E 83E84689 24C483FF ..á$.FÒ.-Õ.u.Õ...FÒÕ>..v".v .vÞ. 000160
 E9037C00 F27E8300 18E9E846 880006E9 037500E8 7E83E846 890000FF FF9AEE76 vŸ......FÒ.-Õ.u.Õ...FÒÕ...-·.|.Õ 000180
 5700001A C8001ECA C95F5E1F 0000E900 1688FEE0 E9EC46FF 000CE900 00880006 ..|..Õ...F&ÕÅ±|..Õ...^_èò..à...W 0001A0
 086AFFFF F246C700 0007C726 0A5EC400 00EC46C7 0000E646 C7D88E00 08881E56 V.|...ÁúF|..úF&..á^.&ū...úF·..j. 0001C0
 46800AC4 83022800 D89A5016 F8468D50 52165688 14460303 E0C1EC46 FFEC4688 .F&.F&èÅ..F..V.RP.F%.P.Ä.+..á..F 0001E0
```

```
Dump of file SATURN:[PCCOMMON.DUMP.DLL]ENGMAPS.TMP;1 on 18-APR-1990 10:45:43.89
File ID (642,11,0)   End of file block 29 / Allocated 32

Virtual block number 28 (0000001C), 512 (0200) bytes

 02030000 001200C5 000200AC 00030210 0203009E 000300DE 02030006 900010CA ò.......B............¯...é....... 000000
 00000000 0000^000 00000157 00050181 0203014B 000501CD 0203013C 00050126 &...<...ë...K.......W........... 000020
 A8C78806 7EC401F7 AEF2FFFF 89C033C0 8ED88CFE 880A76C5 1EDE8807 88EC8855 U.&.■.B.év..±.Å.à3à¿..·Ü%1á-..ú´ 000040
 C40A76C5 1ED688EC 8855C85D C28C1FFA 88F388A4 F3C913A5 F3E90149 A4027401 .t.Él|ÖµE.èµÉ.µ.ª..ó]ìW.&.ø.év.á 000060
 E0864104 C10220E1 80C91A1A 3C412CF3 74E03A43 278A26AC 2074C00A FFB0065E ^.¯..át-¯&.'C:Átµ,A<..è.Ä .è.A.Á 000080
 33EC8855 00CB5DF2 881F98FF 1CC01AD3 74C43A41 04C10220 E180C91A 1A3C412C ,A<..è.Ä .é.A:átÉ.á.....·]ù.U.&3 0000A0
 D688C203 C3230818 C22BD2F7 D78848C1 880A7EC4 0676C556 571E4FE3 0E4E88C0 Å.N.DO.WVév.á~..êH.■K0+ô.ÜWú.ô.ø 0000C0
 D88EFFFF 05D88C07 75F6081D E3911875 A6F3C128 9140C203 C3230818 C22BD2F7 %0+ô.ÜWú.ôa.+èµ|u..D..-u..Ä....Ä 0000E0
 4EE30E4E 88EC8855 00CB5D1F 5F5EFFFF 1DC018C2 EBC08E00 8C05C08C CB75FF08 ..uù.ã.V..áŠó.á...^ .]ù.U.&.N.DN 000100
 DB18C22B D2F7D688 C203C323 DB18C22B D2F7D788 48C18806 7EC40A76 C556571E .WVév.á~..êH.■K0+ô.ÜWú.ô.øK0+ô.Ü 000120
 FF0BD88E 00C70508 8C0775F6 0818E391 A4F3C913 A5F3E901 C1289140 C203C323 #ù.ôa.+èîÖµE.èµÉ.D..-u..Å.ú..Å.. 000140
 C45738E3 0C4E88EC 8855C85D 08568806 46881F5F 5E8EE8CD 8E011A05 C08CC775 uú.á....áŠ/^ ..F..V.]ìW.&.N.D8Wá 000160
 F3C913A8 F3E901E0 8A0A4688 D12BD187 D1030323 DB18012B 0C74DAF7 D78B067E ~..■%Or.+1.UWÆ.1.1+1.F..Å1Öµ¨.èµ 000180
 8855C85D 08568806 46885FAA F3C913A8 F3E901C3 8E0125C3 81C38C10 E30187AA ´.iD..û.ú%..úìÖµ¨.èµ´ .F..V.]ìW. 0001A0
 064688C8 88E3F700 08CA5DE5 88E3F706 46880875 0A5E88D8 080C5E88 08468BEC &.F..^..Ä.^.u..F.%D.ÎÌò..%D.à.F. 0001C0
 00000000 00008800 01016901 05000108 CA5DE58B D103E3F7 064688C8 030C66F7 %f..à.F.%D.1.Î]ò.....i.......... 0001E0
```

```
Dump of file SATURN:[PCCOMMON.DUMP.DLL]ENGMAPS.TMP;1 on 18-APR-1990 10:45:43.89
File ID (642,11,0)   End of file block 29 / Allocated 32

Virtual block number 29 (0000001D), 512 (0200) bytes

 00040003 00060005 00040003 00060007 00040005 00030006 00070004 ^^050003 ................................ 000000
 FFFF03DF 00050006 00030004 00050006 00030004 00030004 00030004 0ι 60005 .............................Ô... 000020
 000007DC 00000012 001107D5 00000000 00420001 003E03DF 00000000 FF) 0001 ........Ô.>...B.....ì.......É... 000040
 000E0009 0001001C 00180002 00000015 001407DE 00000008 000A07D0 0006000E ....ì.......B.................... 000060
 000207D0 000207DC 000207D5 0001001D 001C0005 0001001A 00190003 0001000F .......................ì...É...ì... 000080
 4E020300 00000400 4A000200 02020005 00020003 00020009 00020002 000207DE B.......................J.......N 0000A0
 00000000 00000000 00000000 00000000 00000000 00000000 00000001 20000400 ... ............................. 0000C0
 00000000 00000000 00000000 00000000 00000000 00000000 00000000 00000000 ................................ 0000E0
 00000000 00000000 00000000 00000000 00000000 00000000 00000000 00000000 ................................ 000100
 00000000 00000000 00000000 00000000 00000000 00000000 00000000 00000000 ................................ 000120
 00000000 00000000 00000000 00000000 00000000 00000000 00000000 00000000 ................................ 000140
 00000000 00000000 00000000 00000000 00000000 00000000 00000000 00000000 ................................ 000160
 00000000 00000000 00000000 00000000 00000000 00000000 00000000 00000000 ................................ 000180
 00000000 00000000 00000000 00000000 00000000 00000000 00000000 00000000 ................................ 0001A0
 00000000 00000000 00000000 00000000 00000000 00000000 00000000 00000000 ................................ 0001C0
 00000000 00000000 00000000 00000000 00000000 00000000 00000000 00000000 ................................ 0001E0
```

```
Dump of file SATURN:[PCCOMMON.DUMP.DLL]ENGMAPS.TMP;1 on 18-APR-1990 10:45:43.89
File ID (642,11,0)   End of file block 29 / Allocated 32

Virtual block number 25 (00000019), 512 (0200) bytes

 56881446 0303E0C1 EC46FFEC 4688086A 0026E903 74000030 025A0000 9A5016F8 %.P...Z.=..t.Õ&.j..F$.F$èÅ..F..V 000000
 C70005E9 0374FFF2 7E83FFC8 E9F246FF 0AC48302 7C00089A 5016F846 80505216 .RP.F%.P.Ä.|..á..F.Öà..-.t.Õ..ú 000020
 74000030 00480045 9A50521E 56881C46 0303E0C1 EC468800 00EC46C7 0000F246 F...úF$...F$èÅ..F..V.RP.E.K.=..t 000040
 C483003E 00D89A50 16F84680 50521E56 881C4603 03E0C1EC 4688086A 013CE903 .Õ<.j..F$èÅ..F..V.RP.F%.P.Ä.>..á 000060
 7E83E646 89000000 DC9A5016 F4468D50 16EA4680 5016F846 8D2476FF 2676FF0A ..v&.v$.F%.P.Fõ.P.F¶.P.É....F|.- 000080
 16EE4680 EA76FFF4 76FFF676 FF2476FF 2676FF00 F9E9E646 880006E9 037500E6 |.u.Õ...F|Õ'..v&.v$.v-.v¶.võ.FŸ. 0000A0
 76FF2476 FF2676FF 00CEE9E6 46880006 E9037500 E67E83E6 46890000 01079A50 P......F|.-|.u.Õ...F|Õö..v&.v$.v 0000C0
 0006E903 7500E67E 83E64689 FFFF0000 9A5016E8 46801876 FF1A76FF F476FFF6 -.v¶.v..v..FÒ.P......F|.-|.u.Õ.. 0000E0
 06460303 E0C107B8 260A5EC4 5016F246 80004AE9 037400E8 7E8300A0 E5[illegible]4688 .F|Õ...-Õ.t.ÕJ..F..Pá^.&..èÅ..F. 000100
 FF2276FF 1476FF16 76FF1076 FF1276FF 50160E46 800A76FF 0C76FF50 520[illegible]688 .V.RP.v..v..F..P.v..v..v..v..v". 000120
 E9037500 E67E83E6 468924C4 83015F03 AD9A2476 FF2676FF EE76FFF0 76FF[illegible]76 v .vÞ.vŸ.v&.v$.Ù._..á$.F|.-|.u.Õ 000140
 00E67E83 E6468900 0001839A EE76FFF0 76FF2476 FF2676FF 003EE9E6 46880006 ...F|Õ>..v&.v$.vÞ.vŸ......F|.-|. 000160
 FEA9E9EC 46FF000C E9000088 0006E903 7C00F27E 83001BE9 E6468800 06E90375 u.Õ...F|Õ...-..|.Õ..¡..Õ...F$Õ'± 000180
 46C70000 FA46C7D8 8E01C388 1E565700 0030C800 22CAC95F 5E1F0000 E9001688 ¡..Õ...^_èÒ".à0..WV.¡ú..ÄúF'..úF 0001A0
 57882607 88260A5E C40000FE 46C70143 E9037502 47082607 88260A5E C40000FE ±..á^.&..&.G.u.ÕC.úF±..á^.&..&.W 0001C0
 00FA7E83 FA4689FF FF00009A 50160046 8D006A06 76FF0876 FFD65689 D4468902 ..FÅ.V@.v..v.j..FÅ.P......F'.-'. 0001E0

Dump of file SATURN:[PCCOMMON.DUMP.DLL]ENGMAPS.TMP;1 on 18-APR-1990 10:45:43.89
File ID (642,11,0)   End of file block 29 / Allocated 32

Virtual block number 26 (0000001A), 512 (0200) bytes

 7D073926 FC468B26 5EC4FC46 FF0003E9 0000FC46 C70110E9 FA468800 06E90375 u.Õ...F'Õ..úF=..Õ...F=á^&.F=&9.) 000000
 D9F7C918 0001300A C4830460 007C9A50 16E84680 0E76FF10 76FF086A 00EAE903 .Õö.j..v..v..FÒ.P.|.'..á.=...è%) 000020
 007C9A50 16F04680 50521456 88124603 03E0C1FC 4688086A 00C0E903 7500F983 .'.u.Õà.j..F=èÅ..F..V.RP.FÞ.P.|. 000040
 FF37FF26 1A5EC450 16084680 0094E903 7500F983 D9F7C918 0001300A C48304B9 ¿..á.=...è%).'.u.Õ...FÅ.Pá^.&.7. 000060
 03E0C107 88262 65E C4086A00 73E90375 0000300A C4830351 05209A16 76FF1876 v..v.. .Q..á.=..u.Õs.j.á^&&..èÅ. 000080
 086A0AC4 83040600 D89A5052 14568812 460303E0 C1FC4688 50521456 88124603 .F..V.RP.F=èÅ..F..V.RP.Ä.ø..á.j. 0000A0
 FF26265E C408C483 04FD0136 9A505214 56881246 0303E0C1 07882626 5EC4006A j.á^&&..èÅ..F..V.RP.6.=..á.á^&&. 0000C0
 8301F900 D89A2276 FF2476FF 50160846 8D086A07 FF261A5E C407FF26 1E5EC40F .á^.&..á^.&..j..FÄ.P.v$.v".Ä.'.. 0000E0
 CBC95F5E 1F0000E9 000088FE AEE9040A 4683FF05 E9FE46FF 0013E900 00880AC4 á.¡..Õ...F±Õ...F..ÕÚ±¡..Õ...^_èú 000100
 E9037CFE 46390A46 88FE46FF 0003E900 00FE46C7 D88E0385 881E5657 000002C8 à...WV.¡ç..ÄúF±..Õ...F±.F.9F±|.Õ 000120
 0AC48304 34007C9A 50520856 88064603 03E0C1FE 46880C76 FF0E76FF 086A0036 6.j..v..v..F±èÅ..F..V.RP.|.4..á. 000140
 5E1F0000 E9000188 FFBCE900 09E90000 880006E9 037500F9 8309F7C9 1800013D =...è%).'.u.Õ..¡..Õ..ÕŸ.¡..Õ...^ 000160
 02030000 000803F7 0002016C 00060375 02030000 00060206 00020009 90CBC95F _èù.............u...l...%....... 000180
 00020000 00110558 00020000 001002F2 00020000 000F0488 00020109 00040297 ........................(....... 0001A0
 26065EC4 D88EFFFF 881E5657 000028C8 00000048 000202C2 02030000 00120528 (.......ö...K...à(..WV.¡...Äá^.& 0001C0
 06E90375 00F87E83 F8468900 00FFFF9A 5016FA46 80006A00 00F846C7 000007C7 ú...úF%..j..F'.P......F%.-%.u.Õ. 0001E0

Dump of file SATURN:[PCCOMMON.DUMP.DLL]ENGMAPS.TMP;1 on 18-APR-1990 10:45:43.89
File ID (642,11,0)   End of file block 29 / Allocated 32

Virtual block number 27 (0000001B), 512 (0200) bytes

 800E76FF 1076FF04 8C68006A 006A006A FA76FF12 76FF1476 FF007FE9 F8468800 ..F%Õ...v..v..v'j.j.j.hŸ..v..v.. 000000
 F8468900 00FFFF9A 5016FC46 80501608 46805016 08468050 16084680 50160846 FÅ.P.FÅ.P.FÅ.P.FÅ.P.F=.P......F% 000020
 5EC40008 E9037502 47082607 8826FC5E C40037E9 F8468800 06E90375 00F87E83 .-%.u.Õ...F%Õ7.á^=&..&.G.u.Õ..á^ 000040
 0006E9F8 46880006 E9037500 F87E83F8 46890000 FFFF9AFA 76FF0001 07C72606 .&ú....v'......F%.-%.u.Õ...F%Õ.. 000060
 0007C726 065EC408 8E000888 1E565700 0030C800 10CAC95F 5E1F0000 E9000088 ¡..Õ...^_èÒ..à0..WV.¡...Äá^.&ú.. 000080
 46880006 E9037500 F07E83F0 46890000 00219A50 16F6468D 006A0000 F046C700 .úFÞ..j..F-.P.!....FÞ.-Þ.u.Õ...F 0000A0
 16004680 0E76FF10 76FF04BC 68006A00 6A006AF6 76FF1276 FF1476FF 0138E9F0 ÞÕ8..v..v..v-j.j.j.hŸ..v..v..FÅ. 0000C0
 F07E83F0 46890000 00699A50 16FC4680 50160046 80501600 46805016 00468050 P.FÅ.P.FÅ.P.FÅ.P.F=.P.i....FÞ.-Þ 0000E0
 76FF1476 FF00C1E9 03750247 08260788 26FC5EC4 00F0E9F0 46880006 E9037500 .u.Õ...FÞÕÞ.á^=&..&.G.u.Õè..v..v 000100
 16004680 50160046 8037FF26 0277FF26 FC5EC407 0068006A 006A006A F676FF12 ..v-j.j.j.h..á^=&.w.&.7.FÅ.P.FÅ. 000120
 06E90375 00F07E83 F0468900 00FFFF9A 5016F846 80501600 46805016 00468050 P.FÅ.P.FÅ.P.F%.P......FÞ.-Þ.u.Õ. 000140
 0277FF26 F85EC406 4368006A 006A006A F676FF12 76FF1476 FF0095E9 F0468800 ..FÞÕ...v..v..v-j.j.j.hC.á^%&.w. 000160
 00FFFF9A 5016F246 80501600 46805016 00468050 16004680 50160046 8037FF26 &.7.FÅ.P.FÅ.P.FÅ.P.FÅ.P.F..P.... 000180
 74073926 0C56880A 4688F25E C40049E9 F0468800 06E90375 00F07E83 F0468900 ..FÞ.-Þ.u.Õ...FÞÕ|.á^..F..V.&9.t 0001A0
 9AF676FF FF30E904 FC468300 0107C726 065EC400 08E90374 02573926 0011E903 .Õ..&9W.t.Õ..á^.&ú....F=.Õ0..v-. 0001C0
 C95F5E1F 0000E900 00880006 E9F04688 0006E903 7500F07E 83F04689 0000009A .....FÞ.-Þ.u.Õ...FÞÕ..¡..Õ...^_è 0001E0
```

```
Dump of file SATURN:[PCCOMMON.DUMP.DLL]HCSINIT.TMP;1 on 18-APR-1990 10:46:46.85
File ID (696,27,0)   End of file block 38 / Allocated 40

Virtual block number 37 (00000025), 512 (0200) bytes

0A0A0A0A 0A0A0A0A 0A0A0A0A 0A0A0A0A 0A0A0A0A 0A000000 00000000 00000000 ................................ 000000
0A0A0A0A 0A0A0A0A 0A0A0A0A 0A0A0A0A 0A0A0A0A 0A0A0A0A 0A0A0A0A 0A0A0A0A ................................ 000020
0A0A0A0A 0A0A0A0A 0A0A0A0A 0A0A0A0A 0A0A0A0A 0A0A0A0A 0A0A0A0A 0A0A0A0A ................................ 000040
0A0A0A0A 0A0A0A0A 0A0A0A0A 0A0A0A0A 0A0A0A0A 0A0A0A0A 0A0A0A0A 0A0A0A0A ................................ 000060
0A0A0A0A 0A0A0A0A 0A0A0A0A 0A0A0A0A 0A0A0A0A 0A0A0A0A 0A0A0A0A 0A0A0A0A ................................ 000080
0A0A0A0A 0A0A0A0A 0A0A0A0A 0A0A0A0A 0A0A0A0A 0A0A0A0A 0A0A0A0A 0A0A0A0A ................................ 0000A0
0A0A0A0A 0A0A0A0A 0A0A0A0A 0A0A0A0A 0A0A0A0A 0A0A0A0A 0A0A0A0A 0A0A0A0A ................................ 0000C0
0A0A0A0A 0A0A0A0A 0A0A0A0A 0A0A0A0A 0A0A0A0A 0A0A0A0A 0A0A0A0A 0A0A0A0A ................................ 0000E0
00000000 00000000 00000000 00000000 00000000 000A0A0A 0A0A0A0A 0A0A0A0A ................................ 000100
00000000 00000000 00000000 00000000 20000000 00000000 00000000 00000000 ................................ 000120
6F206863 61747320 2D0A0D30 30303652 00003E3E 47534D4E 3C3CFFFF 0568157C |.h...<<NMSG>>..R6000..- stack o 000140
76696420 72656765 746E6920 2D0A0D33 30303652 0003000A 00776F6C 66726576 verflow.....R6003..- integer div 000160
6867756F 6E652074 6F6E202D 0A0D3830 30365200 08000A0D 30207962 20656469 ide by 0.....R6008..- not enough 000180
0A003930 30365200 09000A0D 73746E65 6D756772 6120726F 66206563 61707320  space for arguments.....R6009.. 0001A0
656D6E6F 7269766E 6520726F 66206563 61707320 6867756F 6E652074 6F6E2020 - not enough space for environme 0001C0
36520002 0020726F 72726520 656D6974 2D6E7572 00FF000A 0D00FC00 0A00746E nt...•......run-time error ...R6 0001E0

Dump of file SATURN:[PCCOMMON.DUMP.DLL]HCSINIT.TMP;1 on 18-APR-1990 10:46:46.85
File ID (696,27,0)   End of file block 38 / Allocated 40

Virtual block number 38 (00000026), 512 (0200) bytes

64656461 6F6C2074 6F6E2074 6E696F70 20676E69 74616F6C 6620200A 0D323030 002..- floating point not loaded 000000
00000007 17660002 00000006 05780002 00000005 19B20002 0003FFFF FF000A0D ..........ÿ.......x.......f..... 000020
00000000 00000000 00000000 00000000 00000000 00000000 00000000 00000000 ................................ 000040
00000000 00000000 00000000 00000000 00000000 00000000 00000000 00000000 ................................ 000060
00000000 00000000 00000000 00000000 00000000 00000000 00000000 00000000 ................................ 000080
00000000 00000000 00000000 00000000 00000000 00000000 00000000 00000000 ................................ 0000A0
00000000 00000000 00000000 00000000 00000000 00000000 00000000 00000000 ................................ 0000C0
00000000 00000000 00000000 00000000 00000000 00000000 00000000 00000000 ................................ 0000E0
00000000 00000000 00000000 00000000 00000000 00000000 00000000 00000000 ................................ 000100
00000000 00000000 00000000 00000000 00000000 00000000 00000000 00000000 ................................ 000120
00000000 00000000 00000000 00000000 00000000 00000000 00000000 00000000 ................................ 000140
00000000 00000000 00000000 00000000 00000000 00000000 00000000 00000000 ................................ 000160
00000000 00000000 00000000 00000000 00000000 00000000 00000000 00000000 ................................ 000180
00000000 00000000 00000000 00000000 00000000 00000000 00000000 00000000 ................................ 0001A0
00000000 00000000 00000000 00000000 00000000 00000000 00000000 00000000 ................................ 0001C0
00000000 00000000 00000000 00000000 00000000 00000000 00000000 00000000 ................................ 0001E0
```

```
Dump of file SATURN:[PCCOMMON.DUMP.DLL]GRTAB.TMP;1 on 18-APR-1990 10:46:14.73
File ID (690,16,0)   End of file block 32 / Allocated 32

Virtual block number 1 (00000001), 512 (0200) bytes

 00000000 00000040 00000000 000000B8 0000FFFF 00000004 00000020 00125A4D MZ.. ............|.......a....... 000000
 00000080 00000000 00000000 00000000 00000000 00000000 00000000 00000000 ................................ 000020
 6F6E6E61 63206U61 72676F72 70207369 685421CD 4C01B821 CD098400 0EBA1F0E ..o..Ç.el|.LèlThis program canno 000040
 00000000 00000024 0A0D0D2E 65646F6D 20534F44 206E6920 6E757220 65622074 t be run in DOS mode....$....... 000060
 00020005 00000000 00020000 00000400 00048009 E3AA0AC9 0007009C 0505454E NE......è.`D.................... 000080
 00000000 00000000 00010000 00040000 00000123 00750071 00680068 00400030 0.a.h.h.q.u.#................... 0000A0
 3F600F21 0A58033B 00480F00 00480335 00110F00 00110332 30B60F00 30B60016 ..ÑO..ÑO2.......5.H...H.;.X.!.'? 0000C0
 03534C4C 4143534F 44080000 0A000100 00006261 74726705 04BF0E21 00000000 ....!.e..grtab.........DOSCALLS. 0000E0
 7C030101 4E465449 4E495445 534C4D44 0C544F4C 5354494E 494C4D44 086C6064 dml.DMLINITSLOT.DMLSETINITFN...| 000100
 74206174 6560206C 65646F6D 20524720 726F6620 656C6966 204C4C44 21000030 0..!DLL file for GR model meta t 000120
 00000000 00000000 00000000 00000001 42415459 52455551 08000073 656C6261 ables...QUERYTAB................ 000140
 83FFFF00 009A0A58 681E006A 031E6800 28FE46C7 D88EFFFF B81E5657 000002C8 à...WV.¡...ÁüF±(.h..j..hX....... 000160
 0000005A 9A000068 1E5016FE 4680006A 006A006A 036A046A 026A0A58 681E08C4 á..hX.j.j.j.j.j.j..F±.P.h...Z... 000180
 681E0000 00789A00 05681E50 16FE468D 006A006A 006A026A 106A036A 0A58681E .hX.j.j.j.j.j.j..F±.P.h...x....h 0001A0
 0A58681E 00000096 9A000E68 1E5016FE 468D006A 006A006A 026A106A 046A0A58 X.j.j.j.j.j.j..F±.P.h........hX. 0001C0
 066A0A58 681E0000 00B49A00 17681E50 16FE468D 006A006A 006A026A 106A056A j.j.j.j.j.j..F±.P.h...Ç....hX.j. 0001E0

Dump of file SATURN:[PCCOMMON.DUMP.DLL]GRTAB.TMP;1 on 18-APR-1990 10:46:14.73
File ID (690,16,0)   End of file block 32 / Allocated 32

Virtual block nur'er 2 (00000002), 512 (0200) bytes

 106A076A 0A58681E 00000002 9A002168 1E5016FE 468D006A 006A006A 026A106A j.j.j.j.j..F±.P.hl..@....hX.j.j. 000000
 026A106A 086A0A58 681E0000 00F09A00 2A681E50 16FE468D 006A006A 006A026A j.j.j.j..F±.P.h*..Þ....hX.j.j.j. 000020
 006A026A 106A096A 0A58681E 0000010E 9A003668 1E5016FE 468D006A 006A006A j.j.j..F±.P.h6.......hX.j.j.j.j. 000040
 006A006A 026A106A 0A6A0A58 681E0000 012C9A00 41681E50 16FE468D 006A006A j.j..F±.P.hA..,.....hX.j.j.j.j.j. 000060
 006A006A 006A026A 106A086A 0A58681E 0000014A 9A004C68 1E5016FE 468D006A j..F±.P.hL..J....hX.j.j.j.j.j.j. 000080
 468D006A 006A006A 026A106A 0C6A0A58 681E0000 01689A00 58681E50 16FE468D .F±.P.h[..h....hX.j.j.j.j.j.j..F 0000A0
 16FE468D 006A006A 006A026A 106A0D6A 0A58681E 00000186 9A006A68 1E5016FE ±.P.hj.......hX.j.j.j.j.j.j..F±. 0000C0
 1E5016FE 468D006A 006A006A 026A106A 0E6A0A58 681E0000 01A49A00 75681E50 P.hu..Ê....hX.j.j.j.j.j.j..F±.P. 0000E0
 90681E50 16FE468D 006A006A 006A026A 106A0F6A 0A58681E 000001C2 9A008168 h...ó....hX.j.j.j.j.j.j..F±.P.h. 000100
 9A009E68 1E5016FE 468D006A 006A006A 026A106A 106A0A58 681E0000 01E09A00 ..Å....hX.j.j.j.j.j.j..F±.P.h... 000120
 021C9A00 AB681E50 16FE468D 006A006A 006A026A 106A116A 0A58681E 000001FE ±....hX.j.j.j.j.j.j..F±.P.h¨.... 000140
 0000023A 9A00B968 1E5016FE 468D006A 006A006A 026A106A 126A0A58 681E0000 ...hX.j.j.j.j.j.j..F±.P.h¿..:... 000160
 681E0000 02589A00 C6681E50 16FE468D 006A006A 006A026A 106A136A 0A58681E .hX.j.j.j.j.j.j..F±.P.hó..X....h 000180
 B8065EC4 0000FFFF 9A00D068 1E5016FE 468D006A 006A006A 026A106A 146A0A58 X.j.j.j.j.j.j..F±.P.hÅ......á^.¡ 0001A0
 065EC40A 478926FE 4688065E C4001408 47C72606 5EC4065F 8C260447 89260A58 X.&.G.&._.á^.&úG...á^..F±&.G.á^. 0001C0
 6A010A68 0028FE46 C7088E00 08881E56 57000002 C8CBC95F 5E1F0000 1847C726 &úG....^_èùà...WV.¡...ÁüF±(.h..j 0001E0

Dump of file SATURN:[PCCOMMON.DUMP.DLL]GRTAB.TMP;1 on 18-APR-1990 10:46:14.73
File ID (690,16,0)   End of file block 32 / Allocated 32

Virtual block number 3 (00000003), 512 (0200) bytes

 FE468D00 6A006A00 6A046A09 6A026A00 76681E08 C483001D 00009A0D 76681E00 ..hv.......á..hv.j.j.j.j.j.j..F± 000000
 5016FE46 8D006A00 6A006A01 6A026A03 6A007668 1E000002 E59A000C 681E5016 .P.hÉ..|....hv.j.j.j.j.j.j..F±.P 000020
 681E5016 FE468D00 6A006A00 6A036A04 6A046A00 76681E00 0003039A 00E6681E .h|.......hv.j.j.j.j.j.j..F±.P.h 000040
 00F3681E 5016FE46 8D006A00 6A006A03 6A046A05 6A007668 1E000003 219A00ED Ú..|....hv.j.j.j.j.j.j..F±.P.hµ. 000060
 3C9A0102 681E5016 FE468D00 6A006A00 6A036A04 6A066A0D 76681E00 00033F9A .?....hv.j.j.j.j.j.j..F±.P.h...< 000080
 FE468806 5EC40006 0847C726 065EC406 5F8C2604 4789260D 7688065E C4000000 ...á^.¡v.&.G.&._.á^.&úG...á^..F± 0000A0
 46C7D88E 0293881E 56570000 02C8CBC9 5F5E1F00 001847C7 26065EC4 0A478926 &.G.á^.&úG....^_èùà...WV.¡...ÁüF 0000C0
 006A016A 026A026A 0E80681E 08C48302 A800009A 0E80681E 006A02AC 680028FE ±(.h¯.j..h.....¯..á..h..j.j.j.j. 0000E0
 006A006A 046A096A 036A0E80 681E0000 03CC9A01 0F681E50 16FE468D 006A006A j.j..F±.P.h...ä....h..j.j.j.j.j. 000100
 006A006A 006A016A 026A046A 0E80681E 000003EA 9A011968 1E5016FE 468D006A j..F±.P.h...õ....h..j.j.j.j.j.j. 000120
 468D006A 006A006A 016A026A 056A0E80 681E0000 04089A01 22681E50 16FE468D .F±.P.h"........h..j.j.j.j.j.j..F 000140
 16FE468D 006A006A 006A016A 026A066A 0E80681E 00000426 9A012C68 1E5016FE ±.P.h,..&....h..j.j.j.j.j.j..F±. 000160
 1E5016FE 468D006A 006A006A 016A046A 076A0E80 681E0000 04449A01 31681E50 P.h1..D....h..j.j.j.j.j.j..F±.P. 000180
 4B681E50 16FE468D 006A006A 006A016A 026A086A 0E80681E 00000462 9A013A68 h:..b....h..j.j.j.j.j.j..F±.P.hK 0001A0
 9A015768 1E5016FE 468D006A 006A006A 016A026A 096A0E80 681E0000 04809A01 .......h..j.j.j.j.j.j..F±.P.hW.. 0001C0
 04BC9A01 60681E50 16FE468D 006A006A 006A016A 026A0A6A 0E80681E 000002C7 ú....h..j.j.j.j.j.j..F±.P.h`..¥. 0001E0
```

```
Dump of file SATURN:[PCCOMMON.DUMP.DLL]GRTAB.TMP;1 on 18-APR-1990 10:46:14.73
File ID (690,16,0)   End of file block 32 / Allocated 32

Virtual block number 4 (00000004), 512 (0200) bytes

 0000040A 9A016D6A 1E5016FE 468D006A 006A006A 016A046A 086A0E80 681E0000 ...h..j.j.j.j.j..F±.P.hm..Ö... 000000
 681E0000 04F89A01 79681E50 16FE468D 006A006A 006A016A 026A0C6A 0E80681E .h..j.j.j.j.j.j..F±.P.hy..%....h 000020
 0E80681E 00000516 9A018568 1E5016FE 468D006A 006A006A 016A046A 006A0E80 ..j.j.j.j.j.j..F±.P.h........h.. 000040
 0F6A0E80 681E0000 05349A01 91681E50 16FE468D 006A006A 006A046A 096A0E6A j.j.j.j.j.j..F±.P.h...4....h..j. 000060
 046A106A 0E80681E 00000552 9A019E68 1E5016FE 468D006A 006A006A 046A096A j.j.j.j.j..F±.P.h...R....h..j.j. 000080
 036A046A 116A0E80 681E0000 05709A01 A7681E50 16FE468D 006A006A 006A036A j.j.j.j..F±.P.hI..p....h..j.j.j. 0000A0
 8C260447 89260E80 B8065EC4 000003AE 9A01AD68 1E5016FE 468D006A 006A006A j.j.j..F±.P.hÜ..Ö...á^.¡..&.G.&. 0000C0
 5E1F0000 1847C726 065EC40A 478926FE 468B065E C4001108 47C72606 5EC4065F _.á^.&úG...á^..F±&.G.á^.&úG....^ 0000E0
 00009A11 2C681E00 6A01C868 0028FE46 C7D88E03 7A881E56 57000002 C8C8C95F ¯èùà...WV.¡z..ÄúF±(.hà.j..h,.... 000100
 FD9A0184 681E5016 FE468D00 6A006A00 6A016A04 6A026A11 2C681E08 C483038F ....á..h,.j.j.j.j.j.j..F±.P.hÇ..» 000120
 0006189A 01C1681E 5016FE46 8D006A00 6A006A04 6A096A03 6A112C68 1E000005 ....h,.j.j.j.j.j.j..F±.P.hé..... 000140
 1E000006 399A01C6 681E5016 FE468D00 6A006A00 6A036A04 6A046A11 2C681E00 ..h,.j.j.j.j.j.j..F±.P.hó..9.... 000160
 2C681E00 0006579A 01C8681E 5016FE46 8D006A00 6A006A03 6A046A05 6A112C68 h,.j.j.j.j.j.j..F±.P.hù..W....h, 000180
 6A112C68 1E000006 759A01D3 681E5016 FE468D00 6A006A00 6A036A04 6A066A11 .j.j.j.j.j.j..F±.P.hÆ..u....h,.j 0001A0
 6A086A11 2C681E00 0006939A 01D9681E 5016FE46 8D006A00 6A006A02 6A106A07 .j.j.j.j.j..F±.P.h)........h,.j.j 0001C0
 6A026A09 6A112C68 1E000006 819A01E1 681E5016 FE468D00 6A006A00 6A046A09 .j.j.j.j..F±.P.hÅ..Ÿ....h,.j.j.j 0001E0

Dump of file SATURN:[PCCOMMON.DUMP.DLL]GRTAB.TMP;1 on 18-APR-1990 10:46:14.73
File ID (690,16,0)   End of file block 32 / Allocated 32

Virtual block number 5 (00000005), 512 (0200) bytes

 6A046A09 6A0A6A11 2C681E00 0006CF9A 01EA681E 5016FE46 8D006A00 6A006A01 .j.j.j..F±.P.hõ..ü....h,.j.j.j.j 000000
 5F8C2604 47892611 2C88065E C4000004 9E9A01F7 681E5016 FE468D00 6A006A00 .j.j..F±.P.h%......á^.¡,.&.G.&._ 000020
 065EC400 120C47C7 26065EC4 0A478926 FE468B06 5EC40008 0847C726 065EC406 .á^.&úG...á^..F±&.G.á^.&úG...á^.¯ 000040
 0002C8C8 C95F5E1F 00001847 C726065E C4000310 47C72606 5EC40008 0E47C726 &úG...á^.&úG...á^.&úG....^_èùà.. 000060
 1E08C483 05C00000 9A12F468 1E006A01 C8680028 FE46C7D8 8E05A888 1E565700 .WV.¡¨..ÄúF±(.hà.j..h¶....Ã..á.. 000080
 F4681E00 0007779A 01FF681E 5016FE46 8D006A00 6A006A01 6A046A02 6A12F468 h¶.j.j.j.j.j.j..F±.P.h...w....h¶ 0000A0
 6A12F468 1E000007 959A020C 681E5016 FE468D00 6A006A00 6A046A09 6A036A12 .j.j.j.j.j.j..F±.P.h........h¶.j 0000C0
 6A056A12 F4681E00 0007839A 0211681E 5016FE46 8D006A00 6A006A03 6A046A04 .j.j.j.j.j..F±.P.h...°....h¶.j.j 0000E0
 6A046A06 6A12F468 1E000007 D19A0216 681E5016 FE468D00 6A006A00 6A016A04 .j.j.j.j..F±.P.h...Ñ....h¶.j.j.j 000100
 6A026A10 6A076A12 F4681E00 0007EF9A 0220681E 5016FE46 8D006A00 6A006A01 .j.j.j..F±.P.h ..ÿ....h¶.j.j.j.j 000120
 6A006A02 6A106A08 6A12F468 1E000008 009A022A 681E5016 FE468D00 6A006A00 .j.j..F±.P.h*.......h¶.j.j.j.j.j 000140
 6A006A00 6A046A09 6A0A6A12 F4681E00 0008289A 0234681E 5016FE46 8D006A00 .j..F±.P.h4..+....h¶.j.j.j.j.j.j 000160
 065EC406 5F8C2604 47892612 F488065E C4000005 DF9A023C 681E5016 FE468D00 ..F±.P.h<..Ö...á^.¡¶.&.G.&._.á^. 000180
 0E47C726 065EC400 130C47C7 26065EC4 0A478926 FE468B06 5EC40008 0847C726 &úG...á^..F±&.G.á^.&úG...á^¯&úG. 0001A0
 1E565700 0002C8C8 C95F5E1F 00001847 C726065E C4000310 47C72606 5EC40008 ..á^.&úG...á^.&úG....^_èùà...WV. 0001C0
 6A148C68 1E08C483 073A0000 9A148C68 1E006A01 C8680028 FE46C7D8 8E072588 ¡%..ÄúF±(.hà.j..h¥....Ξ..á..h¥.j 0001E0

Dump of file SATURN:[PCCOMMON.DUMP.DLL]GRTAB.TMP;1 on 18-APR-1990 10: 5:14.73
File ID (690,16,0)   End of file block 32 / Allocated 32

Virtual block number 6 (00000006), 512 (0200) bytes

 6A036A14 8C681E00 0008039A 0245681E 5016FE46 8D006A00 6A006A01 6A046A02 .j.j.j.j.j..F±.P.hE..Æ....h¥.j.j 000000
 6A046A04 6A148C68 1E000008 F19A0252 681E5016 FE468D00 6A006A00 6A046A09 .j.j.j.j..F±.P.hR..þ....h¥.j.j.j 000020
 6A026A10 6A056A14 8C681E00 00090F9A 0257681E 5016FE46 8D006A00 6A006A03 .j.j.j..F±.P.hW.......h¥.j.j.j.j 000040
 6A006A03 6A046A06 6A148C68 1E000009 2D9A025C 681E5016 FE468D00 6A006A00 .j.j..F±.P.h\..-....h¥.j.j.j.j.j 000060
 6A006A00 6A046A07 6A076A14 8C681E00 0009489A 0266681E 5016FE46 8D006A00 .j..F±.P.hf..K....h¥.j.j.j.j.j.j 000080
 8D006A00 6A006A04 6A096A08 6A148C68 1E000009 699A0271 681E5016 FE468D00 ..F±.P.hq..i....h¥.j.j.j.j.j.j.. 0000A0
 FE468D00 6A006A00 6A046A09 6A096A14 8C681E00 0009879A 0277681E 5016FE46 F±.P.hw.......h¥.j.j.j.j.j.j..F± 0000C0
 5016FE46 8D006A00 6A006A04 6A096A0A 6A148C68 1E000009 A59A0280 681E5016 .P.h...Ë....h¥.j.j.j.j.j.j..F±.P 0000E0
 00080847 C726065E C4065F8C 26044789 26148C88 065EC400 0007599A 0289681E .h...Y...á^.¡¥.&.G.&._.á^.&úG... 000100
 26065EC4 00080E47 C726065E C400140C 47C72606 5EC40A47 8926FE46 88065EC4 á^..F±&.G.á^.&úG...á^¯&úG...á^.& 000120
 C7D88E08 81881E56 57000002 C8C8C95F 5E1F0000 1847C726 065EC400 031047C7 úG...á^.&úG....^_èùà...WV.¡...Äú 000140
 6A016A04 6A026A16 84681E08 C4830896 00009A16 84681E00 6A028668 0028FE46 F±(.h..j..h.......¯á..h..j.j.j.j 000160
 6A006A01 6A026A03 6A168468 1E00000A 4D9A0292 681E5016 FE468D00 6A006A00 .j.j..F±.P.h...M....h..j.j.j.j.j 000180
 6A006A00 6A016A02 6A046A16 84681E00 000A689A 029A681E 5016FE46 8D006A00 .j..F±.P.h...k....h..j.j.j.j.j.j 0001A0
 8D006A00 6A006A01 6A026A05 6A168468 1E00000A 899A02A0 681E5016 FE468D00 ..F±.P.h........h..j.j.j.j.j.j.. 0001C0
 FE468D00 6A006A00 6A016A01 6A066A16 84681E00 000AA79A 02A9681E 5016FE46 F±.P.h`..Ī....h..j.j.j.j.j.j..F± 0001E0
```

```
Dump of file SATURN:[PCCOMMON.DUMP.DLL]GRTAB.TMP;1 on 18-APR-1990 10:46:14.73
File ID (690,16,0)   End of file block 32 / Allocated 32

Virtual block number 7 (00000007), 512 (0200) bytes

 5016FE46 8D006A00 6A006A04 6A216A07 6A168468 1E00000A C59A0280 681E5016 .P.h¯..é....h..j.j!j.j.j.j..Fž.P 000000
 681E5016 FE468D00 6A006A00 6A016A02 6A086A16 84681E00 000AE39A 0289681E .h¿..D....h..j.j.j.j.j.j..Fž.P.h 000020
 02CD681E 5016F.46 8D006A00 6A006A01 6A106A09 6A168468 1E000008 019A02C5 é.......h..j.j.j.j.j.j..Fž.P.hë. 000040
 309A02D5 681E5016 FE468D00 6A006A00 6A016A02 6A0A6A16 84681E00 00081F9A ......h..j.j.j.j.j.j..Fž.P.hÍ..= 000060
 0008589A 02D0681E 5016FE46 8D006A00 6A006A03 6A046A08 6A168468 1E000008 ....h..j.j.j.j.j.j..Fž.P.hÍ..[.. 000080
 1E000008 799A02EC 681E5016 FE468D00 6A006A00 6A036A04 6A0C6A16 84681E00 ..h..j.j.j.j.j.j..Fž.P.hì..y.... 0000A0
 84681E00 0008979A 02F1681E 5016FE46 8D006A00 6A006A03 6A046A0D 6A168468 h..j.j.j.j.j.j..Fž.P.hþ.......h. 0000C0
 6A168468 1E000008 859A02FB 681E5016 FE468D00 6A006A00 6A036A04 6A0E6A16 .j.j.j.j.j.j..Fž.P.h«..ç....h..j 0000E0
 6A106A16 84681E00 0008D39A 0301681E 5016FE46 8D006A00 6A006A02 6A106A0F .j.j.j.j.j..Fž.P.h...Ó....h..j.j 000100
 47892616 84B8065E C4000008 859A0308 681E5016 FE468D00 6A006A00 6A026A10 .j.j.j.j..Fž.P.h...ç...á^.j..&.G 000120
 080C47C7 26065EC4 0A478926 FE468806 5EC40010 0847C726 065EC406 5F8C2604 .&._.á^.&úG...á^..Fž&.G.á^.&úG.. 000140
 C95F5E1F 00001847 C726065E C4000710 47C72606 5EC4000D 0E47C726 065EC400 .á^¯&úG...á^.&úG...á^.&úG....^_è 000160
 0A100000 9A190A68 1E006A06 16680028 FE46C708 8E09F888 1E565700 0002C8C8 ùà...WV.j«..ÁúFž(.h..j..h....... 000180
 000A2F9A 030E681E 5016FE46 8D006A00 6A006A04 6A216A02 6A190A68 1E08C483 .á..h..j.j!j.j.j.j..Fž.P.h.../.. 0001A0
 1E00000C 999A0313 681E5016 FE468D00 6A006A00 6A036A04 6A036A19 0A681E00 ..h..j.j.j.j.j.j..Fž.P.h........ 0001C0
 0A681E00 000C879A 0318681E 5016FE46 8D006A00 6A006A01 6A026A04 6A190A68 h..j.j.j.j.j.j..Fž.P.h...ñ....h. 0001E0

Dump of file SATURN:[PCCOMMON.DUMP.DLL]GRTAB.TMP;1 on 18-APR-1990 10:46:14.73
File ID (690,16,0)   End of file block 32 / Allocated 32

Virtual block number 8 (00000008), 512 (0200) bytes

 6A190A68 1E00000C D59A031F 681E5016 FE468D00 6A006A00 6A016A02 6A056A19 .j.j.j.j.j.j..Fž.P.h...Í....h..j 000000
 6A076A19 0A681E00 000CF39A 0326681E 5016FE46 8D006A00 6A006A01 6A026A06 .j.j.j.j.j..Fž.P.h&..µ....h..j.j 000020
 6A106A08 6A190A68 1E000000 119A0320 681E5016 FE468D00 6A006A00 6A016A10 .j.j.j.j..Fž.P.h-.......h..j.j.j 000040
 6A026A10 6A096A19 0A681E00 0000D2F9A 0336681E 5016FE46 8D006A00 6A006A01 .j.j.j..Fž.P.h6../....h..j.j.j.j 000060
 6A006A02 6A106A0A 6A190A68 1E000000 409A0340 681E5016 FE468D00 6A006A00 .j.j..Fž.P.h@..M....h..j.j.j.j.j 000080
 6A006A00 6A036A04 6A086A19 0A681E00 0000689A 0348681E 5016FE46 8D006A00 .j..Fž.P.hH..k....h..j.j.j.j.j.j 0000A0
 8D006A00 6A006A02 6A106A0C 6A190A68 1E00000D 899A0353 681E5016 FE468D00 ..Fž.P.hS.......h..j.j.j.j.j.j.. 0000C0
 FE468D00 6A006A00 6A026A10 6A006A19 0A681E00 0000A79A 035F681E 5016FE46 Fž.P.h_..Ì....h..j.j.j.j.j.j..Fž 0000E0
 5016FE46 8D006A00 6A006A02 6A106A0F 6A190A68 1E00000D C59A036C 681E5016 .P.hl.¯é....h..j.j.j.j.j.j..Fž.P 000100
 681E5016 FE468D00 6A006A00 6A036A04 6A106A19 0A681E00 0000E39A 0375681E .hu..D....h..j.j.j.j.j.j..Fž.P.h 000120
 0382681E 5016FE46 8D006A00 6A006A03 6A046A0E 6A190A68 1E00000E 019A0378 (.......h..j.j.j.j.j.j..Fž.P.h.. 000140
 3D9A0388 681E5016 FE468D00 6A006A00 6A026A10 6A116A19 0A681E00 000E1F9A ......h..j.j.j.j.j.j..Fž.P.h...= 000160
 000E589A 0396681E 5016FE46 8D006A00 6A006A02 6A106A12 6A190A68 1E00000E ....h..j.j.j.j.j.j..Fž.P.h...[.. 000180
 1E00000E 799A03A2 681E5016 FE468D00 6A006A00 6A026A10 6A136A19 0A681E00 ..h..j.j.j.j.j.j..Fž.P.hÅ..y.... 0001A0
 0A681E00 000E979A 03A8681E 5016FE46 8D006A00 6A006A01 6A046A14 6A190A68 h..j.j.j.j.j.j..Fž.P.h´.......h. 0001C0
 6A190A68 1E00000E 859A0385 681E5016 FE468D00 6A006A00 6A046A09 6A156A19 .j.j.j.j.j.j..Fž.P.hç..ç....h..j 0001E0

Dump of file SATURN:[PCCOMMON.DUMP.DLL]GRTAB.TMP;1 on 18-APR-1990 10:46:14.73
File ID (690,16,0)   End of file block 32 / Allocated 32

Virtual block number 9 (00000009), 512 (0200) bytes

 68176A19 0A681E00 000ED49A 03BC681E 5016FE46 8D006A00 6A006A04 6A096A16 .j.j.j.j.j..Fž.P.hÔ..å....h..j.h 000000
 096A186A 190A681E 00000EF2 9A03C568 1E5016FE 468D006A 006A006A 046A0100 ..j.j.j.j..Fž.P.hé..·....h..j.j. 000020
 046A096A 196A190A 681E0000 0F109A03 CD681E50 16FE468D 006A006A 006A046A j.j.j.j..Fž.P.hë.......h..j.j.j. 000040
 006A016A 026A1A6A 190A681E 00000F2E 9A030668 1E5016FE 468D006A 006A006A j.j.j..Fž.P.h•.......h..j.j.j.j. 000060
 006A006A 016A046A 1B6A190A 681E0000 0F4C9A03 E0681E50 16FE468D 006A006A j.j..Fž.P.hÅ..L....h..j.j.j.j.j. 000080
 006A006A 006A016A 046A1C6A 190A681E 00000F6A 9A03E668 1E5016FE 468D006A j..Fž.P.hl..j....h..j.j.j.j.j.j. 0000A0
 468D006A 006A006A 016A046A 1D6A190A 681E0000 0F889A03 F2681E50 16FE468D .Fž.P.h·.......h..j.j.j.j.j.j..F 0000C0
 16FE468D 006A006A 006A016A 026A1E6A 190A681E 00000FA6 9A03FE68 1E5016FE ž.P.hž..Ì....h..j.j.j.j.j.j..Fž. 0000E0
 1E5016FE 468D006A 006A006A 016A046A 1F6A190A 681E0000 0FC49A04 09681E50 P.h...á....h..j.j.j.j.j.j..Fž.P. 000100
 1A681E50 16FE468D 006A006A 006A016A 046A206A 190A681E 00000FE2 9A041068 h...â....h..j j.j.j.j.j..Fž.P.h. 000120
 9A042368 1E5016FE 468D006A 006A006A 016A046A 216A190A 681E0000 10009A04 .......h..j!j.j.j.j.j..Fž.P.h#.. 000140
 103C9A04 32681E50 16FE468D 006A006A 006A016A 026A226A 190A681E 00000C50 ]....h..j"j.j.j.j.j..Fž.P.h2..<. 000160
 0000105A 9A044168 1E5016FE 468D006A 006A006A 016A046A 236A190A 681E0000 ...h..j#j.j.j.j.j..Fž.P.hA..Z... 000180
 681E0000 10789A04 51681E50 16FE468D 006A006A 006A016A 026A246A 190A681E .h..j$j.j.j.j.j..Fž.P.hQ..x....h 0001A0
 190A681E 00001096 9A045E68 1E5016FE 468D006A 006A006A 016A026A 256A190A ..j%j.j.j.j.j..Fž.P.h^.......h.. 0001C0
 276A190A 681E0000 10B49A04 68681E50 16FE468D 006A006A 006A016A 026A266A j&j.j.j.j.j..Fž.P.hk..Ç....h..j' 0001E0
```

```
Dump of file SATURN:[PCCOMMON.DUMP.DLL]GRTAB.TMP;1 on 18-APR-1990 10:46:14.73
File ID (690,16,0)   End of file block 32 / Allocated 32

Virtual block number 10 (0000000A), 512 (0200) bytes

 026A286A 190A681E 00001002 9A047D68 1E5016FE 468D006A 006A006A 016A046A j.j.j.j.j..F±.P.h)..θ....h..j(j. 000000
 04478926 190A8606 5EC40000 0C7B9A04 8C681E50 16FE468D 006A006A 006A016A j.j.j.j..F±.P.h...(...ó^.¡..&.G. 000020
 00050C47 C726065E C40A4789 26FE468B 065EC400 280847C7 26065EC4 065F8C26 &._.ó^.&úG.(.ó^..F±&.G.ó^.&úG... 000040
 CBC95F5E 1F000018 47C72606 5EC40002 1047C726 065EC400 0E0E47C7 26065EC4 ó^¯&úG...ó^.&úG...ó^.&úG....^_èü 000060
 830C3E00 009A1F20 681E006A 008E6800 28FE46C7 D88E0C29 881E5657 000002C8 à...WV.¡)..ÁúF±(.hƒ.j..h ....>.. 000080
 0000117A 9A049568 1E5016FE 4680006A 006A006A 046A096A 006A1F20 681E08C4 ó..h .j.j.j.j.j.j..F±.P.h...z... 0000A0
 681E0000 101E9A04 9C681E50 16FE468D 006A006A 006A016A 026A016A 1F20681E .h .j.j.j.j.j.j..F±.P.h........h 0000C0
 20681E00 0011B79A 04A5681E 5016FE46 8D006A00 6A006A04 6A00FF68 026A1F20  .j.h..j.j.j.j..F±.P.hE..ñ....h  0000E0
 6A1F2068 1E000011 059A04AD 681E5016 FE468D00 6A006A00 6A036A04 6A036A1F .j.j.j.j.j.j..F±.P.hÙ..¡....h .j 000100
 261F2088 065EC400 00115C9A 04B8681E 5016FE46 8D006A00 6A006A03 6A046A04 .j.j.j.j.j..F±.P.h¡..\...ó^.¡ .& 000120
 47C72606 5EC40A47 8926FE46 88065EC4 00040847 C726065E C4065F8C 26044789 .G.&._.ó^.&úG...ó^..F±&.G.ó^.&úG 000140
 681E006A 031E6800 28FE46C7 D88E1128 881E5657 000002C8 CBC95F5E 1F000018 ....^¯èüà...WV.¡(..ÁúF±(.h..j..h 000160
 1E5016FE 468D006A 006A006A 016A046A 026A1FDE 681E08C4 83113D00 009A1FDE 8....=..ó..h8.j.j.j.j.j.j..F±.P. 000180
 CA681E50 16FE468D 006A006A 006A016A 016A036A 1FDE681E 00001262 9A04C268 hö..b....h8.j.j.j.j.j.j..F±.P.hò 0001A0
 9A04D568 1E5016FE 468D006A 006A006A 046A216A 046A1FDE 681E0000 12809A04 .......h8.j.j!j.j.j.j..F±.P.hí.. 0001C0
 8D9A040A 681E5016 FE468D00 6A006A00 6A046A01 0168056A 1FDE681E 0000129F .....h8.j.h..j.j.j.j..F±.P.hÖ..§ 0001E0

Dump of file SATURN:[PCCOMMON.DUMP.DLL]GRTAB.TMP;1 on 18-APR-1990 10:46:14.73
File ID (690,16,0)   End of file block 32 / Allocated 32

Virtual block number 11 (0000000B), 512 (0200) bytes

 0012089A 040F681E 5016FE46 8D006A00 6A006A01 6A026A06 6A1FDE68 1E000012 ....h8.j.j.j.j.j.j..F±.P.hÖ..Ù.. 000000
 1E000012 F99A04E9 681E5016 FE468D00 6A006A00 6A016A02 6A076A1F DE681E00 ..h8.j.j.j.j.j.j..F±.P.hö..ª.... 000020
 DE681E00 0013179A 04EF681E 5016FE46 8D006A00 6A006A01 6A026A08 6A1FDE68 h8.j.j.j.j.j.j..F±.P.hÿ.......h8 000040
 6A1FDE68 1E000013 359A04F8 681E5016 FE468D00 6A006A00 6A036A04 6A096A1F .j.j.j.j.j.j..F±.P.h%..5....h8.j 000060
 6A086A1F DE681E00 0013539A 0500681E 5016FE46 8D006A00 6A006A02 6A106A0A .j.j.j.j.j..F±.P.h...S....h8.j.j 000080
 6A046A0C 6A1FDE68 1E000013 719A0508 681E5016 FE468D00 6A006A00 6A036A04 .j.j.j.j..F±.P.h...q....h8.j.j.j 0000A0
 6A036A04 6A006A1F DE681E00 00138F9A 0510681E 5016FE46 8D006A00 6A006A03 .j.j.j..F±.P.h........h8.j.j.j.j 0000C0
 6A006A02 6A106A0E 6A1FDE68 1E000013 AD9A0518 681E5016 FE468D00 6A006A00 .j.j..F±.P.h...Ù....h8.j.j.j.j.j 0000E0
 6A006A00 6A026A10 6A0F6A1F DE681E00 0013C89A 051F681E 5016FE46 8D006A00 .j..F±.P.h...ù....h8.j.j.j.j.j.j 000100
 8D006A00 6A006A03 6A046A10 6A1FDE68 1E000013 E99A0525 681E5016 FE468D00 ..F±.P.h%..Ö....h8.j.j.j.j.j.j.. 000120
 FE468D00 6A006A00 6A026A10 6A116A1F DE681E00 0014079A 0531681E 5016FE46 F±.P.h1.......h8.j.j.j.j.j.j..F± 000140
 5016FE46 8D006A00 6A006A02 6A106A12 6A1FDE68 1E000014 259A0536 681E5016 .P.h6..%....h8.j.j.j.j.j.j..F±.P 000160
 681E5016 FE468D00 6A006A00 6A016A01 6A136A1F DE681E00 0014439A 053C681E .h<..C....h8.j.j.j.j.j.j..F±.P.h 000180
 054F681E 5016FE46 8D006A00 6A006A01 6A016A14 6A1FDE68 1E000014 619A0541 A..a....h8.j.j.j.j.j.j..F±.P.hO. 0001A0
 88065EC4 00140847 C726065E C4065F8C 26044789 261FDE88 065EC400 0011999A .....ó^.¡8.&.G.&._.ó^.&úG...ó^.. 0001C0
 041047C7 26065EC4 000C0E47 C726065E C400060C 47C72606 5EC40A47 8926FE46 F±&.G.ó^.&úG...ó^¯&úG...ó^.&úG.. 0001E0

Dump of file SATURN:[PCCOMMON.DUMP.DLL]GRTAB.TMP;1 on 18-APR-1990 10:46:14.73
File ID (690,16,0)   End of file block 32 / Allocated 32

Virtual block number 12 (0000000C), 512 (0200) bytes

 0028FE46 C7088E12 10881E56 57000002 C8CBC95F 5E1F0000 1847C726 065EC400 .ó^.&úG....^_èüà...WV.¡...ÁúF±(. 000000
 6A006A00 6A016A04 6A026A22 FC681E08 C4831225 00009A22 FC681E00 6A013068 h0.j..h="...%..ó..h="j.j.j.j.j.j 000020
 8D006A00 6A006A04 6A136A03 6A22FC68 1E000015 099A055E 681E5016 FE468D00 ..F±.P.h^.......h="j.j.j.j.j.j.. 000040
 FE468D00 6A006A00 6A016A02 6A046A22 FC681E00 0015279A 0566681E 5016FE46 F±.P.hf..'....h="j.j.j.j.j.j..F± 000060
 5016FE46 8D006A00 6A006A01 6A026A05 6A22FC68 1E000015 459A056B 681E5016 .P.hk..E....h="j.j.j.j.j.j..F±.P 000080
 681E5016 FE468D00 6A006A00 6A036A04 6A066A22 FC681E00 0015639A 0571681E .hq..c....h="j.j.j.j.j.j..F±.P.h 0000A0
 0580681E 5016FE46 8D006A00 6A006A03 6A046A07 6A22FC68 1E000015 819A0576 v.......h="j.j.j.j.j.j..F±.P.h.. 0000C0
 88065EC4 0007084; C726065E C4065F8C 26044789 2622FC88 065EC400 0012449A .D...ó^.¡="&.G.&._.ó^.&úG...ó^.. 0000E0
 D88E14B7 881E565; 000002C8 C8C95F5E 1F000018 47C72606 5EC40A47 8926FE46 F±&.G.ó^.&úG....^¯èüà...WV.¡ñ..Ä 000100
 016A046A 026A242C 681E08C4 8314CC00 009A242C 681E006A 017C6800 28FE46C7 úF±(.h|.j..h,$...ã..ó..h,$j.j.j. 000120
 006A016A 026A036A 242C681E 0000160E 9A058A68 1E5016FE 468D006A 006A006A j.j.j..F±.P.h.........h,$j.j.j.j. 000140
 6A006A04 6A010068 046A242C 681E0000 16209A05 92681E50 16FE468D 006A006A j.j..F±.P.h...-....h,$j.h..j.j.j 000160
 6A006A00 6A046A13 6A056A24 2C681E00 0016489A 0598681E 5016FE46 8D006A00 .j..F±.P.h...K....h,$j.j.j.j.j.j 000180
 8D006A00 6A006A03 6A046A06 6A242C68 1E000016 699A059D 681E5016 FE468D00 ..F±.P.h...i....h,$j.j.j.j.j.j.. 0001A0
 FE468D00 6A006A00 6A036A04 6A076A24 2C681E00 0016879A 05A2681E 5016FE46 F±.P.hÅ.......h,$j.j.j.j.j.j..F± 0001C0
 5016FE46 8D006A00 6A006A02 6A106A08 6A242C68 1E000016 A59A05AA 681E5016 .P.h¯..É....h,$j.j.j.j.j.j..F±.P 0001E0
```

Dump of file SATURN:[PCCOMMON.DUMP.DLL]GRTAB.TMP;1 on 18-APR-1990 10:46:14.73
File ID (690,16,0)   End of file block 32 / Allocated 32

Virtual block number 13 (0000000D), 512 (0200) bytes

```
681E5016 FE468000 6A006A00 6A026A10 6A096A24 2C681E00 0016C39A 05AF681E .hÉ..ú....h,$j.j.j.j.j..F±.P.h 000000
5EC40009 0847C726 065EC406 5F8C2604 47892624 2C88065E C4000014 E89A0585 ç..Š...á^.¡,$&.G.&._.á^.&úG...á^ 000020
47C72606 5EC40006 0E47C726 065EC400 070C47C7 26065EC4 0A478926 FE468806 ..F±&.G.á^.&úG...á^¯&úG...á^.&úG 000040
FE46C7D8 8E158C88 1E565700 0002C8CB C95F5E1F 00001847 C726065E C4000510 ...á^.&úG....^_èùà...WV.¡¥..ÁúF± 000060
6A006A01 6A046A02 6A25A868 1E08C483 15D10000 9A25A868 1E006A01 7C680028 (.h|.j..h´%...Ĩ..á..h´%j.j.j.j.j 000080
6A006A00 6A016A02 6A036A25 A8681E00 0017689A 05C0681E 5016FE46 8D006A00 .j..F±.P.há..k....h´%j.j.j.j.j.j 0000A0
006A006A 006A046A 01006804 6A25A868 1E000017 8A9A05C8 681E5016 FE468000 ..F±.P.hà.......h´%j.h..j.j.j.j. 0000C0
4680006A 006A006A 016A026A 056A25A8 681E0000 17A89A05 CE681E50 16FE468D .F±.P.hö..´....h´%j.j.j.j.j.j..F 0000E0
16FE468D 006A006A 006A036A 046A066A 25A8681E 000017C6 9A05D968 1E5016FE ±.P.h)..ó....h´%j.j.j.j.j.j..F±. 000100
1E5016FE 4680006A 006A006A 036A046A 076A25A8 681E0000 17E49A05 DE681E50 P.h8..ð....h´%j.j.j.j.j.j..F±.P. 000120
EA681E50 16FE468D 006A006A 006A036A 046A086A 25A8681E 00001802 9A05E568 h|.......h´%j.j.j.j.j.j..F±.P.hõ 000140
9A05F268 1E5016FE 4680006A 006A006A 036A046A 096A25A8 681E0000 18209A05 .. ....h´%j.j.j.j.j.j..F±.P.h·.. 000160
4688065E C4000908 47C72606 5EC4065F 8C260447 892625A8 88065EC4 000015F0 Þ...á^.¡´%&.G.&._.á^.&úG...á^..F 000180
C7D88E17 19881E56 57000002 C8CBC95F 5E1F0000 1847C726 065EC40A 478926FE ±&.G.á^.&úG....^_èùà...WV.¡...Áú 0001A0
6A016A04 6A026A27 24681E08 C483172E 00009A27 24681E00 6A00E468 0028FE46 F±(.hð.j..h$'......á..h$'j.j.j.j 0001C0
6A006A03 6A046A03 6A272468 1E000018 AD9A05F9 681E5016 FE468D00 6A006A00 .j.j..F±.P.h'..Ù....h$'j.j.j.j.j 0001E0
```

Dump of file SATURN:[PCCOMMON.DUMP.DLL]GRTAB.TMP;1 on 18-APR-1990 10:46:14.73
File ID (690,16,0)   End of file block 32 / Allocated 32

Virtual block number 14 (0000000E), 512 (0200) bytes

```
6A006A00 6A036A04 6A046A27 24681E00 0018C89A 0601681E 5016FE46 8D006A00 .j..F±.P.h...ù....h$'j.j.j.j.j.j 000000
8D006A00 6A006A02 6A106A05 6A272468 1E000018 E99A060E 681E5016 FE468000 ..F±.P.h...Ò....h$'j.j.j.j.j.j.. 000020
C726065E C4065F8C 26044789 262724B8 065EC400 001740 9A 0613681E 5016FE46 F±.P.h...M...á^.¡$'&.G.&._.á^.&ú 000040
000002C8 CBC95F5E 1F000018 47C72606 5EC40A47 8926FE46 88065EC4 00050847 G...á^..F±&.G.á^.&úG....^_èùà... 000060
681E08C4 83187000 009A2808 681E006A 04E66800 28FE46C7 D88E185B 881E5657 WV.¡[..ÁúF±(.h|.j..h.(...p̄..á..h 000080
2808681E 00001976 9A061968 1E5016FE 4680006A 006A006A 046A216A 026A2808 .(j.j!j.j.j.j..F±.P.h...v....h.( 0000A0
046A2808 681E0000 19949A06 1E681E50 16FE468D 006A006A 006A016A 026A036A j.j.j.j.j.j..F±.P.h........h.(j. 0000C0
476A056A 2808681E 000019B2 9A062468 1E5016FE 4680006A 006A006A 016A026A j.j.j.j.j..F±.P.h$..ÿ....h.(j.jG 0000E0
036A046A 066A2808 681E0000 19009A06 28681E50 16FE468D 006A006A 006A046A j.j.j.j..F±.P.h+..Å....h.(j.j.j. 000100
006A036A 046A076A 2808681E 000019EE 9A063468 1E5016FE 4680006A 006A006A j.j.j..F±.P.h4..Ÿ....h.(j.j.j.j. 000120
006A006A 036A046A 086A2808 681E0000 1A0C9A06 39681E50 16FE468D 006A006A j.j..F±.P.h9.......h.(j.j.j.j.j. 000140
006A006A 006A026A 106A096A 2808681E 00001A2A 9A063F68 1E5016FE 4680006A j..F±.P.h?..*....h.(j.j.j.j.j.j. 000160
4680006A 006A006A 026A106A 0A6A2808 681E0000 1A489A06 43681E50 16FE468D .F±.P.hC..H....h.(j.j.j.j.j.j..F 000180
16FE468D 006A006A 006A036A 046A086A 2808681E 00001A66 9A064A68 1E5016FE ±.P.hJ..f....h.(j.j.j.j.j.j..F±. 0001A0
1E5016FE 4680006A 006A006A 026A106A 0C6A2808 681E0000 1A849A06 53681E50 P.hS.......h.(j.j.j.j.j.j..F±.P. 0001C0
65681E50 16FE46 › 006A006A 006A026A 106A0D6A 2808681E 00001AA2 9A065A68 hZ..Å....h.(j.j.j.j.j.j..F±.P.he 0001E0
```

Dump of file SATURN:[PCCOMMON.DUMP.DLL]GRTAB.TMP;1 on 18-APR-1990 10:46:14.73
File ID (690,16,0)   End of file block 32 / Allocated 32

Virtual block number 15 (0000000F), 512 (0200) bytes

```
9A067068 1E5016FE 4680006A 006A006A 026A106A 0E6A2808 681E0000 1AC09A06 ..à....h.(j.j.j.j.j.j..F±.P.hp.. 000000
1AFC9A06 7C681E50 16FE468D 006A006A 006A016A 046A0F6A 2808681E 00001ADE Þ....h.(j.j.j.j.j.j..F±.P.h|..•. 000020
00001B1B 9A068968 1E5016FE 4680006A 006A006A 046A136A 106A2808 681E0000 ...h.(j.j.j.j.j.j..F±.P.h....... 000040
1E00001B 399A0699 681E5016 FE468000 6A006A00 6A046A01 0068116A 2808681E .h.(j.h..j.j.j.j..F±.P.h...9.... 000060
08681E00 001B579A 06A1681E 5016FE46 8D006A00 6A006A01 6A026A12 6A280868 h.(j.j.j.j.j.j..F±.P.hÀ..W....h. 000080
6A280868 1E00001B 759A06A6 681E5016 FE468D00 6A006A00 6A016A02 6A136A28 (j.j.j.j.j.j..F±.P.h|..u....h.(j 0000A0
6A156A28 08681E00 001B939A 06AD681E 5016FE46 8D006A00 6A006A01 6A026A14 .j.j.j.j.j..F±.P.hÙ.......h.(j.j 0000C0
6A026A16 6A280868 1E00001B B19A0683 681E5016 FE468D00 6A006A00 6A016A02 .j.j.j.j..F±.P.h°..Ÿ....h.(j.j.j 0000E0
6A046A09 6A176A28 08681E00 001BCF9A 068E681E 5016FE46 8D006A00 6A006A01 .j.j.j..F±.P.h/..ü....h.(j.j.j.j 000100
6A006A01 6A026A1C 6A280868 1E00001B ED9A06CB 681E5016 FE468D00 6A006A00 .j.j..F±.P.hù..Ù....h.(j.j.j.j.j 000120
6A006A00 6A016A02 6A196A28 08681E00 001C089A 06D5681E 5016FE46 8D006A00 .j..F±.P.h|.......h.(j.j.j.j.j.j 000140
8D006A00 6A006A01 6A026A1A 6A280868 1E00001C 299A06E5 681E5016 FE468000 ..F±.P.h|..)....h.(j.j.j.j.j.j.. 000160
FE468D00 6A006A00 6A016A02 6A1B6A28 08681E00 001C479A 06F3681E 5016FE46 F±.P.hµ..G....h.(j.j.j.j.j.j..F± 000180
5016FE46 8D006A00 6A006A01 6A026A1C 6A280868 1E00001C 659A0702 681E5016 .P.h...e....h.(j.j.j.j.j.j..F±.P 0001A0
681E5016 FE468D00 6A006A00 6A016A04 6A1D6A28 08681E00 001C839A 070F681E .h........h.(j.j.j.j.j.j..F±.P.h 0001C0
071E681E 5016FE46 8D006A00 6A006A04 6A096A1E 6A280868 1E00001C A19A0716 ...À....h.(j.j.j.j.j.j..F±.P.h.. 0001E0
```

```
Dump of file SATURN:[PCCOMMON.DUMP.DLL]GRTAB.TMP;1 on 18-APR-1990 10:46:14.73
File ID (690,16,0)   End of file block 32 / Allocated 32

Virtual block number 16 (00000010), 512 (0200) bytes

 0D9A0726 681E5016 FE468000 6A006A00 6A046A09 6A1F6A28 08681E00 001C8F9A .¢....h.(j.j.j.j.j.j..F±.P.h&..Ï 000000
 00188F9A 072F681E 5016FE46 80006A00 6A006A01 6A016A20 6A280868 1E00001C ....h.(j j.j.j.j.j.j..F±.P.h/..... 000020
 8926FE46 88065EC4 00200847 C726065E C4065F8C 26044789 26280888 065EC400 .á^.¡.(&.G.&._.á^.&úG. .á^..F±&. 000040
 065EC400 021047C7 26065EC4 00080E47 C726065E C400090C 47C72606 5EC40A47 G.á^.&úG...á^¯&úG...á^.&úG...á^. 000060
 6A01C868 0028FE46 C7D88E19 24881E56 57000002 C8C8C95F 5E1F0000 1847C726 &úG....^_èùà...WV.¡$..ÄúF±(.hà.j 000080
 FE468000 6A006A00 6A046A21 6A026A2C EE681E08 C4831939 00009A2C EE681E00 ..hŸ,...9̄..á..hŸ,j.j!j.j.j.j..F± 0000A0
 5016FE46 80006A00 6A006A03 6A046A03 6A2CEE68 1E00001D 859A0737 681E5016 .P.h7.......hŸ,j.j.j.j.j.j..F±.P 0000C0
 681E5016 FE468000 5A006A00 6A016A02 6A046A2C EE681E00 001DA39A 073C681E .h<..È....hŸ,j.j.j.j.j.j..F±.P.h 0000E0
 0748681E 5016FE46 8D006A00 6A006A03 6A046A05 6A2CEE68 1E00001D C19A0741 A..è....hŸ,j.j.j.j.j.j..F±.P.hH. 000100
 FD9A074E 681E5016 FE468000 6A006A00 6A026A10 6A066A2C EE681E00 001D0F9A .Ô....hŸ,j.j.j.j.j.j..F±.P.hN..» 000120
 001E189A 0755681E 5016FE46 80006A00 6A006A02 6A106A07 6A2CEE68 1E00001D ....hŸ,j.j.j.j.j.j..F±.P.hU..... 000140
 1E00001E 399A0762 681E5016 FE468000 6A006A00 6A026A10 6A086A2C EE681E00 ..hŸ,j.j.j.j.j.j..F±.P.hb..9.... 000160
 EE681E00 001E579A 076F681E 5016FE46 80006A00 6A006A03 6A046A09 6A2CEE68 hŸ,j.j.j.j.j.j..F±.P.ho..W....hŸ 000180
 6A2CEE68 1E000019 589A0776 681E5016 FE468000 6A006A00 6A026A10 6A0A6A2C ,j.j.j.j.j.j..F±.P.hv..X....hŸ,j 0001A0
 262CEE88 065EC400 001D679A 0781681E 5016FE46 80006A00 6A006A02 6A106A08 .j.j.j.j.j..F±.P.h...g...á^.¡Ÿ,& 0001C0
 47C72606 5EC40A47 8926FE46 88065EC4 00080847 C726065E C4065F8C 26044789 .G.&._.á^.&úG...á^..F±&.G.á^.&úG 0001E0

Dump of file SATURN:[PCCOMMON.DUMP.DLL]GRTAB.TMP;1 on 18-APR-1990 10:46:14.73
File ID (690,16,0)   End of file block 32 / Allocated 32

Virtual block number 17 (00000011), 512 (0200) bytes

 5E1F0000 1847C726 065EC400 021047C7 26065EC4 00090E47 C726065E C4000A0C ...á^.&úG...á^.&úG...á^.&úG....^ 000000
 00009A2E 86681E00 6A034468 0028FE46 C7D88E1D 33881E56 57000002 C8C8C95F _èùà...WV.¡3..ÄúF±(.hD.j..hÑ.... 000020
 1D9A078D 681E5016 FE468000 6A006A00 6A046A21 6A026A2E 86681E08 C4831D48 Ñ..á..hÑ.j.j!j.j.j.j..F±.P.h.... 000040
 001F389A 0792681E 5016FE46 80006A00 6A006A03 6A046A03 6A2E8668 1E00001F ....hÑ.j.j.j.j.j.j..F±.P.h...;.. 000060
 1E00001F 599A0797 681E5016 FE468000 6A006A00 6A016A02 6A046A2E 86681E00 ..hÑ.j.j.j.j.j.j..F±.P.h...Y.... 000080
 86681E00 001F779A 079E681E 5016FE46 80006A00 6A006A03 6A046A05 6A2E8668 hÑ.j.j.j.j.j.j..F±.P.h...w....hÑ 0000A0
 6A2E8668 1E00001F 959A07A4 681E5016 FE468000 6A006A00 6A026A10 6A066A2E .j.j.j.j.j.j..F±.P.hÉ.......hÑ.j 0000C0
 6A086A2E 86681E00 001F839A 07A8681E 5016FE46 80006A00 6A006A03 6A046A07 .j.j.j.j.j..F±.P.h¨..°....hÑ.j.j 0000E0
 6A046A09 6A2E8668 1E00001F D19A07B7 681E5016 FE468000 6A006A00 6A026A10 .j.j.j.j..F±.P.hñ..Ì....hÑ.j.j.j 000100
 6A016A08 6A0A6A2E 86681E00 001FEF9A 07C4681E 5016FE46 80006A00 6A006A03 .j.j.j..F±.P.há..ÿ....hÑ.j.j.j.j 000120
 6A006A01 6A086A08 6A2E8668 1E000020 009A07C8 681E5016 FE468000 6A006A00 .j.j..F±.P.hù... ...hÑ.j.j.j.j.j 000140
 6A006A00 6A016A08 6A0C6A2E 86681E00 0020289A 07D4681E 5016FE46 80006A00 .j..F±.P.hå..+ ...hÑ.j.j.j.j.j.j 000160
 80006A00 6A006A01 6A086A00 6A2E8668 1E000020 499A07D0 681E5016 FE468000 ..F±.P.hï..I ...hÑ.j.j.j.j.j.j.. 000180
 FE468000 6A006A00 6A016A08 6A0E6A2E 86681E00 0020679A 07E6681E 5016FE46 F±.P.hì..g ...hÑ.j.j.j.j.j.j..F± 0001A0
 5016FE46 80006A00 6A006A01 6A086A0F 6A2E8668 1E000020 859A07EF 681E5016 .P.hÿ... ...hÑ.j.j.j.j.j.j..F±.P 0001C0
 681E5016 FE468000 6A006A00 6A016A02 6A106A2E 86681E00 0020A39A 07F8681E .h½..È ...hÑ.j.j.j.j.j.j..F±.P.h 0001E0

Dump of file SATURN:[PCCOMMON.DUMP.DLL]GRTAB.TMP;1 on 18-APR-1990 10:46:14.73
File ID (690,16,0)   End of file block 32 / Allocated 32

Virtual block number 18 (00000012), 512 (0200) bytes

 0808681E 5016FE46 80006A00 6A006A01 6A026A11 6A2E8668 1E000020 C19A0801 ...è ...hÑ.j.j.j.j.j.j..F±.P.h.. 000000
 FD9A080F 681E5016 FE468000 6A006A00 6A036A04 6A126A2E 86681E00 0020DF9A .Ô ...hÑ.j.j.j.j.j.j..F±.P.h...» 000020
 0021189A 0818681E 5016FE46 80006A00 6A006A03 6A046A13 6A2E8668 1E000020  ...hÑ.j.j.j.j.j.j..F±.P.h....!. 000040
 1E000021 399A0821 681E5016 FE468000 6A006A00 6A026A10 6A146A2E 86681E00 ..hÑ.j.j.j.j.j.j..F±.P.h!..9!... 000060
 065EC400 001E759A 082C681E 5016FE46 80006A00 6A006A02 6A106A15 6A2E8668 hÑ.j.j.j.j.j.j..F±.P.h,..u...á^. 000080
 5EC40A47 8926FE46 88065EC4 00150847 C726065E C4065F8C 26044789 262E8688 ¡Ñ.&.G.&._.á^.&úG...á^..F±&.G.á^ 0000A0
 1847C726 065EC400 021047C7 26065EC4 00090E47 C726065E C400080C 47C72606 .&úG...á^¯&úG...á^.&úG...á^.&úG. 0000C0
 FA681E00 6A020268 0028FE46 C7D88E1E CB881E56 57000002 C8C8C95F 5E1F0000 ...^_èùà...WV.¡ù..ÄúF±(.h@.j..h° 0000E0
 681E5016 FE468000 6A006A00 6A016A04 6A026A31 FA681E08 C4831EE0 00009A31 1...Ã..á..h°1j.j.j.j.j.j..F±.P.h 000100
 0840681E 5016FE46 800G5A00 6A006A04 6A096A03 6A31FA68 1E000021 E19A0838 8..Ãl...h°1j.j.j.j.j.j..F±.P.há. 000120
 1D9A0847 681E5016 FE468000 6A006A00 6A016A02 6A046A31 FA681E00 002¨¨F9A ..I...h°1j.j.j.j.j.j..F±.P.hG... 000140
 0022389A 0851681E 5016FE46 80006A00 6A006A01 6A026A05 6A31FA68 1E00C ?2 "...h°1j.j.j.j.j.j..F±.P.hQ..;". 000160
 1E000022 599A085C 681E5016 FE468000 6A006A00 6A016A02 6A066A31 FA681E·0 ..h°1j.j.j.j.j.j..F±.P.h\..Y"... 000180
 FA681E00 0022779A 0869681E 5016FE46 80006A00 6A006A01 6A046A07 6A31FA68 h°1j.j.j.j.j.j..F±.P.hi..w"...h° 0001A0
 6A31FA68 1E000022 959A0876 681E5016 FE468000 6A006A00 6A016A04 6A086A31 1j.j.j.j.j.j..F±.P.hv..."...h°1j 0001C0
 6A0A6A31 FA681E00 001EFF9A 0882681E 5016FE46 80006A00 6A006A01 6A026A09 .j.j.j.j.j..F±.P.h........h°1j.j 0001E0
```

```
Dump of file SATU 1:[PCCOMMON.DUMP.DLL]GRTAB.TMP;1 on 18-APR-1990 10:46:14.73
File ID (690,16,0)   End of file block 32 / Allocated 32

Virtual block number 19 (00000013), 512 (0200) bytes

 6A026A08 6A31FA68 1E000022 D19A0889 681E5016 FE468D00 6A006A00 6A046A21 !j.j.j.j..F±.P.h...ñ"...h°1j.j.j 000000
 6A016A02 6A0C6A31 FA681E00 0022EF9A 088E681E 5016FE46 8D006A00 6A006A01 .j.j.j..F±.P.h...ÿ"...h°1j.j.j.j 000020
 6A006A02 6A106A00 6A31FA68 1E000023 009A0896 681E5016 FE468D00 6A006A00 .j.j..F±.P.h....#...h°1j.j.j.j.j 000040
 6A006A00 6A036A04 6A0E6A31 FA681E00 0023289A 08A1681E 5016FE46 8D006A00 .j..F±.P.hÀ..+#...h°1j.j.j.j.j.j 000060
 8D006A00 6A006A03 6A046A0F 6A31FA68 1E000023 499A08A8 681E5016 FE468D00 ..F±.P.h¨..I#...h°1j.j.j.j.j.j.. 000080
 FE468D00 6A006A00 6A036A04 6A106A31 FA681E00 0023679A 0880681E 5016FE46 F±.P.h¯..g#...h°1j.j.j.j.j.j..F± 0000A0
 5016FE46 8D006A00 6A006A03 6A046A11 6A31FA68 1E000023 859A0885 681E5016 .P.hç...#...h°1j.j.j.j.j.j..F±.P 0000C0
 681E5016 FE468D00 6A006A00 6A036A04 6A126A31 FA681E00 0023A39A 0888681E .h¡..£#...h°1j.j.j.j.j.j..F±.P.h 0000E0
 5EC40012 0847C726 065EC406 5F8C2604 47892631 FA88065E C4000021 C39A088E /..ûl..á^.¡°1&.G.&._.á^.&úG...á^ 000100
 47C72606 5EC40010 0E47C726 065EC400 0C0C47C7 26065EC4 0A478926 FE468806 ..F±&.G.á^.&úG...á^.&úG...á^.&úG 000120
 FE46C708 8E218F88 1E565700 0002C8CB C95F5E1F 00001847 C726065E C4000A10 ...á^.&úG....^_èùà...WV.¡.!.ÄúF± 000140
 6A006A04 6A216A02 6A34CC68 1E08C483 21A40000 9A34CC68 1E006A00 8E680028 (.h/.j..ha4...Ê!.á..hä4j.j!j.j.j 000160
 6A006A00 6A026A10 6A036A34 CC681E00 0024489A 08C4681E 5016FE46 8D006A00 .j..F±.P.há..K$...hä4j.j.j.j.j.j 000180
 8D006A00 6A006A03 6A046A04 6A34CC68 1E000024 699A08C9 681E5016 FE468D00 ..F±.P.hè..i$...hä4j.j.j.j.j.j.. 0001A0
 C726065E C4065F8C 26044789 2634CC88 065EC400 0022839A 0800681E 5016FE46 F±.P.hÅ..°"..á^.¡ä4&.G.&._.á^.&ú 0001C0
 00040E47 C726065E C400000C 47C72606 5EC40A47 8926FE46 88065EC4 00040847 G...á^..F±&.G.á^.&úG...á^.&úG... 0001E0

Dump of file SATURN:[PCCOMMON.DUMP.DLL]GRTAB.TMP;1 on 18-APR-1990 10:46:14.73
File ID (690,16,0)   End of file block 32 / Allocated 32

Virtual block number 20 (00000014), 512 (0200) bytes

 F9881E56 57000002 C8CBC95F 5E1F0000 1847C726 065EC400 021047C7 26065EC4 á^.&úG...á^.&úG....^_èùà...WV.¡° 000000
 6A026A35 8A681E08 C483240E 00009A35 8A681E00 6A010A68 0028FE46 C7D88E23 #.ÄúF±(.h..j..h.5....$.á..h.5j.j 000020
 6A016A03 6A358A68 1E000025 119A080B 681E5016 FE468D00 6A006A00 6A016A02 .j.j.j.j..F±.P.hÜ...%...h.5j.j.j 000040
 6A036A04 6A046A35 8A681E00 00252F9A 08E2681E 5016FE46 8D006A00 6A006A01 .j.j.j..F±.P.hâ../%...h.5j.j.j.j 000060
 6A006A03 6A046A05 6A358A68 1E000025 4D9A08EB 681E5016 FE468D00 6A006A00 .j.j..F±.P.h$..M%...h.5j.j.j.j.j 000080
 6A006A00 6A036A04 6A066A35 8A681E00 0025689A 08F2681E 5016FE46 8D006A00 .j..F±.P.h·..k%...h.5j.j.j.j.j.j 0000A0
 065EC406 5F8C2604 47892635 8A88065E C4000024 2D9A08F8 681E5016 FE468D00 ..F±.P.h½..-$..á^.¡.5&.G.&._.á^. 0000C0
 02C8CBC9 5F5E1F00 001847C7 26065EC4 0A478926 FE468806 5EC40006 0847C726 &úG...á^..F±&.G.á^.&úG....^_èùà. 0000E0
 08C48324 D400009A 3694681E 006A017C 680028FE 46C7D88E 248F881E 56570000 ..WV.¡¢$.ÄúF±(.h|.j..h.6...Å$.á. 000100
 681E0000 25F89A08 FC681E50 16FE468D 006A006A 006A016A 026A026A 3694681E .h.6j.j.j.j.j.j..F±.P.hø..½%...h 000120
 3694681E 00002616 9A090068 1E5016FE 468D006A 006A006A 006A046A 006A3694 .6j.j.j.j.j.j..F±.P.h....&...h.6 000140
 046A3694 681E0000 26349A09 01681E50 16FE468D 006A006A 006A016A 026A036A j.j.j.j.j.j..F±.P.h...4&...h.6j. 000160
 086A056A 3694681E 000024F3 9A090868 1E5016FE 468D006A 006A006A 016A026A j.j.j.j.j..F±.P.h...µ$...h.6j.j. 000180
 016A016A 066A3694 681E0000 26709A09 0F681E50 16FE468D 006A006A 006A016A j.j.j.j..F±.P.h...p&...h.6j.j.j. 0001A0
 006A016A 086A076A 3694681E 0000268E 9A091468 1E5016FE 468D006A 006A006A j.j.j..F±.P.h....&...h.6j.j.j.j. 0001C0
 006A006A 016A016A 086A3694 681E0000 26AC9A09 1A681E50 16FE4680 006A006A j.j..F±.P.h...¯&...h.6j.j.j.j.j. 0001E0

Dump of file SATURN:[PCCOMMON.DUMP.DLL]GRTAB.TMP;1 on 18-APR-1990 10:46:14.73
File ID (690,16,0)   End of file block 32 / Allocated 32

Virtual block number 21 (00000015), 512 (0200) bytes

 006A006A 006A026A 106A096A 3694681E 000026CA 9A091F68 1E5016FE 468D006A j..F±.P.h...Ê&...h.6j.j.j.j.j.j. 000000
 26065EC4 065F8C26 04478926 3694B806 5EC40000 250A9A09 25681E50 16FE468D .F±.P.h%..Ö%..á^.¡.6&.G.&._.á^.& 000020
 0002C8CB C95F5E1F 00001847 C726065E C40A4789 26FE4688 065EC400 090847C7 úG...á^..F±&.G.á^.&úG....^_èùà.. 000040
 1E08C483 25880000 9A381068 1E006A00 8E680028 FE46C7D8 8E25A688 1E565700 .WV.¡!%.ÄúF±(.h/.j..h.8...Ê%.á.. 000060
 10681E00 0027579A 092C681E 5016FE46 8D006A00 6A006A03 6A046A02 6A381068 h.8j.j.j.j.j.j..F±.P.h,..W'...h. 000080
 6A381068 1E000027 759A0931 681E5016 FE468D00 6A006A00 6A036A04 6A036A38 8j.j.j.j.j.j..F±.P.h1..u'...h.8j 0000A0
 26381088 065EC400 0026529A 0938681E 5016FE46 8D006A00 6A006A02 6A106A04 .j.j.j.j.j..F±.P.h8..R&..á^.¡.8& 0000C0
 47C72606 5EC40A47 8926FE46 88065EC4 00040847 C726065E C4065F8C 26044789 .G.&._.á^.&úG...á^..F±&.G.á^.&úG 0000E0
 681E006A 008E6800 28FE46C7 D88E2705 881E5657 000002C8 CBC95F5E 1F000018 ....^_èùà...WV.¡.'.ÄúF±(.h/.j..h 000100
 1E5016FE 468D006A 006A006A 016A086A 026A38CE 681E08C4 83271A00 009A38CE ö8....'.á..hö8j.j.j.j.j.j..F±.P. 000120
 48681E50 16FE468D 006A006A 006A016A 046A036A 38CE681E 00002802 9A094268 hB...(...hö8j.j.j.j.j.j..F±.P.hN 000140
 9A094E68 1E5016FE 468D006A 006A006A 036A046A 046A38CE 681E0000 28209A09 .. (...hö8j.j.j.j.j.j..F±.P.hN.. 000160
 4688065E C4000408 47C72606 5EC4065F 8C260447 892638CE 88065EC4 00002739 9'..á^.¡ö8&.G.&._.á^.&úG...á^..F 000180
 C7D88E27 80881E56 57000002 C8CBC95F 5E1F0000 1847C726 065EC40A 478926FE ±&.G.á^.&úG....^_èùà...WV.¡¯'.Äú 0001A0
 6A016A04 6A026A39 8C681E08 C48327C5 00009A39 8C681E00 6A010A68 0028FE46 F±(.h..j..h.9...Å'.á..h.9j.j.j.j 0001C0
 6A006A01 6A086A03 6A398C68 1E000028 AD9A0954 681E5016 FE468D00 6A006A00 .j.j..F±.P.hT..Ú(...h.9j.j.j.j.j 0001E0
```

```
Dump of file SATURN:[PCCOMMON.DUMP.DLL]GRTAB.TMP;1 on 18-APR-1990 10:46:14.73
File ID (690,16,0)   End of file block 32 / Allocated 32

Virtual block number 22 (00000016), 512 (0200) bytes

 6A006A00 6A046A4C 6A046A39 8C681E00 0028C89A 095C681E 5016FE46 8D006A00 .j..F±.P.h\..ù(...h.9j.jLj.j.j.j 000000
 8D006A00 6A006A0; 6A046A05 6A398C68 1E000028 E99A0961 681E5016 FE468000 ..F±.P.ha..Ô(...h.9j.j.j.j.j.j.. 000020
 FE468000 6A006A00 6A026A10 6A066A39 8C681E00 0029079A 0968681E 5016FE46 F±.P.hk...)...h.9j.j.j.j.j.j..F± 000040
 0847C726 065EC406 5F8C2604 47892639 8CB8065E C4000027 E49A0978 681E5016 .P.hx..ô'..á^.¡.9&.G.&._.á^.&úG. 000060
 5EC40005 0E47C726 065EC400 0F0C47C7 26065EC4 0A478926 FE468806 5EC40006 ..á^..F±&.G.á^.&úG...á^.&úG...á^ 000080
 01A26800 28FE46C7 D88E285B 881E5657 000002C8 CBC95F5E 1F000018 47C72606 .&úG....^_èùà...WV.¡[(.ÁúF±(.hÅ. 0000A0
 4680006A 006A006A 016A046A 026A3A96 681E08C4 83287000 009A3A96 681E006A j..h.:...p(.á..h.:j.j.j.j.j.j..F 0000C0
 16FE4680 006A006A 006A016A 086A036A 3A96681E 0000288F 9A098268 1E5016FE ±.P.h....(...h.:j.j.j.j.j.j..F±. 0000E0
 1E5016FE 4680006A 006A006A 046A4C6A 046A3A96 681E0000 29C49A09 8A681E50 P.h...á)...h.:j.jLj.j.j.j..F±.P. 000100
 9E681E50 16FE468D 006A006A 006A016A 026A056A 3A96681E 000029E2 9A099668 h...ã)...h.:j.j.j.j.j.j..F±.P.h. 000120
 9A09A668 1E5016FE 4680006A 006A006A 016A086A 066A3A96 681E0000 2A009A09 ...*...h.:j.j.j.j.j.j..F±.P.hÎ.. 000140
 2A3C9A09 B1681E50 16FE468D 006A006A 006A026A 106A076A 3A96681E 00002A1E .*...h.:j.j.j.j.j.j..F±.P.hŸ..<* 000160
 00002A5A 9A098A68 1E5016FE 4680006A 006A006A 036A046A 086A3A96 681E0000 ...h.:j.j.j.j.j.j..F±.P.ho..Z*.. 000180
 681E0000 2A789A09 8D681E50 16FE468D 006A006A 006A026A 106A096A 3A9..81E .h.:j.j.j.j.j.j..F±.P.h§..x*...h 0001A0
 88065EC4 00002988 9A09C768 1E5016FE 4680006A 006A006A 036A046A 0A6A3.96 .:j.j.j.j.j.j..F±.P.hú...)..á^.¡ 0001C0
 065EC40A 478926FE 4688065E C4000A08 47C72606 5EC4065F 8C260447 89263A.6 .:&.G.&._.á^.&úG...á^..F±&.G.á^. 0001E0

Dump of file SATURN:[PCCOMMON.DUMP.DLL]GRTAB.TMP;1 on 18-APR-1990 10:46:14.73
File ID (690,16,0)   End of file block 32 / Allocated 32

Virtual block number 23 (00000017), 512 (0200) bytes

 0002C8C8 C95F5E1F 00001847 C726065E C400080E 47C72606 5EC40010 0C47C726 &úG...á^.&úG...á^.&úG....^_èùà.. 000000
 1E08C483 29690000 9A3C3868 1E006A01 C8680028 FE46C7D8 8E2954B8 1E565700 .WV.¡T).ÁúF±(.hà.j..h8<...T).á.. 000020
 38681E00 0028179A 09CE681E 5016FE46 8D006A00 6A006A01 6A046A02 6A3C3868 h8<j.j.j.j.j.j..F±.P.hö...+...h8 000040
 6A3C3868 1E000028 359A0906 681E5016 FE468D00 6A006A00 6A016A08 6A036A3C <j.j.j.j.j.j..F±.P.h■..5+...h8<j 000060
 6A056A3C 38681E00 0028539A 09D8681E 5016FE46 8D006A00 6A006A01 6A086A04 .j.j.j.j.j..F±.P.hÜ..S+...h8<j.j 000080
 6A086A06 6A3C3868 1E000028 719A09E6 681E5016 FE468D00 6A006A00 6A016A08 .j.j.j.j..F±.P.hl..q+...h8<j.j.j 0000A0
 6A016A02 6A076A3C 38681E00 00288F9A 09F2681E 5016FE46 8D006A00 6A006A01 .j.j.j..F±.P.h·...+...h8<j.j.j.j 0000C0
 6A006A03 6A046A08 6A3C3868 1E000028 AD9A09FA 681E5016 FE468D00 6A006A00 .j.j..F±.P.h*..Ù+...h8<j.j.j.j.j 0000E0
 6A006A00 6A036A04 6A096A3C 38681E00 002BC89A 0A02681E 5016FE46 8D006A00 .j..F±.P.h...ù+...h8<j.j.j.j.j.j 000100
 8D006A00 6A006A03 6A046A0A 6A3C3868 1E000028 E99A0A05 681E5016 FE468000 ..F±.P.h...Ô+...h8<j.j.j.j.j.j.. 000120
 FE468D00 6A006A00 6A036A04 6A086A3C 38681E00 002C079A 0A00681E 5016FE46 F±.P.h........h8<j.j.j.j.j.j..F± 000140
 0847C726 065EC406 5F8C2604 4789263C 3888065E C4000029 A69A0A17 681E5016 .P.h...Î)..á^.¡8<&.G.&._.á^.&úG. 000160
 5EC40008 0E47C726 065EC400 110C47C7 26065EC4 0A478926 FE468806 5EC40008 ..á^..F±&.G.á^.&úG...á^.&úG...á^ 000180
 01566800 28FE46C7 D88E2AC5 B81E5657 000002C8 CBC95F5E 1F000018 47C72606 .&úG....^_èùà...WV.¡é*.ÁúF±(.hV. 0001A0
 4680006A 006A006A 016A046A 026A3E00 681E08C4 832A0A00 009A3E00 681E006A j..h.>...Õ*.á..h.>j.j.j.j.j.j..F 0001C0
 16FE468D 006A006A 006A046A 4C6A036A 3E00681E 00002CA6 9A0A2068 1E5016FE ±.P.h ..Î,...h.>j.jLj.j.j.j..F±. 0001E0

Dump of file SATURN:[PCCOMMON.DUMP.DLL]GRTAB.TMP;1 on 18-APR-1990 10:46:14.73
File ID (690,16,0)   End of file block 32 / Allocated 32

Virtual block number 24 (00000018), 512 (0200) bytes

 1E5016FE 4680006A 006A006A 016A026A 046A3E00 681E0000 2CC49A0A 28681E50 P.h(..á,...h.>j.j.j.j.j.j..F±.P. 000000
 38681E50 16FE468D 006A006A 006A046A 4C6A056A 3E00681E 00002CE2 9A0A3068 h0..ã,...h.>j.jLj.j.j.j..F±.P.h8 000020
 9A0A4068 1E5016FE 4680006A 006A006A 016A026A 066A3E00 681E0000 2D009A0A ...-...h.>j.j.j.j.j.j..F±.P.hà.. 000040
 2D3C9A0A 48681E50 16FE468D 006A006A 006A016A 086A076A 3E00681E 00002D1E .-...h.>j.j.j.j.j.j..F±.P.hH..<- 000060
 00002AF9 9A0A4D68 1E5016FE 4680006A 006A006A 036A046A 086A3E00 681E0000 ...h.>j.j.j.j.j.j..F±.P.hM..**.. 000080
 478926FE 4688065E C4000808 47C72606 5EC4065F 8C260447 89263E00 B8065EC4 á^.¡.>&.G.&._.á^.&úG...á^..F±&.G 0000A0
 0000F846 C7D88E2C 54881E56 57000008 C8C8C95F 5E1F0000 1847C726 065EC40A .á^.&úG....^_èùà...WV.¡T,.ÁúF%.. 0000C0
 2D87BA00 008808C4 832C6900 009A5052 2D9EBA00 0088006A 048F68FF FFFA46C7 úF*..h¢.j.¡..¤.-RP...i,.á.¡..¤ñ- 0000E0
 D06807D2 6850522D D08A0000 8800002D C89AFFFF 6820C268 07D06807 D1685052 RPhl.hÅ.hò-h...à-..¡..¤Å-RPh@.hÅ 000100
 FFFF682D F46807D0 6807D368 50522DE9 BA000088 00002DE1 9AFFFF68 2DDB6807 .hÙ-h...Ã-..¡..¤Õ-RPhÆ.hÅ.h¶-h.. 000120
 00880000 2E139AFF FF682E00 6807D068 07D46850 522E028A 00008800 002DFA9A .*-..¡..¤..RPhå.hÅ.h..h.......¡. 000140
 6850522E 348A0000 B800002E 2C9AFFFF 682E2668 07D06807 D5685052 2E18BA00 .¤..RPhl.hÅ.h&.h...,...¡..¤4.RPh 000160
 586807D0 6807D768 50522E4D BA000088 00002E45 9AFFFF68 2E3F6807 D06807D6 ●.hÅ.h?.h...E...¡..¤M.RPh■.hÅ.hX 000180
 2E779AFF FF682E71 6807D068 07D86850 522E668A 00008800 002E5E9A FFFF682E .h...^...¡..¤f.RPhÁ.hÅ.hq.h...w. 0001A0
 988A0000 B800002E 909AFFFF 682E8A68 07D06807 D9685052 2E7FBA00 00880000 ..¡..¤..RPhl.hÅ.h..h.......¡..¤. 0001C0
 6807D868 50522EB1 BA000088 00002EA9 9AFFFF68 2EA36807 D06807DA 6850522E .RPhÒ.hÅ.hÈ.h...`...¡..¤Ÿ.RPhÜ.h 0001E0
```

```
Dump of file SATURN:[PCCOMMON.DUMP.DLL]GRTAB.TMP;1 on 18-APR-1990 10:46:14.73
File ID (690,16,0)   End of file block 32 / Allocated 32

Virtual block number 25 (00000019), 512 (0200) bytes

 FF682ED5 6807D068 07DC6850 522ECABA 00008800 002EC29A FFFF682E 8C68L D0 Å.h¥.h...ô...¡..¤ò.RPhÊ.hÅ.hÍ.h. 000000
 8800002E F49AFFFF 682EEE68 07D06807 D0685052 2EE38A00 00880000 2ED89AFF ..Ü...¡..¤Ð.RPhî.hÅ.h¥.h...¶...¡ 000020
 50522F15 8A0000d8 00002F0D 9AFFFF68 2F076807 D06807DE 6850522E FCBA0000 ..¤¤.RPh8.hÅ.h./h..../..¡..¤./RP 000040
 6807D068 07E06850 522F2E8A 00008800 002F269A FFFF682F 206807D0 6807DF68 hÖ.hÅ.h /h...&/..¡..¤./RPhÅ.hÅ.h 000060
 589AFFFF 682F5268 07D06807 E1685052 2F47BA00 00880000 2F3F9AFF FF682F39 9/h...?/..¡..¤G/RPhÅ.hÅ.hR/h...X 000080
 8A000088 00002F71 9AFFFF68 2F686807 D06807E2 6850522F 608A0000 8800002F /..¡..¤'/RPhâ.hÅ.hk/h...q/..¡..¤ 0000A0
 07E46850 522F928A 00008800 00FFFF9A FFFF68FF FF6807D0 6807E368 50522083 .-RPhÖ.hÅ.h..h.......¡..¤./RPhô. 0000C0
 682F8668 07D06807 E5685052 2FA88A00 00880000 2FA39AFF FF682F90 6807D068 hÅ.h./h...Ê/..¡..¤¨/RPhÎ.hÅ.hÑ/h 0000E0
 00002F05 9AFFFF68 2FCF6807 D06807E6 6850522F C48A0000 8800002F BC9AFFFF ...¥/..¡..¤é/RPhÎ.hÅ.hü/h...Í/.. 000100
 522FF68A 00008800 002FEE9A FFFF682F E86807D0 6807E768 50522FDD 8A000088 ¡..¤Í/RPhÖ.hÅ.hÒ/h...¥/..¡..¤-/R 000120
 07D06807 E9685052 300F8A00 00880000 30079AFF FF683001 6807D068 07E86850 PhÖ.hÅ.h.0h....0..¡..¤.0RPhÖ.hÅ. 000140
 9AFFFF68 30336807 D06807EA 68505230 288A0000 88000030 209AFFFF 68301A68 h.0h... 0..¡..¤(0RPhõ.hÅ.h30h... 000160
 FC46C700 0020AF9A FFFF6820 A96807D0 6807EB68 5052305A 8A000088 00003039 90..¡..¤Z0RPhŠ.hÅ.h˙-h...€-..úF• 000180
 5E685052 208E8A00 00878020 FC5E6800 20E90372 18FC7E83 FC46FF00 03E90000 ..Ô...F•.~•.r.Ô .k^•-....¤.-RPk^ 0001A0
 000000C8 CBC95F5E 1F0000E9 00018BFF D4E904C4 8300009F FF260A56 068E20FC •-..V.&.....é.Ôâ.¡..Ô...^ èùà... 0001C0
 5EC407D1 07C7260E 5EC42F79 0247C726 000007C7 26125EC4 D88E2D77 881E5657 WV.¡w-.Aé^.&ú...&úG.y/é^.Ēú.1.é^ 0001E0

Dump of file SATURN:[PCCOMMON.DUMP.DLL]GRTAB.TMP;1 on 18-APR-1990 10:46:14.73
File ID (690,16,0)   End of file block 32 / Allocated 32

Virtual block number 26 (0000001A), 512 (0200) bytes

 00000001 2F840002 00219000 10CAC95F 5E1F001C 07C72606 5EC407E2 07C7260A .&ú.ã.é^.&ú....^_èò...!..../.... 000000
 03720001 2D0E0005 23F10001 2F230005 00000004 30840002 00000003 20950002 ...-.......0......#/..þ#..8-..r. 000020
 26F00001 2F6E0005 08790001 30360005 00000005 30940002 09F30001 2DF70005 ..%-..µ....0......60..y...n/..»& 000040
 12080001 2E420005 21870001 2F0A0005 00000001 20AC0005 000E0002 2C880203 ...,......ˆ-......./...!..B..... 000060
 191C0001 2E8F0005 17110001 2E8D0005 02880001 2DC50005 001A0002 2F8A0203 .../......é-................¢..... 000080
 0C210001 2E100005 11200001 2E290005 259E0001 2F550005 07100001 30100005 ...0......U/...X..)... .......!. 0000A0
 14AF0001 2E5B0005 102B0001 2ED80005 27A80001 2F870005 05A30001 30040005 ...0..È..../..´'..Å...+...[...€. 0000C0
 1EC30001 2EF10005 2ABD0001 2FD20005 24B70001 2F3C0005 15B40001 2E740005 ..t...Ç...</..ñ$..@/..§*..þ...û. 0000E0
 28530001 2FA00005 18530001 2EA60005 294C0001 2FB90005 2C4C0001 2FE80005 ..Š/..L,..¿/..L)..Î...S..../..S( 000100
 04000200 02000000 01000A00 020002C8 1F02C483 FFFF2D6F 9A57D88E FFFFB81E .¡...ÄW.o-...é..ù............... 000120
 DAF7D788 067EC457 38E30C4E 88EC8855 00000000 00000000 00000000 00000000 .................U.$.N.Ø8Wé~..ƒKÖ 000140
 8C10E3D1 87AAF3C9 13A8F3E9 D1E08A0A 4688D128 0187D103 03230818 D1280C74 t.+Ì.Ù#€.Ì.Ì+Ì.F..ÀìÕµ¨.èµ¨.ÌD.. 000160
 00010033 01050001 CB5D0856 8B06468B 5FAAF3C9 13A8F3E9 D1C38EFF FFC381C3 û.û...ûlÕµ¨.èµ¨_.F..V.]ù....3... 000180
 52460053 4D594E4F 4E595300 43534544 00000000 00000000 00000000 00000088 ................DESC.SYNONYMS.FR 0001A0
 4549564C 4C410053 57454956 4C4C4100 53454C42 41544C4C 4100534C 4F434545 EECOLS.ALLTABLES.ALLVIEWS.ALLVIE 0001C0
 504C4C41 00534E4D 554C4F43 4C4C4100 53454341 5053544C 4C410053 4C4F4357 WCOLS.ALLTSPACES.ALLCOLUMNS.ALLP 0001E0

Dump of file SATURN:[PCCOMMON.DUMP.DLL]GRTAB.TMP;1 on 18-APR-1990 10:46:14.73
File ID (690,16,0)   End of file block 32 / Allocated 32

Virtual block number 27 (0000001B), 512 (0200) bytes

 444E494C 4C410053 59454B4E 47494552 4F464C4C 41005359 45485952 414D4952 RIMARYKEYS.ALLFOREIGNKEYS.ALLIND 000000
 00534B43 4F4C4254 58455445 45524600 534D594E 4F4E5953 4C4C4100 53455845 EXES.ALLSYNONYMS.FREETEXTBLOCKS. 000020
 414D4C4C 41005354 454D414E 5041504D 4C410053 4E474454 58455041 4D4C4C41 ALLMAPEXTDGNS.ALLMAPNAMETS.ALLMA 000040
 00534C4F 4F50424C 4C410053 45534142 41544144 4C4C4100 5350414D 53595350 PSYSMAPS.ALLDATABASES.ALLBPOOLS. 000060
 444E4900 3242445F 4E490059 42444554 41455243 00535052 47524F54 534C4C41 ALLSTORGRPS.CREATEDBY.IN_DB2.IND 000080
 43005745 49565F54 5441404D 4F430045 43415053 545F5454 414D4D4F 43005845 EX.COMMATT_TSPACE.COMMATT_VIEW.C 0000A0
 544C4644 00454C55 52455341 52450053 53415054 45534400 454C5552 45534F4C LOSERULE.DSETPASS.ERASERULE.DFLT 0000C0
 54524150 5F4D554E 00534547 41505F45 56495443 414E004C 41565245 544E4900 .INTERVAL.NACTIVE_PAGES.NUM_PART 0000E0
 49525000 544C4644 5F454552 46544350 00455A49 53454741 5000534E 4F495449 ITIONS.PAGESIZE.PCTFREE_DFLT.PRI 000100
 434F4C4C 415F454 41505300 544C4644 5F595451 43455300 544C4644 5F595451 QTY_DFLT.SECQTY_DFLT.SPACE_ALLOC 000120
 50535400 5845444c 4900454D 414E5441 43560045 4D414E50 554F5247 4F545300 .STOGROUPNAME.VCATNAME.INDEX.TSP 000140
 47524F54 53004353 45440045 4D414E5F 4E4F4953 5245565F 4D324244 00454341 ACE.DB2M_VERSION.NAME.DESC.STORG 000160
 4F4C4154 41430044 49535953 42555300 53454341 50535400 4C4F4F50 42005052 RP.BPOOL.TSPACES.SUBSYSID.CATALO 000180
 454D414E 004E4F49 53524556 5F4D3242 4400524F 54414552 43004449 42445F47 G_DBID.CREATOR.DB2M_VERSION.NAME 0001A0
 41424154 41440052 45464655 424E494D 00524546 46554258 414D0043 53454400 .DESC.MAXBUFFER.MINBUFFER.DATABA 0001C0
 4F495352 45565F4D 32424400 44495359 53425553 00534543 41505354 00534553 SES.TSPACES.SUBSYSID.DB2M_VERSIO 0001E0
```

```
Dump of file SATURN:[PCCOMMON.DUMP.DLL]GRTAB.TMP;1 on 18-APR-1990 10:46:14.73
File ID (690,16,0)   End of file block 32 / Allocated 32

Virtual block number 28 (0000001C), 512 (0200) bytes

 534E4F49 5449545? 41500053 45534142 41544144 00435345 4400454D 414E004E N.NAME.DESC.DATABASES.PARTITIONS 000000
 49535953 42555300 44524F57 53534150 00454D41 4E544143 56004449 4C4F5600 .VOLID.VCATNAME.PASSWORD.SUBSYSI 000020
 00324244 5F4E4900 54494349 4C504D49 0044524F 4F43004E 4F495352 45560044 D.VERSION.COORD.IMPLICIT.IN_DB2. 000040
 54554F00 53454C42 41544E00 454D414E 5F454341 50535400 455A4953 4B434F4C LOCKSIZE.TSPACE_NAME.NTABLES.OUT 000060
 43534544 00545441 4D4D4F43 5F454341 50535400 455A4953 47455300 454E494C LINE.SEGSIZE.TSPACE_COMMATT.DESC 000080
 414E0053 57454956 0053454C 42415400 45434150 53005247 5F454341 50535400 .TSPACE_GR.SPACE.TABLES.VIEWS.NA 0000A0
 54554F00 5044524F 4F430052 44524F4F 43003242 445F4E49 00435345 4400454D ME.DESC.IN_DB2.COORDR.COORDP.OUT 0000C0
 4E45444E 45504544 00534E4D 554C4F43 00505245 4E494C54 554F0052 454E494C LINER.OUTLINERP.COLUMNS.DEPENDEN 0000E0
 4F4E5953 00535945 4B5F4E47 4945524F 46005945 4B5F5952 414D4952 50005354 TS.PRIMARY_KEY.FOREIGN_KEYS.SYNO 000100
 59535041 4D005247 5F454C42 41540045 43415053 54005845 444E4900 534D594E NYMS.INDEX.TSPACE.TABLE_GR.MAPSY 000120
 5245565F 4D324244 00504D4F 43560053 50414D52 45535550 414D0053 50414D53 SMAPS.MAPUSERMAPS.VCOMP.DB2M_VER 000140
 49444500 544E454D 4D4F4300 44494554 41434F4C 00444948 54554100 4E4F4953 SION.AUTHID.LOCATEID.COMMENT.EDI 000160
 5441525F 54524553 4E490054 49445541 00434F52 5044494C 41560043 4F525054 TPROC.VALIDPROC.AUDIT.INSERT_RAT 000180
 00455441 44505500 4854574F 52475F54 454E0045 5441525F 4554454C 45440045 E.DELETE_RATE.NET_GROWTH.UPDATE. 0001A0
 4F5A4952 4F485F48 54574F52 47004452 41435F58 41400044 5241435F 54494E49 INIT_CARD.MAX_CARD.GROWTH_HORIZO 0001C0
 45544152 4450555F 574F524E 454C5600 4C415652 45544E49 5F544E49 4140004E N.MAINT_INTERVAL.VLENROW_UPDRATE 0001E0

Dump of file SATURN:[PCCOMMON.DUMP.DLL]GRTAB.TMP;1 on 18-APR-1990 10:46:14.73
File ID (690,16,0)   End of file block 32 / Allocated 32

Virtual block number 29 (0000001D), 512 (0200) bytes

 4C415441 43004452 41435F47 4F4C4154 41430044 49424F5F 474F4C41 54414300 .CATALOG_OBID.CATALOG_CARD.CATAL 000000
 50544350 00534547 41504E5F 474F4C41 54414300 4854474E 454C4345 525F474F OG_RECLENGTH.CATALOG_NPAGES.PCTP 000020
 41545600 534B5241 4D455200 544E554F 434C4F43 00444948 54554100 53454741 AGES.AUTHID.COLCOUNT.REMARKS.VTA 000040
 5F4B4345 4843004E 4F495352 45560057 4549565F 42415456 00454C42 41545F42 B_TABLE.VTAB_VIEW.VERSION.CHECK_ 000060
 44004449 4C415600 454C4241 54414450 55005458 45540045 4D414E00 47414C46 FLAG.NAME.TEXT.UPDATABLE.VALID.D 000080
 00435345 44005354 4E45444E 45504544 00545441 4D4D4F43 0054434E 49545349 ISTINCT.COMMATT.DEPENDENTS.DESC. 0000A0
 53544345 4C455342 55535600 534C4F43 56004543 41505354 0052475F 57454956 VIEW_GR.TSPACE.VCOLS.VSUBSELECTS 0000C0
 47004843 5441405F 4C414349 474F4C00 4D4F4356 00535045 44560042 41545600 .VTAB.VDEPS.VCOM.LOGICAL_MATCH.G 0000E0
 4F4E4452 4F00454D 414E004E 4F495352 45560048 4354414D 5F455441 52454E45 ENERATE_MATCH.VERSION.NAME.ORDNO 000100
 4F495352 45560054 4E45444E 45504544 00574549 565F5045 44560045 50595400 .TYPE.VDEP_VIEW.DEPENDENT.VERSIO 000120
 56005745 49560052 475F4C4F 43560045 4D414E00 52505845 004F4E4C 4F43004E N.COLNO.EXPR.NAME.VCOL_GR.VIEW.V 000140
 5845004F 4E4C4F43 004E4F49 53524556 00534C4F 43565445 53414200 504D4F43 COMP.BASETVCOLS.VERSION.COLNO.EX 000160
 45534255 5356004C 4F435600 4E4D554C 4F430045 50595400 45554C41 565F5250 PR_VALUE.TYPE.COLUMN.VCOL.VSUBSE 000180
 49560054 5845545F 4C455342 55535600 4E4F4953 52455600 45435255 4F53004C L.SOURCE.VERSION.VSUBSEL_TEXT.VI 0001A0
 54415441 44004D55 4E44524F 00534C4C 554E0045 4D414E00 504D4F43 56005745 EW.VCOMP.NAME.NULLS.ORDNUM.DATAT 0001C0
 594E4F4E 59530054 434A4C4F 43005945 4B00454C 42415400 43534544 00455059 YPE.DESC.TABLE.KEY.COLJCT.SYNONY 0001E0

Dump of file SATURN·[PCCOMMON.DUMP.DLL]GRTAB.TMP;1 on 18-APR-1990 10:46:14.73
File ID (690,16,0)   End of file block 32 / Allocated 32

Virtual block number 30 (0000001E), 512 (0200) bytes

 00535041 4D535953 50414D00 534C4F43 56544553 41420052 475F4C4F 4300534D MS.COL_GR.BASETVCOLS.MAPSYSMAPS. 000000
 54414C45 524F4300 4E4F4953 5245565F 4D324244 00535041 4D524553 5550414D MAPUSERMAPS.DB2M_VERSION.CORELAT 000020
 41435300 4854474E 454C0045 50595400 544E454D 4D4F4300 454D414E 5F4E4F49 ION_NAME.COMMENT.TYPE.LENGTH.SCA 000040
 444C4549 4600544C 55414645 445F4854 49570041 54414454 4942524F 4600454C LE.FORBITDATA.WITH_DEFAULT.FIELD 000060
 45555145 52465F54 534F4D00 5345554C 41565F54 434E4954 53494400 434F5250 PROC.DISTINCT_VALUES.MOST_FREQUE 000080
 41004554 41525F45 43414C50 45520053 574F525F 51455246 5F54534F 4D00544E NT.MOST_FREQ_ROWS.REPLACE_RATE.A 0000A0
 55005945 4B324847 49480059 454B3257 4F4C0044 5241434C 4F43004E 454C4756 VGLEN.COLCARD.LOW2KEY.HIGH2KEY.U 0000C0
 4F430045 4C424154 00324244 5F4E4900 43534544 00454D41 4E005345 54414450 PDATES.NAME.DESC.IN_DB2.TABLE.CO 0000E0
 4B005340 594E4F4E 59535F59 454B0053 5945485F 4E474945 524F4600 54434A4C LJCT.FOREIGN_KEYS.KEY_SYNONYMS.K 000100
 4D414E00 5350414D 52455355 50414D00 5350414D 53595350 414D0052 475F5945 EY_GR.MAPSYSMAPS.MAPUSERMAPS.NAM 000120
 414D4952 50005443 4A4C4F43 00454C42 41540032 42445F4E 49004353 45440045 E.DESC.IN_DB2.TABLE.COLJCT.PRIMA 000140
 45545245 56005247 5F59454B 00534D59 4E4F4E59 535F5945 4B005945 4B5F5952 RY_KEY.KEY_SYNONYMS.KEY_GR.VERTE 000160
 56005031 58455452 45560052 33584554 52455600 52325845 54524556 00523158 X1R.VERTEX2R.VERTEX3R.VERTEX1P.V 000180
 46005044 524F4F43 00524452 4F4F4300 50335845 54524556 00503258 45545245 ERTEX2P.VERTEX3P.COORDR.COORDP.F 0001A0
 5550414D 00535041 4D535953 50414D00 50455455 4F524B46 00524554 554F524B KROUTER.FKROUTEP.MAPSYSMAPS.MAPU 0001C0
 44455245 5453554C 43004449 48545541 004E4F49 53524556 00535041 4D524553 SERMAPS.VERSION.AUTHID.CLUSTERED 0001E0
```

```
Dump of file SATURN:[PCCOMMON.DUMP.DLL]GRTAB.TMP;1 on 18-APR-1990 10:46:14.73
File ID (690,16,0)   End of file block 32 / Allocated 32

Virtual block number 31 (0000001F), 512 (0200) bytes

 45485453 52494600 4F495441 52524554 53554C43 00474E49 52455453 554C4300 .CLUSTERING.CLUSTERRATIO.FIRSTKE 000000
 4C4E0045 4D414E00 3242445F 4E490044 52414359 45484C4C 55460044 52414359 YCARD.FULLKEYCARD.IN_DB2.NAME.NL 000020
 00545441 4D4D4F43 0054434A 4C4F4300 454C5552 45555149 4E550053 4C455645 EVELS.UNIQUERULE.COLJCT.COMMATT. 000040
 00594244 45535500 454D414E 00454C42 41540045 43415053 00524700 43534544 DESC.GR.SPACE.TABLE.NAME.USEDBY. 000060
 4D554C4F 4300474E 49524544 524F004D 554E4452 4F005247 5F4D594E 4F4E5953 SYNONYM_GR.ORDNUM.ORDERING.COLUM 000080
 4C005044 524F4F43 00524452 4F4F4300 004E454C 0059454B 00584544 4E49004E N.INDEX_KEY.LEN..COORDR.COORDP.L 0000A0
 43534544 00594244 45535500 50545355 4A005043 4F4C0052 5453554A 0052434F OCR.JUSTR.LOCP.JUSTP.USEDBY.DESC 0000C0
 574F0058 45444E49 00545047 45530053 544E494F 50474553 0059454B 524F4600 .FORKEY.SEGPOINTS.SEGPT.INDEX.OW 0000E0
 58455041 4D004E47 44545845 50414D00 59454B53 004E4F49 53524556 0052454E NER.VERSION.SKEY.MAPEXTDGN.MAPEX 000100
 424F4454 5845004E 4F495352 45560050 414D5359 5350414D 0052475F 4E474454 TDGN_GR.MAPSYSMAP.VERSION.EXTDOB 000120
 59454B53 544E4552 41500045 5059544A 424F0045 4D414E4A 424F0059 454B534A JSKEY.OBJNAME.OBJTYPE.PARENTSKEY 000140
 45560054 4E455241 50005041 4D535953 50414D00 5247004E 4552444C 49484300 .CHILDREN.GR.MAPSYSMAP.PARENT.VE 000160
 454B534A 424F44!  58450059 454B534E 47445458 45005945 4B53004E 4F495352 RSION.SKEY.EXTDGNSKEY.EXTDOBJSKE 000180
 50414D00 4A424F4. 50414D00 52470059 524F5453 49480059 454B534E 45470059 Y.GENSKEY.HISTORY.GR.MAPDOBJ.MAP 0001A0
 00454D41 4E4A424F 004E4F49 53524556 0054454D 414E5041 4D004E47 44545845 EXTDGN.MAPNAMET.VERSION.OBJNAME. 0001C0
 50414D00 59454B53 00455059 544E4744 00454D41 4E4E4744 00455059 544A424F OBJTYPE.DGNNAME.DGNTYPE.SKEY.MAP 0001E0

Dump of file SATURN:[PCCOMMON.DUMP.DLL]GRTAB.TMP;1 on 18-APR-1990 10:46:14.73
File ID (690,16,0)   End of file block 32 / Allocated 32

Virtual block number 32 (00000020), 512 (0200) bytes

 00000000 00000000 00000000 00000000 00050A56 00020001 FFFF0000 4A424F44 DOBJ........V................... 000000
 00000000 00000000 00000000 00000000 00000000 00000000 00000000 00000000 ................................ 000020
 00000000 00000000 00000000 00000000 00000000 00000000 00000000 00000000 ................................ 000040
 00000000 00000000 00000000 00000000 00000000 00000000 00000000 00000000 ................................ 000060
 00000000 00000000 00000000 00000000 00000000 00000000 00000000 00000000 ................................ 000080
 00000000 00000000 00000000 00000000 00000000 00000000 00000000 00000000 ................................ 0000A0
 00000000 00000000 00000000 00000000 00000000 00000000 00000000 00000000 ................................ 0000C0
 00000000 00000000 00000000 00000000 00000000 00000000 00000000 00000000 ................................ 0000E0
 00000000 00000000 00000000 00000000 00000000 00000000 00000000 00000000 ................................ 000100
 00000000 00000000 00000000 00000000 00000000 00000000 00000000 00000000 ................................ 000120
 00000000 00000000 00000000 00000000 00000000 00000000 00000000 00000000 ................................ 000140
 00000000 00000000 00000000 00000000 00000000 00000000 00000000 00000000 ................................ 000160
 00000000 00000000 00000000 00000000 00000000 00000000 00000000 00000000 ................................ 000180
 00000000 00000000 00000000 00000000 00000000 00000000 00000000 00000000 ................................ 0001A0
 00000000 00000000 00000000 00000000 00000000 00000000 00000000 00000000 ................................ 0001C0
 00000000 00000000 00000000 00000000 00000000 00000000 00000000 00000000 ................................ 0001E0
```

```
Dump of file SATURN:[PCCOMMON.DUMP.DLL]GTI.TMP;1 on 18-APR-1990 10:46:19.71
File ID (691,13,0)   End of file block 41 / Allocated 44

Virtual block number 1 (00000001), 512 (0200) bytes

 00000000 0000004J 00000000 00000088 0000FFFF 00000004 00000029 01F05A4D MZÞ.)...........¡.......a....... 000000
 00000080 00000000 00000000 00000000 00000000 00000000 00000000 00000000 ................................ 000020
 6F6E6E61 63206061 72676F72 70207369 685421CD 4C01B821 CD09B400 0EBA1F0E ..¤..Ç.ël¡.LëIThis program canno 000040
 00000000 00000024 0A0D0D2E 65646F6D 20534F44 206E6920 6E757220 65622074 t be run in DOS mode....$....... 000060
 0005000F 00000000 000C0000 00000000 000F8009 94BCD657 007E0357 0505454E NE..W.-.Wø¥..................... 000080
 00000000 00000000 00010000 00040000 00000455 02AF02A5 00880088 0040001A ..a.¡.¡.E.£.U................... 0000A0
 00820F00 00820096 03AC0F00 03AC0050 00340F00 00340048 002C0F00 00280047 G.+....,.K.4...4.P.¯...¯...ý...ý. 0000C0
 01860F00 018600E3 015A0F00 015900CA 00820F00 0082008C 014E0F00 014D00A2 Å.M...N.¥.ý...ý.ò.Y...Z.0.Ñ...Ñ. 0000E0
 000E0F00 000E01DC 0A320F00 0A32012D 01D40F00 01D4010E 007A0F00 00790105 ..y...z...Å...Å.-.2...2.É....... 000100
 47160000 49544703 18A00F21 1A06037D 14C00E21 00000000 198A0F00 198A01DE B...........!.å.)...!....GTI...G 000120
 55415445 53495447 10000159 54494C49 42495349 564C4F4F 54595245 55514954 TIQUERYTOOLVISIBILITY...GTISETAU 000140
 54471000 03574F44 4E49574C 4F4F5454 45534954 47100002 52545041 54414458 XDATAPTR...GTISETTOOLWINDOW...GT 000160
 46544958 454C4F4F 54444441 49544710 00044550 59544C4F 4F545952 45555149 IQUERYTOOLTYPE...GTIADDTOOLEXITF 000180
 49564C4F 4F545445 53495447 14000643 4F525044 4E575443 454A424F 0000054E N...OBJECTWNDPROC...GTISETTOOLVI 0001A0
 13000852 54504154 41445855 41595245 55514954 47120007 5954494C 49424953 SIBILITY...GTIQUERYAUXDATAPTR... 0001C0
 4C4F4F54 54455349 54470F00 09534F50 455A4953 4C4F4F54 59524555 51495447 GTIQUERYTOOLSIZEPOS...GTISETTOOL 0001E0

Dump of file SATURN:[PCCOMMON.DUMP.DLL]GTI.TMP;1 on 18-APR-1990 10:46:19.71
File ID (691,13,0)   End of file block 41 / Allocated 44

Virtual block number 2 (00000002), 512 (0200) bytes

 49544712 00085841 4D4E494D 4C4F4F54 59524555 51495447 12000A53 55434F46 FOCUS...GTIQUERYTOOLMINMAX...GTI 000000
 4D4E494D 4C4F4F54 54455349 54471000 0C544E45 5241504C 4F4F5459 52455551 QUERYTOOLPARENT...GTISETTOOLMINM 000020
 574C4F4F 54595245 55514954 4712000E 44414552 48544C4F 4F545F08 00005841 AX..._TOOLTHREAD...GTIQUERYTOOLW 000040
 54534553 49564441 49544712 00104753 4D54534F 50495447 0A000F57 4F444E49 INDOW¯...GTIPOSTMSG...GTIADVISEST 000060
 59524555 51495447 1200124C 4F4F544C 4C494849 54470800 114C4F4F 54545241 ARTTOOL...GTIKILLTOOL...GTIQUERY 000080
 54470C00 14434F52 504¯4F4F 54464544 4954470E 00134C4F 4F54574F 444E4957 WINDOWTOOL...GTIDEFTOOLPROC...GT 0000A0
 54470D00 164C4F4F 54455441 45524349 54475F0E 00154354 49455441 45524349 ICREATEITC..._GTICREATETOOL...GT 0000C0
 55514954 47130018 47534D44 4E455349 54470A00 17435449 454D5553 4E4F4349 ICONSUMEITC...¯GTISENDMSG...GTIQU 0000E0
 50455A49 534C4F4F 54544553 49544711 0019504F 54485345 444C4F4F 54595.'45 ERYTOOLDESKTOP...GTISETTOOLSIZEP 000100
 034E4957 4D500553 4C4C4143 534F4408 00009800 7D001000 0A000100 001A534F OS.........}.....DOSCALLS.PMWIN. 000120
 50414548 594F5254 5345444D 454D0E50 41454845 54414552 434D454D 004D454D MEM.MEMCREATEHEAP.MEMDESTROYHEAP 000140
 45455246 45524148 534D454D 1148434F 4C42434F 4C4C4145 52414853 4D454012 .MEMSHAREALLOCBLOCK.MEMSHAREFREE 000160
 4D454D0F 455A4953 4B434F4C 42595245 55514552 4148534D 4540164B 434F4C42 BLOCK.MEMSHAREQUERYBLOCKSIZE.MEM 000180
 42555359 52455551 53554215 45534142 53554207 54524556 4E4F4345 52414853 SHARECONVERT.BUSBASE.BUSQUERYSUB 0001A0
 32030A01 0601030B 01455449 5257534F 44084F49 5303454D 414E4C4C 44535953 SYSDLLNAME.SIO.DOSWRITE...i....2 0001C0
 03080300 7C030A01 0745030B 01000003 08010000 03000703 0A020183 03080100 ....°....■...........E....|.... 0001E0

Dump of file SATURN:[PCCOMMON.DUMP.DLL]GTI.TMP;1 on 18-APR-1990 10:46:19.71
File ID (691,13,0)   End of file block 41 / Allocated 44

Virtual block number 3 (00000003), 512 (0200) bytes

 00030701 0351030B 0100C403 030105E2 03080101 24030A01 051C0307 CF030868 k..ü.......$....ā....á....Q..... 000000
 01020203 0301003C 03050100 00030901 03C9030B 01006903 06010000 03020100 .........i....è.........<....... 000020
 6F542063 6972656E 65471600 00091B03 08010171 030A0100 8C030701 00CC0305 ..ä....¥....q.........Generic To 000040
 FF00009A D8BEFFFF 881E5657 000000C8 00000000 65636166 7265746E 49206C6F ol Interface....à...WV.¡...Ä.... 000060
 0F000200 0202CAC9 5F5E1F00 00E90001 880006E9 00008800 06E90375 00003DFF .=..u.Ö..¡..Ö..¡..Ö...^_èò...... 000080
 680C76FF D8BEFFFF 881E5657 000002C8 00000000 00000F00 08000200 00000500 ................à...WV.¡...Ä.v.h 0000A0
 C95F5E1F 0000E9FE 4688FE46 89FFFF00 009A0676 FF0876FF 5052990A 46881007 ...F..RP.v..v.......F±.F±Ö...^_è 0000C0
 00000000 00000000 00000000 000F0008 00020000 00070021 00020002 900008CA ò.......!....................... 0000E0
 75000030 F8468904 C483FFFF 009F9A50 16FC468D D8BEFFFF 881E5657 000008C8 à...WV.¡...Ä.F=.P.......á..F½=..u 000100
 97892600 06878926 1916068E 30065E68 FE5688FC 46880095 E9F8468B 0006E903 .Ö...F½Ö...F=.V±k^.0....&....&.. 000120
 006A006A 006A1001 68006A00 00FFFF9A 50529906 4688006A FC76FFFE 76FF0008 ...v±.v=j..F..RP.....j.h..j.j.j. 000140
 006A0876 FF0A76FF 10036806 76FFFA46 89000A9F FF261916 068E3006 5E68006A j.k^.0....&.....F".v.h...v..v.j. 000160
 C4830014 013C9AFC 76FFFE76 FF0014E9 037500F8 7E83F846 89FFFF00 8C9A006A j..¥....F½.~½.u.Ö...v±.v=.<....á 000180
 1F0000E9 F8468800 06E90009 E9000088 0009E903 7400FA7E 830018E9 F8468804 ..F½Ö...~".t.Ö..¡..Ö..Ö...F½Ö... 0001A0
 5EC40027 E90374D0 080000FF FF9A006A D88E0008 881E5657 000020C8 CBC95F5E ^ èùà ..WV.¡...Äj.......Ät.Ö'.á^ 0001C0
 0A77FF26 065EC400 6A000001 399A5052 00060508 56880646 8885590A 47C72606 .ÉúG.Y..F..V....RP.9...j.á^.&.w. 0001E0
```

```
Dump of file SATURN:[PCCOMMON.DUMP.DLL]GTI.TMP;1 on 18-APR-1990 10:46:19.71
File ID (691,13,0)   End of file block 41 / Allocated 44

Virtual block number 4 (00000004), 512 (0200) bytes

 6A006A00 37E90374 D00BFE56 89FC4689 0000FFFF 9A646A00 6A006A00 0001509A .P...j.j.jd......F=.V±.Åt.Õ7.j.j 000000
 6A006A00 0001809A 50520006 05085688 0646880A 47892606 5EC40000 FFFF9A00 ......á^.&.G..F..V....RP.....j.j 000020
 C40277FF 260477FF 26065EC4 0000FFFF 9A0A77FF 26065EC4 006A0000 01F99A00 ..'...j.á^.&.w......á^.&.w.&.w.á 000040
 9A505200 06050856 88064688 0A478926 065EC406 C483FFFF 00009A37 FF26065E ^.&.7......á.á^.&.G..F..V....RP. 000060
 006A006A 006A5016 E2468000 6A006A00 58E90374 000A7F83 26065EC4 0000FFFF ....á^.&.....t.ÕX.j.j..Fã.Pj.j.j. 000080
 E67E8100 00FFFF9A 5016E246 8D006A00 6A003AE9 03750000 300000FF FF9A006A j......=..u.Õ:.j.j..Fã.P......-| 0000A0
 03750000 3006C483 FFFF0000 9AE276FF E476FF37 FF26065E C4001FE9 03741004 ..t.Õ..á^.&.7.vô.vã......á.=..u. 0000C0
 5F5E1F00 00FFFF9A 006A006A 0000FFFF 9AFC76FF FE76FFFF A8E90003 E90003E9 Õ..Õ..Õ´..v±.v•.....j.j.......^_ 0000E0
 9A5016FE 5E868008 76FFFFFF 07C7260A 5EC4088E 00CCB81E 56570002 26C8CBC9 èùà&..WV.¡ä..Äá^.&ú....v...^±.P. 000100
 5016FE5E 86802E6A 016FE985 5E880006 E9037500 FE5CBE83 FE5C8689 0000FFFF ......\±./\±.u.Õ..¡^.Õo.j...^±.P 000120
 8D5016FE 5E868000 80685016 FF5E868D 0007C626 C28ED888 06C48302 8400BE9A ./....á..Å.ô&6....^..Ph....^±.P. 000140
 16FDDA86 8D004268 1E5016FE 5E868000 39E90375 00003D00 00FFFF9A 5016E246 Fã.P.....=..u.Õ9...^±.P.h8...Õ». 000160
 9A006A00 6A005868 1E5016F0 DA868000 6A006A01 6A006A0C C483FFFF 003E9A50 P.>....á.j.j.j.j...Õ».P.hX.j.j.. 000180
 03750000 300000FF FF9A5016 E4468D01 6A006AE2 76FF00F0 E9855A88 0000FFFF ....¡Z.Õ»..vâj.j..FÕ.P.....=..u. 0001A0
 30E85E68 064688E8 4689FFFF 00009A00 D6E98558 880000FF FF9AE276 FF000EE9 Õ...vã.....¡{.Õ•.......FÕ.F.k^ÒO 0001C0
 5E680024 87892600 26578926 00008819 16068E30 E85E6800 04878926 1916068E ....&....k^ÒO....¡..&..&.&..$.k^ 0001E0

Dump of file SATURN:[PCCOMMON.DUMP.DLL]GTI.TMP;1 on 18-APR-1990 10:. ':19.71
File ID (691,13,0)   End of file block 41 / Allocated 44

Virtual block number 5 (00000005), 512 (0200) bytes

 89261916 068E30E8 5E68E246 88002887 8926002A 87892600 00881916 068E30E8 ÒO....¡..&..*.&..(..Fãk^ÒO....&. 000000
 16068E30 E85E68E6 5688E446 88000087 89261916 068E30E8 5E680846 88000287 ....F.k^ÒO....&.....FÕ.V|k^ÒO... 000020
 00188789 26191606 8E30E85E 68F84688 0000F846 C7000C97 8926000A 87892619 .&....&....úF½...F½k^ÒO....&.... 000040
 06C48301 6800009A E876FFDE 76FFE076 FF001EE9 F84688E0 568CDE46 890E468D .F..F8.VÅ.F½Õ...vÅ.v8.vÒ...h..á. 000060
 078926E8 46880A5E C4FFF0E9 FFD8E903 75C00800 0AE9000D E90010E9 FE5C8689 ..\±Õ..Õ..Õ...áu.ÕU.Õ▸.á^..FÕ&.. 000080
 010300F6 00020003 010300F3 00020122 01030016 CBC95F5E 1F0000E9 FE5C8688 ..\±Õ...^_èù...."...µ...£...-... 0000A0
 01030000 000402D4 00020005 00010101 01030000 0003037B 000200F7 00020142 B...%...(................å....... 0000C0
 00020000 00070085 00020088 000202A0 01030000 000601D6 0002008D 000100F3 µ.......ø......................... 0000E0
 01030000 00000243 0002001E 00020051 01030085 00040220 02030000 0008009C ........ .......Q.......C....... 000100
 01030000 000F020A 0002002E 000102C7 0103002D 00010287 0103002C 00010265 e...,...ñ...-...ú............... 000120
 00000044 000201B9 01030041 000201A3 0103003B 000201F0 0103003A 0002010C ....:...Þ...;...È...A...¿...D... 000140
 0011E903 74010012 BF832619 18068E30 00661E68 D88EFFFF B81E5657 000000C8 à...WV.¡...Ak.f.O....&.¢...t.Õ.. 000160
 01001287 C7261918 068E3000 661E68FF D8E90066 1689F9F7 00648999 400066A1 Åf.@.¿d.%'..f.ÕU.k.f.O....&ú.... 000180
 30065E68 D88E0008 B81E5657 000000C8 CBC95F5E 1F0000E9 006606FF 0066A100 .Åf...f.Õ...^_èùà...WV.¡...Äk^.0 0001A0
 FF067E83 D88E0058 B81E5657 000000C8 CBC95F5E 1F000000 1287C726 1918068E ....&ú......^_èùà...WV.¡X..Å.-.. 0001C0
 06E90374 010012BF 83261918 068E3006 5E680019 E9037C64 067E8300 22E9037F ..Õ"..~.d|.Õ.¯k^.0....&.¢...t.Õ. 0001E0

Dump of file SATURN:[PCCOMMON.DUMP.DLL]GTI.TMP;1 on 18-APR-1990 10:46:19.71
File ID (691,13,0)   End of file block 41 / Allocated 44

Virtual block number 6 (00000006), 512 (0200) bytes

 00000000 0000000F 00780002 0001CBC9 5F5E1F00 00E90000 B80003E9 0001B800 .¡..Õ..¡..Õ...^_èù....x......... 000000
 C8CBC95F 5E1F0000 E90000FF FF9A1A06 681E016A D88EFFFF B81E5657 000000C8 à...WV.¡...Äj..ħ.......Õ...^_èùà 000020
 00000CC8 CBC95F5E 1F0000E9 0000FFFF 9A1A0636 FFD88E00 08881E56 57000000 ...WV.¡...Ä.6.......Õ...^_èùÃ... 000040
 0006E903 7500003D F44689FF FF00079A 5016FA46 8D1276FF D88E0027 B81E5657 WV.¡'..Ä.v..F'.P.■....F¶=¯.u.Õ.. 000060
 E9037500 00300000 FFFF9A50 16FC468D 0A76FFFA 76FF1A06 36FF005F E9F44688 .F¶Õ¯..6...v'.v..F•.P.....=..u.Õ 000080
 76FF1076 FF0A76FF 0000FFFF 9A5016F6 468DFC76 FFFE76FF 0030E985 61880006 ..¡■.Õ=..v±.v•.F-.P......v..v..v 0000A0
 B8025789 26078926 FE5688FC 4688065E C40AC483 FFFF00EC 9AF676FF F876FF0E ..v%.v-.š....á.á^..F•.V±&..&.W.¡ 0000C0
 03750846 08064688 088E0044 B81E5657 000006C8 000ECAC9 5F5E1F00 00E90000 ..Õ...^_èò..à...WV.¡D..Ä.F..F.u. 0000E0
 46E98561 B80006E9 03750000 30000000 949A5016 FA468D0A 76FF0C76 FF0045E9 ÕE..v..v¯..F'.P.....=..u.Õ..¡■.ÕF 000100
 0676FF08 76FFFA76 FFFC76FF FE76FF00 00FFFF9A 5016FE46 8D0A76FF 0C76FF00 ..v..v..F±.P......v±.v•.v'.v..v. 000120
 06E98561 B80006E9 03750000 300000FF FF9A0A76 FF0C76FF 0AC48300 AA00EC9A .š.ˆ..á..v..v......=..u.Õ..¡■.Õ. 000140
 03000000 0A005300 02006000 0300EF02 03000908 CAC95F5E 1F0000E9 00008800 .¡..Õ...^_èò.....ÿ...m...S...... 000160
 03000000 0F000400 02002200 03003002 03000000 0D012300 02001400 03001302 .........¶.......Õ..."...å...... 000180
 00000000 00000000 00005600 03010002 03004400 03012F02 03003100 03007602 .v...1.../...D.......V.......... 0001A0
 FE468D0A 76FF04C4 83FFFF01 3C9A0676 FF0876FF D88EFFFF B81E5657 000002C8 à...WV.¡...Ä.v..v..<....á..v..F± 0001C0
 006A006A 5052990A 46881005 68FE76FF 0015E903 75FFFE7E 83FFFF01 249A5016 .P.$....-±.u.Õ...v±h...F..RPj.j. 0001E0
```

```
Dump of file SATURN:[PCCOMMON.DUMP.DLL]GTI.TMP;1 on 18-APR-1990 10:46:19.71
File ID (691,13,0)   End of file block 41 / Allocated 44

Virtual block number 7 (00000007), 512 (0200) bytes

C0180100 188F8326 191A068E 300A5E68 02C483FF FF00509A 0A76FFFF FF00009A ......v..P....á.k^.0....&.e....á 000000
02C48300 4800709A 0876FF08 8E000888 1E565700 0002C8C8 C95F5E1F 0000E940 ãÕ...^_èùà...WV.¡...Ä.v..p.K..á. 000020
4300BC9A 006A006A 006A006A 10046808 76FF001C E9855C88 0006E903 7400003D =..t.Õ..¡\.Õ...v.h..j.j.j.j...C 000040
009F0002 00000004 00780002 00059000 04CAC95F 5E1F0000 E9FE4688 FE468900 ..F±.F±Õ...^_èò.......(......... 000060
00000000 0000000F 00710002 0000000A 00250002 00000008 00150002 00000007 ..............x.......q......... 000080
880006E9 03740000 3002C483 FFFF0070 9A1076FF D88EFFFF 881E5657 000006C8 à...WV.¡...Ä.v..p....á.=..t.Õ..¡ 0000A0
30105E68 002CE903 75002687 08260024 87882619 1C068E30 105E6800 90E9855C \.Õ..k^.0....&..$.&..&.u.Õ,.k^.0 0000C0
008A9A06 76FF0876 FF0A76FF 0C76FF0E 76FF0024 87FF2600 2687FF26 191C068E ....&.ñ&.&.ñ$..v..v..v..v..v.... 0000E0
0C76FF0E 76FF0006 87FF2600 0887FF26 191C068E 30105E68 0029E9FA 46890000 ...F*Õ).k^.0....&.ñ..&.ñ...v..v. 000100
FF9A006A 006A0015 E9037400 FA7E83FA 46890000 FFFF9A06 76FF0876 FF0A76FF .v..v..v.......F*.-*.t.Õ..j.j... 000120
000002C8 000CCAC9 5F5E1F00 00E90000 880006E9 FC4688FE 5689FC46 890000FF ....F•.V±.F•Õ..¡..Õ...^_èò..à... 000140
72E9855C 880006E9 03740000 3002C483 00120070 9A1076FF D88E0008 881E5657 WV.¡...Á.v..p....á.=..t.Õ..¡\.Õr 000160
191C068E 30105E68 002CE903 75002687 08260024 87882619 1C068E30 105E6800 .k^.0....&..$.&..&.u.Õ,.k^.0.... 000180
46890000 01469A06 76FF0876 FF0A76FF 0C76FF0E 76FF0024 87FF2600 2687FF26 &.ñ&.&.ñ$..v..v..v..v..v..F....F 0001A0
FF0A76FF 0C76FF0E 76FF0006 87FF2600 0887FF26 191C068E 30105E68 0029E9FE ±Õ).k^.0....&.ñ..&.ñ...v..v..v.. 0001C0
02009F01 0300050C CAC95F5E 1F0000E9 FE4688FE 46890000 FFFF9A06 76FF0876 v..v.......F±.F±Õ...^_èò........ 0001E0

Dump of file SATURN:[PCCOMMON.DUMP.DLL]GTI.TMP;1 on 18-APR-1990 10:46:19.71
File ID (691,13,0)   End of file block 41 / Allocated 44

Virtual block number 8 (00000008), 512 (0200) bytes

02005E01 03003000 02011A01 03000000 0F00C400 02000000 0400CE00 0200F300 .µ...ö.......á...........=...^.. 000000
000E7E81 D88EFFFF 881E5657 000006C8 00000000 00000000 00000000 00004500 .E..............à...WV.¡...Ä.-.. 000020
0000FFFF 9A0676FF 0876FF0A 76FF0C76 FF0E76FF 1076FF12 76FF001D E9037210 .r.Õ...v..v..v..v..v..v......... 000040
FF0A76FF 0C76FF0E 76FFFE76 FFFE4689 0000FFFF 9A006A10 76FF1276 FF0065E9 Õe..v..v.j........F±.v±.v..v..v.. 000060
E9037410 040E7E81 FC5689FA 4689000A 9FFF2619 1E068E30 FE5E6806 76FF0876 v..v.k^±0....&.....F*.V•.-...t.Õ 000080
8806C483 FFFF0000 9A0024B7 FF260026 87FF2619 1E068E30 FE5E68FE 76FF001D ...v±k^±0....&.ñ&.&.ñ$.......á.. 0000A0
FF006A00 6AD88E00 08881E56 57000008 C8000ECA C95F5E1F 0000E9FC 5688FA46 F*.V•Õ...^_èò..à...WV.¡...Áj.j.. 0000C0
008236FF 026A006A 0000FFFF 9A046A00 6A006AFF FF68FFFF 68008036 FF008236 6...6..h..ħ..j.j.j......j.j..6.. 0000E0
006A006A 036A006A 006A006A 006A006A 006A006A 006A006A 0084681E 008036FF .6...h..j.j.j.j.j.j.j.j.j.j.j.j. 000100
006A006A 0015E903 74FA4608 F84688FA 5689F846 890000FF FF9A006A 006A006A j.j.j.......F½.V*.F½.F*t.Õ..j.j. 000120
57892607 8926FA56 88F84688 065EC400 16E9FC46 88FE5689 FC468900 00FFFF9A ......F•.V±.F•Õ..á^..F½.V*&..&.W 000140
FF9A0676 FF0876FF D88E00A7 881E5657 000000C8 CBC95F5E 1F0000E9 00008802 .¡..Õ...^_èùà...WV.¡!..Ä.v..v... 000160
5F5E1F00 00E90000 880006E9 00000111 9A006A00 6A000CE9 03740000 300000FF ...=..t.Õ..j.j......Õ..¡..Õ...^_ 000180
0000FFFF 9A5016C0 4680406A 0676FF08 76FFD88E 0144881E 56570000 40C8C8C9 èùàa..WV.¡D..Ä.v..v.ja.Fá.P....- 0001A0
00E908F7 C01801F9 83C88808 C483FFFF 00109A50 16C0468D 008036FF 008236FF .6...6...Fá.P......á..à.*..à¥ÄÕ. 0001C0
00030002 00C40103 00F30002 01600103 00000008 00880005 000CC8C9 5F5E1F00 ..^_èù....E.......'...µ...á..... 0001E0

Dump of file SATURN:[PCCOMMON.DUMP.DLL]GTI.TMP;1 on 18-APR-1990 10:46:19.71
File ID (691,13,0)   End of file block 41 / Allocated 44

Virtual block number 9 (00000009), 512 (0200) bytes

00000006 008A0002 00070002 014F0103 00060002 00F70103 00040002 018C0103 ..........¼.......O............. 000000
0000000F 017A0002 00000000 01A00002 001F0002 003C0103 00000008 00880002 ..¡.......<................z..... 000020
E90E468B D88EFFFF 881E5657 000000C8 00000000 00000000 00820002 002C0103 ..,...ý.........à...WV.¡...Ä.F.Õ 000040
39E90045 E999FFFF 00CC9A00 6A006A06 76FF0876 FF004FE9 0052E900 55E90037 7.ÕU.ÕR.ÕO..v..v.j.j..ä....ÕE.Õ9 000060
7600063D 10012000 21E90024 E90030E9 00008A00 01880039 E900008A 00008800 .¡..¤..Õ9.¡..¤..Õ0.Õ$.Õ!.-..=..v 000080
00008A00 00880018 002E0018 00150012 003A0031 005CA7FF 2E93C003 FFEFE903 .Õý..à...Ï\.1.:............¡..¤.. 0000A0
00000000 00000000 0F000800 02000000 05002800 0200020C CAC95F5E 1F0000E9 Õ...^_èò.....(.................. 0000C0
880006E9 03740000 3002C483 FFFF0070 9A0C76FF D88EFFFF 881E5657 000000C8 à...WV.¡...Á.v..p....á.=..t.Õ..¡ 0000E0
76FFD88E 0008881E 56570000 00C80008 CAC95F5E 1F0000E9 00008800 06E9855C \.Õ..¡..Õ...^_èò..à...WV.¡...Ä.v 000100
0A5E6808 56880646 88001EE9 855C8800 06E90374 00003002 C4830012 00709A0A ..p....á.=..t.Õ..¡\.Õ...F..V.k^. 000120
000000C8 0006CAC9 5F5E1F00 00E90000 88002A97 89260028 87892619 20068E30 0.. .&..(.&..*.¡..Õ...^_èò..à... 000140
02C48300 4400709A 0A76FF07 89260247 89260000 88065EC4 D88E003A 881E5657 WV.¡:..Äá^.¡..&.G.&...v..p.D..á. 000160
002A9788 26002887 89261920 068E300A 5E680022 E9855C88 0006E903 7400003D =..t.Õ..¡\.Õ".k^.0.. .&..(.&..*. 000180
84881E56 57000000 C80006CA C95F5E1F 0000E900 00880257 89260789 26065EC4 á^.&..&.W.¡..Õ...^_èò..à...WV.¡. 0001A0
5C880006 E9037400 003002C4 83009800 709A0A76 FF000007 C726065E C4D88E00 ..Äá^.&ú....v..p....á.=..t.Õ..¡\ 0001C0
5F5E1F00 00E90000 88078926 065EC400 00878826 1920068E 300A5E68 0019E985 .Õ..k^.0.. .&....á^.&..¡..Õ...^_ 0001E0
```

Dump of file SATURN:[PCCOMMON.DUMP.DLL]GTI.TMP;1 on 18-APR-1990 10:46:19.71
File ID (691,13,0)   End of file block 41 / Allocated 44

Virtual block number 10 (0000000A), 512 (0200) bytes

```
00F10070 9A0A76FF FFFF07C7 26065EC4 D88E000F 881E5657 000000C8 0006CAC9 èò..à...WV.¡Ô..Äó^.&ú....v..p.þ. 000000
5EC40004 878B2619 20068E30 0A5E6800 19E9855C B80006E9 03740000 3002C483 .ó.=..t.Ô..¡\.Ô..k^.0.. .&....ó^ 000020
065EC4D8 8E012C88 1E565700 0002C800 06CAC95F 5E1F0000 E9000088 07892606 .&..¡..Ô...^_èò..à...WV.¡,..Äó^. 000040
5E68002E E9855C88 0006E903 7400030D 02C48301 3E00709A 0A76FFFF FF07C726 &ú....v..p.>..ó.=..t.Ô..¡\.Ô..k^ 000060
065EC4FF E1E90A46 89FE4688 0009E903 7540FE46 89000487 88261920 068E300A .0.. .&.....F±@u.Ô...F±.F.ÔÄ.ó^. 000080
00020000 00040188 00020002 900006CA C95F5E1F 0000E900 00880789 260A4688 .F.&..¡..Ô...^_èò............... 0000A0
FF1276FF D88EFFFF 881E5657 000010C8 00000000 00000000 00000000 000F0179 y...............à...WV.¡...Ä.v.. 0000C0
480E7E83 FFFF03C9 9A5016FE 46801076 FF1276FF 002A03C9 9A5016FE 46801076 v..F±.P.è.*..v..v..F±.P.è....~.K 0000E0
037500F0 7E830046 E9037400 003DFFFF 01719A50 16F0468D FE76FF00 5BE90374 t.Ô[..v±.Fþ.P.q...=..t.ÔF..~þ.u. 000100
24B7FF26 002687FF 26192206 8E30F05E 68F85689 F646890C 5688OA46 88003DE9 Ô=..F..V..F-.V½k^þ0..".&.ñ&.&.ñ$ 000120
0090E900 0E9FFF26 1922068E 30F05E68 0676FF08 76FF0A76 FF0C76FF 0E76FF00 ..v..v..v..v..v.k^þ0..".&....Ô.. 000140
FF0E76FF 002487FF 26002687 FF261922 068E30FE 5E680031 E9037210 000E7E81 .~...r.Ô1.k^±0..".&.ñ&.&.ñ$..v.. 000160
76FFFE76 FF0055E9 000E9FFF 26192206 8E30FE5E 680676FF 0876FF0A 76FF0C76 v..v..v..v.k^±0..".&....ÔU..v±.v 000180
FC5689FA 4689000A 9FFF2619 22068E30 FE5E6806 76FF0876 FF0A76FF 0C76FF0E ..v..v..v..v.k^±0..".&.....F*.V• 0001A0
9A0024B7 FF260026 87FF2619 22068E30 FE5E68FE 76FF0010 E9037410 040E7E81 .~...t.Ô...v±k^±0..".&.ñ&.&.ñ$.. 0001C0
08881E56 57000040 C8000ECA C95F5E1F 0000E9FC 5688FA46 8806C483 FFFF0000 .....ó..F*.V•Ô...^_èò..à@..WV.¡. 0001E0
```

Dump of file SATURN:[PCCOMMON.DUMP.DLL]GTI.TMP;1 on 18-APR-1990 10:46:19.71
File ID (691,13,0)   End of file block 41 / Allocated 44

Virtual block number 11 (0000000B), 512 (0200) bytes

```
4680003C E9037423 C07E8000 00FFFF9A 5016C046 80406A06 76FF0876 FFD88E00 ..Ä.v..v.j@.Fà.P......-ó#t.Ô<..F 000000
0001949A 80086806 76FF0876 FF0027E9 03740001 3004C483 FFFF003A 9A5016C1 è.P.:....ó.=..t.Ô'..v..v.h...... 000020
0676FF08 76FF0024 E90027E9 0000B800 06E90030 E9000188 0009E903 75000800 ..Äu.Ô..¡..Ô0.Ô..¡..Ô'.Ô$..v..v. 000040
5E1F0000 E9000088 0006E900 09E90001 B80009E9 03750008 0000FFFF 9AB00868 h.........Äu.Ô..¡..Ô..Ô..¡..Ô...^ 000060
E9037400 003002C4 83FFFF00 709A0A76 FFD88E01 2F881E56 5700000A C8C8C95F _èúà...WV.¡/..Ä.v..p....ó.=..t.Ô 000080
00269789 26002487 89261922 068E300A 5E680856 88064688 0172E985 5C880006 ..¡\.Ôr..F..V.k^.0..".&..$.&..&. 0000A0
9A800868 0676FFC 76FF0023 E9037500 003D04C4 83026101 279A0676 FF0876FF .v..v..'.a..ó.=..u.Ô#..v..v.h... 0000C0
68085688 0646880 18E90016 97892600 14878926 1922068E 300A5E68 00000308 ....k^.0..".&....&....Ô...F..V.k 0000E0
46890000 FFFF9AFD 6A0676FF 0876FF00 16978926 00148789 26192206 8E300A5E ^.0..".&....&.....v..v.j»......F 000100
F4680676 FF0876FF 0023E903 75026FFC 7E81000A E9037402 72FA7E81 FC5689FA *.V•.-*r.t.Ô...-•o.u.Ô#..v..v.h¶ 000120
8E300A5E 68001097 8926000E 87892619 22068E30 0A5E6800 00FFFF9A FFFF6802 .h.......k^.0..".&....&....k^.0. 000140
00008819 22068E30 0A5E6804 C483FFFF 013C9A00 0687FF26 000887FF 26192206 .".&.ñ..&.ñ...<.....ó.k^.0..".¡.. 000160
0375FFFE 7E83FE46 89000487 88261922 068E300A 5E680006 87892600 08878926 &....&....k^.0..".&.....F±.-±.u. 000180
76FFF876 FFF85689 F6468900 26978826 00248788 26192206 8E30FE5E 680045E9 ÔE.k^±0..".&..$.&..&..F-.V½.V½.v 0001A0
89000001 609A8008 68F676FF F876FF00 14E90375 00003004 C483001A 01279AF6 -.'.....ó.=..u.Ô...V½.v-h...m.... 0001C0
016AF676 FFF876FF 0676FF08 76FF0000 F846C700 01F646C7 000AE9F8 5689F646 F-.V½Ô..úF-..úF½...v..v..V½.v-j. 0001E0
```

Dump of file SATURN:[PCCOMMON.DUMP.DLL]GTI.TMP;1 on 18-APR-1990 10:46:19.71
File ID (691,13,0)   End of file block 41 / Allocated 44

Virtual block number 12 (0000000C), 512 (0200) bytes

```
06CAC95F 5E1F0000 E9000088 0000FFFF 9A006A00 6A0676FF 0876FF00 00FFFF9A ......v..v.j.j......¡..Ô...^_èò. 000000
00709A0A 76FF0789 26024789 26000088 065EC4D8 8E018888 1E565700 0000C800 .à...WV.¡E..Äó^.¡..&.G.&...v..p. 000020
00248788 26192206 8E300A5E 68003FE9 855CB800 06E90374 00003002 C48301C5 é..ó.=..t.Ô..¡\.Ô?.k^.0..".&..$. 000040
97882600 24878826 1922068E 300A5E68 0022E985 60880006 E9037400 26870826 &..&.t.Ô..¡'.Ô".k^.0..".&..$.&.. 000060
1E565700 000AC800 06CAC95F 5E1F0000 E9000088 02578926 07892606 5EC40026 &.ó^.&..&.W.¡..Ô...^_èò..à...WV. 000080
03750000 3004C483 01F90127 9A0A76FF 0C76FFFF FF07C726 065EC4D8 8E035988 ¡Y..Äó^.&ú....v..v..'.*..ó.=..u. 0000A0
0C5688OA 4688000C E9FE5689 FC468900 0002109A 8008680A 76FF0C76 FF0017E9 Ô...v..v.h........F•.V±Ô...F..V. 0000C0
068E30FA 5E680047 E9037264 FA7E83FA 46FF0003 E90000FA 46C7FE56 89FC4689 .F•.V±úF*..Ô...F*.-*dr.ÔG.k^*0.. 0000E0
00148739 26192206 8E30FA5E 68FE5688 FC468800 31E90374 0100128F 83261922 ".&.¢...t.Ô1..F•.V±k^*0..".&9... 000100
ADE900A7 E9000088 078926FA 4688065E C4000FE9 03740016 97392600 19E90374 t.Ô..&9...t.Ô..ó^..F*&..¡..Ô1.ÔÜ 000120
5689F646 89000005 029A006A 056A0A76 FF0C76FF 0093E903 750C4608 0A4688FF ..F..F.u.Ô...v..v.j.j.......F-.V 000140
0047E903 7264FA7E 83FA46FF 0003E900 00FA46C7 005BE903 75F84608 F64688F8 ½.F-.F½u.Ô[.úF*..Ô...F*.-*dr.ÔG. 000160
22068E30 FA5E68F8 5688F646 880031E9 03740100 128F8326 1922068E 30FA5E68 k^*0..".&.¢...t.Ô1..F-.V½k^*0.." 000180
00880789 26FA4688 065EC400 0FE90374 00169739 260019E9 03740014 87392619 .&9...t.Ô..&9...t.Ô..ó^..F*&..¡. 0001A0
88FF62E9 0C56890A 46890000 FFFF9A00 6A056A0A 76FF0C76 FFFFADE9 0021E900 .Ô1.ÔÜ..v..v.j.j.......F..V.Ôb.¡ 0001C0
000007C7 26065EC4 D88E0301 881E5657 000018C8 0008CAC9 5F5E1F00 00E9855F _.Ô...^_èò..à...WV.¡1..Äó^.&ú... 0001E0
```

```
Dump of file SATURN:[PCCOMMON.DUMP.DLL]GTI.TMP;1 on 18-APR-1990 10:46:19.71
File ID (691,13,0)    End of file block 41 / Allocated 44

Virtual block number 13 (0000000D), 512 (0200) bytes

22068E30 0A5E6800 92E9855C 880006E9 03740000 3002C483 03700070 9A0A76FF .v..p.p..á.=..t.Õ..¡\.Õ..k^.0..ª 000000
FF261922 068E300A 5E680075 E98560B8 0006E903 74002687 08260024 87882619 .&..$.&..&.t.Õ..¡'.Õu.k^.0..ª.&. 000020
006A0015 E9037400 E87E83E8 46890000 FFFF9A50 16EA468D 002487FF 26002687 ñ&.&.ñ$..Fõ.P......FÒ.-Ò.t.Õ..j. 000040
065EC400 08E90375 0400EA46 F70038E9 FC4688FE 5689FC46 890000FF FF9A006A j.......F=.V±.F=Õß.%Fõ..u.Õ..á^. 000060
065EC400 08E90001 07C72606 5EC40008 E9037508 00EA46F7 001DE900 0007C726 &ú...Õ..%Fõ..u.Õ..á^.&ú...Õ..á^. 000080
76FFD88E 0524881E 56570000 1CC80006 CAC95F5E 1F0000E9 00008800 0207C726 &ú...|..Õ...^_èò..à...WV.¡$..Ã.v 0000A0
26192206 8E30085E 6800C3E9 855C8800 06E90374 00003002 C4830536 00709A08 ..p.6..á.=..t.Õ..¡\.Õù.k^.0..ª.& 0000C0
00E646C7 009EE985 60880006 E90374D0 08FE5689 FC468900 26978826 00248788 ..$.&..&..F=.V±.Ât.Õ..¡'.Õ..úF|. 0000E0
4E810000 FFFF9A00 6A006A50 16E6468D FC76FFFE 76FF001C E9037400 067E8300 ..~..t.Õ...v±.v=.F|.Pj.j.......N 000100
810000FF FF9A5016 E6468DFC 76FFFE76 FF0018E9 03740106 7E83002F E90400E6 |..Õ/..-..t.Õ...v±.v=.F|.P...... 000120
FF036A00 6AFC76FF FE76FF10 00E646C7 0005E903 7402067E 83000EE9 0800E64E N|..Õ...~..t.Õ..úF|...v±.v=j.j.. 000140
6A00!5E9 037400E4 7E83E446 890000FF FF9AE676 FFE876FF EA76FFEC 76FFEE76 vŸ.vš.vò.vò.v|......FÒ.-Õ.t.Õ..j 000160
04CAC95F 5E1F0000 E90000B8 0006E9F8 468BFA56 89F84689 00000593 9A006A00 .j.......F%.V".F½Õ..|..Õ...^_èò. 000180
02C48305 F400709A 0A76FF00 0007C726 065EC408 8E05EAB8 1E565700 0000C800 .à...WV.¡õ..Áá^.&ú....v..p.¶..á. 0001A0
00268708 26002487 88261922 068E300A 5E680040 E9855C88 0006E903 74000030 =..t.Õ..¡\.Õa.k^.0..ª.&..$.&..&. 0001C0
FFFF9A00 24B7FF26 u02687FF 26192206 8E300A5E 680023E9 85608800 06E90374 t.Õ..¡'.Õ#.k^.0..ª.&.ñ&.&.ñ$.... 0001E0

Dump of file SATURN:[PCCOMMON.DUMP.DLL]GTI.TMP;1 on 18-APR-1990 10:46:19.71
File ID (691,13,0)    End of file block 41 / Allocated 44

Virtual block number 14 (0000000E), 512 (0200) bytes

8E060988 1E565700 0006C800 06CAC95F 5E1F0000 E9000088 07892606 5EC40000 ..á^.&..|..Õ...^_èò..à...WV.¡).. 000000
068E3008 5E68005E E9855C88 0006E903 74000030 02C48306 E800709A 0876FFD8 Ã.v..p.Š..á.=..t.Õ..¡\.Õ^.k^.0.. 000020
26192206 8E30085E 680041E9 85608800 06E90374 00268708 26002487 88261922 ª.&..$.&..&.t.Õ..¡'.ÕA.k^.0..ª.& 000040
6A006A00 15E90374 00FA7E83 FA468900 00FFFF9A 0676FF00 2487FF26 002687FF .ñ&.&.ñ$..v.......Fª.-ª.t.Õ..j.j 000060
C80004CA C95F5E1F 0000E900 00880006 E9FC4688 FE5689FC 46890000 06849A00 ..Ç....F=.V±.F=Õ..|..Õ...^_èò..à 000080
5C880006 E9037400 003002C4 83075700 709A0676 FFD88E07 40881E56 57000004 ...WV.¡M..Ã.v..p.W..á.=..t.Õ..¡\ 0000A0
08FC4688 FE5689FC 46890026 97882600 24878826 1922068E 30065E68 0070E985 .Õp.k^.0..ª.&..$.&..&..F=.V±.F=. 0000C0
03750000 3004C483 03E60127 9AFC76FF FE76FF00 47E98560 880006E9 0374FE46 F±t.Õ..¡'.ÕG..v±.v=.'.|..á.=..u. 0000E0
6A000FE9 0000085A 9A505200 0003FD9A 800868FC 76FFFE76 FF016A00 6A001CE9 Õ..j.j..v±.v=h...=...RP.Z...Õ..j 000100
57000018 C80002CA C95F5E1F 0000E900 00880000 FFFF9AFC 76FFFE76 FF016A00 .j..v±.v=.....|..Õ...^_èò..à...W 000120
0084E985 5C880006 E9037400 003002C4 8307E100 709A1A76 FFD88E07 D7881E56 V.¡=..Ã.v..p.Ã..á.=..t.Õ..¡\.Õ.. 000140
1A5E6800 67E98560 880006E9 03740026 87082600 24878826 1922068E 301A5E68 k^.0..ª.&..$.&..&.t.Õ..¡'.Õg.k^. 000160
00E87E83 E8468900 00057E9A 5016EA46 800024B7 FF260026 87FF2619 22068E30 0..ª.&.ñ&.&.ñ$..Fõ.P.~....FÒ.-Ò. 000180
F2468816 5EC4002A E9FC4688 FE5689FC 46890000 07829A00 6A006A00 15E90374 t.Õ..j.j..ÿ....F=.V±.F=Õ*.á^..F. 0001A0
00880789 26EC4688 0A5EC407 8926EE46 880E5EC4 078926F0 4688125E C4078926 &..á^..Fb&..á^..FŸ&..á^..F$&..|. 0001C0
9A1276FF 0000FE46 C7D88E08 73881E56 5700000C C80016CA C95F5E1F 0000E900 .Õ...^_èò..à...WV.¡s..ÃúF±...v.. 0001E0

Dump of file SATURN:[PCCOMMON.DUMP.DLL]GTI.TMP;1 on 18-APR-1990 10:46:19.71
File ID (691,13,0)    End of file block 41 / Allocated 44

Virtual block number 15 (0000000F), 512 (0200) bytes

87882619 22068E30 125F6800 E5E9855C 880006E9 03740000 3002C483 09880070 p....á.=..t.Õ..¡\.Õ|.k^.0..ª.&.. 000000
F601FE4E 830004E9 03750206 46F600C8 E98560B8 0006E903 74002687 08740024 $.&..&.t.Õ..¡'.Õà.-F..u.Õ...N±.- 000020
02C48308 7000709A 0876FF00 52E90375 010646F6 02FE4E83 0004E903 7504 46 F..u.Õ...N±.-F..u.ÕR..v..p.)..á. 000040
00268708 26002487 88261922 068E3008 5E68008C E9855C88 0006E903 74000 3D =..t.Õ..¡\.Õ..k^.0..ª.&..$.&..&. 000060
F6468900 26978826 00248788 26192206 8E30085E 68006FE9 85608800 06E903/4 t.Õ..¡'.Õo.k^.0..ª.&.ñ&.&.ñ$..F- 000080
FFF676FF F876FF00 24B7FF26 002687FF 26192206 8E30125E 6802FE4E 83F85689 .V%.N±.k^.0..ª.&.ñ&.&.ñ$..v%.v-. 0000A0
6A0015E9 037400F4 7E83F446 89000006 9F9AFE76 FF0A76FF 0C76FF0E 76FF1076 v..v..v..v..v±......F¶.-¶.t.Õ..j 0000C0
0ECAC95F 5E1F0000 E9000088 0006E9FA 4688FC56 89FA4689 0000080A 9A006A00 .j..Õ....Fª.V=.FªÕ..|..Õ...^_èò. 0000E0
01120002 00040002 01410103 00000004 09320002 00F30002 0A140103 00179000 ..........#...2.......A......... 000100
07900103 01000002 024A0103 000A0002 08C50103 00080002 09FF0103 00000006 .............é.......J.......... 000120
08410103 00920002 064A0103 00000008 02A00002 000F0002 072E0103 00000002 .....................J.......A. 000140
03400103 0000000A 00400002 00170002 03310103 00930002 06680103 00130002 ......k.......1.......a.......a. 000160
02750103 0000000D 01560002 00000008 08260002 00190002 04870103 00180002 ...............&.......V.......u. 000180
00000000 00000008 02570005 004D0002 08480103 0000000F 09230002 00250002 ..X...#.......H...M...W......... 0001A0
0000000F 00020002 00000001 000A0002 0002CB1F FFFF0000 9A57D88E FFFFB81E .|...ÄW......ù.................. 0001C0
C0330A7E C40676C5 1EDE88D7 88EC8855 00000000 00000000 00000000 00000000 ................U.Š.a.B.év.á-.3à 0001E0
```

Dump of file SATURN:[PCCOMMON.DUMP.DLL]GTI.TMP;1 on 18-APR-1990 10:46:19.71
File ID (691,13,0)   End of file block 41 / Allocated 44

Virtual block number 16 (00000010), 512 (0200) bytes

16C8000D 07E900C8 5DFA88F3 881FFFFF 10C01805 74A6F3F9 28D1F7AE F2FFFF89 ¿...ÜÑl+¹µlt..à.....µ.¹}ù.Õ...à. 000000
4688420A 47C626F8 5EC4FE56 8CFC4689 0E4680FA 568CF846 89EC468D 56570000 ..WV.F&.F%.V°.F..F•.Vzé^½&6G.8.F 000020
0C76FFFC 76FF1C7F FF0447C7 26025789 26078926 08578926 06478926 08568806 ..V.&.G.&.W.&..&.W.&úG.....v•.v. 000040
07FF263F 8826C02A 1278044F FF26F85E C4F0880C C48300B3 02C09A53 060A76FF .v..S.à.°..à..Þá^½&.O.x.*à&.7&.. 000060
8855C8C9 5F5EC688 06C483FF FF014A9A 006A53FA 76FF900F E8058826 02478E26 &.G.&..Š...v°Sj..J....á..ó^_èùU. 000080
FF330474 0538264F AEF2F888 0A468AD9 F741AEF2 FFFFB9C0 330F8806 7EC457EC &Wá-..Õ3à¿...ÛAK1.F..«·ÛO&8¯t.3. 0000A0
48C18806 7EC40A76 C556571E 4EE30E4E 88EC8855 00C850E5 885FC28C C788C78E .ú.ú.õ_.[]ù.U.&.N.DN.WVév.á~..èH 0000C0
A5F3E9D1 C1289140 C203C323 D818C228 D2F7D688 C203C323 D818C228 D2F7D788 .øX@+õ¯ÛWù.õ.øX@+õ.ÛWù.õ@.+è1ÕµÉ 0000E0
5E8EE8C0 8E012E05 C08CC775 FF08D88E FFFF0508 8C0775F6 0818E391 A4F3C913 .èµÉ.D..~u..Ä....Ä..uú.à....àS/^ 000100
082DC388 FA4689E4 2A08478A 26085EC4 56570000 08C8C850 08568806 46881F5F _..F..V.]ùà...WVá^.&.G.*õ.F°.ù-Ä 000120
0A47F626 0774830A 47F626F8 468910CC 05E0D1C1 03E0D1C8 88F9F700 0C899904 ¯..¿..X°.àIÁ.èIÁ.ä..F½&-G..t.&-G. 000140
0A4F8026 0E74010A 47F62608 5EC49001 28E9FFFF 88200A4F 8026085E C40F7440 @t.á^.&.O. ¡..Õ+..á^.&-G..t.&.O. 000160
26FC7689 F0880447 8926C028 EF0A6780 26020A4F 802690E2 E8000004 47C72620  &úG...Sà.&.O..&.g.ÿ+à&.G..Þ.v•& 000180
04E4087E 81377501 10CC87F6 060868F9 F7000C89 9904082D C3884C75 0C0A47F6 -G..uL.ù·Ä..¿..X°kÁ.-.ä..u7.-.õ. 0001A0
83026611 2E9AFA76 FF0F75FF FF0A7E81 167504F0 087E810E 7401F30A 7E810775 u..-.µ.t..-.Þ.u..-...u..v°...f.. 0001C0
082DC388 1575080A 47F62608 5EC404C4 830CA7E8 0876FF0A 76FF0C75 C00802C4 á..áu..v..v.Õ1..á.á^.&-G..u..ù-Ä 0001E0

Dump of file SATURN:[PCCOMMON.DUMP.DLL]GTI.TMP;1 on 18-APR-1990 10:46:19.71
File ID (691,13,0)   End of file block 41 / Allocated 44

Virtual block number 17 (00000011), 512 (0200) bytes 26064788 26067728 26378826 085E8867 740110CC 87F606D8 68F9F700 0C899904 ..¿..X°kÁ.-.ä..tg.^.&.7&+w.&.G.& 000000
0677FF26 5256167E F6080447 89264802 4588F87E 88025789 26078926 40085788 .W.@&..&.W..-%.E.H&.G..--.VR&.w. 000020
006A006A 026A0F74 20160087 F6FA5E88 19E8FC46 8908C483 02840F7E 9AFA76FF .v°.-....á..F•Š..^°-.¶. t.j.j.j. 000040
1606468D 5600018E 17E80788 2606468A 065FC426 085EC408 C48302A7 0F409A53 S.@.Ï..á.á^.&á_..F.&..Š./..V.F.. 000060
C8C95F5E E42A0646 8AFECCE9 0374FC76 39FC4689 08C48300 880F7E9A FA76FF50 P.v°.-....á..F•9v•t.Õàz.F.*õ^_èù 000080
16891A24 A3105688 0E46881A 361E8C1A 34A31A3A 8801FD11 529A000A 88EC8855 U.&¡...R.».¡:.É4...ó..F..V.ÈS¯... 0000A0
7E80038D E900001A 2E06C700 001A3006 C71A0C16 891A0AA3 08568806 46881A26 &..F..V.È.....ú.0...ú.....Õ...- 0000C0
28A31A2A A31A12A3 1A2CA31A 10A31A14 A3C02800 011A3206 C70308E9 037425F6 -Xt.Õ..ú.2...+àÈ..È..È,.È..È*.È( 0000E0
9A06C70A 46FF4975 30017F80 260A5EC4 0020189A 06C71A22 A31A08A3 1A0EA31A .È..È..È".ú... .á^.&...OuI.F.ú.. 000100
203F8026 9028E800 001A2806 C71A1406 FF0D7528 3F80260A 5E88903E E800301B .0.$>..^.&.?+u.....ú.(...Š(.&.? 000120
FFC7752D 3F80260A 5EC400E8 1A0806FF 9014E81A 2806FF1A 75001A14 3E??0E75 u..>...u...(.Š......Š.á^.&.?-uú. 000140
1E0A76FF 0C76FF00 75C00802 C483097B E80E5098 078A260A 5E880A46 FF1A ?06 .".·F..^.&...P.Òx..á..àuî.v..v.. 000160
D8F71A38 A11A2206 FF0C7D00 1A383E83 0C56890A 468908C4 8308C7E8 0E1A3?68 h8..Õú..á..F..V..>8..)...".À8.XÄ 000180
2D752E3F 80260A5E C400201B 9A06C706 7530189A 3E830074 001A223E 831A38A3 È8..>"..t..>..Ou.ú... .á^.&.?.u- 0001A0
1A323E83 0C56890A 468908C4 83087BE8 0E1A3268 1E0A76FF 060A46FF 1A2A06FF ..*..F...v..h2..Ò(..á..F..V..>2. 0001C0
68304074 004E303D 74004630 98078A26 0A5EC41A 2A0EFF00 011A3206 C70A7D00 .).ú.2.....*.á^.&...=F.t==N.t@=h 0001E0

Dump of file SATURN:[PCCOMMON.DUMP.DLL]GTI.TMP;1 on 18-APR-1990 10:46:19.71
File ID (691,13,0)   End of file block 41 / Allocated 44

Virtual block number 18 (00000012), 512 (0200) bytes

46FF0375 4C3F8026 0A5EC409 75001A12 3E830002 1A1206C7 0675006C 30287400 .t+=l.u.ú......>...u.á^.&.?Lu..F 000000
06C7D0E8 00101A12 06C7D8E8 00011A12 06C79002 4EE91C75 003F8026 0A5EC40A .á^.&.?.u.ÕN..ú.....ŠÁú.....ŠÁú. 000020
1A1006FF 08750058 30057400 47300A74 00453DF8 46899807 8A26C8E8 00081A12 ....Šà&....F½=€.t.=G.t.=X.u..... 000040
25300152 E9037E01 3FE90375 00633D01 91E9037E 78740069 30F84688 20F84683 .F½ .F½=i.tx~.Õ..=c.u.Õ?.-.ÕR.=X 000060
C7260789 261A2EA1 1FC4261A 241EC415 75021A12 3E839001 59E90140 E9037500 .u.Õ@.ÕY...>...u.á.$.&á.À..&..&ú 000080
E9037500 1A303E83 041A2406 83078926 1A2EA11F C4261A24 1EC400E8 00000247 G...Š.á.$.&á.À..&....$...>0..u.Õ 0000A0
01ACE9FF FFB801AF E9037520 0A47F626 1A0A1EC4 018DE903 74001A2E 3E830170 p..>...t.Õ§.á...&-G. u.Õ£.¡..Õ^. 0000C0
06FF1A0E 06FFF2E8 086A90C3 E802C483 019EE80E 0A6A0000 1A0806C7 1A2C06FF ..,.ú.....j..Ò...á.Šù.j.Š·...... 0000E0
A3C0287A 74011A12 3E830081 E9037508 1A123E83 00041A32 06C71A2A 06FF1A10 ....*.ú.2....>...u.Õ...>...tz+àÈ 000100
13E80000 1A3806C7 0A74001A 223E83FA 46891A38 A128741A 380639FA 46891A12 ...F°9.8.t(À8..F°.>"..t.ú.8...Š. 000120
C4830130 E80E106A 021A2406 831A38A3 C028027D C0081A38 A1051A38 2E839090 ....8..À8..à).+àÈ8...$..j..ÒO..á 000140
1A38A300 052DFA46 88157400 1A223E83 227400FA 7E8302C4 83048DE8 0E3A6A02 .j:.Õ...á..-°.t".>"..t..F°-...È8. 000160
02C48300 F1E80E10 6A041A24 2E830000 1A3806C7 9007E81A 38A3C028 027DC008 .à).+àÈ8.Š..ú.8.....$..j..Òþ..á. 000180
0EF876FF F4E8016A 90FF39E9 026EE80E 006A90FF 3FE9106A FF10E902 1A240683 ..$..Õ..j.Õ?..j..Òn.Õ9..j.Š¶.v½. 0001A0
00673D05 7C006530 FF0CE903 75006430 90FF21E9 0428E80E 256AFF2A E90349E8 Õl.Õ*.jX.Õ(.Õl..=d.u.Õ..=e.|.=g. 0001C0
E8FE5689 FC468940 0C56880A 46880A4E FF0C5688 0A468809 74001A12 3E830A7E ~Õ.>...t..F..V..N..F..V.@.F•.VzŠ 0001E0

```
Dump of file SATURN:[PCCOMMON.DUMP.DLL]GTI.TMP;1 on 18-APR-1990 10:46:19.71
File ID (691,13,0)   End of file block 41 / Allocated 44

Virtual block number 19 (00000013), 512 (0200) bytes

 308F7400 733DFEE0 E9037500 703DFEE4 E9037500 6F30FE80 E9037500 6E30903A :.=n.u.Ô.±=o.u.Ôö±=p.u.ÔÅ±=s.t.= 000000
 8A26FC5E C4FC46FF 9034E80A 46FF9081 E8FF79E9 03750078 3DFE89E9 03750075 u.u.Ô¿±=x.u.Ôy.ŠŸ..F.Š4..F•á^•&. 000020
 8806C483 044CE80E 0A76.F0C 76FF500A 462BC388 EC75253C 0474C00A F6468807 ..F-.ât.<%u&.ú+F.P.v..v..ÒL..á.. 000040
 261A0A1E C4FC63E9 0374C00A F6468807 8A260A5E C40C5689 0A4689FE 568~~C46 F•.V±.F..V.á^.&...F-.ât.Òc•á...& 000060
 20189A06 C7067400 1A2A3E83 56570000 12C8C8C9 1A2EA1FE 51E90374 200A4 ~6 -G. t.Ôø±Å..èùà...WV.>*..t.ú...  000080
 0788261A 241EC419 75101A12 3E830774 021A123E 831A2C06 FF04740A 067E83\0 ..-..t...,..>...t..>...u.á.$.&.. 0000A0
 0788261A 241EC411 74001A2C 3E83902C E8041A24 0683FE56 89FC4689 02578826 &.W..F•.V±..$..Š,..>,..t.á.$.&.. 0000C0
 083E8302 1A240683 FE5689FC 46899907 88261A24 1EC40EE8 0000FE46 C7FC4689 .F•úF±..Š.á.$.&....F•.V±..$...>. 0000E0
 46891A36 16881A34 A11898A3 C0289003 E8064688 0674FE46 08FC4688 0E74001A ..t..F•.F±t..F.Š..+âÈ..À4...6..F 000100
 07C626F2 46FFF25E C41D750A 067E8328 7D00FE7E 83317500 1A2C3E83 F45689F2 ·.V¶.>,..ul.-±.)+.-..u.á^·.F·&6. 000120
 00F646C7 9006E800 01F646C7 FE5689FC 46890AF7 00028308 F7FE5688 FC468820 -.F•.V±¥Á.Ø.¥Ö.F•.V±úF-..Š..úF-. 000140
 2A3E830A C48307AD 11249AFC 76FFFE76 FF501E06 76FFFA5E 8CF84689 1A168800 .¡...F%.^*.v..P.v±.v•.$.Ù..á..>* 000160
 83007EC9 08F04E89 C8281A32 0E8804C4 8302C911 0C9AF876 FFFA76FF 4574001A ..tE.v*.v½...è..á...2.+à.Nþ.è-.. 000180
 F47FC00B 49C18847 3005C626 05E8F27E C4F04E88 00001898 06C70675 0818983E >...u.ú......Nþá-·Š.&6.0G.èl.á.¶ 0001A0
 3C0774C9 08048807 8A26F85E C4F276C5 EE5E8C1A 100E88F0 4E89F446 8CF27E89 .-·.F¶.Nþ.....^Ÿév·á^½&.....èt.< 0001C0
 1475001A 2C3E83EE 5E8EF45E 8CF27689 E375003F 8026F846 FF46202C 80037C61 •|.., F.F½&.?.uD.v·.^¶.^Ÿ.>,..u. 0001E0

Dump of file SATURN:[PCCOMMON.DUMP.DLL]GTI.TMP;1 on 18-APR-1990 10:46:19.71
File ID (691,13,0)   End of file block 41 / Allocated 44

Virtual block number 20 (00000014), 512 (0200) bytes

 5F5E02C4 8302FFE8 0E50C028 02E80001 88057500 F67E8308 741A2806 081A14A1 Å....(.t..-.u.¡..Š.+âP.Ò...á.^_ 000000
 0683FA56 89F84689 1A261688 1A24A100 018E1874 00067E83 56570000 10C8C8C9 èùà...WV.-..t./..À$...&..F½.V*.. 000020
 10E8FA56 89F84689 02578826 0788261A 241EC413 74081A12 3E83008F E9021A24 $..Ô...>...t.á.$.&..&.W..F½.V*Š. 000040
 08F8468B 0E74081A 123E8304 1A240683 FA5E8CF8 4689FC46 89078826 1A241EC4 á.$.&...F•.F½.^*..$...>...t..F½. 000060
 89FA568B F84688FA 5E8CF846 89008088 097500FC 7E83900A E8008688 1575FA46 F*u.¡..Š...-•.u.¡...F½.^*.F½.V*. 000080
 1574003F 8026F246 FFF25EC4 900EE81A 320E881C 741A2A36 39F628F4 5689F246 F·.V¶+-96*.t...2.Š..á^·.F·&.?.t. 0000A0
 001A223E 83FE281A 383E88F3 75003F80 26F246FF F25EC446 90EDE810 7ECE3846 F;ö-.ŠÚ.Fá^·.F·&.?.u¤.>8.+±.>"..  0000C0
 57087400 1A223E83 06C48301 83E80EF8 76FFFA76 FF5602C4 830159E8 0E570875 u.W.ÒY..á.V.v*.v½.Ò*..á..>"..t.W 0000E0
 067E83FE 5689FC46 891A2616 881A24A1 000006C8 90C8C95F 5E02C483 013CE80E .Ò<..á.^_èù.à...À$...&..F•.V±.-. 000100
 00061A32 06C70675 001A2A3E 83FA4688 C02A9003 E8018005 7547067E 83067467 gt..-.Gu.¯.Š..*â.F*.>*..u.ú.2... 000120
 36FF0676 FF1A3236 FF1A1036 FF00011A 3206C706 75001A32 3E830074 00FA7E80 .-*.t..>2..u.ú.2....6...62..v..6 000140
 3E831874 00FA7E80 0EC48304 881EFF26 1924068E FC76FFFE 76FF1A34 36FF1A36 6..64..v±.v•..$.&..¡..á..-*.t..> 000160
 1874001A 083E8304 C48304BC 1EFF2619 24068E1A 3436FF1A 3636FF14 75001A08 ...u..66..64...$.&..¥..á..>...t. 000180
 081A2406 8304C483 04C41EFF 26192406 8E1A3436 FF1A3636 FF147500 1A323E83 .>2..u..66..64...$.&..á..á...$.. 0001A0
 C48304C8 1EFF2619 24068EFC 76FFFE76 FF18741A 2806081A 14A10000 189806C7 ú.....À....(.t..v±.v•..$.&..à..á 0001C0
 3C75001A 303E8356 000000C8 90C8C901 29E80E50 C02802E8 00018805 74C00804 ..ât.¡..Š.+âP.Ò).èù.à...V.>0..u< 0001E0

Dump of file SATURN:[PCCOMMON.DUMP.DLL]GTI.TMP;1 on 18-APR-1990 10:46:19.71
File ID (691,13,0)   End of file block 41 / Allocated 44

Virtual block number 21 (00000015), 512 (0200) bytes

 36FF10E8 E42A0488 2602478E 2607FF26 37882606 468A1478 044FFF26 1A0A1EC4 á...&.O.x..F.&.7&..&.G.&..*öŠ..6 000000
 90C8C95E 1A2E06FF 9005E81A 3006FF07 754006C4 830A8501 4A9A0676 FF531A0C ..S.v..J....á.âu...0.Š......^èù. 000020
 36FF1A0A 36FF1A0C 36FF18E8 507EF608 06768857 75001A30 3E835657 000002C8 à...WV.>0..uW.v..--PŠ..6...6...6 000040
 044FFF26 1A0A1EC4 1E7EC008 4EC6881A 3006FF04 754006C4 830AED01 4A9A189A ...J.Ú..á.âu...0..6N.á-.á...&.O. 000060
 06468807 75001A30 3E8304E8 E42A0588 2602478E 2607FF26 3F88261B 9AA00478 xÅ...&.?&..&.G.&..*öŠÅ.>0..u..F. 000080
 36FF1A0C 36FF22E8 5E75001A 303E830A 76885657 000002C8 C8C95F5E 1A2E0601 ....^_èùà...WV.v..>0..u^Š".6...6 0000A0
 084EC688 0646FF1A 3006FF04 754006C4 83085F01 4A9A5098 078A2606 5EC41A0A ..á^.Ï...P.J. ..á.âu...0..F..6N. 0000C0
 478E2607 FF263F8B 261A0A1E C4078A26 065EC4CD 78044FFF 261A0A1E C42574C0 ât%á...&.O.xëÏ^.&..á...&.?&..&.G 0000E0
 A1560000 0CC8C8C9 5F5E1A2E 06010A46 88077500 1A303E83 CAE8E42A 05882602 .&..*öŠò.>0..u..F.....^_èùà...VÀ 000100
 98110C9A F476FF52 1A38368B FA4689FC 4689C028 F65689F4 46891A36 16881A34 4...6..F¶.V-+â.F•.F*.68¯R.v¶.... 000120
 4E017508 18983E83 08E802EE 83057510 18983E83 067628F0 28F84689 04C48307 ..á..F½+Þ+v..>...u..Ÿ.Š..>...u.N 000140
 0E509807 8A26F446 FF127530 189A3E83 1975203F 8026F45E C4227500 1A223E83 .>"..u"á^¶&.?-u..>..0u..F¶&...P. 000160
 7400067E 83187400 1A223E83 077EF608 08743018 9A3E83F8 4EFF02C4 83FE71E8 Òq±.á..N½.>..0t..--..>"..t..-..t 000180
 E80E5629 75001A22 *E830070 E80EFC46 FF077400 18983E83 0066E80E FA46FF07 ..F*.Òf..>...t..F•.Òp..>"..u)V.Ò 0001A0
 00FC7E83 0A74001B  83E8300 39E80E04 7500FA7E 830A7400 067E8302 C483FE7E -±.á..-..t..-*.u..Ò9..>...t..-•. 0001C0
 9A06C70E 74001A22 3E8306C4 83FE85E8 0EF476FF F676FFF8 76FF0040 E80E0475 u..Òâ..v½.v-.v¶.Òç±.á..>"..t.ú.. 0001E0
```

```
Dump of file SATURN:[PCCOMMON.DUMP.DLL]GTI.TMP;1 on 18-APR-1990 10:46:19.71
File ID (691,13,0)   End of file block 41 / Allocated 44

Virtual block number 22 (00000016), 512 (0200) bytes

 E80E5000 20B803E8 002BB805 74001A14 3E83CBC9 5E02C483 FE38E80E 5600201B . .V.Ò8±.á.^èù.>...t.¡+.$.¡ .P.Ò 000000
 0058B805 74001A10 3E831775 1018983E 8302C483 FDC8E80E 306ACB02 C483FD02 ß».á.ùj0.Òà».á..>...u..>...t.¡X. 000020
 2A3F8026 0A5EC4J0 01FE46C7 56570000 06C8CB02 C483FDAA E80E5000 788803E8 $.¡x.P.Ò`».á.ùà...WVúF±..á^.&.?* 000040
 FE46C708 75203F80 260A5EC4 9060E80A 46FF021A 24068337 88261A24 1EC41275 u.á.$.&.7..$...F.$'.á^.&.7-u.úF± 000060
 303C0A75 1A2A3639 387F393C 3F7C303C FA468807 8A260A5E 88F62B0A 46FFFFFF ...F.+-.^.&...F'<0|?<9.;96*.u.<0 000080
 03E1D1CE 0302E1C1 CE889805 8A26187F 39308026 06E8F888 0030189A 06C70675 u.ú...0..«$.&.=9..&....öèÅ..ölÅ. 0000A0
 37892606 5EC4F088 EEF7FE46 880C468C 0A7E890F 7D303080 2647F188 30E983C8 á.ÒO.þG&.=0)Ò.~..F..F±¥Ÿ.Þé^.&.7 0000C0
 01EBFC7E C4064E8A FE5E8CFC 46890094 88570000 04C8C8C9 5F5E0C56 880A4688 .F..V.^ èùà...W¡...F».^±.N.á~«$. 0000E0
 C02BFE46 8CFC7E89 9009E8FE 468CFC7E 89000188 F4750038 26117400 30802647 G&.*.t.Ï8.u¶¡...-•.F±$...-•.F±+à 000100
 04742D3C 50F77409 3CF87420 3CACD833 99C03306 76C51E56 57EC8855 90C8C95F _èù.U.&WV.év.3è.3Ù¯< t«<.t¥P<-t. 000120
 13D90302 D1E3D102 D1E3D1FA 88C88802 D1E3D118 72302C1F 77393CAC 0175283C ¯<+u.¯<9w.,0r.ÌDÌ0.ù.*ÌDÌ0ÌDÌ0.Ì. 000140
 C48850EC 8855C85D 5F5E1FDA F7000283 D8F70775 93203C58 DCE800D2 83D803D7 ».Ä.0.$£X<-.u.¥A.0.¥Ö.^_]ùU.$P.á 000160
 0386E800 21E80000 FFFF9A00 9A681E00 9C681E16 D6A3E086 580000FF FF9A5016 .P.....X.Aè».h...h.......ÒI.ÒÑ. 000180
 8B1E00A2 16FF00FF 6800D00E 809A0DC3 0E2C9A50 C850E588 0001880A 4912669A .f.I.¡...Ì]ùP.,.ù....Å.h....Å..£ 0001A0
 F3C88801 8804A68E 31740030 80264701 75003080 267FFF89 009C068E FF330000 ..3.....¿..&.*.u.G&.*.t1/Ì..Ì.ù¤ 0001C0
 AC9204E0 C00E7241 2CAC16DD 8F1FF788 071E061C E8E774AE F2C03308 74CA88A6 Ì.òt.3à·ÙtÓ$.....¥.«ì.¯,Ar.àÅ..¯ 0001E0

Dump of file SATURN:[PCCOMMON.DUMP.DLL]GTI.TMP;1 on 18-APR-1990 10:46:19.71
File ID (691,13,0)   End of file block 41 / Allocated 44

Virtual block number 23 (00000017), 512 (0200) bytes

 FF047400 04863E83 00D50E80 9A5000FC 88EC8855 00C31FED E8AAC20A 0572412C ,Ar..ó´$Ù.û.U.&¡•.P...Ì..>Ñ..t.. 000000
 8E065688 C08ED88E 01E58857 56EC8855 C850E588 0E360E80 9A5000FF 8804841E .Ç.¡..P...6..Ì]ùU.&VW¡Ì..Ä.á.V./ 000020
 0002CA5D E5885E5F 96E8E8F7 88AEF2FF FF89C033 970C7496 401074C2 38AD192E ..Ù;ót.ã.t..3à¿...Û.¥$$._^.Ì]ò.. 000040
 C4885049 D1F7AEF2 FFFF89C0 33FA8892 1F74C008 0E4A0E50 9A0676FF 57EC8855 U.&W.v..P.J..àt...*3à¿..¯Û¥ÌÌP.á 000060
 46881 8EE 06FF0000 04C80002 CA50E588 5F580000 FFFF9A50 1651521E 5300288B E..S.RQ.P.....[_.Ì]ò..à.....Ÿ..F 000080
 219A0200 68FE5E8C FC468910 CC05E0D1 C103E0D1 C888F9F7 000C8999 04D82D04 .-Ä..¿..¥*.àÌÅ.ÈìÅ.ä..F•.^±h...Ì 0000A0
 47C726FC 5EC4080A 4F802611 74D00808 57892606 47892604 5EC402C4 830E8A14 ....á.á^.&.G.&.W..Åt.&.O..á^•&ùG 0000C0
 FC5EC408 57892606 47892640 FE5688FC 4688040A 4F802604 5EC49021 E8020002 ...$Ì.á^.&.O...F•.V±ã&.G.&.W.á^• 0000E0
 C3C90000 0447C726 02578926 07892608 57882606 47882604 5EC40001 0247C726 &ùG...á^.&.G.&.W.&...&.W.&ùG...èù 000100
 0A76FF53 CC8804EC 83047BE9 046CE9C0 3300098A 0872160B 1E38065E 88EC8855 U.&.^.;.Ù.r.¤..3àÒl.Òx..&..äS.v. 000120
 885500C8 5DE588FD 160DA780 91E175C0 855A5900 00FFFF9A 51160C76 FF0876FF .v..v..Q.....YZ.äuÅ..Ìì.».Ì)ù.U. 000140
 51C93353 12742016 0087F604 28E9C033 00098A08 72160B1E 38065E88 0CEC83EC &.&..^.;.Ù.r.¤..3àÒ+.-.ï. t.S3èQ 000160
 C0330856 C50A468E FA5E8C66 74801600 87F60000 0F699A50 16F4468D 51414151 QAAQ.F¶.P.Ì...-.ï..tf.^*.F.éV.3à 000180
 DC8802EC 833875AE F20A8049 E30C4E88 F86689F2 88FA8856 57FCFC46 89FE4689 .F±.F••WV.*.·.f%.N.DI¯.·Ùu;.$..É 0001A0
 009AE900 28E8F4E2 AA1A74F8 3800740A 3CAC0C4E 880716FA 88D488E2 2800808A ¤..+ã.å.*...N.¯<.t.;«t.¯ã¶Ò+.Ò.. 0001C0
 7AE80093 E9FA5E8E 5F5EE1E8 0014E8E2 E8FC46FF 0A80AA00 1FE80375 FB3800B0 ¯.;«u.Ò..`¯..F•$ãÒ..$Å^_.^*Ò..$z 0001E0

Dump of file SATURN:[PCCOMMON.DUMP.DLL]GTI.TMP;1 on 18-APR-1990 10:46:19.71
File ID (691,13,0)   End of file block 41 / Allocated 44

Virtual block number 24 (00000018), 512 (0200) bytes

 5016F446 8D51521( 53065E88 1FE3CA28 CF881F06 1E515350 0EE11152 9AFFFC88 ¡•..R.Å.PSQ....Ù+ÒD..^.S.RQ.F¶.P 000000
 C00808C4 831FC3FA 88585859 1F07740B 08FE5E01 F45E8811 75C00800 000EAA9A .`....àu..^¶.^±.Ùt..Y(X.*ù..á..à 000020
 DD87F6FE 5E8E26E8 F90020BA 03E8001C 8A087500 098A0001 3D007400 603D1874 t.=m.t.*..¤..u.¤..$.¤ .*$&.^±-.ì 000040
 FC4628FE 468806E8 F9C03300 1C8A0EE8 F803751A 3F80085E 880A5E8E 0E744016 .ãt..^..^..?.u.%$.¤..3à*$..F±•F• 000060
 0856C51E EEE8C188 0475C908 0C4E8803 0FE9C85D E5880472 FA5E8E5F 5EF86688 .f%^_.^*r..Ì]ùÒ...N..èu..é$Ÿ.éV. 000080
 00098A00 01300074 00603017 74C0081F 071E0000 10419A50 16F4468D 51521E53 S.RQ.F¶.P.A.......åt.=m.t.*..¤.. 0000A0
 1A3F8026 DA880A74 40160087 F68775C0 08F44688 C2E80020 8AC7E800 1C8ACC75 uàm..$ù¤ .$ò.F¶.àuñ-.ì.ãt..Ò&.?. 0000C0
 88914901 F7AEF2FF FF89C033 067EC4D7 88EC8855 00A3E8C0 33001C8A A6E80275 u.$Ìo..3à$£.U.$.má-.3à¿..·Ù¥Ì].. 0000E0
 F60C7C00 F883117D 16D81E38 065E88EC 88550442 E9008357 56EC8855 00C850FA *)ù.U.&VW*.Ò8.U.&.^.;.Ù.)..«.|.- 000100
 05720406 1E380872 D828DC88 5A5900C8 5DE588C0 3302E800 01880574 40160087 .ì.ãt.¡..$.3à.Ì]ù.YZ.É+Är.;.ø.r. 000120
 160DA780 D4885200 02880402 2EFF5152 FC5CE9C0 33057540 04D2A1C8 5152E388 .DRQùÅ0.ãu.3àÒ\•RQ..0.£..R.å.Ìì. 000140
 81067500 02300774 00013040 81127558 C0080000 FFFF9A52 16501653 C4885087 ñP.6S.P.R......àXu.Ÿã=..t.*..u.Ÿ 000160
 01AEE903 7319061E FFD833C2 8C190A06 C41EE319 080E885A D4794816 DD8F0808 ...ì.KyåZ....D.á....ô3Ù....s.ÒÙ. 000180
 880073E8 19128F19 128E007C E81912BF 19128E19 061EFF00 038BC28C 190E06C4 á....öÉ....../..«..Ò|./..«..Òs.¡ 0001A0
 51E81916 8F1912BE D88E0E56 88C30000 FFFF9A11 F3680E01 6A087419 163D1912 ..*..t.j..hµ......ù¡V..Äf..«..ÒQ 0001C0
 31E81916 8F1912BE 003AE818 9C8F189C 8EEC8855 000011EE 9A006A00 6A036A00 .j.j.j..Ÿ...U.$/..«..Ò:./..«..Ò1 0001E0
```

```
Dump of file SATURN:[PCCOMMON.DUMP.DLL]GTI.TMP;1 on 18-APR-1990 10:46:19.71
File ID (691,13,0)   End of file block 41 / Allocated 44

Virtual block number 25 (00000019), 512 (0200) bytes

 9A500646 8A50C033 001AE819 168F1916 8E0023E8 19168F19 168EEC88 5503E800 .$.U.&/..¢..Ò#./..¢..Ò..3àP.F.P. 000000
 F2740245 08058844 EF830E73 F738C319 061EFF00 028807E3 19080E88 0000FFFF ........D.£......û;%s..ÿ....E.t· 000020
 89C02800 9C168800 F0E90375 009C3639 FF28F628 56570000 14C800C3 EEE81DFF ..$Ÿù.à...WV+-+.96..u.Ôþ.....+à. 000040
 080AC483 120A1534 9A04A668 1EF676FF F876FF0C 6AF85689 F64689F2 5689F046 Fþ.V·.F-.V½j..v½.v-.h¦..4.Ö..á.. 000060
 FFF65EC4 0CE847EA 75003F80 26F646FF F65EC400 8CE90376 7FFFFE81 461974C0 ât.F.±..v.Ö¥.á^-.F-&.?.uöG§.á^-. 000080
 8904C483 12E9140C 9A046A50 0145808A 75003F80 26F65E88 F475003F 8026F646 F-&.?.u¶.^-&.?.u¤.E.Pj..É.Ö..á.. 0000A0
 08FC4688 6D74EE46 08EC4688 FE5689FC 468902C4 83131F14 219A56EE 5689EC46 F&.VŸV.¦....á..F•.V±.F&.FŸtm.F•. 0000C0
 2615349A 04A6681E F076FFF2 76FF0C6A 18E51689 18E3A3EE 5688EC46 886674C2 ôtf.F&.VŸÉD...¦.j..v·.vþ.h¦..4.& 0000E0
 FFF05EC4 04EC4683 02578926 078926FE 5688FC46 88EC5EC4 2C74C008 0AC48310 ..á..ât,á^&.F•.V±&..&.W..F&.á^þ. 000100
 F475003F 8026F046 FFF05EC4 E8E80E74 C00A0788 26FC46FF FC5EC407 8A26F046 Fþ&..á^•.F=&...ât.ŠÒá^þ.Fþ&.?.u¶ 000120
 09060005 18040203 02021601 FA58E900 028890C8 C95F5EA7 75003F80 26F05EC4 á^þ&.?.uÏ^_èù.¡..ÕX•............ 000140
 00530052 02430041 02350212 12110010 120F1600 160C0808 070A0C09 0C080C07 ......................S.A.C.R.S. 000160
 16080000 080702CE 08A40084 09820A81 0A801606 09721C70 2060006C 08590057 W.Y.l.m p.r...........É.ö.•..... 000180
 13748816 D9A3C85D E58899FF FF880008 E8C850E5 8899FFFF 88160216 89160 9A3 È)...•.¡....¦]ùÒ..¡....¦]ùÈ).Ét. 0001A0
 76CA3C04 728C3C43 0A76243C 0472133C F7E24343 1674073A 2E1875E4 0A0024B9 ¿$..ôu..:.t.CCä%<.r.<$v.C<¥r.<ôv 0001C0
 5DE58801 FE4F802E 0574C308 C08C065E C4EC8855 00C316D2 A3980147 8A2E4301 .C..G..È•.û.U.$á^..â.ût.&.O±..¦) 0001E0

Dump of file SATURN:[PCCOMMON.DUMP.DLL]GTI.TMP;1 on 18-APR-1990 10:46:19.71
File ID (691,13,0)   End of file block 41 / Allocated 44

Virtual block number 26 (0000001A), 512 (0200) bytes

 18FAA312 740025E8 08750018 FA3E831E 73FFF130 06468857 5602EC83 EC8855C8 ùU.$.$.VW.F.=þ.s..>•..u.ÒX.t.È•. 000000
 C85DE588 5E5F02C4 83129A16 269A0676 FF087500 78E80574 0018E815 750082E8 Ò..u.Ò..t.Òx.u..v..&....á._^.¦]ù 000020
 D29A5002 80510E4F 8050501E C033FE5E 89FEE383 43065E88 0776065E 3900F088 Éþ.9^.v..^.C.D±.^±3à.PP.O.Ô¯.P.• 000040
 FE5E8800 08A30A8E 0574D208 18FEA318 FC1687C2 883874FF FA8308C4 83145517 .U..á..•.t8.ô..=.È±..•t..ÒÈ...^± 000060
 06A30000 05000AA3 01478000 02A30000 A3000A88 0C478948 480008A3 C0330 88E .Ã3àÈ..HH.G.¡..È..È...G.È.....È. 000080
 00000AC8 C3098EC1 8CD20801 9AE818FE 1E8ED833 064E88C0 8ED88CC3 1FD88C00 ..Á.û.Á.â.N.3Ü..±.Ò...•.é.1ùà... 0000A0
 E899C028 0674FFFF C2F7FA56 89F84689 15091800 9A0676FF 006A0876 FF006A56 Vj..v.j..v..Å....F½.V•%ô..t.+à.$ 0000C0
 9A50FE76 FF006A56 1274000B FE5689FC 468902C4 83152214 219A56F8 7688902F /..v½V.¦."..á..F•.V±.Åt.Vj..v±P. 0000E0
 8827E30E 4E881E56 57EC8855 90C8C95E FE5688FC 46889007 E808C483 14811888 .....á.$...F•.V±^èù.U.&WV..N.D'. 000100
 0477FF45 3A26C933 FF448AA6 F30A76C5 FE88CB03 D9F7AEF2 C033F788 067EC4D9 )á~..%3á·Ù%).ù.±év.µÏ.D.3è&:E.w. 000120
 071E570A 7EC51E08 56880646 880E4E88 00C850E5 885F5E1F C188D1F7 49490474 t.II%I.è.^_.¦]ù..N..F..V..é~.W.. 000140
 C0080233 92F788DA F7000283 D8F7AA20 800A7902 080E750A F9831374 C00A93FC •..ât..•.u.¯.•y.¯-¯%Ü.•.%Ö.%.3•.á 000160
 880586AC 4F0588E2 75C308C2 88AA2704 0276393C 30040387 92F1F793 F1F70274 t.%þ.%þ..Æ.0<9v..'¯.ô.ùuä..O¯... 000180
 8CFA4689 04D88856 000006C8 00C850E5 885E5F1F 58DA8CF2 72C73801 4480FF44 D..D.;úr·.OX._^.¦]ù.à...V¡Ä..F•. 0001A0
 46834601 744004C4 8314EE19 049A5306 0E74830A 47F626FA 5EC41CE8 F628FC5E ^•+-$.á^•&-G.¯t..S...Ÿ..á.ât.F.F 0001C0
 4F800474 08080 65E 88EC8855 90C8C95E C6880876 FA463916 C8168816 C6A10CFA •.Áó...à.9F•vÁ.ó^èù.U.$.^..Üt..O 0001E0

Dump of file SATURN:[PCCOMMON.DUMP.DLL]GTI.TMP;1 on 18-APR-1990 10:46:19.71
File ID (691,13,0)   End of file block 41 / Allocated 44

Virtual block number 27 (0000001B), 512 (0200) bytes

 99C03305 750176E8 00058807 1E297500 3F8318F0 885756EC 8855C85D E58801FE ±..¦]ùU.$VWEþ..?.u)..¡..Òv.u.3á. 000000
 8C064E88 18F63689 FFFEFE44 C704C683 000104C7 9618F2A3 18F0A3FE 244024E8 $$a$±Èþ.È ..û....ó.ùD±±..6-..N.. 000020
 88ADFC02 7788F273 EEF983FE E180FA74 410000E9 C850E588 5E5F0009 E8C08ED8 Á.äÒ.._^.¦]ùÒÁ.At•.Ä±.•Ÿs·.W.•Ù. 000040
 88E6E8FE 4489F788 000205C2 03357401 A8ADF003 00881573 C1384843 7401A8FE ±´.tCH;ès..Å.þÙ´.t5.ô....%.D±$¦. 000060
 260574D1 3811F489 0A8CC688 FE4CFEF9 0305E805 8948C128 FE4C89F9 030C74FE ±t..•.L±+èH..Š..•±L±.ó.Ö¿¶.;¦t.& 000080
 3848FE88 F27401A8 ADF003FE 882574FF FE300219 0206C626 C3027F89 18FE1E8C ..±....û&ó....=±.t%.±.þÙ´.t·.±H; 0000A0
 8E0474C0 08084788 E6E8FE44 89F78800 0205C203 E27401A8 ADF00300 888C73C1 ès¥.Å.þÙ´.tã.ô....%.D±$¦.G..ât.. 0000C0
 33067788 88E83788 18FA1E8E 260574C7 3816898F D88C1274 19020EFE 2615E808 Å$.&±...t..Ä¢¿.;út.&..•..7$È.w.3 0000E0
 8C98E84E 4E960574 001DE8FE 4DFE0D74 005FE898 40400124 0074C638 0068E8C0 àÒk.;ót.$.aa.Ô_.t.±M±Ò..t..NN$.. 000100
 49C82803 7401A8FE 458851C3 99C03302 47890788 18FEA326 0474C138 1700B908 Ä¿..;èt.&È±...¯G.3à.ùQ.È±´.t.+à¦ 000120
 C628C223 D2F70072 C2031572 C603C188 F575EAD1 04761900 1638267F FF8A4141 AAo..&;...v.¦ðu%.è.ór..ôr.%•#ô+ó 000140
 FE44C7F2 03F088FE 88571874 001DE851 52C359C0 33E575EA D102F708 75000CE8 Ò..u.%•ïôu¦3áYúRQÒ..t.W.±.þ.·ùD± 000160
 9A1F0650 00018850 52521ED2 335053C3 5A5958FE 55894AD7 28068806 7789FFFE ±..W..•+•J.U±XYZùSP3•.RRP¡..P... 000180
 A48F3875 000A7E83 065756EC 8855C302 0802745B 5A1FFFFA 8308C483 15F517D2 •.%..á..•..Z[t..•ùU.$VW..~..u8¢É 0001A0
 89024488 0074F738 11744804 A436884C E8277200 57E80775 48064688 08568800 ..V..F.Hu.ÒW.r'$L.6É.Ht.;%t..D.. 0001C0
 52C48850 21E899FF FF880675 02080473 04A4FE81 04C68334 735E003E E8560E46 F.VÒ>.^s4.ó..±É.s..•u.¡...$¦P.áR 0001E0
```

```
Dump of file SATURN:[PCCOMMON.DUMP.DLL]GTI.TMP;1 on 18-APR-1990 10:46:19.71
File ID (691,13,0)   End of file block 41 / Allocated 44

Virtual block number 28 (0000001C), 512 (0200) bytes

 5E5F07C0 33D38804 A4368902 5C891489 E675C085 F95B0000 FFFF9A50 C0335016 .P3öP.....(‡.àu]...\..6Ê..Æ3à._^ 000000
 26721C03 DA8B2CEB F9F27504 A4FE8104 C6830C74 024C39F7 8B0E4E8B CB5DE58B .]]ù.N..%9L.t..6..±Ê.u·‡$,.Ö..r& 000020
 9E168904 75F736C  75C08500 00FFFF9A 51531373 009E1E39 0675F73B C18ED38B .&.è;%u.9...s.SQ......àu8;%u.... 000040
 D3230B1B D12B0C74 DAF7D78B 067EC457 38E30C4E 8BEC8855 00C3018B 04B79200 .....îû.U.&.N.D8Wá-..m%Öt.+1.ÛW£ 000060
 D1C38E01 39C381C3 8C10E301 87AAF3C9 13ABF3E9 D1E08A0A 468BD12B D187D103 .1.1+1.F..ÀlÖµ¨.èµ˘.1D..û.ú9..ú1 000080
 0B750A5E 8B080B0C 5E8B0846 8BEC8855 CB500856 8B06468B 5FAAF3C9 13ABF3E9 Õµ¨.èµ˘.F..V.]ïW.&.F..^..Ă.^.u. 0000A0
 E58B0103 E3F70646 8BC8030C 66F70646 8BC8B8E3 F70008CA 5DE58BE3 F706468B .F.%D.ÍÏò..%D.à.F.%f..à.F.%D.1.Í 0000C0
 8B157508 0A47F626 5575023C 03240A47 8A26065E C4F62B56 000004C8 0008CA5D ]ò..à...V+-é^.&.G.$.<.uU&-G..u.. 0000E0
 46890647 2B26078B 26065E8B 39740110 CC87F606 D86BF9F7 000CB999 04D82DC3 û-Ă..¿..%ºkĂ.-.ä..t9.^.&..&+G..F 000100
 FC463B08 C48317C2 0F7E9A50 E42A0B47 8A260677 FF260877 FF265028 7EC00BFC ▪.á-(P&.w.&.w.&.G.*ðP.-.ô..á.;F▪ 000120
 26025789 26078926 08578B26 06478B26 065EC4FF FF8E200A 4F802606 5EC40B74 t.á^.&.O. ƒ..á^.&.G.&.W.&..&.W.& 000140
 188B0105 00070001 12080103 00050001 12400103 000CC8C9 5EC68B00 000447C7 úG....ó^èù....ə...............£. 000160
 17420002 00000000 19580002 00260001 18710103 00220001 18260103 00880001 ......&..."...q...&...X.......B. 000180
 00B60103 00400001 118A0103 009F0005 10CA0203 003A0001 0FAA0103 0000000F ......˙...:...ò..........M...Ñ. 0001A0
 54206E75 52205340 00000000 00000000 00000000 005C0001 0DA30103 005B0001 ..[...Ê...\............MS Run-T 0001C0
 38383931 20296328 20746867 69727970 6F43202D 20797261 7262694C 20656D69 ime Library - Copyright (c) 1988 0001E0

Dump of file SATURN:[PCCOMMON.DUMP.DLL]GTI.TMP;1 on 18-APR-1990 10:46:19.71
File ID (691,13,0)   End of file block 41 / Allocated 44

Virtual block numbe: 29 (0000001D), 512 (0200) bytes

 2064656C 69616620 4C4C4420 73250011 70726F43 2074666F 736F7263 694D202C , Microsoft Corp..%s DLL failed  000000
 656A624F 20697447 0000006C 6F6F5465 74616572 43697447 0064616F 6C206F74 to load.GtiCreateTool...Gti Obje 000020
 756E2800 296C6C75 6E280000 FFFF0068 00737361 6C432077 6F646E69 57207463 ct Window Class.h.....(null).(nu 000040
 00000000 00000000 192418A0 122318A0 18A00000 00000000 2320202B 00296C6C ll).+· #..........#...$......... 000060
 00000000 00000000 00000000 00000000 00000000 00000000 00000000 00000000 ................................ 000080
 00000000 00000000 00000000 00000000 00000000 00000000 00000000 00000000 ................................ 0000A0
 00000000 00000000 00000000 00000000 00000000 00000000 00000000 00000000 ................................ 0000C0
 00000000 00000000 00000000 00000000 00000000 00000000 00000000 00000000 ................................ 0000E0
 00000000 00000000 00000000 00000000 00000000 00000000 00000000 00000000 ................................ 000100
 00000000 00000000 00000000 00000000 00000000 00000000 00000000 00000000 ................................ 000120
 00000000 00000000 00000000 00000000 00000000 00000000 00000000 00000000 ................................ 000140
 00000000 00000000 00000000 00000000 00000000 00000000 00000000 00000000 ................................ 000160
 00000000 00000000 00000000 00000000 00000000 00000000 00000000 00000000 ................................ 000180
 00000000 00000000 00000000 00000000 00000000 00000000 00000000 00000000 ................................ 0001A0
 00000000 00000000 00000000 00000000 00000000 00000000 00000000 00000000 ................................ 0001C0
 00000000 00000000 00000000 00000000 00000000 00000000 00000000 00000000 ................................ 0001E0

Dump of file SATURN:[PCCOMMON.DUMP.DLL]GTI.TMP;1 on 18-APR-1990 10:46:19.71
File ID (691,13,0)   End of file block 41 / Allocated 44

Virtual block number 30 (0000001E), 512 (0200) bytes

 00000000 00000000 00000000 00000000 00000000 00000000 00000000 00000000 ................................ 000000
 00000000 00000000 00000000 00000000 00000000 00000000 00000000 00000000 ................................ 000020
 00000000 00000000 00000000 00000000 00000000 00000000 00000000 00000000 ................................ 000040
 00000000 00000000 00000000 00000000 00000000 00000000 00000000 00000000 ................................ 000060
 00000000 00000000 00000000 00000000 00000000 00000000 00000000 00000000 ................................ 000080
 00000000 00000000 00000000 00000000 00000000 00000000 00000000 00000000 ................................ 0000A0
 00000000 00000000 00000000 00000000 00000000 00000000 00000000 00000000 ................................ 0000C0
 00000000 00000000 00000000 00000000 00000000 00000000 00000000 00000000 ................................ 0000E0
 00000000 00000000 00000000 00000000 00000000 00000000 00000000 00000000 ................................ 000100
 00000000 00000000 00000000 00000000 00000000 00000000 00000000 00000000 ................................ 000120
 00000000 00000000 00000000 00000000 00000000 00000000 00000000 00000000 ................................ 000140
 00000000 00000000 00000000 00000000 00000000 00000000 00000000 00000000 ................................ 000160
 00000000 00000000 00000000 00000000 00000000 00000000 00000000 00000000 ................................ 000180
 00000000 00000000 00000000 00000000 00000000 00000000 00000000 00000000 ................................ 0001A0
 00000000 00000000 00000000 00000000 00000000 00000000 00000000 00000000 ................................ 0001C0
 00000000 00000000 00000000 00000000 00000000 00000000 00000000 00000000 ................................ 0001E0
```

```
Dump of file SATURN:[PCCOMMON.DUMP.DLL]GT1.TMP;1 on 18-APR-1990 10:46:19.71
File ID (691,13,0)   End of file block 41 / Allocated 44

Virtual block number 31 (0000001F), 512 (0200) bytes

00000000 00000000 00000000 00000000 00000000 00000000 00000000 00000000 ................................ 000000
00000000 00000000 00000000 00000000 00000000 00000000 00000000 00000000 ................................ 000020
00000000 00000000 00000000 00000000 00000000 00000000 00000000 00000000 ................................ 000040
4E495F45 4C49465F 435F00A4 00000000 00000000 00000000 00000000 00000000 ...................É. C_FILE_IN 000060
00000000 04C6136E 04C2136E 04BE136E 04BA136E FFFF136E 00000000 00304F46 FO=.....n...n.o.n.ƒ.n.ō.n.ó..... 000080
01020000 00000000 00000000 00011922 12C00000 04E012C0 0200FFFF FFFF0101 ........á.Å...á."............... 0000A0
00000000 00000000 00000000 00000000 00000000 02020000 00000000 00000000 ................................ 0000C0
00000000 00000000 00000000 00000000 00000000 00000000 00000000 00000000 ................................ 0000E0
00000000 00000000 00000000 00000000 00000000 00000000 00000000 00000000 ................................ 000100
00000000 00000000 00000000 00000000 00000000 00000000 00000000 00000000 ................................ 000120
00000000 00000000 00000000 00000000 00000000 00000000 00000000 00000000 ................................ 000140
00000000 00000000 00000000 00000000 00000000 00000000 00000000 00000000 ................................ 000160
00000000 00000000 00000000 00000000 00000000 00000000 00000000 00000000 ................................ 000180
00000000 00000000 00000000 00000000 00000000 00000000 00000000 00000000 ................................ 0001A0
00000000 00000000 00000000 00000000 00000000 00000000 00000000 00000000 ................................ 0001C0
00000000 00000000 00000000 00000000 00000000 00000000 00000000 00000000 ................................ 0001E0

Dump of file SATURN:[PCCOMMON.DUMP.DLL]GT1.TMP;1 on 18-APR-1990 10:46:19.71
File ID (691,13,0)   End of file block 41 / Allocated 44

Virtual block number 32 (00000020), 512 (0200) bytes

00000000 00000000 00000000 00000000 00000000 00000000 00000000 00000000 ................................ 000000
00000000 00000000 00000000 00000000 00000000 00000000 00000000 00000000 ................................ 000020
00000000 00000000 00000000 00000000 00000000 00000000 00000000 00000000 ................................ 000040
00000000 00000000 00000000 00000000 00000000 00000000 00000000 00000000 ................................ 000060
00000000 00000000 00000000 00000000 00000000 00000000 00000000 00000000 ................................ 000080
00000000 00000000 00000000 00000000 00000000 00000000 00000000 00000000 ................................ 0000A0
00000000 00000000 00000000 00000000 00000000 00000000 00000000 00000000 ................................ 0000C0
00000000 00000000 00000000 00000000 00000000 00000000 00000000 00000000 ................................ 0000E0
00000000 00000000 00000000 00000000 00000000 00000000 00000000 00000000 ................................ 000100
00000000 00000000 00000000 00000000 00000000 00000000 00000000 00000000 ................................ 000120
00000000 00000000 00000000 00000000 00000000 00000000 00000000 00000000 ................................ 000140
00000000 00000000 00000000 00000000 00000000 00000000 00000000 00000000 ................................ 000160
00000000 00000000 00000000 00000000 00000000 00000000 00000000 00000000 ................................ 000180
00000000 00000000 00000000 00000000 00000000 00000000 00000000 00000000 ................................ 0001A0
00000000 00000000 00000000 00000000 00000000 00000000 00000000 00000000 ................................ 0001C0
00000000 00000000 00000000 00000000 00000000 00000000 00000000 00000000 ................................ 0001E0

Dump of file SATURN:[PCCOMMON.DUMP.DLL]GT1.TMP;1 on 18-APR-1990 10:46:19.71
File ID (691,13,0)   End of file block 41 / Allocated 44

Virtual block number 33 (00000021), 512 (0200) bytes

00000000 00000000 00000000 00000000 00000000 00000000 00000000 00000000 ................................ 000000
00000000 00000000 00000000 00000000 00000000 00000000 00000000 00000000 ................................ 000020
00000000 00000000 00000000 00000000 00000000 00000000 00000000 00000000 ................................ 000040
00000000 00000000 00000000 00000000 00000000 00000000 00000000 00000000 ................................ 000060
00000000 00000000 00000000 00000000 00000000 00000000 00000000 00000000 ................................ 000080
00000000 00000000 00000000 00000000 00000000 00000000 00000000 00000000 ................................ 0000A0
00000000 00000000 00000000 00000000 00000000 00000000 00000000 00000000 ................................ 0000C0
00000000 00000000 00000000 00000000 00000000 00000000 00000000 00000000 ................................ 0000E0
00000000 00000000 00000000 00000000 00000000 00000000 00000000 00000000 ................................ 000100
00000000 00000000 00000000 00000000 00000000 00000000 00000000 00000000 ................................ 000120
00000000 00000000 00000000 00000000 00000000 00000000 00000000 00000000 ................................ 000140
00000000 00000000 00000000 00000000 00000000 00000000 00000000 00000000 ................................ 000160
00000000 00000000 00000000 00000000 00000000 00000000 00000000 00000000 ................................ 000180
00000000 00000000 00000000 00000000 00000000 00000000 00000000 00000000 ................................ 0001A0
00000000 00000000 00000000 00000000 00000000 00000000 00000000 00000000 ................................ 0001C0
00000000 00000000 00000000 00000000 00000000 00000000 00000000 00000000 ................................ 0001E0
```

```
Dump of file SATURN:[PCCOMMON.DUMP.DLL]GTI.TMP;1 on 18-APR-1990 10:46:19.71
File ID (691,13,0)   End of file block 41 / Allocated 44

Virtual block number 34 (00000022), 512 (0200) bytes

 00000000 00000000 00000000 00000000 00000000 00000000 00000000 00000000 ................................ 000000
 00000000 00000000 00000000 00000000 00000000 00000000 00000000 00000000 ................................ 000020
 00000000 00000000 00000000 00000000 00000000 00000000 00000000 00000000 ................................ 000040
 00000000 00000000 00000000 00000000 00000000 00000000 00000000 00000000 ................................ 000060
 00000000 00000000 00000000 00000000 00000000 00000000 00000000 00000000 ................................ 000080
 00000000 00000000 00000000 00000000 00000000 00000000 00000000 00000000 ................................ 0000A0
 00000000 00000000 00000000 00000000 00000000 00000000 00000000 00000000 ................................ 0000C0
 00000000 00000000 00000000 00000000 00000000 00000000 00000000 00000000 ................................ 0000E0
 00000000 00000000 00000000 00000000 00000000 00000000 00000000 00000000 ................................ 000100
 00000000 00000000 00000000 00000000 00000000 00000000 00000000 00000000 ................................ 000120
 00000000 00000000 00000000 00000000 00000000 00000000 00000000 00000000 ................................ 000140
 00000000 00000000 00000000 00000000 00000000 00000000 00000000 00000000 ................................ 000160
 00000000 00000000 00000000 00000000 00000000 00000000 00000000 00000000 ................................ 000180
 00000000 00000000 00000000 00000000 00000000 00000000 00000000 00000000 ................................ 0001A0
 00000000 00000000 00000000 00000000 00000000 00000000 00000000 00000000 ................................ 0001C0
 00000000 00000000 00000000 00000000 00000000 00000000 00000000 00000000 ................................ 0001E0

Dump of file SATURN:[PCCOMMON.DUMP.DLL]GTI.TMP;1 on 18-APR-1990 10:46:19.71
File ID (691,13,0)   End of file block 41 / Allocated 44

Virtual block number 35 (00000023), 512 (0200) bytes

 00000000 00000000 00000000 00000000 00000000 00000000 00000000 00000000 ................................ 000000
 00000000 00000000 00000000 00000000 00000000 00000000 00000000 00000000 ................................ 000020
 00000000 00000000 00000000 00000000 00000000 00000000 00000000 00000000 ................................ 000040
 00000000 00000000 00000000 00000000 00000000 00000000 00000000 00000000 ................................ 000060
 00000000 00000000 00000000 00000000 00000000 00000000 00000000 00000000 ................................ 000080
 00000000 00000000 00000000 00000000 00000000 00000000 00000000 00000000 ................................ 0000A0
 00000000 00000000 00000000 00000000 00000000 00000000 00000000 00000000 ................................ 0000C0
 00000000 00000000 00000000 00000000 00000000 00000000 00000000 00000000 ................................ 0000E0
 00000000 00000000 00000000 00000000 00000000 00000000 00000000 00000000 ................................ 000100
 00000000 00000000 00000000 00000000 00000000 00000000 00000000 00000000 ................................ 000120
 00000000 00000000 00000000 00000000 00000000 00000000 00000000 00000000 ................................ 000140
 00000000 00000000 00000000 00000000 00000000 00000000 00000000 00000000 ................................ 000160
 00000000 00000000 00000000 00000000 00000000 00000000 00000000 00000000 ................................ 000180
 00000000 00000000 00000000 00000000 00000000 00000000 00000000 00000000 ................................ 0001A0
 00000000 00000000 00000000 00000000 00000000 00000000 00000000 00000000 ................................ 0001C0
 00000000 00000000 00000000 00000000 00000000 00000000 00000000 00000000 ................................ 0001E0

Dump of file SATURN:[PCCOMMON.DUMP.DLL]GTI.TMP;1 on 18-APR-1990 10:46:19.71
File ID (691,13,0)   End of file block 41 / Allocated 44

Virtual block number 36 (00000024), 512 (0200) bytes

 00000000 00000000 00000000 00000000 00000000 00000000 00000000 00000000 ................................ 000000
 00000000 00000000 00000000 00000000 00000000 00000000 00000000 00000000 ................................ 000020
 00000000 00000000 00000000 00000000 00000000 00000000 00000000 00000000 ................................ 000040
 00000000 00000000 00000000 00000000 00000000 00000000 00000000 00000000 ................................ 000060
 00000000 00000000 00000000 00000000 00000000 00000000 00000000 00000000 ................................ 000080
 00000000 00000000 00000000 00000000 00000000 00000000 00000000 00000000 ................................ 0000A0
 00000000 00000000 00000000 00000000 00000000 00000000 00000000 00000000 ................................ 0000C0
 00000000 00000000 00000000 00000000 00000000 00000000 00000000 00000000 ................................ 0000E0
 00000000 00000000 00000000 00000000 00000000 00000000 00000000 00000000 ................................ 000100
 00000000 00000000 00000000 00000000 00000000 00000000 00000000 00000000 ................................ 000120
 00000000 00000000 00000000 00000000 00000000 00000000 00000000 00000000 ................................ 000140
 00000000 00000000 00000000 00000000 00000000 00000000 00000000 00000000 ................................ 000160
 00000000 00000000 00000000 00000000 00000000 00000000 00000000 00000000 ................................ 000180
 00000000 00000000 00000000 00000000 00000000 00000000 00000000 00000000 ................................ 0001A0
 00000000 00000000 00000000 00000000 00000000 00000000 00000000 00000000 ................................ 0001C0
 00000000 00000000 00000000 00000000 00000000 00000000 00000000 00000000 ................................ 0001E0
```

```
Dump of file SATURN:[PCCOMMON.DUMP.DLL]GTI.TMP;1 on 18-APR-1990 10:46:19.71
File ID (691,13,0)   End of file block 41 / Allocated 44

Virtual block number 37 (00000025), 512 (0200) bytes

00000000 00000000 00000000 00000000 00000000 00000000 00000000 00000000 ................................ 000000
00000000 00000000 00000000 00000000 00000000 00000000 00000000 00000000 ................................ 000020
00000000 00000000 00000000 00000000 00000000 00000000 00000000 00000000 ................................ 000040
00000000 00000000 00000000 00000000 00000000 00000000 00000000 00000000 ................................ 000060
02000001 00000000 00000000 00000000 00000000 00000000 00000000 00000000 ................................ 000080
00000000 00000000 00000000 00000000 00000000 00000000 00000000 00000000 ................................ 0000A0
00000000 00000000 00000000 00000000 00000000 00000000 00000000 00000000 ................................ 0000C0
00000000 00000000 00000000 00000000 00000000 00000000 00000000 00000000 ................................ 0000E0
00000000 00000000 00000000 00000000 00000000 00000000 00000000 00000000 ................................ 000100
00000000 00000000 00000000 00000000 00000000 00000000 00000000 00000000 ................................ 000120
00000000 00000000 00000000 00000000 00000000 00000000 00000000 00000000 ................................ 000140
00000000 00000000 00000000 00000000 00000000 00000000 00000000 00000000 ................................ 000160
00000000 00000000 00000000 00000000 00000000 00000000 00000000 00000000 ................................ 000180
00000000 00000000 00000000 00000000 00000000 00000000 00000000 00000000 ................................ 0001A0
00000000 00000000 00000000 00000000 00000000 00000000 00000000 00000000 ................................ 0001C0
00000000 00000000 00000000 00000000 00000000 00000000 00000000 00000000 ................................ 0001E0

Dump of file SATURN:[PCCOMMON.DUMP.DLL]GTI.TMP;1 on 18-APR-1990 10:46:19.71
File ID (691,13,0)   End of file block 41 / Allocated 44

Virtual block number 38 (00000026), 512 (0200) bytes

00000000 00000000 00000000 00000000 00000000 00000000 00000000 00000000 ................................ 000000
00000000 00000000 00000000 00000000 00000000 00000000 00000000 00000000 ................................ 000020
00000000 00000000 00000000 00000000 00000000 00000000 00000000 00000000 ................................ 000040
00000000 00000000 00000000 00000000 00000000 00000000 00000000 00000000 ................................ 000060
00000000 00000000 00000000 00000000 00000000 00000000 00000000 00000000 ................................ 000080
00000000 00000000 00000000 00000000 00000000 00000000 00000000 00000000 ................................ 0000A0
00000000 00000000 00000000 00000000 00000000 00000000 00000000 00000000 ................................ 0000C0
00000000 00000000 00000000 00000000 00000000 00000000 00000000 00000000 ................................ 0000E0
00000000 00000000 00000000 00000000 00000000 00000000 00000000 00000000 ................................ 000100
00000000 00000000 00000000 00000000 00000000 00000000 00000000 00000000 ................................ 000120
00000000 00000000 00000000 00000000 00000000 00000000 00000000 00000000 ................................ 000140
00000000 00000000 00000000 00000000 00000000 00000000 00000000 00000000 ................................ 000160
00000000 00000000 00000000 00000000 00000000 00000000 00000000 00000000 ................................ 000180
00000000 00000000 00000000 00000000 00000000 00000000 00000000 00000000 ................................ 0001A0
00000000 00000000 00000000 00000000 00000000 00000000 00000000 00000000 ................................ 0001C0
00000000 00000000 00000000 00000000 00000000 00000000 00000000 00000000 ................................ 0001E0

Dump of file SATURN:[PCCOMMON.DUMP.DLL]GTI.TMP;1 on 18-APR-1990 10:46:19.71
File ID (691,13,0)   End of file block 41 / Allocated 44

Virtual block number 39 (00000027), 512 (0200) bytes

00000000 00000000 00000000 00000000 00000000 00000000 00000000 00000000 ................................ 000000
00000000 00000000 00000000 00000000 00000000 00000000 00000000 00000000 ................................ 000020
00000000 00000000 00000000 00000000 00000000 00000000 00000000 00000000 ................................ 000040
00000000 00000000 00000000 00000000 00000000 00000000 00000000 00000000 ................................ 000060
00000000 00000000 00000000 00000000 00000000 00000000 00000000 00000000 ................................ 000080
00000000 00000000 00000000 00000000 00000000 00000000 00000000 00000000 ................................ 0000A0
00000000 00000000 00000000 00000000 00000000 00000000 00000000 00000000 ................................ 0000C0
00000000 00000000 00000000 00000000 00000000 00000000 00000000 00000000 ................................ 0000E0
00000000 00000000 00000000 00000000 00000000 00000000 00000000 00000000 ................................ 000100
00000000 00000000 00000000 00000000 00000000 00000000 00000000 00000000 ................................ 000120
00000000 00000000 00000000 00000000 00000000 00000000 00000000 00000000 ................................ 000140
00000000 00000000 00000000 00000000 00000000 00000000 00000000 00000000 ................................ 000160
00000000 00000000 00000000 00000000 00000000 00000000 00000000 00000000 ................................ 000180
00000000 00000000 00000000 00000000 00000000 00000000 00000000 00000000 ................................ 0001A0
00000000 00000000 00000000 00000000 00000000 00000000 00000000 00000000 ................................ 0001C0
00000000 00000000 00000000 00000000 00000000 00000000 00000000 00000000 ................................ 0001E0
```

```
Dump of file SATURN:[PCCOMMON.DUMP.DLL]GTI.TMP;1 on 18-APR-1990 10:46:19.71
File ID (691,13,0)    End of file block 41 / Allocated 44

Virtual block number 40 (00000028), 512 (0200) bytes

00000000 00000000 00000000 00000000 00000000 00000000 00000000 00000000 ................................ 000000
00000000 00000000 00000000 00000000 00000000 00000000 00000000 00000000 ................................ 000020
00000000 00000000 00000000 00000000 00000000 00000000 00000000 00000000 ................................ 000040
00000000 00000000 00000000 00000000 00000000 00000000 00000000 00000000 ................................ 000060
00000000 000000A6 10C00000 00000000 00000000 00000000 00000000 00000000 .......................à.!....... 000080
00000000 00000000 00000000 00000000 81818101 00000001 00000000 00000000 ................................ 0000A0
00000000 00000000 00000000 00000000 00000000 00000000 00000000 00000000 ................................ 0000C0
00000000 00000000 00000000 00000000 00000000 00000000 00000000 00000000 ................................ 0000E0
00000000 00000000 00000000 00000000 00000000 00000000 00000000 00000000 ................................ 000100
00000000 00000000 00000000 00000000 00000000 00000000 00000000 00000000 ................................ 000120
00000000 00000000 00000000 00000000 00000000 00000000 00000000 00000000 ................................ 000140
00000000 00000000 00000000 00000000 00000000 00000000 00000000 00000000 ................................ 000160
00000000 00000000 00000000 00000000 00000000 00000000 00000000 00000000 ................................ 000180
0A0A0A0A 0A0A0A0A 0A0A0A0A 0A0A0A0A 0A0A0A00 00000000 00000000 00000000 ................................ 0001A0
0A0A0A0A 0A0A0A0A 0A0A0A0A 0A0A0A0A 0A0A0A0A 0A0A0A0A 0A0A0A0A 0A0A0A0A ................................ 0001C0
0A0A0A0A 0A0A0A0A 0A0A0A0A 0A0A0A0A 0A0A0A0A 0A0A0A0A 0A0A0A0A 0A0A0A0A ................................ 0001E0

Dump of file SATURN:[PCCOMMON.DUMP.DLL]GTI.TMP;1 on 18-APR-1990 10:46:19.71
File ID (691,13,0)    End of file block 41 / Allocated 44

Virtual block number 41 (00000029), 512 (0200) bytes

0A0A0A0A 0A0A0A0A 0A0A0A0A 0A0A0A0A 0A0A0A0A 0A0A0A0A 0A0A0A0A 0A0A0A0A ................................ 000000
0A0A0A0A 0A0A0A0A 0A0A0A0A 0A0A0A0A 0A0A0A0A 0A0A0A0A 0A0A0A0A 0A0A0A0A ................................ 000020
0A0A0A0A 0A0A0A0A 0A0A0A0A 0A0A0A0A 0A0A0A0A 0A0A0A0A 0A0A0A0A 0A0A0A0A ................................ 000040
0A0A0A0A 0A0A0A0A 0A0A0A0A 0A0A0A0A 0A0A0A0A 0A0A0A0A 0A0A0A0A 0A0A0A0A ................................ 000060
0A0A0A0A 0A0A0A0A 0A0A0A0A 0A0A0A0A 0A0A0A0A 0A0A0A0A 0A0A0A0A 0A0A0A0A ................................ 000080
00000000 00000000 00000000 00000000 0000000A 0A0A0A0A 0A0A0A0A 0A0A0A0A ................................ 0000A0
00000000 00000000 00000000 00002000 00000000 00000000 00000000 00000000 ................................ 0000C0
00003E3E 47534D4E 3C3C0082 1920191E 191C191A 19181916 FFFF04CA 15D40000 ..à.ò.............. ...<<NMSG>>.. 0000E0
30303652 0003000A 0D776F6C 66726576 6F206863 61747320 2D0A0030 30303652 R6000..- stack overflow.....R600 000100
30365200 08000A00 30207962 20656469 76696420 72656765 746E6920 2D0A0033 3..- integer divide by 0.....R60 000120
60756772 6120726F 66206563 61707320 6867756F 6E652074 6F6E2020 0A003830 08..- not enough space for argum 000140
61707320 6867756F 6E652074 6F6E202D 0A003930 30365200 09000A00 73746E65 ents.....R6009..- not enough spa 000160
2D6E7572 00FF000A 0000FC00 0A00746E 656D6E6F 7269766E 6520726F 66206563 ce for environment...=......run- 000180
20676E69 74616F6C 6620200A 00323030 36520002 0020726F 72726520 656D6974 time error ...R6002..- floating 0001A0
00000000 19140002 0003FFFF FF000A00 64656461 6F6C2074 6F6E2074 6E696F70 point not loaded................ 0001C0
00000000 00000000 00000000 00000000 0000000F 16C80002 0000000E 04DA0002 ..O.......à..................... 0001E0
```

```
Dump of file SATURN:[PCCOMMON.DUMP.DLL]GRFORMS.TMP;1 on 18-APR-1990 10:46:11.91
File ID (676,20,0)   End of file block 13 / Allocated 16

Virtual block number 1 (00000001), 512 (0200) bytes

 00000000 00000040 00000000 000000B8 0000FFFF 00000004 00000000 01205A4D MZ ..............¡.......@....... 000000
 00000080 00000060 00000000 00000000 00000000 00000000 00000000 00000000 ................................ 000020
 6F6E6E61 63206D61 72676F72 70207369 685421CD 4C01B821 CD09B400 0EBA1F0E ..¤..Ç.ëÍ¡.LÉÍThis program canno 000040
 00000000 00000024 0A0D0D2E 65646F6D 20534F44 206E6920 6E757220 65622074 t be run in DOS mode....$....... 000060
 00000003 00000000 00000000 00000000 00038009 9013A274 00070063 0505454E NE..c...tÅ...................... 000080
 00000000 00000000 00010000 00040000 000000EA 00630063 00580058 00400038 8.@.X.X.c.c.õ................... 0000A0
 534D524F 46524707 :9320E21 1730001F 00360E00 0036001B 006C0F00 006C0013 ..l...l...6...6...0.!.2..GRFORMS 0000C0
 60726F46 20324244 2030312E 33204E41 4D484341 42100000 00000301 01000000 ...........BACHMAN 3.10 DB2 Form 0000E0
 01454D41 4E4C4C44 59524555 51534D52 4F463242 44140000 6D657473 79532073 s System...DB2FORMSQUERYDLLNAME. 000100
 00FE46C7 D88EFFFF B81E5657 000002C8 00000000 00000000 00000000 00000000 ................à...WV.¡...ÄúF±. 000120
 02FE5E69 0038E99A 71B80006 E9037400 0000BF83 0102FE5E 69FE46FF 0003E900 .Õ...F±i^±...é...t.Õ..¡q.Õ8.i^±. 000140
 00009A06 76FF0876 FF501E00 02050102 FE466900 1EE90374 00008739 0A468801 ..F.9...t.Õ..iF±......P.v..v.... 000160
 00020002 900006CA C95F5E1F 0000E99A 71B8FFB6 E90009E9 00008808 C483FFFF ...é.¡..Õ..ÕÑ.¡q.Õ...^_èò....... 000180
 8ED88CFE 880A76C5 1EDE88D7 88EC8855 00000000 00030008 00020000 00020050 P...............U.$.m.B.év..±.Ä. 0001A0
 8BF388A4 F3C913A5 F3E9D149 A4027401 A8C78806 7EC4D1F7 AEF2FFFF B9C033C0 à3à¿..·Û%Íé~..ú´.t.ÉÌÌÕµÈ.èµÈ.µ. 0001C0
 00000000 00000000 00000000 000007D1 00000000 00000000 0000CB5D C28C1FFA °..õ]ù.........î............... 0001E0

Dump of file SATURN:[PCCOMMON.DUMP.DLL]GRFORMS.TMP;1 on 18-APR-1990 10:46:11.91
File ID (676,20,0)   End of file block 13 / Allocated 16

Virtual block number 2 (00000002), 512 (0200) bytes

 00000000 00000000 00000000 00000000 00000000 00000000 00000000 00000000 ................................ 000000
 00000000 00000000 00000000 00000000 00000000 00000000 00000000 00000000 ................................ 000020
 00000000 00000000 00000000 00000000 00000000 00000000 00000000 00000000 ................................ 000040
 00000000 00000000 00000000 00000000 00000000 00000000 00000000 00000000 ................................ 000060
 00000000 00000000 00000000 00000000 00000000 00000000 00000000 00000000 ................................ 000080
 00000000 00000000 00000000 00000000 00000000 00000000 00000000 00000000 ................................ 0000A0
 00000000 00000000 00000000 00000000 00000000 00000000 00000000 00000000 ................................ 0000C0
 00000000 00000000 00000000 07D20000 00000000 00000000 00000000 00000000 ..................Ò............. 0000E0
 00000000 00000000 00000000 00000000 00000000 00000000 00000000 00000000 ................................ 000100
 00000000 00000000 00000000 00000000 00000000 00000000 00000000 00000000 ................................ 000120
 00000000 00000000 00000000 00000000 00000000 00000000 00000000 00000000 ................................ 000140
 00000000 00000000 00000000 00000000 00000000 00000000 00000000 00000000 ................................ 000160
 00000000 00000000 00000000 00000000 00000000 00000000 00000000 00000000 ................................ 000180
 00000000 00000000 00000000 00000000 00000000 00000000 00000000 00000000 ................................ 0001A0
 00000000 00000000 00000000 00000000 00000000 00000000 00000000 00000000 ................................ 0001C0
 00000000 00000000 000007D3 00000000 00000000 00000000 00000000 00000100 ......................Ó......... 0001E0

Dump of file SATURN:[PCCOMMON.DUMP.DLL]GRFORMS.TMP;1 on 18-APR-1990 10.46:11.91
File ID (676,20,0)   End of file block 13 / Allocated 16

Virtual block number 3 (00000003), 512 (0200) bytes

 00000000 00000000 00000000 00000000 00000000 00000000 00000000 00000000 ................................ 000000
 00000000 00000000 00000000 00000000 00000000 00000000 00000000 00000000 ................................ 000020
 00000000 00000000 00000000 00000000 00000000 00000000 00000000 00000000 ................................ 000040
 00000000 00000000 00000000 00000000 00000000 00000000 00000000 00000000 ................................ 000060
 00000000 00000000 00000000 00000000 00000000 00000000 00000000 00000000 ................................ 000080
 00000000 00000000 00000000 00000000 00000000 00000000 00000000 00000000 ................................ 0000A0
 00000000 00000000 00000000 00000000 00000000 00000000 00000000 00000000 ................................ 0000C0
 00000000 00000000 07D40000 00000000 00000000 00000000 00000000 00000000 .......................Ô........ 0000E0
 00000000 00000000 00000000 00000000 00000000 00000000 00000000 00000000 ................................ 000100
 00000000 00000000 00000000 00000000 00000000 00000000 00000000 00000000 ................................ 000120
 00000000 00000000 00000000 00000000 00000000 00000000 00000000 00000000 ................................ 000140
 00000000 00000000 00000000 00000000 00000000 00000000 00000000 00000000 ................................ 000160
 00000000 00000000 00000000 00000000 00000000 00000000 00000000 00000000 ................................ 000180
 00000000 00000000 00000000 00000000 00000000 00000000 00000000 00000000 ................................ 0001A0
 00000000 00000000 00000000 00000000 00000000 00000000 00000000 00000000 ................................ 0001C0
 454E2032 424407D5 00000000 00000000 00000000 00000000 00000000 00000000 ........................Õ.DB2-NE 0001E0
```

```
Dump of file SATURN:[PCCOMMON.DUMP.DLL]GRFORMS.TMP;1 on 18-APR-1990 10:46:11.91
File ID (676,20,0)   End of file block 13 / Allocated 16

Virtual block number 4 (00000004), 512 (0200) bytes

00000000 00000000 00000000 00000000 00000000 00000000 00000000 00000057 W............................... 000000
00000000 00000000 00000000 00000000 00000000 00000000 00000000 00000000 ................................ 000020
00000000 00000000 00000000 00000000 00000000 00000000 00000000 00000000 ................................ 000040
00000000 00000000 00000000 00000000 00000000 00000000 00000000 00000000 ................................ 000060
00000000 00000000 00000000 00000000 00000000 00000000 00000000 00000000 ................................ 000080
00000000 00000000 00000000 00000000 00000000 00000000 00000000 00000000 ................................ 0000A0
00000000 00000000 00000000 00000000 00000000 00000000 00000000 00000000 ................................ 0000C0
00000000 07D60000 00000000 00000000 00000000 00000000 00000000 00000000 ..........................ø..... 0000E0
00000000 00000000 00000000 00000000 00000000 00000000 00000000 00000000 ................................ 000100
00000000 00000000 00000000 00000000 00000000 00000000 00000000 00000000 ................................ 000120
00000000 00000000 00000000 00000000 00000000 00000000 00000000 00000000 ................................ 000140
00000000 00000000 00000000 00000000 00000000 00000000 00000000 00000000 ................................ 000160
00000000 00000000 00000000 00000000 00000000 00000000 00000000 00000000 ................................ 000180
00000000 00000000 00000000 00000000 00000000 00000000 00000000 00000000 ................................ 0001A0
00000000 00000000 00000000 00000000 00000000 00000000 00000000 00000000 ................................ 0001C0
424407D7 00000000 00000000 00000000 00000000 00000000 00000000 00000000 ............................•.DB 0001E0

Dump of file SATURN:[PCCOMMON.DUMP.DLL]GRFORMS.TMP;1 on 18-APR-1990 10:46:11.91
File ID (676,20,0)   End of file block 13 / Allocated 16

Virtual block number 5 (00000005), 512 (0200) bytes

00000000 00000000 00000000 00000000 00000000 00000000 00005345 44502D32 2-PDES.......................... 000000
00000000 00000000 00000000 00000000 00000000 00000000 00000000 000C 000 ................................ 000020
00000000 00000000 00000000 00000000 00000000 00000000 00000000 0000.-00 ................................ 000040
00000000 00000000 00000000 00000000 00000000 00000000 00000000 00000000 ................................ 000060
00000000 00000000 00000000 00000000 00000000 00000000 00000000 00000000 ................................ 000080
00000000 00000000 00000000 00000000 00000000 00000000 00000000 00000000 ................................ 0000A0
00000000 00000000 00000000 00000000 00000000 00000000 00000000 00000000 ................................ 0000C0
07D80000 00000000 00000000 00000000 00000000 00000000 00000000 00000000 ..............................Å. 0000E0
00000000 00000000 00000000 00000000 00000000 00000000 00000000 00000000 ................................ 000100
00000000 00000000 00000000 00000000 00000000 00000000 00000000 00000000 ................................ 000120
00000000 00000000 00000000 00000000 00000000 00000000 00000000 00000000 ................................ 000140
00000000 00000000 00000000 00000000 00000000 00000000 00000000 00000000 ................................ 000160
00000000 00000000 00000000 00000000 00000000 00000000 00000000 00000000 ................................ 000180
00000000 00000000 00000000 00000000 00000000 00000000 00000000 00000000 ................................ 0001A0
00000000 00000000 00000000 00000000 00000000 00000000 00000000 00000000 ................................ 0001C0
00000000 00000000 00000000 00000000 00000000 00000000 00000000 00000000 ................................ 0001E0

Dump of file SATURN:[PCCOMMON.DUMP.DLL]GRFORMS.TMP;1 on 18-APR-1990 10:46:11.91
File ID (676,20,0)   End of file block 13 / Allocated 16

Virtual block number 6 (00000006), 512 (0200) bytes

00000000 00000000 00000000 00000000 00000000 00000000 00000000 000007D9 \............................... 000000
00000000 00000000 00000000 00000000 00000000 00000000 00000000 00000000 ................................ 000020
00000000 00000000 00000000 00000000 00000000 00000000 00000000 00000000 ................................ 000040
00000000 00000000 00000000 00000000 00000000 00000000 00000000 00000000 ................................ 000060
00000000 00000000 00000000 00000000 00000000 00000000 00000000 00000000 ................................ 000080
00000000 00000000 00000000 00000000 00000000 00000000 00000000 00000000 ................................ 0000A0
00000000 00000000 00000000 00000000 00000000 00000000 00000000 00000000 ................................ 0000C0
00000000 00000000 00000000 00000000 00000000 00000000 00000000 00000000 ................................ 0000E0
00000000 00000000 00000000 00000000 00000000 00000000 00000000 07DA0000 ..ö............................. 000100
00000000 00000000 00000000 00000000 00000000 00000000 00000000 00000000 ................................ 000120
00000000 00000000 00000000 00000000 00000000 00000000 00000000 00000000 ................................ 000140
00000000 00000000 00000000 00000000 00000000 00000000 00000000 00000000 ................................ 000160
00000000 00000000 00000000 00000000 00000000 00000000 00000000 00000000 ................................ 000180
00000000 00000000 00000000 00000000 00000000 00000000 00000000 00000000 ................................ 0001A0
00000000 00000000 00000000 00000000 00000000 00000000 00000000 00000000 ................................ 0001C0
00000000 00000000 00000000 00000000 00000000 00000000 00000000 00000000 ................................ 0001E0
```

```
Dump of file SATURN:[PCCOMMON.DUMP.DLL]GRFORMS.TMP;1 on 18-APR-1990 10:46:11.91
File ID (676,20,0)   End of file block 13 / Allocated 16

Virtual block number 7 (00000007), 512 (0200) bytes

00000000 00000000 00000000 00000000 00000000 00000000 000007DB 00000000 ....Û........................... 000000
00000000 00000000 00000000 00000000 00000000 00000000 00000000 00000000 ................................ 000020
00000000 00000000 00000000 00000000 00000000 00000000 00000000 00000000 ................................ 000040
00000000 00000000 00000000 00000000 00000000 00000000 00000000 00000000 ................................ 000060
00000000 00000000 00000000 00000000 00000000 00000000 00000000 00000000 ................................ 000080
00000000 00000000 00000000 00000000 00000000 00000000 00000000 00000000 ................................ 0000A0
00000000 00000000 00000000 00000000 00000000 00000000 00000000 00000000 ................................ 0000C0
00000000 00000000 00000000 00000000 00000000 00000000 00000000 00000000 ................................ 0000E0
00000000 00000000 00000000 00000000 00000000 00000000 07DC0000 00000000 ......É......................... 000100
00000000 00000000 00000000 00000000 00000000 00000000 00000000 00000000 ................................ 000120
00000000 00000000 00000000 00000000 00000000 00000000 00000000 00000000 ................................ 000140
00000000 00000000 00000000 00000000 00000000 00000000 00000000 00000000 ................................ 000160
00000000 00000000 00000000 00000000 00000000 00000000 00000000 00000000 ................................ 000180
00000000 00000000 00000000 00000000 00000000 00000000 00000000 00000000 ................................ 0001A0
00000000 00000000 00000000 00000000 00000000 00000000 00000000 00000000 ................................ 0001C0
00000000 00000000 00000000 00000000 00000000 00000000 00000000 00000000 ................................ 0001E0

Dump of file SATURN:[PCCOMMON.DUMP.DLL]GRFORMS.TMP;1 on 18-APR-1990 10:46:11.91
File ID (676,20,0)   End of file block 13 / Allocated 16

Virtual block number 8 (00000008), 512 (0200) bytes

00000000 00000000 00000000 00000000 00000000 000007DD 00000000 00000000 ........Ý....................... 000000
00000000 00000000 00000000 00000000 00000000 00000000 00000000 00000000 ................................ 000020
00000000 00000000 00000000 00000000 00000000 00000000 00000000 00000000 ................................ 000040
00000000 00000000 00000000 00000000 00000000 00000000 00000000 00000000 ................................ 000060
00000000 00000000 00000000 00000000 00000000 00000000 00000000 00000000 ................................ 000080
00000000 00000000 00000000 00000000 00000000 00000000 00000000 00000000 ................................ 0000A0
00000000 00000000 00000000 00000000 00000000 00000000 00000000 00000000 ................................ 0000C0
00000000 00000000 00000000 00000000 00000000 00000000 00000000 00000000 ................................ 0000E0
00000000 00000000 00000000 00000000 00000000 07DE0000 00000000 00000000 ..........Þ..................... 000100
00000000 00000000 00000000 00000000 00000000 00000000 00000000 00000000 ................................ 000120
00000000 00000000 00000000 00000000 00000000 00000000 00000000 00000000 ................................ 000140
00000000 00000000 00000000 00000000 00000000 00000000 00000000 00000000 ................................ 000160
00000000 00000000 00000000 00000000 00000000 00000000 00000000 00000000 ................................ 000180
00000000 00000000 00000000 00000000 00000000 00000000 00000000 00000000 ................................ 0001A0
00000000 00000000 00000000 00000000 00000000 00000000 00000000 00000000 ................................ 0001C0
00000000 00000000 00000000 00000000 00000000 00000000 00000000 00000000 ................................ 0001E0

Dump of file SATURN:[PCCOMMON.DUMP.DLL]GRFORMS.TMP;1 on 18-APR-1990 10:46:11.91
File ID (676,20,0)   End of file block 13 / Allocated 16

Virtual block number 9 (00000009), 512 (0200) bytes

00000000 00000000 00000000 00000000 000007DF 00000000 00000000 00000000 ............Ô................... 000000
00000000 00000000 00000000 00000000 00000000 00000000 00000000 00000000 ................................ 000020
00000000 00000000 00000000 00000000 00000000 00000000 00000000 00000000 ................................ 000040
00000000 00000000 00000000 00000000 00000000 00000000 00000000 00000000 ................................ 000060
00000000 00000000 00000000 00000000 00000000 00000000 00000000 00000000 ................................ 000080
00000000 00000000 00000000 00000000 00000000 00000000 00000000 00000000 ................................ 0000A0
00000000 00000000 00000000 00000000 00000000 00000000 00000000 00000000 ................................ 0000C0
00000000 00000000 00000000 00000000 00000000 00000000 00000000 00000000 ................................ 0000E0
00000000 00000000 00000000 00000000 07E00000 00000000 00000000 00000000 ..............À................. 000100
00000000 00000000 00000000 00000000 00000000 00000000 00000000 00000000 ................................ 000120
00000000 00000000 00000000 00000000 00000000 00000000 00000000 00000000 ................................ 000140
00000000 00000000 00000000 00000000 00000000 00000000 00000000 00000000 ................................ 000160
00000000 00000000 00000000 00000000 00000000 00000000 00000000 00000000 ................................ 000180
00000000 00000000 00000000 00000000 00000000 00000000 00000000 00000000 ................................ 0001A0
00000000 00000000 00000000 00000000 00000000 00000000 00000000 00000000 ................................ 0001C0
00000000 00000000 00000000 00000000 00000000 00000000 00000000 00000000 ................................ 0001E0
```

```
Dump of file SATURN:[PCCOMMON.DUMP.DLL]GRFORMS.TMP;1 on 18-APR-1990 10:46:11.91
File ID (676,20,0)    End of file block 13 / Allocated 16

Virtual block number 10 (0000000A), 512 (0200) bytes

00000000 00000000 00000000 000007E1 00000000 00000000 00000000 00000000 ................Å............... 000000
00000000 00000000 00000000 00000000 00000000 00000000 00000000 00000000 ................................ 000020
00000000 00000600 00000000 00000000 00000000 00000000 00000000 00000000 ................................ 000040
00000000 00000000 00000000 00000000 00000000 00000000 00000000 00000000 ................................ 000060
00000000 00000000 000C0000 00000000 00000000 00000000 00000000 00000000 ................................ 000080
00000000 00000000 00000000 00000000 00000000 00000000 00000000 00000000 ................................ 0000A0
00000000 00000000 00000000 00000000 00000000 00000000 00000000 00000000 ................................ 0000C0
00000000 00000000 00000000 00000000 00000000 00000000 00000000 00000000 ................................ 0000E0
00000000 00000000 00000000 07E20000 00000000 00000000 00000000 00000000 ..................â............. 000100
00000000 00000000 00000000 00000000 00000000 00000000 00000000 00000000 ................................ 000120
00000000 00000000 00000000 00000000 00000000 00000000 00000000 00000000 ................................ 000140
00000000 00000000 00000000 00000000 00000000 00000000 00000000 00000000 ................................ 000160
00000000 00000000 00000000 00000000 00000000 00000000 00000000 00000000 ................................ 000180
00000000 00000000 00000000 00000C0G 00000000 00000000 00000000 00000000 ................................ 0001A0
00000000 00000000 00000000 00000000 00000000 00000000 00000000 00000000 ................................ 0001C0
00000000 00000000 00000000 00000000 00000000 00000000 00000000 00000000 ................................ 0001E0

Dump of file SATURN:[PCCOMMON.DUMP.DLL]GRFORMS.TMP;1 on 18-APR-1990 10:46:11.91
File ID (676,20,0)    End of file block 13 / Allocated 16

Virtual block number 11 (0000000B), 512 (0200) bytes

00000000 00000000 000007E3 00000000 00000000 00000000 00000000 00000000 ....................D........... 000000
00000000 00000000 00000000 00000000 00000000 00000000 00000000 00000000 ................................ 000020
00000000 00000000 00000000 00000000 00000000 00000000 00000000 00000000 ................................ 000040
00000000 00000000 00000000 00000000 00000000 00000000 00000000 00000000 ................................ 000060
00000000 00000000 00000000 00000000 00000000 00000000 00000000 00000000 ................................ 000080
00000000 00000000 00000000 00000000 00000000 00000000 00000000 00000000 ................................ 0000A0
00000000 00000000 00000000 00000000 00000000 00000000 00000000 00000000 ................................ 0000C0
00000000 00000000 00000000 00000000 00000000 00000000 00000000 00000000 ................................ 0000E0
00000000 00000000 07E40000 00000000 00000000 00000000 00000000 00000000 ......................ä......... 000100
00000000 00000000 00000000 00000000 00000000 00000000 00000000 00000000 ................................ 000120
00000000 00000000 00000000 00000000 00000000 00000000 00000000 00000000 ................................ 000140
00000000 00000000 00000000 00000000 00000000 00000000 00000000 00000000 ................................ 000160
00000000 00000000 00000000 00000000 00000000 00000000 00000000 00000000 ................................ 000180
00000000 0000000^ 00000000 00000000 00000000 00000000 00000000 00000000 ................................ 0001A0
00000000 0000000C 00000000 00000000 00000000 00000000 00000000 00000000 ................................ 0001C0
00000000 00000000 00000000 00000000 00000000 00000000 00000000 00000000 ................................ 0001E0

Dump of file SATURN:[PCCOMMON.DUMP.DLL]GRFORMS.TMP;1 on 18-APR-1990 10:46:11.91
File ID (676,20,0)    End of file block 13 / Allocated 16

Virtual block number 12 (0000000C), 512 (0200) bytes

00000000 000007E5 00000000 00000000 00000000 00000000 00000000 00000000 ........................å....... 000000
00000000 00000000 00000000 00000000 00000000 00000000 00000000 00000000 ................................ 000020
00000000 00000000 00000000 00000000 00000000 00000000 00000000 00000000 ................................ 000040
00000000 00000000 00000000 00000000 00000000 00000000 00000000 00000000 ................................ 000060
00000000 00000000 00000000 00000000 00000000 00000000 00000000 00000000 ................................ 000080
00000000 00000000 00000000 00000000 00000000 00000000 00000000 00000000 ................................ 0000A0
00000000 00000000 00000000 00000000 00000000 00000000 00000000 00000000 ................................ 0000C0
00000000 00000000 00000000 00000000 00000000 00000000 00000000 00000000 ................................ 0000E0
00000000 07E60000 00000000 00000000 00000000 00000000 00000000 00000000 ..........................æ..... 000100
00000000 00000000 00000000 00000000 00000000 00000000 00000000 00000000 ................................ 000120
00000000 00000000 00000000 00000000 00000000 00000000 00000000 00000000 ................................ 000140
00000000 00000000 00000000 00000000 00000000 00000000 00000000 00000000 ................................ 000160
00000000 00000000 00000000 00000000 00000000 00000000 00000000 00000000 ................................ 000180
00000000 00000000 00000000 00000000 00000000 00000000 00000000 00000000 ................................ 0001A0
00000000 00000000 00000000 00000000 00000000 00000000 00000000 00000000 ................................ 0001C0
00000000 00000000 00000000 00000000 00000000 00000000 00000000 00000000 ................................ 0001E0
```

```
Dump of file SATURN:[PCCOMMON.DUMP.DLL]GRFORMS.TMP;1 on 18-APR-1990 10:46:11.91
File ID (676,20,0)   End of file block 13 / Allocated 16

Virtual block number 13 (0000000D), 512 (0200) bytes

000007E7 00000000 00000000 00000000 00000000 00000000 00000000 00000000 ............................ó... 000000
00000000 00000000 00000000 00000000 00000000 00000000 00000000 00000000 ................................ 000020
00000000 00000000 00000000 00000000 00000000 00000000 00000000 00000000 ................................ 000040
00000000 00000000 00000000 00000000 00000000 00000000 00000000 00000000 ................................ 000060
00000000 00000000 00000000 00000000 00000000 00000000 00000000 00000000 ................................ 000080
00000000 00000000 00000000 00000000 00000000 00000000 00000000 00000000 ................................ 0000A0
00000000 00000000 00000000 00000000 00000000 00000000 00000000 00000000 ................................ 0000C0
00000000 00000000 00000000 00000000 00000000 00000000 00000000 00000000 ................................ 0000E0
07E80000 00000000 00000000 00000000 00000000 00000000 00000000 00000000 ..............................ò. 000100
00000000 00000000 00000000 00000000 00000000 00000000 00000000 00000000 ................................ 000120
00000000 00000000 00000000 00000000 00000000 00000000 00000000 00000000 ................................ 000140
00000000 00000000 00000000 00000000 00000000 00000000 00000000 00000000 ................................ 000160
00000000 00000000 00000000 00000000 00000000 00000000 00000000 00000000 ................................ 000180
00000000 00000000 00000000 00000000 00000000 00000000 00000000 00000000 ................................ 0001A0
00000000 00000000 00000000 00000000 00000000 00000000 00000000 00000000 ................................ 0001C0
00000000 00000000 00000000 00000000 00000000 00000000 00000000 00000000 ................................ 0001E0
```

```
Dump of file SATURN:[PCCOMMON.DUMP.DATA]SAEXPORT.SOL;1 on 18-APR-1990 08:21:19.32
File ID (472,18,0)   End of file block 30 / Allocated 32

Virtual block number 1 (00000001), 512 (0200) bytes

 6D0A0020 28204C45 444F4D5F 5453594C 414E4120 656C6261 74206574 61657263 create table ANALYST_MODEL ( ..m 000000
 2079656B 4C45444F 4D5F5453 594C414E 410A0D2C 72656765 746E6920 65646F63 code integer,..ANALYST_MODELkey  000020
 2C29392B 72616863 72617620 79626465 74616572 630A0020 2C726567 65746E69 integer, ..createdby varchar(9), 000040
 69646F6D 0A0D202C 706D6174 73656D69 7420656D 69746465 74616572 630A0020  ..createdtime timestamp, ..modi 000060
 6D697464 65696669 646F6D0A 00202C29 39287261 68637261 76207962 64656966 fiedby varchar(9), ..modifiedtim 000080
 0D2C2936 37287261 68637261 7620454D 414E0A0D 2C706D61 7473656D 69742065 e timestamp,..NAME varchar(76),. 0000A0
 6C626174 20657461 6572630A 0D0A0D3B 290A0D72 65676574 6E692054 5845540A .TEXT integer..);....create tabl 0000C0
 6E692065 646F636D 0A0D2820 4F575945 4B4C4544 4F4D5F54 53594C41 4E412065 e ANALYST_MODELKEYWO (..mcode in 0000E0
 72656765 746E6920 7965684C 45444F4D 5F545359 4C414E41 0A0D2C72 6[illegible]76574 teger,..ANALYST_MODELkey integer 000100
 6572630A 0D0A0D3B 290A0D72 65676574 6E692079 65684452 4F575945 4B0[illegible]02C ,..KEYWORDkey integer..);....cre 000120
 0A0D2820 5341494C 414C4544 4F4D5F54 53594C41 4E412065 6C626174 2065[illegible]61 ate table ANALYST_MODELALIAS (.. 000140
 7965684C 45444F4D 5F545359 4C414E41 0A0D2C72 65676574 6E692065 646F636D mcode integer,..ANALYST_MODELkey 000160
 0D3B290A 0D726567 65746E69 2079656B 5341494C 410A0D2C 72656765 746E6920  integer,..ALIASkey integer..);. 000180
 544F4E4C 45444F4D 5F545359 4C414E41 20656C62 61742065 74616572 630A0D0A ...create table ANALYST_MODELNOT 0001A0
 4F4D5F54 53594C41 4E410A0D 2C726567 65746E69 2065646F 636D0A0D 28205345 ES (..mcode integer,..ANALYST_MO 0001C0
 65676574 6E692079 65685345 544F4E0A 0D2C7265 6765746E 69207965 6B4C4544 DELkey integer,..NOTESkey intege 0001E0

Dump of file SATURN:[PCCOMMON.DUMP.DATA]SAEXPORT.SQL;1 on 18-APR-1990 08:21:19.32
File ID (472,18,0)   End of file block 30 / Allocated 32

Virtual block number 2 (00000002), 512 (0200) bytes

 4C45444F 4D5F4154 41442065 6C626174 20657461 6572630A 0D0A0D3B 290A0D72 r..);....create table DATA_MODEL 000000
 6B4C4544 4F4D5F41 5441440A 0D2C7265 6765746E 69206564 6F636D0A 0D202820  ( ..mcode integer,..DATA_MODELk 000020
 28726168 63726176 20796264 65746165 72630A0D 202C7265 6765746E 69207965 ey integer, ..createdby varchar( 000040
 6D0A0020 2C706D61 7473656D 69742065 6D697464 65746165 72630A0D 202C2939 9), ..createdtime timestamp, ..m 000060
 64656966 69646F6D 0A0D202C 29392872 61686372 61762079 62646569 6669646F odifiedby varchar(9), ..modified 000080
 36372872 61686372 61762045 4D414E0A 0D2C706D 61747365 6D697420 656D6974 time timestamp,..NAME varchar(76 0000A0
 20325354 49424C41 560A0D2C 746E696C 6C616D73 20535449 424C4156 0A0D2C29 ),..VALBITS smallint,..VALBITS2  0000C0
 560A0D2C 746E696C 6C616D73 20335354 49424C41 560A0D2C 746E696C 6C616D73 smallint,..VALBITS3 smallint,..V 0000E0
 6C616D73 20355354 49424C41 560A0D2C 746E696C 6C616D73 20345354 49424C41 ALBITS4 smallint,..VALBITS5 smal 000100
 49424C41 560A0D2C 746E696C 6C616D73 20365354 49424C41 560A0D2C 746E696C lint,..VALBITS6 smallint,..VALBI 000120
 746E696C 6C616D73 20385354 49424C41 560A0D2C 746E696C 6C616D73 20375354 TS7 smallint,..VALBITS8 smallint 000140
 6E692054 5845540A 0D2C2931 34287261 68637261 76205245 4E494645 440A0D2C ,..DEFINER varchar(41),..TEXT in 000160
 290A0D72 65676574 6E69204C 45444F4D 5F545359 4C414E41 0A0D2C72 65676574 teger,..ANALYST_MODEL integer..) 000180
 54584554 4C45444F 4D5F4154 41442065 6C626174 20657461 6572630A 0D0A0D3B ;....create table DATA_MODELTEXT 0001A0
 65684C45 444F4D5F 41544144 0A0D2C72 65676574 6E692065 646F636D 0A0D2820  (..mcode integer,..DATA_MODELke 0001C0
 0D3B290A 0D726567 65746E69 2079656B 54584554 0A0D2C72 65676574 6E692079 y integer,..TEXTkey integer..);. 0001E0

Dump of file SATURN:[PCCOMMON.DUMP.DATA]SAEXPORT.SQL;1 on 18-APR-1990 08:21:19.32
File ID (472,18,0)   End of file block 30 / Allocated 32

Virtual block number 3 (00000003), 512 (0200) bytes

 69206564 6F636D0A 0D202820 54584554 20656C62 61742065 74616572 630A0D0A ...create table TEXT ( ..mcode i 000000
 61657263 0A0D202C 72656765 746E6920 79656B54 5845540A 0D2C7265 6765746E nteger,..TEXTkey integer, ..crea 000020
 20656D69 74646574 61657263 0A0D202C 29392872 61686372 61762079 62646574 tedby varchar(9), ..createdtime  000040
 28726168 63726176 20796264 65696669 646F6D0A 0D202C70 6D617473 656D6974 timestamp, ..modifiedby varchar( 000060
 4C0A0D2C 706D6174 73656D69 7420656D 69746465 69666964 6F6D0A0D 202C2939 9), ..modifiedtime timestamp,..L 000080
 4F4C0A0D 2C746E69 6C6C616D 73203243 4F4C0A0D 2C746E69 6C6C616D 7320434F OC smallint,..LOC2 smallint,..LO 0000A0
 4F4C0A0D 2C746E69 6C6C616D 73203443 4F4C0A0D 2C746E69 6C6C616D 73203343 C3 smallint,..LOC4 smallint,..LO 0000C0
 4F4C0A0D 2C746E69 6C6C616D 73203643 4F4C0A0D 2C746E69 6C6C616D 73203543 C5 smallint,..LOC6 smallint,..LO 0000E0
 554A0A0D 2C746E69 6C6C616D 73203843 4F4C0A0D 2C746E69 6C6C616D 73203743 C7 smallint,..LOC8 smallint,..JU 000100
 28726168 63726176 20637365 645F7478 65740A0D 2C746E69 6C6C616D 73205453 ST smallint,..text_desc varchar( 000120
 20534149 4C412065 6C626174 20657461 6572630A 0D0A0D3B 290A0D29 34323031 1024)..);....create table ALIAS  000140
 746E6920 79656B53 41494C41 0A0D2C72 65676574 6E692065 646F636D 0A0D2028 ( ..mcode integer,..ALIASkey int 000160
 0A0D202C 29392872 61686372 61762079 62646574 61657263 0A0D202C 72656765 eger, ..createdby varchar(9), .. 000180
 65696669 646F6D0A 0D202C70 6D617473 656D6974 20656D69 74646574 61657263 createdtime timestamp, ..modifie 0001A0
 7420656D 69746465 69666964 6F6D0A0D 202C2939 28726168 63726176 20796264 dby varchar(9), ..modifiedtime t 0001C0
```

```
0038290A 00293637 28726168 63726176 20454041 4E0A0D2C 70606174 73656069 imestamp,..NAME varchar(76)..);. 0001E0

Dump of file SATURN:[PCCOMMON.DUMP.DATA]SAEXPORT.SQL;1 on 18-APR-1990 08:21:19.32
File ID (472,18,0)   End of file block 30 / Allocated 32

Virtual block number 4 (00000004), 512 (0200) bytes

646F6360 0A0D2028 2044524F 5759454B 20656C62 61742065 74616572 630A0D0A ...create table KEYWORD ( ..mcod 000000
202C7265 67657.6E 69207965 6B44524F 5759454B 0A0D2C72 65676574 6E692065 e integer,..KEYWORDkey integer,  000020
65746165 72630A0D 202C2939 28726168 63726176 20796264 65746165 72630A0D ..createdby varchar(9), ..create 000040
61762079 62646569 6669646F 6D0A0D20 2C706061 7473656D 69742065 60697464 dtime timestamp, ..modifiedby va 000060
61747365 60697420 65606974 64656966 69646F6D 0A0D202C 29392872 61686372 rchar(9), ..modifiedtime timesta 000080
746E6920 54584554 0A0D2C29 39287261 68637261 76204555 4C41560A 0D2C7060 mp,..VALUE varchar(9),..TEXT int 0000A0
28205345 544F4E20 656C6261 74206574 61657263 0A0D0A0D 38290A0D 72656765 eger..);....create table NOTES ( 0000C0
65746E69 2079656B 5345544F 4E0A0D2C 72656765 746E6920 65646F63 6D0A0D20  ..mcode integer,..NOTESkey inte 0000E0
630A0D20 2C293928 72616863 72617620 79626465 74616572 630A0D20 2C726567 ger, ..createdby varchar(9), ..c 000100
64656966 69646F6D 0A0D202C 70606174 73656069 7420656D 69746465 74616572 reatedtime timestamp, ..modified 000120
69742065 60697464 65696669 646F6D0A 0D202C29 39287261 68637261 76207962 by varchar(9), ..modifiedtime ti 000140
45540A0D 2C293637 28726168 63726176 20454C54 49540A0D 2C706061 7473656D mestamp,..TITLE varchar(76),..TE 000160
4E20656C 62617420 65746165 72630A0D 0A0D3829 0A0D7265 6765746E 69205458 XT integer..);....create table N 000180
4E0A0D2C 72656765 746E6920 65646F63 6D0A0D28 2044524F 5759454B 5345544F OTESKEYWORD (..mcode integer,..N 0001A0
746E6920 79656B44 524F5759 454B0A0D 2C726567 65746E69 2079656B 5345544F OTESkey integer,..KEYWORDkey int 0001C0
45544F4E 5F524520 656C6261 74206574 61657263 0A0D0A0D 38290A0D 72656765 eger..);....create table ER_NOTE 0001E0

Dump of file SATURN:[PCCOMMON.DUMP.DATA]SAEXPORT.SQL;1 on 18-APR-1990 08:21:19.32
File ID (472,18,0)   End of file block 30 / Allocated 32

Virtual block number 5 (00000005), 512 (0200) bytes

65685345 544F4E5F 52450A0D 2C726567 65746E69 2065646F 636D0A0D 20282053 S ( ..mcode integer,..ER_NOTESke 000000
39287261 68637261 76207962 64657461 6572630A 0D202C72 65676574 6E692079 y integer, ..createdby varchar(9 000020
6F6D0A0D 202C706D 61747365 6D697420 65606974 64657461 6572630A 0D202C29 ), ..createdtime timestamp, ..mo 000040
74646569 6669646F 6D0A0D20 2C293928 72616863 72617620 79626465 69666964 difiedby varchar(9), ..modifiedt 000060
746E696C 6C616D73 2045444F 4344574B 0A0D2C70 6D617473 65606974 20656069 ime timestamp,..KWDCODE smallint 000080
74616572 630A0D0A 0D38290A 0D746E69 6C6C616D 73204544 4F434352 530A0D2C ,..SRCCODE smallint..);....creat 0000A0
72656765 746E6920 65646F63 6D0A0D20 28205954 49544E45 20656C62 61742065 e table ENTITY ( ..mcode integer 0000C0
62646574 61657263 0A0D202C 72656765 746E6920 79656B59 5449544E 450A0D2C ,..ENTITYkey integer, ..createdb 0000E0
65606974 20656069 74646574 61657263 0A0D202C 29392872 61686372 61762079 y varchar(9), ..createdtime time 000100
202C2939 28726168 63726176 20796264 65696669 646F6D0A 0D202C70 6D617473 stamp, ..modifiedby varchar(9),  000120
20454D41 4E0A0D2C 70606174 73656069 7420656D 69746465 69666964 6F6D0A0D ..modifiedtime timestamp,..NAME  000140
4D0A0D2C 72656765 746E6920 4C4F564E 494D0A0D 2C293637 28726168 63726176 varchar(76),..MINVOL integer,..M 000160
0D2C7265 6765746E 69204C4F 56505845 0A0D2C72 65676574 6E69204C 4F565841 AXVOL integer,..EXPVOL integer,. 000180
2C293128 72616863 20555452 470A0D2C 746E696C 6C616D73 20544350 5752470A .GRWPCT smallint,..GRTU char(1), 0001A0
28726168 63204B4F 4D524F4E 0A0D2C29 31287261 6863204C 564C4052 4F4E0A0D ..NORMLVL char(1),..NORMOK char( 0001C0
6D732045 4E494C54 554F0A0D 2C726567 65746E69 20595449 544E450A 0D2C2931 1),..ENTITY integer,..OUTLINE sm 0001E0

Dump of file SATURN:[PCCOMMON.DUMP.DATA]SAEXPORT.SQL;1 on 18-APR-1990 08:21:19.32
File ID (472,18,0)   End of file block 30 / Allocated 32

Virtual block number 6 (00000006), 512 (0200) bytes

54554F0A 0D2C746E 696C6C61 6D732032 454E494C 54554F0A 0D2C746E 696C6C61 allint,..OUTLINE2 smallint,..OUT 000000
696C6C61 6D732034 454E494C 54554F0A 0D2C746E 696C6C61 6D732033 454E494C LINE3 smallint,..OUTLINE4 smalli 000020
454E494C 54554F0A 0D2C746E 696C6C61 6D732035 454E494C 54554F0A 0D2C746E nt,..OUTLINE5 smallint,..OUTLINE 000040
0D2C746E 696C6C61 6D732037 454E494C 54554F0A 0D2C746E 696C6C61 6D732036 6 smallint,..OUTLINE7 smallint,. 000060
616D7320 53544942 4C41560A 0D2C746E 696C6C61 6D732038 454E494C 54554F0A .OUTLINE8 smallint,..VALBITS sma 000080
424C4156 0A0D2C74 6E696C6C 616D7320 32535449 424C4156 0A0D2C74 6E696C6C llint,..VALBITS2 smallint,..VALB 0000A0
6E696C6C 616D7320 34535449 424C4156 0A0D2C74 6E696C6C 616D7320 33535449 ITS3 smallint,..VALBITS4 smallin 0000C0
36535449 424C415  0A0D2C74 6E696C6C 616D7320 35535449 424C4156 0A0D2C74 t,..VALBITS5 smallint,..VALBITS6 0000E0
0A0D2C74 6E696C6C 616D7320 37535449 424C4156 0A0D2C74 6E696C6C 616D7320  smallint,..VALBITS7 smallint,.. 000100
72656765 746E6920 54584554 0A0D2C74 6E696C6C 616D7320 38535449 424C4156 VALBITS8 smallint,..TEXT integer 000120
5345544F 4E595449 544E4520 656C6261 74206574 61657263 0A0D0A0D 38290A0D ..);....create table ENTITYNOTES 000140
6E692079 65685954 49544E45 0A0D2C72 65676574 6E692065 646F636D 0A0D2820  (..mcode integer,..ENTITYkey in 000160
0A0D0A0D 38290A0D 72656765 746E6920 79656B53 45544F4E 0A0D2C72 65676574 teger,..NOTESkey integer..);.... 000180
646F636D 0A0D2820 5341494C 41595449 544E4520 656C6261 74206574 61657263 create table ENTITYALIAS (..mcod 0001A0
0A0D2C72 65676574 6E692079 65685954 49544E45 0A0D2C72 65676574 6E692065 e integer,..ENTITYkey integer,.. 0001C0
```

```
74206574 61657263 0A0D0A0D 38290A0D 72656765 746E6920 79656853 41494C41 ALIASkey integer..);....create t 0001E0

Dump of file SATURN:[PCCOMMON.DUMP.DATA]SAEXPORT.SQL;1 on 18-APR-1990 08:21:19.32
File ID (472,18,0)   End of file block 30 / Allocated 32

Virtual block number 7 (00000007), 512 (0200) bytes

65746E69 2065646F 63600A0D 28204452 4F575945 4B595449 544E4520 656C6261 able ENTITYKEYWORD (..mcode inte 000000
524F5759 454B0A0D 2C726567 65746E69 2079656B 59544954 4E450A0D 2C726567 ger,..ENTITYkey integer,..KEYWOR 000020
656C6261 74206574 61657263 0A0D0A0D 3B290A0D 72656765 746E6920 7965644 Dkey integer..);....create table 000040
72656765 746E6920 65646F63 6D0A0D28 20534554 4F4E5F52 45595449 544E4520  ENTITYER_NOTES (..mcode integer 000060
6B534554 4F4E5F52 450A0D2C 72656765 746E6920 7965685 5449544E 450A0D2C ,..ENTITYkey integer,..ER_NOTESk 000080
4520656C 62617420 65746165 72630A0D 0A0D3829 0A0D7265 6765746E 69207965 ey integer..);....create table E 0000A0
485F544E 450A0D2C 72656765 746E6920 65646F63 6D0A0D20 28205945 4B5F544E NT_KEY ( ..mcode integer,..ENT_K 0000C0
68637261 76207962 64657461 6572630A 0D202C72 65676574 6E692079 65685945 EYkey integer, ..createdby varch 0000E0
202C706D 61747365 6D697420 656D6974 64657461 6572630A 0D202C29 39287261 ar(9), ..createdtime timestamp,  000100
6669646F 6D0A0D20 2C293928 72616863 72617620 79626465 69666964 6F6D0A0D ..modifiedby varchar(9), ..modif 000120
6765746E 69205954 49544E45 0A0D2C70 6D617473 656D6974 20656D69 74646569 iedtime timestamp,..ENTITY integ 000140
4F544143 49444E49 0A0D2C29 36372872 61686372 61762045 4D414E0A 0D2C7265 er,..NAME varchar(76),..INDICATO 000160
560A0D2C 746E696C 6C616D73 20535449 424C4156 0A0D2C29 31287261 68632052 R char(1),..VALBITS smallint,..V 000180
6C616D73 20335354 49424C41 560A0D2C 746E696C 6C616D73 20325354 49424C41 ALBITS2 smallint,..VALBITS3 smal 0001A0
49424C41 560A0D2C 746E696C 6C616D73 20345354 49424C41 560A0D2C 746E696C lint,..VALBITS4 smallint,..VALBI 0001C0
746E696C 6C616D73 20365354 49424C41 560A0D2C 746E696C 6C616D73 20355354 TS5 smallint,..VALBITS6 smallint 0001E0
```

```
Dump of file SATURN:[PCCOMMON.DUMP.DATA]SAEXPORT.SQL;1 on 18-APR-1990 08:21:19.32
File ID (472,18,0)   End of file block 30 / Allocated 32

Virtual block number 8 (00000008), 512 (0200) bytes

20385354 49424C41 560A0D2C 746E696C 6C616D73 20375354 49424C41 560A0D2C ,..VALBITS7 smallint,..VALBITS8  000000
630A0D0A 0D3B290A 0D726567 65746E69 20545845 540A0D2C 746E696C 6C616D73 smallint,..TEXT integer..);....c 000020
646F636D 0A0D2820 5345544F 4E59454B 5F544E45 20656C62 61742065 74616572 reate table ENT_KEYNOTES (..mcod 000040
0D2C7265 6765746E 69207965 6B59454B 5F544E45 0A0D2C72 65676574 6E692065 e integer,..ENT_KEYkey integer,. 000060
20657461 6572630A 0D0A0D3B 290A0D72 65676574 6E692079 65685345 544F4E0A .NOTESkey integer..);....create  000080
65746E69 2065646F 636D0A0D 28205341 494C4159 454B5F54 4E452065 6C626174 table ENT_KEYALIAS (..mcode inte 0000A0
5341494C 410A0D2C 72656765 746E6920 7965685 9454B5F54 4E450A0D 2C726567 ger,..ENT_KEYkey integer,..ALIAS 0000C0
20656C62 61742065 74616572 630A0D0A 0D3B290A 0D726567 65746E69 2079656B key integer..);....create table  0000E0
2C726567 65746E69 2065646F 636D0A0D 28204452 4F575945 4B59454B 5F544E45 ENT_KEYKEYWORD (..mcode integer, 000100
65684452 4F575945 4B0A0D2C 72656765 746E6920 79656859 454B5F54 4E450A0D ..ENT_KEYkey integer,..KEYWORDke 000120
4E452065 6C626174 20657461 6572630A 0D0A0D3B 290A0D72 65676574 6E692079 y integer..);....create table EN 000140
0D2C7265 6765746E 69206564 6F636D0A 0D282053 45544F4E 5F524559 454B5F54 T_KEYER_NOTES (..mcode integer,. 000160
65685345 544F4E5F 52450A0D 2C726567 65746E69 2079656B 59454B5F 544E450A .ENT_KEYkey integer,..ER_NOTESke 000180
54412065 6C626174 20657461 6572630A 0D0A0D3B 290A0D72 65676574 6E692079 y integer..);....create table AT 0001A0
52545441 0A0D2C72 65676574 6E692065 646F636D 0A0D2028 20455455 42495254 TRIBUTE ( ..mcode integer,..ATTR 0001C0
61762079 62646574 ^1657263 0A0D202C 72656765 746E6920 79656B45 54554249 IBUTEkey integer, ..createdby va 0001E0
```

```
Dump of file SATURN:[PCCOMMON.DUMP.DATA]SAEXPORT.SQL;1 on 18-APR-1990 08:21:19.32
File ID (472,18,0)   End of file block 30 / Allocated 32

Virtual block number 9 (00000009), 512 (0200) bytes

6D617473 656D6974 20656D69 74646574 61657263 0A0D202C 29392872 61686372 rchar(9), ..createdtime timestam 000000
6F6D0A0D 202C2939 28726168 63726176 20796264 65696669 646F6D0A 0D202C70 p, ..modifiedby varchar(9), ..mo 000020
6E692059 5449544E 450A0D2C 706D6174 73656D69 7420656D 69746465 69666964 difiedtime timestamp,..ENTITY in 000040
4D414E0A 0D2C7265 6765746E 69204C45 444F4D5F 41544144 0A0D2C72 65676574 teger,..DATA_MODEL integer,..NAM 000060
2C746E69 6C6C616D 73204D55 4E44524F 0A0D2C29 36372872 61686372 61762045 E varchar(76),..ORDNUM smallint, 000080
72617620 454D414E 45435255 4F530A0D 2C293128 72616863 20534C4C 554E0A0D ..NULLS char(1),..SOURCENAME var 0000A0
524F5453 0A0D2C29 31287261 68632045 4352554F 530A0D2C 29313428 72616863 char(41),..SOURCE char(1),..STOR 0000C0
72656765 746E6920 4E4F4953 4E454D49 440A0D2C 29312872 61686320 454C4241 ABLE char(1),..DIMENSION integer 0000E0
6C616D73 20535449 424C4156 0A0D2C72 65676574 6E69204E 49414D4F 440A0D2C ,..DOMAIN integer,..VALBITS smal 000100
49424C41 560A0D2C 746E696C 6C616D73 20325354 49424C41 560A0D2C 746E696C lint,..VALBITS2 smallint,..VALBI 000120
746E696C 6C616D73 20345354 49424C41 560A0D2C 746E696C 6C616D73 20335354 TS3 smallint,..VALBITS4 smallint 000140
20365354 49424C41 560A0D2C 746E696C 6C616D73 20355354 49424C41 560A0D2C ,..VALBITS5 smallint,..VALBITS6  000160
560A0D2C 746E696C 6C616D73 20375354 49424C41 560A0D2C 746E696C 6C616D73 smallint,..VALBITS7 smallint,..V 000180
0D726567 65746E69 20545845 540A0D2C 746E696C 6C616D73 20385354 49424C41 ALBITS8 smallint,..TEXT integer. 0001A0
544E4545 54554249 52545441 20656C62 61742065 74616572 630A0D0A 0D3B290A .);....create table ATTRIBUTEENT 0001C0
```

```
 54554249 52545441 0A0D2C72 65676574 6E692065 646F6360 0A002820 5945485F _KEY (..mcode integer,..ATTRIBUT 0001E0

Dump of file SATURN:[PCCOMMON.DUMP.DATA]SAEXPORT.SQL;1 on 18-APR-1990 08:21:19.32
File ID (472,18,0)   End of file block 30 / Allocated 32

Virtual block number 10 (0000000A), 512 (0200) bytes

 65676574 6E692079 65685945 485F544E 450A0D2C 72656765 746E6920 79656845 Ekey integer,..ENT_KEYkey intege 000000
 4E455455 42495254 54412065 6C626174 20657461 6572630A 0D0A003B 290A0D72 r..);....create table ATTRIBUTEN 000020
 54554249 52545441 0A0D2C72 65676574 6E692065 646F6360 0A002820 5345544F OTES (..mcode integer,..ATTRIBUT 000040
 0D726567 65746E69 20796568 5345544F 4E0A0D2C 72656765 746E6920 79656845 Ekey integer,..NOTESkey integer. 000060
 494C4145 54554249 52545441 20656C62 61742065 74616572 630A0D0A 0D38290A .);....create table ATTRIBUTEALI 000080
 68455455 42495254 54410A0D 2C726567 65746E69 2065646F 636D0A0D 28205341 AS (..mcode integer,..ATTRIBUTEk 0000A0
 290A0D72 65676574 6E692079 65685341 494C410A 0D2C7265 6765746E 69207965 ey integer,..ALIASkey integer..) 0000C0
 4F575945 48455455 42495254 54412065 6C626174 20657461 6572630A 0D0A003B ;....create table ATTRIBUTEKEYWO 0000E0
 68455455 424952 ; 54410A0D 2C726567 65746E69 2065646F 636D0A0D 28204452 RD (..mcode integer,..ATTRIBUTEk 000100
 0D726567 65746E.. 20796568 44524F57 5945480A 0D2C7265 6765746E 69207965 ey integer,..KEYWORDkey integer. 000120
 5F524545 54554249 52545441 20656C62 61742065 74616572 630A0D0A 0D38290A .);....create table ATTRIBUTEER_ 000140
 55424952 5454410A 0D2C7265 6765746E 69206564 6F636D0A 0D282053 45544F4E NOTES (..mcode integer,..ATTRIBU 000160
 65746E69 20796568 5345544F 4E5F5245 0A0D2C72 65676574 6E692079 65684554 TEkey integer,..ER_NOTESkey inte 000180
 4E554A5F 52545441 20656C62 61742065 74616572 630A0D0A 0D38290A 0D726567 ger..);....create table ATTR_JUN 0001A0
 4A5F5254 54410A0D 2C726567 65746E69 2065646F 636D0A0D 2028204E 4F495443 CTION ( ..mcode integer,..ATTR_J 0001C0
 20796264 65746165 72630A0D 202C7265 6765746E 69207965 684E4F49 54434E55 UNCTIONkey integer, ..createdby  0001E0

Dump of file SATURN:[PCCOMMON.DUMP.DATA]SAEXPORT.SQL;1 on 18-APR-1990 08:21:19.32
File ID (472,18,0)   End of file block 30 / Allocated 32

Virtual block number 11 (0000000B), 512 (0200) bytes

 7473656D 69742065 6D697464 65746165 72630A0D 202C2939 28726168 63726176 varchar(9), ..createdtime timest 000000
 0A0D202C 29392872 61686372 61762079 62646569 6669646F 6D0A0D20 2C706D61 amp, ..modifiedby varchar(9), .. 000020
 204D554E 44524F0/ 0D2C706D 61747365 6D697420 656D6974 64656966 69646F6D modifiedtime timestamp,..ORDNUM  000040
 410A0D2C 72656765 746E6920 45545542 49525454 410A0D2C 746E696C 6C616D73 smallint,..ATTRIBUTE integer,..A 000060
 20657461 6572630A 0D0A003B 290A0D72 65676574 6E692032 45545542 49525454 TTRIBUTE2 integer..);....create  000080
 0A0D2C72 65676574 6E692065 646F636D 0A002028 20544553 5F502065 6C626174 table P_SET ( ..mcode integer,.. 0000A0
 61762079 62646574 61657263 0A0D202C 72656765 746E6920 79656854 45535F50 P_SETkey integer, ..createdby va 0000C0
 6D617473 656D6974 20656069 74646574 61657263 0A0D202C 29392872 61686372 rchar(9), ..createdtime timestam 0000E0
 6F6D0A0D 202C2939 28726168 63726176 20796264 65696669 646F6D0A 0D202C70 p, ..modifiedby varchar(9), ..mo 000100
 6E692059 5449544E 450A0D2C 706D6174 73656D69 7420656D 69746465 69666964 difiedtime timestamp,..ENTITY in 000120
 4F564E49 4D0A0D2C 29363728 72616863 72617620 454D414E 0A0D2C72 65676574 teger,..NAME varchar(76),..MINVO 000140
 5058450A 0D2C7265 6765746E 69204C4F 5658414D 0A0D2C72 65676574 6E69204C L integer,..MAXVOL integer,..EXP 000160
 424C4156 0A0D2C29 31287261 68632050 4F4C0A0D 2C726567 65746E69 204C4F56 VOL integer,..LOP char(1),..VALB 000180
 746E696C 6C616D73 20325354 49424C41 560A0D2C 746E696C 6C616D73 20535449 ITS smallint,..VALBITS2 smallint 0001A0
 20345354 49424C41 560A0D2C 746E696C 6C616D73 20335354 49424C41 560A0D2C ,..VALBITS3 smallint,..VALBITS4  0001C0
 560A0D2C 746E696C 6C616D73 20355354 49424C41 560A0D2C 746E696C 6C616D73 smallint,..VALBITS5 smallint,..V 0001E0

Dump of file SATURN:[PCCOMMON.DUMP.DATA]SAEXPORT.SQL;1 on 18-APR-1990 08:21:19.32
File ID (472,18,0)   End of file block 30 / Allocated 32

Virtual block number 12 (0000000C), 512 (0200) bytes

 6C616D73 20375354 49424C41 560A0D2C 746E696C 6C616D73 20365354 49424C41 ALBITS6 smallint,..VALBITS7 smal 000000
 7320434F 4C0A0D2C 746E696C 6C616D73 20385354 49424C41 560A0D2C 746E696C lint,..VALBITS8 smallint,..LOC s 000020
 73203343 4F4C0A0D 2C746E69 6C6C616D 73203243 4F4C0A0D 2C746E69 6C6C616D mallint,..LOC2 smallint,..LOC3 s 000040
 564C4542 414C0A0D 2C746E69 6C6C616D 73203443 4F4C0A0D 2C746E69 6C6C616D mallint,..LOC4 smallint,..LABELV 000060
 6C6C616D 7320434F 4C4C4542 414C0A0D 2C746E69 6C6C616D 7320454C 42495349 ISIBLE smallint,..LABELLOC small 000080
 4C454241 4C0A0D2C 746E696C 6C616D73 2032434F 4C4C4542 414C0A0D 2C746E69 int,..LABELLOC2 smallint,..LABEL 0000A0
 696C6C61 6D732034 434F4C4C 4542414C 0A0D2C74 6E696C6C 616D7320 33434F4C LOC3 smallint,..LABELLOC4 smalli 0000C0
 424C4542 414C0A0D 2C746E69 6C6C616D 73205453 554A4C45 42414C0A 0D2C746E nt,..LABELJUST smallint,..LABELB 0000E0
 540A0D2C 29312872 61686320 45505954 0A0D2C72 65676574 6E692053 48414552 REAKS integer,..TYPE char(1),..T 000100
 20656C62 61742065 74616572 630A0D0A 0D38290A 0D726567 65746E69 20545845 EXT integer..);....create table  000120
 0A0D2C72 65676574 6E692065 646F636D 0A002820 5945485F 544E4554 45535F50 P_SETENT_KEY (..mcode integer,.. 000140
 6E692079 65685945 485F544E 450A0D2C 72656765 746E6920 79656854 4.`35F50 P_SETkey integer,..ENT_KEYkey in 000160
 4E544553 5F502065 6C626174 20657461 6572630A 0D0A003B 290A0D72 656 `574 teger..);....create table P_SETN 000180
 79656854 45535F50 0A0D2C72 65676574 6E692065 646F636D 0A002820 5345:44F OTES (..mcode integer,..P_SETkey 0001A0
 0D38290A 0D726567 65746E69 20796568 5345544F 4E0A0D2C 72656765 746E6920  integer,..NOTESkey integer..);. 0001C0
```

```
63600A00 28205341 494C4154 45535F50 20656C62 61742065 74616572 630A000A ...create table P_SETALIAS (..mc 0001E0

Dump of file SATURN:[PCCOMMON.DUMP.DATA]SAEXPORT.SQL;1 on 18-APR-1990 08:21:19.32
File ID (472,18,0)   End of file block 30 / Allocated 32

Virtual block number 13 (0000000D), 512 (0200) bytes

002C7265 6765746E 69207965 6B544553 5F500A0D 2C726567 65746E69 2065646F ode integer,..P_SETkey integer,. 000000
20657461 6572630A 000A0D38 290A0D72 65676574 6E692079 656B5341 494C410A .ALIASkey integer..);....create  000020
65746E69 2065646F 63600A0D 28204452 4F575945 4B544553 5F502065 6C626174 table P_SETKEYWORD (..mcode inte 000040
44524F57 59454B0A 002C7265 6765746E 69207965 6B544553 5F500A0D 2C726567 ger,..P_SETkey integer,..KEYWORD 000060
20656C62 61742065 74616572 630A0D0A 0038290A 00726567 65746E69 2079656B key integer..);....create table  000080
002C7265 6765746E 69206564 6F63600A 00282053 45544F4E 5F524554 45535F50 P_SETER_NOTES (..mcode integer,. 0000A0
2079656B 5345544F 4E5F5245 0A0D2C72 65676574 6E692079 656B5445 535F500A .P_SETkey integer,..ER_NOTESkey  0000C0
54524150 20656C62 61742065 74616572 630A0D0A 0038290A 00726567 65746E69 integer..);....create table PART 0000E0
54524150 0A0D2C72 65676574 6E692065 646F636D 0A0D2028 20504948 5352454E NERSHIP ( ..mcode integer,..PART 000100
20796264 65746165 72630A0D 202C7265 6765746E 69207965 6B504948 5352454E NERSHIPkey integer, ..createdby  000120
7473656D 69742065 6D697464 65746165 72630A0D 202C2939 28726168 63726176 varchar(9), ..createdtime timest 000140
0A00202C 29392872 61686372 61762079 62646569 6669646F 6D0A0020 2C706061 amp, ..modifiedby varchar(9), .. 000160
69205445 535F500A 002C706D 61747365 6D697420 656D6974 64656966 69646F6D modifiedtime timestamp,..P_SET i 000180
4F56314E 494D0A0D 2C726567 65746E69 20325445 535F500A 002C7265 6765746E nteger,..P_SET2 integer,..MIN1VO 0001A0
494D0A0D 2C726567 65746E69 204C4F56 3158414D 0A0D2C72 65676574 6E69204C L integer,..MAX1VOL integer,..MI 0001C0
2C726567 65746E69 204C4F56 3258414D 0A0D2C72 65676574 6E69204C 4F56324E N2VOL integer,..MAX2VOL integer, 0001E0

Dump of file SATURN:[PCCOMMON.DUMP.DATA]SAEXPORT.SQL;1 on 18-APR-1990 08:21:19.32
File ID (472,18,0)   End of file block 30 / Allocated 32

Virtual block number 14 (0000000E), 512 (0200) bytes

6D732032 53544942 4C41560A 002C746E 696C6C61 6D732053 5449424C 41560A0D ..VALBITS smallint,..VALBITS2 sm 000000
4C41560A 002C746E 696C6C61 6D732033 53544942 4C41560A 002C746E 696C6C61 allint,..VALBITS3 smallint,..VAL 000020
696C6C61 6D732035 53544942 4C41560A 002C746E 696C6C61 6D732034 53544942 BITS4 smallint,..VALBITS5 smalli 000040
53544942 4C41560A 002C746E 696C6C61 6D732036 53544942 4C41560A 002C746E nt,..VALBITS6 smallint,..VALBITS 000060
0A0D746E 696C6C61 6D732038 53544942 4C41560A 002C746E 696C6C61 [illegible] 7 smallint,..VALBITS8 smallint.. 000080
52455049 48535245 4E545241 5020656C 62617420 65746165 72630A0D [illegible] );....create table PARTNERSHIPER 0000A0
52454E54 5241500A 002C7265 6765746E 69206564 6F63600A 00282045 544F4E5F  NOTE (..mcode integer,..PARTNER 0000C0
6E692079 656B5345 544F4E5F 52450A0D 2C726567 65746E69 2079656B 50494853 SHIPkey integer,..ER_NOTESkey in 0000E0
5F504948 53502065 6C626174 20657461 6572630A 000A0D38 290A0072 65676574 teger..);....create table PSHIP_ 000100
4853500A 002C7265 6765746E 69206564 6F63600A 00202820 54505F45 54554F52 ROUTE_PT ( ..mcode integer,..PSH 000120
65746165 72630A0D 202C7265 6765746E 69207965 6B54505F 4554554F 525F5049 IP_ROUTE_PTkey integer, ..create 000140
69742065 6D697464 65746165 72630A0D 202C2939 28726168 63726176 20796264 dby varchar(9), ..createdtime ti 000160
29392872 61686372 61762079 62646569 6669646F 6D0A0020 2C706061 7473656D mestamp, ..modifiedby varchar(9) 000180
4745530A 002C706D 61747365 6D697420 656D6974 64656966 69646F6D 0A0D202C , ..modifiedtime timestamp,..SEG 0001A0
0A0D2C74 6E696C6C 616D7320 32545047 45530A0D 2C746E69 6C6C616D 73205450 PT smallint,..SEGPT2 smallint,.. 0001C0
6E696C6C 616D7320 34545047 45530A0D 2C746E69 6C6C616D 73203354 50474553 SEGPT3 smallint,..SEGPT4 smallin 0001E0

Dump of file SATURN:[PCCOMMON.DUMP.DATA]SAEXPORT.SQL;1 on 18-APR-1990 08:21:19.32
File ID (472,18,0)   End of file block 30 / Allocated 32

Virtual block number 15 (0000000F), 512 (0200) bytes

69205844 4E490A0D 2C726567 65746E69 20504948 5352454E 54524150 0A0D2C74 t,..PARTNERSHIP integer,..INDX i 000000
4E454D49 4420656C 62617420 65746165 72630A0D 0A0D3B29 0A0D7265 6765746E nteger..);....create table DIMEN 000020
49534E45 4D49440A 002C7265 6765746E 69206564 6F63600A 00202820 4E4F4953 SION ( ..mcode integer,..DIMENSI 000040
68637261 76207962 64657461 6572630A 00202C72 65676574 6E692079 656B4E4F ONkey integer, ..createdby varch 000060
202C706D 61747365 6D697420 656D6974 64657461 6572630A 00202C29 39287261 ar(9), ..createdtime timestamp,  000080
6669646F 6D0A0020 2C293928 72616863 72617620 79626465 69666964 6F6D0A0D ..modifiedby varchar(9), ..modif 0000A0
72616863 72617620 454D414E 0A0D2C70 6D617473 656D6974 20656D69 74646569 iedtime timestamp,..NAME varchar 0000C0
49424C41 560A0D2C 72656765 746E6920 4E4F4953 4E454D49 440A0D2C 29363728 (76),..DIMENSION integer,..VALBI 0000E0
2C746E69 6C6C616D 73203253 5449424C 41560A0D 2C746E69 6C6C616D 73205354 TS smallint,..VALBITS2 smallint, 000100
73203453 5449424C 41560A0D 2C746E69 6C6C616D 73203353 5449424C 41560A0D ..VALBITS3 smallint,..VALBITS4 s 000120
41560A0D 2C746E69 6C6C616D 73203553 5449424C 41560A0D 2C746E69 6C6C616D mallint,..VALBITS5 smallint,..VA 000140
6C6C616D 73203753 5449424C 41560A0D 2C746E69 6C6C616D 73203653 5449424C LBITS6 smallint,..VALBITS7 small 000160
69205458 45540A0D 2C746E69 6C6C616D 73203853 5449424C 41560A0D 2C746E69 int,..VALBITS8 smallint,..TEXT i 000180
4E454D49 4420656C 62617420 65746165 72630A0D 0A0D3B29 0A0D7265 6765746E nteger..);....create table DIMEN 0001A0
4D49440A 002C7265 6765746E 69206564 6F63600A 00282053 45544F4E 4E4F4953 SIONNOTES (..mcode integer,..DIM 0001C0
```

```
746E6920 79656853 45544F4E 0A0D2C72 65676574 6E692079 65684E4F 49534E45 ENSIONkey integer,..NOTESkey int 0001E0

Dump of file SATURN:[PCCOMMON.DUMP.DATA]SAEXPORT.SQL;1 on 18-APR-1990 08:21:19.32
File ID (472,18,0)   End of file block 30 / Allocated 32

Virtual block number 16 (00000010), 512 (0200) bytes

49534E45 4D494420 656C6261 74206574 61657263 0A0D0A0D 3B290A0D 72656765 eger..);....create table DIMENSI 000000
4E454D49 440A0D2C 72656765 746E6920 65646F63 6D0A0D28 20534149 4C414E4F ONALIAS (..mcode integer,..DIMEN 000020
6765746E 69207965 6B534149 4C410A0D 2C726567 65746E69 20796568 4E4F4953 SIONkey integer,..ALIASkey integ 000040
4E4F4953 4E454D49 4420656C 62617420 65746165 72630A0D 0A0D3B29 0A0D7265 er..);....create table DIMENSION 000060
454D4944 0A0D2C72 65676574 6E692065 646F636D 0A0D2820 5345544F 4E5F5245 ER NOTES (..mcode integer,..DIME 000080
69207965 6B534554 4F4E5F52 450A0D2C 72656765 746E6920 7965684E 4F49534E NSIONkey integer,..ER_NOTESkey i 0000A0
4941404F 4420656C 62617420 65746165 72630A0D 0A0D3B29 0A0D7265 6765746E nteger..);....create table DOMAI 0000C0
20796568 4E49414D 4F440A0D 2C726567 65746E69 2065646F 636D0A0D 2028204E N ( ..mcode integer,..DOMAINkey  0000E0
2C293928 72616863 72617620 79626465 74616572 630A0D20 2C726567 65746E69 integer, ..createdby varchar(9), 000100
69646F6D 0A0D202C 706D6174 73656069 74206560 69746465 74616572 630A0D20  ..createdtime timestamp, ..modi 000120
6D697464 65696669 646F6D0A 0D202C29 39287261 68637261 76207962 64656966 fiedby varchar(9), ..modifiedtim 000140
2C726567 65746E69 2C4E4F49 534E454D 49440A0D 2C706D61 74736560 69742065 e timestamp,..DIMENSION integer, 000160
6E69204E 4941404F 440A0D2C 72656765 746E6920 4C45444F 4D5F4154 41440A0D ..DATA_MODEL integer,..DOMAIN in 000180
73204452 4F0A0D2C 29363728 72616863 72617620 454D414E 0A0D2C72 656 6574 teger,..NAME varchar(76),..ORD s 0001A0
4E49400A 0D2C2931 28726168 63204550 59544154 41440A0D 2C746E69 6C6 .160 mallint,..DATATYPE char(1),..MIN 0001C0
6C6C6160 73203245 554C4156 4E49400A 0D2C746E 696C6C61 60732045 554C4156 VALUE smallint,..MINVALUE2 small 0001E0

Dump of file SATURN:[PCCOMMON.DUMP.DATA]SAEXPORT.SQL;1 on 18-APR-1990 08:21:19.32
File ID (472,18,0)   End of file block 30 / Allocated 32

Virtual block number 17 (00000011), 512 (0200) bytes

41564E49 4D0A0D2C 746E696C 6C616073 20334555 4C41564E 494D0A0D 2C746E69 int,..MINVALUE3 smallint,..MINVA 000000
6E696C6C 61607320 45554C41 56584140 0A0D2C74 6E696C6C 61607320 3445554C LUE4 smallint,..MAXVALUE smallin 000020
554C4156 5841400A 0D2C746E 696C6C61 60732032 45554C41 56584140 0A0D2C74 t,..MAXVALUE2 smallint,..MAXVALU 000040
746E696C 6C616073 20344555 4C415658 414D0A0D 2C746E69 6C6C616D 73203345 E3 smallint,..MAXVALUE4 smallint 000060
6765746E 69204E45 4C584140 0A0D2C72 65676574 6E69204E 454C4E49 4D0A0D2C ,..MINLEN integer,..MAXLEN integ 000080
32535449 424C4156 0A0D2C74 6E696C6C 61607320 53544942 4C41560A 0D2C7265 er,..VALBITS smallint,..VALBITS2 0000A0
0A0D2C74 6E696C6C 61607320 33535449 424C4156 0A0D2C74 6E696C6C 61607320  smallint,..VALBITS3 smallint,... 0000C0
61607320 35535449 424C4156 0A0D2C74 6E696C6C 61607320 34535449 424C4156 VALBITS4 smallint,..VALBITS5 sma 0000E0
424C4156 0A0D2C74 6E696C6C 61607320 36535449 424C4156 0A0D2C74 6E696C6C llint,..VALBITS6 smallint,..VALB 000100
6E696C6C 61607320 38535449 424C4156 0A0D2C74 6E696C6C 61607320 37535449 ITS7 smallint,..VALBITS8 smallin 000120
65676574 6E692054 5845540A 0D2C7265 6765746E 69204E45 4C475641 0A0D2C74 t,..AVGLEN integer,..TEXT intege 000140
45544F4E 4E49414D 4F442065 6C626174 20657461 6572630A 0D0A0D3B 290A0D72 r..);....create table DOMAINNOTE 000160
69207965 684E4941 4D4F440A 0D2C7265 6765746E 69206564 6F636D0A 0D282053 S (..mcode integer,..DOMAINkey i 000180
0D0A0D3B 290A0D72 65676574 6E692079 65685345 544F4E0A 0D2C7265 6765746E nteger,..NOTESkey integer..);... 0001A0
6F636D0A 0D282053 41494C41 4E49414D 4F442065 6C626174 20657461 6572630A .create table DOMAINALIAS (..mco 0001C0
0D2C7265 6765746E 69207965 684E4941 4D4F440A 0D2C7265 6765746E 69206564 de integer,..DOMAINkey integer,. 0001E0

Dump of file SATURN:[PCCOMMON.DUMP.DATA]SAEXPORT.SQL;1 on 18-APR-1990 08:21:19.32
File ID (472,18,0)   End of file block 30 / Allocated 32

Virtual block number 18 (00000012), 512 (0200) bytes

20657461 6572630A 0D0A0D3B 290A0D72 65676574 6E692079 65685341 494C410A .ALIASkey integer..);....create  000000
746E6920 65646F63 6D0A0D28 2044524F 5759454B 4E49414D 4F442065 6C626174 table DOMAINKEYWORD (..mcode int 000020
4F575945 4B0A0D2C 72656765 746E6920 7965684E 4941404F 440A0D2C 72656765 eger,..DOMAINkey integer,..KEYWO 000040
6C626174 20657461 6572630A 0D0A0D3B 290A0D72 65676574 6E692079 65684452 RDkey integer..);....create tabl 000060
65676574 6E692065 646F636D 0A0D2820 5345544F 4E5F5245 4E49414D 4F442065 e DOMAINER NOTES (..mcode intege 000080
5345544F 4E5F5245 0A0D2C72 65676574 6E692079 65684E49 414D4F44 0A0D2C72 r,..DOMAINkey integer,..ER_NOTES 0000A0
20656C62 61742065 74616572 630A0D0A 0D3B290A 0D726567 65746E69 20796568 key integer..);....create table  0000C0
4F485445 4D0A0D2C 72656765 746E6920 65646F63 6D0A0D20 2820444F 4854454D METHOD ( ..mcode integer,..METHO 0000E0
61686372 61762079 62646574 61657263 0A0D202C 72656765 746E6920 79656844 Dkey integer, ..createdby varcha 000100
0D202C70 6D617473 656D6974 20656069 74646574 61657263 0A0D202C 29392872 r(9), ..createdtime timestamp, . 000120
69666964 6F6D0A0D 202C2939 28726168 63726176 20796264 65696669 646F6D0A .modifiedby varchar(9), ..modifi 000140
65676574 6E692059 5449544E 450A0D2C 706D6174 73656069 74206560 69746465 edtime timestamp,..ENTITY intege 000160
69204E49 414D4F44 0A0D2C72 65676574 6E692045 54554249 52545441 0A0D2C72 r,..ATTRIBUTE integer,..DOMAIN i 000180
0D0A0D3B 290A0D29 36372872 61686372 61762045 4D414E0A 0D2C7265 6765746E nteger,..NAME varchar(76)..);... 0001A0
0A0D2028 204C4544 4F4D5F53 5345434F 52502065 6C626174 20657461 6572630A .create table PROCESS_MODEL ( .. 0001C0
```

```
7965684C 45444F4D 5F535345 434F5250 0A0D2C72 65676574 6E692065 646F636D mcode integer,..PROCESS_MODELkey 0001E0

Dump of file SATURN:[PCCOMMON.DUMP.DATA]SAEXPORT.SQL;1 on 18-APR-1990 08:21:19.32
File ID (472,18,0)   End of file block 30 / Allocated 32

Virtual block number 19 (00000013), 512 (0200) bytes

 29392872 61686372 61762079 62646574 61657263 0A0D202C 72656765 746E6920  integer, ..createdby varchar(9) 000000
 646F6D0A 0D202C70 6D617473 656D6974 20656D69 74646574 61657263 0A0D202C , ..createdtime timestamp, ..mod 000020
 69746465 69666964 6F6D0A0D 202C2939 28726168 63726176 20796264 65696669 ifiedby varchar(9), ..modifiedti 000040
 746E6920 4C45444F 4D5F5453 594C414E 410A0D2C 706D6174 73656D69 7420656D me timestamp,..ANALYST_MODEL int 000060
 4540414E 0A0D2C72 65676574 6E69204C 45444F4D 5F415441 440A0D2C 72656765 eger,..DATA_MODEL integer,..NAME 000080
 45540A0D 2C726567 65746E69 20545845 540A0D2C 29363728 72616863 72617620  varchar(76),..TEXT integer,..TE 0000A0
 50480A0D 2C726567 65746E69 20335458 45540A0D 2C726567 65746E69 20325458 XT2 integer,..TEXT3 integer,..HP 0000C0
 3B290A0D 72656765 746E6920 45524F54 53480A0D 2C726567 65746E69 20434F52 ROC integer,..HSTORE integer..); 0000E0
 4F4E4C45 444F4D5F 53534543 4F525020 656C6261 74206574 61657263 0A0D0A0D ....create table PROCESS_MODELNO 000100
 4D5F5353 45434F52 500A0D2C 72656765 746E6920 65646F63 6D0A0D28 20534554 TES (..mcode integer,..PROCESS_M 000120
 6765746E 69207965 6B534554 4F4E0A0D 2C726567 65746E69 2079656B 4C45444F ODELkey integer,..NOTESkey integ 000140
 4D5F5353 45434F52 5020656C 62617420 65746165 72630A0D 0A0D3B29 0A0D7265 er..);....create table PROCESS_M 000160
 4F52500A 0D2C7265 6765746E 69206564 6F636D0A 0D28204F 5759454B 4C45444F ODELKEYWO (..mcode integer,..PRO 000180
 6B44524F 5759454B 0A0D2C72 65676574 6E692079 656B4C45 444F4D5F 53534543 CESS_MODELkey integer,..KEYWORDk 0001A0
 5020656C 62617420 65746165 72630A0D 0A0D3B29 0A0D7265 6765746E 69207965 ey integer..);....create table P 0001C0
 65676574 6E692065 646F636D 0A0D2820 5458454 4C45444F 4D5F5353 45434F52 ROCESS_MODELTEXT (..mcode intege 0001E0

Dump of file SATURN:[PCCOMMON.DUMP.DATA]SAEXPORT.SQL;1 on 18-APR-1990 08:21:19.32
File ID (472,18,0)   End of file block 30 / Allocated 32

Virtual block number 20 (00000014), 512 (0200) bytes

 540A0D2C 72656765 746E6920 7965684C 45444F4D 5F535345 434F5250 0A0D2C72 r,..PROCESS_MODELkey integer,..T 000000
 62617420 65746165 72630A0D 0A0D3B29 0A0D7265 6765746E 69207965 6B545845 EXTkey integer..);....create tab 000020
 6765746E 69206564 6F636D0A 0D202820 50414D5F 4D505F59 5449544E 4520656C le ENTITY_PM_MAP ( ..mcode integ 000040
 0D202C72 65676574 6E692079 656B5041 4D5F4D50 5F595449 544E450A 0D2C7265 er,..ENTITY_PM_MAPkey integer, . 000060
 64657461 6572630A 0D202C29 39287261 68637261 76207962 64657461 6572630A .createdby varchar(9), ..created 000080
 72617620 79626465 69666964 6F6D0A0D 202C706D 61747365 6D697420 656D6974 time timestamp, ..modifiedby var 0000A0
 6D617473 656D6974 20656D69 74646569 6669646F 6D0A0D20 2C293928 72616863 char(9), ..modifiedtime timestam 0000C0
 6E692059 5449544E 450A0D2C 29363728 72616863 72617620 454D414E 0A0D2C70 p,..NAME varchar(76),..ENTITY in 0000E0
 0A0D2C72 65676574 6E69204C 45444F4D 5F535345 434F5250 0A0D2C72 65676574 teger,..PROCESS_MODEL integer,.. 000100
 6E692032 5F434952 5445400A 0D2C7265 6765746E 69205353 45434341 5F4D5543 CUM_ACCESS integer,..METRIC_2 in 000120
 42495254 54412065 6C626174 20657461 6572630A 0D0A0D3B 290A0D72 65676574 teger..);....create table ATTRIB 000140
 52545441 0A0D2C72 65676574 6E692065 646F636D 0A0D2028 2050414D 5F4D505F  _PM_MAP ( ..mcode integer,..ATTR 000160
 62646574 61657263 0A0D202C 72656765 746E6920 7965685D 414D5F4D 505F4249 IB_PM_MAPkey integer, ..createdb 000180
 656D6974 20656D69 74646574 61657263 0A0D202C 29392872 61686372 61762079 y varchar(9), ..createdtime time 0001A0
 202C2939 28726168 63726176 20796264 65696669 646F6D0A 0D202C70 6D617473 stamp, ..modifiedby varchar(9),  0001C0
 20454D41 4E0A0D2C 706D6174 73656D69 7420656D 69746465 69666964 6F6D0A0D ..modifiedtime timestamp,..NAME  0001E0

Dump of file SATURN:[PCCOMMON.DUMP.DATA]SAEXPORT.SQL;1 on 18-APR-1990 08:21:19.32
File ID (472,18,0)   End of file block 30 / Allocated 32

Virtual block number 21 (00000015), 512 (0200) bytes

 2C726567 65746E69 20455455 42495254 54410A0D 2C293637 28726168 63726176 varchar(76),..ATTRIBUTE integer, 000000
 43415F4D 55430A0D 2C726567 65746E69 204C4544 4F4D5F53 5345434F 52500A0D ..PROCESS_MODEL integer,..CUM_AC 000020
 0D726567 65746E69 20325F43 49525445 4D0A0D2C 72656765 746E6920 53534543 CESS integer,..METRIC_2 integer. 000040
 0A0D2028 20535345 434F5250 20656C62 61742065 74616572 630A0D0A 0D3B290A .);....create table PROCESS ( .. 000060
 6765746E 69207965 6B535345 434F5250 0A0D2C72 65676574 6E692065 646F636D mcode integer,..PROCESSkey integ 000080
 72630A0D 202C2939 28726168 63726176 20796264 65746165 72630A0D 202C7265 er, ..createdby varchar(9), ..cr 0000A0
 62646569 6669646F 6D0A0D20 2C706D61 7473656D 69742065 6D697464 65746165 eatedtime timestamp, ..modifiedb 0000C0
 6D697420 656D6974 64656966 69646F6D 0A0D202C 29392872 61686372 61762079 y varchar(9), ..modifiedtime tim 0000E0
 0D2C7265 6765746E 69204C45 444F4D5F 53534543 4F52500A 0D2C706D 61747365 estamp,..PROCESS_MODEL integer,. 000100
 65746E69 20535345 434F5250 0A0D2C29 36372872 61686372 61762045 4D414E0A .NAME varchar(76),..PROCESS inte 000120
 7320454E 494C5455 4F0A0D2C 72656765 746E6920 5245424D 554E0A0D 2C726567 ger,..NUMBER integer,..OUTLINE s 000140
 554F0A0D 2C746E69 6C6C616D 73203245 4E494C54 554F0A0D 2C746E69 6C6C616D mallint,..OUTLINE2 smallint,..OU 000160
 6C6C616D 73203445 4E494C54 554F0A0D 2C746E69 6C6C616D 73203345 4E494C54 TLINE3 smallint,..OUTLINE4 small 000180
 4E494C54 554F0A0D 2C746E69 6C6C616D 73203545 4E494C54 554F0A0D 2C746E69 int,..OUTLINE5 smallint,..OUTLIN 0001A0
 2C746E69 6C6C616D 73203745 4E494C54 554F0A0D 2C746E69 6C6C616D 73203645 E6 smallint,..OUTLINE7 smallint, 0001C0
```

```
20455649 54494D49 52500A00 2C746E69 6C6C616D 73203845 4E494C54 554F0A0D ..OUTLINE8 smallint,..PRIMITIVE  0001E0

Dump of file SATURN:[PCCOMMON.DUMP.DATA]SAEXPORT.SQL;1 on 18-APR-1990 08:21:19.32
File ID (472,18,0)   End cf file block 30 / Allocated 32

Virtual block number 22 (00000016), 512 (0200) bytes

45540A0D 2C726567 65746E69 20325353 45434F52 500A0D2C 746E696C 6C616D73 smallint,..PROCESS2 integer,..TE 000000
4843480A 0D2C7265 6765746E 69203254 5845540A 0D2C7265 6765746E 69205458 XT integer,..TEXT2 integer,..HCH 000020
20656C62 61742065 74616572 630A0D0A 0D3B290A 0D726567 65746E69 20444C49 ILD integer..);....create table  000040
0A0D2C72 65676574 6E692065 646F636D 0A0D2820 5345544F 4E535345 434F5250 PROCESSNOTES (..mcode integer,.. 000060
6E692079 656B5345 544F4E0A 0D2C7265 6765746E 69207965 6B535345 434F5250 PROCESSkey integer,..NOTESkey in 000080
5345434F 52502065 6C626174 20657461 6572630A 0D0A0D3B 290A0D72 65676574 teger..);....create table PROCES 0000A0
53534543 4F52500A 0D2C7265 6765746E 69206564 6F636D0A 0D282054 58455453 STEXT (..mcode integer,..PROCESS 0000C0
290A0D72 65676574 6E692079 656B5458 45540A0D 2C726567 65746E69 2079656B key integer,..TEXTkey integer..) 0000E0
44524F57 59454B53 5345434F 52502065 6C626174 20657461 6572630A 0D0A0D3B ;....create table PROCESSKEYWORD 000100
69207965 6B535345 434F5250 0A0D2C72 65676574 6E692065 646F636D 0A0D2820  (..mcode integer,..PROCESSkey i 000120
0D3B290A 0D726567 65746E69 2079656B 44524F57 59454B0A 0D2C7265 6765746E nteger,..KEYWORDkey integer..);. 000140
0A0D2028 20545345 445F4543 52554F53 20656C62 61742065 74616572 630A0D0A ...create table SOURCE_DEST ( .. 000160
69207965 6B545345 445F4543 52554F53 0A0D2C72 65676574 6E692065 646F636D mcode integer,..SOURCE_DESTkey i 000180
202C2939 28726168 63726176 20796264 65746165 72630A0D 202C7265 6765746E nteger, ..createdby varchar(9),  0001A0
6669646F 6D0A0D20 2C706D61 7473656D 69742065 6D697464 65746165 72630A0D ..createdtime timestamp, ..modif 0001C0
656D6974 64656966 69646F6D 0A0D202C 29392872 61686372 61762079 62646569 iedby varchar(9), ..modifiedtime 0001E0

Dump of file SATURN:[PCCOMMON.DUMP.DATA]SAEXPORT.SQL;1 on 18-APR-1990 08:21:19.32
File ID (472,18,0)   End of file block 30 / Allocated 32

Virtual block number 23 (00000017), 512 (0200) bytes

6765746E 69204C45 444F4D5F 53534543 4F52500A 0D2C706D 61747365 6D697420  timestamp,..PROCESS_MODEL integ 000000
20454E49 4C54554F 0A0D2C29 36372872 61686372 61762045 4D414E0A 0D2C7265 er,..NAME varchar(76),..OUTLINE  000020
4F0A0D2C 746E696C 6C616D73 2032454E 494C5455 4F0A0D2C 746E696C 6C616D73 smallint,..OUTLINE2 smallint,..O 000040
6C616D73 203445 : 494C5455 4F0A0D2C 746E696C 6C616D73 2033454E 494C5455 UTLINE3 smallint,..OUTLINE4 smal 000060
494C5455 4F0A0D.. 746E696C 6C616D73 2035454E 494C5455 4F0A0D2C 746E696C lint,..OUTLINE5 smallint,..OUTLI 000080
746E696C 6C616D73 2037454E 494C5455 4F0A0D2C 746E696C 6C616D73 2036454E NE6 smallint,..OUTLINE7 smallint 0000A0
65746E69 20545845 540A0D2C 746E696C 6C616D73 2038454E 494C5455 4F0A0D2C ,..OUTLINE8 smallint,..TEXT inte 0000C0
445F4543 52554F53 20656C62 61742065 74616572 630A0D0A 0D3B290A 0D726567 ger..);....create table SOURCE_D 0000E0
52554F53 0A0D2C72 65676574 6E692065 646F636D 0A0D2820 5345544F 4E545345 ESTNOTES (..mcode integer,..SOUR 000100
6E692079 656B5345 544F4E0A 0D2C7265 6765746E 69207965 6B545345 445F4543 CE_DESTkey integer,..NOTESkey in 000120
45435255 4F532065 6C626174 20657461 6572630A 0D0A0D3B 290A0D72 65676574 teger..);....create table SOURCE 000140
0A0D2C72 65676574 6E692065 646F636D 0A0D2820 44524F57 59454B54 5345445F  _DESTKEYWORD (..mcode integer,.. 000160
44524F57 59454B0A 0D2C7265 6765746E 69207965 6B545345 445F4543 52554F53 SOURCE_DESTkey integer,..KEYWORD 000180
20656C62 61742065 74616572 630A0D0A 0D3B290A 0D726567 65746E69 2079656B key integer..);....create table  0001A0
490A0D2C 72656765 746E6920 65646F63 6D0A0D20 28204552 4F54535F 4F464E49 INFO_STORE ( ..mcode integer,..I 0001C0
62646574 61657263 0A0D202C 72656765 746E6920 7965684S 524F5453 5F4F464E NFO_STOREkey integer, ..createdb 0001E0

Dump of file SATURN:[PCCOMMON.DUMP.DATA]SAEXPORT.SQL;1 on 18-APR-1990 08:21:19.32
File ID (472,18,0)   End of file block 30 / Allocated 32

Virtual block number 24 (00000018), 512 (0200) bytes

656D6974 20656D69 74646574 61657263 0A0D202C 29392872 61686372 61762079 y varchar(9), ..createdtime time 000000
202C2939 28726168 63726176 20796264 65696669 646F6D0A 0D202C70 6D617473 stamp, ..modifiedby varchar(9),  000020
45434F52 500A0D2C 706D6174 73656D69 7420656D 69746465 69666964 6F6D0A0D ..modifiedtime timestamp,..PROCE 000040
28726168 63726176 20454D41 4E0A0D2C 72656765 746E6920 4C45444F 4D5F5353 SS_MODEL integer,..NAME varchar( 000060
454E494C 54554F0A 0D2C746E 696C6C61 6D732045 4E494C54 554F0A0D 2C293637 76),..OUTLINE smallint,..OUTLINE 000080
0D2C746E 696C6C61 6D732033 454E494C 54554F0A 0D2C746E 696C6C61 6D732032 2 smallint,..OUTLINE3 smallint,. 0000A0
6D732035 454E494C 54554F0A 0D2C746E 696C6C61 6D732034 454E494C 54554F0A .OUTLINE4 smallint,..OUTLINE5 sm 0000C0
54554F0A 0D2C746E 696C6C61 6D732036 454E494C 54554F0A 0D2C746E 696C6C61 allint,..OUTLINE6 smallint,..OUT 0000E0
696C6C61 6D732038 454E494C 54554F0A 0D2C746E 696C6C61 6D732037 454E494C LINE7 smallint,..OUTLINE8 smalli 000100
6765746E 69205458 45540A0D 2C726567 65746E69 20524542 4D554E0A 0D2C746E nt,..NUMBER integer,..TEXT integ 000120
65746165 72630A0D 0A0D3B29 0A0D7265 6765746E 69203254 5845540A 0D2C7265 er,..TEXT2 integer..);....create 000140
2065646F 636D0A0D 28205345 544F4E45 524F5453 5F4F464E 4920656C 62617420  table INFO_STORENOTES (..mcode  000160
2C726567 65746E69 2079656B 45524F54 535F4F46 4E490A0D 2C726567 65746E69 integer,..INFO_STOREkey integer, 000180
65746165 72630A0D 0A0D3B29 0A0D7265 6765746E 69207965 6B534554 4F4E0A0D ..NOTESkey integer..);....create 0001A0
646F636D 0A0D2820 44524F57 59454B45 524F5453 5F4F464E 4920656C 62617420  table INFO_STOREKEYWORD (..mcod 0001C0
```

```
65676574 6E692079 65684552 4F54535F 4F464E49 0A0D2C72 65676574 6E692065 e integer,..INFO_STOREkey intege 0001E0

Dump of file SATURN:[PCCOMMON.DUMP.DATA]SAEXPORT.SQL;1 on 18-APR-1990 08:21:19.32
File ID (472,18,0`   End of file block 30 / Allocated 32

Virtual block number 25 (00000019), 512 (0200) bytes

 72630A00 0A003B:9 0A0D7265 6765746E 69207965 6B44524F 5759454B 0A0D2C72 r,..KEYWORDkey integer..);....cr 000000
 69206564 6F63600A 00202820 574F4C46 5F4F464E 4920656C 62617420 65746165 eate table INFO_FLOW ( ..mcode i 000020
 00202C72 65676574 6E692079 6568574F 4C465F4F 464E490A 002C7265 6765746E nteger,..INFO_FLOWkey integer, . 000040
 64657461 6572630A 00202C29 39287261 68637261 76207962 64657461 6572630A .createdby varchar(9), ..created 000060
 72617620 79626465 69666964 6F6D0A0D 202C7060 61747365 60697420 656D6974 time timestamp, ..modifiedby var 000080
 60617473 65606974 20656D69 74646569 6669646F 6D0A0020 2C293928 72616863 char(9), ..modifiedtime timestam 0000A0
 454D414E 0A0D2C72 65676574 6E69204C 45444F4D 5F535345 434F5250 0A0D2C70 p,..PROCESS_MODEL integer,..NAME 0000C0
 6765746E 69205453 45445F45 4352554F 530A0D2C 29363728 72616863 72617620  varchar(76),..SOURCE_DEST integ 0000E0
 5345434F 52500A0D 2C726567 65746E69 2045524F 54535F4F 464E490A 002C7265 er,..INFO_STORE integer,..PROCES 000100
 32545845 540A0D2C 72656765 746E6920 54584554 0A0D2C72 65676574 6E692053 S integer,..TEXT integer,..TEXT2 000120
 0A0D0A0D 3B290A0D 72656765 746E6920 33545845 540A0D2C 72656765 746E6920  integer,..TEXT3 integer..);.... 000140
 600A0028 20534554 4F4E574F 4C465F4F 464E4920 656C6261 74206574 61657263 create table INFO_FLOWNOTES (..m 000160
 65746E69 2079656B 574F4C46 5F4F464E 490A0D2C 72656765 746E6920 65646F63 code integer,..INFO_FLOWkey inte 000180
 72630A00 0A003829 0A0D7265 6765746E 69207965 6B534554 4F4E0A0D 2C726567 ger,..NOTESkey integer..);....cr 0001A0
 6D0A0028 2044524F 5759454B 574F4C46 5F4F464E 4920656C 62617420 65746165 eate table INFO_FLOWKEYWORD (..m 0001C0
 65746E69 2079656B 574F4C46 5F4F464E 490A0D2C 72656765 746E6920 65646F63 code integer,..INFO_FLOWkey inte 0001E0

Dump of file SATURN:[PCCOMMON.DUMP.DATA]SAEXPORT.SQL;1 on 18-APR-1990 08:21:19.32
File ID (472,18,0)   End of file block 30 / Allocated 32

Virtual block number 26 (0000001A), 512 (0200) bytes

 0A0D0A0D 3B290A0D 72656765 746E6920 79656B44 524F5759 454B0A00 2C726567 ger,..KEYWORDkey integer..);.... 000000
 2045445F 45435255 4F53574F 4C465F4F 464E4920 656C6261 74206574 61657263 create table INFO_FLOWSOURCE_DE  000020
 2079656B 574F4C46 5F4F464E 490A0D2C 72656765 746E6920 65646F63 6D0A0028 (..mcode integer,..INFO_FLOWkey  000040
 72656765 746E6920 79656B54 5345445F 45435255 4F530A0D 2C726567 65746E69 integer,..SOURCE_DESTkey integer 000060
 4E49574F 4C465F4F 464E4920 656C6261 74206574 61657263 0A0D0A0D 3B290A0D ..);....create table INFO_FLOWIN 000080
 5F4F464E 490A0D2C 72656765 746E6920 65646F63 6D0A0028 20524F54 535F4F46 FO_STOR (..mcode integer,..INFO_ 0000A0
 2079656B 45524F54 535F4F46 4E490A00 2C726567 65746E69 2079656B 574F4C46 FLOWkey integer,..INFO_STOREkey  0000C0
 4F464E49 20656C62 61742065 74616572 630A0D0A 0D3B290A 0D726567 65746E69 integer..);....create table INFO 0000E0
 0A0D2C72 65676574 6E692065 646F636D 0A0D2820 53534543 4F525057 4F4C465F  FLOWPROCESS (..mcode integer,.. 000100
 65685353 45434F52 500A0D2C 72656765 746E6920 79656B57 4F4C465F 4F464E49 INFO_FLOWkey integer,..PROCESSke 000120
 4C462065 6C626174 20657461 6572630A 0D0A0D3B 290A0D72 65676574 6E692079 y integer..);....create table FL 000140
 0A0D2C72 65676574 6E692065 646F636D 0A0D2028 2054505F 4554554F 525F574F OW_ROUTE_PT ( ..mcode integer,.. 000160
 61657263 0A0D202C 72656765 746E6920 79656B54 505F4554 554F525F 574F4C46 FLOW_ROUTE_PTkey integer, ..crea 000180
 20656069 74646574 61657263 0A0D202C 29392872 61686372 61762079 62646574 tedby varchar(9), ..createdtime  0001A0
 28726168 63726176 20796264 65696669 646F600A 0D202C70 60617473 656D6974 timestamp, ..modifiedby varchar( 0001C0
 530A0D2C 706D6174 73656D69 74206560 69746465 69666964 6F6D0A0D 202C2939 9), ..modifiedtime timestamp,..S 0001E0

Dump of file SATURN:[PCCOMMON.DUMP.DATA]SAEXPORT.SQL;1 on 18-APR-1990 08:21:19.32
File ID (472,18,0)   End of file block 30 / Allocated 32

Virtual block number 27 (0000001B), 512 (0200) bytes

 2C746E69 6C6C616D 73203254 50474553 0A0D2C74 6E696C6C 616D7320 545(.745 EGPT smallint,..SEGPT2 smallint, 000000
 6C6C616D 73203454 50474553 0A0D2C74 6E696C6C 616D7320 33545047 4553(.0D ..SEGPT3 smallint,..SEGPT4 small 000020
 20574F4C 465F4F46 4E490A0D 2C746E69 6C6C616D 73205844 4E490A0D 2C746E69 int,..INDX smallint,..INFO_FLOW  000040
 524F5453 20656C62 61742065 74616572 630A0D0A 0D3B290A 0D726567 65746E69 integer..);....create table STOR 000060
 0A0D2C72 65676574 6E692065 646F636D 0A0D2028 20455255 54435552 54535F45 E_STRUCTURE ( ..mcode integer,.. 000080
 72630A0D 202C7265 6765746E 69207965 6B455255 54435552 54535F45 524F5453 STORE_STRUCTUREkey integer, ..cr 0000A0
 60697464 65746165 72630A0D 202C2939 28726168 63726176 20796264 65746165 eatedby varchar(9), ..createdtim 0000C0
 61686372 61762079 62646569 6669646F 6D0A0020 2C706061 74736560 69742065 e timestamp, ..modifiedby varcha 0000E0
 0D2C7060 61747365 60697420 656D6974 64656966 69646F6D 0A0D202C 29392872 r(9), ..modifiedtime timestamp,. 000100
 69204552 4F54535F 4F464E49 0A0D2C29 32332872 61686372 61762045 4D414E0A .NAME varchar(32),..INFO_STORE i 000120
 0A0D0A0D 3B290A0D 746E696C 6C616D73 204D554E 44524F0A 0D2C7265 6765746E nteger,..ORDNUM smallint..);.... 000140
 63600A00 20282059 5449544E 455F4552 4F545320 656C6261 74206574 61657263 create table STORE_ENTITY ( ..mc 000160
 6E692079 65685954 49544E45 5F45524F 54530A0D 2C726567 65746E69 2065646F ode integer,..STORE_ENTITYkey in 000180
 00202C29 39287261 68637261 76207962 64657461 6572630A 0D202C72 65676574 teger, ..createdby varchar(9), . 0001A0
 69666964 6F6D0A0D 202C7060 61747365 60697420 656D6974 64657461 6572630A .createdtime timestamp, ..modifi 0001C0
```

```
 20656069 74646569 6669646F 600A0D20 2C293928 72616863 72617620 79626465 edby varchar(9), ..modifiedtime  0001E0

Dump of file SATURN:[PCCOMMON.DUMP.DATA]SAEXPORT.SQL;1 on 18-APR-1990 08:21:19.32
File ID (472,18,0)   End of file block 30 / Allocated 32

Virtual block num'er 28 (0000001C), 512 (0200) bytes

 530A0D2C 29323328 72616863 72617620 4540414E 0A0D2C70 60617473 65606974 timestamp,..NAME varchar(32),..S 000000
 5F595449 544E430A 0D2C7265 6765746E 69204552 55544355 5254535F 45524F54 TORE_STRUCTURE integer,..ENTITY_ 000020
 746E696C 6C616D73 2040554E 44524F0A 0D2C7265 6765746E 69205041 405F4050 PM_MAP integer,..ORDNUM smallint 000040
 49525454 415F4552 4F545320 656C6261 74206574 61657263 0A0D0A0D 38290A0D ..);....create table STORE_ATTRI 000060
 415F4552 4F54530A 0D2C7265 6765746E 69206564 6F6360DA 0D202820 45545542 BUTE ( ..mcode integer,..STORE_A 000080
 79626465 74616572 630A0D20 2C726567 65746E69 20796568 45545542 49525454 TTRIBUTEkey integer, ..createdby 0000A0
 73656069 7420656D 69746465 74616572 630A0D20 2C293928 72616863 72617620  varchar(9), ..createdtime times 0000C0
 0D202C29 39287261 68637261 76207962 64656966 69646F6D 0A0D202C 70606174 tamp, ..modifiedby varchar(9), . 0000E0
 7620454D 414E0A0D 2C706061 7473656D 69742065 60697464 65696669 646F600A .modifiedtime timestamp,..NAME v 000100
 65676574 6E692059 5449544E 455F4552 4F54530A 0D2C2932 33287261 68637261 archar(32),..STORE_ENTITY intege 000120
 59540A0D 2C726567 65746E69 20455255 54435552 54535F45 524F5453 0A0D2C72 r,..STORE_STRUCTURE integer,..TY 000140
 6765746E 69205041 405F4050 5F424952 5454410A 0D2C7265 6765746E 69204550 PE integer,..ATTRIB_PM_MAP integ 000160
 61657263 0A0D0A0D 38290A0D 746E696C 6C616D73 2040554E 44524F0A 0D2C7265 er,..ORDNUM smallint..);....crea 000180
 646F636D 0A0D2028 20455255 54435552 54535F57 4F4C4620 656C6261 74206574 te table FLOW_STRUCTURE ( ..mcod 0001A0
 6E692079 65684552 55544355 5254535F 574F4C46 0A0D2C72 65676574 6E692065 e integer,..FLOW_STRUCTUREkey in 0001C0
 0D202C29 39287261 68637261 76207962 64657461 6572630A 0D202C72 65676574 teger, ..createdby varchar(9), . 0001E0

Dump of file SATURN:[PCCOMMON.DUMP.DATA]SAEXPORT.SQL;1 on 18-APR-1990 08:21:19.32
File ID (472,18,0)   End of file block 30 / Allocated 32

Virtual block number 29 (0000001D), 512 (0200) bytes

 69666964 6F6D0A0D 202C706D 61747365 60697420 65606974 64657461 6572630A .createdtime timestamp, ..modifi 000000
 20656069 74646569 6669646F 600A0D20 2C293928 72616863 72617620 79626465 edby varchar(9), ..modifiedtime  000020
 490A0D2C 29323328 72616863 72617620 4540414E 0A0D2C70 60617473 65606974 timestamp,..NAME varchar(32),..I 000040
 696C6C61 6D73204D 554E4452 4F0A0D2C 72656765 746E6920 574F4C46 5F4F464E NFO_FLOW integer,..ORDNUM smalli 000060
 49544E45 5F574F4C 4620656C 62617420 65746165 72630A0D 0A0D3829 0A0D746E nt..);....create table FLOW_ENTI 000080
 49544E45 5F574F4C 460A0D2C 72656765 746E6920 65646F63 6D0A0D20 28205954 TY ( ..mcode integer,..FLOW_ENTI 0000A0
 68637261 76207962 64657461 6572630A 0D202C72 65676574 6E692079 65685954 TYkey integer, ..createdby varch 0000C0
 202C706D 61747365 60697420 65606974 64657461 6572630A 0D202C29 3:.^97261 ar(9), ..createdtime timestamp,  0000E0
 6669646F 600A0D20 2C293928 72616863 72617620 79626465 69666964 6F6 ^A0D ..modifiedby varchar(9), ..modif 000100
 72616863 72617620 4540414E 0A0D2C70 60617473 65606974 20656069 7464.569 iedtime timestamp,..NAME varchar 000120
 0A0D2C72 65676574 6E692045 52555443 55525453 5F574F4C 460A0D2C 29323328 (32),..FLOW_STRUCTURE integer,.. 000140
 7320405S 4E44524F 0A0D2C72 65676574 6E692050 41405F40 505F5954 49544E45 ENTITY_PM_MAP integer,..ORDNUM s 000160
 0D2C7265 6765746E 69205954 49544E45 5F45524F 54530A0D 2C746E69 6C6C6160 mallint,..STORE_ENTITY integer,. 000180
 62617420 65746165 72630A0D 0A0D3829 0A0D746E 696C6C61 6D732052 4154530A .STAR smallint..);....create tab 0001A0
 65746E69 2065646F 63600A0D 20282045 54554249 52545441 5F574F4C 4620656C le FLOW_ATTRIBUTE ( ..mcode inte 0001C0
 2C726567 65746E69 20796568 45545542 49525454 415F574F 4C460A0D 2C726567 ger,..FLOW_ATTRIBUTEkey integer, 0001E0

Dump of file SATURN:[PCCOMMON.DUMP.DATA]SAEXPORT.SQL;1 on 18-APR-1990 08:21:19.32
File ID (472,18,0)   End of file block 30 / Allocated 32

Virtual block number 30 (0000001E), 512 (0200) bytes

 74616572 630A0D20 2C293928 72616863 72617620 79626465 74616572 630A0D20  ..createdby varchar(9), ..creat 000000
 76207962 64656966 69646F6D 0A0D202C 70606174 73656069 7420656D 69746465 edtime timestamp, ..modifiedby v 000020
 7473656D 69742065 60697464 65696669 646F600A 0D202C29 39287261 68637261 archar(9), ..modifiedtime timest 000040
 54535F57 4F4C460A 0D2C2932 33287261 68637261 7620454D 414E0A0D 2C706061 amp,..NAME varchar(32),..FLOW_ST 000060
 6E692059 5449544E 455F574F 4C460A0D 2C726567 65746E69 20455255 54435552 RUCTURE integer,..FLOW_ENTITY in 000080
 6D73204D 554E4452 4F0A0D2C 72656765 746E6920 45505954 0A0D2C72 65676574 teger,..TYPE integer,..ORDNUM sm 0000A0
 72656765 746E6920 45545542 49525454 415F4552 4F54530A 0D2C746E 696C6C61 allint,..STORE_ATTRIBUTE integer 0000C0
 0A0D0A0D 38290A0D 72656765 746E6920 5041405F 40505F42 49525454 410A0D2C ,..ATTRIB_PM_MAP integer..);.... 0000E0
 00000000 00000000 00000000 00000000 00000000 00000000 00000000 00000000 ................................ 000100
 00000000 00000000 00000000 00000000 00000000 00000000 00000000 00000000 ................................ 000120
 00000000 00000000 00000000 00000000 00000000 00000000 00000000 00000000 ................................ 000140
 00000000 00000000 00000000 00000000 00000000 00000000 00000000 00000000 ................................ 000160
 00000000 00000000 00000000 00000000 00000000 00000000 00000000 00000000 ................................ 000180
 00000000 00000000 00000000 00000000 00000000 00000000 00000000 00000000 ................................ 0001A0
 00000000 00000000 00000000 00000000 00000000 00000000 00000000 00000000 ................................ 0001C0
 00000000 00000000 00000000 00000000 00000000 00000000 00000000 00000000 ................................ 0001E0
```

```
Dump of file SATURN:[PCCOMMON.DUMP.DATA]MODEL.BND;1 on 18-APR-1990 08:24:06.21
File ID (469,21,0)   End of file block 2 / Allocated 4

Virtual block number 1 (00000001), 512 (0200) bytes

 41D4843 41424745 40537647 415A2020 204C4544 4F4D0201 00000044 4E49FBFF .«IND.....MODEL   ZAGVSMEGBACHMA 000000
00000048 00000005 00030040 00000000 00000000 00000000 00000000 0130204E N 0.................a.......N... 000020
20455241 4C434544 204E4947 45420015 00000005 00000020 0000019D 000000AF £....... .........BEGIN DECLARE  000040
45532045 52414C43 45442044 4E450013 00000002 00000026 004E4F49 54434553 SECTION.&.........END DECLARE SE 000060
2945444F 43285841 40205443 454C4553 00280002 00000001 0030004E 4F495443 CTION.0.......+.SELECT MAX(CODE) 000080
00040000 004C4544 4F4D204D 4F524620 696E3A65 646F634D 6C3A204F 544E4920  INTO :lMcode:ni FROM MODEL..... 0000A0
4E492029 4E4F4953 52455628 58414D20 5443454C 4553005A 00040000 00020033 3.......Z.SELECT MAX(VERSION) IN 0000C0
4857204C 45444F4D 20404F52 46202020 20696E3A 6E6F6973 7265566C 3A204F54 TO :lVersion:ni    FROM MODEL WH 0000E0
733A203D 20455059 5420444E 4120656D 614E7A73 3A203D20 4540414E 20455245 ERE NAME = :szName AND TYPE = :s 000100
4E492054 5245534E 49005D00 04000000 03003700 02000300 04000100 65707954 Type.........7.......].INSERT IN 000120
54202C4E 4F495352 4556202C 454D414E 202C4544 4F432820 4C45444F 4D204F54 TO MODEL (CODE, NAME, VERSION, T 000140
6560614E 7A733A20 2C65646F 634D6C3A 28205345 554C4156 20202020 29455059 YPE)    VALUES (:lMcode, :szName 000160
0401F000 0200010‾ 03000000 29657079 54733A20 2C6E6F69 73726556 6C3A202C , :lVersion, :sType).........Þ.. 000180
00000000 0000000. 00000000 00000000 00000000 00000000 0065646F 634D6C00 .lMcode......................... 0001A0
00000000 00000000 00000000 00000000 00000000 6E6F6973 7265566C 000401F0 Þ...lVersion.................... 0001C0
00000000 00000000 00000000 00000000 00000000 65707954 73000201 F4000000 ...¶...sType.................... 0001E0
```

```
Dump of file SATURN:[PCCOMMON.DUMP.DATA]MODEL.BND;1 on 18-APR-1990 08:24:06.21
File ID (469,21,0)   End of file block 2 / Allocated 4

Virtual block number 2 (00000002), 512 (0200) bytes

 00000000 00000000 00000000 00000000 6560614E 7A730021 01CC0000 00000000 ......ä.!.szName................ 000000
 00000000 0000000J 00000000 00000000 00696E00 0201F400 00000000 00000000 .........¶...ni................. 000020
 00000000 00000000 00000000 00000000 0000001A 00000000 00000000 00000000 ................................ 000040
 00000000 00000000 00000000 00000000 00000000 00000000 00000000 00000000 ................................ 000060
 00000000 00000000 00000000 00000000 00000000 00000000 00000000 00000000 ................................ 000080
 00000000 00000000 00000000 00000000 00000000 00000000 00000000 00000000 ................................ 0000A0
 00000000 00000000 00000000 00000000 00000000 00000000 00000000 00000000 ................................ 0000C0
 00000000 00000000 00000000 00000000 00000000 00000000 00000000 00000000 ................................ 0000E0
 00000000 00000000 00000000 00000000 00000000 00000000 00000000 00000000 ................................ 000100
 00000000 00000000 00000000 00000000 00000000 00000000 00000000 00000000 ................................ 000120
 00000000 00000000 00000000 00000000 00000000 00000000 00000000 00000000 ................................ 000140
 00000000 00000000 00000000 00000000 00000000 00000000 00000000 00000000 ................................ 000160
 00000000 00000000 00000000 00000000 00000000 00000000 00000000 00000000 ................................ 000180
 00000000 00000000 00000000 00000000 00000000 00000000 00000000 00000000 ................................ 0001A0
 00000000 00000000 00000000 00000000 00000000 00000000 00000000 00000000 ................................ 0001C0
 00000000 00000000 00000000 00000000 00000000 00000000 00000000 00000000 ................................ 0001E0
```

```
Dump of file SATURN:[PCCOMMON.DUMP]INSTALL.CFG;1 on 18-APR-1990 08:21:16.63
File ID (465,27,0)   End of file block 1 / Allocated 4

Virtual block number 1 (00000001), 512 (0200) bytes

00000000 0000C000 00000000 00000000 00000000 00000000 00000000 10AB0004 ..".............................. 000000
00000000 00000000 00000000 00000000 00000000 00000000 00000000 00000000 ................................ 000020
00000000 00000000 00000000 00000000 00000000 00000000 00000000 00000000 ................................ 000040
00000000 00000000 00000000 00000000 00000000 00000000 00000000 00000000 ................................ 000060
00000000 00000000 00000000 00000000 00000000 00000000 00000000 00000000 ................................ 000080
00000000 00000000 00000000 00000000 00000000 00000000 00000000 00000000 ................................ 0000A0
00000000 00000000 00000000 00000000 00000000 00000000 00000000 00000000 ................................ 0000C0
00000000 00000000 00000000 00000000 00000000 00000000 00000000 00000000 ................................ 0000E0
00000000 00000000 00000000 00000000 00000000 00000000 00000000 00000000 ................................ 000100
00000000 00000000 00000000 00000000 00000000 00000000 00000000 00000000 ................................ 000120
00000000 00000000 00000000 00000000 00000000 00000000 00000000 00000000 ................................ 000140
00000000 00000000 00000000 00000000 00000000 00000000 00000000 00000000 ................................ 000160
00000000 00000000 00000000 00000000 00000000 00000000 00000000 00000000 ................................ 000180
00000000 00000000 00000000 00000000 00000000 00000000 00000000 00000000 ................................ 0001A0
00000000 00000000 00000000 00000000 00000000 00000000 00000000 00000000 ................................ 0001C0
00000000 00000000 00000000 00000000 00000000 00000000 00000000 00000000 ................................ 0001E0
```

```
Dump of file SATURN:[PCCOMMON.DUMP.DLL]WSMLOGIN.TMP;1 on 18-APR-1990 08:21:14.45
File ID (962,14,0)   End of file block 5 / Allocated 8

Virtual block number 1 (00000001), 512 (0200) bytes

 00000000 00000040 00000000 000000B8 0000FFFF 00000004 00000005 00465A4D MZF..............¡.......@....... 000000
 00000080 0000J000 00000000 00000000 00000000 00000000 00000000 00000000 ................................ 000020
 6F6E6E61 63206061 72676F72 70207369 685421CD 4C01B821 CD09B400 0EBA1F0E ..o..Ç.e¦¡.LëíThis program canno 000040
 00000000 0000002[illegible] 0A00002E 65646F60 20534F44 206E6920 6E757220 65622074 t be run in DOS mode....$....... 000060
 00050006 00000000 00020000 00000000 00048009 CDC269E7 000A0152 0505454E NE..R...Öiöe.................... 000080
 00000000 0000000C 00010001 00040000 000001DC 0099008F 00740070 00400025 %.@.p.t.....É................... 0000A0
 00A00F21 009C007B 006A0E00 006A0074 000F0F00 000F0072 042A0F00 04290021 !.)...*.r.......t.j...j.(...!... 0000C0
 0C00004E 49474F4C 4D535708 02580004 00EC1EB1 00EC0086 00020E21 00000000 ....!.....$.Ÿ.$...X..WSMLOGIN... 0000E0
 4E49574D 50050000 A5007600 1B000700 01000002 434F5250 474C444E 49474F4C LOGINDLGPROC.........v.È...PMWIN 000100
 54464544 4954470E 49544703 4540414E 4E49474F 4C544553 4C4D440F 6C6D6403 .dml.DMLSETLOGINNAME.GTI.GTIDEFT 000120
 52455551 49544712 574F444E 49574C4F 4F545445 53495447 10434F52 504C4F4F OOLPROC.GTISETTOOLWINDOW.GTIQUER 000140
 47105254 50415441 44585541 59524555 51495447 124C4F4F 54574F44 4E495759 YWINDOWTOOL.GTIQUERYAUXDATAPTR.G 000160
 41454845 54414552 4340454D 00404540 03525450 41544144 58554154 45534954 TISETAUXDATAPTR.MEM.MEMCREATEHEA 000180
 55034B43 4F4C4243 4F4C4C41 40454D00 50414548 594F5254 5345444D 45400E50 P.MEMDESTROYHEAP.MEMALLOCBLOCK.U 0001A0
 2F534F11 0000012E 0303B003 0102574F 444E4957 5245544E 45434C54 550F4C54 TL.UTLCENTERWINDOW...¯.......OS/ 0001C0
 0001434F 52504C4F 4F544E49 474F4C00 00006E69 676F4C20 4D535720 4D502032 2 PM WSM Login...LOGINTOOLPROC.. 0001E0
```

```
Dump of file SATURN:[PCCOMMON.DUMP.DLL]WSMLOGIN.TMP;1 on 18-APR-1990 08:21:14.45
File ID (962,14,0)   End of file block 5 / Allocated 8

Virtual block number 2 (00000002), 512 (0200) bytes

 4680006A D88EFFFF 881E5657 000010C8 00000000 00000000 00000000 00000000 ................à...WV.j...Äj..F 000000
 6A1F6AF2 76FF00rD E9F04688 0006E903 7500F07E 83F04689 0000FFFF 9A5016F2 ·.P......Fÿ.~ÿ.u.Õ...FÿÕ»..v·j.j 000020
 880000FF FF9AF276 FF000EE9 037500F0 7E83F046 890000FF FF9A5016 FC46800C ..F•.P......Fÿ.~ÿ.u.Õ...v·...... 000040
 478926FC 5EC4FE47 8826065E C4020646 83044789 26F24688 FC5EC400 D2E9F046 FÿÕ@.á^•.F·&.G..F..á^.&.G±á^•&.G 000060
 C4040646 830A5789 26084789 26FC5EC4 FE578826 FC478826 065EC404 06468306 ..F..á^.&.G•&.W±á^•&.G.&.W..F..á 000080
 68FFFF68 016A006A 016A006A 02578926 078926FC 5EC4FE57 8826FC47 8826065E ^.&.G•&.W±á^•&..&.W.j.j.j.j.h..h 0000A0
 88FA5689 F8468900 00FFFF9A FC76FFFE 76FF0258 68000036 FF26009A 068EFFFF ......&.6..hX..v±.v•......F½.V'. 0000C0
 FF0038E9 F44688F6 5689F446 890000FF FF9A006A 006A0015 E90374FA 4608F846 F½.F't.Õ..j.j.......F¶.V-.F¶õ8.. 0000E0
 76FFFA76 FF0000FF FF9AFC76 FFFE76FF 0A76FF00 00FFFF9A F876FFFA 76FF0A76 v..v'.v½......v..v±.v•......v'.v 000100
 06C80006 CAC95F5E 1F0000E9 00008800 00FFFF9A F876FFFA 76FF0000 FFFF9AF8 ½......v'.v½.....j..Õ...^_èò..à. 000120
 FA4680FE 76FF0000 FFFF9A50 16FE4680 1076FF12 76FFD88E 0008881E 56570000 ..WV.j...Ä.v..v..F±.P......v±.F' 000140
 6A1076FF 1276FFFC 5689FA46 89085688 06468802 20E90E46 880000FF FF9A5016 .P.......F.Õ ..F..V..F'.V•.v..v.j 000160
 48064788 26FA5EC4 01436802 6C681076 FF1276FF 0000FFFF 9A0676FF 0876FF00 ..v..v.......v..v.hl.hC.á^'&.G.H 000180
 77FF260A 77FF26FA 5EC4026C 681076FF 1276FF00 00FFFF9A 006A006A 5052D22B +@RPj.j.......v..v.hl.á^'&.w.&.w 0001A0
 681E1076 FF1276FF 016A006A 01DCE900 00FFFF9A 1076FF12 76FF0000 FFFF9A08 .......v..v......ÕÉ.j.j..v..v..h 0001C0
 26FA5EC4 001DE903 7480040A 7E81018E E9000002 689A006A 006A0000 681E0013 ...h..j.j..h...Õ/..~...t.Õ..á^'& 0001E0
```

Dump of file SATURN:[PCCOMMON.DUMP.DLL]VSMLOGIN.TMP;1 on 18-APR-1990 08:21:14.45
File ID (962,14,0)   End of file block 5 / Allocated 8

Virtual block number 3 (00000003), 512 (0200) bytes

E90A4688 0194E901 A0E9D22B 00000309 9A016A10 76FF1276 FF000007 C7261FC4 á.&ú....v..v.j......+@Õ..Õ...F.Õ 000000
FFFF9A08 77FF260A 77FF26FA 5EC40677 FF26FA5E C4026C68 1076FF12 76FF0135 5..v..v.hl.á^*&.w.á^*&.w.&.w.... 000020
37E90374 00003008 C4830296 00009A08 77FF260A 77FF26FA 5EC4002C 681E0000 ...h,.á^*&.w.&.w.......á.=..t.Õ7 000040
016A006A 000002BA 9A006A00 6A002D68 1E004068 1E1076FF 1276FF01 6A006A00 .j.j..v..v..hə..h-.j.j..¤...j.j. 000060
260A77FF 26FA5EC4 0002E900 0002039A 50520000 02CC9A02 6C681076 FF1276FF .v..v.hl..ä...RP.Ì...Õ@.á^*&.w.& 000080
6C681E10 76FF1276 FF016A00 6A003AE9 03770008 3D04C483 02E8002A 9A0877FF .w..*.Š..á.=..w.Õ:.j.j..v..v..hl 0000A0
0000FFFF 9A026C68 1076FF12 76FF016A 006A0000 FFFF9A00 6A006A00 59681E00 ..hY.j.j......j.j..v..v.hl...... 0000C0
04C483FF FF00429A 0877FF26 0A77FF26 FA5EC400 44E90080 E90000FF FF9A5052 RP.....Õ..ÕD.á^*&.w.&.w..B....á. 0000E0
FA5EC400 00FFFF9A 016A1076 FF1276FF 0000FFFF 9A0877FF 260A77FF 26FA5EC4 á^*&.w.&.w.......v..v.j......á^* 000100
FF000007 C7261FC4 26FA5EC4 0036E900 88E90000 8A000088 000107C7 261FC426 &á.&ú...¡..¤..Õ..Õ6.á^*&á.&ú.... 000120
30FEC3E9 03750001 300013E9 0016E900 68E9D22B 00000200 9A016A10 76FF1276 v..v.j......+@Õh.Õ..Õ..=..u.Õü±= 000140
FF0876FF 0A76FF0C 76FF0E76 FF1076FF 1276FF00 43E9FFE7 E9FFCDE9 03750002 ..u.Õë.ÕÕ.ÕC..v..v..v..v..v..v.. 000160
00223DFE 55E90375 002130FE 87E90375 00203D00 23E9002F E90000FF FF9A0676 v......Õ/.Õ#.= .u.Õ.±=!.u.ÕU±=". 000180
000ECAC9 5F5E1F00 00E90000 8A000088 FF8DE9FD C0E90375 003B3DFE 2FE90375 u.Õ/±=;.u.Õá»Õ§.¡..¤..Õ...^_èò.. 0001A0
00AD0000 9A0A76FF 0C76FF10 76FF0045 E90E4688 088E0136 881E5657 000002C8 à...WV.¡6..Ä.F.ÕE..v..v..v....Ù. 0001C0
FF0A76FF 0C76FF0E 76FF1076 FF0040E9 00008A00 01880049 E999FE46 88FE4689 .F±.F±.Õl.¡..¤..Õə..v..v..v..v.. 0001E0

```
Dump of file SATURN:[PCCOMMON.DUMP.DLL]VSMLOGIN.TMP;1 on 18-APR-1990 08:21:14.45
File ID (962,14,0)   End of file block 5 / Allocated 8

Virtual block number 4 (00000004), 512 (0200) bytes

 3DFFC8E9 03751001 3D0013E9 001FE999 FE4688FE 46890000 FFFF9A06 76FF0876 v..v.......Fz.Fz.Ô..Ô..=..u.Ôù.= 000000
 0100C501 0300160C CAC95F5E 1F0000E9 00008A00 0088FFC9 E9FFABE9 03751003 ..u.Ô¨.Ôè.¡..¤..Ô...^ èò.....é.. 000020
 01019901 03007E00 01033801 03007C00 01011201 03000000 0103CE00 02007A00 .z...ö...........|...Ӗ...~...... 000040
 01022E01 030007C0 01011001 03008600 0101B201 03000000 03024400 02007F00 .....D.......ý.................. 000060
 0202FC02 03007AC  04001402 03008800 01010801 03000000 04038800 02008700 .....¡.......Ů...........z...■.. 000080
 04003702 03008800 04004802 03001E00 01017801 03001300 01027A01 03000800 .....z.......x.......K.......7.. 0000A0
 01008000 05002E00 0300F902 03008300 01037301 03001F00 0303F602 03009700 .....−.......s...•...ª.......¯.. 0000C0
 03015302 03003F00 03014602 03004000 01028101 0300A900 05018002 03012E00 .....§...`.......M...F...?...S.. 0000E0
 00000000 00000000 00000000 00006500 03010702 0300F300 01000F01 03005200 .R...Ô...µ.......e.............. 000100
 00000000 00000000 00000500 02000200 01C80001 881F0000 3E89088E FFFF881E .¡...Å.>...¡..ù................. 000120
 10C01805 74A6F3F9 2801F7AE F2FFFF89 C0330A7E C40676C5 1EDE8807 8BEC8855 U.$.■.ß.év.á~.3à¿..·ÜÄ|+ªµ|t..â. 000140
 5DFA8891 49D1F7AE F2FFFF89 C033067E C40788EC 885500C8 5DFA88F3 881FFFFF ....µ.ª)ù.U.$.■á~.3à¿..·ÜÄ||..ª] 000160
 0A078A43 07884104 04731A3C 612C1174 C00A078A D388065E C5D98CEC 885500C8 ù.U.$.\é^..Æ...ât.,■<.s..A..C... 000180
 676F4C20 72657355 20746E65 72727543 00000000 0000C850 D98EDA8C 92EF75C0 âuÿ..Ö.\]ù......Current User Log 0001A0
 72754300 00646574 6E656D65 6C706D69 20746579 20746F6E 20706C65 48006E69 in.Help not yet implemented..Cur 0001C0
 55206120 7265746E 45206573 61656C50 006E6967 6F4C2072 65735520 746E6572 rent User Login.Please Enter a U 0001E0
```

```
Dump of file SATURN:[PCCOMMON.DUMP.DLL]WSNLOGIN.TMP;1 on 18-APR-1990 08:21:14.45
File ID (962,14,0)   End of file block 5 / Allocated 8

Virtual block number 5 (00000005), 512 (0200) bytes

 6978614D 006E6967 6F4C2072 65735520 746E6572 72754300 6560614E 20726573 ser Name.Current User Login.Maxi 000000
 206F7420 746F4E20 73726574 63617261 68432066 6F207265 6260754E 20607560 mum Number of Characters Not to  000020
 00000000 00006000 00000000 0005009A 00020001 FFFF0000 38206465 65637865 exceed 8........................ 000040
 00559400 009000C2 000A0001 00000005 00000000 FFFF0001 000E0352 000000EC &...R...................ô.....U. 000060
 0028005A 80020008 00010000 00060000 00000000 00CDFFFF 0258003C 00BF0077 w.e.<.X...ë...........!.....Z.(. 000080
 00260006 00148003 04000002 00020003 00000000 0000FFFF FFFF026C 00080044 D...l................@.........&. 0000A0
 000C0026 0006004F 80020000 00D50006 00030000 00000000 FFFFFFFF 0001000C ..................f.....O...&... 0000C0
 028A000C 00260006 00808002 0100000C 00040003 00000000 0000FFFF FFFF0002 ...............É.........&..... 0000E0
 FFFF0262 0008003D 00280017 80010001 00E1000A 00050000 00000000 FFFFFFFF ..............Ã.......(.=...b... 000100
 706C6548 006C6563 6E614300 4B4F0000 00000300 6E69676F 4C207265 7355FFFF ..User Login......OK.Cancel.Help 000120
 00000000 00000000 00000000 00000000 00000000 003A656D 616E2072 65735500 .User name:..................... 000140
 00000000 00000000 00000000 00000000 00000000 00000000 00000000 00000000 ................................ 000160
 00000000 00000000 00000000 00000000 00000000 00000000 00000000 00000000 ................................ 000180
 00000000 00000000 00000000 00000000 00000000 00000000 00000000 00000000 ................................ 0001A0
 00000000 00000000 00000000 00000000 00000000 00000000 00000000 00000000 ................................ 0001C0
 00000000 00000000 00000000 00000000 00000000 00000000 00000000 00000000 ................................ 0001E0
```

U.S. Serial Number 516,822
BIL-111
DYNAMIC INFORMATION MANAGEMENT COMPUTER SYSTEM

APPENDIX B

Bachman Analyst V1.0

ANALYST_MODEL

2,"HEIDI",1990-04-15-19.13.32.000000,"HEIDI",1990-04-15-19.13.32.000000,"LLBACH",0

ANALYST_MODELKEYWO

ANALYST_MODELALIAS

ANALYST_MODELNOTES

DATA_MODEL

1,"HEIDI",1990-04-15-19.13.30.000000,"HEIDI",1990-04-15-19.14.05.000000,"LL BACHMAN",0,0,0,0,0,0,0,0,"",0,2

DATA_MODELTEXT

TEXT

ALIAS

KEYWORD

NOTES

NOTESKEYWORD

ER_NOTES

ENTITY

3,"HEIDI",1990-04-15-19.13.57.000000,"HEIDI",1990-04-15-19.14.10.000000,"customer",0,9999999,0,0,"Y","C","N",0,-680,-1,0,0,-280,-1,200,0,0,0,0,0,0,0,0,0,0

ENTITYNOTES

ENTITYALIAS

ENTITYKEYWORD

ENTITYER_NOTES

.

.

.

Figure 4-7

```
BPROMPTED QUERY=BACHMAN.SIMPLE

 ıbles:
  BACHMAN.MODEL

Columns:
  CODE
  NAME
  VERSION
```

B

| CODE | NAME | VERSION |
|---|---|---|
| 1 | LL BACHMAN Catalog Sales Co | 1 |
| 2 | INTERCITY MAIL | 1 |
| 3 | LL BACHMAN Catalog Sales Co | 2 |

```
BPROMPTED QUERY=BACHMAN.MULTITABLE

 ıbles:
  BACHMAN.ENTITY(A)
  BACHMAN.ATTRIBUTE(B)

Join Tables:
  A.ENTITYKEY And B.ENTITY

Columns:
  A.NAME
  MINVOL
  MAXVOL
  B.NAME

Row Conditions:
  If A.MCODE Is Equal To B.MCODE
    And A.MCODE Is Equal To 1
```

Figure 4-13

B

| Entity Name | Attribute Name |
| --- | --- |
| Min. vol: 0, Max. vol: 9999999 | |
| ORDER | Order-number |
| | Order-date |
| | Order-status |
| | Order-qty |
| | Ship-to-address |
| | Customer-number |
| | Item-number |
| | Product-item-amount |
| | Product-item-sales-tax |
| | Catalog-page-number |
| | * |
| Min. vol: 0, Max. vol: 9999999 | |
| Camping-Department | Department-number |
| | Department-name |
| | * |
| Min. vol: 0, Max. vol: 9999999 | |
| Employee | Employee-number |
| | Employee-name |
| | Employee-address |
| | * |
| Min. vol: 0, Max. vol: 9999999 | |
| Project | Project-number |
| | Project-title |
| | Project-leader |
| | * |
| Min. vol: 0, Max. vol: 19999998 | |
| customer | customer-number |
| | customer-name |
| | customer-telephone-number |
| | * |
| Min. vol: 0, Max. vol: 9999999 | |
| wholesale | customer-credir-card-number |
| | * |
| Min. vol: 0, Max. vol: 9999999 | |
| PRODUCT | Product-weight |
| | Product-number |
| | Product-description |
| | * |

Figure 4-14

```
BSQL QUERY=BACHMAN.MULTSQL

select name, ' ' from entity where mcode = (select max(code) from model)
union
select e.name, a.name from entity e, attribute a where (e.mcode = a.mcode
and entitykey = a.entity) and e.mcode = (select max(code) from model)
order by 1,2
```

Figure 4-15

B

| Entity Name | Attribute Name |
| --- | --- |
| Camping-Department | |
| | Department-name |
| | Department-number |
| | * |
| customer | |
| | customer-name |
| | customer-number |
| | customer-telephone-number |
| | * |
| Employee | |
| | Employee-address |
| | Employee-name |
| | Employee-number |
| | * |
| ORDER | |
| | Catalog-page-number |
| | Customer-number |
| | Item-number |
| | Order-date |
| | Order-number |
| | Order-qty |
| | Order-status |
| | Product-item-amount |
| | Product-item-sales-tax |
| | Ship-to-address |
| | * |
| PRODUCT | |
| | Product-description |
| | Product-number |
| | Product-weight |
| | * |
| Project | |
| | Project-leader |
| | Project-number |
| | Project-title |
| | * |
| retail | |
| | * |
| wholesale | |
| | customer-credir-card-number |
| | * |

Figure 4-16

```
BPROMPTED QUERY=BACHMAN.KEYWORD

 ıbles:
  BACHMAN.ENTITY(A)
  BACHMAN.KEYWORD(B)
  BACHMAN.ENTITYKEYWORD(C)

Join Tables:
  A.ENTITYKEY And C.ENTITYKEY
  And C.KEYWORDKEY And B.KEYWORDKEY

Columns:
  NAME
  VALUE

Row Conditions:
  If A.MCODE Is Equal To C.MCODE
    And A.MCODE Is Equal To B.MCODE
    And A.MCODE Is Equal To 1
```

Figure 4-17

```
B

  Entity Name                          Keyword Name
  ---------------------------------    ------------
  Employee                             onfile
  customer                             onfile
  PRODUCT                              onfile
```

Figure 4-18

```
BSQL QUERY=BACHMAN.KEYWSQL

 ılect name, ' ' from entity where mcode = (select max(code) from model)
 .ıion
select e.name, a.value from entity e, keyword a, entitykeyword k where
(e.mcode = a.mcode and e.mcode = k.mcode and
e.entitykey = k.entitykey and a.keywordkey = k.keywordkey)
and e.mcode = (select max(code) from model)
order by 1,2
```

Figure 4-19

B

| Entity Name | Keyword Name |
|---|---|
| Camping-Department | |
| customer | |
| customer | onfile |
| Employee | |
| Employee | onfile |
| ORDER | |
| PRODUCT | |
| PRODUCT | onfile |
| Project | |
| retail | |
| wholesale | |

(Not available in the Beta release.)
Figure 5-2
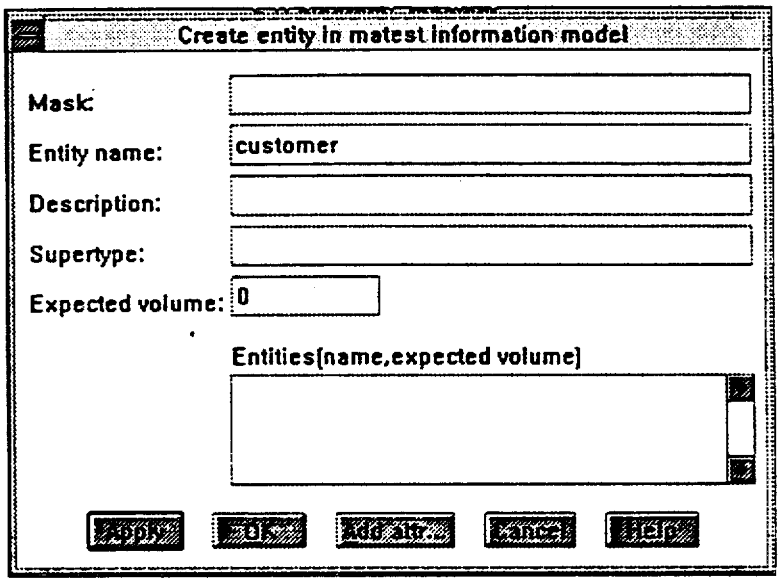
Figure 5-3
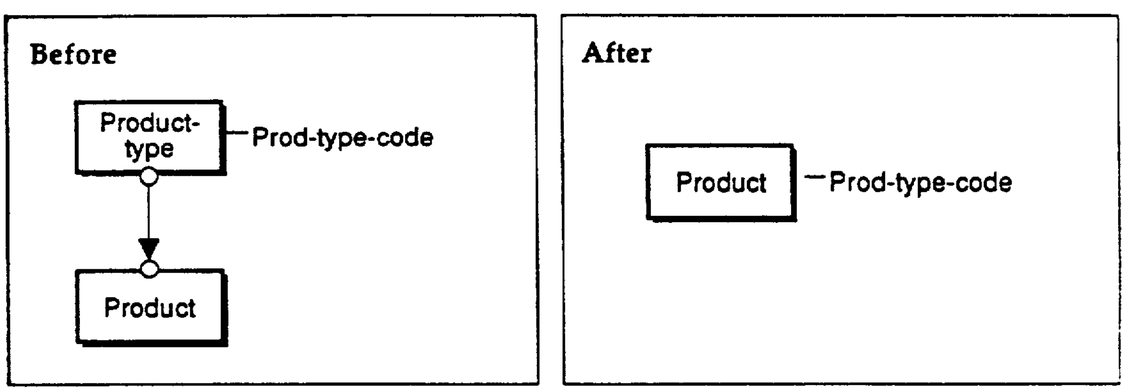
Figure 5-4

(1 of 6)

(2 of 6)

(3 of 6)

(4 of 6)

(5 of 6)

(6 of 6)

(1 of 2)

(2 of 2)

(1 of 2)

(2 of 2)

(1 of 5)

(2 of 5)

(3 of 5)

(4 of 5)

(5 of 5)

(1 of 3)

(2 of 3)

(3 of 3)

(1 of 4)

(2 of 4)

(3 of 4)

(4 of 4)

(1 of 2)

(2 of 2)

(1 of 7)

(2 of 7)

(3 of 7)

(4 of 7)

(5 of 7)

(6 of 7)

(7 of 7)

(1 of 3)

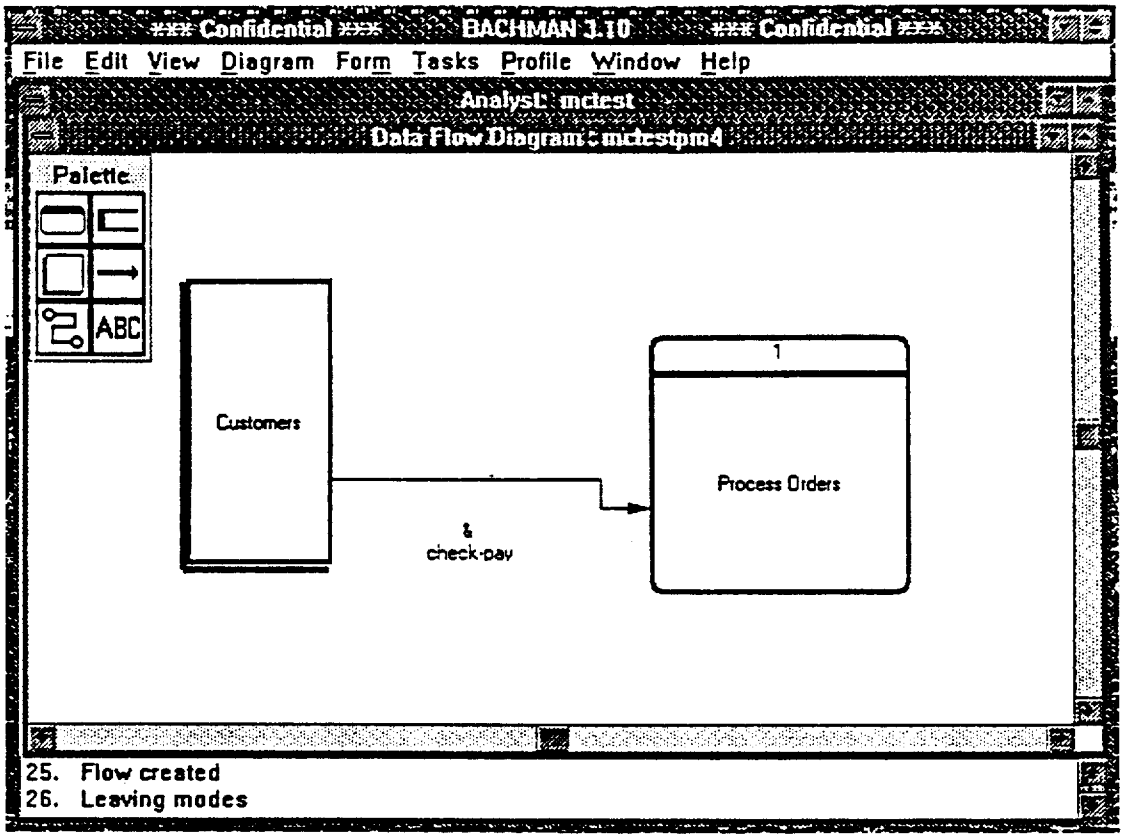

Figure 7-22B
(2 of 3)

| Source | | Target | | Result |
|---|---|---|---|---|
| Mail-Orders → | + | Check-Payments → | = | Mail-Orders & Check-Payments → |
| Customer-Name | | Customer-Name | | Customer-Name |
| Customer-Address | | Customer-Address | | Customer-Address |
| Customer-Phone | | Check-Number | | Customer-Phone |
| Customer-Order-ID | | Check-Issue-Date | | Customer-Order-ID |
| Customer-Order-Date | | Payment-Amount | | Customer-Order-Date |
| Customer-Order-Total | | | | Customer-Order-Total |
| Item | | | | Item |
| ▪ Line-Number | | | | ▪ Line-Number |
| ▪ Product-Code | | | | ▪ Product-Code |
| ▪ Item-Quantity | | | | ▪ Item-Quantity |
| ▪ Item-Price | | | | ▪ Item-Price |
| ▪ Item-Total | | | | ▪ Item-Total |
| | | | | Check-Number |
| | | | | Check-Issue-Date |
| | | | | Payment-Amount |

Figure 7-22C
(3 of 3)

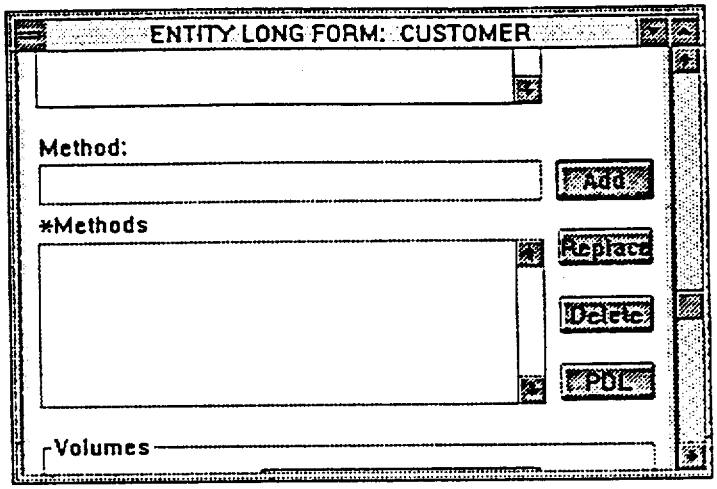
Figure 9-17
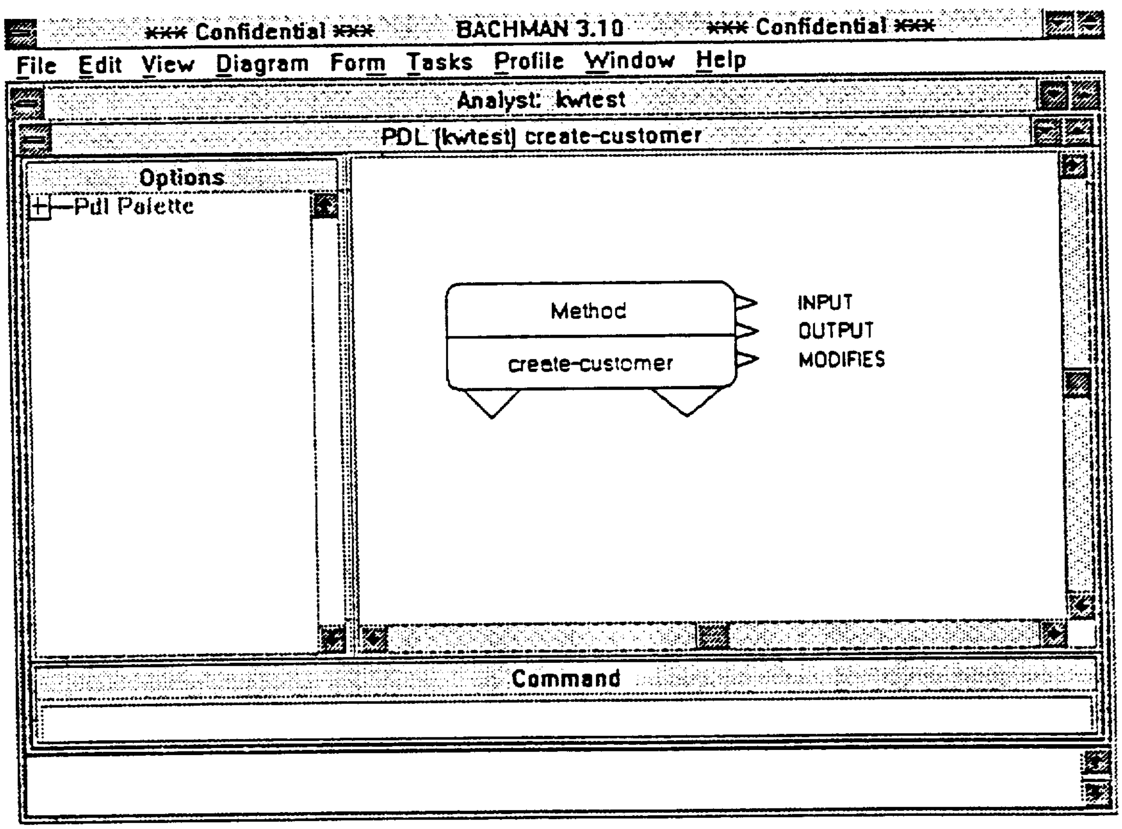
Figure 9-18
Figure 9-19
appears in the text of the chapter

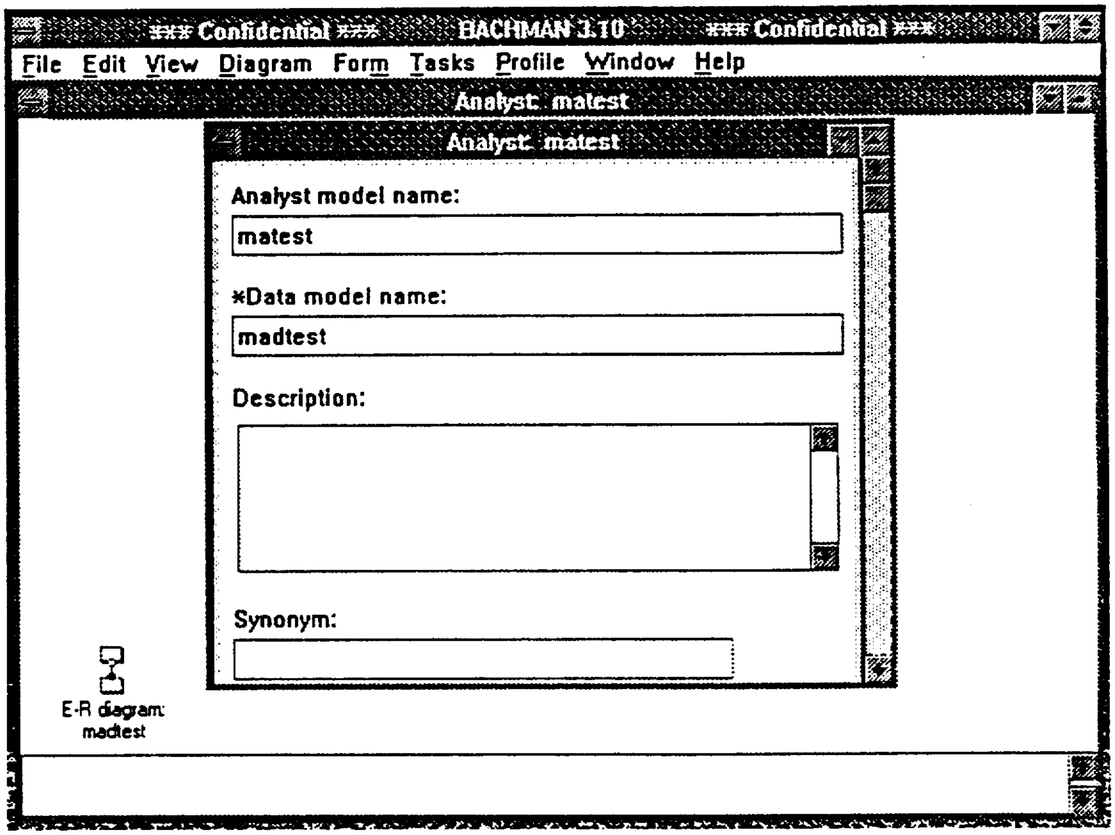
Figure 11-1 Analyst Model Form
(1 of 4)

(2 of 4)

(3 of 4)

(4 of 4)

Figure 11-2 Allowed Value Table Form (1 of 2)

(2 of 2)

Figure 11-3 Attribute Form (1 of 7)

(2 of 7)

(3 of 7)

(4 of 7)

(5 of 7)

(6 of 7)

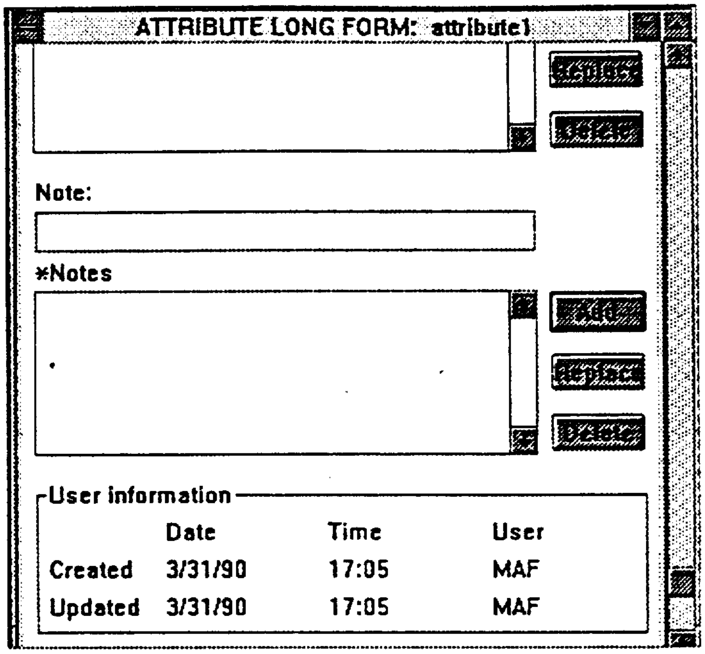
Figure 11-3
(7 of 7)
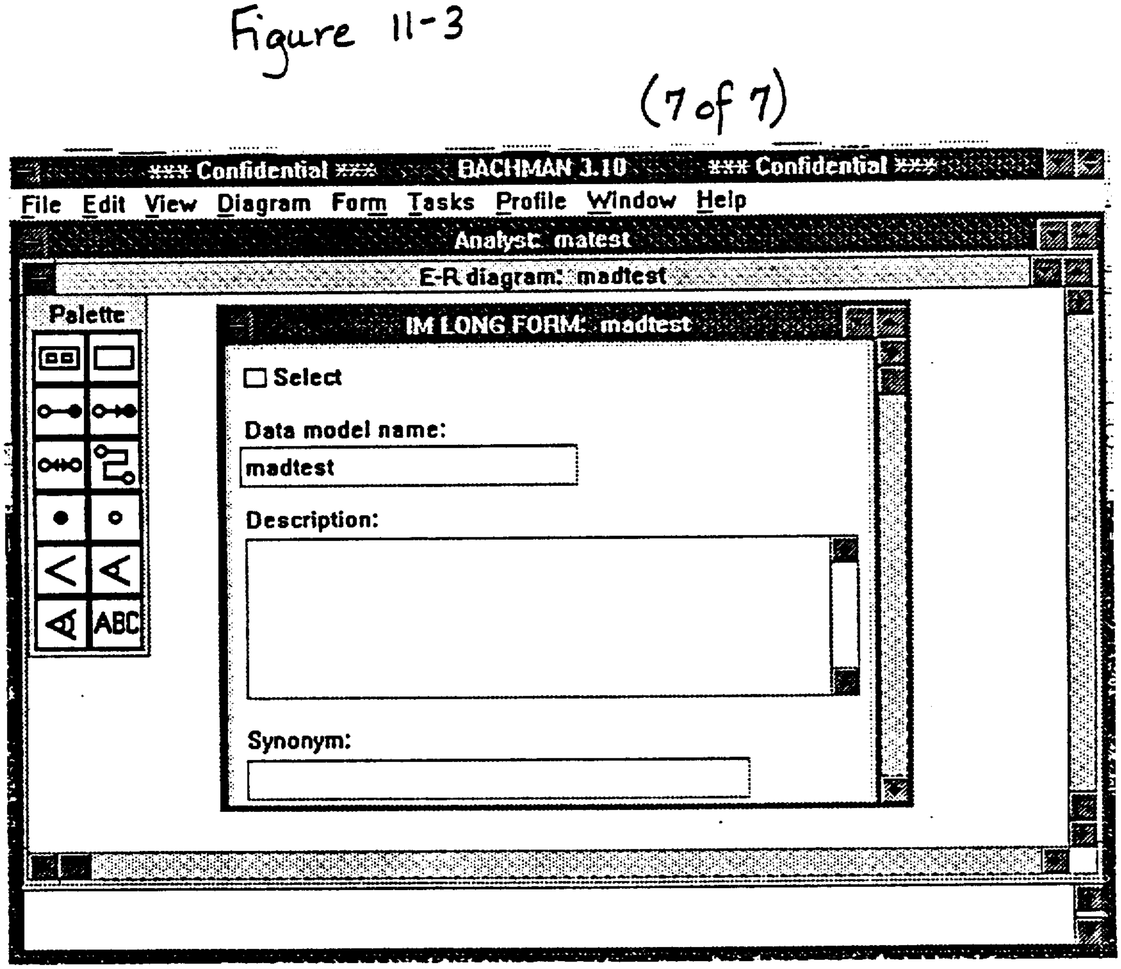
Figure 11-4 Data Model Form
(1 of 5)

(2 of 5)

(3 of 5)

(4 of 5)

(5 of 5)

Figure 11-5 Dimension Form (1 of 4)

(2 of 4)

(3 of 4)

(4 of 4)

Figure 11-6 Domain Form (1 of 5)

(2 of 5)

(3 of 5)

(4 of 5)

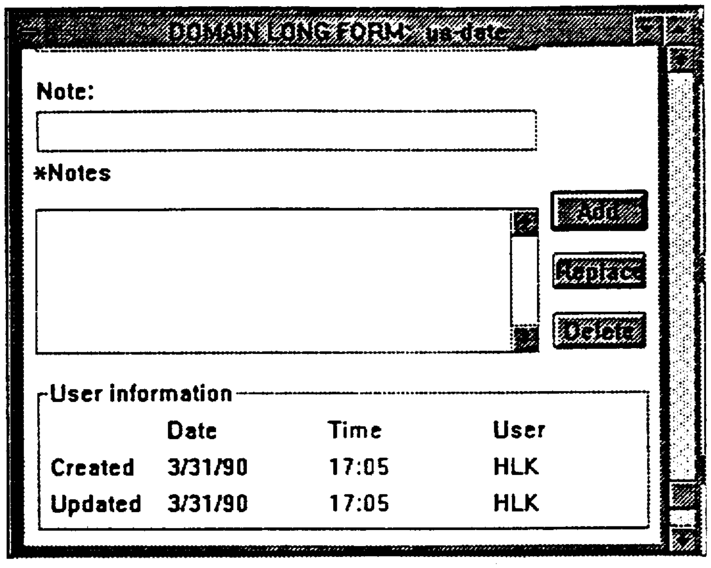
Figure 11-6
(5 of 5)
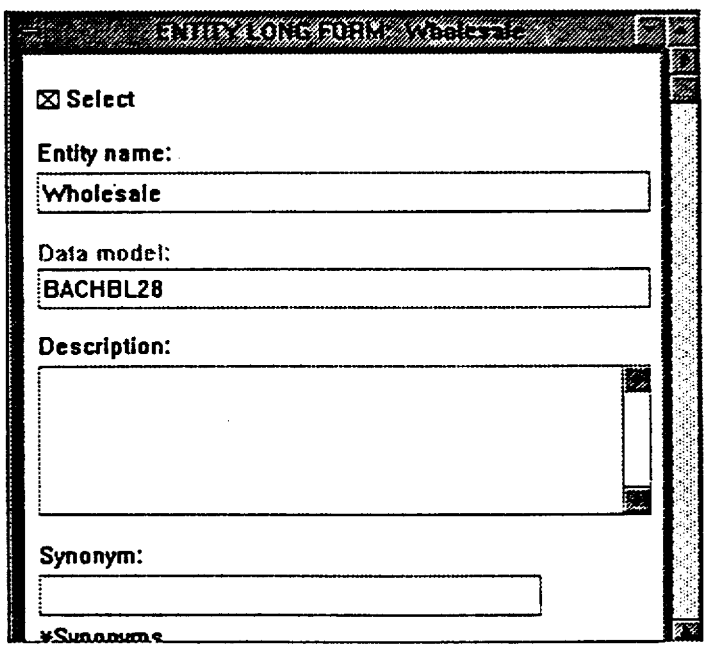
Figure 11-7 Entity Form
(1 of 7)

(2 of 7)

(3 of 7)

(4 of 7)

(5 of 7)

(6 of 7)

(7 of 7)

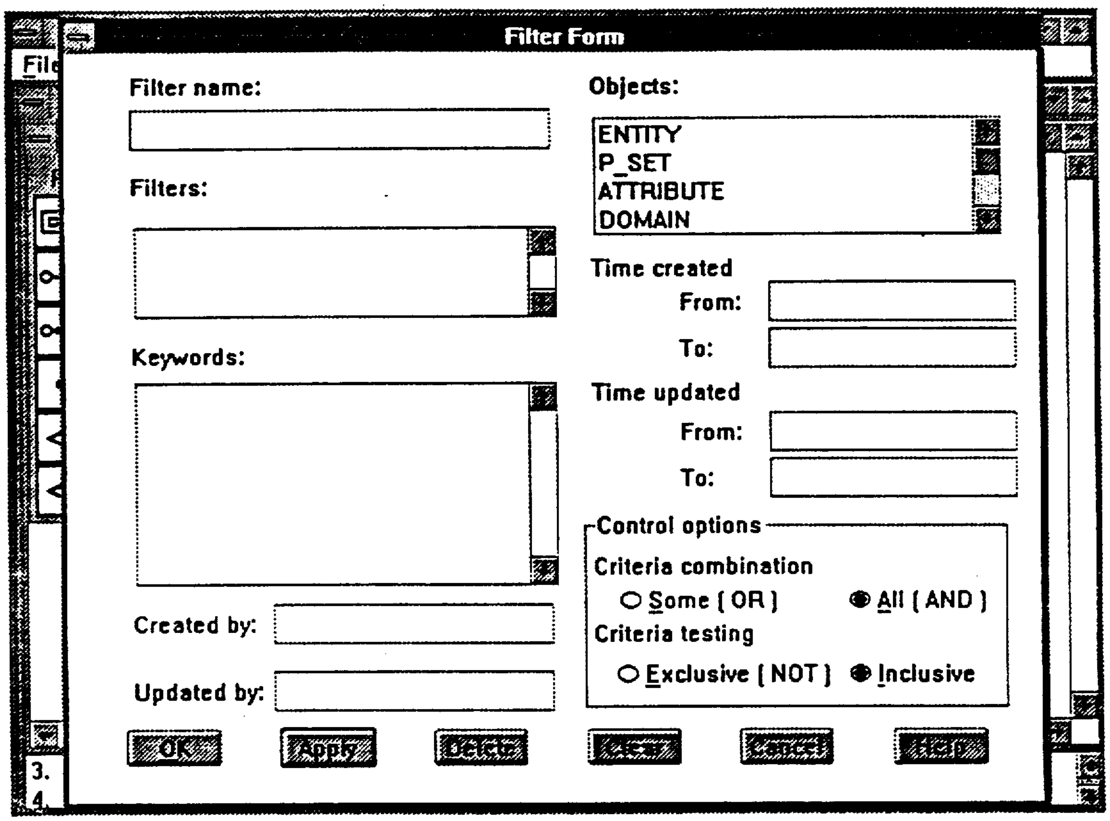
Figure 11-8 Filter Form
(1 of 1)
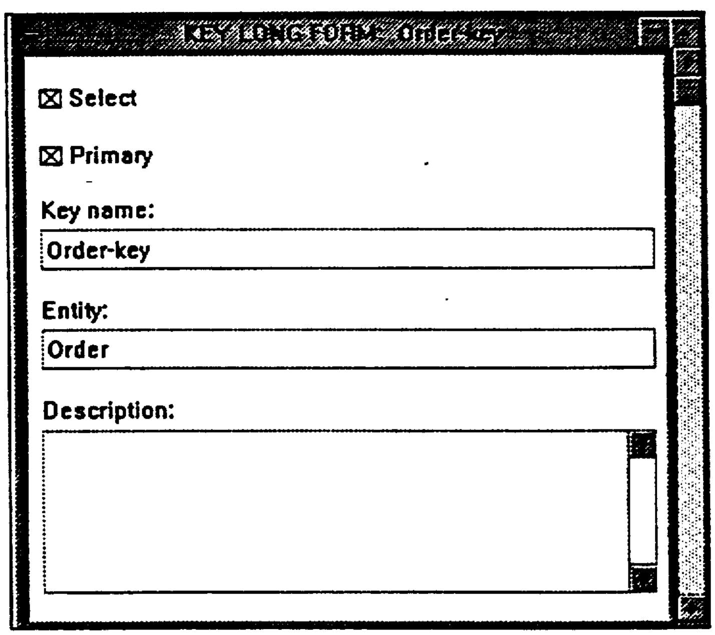
Figure 11-9 Key Form
(1 of 4)

(2 of 4)

(3 of 4)

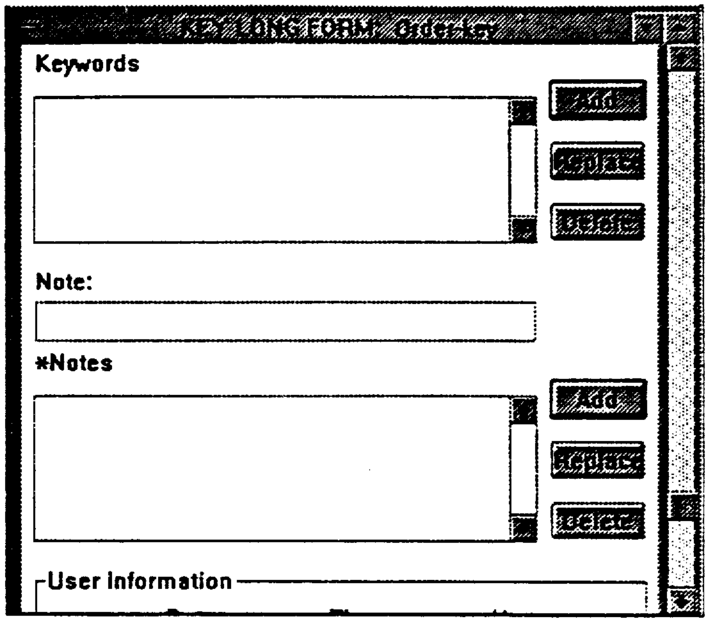
Figure 11-9
(4 of 4)
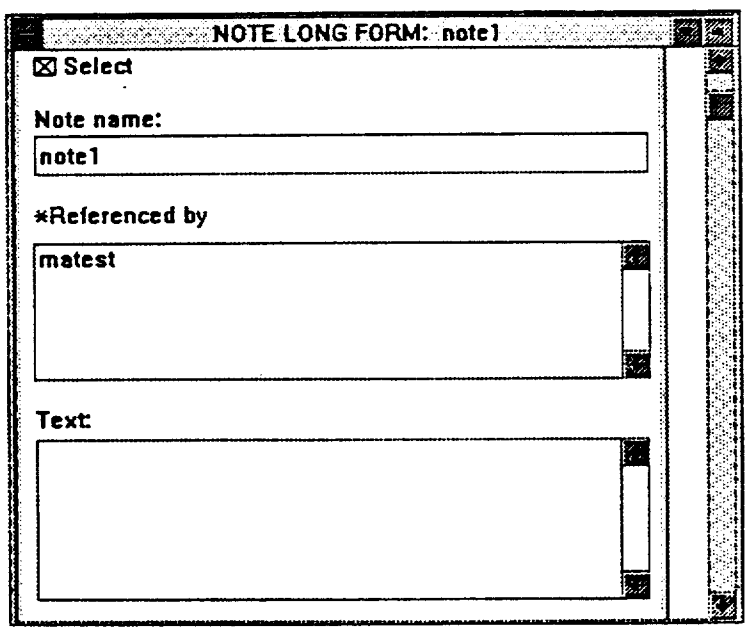
Figure 11-10 Notes Form
(1 of 2)

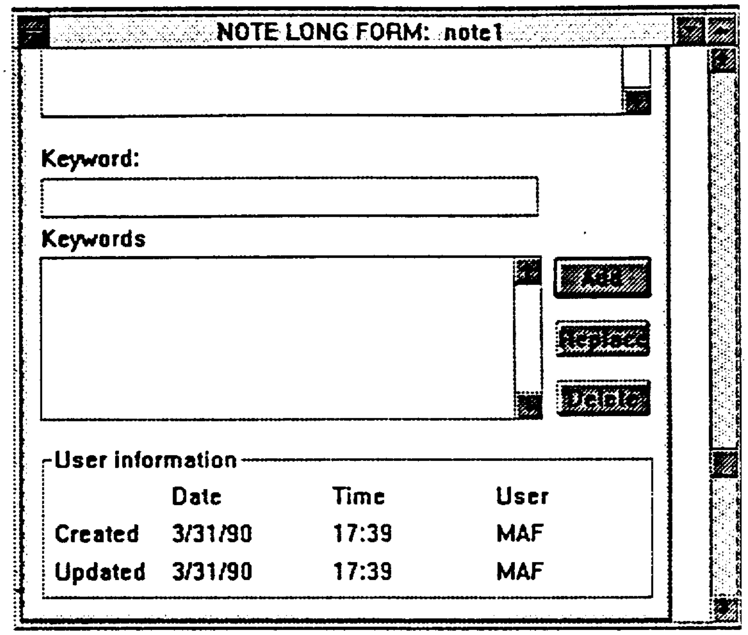
Figure 11-10
(2 of 2)
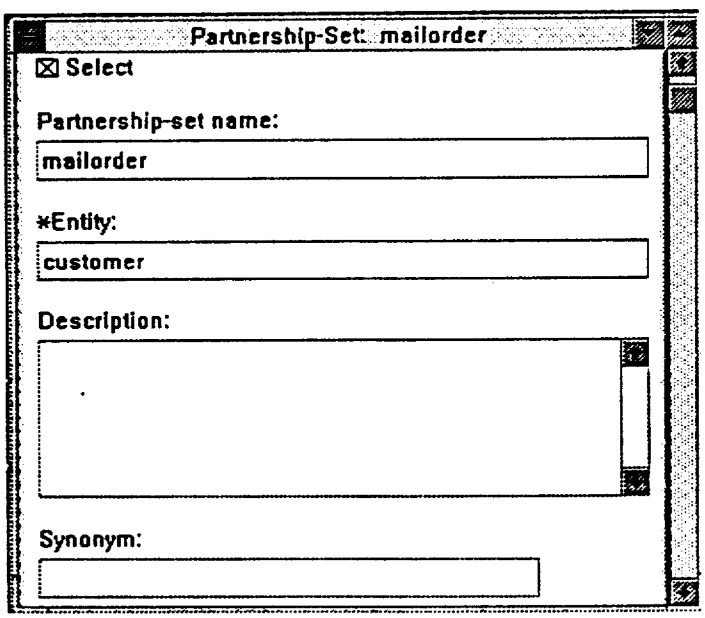
Figure 11-11 Partnership Set Form
(1 of 6)

(2 of 6)

(3 of 6)

(4 of 6)

(5 of 6)

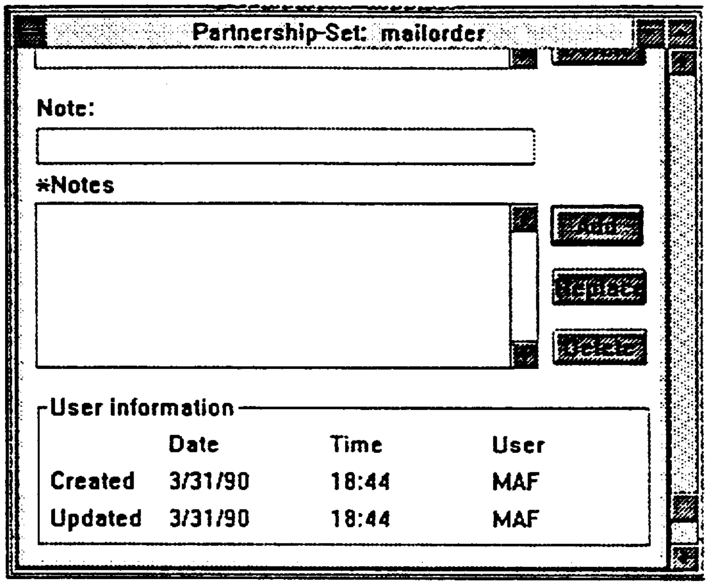
Figure 11-11
(6 of 6)
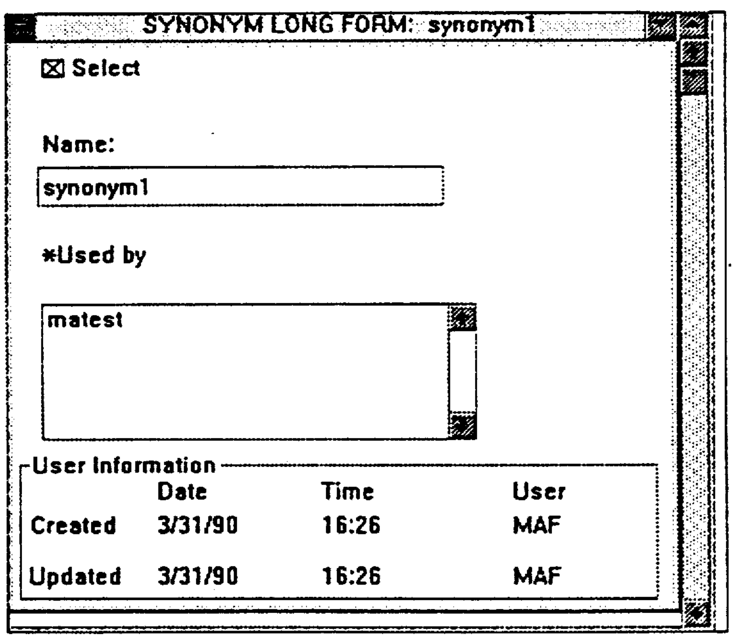
Figure 11-12 Synonym Form
(1 of 1)

(1 of 7)

(2 of 7)

(3 of 7)

(4 of 7)

(5 of 7)

(6 of 7)

(7 of 7)

(1 of 5)

(2 of 5)

(3 of 5)

(4 of 5)

(5 of 5)

(1 of 6)

(2 of 6)

(3 of 6)

(4 of 6)

(5 of 6)

(6 of 6)

(1 of 6)

(2 of 6)

(3 of 6)

(4 of 6)

(5 of 6)

(6 of 6)

(1 of 4)

(2 of 4)

(3 of 4)

(4 of 4)

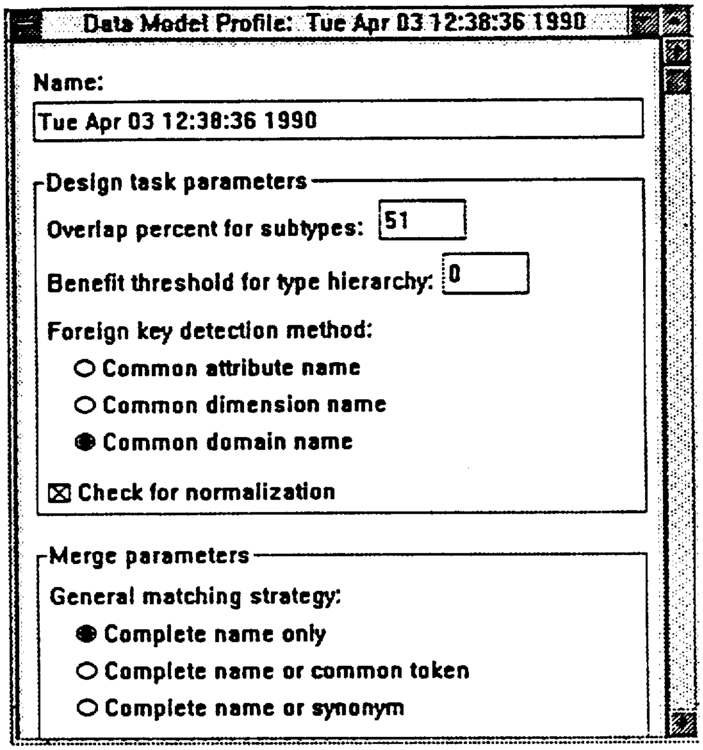
Figure 11-18 (1 of 4)
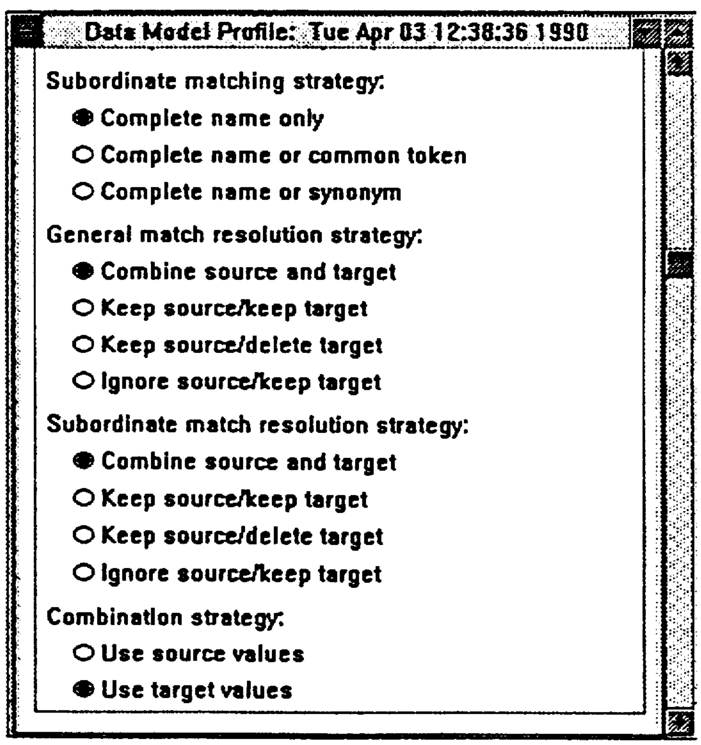
Figure 11-18 (2 of 4)

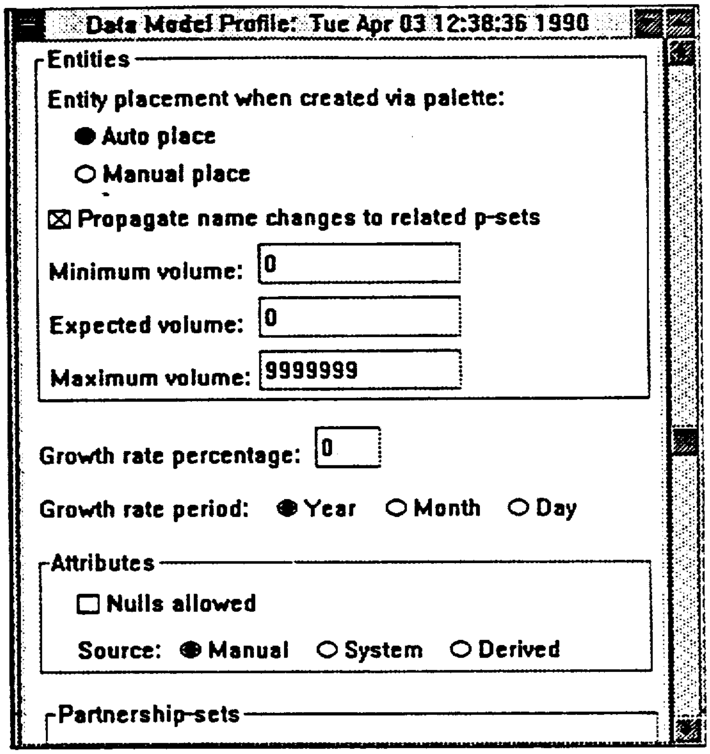
Figure 11-18 (3 of 4)
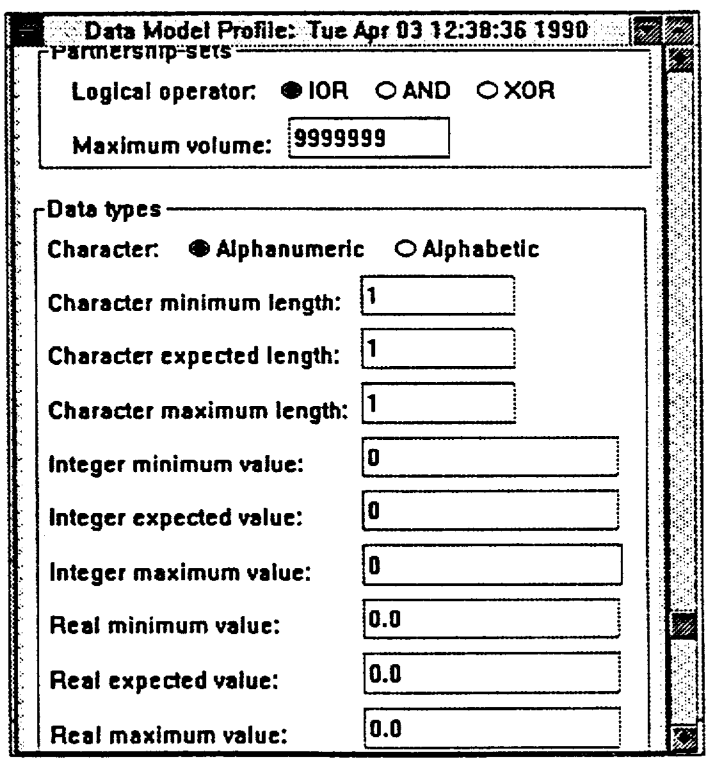
Figure 11-18 (4 of 4)

(1 of 2)

(2 of 2)

(1 of 2)

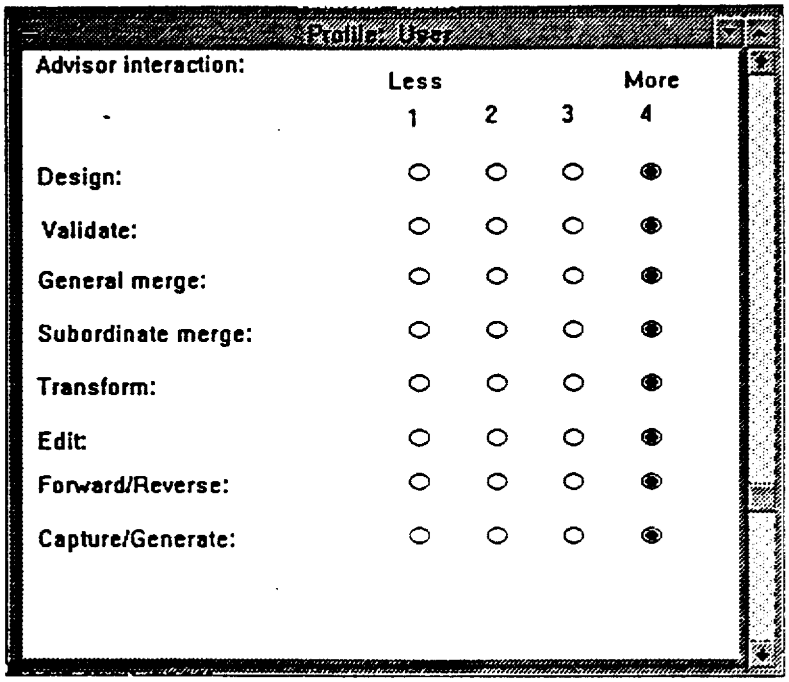
Figure 11-21
(2 of 2)
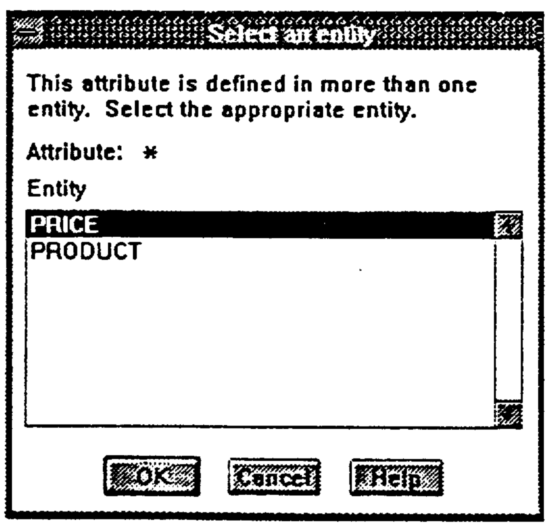
Figure B-1
(1 of 7)

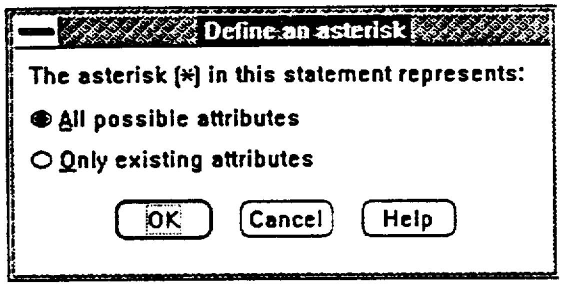
Figure B-2
(2 of 7)
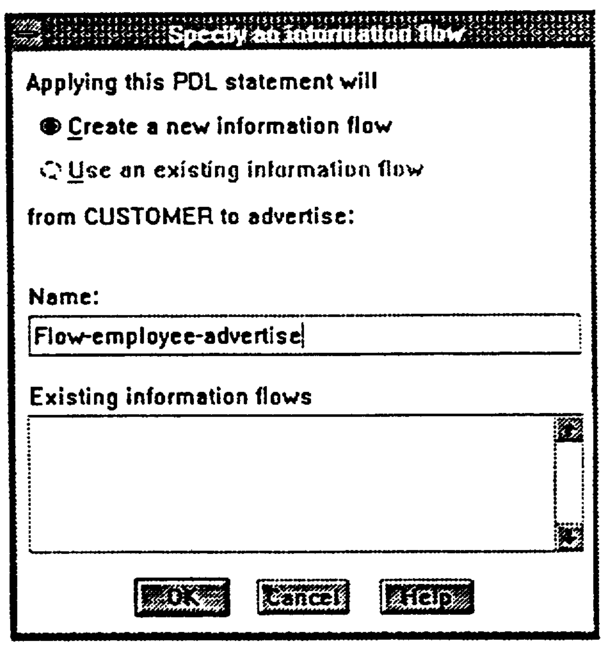
Figure B-3
(3 of 7)

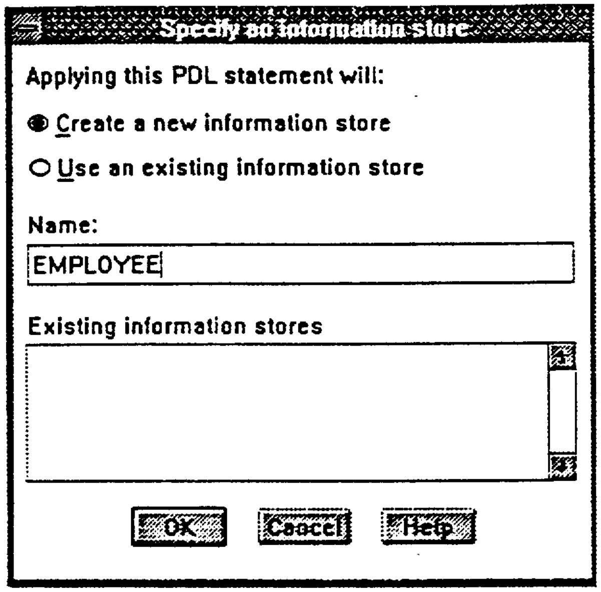
Figure B-4
(4 of 7)
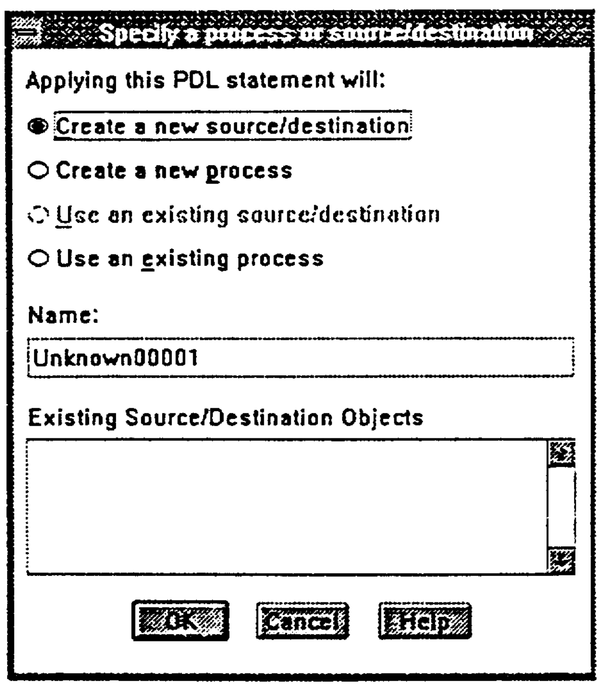
Figure B-5
(5 of 7)

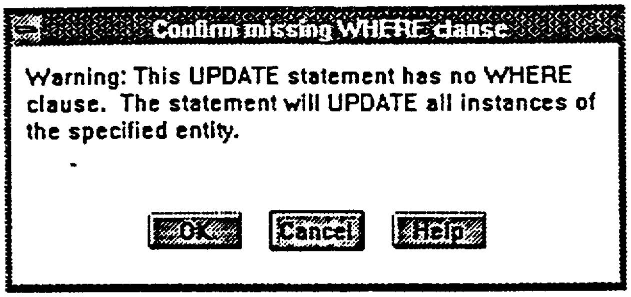

Figure B-6
(6 of 7)

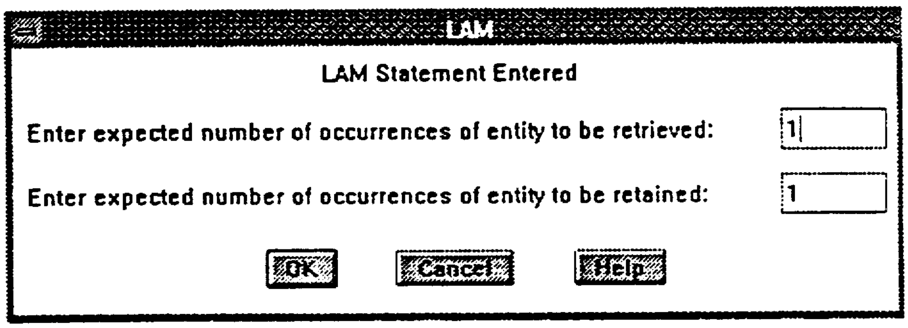

Figure B-7
(7 of 7)

What we claim is:

1. A computer system for establishing a dynamic model of information systems of organizations comprising:

A. at least one information modeler subsystem (IMS) including Information Model (IM) means for creating, analyzing and modifying an entity-relationship information model (information model), said information model having IM design data representative of elements including at least one from the group consisting of attribute, entity method, attribute method, partnership set, and partnership set method, said attribute being independent of an entity;

B. at least one process modeler subsystem (PMS) including Information Flow Model (IFM) means for creating, analyzing, and modifying a process model said process model having IFM design data representative of elements including at least one from the group consisting of processes, information stores, information flows, messages, view, process local stores, sources, and destinations, said IFM design data relating to at least one of said elements of said IM design data;

C. modeler linking subsystem (MLS) coupled to said IMS and said PMS, said MLS including means for dynamically correlating said IMS and said PMS, whereby a change to any of said IM design data affects a corresponding IM-IFM change in said IFM design data, and whereby a change to any of said IFM design data affects a corresponding IFM-IM change in said IM design data; and D. operator means coupled to said IMS and said PMS for applying external signals to said IMS and said PMS, said signals being effective to evoke a creating, analyzing, or modifying response from at least one of said IM means and said IFM means.

2. A computer system according to claim 1 wherein said elements of said IM design data further includes at least one from the group consisting of: entities; entity and relationship; entity and attribute; and entity, relationship, and partnership set.

3. A computer system according to claim 2 further comprising at least one logic modeler subsystem (LMS), including Process Description Language (PDL) means for defining logical operations on at least one of said IFM design data and IM design data, said logical operations being defined by PDL design data.

4. A computer system according to claim 1 wherein said IMS further comprises IM display means for establishing an IM display having IM display objects representative of said IM design data, including means associated with said IM display selectively operative for externally applying signals to said IM display objects, whereby an externally applied signal associated with at least one of said IM display objects affects said IM design data; and wherein said PMS further comprises IFM display means for establishing a IFM display having IFM display objects representative of said IFM design data, including means associated with said IFM display selectively operative for externally applying signals to said IFM display objects, whereby an externally applied signal associated with at least one of said IFM display objects affects said IFM design data.

5. A computer system according to claim 4 further comprising a display linking subsystem coupled to said IMS and said PMS, said display linking subsystem including means for dynamically correlating said IM display and said IFM display, whereby a change to any of said IM design data affects a substantially immediate corresponding change in said IFM design data, and whereby a change to any of said IFM design data affects a substantially immediate change in said IFM design data.

6. A computer system according to claim 4 wherein said IFM display means further comprises process explosion (PE) means for exploding at least one of said processes of said IFM design data into zero, one or more process explosion (PE) processes;

each of said PE processes including at least one of the group consisting of primitive processes and high-level (HL) processes, each of said HL processes including one of the group consisting of primitive processes and HL processes; and wherein each of said HL processes includes HL means for creating and modifying each of said PE processes.

7. A computer system according to claim 6 wherein said PE means further includes means for establishing a PE display of at least one of said primitive processes having PE display objects representative of said IFM design data associated with said primitive process, and including means associated with said PE display selectively operative for externally applying signals to said PE display objects, whereby an externally applied signal associated with at least one of said PE display objects affects said IFM design data; and wherein said PE display is selectively displayable simultaneous with at least one of said IM display, or said IFM display.

8. A computer system according to claim 4 wherein said design data includes at least two processes, and further comprising implosion means for consolidating at least two of said processes of said design data into a process implosion (PI) process, each of said PI processes defining a high-level (HL) process.

9. A computer system according to claim 8 wherein said implosion means further includes means for establishing a PI display of at least one of said HL processes, and including means associated with said PI display selectively operative for externally applying signals to said PI display, whereby an externally applied signal associated with said PI display affects said design data; and wherein said PI display is selectively displayable simultaneous with at least one of said modeler displays.

10. A computer system for establishing a dynamic model of information systems of organizations comprising:

A. at least one information modeler subsystem (IMS) including Information Model (IM) means for creating, analyzing and modifying an entity-relationship information model (information model), said information model having IM design data;

B. at least one process modeler subsystem (PMS) including Information Flow Model (IFM) means for creating, analyzing, and modifying a process model, said information flow model having IFM design data representative of elements including at least one from the group consisting of processes, information stores, information flows, messages, views, process local stores, sources, and destinations, said IFM design data relating to at least one of said elements of said IM design data;

C. modeler linking subsystem coupled to said IMS and said PMS, said modeler linking subsystem including means for dynamically correlating said IMS and said PMS, whereby a change to any of said IM design data affects a corresponding IM-IFM change in said IFM design data, and whereby a change to any of said IFM design data affects a corresponding IFM-IM change in said IM design data;

D. operator means coupled to said IMS and said PMS for applying external signals to said IMS and said PMS, said signals being effective to evoke a creating, analyzing, or modifying response from at least one of said IM means and said IFM means; and E. at least one logic modeler subsystem (LMS) coupled with said IMS and said PMS, including Process Description Language (PDL) means for defining logical operations on at least one of said IFM design data and IM design data, said logical operations being defined by PDL design data.

11. A computer system according to claim 10 wherein said IM design data is representative of elements including at least one from the group consisting of: attribute; attribute method; partnership set; partnership set method; entity; entity method; entity and relationship; entity and attribute, and; entity, relationship, and partnership set.

12. A computer system according to claim 10 wherein said IMS further comprises IM display means for establishing an IM display having IM display objects representative of said IM design data, including means associated with said IM display selectively operative for externally applying signals to said IM display objects, whereby an externally applied signal associated with at least one of said IM display objects affects said IM design data;

wherein said PMS further comprises IFM display means for establishing a IFM display having IFM display objects representative of said IFM design data, including means associated with said IFM display selectively operative for externally applying signals to said IFM display objects, whereby an externally applied signal associated with at least one of said IFM display objects affects said IFM design data; and wherein said LMS further comprises PDL display means for establishing a PDL display having PDL display objects representative of said PDL design data, including means associated with said PDL display selectively operative for externally applying signals to said PDL display objects, whereby an externally applied signal associated with at least one of said PDL display objects affects said PDL design data.

13. A computer system according to claim 12 further comprising a display linking subsystem coupled to said IMS, said PMS, and said LMS, said display linking subsystem including means for dynamically correlating said IM display, said IFM display, and said PDL display whereby a change to any one of said IM design data, IFM design data, and PDL design data affects a substantially immediate corresponding change in at least one of said IM design data, IFM design data, and PDL design data.

14. A computer system according to claim 12 wherein said IFM display means further comprises a process explosion subsystem (PES) coupled to said PMS said PES including means for exploding at least one of said processes of said IFM design data into zero, one or more process explosion PE processes;

each of said PE processes including at least one from the group consisting of primitive processes and high-level (HL) processes, each of said HL processes including on from the group consisting of primitive processes and HL processes; and wherein each of said HL processes includes high-level process means for creating and modifying each of said PE processes.

15. A computer system according to claim 14 wherein said PE means includes means for establishing a PE display of at least one of said primitive processes having PE display objects representative of said IFM design data associated with said primitive process, and including means associated with said PE display selectively operative for externally applying signals to said PE display objects, whereby an externally applied signal associated with at least one of said PE display objects affects said IFM design data; and wherein said PE display is selectively displayable simultaneous with at least one of said IM display, said IFM display, or said PDL display.

16. A computer system according to claim 12 wherein said design data includes at least two processes, and further comprising a process implosion subsystem (PIS) coupled to said PMS, said PIS including means for consolidating at least two of said processes of said design data into a process implosion (PI) process, each of said PI processes defining a high-level (HL) process.

17. A computer according to claim 16 wherein said PIS further includes means for establishing a PI display of at least one of said HL processes, and including means associated with said PI display selectively operative for externally applying signals to said PI display, whereby an externally applied signal associated with said PI display affects said design data; and wherein said PI display is selectively displayable simultaneous with at least one of said modeler displays.

18. A computer system for establishing a dynamic model of information systems of organizations comprising:

A. at least one information modeler subsystem (IMS) including Information Model (IM) means for creating, analyzing and modifying an entity-relationship information model (information model), said information model having IM design data;

B. at least one process modeler subsystem (PMS) including Information Flow Model (IFM) means for creating, analyzing, and modifying a process model, said process model having IFM design data representative of elements including at least one from the group consisting of: event; flow-partnership; and, flow-partnership set; said IFM design data relating to at least one of said elements of said IM design data;

C. modeler linking subsystem coupled to said IMS and said PMS, said modeler linking subsystem including means for dynamically correlating said IMS and said PMS, whereby a change to any of said IM design data affects a corresponding IM-IFM change in said IFM design data, and whereby a change to any of said IFM design data affects a corresponding IFM-IM change in said IM design data;

D. operator means coupled to said IMS and said PMS for applying external signals to said IMS and said PMS, said signals being effective to evoke a creating, analyzing, or modifying response from at least one of said IM means and said IFM means;

E. said IMS further comprises IM display means for establishing an IM display having IM display objects representative of said IM design data, including means associated with said IM display selectively operative for externally applying signals to said IM display objects, whereby an externally applied signal associated with at least one of said IM display objects affects said IM design data;

F. said PMS further comprises IFM display means for establishing an IFM display having IFM display objects representative of said IFM design data, including means associated with said IFM display selectively operative for externally applying signals to said IFM display objects, whereby an externally applied signal associated with at least one of said IFM display objects affects said IFM design data; and G. display linking subsystem coupled to said IMS and said PMS, said display linking subsystem including means for dynamically correlating said IM display and said IFM display, wherein a change to any of said IM design data affects a substantially immediate corresponding change in said IFM design data, and whereby a change to any of said IFM design data affects a substantially immediate change in said IFM design data.

19. A computer system according to claim 18 wherein said IM design data is representative of elements including at least one from the group consisting of: attribute; attribute method; partnership set; partnership set method; entity; entity method; entity and relationship; entity and attribute, and; entity, relationship, and partnership set.

20. A computer system according to claim 19 further comprising at least one logic modeler subsystem LMS, including PDL means for defining logical operations on at least one of said IFM design data and IM design data, said logical operations being defined by PDL design data.

21. A computer system according to claim 18 wherein said IFM display means further comprises a process explosion subsystem PES coupled to said PMS, said PES including means for exploding at least one of said processes of said IFM design data into zero, one or more process explosion PE processes;

each of said PE processes including at least one from the group consisting of primitive processes and high-level (HL) processes, each of said HL processes including one from the group consisting of primitive processes and HL processes; and wherein each of said HL processes includes high level process means for creating and modifying each of said PE processes.

22. A computer system according to claim 21 wherein said PE means includes means for establishing a PE display of at least one of said primitive processes having PE display objects representative of said IFM design data associated with said primitive process, and including means associated with said PE display selectively operative for externally applying signals to said PE display objects, whereby an externally applied signal associated with at least one of said PE display objects affects said IFM design data; and wherein said PE display is selectively displayable simultaneous with at least one of said IM display, or said IFM display.

23. A computer system according to claim 18 wherein said design data includes at least two processes, and further comprising a process implosion subsystem PIS coupled to said PMS, said PIS including means for consolidating at least two of said processes of said design data into a process implosion (PI) process, each of said PI processes defining a high-level (HL) process.

24. A computer according to claim 23 wherein said implosion means further includes means for establishing a PI display of at least one of said HL processes, and including means associated with said PI display selectively operative for externally applying signals to said PI display, whereby an externally applied signal associated with said PI display affects said design data; and wherein said PI display is selectively displayable simultaneous with at least one of said modeler displays.

25. A computer system according to claims 3, 11, or 20 wherein said PDL design data corresponds to at least one from the group consisting of insert, retrieve, update, delete, send, receive, signal, when, reference to an entity, connect, and disconnect.

26. A computer system according to claims 3, 11, or 20, wherein said PDL design data is representative of at least one from the group consisting of text and tree structure diagram, and wherein said operator means further include means for selectively displaying said text and tree structure diagrams.

27. A computer system according to claim 26 wherein said text is representative of at least one from the group consisting of icons and alphanumeric symbols.

28. A computer system according to claim 27 wherein said operator means further includes means for externally applying signals to said LMS whereby an externally applied signal associated with at least one of said text affects said PDL design data.

29. A computer system according to claim 26 wherein said tree structure diagram includes nodes and pins, and wherein said nodes have text fields including data representative of at least one of logical operations, IM design data, and IFM design data.

30. A computer system according to claim 29 wherein said tree structure diagram includes nodes and pins, wherein said pins are representative of operation locations at said node, whereby an external signal applied to at least one of said operation locations performs an operation at said operation location, said operation including at least one from the group consisting of: add data, replace data, delete data, add node, replace node, and delete node.

31. A computer system according to claims 3, 11, or 20 further comprising:

A. means for establishing an option modeler subsystem (OMS), having selectively operative Option Modeler (OM) means for creating, analyzing, and modifying syntactically permitted options associated with said PDL design data, said OM means including:

(i) storage means for storing predetermined option criteria, each of said predetermined option criteria being representative of at least one from the group consisting of semantic rules, logical relationships, expert rules, and heuristics;

(ii) comparison means coupled to said storage means for comparing said PDL design data with said predetermined option criteria; and (iii) identification means coupled to said comparison means for identifying correlated PDL design data, said correlated PDL design data being ones of said PDL design data which substantially match one of said predetermined criteria, said correlated PDL design data being representative of said syntactically permitted options;

B. means for establishing an options window having operator selectable option objects representative of said syntactically permitted options, whereby said syntactically permitted options are only ones of said PDL design data syntactically permitted at the time of establishment of said options window; and C. means associated with said options window selectively operative for externally applying signals to said OMS whereby an externally applied signal associated with at least one of said option objects affects said PDL design data.

32. A computer system according to claims 3, 11, or 20 further comprising a modeler linking subsystem coupled to said IMS, said PMS, and said LMS, said modeler linking subsystem including means for dynamically correlating said LMS, said IMS, and said PMS, whereby a change to any of said PDL design data affects a corresponding PDL-IM/IFM change in said IM design data and said IFM design data, and whereby a change to any of said IM design data or said IFM design data affects a corresponding IM/IFM-PDL change in said PDL design data.

33. A computer system according to claim 32 wherein said operator means is further coupled to said LMS and includes means for establishing at least one option facility and option objects therein, including:

means associated with said option facility selectively operative for externally applying signals to said information modeler, said process modeler, and said logic modeler whereby an externally applied signal associated with at least one of said option objects affects said IM design data, said IFM design data and said PDL design data.

34. A computer system according to claim 33 wherein said operator means includes means for establishing at least one feedback window and feedback objects therein, including:

feedback window means associated with said feedback window for selectively displaying data received from at least one of said IMS, said PMS, and said LMS.

35. A computer system according to claim 34 wherein said operator means includes means for establishing at least one diagram window and diagram objects therein, including:

diagram window means associated with said diagram window for selectively displaying data received from at least one of said IMS, said PMS, and said LMS, defining said diagram objects; and signal means associated with said diagram window selectively operative for externally applying signals to said diagram objects, whereby an externally applied signal associated with at least one of said diagram objects affects said IM design data, said IFM design data, and said PDL design data.

36. A computer system according to claim 32 wherein said operator means includes means for establishing at least one feedback window and feedback objects therein, including:

feedback window means associated with said feedback window for selectively displaying data received from at least one of said IMS, said PMS, and said LMS.

37. A computer system according to claim 32 wherein said operator means includes means for establishing at least one diagram window and diagram objects therein, including:

diagram window means associated with said diagram window for selectively displaying data received from at least one of said information modeler, said process modeler, and said logic modeler, defining said diagram objects;

means associated with said diagram window selectively operative for externally applying signals to said diagram objects, whereby an externally applied signal associated with at least one of said diagram objects affects said IM design data, said IFM design data, and said PDL design data.

38. A computer system according to claim 32 wherein said modeler linking subsystem is further coupled to said LMS and includes means for substantially immediately affecting said corresponding PDL-IM/IFM change, and said corresponding IM/IFM-PDL change without operator input.

39. A computer system according to claims 3, 11, or 20 wherein said operator means is further coupled to said LMS and includes means for establishing at least one option facility and option objects therein, including:

means associated with said option facility selectively operative for externally applying signals to said IMS, said PMS, and said LMS whereby an externally applied signal associated with at least one of said option objects affects said IM design data, said IFM design data and said PDL design data.

40. A computer system according to claim 39 wherein said operator means includes means for establishing at least one feedback window and feedback objects therein, including:

feedback window means associated with said feedback window for selectively displaying data received from at least on of said IMS, said PMS, and said LMS.

41. A computer system according to claim 40 wherein said operator means includes means for establishing at least one diagram window and diagram objects therein, including:

diagram window means associated with said diagram window for selectively displaying data received from at least one of said IMS, said PMS, and said LMS, defining said diagram objects;

means associated with said diagram window selectively operative for externally applying signals to said diagram objects, whereby an externally applied signal associated with at least one of said diagram objects affects said IM design data, said IFM design data, and said PDL design data.

42. A computer system according to claim 41 wherein said externally applied signals have associated therewith signal values, and wherein said IMS, said PMS, and said LMS further comprises:

storage means for storing predetermined values, each of said predetermined values being representative of at least one process, semantic rule, expert rule, logical relationship, heuristic, text field, or pin;

comparison means coupled to said storage means for comparing said signal values with said predetermined value;

identification means coupled to said comparison means for identifying uncorrelated signals, said uncorrelated signals being ones of said signal values which do not substantially match one of said predetermined values; and flag means coupled to said identification means for generative flag signals representative of the identity of said uncorrelated signals.

43. A computer system according to claims 3, 11, or 20 wherein said operator means is further coupled to said LMS and includes means for establishing at least one feedback window and feedback objects therein, including:

feedback window means associated with said feedback window for selectively displaying data received from at least on of said IMS, said PMS, and said LMS.

44. A computer system according to claim 43 wherein said operator means includes means for establishing at least one diagram window and diagram objects therein, including:

diagram window means associated with said diagram window for selectively displaying data received from at least one of said IMS, said PMS, and said LMS, defining said diagram objects;

means associated with said diagram window selectively operative for externally applying signals to said diagram objects, whereby an externally applied signal associated with at least one of said diagram objects affects said IM design data, said IFM design data, and said PDL design data.

45. A computer system according to claim 43 wherein said externally applied signals have associated therewith signal values, and wherein said IMS, said PMS, and said LMS further comprises:

storage means for storing predetermined values, each of said predetermined values being representative of at least one process, semantic rule, expert rule, logical relationship, heuristic, text field, or pin;

comparison means coupled to said storage means for comparing said signal values with said predetermined value;

identification means coupled to said comparison means for identifying uncorrelated signals, said uncorrelated signals being ones of said signal values which do not substantially match one of said predetermined values; and flag means coupled to said identification means for generative flag signals representative of the identity of said uncorrelated signals.

46. A computer system according to claim 3, 11, or 20 wherein said operator means is further coupled to said LMS and includes means for establishing at least one diagram window and diagram objects therein, including:

diagram window means associated with said diagram window for selectively displaying data received from at least one of said IMS, said PMS, and said LMS, defining said diagram objects;

means associated with said diagram window selectively operative for externally applying signals to said diagram objects, whereby an externally applied signal associated with at least one of said diagram objects affects said IM design data, said IFM design data, and said PDL design data.

47. A computer system according to claim 46 wherein said externally applied signals have associated therewith signal values, and wherein said IMS, said PMS, and said LMS further comprises:

storage means for storing predetermined values, each of said predetermined values being representative of at least one process, semantic rule, expert rule, logical relationship, heuristic, text field, or pin;

comparison means coupled to said storage means for comparing said signal values with said predetermined value;

identification means coupled to said comparison means for identifying uncorrelated signals, said uncorrelated signals being ones of said signal values which do not substantially match one of said predetermined values; and flag means coupled to said identification means for generative flag signals representative of the identity of said uncorrelated signals.

48. A computer system according to claims 3, 11, or 20 wherein said externally applied signals have associated therewith signal values, and wherein said IMS, said PMS, and said LMS further comprises:

storage means for storing predetermined values, each of said predetermined values being representative of at least one process, semantic rule, expert rule, logical relationship, heuristic, text field, or pin;

comparison means coupled to said storage means for comparing said signal values with said predetermined value;

identification means coupled to said comparison means for identifying uncorrelated signals, said uncorrelated signals being ones of said signal values which do not substantially match one of said predetermined values; and flag means coupled to said identification means for generative flag signals representative of the identity of said uncorrelated signals.

49. A computer system according to claims 3, 11, or 20 further comprising a filter subsystem coupled to said IMS, said PMS, and said LMS, said filter subsystem including means for creating at least one from the group of subsets consisting of: an IM-subset of said information model; an IFM-subset of said process model; and, a PDL-subset of said PDL design data;

each of said IM-subset, IFM-subset, and PDL-subset being defined by operator-determined selection criteria, and being selected in accordance with said selection criteria from said IM design data, IFM design data, and PDL design data, respectively.

50. A computer system according to claim 49 wherein said filter subsystem further comprises means for establishing an IM-subset display of said IM-subset having IM-subset display objects representative of said IM-subset, including means associated with said IM-subset display selectively operative for externally applying signals to said IM-subset display objects, whereby an externally applied signal associated with at least one of said IM-subset display objects affects said information model.

51. A computer system according to claim 49 wherein said filter subsystem further comprises means for establishing an IFM-subset display of said IFM-subset having IFM-subset display objects representative of said IFM-subset, including means associated with said IFM-subset display selectively operative for externally applying signals to said IFM-subset display objects, whereby an externally applied signal associated with at least one of said IFM-subset display objects affects said process model.

52. A computer system according to claim 49 wherein said filter subsystem further comprises means for establishing a PDL-subset display of said PDL-subset having PDL-subset display objects representative of said PDL-subset, including means associated with said PDL-subset display selectively operative for externally applying signals to said PDL-subset display objects, whereby an externally applied signal associated with at least one of said PDL-subset display objects affects said PDL design data.

53. A computer system according to claim 49 wherein said filter subsystem further comprises:

means for establishing an IM-subset display of said IM-subset having IM-subset display objects representative of said IM-subset, including means associated with said IM-subset display selectively operative for externally applying signals to said IM-subset display objects, whereby an externally applied signal associated with at least one of said IM-subset display objects affects said information model;

means for establishing an IFM-subset display of said IFM-subset having IFM-subset display objects representative of said IFM-subset, including means associated with said IFM-subset display selectively operative for externally applying signals to said IFM-subset display objects, whereby an externally applied signal associated with at least one of said IFM-subset display objects affects said process model; and means for establishing a PDL-subset display of said PDL-subset having PDL-subset display objects representative of said PDL-subset, including means associated with said PDL-subset display selectively operative for externally applying signals to said PDL-subset display objects, whereby an externally applied signal associated with at least one of said PDL-subset display objects affects said PDL design data.

54. A computer system according to claim 53 further comprising display linking subsystem coupled to said IMS, said PMS, and said LMS, said display linking subsystem including means for dynamically correlating said IM-subset display, said IFM-subset display, and said PDL-subset display, wherein a change to any of said IM-subset design data affects a substantially immediate corresponding change in said IFM-subset design data and said PDL-subset design data, and wherein a change to any of said IFM-subset design data affects a substantially immediate corresponding change in said IM-subset design data and said PDL-subset design data, and wherein a change to any of said PDL-subset design data affects a substantially immediate corresponding change in said IM-subset design data and said IFM-subset design data.

55. A computer system according to claims 3, 11, or 20 further comprising at least one function modeler subsystem FMS for creating, analyzing, and modifying a function model, said function model including FD design data representative of FD subprocesses, each of said subprocesses corresponding to at least one of said processes of said IFM design data, and having FD means for defining a hierarchy of said FD subprocesses of said IFM design data.

56. A computer system according to claim 55 further comprising a filter subsystem coupled to said IMS, said PMS, and said LMS, said filter subsystem including means for creating at least one from the group of subsets consisting of: an IM-subset of said information model; an IFM-subset of said process model; and FD-subset of said function model; and, a PDL-subset of said PDL design data;

each of said IM-subset, IFM-subset, FD-subset, and PDL-subset being defined by operator-determined selection criteria, and being selected in accordance with said selection criteria from said IM design data, IFM design data, FD design data, and PDL design data, respectively.

57. A computer system according to claim 56 wherein said filter subsystem further comprises:

means for establishing an IM-subset display of said IM-subset having IM-subset display objects representative of said IM-subset, including means associated with said IM-subset display selectively operative for externally applying signals to said IM-subset display objects, whereby an externally applied signal associated with at least one of said IM-subset display objects affects said information model;

means for establishing an IFM-subset display of said IFM-subset having IFM-subset display objects representative of said IFM-subset, including means associated with said IFM-subset display selectively operative for externally applying signals to said IFM-subset display objects, whereby an externally applied signal associated with at least one of said IFM-subset display objects affects said process model;

means for establishing an FD-subset display of said FD-subset having FD-subset display objects representative of said FD-subset, including means associated with said FD-subset display selectively operative for externally applying signals to said FD-subset display objects, whereby an externally applied signal associated with at least one of said FD-subset display objects affects said function model; and means for establishing a PDL-subset display of said PDL-subset having PDL-subset display objects representative of said PDL-subset, including means associated with said PDL-subset display selectively operative for externally applying signals to said PDL-subset display objects, whereby an externally applied signal associated with at least one of said PDL-subset display objects affects said PDL design data.

58. A computer system according to claim 57 further comprising display linking subsystem coupled to said IMS, said PMS, said LMS, and said FDS, and including means for dynamically correlating said IM-subset display, said IFM-subset display, said FD-subset display, and said PDL-subset display, wherein a change to any of said IM-subset design data affects a substantially immediate corresponding change in at least one from the group consisting of said IFM-subset design data, FD-subset design data, and said PDL-subset design data, wherein a change to any of said IFM-subset design data affects a substantially immediate corresponding change in at least one from the group consisting of said IM-subset design data, said FD-subset design data, and said PDL-subset design data, wherein a change to any of said FD-subset design data affects a substantially immediate corresponding change in at least one from the group consisting of said IM-subset design data, said IFM-subset design data, and said PDL-subset design data, and wherein a change to any of said PDL-subset design data affects a substantially immediate corresponding change in said IM-subset design data and said IFM-subset design data.

59. A computer system according to claim 55 wherein said hierarchy is representative of at least one text or graphics, and wherein said operator means further include means for selectively displaying said text and graphics.

60. A computer system according to claim 59 wherein said text is representative of at least one of icons and alphanumeric symbols.

61. A computer system according to claim 60 wherein said operator means further includes means for externally applying signals to said FDS whereby an externally applied signal associated with at least one of said text affects said FD design data.

62. A computer system according to claim 59 wherein said graphics includes at least one graphics field having graphics elements representative of said IFM design data and said FD design data.

63. A computer system according to claim 62 wherein said operator means further includes means for externally applying signals to said FDS whereby an externally applied signal associated with at least one of said graphics elements affects said FD design data.

64. A computer system according to claim 59 further comprising linking subsystem coupled to said IMS, said PMS, said LMS, and said FDS, and including means for dynamically correlating said FDS, said LMS, and said PMS, whereby a change to any of said FD design data affects a corresponding FD-PDL/IFM change in said PDL design data and said IFM design data, and whereby a change to any of said PDL design data or said IFM design data affects a corresponding PDL/IFM-FD change in said FD design data.

65. A computer system according to claim 64 wherein said FDS further comprises means for establishing a FD display having FD display objects representative of said FD design data, including means associated with said FD display selectively operative for externally applying signals to said FD display objects, whereby an externally applied signal associated with at least one of said FD display objects affects said FD design data; and wherein said PMS further comprises means for establishing a IFM display having IFM display objects representative of said IFM design data, including means associated with said IFM display selectively operative for externally applying signals to said IFM display objects, whereby an externally applied signal associated with at least one of said IFM display objects affects said IFM design data.

66. A computer system according to claim 65 further comprising a linking subsystem coupled to said IMS, said PMS, said LMS, and said FDS, and including means for dynamically correlating said FDS, and said PMS, whereby a change to any of said FD design data affects a substantially immediate corresponding change in said IFM design data, and whereby a change to any of said IFM design data affects a substantially immediate change in said FD design data.

67. A computer system according to claim 66 wherein said IFM display means further comprises a process explosion subsystem PES coupled to said PMS, said PES including means for exploding at least one of said processes of said IFM design data into zero, one or more process explosion PE processes;

each of said PE processes including at least one from the group consisting of primitive processes and high-level (HL) processes, each of said HL processes including one from the group consisting of primitive processes and HL processes; and wherein each of said HL processes includes high-level process means for creating and modifying each of said PE processes.

68. A computer system according to claim 67 wherein said PE means includes means for establishing a PE display of at least one of said primitive processes having PE display objects representative of said IFM design data associated with said primitive process, and including means associated with said PE display selectively operative for externally applying signals to said PE display objects, whereby an externally applied signal associated with at least one of said PE display objects affects said IFM design data; and wherein said PE display is selectively displayable simultaneous with at least one of said IM display, said IFM display, said PDL display, or said FD display.

69. A computer system according to claims 3, 11, or 20 further comprising:

A. means for establishing in said computer system one or more partnership sets within at least one IM design data, IFM design data, or PDL design data, each of said partnership sets being representative of zero, one or more partnerships;

B. means for establishing one or more of said partnerships, wherein each of said partnerships is characterized by one partnership set associated with itself or associated with one other partnership set; and C. means for accessing in said computer system one or more of said IM design data, said IFM design data, and said PDL design data by reference to a partnership set which is in partnership with partnership sets of said one or more of said IM design data, said IFM design data, or said PDL design data.

70. A computer system according to claims 3, 11, or 20 further comprising:

A. storage means for storing information representative of an ordered set of references to design data;

B. valuation means coupled to said storage means for assigning a data value to said ordered set, defining an entity-set variable;

C. processing means coupled to said valuation means for selectively processing said entity-set variable in accordance with imposed criteria.

71. A computer system according to claims 3 or 20 wherein said LMS further comprises means for establishing a PDL display having PDL display objects representative of said PDL design data, including means associated with said PDL display selectively operative for externally applying signals to said PDL display objects, whereby an externally applied signal associated with at least one of said PDL display objects affects said PDL design data.

72. A computer system according to claim 71 further comprising display linking subsystem coupled to said IMS, said PMS, and said LMS, said display linking subsystem including means for dynamically correlating said IM display, said IFM display, and said PDL display, whereby a change to any of said IM design data affects a substantially immediate corresponding change in said IFM design data and said PDL design data, and whereby a change to any of said IFM design data affects a substantially immediate change in said IFM design data and said PDL design data, and whereby a change to any of said PDL design data affects a substantially immediate change in said IM design data and said IFM design data;

said IM design data being representative of elements including at least one from the group consisting of attributes, partnership sets, keys, domains, dimensions, and allowable values.

73. A computer system according to claim 71 further comprising display linking subsystem coupled to said IMS, said PMS, and said LMS, said display linking subsystem including means for dynamically correlating said IM display, said IFM display, and said PDL display, whereby a change to any of said IM design data affects a substantially immediate corresponding change in said IFM design data and said PDL design data, and whereby a change to any of said IFM design data affects a substantially immediate change in said IFM design data and said PDL design data, and whereby a change to any of said PDL design data affects a substantially immediate change in said IM design data and said IFM design data;

said IM design data being representative of elements including entities; and said PDL design data being representative of elements including at least one from the group consisting of send and receive.

74. A computer system according to claims 1, 10, or 18 further comprising at least one FDS, including FD design data representative of FD subprocesses, each of said subprocesses corresponding to at least one of said processes of said IFM design data, and having FD means for defining a hierarchy of said FD subprocess of said IFM design data.

75. A computer system according to claim 74 wherein said hierarchy is representative of at least one text or graphics, and wherein said operator means further include means for selectively displaying said text and graphics.

76. A computer system according to claim 75 wherein said text is representative of at least one of icons and alphanumeric symbols.

77. A computer system according to claim 76 wherein said operator means is further coupled to said FDS and further includes means for externally applying signals to said FDS whereby an externally applied signal associated with at least one of said elements affects said FD design data.

78. A computer system according to claim 75 wherein said graphics includes at least one graphics field having graphics elements representative of said IFM design data and said FD design data.

79. A computer system according to claim 78 wherein said operator means further includes means for externally applying signals to said function modeler whereby an externally applied signal associated with at least one of said elements affects said FD design data.

80. A computer system according to claim 75 further comprising a modeler linking subsystem coupled to said FDS and said PMS, said modeler linking subsystem including means for dynamically correlating said FDS and said PMS, whereby a change to any of said FD design data affects a corresponding change in said IFM design data, and whereby a change to any of said IFM design data affects a corresponding change in said FD design data.

81. A computer system according to claim 80 wherein said FDS further comprises means for establishing a FD display having FD display objects representative of said FD design data, including means associated with said FD display selectively operative for externally applying signals to said FD display objects, whereby an externally applied signal associated with at least one of said FD display objects affects said FD design data; and wherein said PMS further comprises means for establishing a IFM display having IFM display objects representative of said IFM design data, including means associated with said IFM display selectively operative for externally applying signals to said IFM display objects, whereby an externally applied signal associated with at least one of said IFM display objects affects said IFM design data.

82. A computer system according to claim 81 further comprising display linking subsystem coupled to said FDS and said PMS, and including means for dynamically correlating said FD display and said IFM display, whereby a change to any of said FD design data affects a substantially immediate corresponding change in said IFM design data, and whereby a change to any of said IFM design data affects a substantially immediate change in said FD design data.

83. A computer system according to claim 74 further comprising filter subsystem coupled to said IMS, said PMS, said LMS, and said FDS, said filter subsystem including means for creating at least one from the group of subsets consisting of: an IM-subset of said information model; an IFM-subset of said process model; an FD-subset of said function model; and, a PDL-subset of said PDL design data;

each of said IM-subset, IFM-subset, FD-subset, and PDL-subset being defined by operator-determined selection criteria, and being selected in accordance with said selection criteria from said IM design data, IFM design data, FD design data, and PDL design data.

84. A computer system according to claim 83 wherein said filter subsystem further comprises means for establishing an FD-subset display of said FD-subset having FD-subset display objects representative of said FD-subset, including means associated with said FD-subset display selectively operative for externally applying signals to said FD-subset display objects, whereby an externally applied signal associated with at least one of said FD-subset display objects affects said information model.

85. A computer system according to claim 83 wherein said filter subsystem further comprises:

means for establishing an IM-subset display of said IM-subset having IM-subset display objects representative of said IM-subset, including means associated with said IM-subset display selectively operative for externally applying signals to said IM-subset display objects, whereby an externally applied signal associated with at least one of said IM-subset display objects affects said information model;

means for establishing an IFM-subset display of said IFM-subset having IFM-subset display objects representative of said IFM-subset, including means associated with said IFM-subset display selectively operative for externally applying signals to said IFM-subset display objects, whereby an externally applied signal associated with at least one of said IFM-subset display objects affects said process model;

means for establishing an FD-subset display of said FD-subset having FD-subset display objects representative of said FD-subset, including means associated with said FD-subset display selectively operative for externally applying signals to said FD-subset display objects, whereby an externally applied signal associated with at least one of said FD-subset display objects affects said information model; and means for establishing a PDL-subset display of said PDL-subset having PDL-subset display objects representative of said PDL-subset, including means associated with said PDL-subset display selectively operative for externally applying signals to said PDL-subset display objects, whereby an externally applied signal associated with at least one of said PDL-subset display objects affects said PDL design data.

86. A computer system according to claim 85 further comprising display linking subsystem coupled to said IMS, said PMS, said LMS, and said FDS, said filter subsystem including means for dynamically correlating said IM-subset display, said IFM-subset display, said FD-subset display, and said PDL-subset display, wherein a change to any of said IM-subset design data affects a substantially immediate corresponding change in at least one from the group consisting of said IFM-subset design data, FD-subset design data, and said PDL-subset design data, wherein a change to any of said IFM-subset design data affects a substantially immediate corresponding change in at least one from the group consisting of said IM-subset design data, said FD-subset design data, and said PDL-subset design data, wherein a change to any of said FD-subset design data affects a substantially immediate corresponding change in at least one from the group consisting of said IM-subset design data, said IFM-subset design data, and said PDL-subset design data, and wherein a change to any of said PDL-subset design data affects a substantially immediate corresponding change in said IM-subset design data and said IFM-subset design data.

87. An information management method for controlling information systems of organization comprising the computer-implemented steps of:

A. establishing at least one information modeler subsystem (IMS) including Information Model (IM) means for creating, analyzing and modifying an entity-relationship information model (information model), said information model having IM design data representative of elements including at least one from the group consisting of attribute, entity method, and partnership set, said attribute being independent of an entity;

B. establishing at least one process modeler subsystem (PMS) including Information Flow Model (IFM) means for creating, analyzing, and modifying a process model, said process model having IFM design data representative of elements including at least one from the group consisting of processes, information stores, information flows, messages, sources, and destinations, said IFM design data corresponding to at least one of said elements of said IM design data;

C. establishing a modeler linking subsystem coupled to said IMS and said PMS, and including means for dynamically correlating said IMS and said PMS, whereby a change to any of said IM design data affects a corresponding IM-IFM change in said IFM design data, and whereby a change to any of said IFM design data affects a corresponding IFM-IM change in said IM design data; and D. establishing operator means coupled to said IMS and said PMS for applying external signals to said IMS and said PMS, said signals being effective to evoke a creating, analyzing, or modifying response from at least one of said IM means and said IFM means.

88. An information management method for controlling information systems of organization comprising the computer-implemented steps of:

A. establishing at least one information modeler subsystem (IMS) including Information Model (IM) means for creating, analyzing and modifying an entity-relationship information model (information model), said information model having IM design data representative of elements including at least one from the group consisting of attribute, entity method, and partnership set, said attribute being independent of an entity;

B. establishing at least one process modeler subsystem (PMS) including Information Flow Model (IFM) means for creating, analyzing, and modifying a process model, said process model having IFM design data representative of elements including at least one process, information store, information flow, message, source, and destination, said IFM design data corresponding to at least one of said elements of said IM design data;

C. establishing a modeler linking subsystem coupled to said IMS and said PMS, and including means for dynamically correlating said IMS and said PMS, whereby a change to any of said IM design data affects a corresponding IM-IFM change in said IFM design data, and whereby a change to any of said IFM design data affects a corresponding IFM-IM change in said IM design data;

D. establishing operator means coupled to said IMS and said PMS for applying external signals to said IMS and said PMS, said signals being effective to evoke a creating, analyzing, or modifying response from at least one of said IM means and said IFM means; and E. establishing at least one logic modeler subsystem LMS coupled with said IMS and said PMS and including PDL means for defining logical operations on at least one of said IFM design data and IM design data, said logical operations being defined by PDL design data.

89. An information management method for controlling information systems of organization comprising the computer-implemented steps of:

A. establishing at least one information modeler subsystem (IMS) including Information Model (IM) means for creating, analyzing and modifying an entity-relationship information model (information model), said information model having IM design data;

B. establishing at least one process modeler subsystem (PMS) including Information Flow Model (IFM) means for creating, analyzing, and modifying a process model, said process model having IFM design data representative of elements including at least one from the group consisting of: event; flow-partnership; and, flow-partnership set; said IFM design data corresponding to at least one of said elements of said IM design data;

C. establishing a modeler linking subsystem coupled to said IMS and said PMS, and including means for dynamically correlating said IMS and said PMS, whereby a change to any of said IM design data affects a corresponding IM-IFM change in said IFM design data, and whereby a change to any of said IFM design data affects a corresponding IFM-IM change in said IM design data;

D. establishing operator means coupled to said IMS and said PMS for applying external signals to said IMS and said PMS, said signals being effective to evoke a creating, analyzing, or modifying response from at least one of said IM means and said IFM means;

E. establishing an IM display having IM display objects representative of said IM design data, including selectively externally applying signals to said IM display objects such that an externally applied signal associated with at least one of said IM display objects affects said IM design data;

F. establishing an IFM display having IFM display objects representative of said IFM design data, including selectively externally applying signals to said IFM display objects such that an externally applied signal associated with at least one of said IFM display objects affects said IFM design data; and G. establishing a display linking subsystem coupled to said IMS and said PMS for dynamically correlating said IM display and said IFM display, wherein a change to any of said IM design data affects a substantially immediate corresponding change in said IFM design data, and whereby a change to any of said IFM design data affects a substantially immediate change in said IFM design data.

* * * * *